US012653191B2

(12) United States Patent
Klüken et al.

(10) Patent No.: US 12,653,191 B2
(45) Date of Patent: Jun. 16, 2026

(54) ACTIVE COMPOUND COMBINATIONS

(71) Applicant: Bayer Aktiengesellschaft, Leverkusen (DE)

(72) Inventors: Agostinos Michael Klüken, Krefeld (DE); Julie Geist, Lyons (FR); Cyril Montagne, Lyons (FR); Anthony Millet, Tignieu-jameyzieu (FR); Lionel Nicolas, Lyons (FR); Tomoki Tsuchiya, Lyons (FR)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 637 days.

(21) Appl. No.: 18/010,752

(22) PCT Filed: Jun. 16, 2021

(86) PCT No.: PCT/EP2021/066189
§ 371 (c)(1),
(2) Date: Dec. 15, 2022

(87) PCT Pub. No.: WO2021/255070
PCT Pub. Date: Dec. 23, 2021

(65) Prior Publication Data

US 2024/0016152 A1 Jan. 18, 2024

(30) Foreign Application Priority Data

Jun. 18, 2020 (EP) .................................... 20180707

(51) Int. Cl.
*A01N 43/88* (2006.01)
*A01P 3/00* (2006.01)

(52) U.S. Cl.
CPC ................ *A01N 43/88* (2013.01); *A01P 3/00* (2021.08)

(58) Field of Classification Search
CPC .................................. A01N 43/88; A01P 3/00
See application file for complete search history.

(56) References Cited

U.S. PATENT DOCUMENTS 6,251,899 B1 6/2001 Gerdes et al.
8,486,934 B2 * 7/2013 Kruger ................ C07D 273/04 514/229.2
12,501,900 B2 12/2025 Chen et al.
2006/0252755 A1 11/2006 Shaber et al.
2023/0064576 A1 * 3/2023 Chen .................... C07D 403/04
2023/0278994 A1 9/2023 Geist et al.
2023/0354812 A1 11/2023 Geist et al.

FOREIGN PATENT DOCUMENTS

WO 2007031213 A1 3/2007
WO 2008/009406 A1 1/2008
WO 2008/049585 A1 5/2008
WO 2008/089934 A1 7/2008
WO 2008/135413 A1 11/2008
WO 2016/201168 A1 12/2016
WO 2020/109391 A1 6/2020
WO 2020127780 A1 6/2020
WO 2021255070 A1 12/2021

OTHER PUBLICATIONS

European Search Report dated Mar. 14, 2019, for European Application No. 18214866.8, filed on Dec. 20, 2018. 8 pages.
International Search Report mailed on Apr. 21, 2020, for PCT Patent Application No. PCT/EP2019/086373, filed on Dec. 19, 2019, 4 pages.
International Search Report mailed on Aug. 18, 2021, for PCT Patent Application No. PCT/EP2021/066189, filed on Jun. 16, 2021, 3 pages.
International Search Report mailed on Aug. 20, 2021, for PCT Patent Application No. PCT/EP2021/066190, filed on Jun. 16, 2021, 3 pages.

* cited by examiner

*Primary Examiner* — Sahana S Kaup
*Assistant Examiner* — Toriana N. Vigil
(74) *Attorney, Agent, or Firm* — MORRISON & FOERSTER LLP

(57) ABSTRACT

The present invention relates to active compound combinations, in particular within a fungicide composition, which comprise as compound (A) a compound of formula (I) and as compound (B) a further fungicidally active compound as specified below. Moreover, the invention relates to compositions comprising such compound combination and to the use of the compound combinations and the fungicide compositions as biologically active agent, especially for control of phytopathogenic fungi in crop protection and in the protection of industrial materials and as plant growth regulators.

13 Claims, No Drawings

ACTIVE COMPOUND COMBINATIONS

CROSS REFERENCE TO RELATED APPLICATIONS

This application is a national stage application under 35 U.S.C. § 371 of International Application No. PCT/EP2021/066189, filed internationally on Jun. 16, 2021, which claims the benefit of European Application No.: 20180707.0, filed Jun. 18, 2020.

The present invention relates to active compound combinations, in particular within a fungicide composition, which comprise as compound (A) a compound of formula (I) and as compound (B) a further fungicidally active compound as specified below. Moreover, the invention relates to compositions comprising such compound combination and to the use of the compound combinations and the fungicide compositions as biologically active agent, especially for control of phytopathogenic fungi in crop protection and in the protection of industrial materials and as plant growth regulators.

Throughout this application the terms "composition" and "formulation" are used synonymously and refer to mixtures of a compound combination of the invention and at least one agriculturally suitable auxiliary.

Albeit compounds of formula (I) provide excellent means in protecting plants from diseases caused by fungi, there is still need to even improve those means in order to address the ever increasing environmental and economic requirements imposed on modern-day crop protection agents and compositions. This includes, for example, improvement to the spectrum of action, safety profile, selectivity, application rate, formation of residues, and favourable preparation ability, and development of new compositions to deal with potential problems, like resistances.

The present invention provides active compound combinations and compositions comprising said combinations which at least in some aspects achieve the stated objective.

Accordingly, the present invention provides active compound combinations comprising (A) at least one compound of formula (I)

(I)

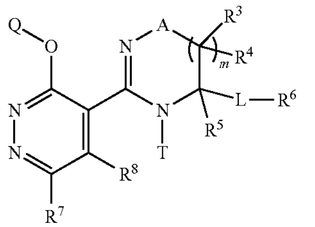

wherein

A is selected from the group consisting of O, S, C(═O), S(═O), S(═O)$_2$, NR$^1$ and CR$^1$R$^2$, with R$^1$ and R$^2$ being independently selected from the group consisting of hydrogen $C_1$-$C_6$-alkyl and $C_3$-$C_8$-cycloalkyl, or R$^1$ and R$^2$ form, together with the carbon atom to which they are attached to, a $C_3$-$C_8$-cycloalkyl or a non-aromatic 3- to 7-membered monocyclic heterocycle;

m is 0, 1 or 2;

T is selected from the group consisting of hydrogen, hydroxyl, $C_1$-$C_6$-alkyl, —C(═O)R$^{a1}$, —C(═O)(OR$^{a1}$), —C(═O)N(R$^{a2}$)$_2$, —S(═O)R$^{a1}$, —S(═O)$_2$R$^{a1}$ and S(═O)$_2$N(R$^{a2}$)$_2$, with R$^{a1}$ being selected from the group consisting of $C_1$-$C_6$-alkyl, $C_1$-$C_6$-haloalkyl, $C_3$-$C_8$-cycloalkyl and $C_2$-$C_6$-alkenyl, with R$^{a2}$ being independently selected from the group consisting of hydrogen, $C_1$-$C_6$-alkyl, $C_1$-$C_6$-haloalkyl, $C_3$-$C_8$-cycloalkyl and $C_2$-$C_6$-alkenyl;

R$^3$ and R$^4$ are independently selected from the group consisting of hydrogen, halogen, cyano, hydroxyl, formyl, carboxyl, $C_1$-$C_6$-alkyl, $C_1$-$C_6$-alkoxy, $C_1$-$C_6$-alkylcarbonyl, $C_1$-$C_6$-alkoxycarbonyl, $C_2$-$C_6$-alkenyl, $C_2$-$C_6$-alkynyl, $C_3$-$C_8$-cycloalkyl, aromatic $C_6$-$C_{14}$-carbocycle, aromatic 5- to 14-membered heterocycle, non-aromatic 3- to 14-membered heterocycle and —O—Si($C_1$-$C_6$-alkyl)$_3$, or R$^3$ and R$^4$ form, together with the carbon atom to which they are attached to, a carbonyl, a methylidene, a $C_3$-$C_8$-cycloalkyl or a non-aromatic 3- to 7-membered monocyclic heterocycle;

R$^5$ is selected from the group consisting of hydrogen, hydroxyl, $C_1$-$C_6$-alkyl, $C_1$-$C_6$-alkoxy, $C_1$-$C_6$-alkylcarbonyloxy, $C_1$-$C_6$-alkylsulfanyl, $C_1$-$C_6$-alkylsulfinyl, $C_1$-$C_6$-alkylsulfonyl, $C_3$-$C_8$-cycloalkyl and —O—Si($C_1$-$C_6$-alkyl)$_3$;

wherein aliphatic R$^1$, R$^2$, R$^3$, R$^4$ and R$^5$ substituents may be substituted with one or more substituents independently selected from the group consisting of halogen, cyano, amino, nitro, hydroxyl, formyl, carboxyl, $C_1$-$C_6$-alkoxy, $C_1$-$C_6$-haloalkoxy, $C_1$-$C_6$-alkoxycarbonyl, $C_3$-$C_8$-cycloalkyl, $C_3$-$C_8$-halocycloalkyl, —O—Si($C_1$-$C_6$-alkyl)$_3$ and non-aromatic 3- to 7-membered monocyclic heterocycle;

wherein cyclic R$^1$, R$^2$, R$^3$, R$^4$ and R$^5$ substituents may be substituted with one or more substituents independently selected from the group consisting of halogen, cyano, nitro, hydroxyl, formyl, oxo, methylidene, $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyl, $C_3$-$C_8$-cycloalkyl, $C_3$-$C_8$-halocycloalkyl, —O—Si($C_1$-$C_6$-alkyl)$_3$ and non-aromatic 3- to 7-membered monocyclic heterocycle;

R$^3$ or R$^4$, and R$^5$ may form, together with the carbon atom to which they are attached to, a $C_3$-$C_8$-cycloalkyl;

L represents a direct bond or L is selected from the group consisting of carbonyl, $C_1$-$C_6$-alkylene, $C_1$-$C_6$-alkylene substituted on a same carbon atom by two substituents forming together with the carbon atom to which they are attached to a $C_3$-$C_8$-cycloalkyl, $C_1$-$C_6$-alkylene substituted on a same carbon atom by two substituents forming together with the carbon atom to which they are attached to a non-aromatic 3- to 7-membered monocyclic heterocycle, $C_2$-$C_6$-alkenylene, $C_2$-$C_6$-alkynylene, $C_3$-$C_8$-cycloalkylene, $C_1$-$C_6$-alkylene-$C_3$-$C_8$-cycloalkylene, $C_3$-$C_8$-cycloalkylene-$C_1$-$C_6$-alkylene, $C_1$-$C_6$-alkylene-$C_3$-$C_8$-cycloalkylene-$C_1$-$C_6$-alkylene, $C_1$-$C_6$-alkylene-(C═O), C(═O)—$C_1$-$C_6$-alkylene, $C_3$-$C_8$-cycloalkenylene, $C_1$-$C_6$-alkylene-$C_3$-$C_8$-cycloalkenylene, $C_3$-$C_8$-cycloalkenylene-$C_1$-$C_6$-alkylene, $C_1$-$C_6$-alkylene-$C_3$-$C_8$-cycloalkenylene-$C_1$-$C_6$-alkylene, non-aromatic 3- to 7-membered monocyclic heterocyclylene, —NR$^{aL1}$—, —NR$^{aL1}$(C═O), —C(═O)NR$^{aL1}$—, —NR$^{aL1}$S(═O)$_2$—, —S(═O)$_2$NR$^{aL1}$—, —C(═NOR$^{aL2}$)—, —C(═N—N(R$^{aL2}$)$_2$) and —C(═NR$^{aL2}$)

with R$^{aL1}$ being selected from the group consisting of hydrogen and $C_1$-$C_6$-alkyl, with R$^{aL2}$ being independently selected from the group consisting of hydrogen, $C_1$-$C_6$-alkyl, $C_1$-$C_6$-haloalkyl, $C_3$-$C_8$-cycloalkyl and $C_2$-$C_6$-alkylenyl, wherein aliphatic L substituents may be substituted with one or more L$^{Sa}$ substituents that may be the same or different wherein cyclic or cyclic moiety of L substituents may be substituted with one or more $L^{Sc}$ substituents that may be the same or different, $L^{sa}$ is selected from the group consisting of halogen, cyano, hydroxyl, carboxyl, methylidene, halomethylidene, $C_1$-$C_6$-alkoxy, $C_1$-$C_6$-haloalkoxy, $C_3$-$C_8$-cycloalkyl, $C_3$-$C_8$-halocycloalkyl, $C_1$-$C_6$-alkoxycarbonyl, —O—Si($C_1$-$C_6$-alkyl)$_3$ and non-aromatic 3- to 7-membered monocyclic heterocycle, $L^{Sc}$ is selected from the group consisting of halogen, cyano, nitro, hydroxyl, formyl, carboxyl, oxo, methylidene, halomethylidene, $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyl, $C_3$-$C_8$-cycloalkyl, $C_3$-$C_8$-halocycloalkyl, —O—Si($C_1$-$C_6$-alkyl)$_3$ and non-aromatic 3- to 7-membered monocyclic heterocycle, and/or two $L^{Sc}$ substituents form, together with the carbon atom to which they are attached to, a $C_3$-$C_8$-cycloalkyl;

$R^6$ is selected from the group consisting of non-aromatic $C_3$-$C_{12}$-carbocycle, aromatic $C_6$-$C_{14}$-carbocycle, non-aromatic 3- to 14-membered heterocycle, aromatic 5- to 14-membered heterocycle, non-aromatic $C_3$-$C_{12}$-carbocyclyloxy, aromatic $C_6$-$C_{14}$-carbocyclyloxy, aromatic 5- to 14-membered heterocyclyloxy, non-aromatic 5- to 14-membered heterocyclyloxy, non-aromatic $C_3$-$C_{12}$-carbocyclylsulfanyl, aromatic $C_6$-$C_{14}$-carbocyclylsulfanyl, aromatic 5- to 14-membered heterocyclylsulfanyl, non-aromatic 5- to 14-membered heterocyclylsulfanyl, non-aromatic $C_3$-$C_{12}$-carbocyclylsulfinyl, aromatic $C_6$-$C_{14}$-carbocyclylsulfinyl, aromatic 5- to 14-membered heterocyclylsulfinyl, non-aromatic 5- to 14-membered heterocyclylsulfinyl, non-aromatic $C_3$-$C_{12}$-carbocyclylsulfonyl, aromatic $C_6$-$C_{14}$-carbocyclylsulfonyl, aromatic 5- to 14-membered heterocyclylsulfonyl, non-aromatic 5- to 14-membered heterocyclylsulfonyl, $C_1$-$C_3$-alkoxy substituted by a non-aromatic $C_3$-$C_{12}$-carbocycle, $C_1$-$C_3$-alkoxy substituted by an aromatic $C_6$-$C_{14}$-carbocycle, $C_1$-$C_3$-alkoxy substituted by a non-aromatic 3- to 14-membered heterocycle, $C_1$-$C_3$-alkoxy substituted by an aromatic 5- to 14-membered heterocycle, $C_1$-$C_3$-haloalkoxy substituted by a non-aromatic $C_3$-$C_{12}$-carbocycle, $C_1$-$C_3$-haloalkoxy substituted by an aromatic $C_6$-$C_{14}$-carbocycle, $C_1$-$C_3$-haloalkoxy substituted by a non-aromatic 3- to 14-membered heterocycle, $C_1$-$C_3$-haloalkoxy substituted by an aromatic 5- to 14-membered heterocycle, $C_1$-$C_3$-sulfanyl substituted by a non-aromatic $C_3$-$C_{12}$-carbocycle, $C_1$-$C_3$-sulfanyl substituted by an aromatic $C_6$-$C_{14}$-carbocycle, $C_1$-$C_3$-sulfanyl substituted by a non-aromatic 3- to 14-membered heterocycle and $C_1$-$C_3$-sulfanyl substituted by an aromatic 5- to 14-membered heterocycle, $C_1$-$C_3$-sulfinyl substituted by a non-aromatic $C_3$-$C_{12}$-carbocycle, $C_1$-$C_3$-sulfinyl substituted by an aromatic $C_6$-$C_{14}$-carbocycle, $C_1$-$C_3$-sulfinyl substituted by a non-aromatic 3- to 14-membered heterocycle and $C_1$-$C_3$-sulfinyl substituted by an aromatic 5- to 14-membered heterocycle, $C_1$-$C_3$-sulfonyl substituted by a non-aromatic $C_3$-$C_{12}$-carbocycle, $C_1$-$C_3$-sulfonyl substituted by an aromatic $C_6$-$C_{14}$-carbocycle, $C_1$-$C_3$-sulfonyl substituted by a non-aromatic 3- to 14-membered heterocycle and $C_1$-$C_3$-sulfonyl substituted by an aromatic 5- to 14-membered heterocycle;

wherein cyclic, or cyclic moiety of, $R^6$ substituents may be substituted with one or more $R^{6S}$ substituents that may be the same or different, $R^{6S}$ is selected from the group consisting of halogen, cyano, isocyano, nitro, hydroxyl, mercapto, pentafluorosulfanyl, oxo, methylidene, halomethylidene, formyl, $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_2$-$C_6$-alkylnyl-oxy, $C_2$-$C_6$-haloalkylnyloxy, $C_1$-$C_6$-alkylsulfanyl, $C_1$-$C_6$-haloalkylsulfanyl, $C_3$-$C_8$-cycloalkylsulfanyl, $C_1$-$C_6$-alkylsulfinyl, $C_1$-$C_6$-haloalkylsulfinyl, $C_3$-$C_8$-cycloalkylsulfinyl, $C_1$-$C_6$-alkylsulfonyl, $C_1$-$C_6$-haloalkylsulfonyl, $C_3$-$C_8$-cycloalkylsulfonyl, $C_3$-$C_8$-cycloalkyl, $C_3$-$C_8$-cycloalkyloxy, $C_3$-$C_8$-cycloalkenyl, aromatic $C_6$-$C_{14}$-carbocycle, aromatic 5- or 6-membered monocyclic heterocycle, non-aromatic 3- to 7-membered monocyclic heterocycle, —N($R^c$)$_2$, O—(C═O)$R^d$, —C(═O)$R^d$, —C(═O)(O$R^d$), —C(═O)N($R^d$)$_2$, —S(═O)$_2$N($R^d$)$_2$, —O—Si($C_1$-$C_6$-alkyl)$_3$ and —Si($C_1$-$C_6$-alkyl)$_3$, or two $R^{6S}$ substituents may form, together with the carbon atom to which they are attached to, a $C_3$-$C_8$-cycloalkyl, with $R^c$ being independently selected from the group consisting of hydrogen, $C_1$-$C_6$-alkyl and $C_3$-$C_8$-cycloalkyl, with $R^d$ being independently selected from the group consisting of hydrogen, $C_1$-$C_6$-alkyl and $C_1$-$C_6$-haloalkyl, wherein aliphatic $R^{6S}$, $R^c$ and $R^d$ substituents may be substituted with one or more substituents independently selected from the group consisting of cyano, halogen, hydroxyl, $C_1$-$C_6$-alkoxy, $C_1$-$C_6$-haloalkoxy, —O—Si($C_1$-$C_6$-alkyl)$_3$, —Si($C_1$-$C_6$-alkyl)$_3$, $C_3$-$C_8$-cycloalkyl, $C_3$-$C_8$-halocycloalkyl and non-aromatic 3- to 7-membered monocyclic heterocycle, wherein cyclic or cyclic moiety of $R^{6S}$ and cyclic $R^c$ substituents may be substituted with one or more substituents independently selected from the group consisting of halogen, cyano, nitro, hydroxyl, formyl, carboxyl, oxo, methylidene, halomethylidene, $C_1$-$C_6$-alkyl, $C_1$-$C_6$-haloalkyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_2$—C-alkenyl, $C_3$-$C_8$-cycloalkyl and $C_3$-$C_8$-halocycloalkyl, and/or cyclic or cyclic moiety of $R^{6S}$ substituents may be substituted with two substituents forming, together with the carbon atom to which they are attached to, a $C_3$-$C_8$-cycloalkyl;

$R^7$ is selected from the group consisting of hydrogen, halogen, cyano, isocyano, hydroxyl, mercapto, nitro, amino, formyl, $C_1$-$C_6$-alkyl, $C_1$-$C_6$-haloalkyl, $C_1$-$C_6$-hydroxyalkyl, $C_1$-$C_6$-alkoxy, $C_1$-$C_6$-haloalkoxy, $C_1$-$C_6$-alkylcarbonyl, $C_1$-$C_6$-haloalkylcarbonyl, $C_1$-$C_6$-alkoxycarbonyl, $C_1$-$C_6$-haloalkoxycarbonyl, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_2$-$C_6$-alkynyloxy, $C_2$-$C_6$-haloalkynyloxy, $C_1$-$C_6$-alkylsulfanyl, $C_1$-$C_6$-haloalkylsulfanyl, $C_3$-$C_8$-cycloalkylsulfanyl, $C_2$-$C_6$-alkenylsulfanyl, $C_2$-$C_6$-alkynylsulfanyl, $C_1$-$C_6$-alkylsulfinyl, $C_1$-$C_6$-haloalkylsulfinyl, $C_3$-$C_8$-cycloalkylsulfinyl, $C_1$-$C_6$-alkylsulfonyl, $C_1$-$C_6$-haloalkylsulfonyl, $C_3$-$C_8$-cycloalkylsulfonyl, $C_3$-$C_8$-cycloalkyl, $C_3$-$C_6$-cycloalkenyl, aromatic $C_6$-$C_{14}$-carbocycle, aromatic 5- or 6-membered monocyclic heterocycle, non-aromatic 3- to 7-membered monocyclic heterocycle, $C_3$-$C_8$-cycloalkyloxy, aromatic $C_6$-$C_{14}$-carbocyclyloxy, aromatic 5- or 6-membered monocyclic heterocyclyloxy, non-aromatic 3- to 7-membered monocyclic heterocyclyloxy, —O—Si $(C_1-C_6\text{-alkyl})_3$, —Si($C_1$-$C_6$-alkyl)$_3$, —N($R^e$)$_2$, —C(=N$R^f$)$R^f$, N$R^g$C(=O)$R^g$, —C(=O)(O$R^g$), —C(=O)N($R^g$)$_2$, —S(=O)$_2$N($R^g$)$_2$ and —S(=O)(=N$R^g$)$R^g$, with $R^e$ being independently selected from the group consisting of hydrogen, $C_1$-$C_6$-alkyl, $C_1$-$C_6$-haloalkyl, $C_1$-$C_6$-alkoxy, $C_2$-$C_6$-alkenyl, $C_2$-$C_6$-haloalkenyl, $C_2$-$C_6$-alkynyl, $C_2$-$C_6$-haloalkynyl, $C_3$-$C_8$-cycloalkyl, $C_3$-$C_8$-halocycloalkyl, aromatic $C_6$-$C_{14}$-carbocycle, aromatic 5- or 6-membered monocyclic heterocycle and non-aromatic 3- to 7-membered monocyclic heterocycle, with $R^f$ being independently selected from the group consisting of hydroxyl, amino, cyano, $C_1$-$C_6$-alkyl, $C_1$-$C_6$-haloalkyl, $C_1$-$C_6$-alkoxy, $C_1$-$C_6$-alkylamino and di($C_1$-$C_6$-alkyl)amino, with $R^g$ being independently selected from the group consisting of hydrogen, $C_1$-$C_6$-alkyl, $C_1$-$C_6$-haloalkyl and $C_3$-$C_8$-cycloalkyl, wherein aliphatic $R^7$, $R^e$, $R^f$ and $R^g$ substituents may be substituted with one or more $R^{7Sa}$ substituents that may be the same or different, wherein cyclic or cyclic moiety of $R^7$, cyclic $R^e$ and cyclic $R^g$ substituents may be substituted with one or more $R^{7Sc}$ substituents that may be the same or different, $R^{7Sa}$ is selected from the group consisting of cyano, hydroxyl, carboxyl, $C_1$-$C_6$-alkoxy, $C_1$-$C_6$-haloalkoxy, $C_3$-$C_8$-cycloalkyl, $C_3$-$C_8$-halocycloalkyl, $C_1$-$C_6$-alkoxycarbonyl, —O—Si($C_1$-$C_6$-alkyl)$_3$, —Si($C_1$-$C_6$-alkyl)$_3$, aromatic $C_6$-$C_{14}$-carbocycle and non-aromatic 3- to 7-membered monocyclic heterocycle, $R^{7Sc}$ is selected from the group consisting of halogen, cyano, nitro, hydroxyl, formyl, oxo, methylidene, halomethylidene, $C_1$-$C_6$-alkyl, $C_1$-$C_6$-haloalkyl $C_1$-$C_6$-alkoxy, $C_1$-$C_6$-haloalkoxy, $C_2$-$C_6$-alkenyl, $C_3$-$C_8$-cycloalkyl, $C_3$-$C_8$-halocycloalkyl, —O—Si($C_1$-$C_6$-alkyl)$_3$ and non-aromatic 3- to 7-membered monocyclic heterocycle, or two $R^{7Sc}$ substituents form, together with the carbon atom to which they are attached to, a $C_3$-$C_8$-cycloalkyl;

$R^8$ is selected from the group consisting of hydrogen, halogen, cyano, isocyano, amino, nitro, hydroxyl, mercapto, carboxyl, $C_1$-$C_6$-alkoxycarbonyl, $C_1$-$C_6$-alkyl, $C_1$-$C_6$-haloalkyl, $C_1$-$C_6$-hydroxyalkyl, $C_1$-$C_6$-alkoxy, $C_1$-$C_6$-haloalkoxy, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_2$-$C_6$-alkynyloxy, $C_2$-$C_6$-haloalkynyloxy, $C_3$-$C_8$-cycloalkyl, $C_3$-$C_6$-cycloalkenyl, aromatic $C_6$-$C_{14}$-carbocycle, non-aromatic 3- to 14-membered heterocycle, aromatic 5- to 14-membered heterocycle, $C_3$-$C_8$-cycloalkyloxy, aromatic $C_6$-$C_{14}$-carbocyclyloxy, non-aromatic 3- to 14-membered heterocyclyloxy, aromatic 5- to 14-membered heterocyclyloxy, —O—Si($C_1$-$C_6$-alkyl)$_3$, —Si($C_1$-$C_6$-alkyl)$_3$, —N($R^h$)$_2$, —S$R^i$, —S(=O)$R^i$ and —S(=O)$_2$$R^i$, with $R^h$ being independently selected from the group consisting of hydrogen, $C_1$-$C_6$-alkyl, $C_1$-$C_6$-haloalkyl, $C_1$-$C_6$-alkoxy, $C_2$-$C_6$alkenyl, $C_2$-$C_6$haloalkenyl, $C_2$-$C_6$-alkynyl, $C_2$-$C_6$-haloalkynyl, $C_3$-$C_8$-cycloalkyl, $C_3$-$C_8$-halocycloalkyl, aromatic $C_6$-$C_{14}$-carbocycle, aromatic 5- to 14-membered heterocycle and non-aromatic 3- to 7-membered monocyclic heterocycle, with $R^i$ being selected from the group consisting of $C_1$-$C_6$-alkyl, $C_1$-$C_6$-haloalkyl, $C_2$-$C_6$-alkenyl, $C_2$-$C_6$ haloalkenyl, $C_2$-$C_6$-alkynyl, $C_2$-$C_6$-haloalkynyl, $C_3$-$C_8$-cycloalkyl, $C_3$-$C_8$-halocycloalkyl, aromatic $C_6$-$C_{14}$-carbocycle, aromatic 5- to 14-membered heterocycle and non-aromatic 3- to 7-membered monocyclic heterocycle, wherein aliphatic $R^8$, $R^h$ and $R^i$ substituents may be substituted with one or more $R^{8Sa}$ substituents that may be the same or different, wherein cyclic or cyclic moiety of $R^8$, cyclic $R^h$ and cyclic $R^i$ substituents may be substituted with one or more $R^{8Sc}$ substituents that may be the same or different, $R^{8Sa}$ is selected from the group consisting of cyano, amino, nitro, hydroxyl, formyl, carboxyl, $C_1$-$C_6$-alkoxy, $C_1$-$C_6$-haloalkoxy, $C_1$-$C_6$-alkoxy-$C_1$-$C_6$-alkoxy, $C_1$-$C_6$-alkoxycarbonyl, $C_1$-$C_6$-haloalkoxycarbonyl, $C_1$-$C_6$-alkylcarbonyl, $C_1$-$C_6$-haloalkylcarbonyl, $C_3$-$C_8$-cycloalkyl, $C_3$-$C_8$-halocycloalkyl, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl, —O—Si($C_1$-$C_6$-alkyl)$_3$, —Si($C_1$-$C_6$-alkyl)$_3$, non-aromatic 3- to 7-membered monocyclic heterocycle and —N($R^{a'}$)$_2$ with $R^{a'}$ being independently selected from the group consisting of hydrogen, formyl, $C_1$-$C_6$-alkyl, $C_1$-$C_6$-haloalkyl, $C_3$-$C_8$-cycloalkyl and $C_1$-$C_6$-alkylcarbonyl, wherein said non-aromatic 3- to 7-membered monocyclic heterocycle $R^{8Sa}$ may be substituted with one or more $C_1$-$C_6$-alkyl substituents that may be the same or different, $R^{8Sc}$ is selected from the group consisting of halogen, cyano, amino, nitro, hydroxyl, formyl, carboxyl, oxo, methylidene, halomethylidene, $C_1$-$C_6$-alkyl, $C_1$-$C_6$-haloalkyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_2$-$C_6$-alkenyl, $C_1$-$C_6$-alkylsulfanyl, $C_1$-$C_6$-alkylsulfinyl, $C_1$-$C_6$-alkylsulfonyl, $C_3$-$C_8$-cycloalkyl, $C_3$-$C_8$-halocycloalkyl, —O—Si($C_1$-$C_6$-alkyl)$_3$ and non-aromatic 3- to 7-membered monocyclic heterocycle that may be substituted with one or more $C_1$-$C_6$-alkyl substituents that may be the same or different, or two $R^{8Sc}$ substituents form, together with the carbon atom to which they are attached to, a $C_3$-$C_8$-cycloalkyl or a non-aromatic 3- to 7-membered monocyclic heterocycle, wherein said non-aromatic 3- to 7-membered monocyclic heterocycle may be substituted with one or more $C_1$-$C_6$-alkyl substituents that may be the same or different;

Q is selected from the group consisting of aromatic $C_6$-$C_{14}$-carbocycle, non-aromatic $C_3$-$C_{12}$-carbocycle, non-aromatic 3- to 14-membered heterocycle and aromatic 5- to 14-membered heterocycle, wherein any of said carbocycle or heterocycle groups may be substituted with one or more $Q^S$ substituents that may be the same or different, $Q^S$ is selected from the group consisting of halogen, cyano, isocyano, nitro, hydroxyl, mercapto, formyl, carboxyl, $C_1$-$C_6$-alkyl, $C_1$-$C_6$-haloalkyl, $C_1$-$C_6$-alkylcarbonyl, $C_1$-$C_6$-haloalkylcarbonyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_2$-$C_6$ alkenyl, $C_2$-$C_6$-haloalkenyl, $C_2$—C-alkynyl, $C_2$-$C_6$-haloalkynyl, $C_2$-$C_6$-alkenyloxy, $C_2$-$C_6$-haloalkenyloxy, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl, $C_3$-$C_8$-cycloalkyl, $C_3$-$C_8$-cycloalkyloxy, $C_3$-$C_6$-cycloalkenyl, non-aromatic 3- to 7-membered monocyclic heterocycle, aromatic $C_6$-$C_{14}$-carbocycle, aromatic 5- to 14-membered heterocycle, —O—Si($C_1$-$C_6$-alkyl)$_3$, —Si($C_1$-$C_6$-alkyl)$_3$, —O—C(═O)$R^j$, —$NR^j$C(═O)$R^j$, —C(═O)N($R^j$)$_2$, —C(═S)$R^j$, —C(═S)N($R^j$)$_2$, —C(═$NR^j$)$R^j$ and —C(═$NOR^j$)$R^j$ and —N($R^k$)$_2$ with $R^j$ being independently selected from the group consisting of hydrogen, $C_1$-$C_6$-alkyl, $C_1$-$C_6$-haloalkyl and $C_1$-$C_6$-alkoxy, with $R^k$ being independently selected from the group consisting of hydrogen, hydroxyl, $C_1$-$C_6$-alkyl, $C_1$-$C_6$-haloalkyl, $C_1$-$C_6$-alkoxy, $C_2$-$C_6$-alkenyl, $C_2$-$C_6$-haloalkenyl and $C_3$-$C_8$-cycloalkyl, wherein aliphatic $Q^S$, $R^j$ and $R^k$ substituents may be substituted with one or more substituents independently selected from the group consisting of cyano, amino, nitro, hydroxyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_3$-$C_8$-cycloalkyl, $C_3$-$C_8$-halocycloalkyl, —Si($C_1$-$C_6$-alkyl)$_3$ and non-aromatic 3- to 7-membered monocyclic heterocycle, wherein cyclic or cyclic moiety of $Q^S$ and cyclic $R^k$ substituents may be substituted with one or more $R^{Qs}$ substituents independently selected from the group consisting of halogen, cyano, amino, nitro, hydroxyl, formyl, carboxyl, oxo, methylidene, halomethylidene, $C_1$-$C_6$-alkyl, $C_1$-$C_6$-haloalkyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_3$-$C_8$-cycloalkyl, $C_3$-$C_8$-halocycloalkyl, $C_2$-$C_6$-alkenyl and non-aromatic 3- to 7-membered monocyclic heterocycle, wherein cyclic $R^{Qs}$ substituents may be substituted with two substituents forming, together with the carbon atom to which they are attached to, a $C_3$-$C_8$-cycloalkyl, and (B) at least one further active compound selected from
(1) inhibitors of the ergosterol synthesis,
(2) inhibitors of the respiratory chain at complex I or II,
(3) inhibitors of the respiratory chain at complex III,
(4) inhibitors of the mitosis and cell division,
(5) compounds capable of having a multisite action,
(6) compounds capable of inducing a host defense,
(7) inhibitors of the amino acid and/or protein biosynthesis,
(8) inhibitors of the ATP production,
(9) inhibitors of the cell wall synthesis,
(10) inhibitors of the lipid and membrane synthesis,
(11) inhibitors of the melanine biosynthesis,
(12) inhibitors of the nucleic acid synthesis,
(13) inhibitors of the signal transduction,
(14) compounds capable of acting as uncoupler,
(15) other fungicides,
(16) antibacterial agents
(17) biological fungicides
(18) fatty acids or derivatives thereof.

Compound (A)

The active compound combinations according to the invention comprise as compound (A) at least one compound of formula (I) or a salt or N-oxide thereof.

In a preferred embodiment compounds according to the present invention are compounds of formula (I), wherein A is selected from the group consisting of O, S, C(═O), S(═O), S(═O)$_2$, $NR^1$ and $CR^1R^2$, with $R^1$ and $R^2$ being independently selected from the group consisting of hydrogen, $C_1$-$C_4$-alkyl and $C_3$-$C_6$-cycloalkyl, m is 0, 1 or 2;

T is selected from the group consisting of hydrogen and $C_1$-$C_4$-alkyl, $R^3$ and $R^4$ are independently selected from the group consisting of hydrogen, fluorine, chlorine, $C_1$-$C_4$-alkyl, $C_2$-$C_4$-alkenyl, $C_2$-$C_4$-alkynyl, $C_3$-$C_8$-cycloalkyl, $R^5$ is selected from the group consisting of hydrogen, hydroxyl, $C_1$-$C_4$-alkyl, $C_1$-$C_4$-alkoxy, $C_1$-$C_4$-alkylsulfanyl, wherein aliphatic $R^1$, $R^2$, $R^3$, $R^4$ and $R^5$ substituents may be substituted with one to three substituents independently selected from the group consisting of fluorine, chlorine, $C_1$-$C_4$-alkoxy, $C_1$-$C_4$-haloalkoxy, $C_3$-$C_6$-cycloalkyl, $C_3$-$C_6$-halocycloalkyl, wherein cyclic $R^1$, $R^2$, $R^3$, $R^4$ and $R^5$ substituents may be substituted with one to three substituents independently selected from the group consisting of fluorine, chlorine oxo, methylidene, $C_1$-$C_4$-alkyl, $C_1$-$C_4$-haloalkyl, $C_1$-$C_4$-alkoxy, $C_1$-$C_4$-haloalkoxy, $C_2$-$C_4$-alkenyl, $C_3$-$C_6$-cycloalkyl, $C_3$-$C_6$-halocycloalkyl, $R^3$ or $R^4$, and $R^5$ may form, together with the carbon atom to which they are attached to, a $C_3$-$C_6$-cycloalkyl;

L represents a direct bond or L is selected from the group consisting of $C_1$-$C_6$-alkylene, $C_1$-$C_6$-alkylene substituted on a same carbon atom by two substituents forming together with the carbon atom to which they are attached to a $C_3$-$C_6$-cycloalkyl, $C_1$-$C_6$-alkylene substituted on a same carbon atom by two substituents forming together with the carbon atom to which they are attached to a non-aromatic 3- to 7-membered monocyclic heterocycle, wherein aliphatic L substituents may be substituted with one to three $L^{Sa}$ substituents independently selected from the group consisting of fluorine, chlorine, hydroxyl, $C_1$-$C_4$-alkoxy, $C_1$-$C_4$-haloalkoxy, $C_3$-$C_6$-cycloalkyl and $C_3$-$C_6$-halocycloalkyl, wherein cyclic or cyclic moiety of L substituents may be substituted with one to three $L^{Sc}$ substituents independently selected from the group consisting of fluorine, chlorine, hydroxyl, oxo, $C_1$-$C_4$-alkyl, $C_1$-$C_4$-haloalkyl, $C_1$-$C_4$-alkoxy, $C_1$-$C_4$-haloalkoxy, $C_2$-$C_4$alkenyl, $C_3$-$C_6$-cycloalkyl and $C_3$-$C_6$-halocycloalkyl, $R^6$ is selected from the group consisting of non-aromatic $C_3$-$C_{12}$-carbocycle, aromatic $C_6$-$C_{14}$-carbocycle, non-aromatic 3- to 14-membered heterocycle, aromatic 5- to 14-membered heterocycle, non-aromatic $C_3$-$C_{12}$-carbocyclyloxy, aromatic $C_6$-$C_{14}$-carbocyclyloxy, aromatic 5- to 14-membered heterocyclyloxy, non-aromatic 5- to 14-membered heterocyclyloxy, non-aromatic $C_3$-$C_{12}$-carbocyclylsulfanyl, aromatic $C_6$-$C_{14}$-carbocyclylsulfanyl, aromatic 5- to 14-membered heterocyclylsulfanyl and non-aromatic 5- to 14-membered heterocyclylsulfanyl, wherein cyclic, or cyclic moiety of, $R^6$ substituents may be substituted with one to three $R^{6S}$ substituents that may be the same or different, $R^{6S}$ is selected from the group consisting of halogen, cyano, nitro, hydroxyl, mercapto, pentafluorosulfanyl, oxo, methylidene, halomethylidene, $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyl, $C_2$-$C_6$-haloalkenyl, $C_2$-$C_6$-alkynyl, $C_2$-$C_6$-haloalkynyl, $C_1$-$C_6$-alkylsulfanyl, $C_1$-$C_6$-haloalkylsulfanyl, $C_3$-$C_6$-cycloalkylsulfanyl, $C_3$-$C_6$-cycloalkyl, $C_3$-$C_6$-cycloalkyloxy, phenyl, naphthyl aromatic 5- or 6-membered monocyclic heterocycle, non-aromatic 3- to 7-membered monocyclic heterocycle, —C(═O)($OR^d$) and —C(═O)N($R^d$)$_2$, with $R^d$ being independently selected from the group consisting of hydrogen, $C_1$-$C_4$-alkyl and $C_1$-$C_4$-haloalkyl, wherein aliphatic $R^{6S}$, $R^c$ and $R^d$ substituents may be substituted with one to three substituents independently selected from the group consisting of fluorine, chlorine hydroxyl, $C_1$-$C_4$-alkoxy, $C_1$-$C_4$-haloalkoxy, $C_3$-$C_6$-cycloalkyl and $C_3$-$C_6$-halocycloalkyl, wherein cyclic or cyclic moiety of $R^{6S}$ and cyclic $R^c$ substituents may be substituted with one to three substituents independently selected from the group consisting of fluorine, chlorine $C_1$-$C_4$-alkyl, $C_1$-$C_4$-haloalkyl, $C_1$-$C_4$-alkoxy and $C_1$-$C_4$-haloalkoxy, $R^7$ is selected from the group consisting of hydrogen, halogen, cyano, hydroxyl, mercapto, $C_1$-$C_4$-alkyl, $C_1$-$C_4$-haloalkyl, $C_1$-$C_4$-hydroxyalkyl, $C_1$-$C_4$-alkoxy, $C_1$-$C_4$-haloalkoxy, $C_1$-$C_4$-alkylcarbonyl, $C_1$-$C_4$-haloalkylcarbonyl, $C_2$-$C_4$-alkenyl, $C_2$-$C_4$-haloalkenyl, $C_2$-$C_4$-alkynyl, $C_2$-$C_4$-haloalkynyl, $C_1$-$C_4$-alkylsulfanyl, $C_1$-$C_4$-haloalkylsulfanyl, $C_3$-$C_6$-cycloalkylsulfanyl, $C_1$-$C_4$-alkylsulfinyl, $C_1$-$C_4$-haloalkylsulfinyl, $C_3$-$C_6$-cycloalkylsulfinyl, $C_1$-$C_4$-alkylsulfonyl, $C_1$-$C_4$-haloalkylsulfonyl, $C_3$-$C_6$-cycloalkylsulfonyl, $C_3$-$C_6$-cycloalkyl, $C_3$-$C_6$-cycloalkenyl, phenyl, naphthyl, aromatic 5- or 6-membered monocyclic heterocycle, non-aromatic 3- to 7-membered monocyclic heterocycle, $C_3$-$C_8$-cycloalkyloxy, aromatic $C_6$-$C_{14}$-carbocyclyloxy, aromatic 5- or 6-membered monocyclic heterocyclyloxy, non-aromatic 3- to 7-membered monocyclic heterocyclyloxy, —$N(R^e)_2$, —$C(=NR^f)R^f$, $NR^gC(=O)R^g$, —$C(=O)(OR^g)$, —$C(=O)N(R^g)_2$, —$S(=O)_2N(R^g)_2$ and —$S(=O)(=NR^g)R^g$, with $R^e$ being independently selected from the group consisting of hydrogen, $C_1$-$C_4$-alkyl, $C_1$-$C_4$-haloalkyl, $C_2$-$C_4$-alkenyl, $C_2$-$C_4$-haloalkenyl, $C_2$-$C_4$-alkynyl, $C_2$-$C_4$-haloalkynyl, $C_3$-$C_6$-cycloalkyl, $C_3$-$C_6$-halocycloalkyl, with $R^f$ being independently selected from the group consisting of hydroxyl, $C_1$-$C_4$-alkyl, $C_1$-$C_4$-haloalkyl, $C_1$-$C_4$-alkoxy, with $R^g$ being independently selected from the group consisting of hydrogen, $C_1$-$C_4$-alkyl, $C_1$-$C_4$-haloalkyl and $C_3$-$C_6$-cycloalkyl, wherein aliphatic $R^7$, $R^e$, $R^f$ and $R^g$ substituents may be substituted with one to three $R^{7Sa}$ substituents that may be the same or different, wherein cyclic or cyclic moiety of $R^7$, cyclic $R^e$ and cyclic $R^g$ substituents may be substituted with one to three $R^{7Sc}$ substituents that may be the same or different, $R^{7Sa}$ is selected from the group consisting of hydroxyl, $C_1$-$C_4$-alkoxy, $C_1$-$C_4$-haloalkoxy, $C_3$-$C_6$-cycloalkyl, $R^{7Sc}$ is selected from the group consisting of fluorine, chlorine hydroxyl, oxo, $C_1$-$C_4$-alkyl, $C_1$-$C_4$-haloalkyl $C_1$-$C_4$-alkoxy, $C_1$-$C_4$-haloalkoxy, $C_3$-$C_6$-cycloalkyl, $R^8$ is selected from the group consisting of hydrogen, halogen, amino, hydroxyl, mercapto, $C_1$-$C_4$-alkyl, $C_1$-$C_4$-haloalkyl, $C_1$-$C_4$-hydroxyalkyl, $C_1$-$C_4$-alkoxy, $C_1$-$C_4$-haloalkoxy, $C_2$-$C_4$-alkenyl, $C_2$-$C_4$-haloalkenyl, $C_2$-$C_4$-alkynyl, $C_2$-$C_4$-haloalkynyl, $C_2$-$C_4$-alkenyloxy, $C_2$-$C_4$-haloalkenyloxy, $C_2$-$C_4$-alkynyloxy, $C_2$-$C_4$-haloalkynyloxy, $C_3$-$C_6$-cycloalkyl, $C_3$-$C_8$-cycloalkenyl, phenyl, naphthyl, non-aromatic 3- to 7-membered heterocycle, aromatic 5- or 6-membered heterocycle, $C_3$-$C_8$-cycloalkyloxy, phenyloxy, naphthyloxy, non-aromatic 3- to 7-membered heterocyclyloxy, aromatic 5- or 6-membered heterocyclyloxy, —$N(R^h)_2$, —$SR^i$, —$S(=O)R^i$ and —$S(=O)_2R^i$, with $R^h$ being independently selected from the group consisting of hydrogen, $C_1$-$C_4$-alkyl, $C_1$-$C_4$-haloalkyl, $C_2$-$C_4$alkenyl, $C_2$-$C_4$haloalkenyl, $C_3$-$C_6$-cycloalkyl, $C_3$-$C_6$-halocycloalkyl, phenyl, naphthyl aromatic 5- or 6-membered heterocycle and non-aromatic 3- to 7-membered monocyclic heterocycle, with $R^i$ being selected from the group consisting of $C_1$-$C_4$-alkyl, $C_1$-$C_4$-haloalkyl, $C_2$-$C_4$-alkenyl, $C_2$-$C_4$-haloalkenyl, $C_2$-$C_4$-alkynyl, $C_2$-$C_4$-haloalkynyl, $C_3$-$C_6$-cycloalkyl, $C_3$-$C_6$-halocycloalkyl, phenyl, naphthyl, aromatic 5- or 6-membered heterocycle and non-aromatic 3- to 7-membered monocyclic heterocycle, wherein aliphatic $R^g$, $R^h$ and $R^i$ substituents may be substituted with one to three $R^{8Sa}$ substituents that may be the same or different, wherein cyclic or cyclic moiety of $R^8$, cyclic $R^h$ and cyclic $R^i$ substituents may be substituted with one to three $R^{8Sc}$ substituents that may be the same or different, $R^{8Sa}$ is selected from the group consisting of hydroxyl, carboxyl, $C_1$-$C_4$-alkoxy, $C_1$-$C_4$-haloalkoxy, $C_1$-$C_4$-alkoxycarbonyl, $C_1$-$C_4$-haloalkoxycarbonyl, $C_3$-$C_6$-cycloalkyl, $C_3$-$C_6$-halocycloalkyl, $C_1$-$C_4$-alkylsulfanyl, $C_1$-$C_4$-haloalkylsulfanyl, $C_1$-$C_4$-alkylsulfinyl, $C_1$-$C_4$-haloalkylsulfinyl, $C_1$-$C_4$-alkylsulfonyl, $C_1$-$C_4$-haloalkylsulfonyl,—and non-aromatic 3- to 7-membered monocyclic heterocycle, wherein said non-aromatic 3- to 7-membered monocyclic heterocycle $R^{8Sa}$ may be substituted with one or two $C_1$-$C_4$-alkyl substituents that may be the same or different, $R^{8Sc}$ is selected from the group consisting of halogen, oxo, $C_1$-$C_4$-alkyl, $C_1$-$C_4$-haloalkyl, $C_1$-$C_4$-alkoxy, $C_1$-$C_4$-haloalkoxy and $C_3$-$C_6$-cycloalkyl, Q is selected from the group consisting of phenyl, naphthyl, non-aromatic $C_5$-$C_{10}$-carbocycle, non-aromatic 5- to 10-membered heterocycle and aromatic 5- to 10-membered heterocycle, wherein any of said carbocycle or heterocycle groups may be substituted with one to three $Q^S$ substituents that may be the same or different, $Q^S$ is selected from the group consisting of halogen, cyano, nitro, formyl, carboxyl, $C_1$-$C_4$-alkyl, $C_1$-$C_4$-haloalkyl, $C_1$-$C_4$-alkylcarbonyl, $C_1$-$C_4$-haloalkylcarbonyl, $C_1$-$C_4$-alkoxy, $C_1$-$C_4$-haloalkoxy, $C_1$-$C_4$-alkoxycarbonyl, $C_1$-$C_4$-haloalkoxycarbonyl, $C_2$-$C_4$alkenyl, $C_2$-$C_4$haloalkenyl, $C_2$-$C_4$-alkynyl, $C_2$-$C_4$-haloalkynyl, $C_1$-$C_4$-alkylsulfanyl, $C_1$-$C_4$-haloalkylsulfanyl, $C_1$-$C_4$-alkylsulfinyl, $C_1$-$C_4$-haloalkylsulfinyl, $C_1$-$C_4$-alkylsulfonyl, $C_1$-$C_4$-haloalkylsulfonyl, $C_3$-$C_6$-cycloalkyl, non-aromatic 3- to 7-membered monocyclic heterocycle, phenyl, naphthyl and aromatic 5- to 10-membered heterocycle, wherein aliphatic $Q^S$, $R^j$ and $R^k$ substituents may be substituted with one to three substituents independently selected from the group consisting of hydroxyl, $C_1$-$C_4$-alkoxy, $C_1$-$C_4$-haloalkoxy, $C_3$-$C_6$-cycloalkyl and $C_3$-$C_6$-halocycloalkyl, wherein cyclic or cyclic moiety of $Q^S$ and cyclic $R^k$ substituents may be substituted with one to three $R^{Qs}$ substituents independently selected from the group consisting of fluorine, chlorine, $C_1$-$C_4$-alkyl, $C_1$-$C_4$-haloalkyl, $C_1$-$C_4$-alkoxy, $C_1$-$C_4$-haloalkoxy and $C_3$-$C_6$-cycloalkyl.

In a more preferred embodiment compounds according to the present invention are compounds of formula (I), wherein A is selected from the group consisting of O, $S(=O)_2$, $NR^1$ and $CR^1R^2$, with $R^1$ and $R^2$ being independently selected from the group consisting of hydrogen, $C_1$-$C_4$-alkyl and $C_3$-$C_6$-cycloalkyl, m is 0, 1 or 2;

T is selected from the group consisting of hydrogen and $C_1$-$C_4$-alkyl, $R^3$ and $R^4$ are independently selected from the group consisting of hydrogen, fluorine, chlorine, $C_1$-$C_4$-alkyl, $C_2$-$C_4$-alkenyl, $C_2$-$C_4$-alkynyl and $C_3$-$C_6$-cycloalkyl, $R^5$ is selected from the group consisting of hydrogen, hydroxyl, $C_1$-$C_4$-alkyl and $C_1$-$C_4$-alkoxy, L represents a direct bond or L is selected from the group consisting of $C_1$-$C_6$-alkylene, wherein aliphatic L substituents may be substituted with one to three $L^{Sa}$ substituents independently selected from the group consisting of fluorine, chlorine, hydroxyl, $C_1$-$C_4$-alkoxy, $C_1$-$C_4$-haloalkoxy and $C_3$-$C_6$-cycloalkyl, wherein cyclic or cyclic moiety of L substituents may be substituted with one to three $L^{Sc}$ substituents independently selected from the group consisting of fluorine, chlorine, hydroxyl, oxo, $C_1$-$C_4$-alkyl, $C_1$-$C_4$-haloalkyl, $C_1$-$C_4$-alkoxy, $C_1$-$C_4$-haloalkoxy and $C_3$-$C_6$-cycloalkyl, $R^6$ is selected from the group consisting of non-aromatic $C_5$-$C_{10}$-carbocycle, phenyl, naphthyl, non-aromatic 5- to 10-membered heterocycle, aromatic 5- to 10-membered heterocycle, non-aromatic $C_5$-$C_{10}$-carbocyclyloxy, phenoxy, naphthyloxy, aromatic 5- to 10-membered heterocyclyloxy, non-aromatic 5- to 10-membered heterocyclyloxy and phenylsulfanyl, wherein cyclic, or cyclic moiety of $R^6$ substituents may be substituted with one to three $R^{6S}$ substituents independently selected from the group consisting of halogen, nitro, hydroxyl, $C_1$-$C_4$-alkyl, $C_1$-$C_4$-haloalkyl, $C_1$-$C_4$-alkoxy, $C_1$-$C_4$-haloalkoxy, $C_2$-$C_4$-alkenyl, $C_2$-$C_4$-alkynyl, $C_1$-$C_4$-haloalkylsulfanyl, cyclopropyl, cyclobutyl, cyclopentyl, pyridinyl, oxetanyl and tetrahydrofuranyl, wherein cyclic $R^{6S}$ substituents may be substituted with one or two substituents independently selected from the group consisting of halogen, $C_1$-$C_4$-alkyl, $C_1$-$C_4$-haloalkyl and $C_1$-$C_4$-alkoxycarbonyl, $R^7$ is selected from the group consisting of hydrogen, halogen, cyano, $C_1$-$C_4$-alkyl, $C_1$-$C_4$-haloalkyl, $C_1$-$C_4$-hydroxyalkyl, $C_1$-$C_4$-alkylcarbonyl, $C_1$-$C_4$-alkoxy, $C_2$-$C_4$-alkenyl, $C_2$-$C_4$-alkynyl, $C_1$-$C_4$-alkylsulfanyl, $C_1$-$C_4$-alkenylsulfanyl, $C_1$-$C_4$-alkylsulfonyl, $C_3$-$C_8$-cycloalkyl, pyridinyl, imidazolyl, pyrazolyl, thiazolyl, oxetanyl, tetrahydrofuranyl, pyrrolidinyl, —$N(R^e)_2$, —$C(=NR^f)R^f$ and —$C(=O)N(R^g)_2$, with $R^e$ being independently selected from the group consisting of hydrogen, $C_1$-$C_4$-alkyl and $C_3$-$C_6$-cycloalkyl, with $R^f$ being independently selected from the group consisting of $C_1$-$C_4$-alkyl and $C_1$-$C_4$-alkoxy, with $R^g$ being independently selected from the group consisting of hydrogen, $C_1$-$C_4$-alkyl and $C_3$-$C_6$-cycloalkyl, wherein said aliphatic $R^7$, $R^e$ and $R^g$ substituents may be substituted with one to three $R^{7Sa}$ substituents independently selected from the group consisting of hydroxyl, $C_1$-$C_4$-alkoxy and $C_3$-$C_6$-cycloalkyl, wherein said cyclic $R^7$, $R^e$ and $R^g$ substituents may be substituted with one to three $R^{7Sc}$ substituents independently selected from the group consisting of halogen, hydroxyl, $C_1$-$C_4$-alkyl and $C_1$-$C_4$-alkoxy, $R^8$ is selected from the group consisting of hydrogen, halogen, hydroxyl, $C_1$-$C_4$-alkyl, $C_1$-$C_4$-haloalkyl, $C_1$-$C_4$-alkoxy, $C_2$-$C_4$-alkenyl, $C_1$-$C_4$-alkylsulfanyl, $C_1$-$C_4$-haloalkylsulfanyl, $C_1$-$C_4$-alkylsulfinyl, $C_1$-$C_4$-alkylsulfonyl, $C_3$-$C_6$-cycloalkyl, phenyl, naphthyl, oxetanyl, azetidinyl, tetrahydrofuranyl, pyrrolidinyl, tetrahydropyranyl, piperidinyl, piperazinyl, morpholinyl, furanyl, thienyl, pyrrolyl, pyrazolyl, thiazolyl, imidazolyl, oxazolyl, isoxazolyl, pyridinyl, pyrimidinyl, $C_3$-$C_6$-cycloalkyloxy and —$N(R^h)_2$, with $R^h$ being independently selected from the group consisting of hydrogen, $C_1$-$C_4$-alkyl, $C_1$-$C_4$-haloalkyl, $C_2$-$C_4$ alkenyl, $C_3$-$C_6$-cycloalkyl, phenyl, oxetanyl, azetidinyl, pyrrolidinyl and tetrahydrofuranyl, wherein aliphatic $R^8$ and $R^h$ substituents as disclosed herein may be substituted with one or two $R^{8Sa}$ substituents independently selected from the group consisting of hydroxyl, $C_1$-$C_4$-alkoxy, $C_1$-$C_4$-alkoxycarbonyl, $C_3$-$C_6$-cycloalkyl, $C_1$-$C_4$-alkylsulfanyl oxetanyl, azetidinyl, pyrrolidinyl and tetrahydrofuranyl, wherein cyclic $R^8$ and $R^h$ substituents as disclosed herein may be substituted with one or two $R^{8Sc}$ substituents independently selected from the group consisting of oxo, fluorine, chlorine, hydroxyl, $C_1$-$C_4$-alkyl, $C_1$-$C_4$-haloalkyl, $C_1$-$C_4$-alkoxy, $C_3$-$C_6$-cycloalkyl, oxetanyl, azetidinyl, pyrrolidinyl and tetrahydrofuranyl Q is selected from the group consisting of phenyl, 1,3-benzodioxol-5-yl, 2,3-dihydrobenzofuranyl, pyridinyl, thien-yl and indol-5-yl, wherein more preferred Q groups as disclosed herein may be substituted with one or two $Q^S$ substituents independently selected from the group consisting of halogen, cyano, nitro, formyl, $C_1$-$C_4$-alkyl, $C_1$-$C_4$-haloalkyl, $C_1$-$C_4$-alkoxy, $C_1$-$C_4$-haloalkoxy, $C_2$-$C_4$alkenyl, $C_2$-$C_4$-alkynyl, $C_1$-$C_4$-alkylsulfanyl, $C_3$-$C_6$-cycloalkyl and non-aromatic 3- to 7-membered monocyclic heterocycle, wherein said more preferred aliphatic $Q^S$ substituents may be substituted with one or two substituents independently selected from the group consisting of hydroxyl, $C_1$-$C_4$-alkoxy, $C_1$-$C_4$-haloalkoxy, $C_1$-$C_4$-alkoxycarbonyl, $C_1$-$C_4$-haloalkoxycarbonyl and $C_3$-$C_6$-cycloalkyl.

In an even more preferred embodiment compounds according to the present invention are compounds of formula (I), wherein A is selected from the group consisting of O, $NR^1$ and $CR^1R^2$, with $R^1$ and $R^2$ being independently selected from the group consisting of hydrogen, methyl or ethyl, m is 1;

T is hydrogen, $R^3$ and $R^4$ are independently selected from the group consisting of hydrogen or fluorine, $R^5$ is hydrogen, L represents a direct bond or L is methylene, $R^6$ is indanyl, 1,2,3,4-tetrahydronaphthalenyl, phenyl, naphthyl, 2,3-dihydrobenzofuranyl, 2,3-dihydro-1,4-benzodioxinyl, thienyl, pyridinyl, indolyl, benzofuranyl, benzothiophenyl or phenoxy, wherein cyclic, or cyclic moiety of $R^6$ substituents may be substituted with one or two $R^{6S}$ substituents that may be the same or different, $R^{6S}$ is selected from the group consisting of halogen, cyano, $C_1$-$C_4$-alkyl, $C_1$-$C_4$-haloalkyl, $C_1$-$C_4$-alkoxy, $C_1$-$C_4$-haloalkoxy, $C_2$-$C_4$-alkenyl, $C_2$-$C_4$-alkynyl, $C_1$-$C_4$-haloalkylsulfanyl, $C_3$-$C_8$-cycloalkyl pyridinyl, oxetanyl and tetrahydrofuranyl $R^7$ is selected from the group consisting of halogen, cyano, $C_1$-$C_4$-alkyl, $C_1$-$C_4$-haloalkyl, $C_1$-$C_4$-hydroxyalkyl, $C_1$-$C_4$-alkoxy, $C_1$-$C_4$-alkylcarbonyl, $C_3$-$C_6$-cycloalkyl, imidazolyl, pyrazolyl, thiazolyl and pyridinyl, wherein aliphatic $R^7$, substituents may be substituted with one or two $R^{7Sa}$ substituents independently selected from the group consisting of hydroxyl, methoxy, ethoxy and cyclopropyl, wherein cyclic or cyclic moiety of $R^7$ substituents may be substituted with one or two $R^{7Sc}$ substituents independently selected from the group consisting of fluorine, methyl, ethyl and cyclopropyl, $R^8$ is selected from the group consisting of hydrogen, halogen, $C_1$-$C_4$-alkyl, $C_1$-$C_4$-haloalkyl, $C_1$-$C_4$-alkoxy, $C_3$-$C_6$-cycloalkyloxy and —N($R^h$)$_2$, with $R^h$ being independently selected from the group consisting of hydrogen, $C_1$-$C_4$-alkyl, $C_1$-$C_4$-haloalkyl, $C_2$-$C_4$alkenyl, and $C_3$-$C_6$-cycloalkyl, wherein aliphatic $R^8$ and $R^h$ substituents may be substituted with one or two $R^{8Sa}$ substituents independently selected from the group consisting of hydroxyl, methoxy and ethoxy, wherein cyclic or cyclic moiety of $R^8$ and cyclic $R^h$ substituents may be substituted with one or two $R^{8Sc}$ substituents independently selected from the group consisting of fluorine, methyl, ethyl and cyclopropyl, Q is selected from the group consisting of phenyl, 3-bicyclo[4.2.0]octa-1,3,5-trienyl, pyrazolyl, thiazolyl, thienyl and pyridinyl, wherein any of said carbocycle or heterocycle groups may be substituted with one to three $Q^S$ substituents that may be the same or different, $Q^S$ is selected from the group consisting of halogen, cyano, nitro, formyl, $C_1$-$C_4$-alkyl, $C_1$-$C_4$-haloalkyl, $C_1$-$C_4$-alkoxy, $C_1$-$C_4$-haloalkoxy, $C_2$-$C_4$alkenyl, $C_2$-$C_4$-alkynyl, $C_1$-$C_4$-alkylsulfanyl $C_3$-$C_8$-cycloalkyl, oxiranyl and oxetanyl.

In a still even more preferred embodiment compounds according to the present invention are compounds of formula (I), wherein A is O, m is 1;

T is hydrogen, $R^3$ and $R^4$ are hydrogen, $R^5$ is hydrogen,

L is methylene, $R^6$ is 2,4-dimethylphenyl, 2-methyl-4-bromophenyl or 2-chloro-4-methylphenyl, $R^7$ is methyl, $R^8$ is hydrogen, Q is 2-fluoro-3-chlorophenyl, 2-fluor-3-bromophenyl or 2-fluoro-3-cyclopropylphenyl.

Still even more preferred compound combinations according to the invention comprise (A) a compound of formula (I) selected from the group consisting of (I-052) rac-3-[3-(3-cyclopropyl-2-fluorophenoxy)-6-methylpyridazin-4-yl]-5-[(2,4-dimethylphenyl)methyl]-5,6-dihydro-4H-1,2,4-oxadiazine, (I-130) (5S)-3-[3-(3-cyclopropyl-2-fluorophenoxy)-6-methylpyridazin-4-yl]-5-(2,4-dimethylbenzyl)-5,6-dihydro-4H-1,2,4-oxadiazine, (I-300) rac-5-[(4-bromo-2-methylphenyl)methyl]-3-[3-(3-chloro-2-fluorophenoxy)-6-methylpyridazin-4-yl]-5,6-dihydro-4H-1,2,4-oxadiazine, (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine, (I-337) (5S)-5-[(4-bromo-2-methylphenyl)methyl]-3-[3-(3-chloro-2-fluorophenoxy)-6-methylpyridazin-4-yl]-5,6-dihydro-4H-1,2,4-oxadiazine, (I-338) (5R)-3-[3-(3-chloro-2-fluorophenoxy)-6-methylpyridazin-4-yl]-5-(2-chloro-4-methylbenzyl)-5,6-dihydro-4H-1,2,4-oxadiazine and (I-339) (5S)-3-[3-(3-chloro-2-fluoro-phenoxy)-6-methylpyridazin-4-yl]-5-(2-chloro-4-methylbenzyl)-5,6-dihydro-4H-1,2,4-oxadiazine.

Likewise still even more preferred compound combinations according to the invention comprise (A) a compound of formula (I) selected from the group consisting of (I-052) rac-3-[3-(3-cyclopropyl-2-fluorophenoxy)-6-methylpyridazin-4-yl]-5-[(2,4-dimethylphenyl)methyl]-5,6-dihydro-4H-1,2,4-oxadiazine, (I-130) (5S)-3-[3-(3-cyclopropyl-2-fluorophenoxy)-6-methylpyridazin-4-yl]-5-(2,4-dimethylbenzyl)-5,6-dihydro-4H-1,2,4-oxadiazine, (I-300) rac-5-[(4-bromo-2-methylphenyl)methyl]-3-[3-(3-chloro-2-fluorophenoxy)-6-methylpyridazin-4-yl]-5,6-dihydro-4H-1,2,4-oxadiazine, (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine, (I-337) (5S)-5-[(4-bromo-2-methylphenyl)methyl]-3-[3-(3-chloro-2-fluorophenoxy)-6-methylpyridazin-4-yl]-5,6-dihydro-4H-1,2,4-oxadiazine and (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

Likewise most preferred compound combinations according to the invention comprise (A) a compound of formula (I) selected from the group consisting of (I-052) rac-3-[3-(3-cyclopropyl-2-fluorophenoxy)-6-methylpyridazin-4-yl]-5-[(2,4-dimethylphenyl)methyl]-5,6-dihydro-4H-1,2,4-oxadiazine, (I-300) rac-5-[(4-bromo-2-methylphenyl)methyl]-3-[3-(3-chloro-2-fluorophenoxy)-6-methylpyridazin-4-yl]-5,6-dihydro-4H-1,2,4-oxadiazine and (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine.

Likewise most preferred compound combinations according to the invention comprise (A) a compound of formula (I) selected from the group consisting of (I-130) (5S)-3-[3-(3-cyclopropyl-2-fluorophenoxy)-6-methylpyridazin-4-yl]-5-(2,4-dimethylbenzyl)-5,6-dihydro-4H-1,2,4-oxadiazine, (I-337) (5S)-5-[(4-bromo-2-methylphenyl)methyl]-3-[3-(3-chloro-2-fluorophenoxy)-6-methylpyridazin-4-yl]-5,6-dihydro-4H-1,2,4-oxadiazine and (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

Most preferred compound combinations according to the invention comprise (A) a compound of formula (I) selected from the group consisting of (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine, (I-338) (5R)-3-[3-(3-chloro-2-fluorophenoxy)-6-methylpyridazin-4-yl]-5-(2-chloro-4-methylbenzyl)-5,6-dihydro-4H-1,2,4-oxadiazine and (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

Particularly preferred compound combinations according to the invention comprise (A) a compound of formula (I) which is (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

Definitions

The term “halogen” as used herein refers to fluorine, chlorine, bromine or iodine atom.

The term “methylidene” as used herein refers to a $CH_2$ group connected to a carbon atom via a double bond.

The term “halomethylidene” as used herein refers to a $CX_2$ group connected to a carbon atom via a double bond, wherein X is halogen.

The term “oxo” as used herein refers to an oxygen atom which is bound to a carbon atom or sulfur atom via a double bound.

The term “formyl” as used herein refers to —CH(═O).

The term “$C_1$-$C_6$-alkyl” as used herein refers to a saturated, branched or straight hydrocarbon chain having 1, 2, 3, 4, 5 or 6 carbon atoms. Examples of $C_1$-$C_6$-alkyl include but are not limited to methyl, ethyl, propyl (n-propyl), 1-methylethyl (iso-propyl), butyl (n-butyl), 1-methylpropyl (sec-butyl), 2-methylpropyl (iso-butyl), 1,1-dimethylethyl (tert-butyl), pentyl, 1-methylbutyl, 2-methylbutyl, 3-methylbutyl, 2,2-dimethylpropyl, 1-ethylpropyl, 1,1-dimethylpropyl, 1,2-dimethylpropyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Particularly, said hydrocarbon chain has 1, 2, 3 or 4 carbon atoms ("$C_1$-$C_4$-alkyl"), e.g. methyl, ethyl, propyl, iso-propyl, butyl, sec-butyl, iso-butyl or tert-butyl.

The term "$C_1$-$C_6$-alkylene" as used herein refers to a divalent $C_1$-$C_6$-alkyl group as defined herein. Examples of $C_1$-$C_6$-alkylene include but are not limited to $—CH_2—$, $—CH_2—CH_2—$, $—CH_2—CH_2—CH_2—$, $—CH_2—C(CH_3)—CH_2—$, $—CH_2—CH_2—CH_2—CH_2—$, $—CH_2—C(CH_3)—CH_2—CH_2—$, $—CH_2—CH_2—CH_2—CH_2—CH_2—$ and $—CH_2—CH_2—CH_2—CH_2—CH_2—CH_2—$.

The term "$C_2$-$C_6$-alkenyl" or "alkanediyl" as used herein refers to an unsaturated, branched or straight hydrocarbon chain having 2, 3, 4, 5 or 6 carbon atoms and comprising at least one double bond. Examples of $C_2$-$C_6$-alkenyl include but are not limited to ethenyl (or "vinyl"), prop-2-en-1-yl (or "allyl"), prop-1-en-1-yl, but-3-enyl, but-2-enyl, but-1-enyl, pent-4-enyl, pent-3-enyl, pent-2-enyl, pent-1-enyl, hex-5-enyl, hex-4-enyl, hex-3-enyl, hex-2-enyl, hex-1-enyl, prop-1-en-2-yl (or "isopropenyl"), 2-methylprop-2-enyl, 1-methylprop-2-enyl, 2-methylprop-1-enyl, 1-methylprop-1-enyl, 3-methylbut-3-enyl, 2-methylbut-3-enyl, 1-methylbut-3-enyl, 3-methylbut-2-enyl, 2-methylbut-2-enyl, 1-methylbut-2-enyl, 3-methylbut-1-enyl, 2-methylbut-1-enyl, 1-methylbut-1-enyl, 1,1-dimethylprop-2-enyl, 1-ethylprop-1-enyl, 1-propylvinyl, 1-isopropylvinyl, 4-methylpent-4-enyl, 3-methylpent-4-enyl, 2-methylpent-4-enyl, 1-methylpent-4-enyl, 4-methylpent-3-enyl, 3-methylpent-3-enyl, 2-methylpent-3-enyl, 1-methylpent-3-enyl, 4-methylpent-2-enyl, 3-methylpent-2-enyl, 2-methylpent-2-enyl, 1-methylpent-2-enyl, 4-methylpent-1-enyl, 3-methylpent-1-enyl, 2-methylpent-1-enyl, 1-methylpent-1-enyl, 3-ethylbut-3-enyl, 2-ethylbut-3-enyl, 1-ethylbut-3-enyl, 3-ethylbut-2-enyl, 2-ethylbut-2-enyl, 1-ethylbut-2-enyl, 3-ethylbut-1-enyl, 2-ethylbut-1-enyl, 1-ethylbut-1-enyl, 2-propylprop-2-enyl, 1-propylprop-2-enyl, 2-isopropylprop-2-enyl, 1-isopropylprop-2-enyl, 2-propylprop-1-enyl, 1-propylprop-1-enyl, 2-isopropylprop-1-enyl, 1-isopropylprop-1-enyl, 3,3-dimethylprop-1-enyl, 1-(1,1-dimethylethyl)ethenyl, buta-1,3-dienyl, penta-1,4-dienyl, hexa-1,5-dienyl or methylhexadienyl group.

The term "$C_2$-$C_6$-alkenylene" as used herein refers to a divalent $C_2$-$C_6$-alkenyl group as defined herein. Examples of $C_2$-$C_6$-alkenylene include but are not limited to ethenylene, propenylene, butenylene, pentenylene, hexenylene, heptenylene, octenylene, nonenylene, decenylene, undecenylene, dodecenylene, and the like.

The term "$C_2$-$C_6$-alkynyl" as used herein refers to a branched or straight hydrocarbon chain having 2, 3, 4, 5 or 6 carbon atoms and comprising at least one triple bond. Examples of $C_2$-$C_6$-alkynyl include but are not limited to ethynyl, prop-1-ynyl, prop-2-ynyl (or "propargyl"), but-1-ynyl, but-2-ynyl, but-3-ynyl, pent-1-ynyl, pent-2-ynyl, pent-3-ynyl, pent-4-ynyl, hex-1-ynyl, hex-2-ynyl, hex-3-ynyl, hex-4-ynyl, hex-5-ynyl, 1-methylprop-2-ynyl, 2-methylbut-3-ynyl, 1-methylbut-3-ynyl, 1-methylbut-2-ynyl, 3-methylbut-1-ynyl, 1-ethylprop-2-ynyl, 3-methylpent-4-ynyl, 2-methylpent-4-ynyl, 1-methyl-pent-4-ynyl, 2-methylpent-3-ynyl, 1-methylpent-3-ynyl, 4-methylpent-2-ynyl, 1-methyl-pent-2-ynyl, 4-methylpent-1-ynyl, 3-methylpent-1-ynyl, 2-ethylbut-3-ynyl, 1-ethylbut-3-ynyl, 1-ethylbut-2-ynyl, 1-propylprop-2-ynyl, 1-isopropylprop-2-ynyl, 2,2-dimethylbut-3-ynyl, 1,1-dimethylbut-3-ynyl, 1,1-dimethylbut-2-ynyl or 3,3-dimethylbut-1-ynyl group.

The term "$C_2$-$C_6$-alkynylene" as used herein refers to a divalent $C_2$-$C_6$-alkynyl group as defined herein.

The term "$C_1$-$C_6$-haloalkyl" as used herein refers to a $C_1$-$C_6$-alkyl group as defined above in which one or more hydrogen atoms are replaced with one or more halogen atoms that may be the same or different.

The term "$C_2$-$C_6$-haloalkenyl" as used herein refers to a $C_2$-$C_6$-alkenyl group as defined above in which one or more hydrogen atoms are replaced with one or more halogen atoms that may be the same or different.

The term "$C_2$-$C_6$-haloalkynyl" as used herein refers to a $C_2$-$C_6$-alkynyl group as defined above in which one or more hydrogen atoms are replaced with one or more halogen atoms that may be the same or different.

The term "$C_1$-$C_6$-alkoxy" as used herein refers to a group of formula ($C_1$-$C_6$-alkyl)-O—, in which the term "$C_1$-$C_6$-alkyl" is as defined herein. Examples of $C_1$-$C_6$-alkoxy include but are not limited to methoxy, ethoxy, n-propoxy, 1-methylethoxy, n-butoxy, 1-methylpropoxy, 2-methylpropoxy, 1,1-dimethylethoxy, n-pentoxy, 1-methylbutoxy, 2-methylbutoxy, 3-methylbutoxy, 2,2-dimethylpropoxy, 1-ethylpropoxy, 1,1-dimethylpropoxy, 1,2-dimethylpropoxy, n-hexyloxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy and 1-ethyl-2-methylpropoxy.

The term "$C_1$-$C_6$-haloalkoxy" as used herein refers to a $C_1$-$C_6$-alkoxy group as defined above in which one or more hydrogen atoms are replaced with one or more halogen atoms that may be the same or different. Examples of $C_1$-$C_6$-haloalkoxy include but are not limited to chloromethoxy, bromomethoxy, dichloro-methoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy and 1,1,1-trifluoroprop-2-oxy.

The term "$C_1$-$C_6$-haloalkoxy" as used herein refers to a $C_1$-$C_6$-alkoxy group as defined above in which one or more hydrogen atoms are replaced with one or more halogen atoms that may be the same or different.

The term "$C_1$-$C_6$-hydroxyalkyl" as used herein refers to a $C_1$-$C_6$-alkyl group as defined above in which at least one hydrogen atom is replaced with a hydroxyl group. Examples of $C_1$-$C_6$-hydroxyalkyl include but are not limited to hydroxymethyl, 1-hydroxyethyl, 2-hydroxyethyl, 1,2-dihydroxyethyl, 3-hydroxypropyl, 2-hydroxypropyl, 1-hydroxypropyl, 1-hydroxypropan-2-yl, 2-hydroxypropan-2-yl, 2,3-dihydroxypropyl and 1,3-dihydroxypropan-2-yl.

The term "$C_1$-$C_6$-alkylsulfanyl" as used herein refers to a saturated, linear or branched group of formula ($C_1$-$C_6$-alkyl)-S—, in which the term "$C_1$-$C_6$-alkyl" is as defined herein. Examples of $C_1$-$C_6$-alkylsulfanyl include but are not limited to methylsulfanyl, ethylsulfanyl, propylsulfanyl, isopropylsulfanyl, butylsulfanyl, sec-butylsulfanyl, isobutylsulfanyl, tert-butylsulfanyl, pentylsulfanyl, isopentylsulfanyl, hexylsulfanyl group.

The term "$C_1$-$C_6$-haloalkylsulfanyl" as used herein refers to a $C_1$-$C_6$-alkylsulfanyl as defined above in which one or more hydrogen atoms are replaced with one or more halogen atoms that may be the same or different.

The term "$C_1$-$C_6$-alkylsulfinyl" s used herein refers to a saturated, linear or branched group of formula ($C_1$-$C_6$-alkyl)-S(═O)—, in which the term "$C_1$-$C_6$-alkyl" is as defined herein. Examples of $C_1$-$C_6$-alkylsulfinyl include but are not limited to saturated, straight-chain or branched alkylsulfinyl radicals having 1 to 8, preferably 1 to 6 and more preferably 1 to 4 carbon atoms, for example (but not limited to) $C_1$-$C_6$-alkylsulfinyl such as methylsulfinyl, ethylsulfinyl, propylsulfinyl, 1-methylethylsulfinyl, butylsulfinyl, 1-methylpropylsulfinyl, 2-methylpropylsulfinyl, 1,1-dimethylethylsulfinyl, pentylsulfinyl, 1-methylbutylsulfinyl, 2-methylbutylsulfinyl, 3-methylbutylsulfinyl, 2,2-dimethylpropylsulfinyl, 1-ethylpropyl-sulfinyl, 1,1-dimethylpropylsulfinyl, 1,2-dimethylpropylsulfinyl, hexylsulfinyl, 1-methylpentylsulfinyl, 2-methylpentylsulfinyl, 3-methylpentylsulfinyl, 4-methylpentylsulfinyl, 1,1-dimethylbutylsulfinyl, 1,2-dimethylbutylsulfinyl, 1,3-dimethylbutylsulfinyl, 2,2-dimethylbutylsulfinyl, 2,3-dimethylbutylsulfinyl, 3,3-dimethylbutylsulfinyl, 1-ethylbutylsulfinyl, 2-ethylbutylsulfinyl, 1,1,2-trimethylpropylsulfinyl, 1,2,2-trimethylpropylsulfinyl, 1-ethyl-1-methylpropylsulfinyl and 1-ethyl-2-methylpropylsulfinyl.

The term "$C_1$-$C_6$-haloalkylsulfinyl" as used herein refers to a $C_1$-$C_6$-alkylsulfinyl as defined above in which one or more hydrogen atoms are replaced with one or more halogen atoms that may be the same or different.

The term "$C_1$-$C_6$-alkylsulfonyl" s used herein refers to a saturated, linear or branched group of formula ($C_1$-$C_6$-alkyl)-S(═O)$_2$—, in which the term "$C_1$-$C_6$-alkyl" is as defined herein. Examples of $C_1$-$C_6$-alkylsulfonyl include but are not limited to methylsulfonyl, ethylsulfonyl, propylsulfonyl, 1-methylethylsulfonyl, butylsulfonyl, 1-methylpropylsulfonyl, 2-methylpropylsulfonyl, 1,1-dimethylethylsulfonyl, pentylsulfonyl, 1-methylbutylsulfonyl, 2-methylbutylsulfonyl, 3-methylbutylsulfonyl, 2,2-dimethylpropylsulfonyl, 1-ethylpropylsulfonyl, 1,1-dimethylpropylsulfonyl, 1,2-dimethylpropylsulfonyl, hexylsulfonyl, 1-methylpentylsulfonyl, 2-methylpentylsulfonyl, 3-methylpentylsulfonyl, 4-methylpentylsulfonyl, 1,1-dimethylbutylsulfonyl, 1,2-dimethylbutylsulfonyl, 1,3-dimethylbutylsulfonyl, 2,2-dimethylbutylsulfonyl, 2,3-dimethylbutylsulfonyl, 3,3-dimethylbutylsulfonyl, 1-ethylbutylsulfonyl, 2-ethylbutylsulfonyl, 1,1,2-trimethylpropylsulfonyl, 1,2,2-trimethylpropylsulfonyl, 1-ethyl-1-methylpropylsulfonyl and 1-ethyl-2-methylpropylsulfonyl.

The term "$C_1$-$C_6$-haloalkylsulfonyl" as used herein refers to a $C_1$-$C_6$-alkylsulfonyl as defined above in which one or more hydrogen atoms are replaced with one or more halogen atoms that may be the same or different.

The term "$C_1$-$C_6$-alkylcarbonyl" as used herein refers to a saturated, linear or branched group of formula ($C_1$-$C_6$-alkyl)-C(═O)—, in which the term "$C_1$-$C_6$-alkyl" is as defined herein.

The term "$C_1$-$C_6$-haloalkylcarbonyl" as used herein refers to a $C_1$-$C_6$-alkylcarbonyl as defined above in which one or more hydrogen atoms are replaced with one or more halogen atoms that may be the same or different.

The term "$C_1$-$C_6$-alkoxycarbonyl" as used herein refers to a saturated, linear or branched group of formula ($C_1$-$C_6$-alkoxy)-C(═O)—, in which the term "$C_1$-$C_6$-alkoxy" is as defined herein.

The term "$C_1$-$C_6$-haloalkoxycarbonyl" as used herein refers to a $C_1$-$C_6$-alkoxycarbonyl as defined above in which one or more hydrogen atoms are replaced with one or more halogen atoms that may be the same or different.

The term "$C_1$-$C_6$-dialkylamino" as used herein refers to an amino radical having two independently selected $C_1$-$C_6$-alkyl groups as defined herein. Examples of $C_1$-$C_6$-dialkylamino include but are not limited to N,N-dimethylamino, N,N-diethylamino, N,N-diisopropylamino, N-ethyl-N-methylamino, N-methyl-N-n-propylamino, N-isopropyl-N-n-propylamino and N-tert-butyl-N-methylamino.

The term "non-aromatic $C_3$-$C_{12}$-carbocycle" as used herein refers to a non-aromatic, saturated or unsaturated, hydrocarbon ring system in which all of the ring members, which vary from 3 to 12, are carbon atoms. The ring system may be monocyclic or polycyclic (fused, spiro or bridged). Non-aromatic $C_3$-$C_{12}$-carbocycles include but are not limited to $C_3$-$C_{12}$-cycloalkyl (mono or bicyclic), $C_3$-$C_{12}$-cycloalkenyl (mono or bicyclic), bicylic system comprising an aryl (e.g. phenyl) fused to a monocyclic $C_3$-$C_8$-cycloalkyl (e.g. tetrahydronaphthalenyl, indanyl), bicylic system comprising an aryl (e.g. phenyl) fused to a monocyclic $C_3$-$C_8$-cycloalkenyl (e.g. indenyl, dihydronaphthalenyl) and tricyclic system comprising a cyclopropyl connected through one carbon atom to a bicylic system comprising an aryl (e.g. phenyl) fused to a monocyclic $C_3$-$C_8$-cycloalkyl or to a monocyclic $C_3$-$C_8$-cycloalkenyl. The non-aromatic $C_3$-$C_{12}$-carbocycle can be attached to the parent molecular moiety through any carbon atom.

The term "$C_3$-$C_{12}$-cycloalkyl" as used herein refers to a saturated, monovalent, mono- or bicylic hydrocarbon ring which contains 3, 4, 5, 6, 7, 8, 9, 10, 11 or 12 carbon atoms. Examples of monocyclic $C_3$-$C_8$-cycloalkyls include but are not limited to cyclopropyl, cyclobutyl, cyclopentyl, cyclohexyl, cycloheptyl, or cyclooctyl. Examples of bicyclic $C_6$-$C_{12}$-cycloalkyls include but are not limited to bicyclo[3.1.1]heptane, bicyclo[2.2.1]heptane, bicyclo[2.2.2]octane, bicyclo[3.2.2]nonane, bicyclo[3.3.1]nonane, bicyclo[4.2.0]octyl, octahydropentalenyl and bicyclo[4.2.1]nonane.

The term "$C_3$-$C_{12}$-cycloalkylene" as used herein refers to a divalent $C_3$-$C_{12}$-cycloalkyl group as defined herein, such as cyclopropylene, cyclobutylene, cyclopentylene, cyclohexylene, cycloheptylene and bicyclo[2.2.1]hept-2-ylene.

The term "$C_3$-$C_{12}$-cycloalkenyl" as used herein refers to an unsaturated, monovalent, mono- or bicylic hydrocarbon ring which contains 3, 4, 5, 6, 7, 8, 9, 10, 11 or 12 carbon atoms. Examples of monocyclic $C_3$-$C_8$-cycloalkenyl group include but are not limited to cyclobutenyl, cyclopentenyl, cyclohexenyl, cycloheptenyl and cyclooctenyl group. Examples of bicyclic $C_6$-$C_{12}$-cycloalkenyl group include but are not limited to bicyclo[2.2.1]hept-2-enyl or bicyclo[2.2.2]oct-2-enyl.

The term "$C_3$-$C_{12}$-cycloalkenylene" as used herein refers to a divalent $C_3$-$C_{12}$-cycloalkenyl as disclosed herein.

The term "aromatic $C_6$-$C_{14}$-carbocycle" or "aryl" as used herein refers to an aromatic hydrocarbon ring system in which all of the ring members, which vary from 6 to 14, preferably from 6 to 10, are carbon atoms. The ring system may be monocyclic or fused polycyclic (e.g. bicyclic or tricyclic). Examples of aryl include but are not limited to phenyl, azulenyl and naphthyl. The aryl can be attached to the parent molecular moiety through any carbon atom. It is further understood that when said aryl group is substituted with one or more substituents, said substituent(s) may be at any positions on said aryl ring(s). Particularly, in the case of aryl being a phenyl group, said substituent(s) may occupy one or both ortho positions, one or both meta positions, or the para position, or any combination of these positions.

The term "non-aromatic 3- to 14-membered heterocycle" as used herein refers to a saturated or unsaturated non-aromatic ring system comprising 1 to 4 heteroatoms independently selected from the group consisting of oxygen, nitrogen and sulfur. If the ring system contains more than one oxygen atoms, they are not directly adjacent. Non aromatic heterocycles include but are not limited to 3- to 7-membered monocyclic non-aromatic heterocycles and 6- to 14-membered polycyclic (e.g. bicyclic or tricyclic) non-aromatic heterocycles. The non-aromatic 3- to 14-membered heterocycle can be connected to the parent molecular moiety through any carbon atom or nitrogen atom contained within the heterocycle.

The term "non-aromatic 3- to 7-membered monocyclic heterocycle" as used herein refers to a 3-, 4-, 5-, 6- or 7-membered monocyclic ring system containing 1, 2 or 3 heteroatoms independently selected from the group consisting of oxygen, nitrogen and sulfur where the ring system is saturated or unsaturated but not aromatic. For instance, the heterocycle may comprise one to three nitrogen atoms, or one or two oxygen atoms, or one or two sulfur atoms, or one to three nitrogen atoms and one oxygen atom, or one to three nitrogen atoms and a sulfur atom or one sulfur atom and one oxygen atom. Examples of saturated non-aromatic heterocycles include but are not limited to 3-membered ring such as oxiranyl, aziridinyl, 4-membered ring such as azetidinyl, oxetanyl, thietanyl, 5-membered ring such as tetrahydrofuranyl, 1,3-dioxolanyl, tetrahydrothienyl, pyrrolidinyl, pyrazolidinyl, imidazolidinyl, triazolidinyl, isoxazolidinyl, oxazolidinyl, oxadiazolidinyl, thiazolidinyl, isothiazolidinyl, thiadiazolidinyl, 6-membered ring such as piperidinyl, hexahydropyridazinyl, hexahydropyrimidinyl, piperazinyl, triazinanyl, hexahydrotriazinyl, tetrahydropyranyl, dioxanyl, tetrahydrothiopyranyl, dithianyl, morpholinyl, 1,2-oxazinanyl, oxathianyl, thiomorpholinyl or 7-membered ring such as oxepanyl, azepanyl, 1,4-diazepanyl and 1,4-oxazepanyl. Examples of unsaturated non-aromatic hererocyles include but are not limited to 5-membered ring such as dihydrofuranyl, 1,3-dioxolyl, dihydrothienyl, pyrrolinyl, dihydroimidazolyl, dihydropyrazolyl, isoxazolinyl, dihydrooxazolyl, dihydrothiazolyl or 6-membered ring such as pyranyl, thiopyranyl, thiazinyl and thiadiazinyl.

The term "non-aromatic 6- to 14-membered polycyclic heterocycle" as used herein refers to a 6-, 7-, 8-, 9-, 10-, 11-, 12-, 13- or 14-membered polycyclic (e.g. bicyclic or tricyclic) ring system containing 1, 2 or 3 heteroatoms independently selected from the group consisting of oxygen, nitrogen and sulfur where the ring system is saturated or unsaturated but not aromatic. Non-aromatic bicyclic heterocycles may consist of a monocyclic heteroaryl as defined herein fused to a monocyclic $C_3$-$C_8$-cycloalkyl, a monocyclic $C_3$-$C_8$-cycloalkenyl or a monocyclic non-aromatic heterocycle or may consist of a monocyclic non-aromatic heterocycle fused either to an aryl (e.g. phenyl), a monocyclic $C_3$-$C_8$-cycloalkyl, a monocyclic $C_3$-$C_8$-cycloalkenyl or a monocyclic non-aromatic heterocycle. When two monocyclic heterocycles (aromatic or non-aromatic) comprising nitrogen atoms are fused, nitrogen atom may be at the bridgehead (e.g. 4,5,6,7-tetrahydropyrazolo[1,5-a]pyridinyl, 5,6,7,8-tetrahydro-[1,2,4]triazolo[1,5-a]pyridinyl, 5,6,7,8-tetrahydroimidazo[1,2-a]pyridinyl). Non-aromatic tricyclic heterocycles may consist of a monocyclic cycloalkyl connected through one common atom to a non-aromatic bicyclic heterocycle.

The term "non-aromatic 3- to 7-membered monocyclic heterocyclylene" as used herein refers to a divalent non-aromatic 3- to 7-membered monocyclic heterocycle as disclosed herein.

The term "aromatic 5- to 14-membered heterocycle" or "heteroaryl" as used herein refers to an aromatic ring system comprising 1 to 4 heteroatoms independently selected from the group consisting of oxygen, nitrogen and sulfur. If the ring system contains more than one oxygen atom, they are not directly adjacent. Aromatic heterocycles include aromatic 5- or 6-membered monocyclic heterocycles and 6- to 14-membered polycyclic (e.g. bicyclic or tricyclic) aromatic heterocycles. The 5- to 14-membered aromatic heterocycle can be connected to the parent molecular moiety through any carbon atom or nitrogen atom contained within the heterocycle.

The term "aromatic 5- or 6-membered monocyclic heterocycle" or "monocyclic heteroaryl" as used herein refers to a 5- or 6-membered monocyclic ring system containing 1, 2, 3 or 4 heteroatoms independently selected from the group consisting of oxygen, nitrogen and sulfur. Examples of 5-membered monocyclic heteroaryl include but are not limited to furyl (furanyl), thienyl, pyrrolyl, pyrazolyl, imidazolyl, triazolyl, tetrazolyl, isoxazolyl, oxazolyl, oxadiazolyl, oxatriazolyl, isothiazolyl, thiazolyl, thiadiazolyl and thiatriazolyl. Examples of 6-membered monocyclic heteroaryl include but are not limited to pyridinyl, pyridazinyl, pyrimidinyl, pyrazinyl, triazinyl, tetrazinyl.

The term "6- to 14-membered polycyclic aromatic heterocycle" or "polycyclic heteroaryl" as used herein refers to a 6-, 7-, 8-, 9-, 10-, 11-, 12-, 13- or 14-membered polycyclic (e.g. bicyclic or tricyclic) ring system containing 1, 2 or 3 heteroatoms independently selected from the group consisting of oxygen, nitrogen and sulfur. Aromatic bicyclic heterocycles may consist of a monocyclic heteroaryl as defined herein fused to an aryl (e.g. phenyl) or to a monocyclic heteroaryl. Examples of bicyclic aromatic heterocycle include but are not limited to 9-membered ring such as indolyl, indolizinyl, isoindolyl, benzimadozolyl, imidazopyridinyl, indazolyl, benzotriazolyl, purinyl, benzofuranyl, benzothiophenyl, benzothiazolyl, benzoxazolyl and benzisoxazolyl or 10-membered ring such as quinolinyl, isoquinolinyl, cinnolinyl, quinazolinyl, quinoxalinyl, phthalazinyl, naphthyridinyl, pteridinal and benzodioxinyl. In 9- or 10-membered aromatic bicyclic heterocycles comprising two fused 5- or 6-membered monocyclic aromatic heterocycles, nitrogen atom may be at the bridgehead (e.g. imidazo[1,2-a]pyridinyl, [1,2,4]triazolo[4,3-a]pyridinyl, imidazo[1,2-a]pyridinyl, imidazo[2,1-b]oxazolyl, furo[2,3-d]isoxazolyl). Examples of tricyclic aromatic heterocyle include but are not limited to carbazolyl, acridinyl and phenazinyl.

The terms "non-aromatic $C_3$-$C_{12}$-carbocyclyloxy", "$C_3$-$C_8$-cycloalkyloxy", "aromatic $C_6$-$C_{14}$-carbocyclyloxy", "aromatic 5- to 14-membered heterocyclyloxy", "non-aromatic 5- to 14-membered heterocyclyloxy" as used herein designate a group of formula —O—R wherein R is respectively a non-aromatic $C_3$-$C_{12}$-carbocyclyl, a $C_3$-$C_8$-cycloalkyl, an aromatic $C_6$-$C_{14}$-carbocyclyl, an aromatic 5- to 14-membered heterocyclyl or a non-aromatic 5- to 14-membered heterocyclyl group as defined herein.

As used herein, when a group is said to be "substituted", the group may be substituted with one or more substituents. The expression "one or more substituents" refers to a number of substituents that ranges from one to the maximum number of substituents possible based on the number of available bonding sites, provided that the conditions of stability and chemical feasibility are met.

The term "leaving group" as used herein is to be understood as meaning a group which is displaced from a compound in a substitution or an elimination reaction, for example a halogen atom, a trifluoromethanesulphonate ("triflate") group, alkoxy, methanesulphonate, p-toluenesulphonate, etc.

The terms "as described herein" when referring to a variable A, Q, L, m, T, $R^1$, $R^2$, $R^3$, $R^4$, $R^5$, $R^6$, $R^7$, $R^8$ incorporates by reference the broad definition of the variable as well as preferred, more preferred and even more preferred definitions, if any.

Not encompassed herein are compounds resulting from combinations which are against natural laws and which the person skilled in the art would therefore exclude based on his/her expert knowledge. For instance, ring structures having three or more adjacent oxygen atoms are excluded.

The compounds of formula (I) can suitably be in their free form, salt form, N-oxide form or solvate form (e.g. hydrate).

Depending on the nature of the substituents, the compound of formula (I) may be present in the form of different stereoisomers. These stereoisomers are, for example, enantiomers, diastereomers, atropisomers or geometric isomers. Accordingly, the invention encompasses both pure stereoisomers and any mixture of these isomers. Where a compound can be present in two or more tautomer forms in equilibrium, reference to the compound by means of one tautomeric description is to be considered to include all tautomer forms.

Any of the compounds of the present invention can also exist in one or more geometric isomer forms depending on the number of double bonds in the compound. Geometric isomers by nature of substituents about a double bond or a ring may be present in cis (=Z—) or trans (=E-) form. The invention thus relates equally to all geometric isomers and to all possible mixtures, in all proportions.

Depending on the nature of the substituents, the compound of formula (I) may be present in the form of the free compound and/or a salt thereof, such as an agrochemically active salt.

Agrochemically active salts include acid addition salts of inorganic and organic acids well as salts of customary bases. Examples of inorganic acids are hydrohalic acids, such as hydrogen fluoride, hydrogen chloride, hydrogen bromide and hydrogen iodide, sulfuric acid, phosphoric acid and nitric acid, and acidic salts, such as sodium bisulfate and potassium bisulfate. Useful organic acids include, for example, formic acid, carbonic acid and alkanoic acids such as acetic acid, trifluoroacetic acid, trichloroacetic acid and propionic acid, and also glycolic acid, thiocyanic acid, lactic acid, succinic acid, citric acid, benzoic acid, cinnamic acid, oxalic acid, saturated or mono- or diunsaturated fatty acids having 6 to 20 carbon atoms, alkylsulphuric monoesters, alkylsulphonic acids (sulphonic acids having straight-chain or branched alkyl radicals having 1 to 20 carbon atoms), arylsulphonic acids or aryldisulphonic acids (aromatic radicals, such as phenyl and naphthyl, which bear one or two sulphonic acid groups), alkylphosphonic acids (phosphonic acids having straight-chain or branched alkyl radicals having 1 to 20 carbon atoms), arylphosphonic acids or aryldiphosphonic acids (aromatic radicals, such as phenyl and naphthyl, which bear one or two phosphonic acid radicals), where the alkyl and aryl radicals may bear further substituents, for example p-toluenesulphonic acid, salicylic acid, p-aminosalicylic acid, 2-phenoxybenzoic acid, 2-acetoxybenzoic acid, etc.

Solvates of the compounds of the invention or their salts are stoichiometric compositions of the compounds with solvents.

The compounds of the invention may exist in multiple crystalline and/or amorphous forms. Crystalline forms include unsolvated crystalline forms, solvates and hydrates.

Aliphatic $R^1$ and $R^2$ substituents as used herein in the expression "aliphatic $R^1$, $R^2$, $R^3$, $R^4$ and $R^5$ substituents may be substituted with one or more substituents" designates $C_1$-$C_6$-alkyl.

Aliphatic $R^3$ and $R^4$ substituents as used herein in the expression "aliphatic $R^1$, $R^2$, $R^3$, $R^4$ and $R^5$ substituents may be substituted with one or more substituents" designates $C_1$-$C_6$-alkyl, $C_1$-$C_6$-alkoxy, $C_1$-$C_6$-alkoxycarbonyl and the $C_1$-$C_6$-alkyl moiety of —Si($C_1$-$C_6$-alkyl)$_3$.

Aliphatic $R^5$ substituents as used herein in the expression "aliphatic $R^1$, $R^2$, $R^3$, $R^4$ and $R^5$ substituents may be substituted with one or more substituents" designates $C_1$-$C_6$-alkyl, $C_1$-$C_6$-alkoxy, $C_1$-$C_6$-alkylsulfanyl, $C_1$-$C_6$-alkylsulfinyl, $C_1$-$C_6$-alkylsulfonyl and the $C_1$-$C_6$-alkyl moiety of —O—Si($C_1$-$C_6$-alkyl)$_3$.

Aliphatic L substituents as used herein in the expression "aliphatic L substituents may be substituted with one or more $L^{Sa}$ substituents" designates $C_1$-$C_6$-alkylene, $C_2$-$C_6$-alkenylene, $C_2$-$C_6$-alkynylene and the $C_1$-$C_6$-alkylene moiety of $C_1$-$C_6$-alkylene-$C_3$-$C_8$-cycloalkylene, $C_3$-$C_8$-cycloalkylene-$C_1$-$C_6$-alkylene, $C_1$-$C_6$-alkylene-$C_3$-$C_8$-cycloalkylene-$C_1$-$C_6$-alkylene, $C_1$-$C_6$-alkylene-(C═O)—, $C_1$-$C_6$-alkylene-$C_3$-$C_8$-cycloalkenylene, $C_3$-$C_8$-cycloalkenylene-$C_1$-$C_6$-alkylene, $C_1$-$C_6$-alkylene-$C_3$-$C_8$-cycloalkenylene-$C_1$-$C_6$-alkylene.

Aliphatic $R^{6S}$ substituents as used herein in the expression "aliphatic $R^{6S}$, $R^c$ and $R^d$ substituents may be substituted with one or more substituents" designates $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl and the $C_1$-$C_6$-alkyl moiety of —Si($C_1$-$C_6$-alkyl)$_3$ and —O—Si($C_1$-$C_6$-alkyl)$_3$.

Aliphatic $R^c$ substituents as used herein in the expression "aliphatic $R^{6S}$, $R^c$ and $R^d$ substituents may be substituted with one or more substituents" designates $C_1$-$C_6$-alkyl.

Aliphatic $R^d$ substituents as used herein in the expression "aliphatic $R^{6S}$, $R^c$ and $R^d$ substituents may be substituted with one or more substituents" designates $C_1$-$C_6$-alkyl and $C_1$-$C_6$-haloalkyl.

Aliphatic $R^7$ substituents as used herein in the expression "aliphatic $R^7$, $R^e$, $R^f$ and $R^g$ substituents may be substituted with one or more $R^{7Sa}$ substituents" designates $C_1$-$C_6$-alkyl, $C_1$-$C_6$-haloalkyl, $C_1$-$C_6$-hydroxyalkyl, $C_1$-$C_6$-alkylcarbonyl, $C_1$-$C_6$-haloalkylcarbonyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_2$-$C_6$-alkynyloxy, $C_2$-$C_6$-haloalkynyloxy, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl and the $C_1$-$C_6$-alkyl moiety of —Si($C_1$-$C_6$-alkyl)$_3$ and —O—Si($C_1$-$C_6$-alkyl)$_3$.

Aliphatic $R^e$ substituents as used herein in the expression "aliphatic $R^7$, $R^e$, $R^f$ and $R^g$ substituents may be substituted with one or more $R^{7Sa}$ substituents" designates $C_1$-$C_6$-alkyl, $C_1$-$C_6$-haloalkyl, $C_1$-$C_6$-alkoxy, $C_2$-$C_6$-alkenyl, $C_2$-$C_6$-haloalkenyl, $C_2$-$C_6$-alkynyl and $C_2$-$C_6$-haloalkynyl.

Aliphatic $R^f$ substituents as used herein in the expression "aliphatic $R^7$, $R^e$, $R^f$ and $R^g$ substituents may be substituted with one or more $R^{7Sa}$ substituents" designates $C_1$-$C_6$-alkyl, $C_1$-$C_6$-haloalkyl, $C_1$-$C_6$-alkoxy and the $C_1$-$C_6$-alkyl moiety of $C_1$-$C_6$-alkylamino and di($C_1$-$C_6$-alkyl)amino.

Aliphatic $R^g$ substituents as used herein in the expression "aliphatic $R^7$, $R^e$, $R^f$ and $R^g$ substituents may be substituted with one or more $R^{7Sa}$ substituents" designates $C_1$-$C_6$-alkyl and $C_1$-$C_6$-haloalkyl.

Aliphatic $R^8$ substituents as used herein in the expression "aliphatic $R^8$, $R^h$ and $R^i$ substituents may be substituted with one or more $R^{8Sa}$ substituents" designates $C_1$-$C_6$-alkyl, $C_1$-$C_6$-haloalkyl, $C_1$-$C_6$-hydroxyalkyl, $C_1$-$C_6$-alkoxy, $C_1$-$C_6$-haloalkoxy, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_2$-$C_6$-alkynyloxy, $C_2$-$C_6$-haloalkynyloxy, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl and the $C_1$-$C_6$-alkyl moiety of —Si($C_1$-$C_6$-alkyl)$_3$ and —O—Si($C_1$-$C_6$-alkyl)$_3$.

Aliphatic $R^h$ substituents as used herein in the expression "aliphatic $R^8$, $R^h$ and $R^i$ substituents may be substituted with one or more $R^{8Sa}$ substituents" designates $C_1$-$C_6$-alkyl, $C_1$-$C_6$-haloalkyl, $C_1$-$C_6$-alkoxy, $C_2$-$C_6$-alkenyl, $C_2$-$C_6$-haloalkenyl, $C_2$-$C_6$-alkynyl and $C_2$-$C_6$-haloalkynyl.

Aliphatic $R^i$ substituents as used herein in the expression "aliphatic $R^8$, $R^h$ and $R^i$ substituents may be substituted with one or more $R^{8Sa}$ substituents" designates $C_2$-$C_6$-alkenyl, $C_2$-$C_6$-haloalkenyl, $C_2$-$C_6$-alkynyl and $C_2$-$C_6$-haloalkynyl.

Aliphatic $Q^S$ substituents as used herein in the expression "aliphatic $Q^S$, $R^j$ and $R^k$ substituents may be substituted with one or more substituents" designates $C_1$-$C_6$-alkyl, $C_1$-$C_6$-haloalkyl, $C_1$-$C_6$-alkylcarbonyl, $C_1$-$C_6$-haloalkylcarbonyl, $C_1$-$C_6$-alkoxy, $C_1$-$C_6$-haloalkoxy, $C_1$-$C_6$-alkoxycarbonyl, $C_1$-$C_6$-haloalkoxycarbonyl, $C_2$-$C_6$-alkenyl, $C_2$-$C_6$-haloalkenyl, $C_2$-$C_6$-alkynyl, $C_2$-$C_6$-haloalkynyl, $C_2$-$C_6$-alkenyloxy, $C_2$-$C_6$-haloalkenyloxy, $C_1$-$C_6$-alkylsulfanyl, $C_1$-$C_6$-haloalkylsulfanyl, $C_1$-$C_6$-alkylsulfinyl, $C_1$-$C_6$-haloalkylsulfinyl, $C_1$-$C_6$-alkylsulfonyl, $C_1$-$C_6$-haloalkylsulfonyl and the $C_1$-$C_6$-alkyl moiety of —Si($C_1$-$C_6$-alkyl)$_3$ and —O—Si($C_1$-$C_6$-alkyl)$_3$.

Aliphatic $R^j$ substituents as used herein in the expression "aliphatic $Q^S$, $R^j$ and $R^k$ substituents may be substituted with one or more substituents" designates $C_1$-$C_6$-alkyl, $C_1$-$C_6$-haloalkyl and $C_1$-$C_6$-alkoxy.

Aliphatic $R^k$ substituents as used herein in the expression "aliphatic $Q^S$, $R^j$ and $R^k$ substituents may be substituted with one or more substituents" designates $C_1$-$C_6$-alkyl, $C_1$-$C_6$-haloalkyl, $C_1$-$C_6$-alkoxy, $C_2$-$C_6$ alkenyl and $C_2$-$C_6$-haloalkenyl.

Cyclic $R^1$, $R^2$ and $R^5$ substituents as used herein in the expression "cyclic $R^1$, $R^2$, $R^3$, $R^4$ and $R^5$ substituents may be substituted with one or more substituents" designates $C_3$-$C_8$-cycloalkyl.

Cyclic $R^3$ and $R^4$ substituents as used herein in the expression "cyclic $R^1$, $R^2$, $R^3$, $R^4$ and $R^5$ substituents may be substituted with one or more substituents" designates $C_3$-$C_8$-cycloalkyl, aromatic $C_6$-$C_{14}$-carbocycle, non-aromatic 3- to 14-membered heterocycle and aromatic 5- to 14-membered heterocycle.

Cyclic L substituents as used herein in the expression "cyclic or cyclic moiety of L substituents may be substituted with one or more $L^{Sc}$ substituents" designates $C_3$-$C_8$-cycloalkylene, $C_3$-$C_8$-cycloalkenylene and non-aromatic 3- to 7-membered monocyclic heterocyclylene.

Cyclic L substituents as used herein in the expression "cyclic or cyclic moiety of L substituents may be substituted with one or more $L^{Sc}$ substituents" designates $C_3$-$C_8$-cycloalkylene moiety of $C_1$-$C_6$-alkylene-$C_3$-$C_8$-cycloalkylene, $C_3$-$C_8$-cycloalkylene-$C_1$-$C_6$-alkylene, $C_1$-$C_6$-alkylene-$C_3$-$C_8$-cycloalkylene-$C_1$-$C_6$-alkylene and the $C_3$-$C_8$-cycloalkenylene moiety of $C_1$-$C_6$-alkylene-$C_3$-$C_8$-cycloalkenylene, $C_3$-$C_8$-cycloalkenylene-$C_1$-$C_6$-alkylene and $C_1$-$C_6$-alkylene-$C_3$-$C_8$-cycloalkenylene-$C_1$-$C_6$-alkylene.

Cyclic $R^6$ substituents as used herein in the expression "cyclic, or cyclic moiety of, $R^6$ substituents may be substituted with one or more $R^{6S}$ substituents" designate non-aromatic $C_3$-$C_{12}$-carbocycle, aromatic $C_6$-$C_{14}$-carbocycle, non-aromatic 3- to 14-membered heterocycle and aromatic 5- to 14-membered heterocycle.

Cyclic moiety of $R^6$ substituents as used herein in the expression "cyclic, or cyclic moiety of, $R^6$ substituents may be substituted with one or more $R^{6S}$ substituents" designate the non-aromatic $C_3$-$C_{12}$-carbocycle of non-aromatic $C_3$-$C_{12}$-carbocyclyloxy, the aromatic $C_6$-$C_{14}$-carbocyclyle of aromatic $C_6$-$C_{14}$-carbocyclyloxy, the aromatic 5- to 14-membered heterocycle of aromatic 5- to 14-membered heterocyclyloxy, the non-aromatic 5- to 14-membered heterocycle of non-aromatic 5- to 14-membered heterocyclyloxy, the non-aromatic $C_3$-$C_{12}$-carbocycle of $C_1$-$C_3$-alkoxy substituted by a non-aromatic $C_3$-$C_{12}$-carbocycle, the aromatic $C_6$-$C_{14}$-carbocycle of $C_1$-$C_3$-alkoxy substituted by an aromatic $C_6$-$C_{14}$-carbocycle, the non-aromatic 3- to 14-membered heterocycle of $C_1$-$C_3$-alkoxy substituted by a non-aromatic 3- to 14-membered heterocycle, the aromatic 5- to 14-membered heterocycle of $C_1$-$C_3$-alkoxy substituted by an aromatic 5- to 14-membered heterocycle, the non-aromatic $C_3$-$C_{12}$-carbocycle of $C_1$-$C_3$-haloalkoxy substituted by a non-aromatic $C_3$-$C_{12}$-carbocycle, the aromatic $C_6$-$C_{14}$-carbocycle of $C_1$-$C_3$-haloalkoxy substituted by an aromatic $C_6$-$C_{14}$-carbocycle, the non-aromatic 3- to 14-membered heterocycle of $C_1$-$C_3$-haloalkoxy substituted by a non-aromatic 3- to 14-membered heterocycle and the aromatic 5- to 14-membered heterocycle of $C_1$-$C_3$-haloalkoxy substituted by an aromatic 5- to 14-membered heterocycle.

Cyclic $R^{6S}$ substituents as used herein in the expression "cyclic $R^{6S}$ and $R^c$ substituents may be substituted with one or more substituents" designates $C_3$-$C_8$-cycloalkyl, $C_3$-$C_8$-cycloalkenyl, aromatic $C_6$-$C_{14}$-carbocycle, aromatic 5- or 6-membered monocyclic heterocycle and non-aromatic 3- to 7-membered monocyclic heterocycle.

Cyclic moiety of $R^{6S}$ substituents as used herein in the expression "cyclic or cyclic moiety of $R^{6S}$ and cyclic $R^c$ substituents may be substituted with one or more substituents" designates the $C_3$-$C_8$-cycloalkyl of $C_3$-$C_8$-cycloalkyloxy.

Cyclic $R^c$ substituents as used herein in the expression "cyclic or cyclic moiety of $R^{6S}$ and cyclic $R^c$ substituents may be substituted with one or more substituents" designates $C_3$-$C_8$-cycloalkyl.

Cyclic $R^7$ substituents as used herein in the expression "cyclic $R^7$, $R^e$ and $R^g$ substituents may be substituted with one or more $R^{7Sc}$ substituents" designates $C_3$-$C_8$-cycloalkyl, $C_3$-$C_6$-cycloalkenyl, aromatic $C_6$-$C_{14}$-carbocycle, aromatic 5- or 6-membered monocyclic heterocycle and non-aromatic 3- to 7-membered monocyclic heterocycle.

Cyclic moiety of $R^7$ substituents as used herein in the expression "cyclic or cyclic moiety of $R^7$, cyclic $R^e$ and cyclic $R^g$ substituents may be substituted with one or more $R^{7Sc}$ substituents" designates the $C_3$-$C_8$-cycloalkyl of $C_3$-$C_8$-cycloalkyloxy, the aromatic $C_6$-$C_{14}$-carbocycle of aromatic $C_6$-$C_{14}$-carbocyclyloxy, the aromatic 5- or 6-membered monocyclic heterocycle of aromatic 5- or 6-membered monocyclic heterocyclyloxy and the non-aromatic 3- to 7-membered monocyclic heterocycle of non-aromatic 3- to 7-membered monocyclic heterocyclyloxy.

Cyclic $R^e$ substituents as used herein in the expression "cyclic $R^7$, $R^e$ and $R^g$ substituents may be substituted with one or more $R^{7Sc}$ substituents" designates $C_3$-$C_8$-cycloalkyl, $C_3$-$C_8$-halocycloalkyl, aromatic $C_6$-$C_{14}$-carbocycle, aromatic 5- or 6-membered monocyclic heterocycle and non-aromatic 3- to 7-membered monocyclic heterocycle.

Cyclic $R^g$ substituents" as used herein in the expression "cyclic $R^7$, $R^e$ and $R^g$ substituents may be substituted with one or more $R^{7Sc}$ substituents" designates $C_3$-$C_8$-cycloalkyl.

Cyclic $R^8$ substituents as used herein in the expression "wherein cyclic $R^8$, $R^h$ and $R^i$ substituents may be substituted with one or more $R^{8Sc}$ substituents" designates $C_3$-$C_8$-cycloalkyl, $C_3$-$C_6$-cycloalkenyl, aromatic $C_6$-$C_{14}$-carbocycle, non-aromatic 3- to 14-membered heterocycle and aromatic 5- to 14-membered heterocycle.

Cyclic moiety of $R^8$ substituents as used herein in the expression "wherein cyclic or cyclic moiety of $R^8$, cyclic $R^h$ and cyclic $R^i$ substituents may be substituted with one or more $R^{8Sc}$ substituents" designates the $C_3$-$C_8$-cycloalkyl of $C_3$-$C_8$-cycloalkyloxy, the aromatic $C_6$-$C_{14}$-carbocycle of aromatic $C_6$-$C_{14}$-carbocyclyloxy, the non-aromatic 3- to 14-membered heterocycle of non-aromatic 3- to 14-membered heterocyclyloxy and the aromatic 5- to 14-membered heterocycle of aromatic 5- to 14-membered heterocyclyloxy.

Cyclic $R^h$ substituents as used herein in the expression "wherein cyclic or cyclic moiety of $R^8$, cyclic $R^h$ and cyclic $R^i$ substituents may be substituted with one or more $R^{8Sc}$ substituents" designates $C_3$-$C_8$-cycloalkyl, $C_3$-$C_8$-halocycloalkyl, aromatic $C_6$-$C_{14}$-carbocycle, aromatic 5- to 14-membered heterocycle and non-aromatic 3- to 7-membered monocyclic heterocycle.

Cyclic $R^i$ substituents as used herein in the expression "wherein cyclic $R^8$, $R^h$ and $R^i$ substituents may be substituted with one or more $R^{8Sc}$ substituents" designates $C_3$-$C_8$-cycloalkyl, $C_3$-$C_8$-halocycloalkyl, aromatic $C_6$-$C_4$-carbocycle, aromatic 5- to 14-membered heterocycle and non-aromatic 3- to 7-membered monocyclic heterocycle.

Cyclic $Q^S$ substituents as used herein in the expression "cyclic or cyclic moiety of $Q^S$ and cyclic $R^k$ substituents may be substituted with one or more $R^{Qs}$ substituents" designates $C_3$-$C_8$-cycloalkyl, $C_3$-$C_6$-cycloalkenyl, non-aromatic 3- to 7-membered monocyclic heterocycle and aromatic 5- to 14-membered heterocycle.

Cyclic moiety of $Q^S$ substituents as used herein in the expression "cyclic or cyclic moiety of $Q^S$ and cyclic $R^k$ substituents may be substituted with one or more $R^{Qs}$ substituents" designates the $C_3$-$C_8$-cycloalkyl of $C_3$-$C_8$-cycloalkyloxy.

Cyclic $R^k$ substituents as used herein in the expression "cyclic $Q^S$ and $R^k$ substituents may be substituted with one or more $R^{Qs}$ substituents" designates $C_3$-$C_8$-cycloalkyl.

Processes for the Preparation of Compounds of Formula (I) and Intermediates

The present invention relates to processes for the preparation of compounds of formula (I) and their intermediates. Unless indicated otherwise, the radicals A, Q, T, L, $R^1$, $R^2$, $R^3$, $R^4$, $R^5$, $R^6$, $R^7$, $R^8$, m have the meanings given above for the compounds of formula (I). These definitions apply not only to the end products of formula (I) but also to all intermediates.

Compounds of formula (I-a)-(I-f) are various subsets of formula (I). Compounds of formula (I-a-1)-(I-a-7) are various subsets of formula (I-a). All substituents for formula (I-a)-(I-f) and (I-a-1)-(I-a-7) are as defined above for formula (I) unless otherwise noted.

The compounds of formula (I) can be prepared by various routes in analogy to known processes (see e.g. and references therein). Non-limiting examples of suitable processes are herein described.

A compound of formula (I) may be directly obtained by performing process A to I or may be obtained by conversion or derivatization of another compound of formula (I) prepared in accordance with the processes described herein. For instance, a compound of formula (I) can be converted into another compound of formula (I) by replacing one or more substituents of the starting compound of formula (I) by other substituents. Non-limiting examples of such conversion or derivatization are described below (processes J to L).

The processes described herein may be suitably performed using one or more inert organic solvents which is/are customary for the considered reaction. Suitable inert organic solvents can be chosen from the following: aliphatic, alicyclic or aromatic hydrocarbons (e.g. petroleum ether, pentane, hexane, heptane, cyclohexane, methylcyclohexane, ligroin, benzene, toluene, xylene or decalin), halogenated aliphatic, alicyclic or aromatic hydrocarbons (e.g. chlorobenzene, dichlorobenzene, dichloromethane, chloroform, carbon tetrachloride, 1,2-dichloroethane or trichloroethane), ethers (e.g. diethyl ether, diisopropyl ether, methyl t-butyl ether, methyl t-amyl ether, dioxane, tetrahydrofuran, 2-methyltetrahydrofuran, 1,2-dimethoxyethane, 1,2-diethoxyethane or anisole), ketones (e.g. acetone, methyl ethyl ketone, methyl isopropyl ketone and methyl isobutyl ketone), esters (e.g. methyl acetate, ethyl acetate or butyl acetate), alcohols (e.g. methanol, ethanol, propanol, isopropanol, butanol, tert-butanol), nitriles (e.g. acetonitrile, propionitrile, n- or i-butyronitrile or benzonitrile), amides (e.g. N,N-dimethylformamide, N,N-dimethylacetamide, N-methylformanilide, N-methylpyrrolidone or hexamethylphosphoric triamide), sulfoxides (e.g. dimethyl sulfoxide) or sulfones (e.g. sulfolane), ureas (e.g. 1,3-dimethyl-3,4,5,6-tetrahydro-2(1H)-pyrimidinone) or any mixture thereof.

Some processes described herein may require or be optionally performed using one or more inorganic or organic bases which are customary for such reactions. Examples of suitable inorganic and organic bases include, but are not limited to, alkaline earth metal or alkali metal carbonates (e.g. sodium carbonate, potassium carbonate, potassium bicarbonate, sodium bicarbonate or cesium carbonate), alkali metal hydrides (e.g. sodium hydride), alkaline earth metal or alkali metal hydroxides (e.g. sodium hydroxide, calcium hydroxide, potassium hydroxide or other ammonium hydroxide derivatives), alkaline earth metal, alkali metal or ammonium fluorides (e.g. potassium fluoride, cesium fluoride or tetrabutylammonium fluoride), alkali metal or alkaline earth metal acetates (e.g. sodium acetate, lithium acetate, potassium acetate or calcium acetate), alkali metal alcoholates (e.g. potassium tert-butoxide or sodium tert-butoxide), alkali metal phosphates (e.g. tri-potassium phosphate), tertiary amines (e.g. trimethylamine, triethylamine, tributylamine, N,N-dimethylaniline, N,N-dicyclohexylmethylamine, N,N-diisopropylethylamine, N-methylpiperidine, N,N-dimethylaminopyridine, diazabicyclooctane (DABCO), diazabicyclononene (DBN), diazabicycloundecene (DBU), quinuclidine, 3-acetoxyquinuclidine, guanidines or aromatic bases (e.g. pyridines, picolines, lutidines or collidines).

Some of the processes described herein may be optionally performed in the presence of a transition metal catalyst, such as a metal (e.g. copper or palladium) salt or complex, if appropriate in the presence of a ligand.

Suitable copper salts or complexes and their hydrates include, but are not limited to, copper metal, copper(I) iodide, copper(I) chloride, copper(I) bromide, copper(II) chloride, copper(II) bromide, copper(II) oxide, copper(I) oxide, copper(II) acetate, copper(I) acetate, copper(I) thiophene-2-carboxylate, copper(I) cyanide, copper(II) sulfate, copper(II) bis(2,2,6,6-tetramethyl-3,5-heptanedionate), copper(II) trifluoromethanesulfonate, tetrakis(acetonitrile)copper(I) hexafluorophosphate, tetrakis(acetonitrile)-copper(I) tetrafluoroborate.

It is also possible to generate in situ a suitable copper complex in the reaction mixture by separate addition to the reaction of a copper salt and a ligand or salt, such as ethylenediamine, N,N-dimethylethylenediamine, N,N'-dimethylethylenediamine, rac-trans-1,2-diaminocyclohexane, rac-trans-N,N'-dimethylcyclohexane-1,2-diamine, 1,1'-binaphthyl-2,2'-diamine, N,N,N',N'-tetramethylethylenediamine, proline, N,N-dimethylglycine, quinolin-8-ol, pyridine, 2-aminopyridine, 4-(dimethylamino)pyridine, 2,2'-bipyridyl, 2,6-di(2-pyridyl)pyridine, 2-picolinic acid, 2-(dimethylaminomethyl)-3-hydroxypyridine, 1,10-phenanthroline, 3,4,7,8-tetramethyl-1,10-phenanthroline, 2,9-dimethyl-1,10-phenanthroline, 4,7-dimethoxy-1,10-phenanthroline, N,N'-bis[(E)-pyridin-2-ylmethylidene]cyclohexane-1,2-diamine, N-[(E)-phenylmethylidene], N-[(E)-phenylmethylidene]-cyclohexanamine, 1,1,1-tris(hydroxymethyl)ethane, n-butylimidazol, ethylene glycol, 2,2,6,6-tetramethylheptane-3,5-dione, 2-(2,2-dimethylpropanoyl)cyclohexanone, acetylacetone, dibenzoylmethane, 2-(2-methyl-propanoyl)cyclohexanone, biphenyl-2-yl(di-tert-butyl)phosphane, ethylenebis-(diphenylphosphine), N,N-diethylsalicylamide, 2-hydroxybenzaldehyde oxime, oxo[(2,4,6-trimethylphenyl)amino]acetic acid or 1H-pyrrole-2-carboxylic acid.

Suitable palladium salts or complexes include, but are not limited to, palladium chloride, palladium acetate, tetrakis(triphenylphosphine)palladium(0), bis(dibenzylideneacetone)palladium(0), tris(dibenzylidene-acetone)dipalladium(0), bis(triphenylphosphine)palladium(II) dichloride, [1,1'-bis(diphenyl-phosphino)ferrocene]dichloropalladium(II), bis(cinnamyl)dichlorodipalladium(II), bis(allyl)-dichlorodipalladium(II) or [1,1'-Bis(di-tert-butylphosphino)ferrocene]dichloropalladium(II).

It is also possible to generate a palladium complex in the reaction mixture by separate addition to the reaction of a palladium salt and a ligand or salt, such as triethylphosphine, tri-tert-butylphosphine, tri-tert-butylphosphonium tetrafluoroborate, tricyclohexylphosphine, 2-(dicyclohexylphosphino)biphenyl, 2-(di-tert-butylphosphino)biphenyl, 2-(dicyclohexylphosphino)-2'-(N,N-dimethylamino)biphenyl, 2-(tert-butylphosphino)-2'-(N,N-dimethylamino)biphenyl, 2-di-tert-butylphosphino-2',4',6'-triisopropylbiphenyl, 2-dicyclohexylphosphino-2',4',6'-triisopropylbiphenyl, 2-dicyclohexylphosphino-2,6'-dimethoxybiphenyl, 2-dicyclohexylphosphino-2',6'-diisopropoxybiphenyl, triphenylphosphine, tris-(o-tolyl)phosphine, sodium 3-(diphenylphosphino)benzenesulfonate, tris-(2-methoxyphenyl)phosphine, 2,2'-bis(diphenylphosphino)-1,1'-binaphthyl, 1,4-bis(diphenylphosphino)butane, 1,2-bis(diphenylphosphino) ethane, 1,4-bis(dicyclohexylphosphino) butane, 1,2-bis(dicyclohexylphosphino)-ethane, 2-(dicyclohexylphosphino)-2'-(N,N-dimethylamino)-biphenyl, 1,1'-bis(diphenylphosphino)-ferrocene, (R)-(−)-1-[(S)-2-diphenylphosphino)ferrocenyl]ethyldicyclohexylphosphine, tris-(2,4-tert-butyl-phenyl)phosphite, di(1-adamantyl)-2-morpholinophenylphosphine or 1,3-bis(2,4,6-trimethylphenyl)imidazolium chloride.

The appropriate catalyst and/or ligand may be chosen from commercial catalogues such as "Metal Catalysts for Organic Synthesis" by Strem Chemicals or from reviews (Chemical Society Reviews (2014), 43, 3525, Coordination Chemistry Reviews (2004), 248, 2337 and references therein).

Some of the processes described herein may be performed by metallo-photoredox catalysis according to methods reported in the literature (Nature chemistry review, (2017) 0052 and references therein; Science (2016) 352, 6291, 1304; Org. Lett. 2016, 18, 4012, J. Org. Chem 2016, 81, 6898; J. Am. Chem. Soc. 2016, 138, 12715, J. Am. Chem. Soc. 2016, 138, 13862; J. Am. Chem. Soc. 2016, 138, 8034; J. Org. Chem. 2016, 81, 12525, J. Org. Chem. 2015, 80, 7642). The process is then performed in the presence a photosensitizer, such as Ir and Ru complexes or organic dyes, and a metal catalyst such as Ni complexes. The reaction can be performed in the presence of a ligand and if appropriate in the presence of a base under irradiation with blue or white light.

Suitable photosensitizers include, but are not limited to, Ir(III) photocatalyst such as $[Ir(dFCF_3ppy)_2(bpy)]PF_6$ ($dFCF_3ppy$=2-(2,4-difluorophenyl)-5-trifluoromethylpyridine, bpy=2,2'-bipyridine), $[Ir(dFCF_3ppy)_2(dtbbpy)]PF_6$ (dtbbpy=4,4'-di-tert-butyl-2,2'-bipyridine), $Ir(ppy)_2(dtbbpy)PF_6$ (ppy=2-phenylpyridine), $Ir(ppy)_2(bpy)PF_6$, $Ir(dFppy)_3PFs$ ($dFCF_3ppy$=2-(2,4-difluorophenyl)pyridine), fac-$Ir(ppy)_3$, $(Ir[diF(5-Me)ppy]_2(tetraMePhen)PF_6$ (diF(5-Me)ppy=2-(2,4-difluorophenyl)-5-methy-lpyridine, tetraMePhen=3,4,7,8-tetramethyl-1,10-phenanthroline), Ru(II) photocatalyst such as $Ru(bpy)_3C_{12}$ or $Ru(bpy)_3(PF_6)_2$ or organic dyes like 9-mesityl-10-acridinium perchlorate or tetrafluoroborate, or 2,4,5,6-tetra-9H-carbazol-9-yl-1,3-benzenedicarbonitrile, 9-fluorenone and 9,10-phenanthrenequinone.

Suitable nickel catalysts include, but are not limited to, bis(1,5-cyclooctadiene)nickel (0), nickel(II) chloride, nickel (II) bromide, nickel(II) iodide under their anhydrous or hydrate forms or as dimethoxyethane complexes, nickel(II) acetylacetonate, nickel(II) nitrate hexahydrate. These nickel catalysts can be used in combination with bipyridine ligand such as 2,2'-bipyridine, 4,4'-di-tert-butyl-2,2'-bipyridine, 4,4'-dimethoxy-2,2'-bipyridine, 4,4'-dimethyl-2,2'-bipyridine or phenantroline such as 1,10-phenanthroline, 4,7-dimethyl-1,10-phenantroline, 4,7-dimethoxy-1,10-phenantroline or diamines such as N,N,N',N'-tetramethylethylenediamine or dione such as tetramethylheptanedione.

The processes described herein may be performed at temperature ranging from −105° C. to 250° C., preferably from −78° C. to 185° C.

The reaction time varies as a function of the scale of the reaction and of the reaction temperature, but is generally between a few minutes and 48 hours.

The processes described herein are generally performed under standard pressure. However, it is also possible to work under elevated or reduced pressure.

The processes described herein may optionally be performed under microwave irradiation under standard or elevated pressure.

In the processes described herein, the starting materials are generally used in approximately equimolar amounts. However, it is also possible to use one of the starting materials in a relatively large excess.

Processes for the Preparation of Compounds of Formula (I)

Process A

A compound of formula (I-a-1) (i.e. compound of formula (I) wherein A is O, T is hydrogen and m is 1 or 2) can be prepared by a process, as shown in scheme 1, comprising the steps of:

when W is hydrogen, treating the compound of formula (4) with a dehydrating agent, optionally in the presence of a base to obtain directly the compound of formula (I-a-1);

when W is an aminoprotecting group, treating the compound of formula (4) with a dehydrating agent, optionally in the presence of a base, and then performing a deprotection step to obtain the compound of formula (I-a-1).

Scheme 1: Process A - Synthesis of compounds of formula (I-a-1)

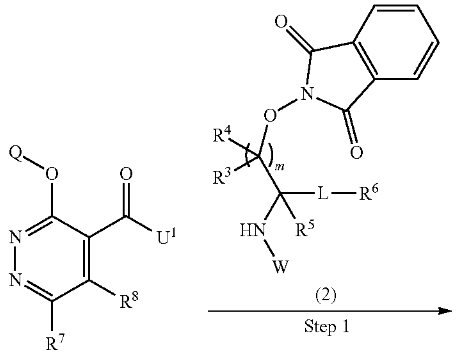

(1)

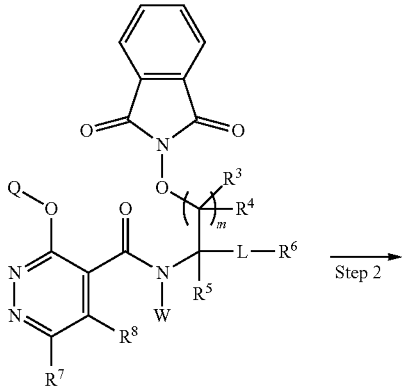

(3)

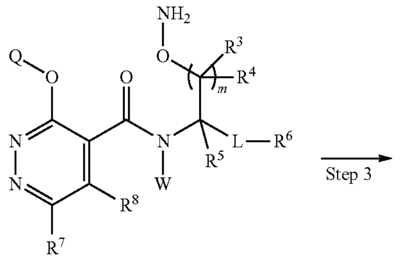

(4)

-continued

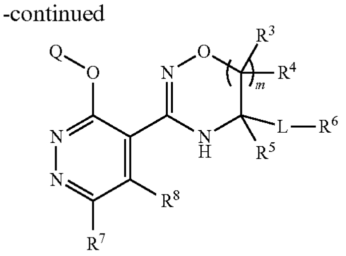

(I-a-1)

$U^1$ = hydroxyl, halogen, $C_1$-$C_6$-alkoxy
W = hydrogen, tert-butoxycarbonyl, allyl or (4-methoxyphenyl)methyl
m = 1 or 2

The compound of formula (I-a-1) can be obtained by treating a compound of formula (4) with a dehydrating agent such as $POCl_3$, $P_2O_5$ or triflic anhydride, optionally in the presence of a base. Such methods to form oxadiazine rings are known and have been described in the literature (J. Med. Chem. 2017, 60, 2383-2400). The reaction may be performed in any customary inert organic solvents. Preference is given to using optionally halogenated aliphatic, alicyclic or aromatic hydrocarbons, such as petroleum ether, hexane, heptane, cyclohexane, methylcyclohexane, benzene, toluene, xylene or decalin; chlorobenzene, dichlorobenzene, dichloromethane, chloroform, carbon tetrachloride, dichlorethane or trichlorethane; ethers, such as diisopropyl ether, methyl t-butyl ether, methyl t-amyl ether, dioxane, tetrahydrofuran, 1,2-dimethoxyethane, 1,2-diethoxyethane or anisole; nitriles, such as acetonitrile, propionitrile, n- or i-butyronitrile or benzonitrile; alcohols, such as ethanol or isopropanol.

When W represents an amino protecting group, step 3 is followed by an additional deprotection step using reaction conditions described in the literature (Greene's Protective Groups in organic Synthesis; Peter G. M. Wuts; Wiley; Fifth Edition; 2014; 895-1194). For example a tert-butoxycarbonyl group can be removed in acidic medium such as hydrochloric acid or trifluoroacetic acid.

Compound of formula (4) can be obtained by:

reacting a compound of formula (1) with an amine of formula (2) or one of its salt to provide a compound of formula (3);

removing the phtalimide group of compound (3) to provide a compound of formula (4). Reaction conditions to remove a phtalimide group are well known and have been reported in the literature (Greene's Protective Groups in organic Synthesis; Peter G. M. Wuts; Wiley; Fifth Edition; 2014; 1012-1014).

Compounds of formula (1) can be prepared by one or more processes described herein (see processes N, O and P)

Amines of formula (2) can be prepared by process S described herein.

Compounds of formula (1) wherein $U^1$ is a hydroxyl group can be reacted with an amine of formula (2) in the presence of a condensing reagent by means of methods described in the literature (e.g. Tetrahedron 2005, 61, 10827-10852). Examples of suitable condensing reagents include, but are not limited to, halogenating reagents (e.g. phosgene, phosphorous tribromide, phosphorous trichloride, phosphorous pentachloride, phosphorous trichloride oxide, oxalyl chloride or thionyl chloride), dehydrating reagents (e.g. ethyl chloroformate, methyl chloroformate, isopropyl chloroformate, isobutyl chloroformate or methanesulfonyl chloride), carbodiimides (e.g. N,N'-dicyclohexylcarbodiimide (DCC)) or other customary condensing (or peptide coupling) reagents (e.g. phosphorous pentoxide, polyphosphoric acid, bis(2-oxo-3-oxazolidinyl)phosphinic chloride, 1-[Bis(dimethylamino)methylene]-1H-1,2,3-triazolo[4,5-b]pyridinium 3-oxide hexafluorophosphate (HATU), N,N'-carbonyl-diimidazole, 2-ethoxy-N-ethoxycarbonyl-1,2-dihydroquinoline (EEDQ), triphenylphosphine/tetrachloro-methane, 4-(4, 6-dimethoxy[1.3.5]-triazin-2-yl)-4-methylmorpholinium chloride hydrate, bromo-tripyrrolidinophosphoniumhexafluorophosphate or propanephosphonic anhydride (T3P).

Compounds of formula (1) wherein $U^1$ is a halogen atom can be reacted with an amine of formula (2) in the presence of an acid scavenger by means of well-known methods. Suitable acid scavengers include any inorganic and organic bases, as described herein, which are customary for such reactions. Preference is given to alkali metal carbonates, alkaline earth metal acetates, tertiary amines or aromatic bases.

Compounds of formula (1) wherein $U^1$ is a $C_1$-$C_6$-alkoxy group can be reacted with an excess of amine of formula (2), optionally in the presence of a Lewis acid such as trimethylaluminium.

Process B

A compound of formula (I-a-1) (i.e. compound of formula (I) wherein A is O, T is hydrogen and m is 1 or 2) can be prepared by a process comprising the steps of reacting a compound of formula (7) with a compound of formula (8) in the presence of a base (e.g. organic or inorganic base) and optionally in the presence of a suitable copper salt or complex as shown in scheme 2.

Scheme 2: Process B - Synthesis of compounds of formula (I-a-1)

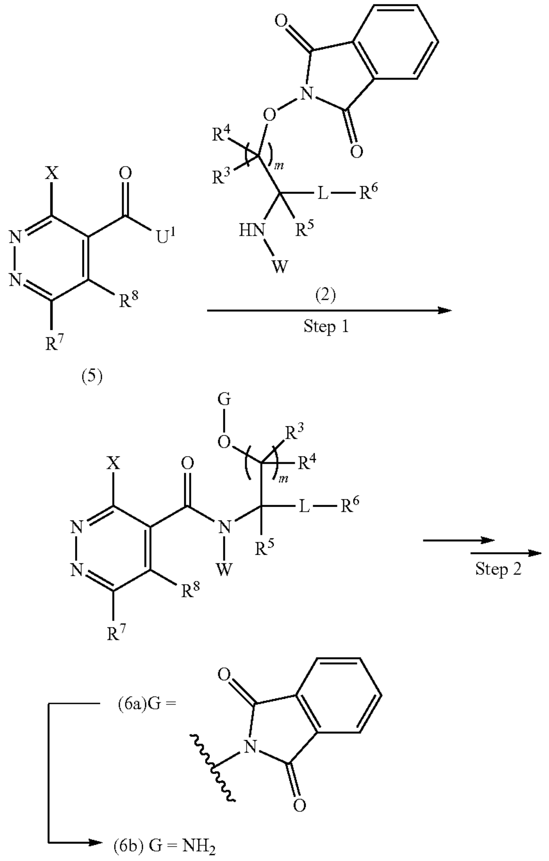

-continued

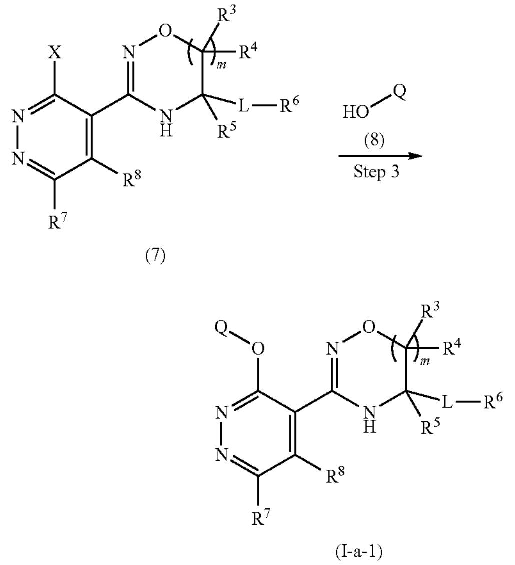

$U^1$ = hydroxyl, halogen, $C_1$-$C_6$-alkoxy

X = halogen, preferably chlorine

W = hydrogen, tert-butoxycarbonyl, benzyl, allyl or (4-methoxyphenyl)methyl m = 1 or 2

Compounds of formula (7) can be prepared by:

reacting a compound of formula (5) with an amine of formula (2) or one of its salt to obtain a compound of formula (6a);

removing the phtalimide group of compound (6a) to obtain a compound of formula (6b);

when W is hydrogen, treating the compound of formula (6b) with a dehydrating agent, optionally in the presence of a base to obtain directly the compound of formula (7);

when W is an aminoprotecting group, treating the compound of formula (6b) with a dehydrating agent, optionally in the presence of a base and then performing a deprotection step to obtain the compound of formula (7), in the same conditions as described herein for process A.

The reaction of compound of formula (7) with a compound of formula (8) may be performed in the presence of a transition metal catalyst such as a copper salt or complex, and if appropriate in the presence of a ligand as described herein.

Compounds of formula (5) are commercially available or may be prepared by process Q described herein.

Compounds of formula (8) are commercially available or may be obtained by conversion or derivatization of another compound of formula (8) in accordance to well-known methods.

Process C

A compound of formula (I-a-1) (i.e. compound of formula (I) wherein A is O, T is hydrogen and m is 1 or 2) can be prepared by a process, as shown in scheme 3, comprising the step of adding a reducing agent to the compound of formula (12) under acidic conditions to provide a compound of formula (I-a-1).

Scheme 3: Process C-Synthesis of compounds of formula (I-a-1)

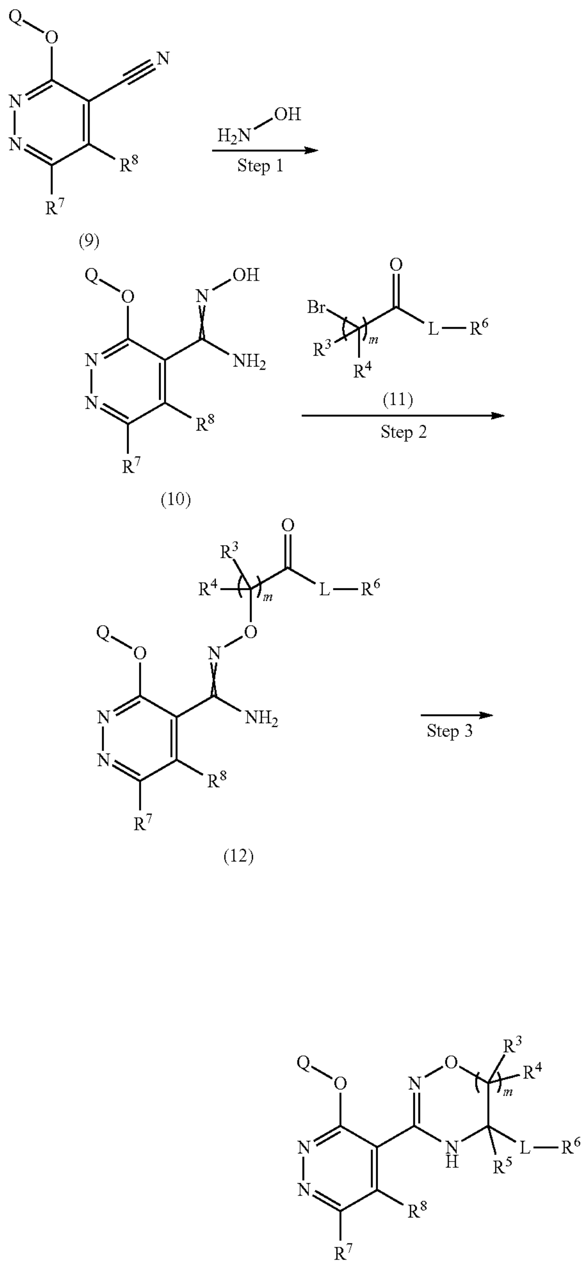

(9) (10) (11) (12) (I-a-1)

$R^5$ = hydrogen, hydroxyl, $C_1$-$C_6$-alkoxy
m = 1 or 2

Compound of formula (12) can be cyclized under acidic conditions in the presence of a reducing agent such as sodium cyanoborohydride to provide a compound of formula (I-a-1). Reaction conditions to form oxadiazine rings with this methodology are known and have been described in the literature (Heterocycles 2016, 92, 2166-2200).

Compound of formula (12) can be obtained by reacting a compound of formula (10) with a compound of formula (11) in the presence of a base. Suitable bases can be alkali metal hydrides such as sodium hydride, alkali metal carbonates such as potassium carbonate, alkali metal hydroxides such as potassium hydroxide, or phosphazene bases such as BEMP as described in the literature (Heterocycles 2016, 92, 2166-2200).

Compound of formula (10) can be obtained by reacting a compound of formula (9) with hydroxylamine or one of its salt. Reaction conditions to perform such transformations are known and have been reported in the literature (WO2010138600).

Compounds of formula (9) may be prepared by process R described herein.

Compounds of formula (11) are either commercially available or can be prepared by processes described in the literature (Eur. J. Med. Chem. 2014, 84, 302, Eur. J. Med. Chem. 2015, 100, 18-23, WO2017031325).

Process D

A compound of formula (I-a-1) (i.e. compound of formula (I) wherein A is O, T is hydrogen, L is a direct bond and m is 1 or 2) can be prepared by a process comprising the steps of:

- placing a compound of formula (13) under oxidative condition to provide compound (14);
- when $R^6$—H (15) is an aromatic $C_6$-$C_{14}$-carbocycle, a non-aromatic $C_7$-$C_{14}$-carbocycle, a non-aromatic 7- to 14-membered heterocycle, or an aromatic 5- to 14-membered heterocycle, treating a compound of formula (14) with a compound of formula (15) under acidic conditions to form a compound of formula (I-a-1).
- when $R^6$—H (15) is an alcohol ($R^{6'}$—O)—H or a thiol ($R^{6'}$—S)—H derivative, treating a compound of formula (14) with an halogenating reagent such as $SOCl_2$ and a compound of formula (15) to form compounds of formula (I-a-1) in which $R^6$ represents an oxy, an alkoxy, or a thiol group.

as shown in scheme 4.

Scheme 4: Process D-Synthesis of compounds of formula (I-a-1)

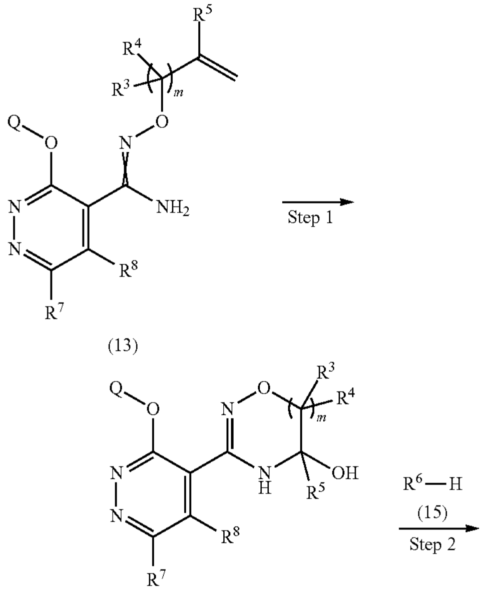

(13) (14) (15)

-continued

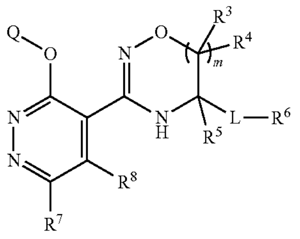

(I-a-1)

L = direct bond $R^6$ = aromatic $C_6$-$C_{14}$-carbocycle, non-aromatic $C_7$-$C_{14}$-carbocycle, non-aromatic 7- to 14-membered heterocycle, aromatic 5- to 14-membered heterocycle, aromatic $C_6$-$C_{14}$-carbocycloxy, non-aromatic $C_6$-$C_{14}$-carbocycloxy, non-aromatic 3- to 14-membered heterocycloxy, aromatic 5- to 14-membered heterocycloxy, non-aromatic $C_3$-$C_{12}$-carbocyclylsulfinyl, aromatic $C_6$-$C_{14}$-carbocyclylsulfinyl, aromatic 5- to 14-membered heterocyclylsulfinyl, non-aromatic 5- to 14-membered heterocyclylsulfinyl, non-aromatic $C_3$-$C_{12}$-carbocyclylsulfonyl, aromatic $C_6$-$C_{14}$-carbocyclylsulfonyl, aromatic 5- to 14-membered heterocyclylsulfonyl, non-aromatic 5- to 14-membered heterocyclylsulfonyl, $C_1$-$C_3$-alkoxy substituted by a non-aromatic $C_3$-$C_{12}$-carbocycle, $C_1$-$C_3$-alkoxy substituted by and aromatic $C_6$-$C_{14}$-carbocycle, $C_1$-$C_3$-alkoxy substituted by a non-aromatic 3- to 14-membered heterocycle, $C_1$-$C_3$-alkoxy substituted by an aromatic 5- to 14-membered heterocycle, $C_1$-$C_3$-haloalkoxy substituted by a non-aromatic $C_3$-$C_{12}$-carbocycle, $C_1$-$C_3$-haloalkoxy substituted by an aromatic $C_6$-$C_{14}$-carbocycle, $C_1$-$C_3$-haloalkoxy substituted by a non-aromatic 3- to 14-membered heterocycle, $C_1$-$C_3$-haloalkoxy substituted by an aromatic 5- to 14-membered heterocycle, $C_1$-$C_3$-sulfanyl substituted by a non-aromatic $C_3$-$C_{12}$-carbocycle, $C_1$-$C_3$-sulfanyl substituted by an aromatic $C_6$-$C_{14}$-carbocycle, $C_1$-$C_3$-sulfanyl substituted by a non-aromatic 3- to 14-membered heterocycle and $C_1$-$C_3$-sulfanyl substituted by an aromatic 5- to 14-membered heterocycle, m = 1 or 2

The compound of formula (14) can be reacted with an aromatic $C_6$-$C_{14}$-carbocycle, a non-aromatic $C_7$-$C_{14}$-carbocycle, a non-aromatic 7- to 14-membered heterocycle, or an aromatic 5- to 14-membered heterocycle ($R^6$—H) under acidic conditions to provide a compound of formula (I-a-1). Reaction conditions to form oxadiazine rings with this methodology are known and have been described in the literature (WO2017031325).

Compounds of formula (14) can be obtained from a compound of formula (13) under oxidative conditions, for example in the presence of osmium trioxide and sodium periodate.

Compounds of formula (13) may be prepared by process R described herein.

Process E

A compound of formula (I-a-1) (i.e. compound of formula (I) wherein A is O, T is hydrogen and m is 1 or 2) can be prepared by a process comprising the steps of:

- reacting a compound of formula (18) with a compound of formula (19) or one of its salt to provide a compound of formula (20),
- when $E^1$ is hydroxyl, converting the compound of formula (20) into compound of formula (I-a-1) using Mitsunobu reaction conditions,
- when $E^1$ is halogen, converting the compound of formula (20) into compound of formula (I-a-1) in the presence of a base, as shown in scheme 5.

Scheme 5: Process E - Synthesis of compounds of formula (I-a-1)

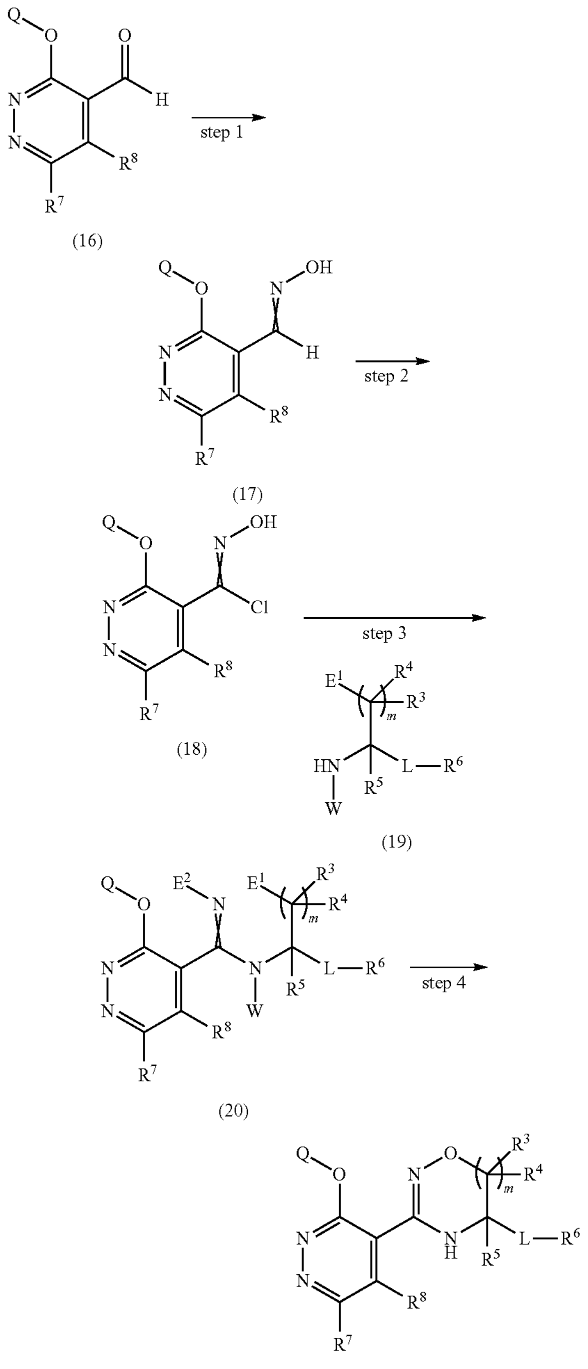

W = hydrogen, tert-butoxycarbonyl, benzyl, allyl or (4-methoxyphenyl)methyl $E^1$ = hydroxyl or halogen $E^2$ = hydroxyl m = 1 or 2

Aminoalcohols of formula (19-a, $E^1$=hydroxyl) are commercially available or may be producible by methods described in the literature (Molecules, 9 (6), 405-426; 2004; WO2017203474). Compounds of formula (19-b, $E^1$=halogen) or one of its salts can be obtained from the corresponding aminoalcohol by well-known methods.

When $E^1$ is hydroxyl, the compound of formula (20) can be converted by Step 4 of the process into a compound of formula (I-a-1) using classical Mitsunobu reaction conditions known by the skilled person of the art (Strategic Applications of Named Reactions in Organic Synthesis; Laszlo Kürti, Barbara Czako; Elsevier; 2005; 294-295 and reference herein).

When $E^1$ is halogen, the compound of formula (20) can be converted by Step 4 of the process into a compound of formula (I-a-1) in the presence of a base as referred herein.

When W represents an amino protecting group, Step 4 is followed by an additional deprotection step using reaction conditions described in the literature (Greene's Protective Groups in organic Synthesis; Peter G. M. Wuts; Wiley; Fifth Edition; 2014; 895-1194) to provide a compound of formula (I-a-1).

Compound of formula (18) can be treated with a compound of formula (19) or one of its salt in the presence of a base such as triethylamine to form a compound of formula (20).

Compound of formula (18) can be obtained by Step 2 of the process by treating an oxime of formula (17) with a halogenating reagent such as NCS. Reaction conditions to perform such transformations have been reported in the literature (WO2013173672; RSC Advances 2015, 5, 58587-58594).

An oxime of formula (17) can be obtained by Step 1 from an aldehyde of formula (16) in the presence of hydroxylamine or one of its salt, optionally in the presence of a base. Such transformations are known and have been reported in the literature (Tetrahedron 2000, 56, 1057-1064; ChemMedChem 2013, 8, 1210-1223).

Aldehydes of formula (16) can be prepared according to well-known methods for the one skilled in the art; for example either by treating the weinreb amide precursor with DIBAL-H (WO2016045591) or by converting the ester precursor into the primary alcohol followed by oxidation of the alcohol into the corresponding aldehyde (WO199850031). The ester precursors to access such aldehydes can be prepared according to Process N, O, P described herein.

Process F

A compound of formula (I-a-1) (i.e. compound of formula (I) wherein A is O, T is hydrogen and m is 1 or 2) or (I-a-2) (i.e. compound of formula (I) wherein A is NH, T is hydrogen and m is 1 or 2) can be prepared by a process comprising the steps of:

- reacting a compound of formula (1) with an amine of formula (19) or one of its salt to provide a compound of formula (21) under similar conditions as described in process A,
- treating a compound of formula (21) with a dehydrating agent followed by hydroxylamine or hydrazine to form a compound of formula (20)
- when $E^1$ and $E^2$ is hydroxyl, converting the compound of formula (20) into compound of formula (I-a-1) using Mitsunobu reaction conditions,
- when $E^1$ is halogen and $E^2$ is hydroxyl or $—NH_2$, converting the compound of formula (20) into compound of formula (I-a-1) to (I-a-2) in the presence of a base, as shown in scheme 6.

Scheme 6: Process F - Synthesis of compounds of formula (I-a-1) and (I-a-2)

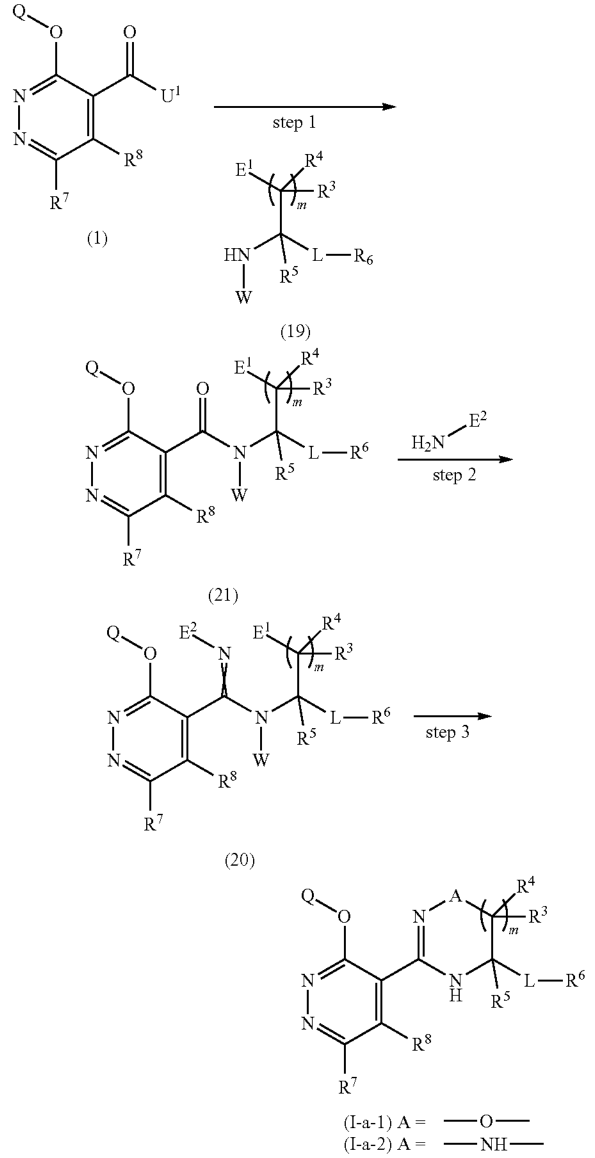

(1) (19) (21) (20)

(I-a-1) A = —O—

(I-a-2) A = —NH—

$U^1$ = hydroxy, halogen, $C_1$-$C_6$-alkoxy $E^1$ = hydroxyl or halogen $E^2$ = hydroxyl or $—NH_2$ W = hydrogen, tert-butoxycarbonyl, benyl, allyl or (4-methyoxyphenyl)methyl m = 1 or 2

Step 2 and step 3 of process F can be performed using similar reaction conditions as described in process E.

Aminoalcohols of formula (19-a, $E^1$=hydroxyl) are commercially available or may be producible by methods described in the literature (Molecules, 9 (6), 405-426; 2004; WO2017203474). Compounds of formula (19-b, $E^1$=halogen) or one of its salt can be obtained from the corresponding aminoalcohol by well-known methods.

Process G

A compound of formula (I-a-1) (i.e. compound of formula (I) wherein A is O, T is hydrogen and m is 1 or 2) or (I-a-2) (i.e. compound of formula (I) wherein A is NH, T is hydrogen and m is 1 or 2) can be prepared by a process comprising the steps of:

reacting a compound of formula (5) with an amine of formula (19) to provide a compound of formula (22) under similar conditions as described in process A, treating a compound of formula (22) with a dehydrating agent followed by hydroxylamine or hydrazine to form a compound of formula (23)

when $E^1$ and $E^2$ is hydroxyl, converting the compound of formula (23) into compound of formula (7) using Mitsunobu reaction conditions, when $E^1$ is halogen and $E^2$ is hydroxyl or —$NH_2$, converting the compound of formula (23) into compound of formula (7) or (24) in the presence of a base, reacting a compound of formula (7) or (24) with a compound of formula (8) in the presence of a base (e.g. organic or inorganic base) and optionally in the presence of a suitable copper salt or complex to provide a compound of formula (I-a-1) or (I-a-2)

as shown in scheme 7.

Scheme 7: Process G - Synthesis of compounds of formula (I-a-1) and (I-a-2)

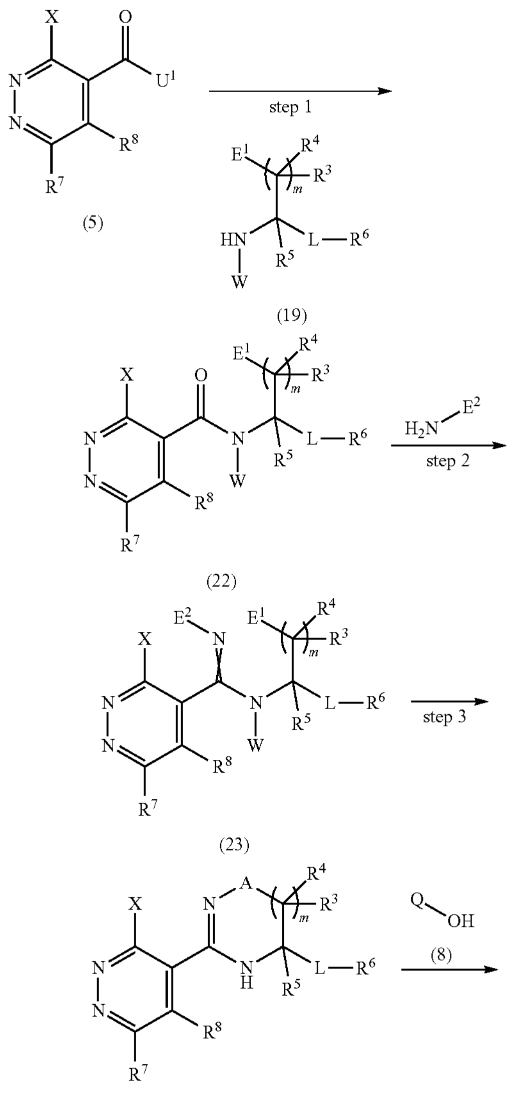

(5) (19) (22) (23)

(7) A = —O—
(24) A = —NH—

-continued

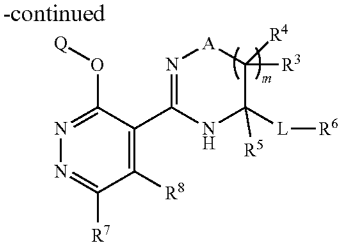

(I-a-1) A = —O—
(I-a-2) A = —NH—

$U^1$ = hydroxy, halogen, $C_1$-$C_6$-alkoxy
X = halogen, preferably chlorine
$E^1$ = hydroxyl or halogen
$E^2$ = hydroxyl or —$NH_2$
W = hydrogen, tert-butoxycarbonyl, benyl, allyl or (4-methyoxyphenyl)methyl
m = 1 or 2

Process H

A compound of formula (I-a-1) (i.e. compound of formula (I) wherein A is O, T is hydrogen and m is 1 or 2), (I-a-3) (i.e. compound of formula (I) wherein A is $CR^1R^2$, T is hydrogen and m is 1 or 2), (I-a-4) (i.e. compound of formula (I) wherein A is C(═O), T is hydrogen and m is 1 or 2) or (I-a-5) (i.e. compound of formula (I) wherein A is S(═O)$_2$, T is hydrogen and m is 1 or 2) can be prepared by a process comprising the steps of:

treating a compound of formula (9) with an alkoxide to provide compound of formula (25), reacting the compound of formula (25) with respectively an amine of formula (26a-1), (26a-2), (26a-3) or (26a-4), as shown in scheme 8.

Scheme 8: Process H - Synthesis of compounds of formula (I-a-1), (I-a-3), (I-a-4) or (I-a-5)

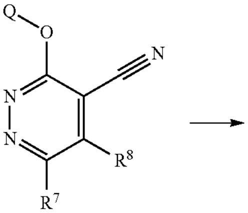

(9)

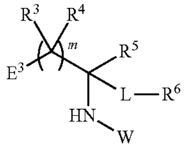

(26a)

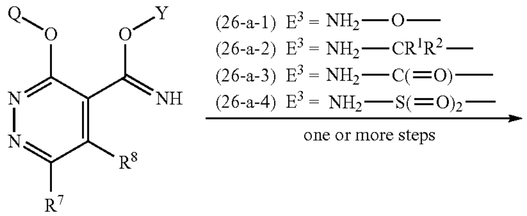

(25)

-continued

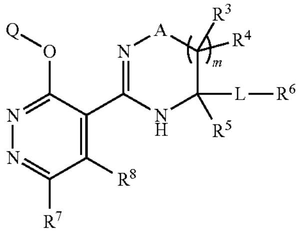

(I-a-1) A = —O—
(I-a-3) A = —$CR^1R^2$—
(I-a-4) A = —C(=O)—
(I-a-5) A= —$S(=O)_2$—

W = hydrogen, tert-butoxycarbonyl, benzyl, allyl or (4-methoxyphenyl)methyl
Y = $C_1$-$C_6$-alkyl
m = 1 or 2

Alternatively, a compound of formula (I-a-5) may be prepared by treating a pyridazine 4-carboxamidine compound with a trans-styrylsulfonyl chloride in analogy to methods described in the literature (J. Org. Chem. 1974, 39, 3080)

The compound of formula (25) can be obtained by treating a compound of formula (9) with an alkoxide such as sodium methanolate or sodium ethanolate according to methods described in the literature (Heterocycles, 34, 1992, 929-935).

The compound of formula (25) is treated with a compound of formula (26-a-1), (26-a-2), (26-a-3) or (26-a-4) and cyclized under acidic conditions to form respectively a compound of formula (I-a-1), (I-a-3), (I-a-4) or (I-a-5). Reaction conditions to perform such transformations based on this methodology have been described in the literature (Heterocycles 2016, 92, 2166-2200).

Amines of formula (26-a-1), (26-a-2), (26-a-3) or (26-a-4) are either commercially available, or may be prepared by methods described in the literature (Molecules, 9 (6), 405-426; 2004, WO2017203474; J. Med. Chem 1985, 28, 694-698; J. Med. Chem 2006, 49, 4333-4343) and by Process S of this invention.

Process I

A compound of formula (L-a-6) (i.e. compound of formula (I) wherein A is O, T is hydrogen and m is 2), can be prepared by a process comprising the steps of:

treating a compound of formula (9) with an hydroxylamine derivative (27) in the presence of a suitable base as described herein to provide compound of formula (28), reacting the compound of formula (28) with a reagent of formula (29) in the presence of a metal catalyst and a suitable ligand to provide a compound of formula (30)

treating a compound of formula (30) with iodine and phenylsilane to form a compound of formula (I-a-6), as shown in scheme 9.

Scheme 9: Process I - Synthesis of compounds of formula (I-a-6)

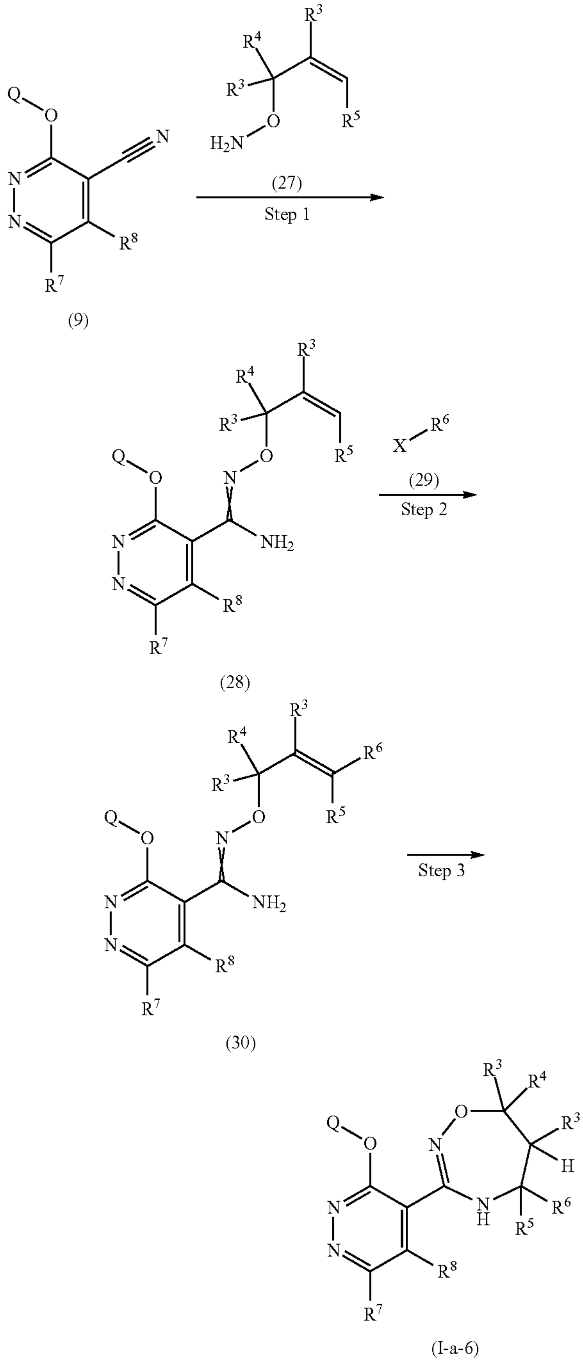

X = halogen
$R^6$ = aromatic $C_6$-$C_{14}$-carbocycle, 5- or 6-membered monocyclic aromatic heterocycle, non-aromatic $C_3$-$C_{12}$- carbocycle, non-aromatic 3- to 14-membered heterocycle Reagents of formula (27) are either commercially available or producible by processes described in the literature (WO2010099279).

Reagents of formula (29) are commercially available or can be prepared by known processes.

Process J

A compound of formula (I-a-7) (i.e. compound of formula (I) wherein A is $CR^1R^2$, T is hydrogen and m is 0) can be prepared by a process comprising the step of reacting a compound of formula (1) with a diamine of formula (31) as shown in scheme 10.

Scheme 10: Process J - Synthesis of imidazolines of formula (I-a-7)

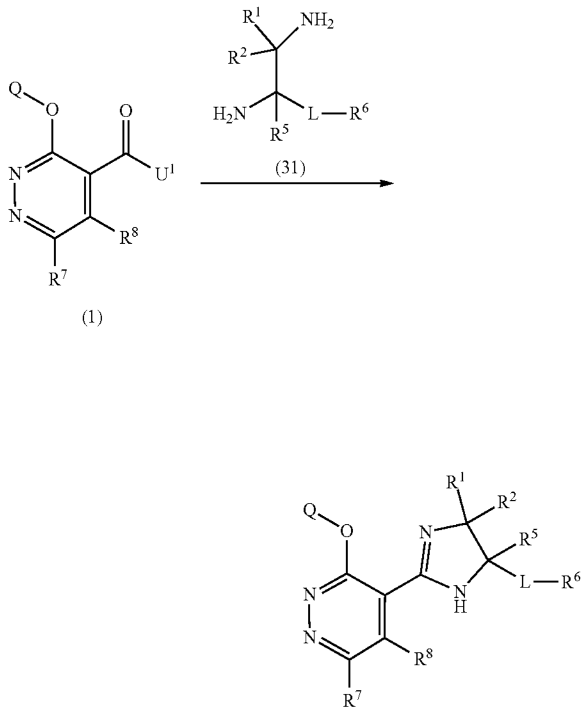

(31)

(1)

(I-a-7)

$U^1$ = hydroxyl, halogen

Process J can be performed in the presence of a dehydrating agent such as $POCl_3$.

Diamines of formula (31) are commercially available or can be prepared by methods described in the literature (Eur. J. Med. Chem 1990, 25(1), 35-44; J. Org. Chem 2012, 77(9), 4375-4384; WO2009003867).

Process K

A compound of formula (I-a) can be converted by means of methods described in the literature to the corresponding compounds (I-b) or (I-c) in one or more steps as shown in scheme 11.

Scheme 11: Process K - Synthesis of compounds of formula (I-b) and (I-c)

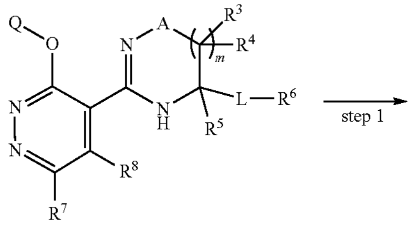

(I-a)

-continued

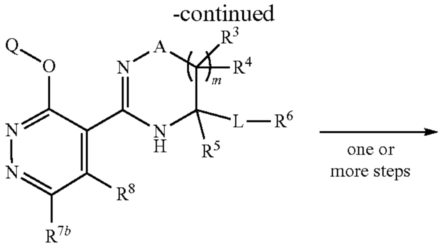

(I-b)

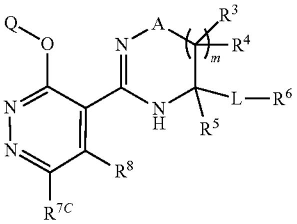

(I-c)

$R^{7a}$ = hydrogen or halogen (preferably chlorine)

$R^{7b}$ = hydrogen, halogen, cyano, $C_1$-$C_6$-alkyl, $C_1$-$C_6$-haloalkyl, $C_2$-$C_6$-alkenyl, $C_2$-$C_6$-haloalkenyl, $C_2$-$C_6$, alkynyl, $C_2$-$C_6$-haloalkynl, $C_1$-$C_6$-alkysulfanyl, $C_1$-$C_6$-haloalkylsulfanyl, $C_3$-$C_8$-cycloalkylsulfanyl, $C_3$-$C_8$-cycloalky, $C_3$-$C_6$-cycloalkenyl, aromatic $C_6$-$C_{14}$-carbocycle, aromatic 5- or 6-membered monocyclic heterocycle, non-aromatic 3- to 7-membered monocyclic heterocycle, $—N(R^e)_2$, $—C(=O)(OR^g)$ $R^{7c}$ = nitro, formyl, $C_1$-$C_6$-alkylcarbonyl, $C_1$-$C_6$-haloalkylcarbonyl, $C_1$-$C_6$-hydroxyalkyl, $C_1$-$C_6$-fluoroalkyl, $C_1$-$C_6$-alkylsulfinyl, $C_1$-$C_6$-haloalkylsulfinyl, $C_3$-$C_8$-cycloalkylsulfinyl, $C_1$-$C_6$-alkylsulfonyl, $C_1$-$C_6$-haloalkylsulfonyl, $C_3$-$C_8$- cycloalkylsulfonyl, $—C(=NR^f)R^f$, $—C(=N(R^g)_2$, $—S(=O)(=NR^g)R^g$, $—S(=O)_2N(R^g)_2$ In scheme 11, $R^e$, $R^f$, $R^g$ are as disclosed herein and the aliphatic and cyclic substituents $R^{7b}$, $R^{7c}$, $R^e$, $R^f$, $R^g$ may be substituted as disclosed herein.

Non-limiting examples of conversions performed in accordance with scheme 11 are provided below.

A compound of formula (I-a) wherein $R^{7a}$ is a chlorine atom can be converted into a compound of formula (I-b) wherein $R^{7b}$ is a bromine or an iodine atom by means of methods described in the literature (e.g. WO2016185342, WO2007022937).

A compound of formula (I-a) wherein $R^{7a}$ is a halogen atom can be converted into a compound of formula (I-b) wherein $R^{7b}$ is a hydrogen atom in the presence of a palladium catalyst as reported in the literature (Journal of Molecular Catalysis A: Chemical, 2014, 393, 191-209).

A compound of formula (I-a) wherein $R^{7a}$ is a hydrogen atom or a halogen atom can be converted into a compound of formula (I-b) wherein $R^{7b}$ is cyano, $C_1$-$C_6$-alkyl, $C_1$-$C_6$-haloalkyl, $C_2$-$C_6$-alkenyl, $C_2$-$C_6$-haloalkenyl, $C_2$-$C_6$-alkynyl, $C_2$-$C_6$-haloalkynyl, $C_1$-$C_6$-alkylsulfanyl, $C_1$-$C_6$-haloalkylsulfanyl, $C_3$-$C_8$-cycloalkyl, $C_3$-$C_6$-cycloalkenyl, aromatic $C_6$-$C_{1a}$-carbocycle, aromatic 5- or 6-membered monocyclic heterocycle, non-aromatic 3- to 7-membered monocyclic heterocycle, $—N(R^e)_2$ or $—C(=O)(OR^g)$ by transition metal catalyzed or metallo-photoredox catalyzed processes as described herein.

A compound of formula (I-b) wherein $R^{7b}$ is a $C_2$-$C_6$-alkenyl group substituted by a $C_1$-$C_3$-alkoxy can be converted into a compound of formula (I-c) wherein $R^{7c}$ is a $C_1$-$C_6$-alkylcarbonyl group by means of methods described in the literature (e.g. J. Org. Chem. 1993, 55, 3114).

The compound of formula (I-c) wherein $R^{7c}$ is a $C_1$-$C_6$-alkylcarbonyl group can be further converted in a compound of formula (I-c) wherein $R^{7c}$ is —C(=NR$^f$)—$C_1$-$C_6$-alkyl group by methods described in the literature (e.g. Greene's Protective Groups in organic Synthesis; Peter G. M. Wuts; Wiley; Fifth Edition; 2014; 655, 661, 667).

A compound of formula (I-c) wherein $R^{7c}$ is a $C_1$-$C_6$-alkylcarbonyl group can be further converted in a compound of formula (I-c) wherein $R^{7c}$ is $C_1$-$C_6$-hydroxyalkyl group by classical functional group interconversion such as reductions of ketones to alcohols in the presence of $NaBH_4$ in MeOH.

A compound of formula (I-c) wherein $R^{7c}$ is $C_1$-$C_6$-hydroxyalkyl group can be further converted into a compound (I-c) wherein $R^{7c}$ is $C_1$-$C_6$-fluoroalkyl in the presence of a fluorinating agent. Non-limitative examples of fluorinating agents include sulfur fluorides such as sulfur tetrafluoride, diethylaminosulfurtrifluoride, morpholinosulfur trifluoride, bis(2-methoxyethyl)aminosulfur trifluoride, 2,2-difluoro-1,3-dimethylimidazolidine or 4-tert-butyl-2,6-dimethylphenylsulfur trifluoride.

A compound of formula (I-a) can be prepared by one or more of the processes herein described.

Process L

A compound of formula (I-a) can be converted by means of methods described in the literature to the corresponding compound of formula (I-d) or compound of formula (I-e) in one or more steps as shown in scheme 12.

Scheme 12: Process L - Synthesis of compounds of formula (I-d) and (I-e)

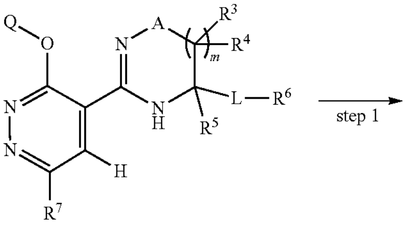

(I-a)

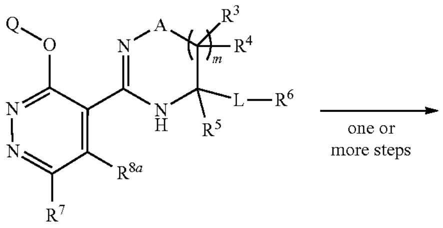

(I-d)

-continued

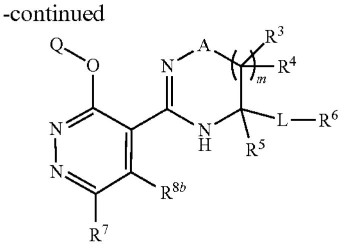

(I-e)

$R^7$ = halogen $R^{8a}$ = halogen, $C_1$-$C_6$-alkyl, $C_1$-$C_6$-haloalkyl, $C_1$-$C_6$-hydroxyalkyl, $C_3$-$C_8$-cycloalkyl, $C_3$-$C_8$-halocycloalky, $C_3$-$C_6$-cycloalkenyl, aromatic $C_6$-$C_{14}$-carbocycle, 5- to 14-membered aromatic heterocycle, 3- to 14-membered non-aromatic heterocycle;

$R^{8b}$ = halogen, cyano, nitro, amino, mercapto, hydroxyl, $C_2$-$C_6$-alkenyl, $C_2$-$C_6$-haloalkenyl, $C_2$-$C_6$-alkynyl, $C_2$-$C_6$-haloalkynyl, $C_1$-$C_6$-alkoxy, $C_1$-$C_6$-haloalkoxy, $C_2$-$C_6$-alkenyloxy, $C_2$-$C_6$-haloalkenyloxy, $C_2$-$C_6$-alkynyloxy, $C_2$-$C_6$-haloalkynyloxy, $C_3$-$C_8$-cycloalkyl, $C_3$-$C_6$-cycloalkenyl, aromatic 5- to 14-membered heterocycle, $C_3$-$C_8$-cycloalkyloxy, aromatic $C_6$-$C_{14}$-carbocyclyloxy, non-aromatic 3- to 14-membered heterocyclyloxy, aromatic 5- to 14-membered heterocclyloxy, —N($R^h$)$_2$, SR$^i$, —S(=O)R$^i$ and —S(=O)$_2$R$^i$;

$R^h$ and $R^i$ are as disclosed herein and the alipatic and cyclic substituents $R^{8a}$ and $R^{8b}$ may be substituted as disclosed herein.

Non-limiting examples of conversions performed in accordance with scheme 12 are provided below.

A compound of formula (I-a) can be converted into a compound of formula (I-d) wherein $R^{8a}$ is a halogen atom in the presence of a base and an electrophile such as NCS, NBS, NIS, hexachloroethane, bromine or iodine by means of methods described in the literature (e.g. Org. Lett. 2009, 11, 1837). Suitable bases for carrying out the process can be selected from lithium-diisopropylamide, lithium 2,2,6,6-tetramethylpiperidide, n-butyl lithium, methyl lithium, TMPZnCl·LiCl, $TMP_2Zn \cdot 2MgCl_2 \cdot 2LiCl$ (see e.g. Dissertation Albrecht Metzer 2010, University Munich).

A compound of formula (I-a) can be converted into a compound of formula (I-d) wherein $R^{8a}$ is a $C_1$-$C_6$-alkyl, $C_1$-$C_6$-haloalkyl, $C_1$-$C_6$-hydroxyalkyl, $C_3$-$C_8$-cycloalkyl, $C_3$-$C_8$-halocycloalkyl, $C_3$-$C_6$-cycloalkenyl, aromatic $C_6$-$C_{14}$-carbocycle, 5- to 14-membered aromatic heterocycle or a 3- to 14-membered non-aromatic heterocycle, optionally in the presence of a base, and when appropriate in the presence of a transition metal catalyst such as a metal salt or complex and a ligand as described herein or by methods described in the literature (Heterocycles 1976, 4(8), 1331).

A compound of formula (I-d) wherein $R^{8a}$ is a halogen atom can be converted in a compound of formula (I-e) wherein $R^{8b}$ represents cyano, nitro, amino, mercapto, hydroxyl, $C_2$-$C_6$-alkenyl, $C_2$-$C_6$-haloalkenyl, $C_2$-$C_6$-alkynyl, $C_2$-$C_6$-haloalkynyl, $C_1$-$C_6$-alkoxy, $C_1$-$C_6$-haloalkoxy, $C_2$-$C_6$-alkenyloxy, $C_2$-$C_6$-haloalkenyloxy, $C_3$-$C_8$-cycloalkyl, $C_3$-$C_6$-cycloalkenyl, aromatic 5- to 14-membered heterocycle, $C_3$-$C_8$-cycloalkyloxy, aromatic $C_6$-$C_{14}$-carbocyclyloxy, non-aromatic 3- to 14-membered heterocyclyloxy, aromatic 5- to 14-membered heterocyclyloxy, —N($R^h$)$_2$ or —SR$^i$ in the presence of a base and optionally in the presence of a transition metal catalyst such as a metal salt or complex, and if appropriate in the presence of a ligand.

A compound of formula (I-e) wherein $R^{8b}$ is a $C_2$-$C_6$-alkenyl group can be further converted in a compound of formula (I-e) wherein $R^{8b}$ is $C_1$-$C_6$-alkyl substituted by $C_1$-$C_6$-alkoxy, $C_1$-$C_6$-haloalkoxy, $C_1$-$C_6$-alkoxy-$C_1$-$C_6$-alkoxy, $C_1$-$C_6$-alkylsulfanyl, $C_1$-$C_6$-haloalkylsulfanyl, nonaromatic 3- to 7-membered monocyclic heterocycle and —$N(R^{a'})_2$ with $R^{a'}$ being independently selected from the group consisting of hydrogen, $C_1$-$C_6$-alkyl, $C_1$-$C_6$-haloalkyl and $C_3$-$C_8$-cycloalkyl, by treating the reacting compound of formula (I-e) with an oxygen, a sulfur or an amino based nucleophile.

A compound of formula (I-e) wherein $R^{8b}$ is a $SR^i$ group can be further converted in a compound of formula (I-a-8) wherein $R^{8b}$ is a —S(=O)$R^i$ or a —S(=O)$_2R^i$ group by reacting the starting compound of formula (I-a-8) with an oxidant such as hydrogen peroxide.

A compound of formula (I-a) can be prepared by one or more of the processes herein described.

Process M

A compound of formula (I-f) (i.e. formula (I) wherein T is —C(=O)$R^{a1}$, —C(=O)(O$R^{a1}$), —C(=O)N$(R^{a2})_2$, —S(=O)$R^{a1}$, —S(=O)$_2R^{a1}$ and —S(=O)$_2$N$(R^{a2})_2$ with $R^{a1}$ and $R^{a2}$ being as described herein) can be prepared by a process comprising the step of reacting a compound of formula (I-a) formula with a compound of formula (32) as shown in scheme 13.

Scheme 13: Process M - Synthesis of compounds of formula (I-f)

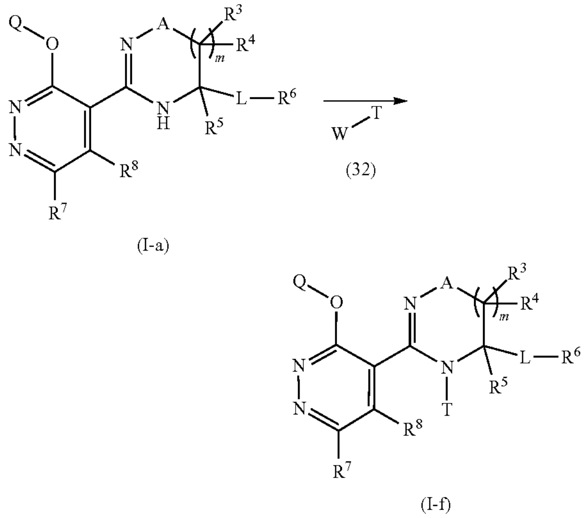

(I-a) (32) (I-f)

W = halogen, —O—C(=O)(O$R^{a1}$), —O—C(=O)$R^{a1}$ or —O—S(=O)$_2R^{a1}$ being selected from the group consisting of $C_1$-$C_6$-alkyl and $C_1$-$C_6$-haloalkyl T = —C(=O)$R^{a1}$, —C(=O)(O$R^{a1}$), —C(=O)N$(R^{a2})_2$, —S(=O)$R^{a1}$, —S(=O)$_2R^{a1}$, and —S(=O)N$(R^{a2})_2$, with $R^{a1}$ and $R^{a2}$ as described herein.

Process M can be performed by means of methods described in the literature (e.g. Tetrahedron Lett. 1995, 36, 8949; Greene's Protective Groups in organic Synthesis; Peter G. M. Wuts; Wiley; Fifth Edition; 2014; 1174-1175).

Compounds of formula (32) are commercially available.

Compounds of formula (I-a) can be prepared by one or more of the processes herein described.

Processes for the Preparation of a Compound of Formula (1)

A compound of formula (1) as described herein may be directly obtained by performing process N described below or may be obtained by conversion or derivatization of another compound of formula (1) prepared in accordance with the processes described herein. Compounds of formula (1-a)-(1-e) are various subsets of formula (1).

Process N

A compound of formula (1-a) (i.e. formula (1) wherein $R^7$ and $R^8$ are as defined in scheme 14) can be prepared by a process comprising the step of reacting a compound of formula (5) with a reagent of formula (8) as shown in scheme 14 in the presence of a base.

Scheme 14: Process N - Preparation of compounds (1-a) and 1-b)

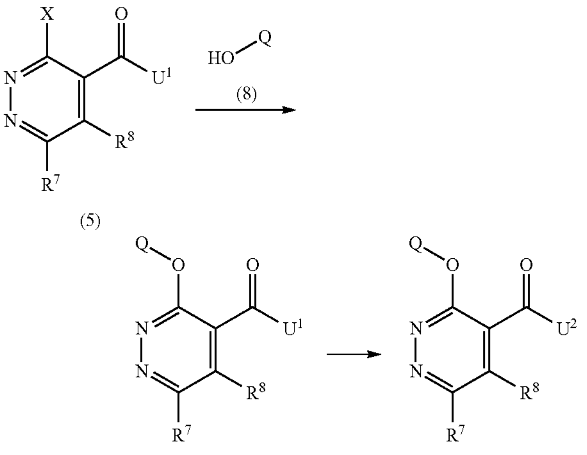

(8) (5) (1-a) (1-b)

$U^1$ = $C_1$-$C_6$-alkoxy
$U^2$ = hydroxyl, halogen, —N($CH_3$)O$CH_3$
X = halogen
$R^8$ = hydrogen, $C_1$-$C_6$-alkyl $R^7$ = hydrogen, halogen, hydroxyl, mercapto, $C_1$-$C_6$-alkyl, $C_1$-$C_6$-haloalkyl, $C_1$-$C_6$-alkoxy, $C_1$-$C_6$-haloalkoxy, $C_2$-$C_6$-alkenyloxy, $C_2$-$C_6$-haloalkenyloxy, $C_2$-$C_6$-alkynyloxy, $C_2$-$C_6$-haloalkynyloxy, $C_1$-$C_6$-alkylsulfanyl, $C_1$-$C_6$-haloalkylsulfanyl, $C_3$-$C_8$-cycloalkylsulfanyl, $C_3$-$C_8$-cycloalkyl, $C_3$-$C_6$-cycloalkenyl, $C_3$-$C_8$-cycloalkyloxy, aromatic $C_6$-$C_{14}$-carbocyclyloxy, aromatic, 5- or 6-membered monocyclic heterocyclyloxy, non-aromatic 3- to 7-membered monocyclic heterocyclyloxy, —N$(R^e)_2$ In scheme 14, $R^e$ is as disclosed herein and $R^7$, $R^8$ and $R^e$ may be substituted as disclosed herein.

Process N may be performed in the presence of suitable transition metal catalyst salts or complexes, if appropriate in the presence of a ligand.

The obtained compound of formula (1-a) can then be converted into a compound of formula (1-b) in one or more steps.

Non-limiting examples of such conversion are described below.

Compounds of formula (1-a) wherein $U^1$ is a $C_1$-$C_6$-alkoxy can be converted to compounds of formula (1-b) wherein $U^2$ is a hydroxyl group by well-known functional group interconversion methods, for example by hydrolysis of an ester group with LiOH in THF/water.

Compounds of formula (1-b) wherein $U^2$ is a hydroxyl can be converted to compounds of formula (1-b) wherein $U^2$ is a halogen in the presence of halogenating agents by well-known methods. Suitable halogenating reagents include, but are not limited to, phosphorous tribromide, phosphorous trichloride, phosphorous pentachloride, phosphorous trichloride oxide, oxalyl chloride or thionyl chloride.

Compounds of formula (1-b) wherein $U^2$ is a hydroxyl or halogen can be converted to compounds of formula (1-b) wherein $U^2$ is —N($CH_3$)O$CH_3$ by well-known methods.

Compounds of formula (5) are commercially available or may be prepared by process Q described herein.

Compounds of formula (8) are commercially available or may be obtained by conversion or derivatization of another compound of formula (8) in accordance to well-known methods.

Process O

A compound of formula (1-c) (i.e. formula (1) wherein $R^7$ is $R^{7a}$ as defined in scheme 15) can be converted by means of known methods to the corresponding compounds of formula (1-d) (i.e. formula (1) wherein $R^7$ is $R^{7b}$ as defined in scheme 15) or (1-e) (i.e. formula (1) wherein $R^7$ is $R^{7c}$ as defined in scheme 15) in one or more steps as shown in scheme 15.

Scheme 15: Process O - Preparation of compounds (1-d) and 1-e)

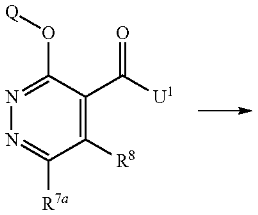

(1-c)

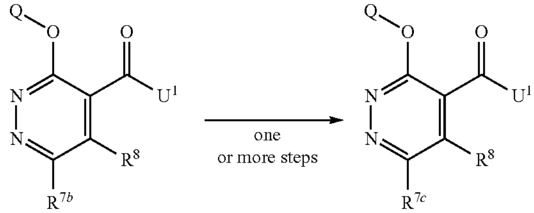

(1-d) (1-e)

$U^1 = C_1$-$C_6$-alkoxy $R^{7a}$ = hydrogen or halogen (preferably chlorine)

$R^{7b}$ = hydrogen, halogen, cyano, $C_1$-$C_6$-alkyl, $C_1$-$C_6$-haloalkyl, $C_2$-$C_6$-alkenyl, $C_2$-$C_6$-haloalkenyl, $C_2$-$C_6$, alkynyl, $C_2$-$C_6$-haloalkynl, $C_1$-$C_6$-alkysulfanyl, $C_1$-$C_6$-haloalkylsulfanyl, $C_3$-$C_8$-cycloalkylsulfanyl, $C_3$-$C_8$-cycloalky, $C_3$-$C_6$-cycloalkenyl, aromatic $C_6$-$C_{14}$-carbocycle, aromatic 5- or 6-membered monocyclic heterocycle, non-aromatic 3- to 7-membered monocyclic heterocycle, $—N(R^e)_2$, $—C(=O)(OR^g)$ $R^{7c}$ = nitro, formyl, $C_1$-$C_6$-alkylcarbonyl, $C_1$-$C_6$-haloalkylcarbonyl, $C_1$-$C_6$-hydroxyalkyl, $C_1$-$C_6$-fluoroalkyl, $C_1$-$C_6$-alkylsulfinyl, $C_1$-$C_6$-haloalkylsulfinyl, $C_3$-$C_8$-cycloalkylsulfinyl, $C_1$-$C_6$-alkylsulfonyl, $C_1$-$C_6$-haloalkylsulfonyl, $C_3$-$C_8$- cycloalkylsulfonyl, $—C(=NR^f)R^f$, $—C(=N(R^g)_2$, $—S(=O)(=NR^g)R^g$, $—S(=O)_2N(R^g)_2$ In scheme 15, $R^e$, $R^f$, $R^g$ are as disclosed herein and the aliphatic and cyclic substituents $R^{7b}$, $R^{7c}$, $R^e$, $R^f$, $R^g$ may be substituted as disclosed herein.

Non-limiting examples of conversion may be performed in accordance to the description provided in process K.

The obtained compound of formula (1-d) and (1-e) can then be converted into compound of formula (1-d) and (1-e) wherein $U^1$ ($C_1$-$C_6$-alkoxy) is replaced with hydroxyl or halogen.

Examples of such conversion are described below.

Compounds of formula (1-c), (1-d), (1-e) wherein $U^1$ is a $C_1$-$C_6$-alkoxy can be converted to compounds of formula (1-b), (1-c), (1-d) wherein $U^1$ is replaced with a hydroxyl group by well-known functional group interconversion methods, for example by hydrolysis of an ester group with LiOH in THF/water.

Compounds of formula (1-c), (1-d), (1-e) wherein $U^1$ has been replaced with a hydroxyl can then be further converted to compounds of formula (1-b), (1-c), (1-d) wherein the hydroxyl is replaced with a halogen in the presence of halogenating agents by well-known methods. Suitable halogenating reagents include, but are not limited to, phosphorous tribromide, phosphorous trichloride, phosphorous pentachloride, phosphorous trichloride oxide, oxalyl chloride or thionyl chloride.

Compounds of formula (1-c), (1-d), (1-e) wherein $U^1$ is a hydroxyl or halogen can be converted to compounds of formula (1-c), (1-d), (1-e) wherein $U^1$ is $—N(CH_3)OCH_3$ by well-known methods.

Compounds of formula (1-c) can be prepared by one or more of the processes described herein.

Process P

A compound of formula (1-f) (i.e. formula (1) wherein $R^8$ is H) can be converted by means of methods described in the literature to the corresponding compound of formula (1-g) (i.e. formula (1) wherein $R^8$ is $R^{8a}$ as defined in scheme 16) or compound of formula (1-h) (i.e. formula (1) wherein $R^8$ is $R^{8a}$ as defined in scheme 16) in one or more steps as shown in scheme 16.

Scheme 16: Process P - Preparation of compounds (1-g) and 1-h)

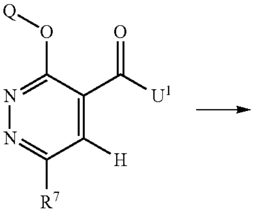

(1-f)

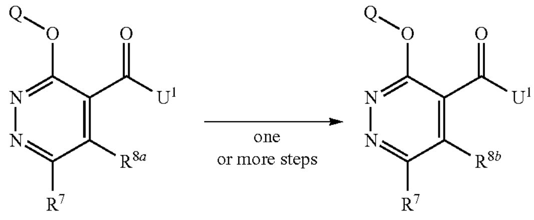

(1-g) (1-h)

$U^1 = C_1$-$C_6$-alkoxy $R^{8a}$ = halogen, $C_1$-$C_6$-alkyl, $C_1$-$C_6$-haloalkyl, $C_1$-$C_6$-hydroxyalkyl, $C_3$-$C_8$-cycloalkyl, $C_3$-$C_8$-halocycloalky, $C_3$-$C_6$-cycloalkenyl, aromatic $C_6$-$C_{14}$-carbocycle, 5- to 14-membered aromatic heterocycle, 3- to 14-membered non-aromatic heterocycle;

$R^{8b}$ = halogen, cyano, nitro, amino, mercapto, hydroxyl, $C_2$-$C_6$-alkenyl, $C_2$-$C_6$-haloalkenyl, $C_2$-$C_6$-alkynyl, $C_2$-$C_6$-haloalkynyl, $C_1$-$C_6$-alkoxy, $C_1$-$C_6$-haloalkoxy, $C_2$-$C_6$-alkenyloxy, $C_2$-$C_6$-haloalkenyloxy, $C_2$-$C_6$-alkynyloxy, $C_2$-$C_6$-haloalkynyloxy, $C_3$-$C_8$-cycloalkyl, $C_3$-$C_6$-cycloalkenyl, aromatic 5- to 14-membered heterocycle, $C_3$-$C_8$-cycloalkyloxy, aromatic $C_6$-$C_{14}$-carbocyclyloxy, non-aromatic 3- to 14-membered heterocyclyloxy, aromatic 5- to 14-membered heterocclyloxy, $—N(R^h)_2$, $—SR^i$, $—S(=O)R^i$ and $—S(=O)_2R^i$ In scheme 16, $R^h$ and $R^i$ are as disclosed herein and the aliphatic and cyclic substituents $R^{8a}$ and $R^{8b}$ may be substituted as disclosed herein.

Non-limiting examples of conversion may be performed in accordance to the description provided in process L.

The obtained compound of formula (1-f) and (1-g) can then be converted into compound of formula (1-f) and (1-g) wherein $U^1$ ($C_1$-$C_6$-alkoxy) is replaced with hydroxyl or halogen.

Compounds of formula (1-f), (1-g), (1-h) wherein $U^1$ is a $C_1$-$C_6$-alkoxy can be converted to compounds of formula (1-f), (1-g), (1-h) wherein $U^1$ is replaced with a hydroxyl group by well-known functional group interconversion methods, for example by hydrolysis of an ester group with LiOH in THF/water.

Compounds of formula (1-f), (1-g), (1-h) wherein $U^1$ has been replaced with a hydroxyl can then be further converted to compounds of formula (1-f), (1-g), (1-h) wherein the hydroxyl is replaced with a halogen in the presence of halogenating agents by well-known methods. Suitable halogenating reagents include, but are not limited to, phosphorous tribromide, phosphorous trichloride, phosphorous pentachloride, phosphorous trichloride oxide, oxalyl chloride or thionyl chloride.

Compounds of formula (1-f), (1-g), (1-h) wherein $U^1$ is a hydroxyl or halogen can be converted to compounds of formula (1-f), (1-g), (1-h) wherein $U^1$ is —$N(CH_3)OCH_3$ by well-known methods.

Compounds (1-f) can be prepared by one or more of the processes described herein.

Process for the Preparation of Compound of Formula (5)

A compound of formula (5) as described herein may be commercially available or directly obtained by performing process Q described below. Compounds of formula (5-a) and (5-b) are various subsets of formula (5).

Process Q

A compound of formula (5-a) (i.e. compound of formula 5 wherein $R^7$ is halogen) can be converted by means of known methods (WO2000044755) into a compound of formula (5-b) (i.e. compound of formula 5 wherein $R^7$ is as shown in scheme 17) in the presence of either an oxygen (ethanol), a sulfur (thioethyl) or an amino (methylamine) based nucleophile, optionally in the presence of base as shown in scheme 17.

Scheme 17: Process Q - Preparation of compounds (5-b)

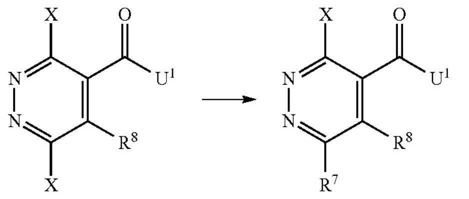

(5-a) (5-b)

$U^1$ = $C_1$-$C_6$-alkoxy

X = halogen $R^8$ = hydrogen, $C_1$-$C_6$-alkyl $R^7$ = halogen, hydroxyl, mercapto, $C_1$-$C_6$-alkoxy, $C_1$-$C_6$-haloalkoxy, $C_2$-$C_6$-alkenyloxy, $C_2$-$C_6$-haloalkenyloxy, $C_2$-$C_6$-alkynloxy, $C_2$-$C_6$-haloalkynyloxy, $C_1$-$C_6$-alkylsulfanyl, $C_1$-$C_6$-haloalkysulfanyl, $C_3$-$C_8$-cycloalkysulfanyl, $C_3$-$C_8$-cycloalkyloxy, aromatic $C_6$-$C_{14}$-carbocyclyloxy, aromatic, 5- or 6-membered monocyclic heterocyclyloxy, non-aromatic 3- to 7-membered monocyclic heterocyclyloxy, —$N(R^e)_2$; wherein $R^e$ as disclose herein and wherein $R^7$ and $R^e$ may be substituted as disclosed herein.

The compounds of formula (5-a) and (5-b) can be converted into compound of formula (5-a) and (5-b) wherein $U^1$ ($C_1$-$C_6$-alkoxy) is replaced with hydroxyl or halogen using the same conditions as described in process N.

Starting materials of formula (5-a) are commercially available.

Process for the Preparation of Compound of Formula (9) and (13)

A compound of formula (9) may be obtained by performing process R described below or may be obtained by conversion or derivatization of another compound of formula (9-a) prepared in accordance with the processes described herein. Compounds of formula (9-a) and (9-b) are various subsets of formula (9).

Process R

A compound of formula (9-a) can be converted by means of methods described in the literature to the corresponding compounds (13) in one or more steps as shown in scheme 18.

Scheme 18: Process R - Preparation of compounds (9-a), (9-b) and (13)

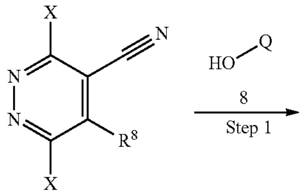

(33)

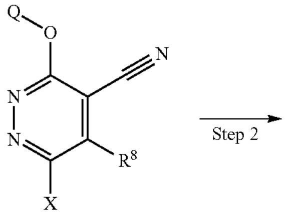

(9-a)

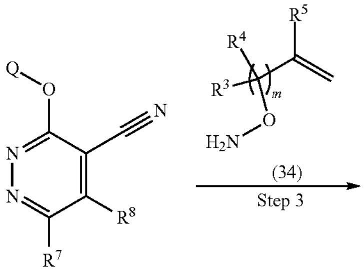

(9-b)

-continued

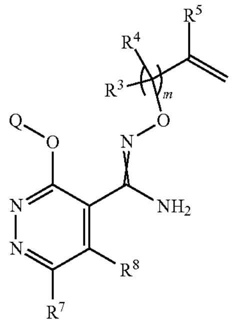

(13)

X = halogen $R^8$ = hydrogen, $C_1$-$C_6$-alkyl $R^7$ = halogen, hydroxyl, mercapto, $C_1$-$C_6$-alkoxy, $C_1$-$C_6$-haloalkoxy, $C_2$-$C_6$-alkenyloxy, $C_2$-$C_6$-haloalkenyloxy, $C_2$-$C_6$-alknyloxy, $C_2$-$C_6$-haloalkynyloxy, $C_1$-$C_6$-alkylsulfanyl, $C_1$-$C_6$-haloalklsulfanyl, $C_3$-$C_8$-cycloalkylsulfanyl, $C_3$-$C_8$-cycloalkyloxy, aromatic $C_6$-$C_{14}$-carbocyclyloxy, aromatic 5- or 6-membered monocyclic heterocyclyloxy, non-aromatic 3- to 7-membered monocyclic heterocyclyloxy, —$N(R^e)_2$; wherein $R^e$ as disclose herein and wherein $R^7$ and $R^e$ may be substituted as disclosed herein.

Compounds of formula (33) are commercially available or producible by processes described in the literature (Chemical & Pharmaceutical Bulletin 1977, 25(8), 1856-61).

A compound of formula (33) can be converted according to Step 1 of Process R into a compound of formula (9-a) in the presence of a reagent of formula (8) and a base (e.g organic or inorganic base) as described herein.

Non-limiting examples of conversion of (9-a) to (9-b) may be performed in accordance to scheme 18.

For example, a compound of formula (9-a) can be further converted in a compound of formula (9-b) wherein $R^7$ is hydroxyl, mercapto, $C_1$-$C_6$-alkoxy, $C_1$-$C_6$-haloalkoxy, $C_2$-$C_6$-alkenyloxy, $C_2$-$C_6$-haloalkenyloxy, $C_1$-$C_6$-alkylsulfanyl, $C_1$-$C_6$-haloalkylsulfanyl, $C_3$-$C_8$-cycloalkyloxy, aromatic $C_6$-$C_{14}$-carbocyclyloxy, aromatic 5- or 6-membered monocyclic heterocyclyloxy, non-aromatic 3- to 7-membered monocyclic heterocyclyloxy, —$N(R^e)_2$ by treating the reacting compound of formula (9-a) with an oxygen, a sulfur or an amino based nucleophile.

A compound of formula (9-a) can be converted into a compound of formula (9-b) wherein $R^7$ is cyano, $C_1$-$C_6$-alkyl, $C_1$-$C_6$-haloalkyl, $C_2$-$C_6$-alkenyl, $C_2$-$C_6$-haloalkenyl, $C_2$-$C_6$-alkynyl, $C_2$-$C_6$-haloalkynyl, $C_3$-$C_8$-cycloalkyl, $C_3$-$C_6$-cycloalkenyl, aromatic $C_6$-$C_{14}$-carbocycle, aromatic 5- or 6-membered monocyclic heterocycle, non-aromatic 3- to 7-membered monocyclic heterocycle by transition metal catalyzed or metallo-photoredox catalyzed processes as described herein.

An intermediate of formula (13) can be obtained according to Step 3 of Process R by treating a compound of formula (9) with a compound of formula (34) optionally in the presence of a base using well-known methods.

Compounds of formula (8) are commercially available or may be obtained by conversion or derivatization of another compound of formula (8) in accordance to well-known methods.

Process for the Preparation of Compounds of Formula (2), (19), (26-a-1)

Process S

A compound of formula (35) can be converted by means of methods described in the literature to the corresponding compounds (2), (19-a), (19-b) and (26-a-1) in one or more steps as shown in scheme 19.

Scheme 19: Process S - Preparation of compounds (2), (19-a), (19-b), 26-a-1).

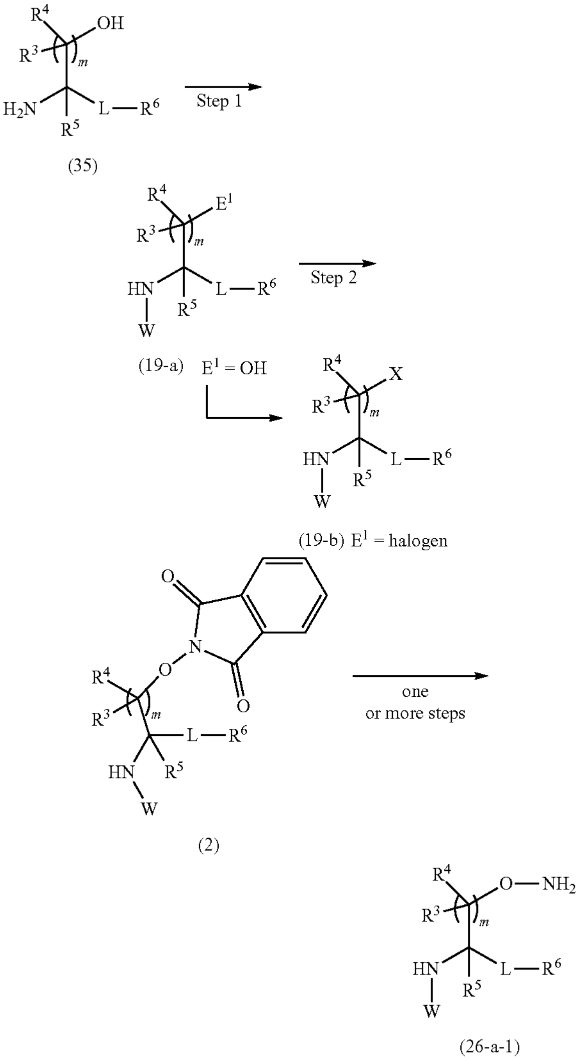

(35)

(19-a) $E^1$ = OH (19-b) $E^1$ = halogen (2)

(26-a-1)

W = hydrogen, tert-butoxycarbonyl, benzyl, allyl or (4-methoxyphenyl)methyl

Aminoalcohols of formula (35) are commercially available or may be producible by methods described in the literature (Molecules, 9 (6), 405-426; 2004, WO2017203474).

The amino function of compound 35 is protected in accordance with known methods to provide compound of formula (19-a).

Subsequently, the compound of formula (19-a) can be converted by Step 2 of Process S into a compound of formula (2) using classical Mitsunobu reaction conditions known by the skilled person of the art (Strategic Applications of Named Reactions in Organic Synthesis; Laszlo Kürti, Barbara Czako; Elsevier; 2005; 294-295 and reference herein).

Compounds of formula (2) can be converted into compounds of formula (26-a-1) by well-known methods.

Compound (B)

The active compound combinations according to the invention comprise as compound (B) at least one further active compound selected from the following groups (1) inhibitors of the ergosterol synthesis,
(2) inhibitors of the respiratory chain at complex I or II,
(3) inhibitors of the respiratory chain at complex III,
(4) inhibitors of the mitosis and cell division,
(5) compounds capable of having a multisite action,
(6) compounds capable of inducing a host defense,
(7) inhibitors of the amino acid and/or protein biosynthesis,
(8) inhibitors of the ATP production,
(9) inhibitors of the cell wall synthesis,
(10) inhibitors of the lipid and membrane synthesis,
(11) inhibitors of the melanine biosynthesis,
(12) inhibitors of the nucleic acid synthesis,
(13) inhibitors of the signal transduction,
(14) compounds capable of acting as uncoupler,
(15) other fungicides selected from the group consisting of (15.001) abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fosetyl-sodium, (15.015) methyl isothiocyanate, (15.016) metrafenone, (15.017) mildiomycin, (15.018) natamycin, (15.019) nickel dimethyldithiocarbamate, (15.020) nitrothal-isopropyl, (15.021) oxamocarb, (15.022) oxathiapiprolin, (15.023) oxyfenthiin, (15.024) pentachlorophenol and salts, (15.025) phosphorous acid and its salts, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl] ethanone, (15.033) 2-(6-benzylpyridin-2-yl) quinazoline, (15.034) dipymetitrone, (15.035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, (15.036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (15.038) 2-[6-(3-fluoro-4-methoxyphenyl)-5-methyl-pyridin-2-yl] quinazoline, (15.039) 2-{(5R)-3-[2-(1-{[3,5-bis (difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.040) 2-{(5S)-3-[2-(1-{[3,5-bis(difluoromethyl)-1H-pyrazol-1-yl] acetyl}piperidin-4-yl)-1,3-thiazol-4-yl]-4,5-dihydro-1, 2-oxazol-5-yl}-3-chlorophenyl methanesulfonate, (15.041) ipflufenoquin, (15.042) 2-{2-fluoro-6-[(8-fluoro-2-methylquinolin-3-yl)oxy]phenyl}propan-2-ol, (15.043) fluoxapiprolin, (15.044) 2-{3-[2-(1-{[3,5-bis (difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts, (15.046) 3-(4,4,5-trifluoro-3,3-dimethyl-3,4-dihydroisoquinolin-1-yl)quinoline, (15.047) quinofumelin, (15.048) 4-amino-5-fluoropyrimidin-2-ol (tautomeric form: 4-amino-5-fluoropyrimidin-2(1H)-one), (15.049) 4-oxo-4-[(2-phenylethyl)amino]butanoic acid, (15.050) 5-amino-1,3,4-thiadiazole-2-thiol, (15.051) 5-chloro-N'-phenyl-N'-(prop-2-yn-1-yl)thiophene-2-sulfonohydrazide, (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[({[(Z)-(1-methyl-1H-tetrazol-5-yl)(phenyl)methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2-yl}carbamate, (15.062) 5-fluoro-4-imino-3-methyl-1-[(4-methylphenyl)sulfonyl]-3,4-dihydropyri-midin-2(1H)-one, (15.063) aminopyrifen, (15.064) (N'-[2-chloro-4-(2-fluorophenoxy)-5-methylphenyl]-N-ethyl-N-methylimidoformamide), (15.065) (N'-(2-chloro-5-methyl-4-phenoxyphenyl)-N-ethyl-N-methylimidoformamide), (15.066) (2-{2-[(7,8-difluoro-2-methylquinolin-3-yl) oxy]-6-fluorophenyl}propan-2-ol), (15.067) (5-bromo-1-(5,6-dimethylpyridin-3-yl)-3,3-dimethyl-3,4-dihydroisoquinoline), (15.068) (3-(4,4-difluoro-5,5-dimethyl-4,5-dihydrothieno[2,3-c]pyridin-7-yl) quinoline), (15.069) (1-(4,5-dimethyl-1H-benzimidazol-1-yl)-4,4-difluoro-3,3-dimethyl-3,4-dihydroisoquinoline), (15.070) 8-fluoro-3-(5-fluoro-3,3-dimethyl-3,4-dihydroisoquinolin-1-yl)quinolone, (15.071) 8-fluoro-3-(5-fluoro-3,3,4,4-tetramethyl-3,4-dihydroisoquinolin-1-yl)quinolone, (15.072) 3-(4,4-difluoro-3,3-dimethyl-3,4-dihydroisoquinolin-1-yl)-8-fluoroquinoline, (15.073) (N-methyl-N-phenyl-4-[5-(trifluoromethyl)-1,2,4-oxadiazol-3-yl]benzamide), (15.074) methyl {4-[5-(trifluoromethyl)-1,2,4-oxadiazol-3-yl]phenyl}carbamate, (15.075) (N-{4-[5-(trifluoromethyl)-1,2,4-oxadiazol-3-yl] benzyl}cyclopropanecarboxamide), (15.076) N-methyl-4-(5-(trifluoromethyl)-1,2,4-oxadiazol-3-yl] benzamide, (15.077) N-[(E)-methoxyiminomethyl]-4-[5-(trifluoromethyl)-1,2,4-oxadiazol-3-yl]benzamide, (15.078) N—[(Z)-methoxyiminomethyl]-4-[5-(trifluoromethyl)-1,2,4-oxadiazol-3-yl]benzamide, (15.079) N-[4-[5-(trifluoromethyl)-1,2,4-oxadiazol-3-yl]phenyl]cyclopropanecarboxamide, (15.080) N-(2-fluorophenyl)-4-[5-(trifluoromethyl)-1,2,4-oxadiazol-3-yl] benzamide, (15.081) 2,2-difluoro-N-methyl-2-[4-[5-(trifluoromethyl)-1,2,4-oxadiazol-3-yl]phenyl] acetamide, (15.082) N-allyl-N-[[4-[5-(trifluoromethyl)-1,2,4-oxadiazol-3-yl)phenyl]methyl] acetamide, (15.083) N-[(E)-N-methoxy-C-methyl-carbonimidoyl]-4-(5-(trifluoromethyl)-1,2,4-oxadiazol-3-yl]benzamide, (15.084) N—[(Z)-N-methoxy-C-methyl-carbonimidoyl]-4-[5-(trifluoromethyl)-1,2,4-oxadiazol-3-yl]benzamide, (15.085) N-allyl-N-[[4-[5-(trifluoromethyl)-1,2,4-oxadiazol-3-yl]phenyl]methyl]propanamide, (15.086) 4,4-dimethyl-1-[[4-[5-(trifluoromethyl)-1,2,4-oxadiazol-3-yl]phenyl]methyl]-pyrrolidin-2-one, (15.087) N-methyl-4-[5-(trifluoromethyl)-1,2,4-oxadiazol-3-yl]-benzenecarbothioamide, (15.088) 5-methyl-1-[[4-[5-(trifluoromethyl)-1,2,4-oxadiazol-3-yl]phenyl]methyl]pyrrolidin-2-one, (15.089) N-((2,3-difluoro-4-[5-(trifluoromethyl)-1,2,4-oxadiazol-3-yl]phenyl]methyl]-3,3,3-trifluoro-propanamide, (15.090) 1-methoxy-1-methyl-3-[[4-[5-(trifluoromethyl}-1,2,4-oxadiazol-3-yl]phenyl]methyl]urea, (15.091) 1,1-diethyl-3-[[4-[5-(trifluoromethyl}-1,2,4-oxadiazol-3-yl]phenyl]methyl]urea, (15.092) N-[[4-[5-(trifluoromethyl)-1,2,4-oxadiazol-3-yl]phenyl]methyl]propanamide, (15.093) N-methoxy-N-[[4-[5-(trifluoromethyl)-1,2,4-oxadiazol-3-yl]phenyl]-methyl]cyclopropanecarboxamide, (15.094) 1-methoxy-3-methyl-1-[[4-[5-(trifluoromethyl)-1,2,4-oxadiazol-3-yl]phenyl]methyl]urea, (15.095) N-methoxy-N-[[4-[5-(trifluoromethyl)-1,2,4-oxadiazol-3-yl]phenyl]methyl)cyclopropanecarboxamide, (15.096) N,2-dimethoxy-N-[[4-[5-(trifluoromethyl}-1,2,4-oxadiazol-3-yl]phenyl]-methyl]propanamide, (15.097) N-ethyl-2-methyl-N-[[4-[5-(trifluoromethyl)-1,2,4-oxadiazol-3-yl)phenyl]methyl]propanamide, (15.098) 1-methoxy-3-methyl-1-[[4-[5-(trifluoromethyl)-1,2,4-oxadiazol-3-yl]phenyl]methyl]urea, (15.099) 1,3-dimethoxy-1-[[4-[5-(trifluoromethyl)-1,2,4-oxadiazol-3-yl]phenyl]methyl]urea, (15.100) 3-ethyl-1-methoxy-1-[[4-[5-(trifluoromethyl)-1,2,4-oxadiazol-3-yl]phenyl]methyl]urea, (15.101) 1-[[4-[5-(trifluoromethyl)-1,2,4-oxadiazol-3-yl]phenyl]methyl]piperidin-2-one, (15.102) 4,4-dimethyl-2-[[4-[5-(trifluoromethyl)-1,2,4-oxadiazol-3-yl]phenyl]-methyl]isooxazolidin-3-one, (15.103) 5,5-dimethyl-2-[[4-[5-(trifluoromethyl)-1,2,4-oxadiazol-3-yl]phenyl]methyl]isoxazolidin-3-one, (15.104) 3,3-dimethyl-1-[[4-[5-(trifluoromethyl)-1,2,4-oxadiazol-3-yl]phenyl]methyl]piperidin-2-one, (15.105) 1-[[3-fluoro-4-(5-(trifluoromethyl)-1,2,4-oxadiazol-3-yl]phenyl]methyl]azepan-2-one, (15.106) 4,4-dimethyl-2-[[4-(5-(trifluoromethyl)-1,2,4-oxadiazol-3-yl]phenyl]-methyl]isoxazolidin-3-one, (15.107) 5,5-dimethyl-2-[[4-[5-(trifluoromethyl)-1,2,4-oxadiazol-3-yl]phenyl]methyl]isoxazolidin-3-one, (15.108) ethyl 1-{4-[5-(trifluoromethyl)-1,2,4-oxadiazol-3-yl]benzyl}-1H-pyrazole-4-carboxylate, (15.109) N,N-dimethyl-1-{4-[5-(trifluoromethyl)-1,2,4-oxadiazol-3-yl]benzyl}-1H-1,2,4-triazol-3-amine, (15.110) N-{2,3-difluoro-4-[5-(trifluoromethyl)-1,2,4-oxadiazol-3-yl]benzyl}butanamide, (15.111) N-(1-methylcyclopropyl)-4-[5-(trifluoromethyl)-1,2,4-oxadiazol-3-yl]benzamide, (15.112) N-(2,4-difluorophenyl)-4-[5-(trifluoromethyl)-1,2,4-oxadiazol-3-yl]benzamide, (15.113) 1-(5,6-dimethylpyridin-3-yl)-4,4-difluoro-3,3-dimethyl-3,4-dihydroisoquinoline, (15.114) 1-(6-(difluoromethyl)-5-methyl-pyridin-3-yl)-4,4-difluoro-3,3-dimethyl-3,4-dihydroisoquinoline, (15.115) 1-(5-(fluoromethyl)-6-methyl-pyridin-3-yl)-4,4-difluoro-3,3-dimethyl-3,4-dihydroisoquinoline, (15.116) 1-(6-(difluoromethyl)-5-methoxy-pyridin-3-yl)-4,4-difluoro-3,3-dimethyl-3,4-dihydroisoquinoline, (15.117) 4-[5-(trifluoromethyl)-1,2,4-oxadiazol-3-yl]phenyl dimethylcarbamate, (15.118) N-{4-[5-(trifluoromethyl)-1,2,4-oxadiazol-3-yl]phenyl}propanamide, (15.119) 3-[2-(1-{[5-methyl-3-(trifluoromethyl)-1H-pyrazol-1-yl]acetyl}piperidin-4-yl)-1,3-thiazol-4-yl]-1,5-dihydro-2,4-benzodioxepin-6-yl methanesulfonate, (15.120) 9-fluoro-3-[2-(1-{[5-methyl-3-(trifluoromethyl)-1H-pyrazol-1-yl]acetyl}piperidin-4-yl)-1,3-thiazol-4-yl]-1,5-dihydro-2,4-benzodioxepin-6-yl methanesulfonate, (15.121) 3-[2-(1-{[3,5-bis(difluoromethyl)-1H-pyrazol-1-yl]acetyl}piperidin-4-yl)-1,3-thiazol-4-yl]-1,5-dihydro-2,4-benzodioxepin-6-yl methanesulfonate, (15.122) 3-[2-(1-{[3,5-bis(difluoromethyl)-1H-pyrazol-1-yl]acetyl}piperidin-4-yl)-1,3-thiazol-4-yl]-9-fluoro-1,5-dihydro-2,4-benzodioxepin-6-yl methanesulfonate, (15.123) 1-(6,7-dimethylpyrazolo[1,5-a]pyridin-3-yl)-4,4-difluoro-3,3-dimethyl-3,4-dihydroisoquinoline, (15.124) 8-fluoro-N-(4,4,4-trifluoro-2-methyl-1-phenylbutan-2-yl)quinoline-3-carboxamide, (15.125) 8-fluoro-N-[(2S)-4,4,4-trifluoro-2-methyl-1-phenylbutan-2-yl]quinoline-3-carboxamide, (15.126) N-(2,4-dimethyl-1-phenylpentan-2-yl)-8-fluoroquinoline-3-carboxamide, (15.127) N-[(2S)-2,4-dimethyl-1-phenylpentan-2-yl]-8-fluoroquinoline-3-carboxamide, (15.128) D-tagatose.

(16) Antibacterial agents selected from the group of:

bacteria, such as (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (16.002) *Bacillus amyloliquefaciens*, in particular strain D747 (available as Double Nickel™ from Certis, US, having accession number FERM BP-8234 and disclosed in U.S. Pat. No. 7,094,592); (16.003) *Bacillus pumilus*, in particular strain BU F-33 (having NRRL Accession No. 50185); (16.004) *Bacillus subtilis* var. *amyloliquefaciens* strain FZB24 (available as Taegro® from Novozymes, US); (16.005) a *Paenibacillus* sp. strain having Accession No. NRRL B-50972 or Accession No. NRRL B-67129 and described in International Patent Publication No. WO 2016/154297; and fungi, such as (16.006) *Aureobasidium pullulans*, in particular blastospores of strain DSM14940; 16.007) *Aureobasidium pullulans* blastospores of strain DSM 14941; (16.008) *Aureobasidium pullulans*, in particular mixtures of blastospores of strains DSM14940 and DSM14941;

(17) biological fungicides selected from the group of:

bacteria, for example (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.002) *Bacillus pumilus*, in particular strain QST2808 (available as SONATA® from Bayer CropScience LP, US, having Accession No. NRRL B-30087 and described in U.S. Pat. No. 6,245,551); (17.003) *Bacillus pumilus*, in particular strain GB34 (available as Yield Shield® from Bayer AG, DE); (17.004) *Bacillus pumilus*, in particular strain BU F-33 (having NRRL Accession No. 50185); (17.005) *Bacillus amyloliquefaciens*, in particular strain D747 (available as Double Nickel™ from Certis, US, having accession number FERM BP-8234 and disclosed in U.S. Pat. No. 7,094,592); (17.006) *Bacillus subtilis* Y1336 (available as BIOBAC® WP from Bion-Tech, Taiwan, registered as a biological fungicide in Taiwan under Registration Nos. 4764, 5454, 5096 and 5277); (17.007) *Bacillus amyloliquefa-*

*ciens* strain MBI 600 (available as SUBTILEX from BASF SE); (17.008) *Bacillus subtilis* strain GB03 (available as Kodiak® from Bayer AG, DE); (17.009) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); (17.010) *Bacillus mycoides*, isolate J (available as BmJ TGAI or WG from Certis USA); (17.011) *Bacillus licheniformis*, in particular strain SB3086 (available as EcoGuard™ Biofungicide and Green Releaf from Novozymes); (17.012) a *Paenibacillus* sp. strain having Accession No. NRRL B-50972 or Accession No. NRRL B-67129 and described in International Patent Publication No. WO 2016/154297,

(18) fatty acids or derivatives, for example (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is preferably selected from:

inhibitors of the ergosterol biosynthesis selected from the group consisting of (1.001) cyproconazole, (1.002) difenoconazole, (1.003) epoxiconazole, (1.004) fenhexamid, (1.005) fenpropidin, (1.006) fenpropimorph, (1.007) fenpyrazamine, (1.008) fluquinconazole, (1.009) flutriafol, (1.010) imazalil, (1.011) imazalil sulfate, (1.012) ipconazole, (1.013) metconazole, (1.014) myclobutanil, (1.015) paclobutrazol, (1.016) prochloraz, (1.017) propiconazole, (1.018) prothioconazole, (1.019) pyrisoxazole, (1.020) spiroxamine, (1.021) tebuconazole, (1.022) tetraconazole, (1.023) triadimenol, (1.024) tridemorph, (1.025) triticonazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.028) (2R)-2-(1-chlorocyclopropyl)-4-[(1R)-2,2-dichlorocyclopropyl]-1-(1H-1,2,4-triazol-1-yl)butan-2-ol, (1.029) (2R)-2-(1-chlorocyclopropyl)-4-[(1S)-2,2-dichlorocyclopropyl]-1-(1H-1,2,4-triazol-1-yl)butan-2-ol, (1.030) (2R)-2-[4-(4-chlorophenoxy)-2-(trifluoromethyl)phenyl]-1-(1H-1,2,4-triazol-1-yl)propan-2-ol, (1.031) (2S)-2-(1-chlorocyclopropyl)-4-[(1R)-2,2-dichlorocyclopropyl]-1-(1H-1,2,4-triazol-1-yl)butan-2-ol, (1.032) (2S)-2-(1-chlorocyclopropyl)-4-[(1S)-2,2-dichlorocyclopropyl]-1-(1H-1,2,4-triazol-1-yl)butan-2-ol, (1.033) (2S)-2-[4-(4-chlorophenoxy)-2-(trifluoromethyl)phenyl]-1-(1H-1,2,4-triazol-1-yl)propan-2-ol, (1.034) (R)-[3-(4-chloro-2-fluorophenyl)-5-(2,4-difluorophenyl)-1,2-oxazol-4-yl](pyridin-3-yl)methanol, (1.035) (S)-[3-(4-chloro-2-fluorophenyl)-5-(2,4-difluorophenyl)-1,2-oxazol-4-yl](pyridin-3-yl)methanol, (1.036) [3-(4-chloro-2-fluorophenyl)-5-(2,4-difluorophenyl)-1,2-oxazol-4-yl](pyridin-3-yl)methanol, (1.037) 1-({(2R,4S)-2-[2-chloro-4-(4-chlorophenoxy)phenyl]-4-methyl-1,3-dioxolan-2-yl}methyl)-1H-1,2,4-triazole, (1.038) 1-({(2S,4S)-2-[2-chloro-4-(4-chlorophenoxy)phenyl]-4-methyl-1,3-dioxolan-2-yl}methyl)-1H-1,2,4-triazole, (1.039) 1-{[3-(2-chlorophenyl)-2-(2,4-difluoro-phenyl)oxiran-2-yl]methyl}-1H-1,2,4-triazol-5-yl thiocyanate, (1.040) 1-{[rel(2R,3R)-3-(2-chlorophenyl)-2-(2,4-difluorophenyl)oxiran-2-yl]methyl}-1H-1,2,4-triazol-5-yl thiocyanate, (1.041) 1-{[rel(2R,3S)-3-(2-chlorophenyl)-2-(2,4-difluorophenyl)oxiran-2-yl]methyl}-1H-1,2,4-triazol-5-yl thiocyanate, (1.042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (1.043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (1.044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (1.045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (1.046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (1.047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (1.048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (1.049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (1.050) 2-[1-(2,4-dichlorophenyl)-5-hydroxy-2,6,6-trimethylheptan-4-yl]-2,4-dihydro-3H-1,2,4-triazole-3-thione, (1.051) 2-[2-chloro-4-(2,4-dichlorophenoxy)phenyl]-1-(1H-1,2,4-triazol-1-yl)propan-2-ol, (1.052) 2-[2-chloro-4-(4-chlorophenoxy)phenyl]-1-(1H-1,2,4-triazol-1-yl)butan-2-ol, (1.053) 2-[4-(4-chlorophenoxy)-2-(trifluoromethyl)phenyl]-1-(1H-1,2,4-triazol-1-yl)butan-2-ol, (1.054) 2-[4-(4-chlorophenoxy)-2-(trifluoro-methyl)phenyl]-1-(1H-1,2,4-triazol-1-yl)pentan-2-ol, (1.055) mefentrifluconazole, (1.056) 2-{[3-(2-chloro-phenyl)-2-(2,4-difluorophenyl)oxiran-2-yl]methyl}-2,4-dihydro-3H-1,2,4-triazole-3-thione, (1.057) 2-{[rel(2R,3R)-3-(2-chlorophenyl)-2-(2,4-difluorophenyl)oxiran-2-yl]methyl}-2,4-dihydro-3H-1,2,4-tria-zole-3-thione, (1.058) 2-{[rel(2R,3S)-3-(2-chlorophenyl)-2-(2,4-difluorophenyl)oxiran-2-yl]methyl}-2,4-dihydro-3H-1,2,4-triazole-3-thione, (1.059) 5-(4-chlorobenzyl)-2-(chloromethyl)-2-methyl-1-(JH-1,2,4-triazol-1-ylmethyl)cyclopentanol, (1.060) 5-(allylsulfanyl)-1-{[3-(2-chlorophenyl)-2-(2,4-difluoro-phenyl)oxiran-2-yl]methyl}-1H-1,2,4-triazole, (1.061) 5-(allylsulfanyl)-1-{[rel(2R,3R)-3-(2-chlorophenyl)-2-(2,4-difluorophenyl)oxiran-2-yl]methyl-1H-1,2,4-triazole, (1.062) 5-(allylsulfanyl)-1-{[rel(2R,3S)-3-(2-chlorophenyl)-2-(2,4-difluorophenyl)oxiran-2-yl]methyl}-1H-1,2,4-triazole, (1.063) N'-(2,5-dimethyl-4-{[3-(1,1,2,2-tetrafluoroethoxy)phenyl]sulfanyl}phenyl)-N-ethyl-N-methylimidoformamide, (1.064) N'-(2,5-dimethyl-4-{[3-(2,2,2-trifluoroethoxy)phenyl]sulfanyl}phenyl)N-ethyl-N-methylimidoformamide, (1.065) N'-(2,5-dimethyl-4-{[3-(2,2,3,3-tetrafluoropropoxy)phenyl]sulfanyl}phenyl)-N-ethyl-N-methylimidoformamide, (1.066) N'-(2,5-dimethyl-4-{[3-(pentafluoroethoxy)phenyl]sulfanyl}phenyl)-N-ethyl-N-methylimidoformamide, (1.067) N'-(2,5-dimethyl-4-{3-[(1,1,2,2-tetrafluoroethyl)sulfanyl]phenoxy}phenyl)-N-ethyl-N-methylimidoformamide, (1.068) N'-(2,5-dimethyl-4-{3-[(2,2,2-trifluoro-ethyl)sulfanyl]phenoxy}phenyl)-N-ethyl-N-methylimidoformamide, (1.069) N'-(2,5-dimethyl-4-{3-[(2,2,3,3-tetrafluoropropyl)sulfanyl]phenoxy}phenyl)-N-ethyl-N-methylimidoformamide, (1.070) N'-(2,5-dimethyl-4-

{3-[(pentafluoroethyl)sulfanyl]phenoxy}phenyl)-N-ethyl-N-methylimidoformamide, (1.071) N'-(2,5-dimethyl-4-phenoxyphenyl)-N-ethyl-N-methylimidoformamide, (1.072) N'-(4-{[3-(difluoromethoxy)phenyl]sulfanyl}-2,5-dimethylphenyl)-N-ethyl-N-methylimidoformamide, (1.073) N'-(4-{3-[(difluoromethyl)sulfanyl]phenoxy}-2,5-dimethylphenyl)-N-ethyl-N-methylimidoformamide, (1.074) N'-[5-bromo-6-(2,3-dihydro-1H-inden-2-yloxy)-2-methylpyridin-3-yl]-N-ethyl-N-methylimidoformamide, (1.075) N'-{4-[(4,5-dichloro-1,3-thiazol-2-yl)oxy]-2,5-dimethylphenyl}-N-ethyl-N-methylimidoformamide, (1.076) N'-{5-bromo-6-[(1R)-1-(3,5-difluorophenyl)ethoxy]-2-methylpyridin-3-yl}-N-ethyl-N-methylimidoformamide, (1.077) N'-{5-bromo-6-[(1S)-1-(3,5-difluorophenyl)ethoxy]-2-methylpyridin-3-yl}-N-ethyl-N-methylimidoformamide, (1.078) N'-{5-bromo-6-[(cis-4-isopropylcyclohexyl)oxy]-2-methylpyridin-3-yl-N-ethyl-N-methylimidoformamide, (1.079) N'-{5-bromo-6-[(trans-4-isopropylcyclo-hexyl)oxy]-2-methylpyridin-3-yl}-N-ethyl-N-methylimidoformamide, (1.080) N'-{5-bromo-6-[1-(3,5-difluorophenyl)ethoxy]-2-methylpyridin-3-yl}-N-ethyl-N-methylimidoformamide, (1.081) ipfentrifluconazole, (1.082) 2-[4-(4-chlorophenoxy)-2-(trifluoromethyl)phenyl]-1-(1H-1,2,4-triazol-1-yl)propan-2-ol, (1.083) 2-[6-(4-bromophenoxy)-2-(trifluoromethyl)-3-pyridyl]-1-(1,2,4-triazol-1-yl)propan-2-ol, (1.084) 2-[6-(4-chlorophenoxy)-2-(trifluoromethyl)-3-pyridyl]-1-(1,2,4-triazol-1-yl)propan-2-ol, (1.085) 3-[2-(1-chlorocyclopropyl)-3-(3-chloro-2-fluoro-phenyl)-2-hydroxy-propyl]imidazole-4-carbonitrile, (1.086) 4-[[6-[rac-(2R)-2-(2,4-difluorophenyl)-1,1-difluoro-2-hydroxy-3-(5-thioxo-4H-1,2,4-triazol-1-yl)propyl]-3-pyridyl]oxy]benzonitrile, (1.087) N-isopropyl-N'-[5-methoxy-2-methyl-4-(2,2,2-trifluoro-1-hydroxy-1-phenylethyl)phenyl]-N-methylimidoformamide, (1.088) N'-{5-bromo-2-methyl-6-[(1-propoxypropan-2-yl)oxy]pyridin-3-yl}-N-ethyl-N-methylimidoformamide, (1.089) hexaconazole, (1.090) penconazole, (1.091) fenbuconazole, (1.092) methyl 2-[2-chloro-4-(4-chlorophenoxy)phenyl]-2-hydroxy-3-(1,2,4-triazol-1-yl)propanoate inhibitors of the respiratory chain at complex I or II selected from the group consisting of (2.001) benzovindiflupyr, (2.002) bixafen, (2.003) boscalid, (2.004) carboxin, (2.005) fluopyram, (2.006) flutolanil, (2.007) fluxapyroxad, (2.008) furametpyr, (2.009) Isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of syn-epimeric racemate 1RS,4SR,9RS and anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.020) Pyraziflumid, (2.021) sedaxane, (2.022) 1,3-dimethyl-N-(1,1,3-trimethyl-2,3-dihydro-1H-inden-4-yl)-1H-pyrazole-4-carboxamide, (2.023) 1,3-dimethyl-N-[(3R)-1,1,3-trimethyl-2,3-dihydro-1H-inden-4-yl]-1H-pyrazole-4-carboxamide, (2.024) 1,3-dimethyl-N-[(3S)-1,1,3-trimethyl-2,3-dihydro-1H-inden-4-yl]-1H-pyrazole-4-carboxamide, (2.025) 1-methyl-3-(trifluoromethyl)-N-[2'-(trifluoromethyl)biphenyl-2-yl]-1H-pyrazole-4-carboxamide, (2.026) 2-fluoro-6-(trifluoromethyl)-N-(1,1,3-trimethyl-2,3-dihydro-1H-inden-4-yl)benzamide, (2.027) 3-(difluoromethyl)-1-methyl-N-(1,1,3-trimethyl-2,3-dihydro-1H-inden-4-yl)-1H-pyrazole-4-carboxamide, (2.028) inpyrfluxam, (2.029) 3-(difluoromethyl)-1-methyl-N-[(3S)-1,1,3-trimethyl-2,3-dihydro-1H-inden-4-yl]-1H-pyrazole-4-carboxamide, (2.030) fluindapyr, (2.031) 3-(difluoromethyl)-N-[(3R)-7-fluoro-1,1,3-trimethyl-2,3-dihydro-1H-inden-4-yl]-1-methyl-1H-pyrazole-4-carboxamide, (2.032) 3-(difluoromethyl)-N-[(3S)-7-fluoro-1,1,3-trimethyl-2,3-dihydro-1H-inden-4-yl]-1-methyl-1H-pyrazole-4-carboxamide, (2.033) 5,8-difluoro-N-[2-(2-fluoro-4-{[4-(trifluoromethyl)pyridin-2-yl]oxy}phenyl)ethyl]quinazolin-4-amine, (2.034) N-(2-cyclopentyl-5-fluorobenzyl)-N-cyclopropyl-3-(difluoromethyl)-5-fluoro-1-methyl-1H-pyrazole-4-carboxamide, (2.035) N-(2-tert-butyl-5-methylbenzyl)-N-cyclopropyl-3-(difluoromethyl)-5-fluoro-1-methyl-1H-pyrazole-4-carboxamide, (2.036) N-(2-tert-butylbenzyl)-N-cyclopropyl-3-(difluoromethyl)-5-fluoro-1-methyl-1H-pyrazole-4-carboxamide, (2.037) N-(5-chloro-2-ethylbenzyl)-N-cyclopropyl-3-(difluoromethyl)-5-fluoro-1-methyl-1H-pyrazole-4-carboxamide, (2.038) isoflucypram, (2.039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (2.040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (2.041) N-[1-(2,4-dichlorophenyl)-1-methoxypropan-2-yl]-3-(difluoromethyl)-1-methyl-1H-pyrazole-4-carboxamide, (2.042) N-[2-chloro-6-(trifluoromethyl)benzyl]-N-cyclopropyl-3-(difluoromethyl)-5-fluoro-1-methyl-1H-pyrazole-4-carboxamide, (2.043) N-[3-chloro-2-fluoro-6-(trifluoromethyl)benzyl]-N-cyclopropyl-3-(difluoromethyl)-5-fluoro-1-methyl-1H-pyrazole-4-carboxamide, (2.044) N-[5-chloro-2-(trifluoromethyl)benzyl]-N-cyclopropyl-3-(difluoromethyl)-5-fluoro-1-methyl-1H-pyrazole-4-carboxamide, (2.045) N-cyclopropyl-3-(difluoromethyl)-5-fluoro-1-methyl-N-[5-methyl-2-(trifluoromethyl)benzyl]-1H-pyrazole-4-carboxamide, (2.046) N-cyclopropyl-3-(difluoromethyl)-5-fluoro-N-(2-fluoro-6-isopropylbenzyl)-1-methyl-1H-pyrazole-4-carboxamide, (2.047) N-cyclopropyl-3-(difluoromethyl)-5-fluoro-N-(2-isopropyl-5-methylbenzyl)-1-methyl-1H-pyrazole-4-carboxamide, (2.048) N-cyclopropyl-3-(difluoromethyl)-5-fluoro-N-(2-isopropylbenzyl)-1-methyl-1H-pyrazole-4-carbothioamide, (2.049) N-cyclopropyl-3-(difluoromethyl)-5-fluoro-N-(2-isopropylbenzyl)-1-methyl-1H-pyrazole-4-carboxamide, (2.050) N-cyclopropyl-3-(difluoromethyl)-5-fluoro-N-(5-fluoro-2-isopropylbenzyl)-1-methyl-1H-pyrazole-4-carboxamide, (2.051) N-cyclopropyl-3-(difluoromethyl)-N-(2-ethyl-4,5-dimethylbenzyl)-5-fluoro-1-methyl-1H-pyrazole-4-carboxamide, (2.052) N-cyclopropyl-3-(difluoromethyl)-N-(2-ethyl-5-fluorobenzyl)-5-fluoro-1-methyl-1H-pyrazole-4-carboxamide, (2.053) N-cyclopropyl-3-(difluoromethyl)-N-(2-ethyl-5-methylbenzyl)-5-fluoro-1-methyl-1H-pyrazole-4-carboxamide, (2.054) N-cyclopropyl-N-(2-cyclopropyl-5-fluorobenzyl)-3-(difluoromethyl)-5-fluoro-1-methyl-1H-pyrazole-4-carboxamide, (2.055)

N-cyclopropyl-N-(2-cyclopropyl-5-methylbenzyl)-3-(difluoromethyl)-5-fluoro-1-methyl-1H-pyrazole-4-carboxamide, (2.056) N-cyclopropyl-N-(2-cyclopropylbenzyl)-3-(difluoromethyl)-5-fluoro-1-methyl-1H-pyrazole-4-carboxamide, (2.057) pyrapropoyne, (2.058) N-[rac-(1S,2S)-2-(2,4-dichlorophenyl)cyclobutyl]-2-(trifluoromethyl)nicotinamide, (2.059) N-[(1S,2S)-2-(2,4-dichlorophenyl)cyclobutyl]-2-(trifluoromethyl)nicotinamide, (2.060) flubene-teram, inhibitors of the respiratory chain at complex III selected from the group consisting of (3.001) ametoctradin, (3.002) amisulbrom, (3.003) azoxystrobin, (3.004) coumethoxystrobin, (3.005) coumoxystrobin, (3.006) cyazofamid, (3.007) dimoxystrobin, (3.008) enoxastrobin, (3.009) famoxadone, (3.010) fenamidone, (3.011) flufenoxystrobin, (3.012) fluoxastrobin, (3.013) kresoxim-methyl, (3.014) metominostrobin, (3.015) orysastrobin, (3.016) picoxystrobin, (3.017) pyraclostrobin, (3.018) pyrametostrobin, (3.019) pyraoxystrobin, (3.020) trifloxystrobin, (3.021) (2E)-2-{2-[({[(1E)-1-(3-{[(E)-1-fluoro-2-phenyl-vinyl]oxy}phenyl)ethylidene]amino}oxy)methyl]phenyl}-2-(methoxyimino)-N-methylacetamide, (3.022) (2E,3Z)-5-{[1-(4-chlorophenyl)-1H-pyrazol-3-yl]oxy}-2-(methoxyimino)-N,3-dimethylpent-3-enamide, (3.023) (2R)-2-{2-[(2,5-dimethylphenoxy)methyl]phenyl}-2-methoxy-N-methylacetamide, (3.024) (2S)-2-{2-[(2,5-dimethylphenoxy)methyl]phenyl}-2-methoxy-N-methylacetamide, (3.025) fenpicoxamid, (3.026) mandestrobin, (3.027) N-(3-ethyl-3,5,5-trimethylcyclohexyl)-3-formamido-2-hydroxybenzamide, (3.028) (2E,3Z)-5-{[1-(4-chloro-2-fluorophenyl)-1H-pyrazol-3-yl]oxy}-2-(methoxyimino)-N,3-dimethylpent-3-enamide, (3.029) methyl {5-[3-(2,4-dimethylphenyl)-1H-pyrazol-1-yl]-2-methylbenzyl}carbamate, (3.030) metyltetraprole, (3.031) florylpicoxamid, (3.032) (2S, 3S)-3-(o-tolyl)butan-2-yl N-{[4-methoxy-3-(propanoyloxy)-2-pyridyl]carbonyl}-L-alaninate, inhibitors of the mitosis and cell division selected from the group consisting of (4.001) carbendazim, (4.002) diethofencarb, (4.003) ethaboxam, (4.004) fluopicolide, (4.005) pencycuron, (4.006) thiabendazole, (4.007) thiophanate-methyl, (4.008) zoxamide, (4.009) pyridachlometyl, (4.010) 3-chloro-5-(4-chlorophenyl)-4-(2,6-difluorophenyl)-6-methylpyridazine, (4.011) 3-chloro-5-(6-chloropyridin-3-yl)-6-methyl-4-(2,4,6-trifluorophenyl)pyridazine, (4.012) 4-(2-bromo-4-fluorophenyl)-N-(2,6-difluorophenyl)-1,3-dimethyl-1H-pyrazol-5-amine, (4.013) 4-(2-bromo-4-fluorophenyl)-N-(2-bromo-6-fluorophenyl)-1,3-dimethyl-1H-pyrazol-5-amine, (4.014) 4-(2-bromo-4-fluorophenyl)-N-(2-bromophenyl)-1,3-dimethyl-1H-pyrazol-5-amine, (4.015) 4-(2-bromo-4-fluorophenyl)-N-(2-chloro-6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, (4.017) 4-(2-bromo-4-fluorophenyl)-N-(2-fluorophenyl)-1,3-dimethyl-1H-pyrazol-5-amine, (4.018) 4-(2-chloro-4-fluorophenyl)-N-(2,6-difluorophenyl)-1,3-dimethyl-1H-pyrazol-5-amine, (4.019) 4-(2-chloro-4-fluorophenyl)-N-(2-chloro-6-fluorophenyl)-1,3-dimethyl-1H-pyrazol-5-amine, (4.020) 4-(2-chloro-4-fluorophenyl)-N-(2-chlorophenyl)-1,3-dimethyl-1H-pyrazol-5-amine, (4.021) 4-(2-chloro-4-fluorophenyl)-N-(2-fluorophenyl)-1,3-dimethyl-1H-pyrazol-5-amine, (4.022) 4-(4-chlorophenyl)-5-(2,6-difluorophenyl)-3,6-dimethylpyridazine, (4.023) N-(2-bromo-6-fluorophenyl)-4-(2-chloro-4-fluorophenyl)-1,3-dimethyl-1H-pyrazol-5-amine, (4.024) N-(2-bromophenyl)-4-(2-chloro-4-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine, (4.026) fluopimomide, compounds capable to have a multisite action selected from the group consisting of (5.001) bordeaux mixture, (5.002) captafol, (5.003) captan, (5.004) chlorothalonil, (5.005) copper hydroxide, (5.006) copper naphthenate, (5.007) copper oxide, (5.008) copper oxychloride, (5.009) copper(2+) sulfate, (5.010) dithianon, (5.011) dodine, (5.012) folpet, (5.013) mancozeb, (5.014) maneb, (5.015) metiram, (5.016) metiram zinc, (5.017) oxine-copper, (5.018) propineb, (5.019) sulfur and sulfur preparations including calcium polysulfide, (5.020) thiram, (5.021) zineb, (5.022) ziram, (5.023) 6-ethyl-5,7-dioxo-6,7-dihydro-5H-pyrrolo[3',4':5,6][1,4]dithiino[2,3-c][1,2]thiazole-3-carbonitrile, compounds capable to induce a host defence selected from the group consisting of (6.001) acibenzolar-S-methyl, (6.002) isotianil, (6.003) probenazole, (6.004) tiadinil, inhibitors of the amino acid and/or protein biosynthesis selected from the group consisting of (7.001) cyprodinil, (7.002) kasugamycin, (7.003) kasugamycin hydrochloride hydrate, (7.004) oxytetracycine, (7.005) pyrimethanil, (7.006) 3-(5-fluoro-3,3,4,4-tetramethyl-3,4-dihydroisoquinolin-1-yl)quinoline, inhibitors of the ATP production selected from the group consisting of (8.001) silthiofam, inhibitors of the cell wall synthesis selected from the group consisting of (9.001) benthiavalicarb, (9.002) dimethomorph, (9.003) flumorph, (9.004) iprovalicarb, (9.005) mandipropamid, (9.006) pyrimorph, (9.007) valifenalate, (9.008) (2E)-3-(4-tert-butylphenyl)-3-(2-chloropyridin-4-yl)-1-(morpholin-4-yl)prop-2-en-1-one, (9.009) (2Z)-3-(4-tert-butylphenyl)-3-(2-chloropyridin-4-yl)-1-(morpholin-4-yl)prop-2-en-1-one, inhibitors of the lipid and membrane synthesis selected from the group consisting of (10.001) propamocarb, (10.002) propamocarb hydrochloride, (10.003) tolclofos-methyl, inhibitors of the melanin biosynthesis selected from the group consisting of (11.001) tricyclazole, (11.002) tolprocarb, inhibitors of the nucleic acid synthesis selected from the group consisting of (12.001) benalaxyl, (12.002) benalaxyl-M (kiralaxyl), (12.003) metalaxyl, (12.004) metalaxyl-M (mefenoxam), inhibitors of the signal transduction selected from the group consisting of (13.001) fludioxonil, (13.002) iprodione, (13.003) procymidone, (13.004) proquinazid, (13.005) quinoxyfen, (13.006) vinclozolin, compounds capable to act as an uncoupler selected from the group consisting of (14.001) fluazinam, (14.002) meptyldinocap, further fungicides selected from the group consisting of (15.001) abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fosetyl-sodium, (15.015) methyl isothiocyanate, (15.016) metrafenone, (15.017) mildiomycin, (15.018) natamycin, (15.019) nickel dimethyldithiocarbamate, (15.020) nitrothal-isopropyl, (15.021) oxamocarb, (15.022) oxathiapiprolin, (15.023) oxyfenthiin, (15.024) pentachlorophenol and salts, (15.025) phosphorous acid and its salts, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoro-methyl)-1H-pyrazol-1-yl]ethanone, (15.033) 2-(6-benzylpyridin-2-yl)quinazoline, (15.034) dipymetitrone, (15.035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl) piperidin-1-yl]ethanone, (15.036) 2-[3,5-bis (difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (15.038) 2-[6-(3-fluoro-4-methoxyphenyl)-5-methylpyridin-2-yl]quinazoline, (15.039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.040) 2-{(5S)-3-[2-(1-{[3,5-bis (difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.041) ipflufenoquin, (15.042) 2-{2-fluoro-6-[(8-fluoro-2-methylquinolin-3-yl)oxy]phenyl}propan-2-ol, (15.043) fluoxapiprolin, (15.044) 2-{3-[2-(1-{[3,5-bis (difluoromethyl)-11H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts, (15.046) 3-(4,4,5-trifluoro-3,3-dimethyl-3,4-dihydroisoquinolin-1-yl)quinoline, (15.047) quinofumelin, (15.048) 4-amino-5-fluoropyrimidin-2-ol (tautomeric form: 4-amino-5-fluoropyrimidin-2(1H)-one), (15.049) 4-oxo-4-[(2-phenyl-ethyl)amino]butanoic acid, (15.050) 5-amino-1,3,4-thiadiazole-2-thiol, (15.051) 5-chloro-N'-phenyl-N'-(prop-2-yn-1-yl)thiophene-2-sulfonohydrazide, (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[({[(Z)-(1-methyl-1H-tetrazol-5-yl)(phenyl)methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2-yl}carbamate, (15.062) 5-fluoro-4-imino-3-methyl-1-[(4-methylphenyl)sulfonyl]-3,4-dihydropyrimidin-2(1H)-one, (15.063) aminopyrifen, (15.064) (N'-[2-chloro-4-(2-fluorophenoxy)-5-methylphenyl]-N-ethyl-N-methylimidoformamide), (15.065) (N'-(2-chloro-5-methyl-4-phenoxyphenyl)-N-ethyl-N-methylimidoformamide), (15.066) (2-{2-[(7,8-difluoro-2-methylquinolin-3-yl) oxy]-6-fluorophenyl}propan-2-ol), (15.067) (5-bromo-1-(5,6-dimethylpyridin-3-yl)-3,3-dimethyl-3,4-dihydroisoquinoline), (15.068) (3-(4,4-difluoro-5,5-dimethyl-4,5-dihydrothieno[2,3-c]pyridin-7-yl) quinoline), (15.069) (1-(4,5-dimethyl-1H-benzimidazol-1-yl)-4,4-difluoro-3,3-dimethyl-3,4-dihydroisoquinoline), (15.070) 8-fluoro-3-(5-fluoro-3,3-dimethyl-3,4-dihydroisoquinolin-1-yl)quinolone, (15.071) 8-fluoro-3-(5-fluoro-3,3,4,4-tetramethyl-3,4-dihydroisoquinolin-1-yl)quinolone, (15.072) 3-(4,4-difluoro-3,3-dimethyl-3,4-dihydroisoquinolin-1-yl)-8-fluoroquinoline, (15.073) (N-methyl-N-phenyl-4-[5-(trifluoromethyl)-1,2,4-oxadiazol-3-yl]benzamide), (15.074) methyl {4-[5-(trifluoromethyl)-1,2,4-oxadiazol-3-yl]phenyl}carbamate, (15.075) (N-{4-[5-(trifluoromethyl)-1,2,4-oxadiazol-3-yl]benzyl}-cyclopropanecarboxamide), (15.076) N-methyl-4-(5-(trifluoromethyl)-1,2,4-oxadiazol-3-yl]benzamide, (15.077) N-[(E)-methoxyiminomethyl]-4-[5-(trifluoromethyl)-1,2,4-oxadiazol-3-yl]benzamide, (15.078) N-[(Z)-methoxyiminomethyl]-4-[5-(trifluoromethyl)-1,2,4-oxadiazol-3-yl]benzamide, (15.079) N-[4-[5-(trifluoromethyl)-1,2,4-oxadiazol-3-yl]phenyl]cyclopropanecarboxamide, (15.080) N-(2-fluorophenyl)-4-[5-(trifluoromethyl)-1,2,4-oxadiazol-3-yl]benzamide, (15.081) 2,2-difluoro-N-methyl-2-[4-[5-(trifluoromethyl)-1,2,4-oxadiazol-3-yl]phenyl]acetamide, (15.082) N-allyl-N-[[4-[5-(trifluoromethyl)-1,2,4-oxadiazol-3-yl)phenyl]methyl]acetamide, (15.083) N-[(E)-N-methoxy-C-methyl-carbonimidoyl]-4-(5-(trifluoromethyl)-1,2,4-oxadiazol-3-yl]benzamide, (15.084) N—[(Z)-N-methoxy-C-methyl-carbonimidoyl]-4-[5-(trifluoromethyl)-1,2,4-oxadiazol-3-yl]benzamide, (15.085) N-allyl-N-[[4-[5-(trifluoromethyl)-1,2,4-oxadiazol-3-yl]phenyl]methyl]propanamide, (15.086) 4,4-dimethyl-1-[[4-[5-(trifluoromethyl)-1,2,4-oxadiazol-3-yl]phenyl]methyl]pyrrolidin-2-one, (15.087) N-methyl-4-[5-(trifluoromethyl)-1,2,4-oxadiazol-3-yl] benzenecarbothioamide, (15.088) 5-methyl-1-[[4-[5-(trifluoro-methyl)-1,2,4-oxadiazol-3-yl]phenyl] methyl]pyrrolidin-2-one, (15.089) N-((2,3-difluoro-4-[5-(trifluoro-methyl)-1,2,4-oxadiazol-3-yl]phenyl] methyl]-3,3,3-trifluoro-propanamide, (15.090) 1-methoxy-1-methyl-3-[[4-[5-(trifluoromethyl}-1,2,4-oxadiazol-3-yl]phenyl]methyl]urea, (15.091) 1,1-diethyl-3-[[4-[5-(trifluoromethyl}-1,2,4-oxadiazol-3-yl] phenyl]methyl]urea, (15.092) N-[[4-[5-(trifluoromethyl)-1,2,4-oxadiazol-3-yl]phenyl]methyl] propanamide, (15.093) N-methoxy-N-[[4-[5-(trifluoromethyl)-1,2,4-oxadiazol-3-yl]phenyl]methyl] cyclopropanecarboxamide, (15.094) 1-methoxy-3-methyl-1-[[4-[5-(trifluoromethyl)-1,2,4-oxadiazol-3-yl]phenyl]methyl]urea, (15.095) N-methoxy-N-[[4-[5-(trifluoro-methyl)-1,2,4-oxadiazol-3-yl]phenyl] methyl)cyclopropanecarboxamide, (15.096) N,2-dimethoxy-N-[[4-[5-(trifluoromethyl}-1,2,4-oxadiazol-3-yl]phenyl]methyl]propanamide, (15.097) N-ethyl-2-methyl-N-[[4-[5-(trifluoromethyl)-1,2,4-oxadiazol-3-yl)phenyl]methyl]propanamide, (15.098) 1-methoxy-3-methyl-1-[[4-[5-(trifluoromethyl)-1,2,4-oxadiazol-3-yl]phenyl]methyl]urea, (15.099) 1,3-dimethoxy-1-[[4-[5-(trifluoro-methyl)-1,2,4-oxadiazol-3-yl]phenyl]methyl]urea, (15.100) 3-ethyl-1-methoxy-1-[[4-[5-(trifluoromethyl)-1,2,4-oxadiazol-3-yl] phenyl]methyl]urea, (15.101) 1-[[4-[5-(trifluoromethyl)-1,2,4-oxadiazol-3-yl]phenyl]-methyl]piperidin-2-one, (15.102) 4,4-dimethyl-2-[[4-[5-(trifluoromethyl)-1,2,4-oxadiazol-3-yl]phenyl]-methyl]isooxazolidin-3-one, (15.103) 5,5-dimethyl-2-

[[4-[5-(trifluoromethyl)-1,2,4-oxadiazol-3-yl]phenyl] methyl]isoxazolidin-3-one, (15.104) 3,3-dimethyl-1-[[4-[5-(trifluoromethyl)-1,2,4-oxadiazol-3-yl]phenyl] methyl]piperidin-2-one, (15.105) 1-[[3-fluoro-4-(5-(trifluoromethyl)-1,2,4-oxadiazol-3-yl]-phenyl] methyl]azepan-2-one, (15.106) 4,4-dimethyl-2-[[4-(5-(trifluoromethyl)-1,2,4-oxadiazol-3-yl]-phenyl] methyl]isoxazolidin-3-one, (15.107) 5,5-dimethyl-2-[[4-[5-(trifluoromethyl)-1,2,4-oxadiazol-3-yl]-phenyl] methyl]isoxazolidin-3-one, (15.108) ethyl 1-{4-[5-(trifluoromethyl)-1,2,4-oxadiazol-3-yl]benzyl}-1H-pyrazole-4-carboxylate, (15.109) N,N-dimethyl-1-{4-[5-(trifluoromethyl)-1,2,4-oxadiazol-3-yl]benzyl}-1H-1,2,4-triazol-3-amine, (15.110) N-{2,3-difluoro-4-[5-(trifluoromethyl)-1,2,4-oxadiazol-3-yl] benzyl}butanamide, (15.111) N-(1-methylcyclopropyl)-4-[5-(trifluoromethyl)-1,2,4-oxadiazol-3-yl]benzamide, (15.112) N-(2,4-difluorophenyl)-4-[5-(trifluoromethyl)-1,2,4-oxadiazol-3-yl]benzamide, (15.113) 1-(5,6-dimethylpyridin-3-yl)-4,4-difluoro-3,3-dimethyl-3,4-dihydroisoquinoline, (15.114) 1-(6-(difluoromethyl)-5-methyl-pyridin-3-yl)-4,4-difluoro-3,3-dimethyl-3,4-dihydroisoquinoline, (15.115) 1-(5-(fluoromethyl)-6-methyl-pyridin-3-yl)-4,4-difluoro-3,3-dimethyl-3,4-dihydroisoquinoline, (15.116) 1-(6-(difluoromethyl)-5-methoxy-pyridin-3-yl)-4,4-difluoro-3,3-dimethyl-3,4-dihydroisoquinoline, (15.117) 4-[5-(trifluoromethyl)-1,2,4-oxadiazol-3-yl]phenyl dimethylcarbamate, (15.118) N-{4-[5-(trifluoromethyl)-1,2,4-oxadiazol-3-yl]phenyl}propanamide, (15.119) 3-[2-(1-{[5-methyl-3-(trifluoromethyl)-1H-pyrazol-1-yl]acetyl}piperidin-4-yl)-1,3-thiazol-4-yl]-1,5-dihydro-2,4-benzodioxepin-6-yl methanesulfonate, (15.120) 9-fluoro-3-[2-(1-{[5-methyl-3-(trifluoromethyl)-1H-pyrazol-1-yl]acetyl}piperidin-4-yl)-1,3-thiazol-4-yl]-1,5-dihydro-2,4-benzodioxepin-6-yl methanesulfonate, (15.121) 3-[2-(1-{[3,5-bis(difluoromethyl)-1H-pyrazol-1-yl]acetyl}piperidin-4-yl)-1,3-thiazol-4-yl]-1,5-dihydro-2,4-benzodioxepin-6-yl methanesulfonate, (15.122) 3-[2-(1-{[3,5-bis(difluoromethyl)-1H-pyrazol-1-yl]acetyl}piperidin-4-yl)-1,3-thiazol-4-yl]-9-fluoro-1,5-dihydro-2,4-benzodioxepin-6-yl methanesulfonate, (15.123) 1-(6,7-dimethylpyrazolo[1,5-a] pyridin-3-yl)-4,4-difluoro-3,3-dimethyl-3,4-dihydroisoquinoline, (15.124) 8-fluoro-N-(4,4,4-trifluoro-2-methyl-1-phenylbutan-2-yl)quinoline-3-carboxamide, (15.125) 8-fluoro-N-[(2S)-4,4,4-trifluoro-2-methyl-1-phenylbutan-2-yl]quinoline-3-carboxamide, (15.126) N-(2,4-dimethyl-1-phenylpentan-2-yl)-8-fluoroquinoline-3-carboxamide, (15.127) N-[(2S)-2,4-dimethyl-1-phenylpentan-2-yl]-8-fluoroquinoline-3-carboxamide, (15.128) D-tagatose, antibacterial agents selected from the group consisting of bacteria, such as (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (16.002) *Bacillus amyloliquefaciens*, in particular strain D747 (available as Double Nickel™ from Certis, US, having accession number FERM BP-8234 and disclosed in U.S. Pat. No. 7,094,592); (16.003) *Bacillus pumilus*, in particular strain BU F-33 (having NRRL Accession No. 50185); (16.004) *Bacillus subtilis* var. *amyloliquefaciens* strain FZB24 (available as Taegro® from Novozymes, US); (16.005) a *Paenibacillus* sp. strain having Accession No. NRRL B-50972 or Accession No. NRRL B-67129 and described in International Patent Publication No. WO 2016/154297; and fungi, such as (16.006) *Aureobasidium pullulans*, in particular blastospores of strain DSM14940; (16.007) *Aureobasidium pullulans* blastospores of strain DSM 14941; (16.008) *Aureobasidium pullulans*, in particular mixtures of blastospores of strains DSM14940 and DSM14941, biological fungicides selected from the group consisting of bacteria, for example (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.002) *Bacillus pumilus*, in particular strain QST2808 (available as SONATA® from Bayer CropScience LP, US, having Accession No. NRRL B-30087 and described in U.S. Pat. No. 6,245,551); (17.003) *Bacillus pumilus*, in particular strain GB34 (available as Yield Shield® from Bayer AG, DE); (17.004) *Bacillus pumilus*, in particular strain BU F-33 (having NRRL Accession No. 50185); (17.005) *Bacillus amyloliquefaciens*, in particular strain D747 (available as Double Nickel™ from Certis, US, having accession number FERM BP-8234 and disclosed in U.S. Pat. No. 7,094,592); (17.006) *Bacillus subtilis* Y1336 (available as BIOBAC® WP from Bion-Tech, Taiwan, registered as a biological fungicide in Taiwan under Registration Nos. 4764, 5454, 5096 and 5277); (17.007) *Bacillus amyloliquefaciens* strain MBI 600 (available as SUBTILEX from BASF SE); (17.008) *Bacillus subtilis* strain GB03 (available as Kodiak® from Bayer AG, DE); (17.009) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); (17.010) *Bacillus mycoides*, isolate J (available as BmJ TGAI or WG from Certis USA); (17.011) *Bacillus licheniformis*, in particular strain SB3086 (available as EcoGuard™ Biofungicide and Green Releaf from Novozymes); (17.012) a *Paenibacillus* sp. strain having Accession No. NRRL B-50972 or Accession No. NRRL B-67129 and described in International Patent Publication No. WO 2016/154297, fatty acids or derivatives, for example (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is more preferably selected from:

(1.001) cyproconazole, (1.002) difenoconazole, (1.003) epoxiconazole, (1.004) fenhexamid, (1.010) imazalil, (1.012) ipconazole, (1.013) metconazole, (1.017) propiconazole, (1.018) prothioconazole, (1.020) spiroxamine, (1.021) tebuconazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(JH-1,2,4-triazol-1-ylmethyl)cyclopentanol, (1.055) mefentrifluconazole, (1.059) 5-(4-chlorobenzyl)-2-(chloromethyl)-2-methyl-1-(1H-1,2,4-triazol-1-ylmethyl)cyclopentanol, (1.062) fluoxytio-conazole, (1.067) N'-(2,5-dimethyl-4-{3-[(1,1,2,2-tetrafluoro-ethyl)sulfanyl]-phenoxy}phenyl)-N-ethyl-N-methyl-imidoformamide, (1.081) ipfentrifluconazole, (1.082) 2-[6-(4-bromophenoxy)-2-(trifluoro-methyl)-3-pyridyl]-1-(1,2,4-triazol-1-yl)propan-2-ol and (1.092) methyl 2-[2-chloro-4-(4-chloro-phenoxy)phenyl]-2-hydroxy-3-(1,2,4-triazol-1-yl)propanoate (2.001) benzovindiflupyr, (2.002) bixafen, (2.003) boscalid, (2.005) fluopyram, (2.007) fluxapyroxad, (2.009) isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of syn-epimeric racemate 1RS,4SR,9RS and anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.021) sedaxane, (2.028) inpyrfluxam, (2.030) fluindapyr, (2.038) isoflucypram, (3.003) azoxystrobin, (3.007) dimoxystrobin, (3.012) fluoxastrobin, (3.013) kresoxim-methyl, (3.016) picoxystrobin, (3.017) pyraclostrobin, (3.020) trifloxystrobin, (3.025) fenpicoxamid, (3.026) 2-{2-[(2,5-dimethylphenoxy)methyl]phenyl}-2-methoxy-N-methylacetamide, (3.030) metyltetraprole, (3.031) florylpicoxamid, (4.005) pencycuron, (4.007) thiophanate-methyl, (4.012) 4-(2-bromo-4-fluorophenyl)-N-(2,6-difluorophenyl)-1,3-dimethyl-1H-pyrazol-5-amine, (4.015) 4-(2-bromo-4-fluorophenyl)-N-(2-chloro-6-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine, (5.003) captan, (5.004) chlorothalonil, (5.010), dithianon, (5.011) dodine, (5.012) folpet, (5.013) mancozeb, (5.015) metiram, (5.018) propineb, (6.002) isotianil, (7.001) cyprodinil, (7.005) pyrimethanil, (12.003) metalaxyl, (12.004) metalaxyl-M (mefenoxam), (13.001) fludioxonil, (13.002) iprodione, (13.004) proquinazid, (13.005) quinoxyfen, (14.001) fluazinam, (14.002) meptyldinocap, (15.008) cyflufenamid, (15.010) cyprosulfamide, (15.011) flutianil, (15.012) fosetyl-aluminium, (15.016) metrafenone, (15.027) pyriofenone (chlazafenone), (15.043) fluoxa-piprolin (15.047) 3-(4,4-difluoro-3,3-dimethyl-3,4-dihydroisoquinolin-1-yl)quinolone, (15.048) 4-amino-5-fluoropyrimidin-2-ol (tautomeric form: 4-amino-5-fluoropyrimidin-2(1H)-one), (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.062) 5-fluoro-4-imino-3-methyl-1-[(4-methylphenyl)sulfonyl]-3,4-dihydropyrimidin-2(1H)-one, (15.063) aminopyrifen, (15.064) (N'-[2-chloro-4-(2-fluorophenoxy)-5-methylphenyl]-N-ethyl-N-methylimidoformamide), (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051), (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.002) *Bacillus pumilus*, in particular strain QST2808 (available as SONATA® from Bayer CropScience LP, US, having Accession No. NRRL B-30087 and described in U.S. Pat. No. 6,245,551); (17.003) *Bacillus pumilus*, in particular strain GB34 (available as Yield Shield® from Bayer AG, DE); (17.008) *Bacillus subtilis* strain GB03 (available as Kodiak® from Bayer AG, DE); (17.009) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); (17.011) *Bacillus licheniformis*, in particular strain SB3086 (available as EcoGuard™ Biofungicide and Green Releaf from Novozymes); (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is likewise more preferably selected from:

(1.001) cyproconazole, (1.002) difenoconazole, (1.003) epoxiconazole, (1.004) fenhexamid, (1.010) imazalil, (1.012) ipconazole, (1.013) metconazole, (1.017) propiconazole, (1.018) prothioconazole, (1.020) spiroxamine, (1.021) tebuconazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.055) mefentrifluconazole, (1.059) 5-(4-chlorobenzyl)-2-(chloromethyl)-2-methyl-1-(1H-1,2,4-triazol-1-ylmethyl)cyclopentanol, (1.081) ipfentrifluconazole, (1.082) 2-[6-(4-bromophenoxy)-2-(trifluoromethyl)-3-pyridyl]-1-(1,2,4-triazol-1-yl)propan-2-ol and (1.092) methyl 2-[2-chloro-4-(4-chlorophenoxy)phenyl]-2-hydroxy-3-(1,2,4-triazol-1-yl)propanoate (2.001) benzovindiflupyr, (2.002) bixafen, (2.003) boscalid, (2.005) fluopyram, (2.007) fluxapyroxad, (2.009) isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of syn-epimeric racemate 1RS,4SR,9RS and anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.021) sedaxane, (2.028) inpyrfluxam, (2.030) fluindapyr, (2.038) isoflucypram, (3.003) azoxystrobin, (3.007) dimoxystrobin, (3.012) fluoxastrobin, (3.013) kresoxim-methyl, (3.016) picoxystrobin, (3.017) pyraclostrobin, (3.020) trifloxystrobin, (3.025) fenpicoxamid, (3.026) 2-{2-[(2,5-dimethylphenoxy)methyl]phenyl}-2-methoxy-N-methylacetamide, (3.030) metyltetraprole, (3.031) florylpicoxamid, (4.005) pencycuron, (4.007) thiophanate-methyl, (4.012) 4-(2-bromo-4-fluorophenyl)-N-(2,6-difluorophenyl)-1,3-dimethyl-1H-pyrazol-5-amine, (4.015) 4-(2-bromo- 4-fluorophenyl)-N-(2-chloro-6-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine, (5.003) captan, (5.004) chlorothalonil, (5.010), dithianon, (5.011) dodine, (5.012) folpet, (5.013) mancozeb, (5.015) metiram, (5.018) propineb, (6.002) isotianil, (7.001) cyprodinil, (7.005) pyrimethanil, (12.003) metalaxyl, (12.004) metalaxyl-M (mefenoxam), (13.001) fludioxonil, (13.002) iprodione, (13.004) proquinazid, (13.005) quinoxyfen, (14.001) fluazinam, (14.002) meptyldinocap, (15.008) cyflufenamid, (15.010) cyprosulfamide, (15.011) flutianil, (15.012) fosetyl-aluminium, (15.016) metrafenone, (15.027) pyriofenone (chlazafenone), (15.047) 3-(4,4-difluoro-3,3-dimethyl-3,4-dihydroisoquinolin-1-yl)quinolone, (15.048) 4-amino-5-fluoropyrimidin-2-ol (tautomeric form: 4-amino-5-fluoropyrimidin-2(1H)-one), (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.062) 5-fluoro-4-imino-3-methyl-1-[(4-methylphenyl)sulfonyl]-3,4-dihydropyrimidin-2(1H)-one, (15.063) aminopyrifen, (15.064) (N'-[2-chloro-4-(2-fluorophenoxy)-5-methylphenyl]-N-ethyl-N-methylimidoformamide), (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051), (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.002) *Bacillus pumilus*, in particular strain QST2808 (available as SONATA® from Bayer CropScience LP, US, having Accession No. NRRL B-30087 and described in U.S. Pat. No. 6,245,551); (17.003) *Bacillus pumilus*, in particular strain GB34 (available as Yield Shield® from Bayer AG, DE); (17.008) *Bacillus subtilis* strain GB03 (available as Kodiak® from Bayer AG, DE); (17.009) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); (17.011) *Bacillus licheniformis*, in particular strain SB3086 (available as EcoGuard™ Biofungicide and Green Releaf from Novozymes); (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is even more preferably selected from:

(1.002) difenoconazole, (1.004) fenhexamid, (1.010) imazalil, (1.012) ipconazole, (1.018) prothioconazole, (1.020) spiroxamine, (1.021) tebuconazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.055) mefentrifluconazole, (1.059) 5-(4-chlorobenzyl)-2-(chloromethyl)-2-methyl-1-(1H-1,2,4-triazol-1-ylmethyl)cyclopentanol, (1.062) fluoxy¬tio¬conazole, (1.067) N'-(2,5-dimethyl-4-{3-[(1,1,2,2-tetrafluoroethyl)sulfanyl]¬phenoxy}phenyl)-N-ethyl-N-methyl¬imido¬formamide, (1.081) ipfentrifluconazole, (1.082) 2-[6-(4-bromophenoxy)-2-(trifluoromethyl)-3-pyridyl]-1-(1,2,4-triazol-1-yl)propan-2-ol and (1.092) methyl 2-[2-chloro-4-(4-chlorophenoxy)phenyl]-2-hydroxy-3-(1,2,4-triazol-1-yl)propanoate (2.001) benzovindiflupyr, (2.002) bixafen, (2.003) boscalid, (2.005) fluopyram, (2.007) fluxapyroxad, (2.017) penflufen, (2.018) penthiopyrad, (2.019) pydiflumetofen, (2.021) sedaxane, (2.028) inpyrfluxam, (2.030) fluindapyr, (2.038) isoflucypram, (3.003) azoxystrobin, (3.012) fluoxastrobin, (3.016) picoxystrobin, (3.017) pyraclostrobin, (3.020) trifloxystrobin, (3.025) fenpicoxamid, (3.026) 2-{2-[(2,5-dimethylphenoxy)methyl]phenyl}-2-methoxy-N-methylacetamide, (3.030) metyltetraprole, (3.031) florylpicoxamid, (4.005) pencycuron, (4.007) thiophanate-methyl, (4.012) 4-(2-bromo-4-fluorophenyl)-N-(2,6-difluoro-phenyl)-1,3-dimethyl-1H-pyrazol-5-amine, (4.015) 4-(2-bromo-4-fluorophenyl)-N-(2-chloro-6-fluoro-phenyl)-1,3-dimethyl-1H-pyrazol-5-amine, (4.025) N-(4-chloro-2,6-difluorophenyl)-4-(2-chloro-4-fluoro-phenyl)-1,3-dimethyl-1H-pyrazol-5-amine, (5.003) captan, (5.004) chlorothalonil, (5.010), dithianon, (5.012) folpet, (5.013) mancozeb, (5.015) metiram, (5.018) propineb, (6.002) isotianil, (7.005) pyrimethanil, (12.003) metalaxyl, (12.004) metalaxyl-M (mefenoxam), (13.001) fludioxonil, (13.004) proquinazid, (13.005) quinoxyfen, (14.001) fluazinam, (14.002) meptyldinocap, (15.008) cyflufenamid, (15.012) fosetyl-aluminium, (15.016) metrafenone, (15.027) pyriofenone (chlazafenone), (15.043) fluoxa-piprolin, (15.047) 3-(4,4-difluoro-3,3-dimethyl-3,4-dihydroisoquinolin-1-yl)quinolone, (15.048) 4-amino-5-fluoropyrimidin-2-ol (tautomeric form: 4-amino-5-fluoropyrimidin-2(1H)-one), (15.052) 5-fluoro-2-[(4-fluorobenzyl)oxy]pyrimidin-4-amine, (15.062) 5-fluoro-4-imino-3-methyl-1-[(4-methylphenyl)sulfonyl]-3,4-dihydropyrimidin-2(1H)-one, (15.064) (N'-[2-chloro-4-(2-fluorophenoxy)-5-methylphenyl]-N-ethyl-N-methylimidoformamide), (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051), (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is likewise even more preferably selected from:

(1.002) difenoconazole, (1.004) fenhexamid, (1.010) imazalil, (1.012) ipconazole, (1.018) prothioconazole, (1.020) spiroxamine, (1.021) tebuconazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.055) mefentrifluconazole, (1.059) 5-(4-chlorobenzyl)-2-(chloromethyl)-2-methyl-1-(1H-1,2,4-triazol-1-ylmethyl)cyclopentanol, (1.081) ipfentrifluconazole, (1.082) 2-[6-(4-bromophenoxy)-2-(trifluoromethyl)-3-pyridyl]-1-(1,2,4-triazol-1-yl)propan-2-ol and (1.092) methyl 2-[2-chloro-4-(4-chlorophenoxy)phenyl]-2-hydroxy-3-(1,2,4-triazol-1-yl) propanoate (2.001) benzovindiflupyr, (2.002) bixafen, (2.003) boscalid, (2.005) fluopyram, (2.007) fluxapyroxad, (2.017) penflufen, (2.018) penthiopyrad, (2.019) pydiflumetofen, (2.021) sedaxane, (2.028) inpyrfluxam, (2.030) fluindapyr, (2.038) isoflucypram, (3.003) azoxystrobin, (3.012) fluoxastrobin, (3.016) picoxystrobin, (3.017) pyraclostrobin, (3.020) trifloxystrobin, (3.025) fenpicoxamid, (3.026) 2-{2-[(2,5-dimethylphenoxy)methyl]phenyl}-2-methoxy-N-methylacetamide, (3.030) metyltetraprole, (3.031) florylpicoxamid, (4.005) pencycuron, (4.007) thiophanate-methyl, (4.012) 4-(2-bromo-4-fluorophenyl)-N-(2,6-difluoro-phenyl)-1,3-dimethyl-1H-pyrazol-5-amine, (4.015) 4-(2-bromo-4-fluorophenyl)-N-(2-chloro-6-fluoro-phenyl)-1,3-dimethyl-1H-pyrazol-5-amine, (4.025) N-(4-chloro-2,6-difluorophenyl)-4-(2-chloro-4-fluoro-phenyl)-1,3-dimethyl-1H-pyrazol-5-amine, (5.003) captan, (5.004) chlorothalonil, (5.010), dithianon, (5.012) folpet, (5.013) mancozeb, (5.015) metiram, (5.018) propineb, (6.002) isotianil, (7.005) pyrimethanil, (12.003) metalaxyl, (12.004) metalaxyl-M (mefenoxam), (13.001) fludioxonil, (13.004) proquinazid, (13.005) quinoxyfen, (14.001) fluazinam, (14.002) meptyldinocap, (15.008) cyflufenamid, (15.012) fosetyl-aluminium, (15.016) metrafenone, (15.027) pyriofenone (chlazafenone), (15.047) 3-(4,4-difluoro-3,3-dimethyl-3,4-dihydroisoquinolin-1-yl)quinolone, (15.048) 4-amino-5-fluoropyrimidin-2-ol (tautomeric form: 4-amino-5-fluoropyrimidin-2(1H)-one), (15.052) 5-fluoro-2-[(4-fluorobenzyl)oxy]pyrimidin-4-amine, (15.062) 5-fluoro-4-imino-3-methyl-1-[(4-methyl-phenyl)sulfonyl]-3,4-dihydropyrimidin-2(1H)-one, (15.064) (N'-[2-chloro-4-(2-fluorophenoxy)-5-methylphenyl]-N-ethyl-N-methylimidoformamide), (16.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051), (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is most preferably selected from:

(1.002) difenoconazole, (1.018) prothioconazole, (1.020) spiroxamine, (1.021) tebuconazole, (1.055) mefentrifluconazole, (1.062) fluoxy¬tio¬conazole, (1.067) N'-(2,5-dimethyl-4-{3-[(1,1,2,2-tetrafluoro¬ethyl)sulfanyl]¬phenoxy}phenyl)-N-ethyl-N-methyl¬imido¬formamide (2.002) bixafen, (2.005) fluopyram, (2.028) inpyrfluxam, (2.038) isoflucypram, (3.020) trifloxystrobin, (3.025) fenpicoxamid, (5.003) captan, (5.010) dithianon, (5.012) folpet, (5.013) mancozeb, (5.018) propineb, (6.002) isotianil, (7.005) pyrimethanil, (13.001) fludioxonil, (13.004) proquinazid, (13.005) quinoxyfen, (15.012) fosetyl-aluminium, (15.016) metrafenone, (15.043) fluoxa¬piprolin and (15.064) (N'-[2-chloro-4-(2-fluorophenoxy)-5-methylphenyl]-N-ethyl-N-methylimidoformamide), (17.001) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051), (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Compound (B) is likewise most preferably selected from:

(1.002) difenoconazole, (1.018) prothioconazole, (1.020) spiroxamine, (1.021) tebuconazole, (1.055) mefentrifluconazole (2.002) bixafen, (2.005) fluopyram, (2.028) inpyrfluxam, (2.038) isoflucypram, (3.020) trifloxystrobin, (3.025) fenpicoxamid, (5.003) captan, (5.010) dithianon, (5.012) folpet, (5.013) mancozeb, (5.018) propineb, (6.002) isotianil, (7.005) pyrimethanil, (13.001) fludioxonil, (13.004) proquinazid, (13.005) quinoxyfen, (15.012) fosetyl-aluminium, (15.016) metrafenone and (15.064) (N'-[2-chloro-4-(2-fluorophenoxy)-5-methylphenyl]-N-ethyl-N-methylimidoformamide), (17.001) *Bacillus subtilis*, in particular strain QST713/AQ713 (available as SERENADE OPTI or SER- ENADE ASO from Bayer CropScience LP, US, having NRRL Accession No. B21661 and described in U.S. Pat. No. 6,060,051), (17.012) a *Paenibacillus* sp. strain having Accession No. NRRL B-50972 or Accession No. NRRL B-67129 and described in International Patent Publication No. WO 2016/154297, (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

A sample of *Bacillus subtilis* strain QST713 has been deposited with the Agricultural Research Service Culture Collection (NRRL) located at the National Center for Agricultural Utilization Research, Agricultural Research Service, U.S. Department of Agriculture, 1815 North University Street, Peoria, IL 61604, U.S.A., under the Budapest Treaty on Mar. 7, 1997, and has been assigned Accession Number NRRL B-21661.

A sample of a *Paenibacillus* sp. strain has been deposited with the NRRL located at the National Center for Agricultural Utilization Research, Agricultural Research Service, U.S. Department of Agriculture, 1815 North University Street, Peoria, IL 61604, U.S.A., under the Budapest Treaty on Aug. 28, 2014, and has been assigned Accession Number NRRL B-50972. A sample of the *Paenibacillus* sp. strain derived from *Paenibacillus* sp. strain NRRL B-50972 that demonstrates a stable colony morphology has been deposited with the NRRL located at the National Center for Agricultural Utilization Research, Agricultural Research Service, U.S. Department of Agriculture, 1815 North University Street, Peoria, IL 61604, U.S.A., under the Budapest Treaty on Sep. 1, 2015 and has been assigned Accession Number NRRL B-67129.

Access to these deposits will be available during the pendency of this application to persons determined by the Commissioner of Patents and Trademarks to be entitled thereto under 37 C.F.R. § 1.14 and 35 U.S.C. § 122. Upon issuance, the Applicant will make the deposit available to the public consistent with all of the requirements of 37 C.F.R. § 1.801-1.809. These deposits will be maintained in the NRRL, which is a public depository, for a period of 30 years, or at least 5 years after the most recent request for a sample of the deposit, or for the effective life of the patent, whichever is longer, and will be replaced if it becomes nonviable during that period.

The compound combinations according to the invention may comprise 1, 2 or even more compounds (B). Preferably, the compound combinations according to the invention comprise 1 or 2 compound(s) (B).

In case two or more compound(s) (B) are present, those compounds may be selected from different groups (1) to (18). For example, if one compound (B) is selected from group (1), the further compound(s) (B) may be selected from groups (2) to (18).

Preferred compound combinations are selected from group (G1-1) consisting of the following mixtures:

(I-052)+(1.001), (I-052)+(1.002), (I-052)+(1.003), (I-052)+(1.004), (I-052)+(1.005), (I-052)+(1.006), (I-052)+(1.007), (I-052)+(1.008), (I-052)+(1.009), (I-052)+(1.010), (I-052)+(1.011), (I-052)+(1.012), (I-052)+(1.013), (I-052)+(1.014), (I-052)+(1.015), (I-052)+(1.016), (I-052)+(1.017), (I-052)+(1.018), (I-052)+(1.019), (I-052)+(1.020), (I-052)+(1.021), (I-052)+(1.022), (I-052)+(1.023), (I-052)+(1.024), (I-052)+(1.025), (I-052)+(1.026), (I-052)+(1.027), (I-052)+(1.028), (I-052)+(1.029), (I-052)+(1.030), (I-052)+(1.031), (I-052)+(1.032), (I-052)+(1.033), (I-052)+(1.034), (I-052)+(1.035), (I-052)+(1.036), (I-052)+(1.037), (I-052)+(1.038), (I-052)+(1.039), (I-052)+(1.040), (I-052)+(1.041), (I-052)+(1.042), (I-052)+(1.043), (I-052)+(1.044), (I-052)+(1.045), (I-052)+(1.046), (I-052)+(1.047), (I-052)+(1.048), (I-052)+(1.049), (I-052)+(1.050), (I-052)+(1.051), (I-052)+(1.052), (I-052)+(1.053), (I-052)+(1.054), (I-052)+(1.055), (I-052)+(1.056), (I-052)+(1.057), (I-052)+(1.058), (I-052)+(1.059), (I-052)+(1.060), (I-052)+(1.061), (I-052)+(1.062), (I-052)+(1.063), (I-052)+(1.064), (I-052)+(1.065), (I-052)+(1.066), (I-052)+(1.067), (I-052)+(1.068), (I-052)+(1.069), (I-052)+(1.070), (I-052)+(1.071), (I-052)+(1.072), (I-052)+(1.073), (I-052)+(1.074), (I-052)+(1.075), (I-052)+(1.076), (I-052)+(1.077), (I-052)+(1.078), (I-052)+(1.079), (I-052)+(1.080), (I-052)+(1.081), (I-052)+(1.082), (I-052)+(1.083), (I-052)+(1.084), (I-052)+(1.085), (I-052)+(1.086), (I-052)+(1.087), (I-052)+(1.088), (I-052)+(1.089), (I-052)+(1.090), (I-052)+(1.091), (I-052)+(1.092), (I-052)+(2.001), (I-052)+(2.002), (I-052)+(2.003), (I-052)+(2.004), (I-052)+(2.005), (I-052)+(2.006), (I-052)+(2.007), (I-052)+(2.008), (I-052)+(2.009), (I-052)+(2.010), (I-052)+(2.011), (I-052)+(2.012), (I-052)+(2.013), (I-052)+(2.014), (I-052)+(2.015), (I-052)+(2.016), (I-052)+(2.017), (I-052)+(2.018), (I-052)+(2.019), (I-052)+(2.020), (I-052)+(2.021), (I-052)+(2.022), (I-052)+(2.023), (I-052)+(2.024), (I-052)+(2.025), (I-052)+(2.026), (I-052)+(2.027), (I-052)+(2.028), (I-052)+(2.029), (I-052)+(2.030), (I-052)+(2.031), (I-052)+(2.032), (I-052)+(2.033), (I-052)+(2.034), (I-052)+(2.035), (I-052)+(2.036), (I-052)+(2.037), (I-052)+(2.038), (I-052)+(2.039), (I-052)+(2.040), (I-052)+(2.041), (I-052)+(2.042), (I-052)+(2.043), (I-052)+(2.044), (I-052)+(2.045), (I-052)+(2.046), (I-052)+(2.047), (I-052)+(2.048), (I-052)+(2.049), (I-052)+(2.050), (I-052)+(2.051), (I-052)+(2.052), (I-052)+(2.053), (I-052)+(2.054), (I-052)+(2.055), (I-052)+(2.056), (I-052)+(2.057), (I-052)+(2.058), (I-052)+(2.059), (I-052)+(2.060), (I-052)+(3.001), (I-052)+(3.002), (I-052)+(3.003), (I-052)+(3.004), (I-052)+(3.005), (I-052)+(3.006), (I-052)+(3.007), (I-052)+(3.008), (I-052)+(3.009), (I-052)+(3.010), (I-052)+(3.011), (I-052)+(3.012), (I-052)+(3.013), (I-052)+(3.014), (I-052)+(3.015), (I-052)+(3.016), (I-052)+(3.017), (I-052)+(3.018), (I-052)+(3.019), (I-052)+(3.020), (I-052)+(3.021), (I-052)+(3.022), (I-052)+(3.023), (I-052)+(3.024), (I-052)+(3.025), (I-052)+(3.026), (I-052)+(3.027), (I-052)+(3.028), (I-052)+(3.029), (I-052)+(3.030), (I-052)+(3.031), (I-052)+(3.032), (I-052)+(4.001), (I-052)+(4.002), (I-052)+(4.003), (I-052)+(4.004), (I-052)+(4.005), (I-052)+(4.006), (I-052)+(4.007), (I-052)+(4.008), (I-052)+(4.009), (I-052)+(4.010), (I-052)+(4.011), (I-052)+(4.012), (I-052)+(4.013), (I-052)+(4.014), (I-052)+(4.015), (I-052)+(4.016), (I-052)+(4.017), (I-052)+(4.018), (I-052)+(4.019), (I-052)+(4.020), (I-052)+(4.021), (I-052)+(4.022), (I-052)+(4.023), (I-052)+(4.024), (I-052)+(4.025), (I-052)+(4.026), (I-052)+(5.001), (I-052)+(5.002), (I-052)+(5.003), (I-052)+(5.004), (I-052)+(5.005), (I-052)+(5.006), (I-052)+(5.007), (I-052)+(5.008), (I-052)+(5.009), (I-052)+(5.010), (I-052)+(5.011), (I-052)+(5.012), (I-052)+(5.013), (I-052)+(5.014), (I-052)+(5.015), (I-052)+(5.016), (I-052)+(5.017), (I-052)+(5.018), (I-052)+(5.019), (I-052)+(5.020), (I-052)+(5.021), (I-052)+(5.022), (I-052)+(5.023), (I-052)+(6.001), (I-052)+(6.002), (I-052)+(6.003), (I-052)+(6.004), (I-052)+(7.001), (I-052)+(7.002), (I-052)+(7.003), (I-052)+(7.004), (I-052)+(7.005), (I-052)+(7.006), (I-052)+(8.001), (I-052)+(9.001), (I-052)+(9.002), (I-052)+(9.003), (I-052)+(9.004), (I-052)+(9.005), (I-052)+(9.006), (I-052)+(9.007), (I-052)+(9.008), (I-052)+(9.009), (I-052)+(10.001), (I-052)+(10.002), (I-052)+(10.003), (I-052)+(11.001), (I-052)+(11.002), (I-052)+(12.001), (I-052)+(12.002), (I-052)+(12.003), (I-052)+(12.004), (I-052)+(13.001), (I-052)+(13.002), (I-052)+(13.003), (I-052)+(13.004), (I-052)+(13.005), (I-052)+(13.006), (I-052)+(14.001), (I-052)+(14.002), (I-052)+(15.001), (I-052)+(15.002), (I-052)+(15.003), (I-052)+(15.004), (I-052)+(15.005), (I-052)+(15.006), (I-052)+(15.007), (I-052)+(15.008), (I-052)+(15.009), (I-052)+(15.010), (I-052)+(15.011), (I-052)+(15.012), (I-052)+(15.013), (I-052)+(15.014), (I-052)+(15.015), (I-052)+(15.016), (I-052)+(15.017), (I-052)+(15.018), (I-052)+(15.019), (I-052)+(15.020), (I-052)+(15.021), (I-052)+(15.022), (I-052)+(15.023), (I-052)+(15.024), (I-052)+(15.025), (I-052)+(15.026), (I-052)+(15.027), (I-052)+(15.028), (I-052)+(15.029), (I-052)+(15.030), (I-052)+(15.031), (I-052)+(15.032), (I-052)+(15.033), (I-052)+(15.034), (I-052)+(15.035), (I-052)+(15.036), (I-052)+(15.037), (I-052)+(15.038), (I-052)+(15.039), (I-052)+(15.040), (I-052)+(15.041), (I-052)+(15.042), (I-052)+(15.043), (I-052)+(15.044), (I-052)+(15.045), (I-052)+(15.046), (I-052)+(15.047), (I-052)+(15.048), (I-052)+(15.049), (I-052)+(15.050), (I-052)+(15.051), (I-052)+(15.052), (I-052)+(15.053), (I-052)+(15.054), (I-052)+(15.055), (I-052)+(15.056), (I-052)+(15.057), (I-052)+(15.058), (I-052)+(15.059), (I-052)+(15.060), (I-052)+(15.061), (I-052)+(15.062), (I-052)+(15.063), (I-052)+(15.064), (I-052)+(15.065), (I-052)+(15.066), (I-052)+(15.067), (I-052)+(15.068), (I-052)+(15.069), (I-052)+(15.070), (I-052)+(15.071), (I-052)+(15.072), (I-052)+(15.073), (I-052)+(15.074), (I-052)+(15.075), (I-052)+(15.076), (I-052)+(15.077), (I-052)+(15.078), (I-052)+(15.079), (I-052)+(15.080), (I-052)+(15.081), (I-052)+(15.082), (I-052)+(15.083), (I-052)+(15.084), (I-052)+(15.085), (I-052)+(15.086), (I-052)+(15.087), (I-052)+(15.088), (I-052)+(15.089), (I-052)+(15.090), (I-052)+(15.091), (I-052)+(15.092), (I-052)+(15.093), (I-052)+(15.094), (I-052)+(15.095), (I-052)+(15.096), (I-052)+(15.097), (I-052)+(15.098), (I-052)+(15.099), (I-052)+(15.100), (I-052)+(15.101), (I-052)+(15.102), (I-052)+(15.103), (I-052)+(15.104), (I-052)+(15.105), (I-052)+(15.106), (I-052)+(15.107), (I-052)+(15.108), (I-052)+(15.109), (I-052)+(15.110), (I-052)+(15.111), (I-052)+(15.112), (I-052)+(15.113), (I-052)+(15.114), (I-052)+(15.115), (I-052)+(15.116), (I-052)+(15.117), (I-052)+(15.118), (I-052)+(15.119), (I-052)+(15.120), (I-052)+(15.121), (I-052)+(15.122), (I-052)+(15.123), (I-052)+(15.124), (I-052)+(15.125), (I-052)+(15.126), (I-052)+(15.127), (I-052)+(15.128), (I-052)+(16.001), (I-052)+(16.002), (I-052)+(16.003), (I-052)+(16.004), (I-052)+(16.005), (I-052)+(16.006), (I-052)+(16.007), (I-052)+(16.008), (I-052)+(17.001), (I-052)+(17.002), (I-052)+(17.003), (I-052)+(17.004), (I-052)+(17.005), (I-052)+(17.006), (I-052)+(17.007), (I-052)+(17.008), (I-052)+(17.009), (I-052)+(17.010), (I-052)+(17.011), (I-052)+(17.012) and (I-052)+(18.001).

Preferred compound combinations are selected from group (G1) consisting of the following mixtures: (I-052)+(1.001), (I-052)+(1.002), (I-052)+(1.003), (I-052)+(1.004), (I-052)+(1.005), (I-052)+(1.006), (I-052)+(1.007), (I-052)+(1.008), (I-052)+(1.009), (I-052)+(1.010), (I-052)+(1.011), (I-052)+(1.012), (I-052)+(1.013), (I-052)+(1.014), (I-052)+(1.015), (I-052)+(1.016), (I-052)+(1.017), (I-052)+(1.018), (I-052)+(1.019), (I-052)+(1.020), (I-052)+(1.021), (I-052)+(1.022), (I-052)+(1.023), (I-052)+(1.024), (I-052)+(1.025), (I-052)+(1.026), (I-052)+(1.027), (I-052)+(1.028), (I-052)+(1.029), (I-052)+(1.030), (I-052)+(1.031), (I-052)+(1.032), (I-052)+(1.033), (I-052)+(1.034), (I-052)+(1.035), (I-052)+(1.036), (I-052)+(1.037), (I-052)+(1.038), (I-052)+(1.039), (I-052)+(1.040), (I-052)+(1.041), (I-052)+(1.042), (I-052)+(1.043), (I-052)+(1.044), (I-052)+(1.045), (I-052)+(1.046), (I-052)+(1.047), (I-052)+(1.048), (I-052)+(1.049), (I-052)+(1.050), (I-052)+(1.051), (I-052)+(1.052), (I-052)+(1.053), (I-052)+(1.054), (I-052)+(1.055), (I-052)+(1.056), (I-052)+(1.057), (I-052)+(1.058), (I-052)+(1.059), (I-052)+(1.060), (I-052)+(1.061), (I-052)+(1.062), (I-052)+(1.063), (I-052)+(1.064), (I-052)+(1.065), (I-052)+(1.066), (I-052)+(1.067), (I-052)+(1.068), (I-052)+(1.069), (I-052)+(1.070), (I-052)+(1.071), (I-052)+(1.072), (I-052)+(1.073), (I-052)+(1.074), (I-052)+(1.075), (I-052)+(1.076), (I-052)+(1.077), (I-052)+(1.078), (I-052)+(1.079), (I-052)+(1.080), (I-052)+(1.081), (I-052)+(1.082), (I-052)+(1.083), (I-052)+(1.084), (I-052)+(1.085), (I-052)+(1.086), (I-052)+(1.087), (I-052)+(1.088), (I-052)+(1.089), (I-052)+(1.090), (I-052)+(1.091), (I-052)+(1.092), (I-052)+(2.001), (I-052)+(2.002), (I-052)+(2.003), (I-052)+(2.004), (I-052)+(2.005), (I-052)+(2.006), (I-052)+(2.007), (I-052)+(2.008), (I-052)+(2.009), (I-052)+(2.010), (I-052)+(2.011), (I-052)+(2.012), (I-052)+(2.013), (I-052)+(2.014), (I-052)+(2.015), (I-052)+(2.016), (I-052)+(2.017), (I-052)+(2.018), (I-052)+(2.019), (I-052)+(2.020), (I-052)+(2.021), (I-052)+(2.022), (I-052)+(2.023), (I-052)+(2.024), (I-052)+(2.025), (I-052)+(2.026), (I-052)+(2.027), (I-052)+(2.028), (I-052)+(2.029), (I-052)+(2.030), (I-052)+(2.031), (I-052)+(2.032), (I-052)+(2.033), (I-052)+(2.034), (I-052)+(2.035), (I-052)+(2.036), (I-052)+(2.037), (I-052)+(2.038), (I-052)+(2.039), (I-052)+(2.040), (I-052)+(2.041), (I-052)+(2.042), (I-052)+(2.043), (I-052)+(2.044), (I-052)+(2.045), (I-052)+(2.046), (I-052)+(2.047), (I-052)+(2.048), (I-052)+(2.049), (I-052)+(2.050), (I-052)+(2.051), (I-052)+(2.052), (I-052)+(2.053), (I-052)+(2.054), (I-052)+(2.055), (I-052)+(2.056), (I-052)+(2.057), (I-052)+(2.058), (I-052)+(2.059), (I-052)+(3.001), (I-052)+(3.002), (I-052)+(3.003), (I-052)+(3.004), (I-052)+(3.005), (I-052)+(3.006), (I-052)+(3.007), (I-052)+(3.008), (I-052)+(3.009), (I-052)+(3.010), (I-052)+(3.011), (I-052)+(3.012), (I-052)+(3.013), (I-052)+(3.014), (I-052)+(3.015), (I-052)+(3.016), (I-052)+(3.017), (I-052)+(3.018), (I-052)+(3.019), (I-052)+(3.020), (I-052)+(3.021), (I-052)+(3.022), (I-052)+(3.023), (I-052)+(3.024), (I-052)+(3.025), (I-052)+(3.026), (I-052)+(3.027), (I-052)+(3.028), (I-052)+(3.029), (I-052)+(3.030), (I-052)+(3.031), (I-052)+(4.001), (I-052)+(4.002), (I-052)+(4.003), (I-052)+(4.004), (I-052)+(4.005), (I-052)+(4.006), (I-052)+(4.007), (I-052)+(4.008), (I-052)+(4.009), (I-052)+(4.010), (I-052)+(4.011), (I-052)+(4.012), (I-052)+(4.013), (I-052)+(4.014), (I-052)+(4.015), (I-052)+(4.016), (I-052)+(4.017), (I-052)+(4.018), (I-052)+(4.019), (I-052)+(4.020), (I-052)+(4.021), (I-052)+(4.022), (I-052)+(4.023), (I-052)+(4.024), (I-052)+(4.025), (I-052)+(4.026), (I-052)+(5.001), (I-052)+(5.002), (I-052)+(5.003), (I-052)+(5.004), (I-052)+(5.005), (I-052)+(5.006), (I-052)+(5.007), (I-052)+(5.008), (I-052)+(5.009), (I-052)+(5.010), (I-052)+(5.011), (I-052)+(5.012), (I-052)+(5.013), (I-052)+(5.014), (I-052)+(5.015), (I-052)+(5.016), (I-052)+(5.017), (I-052)+(5.018), (I-052)+(5.019), (I-052)+(5.020), (I-052)+(5.021), (I-052)+(5.022), (I-052)+(5.023), (I-052)+(6.001), (I-052)+(6.002), (I-052)+(6.003), (I-052)+(6.004), (I-052)+(7.001), (I-052)+(7.002), (I-052)+(7.003), (I-052)+(7.004), (I-052)+(7.005), (I-052)+(7.006), (I-052)+(8.001), (I-052)+(9.001), (I-052)+(9.002), (I-052)+(9.003), (I-052)+(9.004), (I-052)+(9.005), (I-052)+(9.006), (I-052)+(9.007), (I-052)+(9.008), (I-052)+(9.009), (I-052)+(10.001), (I-052)+(10.002), (I-052)+(10.003), (I-052)+(11.001), (I-052)+(11.002), (I-052)+(12.001), (I-052)+(12.002), (I-052)+(12.003), (I-052)+(12.004), (I-052)+(13.001), (I-052)+(13.002), (I-052)+(13.003), (I-052)+(13.004), (I-052)+(13.005), (I-052)+(13.006), (I-052)+(14.001), (I-052)+(14.002), (I-052)+(15.001), (I-052)+(15.002), (I-052)+(15.003), (I-052)+(15.004), (I-052)+(15.005), (I-052)+(15.006), (I-052)+(15.007), (I-052)+(15.008), (I-052)+(15.009), (I-052)+(15.010), (I-052)+(15.011), (I-052)+(15.012), (I-052)+(15.013), (I-052)+(15.014), (I-052)+(15.015), (I-052)+(15.016), (I-052)+(15.017), (I-052)+(15.018), (I-052)+(15.019), (I-052)+(15.020), (I-052)+(15.021), (I-052)+(15.022), (I-052)+(15.023), (I-052)+(15.024), (I-052)+(15.025), (I-052)+(15.026), (I-052)+(15.027), (I-052)+(15.028), (I-052)+(15.029), (I-052)+(15.030), (I-052)+(15.031), (I-052)+(15.032), (I-052)+(15.033), (I-052)+(15.034), (I-052)+(15.035), (I-052)+(15.036), (I-052)+(15.037), (I-052)+(15.038), (I-052)+(15.039), (I-052)+(15.040), (I-052)+(15.041), (I-052)+(15.042), (I-052)+(15.043), (I-052)+(15.044), (I-052)+(15.045), (I-052)+(15.046), (I-052)+(15.047), (I-052)+(15.048), (I-052)+(15.049), (I-052)+(15.050), (I-052)+(15.051), (I-052)+(15.052), (I-052)+(15.053), (I-052)+(15.054), (I-052)+(15.055), (I-052)+(15.056), (I-052)+(15.057), (I-052)+(15.058), (I-052)+(15.059), (I-052)+(15.060), (I-052)+(15.061), (I-052)+(15.062), (I-052)+(15.063), (I-052)+(15.064), (I-052)+(15.065), (I-052)+(15.066), (I-052)+(15.067), (I-052)+(15.068), (I-052)+(15.069), (I-052)+(15.070), (I-052)+(15.071), (I-052)+(15.072), (I-052)+(15.073), (I-052)+(15.074), (I-052)+(15.075), (I-052)+(15.076), (I-052)+(15.077), (I-052)+(15.078), (I-052)+(15.079), (I-052)+(15.080), (I-052)+(15.081), (I-052)+(15.082), (I-052)+(15.083), (I-052)+(15.084), (I-052)+(15.085), (I-052)+(15.086), (I-052)+(15.087), (I-052)+(15.088), (I-052)+(15.089), (I-052)+(15.090), (I-052)+(15.091), (I-052)+(15.092), (I-052)+(15.093), (I-052)+(15.094), (I-052)+(15.095), (I-052)+(15.096), (I-052)+(15.097), (I-052)+(15.098), (I-052)+(15.099), (I-052)+(15.100), (I-052)+(15.101), (I-052)+(15.102), (I-052)+(15.103), (I-052)+(15.104), (I-052)+(15.105), (I-052)+(15.106), (I-052)+(15.107), (I-052)+(15.108), (I-052)+(15.109), (I-052)+(15.110), (I-052)+(15.111), (I-052)+(15.112), (I-052)+(15.113), (I-052)+(15.114), (I-052)+(15.115), (I-052)+(15.116), (I-052)+(15.117), (I-052)+(15.118), (I-052)+(15.119), (I-052)+(15.120), (I-052)+(15.121), (I-052)+(15.122), (I-052)+(15.123), (I-052)+(15.124), (I-052)+(15.125), (I-052)+(15.126), (I-052)+(15.127), (I-052)+(16.001), (I-052)+(16.002), (I-052)+(16.003), (I-052)+(16.004), (I-052)+(16.005), (I-052)+(16.006), (I-052)+(16.007), (I-052)+(16.008), (I-052)+(17.001), (I-052)+(17.002), (I-052)+(17.003), (I-052)+(17.004), (I-052)+(17.005), (I-052)+(17.006), (I-052)+(17.007), (I-052)+(17.008), (I-052)+(17.009), (I-052)+(17.010), (I-052)+(17.011), (I-052)+(17.012) and (I-052)+(18.001).

Also preferred compound combinations are selected from group (G2-1) consisting of the following mixtures: (I-130)+(1.001), (I-130)+(1.002), (I-130)+(1.003), (I-130)+(1.004), (I-130)+(1.005), (I-130)+(1.006), (I-130)+(1.007), (I-130)+(1.008), (I-130)+(1.009), (I-130)+(1.010), (I-130)+(1.011), (I-130)+(1.012), (I-130)+(1.013), (I-130)+(1.014), (I-130)+(1.015), (I-130)+(1.016), (I-130)+(1.017), (I-130)+(1.018), (I-130)+(1.019), (I-130)+(1.020), (I-130)+(1.021), (I-130)+(1.022), (I-130)+(1.023), (I-130)+(1.024), (I-130)+(1.025), (I-130)+(1.026), (I-130)+(1.027), (I-130)+(1.028), (I-130)+(1.029), (I-130)+(1.030), (I-130)+(1.031), (I-130)+(1.032), (I-130)+(1.033), (I-130)+(1.034), (I-130)+(1.035), (I-130)+(1.036), (I-130)+(1.037), (I-130)+(1.038), (I-130)+(1.039), (I-130)+(1.040), (I-130)+(1.041), (I-130)+(1.042), (I-130)+(1.043), (I-130)+(1.044), (I-130)+(1.045), (I-130)+(1.046), (I-130)+(1.047), (I-130)+(1.048), (I-130)+(1.049), (I-130)+(1.050), (I-130)+(1.051), (I-130)+(1.052), (I-130)+(1.053), (I-130)+(1.054), (I-130)+(1.055), (I-130)+(1.056), (I-130)+(1.057), (I-130)+(1.058), (I-130)+(1.059), (I-130)+(1.060), (I-130)+(1.061), (I-130)+(1.062), (I-130)+(1.063), (I-130)+(1.064), (I-130)+(1.065), (I-130)+(1.066), (I-130)+(1.067), (I-130)+(1.068), (I-130)+(1.069), (I-130)+(1.070), (I-130)+(1.071), (I-130)+(1.072), (I-130)+(1.073), (I-130)+(1.074), (I-130)+(1.075), (I-130)+(1.076), (I-130)+(1.077), (I-130)+(1.078), (I-130)+(1.079), (I-130)+(1.080), (I-130)+(1.081), (I-130)+(1.082), (I-130)+(1.083), (I-130)+(1.084), (I-130)+(1.085), (I-130)+(1.086), (I-130)+(1.087), (I-130)+(1.088), (I-130)+(1.089), (I-130)+(1.090), (I-130)+(1.091), (I-130)+(1.092), (I-130)+(2.001), (I-130)+(2.002), (I-130)+(2.003), (I-130)+(2.004), (I-130)+(2.005), (I-130)+(2.006), (I-130)+(2.007), (I-130)+(2.008), (I-130)+(2.009), (I-130)+(2.010), (I-130)+(2.011), (I-130)+(2.012), (I-130)+(2.013), (I-130)+(2.014), (I-130)+(2.015), (I-130)+(2.016), (I-130)+(2.017), (I-130)+(2.018), (I-130)+(2.019), (I-130)+(2.020), (I-130)+(2.021), (I-130)+(2.022), (I-130)+(2.023), (I-130)+(2.024), (I-130)+(2.025), (I-130)+(2.026), (I-130)+(2.027), (I-130)+(2.028), (I-130)+(2.029), (I-130)+(2.030), (I-130)+(2.031), (I-130)+(2.032), (I-130)+(2.033), (I-130)+(2.034), (I-130)+(2.035), (I-130)+(2.036), (I-130)+(2.037), (I-130)+(2.038), (I-130)+(2.039), (I-130)+(2.040), (I-130)+(2.041), (I-130)+(2.042), (I-130)+(2.043), (I-130)+(2.044), (I-130)+(2.045), (I-130)+(2.046), (I-130)+(2.047), (I-130)+(2.048), (I-130)+(2.049), (I-130)+(2.050), (I-130)+(2.051), (I-130)+(2.052), (I-130)+(2.053), (I-130)+(2.054), (I-130)+(2.055), (I-130)+(2.056), (I-130)+(2.057), (I-130)+(2.058), (I-130)+(2.059), (I-130)+(2.060), (I-130)+(3.001), (I-130)+(3.002), (I-130)+(3.003), (I-130)+(3.004), (I-130)+(3.005), (I-130)+(3.006), (I-130)+(3.007), (I-130)+(3.008), (I-130)+(3.009), (I-130)+(3.010), (I-130)+(3.011), (I-130)+(3.012), (I-130)+(3.013), (I-130)+(3.014), (I-130)+(3.015), (I-130)+(3.016), (I-130)+(3.017), (I-130)+(3.018), (I-130)+(3.019), (I-130)+(3.020), (I-130)+(3.021), (I-130)+(3.022), (I-130)+(3.023), (I-130)+(3.024), (I-130)+(3.025), (I-130)+(3.026), (I-130)+(3.027), (I-130)+(3.028), (I-130)+(3.029), (I-130)+(3.030), (I-130)+(3.031), (I-130)+(3.032), (I-130)+(4.001), (I-130)+(4.002), (I-130)+(4.003), (I-130)+(4.004), (I-130)+(4.005), (I-130)+(4.006), (I-130)+(4.007), (I-130)+(4.008), (I-130)+(4.009), (I-130)+(4.010), (I-130)+(4.011), (I-130)+(4.012), (I-130)+(4.013), (I-130)+(4.014), (I-130)+(4.015), (I-130)+(4.016), (I-130)+(4.017), (I-130)+(4.018), (I-130)+(4.019), (I-130)+(4.020), (I-130)+(4.021), (I-130)+(4.022), (I-130)+(4.023), (I-130)+(4.024), (I-130)+(4.025), (I-130)+(4.026), (I-130)+(5.001), (I-130)+(5.002), (I-130)+(5.003), (I-130)+(5.004), (I-130)+(5.005), (I-130)+(5.006), (I-130)+(5.007), (I-130)+(5.008), (I-130)+(5.009), (I-130)+(5.010), (I-130)+(5.011), (I-130)+(5.012), (I-130)+(5.013), (I-130)+(5.014), (I-130)+(5.015), (I-130)+(5.016), (I-130)+(5.017), (I-130)+(5.018), (I-130)+(5.019), (I-130)+(5.020), (I-130)+(5.021), (I-130)+(5.022), (I-130)+(5.023), (I-130)+(6.001), (I-130)+(6.002), (I-130)+(6.003), (I-130)+(6.004), (I-130)+(7.001), (I-130)+(7.002), (I-130)+(7.003), (I-130)+(7.004), (I-130)+(7.005), (I-130)+(7.006), (I-130)+(8.001), (I-130)+(9.001), (I-130)+(9.002), (I-130)+(9.003), (I-130)+(9.004), (I-130)+(9.005), (I-130)+(9.006), (I-130)+(9.007), (I-130)+(9.008), (I-130)+(9.009), (I-130)+(10.001), (I-130)+(10.002), (I-130)+(10.003), (I-130)+(11.001), (I-130)+(11.002), (I-130)+(12.001), (I-130)+(12.002), (I-130)+(12.003), (I-130)+(12.004), (I-130)+(13.001), (I-130)+(13.002), (I-130)+(13.003), (I-130)+(13.004), (I-130)+(13.005), (I-130)+(13.006), (I-130)+(14.001), (I-130)+(14.002), (I-130)+(15.001), (I-130)+(15.002), (I-130)+(15.003), (I-130)+(15.004), (I-130)+(15.005), (I-130)+(15.006), (I-130)+(15.007), (I-130)+(15.008), (I-130)+(15.009), (I-130)+(15.010), (I-130)+(15.011), (I-130)+(15.012), (I-130)+(15.013), (I-130)+(15.014), (I-130)+(15.015), (I-130)+(15.016), (I-130)+(15.017), (I-130)+(15.018), (I-130)+(15.019), (I-130)+(15.020), (I-130)+(15.021), (I-130)+(15.022), (I-130)+(15.023), (I-130)+(15.024), (I-130)+(15.025), (I-130)+(15.026), (I-130)+(15.027), (I-130)+(15.028), (I-130)+(15.029), (I-130)+(15.030), (I-130)+(15.031), (I-130)+(15.032), (I-130)+(15.033), (I-130)+(15.034), (I-130)+(15.035), (I-130)+(15.036), (I-130)+(15.037), (I-130)+(15.038), (I-130)+(15.039), (I-130)+(15.040), (I-130)+(15.041), (I-130)+(15.042), (I-130)+(15.043), (I-130)+(15.044), (I-130)+(15.045), (I-130)+(15.046), (I-130)+(15.047), (I-130)+(15.048), (I-130)+(15.049), (I-130)+(15.050), (I-130)+(15.051), (I-130)+(15.052), (I-130)+(15.053), (I-130)+(15.054), (I-130)+(15.055), (I-130)+(15.056), (I-130)+(15.057), (I-130)+(15.058), (I-130)+(15.059), (I-130)+(15.060), (I-130)+(15.061), (I-130)+(15.062), (I-130)+(15.063), (I-130)+(15.064), (I-130)+(15.065), (I-130)+(15.066), (I-130)+(15.067), (I-130)+(15.068), (I-130)+(15.069), (I-130)+(15.070), (I-130)+(15.071), (I-130)+(15.072), (I-130)+(15.073), (I-130)+(15.074), (I-130)+(15.075), (I-130)+(15.076), (I-130)+(15.077), (I-130)+(15.078), (I-130)+(15.079), (I-130)+(15.080), (I-130)+(15.081), (I-130)+(15.082), (I-130)+(15.083), (I-130)+(15.084), (I-130)+(15.085), (I-130)+(15.086), (I-130)+(15.087), (I-130)+(15.088), (I-130)+(15.089), (I-130)+(15.090), (I-130)+(15.091), (I-130)+(15.092), (I-130)+(15.093), (I-130)+(15.094), (I-130)+(15.095), (I-130)+(15.096), (I-130)+(15.097), (I-130)+(15.098), (I-130)+(15.099), (I-130)+(15.100), (I-130)+(15.101), (I-130)+(15.102), (I-130)+(15.103), (I-130)+(15.104), (I-130)+(15.105), (I-130)+(15.106), (I-130)+(15.107), (I-130)+(15.108), (I-130)+(15.109), (I-130)+(15.110), (I-130)+(15.111), (I-130)+(15.112), (I-130)+(15.113), (I-130)+(15.114), (I-130)+(15.115), (I-130)+(15.116), (I-130)+(15.117), (I-130)+(15.118), (I-130)+(15.119), (I-130)+(15.120), (I-130)+(15.121), (I-130)+(15.122), (I-130)+(15.123), (I-130)+(15.124), (I-130)+(15.125), (I-130)+(15.126), (I-130)+(15.127), (I-130)+(15.128), (I-130)+(16.001), (I-130)+(16.002), (I-130)+(16.003), (I-130)+(16.004), (I-130)+(16.005), (I-130)+(16.006), (I-130)+(16.007), (I-130)+(16.008), (I-130)+(17.001), (I-130)+(17.002), (I-130)+(17.003), (I-130)+(17.004), (I-130)+(17.005), (I-130)+(17.006), (I-130)+(17.007), (I-130)+(17.008), (I-130)+(17.009), (I-130)+(17.010), (I-130)+(17.011), (I-130)+(17.012) and (I-130)+(18.001).

Also preferred compound combinations are selected from group (G2) consisting of the following mixtures: (I-130)+(1.001), (I-130)+(1.002), (I-130)+(1.003), (I-130)+(1.004), (I-130)+(1.005), (I-130)+(1.006), (I-130)+(1.007), (I-130)+(1.008), (I-130)+(1.009), (I-130)+(1.010), (I-130)+(1.011), (I-130)+(1.012), (I-130)+(1.013), (I-130)+(1.014), (I-130)+(1.015), (I-130)+(1.016), (I-130)+(1.017), (I-130)+(1.018), (I-130)+(1.019), (I-130)+(1.020), (I-130)+(1.021), (I-130)+(1.022), (I-130)+(1.023), (I-130)+(1.024), (I-130)+(1.025), (I-130)+(1.026), (I-130)+(1.027), (I-130)+(1.028), (I-130)+(1.029), (I-130)+(1.030), (I-130)+(1.031), (I-130)+(1.032), (I-130)+(1.033), (I-130)+(1.034), (I-130)+(1.035), (I-130)+(1.036), (I-130)+(1.037), (I-130)+(1.038), (I-130)+(1.039), (I-130)+(1.040), (I-130)+(1.041), (I-130)+(1.042), (I-130)+(1.043), (I-130)+(1.044), (I-130)+(1.045), (I-130)+(1.046), (I-130)+(1.047), (I-130)+(1.048), (I-130)+(1.049), (I-130)+(1.050), (I-130)+(1.051), (I-130)+(1.052), (I-130)+(1.053), (I-130)+(1.054), (I-130)+(1.055), (I-130)+(1.056), (I-130)+(1.057), (I-130)+(1.058), (I-130)+(1.059), (I-130)+(1.060), (I-130)+(1.061), (I-130)+(1.062), (I-130)+(1.063), (I-130)+(1.064), (I-130)+(1.065), (I-130)+(1.066), (I-130)+(1.067), (I-130)+(1.068), (I-130)+(1.069), (I-130)+(1.070), (I-130)+(1.071), (I-130)+(1.072), (I-130)+(1.073), (I-130)+(1.074), (I-130)+(1.075), (I-130)+(1.076), (I-130)+(1.077), (I-130)+(1.078), (I-130)+(1.079), (I-130)+(1.080), (I-130)+(1.081), (I-130)+(1.082), (I-130)+(1.083), (I-130)+(1.084), (I-130)+(1.085), (I-130)+(1.086), (I-130)+(1.087), (I-130)+(1.088), (I-130)+(1.089), (I-130)+(1.090), (I-130)+(1.091), (I-130)+(1.092), (I-130)+(2.001), (I-130)+(2.002), (I-130)+(2.003), (I-130)+(2.004), (I-130)+(2.005), (I-130)+(2.006), (I-130)+(2.007), (I-130)+(2.008), (I-130)+(2.009), (I-130)+(2.010), (I-130)+(2.011), (I-130)+(2.012), (I-130)+(2.013), (I-130)+(2.014), (I-130)+(2.015), (I-130)+(2.016), (I-130)+(2.017), (I-130)+(2.018), (I-130)+(2.019), (I-130)+(2.020), (I-130)+(2.021), (I-130)+(2.022), (I-130)+(2.023), (I-130)+(2.024), (I-130)+(2.025), (I-130)+(2.026), (I-130)+(2.027), (I-130)+(2.028), (I-130)+(2.029), (I-130)+(2.030), (I-130)+(2.031), (I-130)+(2.032), (I-130)+(2.033), (I-130)+(2.034), (I-130)+(2.035), (I-130)+(2.036), (I-130)+(2.037), (I-130)+(2.038), (I-130)+(2.039), (I-130)+(2.040), (I-130)+(2.041), (I-130)+(2.042), (I-130)+(2.043), (I-130)+(2.044), (I-130)+(2.045), (I-130)+(2.046), (I-130)+(2.047), (I-130)+(2.048), (I-130)+(2.049), (I-130)+(2.050), (I-130)+(2.051), (I-130)+(2.052), (I-130)+(2.053), (I-130)+(2.054), (I-130)+(2.055), (I-130)+(2.056), (I-130)+(2.057), (I-130)+(2.058), (I-130)+(2.059), (I-130)+(3.001), (I-130)+(3.002), (I-130)+(3.003), (I-130)+(3.004), (I-130)+(3.005), (I-130)+(3.006), (I-130)+(3.007), (I-130)+(3.008), (I-130)+(3.009), (I-130)+(3.010), (I-130)+(3.011), (I-130)+(3.012), (I-130)+(3.013), (I-130)+(3.014), (I-130)+(3.015), (I-130)+(3.016), (I-130)+(3.017), (I-130)+(3.018), (I-130)+(3.019), (I-130)+(3.020), (I-130)+(3.021), (I-130)+(3.022), (I-130)+(3.023), (I-130)+(3.024), (I-130)+(3.025), (I-130)+(3.026), (I-130)+(3.027), (I-130)+(3.028), (I-130)+(3.029), (I-130)+(3.030), (I-130)+(3.031), (I-130)+(4.001), (I-130)+(4.002), (I-130)+(4.003), (I-130)+(4.004), (I-130)+(4.005), (I-130)+(4.006), (I-130)+(4.007), (I-130)+(4.008), (I-130)+(4.009), (I-130)+(4.010), (I-130)+(4.011), (I-130)+(4.012), (I-130)+(4.013), (I-130)+(4.014), (I-130)+(4.015), (I-130)+(4.016), (I-130)+(4.017), (I-130)+(4.018), (I-130)+(4.019), (I-130)+(4.020), (I-130)+(4.021), (I-130)+(4.022), (I-130)+(4.023), (I-130)+(4.024), (I-130)+(4.025), (I-130)+(4.026), (I-130)+(5.001), (I-130)+(5.002), (I-130)+(5.003), (I-130)+(5.004), (I-130)+(5.005), (I-130)+(5.006), (I-130)+(5.007), (I-130)+(5.008), (I-130)+(5.009), (I-130)+(5.010), (I-130)+(5.011), (I-130)+(5.012), (I-130)+(5.013), (I-130)+(5.014), (I-130)+(5.015), (I-130)+(5.016), (I-130)+(5.017), (I-130)+(5.018), (I-130)+(5.019), (I-130)+(5.020), (I-130)+(5.021), (I-130)+(5.022), (I-130)+(5.023), (I-130)+(6.001), (I-130)+(6.002), (I-130)+(6.003), (I-130)+(6.004), (I-130)+(7.001), (I-130)+(7.002), (I-130)+(7.003), (I-130)+(7.004), (I-130)+(7.005), (I-130)+(7.006), (I-130)+(8.001), (I-130)+(9.001), (I-130)+(9.002), (I-130)+(9.003), (I-130)+(9.004), (I-130)+(9.005), (I-130)+(9.006), (I-130)+(9.007), (I-130)+(9.008), (I-130)+(9.009), (I-130)+(10.001), (I-130)+(10.002), (I-130)+(10.003), (I-130)+(11.001), (I-130)+(11.002), (I-130)+(12.001), (I-130)+(12.002), (I-130)+(12.003), (I-130)+(12.004), (I-130)+(13.001), (I-130)+(13.002), (I-130)+(13.003), (I-130)+(13.004), (I-130)+(13.005), (I-130)+(13.006), (I-130)+(14.001), (I-130)+(14.002), (I-130)+(15.001), (I-130)+(15.002), (I-130)+(15.003), (I-130)+(15.004), (I-130)+(15.005), (I-130)+(15.006), (I-130)+(15.007), (I-130)+(15.008), (I-130)+(15.009), (I-130)+(15.010), (I-130)+(15.011), (I-130)+(15.012), (I-130)+(15.013), (I-130)+(15.014), (I-130)+(15.015), (I-130)+(15.016), (I-130)+(15.017), (I-130)+(15.018), (I-130)+(15.019), (I-130)+(15.020), (I-130)+(15.021), (I-130)+(15.022), (I-130)+(15.023), (I-130)+(15.024), (I-130)+(15.025), (I-130)+(15.026), (I-130)+(15.027), (I-130)+(15.028), (I-130)+(15.029), (I-130)+(15.030), (I-130)+(15.031), (I-130)+(15.032), (I-130)+(15.033), (I-130)+(15.034), (I-130)+(15.035), (I-130)+(15.036), (I-130)+(15.037), (I-130)+(15.038), (I-130)+(15.039), (I-130)+(15.040), (I-130)+(15.041), (I-130)+(15.042), (I-130)+(15.043), (I-130)+(15.044), (I-130)+(15.045), (I-130)+(15.046), (I-130)+(15.047), (I-130)+(15.048), (I-130)+(15.049), (I-130)+(15.050), (I-130)+(15.051), (I-130)+(15.052), (I-130)+(15.053), (I-130)+(15.054), (I-130)+(15.055), (I-130)+(15.056), (I-130)+(15.057), (I-130)+(15.058), (I-130)+(15.059), (I-130)+(15.060), (I-130)+(15.061), (I-130)+(15.062), (I-130)+(15.063), (I-130)+(15.064), (I-130)+(15.065), (I-130)+(15.066), (I-130)+(15.067), (I-130)+(15.068), (I-130)+(15.069), (I-130)+(15.070), (I-130)+(15.071), (I-130)+(15.072), (I-130)+(15.073), (I-130)+(15.074), (I-130)+(15.075), (I-130)+(15.076), (I-130)+(15.077), (I-130)+(15.078), (I-130)+(15.079), (I-130)+(15.080), (I-130)+(15.081), (I-130)+(15.082), (I-130)+(15.083), (I-130)+(15.084), (I-130)+(15.085), (I-130)+(15.086), (I-130)+(15.087), (I-130)+(15.088), (I-130)+(15.089), (I-130)+(15.090), (I-130)+(15.091), (I-130)+(15.092), (I-130)+(15.093), (I-130)+(15.094), (I-130)+(15.095), (I-130)+(15.096), (I-130)+(15.097), (I-130)+(15.098), (I-130)+(15.099), (I-130)+(15.100), (I-130)+(15.101), (I-130)+(15.102), (I-130)+(15.103), (I-130)+(15.104), (I-130)+(15.105), (I-130)+(15.106), (I-130)+(15.107), (I-130)+(15.108), (I-130)+(15.109), (I-130)+(15.110), (I-130)+(15.111), (I-130)+(15.112), (I-130)+(15.113), (I-130)+(15.114), (I-130)+(15.115), (I-130)+(15.116), (I-130)+(15.117), (I-130)+(15.118), (I-130)+(15.119), (I-130)+(15.120), (I-130)+(15.121), (I-130)+(15.122), (I-130)+(15.123), (I-130)+(15.124), (I-130)+(15.125), (I-130)+(15.126), (I-130)+(15.127), (I-130)+(16.001), (I-130)+(16.002), (I-130)+(16.003), (I-130)+(16.004), (I-130)+(16.005), (I-130)+(16.006), (I-130)+(16.007), (I-130)+(16.008), (I-130)+(17.001), (I-130)+(17.002), (I-130)+(17.003), (I-130)+(17.004), (I-130)+(17.005), (I-130)+(17.006), (I-130)+(17.007), (I-130)+(17.008), (I-130)+(17.009), (I-130)+(17.010), (I-130)+(17.011), (I-130)+(17.012) and (I-130)+(18.001).

Also preferred compound combinations are selected from group (G3-1) consisting of the following mixtures:

(I-300)+(1.001), (I-300)+(1.002), (I-300)+(1.003), (I-300)+(1.004), (I-300)+(1.005), (I-300)+(1.006), (I-300)+(1.007), (I-300)+(1.008), (I-300)+(1.009), (I-300)+(1.010), (I-300)+(1.011), (I-300)+(1.012), (I-300)+(1.013), (I-300)+(1.014), (I-300)+(1.015), (I-300)+(1.016), (I-300)+(1.017), (I-300)+(1.018), (I-300)+(1.019), (I-300)+(1.020), (I-300)+(1.021), (I-300)+(1.022), (I-300)+(1.023), (I-300)+(1.024), (I-300)+(1.025), (I-300)+(1.026), (I-300)+(1.027), (I-300)+(1.028), (I-300)+(1.029), (I-300)+(1.030), (I-300)+(1.031), (I-300)+(1.032), (I-300)+(1.033), (I-300)+(1.034), (I-300)+(1.035), (I-300)+(1.036), (I-300)+(1.037), (I-300)+(1.038), (I-300)+(1.039), (I-300)+(1.040), (I-300)+(1.041), (I-300)+(1.042), (I-300)+(1.043), (I-300)+(1.044), (I-300)+(1.045), (I-300)+(1.046), (I-300)+(1.047), (I-300)+(1.048), (I-300)+(1.049), (I-300)+(1.050), (I-300)+(1.051), (I-300)+(1.052), (I-300)+(1.053), (I-300)+(1.054), (I-300)+(1.055), (I-300)+(1.056), (I-300)+(1.057), (I-300)+(1.058), (I-300)+(1.059), (I-300)+(1.060), (I-300)+(1.061), (I-300)+(1.062), (I-300)+(1.063), (I-300)+(1.064), (I-300)+(1.065), (I-300)+(1.066), (I-300)+(1.067), (I-300)+(1.068), (I-300)+(1.069), (I-300)+(1.070), (I-300)+(1.071), (I-300)+(1.072), (I-300)+(1.073), (I-300)+(1.074), (I-300)+(1.075), (I-300)+(1.076), (I-300)+(1.077), (I-300)+(1.078), (I-300)+(1.079), (I-300)+(1.080), (I-300)+(1.081), (I-300)+(1.082), (I-300)+(1.083), (I-300)+(1.084), (I-300)+(1.085), (I-300)+(1.086), (I-300)+(1.087), (I-300)+(1.088), (I-300)+(1.089), (I-300)+(1.090), (I-300)+(1.091), (I-300)+(1.092), (I-300)+(2.001), (I-300)+(2.002), (I-300)+(2.003), (I-300)+(2.004), (I-300)+(2.005), (I-300)+(2.006), (I-300)+(2.007), (I-300)+(2.008), (I-300)+(2.009), (I-300)+(2.010), (I-300)+(2.011), (I-300)+(2.012), (I-300)+(2.013), (I-300)+(2.014), (I-300)+(2.015), (I-300)+(2.016), (I-300)+(2.017), (I-300)+(2.018), (I-300)+(2.019), (I-300)+(2.020), (I-300)+(2.021), (I-300)+(2.022), (I-300)+(2.023), (I-300)+(2.024), (I-300)+(2.025), (I-300)+(2.026), (I-300)+(2.027), (I-300)+(2.028), (I-300)+(2.029), (I-300)+(2.030), (I-300)+(2.031), (I-300)+(2.032), (I-300)+(2.033), (I-300)+(2.034), (I-300)+(2.035), (I-300)+(2.036), (I-300)+(2.037), (I-300)+(2.038), (I-300)+(2.039), (I-300)+(2.040), (I-300)+(2.041), (I-300)+(2.042), (I-300)+(2.043), (I-300)+(2.044), (I-300)+(2.045), (I-300)+(2.046), (I-300)+(2.047), (I-300)+(2.048), (I-300)+(2.049), (I-300)+(2.050), (I-300)+(2.051), (I-300)+(2.052), (I-300)+(2.053), (I-300)+(2.054), (I-300)+(2.055), (I-300)+(2.056), (I-300)+(2.057), (I-300)+(2.058), (I-300)+(2.059), (I-300)+(2.060), (I-300)+(3.001), (I-300)+(3.002), (I-300)+(3.003), (I-300)+(3.004), (I-300)+(3.005), (I-300)+(3.006), (I-300)+(3.007), (I-300)+(3.008), (I-300)+(3.009), (I-300)+(3.010), (I-300)+(3.011), (I-300)+(3.012), (I-300)+(3.013), (I-300)+(3.014), (I-300)+(3.015), (I-300)+(3.016), (I-300)+(3.017), (I-300)+(3.018), (I-300)+(3.019), (I-300)+(3.020), (I-300)+(3.021), (I-300)+(3.022), (I-300)+(3.023), (I-300)+(3.024), (I-300)+(3.025), (I-300)+(3.026), (I-300)+(3.027), (I-300)+(3.028), (I-300)+(3.029), (I-300)+(3.030), (I-300)+(3.031), (I-300)+(3.032), (I-300)+(4.001), (I-300)+(4.002), (I-300)+(4.003), (I-300)+(4.004), (I-300)+(4.005), (I-300)+(4.006), (I-300)+(4.007), (I-300)+(4.008), (I-300)+(4.009), (I-300)+(4.010), (I-300)+(4.011), (I-300)+(4.012), (I-300)+(4.013), (I-300)+(4.014), (I-300)+(4.015), (I-300)+(4.016), (I-300)+(4.017), (I-300)+(4.018), (I-300)+(4.019), (I-300)+(4.020), (I-300)+(4.021), (I-300)+(4.022), (I-300)+(4.023), (I-300)+(4.024), (I-300)+(4.025), (I-300)+(4.026), (I-300)+(5.001), (I-300)+(5.002), (I-300)+(5.003), (I-300)+(5.004), (I-300)+(5.005), (I-300)+(5.006), (I-300)+(5.007), (I-300)+(5.008), (I-300)+(5.009), (I-300)+(5.010), (I-300)+(5.011), (I-300)+(5.012), (I-300)+(5.013), (I-300)+(5.014), (I-300)+(5.015), (I-300)+(5.016), (I-300)+(5.017), (I-300)+(5.018), (I-300)+(5.019), (I-300)+(5.020), (I-300)+(5.021), (I-300)+(5.022), (I-300)+(5.023), (I-300)+(6.001), (I-300)+(6.002), (I-300)+(6.003), (I-300)+(6.004), (I-300)+(7.001), (I-300)+(7.002), (I-300)+(7.003), (I-300)+(7.004), (I-300)+(7.005), (I-300)+(7.006), (I-300)+(8.001), (I-300)+(9.001), (I-300)+(9.002), (I-300)+(9.003), (I-300)+(9.004), (I-300)+(9.005), (I-300)+(9.006), (I-300)+(9.007), (I-300)+(9.008), (I-300)+(9.009), (I-300)+(10.001), (I-300)+(10.002), (I-300)+(10.003), (I-300)+(11.001), (I-300)+(11.002), (I-300)+(12.001), (I-300)+(12.002), (I-300)+(12.003), (I-300)+(12.004), (I-300)+(13.001), (I-300)+(13.002), (I-300)+(13.003), (I-300)+(13.004), (I-300)+(13.005), (I-300)+(13.006), (I-300)+(14.001), (I-300)+(14.002), (I-300)+(15.001), (I-300)+(15.002), (I-300)+(15.003), (I-300)+(15.004), (I-300)+(15.005), (I-300)+(15.006), (I-300)+(15.007), (I-300)+(15.008), (I-300)+(15.009), (I-300)+(15.010), (I-300)+(15.011), (I-300)+(15.012), (I-300)+(15.013), (I-300)+(15.014), (I-300)+(15.015), (I-300)+(15.016), (I-300)+(15.017), (I-300)+(15.018), (I-300)+(15.019), (I-300)+(15.020), (I-300)+(15.021), (I-300)+(15.022), (I-300)+(15.023), (I-300)+(15.024), (I-300)+(15.025), (I-300)+(15.026), (I-300)+(15.027), (I-300)+(15.028), (I-300)+(15.029), (I-300)+(15.030), (I-300)+(15.031), (I-300)+(15.032), (I-300)+(15.033), (I-300)+(15.034), (I-300)+(15.035), (I-300)+(15.036), (I-300)+(15.037), (I-300)+(15.038), (I-300)+(15.039), (I-300)+(15.040), (I-300)+(15.041), (I-300)+(15.042), (I-300)+(15.043), (I-300)+(15.044), (I-300)+(15.045), (I-300)+(15.046), (I-300)+(15.047), (I-300)+(15.048), (I-300)+(15.049), (I-300)+(15.050), (I-300)+(15.051), (I-300)+(15.052), (I-300)+(15.053), (I-300)+(15.054), (I-300)+(15.055), (I-300)+(15.056), (I-300)+(15.057), (I-300)+(15.058), (I-300)+(15.059), (I-300)+(15.060), (I-300)+(15.061), (I-300)+(15.062), (I-300)+(15.063), (I-300)+(15.064), (I-300)+(15.065), (I-300)+(15.066), (I-300)+(15.067), (I-300)+(15.068), (I-300)+(15.069), (I-300)+(15.070), (I-300)+(15.071), (I-300)+(15.072), (I-300)+(15.073), (I-300)+(15.074), (I-300)+(15.075), (I-300)+(15.076), (I-300)+(15.077), (I-300)+(15.078), (I-300)+(15.079), (I-300)+(15.080), (I-300)+(15.081), (I-300)+(15.082), (I-300)+(15.083), (I-300)+(15.084), (I-300)+(15.085), (I-300)+(15.086), (I-300)+(15.087), (I-300)+(15.088), (I-300)+(15.089), (I-300)+(15.090), (I-300)+(15.091), (I-300)+(15.092), (I-300)+(15.093), (I-300)+(15.094), (I-300)+(15.095), (I-300)+(15.096), (I-300)+(15.097), (I-300)+(15.098), (I-300)+(15.099), (I-300)+(15.100), (I-300)+(15.101), (I-300)+(15.102), (I-300)+(15.103), (I-300)+(15.104), (I-300)+(15.105), (I-300)+(15.106), (I-300)+(15.107), (I-300)+(15.108), (I-300)+(15.109), (I-300)+(15.110), (I-300)+(15.111), (I-300)+(15.112), (I-300)+(15.113), (I-300)+(15.114), (I-300)+(15.115), (I-300)+(15.116), (I-300)+(15.117), (I-300)+(15.118), (I-300)+(15.119), (I-300)+(15.120), (I-300)+(15.121), (I-300)+(15.122), (I-300)+(15.123), (I-300)+(15.124), (I-300)+(15.125), (I-300)+(15.126), (I-300)+(15.127), (I-300)+(15.128), (I-300)+(16.001), (I-300)+(16.002), (I-300)+(16.003), (I-300)+(16.004), (I-300)+(16.005), (I-300)+(16.006), (I-300)+(16.007), (I-300)+(16.008), (I-300)+(17.001), (I-300)+(17.002), (I-300)+(17.003), (I-300)+(17.004), (I-300)+(17.005), (I-300)+(17.006), (I-300)+(17.007), (I-300)+(17.008), (I-300)+(17.009), (I-300)+(17.010), (I-300)+(17.011), (I-300)+(17.012) and (I-300)+(18.001).

Also preferred compound combinations are selected from group (G3) consisting of the following mixtures:

(I-300)+(1.001), (I-300)+(1.002), (I-300)+(1.003), (I-300)+(1.004), (I-300)+(1.005), (I-300)+(1.006), (I-300)+(1.007), (I-300)+(1.008), (I-300)+(1.009), (I-300)+(1.010), (I-300)+(1.011), (I-300)+(1.012), (I-300)+(1.013), (I-300)+(1.014), (I-300)+(1.015), (I-300)+(1.016), (I-300)+(1.017), (I-300)+(1.018), (I-300)+(1.019), (I-300)+(1.020), (I-300)+(1.021), (I-300)+(1.022), (I-300)+(1.023), (I-300)+(1.024), (I-300)+(1.025), (I-300)+(1.026), (I-300)+(1.027), (I-300)+(1.028), (I-300)+(1.029), (I-300)+(1.030), (I-300)+(1.031), (I-300)+(1.032), (I-300)+(1.033), (I-300)+(1.034), (I-300)+(1.035), (I-300)+(1.036), (I-300)+(1.037), (I-300)+(1.038), (I-300)+(1.039), (I-300)+(1.040), (I-300)+(1.041), (I-300)+(1.042), (I-300)+(1.043), (I-300)+(1.044), (I-300)+(1.045), (I-300)+(1.046), (I-300)+(1.047), (I-300)+(1.048), (I-300)+(1.049), (I-300)+(1.050), (I-300)+(1.051), (I-300)+(1.052), (I-300)+(1.053), (I-300)+(1.054), (I-300)+(1.055), (I-300)+(1.056), (I-300)+(1.057), (I-300)+(1.058), (I-300)+(1.059), (I-300)+(1.060), (I-300)+(1.061), (I-300)+(1.062), (I-300)+(1.063), (I-300)+(1.064), (I-300)+(1.065), (I-300)+(1.066), (I-300)+(1.067), (I-300)+(1.068), (I-300)+(1.069), (I-300)+(1.070), (I-300)+(1.071), (I-300)+(1.072), (I-300)+(1.073), (I-300)+(1.074), (I-300)+(1.075), (I-300)+(1.076), (I-300)+(1.077), (I-300)+(1.078), (I-300)+(1.079), (I-300)+(1.080), (I-300)+(1.081), (I-300)+(1.082), (I-300)+(1.083), (I-300)+(1.084), (I-300)+(1.085), (I-300)+(1.086), (I-300)+(1.087), (I-300)+(1.088), (I-300)+(1.089), (I-300)+(1.090), (I-300)+(1.091), (I-300)+(1.092), (I-300)+(2.001), (I-300)+(2.002), (I-300)+(2.003), (I-300)+(2.004), (I-300)+(2.005), (I-300)+(2.006), (I-300)+(2.007), (I-300)+(2.008), (I-300)+(2.009), (I-300)+(2.010), (I-300)+(2.011), (I-300)+(2.012), (I-300)+(2.013), (I-300)+(2.014), (I-300)+(2.015), (I-300)+(2.016), (I-300)+(2.017), (I-300)+(2.018), (I-300)+(2.019), (I-300)+(2.020), (I-300)+(2.021), (I-300)+(2.022), (I-300)+(2.023), (I-300)+(2.024), (I-300)+(2.025), (I-300)+(2.026), (I-300)+(2.027), (I-300)+(2.028), (I-300)+(2.029), (I-300)+(2.030), (I-300)+(2.031), (I-300)+(2.032), (I-300)+(2.033), (I-300)+(2.034), (I-300)+(2.035), (I-300)+(2.036), (I-300)+(2.037), (I-300)+(2.038), (I-300)+(2.039), (I-300)+(2.040), (I-300)+(2.041), (I-300)+(2.042), (I-300)+(2.043), (I-300)+(2.044), (I-300)+(2.045), (I-300)+(2.046), (I-300)+(2.047), (I-300)+(2.048), (I-300)+(2.049), (I-300)+(2.050), (I-300)+(2.051), (I-300)+(2.052), (I-300)+(2.053), (I-300)+(2.054), (I-300)+(2.055), (I-300)+(2.056), (I-300)+(2.057), (I-300)+(2.058), (I-300)+(2.059), (I-300)+(3.001), (I-300)+(3.002), (I-300)+(3.003), (I-300)+(3.004), (I-300)+(3.005), (I-300)+(3.006), (I-300)+(3.007), (I-300)+(3.008), (I-300)+(3.009), (I-300)+(3.010), (I-300)+(3.011), (I-300)+(3.012), (I-300)+(3.013), (I-300)+(3.014), (I-300)+(3.015), (I-300)+(3.016), (I-300)+(3.017), (I-300)+(3.018), (I-300)+(3.019), (I-300)+(3.020), (I-300)+(3.021), (I-300)+(3.022), (I-300)+(3.023), (I-300)+(3.024), (I-300)+(3.025), (I-300)+(3.026), (I-300)+(3.027), (I-300)+(3.028), (I-300)+(3.029), (I-300)+(3.030), (I-300)+(3.031), (I-300)+(4.001), (I-300)+(4.002), (I-300)+(4.003), (I-300)+(4.004), (I-300)+(4.005), (I-300)+(4.006), (I-300)+(4.007), (I-300)+(4.008), (I-300)+(4.009), (I-300)+(4.010), (I-300)+(4.011), (I-300)+(4.012), (I-300)+(4.013), (I-300)+(4.014), (I-300)+(4.015), (I-300)+(4.016), (I-300)+(4.017), (I-300)+(4.018), (I-300)+(4.019), (I-300)+(4.020), (I-300)+(4.021), (I-300)+(4.022), (I-300)+(4.023), (I-300)+(4.024), (I-300)+(4.025), (I-300)+(4.026), (I-300)+(5.001), (I-300)+(5.002), (I-300)+(5.003), (I-300)+(5.004), (I-300)+(5.005), (I-300)+(5.006), (I-300)+(5.007), (I-300)+(5.008), (I-300)+(5.009), (I-300)+(5.010), (I-300)+(5.011), (I-300)+(5.012), (I-300)+(5.013), (I-300)+(5.014), (I-300)+(5.015), (I-300)+(5.016), (I-300)+(5.017), (I-300)+(5.018), (I-300)+(5.019), (I-300)+(5.020), (I-300)+(5.021), (I-300)+(5.022), (I-300)+(5.023), (I-300)+(6.001), (I-300)+(6.002), (I-300)+(6.003), (I-300)+(6.004), (I-300)+(7.001), (I-300)+(7.002), (I-300)+(7.003), (I-300)+(7.004), (I-300)+(7.005), (I-300)+(7.006), (I-300)+(8.001), (I-300)+(9.001), (I-300)+(9.002), (I-300)+(9.003), (I-300)+(9.004), (I-300)+(9.005), (I-300)+(9.006), (I-300)+(9.007), (I-300)+(9.008), (I-300)+(9.009), (I-300)+(10.001), (I-300)+(10.002), (I-300)+(10.003), (I-300)+(11.001), (I-300)+(11.002), (I-300)+(12.001), (I-300)+(12.002), (I-300)+(12.003), (I-300)+(12.004), (I-300)+(13.001), (I-300)+(13.002), (I-300)+(13.003), (I-300)+(13.004), (I-300)+(13.005), (I-300)+(13.006), (I-300)+(14.001), (I-300)+(14.002), (I-300)+(15.001), (I-300)+(15.002), (I-300)+(15.003), (I-300)+(15.004), (I-300)+(15.005), (I-300)+(15.006), (I-300)+(15.007), (I-300)+(15.008), (I-300)+(15.009), (I-300)+(15.010), (I-300)+(15.011), (I-300)+(15.012), (I-300)+(15.013), (I-300)+(15.014), (I-300)+(15.015), (I-300)+(15.016), (I-300)+(15.017), (I-300)+(15.018), (I-300)+(15.019), (I-300)+(15.020), (I-300)+(15.021), (I-300)+(15.022), (I-300)+(15.023), (I-300)+(15.024), (I-300)+(15.025), (I-300)+(15.026), (I-300)+(15.027), (I-300)+(15.028), (I-300)+(15.029), (I-300)+(15.030), (I-300)+(15.031), (I-300)+(15.032), (I-300)+(15.033), (I-300)+(15.034), (I-300)+(15.035), (I-300)+(15.036), (I-300)+(15.037), (I-300)+(15.038), (I-300)+(15.039), (I-300)+(15.040), (I-300)+(15.041), (I-300)+(15.042), (I-300)+(15.043), (I-300)+(15.044), (I-300)+(15.045), (I-300)+(15.046), (I-300)+(15.047), (I-300)+(15.048), (I-300)+(15.049), (I-300)+(15.050), (I-300)+(15.051), (I-300)+(15.052), (I-300)+(15.053), (I-300)+(15.054), (I-300)+(15.055), (I-300)+(15.056), (I-300)+(15.057), (I-300)+(15.058), (I-300)+(15.059), (I-300)+(15.060), (I-300)+(15.061), (I-300)+(15.062), (I-300)+(15.063), (I-300)+(15.064), (I-300)+(15.065), (I-300)+(15.066), (I-300)+(15.067), (I-300)+(15.068), (I-300)+(15.069), (I-300)+(15.070), (I-300)+(15.071), (I-300)+(15.072), (I-300)+(15.073), (I-300)+(15.074), (I-300)+(15.075), (I-300)+(15.076), (I-300)+(15.077), (I-300)+(15.078), (I-300)+(15.079), (I-300)+(15.080), (I-300)+(15.081), (I-300)+(15.082), (I-300)+(15.083), (I-300)+(15.084), (I-300)+(15.085), (I-300)+(15.086), (I-300)+(15.087), (I-300)+(15.088), (I-300)+(15.089), (I-300)+(15.090), (I-300)+(15.091), (I-300)+(15.092), (I-300)+(15.093), (I-300)+(15.094), (I-300)+(15.095), (I-300)+(15.096), (I-300)+(15.097), (I-300)+(15.098), (I-300)+(15.099), (I-300)+(15.100), (I-300)+(15.101), (I-300)+(15.102), (I-300)+(15.103), (I-300)+(15.104), (I-300)+(15.105), (I-300)+(15.106), (I-300)+(15.107), (I-300)+(15.108), (I-300)+(15.109), (I-300)+(15.110), (I-300)+(15.111), (I-300)+(15.112), (I-300)+(15.113), (I-300)+(15.114), (I-300)+(15.115), (I-300)+(15.116), (I-300)+(15.117), (I-300)+(15.118), (I-300)+(15.119), (I-300)+(15.120), (I-300)+(15.121), (I-300)+(15.122), (I-300)+(15.123), (I-300)+(15.124), (I-300)+(15.125), (I-300)+(15.126), (I-300)+(15.127), (I-300)+(16.001), (I-300)+(16.002), (I-300)+(16.003), (I-300)+(16.004), (I-300)+(16.005), (I-300)+(16.006), (I-300)+(16.007), (I-300)+(16.008), (I-300)+(17.001), (I-300)+(17.002), (I-300)+(17.003), (I-300)+(17.004), (I-300)+(17.005), (I-300)+(17.006), (I-300)+(17.007), (I-300)+(17.008), (I-300)+(17.009), (I-300)+(17.010), (I-300)+(17.011), (I-300)+(17.012) and (I-300)+(18.001).

Also preferred compound combinations are selected from group (G4-1) consisting of the following mixtures:

(I-302)+(1.001), (I-302)+(1.002), (I-302)+(1.003), (I-302)+(1.004), (I-302)+(1.005), (I-302)+(1.006), (I-302)+(1.007), (I-302)+(1.008), (I-302)+(1.009), (I-302)+(1.010), (I-302)+(1.011), (I-302)+(1.012), (I-302)+(1.013), (I-302)+(1.014), (I-302)+(1.015), (I-302)+(1.016), (I-302)+(1.017), (I-302)+(1.018), (I-302)+(1.019), (I-302)+(1.020), (I-302)+(1.021), (I-302)+(1.022), (I-302)+(1.023), (I-302)+(1.024), (I-302)+(1.025), (I-302)+(1.026), (I-302)+(1.027), (I-302)+(1.028), (I-302)+(1.029), (I-302)+(1.030), (I-302)+(1.031), (I-302)+(1.032), (I-302)+(1.033), (I-302)+(1.034), (I-302)+(1.035), (I-302)+(1.036), (I-302)+(1.037), (I-302)+(1.038), (I-302)+(1.039), (I-302)+(1.040), (I-302)+(1.041), (I-302)+(1.042), (I-302)+(1.043), (I-302)+(1.044), (I-302)+(1.045), (I-302)+(1.046), (I-302)+(1.047), (I-302)+(1.048), (I-302)+(1.049), (I-302)+(1.050), (I-302)+(1.051), (I-302)+(1.052), (I-302)+(1.053), (I-302)+(1.054), (I-302)+(1.055), (I-302)+(1.056), (I-302)+(1.057), (I-302)+(1.058), (I-302)+(1.059), (I-302)+(1.060), (I-302)+(1.061), (I-302)+(1.062), (I-302)+(1.063), (I-302)+(1.064), (I-302)+(1.065), (I-302)+(1.066), (I-302)+(1.067), (I-302)+(1.068), (I-302)+(1.069), (I-302)+(1.070), (I-302)+(1.071), (I-302)+(1.072), (I-302)+(1.073), (I-302)+(1.074), (I-302)+(1.075), (I-302)+(1.076), (I-302)+(1.077), (I-302)+(1.078), (I-302)+(1.079), (I-302)+(1.080), (I-302)+(1.081), (I-302)+(1.082), (I-302)+(1.083), (I-302)+(1.084), (I-302)+(1.085), (I-302)+(1.086), (I-302)+(1.087), (I-302)+(1.088), (I-302)+(1.089), (I-302)+(1.090), (I-302)+(1.091), (I-302)+(1.092), (I-302)+(2.001), (I-302)+(2.002), (I-302)+(2.003), (I-302)+(2.004), (I-302)+(2.005), (I-302)+(2.006), (I-302)+(2.007), (I-302)+(2.008), (I-302)+(2.009), (I-302)+(2.010), (I-302)+(2.011), (I-302)+(2.012), (I-302)+(2.013), (I-302)+(2.014), (I-302)+(2.015), (I-302)+(2.016), (I-302)+(2.017), (I-302)+(2.018), (I-302)+(2.019), (I-302)+(2.020), (I-302)+(2.021), (I-302)+(2.022), (I-302)+(2.023), (I-302)+(2.024), (I-302)+(2.025), (I-302)+(2.026), (I-302)+(2.027), (I-302)+(2.028), (I-302)+(2.029), (I-302)+(2.030), (I-302)+(2.031), (I-302)+(2.032), (I-302)+(2.033), (I-302)+(2.034), (I-302)+(2.035), (I-302)+(2.036), (I-302)+(2.037), (I-302)+(2.038), (I-302)+(2.039), (I-302)+(2.040), (I-302)+(2.041), (I-302)+(2.042), (I-302)+(2.043), (I-302)+(2.044), (I-302)+(2.045), (I-302)+(2.046), (I-302)+(2.047), (I-302)+(2.048), (I-302)+(2.049), (I-302)+(2.050), (I-302)+(2.051), (I-302)+(2.052), (I-302)+(2.053), (I-302)+(2.054), (I-302)+(2.055), (I-302)+(2.056), (I-302)+(2.057), (I-302)+(2.058), (I-302)+(2.059), (I-302)+(2.060), (I-302)+(3.001), (I-302)+(3.002), (I-302)+(3.003), (I-302)+(3.004), (I-302)+(3.005), (I-302)+(3.006), (I-302)+(3.007), (I-302)+(3.008), (I-302)+(3.009), (I-302)+(3.010), (I-302)+(3.011), (I-302)+(3.012), (I-302)+(3.013), (I-302)+(3.014), (I-302)+(3.015), (I-302)+(3.016), (I-302)+(3.017), (I-302)+(3.018), (I-302)+(3.019), (I-302)+(3.020), (I-302)+(3.021), (I-302)+(3.022), (I-302)+(3.023), (I-302)+(3.024), (I-302)+(3.025), (I-302)+(3.026), (I-302)+(3.027), (I-302)+(3.028), (I-302)+(3.029), (I-302)+(3.030), (I-302)+(3.031), (I-302)+(3.032), (I-302)+(4.001), (I-302)+(4.002), (I-302)+(4.003), (I-302)+(4.004), (I-302)+(4.005), (I-302)+(4.006), (I-302)+(4.007), (I-302)+(4.008), (I-302)+(4.009), (I-302)+(4.010), (I-302)+(4.011), (I-302)+(4.012), (I-302)+(4.013), (I-302)+(4.014), (I-302)+(4.015), (I-302)+(4.016), (I-302)+(4.017), (I-302)+(4.018), (I-302)+(4.019), (I-302)+(4.020), (I-302)+(4.021), (I-302)+(4.022), (I-302)+(4.023), (I-302)+(4.024), (I-302)+(4.025), (I-302)+(4.026), (I-302)+(5.001), (I-302)+(5.002), (I-302)+(5.003), (I-302)+(5.004), (I-302)+(5.005), (I-302)+(5.006), (I-302)+(5.007), (I-302)+(5.008), (I-302)+(5.009), (I-302)+(5.010), (I-302)+(5.011), (I-302)+(5.012), (I-302)+(5.013), (I-302)+(5.014), (I-302)+(5.015), (I-302)+(5.016), (I-302)+(5.017), (I-302)+(5.018), (I-302)+(5.019), (I-302)+(5.020), (I-302)+(5.021), (I-302)+(5.022), (I-302)+(5.023), (I-302)+(6.001), (I-302)+(6.002), (I-302)+(6.003), (I-302)+(6.004), (I-302)+(7.001), (I-302)+(7.002), (I-302)+(7.003), (I-302)+(7.004), (I-302)+(7.005), (I-302)+(7.006), (I-302)+(8.001), (I-302)+(9.001), (I-302)+(9.002), (I-302)+(9.003), (I-302)+(9.004), (I-302)+(9.005), (I-302)+(9.006), (I-302)+(9.007), (I-302)+(9.008), (I-302)+(9.009), (I-302)+(10.001), (I-302)+(10.002), (I-302)+(10.003), (I-302)+(11.001), (I-302)+(11.002), (I-302)+(12.001), (I-302)+(12.002), (I-302)+(12.003), (I-302)+(12.004), (I-302)+(13.001), (I-302)+(13.002), (I-302)+(13.003), (I-302)+(13.004), (I-302)+(13.005), (I-302)+(13.006), (I-302)+(14.001), (I-302)+(14.002), (I-302)+(15.001), (I-302)+(15.002), (I-302)+(15.003), (I-302)+(15.004), (I-302)+(15.005), (I-302)+(15.006), (I-302)+(15.007), (I-302)+(15.008), (I-302)+(15.009), (I-302)+(15.010), (I-302)+(15.011), (I-302)+(15.012), (I-302)+(15.013), (I-302)+(15.014), (I-302)+(15.015), (I-302)+(15.016), (I-302)+(15.017), (I-302)+(15.018), (I-302)+(15.019), (I-302)+(15.020), (I-302)+(15.021), (I-302)+(15.022), (I-302)+(15.023), (I-302)+(15.024), (I-302)+(15.025), (I-302)+(15.026), (I-302)+(15.027), (I-302)+(15.028), (I-302)+(15.029), (I-302)+(15.030), (I-302)+(15.031), (I-302)+(15.032), (I-302)+(15.033), (I-302)+(15.034), (I-302)+(15.035), (I-302)+(15.036), (I-302)+(15.037), (I-302)+(15.038), (I-302)+(15.039), (I-302)+(15.040), (I-302)+(15.041), (I-302)+(15.042), (I-302)+(15.043), (I-302)+(15.044), (I-302)+(15.045), (I-302)+(15.046), (I-302)+(15.047), (I-302)+(15.048), (I-302)+(15.049), (I-302)+(15.050), (I-302)+(15.051), (I-302)+(15.052), (I-302)+(15.053), (I-302)+(15.054), (I-302)+(15.055), (I-302)+(15.056), (I-302)+(15.057), (I-302)+(15.058), (I-302)+(15.059), (I-302)+(15.060), (I-302)+(15.061), (I-302)+(15.062), (I-302)+(15.063), (I-302)+(15.064), (I-302)+(15.065), (I-302)+(15.066), (I-302)+(15.067), (I-302)+(15.068), (I-302)+(15.069), (I-302)+(15.070), (I-302)+(15.071), (I-302)+(15.072), (I-302)+(15.073), (I-302)+(15.074), (I-302)+(15.075), (I-302)+(15.076), (I-302)+(15.077), (I-302)+(15.078), (I-302)+(15.079), (I-302)+(15.080), (I-302)+(15.081), (I-302)+(15.082), (I-302)+(15.083), (I-302)+(15.084), (I-302)+(15.085), (I-302)+(15.086), (I-302)+(15.087), (I-302)+(15.088), (I-302)+(15.089), (I-302)+(15.090), (I-302)+(15.091), (I-302)+(15.092), (I-302)+(15.093), (I-302)+(15.094), (I-302)+(15.095), (I-302)+(15.096), (I-302)+(15.097), (I-302)+(15.098), (I-302)+(15.099), (I-302)+(15.100), (I-302)+(15.101), (I-302)+(15.102), (I-302)+(15.103), (I-302)+(15.104), (I-302)+(15.105), (I-302)+(15.106), (I-302)+(15.107), (I-302)+(15.108), (I-302)+(15.109), (I-302)+(15.110), (I-302)+(15.111), (I-302)+(15.112), (I-302)+(15.113), (I-302)+(15.114), (I-302)+(15.115), (I-302)+(15.116), (I-302)+(15.117), (I-302)+(15.118), (I-302)+(15.119), (I-302)+(15.120), (I-302)+(15.121), (I-302)+(15.122), (I-302)+(15.123), (I-302)+(15.124), (I-302)+(15.125), (I-302)+(15.126), (I-302)+(15.127), (I-302)+(15.128), (I-302)+(16.001), (I-302)+(16.002), (I-302)+(16.003), (I-302)+(16.004), (I-302)+(16.005), (I-302)+(16.006), (I-302)+(16.007), (I-302)+(16.008), (I-302)+(17.001), (I-302)+(17.002), (I-302)+(17.003), (I-302)+(17.004), (I-302)+(17.005), (I-302)+(17.006), (I-302)+(17.007), (I-302)+(17.008), (I-302)+(17.009), (I-302)+(17.010), (I-302)+(17.011), (I-302)+(17.012) and (I-302)+(18.001).

Also preferred compound combinations are selected from group (G4) consisting of the following mixtures:

(I-302)+(1.001), (I-302)+(1.002), (I-302)+(1.003), (I-302)+(1.004), (I-302)+(1.005), (I-302)+(1.006), (I-302)+(1.007), (I-302)+(1.008), (I-302)+(1.009), (I-302)+(1.010), (I-302)+(1.011), (I-302)+(1.012), (I-302)+(1.013), (I-302)+(1.014), (I-302)+(1.015), (I-302)+(1.016), (I-302)+(1.017), (I-302)+(1.018), (I-302)+(1.019), (I-302)+(1.020), (I-302)+(1.021), (I-302)+(1.022), (I-302)+(1.023), (I-302)+(1.024), (I-302)+(1.025), (I-302)+(1.026), (I-302)+(1.027), (I-302)+(1.028), (I-302)+(1.029), (I-302)+(1.030), (I-302)+(1.031), (I-302)+(1.032), (I-302)+(1.033), (I-302)+(1.034), (I-302)+(1.035), (I-302)+(1.036), (I-302)+(1.037), (I-302)+(1.038), (I-302)+(1.039), (I-302)+(1.040), (I-302)+(1.041), (I-302)+(1.042), (I-302)+(1.043), (I-302)+(1.044), (I-302)+(1.045), (I-302)+(1.046), (I-302)+(1.047), (I-302)+(1.048), (I-302)+(1.049), (I-302)+(1.050), (I-302)+(1.051), (I-302)+(1.052), (I-302)+(1.053), (I-302)+(1.054), (I-302)+(1.055), (I-302)+(1.056), (I-302)+(1.057), (I-302)+(1.058), (I-302)+(1.059), (I-302)+(1.060), (I-302)+(1.061), (I-302)+(1.062), (I-302)+(1.063), (I-302)+(1.064), (I-302)+(1.065), (I-302)+(1.066), (I-302)+(1.067), (I-302)+(1.068), (I-302)+(1.069), (I-302)+(1.070), (I-302)+(1.071), (I-302)+(1.072), (I-302)+(1.073), (I-302)+(1.074), (I-302)+(1.075), (I-302)+(1.076), (I-302)+(1.077), (I-302)+(1.078), (I-302)+(1.079), (I-302)+(1.080), (I-302)+(1.081), (I-302)+(1.082), (I-302)+(1.083), (I-302)+(1.084), (I-302)+(1.085), (I-302)+(1.086), (I-302)+(1.087), (I-302)+(1.088), (I-302)+(1.089), (I-302)+(1.090), (I-302)+(1.091), (I-302)+(1.092), (I-302)+(2.001), (I-302)+(2.002), (I-302)+(2.003), (I-302)+(2.004), (I-302)+(2.005), (I-302)+(2.006), (I-302)+(2.007), (I-302)+(2.008), (I-302)+(2.009), (I-302)+(2.010), (I-302)+(2.011), (I-302)+(2.012), (I-302)+(2.013), (I-302)+(2.014), (I-302)+(2.015), (I-302)+(2.016), (I-302)+(2.017), (I-302)+(2.018), (I-302)+(2.019), (I-302)+(2.020), (I-302)+(2.021), (I-302)+(2.022), (I-302)+(2.023), (I-302)+(2.024), (I-302)+(2.025), (I-302)+(2.026), (I-302)+(2.027), (I-302)+(2.028), (I-302)+(2.029), (I-302)+(2.030), (I-302)+(2.031), (I-302)+(2.032), (I-302)+(2.033), (I-302)+(2.034), (I-302)+(2.035), (I-302)+(2.036), (I-302)+(2.037), (I-302)+(2.038), (I-302)+(2.039), (I-302)+(2.040), (I-302)+(2.041), (I-302)+(2.042), (I-302)+(2.043), (I-302)+(2.044), (I-302)+(2.045), (I-302)+(2.046), (I-302)+(2.047), (I-302)+(2.048), (I-302)+(2.049), (I-302)+(2.050), (I-302)+(2.051), (I-302)+(2.052), (I-302)+(2.053), (I-302)+(2.054), (I-302)+(2.055), (I-302)+(2.056), (I-302)+(2.057), (I-302)+(2.058), (I-302)+(2.059), (I-302)+(3.001), (I-302)+(3.002), (I-302)+(3.003), (I-302)+(3.004), (I-302)+(3.005), (I-302)+(3.006), (I-302)+(3.007), (I-302)+(3.008), (I-302)+(3.009), (I-302)+(3.010), (I-302)+(3.011), (I-302)+(3.012), (I-302)+(3.013), (I-302)+(3.014), (I-302)+(3.015), (I-302)+(3.016), (I-302)+(3.017), (I-302)+(3.018), (I-302)+(3.019), (I-302)+(3.020), (I-302)+(3.021), (I-302)+(3.022), (I-302)+(3.023), (I-302)+(3.024), (I-302)+(3.025), (I-302)+(3.026), (I-302)+(3.027), (I-302)+(3.028), (I-302)+(3.029), (I-302)+(3.030), (I-302)+(3.031), (I-302)+(4.001), (I-302)+(4.002), (I-302)+(4.003), (I-302)+(4.004), (I-302)+(4.005), (I-302)+(4.006), (I-302)+(4.007), (I-302)+(4.008), (I-302)+(4.009), (I-302)+(4.010), (I-302)+(4.011), (I-302)+(4.012), (I-302)+(4.013), (I-302)+(4.014), (I-302)+(4.015), (I-302)+(4.016), (I-302)+(4.017), (I-302)+(4.018), (I-302)+(4.019), (I-302)+(4.020), (I-302)+(4.021), (I-302)+(4.022), (I-302)+(4.023), (I-302)+(4.024), (I-302)+(4.025), (I-302)+(4.026), (I-302)+(5.001), (I-302)+(5.002), (I-302)+(5.003), (I-302)+(5.004), (I-302)+(5.005), (I-302)+(5.006), (I-302)+(5.007), (I-302)+(5.008), (I-302)+(5.009), (I-302)+(5.010), (I-302)+(5.011), (I-302)+(5.012), (I-302)+(5.013), (I-302)+(5.014), (I-302)+(5.015), (I-302)+(5.016), (I-302)+(5.017), (I-302)+(5.018), (I-302)+(5.019), (I-302)+(5.020), (I-302)+(5.021), (I-302)+(5.022), (I-302)+(5.023), (I-302)+(6.001), (I-302)+(6.002), (I-302)+(6.003), (I-302)+(6.004), (I-302)+(7.001), (I-302)+(7.002), (I-302)+(7.003), (I-302)+(7.004), (I-302)+(7.005), (I-302)+(7.006), (I-302)+(8.001), (I-302)+(9.001), (I-302)+(9.002), (I-302)+(9.003), (I-302)+(9.004), (I-302)+(9.005), (I-302)+(9.006), (I-302)+(9.007), (I-302)+(9.008), (I-302)+(9.009), (I-302)+(10.001), (I-302)+(10.002), (I-302)+(10.003), (I-302)+(11.001), (I-302)+(11.002), (I-302)+(12.001), (I-302)+(12.002), (I-302)+(12.003), (I-302)+(12.004), (I-302)+(13.001), (I-302)+(13.002), (I-302)+(13.003), (I-302)+(13.004), (I-302)+(13.005), (I-302)+(13.006), (I-302)+(14.001), (I-302)+(14.002), (I-302)+(15.001), (I-302)+(15.002), (I-302)+(15.003), (I-302)+(15.004), (I-302)+(15.005), (I-302)+(15.006), (I-302)+(15.007), (I-302)+(15.008), (I-302)+(15.009), (I-302)+(15.010), (I-302)+(15.011), (I-302)+(15.012), (I-302)+(15.013), (I-302)+(15.014), (I-302)+(15.015), (I-302)+(15.016), (I-302)+(15.017), (I-302)+(15.018), (I-302)+(15.019), (I-302)+(15.020), (I-302)+(15.021), (I-302)+(15.022), (I-302)+(15.023), (I-302)+(15.024), (I-302)+(15.025), (I-302)+(15.026), (I-302)+(15.027), (I-302)+(15.028), (I-302)+(15.029), (I-302)+(15.030), (I-302)+(15.031), (I-302)+(15.032), (I-302)+(15.033), (I-302)+(15.034), (I-302)+(15.035), (I-302)+(15.036), (I-302)+(15.037), (I-302)+(15.038), (I-302)+(15.039), (I-302)+(15.040), (I-302)+(15.041), (I-302)+(15.042), (I-302)+(15.043), (I-302)+(15.044), (I-302)+(15.045), (I-302)+(15.046), (I-302)+(15.047), (I-302)+(15.048), (I-302)+(15.049), (I-302)+(15.050), (I-302)+(15.051), (I-302)+(15.052), (I-302)+(15.053), (I-302)+(15.054), (I-302)+(15.055), (I-302)+(15.056), (I-302)+(15.057), (I-302)+(15.058), (I-302)+(15.059), (I-302)+(15.060), (I-302)+(15.061), (I-302)+(15.062), (I-302)+(15.063), (I-302)+(15.064), (I-302)+(15.065), (I-302)+(15.066), (I-302)+(15.067), (I-302)+(15.068), (I-302)+(15.069), (I-302)+(15.070), (I-302)+(15.071), (I-302)+(15.072), (I-302)+(15.073), (I-302)+(15.074), (I-302)+(15.075), (I-302)+(15.076), (I-302)+(15.077), (I-302)+(15.078), (I-302)+(15.079), (I-302)+(15.080), (I-302)+(15.081), (I-302)+(15.082), (I-302)+(15.083), (I-302)+(15.084), (I-302)+(15.085), (I-302)+(15.086), (I-302)+(15.087), (I-302)+(15.088), (I-302)+(15.089), (I-302)+(15.090), (I-302)+(15.091), (I-302)+(15.092), (I-302)+(15.093), (I-302)+(15.094), (I-302)+(15.095), (I-302)+(15.096), (I-302)+(15.097), (I-302)+(15.098), (I-302)+(15.099), (I-302)+(15.100), (I-302)+(15.101), (I-302)+(15.102), (I-302)+(15.103), (I-302)+(15.104), (I-302)+(15.105), (I-302)+(15.106), (I-302)+(15.107), (I-302)+(15.108), (I-302)+(15.109), (I-302)+(15.110), (I-302)+(15.111), (I-302)+(15.112), (I-302)+(15.113), (I-302)+(15.114), (I-302)+(15.115), (I-302)+(15.116), (I-302)+(15.117), (I-302)+(15.118), (I-302)+(15.119), (I-302)+(15.120), (I-302)+(15.121), (I-302)+(15.122), (I-302)+(15.123), (I-302)+(15.124), (I-302)+(15.125), (I-302)+(15.126), (I-302)+(15.127), (I-302)+(16.1001), (I-302)+(16.1002), (I-302)+(16.1003), (I-302)+(16.1004), (I-302)+(16.1005), (I-302)+(16.2001), (I-302)+(16.2002), (I-302)+(16.2003), (I-302)+(17.001), (I-302)+(17.002), (I-302)+(17.003), (I-302)+(17.004), (I-302)+(17.005), (I-302)+(17.006), (I-302)+(17.007), (I-302)+(17.008), (I-302)+(17.009), (I-302)+(17.010), (I-302)+(17.011), (I-302)+(17.012) and (I-302)+(18.001).

Also preferred compound combinations are selected from group (G5-1) consisting of the following mixtures:

(I-337)+(1.001), (I-337)+(1.002), (I-337)+(1.003), (I-337)+(1.004), (I-337)+(1.005), (I-337)+(1.006), (I-337)+(1.007), (I-337)+(1.008), (I-337)+(1.009), (I-337)+(1.010), (I-337)+(1.011), (I-337)+(1.012), (I-337)+(1.013), (I-337)+(1.014), (I-337)+(1.015), (I-337)+(1.016), (I-337)+(1.017), (I-337)+(1.018), (I-337)+(1.019), (I-337)+(1.020), (I-337)+(1.021), (I-337)+(1.022), (I-337)+(1.023), (I-337)+(1.024), (I-337)+(1.025), (I-337)+(1.026), (I-337)+(1.027), (I-337)+(1.028), (I-337)+(1.029), (I-337)+(1.030), (I-337)+(1.031), (I-337)+(1.032), (I-337)+(1.033), (I-337)+(1.034), (I-337)+(1.035), (I-337)+(1.036), (I-337)+(1.037), (I-337)+(1.038), (I-337)+(1.039), (I-337)+(1.040), (I-337)+(1.041), (I-337)+(1.042), (I-337)+(1.043), (I-337)+(1.044), (I-337)+(1.045), (I-337)+(1.046), (I-337)+(1.047), (I-337)+(1.048), (I-337)+(1.049), (I-337)+(1.050), (I-337)+(1.051), (I-337)+(1.052), (I-337)+(1.053), (I-337)+(1.054), (I-337)+(1.055), (I-337)+(1.056), (I-337)+(1.057), (I-337)+(1.058), (I-337)+(1.059), (I-337)+(1.060), (I-337)+(1.061), (I-337)+(1.062), (I-337)+(1.063), (I-337)+(1.064), (I-337)+(1.065), (I-337)+(1.066), (I-337)+(1.067), (I-337)+(1.068), (I-337)+(1.069), (I-337)+(1.070), (I-337)+(1.071), (I-337)+(1.072), (I-337)+(1.073), (I-337)+(1.074), (I-337)+(1.075), (I-337)+(1.076), (I-337)+(1.077), (I-337)+(1.078), (I-337)+(1.079), (I-337)+(1.080), (I-337)+(1.081), (I-337)+(1.082), (I-337)+(1.083), (I-337)+(1.084), (I-337)+(1.085), (I-337)+(1.086), (I-337)+(1.087), (I-337)+(1.088), (I-337)+(1.089), (I-337)+(1.090), (I-337)+(1.091), (I-337)+(1.092), (I-337)+(2.001), (I-337)+(2.002), (I-337)+(2.003), (I-337)+(2.004), (I-337)+(2.005), (I-337)+(2.006), (I-337)+(2.007), (I-337)+(2.008), (I-337)+(2.009), (I-337)+(2.010), (I-337)+(2.011), (I-337)+(2.012), (I-337)+(2.013), (I-337)+(2.014), (I-337)+(2.015), (I-337)+(2.016), (I-337)+(2.017), (I-337)+(2.018), (I-337)+(2.019), (I-337)+(2.020), (I-337)+(2.021), (I-337)+(2.022), (I-337)+(2.023), (I-337)+(2.024), (I-337)+(2.025), (I-337)+(2.026), (I-337)+(2.027), (I-337)+(2.028), (I-337)+(2.029), (I-337)+(2.030), (I-337)+(2.031), (I-337)+(2.032), (I-337)+(2.033), (I-337)+(2.034), (I-337)+(2.035), (I-337)+(2.036), (I-337)+(2.037), (I-337)+(2.038), (I-337)+(2.039), (I-337)+(2.040), (I-337)+(2.041), (I-337)+(2.042), (I-337)+(2.043), (I-337)+(2.044), (I-337)+(2.045), (I-337)+(2.046), (I-337)+(2.047), (I-337)+(2.048), (I-337)+(2.049), (I-337)+(2.050), (I-337)+(2.051), (I-337)+(2.052), (I-337)+(2.053), (I-337)+(2.054), (I-337)+(2.055), (I-337)+(2.056), (I-337)+(2.057), (I-337)+(2.058), (I-337)+(2.059), (I-337)+(2.060), (I-337)+(3.001), (I-337)+(3.002), (I-337)+(3.003), (I-337)+(3.004), (I-337)+(3.005), (I-337)+(3.006), (I-337)+(3.007), (I-337)+(3.008), (I-337)+(3.009), (I-337)+(3.010), (I-337)+(3.011), (I-337)+(3.012), (I-337)+(3.013), (I-337)+(3.014), (I-337)+(3.015), (I-337)+(3.016), (I-337)+(3.017), (I-337)+(3.018), (I-337)+(3.019), (I-337)+(3.020), (I-337)+(3.021), (I-337)+(3.022), (I-337)+(3.023), (I-337)+(3.024), (I-337)+(3.025), (I-337)+(3.026), (I-337)+(3.027), (I-337)+(3.028), (I-337)+(3.029), (I-337)+(3.030), (I-337)+(3.031), (I-337)+(3.032), (I-337)+(4.001), (I-337)+(4.002), (I-337)+(4.003), (I-337)+(4.004), (I-337)+(4.005), (I-337)+(4.006), (I-337)+(4.007), (I-337)+(4.008), (I-337)+(4.009), (I-337)+(4.010), (I-337)+(4.011), (I-337)+(4.012), (I-337)+(4.013), (I-337)+(4.014), (I-337)+(4.015), (I-337)+(4.016), (I-337)+(4.017), (I-337)+(4.018), (I-337)+(4.019), (I-337)+(4.020), (I-337)+(4.021), (I-337)+(4.022), (I-337)+(4.023), (I-337)+(4.024), (I-337)+(4.025), (I-337)+(4.026), (I-337)+(5.001), (I-337)+(5.002), (I-337)+(5.003), (I-337)+(5.004), (I-337)+(5.005), (I-337)+(5.006), (I-337)+(5.007), (I-337)+(5.008), (I-337)+(5.009), (I-337)+(5.010), (I-337)+(5.011), (I-337)+(5.012), (I-337)+(5.013), (I-337)+(5.014), (I-337)+(5.015), (I-337)+(5.016), (I-337)+(5.017), (I-337)+(5.018), (I-337)+(5.019), (I-337)+(5.020), (I-337)+(5.021), (I-337)+(5.022), (I-337)+(5.023), (I-337)+(6.001), (I-337)+(6.002), (I-337)+(6.003), (I-337)+(6.004), (I-337)+(7.001), (I-337)+(7.002), (I-337)+(7.003), (I-337)+(7.004), (I-337)+(7.005), (I-337)+(7.006), (I-337)+(8.001), (I-337)+(9.001), (I-337)+(9.002), (I-337)+(9.003), (I-337)+(9.004), (I-337)+(9.005), (I-337)+(9.006), (I-337)+(9.007), (I-337)+(9.008), (I-337)+(9.009), (I-337)+(10.001), (I-337)+(10.002), (I-337)+(10.003), (I-337)+(11.001), (I-337)+(11.002), (I-337)+(12.001), (I-337)+(12.002), (I-337)+(12.003), (I-337)+(12.004), (I-337)+(13.001), (I-337)+(13.002), (I-337)+(13.003), (I-337)+(13.004), (I-337)+(13.005), (I-337)+(13.006), (I-337)+(14.001), (I-337)+(14.002), (I-337)+(15.001), (I-337)+(15.002), (I-337)+(15.003), (I-337)+(15.004), (I-337)+(15.005), (I-337)+(15.006), (I-337)+(15.007), (I-337)+(15.008), (I-337)+(15.009), (I-337)+(15.010), (I-337)+(15.011), (I-337)+(15.012), (I-337)+(15.013), (I-337)+(15.014), (I-337)+(15.015), (I-337)+(15.016), (I-337)+(15.017), (I-337)+(15.018), (I-337)+(15.019), (I-337)+(15.020), (I-337)+(15.021), (I-337)+(15.022), (I-337)+(15.023), (I-337)+(15.024), (I-337)+(15.025), (I-337)+(15.026), (I-337)+(15.027), (I-337)+(15.028), (I-337)+(15.029), (I-337)+(15.030), (I-337)+(15.031), (I-337)+(15.032), (I-337)+(15.033), (I-337)+(15.034), (I-337)+(15.035), (I-337)+(15.036), (I-337)+(15.037), (I-337)+(15.038), (I-337)+(15.039), (I-337)+(15.040), (I-337)+(15.041), (I-337)+(15.042), (I-337)+(15.043), (I-337)+(15.044), (I-337)+(15.045), (I-337)+(15.046), (I-337)+(15.047), (I-337)+(15.048), (I-337)+(15.049), (I-337)+(15.050), (I-337)+(15.051), (I-337)+(15.052), (I-337)+(15.053), (I-337)+(15.054), (I-337)+(15.055), (I-337)+(15.056), (I-337)+(15.057), (I-337)+(15.058), (I-337)+(15.059), (I-337)+(15.060), (I-337)+(15.061), (I-337)+(15.062), (I-337)+(15.063), (I-337)+(15.064), (I-337)+(15.065), (I-337)+(15.066), (I-337)+(15.067), (I-337)+(15.068), (I-337)+(15.069), (I-337)+(15.070), (I-337)+(15.071), (I-337)+(15.072), (I-337)+(15.073), (I-337)+(15.074), (I-337)+(15.075), (I-337)+(15.076), (I-337)+(15.077), (I-337)+(15.078), (I-337)+(15.079), (I-337)+(15.080), (I-337)+(15.081), (I-337)+(15.082), (I-337)+(15.083), (I-337)+(15.084), (I-337)+(15.085), (I-337)+(15.086), (I-337)+(15.087), (I-337)+(15.088), (I-337)+(15.089), (I-337)+(15.090), (I-337)+(15.091), (I-337)+(15.092), (I-337)+(15.093), (I-337)+(15.094), (I-337)+(15.095), (I-337)+(15.096), (I-337)+(15.097), (I-337)+(15.098), (I-337)+(15.099), (I-337)+(15.100), (I-337)+(15.101), (I-337)+(15.102), (I-337)+(15.103), (I-337)+(15.104), (I-337)+(15.105), (I-337)+(15.106), (I-337)+(15.107), (I-337)+(15.108), (I-337)+(15.109), (I-337)+(15.110), (I-337)+(15.111), (I-337)+(15.112), (I-337)+(15.113), (I-337)+(15.114), (I-337)+(15.115), (I-337)+(15.116), (I-337)+(15.117), (I-337)+(15.118), (I-337)+(15.119), (I-337)+(15.120), (I-337)+(15.121), (I-337)+(15.122), (I-337)+(15.123), (I-337)+(15.124), (I-337)+(15.125), (I-337)+(15.126), (I-337)+(15.127), (I-337)+(15.128), (I-337)+(16.001), (I-337)+(16.002), (I-337)+(16.003), (I-337)+(16.004), (I-337)+(16.005), (I-337)+(16.006), (I-337)+(16.007), (I-337)+(16.008), (I-337)+(17.001), (I-337)+(17.002), (I-337)+(17.003), (I-337)+(17.004), (I-337)+(17.005), (I-337)+(17.006), (I-337)+(17.007), (I-337)+(17.008), (I-337)+(17.009), (I-337)+(17.010), (I-337)+(17.011), (I-337)+(17.012) and (I-337)+(18.001).

Also preferred compound combinations are selected from group (G5) consisting of the following mixtures:

(I-337)+(1.001), (I-337)+(1.002), (I-337)+(1.003), (I-337)+(1.004), (I-337)+(1.005), (I-337)+(1.006), (I-337)+(1.007), (I-337)+(1.008), (I-337)+(1.009), (I-337)+(1.010), (I-337)+(1.011), (I-337)+(1.012), (I-337)+(1.013), (I-337)+(1.014), (I-337)+(1.015), (I-337)+(1.016), (I-337)+(1.017), (I-337)+(1.018), (I-337)+(1.019), (I-337)+(1.020), (I-337)+(1.021), (I-337)+(1.022), (I-337)+(1.023), (I-337)+(1.024), (I-337)+(1.025), (I-337)+(1.026), (I-337)+(1.027), (I-337)+(1.028), (I-337)+(1.029), (I-337)+(1.030), (I-337)+(1.031), (I-337)+(1.032), (I-337)+(1.033), (I-337)+(1.034), (I-337)+(1.035), (I-337)+(1.036), (I-337)+(1.037), (I-337)+(1.038), (I-337)+(1.039), (I-337)+(1.040), (I-337)+(1.041), (I-337)+(1.042), (I-337)+(1.043), (I-337)+(1.044), (I-337)+(1.045), (I-337)+(1.046), (I-337)+(1.047), (I-337)+(1.048), (I-337)+(1.049), (I-337)+(1.050), (I-337)+(1.051), (I-337)+(1.052), (I-337)+(1.053), (I-337)+(1.054), (I-337)+(1.055), (I-337)+(1.056), (I-337)+(1.057), (I-337)+(1.058), (I-337)+(1.059), (I-337)+(1.060), (I-337)+(1.061), (I-337)+(1.062), (I-337)+(1.063), (I-337)+(1.064), (I-337)+(1.065), (I-337)+(1.066), (I-337)+(1.067), (I-337)+(1.068), (I-337)+(1.069), (I-337)+(1.070), (I-337)+(1.071), (I-337)+(1.072), (I-337)+(1.073), (I-337)+(1.074), (I-337)+(1.075), (I-337)+(1.076), (I-337)+(1.077), (I-337)+(1.078), (I-337)+(1.079), (I-337)+(1.080), (I-337)+(1.081), (I-337)+(1.082), (I-337)+(1.083), (I-337)+(1.084), (I-337)+(1.085), (I-337)+(1.086), (I-337)+(1.087), (I-337)+(1.088), (I-337)+(1.089), (I-337)+(1.090), (I-337)+(1.091), (I-337)+(1.092), (I-337)+(2.001), (I-337)+(2.002), (I-337)+(2.003), (I-337)+(2.004), (I-337)+(2.005), (I-337)+(2.006), (I-337)+(2.007), (I-337)+(2.008), (I-337)+(2.009), (I-337)+(2.010), (I-337)+(2.011), (I-337)+(2.012), (I-337)+(2.013), (I-337)+(2.014), (I-337)+(2.015), (I-337)+(2.016), (I-337)+(2.017), (I-337)+(2.018), (I-337)+(2.019), (I-337)+(2.020), (I-337)+(2.021), (I-337)+(2.022), (I-337)+(2.023), (I-337)+(2.024), (I-337)+(2.025), (I-337)+(2.026), (I-337)+(2.027), (I-337)+(2.028), (I-337)+(2.029), (I-337)+(2.030), (I-337)+(2.031), (I-337)+(2.032), (I-337)+(2.033), (I-337)+(2.034), (I-337)+(2.035), (I-337)+(2.036), (I-337)+(2.037), (I-337)+(2.038), (I-337)+(2.039), (I-337)+(2.040), (I-337)+(2.041), (I-337)+(2.042), (I-337)+(2.043), (I-337)+(2.044), (I-337)+(2.045), (I-337)+(2.046), (I-337)+(2.047), (I-337)+(2.048), (I-337)+(2.049), (I-337)+(2.050), (I-337)+(2.051), (I-337)+(2.052), (I-337)+(2.053), (I-337)+(2.054), (I-337)+(2.055), (I-337)+(2.056), (I-337)+(2.057), (I-337)+(2.058), (I-337)+(2.059), (I-337)+(3.001), (I-337)+(3.002), (I-337)+(3.003), (I-337)+(3.004), (I-337)+(3.005), (I-337)+(3.006), (I-337)+(3.007), (I-337)+(3.008), (I-337)+(3.009), (I-337)+(3.010), (I-337)+(3.011), (I-337)+(3.012), (I-337)+(3.013), (I-337)+(3.014), (I-337)+(3.015), (I-337)+(3.016), (I-337)+(3.017), (I-337)+(3.018), (I-337)+(3.019), (I-337)+(3.020), (I-337)+(3.021), (I-337)+(3.022), (I-337)+(3.023), (I-337)+(3.024), (I-337)+(3.025), (I-337)+(3.026), (I-337)+(3.027), (I-337)+(3.028), (I-337)+(3.029), (I-337)+(3.030), (I-337)+(3.031), (I-337)+(4.001), (I-337)+(4.002), (I-337)+(4.003), (I-337)+(4.004), (I-337)+(4.005), (I-337)+(4.006), (I-337)+(4.007), (I-337)+(4.008), (I-337)+(4.009), (I-337)+(4.010), (I-337)+(4.011), (I-337)+(4.012), (I-337)+(4.013), (I-337)+(4.014), (I-337)+(4.015), (I-337)+(4.016), (I-337)+(4.017), (I-337)+(4.018), (I-337)+(4.019), (I-337)+(4.020), (I-337)+(4.021), (I-337)+(4.022), (I-337)+(4.023), (I-337)+(4.024), (I-337)+(4.025), (I-337)+(4.026), (I-337)+(5.001), (I-337)+(5.002), (I-337)+(5.003), (I-337)+(5.004), (I-337)+(5.005), (I-337)+(5.006), (I-337)+(5.007), (I-337)+(5.008), (I-337)+(5.009), (I-337)+(5.010), (I-337)+(5.011), (I-337)+(5.012), (I-337)+(5.013), (I-337)+(5.014), (I-337)+(5.015), (I-337)+(5.016), (I-337)+(5.017), (I-337)+(5.018), (I-337)+(5.019), (I-337)+(5.020), (I-337)+(5.021), (I-337)+(5.022), (I-337)+(5.023), (I-337)+(6.001), (I-337)+(6.002), (I-337)+(6.003), (I-337)+(6.004), (I-337)+(7.001), (I-337)+(7.002), (I-337)+(7.003), (I-337)+(7.004), (I-337)+(7.005), (I-337)+(7.006), (I-337)+(8.001), (I-337)+(9.001), (I-337)+(9.002), (I-337)+(9.003), (I-337)+(9.004), (I-337)+(9.005), (I-337)+(9.006), (I-337)+(9.007), (I-337)+(9.008), (I-337)+(9.009), (I-337)+(10.001), (I-337)+(10.002), (I-337)+(10.003), (I-337)+(11.001), (I-337)+(11.002), (I-337)+(12.001), (I-337)+(12.002), (I-337)+(12.003), (I-337)+(12.004), (I-337)+(13.001), (I-337)+(13.002), (I-337)+(13.003), (I-337)+(13.004), (I-337)+(13.005), (I-337)+(13.006), (I-337)+(14.001), (I-337)+(14.002), (I-337)+(15.001), (I-337)+(15.002), (I-337)+(15.003), (I-337)+(15.004), (I-337)+(15.005), (I-337)+(15.006), (I-337)+(15.007), (I-337)+(15.008), (I-337)+(15.009), (I-337)+(15.010), (I-337)+(15.011), (I-337)+(15.012), (I-337)+(15.013), (I-337)+(15.014), (I-337)+(15.015), (I-337)+(15.016), (I-337)+(15.017), (I-337)+(15.018), (I-337)+(15.019), (I-337)+(15.020), (I-337)+(15.021), (I-337)+(15.022), (I-337)+(15.023), (I-337)+(15.024), (I-337)+(15.025), (I-337)+(15.026), (I-337)+(15.027), (I-337)+(15.028), (I-337)+(15.029), (I-337)+(15.030), (I-337)+(15.031), (I-337)+(15.032), (I-337)+(15.033), (I-337)+(15.034), (I-337)+(15.035), (I-337)+(15.036), (I-337)+(15.037), (I-337)+(15.038), (I-337)+(15.039), (I-337)+(15.040), (I-337)+(15.041), (I-337)+(15.042), (I-337)+(15.043), (I-337)+(15.044), (I-337)+(15.045), (I-337)+(15.046), (I-337)+(15.047), (I-337)+(15.048), (I-337)+(15.049), (I-337)+(15.050), (I-337)+(15.051), (I-337)+(15.052), (I-337)+(15.053), (I-337)+(15.054), (I-337)+(15.055), (I-337)+(15.056), (I-337)+(15.057), (I-337)+(15.058), (I-337)+(15.059), (I-337)+(15.060), (I-337)+(15.061), (I-337)+(15.062), (I-337)+(15.063), (I-337)+(15.064), (I-337)+(15.065), (I-337)+(15.066), (I-337)+(15.067), (I-337)+(15.068), (I-337)+(15.069), (I-337)+(15.070), (I-337)+(15.071), (I-337)+(15.072), (I-337)+(15.073), (I-337)+(15.074), (I-337)+(15.075), (I-337)+(15.076), (I-337)+(15.077), (I-337)+(15.078), (I-337)+(15.079), (I-337)+(15.080), (I-337)+(15.081), (I-337)+(15.082), (I-337)+(15.083), (I-337)+(15.084), (I-337)+(15.085), (I-337)+(15.086), (I-337)+(15.087), (I-337)+(15.088), (I-337)+(15.089), (I-337)+(15.090), (I-337)+(15.091), (I-337)+(15.092), (I-337)+(15.093), (I-337)+(15.094), (I-337)+(15.095), (I-337)+(15.096), (I-337)+(15.097), (I-337)+(15.098), (I-337)+(15.099), (I-337)+(15.100), (I-337)+(15.101), (I-337)+(15.102), (I-337)+(15.103), (I-337)+(15.104), (I-337)+(15.105), (I-337)+(15.106), (I-337)+(15.107), (I-337)+(15.108), (I-337)+(15.109), (I-337)+(15.110), (I-337)+(15.111), (I-337)+(15.112), (I-337)+(15.113), (I-337)+(15.114), (I-337)+(15.115), (I-337)+(15.116), (I-337)+(15.117), (I-337)+(15.118), (I-337)+(15.119), (I-337)+(15.120), (I-337)+(15.121), (I-337)+(15.122), (I-337)+(15.123), (I-337)+(15.124), (I-337)+(15.125), (I-337)+(15.126), (I-337)+(15.127), (I-337)+(16.001), (I-337)+(16.002), (I-337)+(16.003), (I-337)+(16.004), (I-337)+(16.005), (I-337)+(16.006), (I-337)+(16.007), (I-337)+(16.008), (I-337)+(17.001), (I-337)+(17.002), (I-337)+(17.003), (I-337)+(17.004), (I-337)+(17.005), (I-337)+(17.006), (I-337)+(17.007), (I-337)+(17.008), (I-337)+(17.009), (I-337)+(17.010), (I-337)+(17.011), (I-337)+(17.012) and (I-337)+(18.001).

Also preferred compound combinations are selected from group (G7-1) consisting of the following mixtures: (I-338)+(1.001), (I-338)+(1.002), (I-338)+(1.003), (I-338)+(1.004), (I-338)+(1.005), (I-338)+(1.006), (I-338)+(1.007), (I-338)+(1.008), (I-338)+(1.009), (I-338)+(1.010), (I-338)+(1.011), (I-338)+(1.012), (I-338)+(1.013), (I-338)+(1.014), (I-338)+(1.015), (I-338)+(1.016), (I-338)+(1.017), (I-338)+(1.018), (I-338)+(1.019), (I-338)+(1.020), (I-338)+(1.021), (I-338)+(1.022), (I-338)+(1.023), (I-338)+(1.024), (I-338)+(1.025), (I-338)+(1.026), (I-338)+(1.027), (I-338)+(1.028), (I-338)+(1.029), (I-338)+(1.030), (I-338)+(1.031), (I-338)+(1.032), (I-338)+(1.033), (I-338)+(1.034), (I-338)+(1.035), (I-338)+(1.036), (I-338)+(1.037), (I-338)+(1.038), (I-338)+(1.039), (I-338)+(1.040), (I-338)+(1.041), (I-338)+(1.042), (I-338)+(1.043), (I-338)+(1.044), (I-338)+(1.045), (I-338)+(1.046), (I-338)+(1.047), (I-338)+(1.048), (I-338)+(1.049), (I-338)+(1.050), (I-338)+(1.051), (I-338)+(1.052), (I-338)+(1.053), (I-338)+(1.054), (I-338)+(1.055), (I-338)+(1.056), (I-338)+(1.057), (I-338)+(1.058), (I-338)+(1.059), (I-338)+(1.060), (I-338)+(1.061), (I-338)+(1.062), (I-338)+(1.063), (I-338)+(1.064), (I-338)+(1.065), (I-338)+(1.066), (I-338)+(1.067), (I-338)+(1.068), (I-338)+(1.069), (I-338)+(1.070), (I-338)+(1.071), (I-338)+(1.072), (I-338)+(1.073), (I-338)+(1.074), (I-338)+(1.075), (I-338)+(1.076), (I-338)+(1.077), (I-338)+(1.078), (I-338)+(1.079), (I-338)+(1.080), (I-338)+(1.081), (I-338)+(1.082), (I-338)+(1.083), (I-338)+(1.084), (I-338)+(1.085), (I-338)+(1.086), (I-338)+(1.087), (I-338)+(1.088), (I-338)+(1.089), (I-338)+(1.090), (I-338)+(1.091), (I-338)+(1.092), (I-338)+(2.001), (I-338)+(2.002), (I-338)+(2.003), (I-338)+(2.004), (I-338)+(2.005), (I-338)+(2.006), (I-338)+(2.007), (I-338)+(2.008), (I-338)+(2.009), (I-338)+(2.010), (I-338)+(2.011), (I-338)+(2.012), (I-338)+(2.013), (I-338)+(2.014), (I-338)+(2.015), (I-338)+(2.016), (I-338)+(2.017), (I-338)+(2.018), (I-338)+(2.019), (I-338)+(2.020), (I-338)+(2.021), (I-338)+(2.022), (I-338)+(2.023), (I-338)+(2.024), (I-338)+(2.025), (I-338)+(2.026), (I-338)+(2.027), (I-338)+(2.028), (I-338)+(2.029), (I-338)+(2.030), (I-338)+(2.031), (I-338)+(2.032), (I-338)+(2.033), (I-338)+(2.034), (I-338)+(2.035), (I-338)+(2.036), (I-338)+(2.037), (I-338)+(2.038), (I-338)+(2.039), (I-338)+(2.040), (I-338)+(2.041), (I-338)+(2.042), (I-338)+(2.043), (I-338)+(2.044), (I-338)+(2.045), (I-338)+(2.046), (I-338)+(2.047), (I-338)+(2.048), (I-338)+(2.049), (I-338)+(2.050), (I-338)+(2.051), (I-338)+(2.052), (I-338)+(2.053), (I-338)+(2.054), (I-338)+(2.055), (I-338)+(2.056), (I-338)+(2.057), (I-338)+(2.058), (I-338)+(2.059), (I-338)+(2.060), (I-338)+(3.001), (I-338)+(3.002), (I-338)+(3.003), (I-338)+(3.004), (I-338)+(3.005), (I-338)+(3.006), (I-338)+(3.007), (I-338)+(3.008), (I-338)+(3.009), (I-338)+(3.010), (I-338)+(3.011), (I-338)+(3.012), (I-338)+(3.013), (I-338)+(3.014), (I-338)+(3.015), (I-338)+(3.016), (I-338)+(3.017), (I-338)+(3.018), (I-338)+(3.019), (I-338)+(3.020), (I-338)+(3.021), (I-338)+(3.022), (I-338)+(3.023), (I-338)+(3.024), (I-338)+(3.025), (I-338)+(3.026), (I-338)+(3.027), (I-338)+(3.028), (I-338)+(3.029), (I-338)+(3.030), (I-338)+(3.031), (I-338)+(3.032), (I-338)+(4.001), (I-338)+(4.002), (I-338)+(4.003), (I-338)+(4.004), (I-338)+(4.005), (I-338)+(4.006), (I-338)+(4.007), (I-338)+(4.008), (I-338)+(4.009), (I-338)+(4.010), (I-338)+(4.011), (I-338)+(4.012), (I-338)+(4.013), (I-338)+(4.014), (I-338)+(4.015), (I-338)+(4.016), (I-338)+(4.017), (I-338)+(4.018), (I-338)+(4.019), (I-338)+(4.020), (I-338)+(4.021), (I-338)+(4.022), (I-338)+(4.023), (I-338)+(4.024), (I-338)+(4.025), (I-338)+(4.026), (I-338)+(5.001), (I-338)+(5.002), (I-338)+(5.003), (I-338)+(5.004), (I-338)+(5.005), (I-338)+(5.006), (I-338)+(5.007), (I-338)+(5.008), (I-338)+(5.009), (I-338)+(5.010), (I-338)+(5.011), (I-338)+(5.012), (I-338)+(5.013), (I-338)+(5.014), (I-338)+(5.015), (I-338)+(5.016), (I-338)+(5.017), (I-338)+(5.018), (I-338)+(5.019), (I-338)+(5.020), (I-338)+(5.021), (I-338)+(5.022), (I-338)+(5.023), (I-338)+(6.001), (I-338)+(6.002), (I-338)+(6.003), (I-338)+(6.004), (I-338)+(7.001), (I-338)+(7.002), (I-338)+(7.003), (I-338)+(7.004), (I-338)+(7.005), (I-338)+(7.006), (I-338)+(8.001), (I-338)+(9.001), (I-338)+(9.002), (I-338)+(9.003), (I-338)+(9.004), (I-338)+(9.005), (I-338)+(9.006), (I-338)+(9.007), (I-338)+(9.008), (I-338)+(9.009), (I-338)+(10.001), (I-338)+(10.002), (I-338)+(10.003), (I-338)+(11.001), (I-338)+(11.002), (I-338)+(12.001), (I-338)+(12.002), (I-338)+(12.003), (I-338)+(12.004), (I-338)+(13.001), (I-338)+(13.002), (I-338)+(13.003), (I-338)+(13.004), (I-338)+(13.005), (I-338)+(13.006), (I-338)+(14.001), (I-338)+(14.002), (I-338)+(15.001), (I-338)+(15.002), (I-338)+(15.003), (I-338)+(15.004), (I-338)+(15.005), (I-338)+(15.006), (I-338)+(15.007), (I-338)+(15.008), (I-338)+(15.009), (I-338)+(15.010), (I-338)+(15.011), (I-338)+(15.012), (I-338)+(15.013), (I-338)+(15.014), (I-338)+(15.015), (I-338)+(15.016), (I-338)+(15.017), (I-338)+(15.018), (I-338)+(15.019), (I-338)+(15.020), (I-338)+(15.021), (I-338)+(15.022), (I-338)+(15.023), (I-338)+(15.024), (I-338)+(15.025), (I-338)+(15.026), (I-338)+(15.027), (I-338)+(15.028), (I-338)+(15.029), (I-338)+(15.030), (I-338)+(15.031), (I-338)+(15.032), (I-338)+(15.033), (I-338)+(15.034), (I-338)+(15.035), (I-338)+(15.036), (I-338)+(15.037), (I-338)+(15.038), (I-338)+(15.039), (I-338)+(15.040), (I-338)+(15.041), (I-338)+(15.042), (I-338)+(15.043), (I-338)+(15.044), (I-338)+(15.045), (I-338)+(15.046), (I-338)+(15.047), (I-338)+(15.048), (I-338)+(15.049), (I-338)+(15.050), (I-338)+(15.051), (I-338)+(15.052), (I-338)+(15.053), (I-338)+(15.054), (I-338)+(15.055), (I-338)+(15.056), (I-338)+(15.057), (I-338)+(15.058), (I-338)+(15.059), (I-338)+(15.060), (I-338)+(15.061), (I-338)+(15.062), (I-338)+(15.063), (I-338)+(15.064), (I-338)+(15.065), (I-338)+(15.066), (I-338)+(15.067), (I-338)+(15.068), (I-338)+(15.069), (I-338)+(15.070), (I-338)+(15.071), (I-338)+(15.072), (I-338)+(15.073), (I-338)+(15.074), (I-338)+(15.075), (I-338)+(15.076), (I-338)+(15.077), (I-338)+(15.078), (I-338)+(15.079), (I-338)+(15.080), (I-338)+(15.081), (I-338)+(15.082), (I-338)+(15.083), (I-338)+(15.084), (I-338)+(15.085), (I-338)+(15.086), (I-338)+(15.087), (I-338)+(15.088), (I-338)+(15.089), (I-338)+(15.090), (I-338)+(15.091), (I-338)+(15.092), (I-338)+(15.093), (I-338)+(15.094), (I-338)+(15.095), (I-338)+(15.096), (I-338)+(15.097), (I-338)+(15.098), (I-338)+(15.099), (I-338)+(15.100), (I-338)+(15.101), (I-338)+(15.102), (I-338)+(15.103), (I-338)+(15.104), (I-338)+(15.105), (I-338)+(15.106), (I-338)+(15.107), (I-338)+(15.108), (I-338)+(15.109), (I-338)+(15.110), (I-338)+(15.111), (I-338)+(15.112), (I-338)+(15.113), (I-338)+(15.114), (I-338)+(15.115), (I-338)+(15.116), (I-338)+(15.117), (I-338)+(15.118), (I-338)+(15.119), (I-338)+(15.120), (I-338)+(15.121), (I-338)+(15.122), (I-338)+(15.123), (I-338)+(15.124), (I-338)+(15.125), (I-338)+(15.126), (I-338)+(15.127), (I-338)+(15.128), (I-338)+(16.001), (I-338)+(16.002), (I-338)+(16.003), (I-338)+(16.004), (I-338)+(16.005), (I-338)+(16.006), (I-338)+(16.007), (I-338)+(16.008), (I-338)+(17.001), (I-338)+(17.002), (I-338)+(17.003), (I-338)+(17.004), (I-338)+(17.005), (I-338)+(17.006), (I-338)+(17.007), (I-338)+(17.008), (I-338)+(17.009), (I-338)+(17.010), (I-338)+(17.011), (I-338)+(17.012) and (I-338)+(18.001).

Also preferred compound combinations are selected from group (G6-1) consisting of the following mixtures: (I-339)+(1.001), (I-339)+(1.002), (I-339)+(1.003), (I-339)+(1.004), (I-339)+(1.005), (I-339)+(1.006), (I-339)+(1.007), (I-339)+(1.008), (I-339)+(1.009), (I-339)+(1.010), (I-339)+(1.011), (I-339)+(1.012), (I-339)+(1.013), (I-339)+(1.014), (I-339)+(1.015), (I-339)+(1.016), (I-339)+(1.017), (I-339)+(1.018), (I-339)+(1.019), (I-339)+(1.020), (I-339)+(1.021), (I-339)+(1.022), (I-339)+(1.023), (I-339)+(1.024), (I-339)+(1.025), (I-339)+(1.026), (I-339)+(1.027), (I-339)+(1.028), (I-339)+(1.029), (I-339)+(1.030), (I-339)+(1.031), (I-339)+(1.032), (I-339)+(1.033), (I-339)+(1.034), (I-339)+(1.035), (I-339)+(1.036), (I-339)+(1.037), (I-339)+(1.038), (I-339)+(1.039), (I-339)+(1.040), (I-339)+(1.041), (I-339)+(1.042), (I-339)+(1.043), (I-339)+(1.044), (I-339)+(1.045), (I-339)+(1.046), (I-339)+(1.047), (I-339)+(1.048), (I-339)+(1.049), (I-339)+(1.050), (I-339)+(1.051), (I-339)+(1.052), (I-339)+(1.053), (I-339)+(1.054), (I-339)+(1.055), (I-339)+(1.056), (I-339)+(1.057), (I-339)+(1.058), (I-339)+(1.059), (I-339)+(1.060), (I-339)+(1.061), (I-339)+(1.062), (I-339)+(1.063), (I-339)+(1.064), (I-339)+(1.065), (I-339)+(1.066), (I-339)+(1.067), (I-339)+(1.068), (I-339)+(1.069), (I-339)+(1.070), (I-339)+(1.071), (I-339)+(1.072), (I-339)+(1.073), (I-339)+(1.074), (I-339)+(1.075), (I-339)+(1.076), (I-339)+(1.077), (I-339)+(1.078), (I-339)+(1.079), (I-339)+(1.080), (I-339)+(1.081), (I-339)+(1.082), (I-339)+(1.083), (I-339)+(1.084), (I-339)+(1.085), (I-339)+(1.086), (I-339)+(1.087), (I-339)+(1.088), (I-339)+(1.089), (I-339)+(1.090), (I-339)+(1.091), (I-339)+(1.092), (I-339)+(2.001), (I-339)+(2.002), (I-339)+(2.003), (I-339)+(2.004), (I-339)+(2.005), (I-339)+(2.006), (I-339)+(2.007), (I-339)+(2.008), (I-339)+(2.009), (I-339)+(2.010), (I-339)+(2.011), (I-339)+(2.012), (I-339)+(2.013), (I-339)+(2.014), (I-339)+(2.015), (I-339)+(2.016), (I-339)+(2.017), (I-339)+(2.018), (I-339)+(2.019), (I-339)+(2.020), (I-339)+(2.021), (I-339)+(2.022), (I-339)+(2.023), (I-339)+(2.024), (I-339)+(2.025), (I-339)+(2.026), (I-339)+(2.027), (I-339)+(2.028), (I-339)+(2.029), (I-339)+(2.030), (I-339)+(2.031), (I-339)+(2.032), (I-339)+(2.033), (I-339)+(2.034), (I-339)+(2.035), (I-339)+(2.036), (I-339)+(2.037), (I-339)+(2.038), (I-339)+(2.039), (I-339)+(2.040), (I-339)+(2.041), (I-339)+(2.042), (I-339)+(2.043), (I-339)+(2.044), (I-339)+(2.045), (I-339)+(2.046), (I-339)+(2.047), (I-339)+(2.048), (I-339)+(2.049), (I-339)+(2.050), (I-339)+(2.051), (I-339)+(2.052), (I-339)+(2.053), (I-339)+(2.054), (I-339)+(2.055), (I-339)+(2.056), (I-339)+(2.057), (I-339)+(2.058), (I-339)+(2.059), (I-339)+(2.060), (I-339)+(3.001), (I-339)+(3.002), (I-339)+(3.003), (I-339)+(3.004), (I-339)+(3.005), (I-339)+(3.006), (I-339)+(3.007), (I-339)+(3.008), (I-339)+(3.009), (I-339)+(3.010), (I-339)+(3.011), (I-339)+(3.012), (I-339)+(3.013), (I-339)+(3.014), (I-339)+(3.015), (I-339)+(3.016), (I-339)+(3.017), (I-339)+(3.018), (I-339)+(3.019), (I-339)+(3.020), (I-339)+(3.021), (I-339)+(3.022), (I-339)+(3.023), (I-339)+(3.024), (I-339)+(3.025), (I-339)+(3.026), (I-339)+(3.027), (I-339)+(3.028), (I-339)+(3.029), (I-339)+(3.030), (I-339)+(3.031), (I-339)+(3.032), (I-339)+(4.001), (I-339)+(4.002), (I-339)+(4.003), (I-339)+(4.004), (I-339)+(4.005), (I-339)+(4.006), (I-339)+(4.007), (I-339)+(4.008), (I-339)+(4.009), (I-339)+(4.010), (I-339)+(4.011), (I-339)+(4.012), (I-339)+(4.013), (I-339)+(4.014), (I-339)+(4.015), (I-339)+(4.016), (I-339)+(4.017), (I-339)+(4.018), (I-339)+(4.019), (I-339)+(4.020), (I-339)+(4.021), (I-339)+(4.022), (I-339)+(4.023), (I-339)+(4.024), (I-339)+(4.025), (I-339)+(4.026), (I-339)+(5.001), (I-339)+(5.002), (I-339)+(5.003), (I-339)+(5.004), (I-339)+(5.005), (I-339)+(5.006), (I-339)+(5.007), (I-339)+(5.008), (I-339)+(5.009), (I-339)+(5.010), (I-339)+(5.011), (I-339)+(5.012), (I-339)+(5.013), (I-339)+(5.014), (I-339)+(5.015), (I-339)+(5.016), (I-339)+(5.017), (I-339)+(5.018), (I-339)+(5.019), (I-339)+(5.020), (I-339)+(5.021), (I-339)+(5.022), (I-339)+(5.023), (I-339)+(6.001), (I-339)+(6.002), (I-339)+(6.003), (I-339)+(6.004), (I-339)+(7.001), (I-339)+(7.002), (I-339)+(7.003), (I-339)+(7.004), (I-339)+(7.005), (I-339)+(7.006), (I-339)+(8.001), (I-339)+(9.001), (I-339)+(9.002), (I-339)+(9.003), (I-339)+(9.004), (I-339)+(9.005), (I-339)+(9.006), (I-339)+(9.007), (I-339)+(9.008), (I-339)+(9.009), (I-339)+(10.001), (I-339)+(10.002), (I-339)+(10.003), (I-339)+(11.001), (I-339)+(11.002), (I-339)+(12.001), (I-339)+(12.002), (I-339)+(12.003), (I-339)+(12.004), (I-339)+(13.001), (I-339)+(13.002), (I-339)+(13.003), (I-339)+(13.004), (I-339)+(13.005), (I-339)+(13.006), (I-339)+(14.001), (I-339)+(14.002), (I-339)+(15.001), (I-339)+(15.002), (I-339)+(15.003), (I-339)+(15.004), (I-339)+(15.005), (I-339)+(15.006), (I-339)+(15.007), (I-339)+(15.008), (I-339)+(15.009), (I-339)+(15.010), (I-339)+(15.011), (I-339)+(15.012), (I-339)+(15.013), (I-339)+(15.014), (I-339)+(15.015), (I-339)+(15.016), (I-339)+(15.017), (I-339)+(15.018), (I-339)+(15.019), (I-339)+(15.020), (I-339)+(15.021), (I-339)+(15.022), (I-339)+(15.023), (I-339)+(15.024), (I-339)+(15.025), (I-339)+(15.026), (I-339)+(15.027), (I-339)+(15.028), (I-339)+(15.029), (I-339)+(15.030), (I-339)+(15.031), (I-339)+(15.032), (I-339)+(15.033), (I-339)+(15.034), (I-339)+(15.035), (I-339)+(15.036), (I-339)+(15.037), (I-339)+(15.038), (I-339)+(15.039), (I-339)+(15.040), (I-339)+(15.041), (I-339)+(15.042), (I-339)+(15.043), (I-339)+(15.044), (I-339)+(15.045), (I-339)+(15.046), (I-339)+(15.047), (I-339)+(15.048), (I-339)+(15.049), (I-339)+(15.050), (I-339)+(15.051), (I-339)+(15.052), (I-339)+(15.053), (I-339)+(15.054), (I-339)+(15.055), (I-339)+(15.056), (I-339)+(15.057), (I-339)+(15.058), (I-339)+(15.059), (I-339)+(15.060), (I-339)+(15.061), (I-339)+(15.062), (I-339)+(15.063), (I-339)+(15.064), (I-339)+(15.065), (I-339)+(15.066), (I-339)+(15.067), (I-339)+(15.068), (I-339)+(15.069), (I-339)+(15.070), (I-339)+(15.071), (I-339)+(15.072), (I-339)+(15.073), (I-339)+(15.074), (I-339)+(15.075), (I-339)+(15.076), (I-339)+(15.077), (I-339)+(15.078), (I-339)+(15.079), (I-339)+(15.080), (I-339)+(15.081), (I-339)+(15.082), (I-339)+(15.083), (I-339)+(15.084), (I-339)+(15.085), (I-339)+(15.086), (I-339)+(15.087), (I-339)+(15.088), (I-339)+(15.089), (I-339)+(15.090), (I-339)+(15.091), (I-339)+(15.092), (I-339)+(15.093), (I-339)+(15.094), (I-339)+(15.095), (I-339)+(15.096), (I-339)+(15.097), (I-339)+(15.098), (I-339)+(15.099), (I-339)+(15.100), (I-339)+(15.101), (I-339)+(15.102), (I-339)+(15.103), (I-339)+(15.104), (I-339)+(15.105), (I-339)+(15.106), (I-339)+(15.107), (I-339)+(15.108), (I-339)+(15.109), (I-339)+(15.110), (I-339)+(15.111), (I-339)+(15.112), (I-339)+(15.113), (I-339)+(15.114), (I-339)+(15.115), (I-339)+(15.116), (I-339)+(15.117), (I-339)+(15.118), (I-339)+(15.119), (I-339)+(15.120), (I-339)+(15.121), (I-339)+(15.122), (I-339)+(15.123), (I-339)+(15.124), (I-339)+(15.125), (I-339)+(15.126), (I-339)+(15.127), (I-339)+(15.128), (I-339)+(16.001), (I-339)+(16.002), (I-339)+(16.003), (I-339)+(16.004), (I-339)+(16.005), (I-339)+(16.006), (I-339)+(16.007), (I-339)+(16.008), (I-339)+(17.001), (I-339)+(17.002), (I-339)+(17.003), (I-339)+(17.004), (I-339)+(17.005), (I-339)+(17.006), (I-339)+(17.007), (I-339)+(17.008), (I-339)+(17.009), (I-339)+(17.010), (I-339)+(17.011), (I-339)+(17.012) and (I-339)+(18.001).

Also preferred compound combinations are selected from group (G6) consisting of the following mixtures:

(I-339)+(1.001), (I-339)+(1.002), (I-339)+(1.003), (I-339)+(1.004), (I-339)+(1.005), (I-339)+(1.006), (I-339)+(1.007), (I-339)+(1.008), (I-339)+(1.009), (I-339)+(1.010), (I-339)+(1.011), (I-339)+(1.012), (I-339)+(1.013), (I-339)+(1.014), (I-339)+(1.015), (I-339)+(1.016), (I-339)+(1.017), (I-339)+(1.018), (I-339)+(1.019), (I-339)+(1.020), (I-339)+(1.021), (I-339)+(1.022), (I-339)+(1.023), (I-339)+(1.024), (I-339)+(1.025), (I-339)+(1.026), (I-339)+(1.027), (I-339)+(1.028), (I-339)+(1.029), (I-339)+(1.030), (I-339)+(1.031), (I-339)+(1.032), (I-339)+(1.033), (I-339)+(1.034), (I-339)+(1.035), (I-339)+(1.036), (I-339)+(1.037), (I-339)+(1.038), (I-339)+(1.039), (I-339)+(1.040), (I-339)+(1.041), (I-339)+(1.042), (I-339)+(1.043), (I-339)+(1.044), (I-339)+(1.045), (I-339)+(1.046), (I-339)+(1.047), (I-339)+(1.048), (I-339)+(1.049), (I-339)+(1.050), (I-339)+(1.051), (I-339)+(1.052), (I-339)+(1.053), (I-339)+(1.054), (I-339)+(1.055), (I-339)+(1.056), (I-339)+(1.057), (I-339)+(1.058), (I-339)+(1.059), (I-339)+(1.060), (I-339)+(1.061), (I-339)+(1.062), (I-339)+(1.063), (I-339)+(1.064), (I-339)+(1.065), (I-339)+(1.066), (I-339)+(1.067), (I-339)+(1.068), (I-339)+(1.069), (I-339)+(1.070), (I-339)+(1.071), (I-339)+(1.072), (I-339)+(1.073), (I-339)+(1.074), (I-339)+(1.075), (I-339)+(1.076), (I-339)+(1.077), (I-339)+(1.078), (I-339)+(1.079), (I-339)+(1.080), (I-339)+(1.081), (I-339)+(1.082), (I-339)+(1.083), (I-339)+(1.084), (I-339)+(1.085), (I-339)+(1.086), (I-339)+(1.087), (I-339)+(1.088), (I-339)+(1.089), (I-339)+(1.090), (I-339)+(1.091), (I-339)+(1.092), (I-339)+(2.001), (I-339)+(2.002), (I-339)+(2.003), (I-339)+(2.004), (I-339)+(2.005), (I-339)+(2.006), (I-339)+(2.007), (I-339)+(2.008), (I-339)+(2.009), (I-339)+(2.010), (I-339)+(2.011), (I-339)+(2.012), (I-339)+(2.013), (I-339)+(2.014), (I-339)+(2.015), (I-339)+(2.016), (I-339)+(2.017), (I-339)+(2.018), (I-339)+(2.019), (I-339)+(2.020), (I-339)+(2.021), (I-339)+(2.022), (I-339)+(2.023), (I-339)+(2.024), (I-339)+(2.025), (I-339)+(2.026), (I-339)+(2.027), (I-339)+(2.028), (I-339)+(2.029), (I-339)+(2.030), (I-339)+(2.031), (I-339)+(2.032), (I-339)+(2.033), (I-339)+(2.034), (I-339)+(2.035), (I-339)+(2.036), (I-339)+(2.037), (I-339)+(2.038), (I-339)+(2.039), (I-339)+(2.040), (I-339)+(2.041), (I-339)+(2.042), (I-339)+(2.043), (I-339)+(2.044), (I-339)+(2.045), (I-339)+(2.046), (I-339)+(2.047), (I-339)+(2.048), (I-339)+(2.049), (I-339)+(2.050), (I-339)+(2.051), (I-339)+(2.052), (I-339)+(2.053), (I-339)+(2.054), (I-339)+(2.055), (I-339)+(2.056), (I-339)+(2.057), (I-339)+(2.058), (I-339)+(2.059), (I-339)+(3.001), (I-339)+(3.002), (I-339)+(3.003), (I-339)+(3.004), (I-339)+(3.005), (I-339)+(3.006), (I-339)+(3.007), (I-339)+(3.008), (I-339)+(3.009), (I-339)+(3.010), (I-339)+(3.011), (I-339)+(3.012), (I-339)+(3.013), (I-339)+(3.014), (I-339)+(3.015), (I-339)+(3.016), (I-339)+(3.017), (I-339)+(3.018), (I-339)+(3.019), (I-339)+(3.020), (I-339)+(3.021), (I-339)+(3.022), (I-339)+(3.023), (I-339)+(3.024), (I-339)+(3.025), (I-339)+(3.026), (I-339)+(3.027), (I-339)+(3.028), (I-339)+(3.029), (I-339)+(3.030), (I-339)+(3.031), (I-339)+(4.001), (I-339)+(4.002), (I-339)+(4.003), (I-339)+(4.004), (I-339)+(4.005), (I-339)+(4.006), (I-339)+(4.007), (I-339)+(4.008), (I-339)+(4.009), (I-339)+(4.010), (I-339)+(4.011), (I-339)+(4.012), (I-339)+(4.013), (I-339)+(4.014), (I-339)+(4.015), (I-339)+(4.016), (I-339)+(4.017), (I-339)+(4.018), (I-339)+(4.019), (I-339)+(4.020), (I-339)+(4.021), (I-339)+(4.022), (I-339)+(4.023), (I-339)+(4.024), (I-339)+(4.025), (I-339)+(4.026), (I-339)+(5.001), (I-339)+(5.002), (I-339)+(5.003), (I-339)+(5.004), (I-339)+(5.005), (I-339)+(5.006), (I-339)+(5.007), (I-339)+(5.008), (I-339)+(5.009), (I-339)+(5.010), (I-339)+(5.011), (I-339)+(5.012), (I-339)+(5.013), (I-339)+(5.014), (I-339)+(5.015), (I-339)+(5.016), (I-339)+(5.017), (I-339)+(5.018), (I-339)+(5.019), (I-339)+(5.020), (I-339)+(5.021), (I-339)+(5.022), (I-339)+(5.023), (I-339)+(6.001), (I-339)+(6.002), (I-339)+(6.003), (I-339)+(6.004), (I-339)+(7.001), (I-339)+(7.002), (I-339)+(7.003), (I-339)+(7.004), (I-339)+(7.005), (I-339)+(7.006), (I-339)+(8.001), (I-339)+(9.001), (I-339)+(9.002), (I-339)+(9.003), (I-339)+(9.004), (I-339)+(9.005), (I-339)+(9.006), (I-339)+(9.007), (I-339)+(9.008), (I-339)+(9.009), (I-339)+(10.001), (I-339)+(10.002), (I-339)+(10.003), (I-339)+(11.001), (I-339)+(11.002), (I-339)+(12.001), (I-339)+(12.002), (I-339)+(12.003), (I-339)+(12.004), (I-339)+(13.001), (I-339)+(13.002), (I-339)+(13.003), (I-339)+(13.004), (I-339)+(13.005), (I-339)+(13.006), (I-339)+(14.001), (I-339)+(14.002), (I-339)+(15.001), (I-339)+(15.002), (I-339)+(15.003), (I-339)+(15.004), (I-339)+(15.005), (I-339)+(15.006), (I-339)+(15.007), (I-339)+(15.008), (I-339)+(15.009), (I-339)+(15.010), (I-339)+(15.011), (I-339)+(15.012), (I-339)+(15.013), (I-339)+(15.014), (I-339)+(15.015), (I-339)+(15.016), (I-339)+(15.017), (I-339)+(15.018), (I-339)+(15.019), (I-339)+(15.020), (I-339)+(15.021), (I-339)+(15.022), (I-339)+(15.023), (I-339)+(15.024), (I-339)+(15.025), (I-339)+(15.026), (I-339)+(15.027), (I-339)+(15.028), (I-339)+(15.029), (I-339)+(15.030), (I-339)+(15.031), (I-339)+(15.032), (I-339)+(15.033), (I-339)+(15.034), (I-339)+(15.035), (I-339)+(15.036), (I-339)+(15.037), (I-339)+(15.038), (I-339)+(15.039), (I-339)+(15.040), (I-339)+(15.041), (I-339)+(15.042), (I-339)+(15.043), (I-339)+(15.044), (I-339)+(15.045), (I-339)+(15.046), (I-339)+(15.047), (I-339)+(15.048), (I-339)+(15.049), (I-339)+(15.050), (I-339)+(15.051), (I-339)+(15.052), (I-339)+(15.053), (I-339)+(15.054), (I-339)+(15.055), (I-339)+(15.056), (I-339)+(15.057), (I-339)+(15.058), (I-339)+(15.059), (I-339)+(15.060), (I-339)+(15.061), (I-339)+(15.062), (I-339)+(15.063), (I-339)+(15.064), (I-339)+(15.065), (I-339)+(15.066), (I-339)+(15.067), (I-339)+(15.068), (I-339)+(15.069), (I-339)+(15.070), (I-339)+(15.071), (I-339)+(15.072), (I-339)+(15.073), (I-339)+(15.074), (I-339)+(15.075), (I-339)+(15.076), (I-339)+(15.077), (I-339)+(15.078), (I-339)+(15.079), (I-339)+(15.080), (I-339)+(15.081), (I-339)+(15.082), (I-339)+(15.083), (I-339)+(15.084), (I-339)+(15.085), (I-339)+(15.086), (I-339)+(15.087), (I-339)+(15.088), (I-339)+(15.089), (I-339)+(15.090), (I-339)+(15.091), (I-339)+(15.092), (I-339)+(15.093), (I-339)+(15.094), (I-339)+(15.095), (I-339)+(15.096), (I-339)+(15.097), (I-339)+(15.098), (I-339)+(15.099), (I-339)+(15.100), (I-339)+(15.101), (I-339)+(15.102), (I-339)+(15.103), (I-339)+(15.104), (I-339)+(15.105), (I-339)+(15.106), (I-339)+(15.107), (I-339)+(15.108), (I-339)+(15.109), (I-339)+(15.110), (I-339)+(15.111), (I-339)+(15.112), (I-339)+(15.113), (I-339)+(15.114), (I-339)+(15.115), (I-339)+(15.116), (I-339)+(15.117), (I-339)+(15.118), (I-339)+(15.119), (I-339)+(15.120), (I-339)+(15.121), (I-339)+(15.122), (I-339)+(15.123), (I-339)+(15.124), (I-339)+(15.125), (I-339)+(15.126), (I-339)+(15.127), (I-339)+(16.001), (I-339)+(16.002), (I-339)+(16.003), (I-339)+(16.004), (I-339)+(16.005), (I-339)+(16.006), (I-339)+(16.007), (I-339)+(16.008), (I-339)+(17.001), (I-339)+(17.002), (I-339)+(17.003), (I-339)+(17.004), (I-339)+(17.005), (I-339)+(17.006), (I-339)+(17.007), (I-339)+(17.008), (I-339)+(17.009), (I-339)+(17.010), (I-339)+(17.011), (I-339)+(17.012) and (I-339)+(18.001).

More preferred the compound combinations are selected from the mixtures belonging to groups (G1-1), (G2-1), (G3-1), (G4-1), (G6-1) and (G7-1).

More preferred the compound combinations are selected from the mixtures belonging to groups (G1), (G3) and (G4).

Even more preferred compound combinations are selected from the group (G1-1A) consisting of the following mixtures:

(I-052)+(1.002), (I-052)+(1.004), (I-052)+(1.010), (I-052)+(1.012), (I-052)+(1.018), (I-052)+(1.020), (I-052)+(1.021), (I-052)+(1.026), (I-052)+(1.027), (I-052)+(1.055), (I-052)+(1.059), (I-052)+(1.062), (I-052)+(1.067), (I-052)+(1.081), (I-052)+(1.082), (I-052)+(1.092), (I-052)+(2.001), (I-052)+(2.002), (I-052)+(2.003), (I-052)+(2.005), (I-052)+(2.007), (I-052)+(2.017), (I-052)+(2.018), (I-052)+(2.019), (I-052)+(2.021), (I-052)+(2.028), (I-052)+(2.030), (I-052)+(2.038), (I-052)+(3.003), (I-052)+(3.012), (I-052)+(3.016), (I-052)+(3.017), (I-052)+(3.020), (I-052)+(3.025), (I-052)+(3.026), (I-052)+(3.030), (I-052)+(3.031), (I-052)+(4.005), (I-052)+(4.007), (I-052)+(4.012), (I-052)+(4.015), (I-052)+(4.025), (I-052)+(5.003), (I-052)+(5.004), (I-052)+(5.010), (I-052)+(5.012), (I-052)+(5.013), (I-052)+(5.015), (I-052)+(5.018), (I-052)+(6.002), (I-052)+(7.005), (I-052)+(9.004), (I-052)+(12.003), (I-052)+(12.004), (I-052)+(13.001), (I-052)+(13.004), (I-052)+(13.005), (I-052)+(14.001), (I-052)+(14.002), (I-052)+(15.008), (I-052)+(15.012), (I-052)+(15.016), (I-052)+(15.027), (I-052)+(15.043), (I-052)+(15.047), (I-052)+(15.048), (I-052)+(15.052), (I-052)+(15.062), (I-052)+(15.064), (I-052)+(16.001), (I-052)+(17.001), (I-052)+(17.012) and (I-052)+(18.001).

Even more preferred compound combinations are selected from the group (G1-A) consisting of the following mixtures:

(I-052)+(1.002), (I-052)+(1.004), (I-052)+(1.010), (I-052)+(1.012), (I-052)+(1.018), (I-052)+(1.020), (I-052)+(1.021), (I-052)+(1.026), (I-052)+(1.027), (I-052)+(1.055), (I-052)+(1.059), (I-052)+(1.081), (I-052)+(1.082), (I-052)+(1.092), (I-052)+(2.001), (I-052)+(2.002), (I-052)+(2.003), (I-052)+(2.005), (I-052)+(2.007), (I-052)+(2.017), (I-052)+(2.018), (I-052)+(2.019), (I-052)+(2.021), (I-052)+(2.028), (I-052)+(2.030), (I-052)+(2.038), (I-052)+(3.003), (I-052)+(3.012), (I-052)+(3.016), (I-052)+(3.017), (I-052)+(3.020), (I-052)+(3.025), (I-052)+(3.026), (I-052)+(3.030), (I-052)+(3.031), (I-052)+(4.005), (I-052)+(4.007), (I-052)+(4.012), (I-052)+(4.015), (I-052)+(4.025), (I-052)+(5.003), (I-052)+(5.004), (I-052)+(5.010), (I-052)+(5.012), (I-052)+(5.013), (I-052)+(5.015), (I-052)+(5.018), (I-052)+(6.002), (I-052)+(7.005), (I-052)+(9.004), (I-052)+(12.003), (I-052)+(12.004), (I-052)+(13.001), (I-052)+(13.004), (I-052)+(13.005), (I-052)+(14.001), (I-052)+(14.002), (I-052)+(15.008), (I-052)+(15.012), (I-052)+(15.016), (I-052)+(15.027), (I-052)+(15.047), (I-052)+(15.048), (I-052)+(15.052), (I-052)+(15.062), (I-052)+(15.064), (I-052)+(16.001), (I-052)+(17.001), (I-052)+(17.012) and (I-052)+(18.001).

Even more preferred compound combinations are selected from the group (G2-1A) consisting of the following mixtures:

(I-130)+(1.002), (I-130)+(1.004), (I-130)+(1.010), (I-130)+(1.012), (I-130)+(1.018), (I-130)+(1.020), (I-130)+(1.021), (I-130)+(1.026), (I-130)+(1.027), (I-130)+(1.055), (I-130)+(1.059), (I-130)+(1.062), (I-130)+(1.067), (I-130)+(1.081), (I-130)+(1.082), (I-130)+(1.092), (I-130)+(2.001), (I-130)+(2.002), (I-130)+(2.003), (I-130)+(2.005), (I-130)+(2.007), (I-130)+(2.017), (I-130)+(2.018), (I-130)+(2.019), (I-130)+(2.021), (I-130)+(2.028), (I-130)+(2.030), (I-130)+(2.038), (I-130)+(3.003), (I-130)+(3.012), (I-130)+(3.016), (I-130)+(3.017), (I-130)+(3.020), (I-130)+(3.025), (I-130)+(3.026), (I-130)+(3.030), (I-130)+(3.031), (I-130)+(4.005), (I-130)+(4.007), (I-130)+(4.012), (I-130)+(4.015), (I-130)+(4.025), (I-130)+(5.003), (I-130)+(5.004), (I-130)+(5.010), (I-130)+(5.012), (I-130)+(5.013), (I-130)+(5.015), (I-130)+(5.018), (I-130)+(6.002), (I-130)+(7.005), (I-130)+(9.004), (I-130)+(12.003), (I-130)+(12.004), (I-130)+(13.001), (I-130)+(13.004), (I-130)+(13.005), (I-130)+(14.001), (I-130)+(14.002), (I-130)+(15.008), (I-130)+(15.012), (I-130)+(15.016), (I-130)+(15.027), (I-130)+(15.043), (I-130)+(15.047), (I-130)+(15.048), (I-130)+(15.052), (I-130)+(15.062), (I-130)+(15.064), (I-130)+(16.001), (I-130)+(17.001), (I-130)+(17.012) and (I-130)+(18.001).

Even more preferred compound combinations are also selected from the group (G3-1A) consisting of the following mixtures:

(I-300)+(1.002), (I-300)+(1.004), (I-300)+(1.010), (I-300)+(1.012), (I-300)+(1.018), (I-300)+(1.020), (I-300)+(1.021), (I-300)+(1.026), (I-300)+(1.027), (I-300)+(1.055), (I-300)+(1.059), (I-300)+(1.062), (I-300)+(1.067), (I-300)+(1.081), (I-300)+(1.082), (I-300)+(1.092), (I-300)+(2.001), (I-300)+(2.002), (I-300)+(2.003), (I-300)+(2.005), (I-300)+(2.007), (I-300)+(2.017), (I-300)+(2.018), (I-300)+(2.019), (I-300)+(2.021), (I-300)+(2.028), (I-300)+(2.030), (I-300)+(2.038), (I-300)+(3.003), (I-300)+(3.012), (I-300)+(3.016), (I-300)+(3.017), (I-300)+(3.020), (I-300)+(3.025), (I-300)+(3.026), (I-300)+(3.030), (I-300)+(3.031), (I-300)+(4.005), (I-300)+(4.007), (I-300)+(4.012), (I-300)+(4.015), (I-300)+(4.025), (I-300)+(5.003), (I-300)+(5.004), (I-300)+(5.010), (I-300)+(5.012), (I-300)+(5.013), (I-300)+(5.015), (I-300)+(5.018), (I-300)+(6.002), (I-300)+(7.005), (I-300)+(9.004), (I-300)+(12.003), (I-300)+(12.004), (I-300)+(13.001), (I-300)+(13.004), (I-300)+(13.005), (I-300)+(14.001), (I-300)+(14.002), (I-300)+(15.008), (I-300)+(15.012), (I-300)+(15.016), (I-300)+(15.027), (I-300)+(15.043), (I-300)+(15.047), (I-300)+(15.048), (I-300)+(15.052), (I-300)+(15.062), (I-300)+(15.064), (I-300)+(16.001), (I-300)+(17.001), (I-300)+(17.012) and (I-300)+(18.001).

Even more preferred compound combinations are also selected from the group (G3-A) consisting of the following mixtures:

(I-300)+(1.002), (I-300)+(1.004), (I-300)+(1.010), (I-300)+(1.012), (I-300)+(1.018), (I-300)+(1.020), (I-300)+(1.021), (I-300)+(1.026), (I-300)+(1.027), (I-300)+(1.055), (I-300)+(1.059), (I-300)+(1.081), (I-300)+(1.082), (I-300)+(1.092), (I-300)+(2.001), (I-300)+(2.002), (I-300)+(2.003), (I-300)+(2.005), (I-300)+(2.007), (I-300)+(2.017), (I-300)+(2.018), (I-300)+(2.019), (I-300)+(2.021), (I-300)+(2.028), (I-300)+(2.030), (I-300)+(2.038), (I-300)+(3.003), (I-300)+(3.012), (I-300)+(3.016), (I-300)+(3.017), (I-300)+(3.020), (I-300)+(3.025), (I-300)+(3.026), (I-300)+(3.030), (I-300)+(3.031), (I-300)+(4.005), (I-300)+(4.007), (I-300)+(4.012), (I-300)+(4.015), (I-300)+(4.025), (I-300)+(5.003), (I-300)+(5.004), (I-300)+(5.010), (I-300)+(5.012), (I-300)+(5.013), (I-300)+(5.015), (I-300)+(5.018), (I-300)+(6.002), (I-300)+(7.005), (I-300)+(9.004), (I-300)+(12.003), (I-300)+(12.004), (I-300)+(13.001), (I-300)+(13.004), (I-300)+(13.005), (I-300)+(14.001), (I-300)+(14.002), (I-300)+(15.008), (I-300)+(15.012), (I-300)+(15.016), (I-300)+(15.027), (I-300)+(15.047), (I-300)+(15.048), (I-300)+(15.052), (I-300)+(15.062), (I-300)+(15.064), (I-300)+(16.001), (I-300)+(17.001), (I-300)+(17.012) and (I-300)+(18.001).

Even more preferred compound combinations are also selected from the group (G4-1A) consisting of the following mixtures:

(I-302)+(1.002), (I-302)+(1.004), (I-302)+(1.010), (I-302)+(1.012), (I-302)+(1.018), (I-302)+(1.020), (I-302)+(1.021), (I-302)+(1.026), (I-302)+(1.027), (I-302)+(1.055), (I-302)+(1.059), (I-302)+(1.062), (I-302)+(1.067), (I-302)+(1.081), (I-302)+(1.082), (I-302)+(1.092), (I-302)+(2.001), (I-302)+(2.002), (I-302)+(2.003), (I-302)+(2.005), (I-302)+(2.007), (I-302)+(2.017), (I-302)+(2.018), (I-302)+(2.019), (I-302)+(2.021), (I-302)+(2.028), (I-302)+(2.030), (I-302)+(2.038), (I-302)+(3.003), (I-302)+(3.012), (I-302)+(3.016), (I-302)+(3.017), (I-302)+(3.020), (I-302)+(3.025), (I-302)+(3.026), (I-302)+(3.030), (I-302)+(3.031), (I-302)+(4.005), (I-302)+(4.007), (I-302)+(4.012), (I-302)+(4.015), (I-302)+(4.025), (I-302)+(5.003), (I-302)+(5.004), (I-302)+(5.010), (I-302)+(5.012), (I-302)+(5.013), (I-302)+(5.015), (I-302)+(5.018), (I-302)+(6.002), (I-302)+(7.005), (I-302)+(9.004), (I-302)+(12.003), (I-302)+(12.004), (I-302)+(13.001), (I-302)+(13.004), (I-302)+(13.005), (I-302)+(14.001), (I-302)+(14.002), (I-302)+(15.008), (I-302)+(15.012), (I-302)+(15.016), (I-302)+(15.027), (I-302)+(15.043), (I-302)+(15.047), (I-302)+(15.048), (I-302)+(15.052), (I-302)+(15.062), (I-302)+(15.064), (I-302)+(16.001), (I-302)+(17.001), (I-302)+(17.012) and (I-302)+(18.001).

Even more preferred compound combinations are also selected from the group (G4-A) consisting of the following mixtures:

(I-302)+(1.002), (I-302)+(1.004), (I-302)+(1.010), (I-302)+(1.012), (I-302)+(1.018), (I-302)+(1.020), (I-302)+(1.021), (I-302)+(1.026), (I-302)+(1.027), (I-302)+(1.055), (I-302)+(1.059), (I-302)+(1.081), (I-302)+(1.082), (I-302)+(1.092), (I-302)+(2.001), (I-302)+(2.002), (I-302)+(2.003), (I-302)+(2.005), (I-302)+(2.007), (I-302)+(2.017), (I-302)+(2.018), (I-302)+(2.019), (I-302)+(2.021), (I-302)+(2.028), (I-302)+(2.030), (I-302)+(2.038), (I-302)+(3.003), (I-302)+(3.012), (I-302)+(3.016), (I-302)+(3.017), (I-302)+(3.020), (I-302)+(3.025), (I-302)+(3.026), (I-302)+(3.030), (I-302)+(3.031), (I-302)+(4.005), (I-302)+(4.007), (I-302)+(4.012), (I-302)+(4.015), (I-302)+(4.025), (I-302)+(5.003), (I-302)+(5.004), (I-302)+(5.010), (I-302)+(5.012), (I-302)+(5.013), (I-302)+(5.015), (I-302)+(5.018), (I-302)+(6.002), (I-302)+(7.005), (I-302)+(9.004), (I-302)+(12.003), (I-302)+(12.004), (I-302)+(13.001), (I-302)+(13.004), (I-302)+(13.005), (I-302)+(14.001), (I-302)+(14.002), (I-302)+(15.008), (I-302)+(15.012), (I-302)+(15.016), (I-302)+(15.027), (I-302)+(15.047), (I-302)+(15.048), (I-302)+(15.052), (I-302)+(15.062), (I-302)+(15.064), (I-302)+(16.001), (I-302)+(17.001), (I-302)+(17.012) and (I-302)+(18.001).

Even more preferred compound combinations are also selected from the group (G6-1A) consisting of the following mixtures:

(I-339)+(1.002), (I-339)+(1.004), (I-339)+(1.010), (I-339)+(1.012), (I-339)+(1.018), (I-339)+(1.020), (I-339)+(1.021), (I-339)+(1.026), (I-339)+(1.027), (I-339)+(1.055), (I-339)+(1.059), (I-339)+(1.062), (I-339)+(1.067), (I-339)+(1.081), (I-339)+(1.082), (I-339)+(1.092), (I-339)+(2.001), (I-339)+(2.002), (I-339)+(2.003), (I-339)+(2.005), (I-339)+(2.007), (I-339)+(2.017), (I-339)+(2.018), (I-339)+(2.019), (I-339)+(2.021), (I-339)+(2.028), (I-339)+(2.030), (I-339)+(2.038), (I-339)+(3.003), (I-339)+(3.012), (I-339)+(3.016), (I-339)+(3.017), (I-339)+(3.020), (I-339)+(3.025), (I-339)+(3.026), (I-339)+(3.030), (I-339)+(3.031), (I-339)+(4.005), (I-339)+(4.007), (I-339)+(4.012), (I-339)+(4.015), (I-339)+(4.025), (I-339)+(5.003), (I-339)+(5.004), (I-339)+(5.010), (I-339)+(5.012), (I-339)+(5.013), (I-339)+(5.015), (I-339)+(5.018), (I-339)+(6.002), (I-339)+(7.005), (I-339)+(9.004), (I-339)+(12.003), (I-339)+(12.004), (I-339)+(13.001), (I-339)+(13.004), (I-339)+(13.005), (I-339)+(14.001), (I-339)+(14.002), (I-339)+(15.008), (I-339)+(15.012), (I-339)+(15.016), (I-339)+(15.027), (I-339)+(15.043), (I-339)+(15.047), (I-339)+(15.048), (I-339)+(15.052), (I-339)+(15.062), (I-339)+(15.064), (I-339)+(16.001), (I-339)+(17.001), (I-339)+(17.012) and (I-339)+(18.001).

Even more preferred compound combinations are also selected from the group (G7-1A) consisting of the following mixtures:

(I-338)+(1.002), (I-338)+(1.004), (I-338)+(1.010), (I-338)+(1.012), (I-338)+(1.018), (I-338)+(1.020), (I-338)+(1.021), (I-338)+(1.026), (I-338)+(1.027), (I-338)+(1.055), (I-338)+(1.059), (I-338)+(1.062), (I-338)+(1.067), (I-338)+(1.081), (I-338)+(1.082), (I-338)+(1.092), (I-338)+(2.001), (I-338)+(2.002), (I-338)+(2.003), (I-338)+(2.005), (I-338)+(2.007), (I-338)+(2.017), (I-338)+(2.018), (I-338)+(2.019), (I-338)+(2.021), (I-338)+(2.028), (I-338)+(2.030), (I-338)+(2.038), (I-338)+(3.003), (I-338)+(3.012), (I-338)+(3.016), (I-338)+(3.017), (I-338)+(3.020), (I-338)+(3.025), (I-338)+(3.026), (I-338)+(3.030), (I-338)+(3.031), (I-338)+(4.005), (I-338)+(4.007), (I-338)+(4.012), (I-338)+(4.015), (I-338)+(4.025), (I-338)+(5.003), (I-338)+(5.004), (I-338)+(5.010), (I-338)+(5.012), (I-338)+(5.013), (I-338)+(5.015), (I-338)+(5.018), (I-338)+(6.002), (I-338)+(7.005), (I-338)+(9.004), (I-338)+(12.003), (I-338)+(12.004), (I-338)+(13.001), (I-338)+(13.004), (I-338)+(13.005), (I-338)+(14.001), (I-338)+(14.002), (I-338)+(15.008), (I-338)+(15.012), (I-338)+(15.016), (I-338)+(15.027), (I-338)+(15.043), (I-338)+(15.047), (I-338)+(15.048), (I-338)+(15.052), (I-338)+(15.062), (I-338)+(15.064), (I-338)+(16.001), (I-338)+(17.001), (I-338)+(17.012) and (I-338)+(18.001).

Still even more preferred compound combinations are selected from the group (G1-A) consisting of the following mixtures:

(I-052)+(1.002), (I-052)+(1.018), (I-052)+(1.020), (I-052)+(1.021), (I-052)+(1.055), (I-052)+(2.002), (I-052)+(2.005), (I-052)+(2.028), (I-052)+(2.038), (I-052)+(3.020), (I-052)+(3.025), (I-052)+(5.003), (I-052)+(5.010), (I-052)+(5.012), (I-052)+(5.013), (I-052)+(5.018), (I-052)+(6.002), (I-052)+(7.005), (I-052)+(13.001), (I-052)+(13.004), (I-052)+(13.005), (I-052)+(15.012), (I-052)+(15.016), (I-052)+(15.064), (I-052)+(17.001), (I-052)+(17.012) and (I-052)+(18.001).

Still even more preferred compound combinations are also selected from the group (G3-A) consisting of the following mixtures:

(I-300)+(1.002), (I-300)+(1.018), (I-300)+(1.020), (I-300)+(1.021), (I-300)+(1.055), (I-300)+(2.002), (I-300)+(2.005), (I-300)+(2.028), (I-300)+(2.038), (I-300)+(3.020), (I-300)+(3.025), (I-300)+(5.003), (I-300)+(5.010), (I-300)+(5.012), (I-300)+(5.013), (I-300)+(5.018), (I-300)+(6.002), (I-300)+(7.005), (I-300)+(13.001), (I-300)+(13.004), (I-300)+(13.005), (I-300)+(15.012), (I-300)+(15.016), (I-300)+(15.064), (I-300)+(17.001), (I-300)+(17.012) and (I-300)+(18.001).

Still even more preferred compound combinations are also selected from the group (G4-A) consisting of the following mixtures:

(I-302)+(1.002), (I-302)+(1.018), (I-302)+(1.020), (I-302)+(1.021), (I-302)+(1.055), (I-302)+(2.002), (I-302)+(2.005), (I-302)+(2.028), (I-302)+(2.038), (I-302)+(3.020), (I-302)+(3.025), (I-302)+(5.003), (I-302)+(5.010), (I-302)+(5.012), (I-302)+(5.013), (I-302)+(5.018), (I-302)+(6.002), (I-302)+(7.005), (I-302)+(13.001), (I-302)+(13.004), (I-302)+(13.005), (I-302)+(15.012), (I-302)+(15.016), (I-302)+(15.064), (I-300)+(17.001), (I-302)+(17.012) and (I-302)+(18.001).

Still even more preferred compound combinations are also selected from the group (G2-1A) consisting of the following mixtures:

(I-130)+(1.002), (I-130)+(1.018), (I-130)+(1.020), (I-130)+(1.021), (I-130)+(1.055), (I-130)+(1.067), (I-130)+(2.002), (I-130)+(2.005), (I-130)+(2.017), (I-130)+(2.028), (I-130)+(2.038), (I-130)+(3.012), (I-130)+(3.025), (I-130)+(3.030), (I-130)+(5.003), (I-130)+(5.010), (I-130)+(5.012), (I-130)+(5.013), (I-130)+(5.018), (I-130)+(6.002), (I-130)+(7.005), (I-130)+(12.004), (I-130)+(13.001), (I-130)+(13.004), (I-130)+(13.005), (I-130)+(15.012), (I-130)+(15.016), (I-130)+(15.043), (I-130)+(17.001) and (I-130)+(17.012)

Still even more preferred compound combinations are also selected from the group (G7-A1) consisting of the following mixtures:

(I-338)+(1.002), (I-338)+(1.018), (I-338)+(1.020), (I-338)+(1.021), (I-338)+(1.055), (I-338)+(1.067), (I-338)+(2.002), (I-338)+(2.005), (I-338)+(2.017), (I-338)+(2.028), (I-338)+(2.038), (I-338)+(3.012), (I-338)+(3.020), (I-338)+(3.025), (I-338)+(3.030), (I-338)+(5.003), (I-338)+(5.010), (I-338)+(5.012), (I-338)+(5.013), (I-338)+(5.018), (I-338)+(6.002), (I-338)+(7.005), (I-338)+(12.004), (I-338)+(13.001), (I-338)+(13.004), (I-338)+(13.005), (I-338)+(15.012), (I-338)+(15.016), (I-338)+(15.043), (I-338)+(17.001) and (I-338)+(17.012)

Still even more preferred compound combinations are also selected from the group (G6-A1) consisting of the following mixtures:

(I-339)+(1.002), (I-339)+(1.018), (I-339)+(1.020), (I-339)+(1.021), (I-339)+(1.055), (I-339)+(1.067), (I-339)+(2.002), (I-339)+(2.005), (I-339)+(2.017), (I-339)+(2.028), (I-339)+(2.038), (I-339)+(3.012), (I-339)+(3.020), (I-339)+(3.025), (I-339)+(3.030), (I-339)+(5.003), (I-339)+(5.010), (I-339)+(5.012), (I-339)+(5.013), (I-339)+(5.018), (I-339)+(6.002), (I-339)+(7.005), (I-339)+(12.004), (I-339)+(13.001), (I-339)+(13.004), (I-339)+(13.005), (I-339)+(15.012), (I-339)+(15.016), (I-339)+(15.043), (I-339)+(17.001) and (I-339)+(17.012)

If two compounds (B) are present in the combinations according to the invention, preferred compound combinations are selected from the group (G1-C) consisting of the following mixtures:

(I-052)+(1.001)+(1.002), (I-052)+(1.001)+(1.003), (I-052)+(1.001)+(1.004), (I-052)+(1.001)+(1.005), (I-052)+(1.001)+(1.006), (I-052)+(1.001)+(1.007), (I-052)+(1.001)+(1.008), (I-052)+(1.001)+(1.009), (I-052)+(1.001)+(1.010), (I-052)+(1.001)+(1.011), (I-052)+(1.001)+(1.012), (I-052)+(1.001)+(1.013), (I-052)+(1.001)+(1.014), (I-052)+(1.001)+(1.015), (I-052)+(1.001)+(1.016), (I-052)+(1.001)+(1.017), (I-052)+(1.001)+(1.018), (I-052)+(1.001)+(1.019), (I-052)+(1.001)+(1.020), (I-052)+(1.001)+(1.021), (I-052)+(1.001)+(1.022), (I-052)+(1.001)+(1.023), (I-052)+(1.001)+(1.024), (I-052)+(1.001)+(1.025), (I-052)+(1.001)+(1.026), (I-052)+(1.001)+(1.027), (I-052)+(1.001)+(1.028), (I-052)+(1.001)+(1.029), (I-052)+(1.001)+(1.030), (I-052)+(1.001)+(1.031), (I-052)+(1.001)+(1.032), (I-052)+(1.001)+(1.033), (I-052)+(1.001)+(1.034), (I-052)+(1.001)+(1.035), (I-052)+(1.001)+(1.036), (I-052)+(1.001)+(1.037), (I-052)+(1.001)+(1.038), (I-052)+(1.001)+(1.039), (I-052)+(1.001)+(1.040), (I-052)+(1.001)+(1.041), (I-052)+(1.001)+(1.042), (I-052)+(1.001)+(1.043), (I-052)+(1.001)+(1.044), (I-052)+(1.001)+(1.045), (I-052)+(1.001)+(1.046), (I-052)+(1.001)+(1.047), (I-052)+(1.001)+(1.048), (I-052)+(1.001)+(1.049), (I-052)+(1.001)+(1.050), (I-052)+(1.001)+(1.051), (I-052)+(1.001)+(1.052), (I-052)+(1.001)+(1.053), (I-052)+(1.001)+(1.054), (I-052)+(1.001)+(1.055), (I-052)+(1.001)+(1.056), (I-052)+(1.001)+(1.057), (I-052)+(1.001)+(1.058), (I-052)+(1.001)+(1.059), (I-052)+(1.001)+(1.060), (I-052)+(1.001)+(1.061), (I-052)+(1.001)+(1.062), (I-052)+(1.001)+(1.063), (I-052)+(1.001)+(1.064), (I-052)+(1.001)+(1.065), (I-052)+(1.001)+(1.066), (I-052)+(1.001)+(1.067), (I-052)+(1.001)+(1.068), (I-052)+(1.001)+(1.069), (I-052)+(1.001)+(1.070), (I-052)+(1.001)+(1.071), (I-052)+(1.001)+(1.072), (I-052)+(1.001)+(1.073), (I-052)+(1.001)+(1.074), (I-052)+(1.001)+(1.075), (I-052)+(1.001)+(1.076), (I-052)+(1.001)+(1.077), (I-052)+(1.001)+(1.078), (I-052)+(1.001)+(1.079), (I-052)+(1.001)+(1.080), (I-052)+(1.001)+(1.081), (I-052)+(1.001)+(1.082), (I-052)+(1.001)+(1.083), (I-052)+(1.001)+(1.084), (I-052)+(1.001)+(1.085), (I-052)+(1.001)+(1.086), (I-052)+(1.001)+(1.087), (I-052)+(1.001)+(1.088), (I-052)+(1.001)+(1.089), (I-052)+(1.001)+(1.090), (I-052)+(1.001)+(1.091), (I-052)+(1.001)+(1.092), (I-052)+(1.001)+(2.001), (I-052)+(1.001)+(2.002), (I-052)+(1.001)+(2.003), (I-052)+(1.001)+(2.004), (I-052)+(1.001)+(2.005), (I-052)+(1.001)+(2.006), (I-052)+(1.001)+(2.007), (I-052)+(1.001)+(2.008), (I-052)+(1.001)+(2.009), (I-052)+(1.001)+(2.010), (I-052)+(1.001)+(2.011), (I-052)+(1.001)+(2.012), (I-052)+(1.001)+(2.013), (I-052)+(1.001)+(2.014), (I-052)+(1.001)+(2.015), (I-052)+(1.001)+(2.016), (I-052)+(1.001)+(2.017), (I-052)+(1.001)+(2.018), (I-052)+(1.001)+(2.019), (I-052)+(1.001)+(2.020), (I-052)+(1.001)+(2.021), (I-052)+(1.001)+(2.022), (I-052)+(1.001)+(2.023), (I-052)+(1.001)+(2.024), (I-052)+(1.001)+(2.025), (I-052)+(1.001)+(2.026), (I-052)+(1.001)+(2.027), (I-052)+(1.001)+(2.028), (I-052)+(1.001)+(2.029), (I-052)+(1.001)+(2.030), (I-052)+(1.001)+(2.031), (I-052)+(1.001)+(2.032), (I-052)+(1.001)+(2.033), (I-052)+(1.001)+(2.034), (I-052)+(1.001)+(2.035), (I-052)+(1.001)+(2.036), (I-052)+(1.001)+(2.037), (I-052)+(1.001)+(2.038), (I-052)+(1.001)+(2.039), (I-052)+(1.001)+(2.040), (I-052)+(1.001)+(2.041), (I-052)+(1.001)+(2.042), (I-052)+(1.001)+(2.043), (I-052)+(1.001)+(2.044), (I-052)+(1.001)+(2.045), (I-052)+(1.001)+(2.046), (I-052)+(1.001)+(2.047), (I-052)+(1.001)+(2.048), (I-052)+(1.001)+(2.049), (I-052)+(1.001)+(2.050), (I-052)+(1.001)+(2.051), (I-052)+(1.001)+(2.052), (I-052)+(1.001)+(2.053), (I-052)+(1.001)+(2.054), (I-052)+(1.001)+(2.055), (I-052)+(1.001)+(2.056), (I-052)+(1.001)+(2.057), (I-052)+(1.001)+(2.058), (I-052)+(1.001)+(2.059), (I-052)+(1.001)+(3.001), (I-052)+(1.001)+(3.002), (I-052)+(1.001)+(3.003), (I-052)+(1.001)+(3.004), (I-052)+(1.001)+(3.005), (I-052)+(1.001)+(3.006), (I-052)+(1.001)+(3.007), (I-052)+(1.001)+(3.008), (I-052)+(1.001)+(3.009), (I-052)+(1.001)+(3.010), (I-052)+(1.001)+(3.011), (I-052)+(1.001)+(3.012), (I-052)+(1.001)+(3.013), (I-052)+(1.001)+(3.014), (I-052)+(1.001)+(3.015), (I-052)+(1.001)+(3.016), (I-052)+(1.001)+(3.017), (I-052)+(1.001)+(3.018), (I-052)+(1.001)+(3.019), (I-052)+(1.001)+(3.020), (I-052)+(1.001)+(3.021), (I-052)+(1.001)+(3.022), (I-052)+(1.001)+(3.023), (I-052)+(1.001)+(3.024), (I-052)+(1.001)+(3.025), (I-052)+(1.001)+(3.026), (I-052)+(1.001)+(3.027), (I-052)+(1.001)+(3.028), (I-052)+(1.001)+(3.029), (I-052)+(1.001)+(3.030), (I-052)+(1.001)+(3.031), (I-052)+(1.001)+(5.001), (I-052)+(1.001)+(5.002), (I-052)+(1.001)+(5.003), (I-052)+(1.001)+(5.004), (I-052)+(1.001)+(5.005), (I-052)+(1.001)+(5.006), (I-052)+(1.001)+(5.007), (I-052)+(1.001)+(5.008), (I-052)+(1.001)+(5.009), (I-052)+(1.001)+(5.010), (I-052)+(1.001)+(5.011), (I-052)+(1.001)+(5.012), (I-052)+(1.001)+(5.013), (I-052)+(1.001)+(5.014), (I-052)+(1.001)+(5.015), (I-052)+(1.001)+(5.016), (I-052)+(1.001)+(5.017), (I-052)+(1.001)+(5.018), (I-052)+(1.001)+(5.019), (I-052)+(1.001)+(5.020), (I-052)+(1.001)+(5.021), (I-052)+(1.001)+(5.022), (I-052)+(1.001)+(5.023), (I-052)+(1.001)+(6.001), (I-052)+(1.001)+(6.002), (I-052)+(1.001)+(6.003), (I-052)+(1.001)+(6.004), (I-052)+(1.001)+(7.001), (I-052)+(1.001)+(7.002), (I-052)+(1.001)+(7.003), (I-052)+(1.001)+(7.004), (I-052)+(1.001)+(7.005), (I-052)+(1.001)+(7.006), (I-052)+(1.001)+(9.001), (I-052)+(1.001)+(9.002), (I-052)+(1.001)+(9.003), (I-052)+(1.001)+(9.004), (I-052)+(1.001)+(9.005), (I-052)+(1.001)+(9.006), (I-052)+(1.001)+(9.007), (I-052)+(1.001)+(9.008), (I-052)+(1.001)+(9.009), (I-052)+(1.001)+(14.001), (I-052)+(1.001)+(14.002), (I-052)+(1.001)+(15.008), (I-052)+(1.001)+(15.011), (I-052)+(1.001)+(15.012), (I-052)+(1.001)+(15.016), (I-052)+(1.001)+(15.025), (I-052)+(1.001)+(15.027), (I-052)+(1.001)+(15.047), (I-052)+(1.001)+(15.063), (I-052)+(1.001)+(15.064), (I-052)+(1.001)+(16.001), (I-052)+(1.001)+(16.002), (I-052)+(1.001)+(16.003), (I-052)+(1.001)+(16.004), (I-052)+(1.001)+(16.005), (I-052)+(1.001)+(16.006), (I-052)+(1.001)+(16.007), (I-052)+(1.001)+(16.008), (I-052)+(1.001)+(17.001), (I-052)+(1.001)+(17.002), (I-052)+(1.001)+(17.003), (I-052)+(1.001)+(17.004), (I-052)+(1.001)+(17.005), (I-052)+(1.001)+(17.006), (I-052)+(1.001)+(17.007), (I-052)+(1.001)+(17.008), (I-052)+(1.001)+(17.009), (I-052)+(1.001)+(17.010), (I-052)+(1.001)+(17.011), (I-052)+(1.001)+(17.012), (I-052)+(1.001)+(18.001), (I-052)+(1.002)+(1.003), (I-052)+(1.002)+(1.004), (I-052)+(1.002)+(1.005), (I-052)+(1.002)+(1.006), (I-052)+(1.002)+(1.007), (I-052)+(1.002)+(1.008), (I-052)+(1.002)+(1.009), (I-052)+(1.002)+(1.010), (I-052)+(1.002)+(1.011), (I-052)+(1.002)+(1.012), (I-052)+(1.002)+(1.013), (I-052)+(1.002)+(1.014), (I-052)+(1.002)+(1.015), (I-052)+(1.002)+(1.016), (I-052)+(1.002)+(1.017), (I-052)+(1.002)+(1.018), (I-052)+(1.002)+(1.019), (I-052)+(1.002)+(1.020), (I-052)+(1.002)+(1.021), (I-052)+(1.002)+(1.022), (I-052)+(1.002)+(1.023), (I-052)+(1.002)+(1.024), (I-052)+(1.002)+(1.025), (I-052)+(1.002)+(1.026), (I-052)+(1.002)+(1.027), (I-052)+(1.002)+(1.028), (I-052)+(1.002)+(1.029), (I-052)+(1.002)+(1.030), (I-052)+(1.002)+(1.031), (I-052)+(1.002)+(1.032), (I-052)+(1.002)+(1.033), (I-052)+(1.002)+(1.034), (I-052)+(1.002)+(1.035), (I-052)+(1.002)+(1.036), (I-052)+(1.002)+(1.037), (I-052)+(1.002)+(1.038), (I-052)+(1.002)+(1.039), (I-052)+(1.002)+(1.040), (I-052)+(1.002)+(1.041), (I-052)+(1.002)+(1.042), (I-052)+(1.002)+(1.043), (I-052)+(1.002)+(1.044), (I-052)+(1.002)+(1.045), (I-052)+(1.002)+(1.046), (I-052)+(1.002)+(1.047), (I-052)+(1.002)+(1.048), (I-052)+(1.002)+(1.049), (I-052)+(1.002)+(1.050), (I-052)+(1.002)+(1.051), (I-052)+(1.002)+(1.052), (I-052)+(1.002)+(1.053), (I-052)+(1.002)+(1.054), (I-052)+(1.002)+(1.055), (I-052)+(1.002)+(1.056), (I-052)+(1.002)+(1.057), (I-052)+(1.002)+(1.058), (I-052)+(1.002)+(1.059), (I-052)+(1.002)+(1.060), (I-052)+(1.002)+(1.061), (I-052)+(1.002)+(1.062), (I-052)+(1.002)+(1.063), (I-052)+(1.002)+(1.064), (I-052)+(1.002)+(1.065), (I-052)+(1.002)+(1.066), (I-052)+(1.002)+(1.067), (I-052)+(1.002)+(1.068), (I-052)+(1.002)+(1.069), (I-052)+(1.002)+(1.070), (I-052)+(1.002)+(1.071), (I-052)+(1.002)+(1.072), (I-052)+(1.002)+(1.073), (I-052)+(1.002)+(1.074), (I-052)+(1.002)+(1.075), (I-052)+(1.002)+(1.076), (I-052)+(1.002)+(1.077), (I-052)+(1.002)+(1.078), (I-052)+(1.002)+(1.079), (I-052)+(1.002)+(1.080), (I-052)+(1.002)+(1.081), (I-052)+(1.002)+(1.082), (I-052)+(1.002)+(1.083), (I-052)+(1.002)+(1.084), (I-052)+(1.002)+(1.085), (I-052)+(1.002)+(1.086), (I-052)+(1.002)+(1.087), (I-052)+(1.002)+(1.088), (I-052)+(1.002)+(1.089), (I-052)+(1.002)+(1.090), (I-052)+(1.002)+(1.091), (I-052)+(1.002)+(1.092),
(I-052)+(1.002)+(2.001), (I-052)+(1.002)+(2.002),
(I-052)+(1.002)+(2.003), (I-052)+(1.002)+(2.004),
(I-052)+(1.002)+(2.005), (I-052)+(1.002)+(2.006),
(I-052)+(1.002)+(2.007), (I-052)+(1.002)+(2.008),
(I-052)+(1.002)+(2.009), (I-052)+(1.002)+(2.010),
(I-052)+(1.002)+(2.011), (I-052)+(1.002)+(2.012),
(I-052)+(1.002)+(2.013), (I-052)+(1.002)+(2.014),
(I-052)+(1.002)+(2.015), (I-052)+(1.002)+(2.016),
(I-052)+(1.002)+(2.017), (I-052)+(1.002)+(2.018),
(I-052)+(1.002)+(2.019), (I-052)+(1.002)+(2.020),
(I-052)+(1.002)+(2.021), (I-052)+(1.002)+(2.022),
(I-052)+(1.002)+(2.023), (I-052)+(1.002)+(2.024),
(I-052)+(1.002)+(2.025), (I-052)+(1.002)+(2.026),
(I-052)+(1.002)+(2.027), (I-052)+(1.002)+(2.028),
(I-052)+(1.002)+(2.029), (I-052)+(1.002)+(2.030),
(I-052)+(1.002)+(2.031), (I-052)+(1.002)+(2.032),
(I-052)+(1.002)+(2.033), (I-052)+(1.002)+(2.034),
(I-052)+(1.002)+(2.035), (I-052)+(1.002)+(2.036),
(I-052)+(1.002)+(2.037), (I-052)+(1.002)+(2.038),
(I-052)+(1.002)+(2.039), (I-052)+(1.002)+(2.040),
(I-052)+(1.002)+(2.041), (I-052)+(1.002)+(2.042),
(I-052)+(1.002)+(2.043), (I-052)+(1.002)+(2.044),
(I-052)+(1.002)+(2.045), (I-052)+(1.002)+(2.046),
(I-052)+(1.002)+(2.047), (I-052)+(1.002)+(2.048),
(I-052)+(1.002)+(2.049), (I-052)+(1.002)+(2.050),
(I-052)+(1.002)+(2.051), (I-052)+(1.002)+(2.052),
(I-052)+(1.002)+(2.053), (I-052)+(1.002)+(2.054),
(I-052)+(1.002)+(2.055), (I-052)+(1.002)+(2.056),
(I-052)+(1.002)+(2.057), (I-052)+(1.002)+(2.058),
(I-052)+(1.002)+(2.059), (I-052)+(1.002)+(3.001),
(I-052)+(1.002)+(3.002), (I-052)+(1.002)+(3.003),
(I-052)+(1.002)+(3.004), (I-052)+(1.002)+(3.005),
(I-052)+(1.002)+(3.006), (I-052)+(1.002)+(3.007),
(I-052)+(1.002)+(3.008), (I-052)+(1.002)+(3.009),
(I-052)+(1.002)+(3.010), (I-052)+(1.002)+(3.011),
(I-052)+(1.002)+(3.012), (I-052)+(1.002)+(3.013),
(I-052)+(1.002)+(3.014), (I-052)+(1.002)+(3.015),
(I-052)+(1.002)+(3.016), (I-052)+(1.002)+(3.017),
(I-052)+(1.002)+(3.018), (I-052)+(1.002)+(3.019),
(I-052)+(1.002)+(3.020), (I-052)+(1.002)+(3.021),
(I-052)+(1.002)+(3.022), (I-052)+(1.002)+(3.023),
(I-052)+(1.002)+(3.024), (I-052)+(1.002)+(3.025),
(I-052)+(1.002)+(3.026), (I-052)+(1.002)+(3.027),
(I-052)+(1.002)+(3.028), (I-052)+(1.002)+(3.029),
(I-052)+(1.002)+(3.030), (I-052)+(1.002)+(3.031),
(I-052)+(1.002)+(5.001), (I-052)+(1.002)+(5.002),
(I-052)+(1.002)+(5.003), (I-052)+(1.002)+(5.004),
(I-052)+(1.002)+(5.005), (I-052)+(1.002)+(5.006),
(I-052)+(1.002)+(5.007), (I-052)+(1.002)+(5.008),
(I-052)+(1.002)+(5.009), (I-052)+(1.002)+(5.010),
(I-052)+(1.002)+(5.011), (I-052)+(1.002)+(5.012),
(I-052)+(1.002)+(5.013), (I-052)+(1.002)+(5.014),
(I-052)+(1.002)+(5.015), (I-052)+(1.002)+(5.016),
(I-052)+(1.002)+(5.017), (I-052)+(1.002)+(5.018),
(I-052)+(1.002)+(5.019), (I-052)+(1.002)+(5.020),
(I-052)+(1.002)+(5.021), (I-052)+(1.002)+(5.022),
(I-052)+(1.002)+(5.023), (I-052)+(1.002)+(6.001),
(I-052)+(1.002)+(6.002), (I-052)+(1.002)+(6.003),
(I-052)+(1.002)+(6.004), (I-052)+(1.002)+(7.001),
(I-052)+(1.002)+(7.002), (I-052)+(1.002)+(7.003),
(I-052)+(1.002)+(7.004), (I-052)+(1.002)+(7.005),
(I-052)+(1.002)+(7.006), (I-052)+(1.002)+(9.001),
(I-052)+(1.002)+(9.002), (I-052)+(1.002)+(9.003),
(I-052)+(1.002)+(9.004), (I-052)+(1.002)+(9.005),
(I-052)+(1.002)+(9.006), (I-052)+(1.002)+(9.007),
(I-052)+(1.002)+(9.008), (I-052)+(1.002)+(9.009),
(I-052)+(1.002)+(14.001), (I-052)+(1.002)+(14.002),
(I-052)+(1.002)+(15.008), (I-052)+(1.002)+(15.011),
(I-052)+(1.002)+(15.012), (I-052)+(1.002)+(15.016),
(I-052)+(1.002)+(15.025), (I-052)+(1.002)+(15.027),
(I-052)+(1.002)+(15.047), (I-052)+(1.002)+(15.063),
(I-052)+(1.002)+(15.064), (I-052)+(1.002)+(16.001),
(I-052)+(1.002)+(16.002), (I-052)+(1.002)+(16.003),
(I-052)+(1.002)+(16.004), (I-052)+(1.002)+(16.005),
(I-052)+(1.002)+(16.006), (I-052)+(1.002)+(16.007),
(I-052)+(1.002)+(16.008), (I-052)+(1.002)+(17.001),
(I-052)+(1.002)+(17.002), (I-052)+(1.002)+(17.003),
(I-052)+(1.002)+(17.004), (I-052)+(1.002)+(17.005),
(I-052)+(1.002)+(17.006), (I-052)+(1.002)+(17.007),
(I-052)+(1.002)+(17.008), (I-052)+(1.002)+(17.009),
(I-052)+(1.002)+(17.010), (I-052)+(1.002)+(17.011),
(I-052)+(1.002)+(17.012), (I-052)+(1.002)+(18.001),
(I-052)+(1.003)+(1.004), (I-052)+(1.003)+(1.005),
(I-052)+(1.003)+(1.006), (I-052)+(1.003)+(1.007),
(I-052)+(1.003)+(1.008), (I-052)+(1.003)+(1.009),
(I-052)+(1.003)+(1.010), (I-052)+(1.003)+(1.011),
(I-052)+(1.003)+(1.012), (I-052)+(1.003)+(1.013),
(I-052)+(1.003)+(1.014), (I-052)+(1.003)+(1.015),
(I-052)+(1.003)+(1.016), (I-052)+(1.003)+(1.017),
(I-052)+(1.003)+(1.018), (I-052)+(1.003)+(1.019),
(I-052)+(1.003)+(1.020), (I-052)+(1.003)+(1.021),
(I-052)+(1.003)+(1.022), (I-052)+(1.003)+(1.023),
(I-052)+(1.003)+(1.024), (I-052)+(1.003)+(1.025),
(I-052)+(1.003)+(1.026), (I-052)+(1.003)+(1.027),
(I-052)+(1.003)+(1.028), (I-052)+(1.003)+(1.029),
(I-052)+(1.003)+(1.030), (I-052)+(1.003)+(1.031),
(I-052)+(1.003)+(1.032), (I-052)+(1.003)+(1.033),
(I-052)+(1.003)+(1.034), (I-052)+(1.003)+(1.035),
(I-052)+(1.003)+(1.036), (I-052)+(1.003)+(1.037),
(I-052)+(1.003)+(1.038), (I-052)+(1.003)+(1.039),
(I-052)+(1.003)+(1.040), (I-052)+(1.003)+(1.041),
(I-052)+(1.003)+(1.042), (I-052)+(1.003)+(1.043),
(I-052)+(1.003)+(1.044), (I-052)+(1.003)+(1.045),
(I-052)+(1.003)+(1.046), (I-052)+(1.003)+(1.047),
(I-052)+(1.003)+(1.048), (I-052)+(1.003)+(1.049),
(I-052)+(1.003)+(1.050), (I-052)+(1.003)+(1.051),
(I-052)+(1.003)+(1.052), (I-052)+(1.003)+(1.053),
(I-052)+(1.003)+(1.054), (I-052)+(1.003)+(1.055),
(I-052)+(1.003)+(1.056), (1-052)+(1.003)+(1.057),
(I-052)+(1.003)+(1.058), (I-052)+(1.003)+(1.059),
(I-052)+(1.003)+(1.060), (I-052)+(1.003)+(1.061),
(I-052)+(1.003)+(1.062), (I-052)+(1.003)+(1.063),
(I-052)+(1.003)+(1.064), (I-052)+(1.003)+(1.065),
(I-052)+(1.003)+(1.066), (I-052)+(1.003)+(1.067),
(I-052)+(1.003)+(1.068), (I-052)+(1.003)+(1.069),
(I-052)+(1.003)+(1.070), (I-052)+(1.003)+(1.071),
(I-052)+(1.003)+(1.072), (I-052)+(1.003)+(1.073),
(I-052)+(1.003)+(1.074), (I-052)+(1.003)+(1.075),
(I-052)+(1.003)+(1.076), (I-052)+(1.003)+(1.077),
(I-052)+(1.003)+(1.078), (I-052)+(1.003)+(1.079),
(I-052)+(1.003)+(1.080), (I-052)+(1.003)+(1.081),
(I-052)+(1.003)+(1.082), (I-052)+(1.003)+(1.083),
(I-052)+(1.003)+(1.084), (I-052)+(1.003)+(1.085),
(I-052)+(1.003)+(1.086), (I-052)+(1.003)+(1.087),
(I-052)+(1.003)+(1.088), (I-052)+(1.003)+(1.089),
(I-052)+(1.003)+(1.090), (I-052)+(1.003)+(1.091),
(I-052)+(1.003)+(1.092), (I-052)+(1.003)+(2.001),
(I-052)+(1.003)+(2.002), (I-052)+(1.003)+(2.003),
(I-052)+(1.003)+(2.004), (I-052)+(1.003)+(2.005),
(I-052)+(1.003)+(2.006), (I-052)+(1.003)+(2.007),
(I-052)+(1.003)+(2.008), (I-052)+(1.003)+(2.009),
(I-052)+(1.003)+(2.010), (I-052)+(1.003)+(2.011),
(I-052)+(1.003)+(2.012), (I-052)+(1.003)+(2.013), (I-052)+(1.003)+(2.014), (I-052)+(1.003)+(2.015), (I-052)+(1.003)+(2.016), (I-052)+(1.003)+(2.017), (I-052)+(1.003)+(2.018), (I-052)+(1.003)+(2.019), (I-052)+(1.003)+(2.020), (I-052)+(1.003)+(2.021), (I-052)+(1.003)+(2.022), (I-052)+(1.003)+(2.023), (I-052)+(1.003)+(2.024), (I-052)+(1.003)+(2.025), (I-052)+(1.003)+(2.026), (I-052)+(1.003)+(2.027), (I-052)+(1.003)+(2.028), (I-052)+(1.003)+(2.029), (I-052)+(1.003)+(2.030), (I-052)+(1.003)+(2.031), (I-052)+(1.003)+(2.032), (I-052)+(1.003)+(2.033), (I-052)+(1.003)+(2.034), (I-052)+(1.003)+(2.035), (I-052)+(1.003)+(2.036), (I-052)+(1.003)+(2.037), (I-052)+(1.003)+(2.038), (I-052)+(1.003)+(2.039), (I-052)+(1.003)+(2.040), (I-052)+(1.003)+(2.041), (I-052)+(1.003)+(2.042), (I-052)+(1.003)+(2.043), (I-052)+(1.003)+(2.044), (I-052)+(1.003)+(2.045), (I-052)+(1.003)+(2.046), (I-052)+(1.003)+(2.047), (I-052)+(1.003)+(2.048), (I-052)+(1.003)+(2.049), (I-052)+(1.003)+(2.050), (I-052)+(1.003)+(2.051), (I-052)+(1.003)+(2.052), (I-052)+(1.003)+(2.053), (I-052)+(1.003)+(2.054), (I-052)+(1.003)+(2.055), (I-052)+(1.003)+(2.056), (I-052)+(1.003)+(2.057), (I-052)+(1.003)+(2.058), (I-052)+(1.003)+(2.059), (I-052)+(1.003)+(3.001), (I-052)+(1.003)+(3.002), (I-052)+(1.003)+(3.003), (I-052)+(1.003)+(3.004), (I-052)+(1.003)+(3.005), (I-052)+(1.003)+(3.006), (I-052)+(1.003)+(3.007), (I-052)+(1.003)+(3.008), (I-052)+(1.003)+(3.009), (I-052)+(1.003)+(3.010), (I-052)+(1.003)+(3.011), (I-052)+(1.003)+(3.012), (I-052)+(1.003)+(3.013), (I-052)+(1.003)+(3.014), (I-052)+(1.003)+(3.015), (I-052)+(1.003)+(3.016), (I-052)+(1.003)+(3.017), (I-052)+(1.003)+(3.018), (I-052)+(1.003)+(3.019), (I-052)+(1.003)+(3.020), (I-052)+(1.003)+(3.021), (I-052)+(1.003)+(3.022), (I-052)+(1.003)+(3.023), (I-052)+(1.003)+(3.024), (I-052)+(1.003)+(3.025), (I-052)+(1.003)+(3.026), (I-052)+(1.003)+(3.027), (I-052)+(1.003)+(3.028), (I-052)+(1.003)+(3.029), (I-052)+(1.003)+(3.030), (I-052)+(1.003)+(3.031), (I-052)+(1.003)+(5.001), (I-052)+(1.003)+(5.002), (I-052)+(1.003)+(5.003), (I-052)+(1.003)+(5.004), (I-052)+(1.003)+(5.005), (I-052)+(1.003)+(5.006), (I-052)+(1.003)+(5.007), (I-052)+(1.003)+(5.008), (I-052)+(1.003)+(5.009), (I-052)+(1.003)+(5.010), (I-052)+(1.003)+(5.011), (I-052)+(1.003)+(5.012), (I-052)+(1.003)+(5.013), (I-052)+(1.003)+(5.014), (I-052)+(1.003)+(5.015), (I-052)+(1.003)+(5.016), (I-052)+(1.003)+(5.017), (I-052)+(1.003)+(5.018), (I-052)+(1.003)+(5.019), (I-052)+(1.003)+(5.020), (I-052)+(1.003)+(5.021), (I-052)+(1.003)+(5.022), (I-052)+(1.003)+(5.023), (I-052)+(1.003)+(6.001), (I-052)+(1.003)+(6.002), (I-052)+(1.003)+(6.003), (I-052)+(1.003)+(6.004), (I-052)+(1.003)+(7.001), (I-052)+(1.003)+(7.002), (I-052)+(1.003)+(7.003), (I-052)+(1.003)+(7.004), (I-052)+(1.003)+(7.005), (I-052)+(1.003)+(7.006), (I-052)+(1.003)+(9.001), (I-052)+(1.003)+(9.002), (I-052)+(1.003)+(9.003), (I-052)+(1.003)+(9.004), (I-052)+(1.003)+(9.005), (I-052)+(1.003)+(9.006), (I-052)+(1.003)+(9.007), (I-052)+(1.003)+(9.008), (I-052)+(1.003)+(9.009), (I-052)+(1.003)+(14.001), (I-052)+(1.003)+(14.002), (I-052)+(1.003)+(15.008), (I-052)+(1.003)+(15.011), (I-052)+(1.003)+(15.012), (I-052)+(1.003)+(15.016), (I-052)+(1.003)+(15.025), (I-052)+(1.003)+(15.027), (I-052)+(1.003)+(15.047), (I-052)+(1.003)+(15.063), (I-052)+(1.003)+(15.064), (I-052)+(1.003)+(16.001), (I-052)+(1.003)+(16.002), (I-052)+(1.003)+(16.003), (I-052)+(1.003)+(16.004), (I-052)+(1.003)+(16.005), (I-052)+(1.003)+(16.006), (I-052)+(1.003)+(16.007), (I-052)+(1.003)+(16.008), (I-052)+(1.003)+(17.001), (I-052)+(1.003)+(17.002), (I-052)+(1.003)+(17.003), (I-052)+(1.003)+(17.004), (I-052)+(1.003)+(17.005), (I-052)+(1.003)+(17.006), (I-052)+(1.003)+(17.007), (I-052)+(1.003)+(17.008), (I-052)+(1.003)+(17.009), (I-052)+(1.003)+(17.010), (I-052)+(1.003)+(17.011), (I-052)+(1.003)+(17.012), (I-052)+(1.003)+(18.001), (I-052)+(1.004)+(1.005), (I-052)+(1.004)+(1.006), (I-052)+(1.004)+(1.007), (I-052)+(1.004)+(1.008), (I-052)+(1.004)+(1.009), (I-052)+(1.004)+(1.010), (I-052)+(1.004)+(1.011), (I-052)+(1.004)+(1.012), (I-052)+(1.004)+(1.013), (I-052)+(1.004)+(1.014), (I-052)+(1.004)+(1.015), (I-052)+(1.004)+(1.016), (I-052)+(1.004)+(1.017), (I-052)+(1.004)+(1.018), (I-052)+(1.004)+(1.019), (I-052)+(1.004)+(1.020), (I-052)+(1.004)+(1.021), (I-052)+(1.004)+(1.022), (I-052)+(1.004)+(1.023), (I-052)+(1.004)+(1.024), (I-052)+(1.004)+(1.025), (I-052)+(1.004)+(1.026), (I-052)+(1.004)+(1.027), (I-052)+(1.004)+(1.028), (I-052)+(1.004)+(1.029), (I-052)+(1.004)+(1.030), (I-052)+(1.004)+(1.031), (I-052)+(1.004)+(1.032), (I-052)+(1.004)+(1.033), (I-052)+(1.004)+(1.034), (I-052)+(1.004)+(1.035), (I-052)+(1.004)+(1.036), (I-052)+(1.004)+(1.037), (I-052)+(1.004)+(1.038), (I-052)+(1.004)+(1.039), (I-052)+(1.004)+(1.040), (I-052)+(1.004)+(1.041), (I-052)+(1.004)+(1.042), (I-052)+(1.004)+(1.043), (I-052)+(1.004)+(1.044), (I-052)+(1.004)+(1.045), (I-052)+(1.004)+(1.046), (I-052)+(1.004)+(1.047), (I-052)+(1.004)+(1.048), (I-052)+(1.004)+(1.049), (I-052)+(1.004)+(1.050), (I-052)+(1.004)+(1.051), (I-052)+(1.004)+(1.052), (I-052)+(1.004)+(1.053), (I-052)+(1.004)+(1.054), (I-052)+(1.004)+(1.055), (I-052)+(1.004)+(1.056), (I-052)+(1.004)+(1.057), (I-052)+(1.004)+(1.058), (I-052)+(1.004)+(1.059), (I-052)+(1.004)+(1.060), (I-052)+(1.004)+(1.061), (I-052)+(1.004)+(1.062), (I-052)+(1.004)+(1.063), (I-052)+(1.004)+(1.064), (I-052)+(1.004)+(1.065), (I-052)+(1.004)+(1.066), (I-052)+(1.004)+(1.067), (I-052)+(1.004)+(1.068), (I-052)+(1.004)+(1.069), (I-052)+(1.004)+(1.070), (I-052)+(1.004)+(1.071), (I-052)+(1.004)+(1.072), (I-052)+(1.004)+(1.073), (I-052)+(1.004)+(1.074), (I-052)+(1.004)+(1.075), (I-052)+(1.004)+(1.076), (I-052)+(1.004)+(1.077), (I-052)+(1.004)+(1.078), (I-052)+(1.004)+(1.079), (I-052)+(1.004)+(1.080), (I-052)+(1.004)+(1.081), (I-052)+(1.004)+(1.082), (I-052)+(1.004)+(1.083), (I-052)+(1.004)+(1.084), (I-052)+(1.004)+(1.085), (I-052)+(1.004)+(1.086), (I-052)+(1.004)+(1.087), (I-052)+(1.004)+(1.088), (I-052)+(1.004)+(1.089), (I-052)+(1.004)+(1.090), (I-052)+(1.004)+(1.091), (I-052)+(1.004)+(1.092), (I-052)+(1.004)+(2.001), (I-052)+(1.004)+(2.002), (I-052)+(1.004)+(2.003), (I-052)+(1.004)+(2.004), (I-052)+(1.004)+(2.005), (I-052)+(1.004)+(2.006), (I-052)+(1.004)+(2.007), (I-052)+(1.004)+(2.008), (I-052)+(1.004)+(2.009), (I-052)+(1.004)+(2.010), (I-052)+(1.004)+(2.011), (I-052)+(1.004)+(2.012), (I-052)+(1.004)+(2.013), (I-052)+(1.004)+(2.014), (I-052)+(1.004)+(2.015), (I-052)+(1.004)+(2.016), (I-052)+(1.004)+(2.017), (I-052)+(1.004)+(2.018), (I-052)+(1.004)+(2.019), (I-052)+(1.004)+(2.020), (I-052)+(1.004)+(2.021), (I-052)+(1.004)+(2.022), (I-052)+(1.004)+(2.023), (I-052)+(1.004)+(2.024), (I-052)+(1.004)+(2.025), (I-052)+(1.004)+(2.026), (I-052)+(1.004)+(2.027), (I-052)+(1.004)+(2.028), (I-052)+(1.004)+(2.029), (I-052)+(1.004)+(2.030), (I-052)+(1.004)+(2.031), (I-052)+(1.004)+(2.032), (I-052)+(1.004)+(2.033), (I-052)+(1.004)+(2.034), (I-052)+(1.004)+(2.035), (I-052)+(1.004)+(2.036), (I-052)+(1.004)+(2.037), (I-052)+(1.004)+(2.038), (I-052)+(1.004)+(2.039), (I-052)+(1.004)+(2.040), (I-052)+(1.004)+(2.041), (I-052)+(1.004)+(2.042), (I-052)+(1.004)+(2.043), (I-052)+(1.004)+(2.044), (I-052)+(1.004)+(2.045), (I-052)+(1.004)+(2.046), (I-052)+(1.004)+(2.047), (I-052)+(1.004)+(2.048), (I-052)+(1.004)+(2.049), (I-052)+(1.004)+(2.050), (I-052)+(1.004)+(2.051), (I-052)+(1.004)+(2.052), (I-052)+(1.004)+(2.053), (I-052)+(1.004)+(2.054), (I-052)+(1.004)+(2.055), (I-052)+(1.004)+(2.056), (I-052)+(1.004)+(2.057), (I-052)+(1.004)+(2.058), (I-052)+(1.004)+(2.059), (I-052)+(1.004)+(3.001), (I-052)+(1.004)+(3.002), (I-052)+(1.004)+(3.003), (I-052)+(1.004)+(3.004), (I-052)+(1.004)+(3.005), (I-052)+(1.004)+(3.006), (I-052)+(1.004)+(3.007), (I-052)+(1.004)+(3.008), (I-052)+(1.004)+(3.009), (I-052)+(1.004)+(3.010), (I-052)+(1.004)+(3.011), (I-052)+(1.004)+(3.012), (I-052)+(1.004)+(3.013), (I-052)+(1.004)+(3.014), (I-052)+(1.004)+(3.015), (I-052)+(1.004)+(3.016), (I-052)+(1.004)+(3.017), (I-052)+(1.004)+(3.018), (I-052)+(1.004)+(3.019), (I-052)+(1.004)+(3.020), (I-052)+(1.004)+(3.021), (I-052)+(1.004)+(3.022), (I-052)+(1.004)+(3.023), (I-052)+(1.004)+(3.024), (I-052)+(1.004)+(3.025), (I-052)+(1.004)+(3.026), (I-052)+(1.004)+(3.027), (I-052)+(1.004)+(3.028), (I-052)+(1.004)+(3.029), (I-052)+(1.004)+(3.030), (I-052)+(1.004)+(3.031), (I-052)+(1.004)+(5.001), (I-052)+(1.004)+(5.002), (I-052)+(1.004)+(5.003), (I-052)+(1.004)+(5.004), (I-052)+(1.004)+(5.005), (I-052)+(1.004)+(5.006), (I-052)+(1.004)+(5.007), (I-052)+(1.004)+(5.008), (I-052)+(1.004)+(5.009), (I-052)+(1.004)+(5.010), (I-052)+(1.004)+(5.011), (I-052)+(1.004)+(5.012), (I-052)+(1.004)+(5.013), (I-052)+(1.004)+(5.014), (I-052)+(1.004)+(5.015), (I-052)+(1.004)+(5.016), (I-052)+(1.004)+(5.017), (I-052)+(1.004)+(5.018), (I-052)+(1.004)+(5.019), (I-052)+(1.004)+(5.020), (I-052)+(1.004)+(5.021), (I-052)+(1.004)+(5.022), (I-052)+(1.004)+(5.023), (I-052)+(1.004)+(6.001), (I-052)+(1.004)+(6.002), (I-052)+(1.004)+(6.003), (I-052)+(1.004)+(6.004), (I-052)+(1.004)+(7.001), (I-052)+(1.004)+(7.002), (I-052)+(1.004)+(7.003), (I-052)+(1.004)+(7.004), (I-052)+(1.004)+(7.005), (I-052)+(1.004)+(7.006), (I-052)+(1.004)+(9.001), (I-052)+(1.004)+(9.002), (I-052)+(1.004)+(9.003), (I-052)+(1.004)+(9.004), (I-052)+(1.004)+(9.005), (I-052)+(1.004)+(9.006), (I-052)+(1.004)+(9.007), (I-052)+(1.004)+(9.008), (I-052)+(1.004)+(9.009), (I-052)+(1.004)+(14.001), (I-052)+(1.004)+(14.002), (I-052)+(1.004)+(15.008), (I-052)+(1.004)+(15.011), (I-052)+(1.004)+(15.012), (I-052)+(1.004)+(15.016), (I-052)+(1.004)+(15.025), (I-052)+(1.004)+(15.027), (I-052)+(1.004)+(15.047), (I-052)+(1.004)+(15.063), (I-052)+(1.004)+(15.064), (I-052)+(1.004)+(16.001), (I-052)+(1.004)+(16.002), (I-052)+(1.004)+(16.003), (I-052)+(1.004)+(16.004), (I-052)+(1.004)+(16.005), (I-052)+(1.004)+(16.006), (I-052)+(1.004)+(16.007), (I-052)+(1.004)+(16.008), (I-052)+(1.004)+(17.001), (I-052)+(1.004)+(17.002), (I-052)+(1.004)+(17.003), (I-052)+(1.004)+(17.004), (I-052)+(1.004)+(17.005), (I-052)+(1.004)+(17.006), (I-052)+(1.004)+(17.007), (I-052)+(1.004)+(17.008), (I-052)+(1.004)+(17.009), (I-052)+(1.004)+(17.010), (I-052)+(1.004)+(17.011), (I-052)+(1.004)+(17.012), (I-052)+(1.004)+(18.001), (I-052)+(1.005)+(1.006), (I-052)+(1.005)+(1.007), (I-052)+(1.005)+(1.008), (I-052)+(1.005)+(1.009), (I-052)+(1.005)+(1.010), (I-052)+(1.005)+(1.011), (I-052)+(1.005)+(1.012), (I-052)+(1.005)+(1.013), (I-052)+(1.005)+(1.014), (I-052)+(1.005)+(1.015), (I-052)+(1.005)+(1.016), (I-052)+(1.005)+(1.017), (I-052)+(1.005)+(1.018), (I-052)+(1.005)+(1.019), (I-052)+(1.005)+(1.020), (I-052)+(1.005)+(1.021), (I-052)+(1.005)+(1.022), (I-052)+(1.005)+(1.023), (I-052)+(1.005)+(1.024), (I-052)+(1.005)+(1.025), (I-052)+(1.005)+(1.026), (I-052)+(1.005)+(1.027), (I-052)+(1.005)+(1.028), (I-052)+(1.005)+(1.029), (I-052)+(1.005)+(1.030), (I-052)+(1.005)+(1.031), (I-052)+(1.005)+(1.032), (I-052)+(1.005)+(1.033), (I-052)+(1.005)+(1.034), (I-052)+(1.005)+(1.035), (I-052)+(1.005)+(1.036), (I-052)+(1.005)+(1.037), (I-052)+(1.005)+(1.038), (I-052)+(1.005)+(1.039), (I-052)+(1.005)+(1.040), (I-052)+(1.005)+(1.041), (I-052)+(1.005)+(1.042), (I-052)+(1.005)+(1.043), (I-052)+(1.005)+(1.044), (I-052)+(1.005)+(1.045), (I-052)+(1.005)+(1.046), (I-052)+(1.005)+(1.047), (I-052)+(1.005)+(1.048), (I-052)+(1.005)+(1.049), (I-052)+(1.005)+(1.050), (I-052)+(1.005)+(1.051), (I-052)+(1.005)+(1.052), (I-052)+(1.005)+(1.053), (I-052)+(1.005)+(1.054), (I-052)+(1.005)+(1.055), (I-052)+(1.005)+(1.056), (I-052)+(1.005)+(1.057), (I-052)+(1.005)+(1.058), (I-052)+(1.005)+(1.059), (I-052)+(1.005)+(1.060), (I-052)+(1.005)+(1.061), (I-052)+(1.005)+(1.062), (I-052)+(1.005)+(1.063), (I-052)+(1.005)+(1.064), (I-052)+(1.005)+(1.065), (I-052)+(1.005)+(1.066), (I-052)+(1.005)+(1.067), (I-052)+(1.005)+(1.068), (I-052)+(1.005)+(1.069), (I-052)+(1.005)+(1.070), (I-052)+(1.005)+(1.071), (I-052)+(1.005)+(1.072), (I-052)+(1.005)+(1.073), (I-052)+(1.005)+(1.074), (I-052)+(1.005)+(1.075), (I-052)+(1.005)+(1.076), (I-052)+(1.005)+(1.077), (I-052)+(1.005)+(1.078), (I-052)+(1.005)+(1.079), (I-052)+(1.005)+(1.080), (I-052)+(1.005)+(1.081), (I-052)+(1.005)+(1.082), (I-052)+(1.005)+(1.083), (I-052)+(1.005)+(1.084), (I-052)+(1.005)+(1.085), (I-052)+(1.005)+(1.086), (I-052)+(1.005)+(1.087), (I-052)+(1.005)+(1.088), (I-052)+(1.005)+(1.089), (I-052)+(1.005)+(1.090), (I-052)+(1.005)+(1.091), (I-052)+(1.005)+(1.092), (I-052)+(1.005)+(2.001), (I-052)+(1.005)+(2.002), (I-052)+(1.005)+(2.003), (I-052)+(1.005)+(2.004), (I-052)+(1.005)+(2.005), (I-052)+(1.005)+(2.006), (I-052)+(1.005)+(2.007), (I-052)+(1.005)+(2.008), (I-052)+(1.005)+(2.009), (I-052)+(1.005)+(2.010), (I-052)+(1.005)+(2.011), (I-052)+(1.005)+(2.012), (I-052)+(1.005)+(2.013), (I-052)+(1.005)+(2.014), (I-052)+(1.005)+(2.015), (I-052)+(1.005)+(2.016), (I-052)+(1.005)+(2.017), (I-052)+(1.005)+(2.018), (I-052)+(1.005)+(2.019), (I-052)+(1.005)+(2.020), (I-052)+(1.005)+(2.021), (I-052)+(1.005)+(2.022), (I-052)+(1.005)+(2.023), (I-052)+(1.005)+(2.024), (I-052)+(1.005)+(2.025), (I-052)+(1.005)+(2.026), (I-052)+(1.005)+(2.027), (I-052)+(1.005)+(2.028), (I-052)+(1.005)+(2.029), (I-052)+(1.005)+(2.030), (I-052)+(1.005)+(2.031), (I-052)+(1.005)+(2.032), (I-052)+(1.005)+(2.033), (I-052)+(1.005)+(2.034), (I-052)+(1.005)+(2.035), (I-052)+(1.005)+(2.036), (I-052)+(1.005)+(2.037), (I-052)+(1.005)+(2.038), (I-052)+(1.005)+(2.039), (I-052)+(1.005)+(2.040), (I-052)+(1.005)+(2.041), (I-052)+(1.005)+(2.042), (I-052)+(1.005)+(2.043), (I-052)+(1.005)+(2.044), (I-052)+(1.005)+(2.045), (I-052)+(1.005)+(2.046), (I-052)+(1.005)+(2.047), (I-052)+(1.005)+(2.048), (I-052)+(1.005)+(2.049), (I-052)+(1.005)+(2.050), (I-052)+(1.005)+(2.051), (I-052)+(1.005)+(2.052), (I-052)+(1.005)+(2.053), (I-052)+(1.005)+(2.054), (I-052)+(1.005)+(2.055), (I-052)+(1.005)+(2.056), (I-052)+(1.005)+(2.057), (I-052)+(1.005)+(2.058), (I-052)+(1.005)+(2.059), (I-052)+(1.005)+(3.001), (I-052)+(1.005)+(3.002), (I-052)+(1.005)+(3.003), (I-052)+(1.005)+(3.004), (I-052)+(1.005)+(3.005), (I-052)+(1.005)+(3.006), (I-052)+(1.005)+(3.007), (I-052)+(1.005)+(3.008), (I-052)+(1.005)+(3.009), (I-052)+(1.005)+(3.010), (I-052)+(1.005)+(3.011), (I-052)+(1.005)+(3.012), (I-052)+(1.005)+(3.013), (I-052)+(1.005)+(3.014), (I-052)+(1.005)+(3.015), (I-052)+(1.005)+(3.016), (I-052)+(1.005)+(3.017), (I-052)+(1.005)+(3.018), (I-052)+(1.005)+(3.019), (I-052)+(1.005)+(3.020), (I-052)+(1.005)+(3.021), (I-052)+(1.005)+(3.022), (I-052)+(1.005)+(3.023), (I-052)+(1.005)+(3.024), (I-052)+(1.005)+(3.025), (I-052)+(1.005)+(3.026), (I-052)+(1.005)+(3.027), (I-052)+(1.005)+(3.028), (I-052)+(1.005)+(3.029), (I-052)+(1.005)+(3.030), (I-052)+(1.005)+(3.031), (I-052)+(1.005)+(5.001), (I-052)+(1.005)+(5.002), (I-052)+(1.005)+(5.003), (I-052)+(1.005)+(5.004), (I-052)+(1.005)+(5.005), (I-052)+(1.005)+(5.006), (I-052)+(1.005)+(5.007), (I-052)+(1.005)+(5.008), (I-052)+(1.005)+(5.009), (I-052)+(1.005)+(5.010), (I-052)+(1.005)+(5.011), (I-052)+(1.005)+(5.012), (I-052)+(1.005)+(5.013), (I-052)+(1.005)+(5.014), (I-052)+(1.005)+(5.015), (I-052)+(1.005)+(5.016), (I-052)+(1.005)+(5.017), (I-052)+(1.005)+(5.018), (I-052)+(1.005)+(5.019), (I-052)+(1.005)+(5.020), (I-052)+(1.005)+(5.021), (I-052)+(1.005)+(5.022), (I-052)+(1.005)+(5.023), (I-052)+(1.005)+(6.001), (I-052)+(1.005)+(6.002), (I-052)+(1.005)+(6.003), (I-052)+(1.005)+(6.004), (I-052)+(1.005)+(7.001), (I-052)+(1.005)+(7.002), (I-052)+(1.005)+(7.003), (I-052)+(1.005)+(7.004), (I-052)+(1.005)+(7.005), (I-052)+(1.005)+(7.006), (I-052)+(1.005)+(9.001), (I-052)+(1.005)+(9.002), (I-052)+(1.005)+(9.003), (I-052)+(1.005)+(9.004), (I-052)+(1.005)+(9.005), (I-052)+(1.005)+(9.006), (I-052)+(1.005)+(9.007), (I-052)+(1.005)+(9.008), (I-052)+(1.005)+(9.009), (I-052)+(1.005)+(14.001), (I-052)+(1.005)+(14.002), (I-052)+(1.005)+(15.008), (I-052)+(1.005)+(15.011), (I-052)+(1.005)+(15.012), (I-052)+(1.005)+(15.016), (I-052)+(1.005)+(15.025), (I-052)+(1.005)+(15.027), (I-052)+(1.005)+(15.047), (I-052)+(1.005)+(15.063), (I-052)+(1.005)+(15.064), (I-052)+(1.005)+(16.001), (I-052)+(1.005)+(16.002), (I-052)+(1.005)+(16.003), (I-052)+(1.005)+(16.004), (I-052)+(1.005)+(16.005), (I-052)+(1.005)+(16.006), (I-052)+(1.005)+(16.007), (I-052)+(1.005)+(16.008), (I-052)+(1.005)+(17.001), (I-052)+(1.005)+(17.002), (I-052)+(1.005)+(17.003), (I-052)+(1.005)+(17.004), (I-052)+(1.005)+(17.005), (I-052)+(1.005)+(17.006), (I-052)+(1.005)+(17.007), (I-052)+(1.005)+(17.008), (I-052)+(1.005)+(17.009), (I-052)+(1.005)+(17.010), (I-052)+(1.005)+(17.011), (I-052)+(1.005)+(17.012), (I-052)+(1.005)+(18.001), (I-052)+(1.006)+(1.007), (I-052)+(1.006)+(1.008), (I-052)+(1.006)+(1.009), (I-052)+(1.006)+(1.010), (I-052)+(1.006)+(1.011), (I-052)+(1.006)+(1.012), (I-052)+(1.006)+(1.013), (I-052)+(1.006)+(1.014), (I-052)+(1.006)+(1.015), (I-052)+(1.006)+(1.016), (I-052)+(1.006)+(1.017), (I-052)+(1.006)+(1.018), (I-052)+(1.006)+(1.019), (I-052)+(1.006)+(1.020), (I-052)+(1.006)+(1.021), (I-052)+(1.006)+(1.022), (I-052)+(1.006)+(1.023), (I-052)+(1.006)+(1.024), (I-052)+(1.006)+(1.025), (I-052)+(1.006)+(1.026), (I-052)+(1.006)+(1.027), (I-052)+(1.006)+(1.028), (I-052)+(1.006)+(1.029), (I-052)+(1.006)+(1.030), (I-052)+(1.006)+(1.031), (I-052)+(1.006)+(1.032), (I-052)+(1.006)+(1.033), (I-052)+(1.006)+(1.034), (I-052)+(1.006)+(1.035), (I-052)+(1.006)+(1.036), (I-052)+(1.006)+(1.037), (I-052)+(1.006)+(1.038), (I-052)+(1.006)+(1.039), (I-052)+(1.006)+(1.040), (I-052)+(1.006)+(1.041), (I-052)+(1.006)+(1.042), (I-052)+(1.006)+(1.043), (I-052)+(1.006)+(1.044), (I-052)+(1.006)+(1.045), (I-052)+(1.006)+(1.046), (I-052)+(1.006)+(1.047), (I-052)+(1.006)+(1.048), (I-052)+(1.006)+(1.049), (I-052)+(1.006)+(1.050), (I-052)+(1.006)+(1.051), (I-052)+(1.006)+(1.052), (I-052)+(1.006)+(1.053), (I-052)+(1.006)+(1.054), (I-052)+(1.006)+(1.055), (I-052)+(1.006)+(1.056), (I-052)+(1.006)+(1.057), (I-052)+(1.006)+(1.058), (I-052)+(1.006)+(1.059), (I-052)+(1.006)+(1.060), (I-052)+(1.006)+(1.061), (I-052)+(1.006)+(1.062), (I-052)+(1.006)+(1.063), (I-052)+(1.006)+(1.064), (I-052)+(1.006)+(1.065), (I-052)+(1.006)+(1.066), (I-052)+(1.006)+(1.067), (I-052)+(1.006)+(1.068), (I-052)+(1.006)+(1.069), (I-052)+(1.006)+(1.070), (I-052)+(1.006)+(1.071), (I-052)+(1.006)+(1.072), (I-052)+(1.006)+(1.073), (I-052)+(1.006)+(1.074), (I-052)+(1.006)+(1.075), (I-052)+(1.006)+(1.076), (I-052)+(1.006)+(1.077), (I-052)+(1.006)+(1.078), (I-052)+(1.006)+(1.079), (I-052)+(1.006)+(1.080), (I-052)+(1.006)+(1.081), (I-052)+(1.006)+(1.082), (I-052)+(1.006)+(1.083), (I-052)+(1.006)+(1.084), (I-052)+(1.006)+(1.085), (I-052)+(1.006)+(1.086), (I-052)+(1.006)+(1.087), (I-052)+(1.006)+(1.088), (I-052)+(1.006)+(1.089), (I-052)+(1.006)+(1.090), (I-052)+(1.006)+(1.091), (I-052)+(1.006)+(1.092), (I-052)+(1.006)+(2.001), (I-052)+(1.006)+(2.002), (I-052)+(1.006)+(2.003), (I-052)+(1.006)+(2.004), (I-052)+(1.006)+(2.005), (I-052)+(1.006)+(2.006), (I-052)+(1.006)+(2.007), (I-052)+(1.006)+(2.008), (I-052)+(1.006)+(2.009), (I-052)+(1.006)+(2.010), (I-052)+(1.006)+(2.011), (I-052)+(1.006)+(2.012), (I-052)+(1.006)+(2.013), (I-052)+(1.006)+(2.014), (I-052)+(1.006)+(2.015), (I-052)+(1.006)+(2.016), (I-052)+(1.006)+(2.017), (I-052)+(1.006)+(2.018), (I-052)+(1.006)+(2.019), (I-052)+(1.006)+(2.020), (I-052)+(1.006)+(2.021), (I-052)+(1.006)+(2.022), (I-052)+(1.006)+(2.023), (I-052)+(1.006)+(2.024), (I-052)+(1.006)+(2.025), (I-052)+(1.006)+(2.026), (I-052)+(1.006)+(2.027), (I-052)+(1.006)+(2.028), (I-052)+(1.006)+(2.029), (I-052)+(1.006)+(2.030), (I-052)+(1.006)+(2.031), (I-052)+(1.006)+(2.032), (I-052)+(1.006)+(2.033), (I-052)+(1.006)+(2.034), (I-052)+(1.006)+(2.035), (I-052)+(1.006)+(2.036), (I-052)+(1.006)+(2.037), (I-052)+(1.006)+(2.038), (I-052)+(1.006)+(2.039), (I-052)+(1.006)+(2.040), (I-052)+(1.006)+(2.041), (I-052)+(1.006)+(2.042), (I-052)+(1.006)+(2.043), (I-052)+(1.006)+(2.044), (I-052)+(1.006)+(2.045), (I-052)+(1.006)+(2.046), (I-052)+(1.006)+(2.047), (I-052)+(1.006)+(2.048), (I-052)+(1.006)+(2.049), (I-052)+(1.006)+(2.050), (I-052)+(1.006)+(2.051), (I-052)+(1.006)+(2.052), (I-052)+(1.006)+(2.053), (I-052)+(1.006)+(2.054), (I-052)+(1.006)+(2.055), (I-052)+(1.006)+(2.056), (I-052)+(1.006)+(2.057), (I-052)+(1.006)+(2.058), (I-052)+(1.006)+(2.059), (I-052)+(1.006)+(3.001), (I-052)+(1.006)+(3.002), (I-052)+(1.006)+(3.003), (I-052)+(1.006)+(3.004), (I-052)+(1.006)+(3.005), (I-052)+(1.006)+(3.006), (I-052)+(1.006)+(3.007), (I-052)+(1.006)+(3.008), (I-052)+(1.006)+(3.009), (I-052)+(1.006)+(3.010), (I-052)+(1.006)+(3.011), (I-052)+(1.006)+(3.012), (I-052)+(1.006)+(3.013), (I-052)+(1.006)+(3.014), (I-052)+(1.006)+(3.015), (I-052)+(1.006)+(3.016), (I-052)+(1.006)+(3.017), (I-052)+(1.006)+(3.018), (I-052)+(1.006)+(3.019), (I-052)+(1.006)+(3.020), (I-052)+(1.006)+(3.021), (I-052)+(1.006)+(3.022), (I-052)+(1.006)+(3.023), (I-052)+(1.006)+(3.024), (I-052)+(1.006)+(3.025), (I-052)+(1.006)+(3.026), (I-052)+(1.006)+(3.027), (I-052)+(1.006)+(3.028), (I-052)+(1.006)+(3.029), (I-052)+(1.006)+(3.030), (I-052)+(1.006)+(3.031), (I-052)+(1.006)+(5.001), (I-052)+(1.006)+(5.002), (I-052)+(1.006)+(5.003), (I-052)+(1.006)+(5.004), (I-052)+(1.006)+(5.005), (I-052)+(1.006)+(5.006), (I-052)+(1.006)+(5.007), (I-052)+(1.006)+(5.008), (I-052)+(1.006)+(5.009), (I-052)+(1.006)+(5.010), (I-052)+(1.006)+(5.011), (I-052)+(1.006)+(5.012), (I-052)+(1.006)+(5.013), (I-052)+(1.006)+(5.014), (I-052)+(1.006)+(5.015), (I-052)+(1.006)+(5.016), (I-052)+(1.006)+(5.017), (I-052)+(1.006)+(5.018), (I-052)+(1.006)+(5.019), (I-052)+(1.006)+(5.020), (I-052)+(1.006)+(5.021), (I-052)+(1.006)+(5.022), (I-052)+(1.006)+(5.023), (I-052)+(1.006)+(6.001), (I-052)+(1.006)+(6.002), (I-052)+(1.006)+(6.003), (I-052)+(1.006)+(6.004), (I-052)+(1.006)+(7.001), (I-052)+(1.006)+(7.002), (I-052)+(1.006)+(7.003), (I-052)+(1.006)+(7.004), (I-052)+(1.006)+(7.005), (I-052)+(1.006)+(7.006), (I-052)+(1.006)+(9.001), (I-052)+(1.006)+(9.002), (I-052)+(1.006)+(9.003), (I-052)+(1.006)+(9.004), (I-052)+(1.006)+(9.005), (I-052)+(1.006)+(9.006), (I-052)+(1.006)+(9.007), (I-052)+(1.006)+(9.008), (I-052)+(1.006)+(9.009), (I-052)+(1.006)+(14.001), (I-052)+(1.006)+(14.002), (I-052)+(1.006)+(15.008), (I-052)+(1.006)+(15.011), (I-052)+(1.006)+(15.012), (I-052)+(1.006)+(15.016), (I-052)+(1.006)+(15.025), (I-052)+(1.006)+(15.027), (I-052)+(1.006)+(15.047), (I-052)+(1.006)+(15.063), (I-052)+(1.006)+(15.064), (I-052)+(1.006)+(16.001), (I-052)+(1.006)+(16.002), (I-052)+(1.006)+(16.003), (I-052)+(1.006)+(16.004), (I-052)+(1.006)+(16.005), (I-052)+(1.006)+(16.006), (I-052)+(1.006)+(16.007), (I-052)+(1.006)+(16.008), (I-052)+(1.006)+(17.001), (I-052)+(1.006)+(17.002), (I-052)+(1.006)+(17.003), (I-052)+(1.006)+(17.004), (I-052)+(1.006)+(17.005), (I-052)+(1.006)+(17.006), (I-052)+(1.006)+(17.007), (I-052)+(1.006)+(17.008), (I-052)+(1.006)+(17.009), (I-052)+(1.006)+(17.010), (I-052)+(1.006)+(17.011), (I-052)+(1.006)+(17.012), (I-052)+(1.006)+(18.001), (I-052)+(1.007)+(1.008), (I-052)+(1.007)+(1.009), (I-052)+(1.007)+(1.010), (I-052)+(1.007)+(1.011), (I-052)+(1.007)+(1.012), (I-052)+(1.007)+(1.013), (I-052)+(1.007)+(1.014), (I-052)+(1.007)+(1.015), (I-052)+(1.007)+(1.016), (I-052)+(1.007)+(1.017), (I-052)+(1.007)+(1.018), (I-052)+(1.007)+(1.019), (I-052)+(1.007)+(1.020), (I-052)+(1.007)+(1.021), (I-052)+(1.007)+(1.022), (I-052)+(1.007)+(1.023), (I-052)+(1.007)+(1.024), (I-052)+(1.007)+(1.025), (I-052)+(1.007)+(1.026), (I-052)+(1.007)+(1.027), (I-052)+(1.007)+(1.028), (I-052)+(1.007)+(1.029), (I-052)+(1.007)+(1.030), (I-052)+(1.007)+(1.031), (I-052)+(1.007)+(1.032), (I-052)+(1.007)+(1.033), (I-052)+(1.007)+(1.034), (I-052)+(1.007)+(1.035), (I-052)+(1.007)+(1.036), (I-052)+(1.007)+(1.037), (I-052)+(1.007)+(1.038), (I-052)+(1.007)+(1.039), (I-052)+(1.007)+(1.040), (I-052)+(1.007)+(1.041), (I-052)+(1.007)+(1.042), (I-052)+(1.007)+(1.043), (I-052)+(1.007)+(1.044), (I-052)+(1.007)+(1.045), (I-052)+(1.007)+(1.046), (I-052)+(1.007)+(1.047), (I-052)+(1.007)+(1.048), (I-052)+(1.007)+(1.049), (I-052)+(1.007)+(1.050), (I-052)+(1.007)+(1.051), (I-052)+(1.007)+(1.052), (I-052)+(1.007)+(1.053), (I-052)+(1.007)+(1.054), (I-052)+(1.007)+(1.055), (I-052)+(1.007)+(1.056), (I-052)+(1.007)+(1.057), (I-052)+(1.007)+(1.058), (I-052)+(1.007)+(1.059), (I-052)+(1.007)+(1.060), (I-052)+(1.007)+(1.061), (I-052)+(1.007)+(1.062), (I-052)+(1.007)+(1.063), (I-052)+(1.007)+(1.064), (I-052)+(1.007)+(1.065), (I-052)+(1.007)+(1.066), (I-052)+(1.007)+(1.067), (I-052)+(1.007)+(1.068), (I-052)+(1.007)+(1.069), (I-052)+(1.007)+(1.070), (I-052)+(1.007)+(1.071), (I-052)+(1.007)+(1.072), (I-052)+(1.007)+(1.073), (I-052)+(1.007)+(1.074), (I-052)+(1.007)+(1.075), (I-052)+(1.007)+(1.076), (I-052)+(1.007)+(1.077), (I-052)+(1.007)+(1.078), (I-052)+(1.007)+(1.079), (I-052)+(1.007)+(1.080), (I-052)+(1.007)+(1.081), (I-052)+(1.007)+(1.082), (I-052)+(1.007)+(1.083), (I-052)+(1.007)+(1.084), (I-052)+(1.007)+(1.085), (I-052)+(1.007)+(1.086), (I-052)+(1.007)+(1.087), (I-052)+(1.007)+(1.088), (I-052)+(1.007)+(1.089), (I-052)+(1.007)+(1.090), (I-052)+(1.007)+(1.091), (I-052)+(1.007)+(1.092), (I-052)+(1.007)+(2.001), (I-052)+(1.007)+(2.002), (I-052)+(1.007)+(2.003), (I-052)+(1.007)+(2.004), (I-052)+(1.007)+(2.005), (I-052)+(1.007)+(2.006), (I-052)+(1.007)+(2.007), (I-052)+(1.007)+(2.008), (I-052)+(1.007)+(2.009), (I-052)+(1.007)+(2.010), (I-052)+(1.007)+(2.011), (I-052)+(1.007)+(2.012), (I-052)+(1.007)+(2.013), (I-052)+(1.007)+(2.014), (I-052)+(1.007)+(2.015), (I-052)+(1.007)+(2.016), (I-052)+(1.007)+(2.017), (I-052)+(1.007)+(2.018), (I-052)+(1.007)+(2.019), (I-052)+(1.007)+(2.020), (I-052)+(1.007)+(2.021), (I-052)+(1.007)+(2.022), (I-052)+(1.007)+(2.023), (I-052)+(1.007)+(2.024), (I-052)+(1.007)+(2.025), (I-052)+(1.007)+(2.026), (I-052)+(1.007)+(2.027), (I-052)+(1.007)+(2.028), (I-052)+(1.007)+(2.029), (I-052)+(1.007)+(2.030), (I-052)+(1.007)+(2.031), (I-052)+(1.007)+(2.032), (I-052)+(1.007)+(2.033), (I-052)+(1.007)+(2.034), (I-052)+(1.007)+(2.035), (I-052)+(1.007)+(2.036), (I-052)+(1.007)+(2.037), (I-052)+(1.007)+(2.038), (I-052)+(1.007)+(2.039), (I-052)+(1.007)+(2.040), (I-052)+(1.007)+(2.041), (I-052)+(1.007)+(2.042), (I-052)+(1.007)+(2.043), (I-052)+(1.007)+(2.044), (I-052)+(1.007)+(2.045), (I-052)+(1.007)+(2.046), (I-052)+(1.007)+(2.047), (I-052)+(1.007)+(2.048), (I-052)+(1.007)+(2.049), (I-052)+(1.007)+(2.050), (I-052)+(1.007)+(2.051), (I-052)+(1.007)+(2.052), (I-052)+(1.007)+(2.053), (I-052)+(1.007)+(2.054), (I-052)+(1.007)+(2.055), (I-052)+(1.007)+(2.056), (I-052)+(1.007)+(2.057), (I-052)+(1.007)+(2.058), (I-052)+(1.007)+(2.059), (I-052)+(1.007)+(3.001), (I-052)+(1.007)+(3.002), (I-052)+(1.007)+(3.003), (I-052)+(1.007)+(3.004), (I-052)+(1.007)+(3.005), (I-052)+(1.007)+(3.006), (I-052)+(1.007)+(3.007), (I-052)+(1.007)+(3.008), (I-052)+(1.007)+(3.009), (I-052)+(1.007)+(3.010), (I-052)+(1.007)+(3.011), (I-052)+(1.007)+(3.012), (I-052)+(1.007)+(3.013), (I-052)+(1.007)+(3.014), (I-052)+(1.007)+(3.015), (I-052)+(1.007)+(3.016), (I-052)+(1.007)+(3.017), (I-052)+(1.007)+(3.018), (I-052)+(1.007)+(3.019), (I-052)+(1.007)+(3.020), (I-052)+(1.007)+(3.021),
(I-052)+(1.007)+(3.022),
(I-052)+(1.007)+(3.023),
(I-052)+(1.007)+(3.024),
(I-052)+(1.007)+(3.025),
(I-052)+(1.007)+(3.026),
(I-052)+(1.007)+(3.027),
(I-052)+(1.007)+(3.028),
(I-052)+(1.007)+(3.029),
(I-052)+(1.007)+(3.030),
(I-052)+(1.007)+(3.031),
(I-052)+(1.007)+(5.001),
(I-052)+(1.007)+(5.002),
(I-052)+(1.007)+(5.003),
(I-052)+(1.007)+(5.004),
(I-052)+(1.007)+(5.005),
(I-052)+(1.007)+(5.006),
(I-052)+(1.007)+(5.007),
(I-052)+(1.007)+(5.008),
(I-052)+(1.007)+(5.009),
(I-052)+(1.007)+(5.010),
(I-052)+(1.007)+(5.011),
(I-052)+(1.007)+(5.012),
(I-052)+(1.007)+(5.013),
(I-052)+(1.007)+(5.014),
(I-052)+(1.007)+(5.015),
(I-052)+(1.007)+(5.016),
(I-052)+(1.007)+(5.017),
(I-052)+(1.007)+(5.018),
(I-052)+(1.007)+(5.019),
(I-052)+(1.007)+(5.020),
(I-052)+(1.007)+(5.021),
(I-052)+(1.007)+(5.022),
(I-052)+(1.007)+(5.023),
(I-052)+(1.007)+(6.001),
(I-052)+(1.007)+(6.002),
(I-052)+(1.007)+(6.003),
(I-052)+(1.007)+(6.004),
(I-052)+(1.007)+(7.001),
(I-052)+(1.007)+(7.002),
(I-052)+(1.007)+(7.003),
(I-052)+(1.007)+(7.004),
(I-052)+(1.007)+(7.005),
(I-052)+(1.007)+(7.006),
(I-052)+(1.007)+(9.001),
(I-052)+(1.007)+(9.002),
(I-052)+(1.007)+(9.003),
(I-052)+(1.007)+(9.004),
(I-052)+(1.007)+(9.005),
(I-052)+(1.007)+(9.006),
(I-052)+(1.007)+(9.007),
(I-052)+(1.007)+(9.008),
(I-052)+(1.007)+(9.009),
(I-052)+(1.007)+(14.001),
(I-052)+(1.007)+(14.002),
(I-052)+(1.007)+(15.008),
(I-052)+(1.007)+(15.011),
(I-052)+(1.007)+(15.012),
(I-052)+(1.007)+(15.016),
(I-052)+(1.007)+(15.025),
(I-052)+(1.007)+(15.027),
(I-052)+(1.007)+(15.047),
(I-052)+(1.007)+(15.063),
(I-052)+(1.007)+(15.064),
(I-052)+(1.007)+(16.001),
(I-052)+(1.007)+(16.002),
(I-052)+(1.007)+(16.003),
(I-052)+(1.007)+(16.004),
(I-052)+(1.007)+(16.005),
(I-052)+(1.007)+(16.006),
(I-052)+(1.007)+(16.007),
(I-052)+(1.007)+(16.008),
(I-052)+(1.007)+(17.001),
(I-052)+(1.007)+(17.002),
(I-052)+(1.007)+(17.003),
(I-052)+(1.007)+(17.004),
(I-052)+(1.007)+(17.005),
(I-052)+(1.007)+(17.006),
(I-052)+(1.007)+(17.007),
(I-052)+(1.007)+(17.008),
(I-052)+(1.007)+(17.009),
(I-052)+(1.007)+(17.010),
(I-052)+(1.007)+(17.011),
(I-052)+(1.007)+(17.012),
(I-052)+(1.007)+(18.001), (I-052)+(1.008)+(1.009),
(I-052)+(1.008)+(1.010),
(I-052)+(1.008)+(1.011),
(I-052)+(1.008)+(1.012),
(I-052)+(1.008)+(1.013),
(I-052)+(1.008)+(1.014),
(I-052)+(1.008)+(1.015),
(I-052)+(1.008)+(1.016),
(I-052)+(1.008)+(1.017),
(I-052)+(1.008)+(1.018),
(I-052)+(1.008)+(1.019),
(I-052)+(1.008)+(1.020),
(I-052)+(1.008)+(1.021),
(I-052)+(1.008)+(1.022),
(I-052)+(1.008)+(1.023),
(I-052)+(1.008)+(1.024),
(I-052)+(1.008)+(1.025),
(I-052)+(1.008)+(1.026),
(I-052)+(1.008)+(1.027),
(I-052)+(1.008)+(1.028),
(I-052)+(1.008)+(1.029),
(I-052)+(1.008)+(1.030),
(I-052)+(1.008)+(1.031),
(I-052)+(1.008)+(1.032),
(I-052)+(1.008)+(1.033),
(I-052)+(1.008)+(1.034),
(I-052)+(1.008)+(1.035),
(I-052)+(1.008)+(1.036),
(I-052)+(1.008)+(1.037),
(I-052)+(1.008)+(1.038),
(I-052)+(1.008)+(1.039),
(I-052)+(1.008)+(1.040),
(I-052)+(1.008)+(1.041),
(I-052)+(1.008)+(1.042),
(I-052)+(1.008)+(1.043),
(I-052)+(1.008)+(1.044),
(I-052)+(1.008)+(1.045),
(I-052)+(1.008)+(1.046),
(I-052)+(1.008)+(1.047),
(I-052)+(1.008)+(1.048),
(I-052)+(1.008)+(1.049),
(I-052)+(1.008)+(1.050),
(I-052)+(1.008)+(1.051),
(I-052)+(1.008)+(1.052),
(I-052)+(1.008)+(1.053),
(I-052)+(1.008)+(1.054),
(I-052)+(1.008)+(1.055),
(I-052)+(1.008)+(1.056),
(I-052)+(1.008)+(1.057),
(I-052)+(1.008)+(1.058),
(I-052)+(1.008)+(1.059),
(I-052)+(1.008)+(1.060),
(I-052)+(1.008)+(1.061),
(I-052)+(1.008)+(1.062),
(I-052)+(1.008)+(1.063),
(I-052)+(1.008)+(1.064),
(I-052)+(1.008)+(1.065),
(I-052)+(1.008)+(1.066),
(I-052)+(1.008)+(1.067),
(I-052)+(1.008)+(1.068),
(I-052)+(1.008)+(1.069),
(I-052)+(1.008)+(1.070),
(I-052)+(1.008)+(1.071),
(I-052)+(1.008)+(1.072),
(I-052)+(1.008)+(1.073),
(I-052)+(1.008)+(1.074),
(I-052)+(1.008)+(1.075),
(I-052)+(1.008)+(1.076),
(I-052)+(1.008)+(1.077),
(I-052)+(1.008)+(1.078),
(I-052)+(1.008)+(1.079),
(I-052)+(1.008)+(1.080),
(I-052)+(1.008)+(1.081),
(I-052)+(1.008)+(1.082),
(I-052)+(1.008)+(1.083),
(I-052)+(1.008)+(1.084),
(I-052)+(1.008)+(1.085),
(I-052)+(1.008)+(1.086),
(I-052)+(1.008)+(1.087),
(I-052)+(1.008)+(1.088),
(I-052)+(1.008)+(1.089),
(I-052)+(1.008)+(1.090),
(I-052)+(1.008)+(1.091),
(I-052)+(1.008)+(1.092),
(I-052)+(1.008)+(2.001),
(I-052)+(1.008)+(2.002),
(I-052)+(1.008)+(2.003),
(I-052)+(1.008)+(2.004),
(I-052)+(1.008)+(2.005),
(I-052)+(1.008)+(2.006),
(I-052)+(1.008)+(2.007),
(I-052)+(1.008)+(2.008),
(I-052)+(1.008)+(2.009),
(I-052)+(1.008)+(2.010),
(I-052)+(1.008)+(2.011),
(I-052)+(1.008)+(2.012),
(I-052)+(1.008)+(2.013),
(I-052)+(1.008)+(2.014),
(I-052)+(1.008)+(2.015),
(I-052)+(1.008)+(2.016),
(I-052)+(1.008)+(2.017),
(I-052)+(1.008)+(2.018),
(I-052)+(1.008)+(2.019),
(I-052)+(1.008)+(2.020),
(I-052)+(1.008)+(2.021),
(I-052)+(1.008)+(2.022),
(I-052)+(1.008)+(2.023),
(I-052)+(1.008)+(2.024),
(I-052)+(1.008)+(2.025),
(I-052)+(1.008)+(2.026),
(I-052)+(1.008)+(2.027),
(I-052)+(1.008)+(2.028),
(I-052)+(1.008)+(2.029),
(I-052)+(1.008)+(2.030),
(I-052)+(1.008)+(2.031),
(I-052)+(1.008)+(2.032),
(I-052)+(1.008)+(2.033),
(I-052)+(1.008)+(2.034),
(I-052)+(1.008)+(2.035),
(I-052)+(1.008)+(2.036),
(I-052)+(1.008)+(2.037),
(I-052)+(1.008)+(2.038),
(I-052)+(1.008)+(2.039),
(I-052)+(1.008)+(2.040),
(I-052)+(1.008)+(2.041),
(I-052)+(1.008)+(2.042),
(I-052)+(1.008)+(2.043),
(I-052)+(1.008)+(2.044),
(I-052)+(1.008)+(2.045),
(I-052)+(1.008)+(2.046),
(I-052)+(1.008)+(2.047),
(I-052)+(1.008)+(2.048),
(I-052)+(1.008)+(2.049),
(I-052)+(1.008)+(2.050),
(I-052)+(1.008)+(2.051),
(I-052)+(1.008)+(2.052),
(I-052)+(1.008)+(2.053),
(I-052)+(1.008)+(2.054),
(I-052)+(1.008)+(2.055),
(I-052)+(1.008)+(2.056),
(I-052)+(1.008)+(2.057),
(I-052)+(1.008)+(2.058),
(I-052)+(1.008)+(2.059),
(I-052)+(1.008)+(3.001),
(I-052)+(1.008)+(3.002),
(I-052)+(1.008)+(3.003),
(I-052)+(1.008)+(3.004),
(I-052)+(1.008)+(3.005),
(I-052)+(1.008)+(3.006),
(I-052)+(1.008)+(3.007),
(I-052)+(1.008)+(3.008),
(I-052)+(1.008)+(3.009),
(I-052)+(1.008)+(3.010),
(I-052)+(1.008)+(3.011),
(I-052)+(1.008)+(3.012),
(I-052)+(1.008)+(3.013),
(I-052)+(1.008)+(3.014),
(I-052)+(1.008)+(3.015),
(I-052)+(1.008)+(3.016),
(I-052)+(1.008)+(3.017),
(I-052)+(1.008)+(3.018),
(I-052)+(1.008)+(3.019),
(I-052)+(1.008)+(3.020),
(I-052)+(1.008)+(3.021),
(I-052)+(1.008)+(3.022),
(I-052)+(1.008)+(3.023),
(I-052)+(1.008)+(3.024),
(I-052)+(1.008)+(3.025),
(I-052)+(1.008)+(3.026),
(I-052)+(1.008)+(3.027),
(I-052)+(1.008)+(3.028),
(I-052)+(1.008)+(3.029),
(I-052)+(1.008)+(3.030),
(I-052)+(1.008)+(3.031),
(I-052)+(1.008)+(5.001),
(I-052)+(1.008)+(5.002),
(I-052)+(1.008)+(5.003),
(I-052)+(1.008)+(5.004),
(I-052)+(1.008)+(5.005),
(I-052)+(1.008)+(5.006),
(I-052)+(1.008)+(5.007),
(I-052)+(1.008)+(5.008), (I-052)+(1.008)+(5.009), (I-052)+(1.008)+(5.010), (I-052)+(1.008)+(5.011), (I-052)+(1.008)+(5.012), (I-052)+(1.008)+(5.013), (I-052)+(1.008)+(5.014), (I-052)+(1.008)+(5.015), (I-052)+(1.008)+(5.016), (I-052)+(1.008)+(5.017), (I-052)+(1.008)+(5.018), (I-052)+(1.008)+(5.019), (I-052)+(1.008)+(5.020), (I-052)+(1.008)+(5.021), (I-052)+(1.008)+(5.022), (I-052)+(1.008)+(5.023), (I-052)+(1.008)+(6.001), (I-052)+(1.008)+(6.002), (I-052)+(1.008)+(6.003), (I-052)+(1.008)+(6.004), (I-052)+(1.008)+(7.001), (I-052)+(1.008)+(7.002), (I-052)+(1.008)+(7.003), (I-052)+(1.008)+(7.004), (I-052)+(1.008)+(7.005), (I-052)+(1.008)+(7.006), (I-052)+(1.008)+(9.001), (I-052)+(1.008)+(9.002), (I-052)+(1.008)+(9.003), (I-052)+(1.008)+(9.004), (I-052)+(1.008)+(9.005), (I-052)+(1.008)+(9.006), (I-052)+(1.008)+(9.007), (I-052)+(1.008)+(9.008), (I-052)+(1.008)+(9.009), (I-052)+(1.008)+(14.001), (I-052)+(1.008)+(14.002), (I-052)+(1.008)+(15.008), (I-052)+(1.008)+(15.011), (I-052)+(1.008)+(15.012), (I-052)+(1.008)+(15.016), (I-052)+(1.008)+(15.025), (I-052)+(1.008)+(15.027), (I-052)+(1.008)+(15.047), (I-052)+(1.008)+(15.063), (I-052)+(1.008)+(15.064), (I-052)+(1.008)+(16.001), (I-052)+(1.008)+(16.002), (I-052)+(1.008)+(16.003), (I-052)+(1.008)+(16.004), (I-052)+(1.008)+(16.005), (I-052)+(1.008)+(16.006), (I-052)+(1.008)+(16.007), (I-052)+(1.008)+(16.008), (I-052)+(1.008)+(17.001), (I-052)+(1.008)+(17.002), (I-052)+(1.008)+(17.003), (I-052)+(1.008)+(17.004), (I-052)+(1.008)+(17.005), (I-052)+(1.008)+(17.006), (I-052)+(1.008)+(17.007), (I-052)+(1.008)+(17.008), (I-052)+(1.008)+(17.009), (I-052)+(1.008)+(17.010), (I-052)+(1.008)+(17.011), (I-052)+(1.008)+(17.012), (I-052)+(1.008)+(18.001), (I-052)+(1.009)+(1.010), (I-052)+(1.009)+(1.011), (I-052)+(1.009)+(1.012), (I-052)+(1.009)+(1.013), (I-052)+(1.009)+(1.014), (I-052)+(1.009)+(1.015), (I-052)+(1.009)+(1.016), (I-052)+(1.009)+(1.017), (I-052)+(1.009)+(1.018), (I-052)+(1.009)+(1.019), (I-052)+(1.009)+(1.020), (I-052)+(1.009)+(1.021), (I-052)+(1.009)+(1.022), (I-052)+(1.009)+(1.023), (I-052)+(1.009)+(1.024), (I-052)+(1.009)+(1.025), (I-052)+(1.009)+(1.026), (I-052)+(1.009)+(1.027), (I-052)+(1.009)+(1.028), (I-052)+(1.009)+(1.029), (I-052)+(1.009)+(1.030), (I-052)+(1.009)+(1.031), (I-052)+(1.009)+(1.032), (I-052)+(1.009)+(1.033), (I-052)+(1.009)+(1.034), (I-052)+(1.009)+(1.035), (I-052)+(1.009)+(1.036), (I-052)+(1.009)+(1.037), (I-052)+(1.009)+(1.038), (I-052)+(1.009)+(1.039), (I-052)+(1.009)+(1.040), (I-052)+(1.009)+(1.041), (I-052)+(1.009)+(1.042), (I-052)+(1.009)+(1.043), (I-052)+(1.009)+(1.044), (I-052)+(1.009)+(1.045), (I-052)+(1.009)+(1.046), (I-052)+(1.009)+(1.047), (I-052)+(1.009)+(1.048), (I-052)+(1.009)+(1.049), (I-052)+(1.009)+(1.050), (I-052)+(1.009)+(1.051), (I-052)+(1.009)+(1.052), (I-052)+(1.009)+(1.053), (I-052)+(1.009)+(1.054), (I-052)+(1.009)+(1.055), (I-052)+(1.009)+(1.056), (I-052)+(1.009)+(1.057), (I-052)+(1.009)+(1.058), (I-052)+(1.009)+(1.059), (I-052)+(1.009)+(1.060), (I-052)+(1.009)+(1.061), (I-052)+(1.009)+(1.062), (I-052)+(1.009)+(1.063), (I-052)+(1.009)+(1.064), (I-052)+(1.009)+(1.065), (I-052)+(1.009)+(1.066), (I-052)+(1.009)+(1.067), (I-052)+(1.009)+(1.068), (I-052)+(1.009)+(1.069), (I-052)+(1.009)+(1.070), (I-052)+(1.009)+(1.071), (I-052)+(1.009)+(1.072), (I-052)+(1.009)+(1.073), (I-052)+(1.009)+(1.074), (I-052)+(1.009)+(1.075), (I-052)+(1.009)+(1.076), (I-052)+(1.009)+(1.077), (I-052)+(1.009)+(1.078), (I-052)+(1.009)+(1.079), (I-052)+(1.009)+(1.080), (I-052)+(1.009)+(1.081), (1-052)+(1.009)+(1.082), (I-052)+(1.009)+(1.083), (I-052)+(1.009)+(1.084), (I-052)+(1.009)+(1.085), (I-052)+(1.009)+(1.086), (I-052)+(1.009)+(1.087), (I-052)+(1.009)+(1.088), (I-052)+(1.009)+(1.089), (I-052)+(1.009)+(1.090), (I-052)+(1.009)+(1.091), (I-052)+(1.009)+(1.092), (I-052)+(1.009)+(2.001), (I-052)+(1.009)+(2.002), (I-052)+(1.009)+(2.003), (I-052)+(1.009)+(2.004), (I-052)+(1.009)+(2.005), (I-052)+(1.009)+(2.006), (I-052)+(1.009)+(2.007), (I-052)+(1.009)+(2.008), (I-052)+(1.009)+(2.009), (I-052)+(1.009)+(2.010), (I-052)+(1.009)+(2.011), (I-052)+(1.009)+(2.012), (I-052)+(1.009)+(2.013), (I-052)+(1.009)+(2.014), (I-052)+(1.009)+(2.015), (I-052)+(1.009)+(2.016), (I-052)+(1.009)+(2.017), (I-052)+(1.009)+(2.018), (I-052)+(1.009)+(2.019), (I-052)+(1.009)+(2.020), (I-052)+(1.009)+(2.021), (I-052)+(1.009)+(2.022), (I-052)+(1.009)+(2.023), (I-052)+(1.009)+(2.024), (I-052)+(1.009)+(2.025), (I-052)+(1.009)+(2.026), (I-052)+(1.009)+(2.027), (I-052)+(1.009)+(2.028), (I-052)+(1.009)+(2.029), (I-052)+(1.009)+(2.030), (I-052)+(1.009)+(2.031), (I-052)+(1.009)+(2.032), (I-052)+(1.009)+(2.033), (I-052)+(1.009)+(2.034), (I-052)+(1.009)+(2.035), (I-052)+(1.009)+(2.036), (I-052)+(1.009)+(2.037), (I-052)+(1.009)+(2.038), (I-052)+(1.009)+(2.039), (I-052)+(1.009)+(2.040), (I-052)+(1.009)+(2.041), (I-052)+(1.009)+(2.042), (I-052)+(1.009)+(2.043), (I-052)+(1.009)+(2.044), (I-052)+(1.009)+(2.045), (I-052)+(1.009)+(2.046), (I-052)+(1.009)+(2.047), (I-052)+(1.009)+(2.048), (I-052)+(1.009)+(2.049), (I-052)+(1.009)+(2.050), (I-052)+(1.009)+(2.051), (I-052)+(1.009)+(2.052), (I-052)+(1.009)+(2.053), (I-052)+(1.009)+(2.054), (I-052)+(1.009)+(2.055), (I-052)+(1.009)+(2.056), (I-052)+(1.009)+(2.057), (I-052)+(1.009)+(2.058), (I-052)+(1.009)+(2.059), (I-052)+(1.009)+(3.001), (I-052)+(1.009)+(3.002), (I-052)+(1.009)+(3.003), (I-052)+(1.009)+(3.004), (I-052)+(1.009)+(3.005), (I-052)+(1.009)+(3.006), (I-052)+(1.009)+(3.007), (I-052)+(1.009)+(3.008), (I-052)+(1.009)+(3.009), (I-052)+(1.009)+(3.010), (I-052)+(1.009)+(3.011), (I-052)+(1.009)+(3.012), (I-052)+(1.009)+(3.013), (I-052)+(1.009)+(3.014), (I-052)+(1.009)+(3.015), (I-052)+(1.009)+(3.016), (I-052)+(1.009)+(3.017), (I-052)+(1.009)+(3.018), (I-052)+(1.009)+(3.019), (I-052)+(1.009)+(3.020), (I-052)+(1.009)+(3.021), (I-052)+(1.009)+(3.022), (I-052)+(1.009)+(3.023), (I-052)+(1.009)+(3.024), (I-052)+(1.009)+(3.025), (I-052)+(1.009)+(3.026), (I-052)+(1.009)+(3.027), (I-052)+(1.009)+(3.028), (I-052)+(1.009)+(3.029), (I-052)+(1.009)+(3.030), (I-052)+(1.009)+(3.031), (I-052)+(1.009)+(5.001), (I-052)+(1.009)+(5.002), (I-052)+(1.009)+(5.003), (I-052)+(1.009)+(5.004), (I-052)+(1.009)+(5.005), (I-052)+(1.009)+(5.006), (I-052)+(1.009)+(5.007), (I-052)+(1.009)+(5.008), (I-052)+(1.009)+(5.009), (I-052)+(1.009)+(5.010), (I-052)+(1.009)+(5.011), (I-052)+(1.009)+(5.012), (I-052)+(1.009)+(5.013), (I-052)+(1.009)+(5.014), (I-052)+(1.009)+(5.015), (I-052)+(1.009)+(5.016), (I-052)+(1.009)+(5.017), (I-052)+(1.009)+(5.018), (I-052)+(1.009)+(5.019), (I-052)+(1.009)+(5.020), (I-052)+(1.009)+(5.021), (I-052)+(1.009)+(5.022), (I-052)+(1.009)+(5.023), (I-052)+(1.009)+(6.001), (I-052)+(1.009)+(6.002), (I-052)+(1.009)+(6.003), (I-052)+(1.009)+(6.004), (I-052)+(1.009)+(7.001), (I-052)+(1.009)+(7.002), (I-052)+(1.009)+(7.003), (I-052)+(1.009)+(7.004), (I-052)+(1.009)+(7.005), (I-052)+(1.009)+(7.006), (I-052)+(1.009)+(9.001), (I-052)+(1.009)+(9.002), (I-052)+(1.009)+(9.003), (I-052)+(1.009)+(9.004), (I-052)+(1.009)+(9.005), (I-052)+(1.009)+(9.006), (I-052)+(1.009)+(9.007), (I-052)+(1.009)+(9.008), (I-052)+(1.009)+(9.009), (I-052)+(1.009)+(14.001), (I-052)+(1.009)+(14.002), (I-052)+(1.009)+(15.008), (I-052)+(1.009)+(15.011), (I-052)+(1.009)+(15.012), (I-052)+(1.009)+(15.016), (I-052)+(1.009)+(15.025), (I-052)+(1.009)+(15.027), (I-052)+(1.009)+(15.047), (I-052)+(1.009)+(15.063), (I-052)+(1.009)+(15.064), (I-052)+(1.009)+(16.001), (I-052)+(1.009)+(16.002), (I-052)+(1.009)+(16.003), (I-052)+(1.009)+(16.004), (I-052)+(1.009)+(16.005), (I-052)+(1.009)+(16.006), (I-052)+(1.009)+(16.007), (I-052)+(1.009)+(16.008), (I-052)+(1.009)+(17.001), (I-052)+(1.009)+(17.002), (I-052)+(1.009)+(17.003), (I-052)+(1.009)+(17.004), (I-052)+(1.009)+(17.005), (I-052)+(1.009)+(17.006), (I-052)+(1.009)+(17.007), (I-052)+(1.009)+(17.008), (I-052)+(1.009)+(17.009), (I-052)+(1.009)+(17.010), (I-052)+(1.009)+(17.011), (I-052)+(1.009)+(17.012), (I-052)+(1.009)+(18.001), (I-052)+(1.010)+(1.011), (I-052)+(1.010)+(1.012), (I-052)+(1.010)+(1.013), (I-052)+(1.010)+(1.014), (I-052)+(1.010)+(1.015), (I-052)+(1.010)+(1.016), (I-052)+(1.010)+(1.017), (I-052)+(1.010)+(1.018), (I-052)+(1.010)+(1.019), (I-052)+(1.010)+(1.020), (I-052)+(1.010)+(1.021), (I-052)+(1.010)+(1.022), (I-052)+(1.010)+(1.023), (I-052)+(1.010)+(1.024), (I-052)+(1.010)+(1.025), (I-052)+(1.010)+(1.026), (I-052)+(1.010)+(1.027), (I-052)+(1.010)+(1.028), (I-052)+(1.010)+(1.029), (I-052)+(1.010)+(1.030), (I-052)+(1.010)+(1.031), (I-052)+(1.010)+(1.032), (I-052)+(1.010)+(1.033), (I-052)+(1.010)+(1.034), (I-052)+(1.010)+(1.035), (I-052)+(1.010)+(1.036), (I-052)+(1.010)+(1.037), (I-052)+(1.010)+(1.038), (I-052)+(1.010)+(1.039), (I-052)+(1.010)+(1.040), (I-052)+(1.010)+(1.041), (I-052)+(1.010)+(1.042), (I-052)+(1.010)+(1.043), (I-052)+(1.010)+(1.044), (I-052)+(1.010)+(1.045), (I-052)+(1.010)+(1.046), (I-052)+(1.010)+(1.047), (I-052)+(1.010)+(1.048), (I-052)+(1.010)+(1.049), (I-052)+(1.010)+(1.050), (I-052)+(1.010)+(1.051), (I-052)+(1.010)+(1.052), (I-052)+(1.010)+(1.053), (I-052)+(1.010)+(1.054), (I-052)+(1.010)+(1.055), (I-052)+(1.010)+(1.056), (I-052)+(1.010)+(1.057), (I-052)+(1.010)+(1.058), (I-052)+(1.010)+(1.059), (I-052)+(1.010)+(1.060), (I-052)+(1.010)+(1.061), (I-052)+(1.010)+(1.062), (I-052)+(1.010)+(1.063), (I-052)+(1.010)+(1.064), (I-052)+(1.010)+(1.065), (I-052)+(1.010)+(1.066), (I-052)+(1.010)+(1.067), (I-052)+(1.010)+(1.068), (I-052)+(1.010)+(1.069), (I-052)+(1.010)+(1.070), (I-052)+(1.010)+(1.071), (I-052)+(1.010)+(1.072), (I-052)+(1.010)+(1.073), (I-052)+(1.010)+(1.074), (I-052)+(1.010)+(1.075), (I-052)+(1.010)+(1.076), (I-052)+(1.010)+(1.077), (I-052)+(1.010)+(1.078), (I-052)+(1.010)+(1.079), (I-052)+(1.010)+(1.080), (I-052)+(1.010)+(1.081), (I-052)+(1.010)+(1.082), (I-052)+(1.010)+(1.083), (I-052)+(1.010)+(1.084), (I-052)+(1.010)+(1.085), (I-052)+(1.010)+(1.086), (I-052)+(1.010)+(1.087), (I-052)+(1.010)+(1.088), (I-052)+(1.010)+(1.089), (I-052)+(1.010)+(1.090), (I-052)+(1.010)+(1.091), (I-052)+(1.010)+(1.092), (I-052)+(1.010)+(2.001), (I-052)+(1.010)+(2.002), (I-052)+(1.010)+(2.003), (I-052)+(1.010)+(2.004), (I-052)+(1.010)+(2.005), (I-052)+(1.010)+(2.006), (I-052)+(1.010)+(2.007), (I-052)+(1.010)+(2.008), (I-052)+(1.010)+(2.009), (I-052)+(1.010)+(2.010), (I-052)+(1.010)+(2.011), (I-052)+(1.010)+(2.012), (I-052)+(1.010)+(2.013), (I-052)+(1.010)+(2.014), (I-052)+(1.010)+(2.015), (I-052)+(1.010)+(2.016), (I-052)+(1.010)+(2.017), (I-052)+(1.010)+(2.018), (I-052)+(1.010)+(2.019), (I-052)+(1.010)+(2.020), (I-052)+(1.010)+(2.021), (I-052)+(1.010)+(2.022), (I-052)+(1.010)+(2.023), (I-052)+(1.010)+(2.024), (I-052)+(1.010)+(2.025), (I-052)+(1.010)+(2.026), (I-052)+(1.010)+(2.027), (I-052)+(1.010)+(2.028), (I-052)+(1.010)+(2.029), (I-052)+(1.010)+(2.030), (I-052)+(1.010)+(2.031), (I-052)+(1.010)+(2.032), (I-052)+(1.010)+(2.033), (I-052)+(1.010)+(2.034), (I-052)+(1.010)+(2.035), (I-052)+(1.010)+(2.036), (I-052)+(1.010)+(2.037), (I-052)+(1.010)+(2.038), (I-052)+(1.010)+(2.039), (I-052)+(1.010)+(2.040), (I-052)+(1.010)+(2.041), (I-052)+(1.010)+(2.042), (I-052)+(1.010)+(2.043), (I-052)+(1.010)+(2.044), (I-052)+(1.010)+(2.045), (I-052)+(1.010)+(2.046), (I-052)+(1.010)+(2.047), (I-052)+(1.010)+(2.048), (I-052)+(1.010)+(2.049), (I-052)+(1.010)+(2.050), (I-052)+(1.010)+(2.051), (I-052)+(1.010)+(2.052), (I-052)+(1.010)+(2.053), (I-052)+(1.010)+(2.054), (I-052)+(1.010)+(2.055), (I-052)+(1.010)+(2.056), (I-052)+(1.010)+(2.057), (I-052)+(1.010)+(2.058), (I-052)+(1.010)+(2.059), (I-052)+(1.010)+(3.001), (I-052)+(1.010)+(3.002), (I-052)+(1.010)+(3.003), (I-052)+(1.010)+(3.004), (I-052)+(1.010)+(3.005), (I-052)+(1.010)+(3.006), (I-052)+(1.010)+(3.007), (I-052)+(1.010)+(3.008), (I-052)+(1.010)+(3.009), (I-052)+(1.010)+(3.010), (I-052)+(1.010)+(3.011), (I-052)+(1.010)+(3.012), (I-052)+(1.010)+(3.013), (I-052)+(1.010)+(3.014), (I-052)+(1.010)+(3.015), (I-052)+(1.010)+(3.016), (I-052)+(1.010)+(3.017), (I-052)+(1.010)+(3.018), (I-052)+(1.010)+(3.019), (I-052)+(1.010)+(3.020), (I-052)+(1.010)+(3.021), (I-052)+(1.010)+(3.022), (I-052)+(1.010)+(3.023), (I-052)+(1.010)+(3.024), (I-052)+(1.010)+(3.025), (I-052)+(1.010)+(3.026), (I-052)+(1.010)+(3.027), (I-052)+(1.010)+(3.028), (I-052)+(1.010)+(3.029), (I-052)+(1.010)+(3.030), (I-052)+(1.010)+(3.031), (I-052)+(1.010)+(5.001), (I-052)+(1.010)+(5.002), (I-052)+(1.010)+(5.003), (I-052)+(1.010)+(5.004), (I-052)+(1.010)+(5.005), (I-052)+(1.010)+(5.006), (I-052)+(1.010)+(5.007), (I-052)+(1.010)+(5.008), (I-052)+(1.010)+(5.009), (I-052)+(1.010)+(5.010), (I-052)+(1.010)+(5.011), (I-052)+(1.010)+(5.012), (I-052)+(1.010)+(5.013), (I-052)+(1.010)+(5.014), (I-052)+(1.010)+(5.015), (I-052)+(1.010)+(5.016), (I-052)+(1.010)+(5.017), (I-052)+(1.010)+(5.018), (I-052)+(1.010)+(5.019), (I-052)+(1.010)+(5.020), (I-052)+(1.010)+(5.021), (I-052)+(1.010)+(5.022), (I-052)+(1.010)+(5.023), (I-052)+(1.010)+(6.001), (I-052)+(1.010)+(6.002), (I-052)+(1.010)+(6.003), (I-052)+(1.010)+(6.004), (I-052)+(1.010)+(7.001), (I-052)+(1.010)+(7.002), (I-052)+(1.010)+(7.003), (I-052)+(1.010)+(7.004), (I-052)+(1.010)+(7.005), (I-052)+(1.010)+(7.006), (I-052)+(1.010)+(9.001), (I-052)+(1.010)+(9.002), (I-052)+(1.010)+(9.003), (I-052)+(1.010)+(9.004), (I-052)+(1.010)+(9.005), (I-052)+(1.010)+(9.006), (I-052)+(1.010)+(9.007), (I-052)+(1.010)+(9.008), (I-052)+(1.010)+(9.009), (I-052)+(1.010)+(14.001), (I-052)+(1.010)+(14.002), (I-052)+(1.010)+(15.008), (I-052)+(1.010)+(15.011), (I-052)+(1.010)+(15.012), (I-052)+(1.010)+(15.016), (I-052)+(1.010)+(15.025), (I-052)+(1.010)+(15.027), (I-052)+(1.010)+(15.047), (I-052)+(1.010)+(15.063), (I-052)+(1.010)+(15.064), (I-052)+(1.010)+(16.001), (I-052)+(1.010)+(16.002), (I-052)+(1.010)+(16.003), (I-052)+(1.010)+(16.004), (I-052)+(1.010)+(16.005), (I-052)+(1.010)+(16.006), (I-052)+(1.010)+(16.007), (I-052)+(1.010)+(16.008), (I-052)+(1.010)+(17.001), (I-052)+(1.010)+(17.002), (I-052)+(1.010)+(17.003), (I-052)+(1.010)+(17.004), (I-052)+(1.010)+(17.005), (I-052)+(1.010)+(17.006), (I-052)+(1.010)+(17.007), (I-052)+(1.010)+(17.008), (I-052)+(1.010)+(17.009), (I-052)+(1.010)+(17.010), (I-052)+(1.010)+(17.011), (I-052)+(1.010)+(17.012), (I-052)+(1.010)+(18.001), (I-052)+(1.011)+(1.012), (I-052)+(1.011)+(1.013), (I-052)+(1.011)+(1.014), (I-052)+(1.011)+(1.015), (I-052)+(1.011)+(1.016), (I-052)+(1.011)+(1.017), (I-052)+(1.011)+(1.018), (I-052)+(1.011)+(1.019), (I-052)+(1.011)+(1.020), (I-052)+(1.011)+(1.021), (I-052)+(1.011)+(1.022), (I-052)+(1.011)+(1.023), (I-052)+(1.011)+(1.024), (I-052)+(1.011)+(1.025), (I-052)+(1.011)+(1.026), (I-052)+(1.011)+(1.027), (I-052)+(1.011)+(1.028), (I-052)+(1.011)+(1.029), (I-052)+(1.011)+(1.030), (I-052)+(1.011)+(1.031), (I-052)+(1.011)+(1.032), (I-052)+(1.011)+(1.033), (I-052)+(1.011)+(1.034), (I-052)+(1.011)+(1.035), (I-052)+(1.011)+(1.036), (I-052)+(1.011)+(1.037), (I-052)+(1.011)+(1.038), (I-052)+(1.011)+(1.039), (I-052)+(1.011)+(1.040), (I-052)+(1.011)+(1.041), (I-052)+(1.011)+(1.042), (I-052)+(1.011)+(1.043), (I-052)+(1.011)+(1.044), (I-052)+(1.011)+(1.045), (I-052)+(1.011)+(1.046), (I-052)+(1.011)+(1.047), (I-052)+(1.011)+(1.048), (I-052)+(1.011)+(1.049), (I-052)+(1.011)+(1.050), (I-052)+(1.011)+(1.051), (I-052)+(1.011)+(1.052), (I-052)+(1.011)+(1.053), (I-052)+(1.011)+(1.054), (I-052)+(1.011)+(1.055), (I-052)+(1.011)+(1.056), (I-052)+(1.011)+(1.057), (I-052)+(1.011)+(1.058), (I-052)+(1.011)+(1.059), (I-052)+(1.011)+(1.060), (I-052)+(1.011)+(1.061), (I-052)+(1.011)+(1.062), (I-052)+(1.011)+(1.063), (I-052)+(1.011)+(1.064), (I-052)+(1.011)+(1.065), (I-052)+(1.011)+(1.066), (I-052)+(1.011)+(1.067), (I-052)+(1.011)+(1.068), (I-052)+(1.011)+(1.069), (I-052)+(1.011)+(1.070), (I-052)+(1.011)+(1.071), (I-052)+(1.011)+(1.072), (I-052)+(1.011)+(1.073), (I-052)+(1.011)+(1.074), (I-052)+(1.011)+(1.075), (I-052)+(1.011)+(1.076), (I-052)+(1.011)+(1.077), (I-052)+(1.011)+(1.078), (I-052)+(1.011)+(1.079), (I-052)+(1.011)+(1.080), (I-052)+(1.011)+(1.081), (I-052)+(1.011)+(1.082), (I-052)+(1.011)+(1.083), (I-052)+(1.011)+(1.084), (I-052)+(1.011)+(1.085), (I-052)+(1.011)+(1.086), (I-052)+(1.011)+(1.087), (I-052)+(1.011)+(1.088), (I-052)+(1.011)+(1.089), (I-052)+(1.011)+(1.090), (I-052)+(1.011)+(1.091), (I-052)+(1.011)+(1.092), (I-052)+(1.011)+(2.001), (I-052)+(1.011)+(2.002), (I-052)+(1.011)+(2.003), (I-052)+(1.011)+(2.004), (I-052)+(1.011)+(2.005), (I-052)+(1.011)+(2.006), (I-052)+(1.011)+(2.007), (I-052)+(1.011)+(2.008), (I-052)+(1.011)+(2.009), (I-052)+(1.011)+(2.010), (I-052)+(1.011)+(2.011), (I-052)+(1.011)+(2.012), (I-052)+(1.011)+(2.013), (I-052)+(1.011)+(2.014), (I-052)+(1.011)+(2.015), (I-052)+(1.011)+(2.016), (I-052)+(1.011)+(2.017), (I-052)+(1.011)+(2.018), (I-052)+(1.011)+(2.019), (I-052)+(1.011)+(2.020), (I-052)+(1.011)+(2.021), (I-052)+(1.011)+(2.022), (I-052)+(1.011)+(2.023), (I-052)+(1.011)+(2.024), (I-052)+(1.011)+(2.025), (I-052)+(1.011)+(2.026), (I-052)+(1.011)+(2.027), (I-052)+(1.011)+(2.028), (I-052)+(1.011)+(2.029), (I-052)+(1.011)+(2.030), (I-052)+(1.011)+(2.031), (I-052)+(1.011)+(2.032), (I-052)+(1.011)+(2.033), (I-052)+(1.011)+(2.034), (I-052)+(1.011)+(2.035), (I-052)+(1.011)+(2.036), (I-052)+(1.011)+(2.037), (I-052)+(1.011)+(2.038), (I-052)+(1.011)+(2.039), (I-052)+(1.011)+(2.040), (I-052)+(1.011)+(2.041), (I-052)+(1.011)+(2.042), (I-052)+(1.011)+(2.043), (I-052)+(1.011)+(2.044), (I-052)+(1.011)+(2.045), (I-052)+(1.011)+(2.046), (I-052)+(1.011)+(2.047), (I-052)+(1.011)+(2.048), (I-052)+(1.011)+(2.049), (I-052)+(1.011)+(2.050), (I-052)+(1.011)+(2.051), (I-052)+(1.011)+(2.052), (I-052)+(1.011)+(2.053), (I-052)+(1.011)+(2.054), (I-052)+(1.011)+(2.055), (I-052)+(1.011)+(2.056), (I-052)+(1.011)+(2.057), (I-052)+(1.011)+(2.058), (I-052)+(1.011)+(2.059), (I-052)+(1.011)+(3.001), (I-052)+(1.011)+(3.002), (I-052)+(1.011)+(3.003), (I-052)+(1.011)+(3.004), (I-052)+(1.011)+(3.005), (I-052)+(1.011)+(3.006), (I-052)+(1.011)+(3.007), (I-052)+(1.011)+(3.008), (I-052)+(1.011)+(3.009), (I-052)+(1.011)+(3.010), (I-052)+(1.011)+(3.011), (I-052)+(1.011)+(3.012), (I-052)+(1.011)+(3.013), (I-052)+(1.011)+(3.014), (I-052)+(1.011)+(3.015), (I-052)+(1.011)+(3.016), (I-052)+(1.011)+(3.017), (I-052)+(1.011)+(3.018), (I-052)+(1.011)+(3.019), (I-052)+(1.011)+(3.020), (I-052)+(1.011)+(3.021), (I-052)+(1.011)+(3.022), (I-052)+(1.011)+(3.023), (I-052)+(1.011)+(3.024), (I-052)+(1.011)+(3.025), (I-052)+(1.011)+(3.026), (I-052)+(1.011)+(3.027), (I-052)+(1.011)+(3.028), (I-052)+(1.011)+(3.029), (I-052)+(1.011)+(3.030), (I-052)+(1.011)+(3.031), (I-052)+(1.011)+(5.001), (I-052)+(1.011)+(5.002), (I-052)+(1.011)+(5.003), (I-052)+(1.011)+(5.004), (I-052)+(1.011)+(5.005), (I-052)+(1.011)+(5.006), (I-052)+(1.011)+(5.007), (I-052)+(1.011)+(5.008), (I-052)+(1.011)+(5.009), (I-052)+(1.011)+(5.010), (I-052)+(1.011)+(5.011), (I-052)+(1.011)+(5.012), (I-052)+(1.011)+(5.013), (I-052)+(1.011)+(5.014), (I-052)+(1.011)+(5.015), (I-052)+(1.011)+(5.016), (I-052)+(1.011)+(5.017), (I-052)+(1.011)+(5.018), (I-052)+(1.011)+(5.019), (I-052)+(1.011)+(5.020), (I-052)+(1.011)+(5.021), (I-052)+(1.011)+(5.022), (I-052)+(1.011)+(5.023), (I-052)+(1.011)+(6.001), (I-052)+(1.011)+(6.002), (I-052)+(1.011)+(6.003), (I-052)+(1.011)+(6.004), (I-052)+(1.011)+(7.001), (I-052)+(1.011)+(7.002), (I-052)+(1.011)+(7.003), (I-052)+(1.011)+(7.004), (I-052)+(1.011)+(7.005), (I-052)+(1.011)+(7.006), (I-052)+(1.011)+(9.001), (I-052)+(1.011)+(9.002), (I-052)+(1.011)+(9.003), (I-052)+(1.011)+(9.004), (I-052)+(1.011)+(9.005), (I-052)+(1.011)+(9.006), (I-052)+(1.011)+(9.007), (I-052)+(1.011)+(9.008), (I-052)+(1.011)+(9.009), (I-052)+(1.011)+(14.001), (I-052)+(1.011)+(14.002), (I-052)+(1.011)+(15.008), (I-052)+(1.011)+(15.011), (I-052)+(1.011)+(15.012), (I-052)+(1.011)+(15.016), (I-052)+(1.011)+(15.025), (I-052)+(1.011)+(15.027), (I-052)+(1.011)+(15.047), (I-052)+(1.011)+(15.063), (I-052)+(1.011)+(15.064), (I-052)+(1.011)+(16.001), (I-052)+(1.011)+(16.002), (I-052)+(1.011)+(16.003), (I-052)+(1.011)+(16.004), (I-052)+(1.011)+(16.005), (I-052)+(1.011)+(16.006), (I-052)+(1.011)+(16.007), (I-052)+(1.011)+(16.008), (I-052)+(1.011)+(17.001), (I-052)+(1.011)+(17.002), (I-052)+(1.011)+(17.003), (I-052)+(1.011)+(17.004), (I-052)+(1.011)+(17.005), (I-052)+(1.011)+(17.006), (I-052)+(1.011)+(17.007), (I-052)+(1.011)+(17.008), (I-052)+(1.011)+(17.009), (I-052)+(1.011)+(17.010), (I-052)+(1.011)+(17.011), (I-052)+(1.011)+(17.012), (I-052)+(1.011)+(18.001),
(I-052)+(1.012)+(1.013), (I-052)+(1.012)+(1.014), (I-052)+(1.012)+(1.015), (I-052)+(1.012)+(1.016), (I-052)+(1.012)+(1.017), (I-052)+(1.012)+(1.018), (I-052)+(1.012)+(1.019), (I-052)+(1.012)+(1.020), (I-052)+(1.012)+(1.021), (I-052)+(1.012)+(1.022), (I-052)+(1.012)+(1.023), (I-052)+(1.012)+(1.024), (I-052)+(1.012)+(1.025), (I-052)+(1.012)+(1.026), (I-052)+(1.012)+(1.027), (I-052)+(1.012)+(1.028), (I-052)+(1.012)+(1.029), (I-052)+(1.012)+(1.030), (I-052)+(1.012)+(1.031), (I-052)+(1.012)+(1.032), (I-052)+(1.012)+(1.033), (I-052)+(1.012)+(1.034), (I-052)+(1.012)+(1.035), (I-052)+(1.012)+(1.036), (I-052)+(1.012)+(1.037), (I-052)+(1.012)+(1.038), (I-052)+(1.012)+(1.039), (I-052)+(1.012)+(1.040), (I-052)+(1.012)+(1.041), (I-052)+(1.012)+(1.042), (I-052)+(1.012)+(1.043), (I-052)+(1.012)+(1.044), (I-052)+(1.012)+(1.045), (I-052)+(1.012)+(1.046), (I-052)+(1.012)+(1.047), (I-052)+(1.012)+(1.048), (I-052)+(1.012)+(1.049), (I-052)+(1.012)+(1.050), (I-052)+(1.012)+(1.051), (I-052)+(1.012)+(1.052), (I-052)+(1.012)+(1.053), (I-052)+(1.012)+(1.054), (I-052)+(1.012)+(1.055), (I-052)+(1.012)+(1.056), (I-052)+(1.012)+(1.057), (I-052)+(1.012)+(1.058), (I-052)+(1.012)+(1.059), (I-052)+(1.012)+(1.060), (I-052)+(1.012)+(1.061), (I-052)+(1.012)+(1.062), (I-052)+(1.012)+(1.063), (I-052)+(1.012)+(1.064), (I-052)+(1.012)+(1.065), (I-052)+(1.012)+(1.066), (I-052)+(1.012)+(1.067), (I-052)+(1.012)+(1.068), (I-052)+(1.012)+(1.069), (I-052)+(1.012)+(1.070), (I-052)+(1.012)+(1.071), (I-052)+(1.012)+(1.072), (I-052)+(1.012)+(1.073), (I-052)+(1.012)+(1.074), (I-052)+(1.012)+(1.075), (I-052)+(1.012)+(1.076), (I-052)+(1.012)+(1.077), (I-052)+(1.012)+(1.078), (I-052)+(1.012)+(1.079), (I-052)+(1.012)+(1.080), (I-052)+(1.012)+(1.081), (I-052)+(1.012)+(1.082), (I-052)+(1.012)+(1.083), (I-052)+(1.012)+(1.084), (I-052)+(1.012)+(1.085), (I-052)+(1.012)+(1.086), (I-052)+(1.012)+(1.087), (I-052)+(1.012)+(1.088), (I-052)+(1.012)+(1.089), (I-052)+(1.012)+(1.090), (I-052)+(1.012)+(1.091), (I-052)+(1.012)+(1.092), (I-052)+(1.012)+(2.001), (I-052)+(1.012)+(2.002), (I-052)+(1.012)+(2.003), (I-052)+(1.012)+(2.004), (I-052)+(1.012)+(2.005), (I-052)+(1.012)+(2.006), (I-052)+(1.012)+(2.007), (I-052)+(1.012)+(2.008), (I-052)+(1.012)+(2.009), (I-052)+(1.012)+(2.010), (I-052)+(1.012)+(2.011), (I-052)+(1.012)+(2.012), (I-052)+(1.012)+(2.013), (I-052)+(1.012)+(2.014), (I-052)+(1.012)+(2.015), (I-052)+(1.012)+(2.016), (I-052)+(1.012)+(2.017), (I-052)+(1.012)+(2.018), (I-052)+(1.012)+(2.019), (I-052)+(1.012)+(2.020), (I-052)+(1.012)+(2.021), (I-052)+(1.012)+(2.022), (I-052)+(1.012)+(2.023), (I-052)+(1.012)+(2.024), (I-052)+(1.012)+(2.025), (I-052)+(1.012)+(2.026), (I-052)+(1.012)+(2.027), (I-052)+(1.012)+(2.028), (I-052)+(1.012)+(2.029), (I-052)+(1.012)+(2.030), (I-052)+(1.012)+(2.031), (I-052)+(1.012)+(2.032), (I-052)+(1.012)+(2.033), (I-052)+(1.012)+(2.034), (I-052)+(1.012)+(2.035), (I-052)+(1.012)+(2.036), (I-052)+(1.012)+(2.037), (I-052)+(1.012)+(2.038), (I-052)+(1.012)+(2.039), (I-052)+(1.012)+(2.040), (I-052)+(1.012)+(2.041), (I-052)+(1.012)+(2.042), (I-052)+(1.012)+(2.043), (I-052)+(1.012)+(2.044), (I-052)+(1.012)+(2.045), (I-052)+(1.012)+(2.046), (I-052)+(1.012)+(2.047), (I-052)+(1.012)+(2.048), (I-052)+(1.012)+(2.049), (I-052)+(1.012)+(2.050), (I-052)+(1.012)+(2.051), (I-052)+(1.012)+(2.052), (I-052)+(1.012)+(2.053), (I-052)+(1.012)+(2.054), (I-052)+(1.012)+(2.055), (I-052)+(1.012)+(2.056), (I-052)+(1.012)+(2.057), (I-052)+(1.012)+(2.058), (I-052)+(1.012)+(2.059), (I-052)+(1.012)+(3.001), (I-052)+(1.012)+(3.002), (I-052)+(1.012)+(3.003), (I-052)+(1.012)+(3.004), (I-052)+(1.012)+(3.005), (I-052)+(1.012)+(3.006), (I-052)+(1.012)+(3.007), (I-052)+(1.012)+(3.008), (I-052)+(1.012)+(3.009), (I-052)+(1.012)+(3.010), (I-052)+(1.012)+(3.011), (I-052)+(1.012)+(3.012), (I-052)+(1.012)+(3.013), (I-052)+(1.012)+(3.014), (I-052)+(1.012)+(3.015), (I-052)+(1.012)+(3.016), (I-052)+(1.012)+(3.017), (I-052)+(1.012)+(3.018), (I-052)+(1.012)+(3.019), (I-052)+(1.012)+(3.020), (I-052)+(1.012)+(3.021), (I-052)+(1.012)+(3.022), (I-052)+(1.012)+(3.023), (I-052)+(1.012)+(3.024), (I-052)+(1.012)+(3.025), (I-052)+(1.012)+(3.026), (I-052)+(1.012)+(3.027), (I-052)+(1.012)+(3.028), (I-052)+(1.012)+(3.029), (I-052)+(1.012)+(3.030), (I-052)+(1.012)+(3.031), (I-052)+(1.012)+(5.001), (I-052)+(1.012)+(5.002), (I-052)+(1.012)+(5.003), (I-052)+(1.012)+(5.004), (I-052)+(1.012)+(5.005), (I-052)+(1.012)+(5.006), (I-052)+(1.012)+(5.007), (I-052)+(1.012)+(5.008), (I-052)+(1.012)+(5.009), (I-052)+(1.012)+(5.010), (I-052)+(1.012)+(5.011), (I-052)+(1.012)+(5.012), (I-052)+(1.012)+(5.013), (I-052)+(1.012)+(5.014), (I-052)+(1.012)+(5.015), (I-052)+(1.012)+(5.016), (I-052)+(1.012)+(5.017), (I-052)+(1.012)+(5.018), (I-052)+(1.012)+(5.019), (I-052)+(1.012)+(5.020), (I-052)+(1.012)+(5.021), (I-052)+(1.012)+(5.022), (I-052)+(1.012)+(5.023), (I-052)+(1.012)+(6.001), (I-052)+(1.012)+(6.002), (I-052)+(1.012)+(6.003), (I-052)+(1.012)+(6.004), (I-052)+(1.012)+(7.001), (I-052)+(1.012)+(7.002), (I-052)+(1.012)+(7.003), (I-052)+(1.012)+(7.004), (I-052)+(1.012)+(7.005), (I-052)+(1.012)+(7.006), (I-052)+(1.012)+(9.001), (I-052)+(1.012)+(9.002), (I-052)+(1.012)+(9.003), (I-052)+(1.012)+(9.004), (I-052)+(1.012)+(9.005), (I-052)+(1.012)+(9.006), (I-052)+(1.012)+(9.007), (I-052)+(1.012)+(9.008), (I-052)+(1.012)+(9.009), (I-052)+(1.012)+(14.001), (I-052)+(1.012)+(14.002), (I-052)+(1.012)+(15.008), (I-052)+(1.012)+(15.011), (I-052)+(1.012)+(15.012), (I-052)+(1.012)+(15.016), (I-052)+(1.012)+(15.025), (I-052)+(1.012)+(15.027), (I-052)+(1.012)+(15.047), (I-052)+(1.012)+(15.063), (I-052)+(1.012)+(15.064), (I-052)+(1.012)+(16.001), (I-052)+(1.012)+(16.002), (I-052)+(1.012)+(16.003), (I-052)+(1.012)+(16.004), (I-052)+(1.012)+(16.005), (I-052)+(1.012)+(16.006), (I-052)+(1.012)+(16.007), (I-052)+(1.012)+(16.008), (I-052)+(1.012)+(17.001), (I-052)+(1.012)+(17.002), (I-052)+(1.012)+(17.003), (I-052)+(1.012)+(17.004), (I-052)+(1.012)+(17.005), (I-052)+(1.012)+(17.006), (I-052)+(1.012)+(17.007), (I-052)+(1.012)+(17.008), (I-052)+(1.012)+(17.009), (I-052)+(1.012)+(17.010), (I-052)+(1.012)+(17.011), (I-052)+(1.012)+(17.012), (I-052)+(1.012)+(18.001),
(I-052)+(1.013)+(1.014), (I-052)+(1.013)+(1.015), (I-052)+(1.013)+(1.016), (I-052)+(1.013)+(1.017), (I-052)+(1.013)+(1.018), (I-052)+(1.013)+(1.019), (I-052)+(1.013)+(1.020), (I-052)+(1.013)+(1.021), (I-052)+(1.013)+(1.022), (I-052)+(1.013)+(1.023), (I-052)+(1.013)+(1.024), (I-052)+(1.013)+(1.025), (I-052)+(1.013)+(1.026), (I-052)+(1.013)+(1.027), (I-052)+(1.013)+(1.028), (I-052)+(1.013)+(1.029), (I-052)+(1.013)+(1.030), (I-052)+(1.013)+(1.031), (I-052)+(1.013)+(1.032), (I-052)+(1.013)+(1.033), (I-052)+(1.013)+(1.034), (I-052)+(1.013)+(1.035), (I-052)+(1.013)+(1.036), (I-052)+(1.013)+(1.037), (I-052)+(1.013)+(1.038), (I-052)+(1.013)+(1.039), (I-052)+(1.013)+(1.040), (I-052)+(1.013)+(1.041), (I-052)+(1.013)+(1.042), (I-052)+(1.013)+(1.043), (I-052)+(1.013)+(1.044), (I-052)+(1.013)+(1.045), (I-052)+(1.013)+(1.046), (I-052)+(1.013)+(1.047), (I-052)+(1.013)+(1.048), (I-052)+(1.013)+(1.049), (I-052)+(1.013)+(1.050), (I-052)+(1.013)+(1.051), (I-052)+(1.013)+(1.052), (I-052)+(1.013)+(1.053), (I-052)+(1.013)+(1.054), (I-052)+(1.013)+(1.055), (I-052)+(1.013)+(1.056), (I-052)+(1.013)+(1.057), (I-052)+(1.013)+(1.058), (I-052)+(1.013)+(1.059), (I-052)+(1.013)+(1.060), (I-052)+(1.013)+(1.061), (I-052)+(1.013)+(1.062), (I-052)+(1.013)+(1.063), (I-052)+(1.013)+(1.064), (I-052)+(1.013)+(1.065), (I-052)+(1.013)+(1.066), (I-052)+(1.013)+(1.067), (I-052)+(1.013)+(1.068), (I-052)+(1.013)+(1.069), (I-052)+(1.013)+(1.070), (I-052)+(1.013)+(1.071), (I-052)+(1.013)+(1.072), (I-052)+(1.013)+(1.073), (I-052)+(1.013)+(1.074), (I-052)+(1.013)+(1.075), (I-052)+(1.013)+(1.076), (I-052)+(1.013)+(1.077), (I-052)+(1.013)+(1.078), (I-052)+(1.013)+(1.079), (I-052)+(1.013)+(1.080), (I-052)+(1.013)+(1.081), (I-052)+(1.013)+(1.082), (I-052)+(1.013)+(1.083), (I-052)+(1.013)+(1.084), (I-052)+(1.013)+(1.085), (I-052)+(1.013)+(1.086), (I-052)+(1.013)+(1.087), (I-052)+(1.013)+(1.088), (I-052)+(1.013)+(1.089), (I-052)+(1.013)+(1.090), (I-052)+(1.013)+(1.091), (I-052)+(1.013)+(1.092), (I-052)+(1.013)+(2.001), (I-052)+(1.013)+(2.002), (I-052)+(1.013)+(2.003), (I-052)+(1.013)+(2.004), (I-052)+(1.013)+(2.005), (I-052)+(1.013)+(2.006), (I-052)+(1.013)+(2.007), (I-052)+(1.013)+(2.008), (I-052)+(1.013)+(2.009), (I-052)+(1.013)+(2.010), (I-052)+(1.013)+(2.011), (I-052)+(1.013)+(2.012), (I-052)+(1.013)+(2.013), (I-052)+(1.013)+(2.014), (I-052)+(1.013)+(2.015), (I-052)+(1.013)+(2.016), (I-052)+(1.013)+(2.017), (I-052)+(1.013)+(2.018), (I-052)+(1.013)+(2.019), (I-052)+(1.013)+(2.020), (I-052)+(1.013)+(2.021), (I-052)+(1.013)+(2.022), (I-052)+(1.013)+(2.023), (I-052)+(1.013)+(2.024), (I-052)+(1.013)+(2.025), (I-052)+(1.013)+(2.026), (I-052)+(1.013)+(2.027), (I-052)+(1.013)+(2.028), (I-052)+(1.013)+(2.029), (I-052)+(1.013)+(2.030), (I-052)+(1.013)+(2.031), (I-052)+(1.013)+(2.032), (I-052)+(1.013)+(2.033), (I-052)+(1.013)+(2.034), (I-052)+(1.013)+(2.035), (I-052)+(1.013)+(2.036), (I-052)+(1.013)+(2.037), (I-052)+(1.013)+(2.038), (I-052)+(1.013)+(2.039), (I-052)+(1.013)+(2.040), (I-052)+(1.013)+(2.041), (I-052)+(1.013)+(2.042), (I-052)+(1.013)+(2.043), (I-052)+(1.013)+(2.044), (I-052)+(1.013)+(2.045), (I-052)+(1.013)+(2.046), (I-052)+(1.013)+(2.047), (I-052)+(1.013)+(2.048), (I-052)+(1.013)+(2.049), (I-052)+(1.013)+(2.050), (I-052)+(1.013)+(2.051), (I-052)+(1.013)+(2.052), (I-052)+(1.013)+(2.053), (I-052)+(1.013)+(2.054), (I-052)+(1.013)+(2.055), (I-052)+(1.013)+(2.056), (I-052)+(1.013)+(2.057), (I-052)+(1.013)+(2.058), (I-052)+(1.013)+(2.059), (I-052)+(1.013)+(3.001), (I-052)+(1.013)+(3.002), (I-052)+(1.013)+(3.003), (I-052)+(1.013)+(3.004), (I-052)+(1.013)+(3.005), (I-052)+(1.013)+(3.006), (I-052)+(1.013)+(3.007), (I-052)+(1.013)+(3.008), (I-052)+(1.013)+(3.009), (I-052)+(1.013)+(3.010), (I-052)+(1.013)+(3.011), (I-052)+(1.013)+(3.012), (I-052)+(1.013)+(3.013), (I-052)+(1.013)+(3.014), (I-052)+(1.013)+(3.015), (I-052)+(1.013)+(3.016), (I-052)+(1.013)+(3.017), (I-052)+(1.013)+(3.018), (I-052)+(1.013)+(3.019), (I-052)+(1.013)+(3.020), (I-052)+(1.013)+(3.021), (I-052)+(1.013)+(3.022), (I-052)+(1.013)+(3.023), (I-052)+(1.013)+(3.024), (I-052)+(1.013)+(3.025), (I-052)+(1.013)+(3.026), (I-052)+(1.013)+(3.027), (I-052)+(1.013)+(3.028), (I-052)+(1.013)+(3.029), (I-052)+(1.013)+(3.030), (I-052)+(1.013)+(3.031), (I-052)+(1.013)+(5.001), (I-052)+(1.013)+(5.002), (I-052)+(1.013)+(5.003), (I-052)+(1.013)+(5.004), (I-052)+(1.013)+(5.005), (I-052)+(1.013)+(5.006), (I-052)+(1.013)+(5.007), (I-052)+(1.013)+(5.008), (I-052)+(1.013)+(5.009), (I-052)+(1.013)+(5.010), (I-052)+(1.013)+(5.011), (I-052)+(1.013)+(5.012), (I-052)+(1.013)+(5.013), (I-052)+(1.013)+(5.014), (I-052)+(1.013)+(5.015), (I-052)+(1.013)+(5.016), (I-052)+(1.013)+(5.017), (I-052)+(1.013)+(5.018), (I-052)+(1.013)+(5.019), (I-052)+(1.013)+(5.020), (I-052)+(1.013)+(5.021), (I-052)+(1.013)+(5.022), (I-052)+(1.013)+(5.023), (I-052)+(1.013)+(6.001), (I-052)+(1.013)+(6.002), (I-052)+(1.013)+(6.003), (I-052)+(1.013)+(6.004), (I-052)+(1.013)+(7.001), (I-052)+(1.013)+(7.002), (I-052)+(1.013)+(7.003), (I-052)+(1.013)+(7.004), (I-052)+(1.013)+(7.005), (I-052)+(1.013)+(7.006), (I-052)+(1.013)+(9.001), (I-052)+(1.013)+(9.002), (I-052)+(1.013)+(9.003), (I-052)+(1.013)+(9.004), (I-052)+(1.013)+(9.005), (I-052)+(1.013)+(9.006), (I-052)+(1.013)+(9.007), (I-052)+(1.013)+(9.008), (I-052)+(1.013)+(9.009), (I-052)+(1.013)+(14.001), (I-052)+(1.013)+(14.002), (I-052)+(1.013)+(15.008), (I-052)+(1.013)+(15.011), (I-052)+(1.013)+(15.012), (I-052)+(1.013)+(15.016), (I-052)+(1.013)+(15.025), (I-052)+(1.013)+(15.027), (I-052)+(1.013)+(15.047), (I-052)+(1.013)+(15.063), (I-052)+(1.013)+(15.064), (I-052)+(1.013)+(16.001), (I-052)+(1.013)+(16.002), (I-052)+(1.013)+(16.003), (I-052)+(1.013)+(16.004), (I-052)+(1.013)+(16.005), (I-052)+(1.013)+(16.006), (I-052)+(1.013)+(16.007), (I-052)+(1.013)+(16.008), (I-052)+(1.013)+(17.001), (I-052)+(1.013)+(17.002), (I-052)+(1.013)+(17.003), (I-052)+(1.013)+(17.004), (I-052)+(1.013)+(17.005), (I-052)+(1.013)+(17.006), (I-052)+(1.013)+(17.007), (I-052)+(1.013)+(17.008), (I-052)+(1.013)+(17.009), (I-052)+(1.013)+(17.010), (I-052)+(1.013)+(17.011), (I-052)+(1.013)+(17.012), (I-052)+(1.013)+(18.001), (I-052)+(1.014)+(1.015), (I-052)+(1.014)+(1.016), (I-052)+(1.014)+(1.017), (I-052)+(1.014)+(1.018), (I-052)+(1.014)+(1.019), (I-052)+(1.014)+(1.020), (I-052)+(1.014)+(1.021), (I-052)+(1.014)+(1.022), (I-052)+(1.014)+(1.023), (I-052)+(1.014)+(1.024), (I-052)+(1.014)+(1.025), (I-052)+(1.014)+(1.026), (I-052)+(1.014)+(1.027), (I-052)+(1.014)+(1.028), (I-052)+(1.014)+(1.029), (I-052)+(1.014)+(1.030), (I-052)+(1.014)+(1.031), (I-052)+(1.014)+(1.032), (I-052)+(1.014)+(1.033), (I-052)+(1.014)+(1.034), (I-052)+(1.014)+(1.035), (I-052)+(1.014)+(1.036), (I-052)+(1.014)+(1.037), (I-052)+(1.014)+(1.038), (I-052)+(1.014)+(1.039), (I-052)+(1.014)+(1.040), (I-052)+(1.014)+(1.041), (I-052)+(1.014)+(1.042), (I-052)+(1.014)+(1.043), (I-052)+(1.014)+(1.044), (I-052)+(1.014)+(1.045), (I-052)+(1.014)+(1.046), (I-052)+(1.014)+(1.047), (I-052)+(1.014)+(1.048), (I-052)+(1.014)+(1.049), (I-052)+(1.014)+(1.050), (I-052)+(1.014)+(1.051), (I-052)+(1.014)+(1.052), (I-052)+(1.014)+(1.053), (I-052)+(1.014)+(1.054), (I-052)+(1.014)+(1.055), (I-052)+(1.014)+(1.056), (I-052)+(1.014)+(1.057), (I-052)+(1.014)+(1.058), (I-052)+(1.014)+(1.059), (I-052)+(1.014)+(1.060), (I-052)+(1.014)+(1.061), (I-052)+(1.014)+(1.062), (I-052)+(1.014)+(1.063), (I-052)+(1.014)+(1.064), (I-052)+(1.014)+(1.065), (I-052)+(1.014)+(1.066), (I-052)+(1.014)+(1.067), (I-052)+(1.014)+(1.068), (I-052)+(1.014)+(1.069), (I-052)+(1.014)+(1.070), (I-052)+(1.014)+(1.071), (I-052)+(1.014)+(1.072), (I-052)+(1.014)+(1.073), (I-052)+(1.014)+(1.074), (I-052)+(1.014)+(1.075), (I-052)+(1.014)+(1.076), (I-052)+(1.014)+(1.077), (I-052)+(1.014)+(1.078), (I-052)+(1.014)+(1.079), (I-052)+(1.014)+(1.080), (I-052)+(1.014)+(1.081), (I-052)+(1.014)+(1.082), (I-052)+(1.014)+(1.083), (I-052)+(1.014)+(1.084), (I-052)+(1.014)+(1.085), (I-052)+(1.014)+(1.086), (I-052)+(1.014)+(1.087), (I-052)+(1.014)+(1.088), (I-052)+(1.014)+(1.089), (I-052)+(1.014)+(1.090), (I-052)+(1.014)+(1.091), (I-052)+(1.014)+(1.092), (I-052)+(1.014)+(2.001), (I-052)+(1.014)+(2.002), (I-052)+(1.014)+(2.003), (I-052)+(1.014)+(2.004), (I-052)+(1.014)+(2.005), (I-052)+(1.014)+(2.006), (I-052)+(1.014)+(2.007), (I-052)+(1.014)+(2.008), (I-052)+(1.014)+(2.009), (I-052)+(1.014)+(2.010), (I-052)+(1.014)+(2.011), (I-052)+(1.014)+(2.012), (I-052)+(1.014)+(2.013), (I-052)+(1.014)+(2.014), (I-052)+(1.014)+(2.015), (I-052)+(1.014)+(2.016), (I-052)+(1.014)+(2.017), (I-052)+(1.014)+(2.018), (I-052)+(1.014)+(2.019), (I-052)+(1.014)+(2.020), (I-052)+(1.014)+(2.021), (I-052)+(1.014)+(2.022), (I-052)+(1.014)+(2.023), (I-052)+(1.014)+(2.024), (I-052)+(1.014)+(2.025), (I-052)+(1.014)+(2.026), (I-052)+(1.014)+(2.027), (I-052)+(1.014)+(2.028), (I-052)+(1.014)+(2.029), (I-052)+(1.014)+(2.030), (I-052)+(1.014)+(2.031), (I-052)+(1.014)+(2.032), (I-052)+(1.014)+(2.033), (I-052)+(1.014)+(2.034), (I-052)+(1.014)+(2.035), (I-052)+(1.014)+(2.036), (I-052)+(1.014)+(2.037), (I-052)+(1.014)+(2.038), (I-052)+(1.014)+(2.039), (I-052)+(1.014)+(2.040), (I-052)+(1.014)+(2.041), (I-052)+(1.014)+(2.042), (I-052)+(1.014)+(2.043), (I-052)+(1.014)+(2.044), (I-052)+(1.014)+(2.045), (I-052)+(1.014)+(2.046), (I-052)+(1.014)+(2.047), (I-052)+(1.014)+(2.048), (I-052)+(1.014)+(2.049), (I-052)+(1.014)+(2.050), (I-052)+(1.014)+(2.051), (I-052)+(1.014)+(2.052), (I-052)+(1.014)+(2.053), (I-052)+(1.014)+(2.054), (I-052)+(1.014)+(2.055), (I-052)+(1.014)+(2.056), (I-052)+(1.014)+(2.057), (I-052)+(1.014)+(2.058), (I-052)+(1.014)+(2.059), (I-052)+(1.014)+(3.001), (I-052)+(1.014)+(3.002), (I-052)+(1.014)+(3.003), (I-052)+(1.014)+(3.004), (I-052)+(1.014)+(3.005), (I-052)+(1.014)+(3.006), (I-052)+(1.014)+(3.007), (I-052)+(1.014)+(3.008), (I-052)+(1.014)+(3.009), (I-052)+(1.014)+(3.010), (I-052)+(1.014)+(3.011), (I-052)+(1.014)+(3.012), (I-052)+(1.014)+(3.013), (I-052)+(1.014)+(3.014), (I-052)+(1.014)+(3.015), (I-052)+(1.014)+(3.016), (I-052)+(1.014)+(3.017), (I-052)+(1.014)+(3.018), (I-052)+(1.014)+(3.019), (I-052)+(1.014)+(3.020), (I-052)+(1.014)+(3.021), (I-052)+(1.014)+(3.022), (I-052)+(1.014)+(3.023), (I-052)+(1.014)+(3.024), (I-052)+(1.014)+(3.025), (I-052)+(1.014)+(3.026), (I-052)+(1.014)+(3.027), (I-052)+(1.014)+(3.028), (I-052)+(1.014)+(3.029), (I-052)+(1.014)+(3.030), (I-052)+(1.014)+(3.031), (I-052)+(1.014)+(5.001), (I-052)+(1.014)+(5.002), (I-052)+(1.014)+(5.003), (I-052)+(1.014)+(5.004), (I-052)+(1.014)+(5.005), (I-052)+(1.014)+(5.006), (I-052)+(1.014)+(5.007), (I-052)+(1.014)+(5.008), (I-052)+(1.014)+(5.009), (I-052)+(1.014)+(5.010), (I-052)+(1.014)+(5.011), (I-052)+(1.014)+(5.012), (I-052)+(1.014)+(5.013), (I-052)+(1.014)+(5.014), (I-052)+(1.014)+(5.015), (I-052)+(1.014)+(5.016), (I-052)+(1.014)+(5.017), (I-052)+(1.014)+(5.018), (I-052)+(1.014)+(5.019), (I-052)+(1.014)+(5.020), (I-052)+(1.014)+(5.021), (I-052)+(1.014)+(5.022), (I-052)+(1.014)+(5.023), (I-052)+(1.014)+(6.001), (I-052)+(1.014)+(6.002), (I-052)+(1.014)+(6.003), (I-052)+(1.014)+(6.004), (I-052)+(1.014)+(7.001), (I-052)+(1.014)+(7.002), (I-052)+(1.014)+(7.003), (I-052)+(1.014)+(7.004), (I-052)+(1.014)+(7.005), (I-052)+(1.014)+(7.006), (I-052)+(1.014)+(9.001), (I-052)+(1.014)+(9.002), (I-052)+(1.014)+(9.003), (I-052)+(1.014)+(9.004), (I-052)+(1.014)+(9.005), (I-052)+(1.014)+(9.006), (I-052)+(1.014)+(9.007), (I-052)+(1.014)+(9.008), (I-052)+(1.014)+(9.009), (I-052)+(1.014)+(14.001), (I-052)+(1.014)+(14.002), (I-052)+(1.014)+(15.008), (I-052)+(1.014)+(15.011), (I-052)+(1.014)+(15.012), (I-052)+(1.014)+(15.016), (I-052)+(1.014)+(15.025), (I-052)+(1.014)+(15.027), (I-052)+(1.014)+(15.047), (I-052)+(1.014)+(15.063), (I-052)+(1.014)+(15.064), (I-052)+(1.014)+(16.001), (I-052)+(1.014)+(16.002), (I-052)+(1.014)+(16.003), (I-052)+(1.014)+(16.004), (I-052)+(1.014)+(16.005), (I-052)+(1.014)+(16.006), (I-052)+(1.014)+(16.007), (I-052)+(1.014)+(16.008), (I-052)+(1.014)+(17.001), (I-052)+(1.014)+(17.002), (I-052)+(1.014)+(17.003), (I-052)+(1.014)+(17.004), (I-052)+(1.014)+(17.005), (I-052)+(1.014)+(17.006), (I-052)+(1.014)+(17.007), (I-052)+(1.014)+(17.008), (I-052)+(1.014)+(17.009), (I-052)+(1.014)+(17.010), (I-052)+(1.014)+(17.011), (I-052)+(1.014)+(17.012), (I-052)+(1.014)+(18.001), (I-052)+(1.015)+(1.016), (I-052)+(1.015)+(1.017), (I-052)+(1.015)+(1.018), (I-052)+(1.015)+(1.019), (I-052)+(1.015)+(1.020), (I-052)+(1.015)+(1.021), (I-052)+(1.015)+(1.022), (I-052)+(1.015)+(1.023), (I-052)+(1.015)+(1.024), (I-052)+(1.015)+(1.025), (I-052)+(1.015)+(1.026), (I-052)+(1.015)+(1.027), (I-052)+(1.015)+(1.028), (I-052)+(1.015)+(1.029), (I-052)+(1.015)+(1.030), (I-052)+(1.015)+(1.031), (I-052)+(1.015)+(1.032), (I-052)+(1.015)+(1.033), (I-052)+(1.015)+(1.034), (I-052)+(1.015)+(1.035), (I-052)+(1.015)+(1.036), (I-052)+(1.015)+(1.037), (I-052)+(1.015)+(1.038), (I-052)+(1.015)+(1.039), (I-052)+(1.015)+(1.040), (I-052)+(1.015)+(1.041), (I-052)+(1.015)+(1.042), (I-052)+(1.015)+(1.043), (I-052)+(1.015)+(1.044), (I-052)+(1.015)+(1.045), (I-052)+(1.015)+(1.046), (I-052)+(1.015)+(1.047), (I-052)+(1.015)+(1.048), (I-052)+(1.015)+(1.049), (I-052)+(1.015)+(1.050), (I-052)+(1.015)+(1.051), (I-052)+(1.015)+(1.052), (I-052)+(1.015)+(1.053), (I-052)+(1.015)+(1.054), (I-052)+(1.015)+(1.055), (I-052)+(1.015)+(1.056), (I-052)+(1.015)+(1.057), (I-052)+(1.015)+(1.058), (I-052)+(1.015)+(1.059), (I-052)+(1.015)+(1.060), (I-052)+(1.015)+(1.061), (I-052)+(1.015)+(1.062), (I-052)+(1.015)+(1.063), (I-052)+(1.015)+(1.064), (I-052)+(1.015)+(1.065), (I-052)+(1.015)+(1.066), (I-052)+(1.015)+(1.067), (I-052)+(1.015)+(1.068), (I-052)+(1.015)+(1.069), (I-052)+(1.015)+(1.070), (I-052)+(1.015)+(1.071), (I-052)+(1.015)+(1.072), (I-052)+(1.015)+(1.073), (I-052)+(1.015)+(1.074), (I-052)+(1.015)+(1.075), (I-052)+(1.015)+(1.076), (I-052)+(1.015)+(1.077), (I-052)+(1.015)+(1.078), (I-052)+(1.015)+(1.079), (I-052)+(1.015)+(1.080), (I-052)+(1.015)+(1.081), (I-052)+(1.015)+(1.082), (I-052)+(1.015)+(1.083), (I-052)+(1.015)+(1.084), (I-052)+(1.015)+(1.085), (I-052)+(1.015)+(1.086), (I-052)+(1.015)+(1.087), (I-052)+(1.015)+(1.088), (I-052)+(1.015)+(1.089), (I-052)+(1.015)+(1.090), (I-052)+(1.015)+(1.091), (I-052)+(1.015)+(1.092), (I-052)+(1.015)+(2.001), (I-052)+(1.015)+(2.002), (I-052)+(1.015)+(2.003), (I-052)+(1.015)+(2.004), (I-052)+(1.015)+(2.005), (I-052)+(1.015)+(2.006), (I-052)+(1.015)+(2.007), (I-052)+(1.015)+(2.008), (I-052)+(1.015)+(2.009), (I-052)+(1.015)+(2.010), (I-052)+(1.015)+(2.011), (I-052)+(1.015)+(2.012), (I-052)+(1.015)+(2.013), (I-052)+(1.015)+(2.014), (I-052)+(1.015)+(2.015), (I-052)+(1.015)+(2.016), (I-052)+(1.015)+(2.017), (I-052)+(1.015)+(2.018), (I-052)+(1.015)+(2.019), (I-052)+(1.015)+(2.020), (I-052)+(1.015)+(2.021), (I-052)+(1.015)+(2.022), (I-052)+(1.015)+(2.023), (I-052)+(1.015)+(2.024), (I-052)+(1.015)+(2.025), (I-052)+(1.015)+(2.026), (I-052)+(1.015)+(2.027), (I-052)+(1.015)+(2.028), (I-052)+(1.015)+(2.029), (I-052)+(1.015)+(2.030), (I-052)+(1.015)+(2.031), (I-052)+(1.015)+(2.032), (I-052)+(1.015)+(2.033), (I-052)+(1.015)+(2.034), (I-052)+(1.015)+(2.035), (I-052)+(1.015)+(2.036), (I-052)+(1.015)+(2.037), (I-052)+(1.015)+(2.038), (I-052)+(1.015)+(2.039), (I-052)+(1.015)+(2.040), (I-052)+(1.015)+(2.041), (I-052)+(1.015)+(2.042), (I-052)+(1.015)+(2.043), (I-052)+(1.015)+(2.044), (I-052)+(1.015)+(2.045), (I-052)+(1.015)+(2.046), (I-052)+(1.015)+(2.047), (I-052)+(1.015)+(2.048), (I-052)+(1.015)+(2.049), (I-052)+(1.015)+(2.050), (I-052)+(1.015)+(2.051), (I-052)+(1.015)+(2.052), (I-052)+(1.015)+(2.053), (I-052)+(1.015)+(2.054), (I-052)+(1.015)+(2.055), (I-052)+(1.015)+(2.056), (I-052)+(1.015)+(2.057), (I-052)+(1.015)+(2.058), (I-052)+(1.015)+(2.059), (I-052)+(1.015)+(3.001), (I-052)+(1.015)+(3.002), (I-052)+(1.015)+(3.003), (I-052)+(1.015)+(3.004), (I-052)+(1.015)+(3.005), (I-052)+(1.015)+(3.006), (I-052)+(1.015)+(3.007), (I-052)+(1.015)+(3.008), (I-052)+(1.015)+(3.009), (I-052)+(1.015)+(3.010), (I-052)+(1.015)+(3.011), (I-052)+(1.015)+(3.012), (I-052)+(1.015)+(3.013), (I-052)+(1.015)+(3.014), (I-052)+(1.015)+(3.015), (I-052)+(1.015)+(3.016), (I-052)+(1.015)+(3.017), (I-052)+(1.015)+(3.018), (I-052)+(1.015)+(3.019), (I-052)+(1.015)+(3.020), (I-052)+(1.015)+(3.021), (I-052)+(1.015)+(3.022), (I-052)+(1.015)+(3.023), (I-052)+(1.015)+(3.024), (I-052)+(1.015)+(3.025), (I-052)+(1.015)+(3.026), (I-052)+(1.015)+(3.027), (I-052)+(1.015)+(3.028), (I-052)+(1.015)+(3.029), (I-052)+(1.015)+(3.030), (I-052)+(1.015)+(3.031), (I-052)+(1.015)+(5.001), (I-052)+(1.015)+(5.002), (I-052)+(1.015)+(5.003), (I-052)+(1.015)+(5.004), (I-052)+(1.015)+(5.005), (I-052)+(1.015)+(5.006), (I-052)+(1.015)+(5.007), (I-052)+(1.015)+(5.008), (I-052)+(1.015)+(5.009), (I-052)+(1.015)+(5.010), (I-052)+(1.015)+(5.011), (I-052)+(1.015)+(5.012), (I-052)+(1.015)+(5.013), (I-052)+(1.015)+(5.014), (I-052)+(1.015)+(5.015), (I-052)+(1.015)+(5.016), (I-052)+(1.015)+(5.017), (I-052)+(1.015)+(5.018), (I-052)+(1.015)+(5.019), (I-052)+(1.015)+(5.020), (I-052)+(1.015)+(5.021), (I-052)+(1.015)+(5.022), (I-052)+(1.015)+(5.023), (I-052)+(1.015)+(6.001), (I-052)+(1.015)+(6.002), (I-052)+(1.015)+(6.003), (I-052)+(1.015)+(6.004), (I-052)+(1.015)+(7.001), (I-052)+(1.015)+(7.002), (I-052)+(1.015)+(7.003), (I-052)+(1.015)+(7.004), (I-052)+(1.015)+(7.005), (I-052)+(1.015)+(7.006), (I-052)+(1.015)+(9.001), (I-052)+(1.015)+(9.002), (I-052)+(1.015)+(9.003), (I-052)+(1.015)+(9.004), (I-052)+(1.015)+(9.005), (I-052)+(1.015)+(9.006), (I-052)+(1.015)+(9.007), (I-052)+(1.015)+(9.008), (I-052)+(1.015)+(9.009), (I-052)+(1.015)+(14.001), (I-052)+(1.015)+(14.002), (I-052)+(1.015)+(15.008), (I-052)+(1.015)+(15.011), (I-052)+(1.015)+(15.012), (I-052)+(1.015)+(15.016), (I-052)+(1.015)+(15.025), (I-052)+(1.015)+(15.027), (I-052)+(1.015)+(15.047), (I-052)+(1.015)+(15.063), (I-052)+(1.015)+(15.064), (I-052)+(1.015)+(16.001), (I-052)+(1.015)+(16.002), (I-052)+(1.015)+(16.003), (I-052)+(1.015)+(16.004), (I-052)+(1.015)+(16.005), (I-052)+(1.015)+(16.006), (I-052)+(1.015)+(16.007), (I-052)+(1.015)+(16.008), (I-052)+(1.015)+(17.001), (I-052)+(1.015)+(17.002), (I-052)+(1.015)+(17.003), (I-052)+(1.015)+(17.004), (I-052)+(1.015)+(17.005), (I-052)+(1.015)+(17.006), (I-052)+(1.015)+(17.007), (I-052)+(1.015)+(17.008), (I-052)+(1.015)+(17.009), (I-052)+(1.015)+(17.010), (I-052)+(1.015)+(17.011), (I-052)+(1.015)+(17.012), (I-052)+(1.015)+(18.001), (I-052)+(1.016)+(1.017), (I-052)+(1.016)+(1.018), (I-052)+(1.016)+(1.019), (I-052)+(1.016)+(1.020), (I-052)+(1.016)+(1.021), (I-052)+(1.016)+(1.022), (I-052)+(1.016)+(1.023), (I-052)+(1.016)+(1.024), (I-052)+(1.016)+(1.025), (I-052)+(1.016)+(1.026), (I-052)+(1.016)+(1.027), (I-052)+(1.016)+(1.028), (I-052)+(1.016)+(1.029), (I-052)+(1.016)+(1.030), (I-052)+(1.016)+(1.031), (I-052)+(1.016)+(1.032), (I-052)+(1.016)+(1.033), (I-052)+(1.016)+(1.034), (I-052)+(1.016)+(1.035), (I-052)+(1.016)+(1.036), (I-052)+(1.016)+(1.037), (I-052)+(1.016)+(1.038), (I-052)+(1.016)+(1.039), (I-052)+(1.016)+(1.040), (I-052)+(1.016)+(1.041), (I-052)+(1.016)+(1.042), (I-052)+(1.016)+(1.043), (I-052)+(1.016)+(1.044), (I-052)+(1.016)+(1.045), (I-052)+(1.016)+(1.046), (I-052)+(1.016)+(1.047), (I-052)+(1.016)+(1.048), (I-052)+(1.016)+(1.049), (I-052)+(1.016)+(1.050), (I-052)+(1.016)+(1.051), (I-052)+(1.016)+(1.052), (I-052)+(1.016)+(1.053), (I-052)+(1.016)+(1.054), (I-052)+(1.016)+(1.055), (I-052)+(1.016)+(1.056), (I-052)+(1.016)+(1.057), (I-052)+(1.016)+(1.058), (I-052)+(1.016)+(1.059), (I-052)+(1.016)+(1.060), (I-052)+(1.016)+(1.061), (I-052)+(1.016)+(1.062), (I-052)+(1.016)+(1.063), (I-052)+(1.016)+(1.064), (I-052)+(1.016)+(1.065), (I-052)+(1.016)+(1.066), (I-052)+(1.016)+(1.067), (I-052)+(1.016)+(1.068), (I-052)+(1.016)+(1.069), (I-052)+(1.016)+(1.070), (I-052)+(1.016)+(1.071), (I-052)+(1.016)+(1.072), (I-052)+(1.016)+(1.073), (I-052)+(1.016)+(1.074), (I-052)+(1.016)+(1.075), (I-052)+(1.016)+(1.076), (I-052)+(1.016)+(1.077), (I-052)+(1.016)+(1.078), (I-052)+(1.016)+(1.079), (I-052)+(1.016)+(1.080), (I-052)+(1.016)+(1.081), (I-052)+(1.016)+(1.082), (I-052)+(1.016)+(1.083), (I-052)+(1.016)+(1.084), (I-052)+(1.016)+(1.085), (I-052)+(1.016)+(1.086), (I-052)+(1.016)+(1.087), (I-052)+(1.016)+(1.088), (1-052)+(1.016)+(1.089), (I-052)+(1.016)+(1.090), (I-052)+(1.016)+(1.091), (I-052)+(1.016)+(1.092), (I-052)+(1.016)+(2.001), (I-052)+(1.016)+(2.002), (I-052)+(1.016)+(2.003), (I-052)+(1.016)+(2.004), (I-052)+(1.016)+(2.005), (I-052)+(1.016)+(2.006), (I-052)+(1.016)+(2.007), (I-052)+(1.016)+(2.008), (I-052)+(1.016)+(2.009), (I-052)+(1.016)+(2.010), (I-052)+(1.016)+(2.011), (I-052)+(1.016)+(2.012), (I-052)+(1.016)+(2.013), (I-052)+(1.016)+(2.014), (I-052)+(1.016)+(2.015), (I-052)+(1.016)+(2.016), (I-052)+(1.016)+(2.017), (I-052)+(1.016)+(2.018), (I-052)+(1.016)+(2.019), (I-052)+(1.016)+(2.020), (I-052)+(1.016)+(2.021), (I-052)+(1.016)+(2.022), (I-052)+(1.016)+(2.023), (I-052)+(1.016)+(2.024), (I-052)+(1.016)+(2.025), (I-052)+(1.016)+(2.026), (I-052)+(1.016)+(2.027), (I-052)+(1.016)+(2.028), (I-052)+(1.016)+(2.029), (I-052)+(1.016)+(2.030), (I-052)+(1.016)+(2.031), (I-052)+(1.016)+(2.032), (I-052)+(1.016)+(2.033), (I-052)+(1.016)+(2.034), (I-052)+(1.016)+(2.035), (I-052)+(1.016)+(2.036), (I-052)+(1.016)+(2.037), (I-052)+(1.016)+(2.038), (I-052)+(1.016)+(2.039), (I-052)+(1.016)+(2.040), (I-052)+(1.016)+(2.041), (I-052)+(1.016)+(2.042), (I-052)+(1.016)+(2.043), (I-052)+(1.016)+(2.044), (I-052)+(1.016)+(2.045), (I-052)+(1.016)+(2.046), (I-052)+(1.016)+(2.047), (I-052)+(1.016)+(2.048), (I-052)+(1.016)+(2.049), (I-052)+(1.016)+(2.050), (I-052)+(1.016)+(2.051), (I-052)+(1.016)+(2.052), (I-052)+(1.016)+(2.053), (I-052)+(1.016)+(2.054), (I-052)+(1.016)+(2.055), (I-052)+(1.016)+(2.056), (I-052)+(1.016)+(2.057), (I-052)+(1.016)+(2.058), (I-052)+(1.016)+(2.059), (I-052)+(1.016)+(3.001), (I-052)+(1.016)+(3.002), (I-052)+(1.016)+(3.003), (I-052)+(1.016)+(3.004), (I-052)+(1.016)+(3.005), (I-052)+(1.016)+(3.006), (I-052)+(1.016)+(3.007), (I-052)+(1.016)+(3.008), (I-052)+(1.016)+(3.009), (I-052)+(1.016)+(3.010), (I-052)+(1.016)+(3.011), (I-052)+(1.016)+(3.012), (I-052)+(1.016)+(3.013), (I-052)+(1.016)+(3.014), (I-052)+(1.016)+(3.015), (I-052)+(1.016)+(3.016), (I-052)+(1.016)+(3.017), (I-052)+(1.016)+(3.018), (I-052)+(1.016)+(3.019), (I-052)+(1.016)+(3.020), (I-052)+(1.016)+(3.021), (I-052)+(1.016)+(3.022), (I-052)+(1.016)+(3.023), (I-052)+(1.016)+(3.024), (I-052)+(1.016)+(3.025), (I-052)+(1.016)+(3.026), (I-052)+(1.016)+(3.027), (I-052)+(1.016)+(3.028), (I-052)+(1.016)+(3.029), (I-052)+(1.016)+(3.030), (I-052)+(1.016)+(3.031), (I-052)+(1.016)+(5.001), (I-052)+(1.016)+(5.002), (I-052)+(1.016)+(5.003), (I-052)+(1.016)+(5.004), (I-052)+(1.016)+(5.005), (I-052)+(1.016)+(5.006), (I-052)+(1.016)+(5.007), (I-052)+(1.016)+(5.008), (I-052)+(1.016)+(5.009), (I-052)+(1.016)+(5.010), (I-052)+(1.016)+(5.011), (I-052)+(1.016)+(5.012), (I-052)+(1.016)+(5.013), (I-052)+(1.016)+(5.014), (I-052)+(1.016)+(5.015), (I-052)+(1.016)+(5.016), (I-052)+(1.016)+(5.017), (I-052)+(1.016)+(5.018), (I-052)+(1.016)+(5.019), (I-052)+(1.016)+(5.020), (I-052)+(1.016)+(5.021), (I-052)+(1.016)+(5.022), (I-052)+(1.016)+(5.023), (I-052)+(1.016)+(6.001), (I-052)+(1.016)+(6.002), (I-052)+(1.016)+(6.003), (I-052)+(1.016)+(6.004), (I-052)+(1.016)+(7.001), (I-052)+(1.016)+(7.002), (I-052)+(1.016)+(7.003), (I-052)+(1.016)+(7.004), (I-052)+(1.016)+(7.005), (I-052)+(1.016)+(7.006), (I-052)+(1.016)+(9.001), (I-052)+(1.016)+(9.002), (I-052)+(1.016)+(9.003), (I-052)+(1.016)+(9.004), (I-052)+(1.016)+(9.005), (I-052)+(1.016)+(9.006), (I-052)+(1.016)+(9.007), (I-052)+(1.016)+(9.008), (I-052)+(1.016)+(9.009), (I-052)+(1.016)+(14.001), (I-052)+(1.016)+(14.002), (I-052)+(1.016)+(15.008), (I-052)+(1.016)+(15.011), (I-052)+(1.016)+(15.012), (I-052)+(1.016)+(15.016), (I-052)+(1.016)+(15.025), (I-052)+(1.016)+(15.027), (I-052)+(1.016)+(15.047), (I-052)+(1.016)+(15.063), (I-052)+(1.016)+(15.064), (I-052)+(1.016)+(16.001), (I-052)+(1.016)+(16.002), (I-052)+(1.016)+(16.003), (I-052)+(1.016)+(16.004), (I-052)+(1.016)+(16.005), (I-052)+(1.016)+(16.006), (I-052)+(1.016)+(16.007), (I-052)+(1.016)+(16.008), (I-052)+(1.016)+(17.001), (I-052)+(1.016)+(17.002), (I-052)+(1.016)+(17.003), (I-052)+(1.016)+(17.004), (I-052)+(1.016)+(17.005), (I-052)+(1.016)+(17.006), (I-052)+(1.016)+(17.007), (I-052)+(1.016)+(17.008), (I-052)+(1.016)+(17.009), (I-052)+(1.016)+(17.010), (I-052)+(1.016)+(17.011), (I-052)+(1.016)+(17.012), (I-052)+(1.016)+(18.001), (I-052)+(1.017)+(1.018), (I-052)+(1.017)+(1.019), (I-052)+(1.017)+(1.020), (I-052)+(1.017)+(1.021), (I-052)+(1.017)+(1.022), (I-052)+(1.017)+(1.023), (I-052)+(1.017)+(1.024), (I-052)+(1.017)+(1.025), (I-052)+(1.017)+(1.026), (I-052)+(1.017)+(1.027), (I-052)+(1.017)+(1.028), (I-052)+(1.017)+(1.029), (I-052)+(1.017)+(1.030), (I-052)+(1.017)+(1.031), (I-052)+(1.017)+(1.032), (I-052)+(1.017)+(1.033), (I-052)+(1.017)+(1.034), (I-052)+(1.017)+(1.035), (I-052)+(1.017)+(1.036), (I-052)+(1.017)+(1.037), (I-052)+(1.017)+(1.038), (I-052)+(1.017)+(1.039), (I-052)+(1.017)+(1.040), (I-052)+(1.017)+(1.041), (I-052)+(1.017)+(1.042), (I-052)+(1.017)+(1.043), (I-052)+(1.017)+(1.044), (I-052)+(1.017)+(1.045), (I-052)+(1.017)+(1.046), (I-052)+(1.017)+(1.047), (I-052)+(1.017)+(1.048), (I-052)+(1.017)+(1.049), (I-052)+(1.017)+(1.050), (I-052)+(1.017)+(1.051), (I-052)+(1.017)+(1.052), (I-052)+(1.017)+(1.053), (I-052)+(1.017)+(1.054), (I-052)+(1.017)+(1.055), (I-052)+(1.017)+(1.056), (I-052)+(1.017)+(1.057), (I-052)+(1.017)+(1.058), (I-052)+(1.017)+(1.059), (I-052)+(1.017)+(1.060), (I-052)+(1.017)+(1.061), (I-052)+(1.017)+(1.062), (I-052)+(1.017)+(1.063), (I-052)+(1.017)+(1.064), (I-052)+(1.017)+(1.065), (I-052)+(1.017)+(1.066), (I-052)+(1.017)+(1.067), (I-052)+(1.017)+(1.068), (I-052)+(1.017)+(1.069), (I-052)+(1.017)+(1.070), (I-052)+(1.017)+(1.071), (I-052)+(1.017)+(1.072), (I-052)+(1.017)+(1.073), (I-052)+(1.017)+(1.074), (I-052)+(1.017)+(1.075), (I-052)+(1.017)+(1.076), (I-052)+(1.017)+(1.077), (I-052)+(1.017)+(1.078), (I-052)+(1.017)+(1.079), (I-052)+(1.017)+(1.080), (I-052)+(1.017)+(1.081), (I-052)+(1.017)+(1.082), (I-052)+(1.017)+(1.083), (I-052)+(1.017)+(1.084), (I-052)+(1.017)+(1.085), (I-052)+(1.017)+(1.086), (I-052)+(1.017)+(1.087), (I-052)+(1.017)+(1.088), (I-052)+(1.017)+(1.089), (I-052)+(1.017)+(1.090), (I-052)+(1.017)+(1.091), (I-052)+(1.017)+(1.092), (I-052)+(1.017)+(2.001), (I-052)+(1.017)+(2.002), (I-052)+(1.017)+(2.003), (I-052)+(1.017)+(2.004), (I-052)+(1.017)+(2.005), (I-052)+(1.017)+(2.006), (I-052)+(1.017)+(2.007), (I-052)+(1.017)+(2.008), (I-052)+(1.017)+(2.009), (I-052)+(1.017)+(2.010), (I-052)+(1.017)+(2.011), (I-052)+(1.017)+(2.012), (I-052)+(1.017)+(2.013), (I-052)+(1.017)+(2.014), (I-052)+(1.017)+(2.015), (I-052)+(1.017)+(2.016), (I-052)+(1.017)+(2.017), (I-052)+(1.017)+(2.018), (I-052)+(1.017)+(2.019), (I-052)+(1.017)+(2.020), (I-052)+(1.017)+(2.021), (I-052)+(1.017)+(2.022), (I-052)+(1.017)+(2.023), (I-052)+(1.017)+(2.024), (I-052)+(1.017)+(2.025), (I-052)+(1.017)+(2.026), (I-052)+(1.017)+(2.027), (I-052)+(1.017)+(2.028), (I-052)+(1.017)+(2.029), (I-052)+(1.017)+(2.030), (I-052)+(1.017)+(2.031), (I-052)+(1.017)+(2.032), (I-052)+(1.017)+(2.033), (I-052)+(1.017)+(2.034), (I-052)+(1.017)+(2.035), (I-052)+(1.017)+(2.036), (I-052)+(1.017)+(2.037), (I-052)+(1.017)+(2.038), (I-052)+(1.017)+(2.039), (I-052)+(1.017)+(2.040), (I-052)+(1.017)+(2.041), (I-052)+(1.017)+(2.042), (I-052)+(1.017)+(2.043), (I-052)+(1.017)+(2.044), (I-052)+(1.017)+(2.045), (I-052)+(1.017)+(2.046), (I-052)+(1.017)+(2.047), (I-052)+(1.017)+(2.048), (I-052)+(1.017)+(2.049),
(I-052)+(1.017)+(2.050), (I-052)+(1.017)+(2.051),
(I-052)+(1.017)+(2.052), (I-052)+(1.017)+(2.053),
(I-052)+(1.017)+(2.054), (I-052)+(1.017)+(2.055),
(I-052)+(1.017)+(2.056), (I-052)+(1.017)+(2.057),
(I-052)+(1.017)+(2.058), (I-052)+(1.017)+(2.059),
(I-052)+(1.017)+(3.001), (I-052)+(1.017)+(3.002),
(I-052)+(1.017)+(3.003), (I-052)+(1.017)+(3.004),
(I-052)+(1.017)+(3.005), (I-052)+(1.017)+(3.006),
(I-052)+(1.017)+(3.007), (I-052)+(1.017)+(3.008),
(I-052)+(1.017)+(3.009), (I-052)+(1.017)+(3.010),
(I-052)+(1.017)+(3.011), (I-052)+(1.017)+(3.012),
(I-052)+(1.017)+(3.013), (I-052)+(1.017)+(3.014),
(I-052)+(1.017)+(3.015), (I-052)+(1.017)+(3.016),
(I-052)+(1.017)+(3.017), (I-052)+(1.017)+(3.018),
(I-052)+(1.017)+(3.019), (I-052)+(1.017)+(3.020),
(I-052)+(1.017)+(3.021), (I-052)+(1.017)+(3.022),
(I-052)+(1.017)+(3.023), (I-052)+(1.017)+(3.024),
(I-052)+(1.017)+(3.025), (I-052)+(1.017)+(3.026),
(I-052)+(1.017)+(3.027), (I-052)+(1.017)+(3.028),
(I-052)+(1.017)+(3.029), (I-052)+(1.017)+(3.030),
(I-052)+(1.017)+(3.031), (I-052)+(1.017)+(5.001),
(I-052)+(1.017)+(5.002), (I-052)+(1.017)+(5.003),
(I-052)+(1.017)+(5.004), (I-052)+(1.017)+(5.005),
(I-052)+(1.017)+(5.006), (I-052)+(1.017)+(5.007),
(I-052)+(1.017)+(5.008), (I-052)+(1.017)+(5.009),
(I-052)+(1.017)+(5.010), (I-052)+(1.017)+(5.011),
(I-052)+(1.017)+(5.012), (I-052)+(1.017)+(5.013),
(I-052)+(1.017)+(5.014), (I-052)+(1.017)+(5.015),
(I-052)+(1.017)+(5.016), (I-052)+(1.017)+(5.017),
(I-052)+(1.017)+(5.018), (I-052)+(1.017)+(5.019),
(I-052)+(1.017)+(5.020), (I-052)+(1.017)+(5.021),
(I-052)+(1.017)+(5.022), (I-052)+(1.017)+(5.023),
(I-052)+(1.017)+(6.001), (I-052)+(1.017)+(6.002),
(I-052)+(1.017)+(6.003), (I-052)+(1.017)+(6.004),
(I-052)+(1.017)+(7.001), (I-052)+(1.017)+(7.002),
(I-052)+(1.017)+(7.003), (I-052)+(1.017)+(7.004),
(I-052)+(1.017)+(7.005), (I-052)+(1.017)+(7.006),
(I-052)+(1.017)+(9.001), (I-052)+(1.017)+(9.002),
(I-052)+(1.017)+(9.003), (I-052)+(1.017)+(9.004),
(I-052)+(1.017)+(9.005), (I-052)+(1.017)+(9.006),
(I-052)+(1.017)+(9.007), (I-052)+(1.017)+(9.008),
(I-052)+(1.017)+(9.009), (I-052)+(1.017)+(14.001),
(I-052)+(1.017)+(14.002), (I-052)+(1.017)+(15.008),
(I-052)+(1.017)+(15.011), (I-052)+(1.017)+(15.012),
(I-052)+(1.017)+(15.016), (I-052)+(1.017)+(15.025),
(I-052)+(1.017)+(15.027), (I-052)+(1.017)+(15.047),
(I-052)+(1.017)+(15.063), (I-052)+(1.017)+(15.064),
(I-052)+(1.017)+(16.001), (I-052)+(1.017)+(16.002),
(I-052)+(1.017)+(16.003), (I-052)+(1.017)+(16.004),
(I-052)+(1.017)+(16.005), (I-052)+(1.017)+(16.006),
(I-052)+(1.017)+(16.007), (I-052)+(1.017)+(16.008),
(I-052)+(1.017)+(17.001), (I-052)+(1.017)+(17.002),
(I-052)+(1.017)+(17.003), (I-052)+(1.017)+(17.004),
(I-052)+(1.017)+(17.005), (I-052)+(1.017)+(17.006),
(I-052)+(1.017)+(17.007), (I-052)+(1.017)+(17.008),
(I-052)+(1.017)+(17.009), (I-052)+(1.017)+(17.010),
(I-052)+(1.017)+(17.011), (I-052)+(1.017)+(17.012),
(I-052)+(1.017)+(18.001), (I-052)+(1.018)+(1.019), (I-052)+(1.018)+(1.020),
(I-052)+(1.018)+(1.021), (I-052)+(1.018)+(1.022),
(I-052)+(1.018)+(1.023), (I-052)+(1.018)+(1.024),
(I-052)+(1.018)+(1.025), (I-052)+(1.018)+(1.026),
(I-052)+(1.018)+(1.027), (I-052)+(1.018)+(1.028),
(I-052)+(1.018)+(1.029), (I-052)+(1.018)+(1.030),
(I-052)+(1.018)+(1.031), (I-052)+(1.018)+(1.032),
(I-052)+(1.018)+(1.033), (I-052)+(1.018)+(1.034),
(I-052)+(1.018)+(1.035), (I-052)+(1.018)+(1.036),
(I-052)+(1.018)+(1.037), (I-052)+(1.018)+(1.038),
(I-052)+(1.018)+(1.039), (I-052)+(1.018)+(1.040),
(I-052)+(1.018)+(1.041), (I-052)+(1.018)+(1.042),
(I-052)+(1.018)+(1.043), (I-052)+(1.018)+(1.044),
(I-052)+(1.018)+(1.045), (I-052)+(1.018)+(1.046),
(I-052)+(1.018)+(1.047), (I-052)+(1.018)+(1.048),
(I-052)+(1.018)+(1.049), (I-052)+(1.018)+(1.050),
(I-052)+(1.018)+(1.051), (I-052)+(1.018)+(1.052),
(I-052)+(1.018)+(1.053), (I-052)+(1.018)+(1.054),
(I-052)+(1.018)+(1.055), (I-052)+(1.018)+(1.056),
(I-052)+(1.018)+(1.057), (I-052)+(1.018)+(1.058),
(I-052)+(1.018)+(1.059), (I-052)+(1.018)+(1.060),
(I-052)+(1.018)+(1.061), (I-052)+(1.018)+(1.062),
(I-052)+(1.018)+(1.063), (I-052)+(1.018)+(1.064),
(I-052)+(1.018)+(1.065), (I-052)+(1.018)+(1.066),
(I-052)+(1.018)+(1.067), (I-052)+(1.018)+(1.068),
(I-052)+(1.018)+(1.069), (I-052)+(1.018)+(1.070),
(I-052)+(1.018)+(1.071), (I-052)+(1.018)+(1.072),
(I-052)+(1.018)+(1.073), (I-052)+(1.018)+(1.074),
(I-052)+(1.018)+(1.075), (I-052)+(1.018)+(1.076),
(I-052)+(1.018)+(1.077), (I-052)+(1.018)+(1.078),
(I-052)+(1.018)+(1.079), (I-052)+(1.018)+(1.080),
(I-052)+(1.018)+(1.081), (I-052)+(1.018)+(1.082),
(I-052)+(1.018)+(1.083), (I-052)+(1.018)+(1.084),
(I-052)+(1.018)+(1.085), (I-052)+(1.018)+(1.086),
(I-052)+(1.018)+(1.087), (I-052)+(1.018)+(1.088),
(I-052)+(1.018)+(1.089), (I-052)+(1.018)+(1.090),
(I-052)+(1.018)+(1.091), (I-052)+(1.018)+(1.092),
(I-052)+(1.018)+(2.001), (I-052)+(1.018)+(2.002),
(I-052)+(1.018)+(2.003), (I-052)+(1.018)+(2.004),
(I-052)+(1.018)+(2.005), (I-052)+(1.018)+(2.006),
(I-052)+(1.018)+(2.007), (I-052)+(1.018)+(2.008),
(I-052)+(1.018)+(2.009), (I-052)+(1.018)+(2.010),
(I-052)+(1.018)+(2.011), (I-052)+(1.018)+(2.012),
(I-052)+(1.018)+(2.013), (I-052)+(1.018)+(2.014),
(I-052)+(1.018)+(2.015), (I-052)+(1.018)+(2.016),
(I-052)+(1.018)+(2.017), (I-052)+(1.018)+(2.018),
(I-052)+(1.018)+(2.019), (I-052)+(1.018)+(2.020),
(I-052)+(1.018)+(2.021), (I-052)+(1.018)+(2.022),
(I-052)+(1.018)+(2.023), (I-052)+(1.018)+(2.024),
(I-052)+(1.018)+(2.025), (I-052)+(1.018)+(2.026),
(I-052)+(1.018)+(2.027), (I-052)+(1.018)+(2.028),
(I-052)+(1.018)+(2.029), (I-052)+(1.018)+(2.030),
(I-052)+(1.018)+(2.031), (I-052)+(1.018)+(2.032),
(I-052)+(1.018)+(2.033), (I-052)+(1.018)+(2.034),
(I-052)+(1.018)+(2.035), (I-052)+(1.018)+(2.036),
(I-052)+(1.018)+(2.037), (I-052)+(1.018)+(2.038),
(I-052)+(1.018)+(2.039), (I-052)+(1.018)+(2.040),
(I-052)+(1.018)+(2.041), (I-052)+(1.018)+(2.042),
(I-052)+(1.018)+(2.043), (I-052)+(1.018)+(2.044),
(I-052)+(1.018)+(2.045), (I-052)+(1.018)+(2.046),
(I-052)+(1.018)+(2.047), (I-052)+(1.018)+(2.048),
(I-052)+(1.018)+(2.049), (I-052)+(1.018)+(2.050),
(I-052)+(1.018)+(2.051), (I-052)+(1.018)+(2.052),
(I-052)+(1.018)+(2.053), (I-052)+(1.018)+(2.054),
(I-052)+(1.018)+(2.055), (I-052)+(1.018)+(2.056),
(I-052)+(1.018)+(2.057), (I-052)+(1.018)+(2.058),
(I-052)+(1.018)+(2.059), (I-052)+(1.018)+(3.001),
(I-052)+(1.018)+(3.002), (I-052)+(1.018)+(3.003),
(I-052)+(1.018)+(3.004), (I-052)+(1.018)+(3.005),
(I-052)+(1.018)+(3.006), (I-052)+(1.018)+(3.007),
(I-052)+(1.018)+(3.008), (I-052)+(1.018)+(3.009),
(I-052)+(1.018)+(3.010), (I-052)+(1.018)+(3.011),
(I-052)+(1.018)+(3.012), (I-052)+(1.018)+(3.013),
(I-052)+(1.018)+(3.014), (I-052)+(1.018)+(3.015),
(I-052)+(1.018)+(3.016), (I-052)+(1.018)+(3.017), (I-052)+(1.018)+(3.018), (I-052)+(1.018)+(3.019),
(I-052)+(1.018)+(3.020), (I-052)+(1.018)+(3.021),
(I-052)+(1.018)+(3.022), (I-052)+(1.018)+(3.023),
(I-052)+(1.018)+(3.024), (I-052)+(1.018)+(3.025),
(I-052)+(1.018)+(3.026), (I-052)+(1.018)+(3.027),
(I-052)+(1.018)+(3.028), (I-052)+(1.018)+(3.029),
(I-052)+(1.018)+(3.030), (I-052)+(1.018)+(3.031),
(I-052)+(1.018)+(5.001), (I-052)+(1.018)+(5.002),
(I-052)+(1.018)+(5.003), (I-052)+(1.018)+(5.004),
(I-052)+(1.018)+(5.005), (I-052)+(1.018)+(5.006),
(I-052)+(1.018)+(5.007), (I-052)+(1.018)+(5.008),
(I-052)+(1.018)+(5.009), (I-052)+(1.018)+(5.010),
(I-052)+(1.018)+(5.011), (I-052)+(1.018)+(5.012),
(I-052)+(1.018)+(5.013), (I-052)+(1.018)+(5.014),
(I-052)+(1.018)+(5.015), (I-052)+(1.018)+(5.016),
(I-052)+(1.018)+(5.017), (I-052)+(1.018)+(5.018),
(I-052)+(1.018)+(5.019), (I-052)+(1.018)+(5.020),
(I-052)+(1.018)+(5.021), (I-052)+(1.018)+(5.022),
(I-052)+(1.018)+(5.023), (I-052)+(1.018)+(6.001),
(I-052)+(1.018)+(6.002), (I-052)+(1.018)+(6.003),
(I-052)+(1.018)+(6.004), (I-052)+(1.018)+(7.001),
(I-052)+(1.018)+(7.002), (I-052)+(1.018)+(7.003),
(I-052)+(1.018)+(7.004), (I-052)+(1.018)+(7.005),
(I-052)+(1.018)+(7.006), (I-052)+(1.018)+(9.001),
(I-052)+(1.018)+(9.002), (I-052)+(1.018)+(9.003),
(I-052)+(1.018)+(9.004), (I-052)+(1.018)+(9.005),
(I-052)+(1.018)+(9.006), (I-052)+(1.018)+(9.007),
(I-052)+(1.018)+(9.008), (I-052)+(1.018)+(9.009),
(I-052)+(1.018)+(14.001), (I-052)+(1.018)+(14.002),
(I-052)+(1.018)+(15.008), (I-052)+(1.018)+(15.011),
(I-052)+(1.018)+(15.012), (I-052)+(1.018)+(15.016),
(I-052)+(1.018)+(15.025), (I-052)+(1.018)+(15.027),
(I-052)+(1.018)+(15.047), (I-052)+(1.018)+(15.063),
(I-052)+(1.018)+(15.064), (I-052)+(1.018)+(16.001),
(I-052)+(1.018)+(16.002), (I-052)+(1.018)+(16.003),
(I-052)+(1.018)+(16.004), (I-052)+(1.018)+(16.005),
(I-052)+(1.018)+(16.006), (I-052)+(1.018)+(16.007),
(I-052)+(1.018)+(16.008), (I-052)+(1.018)+(17.001),
(I-052)+(1.018)+(17.002), (I-052)+(1.018)+(17.003),
(I-052)+(1.018)+(17.004), (I-052)+(1.018)+(17.005),
(I-052)+(1.018)+(17.006), (I-052)+(1.018)+(17.007),
(I-052)+(1.018)+(17.008), (I-052)+(1.018)+(17.009),
(I-052)+(1.018)+(17.010), (I-052)+(1.018)+(17.011),
(I-052)+(1.018)+(17.012), (I-052)+(1.018)+(18.001),
(I-052)+(1.019)+(1.020), (I-052)+(1.019)+(1.021),
(I-052)+(1.019)+(1.022), (I-052)+(1.019)+(1.023),
(I-052)+(1.019)+(1.024), (I-052)+(1.019)+(1.025),
(I-052)+(1.019)+(1.026), (I-052)+(1.019)+(1.027),
(I-052)+(1.019)+(1.028), (I-052)+(1.019)+(1.029),
(I-052)+(1.019)+(1.030), (I-052)+(1.019)+(1.031),
(I-052)+(1.019)+(1.032), (I-052)+(1.019)+(1.033),
(I-052)+(1.019)+(1.034), (I-052)+(1.019)+(1.035),
(I-052)+(1.019)+(1.036), (I-052)+(1.019)+(1.037),
(I-052)+(1.019)+(1.038), (I-052)+(1.019)+(1.039),
(I-052)+(1.019)+(1.040), (I-052)+(1.019)+(1.041),
(I-052)+(1.019)+(1.042), (I-052)+(1.019)+(1.043),
(I-052)+(1.019)+(1.044), (I-052)+(1.019)+(1.045),
(I-052)+(1.019)+(1.046), (I-052)+(1.019)+(1.047),
(I-052)+(1.019)+(1.048), (I-052)+(1.019)+(1.049),
(I-052)+(1.019)+(1.050), (I-052)+(1.019)+(1.051),
(I-052)+(1.019)+(1.052), (I-052)+(1.019)+(1.053),
(I-052)+(1.019)+(1.054), (I-052)+(1.019)+(1.055),
(I-052)+(1.019)+(1.056), (I-052)+(1.019)+(1.057),
(I-052)+(1.019)+(1.058), (I-052)+(1.019)+(1.059),
(I-052)+(1.019)+(1.060), (I-052)+(1.019)+(1.061),
(I-052)+(1.019)+(1.062), (I-052)+(1.019)+(1.063),
(I-052)+(1.019)+(1.064), (I-052)+(1.019)+(1.065),
(I-052)+(1.019)+(1.066), (I-052)+(1.019)+(1.067),
(I-052)+(1.019)+(1.068), (I-052)+(1.019)+(1.069),
(I-052)+(1.019)+(1.070), (I-052)+(1.019)+(1.071),
(I-052)+(1.019)+(1.072), (1-052)+(1.019)+(1.073),
(I-052)+(1.019)+(1.074), (I-052)+(1.019)+(1.075),
(I-052)+(1.019)+(1.076), (I-052)+(1.019)+(1.077),
(I-052)+(1.019)+(1.078), (I-052)+(1.019)+(1.079),
(I-052)+(1.019)+(1.080), (I-052)+(1.019)+(1.081),
(I-052)+(1.019)+(1.082), (I-052)+(1.019)+(1.083),
(I-052)+(1.019)+(1.084), (I-052)+(1.019)+(1.085),
(I-052)+(1.019)+(1.086), (I-052)+(1.019)+(1.087),
(I-052)+(1.019)+(1.088), (I-052)+(1.019)+(1.089),
(I-052)+(1.019)+(1.090), (I-052)+(1.019)+(1.091),
(I-052)+(1.019)+(1.092), (I-052)+(1.019)+(2.001),
(I-052)+(1.019)+(2.002), (I-052)+(1.019)+(2.003),
(I-052)+(1.019)+(2.004), (I-052)+(1.019)+(2.005),
(I-052)+(1.019)+(2.006), (I-052)+(1.019)+(2.007),
(I-052)+(1.019)+(2.008), (I-052)+(1.019)+(2.009),
(I-052)+(1.019)+(2.010), (I-052)+(1.019)+(2.011),
(I-052)+(1.019)+(2.012), (I-052)+(1.019)+(2.013),
(I-052)+(1.019)+(2.014), (I-052)+(1.019)+(2.015),
(I-052)+(1.019)+(2.016), (I-052)+(1.019)+(2.017),
(I-052)+(1.019)+(2.018), (I-052)+(1.019)+(2.019),
(I-052)+(1.019)+(2.020), (I-052)+(1.019)+(2.021),
(I-052)+(1.019)+(2.022), (I-052)+(1.019)+(2.023),
(I-052)+(1.019)+(2.024), (I-052)+(1.019)+(2.025),
(I-052)+(1.019)+(2.026), (I-052)+(1.019)+(2.027),
(I-052)+(1.019)+(2.028), (I-052)+(1.019)+(2.029),
(I-052)+(1.019)+(2.030), (I-052)+(1.019)+(2.031),
(I-052)+(1.019)+(2.032), (I-052)+(1.019)+(2.033),
(I-052)+(1.019)+(2.034), (I-052)+(1.019)+(2.035),
(I-052)+(1.019)+(2.036), (I-052)+(1.019)+(2.037),
(I-052)+(1.019)+(2.038), (I-052)+(1.019)+(2.039),
(I-052)+(1.019)+(2.040), (I-052)+(1.019)+(2.041),
(I-052)+(1.019)+(2.042), (I-052)+(1.019)+(2.043),
(I-052)+(1.019)+(2.044), (I-052)+(1.019)+(2.045),
(I-052)+(1.019)+(2.046), (I-052)+(1.019)+(2.047),
(I-052)+(1.019)+(2.048), (I-052)+(1.019)+(2.049),
(I-052)+(1.019)+(2.050), (I-052)+(1.019)+(2.051),
(I-052)+(1.019)+(2.052), (I-052)+(1.019)+(2.053),
(I-052)+(1.019)+(2.054), (I-052)+(1.019)+(2.055),
(I-052)+(1.019)+(2.056), (I-052)+(1.019)+(2.057),
(I-052)+(1.019)+(2.058), (I-052)+(1.019)+(2.059),
(I-052)+(1.019)+(3.001), (I-052)+(1.019)+(3.002),
(I-052)+(1.019)+(3.003), (I-052)+(1.019)+(3.004),
(I-052)+(1.019)+(3.005), (I-052)+(1.019)+(3.006),
(I-052)+(1.019)+(3.007), (I-052)+(1.019)+(3.008),
(I-052)+(1.019)+(3.009), (I-052)+(1.019)+(3.010),
(I-052)+(1.019)+(3.011), (I-052)+(1.019)+(3.012),
(I-052)+(1.019)+(3.013), (I-052)+(1.019)+(3.014),
(I-052)+(1.019)+(3.015), (I-052)+(1.019)+(3.016),
(I-052)+(1.019)+(3.017), (I-052)+(1.019)+(3.018),
(I-052)+(1.019)+(3.019), (I-052)+(1.019)+(3.020),
(I-052)+(1.019)+(3.021), (I-052)+(1.019)+(3.022),
(I-052)+(1.019)+(3.023), (I-052)+(1.019)+(3.024),
(I-052)+(1.019)+(3.025), (I-052)+(1.019)+(3.026),
(I-052)+(1.019)+(3.027), (I-052)+(1.019)+(3.028),
(I-052)+(1.019)+(3.029), (I-052)+(1.019)+(3.030),
(I-052)+(1.019)+(3.031), (I-052)+(1.019)+(5.001),
(I-052)+(1.019)+(5.002), (I-052)+(1.019)+(5.003),
(I-052)+(1.019)+(5.004), (I-052)+(1.019)+(5.005),
(I-052)+(1.019)+(5.006), (I-052)+(1.019)+(5.007),
(I-052)+(1.019)+(5.008), (I-052)+(1.019)+(5.009),
(I-052)+(1.019)+(5.010), (I-052)+(1.019)+(5.011),
(I-052)+(1.019)+(5.012), (I-052)+(1.019)+(5.013),
(I-052)+(1.019)+(5.014), (I-052)+(1.019)+(5.015),
(I-052)+(1.019)+(5.016), (I-052)+(1.019)+(5.017), (I-052)+(1.019)+(5.018), (I-052)+(1.019)+(5.019), (I-052)+(1.019)+(5.020), (I-052)+(1.019)+(5.021), (I-052)+(1.019)+(5.022), (I-052)+(1.019)+(5.023), (I-052)+(1.019)+(6.001), (I-052)+(1.019)+(6.002), (I-052)+(1.019)+(6.003), (I-052)+(1.019)+(6.004), (I-052)+(1.019)+(7.001), (I-052)+(1.019)+(7.002), (I-052)+(1.019)+(7.003), (I-052)+(1.019)+(7.004), (I-052)+(1.019)+(7.005), (I-052)+(1.019)+(7.006), (I-052)+(1.019)+(9.001), (I-052)+(1.019)+(9.002), (I-052)+(1.019)+(9.003), (I-052)+(1.019)+(9.004), (I-052)+(1.019)+(9.005), (I-052)+(1.019)+(9.006), (I-052)+(1.019)+(9.007), (I-052)+(1.019)+(9.008), (I-052)+(1.019)+(9.009), (I-052)+(1.019)+(14.001), (I-052)+(1.019)+(14.002), (I-052)+(1.019)+(15.008), (I-052)+(1.019)+(15.011), (I-052)+(1.019)+(15.012), (I-052)+(1.019)+(15.016), (I-052)+(1.019)+(15.025), (I-052)+(1.019)+(15.027), (I-052)+(1.019)+(15.047), (I-052)+(1.019)+(15.063), (I-052)+(1.019)+(15.064), (I-052)+(1.019)+(16.001), (I-052)+(1.019)+(16.002), (I-052)+(1.019)+(16.003), (I-052)+(1.019)+(16.004), (I-052)+(1.019)+(16.005), (I-052)+(1.019)+(16.006), (I-052)+(1.019)+(16.007), (I-052)+(1.019)+(16.008), (I-052)+(1.019)+(17.001), (I-052)+(1.019)+(17.002), (I-052)+(1.019)+(17.003), (I-052)+(1.019)+(17.004), (I-052)+(1.019)+(17.005), (I-052)+(1.019)+(17.006), (I-052)+(1.019)+(17.007), (I-052)+(1.019)+(17.008), (I-052)+(1.019)+(17.009), (I-052)+(1.019)+(17.010), (I-052)+(1.019)+(17.011), (I-052)+(1.019)+(17.012), (I-052)+(1.019)+(18.001), (I-052)+(1.020)+(1.021), (I-052)+(1.020)+(1.022), (I-052)+(1.020)+(1.023), (I-052)+(1.020)+(1.024), (I-052)+(1.020)+(1.025), (I-052)+(1.020)+(1.026), (I-052)+(1.020)+(1.027), (I-052)+(1.020)+(1.028), (I-052)+(1.020)+(1.029), (I-052)+(1.020)+(1.030), (I-052)+(1.020)+(1.031), (I-052)+(1.020)+(1.032), (I-052)+(1.020)+(1.033), (I-052)+(1.020)+(1.034), (I-052)+(1.020)+(1.035), (I-052)+(1.020)+(1.036), (I-052)+(1.020)+(1.037), (I-052)+(1.020)+(1.038), (I-052)+(1.020)+(1.039), (I-052)+(1.020)+(1.040), (I-052)+(1.020)+(1.041), (I-052)+(1.020)+(1.042), (I-052)+(1.020)+(1.043), (I-052)+(1.020)+(1.044), (I-052)+(1.020)+(1.045), (I-052)+(1.020)+(1.046), (I-052)+(1.020)+(1.047), (I-052)+(1.020)+(1.048), (I-052)+(1.020)+(1.049), (I-052)+(1.020)+(1.050), (I-052)+(1.020)+(1.051), (I-052)+(1.020)+(1.052), (I-052)+(1.020)+(1.053), (I-052)+(1.020)+(1.054), (I-052)+(1.020)+(1.055), (I-052)+(1.020)+(1.056), (I-052)+(1.020)+(1.057), (I-052)+(1.020)+(1.058), (I-052)+(1.020)+(1.059), (I-052)+(1.020)+(1.060), (I-052)+(1.020)+(1.061), (I-052)+(1.020)+(1.062), (I-052)+(1.020)+(1.063), (I-052)+(1.020)+(1.064), (I-052)+(1.020)+(1.065), (I-052)+(1.020)+(1.066), (I-052)+(1.020)+(1.067), (I-052)+(1.020)+(1.068), (I-052)+(1.020)+(1.069), (I-052)+(1.020)+(1.070), (I-052)+(1.020)+(1.071), (I-052)+(1.020)+(1.072), (I-052)+(1.020)+(1.073), (I-052)+(1.020)+(1.074), (I-052)+(1.020)+(1.075), (I-052)+(1.020)+(1.076), (I-052)+(1.020)+(1.077), (I-052)+(1.020)+(1.078), (I-052)+(1.020)+(1.079), (I-052)+(1.020)+(1.080), (I-052)+(1.020)+(1.081), (I-052)+(1.020)+(1.082), (I-052)+(1.020)+(1.083), (I-052)+(1.020)+(1.084), (I-052)+(1.020)+(1.085), (I-052)+(1.020)+(1.086), (I-052)+(1.020)+(1.087), (I-052)+(1.020)+(1.088), (I-052)+(1.020)+(1.089), (I-052)+(1.020)+(1.090), (I-052)+(1.020)+(1.091), (I-052)+(1.020)+(1.092), (I-052)+(1.020)+(2.001), (I-052)+(1.020)+(2.002), (I-052)+(1.020)+(2.003), (I-052)+(1.020)+(2.004), (I-052)+(1.020)+(2.005), (I-052)+(1.020)+(2.006), (I-052)+(1.020)+(2.007), (I-052)+(1.020)+(2.008), (I-052)+(1.020)+(2.009), (I-052)+(1.020)+(2.010), (I-052)+(1.020)+(2.011), (I-052)+(1.020)+(2.012), (I-052)+(1.020)+(2.013), (I-052)+(1.020)+(2.014), (I-052)+(1.020)+(2.015), (I-052)+(1.020)+(2.016), (I-052)+(1.020)+(2.017), (I-052)+(1.020)+(2.018), (I-052)+(1.020)+(2.019), (I-052)+(1.020)+(2.020), (I-052)+(1.020)+(2.021), (I-052)+(1.020)+(2.022), (I-052)+(1.020)+(2.023), (I-052)+(1.020)+(2.024), (I-052)+(1.020)+(2.025), (I-052)+(1.020)+(2.026), (I-052)+(1.020)+(2.027), (I-052)+(1.020)+(2.028), (I-052)+(1.020)+(2.029), (I-052)+(1.020)+(2.030), (I-052)+(1.020)+(2.031), (I-052)+(1.020)+(2.032), (I-052)+(1.020)+(2.033), (I-052)+(1.020)+(2.034), (I-052)+(1.020)+(2.035), (I-052)+(1.020)+(2.036), (I-052)+(1.020)+(2.037), (I-052)+(1.020)+(2.038), (I-052)+(1.020)+(2.039), (I-052)+(1.020)+(2.040), (I-052)+(1.020)+(2.041), (I-052)+(1.020)+(2.042), (I-052)+(1.020)+(2.043), (I-052)+(1.020)+(2.044), (I-052)+(1.020)+(2.045), (I-052)+(1.020)+(2.046), (I-052)+(1.020)+(2.047), (I-052)+(1.020)+(2.048), (I-052)+(1.020)+(2.049), (I-052)+(1.020)+(2.050), (I-052)+(1.020)+(2.051), (I-052)+(1.020)+(2.052), (I-052)+(1.020)+(2.053), (I-052)+(1.020)+(2.054), (I-052)+(1.020)+(2.055), (I-052)+(1.020)+(2.056), (I-052)+(1.020)+(2.057), (I-052)+(1.020)+(2.058), (I-052)+(1.020)+(2.059), (I-052)+(1.020)+(3.001), (I-052)+(1.020)+(3.002), (I-052)+(1.020)+(3.003), (I-052)+(1.020)+(3.004), (I-052)+(1.020)+(3.005), (I-052)+(1.020)+(3.006), (I-052)+(1.020)+(3.007), (I-052)+(1.020)+(3.008), (I-052)+(1.020)+(3.009), (I-052)+(1.020)+(3.010), (I-052)+(1.020)+(3.011), (I-052)+(1.020)+(3.012), (I-052)+(1.020)+(3.013), (I-052)+(1.020)+(3.014), (I-052)+(1.020)+(3.015), (I-052)+(1.020)+(3.016), (I-052)+(1.020)+(3.017), (I-052)+(1.020)+(3.018), (I-052)+(1.020)+(3.019), (I-052)+(1.020)+(3.020), (I-052)+(1.020)+(3.021), (I-052)+(1.020)+(3.022), (I-052)+(1.020)+(3.023), (I-052)+(1.020)+(3.024), (I-052)+(1.020)+(3.025), (I-052)+(1.020)+(3.026), (I-052)+(1.020)+(3.027), (I-052)+(1.020)+(3.028), (I-052)+(1.020)+(3.029), (I-052)+(1.020)+(3.030), (I-052)+(1.020)+(3.031), (I-052)+(1.020)+(5.001), (I-052)+(1.020)+(5.002), (I-052)+(1.020)+(5.003), (I-052)+(1.020)+(5.004), (I-052)+(1.020)+(5.005), (I-052)+(1.020)+(5.006), (I-052)+(1.020)+(5.007), (I-052)+(1.020)+(5.008), (I-052)+(1.020)+(5.009), (I-052)+(1.020)+(5.010), (I-052)+(1.020)+(5.011), (I-052)+(1.020)+(5.012), (I-052)+(1.020)+(5.013), (I-052)+(1.020)+(5.014), (I-052)+(1.020)+(5.015), (I-052)+(1.020)+(5.016), (I-052)+(1.020)+(5.017), (I-052)+(1.020)+(5.018), (I-052)+(1.020)+(5.019), (I-052)+(1.020)+(5.020), (I-052)+(1.020)+(5.021), (I-052)+(1.020)+(5.022), (I-052)+(1.020)+(5.023), (I-052)+(1.020)+(6.001), (I-052)+(1.020)+(6.002), (I-052)+(1.020)+(6.003), (I-052)+(1.020)+(6.004), (I-052)+(1.020)+(7.001), (I-052)+(1.020)+(7.002), (I-052)+(1.020)+(7.003), (I-052)+(1.020)+(7.004), (I-052)+(1.020)+(7.005), (I-052)+(1.020)+(7.006), (I-052)+(1.020)+(9.001), (I-052)+(1.020)+(9.002), (I-052)+(1.020)+(9.003), (I-052)+(1.020)+(9.004), (I-052)+(1.020)+(9.005), (I-052)+(1.020)+(9.006), (I-052)+(1.020)+(9.007), (I-052)+(1.020)+(9.008), (I-052)+(1.020)+(9.009), (I-052)+(1.020)+(14.001), (I-052)+(1.020)+(14.002), (I-052)+(1.020)+(15.008), (I-052)+(1.020)+(15.011), (I-052)+(1.020)+(15.012), (I-052)+(1.020)+(15.016), (I-052)+(1.020)+(15.025), (I-052)+(1.020)+(15.027), (I-052)+(1.020)+(15.047), (I-052)+(1.020)+(15.063), (I-052)+(1.020)+(15.064), (I-052)+(1.020)+(16.001), (I-052)+(1.020)+(16.002), (I-052)+(1.020)+(16.003), (I-052)+(1.020)+(16.004), (I-052)+(1.020)+(16.005), (I-052)+(1.020)+(16.006), (I-052)+(1.020)+(16.007), (I-052)+(1.020)+(16.008), (I-052)+(1.020)+(17.001), (I-052)+(1.020)+(17.002), (I-052)+(1.020)+(17.003), (I-052)+(1.020)+(17.004), (I-052)+(1.020)+(17.005), (I-052)+(1.020)+(17.006), (I-052)+(1.020)+(17.007), (I-052)+(1.020)+(17.008), (I-052)+(1.020)+(17.009), (I-052)+(1.020)+(17.010), (I-052)+(1.020)+(17.011), (I-052)+(1.020)+(17.012), (I-052)+(1.020)+(18.001),
(I-052)+(1.021)+(1.022), (I-052)+(1.021)+(1.023), (I-052)+(1.021)+(1.024), (I-052)+(1.021)+(1.025), (I-052)+(1.021)+(1.026), (I-052)+(1.021)+(1.027), (I-052)+(1.021)+(1.028), (I-052)+(1.021)+(1.029), (I-052)+(1.021)+(1.030), (I-052)+(1.021)+(1.031), (I-052)+(1.021)+(1.032), (I-052)+(1.021)+(1.033), (I-052)+(1.021)+(1.034), (I-052)+(1.021)+(1.035), (I-052)+(1.021)+(1.036), (I-052)+(1.021)+(1.037), (I-052)+(1.021)+(1.038), (I-052)+(1.021)+(1.039), (I-052)+(1.021)+(1.040), (I-052)+(1.021)+(1.041), (I-052)+(1.021)+(1.042), (I-052)+(1.021)+(1.043), (I-052)+(1.021)+(1.044), (I-052)+(1.021)+(1.045), (I-052)+(1.021)+(1.046), (I-052)+(1.021)+(1.047), (I-052)+(1.021)+(1.048), (I-052)+(1.021)+(1.049), (I-052)+(1.021)+(1.050), (I-052)+(1.021)+(1.051), (I-052)+(1.021)+(1.052), (I-052)+(1.021)+(1.053), (I-052)+(1.021)+(1.054), (I-052)+(1.021)+(1.055), (I-052)+(1.021)+(1.056), (I-052)+(1.021)+(1.057), (I-052)+(1.021)+(1.058), (I-052)+(1.021)+(1.059), (I-052)+(1.021)+(1.060), (I-052)+(1.021)+(1.061), (I-052)+(1.021)+(1.062), (I-052)+(1.021)+(1.063), (I-052)+(1.021)+(1.064), (I-052)+(1.021)+(1.065), (I-052)+(1.021)+(1.066), (I-052)+(1.021)+(1.067), (I-052)+(1.021)+(1.068), (I-052)+(1.021)+(1.069), (I-052)+(1.021)+(1.070), (I-052)+(1.021)+(1.071), (I-052)+(1.021)+(1.072), (I-052)+(1.021)+(1.073), (I-052)+(1.021)+(1.074), (I-052)+(1.021)+(1.075), (I-052)+(1.021)+(1.076), (I-052)+(1.021)+(1.077), (I-052)+(1.021)+(1.078), (I-052)+(1.021)+(1.079), (I-052)+(1.021)+(1.080), (I-052)+(1.021)+(1.081), (I-052)+(1.021)+(1.082), (I-052)+(1.021)+(1.083), (I-052)+(1.021)+(1.084), (I-052)+(1.021)+(1.085), (I-052)+(1.021)+(1.086), (I-052)+(1.021)+(1.087), (I-052)+(1.021)+(1.088), (I-052)+(1.021)+(1.089), (I-052)+(1.021)+(1.090), (I-052)+(1.021)+(1.091), (I-052)+(1.021)+(1.092), (I-052)+(1.021)+(2.001), (I-052)+(1.021)+(2.002), (I-052)+(1.021)+(2.003), (I-052)+(1.021)+(2.004), (I-052)+(1.021)+(2.005), (I-052)+(1.021)+(2.006), (I-052)+(1.021)+(2.007), (I-052)+(1.021)+(2.008), (I-052)+(1.021)+(2.009), (I-052)+(1.021)+(2.010), (I-052)+(1.021)+(2.011), (I-052)+(1.021)+(2.012), (I-052)+(1.021)+(2.013), (I-052)+(1.021)+(2.014), (I-052)+(1.021)+(2.015), (I-052)+(1.021)+(2.016), (I-052)+(1.021)+(2.017), (I-052)+(1.021)+(2.018), (I-052)+(1.021)+(2.019), (I-052)+(1.021)+(2.020), (I-052)+(1.021)+(2.021), (I-052)+(1.021)+(2.022), (I-052)+(1.021)+(2.023), (I-052)+(1.021)+(2.024), (I-052)+(1.021)+(2.025), (I-052)+(1.021)+(2.026), (I-052)+(1.021)+(2.027), (I-052)+(1.021)+(2.028), (I-052)+(1.021)+(2.029), (I-052)+(1.021)+(2.030), (I-052)+(1.021)+(2.031), (I-052)+(1.021)+(2.032), (I-052)+(1.021)+(2.033), (I-052)+(1.021)+(2.034), (I-052)+(1.021)+(2.035), (I-052)+(1.021)+(2.036), (I-052)+(1.021)+(2.037), (I-052)+(1.021)+(2.038), (I-052)+(1.021)+(2.039), (I-052)+(1.021)+(2.040), (I-052)+(1.021)+(2.041), (I-052)+(1.021)+(2.042), (I-052)+(1.021)+(2.043), (I-052)+(1.021)+(2.044), (I-052)+(1.021)+(2.045), (I-052)+(1.021)+(2.046), (I-052)+(1.021)+(2.047), (I-052)+(1.021)+(2.048), (I-052)+(1.021)+(2.049), (I-052)+(1.021)+(2.050), (I-052)+(1.021)+(2.051), (I-052)+(1.021)+(2.052), (I-052)+(1.021)+(2.053), (I-052)+(1.021)+(2.054), (I-052)+(1.021)+(2.055), (I-052)+(1.021)+(2.056), (I-052)+(1.021)+(2.057), (I-052)+(1.021)+(2.058), (I-052)+(1.021)+(2.059), (I-052)+(1.021)+(3.001), (I-052)+(1.021)+(3.002), (I-052)+(1.021)+(3.003), (I-052)+(1.021)+(3.004), (I-052)+(1.021)+(3.005), (I-052)+(1.021)+(3.006), (I-052)+(1.021)+(3.007), (I-052)+(1.021)+(3.008), (I-052)+(1.021)+(3.009), (I-052)+(1.021)+(3.010), (I-052)+(1.021)+(3.011), (I-052)+(1.021)+(3.012), (I-052)+(1.021)+(3.013), (I-052)+(1.021)+(3.014), (I-052)+(1.021)+(3.015), (I-052)+(1.021)+(3.016), (I-052)+(1.021)+(3.017), (I-052)+(1.021)+(3.018), (I-052)+(1.021)+(3.019), (I-052)+(1.021)+(3.020), (I-052)+(1.021)+(3.021), (I-052)+(1.021)+(3.022), (I-052)+(1.021)+(3.023), (I-052)+(1.021)+(3.024), (I-052)+(1.021)+(3.025), (I-052)+(1.021)+(3.026), (I-052)+(1.021)+(3.027), (I-052)+(1.021)+(3.028), (I-052)+(1.021)+(3.029), (I-052)+(1.021)+(3.030), (I-052)+(1.021)+(3.031), (I-052)+(1.021)+(5.001), (I-052)+(1.021)+(5.002), (I-052)+(1.021)+(5.003), (I-052)+(1.021)+(5.004), (I-052)+(1.021)+(5.005), (I-052)+(1.021)+(5.006), (I-052)+(1.021)+(5.007), (I-052)+(1.021)+(5.008), (I-052)+(1.021)+(5.009), (I-052)+(1.021)+(5.010), (I-052)+(1.021)+(5.011), (I-052)+(1.021)+(5.012), (I-052)+(1.021)+(5.013), (I-052)+(1.021)+(5.014), (I-052)+(1.021)+(5.015), (I-052)+(1.021)+(5.016), (I-052)+(1.021)+(5.017), (I-052)+(1.021)+(5.018), (I-052)+(1.021)+(5.019), (I-052)+(1.021)+(5.020), (I-052)+(1.021)+(5.021), (I-052)+(1.021)+(5.022), (I-052)+(1.021)+(5.023), (I-052)+(1.021)+(6.001), (I-052)+(1.021)+(6.002), (I-052)+(1.021)+(6.003), (I-052)+(1.021)+(6.004), (I-052)+(1.021)+(7.001), (I-052)+(1.021)+(7.002), (I-052)+(1.021)+(7.003), (I-052)+(1.021)+(7.004), (I-052)+(1.021)+(7.005), (I-052)+(1.021)+(7.006), (I-052)+(1.021)+(9.001), (I-052)+(1.021)+(9.002), (I-052)+(1.021)+(9.003), (I-052)+(1.021)+(9.004), (I-052)+(1.021)+(9.005), (I-052)+(1.021)+(9.006), (I-052)+(1.021)+(9.007), (I-052)+(1.021)+(9.008), (I-052)+(1.021)+(9.009), (I-052)+(1.021)+(14.001), (I-052)+(1.021)+(14.002), (I-052)+(1.021)+(15.008), (I-052)+(1.021)+(15.011), (I-052)+(1.021)+(15.012), (I-052)+(1.021)+(15.016), (I-052)+(1.021)+(15.025), (I-052)+(1.021)+(15.027), (I-052)+(1.021)+(15.047), (I-052)+(1.021)+(15.063), (I-052)+(1.021)+(15.064), (I-052)+(1.021)+(16.001), (I-052)+(1.021)+(16.002), (I-052)+(1.021)+(16.003), (I-052)+(1.021)+(16.004), (I-052)+(1.021)+(16.005), (I-052)+(1.021)+(16.006), (I-052)+(1.021)+(16.007), (I-052)+(1.021)+(16.008), (I-052)+(1.021)+(17.001), (I-052)+(1.021)+(17.002), (I-052)+(1.021)+(17.003), (I-052)+(1.021)+(17.004), (I-052)+(1.021)+(17.005), (I-052)+(1.021)+(17.006), (I-052)+(1.021)+(17.007), (I-052)+(1.021)+(17.008), (I-052)+(1.021)+(17.009), (I-052)+(1.021)+(17.010), (I-052)+(1.021)+(17.011), (I-052)+(1.021)+(17.012), (I-052)+(1.021)+(18.001),
(I-052)+(1.022)+(1.023), (I-052)+(1.022)+(1.024), (I-052)+(1.022)+(1.025), (I-052)+(1.022)+(1.026), (I-052)+(1.022)+(1.027), (I-052)+(1.022)+(1.028), (I-052)+(1.022)+(1.029), (I-052)+(1.022)+(1.030), (I-052)+(1.022)+(1.031), (I-052)+(1.022)+(1.032), (I-052)+(1.022)+(1.033), (I-052)+(1.022)+(1.034), (I-052)+(1.022)+(1.035), (I-052)+(1.022)+(1.036), (I-052)+(1.022)+(1.037), (I-052)+(1.022)+(1.038), (I-052)+(1.022)+(1.039), (I-052)+(1.022)+(1.040), (I-052)+(1.022)+(1.041), (I-052)+(1.022)+(1.042), (I-052)+(1.022)+(1.043), (I-052)+(1.022)+(1.044), (I-052)+(1.022)+(1.045), (I-052)+(1.022)+(1.046), (I-052)+(1.022)+(1.047), (I-052)+(1.022)+(1.048), (I-052)+(1.022)+(1.049), (I-052)+(1.022)+(1.050), (I-052)+(1.022)+(1.051), (I-052)+(1.022)+(1.052), (I-052)+(1.022)+(1.053), (I-052)+(1.022)+(1.054), (I-052)+(1.022)+(1.055), (I-052)+(1.022)+(1.056), (I-052)+(1.022)+(1.057), (I-052)+(1.022)+(1.058), (I-052)+(1.022)+(1.059), (I-052)+(1.022)+(1.060), (I-052)+(1.022)+(1.061), (I-052)+(1.022)+(1.062), (I-052)+(1.022)+(1.063), (I-052)+(1.022)+(1.064), (I-052)+(1.022)+(1.065), (I-052)+(1.022)+(1.066), (I-052)+(1.022)+(1.067), (I-052)+(1.022)+(1.068), (I-052)+(1.022)+(1.069), (I-052)+(1.022)+(1.070), (I-052)+(1.022)+(1.071), (I-052)+(1.022)+(1.072), (I-052)+(1.022)+(1.073), (I-052)+(1.022)+(1.074), (I-052)+(1.022)+(1.075), (I-052)+(1.022)+(1.076), (I-052)+(1.022)+(1.077), (I-052)+(1.022)+(1.078), (I-052)+(1.022)+(1.079), (I-052)+(1.022)+(1.080), (I-052)+(1.022)+(1.081), (I-052)+(1.022)+(1.082), (I-052)+(1.022)+(1.083), (I-052)+(1.022)+(1.084), (I-052)+(1.022)+(1.085), (I-052)+(1.022)+(1.086), (I-052)+(1.022)+(1.087), (I-052)+(1.022)+(1.088), (I-052)+(1.022)+(1.089), (I-052)+(1.022)+(1.090), (I-052)+(1.022)+(1.091), (I-052)+(1.022)+(1.092), (I-052)+(1.022)+(2.001), (I-052)+(1.022)+(2.002), (I-052)+(1.022)+(2.003), (I-052)+(1.022)+(2.004), (I-052)+(1.022)+(2.005), (I-052)+(1.022)+(2.006), (I-052)+(1.022)+(2.007), (I-052)+(1.022)+(2.008), (I-052)+(1.022)+(2.009), (I-052)+(1.022)+(2.010), (I-052)+(1.022)+(2.011), (I-052)+(1.022)+(2.012), (I-052)+(1.022)+(2.013), (I-052)+(1.022)+(2.014), (I-052)+(1.022)+(2.015), (I-052)+(1.022)+(2.016), (I-052)+(1.022)+(2.017), (I-052)+(1.022)+(2.018), (I-052)+(1.022)+(2.019), (I-052)+(1.022)+(2.020), (I-052)+(1.022)+(2.021), (I-052)+(1.022)+(2.022), (I-052)+(1.022)+(2.023), (I-052)+(1.022)+(2.024), (I-052)+(1.022)+(2.025), (I-052)+(1.022)+(2.026), (I-052)+(1.022)+(2.027), (I-052)+(1.022)+(2.028), (I-052)+(1.022)+(2.029), (I-052)+(1.022)+(2.030), (I-052)+(1.022)+(2.031), (I-052)+(1.022)+(2.032), (I-052)+(1.022)+(2.033), (I-052)+(1.022)+(2.034), (I-052)+(1.022)+(2.035), (I-052)+(1.022)+(2.036), (I-052)+(1.022)+(2.037), (I-052)+(1.022)+(2.038), (I-052)+(1.022)+(2.039), (I-052)+(1.022)+(2.040), (I-052)+(1.022)+(2.041), (I-052)+(1.022)+(2.042), (I-052)+(1.022)+(2.043), (I-052)+(1.022)+(2.044), (I-052)+(1.022)+(2.045), (I-052)+(1.022)+(2.046), (I-052)+(1.022)+(2.047), (I-052)+(1.022)+(2.048), (I-052)+(1.022)+(2.049), (I-052)+(1.022)+(2.050), (I-052)+(1.022)+(2.051), (I-052)+(1.022)+(2.052), (I-052)+(1.022)+(2.053), (I-052)+(1.022)+(2.054), (I-052)+(1.022)+(2.055), (I-052)+(1.022)+(2.056), (I-052)+(1.022)+(2.057), (I-052)+(1.022)+(2.058), (I-052)+(1.022)+(2.059), (I-052)+(1.022)+(3.001), (I-052)+(1.022)+(3.002), (I-052)+(1.022)+(3.003), (I-052)+(1.022)+(3.004), (I-052)+(1.022)+(3.005), (I-052)+(1.022)+(3.006), (I-052)+(1.022)+(3.007), (I-052)+(1.022)+(3.008), (I-052)+(1.022)+(3.009), (I-052)+(1.022)+(3.010), (I-052)+(1.022)+(3.011), (I-052)+(1.022)+(3.012), (I-052)+(1.022)+(3.013), (I-052)+(1.022)+(3.014), (I-052)+(1.022)+(3.015), (I-052)+(1.022)+(3.016), (I-052)+(1.022)+(3.017), (I-052)+(1.022)+(3.018), (I-052)+(1.022)+(3.019), (I-052)+(1.022)+(3.020), (I-052)+(1.022)+(3.021), (I-052)+(1.022)+(3.022), (I-052)+(1.022)+(3.023), (I-052)+(1.022)+(3.024), (I-052)+(1.022)+(3.025), (I-052)+(1.022)+(3.026), (I-052)+(1.022)+(3.027), (I-052)+(1.022)+(3.028), (I-052)+(1.022)+(3.029), (I-052)+(1.022)+(3.030), (I-052)+(1.022)+(3.031), (I-052)+(1.022)+(5.001), (I-052)+(1.022)+(5.002), (I-052)+(1.022)+(5.003), (I-052)+(1.022)+(5.004), (I-052)+(1.022)+(5.005), (I-052)+(1.022)+(5.006), (I-052)+(1.022)+(5.007), (I-052)+(1.022)+(5.008), (I-052)+(1.022)+(5.009), (I-052)+(1.022)+(5.010), (I-052)+(1.022)+(5.011), (I-052)+(1.022)+(5.012), (I-052)+(1.022)+(5.013), (I-052)+(1.022)+(5.014), (I-052)+(1.022)+(5.015), (I-052)+(1.022)+(5.016), (I-052)+(1.022)+(5.017), (I-052)+(1.022)+(5.018), (I-052)+(1.022)+(5.019), (I-052)+(1.022)+(5.020), (I-052)+(1.022)+(5.021), (I-052)+(1.022)+(5.022), (I-052)+(1.022)+(5.023), (I-052)+(1.022)+(6.001), (I-052)+(1.022)+(6.002), (I-052)+(1.022)+(6.003), (I-052)+(1.022)+(6.004), (I-052)+(1.022)+(7.001), (I-052)+(1.022)+(7.002), (I-052)+(1.022)+(7.003), (I-052)+(1.022)+(7.004), (I-052)+(1.022)+(7.005), (I-052)+(1.022)+(7.006), (I-052)+(1.022)+(9.001), (I-052)+(1.022)+(9.002), (I-052)+(1.022)+(9.003), (I-052)+(1.022)+(9.004), (I-052)+(1.022)+(9.005), (I-052)+(1.022)+(9.006), (I-052)+(1.022)+(9.007), (I-052)+(1.022)+(9.008), (I-052)+(1.022)+(9.009), (I-052)+(1.022)+(14.001), (I-052)+(1.022)+(14.002), (I-052)+(1.022)+(15.008), (I-052)+(1.022)+(15.011), (I-052)+(1.022)+(15.012), (I-052)+(1.022)+(15.016), (I-052)+(1.022)+(15.025), (I-052)+(1.022)+(15.027), (I-052)+(1.022)+(15.047), (I-052)+(1.022)+(15.063), (I-052)+(1.022)+(15.064), (I-052)+(1.022)+(16.001), (I-052)+(1.022)+(16.002), (I-052)+(1.022)+(16.003), (I-052)+(1.022)+(16.004), (I-052)+(1.022)+(16.005), (I-052)+(1.022)+(16.006), (I-052)+(1.022)+(16.007), (I-052)+(1.022)+(16.008), (I-052)+(1.022)+(17.001), (I-052)+(1.022)+(17.002), (I-052)+(1.022)+(17.003), (I-052)+(1.022)+(17.004), (I-052)+(1.022)+(17.005), (I-052)+(1.022)+(17.006), (I-052)+(1.022)+(17.007), (I-052)+(1.022)+(17.008), (I-052)+(1.022)+(17.009), (I-052)+(1.022)+(17.010), (I-052)+(1.022)+(17.011), (I-052)+(1.022)+(17.012), (I-052)+(1.022)+(18.001), (I-052)+(1.023)+(1.024), (I-052)+(1.023)+(1.025), (I-052)+(1.023)+(1.026), (I-052)+(1.023)+(1.027), (I-052)+(1.023)+(1.028), (I-052)+(1.023)+(1.029), (I-052)+(1.023)+(1.030), (I-052)+(1.023)+(1.031), (I-052)+(1.023)+(1.032), (I-052)+(1.023)+(1.033), (I-052)+(1.023)+(1.034), (I-052)+(1.023)+(1.035), (I-052)+(1.023)+(1.036), (I-052)+(1.023)+(1.037), (I-052)+(1.023)+(1.038), (I-052)+(1.023)+(1.039), (I-052)+(1.023)+(1.040), (I-052)+(1.023)+(1.041), (I-052)+(1.023)+(1.042), (I-052)+(1.023)+(1.043), (I-052)+(1.023)+(1.044), (I-052)+(1.023)+(1.045), (I-052)+(1.023)+(1.046), (I-052)+(1.023)+(1.047), (I-052)+(1.023)+(1.048), (I-052)+(1.023)+(1.049), (I-052)+(1.023)+(1.050), (I-052)+(1.023)+(1.051), (I-052)+(1.023)+(1.052), (I-052)+(1.023)+(1.053), (I-052)+(1.023)+(1.054), (I-052)+(1.023)+(1.055), (I-052)+(1.023)+(1.056), (I-052)+(1.023)+(1.057), (I-052)+(1.023)+(1.058), (I-052)+(1.023)+(1.059), (I-052)+(1.023)+(1.060), (I-052)+(1.023)+(1.061), (I-052)+(1.023)+(1.062), (I-052)+(1.023)+(1.063), (I-052)+(1.023)+(1.064), (I-052)+(1.023)+(1.065), (I-052)+(1.023)+(1.066), (I-052)+(1.023)+(1.067), (I-052)+(1.023)+(1.068), (I-052)+(1.023)+(1.069), (I-052)+(1.023)+(1.070), (I-052)+(1.023)+(1.071), (I-052)+(1.023)+(1.072), (I-052)+(1.023)+(1.073), (I-052)+(1.023)+(1.074), (I-052)+(1.023)+(1.075), (I-052)+(1.023)+(1.076), (I-052)+(1.023)+(1.077), (I-052)+(1.023)+(1.078), (I-052)+(1.023)+(1.079), (I-052)+(1.023)+(1.080), (I-052)+(1.023)+(1.081), (I-052)+(1.023)+(1.082), (I-052)+(1.023)+(1.083), (I-052)+(1.023)+(1.084), (I-052)+(1.023)+(1.085), (I-052)+(1.023)+(1.086), (I-052)+(1.023)+(1.087), (I-052)+(1.023)+(1.088), (I-052)+(1.023)+(1.089), (I-052)+(1.023)+(1.090), (I-052)+(1.023)+(1.091), (I-052)+(1.023)+(1.092), (I-052)+(1.023)+(2.001), (I-052)+(1.023)+(2.002), (I-052)+(1.023)+(2.003), (I-052)+(1.023)+(2.004), (I-052)+(1.023)+(2.005), (I-052)+(1.023)+(2.006), (I-052)+(1.023)+(2.007), (I-052)+(1.023)+(2.008), (I-052)+(1.023)+(2.009), (I-052)+(1.023)+(2.010), (I-052)+(1.023)+(2.011), (I-052)+(1.023)+(2.012), (I-052)+(1.023)+(2.013), (I-052)+(1.023)+(2.014), (I-052)+(1.023)+(2.015), (I-052)+(1.023)+(2.016), (I-052)+(1.023)+(2.017), (I-052)+(1.023)+(2.018), (I-052)+(1.023)+(2.019), (I-052)+(1.023)+(2.020), (I-052)+(1.023)+(2.021), (I-052)+(1.023)+(2.022), (I-052)+(1.023)+(2.023), (I-052)+(1.023)+(2.024), (I-052)+(1.023)+(2.025), (I-052)+(1.023)+(2.026), (I-052)+(1.023)+(2.027), (I-052)+(1.023)+(2.028), (I-052)+(1.023)+(2.029), (I-052)+(1.023)+(2.030), (I-052)+(1.023)+(2.031), (I-052)+(1.023)+(2.032), (I-052)+(1.023)+(2.033), (I-052)+(1.023)+(2.034), (I-052)+(1.023)+(2.035), (I-052)+(1.023)+(2.036), (I-052)+(1.023)+(2.037), (I-052)+(1.023)+(2.038), (I-052)+(1.023)+(2.039), (I-052)+(1.023)+(2.040), (I-052)+(1.023)+(2.041), (I-052)+(1.023)+(2.042), (I-052)+(1.023)+(2.043), (I-052)+(1.023)+(2.044), (I-052)+(1.023)+(2.045), (I-052)+(1.023)+(2.046), (I-052)+(1.023)+(2.047), (I-052)+(1.023)+(2.048), (I-052)+(1.023)+(2.049), (I-052)+(1.023)+(2.050), (I-052)+(1.023)+(2.051), (I-052)+(1.023)+(2.052), (I-052)+(1.023)+(2.053), (I-052)+(1.023)+(2.054), (I-052)+(1.023)+(2.055), (I-052)+(1.023)+(2.056), (I-052)+(1.023)+(2.057), (I-052)+(1.023)+(2.058), (I-052)+(1.023)+(2.059), (I-052)+(1.023)+(3.001), (I-052)+(1.023)+(3.002), (I-052)+(1.023)+(3.003), (I-052)+(1.023)+(3.004), (I-052)+(1.023)+(3.005), (I-052)+(1.023)+(3.006), (I-052)+(1.023)+(3.007), (I-052)+(1.023)+(3.008), (I-052)+(1.023)+(3.009), (I-052)+(1.023)+(3.010), (I-052)+(1.023)+(3.011), (I-052)+(1.023)+(3.012), (I-052)+(1.023)+(3.013), (I-052)+(1.023)+(3.014), (I-052)+(1.023)+(3.015), (I-052)+(1.023)+(3.016), (I-052)+(1.023)+(3.017), (I-052)+(1.023)+(3.018), (I-052)+(1.023)+(3.019), (I-052)+(1.023)+(3.020), (I-052)+(1.023)+(3.021), (I-052)+(1.023)+(3.022), (I-052)+(1.023)+(3.023), (I-052)+(1.023)+(3.024), (I-052)+(1.023)+(3.025), (I-052)+(1.023)+(3.026), (I-052)+(1.023)+(3.027), (I-052)+(1.023)+(3.028), (I-052)+(1.023)+(3.029), (I-052)+(1.023)+(3.030), (I-052)+(1.023)+(3.031), (I-052)+(1.023)+(5.001), (I-052)+(1.023)+(5.002), (I-052)+(1.023)+(5.003), (I-052)+(1.023)+(5.004), (I-052)+(1.023)+(5.005), (I-052)+(1.023)+(5.006), (I-052)+(1.023)+(5.007), (I-052)+(1.023)+(5.008), (I-052)+(1.023)+(5.009), (I-052)+(1.023)+(5.010), (I-052)+(1.023)+(5.011), (I-052)+(1.023)+(5.012), (I-052)+(1.023)+(5.013), (I-052)+(1.023)+(5.014), (I-052)+(1.023)+(5.015), (I-052)+(1.023)+(5.016), (I-052)+(1.023)+(5.017), (I-052)+(1.023)+(5.018), (I-052)+(1.023)+(5.019), (I-052)+(1.023)+(5.020), (I-052)+(1.023)+(5.021), (I-052)+(1.023)+(5.022), (I-052)+(1.023)+(5.023), (I-052)+(1.023)+(6.001), (I-052)+(1.023)+(6.002), (I-052)+(1.023)+(6.003), (I-052)+(1.023)+(6.004), (I-052)+(1.023)+(7.001), (I-052)+(1.023)+(7.002), (I-052)+(1.023)+(7.003), (I-052)+(1.023)+(7.004), (I-052)+(1.023)+(7.005), (I-052)+(1.023)+(7.006), (I-052)+(1.023)+(9.001), (I-052)+(1.023)+(9.002), (I-052)+(1.023)+(9.003), (I-052)+(1.023)+(9.004), (I-052)+(1.023)+(9.005), (I-052)+(1.023)+(9.006), (I-052)+(1.023)+(9.007), (I-052)+(1.023)+(9.008), (I-052)+(1.023)+(9.009), (I-052)+(1.023)+(14.001), (I-052)+(1.023)+(14.002), (I-052)+(1.023)+(15.008), (I-052)+(1.023)+(15.011), (I-052)+(1.023)+(15.012), (I-052)+(1.023)+(15.016), (I-052)+(1.023)+(15.025), (I-052)+(1.023)+(15.027), (I-052)+(1.023)+(15.047), (I-052)+(1.023)+(15.063), (I-052)+(1.023)+(15.064), (I-052)+(1.023)+(16.001), (I-052)+(1.023)+(16.002), (I-052)+(1.023)+(16.003), (I-052)+(1.023)+(16.004), (I-052)+(1.023)+(16.005), (I-052)+(1.023)+(16.006), (I-052)+(1.023)+(16.007), (I-052)+(1.023)+(16.008), (I-052)+(1.023)+(17.001), (I-052)+(1.023)+(17.002), (I-052)+(1.023)+(17.003), (I-052)+(1.023)+(17.004), (I-052)+(1.023)+(17.005), (I-052)+(1.023)+(17.006), (I-052)+(1.023)+(17.007), (I-052)+(1.023)+(17.008), (I-052)+(1.023)+(17.009), (I-052)+(1.023)+(17.010), (I-052)+(1.023)+(17.011), (I-052)+(1.023)+(17.012), (I-052)+(1.023)+(18.001), (I-052)+(1.024)+(1.025), (I-052)+(1.024)+(1.026), (I-052)+(1.024)+(1.027), (I-052)+(1.024)+(1.028), (I-052)+(1.024)+(1.029), (I-052)+(1.024)+(1.030), (I-052)+(1.024)+(1.031), (I-052)+(1.024)+(1.032), (I-052)+(1.024)+(1.033), (I-052)+(1.024)+(1.034), (I-052)+(1.024)+(1.035), (I-052)+(1.024)+(1.036), (I-052)+(1.024)+(1.037), (I-052)+(1.024)+(1.038), (I-052)+(1.024)+(1.039), (I-052)+(1.024)+(1.040), (I-052)+(1.024)+(1.041), (I-052)+(1.024)+(1.042), (I-052)+(1.024)+(1.043), (I-052)+(1.024)+(1.044), (I-052)+(1.024)+(1.045), (I-052)+(1.024)+(1.046), (I-052)+(1.024)+(1.047), (I-052)+(1.024)+(1.048), (I-052)+(1.024)+(1.049), (I-052)+(1.024)+(1.050), (I-052)+(1.024)+(1.051), (I-052)+(1.024)+(1.052), (I-052)+(1.024)+(1.053), (I-052)+(1.024)+(1.054), (I-052)+(1.024)+(1.055), (I-052)+(1.024)+(1.056), (I-052)+(1.024)+(1.057), (I-052)+(1.024)+(1.058), (I-052)+(1.024)+(1.059), (I-052)+(1.024)+(1.060), (I-052)+(1.024)+(1.061), (I-052)+(1.024)+(1.062), (I-052)+(1.024)+(1.063), (I-052)+(1.024)+(1.064), (I-052)+(1.024)+(1.065), (I-052)+(1.024)+(1.066), (I-052)+(1.024)+(1.067), (I-052)+(1.024)+(1.068), (I-052)+(1.024)+(1.069), (I-052)+(1.024)+(1.070), (I-052)+(1.024)+(1.071), (I-052)+(1.024)+(1.072), (I-052)+(1.024)+(1.073), (I-052)+(1.024)+(1.074), (I-052)+(1.024)+(1.075), (I-052)+(1.024)+(1.076), (I-052)+(1.024)+(1.077), (I-052)+(1.024)+(1.078), (I-052)+(1.024)+(1.079), (I-052)+(1.024)+(1.080), (I-052)+(1.024)+(1.081), (I-052)+(1.024)+(1.082), (I-052)+(1.024)+(1.083), (I-052)+(1.024)+(1.084), (I-052)+(1.024)+(1.085), (I-052)+(1.024)+(1.086), (I-052)+(1.024)+(1.087), (I-052)+(1.024)+(1.088), (I-052)+(1.024)+(1.089), (I-052)+(1.024)+(1.090), (I-052)+(1.024)+(1.091), (I-052)+(1.024)+(1.092), (I-052)+(1.024)+(2.001), (I-052)+(1.024)+(2.002), (I-052)+(1.024)+(2.003), (I-052)+(1.024)+(2.004), (I-052)+(1.024)+(2.005), (I-052)+(1.024)+(2.006), (I-052)+(1.024)+(2.007), (I-052)+(1.024)+(2.008), (I-052)+(1.024)+(2.009), (I-052)+(1.024)+(2.010), (I-052)+(1.024)+(2.011), (I-052)+(1.024)+(2.012), (I-052)+(1.024)+(2.013), (I-052)+(1.024)+(2.014), (I-052)+(1.024)+(2.015), (I-052)+(1.024)+(2.016), (I-052)+(1.024)+(2.017), (I-052)+(1.024)+(2.018), (I-052)+(1.024)+(2.019), (I-052)+(1.024)+(2.020), (I-052)+(1.024)+(2.021), (I-052)+(1.024)+(2.022), (I-052)+(1.024)+(2.023), (I-052)+(1.024)+(2.024), (I-052)+(1.024)+(2.025), (I-052)+(1.024)+(2.026), (I-052)+(1.024)+(2.027), (I-052)+(1.024)+(2.028), (I-052)+(1.024)+(2.029), (I-052)+(1.024)+(2.030), (I-052)+(1.024)+(2.031), (I-052)+(1.024)+(2.032), (I-052)+(1.024)+(2.033), (I-052)+(1.024)+(2.034), (I-052)+(1.024)+(2.035), (I-052)+(1.024)+(2.036), (I-052)+(1.024)+(2.037), (I-052)+(1.024)+(2.038), (I-052)+(1.024)+(2.039), (I-052)+(1.024)+(2.040), (I-052)+(1.024)+(2.041), (I-052)+(1.024)+(2.042), (I-052)+(1.024)+(2.043), (I-052)+(1.024)+(2.044), (I-052)+(1.024)+(2.045), (I-052)+(1.024)+(2.046), (I-052)+(1.024)+(2.047), (I-052)+(1.024)+(2.048), (I-052)+(1.024)+(2.049), (I-052)+(1.024)+(2.050), (I-052)+(1.024)+(2.051), (I-052)+(1.024)+(2.052), (I-052)+(1.024)+(2.053), (I-052)+(1.024)+(2.054), (I-052)+(1.024)+(2.055), (I-052)+(1.024)+(2.056), (I-052)+(1.024)+(2.057), (I-052)+(1.024)+(2.058), (I-052)+(1.024)+(2.059), (I-052)+(1.024)+(3.001), (I-052)+(1.024)+(3.002), (I-052)+(1.024)+(3.003), (I-052)+(1.024)+(3.004), (I-052)+(1.024)+(3.005), (I-052)+(1.024)+(3.006), (I-052)+(1.024)+(3.007), (I-052)+(1.024)+(3.008), (I-052)+(1.024)+(3.009), (I-052)+(1.024)+(3.010), (I-052)+(1.024)+(3.011), (I-052)+(1.024)+(3.012), (I-052)+(1.024)+(3.013), (I-052)+(1.024)+(3.014), (I-052)+(1.024)+(3.015), (I-052)+(1.024)+(3.016), (I-052)+(1.024)+(3.017), (I-052)+(1.024)+(3.018), (I-052)+(1.024)+(3.019), (I-052)+(1.024)+(3.020), (I-052)+(1.024)+(3.021), (I-052)+(1.024)+(3.022), (I-052)+(1.024)+(3.023), (I-052)+(1.024)+(3.024), (I-052)+(1.024)+(3.025), (I-052)+(1.024)+(3.026), (I-052)+(1.024)+(3.027), (I-052)+(1.024)+(3.028), (I-052)+(1.024)+(3.029), (I-052)+(1.024)+(3.030), (I-052)+(1.024)+(3.031), (I-052)+(1.024)+(5.001), (I-052)+(1.024)+(5.002), (I-052)+(1.024)+(5.003), (I-052)+(1.024)+(5.004), (I-052)+(1.024)+(5.005), (I-052)+(1.024)+(5.006), (I-052)+(1.024)+(5.007), (I-052)+(1.024)+(5.008), (I-052)+(1.024)+(5.009), (I-052)+(1.024)+(5.010), (I-052)+(1.024)+(5.011), (I-052)+(1.024)+(5.012), (I-052)+(1.024)+(5.013), (I-052)+(1.024)+(5.014), (I-052)+(1.024)+(5.015), (I-052)+(1.024)+(5.016), (I-052)+(1.024)+(5.017), (I-052)+(1.024)+(5.018), (I-052)+(1.024)+(5.019), (I-052)+(1.024)+(5.020), (I-052)+(1.024)+(5.021), (I-052)+(1.024)+(5.022), (I-052)+(1.024)+(5.023), (I-052)+(1.024)+(6.001), (I-052)+(1.024)+(6.002), (I-052)+(1.024)+(6.003), (I-052)+(1.024)+(6.004), (I-052)+(1.024)+(7.001), (I-052)+(1.024)+(7.002), (I-052)+(1.024)+(7.003), (I-052)+(1.024)+(7.004), (I-052)+(1.024)+(7.005), (I-052)+(1.024)+(7.006), (I-052)+(1.024)+(9.001), (I-052)+(1.024)+(9.002), (I-052)+(1.024)+(9.003), (I-052)+(1.024)+(9.004), (I-052)+(1.024)+(9.005), (I-052)+(1.024)+(9.006), (I-052)+(1.024)+(9.007), (I-052)+(1.024)+(9.008), (I-052)+(1.024)+(9.009), (I-052)+(1.024)+(14.001), (I-052)+(1.024)+(14.002), (I-052)+(1.024)+(15.008), (I-052)+(1.024)+(15.011), (I-052)+(1.024)+(15.012), (I-052)+(1.024)+(15.016), (I-052)+(1.024)+(15.025), (I-052)+(1.024)+(15.027), (I-052)+(1.024)+(15.047), (I-052)+(1.024)+(15.063), (I-052)+(1.024)+(15.064), (I-052)+(1.024)+(16.001), (I-052)+(1.024)+(16.002), (I-052)+(1.024)+(16.003), (I-052)+(1.024)+(16.004), (I-052)+(1.024)+(16.005), (I-052)+(1.024)+(16.006), (I-052)+(1.024)+(16.007), (I-052)+(1.024)+(16.008), (I-052)+(1.024)+(17.001), (I-052)+(1.024)+(17.002), (I-052)+(1.024)+(17.003), (I-052)+(1.024)+(17.004), (I-052)+(1.024)+(17.005), (I-052)+(1.024)+(17.006), (I-052)+(1.024)+(17.007), (I-052)+(1.024)+(17.008), (I-052)+(1.024)+(17.009), (I-052)+(1.024)+(17.010), (I-052)+(1.024)+(17.011), (I-052)+(1.024)+(17.012), (I-052)+(1.024)+(18.001), (I-052)+(1.025)+(1.026), (I-052)+(1.025)+(1.027), (I-052)+(1.025)+(1.028), (I-052)+(1.025)+(1.029), (I-052)+(1.025)+(1.030), (I-052)+(1.025)+(1.031), (I-052)+(1.025)+(1.032), (I-052)+(1.025)+(1.033), (I-052)+(1.025)+(1.034), (I-052)+(1.025)+(1.035), (I-052)+(1.025)+(1.036), (I-052)+(1.025)+(1.037), (I-052)+(1.025)+(1.038), (I-052)+(1.025)+(1.039), (I-052)+(1.025)+(1.040), (I-052)+(1.025)+(1.041), (I-052)+(1.025)+(1.042), (I-052)+(1.025)+(1.043), (I-052)+(1.025)+(1.044), (I-052)+(1.025)+(1.045), (I-052)+(1.025)+(1.046), (I-052)+(1.025)+(1.047), (I-052)+(1.025)+(1.048), (I-052)+(1.025)+(1.049), (I-052)+(1.025)+(1.050), (I-052)+(1.025)+(1.051), (I-052)+(1.025)+(1.052), (I-052)+(1.025)+(1.053), (I-052)+(1.025)+(1.054), (I-052)+(1.025)+(1.055), (I-052)+(1.025)+(1.056), (I-052)+(1.025)+(1.057), (I-052)+(1.025)+(1.058), (I-052)+(1.025)+(1.059), (I-052)+(1.025)+(1.060), (I-052)+(1.025)+(1.061), (I-052)+(1.025)+(1.062), (I-052)+(1.025)+(1.063), (I-052)+(1.025)+(1.064), (I-052)+(1.025)+(1.065), (I-052)+(1.025)+(1.066), (I-052)+(1.025)+(1.067), (I-052)+(1.025)+(1.068), (I-052)+(1.025)+(1.069), (I-052)+(1.025)+(1.070), (I-052)+(1.025)+(1.071), (I-052)+(1.025)+(1.072), (I-052)+(1.025)+(1.073), (I-052)+(1.025)+(1.074), (I-052)+(1.025)+(1.075), (I-052)+(1.025)+(1.076), (I-052)+(1.025)+(1.077), (I-052)+(1.025)+(1.078), (I-052)+(1.025)+(1.079), (I-052)+(1.025)+(1.080), (I-052)+(1.025)+(1.081), (I-052)+(1.025)+(1.082), (I-052)+(1.025)+(1.083), (I-052)+(1.025)+(1.084), (I-052)+(1.025)+(1.085), (I-052)+(1.025)+(1.086), (I-052)+(1.025)+(1.087), (I-052)+(1.025)+(1.088), (I-052)+(1.025)+(1.089), (I-052)+(1.025)+(1.090), (I-052)+(1.025)+(1.091), (I-052)+(1.025)+(1.092), (I-052)+(1.025)+(2.001), (I-052)+(1.025)+(2.002), (I-052)+(1.025)+(2.003), (I-052)+(1.025)+(2.004), (I-052)+(1.025)+(2.005), (I-052)+(1.025)+(2.006), (I-052)+(1.025)+(2.007), (I-052)+(1.025)+(2.008), (I-052)+(1.025)+(2.009), (I-052)+(1.025)+(2.010), (I-052)+(1.025)+(2.011), (I-052)+(1.025)+(2.012), (I-052)+(1.025)+(2.013), (I-052)+(1.025)+(2.014), (I-052)+(1.025)+(2.015), (I-052)+(1.025)+(2.016), (I-052)+(1.025)+(2.017), (I-052)+(1.025)+(2.018), (I-052)+(1.025)+(2.019), (I-052)+(1.025)+(2.020), (I-052)+(1.025)+(2.021), (I-052)+(1.025)+(2.022), (I-052)+(1.025)+(2.023), (I-052)+(1.025)+(2.024), (I-052)+(1.025)+(2.025), (I-052)+(1.025)+(2.026), (I-052)+(1.025)+(2.027), (I-052)+(1.025)+(2.028), (I-052)+(1.025)+(2.029), (I-052)+(1.025)+(2.030), (I-052)+(1.025)+(2.031), (I-052)+(1.025)+(2.032), (I-052)+(1.025)+(2.033), (I-052)+(1.025)+(2.034), (I-052)+(1.025)+(2.035), (I-052)+(1.025)+(2.036), (I-052)+(1.025)+(2.037), (I-052)+(1.025)+(2.038), (I-052)+(1.025)+(2.039), (I-052)+(1.025)+(2.040), (I-052)+(1.025)+(2.041), (I-052)+(1.025)+(2.042), (I-052)+(1.025)+(2.043), (I-052)+(1.025)+(2.044), (I-052)+(1.025)+(2.045), (I-052)+(1.025)+(2.046), (I-052)+(1.025)+(2.047), (I-052)+(1.025)+(2.048), (I-052)+(1.025)+(2.049), (I-052)+(1.025)+(2.050), (I-052)+(1.025)+(2.051), (I-052)+(1.025)+(2.052), (I-052)+(1.025)+(2.053), (I-052)+(1.025)+(2.054), (I-052)+(1.025)+(2.055), (I-052)+(1.025)+(2.056), (I-052)+(1.025)+(2.057), (I-052)+(1.025)+(2.058), (I-052)+(1.025)+(2.059), (I-052)+(1.025)+(3.001), (I-052)+(1.025)+(3.002), (I-052)+(1.025)+(3.003), (I-052)+(1.025)+(3.004), (I-052)+(1.025)+(3.005), (I-052)+(1.025)+(3.006), (I-052)+(1.025)+(3.007), (I-052)+(1.025)+(3.008), (I-052)+(1.025)+(3.009), (I-052)+(1.025)+(3.010), (I-052)+(1.025)+(3.011), (I-052)+(1.025)+(3.012), (I-052)+(1.025)+(3.013), (I-052)+(1.025)+(3.014), (I-052)+(1.025)+(3.015), (I-052)+(1.025)+(3.016), (I-052)+(1.025)+(3.017), (I-052)+(1.025)+(3.018), (I-052)+(1.025)+(3.019), (I-052)+(1.025)+(3.020), (I-052)+(1.025)+(3.021), (I-052)+(1.025)+(3.022), (I-052)+(1.025)+(3.023), (I-052)+(1.025)+(3.024), (I-052)+(1.025)+(3.025), (I-052)+(1.025)+(3.026), (I-052)+(1.025)+(3.027), (I-052)+(1.025)+(3.028), (I-052)+(1.025)+(3.029), (I-052)+(1.025)+(3.030), (I-052)+(1.025)+(3.031), (I-052)+(1.025)+(5.001), (I-052)+(1.025)+(5.002), (I-052)+(1.025)+(5.003), (I-052)+(1.025)+(5.004), (I-052)+(1.025)+(5.005), (I-052)+(1.025)+(5.006), (I-052)+(1.025)+(5.007), (I-052)+(1.025)+(5.008), (I-052)+(1.025)+(5.009), (I-052)+(1.025)+(5.010), (I-052)+(1.025)+(5.011), (I-052)+(1.025)+(5.012), (I-052)+(1.025)+(5.013), (I-052)+(1.025)+(5.014), (I-052)+(1.025)+(5.015), (I-052)+(1.025)+(5.016), (I-052)+(1.025)+(5.017), (I-052)+(1.025)+(5.018), (I-052)+(1.025)+(5.019), (I-052)+(1.025)+(5.020), (I-052)+(1.025)+(5.021), (I-052)+(1.025)+(5.022), (I-052)+(1.025)+(5.023), (I-052)+(1.025)+(6.001), (I-052)+(1.025)+(6.002), (I-052)+(1.025)+(6.003), (I-052)+(1.025)+(6.004), (I-052)+(1.025)+(7.001), (I-052)+(1.025)+(7.002), (I-052)+(1.025)+(7.003), (I-052)+(1.025)+(7.004), (I-052)+(1.025)+(7.005), (I-052)+(1.025)+(7.006), (I-052)+(1.025)+(9.001), (I-052)+(1.025)+(9.002), (I-052)+(1.025)+(9.003), (I-052)+(1.025)+(9.004), (I-052)+(1.025)+(9.005), (I-052)+(1.025)+(9.006), (I-052)+(1.025)+(9.007), (I-052)+(1.025)+(9.008), (I-052)+(1.025)+(9.009), (I-052)+(1.025)+(14.001), (I-052)+(1.025)+(14.002), (I-052)+(1.025)+(15.008), (I-052)+(1.025)+(15.011), (I-052)+(1.025)+(15.012), (I-052)+(1.025)+(15.016), (I-052)+(1.025)+(15.025), (I-052)+(1.025)+(15.027), (I-052)+(1.025)+(15.047), (I-052)+(1.025)+(15.063), (I-052)+(1.025)+(15.064), (I-052)+(1.025)+(16.001), (I-052)+(1.025)+(16.002), (I-052)+(1.025)+(16.003), (I-052)+(1.025)+(16.004), (I-052)+(1.025)+(16.005), (I-052)+(1.025)+(16.006), (I-052)+(1.025)+(16.007), (I-052)+(1.025)+(16.008), (I-052)+(1.025)+(17.001), (I-052)+(1.025)+(17.002), (I-052)+(1.025)+(17.003), (I-052)+(1.025)+(17.004), (I-052)+(1.025)+(17.005), (I-052)+(1.025)+(17.006), (I-052)+(1.025)+(17.007), (I-052)+(1.025)+(17.008), (I-052)+(1.025)+(17.009), (I-052)+(1.025)+(17.010), (I-052)+(1.025)+(17.011), (I-052)+(1.025)+(17.012), (I-052)+(1.025)+(18.001), (I-052)+(1.026)+(1.027), (I-052)+(1.026)+(1.028), (I-052)+(1.026)+(1.029), (I-052)+(1.026)+(1.030), (I-052)+(1.026)+(1.031), (I-052)+(1.026)+(1.032), (I-052)+(1.026)+(1.033), (I-052)+(1.026)+(1.034), (I-052)+(1.026)+(1.035), (I-052)+(1.026)+(1.036), (I-052)+(1.026)+(1.037), (I-052)+(1.026)+(1.038), (I-052)+(1.026)+(1.039), (I-052)+(1.026)+(1.040), (I-052)+(1.026)+(1.041), (I-052)+(1.026)+(1.042), (I-052)+(1.026)+(1.043), (I-052)+(1.026)+(1.044), (I-052)+(1.026)+(1.045), (I-052)+(1.026)+(1.046), (I-052)+(1.026)+(1.047), (I-052)+(1.026)+(1.048), (I-052)+(1.026)+(1.049), (I-052)+(1.026)+(1.050), (I-052)+(1.026)+(1.051), (I-052)+(1.026)+(1.052), (I-052)+(1.026)+(1.053), (I-052)+(1.026)+(1.054), (I-052)+(1.026)+(1.055), (I-052)+(1.026)+(1.056), (I-052)+(1.026)+(1.057), (I-052)+(1.026)+(1.058), (I-052)+(1.026)+(1.059), (I-052)+(1.026)+(1.060), (I-052)+(1.026)+(1.061), (I-052)+(1.026)+(1.062), (I-052)+(1.026)+(1.063), (I-052)+(1.026)+(1.064), (I-052)+(1.026)+(1.065), (I-052)+(1.026)+(1.066), (I-052)+(1.026)+(1.067), (I-052)+(1.026)+(1.068), (I-052)+(1.026)+(1.069), (I-052)+(1.026)+(1.070), (I-052)+(1.026)+(1.071), (I-052)+(1.026)+(1.072), (I-052)+(1.026)+(1.073), (I-052)+(1.026)+(1.074), (I-052)+(1.026)+(1.075), (I-052)+(1.026)+(1.076), (I-052)+(1.026)+(1.077), (I-052)+(1.026)+(1.078), (I-052)+(1.026)+(1.079), (I-052)+(1.026)+(1.080), (I-052)+(1.026)+(1.081), (I-052)+(1.026)+(1.082), (I-052)+(1.026)+(1.083), (I-052)+(1.026)+(1.084), (I-052)+(1.026)+(1.085), (I-052)+(1.026)+(1.086), (I-052)+(1.026)+(1.087), (I-052)+(1.026)+(1.088), (I-052)+(1.026)+(1.089), (I-052)+(1.026)+(1.090), (I-052)+(1.026)+(1.091), (I-052)+(1.026)+(1.092), (I-052)+(1.026)+(2.001), (I-052)+(1.026)+(2.002), (I-052)+(1.026)+(2.003), (I-052)+(1.026)+(2.004), (I-052)+(1.026)+(2.005), (I-052)+(1.026)+(2.006), (I-052)+(1.026)+(2.007), (I-052)+(1.026)+(2.008), (I-052)+(1.026)+(2.009), (I-052)+(1.026)+(2.010), (I-052)+(1.026)+(2.011), (I-052)+(1.026)+(2.012), (I-052)+(1.026)+(2.013), (I-052)+(1.026)+(2.014), (I-052)+(1.026)+(2.015), (I-052)+(1.026)+(2.016), (I-052)+(1.026)+(2.017), (I-052)+(1.026)+(2.018), (I-052)+(1.026)+(2.019), (I-052)+(1.026)+(2.020), (I-052)+(1.026)+(2.021), (I-052)+(1.026)+(2.022), (I-052)+(1.026)+(2.023), (I-052)+(1.026)+(2.024), (I-052)+(1.026)+(2.025), (I-052)+(1.026)+(2.026), (I-052)+(1.026)+(2.027), (I-052)+(1.026)+(2.028), (I-052)+(1.026)+(2.029), (I-052)+(1.026)+(2.030), (I-052)+(1.026)+(2.031), (I-052)+(1.026)+(2.032), (I-052)+(1.026)+(2.033), (I-052)+(1.026)+(2.034), (I-052)+(1.026)+(2.035), (I-052)+(1.026)+(2.036), (I-052)+(1.026)+(2.037), (I-052)+(1.026)+(2.038), (I-052)+(1.026)+(2.039), (I-052)+(1.026)+(2.040), (I-052)+(1.026)+(2.041), (I-052)+(1.026)+(2.042), (I-052)+(1.026)+(2.043), (I-052)+(1.026)+(2.044), (I-052)+(1.026)+(2.045), (I-052)+(1.026)+(2.046), (I-052)+(1.026)+(2.047), (I-052)+(1.026)+(2.048), (I-052)+(1.026)+(2.049), (I-052)+(1.026)+(2.050), (I-052)+(1.026)+(2.051), (I-052)+(1.026)+(2.052), (I-052)+(1.026)+(2.053), (I-052)+(1.026)+(2.054), (I-052)+(1.026)+(2.055), (I-052)+(1.026)+(2.056), (I-052)+(1.026)+(2.057), (I-052)+(1.026)+(2.058), (I-052)+(1.026)+(2.059), (I-052)+(1.026)+(3.001), (I-052)+(1.026)+(3.002), (I-052)+(1.026)+(3.003), (I-052)+(1.026)+(3.004), (I-052)+(1.026)+(3.005), (I-052)+(1.026)+(3.006), (I-052)+(1.026)+(3.007), (I-052)+(1.026)+(3.008), (I-052)+(1.026)+(3.009), (I-052)+(1.026)+(3.010), (I-052)+(1.026)+(3.011), (I-052)+(1.026)+(3.012), (I-052)+(1.026)+(3.013), (I-052)+(1.026)+(3.014), (I-052)+(1.026)+(3.015), (I-052)+(1.026)+(3.016), (I-052)+(1.026)+(3.017), (I-052)+(1.026)+(3.018), (I-052)+(1.026)+(3.019), (I-052)+(1.026)+(3.020), (I-052)+(1.026)+(3.021), (I-052)+(1.026)+(3.022), (I-052)+(1.026)+(3.023), (I-052)+(1.026)+(3.024), (I-052)+(1.026)+(3.025), (I-052)+(1.026)+(3.026), (I-052)+(1.026)+(3.027), (I-052)+(1.026)+(3.028), (I-052)+(1.026)+(3.029), (I-052)+(1.026)+(3.030), (I-052)+(1.026)+(3.031), (I-052)+(1.026)+(5.001), (I-052)+(1.026)+(5.002), (I-052)+(1.026)+(5.003), (I-052)+(1.026)+(5.004), (I-052)+(1.026)+(5.005), (I-052)+(1.026)+(5.006), (I-052)+(1.026)+(5.007), (I-052)+(1.026)+(5.008), (I-052)+(1.026)+(5.009), (I-052)+(1.026)+(5.010), (I-052)+(1.026)+(5.011), (I-052)+(1.026)+(5.012), (I-052)+(1.026)+(5.013), (I-052)+(1.026)+(5.014), (I-052)+(1.026)+(5.015), (I-052)+(1.026)+(5.016), (I-052)+(1.026)+(5.017), (I-052)+(1.026)+(5.018), (I-052)+(1.026)+(5.019), (I-052)+(1.026)+(5.020), (I-052)+(1.026)+(5.021), (I-052)+(1.026)+(5.022), (I-052)+(1.026)+(5.023), (I-052)+(1.026)+(6.001), (I-052)+(1.026)+(6.002), (I-052)+(1.026)+(6.003), (I-052)+(1.026)+(6.004), (I-052)+(1.026)+(7.001), (I-052)+(1.026)+(7.002), (I-052)+(1.026)+(7.003), (I-052)+(1.026)+(7.004), (I-052)+(1.026)+(7.005), (I-052)+(1.026)+(7.006), (I-052)+(1.026)+(9.001), (I-052)+(1.026)+(9.002), (I-052)+(1.026)+(9.003), (I-052)+(1.026)+(9.004), (I-052)+(1.026)+(9.005), (I-052)+(1.026)+(9.006), (I-052)+(1.026)+(9.007), (I-052)+(1.026)+(9.008), (I-052)+(1.026)+(9.009), (I-052)+(1.026)+(14.001), (I-052)+(1.026)+(14.002), (I-052)+(1.026)+(15.008), (I-052)+(1.026)+(15.011), (I-052)+(1.026)+(15.012), (I-052)+(1.026)+(15.016), (I-052)+(1.026)+(15.025), (I-052)+(1.026)+(15.027), (I-052)+(1.026)+(15.047), (I-052)+(1.026)+(15.063), (I-052)+(1.026)+(15.064), (I-052)+(1.026)+(16.001), (I-052)+(1.026)+(16.002), (I-052)+(1.026)+(16.003), (I-052)+(1.026)+(16.004), (I-052)+(1.026)+(16.005), (I-052)+(1.026)+(16.006), (I-052)+(1.026)+(16.007), (I-052)+(1.026)+(16.008), (I-052)+(1.026)+(17.001), (I-052)+(1.026)+(17.002), (I-052)+(1.026)+(17.003), (I-052)+(1.026)+(17.004), (I-052)+(1.026)+(17.005), (I-052)+(1.026)+(17.006), (I-052)+(1.026)+(17.007), (I-052)+(1.026)+(17.008), (I-052)+(1.026)+(17.009), (I-052)+(1.026)+(17.010), (I-052)+(1.026)+(17.011), (I-052)+(1.026)+(17.012), (I-052)+(1.026)+(18.001), (I-052)+(1.027)+(1.028), (I-052)+(1.027)+(1.029), (I-052)+(1.027)+(1.030), (I-052)+(1.027)+(1.031), (I-052)+(1.027)+(1.032), (I-052)+(1.027)+(1.033), (I-052)+(1.027)+(1.034), (I-052)+(1.027)+(1.035), (I-052)+(1.027)+(1.036), (I-052)+(1.027)+(1.037), (I-052)+(1.027)+(1.038), (I-052)+(1.027)+(1.039), (I-052)+(1.027)+(1.040), (I-052)+(1.027)+(1.041), (I-052)+(1.027)+(1.042), (I-052)+(1.027)+(1.043), (I-052)+(1.027)+(1.044), (I-052)+(1.027)+(1.045), (I-052)+(1.027)+(1.046), (I-052)+(1.027)+(1.047), (I-052)+(1.027)+(1.048), (I-052)+(1.027)+(1.049), (I-052)+(1.027)+(1.050), (I-052)+(1.027)+(1.051), (I-052)+(1.027)+(1.052), (I-052)+(1.027)+(1.053), (I-052)+(1.027)+(1.054), (I-052)+(1.027)+(1.055), (I-052)+(1.027)+(1.056), (I-052)+(1.027)+(1.057), (I-052)+(1.027)+(1.058), (I-052)+(1.027)+(1.059), (I-052)+(1.027)+(1.060), (I-052)+(1.027)+(1.061), (I-052)+(1.027)+(1.062), (I-052)+(1.027)+(1.063), (I-052)+(1.027)+(1.064), (I-052)+(1.027)+(1.065), (I-052)+(1.027)+(1.066), (I-052)+(1.027)+(1.067), (I-052)+(1.027)+(1.068), (I-052)+(1.027)+(1.069), (I-052)+(1.027)+(1.070), (I-052)+(1.027)+(1.071), (I-052)+(1.027)+(1.072), (I-052)+(1.027)+(1.073), (I-052)+(1.027)+(1.074), (I-052)+(1.027)+(1.075), (I-052)+(1.027)+(1.076), (I-052)+(1.027)+(1.077), (I-052)+(1.027)+(1.078), (I-052)+(1.027)+(1.079), (I-052)+(1.027)+(1.080), (I-052)+(1.027)+(1.081), (I-052)+(1.027)+(1.082), (I-052)+(1.027)+(1.083), (I-052)+(1.027)+(1.084), (I-052)+(1.027)+(1.085), (I-052)+(1.027)+(1.086), (I-052)+(1.027)+(1.087), (I-052)+(1.027)+(1.088), (I-052)+(1.027)+(1.089), (I-052)+(1.027)+(1.090), (I-052)+(1.027)+(1.091), (I-052)+(1.027)+(1.092), (I-052)+(1.027)+(2.001), (I-052)+(1.027)+(2.002), (I-052)+(1.027)+(2.003), (I-052)+(1.027)+(2.004), (I-052)+(1.027)+(2.005), (I-052)+(1.027)+(2.006), (I-052)+(1.027)+(2.007), (I-052)+(1.027)+(2.008), (I-052)+(1.027)+(2.009), (I-052)+(1.027)+(2.010), (I-052)+(1.027)+(2.011), (I-052)+(1.027)+(2.012), (I-052)+(1.027)+(2.013), (I-052)+(1.027)+(2.014), (I-052)+(1.027)+(2.015), (I-052)+(1.027)+(2.016), (I-052)+(1.027)+(2.017), (I-052)+(1.027)+(2.018), (I-052)+(1.027)+(2.019), (I-052)+(1.027)+(2.020), (I-052)+(1.027)+(2.021), (I-052)+(1.027)+(2.022), (I-052)+(1.027)+(2.023), (I-052)+(1.027)+(2.024), (I-052)+(1.027)+(2.025), (I-052)+(1.027)+(2.026), (I-052)+(1.027)+(2.027), (I-052)+(1.027)+(2.028), (I-052)+(1.027)+(2.029), (I-052)+(1.027)+(2.030), (I-052)+(1.027)+(2.031), (I-052)+(1.027)+(2.032), (I-052)+(1.027)+(2.033), (I-052)+(1.027)+(2.034), (I-052)+(1.027)+(2.035), (I-052)+(1.027)+(2.036), (I-052)+(1.027)+(2.037), (I-052)+(1.027)+(2.038), (I-052)+(1.027)+(2.039), (I-052)+(1.027)+(2.040), (I-052)+(1.027)+(2.041), (I-052)+(1.027)+(2.042), (I-052)+(1.027)+(2.043), (I-052)+(1.027)+(2.044), (I-052)+(1.027)+(2.045), (I-052)+(1.027)+(2.046), (I-052)+(1.027)+(2.047), (I-052)+(1.027)+(2.048), (I-052)+(1.027)+(2.049), (I-052)+(1.027)+(2.050), (I-052)+(1.027)+(2.051), (I-052)+(1.027)+(2.052), (I-052)+(1.027)+(2.053), (I-052)+(1.027)+(2.054), (I-052)+(1.027)+(2.055), (I-052)+(1.027)+(2.056), (I-052)+(1.027)+(2.057), (I-052)+(1.027)+(2.058), (I-052)+(1.027)+(2.059), (I-052)+(1.027)+(3.001), (I-052)+(1.027)+(3.002), (I-052)+(1.027)+(3.003), (I-052)+(1.027)+(3.004), (I-052)+(1.027)+(3.005), (I-052)+(1.027)+(3.006), (I-052)+(1.027)+(3.007), (I-052)+(1.027)+(3.008), (I-052)+(1.027)+(3.009), (I-052)+(1.027)+(3.010), (I-052)+(1.027)+(3.011), (I-052)+(1.027)+(3.012), (I-052)+(1.027)+(3.013), (I-052)+(1.027)+(3.014), (I-052)+(1.027)+(3.015), (I-052)+(1.027)+(3.016), (I-052)+(1.027)+(3.017), (I-052)+(1.027)+(3.018), (I-052)+(1.027)+(3.019), (I-052)+(1.027)+(3.020), (I-052)+(1.027)+(3.021), (I-052)+(1.027)+(3.022), (I-052)+(1.027)+(3.023), (I-052)+(1.027)+(3.024), (I-052)+(1.027)+(3.025), (I-052)+(1.027)+(3.026), (I-052)+(1.027)+(3.027), (I-052)+(1.027)+(3.028), (I-052)+(1.027)+(3.029), (I-052)+(1.027)+(3.030), (I-052)+(1.027)+(3.031), (I-052)+(1.027)+(5.001), (I-052)+(1.027)+(5.002), (I-052)+(1.027)+(5.003), (I-052)+(1.027)+(5.004), (I-052)+(1.027)+(5.005), (I-052)+(1.027)+(5.006), (I-052)+(1.027)+(5.007), (I-052)+(1.027)+(5.008), (I-052)+(1.027)+(5.009), (I-052)+(1.027)+(5.010), (I-052)+(1.027)+(5.011), (I-052)+(1.027)+(5.012), (I-052)+(1.027)+(5.013), (I-052)+(1.027)+(5.014), (I-052)+(1.027)+(5.015), (I-052)+(1.027)+(5.016), (I-052)+(1.027)+(5.017), (I-052)+(1.027)+(5.018), (I-052)+(1.027)+(5.019), (I-052)+(1.027)+(5.020), (I-052)+(1.027)+(5.021), (I-052)+(1.027)+(5.022), (I-052)+(1.027)+(5.023), (I-052)+(1.027)+(6.001), (I-052)+(1.027)+(6.002), (I-052)+(1.027)+(6.003), (I-052)+(1.027)+(6.004), (I-052)+(1.027)+(7.001), (I-052)+(1.027)+(7.002), (I-052)+(1.027)+(7.003), (I-052)+(1.027)+(7.004),
(I-052)+(1.027)+(7.005), (I-052)+(1.027)+(7.006),
(I-052)+(1.027)+(9.001), (I-052)+(1.027)+(9.002),
(I-052)+(1.027)+(9.003), (I-052)+(1.027)+(9.004),
(I-052)+(1.027)+(9.005), (I-052)+(1.027)+(9.006),
(I-052)+(1.027)+(9.007), (I-052)+(1.027)+(9.008),
(I-052)+(1.027)+(9.009), (I-052)+(1.027)+(14.001),
(I-052)+(1.027)+(14.002), (I-052)+(1.027)+(15.008),
(I-052)+(1.027)+(15.011), (I-052)+(1.027)+(15.012),
(I-052)+(1.027)+(15.016), (I-052)+(1.027)+(15.025),
(I-052)+(1.027)+(15.027), (I-052)+(1.027)+(15.047),
(I-052)+(1.027)+(15.063), (I-052)+(1.027)+(15.064),
(I-052)+(1.027)+(16.001), (I-052)+(1.027)+(16.002),
(I-052)+(1.027)+(16.003), (I-052)+(1.027)+(16.004),
(I-052)+(1.027)+(16.005), (I-052)+(1.027)+(16.006),
(I-052)+(1.027)+(16.007), (I-052)+(1.027)+(16.008),
(I-052)+(1.027)+(17.001), (I-052)+(1.027)+(17.002),
(I-052)+(1.027)+(17.003), (I-052)+(1.027)+(17.004),
(I-052)+(1.027)+(17.005), (I-052)+(1.027)+(17.006),
(I-052)+(1.027)+(17.007), (I-052)+(1.027)+(17.008),
(I-052)+(1.027)+(17.009), (I-052)+(1.027)+(17.010),
(I-052)+(1.027)+(17.011), (I-052)+(1.027)+(17.012),
(I-052)+(1.027)+(18.001),
(I-052)+(1.028)+(1.029), (I-052)+(1.028)+(1.030),
(I-052)+(1.028)+(1.031), (I-052)+(1.028)+(1.032),
(I-052)+(1.028)+(1.033), (I-052)+(1.028)+(1.034),
(I-052)+(1.028)+(1.035), (I-052)+(1.028)+(1.036),
(I-052)+(1.028)+(1.037), (I-052)+(1.028)+(1.038),
(I-052)+(1.028)+(1.039), (I-052)+(1.028)+(1.040),
(I-052)+(1.028)+(1.041), (I-052)+(1.028)+(1.042),
(I-052)+(1.028)+(1.043), (I-052)+(1.028)+(1.044),
(I-052)+(1.028)+(1.045), (I-052)+(1.028)+(1.046),
(I-052)+(1.028)+(1.047), (I-052)+(1.028)+(1.048),
(I-052)+(1.028)+(1.049), (I-052)+(1.028)+(1.050),
(I-052)+(1.028)+(1.051), (I-052)+(1.028)+(1.052),
(I-052)+(1.028)+(1.053), (I-052)+(1.028)+(1.054),
(I-052)+(1.028)+(1.055), (I-052)+(1.028)+(1.056),
(I-052)+(1.028)+(1.057), (I-052)+(1.028)+(1.058),
(I-052)+(1.028)+(1.059), (I-052)+(1.028)+(1.060),
(I-052)+(1.028)+(1.061), (I-052)+(1.028)+(1.062),
(I-052)+(1.028)+(1.063), (I-052)+(1.028)+(1.064),
(I-052)+(1.028)+(1.065), (I-052)+(1.028)+(1.066),
(I-052)+(1.028)+(1.067), (I-052)+(1.028)+(1.068),
(I-052)+(1.028)+(1.069), (I-052)+(1.028)+(1.070),
(I-052)+(1.028)+(1.071), (I-052)+(1.028)+(1.072),
(I-052)+(1.028)+(1.073), (I-052)+(1.028)+(1.074),
(I-052)+(1.028)+(1.075), (I-052)+(1.028)+(1.076),
(I-052)+(1.028)+(1.077), (I-052)+(1.028)+(1.078),
(I-052)+(1.028)+(1.079), (I-052)+(1.028)+(1.080),
(I-052)+(1.028)+(1.081), (I-052)+(1.028)+(1.082),
(I-052)+(1.028)+(1.083), (I-052)+(1.028)+(1.084),
(I-052)+(1.028)+(1.085), (I-052)+(1.028)+(1.086),
(I-052)+(1.028)+(1.087), (I-052)+(1.028)+(1.088),
(I-052)+(1.028)+(1.089), (I-052)+(1.028)+(1.090),
(I-052)+(1.028)+(1.091), (I-052)+(1.028)+(1.092),
(I-052)+(1.028)+(2.001), (I-052)+(1.028)+(2.002),
(I-052)+(1.028)+(2.003), (I-052)+(1.028)+(2.004),
(I-052)+(1.028)+(2.005), (I-052)+(1.028)+(2.006),
(I-052)+(1.028)+(2.007), (I-052)+(1.028)+(2.008),
(I-052)+(1.028)+(2.009), (I-052)+(1.028)+(2.010),
(I-052)+(1.028)+(2.011), (I-052)+(1.028)+(2.012),
(I-052)+(1.028)+(2.013), (I-052)+(1.028)+(2.014),
(I-052)+(1.028)+(2.015), (I-052)+(1.028)+(2.016),
(I-052)+(1.028)+(2.017), (I-052)+(1.028)+(2.018),
(I-052)+(1.028)+(2.019), (I-052)+(1.028)+(2.020),
(I-052)+(1.028)+(2.021), (I-052)+(1.028)+(2.022),
(I-052)+(1.028)+(2.023), (I-052)+(1.028)+(2.024),
(I-052)+(1.028)+(2.025), (I-052)+(1.028)+(2.026),
(I-052)+(1.028)+(2.027), (I-052)+(1.028)+(2.028),
(I-052)+(1.028)+(2.029), (I-052)+(1.028)+(2.030),
(I-052)+(1.028)+(2.031), (I-052)+(1.028)+(2.032),
(I-052)+(1.028)+(2.033), (I-052)+(1.028)+(2.034),
(I-052)+(1.028)+(2.035), (I-052)+(1.028)+(2.036),
(I-052)+(1.028)+(2.037), (I-052)+(1.028)+(2.038),
(I-052)+(1.028)+(2.039), (I-052)+(1.028)+(2.040),
(I-052)+(1.028)+(2.041), (I-052)+(1.028)+(2.042),
(I-052)+(1.028)+(2.043), (I-052)+(1.028)+(2.044),
(I-052)+(1.028)+(2.045), (I-052)+(1.028)+(2.046),
(I-052)+(1.028)+(2.047), (I-052)+(1.028)+(2.048),
(I-052)+(1.028)+(2.049), (I-052)+(1.028)+(2.050),
(I-052)+(1.028)+(2.051), (I-052)+(1.028)+(2.052),
(I-052)+(1.028)+(2.053), (I-052)+(1.028)+(2.054),
(I-052)+(1.028)+(2.055), (I-052)+(1.028)+(2.056),
(I-052)+(1.028)+(2.057), (I-052)+(1.028)+(2.058),
(I-052)+(1.028)+(2.059), (I-052)+(1.028)+(3.001),
(I-052)+(1.028)+(3.002), (I-052)+(1.028)+(3.003),
(I-052)+(1.028)+(3.004), (I-052)+(1.028)+(3.005),
(I-052)+(1.028)+(3.006), (I-052)+(1.028)+(3.007),
(I-052)+(1.028)+(3.008), (I-052)+(1.028)+(3.009),
(I-052)+(1.028)+(3.010), (I-052)+(1.028)+(3.011),
(I-052)+(1.028)+(3.012), (I-052)+(1.028)+(3.013),
(I-052)+(1.028)+(3.014), (I-052)+(1.028)+(3.015),
(I-052)+(1.028)+(3.016), (I-052)+(1.028)+(3.017),
(I-052)+(1.028)+(3.018), (I-052)+(1.028)+(3.019),
(I-052)+(1.028)+(3.020), (I-052)+(1.028)+(3.021),
(I-052)+(1.028)+(3.022), (I-052)+(1.028)+(3.023),
(I-052)+(1.028)+(3.024), (I-052)+(1.028)+(3.025),
(I-052)+(1.028)+(3.026), (I-052)+(1.028)+(3.027),
(I-052)+(1.028)+(3.028), (I-052)+(1.028)+(3.029),
(I-052)+(1.028)+(3.030), (I-052)+(1.028)+(3.031),
(I-052)+(1.028)+(5.001), (I-052)+(1.028)+(5.002),
(I-052)+(1.028)+(5.003), (I-052)+(1.028)+(5.004),
(I-052)+(1.028)+(5.005), (I-052)+(1.028)+(5.006),
(I-052)+(1.028)+(5.007), (I-052)+(1.028)+(5.008),
(I-052)+(1.028)+(5.009), (I-052)+(1.028)+(5.010),
(I-052)+(1.028)+(5.011), (I-052)+(1.028)+(5.012),
(I-052)+(1.028)+(5.013), (I-052)+(1.028)+(5.014),
(I-052)+(1.028)+(5.015), (I-052)+(1.028)+(5.016),
(I-052)+(1.028)+(5.017), (I-052)+(1.028)+(5.018),
(I-052)+(1.028)+(5.019), (I-052)+(1.028)+(5.020),
(I-052)+(1.028)+(5.021), (I-052)+(1.028)+(5.022),
(I-052)+(1.028)+(5.023), (I-052)+(1.028)+(6.001),
(I-052)+(1.028)+(6.002), (I-052)+(1.028)+(6.003),
(I-052)+(1.028)+(6.004), (I-052)+(1.028)+(7.001),
(I-052)+(1.028)+(7.002), (I-052)+(1.028)+(7.003),
(I-052)+(1.028)+(7.004), (I-052)+(1.028)+(7.005),
(I-052)+(1.028)+(7.006), (I-052)+(1.028)+(9.001),
(I-052)+(1.028)+(9.002), (I-052)+(1.028)+(9.003),
(I-052)+(1.028)+(9.004), (I-052)+(1.028)+(9.005),
(I-052)+(1.028)+(9.006), (I-052)+(1.028)+(9.007),
(I-052)+(1.028)+(9.008), (I-052)+(1.028)+(9.009),
(I-052)+(1.028)+(14.001), (I-052)+(1.028)+(14.002),
(I-052)+(1.028)+(15.008), (I-052)+(1.028)+(15.011),
(I-052)+(1.028)+(15.012), (I-052)+(1.028)+(15.016),
(I-052)+(1.028)+(15.025), (I-052)+(1.028)+(15.027),
(I-052)+(1.028)+(15.047), (I-052)+(1.028)+(15.063),
(I-052)+(1.028)+(15.064), (I-052)+(1.028)+(16.001),
(I-052)+(1.028)+(16.002), (I-052)+(1.028)+(16.003),
(I-052)+(1.028)+(16.004), (I-052)+(1.028)+(16.005),
(I-052)+(1.028)+(16.006), (I-052)+(1.028)+(16.007),
(I-052)+(1.028)+(16.008), (I-052)+(1.028)+(17.001),
(I-052)+(1.028)+(17.002), (I-052)+(1.028)+(17.003),
(I-052)+(1.028)+(17.004), (I-052)+(1.028)+(17.005),
(I-052)+(1.028)+(17.006), (I-052)+(1.028)+(17.007), (I-052)+(1.028)+(17.008), (I-052)+(1.028)+(17.009), (I-052)+(1.028)+(17.010), (I-052)+(1.028)+(17.011), (I-052)+(1.028)+(17.012), (I-052)+(1.028)+(18.001),
(I-052)+(1.029)+(1.030), (I-052)+(1.029)+(1.031), (I-052)+(1.029)+(1.032), (I-052)+(1.029)+(1.033), (I-052)+(1.029)+(1.034), (I-052)+(1.029)+(1.035), (I-052)+(1.029)+(1.036), (I-052)+(1.029)+(1.037), (I-052)+(1.029)+(1.038), (I-052)+(1.029)+(1.039), (I-052)+(1.029)+(1.040), (I-052)+(1.029)+(1.041), (I-052)+(1.029)+(1.042), (I-052)+(1.029)+(1.043), (I-052)+(1.029)+(1.044), (I-052)+(1.029)+(1.045), (I-052)+(1.029)+(1.046), (I-052)+(1.029)+(1.047), (I-052)+(1.029)+(1.048), (I-052)+(1.029)+(1.049), (I-052)+(1.029)+(1.050), (I-052)+(1.029)+(1.051), (I-052)+(1.029)+(1.052), (I-052)+(1.029)+(1.053), (I-052)+(1.029)+(1.054), (I-052)+(1.029)+(1.055), (I-052)+(1.029)+(1.056), (I-052)+(1.029)+(1.057), (I-052)+(1.029)+(1.058), (I-052)+(1.029)+(1.059), (I-052)+(1.029)+(1.060), (I-052)+(1.029)+(1.061), (I-052)+(1.029)+(1.062), (I-052)+(1.029)+(1.063), (I-052)+(1.029)+(1.064), (I-052)+(1.029)+(1.065), (I-052)+(1.029)+(1.066), (I-052)+(1.029)+(1.067), (I-052)+(1.029)+(1.068), (I-052)+(1.029)+(1.069), (I-052)+(1.029)+(1.070), (I-052)+(1.029)+(1.071), (I-052)+(1.029)+(1.072), (I-052)+(1.029)+(1.073), (I-052)+(1.029)+(1.074), (I-052)+(1.029)+(1.075), (I-052)+(1.029)+(1.076), (I-052)+(1.029)+(1.077), (I-052)+(1.029)+(1.078), (I-052)+(1.029)+(1.079), (I-052)+(1.029)+(1.080), (I-052)+(1.029)+(1.081), (I-052)+(1.029)+(1.082), (I-052)+(1.029)+(1.083), (I-052)+(1.029)+(1.084), (I-052)+(1.029)+(1.085), (I-052)+(1.029)+(1.086), (I-052)+(1.029)+(1.087), (I-052)+(1.029)+(1.088), (I-052)+(1.029)+(1.089), (I-052)+(1.029)+(1.090), (I-052)+(1.029)+(1.091), (I-052)+(1.029)+(1.092), (I-052)+(1.029)+(2.001), (I-052)+(1.029)+(2.002), (I-052)+(1.029)+(2.003), (I-052)+(1.029)+(2.004), (I-052)+(1.029)+(2.005), (I-052)+(1.029)+(2.006), (I-052)+(1.029)+(2.007), (I-052)+(1.029)+(2.008), (I-052)+(1.029)+(2.009), (I-052)+(1.029)+(2.010), (I-052)+(1.029)+(2.011), (I-052)+(1.029)+(2.012), (I-052)+(1.029)+(2.013), (I-052)+(1.029)+(2.014), (I-052)+(1.029)+(2.015), (I-052)+(1.029)+(2.016), (I-052)+(1.029)+(2.017), (I-052)+(1.029)+(2.018), (I-052)+(1.029)+(2.019), (I-052)+(1.029)+(2.020), (I-052)+(1.029)+(2.021), (I-052)+(1.029)+(2.022), (I-052)+(1.029)+(2.023), (I-052)+(1.029)+(2.024), (I-052)+(1.029)+(2.025), (I-052)+(1.029)+(2.026), (I-052)+(1.029)+(2.027), (I-052)+(1.029)+(2.028), (I-052)+(1.029)+(2.029), (I-052)+(1.029)+(2.030), (I-052)+(1.029)+(2.031), (I-052)+(1.029)+(2.032), (I-052)+(1.029)+(2.033), (I-052)+(1.029)+(2.034), (I-052)+(1.029)+(2.035), (I-052)+(1.029)+(2.036), (I-052)+(1.029)+(2.037), (I-052)+(1.029)+(2.038), (I-052)+(1.029)+(2.039), (I-052)+(1.029)+(2.040), (I-052)+(1.029)+(2.041), (I-052)+(1.029)+(2.042), (I-052)+(1.029)+(2.043), (I-052)+(1.029)+(2.044), (I-052)+(1.029)+(2.045), (I-052)+(1.029)+(2.046), (I-052)+(1.029)+(2.047), (I-052)+(1.029)+(2.048), (I-052)+(1.029)+(2.049), (I-052)+(1.029)+(2.050), (I-052)+(1.029)+(2.051), (I-052)+(1.029)+(2.052), (I-052)+(1.029)+(2.053), (I-052)+(1.029)+(2.054), (I-052)+(1.029)+(2.055), (I-052)+(1.029)+(2.056), (I-052)+(1.029)+(2.057), (I-052)+(1.029)+(2.058), (I-052)+(1.029)+(2.059), (I-052)+(1.029)+(3.001), (I-052)+(1.029)+(3.002), (I-052)+(1.029)+(3.003), (I-052)+(1.029)+(3.004), (I-052)+(1.029)+(3.005), (I-052)+(1.029)+(3.006), (I-052)+(1.029)+(3.007), (I-052)+(1.029)+(3.008), (I-052)+(1.029)+(3.009), (I-052)+(1.029)+(3.010), (I-052)+(1.029)+(3.011), (I-052)+(1.029)+(3.012), (I-052)+(1.029)+(3.013), (I-052)+(1.029)+(3.014), (I-052)+(1.029)+(3.015), (I-052)+(1.029)+(3.016), (I-052)+(1.029)+(3.017), (I-052)+(1.029)+(3.018), (I-052)+(1.029)+(3.019), (I-052)+(1.029)+(3.020), (I-052)+(1.029)+(3.021), (I-052)+(1.029)+(3.022), (I-052)+(1.029)+(3.023), (I-052)+(1.029)+(3.024), (I-052)+(1.029)+(3.025), (I-052)+(1.029)+(3.026), (I-052)+(1.029)+(3.027), (I-052)+(1.029)+(3.028), (I-052)+(1.029)+(3.029), (I-052)+(1.029)+(3.030), (I-052)+(1.029)+(3.031), (I-052)+(1.029)+(5.001), (I-052)+(1.029)+(5.002), (I-052)+(1.029)+(5.003), (I-052)+(1.029)+(5.004), (I-052)+(1.029)+(5.005), (I-052)+(1.029)+(5.006), (I-052)+(1.029)+(5.007), (I-052)+(1.029)+(5.008), (I-052)+(1.029)+(5.009), (I-052)+(1.029)+(5.010), (I-052)+(1.029)+(5.011), (I-052)+(1.029)+(5.012), (I-052)+(1.029)+(5.013), (I-052)+(1.029)+(5.014), (I-052)+(1.029)+(5.015), (I-052)+(1.029)+(5.016), (I-052)+(1.029)+(5.017), (I-052)+(1.029)+(5.018), (I-052)+(1.029)+(5.019), (I-052)+(1.029)+(5.020), (I-052)+(1.029)+(5.021), (I-052)+(1.029)+(5.022), (I-052)+(1.029)+(5.023), (I-052)+(1.029)+(6.001), (I-052)+(1.029)+(6.002), (I-052)+(1.029)+(6.003), (I-052)+(1.029)+(6.004), (I-052)+(1.029)+(7.001), (I-052)+(1.029)+(7.002), (I-052)+(1.029)+(7.003), (I-052)+(1.029)+(7.004), (I-052)+(1.029)+(7.005), (I-052)+(1.029)+(7.006), (I-052)+(1.029)+(9.001), (I-052)+(1.029)+(9.002), (I-052)+(1.029)+(9.003), (I-052)+(1.029)+(9.004), (I-052)+(1.029)+(9.005), (I-052)+(1.029)+(9.006), (I-052)+(1.029)+(9.007), (I-052)+(1.029)+(9.008), (I-052)+(1.029)+(9.009), (I-052)+(1.029)+(14.001), (I-052)+(1.029)+(14.002), (I-052)+(1.029)+(15.008), (I-052)+(1.029)+(15.011), (I-052)+(1.029)+(15.012), (I-052)+(1.029)+(15.016), (I-052)+(1.029)+(15.025), (I-052)+(1.029)+(15.027), (I-052)+(1.029)+(15.047), (I-052)+(1.029)+(15.063), (I-052)+(1.029)+(15.064), (I-052)+(1.029)+(16.001), (I-052)+(1.029)+(16.002), (I-052)+(1.029)+(16.003), (I-052)+(1.029)+(16.004), (I-052)+(1.029)+(16.005), (I-052)+(1.029)+(16.006), (I-052)+(1.029)+(16.007), (I-052)+(1.029)+(16.008), (I-052)+(1.029)+(17.001), (I-052)+(1.029)+(17.002), (I-052)+(1.029)+(17.003), (I-052)+(1.029)+(17.004), (I-052)+(1.029)+(17.005), (I-052)+(1.029)+(17.006), (I-052)+(1.029)+(17.007), (I-052)+(1.029)+(17.008), (I-052)+(1.029)+(17.009), (I-052)+(1.029)+(17.010), (I-052)+(1.029)+(17.011), (I-052)+(1.029)+(17.012), (I-052)+(1.029)+(18.001),
(I-052)+(1.030)+(1.031), (I-052)+(1.030)+(1.032), (I-052)+(1.030)+(1.033), (I-052)+(1.030)+(1.034), (I-052)+(1.030)+(1.035), (I-052)+(1.030)+(1.036), (I-052)+(1.030)+(1.037), (I-052)+(1.030)+(1.038), (I-052)+(1.030)+(1.039), (I-052)+(1.030)+(1.040), (I-052)+(1.030)+(1.041), (I-052)+(1.030)+(1.042), (I-052)+(1.030)+(1.043), (I-052)+(1.030)+(1.044), (I-052)+(1.030)+(1.045), (I-052)+(1.030)+(1.046), (I-052)+(1.030)+(1.047), (I-052)+(1.030)+(1.048), (I-052)+(1.030)+(1.049), (I-052)+(1.030)+(1.050), (I-052)+(1.030)+(1.051), (I-052)+(1.030)+(1.052), (I-052)+(1.030)+(1.053), (I-052)+(1.030)+(1.054), (I-052)+(1.030)+(1.055), (I-052)+(1.030)+(1.056), (I-052)+(1.030)+(1.057), (I-052)+(1.030)+(1.058), (I-052)+(1.030)+(1.059), (I-052)+(1.030)+(1.060), (I-052)+(1.030)+(1.061), (I-052)+(1.030)+(1.062), (I-052)+(1.030)+(1.063), (I-052)+(1.030)+(1.064), (I-052)+(1.030)+(1.065), (I-052)+(1.030)+(1.066), (I-052)+(1.030)+(1.067), (I-052)+(1.030)+(1.068), (I-052)+(1.030)+(1.069), (I-052)+(1.030)+(1.070), (I-052)+(1.030)+(1.071), (I-052)+(1.030)+(1.072), (I-052)+(1.030)+(1.073), (I-052)+(1.030)+(1.074), (I-052)+(1.030)+(1.075), (I-052)+(1.030)+(1.076), (I-052)+(1.030)+(1.077), (I-052)+(1.030)+(1.078), (I-052)+(1.030)+(1.079), (I-052)+(1.030)+(1.080), (I-052)+(1.030)+(1.081), (I-052)+(1.030)+(1.082), (I-052)+(1.030)+(1.083), (I-052)+(1.030)+(1.084), (I-052)+(1.030)+(1.085), (I-052)+(1.030)+(1.086), (I-052)+(1.030)+(1.087), (I-052)+(1.030)+(1.088), (I-052)+(1.030)+(1.089), (I-052)+(1.030)+(1.090), (I-052)+(1.030)+(1.091), (I-052)+(1.030)+(1.092), (I-052)+(1.030)+(2.001), (I-052)+(1.030)+(2.002), (I-052)+(1.030)+(2.003), (I-052)+(1.030)+(2.004), (I-052)+(1.030)+(2.005), (I-052)+(1.030)+(2.006), (I-052)+(1.030)+(2.007), (I-052)+(1.030)+(2.008), (I-052)+(1.030)+(2.009), (I-052)+(1.030)+(2.010), (I-052)+(1.030)+(2.011), (I-052)+(1.030)+(2.012), (I-052)+(1.030)+(2.013), (I-052)+(1.030)+(2.014), (I-052)+(1.030)+(2.015), (I-052)+(1.030)+(2.016), (I-052)+(1.030)+(2.017), (I-052)+(1.030)+(2.018), (I-052)+(1.030)+(2.019), (I-052)+(1.030)+(2.020), (I-052)+(1.030)+(2.021), (I-052)+(1.030)+(2.022), (I-052)+(1.030)+(2.023), (I-052)+(1.030)+(2.024), (I-052)+(1.030)+(2.025), (I-052)+(1.030)+(2.026), (I-052)+(1.030)+(2.027), (I-052)+(1.030)+(2.028), (I-052)+(1.030)+(2.029), (I-052)+(1.030)+(2.030), (I-052)+(1.030)+(2.031), (I-052)+(1.030)+(2.032), (I-052)+(1.030)+(2.033), (I-052)+(1.030)+(2.034), (I-052)+(1.030)+(2.035), (I-052)+(1.030)+(2.036), (I-052)+(1.030)+(2.037), (I-052)+(1.030)+(2.038), (I-052)+(1.030)+(2.039), (I-052)+(1.030)+(2.040), (I-052)+(1.030)+(2.041), (I-052)+(1.030)+(2.042), (I-052)+(1.030)+(2.043), (I-052)+(1.030)+(2.044), (I-052)+(1.030)+(2.045), (I-052)+(1.030)+(2.046), (I-052)+(1.030)+(2.047), (I-052)+(1.030)+(2.048), (I-052)+(1.030)+(2.049), (I-052)+(1.030)+(2.050), (I-052)+(1.030)+(2.051), (I-052)+(1.030)+(2.052), (I-052)+(1.030)+(2.053), (I-052)+(1.030)+(2.054), (I-052)+(1.030)+(2.055), (I-052)+(1.030)+(2.056), (I-052)+(1.030)+(2.057), (I-052)+(1.030)+(2.058), (I-052)+(1.030)+(2.059), (I-052)+(1.030)+(3.001), (I-052)+(1.030)+(3.002), (I-052)+(1.030)+(3.003), (I-052)+(1.030)+(3.004), (I-052)+(1.030)+(3.005), (I-052)+(1.030)+(3.006), (I-052)+(1.030)+(3.007), (I-052)+(1.030)+(3.008), (I-052)+(1.030)+(3.009), (I-052)+(1.030)+(3.010), (I-052)+(1.030)+(3.011), (I-052)+(1.030)+(3.012), (I-052)+(1.030)+(3.013), (I-052)+(1.030)+(3.014), (I-052)+(1.030)+(3.015), (I-052)+(1.030)+(3.016), (I-052)+(1.030)+(3.017), (I-052)+(1.030)+(3.018), (I-052)+(1.030)+(3.019), (I-052)+(1.030)+(3.020), (I-052)+(1.030)+(3.021), (I-052)+(1.030)+(3.022), (I-052)+(1.030)+(3.023), (I-052)+(1.030)+(3.024), (I-052)+(1.030)+(3.025), (I-052)+(1.030)+(3.026), (I-052)+(1.030)+(3.027), (I-052)+(1.030)+(3.028), (I-052)+(1.030)+(3.029), (I-052)+(1.030)+(3.030), (I-052)+(1.030)+(3.031), (I-052)+(1.030)+(5.001), (I-052)+(1.030)+(5.002), (I-052)+(1.030)+(5.003), (I-052)+(1.030)+(5.004), (I-052)+(1.030)+(5.005), (I-052)+(1.030)+(5.006), (I-052)+(1.030)+(5.007), (I-052)+(1.030)+(5.008), (I-052)+(1.030)+(5.009), (I-052)+(1.030)+(5.010), (I-052)+(1.030)+(5.011), (I-052)+(1.030)+(5.012), (I-052)+(1.030)+(5.013), (I-052)+(1.030)+(5.014), (I-052)+(1.030)+(5.015), (I-052)+(1.030)+(5.016), (I-052)+(1.030)+(5.017), (I-052)+(1.030)+(5.018), (I-052)+(1.030)+(5.019), (I-052)+(1.030)+(5.020), (I-052)+(1.030)+(5.021), (I-052)+(1.030)+(5.022), (I-052)+(1.030)+(5.023), (I-052)+(1.030)+(6.001), (I-052)+(1.030)+(6.002), (I-052)+(1.030)+(6.003), (I-052)+(1.030)+(6.004), (I-052)+(1.030)+(7.001), (I-052)+(1.030)+(7.002), (I-052)+(1.030)+(7.003), (I-052)+(1.030)+(7.004), (I-052)+(1.030)+(7.005), (I-052)+(1.030)+(7.006), (I-052)+(1.030)+(9.001), (I-052)+(1.030)+(9.002), (I-052)+(1.030)+(9.003), (I-052)+(1.030)+(9.004), (I-052)+(1.030)+(9.005), (I-052)+(1.030)+(9.006), (I-052)+(1.030)+(9.007), (I-052)+(1.030)+(9.008), (I-052)+(1.030)+(9.009), (I-052)+(1.030)+(14.001), (I-052)+(1.030)+(14.002), (I-052)+(1.030)+(15.008), (I-052)+(1.030)+(15.011), (I-052)+(1.030)+(15.012), (I-052)+(1.030)+(15.016), (I-052)+(1.030)+(15.025), (I-052)+(1.030)+(15.027), (I-052)+(1.030)+(15.047), (I-052)+(1.030)+(15.063), (I-052)+(1.030)+(15.064), (I-052)+(1.030)+(16.001), (I-052)+(1.030)+(16.002), (I-052)+(1.030)+(16.003), (I-052)+(1.030)+(16.004), (I-052)+(1.030)+(16.005), (I-052)+(1.030)+(16.006), (I-052)+(1.030)+(16.007), (I-052)+(1.030)+(16.008), (I-052)+(1.030)+(17.001), (I-052)+(1.030)+(17.002), (I-052)+(1.030)+(17.003), (I-052)+(1.030)+(17.004), (I-052)+(1.030)+(17.005), (I-052)+(1.030)+(17.006), (I-052)+(1.030)+(17.007), (I-052)+(1.030)+(17.008), (I-052)+(1.030)+(17.009), (I-052)+(1.030)+(17.010), (I-052)+(1.030)+(17.011), (I-052)+(1.030)+(17.012), (I-052)+(1.030)+(18.001), (I-052)+(1.031)+(1.032), (I-052)+(1.031)+(1.033), (I-052)+(1.031)+(1.034), (I-052)+(1.031)+(1.035), (I-052)+(1.031)+(1.036), (I-052)+(1.031)+(1.037), (I-052)+(1.031)+(1.038), (I-052)+(1.031)+(1.039), (I-052)+(1.031)+(1.040), (I-052)+(1.031)+(1.041), (I-052)+(1.031)+(1.042), (I-052)+(1.031)+(1.043), (I-052)+(1.031)+(1.044), (I-052)+(1.031)+(1.045), (I-052)+(1.031)+(1.046), (I-052)+(1.031)+(1.047), (I-052)+(1.031)+(1.048), (I-052)+(1.031)+(1.049), (I-052)+(1.031)+(1.050), (I-052)+(1.031)+(1.051), (I-052)+(1.031)+(1.052), (I-052)+(1.031)+(1.053), (I-052)+(1.031)+(1.054), (I-052)+(1.031)+(1.055), (I-052)+(1.031)+(1.056), (I-052)+(1.031)+(1.057), (I-052)+(1.031)+(1.058), (I-052)+(1.031)+(1.059), (I-052)+(1.031)+(1.060), (I-052)+(1.031)+(1.061), (I-052)+(1.031)+(1.062), (I-052)+(1.031)+(1.063), (I-052)+(1.031)+(1.064), (I-052)+(1.031)+(1.065), (I-052)+(1.031)+(1.066), (I-052)+(1.031)+(1.067), (I-052)+(1.031)+(1.068), (I-052)+(1.031)+(1.069), (I-052)+(1.031)+(1.070), (I-052)+(1.031)+(1.071), (I-052)+(1.031)+(1.072), (I-052)+(1.031)+(1.073), (I-052)+(1.031)+(1.074), (I-052)+(1.031)+(1.075), (I-052)+(1.031)+(1.076), (I-052)+(1.031)+(1.077), (I-052)+(1.031)+(1.078), (I-052)+(1.031)+(1.079), (I-052)+(1.031)+(1.080), (I-052)+(1.031)+(1.081), (I-052)+(1.031)+(1.082), (I-052)+(1.031)+(1.083), (I-052)+(1.031)+(1.084), (I-052)+(1.031)+(1.085), (I-052)+(1.031)+(1.086), (I-052)+(1.031)+(1.087), (I-052)+(1.031)+(1.088), (I-052)+(1.031)+(1.089), (I-052)+(1.031)+(1.090), (I-052)+(1.031)+(1.091), (I-052)+(1.031)+(1.092), (I-052)+(1.031)+(2.001), (I-052)+(1.031)+(2.002), (I-052)+(1.031)+(2.003), (I-052)+(1.031)+(2.004), (I-052)+(1.031)+(2.005), (I-052)+(1.031)+(2.006), (I-052)+(1.031)+(2.007), (I-052)+(1.031)+(2.008), (I-052)+(1.031)+(2.009), (I-052)+(1.031)+(2.010), (I-052)+(1.031)+(2.011), (I-052)+(1.031)+(2.012), (I-052)+(1.031)+(2.013), (I-052)+(1.031)+(2.014), (I-052)+(1.031)+(2.015), (I-052)+(1.031)+(2.016), (I-052)+(1.031)+(2.017), (I-052)+(1.031)+(2.018), (I-052)+(1.031)+(2.019), (I-052)+(1.031)+(2.020), (I-052)+(1.031)+(2.021), (I-052)+(1.031)+(2.022), (I-052)+(1.031)+(2.023), (I-052)+(1.031)+(2.024), (I-052)+(1.031)+(2.025), (I-052)+(1.031)+(2.026), (I-052)+(1.031)+(2.027), (I-052)+(1.031)+(2.028), (I-052)+(1.031)+(2.029), (I-052)+(1.031)+(2.030), (I-052)+(1.031)+(2.031), (I-052)+(1.031)+(2.032), (I-052)+(1.031)+(2.033), (I-052)+(1.031)+(2.034), (I-052)+(1.031)+(2.035), (I-052)+(1.031)+(2.036), (I-052)+(1.031)+(2.037), (I-052)+(1.031)+(2.038), (I-052)+(1.031)+(2.039), (I-052)+(1.031)+(2.040), (I-052)+(1.031)+(2.041), (I-052)+(1.031)+(2.042), (I-052)+(1.031)+(2.043), (I-052)+(1.031)+(2.044), (I-052)+(1.031)+(2.045), (I-052)+(1.031)+(2.046), (I-052)+(1.031)+(2.047), (I-052)+(1.031)+(2.048), (I-052)+(1.031)+(2.049), (I-052)+(1.031)+(2.050), (I-052)+(1.031)+(2.051), (I-052)+(1.031)+(2.052), (I-052)+(1.031)+(2.053), (I-052)+(1.031)+(2.054), (I-052)+(1.031)+(2.055), (I-052)+(1.031)+(2.056), (I-052)+(1.031)+(2.057), (I-052)+(1.031)+(2.058), (I-052)+(1.031)+(2.059), (I-052)+(1.031)+(3.001), (I-052)+(1.031)+(3.002), (I-052)+(1.031)+(3.003), (I-052)+(1.031)+(3.004), (I-052)+(1.031)+(3.005), (I-052)+(1.031)+(3.006), (I-052)+(1.031)+(3.007), (I-052)+(1.031)+(3.008), (I-052)+(1.031)+(3.009), (I-052)+(1.031)+(3.010), (I-052)+(1.031)+(3.011), (I-052)+(1.031)+(3.012), (I-052)+(1.031)+(3.013), (I-052)+(1.031)+(3.014), (I-052)+(1.031)+(3.015), (I-052)+(1.031)+(3.016), (I-052)+(1.031)+(3.017), (I-052)+(1.031)+(3.018), (I-052)+(1.031)+(3.019), (I-052)+(1.031)+(3.020), (I-052)+(1.031)+(3.021), (I-052)+(1.031)+(3.022), (I-052)+(1.031)+(3.023), (I-052)+(1.031)+(3.024), (I-052)+(1.031)+(3.025), (I-052)+(1.031)+(3.026), (I-052)+(1.031)+(3.027), (I-052)+(1.031)+(3.028), (I-052)+(1.031)+(3.029), (I-052)+(1.031)+(3.030), (I-052)+(1.031)+(3.031), (I-052)+(1.031)+(5.001), (I-052)+(1.031)+(5.002), (I-052)+(1.031)+(5.003), (I-052)+(1.031)+(5.004), (I-052)+(1.031)+(5.005), (I-052)+(1.031)+(5.006), (I-052)+(1.031)+(5.007), (I-052)+(1.031)+(5.008), (I-052)+(1.031)+(5.009), (I-052)+(1.031)+(5.010), (I-052)+(1.031)+(5.011), (I-052)+(1.031)+(5.012), (I-052)+(1.031)+(5.013), (I-052)+(1.031)+(5.014), (I-052)+(1.031)+(5.015), (I-052)+(1.031)+(5.016), (I-052)+(1.031)+(5.017), (I-052)+(1.031)+(5.018), (I-052)+(1.031)+(5.019), (I-052)+(1.031)+(5.020), (I-052)+(1.031)+(5.021), (I-052)+(1.031)+(5.022), (I-052)+(1.031)+(5.023), (I-052)+(1.031)+(6.001), (I-052)+(1.031)+(6.002), (I-052)+(1.031)+(6.003), (I-052)+(1.031)+(6.004), (I-052)+(1.031)+(7.001), (I-052)+(1.031)+(7.002), (I-052)+(1.031)+(7.003), (I-052)+(1.031)+(7.004), (I-052)+(1.031)+(7.005), (I-052)+(1.031)+(7.006), (I-052)+(1.031)+(9.001), (I-052)+(1.031)+(9.002), (I-052)+(1.031)+(9.003), (I-052)+(1.031)+(9.004), (I-052)+(1.031)+(9.005), (I-052)+(1.031)+(9.006), (I-052)+(1.031)+(9.007), (I-052)+(1.031)+(9.008), (I-052)+(1.031)+(9.009), (I-052)+(1.031)+(14.001), (I-052)+(1.031)+(14.002), (I-052)+(1.031)+(15.008), (I-052)+(1.031)+(15.011), (I-052)+(1.031)+(15.012), (I-052)+(1.031)+(15.016), (I-052)+(1.031)+(15.025), (I-052)+(1.031)+(15.027), (I-052)+(1.031)+(15.047), (I-052)+(1.031)+(15.063), (I-052)+(1.031)+(15.064), (I-052)+(1.031)+(16.001), (I-052)+(1.031)+(16.002), (I-052)+(1.031)+(16.003), (I-052)+(1.031)+(16.004), (I-052)+(1.031)+(16.005), (I-052)+(1.031)+(16.006), (I-052)+(1.031)+(16.007), (I-052)+(1.031)+(16.008), (I-052)+(1.031)+(17.001), (I-052)+(1.031)+(17.002), (I-052)+(1.031)+(17.003), (I-052)+(1.031)+(17.004), (I-052)+(1.031)+(17.005), (I-052)+(1.031)+(17.006), (I-052)+(1.031)+(17.007), (I-052)+(1.031)+(17.008), (I-052)+(1.031)+(17.009), (I-052)+(1.031)+(17.010), (I-052)+(1.031)+(17.011), (I-052)+(1.031)+(17.012), (I-052)+(1.031)+(18.001), (I-052)+(1.032)+(1.033), (I-052)+(1.032)+(1.034), (I-052)+(1.032)+(1.035), (I-052)+(1.032)+(1.036), (I-052)+(1.032)+(1.037), (I-052)+(1.032)+(1.038), (I-052)+(1.032)+(1.039), (I-052)+(1.032)+(1.040), (I-052)+(1.032)+(1.041), (I-052)+(1.032)+(1.042), (I-052)+(1.032)+(1.043), (I-052)+(1.032)+(1.044), (I-052)+(1.032)+(1.045), (I-052)+(1.032)+(1.046), (I-052)+(1.032)+(1.047), (I-052)+(1.032)+(1.048), (I-052)+(1.032)+(1.049), (I-052)+(1.032)+(1.050), (I-052)+(1.032)+(1.051), (I-052)+(1.032)+(1.052), (I-052)+(1.032)+(1.053), (I-052)+(1.032)+(1.054), (I-052)+(1.032)+(1.055), (I-052)+(1.032)+(1.056), (I-052)+(1.032)+(1.057), (I-052)+(1.032)+(1.058), (I-052)+(1.032)+(1.059), (I-052)+(1.032)+(1.060), (I-052)+(1.032)+(1.061), (I-052)+(1.032)+(1.062), (I-052)+(1.032)+(1.063), (I-052)+(1.032)+(1.064), (I-052)+(1.032)+(1.065), (I-052)+(1.032)+(1.066), (I-052)+(1.032)+(1.067), (I-052)+(1.032)+(1.068), (I-052)+(1.032)+(1.069), (I-052)+(1.032)+(1.070), (I-052)+(1.032)+(1.071), (I-052)+(1.032)+(1.072), (I-052)+(1.032)+(1.073), (I-052)+(1.032)+(1.074), (I-052)+(1.032)+(1.075), (I-052)+(1.032)+(1.076), (I-052)+(1.032)+(1.077), (I-052)+(1.032)+(1.078), (I-052)+(1.032)+(1.079), (I-052)+(1.032)+(1.080), (I-052)+(1.032)+(1.081), (I-052)+(1.032)+(1.082), (I-052)+(1.032)+(1.083), (I-052)+(1.032)+(1.084), (I-052)+(1.032)+(1.085), (I-052)+(1.032)+(1.086), (I-052)+(1.032)+(1.087), (I-052)+(1.032)+(1.088), (I-052)+(1.032)+(1.089), (I-052)+(1.032)+(1.090), (I-052)+(1.032)+(1.091), (I-052)+(1.032)+(1.092), (I-052)+(1.032)+(2.001), (I-052)+(1.032)+(2.002), (I-052)+(1.032)+(2.003), (I-052)+(1.032)+(2.004), (I-052)+(1.032)+(2.005), (I-052)+(1.032)+(2.006), (I-052)+(1.032)+(2.007), (I-052)+(1.032)+(2.008), (I-052)+(1.032)+(2.009), (I-052)+(1.032)+(2.010), (I-052)+(1.032)+(2.011), (I-052)+(1.032)+(2.012), (I-052)+(1.032)+(2.013), (I-052)+(1.032)+(2.014), (I-052)+(1.032)+(2.015), (I-052)+(1.032)+(2.016), (I-052)+(1.032)+(2.017), (I-052)+(1.032)+(2.018), (I-052)+(1.032)+(2.019), (I-052)+(1.032)+(2.020), (I-052)+(1.032)+(2.021), (I-052)+(1.032)+(2.022), (I-052)+(1.032)+(2.023), (I-052)+(1.032)+(2.024), (I-052)+(1.032)+(2.025), (I-052)+(1.032)+(2.026), (I-052)+(1.032)+(2.027), (I-052)+(1.032)+(2.028), (I-052)+(1.032)+(2.029), (I-052)+(1.032)+(2.030), (I-052)+(1.032)+(2.031), (I-052)+(1.032)+(2.032), (I-052)+(1.032)+(2.033), (I-052)+(1.032)+(2.034), (I-052)+(1.032)+(2.035), (I-052)+(1.032)+(2.036), (I-052)+(1.032)+(2.037), (I-052)+(1.032)+(2.038), (I-052)+(1.032)+(2.039), (I-052)+(1.032)+(2.040), (I-052)+(1.032)+(2.041), (I-052)+(1.032)+(2.042), (I-052)+(1.032)+(2.043), (I-052)+(1.032)+(2.044), (I-052)+(1.032)+(2.045), (I-052)+(1.032)+(2.046), (I-052)+(1.032)+(2.047), (I-052)+(1.032)+(2.048), (I-052)+(1.032)+(2.049), (I-052)+(1.032)+(2.050), (I-052)+(1.032)+(2.051), (I-052)+(1.032)+(2.052), (I-052)+(1.032)+(2.053), (I-052)+(1.032)+(2.054), (I-052)+(1.032)+(2.055), (I-052)+(1.032)+(2.056), (I-052)+(1.032)+(2.057), (I-052)+(1.032)+(2.058), (I-052)+(1.032)+(2.059), (I-052)+(1.032)+(3.001), (I-052)+(1.032)+(3.002), (I-052)+(1.032)+(3.003), (I-052)+(1.032)+(3.004), (I-052)+(1.032)+(3.005), (I-052)+(1.032)+(3.006), (I-052)+(1.032)+(3.007), (I-052)+(1.032)+(3.008), (I-052)+(1.032)+(3.009), (I-052)+(1.032)+(3.010), (I-052)+(1.032)+(3.011), (I-052)+(1.032)+(3.012), (I-052)+(1.032)+(3.013), (I-052)+(1.032)+(3.014), (I-052)+(1.032)+(3.015), (I-052)+(1.032)+(3.016), (I-052)+(1.032)+(3.017), (I-052)+(1.032)+(3.018), (I-052)+(1.032)+(3.019), (I-052)+(1.032)+(3.020), (I-052)+(1.032)+(3.021), (I-052)+(1.032)+(3.022), (I-052)+(1.032)+(3.023), (I-052)+(1.032)+(3.024), (I-052)+(1.032)+(3.025), (I-052)+(1.032)+(3.026), (I-052)+(1.032)+(3.027), (I-052)+(1.032)+(3.028), (I-052)+(1.032)+(3.029), (I-052)+(1.032)+(3.030), (I-052)+(1.032)+(3.031), (I-052)+(1.032)+(5.001), (I-052)+(1.032)+(5.002), (I-052)+(1.032)+(5.003), (I-052)+(1.032)+(5.004), (I-052)+(1.032)+(5.005), (I-052)+(1.032)+(5.006), (I-052)+(1.032)+(5.007), (I-052)+(1.032)+(5.008), (I-052)+(1.032)+(5.009), (I-052)+(1.032)+(5.010), (I-052)+(1.032)+(5.011), (I-052)+(1.032)+(5.012), (I-052)+(1.032)+(5.013), (I-052)+(1.032)+(5.014), (I-052)+(1.032)+(5.015), (I-052)+(1.032)+(5.016), (I-052)+(1.032)+(5.017), (I-052)+(1.032)+(5.018), (I-052)+(1.032)+(5.019), (I-052)+(1.032)+(5.020), (I-052)+(1.032)+(5.021), (I-052)+(1.032)+(5.022), (I-052)+(1.032)+(5.023), (I-052)+(1.032)+(6.001), (I-052)+(1.032)+(6.002), (I-052)+(1.032)+(6.003), (I-052)+(1.032)+(6.004), (I-052)+(1.032)+(7.001), (I-052)+(1.032)+(7.002), (I-052)+(1.032)+(7.003), (I-052)+(1.032)+(7.004), (I-052)+(1.032)+(7.005), (I-052)+(1.032)+(7.006), (I-052)+(1.032)+(9.001), (I-052)+(1.032)+(9.002), (I-052)+(1.032)+(9.003), (I-052)+(1.032)+(9.004), (I-052)+(1.032)+(9.005), (I-052)+(1.032)+(9.006), (I-052)+(1.032)+(9.007), (I-052)+(1.032)+(9.008), (I-052)+(1.032)+(9.009), (I-052)+(1.032)+(14.001), (I-052)+(1.032)+(14.002), (I-052)+(1.032)+(15.008), (I-052)+(1.032)+(15.011), (I-052)+(1.032)+(15.012), (I-052)+(1.032)+(15.016), (I-052)+(1.032)+(15.025), (I-052)+(1.032)+(15.027), (I-052)+(1.032)+(15.047), (I-052)+(1.032)+(15.063), (I-052)+(1.032)+(15.064), (I-052)+(1.032)+(16.001), (I-052)+(1.032)+(16.002), (I-052)+(1.032)+(16.003), (I-052)+(1.032)+(16.004), (I-052)+(1.032)+(16.005), (I-052)+(1.032)+(16.006), (I-052)+(1.032)+(16.007), (I-052)+(1.032)+(16.008), (I-052)+(1.032)+(17.001), (I-052)+(1.032)+(17.002), (I-052)+(1.032)+(17.003), (I-052)+(1.032)+(17.004), (I-052)+(1.032)+(17.005), (I-052)+(1.032)+(17.006), (I-052)+(1.032)+(17.007), (I-052)+(1.032)+(17.008), (I-052)+(1.032)+(17.009), (I-052)+(1.032)+(17.010), (I-052)+(1.032)+(17.011), (I-052)+(1.032)+(17.012), (I-052)+(1.032)+(18.001), (I-052)+(1.033)+(1.034), (I-052)+(1.033)+(1.035), (I-052)+(1.033)+(1.036), (I-052)+(1.033)+(1.037), (I-052)+(1.033)+(1.038), (I-052)+(1.033)+(1.039), (I-052)+(1.033)+(1.040), (I-052)+(1.033)+(1.041), (I-052)+(1.033)+(1.042), (I-052)+(1.033)+(1.043), (I-052)+(1.033)+(1.044), (I-052)+(1.033)+(1.045), (I-052)+(1.033)+(1.046), (I-052)+(1.033)+(1.047), (I-052)+(1.033)+(1.048), (I-052)+(1.033)+(1.049), (I-052)+(1.033)+(1.050), (I-052)+(1.033)+(1.051), (I-052)+(1.033)+(1.052), (I-052)+(1.033)+(1.053), (I-052)+(1.033)+(1.054), (I-052)+(1.033)+(1.055), (I-052)+(1.033)+(1.056), (I-052)+(1.033)+(1.057), (I-052)+(1.033)+(1.058), (I-052)+(1.033)+(1.059), (I-052)+(1.033)+(1.060), (I-052)+(1.033)+(1.061), (I-052)+(1.033)+(1.062), (I-052)+(1.033)+(1.063), (I-052)+(1.033)+(1.064), (I-052)+(1.033)+(1.065), (I-052)+(1.033)+(1.066), (I-052)+(1.033)+(1.067), (I-052)+(1.033)+(1.068), (I-052)+(1.033)+(1.069), (I-052)+(1.033)+(1.070), (I-052)+(1.033)+(1.071), (I-052)+(1.033)+(1.072), (I-052)+(1.033)+(1.073), (I-052)+(1.033)+(1.074), (I-052)+(1.033)+(1.075), (I-052)+(1.033)+(1.076), (I-052)+(1.033)+(1.077), (I-052)+(1.033)+(1.078), (I-052)+(1.033)+(1.079), (I-052)+(1.033)+(1.080), (I-052)+(1.033)+(1.081), (I-052)+(1.033)+(1.082), (I-052)+(1.033)+(1.083), (I-052)+(1.033)+(1.084), (I-052)+(1.033)+(1.085), (I-052)+(1.033)+(1.086), (I-052)+(1.033)+(1.087), (I-052)+(1.033)+(1.088), (I-052)+(1.033)+(1.089), (I-052)+(1.033)+(1.090), (I-052)+(1.033)+(1.091), (I-052)+(1.033)+(1.092), (I-052)+(1.033)+(2.001), (I-052)+(1.033)+(2.002), (I-052)+(1.033)+(2.003), (I-052)+(1.033)+(2.004), (I-052)+(1.033)+(2.005), (I-052)+(1.033)+(2.006), (I-052)+(1.033)+(2.007), (I-052)+(1.033)+(2.008), (I-052)+(1.033)+(2.009), (I-052)+(1.033)+(2.010), (I-052)+(1.033)+(2.011), (I-052)+(1.033)+(2.012), (I-052)+(1.033)+(2.013), (I-052)+(1.033)+(2.014), (I-052)+(1.033)+(2.015), (I-052)+(1.033)+(2.016), (I-052)+(1.033)+(2.017), (I-052)+(1.033)+(2.018), (I-052)+(1.033)+(2.019), (I-052)+(1.033)+(2.020), (I-052)+(1.033)+(2.021), (I-052)+(1.033)+(2.022), (I-052)+(1.033)+(2.023), (I-052)+(1.033)+(2.024), (I-052)+(1.033)+(2.025), (I-052)+(1.033)+(2.026), (I-052)+(1.033)+(2.027), (I-052)+(1.033)+(2.028), (I-052)+(1.033)+(2.029), (I-052)+(1.033)+(2.030), (I-052)+(1.033)+(2.031), (I-052)+(1.033)+(2.032), (I-052)+(1.033)+(2.033), (I-052)+(1.033)+(2.034), (I-052)+(1.033)+(2.035), (I-052)+(1.033)+(2.036), (I-052)+(1.033)+(2.037), (I-052)+(1.033)+(2.038), (I-052)+(1.033)+(2.039), (I-052)+(1.033)+(2.040), (I-052)+(1.033)+(2.041), (I-052)+(1.033)+(2.042), (I-052)+(1.033)+(2.043), (I-052)+(1.033)+(2.044), (I-052)+(1.033)+(2.045), (I-052)+(1.033)+(2.046), (I-052)+(1.033)+(2.047), (I-052)+(1.033)+(2.048), (I-052)+(1.033)+(2.049), (I-052)+(1.033)+(2.050), (I-052)+(1.033)+(2.051), (I-052)+(1.033)+(2.052), (I-052)+(1.033)+(2.053), (I-052)+(1.033)+(2.054), (I-052)+(1.033)+(2.055), (I-052)+(1.033)+(2.056), (I-052)+(1.033)+(2.057), (I-052)+(1.033)+(2.058), (I-052)+(1.033)+(2.059), (I-052)+(1.033)+(3.001), (I-052)+(1.033)+(3.002), (I-052)+(1.033)+(3.003), (I-052)+(1.033)+(3.004), (I-052)+(1.033)+(3.005), (I-052)+(1.033)+(3.006), (I-052)+(1.033)+(3.007), (I-052)+(1.033)+(3.008), (I-052)+(1.033)+(3.009), (I-052)+(1.033)+(3.010), (I-052)+(1.033)+(3.011), (I-052)+(1.033)+(3.012), (I-052)+(1.033)+(3.013), (I-052)+(1.033)+(3.014), (I-052)+(1.033)+(3.015), (I-052)+(1.033)+(3.016), (I-052)+(1.033)+(3.017), (I-052)+(1.033)+(3.018), (I-052)+(1.033)+(3.019), (I-052)+(1.033)+(3.020), (I-052)+(1.033)+(3.021), (I-052)+(1.033)+(3.022), (I-052)+(1.033)+(3.023), (I-052)+(1.033)+(3.024), (I-052)+(1.033)+(3.025), (I-052)+(1.033)+(3.026), (I-052)+(1.033)+(3.027), (I-052)+(1.033)+(3.028), (I-052)+(1.033)+(3.029), (I-052)+(1.033)+(3.030), (I-052)+(1.033)+(3.031), (I-052)+(1.033)+(5.001), (I-052)+(1.033)+(5.002), (I-052)+(1.033)+(5.003), (I-052)+(1.033)+(5.004), (I-052)+(1.033)+(5.005), (I-052)+(1.033)+(5.006), (I-052)+(1.033)+(5.007), (I-052)+(1.033)+(5.008), (I-052)+(1.033)+(5.009), (I-052)+(1.033)+(5.010), (I-052)+(1.033)+(5.011), (I-052)+(1.033)+(5.012), (I-052)+(1.033)+(5.013), (I-052)+(1.033)+(5.014), (I-052)+(1.033)+(5.015), (I-052)+(1.033)+(5.016), (I-052)+(1.033)+(5.017), (I-052)+(1.033)+(5.018), (I-052)+(1.033)+(5.019), (I-052)+(1.033)+(5.020), (I-052)+(1.033)+(5.021), (I-052)+(1.033)+(5.022), (I-052)+(1.033)+(5.023), (I-052)+(1.033)+(6.001), (I-052)+(1.033)+(6.002), (I-052)+(1.033)+(6.003), (I-052)+(1.033)+(6.004), (I-052)+(1.033)+(7.001), (I-052)+(1.033)+(7.002), (I-052)+(1.033)+(7.003), (I-052)+(1.033)+(7.004), (I-052)+(1.033)+(7.005), (I-052)+(1.033)+(7.006), (I-052)+(1.033)+(9.001), (I-052)+(1.033)+(9.002), (I-052)+(1.033)+(9.003), (I-052)+(1.033)+(9.004), (I-052)+(1.033)+(9.005), (I-052)+(1.033)+(9.006), (I-052)+(1.033)+(9.007), (I-052)+(1.033)+(9.008), (I-052)+(1.033)+(9.009), (I-052)+(1.033)+(14.001), (I-052)+(1.033)+(14.002), (I-052)+(1.033)+(15.008), (I-052)+(1.033)+(15.011), (I-052)+(1.033)+(15.012), (I-052)+(1.033)+(15.016), (I-052)+(1.033)+(15.025), (I-052)+(1.033)+(15.027), (I-052)+(1.033)+(15.047), (I-052)+(1.033)+(15.063), (I-052)+(1.033)+(15.064), (I-052)+(1.033)+(16.001), (I-052)+(1.033)+(16.002), (I-052)+(1.033)+(16.003), (I-052)+(1.033)+(16.004), (I-052)+(1.033)+(16.005), (I-052)+(1.033)+(16.006), (I-052)+(1.033)+(16.007), (I-052)+(1.033)+(16.008), (I-052)+(1.033)+(17.001), (I-052)+(1.033)+(17.002), (I-052)+(1.033)+(17.003), (I-052)+(1.033)+(17.004), (I-052)+(1.033)+(17.005), (I-052)+(1.033)+(17.006), (I-052)+(1.033)+(17.007), (I-052)+(1.033)+(17.008), (I-052)+(1.033)+(17.009), (I-052)+(1.033)+(17.010), (I-052)+(1.033)+(17.011), (I-052)+(1.033)+(17.012), (I-052)+(1.033)+(18.001), (I-052)+(1.034)+(1.035), (I-052)+(1.034)+(1.036), (I-052)+(1.034)+(1.037), (I-052)+(1.034)+(1.038), (I-052)+(1.034)+(1.039), (I-052)+(1.034)+(1.040), (I-052)+(1.034)+(1.041), (I-052)+(1.034)+(1.042), (I-052)+(1.034)+(1.043), (I-052)+(1.034)+(1.044), (I-052)+(1.034)+(1.045), (I-052)+(1.034)+(1.046), (I-052)+(1.034)+(1.047), (I-052)+(1.034)+(1.048), (I-052)+(1.034)+(1.049), (I-052)+(1.034)+(1.050), (I-052)+(1.034)+(1.051), (I-052)+(1.034)+(1.052), (I-052)+(1.034)+(1.053), (I-052)+(1.034)+(1.054), (I-052)+(1.034)+(1.055), (I-052)+(1.034)+(1.056), (I-052)+(1.034)+(1.057), (I-052)+(1.034)+(1.058), (I-052)+(1.034)+(1.059), (I-052)+(1.034)+(1.060), (I-052)+(1.034)+(1.061), (I-052)+(1.034)+(1.062), (I-052)+(1.034)+(1.063), (I-052)+(1.034)+(1.064), (I-052)+(1.034)+(1.065), (I-052)+(1.034)+(1.066), (I-052)+(1.034)+(1.067), (I-052)+(1.034)+(1.068), (I-052)+(1.034)+(1.069), (I-052)+(1.034)+(1.070), (I-052)+(1.034)+(1.071), (I-052)+(1.034)+(1.072), (I-052)+(1.034)+(1.073), (I-052)+(1.034)+(1.074), (I-052)+(1.034)+(1.075), (I-052)+(1.034)+(1.076), (I-052)+(1.034)+(1.077), (I-052)+(1.034)+(1.078), (I-052)+(1.034)+(1.079), (I-052)+(1.034)+(1.080), (I-052)+(1.034)+(1.081), (I-052)+(1.034)+(1.082), (I-052)+(1.034)+(1.083), (I-052)+(1.034)+(1.084), (I-052)+(1.034)+(1.085), (I-052)+(1.034)+(1.086), (I-052)+(1.034)+(1.087), (I-052)+(1.034)+(1.088), (I-052)+(1.034)+(1.089), (I-052)+(1.034)+(1.090), (I-052)+(1.034)+(1.091), (I-052)+(1.034)+(1.092), (I-052)+(1.034)+(2.001), (I-052)+(1.034)+(2.002), (I-052)+(1.034)+(2.003), (I-052)+(1.034)+(2.004), (I-052)+(1.034)+(2.005), (I-052)+(1.034)+(2.006), (I-052)+(1.034)+(2.007), (I-052)+(1.034)+(2.008), (I-052)+(1.034)+(2.009), (I-052)+(1.034)+(2.010), (I-052)+(1.034)+(2.011), (I-052)+(1.034)+(2.012), (I-052)+(1.034)+(2.013), (I-052)+(1.034)+(2.014), (I-052)+(1.034)+(2.015), (I-052)+(1.034)+(2.016), (I-052)+(1.034)+(2.017), (I-052)+(1.034)+(2.018), (I-052)+(1.034)+(2.019), (I-052)+(1.034)+(2.020), (I-052)+(1.034)+(2.021), (I-052)+(1.034)+(2.022), (I-052)+(1.034)+(2.023), (I-052)+(1.034)+(2.024), (I-052)+(1.034)+(2.025), (I-052)+(1.034)+(2.026), (I-052)+(1.034)+(2.027), (I-052)+(1.034)+(2.028), (I-052)+(1.034)+(2.029), (I-052)+(1.034)+(2.030), (I-052)+(1.034)+(2.031), (I-052)+(1.034)+(2.032), (I-052)+(1.034)+(2.033), (I-052)+(1.034)+(2.034), (I-052)+(1.034)+(2.035), (I-052)+(1.034)+(2.036), (I-052)+(1.034)+(2.037), (I-052)+(1.034)+(2.038), (I-052)+(1.034)+(2.039), (I-052)+(1.034)+(2.040), (I-052)+(1.034)+(2.041), (I-052)+(1.034)+(2.042), (I-052)+(1.034)+(2.043), (I-052)+(1.034)+(2.044), (I-052)+(1.034)+(2.045), (I-052)+(1.034)+(2.046), (I-052)+(1.034)+(2.047), (I-052)+(1.034)+(2.048), (I-052)+(1.034)+(2.049), (I-052)+(1.034)+(2.050), (I-052)+(1.034)+(2.051), (I-052)+(1.034)+(2.052), (I-052)+(1.034)+(2.053), (I-052)+(1.034)+(2.054), (I-052)+(1.034)+(2.055), (I-052)+(1.034)+(2.056), (I-052)+(1.034)+(2.057), (I-052)+(1.034)+(2.058), (I-052)+(1.034)+(2.059), (I-052)+(1.034)+(3.001), (I-052)+(1.034)+(3.002), (I-052)+(1.034)+(3.003), (I-052)+(1.034)+(3.004), (I-052)+(1.034)+(3.005), (I-052)+(1.034)+(3.006), (I-052)+(1.034)+(3.007), (I-052)+(1.034)+(3.008), (I-052)+(1.034)+(3.009), (I-052)+(1.034)+(3.010), (I-052)+(1.034)+(3.011), (I-052)+(1.034)+(3.012), (I-052)+(1.034)+(3.013), (I-052)+(1.034)+(3.014), (I-052)+(1.034)+(3.015), (I-052)+(1.034)+(3.016), (I-052)+(1.034)+(3.017), (I-052)+(1.034)+(3.018), (I-052)+(1.034)+(3.019), (I-052)+(1.034)+(3.020), (I-052)+(1.034)+(3.021), (I-052)+(1.034)+(3.022), (I-052)+(1.034)+(3.023), (I-052)+(1.034)+(3.024), (I-052)+(1.034)+(3.025), (I-052)+(1.034)+(3.026), (I-052)+(1.034)+(3.027), (I-052)+(1.034)+(3.028), (I-052)+(1.034)+(3.029), (I-052)+(1.034)+(3.030), (I-052)+(1.034)+(3.031), (I-052)+(1.034)+(5.001), (I-052)+(1.034)+(5.002), (I-052)+(1.034)+(5.003), (I-052)+(1.034)+(5.004), (I-052)+(1.034)+(5.005), (I-052)+(1.034)+(5.006), (I-052)+(1.034)+(5.007), (I-052)+(1.034)+(5.008), (I-052)+(1.034)+(5.009), (I-052)+(1.034)+(5.010), (I-052)+(1.034)+(5.011), (I-052)+(1.034)+(5.012), (I-052)+(1.034)+(5.013), (I-052)+(1.034)+(5.014), (I-052)+(1.034)+(5.015), (I-052)+(1.034)+(5.016), (I-052)+(1.034)+(5.017), (I-052)+(1.034)+(5.018), (I-052)+(1.034)+(5.019), (I-052)+(1.034)+(5.020), (I-052)+(1.034)+(5.021), (I-052)+(1.034)+(5.022), (I-052)+(1.034)+(5.023), (I-052)+(1.034)+(6.001), (I-052)+(1.034)+(6.002), (I-052)+(1.034)+(6.003), (I-052)+(1.034)+(6.004), (I-052)+(1.034)+(7.001), (I-052)+(1.034)+(7.002), (I-052)+(1.034)+(7.003), (I-052)+(1.034)+(7.004), (I-052)+(1.034)+(7.005), (I-052)+(1.034)+(7.006), (I-052)+(1.034)+(9.001), (I-052)+(1.034)+(9.002), (I-052)+(1.034)+(9.003), (I-052)+(1.034)+(9.004), (I-052)+(1.034)+(9.005), (I-052)+(1.034)+(9.006), (I-052)+(1.034)+(9.007), (I-052)+(1.034)+(9.008), (I-052)+(1.034)+(9.009), (I-052)+(1.034)+(14.001), (I-052)+(1.034)+(14.002), (I-052)+(1.034)+(15.008), (I-052)+(1.034)+(15.011), (I-052)+(1.034)+(15.012), (I-052)+(1.034)+(15.016), (I-052)+(1.034)+(15.025), (I-052)+(1.034)+(15.027), (I-052)+(1.034)+(15.047), (I-052)+(1.034)+(15.063), (I-052)+(1.034)+(15.064), (I-052)+(1.034)+(16.001), (I-052)+(1.034)+(16.002), (I-052)+(1.034)+(16.003), (I-052)+(1.034)+(16.004), (I-052)+(1.034)+(16.005), (I-052)+(1.034)+(16.006), (I-052)+(1.034)+(16.007), (I-052)+(1.034)+(16.008), (I-052)+(1.034)+(17.001), (I-052)+(1.034)+(17.002), (I-052)+(1.034)+(17.003), (I-052)+(1.034)+(17.004), (I-052)+(1.034)+(17.005), (I-052)+(1.034)+(17.006), (I-052)+(1.034)+(17.007), (I-052)+(1.034)+(17.008), (I-052)+(1.034)+(17.009), (I-052)+(1.034)+(17.010), (I-052)+(1.034)+(17.011), (I-052)+(1.034)+(17.012), (I-052)+(1.034)+(18.001), (I-052)+(1.035)+(1.036), (I-052)+(1.035)+(1.037), (I-052)+(1.035)+(1.038), (I-052)+(1.035)+(1.039), (I-052)+(1.035)+(1.040), (I-052)+(1.035)+(1.041), (I-052)+(1.035)+(1.042), (I-052)+(1.035)+(1.043), (I-052)+(1.035)+(1.044), (I-052)+(1.035)+(1.045), (I-052)+(1.035)+(1.046), (I-052)+(1.035)+(1.047), (I-052)+(1.035)+(1.048), (I-052)+(1.035)+(1.049), (I-052)+(1.035)+(1.050), (I-052)+(1.035)+(1.051), (I-052)+(1.035)+(1.052), (I-052)+(1.035)+(1.053), (I-052)+(1.035)+(1.054), (I-052)+(1.035)+(1.055), (I-052)+(1.035)+(1.056), (I-052)+(1.035)+(1.057), (I-052)+(1.035)+(1.058), (I-052)+(1.035)+(1.059), (I-052)+(1.035)+(1.060), (I-052)+(1.035)+(1.061), (I-052)+(1.035)+(1.062), (I-052)+(1.035)+(1.063), (I-052)+(1.035)+(1.064), (I-052)+(1.035)+(1.065), (I-052)+(1.035)+(1.066), (I-052)+(1.035)+(1.067), (I-052)+(1.035)+(1.068), (I-052)+(1.035)+(1.069), (I-052)+(1.035)+(1.070), (I-052)+(1.035)+(1.071), (I-052)+(1.035)+(1.072), (I-052)+(1.035)+(1.073), (I-052)+(1.035)+(1.074), (I-052)+(1.035)+(1.075), (I-052)+(1.035)+(1.076), (I-052)+(1.035)+(1.077), (I-052)+(1.035)+(1.078), (I-052)+(1.035)+(1.079), (I-052)+(1.035)+(1.080), (I-052)+(1.035)+(1.081), (I-052)+(1.035)+(1.082), (I-052)+(1.035)+(1.083), (I-052)+(1.035)+(1.084), (I-052)+(1.035)+(1.085), (I-052)+(1.035)+(1.086), (I-052)+(1.035)+(1.087), (I-052)+(1.035)+(1.088), (I-052)+(1.035)+(1.089), (I-052)+(1.035)+(1.090), (I-052)+(1.035)+(1.091), (I-052)+(1.035)+(1.092), (I-052)+(1.035)+(2.001), (I-052)+(1.035)+(2.002), (I-052)+(1.035)+(2.003), (I-052)+(1.035)+(2.004), (I-052)+(1.035)+(2.005), (I-052)+(1.035)+(2.006), (I-052)+(1.035)+(2.007), (I-052)+(1.035)+(2.008), (I-052)+(1.035)+(2.009), (I-052)+(1.035)+(2.010), (I-052)+(1.035)+(2.011), (I-052)+(1.035)+(2.012), (I-052)+(1.035)+(2.013), (I-052)+(1.035)+(2.014), (I-052)+(1.035)+(2.015), (I-052)+(1.035)+(2.016), (I-052)+(1.035)+(2.017), (I-052)+(1.035)+(2.018), (I-052)+(1.035)+(2.019), (I-052)+(1.035)+(2.020), (I-052)+(1.035)+(2.021), (I-052)+(1.035)+(2.022), (I-052)+(1.035)+(2.023), (I-052)+(1.035)+(2.024), (I-052)+(1.035)+(2.025), (I-052)+(1.035)+(2.026), (I-052)+(1.035)+(2.027), (I-052)+(1.035)+(2.028), (I-052)+(1.035)+(2.029), (I-052)+(1.035)+(2.030), (I-052)+(1.035)+(2.031), (I-052)+(1.035)+(2.032), (I-052)+(1.035)+(2.033), (I-052)+(1.035)+(2.034), (I-052)+(1.035)+(2.035), (I-052)+(1.035)+(2.036), (I-052)+(1.035)+(2.037), (I-052)+(1.035)+(2.038), (I-052)+(1.035)+(2.039), (I-052)+(1.035)+(2.040), (I-052)+(1.035)+(2.041), (I-052)+(1.035)+(2.042), (I-052)+(1.035)+(2.043), (I-052)+(1.035)+(2.044), (I-052)+(1.035)+(2.045), (I-052)+(1.035)+(2.046), (I-052)+(1.035)+(2.047), (I-052)+(1.035)+(2.048), (I-052)+(1.035)+(2.049), (I-052)+(1.035)+(2.050), (I-052)+(1.035)+(2.051), (I-052)+(1.035)+(2.052), (I-052)+(1.035)+(2.053), (I-052)+(1.035)+(2.054), (I-052)+(1.035)+(2.055), (I-052)+(1.035)+(2.056), (I-052)+(1.035)+(2.057), (I-052)+(1.035)+(2.058), (I-052)+(1.035)+(2.059), (I-052)+(1.035)+(3.001), (I-052)+(1.035)+(3.002), (I-052)+(1.035)+(3.003), (I-052)+(1.035)+(3.004), (I-052)+(1.035)+(3.005), (I-052)+(1.035)+(3.006), (I-052)+(1.035)+(3.007), (I-052)+(1.035)+(3.008), (I-052)+(1.035)+(3.009), (I-052)+(1.035)+(3.010), (I-052)+(1.035)+(3.011), (I-052)+(1.035)+(3.012), (I-052)+(1.035)+(3.013), (I-052)+(1.035)+(3.014), (I-052)+(1.035)+(3.015), (I-052)+(1.035)+(3.016), (I-052)+(1.035)+(3.017), (I-052)+(1.035)+(3.018), (I-052)+(1.035)+(3.019), (I-052)+(1.035)+(3.020), (I-052)+(1.035)+(3.021), (I-052)+(1.035)+(3.022), (I-052)+(1.035)+(3.023), (I-052)+(1.035)+(3.024), (I-052)+(1.035)+(3.025), (I-052)+(1.035)+(3.026), (I-052)+(1.035)+(3.027), (I-052)+(1.035)+(3.028), (I-052)+(1.035)+(3.029), (I-052)+(1.035)+(3.030), (I-052)+(1.035)+(3.031), (I-052)+(1.035)+(5.001), (I-052)+(1.035)+(5.002), (I-052)+(1.035)+(5.003), (I-052)+(1.035)+(5.004), (I-052)+(1.035)+(5.005), (I-052)+(1.035)+(5.006), (I-052)+(1.035)+(5.007), (I-052)+(1.035)+(5.008), (I-052)+(1.035)+(5.009), (I-052)+(1.035)+(5.010), (I-052)+(1.035)+(5.011), (I-052)+(1.035)+(5.012), (I-052)+(1.035)+(5.013), (I-052)+(1.035)+(5.014), (I-052)+(1.035)+(5.015), (I-052)+(1.035)+(5.016), (I-052)+(1.035)+(5.017), (I-052)+(1.035)+(5.018), (I-052)+(1.035)+(5.019), (I-052)+(1.035)+(5.020), (I-052)+(1.035)+(5.021), (I-052)+(1.035)+(5.022), (I-052)+(1.035)+(5.023), (I-052)+(1.035)+(6.001), (I-052)+(1.035)+(6.002), (I-052)+(1.035)+(6.003), (I-052)+(1.035)+(6.004), (I-052)+(1.035)+(7.001), (I-052)+(1.035)+(7.002), (I-052)+(1.035)+(7.003), (I-052)+(1.035)+(7.004), (I-052)+(1.035)+(7.005), (I-052)+(1.035)+(7.006), (I-052)+(1.035)+(9.001), (I-052)+(1.035)+(9.002), (I-052)+(1.035)+(9.003), (I-052)+(1.035)+(9.004), (I-052)+(1.035)+(9.005), (I-052)+(1.035)+(9.006), (I-052)+(1.035)+(9.007), (I-052)+(1.035)+(9.008), (I-052)+(1.035)+(9.009), (I-052)+(1.035)+(14.001), (I-052)+(1.035)+(14.002), (I-052)+(1.035)+(15.008), (I-052)+(1.035)+(15.011), (I-052)+(1.035)+(15.012), (I-052)+(1.035)+(15.016), (I-052)+(1.035)+(15.025), (I-052)+(1.035)+(15.027), (I-052)+(1.035)+(15.047), (I-052)+(1.035)+(15.063), (I-052)+(1.035)+(15.064), (I-052)+(1.035)+(16.001), (I-052)+(1.035)+(16.002), (I-052)+(1.035)+(16.003), (I-052)+(1.035)+(16.004), (I-052)+(1.035)+(16.005), (I-052)+(1.035)+(16.006), (I-052)+(1.035)+(16.007), (I-052)+(1.035)+(16.008), (I-052)+(1.035)+(17.001), (I-052)+(1.035)+(17.002), (I-052)+(1.035)+(17.003), (I-052)+(1.035)+(17.004), (I-052)+(1.035)+(17.005), (I-052)+(1.035)+(17.006), (I-052)+(1.035)+(17.007), (I-052)+(1.035)+(17.008), (I-052)+(1.035)+(17.009), (I-052)+(1.035)+(17.010), (I-052)+(1.035)+(17.011), (I-052)+(1.035)+(17.012), (I-052)+(1.035)+(18.001), (I-052)+(1.036)+(1.037), (I-052)+(1.036)+(1.038), (I-052)+(1.036)+(1.039), (I-052)+(1.036)+(1.040), (I-052)+(1.036)+(1.041), (I-052)+(1.036)+(1.042), (I-052)+(1.036)+(1.043), (I-052)+(1.036)+(1.044), (I-052)+(1.036)+(1.045), (I-052)+(1.036)+(1.046), (I-052)+(1.036)+(1.047), (I-052)+(1.036)+(1.048), (I-052)+(1.036)+(1.049), (I-052)+(1.036)+(1.050), (I-052)+(1.036)+(1.051), (I-052)+(1.036)+(1.052), (I-052)+(1.036)+(1.053), (I-052)+(1.036)+(1.054), (I-052)+(1.036)+(1.055), (I-052)+(1.036)+(1.056), (I-052)+(1.036)+(1.057), (I-052)+(1.036)+(1.058), (I-052)+(1.036)+(1.059), (I-052)+(1.036)+(1.060), (I-052)+(1.036)+(1.061), (I-052)+(1.036)+(1.062), (I-052)+(1.036)+(1.063), (I-052)+(1.036)+(1.064), (I-052)+(1.036)+(1.065), (I-052)+(1.036)+(1.066), (I-052)+(1.036)+(1.067), (I-052)+(1.036)+(1.068), (I-052)+(1.036)+(1.069), (I-052)+(1.036)+(1.070), (I-052)+(1.036)+(1.071), (I-052)+(1.036)+(1.072), (I-052)+(1.036)+(1.073), (I-052)+(1.036)+(1.074), (I-052)+(1.036)+(1.075), (I-052)+(1.036)+(1.076), (I-052)+(1.036)+(1.077), (I-052)+(1.036)+(1.078), (I-052)+(1.036)+(1.079), (I-052)+(1.036)+(1.080), (I-052)+(1.036)+(1.081), (I-052)+(1.036)+(1.082), (I-052)+(1.036)+(1.083), (I-052)+(1.036)+(1.084), (I-052)+(1.036)+(1.085), (I-052)+(1.036)+(1.086), (I-052)+(1.036)+(1.087), (I-052)+(1.036)+(1.088), (I-052)+(1.036)+(1.089), (I-052)+(1.036)+(1.090), (I-052)+(1.036)+(1.091), (I-052)+(1.036)+(1.092), (I-052)+(1.036)+(2.001), (I-052)+(1.036)+(2.002), (I-052)+(1.036)+(2.003), (I-052)+(1.036)+(2.004), (I-052)+(1.036)+(2.005), (I-052)+(1.036)+(2.006), (I-052)+(1.036)+(2.007), (I-052)+(1.036)+(2.008), (I-052)+(1.036)+(2.009), (I-052)+(1.036)+(2.010), (I-052)+(1.036)+(2.011), (I-052)+(1.036)+(2.012), (I-052)+(1.036)+(2.013), (I-052)+(1.036)+(2.014), (I-052)+(1.036)+(2.015), (I-052)+(1.036)+(2.016), (I-052)+(1.036)+(2.017), (I-052)+(1.036)+(2.018), (I-052)+(1.036)+(2.019), (I-052)+(1.036)+(2.020), (I-052)+(1.036)+(2.021), (I-052)+(1.036)+(2.022), (I-052)+(1.036)+(2.023), (I-052)+(1.036)+(2.024), (I-052)+(1.036)+(2.025), (I-052)+(1.036)+(2.026), (I-052)+(1.036)+(2.027), (I-052)+(1.036)+(2.028), (I-052)+(1.036)+(2.029), (I-052)+(1.036)+(2.030), (I-052)+(1.036)+(2.031), (I-052)+(1.036)+(2.032), (I-052)+(1.036)+(2.033), (I-052)+(1.036)+(2.034), (I-052)+(1.036)+(2.035), (I-052)+(1.036)+(2.036), (I-052)+(1.036)+(2.037), (I-052)+(1.036)+(2.038), (I-052)+(1.036)+(2.039), (I-052)+(1.036)+(2.040), (I-052)+(1.036)+(2.041), (I-052)+(1.036)+(2.042), (I-052)+(1.036)+(2.043), (I-052)+(1.036)+(2.044), (I-052)+(1.036)+(2.045), (I-052)+(1.036)+(2.046), (I-052)+(1.036)+(2.047), (I-052)+(1.036)+(2.048), (I-052)+(1.036)+(2.049), (I-052)+(1.036)+(2.050), (I-052)+(1.036)+(2.051), (I-052)+(1.036)+(2.052), (I-052)+(1.036)+(2.053), (I-052)+(1.036)+(2.054), (I-052)+(1.036)+(2.055), (I-052)+(1.036)+(2.056), (I-052)+(1.036)+(2.057), (I-052)+(1.036)+(2.058), (I-052)+(1.036)+(2.059), (I-052)+(1.036)+(3.001), (I-052)+(1.036)+(3.002), (I-052)+(1.036)+(3.003), (I-052)+(1.036)+(3.004), (I-052)+(1.036)+(3.005), (I-052)+(1.036)+(3.006), (I-052)+(1.036)+(3.007), (I-052)+(1.036)+(3.008), (I-052)+(1.036)+(3.009), (I-052)+(1.036)+(3.010), (I-052)+(1.036)+(3.011), (I-052)+(1.036)+(3.012), (I-052)+(1.036)+(3.013), (I-052)+(1.036)+(3.014), (I-052)+(1.036)+(3.015), (I-052)+(1.036)+(3.016), (I-052)+(1.036)+(3.017), (I-052)+(1.036)+(3.018), (I-052)+(1.036)+(3.019), (I-052)+(1.036)+(3.020), (I-052)+(1.036)+(3.021), (I-052)+(1.036)+(3.022), (I-052)+(1.036)+(3.023), (I-052)+(1.036)+(3.024), (I-052)+(1.036)+(3.025), (I-052)+(1.036)+(3.026), (I-052)+(1.036)+(3.027), (I-052)+(1.036)+(3.028), (I-052)+(1.036)+(3.029), (I-052)+(1.036)+(3.030), (I-052)+(1.036)+(3.031), (I-052)+(1.036)+(5.001), (I-052)+(1.036)+(5.002), (I-052)+(1.036)+(5.003), (I-052)+(1.036)+(5.004), (I-052)+(1.036)+(5.005), (I-052)+(1.036)+(5.006), (I-052)+(1.036)+(5.007), (I-052)+(1.036)+(5.008), (I-052)+(1.036)+(5.009), (I-052)+(1.036)+(5.010), (I-052)+(1.036)+(5.011), (I-052)+(1.036)+(5.012), (I-052)+(1.036)+(5.013), (I-052)+(1.036)+(5.014), (I-052)+(1.036)+(5.015), (I-052)+(1.036)+(5.016), (I-052)+(1.036)+(5.017), (I-052)+(1.036)+(5.018), (I-052)+(1.036)+(5.019), (I-052)+(1.036)+(5.020), (I-052)+(1.036)+(5.021), (I-052)+(1.036)+(5.022), (I-052)+(1.036)+(5.023), (I-052)+(1.036)+(6.001), (I-052)+(1.036)+(6.002), (I-052)+(1.036)+(6.003), (I-052)+(1.036)+(6.004), (I-052)+(1.036)+(7.001), (I-052)+(1.036)+(7.002), (I-052)+(1.036)+(7.003), (I-052)+(1.036)+(7.004), (I-052)+(1.036)+(7.005), (I-052)+(1.036)+(7.006), (I-052)+(1.036)+(9.001), (I-052)+(1.036)+(9.002), (I-052)+(1.036)+(9.003), (I-052)+(1.036)+(9.004), (I-052)+(1.036)+(9.005), (I-052)+(1.036)+(9.006), (I-052)+(1.036)+(9.007), (I-052)+(1.036)+(9.008), (I-052)+(1.036)+(9.009), (I-052)+(1.036)+(14.001), (I-052)+(1.036)+(14.002), (I-052)+(1.036)+(15.008), (I-052)+(1.036)+(15.011), (I-052)+(1.036)+(15.012), (I-052)+(1.036)+(15.016), (I-052)+(1.036)+(15.025), (I-052)+(1.036)+(15.027), (I-052)+(1.036)+(15.047), (I-052)+(1.036)+(15.063), (I-052)+(1.036)+(15.064), (I-052)+(1.036)+(16.001), (I-052)+(1.036)+(16.002), (I-052)+(1.036)+(16.003), (I-052)+(1.036)+(16.004), (I-052)+(1.036)+(16.005), (I-052)+(1.036)+(16.006), (I-052)+(1.036)+(16.007), (I-052)+(1.036)+(16.008), (I-052)+(1.036)+(17.001), (I-052)+(1.036)+(17.002), (I-052)+(1.036)+(17.003), (I-052)+(1.036)+(17.004), (I-052)+(1.036)+(17.005), (I-052)+(1.036)+(17.006), (I-052)+(1.036)+(17.007), (I-052)+(1.036)+(17.008), (I-052)+(1.036)+(17.009), (I-052)+(1.036)+(17.010), (I-052)+(1.036)+(17.011), (I-052)+(1.036)+(17.012), (I-052)+(1.036)+(18.001), (I-052)+(1.037)+(1.038), (I-052)+(1.037)+(1.039), (I-052)+(1.037)+(1.040), (I-052)+(1.037)+(1.041), (I-052)+(1.037)+(1.042), (I-052)+(1.037)+(1.043), (I-052)+(1.037)+(1.044), (I-052)+(1.037)+(1.045), (I-052)+(1.037)+(1.046), (I-052)+(1.037)+(1.047), (I-052)+(1.037)+(1.048), (I-052)+(1.037)+(1.049), (I-052)+(1.037)+(1.050), (I-052)+(1.037)+(1.051), (I-052)+(1.037)+(1.052), (I-052)+(1.037)+(1.053), (I-052)+(1.037)+(1.054), (I-052)+(1.037)+(1.055), (I-052)+(1.037)+(1.056), (I-052)+(1.037)+(1.057), (I-052)+(1.037)+(1.058), (I-052)+(1.037)+(1.059), (I-052)+(1.037)+(1.060), (I-052)+(1.037)+(1.061), (I-052)+(1.037)+(1.062), (I-052)+(1.037)+(1.063), (I-052)+(1.037)+(1.064), (I-052)+(1.037)+(1.065), (I-052)+(1.037)+(1.066), (I-052)+(1.037)+(1.067), (I-052)+(1.037)+(1.068), (I-052)+(1.037)+(1.069), (I-052)+(1.037)+(1.070), (I-052)+(1.037)+(1.071), (I-052)+(1.037)+(1.072), (I-052)+(1.037)+(1.073), (I-052)+(1.037)+(1.074), (I-052)+(1.037)+(1.075), (I-052)+(1.037)+(1.076), (I-052)+(1.037)+(1.077), (I-052)+(1.037)+(1.078), (I-052)+(1.037)+(1.079), (I-052)+(1.037)+(1.080), (I-052)+(1.037)+(1.081), (I-052)+(1.037)+(1.082), (I-052)+(1.037)+(1.083), (I-052)+(1.037)+(1.084), (I-052)+(1.037)+(1.085), (I-052)+(1.037)+(1.086), (I-052)+(1.037)+(1.087), (I-052)+(1.037)+(1.088), (I-052)+(1.037)+(1.089), (I-052)+(1.037)+(1.090), (I-052)+(1.037)+(1.091), (I-052)+(1.037)+(1.092), (I-052)+(1.037)+(2.001), (I-052)+(1.037)+(2.002), (I-052)+(1.037)+(2.003), (I-052)+(1.037)+(2.004), (I-052)+(1.037)+(2.005), (I-052)+(1.037)+(2.006), (I-052)+(1.037)+(2.007), (I-052)+(1.037)+(2.008), (I-052)+(1.037)+(2.009), (I-052)+(1.037)+(2.010), (I-052)+(1.037)+(2.011), (I-052)+(1.037)+(2.012), (I-052)+(1.037)+(2.013), (I-052)+(1.037)+(2.014), (I-052)+(1.037)+(2.015), (I-052)+(1.037)+(2.016), (I-052)+(1.037)+(2.017), (I-052)+(1.037)+(2.018), (I-052)+(1.037)+(2.019), (I-052)+(1.037)+(2.020), (I-052)+(1.037)+(2.021), (I-052)+(1.037)+(2.022), (I-052)+(1.037)+(2.023), (I-052)+(1.037)+(2.024), (I-052)+(1.037)+(2.025), (I-052)+(1.037)+(2.026), (I-052)+(1.037)+(2.027), (I-052)+(1.037)+(2.028), (I-052)+(1.037)+(2.029), (I-052)+(1.037)+(2.030), (I-052)+(1.037)+(2.031), (I-052)+(1.037)+(2.032), (I-052)+(1.037)+(2.033), (I-052)+(1.037)+(2.034), (I-052)+(1.037)+(2.035), (I-052)+(1.037)+(2.036), (I-052)+(1.037)+(2.037), (I-052)+(1.037)+(2.038), (I-052)+(1.037)+(2.039), (I-052)+(1.037)+(2.040), (I-052)+(1.037)+(2.041), (I-052)+(1.037)+(2.042), (I-052)+(1.037)+(2.043), (I-052)+(1.037)+(2.044), (I-052)+(1.037)+(2.045), (I-052)+(1.037)+(2.046), (I-052)+(1.037)+(2.047), (I-052)+(1.037)+(2.048), (I-052)+(1.037)+(2.049), (I-052)+(1.037)+(2.050), (I-052)+(1.037)+(2.051), (I-052)+(1.037)+(2.052), (I-052)+(1.037)+(2.053), (I-052)+(1.037)+(2.054), (I-052)+(1.037)+(2.055), (I-052)+(1.037)+(2.056), (I-052)+(1.037)+(2.057), (I-052)+(1.037)+(2.058), (I-052)+(1.037)+(2.059), (I-052)+(1.037)+(3.001), (I-052)+(1.037)+(3.002), (I-052)+(1.037)+(3.003), (I-052)+(1.037)+(3.004), (I-052)+(1.037)+(3.005), (I-052)+(1.037)+(3.006), (I-052)+(1.037)+(3.007), (I-052)+(1.037)+(3.008), (I-052)+(1.037)+(3.009), (I-052)+(1.037)+(3.010), (I-052)+(1.037)+(3.011), (I-052)+(1.037)+(3.012), (I-052)+(1.037)+(3.013), (I-052)+(1.037)+(3.014), (I-052)+(1.037)+(3.015), (I-052)+(1.037)+(3.016), (I-052)+(1.037)+(3.017), (I-052)+(1.037)+(3.018), (I-052)+(1.037)+(3.019), (I-052)+(1.037)+(3.020), (I-052)+(1.037)+(3.021), (I-052)+(1.037)+(3.022), (I-052)+(1.037)+(3.023), (I-052)+(1.037)+(3.024), (I-052)+(1.037)+(3.025), (I-052)+(1.037)+(3.026), (I-052)+(1.037)+(3.027), (I-052)+(1.037)+(3.028), (I-052)+(1.037)+(3.029), (I-052)+(1.037)+(3.030), (I-052)+(1.037)+(3.031), (I-052)+(1.037)+(5.001), (I-052)+(1.037)+(5.002), (I-052)+(1.037)+(5.003), (I-052)+(1.037)+(5.004), (I-052)+(1.037)+(5.005), (I-052)+(1.037)+(5.006), (I-052)+(1.037)+(5.007), (I-052)+(1.037)+(5.008), (I-052)+(1.037)+(5.009), (I-052)+(1.037)+(5.010), (I-052)+(1.037)+(5.011), (I-052)+(1.037)+(5.012), (I-052)+(1.037)+(5.013), (I-052)+(1.037)+(5.014), (I-052)+(1.037)+(5.015), (I-052)+(1.037)+(5.016), (I-052)+(1.037)+(5.017), (I-052)+(1.037)+(5.018), (I-052)+(1.037)+(5.019), (I-052)+(1.037)+(5.020), (I-052)+(1.037)+(5.021), (I-052)+(1.037)+(5.022), (I-052)+(1.037)+(5.023), (I-052)+(1.037)+(6.001), (I-052)+(1.037)+(6.002), (I-052)+(1.037)+(6.003), (I-052)+(1.037)+(6.004), (I-052)+(1.037)+(7.001), (I-052)+(1.037)+(7.002), (I-052)+(1.037)+(7.003), (I-052)+(1.037)+(7.004), (I-052)+(1.037)+(7.005), (I-052)+(1.037)+(7.006), (I-052)+(1.037)+(9.001), (I-052)+(1.037)+(9.002), (I-052)+(1.037)+(9.003), (I-052)+(1.037)+(9.004), (I-052)+(1.037)+(9.005), (I-052)+(1.037)+(9.006), (I-052)+(1.037)+(9.007), (I-052)+(1.037)+(9.008), (I-052)+(1.037)+(9.009), (I-052)+(1.037)+(14.001), (I-052)+(1.037)+(14.002), (I-052)+(1.037)+(15.008), (I-052)+(1.037)+(15.011), (I-052)+(1.037)+(15.012), (I-052)+(1.037)+(15.016), (I-052)+(1.037)+(15.025), (I-052)+(1.037)+(15.027), (I-052)+(1.037)+(15.047), (I-052)+(1.037)+(15.063), (I-052)+(1.037)+(15.064), (I-052)+(1.037)+(16.001), (I-052)+(1.037)+(16.002), (I-052)+(1.037)+(16.003), (I-052)+(1.037)+(16.004), (I-052)+(1.037)+(16.005), (I-052)+(1.037)+(16.006), (I-052)+(1.037)+(16.007), (I-052)+(1.037)+(16.008), (I-052)+(1.037)+(17.001), (I-052)+(1.037)+(17.002), (I-052)+(1.037)+(17.003), (I-052)+(1.037)+(17.004), (I-052)+(1.037)+(17.005), (I-052)+(1.037)+(17.006), (I-052)+(1.037)+(17.007), (I-052)+(1.037)+(17.008), (I-052)+(1.037)+(17.009), (I-052)+(1.037)+(17.010), (I-052)+(1.037)+(17.011), (I-052)+(1.037)+(17.012), (I-052)+(1.037)+(18.001), (I-052)+(1.038)+(1.039), (I-052)+(1.038)+(1.040), (I-052)+(1.038)+(1.041), (I-052)+(1.038)+(1.042), (I-052)+(1.038)+(1.043), (I-052)+(1.038)+(1.044), (I-052)+(1.038)+(1.045), (I-052)+(1.038)+(1.046), (I-052)+(1.038)+(1.047), (I-052)+(1.038)+(1.048), (I-052)+(1.038)+(1.049), (I-052)+(1.038)+(1.050), (I-052)+(1.038)+(1.051), (I-052)+(1.038)+(1.052), (I-052)+(1.038)+(1.053), (I-052)+(1.038)+(1.054), (I-052)+(1.038)+(1.055), (I-052)+(1.038)+(1.056), (I-052)+(1.038)+(1.057), (I-052)+(1.038)+(1.058), (I-052)+(1.038)+(1.059), (I-052)+(1.038)+(1.060), (I-052)+(1.038)+(1.061), (I-052)+(1.038)+(1.062), (I-052)+(1.038)+(1.063), (I-052)+(1.038)+(1.064), (I-052)+(1.038)+(1.065), (I-052)+(1.038)+(1.066), (I-052)+(1.038)+(1.067), (I-052)+(1.038)+(1.068), (I-052)+(1.038)+(1.069), (I-052)+(1.038)+(1.070), (I-052)+(1.038)+(1.071), (I-052)+(1.038)+(1.072), (I-052)+(1.038)+(1.073), (I-052)+(1.038)+(1.074), (I-052)+(1.038)+(1.075), (I-052)+(1.038)+(1.076), (I-052)+(1.038)+(1.077), (I-052)+(1.038)+(1.078), (I-052)+(1.038)+(1.079), (I-052)+(1.038)+(1.080), (I-052)+(1.038)+(1.081), (I-052)+(1.038)+(1.082), (I-052)+(1.038)+(1.083), (I-052)+(1.038)+(1.084), (I-052)+(1.038)+(1.085), (I-052)+(1.038)+(1.086), (I-052)+(1.038)+(1.087), (I-052)+(1.038)+(1.088), (I-052)+(1.038)+(1.089), (I-052)+(1.038)+(1.090), (I-052)+(1.038)+(1.091), (I-052)+(1.038)+(1.092), (I-052)+(1.038)+(2.001), (I-052)+(1.038)+(2.002), (I-052)+(1.038)+(2.003), (I-052)+(1.038)+(2.004), (I-052)+(1.038)+(2.005), (I-052)+(1.038)+(2.006), (I-052)+(1.038)+(2.007), (I-052)+(1.038)+(2.008), (I-052)+(1.038)+(2.009), (I-052)+(1.038)+(2.010), (I-052)+(1.038)+(2.011), (I-052)+(1.038)+(2.012), (I-052)+(1.038)+(2.013), (I-052)+(1.038)+(2.014), (I-052)+(1.038)+(2.015), (I-052)+(1.038)+(2.016), (I-052)+(1.038)+(2.017), (I-052)+(1.038)+(2.018), (I-052)+(1.038)+(2.019), (I-052)+(1.038)+(2.020), (I-052)+(1.038)+(2.021), (I-052)+(1.038)+(2.022), (I-052)+(1.038)+(2.023), (I-052)+(1.038)+(2.024), (I-052)+(1.038)+(2.025), (I-052)+(1.038)+(2.026), (I-052)+(1.038)+(2.027), (I-052)+(1.038)+(2.028), (I-052)+(1.038)+(2.029), (I-052)+(1.038)+(2.030), (I-052)+(1.038)+(2.031), (I-052)+(1.038)+(2.032), (I-052)+(1.038)+(2.033), (I-052)+(1.038)+(2.034), (I-052)+(1.038)+(2.035), (I-052)+(1.038)+(2.036), (I-052)+(1.038)+(2.037), (I-052)+(1.038)+(2.038), (I-052)+(1.038)+(2.039), (I-052)+(1.038)+(2.040), (I-052)+(1.038)+(2.041), (I-052)+(1.038)+(2.042), (I-052)+(1.038)+(2.043), (I-052)+(1.038)+(2.044), (I-052)+(1.038)+(2.045), (I-052)+(1.038)+(2.046), (I-052)+(1.038)+(2.047), (I-052)+(1.038)+(2.048), (I-052)+(1.038)+(2.049), (I-052)+(1.038)+(2.050), (I-052)+(1.038)+(2.051), (I-052)+(1.038)+(2.052), (I-052)+(1.038)+(2.053), (I-052)+(1.038)+(2.054), (I-052)+(1.038)+(2.055), (I-052)+(1.038)+(2.056), (I-052)+(1.038)+(2.057), (I-052)+(1.038)+(2.058), (I-052)+(1.038)+(2.059), (I-052)+(1.038)+(3.001), (I-052)+(1.038)+(3.002), (I-052)+(1.038)+(3.003), (I-052)+(1.038)+(3.004), (I-052)+(1.038)+(3.005), (I-052)+(1.038)+(3.006), (I-052)+(1.038)+(3.007), (I-052)+(1.038)+(3.008), (I-052)+(1.038)+(3.009), (I-052)+(1.038)+(3.010), (I-052)+(1.038)+(3.011), (I-052)+(1.038)+(3.012), (I-052)+(1.038)+(3.013), (I-052)+(1.038)+(3.014), (I-052)+(1.038)+(3.015), (I-052)+(1.038)+(3.016), (I-052)+(1.038)+(3.017), (I-052)+(1.038)+(3.018), (I-052)+(1.038)+(3.019), (I-052)+(1.038)+(3.020), (I-052)+(1.038)+(3.021), (I-052)+(1.038)+(3.022), (I-052)+(1.038)+(3.023), (I-052)+(1.038)+(3.024), (I-052)+(1.038)+(3.025), (I-052)+(1.038)+(3.026), (I-052)+(1.038)+(3.027), (I-052)+(1.038)+(3.028), (I-052)+(1.038)+(3.029), (I-052)+(1.038)+(3.030), (I-052)+(1.038)+(3.031), (I-052)+(1.038)+(5.001), (I-052)+(1.038)+(5.002), (I-052)+(1.038)+(5.003), (I-052)+(1.038)+(5.004), (I-052)+(1.038)+(5.005), (I-052)+(1.038)+(5.006), (I-052)+(1.038)+(5.007), (I-052)+(1.038)+(5.008), (I-052)+(1.038)+(5.009), (I-052)+(1.038)+(5.010), (I-052)+(1.038)+(5.011), (I-052)+(1.038)+(5.012), (I-052)+(1.038)+(5.013), (I-052)+(1.038)+(5.014), (I-052)+(1.038)+(5.015), (I-052)+(1.038)+(5.016), (I-052)+(1.038)+(5.017), (I-052)+(1.038)+(5.018), (I-052)+(1.038)+(5.019), (I-052)+(1.038)+(5.020), (I-052)+(1.038)+(5.021), (I-052)+(1.038)+(5.022), (I-052)+(1.038)+(5.023), (I-052)+(1.038)+(6.001), (I-052)+(1.038)+(6.002), (I-052)+(1.038)+(6.003), (I-052)+(1.038)+(6.004), (I-052)+(1.038)+(7.001), (I-052)+(1.038)+(7.002), (I-052)+(1.038)+(7.003), (I-052)+(1.038)+(7.004), (I-052)+(1.038)+(7.005), (I-052)+(1.038)+(7.006), (I-052)+(1.038)+(9.001), (I-052)+(1.038)+(9.002), (I-052)+(1.038)+(9.003), (I-052)+(1.038)+(9.004), (I-052)+(1.038)+(9.005), (I-052)+(1.038)+(9.006), (I-052)+(1.038)+(9.007), (I-052)+(1.038)+(9.008), (I-052)+(1.038)+(9.009), (I-052)+(1.038)+(14.001), (I-052)+(1.038)+(14.002), (I-052)+(1.038)+(15.008), (I-052)+(1.038)+(15.011), (I-052)+(1.038)+(15.012), (I-052)+(1.038)+(15.016), (I-052)+(1.038)+(15.025), (I-052)+(1.038)+(15.027), (I-052)+(1.038)+(15.047), (I-052)+(1.038)+(15.063), (I-052)+(1.038)+(15.064), (I-052)+(1.038)+(16.001), (I-052)+(1.038)+(16.002), (I-052)+(1.038)+(16.003), (I-052)+(1.038)+(16.004), (I-052)+(1.038)+(16.005), (I-052)+(1.038)+(16.006), (I-052)+(1.038)+(16.007), (I-052)+(1.038)+(16.008), (I-052)+(1.038)+(17.001), (I-052)+(1.038)+(17.002), (I-052)+(1.038)+(17.003), (I-052)+(1.038)+(17.004), (I-052)+(1.038)+(17.005), (I-052)+(1.038)+(17.006), (I-052)+(1.038)+(17.007), (I-052)+(1.038)+(17.008), (I-052)+(1.038)+(17.009), (I-052)+(1.038)+(17.010), (I-052)+(1.038)+(17.011), (I-052)+(1.038)+(17.012), (I-052)+(1.038)+(18.001), (I-052)+(1.039)+(1.040), (I-052)+(1.039)+(1.041), (I-052)+(1.039)+(1.042), (I-052)+(1.039)+(1.043), (I-052)+(1.039)+(1.044), (I-052)+(1.039)+(1.045), (I-052)+(1.039)+(1.046), (I-052)+(1.039)+(1.047), (I-052)+(1.039)+(1.048), (I-052)+(1.039)+(1.049), (I-052)+(1.039)+(1.050), (I-052)+(1.039)+(1.051), (I-052)+(1.039)+(1.052), (I-052)+(1.039)+(1.053), (I-052)+(1.039)+(1.054), (I-052)+(1.039)+(1.055), (I-052)+(1.039)+(1.056), (I-052)+(1.039)+(1.057), (I-052)+(1.039)+(1.058), (I-052)+(1.039)+(1.059), (I-052)+(1.039)+(1.060), (I-052)+(1.039)+(1.061), (I-052)+(1.039)+(1.062), (I-052)+(1.039)+(1.063), (I-052)+(1.039)+(1.064), (I-052)+(1.039)+(1.065), (I-052)+(1.039)+(1.066), (I-052)+(1.039)+(1.067), (I-052)+(1.039)+(1.068), (I-052)+(1.039)+(1.069), (I-052)+(1.039)+(1.070), (I-052)+(1.039)+(1.071), (I-052)+(1.039)+(1.072), (I-052)+(1.039)+(1.073), (I-052)+(1.039)+(1.074), (I-052)+(1.039)+(1.075), (I-052)+(1.039)+(1.076), (I-052)+(1.039)+(1.077), (I-052)+(1.039)+(1.078), (I-052)+(1.039)+(1.079), (I-052)+(1.039)+(1.080), (I-052)+(1.039)+(1.081), (I-052)+(1.039)+(1.082), (I-052)+(1.039)+(1.083), (I-052)+(1.039)+(1.084), (I-052)+(1.039)+(1.085), (I-052)+(1.039)+(1.086), (I-052)+(1.039)+(1.087), (I-052)+(1.039)+(1.088), (I-052)+(1.039)+(1.089), (I-052)+(1.039)+(1.090), (I-052)+(1.039)+(1.091), (I-052)+(1.039)+(1.092), (I-052)+(1.039)+(2.001), (I-052)+(1.039)+(2.002), (I-052)+(1.039)+(2.003), (I-052)+(1.039)+(2.004), (I-052)+(1.039)+(2.005), (I-052)+(1.039)+(2.006), (I-052)+(1.039)+(2.007), (I-052)+(1.039)+(2.008), (I-052)+(1.039)+(2.009), (I-052)+(1.039)+(2.010), (I-052)+(1.039)+(2.011), (I-052)+(1.039)+(2.012), (I-052)+(1.039)+(2.013), (I-052)+(1.039)+(2.014), (I-052)+(1.039)+(2.015), (I-052)+(1.039)+(2.016), (I-052)+(1.039)+(2.017), (I-052)+(1.039)+(2.018), (I-052)+(1.039)+(2.019), (I-052)+(1.039)+(2.020), (I-052)+(1.039)+(2.021), (I-052)+(1.039)+(2.022), (I-052)+(1.039)+(2.023), (I-052)+(1.039)+(2.024), (I-052)+(1.039)+(2.025), (I-052)+(1.039)+(2.026), (I-052)+(1.039)+(2.027), (I-052)+(1.039)+(2.028), (I-052)+(1.039)+(2.029), (I-052)+(1.039)+(2.030), (I-052)+(1.039)+(2.031), (I-052)+(1.039)+(2.032), (I-052)+(1.039)+(2.033), (I-052)+(1.039)+(2.034), (I-052)+(1.039)+(2.035), (I-052)+(1.039)+(2.036), (I-052)+(1.039)+(2.037), (I-052)+(1.039)+(2.038), (I-052)+(1.039)+(2.039), (I-052)+(1.039)+(2.040), (I-052)+(1.039)+(2.041), (I-052)+(1.039)+(2.042), (I-052)+(1.039)+(2.043), (I-052)+(1.039)+(2.044), (I-052)+(1.039)+(2.045), (I-052)+(1.039)+(2.046), (I-052)+(1.039)+(2.047), (I-052)+(1.039)+(2.048), (I-052)+(1.039)+(2.049), (I-052)+(1.039)+(2.050), (I-052)+(1.039)+(2.051), (I-052)+(1.039)+(2.052), (I-052)+(1.039)+(2.053), (I-052)+(1.039)+(2.054), (I-052)+(1.039)+(2.055), (I-052)+(1.039)+(2.056), (I-052)+(1.039)+(2.057), (I-052)+(1.039)+(2.058), (I-052)+(1.039)+(2.059), (I-052)+(1.039)+(3.001), (I-052)+(1.039)+(3.002), (I-052)+(1.039)+(3.003), (I-052)+(1.039)+(3.004), (I-052)+(1.039)+(3.005), (I-052)+(1.039)+(3.006), (I-052)+(1.039)+(3.007), (I-052)+(1.039)+(3.008), (I-052)+(1.039)+(3.009), (I-052)+(1.039)+(3.010), (I-052)+(1.039)+(3.011), (I-052)+(1.039)+(3.012), (I-052)+(1.039)+(3.013), (I-052)+(1.039)+(3.014), (I-052)+(1.039)+(3.015), (I-052)+(1.039)+(3.016), (I-052)+(1.039)+(3.017), (I-052)+(1.039)+(3.018), (I-052)+(1.039)+(3.019), (I-052)+(1.039)+(3.020), (I-052)+(1.039)+(3.021), (I-052)+(1.039)+(3.022), (I-052)+(1.039)+(3.023), (I-052)+(1.039)+(3.024), (I-052)+(1.039)+(3.025), (I-052)+(1.039)+(3.026), (I-052)+(1.039)+(3.027), (I-052)+(1.039)+(3.028), (I-052)+(1.039)+(3.029), (I-052)+(1.039)+(3.030), (I-052)+(1.039)+(3.031), (I-052)+(1.039)+(5.001), (I-052)+(1.039)+(5.002), (I-052)+(1.039)+(5.003), (I-052)+(1.039)+(5.004), (I-052)+(1.039)+(5.005), (I-052)+(1.039)+(5.006), (I-052)+(1.039)+(5.007), (I-052)+(1.039)+(5.008), (I-052)+(1.039)+(5.009), (I-052)+(1.039)+(5.010), (I-052)+(1.039)+(5.011), (I-052)+(1.039)+(5.012), (I-052)+(1.039)+(5.013), (I-052)+(1.039)+(5.014), (I-052)+(1.039)+(5.015), (I-052)+(1.039)+(5.016), (I-052)+(1.039)+(5.017), (I-052)+(1.039)+(5.018), (I-052)+(1.039)+(5.019), (I-052)+(1.039)+(5.020), (I-052)+(1.039)+(5.021), (I-052)+(1.039)+(5.022), (I-052)+(1.039)+(5.023), (I-052)+(1.039)+(6.001), (I-052)+(1.039)+(6.002), (I-052)+(1.039)+(6.003), (I-052)+(1.039)+(6.004), (I-052)+(1.039)+(7.001), (I-052)+(1.039)+(7.002), (I-052)+(1.039)+(7.003), (I-052)+(1.039)+(7.004), (I-052)+(1.039)+(7.005), (I-052)+(1.039)+(7.006), (I-052)+(1.039)+(9.001), (I-052)+(1.039)+(9.002), (I-052)+(1.039)+(9.003), (I-052)+(1.039)+(9.004), (I-052)+(1.039)+(9.005), (I-052)+(1.039)+(9.006), (I-052)+(1.039)+(9.007), (I-052)+(1.039)+(9.008), (I-052)+(1.039)+(9.009), (I-052)+(1.039)+(14.001), (I-052)+(1.039)+(14.002), (I-052)+(1.039)+(15.008), (I-052)+(1.039)+(15.011), (I-052)+(1.039)+(15.012), (I-052)+(1.039)+(15.016), (I-052)+(1.039)+(15.025), (I-052)+(1.039)+(15.027), (I-052)+(1.039)+(15.047), (I-052)+(1.039)+(15.063), (I-052)+(1.039)+(15.064), (I-052)+(1.039)+(16.001), (I-052)+(1.039)+(16.002), (I-052)+(1.039)+(16.003), (I-052)+(1.039)+(16.004), (I-052)+(1.039)+(16.005), (I-052)+(1.039)+(16.006), (I-052)+(1.039)+(16.007), (I-052)+(1.039)+(16.008), (I-052)+(1.039)+(17.001), (I-052)+(1.039)+(17.002), (I-052)+(1.039)+(17.003), (I-052)+(1.039)+(17.004), (I-052)+(1.039)+(17.005), (I-052)+(1.039)+(17.006), (I-052)+(1.039)+(17.007), (I-052)+(1.039)+(17.008), (I-052)+(1.039)+(17.009), (I-052)+(1.039)+(17.010), (I-052)+(1.039)+(17.011), (I-052)+(1.039)+(17.012), (I-052)+(1.039)+(18.001), (I-052)+(1.040)+(1.041), (I-052)+(1.040)+(1.042), (I-052)+(1.040)+(1.043), (I-052)+(1.040)+(1.044), (I-052)+(1.040)+(1.045), (I-052)+(1.040)+(1.046), (I-052)+(1.040)+(1.047), (I-052)+(1.040)+(1.048), (I-052)+(1.040)+(1.049), (I-052)+(1.040)+(1.050), (I-052)+(1.040)+(1.051), (I-052)+(1.040)+(1.052), (I-052)+(1.040)+(1.053), (I-052)+(1.040)+(1.054), (I-052)+(1.040)+(1.055), (I-052)+(1.040)+(1.056), (I-052)+(1.040)+(1.057), (I-052)+(1.040)+(1.058), (I-052)+(1.040)+(1.059), (I-052)+(1.040)+(1.060), (I-052)+(1.040)+(1.061), (I-052)+(1.040)+(1.062), (I-052)+(1.040)+(1.063), (I-052)+(1.040)+(1.064), (I-052)+(1.040)+(1.065), (I-052)+(1.040)+(1.066), (I-052)+(1.040)+(1.067), (I-052)+(1.040)+(1.068), (I-052)+(1.040)+(1.069), (I-052)+(1.040)+(1.070), (I-052)+(1.040)+(1.071), (I-052)+(1.040)+(1.072), (I-052)+(1.040)+(1.073), (I-052)+(1.040)+(1.074), (I-052)+(1.040)+(1.075), (I-052)+(1.040)+(1.076), (I-052)+(1.040)+(1.077), (I-052)+(1.040)+(1.078), (I-052)+(1.040)+(1.079), (I-052)+(1.040)+(1.080), (I-052)+(1.040)+(1.081), (I-052)+(1.040)+(1.082), (I-052)+(1.040)+(1.083), (I-052)+(1.040)+(1.084), (I-052)+(1.040)+(1.085), (I-052)+(1.040)+(1.086), (I-052)+(1.040)+(1.087), (I-052)+(1.040)+(1.088), (I-052)+(1.040)+(1.089), (I-052)+(1.040)+(1.090), (I-052)+(1.040)+(1.091), (I-052)+(1.040)+(1.092), (I-052)+(1.040)+(2.001), (I-052)+(1.040)+(2.002), (I-052)+(1.040)+(2.003), (I-052)+(1.040)+(2.004), (I-052)+(1.040)+(2.005), (I-052)+(1.040)+(2.006), (I-052)+(1.040)+(2.007), (I-052)+(1.040)+(2.008), (I-052)+(1.040)+(2.009), (I-052)+(1.040)+(2.010), (I-052)+(1.040)+(2.011), (I-052)+(1.040)+(2.012), (I-052)+(1.040)+(2.013), (I-052)+(1.040)+(2.014), (I-052)+(1.040)+(2.015), (I-052)+(1.040)+(2.016), (I-052)+(1.040)+(2.017), (I-052)+(1.040)+(2.018), (I-052)+(1.040)+(2.019), (I-052)+(1.040)+(2.020), (I-052)+(1.040)+(2.021), (I-052)+(1.040)+(2.022), (I-052)+(1.040)+(2.023), (I-052)+(1.040)+(2.024), (I-052)+(1.040)+(2.025), (I-052)+(1.040)+(2.026), (I-052)+(1.040)+(2.027), (I-052)+(1.040)+(2.028), (I-052)+(1.040)+(2.029), (I-052)+(1.040)+(2.030), (I-052)+(1.040)+(2.031), (I-052)+(1.040)+(2.032), (I-052)+(1.040)+(2.033), (I-052)+(1.040)+(2.034), (I-052)+(1.040)+(2.035), (I-052)+(1.040)+(2.036), (I-052)+(1.040)+(2.037), (I-052)+(1.040)+(2.038), (I-052)+(1.040)+(2.039), (I-052)+(1.040)+(2.040), (I-052)+(1.040)+(2.041), (I-052)+(1.040)+(2.042), (I-052)+(1.040)+(2.043), (I-052)+(1.040)+(2.044), (I-052)+(1.040)+(2.045), (I-052)+(1.040)+(2.046), (I-052)+(1.040)+(2.047), (I-052)+(1.040)+(2.048), (I-052)+(1.040)+(2.049), (I-052)+(1.040)+(2.050), (I-052)+(1.040)+(2.051), (I-052)+(1.040)+(2.052), (I-052)+(1.040)+(2.053), (I-052)+(1.040)+(2.054), (I-052)+(1.040)+(2.055), (I-052)+(1.040)+(2.056), (I-052)+(1.040)+(2.057), (I-052)+(1.040)+(2.058), (I-052)+(1.040)+(2.059), (I-052)+(1.040)+(3.001), (I-052)+(1.040)+(3.002), (I-052)+(1.040)+(3.003), (I-052)+(1.040)+(3.004), (I-052)+(1.040)+(3.005), (I-052)+(1.040)+(3.006), (I-052)+(1.040)+(3.007), (I-052)+(1.040)+(3.008), (I-052)+(1.040)+(3.009), (I-052)+(1.040)+(3.010), (I-052)+(1.040)+(3.011), (I-052)+(1.040)+(3.012), (I-052)+(1.040)+(3.013), (I-052)+(1.040)+(3.014), (I-052)+(1.040)+(3.015), (I-052)+(1.040)+(3.016), (I-052)+(1.040)+(3.017), (I-052)+(1.040)+(3.018), (I-052)+(1.040)+(3.019), (I-052)+(1.040)+(3.020), (I-052)+(1.040)+(3.021), (I-052)+(1.040)+(3.022), (I-052)+(1.040)+(3.023), (I-052)+(1.040)+(3.024), (I-052)+(1.040)+(3.025), (I-052)+(1.040)+(3.026), (I-052)+(1.040)+(3.027), (I-052)+(1.040)+(3.028), (I-052)+(1.040)+(3.029), (I-052)+(1.040)+(3.030), (I-052)+(1.040)+(3.031), (I-052)+(1.040)+(5.001), (I-052)+(1.040)+(5.002), (I-052)+(1.040)+(5.003), (I-052)+(1.040)+(5.004), (I-052)+(1.040)+(5.005), (I-052)+(1.040)+(5.006), (I-052)+(1.040)+(5.007), (I-052)+(1.040)+(5.008), (I-052)+(1.040)+(5.009), (I-052)+(1.040)+(5.010), (I-052)+(1.040)+(5.011), (I-052)+(1.040)+(5.012), (I-052)+(1.040)+(5.013), (I-052)+(1.040)+(5.014), (I-052)+(1.040)+(5.015), (I-052)+(1.040)+(5.016), (I-052)+(1.040)+(5.017), (I-052)+(1.040)+(5.018), (I-052)+(1.040)+(5.019), (I-052)+(1.040)+(5.020), (I-052)+(1.040)+(5.021), (I-052)+(1.040)+(5.022), (I-052)+(1.040)+(5.023), (I-052)+(1.040)+(6.001), (I-052)+(1.040)+(6.002), (I-052)+(1.040)+(6.003), (I-052)+(1.040)+(6.004), (I-052)+(1.040)+(7.001), (I-052)+(1.040)+(7.002), (I-052)+(1.040)+(7.003), (I-052)+(1.040)+(7.004), (I-052)+(1.040)+(7.005), (I-052)+(1.040)+(7.006), (I-052)+(1.040)+(9.001), (I-052)+(1.040)+(9.002), (I-052)+(1.040)+(9.003), (I-052)+(1.040)+(9.004), (I-052)+(1.040)+(9.005), (I-052)+(1.040)+(9.006), (I-052)+(1.040)+(9.007), (I-052)+(1.040)+(9.008), (I-052)+(1.040)+(9.009), (I-052)+(1.040)+(14.001), (I-052)+(1.040)+(14.002), (I-052)+(1.040)+(15.008), (I-052)+(1.040)+(15.011), (I-052)+(1.040)+(15.012), (I-052)+(1.040)+(15.016), (I-052)+(1.040)+(15.025), (I-052)+(1.040)+(15.027), (I-052)+(1.040)+(15.047), (I-052)+(1.040)+(15.063), (I-052)+(1.040)+(15.064), (I-052)+(1.040)+(16.001), (I-052)+(1.040)+(16.002), (I-052)+(1.040)+(16.003), (I-052)+(1.040)+(16.004), (I-052)+(1.040)+(16.005), (I-052)+(1.040)+(16.006), (I-052)+(1.040)+(16.007), (I-052)+(1.040)+(16.008), (I-052)+(1.040)+(17.001), (I-052)+(1.040)+(17.002), (I-052)+(1.040)+(17.003), (I-052)+(1.040)+(17.004), (I-052)+(1.040)+(17.005), (I-052)+(1.040)+(17.006), (I-052)+(1.040)+(17.007), (I-052)+(1.040)+(17.008), (I-052)+(1.040)+(17.009), (I-052)+(1.040)+(17.010), (I-052)+(1.040)+(17.011), (I-052)+(1.040)+(17.012), (I-052)+(1.040)+(18.001), (I-052)+(1.041)+(1.042), (I-052)+(1.041)+(1.043), (I-052)+(1.041)+(1.044), (I-052)+(1.041)+(1.045), (I-052)+(1.041)+(1.046), (I-052)+(1.041)+(1.047), (I-052)+(1.041)+(1.048), (I-052)+(1.041)+(1.049), (I-052)+(1.041)+(1.050), (I-052)+(1.041)+(1.051), (I-052)+(1.041)+(1.052), (I-052)+(1.041)+(1.053), (I-052)+(1.041)+(1.054), (I-052)+(1.041)+(1.055), (I-052)+(1.041)+(1.056), (I-052)+(1.041)+(1.057), (I-052)+(1.041)+(1.058), (I-052)+(1.041)+(1.059), (I-052)+(1.041)+(1.060), (I-052)+(1.041)+(1.061), (I-052)+(1.041)+(1.062), (I-052)+(1.041)+(1.063), (I-052)+(1.041)+(1.064), (I-052)+(1.041)+(1.065), (I-052)+(1.041)+(1.066), (I-052)+(1.041)+(1.067), (I-052)+(1.041)+(1.068), (I-052)+(1.041)+(1.069), (I-052)+(1.041)+(1.070), (I-052)+(1.041)+(1.071), (I-052)+(1.041)+(1.072), (I-052)+(1.041)+(1.073), (I-052)+(1.041)+(1.074), (I-052)+(1.041)+(1.075), (I-052)+(1.041)+(1.076), (I-052)+(1.041)+(1.077), (I-052)+(1.041)+(1.078), (I-052)+(1.041)+(1.079), (I-052)+(1.041)+(1.080), (I-052)+(1.041)+(1.081), (I-052)+(1.041)+(1.082), (I-052)+(1.041)+(1.083), (I-052)+(1.041)+(1.084), (I-052)+(1.041)+(1.085), (I-052)+(1.041)+(1.086), (I-052)+(1.041)+(1.087), (I-052)+(1.041)+(1.088), (I-052)+(1.041)+(1.089), (I-052)+(1.041)+(1.090), (I-052)+(1.041)+(1.091), (I-052)+(1.041)+(1.092), (I-052)+(1.041)+(2.001), (I-052)+(1.041)+(2.002), (I-052)+(1.041)+(2.003), (I-052)+(1.041)+(2.004), (I-052)+(1.041)+(2.005), (I-052)+(1.041)+(2.006), (I-052)+(1.041)+(2.007), (I-052)+(1.041)+(2.008), (I-052)+(1.041)+(2.009), (I-052)+(1.041)+(2.010), (I-052)+(1.041)+(2.011), (I-052)+(1.041)+(2.012), (I-052)+(1.041)+(2.013), (I-052)+(1.041)+(2.014), (I-052)+(1.041)+(2.015), (I-052)+(1.041)+(2.016), (I-052)+(1.041)+(2.017), (I-052)+(1.041)+(2.018), (I-052)+(1.041)+(2.019), (I-052)+(1.041)+(2.020), (I-052)+(1.041)+(2.021), (I-052)+(1.041)+(2.022), (I-052)+(1.041)+(2.023), (I-052)+(1.041)+(2.024), (I-052)+(1.041)+(2.025), (I-052)+(1.041)+(2.026), (I-052)+(1.041)+(2.027), (I-052)+(1.041)+(2.028), (I-052)+(1.041)+(2.029), (I-052)+(1.041)+(2.030), (I-052)+(1.041)+(2.031), (I-052)+(1.041)+(2.032), (I-052)+(1.041)+(2.033), (I-052)+(1.041)+(2.034), (I-052)+(1.041)+(2.035), (I-052)+(1.041)+(2.036), (I-052)+(1.041)+(2.037), (I-052)+(1.041)+(2.038), (I-052)+(1.041)+(2.039), (I-052)+(1.041)+(2.040), (I-052)+(1.041)+(2.041), (I-052)+(1.041)+(2.042), (I-052)+(1.041)+(2.043), (I-052)+(1.041)+(2.044), (I-052)+(1.041)+(2.045), (I-052)+(1.041)+(2.046), (I-052)+(1.041)+(2.047), (I-052)+(1.041)+(2.048), (I-052)+(1.041)+(2.049), (I-052)+(1.041)+(2.050), (I-052)+(1.041)+(2.051), (I-052)+(1.041)+(2.052), (I-052)+(1.041)+(2.053), (I-052)+(1.041)+(2.054), (I-052)+(1.041)+(2.055), (I-052)+(1.041)+(2.056), (I-052)+(1.041)+(2.057), (I-052)+(1.041)+(2.058), (I-052)+(1.041)+(2.059), (I-052)+(1.041)+(3.001), (I-052)+(1.041)+(3.002), (I-052)+(1.041)+(3.003), (I-052)+(1.041)+(3.004), (I-052)+(1.041)+(3.005), (I-052)+(1.041)+(3.006), (I-052)+(1.041)+(3.007), (I-052)+(1.041)+(3.008), (I-052)+(1.041)+(3.009), (I-052)+(1.041)+(3.010), (I-052)+(1.041)+(3.011), (I-052)+(1.041)+(3.012), (I-052)+(1.041)+(3.013), (I-052)+(1.041)+(3.014), (I-052)+(1.041)+(3.015), (I-052)+(1.041)+(3.016), (I-052)+(1.041)+(3.017), (I-052)+(1.041)+(3.018), (I-052)+(1.041)+(3.019), (I-052)+(1.041)+(3.020), (I-052)+(1.041)+(3.021), (I-052)+(1.041)+(3.022), (I-052)+(1.041)+(3.023), (I-052)+(1.041)+(3.024), (I-052)+(1.041)+(3.025), (I-052)+(1.041)+(3.026), (I-052)+(1.041)+(3.027), (I-052)+(1.041)+(3.028), (I-052)+(1.041)+(3.029), (I-052)+(1.041)+(3.030), (I-052)+(1.041)+(3.031), (I-052)+(1.041)+(5.001), (I-052)+(1.041)+(5.002), (I-052)+(1.041)+(5.003), (I-052)+(1.041)+(5.004), (I-052)+(1.041)+(5.005), (I-052)+(1.041)+(5.006), (I-052)+(1.041)+(5.007), (I-052)+(1.041)+(5.008), (I-052)+(1.041)+(5.009), (I-052)+(1.041)+(5.010), (I-052)+(1.041)+(5.011), (I-052)+(1.041)+(5.012), (I-052)+(1.041)+(5.013), (I-052)+(1.041)+(5.014), (I-052)+(1.041)+(5.015), (I-052)+(1.041)+(5.016), (I-052)+(1.041)+(5.017), (I-052)+(1.041)+(5.018), (I-052)+(1.041)+(5.019), (I-052)+(1.041)+(5.020), (I-052)+(1.041)+(5.021), (I-052)+(1.041)+(5.022), (I-052)+(1.041)+(5.023), (I-052)+(1.041)+(6.001), (I-052)+(1.041)+(6.002), (I-052)+(1.041)+(6.003), (I-052)+(1.041)+(6.004), (I-052)+(1.041)+(7.001), (I-052)+(1.041)+(7.002), (I-052)+(1.041)+(7.003), (I-052)+(1.041)+(7.004), (I-052)+(1.041)+(7.005), (I-052)+(1.041)+(7.006), (I-052)+(1.041)+(9.001), (I-052)+(1.041)+(9.002), (I-052)+(1.041)+(9.003), (I-052)+(1.041)+(9.004), (I-052)+(1.041)+(9.005), (I-052)+(1.041)+(9.006), (I-052)+(1.041)+(9.007), (I-052)+(1.041)+(9.008), (I-052)+(1.041)+(9.009), (I-052)+(1.041)+(14.001), (I-052)+(1.041)+(14.002), (I-052)+(1.041)+(15.008), (I-052)+(1.041)+(15.011), (I-052)+(1.041)+(15.012), (I-052)+(1.041)+(15.016), (I-052)+(1.041)+(15.025), (I-052)+(1.041)+(15.027), (I-052)+(1.041)+(15.047), (I-052)+(1.041)+(15.063), (I-052)+(1.041)+(15.064), (I-052)+(1.041)+(16.001), (I-052)+(1.041)+(16.002), (I-052)+(1.041)+(16.003), (I-052)+(1.041)+(16.004), (I-052)+(1.041)+(16.005), (I-052)+(1.041)+(16.006), (I-052)+(1.041)+(16.007), (I-052)+(1.041)+(16.008), (I-052)+(1.041)+(17.001), (I-052)+(1.041)+(17.002), (I-052)+(1.041)+(17.003), (I-052)+(1.041)+(17.004), (I-052)+(1.041)+(17.005), (I-052)+(1.041)+(17.006), (I-052)+(1.041)+(17.007), (I-052)+(1.041)+(17.008), (I-052)+(1.041)+(17.009), (I-052)+(1.041)+(17.010), (I-052)+(1.041)+(17.011), (I-052)+(1.041)+(17.012), (I-052)+(1.041)+(18.001), (I-052)+(1.042)+(1.043), (I-052)+(1.042)+(1.044), (I-052)+(1.042)+(1.045), (I-052)+(1.042)+(1.046), (I-052)+(1.042)+(1.047), (I-052)+(1.042)+(1.048), (I-052)+(1.042)+(1.049), (I-052)+(1.042)+(1.050), (I-052)+(1.042)+(1.051), (I-052)+(1.042)+(1.052), (I-052)+(1.042)+(1.053), (I-052)+(1.042)+(1.054), (I-052)+(1.042)+(1.055), (I-052)+(1.042)+(1.056), (I-052)+(1.042)+(1.057), (I-052)+(1.042)+(1.058), (I-052)+(1.042)+(1.059), (I-052)+(1.042)+(1.060), (I-052)+(1.042)+(1.061), (I-052)+(1.042)+(1.062), (I-052)+(1.042)+(1.063), (I-052)+(1.042)+(1.064), (I-052)+(1.042)+(1.065), (I-052)+(1.042)+(1.066), (I-052)+(1.042)+(1.067), (I-052)+(1.042)+(1.068), (I-052)+(1.042)+(1.069), (I-052)+(1.042)+(1.070), (I-052)+(1.042)+(1.071), (I-052)+(1.042)+(1.072), (I-052)+(1.042)+(1.073), (I-052)+(1.042)+(1.074), (I-052)+(1.042)+(1.075), (I-052)+(1.042)+(1.076), (1-052)+(1.042)+(1.077), (I-052)+(1.042)+(1.078), (I-052)+(1.042)+(1.079), (I-052)+(1.042)+(1.080), (I-052)+(1.042)+(1.081), (I-052)+(1.042)+(1.082), (I-052)+(1.042)+(1.083), (I-052)+(1.042)+(1.084), (I-052)+(1.042)+(1.085), (I-052)+(1.042)+(1.086), (I-052)+(1.042)+(1.087), (I-052)+(1.042)+(1.088), (I-052)+(1.042)+(1.089), (I-052)+(1.042)+(1.090), (I-052)+(1.042)+(1.091), (I-052)+(1.042)+(1.092), (I-052)+(1.042)+(2.001), (I-052)+(1.042)+(2.002), (I-052)+(1.042)+(2.003), (I-052)+(1.042)+(2.004), (I-052)+(1.042)+(2.005), (I-052)+(1.042)+(2.006), (I-052)+(1.042)+(2.007), (I-052)+(1.042)+(2.008), (I-052)+(1.042)+(2.009), (I-052)+(1.042)+(2.010), (I-052)+(1.042)+(2.011), (I-052)+(1.042)+(2.012), (I-052)+(1.042)+(2.013), (I-052)+(1.042)+(2.014), (I-052)+(1.042)+(2.015), (I-052)+(1.042)+(2.016), (I-052)+(1.042)+(2.017), (I-052)+(1.042)+(2.018), (I-052)+(1.042)+(2.019), (I-052)+(1.042)+(2.020), (I-052)+(1.042)+(2.021), (I-052)+(1.042)+(2.022), (I-052)+(1.042)+(2.023), (I-052)+(1.042)+(2.024), (I-052)+(1.042)+(2.025), (I-052)+(1.042)+(2.026), (I-052)+(1.042)+(2.027), (I-052)+(1.042)+(2.028), (I-052)+(1.042)+(2.029), (I-052)+(1.042)+(2.030), (I-052)+(1.042)+(2.031), (I-052)+(1.042)+(2.032), (I-052)+(1.042)+(2.033), (I-052)+(1.042)+(2.034), (I-052)+(1.042)+(2.035), (I-052)+(1.042)+(2.036), (I-052)+(1.042)+(2.037), (I-052)+(1.042)+(2.038), (I-052)+(1.042)+(2.039), (I-052)+(1.042)+(2.040), (I-052)+(1.042)+(2.041), (I-052)+(1.042)+(2.042), (I-052)+(1.042)+(2.043), (I-052)+(1.042)+(2.044), (I-052)+(1.042)+(2.045), (I-052)+(1.042)+(2.046), (I-052)+(1.042)+(2.047), (I-052)+(1.042)+(2.048), (I-052)+(1.042)+(2.049), (I-052)+(1.042)+(2.050), (I-052)+(1.042)+(2.051), (I-052)+(1.042)+(2.052), (I-052)+(1.042)+(2.053), (I-052)+(1.042)+(2.054), (I-052)+(1.042)+(2.055), (I-052)+(1.042)+(2.056), (I-052)+(1.042)+(2.057), (I-052)+(1.042)+(2.058), (I-052)+(1.042)+(2.059), (I-052)+(1.042)+(3.001), (I-052)+(1.042)+(3.002), (I-052)+(1.042)+(3.003), (I-052)+(1.042)+(3.004), (I-052)+(1.042)+(3.005), (I-052)+(1.042)+(3.006), (I-052)+(1.042)+(3.007), (I-052)+(1.042)+(3.008), (I-052)+(1.042)+(3.009), (I-052)+(1.042)+(3.010), (I-052)+(1.042)+(3.011), (I-052)+(1.042)+(3.012), (I-052)+(1.042)+(3.013), (I-052)+(1.042)+(3.014), (I-052)+(1.042)+(3.015), (I-052)+(1.042)+(3.016), (I-052)+(1.042)+(3.017), (I-052)+(1.042)+(3.018), (I-052)+(1.042)+(3.019), (I-052)+(1.042)+(3.020), (I-052)+(1.042)+(3.021), (I-052)+(1.042)+(3.022), (I-052)+(1.042)+(3.023), (I-052)+(1.042)+(3.024), (I-052)+(1.042)+(3.025), (I-052)+(1.042)+(3.026), (I-052)+(1.042)+(3.027), (I-052)+(1.042)+(3.028), (I-052)+(1.042)+(3.029), (I-052)+(1.042)+(3.030), (I-052)+(1.042)+(3.031), (I-052)+(1.042)+(5.001), (I-052)+(1.042)+(5.002), (I-052)+(1.042)+(5.003), (I-052)+(1.042)+(5.004), (I-052)+(1.042)+(5.005), (I-052)+(1.042)+(5.006), (I-052)+(1.042)+(5.007), (I-052)+(1.042)+(5.008), (I-052)+(1.042)+(5.009), (I-052)+(1.042)+(5.010), (I-052)+(1.042)+(5.011), (I-052)+(1.042)+(5.012), (I-052)+(1.042)+(5.013), (I-052)+(1.042)+(5.014), (I-052)+(1.042)+(5.015), (I-052)+(1.042)+(5.016), (I-052)+(1.042)+(5.017), (I-052)+(1.042)+(5.018), (I-052)+(1.042)+(5.019), (I-052)+(1.042)+(5.020), (I-052)+(1.042)+(5.021), (I-052)+(1.042)+(5.022), (I-052)+(1.042)+(5.023), (I-052)+(1.042)+(6.001), (I-052)+(1.042)+(6.002), (I-052)+(1.042)+(6.003), (I-052)+(1.042)+(6.004), (I-052)+(1.042)+(7.001), (I-052)+(1.042)+(7.002), (I-052)+(1.042)+(7.003), (I-052)+(1.042)+(7.004), (I-052)+(1.042)+(7.005), (I-052)+(1.042)+(7.006), (I-052)+(1.042)+(9.001), (I-052)+(1.042)+(9.002), (I-052)+(1.042)+(9.003), (I-052)+(1.042)+(9.004), (I-052)+(1.042)+(9.005), (I-052)+(1.042)+(9.006), (I-052)+(1.042)+(9.007), (I-052)+(1.042)+(9.008), (I-052)+(1.042)+(9.009), (I-052)+(1.042)+(14.001), (I-052)+(1.042)+(14.002), (I-052)+(1.042)+(15.008), (I-052)+(1.042)+(15.011), (I-052)+(1.042)+(15.012), (I-052)+(1.042)+(15.016), (I-052)+(1.042)+(15.025), (I-052)+(1.042)+(15.027), (I-052)+(1.042)+(15.047), (I-052)+(1.042)+(15.063), (I-052)+(1.042)+(15.064), (I-052)+(1.042)+(16.001), (I-052)+(1.042)+(16.002), (I-052)+(1.042)+(16.003), (I-052)+(1.042)+(16.004), (I-052)+(1.042)+(16.005), (I-052)+(1.042)+(16.006), (I-052)+(1.042)+(16.007), (I-052)+(1.042)+(16.008), (I-052)+(1.042)+(17.001), (I-052)+(1.042)+(17.002), (I-052)+(1.042)+(17.003), (I-052)+(1.042)+(17.004), (I-052)+(1.042)+(17.005), (I-052)+(1.042)+(17.006), (I-052)+(1.042)+(17.007), (I-052)+(1.042)+(17.008), (I-052)+(1.042)+(17.009), (I-052)+(1.042)+(17.010), (I-052)+(1.042)+(17.011), (I-052)+(1.042)+(17.012), (I-052)+(1.042)+(18.001), (I-052)+(1.043)+(1.044), (I-052)+(1.043)+(1.045), (I-052)+(1.043)+(1.046), (I-052)+(1.043)+(1.047), (I-052)+(1.043)+(1.048), (I-052)+(1.043)+(1.049), (I-052)+(1.043)+(1.050), (I-052)+(1.043)+(1.051), (I-052)+(1.043)+(1.052), (I-052)+(1.043)+(1.053), (I-052)+(1.043)+(1.054), (I-052)+(1.043)+(1.055), (I-052)+(1.043)+(1.056), (I-052)+(1.043)+(1.057), (I-052)+(1.043)+(1.058), (I-052)+(1.043)+(1.059), (I-052)+(1.043)+(1.060), (I-052)+(1.043)+(1.061), (I-052)+(1.043)+(1.062), (I-052)+(1.043)+(1.063), (I-052)+(1.043)+(1.064), (I-052)+(1.043)+(1.065), (I-052)+(1.043)+(1.066), (I-052)+(1.043)+(1.067), (I-052)+(1.043)+(1.068), (I-052)+(1.043)+(1.069), (I-052)+(1.043)+(1.070), (I-052)+(1.043)+(1.071), (I-052)+(1.043)+(1.072), (I-052)+(1.043)+(1.073), (I-052)+(1.043)+(1.074), (I-052)+(1.043)+(1.075), (I-052)+(1.043)+(1.076), (I-052)+(1.043)+(1.077), (I-052)+(1.043)+(1.078), (I-052)+(1.043)+(1.079), (I-052)+(1.043)+(1.080), (I-052)+(1.043)+(1.081), (I-052)+(1.043)+(1.082), (I-052)+(1.043)+(1.083), (I-052)+(1.043)+(1.084), (I-052)+(1.043)+(1.085), (I-052)+(1.043)+(1.086), (I-052)+(1.043)+(1.087), (I-052)+(1.043)+(1.088), (I-052)+(1.043)+(1.089), (I-052)+(1.043)+(1.090), (I-052)+(1.043)+(1.091), (I-052)+(1.043)+(1.092), (I-052)+(1.043)+(2.001), (I-052)+(1.043)+(2.002), (I-052)+(1.043)+(2.003), (I-052)+(1.043)+(2.004), (I-052)+(1.043)+(2.005), (I-052)+(1.043)+(2.006), (I-052)+(1.043)+(2.007), (I-052)+(1.043)+(2.008), (I-052)+(1.043)+(2.009), (I-052)+(1.043)+(2.010), (I-052)+(1.043)+(2.011), (I-052)+(1.043)+(2.012), (I-052)+(1.043)+(2.013), (I-052)+(1.043)+(2.014), (I-052)+(1.043)+(2.015), (I-052)+(1.043)+(2.016), (I-052)+(1.043)+(2.017), (I-052)+(1.043)+(2.018), (I-052)+(1.043)+(2.019), (I-052)+(1.043)+(2.020), (I-052)+(1.043)+(2.021), (I-052)+(1.043)+(2.022), (I-052)+(1.043)+(2.023), (I-052)+(1.043)+(2.024), (I-052)+(1.043)+(2.025), (I-052)+(1.043)+(2.026), (I-052)+(1.043)+(2.027), (I-052)+(1.043)+(2.028), (I-052)+(1.043)+(2.029), (I-052)+(1.043)+(2.030), (I-052)+(1.043)+(2.031), (I-052)+(1.043)+(2.032), (I-052)+(1.043)+(2.033), (I-052)+(1.043)+(2.034), (I-052)+(1.043)+(2.035), (I-052)+(1.043)+(2.036), (I-052)+(1.043)+(2.037), (I-052)+(1.043)+(2.038), (I-052)+(1.043)+(2.039), (I-052)+(1.043)+(2.040), (I-052)+(1.043)+(2.041), (I-052)+(1.043)+(2.042), (I-052)+(1.043)+(2.043), (I-052)+(1.043)+(2.044), (I-052)+(1.043)+(2.045), (I-052)+(1.043)+(2.046), (I-052)+(1.043)+(2.047), (I-052)+(1.043)+(2.048), (I-052)+(1.043)+(2.049), (I-052)+(1.043)+(2.050), (I-052)+(1.043)+(2.051), (I-052)+(1.043)+(2.052), (I-052)+(1.043)+(2.053), (I-052)+(1.043)+(2.054), (I-052)+(1.043)+(2.055), (I-052)+(1.043)+(2.056), (I-052)+(1.043)+(2.057), (I-052)+(1.043)+(2.058), (I-052)+(1.043)+(2.059), (I-052)+(1.043)+(3.001), (I-052)+(1.043)+(3.002), (I-052)+(1.043)+(3.003), (I-052)+(1.043)+(3.004), (I-052)+(1.043)+(3.005), (I-052)+(1.043)+(3.006), (I-052)+(1.043)+(3.007), (I-052)+(1.043)+(3.008), (I-052)+(1.043)+(3.009), (I-052)+(1.043)+(3.010), (I-052)+(1.043)+(3.011), (I-052)+(1.043)+(3.012), (I-052)+(1.043)+(3.013), (I-052)+(1.043)+(3.014), (I-052)+(1.043)+(3.015), (I-052)+(1.043)+(3.016), (I-052)+(1.043)+(3.017), (I-052)+(1.043)+(3.018), (I-052)+(1.043)+(3.019), (I-052)+(1.043)+(3.020), (I-052)+(1.043)+(3.021), (I-052)+(1.043)+(3.022), (I-052)+(1.043)+(3.023), (I-052)+(1.043)+(3.024), (I-052)+(1.043)+(3.025), (I-052)+(1.043)+(3.026), (I-052)+(1.043)+(3.027), (I-052)+(1.043)+(3.028), (I-052)+(1.043)+(3.029), (I-052)+(1.043)+(3.030), (I-052)+(1.043)+(3.031), (I-052)+(1.043)+(5.001), (I-052)+(1.043)+(5.002), (I-052)+(1.043)+(5.003), (I-052)+(1.043)+(5.004), (I-052)+(1.043)+(5.005), (I-052)+(1.043)+(5.006), (I-052)+(1.043)+(5.007), (I-052)+(1.043)+(5.008), (I-052)+(1.043)+(5.009), (I-052)+(1.043)+(5.010), (I-052)+(1.043)+(5.011), (I-052)+(1.043)+(5.012), (I-052)+(1.043)+(5.013), (I-052)+(1.043)+(5.014), (I-052)+(1.043)+(5.015), (I-052)+(1.043)+(5.016), (I-052)+(1.043)+(5.017), (I-052)+(1.043)+(5.018), (I-052)+(1.043)+(5.019), (I-052)+(1.043)+(5.020), (I-052)+(1.043)+(5.021), (I-052)+(1.043)+(5.022), (I-052)+(1.043)+(5.023), (I-052)+(1.043)+(6.001), (I-052)+(1.043)+(6.002), (I-052)+(1.043)+(6.003), (I-052)+(1.043)+(6.004), (I-052)+(1.043)+(7.001), (I-052)+(1.043)+(7.002), (I-052)+(1.043)+(7.003), (I-052)+(1.043)+(7.004), (I-052)+(1.043)+(7.005), (I-052)+(1.043)+(7.006), (I-052)+(1.043)+(9.001), (I-052)+(1.043)+(9.002), (I-052)+(1.043)+(9.003), (I-052)+(1.043)+(9.004), (I-052)+(1.043)+(9.005), (I-052)+(1.043)+(9.006), (I-052)+(1.043)+(9.007), (I-052)+(1.043)+(9.008), (I-052)+(1.043)+(9.009), (I-052)+(1.043)+(14.001), (I-052)+(1.043)+(14.002), (I-052)+(1.043)+(15.008), (I-052)+(1.043)+(15.011), (I-052)+(1.043)+(15.012), (I-052)+(1.043)+(15.016), (I-052)+(1.043)+(15.025), (I-052)+(1.043)+(15.027), (I-052)+(1.043)+(15.047), (I-052)+(1.043)+(15.063), (I-052)+(1.043)+(15.064), (I-052)+(1.043)+(16.001), (I-052)+(1.043)+(16.002), (I-052)+(1.043)+(16.003), (I-052)+(1.043)+(16.004), (I-052)+(1.043)+(16.005), (I-052)+(1.043)+(16.006), (I-052)+(1.043)+(16.007), (I-052)+(1.043)+(16.008), (I-052)+(1.043)+(17.001), (I-052)+(1.043)+(17.002), (I-052)+(1.043)+(17.003), (I-052)+(1.043)+(17.004), (I-052)+(1.043)+(17.005), (I-052)+(1.043)+(17.006), (I-052)+(1.043)+(17.007), (I-052)+(1.043)+(17.008), (I-052)+(1.043)+(17.009), (I-052)+(1.043)+(17.010), (I-052)+(1.043)+(17.011), (I-052)+(1.043)+(17.012), (I-052)+(1.043)+(18.001), (I-052)+(1.044)+(1.045), (I-052)+(1.044)+(1.046), (I-052)+(1.044)+(1.047), (I-052)+(1.044)+(1.048), (I-052)+(1.044)+(1.049), (I-052)+(1.044)+(1.050), (I-052)+(1.044)+(1.051), (I-052)+(1.044)+(1.052), (I-052)+(1.044)+(1.053), (I-052)+(1.044)+(1.054), (I-052)+(1.044)+(1.055), (I-052)+(1.044)+(1.056), (I-052)+(1.044)+(1.057), (I-052)+(1.044)+(1.058), (I-052)+(1.044)+(1.059), (I-052)+(1.044)+(1.060), (I-052)+(1.044)+(1.061), (I-052)+(1.044)+(1.062), (I-052)+(1.044)+(1.063), (I-052)+(1.044)+(1.064), (I-052)+(1.044)+(1.065), (I-052)+(1.044)+(1.066), (I-052)+(1.044)+(1.067), (I-052)+(1.044)+(1.068), (I-052)+(1.044)+(1.069), (I-052)+(1.044)+(1.070), (I-052)+(1.044)+(1.071), (I-052)+(1.044)+(1.072), (I-052)+(1.044)+(1.073), (I-052)+(1.044)+(1.074), (I-052)+(1.044)+(1.075), (I-052)+(1.044)+(1.076), (I-052)+(1.044)+(1.077), (I-052)+(1.044)+(1.078), (I-052)+(1.044)+(1.079), (I-052)+(1.044)+(1.080), (I-052)+(1.044)+(1.081), (I-052)+(1.044)+(1.082), (I-052)+(1.044)+(1.083), (I-052)+(1.044)+(1.084), (I-052)+(1.044)+(1.085), (I-052)+(1.044)+(1.086), (I-052)+(1.044)+(1.087), (I-052)+(1.044)+(1.088), (I-052)+(1.044)+(1.089), (I-052)+(1.044)+(1.090), (I-052)+(1.044)+(1.091), (I-052)+(1.044)+(1.092), (I-052)+(1.044)+(2.001), (I-052)+(1.044)+(2.002), (I-052)+(1.044)+(2.003), (I-052)+(1.044)+(2.004), (I-052)+(1.044)+(2.005), (I-052)+(1.044)+(2.006), (I-052)+(1.044)+(2.007), (I-052)+(1.044)+(2.008), (I-052)+(1.044)+(2.009), (I-052)+(1.044)+(2.010), (I-052)+(1.044)+(2.011), (I-052)+(1.044)+(2.012), (I-052)+(1.044)+(2.013), (I-052)+(1.044)+(2.014), (I-052)+(1.044)+(2.015), (I-052)+(1.044)+(2.016), (I-052)+(1.044)+(2.017), (I-052)+(1.044)+(2.018), (I-052)+(1.044)+(2.019), (I-052)+(1.044)+(2.020), (I-052)+(1.044)+(2.021), (I-052)+(1.044)+(2.022), (I-052)+(1.044)+(2.023), (I-052)+(1.044)+(2.024), (I-052)+(1.044)+(2.025), (I-052)+(1.044)+(2.026), (I-052)+(1.044)+(2.027), (I-052)+(1.044)+(2.028), (I-052)+(1.044)+(2.029), (I-052)+(1.044)+(2.030), (I-052)+(1.044)+(2.031), (I-052)+(1.044)+(2.032), (I-052)+(1.044)+(2.033), (I-052)+(1.044)+(2.034), (I-052)+(1.044)+(2.035), (I-052)+(1.044)+(2.036), (I-052)+(1.044)+(2.037), (I-052)+(1.044)+(2.038), (I-052)+(1.044)+(2.039), (I-052)+(1.044)+(2.040), (I-052)+(1.044)+(2.041), (I-052)+(1.044)+(2.042), (I-052)+(1.044)+(2.043), (I-052)+(1.044)+(2.044), (I-052)+(1.044)+(2.045), (I-052)+(1.044)+(2.046), (I-052)+(1.044)+(2.047), (I-052)+(1.044)+(2.048), (I-052)+(1.044)+(2.049), (I-052)+(1.044)+(2.050), (I-052)+(1.044)+(2.051), (I-052)+(1.044)+(2.052), (I-052)+(1.044)+(2.053), (I-052)+(1.044)+(2.054), (I-052)+(1.044)+(2.055), (I-052)+(1.044)+(2.056), (I-052)+(1.044)+(2.057), (I-052)+(1.044)+(2.058), (I-052)+(1.044)+(2.059), (I-052)+(1.044)+(3.001), (I-052)+(1.044)+(3.002), (I-052)+(1.044)+(3.003), (I-052)+(1.044)+(3.004), (I-052)+(1.044)+(3.005), (I-052)+(1.044)+(3.006), (I-052)+(1.044)+(3.007), (I-052)+(1.044)+(3.008), (I-052)+(1.044)+(3.009), (I-052)+(1.044)+(3.010), (I-052)+(1.044)+(3.011), (I-052)+(1.044)+(3.012), (I-052)+(1.044)+(3.013), (I-052)+(1.044)+(3.014), (I-052)+(1.044)+(3.015), (I-052)+(1.044)+(3.016), (I-052)+(1.044)+(3.017), (I-052)+(1.044)+(3.018), (I-052)+(1.044)+(3.019), (I-052)+(1.044)+(3.020), (I-052)+(1.044)+(3.021), (I-052)+(1.044)+(3.022), (I-052)+(1.044)+(3.023), (I-052)+(1.044)+(3.024), (I-052)+(1.044)+(3.025), (I-052)+(1.044)+(3.026), (I-052)+(1.044)+(3.027), (I-052)+(1.044)+(3.028), (I-052)+(1.044)+(3.029), (I-052)+(1.044)+(3.030), (I-052)+(1.044)+(3.031), (I-052)+(1.044)+(5.001), (I-052)+(1.044)+(5.002), (I-052)+(1.044)+(5.003), (I-052)+(1.044)+(5.004), (I-052)+(1.044)+(5.005), (I-052)+(1.044)+(5.006), (I-052)+(1.044)+(5.007), (I-052)+(1.044)+(5.008), (I-052)+(1.044)+(5.009), (I-052)+(1.044)+(5.010), (I-052)+(1.044)+(5.011), (I-052)+(1.044)+(5.012), (I-052)+(1.044)+(5.013), (I-052)+(1.044)+(5.014), (I-052)+(1.044)+(5.015), (I-052)+(1.044)+(5.016), (I-052)+(1.044)+(5.017), (I-052)+(1.044)+(5.018), (I-052)+(1.044)+(5.019), (I-052)+(1.044)+(5.020), (I-052)+(1.044)+(5.021), (I-052)+(1.044)+(5.022), (I-052)+(1.044)+(5.023), (I-052)+(1.044)+(6.001), (I-052)+(1.044)+(6.002), (I-052)+(1.044)+(6.003), (I-052)+(1.044)+(6.004), (I-052)+(1.044)+(7.001), (I-052)+(1.044)+(7.002), (I-052)+(1.044)+(7.003), (I-052)+(1.044)+(7.004), (I-052)+(1.044)+(7.005), (I-052)+(1.044)+(7.006), (I-052)+(1.044)+(9.001), (I-052)+(1.044)+(9.002), (I-052)+(1.044)+(9.003), (I-052)+(1.044)+(9.004), (I-052)+(1.044)+(9.005), (I-052)+(1.044)+(9.006), (I-052)+(1.044)+(9.007), (I-052)+(1.044)+(9.008), (I-052)+(1.044)+(9.009), (I-052)+(1.044)+(14.001), (I-052)+(1.044)+(14.002), (I-052)+(1.044)+(15.008), (I-052)+(1.044)+(15.011), (I-052)+(1.044)+(15.012), (I-052)+(1.044)+(15.016), (I-052)+(1.044)+(15.025), (I-052)+(1.044)+(15.027), (I-052)+(1.044)+(15.047), (I-052)+(1.044)+(15.063), (I-052)+(1.044)+(15.064), (I-052)+(1.044)+(16.001), (I-052)+(1.044)+(16.002), (I-052)+(1.044)+(16.003), (I-052)+(1.044)+(16.004), (I-052)+(1.044)+(16.005), (I-052)+(1.044)+(16.006), (I-052)+(1.044)+(16.007), (I-052)+(1.044)+(16.008), (I-052)+(1.044)+(17.001), (I-052)+(1.044)+(17.002), (I-052)+(1.044)+(17.003), (I-052)+(1.044)+(17.004), (I-052)+(1.044)+(17.005), (I-052)+(1.044)+(17.006), (I-052)+(1.044)+(17.007), (I-052)+(1.044)+(17.008), (I-052)+(1.044)+(17.009), (I-052)+(1.044)+(17.010), (I-052)+(1.044)+(17.011), (I-052)+(1.044)+(17.012), (I-052)+(1.044)+(18.001), (I-052)+(1.045)+(1.046), (I-052)+(1.045)+(1.047), (I-052)+(1.045)+(1.048), (I-052)+(1.045)+(1.049), (I-052)+(1.045)+(1.050), (I-052)+(1.045)+(1.051), (I-052)+(1.045)+(1.052), (I-052)+(1.045)+(1.053), (I-052)+(1.045)+(1.054), (I-052)+(1.045)+(1.055), (I-052)+(1.045)+(1.056), (I-052)+(1.045)+(1.057), (I-052)+(1.045)+(1.058), (I-052)+(1.045)+(1.059), (I-052)+(1.045)+(1.060), (I-052)+(1.045)+(1.061), (I-052)+(1.045)+(1.062), (I-052)+(1.045)+(1.063), (I-052)+(1.045)+(1.064), (I-052)+(1.045)+(1.065), (I-052)+(1.045)+(1.066), (I-052)+(1.045)+(1.067), (I-052)+(1.045)+(1.068), (I-052)+(1.045)+(1.069), (I-052)+(1.045)+(1.070), (I-052)+(1.045)+(1.071), (I-052)+(1.045)+(1.072), (I-052)+(1.045)+(1.073), (I-052)+(1.045)+(1.074), (I-052)+(1.045)+(1.075), (I-052)+(1.045)+(1.076), (I-052)+(1.045)+(1.077), (I-052)+(1.045)+(1.078), (I-052)+(1.045)+(1.079), (I-052)+(1.045)+(1.080), (I-052)+(1.045)+(1.081), (I-052)+(1.045)+(1.082), (I-052)+(1.045)+(1.083), (I-052)+(1.045)+(1.084), (I-052)+(1.045)+(1.085), (I-052)+(1.045)+(1.086), (I-052)+(1.045)+(1.087), (I-052)+(1.045)+(1.088), (I-052)+(1.045)+(1.089), (I-052)+(1.045)+(1.090), (I-052)+(1.045)+(1.091), (I-052)+(1.045)+(1.092), (I-052)+(1.045)+(2.001), (I-052)+(1.045)+(2.002), (I-052)+(1.045)+(2.003), (I-052)+(1.045)+(2.004), (I-052)+(1.045)+(2.005), (I-052)+(1.045)+(2.006), (I-052)+(1.045)+(2.007), (I-052)+(1.045)+(2.008), (I-052)+(1.045)+(2.009), (I-052)+(1.045)+(2.010), (I-052)+(1.045)+(2.011), (I-052)+(1.045)+(2.012), (I-052)+(1.045)+(2.013), (I-052)+(1.045)+(2.014), (I-052)+(1.045)+(2.015), (I-052)+(1.045)+(2.016), (I-052)+(1.045)+(2.017), (I-052)+(1.045)+(2.018), (I-052)+(1.045)+(2.019), (I-052)+(1.045)+(2.020), (I-052)+(1.045)+(2.021), (I-052)+(1.045)+(2.022), (I-052)+(1.045)+(2.023), (I-052)+(1.045)+(2.024), (I-052)+(1.045)+(2.025), (I-052)+(1.045)+(2.026), (I-052)+(1.045)+(2.027), (I-052)+(1.045)+(2.028), (I-052)+(1.045)+(2.029), (I-052)+(1.045)+(2.030), (I-052)+(1.045)+(2.031), (I-052)+(1.045)+(2.032), (I-052)+(1.045)+(2.033), (I-052)+(1.045)+(2.034), (I-052)+(1.045)+(2.035), (I-052)+(1.045)+(2.036), (I-052)+(1.045)+(2.037), (I-052)+(1.045)+(2.038), (I-052)+(1.045)+(2.039), (I-052)+(1.045)+(2.040), (I-052)+(1.045)+(2.041), (I-052)+(1.045)+(2.042), (I-052)+(1.045)+(2.043), (I-052)+(1.045)+(2.044), (I-052)+(1.045)+(2.045), (I-052)+(1.045)+(2.046), (I-052)+(1.045)+(2.047), (I-052)+(1.045)+(2.048), (I-052)+(1.045)+(2.049), (I-052)+(1.045)+(2.050), (I-052)+(1.045)+(2.051), (I-052)+(1.045)+(2.052), (I-052)+(1.045)+(2.053), (I-052)+(1.045)+(2.054), (I-052)+(1.045)+(2.055), (I-052)+(1.045)+(2.056), (I-052)+(1.045)+(2.057), (I-052)+(1.045)+(2.058), (I-052)+(1.045)+(2.059), (I-052)+(1.045)+(3.001), (I-052)+(1.045)+(3.002), (I-052)+(1.045)+(3.003), (I-052)+(1.045)+(3.004), (I-052)+(1.045)+(3.005), (I-052)+(1.045)+(3.006), (I-052)+(1.045)+(3.007), (I-052)+(1.045)+(3.008), (I-052)+(1.045)+(3.009), (I-052)+(1.045)+(3.010), (I-052)+(1.045)+(3.011), (I-052)+(1.045)+(3.012), (I-052)+(1.045)+(3.013), (I-052)+(1.045)+(3.014), (I-052)+(1.045)+(3.015), (I-052)+(1.045)+(3.016), (I-052)+(1.045)+(3.017), (I-052)+(1.045)+(3.018), (I-052)+(1.045)+(3.019), (I-052)+(1.045)+(3.020), (I-052)+(1.045)+(3.021), (I-052)+(1.045)+(3.022), (I-052)+(1.045)+(3.023), (I-052)+(1.045)+(3.024), (I-052)+(1.045)+(3.025), (I-052)+(1.045)+(3.026), (I-052)+(1.045)+(3.027), (I-052)+(1.045)+(3.028), (I-052)+(1.045)+(3.029), (I-052)+(1.045)+(3.030), (I-052)+(1.045)+(3.031), (I-052)+(1.045)+(5.001), (I-052)+(1.045)+(5.002), (I-052)+(1.045)+(5.003), (I-052)+(1.045)+(5.004), (I-052)+(1.045)+(5.005), (I-052)+(1.045)+(5.006), (I-052)+(1.045)+(5.007), (I-052)+(1.045)+(5.008), (I-052)+(1.045)+(5.009), (I-052)+(1.045)+(5.010), (I-052)+(1.045)+(5.011), (I-052)+(1.045)+(5.012), (I-052)+(1.045)+(5.013), (I-052)+(1.045)+(5.014), (I-052)+(1.045)+(5.015), (I-052)+(1.045)+(5.016), (I-052)+(1.045)+(5.017), (I-052)+(1.045)+(5.018), (I-052)+(1.045)+(5.019), (I-052)+(1.045)+(5.020), (I-052)+(1.045)+(5.021), (I-052)+(1.045)+(5.022), (I-052)+(1.045)+(5.023), (I-052)+(1.045)+(6.001), (I-052)+(1.045)+(6.002), (I-052)+(1.045)+(6.003), (I-052)+(1.045)+(6.004), (I-052)+(1.045)+(7.001), (I-052)+(1.045)+(7.002), (I-052)+(1.045)+(7.003), (I-052)+(1.045)+(7.004), (I-052)+(1.045)+(7.005), (I-052)+(1.045)+(7.006), (I-052)+(1.045)+(9.001), (I-052)+(1.045)+(9.002), (I-052)+(1.045)+(9.003), (I-052)+(1.045)+(9.004), (I-052)+(1.045)+(9.005), (I-052)+(1.045)+(9.006), (I-052)+(1.045)+(9.007), (I-052)+(1.045)+(9.008), (I-052)+(1.045)+(9.009), (I-052)+(1.045)+(14.001), (I-052)+(1.045)+(14.002), (I-052)+(1.045)+(15.008), (I-052)+(1.045)+(15.011), (I-052)+(1.045)+(15.012), (I-052)+(1.045)+(15.016), (I-052)+(1.045)+(15.025), (I-052)+(1.045)+(15.027), (I-052)+(1.045)+(15.047), (I-052)+(1.045)+(15.063), (I-052)+(1.045)+(15.064), (I-052)+(1.045)+(16.001), (I-052)+(1.045)+(16.002), (I-052)+(1.045)+(16.003), (I-052)+(1.045)+(16.004), (I-052)+(1.045)+(16.005), (I-052)+(1.045)+(16.006), (I-052)+(1.045)+(16.007), (I-052)+(1.045)+(16.008), (I-052)+(1.045)+(17.001), (I-052)+(1.045)+(17.002), (I-052)+(1.045)+(17.003), (I-052)+(1.045)+(17.004), (I-052)+(1.045)+(17.005), (I-052)+(1.045)+(17.006), (I-052)+(1.045)+(17.007), (I-052)+(1.045)+(17.008), (I-052)+(1.045)+(17.009), (I-052)+(1.045)+(17.010), (I-052)+(1.045)+(17.011), (I-052)+(1.045)+(17.012), (I-052)+(1.045)+(18.001), (I-052)+(1.046)+(1.047), (I-052)+(1.046)+(1.048), (I-052)+(1.046)+(1.049), (I-052)+(1.046)+(1.050), (I-052)+(1.046)+(1.051), (I-052)+(1.046)+(1.052), (I-052)+(1.046)+(1.053), (I-052)+(1.046)+(1.054), (I-052)+(1.046)+(1.055), (I-052)+(1.046)+(1.056), (I-052)+(1.046)+(1.057), (I-052)+(1.046)+(1.058), (I-052)+(1.046)+(1.059), (I-052)+(1.046)+(1.060), (I-052)+(1.046)+(1.061), (I-052)+(1.046)+(1.062), (I-052)+(1.046)+(1.063), (I-052)+(1.046)+(1.064), (I-052)+(1.046)+(1.065), (I-052)+(1.046)+(1.066), (I-052)+(1.046)+(1.067), (I-052)+(1.046)+(1.068), (I-052)+(1.046)+(1.069), (I-052)+(1.046)+(1.070), (I-052)+(1.046)+(1.071), (I-052)+(1.046)+(1.072), (I-052)+(1.046)+(1.073), (I-052)+(1.046)+(1.074), (I-052)+(1.046)+(1.075), (I-052)+(1.046)+(1.076), (I-052)+(1.046)+(1.077), (I-052)+(1.046)+(1.078), (I-052)+(1.046)+(1.079), (I-052)+(1.046)+(1.080), (I-052)+(1.046)+(1.081), (I-052)+(1.046)+(1.082), (I-052)+(1.046)+(1.083), (I-052)+(1.046)+(1.084), (I-052)+(1.046)+(1.085), (I-052)+(1.046)+(1.086), (I-052)+(1.046)+(1.087), (I-052)+(1.046)+(1.088), (I-052)+(1.046)+(1.089), (I-052)+(1.046)+(1.090), (I-052)+(1.046)+(1.091), (I-052)+(1.046)+(1.092), (I-052)+(1.046)+(2.001), (I-052)+(1.046)+(2.002), (I-052)+(1.046)+(2.003), (I-052)+(1.046)+(2.004), (I-052)+(1.046)+(2.005), (I-052)+(1.046)+(2.006), (I-052)+(1.046)+(2.007), (I-052)+(1.046)+(2.008), (I-052)+(1.046)+(2.009), (I-052)+(1.046)+(2.010), (I-052)+(1.046)+(2.011), (I-052)+(1.046)+(2.012), (I-052)+(1.046)+(2.013), (I-052)+(1.046)+(2.014), (I-052)+(1.046)+(2.015), (I-052)+(1.046)+(2.016), (I-052)+(1.046)+(2.017), (I-052)+(1.046)+(2.018), (I-052)+(1.046)+(2.019), (I-052)+(1.046)+(2.020), (I-052)+(1.046)+(2.021), (I-052)+(1.046)+(2.022), (I-052)+(1.046)+(2.023), (I-052)+(1.046)+(2.024), (I-052)+(1.046)+(2.025), (I-052)+(1.046)+(2.026), (I-052)+(1.046)+(2.027), (I-052)+(1.046)+(2.028), (I-052)+(1.046)+(2.029), (I-052)+(1.046)+(2.030), (I-052)+(1.046)+(2.031), (I-052)+(1.046)+(2.032), (I-052)+(1.046)+(2.033), (I-052)+(1.046)+(2.034), (I-052)+(1.046)+(2.035), (I-052)+(1.046)+(2.036), (I-052)+(1.046)+(2.037), (I-052)+(1.046)+(2.038), (I-052)+(1.046)+(2.039), (I-052)+(1.046)+(2.040), (I-052)+(1.046)+(2.041), (I-052)+(1.046)+(2.042), (I-052)+(1.046)+(2.043), (I-052)+(1.046)+(2.044), (I-052)+(1.046)+(2.045), (I-052)+(1.046)+(2.046), (I-052)+(1.046)+(2.047), (I-052)+(1.046)+(2.048), (I-052)+(1.046)+(2.049), (I-052)+(1.046)+(2.050), (I-052)+(1.046)+(2.051), (I-052)+(1.046)+(2.052), (I-052)+(1.046)+(2.053), (I-052)+(1.046)+(2.054), (I-052)+(1.046)+(2.055), (I-052)+(1.046)+(2.056), (I-052)+(1.046)+(2.057), (I-052)+(1.046)+(2.058), (I-052)+(1.046)+(2.059), (I-052)+(1.046)+(3.001), (I-052)+(1.046)+(3.002), (I-052)+(1.046)+(3.003), (I-052)+(1.046)+(3.004), (I-052)+(1.046)+(3.005), (I-052)+(1.046)+(3.006), (I-052)+(1.046)+(3.007), (I-052)+(1.046)+(3.008), (I-052)+(1.046)+(3.009), (I-052)+(1.046)+(3.010), (I-052)+(1.046)+(3.011), (I-052)+(1.046)+(3.012), (I-052)+(1.046)+(3.013), (I-052)+(1.046)+(3.014), (I-052)+(1.046)+(3.015), (I-052)+(1.046)+(3.016), (I-052)+(1.046)+(3.017), (I-052)+(1.046)+(3.018), (I-052)+(1.046)+(3.019), (I-052)+(1.046)+(3.020), (I-052)+(1.046)+(3.021), (I-052)+(1.046)+(3.022), (I-052)+(1.046)+(3.023), (I-052)+(1.046)+(3.024), (I-052)+(1.046)+(3.025), (I-052)+(1.046)+(3.026), (I-052)+(1.046)+(3.027), (I-052)+(1.046)+(3.028), (I-052)+(1.046)+(3.029), (I-052)+(1.046)+(3.030), (I-052)+(1.046)+(3.031), (I-052)+(1.046)+(5.001), (I-052)+(1.046)+(5.002), (I-052)+(1.046)+(5.003), (I-052)+(1.046)+(5.004), (I-052)+(1.046)+(5.005), (I-052)+(1.046)+(5.006), (I-052)+(1.046)+(5.007), (I-052)+(1.046)+(5.008), (I-052)+(1.046)+(5.009), (I-052)+(1.046)+(5.010), (I-052)+(1.046)+(5.011), (I-052)+(1.046)+(5.012), (I-052)+(1.046)+(5.013), (I-052)+(1.046)+(5.014), (I-052)+(1.046)+(5.015), (I-052)+(1.046)+(5.016), (I-052)+(1.046)+(5.017), (I-052)+(1.046)+(5.018), (I-052)+(1.046)+(5.019), (I-052)+(1.046)+(5.020), (I-052)+(1.046)+(5.021), (I-052)+(1.046)+(5.022), (I-052)+(1.046)+(5.023), (I-052)+(1.046)+(6.001), (I-052)+(1.046)+(6.002), (I-052)+(1.046)+(6.003), (I-052)+(1.046)+(6.004), (I-052)+(1.046)+(7.001), (I-052)+(1.046)+(7.002), (I-052)+(1.046)+(7.003), (I-052)+(1.046)+(7.004), (I-052)+(1.046)+(7.005), (I-052)+(1.046)+(7.006), (I-052)+(1.046)+(9.001), (I-052)+(1.046)+(9.002), (I-052)+(1.046)+(9.003), (I-052)+(1.046)+(9.004), (I-052)+(1.046)+(9.005), (I-052)+(1.046)+(9.006), (I-052)+(1.046)+(9.007), (I-052)+(1.046)+(9.008), (I-052)+(1.046)+(9.009), (I-052)+(1.046)+(14.001), (I-052)+(1.046)+(14.002), (I-052)+(1.046)+(15.008), (I-052)+(1.046)+(15.011), (I-052)+(1.046)+(15.012), (I-052)+(1.046)+(15.016), (I-052)+(1.046)+(15.025), (I-052)+(1.046)+(15.027), (I-052)+(1.046)+(15.047), (I-052)+(1.046)+(15.063), (I-052)+(1.046)+(15.064), (I-052)+(1.046)+(16.001), (I-052)+(1.046)+(16.002), (I-052)+(1.046)+(16.003), (I-052)+(1.046)+(16.004), (I-052)+(1.046)+(16.005), (I-052)+(1.046)+(16.006), (I-052)+(1.046)+(16.007), (I-052)+(1.046)+(16.008), (I-052)+(1.046)+(17.001), (I-052)+(1.046)+(17.002), (I-052)+(1.046)+(17.003), (I-052)+(1.046)+(17.004), (I-052)+(1.046)+(17.005), (I-052)+(1.046)+(17.006), (I-052)+(1.046)+(17.007), (I-052)+(1.046)+(17.008), (I-052)+(1.046)+(17.009), (I-052)+(1.046)+(17.010), (I-052)+(1.046)+(17.011), (I-052)+(1.046)+(17.012), (I-052)+(1.046)+(18.001), (I-052)+(1.047)+(1.048), (I-052)+(1.047)+(1.049), (I-052)+(1.047)+(1.050), (I-052)+(1.047)+(1.051), (I-052)+(1.047)+(1.052), (I-052)+(1.047)+(1.053), (I-052)+(1.047)+(1.054), (I-052)+(1.047)+(1.055), (I-052)+(1.047)+(1.056), (I-052)+(1.047)+(1.057), (I-052)+(1.047)+(1.058), (I-052)+(1.047)+(1.059), (I-052)+(1.047)+(1.060), (I-052)+(1.047)+(1.061), (I-052)+(1.047)+(1.062), (I-052)+(1.047)+(1.063), (I-052)+(1.047)+(1.064), (I-052)+(1.047)+(1.065), (I-052)+(1.047)+(1.066), (I-052)+(1.047)+(1.067), (I-052)+(1.047)+(1.068), (I-052)+(1.047)+(1.069), (I-052)+(1.047)+(1.070), (I-052)+(1.047)+(1.071), (I-052)+(1.047)+(1.072), (I-052)+(1.047)+(1.073), (I-052)+(1.047)+(1.074), (I-052)+(1.047)+(1.075), (I-052)+(1.047)+(1.076), (I-052)+(1.047)+(1.077), (I-052)+(1.047)+(1.078), (I-052)+(1.047)+(1.079), (I-052)+(1.047)+(1.080), (I-052)+(1.047)+(1.081), (I-052)+(1.047)+(1.082), (I-052)+(1.047)+(1.083), (I-052)+(1.047)+(1.084), (I-052)+(1.047)+(1.085), (I-052)+(1.047)+(1.086), (I-052)+(1.047)+(1.087), (I-052)+(1.047)+(1.088), (I-052)+(1.047)+(1.089), (I-052)+(1.047)+(1.090), (I-052)+(1.047)+(1.091), (I-052)+(1.047)+(1.092), (I-052)+(1.047)+(2.001), (I-052)+(1.047)+(2.002), (I-052)+(1.047)+(2.003), (I-052)+(1.047)+(2.004), (I-052)+(1.047)+(2.005), (I-052)+(1.047)+(2.006), (I-052)+(1.047)+(2.007), (I-052)+(1.047)+(2.008), (I-052)+(1.047)+(2.009), (I-052)+(1.047)+(2.010), (I-052)+(1.047)+(2.011), (I-052)+(1.047)+(2.012), (I-052)+(1.047)+(2.013), (I-052)+(1.047)+(2.014), (I-052)+(1.047)+(2.015), (I-052)+(1.047)+(2.016), (I-052)+(1.047)+(2.017), (I-052)+(1.047)+(2.018), (I-052)+(1.047)+(2.019), (I-052)+(1.047)+(2.020), (I-052)+(1.047)+(2.021), (I-052)+(1.047)+(2.022), (I-052)+(1.047)+(2.023), (I-052)+(1.047)+(2.024), (I-052)+(1.047)+(2.025), (I-052)+(1.047)+(2.026), (I-052)+(1.047)+(2.027), (I-052)+(1.047)+(2.028), (I-052)+(1.047)+(2.029), (I-052)+(1.047)+(2.030), (I-052)+(1.047)+(2.031), (I-052)+(1.047)+(2.032), (I-052)+(1.047)+(2.033), (I-052)+(1.047)+(2.034), (I-052)+(1.047)+(2.035), (I-052)+(1.047)+(2.036), (I-052)+(1.047)+(2.037), (I-052)+(1.047)+(2.038), (I-052)+(1.047)+(2.039), (I-052)+(1.047)+(2.040), (I-052)+(1.047)+(2.041), (I-052)+(1.047)+(2.042), (I-052)+(1.047)+(2.043), (I-052)+(1.047)+(2.044), (I-052)+(1.047)+(2.045), (I-052)+(1.047)+(2.046), (1-052)+(1.047)+(2.047), (I-052)+(1.047)+(2.048), (I-052)+(1.047)+(2.049), (I-052)+(1.047)+(2.050), (I-052)+(1.047)+(2.051), (I-052)+(1.047)+(2.052), (I-052)+(1.047)+(2.053), (I-052)+(1.047)+(2.054), (I-052)+(1.047)+(2.055), (I-052)+(1.047)+(2.056), (I-052)+(1.047)+(2.057), (I-052)+(1.047)+(2.058), (I-052)+(1.047)+(2.059), (I-052)+(1.047)+(3.001), (I-052)+(1.047)+(3.002), (I-052)+(1.047)+(3.003), (I-052)+(1.047)+(3.004), (I-052)+(1.047)+(3.005), (I-052)+(1.047)+(3.006), (I-052)+(1.047)+(3.007), (I-052)+(1.047)+(3.008), (I-052)+(1.047)+(3.009), (I-052)+(1.047)+(3.010), (I-052)+(1.047)+(3.011), (I-052)+(1.047)+(3.012), (I-052)+(1.047)+(3.013), (I-052)+(1.047)+(3.014), (I-052)+(1.047)+(3.015), (I-052)+(1.047)+(3.016), (I-052)+(1.047)+(3.017), (I-052)+(1.047)+(3.018), (I-052)+(1.047)+(3.019), (I-052)+(1.047)+(3.020), (I-052)+(1.047)+(3.021), (I-052)+(1.047)+(3.022), (I-052)+(1.047)+(3.023), (I-052)+(1.047)+(3.024), (I-052)+(1.047)+(3.025), (I-052)+(1.047)+(3.026), (I-052)+(1.047)+(3.027), (I-052)+(1.047)+(3.028), (I-052)+(1.047)+(3.029), (I-052)+(1.047)+(3.030), (I-052)+(1.047)+(3.031), (I-052)+(1.047)+(5.001), (I-052)+(1.047)+(5.002), (I-052)+(1.047)+(5.003), (I-052)+(1.047)+(5.004), (I-052)+(1.047)+(5.005), (I-052)+(1.047)+(5.006), (I-052)+(1.047)+(5.007), (I-052)+(1.047)+(5.008), (I-052)+(1.047)+(5.009), (I-052)+(1.047)+(5.010), (I-052)+(1.047)+(5.011), (I-052)+(1.047)+(5.012), (I-052)+(1.047)+(5.013), (I-052)+(1.047)+(5.014), (I-052)+(1.047)+(5.015), (I-052)+(1.047)+(5.016), (I-052)+(1.047)+(5.017), (I-052)+(1.047)+(5.018), (I-052)+(1.047)+(5.019), (I-052)+(1.047)+(5.020), (I-052)+(1.047)+(5.021), (I-052)+(1.047)+(5.022), (I-052)+(1.047)+(5.023), (I-052)+(1.047)+(6.001), (I-052)+(1.047)+(6.002), (I-052)+(1.047)+(6.003), (I-052)+(1.047)+(6.004), (I-052)+(1.047)+(7.001), (I-052)+(1.047)+(7.002), (I-052)+(1.047)+(7.003), (I-052)+(1.047)+(7.004), (I-052)+(1.047)+(7.005), (I-052)+(1.047)+(7.006), (I-052)+(1.047)+(9.001), (I-052)+(1.047)+(9.002), (I-052)+(1.047)+(9.003), (I-052)+(1.047)+(9.004), (I-052)+(1.047)+(9.005), (I-052)+(1.047)+(9.006), (I-052)+(1.047)+(9.007), (I-052)+(1.047)+(9.008), (I-052)+(1.047)+(9.009), (I-052)+(1.047)+(14.001), (I-052)+(1.047)+(14.002), (I-052)+(1.047)+(15.008), (I-052)+(1.047)+(15.011), (I-052)+(1.047)+(15.012), (I-052)+(1.047)+(15.016), (I-052)+(1.047)+(15.025), (I-052)+(1.047)+(15.027), (I-052)+(1.047)+(15.047), (I-052)+(1.047)+(15.063), (I-052)+(1.047)+(15.064), (I-052)+(1.047)+(16.001), (I-052)+(1.047)+(16.002), (I-052)+(1.047)+(16.003), (I-052)+(1.047)+(16.004), (I-052)+(1.047)+(16.005), (I-052)+(1.047)+(16.006), (I-052)+(1.047)+(16.007), (I-052)+(1.047)+(16.008), (I-052)+(1.047)+(17.001), (I-052)+(1.047)+(17.002), (I-052)+(1.047)+(17.003), (I-052)+(1.047)+(17.004), (I-052)+(1.047)+(17.005), (I-052)+(1.047)+(17.006), (I-052)+(1.047)+(17.007), (I-052)+(1.047)+(17.008), (I-052)+(1.047)+(17.009), (I-052)+(1.047)+(17.010), (I-052)+(1.047)+(17.011), (I-052)+(1.047)+(17.012), (I-052)+(1.047)+(18.001), (I-052)+(1.048)+(1.049), (I-052)+(1.048)+(1.050), (I-052)+(1.048)+(1.051), (I-052)+(1.048)+(1.052), (I-052)+(1.048)+(1.053), (I-052)+(1.048)+(1.054), (I-052)+(1.048)+(1.055), (I-052)+(1.048)+(1.056), (I-052)+(1.048)+(1.057), (I-052)+(1.048)+(1.058), (I-052)+(1.048)+(1.059), (I-052)+(1.048)+(1.060), (I-052)+(1.048)+(1.061), (I-052)+(1.048)+(1.062), (I-052)+(1.048)+(1.063), (I-052)+(1.048)+(1.064), (I-052)+(1.048)+(1.065), (I-052)+(1.048)+(1.066), (I-052)+(1.048)+(1.067), (I-052)+(1.048)+(1.068), (I-052)+(1.048)+(1.069), (I-052)+(1.048)+(1.070), (I-052)+(1.048)+(1.071), (I-052)+(1.048)+(1.072), (I-052)+(1.048)+(1.073), (I-052)+(1.048)+(1.074), (I-052)+(1.048)+(1.075), (I-052)+(1.048)+(1.076), (I-052)+(1.048)+(1.077), (I-052)+(1.048)+(1.078), (I-052)+(1.048)+(1.079), (I-052)+(1.048)+(1.080), (I-052)+(1.048)+(1.081), (I-052)+(1.048)+(1.082), (I-052)+(1.048)+(1.083), (I-052)+(1.048)+(1.084), (I-052)+(1.048)+(1.085), (I-052)+(1.048)+(1.086), (I-052)+(1.048)+(1.087), (I-052)+(1.048)+(1.088), (I-052)+(1.048)+(1.089), (I-052)+(1.048)+(1.090), (I-052)+(1.048)+(1.091), (I-052)+(1.048)+(1.092), (I-052)+(1.048)+(2.001), (I-052)+(1.048)+(2.002), (I-052)+(1.048)+(2.003), (I-052)+(1.048)+(2.004), (I-052)+(1.048)+(2.005), (I-052)+(1.048)+(2.006), (I-052)+(1.048)+(2.007), (I-052)+(1.048)+(2.008), (I-052)+(1.048)+(2.009), (I-052)+(1.048)+(2.010), (I-052)+(1.048)+(2.011), (I-052)+(1.048)+(2.012), (I-052)+(1.048)+(2.013), (I-052)+(1.048)+(2.014), (I-052)+(1.048)+(2.015), (I-052)+(1.048)+(2.016), (I-052)+(1.048)+(2.017), (I-052)+(1.048)+(2.018), (I-052)+(1.048)+(2.019), (I-052)+(1.048)+(2.020), (I-052)+(1.048)+(2.021), (I-052)+(1.048)+(2.022), (I-052)+(1.048)+(2.023), (I-052)+(1.048)+(2.024), (I-052)+(1.048)+(2.025), (I-052)+(1.048)+(2.026), (I-052)+(1.048)+(2.027), (I-052)+(1.048)+(2.028), (I-052)+(1.048)+(2.029), (I-052)+(1.048)+(2.030), (I-052)+(1.048)+(2.031), (I-052)+(1.048)+(2.032), (I-052)+(1.048)+(2.033), (I-052)+(1.048)+(2.034), (I-052)+(1.048)+(2.035), (I-052)+(1.048)+(2.036), (I-052)+(1.048)+(2.037), (I-052)+(1.048)+(2.038), (I-052)+(1.048)+(2.039), (I-052)+(1.048)+(2.040), (I-052)+(1.048)+(2.041), (I-052)+(1.048)+(2.042), (I-052)+(1.048)+(2.043), (I-052)+(1.048)+(2.044), (I-052)+(1.048)+(2.045), (I-052)+(1.048)+(2.046), (I-052)+(1.048)+(2.047), (I-052)+(1.048)+(2.048), (I-052)+(1.048)+(2.049), (I-052)+(1.048)+(2.050), (I-052)+(1.048)+(2.051), (I-052)+(1.048)+(2.052), (I-052)+(1.048)+(2.053), (I-052)+(1.048)+(2.054), (I-052)+(1.048)+(2.055), (I-052)+(1.048)+(2.056), (I-052)+(1.048)+(2.057), (I-052)+(1.048)+(2.058), (I-052)+(1.048)+(2.059), (I-052)+(1.048)+(3.001), (I-052)+(1.048)+(3.002), (I-052)+(1.048)+(3.003), (I-052)+(1.048)+(3.004), (I-052)+(1.048)+(3.005), (I-052)+(1.048)+(3.006), (I-052)+(1.048)+(3.007), (I-052)+(1.048)+(3.008), (I-052)+(1.048)+(3.009), (I-052)+(1.048)+(3.010), (I-052)+(1.048)+(3.011), (I-052)+(1.048)+(3.012), (I-052)+(1.048)+(3.013), (I-052)+(1.048)+(3.014), (I-052)+(1.048)+(3.015), (I-052)+(1.048)+(3.016), (I-052)+(1.048)+(3.017), (I-052)+(1.048)+(3.018), (I-052)+(1.048)+(3.019), (I-052)+(1.048)+(3.020), (I-052)+(1.048)+(3.021), (I-052)+(1.048)+(3.022), (I-052)+(1.048)+(3.023), (I-052)+(1.048)+(3.024), (I-052)+(1.048)+(3.025), (I-052)+(1.048)+(3.026), (I-052)+(1.048)+(3.027), (I-052)+(1.048)+(3.028), (I-052)+(1.048)+(3.029), (I-052)+(1.048)+(3.030), (I-052)+(1.048)+(3.031), (I-052)+(1.048)+(5.001), (I-052)+(1.048)+(5.002), (I-052)+(1.048)+(5.003), (I-052)+(1.048)+(5.004), (I-052)+(1.048)+(5.005), (I-052)+(1.048)+(5.006), (I-052)+(1.048)+(5.007), (I-052)+(1.048)+(5.008), (I-052)+(1.048)+(5.009), (I-052)+(1.048)+(5.010), (I-052)+(1.048)+(5.011), (I-052)+(1.048)+(5.012), (I-052)+(1.048)+(5.013), (I-052)+(1.048)+(5.014), (I-052)+(1.048)+(5.015), (I-052)+(1.048)+(5.016), (I-052)+(1.048)+(5.017), (I-052)+(1.048)+(5.018), (I-052)+(1.048)+(5.019), (I-052)+(1.048)+(5.020), (I-052)+(1.048)+(5.021), (I-052)+(1.048)+(5.022), (I-052)+(1.048)+(5.023), (I-052)+(1.048)+(6.001), (I-052)+(1.048)+(6.002), (I-052)+(1.048)+(6.003), (I-052)+(1.048)+(6.004), (I-052)+(1.048)+(7.001), (I-052)+(1.048)+(7.002), (I-052)+(1.048)+(7.003), (I-052)+(1.048)+(7.004), (I-052)+(1.048)+(7.005), (I-052)+(1.048)+(7.006), (I-052)+(1.048)+(9.001), (I-052)+(1.048)+(9.002), (I-052)+(1.048)+(9.003), (I-052)+(1.048)+(9.004), (I-052)+(1.048)+(9.005), (I-052)+(1.048)+(9.006), (I-052)+(1.048)+(9.007), (I-052)+(1.048)+(9.008), (I-052)+(1.048)+(9.009), (I-052)+(1.048)+(14.001), (I-052)+(1.048)+(14.002), (I-052)+(1.048)+(15.008), (I-052)+(1.048)+(15.011), (I-052)+(1.048)+(15.012), (I-052)+(1.048)+(15.016), (I-052)+(1.048)+(15.025), (I-052)+(1.048)+(15.027), (I-052)+(1.048)+(15.047), (I-052)+(1.048)+(15.063), (I-052)+(1.048)+(15.064), (I-052)+(1.048)+(16.001), (I-052)+(1.048)+(16.002), (I-052)+(1.048)+(16.003), (I-052)+(1.048)+(16.004), (I-052)+(1.048)+(16.005), (I-052)+(1.048)+(16.006), (I-052)+(1.048)+(16.007), (I-052)+(1.048)+(16.008), (I-052)+(1.048)+(17.001), (I-052)+(1.048)+(17.002), (I-052)+(1.048)+(17.003), (I-052)+(1.048)+(17.004), (I-052)+(1.048)+(17.005), (I-052)+(1.048)+(17.006), (I-052)+(1.048)+(17.007), (I-052)+(1.048)+(17.008), (I-052)+(1.048)+(17.009), (I-052)+(1.048)+(17.010), (I-052)+(1.048)+(17.011), (I-052)+(1.048)+(17.012), (I-052)+(1.048)+(18.001), (I-052)+(1.049)+(1.050), (I-052)+(1.049)+(1.051), (I-052)+(1.049)+(1.052), (I-052)+(1.049)+(1.053), (I-052)+(1.049)+(1.054), (I-052)+(1.049)+(1.055), (I-052)+(1.049)+(1.056), (I-052)+(1.049)+(1.057), (I-052)+(1.049)+(1.058), (I-052)+(1.049)+(1.059), (I-052)+(1.049)+(1.060), (I-052)+(1.049)+(1.061), (I-052)+(1.049)+(1.062), (I-052)+(1.049)+(1.063), (I-052)+(1.049)+(1.064), (I-052)+(1.049)+(1.065), (I-052)+(1.049)+(1.066), (I-052)+(1.049)+(1.067), (I-052)+(1.049)+(1.068), (I-052)+(1.049)+(1.069), (I-052)+(1.049)+(1.070), (I-052)+(1.049)+(1.071), (I-052)+(1.049)+(1.072), (I-052)+(1.049)+(1.073), (I-052)+(1.049)+(1.074), (I-052)+(1.049)+(1.075), (I-052)+(1.049)+(1.076), (I-052)+(1.049)+(1.077), (I-052)+(1.049)+(1.078), (I-052)+(1.049)+(1.079), (I-052)+(1.049)+(1.080), (I-052)+(1.049)+(1.081), (I-052)+(1.049)+(1.082), (I-052)+(1.049)+(1.083), (I-052)+(1.049)+(1.084), (I-052)+(1.049)+(1.085), (I-052)+(1.049)+(1.086), (I-052)+(1.049)+(1.087), (I-052)+(1.049)+(1.088), (I-052)+(1.049)+(1.089), (I-052)+(1.049)+(1.090), (I-052)+(1.049)+(1.091), (I-052)+(1.049)+(1.092), (I-052)+(1.049)+(2.001), (I-052)+(1.049)+(2.002), (I-052)+(1.049)+(2.003), (I-052)+(1.049)+(2.004), (I-052)+(1.049)+(2.005), (I-052)+(1.049)+(2.006), (I-052)+(1.049)+(2.007), (I-052)+(1.049)+(2.008), (I-052)+(1.049)+(2.009), (I-052)+(1.049)+(2.010), (I-052)+(1.049)+(2.011), (I-052)+(1.049)+(2.012), (I-052)+(1.049)+(2.013), (I-052)+(1.049)+(2.014), (I-052)+(1.049)+(2.015), (I-052)+(1.049)+(2.016), (I-052)+(1.049)+(2.017), (I-052)+(1.049)+(2.018), (I-052)+(1.049)+(2.019), (I-052)+(1.049)+(2.020), (I-052)+(1.049)+(2.021), (I-052)+(1.049)+(2.022), (I-052)+(1.049)+(2.023), (I-052)+(1.049)+(2.024), (I-052)+(1.049)+(2.025), (I-052)+(1.049)+(2.026), (I-052)+(1.049)+(2.027), (I-052)+(1.049)+(2.028), (I-052)+(1.049)+(2.029), (I-052)+(1.049)+(2.030), (I-052)+(1.049)+(2.031), (I-052)+(1.049)+(2.032), (I-052)+(1.049)+(2.033), (I-052)+(1.049)+(2.034), (I-052)+(1.049)+(2.035), (I-052)+(1.049)+(2.036), (I-052)+(1.049)+(2.037), (I-052)+(1.049)+(2.038), (I-052)+(1.049)+(2.039), (I-052)+(1.049)+(2.040), (I-052)+(1.049)+(2.041), (I-052)+(1.049)+(2.042), (I-052)+(1.049)+(2.043), (I-052)+(1.049)+(2.044), (I-052)+(1.049)+(2.045), (I-052)+(1.049)+(2.046), (I-052)+(1.049)+(2.047), (I-052)+(1.049)+(2.048), (I-052)+(1.049)+(2.049), (I-052)+(1.049)+(2.050), (I-052)+(1.049)+(2.051), (I-052)+(1.049)+(2.052), (I-052)+(1.049)+(2.053), (I-052)+(1.049)+(2.054), (I-052)+(1.049)+(2.055), (I-052)+(1.049)+(2.056), (I-052)+(1.049)+(2.057), (I-052)+(1.049)+(2.058), (I-052)+(1.049)+(2.059), (I-052)+(1.049)+(3.001), (I-052)+(1.049)+(3.002), (I-052)+(1.049)+(3.003), (I-052)+(1.049)+(3.004), (I-052)+(1.049)+(3.005), (I-052)+(1.049)+(3.006), (I-052)+(1.049)+(3.007), (I-052)+(1.049)+(3.008), (I-052)+(1.049)+(3.009), (I-052)+(1.049)+(3.010), (I-052)+(1.049)+(3.011), (I-052)+(1.049)+(3.012), (I-052)+(1.049)+(3.013), (I-052)+(1.049)+(3.014), (I-052)+(1.049)+(3.015), (I-052)+(1.049)+(3.016), (I-052)+(1.049)+(3.017), (I-052)+(1.049)+(3.018), (I-052)+(1.049)+(3.019), (I-052)+(1.049)+(3.020), (I-052)+(1.049)+(3.021), (I-052)+(1.049)+(3.022), (I-052)+(1.049)+(3.023), (I-052)+(1.049)+(3.024), (I-052)+(1.049)+(3.025), (I-052)+(1.049)+(3.026), (I-052)+(1.049)+(3.027), (I-052)+(1.049)+(3.028), (I-052)+(1.049)+(3.029), (I-052)+(1.049)+(3.030), (I-052)+(1.049)+(3.031), (I-052)+(1.049)+(5.001), (I-052)+(1.049)+(5.002), (I-052)+(1.049)+(5.003), (I-052)+(1.049)+(5.004), (I-052)+(1.049)+(5.005), (I-052)+(1.049)+(5.006), (I-052)+(1.049)+(5.007), (I-052)+(1.049)+(5.008), (I-052)+(1.049)+(5.009), (I-052)+(1.049)+(5.010), (I-052)+(1.049)+(5.011), (I-052)+(1.049)+(5.012), (I-052)+(1.049)+(5.013), (I-052)+(1.049)+(5.014), (I-052)+(1.049)+(5.015), (I-052)+(1.049)+(5.016), (I-052)+(1.049)+(5.017), (I-052)+(1.049)+(5.018), (I-052)+(1.049)+(5.019), (I-052)+(1.049)+(5.020), (I-052)+(1.049)+(5.021), (I-052)+(1.049)+(5.022), (I-052)+(1.049)+(5.023), (I-052)+(1.049)+(6.001), (I-052)+(1.049)+(6.002), (I-052)+(1.049)+(6.003), (I-052)+(1.049)+(6.004), (I-052)+(1.049)+(7.001), (I-052)+(1.049)+(7.002), (I-052)+(1.049)+(7.003), (I-052)+(1.049)+(7.004), (I-052)+(1.049)+(7.005), (I-052)+(1.049)+(7.006), (I-052)+(1.049)+(9.001), (I-052)+(1.049)+(9.002), (I-052)+(1.049)+(9.003), (I-052)+(1.049)+(9.004), (I-052)+(1.049)+(9.005), (I-052)+(1.049)+(9.006), (I-052)+(1.049)+(9.007), (I-052)+(1.049)+(9.008), (I-052)+(1.049)+(9.009), (I-052)+(1.049)+(14.001), (I-052)+(1.049)+(14.002), (I-052)+(1.049)+(15.008), (I-052)+(1.049)+(15.011), (I-052)+(1.049)+(15.012), (I-052)+(1.049)+(15.016), (I-052)+(1.049)+(15.025), (I-052)+(1.049)+(15.027), (I-052)+(1.049)+(15.047), (I-052)+(1.049)+(15.063), (I-052)+(1.049)+(15.064), (I-052)+(1.049)+(16.001), (I-052)+(1.049)+(16.002), (I-052)+(1.049)+(16.003), (I-052)+(1.049)+(16.004), (I-052)+(1.049)+(16.005), (I-052)+(1.049)+(16.006), (I-052)+(1.049)+(16.007), (I-052)+(1.049)+(16.008), (I-052)+(1.049)+(17.001), (I-052)+(1.049)+(17.002), (I-052)+(1.049)+(17.003), (I-052)+(1.049)+(17.004), (I-052)+(1.049)+(17.005), (I-052)+(1.049)+(17.006), (I-052)+(1.049)+(17.007), (I-052)+(1.049)+(17.008), (I-052)+(1.049)+(17.009), (I-052)+(1.049)+(17.010), (I-052)+(1.049)+(17.011), (I-052)+(1.049)+(17.012), (I-052)+(1.049)+(18.001), (I-052)+(1.050)+(1.051), (I-052)+(1.050)+(1.052), (I-052)+(1.050)+(1.053), (I-052)+(1.050)+(1.054), (I-052)+(1.050)+(1.055), (I-052)+(1.050)+(1.056), (I-052)+(1.050)+(1.057), (I-052)+(1.050)+(1.058), (I-052)+(1.050)+(1.059), (I-052)+(1.050)+(1.060), (I-052)+(1.050)+(1.061), (I-052)+(1.050)+(1.062), (I-052)+(1.050)+(1.063), (I-052)+(1.050)+(1.064), (I-052)+(1.050)+(1.065), (I-052)+(1.050)+(1.066), (I-052)+(1.050)+(1.067), (I-052)+(1.050)+(1.068), (I-052)+(1.050)+(1.069), (I-052)+(1.050)+(1.070), (I-052)+(1.050)+(1.071), (I-052)+(1.050)+(1.072), (I-052)+(1.050)+(1.073), (I-052)+(1.050)+(1.074), (I-052)+(1.050)+(1.075), (I-052)+(1.050)+(1.076), (I-052)+(1.050)+(1.077), (I-052)+(1.050)+(1.078), (I-052)+(1.050)+(1.079), (I-052)+(1.050)+(1.080), (I-052)+(1.050)+(1.081), (I-052)+(1.050)+(1.082), (I-052)+(1.050)+(1.083), (I-052)+(1.050)+(1.084), (I-052)+(1.050)+(1.085), (I-052)+(1.050)+(1.086), (I-052)+(1.050)+(1.087), (I-052)+(1.050)+(1.088), (I-052)+(1.050)+(1.089), (I-052)+(1.050)+(1.090), (I-052)+(1.050)+(1.091), (I-052)+(1.050)+(1.092), (I-052)+(1.050)+(2.001), (I-052)+(1.050)+(2.002), (I-052)+(1.050)+(2.003), (I-052)+(1.050)+(2.004), (I-052)+(1.050)+(2.005), (I-052)+(1.050)+(2.006), (I-052)+(1.050)+(2.007), (I-052)+(1.050)+(2.008), (I-052)+(1.050)+(2.009), (I-052)+(1.050)+(2.010), (I-052)+(1.050)+(2.011), (I-052)+(1.050)+(2.012), (I-052)+(1.050)+(2.013), (I-052)+(1.050)+(2.014), (I-052)+(1.050)+(2.015), (I-052)+(1.050)+(2.016), (I-052)+(1.050)+(2.017), (I-052)+(1.050)+(2.018), (I-052)+(1.050)+(2.019), (I-052)+(1.050)+(2.020), (I-052)+(1.050)+(2.021), (I-052)+(1.050)+(2.022), (I-052)+(1.050)+(2.023), (I-052)+(1.050)+(2.024), (I-052)+(1.050)+(2.025), (I-052)+(1.050)+(2.026), (I-052)+(1.050)+(2.027), (I-052)+(1.050)+(2.028), (I-052)+(1.050)+(2.029), (I-052)+(1.050)+(2.030), (I-052)+(1.050)+(2.031), (I-052)+(1.050)+(2.032), (I-052)+(1.050)+(2.033), (I-052)+(1.050)+(2.034), (I-052)+(1.050)+(2.035), (I-052)+(1.050)+(2.036), (I-052)+(1.050)+(2.037), (I-052)+(1.050)+(2.038), (I-052)+(1.050)+(2.039), (I-052)+(1.050)+(2.040), (I-052)+(1.050)+(2.041), (I-052)+(1.050)+(2.042), (I-052)+(1.050)+(2.043), (I-052)+(1.050)+(2.044), (I-052)+(1.050)+(2.045), (I-052)+(1.050)+(2.046), (I-052)+(1.050)+(2.047), (I-052)+(1.050)+(2.048), (I-052)+(1.050)+(2.049), (I-052)+(1.050)+(2.050), (I-052)+(1.050)+(2.051), (I-052)+(1.050)+(2.052), (I-052)+(1.050)+(2.053), (I-052)+(1.050)+(2.054), (I-052)+(1.050)+(2.055), (I-052)+(1.050)+(2.056), (I-052)+(1.050)+(2.057), (I-052)+(1.050)+(2.058), (I-052)+(1.050)+(2.059), (I-052)+(1.050)+(3.001), (I-052)+(1.050)+(3.002), (I-052)+(1.050)+(3.003), (I-052)+(1.050)+(3.004), (I-052)+(1.050)+(3.005), (I-052)+(1.050)+(3.006), (I-052)+(1.050)+(3.007), (I-052)+(1.050)+(3.008), (I-052)+(1.050)+(3.009), (I-052)+(1.050)+(3.010), (I-052)+(1.050)+(3.011), (I-052)+(1.050)+(3.012), (I-052)+(1.050)+(3.013), (I-052)+(1.050)+(3.014), (I-052)+(1.050)+(3.015), (I-052)+(1.050)+(3.016), (I-052)+(1.050)+(3.017), (I-052)+(1.050)+(3.018), (I-052)+(1.050)+(3.019), (I-052)+(1.050)+(3.020), (I-052)+(1.050)+(3.021), (I-052)+(1.050)+(3.022), (I-052)+(1.050)+(3.023), (I-052)+(1.050)+(3.024), (I-052)+(1.050)+(3.025), (I-052)+(1.050)+(3.026), (I-052)+(1.050)+(3.027), (I-052)+(1.050)+(3.028), (I-052)+(1.050)+(3.029), (I-052)+(1.050)+(3.030), (I-052)+(1.050)+(3.031), (I-052)+(1.050)+(5.001), (I-052)+(1.050)+(5.002), (I-052)+(1.050)+(5.003), (I-052)+(1.050)+(5.004), (I-052)+(1.050)+(5.005), (I-052)+(1.050)+(5.006), (I-052)+(1.050)+(5.007), (I-052)+(1.050)+(5.008), (I-052)+(1.050)+(5.009), (I-052)+(1.050)+(5.010), (I-052)+(1.050)+(5.011), (I-052)+(1.050)+(5.012), (I-052)+(1.050)+(5.013), (I-052)+(1.050)+(5.014), (I-052)+(1.050)+(5.015), (I-052)+(1.050)+(5.016), (I-052)+(1.050)+(5.017), (I-052)+(1.050)+(5.018), (I-052)+(1.050)+(5.019), (I-052)+(1.050)+(5.020), (I-052)+(1.050)+(5.021), (I-052)+(1.050)+(5.022), (I-052)+(1.050)+(5.023), (I-052)+(1.050)+(6.001), (I-052)+(1.050)+(6.002), (I-052)+(1.050)+(6.003), (I-052)+(1.050)+(6.004), (I-052)+(1.050)+(7.001), (I-052)+(1.050)+(7.002), (I-052)+(1.050)+(7.003), (I-052)+(1.050)+(7.004), (I-052)+(1.050)+(7.005), (I-052)+(1.050)+(7.006), (I-052)+(1.050)+(9.001), (I-052)+(1.050)+(9.002), (I-052)+(1.050)+(9.003), (I-052)+(1.050)+(9.004), (I-052)+(1.050)+(9.005), (I-052)+(1.050)+(9.006), (I-052)+(1.050)+(9.007), (I-052)+(1.050)+(9.008), (I-052)+(1.050)+(9.009), (I-052)+(1.050)+(14.001), (I-052)+(1.050)+(14.002), (I-052)+(1.050)+(15.008), (I-052)+(1.050)+(15.011), (I-052)+(1.050)+(15.012), (I-052)+(1.050)+(15.016), (I-052)+(1.050)+(15.025), (I-052)+(1.050)+(15.027), (I-052)+(1.050)+(15.047), (I-052)+(1.050)+(15.063), (I-052)+(1.050)+(15.064), (I-052)+(1.050)+(16.001), (I-052)+(1.050)+(16.002), (I-052)+(1.050)+(16.003), (I-052)+(1.050)+(16.004), (I-052)+(1.050)+(16.005), (I-052)+(1.050)+(16.006), (I-052)+(1.050)+(16.007), (I-052)+(1.050)+(16.008), (I-052)+(1.050)+(17.001), (I-052)+(1.050)+(17.002), (I-052)+(1.050)+(17.003), (I-052)+(1.050)+(17.004), (I-052)+(1.050)+(17.005), (I-052)+(1.050)+(17.006), (I-052)+(1.050)+(17.007), (I-052)+(1.050)+(17.008), (I-052)+(1.050)+(17.009), (I-052)+(1.050)+(17.010), (I-052)+(1.050)+(17.011), (I-052)+(1.050)+(17.012), (I-052)+(1.050)+(18.001), (I-052)+(1.051)+(1.052), (I-052)+(1.051)+(1.053), (I-052)+(1.051)+(1.054), (I-052)+(1.051)+(1.055), (I-052)+(1.051)+(1.056), (I-052)+(1.051)+(1.057), (I-052)+(1.051)+(1.058), (I-052)+(1.051)+(1.059), (I-052)+(1.051)+(1.060), (I-052)+(1.051)+(1.061), (I-052)+(1.051)+(1.062), (I-052)+(1.051)+(1.063), (I-052)+(1.051)+(1.064), (I-052)+(1.051)+(1.065), (I-052)+(1.051)+(1.066), (I-052)+(1.051)+(1.067), (I-052)+(1.051)+(1.068), (I-052)+(1.051)+(1.069), (I-052)+(1.051)+(1.070), (I-052)+(1.051)+(1.071), (I-052)+(1.051)+(1.072), (I-052)+(1.051)+(1.073), (I-052)+(1.051)+(1.074), (I-052)+(1.051)+(1.075), (I-052)+(1.051)+(1.076), (I-052)+(1.051)+(1.077), (I-052)+(1.051)+(1.078), (I-052)+(1.051)+(1.079), (I-052)+(1.051)+(1.080), (I-052)+(1.051)+(1.081), (I-052)+(1.051)+(1.082), (I-052)+(1.051)+(1.083), (I-052)+(1.051)+(1.084), (I-052)+(1.051)+(1.085), (I-052)+(1.051)+(1.086), (I-052)+(1.051)+(1.087), (I-052)+(1.051)+(1.088), (I-052)+(1.051)+(1.089), (I-052)+(1.051)+(1.090), (I-052)+(1.051)+(1.091), (I-052)+(1.051)+(1.092), (I-052)+(1.051)+(2.001), (I-052)+(1.051)+(2.002), (I-052)+(1.051)+(2.003), (I-052)+(1.051)+(2.004), (I-052)+(1.051)+(2.005), (I-052)+(1.051)+(2.006), (I-052)+(1.051)+(2.007), (I-052)+(1.051)+(2.008), (I-052)+(1.051)+(2.009), (I-052)+(1.051)+(2.010), (I-052)+(1.051)+(2.011), (I-052)+(1.051)+(2.012), (I-052)+(1.051)+(2.013), (I-052)+(1.051)+(2.014), (I-052)+(1.051)+(2.015), (I-052)+(1.051)+(2.016), (I-052)+(1.051)+(2.017), (I-052)+(1.051)+(2.018), (I-052)+(1.051)+(2.019), (I-052)+(1.051)+(2.020), (I-052)+(1.051)+(2.021), (I-052)+(1.051)+(2.022), (I-052)+(1.051)+(2.023), (I-052)+(1.051)+(2.024), (I-052)+(1.051)+(2.025), (I-052)+(1.051)+(2.026), (I-052)+(1.051)+(2.027), (I-052)+(1.051)+(2.028), (I-052)+(1.051)+(2.029), (I-052)+(1.051)+(2.030), (I-052)+(1.051)+(2.031), (I-052)+(1.051)+(2.032), (I-052)+(1.051)+(2.033), (I-052)+(1.051)+(2.034), (I-052)+(1.051)+(2.035), (I-052)+(1.051)+(2.036), (I-052)+(1.051)+(2.037), (I-052)+(1.051)+(2.038), (I-052)+(1.051)+(2.039), (I-052)+(1.051)+(2.040), (I-052)+(1.051)+(2.041), (I-052)+(1.051)+(2.042), (I-052)+(1.051)+(2.043), (I-052)+(1.051)+(2.044), (I-052)+(1.051)+(2.045), (I-052)+(1.051)+(2.046), (I-052)+(1.051)+(2.047), (I-052)+(1.051)+(2.048), (I-052)+(1.051)+(2.049), (I-052)+(1.051)+(2.050), (I-052)+(1.051)+(2.051), (I-052)+(1.051)+(2.052), (I-052)+(1.051)+(2.053), (I-052)+(1.051)+(2.054), (I-052)+(1.051)+(2.055), (I-052)+(1.051)+(2.056), (I-052)+(1.051)+(2.057), (I-052)+(1.051)+(2.058), (I-052)+(1.051)+(2.059), (I-052)+(1.051)+(3.001), (I-052)+(1.051)+(3.002), (I-052)+(1.051)+(3.003), (I-052)+(1.051)+(3.004), (I-052)+(1.051)+(3.005), (I-052)+(1.051)+(3.006), (I-052)+(1.051)+(3.007), (I-052)+(1.051)+(3.008), (I-052)+(1.051)+(3.009), (I-052)+(1.051)+(3.010), (I-052)+(1.051)+(3.011), (I-052)+(1.051)+(3.012), (I-052)+(1.051)+(3.013), (I-052)+(1.051)+(3.014), (I-052)+(1.051)+(3.015), (I-052)+(1.051)+(3.016), (I-052)+(1.051)+(3.017), (I-052)+(1.051)+(3.018), (I-052)+(1.051)+(3.019), (I-052)+(1.051)+(3.020), (I-052)+(1.051)+(3.021), (I-052)+(1.051)+(3.022), (I-052)+(1.051)+(3.023), (I-052)+(1.051)+(3.024), (I-052)+(1.051)+(3.025), (I-052)+(1.051)+(3.026), (I-052)+(1.051)+(3.027), (I-052)+(1.051)+(3.028), (I-052)+(1.051)+(3.029), (I-052)+(1.051)+(3.030), (I-052)+(1.051)+(3.031), (I-052)+(1.051)+(5.001), (I-052)+(1.051)+(5.002), (I-052)+(1.051)+(5.003), (I-052)+(1.051)+(5.004), (I-052)+(1.051)+(5.005), (I-052)+(1.051)+(5.006), (I-052)+(1.051)+(5.007), (I-052)+(1.051)+(5.008), (I-052)+(1.051)+(5.009), (I-052)+(1.051)+(5.010), (I-052)+(1.051)+(5.011), (I-052)+(1.051)+(5.012), (I-052)+(1.051)+(5.013), (I-052)+(1.051)+(5.014), (I-052)+(1.051)+(5.015), (I-052)+(1.051)+(5.016), (I-052)+(1.051)+(5.017), (I-052)+(1.051)+(5.018), (I-052)+(1.051)+(5.019), (I-052)+(1.051)+(5.020), (I-052)+(1.051)+(5.021), (I-052)+(1.051)+(5.022), (I-052)+(1.051)+(5.023), (I-052)+(1.051)+(6.001), (I-052)+(1.051)+(6.002), (I-052)+(1.051)+(6.003), (I-052)+(1.051)+(6.004), (I-052)+(1.051)+(7.001), (I-052)+(1.051)+(7.002), (I-052)+(1.051)+(7.003), (I-052)+(1.051)+(7.004), (I-052)+(1.051)+(7.005), (I-052)+(1.051)+(7.006), (I-052)+(1.051)+(9.001), (I-052)+(1.051)+(9.002), (I-052)+(1.051)+(9.003), (I-052)+(1.051)+(9.004), (I-052)+(1.051)+(9.005), (I-052)+(1.051)+(9.006), (I-052)+(1.051)+(9.007), (I-052)+(1.051)+(9.008), (I-052)+(1.051)+(9.009), (I-052)+(1.051)+(14.001), (I-052)+(1.051)+(14.002), (I-052)+(1.051)+(15.008), (I-052)+(1.051)+(15.011), (I-052)+(1.051)+(15.012), (I-052)+(1.051)+(15.016), (I-052)+(1.051)+(15.025), (I-052)+(1.051)+(15.027), (I-052)+(1.051)+(15.047), (I-052)+(1.051)+(15.063), (I-052)+(1.051)+(15.064), (I-052)+(1.051)+(16.001), (I-052)+(1.051)+(16.002), (I-052)+(1.051)+(16.003), (I-052)+(1.051)+(16.004), (I-052)+(1.051)+(16.005), (I-052)+(1.051)+(16.006), (I-052)+(1.051)+(16.007), (I-052)+(1.051)+(16.008), (I-052)+(1.051)+(17.001), (I-052)+(1.051)+(17.002), (I-052)+(1.051)+(17.003), (I-052)+(1.051)+(17.004), (I-052)+(1.051)+(17.005), (I-052)+(1.051)+(17.006), (I-052)+(1.051)+(17.007), (I-052)+(1.051)+(17.008), (I-052)+(1.051)+(17.009), (I-052)+(1.051)+(17.010), (I-052)+(1.051)+(17.011), (I-052)+(1.051)+(17.012), (I-052)+(1.051)+(18.001), (I-052)+(1.052)+(1.053), (I-052)+(1.052)+(1.054), (I-052)+(1.052)+(1.055), (I-052)+(1.052)+(1.056), (I-052)+(1.052)+(1.057), (I-052)+(1.052)+(1.058), (I-052)+(1.052)+(1.059), (I-052)+(1.052)+(1.060), (I-052)+(1.052)+(1.061), (I-052)+(1.052)+(1.062), (I-052)+(1.052)+(1.063), (I-052)+(1.052)+(1.064), (I-052)+(1.052)+(1.065), (I-052)+(1.052)+(1.066), (I-052)+(1.052)+(1.067), (I-052)+(1.052)+(1.068), (I-052)+(1.052)+(1.069), (I-052)+(1.052)+(1.070), (I-052)+(1.052)+(1.071), (I-052)+(1.052)+(1.072), (I-052)+(1.052)+(1.073), (I-052)+(1.052)+(1.074), (I-052)+(1.052)+(1.075), (I-052)+(1.052)+(1.076), (I-052)+(1.052)+(1.077), (I-052)+(1.052)+(1.078), (I-052)+(1.052)+(1.079), (I-052)+(1.052)+(1.080), (I-052)+(1.052)+(1.081), (I-052)+(1.052)+(1.082), (I-052)+(1.052)+(1.083), (I-052)+(1.052)+(1.084), (I-052)+(1.052)+(1.085), (I-052)+(1.052)+(1.086), (I-052)+(1.052)+(1.087), (I-052)+(1.052)+(1.088), (I-052)+(1.052)+(1.089), (I-052)+(1.052)+(1.090), (I-052)+(1.052)+(1.091), (I-052)+(1.052)+(1.092), (I-052)+(1.052)+(2.001), (I-052)+(1.052)+(2.002), (I-052)+(1.052)+(2.003), (I-052)+(1.052)+(2.004), (I-052)+(1.052)+(2.005), (I-052)+(1.052)+(2.006), (I-052)+(1.052)+(2.007), (I-052)+(1.052)+(2.008), (I-052)+(1.052)+(2.009), (I-052)+(1.052)+(2.010), (I-052)+(1.052)+(2.011), (I-052)+(1.052)+(2.012), (I-052)+(1.052)+(2.013), (I-052)+(1.052)+(2.014), (I-052)+(1.052)+(2.015), (I-052)+(1.052)+(2.016), (I-052)+(1.052)+(2.017), (I-052)+(1.052)+(2.018), (I-052)+(1.052)+(2.019), (I-052)+(1.052)+(2.020), (I-052)+(1.052)+(2.021), (I-052)+(1.052)+(2.022), (I-052)+(1.052)+(2.023), (I-052)+(1.052)+(2.024), (I-052)+(1.052)+(2.025), (I-052)+(1.052)+(2.026), (I-052)+(1.052)+(2.027), (I-052)+(1.052)+(2.028), (I-052)+(1.052)+(2.029), (I-052)+(1.052)+(2.030), (I-052)+(1.052)+(2.031), (I-052)+(1.052)+(2.032), (I-052)+(1.052)+(2.033), (I-052)+(1.052)+(2.034), (I-052)+(1.052)+(2.035), (I-052)+(1.052)+(2.036), (I-052)+(1.052)+(2.037), (I-052)+(1.052)+(2.038), (I-052)+(1.052)+(2.039), (I-052)+(1.052)+(2.040), (I-052)+(1.052)+(2.041), (I-052)+(1.052)+(2.042), (I-052)+(1.052)+(2.043), (I-052)+(1.052)+(2.044), (I-052)+(1.052)+(2.045), (I-052)+(1.052)+(2.046), (I-052)+(1.052)+(2.047), (I-052)+(1.052)+(2.048), (I-052)+(1.052)+(2.049), (I-052)+(1.052)+(2.050), (I-052)+(1.052)+(2.051), (I-052)+(1.052)+(2.052), (I-052)+(1.052)+(2.053), (I-052)+(1.052)+(2.054), (I-052)+(1.052)+(2.055), (I-052)+(1.052)+(2.056), (I-052)+(1.052)+(2.057), (I-052)+(1.052)+(2.058), (I-052)+(1.052)+(2.059), (I-052)+(1.052)+(3.001), (I-052)+(1.052)+(3.002), (I-052)+(1.052)+(3.003), (I-052)+(1.052)+(3.004), (I-052)+(1.052)+(3.005), (I-052)+(1.052)+(3.006), (I-052)+(1.052)+(3.007), (I-052)+(1.052)+(3.008), (I-052)+(1.052)+(3.009), (I-052)+(1.052)+(3.010), (I-052)+(1.052)+(3.011), (I-052)+(1.052)+(3.012), (I-052)+(1.052)+(3.013), (I-052)+(1.052)+(3.014), (I-052)+(1.052)+(3.015), (I-052)+(1.052)+(3.016), (I-052)+(1.052)+(3.017), (I-052)+(1.052)+(3.018), (I-052)+(1.052)+(3.019), (I-052)+(1.052)+(3.020), (I-052)+(1.052)+(3.021), (I-052)+(1.052)+(3.022), (I-052)+(1.052)+(3.023), (I-052)+(1.052)+(3.024), (I-052)+(1.052)+(3.025), (I-052)+(1.052)+(3.026), (I-052)+(1.052)+(3.027), (I-052)+(1.052)+(3.028), (I-052)+(1.052)+(3.029), (I-052)+(1.052)+(3.030), (I-052)+(1.052)+(3.031), (I-052)+(1.052)+(5.001), (I-052)+(1.052)+(5.002), (I-052)+(1.052)+(5.003), (I-052)+(1.052)+(5.004), (I-052)+(1.052)+(5.005), (I-052)+(1.052)+(5.006), (I-052)+(1.052)+(5.007), (I-052)+(1.052)+(5.008), (I-052)+(1.052)+(5.009), (I-052)+(1.052)+(5.010), (I-052)+(1.052)+(5.011), (I-052)+(1.052)+(5.012), (I-052)+(1.052)+(5.013), (I-052)+(1.052)+(5.014), (I-052)+(1.052)+(5.015), (I-052)+(1.052)+(5.016), (I-052)+(1.052)+(5.017), (I-052)+(1.052)+(5.018), (I-052)+(1.052)+(5.019), (I-052)+(1.052)+(5.020), (I-052)+(1.052)+(5.021), (I-052)+(1.052)+(5.022), (I-052)+(1.052)+(5.023), (I-052)+(1.052)+(6.001), (I-052)+(1.052)+(6.002), (I-052)+(1.052)+(6.003), (I-052)+(1.052)+(6.004), (I-052)+(1.052)+(7.001), (I-052)+(1.052)+(7.002), (I-052)+(1.052)+(7.003), (I-052)+(1.052)+(7.004), (I-052)+(1.052)+(7.005), (I-052)+(1.052)+(7.006), (I-052)+(1.052)+(9.001), (I-052)+(1.052)+(9.002), (I-052)+(1.052)+(9.003), (I-052)+(1.052)+(9.004), (I-052)+(1.052)+(9.005), (I-052)+(1.052)+(9.006), (I-052)+(1.052)+(9.007), (I-052)+(1.052)+(9.008), (I-052)+(1.052)+(9.009), (I-052)+(1.052)+(14.001), (I-052)+(1.052)+(14.002), (I-052)+(1.052)+(15.008), (I-052)+(1.052)+(15.011), (I-052)+(1.052)+(15.012), (I-052)+(1.052)+(15.016), (I-052)+(1.052)+(15.025), (I-052)+(1.052)+(15.027), (I-052)+(1.052)+(15.047), (I-052)+(1.052)+(15.063), (I-052)+(1.052)+(15.064), (I-052)+(1.052)+(16.001), (I-052)+(1.052)+(16.002), (I-052)+(1.052)+(16.003), (I-052)+(1.052)+(16.004), (I-052)+(1.052)+(16.005), (I-052)+(1.052)+(16.006), (I-052)+(1.052)+(16.007), (I-052)+(1.052)+(16.008), (I-052)+(1.052)+(17.001), (I-052)+(1.052)+(17.002), (I-052)+(1.052)+(17.003), (I-052)+(1.052)+(17.004), (I-052)+(1.052)+(17.005), (I-052)+(1.052)+(17.006), (I-052)+(1.052)+(17.007), (I-052)+(1.052)+(17.008), (I-052)+(1.052)+(17.009), (I-052)+(1.052)+(17.010), (I-052)+(1.052)+(17.011), (I-052)+(1.052)+(17.012), (I-052)+(1.052)+(18.001), (I-052)+(1.053)+(1.054), (I-052)+(1.053)+(1.055), (I-052)+(1.053)+(1.056), (I-052)+(1.053)+(1.057), (I-052)+(1.053)+(1.058), (I-052)+(1.053)+(1.059), (I-052)+(1.053)+(1.060), (I-052)+(1.053)+(1.061), (I-052)+(1.053)+(1.062), (I-052)+(1.053)+(1.063), (I-052)+(1.053)+(1.064), (I-052)+(1.053)+(1.065), (I-052)+(1.053)+(1.066), (I-052)+(1.053)+(1.067), (I-052)+(1.053)+(1.068), (I-052)+(1.053)+(1.069), (I-052)+(1.053)+(1.070), (I-052)+(1.053)+(1.071), (I-052)+(1.053)+(1.072), (I-052)+(1.053)+(1.073), (I-052)+(1.053)+(1.074), (I-052)+(1.053)+(1.075), (I-052)+(1.053)+(1.076), (I-052)+(1.053)+(1.077), (I-052)+(1.053)+(1.078), (I-052)+(1.053)+(1.079), (I-052)+(1.053)+(1.080), (I-052)+(1.053)+(1.081), (I-052)+(1.053)+(1.082), (I-052)+(1.053)+(1.083), (I-052)+(1.053)+(1.084), (I-052)+(1.053)+(1.085), (I-052)+(1.053)+(1.086), (I-052)+(1.053)+(1.087), (I-052)+(1.053)+(1.088), (I-052)+(1.053)+(1.089), (I-052)+(1.053)+(1.090), (I-052)+(1.053)+(1.091), (I-052)+(1.053)+(1.092), (I-052)+(1.053)+(2.001), (I-052)+(1.053)+(2.002), (I-052)+(1.053)+(2.003), (I-052)+(1.053)+(2.004), (I-052)+(1.053)+(2.005), (I-052)+(1.053)+(2.006), (I-052)+(1.053)+(2.007), (I-052)+(1.053)+(2.008), (I-052)+(1.053)+(2.009), (I-052)+(1.053)+(2.010), (I-052)+(1.053)+(2.011), (I-052)+(1.053)+(2.012), (I-052)+(1.053)+(2.013), (I-052)+(1.053)+(2.014), (I-052)+(1.053)+(2.015), (I-052)+(1.053)+(2.016), (I-052)+(1.053)+(2.017), (I-052)+(1.053)+(2.018), (I-052)+(1.053)+(2.019), (I-052)+(1.053)+(2.020), (I-052)+(1.053)+(2.021), (I-052)+(1.053)+(2.022), (I-052)+(1.053)+(2.023), (I-052)+(1.053)+(2.024), (I-052)+(1.053)+(2.025), (I-052)+(1.053)+(2.026), (I-052)+(1.053)+(2.027), (I-052)+(1.053)+(2.028), (I-052)+(1.053)+(2.029), (I-052)+(1.053)+(2.030), (I-052)+(1.053)+(2.031), (I-052)+(1.053)+(2.032), (I-052)+(1.053)+(2.033), (I-052)+(1.053)+(2.034), (I-052)+(1.053)+(2.035), (I-052)+(1.053)+(2.036), (I-052)+(1.053)+(2.037), (I-052)+(1.053)+(2.038), (I-052)+(1.053)+(2.039), (I-052)+(1.053)+(2.040), (I-052)+(1.053)+(2.041), (I-052)+(1.053)+(2.042), (I-052)+(1.053)+(2.043), (I-052)+(1.053)+(2.044), (I-052)+(1.053)+(2.045), (I-052)+(1.053)+(2.046), (I-052)+(1.053)+(2.047), (I-052)+(1.053)+(2.048), (I-052)+(1.053)+(2.049), (I-052)+(1.053)+(2.050), (I-052)+(1.053)+(2.051), (I-052)+(1.053)+(2.052), (I-052)+(1.053)+(2.053), (I-052)+(1.053)+(2.054), (I-052)+(1.053)+(2.055), (I-052)+(1.053)+(2.056), (I-052)+(1.053)+(2.057), (I-052)+(1.053)+(2.058), (I-052)+(1.053)+(2.059), (I-052)+(1.053)+(3.001), (I-052)+(1.053)+(3.002), (I-052)+(1.053)+(3.003), (I-052)+(1.053)+(3.004), (I-052)+(1.053)+(3.005), (I-052)+(1.053)+(3.006), (I-052)+(1.053)+(3.007), (I-052)+(1.053)+(3.008), (I-052)+(1.053)+(3.009), (I-052)+(1.053)+(3.010), (I-052)+(1.053)+(3.011), (I-052)+(1.053)+(3.012), (I-052)+(1.053)+(3.013), (I-052)+(1.053)+(3.014), (I-052)+(1.053)+(3.015), (I-052)+(1.053)+(3.016), (I-052)+(1.053)+(3.017), (I-052)+(1.053)+(3.018), (I-052)+(1.053)+(3.019), (I-052)+(1.053)+(3.020), (I-052)+(1.053)+(3.021), (I-052)+(1.053)+(3.022), (I-052)+(1.053)+(3.023), (I-052)+(1.053)+(3.024), (I-052)+(1.053)+(3.025), (I-052)+(1.053)+(3.026), (I-052)+(1.053)+(3.027), (I-052)+(1.053)+(3.028), (I-052)+(1.053)+(3.029), (I-052)+(1.053)+(3.030), (I-052)+(1.053)+(3.031), (I-052)+(1.053)+(5.001), (I-052)+(1.053)+(5.002), (I-052)+(1.053)+(5.003), (I-052)+(1.053)+(5.004), (I-052)+(1.053)+(5.005), (I-052)+(1.053)+(5.006), (I-052)+(1.053)+(5.007), (I-052)+(1.053)+(5.008), (I-052)+(1.053)+(5.009), (I-052)+(1.053)+(5.010), (I-052)+(1.053)+(5.011), (I-052)+(1.053)+(5.012), (I-052)+(1.053)+(5.013), (I-052)+(1.053)+(5.014), (I-052)+(1.053)+(5.015), (I-052)+(1.053)+(5.016), (I-052)+(1.053)+(5.017), (I-052)+(1.053)+(5.018), (I-052)+(1.053)+(5.019), (I-052)+(1.053)+(5.020), (I-052)+(1.053)+(5.021), (I-052)+(1.053)+(5.022), (I-052)+(1.053)+(5.023), (I-052)+(1.053)+(6.001), (I-052)+(1.053)+(6.002), (I-052)+(1.053)+(6.003), (I-052)+(1.053)+(6.004), (I-052)+(1.053)+(7.001), (I-052)+(1.053)+(7.002), (I-052)+(1.053)+(7.003), (I-052)+(1.053)+(7.004), (I-052)+(1.053)+(7.005), (I-052)+(1.053)+(7.006), (I-052)+(1.053)+(9.001), (I-052)+(1.053)+(9.002), (I-052)+(1.053)+(9.003), (I-052)+(1.053)+(9.004), (I-052)+(1.053)+(9.005), (I-052)+(1.053)+(9.006), (I-052)+(1.053)+(9.007), (I-052)+(1.053)+(9.008), (I-052)+(1.053)+(9.009), (I-052)+(1.053)+(14.001), (I-052)+(1.053)+(14.002), (I-052)+(1.053)+(15.008), (I-052)+(1.053)+(15.011), (I-052)+(1.053)+(15.012), (I-052)+(1.053)+(15.016), (I-052)+(1.053)+(15.025), (I-052)+(1.053)+(15.027), (I-052)+(1.053)+(15.047), (I-052)+(1.053)+(15.063), (I-052)+(1.053)+(15.064), (I-052)+(1.053)+(16.001), (I-052)+(1.053)+(16.002), (I-052)+(1.053)+(16.003), (I-052)+(1.053)+(16.004), (I-052)+(1.053)+(16.005), (I-052)+(1.053)+(16.006), (I-052)+(1.053)+(16.007), (I-052)+(1.053)+(16.008), (I-052)+(1.053)+(17.001), (I-052)+(1.053)+(17.002), (I-052)+(1.053)+(17.003), (I-052)+(1.053)+(17.004), (I-052)+(1.053)+(17.005), (I-052)+(1.053)+(17.006), (I-052)+(1.053)+(17.007), (I-052)+(1.053)+(17.008), (I-052)+(1.053)+(17.009), (I-052)+(1.053)+(17.010), (I-052)+(1.053)+(17.011), (I-052)+(1.053)+(17.012), (I-052)+(1.053)+(18.001), (I-052)+(1.054)+(1.055), (I-052)+(1.054)+(1.056), (I-052)+(1.054)+(1.057), (I-052)+(1.054)+(1.058), (I-052)+(1.054)+(1.059), (I-052)+(1.054)+(1.060), (I-052)+(1.054)+(1.061), (I-052)+(1.054)+(1.062), (I-052)+(1.054)+(1.063), (I-052)+(1.054)+(1.064), (I-052)+(1.054)+(1.065), (I-052)+(1.054)+(1.066), (I-052)+(1.054)+(1.067), (I-052)+(1.054)+(1.068), (I-052)+(1.054)+(1.069), (I-052)+(1.054)+(1.070), (I-052)+(1.054)+(1.071), (I-052)+(1.054)+(1.072), (I-052)+(1.054)+(1.073), (I-052)+(1.054)+(1.074), (I-052)+(1.054)+(1.075), (I-052)+(1.054)+(1.076), (I-052)+(1.054)+(1.077), (I-052)+(1.054)+(1.078), (I-052)+(1.054)+(1.079), (I-052)+(1.054)+(1.080), (I-052)+(1.054)+(1.081), (I-052)+(1.054)+(1.082), (I-052)+(1.054)+(1.083), (I-052)+(1.054)+(1.084), (I-052)+(1.054)+(1.085), (I-052)+(1.054)+(1.086), (I-052)+(1.054)+(1.087), (I-052)+(1.054)+(1.088), (I-052)+(1.054)+(1.089), (I-052)+(1.054)+(1.090), (I-052)+(1.054)+(1.091), (I-052)+(1.054)+(1.092), (I-052)+(1.054)+(2.001), (I-052)+(1.054)+(2.002), (I-052)+(1.054)+(2.003), (I-052)+(1.054)+(2.004), (I-052)+(1.054)+(2.005), (I-052)+(1.054)+(2.006), (I-052)+(1.054)+(2.007), (I-052)+(1.054)+(2.008), (I-052)+(1.054)+(2.009), (I-052)+(1.054)+(2.010), (I-052)+(1.054)+(2.011), (I-052)+(1.054)+(2.012), (I-052)+(1.054)+(2.013), (I-052)+(1.054)+(2.014), (I-052)+(1.054)+(2.015), (I-052)+(1.054)+(2.016), (I-052)+(1.054)+(2.017), (I-052)+(1.054)+(2.018), (I-052)+(1.054)+(2.019), (I-052)+(1.054)+(2.020), (I-052)+(1.054)+(2.021), (I-052)+(1.054)+(2.022), (I-052)+(1.054)+(2.023), (I-052)+(1.054)+(2.024), (I-052)+(1.054)+(2.025), (I-052)+(1.054)+(2.026), (I-052)+(1.054)+(2.027), (I-052)+(1.054)+(2.028), (I-052)+(1.054)+(2.029), (I-052)+(1.054)+(2.030), (I-052)+(1.054)+(2.031), (I-052)+(1.054)+(2.032), (I-052)+(1.054)+(2.033), (I-052)+(1.054)+(2.034), (I-052)+(1.054)+(2.035), (I-052)+(1.054)+(2.036), (I-052)+(1.054)+(2.037), (I-052)+(1.054)+(2.038), (I-052)+(1.054)+(2.039), (I-052)+(1.054)+(2.040), (I-052)+(1.054)+(2.041), (I-052)+(1.054)+(2.042), (I-052)+(1.054)+(2.043), (I-052)+(1.054)+(2.044), (I-052)+(1.054)+(2.045), (I-052)+(1.054)+(2.046), (I-052)+(1.054)+(2.047), (I-052)+(1.054)+(2.048), (I-052)+(1.054)+(2.049), (I-052)+(1.054)+(2.050), (I-052)+(1.054)+(2.051), (I-052)+(1.054)+(2.052), (I-052)+(1.054)+(2.053), (I-052)+(1.054)+(2.054), (I-052)+(1.054)+(2.055), (I-052)+(1.054)+(2.056), (I-052)+(1.054)+(2.057), (I-052)+(1.054)+(2.058), (I-052)+(1.054)+(2.059), (I-052)+(1.054)+(3.001), (I-052)+(1.054)+(3.002), (I-052)+(1.054)+(3.003), (I-052)+(1.054)+(3.004), (I-052)+(1.054)+(3.005), (I-052)+(1.054)+(3.006), (I-052)+(1.054)+(3.007), (I-052)+(1.054)+(3.008), (I-052)+(1.054)+(3.009), (I-052)+(1.054)+(3.010), (I-052)+(1.054)+(3.011), (I-052)+(1.054)+(3.012), (I-052)+(1.054)+(3.013), (I-052)+(1.054)+(3.014), (I-052)+(1.054)+(3.015), (I-052)+(1.054)+(3.016), (I-052)+(1.054)+(3.017), (I-052)+(1.054)+(3.018), (I-052)+(1.054)+(3.019), (I-052)+(1.054)+(3.020), (I-052)+(1.054)+(3.021), (I-052)+(1.054)+(3.022), (I-052)+(1.054)+(3.023), (I-052)+(1.054)+(3.024), (I-052)+(1.054)+(3.025), (I-052)+(1.054)+(3.026), (I-052)+(1.054)+(3.027), (I-052)+(1.054)+(3.028), (I-052)+(1.054)+(3.029), (I-052)+(1.054)+(3.030), (I-052)+(1.054)+(3.031), (I-052)+(1.054)+(5.001), (I-052)+(1.054)+(5.002), (I-052)+(1.054)+(5.003), (I-052)+(1.054)+(5.004), (I-052)+(1.054)+(5.005), (I-052)+(1.054)+(5.006), (I-052)+(1.054)+(5.007), (I-052)+(1.054)+(5.008), (I-052)+(1.054)+(5.009), (I-052)+(1.054)+(5.010), (I-052)+(1.054)+(5.011), (I-052)+(1.054)+(5.012), (I-052)+(1.054)+(5.013), (I-052)+(1.054)+(5.014), (I-052)+(1.054)+(5.015), (I-052)+(1.054)+(5.016), (I-052)+(1.054)+(5.017), (I-052)+(1.054)+(5.018), (I-052)+(1.054)+(5.019), (I-052)+(1.054)+(5.020), (I-052)+(1.054)+(5.021), (I-052)+(1.054)+(5.022), (I-052)+(1.054)+(5.023), (I-052)+(1.054)+(6.001), (I-052)+(1.054)+(6.002), (I-052)+(1.054)+(6.003), (I-052)+(1.054)+(6.004), (I-052)+(1.054)+(7.001), (I-052)+(1.054)+(7.002), (I-052)+(1.054)+(7.003), (I-052)+(1.054)+(7.004), (I-052)+(1.054)+(7.005), (I-052)+(1.054)+(7.006), (I-052)+(1.054)+(9.001), (I-052)+(1.054)+(9.002), (I-052)+(1.054)+(9.003), (I-052)+(1.054)+(9.004), (I-052)+(1.054)+(9.005), (I-052)+(1.054)+(9.006), (I-052)+(1.054)+(9.007), (I-052)+(1.054)+(9.008), (I-052)+(1.054)+(9.009), (I-052)+(1.054)+(14.001), (I-052)+(1.054)+(14.002), (I-052)+(1.054)+(15.008), (I-052)+(1.054)+(15.011), (I-052)+(1.054)+(15.012), (I-052)+(1.054)+(15.016), (I-052)+(1.054)+(15.025), (I-052)+(1.054)+(15.027), (I-052)+(1.054)+(15.047), (I-052)+(1.054)+(15.063), (I-052)+(1.054)+(15.064), (I-052)+(1.054)+(16.001), (I-052)+(1.054)+(16.002), (I-052)+(1.054)+(16.003), (I-052)+(1.054)+(16.004), (I-052)+(1.054)+(16.005), (I-052)+(1.054)+(16.006), (I-052)+(1.054)+(16.007), (I-052)+(1.054)+(16.008), (I-052)+(1.054)+(17.001), (I-052)+(1.054)+(17.002), (I-052)+(1.054)+(17.003), (I-052)+(1.054)+(17.004), (I-052)+(1.054)+(17.005), (I-052)+(1.054)+(17.006), (I-052)+(1.054)+(17.007), (I-052)+(1.054)+(17.008), (I-052)+(1.054)+(17.009), (I-052)+(1.054)+(17.010), (I-052)+(1.054)+(17.011), (I-052)+(1.054)+(17.012), (I-052)+(1.054)+(18.001), (I-052)+(1.055)+(1.056), (I-052)+(1.055)+(1.057), (I-052)+(1.055)+(1.058), (I-052)+(1.055)+(1.059), (I-052)+(1.055)+(1.060), (I-052)+(1.055)+(1.061), (I-052)+(1.055)+(1.062), (I-052)+(1.055)+(1.063), (I-052)+(1.055)+(1.064), (I-052)+(1.055)+(1.065), (I-052)+(1.055)+(1.066), (I-052)+(1.055)+(1.067), (I-052)+(1.055)+(1.068), (I-052)+(1.055)+(1.069), (I-052)+(1.055)+(1.070), (I-052)+(1.055)+(1.071), (I-052)+(1.055)+(1.072), (I-052)+(1.055)+(1.073), (I-052)+(1.055)+(1.074), (I-052)+(1.055)+(1.075), (I-052)+(1.055)+(1.076), (I-052)+(1.055)+(1.077), (I-052)+(1.055)+(1.078), (I-052)+(1.055)+(1.079), (I-052)+(1.055)+(1.080), (I-052)+(1.055)+(1.081), (I-052)+(1.055)+(1.082), (I-052)+(1.055)+(1.083), (I-052)+(1.055)+(1.084), (I-052)+(1.055)+(1.085), (I-052)+(1.055)+(1.086), (I-052)+(1.055)+(1.087), (I-052)+(1.055)+(1.088), (I-052)+(1.055)+(1.089), (I-052)+(1.055)+(1.090), (I-052)+(1.055)+(1.091), (I-052)+(1.055)+(1.092), (I-052)+(1.055)+(2.001), (I-052)+(1.055)+(2.002), (I-052)+(1.055)+(2.003), (I-052)+(1.055)+(2.004), (I-052)+(1.055)+(2.005), (I-052)+(1.055)+(2.006), (I-052)+(1.055)+(2.007), (I-052)+(1.055)+(2.008), (I-052)+(1.055)+(2.009), (I-052)+(1.055)+(2.010), (I-052)+(1.055)+(2.011), (I-052)+(1.055)+(2.012), (I-052)+(1.055)+(2.013), (I-052)+(1.055)+(2.014), (I-052)+(1.055)+(2.015), (I-052)+(1.055)+(2.016), (I-052)+(1.055)+(2.017), (I-052)+(1.055)+(2.018), (I-052)+(1.055)+(2.019), (I-052)+(1.055)+(2.020), (I-052)+(1.055)+(2.021), (I-052)+(1.055)+(2.022), (I-052)+(1.055)+(2.023), (I-052)+(1.055)+(2.024), (I-052)+(1.055)+(2.025), (I-052)+(1.055)+(2.026), (I-052)+(1.055)+(2.027), (I-052)+(1.055)+(2.028), (I-052)+(1.055)+(2.029), (I-052)+(1.055)+(2.030), (I-052)+(1.055)+(2.031), (I-052)+(1.055)+(2.032), (I-052)+(1.055)+(2.033), (I-052)+(1.055)+(2.034), (I-052)+(1.055)+(2.035), (I-052)+(1.055)+(2.036), (I-052)+(1.055)+(2.037), (I-052)+(1.055)+(2.038), (I-052)+(1.055)+(2.039), (I-052)+(1.055)+(2.040), (I-052)+(1.055)+(2.041), (I-052)+(1.055)+(2.042), (I-052)+(1.055)+(2.043), (I-052)+(1.055)+(2.044), (I-052)+(1.055)+(2.045), (I-052)+(1.055)+(2.046), (I-052)+(1.055)+(2.047), (I-052)+(1.055)+(2.048), (I-052)+(1.055)+(2.049), (I-052)+(1.055)+(2.050), (I-052)+(1.055)+(2.051), (I-052)+(1.055)+(2.052), (I-052)+(1.055)+(2.053), (I-052)+(1.055)+(2.054), (I-052)+(1.055)+(2.055), (I-052)+(1.055)+(2.056), (I-052)+(1.055)+(2.057), (I-052)+(1.055)+(2.058), (I-052)+(1.055)+(2.059), (I-052)+(1.055)+(3.001), (I-052)+(1.055)+(3.002), (I-052)+(1.055)+(3.003), (I-052)+(1.055)+(3.004), (I-052)+(1.055)+(3.005), (I-052)+(1.055)+(3.006), (I-052)+(1.055)+(3.007), (I-052)+(1.055)+(3.008), (I-052)+(1.055)+(3.009), (I-052)+(1.055)+(3.010), (I-052)+(1.055)+(3.011), (I-052)+(1.055)+(3.012), (I-052)+(1.055)+(3.013), (I-052)+(1.055)+(3.014), (I-052)+(1.055)+(3.015), (I-052)+(1.055)+(3.016), (I-052)+(1.055)+(3.017), (I-052)+(1.055)+(3.018), (I-052)+(1.055)+(3.019), (I-052)+(1.055)+(3.020), (I-052)+(1.055)+(3.021), (I-052)+(1.055)+(3.022), (I-052)+(1.055)+(3.023), (I-052)+(1.055)+(3.024), (I-052)+(1.055)+(3.025), (I-052)+(1.055)+(3.026), (I-052)+(1.055)+(3.027), (I-052)+(1.055)+(3.028), (I-052)+(1.055)+(3.029), (I-052)+(1.055)+(3.030), (I-052)+(1.055)+(3.031), (I-052)+(1.055)+(5.001), (I-052)+(1.055)+(5.002), (I-052)+(1.055)+(5.003), (I-052)+(1.055)+(5.004), (I-052)+(1.055)+(5.005), (I-052)+(1.055)+(5.006), (I-052)+(1.055)+(5.007), (I-052)+(1.055)+(5.008), (I-052)+(1.055)+(5.009), (I-052)+(1.055)+(5.010), (I-052)+(1.055)+(5.011), (I-052)+(1.055)+(5.012), (I-052)+(1.055)+(5.013), (I-052)+(1.055)+(5.014), (I-052)+(1.055)+(5.015), (I-052)+(1.055)+(5.016), (I-052)+(1.055)+(5.017), (I-052)+(1.055)+(5.018), (I-052)+(1.055)+(5.019), (I-052)+(1.055)+(5.020), (I-052)+(1.055)+(5.021), (I-052)+(1.055)+(5.022), (I-052)+(1.055)+(5.023), (I-052)+(1.055)+(6.001), (I-052)+(1.055)+(6.002), (I-052)+(1.055)+(6.003), (I-052)+(1.055)+(6.004), (I-052)+(1.055)+(7.001), (I-052)+(1.055)+(7.002), (I-052)+(1.055)+(7.003), (I-052)+(1.055)+(7.004), (I-052)+(1.055)+(7.005), (I-052)+(1.055)+(7.006), (I-052)+(1.055)+(9.001), (I-052)+(1.055)+(9.002), (I-052)+(1.055)+(9.003), (I-052)+(1.055)+(9.004), (I-052)+(1.055)+(9.005), (I-052)+(1.055)+(9.006), (I-052)+(1.055)+(9.007), (I-052)+(1.055)+(9.008), (I-052)+(1.055)+(9.009), (I-052)+(1.055)+(14.001), (I-052)+(1.055)+(14.002), (I-052)+(1.055)+(15.008), (I-052)+(1.055)+(15.011), (I-052)+(1.055)+(15.012), (I-052)+(1.055)+(15.016), (I-052)+(1.055)+(15.025), (I-052)+(1.055)+(15.027), (I-052)+(1.055)+(15.047), (I-052)+(1.055)+(15.063), (I-052)+(1.055)+(15.064), (I-052)+(1.055)+(16.001), (I-052)+(1.055)+(16.002), (I-052)+(1.055)+(16.003), (I-052)+(1.055)+(16.004), (I-052)+(1.055)+(16.005), (I-052)+(1.055)+(16.006), (I-052)+(1.055)+(16.007), (I-052)+(1.055)+(16.008), (I-052)+(1.055)+(17.001), (I-052)+(1.055)+(17.002), (I-052)+(1.055)+(17.003), (I-052)+(1.055)+(17.004), (I-052)+(1.055)+(17.005), (I-052)+(1.055)+(17.006), (I-052)+(1.055)+(17.007), (I-052)+(1.055)+(17.008), (I-052)+(1.055)+(17.009), (I-052)+(1.055)+(17.010), (I-052)+(1.055)+(17.011), (I-052)+(1.055)+(17.012), (I-052)+(1.055)+(18.001), (I-052)+(1.056)+(1.057), (I-052)+(1.056)+(1.058), (I-052)+(1.056)+(1.059), (I-052)+(1.056)+(1.060), (I-052)+(1.056)+(1.061), (I-052)+(1.056)+(1.062), (I-052)+(1.056)+(1.063), (I-052)+(1.056)+(1.064), (I-052)+(1.056)+(1.065), (I-052)+(1.056)+(1.066), (I-052)+(1.056)+(1.067), (I-052)+(1.056)+(1.068), (I-052)+(1.056)+(1.069), (I-052)+(1.056)+(1.070), (I-052)+(1.056)+(1.071), (I-052)+(1.056)+(1.072), (I-052)+(1.056)+(1.073), (I-052)+(1.056)+(1.074), (I-052)+(1.056)+(1.075), (I-052)+(1.056)+(1.076), (I-052)+(1.056)+(1.077), (I-052)+(1.056)+(1.078), (I-052)+(1.056)+(1.079), (I-052)+(1.056)+(1.080), (I-052)+(1.056)+(1.081), (I-052)+(1.056)+(1.082), (I-052)+(1.056)+(1.083), (I-052)+(1.056)+(1.084), (I-052)+(1.056)+(1.085), (I-052)+(1.056)+(1.086), (I-052)+(1.056)+(1.087), (I-052)+(1.056)+(1.088), (I-052)+(1.056)+(1.089), (I-052)+(1.056)+(1.090), (I-052)+(1.056)+(1.091), (I-052)+(1.056)+(1.092), (I-052)+(1.056)+(2.001), (I-052)+(1.056)+(2.002), (I-052)+(1.056)+(2.003), (I-052)+(1.056)+(2.004), (I-052)+(1.056)+(2.005), (I-052)+(1.056)+(2.006), (I-052)+(1.056)+(2.007), (I-052)+(1.056)+(2.008), (I-052)+(1.056)+(2.009), (I-052)+(1.056)+(2.010), (I-052)+(1.056)+(2.011), (I-052)+(1.056)+(2.012), (I-052)+(1.056)+(2.013), (I-052)+(1.056)+(2.014), (I-052)+(1.056)+(2.015), (I-052)+(1.056)+(2.016), (I-052)+(1.056)+(2.017), (I-052)+(1.056)+(2.018), (I-052)+(1.056)+(2.019), (I-052)+(1.056)+(2.020), (I-052)+(1.056)+(2.021), (I-052)+(1.056)+(2.022), (I-052)+(1.056)+(2.023), (I-052)+(1.056)+(2.024), (I-052)+(1.056)+(2.025), (I-052)+(1.056)+(2.026), (I-052)+(1.056)+(2.027), (I-052)+(1.056)+(2.028), (I-052)+(1.056)+(2.029), (I-052)+(1.056)+(2.030), (I-052)+(1.056)+(2.031), (I-052)+(1.056)+(2.032), (I-052)+(1.056)+(2.033), (I-052)+(1.056)+(2.034), (I-052)+(1.056)+(2.035), (I-052)+(1.056)+(2.036), (I-052)+(1.056)+(2.037), (I-052)+(1.056)+(2.038), (I-052)+(1.056)+(2.039), (I-052)+(1.056)+(2.040), (I-052)+(1.056)+(2.041), (I-052)+(1.056)+(2.042), (I-052)+(1.056)+(2.043), (I-052)+(1.056)+(2.044), (I-052)+(1.056)+(2.045), (I-052)+(1.056)+(2.046), (I-052)+(1.056)+(2.047), (I-052)+(1.056)+(2.048), (I-052)+(1.056)+(2.049), (I-052)+(1.056)+(2.050), (I-052)+(1.056)+(2.051), (I-052)+(1.056)+(2.052), (I-052)+(1.056)+(2.053), (I-052)+(1.056)+(2.054), (I-052)+(1.056)+(2.055), (I-052)+(1.056)+(2.056), (I-052)+(1.056)+(2.057), (I-052)+(1.056)+(2.058), (I-052)+(1.056)+(2.059), (I-052)+(1.056)+(3.001), (I-052)+(1.056)+(3.002), (I-052)+(1.056)+(3.003), (I-052)+(1.056)+(3.004), (I-052)+(1.056)+(3.005), (I-052)+(1.056)+(3.006), (I-052)+(1.056)+(3.007), (I-052)+(1.056)+(3.008), (I-052)+(1.056)+(3.009), (I-052)+(1.056)+(3.010), (I-052)+(1.056)+(3.011), (I-052)+(1.056)+(3.012), (I-052)+(1.056)+(3.013), (I-052)+(1.056)+(3.014), (I-052)+(1.056)+(3.015), (I-052)+(1.056)+(3.016), (I-052)+(1.056)+(3.017), (I-052)+(1.056)+(3.018), (I-052)+(1.056)+(3.019), (I-052)+(1.056)+(3.020), (I-052)+(1.056)+(3.021), (I-052)+(1.056)+(3.022), (I-052)+(1.056)+(3.023), (I-052)+(1.056)+(3.024), (I-052)+(1.056)+(3.025), (I-052)+(1.056)+(3.026), (I-052)+(1.056)+(3.027), (I-052)+(1.056)+(3.028), (I-052)+(1.056)+(3.029), (I-052)+(1.056)+(3.030), (I-052)+(1.056)+(3.031), (I-052)+(1.056)+(5.001), (I-052)+(1.056)+(5.002), (I-052)+(1.056)+(5.003), (I-052)+(1.056)+(5.004), (I-052)+(1.056)+(5.005), (I-052)+(1.056)+(5.006), (I-052)+(1.056)+(5.007), (I-052)+(1.056)+(5.008), (I-052)+(1.056)+(5.009), (I-052)+(1.056)+(5.010), (I-052)+(1.056)+(5.011), (I-052)+(1.056)+(5.012), (I-052)+(1.056)+(5.013), (I-052)+(1.056)+(5.014), (I-052)+(1.056)+(5.015), (I-052)+(1.056)+(5.016), (I-052)+(1.056)+(5.017), (I-052)+(1.056)+(5.018), (I-052)+(1.056)+(5.019), (I-052)+(1.056)+(5.020), (I-052)+(1.056)+(5.021), (I-052)+(1.056)+(5.022), (I-052)+(1.056)+(5.023), (I-052)+(1.056)+(6.001), (I-052)+(1.056)+(6.002), (I-052)+(1.056)+(6.003), (I-052)+(1.056)+(6.004), (I-052)+(1.056)+(7.001), (I-052)+(1.056)+(7.002), (I-052)+(1.056)+(7.003), (I-052)+(1.056)+(7.004), (I-052)+(1.056)+(7.005), (I-052)+(1.056)+(7.006), (I-052)+(1.056)+(9.001), (I-052)+(1.056)+(9.002), (I-052)+(1.056)+(9.003), (I-052)+(1.056)+(9.004), (I-052)+(1.056)+(9.005), (I-052)+(1.056)+(9.006), (I-052)+(1.056)+(9.007), (I-052)+(1.056)+(9.008), (I-052)+(1.056)+(9.009), (I-052)+(1.056)+(14.001), (I-052)+(1.056)+(14.002), (I-052)+(1.056)+(15.008), (I-052)+(1.056)+(15.011), (I-052)+(1.056)+(15.012), (I-052)+(1.056)+(15.016), (I-052)+(1.056)+(15.025), (I-052)+(1.056)+(15.027), (I-052)+(1.056)+(15.047), (I-052)+(1.056)+(15.063), (I-052)+(1.056)+(15.064), (I-052)+(1.056)+(16.001), (I-052)+(1.056)+(16.002), (I-052)+(1.056)+(16.003), (I-052)+(1.056)+(16.004), (I-052)+(1.056)+(16.005), (I-052)+(1.056)+(16.006), (I-052)+(1.056)+(16.007), (I-052)+(1.056)+(16.008), (I-052)+(1.056)+(17.001), (I-052)+(1.056)+(17.002), (I-052)+(1.056)+(17.003), (I-052)+(1.056)+(17.004), (I-052)+(1.056)+(17.005), (I-052)+(1.056)+(17.006), (I-052)+(1.056)+(17.007), (I-052)+(1.056)+(17.008), (I-052)+(1.056)+(17.009), (I-052)+(1.056)+(17.010), (I-052)+(1.056)+(17.011), (I-052)+(1.056)+(17.012), (I-052)+(1.056)+(18.001), (I-052)+(1.057)+(1.058), (I-052)+(1.057)+(1.059), (I-052)+(1.057)+(1.060), (I-052)+(1.057)+(1.061), (I-052)+(1.057)+(1.062), (I-052)+(1.057)+(1.063), (I-052)+(1.057)+(1.064), (I-052)+(1.057)+(1.065), (I-052)+(1.057)+(1.066), (I-052)+(1.057)+(1.067), (I-052)+(1.057)+(1.068), (I-052)+(1.057)+(1.069), (I-052)+(1.057)+(1.070), (I-052)+(1.057)+(1.071), (I-052)+(1.057)+(1.072), (I-052)+(1.057)+(1.073), (I-052)+(1.057)+(1.074), (I-052)+(1.057)+(1.075), (I-052)+(1.057)+(1.076), (I-052)+(1.057)+(1.077), (I-052)+(1.057)+(1.078), (I-052)+(1.057)+(1.079), (I-052)+(1.057)+(1.080), (I-052)+(1.057)+(1.081), (I-052)+(1.057)+(1.082), (I-052)+(1.057)+(1.083), (I-052)+(1.057)+(1.084), (I-052)+(1.057)+(1.085), (I-052)+(1.057)+(1.086), (I-052)+(1.057)+(1.087), (I-052)+(1.057)+(1.088), (I-052)+(1.057)+(1.089), (I-052)+(1.057)+(1.090), (I-052)+(1.057)+(1.091), (I-052)+(1.057)+(1.092), (I-052)+(1.057)+(2.001), (I-052)+(1.057)+(2.002), (I-052)+(1.057)+(2.003), (I-052)+(1.057)+(2.004), (I-052)+(1.057)+(2.005), (I-052)+(1.057)+(2.006), (I-052)+(1.057)+(2.007), (I-052)+(1.057)+(2.008), (I-052)+(1.057)+(2.009), (I-052)+(1.057)+(2.010), (I-052)+(1.057)+(2.011), (I-052)+(1.057)+(2.012), (I-052)+(1.057)+(2.013), (I-052)+(1.057)+(2.014), (I-052)+(1.057)+(2.015), (I-052)+(1.057)+(2.016), (I-052)+(1.057)+(2.017), (I-052)+(1.057)+(2.018), (I-052)+(1.057)+(2.019), (I-052)+(1.057)+(2.020), (I-052)+(1.057)+(2.021), (I-052)+(1.057)+(2.022), (I-052)+(1.057)+(2.023), (I-052)+(1.057)+(2.024), (I-052)+(1.057)+(2.025), (I-052)+(1.057)+(2.026), (I-052)+(1.057)+(2.027), (I-052)+(1.057)+(2.028), (I-052)+(1.057)+(2.029), (I-052)+(1.057)+(2.030), (I-052)+(1.057)+(2.031), (I-052)+(1.057)+(2.032), (I-052)+(1.057)+(2.033), (I-052)+(1.057)+(2.034), (I-052)+(1.057)+(2.035), (I-052)+(1.057)+(2.036), (I-052)+(1.057)+(2.037), (I-052)+(1.057)+(2.038), (I-052)+(1.057)+(2.039), (I-052)+(1.057)+(2.040), (I-052)+(1.057)+(2.041), (I-052)+(1.057)+(2.042), (I-052)+(1.057)+(2.043), (I-052)+(1.057)+(2.044), (I-052)+(1.057)+(2.045), (I-052)+(1.057)+(2.046), (I-052)+(1.057)+(2.047), (I-052)+(1.057)+(2.048), (I-052)+(1.057)+(2.049), (I-052)+(1.057)+(2.050), (I-052)+(1.057)+(2.051), (I-052)+(1.057)+(2.052), (I-052)+(1.057)+(2.053), (I-052)+(1.057)+(2.054), (I-052)+(1.057)+(2.055), (I-052)+(1.057)+(2.056), (I-052)+(1.057)+(2.057), (I-052)+(1.057)+(2.058), (I-052)+(1.057)+(2.059), (I-052)+(1.057)+(3.001), (I-052)+(1.057)+(3.002), (I-052)+(1.057)+(3.003), (I-052)+(1.057)+(3.004), (I-052)+(1.057)+(3.005), (I-052)+(1.057)+(3.006), (I-052)+(1.057)+(3.007), (I-052)+(1.057)+(3.008), (I-052)+(1.057)+(3.009), (I-052)+(1.057)+(3.010), (I-052)+(1.057)+(3.011), (I-052)+(1.057)+(3.012), (I-052)+(1.057)+(3.013), (I-052)+(1.057)+(3.014), (I-052)+(1.057)+(3.015), (I-052)+(1.057)+(3.016), (I-052)+(1.057)+(3.017), (I-052)+(1.057)+(3.018), (I-052)+(1.057)+(3.019), (I-052)+(1.057)+(3.020), (I-052)+(1.057)+(3.021), (I-052)+(1.057)+(3.022), (I-052)+(1.057)+(3.023), (I-052)+(1.057)+(3.024), (I-052)+(1.057)+(3.025), (I-052)+(1.057)+(3.026), (I-052)+(1.057)+(3.027), (I-052)+(1.057)+(3.028), (I-052)+(1.057)+(3.029), (I-052)+(1.057)+(3.030), (I-052)+(1.057)+(3.031), (I-052)+(1.057)+(5.001), (I-052)+(1.057)+(5.002), (I-052)+(1.057)+(5.003), (I-052)+(1.057)+(5.004), (I-052)+(1.057)+(5.005), (I-052)+(1.057)+(5.006), (I-052)+(1.057)+(5.007), (I-052)+(1.057)+(5.008), (I-052)+(1.057)+(5.009), (I-052)+(1.057)+(5.010), (I-052)+(1.057)+(5.011), (I-052)+(1.057)+(5.012), (I-052)+(1.057)+(5.013), (I-052)+(1.057)+(5.014), (I-052)+(1.057)+(5.015), (I-052)+(1.057)+(5.016), (I-052)+(1.057)+(5.017), (I-052)+(1.057)+(5.018), (I-052)+(1.057)+(5.019), (I-052)+(1.057)+(5.020), (I-052)+(1.057)+(5.021), (I-052)+(1.057)+(5.022), (I-052)+(1.057)+(5.023), (I-052)+(1.057)+(6.001), (I-052)+(1.057)+(6.002), (I-052)+(1.057)+(6.003), (I-052)+(1.057)+(6.004), (I-052)+(1.057)+(7.001), (I-052)+(1.057)+(7.002), (I-052)+(1.057)+(7.003), (I-052)+(1.057)+(7.004), (I-052)+(1.057)+(7.005), (I-052)+(1.057)+(7.006), (I-052)+(1.057)+(9.001), (I-052)+(1.057)+(9.002), (I-052)+(1.057)+(9.003), (I-052)+(1.057)+(9.004), (I-052)+(1.057)+(9.005), (I-052)+(1.057)+(9.006), (I-052)+(1.057)+(9.007), (I-052)+(1.057)+(9.008), (I-052)+(1.057)+(9.009), (I-052)+(1.057)+(14.001), (I-052)+(1.057)+(14.002), (I-052)+(1.057)+(15.008), (I-052)+(1.057)+(15.011), (I-052)+(1.057)+(15.012), (I-052)+(1.057)+(15.016), (I-052)+(1.057)+(15.025), (I-052)+(1.057)+(15.027), (I-052)+(1.057)+(15.047), (I-052)+(1.057)+(15.063), (I-052)+(1.057)+(15.064), (I-052)+(1.057)+(16.001), (I-052)+(1.057)+(16.002), (I-052)+(1.057)+(16.003), (I-052)+(1.057)+(16.004), (I-052)+(1.057)+(16.005), (I-052)+(1.057)+(16.006), (I-052)+(1.057)+(16.007), (I-052)+(1.057)+(16.008), (I-052)+(1.057)+(17.001), (I-052)+(1.057)+(17.002), (I-052)+(1.057)+(17.003), (I-052)+(1.057)+(17.004), (I-052)+(1.057)+(17.005), (I-052)+(1.057)+(17.006), (I-052)+(1.057)+(17.007), (I-052)+(1.057)+(17.008), (I-052)+(1.057)+(17.009), (I-052)+(1.057)+(17.010), (I-052)+(1.057)+(17.011), (I-052)+(1.057)+(17.012), (I-052)+(1.057)+(18.001), (I-052)+(1.058)+(1.059), (I-052)+(1.058)+(1.060), (I-052)+(1.058)+(1.061), (I-052)+(1.058)+(1.062), (I-052)+(1.058)+(1.063), (I-052)+(1.058)+(1.064), (I-052)+(1.058)+(1.065), (I-052)+(1.058)+(1.066), (I-052)+(1.058)+(1.067), (I-052)+(1.058)+(1.068), (I-052)+(1.058)+(1.069), (I-052)+(1.058)+(1.070), (I-052)+(1.058)+(1.071), (I-052)+(1.058)+(1.072), (I-052)+(1.058)+(1.073), (I-052)+(1.058)+(1.074), (I-052)+(1.058)+(1.075), (I-052)+(1.058)+(1.076), (I-052)+(1.058)+(1.077), (I-052)+(1.058)+(1.078), (I-052)+(1.058)+(1.079), (I-052)+(1.058)+(1.080), (I-052)+(1.058)+(1.081), (I-052)+(1.058)+(1.082), (I-052)+(1.058)+(1.083), (I-052)+(1.058)+(1.084), (I-052)+(1.058)+(1.085), (I-052)+(1.058)+(1.086), (I-052)+(1.058)+(1.087), (I-052)+(1.058)+(1.088), (I-052)+(1.058)+(1.089), (I-052)+(1.058)+(1.090), (I-052)+(1.058)+(1.091), (I-052)+(1.058)+(1.092), (I-052)+(1.058)+(2.001), (I-052)+(1.058)+(2.002), (I-052)+(1.058)+(2.003), (I-052)+(1.058)+(2.004), (I-052)+(1.058)+(2.005), (I-052)+(1.058)+(2.006), (I-052)+(1.058)+(2.007), (I-052)+(1.058)+(2.008), (I-052)+(1.058)+(2.009), (I-052)+(1.058)+(2.010), (I-052)+(1.058)+(2.011), (I-052)+(1.058)+(2.012), (I-052)+(1.058)+(2.013), (I-052)+(1.058)+(2.014), (I-052)+(1.058)+(2.015), (I-052)+(1.058)+(2.016), (I-052)+(1.058)+(2.017), (I-052)+(1.058)+(2.018), (I-052)+(1.058)+(2.019), (I-052)+(1.058)+(2.020), (I-052)+(1.058)+(2.021), (I-052)+(1.058)+(2.022), (I-052)+(1.058)+(2.023), (I-052)+(1.058)+(2.024), (I-052)+(1.058)+(2.025), (I-052)+(1.058)+(2.026), (I-052)+(1.058)+(2.027), (I-052)+(1.058)+(2.028), (I-052)+(1.058)+(2.029), (I-052)+(1.058)+(2.030), (I-052)+(1.058)+(2.031), (I-052)+(1.058)+(2.032), (I-052)+(1.058)+(2.033), (I-052)+(1.058)+(2.034), (I-052)+(1.058)+(2.035), (I-052)+(1.058)+(2.036), (I-052)+(1.058)+(2.037), (I-052)+(1.058)+(2.038), (I-052)+(1.058)+(2.039), (I-052)+(1.058)+(2.040), (I-052)+(1.058)+(2.041), (I-052)+(1.058)+(2.042), (I-052)+(1.058)+(2.043), (I-052)+(1.058)+(2.044), (I-052)+(1.058)+(2.045), (I-052)+(1.058)+(2.046), (I-052)+(1.058)+(2.047), (I-052)+(1.058)+(2.048), (I-052)+(1.058)+(2.049), (I-052)+(1.058)+(2.050), (I-052)+(1.058)+(2.051), (I-052)+(1.058)+(2.052), (I-052)+(1.058)+(2.053), (I-052)+(1.058)+(2.054), (I-052)+(1.058)+(2.055), (I-052)+(1.058)+(2.056), (I-052)+(1.058)+(2.057), (I-052)+(1.058)+(2.058), (I-052)+(1.058)+(2.059), (I-052)+(1.058)+(3.001), (I-052)+(1.058)+(3.002), (I-052)+(1.058)+(3.003), (I-052)+(1.058)+(3.004), (I-052)+(1.058)+(3.005), (I-052)+(1.058)+(3.006), (I-052)+(1.058)+(3.007), (I-052)+(1.058)+(3.008), (I-052)+(1.058)+(3.009), (I-052)+(1.058)+(3.010), (I-052)+(1.058)+(3.011), (I-052)+(1.058)+(3.012), (I-052)+(1.058)+(3.013), (I-052)+(1.058)+(3.014), (I-052)+(1.058)+(3.015), (I-052)+(1.058)+(3.016), (I-052)+(1.058)+(3.017), (I-052)+(1.058)+(3.018), (I-052)+(1.058)+(3.019), (I-052)+(1.058)+(3.020), (I-052)+(1.058)+(3.021), (I-052)+(1.058)+(3.022), (I-052)+(1.058)+(3.023), (I-052)+(1.058)+(3.024), (I-052)+(1.058)+(3.025), (I-052)+(1.058)+(3.026), (I-052)+(1.058)+(3.027), (I-052)+(1.058)+(3.028), (I-052)+(1.058)+(3.029), (I-052)+(1.058)+(3.030), (I-052)+(1.058)+(3.031), (I-052)+(1.058)+(5.001), (I-052)+(1.058)+(5.002), (I-052)+(1.058)+(5.003), (I-052)+(1.058)+(5.004), (I-052)+(1.058)+(5.005), (I-052)+(1.058)+(5.006), (I-052)+(1.058)+(5.007), (I-052)+(1.058)+(5.008), (I-052)+(1.058)+(5.009), (I-052)+(1.058)+(5.010), (I-052)+(1.058)+(5.011), (I-052)+(1.058)+(5.012), (I-052)+(1.058)+(5.013), (I-052)+(1.058)+(5.014), (I-052)+(1.058)+(5.015), (I-052)+(1.058)+(5.016), (I-052)+(1.058)+(5.017), (I-052)+(1.058)+(5.018), (I-052)+(1.058)+(5.019), (I-052)+(1.058)+(5.020), (I-052)+(1.058)+(5.021), (I-052)+(1.058)+(5.022), (I-052)+(1.058)+(5.023), (I-052)+(1.058)+(6.001), (I-052)+(1.058)+(6.002), (I-052)+(1.058)+(6.003), (I-052)+(1.058)+(6.004), (I-052)+(1.058)+(7.001), (I-052)+(1.058)+(7.002), (I-052)+(1.058)+(7.003), (I-052)+(1.058)+(7.004), (I-052)+(1.058)+(7.005), (I-052)+(1.058)+(7.006), (I-052)+(1.058)+(9.001), (I-052)+(1.058)+(9.002), (I-052)+(1.058)+(9.003), (I-052)+(1.058)+(9.004), (I-052)+(1.058)+(9.005), (I-052)+(1.058)+(9.006), (I-052)+(1.058)+(9.007), (I-052)+(1.058)+(9.008), (I-052)+(1.058)+(9.009), (I-052)+(1.058)+(14.001), (I-052)+(1.058)+(14.002), (I-052)+(1.058)+(15.008), (I-052)+(1.058)+(15.011), (I-052)+(1.058)+(15.012), (I-052)+(1.058)+(15.016), (I-052)+(1.058)+(15.025), (I-052)+(1.058)+(15.027), (I-052)+(1.058)+(15.047), (I-052)+(1.058)+(15.063), (I-052)+(1.058)+(15.064), (I-052)+(1.058)+(16.001), (I-052)+(1.058)+(16.002), (I-052)+(1.058)+(16.003), (I-052)+(1.058)+(16.004), (I-052)+(1.058)+(16.005), (I-052)+(1.058)+(16.006), (I-052)+(1.058)+(16.007), (I-052)+(1.058)+(16.008), (I-052)+(1.058)+(17.001), (I-052)+(1.058)+(17.002), (I-052)+(1.058)+(17.003), (I-052)+(1.058)+(17.004), (I-052)+(1.058)+(17.005), (I-052)+(1.058)+(17.006), (I-052)+(1.058)+(17.007), (I-052)+(1.058)+(17.008), (I-052)+(1.058)+(17.009), (I-052)+(1.058)+(17.010), (I-052)+(1.058)+(17.011), (I-052)+(1.058)+(17.012), (I-052)+(1.058)+(18.001), (I-052)+(1.059)+(1.060), (I-052)+(1.059)+(1.061), (I-052)+(1.059)+(1.062), (I-052)+(1.059)+(1.063), (I-052)+(1.059)+(1.064), (I-052)+(1.059)+(1.065), (I-052)+(1.059)+(1.066), (I-052)+(1.059)+(1.067), (I-052)+(1.059)+(1.068), (I-052)+(1.059)+(1.069), (I-052)+(1.059)+(1.070), (I-052)+(1.059)+(1.071), (I-052)+(1.059)+(1.072), (I-052)+(1.059)+(1.073), (I-052)+(1.059)+(1.074), (I-052)+(1.059)+(1.075), (I-052)+(1.059)+(1.076), (I-052)+(1.059)+(1.077), (I-052)+(1.059)+(1.078), (I-052)+(1.059)+(1.079), (I-052)+(1.059)+(1.080), (I-052)+(1.059)+(1.081), (I-052)+(1.059)+(1.082), (I-052)+(1.059)+(1.083), (I-052)+(1.059)+(1.084), (I-052)+(1.059)+(1.085), (I-052)+(1.059)+(1.086), (I-052)+(1.059)+(1.087), (I-052)+(1.059)+(1.088), (I-052)+(1.059)+(1.089), (I-052)+(1.059)+(1.090), (I-052)+(1.059)+(1.091), (I-052)+(1.059)+(1.092), (I-052)+(1.059)+(2.001), (I-052)+(1.059)+(2.002), (I-052)+(1.059)+(2.003), (I-052)+(1.059)+(2.004), (I-052)+(1.059)+(2.005), (I-052)+(1.059)+(2.006), (I-052)+(1.059)+(2.007), (I-052)+(1.059)+(2.008), (I-052)+(1.059)+(2.009), (I-052)+(1.059)+(2.010), (I-052)+(1.059)+(2.011), (I-052)+(1.059)+(2.012), (I-052)+(1.059)+(2.013), (I-052)+(1.059)+(2.014), (I-052)+(1.059)+(2.015), (I-052)+(1.059)+(2.016), (I-052)+(1.059)+(2.017), (I-052)+(1.059)+(2.018), (I-052)+(1.059)+(2.019), (I-052)+(1.059)+(2.020), (I-052)+(1.059)+(2.021), (I-052)+(1.059)+(2.022), (I-052)+(1.059)+(2.023), (I-052)+(1.059)+(2.024), (I-052)+(1.059)+(2.025), (I-052)+(1.059)+(2.026), (I-052)+(1.059)+(2.027), (I-052)+(1.059)+(2.028), (I-052)+(1.059)+(2.029), (I-052)+(1.059)+(2.030), (I-052)+(1.059)+(2.031), (I-052)+(1.059)+(2.032), (I-052)+(1.059)+(2.033), (I-052)+(1.059)+(2.034), (I-052)+(1.059)+(2.035), (I-052)+(1.059)+(2.036), (I-052)+(1.059)+(2.037), (I-052)+(1.059)+(2.038), (I-052)+(1.059)+(2.039), (I-052)+(1.059)+(2.040), (I-052)+(1.059)+(2.041), (I-052)+(1.059)+(2.042), (I-052)+(1.059)+(2.043), (I-052)+(1.059)+(2.044), (I-052)+(1.059)+(2.045), (I-052)+(1.059)+(2.046), (I-052)+(1.059)+(2.047), (I-052)+(1.059)+(2.048), (I-052)+(1.059)+(2.049), (I-052)+(1.059)+(2.050), (I-052)+(1.059)+(2.051), (I-052)+(1.059)+(2.052), (I-052)+(1.059)+(2.053), (I-052)+(1.059)+(2.054), (I-052)+(1.059)+(2.055), (I-052)+(1.059)+(2.056), (I-052)+(1.059)+(2.057), (I-052)+(1.059)+(2.058), (I-052)+(1.059)+(2.059), (I-052)+(1.059)+(3.001), (I-052)+(1.059)+(3.002), (I-052)+(1.059)+(3.003), (I-052)+(1.059)+(3.004), (I-052)+(1.059)+(3.005), (I-052)+(1.059)+(3.006), (I-052)+(1.059)+(3.007), (I-052)+(1.059)+(3.008), (I-052)+(1.059)+(3.009), (I-052)+(1.059)+(3.010), (I-052)+(1.059)+(3.011), (I-052)+(1.059)+(3.012), (I-052)+(1.059)+(3.013), (I-052)+(1.059)+(3.014), (I-052)+(1.059)+(3.015), (I-052)+(1.059)+(3.016), (I-052)+(1.059)+(3.017), (I-052)+(1.059)+(3.018), (I-052)+(1.059)+(3.019), (I-052)+(1.059)+(3.020), (I-052)+(1.059)+(3.021), (I-052)+(1.059)+(3.022), (I-052)+(1.059)+(3.023), (I-052)+(1.059)+(3.024), (I-052)+(1.059)+(3.025), (I-052)+(1.059)+(3.026), (I-052)+(1.059)+(3.027), (I-052)+(1.059)+(3.028), (I-052)+(1.059)+(3.029), (I-052)+(1.059)+(3.030), (I-052)+(1.059)+(3.031), (I-052)+(1.059)+(5.001), (I-052)+(1.059)+(5.002), (I-052)+(1.059)+(5.003), (I-052)+(1.059)+(5.004), (I-052)+(1.059)+(5.005), (I-052)+(1.059)+(5.006), (I-052)+(1.059)+(5.007), (I-052)+(1.059)+(5.008), (I-052)+(1.059)+(5.009), (I-052)+(1.059)+(5.010), (I-052)+(1.059)+(5.011), (I-052)+(1.059)+(5.012), (I-052)+(1.059)+(5.013), (I-052)+(1.059)+(5.014), (I-052)+(1.059)+(5.015), (I-052)+(1.059)+(5.016), (I-052)+(1.059)+(5.017), (I-052)+(1.059)+(5.018), (I-052)+(1.059)+(5.019), (I-052)+(1.059)+(5.020), (I-052)+(1.059)+(5.021), (I-052)+(1.059)+(5.022), (I-052)+(1.059)+(5.023), (I-052)+(1.059)+(6.001), (I-052)+(1.059)+(6.002), (I-052)+(1.059)+(6.003), (I-052)+(1.059)+(6.004), (I-052)+(1.059)+(7.001), (I-052)+(1.059)+(7.002), (I-052)+(1.059)+(7.003), (I-052)+(1.059)+(7.004), (I-052)+(1.059)+(7.005), (I-052)+(1.059)+(7.006), (I-052)+(1.059)+(9.001), (I-052)+(1.059)+(9.002), (I-052)+(1.059)+(9.003), (I-052)+(1.059)+(9.004), (I-052)+(1.059)+(9.005), (I-052)+(1.059)+(9.006), (I-052)+(1.059)+(9.007), (I-052)+(1.059)+(9.008), (I-052)+(1.059)+(9.009), (I-052)+(1.059)+(14.001), (I-052)+(1.059)+(14.002), (I-052)+(1.059)+(15.008), (I-052)+(1.059)+(15.011), (I-052)+(1.059)+(15.012), (I-052)+(1.059)+(15.016), (I-052)+(1.059)+(15.025), (I-052)+(1.059)+(15.027), (I-052)+(1.059)+(15.047), (I-052)+(1.059)+(15.063), (I-052)+(1.059)+(15.064), (I-052)+(1.059)+(16.001), (I-052)+(1.059)+(16.002), (I-052)+(1.059)+(16.003), (I-052)+(1.059)+(16.004), (I-052)+(1.059)+(16.005), (I-052)+(1.059)+(16.006), (I-052)+(1.059)+(16.007), (I-052)+(1.059)+(16.008), (I-052)+(1.059)+(17.001), (I-052)+(1.059)+(17.002), (I-052)+(1.059)+(17.003), (I-052)+(1.059)+(17.004), (I-052)+(1.059)+(17.005), (I-052)+(1.059)+(17.006), (I-052)+(1.059)+(17.007), (I-052)+(1.059)+(17.008), (I-052)+(1.059)+(17.009), (I-052)+(1.059)+(17.010), (I-052)+(1.059)+(17.011), (I-052)+(1.059)+(17.012), (I-052)+(1.059)+(18.001), (I-052)+(1.060)+(1.061), (I-052)+(1.060)+(1.062), (I-052)+(1.060)+(1.063), (I-052)+(1.060)+(1.064), (I-052)+(1.060)+(1.065), (I-052)+(1.060)+(1.066), (I-052)+(1.060)+(1.067), (I-052)+(1.060)+(1.068), (I-052)+(1.060)+(1.069), (I-052)+(1.060)+(1.070), (I-052)+(1.060)+(1.071), (I-052)+(1.060)+(1.072), (I-052)+(1.060)+(1.073), (I-052)+(1.060)+(1.074), (I-052)+(1.060)+(1.075), (I-052)+(1.060)+(1.076), (I-052)+(1.060)+(1.077), (I-052)+(1.060)+(1.078), (I-052)+(1.060)+(1.079), (I-052)+(1.060)+(1.080), (I-052)+(1.060)+(1.081), (I-052)+(1.060)+(1.082), (I-052)+(1.060)+(1.083), (I-052)+(1.060)+(1.084), (I-052)+(1.060)+(1.085), (I-052)+(1.060)+(1.086), (I-052)+(1.060)+(1.087), (I-052)+(1.060)+(1.088), (I-052)+(1.060)+(1.089), (I-052)+(1.060)+(1.090), (I-052)+(1.060)+(1.091), (I-052)+(1.060)+(1.092), (I-052)+(1.060)+(2.001), (I-052)+(1.060)+(2.002), (I-052)+(1.060)+(2.003), (I-052)+(1.060)+(2.004), (I-052)+(1.060)+(2.005), (I-052)+(1.060)+(2.006), (I-052)+(1.060)+(2.007), (I-052)+(1.060)+(2.008), (I-052)+(1.060)+(2.009), (I-052)+(1.060)+(2.010), (I-052)+(1.060)+(2.011), (I-052)+(1.060)+(2.012), (I-052)+(1.060)+(2.013), (I-052)+(1.060)+(2.014), (I-052)+(1.060)+(2.015), (I-052)+(1.060)+(2.016), (I-052)+(1.060)+(2.017), (I-052)+(1.060)+(2.018), (I-052)+(1.060)+(2.019), (I-052)+(1.060)+(2.020), (I-052)+(1.060)+(2.021), (I-052)+(1.060)+(2.022), (I-052)+(1.060)+(2.023), (I-052)+(1.060)+(2.024), (I-052)+(1.060)+(2.025), (I-052)+(1.060)+(2.026), (I-052)+(1.060)+(2.027), (I-052)+(1.060)+(2.028), (I-052)+(1.060)+(2.029), (I-052)+(1.060)+(2.030), (I-052)+(1.060)+(2.031), (I-052)+(1.060)+(2.032), (I-052)+(1.060)+(2.033), (I-052)+(1.060)+(2.034), (I-052)+(1.060)+(2.035), (I-052)+(1.060)+(2.036), (I-052)+(1.060)+(2.037), (I-052)+(1.060)+(2.038), (I-052)+(1.060)+(2.039), (I-052)+(1.060)+(2.040), (I-052)+(1.060)+(2.041), (I-052)+(1.060)+(2.042), (I-052)+(1.060)+(2.043), (I-052)+(1.060)+(2.044), (I-052)+(1.060)+(2.045), (I-052)+(1.060)+(2.046), (I-052)+(1.060)+(2.047), (I-052)+(1.060)+(2.048), (I-052)+(1.060)+(2.049), (I-052)+(1.060)+(2.050), (I-052)+(1.060)+(2.051), (I-052)+(1.060)+(2.052), (I-052)+(1.060)+(2.053), (I-052)+(1.060)+(2.054), (I-052)+(1.060)+(2.055), (I-052)+(1.060)+(2.056), (I-052)+(1.060)+(2.057), (I-052)+(1.060)+(2.058), (I-052)+(1.060)+(2.059), (I-052)+(1.060)+(3.001), (I-052)+(1.060)+(3.002), (I-052)+(1.060)+(3.003), (I-052)+(1.060)+(3.004), (I-052)+(1.060)+(3.005), (I-052)+(1.060)+(3.006), (I-052)+(1.060)+(3.007), (I-052)+(1.060)+(3.008), (I-052)+(1.060)+(3.009), (I-052)+(1.060)+(3.010), (I-052)+(1.060)+(3.011), (I-052)+(1.060)+(3.012), (I-052)+(1.060)+(3.013), (I-052)+(1.060)+(3.014), (I-052)+(1.060)+(3.015), (I-052)+(1.060)+(3.016), (I-052)+(1.060)+(3.017), (I-052)+(1.060)+(3.018), (I-052)+(1.060)+(3.019), (I-052)+(1.060)+(3.020), (I-052)+(1.060)+(3.021), (I-052)+(1.060)+(3.022), (I-052)+(1.060)+(3.023), (I-052)+(1.060)+(3.024), (I-052)+(1.060)+(3.025), (I-052)+(1.060)+(3.026), (I-052)+(1.060)+(3.027), (I-052)+(1.060)+(3.028), (I-052)+(1.060)+(3.029), (I-052)+(1.060)+(3.030), (I-052)+(1.060)+(3.031), (I-052)+(1.060)+(5.001), (I-052)+(1.060)+(5.002), (I-052)+(1.060)+(5.003), (I-052)+(1.060)+(5.004), (I-052)+(1.060)+(5.005), (I-052)+(1.060)+(5.006), (I-052)+(1.060)+(5.007), (I-052)+(1.060)+(5.008), (I-052)+(1.060)+(5.009), (I-052)+(1.060)+(5.010), (I-052)+(1.060)+(5.011), (I-052)+(1.060)+(5.012), (I-052)+(1.060)+(5.013), (I-052)+(1.060)+(5.014), (I-052)+(1.060)+(5.015), (I-052)+(1.060)+(5.016), (I-052)+(1.060)+(5.017), (I-052)+(1.060)+(5.018), (I-052)+(1.060)+(5.019), (I-052)+(1.060)+(5.020), (I-052)+(1.060)+(5.021), (I-052)+(1.060)+(5.022), (I-052)+(1.060)+(5.023), (I-052)+(1.060)+(6.001), (I-052)+(1.060)+(6.002), (I-052)+(1.060)+(6.003), (I-052)+(1.060)+(6.004), (I-052)+(1.060)+(7.001), (I-052)+(1.060)+(7.002), (I-052)+(1.060)+(7.003), (I-052)+(1.060)+(7.004), (I-052)+(1.060)+(7.005), (I-052)+(1.060)+(7.006), (I-052)+(1.060)+(9.001), (I-052)+(1.060)+(9.002), (I-052)+(1.060)+(9.003), (I-052)+(1.060)+(9.004), (I-052)+(1.060)+(9.005), (I-052)+(1.060)+(9.006), (I-052)+(1.060)+(9.007), (I-052)+(1.060)+(9.008), (I-052)+(1.060)+(9.009), (I-052)+(1.060)+(14.001), (I-052)+(1.060)+(14.002), (I-052)+(1.060)+(15.008), (I-052)+(1.060)+(15.011), (I-052)+(1.060)+(15.012), (I-052)+(1.060)+(15.016), (I-052)+(1.060)+(15.025), (I-052)+(1.060)+(15.027), (I-052)+(1.060)+(15.047), (I-052)+(1.060)+(15.063), (I-052)+(1.060)+(15.064), (I-052)+(1.060)+(16.001), (I-052)+(1.060)+(16.002), (I-052)+(1.060)+(16.003), (I-052)+(1.060)+(16.004), (I-052)+(1.060)+(16.005), (I-052)+(1.060)+(16.006), (I-052)+(1.060)+(16.007), (I-052)+(1.060)+(16.008), (I-052)+(1.060)+(17.001), (I-052)+(1.060)+(17.002), (I-052)+(1.060)+(17.003), (I-052)+(1.060)+(17.004), (I-052)+(1.060)+(17.005), (I-052)+(1.060)+(17.006), (I-052)+(1.060)+(17.007), (I-052)+(1.060)+(17.008), (I-052)+(1.060)+(17.009), (I-052)+(1.060)+(17.010), (I-052)+(1.060)+(17.011), (I-052)+(1.060)+(17.012), (I-052)+(1.060)+(18.001), (I-052)+(1.061)+(1.062), (I-052)+(1.061)+(1.063), (I-052)+(1.061)+(1.064), (I-052)+(1.061)+(1.065), (I-052)+(1.061)+(1.066), (I-052)+(1.061)+(1.067), (I-052)+(1.061)+(1.068), (I-052)+(1.061)+(1.069), (I-052)+(1.061)+(1.070), (I-052)+(1.061)+(1.071), (I-052)+(1.061)+(1.072), (I-052)+(1.061)+(1.073), (I-052)+(1.061)+(1.074), (I-052)+(1.061)+(1.075), (I-052)+(1.061)+(1.076), (I-052)+(1.061)+(1.077), (I-052)+(1.061)+(1.078), (I-052)+(1.061)+(1.079), (I-052)+(1.061)+(1.080), (I-052)+(1.061)+(1.081), (I-052)+(1.061)+(1.082), (I-052)+(1.061)+(1.083), (I-052)+(1.061)+(1.084), (I-052)+(1.061)+(1.085), (I-052)+(1.061)+(1.086), (I-052)+(1.061)+(1.087), (I-052)+(1.061)+(1.088), (I-052)+(1.061)+(1.089), (I-052)+(1.061)+(1.090), (I-052)+(1.061)+(1.091), (I-052)+(1.061)+(1.092), (I-052)+(1.061)+(2.001), (I-052)+(1.061)+(2.002), (I-052)+(1.061)+(2.003), (I-052)+(1.061)+(2.004), (I-052)+(1.061)+(2.005), (I-052)+(1.061)+(2.006), (I-052)+(1.061)+(2.007), (I-052)+(1.061)+(2.008), (I-052)+(1.061)+(2.009), (I-052)+(1.061)+(2.010), (I-052)+(1.061)+(2.011), (I-052)+(1.061)+(2.012), (I-052)+(1.061)+(2.013), (I-052)+(1.061)+(2.014), (I-052)+(1.061)+(2.015), (I-052)+(1.061)+(2.016), (I-052)+(1.061)+(2.017), (I-052)+(1.061)+(2.018), (I-052)+(1.061)+(2.019), (I-052)+(1.061)+(2.020), (I-052)+(1.061)+(2.021), (I-052)+(1.061)+(2.022), (I-052)+(1.061)+(2.023), (I-052)+(1.061)+(2.024), (I-052)+(1.061)+(2.025), (I-052)+(1.061)+(2.026), (I-052)+(1.061)+(2.027), (I-052)+(1.061)+(2.028), (I-052)+(1.061)+(2.029), (I-052)+(1.061)+(2.030), (I-052)+(1.061)+(2.031), (I-052)+(1.061)+(2.032), (I-052)+(1.061)+(2.033), (I-052)+(1.061)+(2.034), (I-052)+(1.061)+(2.035), (I-052)+(1.061)+(2.036), (I-052)+(1.061)+(2.037), (I-052)+(1.061)+(2.038), (I-052)+(1.061)+(2.039), (I-052)+(1.061)+(2.040), (I-052)+(1.061)+(2.041), (I-052)+(1.061)+(2.042), (I-052)+(1.061)+(2.043), (I-052)+(1.061)+(2.044), (I-052)+(1.061)+(2.045), (I-052)+(1.061)+(2.046), (I-052)+(1.061)+(2.047), (I-052)+(1.061)+(2.048), (I-052)+(1.061)+(2.049), (I-052)+(1.061)+(2.050), (I-052)+(1.061)+(2.051), (I-052)+(1.061)+(2.052), (I-052)+(1.061)+(2.053), (I-052)+(1.061)+(2.054), (I-052)+(1.061)+(2.055), (I-052)+(1.061)+(2.056), (I-052)+(1.061)+(2.057), (I-052)+(1.061)+(2.058), (I-052)+(1.061)+(2.059), (I-052)+(1.061)+(3.001), (I-052)+(1.061)+(3.002), (I-052)+(1.061)+(3.003), (I-052)+(1.061)+(3.004), (I-052)+(1.061)+(3.005), (I-052)+(1.061)+(3.006), (I-052)+(1.061)+(3.007), (I-052)+(1.061)+(3.008), (I-052)+(1.061)+(3.009), (I-052)+(1.061)+(3.010), (I-052)+(1.061)+(3.011), (I-052)+(1.061)+(3.012), (I-052)+(1.061)+(3.013), (I-052)+(1.061)+(3.014), (I-052)+(1.061)+(3.015), (I-052)+(1.061)+(3.016), (I-052)+(1.061)+(3.017), (I-052)+(1.061)+(3.018), (I-052)+(1.061)+(3.019), (I-052)+(1.061)+(3.020), (I-052)+(1.061)+(3.021), (I-052)+(1.061)+(3.022), (I-052)+(1.061)+(3.023), (I-052)+(1.061)+(3.024), (I-052)+(1.061)+(3.025), (I-052)+(1.061)+(3.026), (I-052)+(1.061)+(3.027), (I-052)+(1.061)+(3.028), (I-052)+(1.061)+(3.029), (I-052)+(1.061)+(3.030), (I-052)+(1.061)+(3.031), (I-052)+(1.061)+(5.001), (I-052)+(1.061)+(5.002), (I-052)+(1.061)+(5.003), (I-052)+(1.061)+(5.004), (I-052)+(1.061)+(5.005), (I-052)+(1.061)+(5.006), (I-052)+(1.061)+(5.007), (I-052)+(1.061)+(5.008), (I-052)+(1.061)+(5.009), (I-052)+(1.061)+(5.010), (I-052)+(1.061)+(5.011), (I-052)+(1.061)+(5.012), (I-052)+(1.061)+(5.013), (I-052)+(1.061)+(5.014), (I-052)+(1.061)+(5.015), (I-052)+(1.061)+(5.016), (I-052)+(1.061)+(5.017), (I-052)+(1.061)+(5.018), (I-052)+(1.061)+(5.019), (I-052)+(1.061)+(5.020), (I-052)+(1.061)+(5.021), (I-052)+(1.061)+(5.022), (I-052)+(1.061)+(5.023), (I-052)+(1.061)+(6.001), (I-052)+(1.061)+(6.002), (I-052)+(1.061)+(6.003), (I-052)+(1.061)+(6.004), (I-052)+(1.061)+(7.001), (I-052)+(1.061)+(7.002), (I-052)+(1.061)+(7.003), (I-052)+(1.061)+(7.004), (I-052)+(1.061)+(7.005), (I-052)+(1.061)+(7.006), (I-052)+(1.061)+(9.001), (I-052)+(1.061)+(9.002), (I-052)+(1.061)+(9.003), (I-052)+(1.061)+(9.004), (I-052)+(1.061)+(9.005), (I-052)+(1.061)+(9.006), (I-052)+(1.061)+(9.007), (I-052)+(1.061)+(9.008), (I-052)+(1.061)+(9.009), (I-052)+(1.061)+(14.001), (I-052)+(1.061)+(14.002), (I-052)+(1.061)+(15.008), (I-052)+(1.061)+(15.011), (I-052)+(1.061)+(15.012), (I-052)+(1.061)+(15.016), (I-052)+(1.061)+(15.025), (I-052)+(1.061)+(15.027), (I-052)+(1.061)+(15.047), (I-052)+(1.061)+(15.063), (I-052)+(1.061)+(15.064), (I-052)+(1.061)+(16.001), (I-052)+(1.061)+(16.002), (I-052)+(1.061)+(16.003), (I-052)+(1.061)+(16.004), (I-052)+(1.061)+(16.005), (I-052)+(1.061)+(16.006), (I-052)+(1.061)+(16.007), (I-052)+(1.061)+(16.008), (I-052)+(1.061)+(17.001), (I-052)+(1.061)+(17.002), (I-052)+(1.061)+(17.003), (I-052)+(1.061)+(17.004), (I-052)+(1.061)+(17.005), (I-052)+(1.061)+(17.006), (I-052)+(1.061)+(17.007), (I-052)+(1.061)+(17.008), (I-052)+(1.061)+(17.009), (I-052)+(1.061)+(17.010), (I-052)+(1.061)+(17.011), (I-052)+(1.061)+(17.012), (I-052)+(1.061)+(18.001), (I-052)+(1.062)+(1.063), (I-052)+(1.062)+(1.064), (I-052)+(1.062)+(1.065), (I-052)+(1.062)+(1.066), (I-052)+(1.062)+(1.067), (I-052)+(1.062)+(1.068), (I-052)+(1.062)+(1.069), (I-052)+(1.062)+(1.070), (I-052)+(1.062)+(1.071), (I-052)+(1.062)+(1.072), (I-052)+(1.062)+(1.073), (I-052)+(1.062)+(1.074), (I-052)+(1.062)+(1.075), (I-052)+(1.062)+(1.076), (I-052)+(1.062)+(1.077), (I-052)+(1.062)+(1.078), (I-052)+(1.062)+(1.079), (I-052)+(1.062)+(1.080), (I-052)+(1.062)+(1.081), (I-052)+(1.062)+(1.082), (I-052)+(1.062)+(1.083), (I-052)+(1.062)+(1.084), (I-052)+(1.062)+(1.085), (I-052)+(1.062)+(1.086), (I-052)+(1.062)+(1.087), (I-052)+(1.062)+(1.088), (I-052)+(1.062)+(1.089), (I-052)+(1.062)+(1.090), (I-052)+(1.062)+(1.091), (I-052)+(1.062)+(1.092), (I-052)+(1.062)+(2.001), (I-052)+(1.062)+(2.002), (I-052)+(1.062)+(2.003), (I-052)+(1.062)+(2.004), (I-052)+(1.062)+(2.005), (I-052)+(1.062)+(2.006), (I-052)+(1.062)+(2.007), (I-052)+(1.062)+(2.008), (I-052)+(1.062)+(2.009), (I-052)+(1.062)+(2.010), (I-052)+(1.062)+(2.011), (I-052)+(1.062)+(2.012), (I-052)+(1.062)+(2.013), (I-052)+(1.062)+(2.014), (I-052)+(1.062)+(2.015), (I-052)+(1.062)+(2.016), (I-052)+(1.062)+(2.017), (I-052)+(1.062)+(2.018), (I-052)+(1.062)+(2.019), (I-052)+(1.062)+(2.020), (I-052)+(1.062)+(2.021), (I-052)+(1.062)+(2.022), (I-052)+(1.062)+(2.023), (I-052)+(1.062)+(2.024), (I-052)+(1.062)+(2.025), (I-052)+(1.062)+(2.026), (I-052)+(1.062)+(2.027), (I-052)+(1.062)+(2.028), (I-052)+(1.062)+(2.029), (I-052)+(1.062)+(2.030), (I-052)+(1.062)+(2.031), (I-052)+(1.062)+(2.032), (I-052)+(1.062)+(2.033), (I-052)+(1.062)+(2.034), (I-052)+(1.062)+(2.035), (I-052)+(1.062)+(2.036), (I-052)+(1.062)+(2.037), (I-052)+(1.062)+(2.038), (I-052)+(1.062)+(2.039), (I-052)+(1.062)+(2.040), (I-052)+(1.062)+(2.041), (I-052)+(1.062)+(2.042), (I-052)+(1.062)+(2.043), (I-052)+(1.062)+(2.044), (I-052)+(1.062)+(2.045), (I-052)+(1.062)+(2.046), (I-052)+(1.062)+(2.047), (I-052)+(1.062)+(2.048), (I-052)+(1.062)+(2.049), (I-052)+(1.062)+(2.050), (I-052)+(1.062)+(2.051), (I-052)+(1.062)+(2.052), (I-052)+(1.062)+(2.053), (I-052)+(1.062)+(2.054), (I-052)+(1.062)+(2.055), (I-052)+(1.062)+(2.056), (I-052)+(1.062)+(2.057), (I-052)+(1.062)+(2.058), (I-052)+(1.062)+(2.059), (I-052)+(1.062)+(3.001), (I-052)+(1.062)+(3.002), (I-052)+(1.062)+(3.003), (I-052)+(1.062)+(3.004), (I-052)+(1.062)+(3.005), (I-052)+(1.062)+(3.006), (I-052)+(1.062)+(3.007), (I-052)+(1.062)+(3.008), (I-052)+(1.062)+(3.009), (I-052)+(1.062)+(3.010), (I-052)+(1.062)+(3.011), (I-052)+(1.062)+(3.012), (I-052)+(1.062)+(3.013), (I-052)+(1.062)+(3.014), (I-052)+(1.062)+(3.015), (I-052)+(1.062)+(3.016), (I-052)+(1.062)+(3.017), (I-052)+(1.062)+(3.018), (I-052)+(1.062)+(3.019), (I-052)+(1.062)+(3.020), (I-052)+(1.062)+(3.021), (I-052)+(1.062)+(3.022), (I-052)+(1.062)+(3.023), (I-052)+(1.062)+(3.024), (I-052)+(1.062)+(3.025), (I-052)+(1.062)+(3.026), (I-052)+(1.062)+(3.027), (I-052)+(1.062)+(3.028), (I-052)+(1.062)+(3.029), (I-052)+(1.062)+(3.030), (I-052)+(1.062)+(3.031), (I-052)+(1.062)+(5.001), (I-052)+(1.062)+(5.002), (I-052)+(1.062)+(5.003), (I-052)+(1.062)+(5.004), (I-052)+(1.062)+(5.005), (I-052)+(1.062)+(5.006), (I-052)+(1.062)+(5.007), (I-052)+(1.062)+(5.008), (I-052)+(1.062)+(5.009), (I-052)+(1.062)+(5.010), (I-052)+(1.062)+(5.011), (I-052)+(1.062)+(5.012), (I-052)+(1.062)+(5.013), (I-052)+(1.062)+(5.014), (I-052)+(1.062)+(5.015), (I-052)+(1.062)+(5.016), (I-052)+(1.062)+(5.017), (I-052)+(1.062)+(5.018), (I-052)+(1.062)+(5.019), (I-052)+(1.062)+(5.020), (I-052)+(1.062)+(5.021), (I-052)+(1.062)+(5.022), (I-052)+(1.062)+(5.023), (I-052)+(1.062)+(6.001), (I-052)+(1.062)+(6.002), (I-052)+(1.062)+(6.003), (I-052)+(1.062)+(6.004), (I-052)+(1.062)+(7.001), (I-052)+(1.062)+(7.002), (I-052)+(1.062)+(7.003), (I-052)+(1.062)+(7.004), (I-052)+(1.062)+(7.005), (I-052)+(1.062)+(7.006), (I-052)+(1.062)+(9.001), (I-052)+(1.062)+(9.002), (I-052)+(1.062)+(9.003), (I-052)+(1.062)+(9.004), (I-052)+(1.062)+(9.005), (I-052)+(1.062)+(9.006), (I-052)+(1.062)+(9.007), (I-052)+(1.062)+(9.008), (I-052)+(1.062)+(9.009), (I-052)+(1.062)+(14.001), (I-052)+(1.062)+(14.002), (I-052)+(1.062)+(15.008), (I-052)+(1.062)+(15.011), (I-052)+(1.062)+(15.012), (I-052)+(1.062)+(15.016), (I-052)+(1.062)+(15.025), (I-052)+(1.062)+(15.027), (I-052)+(1.062)+(15.047), (I-052)+(1.062)+(15.063), (I-052)+(1.062)+(15.064), (I-052)+(1.062)+(16.001), (I-052)+(1.062)+(16.002), (I-052)+(1.062)+(16.003), (I-052)+(1.062)+(16.004), (I-052)+(1.062)+(16.005), (I-052)+(1.062)+(16.006), (I-052)+(1.062)+(16.007), (I-052)+(1.062)+(16.008), (I-052)+(1.062)+(17.001), (I-052)+(1.062)+(17.002), (I-052)+(1.062)+(17.003), (I-052)+(1.062)+(17.004), (I-052)+(1.062)+(17.005), (I-052)+(1.062)+(17.006), (I-052)+(1.062)+(17.007), (I-052)+(1.062)+(17.008), (I-052)+(1.062)+(17.009), (I-052)+(1.062)+(17.010), (I-052)+(1.062)+(17.011), (I-052)+(1.062)+(17.012), (I-052)+(1.062)+(18.001), (I-052)+(1.063)+(1.064), (I-052)+(1.063)+(1.065), (I-052)+(1.063)+(1.066), (I-052)+(1.063)+(1.067), (I-052)+(1.063)+(1.068), (I-052)+(1.063)+(1.069), (I-052)+(1.063)+(1.070), (I-052)+(1.063)+(1.071), (I-052)+(1.063)+(1.072), (I-052)+(1.063)+(1.073), (I-052)+(1.063)+(1.074), (I-052)+(1.063)+(1.075), (I-052)+(1.063)+(1.076), (I-052)+(1.063)+(1.077), (I-052)+(1.063)+(1.078), (I-052)+(1.063)+(1.079), (I-052)+(1.063)+(1.080), (I-052)+(1.063)+(1.081), (I-052)+(1.063)+(1.082), (I-052)+(1.063)+(1.083), (I-052)+(1.063)+(1.084), (I-052)+(1.063)+(1.085), (I-052)+(1.063)+(1.086), (I-052)+(1.063)+(1.087), (I-052)+(1.063)+(1.088), (I-052)+(1.063)+(1.089), (I-052)+(1.063)+(1.090), (I-052)+(1.063)+(1.091), (I-052)+(1.063)+(1.092), (I-052)+(1.063)+(2.001), (I-052)+(1.063)+(2.002), (I-052)+(1.063)+(2.003), (I-052)+(1.063)+(2.004), (I-052)+(1.063)+(2.005), (I-052)+(1.063)+(2.006), (I-052)+(1.063)+(2.007), (I-052)+(1.063)+(2.008), (I-052)+(1.063)+(2.009), (I-052)+(1.063)+(2.010), (I-052)+(1.063)+(2.011), (I-052)+(1.063)+(2.012), (I-052)+(1.063)+(2.013), (I-052)+(1.063)+(2.014), (I-052)+(1.063)+(2.015), (I-052)+(1.063)+(2.016), (I-052)+(1.063)+(2.017), (I-052)+(1.063)+(2.018), (I-052)+(1.063)+(2.019), (I-052)+(1.063)+(2.020), (I-052)+(1.063)+(2.021), (I-052)+(1.063)+(2.022), (I-052)+(1.063)+(2.023), (I-052)+(1.063)+(2.024), (I-052)+(1.063)+(2.025), (I-052)+(1.063)+(2.026), (I-052)+(1.063)+(2.027), (I-052)+(1.063)+(2.028), (I-052)+(1.063)+(2.029), (I-052)+(1.063)+(2.030), (I-052)+(1.063)+(2.031), (I-052)+(1.063)+(2.032), (I-052)+(1.063)+(2.033), (I-052)+(1.063)+(2.034), (I-052)+(1.063)+(2.035), (I-052)+(1.063)+(2.036), (I-052)+(1.063)+(2.037), (I-052)+(1.063)+(2.038), (I-052)+(1.063)+(2.039), (I-052)+(1.063)+(2.040), (I-052)+(1.063)+(2.041), (I-052)+(1.063)+(2.042), (I-052)+(1.063)+(2.043), (I-052)+(1.063)+(2.044), (I-052)+(1.063)+(2.045), (I-052)+(1.063)+(2.046), (I-052)+(1.063)+(2.047), (I-052)+(1.063)+(2.048), (I-052)+(1.063)+(2.049), (I-052)+(1.063)+(2.050), (I-052)+(1.063)+(2.051), (I-052)+(1.063)+(2.052), (I-052)+(1.063)+(2.053), (I-052)+(1.063)+(2.054), (I-052)+(1.063)+(2.055), (I-052)+(1.063)+(2.056), (I-052)+(1.063)+(2.057), (I-052)+(1.063)+(2.058), (I-052)+(1.063)+(2.059), (I-052)+(1.063)+(3.001), (I-052)+(1.063)+(3.002), (I-052)+(1.063)+(3.003), (I-052)+(1.063)+(3.004), (I-052)+(1.063)+(3.005), (I-052)+(1.063)+(3.006), (I-052)+(1.063)+(3.007), (I-052)+(1.063)+(3.008), (I-052)+(1.063)+(3.009), (I-052)+(1.063)+(3.010), (I-052)+(1.063)+(3.011), (I-052)+(1.063)+(3.012), (I-052)+(1.063)+(3.013), (I-052)+(1.063)+(3.014), (I-052)+(1.063)+(3.015), (I-052)+(1.063)+(3.016), (I-052)+(1.063)+(3.017), (I-052)+(1.063)+(3.018), (I-052)+(1.063)+(3.019), (I-052)+(1.063)+(3.020), (I-052)+(1.063)+(3.021), (I-052)+(1.063)+(3.022), (I-052)+(1.063)+(3.023), (I-052)+(1.063)+(3.024), (I-052)+(1.063)+(3.025), (I-052)+(1.063)+(3.026), (I-052)+(1.063)+(3.027), (I-052)+(1.063)+(3.028), (I-052)+(1.063)+(3.029), (I-052)+(1.063)+(3.030), (I-052)+(1.063)+(3.031), (I-052)+(1.063)+(5.001), (I-052)+(1.063)+(5.002), (I-052)+(1.063)+(5.003), (I-052)+(1.063)+(5.004), (I-052)+(1.063)+(5.005), (I-052)+(1.063)+(5.006), (I-052)+(1.063)+(5.007), (I-052)+(1.063)+(5.008), (I-052)+(1.063)+(5.009), (I-052)+(1.063)+(5.010), (I-052)+(1.063)+(5.011), (I-052)+(1.063)+(5.012), (I-052)+(1.063)+(5.013), (I-052)+(1.063)+(5.014), (I-052)+(1.063)+(5.015), (I-052)+(1.063)+(5.016), (I-052)+(1.063)+(5.017), (I-052)+(1.063)+(5.018), (I-052)+(1.063)+(5.019), (I-052)+(1.063)+(5.020), (I-052)+(1.063)+(5.021), (I-052)+(1.063)+(5.022), (I-052)+(1.063)+(5.023), (I-052)+(1.063)+(6.001), (I-052)+(1.063)+(6.002), (I-052)+(1.063)+(6.003), (I-052)+(1.063)+(6.004), (I-052)+(1.063)+(7.001), (I-052)+(1.063)+(7.002), (I-052)+(1.063)+(7.003), (I-052)+(1.063)+(7.004), (I-052)+(1.063)+(7.005), (I-052)+(1.063)+(7.006), (I-052)+(1.063)+(9.001), (I-052)+(1.063)+(9.002), (I-052)+(1.063)+(9.003), (I-052)+(1.063)+(9.004), (I-052)+(1.063)+(9.005), (I-052)+(1.063)+(9.006), (I-052)+(1.063)+(9.007), (I-052)+(1.063)+(9.008), (I-052)+(1.063)+(9.009), (I-052)+(1.063)+(14.001), (I-052)+(1.063)+(14.002), (I-052)+(1.063)+(15.008), (I-052)+(1.063)+(15.011), (I-052)+(1.063)+(15.012), (I-052)+(1.063)+(15.016), (I-052)+(1.063)+(15.025), (I-052)+(1.063)+(15.027), (I-052)+(1.063)+(15.047), (I-052)+(1.063)+(15.063), (I-052)+(1.063)+(15.064), (I-052)+(1.063)+(16.001), (I-052)+(1.063)+(16.002), (I-052)+(1.063)+(16.003), (I-052)+(1.063)+(16.004), (I-052)+(1.063)+(16.005), (I-052)+(1.063)+(16.006), (I-052)+(1.063)+(16.007), (I-052)+(1.063)+(16.008), (I-052)+(1.063)+(17.001), (I-052)+(1.063)+(17.002), (I-052)+(1.063)+(17.003), (I-052)+(1.063)+(17.004), (I-052)+(1.063)+(17.005), (I-052)+(1.063)+(17.006), (I-052)+(1.063)+(17.007), (I-052)+(1.063)+(17.008), (I-052)+(1.063)+(17.009), (I-052)+(1.063)+(17.010), (I-052)+(1.063)+(17.011), (I-052)+(1.063)+(17.012), (I-052)+(1.063)+(18.001), (I-052)+(1.064)+(1.065), (I-052)+(1.064)+(1.066), (I-052)+(1.064)+(1.067), (I-052)+(1.064)+(1.068), (I-052)+(1.064)+(1.069), (I-052)+(1.064)+(1.070), (I-052)+(1.064)+(1.071), (I-052)+(1.064)+(1.072), (I-052)+(1.064)+(1.073), (I-052)+(1.064)+(1.074), (I-052)+(1.064)+(1.075), (I-052)+(1.064)+(1.076), (I-052)+(1.064)+(1.077), (I-052)+(1.064)+(1.078), (I-052)+(1.064)+(1.079), (I-052)+(1.064)+(1.080), (I-052)+(1.064)+(1.081), (I-052)+(1.064)+(1.082), (I-052)+(1.064)+(1.083), (I-052)+(1.064)+(1.084), (I-052)+(1.064)+(1.085), (I-052)+(1.064)+(1.086), (I-052)+(1.064)+(1.087), (I-052)+(1.064)+(1.088), (I-052)+(1.064)+(1.089), (I-052)+(1.064)+(1.090), (I-052)+(1.064)+(1.091), (I-052)+(1.064)+(1.092), (I-052)+(1.064)+(2.001), (I-052)+(1.064)+(2.002), (I-052)+(1.064)+(2.003), (I-052)+(1.064)+(2.004), (I-052)+(1.064)+(2.005), (I-052)+(1.064)+(2.006), (I-052)+(1.064)+(2.007), (I-052)+(1.064)+(2.008), (I-052)+(1.064)+(2.009), (I-052)+(1.064)+(2.010), (I-052)+(1.064)+(2.011), (I-052)+(1.064)+(2.012), (I-052)+(1.064)+(2.013), (I-052)+(1.064)+(2.014), (I-052)+(1.064)+(2.015), (I-052)+(1.064)+(2.016), (I-052)+(1.064)+(2.017), (I-052)+(1.064)+(2.018), (I-052)+(1.064)+(2.019), (I-052)+(1.064)+(2.020), (I-052)+(1.064)+(2.021), (I-052)+(1.064)+(2.022), (I-052)+(1.064)+(2.023), (I-052)+(1.064)+(2.024), (I-052)+(1.064)+(2.025), (I-052)+(1.064)+(2.026), (I-052)+(1.064)+(2.027), (I-052)+(1.064)+(2.028), (I-052)+(1.064)+(2.029), (I-052)+(1.064)+(2.030), (I-052)+(1.064)+(2.031), (I-052)+(1.064)+(2.032), (I-052)+(1.064)+(2.033), (I-052)+(1.064)+(2.034), (I-052)+(1.064)+(2.035), (I-052)+(1.064)+(2.036), (I-052)+(1.064)+(2.037), (I-052)+(1.064)+(2.038), (I-052)+(1.064)+(2.039), (I-052)+(1.064)+(2.040), (I-052)+(1.064)+(2.041), (I-052)+(1.064)+(2.042), (I-052)+(1.064)+(2.043), (I-052)+(1.064)+(2.044), (I-052)+(1.064)+(2.045), (I-052)+(1.064)+(2.046), (I-052)+(1.064)+(2.047), (I-052)+(1.064)+(2.048), (I-052)+(1.064)+(2.049), (I-052)+(1.064)+(2.050), (I-052)+(1.064)+(2.051), (I-052)+(1.064)+(2.052), (I-052)+(1.064)+(2.053), (I-052)+(1.064)+(2.054), (I-052)+(1.064)+(2.055), (I-052)+(1.064)+(2.056), (I-052)+(1.064)+(2.057), (I-052)+(1.064)+(2.058), (I-052)+(1.064)+(2.059), (I-052)+(1.064)+(3.001), (I-052)+(1.064)+(3.002), (I-052)+(1.064)+(3.003), (I-052)+(1.064)+(3.004), (I-052)+(1.064)+(3.005), (I-052)+(1.064)+(3.006), (I-052)+(1.064)+(3.007), (I-052)+(1.064)+(3.008), (I-052)+(1.064)+(3.009), (I-052)+(1.064)+(3.010), (I-052)+(1.064)+(3.011), (I-052)+(1.064)+(3.012), (I-052)+(1.064)+(3.013), (I-052)+(1.064)+(3.014), (I-052)+(1.064)+(3.015), (I-052)+(1.064)+(3.016), (I-052)+(1.064)+(3.017), (I-052)+(1.064)+(3.018), (I-052)+(1.064)+(3.019), (I-052)+(1.064)+(3.020), (I-052)+(1.064)+(3.021), (I-052)+(1.064)+(3.022), (I-052)+(1.064)+(3.023), (I-052)+(1.064)+(3.024), (I-052)+(1.064)+(3.025), (I-052)+(1.064)+(3.026), (I-052)+(1.064)+(3.027), (I-052)+(1.064)+(3.028), (I-052)+(1.064)+(3.029), (I-052)+(1.064)+(3.030), (I-052)+(1.064)+(3.031), (I-052)+(1.064)+(5.001), (I-052)+(1.064)+(5.002), (I-052)+(1.064)+(5.003), (I-052)+(1.064)+(5.004), (I-052)+(1.064)+(5.005), (I-052)+(1.064)+(5.006), (I-052)+(1.064)+(5.007), (I-052)+(1.064)+(5.008), (I-052)+(1.064)+(5.009), (I-052)+(1.064)+(5.010), (I-052)+(1.064)+(5.011), (I-052)+(1.064)+(5.012), (I-052)+(1.064)+(5.013), (I-052)+(1.064)+(5.014), (I-052)+(1.064)+(5.015), (I-052)+(1.064)+(5.016), (I-052)+(1.064)+(5.017), (I-052)+(1.064)+(5.018), (I-052)+(1.064)+(5.019), (I-052)+(1.064)+(5.020), (I-052)+(1.064)+(5.021), (I-052)+(1.064)+(5.022), (I-052)+(1.064)+(5.023), (I-052)+(1.064)+(6.001), (I-052)+(1.064)+(6.002), (I-052)+(1.064)+(6.003), (I-052)+(1.064)+(6.004), (I-052)+(1.064)+(7.001), (I-052)+(1.064)+(7.002), (I-052)+(1.064)+(7.003), (I-052)+(1.064)+(7.004), (I-052)+(1.064)+(7.005), (I-052)+(1.064)+(7.006), (I-052)+(1.064)+(9.001), (I-052)+(1.064)+(9.002), (I-052)+(1.064)+(9.003), (I-052)+(1.064)+(9.004), (I-052)+(1.064)+(9.005), (I-052)+(1.064)+(9.006), (I-052)+(1.064)+(9.007), (I-052)+(1.064)+(9.008), (I-052)+(1.064)+(9.009), (I-052)+(1.064)+(14.001), (I-052)+(1.064)+(14.002), (I-052)+(1.064)+(15.008), (I-052)+(1.064)+(15.011), (I-052)+(1.064)+(15.012), (I-052)+(1.064)+(15.016), (I-052)+(1.064)+(15.025), (I-052)+(1.064)+(15.027), (I-052)+(1.064)+(15.047), (I-052)+(1.064)+(15.063), (I-052)+(1.064)+(15.064), (I-052)+(1.064)+(16.001), (I-052)+(1.064)+(16.002), (I-052)+(1.064)+(16.003), (I-052)+(1.064)+(16.004), (I-052)+(1.064)+(16.005), (I-052)+(1.064)+(16.006), (I-052)+(1.064)+(16.007), (I-052)+(1.064)+(16.008), (I-052)+(1.064)+(17.001), (I-052)+(1.064)+(17.002), (I-052)+(1.064)+(17.003), (I-052)+(1.064)+(17.004), (I-052)+(1.064)+(17.005), (I-052)+(1.064)+(17.006), (I-052)+(1.064)+(17.007), (I-052)+(1.064)+(17.008), (I-052)+(1.064)+(17.009), (I-052)+(1.064)+(17.010), (I-052)+(1.064)+(17.011), (I-052)+(1.064)+(17.012), (I-052)+(1.064)+(18.001), (I-052)+(1.065)+(1.066), (I-052)+(1.065)+(1.067), (I-052)+(1.065)+(1.068), (I-052)+(1.065)+(1.069), (I-052)+(1.065)+(1.070), (I-052)+(1.065)+(1.071), (I-052)+(1.065)+(1.072), (I-052)+(1.065)+(1.073), (I-052)+(1.065)+(1.074), (I-052)+(1.065)+(1.075), (I-052)+(1.065)+(1.076), (I-052)+(1.065)+(1.077), (I-052)+(1.065)+(1.078), (I-052)+(1.065)+(1.079), (I-052)+(1.065)+(1.080), (I-052)+(1.065)+(1.081), (I-052)+(1.065)+(1.082), (I-052)+(1.065)+(1.083), (I-052)+(1.065)+(1.084), (I-052)+(1.065)+(1.085), (I-052)+(1.065)+(1.086), (I-052)+(1.065)+(1.087), (I-052)+(1.065)+(1.088), (I-052)+(1.065)+(1.089), (I-052)+(1.065)+(1.090), (I-052)+(1.065)+(1.091), (I-052)+(1.065)+(1.092), (I-052)+(1.065)+(2.001), (I-052)+(1.065)+(2.002), (I-052)+(1.065)+(2.003), (I-052)+(1.065)+(2.004), (I-052)+(1.065)+(2.005), (I-052)+(1.065)+(2.006), (I-052)+(1.065)+(2.007), (I-052)+(1.065)+(2.008), (I-052)+(1.065)+(2.009), (I-052)+(1.065)+(2.010), (I-052)+(1.065)+(2.011), (I-052)+(1.065)+(2.012), (I-052)+(1.065)+(2.013), (I-052)+(1.065)+(2.014), (I-052)+(1.065)+(2.015), (I-052)+(1.065)+(2.016), (I-052)+(1.065)+(2.017), (I-052)+(1.065)+(2.018), (I-052)+(1.065)+(2.019), (I-052)+(1.065)+(2.020), (I-052)+(1.065)+(2.021), (I-052)+(1.065)+(2.022), (I-052)+(1.065)+(2.023), (I-052)+(1.065)+(2.024), (I-052)+(1.065)+(2.025), (I-052)+(1.065)+(2.026), (I-052)+(1.065)+(2.027), (I-052)+(1.065)+(2.028), (I-052)+(1.065)+(2.029), (I-052)+(1.065)+(2.030), (I-052)+(1.065)+(2.031), (I-052)+(1.065)+(2.032), (I-052)+(1.065)+(2.033), (I-052)+(1.065)+(2.034), (I-052)+(1.065)+(2.035), (I-052)+(1.065)+(2.036), (I-052)+(1.065)+(2.037), (I-052)+(1.065)+(2.038), (I-052)+(1.065)+(2.039), (I-052)+(1.065)+(2.040), (I-052)+(1.065)+(2.041), (I-052)+(1.065)+(2.042), (I-052)+(1.065)+(2.043), (I-052)+(1.065)+(2.044), (I-052)+(1.065)+(2.045), (I-052)+(1.065)+(2.046), (I-052)+(1.065)+(2.047), (I-052)+(1.065)+(2.048), (I-052)+(1.065)+(2.049), (I-052)+(1.065)+(2.050), (I-052)+(1.065)+(2.051), (I-052)+(1.065)+(2.052), (I-052)+(1.065)+(2.053), (I-052)+(1.065)+(2.054), (I-052)+(1.065)+(2.055), (I-052)+(1.065)+(2.056), (I-052)+(1.065)+(2.057), (I-052)+(1.065)+(2.058), (I-052)+(1.065)+(2.059), (I-052)+(1.065)+(3.001), (I-052)+(1.065)+(3.002), (I-052)+(1.065)+(3.003), (I-052)+(1.065)+(3.004), (I-052)+(1.065)+(3.005), (I-052)+(1.065)+(3.006), (I-052)+(1.065)+(3.007), (I-052)+(1.065)+(3.008), (I-052)+(1.065)+(3.009), (I-052)+(1.065)+(3.010), (I-052)+(1.065)+(3.011), (I-052)+(1.065)+(3.012), (I-052)+(1.065)+(3.013), (I-052)+(1.065)+(3.014), (I-052)+(1.065)+(3.015), (I-052)+(1.065)+(3.016), (I-052)+(1.065)+(3.017), (I-052)+(1.065)+(3.018), (I-052)+(1.065)+(3.019), (I-052)+(1.065)+(3.020), (I-052)+(1.065)+(3.021), (I-052)+(1.065)+(3.022), (I-052)+(1.065)+(3.023), (I-052)+(1.065)+(3.024), (I-052)+(1.065)+(3.025), (I-052)+(1.065)+(3.026), (I-052)+(1.065)+(3.027), (I-052)+(1.065)+(3.028), (I-052)+(1.065)+(3.029), (I-052)+(1.065)+(3.030), (I-052)+(1.065)+(3.031), (I-052)+(1.065)+(5.001), (I-052)+(1.065)+(5.002), (I-052)+(1.065)+(5.003), (I-052)+(1.065)+(5.004), (I-052)+(1.065)+(5.005), (I-052)+(1.065)+(5.006), (I-052)+(1.065)+(5.007), (I-052)+(1.065)+(5.008), (I-052)+(1.065)+(5.009), (I-052)+(1.065)+(5.010), (I-052)+(1.065)+(5.011), (I-052)+(1.065)+(5.012), (I-052)+(1.065)+(5.013), (I-052)+(1.065)+(5.014), (I-052)+(1.065)+(5.015), (I-052)+(1.065)+(5.016), (I-052)+(1.065)+(5.017), (I-052)+(1.065)+(5.018), (I-052)+(1.065)+(5.019), (I-052)+(1.065)+(5.020), (I-052)+(1.065)+(5.021), (I-052)+(1.065)+(5.022), (I-052)+(1.065)+(5.023), (I-052)+(1.065)+(6.001), (I-052)+(1.065)+(6.002), (I-052)+(1.065)+(6.003), (I-052)+(1.065)+(6.004), (I-052)+(1.065)+(7.001), (I-052)+(1.065)+(7.002), (I-052)+(1.065)+(7.003), (I-052)+(1.065)+(7.004), (I-052)+(1.065)+(7.005), (I-052)+(1.065)+(7.006), (I-052)+(1.065)+(9.001), (I-052)+(1.065)+(9.002), (I-052)+(1.065)+(9.003), (I-052)+(1.065)+(9.004), (I-052)+(1.065)+(9.005), (I-052)+(1.065)+(9.006), (I-052)+(1.065)+(9.007), (I-052)+(1.065)+(9.008), (I-052)+(1.065)+(9.009), (I-052)+(1.065)+(14.001), (I-052)+(1.065)+(14.002), (I-052)+(1.065)+(15.008), (I-052)+(1.065)+(15.011), (I-052)+(1.065)+(15.012), (I-052)+(1.065)+(15.016), (I-052)+(1.065)+(15.025), (I-052)+(1.065)+(15.027), (I-052)+(1.065)+(15.047), (I-052)+(1.065)+(15.063), (I-052)+(1.065)+(15.064), (I-052)+(1.065)+(16.001), (I-052)+(1.065)+(16.002), (I-052)+(1.065)+(16.003), (I-052)+(1.065)+(16.004), (I-052)+(1.065)+(16.005), (I-052)+(1.065)+(16.006), (I-052)+(1.065)+(16.007), (I-052)+(1.065)+(16.008), (I-052)+(1.065)+(17.001), (I-052)+(1.065)+(17.002), (I-052)+(1.065)+(17.003), (I-052)+(1.065)+(17.004), (I-052)+(1.065)+(17.005), (I-052)+(1.065)+(17.006), (I-052)+(1.065)+(17.007), (I-052)+(1.065)+(17.008), (I-052)+(1.065)+(17.009), (I-052)+(1.065)+(17.010), (I-052)+(1.065)+(17.011), (I-052)+(1.065)+(17.012), (I-052)+(1.065)+(18.001), (I-052)+(1.066)+(1.067), (I-052)+(1.066)+(1.068), (I-052)+(1.066)+(1.069), (I-052)+(1.066)+(1.070), (I-052)+(1.066)+(1.071), (I-052)+(1.066)+(1.072), (I-052)+(1.066)+(1.073), (I-052)+(1.066)+(1.074), (I-052)+(1.066)+(1.075), (I-052)+(1.066)+(1.076), (I-052)+(1.066)+(1.077), (I-052)+(1.066)+(1.078), (I-052)+(1.066)+(1.079), (I-052)+(1.066)+(1.080), (I-052)+(1.066)+(1.081), (I-052)+(1.066)+(1.082), (I-052)+(1.066)+(1.083), (I-052)+(1.066)+(1.084), (I-052)+(1.066)+(1.085), (I-052)+(1.066)+(1.086), (I-052)+(1.066)+(1.087), (I-052)+(1.066)+(1.088), (I-052)+(1.066)+(1.089), (I-052)+(1.066)+(1.090), (I-052)+(1.066)+(1.091), (I-052)+(1.066)+(1.092), (I-052)+(1.066)+(2.001), (I-052)+(1.066)+(2.002), (I-052)+(1.066)+(2.003), (I-052)+(1.066)+(2.004), (I-052)+(1.066)+(2.005), (I-052)+(1.066)+(2.006), (I-052)+(1.066)+(2.007), (I-052)+(1.066)+(2.008), (I-052)+(1.066)+(2.009), (I-052)+(1.066)+(2.010), (I-052)+(1.066)+(2.011), (I-052)+(1.066)+(2.012), (I-052)+(1.066)+(2.013), (I-052)+(1.066)+(2.014), (I-052)+(1.066)+(2.015), (I-052)+(1.066)+(2.016), (I-052)+(1.066)+(2.017), (I-052)+(1.066)+(2.018), (I-052)+(1.066)+(2.019), (I-052)+(1.066)+(2.020), (I-052)+(1.066)+(2.021), (I-052)+(1.066)+(2.022), (I-052)+(1.066)+(2.023), (I-052)+(1.066)+(2.024), (I-052)+(1.066)+(2.025), (I-052)+(1.066)+(2.026), (I-052)+(1.066)+(2.027), (I-052)+(1.066)+(2.028), (I-052)+(1.066)+(2.029), (I-052)+(1.066)+(2.030), (I-052)+(1.066)+(2.031), (I-052)+(1.066)+(2.032), (I-052)+(1.066)+(2.033), (I-052)+(1.066)+(2.034), (I-052)+(1.066)+(2.035), (I-052)+(1.066)+(2.036), (I-052)+(1.066)+(2.037), (I-052)+(1.066)+(2.038), (I-052)+(1.066)+(2.039), (I-052)+(1.066)+(2.040), (I-052)+(1.066)+(2.041), (I-052)+(1.066)+(2.042), (I-052)+(1.066)+(2.043), (I-052)+(1.066)+(2.044), (I-052)+(1.066)+(2.045), (I-052)+(1.066)+(2.046), (I-052)+(1.066)+(2.047), (I-052)+(1.066)+(2.048), (I-052)+(1.066)+(2.049), (I-052)+(1.066)+(2.050), (I-052)+(1.066)+(2.051), (I-052)+(1.066)+(2.052), (I-052)+(1.066)+(2.053), (I-052)+(1.066)+(2.054), (I-052)+(1.066)+(2.055), (I-052)+(1.066)+(2.056), (I-052)+(1.066)+(2.057), (I-052)+(1.066)+(2.058), (I-052)+(1.066)+(2.059), (I-052)+(1.066)+(3.001), (I-052)+(1.066)+(3.002), (I-052)+(1.066)+(3.003), (I-052)+(1.066)+(3.004), (I-052)+(1.066)+(3.005), (I-052)+(1.066)+(3.006), (I-052)+(1.066)+(3.007), (I-052)+(1.066)+(3.008), (I-052)+(1.066)+(3.009), (I-052)+(1.066)+(3.010), (I-052)+(1.066)+(3.011), (I-052)+(1.066)+(3.012), (I-052)+(1.066)+(3.013), (I-052)+(1.066)+(3.014), (I-052)+(1.066)+(3.015), (I-052)+(1.066)+(3.016), (I-052)+(1.066)+(3.017), (I-052)+(1.066)+(3.018), (I-052)+(1.066)+(3.019), (I-052)+(1.066)+(3.020), (I-052)+(1.066)+(3.021), (I-052)+(1.066)+(3.022), (I-052)+(1.066)+(3.023), (I-052)+(1.066)+(3.024), (I-052)+(1.066)+(3.025), (I-052)+(1.066)+(3.026), (I-052)+(1.066)+(3.027), (I-052)+(1.066)+(3.028), (I-052)+(1.066)+(3.029), (I-052)+(1.066)+(3.030), (I-052)+(1.066)+(3.031), (I-052)+(1.066)+(5.001), (I-052)+(1.066)+(5.002), (I-052)+(1.066)+(5.003), (I-052)+(1.066)+(5.004), (I-052)+(1.066)+(5.005), (I-052)+(1.066)+(5.006), (I-052)+(1.066)+(5.007), (I-052)+(1.066)+(5.008), (I-052)+(1.066)+(5.009), (I-052)+(1.066)+(5.010), (I-052)+(1.066)+(5.011), (I-052)+(1.066)+(5.012), (I-052)+(1.066)+(5.013), (I-052)+(1.066)+(5.014), (I-052)+(1.066)+(5.015), (I-052)+(1.066)+(5.016), (I-052)+(1.066)+(5.017), (I-052)+(1.066)+(5.018), (I-052)+(1.066)+(5.019), (I-052)+(1.066)+(5.020), (I-052)+(1.066)+(5.021), (I-052)+(1.066)+(5.022), (I-052)+(1.066)+(5.023), (I-052)+(1.066)+(6.001), (I-052)+(1.066)+(6.002), (I-052)+(1.066)+(6.003), (I-052)+(1.066)+(6.004), (I-052)+(1.066)+(7.001), (I-052)+(1.066)+(7.002), (I-052)+(1.066)+(7.003), (I-052)+(1.066)+(7.004), (I-052)+(1.066)+(7.005), (I-052)+(1.066)+(7.006), (I-052)+(1.066)+(9.001), (I-052)+(1.066)+(9.002), (I-052)+(1.066)+(9.003), (I-052)+(1.066)+(9.004), (I-052)+(1.066)+(9.005), (I-052)+(1.066)+(9.006), (I-052)+(1.066)+(9.007), (I-052)+(1.066)+(9.008), (I-052)+(1.066)+(9.009), (I-052)+(1.066)+(14.001), (I-052)+(1.066)+(14.002), (I-052)+(1.066)+(15.008), (I-052)+(1.066)+(15.011), (I-052)+(1.066)+(15.012), (I-052)+(1.066)+(15.016), (I-052)+(1.066)+(15.025), (I-052)+(1.066)+(15.027), (I-052)+(1.066)+(15.047), (I-052)+(1.066)+(15.063), (I-052)+(1.066)+(15.064), (I-052)+(1.066)+(16.001), (I-052)+(1.066)+(16.002), (I-052)+(1.066)+(16.003), (I-052)+(1.066)+(16.004), (I-052)+(1.066)+(16.005), (I-052)+(1.066)+(16.006), (I-052)+(1.066)+(16.007), (I-052)+(1.066)+(16.008), (I-052)+(1.066)+(17.001), (I-052)+(1.066)+(17.002), (I-052)+(1.066)+(17.003), (I-052)+(1.066)+(17.004), (I-052)+(1.066)+(17.005), (I-052)+(1.066)+(17.006), (I-052)+(1.066)+(17.007), (I-052)+(1.066)+(17.008), (I-052)+(1.066)+(17.009), (I-052)+(1.066)+(17.010), (I-052)+(1.066)+(17.011), (I-052)+(1.066)+(17.012), (I-052)+(1.066)+(18.001), (I-052)+(1.067)+(1.068), (I-052)+(1.067)+(1.069), (I-052)+(1.067)+(1.070), (I-052)+(1.067)+(1.071), (I-052)+(1.067)+(1.072), (I-052)+(1.067)+(1.073), (I-052)+(1.067)+(1.074), (I-052)+(1.067)+(1.075), (I-052)+(1.067)+(1.076), (I-052)+(1.067)+(1.077), (I-052)+(1.067)+(1.078), (I-052)+(1.067)+(1.079), (I-052)+(1.067)+(1.080), (I-052)+(1.067)+(1.081), (I-052)+(1.067)+(1.082), (I-052)+(1.067)+(1.083), (I-052)+(1.067)+(1.084), (I-052)+(1.067)+(1.085), (I-052)+(1.067)+(1.086), (I-052)+(1.067)+(1.087), (I-052)+(1.067)+(1.088), (I-052)+(1.067)+(1.089), (I-052)+(1.067)+(1.090), (I-052)+(1.067)+(1.091), (I-052)+(1.067)+(1.092), (I-052)+(1.067)+(2.001), (I-052)+(1.067)+(2.002), (I-052)+(1.067)+(2.003), (I-052)+(1.067)+(2.004), (I-052)+(1.067)+(2.005), (I-052)+(1.067)+(2.006), (I-052)+(1.067)+(2.007), (I-052)+(1.067)+(2.008), (I-052)+(1.067)+(2.009), (I-052)+(1.067)+(2.010), (I-052)+(1.067)+(2.011), (I-052)+(1.067)+(2.012), (I-052)+(1.067)+(2.013), (I-052)+(1.067)+(2.014), (I-052)+(1.067)+(2.015), (I-052)+(1.067)+(2.016), (I-052)+(1.067)+(2.017), (I-052)+(1.067)+(2.018), (I-052)+(1.067)+(2.019), (I-052)+(1.067)+(2.020), (I-052)+(1.067)+(2.021), (I-052)+(1.067)+(2.022), (I-052)+(1.067)+(2.023), (I-052)+(1.067)+(2.024), (I-052)+(1.067)+(2.025), (I-052)+(1.067)+(2.026), (I-052)+(1.067)+(2.027), (I-052)+(1.067)+(2.028), (I-052)+(1.067)+(2.029), (I-052)+(1.067)+(2.030), (I-052)+(1.067)+(2.031), (I-052)+(1.067)+(2.032), (I-052)+(1.067)+(2.033), (I-052)+(1.067)+(2.034), (I-052)+(1.067)+(2.035), (I-052)+(1.067)+(2.036), (I-052)+(1.067)+(2.037), (I-052)+(1.067)+(2.038), (I-052)+(1.067)+(2.039), (I-052)+(1.067)+(2.040), (I-052)+(1.067)+(2.041), (I-052)+(1.067)+(2.042), (I-052)+(1.067)+(2.043), (I-052)+(1.067)+(2.044), (I-052)+(1.067)+(2.045), (I-052)+(1.067)+(2.046), (I-052)+(1.067)+(2.047), (I-052)+(1.067)+(2.048), (I-052)+(1.067)+(2.049), (I-052)+(1.067)+(2.050), (I-052)+(1.067)+(2.051), (I-052)+(1.067)+(2.052), (I-052)+(1.067)+(2.053), (I-052)+(1.067)+(2.054), (I-052)+(1.067)+(2.055), (I-052)+(1.067)+(2.056), (I-052)+(1.067)+(2.057), (I-052)+(1.067)+(2.058), (I-052)+(1.067)+(2.059), (I-052)+(1.067)+(3.001), (I-052)+(1.067)+(3.002), (I-052)+(1.067)+(3.003), (I-052)+(1.067)+(3.004), (I-052)+(1.067)+(3.005), (I-052)+(1.067)+(3.006), (I-052)+(1.067)+(3.007), (I-052)+(1.067)+(3.008), (I-052)+(1.067)+(3.009), (I-052)+(1.067)+(3.010), (I-052)+(1.067)+(3.011), (I-052)+(1.067)+(3.012), (I-052)+(1.067)+(3.013), (I-052)+(1.067)+(3.014), (I-052)+(1.067)+(3.015), (I-052)+(1.067)+(3.016), (I-052)+(1.067)+(3.017), (I-052)+(1.067)+(3.018), (I-052)+(1.067)+(3.019), (I-052)+(1.067)+(3.020), (I-052)+(1.067)+(3.021), (I-052)+(1.067)+(3.022), (I-052)+(1.067)+(3.023), (I-052)+(1.067)+(3.024), (I-052)+(1.067)+(3.025), (I-052)+(1.067)+(3.026), (I-052)+(1.067)+(3.027), (I-052)+(1.067)+(3.028), (I-052)+(1.067)+(3.029), (I-052)+(1.067)+(3.030), (I-052)+(1.067)+(3.031), (I-052)+(1.067)+(5.001), (I-052)+(1.067)+(5.002), (I-052)+(1.067)+(5.003), (I-052)+(1.067)+(5.004), (I-052)+(1.067)+(5.005), (I-052)+(1.067)+(5.006), (I-052)+(1.067)+(5.007), (I-052)+(1.067)+(5.008), (I-052)+(1.067)+(5.009), (I-052)+(1.067)+(5.010), (I-052)+(1.067)+(5.011), (I-052)+(1.067)+(5.012), (I-052)+(1.067)+(5.013), (I-052)+(1.067)+(5.014), (I-052)+(1.067)+(5.015), (I-052)+(1.067)+(5.016), (I-052)+(1.067)+(5.017), (I-052)+(1.067)+(5.018), (I-052)+(1.067)+(5.019), (I-052)+(1.067)+(5.020), (I-052)+(1.067)+(5.021), (I-052)+(1.067)+(5.022), (I-052)+(1.067)+(5.023), (I-052)+(1.067)+(6.001), (I-052)+(1.067)+(6.002), (I-052)+(1.067)+(6.003), (I-052)+(1.067)+(6.004), (I-052)+(1.067)+(7.001), (I-052)+(1.067)+(7.002), (I-052)+(1.067)+(7.003), (I-052)+(1.067)+(7.004), (I-052)+(1.067)+(7.005), (I-052)+(1.067)+(7.006), (I-052)+(1.067)+(9.001), (I-052)+(1.067)+(9.002), (I-052)+(1.067)+(9.003), (I-052)+(1.067)+(9.004), (I-052)+(1.067)+(9.005), (I-052)+(1.067)+(9.006), (I-052)+(1.067)+(9.007), (I-052)+(1.067)+(9.008), (I-052)+(1.067)+(9.009), (I-052)+(1.067)+(14.001), (I-052)+(1.067)+(14.002), (I-052)+(1.067)+(15.008), (I-052)+(1.067)+(15.011), (I-052)+(1.067)+(15.012), (I-052)+(1.067)+(15.016), (I-052)+(1.067)+(15.025), (I-052)+(1.067)+(15.027), (I-052)+(1.067)+(15.047), (I-052)+(1.067)+(15.063), (I-052)+(1.067)+(15.064), (I-052)+(1.067)+(16.001), (I-052)+(1.067)+(16.002), (I-052)+(1.067)+(16.003), (I-052)+(1.067)+(16.004), (I-052)+(1.067)+(16.005), (I-052)+(1.067)+(16.006), (I-052)+(1.067)+(16.007), (I-052)+(1.067)+(16.008), (I-052)+(1.067)+(17.001), (I-052)+(1.067)+(17.002), (I-052)+(1.067)+(17.003), (I-052)+(1.067)+(17.004), (I-052)+(1.067)+(17.005), (I-052)+(1.067)+(17.006), (I-052)+(1.067)+(17.007), (I-052)+(1.067)+(17.008), (I-052)+(1.067)+(17.009), (I-052)+(1.067)+(17.010), (I-052)+(1.067)+(17.011), (I-052)+(1.067)+(17.012), (I-052)+(1.067)+(18.001), (I-052)+(1.068)+(1.069), (I-052)+(1.068)+(1.070), (I-052)+(1.068)+(1.071), (I-052)+(1.068)+(1.072), (I-052)+(1.068)+(1.073), (I-052)+(1.068)+(1.074), (I-052)+(1.068)+(1.075), (I-052)+(1.068)+(1.076), (I-052)+(1.068)+(1.077), (I-052)+(1.068)+(1.078), (I-052)+(1.068)+(1.079), (I-052)+(1.068)+(1.080), (I-052)+(1.068)+(1.081), (I-052)+(1.068)+(1.082), (I-052)+(1.068)+(1.083), (I-052)+(1.068)+(1.084), (I-052)+(1.068)+(1.085), (I-052)+(1.068)+(1.086), (I-052)+(1.068)+(1.087), (I-052)+(1.068)+(1.088), (I-052)+(1.068)+(1.089), (I-052)+(1.068)+(1.090), (I-052)+(1.068)+(1.091), (I-052)+(1.068)+(1.092), (I-052)+(1.068)+(2.001), (I-052)+(1.068)+(2.002), (I-052)+(1.068)+(2.003), (I-052)+(1.068)+(2.004), (I-052)+(1.068)+(2.005), (I-052)+(1.068)+(2.006), (I-052)+(1.068)+(2.007), (I-052)+(1.068)+(2.008), (I-052)+(1.068)+(2.009), (I-052)+(1.068)+(2.010), (I-052)+(1.068)+(2.011), (I-052)+(1.068)+(2.012), (I-052)+(1.068)+(2.013), (I-052)+(1.068)+(2.014), (I-052)+(1.068)+(2.015), (I-052)+(1.068)+(2.016), (I-052)+(1.068)+(2.017), (I-052)+(1.068)+(2.018), (I-052)+(1.068)+(2.019), (I-052)+(1.068)+(2.020), (I-052)+(1.068)+(2.021), (I-052)+(1.068)+(2.022), (I-052)+(1.068)+(2.023), (I-052)+(1.068)+(2.024), (I-052)+(1.068)+(2.025), (I-052)+(1.068)+(2.026), (I-052)+(1.068)+(2.027), (I-052)+(1.068)+(2.028), (I-052)+(1.068)+(2.029), (I-052)+(1.068)+(2.030), (I-052)+(1.068)+(2.031), (I-052)+(1.068)+(2.032), (I-052)+(1.068)+(2.033), (I-052)+(1.068)+(2.034), (I-052)+(1.068)+(2.035), (I-052)+(1.068)+(2.036), (I-052)+(1.068)+(2.037), (I-052)+(1.068)+(2.038), (I-052)+(1.068)+(2.039), (I-052)+(1.068)+(2.040), (I-052)+(1.068)+(2.041), (I-052)+(1.068)+(2.042), (I-052)+(1.068)+(2.043), (I-052)+(1.068)+(2.044), (I-052)+(1.068)+(2.045), (I-052)+(1.068)+(2.046), (I-052)+(1.068)+(2.047), (I-052)+(1.068)+(2.048), (I-052)+(1.068)+(2.049), (I-052)+(1.068)+(2.050), (I-052)+(1.068)+(2.051), (I-052)+(1.068)+(2.052), (I-052)+(1.068)+(2.053), (I-052)+(1.068)+(2.054), (I-052)+(1.068)+(2.055), (I-052)+(1.068)+(2.056), (I-052)+(1.068)+(2.057), (I-052)+(1.068)+(2.058), (I-052)+(1.068)+(2.059), (I-052)+(1.068)+(3.001), (I-052)+(1.068)+(3.002), (I-052)+(1.068)+(3.003), (I-052)+(1.068)+(3.004), (I-052)+(1.068)+(3.005), (I-052)+(1.068)+(3.006), (I-052)+(1.068)+(3.007), (I-052)+(1.068)+(3.008), (I-052)+(1.068)+(3.009), (I-052)+(1.068)+(3.010), (I-052)+(1.068)+(3.011), (I-052)+(1.068)+(3.012), (I-052)+(1.068)+(3.013), (I-052)+(1.068)+(3.014), (I-052)+(1.068)+(3.015), (I-052)+(1.068)+(3.016), (I-052)+(1.068)+(3.017), (I-052)+(1.068)+(3.018), (I-052)+(1.068)+(3.019), (I-052)+(1.068)+(3.020), (I-052)+(1.068)+(3.021), (I-052)+(1.068)+(3.022), (I-052)+(1.068)+(3.023), (I-052)+(1.068)+(3.024), (I-052)+(1.068)+(3.025), (I-052)+(1.068)+(3.026), (I-052)+(1.068)+(3.027), (I-052)+(1.068)+(3.028), (I-052)+(1.068)+(3.029), (I-052)+(1.068)+(3.030), (I-052)+(1.068)+(3.031), (I-052)+(1.068)+(5.001), (I-052)+(1.068)+(5.002), (I-052)+(1.068)+(5.003), (I-052)+(1.068)+(5.004), (I-052)+(1.068)+(5.005), (I-052)+(1.068)+(5.006), (I-052)+(1.068)+(5.007), (I-052)+(1.068)+(5.008), (I-052)+(1.068)+(5.009), (I-052)+(1.068)+(5.010), (I-052)+(1.068)+(5.011), (I-052)+(1.068)+(5.012), (I-052)+(1.068)+(5.013), (I-052)+(1.068)+(5.014), (I-052)+(1.068)+(5.015), (I-052)+(1.068)+(5.016), (I-052)+(1.068)+(5.017), (I-052)+(1.068)+(5.018), (I-052)+(1.068)+(5.019), (I-052)+(1.068)+(5.020), (I-052)+(1.068)+(5.021), (I-052)+(1.068)+(5.022), (I-052)+(1.068)+(5.023), (I-052)+(1.068)+(6.001), (I-052)+(1.068)+(6.002), (I-052)+(1.068)+(6.003), (I-052)+(1.068)+(6.004), (I-052)+(1.068)+(7.001), (I-052)+(1.068)+(7.002), (I-052)+(1.068)+(7.003), (I-052)+(1.068)+(7.004), (I-052)+(1.068)+(7.005), (I-052)+(1.068)+(7.006), (I-052)+(1.068)+(9.001), (I-052)+(1.068)+(9.002), (I-052)+(1.068)+(9.003), (I-052)+(1.068)+(9.004), (I-052)+(1.068)+(9.005), (I-052)+(1.068)+(9.006), (I-052)+(1.068)+(9.007), (I-052)+(1.068)+(9.008), (I-052)+(1.068)+(9.009), (I-052)+(1.068)+(14.001), (I-052)+(1.068)+(14.002), (I-052)+(1.068)+(15.008), (I-052)+(1.068)+(15.011), (I-052)+(1.068)+(15.012), (I-052)+(1.068)+(15.016), (I-052)+(1.068)+(15.025), (I-052)+(1.068)+(15.027), (I-052)+(1.068)+(15.047), (I-052)+(1.068)+(15.063), (I-052)+(1.068)+(15.064), (I-052)+(1.068)+(16.001), (I-052)+(1.068)+(16.002), (I-052)+(1.068)+(16.003), (I-052)+(1.068)+(16.004), (I-052)+(1.068)+(16.005), (I-052)+(1.068)+(16.006), (I-052)+(1.068)+(16.007), (I-052)+(1.068)+(16.008), (I-052)+(1.068)+(17.001), (I-052)+(1.068)+(17.002), (I-052)+(1.068)+(17.003), (I-052)+(1.068)+(17.004), (I-052)+(1.068)+(17.005), (I-052)+(1.068)+(17.006), (I-052)+(1.068)+(17.007), (I-052)+(1.068)+(17.008), (I-052)+(1.068)+(17.009), (I-052)+(1.068)+(17.010), (I-052)+(1.068)+(17.011), (I-052)+(1.068)+(17.012), (I-052)+(1.068)+(18.001), (I-052)+(1.069)+(1.070), (I-052)+(1.069)+(1.071), (I-052)+(1.069)+(1.072), (I-052)+(1.069)+(1.073), (I-052)+(1.069)+(1.074), (I-052)+(1.069)+(1.075), (I-052)+(1.069)+(1.076), (I-052)+(1.069)+(1.077), (I-052)+(1.069)+(1.078), (I-052)+(1.069)+(1.079), (I-052)+(1.069)+(1.080), (I-052)+(1.069)+(1.081), (I-052)+(1.069)+(1.082), (I-052)+(1.069)+(1.083), (I-052)+(1.069)+(1.084), (I-052)+(1.069)+(1.085), (I-052)+(1.069)+(1.086), (I-052)+(1.069)+(1.087), (I-052)+(1.069)+(1.088), (I-052)+(1.069)+(1.089), (I-052)+(1.069)+(1.090), (I-052)+(1.069)+(1.091), (I-052)+(1.069)+(1.092), (I-052)+(1.069)+(2.001), (I-052)+(1.069)+(2.002), (I-052)+(1.069)+(2.003), (I-052)+(1.069)+(2.004), (I-052)+(1.069)+(2.005), (I-052)+(1.069)+(2.006), (I-052)+(1.069)+(2.007), (I-052)+(1.069)+(2.008), (I-052)+(1.069)+(2.009), (I-052)+(1.069)+(2.010), (I-052)+(1.069)+(2.011), (I-052)+(1.069)+(2.012), (I-052)+(1.069)+(2.013), (I-052)+(1.069)+(2.014), (I-052)+(1.069)+(2.015), (I-052)+(1.069)+(2.016), (I-052)+(1.069)+(2.017), (I-052)+(1.069)+(2.018), (I-052)+(1.069)+(2.019), (I-052)+(1.069)+(2.020), (I-052)+(1.069)+(2.021), (I-052)+(1.069)+(2.022), (I-052)+(1.069)+(2.023), (I-052)+(1.069)+(2.024), (I-052)+(1.069)+(2.025), (I-052)+(1.069)+(2.026), (I-052)+(1.069)+(2.027), (I-052)+(1.069)+(2.028), (I-052)+(1.069)+(2.029), (I-052)+(1.069)+(2.030), (I-052)+(1.069)+(2.031), (I-052)+(1.069)+(2.032), (I-052)+(1.069)+(2.033), (I-052)+(1.069)+(2.034), (I-052)+(1.069)+(2.035), (I-052)+(1.069)+(2.036), (I-052)+(1.069)+(2.037), (I-052)+(1.069)+(2.038), (I-052)+(1.069)+(2.039), (I-052)+(1.069)+(2.040), (I-052)+(1.069)+(2.041), (I-052)+(1.069)+(2.042), (I-052)+(1.069)+(2.043), (I-052)+(1.069)+(2.044), (I-052)+(1.069)+(2.045), (I-052)+(1.069)+(2.046), (I-052)+(1.069)+(2.047), (I-052)+(1.069)+(2.048), (I-052)+(1.069)+(2.049), (I-052)+(1.069)+(2.050), (I-052)+(1.069)+(2.051), (I-052)+(1.069)+(2.052), (I-052)+(1.069)+(2.053), (I-052)+(1.069)+(2.054), (I-052)+(1.069)+(2.055), (I-052)+(1.069)+(2.056), (I-052)+(1.069)+(2.057), (I-052)+(1.069)+(2.058), (I-052)+(1.069)+(2.059), (I-052)+(1.069)+(3.001), (I-052)+(1.069)+(3.002), (I-052)+(1.069)+(3.003), (I-052)+(1.069)+(3.004), (I-052)+(1.069)+(3.005), (I-052)+(1.069)+(3.006), (I-052)+(1.069)+(3.007), (I-052)+(1.069)+(3.008), (I-052)+(1.069)+(3.009), (I-052)+(1.069)+(3.010), (I-052)+(1.069)+(3.011), (I-052)+(1.069)+(3.012), (I-052)+(1.069)+(3.013), (I-052)+(1.069)+(3.014), (I-052)+(1.069)+(3.015), (I-052)+(1.069)+(3.016), (I-052)+(1.069)+(3.017), (I-052)+(1.069)+(3.018), (I-052)+(1.069)+(3.019), (I-052)+(1.069)+(3.020), (I-052)+(1.069)+(3.021), (I-052)+(1.069)+(3.022), (I-052)+(1.069)+(3.023), (I-052)+(1.069)+(3.024), (I-052)+(1.069)+(3.025), (I-052)+(1.069)+(3.026), (I-052)+(1.069)+(3.027), (I-052)+(1.069)+(3.028), (I-052)+(1.069)+(3.029), (I-052)+(1.069)+(3.030), (I-052)+(1.069)+(3.031), (I-052)+(1.069)+(5.001), (I-052)+(1.069)+(5.002), (I-052)+(1.069)+(5.003), (I-052)+(1.069)+(5.004), (I-052)+(1.069)+(5.005), (I-052)+(1.069)+(5.006), (I-052)+(1.069)+(5.007), (I-052)+(1.069)+(5.008), (I-052)+(1.069)+(5.009), (I-052)+(1.069)+(5.010), (I-052)+(1.069)+(5.011), (I-052)+(1.069)+(5.012), (I-052)+(1.069)+(5.013), (I-052)+(1.069)+(5.014), (I-052)+(1.069)+(5.015), (I-052)+(1.069)+(5.016), (I-052)+(1.069)+(5.017), (I-052)+(1.069)+(5.018), (I-052)+(1.069)+(5.019), (I-052)+(1.069)+(5.020), (I-052)+(1.069)+(5.021), (I-052)+(1.069)+(5.022), (I-052)+(1.069)+(5.023), (I-052)+(1.069)+(6.001), (I-052)+(1.069)+(6.002), (I-052)+(1.069)+(6.003), (I-052)+(1.069)+(6.004), (I-052)+(1.069)+(7.001), (I-052)+(1.069)+(7.002), (I-052)+(1.069)+(7.003), (I-052)+(1.069)+(7.004), (I-052)+(1.069)+(7.005), (I-052)+(1.069)+(7.006), (I-052)+(1.069)+(9.001), (I-052)+(1.069)+(9.002), (I-052)+(1.069)+(9.003), (I-052)+(1.069)+(9.004), (I-052)+(1.069)+(9.005), (I-052)+(1.069)+(9.006), (I-052)+(1.069)+(9.007), (I-052)+(1.069)+(9.008), (I-052)+(1.069)+(9.009), (I-052)+(1.069)+(14.001), (I-052)+(1.069)+(14.002), (I-052)+(1.069)+(15.008), (I-052)+(1.069)+(15.011), (I-052)+(1.069)+(15.012), (I-052)+(1.069)+(15.016), (I-052)+(1.069)+(15.025), (I-052)+(1.069)+(15.027), (I-052)+(1.069)+(15.047), (I-052)+(1.069)+(15.063), (I-052)+(1.069)+(15.064), (I-052)+(1.069)+(16.001), (I-052)+(1.069)+(16.002), (I-052)+(1.069)+(16.003), (I-052)+(1.069)+(16.004), (I-052)+(1.069)+(16.005), (I-052)+(1.069)+(16.006), (I-052)+(1.069)+(16.007), (I-052)+(1.069)+(16.008), (I-052)+(1.069)+(17.001), (I-052)+(1.069)+(17.002), (I-052)+(1.069)+(17.003), (I-052)+(1.069)+(17.004), (I-052)+(1.069)+(17.005), (I-052)+(1.069)+(17.006), (I-052)+(1.069)+(17.007), (I-052)+(1.069)+(17.008), (I-052)+(1.069)+(17.009), (I-052)+(1.069)+(17.010), (I-052)+(1.069)+(17.011), (I-052)+(1.069)+(17.012), (I-052)+(1.069)+(18.001), (I-052)+(1.070)+(1.071), (I-052)+(1.070)+(1.072), (I-052)+(1.070)+(1.073), (I-052)+(1.070)+(1.074), (I-052)+(1.070)+(1.075), (I-052)+(1.070)+(1.076), (I-052)+(1.070)+(1.077), (I-052)+(1.070)+(1.078), (I-052)+(1.070)+(1.079), (I-052)+(1.070)+(1.080), (I-052)+(1.070)+(1.081), (I-052)+(1.070)+(1.082), (I-052)+(1.070)+(1.083), (I-052)+(1.070)+(1.084), (I-052)+(1.070)+(1.085), (I-052)+(1.070)+(1.086), (I-052)+(1.070)+(1.087), (I-052)+(1.070)+(1.088), (I-052)+(1.070)+(1.089), (I-052)+(1.070)+(1.090), (I-052)+(1.070)+(1.091), (I-052)+(1.070)+(1.092), (I-052)+(1.070)+(2.001), (I-052)+(1.070)+(2.002), (I-052)+(1.070)+(2.003), (I-052)+(1.070)+(2.004), (I-052)+(1.070)+(2.005), (I-052)+(1.070)+(2.006), (I-052)+(1.070)+(2.007), (I-052)+(1.070)+(2.008), (I-052)+(1.070)+(2.009), (I-052)+(1.070)+(2.010), (I-052)+(1.070)+(2.011), (I-052)+(1.070)+(2.012), (I-052)+(1.070)+(2.013), (I-052)+(1.070)+(2.014), (I-052)+(1.070)+(2.015), (I-052)+(1.070)+(2.016), (I-052)+(1.070)+(2.017), (I-052)+(1.070)+(2.018), (I-052)+(1.070)+(2.019), (I-052)+(1.070)+(2.020), (I-052)+(1.070)+(2.021), (I-052)+(1.070)+(2.022), (I-052)+(1.070)+(2.023), (I-052)+(1.070)+(2.024), (I-052)+(1.070)+(2.025), (I-052)+(1.070)+(2.026), (I-052)+(1.070)+(2.027), (I-052)+(1.070)+(2.028), (I-052)+(1.070)+(2.029), (I-052)+(1.070)+(2.030), (I-052)+(1.070)+(2.031), (I-052)+(1.070)+(2.032), (I-052)+(1.070)+(2.033), (I-052)+(1.070)+(2.034), (I-052)+(1.070)+(2.035), (I-052)+(1.070)+(2.036), (I-052)+(1.070)+(2.037), (I-052)+(1.070)+(2.038), (I-052)+(1.070)+(2.039), (I-052)+(1.070)+(2.040), (I-052)+(1.070)+(2.041), (I-052)+(1.070)+(2.042), (I-052)+(1.070)+(2.043), (I-052)+(1.070)+(2.044), (I-052)+(1.070)+(2.045), (I-052)+(1.070)+(2.046), (I-052)+(1.070)+(2.047), (I-052)+(1.070)+(2.048), (I-052)+(1.070)+(2.049), (I-052)+(1.070)+(2.050), (I-052)+(1.070)+(2.051), (I-052)+(1.070)+(2.052), (I-052)+(1.070)+(2.053), (I-052)+(1.070)+(2.054), (I-052)+(1.070)+(2.055), (I-052)+(1.070)+(2.056), (I-052)+(1.070)+(2.057), (I-052)+(1.070)+(2.058), (I-052)+(1.070)+(2.059), (I-052)+(1.070)+(3.001), (I-052)+(1.070)+(3.002), (I-052)+(1.070)+(3.003), (I-052)+(1.070)+(3.004), (I-052)+(1.070)+(3.005), (I-052)+(1.070)+(3.006), (I-052)+(1.070)+(3.007), (I-052)+(1.070)+(3.008), (I-052)+(1.070)+(3.009), (I-052)+(1.070)+(3.010), (I-052)+(1.070)+(3.011), (I-052)+(1.070)+(3.012), (I-052)+(1.070)+(3.013), (I-052)+(1.070)+(3.014), (I-052)+(1.070)+(3.015), (I-052)+(1.070)+(3.016), (I-052)+(1.070)+(3.017), (I-052)+(1.070)+(3.018), (I-052)+(1.070)+(3.019), (I-052)+(1.070)+(3.020), (I-052)+(1.070)+(3.021), (I-052)+(1.070)+(3.022), (I-052)+(1.070)+(3.023), (I-052)+(1.070)+(3.024), (I-052)+(1.070)+(3.025), (I-052)+(1.070)+(3.026), (I-052)+(1.070)+(3.027), (I-052)+(1.070)+(3.028), (I-052)+(1.070)+(3.029), (I-052)+(1.070)+(3.030), (I-052)+(1.070)+(3.031), (I-052)+(1.070)+(5.001), (I-052)+(1.070)+(5.002), (I-052)+(1.070)+(5.003), (I-052)+(1.070)+(5.004), (I-052)+(1.070)+(5.005), (I-052)+(1.070)+(5.006), (I-052)+(1.070)+(5.007), (I-052)+(1.070)+(5.008), (I-052)+(1.070)+(5.009), (I-052)+(1.070)+(5.010), (I-052)+(1.070)+(5.011), (I-052)+(1.070)+(5.012), (I-052)+(1.070)+(5.013), (I-052)+(1.070)+(5.014), (I-052)+(1.070)+(5.015), (I-052)+(1.070)+(5.016), (I-052)+(1.070)+(5.017), (I-052)+(1.070)+(5.018), (I-052)+(1.070)+(5.019), (I-052)+(1.070)+(5.020), (I-052)+(1.070)+(5.021), (I-052)+(1.070)+(5.022), (I-052)+(1.070)+(5.023), (I-052)+(1.070)+(6.001), (I-052)+(1.070)+(6.002), (I-052)+(1.070)+(6.003), (I-052)+(1.070)+(6.004), (I-052)+(1.070)+(7.001), (I-052)+(1.070)+(7.002), (I-052)+(1.070)+(7.003), (I-052)+(1.070)+(7.004), (I-052)+(1.070)+(7.005), (I-052)+(1.070)+(7.006), (I-052)+(1.070)+(9.001), (I-052)+(1.070)+(9.002), (I-052)+(1.070)+(9.003), (I-052)+(1.070)+(9.004), (I-052)+(1.070)+(9.005), (I-052)+(1.070)+(9.006), (I-052)+(1.070)+(9.007), (I-052)+(1.070)+(9.008), (I-052)+(1.070)+(9.009), (I-052)+(1.070)+(14.001), (I-052)+(1.070)+(14.002), (I-052)+(1.070)+(15.008), (I-052)+(1.070)+(15.011), (I-052)+(1.070)+(15.012), (I-052)+(1.070)+(15.016), (I-052)+(1.070)+(15.025), (I-052)+(1.070)+(15.027), (I-052)+(1.070)+(15.047), (I-052)+(1.070)+(15.063), (I-052)+(1.070)+(15.064), (I-052)+(1.070)+(16.001), (I-052)+(1.070)+(16.002), (I-052)+(1.070)+(16.003), (I-052)+(1.070)+(16.004), (I-052)+(1.070)+(16.005), (I-052)+(1.070)+(16.006), (I-052)+(1.070)+(16.007), (I-052)+(1.070)+(16.008), (I-052)+(1.070)+(17.001), (I-052)+(1.070)+(17.002), (I-052)+(1.070)+(17.003), (I-052)+(1.070)+(17.004), (I-052)+(1.070)+(17.005), (I-052)+(1.070)+(17.006), (I-052)+(1.070)+(17.007), (I-052)+(1.070)+(17.008), (I-052)+(1.070)+(17.009), (I-052)+(1.070)+(17.010), (I-052)+(1.070)+(17.011), (I-052)+(1.070)+(17.012), (I-052)+(1.070)+(18.001), (I-052)+(1.071)+(1.072), (I-052)+(1.071)+(1.073), (I-052)+(1.071)+(1.074), (I-052)+(1.071)+(1.075), (I-052)+(1.071)+(1.076), (I-052)+(1.071)+(1.077), (I-052)+(1.071)+(1.078), (I-052)+(1.071)+(1.079), (I-052)+(1.071)+(1.080), (I-052)+(1.071)+(1.081), (I-052)+(1.071)+(1.082), (I-052)+(1.071)+(1.083), (I-052)+(1.071)+(1.084), (I-052)+(1.071)+(1.085), (I-052)+(1.071)+(1.086), (I-052)+(1.071)+(1.087), (I-052)+(1.071)+(1.088), (I-052)+(1.071)+(1.089), (I-052)+(1.071)+(1.090), (I-052)+(1.071)+(1.091), (I-052)+(1.071)+(1.092), (I-052)+(1.071)+(2.001), (I-052)+(1.071)+(2.002), (I-052)+(1.071)+(2.003), (I-052)+(1.071)+(2.004), (I-052)+(1.071)+(2.005), (I-052)+(1.071)+(2.006), (I-052)+(1.071)+(2.007), (I-052)+(1.071)+(2.008), (I-052)+(1.071)+(2.009), (I-052)+(1.071)+(2.010), (I-052)+(1.071)+(2.011), (I-052)+(1.071)+(2.012), (I-052)+(1.071)+(2.013), (I-052)+(1.071)+(2.014), (I-052)+(1.071)+(2.015), (I-052)+(1.071)+(2.016), (I-052)+(1.071)+(2.017), (I-052)+(1.071)+(2.018), (I-052)+(1.071)+(2.019), (I-052)+(1.071)+(2.020), (I-052)+(1.071)+(2.021), (I-052)+(1.071)+(2.022), (I-052)+(1.071)+(2.023), (I-052)+(1.071)+(2.024), (I-052)+(1.071)+(2.025), (I-052)+(1.071)+(2.026), (I-052)+(1.071)+(2.027), (I-052)+(1.071)+(2.028), (I-052)+(1.071)+(2.029), (I-052)+(1.071)+(2.030), (I-052)+(1.071)+(2.031), (I-052)+(1.071)+(2.032), (I-052)+(1.071)+(2.033), (I-052)+(1.071)+(2.034), (I-052)+(1.071)+(2.035), (I-052)+(1.071)+(2.036), (I-052)+(1.071)+(2.037), (I-052)+(1.071)+(2.038), (I-052)+(1.071)+(2.039), (I-052)+(1.071)+(2.040), (I-052)+(1.071)+(2.041), (I-052)+(1.071)+(2.042), (I-052)+(1.071)+(2.043), (I-052)+(1.071)+(2.044), (I-052)+(1.071)+(2.045), (I-052)+(1.071)+(2.046), (I-052)+(1.071)+(2.047), (I-052)+(1.071)+(2.048), (I-052)+(1.071)+(2.049), (I-052)+(1.071)+(2.050), (I-052)+(1.071)+(2.051), (I-052)+(1.071)+(2.052), (I-052)+(1.071)+(2.053), (I-052)+(1.071)+(2.054), (I-052)+(1.071)+(2.055), (I-052)+(1.071)+(2.056), (I-052)+(1.071)+(2.057), (I-052)+(1.071)+(2.058), (I-052)+(1.071)+(2.059), (I-052)+(1.071)+(3.001), (I-052)+(1.071)+(3.002), (I-052)+(1.071)+(3.003), (I-052)+(1.071)+(3.004), (I-052)+(1.071)+(3.005), (I-052)+(1.071)+(3.006), (I-052)+(1.071)+(3.007), (I-052)+(1.071)+(3.008), (I-052)+(1.071)+(3.009), (I-052)+(1.071)+(3.010), (I-052)+(1.071)+(3.011), (I-052)+(1.071)+(3.012), (I-052)+(1.071)+(3.013), (I-052)+(1.071)+(3.014), (I-052)+(1.071)+(3.015), (I-052)+(1.071)+(3.016), (I-052)+(1.071)+(3.017), (I-052)+(1.071)+(3.018), (I-052)+(1.071)+(3.019), (I-052)+(1.071)+(3.020), (I-052)+(1.071)+(3.021), (I-052)+(1.071)+(3.022), (I-052)+(1.071)+(3.023), (I-052)+(1.071)+(3.024), (I-052)+(1.071)+(3.025), (I-052)+(1.071)+(3.026), (I-052)+(1.071)+(3.027), (I-052)+(1.071)+(3.028), (I-052)+(1.071)+(3.029), (I-052)+(1.071)+(3.030), (I-052)+(1.071)+(3.031), (I-052)+(1.071)+(5.001), (I-052)+(1.071)+(5.002), (I-052)+(1.071)+(5.003), (I-052)+(1.071)+(5.004), (I-052)+(1.071)+(5.005), (I-052)+(1.071)+(5.006), (I-052)+(1.071)+(5.007), (I-052)+(1.071)+(5.008), (I-052)+(1.071)+(5.009), (I-052)+(1.071)+(5.010), (I-052)+(1.071)+(5.011), (I-052)+(1.071)+(5.012), (I-052)+(1.071)+(5.013), (I-052)+(1.071)+(5.014), (I-052)+(1.071)+(5.015), (I-052)+(1.071)+(5.016), (I-052)+(1.071)+(5.017), (I-052)+(1.071)+(5.018), (I-052)+(1.071)+(5.019), (I-052)+(1.071)+(5.020), (I-052)+(1.071)+(5.021), (I-052)+(1.071)+(5.022), (I-052)+(1.071)+(5.023), (I-052)+(1.071)+(6.001), (I-052)+(1.071)+(6.002), (I-052)+(1.071)+(6.003), (I-052)+(1.071)+(6.004), (I-052)+(1.071)+(7.001), (I-052)+(1.071)+(7.002), (I-052)+(1.071)+(7.003), (I-052)+(1.071)+(7.004), (I-052)+(1.071)+(7.005), (I-052)+(1.071)+(7.006), (I-052)+(1.071)+(9.001), (I-052)+(1.071)+(9.002), (I-052)+(1.071)+(9.003), (I-052)+(1.071)+(9.004), (I-052)+(1.071)+(9.005), (I-052)+(1.071)+(9.006), (I-052)+(1.071)+(9.007), (I-052)+(1.071)+(9.008), (I-052)+(1.071)+(9.009), (I-052)+(1.071)+(14.001), (I-052)+(1.071)+(14.002), (I-052)+(1.071)+(15.008), (I-052)+(1.071)+(15.011), (I-052)+(1.071)+(15.012), (I-052)+(1.071)+(15.016), (I-052)+(1.071)+(15.025), (I-052)+(1.071)+(15.027), (I-052)+(1.071)+(15.047), (I-052)+(1.071)+(15.063), (I-052)+(1.071)+(15.064), (I-052)+(1.071)+(16.001), (I-052)+(1.071)+(16.002), (I-052)+(1.071)+(16.003), (I-052)+(1.071)+(16.004), (I-052)+(1.071)+(16.005), (I-052)+(1.071)+(16.006), (I-052)+(1.071)+(16.007), (I-052)+(1.071)+(16.008), (I-052)+(1.071)+(17.001), (I-052)+(1.071)+(17.002), (I-052)+(1.071)+(17.003), (I-052)+(1.071)+(17.004), (I-052)+(1.071)+(17.005), (I-052)+(1.071)+(17.006), (I-052)+(1.071)+(17.007), (I-052)+(1.071)+(17.008), (I-052)+(1.071)+(17.009), (I-052)+(1.071)+(17.010), (I-052)+(1.071)+(17.011), (I-052)+(1.071)+(17.012), (I-052)+(1.071)+(18.001), (I-052)+(1.072)+(1.073), (I-052)+(1.072)+(1.074), (I-052)+(1.072)+(1.075), (I-052)+(1.072)+(1.076), (I-052)+(1.072)+(1.077), (I-052)+(1.072)+(1.078), (I-052)+(1.072)+(1.079), (I-052)+(1.072)+(1.080), (I-052)+(1.072)+(1.081), (I-052)+(1.072)+(1.082), (I-052)+(1.072)+(1.083), (I-052)+(1.072)+(1.084), (I-052)+(1.072)+(1.085), (I-052)+(1.072)+(1.086), (I-052)+(1.072)+(1.087), (I-052)+(1.072)+(1.088), (I-052)+(1.072)+(1.089), (I-052)+(1.072)+(1.090), (I-052)+(1.072)+(1.091), (I-052)+(1.072)+(1.092), (I-052)+(1.072)+(2.001), (I-052)+(1.072)+(2.002), (I-052)+(1.072)+(2.003), (I-052)+(1.072)+(2.004), (I-052)+(1.072)+(2.005), (I-052)+(1.072)+(2.006), (I-052)+(1.072)+(2.007), (I-052)+(1.072)+(2.008), (I-052)+(1.072)+(2.009), (I-052)+(1.072)+(2.010), (I-052)+(1.072)+(2.011), (I-052)+(1.072)+(2.012), (I-052)+(1.072)+(2.013), (I-052)+(1.072)+(2.014), (I-052)+(1.072)+(2.015), (I-052)+(1.072)+(2.016), (I-052)+(1.072)+(2.017), (I-052)+(1.072)+(2.018), (I-052)+(1.072)+(2.019), (I-052)+(1.072)+(2.020), (I-052)+(1.072)+(2.021), (I-052)+(1.072)+(2.022), (I-052)+(1.072)+(2.023), (I-052)+(1.072)+(2.024), (I-052)+(1.072)+(2.025), (I-052)+(1.072)+(2.026), (I-052)+(1.072)+(2.027), (I-052)+(1.072)+(2.028), (I-052)+(1.072)+(2.029), (I-052)+(1.072)+(2.030), (I-052)+(1.072)+(2.031), (I-052)+(1.072)+(2.032), (I-052)+(1.072)+(2.033), (I-052)+(1.072)+(2.034), (I-052)+(1.072)+(2.035), (I-052)+(1.072)+(2.036), (I-052)+(1.072)+(2.037), (I-052)+(1.072)+(2.038), (I-052)+(1.072)+(2.039), (I-052)+(1.072)+(2.040), (I-052)+(1.072)+(2.041), (I-052)+(1.072)+(2.042), (I-052)+(1.072)+(2.043), (I-052)+(1.072)+(2.044), (I-052)+(1.072)+(2.045), (I-052)+(1.072)+(2.046), (I-052)+(1.072)+(2.047), (I-052)+(1.072)+(2.048), (I-052)+(1.072)+(2.049), (I-052)+(1.072)+(2.050), (I-052)+(1.072)+(2.051), (I-052)+(1.072)+(2.052), (I-052)+(1.072)+(2.053), (I-052)+(1.072)+(2.054), (I-052)+(1.072)+(2.055), (I-052)+(1.072)+(2.056), (I-052)+(1.072)+(2.057), (I-052)+(1.072)+(2.058), (I-052)+(1.072)+(2.059), (I-052)+(1.072)+(3.001), (I-052)+(1.072)+(3.002), (I-052)+(1.072)+(3.003), (I-052)+(1.072)+(3.004), (I-052)+(1.072)+(3.005), (I-052)+(1.072)+(3.006), (I-052)+(1.072)+(3.007), (I-052)+(1.072)+(3.008), (I-052)+(1.072)+(3.009), (I-052)+(1.072)+(3.010), (I-052)+(1.072)+(3.011), (I-052)+(1.072)+(3.012), (I-052)+(1.072)+(3.013), (I-052)+(1.072)+(3.014), (I-052)+(1.072)+(3.015), (I-052)+(1.072)+(3.016), (I-052)+(1.072)+(3.017), (I-052)+(1.072)+(3.018), (I-052)+(1.072)+(3.019), (I-052)+(1.072)+(3.020), (I-052)+(1.072)+(3.021), (I-052)+(1.072)+(3.022), (I-052)+(1.072)+(3.023), (I-052)+(1.072)+(3.024), (I-052)+(1.072)+(3.025), (I-052)+(1.072)+(3.026), (I-052)+(1.072)+(3.027), (I-052)+(1.072)+(3.028), (I-052)+(1.072)+(3.029), (I-052)+(1.072)+(3.030), (I-052)+(1.072)+(3.031), (I-052)+(1.072)+(5.001), (I-052)+(1.072)+(5.002), (I-052)+(1.072)+(5.003), (I-052)+(1.072)+(5.004), (I-052)+(1.072)+(5.005), (I-052)+(1.072)+(5.006), (I-052)+(1.072)+(5.007), (I-052)+(1.072)+(5.008), (I-052)+(1.072)+(5.009), (I-052)+(1.072)+(5.010), (I-052)+(1.072)+(5.011), (I-052)+(1.072)+(5.012), (I-052)+(1.072)+(5.013), (I-052)+(1.072)+(5.014), (I-052)+(1.072)+(5.015), (I-052)+(1.072)+(5.016), (I-052)+(1.072)+(5.017), (I-052)+(1.072)+(5.018), (I-052)+(1.072)+(5.019), (I-052)+(1.072)+(5.020), (I-052)+(1.072)+(5.021), (I-052)+(1.072)+(5.022), (I-052)+(1.072)+(5.023), (I-052)+(1.072)+(6.001), (I-052)+(1.072)+(6.002), (I-052)+(1.072)+(6.003), (I-052)+(1.072)+(6.004), (I-052)+(1.072)+(7.001), (I-052)+(1.072)+(7.002), (I-052)+(1.072)+(7.003), (I-052)+(1.072)+(7.004), (I-052)+(1.072)+(7.005), (I-052)+(1.072)+(7.006), (I-052)+(1.072)+(9.001), (I-052)+(1.072)+(9.002), (I-052)+(1.072)+(9.003), (I-052)+(1.072)+(9.004), (I-052)+(1.072)+(9.005), (I-052)+(1.072)+(9.006), (I-052)+(1.072)+(9.007), (I-052)+(1.072)+(9.008), (I-052)+(1.072)+(9.009), (I-052)+(1.072)+(14.001), (I-052)+(1.072)+(14.002), (I-052)+(1.072)+(15.008), (I-052)+(1.072)+(15.011), (I-052)+(1.072)+(15.012), (I-052)+(1.072)+(15.016), (I-052)+(1.072)+(15.025), (I-052)+(1.072)+(15.027), (I-052)+(1.072)+(15.047), (I-052)+(1.072)+(15.063), (I-052)+(1.072)+(15.064), (I-052)+(1.072)+(16.001), (I-052)+(1.072)+(16.002), (I-052)+(1.072)+(16.003), (I-052)+(1.072)+(16.004), (I-052)+(1.072)+(16.005), (I-052)+(1.072)+(16.006), (I-052)+(1.072)+(16.007), (I-052)+(1.072)+(16.008), (I-052)+(1.072)+(17.001), (I-052)+(1.072)+(17.002), (I-052)+(1.072)+(17.003), (I-052)+(1.072)+(17.004), (I-052)+(1.072)+(17.005), (I-052)+(1.072)+(17.006), (I-052)+(1.072)+(17.007), (I-052)+(1.072)+(17.008), (I-052)+(1.072)+(17.009), (I-052)+(1.072)+(17.010), (I-052)+(1.072)+(17.011), (I-052)+(1.072)+(17.012), (I-052)+(1.072)+(18.001), (I-052)+(1.073)+(1.074), (I-052)+(1.073)+(1.075), (I-052)+(1.073)+(1.076), (I-052)+(1.073)+(1.077), (I-052)+(1.073)+(1.078), (I-052)+(1.073)+(1.079), (I-052)+(1.073)+(1.080), (I-052)+(1.073)+(1.081), (I-052)+(1.073)+(1.082), (I-052)+(1.073)+(1.083), (I-052)+(1.073)+(1.084), (I-052)+(1.073)+(1.085), (I-052)+(1.073)+(1.086), (I-052)+(1.073)+(1.087), (I-052)+(1.073)+(1.088), (I-052)+(1.073)+(1.089), (I-052)+(1.073)+(1.090), (I-052)+(1.073)+(1.091), (I-052)+(1.073)+(1.092), (I-052)+(1.073)+(2.001), (I-052)+(1.073)+(2.002), (I-052)+(1.073)+(2.003), (I-052)+(1.073)+(2.004), (I-052)+(1.073)+(2.005), (I-052)+(1.073)+(2.006), (I-052)+(1.073)+(2.007), (I-052)+(1.073)+(2.008), (I-052)+(1.073)+(2.009), (I-052)+(1.073)+(2.010), (I-052)+(1.073)+(2.011), (I-052)+(1.073)+(2.012), (I-052)+(1.073)+(2.013), (I-052)+(1.073)+(2.014), (I-052)+(1.073)+(2.015), (I-052)+(1.073)+(2.016), (I-052)+(1.073)+(2.017), (I-052)+(1.073)+(2.018), (I-052)+(1.073)+(2.019), (I-052)+(1.073)+(2.020), (I-052)+(1.073)+(2.021), (I-052)+(1.073)+(2.022), (I-052)+(1.073)+(2.023), (I-052)+(1.073)+(2.024), (I-052)+(1.073)+(2.025), (I-052)+(1.073)+(2.026), (I-052)+(1.073)+(2.027), (I-052)+(1.073)+(2.028), (I-052)+(1.073)+(2.029), (I-052)+(1.073)+(2.030), (I-052)+(1.073)+(2.031), (I-052)+(1.073)+(2.032), (I-052)+(1.073)+(2.033), (I-052)+(1.073)+(2.034), (I-052)+(1.073)+(2.035), (I-052)+(1.073)+(2.036), (I-052)+(1.073)+(2.037), (I-052)+(1.073)+(2.038), (I-052)+(1.073)+(2.039), (I-052)+(1.073)+(2.040), (I-052)+(1.073)+(2.041), (I-052)+(1.073)+(2.042), (I-052)+(1.073)+(2.043), (I-052)+(1.073)+(2.044), (I-052)+(1.073)+(2.045), (I-052)+(1.073)+(2.046), (I-052)+(1.073)+(2.047), (I-052)+(1.073)+(2.048), (I-052)+(1.073)+(2.049), (I-052)+(1.073)+(2.050), (I-052)+(1.073)+(2.051), (I-052)+(1.073)+(2.052), (I-052)+(1.073)+(2.053), (I-052)+(1.073)+(2.054), (I-052)+(1.073)+(2.055), (I-052)+(1.073)+(2.056), (I-052)+(1.073)+(2.057), (I-052)+(1.073)+(2.058), (I-052)+(1.073)+(2.059), (I-052)+(1.073)+(3.001), (I-052)+(1.073)+(3.002), (I-052)+(1.073)+(3.003), (I-052)+(1.073)+(3.004), (I-052)+(1.073)+(3.005), (I-052)+(1.073)+(3.006), (I-052)+(1.073)+(3.007), (I-052)+(1.073)+(3.008), (I-052)+(1.073)+(3.009), (I-052)+(1.073)+(3.010), (I-052)+(1.073)+(3.011), (I-052)+(1.073)+(3.012), (I-052)+(1.073)+(3.013), (I-052)+(1.073)+(3.014), (I-052)+(1.073)+(3.015), (I-052)+(1.073)+(3.016), (I-052)+(1.073)+(3.017), (I-052)+(1.073)+(3.018), (I-052)+(1.073)+(3.019), (I-052)+(1.073)+(3.020), (I-052)+(1.073)+(3.021), (I-052)+(1.073)+(3.022), (I-052)+(1.073)+(3.023), (I-052)+(1.073)+(3.024), (I-052)+(1.073)+(3.025), (I-052)+(1.073)+(3.026), (I-052)+(1.073)+(3.027), (I-052)+(1.073)+(3.028), (I-052)+(1.073)+(3.029), (I-052)+(1.073)+(3.030), (I-052)+(1.073)+(3.031), (I-052)+(1.073)+(5.001), (I-052)+(1.073)+(5.002), (I-052)+(1.073)+(5.003), (I-052)+(1.073)+(5.004), (I-052)+(1.073)+(5.005), (I-052)+(1.073)+(5.006), (I-052)+(1.073)+(5.007), (I-052)+(1.073)+(5.008), (I-052)+(1.073)+(5.009), (I-052)+(1.073)+(5.010), (I-052)+(1.073)+(5.011), (I-052)+(1.073)+(5.012), (I-052)+(1.073)+(5.013), (I-052)+(1.073)+(5.014), (I-052)+(1.073)+(5.015), (I-052)+(1.073)+(5.016), (I-052)+(1.073)+(5.017), (I-052)+(1.073)+(5.018), (I-052)+(1.073)+(5.019), (I-052)+(1.073)+(5.020), (I-052)+(1.073)+(5.021), (I-052)+(1.073)+(5.022), (I-052)+(1.073)+(5.023), (I-052)+(1.073)+(6.001), (I-052)+(1.073)+(6.002), (I-052)+(1.073)+(6.003), (I-052)+(1.073)+(6.004), (I-052)+(1.073)+(7.001), (I-052)+(1.073)+(7.002), (I-052)+(1.073)+(7.003), (I-052)+(1.073)+(7.004), (I-052)+(1.073)+(7.005), (I-052)+(1.073)+(7.006), (I-052)+(1.073)+(9.001), (I-052)+(1.073)+(9.002), (I-052)+(1.073)+(9.003), (I-052)+(1.073)+(9.004), (I-052)+(1.073)+(9.005), (I-052)+(1.073)+(9.006), (I-052)+(1.073)+(9.007), (I-052)+(1.073)+(9.008), (I-052)+(1.073)+(9.009), (I-052)+(1.073)+(14.001), (I-052)+(1.073)+(14.002), (I-052)+(1.073)+(15.008), (I-052)+(1.073)+(15.011), (I-052)+(1.073)+(15.012), (I-052)+(1.073)+(15.016), (I-052)+(1.073)+(15.025), (I-052)+(1.073)+(15.027), (I-052)+(1.073)+(15.047), (I-052)+(1.073)+(15.063), (I-052)+(1.073)+(15.064), (I-052)+(1.073)+(16.001), (I-052)+(1.073)+(16.002), (I-052)+(1.073)+(16.003), (I-052)+(1.073)+(16.004), (I-052)+(1.073)+(16.005), (I-052)+(1.073)+(16.006), (I-052)+(1.073)+(16.007), (I-052)+(1.073)+(16.008), (I-052)+(1.073)+(17.001), (I-052)+(1.073)+(17.002), (I-052)+(1.073)+(17.003), (I-052)+(1.073)+(17.004), (I-052)+(1.073)+(17.005), (I-052)+(1.073)+(17.006), (I-052)+(1.073)+(17.007), (I-052)+(1.073)+(17.008), (I-052)+(1.073)+(17.009), (I-052)+(1.073)+(17.010), (I-052)+(1.073)+(17.011), (I-052)+(1.073)+(17.012), (I-052)+(1.073)+(18.001), (I-052)+(1.074)+(1.075), (I-052)+(1.074)+(1.076), (I-052)+(1.074)+(1.077), (I-052)+(1.074)+(1.078), (I-052)+(1.074)+(1.079), (I-052)+(1.074)+(1.080), (I-052)+(1.074)+(1.081), (I-052)+(1.074)+(1.082), (I-052)+(1.074)+(1.083), (I-052)+(1.074)+(1.084), (I-052)+(1.074)+(1.085), (I-052)+(1.074)+(1.086), (I-052)+(1.074)+(1.087), (I-052)+(1.074)+(1.088), (I-052)+(1.074)+(1.089), (I-052)+(1.074)+(1.090), (I-052)+(1.074)+(1.091), (I-052)+(1.074)+(1.092), (I-052)+(1.074)+(2.001), (I-052)+(1.074)+(2.002), (I-052)+(1.074)+(2.003), (I-052)+(1.074)+(2.004), (I-052)+(1.074)+(2.005), (I-052)+(1.074)+(2.006), (I-052)+(1.074)+(2.007), (I-052)+(1.074)+(2.008), (I-052)+(1.074)+(2.009), (I-052)+(1.074)+(2.010), (I-052)+(1.074)+(2.011), (I-052)+(1.074)+(2.012), (I-052)+(1.074)+(2.013), (I-052)+(1.074)+(2.014), (I-052)+(1.074)+(2.015), (I-052)+(1.074)+(2.016), (I-052)+(1.074)+(2.017), (I-052)+(1.074)+(2.018), (I-052)+(1.074)+(2.019), (I-052)+(1.074)+(2.020), (I-052)+(1.074)+(2.021), (I-052)+(1.074)+(2.022), (I-052)+(1.074)+(2.023), (I-052)+(1.074)+(2.024), (I-052)+(1.074)+(2.025), (I-052)+(1.074)+(2.026), (I-052)+(1.074)+(2.027), (I-052)+(1.074)+(2.028), (I-052)+(1.074)+(2.029), (I-052)+(1.074)+(2.030), (I-052)+(1.074)+(2.031), (I-052)+(1.074)+(2.032), (I-052)+(1.074)+(2.033), (I-052)+(1.074)+(2.034), (I-052)+(1.074)+(2.035), (I-052)+(1.074)+(2.036), (I-052)+(1.074)+(2.037), (I-052)+(1.074)+(2.038), (I-052)+(1.074)+(2.039), (I-052)+(1.074)+(2.040), (I-052)+(1.074)+(2.041), (I-052)+(1.074)+(2.042), (I-052)+(1.074)+(2.043), (I-052)+(1.074)+(2.044), (I-052)+(1.074)+(2.045), (I-052)+(1.074)+(2.046), (I-052)+(1.074)+(2.047), (I-052)+(1.074)+(2.048), (I-052)+(1.074)+(2.049), (I-052)+(1.074)+(2.050), (I-052)+(1.074)+(2.051), (I-052)+(1.074)+(2.052), (I-052)+(1.074)+(2.053), (I-052)+(1.074)+(2.054), (I-052)+(1.074)+(2.055), (I-052)+(1.074)+(2.056), (I-052)+(1.074)+(2.057), (I-052)+(1.074)+(2.058), (I-052)+(1.074)+(2.059), (I-052)+(1.074)+(3.001), (I-052)+(1.074)+(3.002), (I-052)+(1.074)+(3.003), (I-052)+(1.074)+(3.004), (I-052)+(1.074)+(3.005), (I-052)+(1.074)+(3.006), (I-052)+(1.074)+(3.007), (I-052)+(1.074)+(3.008), (I-052)+(1.074)+(3.009), (I-052)+(1.074)+(3.010), (I-052)+(1.074)+(3.011), (I-052)+(1.074)+(3.012), (I-052)+(1.074)+(3.013), (I-052)+(1.074)+(3.014), (I-052)+(1.074)+(3.015), (I-052)+(1.074)+(3.016), (I-052)+(1.074)+(3.017), (I-052)+(1.074)+(3.018), (I-052)+(1.074)+(3.019), (I-052)+(1.074)+(3.020), (I-052)+(1.074)+(3.021), (I-052)+(1.074)+(3.022), (I-052)+(1.074)+(3.023), (I-052)+(1.074)+(3.024), (I-052)+(1.074)+(3.025), (I-052)+(1.074)+(3.026), (I-052)+(1.074)+(3.027), (I-052)+(1.074)+(3.028), (I-052)+(1.074)+(3.029), (I-052)+(1.074)+(3.030), (I-052)+(1.074)+(3.031), (I-052)+(1.074)+(5.001), (I-052)+(1.074)+(5.002), (I-052)+(1.074)+(5.003), (I-052)+(1.074)+(5.004), (I-052)+(1.074)+(5.005), (I-052)+(1.074)+(5.006), (I-052)+(1.074)+(5.007), (I-052)+(1.074)+(5.008), (I-052)+(1.074)+(5.009), (I-052)+(1.074)+(5.010), (I-052)+(1.074)+(5.011), (I-052)+(1.074)+(5.012), (I-052)+(1.074)+(5.013), (I-052)+(1.074)+(5.014), (I-052)+(1.074)+(5.015), (I-052)+(1.074)+(5.016), (I-052)+(1.074)+(5.017), (I-052)+(1.074)+(5.018), (I-052)+(1.074)+(5.019), (I-052)+(1.074)+(5.020), (I-052)+(1.074)+(5.021), (I-052)+(1.074)+(5.022), (I-052)+(1.074)+(5.023), (I-052)+(1.074)+(6.001), (I-052)+(1.074)+(6.002), (I-052)+(1.074)+(6.003), (I-052)+(1.074)+(6.004), (I-052)+(1.074)+(7.001), (I-052)+(1.074)+(7.002), (I-052)+(1.074)+(7.003), (I-052)+(1.074)+(7.004), (I-052)+(1.074)+(7.005), (I-052)+(1.074)+(7.006), (I-052)+(1.074)+(9.001), (I-052)+(1.074)+(9.002), (I-052)+(1.074)+(9.003), (I-052)+(1.074)+(9.004), (I-052)+(1.074)+(9.005), (I-052)+(1.074)+(9.006), (I-052)+(1.074)+(9.007), (I-052)+(1.074)+(9.008), (I-052)+(1.074)+(9.009), (I-052)+(1.074)+(14.001), (I-052)+(1.074)+(14.002), (I-052)+(1.074)+(15.008), (I-052)+(1.074)+(15.011), (I-052)+(1.074)+(15.012), (I-052)+(1.074)+(15.016), (I-052)+(1.074)+(15.025), (I-052)+(1.074)+(15.027), (I-052)+(1.074)+(15.047), (I-052)+(1.074)+(15.063), (I-052)+(1.074)+(15.064), (I-052)+(1.074)+(16.001), (I-052)+(1.074)+(16.002), (I-052)+(1.074)+(16.003), (I-052)+(1.074)+(16.004), (I-052)+(1.074)+(16.005), (I-052)+(1.074)+(16.006), (I-052)+(1.074)+(16.007), (I-052)+(1.074)+(16.008), (I-052)+(1.074)+(17.001), (I-052)+(1.074)+(17.002), (I-052)+(1.074)+(17.003), (I-052)+(1.074)+(17.004), (I-052)+(1.074)+(17.005), (I-052)+(1.074)+(17.006), (I-052)+(1.074)+(17.007), (I-052)+(1.074)+(17.008), (I-052)+(1.074)+(17.009), (I-052)+(1.074)+(17.010), (I-052)+(1.074)+(17.011), (I-052)+(1.074)+(17.012), (I-052)+(1.074)+(18.001), (I-052)+(1.075)+(1.076), (I-052)+(1.075)+(1.077), (I-052)+(1.075)+(1.078), (I-052)+(1.075)+(1.079), (I-052)+(1.075)+(1.080), (I-052)+(1.075)+(1.081), (I-052)+(1.075)+(1.082), (I-052)+(1.075)+(1.083), (I-052)+(1.075)+(1.084), (I-052)+(1.075)+(1.085), (I-052)+(1.075)+(1.086), (I-052)+(1.075)+(1.087), (I-052)+(1.075)+(1.088), (I-052)+(1.075)+(1.089), (I-052)+(1.075)+(1.090), (I-052)+(1.075)+(1.091), (I-052)+(1.075)+(1.092), (I-052)+(1.075)+(2.001), (I-052)+(1.075)+(2.002), (I-052)+(1.075)+(2.003), (I-052)+(1.075)+(2.004), (I-052)+(1.075)+(2.005), (I-052)+(1.075)+(2.006), (I-052)+(1.075)+(2.007), (I-052)+(1.075)+(2.008), (I-052)+(1.075)+(2.009), (I-052)+(1.075)+(2.010), (I-052)+(1.075)+(2.011), (I-052)+(1.075)+(2.012), (I-052)+(1.075)+(2.013), (I-052)+(1.075)+(2.014), (I-052)+(1.075)+(2.015), (I-052)+(1.075)+(2.016), (I-052)+(1.075)+(2.017), (I-052)+(1.075)+(2.018), (I-052)+(1.075)+(2.019), (I-052)+(1.075)+(2.020), (I-052)+(1.075)+(2.021), (I-052)+(1.075)+(2.022), (I-052)+(1.075)+(2.023), (I-052)+(1.075)+(2.024), (I-052)+(1.075)+(2.025), (I-052)+(1.075)+(2.026), (I-052)+(1.075)+(2.027), (I-052)+(1.075)+(2.028), (I-052)+(1.075)+(2.029), (I-052)+(1.075)+(2.030), (I-052)+(1.075)+(2.031), (I-052)+(1.075)+(2.032), (I-052)+(1.075)+(2.033), (I-052)+(1.075)+(2.034), (I-052)+(1.075)+(2.035), (I-052)+(1.075)+(2.036), (1-052)+(1.075)+(2.037), (I-052)+(1.075)+(2.038), (I-052)+(1.075)+(2.039), (I-052)+(1.075)+(2.040), (I-052)+(1.075)+(2.041), (I-052)+(1.075)+(2.042), (I-052)+(1.075)+(2.043), (I-052)+(1.075)+(2.044), (I-052)+(1.075)+(2.045), (I-052)+(1.075)+(2.046), (I-052)+(1.075)+(2.047), (I-052)+(1.075)+(2.048), (I-052)+(1.075)+(2.049), (I-052)+(1.075)+(2.050), (I-052)+(1.075)+(2.051), (I-052)+(1.075)+(2.052), (I-052)+(1.075)+(2.053), (I-052)+(1.075)+(2.054), (I-052)+(1.075)+(2.055), (I-052)+(1.075)+(2.056), (I-052)+(1.075)+(2.057), (I-052)+(1.075)+(2.058), (I-052)+(1.075)+(2.059), (I-052)+(1.075)+(3.001), (I-052)+(1.075)+(3.002), (I-052)+(1.075)+(3.003), (I-052)+(1.075)+(3.004), (I-052)+(1.075)+(3.005), (I-052)+(1.075)+(3.006), (I-052)+(1.075)+(3.007), (I-052)+(1.075)+(3.008), (I-052)+(1.075)+(3.009), (I-052)+(1.075)+(3.010), (I-052)+(1.075)+(3.011), (I-052)+(1.075)+(3.012), (I-052)+(1.075)+(3.013), (I-052)+(1.075)+(3.014), (I-052)+(1.075)+(3.015), (I-052)+(1.075)+(3.016), (I-052)+(1.075)+(3.017), (I-052)+(1.075)+(3.018), (I-052)+(1.075)+(3.019), (I-052)+(1.075)+(3.020), (I-052)+(1.075)+(3.021), (I-052)+(1.075)+(3.022), (I-052)+(1.075)+(3.023), (I-052)+(1.075)+(3.024), (I-052)+(1.075)+(3.025), (I-052)+(1.075)+(3.026), (I-052)+(1.075)+(3.027), (I-052)+(1.075)+(3.028), (I-052)+(1.075)+(3.029), (I-052)+(1.075)+(3.030), (I-052)+(1.075)+(3.031), (I-052)+(1.075)+(5.001), (I-052)+(1.075)+(5.002), (I-052)+(1.075)+(5.003), (I-052)+(1.075)+(5.004), (I-052)+(1.075)+(5.005), (I-052)+(1.075)+(5.006), (I-052)+(1.075)+(5.007), (I-052)+(1.075)+(5.008), (I-052)+(1.075)+(5.009), (I-052)+(1.075)+(5.010), (I-052)+(1.075)+(5.011), (I-052)+(1.075)+(5.012), (I-052)+(1.075)+(5.013), (I-052)+(1.075)+(5.014), (I-052)+(1.075)+(5.015), (I-052)+(1.075)+(5.016), (I-052)+(1.075)+(5.017), (I-052)+(1.075)+(5.018), (I-052)+(1.075)+(5.019), (I-052)+(1.075)+(5.020), (I-052)+(1.075)+(5.021), (I-052)+(1.075)+(5.022), (I-052)+(1.075)+(5.023), (I-052)+(1.075)+(6.001), (I-052)+(1.075)+(6.002), (I-052)+(1.075)+(6.003), (I-052)+(1.075)+(6.004), (I-052)+(1.075)+(7.001), (I-052)+(1.075)+(7.002), (I-052)+(1.075)+(7.003), (I-052)+(1.075)+(7.004), (I-052)+(1.075)+(7.005), (I-052)+(1.075)+(7.006), (I-052)+(1.075)+(9.001), (I-052)+(1.075)+(9.002), (I-052)+(1.075)+(9.003), (I-052)+(1.075)+(9.004), (I-052)+(1.075)+(9.005), (I-052)+(1.075)+(9.006), (I-052)+(1.075)+(9.007), (I-052)+(1.075)+(9.008), (I-052)+(1.075)+(9.009), (I-052)+(1.075)+(14.001), (I-052)+(1.075)+(14.002), (I-052)+(1.075)+(15.008), (I-052)+(1.075)+(15.011), (I-052)+(1.075)+(15.012), (I-052)+(1.075)+(15.016), (I-052)+(1.075)+(15.025), (I-052)+(1.075)+(15.027), (I-052)+(1.075)+(15.047), (I-052)+(1.075)+(15.063), (I-052)+(1.075)+(15.064), (I-052)+(1.075)+(16.001), (I-052)+(1.075)+(16.002), (I-052)+(1.075)+(16.003), (I-052)+(1.075)+(16.004), (I-052)+(1.075)+(16.005), (I-052)+(1.075)+(16.006), (I-052)+(1.075)+(16.007), (I-052)+(1.075)+(16.008), (I-052)+(1.075)+(17.001), (I-052)+(1.075)+(17.002), (I-052)+(1.075)+(17.003), (I-052)+(1.075)+(17.004), (I-052)+(1.075)+(17.005), (I-052)+(1.075)+(17.006), (I-052)+(1.075)+(17.007), (I-052)+(1.075)+(17.008), (I-052)+(1.075)+(17.009), (I-052)+(1.075)+(17.010), (I-052)+(1.075)+(17.011), (I-052)+(1.075)+(17.012), (I-052)+(1.075)+(18.001), (I-052)+(1.076)+(1.077), (I-052)+(1.076)+(1.078), (I-052)+(1.076)+(1.079), (I-052)+(1.076)+(1.080), (I-052)+(1.076)+(1.081), (I-052)+(1.076)+(1.082), (I-052)+(1.076)+(1.083), (I-052)+(1.076)+(1.084), (I-052)+(1.076)+(1.085), (I-052)+(1.076)+(1.086), (I-052)+(1.076)+(1.087), (I-052)+(1.076)+(1.088), (I-052)+(1.076)+(1.089), (I-052)+(1.076)+(1.090), (I-052)+(1.076)+(1.091), (I-052)+(1.076)+(1.092), (I-052)+(1.076)+(2.001), (I-052)+(1.076)+(2.002), (I-052)+(1.076)+(2.003), (I-052)+(1.076)+(2.004), (I-052)+(1.076)+(2.005), (I-052)+(1.076)+(2.006), (I-052)+(1.076)+(2.007), (I-052)+(1.076)+(2.008), (I-052)+(1.076)+(2.009), (I-052)+(1.076)+(2.010), (I-052)+(1.076)+(2.011), (I-052)+(1.076)+(2.012), (I-052)+(1.076)+(2.013), (I-052)+(1.076)+(2.014), (I-052)+(1.076)+(2.015), (I-052)+(1.076)+(2.016), (I-052)+(1.076)+(2.017), (I-052)+(1.076)+(2.018), (I-052)+(1.076)+(2.019), (I-052)+(1.076)+(2.020), (I-052)+(1.076)+(2.021), (I-052)+(1.076)+(2.022), (I-052)+(1.076)+(2.023), (I-052)+(1.076)+(2.024), (I-052)+(1.076)+(2.025), (I-052)+(1.076)+(2.026), (I-052)+(1.076)+(2.027), (I-052)+(1.076)+(2.028), (I-052)+(1.076)+(2.029), (I-052)+(1.076)+(2.030), (I-052)+(1.076)+(2.031), (I-052)+(1.076)+(2.032), (I-052)+(1.076)+(2.033), (I-052)+(1.076)+(2.034), (I-052)+(1.076)+(2.035), (I-052)+(1.076)+(2.036), (I-052)+(1.076)+(2.037), (I-052)+(1.076)+(2.038), (I-052)+(1.076)+(2.039), (I-052)+(1.076)+(2.040), (I-052)+(1.076)+(2.041), (I-052)+(1.076)+(2.042), (I-052)+(1.076)+(2.043), (I-052)+(1.076)+(2.044), (I-052)+(1.076)+(2.045), (I-052)+(1.076)+(2.046), (I-052)+(1.076)+(2.047), (I-052)+(1.076)+(2.048), (I-052)+(1.076)+(2.049), (I-052)+(1.076)+(2.050), (I-052)+(1.076)+(2.051), (I-052)+(1.076)+(2.052), (I-052)+(1.076)+(2.053), (I-052)+(1.076)+(2.054), (I-052)+(1.076)+(2.055), (I-052)+(1.076)+(2.056), (I-052)+(1.076)+(2.057), (I-052)+(1.076)+(2.058), (I-052)+(1.076)+(2.059), (I-052)+(1.076)+(3.001), (I-052)+(1.076)+(3.002), (I-052)+(1.076)+(3.003), (I-052)+(1.076)+(3.004), (I-052)+(1.076)+(3.005), (I-052)+(1.076)+(3.006), (I-052)+(1.076)+(3.007), (I-052)+(1.076)+(3.008), (I-052)+(1.076)+(3.009), (I-052)+(1.076)+(3.010), (I-052)+(1.076)+(3.011), (I-052)+(1.076)+(3.012), (I-052)+(1.076)+(3.013), (I-052)+(1.076)+(3.014), (I-052)+(1.076)+(3.015), (I-052)+(1.076)+(3.016), (I-052)+(1.076)+(3.017), (I-052)+(1.076)+(3.018), (I-052)+(1.076)+(3.019), (I-052)+(1.076)+(3.020), (I-052)+(1.076)+(3.021), (I-052)+(1.076)+(3.022), (I-052)+(1.076)+(3.023), (I-052)+(1.076)+(3.024), (I-052)+(1.076)+(3.025), (I-052)+(1.076)+(3.026), (I-052)+(1.076)+(3.027), (I-052)+(1.076)+(3.028), (I-052)+(1.076)+(3.029), (I-052)+(1.076)+(3.030), (I-052)+(1.076)+(3.031), (I-052)+(1.076)+(5.001), (I-052)+(1.076)+(5.002), (I-052)+(1.076)+(5.003), (I-052)+(1.076)+(5.004), (I-052)+(1.076)+(5.005), (I-052)+(1.076)+(5.006), (I-052)+(1.076)+(5.007), (I-052)+(1.076)+(5.008), (I-052)+(1.076)+(5.009), (I-052)+(1.076)+(5.010), (I-052)+(1.076)+(5.011), (I-052)+(1.076)+(5.012), (I-052)+(1.076)+(5.013), (I-052)+(1.076)+(5.014), (I-052)+(1.076)+(5.015), (I-052)+(1.076)+(5.016), (I-052)+(1.076)+(5.017), (I-052)+(1.076)+(5.018), (I-052)+(1.076)+(5.019), (I-052)+(1.076)+(5.020), (I-052)+(1.076)+(5.021), (I-052)+(1.076)+(5.022), (I-052)+(1.076)+(5.023), (I-052)+(1.076)+(6.001), (I-052)+(1.076)+(6.002), (I-052)+(1.076)+(6.003), (I-052)+(1.076)+(6.004), (I-052)+(1.076)+(7.001), (I-052)+(1.076)+(7.002), (I-052)+(1.076)+(7.003), (I-052)+(1.076)+(7.004), (I-052)+(1.076)+(7.005), (I-052)+(1.076)+(7.006), (I-052)+(1.076)+(9.001), (I-052)+(1.076)+(9.002), (I-052)+(1.076)+(9.003), (I-052)+(1.076)+(9.004), (I-052)+(1.076)+(9.005), (I-052)+(1.076)+(9.006), (I-052)+(1.076)+(9.007), (I-052)+(1.076)+(9.008), (I-052)+(1.076)+(9.009), (I-052)+(1.076)+(14.001), (I-052)+(1.076)+(14.002), (I-052)+(1.076)+(15.008), (I-052)+(1.076)+(15.011), (I-052)+(1.076)+(15.012), (I-052)+(1.076)+(15.016), (I-052)+(1.076)+(15.025), (I-052)+(1.076)+(15.027), (I-052)+(1.076)+(15.047), (I-052)+(1.076)+(15.063), (I-052)+(1.076)+(15.064), (I-052)+(1.076)+(16.001), (I-052)+(1.076)+(16.002), (I-052)+(1.076)+(16.003), (I-052)+(1.076)+(16.004), (I-052)+(1.076)+(16.005), (I-052)+(1.076)+(16.006), (I-052)+(1.076)+(16.007), (I-052)+(1.076)+(16.008), (I-052)+(1.076)+(17.001), (I-052)+(1.076)+(17.002), (I-052)+(1.076)+(17.003), (I-052)+(1.076)+(17.004), (I-052)+(1.076)+(17.005), (I-052)+(1.076)+(17.006), (I-052)+(1.076)+(17.007), (I-052)+(1.076)+(17.008), (I-052)+(1.076)+(17.009), (I-052)+(1.076)+(17.010), (I-052)+(1.076)+(17.011), (I-052)+(1.076)+(17.012), (I-052)+(1.076)+(18.001), (I-052)+(1.077)+(1.078), (I-052)+(1.077)+(1.079), (I-052)+(1.077)+(1.080), (I-052)+(1.077)+(1.081), (I-052)+(1.077)+(1.082), (I-052)+(1.077)+(1.083), (I-052)+(1.077)+(1.084), (I-052)+(1.077)+(1.085), (I-052)+(1.077)+(1.086), (I-052)+(1.077)+(1.087), (I-052)+(1.077)+(1.088), (I-052)+(1.077)+(1.089), (I-052)+(1.077)+(1.090), (I-052)+(1.077)+(1.091), (I-052)+(1.077)+(1.092), (I-052)+(1.077)+(2.001), (I-052)+(1.077)+(2.002), (I-052)+(1.077)+(2.003), (I-052)+(1.077)+(2.004), (I-052)+(1.077)+(2.005), (I-052)+(1.077)+(2.006), (I-052)+(1.077)+(2.007), (I-052)+(1.077)+(2.008), (I-052)+(1.077)+(2.009), (I-052)+(1.077)+(2.010), (I-052)+(1.077)+(2.011), (I-052)+(1.077)+(2.012), (I-052)+(1.077)+(2.013), (I-052)+(1.077)+(2.014), (I-052)+(1.077)+(2.015), (I-052)+(1.077)+(2.016), (I-052)+(1.077)+(2.017), (I-052)+(1.077)+(2.018), (I-052)+(1.077)+(2.019), (I-052)+(1.077)+(2.020), (I-052)+(1.077)+(2.021), (I-052)+(1.077)+(2.022), (I-052)+(1.077)+(2.023), (I-052)+(1.077)+(2.024), (I-052)+(1.077)+(2.025), (I-052)+(1.077)+(2.026), (I-052)+(1.077)+(2.027), (I-052)+(1.077)+(2.028), (I-052)+(1.077)+(2.029), (I-052)+(1.077)+(2.030), (I-052)+(1.077)+(2.031), (I-052)+(1.077)+(2.032), (I-052)+(1.077)+(2.033), (I-052)+(1.077)+(2.034), (I-052)+(1.077)+(2.035), (I-052)+(1.077)+(2.036), (I-052)+(1.077)+(2.037), (I-052)+(1.077)+(2.038), (I-052)+(1.077)+(2.039), (I-052)+(1.077)+(2.040), (I-052)+(1.077)+(2.041), (I-052)+(1.077)+(2.042), (I-052)+(1.077)+(2.043), (I-052)+(1.077)+(2.044), (I-052)+(1.077)+(2.045), (I-052)+(1.077)+(2.046), (I-052)+(1.077)+(2.047), (I-052)+(1.077)+(2.048), (I-052)+(1.077)+(2.049), (I-052)+(1.077)+(2.050), (I-052)+(1.077)+(2.051), (I-052)+(1.077)+(2.052), (I-052)+(1.077)+(2.053), (I-052)+(1.077)+(2.054), (I-052)+(1.077)+(2.055), (I-052)+(1.077)+(2.056), (I-052)+(1.077)+(2.057), (I-052)+(1.077)+(2.058), (I-052)+(1.077)+(2.059), (I-052)+(1.077)+(3.001), (I-052)+(1.077)+(3.002), (I-052)+(1.077)+(3.003), (I-052)+(1.077)+(3.004), (I-052)+(1.077)+(3.005), (I-052)+(1.077)+(3.006), (I-052)+(1.077)+(3.007), (I-052)+(1.077)+(3.008), (I-052)+(1.077)+(3.009), (I-052)+(1.077)+(3.010), (I-052)+(1.077)+(3.011), (I-052)+(1.077)+(3.012), (I-052)+(1.077)+(3.013), (I-052)+(1.077)+(3.014), (I-052)+(1.077)+(3.015), (I-052)+(1.077)+(3.016), (I-052)+(1.077)+(3.017), (I-052)+(1.077)+(3.018), (I-052)+(1.077)+(3.019), (I-052)+(1.077)+(3.020), (I-052)+(1.077)+(3.021), (I-052)+(1.077)+(3.022), (I-052)+(1.077)+(3.023), (I-052)+(1.077)+(3.024), (I-052)+(1.077)+(3.025), (I-052)+(1.077)+(3.026), (I-052)+(1.077)+(3.027), (I-052)+(1.077)+(3.028), (I-052)+(1.077)+(3.029), (I-052)+(1.077)+(3.030), (I-052)+(1.077)+(3.031), (I-052)+(1.077)+(5.001), (I-052)+(1.077)+(5.002), (I-052)+(1.077)+(5.003), (I-052)+(1.077)+(5.004), (I-052)+(1.077)+(5.005), (I-052)+(1.077)+(5.006), (I-052)+(1.077)+(5.007), (I-052)+(1.077)+(5.008), (I-052)+(1.077)+(5.009), (I-052)+(1.077)+(5.010), (I-052)+(1.077)+(5.011), (I-052)+(1.077)+(5.012), (I-052)+(1.077)+(5.013), (I-052)+(1.077)+(5.014), (I-052)+(1.077)+(5.015), (I-052)+(1.077)+(5.016), (I-052)+(1.077)+(5.017), (I-052)+(1.077)+(5.018), (I-052)+(1.077)+(5.019), (I-052)+(1.077)+(5.020), (I-052)+(1.077)+(5.021), (I-052)+(1.077)+(5.022), (I-052)+(1.077)+(5.023), (I-052)+(1.077)+(6.001), (I-052)+(1.077)+(6.002), (I-052)+(1.077)+(6.003), (I-052)+(1.077)+(6.004), (I-052)+(1.077)+(7.001), (I-052)+(1.077)+(7.002), (I-052)+(1.077)+(7.003), (I-052)+(1.077)+(7.004), (I-052)+(1.077)+(7.005), (I-052)+(1.077)+(7.006), (I-052)+(1.077)+(9.001), (I-052)+(1.077)+(9.002), (I-052)+(1.077)+(9.003), (I-052)+(1.077)+(9.004), (I-052)+(1.077)+(9.005), (I-052)+(1.077)+(9.006), (I-052)+(1.077)+(9.007), (I-052)+(1.077)+(9.008), (I-052)+(1.077)+(9.009), (I-052)+(1.077)+(14.001), (I-052)+(1.077)+(14.002), (I-052)+(1.077)+(15.008), (I-052)+(1.077)+(15.011), (I-052)+(1.077)+(15.012), (I-052)+(1.077)+(15.016), (I-052)+(1.077)+(15.025), (I-052)+(1.077)+(15.027), (I-052)+(1.077)+(15.047), (I-052)+(1.077)+(15.063), (I-052)+(1.077)+(15.064), (I-052)+(1.077)+(16.001), (I-052)+(1.077)+(16.002), (I-052)+(1.077)+(16.003), (I-052)+(1.077)+(16.004), (I-052)+(1.077)+(16.005), (I-052)+(1.077)+(16.006), (I-052)+(1.077)+(16.007), (I-052)+(1.077)+(16.008), (I-052)+(1.077)+(17.001), (I-052)+(1.077)+(17.002), (I-052)+(1.077)+(17.003), (I-052)+(1.077)+(17.004), (I-052)+(1.077)+(17.005), (I-052)+(1.077)+(17.006), (I-052)+(1.077)+(17.007), (I-052)+(1.077)+(17.008), (I-052)+(1.077)+(17.009), (I-052)+(1.077)+(17.010), (I-052)+(1.077)+(17.011), (I-052)+(1.077)+(17.012), (I-052)+(1.077)+(18.001), (I-052)+(1.078)+(1.079), (I-052)+(1.078)+(1.080), (I-052)+(1.078)+(1.081), (I-052)+(1.078)+(1.082), (I-052)+(1.078)+(1.083), (I-052)+(1.078)+(1.084), (I-052)+(1.078)+(1.085), (I-052)+(1.078)+(1.086), (I-052)+(1.078)+(1.087), (I-052)+(1.078)+(1.088), (I-052)+(1.078)+(1.089), (I-052)+(1.078)+(1.090), (I-052)+(1.078)+(1.091), (I-052)+(1.078)+(1.092), (I-052)+(1.078)+(2.001), (I-052)+(1.078)+(2.002), (I-052)+(1.078)+(2.003), (I-052)+(1.078)+(2.004), (I-052)+(1.078)+(2.005), (I-052)+(1.078)+(2.006), (I-052)+(1.078)+(2.007), (I-052)+(1.078)+(2.008), (I-052)+(1.078)+(2.009), (I-052)+(1.078)+(2.010), (I-052)+(1.078)+(2.011), (I-052)+(1.078)+(2.012), (I-052)+(1.078)+(2.013), (I-052)+(1.078)+(2.014), (I-052)+(1.078)+(2.015), (I-052)+(1.078)+(2.016), (I-052)+(1.078)+(2.017), (I-052)+(1.078)+(2.018), (I-052)+(1.078)+(2.019), (I-052)+(1.078)+(2.020), (I-052)+(1.078)+(2.021), (I-052)+(1.078)+(2.022), (I-052)+(1.078)+(2.023), (I-052)+(1.078)+(2.024), (I-052)+(1.078)+(2.025), (I-052)+(1.078)+(2.026), (I-052)+(1.078)+(2.027), (I-052)+(1.078)+(2.028), (I-052)+(1.078)+(2.029), (I-052)+(1.078)+(2.030), (I-052)+(1.078)+(2.031), (I-052)+(1.078)+(2.032), (I-052)+(1.078)+(2.033), (I-052)+(1.078)+(2.034), (I-052)+(1.078)+(2.035), (I-052)+(1.078)+(2.036), (I-052)+(1.078)+(2.037), (I-052)+(1.078)+(2.038), (I-052)+(1.078)+(2.039), (I-052)+(1.078)+(2.040), (I-052)+(1.078)+(2.041), (I-052)+(1.078)+(2.042), (I-052)+(1.078)+(2.043), (I-052)+(1.078)+(2.044), (I-052)+(1.078)+(2.045), (I-052)+(1.078)+(2.046), (I-052)+(1.078)+(2.047), (I-052)+(1.078)+(2.048), (I-052)+(1.078)+(2.049), (I-052)+(1.078)+(2.050), (I-052)+(1.078)+(2.051), (I-052)+(1.078)+(2.052), (I-052)+(1.078)+(2.053), (I-052)+(1.078)+(2.054), (I-052)+(1.078)+(2.055), (I-052)+(1.078)+(2.056), (I-052)+(1.078)+(2.057), (I-052)+(1.078)+(2.058), (I-052)+(1.078)+(2.059), (I-052)+(1.078)+(3.001), (I-052)+(1.078)+(3.002), (I-052)+(1.078)+(3.003), (I-052)+(1.078)+(3.004), (I-052)+(1.078)+(3.005), (I-052)+(1.078)+(3.006), (I-052)+(1.078)+(3.007), (I-052)+(1.078)+(3.008), (I-052)+(1.078)+(3.009), (I-052)+(1.078)+(3.010), (I-052)+(1.078)+(3.011), (I-052)+(1.078)+(3.012), (I-052)+(1.078)+(3.013), (I-052)+(1.078)+(3.014), (I-052)+(1.078)+(3.015), (I-052)+(1.078)+(3.016), (I-052)+(1.078)+(3.017), (I-052)+(1.078)+(3.018), (I-052)+(1.078)+(3.019), (I-052)+(1.078)+(3.020), (I-052)+(1.078)+(3.021), (I-052)+(1.078)+(3.022), (I-052)+(1.078)+(3.023), (I-052)+(1.078)+(3.024), (I-052)+(1.078)+(3.025), (I-052)+(1.078)+(3.026), (I-052)+(1.078)+(3.027), (I-052)+(1.078)+(3.028), (I-052)+(1.078)+(3.029), (I-052)+(1.078)+(3.030), (I-052)+(1.078)+(3.031), (I-052)+(1.078)+(5.001), (I-052)+(1.078)+(5.002), (I-052)+(1.078)+(5.003), (I-052)+(1.078)+(5.004), (I-052)+(1.078)+(5.005), (I-052)+(1.078)+(5.006), (I-052)+(1.078)+(5.007), (I-052)+(1.078)+(5.008), (I-052)+(1.078)+(5.009), (I-052)+(1.078)+(5.010), (I-052)+(1.078)+(5.011), (I-052)+(1.078)+(5.012), (I-052)+(1.078)+(5.013), (I-052)+(1.078)+(5.014), (I-052)+(1.078)+(5.015), (I-052)+(1.078)+(5.016), (I-052)+(1.078)+(5.017), (I-052)+(1.078)+(5.018), (I-052)+(1.078)+(5.019), (I-052)+(1.078)+(5.020), (I-052)+(1.078)+(5.021), (I-052)+(1.078)+(5.022), (I-052)+(1.078)+(5.023), (I-052)+(1.078)+(6.001), (I-052)+(1.078)+(6.002), (I-052)+(1.078)+(6.003), (I-052)+(1.078)+(6.004), (I-052)+(1.078)+(7.001), (I-052)+(1.078)+(7.002), (I-052)+(1.078)+(7.003), (I-052)+(1.078)+(7.004), (I-052)+(1.078)+(7.005), (I-052)+(1.078)+(7.006), (I-052)+(1.078)+(9.001), (I-052)+(1.078)+(9.002), (I-052)+(1.078)+(9.003), (I-052)+(1.078)+(9.004), (I-052)+(1.078)+(9.005), (I-052)+(1.078)+(9.006), (I-052)+(1.078)+(9.007), (I-052)+(1.078)+(9.008), (I-052)+(1.078)+(9.009), (I-052)+(1.078)+(14.001), (I-052)+(1.078)+(14.002), (I-052)+(1.078)+(15.008), (I-052)+(1.078)+(15.011), (I-052)+(1.078)+(15.012), (I-052)+(1.078)+(15.016), (I-052)+(1.078)+(15.025), (I-052)+(1.078)+(15.027), (I-052)+(1.078)+(15.047), (I-052)+(1.078)+(15.063), (I-052)+(1.078)+(15.064), (I-052)+(1.078)+(16.001), (I-052)+(1.078)+(16.002), (I-052)+(1.078)+(16.003), (I-052)+(1.078)+(16.004), (I-052)+(1.078)+(16.005), (I-052)+(1.078)+(16.006), (I-052)+(1.078)+(16.007), (I-052)+(1.078)+(16.008), (I-052)+(1.078)+(17.001), (I-052)+(1.078)+(17.002), (I-052)+(1.078)+(17.003), (I-052)+(1.078)+(17.004), (I-052)+(1.078)+(17.005), (I-052)+(1.078)+(17.006), (I-052)+(1.078)+(17.007), (I-052)+(1.078)+(17.008), (I-052)+(1.078)+(17.009), (I-052)+(1.078)+(17.010), (I-052)+(1.078)+(17.011), (I-052)+(1.078)+(17.012), (I-052)+(1.078)+(18.001), (I-052)+(1.079)+(1.080), (I-052)+(1.079)+(1.081), (I-052)+(1.079)+(1.082), (I-052)+(1.079)+(1.083), (I-052)+(1.079)+(1.084), (I-052)+(1.079)+(1.085), (I-052)+(1.079)+(1.086), (I-052)+(1.079)+(1.087), (I-052)+(1.079)+(1.088), (I-052)+(1.079)+(1.089), (I-052)+(1.079)+(1.090), (I-052)+(1.079)+(1.091), (I-052)+(1.079)+(1.092), (I-052)+(1.079)+(2.001), (I-052)+(1.079)+(2.002), (I-052)+(1.079)+(2.003), (I-052)+(1.079)+(2.004), (I-052)+(1.079)+(2.005), (I-052)+(1.079)+(2.006), (I-052)+(1.079)+(2.007), (I-052)+(1.079)+(2.008), (I-052)+(1.079)+(2.009), (I-052)+(1.079)+(2.010), (I-052)+(1.079)+(2.011), (I-052)+(1.079)+(2.012), (I-052)+(1.079)+(2.013), (I-052)+(1.079)+(2.014), (I-052)+(1.079)+(2.015), (I-052)+(1.079)+(2.016), (I-052)+(1.079)+(2.017), (I-052)+(1.079)+(2.018), (I-052)+(1.079)+(2.019), (I-052)+(1.079)+(2.020), (I-052)+(1.079)+(2.021), (I-052)+(1.079)+(2.022), (I-052)+(1.079)+(2.023), (I-052)+(1.079)+(2.024), (I-052)+(1.079)+(2.025), (I-052)+(1.079)+(2.026), (I-052)+(1.079)+(2.027), (I-052)+(1.079)+(2.028), (I-052)+(1.079)+(2.029), (I-052)+(1.079)+(2.030), (I-052)+(1.079)+(2.031), (I-052)+(1.079)+(2.032), (I-052)+(1.079)+(2.033), (I-052)+(1.079)+(2.034), (I-052)+(1.079)+(2.035), (I-052)+(1.079)+(2.036), (I-052)+(1.079)+(2.037), (I-052)+(1.079)+(2.038), (I-052)+(1.079)+(2.039), (I-052)+(1.079)+(2.040), (I-052)+(1.079)+(2.041), (I-052)+(1.079)+(2.042), (I-052)+(1.079)+(2.043), (I-052)+(1.079)+(2.044), (I-052)+(1.079)+(2.045), (I-052)+(1.079)+(2.046), (I-052)+(1.079)+(2.047), (I-052)+(1.079)+(2.048), (I-052)+(1.079)+(2.049), (I-052)+(1.079)+(2.050), (I-052)+(1.079)+(2.051), (I-052)+(1.079)+(2.052), (I-052)+(1.079)+(2.053), (I-052)+(1.079)+(2.054), (I-052)+(1.079)+(2.055), (I-052)+(1.079)+(2.056), (I-052)+(1.079)+(2.057), (I-052)+(1.079)+(2.058), (I-052)+(1.079)+(2.059), (I-052)+(1.079)+(3.001), (I-052)+(1.079)+(3.002), (I-052)+(1.079)+(3.003), (I-052)+(1.079)+(3.004), (I-052)+(1.079)+(3.005), (I-052)+(1.079)+(3.006), (I-052)+(1.079)+(3.007), (I-052)+(1.079)+(3.008), (I-052)+(1.079)+(3.009), (I-052)+(1.079)+(3.010), (I-052)+(1.079)+(3.011), (I-052)+(1.079)+(3.012), (I-052)+(1.079)+(3.013), (I-052)+(1.079)+(3.014), (I-052)+(1.079)+(3.015), (I-052)+(1.079)+(3.016), (I-052)+(1.079)+(3.017), (I-052)+(1.079)+(3.018), (I-052)+(1.079)+(3.019), (I-052)+(1.079)+(3.020), (I-052)+(1.079)+(3.021), (I-052)+(1.079)+(3.022), (I-052)+(1.079)+(3.023), (I-052)+(1.079)+(3.024), (I-052)+(1.079)+(3.025), (I-052)+(1.079)+(3.026), (I-052)+(1.079)+(3.027), (I-052)+(1.079)+(3.028), (I-052)+(1.079)+(3.029), (I-052)+(1.079)+(3.030), (I-052)+(1.079)+(3.031), (I-052)+(1.079)+(5.001), (I-052)+(1.079)+(5.002), (I-052)+(1.079)+(5.003), (I-052)+(1.079)+(5.004), (I-052)+(1.079)+(5.005), (I-052)+(1.079)+(5.006), (I-052)+(1.079)+(5.007), (I-052)+(1.079)+(5.008), (I-052)+(1.079)+(5.009), (I-052)+(1.079)+(5.010), (I-052)+(1.079)+(5.011), (I-052)+(1.079)+(5.012), (I-052)+(1.079)+(5.013), (I-052)+(1.079)+(5.014), (I-052)+(1.079)+(5.015), (I-052)+(1.079)+(5.016), (I-052)+(1.079)+(5.017), (I-052)+(1.079)+(5.018), (I-052)+(1.079)+(5.019), (I-052)+(1.079)+(5.020), (I-052)+(1.079)+(5.021), (I-052)+(1.079)+(5.022), (I-052)+(1.079)+(5.023), (I-052)+(1.079)+(6.001), (I-052)+(1.079)+(6.002), (I-052)+(1.079)+(6.003), (I-052)+(1.079)+(6.004), (I-052)+(1.079)+(7.001), (I-052)+(1.079)+(7.002), (I-052)+(1.079)+(7.003), (I-052)+(1.079)+(7.004), (I-052)+(1.079)+(7.005), (I-052)+(1.079)+(7.006), (I-052)+(1.079)+(9.001), (I-052)+(1.079)+(9.002), (I-052)+(1.079)+(9.003), (I-052)+(1.079)+(9.004), (I-052)+(1.079)+(9.005), (I-052)+(1.079)+(9.006), (I-052)+(1.079)+(9.007), (I-052)+(1.079)+(9.008), (I-052)+(1.079)+(9.009), (I-052)+(1.079)+(14.001), (I-052)+(1.079)+(14.002), (I-052)+(1.079)+(15.008), (I-052)+(1.079)+(15.011), (I-052)+(1.079)+(15.012), (I-052)+(1.079)+(15.016), (I-052)+(1.079)+(15.025), (I-052)+(1.079)+(15.027), (I-052)+(1.079)+(15.047), (I-052)+(1.079)+(15.063), (I-052)+(1.079)+(15.064), (I-052)+(1.079)+(16.001), (I-052)+(1.079)+(16.002), (I-052)+(1.079)+(16.003), (I-052)+(1.079)+(16.004), (I-052)+(1.079)+(16.005), (I-052)+(1.079)+(16.006), (I-052)+(1.079)+(16.007), (I-052)+(1.079)+(16.008), (I-052)+(1.079)+(17.001), (I-052)+(1.079)+(17.002), (I-052)+(1.079)+(17.003), (I-052)+(1.079)+(17.004), (I-052)+(1.079)+(17.005), (I-052)+(1.079)+(17.006), (I-052)+(1.079)+(17.007), (I-052)+(1.079)+(17.008), (I-052)+(1.079)+(17.009), (I-052)+(1.079)+(17.010), (I-052)+(1.079)+(17.011), (I-052)+(1.079)+(17.012), (I-052)+(1.079)+(18.001), (I-052)+(1.080)+(1.081), (I-052)+(1.080)+(1.082), (I-052)+(1.080)+(1.083), (I-052)+(1.080)+(1.084), (I-052)+(1.080)+(1.085), (I-052)+(1.080)+(1.086), (I-052)+(1.080)+(1.087), (I-052)+(1.080)+(1.088), (I-052)+(1.080)+(1.089), (I-052)+(1.080)+(1.090), (I-052)+(1.080)+(1.091), (I-052)+(1.080)+(1.092), (I-052)+(1.080)+(2.001), (I-052)+(1.080)+(2.002), (I-052)+(1.080)+(2.003), (I-052)+(1.080)+(2.004), (I-052)+(1.080)+(2.005), (I-052)+(1.080)+(2.006), (I-052)+(1.080)+(2.007), (I-052)+(1.080)+(2.008), (I-052)+(1.080)+(2.009), (I-052)+(1.080)+(2.010), (I-052)+(1.080)+(2.011), (I-052)+(1.080)+(2.012), (I-052)+(1.080)+(2.013), (I-052)+(1.080)+(2.014), (I-052)+(1.080)+(2.015), (I-052)+(1.080)+(2.016), (I-052)+(1.080)+(2.017), (I-052)+(1.080)+(2.018), (I-052)+(1.080)+(2.019), (I-052)+(1.080)+(2.020), (I-052)+(1.080)+(2.021), (I-052)+(1.080)+(2.022), (I-052)+(1.080)+(2.023), (I-052)+(1.080)+(2.024), (I-052)+(1.080)+(2.025), (I-052)+(1.080)+(2.026), (I-052)+(1.080)+(2.027), (I-052)+(1.080)+(2.028), (I-052)+(1.080)+(2.029), (I-052)+(1.080)+(2.030), (I-052)+(1.080)+(2.031), (I-052)+(1.080)+(2.032), (I-052)+(1.080)+(2.033), (I-052)+(1.080)+(2.034), (I-052)+(1.080)+(2.035), (I-052)+(1.080)+(2.036), (I-052)+(1.080)+(2.037), (I-052)+(1.080)+(2.038), (I-052)+(1.080)+(2.039), (I-052)+(1.080)+(2.040), (I-052)+(1.080)+(2.041), (I-052)+(1.080)+(2.042), (I-052)+(1.080)+(2.043), (I-052)+(1.080)+(2.044), (I-052)+(1.080)+(2.045), (I-052)+(1.080)+(2.046), (I-052)+(1.080)+(2.047), (I-052)+(1.080)+(2.048), (I-052)+(1.080)+(2.049), (I-052)+(1.080)+(2.050), (I-052)+(1.080)+(2.051), (I-052)+(1.080)+(2.052), (I-052)+(1.080)+(2.053), (I-052)+(1.080)+(2.054), (I-052)+(1.080)+(2.055), (I-052)+(1.080)+(2.056), (I-052)+(1.080)+(2.057), (I-052)+(1.080)+(2.058), (I-052)+(1.080)+(2.059), (I-052)+(1.080)+(3.001), (I-052)+(1.080)+(3.002), (I-052)+(1.080)+(3.003), (I-052)+(1.080)+(3.004), (I-052)+(1.080)+(3.005), (I-052)+(1.080)+(3.006), (I-052)+(1.080)+(3.007), (I-052)+(1.080)+(3.008), (I-052)+(1.080)+(3.009), (I-052)+(1.080)+(3.010), (I-052)+(1.080)+(3.011), (I-052)+(1.080)+(3.012), (I-052)+(1.080)+(3.013), (I-052)+(1.080)+(3.014), (I-052)+(1.080)+(3.015), (I-052)+(1.080)+(3.016), (I-052)+(1.080)+(3.017), (I-052)+(1.080)+(3.018), (I-052)+(1.080)+(3.019), (I-052)+(1.080)+(3.020), (I-052)+(1.080)+(3.021), (I-052)+(1.080)+(3.022), (I-052)+(1.080)+(3.023), (I-052)+(1.080)+(3.024), (I-052)+(1.080)+(3.025), (I-052)+(1.080)+(3.026), (I-052)+(1.080)+(3.027), (I-052)+(1.080)+(3.028), (I-052)+(1.080)+(3.029), (I-052)+(1.080)+(3.030), (I-052)+(1.080)+(3.031), (I-052)+(1.080)+(5.001), (I-052)+(1.080)+(5.002), (I-052)+(1.080)+(5.003), (I-052)+(1.080)+(5.004), (I-052)+(1.080)+(5.005), (I-052)+(1.080)+(5.006), (I-052)+(1.080)+(5.007), (I-052)+(1.080)+(5.008), (I-052)+(1.080)+(5.009), (I-052)+(1.080)+(5.010), (I-052)+(1.080)+(5.011), (I-052)+(1.080)+(5.012), (I-052)+(1.080)+(5.013), (I-052)+(1.080)+(5.014), (I-052)+(1.080)+(5.015), (I-052)+(1.080)+(5.016), (I-052)+(1.080)+(5.017), (I-052)+(1.080)+(5.018), (I-052)+(1.080)+(5.019), (I-052)+(1.080)+(5.020), (I-052)+(1.080)+(5.021), (I-052)+(1.080)+(5.022), (I-052)+(1.080)+(5.023), (I-052)+(1.080)+(6.001), (I-052)+(1.080)+(6.002), (I-052)+(1.080)+(6.003), (I-052)+(1.080)+(6.004), (I-052)+(1.080)+(7.001), (I-052)+(1.080)+(7.002), (I-052)+(1.080)+(7.003), (I-052)+(1.080)+(7.004), (I-052)+(1.080)+(7.005), (I-052)+(1.080)+(7.006), (I-052)+(1.080)+(9.001), (I-052)+(1.080)+(9.002), (I-052)+(1.080)+(9.003), (I-052)+(1.080)+(9.004), (I-052)+(1.080)+(9.005), (I-052)+(1.080)+(9.006), (I-052)+(1.080)+(9.007), (I-052)+(1.080)+(9.008), (I-052)+(1.080)+(9.009), (I-052)+(1.080)+(14.001), (I-052)+(1.080)+(14.002), (I-052)+(1.080)+(15.008), (I-052)+(1.080)+(15.011), (I-052)+(1.080)+(15.012), (I-052)+(1.080)+(15.016), (I-052)+(1.080)+(15.025), (I-052)+(1.080)+(15.027), (I-052)+(1.080)+(15.047), (I-052)+(1.080)+(15.063), (I-052)+(1.080)+(15.064), (I-052)+(1.080)+(16.001), (I-052)+(1.080)+(16.002), (I-052)+(1.080)+(16.003), (I-052)+(1.080)+(16.004), (I-052)+(1.080)+(16.005), (I-052)+(1.080)+(16.006), (I-052)+(1.080)+(16.007), (I-052)+(1.080)+(16.008), (I-052)+(1.080)+(17.001), (I-052)+(1.080)+(17.002), (I-052)+(1.080)+(17.003), (I-052)+(1.080)+(17.004), (I-052)+(1.080)+(17.005), (I-052)+(1.080)+(17.006), (I-052)+(1.080)+(17.007), (I-052)+(1.080)+(17.008), (I-052)+(1.080)+(17.009), (I-052)+(1.080)+(17.010), (I-052)+(1.080)+(17.011), (I-052)+(1.080)+(17.012), (I-052)+(1.080)+(18.001), (I-052)+(1.081)+(1.082), (I-052)+(1.081)+(1.083), (I-052)+(1.081)+(1.084), (I-052)+(1.081)+(1.085), (I-052)+(1.081)+(1.086), (I-052)+(1.081)+(1.087), (I-052)+(1.081)+(1.088), (I-052)+(1.081)+(1.089), (I-052)+(1.081)+(1.090), (I-052)+(1.081)+(1.091), (I-052)+(1.081)+(1.092), (I-052)+(1.081)+(2.001), (I-052)+(1.081)+(2.002), (I-052)+(1.081)+(2.003), (I-052)+(1.081)+(2.004), (I-052)+(1.081)+(2.005), (I-052)+(1.081)+(2.006), (I-052)+(1.081)+(2.007), (I-052)+(1.081)+(2.008), (I-052)+(1.081)+(2.009), (I-052)+(1.081)+(2.010), (I-052)+(1.081)+(2.011), (I-052)+(1.081)+(2.012), (I-052)+(1.081)+(2.013), (I-052)+(1.081)+(2.014), (I-052)+(1.081)+(2.015), (I-052)+(1.081)+(2.016), (I-052)+(1.081)+(2.017), (I-052)+(1.081)+(2.018), (I-052)+(1.081)+(2.019), (I-052)+(1.081)+(2.020), (I-052)+(1.081)+(2.021), (I-052)+(1.081)+(2.022), (I-052)+(1.081)+(2.023), (I-052)+(1.081)+(2.024), (I-052)+(1.081)+(2.025), (I-052)+(1.081)+(2.026), (I-052)+(1.081)+(2.027), (I-052)+(1.081)+(2.028), (I-052)+(1.081)+(2.029), (I-052)+(1.081)+(2.030), (I-052)+(1.081)+(2.031), (I-052)+(1.081)+(2.032), (I-052)+(1.081)+(2.033), (I-052)+(1.081)+(2.034), (I-052)+(1.081)+(2.035), (I-052)+(1.081)+(2.036), (I-052)+(1.081)+(2.037), (I-052)+(1.081)+(2.038), (I-052)+(1.081)+(2.039), (I-052)+(1.081)+(2.040), (I-052)+(1.081)+(2.041), (I-052)+(1.081)+(2.042), (I-052)+(1.081)+(2.043), (I-052)+(1.081)+(2.044), (I-052)+(1.081)+(2.045), (I-052)+(1.081)+(2.046), (I-052)+(1.081)+(2.047), (I-052)+(1.081)+(2.048), (I-052)+(1.081)+(2.049), (I-052)+(1.081)+(2.050), (I-052)+(1.081)+(2.051), (I-052)+(1.081)+(2.052), (I-052)+(1.081)+(2.053), (I-052)+(1.081)+(2.054), (I-052)+(1.081)+(2.055), (I-052)+(1.081)+(2.056), (I-052)+(1.081)+(2.057), (I-052)+(1.081)+(2.058), (I-052)+(1.081)+(2.059), (I-052)+(1.081)+(3.001), (I-052)+(1.081)+(3.002), (I-052)+(1.081)+(3.003), (I-052)+(1.081)+(3.004), (I-052)+(1.081)+(3.005), (I-052)+(1.081)+(3.006), (I-052)+(1.081)+(3.007), (I-052)+(1.081)+(3.008), (I-052)+(1.081)+(3.009), (I-052)+(1.081)+(3.010), (I-052)+(1.081)+(3.011), (I-052)+(1.081)+(3.012), (I-052)+(1.081)+(3.013), (I-052)+(1.081)+(3.014), (I-052)+(1.081)+(3.015), (I-052)+(1.081)+(3.016), (I-052)+(1.081)+(3.017), (I-052)+(1.081)+(3.018), (I-052)+(1.081)+(3.019), (I-052)+(1.081)+(3.020), (I-052)+(1.081)+(3.021), (I-052)+(1.081)+(3.022), (I-052)+(1.081)+(3.023), (I-052)+(1.081)+(3.024), (I-052)+(1.081)+(3.025), (I-052)+(1.081)+(3.026), (I-052)+(1.081)+(3.027), (I-052)+(1.081)+(3.028), (I-052)+(1.081)+(3.029), (I-052)+(1.081)+(3.030), (I-052)+(1.081)+(3.031), (I-052)+(1.081)+(5.001), (I-052)+(1.081)+(5.002), (I-052)+(1.081)+(5.003), (I-052)+(1.081)+(5.004), (I-052)+(1.081)+(5.005), (I-052)+(1.081)+(5.006), (I-052)+(1.081)+(5.007), (I-052)+(1.081)+(5.008), (I-052)+(1.081)+(5.009), (I-052)+(1.081)+(5.010), (I-052)+(1.081)+(5.011), (I-052)+(1.081)+(5.012), (I-052)+(1.081)+(5.013), (I-052)+(1.081)+(5.014), (I-052)+(1.081)+(5.015), (I-052)+(1.081)+(5.016), (I-052)+(1.081)+(5.017), (I-052)+(1.081)+(5.018), (I-052)+(1.081)+(5.019), (I-052)+(1.081)+(5.020), (I-052)+(1.081)+(5.021), (I-052)+(1.081)+(5.022), (I-052)+(1.081)+(5.023), (I-052)+(1.081)+(6.001), (I-052)+(1.081)+(6.002), (I-052)+(1.081)+(6.003), (I-052)+(1.081)+(6.004), (I-052)+(1.081)+(7.001), (I-052)+(1.081)+(7.002), (I-052)+(1.081)+(7.003), (I-052)+(1.081)+(7.004), (I-052)+(1.081)+(7.005), (I-052)+(1.081)+(7.006), (I-052)+(1.081)+(9.001), (I-052)+(1.081)+(9.002), (I-052)+(1.081)+(9.003), (I-052)+(1.081)+(9.004), (I-052)+(1.081)+(9.005), (I-052)+(1.081)+(9.006), (I-052)+(1.081)+(9.007), (I-052)+(1.081)+(9.008), (I-052)+(1.081)+(9.009), (I-052)+(1.081)+(14.001), (I-052)+(1.081)+(14.002), (I-052)+(1.081)+(15.008), (I-052)+(1.081)+(15.011), (I-052)+(1.081)+(15.012), (I-052)+(1.081)+(15.016), (I-052)+(1.081)+(15.025), (I-052)+(1.081)+(15.027), (I-052)+(1.081)+(15.047), (I-052)+(1.081)+(15.063), (I-052)+(1.081)+(15.064), (I-052)+(1.081)+(16.001), (I-052)+(1.081)+(16.002), (I-052)+(1.081)+(16.003), (I-052)+(1.081)+(16.004), (I-052)+(1.081)+(16.005), (I-052)+(1.081)+(16.006), (I-052)+(1.081)+(16.007), (I-052)+(1.081)+(16.008), (I-052)+(1.081)+(17.001), (I-052)+(1.081)+(17.002), (I-052)+(1.081)+(17.003), (I-052)+(1.081)+(17.004), (I-052)+(1.081)+(17.005), (I-052)+(1.081)+(17.006), (I-052)+(1.081)+(17.007), (I-052)+(1.081)+(17.008), (I-052)+(1.081)+(17.009), (I-052)+(1.081)+(17.010), (I-052)+(1.081)+(17.011), (I-052)+(1.081)+(17.012), (I-052)+(1.081)+(18.001), (I-052)+(1.082)+(1.083), (I-052)+(1.082)+(1.084), (I-052)+(1.082)+(1.085), (I-052)+(1.082)+(1.086), (I-052)+(1.082)+(1.087), (I-052)+(1.082)+(1.088), (I-052)+(1.082)+(1.089), (I-052)+(1.082)+(1.090), (I-052)+(1.082)+(1.091), (I-052)+(1.082)+(1.092), (I-052)+(1.082)+(2.001), (I-052)+(1.082)+(2.002), (I-052)+(1.082)+(2.003), (I-052)+(1.082)+(2.004), (I-052)+(1.082)+(2.005), (I-052)+(1.082)+(2.006), (I-052)+(1.082)+(2.007), (I-052)+(1.082)+(2.008), (I-052)+(1.082)+(2.009), (I-052)+(1.082)+(2.010), (I-052)+(1.082)+(2.011), (I-052)+(1.082)+(2.012), (I-052)+(1.082)+(2.013), (I-052)+(1.082)+(2.014), (I-052)+(1.082)+(2.015), (I-052)+(1.082)+(2.016), (I-052)+(1.082)+(2.017), (I-052)+(1.082)+(2.018), (I-052)+(1.082)+(2.019), (I-052)+(1.082)+(2.020), (I-052)+(1.082)+(2.021), (I-052)+(1.082)+(2.022), (I-052)+(1.082)+(2.023), (I-052)+(1.082)+(2.024), (I-052)+(1.082)+(2.025), (I-052)+(1.082)+(2.026), (I-052)+(1.082)+(2.027), (I-052)+(1.082)+(2.028), (I-052)+(1.082)+(2.029), (I-052)+(1.082)+(2.030), (I-052)+(1.082)+(2.031), (I-052)+(1.082)+(2.032), (I-052)+(1.082)+(2.033), (I-052)+(1.082)+(2.034), (I-052)+(1.082)+(2.035), (I-052)+(1.082)+(2.036), (I-052)+(1.082)+(2.037), (I-052)+(1.082)+(2.038), (I-052)+(1.082)+(2.039), (I-052)+(1.082)+(2.040), (I-052)+(1.082)+(2.041), (I-052)+(1.082)+(2.042), (I-052)+(1.082)+(2.043), (I-052)+(1.082)+(2.044), (I-052)+(1.082)+(2.045), (I-052)+(1.082)+(2.046), (I-052)+(1.082)+(2.047), (I-052)+(1.082)+(2.048), (I-052)+(1.082)+(2.049), (I-052)+(1.082)+(2.050), (I-052)+(1.082)+(2.051), (I-052)+(1.082)+(2.052), (I-052)+(1.082)+(2.053), (I-052)+(1.082)+(2.054), (I-052)+(1.082)+(2.055), (I-052)+(1.082)+(2.056), (I-052)+(1.082)+(2.057), (I-052)+(1.082)+(2.058), (I-052)+(1.082)+(2.059), (I-052)+(1.082)+(3.001), (I-052)+(1.082)+(3.002), (I-052)+(1.082)+(3.003), (I-052)+(1.082)+(3.004), (I-052)+(1.082)+(3.005), (I-052)+(1.082)+(3.006), (I-052)+(1.082)+(3.007), (I-052)+(1.082)+(3.008), (I-052)+(1.082)+(3.009), (I-052)+(1.082)+(3.010), (I-052)+(1.082)+(3.011), (I-052)+(1.082)+(3.012), (I-052)+(1.082)+(3.013), (I-052)+(1.082)+(3.014), (I-052)+(1.082)+(3.015), (I-052)+(1.082)+(3.016), (I-052)+(1.082)+(3.017), (I-052)+(1.082)+(3.018), (I-052)+(1.082)+(3.019), (I-052)+(1.082)+(3.020), (I-052)+(1.082)+(3.021), (I-052)+(1.082)+(3.022), (I-052)+(1.082)+(3.023), (I-052)+(1.082)+(3.024), (I-052)+(1.082)+(3.025), (I-052)+(1.082)+(3.026), (I-052)+(1.082)+(3.027), (I-052)+(1.082)+(3.028), (I-052)+(1.082)+(3.029), (I-052)+(1.082)+(3.030), (I-052)+(1.082)+(3.031), (I-052)+(1.082)+(5.001), (I-052)+(1.082)+(5.002), (I-052)+(1.082)+(5.003), (I-052)+(1.082)+(5.004), (I-052)+(1.082)+(5.005), (I-052)+(1.082)+(5.006), (I-052)+(1.082)+(5.007), (I-052)+(1.082)+(5.008), (I-052)+(1.082)+(5.009), (I-052)+(1.082)+(5.010), (I-052)+(1.082)+(5.011), (I-052)+(1.082)+(5.012), (I-052)+(1.082)+(5.013), (I-052)+(1.082)+(5.014), (I-052)+(1.082)+(5.015), (I-052)+(1.082)+(5.016), (I-052)+(1.082)+(5.017), (I-052)+(1.082)+(5.018), (I-052)+(1.082)+(5.019), (I-052)+(1.082)+(5.020), (I-052)+(1.082)+(5.021), (I-052)+(1.082)+(5.022), (I-052)+(1.082)+(5.023), (I-052)+(1.082)+(6.001), (I-052)+(1.082)+(6.002), (I-052)+(1.082)+(6.003), (I-052)+(1.082)+(6.004), (I-052)+(1.082)+(7.001), (I-052)+(1.082)+(7.002), (I-052)+(1.082)+(7.003), (I-052)+(1.082)+(7.004), (I-052)+(1.082)+(7.005), (I-052)+(1.082)+(7.006), (I-052)+(1.082)+(9.001), (I-052)+(1.082)+(9.002), (I-052)+(1.082)+(9.003), (I-052)+(1.082)+(9.004), (I-052)+(1.082)+(9.005), (I-052)+(1.082)+(9.006), (I-052)+(1.082)+(9.007), (I-052)+(1.082)+(9.008), (I-052)+(1.082)+(9.009), (I-052)+(1.082)+(14.001), (I-052)+(1.082)+(14.002), (I-052)+(1.082)+(15.008), (I-052)+(1.082)+(15.011), (I-052)+(1.082)+(15.012), (I-052)+(1.082)+(15.016), (I-052)+(1.082)+(15.025), (I-052)+(1.082)+(15.027), (I-052)+(1.082)+(15.047), (I-052)+(1.082)+(15.063), (I-052)+(1.082)+(15.064), (I-052)+(1.082)+(16.001), (I-052)+(1.082)+(16.002), (I-052)+(1.082)+(16.003), (I-052)+(1.082)+(16.004), (I-052)+(1.082)+(16.005), (I-052)+(1.082)+(16.006), (I-052)+(1.082)+(16.007), (I-052)+(1.082)+(16.008), (I-052)+(1.082)+(17.001), (I-052)+(1.082)+(17.002), (I-052)+(1.082)+(17.003), (I-052)+(1.082)+(17.004), (I-052)+(1.082)+(17.005), (I-052)+(1.082)+(17.006), (I-052)+(1.082)+(17.007), (I-052)+(1.082)+(17.008), (I-052)+(1.082)+(17.009), (I-052)+(1.082)+(17.010), (I-052)+(1.082)+(17.011), (I-052)+(1.082)+(17.012), (I-052)+(1.082)+(18.001), (I-052)+(1.083)+(1.084), (I-052)+(1.083)+(1.085), (I-052)+(1.083)+(1.086), (I-052)+(1.083)+(1.087), (I-052)+(1.083)+(1.088), (I-052)+(1.083)+(1.089), (I-052)+(1.083)+(1.090), (I-052)+(1.083)+(1.091), (I-052)+(1.083)+(1.092), (I-052)+(1.083)+(2.001), (I-052)+(1.083)+(2.002), (I-052)+(1.083)+(2.003), (I-052)+(1.083)+(2.004), (I-052)+(1.083)+(2.005), (I-052)+(1.083)+(2.006), (I-052)+(1.083)+(2.007), (I-052)+(1.083)+(2.008), (I-052)+(1.083)+(2.009), (I-052)+(1.083)+(2.010), (I-052)+(1.083)+(2.011), (I-052)+(1.083)+(2.012), (I-052)+(1.083)+(2.013), (I-052)+(1.083)+(2.014), (I-052)+(1.083)+(2.015), (I-052)+(1.083)+(2.016), (I-052)+(1.083)+(2.017), (I-052)+(1.083)+(2.018), (I-052)+(1.083)+(2.019), (I-052)+(1.083)+(2.020), (I-052)+(1.083)+(2.021), (I-052)+(1.083)+(2.022), (I-052)+(1.083)+(2.023), (I-052)+(1.083)+(2.024), (I-052)+(1.083)+(2.025), (I-052)+(1.083)+(2.026), (I-052)+(1.083)+(2.027), (I-052)+(1.083)+(2.028), (I-052)+(1.083)+(2.029), (I-052)+(1.083)+(2.030), (I-052)+(1.083)+(2.031), (I-052)+(1.083)+(2.032), (I-052)+(1.083)+(2.033), (I-052)+(1.083)+(2.034), (I-052)+(1.083)+(2.035), (I-052)+(1.083)+(2.036), (I-052)+(1.083)+(2.037), (I-052)+(1.083)+(2.038), (I-052)+(1.083)+(2.039), (I-052)+(1.083)+(2.040), (I-052)+(1.083)+(2.041), (I-052)+(1.083)+(2.042), (I-052)+(1.083)+(2.043), (I-052)+(1.083)+(2.044), (I-052)+(1.083)+(2.045), (I-052)+(1.083)+(2.046), (I-052)+(1.083)+(2.047), (I-052)+(1.083)+(2.048), (I-052)+(1.083)+(2.049), (I-052)+(1.083)+(2.050), (I-052)+(1.083)+(2.051), (I-052)+(1.083)+(2.052), (I-052)+(1.083)+(2.053), (I-052)+(1.083)+(2.054), (I-052)+(1.083)+(2.055), (I-052)+(1.083)+(2.056), (I-052)+(1.083)+(2.057), (I-052)+(1.083)+(2.058), (I-052)+(1.083)+(2.059), (I-052)+(1.083)+(3.001), (I-052)+(1.083)+(3.002), (I-052)+(1.083)+(3.003), (I-052)+(1.083)+(3.004), (I-052)+(1.083)+(3.005), (I-052)+(1.083)+(3.006), (I-052)+(1.083)+(3.007), (I-052)+(1.083)+(3.008), (I-052)+(1.083)+(3.009), (I-052)+(1.083)+(3.010), (I-052)+(1.083)+(3.011), (I-052)+(1.083)+(3.012), (I-052)+(1.083)+(3.013), (I-052)+(1.083)+(3.014), (I-052)+(1.083)+(3.015), (I-052)+(1.083)+(3.016), (I-052)+(1.083)+(3.017), (I-052)+(1.083)+(3.018), (I-052)+(1.083)+(3.019), (I-052)+(1.083)+(3.020), (I-052)+(1.083)+(3.021), (I-052)+(1.083)+(3.022), (I-052)+(1.083)+(3.023), (I-052)+(1.083)+(3.024), (I-052)+(1.083)+(3.025), (I-052)+(1.083)+(3.026), (I-052)+(1.083)+(3.027), (I-052)+(1.083)+(3.028), (I-052)+(1.083)+(3.029), (I-052)+(1.083)+(3.030), (I-052)+(1.083)+(3.031), (I-052)+(1.083)+(5.001), (I-052)+(1.083)+(5.002), (I-052)+(1.083)+(5.003), (I-052)+(1.083)+(5.004), (I-052)+(1.083)+(5.005), (I-052)+(1.083)+(5.006), (I-052)+(1.083)+(5.007), (I-052)+(1.083)+(5.008), (I-052)+(1.083)+(5.009), (I-052)+(1.083)+(5.010), (I-052)+(1.083)+(5.011), (I-052)+(1.083)+(5.012), (I-052)+(1.083)+(5.013), (I-052)+(1.083)+(5.014), (I-052)+(1.083)+(5.015), (I-052)+(1.083)+(5.016), (I-052)+(1.083)+(5.017), (I-052)+(1.083)+(5.018), (I-052)+(1.083)+(5.019), (I-052)+(1.083)+(5.020), (I-052)+(1.083)+(5.021), (I-052)+(1.083)+(5.022), (I-052)+(1.083)+(5.023), (I-052)+(1.083)+(6.001), (I-052)+(1.083)+(6.002), (I-052)+(1.083)+(6.003), (I-052)+(1.083)+(6.004), (I-052)+(1.083)+(7.001), (I-052)+(1.083)+(7.002), (I-052)+(1.083)+(7.003), (I-052)+(1.083)+(7.004), (I-052)+(1.083)+(7.005), (I-052)+(1.083)+(7.006), (I-052)+(1.083)+(9.001), (I-052)+(1.083)+(9.002), (I-052)+(1.083)+(9.003), (I-052)+(1.083)+(9.004), (I-052)+(1.083)+(9.005), (I-052)+(1.083)+(9.006), (I-052)+(1.083)+(9.007), (I-052)+(1.083)+(9.008), (I-052)+(1.083)+(9.009), (I-052)+(1.083)+(14.001), (I-052)+(1.083)+(14.002), (I-052)+(1.083)+(15.008), (I-052)+(1.083)+(15.011), (I-052)+(1.083)+(15.012), (I-052)+(1.083)+(15.016), (I-052)+(1.083)+(15.025), (I-052)+(1.083)+(15.027), (I-052)+(1.083)+(15.047), (I-052)+(1.083)+(15.063), (I-052)+(1.083)+(15.064), (I-052)+(1.083)+(16.001), (I-052)+(1.083)+(16.002), (I-052)+(1.083)+(16.003), (I-052)+(1.083)+(16.004), (I-052)+(1.083)+(16.005), (I-052)+(1.083)+(16.006), (I-052)+(1.083)+(16.007), (I-052)+(1.083)+(16.008), (I-052)+(1.083)+(17.001), (I-052)+(1.083)+(17.002), (I-052)+(1.083)+(17.003), (I-052)+(1.083)+(17.004), (I-052)+(1.083)+(17.005), (I-052)+(1.083)+(17.006), (I-052)+(1.083)+(17.007), (I-052)+(1.083)+(17.008), (I-052)+(1.083)+(17.009), (I-052)+(1.083)+(17.010), (I-052)+(1.083)+(17.011), (I-052)+(1.083)+(17.012), (I-052)+(1.083)+(18.001), (I-052)+(1.084)+(1.085), (I-052)+(1.084)+(1.086), (I-052)+(1.084)+(1.087), (I-052)+(1.084)+(1.088), (I-052)+(1.084)+(1.089), (I-052)+(1.084)+(1.090), (I-052)+(1.084)+(1.091), (I-052)+(1.084)+(1.092), (I-052)+(1.084)+(2.001), (I-052)+(1.084)+(2.002), (I-052)+(1.084)+(2.003), (I-052)+(1.084)+(2.004), (I-052)+(1.084)+(2.005), (I-052)+(1.084)+(2.006), (I-052)+(1.084)+(2.007), (I-052)+(1.084)+(2.008), (I-052)+(1.084)+(2.009), (I-052)+(1.084)+(2.010), (I-052)+(1.084)+(2.011), (I-052)+(1.084)+(2.012), (I-052)+(1.084)+(2.013), (I-052)+(1.084)+(2.014), (I-052)+(1.084)+(2.015), (I-052)+(1.084)+(2.016), (I-052)+(1.084)+(2.017), (I-052)+(1.084)+(2.018), (I-052)+(1.084)+(2.019), (I-052)+(1.084)+(2.020), (I-052)+(1.084)+(2.021), (I-052)+(1.084)+(2.022), (I-052)+(1.084)+(2.023), (I-052)+(1.084)+(2.024), (I-052)+(1.084)+(2.025), (I-052)+(1.084)+(2.026), (I-052)+(1.084)+(2.027), (I-052)+(1.084)+(2.028), (I-052)+(1.084)+(2.029), (I-052)+(1.084)+(2.030), (I-052)+(1.084)+(2.031), (I-052)+(1.084)+(2.032), (I-052)+(1.084)+(2.033), (I-052)+(1.084)+(2.034), (I-052)+(1.084)+(2.035), (I-052)+(1.084)+(2.036), (I-052)+(1.084)+(2.037), (I-052)+(1.084)+(2.038), (I-052)+(1.084)+(2.039), (I-052)+(1.084)+(2.040), (I-052)+(1.084)+(2.041), (I-052)+(1.084)+(2.042), (I-052)+(1.084)+(2.043), (I-052)+(1.084)+(2.044), (I-052)+(1.084)+(2.045), (I-052)+(1.084)+(2.046), (I-052)+(1.084)+(2.047), (I-052)+(1.084)+(2.048), (I-052)+(1.084)+(2.049), (I-052)+(1.084)+(2.050), (I-052)+(1.084)+(2.051), (I-052)+(1.084)+(2.052), (I-052)+(1.084)+(2.053), (I-052)+(1.084)+(2.054), (I-052)+(1.084)+(2.055), (I-052)+(1.084)+(2.056), (I-052)+(1.084)+(2.057), (I-052)+(1.084)+(2.058), (I-052)+(1.084)+(2.059), (I-052)+(1.084)+(3.001), (I-052)+(1.084)+(3.002), (I-052)+(1.084)+(3.003), (I-052)+(1.084)+(3.004), (I-052)+(1.084)+(3.005), (I-052)+(1.084)+(3.006), (I-052)+(1.084)+(3.007), (I-052)+(1.084)+(3.008), (I-052)+(1.084)+(3.009), (I-052)+(1.084)+(3.010), (I-052)+(1.084)+(3.011), (I-052)+(1.084)+(3.012), (I-052)+(1.084)+(3.013), (I-052)+(1.084)+(3.014), (I-052)+(1.084)+(3.015), (I-052)+(1.084)+(3.016), (I-052)+(1.084)+(3.017), (I-052)+(1.084)+(3.018), (I-052)+(1.084)+(3.019), (I-052)+(1.084)+(3.020), (I-052)+(1.084)+(3.021), (I-052)+(1.084)+(3.022), (I-052)+(1.084)+(3.023), (I-052)+(1.084)+(3.024), (I-052)+(1.084)+(3.025), (I-052)+(1.084)+(3.026), (I-052)+(1.084)+(3.027), (I-052)+(1.084)+(3.028), (I-052)+(1.084)+(3.029), (I-052)+(1.084)+(3.030), (I-052)+(1.084)+(3.031), (I-052)+(1.084)+(5.001), (I-052)+(1.084)+(5.002), (I-052)+(1.084)+(5.003), (I-052)+(1.084)+(5.004), (I-052)+(1.084)+(5.005), (I-052)+(1.084)+(5.006), (I-052)+(1.084)+(5.007), (I-052)+(1.084)+(5.008), (I-052)+(1.084)+(5.009), (I-052)+(1.084)+(5.010), (I-052)+(1.084)+(5.011), (I-052)+(1.084)+(5.012), (I-052)+(1.084)+(5.013), (I-052)+(1.084)+(5.014), (I-052)+(1.084)+(5.015), (I-052)+(1.084)+(5.016), (I-052)+(1.084)+(5.017), (I-052)+(1.084)+(5.018), (I-052)+(1.084)+(5.019), (I-052)+(1.084)+(5.020), (I-052)+(1.084)+(5.021), (I-052)+(1.084)+(5.022), (I-052)+(1.084)+(5.023), (I-052)+(1.084)+(6.001), (I-052)+(1.084)+(6.002), (I-052)+(1.084)+(6.003), (I-052)+(1.084)+(6.004), (I-052)+(1.084)+(7.001), (I-052)+(1.084)+(7.002), (I-052)+(1.084)+(7.003), (I-052)+(1.084)+(7.004), (I-052)+(1.084)+(7.005), (I-052)+(1.084)+(7.006), (I-052)+(1.084)+(9.001), (I-052)+(1.084)+(9.002), (I-052)+(1.084)+(9.003), (I-052)+(1.084)+(9.004), (I-052)+(1.084)+(9.005), (I-052)+(1.084)+(9.006), (I-052)+(1.084)+(9.007), (I-052)+(1.084)+(9.008), (I-052)+(1.084)+(9.009), (I-052)+(1.084)+(14.001), (I-052)+(1.084)+(14.002), (I-052)+(1.084)+(15.008), (I-052)+(1.084)+(15.011), (I-052)+(1.084)+(15.012), (I-052)+(1.084)+(15.016), (I-052)+(1.084)+(15.025), (I-052)+(1.084)+(15.027), (I-052)+(1.084)+(15.047), (I-052)+(1.084)+(15.063), (I-052)+(1.084)+(15.064), (I-052)+(1.084)+(16.001), (I-052)+(1.084)+(16.002), (I-052)+(1.084)+(16.003), (I-052)+(1.084)+(16.004), (I-052)+(1.084)+(16.005), (I-052)+(1.084)+(16.006), (I-052)+(1.084)+(16.007), (I-052)+(1.084)+(16.008), (I-052)+(1.084)+(17.001), (I-052)+(1.084)+(17.002), (I-052)+(1.084)+(17.003), (I-052)+(1.084)+(17.004), (I-052)+(1.084)+(17.005), (I-052)+(1.084)+(17.006), (I-052)+(1.084)+(17.007), (I-052)+(1.084)+(17.008), (I-052)+(1.084)+(17.009), (I-052)+(1.084)+(17.010), (I-052)+(1.084)+(17.011), (I-052)+(1.084)+(17.012), (I-052)+(1.084)+(18.001), (I-052)+(1.085)+(1.086), (I-052)+(1.085)+(1.087), (I-052)+(1.085)+(1.088), (I-052)+(1.085)+(1.089), (I-052)+(1.085)+(1.090), (I-052)+(1.085)+(1.091), (I-052)+(1.085)+(1.092), (I-052)+(1.085)+(2.001), (I-052)+(1.085)+(2.002), (I-052)+(1.085)+(2.003), (I-052)+(1.085)+(2.004), (I-052)+(1.085)+(2.005), (I-052)+(1.085)+(2.006), (I-052)+(1.085)+(2.007), (I-052)+(1.085)+(2.008), (I-052)+(1.085)+(2.009), (I-052)+(1.085)+(2.010), (I-052)+(1.085)+(2.011), (I-052)+(1.085)+(2.012), (I-052)+(1.085)+(2.013), (I-052)+(1.085)+(2.014), (I-052)+(1.085)+(2.015), (I-052)+(1.085)+(2.016), (I-052)+(1.085)+(2.017), (I-052)+(1.085)+(2.018), (I-052)+(1.085)+(2.019), (I-052)+(1.085)+(2.020), (I-052)+(1.085)+(2.021), (I-052)+(1.085)+(2.022), (I-052)+(1.085)+(2.023), (I-052)+(1.085)+(2.024), (I-052)+(1.085)+(2.025), (I-052)+(1.085)+(2.026), (I-052)+(1.085)+(2.027), (I-052)+(1.085)+(2.028), (I-052)+(1.085)+(2.029), (I-052)+(1.085)+(2.030), (I-052)+(1.085)+(2.031), (I-052)+(1.085)+(2.032), (I-052)+(1.085)+(2.033), (I-052)+(1.085)+(2.034), (I-052)+(1.085)+(2.035), (I-052)+(1.085)+(2.036), (I-052)+(1.085)+(2.037), (I-052)+(1.085)+(2.038), (I-052)+(1.085)+(2.039), (I-052)+(1.085)+(2.040), (I-052)+(1.085)+(2.041), (I-052)+(1.085)+(2.042), (I-052)+(1.085)+(2.043), (I-052)+(1.085)+(2.044), (I-052)+(1.085)+(2.045), (I-052)+(1.085)+(2.046), (I-052)+(1.085)+(2.047), (I-052)+(1.085)+(2.048), (I-052)+(1.085)+(2.049), (I-052)+(1.085)+(2.050), (I-052)+(1.085)+(2.051), (I-052)+(1.085)+(2.052), (I-052)+(1.085)+(2.053), (I-052)+(1.085)+(2.054), (I-052)+(1.085)+(2.055), (I-052)+(1.085)+(2.056), (I-052)+(1.085)+(2.057), (I-052)+(1.085)+(2.058), (I-052)+(1.085)+(2.059), (I-052)+(1.085)+(3.001), (I-052)+(1.085)+(3.002), (I-052)+(1.085)+(3.003), (I-052)+(1.085)+(3.004), (I-052)+(1.085)+(3.005), (I-052)+(1.085)+(3.006), (I-052)+(1.085)+(3.007), (I-052)+(1.085)+(3.008), (I-052)+(1.085)+(3.009), (I-052)+(1.085)+(3.010), (I-052)+(1.085)+(3.011), (I-052)+(1.085)+(3.012), (I-052)+(1.085)+(3.013), (I-052)+(1.085)+(3.014), (I-052)+(1.085)+(3.015), (I-052)+(1.085)+(3.016), (I-052)+(1.085)+(3.017), (I-052)+(1.085)+(3.018), (I-052)+(1.085)+(3.019), (I-052)+(1.085)+(3.020), (I-052)+(1.085)+(3.021), (I-052)+(1.085)+(3.022), (I-052)+(1.085)+(3.023), (I-052)+(1.085)+(3.024), (I-052)+(1.085)+(3.025), (I-052)+(1.085)+(3.026), (I-052)+(1.085)+(3.027), (I-052)+(1.085)+(3.028), (I-052)+(1.085)+(3.029), (I-052)+(1.085)+(3.030), (I-052)+(1.085)+(3.031), (I-052)+(1.085)+(5.001), (I-052)+(1.085)+(5.002), (I-052)+(1.085)+(5.003), (I-052)+(1.085)+(5.004), (I-052)+(1.085)+(5.005), (I-052)+(1.085)+(5.006), (I-052)+(1.085)+(5.007), (I-052)+(1.085)+(5.008), (I-052)+(1.085)+(5.009), (I-052)+(1.085)+(5.010), (I-052)+(1.085)+(5.011), (I-052)+(1.085)+(5.012), (I-052)+(1.085)+(5.013), (I-052)+(1.085)+(5.014), (I-052)+(1.085)+(5.015), (I-052)+(1.085)+(5.016), (I-052)+(1.085)+(5.017), (I-052)+(1.085)+(5.018), (I-052)+(1.085)+(5.019), (I-052)+(1.085)+(5.020), (I-052)+(1.085)+(5.021), (I-052)+(1.085)+(5.022), (I-052)+(1.085)+(5.023), (I-052)+(1.085)+(6.001), (I-052)+(1.085)+(6.002), (I-052)+(1.085)+(6.003), (I-052)+(1.085)+(6.004), (I-052)+(1.085)+(7.001), (I-052)+(1.085)+(7.002), (I-052)+(1.085)+(7.003), (I-052)+(1.085)+(7.004), (I-052)+(1.085)+(7.005), (I-052)+(1.085)+(7.006), (I-052)+(1.085)+(9.001), (I-052)+(1.085)+(9.002), (I-052)+(1.085)+(9.003), (I-052)+(1.085)+(9.004), (I-052)+(1.085)+(9.005), (I-052)+(1.085)+(9.006), (I-052)+(1.085)+(9.007), (I-052)+(1.085)+(9.008), (I-052)+(1.085)+(9.009), (I-052)+(1.085)+(14.001), (I-052)+(1.085)+(14.002), (I-052)+(1.085)+(15.008), (I-052)+(1.085)+(15.011), (I-052)+(1.085)+(15.012), (I-052)+(1.085)+(15.016), (I-052)+(1.085)+(15.025), (I-052)+(1.085)+(15.027), (I-052)+(1.085)+(15.047), (I-052)+(1.085)+(15.063), (I-052)+(1.085)+(15.064), (I-052)+(1.085)+(16.001), (I-052)+(1.085)+(16.002), (I-052)+(1.085)+(16.003), (I-052)+(1.085)+(16.004), (I-052)+(1.085)+(16.005), (I-052)+(1.085)+(16.006), (I-052)+(1.085)+(16.007), (I-052)+(1.085)+(16.008), (I-052)+(1.085)+(17.001), (I-052)+(1.085)+(17.002), (I-052)+(1.085)+(17.003), (I-052)+(1.085)+(17.004), (I-052)+(1.085)+(17.005), (I-052)+(1.085)+(17.006), (I-052)+(1.085)+(17.007), (I-052)+(1.085)+(17.008), (I-052)+(1.085)+(17.009), (I-052)+(1.085)+(17.010), (I-052)+(1.085)+(17.011), (I-052)+(1.085)+(17.012), (I-052)+(1.085)+(18.001), (I-052)+(1.086)+(1.087), (I-052)+(1.086)+(1.088), (I-052)+(1.086)+(1.089), (I-052)+(1.086)+(1.090), (I-052)+(1.086)+(1.091), (I-052)+(1.086)+(1.092), (I-052)+(1.086)+(2.001), (I-052)+(1.086)+(2.002), (I-052)+(1.086)+(2.003), (I-052)+(1.086)+(2.004), (I-052)+(1.086)+(2.005), (I-052)+(1.086)+(2.006), (I-052)+(1.086)+(2.007), (I-052)+(1.086)+(2.008), (I-052)+(1.086)+(2.009), (I-052)+(1.086)+(2.010), (I-052)+(1.086)+(2.011), (I-052)+(1.086)+(2.012), (I-052)+(1.086)+(2.013), (I-052)+(1.086)+(2.014), (I-052)+(1.086)+(2.015), (I-052)+(1.086)+(2.016), (I-052)+(1.086)+(2.017), (I-052)+(1.086)+(2.018), (I-052)+(1.086)+(2.019), (I-052)+(1.086)+(2.020), (I-052)+(1.086)+(2.021), (I-052)+(1.086)+(2.022), (I-052)+(1.086)+(2.023), (I-052)+(1.086)+(2.024), (I-052)+(1.086)+(2.025), (I-052)+(1.086)+(2.026), (I-052)+(1.086)+(2.027), (I-052)+(1.086)+(2.028), (I-052)+(1.086)+(2.029), (I-052)+(1.086)+(2.030), (I-052)+(1.086)+(2.031), (I-052)+(1.086)+(2.032), (I-052)+(1.086)+(2.033), (I-052)+(1.086)+(2.034), (I-052)+(1.086)+(2.035), (I-052)+(1.086)+(2.036), (I-052)+(1.086)+(2.037), (I-052)+(1.086)+(2.038), (I-052)+(1.086)+(2.039), (I-052)+(1.086)+(2.040), (I-052)+(1.086)+(2.041), (I-052)+(1.086)+(2.042), (I-052)+(1.086)+(2.043), (I-052)+(1.086)+(2.044), (I-052)+(1.086)+(2.045), (I-052)+(1.086)+(2.046), (I-052)+(1.086)+(2.047), (I-052)+(1.086)+(2.048), (I-052)+(1.086)+(2.049), (I-052)+(1.086)+(2.050), (I-052)+(1.086)+(2.051), (I-052)+(1.086)+(2.052), (I-052)+(1.086)+(2.053), (I-052)+(1.086)+(2.054), (I-052)+(1.086)+(2.055), (I-052)+(1.086)+(2.056), (I-052)+(1.086)+(2.057), (I-052)+(1.086)+(2.058), (I-052)+(1.086)+(2.059), (I-052)+(1.086)+(3.001), (I-052)+(1.086)+(3.002), (I-052)+(1.086)+(3.003), (I-052)+(1.086)+(3.004), (I-052)+(1.086)+(3.005), (I-052)+(1.086)+(3.006), (I-052)+(1.086)+(3.007), (I-052)+(1.086)+(3.008), (I-052)+(1.086)+(3.009), (I-052)+(1.086)+(3.010), (I-052)+(1.086)+(3.011), (I-052)+(1.086)+(3.012), (I-052)+(1.086)+(3.013), (I-052)+(1.086)+(3.014), (I-052)+(1.086)+(3.015), (I-052)+(1.086)+(3.016), (I-052)+(1.086)+(3.017), (I-052)+(1.086)+(3.018), (I-052)+(1.086)+(3.019), (I-052)+(1.086)+(3.020), (I-052)+(1.086)+(3.021), (I-052)+(1.086)+(3.022), (I-052)+(1.086)+(3.023), (I-052)+(1.086)+(3.024), (I-052)+(1.086)+(3.025), (I-052)+(1.086)+(3.026), (I-052)+(1.086)+(3.027), (I-052)+(1.086)+(3.028), (I-052)+(1.086)+(3.029), (I-052)+(1.086)+(3.030), (I-052)+(1.086)+(3.031), (I-052)+(1.086)+(5.001), (I-052)+(1.086)+(5.002), (I-052)+(1.086)+(5.003), (I-052)+(1.086)+(5.004), (I-052)+(1.086)+(5.005), (I-052)+(1.086)+(5.006), (I-052)+(1.086)+(5.007), (I-052)+(1.086)+(5.008), (I-052)+(1.086)+(5.009), (I-052)+(1.086)+(5.010), (I-052)+(1.086)+(5.011), (I-052)+(1.086)+(5.012), (I-052)+(1.086)+(5.013), (I-052)+(1.086)+(5.014), (I-052)+(1.086)+(5.015), (I-052)+(1.086)+(5.016), (I-052)+(1.086)+(5.017), (I-052)+(1.086)+(5.018), (I-052)+(1.086)+(5.019), (I-052)+(1.086)+(5.020), (I-052)+(1.086)+(5.021), (I-052)+(1.086)+(5.022), (I-052)+(1.086)+(5.023), (I-052)+(1.086)+(6.001), (I-052)+(1.086)+(6.002), (I-052)+(1.086)+(6.003), (I-052)+(1.086)+(6.004), (I-052)+(1.086)+(7.001), (I-052)+(1.086)+(7.002), (I-052)+(1.086)+(7.003), (I-052)+(1.086)+(7.004), (I-052)+(1.086)+(7.005), (I-052)+(1.086)+(7.006), (I-052)+(1.086)+(9.001), (I-052)+(1.086)+(9.002), (I-052)+(1.086)+(9.003), (I-052)+(1.086)+(9.004), (I-052)+(1.086)+(9.005), (I-052)+(1.086)+(9.006), (I-052)+(1.086)+(9.007), (I-052)+(1.086)+(9.008), (I-052)+(1.086)+(9.009), (I-052)+(1.086)+(14.001), (I-052)+(1.086)+(14.002), (I-052)+(1.086)+(15.008), (I-052)+(1.086)+(15.011), (I-052)+(1.086)+(15.012), (I-052)+(1.086)+(15.016), (I-052)+(1.086)+(15.025), (I-052)+(1.086)+(15.027), (I-052)+(1.086)+(15.047), (I-052)+(1.086)+(15.063), (I-052)+(1.086)+(15.064), (I-052)+(1.086)+(16.001), (I-052)+(1.086)+(16.002), (I-052)+(1.086)+(16.003), (I-052)+(1.086)+(16.004), (I-052)+(1.086)+(16.005), (I-052)+(1.086)+(16.006), (I-052)+(1.086)+(16.007), (I-052)+(1.086)+(16.008), (I-052)+(1.086)+(17.001), (I-052)+(1.086)+(17.002), (I-052)+(1.086)+(17.003), (I-052)+(1.086)+(17.004), (I-052)+(1.086)+(17.005), (I-052)+(1.086)+(17.006), (I-052)+(1.086)+(17.007), (I-052)+(1.086)+(17.008), (I-052)+(1.086)+(17.009), (I-052)+(1.086)+(17.010), (I-052)+(1.086)+(17.011), (I-052)+(1.086)+(17.012), (I-052)+(1.086)+(18.001), (I-052)+(1.087)+(1.088), (I-052)+(1.087)+(1.089), (I-052)+(1.087)+(1.090), (I-052)+(1.087)+(1.091), (I-052)+(1.087)+(1.092), (I-052)+(1.087)+(2.001), (I-052)+(1.087)+(2.002), (I-052)+(1.087)+(2.003), (I-052)+(1.087)+(2.004), (I-052)+(1.087)+(2.005), (I-052)+(1.087)+(2.006), (I-052)+(1.087)+(2.007), (I-052)+(1.087)+(2.008), (I-052)+(1.087)+(2.009), (I-052)+(1.087)+(2.010), (I-052)+(1.087)+(2.011), (I-052)+(1.087)+(2.012), (I-052)+(1.087)+(2.013), (I-052)+(1.087)+(2.014), (I-052)+(1.087)+(2.015), (I-052)+(1.087)+(2.016), (I-052)+(1.087)+(2.017), (I-052)+(1.087)+(2.018), (I-052)+(1.087)+(2.019), (I-052)+(1.087)+(2.020), (I-052)+(1.087)+(2.021), (I-052)+(1.087)+(2.022), (I-052)+(1.087)+(2.023), (I-052)+(1.087)+(2.024), (I-052)+(1.087)+(2.025), (I-052)+(1.087)+(2.026), (I-052)+(1.087)+(2.027), (I-052)+(1.087)+(2.028), (I-052)+(1.087)+(2.029), (I-052)+(1.087)+(2.030), (I-052)+(1.087)+(2.031), (I-052)+(1.087)+(2.032), (I-052)+(1.087)+(2.033), (I-052)+(1.087)+(2.034), (I-052)+(1.087)+(2.035), (I-052)+(1.087)+(2.036), (I-052)+(1.087)+(2.037), (I-052)+(1.087)+(2.038), (I-052)+(1.087)+(2.039), (I-052)+(1.087)+(2.040), (I-052)+(1.087)+(2.041), (I-052)+(1.087)+(2.042), (I-052)+(1.087)+(2.043), (I-052)+(1.087)+(2.044), (I-052)+(1.087)+(2.045), (I-052)+(1.087)+(2.046), (I-052)+(1.087)+(2.047), (I-052)+(1.087)+(2.048), (I-052)+(1.087)+(2.049), (I-052)+(1.087)+(2.050), (I-052)+(1.087)+(2.051), (I-052)+(1.087)+(2.052), (I-052)+(1.087)+(2.053), (I-052)+(1.087)+(2.054), (I-052)+(1.087)+(2.055), (I-052)+(1.087)+(2.056), (I-052)+(1.087)+(2.057), (I-052)+(1.087)+(2.058), (I-052)+(1.087)+(2.059), (I-052)+(1.087)+(3.001), (I-052)+(1.087)+(3.002), (I-052)+(1.087)+(3.003), (I-052)+(1.087)+(3.004), (I-052)+(1.087)+(3.005), (I-052)+(1.087)+(3.006), (I-052)+(1.087)+(3.007), (I-052)+(1.087)+(3.008), (I-052)+(1.087)+(3.009), (I-052)+(1.087)+(3.010), (I-052)+(1.087)+(3.011), (I-052)+(1.087)+(3.012), (I-052)+(1.087)+(3.013), (I-052)+(1.087)+(3.014), (I-052)+(1.087)+(3.015), (I-052)+(1.087)+(3.016), (I-052)+(1.087)+(3.017), (I-052)+(1.087)+(3.018), (I-052)+(1.087)+(3.019), (I-052)+(1.087)+(3.020), (I-052)+(1.087)+(3.021), (I-052)+(1.087)+(3.022), (I-052)+(1.087)+(3.023), (I-052)+(1.087)+(3.024), (I-052)+(1.087)+(3.025), (I-052)+(1.087)+(3.026), (I-052)+(1.087)+(3.027), (I-052)+(1.087)+(3.028), (I-052)+(1.087)+(3.029), (I-052)+(1.087)+(3.030), (I-052)+(1.087)+(3.031), (I-052)+(1.087)+(5.001), (I-052)+(1.087)+(5.002), (I-052)+(1.087)+(5.003), (I-052)+(1.087)+(5.004), (I-052)+(1.087)+(5.005), (I-052)+(1.087)+(5.006), (I-052)+(1.087)+(5.007), (I-052)+(1.087)+(5.008), (I-052)+(1.087)+(5.009), (I-052)+(1.087)+(5.010), (I-052)+(1.087)+(5.011), (I-052)+(1.087)+(5.012), (I-052)+(1.087)+(5.013), (I-052)+(1.087)+(5.014), (I-052)+(1.087)+(5.015), (I-052)+(1.087)+(5.016), (I-052)+(1.087)+(5.017), (I-052)+(1.087)+(5.018), (I-052)+(1.087)+(5.019), (I-052)+(1.087)+(5.020), (I-052)+(1.087)+(5.021), (I-052)+(1.087)+(5.022), (I-052)+(1.087)+(5.023), (I-052)+(1.087)+(6.001), (I-052)+(1.087)+(6.002), (I-052)+(1.087)+(6.003), (I-052)+(1.087)+(6.004), (I-052)+(1.087)+(7.001), (I-052)+(1.087)+(7.002), (I-052)+(1.087)+(7.003), (I-052)+(1.087)+(7.004), (I-052)+(1.087)+(7.005), (I-052)+(1.087)+(7.006), (I-052)+(1.087)+(9.001), (I-052)+(1.087)+(9.002), (I-052)+(1.087)+(9.003), (I-052)+(1.087)+(9.004), (I-052)+(1.087)+(9.005), (I-052)+(1.087)+(9.006), (I-052)+(1.087)+(9.007), (I-052)+(1.087)+(9.008), (I-052)+(1.087)+(9.009), (I-052)+(1.087)+(14.001), (I-052)+(1.087)+(14.002), (I-052)+(1.087)+(15.008), (I-052)+(1.087)+(15.011), (I-052)+(1.087)+(15.012), (I-052)+(1.087)+(15.016), (I-052)+(1.087)+(15.025), (I-052)+(1.087)+(15.027), (I-052)+(1.087)+(15.047), (I-052)+(1.087)+(15.063), (I-052)+(1.087)+(15.064), (I-052)+(1.087)+(16.001), (I-052)+(1.087)+(16.002), (I-052)+(1.087)+(16.003), (I-052)+(1.087)+(16.004), (I-052)+(1.087)+(16.005), (I-052)+(1.087)+(16.006), (I-052)+(1.087)+(16.007), (I-052)+(1.087)+(16.008), (I-052)+(1.087)+(17.001), (I-052)+(1.087)+(17.002), (I-052)+(1.087)+(17.003), (I-052)+(1.087)+(17.004), (I-052)+(1.087)+(17.005), (I-052)+(1.087)+(17.006), (I-052)+(1.087)+(17.007), (I-052)+(1.087)+(17.008), (I-052)+(1.087)+(17.009), (I-052)+(1.087)+(17.010), (I-052)+(1.087)+(17.011), (I-052)+(1.087)+(17.012), (I-052)+(1.087)+(18.001), (I-052)+(1.088)+(1.089), (I-052)+(1.088)+(1.090), (I-052)+(1.088)+(1.091), (I-052)+(1.088)+(1.092), (I-052)+(1.088)+(2.001), (I-052)+(1.088)+(2.002), (I-052)+(1.088)+(2.003), (I-052)+(1.088)+(2.004), (I-052)+(1.088)+(2.005), (I-052)+(1.088)+(2.006), (I-052)+(1.088)+(2.007), (I-052)+(1.088)+(2.008), (I-052)+(1.088)+(2.009), (I-052)+(1.088)+(2.010), (I-052)+(1.088)+(2.011), (I-052)+(1.088)+(2.012), (I-052)+(1.088)+(2.013), (I-052)+(1.088)+(2.014), (I-052)+(1.088)+(2.015), (I-052)+(1.088)+(2.016), (I-052)+(1.088)+(2.017), (I-052)+(1.088)+(2.018), (I-052)+(1.088)+(2.019), (I-052)+(1.088)+(2.020), (I-052)+(1.088)+(2.021), (I-052)+(1.088)+(2.022), (I-052)+(1.088)+(2.023), (I-052)+(1.088)+(2.024), (I-052)+(1.088)+(2.025), (I-052)+(1.088)+(2.026), (I-052)+(1.088)+(2.027), (I-052)+(1.088)+(2.028), (I-052)+(1.088)+(2.029), (I-052)+(1.088)+(2.030), (I-052)+(1.088)+(2.031), (I-052)+(1.088)+(2.032), (I-052)+(1.088)+(2.033), (I-052)+(1.088)+(2.034), (I-052)+(1.088)+(2.035), (I-052)+(1.088)+(2.036), (I-052)+(1.088)+(2.037), (I-052)+(1.088)+(2.038), (I-052)+(1.088)+(2.039), (I-052)+(1.088)+(2.040), (I-052)+(1.088)+(2.041), (I-052)+(1.088)+(2.042), (I-052)+(1.088)+(2.043), (I-052)+(1.088)+(2.044), (I-052)+(1.088)+(2.045), (I-052)+(1.088)+(2.046), (I-052)+(1.088)+(2.047), (I-052)+(1.088)+(2.048), (I-052)+(1.088)+(2.049), (I-052)+(1.088)+(2.050), (I-052)+(1.088)+(2.051), (I-052)+(1.088)+(2.052), (I-052)+(1.088)+(2.053), (I-052)+(1.088)+(2.054), (I-052)+(1.088)+(2.055), (I-052)+(1.088)+(2.056), (I-052)+(1.088)+(2.057), (I-052)+(1.088)+(2.058), (I-052)+(1.088)+(2.059), (I-052)+(1.088)+(3.001), (I-052)+(1.088)+(3.002), (I-052)+(1.088)+(3.003), (I-052)+(1.088)+(3.004), (I-052)+(1.088)+(3.005), (I-052)+(1.088)+(3.006), (I-052)+(1.088)+(3.007), (I-052)+(1.088)+(3.008), (I-052)+(1.088)+(3.009), (I-052)+(1.088)+(3.010), (I-052)+(1.088)+(3.011), (I-052)+(1.088)+(3.012), (I-052)+(1.088)+(3.013), (I-052)+(1.088)+(3.014), (I-052)+(1.088)+(3.015), (I-052)+(1.088)+(3.016), (I-052)+(1.088)+(3.017), (I-052)+(1.088)+(3.018), (I-052)+(1.088)+(3.019), (I-052)+(1.088)+(3.020), (I-052)+(1.088)+(3.021), (I-052)+(1.088)+(3.022), (I-052)+(1.088)+(3.023), (I-052)+(1.088)+(3.024), (I-052)+(1.088)+(3.025), (I-052)+(1.088)+(3.026), (I-052)+(1.088)+(3.027), (I-052)+(1.088)+(3.028), (I-052)+(1.088)+(3.029), (I-052)+(1.088)+(3.030), (I-052)+(1.088)+(3.031), (I-052)+(1.088)+(5.001), (I-052)+(1.088)+(5.002), (I-052)+(1.088)+(5.003), (I-052)+(1.088)+(5.004), (I-052)+(1.088)+(5.005), (I-052)+(1.088)+(5.006), (I-052)+(1.088)+(5.007), (I-052)+(1.088)+(5.008), (I-052)+(1.088)+(5.009), (I-052)+(1.088)+(5.010), (I-052)+(1.088)+(5.011), (I-052)+(1.088)+(5.012), (I-052)+(1.088)+(5.013), (I-052)+(1.088)+(5.014), (I-052)+(1.088)+(5.015), (I-052)+(1.088)+(5.016), (I-052)+(1.088)+(5.017), (I-052)+(1.088)+(5.018), (I-052)+(1.088)+(5.019), (I-052)+(1.088)+(5.020), (I-052)+(1.088)+(5.021), (I-052)+(1.088)+(5.022), (I-052)+(1.088)+(5.023), (I-052)+(1.088)+(6.001), (I-052)+(1.088)+(6.002), (I-052)+(1.088)+(6.003), (I-052)+(1.088)+(6.004), (I-052)+(1.088)+(7.001), (I-052)+(1.088)+(7.002), (I-052)+(1.088)+(7.003), (I-052)+(1.088)+(7.004), (I-052)+(1.088)+(7.005), (I-052)+(1.088)+(7.006), (I-052)+(1.088)+(9.001), (I-052)+(1.088)+(9.002), (I-052)+(1.088)+(9.003), (I-052)+(1.088)+(9.004), (I-052)+(1.088)+(9.005), (I-052)+(1.088)+(9.006), (I-052)+(1.088)+(9.007), (I-052)+(1.088)+(9.008), (I-052)+(1.088)+(9.009), (I-052)+(1.088)+(14.001), (I-052)+(1.088)+(14.002), (I-052)+(1.088)+(15.008), (I-052)+(1.088)+(15.011), (I-052)+(1.088)+(15.012), (I-052)+(1.088)+(15.016), (I-052)+(1.088)+(15.025), (I-052)+(1.088)+(15.027), (I-052)+(1.088)+(15.047), (I-052)+(1.088)+(15.063), (I-052)+(1.088)+(15.064), (I-052)+(1.088)+(16.001), (I-052)+(1.088)+(16.002), (I-052)+(1.088)+(16.003), (I-052)+(1.088)+(16.004), (I-052)+(1.088)+(16.005), (I-052)+(1.088)+(16.006), (I-052)+(1.088)+(16.007), (I-052)+(1.088)+(16.008), (I-052)+(1.088)+(17.001), (I-052)+(1.088)+(17.002), (I-052)+(1.088)+(17.003), (I-052)+(1.088)+(17.004), (I-052)+(1.088)+(17.005), (I-052)+(1.088)+(17.006), (I-052)+(1.088)+(17.007), (I-052)+(1.088)+(17.008), (I-052)+(1.088)+(17.009), (I-052)+(1.088)+(17.010), (I-052)+(1.088)+(17.011), (I-052)+(1.088)+(17.012), (I-052)+(1.088)+(18.001), (I-052)+(1.089)+(1.090), (I-052)+(1.089)+(1.091), (I-052)+(1.089)+(1.092), (I-052)+(1.089)+(2.001), (I-052)+(1.089)+(2.002), (I-052)+(1.089)+(2.003), (I-052)+(1.089)+(2.004), (I-052)+(1.089)+(2.005), (I-052)+(1.089)+(2.006), (I-052)+(1.089)+(2.007), (I-052)+(1.089)+(2.008), (I-052)+(1.089)+(2.009), (I-052)+(1.089)+(2.010), (I-052)+(1.089)+(2.011), (I-052)+(1.089)+(2.012), (I-052)+(1.089)+(2.013), (I-052)+(1.089)+(2.014), (I-052)+(1.089)+(2.015), (I-052)+(1.089)+(2.016), (I-052)+(1.089)+(2.017), (I-052)+(1.089)+(2.018), (I-052)+(1.089)+(2.019), (I-052)+(1.089)+(2.020), (I-052)+(1.089)+(2.021), (I-052)+(1.089)+(2.022), (I-052)+(1.089)+(2.023), (I-052)+(1.089)+(2.024), (I-052)+(1.089)+(2.025), (I-052)+(1.089)+(2.026), (I-052)+(1.089)+(2.027), (I-052)+(1.089)+(2.028), (I-052)+(1.089)+(2.029), (I-052)+(1.089)+(2.030), (I-052)+(1.089)+(2.031), (I-052)+(1.089)+(2.032), (I-052)+(1.089)+(2.033), (I-052)+(1.089)+(2.034), (I-052)+(1.089)+(2.035), (I-052)+(1.089)+(2.036), (I-052)+(1.089)+(2.037), (I-052)+(1.089)+(2.038), (I-052)+(1.089)+(2.039), (I-052)+(1.089)+(2.040), (I-052)+(1.089)+(2.041), (I-052)+(1.089)+(2.042), (I-052)+(1.089)+(2.043), (I-052)+(1.089)+(2.044), (I-052)+(1.089)+(2.045), (I-052)+(1.089)+(2.046), (I-052)+(1.089)+(2.047), (I-052)+(1.089)+(2.048), (I-052)+(1.089)+(2.049), (I-052)+(1.089)+(2.050), (I-052)+(1.089)+(2.051), (I-052)+(1.089)+(2.052), (I-052)+(1.089)+(2.053), (I-052)+(1.089)+(2.054), (I-052)+(1.089)+(2.055), (I-052)+(1.089)+(2.056), (I-052)+(1.089)+(2.057), (I-052)+(1.089)+(2.058), (I-052)+(1.089)+(2.059), (I-052)+(1.089)+(3.001), (I-052)+(1.089)+(3.002), (I-052)+(1.089)+(3.003), (I-052)+(1.089)+(3.004), (I-052)+(1.089)+(3.005), (I-052)+(1.089)+(3.006), (I-052)+(1.089)+(3.007), (I-052)+(1.089)+(3.008), (I-052)+(1.089)+(3.009), (I-052)+(1.089)+(3.010), (I-052)+(1.089)+(3.011), (I-052)+(1.089)+(3.012), (I-052)+(1.089)+(3.013), (I-052)+(1.089)+(3.014), (I-052)+(1.089)+(3.015), (I-052)+(1.089)+(3.016), (I-052)+(1.089)+(3.017), (I-052)+(1.089)+(3.018), (I-052)+(1.089)+(3.019), (I-052)+(1.089)+(3.020), (I-052)+(1.089)+(3.021), (I-052)+(1.089)+(3.022), (I-052)+(1.089)+(3.023), (I-052)+(1.089)+(3.024), (I-052)+(1.089)+(3.025), (I-052)+(1.089)+(3.026), (I-052)+(1.089)+(3.027), (I-052)+(1.089)+(3.028), (I-052)+(1.089)+(3.029), (I-052)+(1.089)+(3.030), (I-052)+(1.089)+(3.031), (I-052)+(1.089)+(5.001), (I-052)+(1.089)+(5.002), (I-052)+(1.089)+(5.003), (I-052)+(1.089)+(5.004), (I-052)+(1.089)+(5.005), (I-052)+(1.089)+(5.006), (I-052)+(1.089)+(5.007), (I-052)+(1.089)+(5.008), (I-052)+(1.089)+(5.009), (I-052)+(1.089)+(5.010), (I-052)+(1.089)+(5.011), (I-052)+(1.089)+(5.012), (I-052)+(1.089)+(5.013), (I-052)+(1.089)+(5.014), (I-052)+(1.089)+(5.015), (I-052)+(1.089)+(5.016), (I-052)+(1.089)+(5.017), (I-052)+(1.089)+(5.018), (I-052)+(1.089)+(5.019), (I-052)+(1.089)+(5.020), (I-052)+(1.089)+(5.021), (I-052)+(1.089)+(5.022), (I-052)+(1.089)+(5.023), (I-052)+(1.089)+(6.001), (I-052)+(1.089)+(6.002), (I-052)+(1.089)+(6.003), (I-052)+(1.089)+(6.004), (I-052)+(1.089)+(7.001), (I-052)+(1.089)+(7.002), (I-052)+(1.089)+(7.003), (I-052)+(1.089)+(7.004), (I-052)+(1.089)+(7.005), (I-052)+(1.089)+(7.006), (I-052)+(1.089)+(9.001), (I-052)+(1.089)+(9.002), (I-052)+(1.089)+(9.003), (I-052)+(1.089)+(9.004), (I-052)+(1.089)+(9.005), (I-052)+(1.089)+(9.006), (I-052)+(1.089)+(9.007), (I-052)+(1.089)+(9.008), (I-052)+(1.089)+(9.009), (I-052)+(1.089)+(14.001), (I-052)+(1.089)+(14.002), (I-052)+(1.089)+(15.008), (I-052)+(1.089)+(15.011), (I-052)+(1.089)+(15.012), (I-052)+(1.089)+(15.016), (I-052)+(1.089)+(15.025), (I-052)+(1.089)+(15.027), (I-052)+(1.089)+(15.047), (I-052)+(1.089)+(15.063), (I-052)+(1.089)+(15.064), (I-052)+(1.089)+(16.001), (I-052)+(1.089)+(16.002), (I-052)+(1.089)+(16.003), (I-052)+(1.089)+(16.004), (I-052)+(1.089)+(16.005), (I-052)+(1.089)+(16.006), (I-052)+(1.089)+(16.007), (I-052)+(1.089)+(16.008), (I-052)+(1.089)+(17.001), (I-052)+(1.089)+(17.002), (I-052)+(1.089)+(17.003), (I-052)+(1.089)+(17.004), (I-052)+(1.089)+(17.005), (I-052)+(1.089)+(17.006), (I-052)+(1.089)+(17.007), (I-052)+(1.089)+(17.008), (I-052)+(1.089)+(17.009), (I-052)+(1.089)+(17.010), (I-052)+(1.089)+(17.011), (I-052)+(1.089)+(17.012), (I-052)+(1.089)+(18.001), (I-052)+(1.090)+(1.091), (I-052)+(1.090)+(1.092), (I-052)+(1.090)+(2.001), (I-052)+(1.090)+(2.002), (I-052)+(1.090)+(2.003), (I-052)+(1.090)+(2.004), (I-052)+(1.090)+(2.005), (I-052)+(1.090)+(2.006), (I-052)+(1.090)+(2.007), (I-052)+(1.090)+(2.008), (I-052)+(1.090)+(2.009), (I-052)+(1.090)+(2.010), (I-052)+(1.090)+(2.011), (I-052)+(1.090)+(2.012), (I-052)+(1.090)+(2.013), (I-052)+(1.090)+(2.014), (I-052)+(1.090)+(2.015), (I-052)+(1.090)+(2.016), (I-052)+(1.090)+(2.017), (I-052)+(1.090)+(2.018), (I-052)+(1.090)+(2.019), (I-052)+(1.090)+(2.020), (I-052)+(1.090)+(2.021), (I-052)+(1.090)+(2.022), (I-052)+(1.090)+(2.023), (I-052)+(1.090)+(2.024), (I-052)+(1.090)+(2.025), (I-052)+(1.090)+(2.026), (I-052)+(1.090)+(2.027), (I-052)+(1.090)+(2.028), (I-052)+(1.090)+(2.029), (I-052)+(1.090)+(2.030), (I-052)+(1.090)+(2.031), (I-052)+(1.090)+(2.032), (I-052)+(1.090)+(2.033), (I-052)+(1.090)+(2.034), (I-052)+(1.090)+(2.035), (I-052)+(1.090)+(2.036), (I-052)+(1.090)+(2.037), (I-052)+(1.090)+(2.038), (I-052)+(1.090)+(2.039), (I-052)+(1.090)+(2.040), (I-052)+(1.090)+(2.041), (I-052)+(1.090)+(2.042), (I-052)+(1.090)+(2.043), (I-052)+(1.090)+(2.044), (I-052)+(1.090)+(2.045), (I-052)+(1.090)+(2.046), (I-052)+(1.090)+(2.047), (I-052)+(1.090)+(2.048), (I-052)+(1.090)+(2.049), (I-052)+(1.090)+(2.050), (I-052)+(1.090)+(2.051), (I-052)+(1.090)+(2.052), (I-052)+(1.090)+(2.053), (I-052)+(1.090)+(2.054), (I-052)+(1.090)+(2.055), (I-052)+(1.090)+(2.056), (I-052)+(1.090)+(2.057), (I-052)+(1.090)+(2.058), (I-052)+(1.090)+(2.059), (I-052)+(1.090)+(3.001), (I-052)+(1.090)+(3.002), (I-052)+(1.090)+(3.003), (I-052)+(1.090)+(3.004), (I-052)+(1.090)+(3.005), (I-052)+(1.090)+(3.006), (I-052)+(1.090)+(3.007), (I-052)+(1.090)+(3.008), (I-052)+(1.090)+(3.009), (I-052)+(1.090)+(3.010), (I-052)+(1.090)+(3.011), (I-052)+(1.090)+(3.012), (I-052)+(1.090)+(3.013), (I-052)+(1.090)+(3.014), (I-052)+(1.090)+(3.015), (I-052)+(1.090)+(3.016), (I-052)+(1.090)+(3.017), (I-052)+(1.090)+(3.018), (I-052)+(1.090)+(3.019), (I-052)+(1.090)+(3.020), (I-052)+(1.090)+(3.021), (I-052)+(1.090)+(3.022), (I-052)+(1.090)+(3.023), (I-052)+(1.090)+(3.024), (I-052)+(1.090)+(3.025), (I-052)+(1.090)+(3.026), (I-052)+(1.090)+(3.027), (I-052)+(1.090)+(3.028), (I-052)+(1.090)+(3.029), (I-052)+(1.090)+(3.030), (I-052)+(1.090)+(3.031), (I-052)+(1.090)+(5.001), (I-052)+(1.090)+(5.002), (I-052)+(1.090)+(5.003), (I-052)+(1.090)+(5.004), (I-052)+(1.090)+(5.005), (I-052)+(1.090)+(5.006), (I-052)+(1.090)+(5.007), (I-052)+(1.090)+(5.008), (I-052)+(1.090)+(5.009), (I-052)+(1.090)+(5.010), (I-052)+(1.090)+(5.011), (I-052)+(1.090)+(5.012), (I-052)+(1.090)+(5.013), (I-052)+(1.090)+(5.014), (I-052)+(1.090)+(5.015), (I-052)+(1.090)+(5.016), (I-052)+(1.090)+(5.017), (I-052)+(1.090)+(5.018), (I-052)+(1.090)+(5.019), (I-052)+(1.090)+(5.020), (I-052)+(1.090)+(5.021), (I-052)+(1.090)+(5.022), (I-052)+(1.090)+(5.023), (I-052)+(1.090)+(6.001), (I-052)+(1.090)+(6.002), (I-052)+(1.090)+(6.003), (I-052)+(1.090)+(6.004), (I-052)+(1.090)+(7.001), (I-052)+(1.090)+(7.002), (I-052)+(1.090)+(7.003), (I-052)+(1.090)+(7.004), (I-052)+(1.090)+(7.005), (I-052)+(1.090)+(7.006), (I-052)+(1.090)+(9.001), (I-052)+(1.090)+(9.002), (I-052)+(1.090)+(9.003), (I-052)+(1.090)+(9.004), (I-052)+(1.090)+(9.005), (I-052)+(1.090)+(9.006), (I-052)+(1.090)+(9.007), (I-052)+(1.090)+(9.008), (I-052)+(1.090)+(9.009), (I-052)+(1.090)+(14.001), (I-052)+(1.090)+(14.002), (I-052)+(1.090)+(15.008), (I-052)+(1.090)+(15.011), (I-052)+(1.090)+(15.012), (I-052)+(1.090)+(15.016), (I-052)+(1.090)+(15.025), (I-052)+(1.090)+(15.027), (I-052)+(1.090)+(15.047), (I-052)+(1.090)+(15.063), (I-052)+(1.090)+(15.064), (I-052)+(1.090)+(16.001), (I-052)+(1.090)+(16.002), (I-052)+(1.090)+(16.003), (I-052)+(1.090)+(16.004), (I-052)+(1.090)+(16.005), (I-052)+(1.090)+(16.006), (I-052)+(1.090)+(16.007), (I-052)+(1.090)+(16.008), (I-052)+(1.090)+(17.001), (I-052)+(1.090)+(17.002), (I-052)+(1.090)+(17.003), (I-052)+(1.090)+(17.004), (I-052)+(1.090)+(17.005), (I-052)+(1.090)+(17.006), (I-052)+(1.090)+(17.007), (I-052)+(1.090)+(17.008), (I-052)+(1.090)+(17.009), (I-052)+(1.090)+(17.010), (I-052)+(1.090)+(17.011), (I-052)+(1.090)+(17.012), (I-052)+(1.090)+(18.001), (I-052)+(1.091)+(1.092), (I-052)+(1.091)+(2.001), (I-052)+(1.091)+(2.002), (I-052)+(1.091)+(2.003), (I-052)+(1.091)+(2.004), (I-052)+(1.091)+(2.005), (I-052)+(1.091)+(2.006), (I-052)+(1.091)+(2.007), (I-052)+(1.091)+(2.008), (I-052)+(1.091)+(2.009), (I-052)+(1.091)+(2.010), (I-052)+(1.091)+(2.011), (I-052)+(1.091)+(2.012), (I-052)+(1.091)+(2.013), (I-052)+(1.091)+(2.014), (I-052)+(1.091)+(2.015), (I-052)+(1.091)+(2.016), (I-052)+(1.091)+(2.017), (I-052)+(1.091)+(2.018), (I-052)+(1.091)+(2.019), (I-052)+(1.091)+(2.020), (I-052)+(1.091)+(2.021), (I-052)+(1.091)+(2.022), (I-052)+(1.091)+(2.023), (I-052)+(1.091)+(2.024), (I-052)+(1.091)+(2.025), (I-052)+(1.091)+(2.026), (I-052)+(1.091)+(2.027), (I-052)+(1.091)+(2.028), (I-052)+(1.091)+(2.029), (I-052)+(1.091)+(2.030), (I-052)+(1.091)+(2.031), (I-052)+(1.091)+(2.032), (I-052)+(1.091)+(2.033), (I-052)+(1.091)+(2.034), (I-052)+(1.091)+(2.035), (I-052)+(1.091)+(2.036), (I-052)+(1.091)+(2.037), (I-052)+(1.091)+(2.038), (I-052)+(1.091)+(2.039), (I-052)+(1.091)+(2.040), (I-052)+(1.091)+(2.041), (I-052)+(1.091)+(2.042), (I-052)+(1.091)+(2.043), (I-052)+(1.091)+(2.044), (I-052)+(1.091)+(2.045), (I-052)+(1.091)+(2.046), (I-052)+(1.091)+(2.047), (I-052)+(1.091)+(2.048), (I-052)+(1.091)+(2.049), (I-052)+(1.091)+(2.050), (I-052)+(1.091)+(2.051), (I-052)+(1.091)+(2.052), (1-052)+(1.091)+(2.053), (I-052)+(1.091)+(2.054), (I-052)+(1.091)+(2.055), (I-052)+(1.091)+(2.056), (I-052)+(1.091)+(2.057), (I-052)+(1.091)+(2.058), (I-052)+(1.091)+(2.059), (I-052)+(1.091)+(3.001), (I-052)+(1.091)+(3.002), (I-052)+(1.091)+(3.003), (I-052)+(1.091)+(3.004), (I-052)+(1.091)+(3.005), (I-052)+(1.091)+(3.006), (I-052)+(1.091)+(3.007), (I-052)+(1.091)+(3.008), (I-052)+(1.091)+(3.009), (I-052)+(1.091)+(3.010), (I-052)+(1.091)+(3.011), (I-052)+(1.091)+(3.012), (I-052)+(1.091)+(3.013), (I-052)+(1.091)+(3.014), (I-052)+(1.091)+(3.015), (I-052)+(1.091)+(3.016), (I-052)+(1.091)+(3.017), (I-052)+(1.091)+(3.018), (I-052)+(1.091)+(3.019), (I-052)+(1.091)+(3.020), (I-052)+(1.091)+(3.021), (I-052)+(1.091)+(3.022), (I-052)+(1.091)+(3.023), (I-052)+(1.091)+(3.024), (I-052)+(1.091)+(3.025), (I-052)+(1.091)+(3.026), (I-052)+(1.091)+(3.027), (I-052)+(1.091)+(3.028), (I-052)+(1.091)+(3.029), (I-052)+(1.091)+(3.030), (I-052)+(1.091)+(3.031), (I-052)+(1.091)+(5.001), (I-052)+(1.091)+(5.002), (I-052)+(1.091)+(5.003), (I-052)+(1.091)+(5.004), (I-052)+(1.091)+(5.005), (I-052)+(1.091)+(5.006), (I-052)+(1.091)+(5.007), (I-052)+(1.091)+(5.008), (I-052)+(1.091)+(5.009), (I-052)+(1.091)+(5.010), (I-052)+(1.091)+(5.011), (I-052)+(1.091)+(5.012), (I-052)+(1.091)+(5.013), (I-052)+(1.091)+(5.014), (I-052)+(1.091)+(5.015), (I-052)+(1.091)+(5.016), (I-052)+(1.091)+(5.017), (I-052)+(1.091)+(5.018), (I-052)+(1.091)+(5.019), (I-052)+(1.091)+(5.020), (I-052)+(1.091)+(5.021), (I-052)+(1.091)+(5.022), (I-052)+(1.091)+(5.023), (I-052)+(1.091)+(6.001), (I-052)+(1.091)+(6.002), (I-052)+(1.091)+(6.003), (I-052)+(1.091)+(6.004), (I-052)+(1.091)+(7.001), (I-052)+(1.091)+(7.002), (I-052)+(1.091)+(7.003), (I-052)+(1.091)+(7.004), (I-052)+(1.091)+(7.005), (I-052)+(1.091)+(7.006), (I-052)+(1.091)+(9.001), (I-052)+(1.091)+(9.002), (I-052)+(1.091)+(9.003), (I-052)+(1.091)+(9.004), (I-052)+(1.091)+(9.005), (I-052)+(1.091)+(9.006), (I-052)+(1.091)+(9.007), (I-052)+(1.091)+(9.008), (I-052)+(1.091)+(9.009), (I-052)+(1.091)+(14.001), (I-052)+(1.091)+(14.002), (I-052)+(1.091)+(15.008), (I-052)+(1.091)+(15.011), (I-052)+(1.091)+(15.012), (I-052)+(1.091)+(15.016), (I-052)+(1.091)+(15.025), (I-052)+(1.091)+(15.027), (I-052)+(1.091)+(15.047), (I-052)+(1.091)+(15.063), (I-052)+(1.091)+(15.064), (I-052)+(1.091)+(16.001), (I-052)+(1.091)+(16.002), (I-052)+(1.091)+(16.003), (I-052)+(1.091)+(16.004), (I-052)+(1.091)+(16.005), (I-052)+(1.091)+(16.006), (I-052)+(1.091)+(16.007), (I-052)+(1.091)+(16.008), (I-052)+(1.091)+(17.001), (I-052)+(1.091)+(17.002), (I-052)+(1.091)+(17.003), (I-052)+(1.091)+(17.004), (I-052)+(1.091)+(17.005), (I-052)+(1.091)+(17.006), (I-052)+(1.091)+(17.007), (I-052)+(1.091)+(17.008), (I-052)+(1.091)+(17.009), (I-052)+(1.091)+(17.010), (I-052)+(1.091)+(17.011), (I-052)+(1.091)+(17.012), (I-052)+(1.091)+(18.001), (I-052)+(1.092)+(2.001), (I-052)+(1.092)+(2.002), (I-052)+(1.092)+(2.003), (I-052)+(1.092)+(2.004), (I-052)+(1.092)+(2.005), (I-052)+(1.092)+(2.006), (I-052)+(1.092)+(2.007), (I-052)+(1.092)+(2.008), (I-052)+(1.092)+(2.009), (I-052)+(1.092)+(2.010), (I-052)+(1.092)+(2.011), (I-052)+(1.092)+(2.012), (I-052)+(1.092)+(2.013), (I-052)+(1.092)+(2.014), (I-052)+(1.092)+(2.015), (I-052)+(1.092)+(2.016), (I-052)+(1.092)+(2.017), (I-052)+(1.092)+(2.018), (I-052)+(1.092)+(2.019), (I-052)+(1.092)+(2.020), (I-052)+(1.092)+(2.021), (I-052)+(1.092)+(2.022), (I-052)+(1.092)+(2.023), (I-052)+(1.092)+(2.024), (I-052)+(1.092)+(2.025), (I-052)+(1.092)+(2.026), (I-052)+(1.092)+(2.027), (I-052)+(1.092)+(2.028), (I-052)+(1.092)+(2.029), (I-052)+(1.092)+(2.030), (I-052)+(1.092)+(2.031), (I-052)+(1.092)+(2.032), (I-052)+(1.092)+(2.033), (I-052)+(1.092)+(2.034), (I-052)+(1.092)+(2.035), (I-052)+(1.092)+(2.036), (I-052)+(1.092)+(2.037), (I-052)+(1.092)+(2.038), (I-052)+(1.092)+(2.039), (I-052)+(1.092)+(2.040), (I-052)+(1.092)+(2.041), (I-052)+(1.092)+(2.042), (I-052)+(1.092)+(2.043), (I-052)+(1.092)+(2.044), (I-052)+(1.092)+(2.045), (I-052)+(1.092)+(2.046), (I-052)+(1.092)+(2.047), (I-052)+(1.092)+(2.048), (I-052)+(1.092)+(2.049), (I-052)+(1.092)+(2.050), (I-052)+(1.092)+(2.051), (I-052)+(1.092)+(2.052), (I-052)+(1.092)+(2.053), (I-052)+(1.092)+(2.054), (I-052)+(1.092)+(2.055), (I-052)+(1.092)+(2.056), (I-052)+(1.092)+(2.057), (I-052)+(1.092)+(2.058), (I-052)+(1.092)+(2.059), (I-052)+(1.092)+(3.001), (I-052)+(1.092)+(3.002), (I-052)+(1.092)+(3.003), (I-052)+(1.092)+(3.004), (I-052)+(1.092)+(3.005), (I-052)+(1.092)+(3.006), (I-052)+(1.092)+(3.007), (I-052)+(1.092)+(3.008), (I-052)+(1.092)+(3.009), (I-052)+(1.092)+(3.010), (I-052)+(1.092)+(3.011), (I-052)+(1.092)+(3.012), (I-052)+(1.092)+(3.013), (I-052)+(1.092)+(3.014), (I-052)+(1.092)+(3.015), (I-052)+(1.092)+(3.016), (I-052)+(1.092)+(3.017), (I-052)+(1.092)+(3.018), (I-052)+(1.092)+(3.019), (I-052)+(1.092)+(3.020), (I-052)+(1.092)+(3.021), (I-052)+(1.092)+(3.022), (I-052)+(1.092)+(3.023), (I-052)+(1.092)+(3.024), (I-052)+(1.092)+(3.025), (I-052)+(1.092)+(3.026), (I-052)+(1.092)+(3.027), (I-052)+(1.092)+(3.028), (I-052)+(1.092)+(3.029), (I-052)+(1.092)+(3.030), (I-052)+(1.092)+(3.031), (I-052)+(1.092)+(5.001), (I-052)+(1.092)+(5.002), (I-052)+(1.092)+(5.003), (I-052)+(1.092)+(5.004), (I-052)+(1.092)+(5.005), (I-052)+(1.092)+(5.006), (I-052)+(1.092)+(5.007), (I-052)+(1.092)+(5.008), (I-052)+(1.092)+(5.009), (I-052)+(1.092)+(5.010), (I-052)+(1.092)+(5.011), (I-052)+(1.092)+(5.012), (I-052)+(1.092)+(5.013), (I-052)+(1.092)+(5.014), (I-052)+(1.092)+(5.015), (I-052)+(1.092)+(5.016), (I-052)+(1.092)+(5.017), (I-052)+(1.092)+(5.018), (I-052)+(1.092)+(5.019), (I-052)+(1.092)+(5.020), (I-052)+(1.092)+(5.021), (I-052)+(1.092)+(5.022), (I-052)+(1.092)+(5.023), (I-052)+(1.092)+(6.001), (I-052)+(1.092)+(6.002), (I-052)+(1.092)+(6.003), (I-052)+(1.092)+(6.004), (I-052)+(1.092)+(7.001), (I-052)+(1.092)+(7.002), (I-052)+(1.092)+(7.003), (I-052)+(1.092)+(7.004), (I-052)+(1.092)+(7.005), (I-052)+(1.092)+(7.006), (I-052)+(1.092)+(9.001), (I-052)+(1.092)+(9.002), (I-052)+(1.092)+(9.003), (I-052)+(1.092)+(9.004), (I-052)+(1.092)+(9.005), (I-052)+(1.092)+(9.006), (I-052)+(1.092)+(9.007), (I-052)+(1.092)+(9.008), (I-052)+(1.092)+(9.009), (I-052)+(1.092)+(14.001), (I-052)+(1.092)+(14.002), (I-052)+(1.092)+(15.008), (I-052)+(1.092)+(15.011), (I-052)+(1.092)+(15.012), (I-052)+(1.092)+(15.016), (I-052)+(1.092)+(15.025), (I-052)+(1.092)+(15.027), (I-052)+(1.092)+(15.047), (I-052)+(1.092)+(15.063), (I-052)+(1.092)+(15.064), (I-052)+(1.092)+(16.001), (I-052)+(1.092)+(16.002), (I-052)+(1.092)+(16.003), (I-052)+(1.092)+(16.004), (I-052)+(1.092)+(16.005), (I-052)+(1.092)+(16.006), (I-052)+(1.092)+(16.007), (I-052)+(1.092)+(16.008), (I-052)+(1.092)+(17.001), (I-052)+(1.092)+(17.002), (I-052)+(1.092)+(17.003), (I-052)+(1.092)+(17.004), (I-052)+(1.092)+(17.005), (I-052)+(1.092)+(17.006), (I-052)+(1.092)+(17.007), (I-052)+(1.092)+(17.008), (I-052)+(1.092)+(17.009), (I-052)+(1.092)+(17.010), (I-052)+(1.092)+(17.011), (I-052)+(1.092)+(17.012), (I-052)+(1.092)+(18.001), (I-052)+(2.001)+(3.001), (I-052)+(2.001)+(3.002), (I-052)+(2.001)+(3.003), (I-052)+(2.001)+(3.004), (I-052)+(2.001)+(3.005), (I-052)+(2.001)+(3.006), (I-052)+(2.001)+(3.007), (I-052)+(2.001)+(3.008), (I-052)+(2.001)+(3.009), (I-052)+(2.001)+(3.010), (I-052)+(2.001)+(3.011), (I-052)+(2.001)+(3.012), (I-052)+(2.001)+(3.013), (I-052)+(2.001)+(3.014), (I-052)+(2.001)+(3.015), (I-052)+(2.001)+(3.016), (I-052)+(2.001)+(3.017), (I-052)+(2.001)+(3.018), (I-052)+(2.001)+(3.019), (I-052)+(2.001)+(3.020), (I-052)+(2.001)+(3.021), (I-052)+(2.001)+(3.022), (I-052)+(2.001)+(3.023), (I-052)+(2.001)+(3.024), (I-052)+(2.001)+(3.025), (I-052)+(2.001)+(3.026), (I-052)+(2.001)+(3.027), (I-052)+(2.001)+(3.028), (I-052)+(2.001)+(3.029), (I-052)+(2.001)+(3.030), (I-052)+(2.001)+(3.031), (I-052)+(2.001)+(5.001), (I-052)+(2.001)+(5.002), (I-052)+(2.001)+(5.003), (I-052)+(2.001)+(5.004), (I-052)+(2.001)+(5.005), (I-052)+(2.001)+(5.006), (I-052)+(2.001)+(5.007), (I-052)+(2.001)+(5.008), (I-052)+(2.001)+(5.009), (I-052)+(2.001)+(5.010), (I-052)+(2.001)+(5.011), (I-052)+(2.001)+(5.012), (I-052)+(2.001)+(5.013), (I-052)+(2.001)+(5.014), (I-052)+(2.001)+(5.015), (I-052)+(2.001)+(5.016), (I-052)+(2.001)+(5.017), (I-052)+(2.001)+(5.018), (I-052)+(2.001)+(5.019), (I-052)+(2.001)+(5.020), (I-052)+(2.001)+(5.021), (I-052)+(2.001)+(5.022), (I-052)+(2.001)+(5.023), (I-052)+(2.001)+(6.001), (I-052)+(2.001)+(6.002), (I-052)+(2.001)+(6.003), (I-052)+(2.001)+(6.004), (I-052)+(2.001)+(7.001), (I-052)+(2.001)+(7.002), (I-052)+(2.001)+(7.003), (I-052)+(2.001)+(7.004), (I-052)+(2.001)+(7.005), (I-052)+(2.001)+(7.006), (I-052)+(2.001)+(9.001), (I-052)+(2.001)+(9.002), (I-052)+(2.001)+(9.003), (I-052)+(2.001)+(9.004), (I-052)+(2.001)+(9.005), (I-052)+(2.001)+(9.006), (I-052)+(2.001)+(9.007), (I-052)+(2.001)+(9.008), (I-052)+(2.001)+(9.009), (I-052)+(2.001)+(14.001), (I-052)+(2.001)+(14.002), (I-052)+(2.001)+(15.008), (I-052)+(2.001)+(15.011), (I-052)+(2.001)+(15.012), (I-052)+(2.001)+(15.016), (I-052)+(2.001)+(15.025), (I-052)+(2.001)+(15.027), (I-052)+(2.001)+(15.047), (I-052)+(2.001)+(15.063), (I-052)+(2.001)+(15.064), (I-052)+(2.001)+(16.001), (I-052)+(2.001)+(16.002), (I-052)+(2.001)+(16.003), (I-052)+(2.001)+(16.004), (I-052)+(2.001)+(16.005), (I-052)+(2.001)+(16.006), (I-052)+(2.001)+(16.007), (I-052)+(2.001)+(16.008), (I-052)+(2.001)+(17.001), (I-052)+(2.001)+(17.002), (I-052)+(2.001)+(17.003), (I-052)+(2.001)+(17.004), (I-052)+(2.001)+(17.005), (I-052)+(2.001)+(17.006), (I-052)+(2.001)+(17.007), (I-052)+(2.001)+(17.008), (I-052)+(2.001)+(17.009), (I-052)+(2.001)+(17.010), (I-052)+(2.001)+(17.011), (I-052)+(2.001)+(17.012), (I-052)+(2.001)+(18.001), (I-052)+(2.002)+(3.001), (I-052)+(2.002)+(3.002), (I-052)+(2.002)+(3.003), (I-052)+(2.002)+(3.004), (I-052)+(2.002)+(3.005), (I-052)+(2.002)+(3.006), (I-052)+(2.002)+(3.007), (I-052)+(2.002)+(3.008), (I-052)+(2.002)+(3.009), (I-052)+(2.002)+(3.010), (I-052)+(2.002)+(3.011), (I-052)+(2.002)+(3.012), (I-052)+(2.002)+(3.013), (I-052)+(2.002)+(3.014), (I-052)+(2.002)+(3.015), (I-052)+(2.002)+(3.016), (I-052)+(2.002)+(3.017), (I-052)+(2.002)+(3.018), (I-052)+(2.002)+(3.019), (I-052)+(2.002)+(3.020), (I-052)+(2.002)+(3.021), (I-052)+(2.002)+(3.022), (I-052)+(2.002)+(3.023), (I-052)+(2.002)+(3.024), (I-052)+(2.002)+(3.025), (I-052)+(2.002)+(3.026), (I-052)+(2.002)+(3.027), (I-052)+(2.002)+(3.028), (I-052)+(2.002)+(3.029), (I-052)+(2.002)+(3.030), (I-052)+(2.002)+(3.031), (I-052)+(2.002)+(5.001), (I-052)+(2.002)+(5.002), (I-052)+(2.002)+(5.003), (I-052)+(2.002)+(5.004), (I-052)+(2.002)+(5.005), (I-052)+(2.002)+(5.006), (I-052)+(2.002)+(5.007), (I-052)+(2.002)+(5.008), (I-052)+(2.002)+(5.009), (I-052)+(2.002)+(5.010), (I-052)+(2.002)+(5.011), (I-052)+(2.002)+(5.012), (I-052)+(2.002)+(5.013), (I-052)+(2.002)+(5.014), (I-052)+(2.002)+(5.015), (I-052)+(2.002)+(5.016), (I-052)+(2.002)+(5.017), (I-052)+(2.002)+(5.018), (I-052)+(2.002)+(5.019), (I-052)+(2.002)+(5.020), (I-052)+(2.002)+(5.021), (I-052)+(2.002)+(5.022), (I-052)+(2.002)+(5.023), (I-052)+(2.002)+(6.001), (I-052)+(2.002)+(6.002), (I-052)+(2.002)+(6.003), (I-052)+(2.002)+(6.004), (I-052)+(2.002)+(7.001), (I-052)+(2.002)+(7.002), (I-052)+(2.002)+(7.003), (I-052)+(2.002)+(7.004), (I-052)+(2.002)+(7.005), (I-052)+(2.002)+(7.006), (I-052)+(2.002)+(9.001), (I-052)+(2.002)+(9.002), (I-052)+(2.002)+(9.003), (I-052)+(2.002)+(9.004), (I-052)+(2.002)+(9.005), (I-052)+(2.002)+(9.006), (I-052)+(2.002)+(9.007), (I-052)+(2.002)+(9.008), (I-052)+(2.002)+(9.009), (I-052)+(2.002)+(14.001), (I-052)+(2.002)+(14.002), (I-052)+(2.002)+(15.008), (I-052)+(2.002)+(15.011), (I-052)+(2.002)+(15.012), (I-052)+(2.002)+(15.016), (I-052)+(2.002)+(15.025), (I-052)+(2.002)+(15.027), (I-052)+(2.002)+(15.047), (I-052)+(2.002)+(15.063), (I-052)+(2.002)+(15.064), (I-052)+(2.002)+(16.001), (I-052)+(2.002)+(16.002), (I-052)+(2.002)+(16.003), (I-052)+(2.002)+(16.004), (I-052)+(2.002)+(16.005), (I-052)+(2.002)+(16.006), (I-052)+(2.002)+(16.007), (I-052)+(2.002)+(16.008), (I-052)+(2.002)+(17.001), (I-052)+(2.002)+(17.002), (I-052)+(2.002)+(17.003), (I-052)+(2.002)+(17.004), (I-052)+(2.002)+(17.005), (I-052)+(2.002)+(17.006), (I-052)+(2.002)+(17.007), (I-052)+(2.002)+(17.008), (I-052)+(2.002)+(17.009), (I-052)+(2.002)+(17.010), (I-052)+(2.002)+(17.011), (I-052)+(2.002)+(17.012), (I-052)+(2.002)+(18.001), (I-052)+(2.003)+(3.001), (I-052)+(2.003)+(3.002), (I-052)+(2.003)+(3.003), (I-052)+(2.003)+(3.004), (I-052)+(2.003)+(3.005), (I-052)+(2.003)+(3.006), (I-052)+(2.003)+(3.007), (I-052)+(2.003)+(3.008), (I-052)+(2.003)+(3.009), (I-052)+(2.003)+(3.010), (I-052)+(2.003)+(3.011), (I-052)+(2.003)+(3.012), (I-052)+(2.003)+(3.013), (I-052)+(2.003)+(3.014), (I-052)+(2.003)+(3.015), (I-052)+(2.003)+(3.016), (I-052)+(2.003)+(3.017), (I-052)+(2.003)+(3.018), (I-052)+(2.003)+(3.019), (I-052)+(2.003)+(3.020), (I-052)+(2.003)+(3.021), (I-052)+(2.003)+(3.022), (I-052)+(2.003)+(3.023), (I-052)+(2.003)+(3.024), (I-052)+(2.003)+(3.025), (I-052)+(2.003)+(3.026), (I-052)+(2.003)+(3.027), (I-052)+(2.003)+(3.028), (I-052)+(2.003)+(3.029), (I-052)+(2.003)+(3.030), (I-052)+(2.003)+(3.031), (I-052)+(2.003)+(5.001), (I-052)+(2.003)+(5.002), (I-052)+(2.003)+(5.003), (I-052)+(2.003)+(5.004), (I-052)+(2.003)+(5.005), (I-052)+(2.003)+(5.006), (I-052)+(2.003)+(5.007), (I-052)+(2.003)+(5.008), (I-052)+(2.003)+(5.009), (I-052)+(2.003)+(5.010), (I-052)+(2.003)+(5.011), (I-052)+(2.003)+(5.012), (I-052)+(2.003)+(5.013), (I-052)+(2.003)+(5.014), (I-052)+(2.003)+(5.015), (I-052)+(2.003)+(5.016), (I-052)+(2.003)+(5.017), (I-052)+(2.003)+(5.018), (I-052)+(2.003)+(5.019), (I-052)+(2.003)+(5.020), (I-052)+(2.003)+(5.021), (I-052)+(2.003)+(5.022), (I-052)+(2.003)+(5.023), (I-052)+(2.003)+(6.001), (I-052)+(2.003)+(6.002), (I-052)+(2.003)+(6.003), (I-052)+(2.003)+(6.004), (I-052)+(2.003)+(7.001), (I-052)+(2.003)+(7.002), (I-052)+(2.003)+(7.003), (I-052)+(2.003)+(7.004), (I-052)+(2.003)+(7.005), (I-052)+(2.003)+(7.006), (I-052)+(2.003)+(9.001), (I-052)+(2.003)+(9.002), (I-052)+(2.003)+(9.003), (I-052)+(2.003)+(9.004), (I-052)+(2.003)+(9.005), (I-052)+(2.003)+(9.006), (I-052)+(2.003)+(9.007), (I-052)+(2.003)+(9.008), (I-052)+(2.003)+(9.009), (I-052)+(2.003)+(14.001), (I-052)+(2.003)+(14.002), (I-052)+(2.003)+(15.008), (I-052)+(2.003)+(15.011), (I-052)+(2.003)+(15.012), (I-052)+(2.003)+(15.016), (I-052)+(2.003)+(15.025), (I-052)+(2.003)+(15.027), (I-052)+(2.003)+(15.047), (I-052)+(2.003)+(15.063), (I-052)+(2.003)+(15.064), (I-052)+(2.003)+(16.001), (I-052)+(2.003)+(16.002), (I-052)+(2.003)+(16.003), (I-052)+(2.003)+(16.004), (I-052)+(2.003)+(16.005), (I-052)+(2.003)+(16.006), (I-052)+(2.003)+(16.007), (I-052)+(2.003)+(16.008), (I-052)+(2.003)+(17.001), (I-052)+(2.003)+(17.002), (I-052)+(2.003)+(17.003), (I-052)+(2.003)+(17.004), (I-052)+(2.003)+(17.005), (I-052)+(2.003)+(17.006), (I-052)+(2.003)+(17.007), (I-052)+(2.003)+(17.008), (I-052)+(2.003)+(17.009), (I-052)+(2.003)+(17.010), (I-052)+(2.003)+(17.011), (I-052)+(2.003)+(17.012), (I-052)+(2.003)+(18.001), (I-052)+(2.004)+(3.001), (I-052)+(2.004)+(3.002), (I-052)+(2.004)+(3.003), (I-052)+(2.004)+(3.004), (I-052)+(2.004)+(3.005), (I-052)+(2.004)+(3.006), (I-052)+(2.004)+(3.007), (I-052)+(2.004)+(3.008), (I-052)+(2.004)+(3.009), (I-052)+(2.004)+(3.010), (I-052)+(2.004)+(3.011), (I-052)+(2.004)+(3.012), (I-052)+(2.004)+(3.013), (I-052)+(2.004)+(3.014), (I-052)+(2.004)+(3.015), (I-052)+(2.004)+(3.016), (I-052)+(2.004)+(3.017), (I-052)+(2.004)+(3.018), (I-052)+(2.004)+(3.019), (I-052)+(2.004)+(3.020), (I-052)+(2.004)+(3.021), (I-052)+(2.004)+(3.022), (I-052)+(2.004)+(3.023), (I-052)+(2.004)+(3.024), (I-052)+(2.004)+(3.025), (I-052)+(2.004)+(3.026), (I-052)+(2.004)+(3.027), (I-052)+(2.004)+(3.028), (I-052)+(2.004)+(3.029), (I-052)+(2.004)+(3.030), (I-052)+(2.004)+(3.031), (I-052)+(2.004)+(5.001), (I-052)+(2.004)+(5.002), (I-052)+(2.004)+(5.003), (I-052)+(2.004)+(5.004), (I-052)+(2.004)+(5.005), (I-052)+(2.004)+(5.006), (I-052)+(2.004)+(5.007), (I-052)+(2.004)+(5.008), (I-052)+(2.004)+(5.009), (I-052)+(2.004)+(5.010), (I-052)+(2.004)+(5.011), (I-052)+(2.004)+(5.012), (I-052)+(2.004)+(5.013), (I-052)+(2.004)+(5.014), (I-052)+(2.004)+(5.015), (I-052)+(2.004)+(5.016), (I-052)+(2.004)+(5.017), (I-052)+(2.004)+(5.018), (I-052)+(2.004)+(5.019), (I-052)+(2.004)+(5.020), (I-052)+(2.004)+(5.021), (I-052)+(2.004)+(5.022), (I-052)+(2.004)+(5.023), (I-052)+(2.004)+(6.001), (I-052)+(2.004)+(6.002), (I-052)+(2.004)+(6.003), (I-052)+(2.004)+(6.004), (I-052)+(2.004)+(7.001), (I-052)+(2.004)+(7.002), (I-052)+(2.004)+(7.003), (I-052)+(2.004)+(7.004), (I-052)+(2.004)+(7.005), (I-052)+(2.004)+(7.006), (I-052)+(2.004)+(9.001), (I-052)+(2.004)+(9.002), (I-052)+(2.004)+(9.003), (I-052)+(2.004)+(9.004), (I-052)+(2.004)+(9.005), (I-052)+(2.004)+(9.006), (I-052)+(2.004)+(9.007), (I-052)+(2.004)+(9.008), (I-052)+(2.004)+(9.009), (I-052)+(2.004)+(14.001), (I-052)+(2.004)+(14.002), (I-052)+(2.004)+(15.008), (I-052)+(2.004)+(15.011), (I-052)+(2.004)+(15.012), (I-052)+(2.004)+(15.016), (I-052)+(2.004)+(15.025), (I-052)+(2.004)+(15.027), (I-052)+(2.004)+(15.047), (I-052)+(2.004)+(15.063), (I-052)+(2.004)+(15.064), (I-052)+(2.004)+(16.001), (I-052)+(2.004)+(16.002), (I-052)+(2.004)+(16.003), (I-052)+(2.004)+(16.004), (I-052)+(2.004)+(16.005), (I-052)+(2.004)+(16.006), (I-052)+(2.004)+(16.007), (I-052)+(2.004)+(16.008), (I-052)+(2.004)+(17.001), (I-052)+(2.004)+(17.002), (I-052)+(2.004)+(17.003), (I-052)+(2.004)+(17.004), (I-052)+(2.004)+(17.005), (I-052)+(2.004)+(17.006), (I-052)+(2.004)+(17.007), (I-052)+(2.004)+(17.008), (I-052)+(2.004)+(17.009), (I-052)+(2.004)+(17.010), (I-052)+(2.004)+(17.011), (I-052)+(2.004)+(17.012), (I-052)+(2.004)+(18.001), (I-052)+(2.005)+(3.001), (I-052)+(2.005)+(3.002), (I-052)+(2.005)+(3.003), (I-052)+(2.005)+(3.004), (I-052)+(2.005)+(3.005), (I-052)+(2.005)+(3.006), (I-052)+(2.005)+(3.007), (I-052)+(2.005)+(3.008), (I-052)+(2.005)+(3.009), (I-052)+(2.005)+(3.010), (I-052)+(2.005)+(3.011), (I-052)+(2.005)+(3.012), (I-052)+(2.005)+(3.013), (I-052)+(2.005)+(3.014), (I-052)+(2.005)+(3.015), (I-052)+(2.005)+(3.016), (I-052)+(2.005)+(3.017), (I-052)+(2.005)+(3.018), (I-052)+(2.005)+(3.019), (I-052)+(2.005)+(3.020), (I-052)+(2.005)+(3.021), (I-052)+(2.005)+(3.022), (I-052)+(2.005)+(3.023), (I-052)+(2.005)+(3.024), (I-052)+(2.005)+(3.025), (I-052)+(2.005)+(3.026), (I-052)+(2.005)+(3.027), (I-052)+(2.005)+(3.028), (I-052)+(2.005)+(3.029), (I-052)+(2.005)+(3.030), (I-052)+(2.005)+(3.031), (I-052)+(2.005)+(5.001), (I-052)+(2.005)+(5.002), (I-052)+(2.005)+(5.003), (I-052)+(2.005)+(5.004), (I-052)+(2.005)+(5.005), (I-052)+(2.005)+(5.006), (I-052)+(2.005)+(5.007), (I-052)+(2.005)+(5.008), (I-052)+(2.005)+(5.009), (I-052)+(2.005)+(5.010), (I-052)+(2.005)+(5.011), (I-052)+(2.005)+(5.012), (I-052)+(2.005)+(5.013), (I-052)+(2.005)+(5.014), (I-052)+(2.005)+(5.015), (I-052)+(2.005)+(5.016), (I-052)+(2.005)+(5.017), (I-052)+(2.005)+(5.018), (I-052)+(2.005)+(5.019), (I-052)+(2.005)+(5.020), (I-052)+(2.005)+(5.021), (I-052)+(2.005)+(5.022), (I-052)+(2.005)+(5.023), (I-052)+(2.005)+(6.001), (I-052)+(2.005)+(6.002), (I-052)+(2.005)+(6.003), (I-052)+(2.005)+(6.004), (I-052)+(2.005)+(7.001), (I-052)+(2.005)+(7.002), (I-052)+(2.005)+(7.003), (I-052)+(2.005)+(7.004), (I-052)+(2.005)+(7.005), (I-052)+(2.005)+(7.006), (I-052)+(2.005)+(9.001), (I-052)+(2.005)+(9.002), (I-052)+(2.005)+(9.003), (I-052)+(2.005)+(9.004), (I-052)+(2.005)+(9.005), (I-052)+(2.005)+(9.006), (I-052)+(2.005)+(9.007), (I-052)+(2.005)+(9.008), (I-052)+(2.005)+(9.009), (I-052)+(2.005)+(14.001), (I-052)+(2.005)+(14.002), (I-052)+(2.005)+(15.008), (I-052)+(2.005)+(15.011), (I-052)+(2.005)+(15.012), (I-052)+(2.005)+(15.016), (I-052)+(2.005)+(15.025), (I-052)+(2.005)+(15.027), (I-052)+(2.005)+(15.047), (I-052)+(2.005)+(15.063), (I-052)+(2.005)+(15.064), (I-052)+(2.005)+(16.001), (I-052)+(2.005)+(16.002), (I-052)+(2.005)+(16.003), (I-052)+(2.005)+(16.004), (I-052)+(2.005)+(16.005), (I-052)+(2.005)+(16.006), (I-052)+(2.005)+(16.007), (I-052)+(2.005)+(16.008), (I-052)+(2.005)+(17.001), (I-052)+(2.005)+(17.002), (I-052)+(2.005)+(17.003), (I-052)+(2.005)+(17.004), (I-052)+(2.005)+(17.005), (I-052)+(2.005)+(17.006), (I-052)+(2.005)+(17.007), (I-052)+(2.005)+(17.008), (I-052)+(2.005)+(17.009), (I-052)+(2.005)+(17.010), (I-052)+(2.005)+(17.011), (I-052)+(2.005)+(17.012), (I-052)+(2.005)+(18.001), (I-052)+(2.006)+(3.001), (I-052)+(2.006)+(3.002), (I-052)+(2.006)+(3.003), (I-052)+(2.006)+(3.004), (I-052)+(2.006)+(3.005), (I-052)+(2.006)+(3.006), (I-052)+(2.006)+(3.007), (I-052)+(2.006)+(3.008), (I-052)+(2.006)+(3.009), (I-052)+(2.006)+(3.010), (I-052)+(2.006)+(3.011), (I-052)+(2.006)+(3.012), (I-052)+(2.006)+(3.013), (I-052)+(2.006)+(3.014), (I-052)+(2.006)+(3.015), (I-052)+(2.006)+(3.016), (I-052)+(2.006)+(3.017), (I-052)+(2.006)+(3.018), (I-052)+(2.006)+(3.019), (I-052)+(2.006)+(3.020), (I-052)+(2.006)+(3.021), (I-052)+(2.006)+(3.022), (I-052)+(2.006)+(3.023), (I-052)+(2.006)+(3.024), (I-052)+(2.006)+(3.025), (I-052)+(2.006)+(3.026), (I-052)+(2.006)+(3.027), (I-052)+(2.006)+(3.028), (I-052)+(2.006)+(3.029), (I-052)+(2.006)+(3.030), (I-052)+(2.006)+(3.031), (I-052)+(2.006)+(5.001), (I-052)+(2.006)+(5.002), (I-052)+(2.006)+(5.003), (I-052)+(2.006)+(5.004), (I-052)+(2.006)+(5.005), (I-052)+(2.006)+(5.006), (I-052)+(2.006)+(5.007), (I-052)+(2.006)+(5.008), (I-052)+(2.006)+(5.009), (I-052)+(2.006)+(5.010), (I-052)+(2.006)+(5.011), (I-052)+(2.006)+(5.012), (I-052)+(2.006)+(5.013), (I-052)+(2.006)+(5.014), (I-052)+(2.006)+(5.015), (I-052)+(2.006)+(5.016), (I-052)+(2.006)+(5.017), (I-052)+(2.006)+(5.018), (I-052)+(2.006)+(5.019), (I-052)+(2.006)+(5.020), (I-052)+(2.006)+(5.021),
(I-052)+(2.006)+(5.022), (I-052)+(2.006)+(5.023),
(I-052)+(2.006)+(6.001), (I-052)+(2.006)+(6.002),
(I-052)+(2.006)+(6.003), (I-052)+(2.006)+(6.004),
(I-052)+(2.006)+(7.001), (I-052)+(2.006)+(7.002),
(I-052)+(2.006)+(7.003), (I-052)+(2.006)+(7.004),
(I-052)+(2.006)+(7.005), (I-052)+(2.006)+(7.006),
(I-052)+(2.006)+(9.001), (I-052)+(2.006)+(9.002),
(I-052)+(2.006)+(9.003), (I-052)+(2.006)+(9.004),
(I-052)+(2.006)+(9.005), (I-052)+(2.006)+(9.006),
(I-052)+(2.006)+(9.007), (I-052)+(2.006)+(9.008),
(I-052)+(2.006)+(9.009), (I-052)+(2.006)+(14.001),
(I-052)+(2.006)+(14.002), (I-052)+(2.006)+(15.008),
(I-052)+(2.006)+(15.011), (I-052)+(2.006)+(15.012),
(I-052)+(2.006)+(15.016), (I-052)+(2.006)+(15.025),
(I-052)+(2.006)+(15.027), (I-052)+(2.006)+(15.047),
(I-052)+(2.006)+(15.063), (I-052)+(2.006)+(15.064),
(I-052)+(2.006)+(16.001), (I-052)+(2.006)+(16.002),
(I-052)+(2.006)+(16.003), (I-052)+(2.006)+(16.004),
(I-052)+(2.006)+(16.005), (I-052)+(2.006)+(16.006),
(I-052)+(2.006)+(16.007), (I-052)+(2.006)+(16.008),
(I-052)+(2.006)+(17.001), (I-052)+(2.006)+(17.002),
(I-052)+(2.006)+(17.003), (I-052)+(2.006)+(17.004),
(I-052)+(2.006)+(17.005), (I-052)+(2.006)+(17.006),
(I-052)+(2.006)+(17.007), (I-052)+(2.006)+(17.008),
(I-052)+(2.006)+(17.009), (I-052)+(2.006)+(17.010),
(I-052)+(2.006)+(17.011), (I-052)+(2.006)+(17.012),
(I-052)+(2.006)+(18.001), (I-052)+(2.007)+(3.001), (I-052)+(2.007)+(3.002),
(I-052)+(2.007)+(3.003), (I-052)+(2.007)+(3.004),
(I-052)+(2.007)+(3.005), (I-052)+(2.007)+(3.006),
(I-052)+(2.007)+(3.007), (I-052)+(2.007)+(3.008),
(I-052)+(2.007)+(3.009), (I-052)+(2.007)+(3.010),
(I-052)+(2.007)+(3.011), (I-052)+(2.007)+(3.012),
(I-052)+(2.007)+(3.013), (I-052)+(2.007)+(3.014),
(I-052)+(2.007)+(3.015), (I-052)+(2.007)+(3.016),
(I-052)+(2.007)+(3.017), (I-052)+(2.007)+(3.018),
(I-052)+(2.007)+(3.019), (I-052)+(2.007)+(3.020),
(I-052)+(2.007)+(3.021), (I-052)+(2.007)+(3.022),
(I-052)+(2.007)+(3.023), (I-052)+(2.007)+(3.024),
(I-052)+(2.007)+(3.025), (I-052)+(2.007)+(3.026),
(I-052)+(2.007)+(3.027), (I-052)+(2.007)+(3.028),
(I-052)+(2.007)+(3.029), (I-052)+(2.007)+(3.030),
(I-052)+(2.007)+(3.031), (I-052)+(2.007)+(5.001),
(I-052)+(2.007)+(5.002), (I-052)+(2.007)+(5.003),
(I-052)+(2.007)+(5.004), (I-052)+(2.007)+(5.005),
(I-052)+(2.007)+(5.006), (I-052)+(2.007)+(5.007),
(I-052)+(2.007)+(5.008), (I-052)+(2.007)+(5.009),
(I-052)+(2.007)+(5.010), (I-052)+(2.007)+(5.011),
(I-052)+(2.007)+(5.012), (I-052)+(2.007)+(5.013),
(I-052)+(2.007)+(5.014), (I-052)+(2.007)+(5.015),
(I-052)+(2.007)+(5.016), (I-052)+(2.007)+(5.017),
(I-052)+(2.007)+(5.018), (I-052)+(2.007)+(5.019),
(I-052)+(2.007)+(5.020), (I-052)+(2.007)+(5.021),
(I-052)+(2.007)+(5.022), (I-052)+(2.007)+(5.023),
(I-052)+(2.007)+(6.001), (I-052)+(2.007)+(6.002),
(I-052)+(2.007)+(6.003), (I-052)+(2.007)+(6.004),
(I-052)+(2.007)+(7.001), (I-052)+(2.007)+(7.002),
(I-052)+(2.007)+(7.003), (I-052)+(2.007)+(7.004),
(I-052)+(2.007)+(7.005), (I-052)+(2.007)+(7.006),
(I-052)+(2.007)+(9.001), (I-052)+(2.007)+(9.002),
(I-052)+(2.007)+(9.003), (I-052)+(2.007)+(9.004),
(I-052)+(2.007)+(9.005), (I-052)+(2.007)+(9.006),
(I-052)+(2.007)+(9.007), (I-052)+(2.007)+(9.008),
(I-052)+(2.007)+(9.009), (I-052)+(2.007)+(14.001),
(I-052)+(2.007)+(14.002), (I-052)+(2.007)+(15.008),
(I-052)+(2.007)+(15.011), (I-052)+(2.007)+(15.012),
(I-052)+(2.007)+(15.016), (I-052)+(2.007)+(15.025),
(I-052)+(2.007)+(15.027), (I-052)+(2.007)+(15.047),
(I-052)+(2.007)+(15.063), (I-052)+(2.007)+(15.064),
(I-052)+(2.007)+(16.001), (I-052)+(2.007)+(16.002),
(I-052)+(2.007)+(16.003), (I-052)+(2.007)+(16.004),
(I-052)+(2.007)+(16.005), (I-052)+(2.007)+(16.006),
(I-052)+(2.007)+(16.007), (I-052)+(2.007)+(16.008),
(I-052)+(2.007)+(17.001), (I-052)+(2.007)+(17.002),
(I-052)+(2.007)+(17.003), (I-052)+(2.007)+(17.004),
(I-052)+(2.007)+(17.005), (I-052)+(2.007)+(17.006),
(I-052)+(2.007)+(17.007), (I-052)+(2.007)+(17.008),
(I-052)+(2.007)+(17.009), (I-052)+(2.007)+(17.010),
(I-052)+(2.007)+(17.011), (I-052)+(2.007)+(17.012),
(I-052)+(2.007)+(18.001), (I-052)+(2.008)+(3.001), (I-052)+(2.008)+(3.002),
(I-052)+(2.008)+(3.003), (I-052)+(2.008)+(3.004),
(I-052)+(2.008)+(3.005), (I-052)+(2.008)+(3.006),
(I-052)+(2.008)+(3.007), (I-052)+(2.008)+(3.008),
(I-052)+(2.008)+(3.009), (I-052)+(2.008)+(3.010),
(I-052)+(2.008)+(3.011), (I-052)+(2.008)+(3.012),
(I-052)+(2.008)+(3.013), (I-052)+(2.008)+(3.014),
(I-052)+(2.008)+(3.015), (I-052)+(2.008)+(3.016),
(I-052)+(2.008)+(3.017), (I-052)+(2.008)+(3.018),
(I-052)+(2.008)+(3.019), (I-052)+(2.008)+(3.020),
(I-052)+(2.008)+(3.021), (I-052)+(2.008)+(3.022),
(I-052)+(2.008)+(3.023), (I-052)+(2.008)+(3.024),
(I-052)+(2.008)+(3.025), (I-052)+(2.008)+(3.026),
(I-052)+(2.008)+(3.027), (I-052)+(2.008)+(3.028),
(I-052)+(2.008)+(3.029), (I-052)+(2.008)+(3.030),
(I-052)+(2.008)+(3.031), (I-052)+(2.008)+(5.001),
(I-052)+(2.008)+(5.002), (I-052)+(2.008)+(5.003),
(I-052)+(2.008)+(5.004), (I-052)+(2.008)+(5.005),
(I-052)+(2.008)+(5.006), (I-052)+(2.008)+(5.007),
(I-052)+(2.008)+(5.008), (I-052)+(2.008)+(5.009),
(I-052)+(2.008)+(5.010), (I-052)+(2.008)+(5.011),
(I-052)+(2.008)+(5.012), (I-052)+(2.008)+(5.013),
(I-052)+(2.008)+(5.014), (I-052)+(2.008)+(5.015),
(I-052)+(2.008)+(5.016), (I-052)+(2.008)+(5.017),
(I-052)+(2.008)+(5.018), (I-052)+(2.008)+(5.019),
(I-052)+(2.008)+(5.020), (I-052)+(2.008)+(5.021),
(I-052)+(2.008)+(5.022), (I-052)+(2.008)+(5.023),
(I-052)+(2.008)+(6.001), (I-052)+(2.008)+(6.002),
(I-052)+(2.008)+(6.003), (I-052)+(2.008)+(6.004),
(I-052)+(2.008)+(7.001), (I-052)+(2.008)+(7.002),
(I-052)+(2.008)+(7.003), (I-052)+(2.008)+(7.004),
(I-052)+(2.008)+(7.005), (I-052)+(2.008)+(7.006),
(I-052)+(2.008)+(9.001), (I-052)+(2.008)+(9.002),
(I-052)+(2.008)+(9.003), (I-052)+(2.008)+(9.004),
(I-052)+(2.008)+(9.005), (I-052)+(2.008)+(9.006),
(I-052)+(2.008)+(9.007), (I-052)+(2.008)+(9.008),
(I-052)+(2.008)+(9.009), (I-052)+(2.008)+(14.001),
(I-052)+(2.008)+(14.002), (I-052)+(2.008)+(15.008),
(I-052)+(2.008)+(15.011), (I-052)+(2.008)+(15.012),
(I-052)+(2.008)+(15.016), (I-052)+(2.008)+(15.025),
(I-052)+(2.008)+(15.027), (I-052)+(2.008)+(15.047),
(I-052)+(2.008)+(15.063), (I-052)+(2.008)+(15.064),
(I-052)+(2.008)+(16.001), (I-052)+(2.008)+(16.002),
(I-052)+(2.008)+(16.003), (I-052)+(2.008)+(16.004),
(I-052)+(2.008)+(16.005), (I-052)+(2.008)+(16.006),
(I-052)+(2.008)+(16.007), (I-052)+(2.008)+(16.008),
(I-052)+(2.008)+(17.001), (I-052)+(2.008)+(17.002),
(I-052)+(2.008)+(17.003), (I-052)+(2.008)+(17.004),
(I-052)+(2.008)+(17.005), (I-052)+(2.008)+(17.006),
(I-052)+(2.008)+(17.007), (I-052)+(2.008)+(17.008),
(I-052)+(2.008)+(17.009), (I-052)+(2.008)+(17.010),
(I-052)+(2.008)+(17.011), (I-052)+(2.008)+(17.012),
(I-052)+(2.008)+(18.001), (I-052)+(2.009)+(3.001), (I-052)+(2.009)+(3.002), (I-052)+(2.009)+(3.003), (I-052)+(2.009)+(3.004), (I-052)+(2.009)+(3.005), (I-052)+(2.009)+(3.006), (I-052)+(2.009)+(3.007), (I-052)+(2.009)+(3.008), (I-052)+(2.009)+(3.009), (I-052)+(2.009)+(3.010), (I-052)+(2.009)+(3.011), (I-052)+(2.009)+(3.012), (I-052)+(2.009)+(3.013), (I-052)+(2.009)+(3.014), (I-052)+(2.009)+(3.015), (I-052)+(2.009)+(3.016), (I-052)+(2.009)+(3.017), (I-052)+(2.009)+(3.018), (I-052)+(2.009)+(3.019), (I-052)+(2.009)+(3.020), (I-052)+(2.009)+(3.021), (I-052)+(2.009)+(3.022), (I-052)+(2.009)+(3.023), (I-052)+(2.009)+(3.024), (I-052)+(2.009)+(3.025), (I-052)+(2.009)+(3.026), (I-052)+(2.009)+(3.027), (I-052)+(2.009)+(3.028), (I-052)+(2.009)+(3.029), (I-052)+(2.009)+(3.030), (I-052)+(2.009)+(3.031), (I-052)+(2.009)+(5.001), (I-052)+(2.009)+(5.002), (I-052)+(2.009)+(5.003), (I-052)+(2.009)+(5.004), (I-052)+(2.009)+(5.005), (I-052)+(2.009)+(5.006), (I-052)+(2.009)+(5.007), (I-052)+(2.009)+(5.008), (I-052)+(2.009)+(5.009), (I-052)+(2.009)+(5.010), (I-052)+(2.009)+(5.011), (I-052)+(2.009)+(5.012), (I-052)+(2.009)+(5.013), (I-052)+(2.009)+(5.014), (I-052)+(2.009)+(5.015), (I-052)+(2.009)+(5.016), (I-052)+(2.009)+(5.017), (I-052)+(2.009)+(5.018), (I-052)+(2.009)+(5.019), (I-052)+(2.009)+(5.020), (I-052)+(2.009)+(5.021), (I-052)+(2.009)+(5.022), (I-052)+(2.009)+(5.023), (I-052)+(2.009)+(6.001), (I-052)+(2.009)+(6.002), (I-052)+(2.009)+(6.003), (I-052)+(2.009)+(6.004), (I-052)+(2.009)+(7.001), (I-052)+(2.009)+(7.002), (I-052)+(2.009)+(7.003), (I-052)+(2.009)+(7.004), (I-052)+(2.009)+(7.005), (I-052)+(2.009)+(7.006), (I-052)+(2.009)+(9.001), (I-052)+(2.009)+(9.002), (I-052)+(2.009)+(9.003), (I-052)+(2.009)+(9.004), (I-052)+(2.009)+(9.005), (I-052)+(2.009)+(9.006), (I-052)+(2.009)+(9.007), (I-052)+(2.009)+(9.008), (I-052)+(2.009)+(9.009), (I-052)+(2.009)+(14.001), (I-052)+(2.009)+(14.002), (I-052)+(2.009)+(15.008), (I-052)+(2.009)+(15.011), (I-052)+(2.009)+(15.012), (I-052)+(2.009)+(15.016), (I-052)+(2.009)+(15.025), (I-052)+(2.009)+(15.027), (I-052)+(2.009)+(15.047), (I-052)+(2.009)+(15.063), (I-052)+(2.009)+(15.064), (I-052)+(2.009)+(16.001), (I-052)+(2.009)+(16.002), (I-052)+(2.009)+(16.003), (I-052)+(2.009)+(16.004), (I-052)+(2.009)+(16.005), (I-052)+(2.009)+(16.006), (I-052)+(2.009)+(16.007), (I-052)+(2.009)+(16.008), (I-052)+(2.009)+(17.001), (I-052)+(2.009)+(17.002), (I-052)+(2.009)+(17.003), (I-052)+(2.009)+(17.004), (I-052)+(2.009)+(17.005), (I-052)+(2.009)+(17.006), (I-052)+(2.009)+(17.007), (I-052)+(2.009)+(17.008), (I-052)+(2.009)+(17.009), (I-052)+(2.009)+(17.010), (I-052)+(2.009)+(17.011), (I-052)+(2.009)+(17.012), (I-052)+(2.009)+(18.001), (I-052)+(2.010)+(3.001), (I-052)+(2.010)+(3.002), (I-052)+(2.010)+(3.003), (I-052)+(2.010)+(3.004), (I-052)+(2.010)+(3.005), (I-052)+(2.010)+(3.006), (I-052)+(2.010)+(3.007), (I-052)+(2.010)+(3.008), (I-052)+(2.010)+(3.009), (I-052)+(2.010)+(3.010), (I-052)+(2.010)+(3.011), (I-052)+(2.010)+(3.012), (I-052)+(2.010)+(3.013), (I-052)+(2.010)+(3.014), (I-052)+(2.010)+(3.015), (I-052)+(2.010)+(3.016), (I-052)+(2.010)+(3.017), (I-052)+(2.010)+(3.018), (I-052)+(2.010)+(3.019), (I-052)+(2.010)+(3.020), (I-052)+(2.010)+(3.021), (I-052)+(2.010)+(3.022), (I-052)+(2.010)+(3.023), (I-052)+(2.010)+(3.024), (I-052)+(2.010)+(3.025), (I-052)+(2.010)+(3.026), (I-052)+(2.010)+(3.027), (I-052)+(2.010)+(3.028), (I-052)+(2.010)+(3.029), (I-052)+(2.010)+(3.030), (I-052)+(2.010)+(3.031), (I-052)+(2.010)+(5.001), (I-052)+(2.010)+(5.002), (I-052)+(2.010)+(5.003), (I-052)+(2.010)+(5.004), (I-052)+(2.010)+(5.005), (I-052)+(2.010)+(5.006), (I-052)+(2.010)+(5.007), (I-052)+(2.010)+(5.008), (I-052)+(2.010)+(5.009), (I-052)+(2.010)+(5.010), (I-052)+(2.010)+(5.011), (I-052)+(2.010)+(5.012), (I-052)+(2.010)+(5.013), (I-052)+(2.010)+(5.014), (I-052)+(2.010)+(5.015), (I-052)+(2.010)+(5.016), (I-052)+(2.010)+(5.017), (I-052)+(2.010)+(5.018), (I-052)+(2.010)+(5.019), (I-052)+(2.010)+(5.020), (I-052)+(2.010)+(5.021), (I-052)+(2.010)+(5.022), (I-052)+(2.010)+(5.023), (I-052)+(2.010)+(6.001), (I-052)+(2.010)+(6.002), (I-052)+(2.010)+(6.003), (I-052)+(2.010)+(6.004), (I-052)+(2.010)+(7.001), (I-052)+(2.010)+(7.002), (I-052)+(2.010)+(7.003), (I-052)+(2.010)+(7.004), (I-052)+(2.010)+(7.005), (I-052)+(2.010)+(7.006), (I-052)+(2.010)+(9.001), (I-052)+(2.010)+(9.002), (I-052)+(2.010)+(9.003), (I-052)+(2.010)+(9.004), (I-052)+(2.010)+(9.005), (I-052)+(2.010)+(9.006), (I-052)+(2.010)+(9.007), (I-052)+(2.010)+(9.008), (I-052)+(2.010)+(9.009), (I-052)+(2.010)+(14.001), (I-052)+(2.010)+(14.002), (I-052)+(2.010)+(15.008), (I-052)+(2.010)+(15.011), (I-052)+(2.010)+(15.012), (I-052)+(2.010)+(15.016), (I-052)+(2.010)+(15.025), (I-052)+(2.010)+(15.027), (I-052)+(2.010)+(15.047), (I-052)+(2.010)+(15.063), (I-052)+(2.010)+(15.064), (I-052)+(2.010)+(16.001), (I-052)+(2.010)+(16.002), (I-052)+(2.010)+(16.003), (I-052)+(2.010)+(16.004), (I-052)+(2.010)+(16.005), (I-052)+(2.010)+(16.006), (I-052)+(2.010)+(16.007), (I-052)+(2.010)+(16.008), (I-052)+(2.010)+(17.001), (I-052)+(2.010)+(17.002), (I-052)+(2.010)+(17.003), (I-052)+(2.010)+(17.004), (I-052)+(2.010)+(17.005), (I-052)+(2.010)+(17.006), (I-052)+(2.010)+(17.007), (I-052)+(2.010)+(17.008), (I-052)+(2.010)+(17.009), (I-052)+(2.010)+(17.010), (I-052)+(2.010)+(17.011), (I-052)+(2.010)+(17.012), (I-052)+(2.010)+(18.001), (I-052)+(2.011)+(3.001), (I-052)+(2.011)+(3.002), (I-052)+(2.011)+(3.003), (I-052)+(2.011)+(3.004), (I-052)+(2.011)+(3.005), (I-052)+(2.011)+(3.006), (I-052)+(2.011)+(3.007), (I-052)+(2.011)+(3.008), (I-052)+(2.011)+(3.009), (I-052)+(2.011)+(3.010), (I-052)+(2.011)+(3.011), (I-052)+(2.011)+(3.012), (I-052)+(2.011)+(3.013), (I-052)+(2.011)+(3.014), (I-052)+(2.011)+(3.015), (I-052)+(2.011)+(3.016), (I-052)+(2.011)+(3.017), (I-052)+(2.011)+(3.018), (I-052)+(2.011)+(3.019), (I-052)+(2.011)+(3.020), (I-052)+(2.011)+(3.021), (I-052)+(2.011)+(3.022), (I-052)+(2.011)+(3.023), (I-052)+(2.011)+(3.024), (I-052)+(2.011)+(3.025), (I-052)+(2.011)+(3.026), (I-052)+(2.011)+(3.027), (I-052)+(2.011)+(3.028), (I-052)+(2.011)+(3.029), (I-052)+(2.011)+(3.030), (I-052)+(2.011)+(3.031), (I-052)+(2.011)+(5.001), (I-052)+(2.011)+(5.002), (I-052)+(2.011)+(5.003), (I-052)+(2.011)+(5.004), (I-052)+(2.011)+(5.005), (I-052)+(2.011)+(5.006), (I-052)+(2.011)+(5.007), (I-052)+(2.011)+(5.008), (I-052)+(2.011)+(5.009), (I-052)+(2.011)+(5.010), (I-052)+(2.011)+(5.011), (I-052)+(2.011)+(5.012), (I-052)+(2.011)+(5.013), (I-052)+(2.011)+(5.014), (I-052)+(2.011)+(5.015), (I-052)+(2.011)+(5.016), (I-052)+(2.011)+(5.017), (I-052)+(2.011)+(5.018), (I-052)+(2.011)+(5.019), (I-052)+(2.011)+(5.020), (I-052)+(2.011)+(5.021), (I-052)+(2.011)+(5.022), (I-052)+(2.011)+(5.023), (I-052)+(2.011)+(6.001), (I-052)+(2.011)+(6.002), (I-052)+(2.011)+(6.003), (I-052)+(2.011)+(6.004), (I-052)+(2.011)+(7.001), (I-052)+(2.011)+(7.002), (I-052)+(2.011)+(7.003), (I-052)+(2.011)+(7.004), (I-052)+(2.011)+(7.005), (I-052)+(2.011)+(7.006), (I-052)+(2.011)+(9.001), (I-052)+(2.011)+(9.002), (I-052)+(2.011)+(9.003), (I-052)+(2.011)+(9.004), (I-052)+(2.011)+(9.005), (I-052)+(2.011)+(9.006), (I-052)+(2.011)+(9.007), (I-052)+(2.011)+(9.008), (I-052)+(2.011)+(9.009), (I-052)+(2.011)+(14.001), (I-052)+(2.011)+(14.002), (I-052)+(2.011)+(15.008), (I-052)+(2.011)+(15.011), (I-052)+(2.011)+(15.012), (I-052)+(2.011)+(15.016), (I-052)+(2.011)+(15.025), (I-052)+(2.011)+(15.027), (I-052)+(2.011)+(15.047), (I-052)+(2.011)+(15.063), (I-052)+(2.011)+(15.064), (I-052)+(2.011)+(16.001), (I-052)+(2.011)+(16.002), (I-052)+(2.011)+(16.003), (I-052)+(2.011)+(16.004), (I-052)+(2.011)+(16.005), (I-052)+(2.011)+(16.006), (I-052)+(2.011)+(16.007), (I-052)+(2.011)+(16.008), (I-052)+(2.011)+(17.001), (I-052)+(2.011)+(17.002), (I-052)+(2.011)+(17.003), (I-052)+(2.011)+(17.004), (I-052)+(2.011)+(17.005), (I-052)+(2.011)+(17.006), (I-052)+(2.011)+(17.007), (I-052)+(2.011)+(17.008), (I-052)+(2.011)+(17.009), (I-052)+(2.011)+(17.010), (I-052)+(2.011)+(17.011), (I-052)+(2.011)+(17.012), (I-052)+(2.011)+(18.001), (I-052)+(2.012)+(3.001), (I-052)+(2.012)+(3.002), (I-052)+(2.012)+(3.003), (I-052)+(2.012)+(3.004), (I-052)+(2.012)+(3.005), (I-052)+(2.012)+(3.006), (I-052)+(2.012)+(3.007), (I-052)+(2.012)+(3.008), (I-052)+(2.012)+(3.009), (I-052)+(2.012)+(3.010), (I-052)+(2.012)+(3.011), (I-052)+(2.012)+(3.012), (I-052)+(2.012)+(3.013), (I-052)+(2.012)+(3.014), (I-052)+(2.012)+(3.015), (I-052)+(2.012)+(3.016), (I-052)+(2.012)+(3.017), (I-052)+(2.012)+(3.018), (I-052)+(2.012)+(3.019), (I-052)+(2.012)+(3.020), (I-052)+(2.012)+(3.021), (I-052)+(2.012)+(3.022), (I-052)+(2.012)+(3.023), (I-052)+(2.012)+(3.024), (I-052)+(2.012)+(3.025), (I-052)+(2.012)+(3.026), (I-052)+(2.012)+(3.027), (I-052)+(2.012)+(3.028), (I-052)+(2.012)+(3.029), (I-052)+(2.012)+(3.030), (I-052)+(2.012)+(3.031), (I-052)+(2.012)+(5.001), (I-052)+(2.012)+(5.002), (I-052)+(2.012)+(5.003), (I-052)+(2.012)+(5.004), (I-052)+(2.012)+(5.005), (I-052)+(2.012)+(5.006), (I-052)+(2.012)+(5.007), (I-052)+(2.012)+(5.008), (I-052)+(2.012)+(5.009), (I-052)+(2.012)+(5.010), (I-052)+(2.012)+(5.011), (I-052)+(2.012)+(5.012), (I-052)+(2.012)+(5.013), (I-052)+(2.012)+(5.014), (I-052)+(2.012)+(5.015), (I-052)+(2.012)+(5.016), (I-052)+(2.012)+(5.017), (I-052)+(2.012)+(5.018), (I-052)+(2.012)+(5.019), (I-052)+(2.012)+(5.020), (I-052)+(2.012)+(5.021), (I-052)+(2.012)+(5.022), (I-052)+(2.012)+(5.023), (I-052)+(2.012)+(6.001), (I-052)+(2.012)+(6.002), (I-052)+(2.012)+(6.003), (I-052)+(2.012)+(6.004), (I-052)+(2.012)+(7.001), (I-052)+(2.012)+(7.002), (I-052)+(2.012)+(7.003), (I-052)+(2.012)+(7.004), (I-052)+(2.012)+(7.005), (I-052)+(2.012)+(7.006), (I-052)+(2.012)+(9.001), (I-052)+(2.012)+(9.002), (I-052)+(2.012)+(9.003), (I-052)+(2.012)+(9.004), (I-052)+(2.012)+(9.005), (I-052)+(2.012)+(9.006), (I-052)+(2.012)+(9.007), (I-052)+(2.012)+(9.008), (I-052)+(2.012)+(9.009), (I-052)+(2.012)+(14.001), (I-052)+(2.012)+(14.002), (I-052)+(2.012)+(15.008), (I-052)+(2.012)+(15.011), (I-052)+(2.012)+(15.012), (I-052)+(2.012)+(15.016), (I-052)+(2.012)+(15.025), (I-052)+(2.012)+(15.027), (I-052)+(2.012)+(15.047), (I-052)+(2.012)+(15.063), (I-052)+(2.012)+(15.064), (I-052)+(2.012)+(16.001), (I-052)+(2.012)+(16.002), (I-052)+(2.012)+(16.003), (I-052)+(2.012)+(16.004), (I-052)+(2.012)+(16.005), (I-052)+(2.012)+(16.006), (I-052)+(2.012)+(16.007), (I-052)+(2.012)+(16.008), (I-052)+(2.012)+(17.001), (I-052)+(2.012)+(17.002), (I-052)+(2.012)+(17.003), (I-052)+(2.012)+(17.004), (I-052)+(2.012)+(17.005), (I-052)+(2.012)+(17.006), (I-052)+(2.012)+(17.007), (I-052)+(2.012)+(17.008), (I-052)+(2.012)+(17.009), (I-052)+(2.012)+(17.010), (I-052)+(2.012)+(17.011), (I-052)+(2.012)+(17.012), (I-052)+(2.012)+(18.001), (I-052)+(2.013)+(3.001), (I-052)+(2.013)+(3.002), (I-052)+(2.013)+(3.003), (I-052)+(2.013)+(3.004), (I-052)+(2.013)+(3.005), (I-052)+(2.013)+(3.006), (I-052)+(2.013)+(3.007), (I-052)+(2.013)+(3.008), (I-052)+(2.013)+(3.009), (I-052)+(2.013)+(3.010), (I-052)+(2.013)+(3.011), (I-052)+(2.013)+(3.012), (I-052)+(2.013)+(3.013), (I-052)+(2.013)+(3.014), (I-052)+(2.013)+(3.015), (I-052)+(2.013)+(3.016), (I-052)+(2.013)+(3.017), (I-052)+(2.013)+(3.018), (I-052)+(2.013)+(3.019), (I-052)+(2.013)+(3.020), (I-052)+(2.013)+(3.021), (I-052)+(2.013)+(3.022), (I-052)+(2.013)+(3.023), (I-052)+(2.013)+(3.024), (I-052)+(2.013)+(3.025), (I-052)+(2.013)+(3.026), (I-052)+(2.013)+(3.027), (I-052)+(2.013)+(3.028), (I-052)+(2.013)+(3.029), (I-052)+(2.013)+(3.030), (I-052)+(2.013)+(3.031), (I-052)+(2.013)+(5.001), (I-052)+(2.013)+(5.002), (I-052)+(2.013)+(5.003), (I-052)+(2.013)+(5.004), (I-052)+(2.013)+(5.005), (I-052)+(2.013)+(5.006), (I-052)+(2.013)+(5.007), (I-052)+(2.013)+(5.008), (I-052)+(2.013)+(5.009), (I-052)+(2.013)+(5.010), (I-052)+(2.013)+(5.011), (I-052)+(2.013)+(5.012), (I-052)+(2.013)+(5.013), (I-052)+(2.013)+(5.014), (I-052)+(2.013)+(5.015), (I-052)+(2.013)+(5.016), (I-052)+(2.013)+(5.017), (I-052)+(2.013)+(5.018), (I-052)+(2.013)+(5.019), (I-052)+(2.013)+(5.020), (I-052)+(2.013)+(5.021), (I-052)+(2.013)+(5.022), (I-052)+(2.013)+(5.023), (I-052)+(2.013)+(6.001), (I-052)+(2.013)+(6.002), (I-052)+(2.013)+(6.003), (I-052)+(2.013)+(6.004), (I-052)+(2.013)+(7.001), (I-052)+(2.013)+(7.002), (I-052)+(2.013)+(7.003), (I-052)+(2.013)+(7.004), (I-052)+(2.013)+(7.005), (I-052)+(2.013)+(7.006), (I-052)+(2.013)+(9.001), (I-052)+(2.013)+(9.002), (I-052)+(2.013)+(9.003), (I-052)+(2.013)+(9.004), (I-052)+(2.013)+(9.005), (I-052)+(2.013)+(9.006), (I-052)+(2.013)+(9.007), (I-052)+(2.013)+(9.008), (I-052)+(2.013)+(9.009), (I-052)+(2.013)+(14.001), (I-052)+(2.013)+(14.002), (I-052)+(2.013)+(15.008), (I-052)+(2.013)+(15.011), (I-052)+(2.013)+(15.012), (I-052)+(2.013)+(15.016), (I-052)+(2.013)+(15.025), (I-052)+(2.013)+(15.027), (I-052)+(2.013)+(15.047), (I-052)+(2.013)+(15.063), (I-052)+(2.013)+(15.064), (I-052)+(2.013)+(16.001), (I-052)+(2.013)+(16.002), (I-052)+(2.013)+(16.003), (I-052)+(2.013)+(16.004), (I-052)+(2.013)+(16.005), (I-052)+(2.013)+(16.006), (I-052)+(2.013)+(16.007), (I-052)+(2.013)+(16.008), (I-052)+(2.013)+(17.001), (I-052)+(2.013)+(17.002), (I-052)+(2.013)+(17.003), (I-052)+(2.013)+(17.004), (I-052)+(2.013)+(17.005), (I-052)+(2.013)+(17.006), (I-052)+(2.013)+(17.007), (I-052)+(2.013)+(17.008), (I-052)+(2.013)+(17.009), (I-052)+(2.013)+(17.010), (I-052)+(2.013)+(17.011), (I-052)+(2.013)+(17.012), (I-052)+(2.013)+(18.001), (I-052)+(2.014)+(3.001), (I-052)+(2.014)+(3.002), (I-052)+(2.014)+(3.003), (I-052)+(2.014)+(3.004), (I-052)+(2.014)+(3.005), (I-052)+(2.014)+(3.006), (I-052)+(2.014)+(3.007), (I-052)+(2.014)+(3.008), (I-052)+(2.014)+(3.009), (I-052)+(2.014)+(3.010), (I-052)+(2.014)+(3.011), (I-052)+(2.014)+(3.012), (I-052)+(2.014)+(3.013), (I-052)+(2.014)+(3.014), (I-052)+(2.014)+(3.015), (I-052)+(2.014)+(3.016), (I-052)+(2.014)+(3.017), (I-052)+(2.014)+(3.018), (I-052)+(2.014)+(3.019), (I-052)+(2.014)+(3.020), (I-052)+(2.014)+(3.021), (I-052)+(2.014)+(3.022), (I-052)+(2.014)+(3.023), (I-052)+(2.014)+(3.024), (I-052)+(2.014)+(3.025), (I-052)+(2.014)+(3.026), (I-052)+(2.014)+(3.027), (I-052)+(2.014)+(3.028), (I-052)+(2.014)+(3.029), (I-052)+(2.014)+(3.030), (I-052)+(2.014)+(3.031), (I-052)+(2.014)+(5.001), (I-052)+(2.014)+(5.002), (I-052)+(2.014)+(5.003), (I-052)+(2.014)+(5.004), (I-052)+(2.014)+(5.005), (I-052)+(2.014)+(5.006), (I-052)+(2.014)+(5.007), (I-052)+(2.014)+(5.008), (I-052)+(2.014)+(5.009), (I-052)+(2.014)+(5.010), (I-052)+(2.014)+(5.011), (I-052)+(2.014)+(5.012), (I-052)+(2.014)+(5.013), (I-052)+(2.014)+(5.014), (I-052)+(2.014)+(5.015), (I-052)+(2.014)+(5.016), (I-052)+(2.014)+(5.017), (I-052)+(2.014)+(5.018), (I-052)+(2.014)+(5.019), (I-052)+(2.014)+(5.020), (I-052)+(2.014)+(5.021), (I-052)+(2.014)+(5.022), (I-052)+(2.014)+(5.023), (I-052)+(2.014)+(6.001), (I-052)+(2.014)+(6.002), (I-052)+(2.014)+(6.003), (I-052)+(2.014)+(6.004), (I-052)+(2.014)+(7.001), (I-052)+(2.014)+(7.002), (I-052)+(2.014)+(7.003), (I-052)+(2.014)+(7.004), (I-052)+(2.014)+(7.005), (I-052)+(2.014)+(7.006), (I-052)+(2.014)+(9.001), (I-052)+(2.014)+(9.002), (I-052)+(2.014)+(9.003), (I-052)+(2.014)+(9.004), (I-052)+(2.014)+(9.005), (I-052)+(2.014)+(9.006), (I-052)+(2.014)+(9.007), (I-052)+(2.014)+(9.008), (I-052)+(2.014)+(9.009), (I-052)+(2.014)+(14.001), (I-052)+(2.014)+(14.002), (I-052)+(2.014)+(15.008), (I-052)+(2.014)+(15.011), (I-052)+(2.014)+(15.012), (I-052)+(2.014)+(15.016), (I-052)+(2.014)+(15.025), (I-052)+(2.014)+(15.027), (I-052)+(2.014)+(15.047), (I-052)+(2.014)+(15.063), (I-052)+(2.014)+(15.064), (I-052)+(2.014)+(16.001), (I-052)+(2.014)+(16.002), (I-052)+(2.014)+(16.003), (I-052)+(2.014)+(16.004), (I-052)+(2.014)+(16.005), (I-052)+(2.014)+(16.006), (I-052)+(2.014)+(16.007), (I-052)+(2.014)+(16.008), (I-052)+(2.014)+(17.001), (I-052)+(2.014)+(17.002), (I-052)+(2.014)+(17.003), (I-052)+(2.014)+(17.004), (I-052)+(2.014)+(17.005), (I-052)+(2.014)+(17.006), (I-052)+(2.014)+(17.007), (I-052)+(2.014)+(17.008), (I-052)+(2.014)+(17.009), (I-052)+(2.014)+(17.010), (I-052)+(2.014)+(17.011), (I-052)+(2.014)+(17.012), (I-052)+(2.014)+(18.001), (I-052)+(2.015)+(3.001), (I-052)+(2.015)+(3.002), (I-052)+(2.015)+(3.003), (I-052)+(2.015)+(3.004), (I-052)+(2.015)+(3.005), (I-052)+(2.015)+(3.006), (I-052)+(2.015)+(3.007), (I-052)+(2.015)+(3.008), (I-052)+(2.015)+(3.009), (I-052)+(2.015)+(3.010), (I-052)+(2.015)+(3.011), (I-052)+(2.015)+(3.012), (I-052)+(2.015)+(3.013), (I-052)+(2.015)+(3.014), (I-052)+(2.015)+(3.015), (I-052)+(2.015)+(3.016), (I-052)+(2.015)+(3.017), (I-052)+(2.015)+(3.018), (I-052)+(2.015)+(3.019), (I-052)+(2.015)+(3.020), (I-052)+(2.015)+(3.021), (I-052)+(2.015)+(3.022), (I-052)+(2.015)+(3.023), (I-052)+(2.015)+(3.024), (I-052)+(2.015)+(3.025), (I-052)+(2.015)+(3.026), (I-052)+(2.015)+(3.027), (I-052)+(2.015)+(3.028), (I-052)+(2.015)+(3.029), (I-052)+(2.015)+(3.030), (I-052)+(2.015)+(3.031), (I-052)+(2.015)+(5.001), (I-052)+(2.015)+(5.002), (I-052)+(2.015)+(5.003), (I-052)+(2.015)+(5.004), (I-052)+(2.015)+(5.005), (I-052)+(2.015)+(5.006), (I-052)+(2.015)+(5.007), (I-052)+(2.015)+(5.008), (I-052)+(2.015)+(5.009), (I-052)+(2.015)+(5.010), (I-052)+(2.015)+(5.011), (I-052)+(2.015)+(5.012), (I-052)+(2.015)+(5.013), (I-052)+(2.015)+(5.014), (I-052)+(2.015)+(5.015), (I-052)+(2.015)+(5.016), (I-052)+(2.015)+(5.017), (I-052)+(2.015)+(5.018), (I-052)+(2.015)+(5.019), (I-052)+(2.015)+(5.020), (I-052)+(2.015)+(5.021), (I-052)+(2.015)+(5.022), (I-052)+(2.015)+(5.023), (I-052)+(2.015)+(6.001), (I-052)+(2.015)+(6.002), (I-052)+(2.015)+(6.003), (I-052)+(2.015)+(6.004), (I-052)+(2.015)+(7.001), (I-052)+(2.015)+(7.002), (I-052)+(2.015)+(7.003), (I-052)+(2.015)+(7.004), (I-052)+(2.015)+(7.005), (I-052)+(2.015)+(7.006), (I-052)+(2.015)+(9.001), (I-052)+(2.015)+(9.002), (I-052)+(2.015)+(9.003), (I-052)+(2.015)+(9.004), (I-052)+(2.015)+(9.005), (I-052)+(2.015)+(9.006), (I-052)+(2.015)+(9.007), (I-052)+(2.015)+(9.008), (I-052)+(2.015)+(9.009), (I-052)+(2.015)+(14.001), (I-052)+(2.015)+(14.002), (I-052)+(2.015)+(15.008), (I-052)+(2.015)+(15.011), (I-052)+(2.015)+(15.012), (I-052)+(2.015)+(15.016), (I-052)+(2.015)+(15.025), (I-052)+(2.015)+(15.027), (I-052)+(2.015)+(15.047), (I-052)+(2.015)+(15.063), (I-052)+(2.015)+(15.064), (I-052)+(2.015)+(16.001), (I-052)+(2.015)+(16.002), (I-052)+(2.015)+(16.003), (I-052)+(2.015)+(16.004), (I-052)+(2.015)+(16.005), (I-052)+(2.015)+(16.006), (I-052)+(2.015)+(16.007), (I-052)+(2.015)+(16.008), (I-052)+(2.015)+(17.001), (I-052)+(2.015)+(17.002), (I-052)+(2.015)+(17.003), (I-052)+(2.015)+(17.004), (I-052)+(2.015)+(17.005), (I-052)+(2.015)+(17.006), (I-052)+(2.015)+(17.007), (I-052)+(2.015)+(17.008), (I-052)+(2.015)+(17.009), (I-052)+(2.015)+(17.010), (I-052)+(2.015)+(17.011), (I-052)+(2.015)+(17.012), (I-052)+(2.015)+(18.001), (I-052)+(2.016)+(3.001), (I-052)+(2.016)+(3.002), (I-052)+(2.016)+(3.003), (I-052)+(2.016)+(3.004), (I-052)+(2.016)+(3.005), (I-052)+(2.016)+(3.006), (I-052)+(2.016)+(3.007), (I-052)+(2.016)+(3.008), (I-052)+(2.016)+(3.009), (I-052)+(2.016)+(3.010), (I-052)+(2.016)+(3.011), (I-052)+(2.016)+(3.012), (I-052)+(2.016)+(3.013), (I-052)+(2.016)+(3.014), (I-052)+(2.016)+(3.015), (I-052)+(2.016)+(3.016), (I-052)+(2.016)+(3.017), (I-052)+(2.016)+(3.018), (I-052)+(2.016)+(3.019), (I-052)+(2.016)+(3.020), (I-052)+(2.016)+(3.021), (I-052)+(2.016)+(3.022), (I-052)+(2.016)+(3.023), (I-052)+(2.016)+(3.024), (I-052)+(2.016)+(3.025), (I-052)+(2.016)+(3.026), (I-052)+(2.016)+(3.027), (I-052)+(2.016)+(3.028), (I-052)+(2.016)+(3.029), (I-052)+(2.016)+(3.030), (I-052)+(2.016)+(3.031), (I-052)+(2.016)+(5.001), (I-052)+(2.016)+(5.002), (I-052)+(2.016)+(5.003), (I-052)+(2.016)+(5.004), (I-052)+(2.016)+(5.005), (I-052)+(2.016)+(5.006), (I-052)+(2.016)+(5.007), (I-052)+(2.016)+(5.008), (I-052)+(2.016)+(5.009), (I-052)+(2.016)+(5.010), (I-052)+(2.016)+(5.011), (I-052)+(2.016)+(5.012), (I-052)+(2.016)+(5.013), (I-052)+(2.016)+(5.014), (I-052)+(2.016)+(5.015), (I-052)+(2.016)+(5.016), (I-052)+(2.016)+(5.017), (I-052)+(2.016)+(5.018), (I-052)+(2.016)+(5.019), (I-052)+(2.016)+(5.020), (I-052)+(2.016)+(5.021), (I-052)+(2.016)+(5.022), (I-052)+(2.016)+(5.023), (I-052)+(2.016)+(6.001), (I-052)+(2.016)+(6.002), (I-052)+(2.016)+(6.003), (I-052)+(2.016)+(6.004), (I-052)+(2.016)+(7.001), (I-052)+(2.016)+(7.002), (I-052)+(2.016)+(7.003), (I-052)+(2.016)+(7.004), (I-052)+(2.016)+(7.005), (I-052)+(2.016)+(7.006), (I-052)+(2.016)+(9.001), (I-052)+(2.016)+(9.002), (I-052)+(2.016)+(9.003), (I-052)+(2.016)+(9.004), (I-052)+(2.016)+(9.005), (I-052)+(2.016)+(9.006), (I-052)+(2.016)+(9.007), (I-052)+(2.016)+(9.008), (I-052)+(2.016)+(9.009), (I-052)+(2.016)+(14.001), (I-052)+(2.016)+(14.002), (I-052)+(2.016)+(15.008), (I-052)+(2.016)+(15.011), (I-052)+(2.016)+(15.012), (I-052)+(2.016)+(15.016), (I-052)+(2.016)+(15.025), (I-052)+(2.016)+(15.027), (I-052)+(2.016)+(15.047), (I-052)+(2.016)+(15.063), (I-052)+(2.016)+(15.064), (I-052)+(2.016)+(16.001), (I-052)+(2.016)+(16.002), (I-052)+(2.016)+(16.003), (I-052)+(2.016)+(16.004), (I-052)+(2.016)+(16.005), (I-052)+(2.016)+(16.006), (I-052)+(2.016)+(16.007), (I-052)+(2.016)+(16.008), (I-052)+(2.016)+(17.001), (I-052)+(2.016)+(17.002), (I-052)+(2.016)+(17.003), (I-052)+(2.016)+(17.004), (I-052)+(2.016)+(17.005), (I-052)+(2.016)+(17.006), (I-052)+(2.016)+(17.007), (I-052)+(2.016)+(17.008), (I-052)+(2.016)+(17.009), (I-052)+(2.016)+(17.010), (I-052)+(2.016)+(17.011), (I-052)+(2.016)+(17.012), (I-052)+(2.016)+(18.001), (I-052)+(2.017)+(3.001), (I-052)+(2.017)+(3.002), (I-052)+(2.017)+(3.003), (I-052)+(2.017)+(3.004), (I-052)+(2.017)+(3.005), (I-052)+(2.017)+(3.006), (I-052)+(2.017)+(3.007), (I-052)+(2.017)+(3.008), (I-052)+(2.017)+(3.009), (I-052)+(2.017)+(3.010), (I-052)+(2.017)+(3.011), (I-052)+(2.017)+(3.012), (I-052)+(2.017)+(3.013), (I-052)+(2.017)+(3.014), (I-052)+(2.017)+(3.015), (I-052)+(2.017)+(3.016), (I-052)+(2.017)+(3.017), (I-052)+(2.017)+(3.018), (I-052)+(2.017)+(3.019), (I-052)+(2.017)+(3.020), (I-052)+(2.017)+(3.021), (I-052)+(2.017)+(3.022), (I-052)+(2.017)+(3.023), (I-052)+(2.017)+(3.024), (I-052)+(2.017)+(3.025), (I-052)+(2.017)+(3.026), (I-052)+(2.017)+(3.027), (I-052)+(2.017)+(3.028), (I-052)+(2.017)+(3.029), (I-052)+(2.017)+(3.030), (I-052)+(2.017)+(3.031), (I-052)+(2.017)+(5.001), (I-052)+(2.017)+(5.002), (I-052)+(2.017)+(5.003), (I-052)+(2.017)+(5.004), (I-052)+(2.017)+(5.005), (I-052)+(2.017)+(5.006), (I-052)+(2.017)+(5.007), (I-052)+(2.017)+(5.008), (I-052)+(2.017)+(5.009), (I-052)+(2.017)+(5.010), (I-052)+(2.017)+(5.011), (I-052)+(2.017)+(5.012), (I-052)+(2.017)+(5.013), (I-052)+(2.017)+(5.014), (I-052)+(2.017)+(5.015), (I-052)+(2.017)+(5.016), (I-052)+(2.017)+(5.017), (I-052)+(2.017)+(5.018), (I-052)+(2.017)+(5.019), (I-052)+(2.017)+(5.020), (I-052)+(2.017)+(5.021), (I-052)+(2.017)+(5.022), (I-052)+(2.017)+(5.023), (I-052)+(2.017)+(6.001), (I-052)+(2.017)+(6.002), (I-052)+(2.017)+(6.003), (I-052)+(2.017)+(6.004), (I-052)+(2.017)+(7.001), (I-052)+(2.017)+(7.002), (I-052)+(2.017)+(7.003), (I-052)+(2.017)+(7.004), (I-052)+(2.017)+(7.005), (I-052)+(2.017)+(7.006), (I-052)+(2.017)+(9.001), (I-052)+(2.017)+(9.002), (I-052)+(2.017)+(9.003), (I-052)+(2.017)+(9.004), (I-052)+(2.017)+(9.005), (I-052)+(2.017)+(9.006), (I-052)+(2.017)+(9.007), (I-052)+(2.017)+(9.008), (I-052)+(2.017)+(9.009), (I-052)+(2.017)+(14.001), (I-052)+(2.017)+(14.002), (I-052)+(2.017)+(15.008), (I-052)+(2.017)+(15.011), (I-052)+(2.017)+(15.012), (I-052)+(2.017)+(15.016), (I-052)+(2.017)+(15.025), (I-052)+(2.017)+(15.027), (I-052)+(2.017)+(15.047), (I-052)+(2.017)+(15.063), (I-052)+(2.017)+(15.064), (I-052)+(2.017)+(16.001), (I-052)+(2.017)+(16.002), (I-052)+(2.017)+(16.003), (I-052)+(2.017)+(16.004), (I-052)+(2.017)+(16.005), (I-052)+(2.017)+(16.006), (I-052)+(2.017)+(16.007), (I-052)+(2.017)+(16.008), (I-052)+(2.017)+(17.001), (I-052)+(2.017)+(17.002), (I-052)+(2.017)+(17.003), (I-052)+(2.017)+(17.004), (I-052)+(2.017)+(17.005), (I-052)+(2.017)+(17.006), (I-052)+(2.017)+(17.007), (I-052)+(2.017)+(17.008), (I-052)+(2.017)+(17.009), (I-052)+(2.017)+(17.010), (I-052)+(2.017)+(17.011), (I-052)+(2.017)+(17.012), (I-052)+(2.017)+(18.001), (I-052)+(2.018)+(3.001), (I-052)+(2.018)+(3.002), (I-052)+(2.018)+(3.003), (I-052)+(2.018)+(3.004), (I-052)+(2.018)+(3.005), (I-052)+(2.018)+(3.006), (I-052)+(2.018)+(3.007), (I-052)+(2.018)+(3.008), (I-052)+(2.018)+(3.009), (I-052)+(2.018)+(3.010), (I-052)+(2.018)+(3.011), (I-052)+(2.018)+(3.012), (I-052)+(2.018)+(3.013), (I-052)+(2.018)+(3.014), (I-052)+(2.018)+(3.015), (I-052)+(2.018)+(3.016), (I-052)+(2.018)+(3.017), (I-052)+(2.018)+(3.018), (I-052)+(2.018)+(3.019), (I-052)+(2.018)+(3.020), (I-052)+(2.018)+(3.021), (I-052)+(2.018)+(3.022), (I-052)+(2.018)+(3.023), (I-052)+(2.018)+(3.024), (I-052)+(2.018)+(3.025), (I-052)+(2.018)+(3.026), (I-052)+(2.018)+(3.027), (I-052)+(2.018)+(3.028), (I-052)+(2.018)+(3.029), (I-052)+(2.018)+(3.030), (I-052)+(2.018)+(3.031), (I-052)+(2.018)+(5.001), (I-052)+(2.018)+(5.002), (I-052)+(2.018)+(5.003), (I-052)+(2.018)+(5.004), (I-052)+(2.018)+(5.005), (I-052)+(2.018)+(5.006), (I-052)+(2.018)+(5.007), (I-052)+(2.018)+(5.008), (I-052)+(2.018)+(5.009), (I-052)+(2.018)+(5.010), (I-052)+(2.018)+(5.011), (I-052)+(2.018)+(5.012), (I-052)+(2.018)+(5.013), (I-052)+(2.018)+(5.014), (I-052)+(2.018)+(5.015), (I-052)+(2.018)+(5.016), (I-052)+(2.018)+(5.017), (I-052)+(2.018)+(5.018), (I-052)+(2.018)+(5.019), (I-052)+(2.018)+(5.020), (I-052)+(2.018)+(5.021), (I-052)+(2.018)+(5.022), (I-052)+(2.018)+(5.023), (I-052)+(2.018)+(6.001), (I-052)+(2.018)+(6.002), (I-052)+(2.018)+(6.003), (I-052)+(2.018)+(6.004), (I-052)+(2.018)+(7.001), (I-052)+(2.018)+(7.002), (I-052)+(2.018)+(7.003), (I-052)+(2.018)+(7.004), (I-052)+(2.018)+(7.005), (I-052)+(2.018)+(7.006), (I-052)+(2.018)+(9.001), (I-052)+(2.018)+(9.002), (I-052)+(2.018)+(9.003), (I-052)+(2.018)+(9.004), (I-052)+(2.018)+(9.005), (I-052)+(2.018)+(9.006), (I-052)+(2.018)+(9.007), (I-052)+(2.018)+(9.008), (I-052)+(2.018)+(9.009), (I-052)+(2.018)+(14.001), (I-052)+(2.018)+(14.002), (I-052)+(2.018)+(15.008), (I-052)+(2.018)+(15.011), (I-052)+(2.018)+(15.012), (I-052)+(2.018)+(15.016), (I-052)+(2.018)+(15.025), (I-052)+(2.018)+(15.027), (I-052)+(2.018)+(15.047), (I-052)+(2.018)+(15.063), (I-052)+(2.018)+(15.064), (I-052)+(2.018)+(16.001), (I-052)+(2.018)+(16.002), (I-052)+(2.018)+(16.003), (I-052)+(2.018)+(16.004), (I-052)+(2.018)+(16.005), (I-052)+(2.018)+(16.006), (I-052)+(2.018)+(16.007), (I-052)+(2.018)+(16.008), (I-052)+(2.018)+(17.001), (I-052)+(2.018)+(17.002), (I-052)+(2.018)+(17.003), (I-052)+(2.018)+(17.004), (I-052)+(2.018)+(17.005), (I-052)+(2.018)+(17.006), (I-052)+(2.018)+(17.007), (I-052)+(2.018)+(17.008), (I-052)+(2.018)+(17.009), (I-052)+(2.018)+(17.010), (I-052)+(2.018)+(17.011), (I-052)+(2.018)+(17.012), (I-052)+(2.018)+(18.001), (I-052)+(2.019)+(3.001), (I-052)+(2.019)+(3.002), (I-052)+(2.019)+(3.003), (I-052)+(2.019)+(3.004), (I-052)+(2.019)+(3.005), (I-052)+(2.019)+(3.006), (I-052)+(2.019)+(3.007), (I-052)+(2.019)+(3.008), (I-052)+(2.019)+(3.009), (I-052)+(2.019)+(3.010), (I-052)+(2.019)+(3.011), (I-052)+(2.019)+(3.012), (I-052)+(2.019)+(3.013), (I-052)+(2.019)+(3.014), (I-052)+(2.019)+(3.015), (I-052)+(2.019)+(3.016), (I-052)+(2.019)+(3.017), (I-052)+(2.019)+(3.018), (I-052)+(2.019)+(3.019), (I-052)+(2.019)+(3.020), (I-052)+(2.019)+(3.021), (I-052)+(2.019)+(3.022), (I-052)+(2.019)+(3.023), (I-052)+(2.019)+(3.024), (I-052)+(2.019)+(3.025), (I-052)+(2.019)+(3.026), (I-052)+(2.019)+(3.027), (I-052)+(2.019)+(3.028), (I-052)+(2.019)+(3.029), (I-052)+(2.019)+(3.030), (I-052)+(2.019)+(3.031), (I-052)+(2.019)+(5.001), (I-052)+(2.019)+(5.002), (I-052)+(2.019)+(5.003), (I-052)+(2.019)+(5.004), (I-052)+(2.019)+(5.005), (I-052)+(2.019)+(5.006), (I-052)+(2.019)+(5.007), (I-052)+(2.019)+(5.008), (I-052)+(2.019)+(5.009), (I-052)+(2.019)+(5.010), (I-052)+(2.019)+(5.011), (I-052)+(2.019)+(5.012), (I-052)+(2.019)+(5.013), (I-052)+(2.019)+(5.014), (I-052)+(2.019)+(5.015), (I-052)+(2.019)+(5.016), (I-052)+(2.019)+(5.017), (I-052)+(2.019)+(5.018), (I-052)+(2.019)+(5.019), (I-052)+(2.019)+(5.020), (I-052)+(2.019)+(5.021), (I-052)+(2.019)+(5.022), (I-052)+(2.019)+(5.023), (I-052)+(2.019)+(6.001), (I-052)+(2.019)+(6.002), (I-052)+(2.019)+(6.003), (I-052)+(2.019)+(6.004), (I-052)+(2.019)+(7.001), (I-052)+(2.019)+(7.002), (I-052)+(2.019)+(7.003), (I-052)+(2.019)+(7.004), (I-052)+(2.019)+(7.005), (I-052)+(2.019)+(7.006), (I-052)+(2.019)+(9.001), (I-052)+(2.019)+(9.002), (I-052)+(2.019)+(9.003), (I-052)+(2.019)+(9.004), (I-052)+(2.019)+(9.005), (I-052)+(2.019)+(9.006), (I-052)+(2.019)+(9.007), (I-052)+(2.019)+(9.008), (I-052)+(2.019)+(9.009), (I-052)+(2.019)+(14.001), (I-052)+(2.019)+(14.002), (I-052)+(2.019)+(15.008), (I-052)+(2.019)+(15.011), (I-052)+(2.019)+(15.012), (I-052)+(2.019)+(15.016), (I-052)+(2.019)+(15.025), (I-052)+(2.019)+(15.027), (I-052)+(2.019)+(15.047), (I-052)+(2.019)+(15.063), (I-052)+(2.019)+(15.064), (I-052)+(2.019)+(16.001), (I-052)+(2.019)+(16.002), (I-052)+(2.019)+(16.003), (I-052)+(2.019)+(16.004), (I-052)+(2.019)+(16.005), (I-052)+(2.019)+(16.006), (I-052)+(2.019)+(16.007), (I-052)+(2.019)+(16.008), (I-052)+(2.019)+(17.001), (I-052)+(2.019)+(17.002), (I-052)+(2.019)+(17.003), (I-052)+(2.019)+(17.004), (I-052)+(2.019)+(17.005), (I-052)+(2.019)+(17.006), (I-052)+(2.019)+(17.007), (I-052)+(2.019)+(17.008), (I-052)+(2.019)+(17.009), (I-052)+(2.019)+(17.010), (I-052)+(2.019)+(17.011), (I-052)+(2.019)+(17.012), (I-052)+(2.019)+(18.001), (I-052)+(2.020)+(3.001), (I-052)+(2.020)+(3.002), (I-052)+(2.020)+(3.003), (I-052)+(2.020)+(3.004), (I-052)+(2.020)+(3.005), (I-052)+(2.020)+(3.006), (I-052)+(2.020)+(3.007), (I-052)+(2.020)+(3.008), (I-052)+(2.020)+(3.009), (I-052)+(2.020)+(3.010), (I-052)+(2.020)+(3.011), (I-052)+(2.020)+(3.012), (I-052)+(2.020)+(3.013), (I-052)+(2.020)+(3.014), (I-052)+(2.020)+(3.015), (I-052)+(2.020)+(3.016), (I-052)+(2.020)+(3.017), (I-052)+(2.020)+(3.018), (I-052)+(2.020)+(3.019), (I-052)+(2.020)+(3.020), (I-052)+(2.020)+(3.021), (I-052)+(2.020)+(3.022), (I-052)+(2.020)+(3.023), (I-052)+(2.020)+(3.024), (I-052)+(2.020)+(3.025), (I-052)+(2.020)+(3.026), (I-052)+(2.020)+(3.027), (I-052)+(2.020)+(3.028), (I-052)+(2.020)+(3.029), (I-052)+(2.020)+(3.030), (I-052)+(2.020)+(3.031), (I-052)+(2.020)+(5.001), (I-052)+(2.020)+(5.002), (I-052)+(2.020)+(5.003), (I-052)+(2.020)+(5.004), (I-052)+(2.020)+(5.005), (I-052)+(2.020)+(5.006), (I-052)+(2.020)+(5.007), (I-052)+(2.020)+(5.008), (I-052)+(2.020)+(5.009), (I-052)+(2.020)+(5.010), (I-052)+(2.020)+(5.011), (I-052)+(2.020)+(5.012), (I-052)+(2.020)+(5.013), (I-052)+(2.020)+(5.014), (I-052)+(2.020)+(5.015), (I-052)+(2.020)+(5.016), (I-052)+(2.020)+(5.017), (I-052)+(2.020)+(5.018), (I-052)+(2.020)+(5.019), (I-052)+(2.020)+(5.020), (I-052)+(2.020)+(5.021), (I-052)+(2.020)+(5.022), (I-052)+(2.020)+(5.023), (I-052)+(2.020)+(6.001), (I-052)+(2.020)+(6.002), (I-052)+(2.020)+(6.003), (I-052)+(2.020)+(6.004), (I-052)+(2.020)+(7.001), (I-052)+(2.020)+(7.002), (I-052)+(2.020)+(7.003), (I-052)+(2.020)+(7.004), (I-052)+(2.020)+(7.005), (I-052)+(2.020)+(7.006), (I-052)+(2.020)+(9.001), (I-052)+(2.020)+(9.002), (I-052)+(2.020)+(9.003), (I-052)+(2.020)+(9.004), (I-052)+(2.020)+(9.005), (I-052)+(2.020)+(9.006), (I-052)+(2.020)+(9.007), (I-052)+(2.020)+(9.008), (I-052)+(2.020)+(9.009), (I-052)+(2.020)+(14.001), (I-052)+(2.020)+(14.002), (I-052)+(2.020)+(15.008), (I-052)+(2.020)+(15.011), (I-052)+(2.020)+(15.012), (I-052)+(2.020)+(15.016), (I-052)+(2.020)+(15.025), (I-052)+(2.020)+(15.027), (I-052)+(2.020)+(15.047), (I-052)+(2.020)+(15.063), (I-052)+(2.020)+(15.064), (I-052)+(2.020)+(16.001), (I-052)+(2.020)+(16.002), (I-052)+(2.020)+(16.003), (I-052)+(2.020)+(16.004), (I-052)+(2.020)+(16.005), (I-052)+(2.020)+(16.006), (I-052)+(2.020)+(16.007), (I-052)+(2.020)+(16.008), (I-052)+(2.020)+(17.001), (I-052)+(2.020)+(17.002), (I-052)+(2.020)+(17.003), (I-052)+(2.020)+(17.004), (I-052)+(2.020)+(17.005), (I-052)+(2.020)+(17.006), (I-052)+(2.020)+(17.007), (I-052)+(2.020)+(17.008), (I-052)+(2.020)+(17.009), (I-052)+(2.020)+(17.010), (I-052)+(2.020)+(17.011), (I-052)+(2.020)+(17.012), (I-052)+(2.020)+(18.001), (I-052)+(2.021)+(3.001), (I-052)+(2.021)+(3.002), (I-052)+(2.021)+(3.003), (I-052)+(2.021)+(3.004), (I-052)+(2.021)+(3.005), (I-052)+(2.021)+(3.006), (I-052)+(2.021)+(3.007), (I-052)+(2.021)+(3.008), (I-052)+(2.021)+(3.009), (I-052)+(2.021)+(3.010), (I-052)+(2.021)+(3.011), (I-052)+(2.021)+(3.012), (I-052)+(2.021)+(3.013), (I-052)+(2.021)+(3.014), (I-052)+(2.021)+(3.015), (I-052)+(2.021)+(3.016), (I-052)+(2.021)+(3.017), (I-052)+(2.021)+(3.018), (I-052)+(2.021)+(3.019), (I-052)+(2.021)+(3.020), (I-052)+(2.021)+(3.021), (I-052)+(2.021)+(3.022), (I-052)+(2.021)+(3.023), (I-052)+(2.021)+(3.024), (I-052)+(2.021)+(3.025), (I-052)+(2.021)+(3.026), (I-052)+(2.021)+(3.027), (I-052)+(2.021)+(3.028), (I-052)+(2.021)+(3.029), (I-052)+(2.021)+(3.030), (I-052)+(2.021)+(3.031), (I-052)+(2.021)+(5.001), (I-052)+(2.021)+(5.002), (I-052)+(2.021)+(5.003), (I-052)+(2.021)+(5.004), (I-052)+(2.021)+(5.005), (I-052)+(2.021)+(5.006), (I-052)+(2.021)+(5.007), (I-052)+(2.021)+(5.008), (I-052)+(2.021)+(5.009), (I-052)+(2.021)+(5.010), (I-052)+(2.021)+(5.011), (I-052)+(2.021)+(5.012), (I-052)+(2.021)+(5.013), (I-052)+(2.021)+(5.014), (I-052)+(2.021)+(5.015), (I-052)+(2.021)+(5.016), (I-052)+(2.021)+(5.017), (I-052)+(2.021)+(5.018), (I-052)+(2.021)+(5.019), (I-052)+(2.021)+(5.020), (I-052)+(2.021)+(5.021), (I-052)+(2.021)+(5.022), (I-052)+(2.021)+(5.023), (I-052)+(2.021)+(6.001), (I-052)+(2.021)+(6.002), (I-052)+(2.021)+(6.003), (I-052)+(2.021)+(6.004), (I-052)+(2.021)+(7.001), (I-052)+(2.021)+(7.002), (I-052)+(2.021)+(7.003), (I-052)+(2.021)+(7.004), (I-052)+(2.021)+(7.005), (I-052)+(2.021)+(7.006), (I-052)+(2.021)+(9.001), (I-052)+(2.021)+(9.002), (I-052)+(2.021)+(9.003), (I-052)+(2.021)+(9.004), (I-052)+(2.021)+(9.005), (I-052)+(2.021)+(9.006), (I-052)+(2.021)+(9.007), (I-052)+(2.021)+(9.008), (I-052)+(2.021)+(9.009), (I-052)+(2.021)+(14.001), (I-052)+(2.021)+(14.002), (I-052)+(2.021)+(15.008), (I-052)+(2.021)+(15.011), (I-052)+(2.021)+(15.012), (I-052)+(2.021)+(15.016), (I-052)+(2.021)+(15.025), (I-052)+(2.021)+(15.027), (I-052)+(2.021)+(15.047), (I-052)+(2.021)+(15.063), (I-052)+(2.021)+(15.064), (I-052)+(2.021)+(16.001), (I-052)+(2.021)+(16.002), (I-052)+(2.021)+(16.003), (I-052)+(2.021)+(16.004), (I-052)+(2.021)+(16.005), (I-052)+(2.021)+(16.006), (I-052)+(2.021)+(16.007), (I-052)+(2.021)+(16.008), (I-052)+(2.021)+(17.001), (I-052)+(2.021)+(17.002), (I-052)+(2.021)+(17.003), (I-052)+(2.021)+(17.004), (I-052)+(2.021)+(17.005), (I-052)+(2.021)+(17.006), (I-052)+(2.021)+(17.007), (I-052)+(2.021)+(17.008), (I-052)+(2.021)+(17.009), (I-052)+(2.021)+(17.010), (I-052)+(2.021)+(17.011), (I-052)+(2.021)+(17.012), (I-052)+(2.021)+(18.001), (I-052)+(2.022)+(3.001), (I-052)+(2.022)+(3.002), (I-052)+(2.022)+(3.003), (I-052)+(2.022)+(3.004), (I-052)+(2.022)+(3.005), (I-052)+(2.022)+(3.006), (I-052)+(2.022)+(3.007), (I-052)+(2.022)+(3.008), (I-052)+(2.022)+(3.009), (I-052)+(2.022)+(3.010), (I-052)+(2.022)+(3.011), (I-052)+(2.022)+(3.012), (I-052)+(2.022)+(3.013), (I-052)+(2.022)+(3.014), (I-052)+(2.022)+(3.015), (I-052)+(2.022)+(3.016), (I-052)+(2.022)+(3.017), (I-052)+(2.022)+(3.018), (I-052)+(2.022)+(3.019), (I-052)+(2.022)+(3.020), (I-052)+(2.022)+(3.021), (I-052)+(2.022)+(3.022), (I-052)+(2.022)+(3.023), (I-052)+(2.022)+(3.024), (I-052)+(2.022)+(3.025), (I-052)+(2.022)+(3.026), (I-052)+(2.022)+(3.027), (I-052)+(2.022)+(3.028), (I-052)+(2.022)+(3.029), (I-052)+(2.022)+(3.030), (I-052)+(2.022)+(3.031), (I-052)+(2.022)+(5.001), (I-052)+(2.022)+(5.002), (I-052)+(2.022)+(5.003), (I-052)+(2.022)+(5.004), (I-052)+(2.022)+(5.005), (I-052)+(2.022)+(5.006), (I-052)+(2.022)+(5.007), (I-052)+(2.022)+(5.008), (I-052)+(2.022)+(5.009), (I-052)+(2.022)+(5.010), (I-052)+(2.022)+(5.011), (I-052)+(2.022)+(5.012), (I-052)+(2.022)+(5.013), (I-052)+(2.022)+(5.014), (I-052)+(2.022)+(5.015), (I-052)+(2.022)+(5.016), (I-052)+(2.022)+(5.017), (I-052)+(2.022)+(5.018), (I-052)+(2.022)+(5.019), (I-052)+(2.022)+(5.020), (I-052)+(2.022)+(5.021), (I-052)+(2.022)+(5.022), (I-052)+(2.022)+(5.023), (I-052)+(2.022)+(6.001), (I-052)+(2.022)+(6.002), (I-052)+(2.022)+(6.003), (I-052)+(2.022)+(6.004), (I-052)+(2.022)+(7.001), (I-052)+(2.022)+(7.002), (I-052)+(2.022)+(7.003), (I-052)+(2.022)+(7.004), (I-052)+(2.022)+(7.005), (I-052)+(2.022)+(7.006), (I-052)+(2.022)+(9.001), (I-052)+(2.022)+(9.002), (I-052)+(2.022)+(9.003), (I-052)+(2.022)+(9.004), (I-052)+(2.022)+(9.005), (I-052)+(2.022)+(9.006), (I-052)+(2.022)+(9.007), (I-052)+(2.022)+(9.008), (I-052)+(2.022)+(9.009), (I-052)+(2.022)+(14.001), (I-052)+(2.022)+(14.002), (I-052)+(2.022)+(15.008), (I-052)+(2.022)+(15.011), (I-052)+(2.022)+(15.012), (I-052)+(2.022)+(15.016), (I-052)+(2.022)+(15.025), (I-052)+(2.022)+(15.027), (I-052)+(2.022)+(15.047), (I-052)+(2.022)+(15.063), (I-052)+(2.022)+(15.064), (I-052)+(2.022)+(16.001), (I-052)+(2.022)+(16.002), (I-052)+(2.022)+(16.003), (I-052)+(2.022)+(16.004), (I-052)+(2.022)+(16.005), (I-052)+(2.022)+(16.006), (I-052)+(2.022)+(16.007), (I-052)+(2.022)+(16.008), (I-052)+(2.022)+(17.001), (I-052)+(2.022)+(17.002), (I-052)+(2.022)+(17.003), (I-052)+(2.022)+(17.004), (I-052)+(2.022)+(17.005), (I-052)+(2.022)+(17.006), (I-052)+(2.022)+(17.007), (I-052)+(2.022)+(17.008), (I-052)+(2.022)+(17.009), (I-052)+(2.022)+(17.010), (I-052)+(2.022)+(17.011), (I-052)+(2.022)+(17.012), (I-052)+(2.022)+(18.001), (I-052)+(2.023)+(3.001), (I-052)+(2.023)+(3.002), (I-052)+(2.023)+(3.003), (I-052)+(2.023)+(3.004), (I-052)+(2.023)+(3.005), (I-052)+(2.023)+(3.006), (I-052)+(2.023)+(3.007), (I-052)+(2.023)+(3.008), (I-052)+(2.023)+(3.009), (I-052)+(2.023)+(3.010), (I-052)+(2.023)+(3.011), (I-052)+(2.023)+(3.012), (I-052)+(2.023)+(3.013), (I-052)+(2.023)+(3.014), (I-052)+(2.023)+(3.015), (I-052)+(2.023)+(3.016), (I-052)+(2.023)+(3.017), (I-052)+(2.023)+(3.018), (I-052)+(2.023)+(3.019), (I-052)+(2.023)+(3.020), (I-052)+(2.023)+(3.021), (I-052)+(2.023)+(3.022), (I-052)+(2.023)+(3.023), (I-052)+(2.023)+(3.024), (I-052)+(2.023)+(3.025), (I-052)+(2.023)+(3.026), (I-052)+(2.023)+(3.027), (I-052)+(2.023)+(3.028), (I-052)+(2.023)+(3.029), (I-052)+(2.023)+(3.030), (I-052)+(2.023)+(3.031), (I-052)+(2.023)+(5.001), (I-052)+(2.023)+(5.002), (I-052)+(2.023)+(5.003), (I-052)+(2.023)+(5.004), (I-052)+(2.023)+(5.005), (I-052)+(2.023)+(5.006), (I-052)+(2.023)+(5.007), (I-052)+(2.023)+(5.008), (I-052)+(2.023)+(5.009), (I-052)+(2.023)+(5.010), (I-052)+(2.023)+(5.011), (I-052)+(2.023)+(5.012), (I-052)+(2.023)+(5.013), (I-052)+(2.023)+(5.014), (I-052)+(2.023)+(5.015), (I-052)+(2.023)+(5.016), (I-052)+(2.023)+(5.017), (I-052)+(2.023)+(5.018), (I-052)+(2.023)+(5.019), (I-052)+(2.023)+(5.020), (I-052)+(2.023)+(5.021), (I-052)+(2.023)+(5.022), (I-052)+(2.023)+(5.023), (I-052)+(2.023)+(6.001), (I-052)+(2.023)+(6.002), (I-052)+(2.023)+(6.003), (I-052)+(2.023)+(6.004), (I-052)+(2.023)+(7.001), (I-052)+(2.023)+(7.002), (I-052)+(2.023)+(7.003), (I-052)+(2.023)+(7.004), (I-052)+(2.023)+(7.005), (I-052)+(2.023)+(7.006), (I-052)+(2.023)+(9.001), (I-052)+(2.023)+(9.002), (I-052)+(2.023)+(9.003), (I-052)+(2.023)+(9.004), (I-052)+(2.023)+(9.005), (I-052)+(2.023)+(9.006), (I-052)+(2.023)+(9.007), (I-052)+(2.023)+(9.008), (I-052)+(2.023)+(9.009), (I-052)+(2.023)+(14.001), (I-052)+(2.023)+(14.002), (I-052)+(2.023)+(15.008), (I-052)+(2.023)+(15.011), (I-052)+(2.023)+(15.012), (I-052)+(2.023)+(15.016), (I-052)+(2.023)+(15.025), (I-052)+(2.023)+(15.027), (I-052)+(2.023)+(15.047), (I-052)+(2.023)+(15.063), (I-052)+(2.023)+(15.064), (I-052)+(2.023)+(16.001), (I-052)+(2.023)+(16.002), (I-052)+(2.023)+(16.003), (I-052)+(2.023)+(16.004), (I-052)+(2.023)+(16.005), (I-052)+(2.023)+(16.006), (I-052)+(2.023)+(16.007), (I-052)+(2.023)+(16.008), (I-052)+(2.023)+(17.001), (I-052)+(2.023)+(17.002), (I-052)+(2.023)+(17.003), (I-052)+(2.023)+(17.004), (I-052)+(2.023)+(17.005), (I-052)+(2.023)+(17.006), (I-052)+(2.023)+(17.007), (I-052)+(2.023)+(17.008), (I-052)+(2.023)+(17.009), (I-052)+(2.023)+(17.010), (I-052)+(2.023)+(17.011), (I-052)+(2.023)+(17.012), (I-052)+(2.023)+(18.001), (I-052)+(2.024)+(3.001), (I-052)+(2.024)+(3.002), (I-052)+(2.024)+(3.003), (I-052)+(2.024)+(3.004), (I-052)+(2.024)+(3.005), (I-052)+(2.024)+(3.006), (I-052)+(2.024)+(3.007), (I-052)+(2.024)+(3.008), (I-052)+(2.024)+(3.009), (I-052)+(2.024)+(3.010), (I-052)+(2.024)+(3.011), (I-052)+(2.024)+(3.012), (I-052)+(2.024)+(3.013), (I-052)+(2.024)+(3.014), (I-052)+(2.024)+(3.015), (I-052)+(2.024)+(3.016), (I-052)+(2.024)+(3.017), (I-052)+(2.024)+(3.018), (I-052)+(2.024)+(3.019), (I-052)+(2.024)+(3.020), (I-052)+(2.024)+(3.021), (I-052)+(2.024)+(3.022), (I-052)+(2.024)+(3.023), (I-052)+(2.024)+(3.024), (I-052)+(2.024)+(3.025), (I-052)+(2.024)+(3.026), (I-052)+(2.024)+(3.027), (I-052)+(2.024)+(3.028), (I-052)+(2.024)+(3.029), (I-052)+(2.024)+(3.030), (I-052)+(2.024)+(3.031), (I-052)+(2.024)+(5.001), (I-052)+(2.024)+(5.002), (I-052)+(2.024)+(5.003), (I-052)+(2.024)+(5.004), (I-052)+(2.024)+(5.005), (I-052)+(2.024)+(5.006), (I-052)+(2.024)+(5.007), (I-052)+(2.024)+(5.008), (I-052)+(2.024)+(5.009), (I-052)+(2.024)+(5.010), (I-052)+(2.024)+(5.011), (I-052)+(2.024)+(5.012), (I-052)+(2.024)+(5.013), (I-052)+(2.024)+(5.014), (I-052)+(2.024)+(5.015), (I-052)+(2.024)+(5.016), (I-052)+(2.024)+(5.017), (I-052)+(2.024)+(5.018), (I-052)+(2.024)+(5.019), (I-052)+(2.024)+(5.020), (I-052)+(2.024)+(5.021), (I-052)+(2.024)+(5.022), (I-052)+(2.024)+(5.023), (I-052)+(2.024)+(6.001), (I-052)+(2.024)+(6.002), (I-052)+(2.024)+(6.003), (I-052)+(2.024)+(6.004), (I-052)+(2.024)+(7.001), (I-052)+(2.024)+(7.002), (I-052)+(2.024)+(7.003), (I-052)+(2.024)+(7.004), (I-052)+(2.024)+(7.005), (I-052)+(2.024)+(7.006), (I-052)+(2.024)+(9.001), (I-052)+(2.024)+(9.002), (I-052)+(2.024)+(9.003), (I-052)+(2.024)+(9.004), (I-052)+(2.024)+(9.005), (I-052)+(2.024)+(9.006), (I-052)+(2.024)+(9.007), (I-052)+(2.024)+(9.008), (I-052)+(2.024)+(9.009), (I-052)+(2.024)+(14.001), (I-052)+(2.024)+(14.002), (I-052)+(2.024)+(15.008), (I-052)+(2.024)+(15.011), (I-052)+(2.024)+(15.012), (I-052)+(2.024)+(15.016), (I-052)+(2.024)+(15.025), (I-052)+(2.024)+(15.027), (I-052)+(2.024)+(15.047), (I-052)+(2.024)+(15.063), (I-052)+(2.024)+(15.064), (I-052)+(2.024)+(16.001), (I-052)+(2.024)+(16.002), (I-052)+(2.024)+(16.003), (I-052)+(2.024)+(16.004), (I-052)+(2.024)+(16.005), (I-052)+(2.024)+(16.006), (I-052)+(2.024)+(16.007), (I-052)+(2.024)+(16.008), (I-052)+(2.024)+(17.001), (I-052)+(2.024)+(17.002), (I-052)+(2.024)+(17.003), (I-052)+(2.024)+(17.004), (I-052)+(2.024)+(17.005), (I-052)+(2.024)+(17.006), (I-052)+(2.024)+(17.007), (I-052)+(2.024)+(17.008), (I-052)+(2.024)+(17.009), (I-052)+(2.024)+(17.010), (I-052)+(2.024)+(17.011), (I-052)+(2.024)+(17.012), (I-052)+(2.024)+(18.001), (I-052)+(2.025)+(3.001), (I-052)+(2.025)+(3.002), (I-052)+(2.025)+(3.003), (I-052)+(2.025)+(3.004), (I-052)+(2.025)+(3.005), (I-052)+(2.025)+(3.006), (I-052)+(2.025)+(3.007), (I-052)+(2.025)+(3.008), (I-052)+(2.025)+(3.009), (I-052)+(2.025)+(3.010), (I-052)+(2.025)+(3.011), (I-052)+(2.025)+(3.012), (I-052)+(2.025)+(3.013), (I-052)+(2.025)+(3.014), (I-052)+(2.025)+(3.015), (I-052)+(2.025)+(3.016), (I-052)+(2.025)+(3.017), (I-052)+(2.025)+(3.018), (I-052)+(2.025)+(3.019), (I-052)+(2.025)+(3.020), (I-052)+(2.025)+(3.021), (I-052)+(2.025)+(3.022), (I-052)+(2.025)+(3.023), (I-052)+(2.025)+(3.024), (I-052)+(2.025)+(3.025), (I-052)+(2.025)+(3.026), (I-052)+(2.025)+(3.027), (I-052)+(2.025)+(3.028), (I-052)+(2.025)+(3.029), (I-052)+(2.025)+(3.030), (I-052)+(2.025)+(3.031), (I-052)+(2.025)+(5.001), (I-052)+(2.025)+(5.002), (I-052)+(2.025)+(5.003), (I-052)+(2.025)+(5.004), (I-052)+(2.025)+(5.005), (I-052)+(2.025)+(5.006), (I-052)+(2.025)+(5.007), (I-052)+(2.025)+(5.008), (I-052)+(2.025)+(5.009), (I-052)+(2.025)+(5.010), (I-052)+(2.025)+(5.011), (I-052)+(2.025)+(5.012), (I-052)+(2.025)+(5.013), (I-052)+(2.025)+(5.014), (I-052)+(2.025)+(5.015), (I-052)+(2.025)+(5.016), (I-052)+(2.025)+(5.017), (I-052)+(2.025)+(5.018), (I-052)+(2.025)+(5.019), (I-052)+(2.025)+(5.020), (I-052)+(2.025)+(5.021), (I-052)+(2.025)+(5.022), (I-052)+(2.025)+(5.023), (I-052)+(2.025)+(6.001), (I-052)+(2.025)+(6.002), (I-052)+(2.025)+(6.003), (I-052)+(2.025)+(6.004), (I-052)+(2.025)+(7.001), (I-052)+(2.025)+(7.002), (I-052)+(2.025)+(7.003), (I-052)+(2.025)+(7.004), (I-052)+(2.025)+(7.005), (I-052)+(2.025)+(7.006), (I-052)+(2.025)+(9.001), (I-052)+(2.025)+(9.002), (I-052)+(2.025)+(9.003), (I-052)+(2.025)+(9.004), (I-052)+(2.025)+(9.005), (I-052)+(2.025)+(9.006), (I-052)+(2.025)+(9.007), (I-052)+(2.025)+(9.008), (I-052)+(2.025)+(9.009), (I-052)+(2.025)+(14.001), (I-052)+(2.025)+(14.002), (I-052)+(2.025)+(15.008), (I-052)+(2.025)+(15.011), (I-052)+(2.025)+(15.012), (I-052)+(2.025)+(15.016), (I-052)+(2.025)+(15.025), (I-052)+(2.025)+(15.027), (I-052)+(2.025)+(15.047), (I-052)+(2.025)+(15.063), (I-052)+(2.025)+(15.064), (I-052)+(2.025)+(16.001), (I-052)+(2.025)+(16.002), (I-052)+(2.025)+(16.003), (I-052)+(2.025)+(16.004), (I-052)+(2.025)+(16.005), (I-052)+(2.025)+(16.006), (I-052)+(2.025)+(16.007), (I-052)+(2.025)+(16.008), (I-052)+(2.025)+(17.001), (I-052)+(2.025)+(17.002), (I-052)+(2.025)+(17.003), (I-052)+(2.025)+(17.004), (I-052)+(2.025)+(17.005), (I-052)+(2.025)+(17.006), (I-052)+(2.025)+(17.007), (I-052)+(2.025)+(17.008), (I-052)+(2.025)+(17.009), (I-052)+(2.025)+(17.010), (I-052)+(2.025)+(17.011), (I-052)+(2.025)+(17.012), (I-052)+(2.025)+(18.001), (I-052)+(2.026)+(3.001), (I-052)+(2.026)+(3.002), (I-052)+(2.026)+(3.003), (I-052)+(2.026)+(3.004), (I-052)+(2.026)+(3.005), (I-052)+(2.026)+(3.006), (I-052)+(2.026)+(3.007), (I-052)+(2.026)+(3.008), (I-052)+(2.026)+(3.009), (I-052)+(2.026)+(3.010), (I-052)+(2.026)+(3.011), (I-052)+(2.026)+(3.012), (I-052)+(2.026)+(3.013), (I-052)+(2.026)+(3.014), (I-052)+(2.026)+(3.015), (I-052)+(2.026)+(3.016), (I-052)+(2.026)+(3.017), (I-052)+(2.026)+(3.018), (I-052)+(2.026)+(3.019), (I-052)+(2.026)+(3.020), (I-052)+(2.026)+(3.021), (I-052)+(2.026)+(3.022), (I-052)+(2.026)+(3.023), (I-052)+(2.026)+(3.024), (I-052)+(2.026)+(3.025), (I-052)+(2.026)+(3.026), (I-052)+(2.026)+(3.027), (I-052)+(2.026)+(3.028), (I-052)+(2.026)+(3.029), (I-052)+(2.026)+(3.030), (I-052)+(2.026)+(3.031), (I-052)+(2.026)+(5.001), (I-052)+(2.026)+(5.002), (I-052)+(2.026)+(5.003), (I-052)+(2.026)+(5.004), (I-052)+(2.026)+(5.005), (I-052)+(2.026)+(5.006), (I-052)+(2.026)+(5.007), (I-052)+(2.026)+(5.008), (I-052)+(2.026)+(5.009), (I-052)+(2.026)+(5.010), (I-052)+(2.026)+(5.011), (I-052)+(2.026)+(5.012), (I-052)+(2.026)+(5.013), (I-052)+(2.026)+(5.014), (I-052)+(2.026)+(5.015), (I-052)+(2.026)+(5.016), (I-052)+(2.026)+(5.017), (I-052)+(2.026)+(5.018), (I-052)+(2.026)+(5.019), (I-052)+(2.026)+(5.020), (I-052)+(2.026)+(5.021), (I-052)+(2.026)+(5.022), (I-052)+(2.026)+(5.023), (I-052)+(2.026)+(6.001), (I-052)+(2.026)+(6.002), (I-052)+(2.026)+(6.003), (I-052)+(2.026)+(6.004), (I-052)+(2.026)+(7.001), (I-052)+(2.026)+(7.002), (I-052)+(2.026)+(7.003), (I-052)+(2.026)+(7.004), (I-052)+(2.026)+(7.005), (I-052)+(2.026)+(7.006), (I-052)+(2.026)+(9.001), (I-052)+(2.026)+(9.002), (I-052)+(2.026)+(9.003), (I-052)+(2.026)+(9.004), (I-052)+(2.026)+(9.005), (I-052)+(2.026)+(9.006), (I-052)+(2.026)+(9.007), (I-052)+(2.026)+(9.008), (I-052)+(2.026)+(9.009), (I-052)+(2.026)+(14.001), (I-052)+(2.026)+(14.002), (I-052)+(2.026)+(15.008), (I-052)+(2.026)+(15.011), (I-052)+(2.026)+(15.012), (I-052)+(2.026)+(15.016), (I-052)+(2.026)+(15.025), (I-052)+(2.026)+(15.027), (I-052)+(2.026)+(15.047), (I-052)+(2.026)+(15.063), (I-052)+(2.026)+(15.064), (I-052)+(2.026)+(16.001), (I-052)+(2.026)+(16.002), (I-052)+(2.026)+(16.003), (I-052)+(2.026)+(16.004), (I-052)+(2.026)+(16.005), (I-052)+(2.026)+(16.006), (I-052)+(2.026)+(16.007), (I-052)+(2.026)+(16.008), (I-052)+(2.026)+(17.001), (I-052)+(2.026)+(17.002), (I-052)+(2.026)+(17.003), (I-052)+(2.026)+(17.004), (I-052)+(2.026)+(17.005), (I-052)+(2.026)+(17.006), (I-052)+(2.026)+(17.007), (I-052)+(2.026)+(17.008), (I-052)+(2.026)+(17.009), (I-052)+(2.026)+(17.010), (I-052)+(2.026)+(17.011), (I-052)+(2.026)+(17.012), (I-052)+(2.026)+(18.001), (I-052)+(2.027)+(3.001), (I-052)+(2.027)+(3.002), (I-052)+(2.027)+(3.003), (I-052)+(2.027)+(3.004), (I-052)+(2.027)+(3.005), (I-052)+(2.027)+(3.006), (I-052)+(2.027)+(3.007), (I-052)+(2.027)+(3.008), (I-052)+(2.027)+(3.009), (I-052)+(2.027)+(3.010), (I-052)+(2.027)+(3.011), (I-052)+(2.027)+(3.012), (I-052)+(2.027)+(3.013), (I-052)+(2.027)+(3.014), (I-052)+(2.027)+(3.015), (I-052)+(2.027)+(3.016), (I-052)+(2.027)+(3.017), (I-052)+(2.027)+(3.018), (I-052)+(2.027)+(3.019), (I-052)+(2.027)+(3.020), (I-052)+(2.027)+(3.021), (I-052)+(2.027)+(3.022), (I-052)+(2.027)+(3.023), (I-052)+(2.027)+(3.024), (I-052)+(2.027)+(3.025), (I-052)+(2.027)+(3.026), (I-052)+(2.027)+(3.027), (I-052)+(2.027)+(3.028), (I-052)+(2.027)+(3.029), (I-052)+(2.027)+(3.030), (I-052)+(2.027)+(3.031), (I-052)+(2.027)+(5.001), (I-052)+(2.027)+(5.002), (I-052)+(2.027)+(5.003), (I-052)+(2.027)+(5.004), (I-052)+(2.027)+(5.005), (I-052)+(2.027)+(5.006), (I-052)+(2.027)+(5.007), (I-052)+(2.027)+(5.008), (I-052)+(2.027)+(5.009), (I-052)+(2.027)+(5.010), (I-052)+(2.027)+(5.011), (I-052)+(2.027)+(5.012), (I-052)+(2.027)+(5.013), (I-052)+(2.027)+(5.014), (I-052)+(2.027)+(5.015), (I-052)+(2.027)+(5.016), (I-052)+(2.027)+(5.017), (I-052)+(2.027)+(5.018), (I-052)+(2.027)+(5.019), (I-052)+(2.027)+(5.020), (I-052)+(2.027)+(5.021), (I-052)+(2.027)+(5.022), (I-052)+(2.027)+(5.023), (I-052)+(2.027)+(6.001), (I-052)+(2.027)+(6.002), (I-052)+(2.027)+(6.003), (I-052)+(2.027)+(6.004), (I-052)+(2.027)+(7.001), (I-052)+(2.027)+(7.002), (I-052)+(2.027)+(7.003), (I-052)+(2.027)+(7.004), (I-052)+(2.027)+(7.005), (I-052)+(2.027)+(7.006), (I-052)+(2.027)+(9.001), (I-052)+(2.027)+(9.002), (I-052)+(2.027)+(9.003), (I-052)+(2.027)+(9.004), (I-052)+(2.027)+(9.005), (I-052)+(2.027)+(9.006), (I-052)+(2.027)+(9.007), (I-052)+(2.027)+(9.008), (I-052)+(2.027)+(9.009), (I-052)+(2.027)+(14.001), (I-052)+(2.027)+(14.002), (I-052)+(2.027)+(15.008), (I-052)+(2.027)+(15.011), (I-052)+(2.027)+(15.012), (I-052)+(2.027)+(15.016), (I-052)+(2.027)+(15.025), (I-052)+(2.027)+(15.027), (I-052)+(2.027)+(15.047), (I-052)+(2.027)+(15.063), (I-052)+(2.027)+(15.064), (I-052)+(2.027)+(16.001), (I-052)+(2.027)+(16.002), (I-052)+(2.027)+(16.003), (I-052)+(2.027)+(16.004), (I-052)+(2.027)+(16.005), (I-052)+(2.027)+(16.006), (I-052)+(2.027)+(16.007), (I-052)+(2.027)+(16.008), (I-052)+(2.027)+(17.001), (I-052)+(2.027)+(17.002), (I-052)+(2.027)+(17.003), (I-052)+(2.027)+(17.004), (I-052)+(2.027)+(17.005), (I-052)+(2.027)+(17.006), (I-052)+(2.027)+(17.007), (I-052)+(2.027)+(17.008), (I-052)+(2.027)+(17.009), (I-052)+(2.027)+(17.010), (I-052)+(2.027)+(17.011), (I-052)+(2.027)+(17.012), (I-052)+(2.027)+(18.001), (I-052)+(2.028)+(3.001), (I-052)+(2.028)+(3.002), (I-052)+(2.028)+(3.003), (I-052)+(2.028)+(3.004), (I-052)+(2.028)+(3.005), (I-052)+(2.028)+(3.006), (I-052)+(2.028)+(3.007), (I-052)+(2.028)+(3.008), (I-052)+(2.028)+(3.009), (I-052)+(2.028)+(3.010), (I-052)+(2.028)+(3.011), (I-052)+(2.028)+(3.012), (I-052)+(2.028)+(3.013), (I-052)+(2.028)+(3.014), (I-052)+(2.028)+(3.015), (I-052)+(2.028)+(3.016), (I-052)+(2.028)+(3.017), (I-052)+(2.028)+(3.018), (I-052)+(2.028)+(3.019), (I-052)+(2.028)+(3.020), (I-052)+(2.028)+(3.021), (I-052)+(2.028)+(3.022), (I-052)+(2.028)+(3.023), (I-052)+(2.028)+(3.024), (I-052)+(2.028)+(3.025), (I-052)+(2.028)+(3.026), (I-052)+(2.028)+(3.027), (I-052)+(2.028)+(3.028), (I-052)+(2.028)+(3.029), (I-052)+(2.028)+(3.030), (I-052)+(2.028)+(3.031), (I-052)+(2.028)+(5.001), (I-052)+(2.028)+(5.002), (I-052)+(2.028)+(5.003), (I-052)+(2.028)+(5.004), (I-052)+(2.028)+(5.005), (I-052)+(2.028)+(5.006), (I-052)+(2.028)+(5.007), (I-052)+(2.028)+(5.008), (I-052)+(2.028)+(5.009), (I-052)+(2.028)+(5.010), (I-052)+(2.028)+(5.011), (I-052)+(2.028)+(5.012), (I-052)+(2.028)+(5.013), (I-052)+(2.028)+(5.014), (I-052)+(2.028)+(5.015), (I-052)+(2.028)+(5.016), (I-052)+(2.028)+(5.017), (I-052)+(2.028)+(5.018), (I-052)+(2.028)+(5.019), (I-052)+(2.028)+(5.020), (I-052)+(2.028)+(5.021), (I-052)+(2.028)+(5.022), (I-052)+(2.028)+(5.023), (I-052)+(2.028)+(6.001), (I-052)+(2.028)+(6.002), (I-052)+(2.028)+(6.003), (I-052)+(2.028)+(6.004), (I-052)+(2.028)+(7.001), (I-052)+(2.028)+(7.002), (I-052)+(2.028)+(7.003), (I-052)+(2.028)+(7.004), (I-052)+(2.028)+(7.005), (I-052)+(2.028)+(7.006), (I-052)+(2.028)+(9.001), (I-052)+(2.028)+(9.002), (I-052)+(2.028)+(9.003), (I-052)+(2.028)+(9.004), (I-052)+(2.028)+(9.005), (I-052)+(2.028)+(9.006), (I-052)+(2.028)+(9.007), (I-052)+(2.028)+(9.008), (I-052)+(2.028)+(9.009), (I-052)+(2.028)+(14.001), (I-052)+(2.028)+(14.002), (I-052)+(2.028)+(15.008), (I-052)+(2.028)+(15.011), (I-052)+(2.028)+(15.012), (I-052)+(2.028)+(15.016), (I-052)+(2.028)+(15.025), (I-052)+(2.028)+(15.027), (I-052)+(2.028)+(15.047), (I-052)+(2.028)+(15.063), (I-052)+(2.028)+(15.064), (I-052)+(2.028)+(16.001), (I-052)+(2.028)+(16.002), (I-052)+(2.028)+(16.003), (I-052)+(2.028)+(16.004), (I-052)+(2.028)+(16.005), (I-052)+(2.028)+(16.006), (I-052)+(2.028)+(16.007), (I-052)+(2.028)+(16.008), (I-052)+(2.028)+(17.001), (I-052)+(2.028)+(17.002), (I-052)+(2.028)+(17.003), (I-052)+(2.028)+(17.004), (I-052)+(2.028)+(17.005), (I-052)+(2.028)+(17.006), (I-052)+(2.028)+(17.007), (I-052)+(2.028)+(17.008), (I-052)+(2.028)+(17.009), (I-052)+(2.028)+(17.010), (I-052)+(2.028)+(17.011), (I-052)+(2.028)+(17.012), (I-052)+(2.028)+(18.001), (I-052)+(2.029)+(3.001), (I-052)+(2.029)+(3.002), (I-052)+(2.029)+(3.003), (I-052)+(2.029)+(3.004), (I-052)+(2.029)+(3.005), (I-052)+(2.029)+(3.006), (I-052)+(2.029)+(3.007), (I-052)+(2.029)+(3.008), (I-052)+(2.029)+(3.009), (I-052)+(2.029)+(3.010), (I-052)+(2.029)+(3.011), (I-052)+(2.029)+(3.012), (I-052)+(2.029)+(3.013), (I-052)+(2.029)+(3.014), (I-052)+(2.029)+(3.015), (I-052)+(2.029)+(3.016), (I-052)+(2.029)+(3.017), (I-052)+(2.029)+(3.018), (I-052)+(2.029)+(3.019), (I-052)+(2.029)+(3.020), (I-052)+(2.029)+(3.021), (I-052)+(2.029)+(3.022), (I-052)+(2.029)+(3.023), (I-052)+(2.029)+(3.024), (I-052)+(2.029)+(3.025), (I-052)+(2.029)+(3.026), (I-052)+(2.029)+(3.027), (I-052)+(2.029)+(3.028), (I-052)+(2.029)+(3.029), (I-052)+(2.029)+(3.030), (I-052)+(2.029)+(3.031), (I-052)+(2.029)+(5.001), (I-052)+(2.029)+(5.002), (I-052)+(2.029)+(5.003), (I-052)+(2.029)+(5.004), (I-052)+(2.029)+(5.005), (I-052)+(2.029)+(5.006), (I-052)+(2.029)+(5.007), (I-052)+(2.029)+(5.008), (I-052)+(2.029)+(5.009), (I-052)+(2.029)+(5.010), (I-052)+(2.029)+(5.011), (I-052)+(2.029)+(5.012), (I-052)+(2.029)+(5.013), (I-052)+(2.029)+(5.014), (I-052)+(2.029)+(5.015), (I-052)+(2.029)+(5.016), (I-052)+(2.029)+(5.017), (I-052)+(2.029)+(5.018), (I-052)+(2.029)+(5.019), (I-052)+(2.029)+(5.020), (I-052)+(2.029)+(5.021), (I-052)+(2.029)+(5.022), (I-052)+(2.029)+(5.023), (I-052)+(2.029)+(6.001), (I-052)+(2.029)+(6.002), (I-052)+(2.029)+(6.003), (I-052)+(2.029)+(6.004), (I-052)+(2.029)+(7.001), (I-052)+(2.029)+(7.002), (I-052)+(2.029)+(7.003), (I-052)+(2.029)+(7.004), (I-052)+(2.029)+(7.005), (I-052)+(2.029)+(7.006), (I-052)+(2.029)+(9.001), (I-052)+(2.029)+(9.002), (I-052)+(2.029)+(9.003), (I-052)+(2.029)+(9.004), (I-052)+(2.029)+(9.005), (I-052)+(2.029)+(9.006), (I-052)+(2.029)+(9.007), (I-052)+(2.029)+(9.008), (I-052)+(2.029)+(9.009), (I-052)+(2.029)+(14.001), (I-052)+(2.029)+(14.002), (I-052)+(2.029)+(15.008), (I-052)+(2.029)+(15.011), (I-052)+(2.029)+(15.012), (I-052)+(2.029)+(15.016), (I-052)+(2.029)+(15.025), (I-052)+(2.029)+(15.027), (I-052)+(2.029)+(15.047), (I-052)+(2.029)+(15.063), (I-052)+(2.029)+(15.064), (I-052)+(2.029)+(16.001), (I-052)+(2.029)+(16.002), (I-052)+(2.029)+(16.003), (I-052)+(2.029)+(16.004), (I-052)+(2.029)+(16.005), (I-052)+(2.029)+(16.006), (I-052)+(2.029)+(16.007), (I-052)+(2.029)+(16.008), (I-052)+(2.029)+(17.001), (I-052)+(2.029)+(17.002), (I-052)+(2.029)+(17.003), (I-052)+(2.029)+(17.004), (I-052)+(2.029)+(17.005), (I-052)+(2.029)+(17.006), (I-052)+(2.029)+(17.007), (I-052)+(2.029)+(17.008), (I-052)+(2.029)+(17.009), (I-052)+(2.029)+(17.010), (I-052)+(2.029)+(17.011), (I-052)+(2.029)+(17.012), (I-052)+(2.029)+(18.001), (I-052)+(2.030)+(3.001), (I-052)+(2.030)+(3.002), (I-052)+(2.030)+(3.003), (I-052)+(2.030)+(3.004), (I-052)+(2.030)+(3.005), (I-052)+(2.030)+(3.006), (I-052)+(2.030)+(3.007), (I-052)+(2.030)+(3.008), (I-052)+(2.030)+(3.009), (I-052)+(2.030)+(3.010), (I-052)+(2.030)+(3.011), (I-052)+(2.030)+(3.012), (I-052)+(2.030)+(3.013), (I-052)+(2.030)+(3.014), (I-052)+(2.030)+(3.015), (I-052)+(2.030)+(3.016), (I-052)+(2.030)+(3.017), (I-052)+(2.030)+(3.018), (I-052)+(2.030)+(3.019), (I-052)+(2.030)+(3.020), (I-052)+(2.030)+(3.021), (I-052)+(2.030)+(3.022), (I-052)+(2.030)+(3.023), (I-052)+(2.030)+(3.024), (I-052)+(2.030)+(3.025), (I-052)+(2.030)+(3.026), (I-052)+(2.030)+(3.027), (I-052)+(2.030)+(3.028), (I-052)+(2.030)+(3.029), (I-052)+(2.030)+(3.030), (I-052)+(2.030)+(3.031), (I-052)+(2.030)+(5.001), (I-052)+(2.030)+(5.002), (I-052)+(2.030)+(5.003), (I-052)+(2.030)+(5.004), (I-052)+(2.030)+(5.005), (I-052)+(2.030)+(5.006), (I-052)+(2.030)+(5.007), (I-052)+(2.030)+(5.008), (I-052)+(2.030)+(5.009), (I-052)+(2.030)+(5.010), (I-052)+(2.030)+(5.011), (I-052)+(2.030)+(5.012), (I-052)+(2.030)+(5.013), (I-052)+(2.030)+(5.014), (I-052)+(2.030)+(5.015), (I-052)+(2.030)+(5.016), (I-052)+(2.030)+(5.017), (I-052)+(2.030)+(5.018), (I-052)+(2.030)+(5.019), (I-052)+(2.030)+(5.020), (I-052)+(2.030)+(5.021), (I-052)+(2.030)+(5.022), (I-052)+(2.030)+(5.023), (I-052)+(2.030)+(6.001), (I-052)+(2.030)+(6.002), (I-052)+(2.030)+(6.003), (I-052)+(2.030)+(6.004), (I-052)+(2.030)+(7.001), (I-052)+(2.030)+(7.002), (I-052)+(2.030)+(7.003), (I-052)+(2.030)+(7.004), (I-052)+(2.030)+(7.005), (I-052)+(2.030)+(7.006), (I-052)+(2.030)+(9.001), (I-052)+(2.030)+(9.002), (I-052)+(2.030)+(9.003), (I-052)+(2.030)+(9.004), (I-052)+(2.030)+(9.005), (I-052)+(2.030)+(9.006), (I-052)+(2.030)+(9.007), (I-052)+(2.030)+(9.008), (I-052)+(2.030)+(9.009), (I-052)+(2.030)+(14.001), (I-052)+(2.030)+(14.002), (I-052)+(2.030)+(15.008), (I-052)+(2.030)+(15.011), (I-052)+(2.030)+(15.012), (I-052)+(2.030)+(15.016), (I-052)+(2.030)+(15.025), (I-052)+(2.030)+(15.027), (I-052)+(2.030)+(15.047), (I-052)+(2.030)+(15.063), (I-052)+(2.030)+(15.064), (I-052)+(2.030)+(16.001), (I-052)+(2.030)+(16.002), (I-052)+(2.030)+(16.003), (I-052)+(2.030)+(16.004), (I-052)+(2.030)+(16.005), (I-052)+(2.030)+(16.006), (I-052)+(2.030)+(16.007), (I-052)+(2.030)+(16.008), (I-052)+(2.030)+(17.001), (I-052)+(2.030)+(17.002), (I-052)+(2.030)+(17.003), (I-052)+(2.030)+(17.004), (I-052)+(2.030)+(17.005), (I-052)+(2.030)+(17.006), (I-052)+(2.030)+(17.007), (I-052)+(2.030)+(17.008), (I-052)+(2.030)+(17.009), (I-052)+(2.030)+(17.010), (I-052)+(2.030)+(17.011), (I-052)+(2.030)+(17.012), (I-052)+(2.030)+(18.001), (I-052)+(2.031)+(3.001), (I-052)+(2.031)+(3.002), (I-052)+(2.031)+(3.003), (I-052)+(2.031)+(3.004), (I-052)+(2.031)+(3.005), (I-052)+(2.031)+(3.006), (I-052)+(2.031)+(3.007), (I-052)+(2.031)+(3.008), (I-052)+(2.031)+(3.009), (I-052)+(2.031)+(3.010), (I-052)+(2.031)+(3.011), (I-052)+(2.031)+(3.012), (I-052)+(2.031)+(3.013), (I-052)+(2.031)+(3.014), (I-052)+(2.031)+(3.015), (I-052)+(2.031)+(3.016), (I-052)+(2.031)+(3.017), (I-052)+(2.031)+(3.018), (I-052)+(2.031)+(3.019), (I-052)+(2.031)+(3.020), (I-052)+(2.031)+(3.021), (I-052)+(2.031)+(3.022), (I-052)+(2.031)+(3.023), (I-052)+(2.031)+(3.024), (I-052)+(2.031)+(3.025), (I-052)+(2.031)+(3.026), (I-052)+(2.031)+(3.027), (I-052)+(2.031)+(3.028), (I-052)+(2.031)+(3.029), (I-052)+(2.031)+(3.030), (I-052)+(2.031)+(3.031), (I-052)+(2.031)+(5.001), (I-052)+(2.031)+(5.002), (I-052)+(2.031)+(5.003), (I-052)+(2.031)+(5.004), (I-052)+(2.031)+(5.005), (I-052)+(2.031)+(5.006), (I-052)+(2.031)+(5.007), (I-052)+(2.031)+(5.008), (I-052)+(2.031)+(5.009), (I-052)+(2.031)+(5.010), (I-052)+(2.031)+(5.011), (I-052)+(2.031)+(5.012), (I-052)+(2.031)+(5.013), (I-052)+(2.031)+(5.014), (I-052)+(2.031)+(5.015), (I-052)+(2.031)+(5.016), (I-052)+(2.031)+(5.017), (I-052)+(2.031)+(5.018), (I-052)+(2.031)+(5.019), (I-052)+(2.031)+(5.020), (I-052)+(2.031)+(5.021), (I-052)+(2.031)+(5.022), (I-052)+(2.031)+(5.023), (I-052)+(2.031)+(6.001), (I-052)+(2.031)+(6.002), (I-052)+(2.031)+(6.003), (I-052)+(2.031)+(6.004), (I-052)+(2.031)+(7.001), (I-052)+(2.031)+(7.002), (I-052)+(2.031)+(7.003), (I-052)+(2.031)+(7.004), (I-052)+(2.031)+(7.005), (I-052)+(2.031)+(7.006), (I-052)+(2.031)+(9.001), (I-052)+(2.031)+(9.002), (I-052)+(2.031)+(9.003), (I-052)+(2.031)+(9.004), (I-052)+(2.031)+(9.005), (I-052)+(2.031)+(9.006), (I-052)+(2.031)+(9.007), (I-052)+(2.031)+(9.008), (I-052)+(2.031)+(9.009), (I-052)+(2.031)+(14.001), (I-052)+(2.031)+(14.002), (I-052)+(2.031)+(15.008), (I-052)+(2.031)+(15.011), (I-052)+(2.031)+(15.012), (I-052)+(2.031)+(15.016), (I-052)+(2.031)+(15.025), (I-052)+(2.031)+(15.027), (I-052)+(2.031)+(15.047), (I-052)+(2.031)+(15.063), (I-052)+(2.031)+(15.064), (I-052)+(2.031)+(16.001), (I-052)+(2.031)+(16.002), (I-052)+(2.031)+(16.003), (I-052)+(2.031)+(16.004), (I-052)+(2.031)+(16.005), (I-052)+(2.031)+(16.006), (I-052)+(2.031)+(16.007), (I-052)+(2.031)+(16.008), (I-052)+(2.031)+(17.001), (I-052)+(2.031)+(17.002), (I-052)+(2.031)+(17.003), (I-052)+(2.031)+(17.004), (I-052)+(2.031)+(17.005), (I-052)+(2.031)+(17.006), (I-052)+(2.031)+(17.007), (I-052)+(2.031)+(17.008), (I-052)+(2.031)+(17.009), (I-052)+(2.031)+(17.010), (I-052)+(2.031)+(17.011), (I-052)+(2.031)+(17.012), (I-052)+(2.031)+(18.001), (I-052)+(2.032)+(3.001), (I-052)+(2.032)+(3.002), (I-052)+(2.032)+(3.003), (I-052)+(2.032)+(3.004), (I-052)+(2.032)+(3.005), (I-052)+(2.032)+(3.006), (I-052)+(2.032)+(3.007), (I-052)+(2.032)+(3.008), (I-052)+(2.032)+(3.009), (I-052)+(2.032)+(3.010), (I-052)+(2.032)+(3.011), (I-052)+(2.032)+(3.012), (I-052)+(2.032)+(3.013), (I-052)+(2.032)+(3.014), (I-052)+(2.032)+(3.015), (I-052)+(2.032)+(3.016), (I-052)+(2.032)+(3.017), (I-052)+(2.032)+(3.018), (I-052)+(2.032)+(3.019), (I-052)+(2.032)+(3.020), (I-052)+(2.032)+(3.021), (I-052)+(2.032)+(3.022), (I-052)+(2.032)+(3.023), (I-052)+(2.032)+(3.024), (I-052)+(2.032)+(3.025), (I-052)+(2.032)+(3.026), (I-052)+(2.032)+(3.027), (I-052)+(2.032)+(3.028), (I-052)+(2.032)+(3.029), (I-052)+(2.032)+(3.030), (I-052)+(2.032)+(3.031), (I-052)+(2.032)+(5.001), (I-052)+(2.032)+(5.002), (I-052)+(2.032)+(5.003), (I-052)+(2.032)+(5.004), (I-052)+(2.032)+(5.005), (I-052)+(2.032)+(5.006), (I-052)+(2.032)+(5.007), (I-052)+(2.032)+(5.008), (I-052)+(2.032)+(5.009), (I-052)+(2.032)+(5.010), (I-052)+(2.032)+(5.011), (I-052)+(2.032)+(5.012), (I-052)+(2.032)+(5.013), (I-052)+(2.032)+(5.014), (I-052)+(2.032)+(5.015), (I-052)+(2.032)+(5.016), (I-052)+(2.032)+(5.017), (I-052)+(2.032)+(5.018), (I-052)+(2.032)+(5.019), (I-052)+(2.032)+(5.020), (I-052)+(2.032)+(5.021), (I-052)+(2.032)+(5.022), (I-052)+(2.032)+(5.023), (I-052)+(2.032)+(6.001), (I-052)+(2.032)+(6.002), (I-052)+(2.032)+(6.003), (I-052)+(2.032)+(6.004), (I-052)+(2.032)+(7.001), (I-052)+(2.032)+(7.002), (I-052)+(2.032)+(7.003), (I-052)+(2.032)+(7.004), (I-052)+(2.032)+(7.005), (I-052)+(2.032)+(7.006), (I-052)+(2.032)+(9.001), (I-052)+(2.032)+(9.002), (I-052)+(2.032)+(9.003), (I-052)+(2.032)+(9.004), (I-052)+(2.032)+(9.005), (I-052)+(2.032)+(9.006), (I-052)+(2.032)+(9.007), (I-052)+(2.032)+(9.008), (I-052)+(2.032)+(9.009), (I-052)+(2.032)+(14.001), (I-052)+(2.032)+(14.002), (I-052)+(2.032)+(15.008), (I-052)+(2.032)+(15.011), (I-052)+(2.032)+(15.012), (I-052)+(2.032)+(15.016), (I-052)+(2.032)+(15.025), (I-052)+(2.032)+(15.027), (I-052)+(2.032)+(15.047), (I-052)+(2.032)+(15.063), (I-052)+(2.032)+(15.064), (I-052)+(2.032)+(16.001), (I-052)+(2.032)+(16.002), (I-052)+(2.032)+(16.003), (I-052)+(2.032)+(16.004), (I-052)+(2.032)+(16.005), (I-052)+(2.032)+(16.006), (I-052)+(2.032)+(16.007), (I-052)+(2.032)+(16.008), (I-052)+(2.032)+(17.001), (I-052)+(2.032)+(17.002), (I-052)+(2.032)+(17.003), (I-052)+(2.032)+(17.004), (I-052)+(2.032)+(17.005), (I-052)+(2.032)+(17.006), (I-052)+(2.032)+(17.007), (I-052)+(2.032)+(17.008), (I-052)+(2.032)+(17.009), (I-052)+(2.032)+(17.010), (I-052)+(2.032)+(17.011), (I-052)+(2.032)+(17.012), (I-052)+(2.032)+(18.001), (I-052)+(2.033)+(3.001), (I-052)+(2.033)+(3.002), (I-052)+(2.033)+(3.003), (I-052)+(2.033)+(3.004), (I-052)+(2.033)+(3.005), (I-052)+(2.033)+(3.006), (I-052)+(2.033)+(3.007), (I-052)+(2.033)+(3.008), (I-052)+(2.033)+(3.009), (I-052)+(2.033)+(3.010), (I-052)+(2.033)+(3.011), (I-052)+(2.033)+(3.012), (I-052)+(2.033)+(3.013), (I-052)+(2.033)+(3.014), (I-052)+(2.033)+(3.015), (I-052)+(2.033)+(3.016), (I-052)+(2.033)+(3.017), (I-052)+(2.033)+(3.018), (I-052)+(2.033)+(3.019), (I-052)+(2.033)+(3.020), (I-052)+(2.033)+(3.021), (I-052)+(2.033)+(3.022), (I-052)+(2.033)+(3.023), (I-052)+(2.033)+(3.024), (I-052)+(2.033)+(3.025), (I-052)+(2.033)+(3.026), (I-052)+(2.033)+(3.027), (I-052)+(2.033)+(3.028), (I-052)+(2.033)+(3.029), (I-052)+(2.033)+(3.030), (I-052)+(2.033)+(3.031), (I-052)+(2.033)+(5.001), (I-052)+(2.033)+(5.002), (I-052)+(2.033)+(5.003), (I-052)+(2.033)+(5.004), (I-052)+(2.033)+(5.005), (I-052)+(2.033)+(5.006), (I-052)+(2.033)+(5.007), (I-052)+(2.033)+(5.008), (I-052)+(2.033)+(5.009), (I-052)+(2.033)+(5.010), (I-052)+(2.033)+(5.011), (I-052)+(2.033)+(5.012), (I-052)+(2.033)+(5.013), (I-052)+(2.033)+(5.014), (I-052)+(2.033)+(5.015), (I-052)+(2.033)+(5.016), (I-052)+(2.033)+(5.017), (I-052)+(2.033)+(5.018), (I-052)+(2.033)+(5.019), (I-052)+(2.033)+(5.020), (I-052)+(2.033)+(5.021), (I-052)+(2.033)+(5.022), (I-052)+(2.033)+(5.023), (I-052)+(2.033)+(6.001), (I-052)+(2.033)+(6.002), (I-052)+(2.033)+(6.003), (I-052)+(2.033)+(6.004), (I-052)+(2.033)+(7.001), (I-052)+(2.033)+(7.002), (I-052)+(2.033)+(7.003), (I-052)+(2.033)+(7.004), (I-052)+(2.033)+(7.005), (I-052)+(2.033)+(7.006), (I-052)+(2.033)+(9.001), (I-052)+(2.033)+(9.002), (I-052)+(2.033)+(9.003), (I-052)+(2.033)+(9.004), (I-052)+(2.033)+(9.005), (I-052)+(2.033)+(9.006), (I-052)+(2.033)+(9.007), (I-052)+(2.033)+(9.008), (I-052)+(2.033)+(9.009), (I-052)+(2.033)+(14.001), (I-052)+(2.033)+(14.002), (I-052)+(2.033)+(15.008), (I-052)+(2.033)+(15.011), (I-052)+(2.033)+(15.012), (I-052)+(2.033)+(15.016), (I-052)+(2.033)+(15.025), (I-052)+(2.033)+(15.027), (I-052)+(2.033)+(15.047), (I-052)+(2.033)+(15.063), (I-052)+(2.033)+(15.064), (I-052)+(2.033)+(16.001), (I-052)+(2.033)+(16.002), (I-052)+(2.033)+(16.003), (I-052)+(2.033)+(16.004), (I-052)+(2.033)+(16.005), (I-052)+(2.033)+(16.006), (I-052)+(2.033)+(16.007), (I-052)+(2.033)+(16.008), (I-052)+(2.033)+(17.001), (I-052)+(2.033)+(17.002), (I-052)+(2.033)+(17.003), (I-052)+(2.033)+(17.004), (I-052)+(2.033)+(17.005), (I-052)+(2.033)+(17.006), (I-052)+(2.033)+(17.007), (I-052)+(2.033)+(17.008), (I-052)+(2.033)+(17.009), (I-052)+(2.033)+(17.010), (I-052)+(2.033)+(17.011), (I-052)+(2.033)+(17.012), (I-052)+(2.033)+(18.001), (I-052)+(2.034)+(3.001), (I-052)+(2.034)+(3.002), (I-052)+(2.034)+(3.003), (I-052)+(2.034)+(3.004), (I-052)+(2.034)+(3.005), (I-052)+(2.034)+(3.006), (I-052)+(2.034)+(3.007), (I-052)+(2.034)+(3.008), (I-052)+(2.034)+(3.009), (I-052)+(2.034)+(3.010), (I-052)+(2.034)+(3.011), (I-052)+(2.034)+(3.012), (I-052)+(2.034)+(3.013), (I-052)+(2.034)+(3.014), (I-052)+(2.034)+(3.015), (I-052)+(2.034)+(3.016), (I-052)+(2.034)+(3.017), (I-052)+(2.034)+(3.018), (I-052)+(2.034)+(3.019), (I-052)+(2.034)+(3.020), (I-052)+(2.034)+(3.021), (I-052)+(2.034)+(3.022), (I-052)+(2.034)+(3.023), (I-052)+(2.034)+(3.024), (I-052)+(2.034)+(3.025), (I-052)+(2.034)+(3.026), (I-052)+(2.034)+(3.027), (I-052)+(2.034)+(3.028), (I-052)+(2.034)+(3.029), (I-052)+(2.034)+(3.030), (I-052)+(2.034)+(3.031), (I-052)+(2.034)+(5.001), (I-052)+(2.034)+(5.002), (I-052)+(2.034)+(5.003), (I-052)+(2.034)+(5.004), (I-052)+(2.034)+(5.005), (I-052)+(2.034)+(5.006), (I-052)+(2.034)+(5.007), (I-052)+(2.034)+(5.008), (I-052)+(2.034)+(5.009), (I-052)+(2.034)+(5.010), (I-052)+(2.034)+(5.011), (I-052)+(2.034)+(5.012), (I-052)+(2.034)+(5.013), (I-052)+(2.034)+(5.014), (I-052)+(2.034)+(5.015), (I-052)+(2.034)+(5.016), (I-052)+(2.034)+(5.017), (I-052)+(2.034)+(5.018), (I-052)+(2.034)+(5.019), (I-052)+(2.034)+(5.020), (I-052)+(2.034)+(5.021), (I-052)+(2.034)+(5.022), (I-052)+(2.034)+(5.023), (I-052)+(2.034)+(6.001), (I-052)+(2.034)+(6.002), (I-052)+(2.034)+(6.003), (I-052)+(2.034)+(6.004), (I-052)+(2.034)+(7.001), (I-052)+(2.034)+(7.002), (I-052)+(2.034)+(7.003), (I-052)+(2.034)+(7.004), (I-052)+(2.034)+(7.005), (I-052)+(2.034)+(7.006), (I-052)+(2.034)+(9.001), (I-052)+(2.034)+(9.002), (I-052)+(2.034)+(9.003), (I-052)+(2.034)+(9.004), (I-052)+(2.034)+(9.005), (I-052)+(2.034)+(9.006), (I-052)+(2.034)+(9.007), (I-052)+(2.034)+(9.008), (I-052)+(2.034)+(9.009), (I-052)+(2.034)+(14.001), (I-052)+(2.034)+(14.002), (I-052)+(2.034)+(15.008), (I-052)+(2.034)+(15.011), (I-052)+(2.034)+(15.012), (I-052)+(2.034)+(15.016), (I-052)+(2.034)+(15.025), (I-052)+(2.034)+(15.027), (I-052)+(2.034)+(15.047), (I-052)+(2.034)+(15.063), (I-052)+(2.034)+(15.064), (I-052)+(2.034)+(16.001), (I-052)+(2.034)+(16.002), (I-052)+(2.034)+(16.003), (I-052)+(2.034)+(16.004), (I-052)+(2.034)+(16.005), (I-052)+(2.034)+(16.006), (I-052)+(2.034)+(16.007), (I-052)+(2.034)+(16.008), (I-052)+(2.034)+(17.001), (I-052)+(2.034)+(17.002), (I-052)+(2.034)+(17.003), (I-052)+(2.034)+(17.004), (I-052)+(2.034)+(17.005), (I-052)+(2.034)+(17.006), (I-052)+(2.034)+(17.007), (I-052)+(2.034)+(17.008), (I-052)+(2.034)+(17.009), (I-052)+(2.034)+(17.010), (I-052)+(2.034)+(17.011), (I-052)+(2.034)+(17.012), (I-052)+(2.034)+(18.001), (I-052)+(2.035)+(3.001), (I-052)+(2.035)+(3.002), (I-052)+(2.035)+(3.003), (I-052)+(2.035)+(3.004), (I-052)+(2.035)+(3.005), (I-052)+(2.035)+(3.006), (I-052)+(2.035)+(3.007), (I-052)+(2.035)+(3.008), (I-052)+(2.035)+(3.009), (I-052)+(2.035)+(3.010), (I-052)+(2.035)+(3.011), (I-052)+(2.035)+(3.012), (I-052)+(2.035)+(3.013), (I-052)+(2.035)+(3.014), (I-052)+(2.035)+(3.015), (I-052)+(2.035)+(3.016), (I-052)+(2.035)+(3.017), (I-052)+(2.035)+(3.018), (I-052)+(2.035)+(3.019), (I-052)+(2.035)+(3.020), (I-052)+(2.035)+(3.021), (I-052)+(2.035)+(3.022), (I-052)+(2.035)+(3.023), (I-052)+(2.035)+(3.024), (I-052)+(2.035)+(3.025), (I-052)+(2.035)+(3.026), (I-052)+(2.035)+(3.027), (I-052)+(2.035)+(3.028), (I-052)+(2.035)+(3.029), (I-052)+(2.035)+(3.030), (I-052)+(2.035)+(3.031), (I-052)+(2.035)+(5.001), (I-052)+(2.035)+(5.002), (I-052)+(2.035)+(5.003), (I-052)+(2.035)+(5.004), (I-052)+(2.035)+(5.005), (I-052)+(2.035)+(5.006), (I-052)+(2.035)+(5.007), (I-052)+(2.035)+(5.008), (I-052)+(2.035)+(5.009), (I-052)+(2.035)+(5.010), (I-052)+(2.035)+(5.011), (I-052)+(2.035)+(5.012), (I-052)+(2.035)+(5.013), (I-052)+(2.035)+(5.014), (I-052)+(2.035)+(5.015), (I-052)+(2.035)+(5.016), (I-052)+(2.035)+(5.017), (I-052)+(2.035)+(5.018), (I-052)+(2.035)+(5.019), (I-052)+(2.035)+(5.020), (I-052)+(2.035)+(5.021), (I-052)+(2.035)+(5.022), (I-052)+(2.035)+(5.023), (I-052)+(2.035)+(6.001), (I-052)+(2.035)+(6.002), (I-052)+(2.035)+(6.003), (I-052)+(2.035)+(6.004), (I-052)+(2.035)+(7.001), (I-052)+(2.035)+(7.002), (I-052)+(2.035)+(7.003), (I-052)+(2.035)+(7.004), (I-052)+(2.035)+(7.005), (I-052)+(2.035)+(7.006), (I-052)+(2.035)+(9.001), (I-052)+(2.035)+(9.002), (I-052)+(2.035)+(9.003), (I-052)+(2.035)+(9.004), (I-052)+(2.035)+(9.005), (I-052)+(2.035)+(9.006), (I-052)+(2.035)+(9.007), (I-052)+(2.035)+(9.008), (I-052)+(2.035)+(9.009), (I-052)+(2.035)+(14.001), (I-052)+(2.035)+(14.002), (I-052)+(2.035)+(15.008), (I-052)+(2.035)+(15.011), (I-052)+(2.035)+(15.012), (I-052)+(2.035)+(15.016), (I-052)+(2.035)+(15.025), (I-052)+(2.035)+(15.027), (I-052)+(2.035)+(15.047), (I-052)+(2.035)+(15.063), (I-052)+(2.035)+(15.064), (I-052)+(2.035)+(16.001), (I-052)+(2.035)+(16.002), (I-052)+(2.035)+(16.003), (I-052)+(2.035)+(16.004), (I-052)+(2.035)+(16.005), (I-052)+(2.035)+(16.006), (I-052)+(2.035)+(16.007), (I-052)+(2.035)+(16.008), (I-052)+(2.035)+(17.001), (I-052)+(2.035)+(17.002), (I-052)+(2.035)+(17.003), (I-052)+(2.035)+(17.004), (I-052)+(2.035)+(17.005), (I-052)+(2.035)+(17.006), (I-052)+(2.035)+(17.007), (I-052)+(2.035)+(17.008), (I-052)+(2.035)+(17.009), (I-052)+(2.035)+(17.010), (I-052)+(2.035)+(17.011), (I-052)+(2.035)+(17.012), (I-052)+(2.035)+(18.001), (I-052)+(2.036)+(3.001), (I-052)+(2.036)+(3.002), (I-052)+(2.036)+(3.003), (I-052)+(2.036)+(3.004), (I-052)+(2.036)+(3.005), (I-052)+(2.036)+(3.006), (I-052)+(2.036)+(3.007), (I-052)+(2.036)+(3.008), (I-052)+(2.036)+(3.009), (I-052)+(2.036)+(3.010), (I-052)+(2.036)+(3.011), (I-052)+(2.036)+(3.012), (I-052)+(2.036)+(3.013), (I-052)+(2.036)+(3.014), (I-052)+(2.036)+(3.015), (I-052)+(2.036)+(3.016), (I-052)+(2.036)+(3.017), (I-052)+(2.036)+(3.018), (I-052)+(2.036)+(3.019), (I-052)+(2.036)+(3.020), (I-052)+(2.036)+(3.021), (I-052)+(2.036)+(3.022), (I-052)+(2.036)+(3.023), (I-052)+(2.036)+(3.024), (I-052)+(2.036)+(3.025), (I-052)+(2.036)+(3.026), (I-052)+(2.036)+(3.027), (I-052)+(2.036)+(3.028), (I-052)+(2.036)+(3.029), (I-052)+(2.036)+(3.030), (I-052)+(2.036)+(3.031), (I-052)+(2.036)+(5.001), (I-052)+(2.036)+(5.002), (I-052)+(2.036)+(5.003), (I-052)+(2.036)+(5.004), (I-052)+(2.036)+(5.005), (I-052)+(2.036)+(5.006), (I-052)+(2.036)+(5.007), (I-052)+(2.036)+(5.008), (I-052)+(2.036)+(5.009), (I-052)+(2.036)+(5.010), (I-052)+(2.036)+(5.011), (I-052)+(2.036)+(5.012), (I-052)+(2.036)+(5.013), (I-052)+(2.036)+(5.014), (I-052)+(2.036)+(5.015), (I-052)+(2.036)+(5.016), (I-052)+(2.036)+(5.017), (I-052)+(2.036)+(5.018), (I-052)+(2.036)+(5.019), (I-052)+(2.036)+(5.020), (I-052)+(2.036)+(5.021), (I-052)+(2.036)+(5.022), (I-052)+(2.036)+(5.023), (I-052)+(2.036)+(6.001), (I-052)+(2.036)+(6.002), (I-052)+(2.036)+(6.003), (I-052)+(2.036)+(6.004), (I-052)+(2.036)+(7.001), (I-052)+(2.036)+(7.002), (I-052)+(2.036)+(7.003), (I-052)+(2.036)+(7.004), (I-052)+(2.036)+(7.005), (I-052)+(2.036)+(7.006), (I-052)+(2.036)+(9.001), (I-052)+(2.036)+(9.002), (I-052)+(2.036)+(9.003), (I-052)+(2.036)+(9.004), (I-052)+(2.036)+(9.005), (I-052)+(2.036)+(9.006), (I-052)+(2.036)+(9.007), (I-052)+(2.036)+(9.008), (I-052)+(2.036)+(9.009), (I-052)+(2.036)+(14.001), (I-052)+(2.036)+(14.002), (I-052)+(2.036)+(15.008), (I-052)+(2.036)+(15.011), (I-052)+(2.036)+(15.012), (I-052)+(2.036)+(15.016), (I-052)+(2.036)+(15.025), (I-052)+(2.036)+(15.027), (I-052)+(2.036)+(15.047), (I-052)+(2.036)+(15.063), (I-052)+(2.036)+(15.064), (I-052)+(2.036)+(16.001), (I-052)+(2.036)+(16.002),
(I-052)+(2.036)+(16.003), (I-052)+(2.036)+(16.004),
(I-052)+(2.036)+(16.005), (I-052)+(2.036)+(16.006),
(I-052)+(2.036)+(16.007), (I-052)+(2.036)+(16.008),
(I-052)+(2.036)+(17.001), (I-052)+(2.036)+(17.002),
(I-052)+(2.036)+(17.003), (I-052)+(2.036)+(17.004),
(I-052)+(2.036)+(17.005), (I-052)+(2.036)+(17.006),
(I-052)+(2.036)+(17.007), (I-052)+(2.036)+(17.008),
(I-052)+(2.036)+(17.009), (I-052)+(2.036)+(17.010),
(I-052)+(2.036)+(17.011), (I-052)+(2.036)+(17.012),
(I-052)+(2.036)+(18.001), (I-052)+(2.037)+(3.001), (I-052)+(2.037)+(3.002),
(I-052)+(2.037)+(3.003), (I-052)+(2.037)+(3.004),
(I-052)+(2.037)+(3.005), (I-052)+(2.037)+(3.006),
(I-052)+(2.037)+(3.007), (I-052)+(2.037)+(3.008),
(I-052)+(2.037)+(3.009), (I-052)+(2.037)+(3.010),
(I-052)+(2.037)+(3.011), (I-052)+(2.037)+(3.012),
(I-052)+(2.037)+(3.013), (I-052)+(2.037)+(3.014),
(I-052)+(2.037)+(3.015), (I-052)+(2.037)+(3.016),
(I-052)+(2.037)+(3.017), (I-052)+(2.037)+(3.018),
(I-052)+(2.037)+(3.019), (I-052)+(2.037)+(3.020),
(I-052)+(2.037)+(3.021), (I-052)+(2.037)+(3.022),
(I-052)+(2.037)+(3.023), (I-052)+(2.037)+(3.024),
(I-052)+(2.037)+(3.025), (I-052)+(2.037)+(3.026),
(I-052)+(2.037)+(3.027), (I-052)+(2.037)+(3.028),
(I-052)+(2.037)+(3.029), (I-052)+(2.037)+(3.030),
(I-052)+(2.037)+(3.031), (I-052)+(2.037)+(5.001),
(I-052)+(2.037)+(5.002), (I-052)+(2.037)+(5.003),
(I-052)+(2.037)+(5.004), (I-052)+(2.037)+(5.005),
(I-052)+(2.037)+(5.006), (I-052)+(2.037)+(5.007),
(I-052)+(2.037)+(5.008), (I-052)+(2.037)+(5.009),
(I-052)+(2.037)+(5.010), (I-052)+(2.037)+(5.011),
(I-052)+(2.037)+(5.012), (I-052)+(2.037)+(5.013),
(I-052)+(2.037)+(5.014), (I-052)+(2.037)+(5.015),
(I-052)+(2.037)+(5.016), (I-052)+(2.037)+(5.017),
(I-052)+(2.037)+(5.018), (I-052)+(2.037)+(5.019),
(I-052)+(2.037)+(5.020), (I-052)+(2.037)+(5.021),
(I-052)+(2.037)+(5.022), (I-052)+(2.037)+(5.023),
(I-052)+(2.037)+(6.001), (I-052)+(2.037)+(6.002),
(I-052)+(2.037)+(6.003), (I-052)+(2.037)+(6.004),
(I-052)+(2.037)+(7.001), (I-052)+(2.037)+(7.002),
(I-052)+(2.037)+(7.003), (I-052)+(2.037)+(7.004),
(I-052)+(2.037)+(7.005), (I-052)+(2.037)+(7.006),
(I-052)+(2.037)+(9.001), (I-052)+(2.037)+(9.002),
(I-052)+(2.037)+(9.003), (I-052)+(2.037)+(9.004),
(I-052)+(2.037)+(9.005), (I-052)+(2.037)+(9.006),
(I-052)+(2.037)+(9.007), (I-052)+(2.037)+(9.008),
(I-052)+(2.037)+(9.009), (I-052)+(2.037)+(14.001),
(I-052)+(2.037)+(14.002), (I-052)+(2.037)+(15.008),
(I-052)+(2.037)+(15.011), (I-052)+(2.037)+(15.012),
(I-052)+(2.037)+(15.016), (I-052)+(2.037)+(15.025),
(I-052)+(2.037)+(15.027), (I-052)+(2.037)+(15.047),
(I-052)+(2.037)+(15.063), (I-052)+(2.037)+(15.064),
(I-052)+(2.037)+(16.001), (I-052)+(2.037)+(16.002),
(I-052)+(2.037)+(16.003), (I-052)+(2.037)+(16.004),
(I-052)+(2.037)+(16.005), (I-052)+(2.037)+(16.006),
(I-052)+(2.037)+(16.007), (I-052)+(2.037)+(16.008),
(I-052)+(2.037)+(17.001), (I-052)+(2.037)+(17.002),
(I-052)+(2.037)+(17.003), (I-052)+(2.037)+(17.004),
(I-052)+(2.037)+(17.005), (I-052)+(2.037)+(17.006),
(I-052)+(2.037)+(17.007), (I-052)+(2.037)+(17.008),
(I-052)+(2.037)+(17.009), (I-052)+(2.037)+(17.010),
(I-052)+(2.037)+(17.011), (I-052)+(2.037)+(17.012),
(I-052)+(2.037)+(18.001), (I-052)+(2.038)+(3.001), (I-052)+(2.038)+(3.002),
(I-052)+(2.038)+(3.003), (I-052)+(2.038)+(3.004),
(I-052)+(2.038)+(3.005), (I-052)+(2.038)+(3.006),
(I-052)+(2.038)+(3.007), (I-052)+(2.038)+(3.008),
(I-052)+(2.038)+(3.009), (I-052)+(2.038)+(3.010),
(I-052)+(2.038)+(3.011), (I-052)+(2.038)+(3.012),
(I-052)+(2.038)+(3.013), (I-052)+(2.038)+(3.014),
(I-052)+(2.038)+(3.015), (I-052)+(2.038)+(3.016),
(I-052)+(2.038)+(3.017), (I-052)+(2.038)+(3.018),
(I-052)+(2.038)+(3.019), (I-052)+(2.038)+(3.020),
(I-052)+(2.038)+(3.021), (I-052)+(2.038)+(3.022),
(I-052)+(2.038)+(3.023), (I-052)+(2.038)+(3.024),
(I-052)+(2.038)+(3.025), (I-052)+(2.038)+(3.026),
(I-052)+(2.038)+(3.027), (I-052)+(2.038)+(3.028),
(I-052)+(2.038)+(3.029), (I-052)+(2.038)+(3.030),
(I-052)+(2.038)+(3.031), (I-052)+(2.038)+(5.001),
(I-052)+(2.038)+(5.002), (I-052)+(2.038)+(5.003),
(I-052)+(2.038)+(5.004), (I-052)+(2.038)+(5.005),
(I-052)+(2.038)+(5.006), (I-052)+(2.038)+(5.007),
(I-052)+(2.038)+(5.008), (I-052)+(2.038)+(5.009),
(I-052)+(2.038)+(5.010), (I-052)+(2.038)+(5.011),
(I-052)+(2.038)+(5.012), (I-052)+(2.038)+(5.013),
(I-052)+(2.038)+(5.014), (I-052)+(2.038)+(5.015),
(I-052)+(2.038)+(5.016), (I-052)+(2.038)+(5.017),
(I-052)+(2.038)+(5.018), (I-052)+(2.038)+(5.019),
(I-052)+(2.038)+(5.020), (I-052)+(2.038)+(5.021),
(I-052)+(2.038)+(5.022), (I-052)+(2.038)+(5.023),
(I-052)+(2.038)+(6.001), (I-052)+(2.038)+(6.002),
(I-052)+(2.038)+(6.003), (I-052)+(2.038)+(6.004),
(I-052)+(2.038)+(7.001), (I-052)+(2.038)+(7.002),
(I-052)+(2.038)+(7.003), (I-052)+(2.038)+(7.004),
(I-052)+(2.038)+(7.005), (I-052)+(2.038)+(7.006),
(I-052)+(2.038)+(9.001), (I-052)+(2.038)+(9.002),
(I-052)+(2.038)+(9.003), (I-052)+(2.038)+(9.004),
(I-052)+(2.038)+(9.005), (I-052)+(2.038)+(9.006),
(I-052)+(2.038)+(9.007), (I-052)+(2.038)+(9.008),
(I-052)+(2.038)+(9.009), (I-052)+(2.038)+(14.001),
(I-052)+(2.038)+(14.002), (I-052)+(2.038)+(15.008),
(I-052)+(2.038)+(15.011), (I-052)+(2.038)+(15.012),
(I-052)+(2.038)+(15.016), (I-052)+(2.038)+(15.025),
(I-052)+(2.038)+(15.027), (I-052)+(2.038)+(15.047),
(I-052)+(2.038)+(15.063), (I-052)+(2.038)+(15.064),
(I-052)+(2.038)+(16.001), (I-052)+(2.038)+(16.002),
(I-052)+(2.038)+(16.003), (I-052)+(2.038)+(16.004),
(I-052)+(2.038)+(16.005), (I-052)+(2.038)+(16.006),
(I-052)+(2.038)+(16.007), (I-052)+(2.038)+(16.008),
(I-052)+(2.038)+(17.001), (I-052)+(2.038)+(17.002),
(I-052)+(2.038)+(17.003), (I-052)+(2.038)+(17.004),
(I-052)+(2.038)+(17.005), (I-052)+(2.038)+(17.006),
(I-052)+(2.038)+(17.007), (I-052)+(2.038)+(17.008),
(I-052)+(2.038)+(17.009), (I-052)+(2.038)+(17.010),
(I-052)+(2.038)+(17.011), (I-052)+(2.038)+(17.012),
(I-052)+(2.038)+(18.001), (I-052)+(2.039)+(3.001), (I-052)+(2.039)+(3.002),
(I-052)+(2.039)+(3.003), (I-052)+(2.039)+(3.004),
(I-052)+(2.039)+(3.005), (I-052)+(2.039)+(3.006),
(I-052)+(2.039)+(3.007), (I-052)+(2.039)+(3.008),
(I-052)+(2.039)+(3.009), (I-052)+(2.039)+(3.010),
(I-052)+(2.039)+(3.011), (I-052)+(2.039)+(3.012),
(I-052)+(2.039)+(3.013), (I-052)+(2.039)+(3.014),
(I-052)+(2.039)+(3.015), (I-052)+(2.039)+(3.016),
(I-052)+(2.039)+(3.017), (I-052)+(2.039)+(3.018),
(I-052)+(2.039)+(3.019), (I-052)+(2.039)+(3.020),
(I-052)+(2.039)+(3.021), (I-052)+(2.039)+(3.022),
(I-052)+(2.039)+(3.023), (I-052)+(2.039)+(3.024),
(I-052)+(2.039)+(3.025), (I-052)+(2.039)+(3.026),
(I-052)+(2.039)+(3.027), (I-052)+(2.039)+(3.028),
(I-052)+(2.039)+(3.029), (I-052)+(2.039)+(3.030),
(I-052)+(2.039)+(3.031), (I-052)+(2.039)+(5.001),
(I-052)+(2.039)+(5.002), (I-052)+(2.039)+(5.003), (I-052)+(2.039)+(5.004), (I-052)+(2.039)+(5.005), (I-052)+(2.039)+(5.006), (I-052)+(2.039)+(5.007), (I-052)+(2.039)+(5.008), (I-052)+(2.039)+(5.009), (I-052)+(2.039)+(5.010), (I-052)+(2.039)+(5.011), (I-052)+(2.039)+(5.012), (I-052)+(2.039)+(5.013), (I-052)+(2.039)+(5.014), (I-052)+(2.039)+(5.015), (I-052)+(2.039)+(5.016), (I-052)+(2.039)+(5.017), (I-052)+(2.039)+(5.018), (I-052)+(2.039)+(5.019), (I-052)+(2.039)+(5.020), (I-052)+(2.039)+(5.021), (I-052)+(2.039)+(5.022), (I-052)+(2.039)+(5.023), (I-052)+(2.039)+(6.001), (I-052)+(2.039)+(6.002), (I-052)+(2.039)+(6.003), (I-052)+(2.039)+(6.004), (I-052)+(2.039)+(7.001), (I-052)+(2.039)+(7.002), (I-052)+(2.039)+(7.003), (I-052)+(2.039)+(7.004), (I-052)+(2.039)+(7.005), (I-052)+(2.039)+(7.006), (I-052)+(2.039)+(9.001), (I-052)+(2.039)+(9.002), (I-052)+(2.039)+(9.003), (I-052)+(2.039)+(9.004), (I-052)+(2.039)+(9.005), (I-052)+(2.039)+(9.006), (I-052)+(2.039)+(9.007), (I-052)+(2.039)+(9.008), (I-052)+(2.039)+(9.009), (I-052)+(2.039)+(14.001), (I-052)+(2.039)+(14.002), (I-052)+(2.039)+(15.008), (I-052)+(2.039)+(15.011), (I-052)+(2.039)+(15.012), (I-052)+(2.039)+(15.016), (I-052)+(2.039)+(15.025), (I-052)+(2.039)+(15.027), (I-052)+(2.039)+(15.047), (I-052)+(2.039)+(15.063), (I-052)+(2.039)+(15.064), (I-052)+(2.039)+(16.001), (I-052)+(2.039)+(16.002), (I-052)+(2.039)+(16.003), (I-052)+(2.039)+(16.004), (I-052)+(2.039)+(16.005), (I-052)+(2.039)+(16.006), (I-052)+(2.039)+(16.007), (I-052)+(2.039)+(16.008), (I-052)+(2.039)+(17.001), (I-052)+(2.039)+(17.002), (I-052)+(2.039)+(17.003), (I-052)+(2.039)+(17.004), (I-052)+(2.039)+(17.005), (I-052)+(2.039)+(17.006), (I-052)+(2.039)+(17.007), (I-052)+(2.039)+(17.008), (I-052)+(2.039)+(17.009), (I-052)+(2.039)+(17.010), (I-052)+(2.039)+(17.011), (I-052)+(2.039)+(17.012), (I-052)+(2.039)+(18.001), (I-052)+(2.040)+(3.001), (I-052)+(2.040)+(3.002), (I-052)+(2.040)+(3.003), (I-052)+(2.040)+(3.004), (I-052)+(2.040)+(3.005), (I-052)+(2.040)+(3.006), (I-052)+(2.040)+(3.007), (I-052)+(2.040)+(3.008), (I-052)+(2.040)+(3.009), (I-052)+(2.040)+(3.010), (I-052)+(2.040)+(3.011), (I-052)+(2.040)+(3.012), (I-052)+(2.040)+(3.013), (I-052)+(2.040)+(3.014), (I-052)+(2.040)+(3.015), (I-052)+(2.040)+(3.016), (I-052)+(2.040)+(3.017), (I-052)+(2.040)+(3.018), (I-052)+(2.040)+(3.019), (I-052)+(2.040)+(3.020), (I-052)+(2.040)+(3.021), (I-052)+(2.040)+(3.022), (I-052)+(2.040)+(3.023), (I-052)+(2.040)+(3.024), (I-052)+(2.040)+(3.025), (I-052)+(2.040)+(3.026), (I-052)+(2.040)+(3.027), (I-052)+(2.040)+(3.028), (I-052)+(2.040)+(3.029), (I-052)+(2.040)+(3.030), (I-052)+(2.040)+(3.031), (I-052)+(2.040)+(5.001), (I-052)+(2.040)+(5.002), (I-052)+(2.040)+(5.003), (I-052)+(2.040)+(5.004), (I-052)+(2.040)+(5.005), (I-052)+(2.040)+(5.006), (I-052)+(2.040)+(5.007), (I-052)+(2.040)+(5.008), (I-052)+(2.040)+(5.009), (I-052)+(2.040)+(5.010), (I-052)+(2.040)+(5.011), (I-052)+(2.040)+(5.012), (I-052)+(2.040)+(5.013), (I-052)+(2.040)+(5.014), (I-052)+(2.040)+(5.015), (I-052)+(2.040)+(5.016), (I-052)+(2.040)+(5.017), (I-052)+(2.040)+(5.018), (I-052)+(2.040)+(5.019), (I-052)+(2.040)+(5.020), (I-052)+(2.040)+(5.021), (I-052)+(2.040)+(5.022), (I-052)+(2.040)+(5.023), (I-052)+(2.040)+(6.001), (I-052)+(2.040)+(6.002), (I-052)+(2.040)+(6.003), (I-052)+(2.040)+(6.004), (I-052)+(2.040)+(7.001), (I-052)+(2.040)+(7.002), (I-052)+(2.040)+(7.003), (I-052)+(2.040)+(7.004), (I-052)+(2.040)+(7.005), (I-052)+(2.040)+(7.006), (I-052)+(2.040)+(9.001), (I-052)+(2.040)+(9.002), (I-052)+(2.040)+(9.003), (I-052)+(2.040)+(9.004), (I-052)+(2.040)+(9.005), (I-052)+(2.040)+(9.006), (I-052)+(2.040)+(9.007), (I-052)+(2.040)+(9.008), (I-052)+(2.040)+(9.009), (I-052)+(2.040)+(14.001), (I-052)+(2.040)+(14.002), (I-052)+(2.040)+(15.008), (I-052)+(2.040)+(15.011), (I-052)+(2.040)+(15.012), (I-052)+(2.040)+(15.016), (I-052)+(2.040)+(15.025), (I-052)+(2.040)+(15.027), (I-052)+(2.040)+(15.047), (I-052)+(2.040)+(15.063), (I-052)+(2.040)+(15.064), (I-052)+(2.040)+(16.001), (I-052)+(2.040)+(16.002), (I-052)+(2.040)+(16.003), (I-052)+(2.040)+(16.004), (I-052)+(2.040)+(16.005), (I-052)+(2.040)+(16.006), (I-052)+(2.040)+(16.007), (I-052)+(2.040)+(16.008), (I-052)+(2.040)+(17.001), (I-052)+(2.040)+(17.002), (I-052)+(2.040)+(17.003), (I-052)+(2.040)+(17.004), (I-052)+(2.040)+(17.005), (I-052)+(2.040)+(17.006), (I-052)+(2.040)+(17.007), (I-052)+(2.040)+(17.008), (I-052)+(2.040)+(17.009), (I-052)+(2.040)+(17.010), (I-052)+(2.040)+(17.011), (I-052)+(2.040)+(17.012), (I-052)+(2.040)+(18.001), (I-052)+(2.041)+(3.001), (I-052)+(2.041)+(3.002), (I-052)+(2.041)+(3.003), (I-052)+(2.041)+(3.004), (I-052)+(2.041)+(3.005), (I-052)+(2.041)+(3.006), (I-052)+(2.041)+(3.007), (I-052)+(2.041)+(3.008), (I-052)+(2.041)+(3.009), (I-052)+(2.041)+(3.010), (I-052)+(2.041)+(3.011), (I-052)+(2.041)+(3.012), (I-052)+(2.041)+(3.013), (I-052)+(2.041)+(3.014), (I-052)+(2.041)+(3.015), (I-052)+(2.041)+(3.016), (I-052)+(2.041)+(3.017), (I-052)+(2.041)+(3.018), (I-052)+(2.041)+(3.019), (I-052)+(2.041)+(3.020), (I-052)+(2.041)+(3.021), (I-052)+(2.041)+(3.022), (I-052)+(2.041)+(3.023), (I-052)+(2.041)+(3.024), (I-052)+(2.041)+(3.025), (I-052)+(2.041)+(3.026), (I-052)+(2.041)+(3.027), (I-052)+(2.041)+(3.028), (I-052)+(2.041)+(3.029), (I-052)+(2.041)+(3.030), (I-052)+(2.041)+(3.031), (I-052)+(2.041)+(5.001), (I-052)+(2.041)+(5.002), (I-052)+(2.041)+(5.003), (I-052)+(2.041)+(5.004), (I-052)+(2.041)+(5.005), (I-052)+(2.041)+(5.006), (I-052)+(2.041)+(5.007), (I-052)+(2.041)+(5.008), (I-052)+(2.041)+(5.009), (I-052)+(2.041)+(5.010), (I-052)+(2.041)+(5.011), (I-052)+(2.041)+(5.012), (I-052)+(2.041)+(5.013), (I-052)+(2.041)+(5.014), (I-052)+(2.041)+(5.015), (I-052)+(2.041)+(5.016), (I-052)+(2.041)+(5.017), (I-052)+(2.041)+(5.018), (I-052)+(2.041)+(5.019), (I-052)+(2.041)+(5.020), (I-052)+(2.041)+(5.021), (I-052)+(2.041)+(5.022), (I-052)+(2.041)+(5.023), (I-052)+(2.041)+(6.001), (I-052)+(2.041)+(6.002), (I-052)+(2.041)+(6.003), (I-052)+(2.041)+(6.004), (I-052)+(2.041)+(7.001), (I-052)+(2.041)+(7.002), (I-052)+(2.041)+(7.003), (I-052)+(2.041)+(7.004), (I-052)+(2.041)+(7.005), (I-052)+(2.041)+(7.006), (I-052)+(2.041)+(9.001), (I-052)+(2.041)+(9.002), (I-052)+(2.041)+(9.003), (I-052)+(2.041)+(9.004), (I-052)+(2.041)+(9.005), (I-052)+(2.041)+(9.006), (I-052)+(2.041)+(9.007), (I-052)+(2.041)+(9.008), (I-052)+(2.041)+(9.009), (I-052)+(2.041)+(14.001), (I-052)+(2.041)+(14.002), (I-052)+(2.041)+(15.008), (I-052)+(2.041)+(15.011), (I-052)+(2.041)+(15.012), (I-052)+(2.041)+(15.016), (I-052)+(2.041)+(15.025), (I-052)+(2.041)+(15.027), (I-052)+(2.041)+(15.047), (I-052)+(2.041)+(15.063), (I-052)+(2.041)+(15.064), (I-052)+(2.041)+(16.001), (I-052)+(2.041)+(16.002), (I-052)+(2.041)+(16.003), (I-052)+(2.041)+(16.004), (I-052)+(2.041)+(16.005), (I-052)+(2.041)+(16.006), (I-052)+(2.041)+(16.007), (I-052)+(2.041)+(16.008), (I-052)+(2.041)+(17.001), (I-052)+(2.041)+(17.002), (I-052)+(2.041)+(17.003), (I-052)+(2.041)+(17.004), (I-052)+(2.041)+(17.005), (I-052)+(2.041)+(17.006), (I-052)+(2.041)+(17.007), (I-052)+(2.041)+(17.008), (I-052)+(2.041)+(17.009), (I-052)+(2.041)+(17.010), (I-052)+(2.041)+(17.011), (I-052)+(2.041)+(17.012), (I-052)+(2.041)+(18.001), (I-052)+(2.042)+(3.001), (I-052)+(2.042)+(3.002), (I-052)+(2.042)+(3.003), (I-052)+(2.042)+(3.004), (I-052)+(2.042)+(3.005), (I-052)+(2.042)+(3.006), (I-052)+(2.042)+(3.007), (I-052)+(2.042)+(3.008), (I-052)+(2.042)+(3.009), (I-052)+(2.042)+(3.010), (I-052)+(2.042)+(3.011), (I-052)+(2.042)+(3.012), (I-052)+(2.042)+(3.013), (I-052)+(2.042)+(3.014), (I-052)+(2.042)+(3.015), (I-052)+(2.042)+(3.016), (I-052)+(2.042)+(3.017), (I-052)+(2.042)+(3.018), (I-052)+(2.042)+(3.019), (I-052)+(2.042)+(3.020), (I-052)+(2.042)+(3.021), (I-052)+(2.042)+(3.022), (I-052)+(2.042)+(3.023), (I-052)+(2.042)+(3.024), (I-052)+(2.042)+(3.025), (I-052)+(2.042)+(3.026), (I-052)+(2.042)+(3.027), (I-052)+(2.042)+(3.028), (I-052)+(2.042)+(3.029), (I-052)+(2.042)+(3.030), (I-052)+(2.042)+(3.031), (I-052)+(2.042)+(5.001), (I-052)+(2.042)+(5.002), (I-052)+(2.042)+(5.003), (I-052)+(2.042)+(5.004), (I-052)+(2.042)+(5.005), (I-052)+(2.042)+(5.006), (I-052)+(2.042)+(5.007), (I-052)+(2.042)+(5.008), (I-052)+(2.042)+(5.009), (I-052)+(2.042)+(5.010), (I-052)+(2.042)+(5.011), (I-052)+(2.042)+(5.012), (I-052)+(2.042)+(5.013), (I-052)+(2.042)+(5.014), (I-052)+(2.042)+(5.015), (I-052)+(2.042)+(5.016), (I-052)+(2.042)+(5.017), (I-052)+(2.042)+(5.018), (I-052)+(2.042)+(5.019), (I-052)+(2.042)+(5.020), (I-052)+(2.042)+(5.021), (I-052)+(2.042)+(5.022), (I-052)+(2.042)+(5.023), (I-052)+(2.042)+(6.001), (I-052)+(2.042)+(6.002), (I-052)+(2.042)+(6.003), (I-052)+(2.042)+(6.004), (I-052)+(2.042)+(7.001), (I-052)+(2.042)+(7.002), (I-052)+(2.042)+(7.003), (I-052)+(2.042)+(7.004), (I-052)+(2.042)+(7.005), (I-052)+(2.042)+(7.006), (I-052)+(2.042)+(9.001), (I-052)+(2.042)+(9.002), (I-052)+(2.042)+(9.003), (I-052)+(2.042)+(9.004), (I-052)+(2.042)+(9.005), (I-052)+(2.042)+(9.006), (I-052)+(2.042)+(9.007), (I-052)+(2.042)+(9.008), (I-052)+(2.042)+(9.009), (I-052)+(2.042)+(14.001), (I-052)+(2.042)+(14.002), (I-052)+(2.042)+(15.008), (I-052)+(2.042)+(15.011), (I-052)+(2.042)+(15.012), (I-052)+(2.042)+(15.016), (I-052)+(2.042)+(15.025), (I-052)+(2.042)+(15.027), (I-052)+(2.042)+(15.047), (I-052)+(2.042)+(15.063), (I-052)+(2.042)+(15.064), (I-052)+(2.042)+(16.001), (I-052)+(2.042)+(16.002), (I-052)+(2.042)+(16.003), (I-052)+(2.042)+(16.004), (I-052)+(2.042)+(16.005), (I-052)+(2.042)+(16.006), (I-052)+(2.042)+(16.007), (I-052)+(2.042)+(16.008), (I-052)+(2.042)+(17.001), (I-052)+(2.042)+(17.002), (I-052)+(2.042)+(17.003), (I-052)+(2.042)+(17.004), (I-052)+(2.042)+(17.005), (I-052)+(2.042)+(17.006), (I-052)+(2.042)+(17.007), (I-052)+(2.042)+(17.008), (I-052)+(2.042)+(17.009), (I-052)+(2.042)+(17.010), (I-052)+(2.042)+(17.011), (I-052)+(2.042)+(17.012), (I-052)+(2.042)+(18.001), (I-052)+(2.043)+(3.001), (I-052)+(2.043)+(3.002), (I-052)+(2.043)+(3.003), (I-052)+(2.043)+(3.004), (I-052)+(2.043)+(3.005), (I-052)+(2.043)+(3.006), (I-052)+(2.043)+(3.007), (I-052)+(2.043)+(3.008), (I-052)+(2.043)+(3.009), (I-052)+(2.043)+(3.010), (I-052)+(2.043)+(3.011), (I-052)+(2.043)+(3.012), (I-052)+(2.043)+(3.013), (I-052)+(2.043)+(3.014), (I-052)+(2.043)+(3.015), (I-052)+(2.043)+(3.016), (I-052)+(2.043)+(3.017), (I-052)+(2.043)+(3.018), (I-052)+(2.043)+(3.019), (I-052)+(2.043)+(3.020), (I-052)+(2.043)+(3.021), (I-052)+(2.043)+(3.022), (I-052)+(2.043)+(3.023), (I-052)+(2.043)+(3.024), (I-052)+(2.043)+(3.025), (I-052)+(2.043)+(3.026), (I-052)+(2.043)+(3.027), (I-052)+(2.043)+(3.028), (I-052)+(2.043)+(3.029), (I-052)+(2.043)+(3.030), (I-052)+(2.043)+(3.031), (I-052)+(2.043)+(5.001), (I-052)+(2.043)+(5.002), (I-052)+(2.043)+(5.003), (I-052)+(2.043)+(5.004), (I-052)+(2.043)+(5.005), (I-052)+(2.043)+(5.006), (I-052)+(2.043)+(5.007), (I-052)+(2.043)+(5.008), (I-052)+(2.043)+(5.009), (I-052)+(2.043)+(5.010), (I-052)+(2.043)+(5.011), (I-052)+(2.043)+(5.012), (I-052)+(2.043)+(5.013), (I-052)+(2.043)+(5.014), (I-052)+(2.043)+(5.015), (I-052)+(2.043)+(5.016), (I-052)+(2.043)+(5.017), (I-052)+(2.043)+(5.018), (I-052)+(2.043)+(5.019), (I-052)+(2.043)+(5.020), (I-052)+(2.043)+(5.021), (I-052)+(2.043)+(5.022), (I-052)+(2.043)+(5.023), (I-052)+(2.043)+(6.001), (I-052)+(2.043)+(6.002), (I-052)+(2.043)+(6.003), (I-052)+(2.043)+(6.004), (I-052)+(2.043)+(7.001), (I-052)+(2.043)+(7.002), (I-052)+(2.043)+(7.003), (I-052)+(2.043)+(7.004), (I-052)+(2.043)+(7.005), (I-052)+(2.043)+(7.006), (I-052)+(2.043)+(9.001), (I-052)+(2.043)+(9.002), (I-052)+(2.043)+(9.003), (I-052)+(2.043)+(9.004), (I-052)+(2.043)+(9.005), (I-052)+(2.043)+(9.006), (I-052)+(2.043)+(9.007), (I-052)+(2.043)+(9.008), (I-052)+(2.043)+(9.009), (I-052)+(2.043)+(14.001), (I-052)+(2.043)+(14.002), (I-052)+(2.043)+(15.008), (I-052)+(2.043)+(15.011), (I-052)+(2.043)+(15.012), (I-052)+(2.043)+(15.016), (I-052)+(2.043)+(15.025), (I-052)+(2.043)+(15.027), (I-052)+(2.043)+(15.047), (I-052)+(2.043)+(15.063), (I-052)+(2.043)+(15.064), (I-052)+(2.043)+(16.001), (I-052)+(2.043)+(16.002), (I-052)+(2.043)+(16.003), (I-052)+(2.043)+(16.004), (I-052)+(2.043)+(16.005), (I-052)+(2.043)+(16.006), (I-052)+(2.043)+(16.007), (I-052)+(2.043)+(16.008), (I-052)+(2.043)+(17.001), (I-052)+(2.043)+(17.002), (I-052)+(2.043)+(17.003), (I-052)+(2.043)+(17.004), (I-052)+(2.043)+(17.005), (I-052)+(2.043)+(17.006), (I-052)+(2.043)+(17.007), (I-052)+(2.043)+(17.008), (I-052)+(2.043)+(17.009), (I-052)+(2.043)+(17.010), (I-052)+(2.043)+(17.011), (I-052)+(2.043)+(17.012), (I-052)+(2.043)+(18.001), (I-052)+(2.044)+(3.001), (I-052)+(2.044)+(3.002), (I-052)+(2.044)+(3.003), (I-052)+(2.044)+(3.004), (I-052)+(2.044)+(3.005), (I-052)+(2.044)+(3.006), (I-052)+(2.044)+(3.007), (I-052)+(2.044)+(3.008), (I-052)+(2.044)+(3.009), (I-052)+(2.044)+(3.010), (I-052)+(2.044)+(3.011), (I-052)+(2.044)+(3.012), (I-052)+(2.044)+(3.013), (I-052)+(2.044)+(3.014), (I-052)+(2.044)+(3.015), (I-052)+(2.044)+(3.016), (I-052)+(2.044)+(3.017), (I-052)+(2.044)+(3.018), (I-052)+(2.044)+(3.019), (I-052)+(2.044)+(3.020), (I-052)+(2.044)+(3.021), (I-052)+(2.044)+(3.022), (I-052)+(2.044)+(3.023), (I-052)+(2.044)+(3.024), (I-052)+(2.044)+(3.025), (I-052)+(2.044)+(3.026), (I-052)+(2.044)+(3.027), (I-052)+(2.044)+(3.028), (I-052)+(2.044)+(3.029), (I-052)+(2.044)+(3.030), (I-052)+(2.044)+(3.031), (I-052)+(2.044)+(5.001), (I-052)+(2.044)+(5.002), (I-052)+(2.044)+(5.003), (I-052)+(2.044)+(5.004), (I-052)+(2.044)+(5.005), (I-052)+(2.044)+(5.006), (I-052)+(2.044)+(5.007), (I-052)+(2.044)+(5.008), (I-052)+(2.044)+(5.009), (I-052)+(2.044)+(5.010), (I-052)+(2.044)+(5.011), (I-052)+(2.044)+(5.012), (I-052)+(2.044)+(5.013), (I-052)+(2.044)+(5.014), (I-052)+(2.044)+(5.015), (I-052)+(2.044)+(5.016), (I-052)+(2.044)+(5.017), (I-052)+(2.044)+(5.018), (I-052)+(2.044)+(5.019), (I-052)+(2.044)+(5.020), (I-052)+(2.044)+(5.021), (I-052)+(2.044)+(5.022), (I-052)+(2.044)+(5.023), (I-052)+(2.044)+(6.001), (I-052)+(2.044)+(6.002), (I-052)+(2.044)+(6.003), (I-052)+(2.044)+(6.004), (I-052)+(2.044)+(7.001), (I-052)+(2.044)+(7.002), (I-052)+(2.044)+(7.003), (I-052)+(2.044)+(7.004), (I-052)+(2.044)+(7.005), (I-052)+(2.044)+(7.006), (I-052)+(2.044)+(9.001), (I-052)+(2.044)+(9.002), (I-052)+(2.044)+(9.003), (I-052)+(2.044)+(9.004), (I-052)+(2.044)+(9.005), (I-052)+(2.044)+(9.006), (I-052)+(2.044)+(9.007), (I-052)+(2.044)+(9.008), (I-052)+(2.044)+(9.009), (I-052)+(2.044)+(14.001), (I-052)+(2.044)+(14.002), (I-052)+(2.044)+(15.008), (I-052)+(2.044)+(15.011), (I-052)+(2.044)+(15.012), (I-052)+(2.044)+(15.016), (I-052)+(2.044)+(15.025), (I-052)+(2.044)+(15.027), (I-052)+(2.044)+(15.047), (I-052)+(2.044)+(15.063), (I-052)+(2.044)+(15.064), (I-052)+(2.044)+(16.001), (I-052)+(2.044)+(16.002), (I-052)+(2.044)+(16.003), (I-052)+(2.044)+(16.004), (I-052)+(2.044)+(16.005), (I-052)+(2.044)+(16.006), (I-052)+(2.044)+(16.007), (I-052)+(2.044)+(16.008), (I-052)+(2.044)+(17.001), (I-052)+(2.044)+(17.002), (I-052)+(2.044)+(17.003), (I-052)+(2.044)+(17.004), (I-052)+(2.044)+(17.005), (I-052)+(2.044)+(17.006), (I-052)+(2.044)+(17.007), (I-052)+(2.044)+(17.008), (I-052)+(2.044)+(17.009), (I-052)+(2.044)+(17.010), (I-052)+(2.044)+(17.011), (I-052)+(2.044)+(17.012), (I-052)+(2.044)+(18.001), (I-052)+(2.045)+(3.001), (I-052)+(2.045)+(3.002), (I-052)+(2.045)+(3.003), (I-052)+(2.045)+(3.004), (I-052)+(2.045)+(3.005), (I-052)+(2.045)+(3.006), (I-052)+(2.045)+(3.007), (I-052)+(2.045)+(3.008), (I-052)+(2.045)+(3.009), (I-052)+(2.045)+(3.010), (I-052)+(2.045)+(3.011), (I-052)+(2.045)+(3.012), (I-052)+(2.045)+(3.013), (I-052)+(2.045)+(3.014), (I-052)+(2.045)+(3.015), (I-052)+(2.045)+(3.016), (I-052)+(2.045)+(3.017), (I-052)+(2.045)+(3.018), (I-052)+(2.045)+(3.019), (I-052)+(2.045)+(3.020), (I-052)+(2.045)+(3.021), (I-052)+(2.045)+(3.022), (I-052)+(2.045)+(3.023), (I-052)+(2.045)+(3.024), (I-052)+(2.045)+(3.025), (I-052)+(2.045)+(3.026), (I-052)+(2.045)+(3.027), (I-052)+(2.045)+(3.028), (I-052)+(2.045)+(3.029), (I-052)+(2.045)+(3.030), (I-052)+(2.045)+(3.031), (I-052)+(2.045)+(5.001), (I-052)+(2.045)+(5.002), (I-052)+(2.045)+(5.003), (I-052)+(2.045)+(5.004), (I-052)+(2.045)+(5.005), (I-052)+(2.045)+(5.006), (I-052)+(2.045)+(5.007), (I-052)+(2.045)+(5.008), (I-052)+(2.045)+(5.009), (I-052)+(2.045)+(5.010), (I-052)+(2.045)+(5.011), (I-052)+(2.045)+(5.012), (I-052)+(2.045)+(5.013), (I-052)+(2.045)+(5.014), (I-052)+(2.045)+(5.015), (I-052)+(2.045)+(5.016), (I-052)+(2.045)+(5.017), (I-052)+(2.045)+(5.018), (I-052)+(2.045)+(5.019), (I-052)+(2.045)+(5.020), (I-052)+(2.045)+(5.021), (I-052)+(2.045)+(5.022), (I-052)+(2.045)+(5.023), (I-052)+(2.045)+(6.001), (I-052)+(2.045)+(6.002), (I-052)+(2.045)+(6.003), (I-052)+(2.045)+(6.004), (I-052)+(2.045)+(7.001), (I-052)+(2.045)+(7.002), (I-052)+(2.045)+(7.003), (I-052)+(2.045)+(7.004), (I-052)+(2.045)+(7.005), (I-052)+(2.045)+(7.006), (I-052)+(2.045)+(9.001), (I-052)+(2.045)+(9.002), (I-052)+(2.045)+(9.003), (I-052)+(2.045)+(9.004), (I-052)+(2.045)+(9.005), (I-052)+(2.045)+(9.006), (I-052)+(2.045)+(9.007), (I-052)+(2.045)+(9.008), (I-052)+(2.045)+(9.009), (I-052)+(2.045)+(14.001), (I-052)+(2.045)+(14.002), (I-052)+(2.045)+(15.008), (I-052)+(2.045)+(15.011), (I-052)+(2.045)+(15.012), (I-052)+(2.045)+(15.016), (I-052)+(2.045)+(15.025), (I-052)+(2.045)+(15.027), (I-052)+(2.045)+(15.047), (I-052)+(2.045)+(15.063), (I-052)+(2.045)+(15.064), (I-052)+(2.045)+(16.001), (I-052)+(2.045)+(16.002), (I-052)+(2.045)+(16.003), (I-052)+(2.045)+(16.004), (I-052)+(2.045)+(16.005), (I-052)+(2.045)+(16.006), (I-052)+(2.045)+(16.007), (I-052)+(2.045)+(16.008), (I-052)+(2.045)+(17.001), (I-052)+(2.045)+(17.002), (I-052)+(2.045)+(17.003), (I-052)+(2.045)+(17.004), (I-052)+(2.045)+(17.005), (I-052)+(2.045)+(17.006), (I-052)+(2.045)+(17.007), (I-052)+(2.045)+(17.008), (I-052)+(2.045)+(17.009), (I-052)+(2.045)+(17.010), (I-052)+(2.045)+(17.011), (I-052)+(2.045)+(17.012), (I-052)+(2.045)+(18.001), (I-052)+(2.046)+(3.001), (I-052)+(2.046)+(3.002), (I-052)+(2.046)+(3.003), (I-052)+(2.046)+(3.004), (I-052)+(2.046)+(3.005), (I-052)+(2.046)+(3.006), (I-052)+(2.046)+(3.007), (I-052)+(2.046)+(3.008), (I-052)+(2.046)+(3.009), (I-052)+(2.046)+(3.010), (I-052)+(2.046)+(3.011), (I-052)+(2.046)+(3.012), (I-052)+(2.046)+(3.013), (I-052)+(2.046)+(3.014), (I-052)+(2.046)+(3.015), (I-052)+(2.046)+(3.016), (I-052)+(2.046)+(3.017), (I-052)+(2.046)+(3.018), (I-052)+(2.046)+(3.019), (I-052)+(2.046)+(3.020), (I-052)+(2.046)+(3.021), (I-052)+(2.046)+(3.022), (I-052)+(2.046)+(3.023), (I-052)+(2.046)+(3.024), (I-052)+(2.046)+(3.025), (I-052)+(2.046)+(3.026), (I-052)+(2.046)+(3.027), (I-052)+(2.046)+(3.028), (I-052)+(2.046)+(3.029), (I-052)+(2.046)+(3.030), (I-052)+(2.046)+(3.031), (I-052)+(2.046)+(5.001), (I-052)+(2.046)+(5.002), (I-052)+(2.046)+(5.003), (I-052)+(2.046)+(5.004), (I-052)+(2.046)+(5.005), (I-052)+(2.046)+(5.006), (I-052)+(2.046)+(5.007), (I-052)+(2.046)+(5.008), (I-052)+(2.046)+(5.009), (I-052)+(2.046)+(5.010), (I-052)+(2.046)+(5.011), (I-052)+(2.046)+(5.012), (I-052)+(2.046)+(5.013), (I-052)+(2.046)+(5.014), (I-052)+(2.046)+(5.015), (I-052)+(2.046)+(5.016), (I-052)+(2.046)+(5.017), (I-052)+(2.046)+(5.018), (I-052)+(2.046)+(5.019), (I-052)+(2.046)+(5.020), (I-052)+(2.046)+(5.021), (I-052)+(2.046)+(5.022), (I-052)+(2.046)+(5.023), (I-052)+(2.046)+(6.001), (I-052)+(2.046)+(6.002), (I-052)+(2.046)+(6.003), (I-052)+(2.046)+(6.004), (I-052)+(2.046)+(7.001), (I-052)+(2.046)+(7.002), (I-052)+(2.046)+(7.003), (I-052)+(2.046)+(7.004), (I-052)+(2.046)+(7.005), (I-052)+(2.046)+(7.006), (I-052)+(2.046)+(9.001), (I-052)+(2.046)+(9.002), (I-052)+(2.046)+(9.003), (I-052)+(2.046)+(9.004), (I-052)+(2.046)+(9.005), (I-052)+(2.046)+(9.006), (I-052)+(2.046)+(9.007), (I-052)+(2.046)+(9.008), (I-052)+(2.046)+(9.009), (I-052)+(2.046)+(14.001), (I-052)+(2.046)+(14.002), (I-052)+(2.046)+(15.008), (I-052)+(2.046)+(15.011), (I-052)+(2.046)+(15.012), (I-052)+(2.046)+(15.016), (I-052)+(2.046)+(15.025), (I-052)+(2.046)+(15.027), (I-052)+(2.046)+(15.047), (I-052)+(2.046)+(15.063), (I-052)+(2.046)+(15.064), (I-052)+(2.046)+(16.001), (I-052)+(2.046)+(16.002), (I-052)+(2.046)+(16.003), (I-052)+(2.046)+(16.004), (I-052)+(2.046)+(16.005), (I-052)+(2.046)+(16.006), (I-052)+(2.046)+(16.007), (I-052)+(2.046)+(16.008), (I-052)+(2.046)+(17.001), (I-052)+(2.046)+(17.002), (I-052)+(2.046)+(17.003), (I-052)+(2.046)+(17.004), (I-052)+(2.046)+(17.005), (I-052)+(2.046)+(17.006), (I-052)+(2.046)+(17.007), (I-052)+(2.046)+(17.008), (I-052)+(2.046)+(17.009), (I-052)+(2.046)+(17.010), (I-052)+(2.046)+(17.011), (I-052)+(2.046)+(17.012), (I-052)+(2.046)+(18.001), (I-052)+(2.047)+(3.001), (I-052)+(2.047)+(3.002), (I-052)+(2.047)+(3.003), (I-052)+(2.047)+(3.004), (I-052)+(2.047)+(3.005), (I-052)+(2.047)+(3.006), (I-052)+(2.047)+(3.007), (I-052)+(2.047)+(3.008), (I-052)+(2.047)+(3.009), (I-052)+(2.047)+(3.010), (I-052)+(2.047)+(3.011), (I-052)+(2.047)+(3.012), (I-052)+(2.047)+(3.013), (I-052)+(2.047)+(3.014), (I-052)+(2.047)+(3.015), (I-052)+(2.047)+(3.016), (I-052)+(2.047)+(3.017), (I-052)+(2.047)+(3.018), (I-052)+(2.047)+(3.019), (I-052)+(2.047)+(3.020), (I-052)+(2.047)+(3.021), (I-052)+(2.047)+(3.022), (I-052)+(2.047)+(3.023), (I-052)+(2.047)+(3.024), (I-052)+(2.047)+(3.025), (I-052)+(2.047)+(3.026), (I-052)+(2.047)+(3.027), (I-052)+(2.047)+(3.028), (I-052)+(2.047)+(3.029), (I-052)+(2.047)+(3.030), (I-052)+(2.047)+(3.031), (I-052)+(2.047)+(5.001), (I-052)+(2.047)+(5.002), (I-052)+(2.047)+(5.003), (I-052)+(2.047)+(5.004), (I-052)+(2.047)+(5.005), (I-052)+(2.047)+(5.006), (I-052)+(2.047)+(5.007), (I-052)+(2.047)+(5.008), (I-052)+(2.047)+(5.009), (I-052)+(2.047)+(5.010), (I-052)+(2.047)+(5.011), (I-052)+(2.047)+(5.012), (I-052)+(2.047)+(5.013), (I-052)+(2.047)+(5.014), (I-052)+(2.047)+(5.015), (I-052)+(2.047)+(5.016), (I-052)+(2.047)+(5.017), (I-052)+(2.047)+(5.018), (I-052)+(2.047)+(5.019), (I-052)+(2.047)+(5.020), (I-052)+(2.047)+(5.021), (I-052)+(2.047)+(5.022), (I-052)+(2.047)+(5.023), (I-052)+(2.047)+(6.001), (I-052)+(2.047)+(6.002), (I-052)+(2.047)+(6.003), (I-052)+(2.047)+(6.004), (I-052)+(2.047)+(7.001), (I-052)+(2.047)+(7.002), (I-052)+(2.047)+(7.003), (I-052)+(2.047)+(7.004), (I-052)+(2.047)+(7.005), (I-052)+(2.047)+(7.006), (I-052)+(2.047)+(9.001), (I-052)+(2.047)+(9.002), (I-052)+(2.047)+(9.003), (I-052)+(2.047)+(9.004), (I-052)+(2.047)+(9.005), (I-052)+(2.047)+(9.006), (I-052)+(2.047)+(9.007), (I-052)+(2.047)+(9.008), (I-052)+(2.047)+(9.009), (I-052)+(2.047)+(14.001), (I-052)+(2.047)+(14.002), (I-052)+(2.047)+(15.008), (I-052)+(2.047)+(15.011), (I-052)+(2.047)+(15.012), (I-052)+(2.047)+(15.016), (I-052)+(2.047)+(15.025), (I-052)+(2.047)+(15.027), (I-052)+(2.047)+(15.047), (I-052)+(2.047)+(15.063), (I-052)+(2.047)+(15.064), (I-052)+(2.047)+(16.001), (I-052)+(2.047)+(16.002), (I-052)+(2.047)+(16.003), (I-052)+(2.047)+(16.004), (I-052)+(2.047)+(16.005), (I-052)+(2.047)+(16.006), (I-052)+(2.047)+(16.007), (I-052)+(2.047)+(16.008), (I-052)+(2.047)+(17.001), (I-052)+(2.047)+(17.002), (I-052)+(2.047)+(17.003), (I-052)+(2.047)+(17.004), (I-052)+(2.047)+(17.005), (I-052)+(2.047)+(17.006), (I-052)+(2.047)+(17.007), (I-052)+(2.047)+(17.008), (I-052)+(2.047)+(17.009), (I-052)+(2.047)+(17.010), (I-052)+(2.047)+(17.011), (I-052)+(2.047)+(17.012), (I-052)+(2.047)+(18.001), (I-052)+(2.048)+(3.001), (I-052)+(2.048)+(3.002), (I-052)+(2.048)+(3.003), (I-052)+(2.048)+(3.004), (I-052)+(2.048)+(3.005), (I-052)+(2.048)+(3.006), (I-052)+(2.048)+(3.007), (I-052)+(2.048)+(3.008), (I-052)+(2.048)+(3.009), (I-052)+(2.048)+(3.010), (I-052)+(2.048)+(3.011), (I-052)+(2.048)+(3.012), (I-052)+(2.048)+(3.013), (I-052)+(2.048)+(3.014), (I-052)+(2.048)+(3.015), (I-052)+(2.048)+(3.016), (I-052)+(2.048)+(3.017), (I-052)+(2.048)+(3.018), (I-052)+(2.048)+(3.019), (I-052)+(2.048)+(3.020), (I-052)+(2.048)+(3.021), (I-052)+(2.048)+(3.022), (I-052)+(2.048)+(3.023), (I-052)+(2.048)+(3.024), (I-052)+(2.048)+(3.025), (I-052)+(2.048)+(3.026), (I-052)+(2.048)+(3.027), (I-052)+(2.048)+(3.028), (I-052)+(2.048)+(3.029), (I-052)+(2.048)+(3.030), (I-052)+(2.048)+(3.031), (I-052)+(2.048)+(5.001), (I-052)+(2.048)+(5.002), (I-052)+(2.048)+(5.003), (I-052)+(2.048)+(5.004), (I-052)+(2.048)+(5.005), (I-052)+(2.048)+(5.006), (I-052)+(2.048)+(5.007), (I-052)+(2.048)+(5.008), (I-052)+(2.048)+(5.009), (I-052)+(2.048)+(5.010), (I-052)+(2.048)+(5.011), (I-052)+(2.048)+(5.012), (I-052)+(2.048)+(5.013), (I-052)+(2.048)+(5.014), (I-052)+(2.048)+(5.015), (I-052)+(2.048)+(5.016), (I-052)+(2.048)+(5.017), (I-052)+(2.048)+(5.018), (I-052)+(2.048)+(5.019), (I-052)+(2.048)+(5.020), (I-052)+(2.048)+(5.021), (I-052)+(2.048)+(5.022), (I-052)+(2.048)+(5.023), (I-052)+(2.048)+(6.001), (I-052)+(2.048)+(6.002), (I-052)+(2.048)+(6.003), (I-052)+(2.048)+(6.004), (I-052)+(2.048)+(7.001), (I-052)+(2.048)+(7.002), (I-052)+(2.048)+(7.003), (I-052)+(2.048)+(7.004), (I-052)+(2.048)+(7.005), (I-052)+(2.048)+(7.006), (I-052)+(2.048)+(9.001), (I-052)+(2.048)+(9.002), (I-052)+(2.048)+(9.003), (I-052)+(2.048)+(9.004), (I-052)+(2.048)+(9.005), (I-052)+(2.048)+(9.006), (I-052)+(2.048)+(9.007), (I-052)+(2.048)+(9.008), (I-052)+(2.048)+(9.009), (I-052)+(2.048)+(14.001), (I-052)+(2.048)+(14.002), (I-052)+(2.048)+(15.008), (I-052)+(2.048)+(15.011), (I-052)+(2.048)+(15.012), (I-052)+(2.048)+(15.016), (I-052)+(2.048)+(15.025), (I-052)+(2.048)+(15.027), (I-052)+(2.048)+(15.047), (I-052)+(2.048)+(15.063), (I-052)+(2.048)+(15.064), (I-052)+(2.048)+(16.001), (I-052)+(2.048)+(16.002), (I-052)+(2.048)+(16.003), (I-052)+(2.048)+(16.004), (I-052)+(2.048)+(16.005), (I-052)+(2.048)+(16.006), (I-052)+(2.048)+(16.007), (I-052)+(2.048)+(16.008), (I-052)+(2.048)+(17.001), (I-052)+(2.048)+(17.002), (I-052)+(2.048)+(17.003), (I-052)+(2.048)+(17.004), (I-052)+(2.048)+(17.005), (I-052)+(2.048)+(17.006), (I-052)+(2.048)+(17.007), (I-052)+(2.048)+(17.008), (I-052)+(2.048)+(17.009), (I-052)+(2.048)+(17.010), (I-052)+(2.048)+(17.011), (I-052)+(2.048)+(17.012), (I-052)+(2.048)+(18.001), (I-052)+(2.049)+(3.001), (I-052)+(2.049)+(3.002), (I-052)+(2.049)+(3.003), (I-052)+(2.049)+(3.004), (I-052)+(2.049)+(3.005), (I-052)+(2.049)+(3.006), (I-052)+(2.049)+(3.007), (I-052)+(2.049)+(3.008), (I-052)+(2.049)+(3.009), (I-052)+(2.049)+(3.010), (I-052)+(2.049)+(3.011), (I-052)+(2.049)+(3.012), (I-052)+(2.049)+(3.013), (I-052)+(2.049)+(3.014), (I-052)+(2.049)+(3.015), (I-052)+(2.049)+(3.016), (I-052)+(2.049)+(3.017), (I-052)+(2.049)+(3.018), (I-052)+(2.049)+(3.019), (I-052)+(2.049)+(3.020), (I-052)+(2.049)+(3.021), (I-052)+(2.049)+(3.022), (I-052)+(2.049)+(3.023), (I-052)+(2.049)+(3.024), (I-052)+(2.049)+(3.025), (I-052)+(2.049)+(3.026), (I-052)+(2.049)+(3.027), (I-052)+(2.049)+(3.028), (I-052)+(2.049)+(3.029), (I-052)+(2.049)+(3.030), (I-052)+(2.049)+(3.031), (I-052)+(2.049)+(5.001), (I-052)+(2.049)+(5.002), (I-052)+(2.049)+(5.003), (I-052)+(2.049)+(5.004), (I-052)+(2.049)+(5.005), (I-052)+(2.049)+(5.006), (I-052)+(2.049)+(5.007), (I-052)+(2.049)+(5.008), (I-052)+(2.049)+(5.009), (I-052)+(2.049)+(5.010), (I-052)+(2.049)+(5.011), (I-052)+(2.049)+(5.012), (I-052)+(2.049)+(5.013), (I-052)+(2.049)+(5.014), (I-052)+(2.049)+(5.015), (I-052)+(2.049)+(5.016), (I-052)+(2.049)+(5.017), (I-052)+(2.049)+(5.018), (I-052)+(2.049)+(5.019), (I-052)+(2.049)+(5.020), (I-052)+(2.049)+(5.021), (I-052)+(2.049)+(5.022), (I-052)+(2.049)+(5.023), (I-052)+(2.049)+(6.001), (I-052)+(2.049)+(6.002), (I-052)+(2.049)+(6.003), (I-052)+(2.049)+(6.004), (I-052)+(2.049)+(7.001), (I-052)+(2.049)+(7.002), (I-052)+(2.049)+(7.003), (I-052)+(2.049)+(7.004), (I-052)+(2.049)+(7.005), (I-052)+(2.049)+(7.006), (I-052)+(2.049)+(9.001), (I-052)+(2.049)+(9.002), (I-052)+(2.049)+(9.003), (I-052)+(2.049)+(9.004), (I-052)+(2.049)+(9.005), (I-052)+(2.049)+(9.006), (I-052)+(2.049)+(9.007), (I-052)+(2.049)+(9.008), (I-052)+(2.049)+(9.009), (I-052)+(2.049)+(14.001), (I-052)+(2.049)+(14.002), (I-052)+(2.049)+(15.008), (I-052)+(2.049)+(15.011), (I-052)+(2.049)+(15.012), (I-052)+(2.049)+(15.016), (I-052)+(2.049)+(15.025), (I-052)+(2.049)+(15.027), (I-052)+(2.049)+(15.047), (I-052)+(2.049)+(15.063), (I-052)+(2.049)+(15.064), (I-052)+(2.049)+(16.001), (I-052)+(2.049)+(16.002), (I-052)+(2.049)+(16.003), (I-052)+(2.049)+(16.004), (I-052)+(2.049)+(16.005), (I-052)+(2.049)+(16.006), (I-052)+(2.049)+(16.007), (I-052)+(2.049)+(16.008), (I-052)+(2.049)+(17.001), (I-052)+(2.049)+(17.002), (I-052)+(2.049)+(17.003), (I-052)+(2.049)+(17.004), (I-052)+(2.049)+(17.005), (I-052)+(2.049)+(17.006), (I-052)+(2.049)+(17.007), (I-052)+(2.049)+(17.008), (I-052)+(2.049)+(17.009), (I-052)+(2.049)+(17.010), (I-052)+(2.049)+(17.011), (I-052)+(2.049)+(17.012), (I-052)+(2.049)+(18.001), (I-052)+(2.050)+(3.001), (I-052)+(2.050)+(3.002), (I-052)+(2.050)+(3.003), (I-052)+(2.050)+(3.004), (I-052)+(2.050)+(3.005), (I-052)+(2.050)+(3.006), (I-052)+(2.050)+(3.007), (I-052)+(2.050)+(3.008), (I-052)+(2.050)+(3.009), (I-052)+(2.050)+(3.010), (I-052)+(2.050)+(3.011), (I-052)+(2.050)+(3.012), (I-052)+(2.050)+(3.013), (I-052)+(2.050)+(3.014), (I-052)+(2.050)+(3.015), (I-052)+(2.050)+(3.016), (I-052)+(2.050)+(3.017), (I-052)+(2.050)+(3.018), (I-052)+(2.050)+(3.019), (I-052)+(2.050)+(3.020), (I-052)+(2.050)+(3.021), (I-052)+(2.050)+(3.022), (I-052)+(2.050)+(3.023), (I-052)+(2.050)+(3.024), (I-052)+(2.050)+(3.025), (I-052)+(2.050)+(3.026), (I-052)+(2.050)+(3.027), (I-052)+(2.050)+(3.028), (I-052)+(2.050)+(3.029), (I-052)+(2.050)+(3.030), (I-052)+(2.050)+(3.031), (I-052)+(2.050)+(5.001), (I-052)+(2.050)+(5.002), (I-052)+(2.050)+(5.003), (I-052)+(2.050)+(5.004), (I-052)+(2.050)+(5.005), (I-052)+(2.050)+(5.006), (I-052)+(2.050)+(5.007), (I-052)+(2.050)+(5.008), (I-052)+(2.050)+(5.009), (I-052)+(2.050)+(5.010), (I-052)+(2.050)+(5.011), (I-052)+(2.050)+(5.012), (I-052)+(2.050)+(5.013), (I-052)+(2.050)+(5.014), (I-052)+(2.050)+(5.015), (I-052)+(2.050)+(5.016), (I-052)+(2.050)+(5.017), (I-052)+(2.050)+(5.018), (I-052)+(2.050)+(5.019), (I-052)+(2.050)+(5.020), (I-052)+(2.050)+(5.021), (I-052)+(2.050)+(5.022), (I-052)+(2.050)+(5.023), (I-052)+(2.050)+(6.001), (I-052)+(2.050)+(6.002), (I-052)+(2.050)+(6.003), (I-052)+(2.050)+(6.004), (I-052)+(2.050)+(7.001), (I-052)+(2.050)+(7.002), (I-052)+(2.050)+(7.003), (I-052)+(2.050)+(7.004), (I-052)+(2.050)+(7.005), (I-052)+(2.050)+(7.006), (I-052)+(2.050)+(9.001), (I-052)+(2.050)+(9.002), (I-052)+(2.050)+(9.003), (I-052)+(2.050)+(9.004), (I-052)+(2.050)+(9.005), (I-052)+(2.050)+(9.006), (I-052)+(2.050)+(9.007), (I-052)+(2.050)+(9.008), (I-052)+(2.050)+(9.009), (I-052)+(2.050)+(14.001), (I-052)+(2.050)+(14.002), (I-052)+(2.050)+(15.008), (I-052)+(2.050)+(15.011), (I-052)+(2.050)+(15.012), (I-052)+(2.050)+(15.016), (I-052)+(2.050)+(15.025), (I-052)+(2.050)+(15.027), (I-052)+(2.050)+(15.047), (I-052)+(2.050)+(15.063), (I-052)+(2.050)+(15.064), (I-052)+(2.050)+(16.001), (I-052)+(2.050)+(16.002), (I-052)+(2.050)+(16.003), (I-052)+(2.050)+(16.004), (I-052)+(2.050)+(16.005), (I-052)+(2.050)+(16.006), (I-052)+(2.050)+(16.007), (I-052)+(2.050)+(16.008), (I-052)+(2.050)+(17.001), (I-052)+(2.050)+(17.002), (I-052)+(2.050)+(17.003), (I-052)+(2.050)+(17.004), (I-052)+(2.050)+(17.005), (I-052)+(2.050)+(17.006), (I-052)+(2.050)+(17.007), (I-052)+(2.050)+(17.008), (I-052)+(2.050)+(17.009), (I-052)+(2.050)+(17.010), (I-052)+(2.050)+(17.011), (I-052)+(2.050)+(17.012), (I-052)+(2.050)+(18.001), (I-052)+(2.051)+(3.001), (I-052)+(2.051)+(3.002), (I-052)+(2.051)+(3.003), (I-052)+(2.051)+(3.004), (I-052)+(2.051)+(3.005), (I-052)+(2.051)+(3.006), (I-052)+(2.051)+(3.007), (I-052)+(2.051)+(3.008), (I-052)+(2.051)+(3.009), (I-052)+(2.051)+(3.010), (I-052)+(2.051)+(3.011), (I-052)+(2.051)+(3.012), (I-052)+(2.051)+(3.013), (I-052)+(2.051)+(3.014), (I-052)+(2.051)+(3.015), (I-052)+(2.051)+(3.016), (I-052)+(2.051)+(3.017), (I-052)+(2.051)+(3.018), (I-052)+(2.051)+(3.019), (I-052)+(2.051)+(3.020), (I-052)+(2.051)+(3.021), (I-052)+(2.051)+(3.022), (I-052)+(2.051)+(3.023), (I-052)+(2.051)+(3.024), (I-052)+(2.051)+(3.025), (I-052)+(2.051)+(3.026), (I-052)+(2.051)+(3.027), (I-052)+(2.051)+(3.028), (I-052)+(2.051)+(3.029), (I-052)+(2.051)+(3.030), (I-052)+(2.051)+(3.031), (I-052)+(2.051)+(5.001), (I-052)+(2.051)+(5.002), (I-052)+(2.051)+(5.003), (I-052)+(2.051)+(5.004), (I-052)+(2.051)+(5.005), (I-052)+(2.051)+(5.006), (I-052)+(2.051)+(5.007), (I-052)+(2.051)+(5.008), (I-052)+(2.051)+(5.009), (I-052)+(2.051)+(5.010), (I-052)+(2.051)+(5.011), (I-052)+(2.051)+(5.012), (I-052)+(2.051)+(5.013), (I-052)+(2.051)+(5.014), (I-052)+(2.051)+(5.015), (I-052)+(2.051)+(5.016), (I-052)+(2.051)+(5.017), (I-052)+(2.051)+(5.018), (I-052)+(2.051)+(5.019), (I-052)+(2.051)+(5.020), (I-052)+(2.051)+(5.021), (I-052)+(2.051)+(5.022), (I-052)+(2.051)+(5.023), (I-052)+(2.051)+(6.001), (I-052)+(2.051)+(6.002), (I-052)+(2.051)+(6.003), (I-052)+(2.051)+(6.004), (I-052)+(2.051)+(7.001), (I-052)+(2.051)+(7.002), (I-052)+(2.051)+(7.003), (I-052)+(2.051)+(7.004), (I-052)+(2.051)+(7.005), (I-052)+(2.051)+(7.006), (I-052)+(2.051)+(9.001), (I-052)+(2.051)+(9.002), (I-052)+(2.051)+(9.003), (I-052)+(2.051)+(9.004), (I-052)+(2.051)+(9.005), (I-052)+(2.051)+(9.006), (I-052)+(2.051)+(9.007), (I-052)+(2.051)+(9.008), (I-052)+(2.051)+(9.009), (I-052)+(2.051)+(14.001), (I-052)+(2.051)+(14.002), (I-052)+(2.051)+(15.008), (I-052)+(2.051)+(15.011), (I-052)+(2.051)+(15.012), (I-052)+(2.051)+(15.016), (I-052)+(2.051)+(15.025), (I-052)+(2.051)+(15.027), (I-052)+(2.051)+(15.047), (I-052)+(2.051)+(15.063), (I-052)+(2.051)+(15.064), (I-052)+(2.051)+(16.001), (I-052)+(2.051)+(16.002), (I-052)+(2.051)+(16.003), (I-052)+(2.051)+(16.004), (I-052)+(2.051)+(16.005), (I-052)+(2.051)+(16.006), (I-052)+(2.051)+(16.007), (I-052)+(2.051)+(16.008), (I-052)+(2.051)+(17.001), (I-052)+(2.051)+(17.002), (I-052)+(2.051)+(17.003), (I-052)+(2.051)+(17.004), (I-052)+(2.051)+(17.005), (I-052)+(2.051)+(17.006), (I-052)+(2.051)+(17.007), (I-052)+(2.051)+(17.008), (I-052)+(2.051)+(17.009), (I-052)+(2.051)+(17.010), (I-052)+(2.051)+(17.011), (I-052)+(2.051)+(17.012), (I-052)+(2.051)+(18.001), (I-052)+(2.052)+(3.001), (I-052)+(2.052)+(3.002), (I-052)+(2.052)+(3.003), (I-052)+(2.052)+(3.004), (I-052)+(2.052)+(3.005), (I-052)+(2.052)+(3.006), (I-052)+(2.052)+(3.007), (I-052)+(2.052)+(3.008), (I-052)+(2.052)+(3.009), (I-052)+(2.052)+(3.010), (I-052)+(2.052)+(3.011), (I-052)+(2.052)+(3.012), (I-052)+(2.052)+(3.013), (I-052)+(2.052)+(3.014), (I-052)+(2.052)+(3.015), (I-052)+(2.052)+(3.016), (I-052)+(2.052)+(3.017), (I-052)+(2.052)+(3.018), (I-052)+(2.052)+(3.019), (I-052)+(2.052)+(3.020), (I-052)+(2.052)+(3.021), (I-052)+(2.052)+(3.022), (I-052)+(2.052)+(3.023), (I-052)+(2.052)+(3.024), (I-052)+(2.052)+(3.025), (I-052)+(2.052)+(3.026), (I-052)+(2.052)+(3.027), (I-052)+(2.052)+(3.028), (I-052)+(2.052)+(3.029), (I-052)+(2.052)+(3.030), (I-052)+(2.052)+(3.031), (I-052)+(2.052)+(5.001), (I-052)+(2.052)+(5.002), (I-052)+(2.052)+(5.003), (I-052)+(2.052)+(5.004), (I-052)+(2.052)+(5.005), (I-052)+(2.052)+(5.006), (I-052)+(2.052)+(5.007), (I-052)+(2.052)+(5.008), (I-052)+(2.052)+(5.009), (I-052)+(2.052)+(5.010), (I-052)+(2.052)+(5.011), (I-052)+(2.052)+(5.012), (I-052)+(2.052)+(5.013), (I-052)+(2.052)+(5.014), (I-052)+(2.052)+(5.015), (I-052)+(2.052)+(5.016), (I-052)+(2.052)+(5.017), (I-052)+(2.052)+(5.018), (I-052)+(2.052)+(5.019), (I-052)+(2.052)+(5.020), (I-052)+(2.052)+(5.021), (I-052)+(2.052)+(5.022), (I-052)+(2.052)+(5.023), (I-052)+(2.052)+(6.001), (I-052)+(2.052)+(6.002), (I-052)+(2.052)+(6.003), (I-052)+(2.052)+(6.004), (I-052)+(2.052)+(7.001), (I-052)+(2.052)+(7.002), (I-052)+(2.052)+(7.003), (I-052)+(2.052)+(7.004), (I-052)+(2.052)+(7.005), (I-052)+(2.052)+(7.006), (I-052)+(2.052)+(9.001), (I-052)+(2.052)+(9.002), (I-052)+(2.052)+(9.003), (I-052)+(2.052)+(9.004), (I-052)+(2.052)+(9.005), (I-052)+(2.052)+(9.006), (I-052)+(2.052)+(9.007), (I-052)+(2.052)+(9.008), (I-052)+(2.052)+(9.009), (I-052)+(2.052)+(14.001), (I-052)+(2.052)+(14.002), (I-052)+(2.052)+(15.008), (I-052)+(2.052)+(15.011), (I-052)+(2.052)+(15.012), (I-052)+(2.052)+(15.016), (I-052)+(2.052)+(15.025), (I-052)+(2.052)+(15.027), (I-052)+(2.052)+(15.047), (I-052)+(2.052)+(15.063), (I-052)+(2.052)+(15.064), (I-052)+(2.052)+(16.001), (I-052)+(2.052)+(16.002), (I-052)+(2.052)+(16.003), (I-052)+(2.052)+(16.004), (I-052)+(2.052)+(16.005), (I-052)+(2.052)+(16.006), (I-052)+(2.052)+(16.007), (I-052)+(2.052)+(16.008), (I-052)+(2.052)+(17.001), (I-052)+(2.052)+(17.002), (I-052)+(2.052)+(17.003), (I-052)+(2.052)+(17.004), (I-052)+(2.052)+(17.005), (I-052)+(2.052)+(17.006), (I-052)+(2.052)+(17.007), (I-052)+(2.052)+(17.008), (I-052)+(2.052)+(17.009), (I-052)+(2.052)+(17.010), (I-052)+(2.052)+(17.011), (I-052)+(2.052)+(17.012), (I-052)+(2.052)+(18.001), (I-052)+(2.053)+(3.001), (I-052)+(2.053)+(3.002), (I-052)+(2.053)+(3.003), (I-052)+(2.053)+(3.004), (I-052)+(2.053)+(3.005), (I-052)+(2.053)+(3.006), (I-052)+(2.053)+(3.007), (I-052)+(2.053)+(3.008), (I-052)+(2.053)+(3.009), (I-052)+(2.053)+(3.010), (I-052)+(2.053)+(3.011), (I-052)+(2.053)+(3.012), (I-052)+(2.053)+(3.013), (I-052)+(2.053)+(3.014), (I-052)+(2.053)+(3.015), (I-052)+(2.053)+(3.016), (I-052)+(2.053)+(3.017), (I-052)+(2.053)+(3.018), (I-052)+(2.053)+(3.019), (I-052)+(2.053)+(3.020), (I-052)+(2.053)+(3.021), (I-052)+(2.053)+(3.022), (I-052)+(2.053)+(3.023), (I-052)+(2.053)+(3.024), (I-052)+(2.053)+(3.025), (I-052)+(2.053)+(3.026), (I-052)+(2.053)+(3.027), (I-052)+(2.053)+(3.028), (I-052)+(2.053)+(3.029), (I-052)+(2.053)+(3.030), (I-052)+(2.053)+(3.031), (I-052)+(2.053)+(5.001), (I-052)+(2.053)+(5.002), (I-052)+(2.053)+(5.003), (I-052)+(2.053)+(5.004), (I-052)+(2.053)+(5.005), (I-052)+(2.053)+(5.006), (I-052)+(2.053)+(5.007), (I-052)+(2.053)+(5.008), (I-052)+(2.053)+(5.009), (I-052)+(2.053)+(5.010), (I-052)+(2.053)+(5.011), (I-052)+(2.053)+(5.012), (I-052)+(2.053)+(5.013), (I-052)+(2.053)+(5.014), (I-052)+(2.053)+(5.015), (I-052)+(2.053)+(5.016), (I-052)+(2.053)+(5.017), (I-052)+(2.053)+(5.018), (I-052)+(2.053)+(5.019), (I-052)+(2.053)+(5.020), (I-052)+(2.053)+(5.021), (I-052)+(2.053)+(5.022), (I-052)+(2.053)+(5.023), (I-052)+(2.053)+(6.001), (I-052)+(2.053)+(6.002), (I-052)+(2.053)+(6.003), (I-052)+(2.053)+(6.004), (I-052)+(2.053)+(7.001), (I-052)+(2.053)+(7.002), (I-052)+(2.053)+(7.003), (I-052)+(2.053)+(7.004), (I-052)+(2.053)+(7.005), (I-052)+(2.053)+(7.006), (I-052)+(2.053)+(9.001), (I-052)+(2.053)+(9.002), (I-052)+(2.053)+(9.003), (I-052)+(2.053)+(9.004), (I-052)+(2.053)+(9.005), (I-052)+(2.053)+(9.006), (I-052)+(2.053)+(9.007), (I-052)+(2.053)+(9.008), (I-052)+(2.053)+(9.009), (I-052)+(2.053)+(14.001), (I-052)+(2.053)+(14.002), (I-052)+(2.053)+(15.008), (I-052)+(2.053)+(15.011), (I-052)+(2.053)+(15.012), (I-052)+(2.053)+(15.016), (I-052)+(2.053)+(15.025), (I-052)+(2.053)+(15.027), (I-052)+(2.053)+(15.047), (I-052)+(2.053)+(15.063), (I-052)+(2.053)+(15.064), (I-052)+(2.053)+(16.001), (I-052)+(2.053)+(16.002), (I-052)+(2.053)+(16.003), (I-052)+(2.053)+(16.004), (I-052)+(2.053)+(16.005), (I-052)+(2.053)+(16.006), (I-052)+(2.053)+(16.007), (I-052)+(2.053)+(16.008), (I-052)+(2.053)+(17.001), (I-052)+(2.053)+(17.002), (I-052)+(2.053)+(17.003), (I-052)+(2.053)+(17.004), (I-052)+(2.053)+(17.005), (I-052)+(2.053)+(17.006), (I-052)+(2.053)+(17.007), (I-052)+(2.053)+(17.008), (I-052)+(2.053)+(17.009), (I-052)+(2.053)+(17.010), (I-052)+(2.053)+(17.011), (I-052)+(2.053)+(17.012), (I-052)+(2.053)+(18.001), (I-052)+(2.054)+(3.001), (I-052)+(2.054)+(3.002), (I-052)+(2.054)+(3.003), (I-052)+(2.054)+(3.004), (I-052)+(2.054)+(3.005), (I-052)+(2.054)+(3.006), (I-052)+(2.054)+(3.007), (I-052)+(2.054)+(3.008), (I-052)+(2.054)+(3.009), (I-052)+(2.054)+(3.010), (I-052)+(2.054)+(3.011), (I-052)+(2.054)+(3.012), (I-052)+(2.054)+(3.013), (I-052)+(2.054)+(3.014), (I-052)+(2.054)+(3.015), (I-052)+(2.054)+(3.016), (I-052)+(2.054)+(3.017), (I-052)+(2.054)+(3.018), (I-052)+(2.054)+(3.019), (I-052)+(2.054)+(3.020), (I-052)+(2.054)+(3.021), (I-052)+(2.054)+(3.022), (I-052)+(2.054)+(3.023), (I-052)+(2.054)+(3.024), (I-052)+(2.054)+(3.025), (I-052)+(2.054)+(3.026), (I-052)+(2.054)+(3.027), (I-052)+(2.054)+(3.028), (I-052)+(2.054)+(3.029), (I-052)+(2.054)+(3.030), (I-052)+(2.054)+(3.031), (I-052)+(2.054)+(5.001), (I-052)+(2.054)+(5.002), (I-052)+(2.054)+(5.003), (I-052)+(2.054)+(5.004), (I-052)+(2.054)+(5.005), (I-052)+(2.054)+(5.006), (I-052)+(2.054)+(5.007), (I-052)+(2.054)+(5.008), (I-052)+(2.054)+(5.009), (I-052)+(2.054)+(5.010), (I-052)+(2.054)+(5.011), (I-052)+(2.054)+(5.012), (I-052)+(2.054)+(5.013), (I-052)+(2.054)+(5.014), (I-052)+(2.054)+(5.015), (I-052)+(2.054)+(5.016), (I-052)+(2.054)+(5.017), (I-052)+(2.054)+(5.018), (I-052)+(2.054)+(5.019), (I-052)+(2.054)+(5.020), (I-052)+(2.054)+(5.021), (I-052)+(2.054)+(5.022), (I-052)+(2.054)+(5.023), (I-052)+(2.054)+(6.001), (I-052)+(2.054)+(6.002), (I-052)+(2.054)+(6.003), (I-052)+(2.054)+(6.004), (I-052)+(2.054)+(7.001), (I-052)+(2.054)+(7.002), (I-052)+(2.054)+(7.003), (I-052)+(2.054)+(7.004), (I-052)+(2.054)+(7.005), (I-052)+(2.054)+(7.006), (I-052)+(2.054)+(9.001), (I-052)+(2.054)+(9.002), (I-052)+(2.054)+(9.003), (I-052)+(2.054)+(9.004), (I-052)+(2.054)+(9.005), (I-052)+(2.054)+(9.006), (I-052)+(2.054)+(9.007), (I-052)+(2.054)+(9.008), (I-052)+(2.054)+(9.009), (I-052)+(2.054)+(14.001), (I-052)+(2.054)+(14.002), (I-052)+(2.054)+(15.008), (I-052)+(2.054)+(15.011), (I-052)+(2.054)+(15.012), (I-052)+(2.054)+(15.016), (I-052)+(2.054)+(15.025), (I-052)+(2.054)+(15.027), (I-052)+(2.054)+(15.047), (I-052)+(2.054)+(15.063), (I-052)+(2.054)+(15.064), (I-052)+(2.054)+(16.001), (I-052)+(2.054)+(16.002), (I-052)+(2.054)+(16.003), (I-052)+(2.054)+(16.004), (I-052)+(2.054)+(16.005), (I-052)+(2.054)+(16.006), (I-052)+(2.054)+(16.007), (I-052)+(2.054)+(16.008), (I-052)+(2.054)+(17.001), (I-052)+(2.054)+(17.002), (I-052)+(2.054)+(17.003), (I-052)+(2.054)+(17.004), (I-052)+(2.054)+(17.005), (I-052)+(2.054)+(17.006), (I-052)+(2.054)+(17.007), (I-052)+(2.054)+(17.008), (I-052)+(2.054)+(17.009), (I-052)+(2.054)+(17.010), (I-052)+(2.054)+(17.011), (I-052)+(2.054)+(17.012), (I-052)+(2.054)+(18.001), (I-052)+(2.055)+(3.001), (I-052)+(2.055)+(3.002), (I-052)+(2.055)+(3.003), (I-052)+(2.055)+(3.004), (I-052)+(2.055)+(3.005), (I-052)+(2.055)+(3.006), (I-052)+(2.055)+(3.007), (I-052)+(2.055)+(3.008), (I-052)+(2.055)+(3.009), (I-052)+(2.055)+(3.010), (I-052)+(2.055)+(3.011), (I-052)+(2.055)+(3.012), (I-052)+(2.055)+(3.013), (I-052)+(2.055)+(3.014), (I-052)+(2.055)+(3.015), (I-052)+(2.055)+(3.016), (I-052)+(2.055)+(3.017), (I-052)+(2.055)+(3.018), (I-052)+(2.055)+(3.019), (I-052)+(2.055)+(3.020), (I-052)+(2.055)+(3.021), (I-052)+(2.055)+(3.022), (I-052)+(2.055)+(3.023), (I-052)+(2.055)+(3.024), (I-052)+(2.055)+(3.025), (I-052)+(2.055)+(3.026), (I-052)+(2.055)+(3.027), (I-052)+(2.055)+(3.028), (I-052)+(2.055)+(3.029), (I-052)+(2.055)+(3.030), (I-052)+(2.055)+(3.031), (I-052)+(2.055)+(5.001), (I-052)+(2.055)+(5.002), (I-052)+(2.055)+(5.003), (I-052)+(2.055)+(5.004), (I-052)+(2.055)+(5.005), (I-052)+(2.055)+(5.006), (I-052)+(2.055)+(5.007), (I-052)+(2.055)+(5.008), (I-052)+(2.055)+(5.009), (I-052)+(2.055)+(5.010), (I-052)+(2.055)+(5.011), (I-052)+(2.055)+(5.012), (I-052)+(2.055)+(5.013), (I-052)+(2.055)+(5.014), (I-052)+(2.055)+(5.015), (I-052)+(2.055)+(5.016), (I-052)+(2.055)+(5.017), (I-052)+(2.055)+(5.018), (I-052)+(2.055)+(5.019), (I-052)+(2.055)+(5.020), (I-052)+(2.055)+(5.021), (I-052)+(2.055)+(5.022), (I-052)+(2.055)+(5.023), (I-052)+(2.055)+(6.001), (I-052)+(2.055)+(6.002), (I-052)+(2.055)+(6.003), (I-052)+(2.055)+(6.004), (I-052)+(2.055)+(7.001), (I-052)+(2.055)+(7.002), (I-052)+(2.055)+(7.003), (I-052)+(2.055)+(7.004), (I-052)+(2.055)+(7.005), (I-052)+(2.055)+(7.006), (I-052)+(2.055)+(9.001), (I-052)+(2.055)+(9.002), (I-052)+(2.055)+(9.003), (I-052)+(2.055)+(9.004), (I-052)+(2.055)+(9.005), (I-052)+(2.055)+(9.006), (I-052)+(2.055)+(9.007), (I-052)+(2.055)+(9.008), (I-052)+(2.055)+(9.009), (I-052)+(2.055)+(14.001), (I-052)+(2.055)+(14.002), (I-052)+(2.055)+(15.008), (I-052)+(2.055)+(15.011), (I-052)+(2.055)+(15.012), (I-052)+(2.055)+(15.016), (I-052)+(2.055)+(15.025), (I-052)+(2.055)+(15.027), (I-052)+(2.055)+(15.047), (I-052)+(2.055)+(15.063), (I-052)+(2.055)+(15.064), (I-052)+(2.055)+(16.001), (I-052)+(2.055)+(16.002), (I-052)+(2.055)+(16.003), (I-052)+(2.055)+(16.004), (I-052)+(2.055)+(16.005), (I-052)+(2.055)+(16.006), (I-052)+(2.055)+(16.007), (I-052)+(2.055)+(16.008), (I-052)+(2.055)+(17.001), (I-052)+(2.055)+(17.002), (I-052)+(2.055)+(17.003), (I-052)+(2.055)+(17.004), (I-052)+(2.055)+(17.005), (I-052)+(2.055)+(17.006), (I-052)+(2.055)+(17.007), (I-052)+(2.055)+(17.008), (I-052)+(2.055)+(17.009), (I-052)+(2.055)+(17.010), (I-052)+(2.055)+(17.011), (I-052)+(2.055)+(17.012), (I-052)+(2.055)+(18.001), (I-052)+(2.056)+(3.001), (I-052)+(2.056)+(3.002), (I-052)+(2.056)+(3.003), (I-052)+(2.056)+(3.004), (I-052)+(2.056)+(3.005), (I-052)+(2.056)+(3.006), (I-052)+(2.056)+(3.007), (I-052)+(2.056)+(3.008), (I-052)+(2.056)+(3.009), (I-052)+(2.056)+(3.010), (I-052)+(2.056)+(3.011), (I-052)+(2.056)+(3.012), (I-052)+(2.056)+(3.013), (I-052)+(2.056)+(3.014), (I-052)+(2.056)+(3.015), (I-052)+(2.056)+(3.016), (I-052)+(2.056)+(3.017), (I-052)+(2.056)+(3.018), (I-052)+(2.056)+(3.019), (I-052)+(2.056)+(3.020), (I-052)+(2.056)+(3.021), (I-052)+(2.056)+(3.022), (I-052)+(2.056)+(3.023), (I-052)+(2.056)+(3.024), (I-052)+(2.056)+(3.025), (I-052)+(2.056)+(3.026), (I-052)+(2.056)+(3.027), (I-052)+(2.056)+(3.028), (I-052)+(2.056)+(3.029), (I-052)+(2.056)+(3.030), (I-052)+(2.056)+(3.031), (I-052)+(2.056)+(5.001), (I-052)+(2.056)+(5.002), (I-052)+(2.056)+(5.003), (I-052)+(2.056)+(5.004), (I-052)+(2.056)+(5.005), (I-052)+(2.056)+(5.006), (I-052)+(2.056)+(5.007), (I-052)+(2.056)+(5.008), (I-052)+(2.056)+(5.009), (I-052)+(2.056)+(5.010), (I-052)+(2.056)+(5.011), (I-052)+(2.056)+(5.012), (I-052)+(2.056)+(5.013), (I-052)+(2.056)+(5.014), (I-052)+(2.056)+(5.015), (I-052)+(2.056)+(5.016), (I-052)+(2.056)+(5.017), (I-052)+(2.056)+(5.018), (I-052)+(2.056)+(5.019), (I-052)+(2.056)+(5.020), (I-052)+(2.056)+(5.021), (I-052)+(2.056)+(5.022), (I-052)+(2.056)+(5.023), (I-052)+(2.056)+(6.001), (I-052)+(2.056)+(6.002), (I-052)+(2.056)+(6.003), (I-052)+(2.056)+(6.004), (I-052)+(2.056)+(7.001), (I-052)+(2.056)+(7.002), (I-052)+(2.056)+(7.003), (I-052)+(2.056)+(7.004), (I-052)+(2.056)+(7.005), (I-052)+(2.056)+(7.006), (I-052)+(2.056)+(9.001), (I-052)+(2.056)+(9.002), (I-052)+(2.056)+(9.003), (I-052)+(2.056)+(9.004), (I-052)+(2.056)+(9.005), (I-052)+(2.056)+(9.006), (I-052)+(2.056)+(9.007), (I-052)+(2.056)+(9.008), (I-052)+(2.056)+(9.009), (I-052)+(2.056)+(14.001), (I-052)+(2.056)+(14.002), (I-052)+(2.056)+(15.008), (I-052)+(2.056)+(15.011), (I-052)+(2.056)+(15.012), (I-052)+(2.056)+(15.016), (I-052)+(2.056)+(15.025), (I-052)+(2.056)+(15.027), (I-052)+(2.056)+(15.047), (I-052)+(2.056)+(15.063), (I-052)+(2.056)+(15.064), (I-052)+(2.056)+(16.001), (I-052)+(2.056)+(16.002), (I-052)+(2.056)+(16.003), (I-052)+(2.056)+(16.004), (I-052)+(2.056)+(16.005), (I-052)+(2.056)+(16.006), (I-052)+(2.056)+(16.007), (I-052)+(2.056)+(16.008), (I-052)+(2.056)+(17.001), (I-052)+(2.056)+(17.002), (I-052)+(2.056)+(17.003), (I-052)+(2.056)+(17.004), (I-052)+(2.056)+(17.005), (I-052)+(2.056)+(17.006), (I-052)+(2.056)+(17.007), (I-052)+(2.056)+(17.008), (I-052)+(2.056)+(17.009), (I-052)+(2.056)+(17.010), (I-052)+(2.056)+(17.011), (I-052)+(2.056)+(17.012), (I-052)+(2.056)+(18.001), (I-052)+(2.057)+(3.001), (I-052)+(2.057)+(3.002), (I-052)+(2.057)+(3.003), (I-052)+(2.057)+(3.004), (I-052)+(2.057)+(3.005), (I-052)+(2.057)+(3.006), (I-052)+(2.057)+(3.007), (I-052)+(2.057)+(3.008), (I-052)+(2.057)+(3.009), (I-052)+(2.057)+(3.010), (I-052)+(2.057)+(3.011), (I-052)+(2.057)+(3.012), (I-052)+(2.057)+(3.013), (I-052)+(2.057)+(3.014), (I-052)+(2.057)+(3.015), (I-052)+(2.057)+(3.016), (I-052)+(2.057)+(3.017), (I-052)+(2.057)+(3.018), (I-052)+(2.057)+(3.019), (I-052)+(2.057)+(3.020), (I-052)+(2.057)+(3.021), (I-052)+(2.057)+(3.022), (I-052)+(2.057)+(3.023), (I-052)+(2.057)+(3.024), (I-052)+(2.057)+(3.025), (I-052)+(2.057)+(3.026), (I-052)+(2.057)+(3.027), (I-052)+(2.057)+(3.028), (I-052)+(2.057)+(3.029), (I-052)+(2.057)+(3.030), (I-052)+(2.057)+(3.031), (I-052)+(2.057)+(5.001), (I-052)+(2.057)+(5.002), (I-052)+(2.057)+(5.003), (I-052)+(2.057)+(5.004), (I-052)+(2.057)+(5.005), (I-052)+(2.057)+(5.006), (I-052)+(2.057)+(5.007), (I-052)+(2.057)+(5.008), (I-052)+(2.057)+(5.009), (I-052)+(2.057)+(5.010), (I-052)+(2.057)+(5.011), (I-052)+(2.057)+(5.012), (I-052)+(2.057)+(5.013), (I-052)+(2.057)+(5.014), (I-052)+(2.057)+(5.015), (I-052)+(2.057)+(5.016), (I-052)+(2.057)+(5.017), (I-052)+(2.057)+(5.018), (I-052)+(2.057)+(5.019), (I-052)+(2.057)+(5.020), (I-052)+(2.057)+(5.021), (I-052)+(2.057)+(5.022), (I-052)+(2.057)+(5.023), (I-052)+(2.057)+(6.001), (I-052)+(2.057)+(6.002), (I-052)+(2.057)+(6.003), (I-052)+(2.057)+(6.004), (I-052)+(2.057)+(7.001), (I-052)+(2.057)+(7.002), (I-052)+(2.057)+(7.003), (I-052)+(2.057)+(7.004), (I-052)+(2.057)+(7.005), (I-052)+(2.057)+(7.006), (I-052)+(2.057)+(9.001), (I-052)+(2.057)+(9.002), (I-052)+(2.057)+(9.003), (I-052)+(2.057)+(9.004), (I-052)+(2.057)+(9.005), (I-052)+(2.057)+(9.006), (I-052)+(2.057)+(9.007), (I-052)+(2.057)+(9.008), (I-052)+(2.057)+(9.009), (I-052)+(2.057)+(14.001), (I-052)+(2.057)+(14.002), (I-052)+(2.057)+(15.008), (I-052)+(2.057)+(15.011), (I-052)+(2.057)+(15.012), (I-052)+(2.057)+(15.016), (I-052)+(2.057)+(15.025), (I-052)+(2.057)+(15.027), (I-052)+(2.057)+(15.047), (I-052)+(2.057)+(15.063), (I-052)+(2.057)+(15.064), (I-052)+(2.057)+(16.001), (I-052)+(2.057)+(16.002), (I-052)+(2.057)+(16.003), (I-052)+(2.057)+(16.004), (I-052)+(2.057)+(16.005), (I-052)+(2.057)+(16.006), (I-052)+(2.057)+(16.007), (I-052)+(2.057)+(16.008), (I-052)+(2.057)+(17.001), (I-052)+(2.057)+(17.002), (I-052)+(2.057)+(17.003), (I-052)+(2.057)+(17.004), (I-052)+(2.057)+(17.005), (I-052)+(2.057)+(17.006), (I-052)+(2.057)+(17.007), (I-052)+(2.057)+(17.008), (I-052)+(2.057)+(17.009), (I-052)+(2.057)+(17.010), (I-052)+(2.057)+(17.011), (I-052)+(2.057)+(17.012), (I-052)+(2.057)+(18.001), (I-052)+(2.058)+(3.001), (I-052)+(2.058)+(3.002), (I-052)+(2.058)+(3.003), (I-052)+(2.058)+(3.004), (I-052)+(2.058)+(3.005), (I-052)+(2.058)+(3.006), (I-052)+(2.058)+(3.007), (I-052)+(2.058)+(3.008), (I-052)+(2.058)+(3.009), (I-052)+(2.058)+(3.010), (I-052)+(2.058)+(3.011), (I-052)+(2.058)+(3.012), (I-052)+(2.058)+(3.013), (I-052)+(2.058)+(3.014), (I-052)+(2.058)+(3.015), (I-052)+(2.058)+(3.016), (I-052)+(2.058)+(3.017), (I-052)+(2.058)+(3.018), (I-052)+(2.058)+(3.019), (I-052)+(2.058)+(3.020), (I-052)+(2.058)+(3.021), (I-052)+(2.058)+(3.022), (I-052)+(2.058)+(3.023), (I-052)+(2.058)+(3.024), (I-052)+(2.058)+(3.025), (I-052)+(2.058)+(3.026), (I-052)+(2.058)+(3.027), (I-052)+(2.058)+(3.028), (I-052)+(2.058)+(3.029), (I-052)+(2.058)+(3.030), (I-052)+(2.058)+(3.031), (I-052)+(2.058)+(5.001), (I-052)+(2.058)+(5.002), (I-052)+(2.058)+(5.003), (I-052)+(2.058)+(5.004), (I-052)+(2.058)+(5.005), (I-052)+(2.058)+(5.006), (I-052)+(2.058)+(5.007), (I-052)+(2.058)+(5.008), (I-052)+(2.058)+(5.009), (I-052)+(2.058)+(5.010), (I-052)+(2.058)+(5.011), (I-052)+(2.058)+(5.012), (I-052)+(2.058)+(5.013), (I-052)+(2.058)+(5.014), (I-052)+(2.058)+(5.015), (I-052)+(2.058)+(5.016), (I-052)+(2.058)+(5.017), (I-052)+(2.058)+(5.018), (I-052)+(2.058)+(5.019), (I-052)+(2.058)+(5.020), (I-052)+(2.058)+(5.021), (I-052)+(2.058)+(5.022), (I-052)+(2.058)+(5.023), (I-052)+(2.058)+(6.001), (I-052)+(2.058)+(6.002), (I-052)+(2.058)+(6.003), (I-052)+(2.058)+(6.004), (I-052)+(2.058)+(7.001), (I-052)+(2.058)+(7.002), (I-052)+(2.058)+(7.003), (I-052)+(2.058)+(7.004), (I-052)+(2.058)+(7.005), (I-052)+(2.058)+(7.006), (I-052)+(2.058)+(9.001), (I-052)+(2.058)+(9.002), (I-052)+(2.058)+(9.003), (I-052)+(2.058)+(9.004), (I-052)+(2.058)+(9.005), (I-052)+(2.058)+(9.006), (I-052)+(2.058)+(9.007), (I-052)+(2.058)+(9.008), (I-052)+(2.058)+(9.009), (I-052)+(2.058)+(14.001), (I-052)+(2.058)+(14.002), (I-052)+(2.058)+(15.008), (I-052)+(2.058)+(15.011), (I-052)+(2.058)+(15.012), (I-052)+(2.058)+(15.016), (I-052)+(2.058)+(15.025), (I-052)+(2.058)+(15.027), (I-052)+(2.058)+(15.047), (I-052)+(2.058)+(15.063), (I-052)+(2.058)+(15.064), (I-052)+(2.058)+(16.001), (I-052)+(2.058)+(16.002), (I-052)+(2.058)+(16.003), (I-052)+(2.058)+(16.004), (I-052)+(2.058)+(16.005), (I-052)+(2.058)+(16.006), (I-052)+(2.058)+(16.007), (I-052)+(2.058)+(16.008), (I-052)+(2.058)+(17.001), (I-052)+(2.058)+(17.002), (I-052)+(2.058)+(17.003), (I-052)+(2.058)+(17.004), (I-052)+(2.058)+(17.005), (I-052)+(2.058)+(17.006), (I-052)+(2.058)+(17.007), (I-052)+(2.058)+(17.008), (I-052)+(2.058)+(17.009), (I-052)+(2.058)+(17.010), (I-052)+(2.058)+(17.011), (I-052)+(2.058)+(17.012), (I-052)+(2.058)+(18.001), (I-052)+(2.059)+(3.001), (I-052)+(2.059)+(3.002), (I-052)+(2.059)+(3.003), (I-052)+(2.059)+(3.004), (I-052)+(2.059)+(3.005), (I-052)+(2.059)+(3.006), (I-052)+(2.059)+(3.007), (I-052)+(2.059)+(3.008), (I-052)+(2.059)+(3.009), (I-052)+(2.059)+(3.010), (I-052)+(2.059)+(3.011), (I-052)+(2.059)+(3.012), (I-052)+(2.059)+(3.013), (I-052)+(2.059)+(3.014), (I-052)+(2.059)+(3.015), (I-052)+(2.059)+(3.016), (I-052)+(2.059)+(3.017), (I-052)+(2.059)+(3.018), (I-052)+(2.059)+(3.019), (I-052)+(2.059)+(3.020), (I-052)+(2.059)+(3.021), (I-052)+(2.059)+(3.022), (I-052)+(2.059)+(3.023), (I-052)+(2.059)+(3.024), (I-052)+(2.059)+(3.025), (I-052)+(2.059)+(3.026), (I-052)+(2.059)+(3.027), (I-052)+(2.059)+(3.028), (I-052)+(2.059)+(3.029), (I-052)+(2.059)+(3.030), (I-052)+(2.059)+(3.031), (I-052)+(2.059)+(5.001), (I-052)+(2.059)+(5.002), (I-052)+(2.059)+(5.003), (I-052)+(2.059)+(5.004), (I-052)+(2.059)+(5.005), (I-052)+(2.059)+(5.006), (I-052)+(2.059)+(5.007), (I-052)+(2.059)+(5.008), (I-052)+(2.059)+(5.009), (I-052)+(2.059)+(5.010), (I-052)+(2.059)+(5.011), (I-052)+(2.059)+(5.012), (I-052)+(2.059)+(5.013), (I-052)+(2.059)+(5.014), (I-052)+(2.059)+(5.015), (I-052)+(2.059)+(5.016), (I-052)+(2.059)+(5.017), (I-052)+(2.059)+(5.018), (I-052)+(2.059)+(5.019), (I-052)+(2.059)+(5.020), (I-052)+(2.059)+(5.021), (I-052)+(2.059)+(5.022), (I-052)+(2.059)+(5.023), (I-052)+(2.059)+(6.001), (I-052)+(2.059)+(6.002), (I-052)+(2.059)+(6.003), (I-052)+(2.059)+(6.004), (I-052)+(2.059)+(7.001), (I-052)+(2.059)+(7.002), (I-052)+(2.059)+(7.003), (I-052)+(2.059)+(7.004), (I-052)+(2.059)+(7.005), (I-052)+(2.059)+(7.006), (I-052)+(2.059)+(9.001), (I-052)+(2.059)+(9.002), (I-052)+(2.059)+(9.003), (I-052)+(2.059)+(9.004), (I-052)+(2.059)+(9.005), (I-052)+(2.059)+(9.006), (I-052)+(2.059)+(9.007), (I-052)+(2.059)+(9.008), (I-052)+(2.059)+(9.009), (I-052)+(2.059)+(14.001), (I-052)+(2.059)+(14.002), (I-052)+(2.059)+(15.008), (I-052)+(2.059)+(15.011), (I-052)+(2.059)+(15.012), (I-052)+(2.059)+(15.016), (I-052)+(2.059)+(15.025), (I-052)+(2.059)+(15.027), (I-052)+(2.059)+(15.047), (I-052)+(2.059)+(15.063), (I-052)+(2.059)+(15.064), (I-052)+(2.059)+(16.001), (I-052)+(2.059)+(16.002), (I-052)+(2.059)+(16.003), (I-052)+(2.059)+(16.004), (I-052)+(2.059)+(16.005), (I-052)+(2.059)+(16.006), (I-052)+(2.059)+(16.007), (I-052)+(2.059)+(16.008), (I-052)+(2.059)+(17.001), (I-052)+(2.059)+(17.002), (I-052)+(2.059)+(17.003), (I-052)+(2.059)+(17.004), (I-052)+(2.059)+(17.005), (I-052)+(2.059)+(17.006), (I-052)+(2.059)+(17.007), (I-052)+(2.059)+(17.008), (I-052)+(2.059)+(17.009), (I-052)+(2.059)+(17.010), (I-052)+(2.059)+(17.011), (I-052)+(2.059)+(17.012), (I-052)+(2.059)+(18.001), (I-052)+(3.001)+(3.025), (I-052)+(3.001)+(3.030), (I-052)+(3.001)+(3.031), (I-052)+(3.001)+(5.001), (I-052)+(3.001)+(5.002), (I-052)+(3.001)+(5.003), (I-052)+(3.001)+(5.004), (I-052)+(3.001)+(5.005), (I-052)+(3.001)+(5.006), (I-052)+(3.001)+(5.007), (I-052)+(3.001)+(5.008), (I-052)+(3.001)+(5.009), (I-052)+(3.001)+(5.010), (I-052)+(3.001)+(5.011), (I-052)+(3.001)+(5.012), (I-052)+(3.001)+(5.013), (I-052)+(3.001)+(5.014), (I-052)+(3.001)+(5.015), (I-052)+(3.001)+(5.016), (I-052)+(3.001)+(5.017), (I-052)+(3.001)+(5.018), (I-052)+(3.001)+(5.019), (I-052)+(3.001)+(5.020), (I-052)+(3.001)+(5.021), (I-052)+(3.001)+(5.022), (I-052)+(3.001)+(5.023), (I-052)+(3.001)+(6.001), (I-052)+(3.001)+(6.002), (I-052)+(3.001)+(6.003), (I-052)+(3.001)+(6.004), (I-052)+(3.001)+(7.001), (I-052)+(3.001)+(7.002), (I-052)+(3.001)+(7.003), (I-052)+(3.001)+(7.004), (I-052)+(3.001)+(7.005), (I-052)+(3.001)+(7.006), (I-052)+(3.001)+(9.001), (I-052)+(3.001)+(9.002), (I-052)+(3.001)+(9.003), (I-052)+(3.001)+(9.004), (I-052)+(3.001)+(9.005), (I-052)+(3.001)+(9.006), (I-052)+(3.001)+(9.007), (I-052)+(3.001)+(9.008), (I-052)+(3.001)+(9.009), (I-052)+(3.001)+(14.001), (I-052)+(3.001)+(14.002), (I-052)+(3.001)+(15.008), (I-052)+(3.001)+(15.011), (I-052)+(3.001)+(15.012), (I-052)+(3.001)+(15.016), (I-052)+(3.001)+(15.025), (I-052)+(3.001)+(15.027), (I-052)+(3.001)+(15.047), (I-052)+(3.001)+(15.063), (I-052)+(3.001)+(15.064), (I-052)+(3.001)+(16.001), (I-052)+(3.001)+(16.002), (I-052)+(3.001)+(16.003), (I-052)+(3.001)+(16.004), (I-052)+(3.001)+(16.005), (I-052)+(3.001)+(16.006), (I-052)+(3.001)+(16.007), (I-052)+(3.001)+(16.008), (I-052)+(3.001)+(17.001), (I-052)+(3.001)+(17.002), (I-052)+(3.001)+(17.003), (I-052)+(3.001)+(17.004), (I-052)+(3.001)+(17.005), (I-052)+(3.001)+(17.006), (I-052)+(3.001)+(17.007), (I-052)+(3.001)+(17.008), (I-052)+(3.001)+(17.009), (I-052)+(3.001)+(17.010), (I-052)+(3.001)+(17.011), (I-052)+(3.001)+(17.012), (I-052)+(3.001)+(18.001), (I-052)+(3.002)+(3.025), (I-052)+(3.002)+(3.030), (I-052)+(3.002)+(3.031), (I-052)+(3.002)+(5.001), (I-052)+(3.002)+(5.002), (I-052)+(3.002)+(5.003), (I-052)+(3.002)+(5.004), (I-052)+(3.002)+(5.005), (I-052)+(3.002)+(5.006), (I-052)+(3.002)+(5.007), (I-052)+(3.002)+(5.008), (I-052)+(3.002)+(5.009), (I-052)+(3.002)+(5.010), (I-052)+(3.002)+(5.011), (I-052)+(3.002)+(5.012), (I-052)+(3.002)+(5.013), (I-052)+(3.002)+(5.014), (I-052)+(3.002)+(5.015), (I-052)+(3.002)+(5.016), (I-052)+(3.002)+(5.017), (I-052)+(3.002)+(5.018), (I-052)+(3.002)+(5.019), (I-052)+(3.002)+(5.020), (I-052)+(3.002)+(5.021), (I-052)+(3.002)+(5.022), (I-052)+(3.002)+(5.023), (I-052)+(3.002)+(6.001), (I-052)+(3.002)+(6.002), (I-052)+(3.002)+(6.003), (I-052)+(3.002)+(6.004), (I-052)+(3.002)+(7.001), (I-052)+(3.002)+(7.002), (I-052)+(3.002)+(7.003), (I-052)+(3.002)+(7.004), (I-052)+(3.002)+(7.005), (I-052)+(3.002)+(7.006), (I-052)+(3.002)+(9.001), (I-052)+(3.002)+(9.002), (I-052)+(3.002)+(9.003), (I-052)+(3.002)+(9.004), (I-052)+(3.002)+(9.005), (I-052)+(3.002)+(9.006), (I-052)+(3.002)+(9.007), (I-052)+(3.002)+(9.008), (I-052)+(3.002)+(9.009), (I-052)+(3.002)+(14.001), (I-052)+(3.002)+(14.002), (I-052)+(3.002)+(15.008), (I-052)+(3.002)+(15.011), (I-052)+(3.002)+(15.012), (I-052)+(3.002)+(15.016), (I-052)+(3.002)+(15.025), (I-052)+(3.002)+(15.027), (I-052)+(3.002)+(15.047), (I-052)+(3.002)+(15.063), (I-052)+(3.002)+(15.064), (I-052)+(3.002)+(16.001), (I-052)+(3.002)+(16.002), (I-052)+(3.002)+(16.003), (I-052)+(3.002)+(16.004), (I-052)+(3.002)+(16.005), (I-052)+(3.002)+(16.006), (I-052)+(3.002)+(16.007), (I-052)+(3.002)+(16.008), (I-052)+(3.002)+(17.001), (I-052)+(3.002)+(17.002), (I-052)+(3.002)+(17.003), (I-052)+(3.002)+(17.004), (I-052)+(3.002)+(17.005), (I-052)+(3.002)+(17.006), (I-052)+(3.002)+(17.007), (I-052)+(3.002)+(17.008), (I-052)+(3.002)+(17.009), (I-052)+(3.002)+(17.010), (I-052)+(3.002)+(17.011), (I-052)+(3.002)+(17.012), (I-052)+(3.002)+(18.001), (I-052)+(3.003)+(3.025), (I-052)+(3.003)+(3.030), (I-052)+(3.003)+(3.031), (I-052)+(3.003)+(5.001), (I-052)+(3.003)+(5.002), (I-052)+(3.003)+(5.003), (I-052)+(3.003)+(5.004), (I-052)+(3.003)+(5.005), (I-052)+(3.003)+(5.006), (I-052)+(3.003)+(5.007), (I-052)+(3.003)+(5.008), (I-052)+(3.003)+(5.009), (I-052)+(3.003)+(5.010), (I-052)+(3.003)+(5.011), (I-052)+(3.003)+(5.012), (I-052)+(3.003)+(5.013), (I-052)+(3.003)+(5.014), (I-052)+(3.003)+(5.015), (I-052)+(3.003)+(5.016), (I-052)+(3.003)+(5.017), (I-052)+(3.003)+(5.018), (I-052)+(3.003)+(5.019), (I-052)+(3.003)+(5.020), (I-052)+(3.003)+(5.021), (I-052)+(3.003)+(5.022), (I-052)+(3.003)+(5.023), (I-052)+(3.003)+(6.001), (I-052)+(3.003)+(6.002), (I-052)+(3.003)+(6.003), (I-052)+(3.003)+(6.004), (I-052)+(3.003)+(7.001), (I-052)+(3.003)+(7.002), (I-052)+(3.003)+(7.003), (I-052)+(3.003)+(7.004), (I-052)+(3.003)+(7.005), (I-052)+(3.003)+(7.006), (I-052)+(3.003)+(9.001), (I-052)+(3.003)+(9.002), (I-052)+(3.003)+(9.003), (I-052)+(3.003)+(9.004), (I-052)+(3.003)+(9.005), (I-052)+(3.003)+(9.006), (I-052)+(3.003)+(9.007), (I-052)+(3.003)+(9.008), (I-052)+(3.003)+(9.009), (I-052)+(3.003)+(14.001), (I-052)+(3.003)+(14.002), (I-052)+(3.003)+(15.008), (I-052)+(3.003)+(15.011), (I-052)+(3.003)+(15.012), (I-052)+(3.003)+(15.016), (I-052)+(3.003)+(15.025), (I-052)+(3.003)+(15.027), (I-052)+(3.003)+(15.047), (I-052)+(3.003)+(15.063), (I-052)+(3.003)+(15.064), (I-052)+(3.003)+(16.001), (I-052)+(3.003)+(16.002), (I-052)+(3.003)+(16.003), (I-052)+(3.003)+(16.004), (I-052)+(3.003)+(16.005), (I-052)+(3.003)+(16.006), (I-052)+(3.003)+(16.007), (I-052)+(3.003)+(16.008), (I-052)+(3.003)+(17.001), (I-052)+(3.003)+(17.002), (I-052)+(3.003)+(17.003), (I-052)+(3.003)+(17.004), (I-052)+(3.003)+(17.005), (I-052)+(3.003)+(17.006), (I-052)+(3.003)+(17.007), (I-052)+(3.003)+(17.008), (I-052)+(3.003)+(17.009), (I-052)+(3.003)+(17.010), (I-052)+(3.003)+(17.011), (I-052)+(3.003)+(17.012), (I-052)+(3.003)+(18.001), (I-052)+(3.004)+(3.025), (I-052)+(3.004)+(3.030), (I-052)+(3.004)+(3.031), (I-052)+(3.004)+(5.001), (I-052)+(3.004)+(5.002), (I-052)+(3.004)+(5.003), (I-052)+(3.004)+(5.004), (I-052)+(3.004)+(5.005), (I-052)+(3.004)+(5.006), (I-052)+(3.004)+(5.007), (I-052)+(3.004)+(5.008), (I-052)+(3.004)+(5.009), (I-052)+(3.004)+(5.010), (I-052)+(3.004)+(5.011), (I-052)+(3.004)+(5.012), (I-052)+(3.004)+(5.013), (I-052)+(3.004)+(5.014), (I-052)+(3.004)+(5.015), (I-052)+(3.004)+(5.016), (I-052)+(3.004)+(5.017), (I-052)+(3.004)+(5.018), (I-052)+(3.004)+(5.019), (I-052)+(3.004)+(5.020), (I-052)+(3.004)+(5.021), (I-052)+(3.004)+(5.022), (I-052)+(3.004)+(5.023), (I-052)+(3.004)+(6.001), (I-052)+(3.004)+(6.002), (I-052)+(3.004)+(6.003), (I-052)+(3.004)+(6.004), (I-052)+(3.004)+(7.001), (I-052)+(3.004)+(7.002), (I-052)+(3.004)+(7.003), (I-052)+(3.004)+(7.004), (I-052)+(3.004)+(7.005), (I-052)+(3.004)+(7.006), (I-052)+(3.004)+(9.001), (I-052)+(3.004)+(9.002), (I-052)+(3.004)+(9.003), (I-052)+(3.004)+(9.004), (I-052)+(3.004)+(9.005), (I-052)+(3.004)+(9.006), (I-052)+(3.004)+(9.007), (I-052)+(3.004)+(9.008), (I-052)+(3.004)+(9.009), (I-052)+(3.004)+(14.001), (I-052)+(3.004)+(14.002), (I-052)+(3.004)+(15.008), (I-052)+(3.004)+(15.011), (I-052)+(3.004)+(15.012), (I-052)+(3.004)+(15.016), (I-052)+(3.004)+(15.025), (I-052)+(3.004)+(15.027), (I-052)+(3.004)+(15.047), (I-052)+(3.004)+(15.063), (I-052)+(3.004)+(15.064), (I-052)+(3.004)+(16.001), (I-052)+(3.004)+(16.002), (I-052)+(3.004)+(16.003), (I-052)+(3.004)+(16.004), (I-052)+(3.004)+(16.005), (I-052)+(3.004)+(16.006), (I-052)+(3.004)+(16.007), (I-052)+(3.004)+(16.008), (I-052)+(3.004)+(17.001), (I-052)+(3.004)+(17.002), (I-052)+(3.004)+(17.003), (I-052)+(3.004)+(17.004), (I-052)+(3.004)+(17.005), (I-052)+(3.004)+(17.006), (I-052)+(3.004)+(17.007), (I-052)+(3.004)+(17.008), (I-052)+(3.004)+(17.009), (I-052)+(3.004)+(17.010), (I-052)+(3.004)+(17.011), (I-052)+(3.004)+(17.012), (I-052)+(3.004)+(18.001), (I-052)+(3.005)+(3.025), (I-052)+(3.005)+(3.030), (I-052)+(3.005)+(3.031), (I-052)+(3.005)+(5.001), (I-052)+(3.005)+(5.002), (I-052)+(3.005)+(5.003), (I-052)+(3.005)+(5.004), (I-052)+(3.005)+(5.005), (I-052)+(3.005)+(5.006), (I-052)+(3.005)+(5.007), (I-052)+(3.005)+(5.008), (I-052)+(3.005)+(5.009), (I-052)+(3.005)+(5.010), (I-052)+(3.005)+(5.011), (I-052)+(3.005)+(5.012), (I-052)+(3.005)+(5.013), (I-052)+(3.005)+(5.014), (I-052)+(3.005)+(5.015), (I-052)+(3.005)+(5.016), (I-052)+(3.005)+(5.017), (I-052)+(3.005)+(5.018), (I-052)+(3.005)+(5.019), (I-052)+(3.005)+(5.020), (I-052)+(3.005)+(5.021), (I-052)+(3.005)+(5.022), (I-052)+(3.005)+(5.023), (I-052)+(3.005)+(6.001), (I-052)+(3.005)+(6.002), (I-052)+(3.005)+(6.003), (I-052)+(3.005)+(6.004), (I-052)+(3.005)+(7.001), (I-052)+(3.005)+(7.002), (I-052)+(3.005)+(7.003), (I-052)+(3.005)+(7.004), (I-052)+(3.005)+(7.005), (I-052)+(3.005)+(7.006), (I-052)+(3.005)+(9.001), (I-052)+(3.005)+(9.002), (I-052)+(3.005)+(9.003), (I-052)+(3.005)+(9.004), (I-052)+(3.005)+(9.005), (I-052)+(3.005)+(9.006), (I-052)+(3.005)+(9.007), (I-052)+(3.005)+(9.008), (I-052)+(3.005)+(9.009), (I-052)+(3.005)+(14.001), (I-052)+(3.005)+(14.002), (I-052)+(3.005)+(15.008), (I-052)+(3.005)+(15.011), (I-052)+(3.005)+(15.012), (I-052)+(3.005)+(15.016), (I-052)+(3.005)+(15.025), (I-052)+(3.005)+(15.027), (I-052)+(3.005)+(15.047), (I-052)+(3.005)+(15.063), (I-052)+(3.005)+(15.064), (I-052)+(3.005)+(16.001), (I-052)+(3.005)+(16.002), (I-052)+(3.005)+(16.003), (I-052)+(3.005)+(16.004), (I-052)+(3.005)+(16.005), (I-052)+(3.005)+(16.006), (I-052)+(3.005)+(16.007), (I-052)+(3.005)+(16.008), (I-052)+(3.005)+(17.001), (I-052)+(3.005)+(17.002), (I-052)+(3.005)+(17.003), (I-052)+(3.005)+(17.004), (I-052)+(3.005)+(17.005), (I-052)+(3.005)+(17.006), (I-052)+(3.005)+(17.007), (I-052)+(3.005)+(17.008), (I-052)+(3.005)+(17.009), (I-052)+(3.005)+(17.010), (I-052)+(3.005)+(17.011), (I-052)+(3.005)+(17.012), (I-052)+(3.005)+(18.001), (I-052)+(3.006)+(3.025), (I-052)+(3.006)+(3.030), (I-052)+(3.006)+(3.031), (I-052)+(3.006)+(5.001), (I-052)+(3.006)+(5.002), (I-052)+(3.006)+(5.003), (I-052)+(3.006)+(5.004), (I-052)+(3.006)+(5.005), (I-052)+(3.006)+(5.006), (I-052)+(3.006)+(5.007), (I-052)+(3.006)+(5.008), (I-052)+(3.006)+(5.009), (I-052)+(3.006)+(5.010), (I-052)+(3.006)+(5.011), (I-052)+(3.006)+(5.012), (I-052)+(3.006)+(5.013), (I-052)+(3.006)+(5.014), (I-052)+(3.006)+(5.015), (I-052)+(3.006)+(5.016), (I-052)+(3.006)+(5.017), (I-052)+(3.006)+(5.018), (I-052)+(3.006)+(5.019), (I-052)+(3.006)+(5.020), (I-052)+(3.006)+(5.021), (I-052)+(3.006)+(5.022), (I-052)+(3.006)+(5.023), (I-052)+(3.006)+(6.001), (I-052)+(3.006)+(6.002), (I-052)+(3.006)+(6.003), (I-052)+(3.006)+(6.004), (I-052)+(3.006)+(7.001), (I-052)+(3.006)+(7.002), (I-052)+(3.006)+(7.003), (I-052)+(3.006)+(7.004), (I-052)+(3.006)+(7.005), (I-052)+(3.006)+(7.006), (I-052)+(3.006)+(9.001), (I-052)+(3.006)+(9.002), (I-052)+(3.006)+(9.003), (I-052)+(3.006)+(9.004), (I-052)+(3.006)+(9.005), (I-052)+(3.006)+(9.006), (I-052)+(3.006)+(9.007), (I-052)+(3.006)+(9.008), (I-052)+(3.006)+(9.009), (I-052)+(3.006)+(14.001), (I-052)+(3.006)+(14.002), (I-052)+(3.006)+(15.008), (I-052)+(3.006)+(15.011), (I-052)+(3.006)+(15.012), (I-052)+(3.006)+(15.016), (I-052)+(3.006)+(15.025), (I-052)+(3.006)+(15.027), (I-052)+(3.006)+(15.047), (I-052)+(3.006)+(15.063), (I-052)+(3.006)+(15.064), (I-052)+(3.006)+(16.001), (I-052)+(3.006)+(16.002), (I-052)+(3.006)+(16.003), (I-052)+(3.006)+(16.004), (I-052)+(3.006)+(16.005), (I-052)+(3.006)+(16.006), (I-052)+(3.006)+(16.007), (I-052)+(3.006)+(16.008), (I-052)+(3.006)+(17.001), (I-052)+(3.006)+(17.002), (I-052)+(3.006)+(17.003), (I-052)+(3.006)+(17.004), (I-052)+(3.006)+(17.005), (I-052)+(3.006)+(17.006), (I-052)+(3.006)+(17.007), (I-052)+(3.006)+(17.008), (I-052)+(3.006)+(17.009), (I-052)+(3.006)+(17.010), (I-052)+(3.006)+(17.011), (I-052)+(3.006)+(17.012), (I-052)+(3.006)+(18.001), (I-052)+(3.007)+(3.025), (I-052)+(3.007)+(3.030), (I-052)+(3.007)+(3.031), (I-052)+(3.007)+(5.001), (I-052)+(3.007)+(5.002), (I-052)+(3.007)+(5.003), (I-052)+(3.007)+(5.004), (I-052)+(3.007)+(5.005), (I-052)+(3.007)+(5.006), (I-052)+(3.007)+(5.007), (I-052)+(3.007)+(5.008), (I-052)+(3.007)+(5.009), (I-052)+(3.007)+(5.010), (I-052)+(3.007)+(5.011), (I-052)+(3.007)+(5.012), (I-052)+(3.007)+(5.013), (I-052)+(3.007)+(5.014), (I-052)+(3.007)+(5.015), (I-052)+(3.007)+(5.016), (I-052)+(3.007)+(5.017), (I-052)+(3.007)+(5.018), (I-052)+(3.007)+(5.019), (I-052)+(3.007)+(5.020), (I-052)+(3.007)+(5.021), (I-052)+(3.007)+(5.022), (I-052)+(3.007)+(5.023), (I-052)+(3.007)+(6.001), (I-052)+(3.007)+(6.002), (I-052)+(3.007)+(6.003), (I-052)+(3.007)+(6.004), (I-052)+(3.007)+(7.001), (I-052)+(3.007)+(7.002), (I-052)+(3.007)+(7.003), (I-052)+(3.007)+(7.004), (I-052)+(3.007)+(7.005), (I-052)+(3.007)+(7.006), (I-052)+(3.007)+(9.001), (I-052)+(3.007)+(9.002), (I-052)+(3.007)+(9.003), (I-052)+(3.007)+(9.004), (I-052)+(3.007)+(9.005), (I-052)+(3.007)+(9.006), (I-052)+(3.007)+(9.007), (I-052)+(3.007)+(9.008), (I-052)+(3.007)+(9.009), (I-052)+(3.007)+(14.001), (I-052)+(3.007)+(14.002), (I-052)+(3.007)+(15.008), (I-052)+(3.007)+(15.011), (I-052)+(3.007)+(15.012), (I-052)+(3.007)+(15.016), (I-052)+(3.007)+(15.025), (I-052)+(3.007)+(15.027), (I-052)+(3.007)+(15.047), (I-052)+(3.007)+(15.063), (I-052)+(3.007)+(15.064), (I-052)+(3.007)+(16.001), (I-052)+(3.007)+(16.002), (I-052)+(3.007)+(16.003), (I-052)+(3.007)+(16.004), (I-052)+(3.007)+(16.005), (I-052)+(3.007)+(16.006), (I-052)+(3.007)+(16.007), (I-052)+(3.007)+(16.008), (I-052)+(3.007)+(17.001), (I-052)+(3.007)+(17.002), (I-052)+(3.007)+(17.003), (I-052)+(3.007)+(17.004), (I-052)+(3.007)+(17.005), (I-052)+(3.007)+(17.006), (I-052)+(3.007)+(17.007), (I-052)+(3.007)+(17.008), (I-052)+(3.007)+(17.009), (I-052)+(3.007)+(17.010), (I-052)+(3.007)+(17.011), (I-052)+(3.007)+(17.012), (I-052)+(3.007)+(18.001), (I-052)+(3.008)+(3.025), (I-052)+(3.008)+(3.030), (I-052)+(3.008)+(3.031), (I-052)+(3.008)+(5.001), (I-052)+(3.008)+(5.002), (I-052)+(3.008)+(5.003), (I-052)+(3.008)+(5.004), (I-052)+(3.008)+(5.005), (I-052)+(3.008)+(5.006), (I-052)+(3.008)+(5.007), (I-052)+(3.008)+(5.008), (I-052)+(3.008)+(5.009), (I-052)+(3.008)+(5.010), (I-052)+(3.008)+(5.011), (I-052)+(3.008)+(5.012), (I-052)+(3.008)+(5.013), (I-052)+(3.008)+(5.014), (I-052)+(3.008)+(5.015), (I-052)+(3.008)+(5.016), (I-052)+(3.008)+(5.017), (I-052)+(3.008)+(5.018), (I-052)+(3.008)+(5.019), (I-052)+(3.008)+(5.020), (I-052)+(3.008)+(5.021), (I-052)+(3.008)+(5.022), (I-052)+(3.008)+(5.023), (I-052)+(3.008)+(6.001), (I-052)+(3.008)+(6.002), (I-052)+(3.008)+(6.003), (I-052)+(3.008)+(6.004), (I-052)+(3.008)+(7.001), (I-052)+(3.008)+(7.002), (I-052)+(3.008)+(7.003), (I-052)+(3.008)+(7.004), (I-052)+(3.008)+(7.005), (I-052)+(3.008)+(7.006), (I-052)+(3.008)+(9.001), (I-052)+(3.008)+(9.002), (I-052)+(3.008)+(9.003), (I-052)+(3.008)+(9.004), (I-052)+(3.008)+(9.005), (I-052)+(3.008)+(9.006), (I-052)+(3.008)+(9.007), (I-052)+(3.008)+(9.008), (I-052)+(3.008)+(9.009), (I-052)+(3.008)+(14.001), (I-052)+(3.008)+(14.002), (I-052)+(3.008)+(15.008), (I-052)+(3.008)+(15.011), (I-052)+(3.008)+(15.012), (I-052)+(3.008)+(15.016), (I-052)+(3.008)+(15.025), (I-052)+(3.008)+(15.027), (I-052)+(3.008)+(15.047), (I-052)+(3.008)+(15.063), (I-052)+(3.008)+(15.064), (I-052)+(3.008)+(16.001), (I-052)+(3.008)+(16.002), (I-052)+(3.008)+(16.003), (I-052)+(3.008)+(16.004), (I-052)+(3.008)+(16.005), (I-052)+(3.008)+(16.006), (I-052)+(3.008)+(16.007), (I-052)+(3.008)+(16.008), (I-052)+(3.008)+(17.001), (I-052)+(3.008)+(17.002), (I-052)+(3.008)+(17.003), (I-052)+(3.008)+(17.004), (I-052)+(3.008)+(17.005), (I-052)+(3.008)+(17.006), (I-052)+(3.008)+(17.007), (I-052)+(3.008)+(17.008), (I-052)+(3.008)+(17.009), (I-052)+(3.008)+(17.010), (I-052)+(3.008)+(17.011), (I-052)+(3.008)+(17.012), (I-052)+(3.008)+(18.001), (I-052)+(3.009)+(3.025), (I-052)+(3.009)+(3.030), (I-052)+(3.009)+(3.031), (I-052)+(3.009)+(5.001), (I-052)+(3.009)+(5.002), (I-052)+(3.009)+(5.003), (I-052)+(3.009)+(5.004), (I-052)+(3.009)+(5.005), (I-052)+(3.009)+(5.006), (I-052)+(3.009)+(5.007), (I-052)+(3.009)+(5.008), (I-052)+(3.009)+(5.009), (I-052)+(3.009)+(5.010), (I-052)+(3.009)+(5.011), (I-052)+(3.009)+(5.012), (I-052)+(3.009)+(5.013), (I-052)+(3.009)+(5.014), (I-052)+(3.009)+(5.015), (I-052)+(3.009)+(5.016), (I-052)+(3.009)+(5.017), (I-052)+(3.009)+(5.018), (I-052)+(3.009)+(5.019), (I-052)+(3.009)+(5.020), (I-052)+(3.009)+(5.021), (I-052)+(3.009)+(5.022), (I-052)+(3.009)+(5.023), (I-052)+(3.009)+(6.001), (I-052)+(3.009)+(6.002), (I-052)+(3.009)+(6.003), (I-052)+(3.009)+(6.004), (I-052)+(3.009)+(7.001), (I-052)+(3.009)+(7.002), (I-052)+(3.009)+(7.003), (I-052)+(3.009)+(7.004), (I-052)+(3.009)+(7.005), (I-052)+(3.009)+(7.006), (I-052)+(3.009)+(9.001), (I-052)+(3.009)+(9.002), (I-052)+(3.009)+(9.003), (I-052)+(3.009)+(9.004), (I-052)+(3.009)+(9.005), (I-052)+(3.009)+(9.006), (I-052)+(3.009)+(9.007), (I-052)+(3.009)+(9.008), (I-052)+(3.009)+(9.009), (I-052)+(3.009)+(14.001), (I-052)+(3.009)+(14.002), (I-052)+(3.009)+(15.008), (I-052)+(3.009)+(15.011), (I-052)+(3.009)+(15.012), (I-052)+(3.009)+(15.016), (I-052)+(3.009)+(15.025), (I-052)+(3.009)+(15.027), (I-052)+(3.009)+(15.047), (I-052)+(3.009)+(15.063), (I-052)+(3.009)+(15.064), (I-052)+(3.009)+(16.001), (I-052)+(3.009)+(16.002), (I-052)+(3.009)+(16.003), (I-052)+(3.009)+(16.004), (I-052)+(3.009)+(16.005), (I-052)+(3.009)+(16.006), (I-052)+(3.009)+(16.007), (I-052)+(3.009)+(16.008), (I-052)+(3.009)+(17.001), (I-052)+(3.009)+(17.002), (I-052)+(3.009)+(17.003), (I-052)+(3.009)+(17.004), (I-052)+(3.009)+(17.005), (I-052)+(3.009)+(17.006), (I-052)+(3.009)+(17.007), (I-052)+(3.009)+(17.008), (I-052)+(3.009)+(17.009), (I-052)+(3.009)+(17.010), (I-052)+(3.009)+(17.011), (I-052)+(3.009)+(17.012), (I-052)+(3.009)+(18.001), (I-052)+(3.010)+(3.025), (I-052)+(3.010)+(3.030), (I-052)+(3.010)+(3.031), (I-052)+(3.010)+(5.001), (I-052)+(3.010)+(5.002), (I-052)+(3.010)+(5.003), (I-052)+(3.010)+(5.004), (I-052)+(3.010)+(5.005), (I-052)+(3.010)+(5.006), (I-052)+(3.010)+(5.007), (I-052)+(3.010)+(5.008), (I-052)+(3.010)+(5.009), (I-052)+(3.010)+(5.010), (I-052)+(3.010)+(5.011), (I-052)+(3.010)+(5.012), (I-052)+(3.010)+(5.013), (I-052)+(3.010)+(5.014), (I-052)+(3.010)+(5.015), (I-052)+(3.010)+(5.016), (I-052)+(3.010)+(5.017), (I-052)+(3.010)+(5.018), (I-052)+(3.010)+(5.019), (I-052)+(3.010)+(5.020), (I-052)+(3.010)+(5.021), (I-052)+(3.010)+(5.022), (I-052)+(3.010)+(5.023), (I-052)+(3.010)+(6.001), (I-052)+(3.010)+(6.002), (I-052)+(3.010)+(6.003), (I-052)+(3.010)+(6.004), (I-052)+(3.010)+(7.001), (I-052)+(3.010)+(7.002), (I-052)+(3.010)+(7.003), (I-052)+(3.010)+(7.004), (I-052)+(3.010)+(7.005), (I-052)+(3.010)+(7.006), (I-052)+(3.010)+(9.001), (I-052)+(3.010)+(9.002), (I-052)+(3.010)+(9.003), (I-052)+(3.010)+(9.004), (I-052)+(3.010)+(9.005), (I-052)+(3.010)+(9.006), (I-052)+(3.010)+(9.007), (I-052)+(3.010)+(9.008), (I-052)+(3.010)+(9.009), (I-052)+(3.010)+(14.001), (I-052)+(3.010)+(14.002), (I-052)+(3.010)+(15.008), (I-052)+(3.010)+(15.011), (I-052)+(3.010)+(15.012), (I-052)+(3.010)+(15.016), (I-052)+(3.010)+(15.025), (I-052)+(3.010)+(15.027), (I-052)+(3.010)+(15.047), (I-052)+(3.010)+(15.063), (I-052)+(3.010)+(15.064), (I-052)+(3.010)+(16.001), (I-052)+(3.010)+(16.002), (I-052)+(3.010)+(16.003), (I-052)+(3.010)+(16.004), (I-052)+(3.010)+(16.005), (I-052)+(3.010)+(16.006), (I-052)+(3.010)+(16.007), (I-052)+(3.010)+(16.008), (I-052)+(3.010)+(17.001), (I-052)+(3.010)+(17.002), (I-052)+(3.010)+(17.003), (I-052)+(3.010)+(17.004), (I-052)+(3.010)+(17.005), (I-052)+(3.010)+(17.006), (I-052)+(3.010)+(17.007), (I-052)+(3.010)+(17.008), (I-052)+(3.010)+(17.009), (I-052)+(3.010)+(17.010), (I-052)+(3.010)+(17.011), (I-052)+(3.010)+(17.012), (I-052)+(3.010)+(18.001), (I-052)+(3.011)+(3.025), (I-052)+(3.011)+(3.030), (I-052)+(3.011)+(3.031), (I-052)+(3.011)+(5.001), (I-052)+(3.011)+(5.002), (I-052)+(3.011)+(5.003), (I-052)+(3.011)+(5.004), (I-052)+(3.011)+(5.005), (I-052)+(3.011)+(5.006), (I-052)+(3.011)+(5.007), (I-052)+(3.011)+(5.008), (I-052)+(3.011)+(5.009), (I-052)+(3.011)+(5.010), (I-052)+(3.011)+(5.011), (I-052)+(3.011)+(5.012), (I-052)+(3.011)+(5.013), (I-052)+(3.011)+(5.014), (I-052)+(3.011)+(5.015), (I-052)+(3.011)+(5.016), (I-052)+(3.011)+(5.017), (I-052)+(3.011)+(5.018), (I-052)+(3.011)+(5.019), (I-052)+(3.011)+(5.020), (I-052)+(3.011)+(5.021), (I-052)+(3.011)+(5.022), (I-052)+(3.011)+(5.023), (I-052)+(3.011)+(6.001), (I-052)+(3.011)+(6.002), (I-052)+(3.011)+(6.003), (I-052)+(3.011)+(6.004), (I-052)+(3.011)+(7.001), (I-052)+(3.011)+(7.002), (I-052)+(3.011)+(7.003), (I-052)+(3.011)+(7.004), (I-052)+(3.011)+(7.005), (I-052)+(3.011)+(7.006), (I-052)+(3.011)+(9.001), (I-052)+(3.011)+(9.002), (I-052)+(3.011)+(9.003), (I-052)+(3.011)+(9.004), (I-052)+(3.011)+(9.005), (I-052)+(3.011)+(9.006), (I-052)+(3.011)+(9.007), (I-052)+(3.011)+(9.008), (I-052)+(3.011)+(9.009), (I-052)+(3.011)+(14.001), (I-052)+(3.011)+(14.002), (I-052)+(3.011)+(15.008), (I-052)+(3.011)+(15.011), (I-052)+(3.011)+(15.012), (I-052)+(3.011)+(15.016), (I-052)+(3.011)+(15.025), (I-052)+(3.011)+(15.027), (I-052)+(3.011)+(15.047), (I-052)+(3.011)+(15.063), (I-052)+(3.011)+(15.064), (I-052)+(3.011)+(16.001), (I-052)+(3.011)+(16.002), (I-052)+(3.011)+(16.003), (I-052)+(3.011)+(16.004), (I-052)+(3.011)+(16.005), (I-052)+(3.011)+(16.006), (I-052)+(3.011)+(16.007), (I-052)+(3.011)+(16.008), (I-052)+(3.011)+(17.001), (I-052)+(3.011)+(17.002), (I-052)+(3.011)+(17.003), (I-052)+(3.011)+(17.004), (I-052)+(3.011)+(17.005), (I-052)+(3.011)+(17.006), (I-052)+(3.011)+(17.007), (I-052)+(3.011)+(17.008), (I-052)+(3.011)+(17.009), (I-052)+(3.011)+(17.010), (I-052)+(3.011)+(17.011), (I-052)+(3.011)+(17.012), (I-052)+(3.011)+(18.001), (I-052)+(3.012)+(3.025), (I-052)+(3.012)+(3.030), (I-052)+(3.012)+(3.031), (I-052)+(3.012)+(5.001), (I-052)+(3.012)+(5.002), (I-052)+(3.012)+(5.003), (I-052)+(3.012)+(5.004), (I-052)+(3.012)+(5.005), (I-052)+(3.012)+(5.006), (I-052)+(3.012)+(5.007), (I-052)+(3.012)+(5.008), (I-052)+(3.012)+(5.009), (I-052)+(3.012)+(5.010), (I-052)+(3.012)+(5.011), (I-052)+(3.012)+(5.012), (I-052)+(3.012)+(5.013), (I-052)+(3.012)+(5.014), (I-052)+(3.012)+(5.015), (I-052)+(3.012)+(5.016), (I-052)+(3.012)+(5.017), (I-052)+(3.012)+(5.018), (I-052)+(3.012)+(5.019), (I-052)+(3.012)+(5.020), (I-052)+(3.012)+(5.021), (I-052)+(3.012)+(5.022), (I-052)+(3.012)+(5.023), (I-052)+(3.012)+(6.001), (I-052)+(3.012)+(6.002), (I-052)+(3.012)+(6.003), (I-052)+(3.012)+(6.004), (I-052)+(3.012)+(7.001), (I-052)+(3.012)+(7.002), (I-052)+(3.012)+(7.003), (I-052)+(3.012)+(7.004), (I-052)+(3.012)+(7.005), (I-052)+(3.012)+(7.006), (I-052)+(3.012)+(9.001), (I-052)+(3.012)+(9.002), (I-052)+(3.012)+(9.003), (I-052)+(3.012)+(9.004), (I-052)+(3.012)+(9.005), (I-052)+(3.012)+(9.006), (I-052)+(3.012)+(9.007), (I-052)+(3.012)+(9.008), (I-052)+(3.012)+(9.009), (I-052)+(3.012)+(14.001), (I-052)+(3.012)+(14.002), (I-052)+(3.012)+(15.008), (I-052)+(3.012)+(15.011), (I-052)+(3.012)+(15.012), (I-052)+(3.012)+(15.016), (I-052)+(3.012)+(15.025), (I-052)+(3.012)+(15.027), (I-052)+(3.012)+(15.047), (I-052)+(3.012)+(15.063), (I-052)+(3.012)+(15.064), (I-052)+(3.012)+(16.001), (I-052)+(3.012)+(16.002), (I-052)+(3.012)+(16.003), (I-052)+(3.012)+(16.004), (I-052)+(3.012)+(16.005), (I-052)+(3.012)+(16.006), (I-052)+(3.012)+(16.007), (I-052)+(3.012)+(16.008), (I-052)+(3.012)+(17.001), (I-052)+(3.012)+(17.002), (I-052)+(3.012)+(17.003), (I-052)+(3.012)+(17.004), (I-052)+(3.012)+(17.005), (I-052)+(3.012)+(17.006), (I-052)+(3.012)+(17.007), (I-052)+(3.012)+(17.008), (I-052)+(3.012)+(17.009), (I-052)+(3.012)+(17.010), (I-052)+(3.012)+(17.011), (I-052)+(3.012)+(17.012), (I-052)+(3.012)+(18.001), (I-052)+(3.013)+(3.025), (I-052)+(3.013)+(3.030), (I-052)+(3.013)+(3.031), (I-052)+(3.013)+(5.001), (I-052)+(3.013)+(5.002), (I-052)+(3.013)+(5.003), (I-052)+(3.013)+(5.004), (I-052)+(3.013)+(5.005), (I-052)+(3.013)+(5.006), (I-052)+(3.013)+(5.007), (I-052)+(3.013)+(5.008), (I-052)+(3.013)+(5.009), (I-052)+(3.013)+(5.010), (I-052)+(3.013)+(5.011), (I-052)+(3.013)+(5.012), (I-052)+(3.013)+(5.013), (I-052)+(3.013)+(5.014), (I-052)+(3.013)+(5.015), (I-052)+(3.013)+(5.016), (I-052)+(3.013)+(5.017), (I-052)+(3.013)+(5.018), (I-052)+(3.013)+(5.019), (I-052)+(3.013)+(5.020), (I-052)+(3.013)+(5.021), (I-052)+(3.013)+(5.022), (I-052)+(3.013)+(5.023), (I-052)+(3.013)+(6.001), (I-052)+(3.013)+(6.002), (I-052)+(3.013)+(6.003), (I-052)+(3.013)+(6.004), (I-052)+(3.013)+(7.001), (I-052)+(3.013)+(7.002), (I-052)+(3.013)+(7.003), (I-052)+(3.013)+(7.004), (I-052)+(3.013)+(7.005), (I-052)+(3.013)+(7.006), (I-052)+(3.013)+(9.001), (I-052)+(3.013)+(9.002), (I-052)+(3.013)+(9.003), (I-052)+(3.013)+(9.004), (I-052)+(3.013)+(9.005), (I-052)+(3.013)+(9.006), (I-052)+(3.013)+(9.007), (I-052)+(3.013)+(9.008), (I-052)+(3.013)+(9.009), (I-052)+(3.013)+(14.001), (I-052)+(3.013)+(14.002), (I-052)+(3.013)+(15.008), (I-052)+(3.013)+(15.011), (I-052)+(3.013)+(15.012), (I-052)+(3.013)+(15.016), (I-052)+(3.013)+(15.025), (I-052)+(3.013)+(15.027), (I-052)+(3.013)+(15.047), (I-052)+(3.013)+(15.063), (I-052)+(3.013)+(15.064), (I-052)+(3.013)+(16.001), (I-052)+(3.013)+(16.002), (I-052)+(3.013)+(16.003), (I-052)+(3.013)+(16.004), (I-052)+(3.013)+(16.005), (I-052)+(3.013)+(16.006), (I-052)+(3.013)+(16.007), (I-052)+(3.013)+(16.008), (I-052)+(3.013)+(17.001), (I-052)+(3.013)+(17.002), (I-052)+(3.013)+(17.003), (I-052)+(3.013)+(17.004), (I-052)+(3.013)+(17.005), (I-052)+(3.013)+(17.006), (I-052)+(3.013)+(17.007), (I-052)+(3.013)+(17.008), (I-052)+(3.013)+(17.009), (I-052)+(3.013)+(17.010), (I-052)+(3.013)+(17.011), (I-052)+(3.013)+(17.012), (I-052)+(3.013)+(18.001), (I-052)+(3.014)+(3.025), (I-052)+(3.014)+(3.030), (I-052)+(3.014)+(3.031), (I-052)+(3.014)+(5.001), (I-052)+(3.014)+(5.002), (I-052)+(3.014)+(5.003), (I-052)+(3.014)+(5.004), (I-052)+(3.014)+(5.005), (I-052)+(3.014)+(5.006), (I-052)+(3.014)+(5.007), (I-052)+(3.014)+(5.008), (I-052)+(3.014)+(5.009), (I-052)+(3.014)+(5.010), (I-052)+(3.014)+(5.011), (I-052)+(3.014)+(5.012), (I-052)+(3.014)+(5.013), (I-052)+(3.014)+(5.014), (I-052)+(3.014)+(5.015), (I-052)+(3.014)+(5.016), (I-052)+(3.014)+(5.017), (I-052)+(3.014)+(5.018), (I-052)+(3.014)+(5.019), (I-052)+(3.014)+(5.020), (I-052)+(3.014)+(5.021), (I-052)+(3.014)+(5.022), (I-052)+(3.014)+(5.023), (I-052)+(3.014)+(6.001), (I-052)+(3.014)+(6.002), (I-052)+(3.014)+(6.003), (I-052)+(3.014)+(6.004), (I-052)+(3.014)+(7.001), (I-052)+(3.014)+(7.002), (I-052)+(3.014)+(7.003), (I-052)+(3.014)+(7.004), (I-052)+(3.014)+(7.005), (I-052)+(3.014)+(7.006), (I-052)+(3.014)+(9.001), (I-052)+(3.014)+(9.002), (I-052)+(3.014)+(9.003), (I-052)+(3.014)+(9.004), (I-052)+(3.014)+(9.005), (I-052)+(3.014)+(9.006), (I-052)+(3.014)+(9.007), (I-052)+(3.014)+(9.008), (I-052)+(3.014)+(9.009), (I-052)+(3.014)+(14.001), (I-052)+(3.014)+(14.002), (I-052)+(3.014)+(15.008), (I-052)+(3.014)+(15.011), (I-052)+(3.014)+(15.012), (I-052)+(3.014)+(15.016), (I-052)+(3.014)+(15.025), (I-052)+(3.014)+(15.027), (I-052)+(3.014)+(15.047), (I-052)+(3.014)+(15.063), (I-052)+(3.014)+(15.064), (I-052)+(3.014)+(16.001), (I-052)+(3.014)+(16.002), (I-052)+(3.014)+(16.003), (I-052)+(3.014)+(16.004), (I-052)+(3.014)+(16.005), (I-052)+(3.014)+(16.006), (I-052)+(3.014)+(16.007), (I-052)+(3.014)+(16.008), (I-052)+(3.014)+(17.001), (I-052)+(3.014)+(17.002), (I-052)+(3.014)+(17.003), (I-052)+(3.014)+(17.004), (I-052)+(3.014)+(17.005), (I-052)+(3.014)+(17.006), (I-052)+(3.014)+(17.007), (I-052)+(3.014)+(17.008), (I-052)+(3.014)+(17.009), (I-052)+(3.014)+(17.010), (I-052)+(3.014)+(17.011), (I-052)+(3.014)+(17.012), (I-052)+(3.014)+(18.001), (I-052)+(3.015)+(3.025), (I-052)+(3.015)+(3.030), (I-052)+(3.015)+(3.031), (I-052)+(3.015)+(5.001), (I-052)+(3.015)+(5.002), (I-052)+(3.015)+(5.003), (I-052)+(3.015)+(5.004), (I-052)+(3.015)+(5.005), (I-052)+(3.015)+(5.006), (I-052)+(3.015)+(5.007), (I-052)+(3.015)+(5.008), (I-052)+(3.015)+(5.009), (I-052)+(3.015)+(5.010), (I-052)+(3.015)+(5.011), (I-052)+(3.015)+(5.012), (I-052)+(3.015)+(5.013), (I-052)+(3.015)+(5.014), (I-052)+(3.015)+(5.015), (I-052)+(3.015)+(5.016), (I-052)+(3.015)+(5.017), (I-052)+(3.015)+(5.018), (I-052)+(3.015)+(5.019), (I-052)+(3.015)+(5.020), (I-052)+(3.015)+(5.021), (I-052)+(3.015)+(5.022), (I-052)+(3.015)+(5.023), (I-052)+(3.015)+(6.001), (I-052)+(3.015)+(6.002), (I-052)+(3.015)+(6.003), (I-052)+(3.015)+(6.004), (I-052)+(3.015)+(7.001), (I-052)+(3.015)+(7.002), (I-052)+(3.015)+(7.003), (I-052)+(3.015)+(7.004), (I-052)+(3.015)+(7.005), (I-052)+(3.015)+(7.006), (I-052)+(3.015)+(9.001), (I-052)+(3.015)+(9.002), (I-052)+(3.015)+(9.003), (I-052)+(3.015)+(9.004), (I-052)+(3.015)+(9.005), (I-052)+(3.015)+(9.006), (I-052)+(3.015)+(9.007), (I-052)+(3.015)+(9.008), (I-052)+(3.015)+(9.009), (I-052)+(3.015)+(14.001), (I-052)+(3.015)+(14.002), (I-052)+(3.015)+(15.008), (I-052)+(3.015)+(15.011), (I-052)+(3.015)+(15.012), (I-052)+(3.015)+(15.016), (I-052)+(3.015)+(15.025), (I-052)+(3.015)+(15.027), (I-052)+(3.015)+(15.047), (I-052)+(3.015)+(15.063), (I-052)+(3.015)+(15.064), (I-052)+(3.015)+(16.001), (I-052)+(3.015)+(16.002), (I-052)+(3.015)+(16.003), (I-052)+(3.015)+(16.004), (I-052)+(3.015)+(16.005), (I-052)+(3.015)+(16.006), (I-052)+(3.015)+(16.007), (I-052)+(3.015)+(16.008), (I-052)+(3.015)+(17.001), (I-052)+(3.015)+(17.002), (I-052)+(3.015)+(17.003), (I-052)+(3.015)+(17.004), (I-052)+(3.015)+(17.005), (I-052)+(3.015)+(17.006), (I-052)+(3.015)+(17.007), (I-052)+(3.015)+(17.008), (I-052)+(3.015)+(17.009), (I-052)+(3.015)+(17.010), (I-052)+(3.015)+(17.011), (I-052)+(3.015)+(17.012), (I-052)+(3.015)+(18.001), (I-052)+(3.016)+(3.025), (I-052)+(3.016)+(3.030), (I-052)+(3.016)+(3.031), (I-052)+(3.016)+(5.001), (I-052)+(3.016)+(5.002), (I-052)+(3.016)+(5.003), (I-052)+(3.016)+(5.004), (I-052)+(3.016)+(5.005), (I-052)+(3.016)+(5.006), (I-052)+(3.016)+(5.007), (I-052)+(3.016)+(5.008), (I-052)+(3.016)+(5.009), (I-052)+(3.016)+(5.010), (I-052)+(3.016)+(5.011), (I-052)+(3.016)+(5.012), (I-052)+(3.016)+(5.013), (I-052)+(3.016)+(5.014), (I-052)+(3.016)+(5.015), (I-052)+(3.016)+(5.016), (I-052)+(3.016)+(5.017), (I-052)+(3.016)+(5.018), (I-052)+(3.016)+(5.019), (I-052)+(3.016)+(5.020), (I-052)+(3.016)+(5.021), (I-052)+(3.016)+(5.022), (I-052)+(3.016)+(5.023), (I-052)+(3.016)+(6.001), (I-052)+(3.016)+(6.002), (I-052)+(3.016)+(6.003), (I-052)+(3.016)+(6.004), (I-052)+(3.016)+(7.001), (I-052)+(3.016)+(7.002), (I-052)+(3.016)+(7.003), (I-052)+(3.016)+(7.004), (I-052)+(3.016)+(7.005), (I-052)+(3.016)+(7.006), (I-052)+(3.016)+(9.001), (I-052)+(3.016)+(9.002), (I-052)+(3.016)+(9.003), (I-052)+(3.016)+(9.004), (I-052)+(3.016)+(9.005), (I-052)+(3.016)+(9.006), (I-052)+(3.016)+(9.007), (I-052)+(3.016)+(9.008), (I-052)+(3.016)+(9.009), (I-052)+(3.016)+(14.001), (I-052)+(3.016)+(14.002), (I-052)+(3.016)+(15.008), (I-052)+(3.016)+(15.011), (I-052)+(3.016)+(15.012), (I-052)+(3.016)+(15.016), (I-052)+(3.016)+(15.025), (I-052)+(3.016)+(15.027), (I-052)+(3.016)+(15.047), (I-052)+(3.016)+(15.063), (I-052)+(3.016)+(15.064), (I-052)+(3.016)+(16.001), (I-052)+(3.016)+(16.002), (I-052)+(3.016)+(16.003), (I-052)+(3.016)+(16.004), (I-052)+(3.016)+(16.005), (I-052)+(3.016)+(16.006), (I-052)+(3.016)+(16.007), (I-052)+(3.016)+(16.008), (I-052)+(3.016)+(17.001), (I-052)+(3.016)+(17.002), (I-052)+(3.016)+(17.003), (I-052)+(3.016)+(17.004), (I-052)+(3.016)+(17.005), (I-052)+(3.016)+(17.006), (I-052)+(3.016)+(17.007), (I-052)+(3.016)+(17.008), (I-052)+(3.016)+(17.009), (I-052)+(3.016)+(17.010), (I-052)+(3.016)+(17.011), (I-052)+(3.016)+(17.012), (I-052)+(3.016)+(18.001), (I-052)+(3.017)+(3.025), (I-052)+(3.017)+(3.030), (I-052)+(3.017)+(3.031), (I-052)+(3.017)+(5.001), (I-052)+(3.017)+(5.002), (I-052)+(3.017)+(5.003), (I-052)+(3.017)+(5.004), (I-052)+(3.017)+(5.005), (I-052)+(3.017)+(5.006), (I-052)+(3.017)+(5.007), (I-052)+(3.017)+(5.008), (I-052)+(3.017)+(5.009), (I-052)+(3.017)+(5.010), (I-052)+(3.017)+(5.011), (I-052)+(3.017)+(5.012), (I-052)+(3.017)+(5.013), (I-052)+(3.017)+(5.014), (I-052)+(3.017)+(5.015), (I-052)+(3.017)+(5.016), (I-052)+(3.017)+(5.017), (I-052)+(3.017)+(5.018), (I-052)+(3.017)+(5.019), (I-052)+(3.017)+(5.020), (I-052)+(3.017)+(5.021), (I-052)+(3.017)+(5.022), (I-052)+(3.017)+(5.023), (I-052)+(3.017)+(6.001), (I-052)+(3.017)+(6.002), (I-052)+(3.017)+(6.003), (I-052)+(3.017)+(6.004), (I-052)+(3.017)+(7.001), (I-052)+(3.017)+(7.002), (I-052)+(3.017)+(7.003), (I-052)+(3.017)+(7.004), (I-052)+(3.017)+(7.005), (I-052)+(3.017)+(7.006), (I-052)+(3.017)+(9.001), (I-052)+(3.017)+(9.002), (I-052)+(3.017)+(9.003), (I-052)+(3.017)+(9.004), (I-052)+(3.017)+(9.005), (I-052)+(3.017)+(9.006), (I-052)+(3.017)+(9.007), (I-052)+(3.017)+(9.008), (I-052)+(3.017)+(9.009), (I-052)+(3.017)+(14.001), (I-052)+(3.017)+(14.002), (I-052)+(3.017)+(15.008), (I-052)+(3.017)+(15.011), (I-052)+(3.017)+(15.012), (I-052)+(3.017)+(15.016), (I-052)+(3.017)+(15.025), (I-052)+(3.017)+(15.027), (I-052)+(3.017)+(15.047), (I-052)+(3.017)+(15.063), (I-052)+(3.017)+(15.064), (I-052)+(3.017)+(16.001), (I-052)+(3.017)+(16.002), (I-052)+(3.017)+(16.003), (I-052)+(3.017)+(16.004), (I-052)+(3.017)+(16.005), (I-052)+(3.017)+(16.006), (I-052)+(3.017)+(16.007), (I-052)+(3.017)+(16.008), (I-052)+(3.017)+(17.001), (I-052)+(3.017)+(17.002), (I-052)+(3.017)+(17.003), (I-052)+(3.017)+(17.004), (I-052)+(3.017)+(17.005), (I-052)+(3.017)+(17.006), (I-052)+(3.017)+(17.007), (I-052)+(3.017)+(17.008), (I-052)+(3.017)+(17.009), (I-052)+(3.017)+(17.010), (I-052)+(3.017)+(17.011), (I-052)+(3.017)+(17.012), (I-052)+(3.017)+(18.001), (I-052)+(3.018)+(3.025), (I-052)+(3.018)+(3.030), (I-052)+(3.018)+(3.031), (I-052)+(3.018)+(5.001), (I-052)+(3.018)+(5.002), (I-052)+(3.018)+(5.003), (I-052)+(3.018)+(5.004), (I-052)+(3.018)+(5.005), (I-052)+(3.018)+(5.006), (I-052)+(3.018)+(5.007), (I-052)+(3.018)+(5.008), (I-052)+(3.018)+(5.009), (I-052)+(3.018)+(5.010), (I-052)+(3.018)+(5.011), (I-052)+(3.018)+(5.012), (I-052)+(3.018)+(5.013), (I-052)+(3.018)+(5.014), (I-052)+(3.018)+(5.015), (I-052)+(3.018)+(5.016), (I-052)+(3.018)+(5.017), (I-052)+(3.018)+(5.018), (I-052)+(3.018)+(5.019), (I-052)+(3.018)+(5.020), (I-052)+(3.018)+(5.021), (I-052)+(3.018)+(5.022), (I-052)+(3.018)+(5.023), (I-052)+(3.018)+(6.001), (I-052)+(3.018)+(6.002), (I-052)+(3.018)+(6.003), (I-052)+(3.018)+(6.004), (I-052)+(3.018)+(7.001), (I-052)+(3.018)+(7.002), (I-052)+(3.018)+(7.003), (I-052)+(3.018)+(7.004), (I-052)+(3.018)+(7.005), (I-052)+(3.018)+(7.006), (I-052)+(3.018)+(9.001), (I-052)+(3.018)+(9.002), (I-052)+(3.018)+(9.003), (I-052)+(3.018)+(9.004), (I-052)+(3.018)+(9.005), (I-052)+(3.018)+(9.006), (I-052)+(3.018)+(9.007), (I-052)+(3.018)+(9.008), (I-052)+(3.018)+(9.009), (I-052)+(3.018)+(14.001), (I-052)+(3.018)+(14.002), (I-052)+(3.018)+(15.008), (I-052)+(3.018)+(15.011), (I-052)+(3.018)+(15.012), (I-052)+(3.018)+(15.016), (I-052)+(3.018)+(15.025), (I-052)+(3.018)+(15.027), (I-052)+(3.018)+(15.047), (I-052)+(3.018)+(15.063), (I-052)+(3.018)+(15.064), (I-052)+(3.018)+(16.001), (I-052)+(3.018)+(16.002), (I-052)+(3.018)+(16.003), (I-052)+(3.018)+(16.004), (I-052)+(3.018)+(16.005), (I-052)+(3.018)+(16.006), (I-052)+(3.018)+(16.007), (I-052)+(3.018)+(16.008), (I-052)+(3.018)+(17.001), (I-052)+(3.018)+(17.002), (I-052)+(3.018)+(17.003), (I-052)+(3.018)+(17.004), (I-052)+(3.018)+(17.005), (I-052)+(3.018)+(17.006), (I-052)+(3.018)+(17.007), (I-052)+(3.018)+(17.008), (I-052)+(3.018)+(17.009), (I-052)+(3.018)+(17.010), (I-052)+(3.018)+(17.011), (I-052)+(3.018)+(17.012), (I-052)+(3.018)+(18.001), (I-052)+(3.019)+(3.025), (I-052)+(3.019)+(3.030), (I-052)+(3.019)+(3.031), (I-052)+(3.019)+(5.001), (I-052)+(3.019)+(5.002), (I-052)+(3.019)+(5.003), (I-052)+(3.019)+(5.004), (I-052)+(3.019)+(5.005), (I-052)+(3.019)+(5.006), (I-052)+(3.019)+(5.007), (I-052)+(3.019)+(5.008), (I-052)+(3.019)+(5.009), (I-052)+(3.019)+(5.010), (I-052)+(3.019)+(5.011), (I-052)+(3.019)+(5.012), (I-052)+(3.019)+(5.013), (I-052)+(3.019)+(5.014), (I-052)+(3.019)+(5.015), (I-052)+(3.019)+(5.016), (I-052)+(3.019)+(5.017), (I-052)+(3.019)+(5.018), (I-052)+(3.019)+(5.019), (I-052)+(3.019)+(5.020), (I-052)+(3.019)+(5.021), (I-052)+(3.019)+(5.022), (I-052)+(3.019)+(5.023), (I-052)+(3.019)+(6.001), (I-052)+(3.019)+(6.002), (I-052)+(3.019)+(6.003), (I-052)+(3.019)+(6.004), (I-052)+(3.019)+(7.001), (I-052)+(3.019)+(7.002), (I-052)+(3.019)+(7.003), (I-052)+(3.019)+(7.004), (I-052)+(3.019)+(7.005), (I-052)+(3.019)+(7.006), (I-052)+(3.019)+(9.001), (I-052)+(3.019)+(9.002), (I-052)+(3.019)+(9.003), (I-052)+(3.019)+(9.004), (I-052)+(3.019)+(9.005), (I-052)+(3.019)+(9.006), (I-052)+(3.019)+(9.007), (I-052)+(3.019)+(9.008), (I-052)+(3.019)+(9.009), (I-052)+(3.019)+(14.001), (I-052)+(3.019)+(14.002), (I-052)+(3.019)+(15.008), (I-052)+(3.019)+(15.011), (I-052)+(3.019)+(15.012), (I-052)+(3.019)+(15.016), (I-052)+(3.019)+(15.025), (I-052)+(3.019)+(15.027), (I-052)+(3.019)+(15.047), (I-052)+(3.019)+(15.063), (I-052)+(3.019)+(15.064), (I-052)+(3.019)+(16.001), (I-052)+(3.019)+(16.002), (I-052)+(3.019)+(16.003), (I-052)+(3.019)+(16.004), (I-052)+(3.019)+(16.005), (I-052)+(3.019)+(16.006), (I-052)+(3.019)+(16.007), (I-052)+(3.019)+(16.008), (I-052)+(3.019)+(17.001), (I-052)+(3.019)+(17.002), (I-052)+(3.019)+(17.003), (I-052)+(3.019)+(17.004), (I-052)+(3.019)+(17.005), (I-052)+(3.019)+(17.006), (I-052)+(3.019)+(17.007), (I-052)+(3.019)+(17.008), (I-052)+(3.019)+(17.009), (I-052)+(3.019)+(17.010), (I-052)+(3.019)+(17.011), (I-052)+(3.019)+(17.012), (I-052)+(3.019)+(18.001), (I-052)+(3.020)+(3.025), (I-052)+(3.020)+(3.030), (I-052)+(3.020)+(3.031), (I-052)+(3.020)+(5.001), (I-052)+(3.020)+(5.002), (I-052)+(3.020)+(5.003), (I-052)+(3.020)+(5.004), (I-052)+(3.020)+(5.005), (I-052)+(3.020)+(5.006), (I-052)+(3.020)+(5.007), (I-052)+(3.020)+(5.008), (I-052)+(3.020)+(5.009), (I-052)+(3.020)+(5.010), (I-052)+(3.020)+(5.011), (I-052)+(3.020)+(5.012), (I-052)+(3.020)+(5.013), (I-052)+(3.020)+(5.014), (I-052)+(3.020)+(5.015), (I-052)+(3.020)+(5.016), (I-052)+(3.020)+(5.017), (I-052)+(3.020)+(5.018), (I-052)+(3.020)+(5.019), (I-052)+(3.020)+(5.020), (I-052)+(3.020)+(5.021), (I-052)+(3.020)+(5.022), (I-052)+(3.020)+(5.023), (I-052)+(3.020)+(6.001), (I-052)+(3.020)+(6.002), (I-052)+(3.020)+(6.003), (I-052)+(3.020)+(6.004), (I-052)+(3.020)+(7.001), (I-052)+(3.020)+(7.002), (I-052)+(3.020)+(7.003), (I-052)+(3.020)+(7.004), (I-052)+(3.020)+(7.005), (I-052)+(3.020)+(7.006), (I-052)+(3.020)+(9.001), (I-052)+(3.020)+(9.002), (I-052)+(3.020)+(9.003), (I-052)+(3.020)+(9.004), (I-052)+(3.020)+(9.005), (I-052)+(3.020)+(9.006), (I-052)+(3.020)+(9.007), (I-052)+(3.020)+(9.008), (I-052)+(3.020)+(9.009), (I-052)+(3.020)+(14.001), (I-052)+(3.020)+(14.002), (I-052)+(3.020)+(15.008), (I-052)+(3.020)+(15.011), (I-052)+(3.020)+(15.012), (I-052)+(3.020)+(15.016), (I-052)+(3.020)+(15.025), (I-052)+(3.020)+(15.027), (I-052)+(3.020)+(15.047), (I-052)+(3.020)+(15.063), (I-052)+(3.020)+(15.064), (I-052)+(3.020)+(16.001), (I-052)+(3.020)+(16.002), (I-052)+(3.020)+(16.003), (I-052)+(3.020)+(16.004), (I-052)+(3.020)+(16.005), (I-052)+(3.020)+(16.006), (I-052)+(3.020)+(16.007), (I-052)+(3.020)+(16.008), (I-052)+(3.020)+(17.001), (I-052)+(3.020)+(17.002), (I-052)+(3.020)+(17.003), (I-052)+(3.020)+(17.004), (I-052)+(3.020)+(17.005), (I-052)+(3.020)+(17.006), (I-052)+(3.020)+(17.007), (I-052)+(3.020)+(17.008), (I-052)+(3.020)+(17.009), (I-052)+(3.020)+(17.010), (I-052)+(3.020)+(17.011), (I-052)+(3.020)+(17.012), (I-052)+(3.020)+(18.001), (I-052)+(3.021)+(3.025), (I-052)+(3.021)+(3.030), (I-052)+(3.021)+(3.031), (I-052)+(3.021)+(5.001), (I-052)+(3.021)+(5.002), (I-052)+(3.021)+(5.003), (I-052)+(3.021)+(5.004), (I-052)+(3.021)+(5.005), (I-052)+(3.021)+(5.006), (I-052)+(3.021)+(5.007), (I-052)+(3.021)+(5.008), (I-052)+(3.021)+(5.009), (I-052)+(3.021)+(5.010), (I-052)+(3.021)+(5.011), (I-052)+(3.021)+(5.012), (I-052)+(3.021)+(5.013), (I-052)+(3.021)+(5.014), (I-052)+(3.021)+(5.015), (I-052)+(3.021)+(5.016), (I-052)+(3.021)+(5.017), (I-052)+(3.021)+(5.018), (I-052)+(3.021)+(5.019), (I-052)+(3.021)+(5.020), (I-052)+(3.021)+(5.021), (I-052)+(3.021)+(5.022), (I-052)+(3.021)+(5.023), (I-052)+(3.021)+(6.001), (I-052)+(3.021)+(6.002), (I-052)+(3.021)+(6.003), (I-052)+(3.021)+(6.004), (I-052)+(3.021)+(7.001), (I-052)+(3.021)+(7.002), (I-052)+(3.021)+(7.003), (I-052)+(3.021)+(7.004), (I-052)+(3.021)+(7.005), (I-052)+(3.021)+(7.006), (I-052)+(3.021)+(9.001), (I-052)+(3.021)+(9.002), (I-052)+(3.021)+(9.003), (I-052)+(3.021)+(9.004), (I-052)+(3.021)+(9.005), (I-052)+(3.021)+(9.006), (I-052)+(3.021)+(9.007), (I-052)+(3.021)+(9.008), (I-052)+(3.021)+(9.009), (I-052)+(3.021)+(14.001), (I-052)+(3.021)+(14.002), (I-052)+(3.021)+(15.008), (I-052)+(3.021)+(15.011), (I-052)+(3.021)+(15.012), (I-052)+(3.021)+(15.016), (I-052)+(3.021)+(15.025), (I-052)+(3.021)+(15.027), (I-052)+(3.021)+(15.047), (I-052)+(3.021)+(15.063), (I-052)+(3.021)+(15.064), (I-052)+(3.021)+(16.001), (I-052)+(3.021)+(16.002), (I-052)+(3.021)+(16.003), (I-052)+(3.021)+(16.004), (I-052)+(3.021)+(16.005), (I-052)+(3.021)+(16.006), (I-052)+(3.021)+(16.007), (I-052)+(3.021)+(16.008), (I-052)+(3.021)+(17.001), (I-052)+(3.021)+(17.002), (I-052)+(3.021)+(17.003), (I-052)+(3.021)+(17.004), (I-052)+(3.021)+(17.005), (I-052)+(3.021)+(17.006), (I-052)+(3.021)+(17.007), (I-052)+(3.021)+(17.008), (I-052)+(3.021)+(17.009), (I-052)+(3.021)+(17.010), (I-052)+(3.021)+(17.011), (I-052)+(3.021)+(17.012), (I-052)+(3.021)+(18.001), (I-052)+(3.022)+(3.025), (I-052)+(3.022)+(3.030), (I-052)+(3.022)+(3.031), (I-052)+(3.022)+(5.001), (I-052)+(3.022)+(5.002), (I-052)+(3.022)+(5.003), (I-052)+(3.022)+(5.004), (I-052)+(3.022)+(5.005), (I-052)+(3.022)+(5.006), (I-052)+(3.022)+(5.007), (I-052)+(3.022)+(5.008), (I-052)+(3.022)+(5.009), (I-052)+(3.022)+(5.010), (I-052)+(3.022)+(5.011), (I-052)+(3.022)+(5.012), (I-052)+(3.022)+(5.013), (I-052)+(3.022)+(5.014), (I-052)+(3.022)+(5.015), (I-052)+(3.022)+(5.016), (I-052)+(3.022)+(5.017), (I-052)+(3.022)+(5.018), (I-052)+(3.022)+(5.019), (I-052)+(3.022)+(5.020), (I-052)+(3.022)+(5.021), (I-052)+(3.022)+(5.022), (I-052)+(3.022)+(5.023), (I-052)+(3.022)+(6.001), (I-052)+(3.022)+(6.002), (I-052)+(3.022)+(6.003), (I-052)+(3.022)+(6.004), (I-052)+(3.022)+(7.001), (I-052)+(3.022)+(7.002), (I-052)+(3.022)+(7.003), (I-052)+(3.022)+(7.004), (I-052)+(3.022)+(7.005), (I-052)+(3.022)+(7.006), (I-052)+(3.022)+(9.001), (I-052)+(3.022)+(9.002), (I-052)+(3.022)+(9.003), (I-052)+(3.022)+(9.004), (I-052)+(3.022)+(9.005), (I-052)+(3.022)+(9.006), (I-052)+(3.022)+(9.007), (I-052)+(3.022)+(9.008), (I-052)+(3.022)+(9.009), (I-052)+(3.022)+(14.001), (I-052)+(3.022)+(14.002), (I-052)+(3.022)+(15.008), (I-052)+(3.022)+(15.011), (I-052)+(3.022)+(15.012), (I-052)+(3.022)+(15.016), (I-052)+(3.022)+(15.025), (I-052)+(3.022)+(15.027), (I-052)+(3.022)+(15.047), (I-052)+(3.022)+(15.063), (I-052)+(3.022)+(15.064), (I-052)+(3.022)+(16.001), (I-052)+(3.022)+(16.002), (I-052)+(3.022)+(16.003), (I-052)+(3.022)+(16.004), (I-052)+(3.022)+(16.005), (I-052)+(3.022)+(16.006), (I-052)+(3.022)+(16.007), (I-052)+(3.022)+(16.008), (I-052)+(3.022)+(17.001), (I-052)+(3.022)+(17.002), (I-052)+(3.022)+(17.003), (I-052)+(3.022)+(17.004), (I-052)+(3.022)+(17.005), (I-052)+(3.022)+(17.006), (I-052)+(3.022)+(17.007), (I-052)+(3.022)+(17.008), (I-052)+(3.022)+(17.009), (I-052)+(3.022)+(17.010), (I-052)+(3.022)+(17.011), (I-052)+(3.022)+(17.012), (I-052)+(3.022)+(18.001), (I-052)+(3.023)+(3.025), (I-052)+(3.023)+(3.030), (I-052)+(3.023)+(3.031), (I-052)+(3.023)+(5.001), (I-052)+(3.023)+(5.002), (I-052)+(3.023)+(5.003), (I-052)+(3.023)+(5.004), (I-052)+(3.023)+(5.005), (I-052)+(3.023)+(5.006), (I-052)+(3.023)+(5.007), (I-052)+(3.023)+(5.008), (I-052)+(3.023)+(5.009), (I-052)+(3.023)+(5.010), (I-052)+(3.023)+(5.011), (I-052)+(3.023)+(5.012), (I-052)+(3.023)+(5.013), (I-052)+(3.023)+(5.014), (I-052)+(3.023)+(5.015), (I-052)+(3.023)+(5.016), (I-052)+(3.023)+(5.017), (I-052)+(3.023)+(5.018), (I-052)+(3.023)+(5.019), (I-052)+(3.023)+(5.020), (I-052)+(3.023)+(5.021), (I-052)+(3.023)+(5.022), (I-052)+(3.023)+(5.023), (I-052)+(3.023)+(6.001), (I-052)+(3.023)+(6.002), (I-052)+(3.023)+(6.003), (I-052)+(3.023)+(6.004), (I-052)+(3.023)+(7.001), (I-052)+(3.023)+(7.002), (I-052)+(3.023)+(7.003), (I-052)+(3.023)+(7.004), (I-052)+(3.023)+(7.005), (I-052)+(3.023)+(7.006), (I-052)+(3.023)+(9.001), (I-052)+(3.023)+(9.002), (I-052)+(3.023)+(9.003), (I-052)+(3.023)+(9.004), (I-052)+(3.023)+(9.005), (I-052)+(3.023)+(9.006), (I-052)+(3.023)+(9.007), (I-052)+(3.023)+(9.008), (I-052)+(3.023)+(9.009), (I-052)+(3.023)+(14.001), (I-052)+(3.023)+(14.002), (I-052)+(3.023)+(15.008), (I-052)+(3.023)+(15.011), (I-052)+(3.023)+(15.012), (I-052)+(3.023)+(15.016), (I-052)+(3.023)+(15.025), (I-052)+(3.023)+(15.027), (I-052)+(3.023)+(15.047), (I-052)+(3.023)+(15.063), (I-052)+(3.023)+(15.064), (I-052)+(3.023)+(16.001), (I-052)+(3.023)+(16.002), (I-052)+(3.023)+(16.003), (I-052)+(3.023)+(16.004), (I-052)+(3.023)+(16.005), (I-052)+(3.023)+(16.006), (I-052)+(3.023)+(16.007), (I-052)+(3.023)+(16.008), (I-052)+(3.023)+(17.001), (I-052)+(3.023)+(17.002), (I-052)+(3.023)+(17.003), (I-052)+(3.023)+(17.004), (I-052)+(3.023)+(17.005), (I-052)+(3.023)+(17.006), (I-052)+(3.023)+(17.007), (I-052)+(3.023)+(17.008), (I-052)+(3.023)+(17.009), (I-052)+(3.023)+(17.010), (I-052)+(3.023)+(17.011), (I-052)+(3.023)+(17.012), (I-052)+(3.023)+(18.001), (I-052)+(3.024)+(3.025), (I-052)+(3.024)+(3.030), (I-052)+(3.024)+(3.031), (I-052)+(3.024)+(5.001), (I-052)+(3.024)+(5.002), (I-052)+(3.024)+(5.003), (I-052)+(3.024)+(5.004), (I-052)+(3.024)+(5.005), (I-052)+(3.024)+(5.006), (I-052)+(3.024)+(5.007), (I-052)+(3.024)+(5.008), (I-052)+(3.024)+(5.009), (I-052)+(3.024)+(5.010), (I-052)+(3.024)+(5.011), (I-052)+(3.024)+(5.012), (I-052)+(3.024)+(5.013), (I-052)+(3.024)+(5.014), (I-052)+(3.024)+(5.015), (I-052)+(3.024)+(5.016), (I-052)+(3.024)+(5.017), (I-052)+(3.024)+(5.018), (I-052)+(3.024)+(5.019), (I-052)+(3.024)+(5.020), (I-052)+(3.024)+(5.021), (I-052)+(3.024)+(5.022), (I-052)+(3.024)+(5.023), (I-052)+(3.024)+(6.001), (I-052)+(3.024)+(6.002), (I-052)+(3.024)+(6.003), (I-052)+(3.024)+(6.004), (I-052)+(3.024)+(7.001), (I-052)+(3.024)+(7.002), (I-052)+(3.024)+(7.003), (I-052)+(3.024)+(7.004), (I-052)+(3.024)+(7.005), (I-052)+(3.024)+(7.006), (I-052)+(3.024)+(9.001), (I-052)+(3.024)+(9.002), (I-052)+(3.024)+(9.003), (I-052)+(3.024)+(9.004), (I-052)+(3.024)+(9.005), (I-052)+(3.024)+(9.006), (I-052)+(3.024)+(9.007), (I-052)+(3.024)+(9.008), (I-052)+(3.024)+(9.009), (I-052)+(3.024)+(14.001), (I-052)+(3.024)+(14.002), (I-052)+(3.024)+(15.008), (I-052)+(3.024)+(15.011), (I-052)+(3.024)+(15.012), (I-052)+(3.024)+(15.016), (I-052)+(3.024)+(15.025), (I-052)+(3.024)+(15.027), (I-052)+(3.024)+(15.047), (I-052)+(3.024)+(15.063), (I-052)+(3.024)+(15.064), (I-052)+(3.024)+(16.001), (I-052)+(3.024)+(16.002), (I-052)+(3.024)+(16.003), (I-052)+(3.024)+(16.004), (I-052)+(3.024)+(16.005), (I-052)+(3.024)+(16.006), (I-052)+(3.024)+(16.007), (I-052)+(3.024)+(16.008), (I-052)+(3.024)+(17.001), (I-052)+(3.024)+(17.002), (I-052)+(3.024)+(17.003), (I-052)+(3.024)+(17.004), (I-052)+(3.024)+(17.005), (I-052)+(3.024)+(17.006), (I-052)+(3.024)+(17.007), (I-052)+(3.024)+(17.008), (I-052)+(3.024)+(17.009), (I-052)+(3.024)+(17.010), (I-052)+(3.024)+(17.011), (I-052)+(3.024)+(17.012), (I-052)+(3.024)+(18.001), (I-052)+(3.025)+(3.030), (I-052)+(3.025)+(3.031), (I-052)+(3.025)+(5.001), (I-052)+(3.025)+(5.002), (I-052)+(3.025)+(5.003), (I-052)+(3.025)+(5.004), (I-052)+(3.025)+(5.005), (I-052)+(3.025)+(5.006), (I-052)+(3.025)+(5.007), (I-052)+(3.025)+(5.008), (I-052)+(3.025)+(5.009), (I-052)+(3.025)+(5.010), (I-052)+(3.025)+(5.011), (I-052)+(3.025)+(5.012), (I-052)+(3.025)+(5.013), (I-052)+(3.025)+(5.014), (I-052)+(3.025)+(5.015), (I-052)+(3.025)+(5.016), (I-052)+(3.025)+(5.017), (I-052)+(3.025)+(5.018), (I-052)+(3.025)+(5.019), (I-052)+(3.025)+(5.020), (I-052)+(3.025)+(5.021), (I-052)+(3.025)+(5.022), (I-052)+(3.025)+(5.023), (I-052)+(3.025)+(6.001), (I-052)+(3.025)+(6.002), (I-052)+(3.025)+(6.003), (I-052)+(3.025)+(6.004), (I-052)+(3.025)+(7.001), (I-052)+(3.025)+(7.002), (I-052)+(3.025)+(7.003), (I-052)+(3.025)+(7.004), (I-052)+(3.025)+(7.005), (I-052)+(3.025)+(7.006), (I-052)+(3.025)+(9.001), (I-052)+(3.025)+(9.002), (I-052)+(3.025)+(9.003), (I-052)+(3.025)+(9.004), (I-052)+(3.025)+(9.005), (I-052)+(3.025)+(9.006), (I-052)+(3.025)+(9.007), (I-052)+(3.025)+(9.008), (I-052)+(3.025)+(9.009), (I-052)+(3.025)+(14.001), (I-052)+(3.025)+(14.002), (I-052)+(3.025)+(15.008), (I-052)+(3.025)+(15.011), (I-052)+(3.025)+(15.012), (I-052)+(3.025)+(15.016), (I-052)+(3.025)+(15.025), (I-052)+(3.025)+(15.027), (I-052)+(3.025)+(15.047), (I-052)+(3.025)+(15.063), (I-052)+(3.025)+(15.064), (I-052)+(3.025)+(16.001), (I-052)+(3.025)+(16.002), (I-052)+(3.025)+(16.003), (I-052)+(3.025)+(16.004), (I-052)+(3.025)+(16.005), (I-052)+(3.025)+(16.006), (I-052)+(3.025)+(16.007), (I-052)+(3.025)+(16.008), (I-052)+(3.025)+(17.001), (I-052)+(3.025)+(17.002), (I-052)+(3.025)+(17.003), (I-052)+(3.025)+(17.004), (I-052)+(3.025)+(17.005), (I-052)+(3.025)+(17.006), (I-052)+(3.025)+(17.007), (I-052)+(3.025)+(17.008), (I-052)+(3.025)+(17.009), (I-052)+(3.025)+(17.010), (I-052)+(3.025)+(17.011), (I-052)+(3.025)+(17.012), (I-052)+(3.025)+(18.001), (I-052)+(3.026)+(3.025), (I-052)+(3.026)+(3.030), (I-052)+(3.026)+(3.031), (I-052)+(3.026)+(5.001), (I-052)+(3.026)+(5.002), (I-052)+(3.026)+(5.003), (I-052)+(3.026)+(5.004), (I-052)+(3.026)+(5.005), (I-052)+(3.026)+(5.006), (I-052)+(3.026)+(5.007), (I-052)+(3.026)+(5.008), (I-052)+(3.026)+(5.009), (I-052)+(3.026)+(5.010), (I-052)+(3.026)+(5.011), (I-052)+(3.026)+(5.012), (I-052)+(3.026)+(5.013), (I-052)+(3.026)+(5.014), (I-052)+(3.026)+(5.015), (I-052)+(3.026)+(5.016), (I-052)+(3.026)+(5.017), (I-052)+(3.026)+(5.018), (I-052)+(3.026)+(5.019), (I-052)+(3.026)+(5.020), (I-052)+(3.026)+(5.021), (I-052)+(3.026)+(5.022), (I-052)+(3.026)+(5.023), (I-052)+(3.026)+(6.001), (I-052)+(3.026)+(6.002), (I-052)+(3.026)+(6.003), (I-052)+(3.026)+(6.004), (I-052)+(3.026)+(7.001), (I-052)+(3.026)+(7.002), (I-052)+(3.026)+(7.003), (I-052)+(3.026)+(7.004), (I-052)+(3.026)+(7.005), (I-052)+(3.026)+(7.006), (I-052)+(3.026)+(9.001), (I-052)+(3.026)+(9.002), (I-052)+(3.026)+(9.003), (I-052)+(3.026)+(9.004), (I-052)+(3.026)+(9.005), (I-052)+(3.026)+(9.006), (I-052)+(3.026)+(9.007), (I-052)+(3.026)+(9.008), (I-052)+(3.026)+(9.009), (I-052)+(3.026)+(14.001), (I-052)+(3.026)+(14.002), (I-052)+(3.026)+(15.008), (I-052)+(3.026)+(15.011), (I-052)+(3.026)+(15.012), (I-052)+(3.026)+(15.016), (I-052)+(3.026)+(15.025), (I-052)+(3.026)+(15.027), (I-052)+(3.026)+(15.047), (I-052)+(3.026)+(15.063), (I-052)+(3.026)+(15.064), (I-052)+(3.026)+(16.001), (I-052)+(3.026)+(16.002), (I-052)+(3.026)+(16.003), (I-052)+(3.026)+(16.004), (I-052)+(3.026)+(16.005), (I-052)+(3.026)+(16.006), (I-052)+(3.026)+(16.007), (I-052)+(3.026)+(16.008), (I-052)+(3.026)+(17.001), (I-052)+(3.026)+(17.002), (I-052)+(3.026)+(17.003), (I-052)+(3.026)+(17.004), (I-052)+(3.026)+(17.005), (I-052)+(3.026)+(17.006), (I-052)+(3.026)+(17.007), (I-052)+(3.026)+(17.008), (I-052)+(3.026)+(17.009), (I-052)+(3.026)+(17.010), (I-052)+(3.026)+(17.011), (I-052)+(3.026)+(17.012), (I-052)+(3.026)+(18.001), (I-052)+(3.027)+(3.025), (I-052)+(3.027)+(3.030), (I-052)+(3.027)+(3.031), (I-052)+(3.027)+(5.001), (I-052)+(3.027)+(5.002), (I-052)+(3.027)+(5.003), (I-052)+(3.027)+(5.004), (I-052)+(3.027)+(5.005), (I-052)+(3.027)+(5.006), (I-052)+(3.027)+(5.007), (I-052)+(3.027)+(5.008), (I-052)+(3.027)+(5.009), (I-052)+(3.027)+(5.010), (I-052)+(3.027)+(5.011), (I-052)+(3.027)+(5.012), (I-052)+(3.027)+(5.013), (I-052)+(3.027)+(5.014), (I-052)+(3.027)+(5.015), (I-052)+(3.027)+(5.016), (I-052)+(3.027)+(5.017), (I-052)+(3.027)+(5.018), (I-052)+(3.027)+(5.019), (I-052)+(3.027)+(5.020), (I-052)+(3.027)+(5.021), (I-052)+(3.027)+(5.022), (I-052)+(3.027)+(5.023), (I-052)+(3.027)+(6.001), (I-052)+(3.027)+(6.002), (I-052)+(3.027)+(6.003), (I-052)+(3.027)+(6.004), (I-052)+(3.027)+(7.001), (I-052)+(3.027)+(7.002), (I-052)+(3.027)+(7.003), (I-052)+(3.027)+(7.004), (I-052)+(3.027)+(7.005), (I-052)+(3.027)+(7.006), (I-052)+(3.027)+(9.001), (I-052)+(3.027)+(9.002), (I-052)+(3.027)+(9.003), (I-052)+(3.027)+(9.004), (I-052)+(3.027)+(9.005), (I-052)+(3.027)+(9.006), (I-052)+(3.027)+(9.007), (I-052)+(3.027)+(9.008), (I-052)+(3.027)+(9.009), (I-052)+(3.027)+(14.001), (I-052)+(3.027)+(14.002), (I-052)+(3.027)+(15.008), (I-052)+(3.027)+(15.011), (I-052)+(3.027)+(15.012), (I-052)+(3.027)+(15.016), (I-052)+(3.027)+(15.025), (I-052)+(3.027)+(15.027), (I-052)+(3.027)+(15.047), (I-052)+(3.027)+(15.063), (I-052)+(3.027)+(15.064), (I-052)+(3.027)+(16.001), (I-052)+(3.027)+(16.002), (I-052)+(3.027)+(16.003), (I-052)+(3.027)+(16.004), (I-052)+(3.027)+(16.005), (I-052)+(3.027)+(16.006), (I-052)+(3.027)+(16.007), (I-052)+(3.027)+(16.008), (I-052)+(3.027)+(17.001), (I-052)+(3.027)+(17.002), (I-052)+(3.027)+(17.003), (I-052)+(3.027)+(17.004), (I-052)+(3.027)+(17.005), (I-052)+(3.027)+(17.006), (I-052)+(3.027)+(17.007), (I-052)+(3.027)+(17.008), (I-052)+(3.027)+(17.009), (I-052)+(3.027)+(17.010), (I-052)+(3.027)+(17.011), (I-052)+(3.027)+(17.012), (I-052)+(3.027)+(18.001), (I-052)+(3.028)+(3.025), (I-052)+(3.028)+(3.030), (I-052)+(3.028)+(3.031), (I-052)+(3.028)+(5.001), (I-052)+(3.028)+(5.002), (I-052)+(3.028)+(5.003), (I-052)+(3.028)+(5.004), (I-052)+(3.028)+(5.005), (I-052)+(3.028)+(5.006), (I-052)+(3.028)+(5.007), (I-052)+(3.028)+(5.008), (I-052)+(3.028)+(5.009), (I-052)+(3.028)+(5.010), (I-052)+(3.028)+(5.011), (I-052)+(3.028)+(5.012), (I-052)+(3.028)+(5.013), (I-052)+(3.028)+(5.014), (I-052)+(3.028)+(5.015), (I-052)+(3.028)+(5.016), (I-052)+(3.028)+(5.017), (I-052)+(3.028)+(5.018), (I-052)+(3.028)+(5.019), (I-052)+(3.028)+(5.020), (I-052)+(3.028)+(5.021), (I-052)+(3.028)+(5.022), (I-052)+(3.028)+(5.023), (I-052)+(3.028)+(6.001), (I-052)+(3.028)+(6.002), (I-052)+(3.028)+(6.003), (I-052)+(3.028)+(6.004), (I-052)+(3.028)+(7.001), (I-052)+(3.028)+(7.002), (I-052)+(3.028)+(7.003), (I-052)+(3.028)+(7.004), (I-052)+(3.028)+(7.005), (I-052)+(3.028)+(7.006), (I-052)+(3.028)+(9.001), (I-052)+(3.028)+(9.002), (I-052)+(3.028)+(9.003), (I-052)+(3.028)+(9.004), (I-052)+(3.028)+(9.005), (I-052)+(3.028)+(9.006), (I-052)+(3.028)+(9.007), (I-052)+(3.028)+(9.008), (I-052)+(3.028)+(9.009), (I-052)+(3.028)+(14.001), (I-052)+(3.028)+(14.002), (I-052)+(3.028)+(15.008), (I-052)+(3.028)+(15.011), (I-052)+(3.028)+(15.012), (I-052)+(3.028)+(15.016), (I-052)+(3.028)+(15.025), (I-052)+(3.028)+(15.027), (I-052)+(3.028)+(15.047), (I-052)+(3.028)+(15.063), (I-052)+(3.028)+(15.064), (I-052)+(3.028)+(16.001), (I-052)+(3.028)+(16.002), (I-052)+(3.028)+(16.003), (I-052)+(3.028)+(16.004), (I-052)+(3.028)+(16.005), (I-052)+(3.028)+(16.006), (I-052)+(3.028)+(16.007), (I-052)+(3.028)+(16.008), (I-052)+(3.028)+(17.001), (I-052)+(3.028)+(17.002), (I-052)+(3.028)+(17.003), (I-052)+(3.028)+(17.004), (I-052)+(3.028)+(17.005), (I-052)+(3.028)+(17.006), (I-052)+(3.028)+(17.007), (I-052)+(3.028)+(17.008), (I-052)+(3.028)+(17.009), (I-052)+(3.028)+(17.010), (I-052)+(3.028)+(17.011), (I-052)+(3.028)+(17.012), (I-052)+(3.028)+(18.001), (I-052)+(3.029)+(3.025), (I-052)+(3.029)+(3.030), (I-052)+(3.029)+(3.031), (I-052)+(3.029)+(5.001), (I-052)+(3.029)+(5.002), (I-052)+(3.029)+(5.003), (I-052)+(3.029)+(5.004), (I-052)+(3.029)+(5.005), (I-052)+(3.029)+(5.006), (I-052)+(3.029)+(5.007), (I-052)+(3.029)+(5.008), (I-052)+(3.029)+(5.009), (I-052)+(3.029)+(5.010), (I-052)+(3.029)+(5.011), (I-052)+(3.029)+(5.012), (I-052)+(3.029)+(5.013), (I-052)+(3.029)+(5.014), (I-052)+(3.029)+(5.015), (I-052)+(3.029)+(5.016), (I-052)+(3.029)+(5.017), (I-052)+(3.029)+(5.018), (I-052)+(3.029)+(5.019), (I-052)+(3.029)+(5.020), (I-052)+(3.029)+(5.021), (I-052)+(3.029)+(5.022), (I-052)+(3.029)+(5.023), (I-052)+(3.029)+(6.001), (I-052)+(3.029)+(6.002), (I-052)+(3.029)+(6.003), (I-052)+(3.029)+(6.004), (I-052)+(3.029)+(7.001), (I-052)+(3.029)+(7.002), (I-052)+(3.029)+(7.003), (I-052)+(3.029)+(7.004), (I-052)+(3.029)+(7.005), (I-052)+(3.029)+(7.006), (I-052)+(3.029)+(9.001), (I-052)+(3.029)+(9.002), (I-052)+(3.029)+(9.003), (I-052)+(3.029)+(9.004), (I-052)+(3.029)+(9.005), (I-052)+(3.029)+(9.006), (I-052)+(3.029)+(9.007), (I-052)+(3.029)+(9.008), (I-052)+(3.029)+(9.009), (I-052)+(3.029)+(14.001), (I-052)+(3.029)+(14.002), (I-052)+(3.029)+(15.008), (I-052)+(3.029)+(15.011), (I-052)+(3.029)+(15.012), (I-052)+(3.029)+(15.016), (I-052)+(3.029)+(15.025), (I-052)+(3.029)+(15.027), (I-052)+(3.029)+(15.047), (I-052)+(3.029)+(15.063), (I-052)+(3.029)+(15.064), (I-052)+(3.029)+(16.001), (I-052)+(3.029)+(16.002), (I-052)+(3.029)+(16.003), (I-052)+(3.029)+(16.004), (I-052)+(3.029)+(16.005), (I-052)+(3.029)+(16.006), (I-052)+(3.029)+(16.007), (I-052)+(3.029)+(16.008), (I-052)+(3.029)+(17.001), (I-052)+(3.029)+(17.002), (I-052)+(3.029)+(17.003), (I-052)+(3.029)+(17.004), (I-052)+(3.029)+(17.005), (I-052)+(3.029)+(17.006), (I-052)+(3.029)+(17.007), (I-052)+(3.029)+(17.008), (I-052)+(3.029)+(17.009), (I-052)+(3.029)+(17.010), (I-052)+(3.029)+(17.011), (I-052)+(3.029)+(17.012), (I-052)+(3.029)+(18.001), (I-052)+(3.030)+(3.025), (I-052)+(3.030)+(3.031), (I-052)+(3.030)+(5.001), (I-052)+(3.030)+(5.002), (I-052)+(3.030)+(5.003), (I-052)+(3.030)+(5.004), (I-052)+(3.030)+(5.005), (I-052)+(3.030)+(5.006), (I-052)+(3.030)+(5.007), (I-052)+(3.030)+(5.008), (I-052)+(3.030)+(5.009), (I-052)+(3.030)+(5.010), (I-052)+(3.030)+(5.011), (I-052)+(3.030)+(5.012), (I-052)+(3.030)+(5.013), (I-052)+(3.030)+(5.014), (I-052)+(3.030)+(5.015), (I-052)+(3.030)+(5.016), (I-052)+(3.030)+(5.017), (I-052)+(3.030)+(5.018), (I-052)+(3.030)+(5.019), (I-052)+(3.030)+(5.020), (I-052)+(3.030)+(5.021), (I-052)+(3.030)+(5.022), (I-052)+(3.030)+(5.023), (I-052)+(3.030)+(6.001), (I-052)+(3.030)+(6.002), (I-052)+(3.030)+(6.003), (I-052)+(3.030)+(6.004), (I-052)+(3.030)+(7.001), (I-052)+(3.030)+(7.002), (I-052)+(3.030)+(7.003), (I-052)+(3.030)+(7.004), (I-052)+(3.030)+(7.005), (I-052)+(3.030)+(7.006), (I-052)+(3.030)+(9.001), (I-052)+(3.030)+(9.002), (I-052)+(3.030)+(9.003), (I-052)+(3.030)+(9.004), (I-052)+(3.030)+(9.005), (I-052)+(3.030)+(9.006), (I-052)+(3.030)+(9.007), (I-052)+(3.030)+(9.008), (I-052)+(3.030)+(9.009), (I-052)+(3.030)+(14.001), (I-052)+(3.030)+(14.002), (I-052)+(3.030)+(15.008), (I-052)+(3.030)+(15.011), (I-052)+(3.030)+(15.012), (I-052)+(3.030)+(15.016), (I-052)+(3.030)+(15.025), (I-052)+(3.030)+(15.027), (I-052)+(3.030)+(15.047), (I-052)+(3.030)+(15.063), (I-052)+(3.030)+(15.064), (I-052)+(3.030)+(16.001), (I-052)+(3.030)+(16.002), (I-052)+(3.030)+(16.003), (I-052)+(3.030)+(16.004), (I-052)+(3.030)+(16.005), (I-052)+(3.030)+(16.006), (I-052)+(3.030)+(16.007), (I-052)+(3.030)+(16.008), (I-052)+(3.030)+(17.001), (I-052)+(3.030)+(17.002), (I-052)+(3.030)+(17.003), (I-052)+(3.030)+(17.004), (I-052)+(3.030)+(17.005), (I-052)+(3.030)+(17.006), (I-052)+(3.030)+(17.007), (I-052)+(3.030)+(17.008), (I-052)+(3.030)+(17.009), (I-052)+(3.030)+(17.010), (I-052)+(3.030)+(17.011), (I-052)+(3.030)+(17.012), (I-052)+(3.030)+(18.001), (I-052)+(3.031)+(3.025), (I-052)+(3.031)+(3.030), (I-052)+(3.031)+(5.001), (I-052)+(3.031)+(5.002), (I-052)+(3.031)+(5.003), (I-052)+(3.031)+(5.004), (I-052)+(3.031)+(5.005), (I-052)+(3.031)+(5.006), (I-052)+(3.031)+(5.007), (I-052)+(3.031)+(5.008), (I-052)+(3.031)+(5.009), (I-052)+(3.031)+(5.010), (I-052)+(3.031)+(5.011), (I-052)+(3.031)+(5.012), (I-052)+(3.031)+(5.013), (I-052)+(3.031)+(5.014), (I-052)+(3.031)+(5.015), (I-052)+(3.031)+(5.016), (I-052)+(3.031)+(5.017), (I-052)+(3.031)+(5.018), (I-052)+(3.031)+(5.019), (I-052)+(3.031)+(5.020), (I-052)+(3.031)+(5.021), (I-052)+(3.031)+(5.022), (I-052)+(3.031)+(5.023), (I-052)+(3.031)+(6.001), (I-052)+(3.031)+(6.002), (I-052)+(3.031)+(6.003), (I-052)+(3.031)+(6.004), (I-052)+(3.031)+(7.001), (I-052)+(3.031)+(7.002), (I-052)+(3.031)+(7.003), (I-052)+(3.031)+(7.004), (I-052)+(3.031)+(7.005), (I-052)+(3.031)+(7.006), (I-052)+(3.031)+(9.001), (I-052)+(3.031)+(9.002), (I-052)+(3.031)+(9.003), (I-052)+(3.031)+(9.004), (I-052)+(3.031)+(9.005), (I-052)+(3.031)+(9.006), (I-052)+(3.031)+(9.007), (I-052)+(3.031)+(9.008), (I-052)+(3.031)+(9.009), (I-052)+(3.031)+(14.001), (I-052)+(3.031)+(14.002), (I-052)+(3.031)+(15.008), (I-052)+(3.031)+(15.011), (I-052)+(3.031)+(15.012), (I-052)+(3.031)+(15.016), (I-052)+(3.031)+(15.025), (I-052)+(3.031)+(15.027), (I-052)+(3.031)+(15.047), (I-052)+(3.031)+(15.063), (I-052)+(3.031)+(15.064), (I-052)+(3.031)+(16.001), (I-052)+(3.031)+(16.002), (I-052)+(3.031)+(16.003), (I-052)+(3.031)+(16.004), (I-052)+(3.031)+(16.005), (I-052)+(3.031)+(16.006), (I-052)+(3.031)+(16.007), (I-052)+(3.031)+(16.008), (I-052)+(3.031)+(17.001), (I-052)+(3.031)+(17.002), (I-052)+(3.031)+(17.003), (I-052)+(3.031)+(17.004), (I-052)+(3.031)+(17.005), (I-052)+(3.031)+(17.006), (I-052)+(3.031)+(17.007), (I-052)+(3.031)+(17.008), (I-052)+(3.031)+(17.009), (I-052)+(3.031)+(17.010), (I-052)+(3.031)+(17.011), (I-052)+(3.031)+(17.012), (I-052)+(3.031)+(18.001), (I-052)+(5.001)+(9.001), (I-052)+(5.001)+(9.002), (I-052)+(5.001)+(9.003), (I-052)+(5.001)+(9.004), (I-052)+(5.001)+(9.005), (I-052)+(5.001)+(9.006), (1-052)+(5.001)+(9.007), (I-052)+(5.001)+(9.008), (I-052)+(5.001)+(9.009), (I-052)+(5.001)+(15.012), (I-052)+(5.001)+(15.016), (I-052)+(5.001)+(15.025), (I-052)+(5.001)+(15.027), (I-052)+(5.001)+(15.047), (I-052)+(5.001)+(15.063), (I-052)+(5.001)+(15.064), (I-052)+(5.002)+(9.001), (I-052)+(5.002)+(9.002), (I-052)+(5.002)+(9.003), (I-052)+(5.002)+(9.004), (I-052)+(5.002)+(9.005), (I-052)+(5.002)+(9.006), (I-052)+(5.002)+(9.007), (I-052)+(5.002)+(9.008), (I-052)+(5.002)+(9.009), (I-052)+(5.002)+(15.012), (I-052)+(5.002)+(15.016), (I-052)+(5.002)+(15.025), (I-052)+(5.002)+(15.027), (I-052)+(5.002)+(15.047), (I-052)+(5.002)+(15.063), (I-052)+(5.002)+(15.064), (I-052)+(5.003)+(9.001), (I-052)+(5.003)+(9.002), (I-052)+(5.003)+(9.003), (I-052)+(5.003)+(9.004), (I-052)+(5.003)+(9.005), (I-052)+(5.003)+(9.006), (I-052)+(5.003)+(9.007), (I-052)+(5.003)+(9.008), (I-052)+(5.003)+(9.009), (I-052)+(5.003)+(15.012), (I-052)+(5.003)+(15.016), (I-052)+(5.003)+(15.025), (I-052)+(5.003)+(15.027), (I-052)+(5.003)+(15.047), (I-052)+(5.003)+(15.063), (I-052)+(5.003)+(15.064), (I-052)+(5.004)+(9.001), (I-052)+(5.004)+(9.002), (I-052)+(5.004)+(9.003), (I-052)+(5.004)+(9.004), (I-052)+(5.004)+(9.005), (I-052)+(5.004)+(9.006), (I-052)+(5.004)+(9.007), (I-052)+(5.004)+(9.008), (I-052)+(5.004)+(9.009), (I-052)+(5.004)+(15.012), (I-052)+(5.004)+(15.016), (I-052)+(5.004)+(15.025), (I-052)+(5.004)+(15.027), (I-052)+(5.004)+(15.047), (I-052)+(5.004)+(15.063), (I-052)+(5.004)+(15.064), (I-052)+(5.005)+(9.001), (I-052)+(5.005)+(9.002), (I-052)+(5.005)+(9.003), (I-052)+(5.005)+(9.004), (I-052)+(5.005)+(9.005), (I-052)+(5.005)+(9.006), (I-052)+(5.005)+(9.007), (I-052)+(5.005)+(9.008), (I-052)+(5.005)+(9.009), (I-052)+(5.005)+(15.012), (I-052)+(5.005)+(15.016), (I-052)+(5.005)+(15.025), (I-052)+(5.005)+(15.027), (I-052)+(5.005)+(15.047), (I-052)+(5.005)+(15.063), (I-052)+(5.005)+(15.064), (I-052)+(5.006)+(9.001), (I-052)+(5.006)+(9.002), (I-052)+(5.006)+(9.003), (I-052)+(5.006)+(9.004), (I-052)+(5.006)+(9.005), (I-052)+(5.006)+(9.006), (I-052)+(5.006)+(9.007), (I-052)+(5.006)+(9.008), (I-052)+(5.006)+(9.009), (I-052)+(5.006)+(15.012), (I-052)+(5.006)+(15.016), (I-052)+(5.006)+(15.025), (I-052)+(5.006)+(15.027), (I-052)+(5.006)+(15.047), (I-052)+(5.006)+(15.063), (I-052)+(5.006)+(15.064), (I-052)+(5.007)+(9.001), (I-052)+(5.007)+(9.002), (I-052)+(5.007)+(9.003), (I-052)+(5.007)+(9.004), (I-052)+(5.007)+(9.005), (I-052)+(5.007)+(9.006), (I-052)+(5.007)+(9.007), (I-052)+(5.007)+(9.008), (I-052)+(5.007)+(9.009), (I-052)+(5.007)+(15.012), (I-052)+(5.007)+(15.016), (I-052)+(5.007)+(15.025), (I-052)+(5.007)+(15.027), (I-052)+(5.007)+(15.047), (I-052)+(5.007)+(15.063), (I-052)+(5.007)+(15.064), (I-052)+(5.008)+(9.001), (I-052)+(5.008)+(9.002), (I-052)+(5.008)+(9.003), (I-052)+(5.008)+(9.004), (I-052)+(5.008)+(9.005), (I-052)+(5.008)+(9.006), (I-052)+(5.008)+(9.007), (I-052)+(5.008)+(9.008), (I-052)+(5.008)+(9.009), (I-052)+(5.008)+(15.012), (I-052)+(5.008)+(15.016), (I-052)+(5.008)+(15.025), (I-052)+(5.008)+(15.027), (I-052)+(5.008)+(15.047), (I-052)+(5.008)+(15.063), (I-052)+(5.008)+(15.064), (I-052)+(5.009)+(9.001), (I-052)+(5.009)+(9.002), (I-052)+(5.009)+(9.003), (I-052)+(5.009)+(9.004), (I-052)+(5.009)+(9.005), (I-052)+(5.009)+(9.006), (I-052)+(5.009)+(9.007), (I-052)+(5.009)+(9.008), (I-052)+(5.009)+(9.009), (I-052)+(5.009)+(15.012), (I-052)+(5.009)+(15.016), (I-052)+(5.009)+(15.025), (I-052)+(5.009)+(15.027), (I-052)+(5.009)+(15.047), (I-052)+(5.009)+(15.063), (I-052)+(5.009)+(15.064), (I-052)+(5.010)+(9.001), (I-052)+(5.010)+(9.002), (I-052)+(5.010)+(9.003), (I-052)+(5.010)+(9.004), (I-052)+(5.010)+(9.005), (I-052)+(5.010)+(9.006), (I-052)+(5.010)+(9.007), (I-052)+(5.010)+(9.008), (I-052)+(5.010)+(9.009), (I-052)+(5.010)+(15.012), (I-052)+(5.010)+(15.016), (I-052)+(5.010)+(15.025), (I-052)+(5.010)+(15.027), (I-052)+(5.010)+(15.047), (I-052)+(5.010)+(15.063), (I-052)+(5.010)+(15.064), (I-052)+(5.011)+(9.001), (I-052)+(5.011)+(9.002), (I-052)+(5.011)+(9.003), (I-052)+(5.011)+(9.004), (I-052)+(5.011)+(9.005), (I-052)+(5.011)+(9.006), (I-052)+(5.011)+(9.007), (I-052)+(5.011)+(9.008), (I-052)+(5.011)+(9.009), (I-052)+(5.011)+(15.012), (I-052)+(5.011)+(15.016), (I-052)+(5.011)+(15.025), (I-052)+(5.011)+(15.027), (I-052)+(5.011)+(15.047), (I-052)+(5.011)+(15.063), (I-052)+(5.011)+(15.064), (I-052)+(5.012)+(9.001), (I-052)+(5.012)+(9.002), (I-052)+(5.012)+(9.003), (I-052)+(5.012)+(9.004), (I-052)+(5.012)+(9.005), (I-052)+(5.012)+(9.006), (I-052)+(5.012)+(9.007), (I-052)+(5.012)+(9.008), (I-052)+(5.012)+(9.009), (I-052)+(5.012)+(15.012), (I-052)+(5.012)+(15.016), (I-052)+(5.012)+(15.025), (I-052)+(5.012)+(15.027), (I-052)+(5.012)+(15.047), (I-052)+(5.012)+(15.063), (I-052)+(5.012)+(15.064), (I-052)+(5.013)+(9.001), (I-052)+(5.013)+(9.002), (I-052)+(5.013)+(9.003), (I-052)+(5.013)+(9.004), (I-052)+(5.013)+(9.005), (I-052)+(5.013)+(9.006), (I-052)+(5.013)+(9.007), (I-052)+(5.013)+(9.008), (I-052)+(5.013)+(9.009), (I-052)+(5.013)+(15.012), (I-052)+(5.013)+(15.016), (I-052)+(5.013)+(15.025), (I-052)+(5.013)+(15.027), (I-052)+(5.013)+(15.047), (I-052)+(5.013)+(15.063), (I-052)+(5.013)+(15.064), (I-052)+(5.014)+(9.001), (I-052)+(5.014)+(9.002), (I-052)+(5.014)+(9.003), (I-052)+(5.014)+(9.004), (I-052)+(5.014)+(9.005), (I-052)+(5.014)+(9.006), (I-052)+(5.014)+(9.007), (I-052)+(5.014)+(9.008), (I-052)+(5.014)+(9.009), (I-052)+(5.014)+(15.012), (I-052)+(5.014)+(15.016), (I-052)+(5.014)+(15.025), (I-052)+(5.014)+(15.027), (I-052)+(5.014)+(15.047), (I-052)+(5.014)+(15.063), (I-052)+(5.014)+(15.064), (I-052)+(5.015)+(9.001), (I-052)+(5.015)+(9.002), (I-052)+(5.015)+(9.003), (I-052)+(5.015)+(9.004), (I-052)+(5.015)+(9.005), (I-052)+(5.015)+(9.006), (I-052)+(5.015)+(9.007), (I-052)+(5.015)+(9.008), (I-052)+(5.015)+(9.009), (I-052)+(5.015)+(15.012), (I-052)+(5.015)+(15.016), (I-052)+(5.015)+(15.025), (I-052)+(5.015)+(15.027), (I-052)+(5.015)+(15.047), (I-052)+(5.015)+(15.063), (I-052)+(5.015)+(15.064), (I-052)+(5.016)+(9.001), (I-052)+(5.016)+(9.002), (I-052)+(5.016)+(9.003), (I-052)+(5.016)+(9.004), (I-052)+(5.016)+(9.005), (I-052)+(5.016)+(9.006), (I-052)+(5.016)+(9.007), (I-052)+(5.016)+(9.008), (I-052)+(5.016)+(9.009), (I-052)+(5.016)+(15.012), (I-052)+(5.016)+(15.016), (I-052)+(5.016)+(15.025), (I-052)+(5.016)+(15.027), (I-052)+(5.016)+(15.047), (I-052)+(5.016)+(15.063), (I-052)+(5.016)+(15.064), (I-052)+(5.017)+(9.001), (I-052)+(5.017)+(9.002), (I-052)+(5.017)+(9.003), (I-052)+(5.017)+(9.004), (I-052)+(5.017)+(9.005), (I-052)+(5.017)+(9.006), (I-052)+(5.017)+(9.007), (I-052)+(5.017)+(9.008), (I-052)+(5.017)+(9.009), (I-052)+(5.017)+(15.012), (I-052)+(5.017)+(15.016), (I-052)+(5.017)+(15.025), (I-052)+(5.017)+(15.027), (I-052)+(5.017)+(15.047), (I-052)+(5.017)+(15.063), (I-052)+(5.017)+(15.064), (I-052)+(5.018)+(9.001), (I-052)+(5.018)+(9.002), (I-052)+(5.018)+(9.003), (I-052)+(5.018)+(9.004), (I-052)+(5.018)+(9.005), (I-052)+(5.018)+(9.006), (I-052)+(5.018)+(9.007), (I-052)+(5.018)+(9.008), (I-052)+(5.018)+(9.009), (I-052)+(5.018)+(15.012), (I-052)+(5.018)+(15.016), (I-052)+(5.018)+(15.025), (I-052)+(5.018)+(15.027), (I-052)+(5.018)+(15.047), (I-052)+(5.018)+(15.063), (I-052)+(5.018)+(15.064), (I-052)+(5.019)+(9.001), (I-052)+(5.019)+(9.002), (I-052)+(5.019)+(9.003), (I-052)+(5.019)+(9.004), (I-052)+(5.019)+(9.005), (I-052)+(5.019)+(9.006), (I-052)+(5.019)+(9.007), (I-052)+(5.019)+(9.008), (I-052)+(5.019)+(9.009), (I-052)+(5.019)+(15.012), (I-052)+(5.019)+(15.016), (I-052)+(5.019)+(15.025), (I-052)+(5.019)+(15.027), (I-052)+(5.019)+(15.047), (I-052)+(5.019)+(15.063), (I-052)+(5.019)+(15.064), (I-052)+(5.020)+(9.001), (I-052)+(5.020)+(9.002), (I-052)+(5.020)+(9.003), (I-052)+(5.020)+(9.004), (I-052)+(5.020)+(9.005), (I-052)+(5.020)+(9.006), (I-052)+(5.020)+(9.007), (I-052)+(5.020)+(9.008), (I-052)+(5.020)+(9.009), (I-052)+(5.020)+(15.012), (I-052)+(5.020)+(15.016), (I-052)+(5.020)+(15.025), (I-052)+(5.020)+(15.027), (I-052)+(5.020)+(15.047), (I-052)+(5.020)+(15.063), (I-052)+(5.020)+(15.064), (I-052)+(5.021)+(9.001), (I-052)+(5.021)+(9.002), (I-052)+(5.021)+(9.003), (I-052)+(5.021)+(9.004), (I-052)+(5.021)+(9.005), (I-052)+(5.021)+(9.006), (I-052)+(5.021)+(9.007), (I-052)+(5.021)+(9.008), (I-052)+(5.021)+(9.009), (I-052)+(5.021)+(15.012), (I-052)+(5.021)+(15.016), (I-052)+(5.021)+(15.025), (I-052)+(5.021)+(15.027), (I-052)+(5.021)+(15.047), (I-052)+(5.021)+(15.063), (I-052)+(5.021)+(15.064), (I-052)+(5.022)+(9.001), (I-052)+(5.022)+(9.002), (I-052)+(5.022)+(9.003), (I-052)+(5.022)+(9.004), (I-052)+(5.022)+(9.005), (I-052)+(5.022)+(9.006), (I-052)+(5.022)+(9.007), (I-052)+(5.022)+(9.008), (I-052)+(5.022)+(9.009), (I-052)+(5.022)+(15.012), (I-052)+(5.022)+(15.016), (I-052)+(5.022)+(15.025), (I-052)+(5.022)+(15.027), (I-052)+(5.022)+(15.047), (I-052)+(5.022)+(15.063), (I-052)+(5.022)+(15.064), (I-052)+(5.023)+(9.001), (I-052)+(5.023)+(9.002), (I-052)+(5.023)+(9.003), (I-052)+(5.023)+(9.004), (I-052)+(5.023)+(9.005), (I-052)+(5.023)+(9.006), (I-052)+(5.023)+(9.007), (I-052)+(5.023)+(9.008), (I-052)+(5.023)+(9.009), (I-052)+(5.023)+(15.012), (I-052)+(5.023)+(15.016), (I-052)+(5.023)+(15.025), (I-052)+(5.023)+(15.027), (I-052)+(5.023)+(15.047), (I-052)+(5.023)+(15.063), (I-052)+(5.023)+(15.064).

If two compounds (B) are present in the combinations according to the invention, preferred compound combinations are also selected from the group (G2-C) consisting of the following mixtures:

(I-130)+(1.001)+(1.002), (I-130)+(1.001)+(1.003), (I-130)+(1.001)+(1.004), (I-130)+(1.001)+(1.005), (I-130)+(1.001)+(1.006), (I-130)+(1.001)+(1.007), (I-130)+(1.001)+(1.008), (I-130)+(1.001)+(1.009), (I-130)+(1.001)+(1.010), (I-130)+(1.001)+(1.011), (I-130)+(1.001)+(1.012), (I-130)+(1.001)+(1.013), (I-130)+(1.001)+(1.014), (I-130)+(1.001)+(1.015), (I-130)+(1.001)+(1.016), (I-130)+(1.001)+(1.017), (I-130)+(1.001)+(1.018), (I-130)+(1.001)+(1.019), (I-130)+(1.001)+(1.020), (I-130)+(1.001)+(1.021), (I-130)+(1.001)+(1.022), (I-130)+(1.001)+(1.023), (I-130)+(1.001)+(1.024), (I-130)+(1.001)+(1.025), (I-130)+(1.001)+(1.026), (I-130)+(1.001)+(1.027), (I-130)+(1.001)+(1.028), (I-130)+(1.001)+(1.029), (I-130)+(1.001)+(1.030), (I-130)+(1.001)+(1.031), (I-130)+(1.001)+(1.032), (I-130)+(1.001)+(1.033), (I-130)+(1.001)+(1.034), (I-130)+(1.001)+(1.035), (I-130)+(1.001)+(1.036), (I-130)+(1.001)+(1.037), (I-130)+(1.001)+(1.038), (I-130)+(1.001)+(1.039), (I-130)+(1.001)+(1.040), (I-130)+(1.001)+(1.041), (I-130)+(1.001)+(1.042), (I-130)+(1.001)+(1.043), (I-130)+(1.001)+(1.044), (I-130)+(1.001)+(1.045), (I-130)+(1.001)+(1.046), (I-130)+(1.001)+(1.047), (I-130)+(1.001)+(1.048), (I-130)+(1.001)+(1.049), (I-130)+(1.001)+(1.050), (I-130)+(1.001)+(1.051), (I-130)+(1.001)+(1.052), (I-130)+(1.001)+(1.053), (I-130)+(1.001)+(1.054), (I-130)+(1.001)+(1.055), (I-130)+(1.001)+(1.056), (I-130)+(1.001)+(1.057), (I-130)+(1.001)+(1.058), (I-130)+(1.001)+(1.059), (I-130)+(1.001)+(1.060), (I-130)+(1.001)+(1.061), (I-130)+(1.001)+(1.062), (I-130)+(1.001)+(1.063), (I-130)+(1.001)+(1.064), (I-130)+(1.001)+(1.065), (I-130)+(1.001)+(1.066), (I-130)+(1.001)+(1.067), (I-130)+(1.001)+(1.068), (I-130)+(1.001)+(1.069), (I-130)+(1.001)+(1.070), (I-130)+(1.001)+(1.071), (I-130)+(1.001)+(1.072), (I-130)+(1.001)+(1.073), (I-130)+(1.001)+(1.074), (I-130)+(1.001)+(1.075), (I-130)+(1.001)+(1.076), (I-130)+(1.001)+(1.077), (I-130)+(1.001)+(1.078), (I-130)+(1.001)+(1.079), (I-130)+(1.001)+(1.080), (I-130)+(1.001)+(1.081), (I-130)+(1.001)+(1.082), (I-130)+(1.001)+(1.083), (I-130)+(1.001)+(1.084), (I-130)+(1.001)+(1.085), (I-130)+(1.001)+(1.086), (I-130)+(1.001)+(1.087), (I-130)+(1.001)+(1.088), (I-130)+(1.001)+(1.089), (I-130)+(1.001)+(1.090), (I-130)+(1.001)+(1.091), (I-130)+(1.001)+(1.092), (I-130)+(1.001)+(2.001), (I-130)+(1.001)+(2.002), (I-130)+(1.001)+(2.003), (I-130)+(1.001)+(2.004), (I-130)+(1.001)+(2.005), (I-130)+(1.001)+(2.006), (I-130)+(1.001)+(2.007), (I-130)+(1.001)+(2.008), (I-130)+(1.001)+(2.009), (I-130)+(1.001)+(2.010), (I-130)+(1.001)+(2.011), (I-130)+(1.001)+(2.012), (I-130)+(1.001)+(2.013), (I-130)+(1.001)+(2.014), (I-130)+(1.001)+(2.015), (I-130)+(1.001)+(2.016), (I-130)+(1.001)+(2.017), (I-130)+(1.001)+(2.018), (I-130)+(1.001)+(2.019), (I-130)+(1.001)+(2.020), (I-130)+(1.001)+(2.021), (I-130)+(1.001)+(2.022), (I-130)+(1.001)+(2.023), (I-130)+(1.001)+(2.024), (I-130)+(1.001)+(2.025), (I-130)+(1.001)+(2.026), (I-130)+(1.001)+(2.027), (I-130)+(1.001)+(2.028), (I-130)+(1.001)+(2.029), (I-130)+(1.001)+(2.030), (I-130)+(1.001)+(2.031), (I-130)+(1.001)+(2.032), (I-130)+(1.001)+(2.033), (I-130)+(1.001)+(2.034), (I-130)+(1.001)+(2.035), (I-130)+(1.001)+(2.036), (I-130)+(1.001)+(2.037), (I-130)+(1.001)+(2.038), (I-130)+(1.001)+(2.039), (I-130)+(1.001)+(2.040), (I-130)+(1.001)+(2.041), (I-130)+(1.001)+(2.042), (I-130)+(1.001)+(2.043), (I-130)+(1.001)+(2.044), (I-130)+(1.001)+(2.045), (I-130)+(1.001)+(2.046), (I-130)+(1.001)+(2.047), (I-130)+(1.001)+(2.048), (I-130)+(1.001)+(2.049), (I-130)+(1.001)+(2.050), (I-130)+(1.001)+(2.051), (I-130)+(1.001)+(2.052), (I-130)+(1.001)+(2.053), (I-130)+(1.001)+(2.054), (I-130)+(1.001)+(2.055), (I-130)+(1.001)+(2.056), (I-130)+(1.001)+(2.057), (I-130)+(1.001)+(2.058), (I-130)+(1.001)+(2.059), (I-130)+(1.001)+(3.001), (I-130)+(1.001)+(3.002), (I-130)+(1.001)+(3.003), (I-130)+(1.001)+(3.004), (I-130)+(1.001)+(3.005), (I-130)+(1.001)+(3.006), (I-130)+(1.001)+(3.007), (I-130)+(1.001)+(3.008), (I-130)+(1.001)+(3.009), (I-130)+(1.001)+(3.010), (I-130)+(1.001)+(3.011), (I-130)+(1.001)+(3.012), (I-130)+(1.001)+(3.013), (I-130)+(1.001)+(3.014), (I-130)+(1.001)+(3.015), (I-130)+(1.001)+(3.016), (I-130)+(1.001)+(3.017), (I-130)+(1.001)+(3.018), (I-130)+(1.001)+(3.019), (I-130)+(1.001)+(3.020), (I-130)+(1.001)+(3.021), (I-130)+(1.001)+(3.022), (I-130)+(1.001)+(3.023), (I-130)+(1.001)+(3.024), (I-130)+(1.001)+(3.025), (I-130)+(1.001)+(3.026), (I-130)+(1.001)+(3.027), (I-130)+(1.001)+(3.028), (I-130)+(1.001)+(3.029), (I-130)+(1.001)+(3.030), (I-130)+(1.001)+(3.031), (I-130)+(1.001)+(5.001), (I-130)+(1.001)+(5.002), (I-130)+(1.001)+(5.003), (I-130)+(1.001)+(5.004), (I-130)+(1.001)+(5.005), (I-130)+(1.001)+(5.006), (I-130)+(1.001)+(5.007), (I-130)+(1.001)+(5.008), (I-130)+(1.001)+(5.009), (I-130)+(1.001)+(5.010), (I-130)+(1.001)+(5.011), (I-130)+(1.001)+(5.012), (I-130)+(1.001)+(5.013), (I-130)+(1.001)+(5.014), (I-130)+(1.001)+(5.015), (I-130)+(1.001)+(5.016), (I-130)+(1.001)+(5.017), (I-130)+(1.001)+(5.018), (I-130)+(1.001)+(5.019), (I-130)+(1.001)+(5.020), (I-130)+(1.001)+(5.021), (I-130)+(1.001)+(5.022), (I-130)+(1.001)+(5.023), (I-130)+(1.001)+(6.001), (I-130)+(1.001)+(6.002), (I-130)+(1.001)+(6.003), (I-130)+(1.001)+(6.004), (I-130)+(1.001)+(7.001), (I-130)+(1.001)+(7.002), (I-130)+(1.001)+(7.003), (I-130)+(1.001)+(7.004), (I-130)+(1.001)+(7.005), (I-130)+(1.001)+(7.006), (I-130)+(1.001)+(9.001), (I-130)+(1.001)+(9.002), (I-130)+(1.001)+(9.003), (I-130)+(1.001)+(9.004), (I-130)+(1.001)+(9.005), (I-130)+(1.001)+(9.006), (I-130)+(1.001)+(9.007), (I-130)+(1.001)+(9.008), (I-130)+(1.001)+(9.009), (I-130)+(1.001)+(14.001), (I-130)+(1.001)+(14.002), (I-130)+(1.001)+(15.008), (I-130)+(1.001)+(15.011), (I-130)+(1.001)+(15.012), (I-130)+(1.001)+(15.016), (I-130)+(1.001)+(15.025), (I-130)+(1.001)+(15.027), (I-130)+(1.001)+(15.047), (I-130)+(1.001)+(15.063), (I-130)+(1.001)+(15.064), (I-130)+(1.001)+(16.001), (I-130)+(1.001)+(16.002), (I-130)+(1.001)+(16.003), (I-130)+(1.001)+(16.004), (I-130)+(1.001)+(16.005), (I-130)+(1.001)+(16.006), (I-130)+(1.001)+(16.007), (I-130)+(1.001)+(16.008), (I-130)+(1.001)+(17.001), (I-130)+(1.001)+(17.002), (I-130)+(1.001)+(17.003), (I-130)+(1.001)+(17.004), (I-130)+(1.001)+(17.005), (I-130)+(1.001)+(17.006), (I-130)+(1.001)+(17.007), (I-130)+(1.001)+(17.008), (I-130)+(1.001)+(17.009), (I-130)+(1.001)+(17.010), (I-130)+(1.001)+(17.011), (I-130)+(1.001)+(17.012), (I-130)+(1.001)+(18.001), (I-130)+(1.002)+(1.003), (I-130)+(1.002)+(1.004), (I-130)+(1.002)+(1.005), (I-130)+(1.002)+(1.006), (I-130)+(1.002)+(1.007), (I-130)+(1.002)+(1.008), (I-130)+(1.002)+(1.009), (I-130)+(1.002)+(1.010), (I-130)+(1.002)+(1.011), (I-130)+(1.002)+(1.012), (I-130)+(1.002)+(1.013), (I-130)+(1.002)+(1.014), (I-130)+(1.002)+(1.015), (I-130)+(1.002)+(1.016), (I-130)+(1.002)+(1.017), (I-130)+(1.002)+(1.018), (I-130)+(1.002)+(1.019), (I-130)+(1.002)+(1.020), (I-130)+(1.002)+(1.021), (I-130)+(1.002)+(1.022), (I-130)+(1.002)+(1.023), (I-130)+(1.002)+(1.024), (I-130)+(1.002)+(1.025), (I-130)+(1.002)+(1.026), (I-130)+(1.002)+(1.027), (I-130)+(1.002)+(1.028), (I-130)+(1.002)+(1.029), (I-130)+(1.002)+(1.030), (I-130)+(1.002)+(1.031), (I-130)+(1.002)+(1.032), (I-130)+(1.002)+(1.033), (I-130)+(1.002)+(1.034), (I-130)+(1.002)+(1.035), (I-130)+(1.002)+(1.036), (I-130)+(1.002)+(1.037), (I-130)+(1.002)+(1.038), (I-130)+(1.002)+(1.039), (I-130)+(1.002)+(1.040), (I-130)+(1.002)+(1.041), (I-130)+(1.002)+(1.042), (I-130)+(1.002)+(1.043), (I-130)+(1.002)+(1.044), (I-130)+(1.002)+(1.045), (I-130)+(1.002)+(1.046), (I-130)+(1.002)+(1.047), (I-130)+(1.002)+(1.048), (I-130)+(1.002)+(1.049), (I-130)+(1.002)+(1.050), (I-130)+(1.002)+(1.051), (I-130)+(1.002)+(1.052), (I-130)+(1.002)+(1.053), (I-130)+(1.002)+(1.054), (I-130)+(1.002)+(1.055), (I-130)+(1.002)+(1.056), (I-130)+(1.002)+(1.057), (I-130)+(1.002)+(1.058), (I-130)+(1.002)+(1.059), (I-130)+(1.002)+(1.060), (I-130)+(1.002)+(1.061), (I-130)+(1.002)+(1.062), (I-130)+(1.002)+(1.063), (I-130)+(1.002)+(1.064), (I-130)+(1.002)+(1.065), (I-130)+(1.002)+(1.066), (I-130)+(1.002)+(1.067), (I-130)+(1.002)+(1.068), (I-130)+(1.002)+(1.069), (I-130)+(1.002)+(1.070), (I-130)+(1.002)+(1.071), (I-130)+(1.002)+(1.072), (I-130)+(1.002)+(1.073), (I-130)+(1.002)+(1.074), (I-130)+(1.002)+(1.075), (I-130)+(1.002)+(1.076), (I-130)+(1.002)+(1.077), (I-130)+(1.002)+(1.078), (I-130)+(1.002)+(1.079), (I-130)+(1.002)+(1.080), (I-130)+(1.002)+(1.081), (I-130)+(1.002)+(1.082), (I-130)+(1.002)+(1.083), (I-130)+(1.002)+(1.084), (I-130)+(1.002)+(1.085), (I-130)+(1.002)+(1.086), (I-130)+(1.002)+(1.087), (I-130)+(1.002)+(1.088), (I-130)+(1.002)+(1.089), (I-130)+(1.002)+(1.090), (I-130)+(1.002)+(1.091), (I-130)+(1.002)+(1.092), (I-130)+(1.002)+(2.001), (I-130)+(1.002)+(2.002), (I-130)+(1.002)+(2.003), (I-130)+(1.002)+(2.004), (I-130)+(1.002)+(2.005), (I-130)+(1.002)+(2.006), (I-130)+(1.002)+(2.007), (I-130)+(1.002)+(2.008), (I-130)+(1.002)+(2.009), (I-130)+(1.002)+(2.010), (I-130)+(1.002)+(2.011), (I-130)+(1.002)+(2.012), (I-130)+(1.002)+(2.013), (I-130)+(1.002)+(2.014), (I-130)+(1.002)+(2.015), (I-130)+(1.002)+(2.016), (I-130)+(1.002)+(2.017), (I-130)+(1.002)+(2.018), (I-130)+(1.002)+(2.019), (I-130)+(1.002)+(2.020), (I-130)+(1.002)+(2.021), (I-130)+(1.002)+(2.022), (I-130)+(1.002)+(2.023), (I-130)+(1.002)+(2.024), (I-130)+(1.002)+(2.025), (I-130)+(1.002)+(2.026), (I-130)+(1.002)+(2.027), (I-130)+(1.002)+(2.028), (I-130)+(1.002)+(2.029), (I-130)+(1.002)+(2.030), (I-130)+(1.002)+(2.031), (I-130)+(1.002)+(2.032), (I-130)+(1.002)+(2.033), (I-130)+(1.002)+(2.034), (I-130)+(1.002)+(2.035), (I-130)+(1.002)+(2.036), (I-130)+(1.002)+(2.037), (I-130)+(1.002)+(2.038), (I-130)+(1.002)+(2.039), (I-130)+(1.002)+(2.040), (I-130)+(1.002)+(2.041), (I-130)+(1.002)+(2.042), (I-130)+(1.002)+(2.043), (I-130)+(1.002)+(2.044), (I-130)+(1.002)+(2.045), (I-130)+(1.002)+(2.046), (I-130)+(1.002)+(2.047), (I-130)+(1.002)+(2.048), (I-130)+(1.002)+(2.049), (I-130)+(1.002)+(2.050), (I-130)+(1.002)+(2.051), (I-130)+(1.002)+(2.052), (I-130)+(1.002)+(2.053), (I-130)+(1.002)+(2.054), (I-130)+(1.002)+(2.055), (I-130)+(1.002)+(2.056), (I-130)+(1.002)+(2.057), (I-130)+(1.002)+(2.058), (I-130)+(1.002)+(2.059), (I-130)+(1.002)+(3.001), (I-130)+(1.002)+(3.002), (I-130)+(1.002)+(3.003), (I-130)+(1.002)+(3.004), (I-130)+(1.002)+(3.005), (I-130)+(1.002)+(3.006), (I-130)+(1.002)+(3.007), (I-130)+(1.002)+(3.008), (I-130)+(1.002)+(3.009), (I-130)+(1.002)+(3.010), (I-130)+(1.002)+(3.011), (I-130)+(1.002)+(3.012), (I-130)+(1.002)+(3.013), (I-130)+(1.002)+(3.014), (I-130)+(1.002)+(3.015), (I-130)+(1.002)+(3.016), (I-130)+(1.002)+(3.017), (I-130)+(1.002)+(3.018), (I-130)+(1.002)+(3.019), (I-130)+(1.002)+(3.020), (I-130)+(1.002)+(3.021), (I-130)+(1.002)+(3.022), (I-130)+(1.002)+(3.023), (I-130)+(1.002)+(3.024), (I-130)+(1.002)+(3.025), (I-130)+(1.002)+(3.026), (I-130)+(1.002)+(3.027), (I-130)+(1.002)+(3.028), (I-130)+(1.002)+(3.029), (I-130)+(1.002)+(3.030), (I-130)+(1.002)+(3.031), (I-130)+(1.002)+(5.001), (I-130)+(1.002)+(5.002), (I-130)+(1.002)+(5.003), (I-130)+(1.002)+(5.004), (I-130)+(1.002)+(5.005), (I-130)+(1.002)+(5.006), (I-130)+(1.002)+(5.007), (I-130)+(1.002)+(5.008), (I-130)+(1.002)+(5.009), (I-130)+(1.002)+(5.010), (I-130)+(1.002)+(5.011), (I-130)+(1.002)+(5.012), (I-130)+(1.002)+(5.013), (I-130)+(1.002)+(5.014), (I-130)+(1.002)+(5.015), (I-130)+(1.002)+(5.016), (I-130)+(1.002)+(5.017), (I-130)+(1.002)+(5.018), (I-130)+(1.002)+(5.019), (I-130)+(1.002)+(5.020), (I-130)+(1.002)+(5.021), (I-130)+(1.002)+(5.022), (I-130)+(1.002)+(5.023), (I-130)+(1.002)+(6.001), (I-130)+(1.002)+(6.002), (I-130)+(1.002)+(6.003), (I-130)+(1.002)+(6.004), (I-130)+(1.002)+(7.001), (I-130)+(1.002)+(7.002), (I-130)+(1.002)+(7.003), (I-130)+(1.002)+(7.004), (I-130)+(1.002)+(7.005), (I-130)+(1.002)+(7.006), (I-130)+(1.002)+(9.001), (I-130)+(1.002)+(9.002), (I-130)+(1.002)+(9.003), (I-130)+(1.002)+(9.004), (I-130)+(1.002)+(9.005), (I-130)+(1.002)+(9.006), (I-130)+(1.002)+(9.007), (I-130)+(1.002)+(9.008), (I-130)+(1.002)+(9.009), (I-130)+(1.002)+(14.001), (I-130)+(1.002)+(14.002), (I-130)+(1.002)+(15.008), (I-130)+(1.002)+(15.011), (I-130)+(1.002)+(15.012), (I-130)+(1.002)+(15.016), (I-130)+(1.002)+(15.025), (I-130)+(1.002)+(15.027), (I-130)+(1.002)+(15.047), (I-130)+(1.002)+(15.063), (I-130)+(1.002)+(15.064), (I-130)+(1.002)+(16.001), (I-130)+(1.002)+(16.002), (I-130)+(1.002)+(16.003), (I-130)+(1.002)+(16.004), (I-130)+(1.002)+(16.005), (I-130)+(1.002)+(16.006), (I-130)+(1.002)+(16.007), (I-130)+(1.002)+(16.008), (I-130)+(1.002)+(17.001), (I-130)+(1.002)+(17.002), (I-130)+(1.002)+(17.003), (I-130)+(1.002)+(17.004), (I-130)+(1.002)+(17.005), (I-130)+(1.002)+(17.006), (I-130)+(1.002)+(17.007), (I-130)+(1.002)+(17.008), (I-130)+(1.002)+(17.009), (I-130)+(1.002)+(17.010), (I-130)+(1.002)+(17.011), (I-130)+(1.002)+(17.012), (I-130)+(1.002)+(18.001), (I-130)+(1.003)+(1.004), (I-130)+(1.003)+(1.005), (I-130)+(1.003)+(1.006), (I-130)+(1.003)+(1.007), (I-130)+(1.003)+(1.008), (I-130)+(1.003)+(1.009), (I-130)+(1.003)+(1.010), (I-130)+(1.003)+(1.011), (I-130)+(1.003)+(1.012), (I-130)+(1.003)+(1.013), (I-130)+(1.003)+(1.014), (I-130)+(1.003)+(1.015), (I-130)+(1.003)+(1.016), (I-130)+(1.003)+(1.017), (I-130)+(1.003)+(1.018), (I-130)+(1.003)+(1.019), (I-130)+(1.003)+(1.020), (I-130)+(1.003)+(1.021), (I-130)+(1.003)+(1.022), (I-130)+(1.003)+(1.023), (I-130)+(1.003)+(1.024), (I-130)+(1.003)+(1.025), (I-130)+(1.003)+(1.026), (I-130)+(1.003)+(1.027), (I-130)+(1.003)+(1.028), (I-130)+(1.003)+(1.029), (I-130)+(1.003)+(1.030), (I-130)+(1.003)+(1.031), (I-130)+(1.003)+(1.032), (I-130)+(1.003)+(1.033), (I-130)+(1.003)+(1.034), (I-130)+(1.003)+(1.035), (I-130)+(1.003)+(1.036), (I-130)+(1.003)+(1.037), (I-130)+(1.003)+(1.038), (I-130)+(1.003)+(1.039), (I-130)+(1.003)+(1.040), (I-130)+(1.003)+(1.041), (I-130)+(1.003)+(1.042), (I-130)+(1.003)+(1.043), (I-130)+(1.003)+(1.044), (I-130)+(1.003)+(1.045), (I-130)+(1.003)+(1.046), (I-130)+(1.003)+(1.047), (I-130)+(1.003)+(1.048), (I-130)+(1.003)+(1.049), (I-130)+(1.003)+(1.050), (I-130)+(1.003)+(1.051), (I-130)+(1.003)+(1.052), (I-130)+(1.003)+(1.053), (I-130)+(1.003)+(1.054), (I-130)+(1.003)+(1.055), (I-130)+(1.003)+(1.056), (I-130)+(1.003)+(1.057), (I-130)+(1.003)+(1.058), (I-130)+(1.003)+(1.059), (I-130)+(1.003)+(1.060), (I-130)+(1.003)+(1.061), (I-130)+(1.003)+(1.062), (I-130)+(1.003)+(1.063), (I-130)+(1.003)+(1.064), (I-130)+(1.003)+(1.065), (I-130)+(1.003)+(1.066), (I-130)+(1.003)+(1.067), (I-130)+(1.003)+(1.068), (I-130)+(1.003)+(1.069), (I-130)+(1.003)+(1.070), (I-130)+(1.003)+(1.071), (I-130)+(1.003)+(1.072), (I-130)+(1.003)+(1.073), (I-130)+(1.003)+(1.074), (I-130)+(1.003)+(1.075), (I-130)+(1.003)+(1.076), (I-130)+(1.003)+(1.077), (I-130)+(1.003)+(1.078), (I-130)+(1.003)+(1.079), (I-130)+(1.003)+(1.080), (I-130)+(1.003)+(1.081), (I-130)+(1.003)+(1.082), (I-130)+(1.003)+(1.083), (I-130)+(1.003)+(1.084), (I-130)+(1.003)+(1.085), (I-130)+(1.003)+(1.086), (I-130)+(1.003)+(1.087), (I-130)+(1.003)+(1.088), (I-130)+(1.003)+(1.089), (I-130)+(1.003)+(1.090), (I-130)+(1.003)+(1.091), (I-130)+(1.003)+(1.092), (I-130)+(1.003)+(2.001), (I-130)+(1.003)+(2.002), (I-130)+(1.003)+(2.003), (I-130)+(1.003)+(2.004), (I-130)+(1.003)+(2.005), (I-130)+(1.003)+(2.006), (I-130)+(1.003)+(2.007), (I-130)+(1.003)+(2.008), (I-130)+(1.003)+(2.009), (I-130)+(1.003)+(2.010), (I-130)+(1.003)+(2.011), (I-130)+(1.003)+(2.012), (I-130)+(1.003)+(2.013), (I-130)+(1.003)+(2.014), (I-130)+(1.003)+(2.015), (I-130)+(1.003)+(2.016), (I-130)+(1.003)+(2.017), (I-130)+(1.003)+(2.018), (I-130)+(1.003)+(2.019), (I-130)+(1.003)+(2.020), (I-130)+(1.003)+(2.021), (I-130)+(1.003)+(2.022), (I-130)+(1.003)+(2.023), (I-130)+(1.003)+(2.024), (I-130)+(1.003)+(2.025), (I-130)+(1.003)+(2.026), (I-130)+(1.003)+(2.027), (I-130)+(1.003)+(2.028), (I-130)+(1.003)+(2.029), (I-130)+(1.003)+(2.030), (I-130)+(1.003)+(2.031), (I-130)+(1.003)+(2.032), (I-130)+(1.003)+(2.033), (I-130)+(1.003)+(2.034), (I-130)+(1.003)+(2.035), (I-130)+(1.003)+(2.036), (I-130)+(1.003)+(2.037), (I-130)+(1.003)+(2.038), (I-130)+(1.003)+(2.039), (I-130)+(1.003)+(2.040), (I-130)+(1.003)+(2.041), (I-130)+(1.003)+(2.042), (I-130)+(1.003)+(2.043), (I-130)+(1.003)+(2.044), (I-130)+(1.003)+(2.045), (I-130)+(1.003)+(2.046), (I-130)+(1.003)+(2.047), (I-130)+(1.003)+(2.048), (I-130)+(1.003)+(2.049), (I-130)+(1.003)+(2.050), (I-130)+(1.003)+(2.051), (I-130)+(1.003)+(2.052), (I-130)+(1.003)+(2.053), (I-130)+(1.003)+(2.054), (I-130)+(1.003)+(2.055), (I-130)+(1.003)+(2.056), (I-130)+(1.003)+(2.057), (I-130)+(1.003)+(2.058), (I-130)+(1.003)+(2.059), (I-130)+(1.003)+(3.001), (I-130)+(1.003)+(3.002), (I-130)+(1.003)+(3.003), (I-130)+(1.003)+(3.004), (I-130)+(1.003)+(3.005), (I-130)+(1.003)+(3.006), (I-130)+(1.003)+(3.007), (I-130)+(1.003)+(3.008), (I-130)+(1.003)+(3.009), (I-130)+(1.003)+(3.010), (I-130)+(1.003)+(3.011), (I-130)+(1.003)+(3.012), (I-130)+(1.003)+(3.013), (I-130)+(1.003)+(3.014), (I-130)+(1.003)+(3.015), (I-130)+(1.003)+(3.016), (I-130)+(1.003)+(3.017), (I-130)+(1.003)+(3.018), (I-130)+(1.003)+(3.019), (I-130)+(1.003)+(3.020), (I-130)+(1.003)+(3.021), (I-130)+(1.003)+(3.022), (I-130)+(1.003)+(3.023), (I-130)+(1.003)+(3.024), (I-130)+(1.003)+(3.025), (I-130)+(1.003)+(3.026), (I-130)+(1.003)+(3.027), (I-130)+(1.003)+(3.028), (I-130)+(1.003)+(3.029), (I-130)+(1.003)+(3.030), (I-130)+(1.003)+(3.031), (I-130)+(1.003)+(5.001), (I-130)+(1.003)+(5.002), (I-130)+(1.003)+(5.003), (I-130)+(1.003)+(5.004), (I-130)+(1.003)+(5.005), (I-130)+(1.003)+(5.006), (I-130)+(1.003)+(5.007), (I-130)+(1.003)+(5.008), (I-130)+(1.003)+(5.009), (I-130)+(1.003)+(5.010), (I-130)+(1.003)+(5.011), (I-130)+(1.003)+(5.012), (I-130)+(1.003)+(5.013), (I-130)+(1.003)+(5.014), (I-130)+(1.003)+(5.015), (I-130)+(1.003)+(5.016), (I-130)+(1.003)+(5.017), (I-130)+(1.003)+(5.018), (I-130)+(1.003)+(5.019), (I-130)+(1.003)+(5.020), (I-130)+(1.003)+(5.021), (I-130)+(1.003)+(5.022), (I-130)+(1.003)+(5.023), (I-130)+(1.003)+(6.001), (I-130)+(1.003)+(6.002), (I-130)+(1.003)+(6.003), (I-130)+(1.003)+(6.004), (I-130)+(1.003)+(7.001), (I-130)+(1.003)+(7.002), (I-130)+(1.003)+(7.003), (I-130)+(1.003)+(7.004), (I-130)+(1.003)+(7.005), (I-130)+(1.003)+(7.006), (I-130)+(1.003)+(9.001), (I-130)+(1.003)+(9.002), (I-130)+(1.003)+(9.003), (I-130)+(1.003)+(9.004), (I-130)+(1.003)+(9.005), (I-130)+(1.003)+(9.006), (I-130)+(1.003)+(9.007), (I-130)+(1.003)+(9.008), (I-130)+(1.003)+(9.009), (I-130)+(1.003)+(14.001), (I-130)+(1.003)+(14.002), (I-130)+(1.003)+(15.008), (I-130)+(1.003)+(15.011), (I-130)+(1.003)+(15.012), (I-130)+(1.003)+(15.016), (I-130)+(1.003)+(15.025), (I-130)+(1.003)+(15.027), (I-130)+(1.003)+(15.047), (I-130)+(1.003)+(15.063), (I-130)+(1.003)+(15.064), (I-130)+(1.003)+(16.001), (I-130)+(1.003)+(16.002), (I-130)+(1.003)+(16.003), (I-130)+(1.003)+(16.004), (I-130)+(1.003)+(16.005), (I-130)+(1.003)+(16.006), (I-130)+(1.003)+(16.007), (I-130)+(1.003)+(16.008), (I-130)+(1.003)+(17.001), (I-130)+(1.003)+(17.002), (I-130)+(1.003)+(17.003), (I-130)+(1.003)+(17.004), (I-130)+(1.003)+(17.005), (I-130)+(1.003)+(17.006), (I-130)+(1.003)+(17.007), (I-130)+(1.003)+(17.008), (I-130)+(1.003)+(17.009), (I-130)+(1.003)+(17.010), (I-130)+(1.003)+(17.011), (I-130)+(1.003)+(17.012), (I-130)+(1.003)+(18.001), (I-130)+(1.004)+(1.005), (I-130)+(1.004)+(1.006), (I-130)+(1.004)+(1.007), (I-130)+(1.004)+(1.008), (I-130)+(1.004)+(1.009), (I-130)+(1.004)+(1.010), (I-130)+(1.004)+(1.011), (I-130)+(1.004)+(1.012), (I-130)+(1.004)+(1.013), (I-130)+(1.004)+(1.014), (I-130)+(1.004)+(1.015), (I-130)+(1.004)+(1.016), (I-130)+(1.004)+(1.017), (I-130)+(1.004)+(1.018), (I-130)+(1.004)+(1.019), (I-130)+(1.004)+(1.020), (I-130)+(1.004)+(1.021), (I-130)+(1.004)+(1.022), (I-130)+(1.004)+(1.023), (I-130)+(1.004)+(1.024), (I-130)+(1.004)+(1.025), (I-130)+(1.004)+(1.026), (I-130)+(1.004)+(1.027), (I-130)+(1.004)+(1.028), (I-130)+(1.004)+(1.029), (I-130)+(1.004)+(1.030), (I-130)+(1.004)+(1.031), (I-130)+(1.004)+(1.032), (I-130)+(1.004)+(1.033), (I-130)+(1.004)+(1.034), (I-130)+(1.004)+(1.035), (I-130)+(1.004)+(1.036), (I-130)+(1.004)+(1.037), (I-130)+(1.004)+(1.038), (I-130)+(1.004)+(1.039), (I-130)+(1.004)+(1.040), (I-130)+(1.004)+(1.041), (I-130)+(1.004)+(1.042), (I-130)+(1.004)+(1.043), (I-130)+(1.004)+(1.044), (I-130)+(1.004)+(1.045), (I-130)+(1.004)+(1.046), (I-130)+(1.004)+(1.047), (I-130)+(1.004)+(1.048), (I-130)+(1.004)+(1.049), (I-130)+(1.004)+(1.050), (I-130)+(1.004)+(1.051), (I-130)+(1.004)+(1.052), (I-130)+(1.004)+(1.053), (I-130)+(1.004)+(1.054), (I-130)+(1.004)+(1.055), (I-130)+(1.004)+(1.056), (I-130)+(1.004)+(1.057), (I-130)+(1.004)+(1.058), (I-130)+(1.004)+(1.059), (I-130)+(1.004)+(1.060), (I-130)+(1.004)+(1.061), (I-130)+(1.004)+(1.062), (I-130)+(1.004)+(1.063), (I-130)+(1.004)+(1.064), (I-130)+(1.004)+(1.065), (I-130)+(1.004)+(1.066), (I-130)+(1.004)+(1.067), (I-130)+(1.004)+(1.068), (I-130)+(1.004)+(1.069), (I-130)+(1.004)+(1.070), (I-130)+(1.004)+(1.071), (I-130)+(1.004)+(1.072), (I-130)+(1.004)+(1.073), (I-130)+(1.004)+(1.074), (I-130)+(1.004)+(1.075), (I-130)+(1.004)+(1.076), (I-130)+(1.004)+(1.077), (I-130)+(1.004)+(1.078), (I-130)+(1.004)+(1.079), (I-130)+(1.004)+(1.080), (I-130)+(1.004)+(1.081), (I-130)+(1.004)+(1.082), (I-130)+(1.004)+(1.083), (I-130)+(1.004)+(1.084), (I-130)+(1.004)+(1.085), (I-130)+(1.004)+(1.086), (I-130)+(1.004)+(1.087), (I-130)+(1.004)+(1.088), (I-130)+(1.004)+(1.089), (I-130)+(1.004)+(1.090), (I-130)+(1.004)+(1.091), (I-130)+(1.004)+(1.092), (I-130)+(1.004)+(2.001), (I-130)+(1.004)+(2.002), (I-130)+(1.004)+(2.003), (I-130)+(1.004)+(2.004), (I-130)+(1.004)+(2.005), (I-130)+(1.004)+(2.006), (I-130)+(1.004)+(2.007), (I-130)+(1.004)+(2.008), (I-130)+(1.004)+(2.009), (I-130)+(1.004)+(2.010), (I-130)+(1.004)+(2.011), (I-130)+(1.004)+(2.012), (I-130)+(1.004)+(2.013), (I-130)+(1.004)+(2.014), (I-130)+(1.004)+(2.015), (I-130)+(1.004)+(2.016), (I-130)+(1.004)+(2.017), (I-130)+(1.004)+(2.018), (I-130)+(1.004)+(2.019), (I-130)+(1.004)+(2.020), (I-130)+(1.004)+(2.021), (I-130)+(1.004)+(2.022), (I-130)+(1.004)+(2.023), (I-130)+(1.004)+(2.024), (I-130)+(1.004)+(2.025), (I-130)+(1.004)+(2.026), (I-130)+(1.004)+(2.027), (I-130)+(1.004)+(2.028), (I-130)+(1.004)+(2.029), (I-130)+(1.004)+(2.030), (I-130)+(1.004)+(2.031), (I-130)+(1.004)+(2.032), (I-130)+(1.004)+(2.033), (I-130)+(1.004)+(2.034), (I-130)+(1.004)+(2.035), (I-130)+(1.004)+(2.036), (I-130)+(1.004)+(2.037), (I-130)+(1.004)+(2.038), (I-130)+(1.004)+(2.039), (I-130)+(1.004)+(2.040), (I-130)+(1.004)+(2.041), (I-130)+(1.004)+(2.042), (I-130)+(1.004)+(2.043), (I-130)+(1.004)+(2.044), (I-130)+(1.004)+(2.045), (I-130)+(1.004)+(2.046), (I-130)+(1.004)+(2.047), (I-130)+(1.004)+(2.048), (I-130)+(1.004)+(2.049), (I-130)+(1.004)+(2.050), (I-130)+(1.004)+(2.051), (I-130)+(1.004)+(2.052), (I-130)+(1.004)+(2.053), (I-130)+(1.004)+(2.054), (I-130)+(1.004)+(2.055), (I-130)+(1.004)+(2.056), (I-130)+(1.004)+(2.057), (I-130)+(1.004)+(2.058), (I-130)+(1.004)+(2.059), (I-130)+(1.004)+(3.001), (I-130)+(1.004)+(3.002), (I-130)+(1.004)+(3.003), (I-130)+(1.004)+(3.004), (I-130)+(1.004)+(3.005), (I-130)+(1.004)+(3.006), (I-130)+(1.004)+(3.007), (I-130)+(1.004)+(3.008), (I-130)+(1.004)+(3.009), (I-130)+(1.004)+(3.010), (I-130)+(1.004)+(3.011), (I-130)+(1.004)+(3.012), (I-130)+(1.004)+(3.013), (I-130)+(1.004)+(3.014), (I-130)+(1.004)+(3.015), (I-130)+(1.004)+(3.016), (I-130)+(1.004)+(3.017), (I-130)+(1.004)+(3.018), (I-130)+(1.004)+(3.019), (I-130)+(1.004)+(3.020), (I-130)+(1.004)+(3.021), (I-130)+(1.004)+(3.022), (I-130)+(1.004)+(3.023), (I-130)+(1.004)+(3.024), (I-130)+(1.004)+(3.025), (I-130)+(1.004)+(3.026), (I-130)+(1.004)+(3.027), (I-130)+(1.004)+(3.028), (I-130)+(1.004)+(3.029), (I-130)+(1.004)+(3.030), (I-130)+(1.004)+(3.031), (I-130)+(1.004)+(5.001), (I-130)+(1.004)+(5.002), (I-130)+(1.004)+(5.003), (I-130)+(1.004)+(5.004), (I-130)+(1.004)+(5.005), (I-130)+(1.004)+(5.006), (I-130)+(1.004)+(5.007), (I-130)+(1.004)+(5.008), (I-130)+(1.004)+(5.009), (I-130)+(1.004)+(5.010), (I-130)+(1.004)+(5.011), (I-130)+(1.004)+(5.012), (I-130)+(1.004)+(5.013), (I-130)+(1.004)+(5.014), (I-130)+(1.004)+(5.015), (I-130)+(1.004)+(5.016), (I-130)+(1.004)+(5.017), (I-130)+(1.004)+(5.018), (I-130)+(1.004)+(5.019), (I-130)+(1.004)+(5.020), (I-130)+(1.004)+(5.021), (I-130)+(1.004)+(5.022), (I-130)+(1.004)+(5.023), (I-130)+(1.004)+(6.001), (I-130)+(1.004)+(6.002), (I-130)+(1.004)+(6.003), (I-130)+(1.004)+(6.004), (I-130)+(1.004)+(7.001), (I-130)+(1.004)+(7.002), (I-130)+(1.004)+(7.003), (I-130)+(1.004)+(7.004), (I-130)+(1.004)+(7.005), (I-130)+(1.004)+(7.006), (I-130)+(1.004)+(9.001), (I-130)+(1.004)+(9.002), (I-130)+(1.004)+(9.003), (I-130)+(1.004)+(9.004), (I-130)+(1.004)+(9.005), (I-130)+(1.004)+(9.006), (I-130)+(1.004)+(9.007), (I-130)+(1.004)+(9.008), (I-130)+(1.004)+(9.009), (I-130)+(1.004)+(14.001), (I-130)+(1.004)+(14.002), (I-130)+(1.004)+(15.008), (I-130)+(1.004)+(15.011), (I-130)+(1.004)+(15.012), (I-130)+(1.004)+(15.016), (I-130)+(1.004)+(15.025), (I-130)+(1.004)+(15.027), (I-130)+(1.004)+(15.047), (I-130)+(1.004)+(15.063), (I-130)+(1.004)+(15.064), (I-130)+(1.004)+(16.001), (I-130)+(1.004)+(16.002), (I-130)+(1.004)+(16.003), (I-130)+(1.004)+(16.004), (I-130)+(1.004)+(16.005), (I-130)+(1.004)+(16.006), (I-130)+(1.004)+(16.007), (I-130)+(1.004)+(16.008), (I-130)+(1.004)+(17.001), (I-130)+(1.004)+(17.002), (I-130)+(1.004)+(17.003), (I-130)+(1.004)+(17.004), (I-130)+(1.004)+(17.005), (I-130)+(1.004)+(17.006), (I-130)+(1.004)+(17.007), (I-130)+(1.004)+(17.008), (I-130)+(1.004)+(17.009), (I-130)+(1.004)+(17.010), (I-130)+(1.004)+(17.011), (I-130)+(1.004)+(17.012), (I-130)+(1.004)+(18.001), (I-130)+(1.005)+(1.006), (I-130)+(1.005)+(1.007), (I-130)+(1.005)+(1.008), (I-130)+(1.005)+(1.009), (I-130)+(1.005)+(1.010), (I-130)+(1.005)+(1.011), (I-130)+(1.005)+(1.012), (I-130)+(1.005)+(1.013), (I-130)+(1.005)+(1.014), (I-130)+(1.005)+(1.015), (I-130)+(1.005)+(1.016), (I-130)+(1.005)+(1.017), (I-130)+(1.005)+(1.018), (I-130)+(1.005)+(1.019), (I-130)+(1.005)+(1.020), (I-130)+(1.005)+(1.021), (I-130)+(1.005)+(1.022), (I-130)+(1.005)+(1.023), (I-130)+(1.005)+(1.024), (I-130)+(1.005)+(1.025), (I-130)+(1.005)+(1.026), (I-130)+(1.005)+(1.027), (I-130)+(1.005)+(1.028), (I-130)+(1.005)+(1.029), (I-130)+(1.005)+(1.030), (I-130)+(1.005)+(1.031), (I-130)+(1.005)+(1.032), (I-130)+(1.005)+(1.033), (I-130)+(1.005)+(1.034), (I-130)+(1.005)+(1.035), (I-130)+(1.005)+(1.036), (I-130)+(1.005)+(1.037), (I-130)+(1.005)+(1.038), (I-130)+(1.005)+(1.039), (I-130)+(1.005)+(1.040), (I-130)+(1.005)+(1.041), (I-130)+(1.005)+(1.042), (I-130)+(1.005)+(1.043), (I-130)+(1.005)+(1.044), (I-130)+(1.005)+(1.045), (I-130)+(1.005)+(1.046), (I-130)+(1.005)+(1.047), (I-130)+(1.005)+(1.048), (I-130)+(1.005)+(1.049), (I-130)+(1.005)+(1.050), (I-130)+(1.005)+(1.051), (I-130)+(1.005)+(1.052), (I-130)+(1.005)+(1.053), (I-130)+(1.005)+(1.054), (I-130)+(1.005)+(1.055), (I-130)+(1.005)+(1.056), (I-130)+(1.005)+(1.057), (I-130)+(1.005)+(1.058), (I-130)+(1.005)+(1.059), (I-130)+(1.005)+(1.060), (I-130)+(1.005)+(1.061), (I-130)+(1.005)+(1.062), (I-130)+(1.005)+(1.063), (I-130)+(1.005)+(1.064), (I-130)+(1.005)+(1.065), (I-130)+(1.005)+(1.066), (I-130)+(1.005)+(1.067), (I-130)+(1.005)+(1.068), (I-130)+(1.005)+(1.069), (I-130)+(1.005)+(1.070), (I-130)+(1.005)+(1.071), (I-130)+(1.005)+(1.072), (I-130)+(1.005)+(1.073), (I-130)+(1.005)+(1.074), (I-130)+(1.005)+(1.075), (I-130)+(1.005)+(1.076), (I-130)+(1.005)+(1.077), (I-130)+(1.005)+(1.078), (I-130)+(1.005)+(1.079), (I-130)+(1.005)+(1.080), (I-130)+(1.005)+(1.081), (I-130)+(1.005)+(1.082), (I-130)+(1.005)+(1.083), (I-130)+(1.005)+(1.084), (I-130)+(1.005)+(1.085), (I-130)+(1.005)+(1.086), (I-130)+(1.005)+(1.087), (I-130)+(1.005)+(1.088), (I-130)+(1.005)+(1.089), (I-130)+(1.005)+(1.090), (I-130)+(1.005)+(1.091), (I-130)+(1.005)+(1.092), (I-130)+(1.005)+(2.001), (I-130)+(1.005)+(2.002), (I-130)+(1.005)+(2.003), (I-130)+(1.005)+(2.004), (I-130)+(1.005)+(2.005), (I-130)+(1.005)+(2.006), (I-130)+(1.005)+(2.007), (I-130)+(1.005)+(2.008), (I-130)+(1.005)+(2.009), (I-130)+(1.005)+(2.010), (I-130)+(1.005)+(2.011), (I-130)+(1.005)+(2.012), (I-130)+(1.005)+(2.013), (I-130)+(1.005)+(2.014), (I-130)+(1.005)+(2.015), (I-130)+(1.005)+(2.016), (I-130)+(1.005)+(2.017), (I-130)+(1.005)+(2.018), (I-130)+(1.005)+(2.019), (I-130)+(1.005)+(2.020), (I-130)+(1.005)+(2.021), (I-130)+(1.005)+(2.022), (I-130)+(1.005)+(2.023), (I-130)+(1.005)+(2.024), (I-130)+(1.005)+(2.025), (I-130)+(1.005)+(2.026), (I-130)+(1.005)+(2.027), (I-130)+(1.005)+(2.028), (I-130)+(1.005)+(2.029), (I-130)+(1.005)+(2.030), (I-130)+(1.005)+(2.031), (I-130)+(1.005)+(2.032), (I-130)+(1.005)+(2.033), (I-130)+(1.005)+(2.034), (I-130)+(1.005)+(2.035), (I-130)+(1.005)+(2.036), (I-130)+(1.005)+(2.037), (I-130)+(1.005)+(2.038), (I-130)+(1.005)+(2.039), (I-130)+(1.005)+(2.040), (I-130)+(1.005)+(2.041), (I-130)+(1.005)+(2.042), (I-130)+(1.005)+(2.043), (I-130)+(1.005)+(2.044), (I-130)+(1.005)+(2.045), (I-130)+(1.005)+(2.046), (I-130)+(1.005)+(2.047), (I-130)+(1.005)+(2.048), (I-130)+(1.005)+(2.049), (I-130)+(1.005)+(2.050), (I-130)+(1.005)+(2.051), (I-130)+(1.005)+(2.052), (I-130)+(1.005)+(2.053), (I-130)+(1.005)+(2.054), (I-130)+(1.005)+(2.055), (I-130)+(1.005)+(2.056), (I-130)+(1.005)+(2.057), (I-130)+(1.005)+(2.058), (I-130)+(1.005)+(2.059), (I-130)+(1.005)+(3.001), (I-130)+(1.005)+(3.002), (I-130)+(1.005)+(3.003), (I-130)+(1.005)+(3.004), (I-130)+(1.005)+(3.005), (I-130)+(1.005)+(3.006), (I-130)+(1.005)+(3.007), (I-130)+(1.005)+(3.008), (I-130)+(1.005)+(3.009), (I-130)+(1.005)+(3.010), (I-130)+(1.005)+(3.011), (I-130)+(1.005)+(3.012), (I-130)+(1.005)+(3.013), (I-130)+(1.005)+(3.014), (I-130)+(1.005)+(3.015), (I-130)+(1.005)+(3.016),
(I-130)+(1.005)+(3.017), (I-130)+(1.005)+(3.018),
(I-130)+(1.005)+(3.019), (I-130)+(1.005)+(3.020),
(I-130)+(1.005)+(3.021), (I-130)+(1.005)+(3.022),
(I-130)+(1.005)+(3.023), (I-130)+(1.005)+(3.024),
(I-130)+(1.005)+(3.025), (I-130)+(1.005)+(3.026),
(I-130)+(1.005)+(3.027), (I-130)+(1.005)+(3.028),
(I-130)+(1.005)+(3.029), (I-130)+(1.005)+(3.030),
(I-130)+(1.005)+(3.031), (I-130)+(1.005)+(5.001),
(I-130)+(1.005)+(5.002), (I-130)+(1.005)+(5.003),
(I-130)+(1.005)+(5.004), (I-130)+(1.005)+(5.005),
(I-130)+(1.005)+(5.006), (I-130)+(1.005)+(5.007),
(I-130)+(1.005)+(5.008), (I-130)+(1.005)+(5.009),
(I-130)+(1.005)+(5.010), (I-130)+(1.005)+(5.011),
(I-130)+(1.005)+(5.012), (I-130)+(1.005)+(5.013),
(I-130)+(1.005)+(5.014), (I-130)+(1.005)+(5.015),
(I-130)+(1.005)+(5.016), (I-130)+(1.005)+(5.017),
(I-130)+(1.005)+(5.018), (I-130)+(1.005)+(5.019),
(I-130)+(1.005)+(5.020), (I-130)+(1.005)+(5.021),
(I-130)+(1.005)+(5.022), (I-130)+(1.005)+(5.023),
(I-130)+(1.005)+(6.001), (I-130)+(1.005)+(6.002),
(I-130)+(1.005)+(6.003), (I-130)+(1.005)+(6.004),
(I-130)+(1.005)+(7.001), (I-130)+(1.005)+(7.002),
(I-130)+(1.005)+(7.003), (I-130)+(1.005)+(7.004),
(I-130)+(1.005)+(7.005), (I-130)+(1.005)+(7.006),
(I-130)+(1.005)+(9.001), (I-130)+(1.005)+(9.002),
(I-130)+(1.005)+(9.003), (I-130)+(1.005)+(9.004),
(I-130)+(1.005)+(9.005), (I-130)+(1.005)+(9.006),
(I-130)+(1.005)+(9.007), (I-130)+(1.005)+(9.008),
(I-130)+(1.005)+(9.009), (I-130)+(1.005)+(14.001),
(I-130)+(1.005)+(14.002), (I-130)+(1.005)+(15.008),
(I-130)+(1.005)+(15.011), (I-130)+(1.005)+(15.012),
(I-130)+(1.005)+(15.016), (I-130)+(1.005)+(15.025),
(I-130)+(1.005)+(15.027), (I-130)+(1.005)+(15.047),
(I-130)+(1.005)+(15.063), (I-130)+(1.005)+(15.064),
(I-130)+(1.005)+(16.001), (I-130)+(1.005)+(16.002),
(I-130)+(1.005)+(16.003), (I-130)+(1.005)+(16.004),
(I-130)+(1.005)+(16.005), (I-130)+(1.005)+(16.006),
(I-130)+(1.005)+(16.007), (I-130)+(1.005)+(16.008),
(I-130)+(1.005)+(17.001), (I-130)+(1.005)+(17.002),
(I-130)+(1.005)+(17.003), (I-130)+(1.005)+(17.004),
(I-130)+(1.005)+(17.005), (I-130)+(1.005)+(17.006),
(I-130)+(1.005)+(17.007), (I-130)+(1.005)+(17.008),
(I-130)+(1.005)+(17.009), (I-130)+(1.005)+(17.010),
(I-130)+(1.005)+(17.011), (I-130)+(1.005)+(17.012),
(I-130)+(1.005)+(18.001), (I-130)+(1.006)+(1.007), (I-130)+(1.006)+(1.008),
(I-130)+(1.006)+(1.009), (I-130)+(1.006)+(1.010),
(I-130)+(1.006)+(1.011), (I-130)+(1.006)+(1.012),
(I-130)+(1.006)+(1.013), (I-130)+(1.006)+(1.014),
(I-130)+(1.006)+(1.015), (I-130)+(1.006)+(1.016),
(I-130)+(1.006)+(1.017), (I-130)+(1.006)+(1.018),
(I-130)+(1.006)+(1.019), (I-130)+(1.006)+(1.020),
(I-130)+(1.006)+(1.021), (I-130)+(1.006)+(1.022),
(I-130)+(1.006)+(1.023), (I-130)+(1.006)+(1.024),
(I-130)+(1.006)+(1.025), (I-130)+(1.006)+(1.026),
(I-130)+(1.006)+(1.027), (I-130)+(1.006)+(1.028),
(I-130)+(1.006)+(1.029), (I-130)+(1.006)+(1.030),
(I-130)+(1.006)+(1.031), (I-130)+(1.006)+(1.032),
(I-130)+(1.006)+(1.033), (I-130)+(1.006)+(1.034),
(I-130)+(1.006)+(1.035), (I-130)+(1.006)+(1.036),
(I-130)+(1.006)+(1.037), (I-130)+(1.006)+(1.038),
(I-130)+(1.006)+(1.039), (I-130)+(1.006)+(1.040),
(I-130)+(1.006)+(1.041), (I-130)+(1.006)+(1.042),
(I-130)+(1.006)+(1.043), (I-130)+(1.006)+(1.044),
(I-130)+(1.006)+(1.045), (I-130)+(1.006)+(1.046),
(I-130)+(1.006)+(1.047), (I-130)+(1.006)+(1.048),
(I-130)+(1.006)+(1.049), (I-130)+(1.006)+(1.050),
(I-130)+(1.006)+(1.051), (I-130)+(1.006)+(1.052),
(I-130)+(1.006)+(1.053), (I-130)+(1.006)+(1.054),
(I-130)+(1.006)+(1.055), (I-130)+(1.006)+(1.056),
(I-130)+(1.006)+(1.057), (I-130)+(1.006)+(1.058),
(I-130)+(1.006)+(1.059), (I-130)+(1.006)+(1.060),
(I-130)+(1.006)+(1.061), (I-130)+(1.006)+(1.062),
(I-130)+(1.006)+(1.063), (I-130)+(1.006)+(1.064),
(I-130)+(1.006)+(1.065), (I-130)+(1.006)+(1.066),
(I-130)+(1.006)+(1.067), (I-130)+(1.006)+(1.068),
(I-130)+(1.006)+(1.069), (I-130)+(1.006)+(1.070),
(I-130)+(1.006)+(1.071), (I-130)+(1.006)+(1.072),
(I-130)+(1.006)+(1.073), (I-130)+(1.006)+(1.074),
(I-130)+(1.006)+(1.075), (I-130)+(1.006)+(1.076),
(I-130)+(1.006)+(1.077), (I-130)+(1.006)+(1.078),
(I-130)+(1.006)+(1.079), (I-130)+(1.006)+(1.080),
(I-130)+(1.006)+(1.081), (I-130)+(1.006)+(1.082),
(I-130)+(1.006)+(1.083), (I-130)+(1.006)+(1.084),
(I-130)+(1.006)+(1.085), (I-130)+(1.006)+(1.086),
(I-130)+(1.006)+(1.087), (I-130)+(1.006)+(1.088),
(I-130)+(1.006)+(1.089), (I-130)+(1.006)+(1.090),
(I-130)+(1.006)+(1.091), (I-130)+(1.006)+(1.092),
(I-130)+(1.006)+(2.001), (I-130)+(1.006)+(2.002),
(I-130)+(1.006)+(2.003), (I-130)+(1.006)+(2.004),
(I-130)+(1.006)+(2.005), (I-130)+(1.006)+(2.006),
(I-130)+(1.006)+(2.007), (I-130)+(1.006)+(2.008),
(I-130)+(1.006)+(2.009), (I-130)+(1.006)+(2.010),
(I-130)+(1.006)+(2.011), (I-130)+(1.006)+(2.012),
(I-130)+(1.006)+(2.013), (I-130)+(1.006)+(2.014),
(I-130)+(1.006)+(2.015), (I-130)+(1.006)+(2.016),
(I-130)+(1.006)+(2.017), (I-130)+(1.006)+(2.018),
(I-130)+(1.006)+(2.019), (I-130)+(1.006)+(2.020),
(I-130)+(1.006)+(2.021), (I-130)+(1.006)+(2.022),
(I-130)+(1.006)+(2.023), (I-130)+(1.006)+(2.024),
(I-130)+(1.006)+(2.025), (I-130)+(1.006)+(2.026),
(I-130)+(1.006)+(2.027), (I-130)+(1.006)+(2.028),
(I-130)+(1.006)+(2.029), (I-130)+(1.006)+(2.030),
(I-130)+(1.006)+(2.031), (I-130)+(1.006)+(2.032),
(I-130)+(1.006)+(2.033), (I-130)+(1.006)+(2.034),
(I-130)+(1.006)+(2.035), (I-130)+(1.006)+(2.036),
(I-130)+(1.006)+(2.037), (I-130)+(1.006)+(2.038),
(I-130)+(1.006)+(2.039), (I-130)+(1.006)+(2.040),
(I-130)+(1.006)+(2.041), (I-130)+(1.006)+(2.042),
(I-130)+(1.006)+(2.043), (I-130)+(1.006)+(2.044),
(I-130)+(1.006)+(2.045), (I-130)+(1.006)+(2.046),
(I-130)+(1.006)+(2.047), (I-130)+(1.006)+(2.048),
(I-130)+(1.006)+(2.049), (I-130)+(1.006)+(2.050),
(I-130)+(1.006)+(2.051), (I-130)+(1.006)+(2.052),
(I-130)+(1.006)+(2.053), (I-130)+(1.006)+(2.054),
(I-130)+(1.006)+(2.055), (I-130)+(1.006)+(2.056),
(I-130)+(1.006)+(2.057), (I-130)+(1.006)+(2.058),
(I-130)+(1.006)+(2.059), (I-130)+(1.006)+(3.001),
(I-130)+(1.006)+(3.002), (I-130)+(1.006)+(3.003),
(I-130)+(1.006)+(3.004), (I-130)+(1.006)+(3.005),
(I-130)+(1.006)+(3.006), (I-130)+(1.006)+(3.007),
(I-130)+(1.006)+(3.008), (I-130)+(1.006)+(3.009),
(I-130)+(1.006)+(3.010), (I-130)+(1.006)+(3.011),
(I-130)+(1.006)+(3.012), (I-130)+(1.006)+(3.013),
(I-130)+(1.006)+(3.014), (I-130)+(1.006)+(3.015),
(I-130)+(1.006)+(3.016), (I-130)+(1.006)+(3.017),
(I-130)+(1.006)+(3.018), (I-130)+(1.006)+(3.019),
(I-130)+(1.006)+(3.020), (I-130)+(1.006)+(3.021),
(I-130)+(1.006)+(3.022), (I-130)+(1.006)+(3.023),
(I-130)+(1.006)+(3.024), (I-130)+(1.006)+(3.025),
(I-130)+(1.006)+(3.026), (I-130)+(1.006)+(3.027),
(I-130)+(1.006)+(3.028), (I-130)+(1.006)+(3.029),
(I-130)+(1.006)+(3.030), (I-130)+(1.006)+(3.031), (I-130)+(1.006)+(5.001), (I-130)+(1.006)+(5.002),
(I-130)+(1.006)+(5.003), (I-130)+(1.006)+(5.004),
(I-130)+(1.006)+(5.005), (I-130)+(1.006)+(5.006),
(I-130)+(1.006)+(5.007), (I-130)+(1.006)+(5.008),
(I-130)+(1.006)+(5.009), (I-130)+(1.006)+(5.010),
(I-130)+(1.006)+(5.011), (I-130)+(1.006)+(5.012),
(I-130)+(1.006)+(5.013), (I-130)+(1.006)+(5.014),
(I-130)+(1.006)+(5.015), (I-130)+(1.006)+(5.016),
(I-130)+(1.006)+(5.017), (I-130)+(1.006)+(5.018),
(I-130)+(1.006)+(5.019), (I-130)+(1.006)+(5.020),
(I-130)+(1.006)+(5.021), (I-130)+(1.006)+(5.022),
(I-130)+(1.006)+(5.023), (I-130)+(1.006)+(6.001),
(I-130)+(1.006)+(6.002), (I-130)+(1.006)+(6.003),
(I-130)+(1.006)+(6.004), (I-130)+(1.006)+(7.001),
(I-130)+(1.006)+(7.002), (I-130)+(1.006)+(7.003),
(I-130)+(1.006)+(7.004), (I-130)+(1.006)+(7.005),
(I-130)+(1.006)+(7.006), (I-130)+(1.006)+(9.001),
(I-130)+(1.006)+(9.002), (I-130)+(1.006)+(9.003),
(I-130)+(1.006)+(9.004), (I-130)+(1.006)+(9.005),
(I-130)+(1.006)+(9.006), (I-130)+(1.006)+(9.007),
(I-130)+(1.006)+(9.008), (I-130)+(1.006)+(9.009),
(I-130)+(1.006)+(14.001), (I-130)+(1.006)+(14.002),
(I-130)+(1.006)+(15.008), (I-130)+(1.006)+(15.011),
(I-130)+(1.006)+(15.012), (I-130)+(1.006)+(15.016),
(I-130)+(1.006)+(15.025), (I-130)+(1.006)+(15.027),
(I-130)+(1.006)+(15.047), (I-130)+(1.006)+(15.063),
(I-130)+(1.006)+(15.064), (I-130)+(1.006)+(16.001),
(I-130)+(1.006)+(16.002), (I-130)+(1.006)+(16.003),
(I-130)+(1.006)+(16.004), (I-130)+(1.006)+(16.005),
(I-130)+(1.006)+(16.006), (I-130)+(1.006)+(16.007),
(I-130)+(1.006)+(16.008), (I-130)+(1.006)+(17.001),
(I-130)+(1.006)+(17.002), (I-130)+(1.006)+(17.003),
(I-130)+(1.006)+(17.004), (I-130)+(1.006)+(17.005),
(I-130)+(1.006)+(17.006), (I-130)+(1.006)+(17.007),
(I-130)+(1.006)+(17.008), (I-130)+(1.006)+(17.009),
(I-130)+(1.006)+(17.010), (I-130)+(1.006)+(17.011),
(I-130)+(1.006)+(17.012), (I-130)+(1.006)+(18.001),
(I-130)+(1.007)+(1.008), (I-130)+(1.007)+(1.009),
(I-130)+(1.007)+(1.010), (I-130)+(1.007)+(1.011),
(I-130)+(1.007)+(1.012), (I-130)+(1.007)+(1.013),
(I-130)+(1.007)+(1.014), (I-130)+(1.007)+(1.015),
(I-130)+(1.007)+(1.016), (I-130)+(1.007)+(1.017),
(I-130)+(1.007)+(1.018), (I-130)+(1.007)+(1.019),
(I-130)+(1.007)+(1.020), (I-130)+(1.007)+(1.021),
(I-130)+(1.007)+(1.022), (I-130)+(1.007)+(1.023),
(I-130)+(1.007)+(1.024), (I-130)+(1.007)+(1.025),
(I-130)+(1.007)+(1.026), (I-130)+(1.007)+(1.027),
(I-130)+(1.007)+(1.028), (I-130)+(1.007)+(1.029),
(I-130)+(1.007)+(1.030), (I-130)+(1.007)+(1.031),
(I-130)+(1.007)+(1.032), (I-130)+(1.007)+(1.033),
(I-130)+(1.007)+(1.034), (I-130)+(1.007)+(1.035),
(I-130)+(1.007)+(1.036), (I-130)+(1.007)+(1.037),
(I-130)+(1.007)+(1.038), (I-130)+(1.007)+(1.039),
(I-130)+(1.007)+(1.040), (I-130)+(1.007)+(1.041),
(I-130)+(1.007)+(1.042), (I-130)+(1.007)+(1.043),
(I-130)+(1.007)+(1.044), (I-130)+(1.007)+(1.045),
(I-130)+(1.007)+(1.046), (I-130)+(1.007)+(1.047),
(I-130)+(1.007)+(1.048), (I-130)+(1.007)+(1.049),
(I-130)+(1.007)+(1.050), (I-130)+(1.007)+(1.051),
(I-130)+(1.007)+(1.052), (I-130)+(1.007)+(1.053),
(I-130)+(1.007)+(1.054), (I-130)+(1.007)+(1.055),
(I-130)+(1.007)+(1.056), (I-130)+(1.007)+(1.057),
(I-130)+(1.007)+(1.058), (I-130)+(1.007)+(1.059),
(I-130)+(1.007)+(1.060), (I-130)+(1.007)+(1.061),
(I-130)+(1.007)+(1.062), (I-130)+(1.007)+(1.063),
(I-130)+(1.007)+(1.064), (I-130)+(1.007)+(1.065),
(I-130)+(1.007)+(1.066), (I-130)+(1.007)+(1.067),
(I-130)+(1.007)+(1.068), (I-130)+(1.007)+(1.069),
(I-130)+(1.007)+(1.070), (I-130)+(1.007)+(1.071),
(I-130)+(1.007)+(1.072), (I-130)+(1.007)+(1.073),
(I-130)+(1.007)+(1.074), (I-130)+(1.007)+(1.075),
(I-130)+(1.007)+(1.076), (I-130)+(1.007)+(1.077),
(I-130)+(1.007)+(1.078), (I-130)+(1.007)+(1.079),
(I-130)+(1.007)+(1.080), (I-130)+(1.007)+(1.081),
(I-130)+(1.007)+(1.082), (I-130)+(1.007)+(1.083),
(I-130)+(1.007)+(1.084), (I-130)+(1.007)+(1.085),
(I-130)+(1.007)+(1.086), (I-130)+(1.007)+(1.087),
(I-130)+(1.007)+(1.088), (I-130)+(1.007)+(1.089),
(I-130)+(1.007)+(1.090), (I-130)+(1.007)+(1.091),
(I-130)+(1.007)+(1.092), (I-130)+(1.007)+(2.001),
(I-130)+(1.007)+(2.002), (I-130)+(1.007)+(2.003),
(I-130)+(1.007)+(2.004), (I-130)+(1.007)+(2.005),
(I-130)+(1.007)+(2.006), (I-130)+(1.007)+(2.007),
(I-130)+(1.007)+(2.008), (I-130)+(1.007)+(2.009),
(I-130)+(1.007)+(2.010), (I-130)+(1.007)+(2.011),
(I-130)+(1.007)+(2.012), (I-130)+(1.007)+(2.013),
(I-130)+(1.007)+(2.014), (I-130)+(1.007)+(2.015),
(I-130)+(1.007)+(2.016), (I-130)+(1.007)+(2.017),
(I-130)+(1.007)+(2.018), (I-130)+(1.007)+(2.019),
(I-130)+(1.007)+(2.020), (I-130)+(1.007)+(2.021),
(I-130)+(1.007)+(2.022), (I-130)+(1.007)+(2.023),
(I-130)+(1.007)+(2.024), (I-130)+(1.007)+(2.025),
(I-130)+(1.007)+(2.026), (I-130)+(1.007)+(2.027),
(I-130)+(1.007)+(2.028), (I-130)+(1.007)+(2.029),
(I-130)+(1.007)+(2.030), (I-130)+(1.007)+(2.031),
(I-130)+(1.007)+(2.032), (I-130)+(1.007)+(2.033),
(I-130)+(1.007)+(2.034), (I-130)+(1.007)+(2.035),
(I-130)+(1.007)+(2.036), (I-130)+(1.007)+(2.037),
(I-130)+(1.007)+(2.038), (I-130)+(1.007)+(2.039),
(I-130)+(1.007)+(2.040), (I-130)+(1.007)+(2.041),
(I-130)+(1.007)+(2.042), (I-130)+(1.007)+(2.043),
(I-130)+(1.007)+(2.044), (I-130)+(1.007)+(2.045),
(I-130)+(1.007)+(2.046), (I-130)+(1.007)+(2.047),
(I-130)+(1.007)+(2.048), (I-130)+(1.007)+(2.049),
(I-130)+(1.007)+(2.050), (I-130)+(1.007)+(2.051),
(I-130)+(1.007)+(2.052), (I-130)+(1.007)+(2.053),
(I-130)+(1.007)+(2.054), (I-130)+(1.007)+(2.055),
(I-130)+(1.007)+(2.056), (I-130)+(1.007)+(2.057),
(I-130)+(1.007)+(2.058), (I-130)+(1.007)+(2.059),
(I-130)+(1.007)+(3.001), (I-130)+(1.007)+(3.002),
(I-130)+(1.007)+(3.003), (I-130)+(1.007)+(3.004),
(I-130)+(1.007)+(3.005), (I-130)+(1.007)+(3.006),
(I-130)+(1.007)+(3.007), (I-130)+(1.007)+(3.008),
(I-130)+(1.007)+(3.009), (I-130)+(1.007)+(3.010),
(I-130)+(1.007)+(3.011), (I-130)+(1.007)+(3.012),
(I-130)+(1.007)+(3.013), (I-130)+(1.007)+(3.014),
(I-130)+(1.007)+(3.015), (I-130)+(1.007)+(3.016),
(I-130)+(1.007)+(3.017), (I-130)+(1.007)+(3.018),
(I-130)+(1.007)+(3.019), (I-130)+(1.007)+(3.020),
(I-130)+(1.007)+(3.021), (I-130)+(1.007)+(3.022),
(I-130)+(1.007)+(3.023), (I-130)+(1.007)+(3.024),
(I-130)+(1.007)+(3.025), (I-130)+(1.007)+(3.026),
(I-130)+(1.007)+(3.027), (I-130)+(1.007)+(3.028),
(I-130)+(1.007)+(3.029), (I-130)+(1.007)+(3.030),
(I-130)+(1.007)+(3.031), (I-130)+(1.007)+(5.001),
(I-130)+(1.007)+(5.002), (I-130)+(1.007)+(5.003),
(I-130)+(1.007)+(5.004), (I-130)+(1.007)+(5.005),
(I-130)+(1.007)+(5.006), (I-130)+(1.007)+(5.007),
(I-130)+(1.007)+(5.008), (I-130)+(1.007)+(5.009),
(I-130)+(1.007)+(5.010), (I-130)+(1.007)+(5.011),
(I-130)+(1.007)+(5.012), (I-130)+(1.007)+(5.013),
(I-130)+(1.007)+(5.014), (I-130)+(1.007)+(5.015),
(I-130)+(1.007)+(5.016), (I-130)+(1.007)+(5.017),
(I-130)+(1.007)+(5.018), (I-130)+(1.007)+(5.019), (I-130)+(1.007)+(5.020), (I-130)+(1.007)+(5.021), (I-130)+(1.007)+(5.022), (I-130)+(1.007)+(5.023), (I-130)+(1.007)+(6.001), (I-130)+(1.007)+(6.002), (I-130)+(1.007)+(6.003), (I-130)+(1.007)+(6.004), (I-130)+(1.007)+(7.001), (I-130)+(1.007)+(7.002), (I-130)+(1.007)+(7.003), (I-130)+(1.007)+(7.004), (I-130)+(1.007)+(7.005), (I-130)+(1.007)+(7.006), (I-130)+(1.007)+(9.001), (I-130)+(1.007)+(9.002), (I-130)+(1.007)+(9.003), (I-130)+(1.007)+(9.004), (I-130)+(1.007)+(9.005), (I-130)+(1.007)+(9.006), (I-130)+(1.007)+(9.007), (I-130)+(1.007)+(9.008), (I-130)+(1.007)+(9.009), (I-130)+(1.007)+(14.001), (I-130)+(1.007)+(14.002), (I-130)+(1.007)+(15.008), (I-130)+(1.007)+(15.011), (I-130)+(1.007)+(15.012), (I-130)+(1.007)+(15.016), (I-130)+(1.007)+(15.025), (I-130)+(1.007)+(15.027), (I-130)+(1.007)+(15.047), (I-130)+(1.007)+(15.063), (I-130)+(1.007)+(15.064), (I-130)+(1.007)+(16.001), (I-130)+(1.007)+(16.002), (I-130)+(1.007)+(16.003), (I-130)+(1.007)+(16.004), (I-130)+(1.007)+(16.005), (I-130)+(1.007)+(16.006), (I-130)+(1.007)+(16.007), (I-130)+(1.007)+(16.008), (I-130)+(1.007)+(17.001), (I-130)+(1.007)+(17.002), (I-130)+(1.007)+(17.003), (I-130)+(1.007)+(17.004), (I-130)+(1.007)+(17.005), (I-130)+(1.007)+(17.006), (I-130)+(1.007)+(17.007), (I-130)+(1.007)+(17.008), (I-130)+(1.007)+(17.009), (I-130)+(1.007)+(17.010), (I-130)+(1.007)+(17.011), (I-130)+(1.007)+(17.012), (I-130)+(1.007)+(18.001), (I-130)+(1.008)+(1.009), (I-130)+(1.008)+(1.010), (I-130)+(1.008)+(1.011), (I-130)+(1.008)+(1.012), (I-130)+(1.008)+(1.013), (I-130)+(1.008)+(1.014), (I-130)+(1.008)+(1.015), (I-130)+(1.008)+(1.016), (I-130)+(1.008)+(1.017), (I-130)+(1.008)+(1.018), (I-130)+(1.008)+(1.019), (I-130)+(1.008)+(1.020), (I-130)+(1.008)+(1.021), (I-130)+(1.008)+(1.022), (I-130)+(1.008)+(1.023), (I-130)+(1.008)+(1.024), (I-130)+(1.008)+(1.025), (I-130)+(1.008)+(1.026), (I-130)+(1.008)+(1.027), (I-130)+(1.008)+(1.028), (I-130)+(1.008)+(1.029), (I-130)+(1.008)+(1.030), (I-130)+(1.008)+(1.031), (I-130)+(1.008)+(1.032), (I-130)+(1.008)+(1.033), (I-130)+(1.008)+(1.034), (I-130)+(1.008)+(1.035), (I-130)+(1.008)+(1.036), (I-130)+(1.008)+(1.037), (I-130)+(1.008)+(1.038), (I-130)+(1.008)+(1.039), (I-130)+(1.008)+(1.040), (I-130)+(1.008)+(1.041), (I-130)+(1.008)+(1.042), (I-130)+(1.008)+(1.043), (I-130)+(1.008)+(1.044), (I-130)+(1.008)+(1.045), (I-130)+(1.008)+(1.046), (I-130)+(1.008)+(1.047), (I-130)+(1.008)+(1.048), (I-130)+(1.008)+(1.049), (I-130)+(1.008)+(1.050), (I-130)+(1.008)+(1.051), (I-130)+(1.008)+(1.052), (I-130)+(1.008)+(1.053), (I-130)+(1.008)+(1.054), (I-130)+(1.008)+(1.055), (I-130)+(1.008)+(1.056), (I-130)+(1.008)+(1.057), (I-130)+(1.008)+(1.058), (I-130)+(1.008)+(1.059), (I-130)+(1.008)+(1.060), (I-130)+(1.008)+(1.061), (I-130)+(1.008)+(1.062), (I-130)+(1.008)+(1.063), (I-130)+(1.008)+(1.064), (I-130)+(1.008)+(1.065), (I-130)+(1.008)+(1.066), (I-130)+(1.008)+(1.067), (I-130)+(1.008)+(1.068), (I-130)+(1.008)+(1.069), (I-130)+(1.008)+(1.070), (I-130)+(1.008)+(1.071), (I-130)+(1.008)+(1.072), (I-130)+(1.008)+(1.073), (I-130)+(1.008)+(1.074), (I-130)+(1.008)+(1.075), (I-130)+(1.008)+(1.076), (I-130)+(1.008)+(1.077), (I-130)+(1.008)+(1.078), (I-130)+(1.008)+(1.079), (I-130)+(1.008)+(1.080), (I-130)+(1.008)+(1.081), (I-130)+(1.008)+(1.082), (I-130)+(1.008)+(1.083), (I-130)+(1.008)+(1.084), (I-130)+(1.008)+(1.085), (I-130)+(1.008)+(1.086), (I-130)+(1.008)+(1.087), (I-130)+(1.008)+(1.088), (I-130)+(1.008)+(1.089), (I-130)+(1.008)+(1.090), (I-130)+(1.008)+(1.091), (I-130)+(1.008)+(1.092), (I-130)+(1.008)+(2.001), (I-130)+(1.008)+(2.002), (I-130)+(1.008)+(2.003), (I-130)+(1.008)+(2.004), (I-130)+(1.008)+(2.005), (I-130)+(1.008)+(2.006), (I-130)+(1.008)+(2.007), (I-130)+(1.008)+(2.008), (I-130)+(1.008)+(2.009), (I-130)+(1.008)+(2.010), (I-130)+(1.008)+(2.011), (I-130)+(1.008)+(2.012), (I-130)+(1.008)+(2.013), (I-130)+(1.008)+(2.014), (I-130)+(1.008)+(2.015), (I-130)+(1.008)+(2.016), (I-130)+(1.008)+(2.017), (I-130)+(1.008)+(2.018), (I-130)+(1.008)+(2.019), (I-130)+(1.008)+(2.020), (I-130)+(1.008)+(2.021), (I-130)+(1.008)+(2.022), (I-130)+(1.008)+(2.023), (I-130)+(1.008)+(2.024), (I-130)+(1.008)+(2.025), (I-130)+(1.008)+(2.026), (I-130)+(1.008)+(2.027), (I-130)+(1.008)+(2.028), (I-130)+(1.008)+(2.029), (I-130)+(1.008)+(2.030), (I-130)+(1.008)+(2.031), (I-130)+(1.008)+(2.032), (I-130)+(1.008)+(2.033), (I-130)+(1.008)+(2.034), (I-130)+(1.008)+(2.035), (I-130)+(1.008)+(2.036), (I-130)+(1.008)+(2.037), (I-130)+(1.008)+(2.038), (I-130)+(1.008)+(2.039), (I-130)+(1.008)+(2.040), (I-130)+(1.008)+(2.041), (I-130)+(1.008)+(2.042), (I-130)+(1.008)+(2.043), (I-130)+(1.008)+(2.044), (I-130)+(1.008)+(2.045), (I-130)+(1.008)+(2.046), (I-130)+(1.008)+(2.047), (I-130)+(1.008)+(2.048), (I-130)+(1.008)+(2.049), (I-130)+(1.008)+(2.050), (I-130)+(1.008)+(2.051), (I-130)+(1.008)+(2.052), (I-130)+(1.008)+(2.053), (I-130)+(1.008)+(2.054), (I-130)+(1.008)+(2.055), (I-130)+(1.008)+(2.056), (I-130)+(1.008)+(2.057), (I-130)+(1.008)+(2.058), (I-130)+(1.008)+(2.059), (I-130)+(1.008)+(3.001), (I-130)+(1.008)+(3.002), (I-130)+(1.008)+(3.003), (I-130)+(1.008)+(3.004), (I-130)+(1.008)+(3.005), (I-130)+(1.008)+(3.006), (I-130)+(1.008)+(3.007), (I-130)+(1.008)+(3.008), (I-130)+(1.008)+(3.009), (I-130)+(1.008)+(3.010), (I-130)+(1.008)+(3.011), (I-130)+(1.008)+(3.012), (I-130)+(1.008)+(3.013), (I-130)+(1.008)+(3.014), (I-130)+(1.008)+(3.015), (I-130)+(1.008)+(3.016), (I-130)+(1.008)+(3.017), (I-130)+(1.008)+(3.018), (I-130)+(1.008)+(3.019), (I-130)+(1.008)+(3.020), (I-130)+(1.008)+(3.021), (I-130)+(1.008)+(3.022), (I-130)+(1.008)+(3.023), (I-130)+(1.008)+(3.024), (I-130)+(1.008)+(3.025), (I-130)+(1.008)+(3.026), (I-130)+(1.008)+(3.027), (I-130)+(1.008)+(3.028), (I-130)+(1.008)+(3.029), (I-130)+(1.008)+(3.030), (I-130)+(1.008)+(3.031), (I-130)+(1.008)+(5.001), (I-130)+(1.008)+(5.002), (I-130)+(1.008)+(5.003), (I-130)+(1.008)+(5.004), (I-130)+(1.008)+(5.005), (I-130)+(1.008)+(5.006), (I-130)+(1.008)+(5.007), (I-130)+(1.008)+(5.008), (I-130)+(1.008)+(5.009), (I-130)+(1.008)+(5.010), (I-130)+(1.008)+(5.011), (I-130)+(1.008)+(5.012), (I-130)+(1.008)+(5.013), (I-130)+(1.008)+(5.014), (I-130)+(1.008)+(5.015), (I-130)+(1.008)+(5.016), (I-130)+(1.008)+(5.017), (I-130)+(1.008)+(5.018), (I-130)+(1.008)+(5.019), (I-130)+(1.008)+(5.020), (I-130)+(1.008)+(5.021), (I-130)+(1.008)+(5.022), (I-130)+(1.008)+(5.023), (I-130)+(1.008)+(6.001), (I-130)+(1.008)+(6.002), (I-130)+(1.008)+(6.003), (I-130)+(1.008)+(6.004), (I-130)+(1.008)+(7.001), (I-130)+(1.008)+(7.002), (I-130)+(1.008)+(7.003), (I-130)+(1.008)+(7.004), (I-130)+(1.008)+(7.005), (I-130)+(1.008)+(7.006), (I-130)+(1.008)+(9.001), (I-130)+(1.008)+(9.002), (I-130)+(1.008)+(9.003), (I-130)+(1.008)+(9.004), (I-130)+(1.008)+(9.005), (I-130)+(1.008)+(9.006), (I-130)+(1.008)+(9.007), (I-130)+(1.008)+(9.008), (I-130)+(1.008)+(9.009), (I-130)+(1.008)+(14.001), (I-130)+(1.008)+(14.002), (I-130)+(1.008)+(15.008), (I-130)+(1.008)+(15.011), (I-130)+(1.008)+(15.012), (I-130)+(1.008)+(15.016), (I-130)+(1.008)+(15.025), (I-130)+(1.008)+(15.027), (I-130)+(1.008)+(15.047), (I-130)+(1.008)+(15.063), (I-130)+(1.008)+(15.064), (I-130)+(1.008)+(16.001), (I-130)+(1.008)+(16.002), (I-130)+(1.008)+(16.003), (I-130)+(1.008)+(16.004), (I-130)+(1.008)+(16.005), (I-130)+(1.008)+(16.006), (I-130)+(1.008)+(16.007), (I-130)+(1.008)+(16.008), (I-130)+(1.008)+(17.001), (I-130)+(1.008)+(17.002), (I-130)+(1.008)+(17.003), (I-130)+(1.008)+(17.004), (I-130)+(1.008)+(17.005), (I-130)+(1.008)+(17.006), (I-130)+(1.008)+(17.007), (I-130)+(1.008)+(17.008), (I-130)+(1.008)+(17.009), (I-130)+(1.008)+(17.010), (I-130)+(1.008)+(17.011), (I-130)+(1.008)+(17.012), (I-130)+(1.008)+(18.001), (I-130)+(1.009)+(1.010), (I-130)+(1.009)+(1.011), (I-130)+(1.009)+(1.012), (I-130)+(1.009)+(1.013), (I-130)+(1.009)+(1.014), (I-130)+(1.009)+(1.015), (I-130)+(1.009)+(1.016), (I-130)+(1.009)+(1.017), (I-130)+(1.009)+(1.018), (I-130)+(1.009)+(1.019), (I-130)+(1.009)+(1.020), (I-130)+(1.009)+(1.021), (I-130)+(1.009)+(1.022), (I-130)+(1.009)+(1.023), (I-130)+(1.009)+(1.024), (I-130)+(1.009)+(1.025), (I-130)+(1.009)+(1.026), (I-130)+(1.009)+(1.027), (I-130)+(1.009)+(1.028), (I-130)+(1.009)+(1.029), (I-130)+(1.009)+(1.030), (I-130)+(1.009)+(1.031), (I-130)+(1.009)+(1.032), (I-130)+(1.009)+(1.033), (I-130)+(1.009)+(1.034), (I-130)+(1.009)+(1.035), (I-130)+(1.009)+(1.036), (I-130)+(1.009)+(1.037), (I-130)+(1.009)+(1.038), (I-130)+(1.009)+(1.039), (I-130)+(1.009)+(1.040), (I-130)+(1.009)+(1.041), (I-130)+(1.009)+(1.042), (I-130)+(1.009)+(1.043), (I-130)+(1.009)+(1.044), (I-130)+(1.009)+(1.045), (I-130)+(1.009)+(1.046), (I-130)+(1.009)+(1.047), (I-130)+(1.009)+(1.048), (I-130)+(1.009)+(1.049), (I-130)+(1.009)+(1.050), (I-130)+(1.009)+(1.051), (I-130)+(1.009)+(1.052), (I-130)+(1.009)+(1.053), (I-130)+(1.009)+(1.054), (I-130)+(1.009)+(1.055), (I-130)+(1.009)+(1.056), (I-130)+(1.009)+(1.057), (I-130)+(1.009)+(1.058), (I-130)+(1.009)+(1.059), (I-130)+(1.009)+(1.060), (I-130)+(1.009)+(1.061), (I-130)+(1.009)+(1.062), (I-130)+(1.009)+(1.063), (I-130)+(1.009)+(1.064), (I-130)+(1.009)+(1.065), (I-130)+(1.009)+(1.066), (I-130)+(1.009)+(1.067), (I-130)+(1.009)+(1.068), (I-130)+(1.009)+(1.069), (I-130)+(1.009)+(1.070), (I-130)+(1.009)+(1.071), (I-130)+(1.009)+(1.072), (I-130)+(1.009)+(1.073), (I-130)+(1.009)+(1.074), (I-130)+(1.009)+(1.075), (I-130)+(1.009)+(1.076), (I-130)+(1.009)+(1.077), (I-130)+(1.009)+(1.078), (I-130)+(1.009)+(1.079), (I-130)+(1.009)+(1.080), (I-130)+(1.009)+(1.081), (I-130)+(1.009)+(1.082), (I-130)+(1.009)+(1.083), (I-130)+(1.009)+(1.084), (I-130)+(1.009)+(1.085), (I-130)+(1.009)+(1.086), (I-130)+(1.009)+(1.087), (I-130)+(1.009)+(1.088), (I-130)+(1.009)+(1.089), (I-130)+(1.009)+(1.090), (I-130)+(1.009)+(1.091), (I-130)+(1.009)+(1.092), (I-130)+(1.009)+(2.001), (I-130)+(1.009)+(2.002), (I-130)+(1.009)+(2.003), (I-130)+(1.009)+(2.004), (I-130)+(1.009)+(2.005), (I-130)+(1.009)+(2.006), (I-130)+(1.009)+(2.007), (I-130)+(1.009)+(2.008), (I-130)+(1.009)+(2.009), (I-130)+(1.009)+(2.010), (I-130)+(1.009)+(2.011), (I-130)+(1.009)+(2.012), (I-130)+(1.009)+(2.013), (I-130)+(1.009)+(2.014), (I-130)+(1.009)+(2.015), (I-130)+(1.009)+(2.016), (I-130)+(1.009)+(2.017), (I-130)+(1.009)+(2.018), (I-130)+(1.009)+(2.019), (I-130)+(1.009)+(2.020), (I-130)+(1.009)+(2.021), (I-130)+(1.009)+(2.022), (I-130)+(1.009)+(2.023), (I-130)+(1.009)+(2.024), (I-130)+(1.009)+(2.025), (I-130)+(1.009)+(2.026), (I-130)+(1.009)+(2.027), (I-130)+(1.009)+(2.028), (I-130)+(1.009)+(2.029), (I-130)+(1.009)+(2.030), (I-130)+(1.009)+(2.031), (I-130)+(1.009)+(2.032), (I-130)+(1.009)+(2.033), (I-130)+(1.009)+(2.034), (I-130)+(1.009)+(2.035), (I-130)+(1.009)+(2.036), (I-130)+(1.009)+(2.037), (I-130)+(1.009)+(2.038), (I-130)+(1.009)+(2.039), (I-130)+(1.009)+(2.040), (I-130)+(1.009)+(2.041), (I-130)+(1.009)+(2.042), (I-130)+(1.009)+(2.043), (I-130)+(1.009)+(2.044), (I-130)+(1.009)+(2.045), (I-130)+(1.009)+(2.046), (I-130)+(1.009)+(2.047), (I-130)+(1.009)+(2.048), (I-130)+(1.009)+(2.049), (I-130)+(1.009)+(2.050), (I-130)+(1.009)+(2.051), (I-130)+(1.009)+(2.052), (I-130)+(1.009)+(2.053), (I-130)+(1.009)+(2.054), (I-130)+(1.009)+(2.055), (I-130)+(1.009)+(2.056), (I-130)+(1.009)+(2.057), (I-130)+(1.009)+(2.058), (I-130)+(1.009)+(2.059), (I-130)+(1.009)+(3.001), (I-130)+(1.009)+(3.002), (I-130)+(1.009)+(3.003), (I-130)+(1.009)+(3.004), (I-130)+(1.009)+(3.005), (I-130)+(1.009)+(3.006), (I-130)+(1.009)+(3.007), (I-130)+(1.009)+(3.008), (I-130)+(1.009)+(3.009), (I-130)+(1.009)+(3.010), (I-130)+(1.009)+(3.011), (I-130)+(1.009)+(3.012), (I-130)+(1.009)+(3.013), (I-130)+(1.009)+(3.014), (I-130)+(1.009)+(3.015), (I-130)+(1.009)+(3.016), (I-130)+(1.009)+(3.017), (I-130)+(1.009)+(3.018), (I-130)+(1.009)+(3.019), (I-130)+(1.009)+(3.020), (I-130)+(1.009)+(3.021), (I-130)+(1.009)+(3.022), (I-130)+(1.009)+(3.023), (I-130)+(1.009)+(3.024), (I-130)+(1.009)+(3.025), (I-130)+(1.009)+(3.026), (I-130)+(1.009)+(3.027), (I-130)+(1.009)+(3.028), (I-130)+(1.009)+(3.029), (I-130)+(1.009)+(3.030), (I-130)+(1.009)+(3.031), (I-130)+(1.009)+(5.001), (I-130)+(1.009)+(5.002), (I-130)+(1.009)+(5.003), (I-130)+(1.009)+(5.004), (I-130)+(1.009)+(5.005), (I-130)+(1.009)+(5.006), (I-130)+(1.009)+(5.007), (I-130)+(1.009)+(5.008), (I-130)+(1.009)+(5.009), (I-130)+(1.009)+(5.010), (I-130)+(1.009)+(5.011), (I-130)+(1.009)+(5.012), (I-130)+(1.009)+(5.013), (I-130)+(1.009)+(5.014), (I-130)+(1.009)+(5.015), (I-130)+(1.009)+(5.016), (I-130)+(1.009)+(5.017), (I-130)+(1.009)+(5.018), (I-130)+(1.009)+(5.019), (I-130)+(1.009)+(5.020), (I-130)+(1.009)+(5.021), (I-130)+(1.009)+(5.022), (I-130)+(1.009)+(5.023), (I-130)+(1.009)+(6.001), (I-130)+(1.009)+(6.002), (I-130)+(1.009)+(6.003), (I-130)+(1.009)+(6.004), (I-130)+(1.009)+(7.001), (I-130)+(1.009)+(7.002), (I-130)+(1.009)+(7.003), (I-130)+(1.009)+(7.004), (I-130)+(1.009)+(7.005), (I-130)+(1.009)+(7.006), (I-130)+(1.009)+(9.001), (I-130)+(1.009)+(9.002), (I-130)+(1.009)+(9.003), (I-130)+(1.009)+(9.004), (I-130)+(1.009)+(9.005), (I-130)+(1.009)+(9.006), (I-130)+(1.009)+(9.007), (I-130)+(1.009)+(9.008), (I-130)+(1.009)+(9.009), (I-130)+(1.009)+(14.001), (I-130)+(1.009)+(14.002), (I-130)+(1.009)+(15.008), (I-130)+(1.009)+(15.011), (I-130)+(1.009)+(15.012), (I-130)+(1.009)+(15.016), (I-130)+(1.009)+(15.025), (I-130)+(1.009)+(15.027), (I-130)+(1.009)+(15.047), (I-130)+(1.009)+(15.063), (I-130)+(1.009)+(15.064), (I-130)+(1.009)+(16.001), (I-130)+(1.009)+(16.002), (I-130)+(1.009)+(16.003), (I-130)+(1.009)+(16.004), (I-130)+(1.009)+(16.005), (I-130)+(1.009)+(16.006), (I-130)+(1.009)+(16.007), (I-130)+(1.009)+(16.008), (I-130)+(1.009)+(17.001), (I-130)+(1.009)+(17.002), (I-130)+(1.009)+(17.003), (I-130)+(1.009)+(17.004), (I-130)+(1.009)+(17.005), (I-130)+(1.009)+(17.006), (I-130)+(1.009)+(17.007), (I-130)+(1.009)+(17.008), (I-130)+(1.009)+(17.009), (I-130)+(1.009)+(17.010), (I-130)+(1.009)+(17.011), (I-130)+(1.009)+(17.012), (I-130)+(1.009)+(18.001), (I-130)+(1.010)+(1.011), (I-130)+(1.010)+(1.012), (I-130)+(1.010)+(1.013), (I-130)+(1.010)+(1.014), (I-130)+(1.010)+(1.015), (I-130)+(1.010)+(1.016), (I-130)+(1.010)+(1.017), (I-130)+(1.010)+(1.018), (I-130)+(1.010)+(1.019), (I-130)+(1.010)+(1.020), (I-130)+(1.010)+(1.021), (I-130)+(1.010)+(1.022), (I-130)+(1.010)+(1.023), (I-130)+(1.010)+(1.024), (I-130)+(1.010)+(1.025), (I-130)+(1.010)+(1.026), (I-130)+(1.010)+(1.027), (I-130)+(1.010)+(1.028), (I-130)+(1.010)+(1.029), (I-130)+(1.010)+(1.030), (I-130)+(1.010)+(1.031), (I-130)+(1.010)+(1.032), (I-130)+(1.010)+(1.033), (I-130)+(1.010)+(1.034), (I-130)+(1.010)+(1.035), (I-130)+(1.010)+(1.036), (I-130)+(1.010)+(1.037), (I-130)+(1.010)+(1.038), (I-130)+(1.010)+(1.039), (I-130)+(1.010)+(1.040), (I-130)+(1.010)+(1.041), (I-130)+(1.010)+(1.042), (I-130)+(1.010)+(1.043), (I-130)+(1.010)+(1.044), (I-130)+(1.010)+(1.045), (I-130)+(1.010)+(1.046), (I-130)+(1.010)+(1.047), (I-130)+(1.010)+(1.048), (I-130)+(1.010)+(1.049), (I-130)+(1.010)+(1.050), (I-130)+(1.010)+(1.051), (I-130)+(1.010)+(1.052), (I-130)+(1.010)+(1.053), (I-130)+(1.010)+(1.054), (I-130)+(1.010)+(1.055), (I-130)+(1.010)+(1.056), (I-130)+(1.010)+(1.057), (I-130)+(1.010)+(1.058), (I-130)+(1.010)+(1.059), (I-130)+(1.010)+(1.060), (I-130)+(1.010)+(1.061), (I-130)+(1.010)+(1.062), (I-130)+(1.010)+(1.063), (I-130)+(1.010)+(1.064), (I-130)+(1.010)+(1.065), (I-130)+(1.010)+(1.066), (I-130)+(1.010)+(1.067), (I-130)+(1.010)+(1.068), (I-130)+(1.010)+(1.069), (I-130)+(1.010)+(1.070), (I-130)+(1.010)+(1.071), (I-130)+(1.010)+(1.072), (I-130)+(1.010)+(1.073), (I-130)+(1.010)+(1.074), (I-130)+(1.010)+(1.075), (I-130)+(1.010)+(1.076), (I-130)+(1.010)+(1.077), (I-130)+(1.010)+(1.078), (I-130)+(1.010)+(1.079), (I-130)+(1.010)+(1.080), (I-130)+(1.010)+(1.081), (I-130)+(1.010)+(1.082), (I-130)+(1.010)+(1.083), (I-130)+(1.010)+(1.084), (I-130)+(1.010)+(1.085), (I-130)+(1.010)+(1.086), (I-130)+(1.010)+(1.087), (I-130)+(1.010)+(1.088), (I-130)+(1.010)+(1.089), (I-130)+(1.010)+(1.090), (I-130)+(1.010)+(1.091), (I-130)+(1.010)+(1.092), (I-130)+(1.010)+(2.001), (I-130)+(1.010)+(2.002), (I-130)+(1.010)+(2.003), (I-130)+(1.010)+(2.004), (I-130)+(1.010)+(2.005), (I-130)+(1.010)+(2.006), (I-130)+(1.010)+(2.007), (I-130)+(1.010)+(2.008), (I-130)+(1.010)+(2.009), (I-130)+(1.010)+(2.010), (I-130)+(1.010)+(2.011), (I-130)+(1.010)+(2.012), (I-130)+(1.010)+(2.013), (I-130)+(1.010)+(2.014), (I-130)+(1.010)+(2.015), (I-130)+(1.010)+(2.016), (I-130)+(1.010)+(2.017), (I-130)+(1.010)+(2.018), (I-130)+(1.010)+(2.019), (I-130)+(1.010)+(2.020), (I-130)+(1.010)+(2.021), (I-130)+(1.010)+(2.022), (I-130)+(1.010)+(2.023), (I-130)+(1.010)+(2.024), (I-130)+(1.010)+(2.025), (I-130)+(1.010)+(2.026), (I-130)+(1.010)+(2.027), (I-130)+(1.010)+(2.028), (I-130)+(1.010)+(2.029), (I-130)+(1.010)+(2.030), (I-130)+(1.010)+(2.031), (I-130)+(1.010)+(2.032), (I-130)+(1.010)+(2.033), (I-130)+(1.010)+(2.034), (I-130)+(1.010)+(2.035), (I-130)+(1.010)+(2.036), (I-130)+(1.010)+(2.037), (I-130)+(1.010)+(2.038), (I-130)+(1.010)+(2.039), (I-130)+(1.010)+(2.040), (I-130)+(1.010)+(2.041), (I-130)+(1.010)+(2.042), (I-130)+(1.010)+(2.043), (I-130)+(1.010)+(2.044), (I-130)+(1.010)+(2.045), (I-130)+(1.010)+(2.046), (I-130)+(1.010)+(2.047), (I-130)+(1.010)+(2.048), (I-130)+(1.010)+(2.049), (I-130)+(1.010)+(2.050), (I-130)+(1.010)+(2.051), (I-130)+(1.010)+(2.052), (I-130)+(1.010)+(2.053), (I-130)+(1.010)+(2.054), (I-130)+(1.010)+(2.055), (I-130)+(1.010)+(2.056), (I-130)+(1.010)+(2.057), (I-130)+(1.010)+(2.058), (I-130)+(1.010)+(2.059), (I-130)+(1.010)+(3.001), (I-130)+(1.010)+(3.002), (I-130)+(1.010)+(3.003), (I-130)+(1.010)+(3.004), (I-130)+(1.010)+(3.005), (I-130)+(1.010)+(3.006), (I-130)+(1.010)+(3.007), (I-130)+(1.010)+(3.008), (I-130)+(1.010)+(3.009), (I-130)+(1.010)+(3.010), (I-130)+(1.010)+(3.011), (I-130)+(1.010)+(3.012), (I-130)+(1.010)+(3.013), (I-130)+(1.010)+(3.014), (I-130)+(1.010)+(3.015), (I-130)+(1.010)+(3.016), (I-130)+(1.010)+(3.017), (I-130)+(1.010)+(3.018), (I-130)+(1.010)+(3.019), (I-130)+(1.010)+(3.020), (I-130)+(1.010)+(3.021), (I-130)+(1.010)+(3.022), (I-130)+(1.010)+(3.023), (I-130)+(1.010)+(3.024), (I-130)+(1.010)+(3.025), (I-130)+(1.010)+(3.026), (I-130)+(1.010)+(3.027), (I-130)+(1.010)+(3.028), (I-130)+(1.010)+(3.029), (I-130)+(1.010)+(3.030), (I-130)+(1.010)+(3.031), (I-130)+(1.010)+(5.001), (I-130)+(1.010)+(5.002), (I-130)+(1.010)+(5.003), (I-130)+(1.010)+(5.004), (I-130)+(1.010)+(5.005), (I-130)+(1.010)+(5.006), (I-130)+(1.010)+(5.007), (I-130)+(1.010)+(5.008), (I-130)+(1.010)+(5.009), (I-130)+(1.010)+(5.010), (I-130)+(1.010)+(5.011), (I-130)+(1.010)+(5.012), (I-130)+(1.010)+(5.013), (I-130)+(1.010)+(5.014), (I-130)+(1.010)+(5.015), (I-130)+(1.010)+(5.016), (I-130)+(1.010)+(5.017), (I-130)+(1.010)+(5.018), (I-130)+(1.010)+(5.019), (I-130)+(1.010)+(5.020), (I-130)+(1.010)+(5.021), (I-130)+(1.010)+(5.022), (I-130)+(1.010)+(5.023), (I-130)+(1.010)+(6.001), (I-130)+(1.010)+(6.002), (I-130)+(1.010)+(6.003), (I-130)+(1.010)+(6.004), (I-130)+(1.010)+(7.001), (I-130)+(1.010)+(7.002), (I-130)+(1.010)+(7.003), (I-130)+(1.010)+(7.004), (I-130)+(1.010)+(7.005), (I-130)+(1.010)+(7.006), (I-130)+(1.010)+(9.001), (I-130)+(1.010)+(9.002), (I-130)+(1.010)+(9.003), (I-130)+(1.010)+(9.004), (I-130)+(1.010)+(9.005), (I-130)+(1.010)+(9.006), (I-130)+(1.010)+(9.007), (I-130)+(1.010)+(9.008), (I-130)+(1.010)+(9.009), (I-130)+(1.010)+(14.001), (I-130)+(1.010)+(14.002), (I-130)+(1.010)+(15.008), (I-130)+(1.010)+(15.011), (I-130)+(1.010)+(15.012), (I-130)+(1.010)+(15.016), (I-130)+(1.010)+(15.025), (I-130)+(1.010)+(15.027), (I-130)+(1.010)+(15.047), (I-130)+(1.010)+(15.063), (I-130)+(1.010)+(15.064), (I-130)+(1.010)+(16.001), (I-130)+(1.010)+(16.002), (I-130)+(1.010)+(16.003), (I-130)+(1.010)+(16.004), (I-130)+(1.010)+(16.005), (I-130)+(1.010)+(16.006), (I-130)+(1.010)+(16.007), (I-130)+(1.010)+(16.008), (I-130)+(1.010)+(17.001), (I-130)+(1.010)+(17.002), (I-130)+(1.010)+(17.003), (I-130)+(1.010)+(17.004), (I-130)+(1.010)+(17.005), (I-130)+(1.010)+(17.006), (I-130)+(1.010)+(17.007), (I-130)+(1.010)+(17.008), (I-130)+(1.010)+(17.009), (I-130)+(1.010)+(17.010), (I-130)+(1.010)+(17.011), (I-130)+(1.010)+(17.012), (I-130)+(1.010)+(18.001), (I-130)+(1.011)+(1.012), (I-130)+(1.011)+(1.013), (I-130)+(1.011)+(1.014), (I-130)+(1.011)+(1.015), (I-130)+(1.011)+(1.016), (I-130)+(1.011)+(1.017), (I-130)+(1.011)+(1.018), (I-130)+(1.011)+(1.019), (I-130)+(1.011)+(1.020), (I-130)+(1.011)+(1.021), (I-130)+(1.011)+(1.022), (I-130)+(1.011)+(1.023), (I-130)+(1.011)+(1.024), (I-130)+(1.011)+(1.025), (I-130)+(1.011)+(1.026), (I-130)+(1.011)+(1.027), (I-130)+(1.011)+(1.028), (I-130)+(1.011)+(1.029), (I-130)+(1.011)+(1.030), (I-130)+(1.011)+(1.031), (I-130)+(1.011)+(1.032), (I-130)+(1.011)+(1.033), (I-130)+(1.011)+(1.034), (I-130)+(1.011)+(1.035), (I-130)+(1.011)+(1.036), (I-130)+(1.011)+(1.037), (I-130)+(1.011)+(1.038), (I-130)+(1.011)+(1.039), (I-130)+(1.011)+(1.040), (I-130)+(1.011)+(1.041), (I-130)+(1.011)+(1.042), (I-130)+(1.011)+(1.043), (I-130)+(1.011)+(1.044), (I-130)+(1.011)+(1.045), (I-130)+(1.011)+(1.046), (I-130)+(1.011)+(1.047), (I-130)+(1.011)+(1.048), (I-130)+(1.011)+(1.049), (I-130)+(1.011)+(1.050), (I-130)+(1.011)+(1.051), (I-130)+(1.011)+(1.052), (I-130)+(1.011)+(1.053), (I-130)+(1.011)+(1.054), (I-130)+(1.011)+(1.055), (I-130)+(1.011)+(1.056), (I-130)+(1.011)+(1.057), (I-130)+(1.011)+(1.058), (I-130)+(1.011)+(1.059), (I-130)+(1.011)+(1.060), (I-130)+(1.011)+(1.061), (I-130)+(1.011)+(1.062), (I-130)+(1.011)+(1.063), (I-130)+(1.011)+(1.064), (I-130)+(1.011)+(1.065), (I-130)+(1.011)+(1.066), (I-130)+(1.011)+(1.067), (I-130)+(1.011)+(1.068), (I-130)+(1.011)+(1.069), (I-130)+(1.011)+(1.070), (I-130)+(1.011)+(1.071), (I-130)+(1.011)+(1.072), (I-130)+(1.011)+(1.073), (I-130)+(1.011)+(1.074), (I-130)+(1.011)+(1.075), (I-130)+(1.011)+(1.076), (I-130)+(1.011)+(1.077), (I-130)+(1.011)+(1.078), (I-130)+(1.011)+(1.079), (I-130)+(1.011)+(1.080), (I-130)+(1.011)+(1.081), (I-130)+(1.011)+(1.082), (I-130)+(1.011)+(1.083), (I-130)+(1.011)+(1.084), (I-130)+(1.011)+(1.085), (I-130)+(1.011)+(1.086), (I-130)+(1.011)+(1.087), (I-130)+(1.011)+(1.088), (I-130)+(1.011)+(1.089), (I-130)+(1.011)+(1.090), (I-130)+(1.011)+(1.091), (I-130)+(1.011)+(1.092), (I-130)+(1.011)+(2.001), (I-130)+(1.011)+(2.002), (I-130)+(1.011)+(2.003), (I-130)+(1.011)+(2.004), (I-130)+(1.011)+(2.005), (I-130)+(1.011)+(2.006), (I-130)+(1.011)+(2.007), (I-130)+(1.011)+(2.008), (I-130)+(1.011)+(2.009), (I-130)+(1.011)+(2.010), (I-130)+(1.011)+(2.011), (I-130)+(1.011)+(2.012), (I-130)+(1.011)+(2.013), (I-130)+(1.011)+(2.014), (I-130)+(1.011)+(2.015), (I-130)+(1.011)+(2.016), (I-130)+(1.011)+(2.017), (I-130)+(1.011)+(2.018), (I-130)+(1.011)+(2.019), (I-130)+(1.011)+(2.020), (I-130)+(1.011)+(2.021), (I-130)+(1.011)+(2.022), (I-130)+(1.011)+(2.023), (I-130)+(1.011)+(2.024), (I-130)+(1.011)+(2.025), (I-130)+(1.011)+(2.026), (I-130)+(1.011)+(2.027), (I-130)+(1.011)+(2.028), (I-130)+(1.011)+(2.029), (I-130)+(1.011)+(2.030), (I-130)+(1.011)+(2.031), (I-130)+(1.011)+(2.032), (I-130)+(1.011)+(2.033), (I-130)+(1.011)+(2.034), (I-130)+(1.011)+(2.035), (I-130)+(1.011)+(2.036), (I-130)+(1.011)+(2.037), (I-130)+(1.011)+(2.038), (I-130)+(1.011)+(2.039), (I-130)+(1.011)+(2.040), (I-130)+(1.011)+(2.041), (I-130)+(1.011)+(2.042), (I-130)+(1.011)+(2.043), (I-130)+(1.011)+(2.044), (I-130)+(1.011)+(2.045), (I-130)+(1.011)+(2.046), (I-130)+(1.011)+(2.047), (I-130)+(1.011)+(2.048), (I-130)+(1.011)+(2.049), (I-130)+(1.011)+(2.050), (I-130)+(1.011)+(2.051), (I-130)+(1.011)+(2.052), (I-130)+(1.011)+(2.053), (I-130)+(1.011)+(2.054), (I-130)+(1.011)+(2.055), (I-130)+(1.011)+(2.056), (I-130)+(1.011)+(2.057), (I-130)+(1.011)+(2.058), (I-130)+(1.011)+(2.059), (I-130)+(1.011)+(3.001), (I-130)+(1.011)+(3.002), (I-130)+(1.011)+(3.003), (I-130)+(1.011)+(3.004), (I-130)+(1.011)+(3.005), (I-130)+(1.011)+(3.006), (I-130)+(1.011)+(3.007), (I-130)+(1.011)+(3.008), (I-130)+(1.011)+(3.009), (I-130)+(1.011)+(3.010), (I-130)+(1.011)+(3.011), (I-130)+(1.011)+(3.012), (I-130)+(1.011)+(3.013), (I-130)+(1.011)+(3.014), (I-130)+(1.011)+(3.015), (I-130)+(1.011)+(3.016), (I-130)+(1.011)+(3.017), (I-130)+(1.011)+(3.018), (I-130)+(1.011)+(3.019), (I-130)+(1.011)+(3.020), (I-130)+(1.011)+(3.021), (I-130)+(1.011)+(3.022), (I-130)+(1.011)+(3.023), (I-130)+(1.011)+(3.024), (I-130)+(1.011)+(3.025), (I-130)+(1.011)+(3.026), (I-130)+(1.011)+(3.027), (I-130)+(1.011)+(3.028), (I-130)+(1.011)+(3.029), (I-130)+(1.011)+(3.030), (I-130)+(1.011)+(3.031), (I-130)+(1.011)+(5.001), (I-130)+(1.011)+(5.002), (I-130)+(1.011)+(5.003), (I-130)+(1.011)+(5.004), (I-130)+(1.011)+(5.005), (I-130)+(1.011)+(5.006), (I-130)+(1.011)+(5.007), (I-130)+(1.011)+(5.008), (I-130)+(1.011)+(5.009), (I-130)+(1.011)+(5.010), (I-130)+(1.011)+(5.011), (I-130)+(1.011)+(5.012), (I-130)+(1.011)+(5.013), (I-130)+(1.011)+(5.014), (I-130)+(1.011)+(5.015), (I-130)+(1.011)+(5.016), (I-130)+(1.011)+(5.017), (I-130)+(1.011)+(5.018), (I-130)+(1.011)+(5.019), (I-130)+(1.011)+(5.020), (I-130)+(1.011)+(5.021), (I-130)+(1.011)+(5.022), (I-130)+(1.011)+(5.023), (I-130)+(1.011)+(6.001), (I-130)+(1.011)+(6.002), (I-130)+(1.011)+(6.003), (I-130)+(1.011)+(6.004), (I-130)+(1.011)+(7.001), (I-130)+(1.011)+(7.002), (I-130)+(1.011)+(7.003), (I-130)+(1.011)+(7.004), (I-130)+(1.011)+(7.005), (I-130)+(1.011)+(7.006), (I-130)+(1.011)+(9.001), (I-130)+(1.011)+(9.002), (I-130)+(1.011)+(9.003), (I-130)+(1.011)+(9.004), (I-130)+(1.011)+(9.005), (I-130)+(1.011)+(9.006), (I-130)+(1.011)+(9.007), (I-130)+(1.011)+(9.008), (I-130)+(1.011)+(9.009), (I-130)+(1.011)+(14.001), (I-130)+(1.011)+(14.002), (I-130)+(1.011)+(15.008), (I-130)+(1.011)+(15.011), (I-130)+(1.011)+(15.012), (I-130)+(1.011)+(15.016), (I-130)+(1.011)+(15.025), (I-130)+(1.011)+(15.027), (I-130)+(1.011)+(15.047), (I-130)+(1.011)+(15.063), (I-130)+(1.011)+(15.064), (I-130)+(1.011)+(16.001), (I-130)+(1.011)+(16.002), (I-130)+(1.011)+(16.003), (I-130)+(1.011)+(16.004), (I-130)+(1.011)+(16.005), (I-130)+(1.011)+(16.006), (I-130)+(1.011)+(16.007), (I-130)+(1.011)+(16.008), (I-130)+(1.011)+(17.001), (I-130)+(1.011)+(17.002), (I-130)+(1.011)+(17.003), (I-130)+(1.011)+(17.004), (I-130)+(1.011)+(17.005), (I-130)+(1.011)+(17.006), (I-130)+(1.011)+(17.007), (I-130)+(1.011)+(17.008), (I-130)+(1.011)+(17.009), (I-130)+(1.011)+(17.010), (I-130)+(1.011)+(17.011), (I-130)+(1.011)+(17.012), (I-130)+(1.011)+(18.001), (I-130)+(1.012)+(1.013), (I-130)+(1.012)+(1.014), (I-130)+(1.012)+(1.015), (I-130)+(1.012)+(1.016), (I-130)+(1.012)+(1.017), (I-130)+(1.012)+(1.018), (I-130)+(1.012)+(1.019), (I-130)+(1.012)+(1.020), (I-130)+(1.012)+(1.021), (I-130)+(1.012)+(1.022), (I-130)+(1.012)+(1.023), (I-130)+(1.012)+(1.024), (I-130)+(1.012)+(1.025), (I-130)+(1.012)+(1.026), (I-130)+(1.012)+(1.027), (I-130)+(1.012)+(1.028), (I-130)+(1.012)+(1.029), (I-130)+(1.012)+(1.030), (I-130)+(1.012)+(1.031), (I-130)+(1.012)+(1.032), (I-130)+(1.012)+(1.033), (I-130)+(1.012)+(1.034), (I-130)+(1.012)+(1.035), (I-130)+(1.012)+(1.036), (I-130)+(1.012)+(1.037), (I-130)+(1.012)+(1.038), (I-130)+(1.012)+(1.039), (I-130)+(1.012)+(1.040), (I-130)+(1.012)+(1.041), (I-130)+(1.012)+(1.042),
(I-130)+(1.012)+(1.043), (I-130)+(1.012)+(1.044),
(I-130)+(1.012)+(1.045), (I-130)+(1.012)+(1.046),
(I-130)+(1.012)+(1.047), (I-130)+(1.012)+(1.048),
(I-130)+(1.012)+(1.049), (I-130)+(1.012)+(1.050),
(I-130)+(1.012)+(1.051), (I-130)+(1.012)+(1.052),
(I-130)+(1.012)+(1.053), (I-130)+(1.012)+(1.054),
(I-130)+(1.012)+(1.055), (I-130)+(1.012)+(1.056),
(I-130)+(1.012)+(1.057), (I-130)+(1.012)+(1.058),
(I-130)+(1.012)+(1.059), (I-130)+(1.012)+(1.060),
(I-130)+(1.012)+(1.061), (I-130)+(1.012)+(1.062),
(I-130)+(1.012)+(1.063), (I-130)+(1.012)+(1.064),
(I-130)+(1.012)+(1.065), (I-130)+(1.012)+(1.066),
(I-130)+(1.012)+(1.067), (I-130)+(1.012)+(1.068),
(I-130)+(1.012)+(1.069), (I-130)+(1.012)+(1.070),
(I-130)+(1.012)+(1.071), (I-130)+(1.012)+(1.072),
(I-130)+(1.012)+(1.073), (I-130)+(1.012)+(1.074),
(I-130)+(1.012)+(1.075), (I-130)+(1.012)+(1.076),
(I-130)+(1.012)+(1.077), (I-130)+(1.012)+(1.078),
(I-130)+(1.012)+(1.079), (I-130)+(1.012)+(1.080),
(I-130)+(1.012)+(1.081), (I-130)+(1.012)+(1.082),
(I-130)+(1.012)+(1.083), (I-130)+(1.012)+(1.084),
(I-130)+(1.012)+(1.085), (I-130)+(1.012)+(1.086),
(I-130)+(1.012)+(1.087), (I-130)+(1.012)+(1.088),
(I-130)+(1.012)+(1.089), (I-130)+(1.012)+(1.090),
(I-130)+(1.012)+(1.091), (I-130)+(1.012)+(1.092),
(I-130)+(1.012)+(2.001), (I-130)+(1.012)+(2.002),
(I-130)+(1.012)+(2.003), (I-130)+(1.012)+(2.004),
(I-130)+(1.012)+(2.005), (I-130)+(1.012)+(2.006),
(I-130)+(1.012)+(2.007), (I-130)+(1.012)+(2.008),
(I-130)+(1.012)+(2.009), (I-130)+(1.012)+(2.010),
(I-130)+(1.012)+(2.011), (I-130)+(1.012)+(2.012),
(I-130)+(1.012)+(2.013), (I-130)+(1.012)+(2.014),
(I-130)+(1.012)+(2.015), (I-130)+(1.012)+(2.016),
(I-130)+(1.012)+(2.017), (I-130)+(1.012)+(2.018),
(I-130)+(1.012)+(2.019), (I-130)+(1.012)+(2.020),
(I-130)+(1.012)+(2.021), (I-130)+(1.012)+(2.022),
(I-130)+(1.012)+(2.023), (I-130)+(1.012)+(2.024),
(I-130)+(1.012)+(2.025), (I-130)+(1.012)+(2.026),
(I-130)+(1.012)+(2.027), (I-130)+(1.012)+(2.028),
(I-130)+(1.012)+(2.029), (I-130)+(1.012)+(2.030),
(I-130)+(1.012)+(2.031), (I-130)+(1.012)+(2.032),
(I-130)+(1.012)+(2.033), (I-130)+(1.012)+(2.034),
(I-130)+(1.012)+(2.035), (I-130)+(1.012)+(2.036),
(I-130)+(1.012)+(2.037), (I-130)+(1.012)+(2.038),
(I-130)+(1.012)+(2.039), (I-130)+(1.012)+(2.040),
(I-130)+(1.012)+(2.041), (I-130)+(1.012)+(2.042),
(I-130)+(1.012)+(2.043), (I-130)+(1.012)+(2.044),
(I-130)+(1.012)+(2.045), (I-130)+(1.012)+(2.046),
(I-130)+(1.012)+(2.047), (I-130)+(1.012)+(2.048),
(I-130)+(1.012)+(2.049), (I-130)+(1.012)+(2.050),
(I-130)+(1.012)+(2.051), (I-130)+(1.012)+(2.052),
(I-130)+(1.012)+(2.053), (I-130)+(1.012)+(2.054),
(I-130)+(1.012)+(2.055), (I-130)+(1.012)+(2.056),
(I-130)+(1.012)+(2.057), (I-130)+(1.012)+(2.058),
(I-130)+(1.012)+(2.059), (I-130)+(1.012)+(3.001),
(I-130)+(1.012)+(3.002), (I-130)+(1.012)+(3.003),
(I-130)+(1.012)+(3.004), (I-130)+(1.012)+(3.005),
(I-130)+(1.012)+(3.006), (I-130)+(1.012)+(3.007),
(I-130)+(1.012)+(3.008), (I-130)+(1.012)+(3.009),
(I-130)+(1.012)+(3.010), (I-130)+(1.012)+(3.011),
(I-130)+(1.012)+(3.012), (I-130)+(1.012)+(3.013),
(I-130)+(1.012)+(3.014), (I-130)+(1.012)+(3.015),
(I-130)+(1.012)+(3.016), (I-130)+(1.012)+(3.017),
(I-130)+(1.012)+(3.018), (I-130)+(1.012)+(3.019),
(I-130)+(1.012)+(3.020), (I-130)+(1.012)+(3.021),
(I-130)+(1.012)+(3.022), (I-130)+(1.012)+(3.023),
(I-130)+(1.012)+(3.024), (I-130)+(1.012)+(3.025),
(I-130)+(1.012)+(3.026), (I-130)+(1.012)+(3.027),
(I-130)+(1.012)+(3.028), (I-130)+(1.012)+(3.029),
(I-130)+(1.012)+(3.030), (I-130)+(1.012)+(3.031),
(I-130)+(1.012)+(5.001), (I-130)+(1.012)+(5.002),
(I-130)+(1.012)+(5.003), (I-130)+(1.012)+(5.004),
(I-130)+(1.012)+(5.005), (I-130)+(1.012)+(5.006),
(I-130)+(1.012)+(5.007), (I-130)+(1.012)+(5.008),
(I-130)+(1.012)+(5.009), (I-130)+(1.012)+(5.010),
(I-130)+(1.012)+(5.011), (I-130)+(1.012)+(5.012),
(I-130)+(1.012)+(5.013), (I-130)+(1.012)+(5.014),
(I-130)+(1.012)+(5.015), (I-130)+(1.012)+(5.016),
(I-130)+(1.012)+(5.017), (I-130)+(1.012)+(5.018),
(I-130)+(1.012)+(5.019), (I-130)+(1.012)+(5.020),
(I-130)+(1.012)+(5.021), (I-130)+(1.012)+(5.022),
(I-130)+(1.012)+(5.023), (I-130)+(1.012)+(6.001),
(I-130)+(1.012)+(6.002), (I-130)+(1.012)+(6.003),
(I-130)+(1.012)+(6.004), (I-130)+(1.012)+(7.001),
(I-130)+(1.012)+(7.002), (I-130)+(1.012)+(7.003),
(I-130)+(1.012)+(7.004), (I-130)+(1.012)+(7.005),
(I-130)+(1.012)+(7.006), (I-130)+(1.012)+(9.001),
(I-130)+(1.012)+(9.002), (I-130)+(1.012)+(9.003),
(I-130)+(1.012)+(9.004), (I-130)+(1.012)+(9.005),
(I-130)+(1.012)+(9.006), (I-130)+(1.012)+(9.007),
(I-130)+(1.012)+(9.008), (I-130)+(1.012)+(9.009),
(I-130)+(1.012)+(14.001), (I-130)+(1.012)+(14.002),
(I-130)+(1.012)+(15.008), (I-130)+(1.012)+(15.011),
(I-130)+(1.012)+(15.012), (I-130)+(1.012)+(15.016),
(I-130)+(1.012)+(15.025), (I-130)+(1.012)+(15.027),
(I-130)+(1.012)+(15.047), (I-130)+(1.012)+(15.063),
(I-130)+(1.012)+(15.064), (I-130)+(1.012)+(16.001),
(I-130)+(1.012)+(16.002), (I-130)+(1.012)+(16.003),
(I-130)+(1.012)+(16.004), (I-130)+(1.012)+(16.005),
(I-130)+(1.012)+(16.006), (I-130)+(1.012)+(16.007),
(I-130)+(1.012)+(16.008), (I-130)+(1.012)+(17.001),
(I-130)+(1.012)+(17.002), (I-130)+(1.012)+(17.003),
(I-130)+(1.012)+(17.004), (I-130)+(1.012)+(17.005),
(I-130)+(1.012)+(17.006), (I-130)+(1.012)+(17.007),
(I-130)+(1.012)+(17.008), (I-130)+(1.012)+(17.009),
(I-130)+(1.012)+(17.010), (I-130)+(1.012)+(17.011),
(I-130)+(1.012)+(17.012), (I-130)+(1.012)+(18.001),
(I-130)+(1.013)+(1.014), (I-130)+(1.013)+(1.015),
(I-130)+(1.013)+(1.016), (I-130)+(1.013)+(1.017),
(I-130)+(1.013)+(1.018), (I-130)+(1.013)+(1.019),
(I-130)+(1.013)+(1.020), (I-130)+(1.013)+(1.021),
(I-130)+(1.013)+(1.022), (I-130)+(1.013)+(1.023),
(I-130)+(1.013)+(1.024), (I-130)+(1.013)+(1.025),
(I-130)+(1.013)+(1.026), (I-130)+(1.013)+(1.027),
(I-130)+(1.013)+(1.028), (I-130)+(1.013)+(1.029),
(I-130)+(1.013)+(1.030), (I-130)+(1.013)+(1.031),
(I-130)+(1.013)+(1.032), (I-130)+(1.013)+(1.033),
(I-130)+(1.013)+(1.034), (I-130)+(1.013)+(1.035),
(I-130)+(1.013)+(1.036), (I-130)+(1.013)+(1.037),
(I-130)+(1.013)+(1.038), (I-130)+(1.013)+(1.039),
(I-130)+(1.013)+(1.040), (I-130)+(1.013)+(1.041),
(I-130)+(1.013)+(1.042), (I-130)+(1.013)+(1.043),
(I-130)+(1.013)+(1.044), (I-130)+(1.013)+(1.045),
(I-130)+(1.013)+(1.046), (I-130)+(1.013)+(1.047),
(I-130)+(1.013)+(1.048), (I-130)+(1.013)+(1.049),
(I-130)+(1.013)+(1.050), (I-130)+(1.013)+(1.051),
(I-130)+(1.013)+(1.052), (I-130)+(1.013)+(1.053),
(I-130)+(1.013)+(1.054), (I-130)+(1.013)+(1.055),
(I-130)+(1.013)+(1.056), (I-130)+(1.013)+(1.057),
(I-130)+(1.013)+(1.058), (I-130)+(1.013)+(1.059),
(I-130)+(1.013)+(1.060), (I-130)+(1.013)+(1.061),
(I-130)+(1.013)+(1.062), (I-130)+(1.013)+(1.063),
(I-130)+(1.013)+(1.064), (I-130)+(1.013)+(1.065), (I-130)+(1.013)+(1.066), (I-130)+(1.013)+(1.067), (I-130)+(1.013)+(1.068), (I-130)+(1.013)+(1.069), (I-130)+(1.013)+(1.070), (I-130)+(1.013)+(1.071), (I-130)+(1.013)+(1.072), (I-130)+(1.013)+(1.073), (I-130)+(1.013)+(1.074), (I-130)+(1.013)+(1.075), (I-130)+(1.013)+(1.076), (I-130)+(1.013)+(1.077), (I-130)+(1.013)+(1.078), (I-130)+(1.013)+(1.079), (I-130)+(1.013)+(1.080), (I-130)+(1.013)+(1.081), (I-130)+(1.013)+(1.082), (I-130)+(1.013)+(1.083), (I-130)+(1.013)+(1.084), (I-130)+(1.013)+(1.085), (I-130)+(1.013)+(1.086), (I-130)+(1.013)+(1.087), (I-130)+(1.013)+(1.088), (I-130)+(1.013)+(1.089), (I-130)+(1.013)+(1.090), (I-130)+(1.013)+(1.091), (I-130)+(1.013)+(1.092), (I-130)+(1.013)+(2.001), (I-130)+(1.013)+(2.002), (I-130)+(1.013)+(2.003), (I-130)+(1.013)+(2.004), (I-130)+(1.013)+(2.005), (I-130)+(1.013)+(2.006), (I-130)+(1.013)+(2.007), (I-130)+(1.013)+(2.008), (I-130)+(1.013)+(2.009), (I-130)+(1.013)+(2.010), (I-130)+(1.013)+(2.011), (I-130)+(1.013)+(2.012), (I-130)+(1.013)+(2.013), (I-130)+(1.013)+(2.014), (I-130)+(1.013)+(2.015), (I-130)+(1.013)+(2.016), (I-130)+(1.013)+(2.017), (I-130)+(1.013)+(2.018), (I-130)+(1.013)+(2.019), (I-130)+(1.013)+(2.020), (I-130)+(1.013)+(2.021), (I-130)+(1.013)+(2.022), (I-130)+(1.013)+(2.023), (I-130)+(1.013)+(2.024), (I-130)+(1.013)+(2.025), (I-130)+(1.013)+(2.026), (I-130)+(1.013)+(2.027), (I-130)+(1.013)+(2.028), (I-130)+(1.013)+(2.029), (I-130)+(1.013)+(2.030), (I-130)+(1.013)+(2.031), (I-130)+(1.013)+(2.032), (I-130)+(1.013)+(2.033), (I-130)+(1.013)+(2.034), (I-130)+(1.013)+(2.035), (I-130)+(1.013)+(2.036), (I-130)+(1.013)+(2.037), (I-130)+(1.013)+(2.038), (I-130)+(1.013)+(2.039), (I-130)+(1.013)+(2.040), (I-130)+(1.013)+(2.041), (I-130)+(1.013)+(2.042), (I-130)+(1.013)+(2.043), (I-130)+(1.013)+(2.044), (I-130)+(1.013)+(2.045), (I-130)+(1.013)+(2.046), (I-130)+(1.013)+(2.047), (I-130)+(1.013)+(2.048), (I-130)+(1.013)+(2.049), (I-130)+(1.013)+(2.050), (I-130)+(1.013)+(2.051), (I-130)+(1.013)+(2.052), (I-130)+(1.013)+(2.053), (I-130)+(1.013)+(2.054), (I-130)+(1.013)+(2.055), (I-130)+(1.013)+(2.056), (I-130)+(1.013)+(2.057), (I-130)+(1.013)+(2.058), (I-130)+(1.013)+(2.059), (I-130)+(1.013)+(3.001), (I-130)+(1.013)+(3.002), (I-130)+(1.013)+(3.003), (I-130)+(1.013)+(3.004), (I-130)+(1.013)+(3.005), (I-130)+(1.013)+(3.006), (I-130)+(1.013)+(3.007), (I-130)+(1.013)+(3.008), (I-130)+(1.013)+(3.009), (I-130)+(1.013)+(3.010), (I-130)+(1.013)+(3.011), (I-130)+(1.013)+(3.012), (I-130)+(1.013)+(3.013), (I-130)+(1.013)+(3.014), (I-130)+(1.013)+(3.015), (I-130)+(1.013)+(3.016), (I-130)+(1.013)+(3.017), (I-130)+(1.013)+(3.018), (I-130)+(1.013)+(3.019), (I-130)+(1.013)+(3.020), (I-130)+(1.013)+(3.021), (I-130)+(1.013)+(3.022), (I-130)+(1.013)+(3.023), (I-130)+(1.013)+(3.024), (I-130)+(1.013)+(3.025), (I-130)+(1.013)+(3.026), (I-130)+(1.013)+(3.027), (I-130)+(1.013)+(3.028), (I-130)+(1.013)+(3.029), (I-130)+(1.013)+(3.030), (I-130)+(1.013)+(3.031), (I-130)+(1.013)+(5.001), (I-130)+(1.013)+(5.002), (I-130)+(1.013)+(5.003), (I-130)+(1.013)+(5.004), (I-130)+(1.013)+(5.005), (I-130)+(1.013)+(5.006), (I-130)+(1.013)+(5.007), (I-130)+(1.013)+(5.008), (I-130)+(1.013)+(5.009), (I-130)+(1.013)+(5.010), (I-130)+(1.013)+(5.011), (I-130)+(1.013)+(5.012), (I-130)+(1.013)+(5.013), (I-130)+(1.013)+(5.014), (I-130)+(1.013)+(5.015), (I-130)+(1.013)+(5.016), (I-130)+(1.013)+(5.017), (I-130)+(1.013)+(5.018), (I-130)+(1.013)+(5.019), (I-130)+(1.013)+(5.020), (I-130)+(1.013)+(5.021), (I-130)+(1.013)+(5.022), (I-130)+(1.013)+(5.023), (I-130)+(1.013)+(6.001), (I-130)+(1.013)+(6.002), (I-130)+(1.013)+(6.003), (I-130)+(1.013)+(6.004), (I-130)+(1.013)+(7.001), (I-130)+(1.013)+(7.002), (I-130)+(1.013)+(7.003), (I-130)+(1.013)+(7.004), (I-130)+(1.013)+(7.005), (I-130)+(1.013)+(7.006), (I-130)+(1.013)+(9.001), (I-130)+(1.013)+(9.002), (I-130)+(1.013)+(9.003), (I-130)+(1.013)+(9.004), (I-130)+(1.013)+(9.005), (I-130)+(1.013)+(9.006), (I-130)+(1.013)+(9.007), (I-130)+(1.013)+(9.008), (I-130)+(1.013)+(9.009), (I-130)+(1.013)+(14.001), (I-130)+(1.013)+(14.002), (I-130)+(1.013)+(15.008), (I-130)+(1.013)+(15.011), (I-130)+(1.013)+(15.012), (I-130)+(1.013)+(15.016), (I-130)+(1.013)+(15.025), (I-130)+(1.013)+(15.027), (I-130)+(1.013)+(15.047), (I-130)+(1.013)+(15.063), (I-130)+(1.013)+(15.064), (I-130)+(1.013)+(16.001), (I-130)+(1.013)+(16.002), (I-130)+(1.013)+(16.003), (I-130)+(1.013)+(16.004), (I-130)+(1.013)+(16.005), (I-130)+(1.013)+(16.006), (I-130)+(1.013)+(16.007), (I-130)+(1.013)+(16.008), (I-130)+(1.013)+(17.001), (I-130)+(1.013)+(17.002), (I-130)+(1.013)+(17.003), (I-130)+(1.013)+(17.004), (I-130)+(1.013)+(17.005), (I-130)+(1.013)+(17.006), (I-130)+(1.013)+(17.007), (I-130)+(1.013)+(17.008), (I-130)+(1.013)+(17.009), (I-130)+(1.013)+(17.010), (I-130)+(1.013)+(17.011), (I-130)+(1.013)+(17.012), (I-130)+(1.013)+(18.001), (I-130)+(1.014)+(1.015), (I-130)+(1.014)+(1.016), (I-130)+(1.014)+(1.017), (I-130)+(1.014)+(1.018), (I-130)+(1.014)+(1.019), (I-130)+(1.014)+(1.020), (I-130)+(1.014)+(1.021), (I-130)+(1.014)+(1.022), (I-130)+(1.014)+(1.023), (I-130)+(1.014)+(1.024), (I-130)+(1.014)+(1.025), (I-130)+(1.014)+(1.026), (I-130)+(1.014)+(1.027), (I-130)+(1.014)+(1.028), (I-130)+(1.014)+(1.029), (I-130)+(1.014)+(1.030), (I-130)+(1.014)+(1.031), (I-130)+(1.014)+(1.032), (I-130)+(1.014)+(1.033), (I-130)+(1.014)+(1.034), (I-130)+(1.014)+(1.035), (I-130)+(1.014)+(1.036), (I-130)+(1.014)+(1.037), (I-130)+(1.014)+(1.038), (I-130)+(1.014)+(1.039), (I-130)+(1.014)+(1.040), (I-130)+(1.014)+(1.041), (I-130)+(1.014)+(1.042), (I-130)+(1.014)+(1.043), (I-130)+(1.014)+(1.044), (I-130)+(1.014)+(1.045), (I-130)+(1.014)+(1.046), (I-130)+(1.014)+(1.047), (I-130)+(1.014)+(1.048), (I-130)+(1.014)+(1.049), (I-130)+(1.014)+(1.050), (I-130)+(1.014)+(1.051), (I-130)+(1.014)+(1.052), (I-130)+(1.014)+(1.053), (I-130)+(1.014)+(1.054), (I-130)+(1.014)+(1.055), (I-130)+(1.014)+(1.056), (I-130)+(1.014)+(1.057), (I-130)+(1.014)+(1.058), (I-130)+(1.014)+(1.059), (I-130)+(1.014)+(1.060), (I-130)+(1.014)+(1.061), (I-130)+(1.014)+(1.062), (I-130)+(1.014)+(1.063), (I-130)+(1.014)+(1.064), (I-130)+(1.014)+(1.065), (I-130)+(1.014)+(1.066), (I-130)+(1.014)+(1.067), (I-130)+(1.014)+(1.068), (I-130)+(1.014)+(1.069), (I-130)+(1.014)+(1.070), (I-130)+(1.014)+(1.071), (I-130)+(1.014)+(1.072), (I-130)+(1.014)+(1.073), (I-130)+(1.014)+(1.074), (I-130)+(1.014)+(1.075), (I-130)+(1.014)+(1.076), (I-130)+(1.014)+(1.077), (I-130)+(1.014)+(1.078), (I-130)+(1.014)+(1.079), (I-130)+(1.014)+(1.080), (I-130)+(1.014)+(1.081), (I-130)+(1.014)+(1.082), (I-130)+(1.014)+(1.083), (I-130)+(1.014)+(1.084), (I-130)+(1.014)+(1.085), (I-130)+(1.014)+(1.086), (I-130)+(1.014)+(1.087), (I-130)+(1.014)+(1.088), (I-130)+(1.014)+(1.089), (I-130)+(1.014)+(1.090), (I-130)+(1.014)+(1.091), (I-130)+(1.014)+(1.092), (I-130)+(1.014)+(2.001), (I-130)+(1.014)+(2.002), (I-130)+(1.014)+(2.003), (I-130)+(1.014)+(2.004), (I-130)+(1.014)+(2.005), (I-130)+(1.014)+(2.006), (I-130)+(1.014)+(2.007), (I-130)+(1.014)+(2.008), (I-130)+(1.014)+(2.009), (I-130)+(1.014)+(2.010), (I-130)+(1.014)+(2.011), (I-130)+(1.014)+(2.012), (I-130)+(1.014)+(2.013), (I-130)+(1.014)+(2.014), (I-130)+(1.014)+(2.015), (I-130)+(1.014)+(2.016), (I-130)+(1.014)+(2.017), (I-130)+(1.014)+(2.018), (I-130)+(1.014)+(2.019), (I-130)+(1.014)+(2.020), (I-130)+(1.014)+(2.021), (I-130)+(1.014)+(2.022), (I-130)+(1.014)+(2.023), (I-130)+(1.014)+(2.024), (I-130)+(1.014)+(2.025), (I-130)+(1.014)+(2.026), (I-130)+(1.014)+(2.027), (I-130)+(1.014)+(2.028), (I-130)+(1.014)+(2.029), (I-130)+(1.014)+(2.030), (I-130)+(1.014)+(2.031), (I-130)+(1.014)+(2.032), (I-130)+(1.014)+(2.033), (I-130)+(1.014)+(2.034), (I-130)+(1.014)+(2.035), (I-130)+(1.014)+(2.036), (I-130)+(1.014)+(2.037), (I-130)+(1.014)+(2.038), (I-130)+(1.014)+(2.039), (I-130)+(1.014)+(2.040), (I-130)+(1.014)+(2.041), (I-130)+(1.014)+(2.042), (I-130)+(1.014)+(2.043), (I-130)+(1.014)+(2.044), (I-130)+(1.014)+(2.045), (I-130)+(1.014)+(2.046), (I-130)+(1.014)+(2.047), (I-130)+(1.014)+(2.048), (I-130)+(1.014)+(2.049), (I-130)+(1.014)+(2.050), (I-130)+(1.014)+(2.051), (I-130)+(1.014)+(2.052), (I-130)+(1.014)+(2.053), (I-130)+(1.014)+(2.054), (I-130)+(1.014)+(2.055), (I-130)+(1.014)+(2.056), (I-130)+(1.014)+(2.057), (I-130)+(1.014)+(2.058), (I-130)+(1.014)+(2.059), (I-130)+(1.014)+(3.001), (I-130)+(1.014)+(3.002), (I-130)+(1.014)+(3.003), (I-130)+(1.014)+(3.004), (I-130)+(1.014)+(3.005), (I-130)+(1.014)+(3.006), (I-130)+(1.014)+(3.007), (I-130)+(1.014)+(3.008), (I-130)+(1.014)+(3.009), (I-130)+(1.014)+(3.010), (I-130)+(1.014)+(3.011), (I-130)+(1.014)+(3.012), (I-130)+(1.014)+(3.013), (I-130)+(1.014)+(3.014), (I-130)+(1.014)+(3.015), (I-130)+(1.014)+(3.016), (I-130)+(1.014)+(3.017), (I-130)+(1.014)+(3.018), (I-130)+(1.014)+(3.019), (I-130)+(1.014)+(3.020), (I-130)+(1.014)+(3.021), (I-130)+(1.014)+(3.022), (I-130)+(1.014)+(3.023), (I-130)+(1.014)+(3.024), (I-130)+(1.014)+(3.025), (I-130)+(1.014)+(3.026), (I-130)+(1.014)+(3.027), (I-130)+(1.014)+(3.028), (I-130)+(1.014)+(3.029), (I-130)+(1.014)+(3.030), (I-130)+(1.014)+(3.031), (I-130)+(1.014)+(5.001), (I-130)+(1.014)+(5.002), (I-130)+(1.014)+(5.003), (I-130)+(1.014)+(5.004), (I-130)+(1.014)+(5.005), (I-130)+(1.014)+(5.006), (I-130)+(1.014)+(5.007), (I-130)+(1.014)+(5.008), (I-130)+(1.014)+(5.009), (I-130)+(1.014)+(5.010), (I-130)+(1.014)+(5.011), (I-130)+(1.014)+(5.012), (I-130)+(1.014)+(5.013), (I-130)+(1.014)+(5.014), (I-130)+(1.014)+(5.015), (I-130)+(1.014)+(5.016), (I-130)+(1.014)+(5.017), (I-130)+(1.014)+(5.018), (I-130)+(1.014)+(5.019), (I-130)+(1.014)+(5.020), (I-130)+(1.014)+(5.021), (I-130)+(1.014)+(5.022), (I-130)+(1.014)+(5.023), (I-130)+(1.014)+(6.001), (I-130)+(1.014)+(6.002), (I-130)+(1.014)+(6.003), (I-130)+(1.014)+(6.004), (I-130)+(1.014)+(7.001), (I-130)+(1.014)+(7.002), (I-130)+(1.014)+(7.003), (I-130)+(1.014)+(7.004), (I-130)+(1.014)+(7.005), (I-130)+(1.014)+(7.006), (I-130)+(1.014)+(9.001), (I-130)+(1.014)+(9.002), (I-130)+(1.014)+(9.003), (I-130)+(1.014)+(9.004), (I-130)+(1.014)+(9.005), (I-130)+(1.014)+(9.006), (I-130)+(1.014)+(9.007), (I-130)+(1.014)+(9.008), (I-130)+(1.014)+(9.009), (I-130)+(1.014)+(14.001), (I-130)+(1.014)+(14.002), (I-130)+(1.014)+(15.008), (I-130)+(1.014)+(15.011), (I-130)+(1.014)+(15.012), (I-130)+(1.014)+(15.016), (I-130)+(1.014)+(15.025), (I-130)+(1.014)+(15.027), (I-130)+(1.014)+(15.047), (I-130)+(1.014)+(15.063), (I-130)+(1.014)+(15.064), (I-130)+(1.014)+(16.001), (I-130)+(1.014)+(16.002), (I-130)+(1.014)+(16.003), (I-130)+(1.014)+(16.004), (I-130)+(1.014)+(16.005), (I-130)+(1.014)+(16.006), (I-130)+(1.014)+(16.007), (I-130)+(1.014)+(16.008), (I-130)+(1.014)+(17.001), (I-130)+(1.014)+(17.002), (I-130)+(1.014)+(17.003), (I-130)+(1.014)+(17.004), (I-130)+(1.014)+(17.005), (I-130)+(1.014)+(17.006), (I-130)+(1.014)+(17.007), (I-130)+(1.014)+(17.008), (I-130)+(1.014)+(17.009), (I-130)+(1.014)+(17.010), (I-130)+(1.014)+(17.011), (I-130)+(1.014)+(17.012), (I-130)+(1.014)+(18.001), (I-130)+(1.015)+(1.016), (I-130)+(1.015)+(1.017), (I-130)+(1.015)+(1.018), (I-130)+(1.015)+(1.019), (I-130)+(1.015)+(1.020), (I-130)+(1.015)+(1.021), (I-130)+(1.015)+(1.022), (I-130)+(1.015)+(1.023), (I-130)+(1.015)+(1.024), (I-130)+(1.015)+(1.025), (I-130)+(1.015)+(1.026), (I-130)+(1.015)+(1.027), (I-130)+(1.015)+(1.028), (I-130)+(1.015)+(1.029), (I-130)+(1.015)+(1.030), (I-130)+(1.015)+(1.031), (I-130)+(1.015)+(1.032), (I-130)+(1.015)+(1.033), (I-130)+(1.015)+(1.034), (I-130)+(1.015)+(1.035), (I-130)+(1.015)+(1.036), (I-130)+(1.015)+(1.037), (I-130)+(1.015)+(1.038), (I-130)+(1.015)+(1.039), (I-130)+(1.015)+(1.040), (I-130)+(1.015)+(1.041), (I-130)+(1.015)+(1.042), (I-130)+(1.015)+(1.043), (I-130)+(1.015)+(1.044), (I-130)+(1.015)+(1.045), (I-130)+(1.015)+(1.046), (I-130)+(1.015)+(1.047), (I-130)+(1.015)+(1.048), (I-130)+(1.015)+(1.049), (I-130)+(1.015)+(1.050), (I-130)+(1.015)+(1.051), (I-130)+(1.015)+(1.052), (I-130)+(1.015)+(1.053), (I-130)+(1.015)+(1.054), (I-130)+(1.015)+(1.055), (I-130)+(1.015)+(1.056), (I-130)+(1.015)+(1.057), (I-130)+(1.015)+(1.058), (I-130)+(1.015)+(1.059), (I-130)+(1.015)+(1.060), (I-130)+(1.015)+(1.061), (I-130)+(1.015)+(1.062), (I-130)+(1.015)+(1.063), (I-130)+(1.015)+(1.064), (I-130)+(1.015)+(1.065), (I-130)+(1.015)+(1.066), (I-130)+(1.015)+(1.067), (I-130)+(1.015)+(1.068), (I-130)+(1.015)+(1.069), (I-130)+(1.015)+(1.070), (I-130)+(1.015)+(1.071), (I-130)+(1.015)+(1.072), (I-130)+(1.015)+(1.073), (I-130)+(1.015)+(1.074), (I-130)+(1.015)+(1.075), (I-130)+(1.015)+(1.076), (I-130)+(1.015)+(1.077), (I-130)+(1.015)+(1.078), (I-130)+(1.015)+(1.079), (I-130)+(1.015)+(1.080), (I-130)+(1.015)+(1.081), (I-130)+(1.015)+(1.082), (I-130)+(1.015)+(1.083), (I-130)+(1.015)+(1.084), (I-130)+(1.015)+(1.085), (I-130)+(1.015)+(1.086), (I-130)+(1.015)+(1.087), (I-130)+(1.015)+(1.088), (I-130)+(1.015)+(1.089), (I-130)+(1.015)+(1.090), (I-130)+(1.015)+(1.091), (I-130)+(1.015)+(1.092), (I-130)+(1.015)+(2.001), (I-130)+(1.015)+(2.002), (I-130)+(1.015)+(2.003), (I-130)+(1.015)+(2.004), (I-130)+(1.015)+(2.005), (I-130)+(1.015)+(2.006), (I-130)+(1.015)+(2.007), (I-130)+(1.015)+(2.008), (I-130)+(1.015)+(2.009), (I-130)+(1.015)+(2.010), (I-130)+(1.015)+(2.011), (I-130)+(1.015)+(2.012), (I-130)+(1.015)+(2.013), (I-130)+(1.015)+(2.014), (I-130)+(1.015)+(2.015), (I-130)+(1.015)+(2.016), (I-130)+(1.015)+(2.017), (I-130)+(1.015)+(2.018), (I-130)+(1.015)+(2.019), (I-130)+(1.015)+(2.020), (I-130)+(1.015)+(2.021), (I-130)+(1.015)+(2.022), (I-130)+(1.015)+(2.023), (I-130)+(1.015)+(2.024), (I-130)+(1.015)+(2.025), (I-130)+(1.015)+(2.026), (I-130)+(1.015)+(2.027), (I-130)+(1.015)+(2.028), (I-130)+(1.015)+(2.029), (I-130)+(1.015)+(2.030), (I-130)+(1.015)+(2.031), (I-130)+(1.015)+(2.032), (I-130)+(1.015)+(2.033), (I-130)+(1.015)+(2.034), (I-130)+(1.015)+(2.035), (I-130)+(1.015)+(2.036), (I-130)+(1.015)+(2.037), (I-130)+(1.015)+(2.038), (I-130)+(1.015)+(2.039), (I-130)+(1.015)+(2.040), (I-130)+(1.015)+(2.041), (I-130)+(1.015)+(2.042), (I-130)+(1.015)+(2.043), (I-130)+(1.015)+(2.044), (I-130)+(1.015)+(2.045), (I-130)+(1.015)+(2.046), (I-130)+(1.015)+(2.047), (I-130)+(1.015)+(2.048), (I-130)+(1.015)+(2.049), (I-130)+(1.015)+(2.050), (I-130)+(1.015)+(2.051), (I-130)+(1.015)+(2.052), (I-130)+(1.015)+(2.053), (I-130)+(1.015)+(2.054), (I-130)+(1.015)+(2.055), (I-130)+(1.015)+(2.056), (I-130)+(1.015)+(2.057), (I-130)+(1.015)+(2.058), (I-130)+(1.015)+(2.059), (I-130)+(1.015)+(3.001), (I-130)+(1.015)+(3.002), (I-130)+(1.015)+(3.003), (I-130)+(1.015)+(3.004), (I-130)+(1.015)+(3.005), (I-130)+(1.015)+(3.006), (I-130)+(1.015)+(3.007), (I-130)+(1.015)+(3.008), (I-130)+(1.015)+(3.009), (I-130)+(1.015)+(3.010), (I-130)+(1.015)+(3.011), (I-130)+(1.015)+(3.012), (I-130)+(1.015)+(3.013), (I-130)+(1.015)+(3.014), (I-130)+(1.015)+(3.015), (I-130)+(1.015)+(3.016), (I-130)+(1.015)+(3.017), (I-130)+(1.015)+(3.018), (I-130)+(1.015)+(3.019), (I-130)+(1.015)+(3.020), (I-130)+(1.015)+(3.021), (I-130)+(1.015)+(3.022), (I-130)+(1.015)+(3.023), (I-130)+(1.015)+(3.024), (I-130)+(1.015)+(3.025), (I-130)+(1.015)+(3.026), (I-130)+(1.015)+(3.027), (I-130)+(1.015)+(3.028), (I-130)+(1.015)+(3.029), (I-130)+(1.015)+(3.030), (I-130)+(1.015)+(3.031), (I-130)+(1.015)+(5.001), (I-130)+(1.015)+(5.002), (I-130)+(1.015)+(5.003), (I-130)+(1.015)+(5.004), (I-130)+(1.015)+(5.005), (I-130)+(1.015)+(5.006), (I-130)+(1.015)+(5.007), (I-130)+(1.015)+(5.008), (I-130)+(1.015)+(5.009), (I-130)+(1.015)+(5.010), (I-130)+(1.015)+(5.011), (I-130)+(1.015)+(5.012), (I-130)+(1.015)+(5.013), (I-130)+(1.015)+(5.014), (I-130)+(1.015)+(5.015), (I-130)+(1.015)+(5.016), (I-130)+(1.015)+(5.017), (I-130)+(1.015)+(5.018), (I-130)+(1.015)+(5.019), (I-130)+(1.015)+(5.020), (I-130)+(1.015)+(5.021), (I-130)+(1.015)+(5.022), (I-130)+(1.015)+(5.023), (I-130)+(1.015)+(6.001), (I-130)+(1.015)+(6.002), (I-130)+(1.015)+(6.003), (I-130)+(1.015)+(6.004), (I-130)+(1.015)+(7.001), (I-130)+(1.015)+(7.002), (I-130)+(1.015)+(7.003), (I-130)+(1.015)+(7.004), (I-130)+(1.015)+(7.005), (I-130)+(1.015)+(7.006), (I-130)+(1.015)+(9.001), (I-130)+(1.015)+(9.002), (I-130)+(1.015)+(9.003), (I-130)+(1.015)+(9.004), (I-130)+(1.015)+(9.005), (I-130)+(1.015)+(9.006), (I-130)+(1.015)+(9.007), (I-130)+(1.015)+(9.008), (I-130)+(1.015)+(9.009), (I-130)+(1.015)+(14.001), (I-130)+(1.015)+(14.002), (I-130)+(1.015)+(15.008), (I-130)+(1.015)+(15.011), (I-130)+(1.015)+(15.012), (I-130)+(1.015)+(15.016), (I-130)+(1.015)+(15.025), (I-130)+(1.015)+(15.027), (I-130)+(1.015)+(15.047), (I-130)+(1.015)+(15.063), (I-130)+(1.015)+(15.064), (I-130)+(1.015)+(16.001), (I-130)+(1.015)+(16.002), (I-130)+(1.015)+(16.003), (I-130)+(1.015)+(16.004), (I-130)+(1.015)+(16.005), (I-130)+(1.015)+(16.006), (I-130)+(1.015)+(16.007), (I-130)+(1.015)+(16.008), (I-130)+(1.015)+(17.001), (I-130)+(1.015)+(17.002), (I-130)+(1.015)+(17.003), (I-130)+(1.015)+(17.004), (I-130)+(1.015)+(17.005), (I-130)+(1.015)+(17.006), (I-130)+(1.015)+(17.007), (I-130)+(1.015)+(17.008), (I-130)+(1.015)+(17.009), (I-130)+(1.015)+(17.010), (I-130)+(1.015)+(17.011), (I-130)+(1.015)+(17.012), (I-130)+(1.015)+(18.001), (I-130)+(1.016)+(1.017), (I-130)+(1.016)+(1.018), (I-130)+(1.016)+(1.019), (I-130)+(1.016)+(1.020), (I-130)+(1.016)+(1.021), (I-130)+(1.016)+(1.022), (I-130)+(1.016)+(1.023), (I-130)+(1.016)+(1.024), (I-130)+(1.016)+(1.025), (I-130)+(1.016)+(1.026), (I-130)+(1.016)+(1.027), (I-130)+(1.016)+(1.028), (I-130)+(1.016)+(1.029), (I-130)+(1.016)+(1.030), (I-130)+(1.016)+(1.031), (I-130)+(1.016)+(1.032), (I-130)+(1.016)+(1.033), (I-130)+(1.016)+(1.034), (I-130)+(1.016)+(1.035), (I-130)+(1.016)+(1.036), (I-130)+(1.016)+(1.037), (I-130)+(1.016)+(1.038), (I-130)+(1.016)+(1.039), (I-130)+(1.016)+(1.040), (I-130)+(1.016)+(1.041), (I-130)+(1.016)+(1.042), (I-130)+(1.016)+(1.043), (I-130)+(1.016)+(1.044), (I-130)+(1.016)+(1.045), (I-130)+(1.016)+(1.046), (I-130)+(1.016)+(1.047), (I-130)+(1.016)+(1.048), (I-130)+(1.016)+(1.049), (I-130)+(1.016)+(1.050), (I-130)+(1.016)+(1.051), (I-130)+(1.016)+(1.052), (I-130)+(1.016)+(1.053), (I-130)+(1.016)+(1.054), (I-130)+(1.016)+(1.055), (I-130)+(1.016)+(1.056), (I-130)+(1.016)+(1.057), (I-130)+(1.016)+(1.058), (I-130)+(1.016)+(1.059), (I-130)+(1.016)+(1.060), (I-130)+(1.016)+(1.061), (I-130)+(1.016)+(1.062), (I-130)+(1.016)+(1.063), (I-130)+(1.016)+(1.064), (I-130)+(1.016)+(1.065), (I-130)+(1.016)+(1.066), (I-130)+(1.016)+(1.067), (I-130)+(1.016)+(1.068), (I-130)+(1.016)+(1.069), (I-130)+(1.016)+(1.070), (I-130)+(1.016)+(1.071), (I-130)+(1.016)+(1.072), (I-130)+(1.016)+(1.073), (I-130)+(1.016)+(1.074), (I-130)+(1.016)+(1.075), (I-130)+(1.016)+(1.076), (I-130)+(1.016)+(1.077), (I-130)+(1.016)+(1.078), (I-130)+(1.016)+(1.079), (I-130)+(1.016)+(1.080), (I-130)+(1.016)+(1.081), (I-130)+(1.016)+(1.082), (I-130)+(1.016)+(1.083), (I-130)+(1.016)+(1.084), (I-130)+(1.016)+(1.085), (I-130)+(1.016)+(1.086), (I-130)+(1.016)+(1.087), (I-130)+(1.016)+(1.088), (I-130)+(1.016)+(1.089), (I-130)+(1.016)+(1.090), (I-130)+(1.016)+(1.091), (I-130)+(1.016)+(1.092), (I-130)+(1.016)+(2.001), (I-130)+(1.016)+(2.002), (I-130)+(1.016)+(2.003), (I-130)+(1.016)+(2.004), (I-130)+(1.016)+(2.005), (I-130)+(1.016)+(2.006), (I-130)+(1.016)+(2.007), (I-130)+(1.016)+(2.008), (I-130)+(1.016)+(2.009), (I-130)+(1.016)+(2.010), (I-130)+(1.016)+(2.011), (I-130)+(1.016)+(2.012), (I-130)+(1.016)+(2.013), (I-130)+(1.016)+(2.014), (I-130)+(1.016)+(2.015), (I-130)+(1.016)+(2.016), (I-130)+(1.016)+(2.017), (I-130)+(1.016)+(2.018), (I-130)+(1.016)+(2.019), (I-130)+(1.016)+(2.020), (I-130)+(1.016)+(2.021), (I-130)+(1.016)+(2.022), (I-130)+(1.016)+(2.023), (I-130)+(1.016)+(2.024), (I-130)+(1.016)+(2.025), (I-130)+(1.016)+(2.026), (I-130)+(1.016)+(2.027), (I-130)+(1.016)+(2.028), (I-130)+(1.016)+(2.029), (I-130)+(1.016)+(2.030), (I-130)+(1.016)+(2.031), (I-130)+(1.016)+(2.032), (I-130)+(1.016)+(2.033), (I-130)+(1.016)+(2.034), (I-130)+(1.016)+(2.035), (I-130)+(1.016)+(2.036), (I-130)+(1.016)+(2.037), (I-130)+(1.016)+(2.038), (I-130)+(1.016)+(2.039), (I-130)+(1.016)+(2.040), (I-130)+(1.016)+(2.041), (I-130)+(1.016)+(2.042), (I-130)+(1.016)+(2.043), (I-130)+(1.016)+(2.044), (I-130)+(1.016)+(2.045), (I-130)+(1.016)+(2.046), (I-130)+(1.016)+(2.047), (I-130)+(1.016)+(2.048), (I-130)+(1.016)+(2.049), (I-130)+(1.016)+(2.050), (I-130)+(1.016)+(2.051), (I-130)+(1.016)+(2.052), (I-130)+(1.016)+(2.053), (I-130)+(1.016)+(2.054),
(I-130)+(1.016)+(2.055), (I-130)+(1.016)+(2.056),
(I-130)+(1.016)+(2.057), (I-130)+(1.016)+(2.058),
(I-130)+(1.016)+(2.059), (I-130)+(1.016)+(3.001),
(I-130)+(1.016)+(3.002), (I-130)+(1.016)+(3.003),
(I-130)+(1.016)+(3.004), (I-130)+(1.016)+(3.005),
(I-130)+(1.016)+(3.006), (I-130)+(1.016)+(3.007),
(I-130)+(1.016)+(3.008), (I-130)+(1.016)+(3.009),
(I-130)+(1.016)+(3.010), (I-130)+(1.016)+(3.011),
(I-130)+(1.016)+(3.012), (I-130)+(1.016)+(3.013),
(I-130)+(1.016)+(3.014), (I-130)+(1.016)+(3.015),
(I-130)+(1.016)+(3.016), (I-130)+(1.016)+(3.017),
(I-130)+(1.016)+(3.018), (I-130)+(1.016)+(3.019),
(I-130)+(1.016)+(3.020), (I-130)+(1.016)+(3.021),
(I-130)+(1.016)+(3.022), (I-130)+(1.016)+(3.023),
(I-130)+(1.016)+(3.024), (I-130)+(1.016)+(3.025),
(I-130)+(1.016)+(3.026), (I-130)+(1.016)+(3.027),
(I-130)+(1.016)+(3.028), (I-130)+(1.016)+(3.029),
(I-130)+(1.016)+(3.030), (I-130)+(1.016)+(3.031),
(I-130)+(1.016)+(5.001), (I-130)+(1.016)+(5.002),
(I-130)+(1.016)+(5.003), (I-130)+(1.016)+(5.004),
(I-130)+(1.016)+(5.005), (I-130)+(1.016)+(5.006),
(I-130)+(1.016)+(5.007), (I-130)+(1.016)+(5.008),
(I-130)+(1.016)+(5.009), (I-130)+(1.016)+(5.010),
(I-130)+(1.016)+(5.011), (I-130)+(1.016)+(5.012),
(I-130)+(1.016)+(5.013), (I-130)+(1.016)+(5.014),
(I-130)+(1.016)+(5.015), (I-130)+(1.016)+(5.016),
(I-130)+(1.016)+(5.017), (I-130)+(1.016)+(5.018),
(I-130)+(1.016)+(5.019), (I-130)+(1.016)+(5.020),
(I-130)+(1.016)+(5.021), (I-130)+(1.016)+(5.022),
(I-130)+(1.016)+(5.023), (I-130)+(1.016)+(6.001),
(I-130)+(1.016)+(6.002), (I-130)+(1.016)+(6.003),
(I-130)+(1.016)+(6.004), (I-130)+(1.016)+(7.001),
(I-130)+(1.016)+(7.002), (I-130)+(1.016)+(7.003),
(I-130)+(1.016)+(7.004), (I-130)+(1.016)+(7.005),
(I-130)+(1.016)+(7.006), (I-130)+(1.016)+(9.001),
(I-130)+(1.016)+(9.002), (I-130)+(1.016)+(9.003),
(I-130)+(1.016)+(9.004), (I-130)+(1.016)+(9.005),
(I-130)+(1.016)+(9.006), (I-130)+(1.016)+(9.007),
(I-130)+(1.016)+(9.008), (I-130)+(1.016)+(9.009),
(I-130)+(1.016)+(14.001), (I-130)+(1.016)+(14.002),
(I-130)+(1.016)+(15.008), (I-130)+(1.016)+(15.011),
(I-130)+(1.016)+(15.012), (I-130)+(1.016)+(15.016),
(I-130)+(1.016)+(15.025), (I-130)+(1.016)+(15.027),
(I-130)+(1.016)+(15.047), (I-130)+(1.016)+(15.063),
(I-130)+(1.016)+(15.064), (I-130)+(1.016)+(16.001),
(I-130)+(1.016)+(16.002), (I-130)+(1.016)+(16.003),
(I-130)+(1.016)+(16.004), (I-130)+(1.016)+(16.005),
(I-130)+(1.016)+(16.006), (I-130)+(1.016)+(16.007),
(I-130)+(1.016)+(16.008), (I-130)+(1.016)+(17.001),
(I-130)+(1.016)+(17.002), (I-130)+(1.016)+(17.003),
(I-130)+(1.016)+(17.004), (I-130)+(1.016)+(17.005),
(I-130)+(1.016)+(17.006), (I-130)+(1.016)+(17.007),
(I-130)+(1.016)+(17.008), (I-130)+(1.016)+(17.009),
(I-130)+(1.016)+(17.010), (I-130)+(1.016)+(17.011),
(I-130)+(1.016)+(17.012), (I-130)+(1.016)+(18.001),
(I-130)+(1.017)+(1.018), (I-130)+(1.017)+(1.019),
(I-130)+(1.017)+(1.020), (I-130)+(1.017)+(1.021),
(I-130)+(1.017)+(1.022), (I-130)+(1.017)+(1.023),
(I-130)+(1.017)+(1.024), (I-130)+(1.017)+(1.025),
(I-130)+(1.017)+(1.026), (I-130)+(1.017)+(1.027),
(I-130)+(1.017)+(1.028), (I-130)+(1.017)+(1.029),
(I-130)+(1.017)+(1.030), (I-130)+(1.017)+(1.031),
(I-130)+(1.017)+(1.032), (I-130)+(1.017)+(1.033),
(I-130)+(1.017)+(1.034), (I-130)+(1.017)+(1.035),
(I-130)+(1.017)+(1.036), (I-130)+(1.017)+(1.037),
(I-130)+(1.017)+(1.038), (I-130)+(1.017)+(1.039),
(I-130)+(1.017)+(1.040), (I-130)+(1.017)+(1.041),
(I-130)+(1.017)+(1.042), (I-130)+(1.017)+(1.043),
(I-130)+(1.017)+(1.044), (I-130)+(1.017)+(1.045),
(I-130)+(1.017)+(1.046), (I-130)+(1.017)+(1.047),
(I-130)+(1.017)+(1.048), (I-130)+(1.017)+(1.049),
(I-130)+(1.017)+(1.050), (I-130)+(1.017)+(1.051),
(I-130)+(1.017)+(1.052), (I-130)+(1.017)+(1.053),
(I-130)+(1.017)+(1.054), (I-130)+(1.017)+(1.055),
(I-130)+(1.017)+(1.056), (I-130)+(1.017)+(1.057),
(I-130)+(1.017)+(1.058), (I-130)+(1.017)+(1.059),
(I-130)+(1.017)+(1.060), (I-130)+(1.017)+(1.061),
(I-130)+(1.017)+(1.062), (I-130)+(1.017)+(1.063),
(I-130)+(1.017)+(1.064), (I-130)+(1.017)+(1.065),
(I-130)+(1.017)+(1.066), (I-130)+(1.017)+(1.067),
(I-130)+(1.017)+(1.068), (I-130)+(1.017)+(1.069),
(I-130)+(1.017)+(1.070), (I-130)+(1.017)+(1.071),
(I-130)+(1.017)+(1.072), (I-130)+(1.017)+(1.073),
(I-130)+(1.017)+(1.074), (I-130)+(1.017)+(1.075),
(I-130)+(1.017)+(1.076), (I-130)+(1.017)+(1.077),
(I-130)+(1.017)+(1.078), (I-130)+(1.017)+(1.079),
(I-130)+(1.017)+(1.080), (I-130)+(1.017)+(1.081),
(I-130)+(1.017)+(1.082), (I-130)+(1.017)+(1.083),
(I-130)+(1.017)+(1.084), (I-130)+(1.017)+(1.085),
(I-130)+(1.017)+(1.086), (I-130)+(1.017)+(1.087),
(I-130)+(1.017)+(1.088), (I-130)+(1.017)+(1.089),
(I-130)+(1.017)+(1.090), (I-130)+(1.017)+(1.091),
(I-130)+(1.017)+(1.092), (I-130)+(1.017)+(2.001),
(I-130)+(1.017)+(2.002), (I-130)+(1.017)+(2.003),
(I-130)+(1.017)+(2.004), (I-130)+(1.017)+(2.005),
(I-130)+(1.017)+(2.006), (I-130)+(1.017)+(2.007),
(I-130)+(1.017)+(2.008), (I-130)+(1.017)+(2.009),
(I-130)+(1.017)+(2.010), (I-130)+(1.017)+(2.011),
(I-130)+(1.017)+(2.012), (I-130)+(1.017)+(2.013),
(I-130)+(1.017)+(2.014), (I-130)+(1.017)+(2.015),
(I-130)+(1.017)+(2.016), (I-130)+(1.017)+(2.017),
(I-130)+(1.017)+(2.018), (I-130)+(1.017)+(2.019),
(I-130)+(1.017)+(2.020), (I-130)+(1.017)+(2.021),
(I-130)+(1.017)+(2.022), (I-130)+(1.017)+(2.023),
(I-130)+(1.017)+(2.024), (I-130)+(1.017)+(2.025),
(I-130)+(1.017)+(2.026), (I-130)+(1.017)+(2.027),
(I-130)+(1.017)+(2.028), (I-130)+(1.017)+(2.029),
(I-130)+(1.017)+(2.030), (I-130)+(1.017)+(2.031),
(I-130)+(1.017)+(2.032), (I-130)+(1.017)+(2.033),
(I-130)+(1.017)+(2.034), (I-130)+(1.017)+(2.035),
(I-130)+(1.017)+(2.036), (I-130)+(1.017)+(2.037),
(I-130)+(1.017)+(2.038), (I-130)+(1.017)+(2.039),
(I-130)+(1.017)+(2.040), (I-130)+(1.017)+(2.041),
(I-130)+(1.017)+(2.042), (I-130)+(1.017)+(2.043),
(I-130)+(1.017)+(2.044), (I-130)+(1.017)+(2.045),
(I-130)+(1.017)+(2.046), (I-130)+(1.017)+(2.047),
(I-130)+(1.017)+(2.048), (I-130)+(1.017)+(2.049),
(I-130)+(1.017)+(2.050), (I-130)+(1.017)+(2.051),
(I-130)+(1.017)+(2.052), (I-130)+(1.017)+(2.053),
(I-130)+(1.017)+(2.054), (I-130)+(1.017)+(2.055),
(I-130)+(1.017)+(2.056), (I-130)+(1.017)+(2.057),
(I-130)+(1.017)+(2.058), (I-130)+(1.017)+(2.059),
(I-130)+(1.017)+(3.001), (I-130)+(1.017)+(3.002),
(I-130)+(1.017)+(3.003), (I-130)+(1.017)+(3.004),
(I-130)+(1.017)+(3.005), (I-130)+(1.017)+(3.006),
(I-130)+(1.017)+(3.007), (I-130)+(1.017)+(3.008),
(I-130)+(1.017)+(3.009), (I-130)+(1.017)+(3.010),
(I-130)+(1.017)+(3.011), (I-130)+(1.017)+(3.012),
(I-130)+(1.017)+(3.013), (I-130)+(1.017)+(3.014),
(I-130)+(1.017)+(3.015), (I-130)+(1.017)+(3.016),
(I-130)+(1.017)+(3.017), (I-130)+(1.017)+(3.018),
(I-130)+(1.017)+(3.019), (I-130)+(1.017)+(3.020),
(I-130)+(1.017)+(3.021), (I-130)+(1.017)+(3.022), (I-130)+(1.017)+(3.023), (I-130)+(1.017)+(3.024), (I-130)+(1.017)+(3.025), (I-130)+(1.017)+(3.026), (I-130)+(1.017)+(3.027), (I-130)+(1.017)+(3.028), (I-130)+(1.017)+(3.029), (I-130)+(1.017)+(3.030), (I-130)+(1.017)+(3.031), (I-130)+(1.017)+(5.001), (I-130)+(1.017)+(5.002), (I-130)+(1.017)+(5.003), (I-130)+(1.017)+(5.004), (I-130)+(1.017)+(5.005), (I-130)+(1.017)+(5.006), (I-130)+(1.017)+(5.007), (I-130)+(1.017)+(5.008), (I-130)+(1.017)+(5.009), (I-130)+(1.017)+(5.010), (I-130)+(1.017)+(5.011), (I-130)+(1.017)+(5.012), (I-130)+(1.017)+(5.013), (I-130)+(1.017)+(5.014), (I-130)+(1.017)+(5.015), (I-130)+(1.017)+(5.016), (I-130)+(1.017)+(5.017), (I-130)+(1.017)+(5.018), (I-130)+(1.017)+(5.019), (I-130)+(1.017)+(5.020), (I-130)+(1.017)+(5.021), (I-130)+(1.017)+(5.022), (I-130)+(1.017)+(5.023), (I-130)+(1.017)+(6.001), (I-130)+(1.017)+(6.002), (I-130)+(1.017)+(6.003), (I-130)+(1.017)+(6.004), (I-130)+(1.017)+(7.001), (I-130)+(1.017)+(7.002), (I-130)+(1.017)+(7.003), (I-130)+(1.017)+(7.004), (I-130)+(1.017)+(7.005), (I-130)+(1.017)+(7.006), (I-130)+(1.017)+(9.001), (I-130)+(1.017)+(9.002), (I-130)+(1.017)+(9.003), (I-130)+(1.017)+(9.004), (I-130)+(1.017)+(9.005), (I-130)+(1.017)+(9.006), (I-130)+(1.017)+(9.007), (I-130)+(1.017)+(9.008), (I-130)+(1.017)+(9.009), (I-130)+(1.017)+(14.001), (I-130)+(1.017)+(14.002), (I-130)+(1.017)+(15.008), (I-130)+(1.017)+(15.011), (I-130)+(1.017)+(15.012), (I-130)+(1.017)+(15.016), (I-130)+(1.017)+(15.025), (I-130)+(1.017)+(15.027), (I-130)+(1.017)+(15.047), (I-130)+(1.017)+(15.063), (I-130)+(1.017)+(15.064), (I-130)+(1.017)+(16.001), (I-130)+(1.017)+(16.002), (I-130)+(1.017)+(16.003), (I-130)+(1.017)+(16.004), (I-130)+(1.017)+(16.005), (I-130)+(1.017)+(16.006), (I-130)+(1.017)+(16.007), (I-130)+(1.017)+(16.008), (I-130)+(1.017)+(17.001), (I-130)+(1.017)+(17.002), (I-130)+(1.017)+(17.003), (I-130)+(1.017)+(17.004), (I-130)+(1.017)+(17.005), (I-130)+(1.017)+(17.006), (I-130)+(1.017)+(17.007), (I-130)+(1.017)+(17.008), (I-130)+(1.017)+(17.009), (I-130)+(1.017)+(17.010), (I-130)+(1.017)+(17.011), (I-130)+(1.017)+(17.012), (I-130)+(1.017)+(18.001), (I-130)+(1.018)+(1.019), (I-130)+(1.018)+(1.020), (I-130)+(1.018)+(1.021), (I-130)+(1.018)+(1.022), (I-130)+(1.018)+(1.023), (I-130)+(1.018)+(1.024), (I-130)+(1.018)+(1.025), (I-130)+(1.018)+(1.026), (I-130)+(1.018)+(1.027), (I-130)+(1.018)+(1.028), (I-130)+(1.018)+(1.029), (I-130)+(1.018)+(1.030), (I-130)+(1.018)+(1.031), (I-130)+(1.018)+(1.032), (I-130)+(1.018)+(1.033), (I-130)+(1.018)+(1.034), (I-130)+(1.018)+(1.035), (I-130)+(1.018)+(1.036), (I-130)+(1.018)+(1.037), (I-130)+(1.018)+(1.038), (I-130)+(1.018)+(1.039), (I-130)+(1.018)+(1.040), (I-130)+(1.018)+(1.041), (I-130)+(1.018)+(1.042), (I-130)+(1.018)+(1.043), (I-130)+(1.018)+(1.044), (I-130)+(1.018)+(1.045), (I-130)+(1.018)+(1.046), (I-130)+(1.018)+(1.047), (I-130)+(1.018)+(1.048), (I-130)+(1.018)+(1.049), (I-130)+(1.018)+(1.050), (I-130)+(1.018)+(1.051), (I-130)+(1.018)+(1.052), (I-130)+(1.018)+(1.053), (I-130)+(1.018)+(1.054), (I-130)+(1.018)+(1.055), (I-130)+(1.018)+(1.056), (I-130)+(1.018)+(1.057), (I-130)+(1.018)+(1.058), (I-130)+(1.018)+(1.059), (I-130)+(1.018)+(1.060), (I-130)+(1.018)+(1.061), (I-130)+(1.018)+(1.062), (I-130)+(1.018)+(1.063), (I-130)+(1.018)+(1.064), (I-130)+(1.018)+(1.065), (I-130)+(1.018)+(1.066), (I-130)+(1.018)+(1.067), (I-130)+(1.018)+(1.068), (I-130)+(1.018)+(1.069), (I-130)+(1.018)+(1.070), (I-130)+(1.018)+(1.071), (I-130)+(1.018)+(1.072), (I-130)+(1.018)+(1.073), (I-130)+(1.018)+(1.074), (I-130)+(1.018)+(1.075), (I-130)+(1.018)+(1.076), (I-130)+(1.018)+(1.077), (I-130)+(1.018)+(1.078), (I-130)+(1.018)+(1.079), (I-130)+(1.018)+(1.080), (I-130)+(1.018)+(1.081), (I-130)+(1.018)+(1.082), (I-130)+(1.018)+(1.083), (I-130)+(1.018)+(1.084), (I-130)+(1.018)+(1.085), (I-130)+(1.018)+(1.086), (I-130)+(1.018)+(1.087), (I-130)+(1.018)+(1.088), (I-130)+(1.018)+(1.089), (I-130)+(1.018)+(1.090), (I-130)+(1.018)+(1.091), (I-130)+(1.018)+(1.092), (I-130)+(1.018)+(2.001), (I-130)+(1.018)+(2.002), (I-130)+(1.018)+(2.003), (I-130)+(1.018)+(2.004), (I-130)+(1.018)+(2.005), (I-130)+(1.018)+(2.006), (I-130)+(1.018)+(2.007), (I-130)+(1.018)+(2.008), (I-130)+(1.018)+(2.009), (I-130)+(1.018)+(2.010), (I-130)+(1.018)+(2.011), (I-130)+(1.018)+(2.012), (I-130)+(1.018)+(2.013), (I-130)+(1.018)+(2.014), (I-130)+(1.018)+(2.015), (I-130)+(1.018)+(2.016), (I-130)+(1.018)+(2.017), (I-130)+(1.018)+(2.018), (I-130)+(1.018)+(2.019), (I-130)+(1.018)+(2.020), (I-130)+(1.018)+(2.021), (I-130)+(1.018)+(2.022), (I-130)+(1.018)+(2.023), (I-130)+(1.018)+(2.024), (I-130)+(1.018)+(2.025), (I-130)+(1.018)+(2.026), (I-130)+(1.018)+(2.027), (I-130)+(1.018)+(2.028), (I-130)+(1.018)+(2.029), (I-130)+(1.018)+(2.030), (I-130)+(1.018)+(2.031), (I-130)+(1.018)+(2.032), (I-130)+(1.018)+(2.033), (I-130)+(1.018)+(2.034), (I-130)+(1.018)+(2.035), (I-130)+(1.018)+(2.036), (I-130)+(1.018)+(2.037), (I-130)+(1.018)+(2.038), (I-130)+(1.018)+(2.039), (I-130)+(1.018)+(2.040), (I-130)+(1.018)+(2.041), (I-130)+(1.018)+(2.042), (I-130)+(1.018)+(2.043), (I-130)+(1.018)+(2.044), (I-130)+(1.018)+(2.045), (I-130)+(1.018)+(2.046), (I-130)+(1.018)+(2.047), (I-130)+(1.018)+(2.048), (I-130)+(1.018)+(2.049), (I-130)+(1.018)+(2.050), (I-130)+(1.018)+(2.051), (I-130)+(1.018)+(2.052), (I-130)+(1.018)+(2.053), (I-130)+(1.018)+(2.054), (I-130)+(1.018)+(2.055), (I-130)+(1.018)+(2.056), (I-130)+(1.018)+(2.057), (I-130)+(1.018)+(2.058), (I-130)+(1.018)+(2.059), (I-130)+(1.018)+(3.001), (I-130)+(1.018)+(3.002), (I-130)+(1.018)+(3.003), (I-130)+(1.018)+(3.004), (I-130)+(1.018)+(3.005), (I-130)+(1.018)+(3.006), (I-130)+(1.018)+(3.007), (I-130)+(1.018)+(3.008), (I-130)+(1.018)+(3.009), (I-130)+(1.018)+(3.010), (I-130)+(1.018)+(3.011), (I-130)+(1.018)+(3.012), (I-130)+(1.018)+(3.013), (I-130)+(1.018)+(3.014), (I-130)+(1.018)+(3.015), (I-130)+(1.018)+(3.016), (I-130)+(1.018)+(3.017), (I-130)+(1.018)+(3.018), (I-130)+(1.018)+(3.019), (I-130)+(1.018)+(3.020), (I-130)+(1.018)+(3.021), (I-130)+(1.018)+(3.022), (I-130)+(1.018)+(3.023), (I-130)+(1.018)+(3.024), (I-130)+(1.018)+(3.025), (I-130)+(1.018)+(3.026), (I-130)+(1.018)+(3.027), (I-130)+(1.018)+(3.028), (I-130)+(1.018)+(3.029), (I-130)+(1.018)+(3.030), (I-130)+(1.018)+(3.031), (I-130)+(1.018)+(5.001), (I-130)+(1.018)+(5.002), (I-130)+(1.018)+(5.003), (I-130)+(1.018)+(5.004), (I-130)+(1.018)+(5.005), (I-130)+(1.018)+(5.006), (I-130)+(1.018)+(5.007), (I-130)+(1.018)+(5.008), (I-130)+(1.018)+(5.009), (I-130)+(1.018)+(5.010), (I-130)+(1.018)+(5.011), (I-130)+(1.018)+(5.012), (I-130)+(1.018)+(5.013), (I-130)+(1.018)+(5.014), (I-130)+(1.018)+(5.015), (I-130)+(1.018)+(5.016), (I-130)+(1.018)+(5.017), (I-130)+(1.018)+(5.018), (I-130)+(1.018)+(5.019), (I-130)+(1.018)+(5.020), (I-130)+(1.018)+(5.021), (I-130)+(1.018)+(5.022), (I-130)+(1.018)+(5.023), (I-130)+(1.018)+(6.001), (I-130)+(1.018)+(6.002), (I-130)+(1.018)+(6.003), (I-130)+(1.018)+(6.004), (I-130)+(1.018)+(7.001), (I-130)+(1.018)+(7.002), (I-130)+(1.018)+(7.003), (I-130)+(1.018)+(7.004), (I-130)+(1.018)+(7.005), (I-130)+(1.018)+(7.006), (I-130)+(1.018)+(9.001), (I-130)+(1.018)+(9.002), (I-130)+(1.018)+(9.003), (I-130)+(1.018)+(9.004), (I-130)+(1.018)+(9.005), (I-130)+(1.018)+(9.006), (I-130)+(1.018)+(9.007), (I-130)+(1.018)+(9.008), (I-130)+(1.018)+(9.009), (I-130)+(1.018)+(14.001), (I-130)+(1.018)+(14.002), (I-130)+(1.018)+(15.008), (I-130)+(1.018)+(15.011), (I-130)+(1.018)+(15.012), (I-130)+(1.018)+(15.016), (I-130)+(1.018)+(15.025), (I-130)+(1.018)+(15.027), (I-130)+(1.018)+(15.047), (I-130)+(1.018)+(15.063), (I-130)+(1.018)+(15.064), (I-130)+(1.018)+(16.001), (I-130)+(1.018)+(16.002), (I-130)+(1.018)+(16.003), (I-130)+(1.018)+(16.004), (I-130)+(1.018)+(16.005), (I-130)+(1.018)+(16.006), (I-130)+(1.018)+(16.007), (I-130)+(1.018)+(16.008), (I-130)+(1.018)+(17.001), (I-130)+(1.018)+(17.002), (I-130)+(1.018)+(17.003), (I-130)+(1.018)+(17.004), (I-130)+(1.018)+(17.005), (I-130)+(1.018)+(17.006), (I-130)+(1.018)+(17.007), (I-130)+(1.018)+(17.008), (I-130)+(1.018)+(17.009), (I-130)+(1.018)+(17.010), (I-130)+(1.018)+(17.011), (I-130)+(1.018)+(17.012), (I-130)+(1.018)+(18.001), (I-130)+(1.019)+(1.020), (I-130)+(1.019)+(1.021), (I-130)+(1.019)+(1.022), (I-130)+(1.019)+(1.023), (I-130)+(1.019)+(1.024), (I-130)+(1.019)+(1.025), (I-130)+(1.019)+(1.026), (I-130)+(1.019)+(1.027), (I-130)+(1.019)+(1.028), (I-130)+(1.019)+(1.029), (I-130)+(1.019)+(1.030), (I-130)+(1.019)+(1.031), (I-130)+(1.019)+(1.032), (I-130)+(1.019)+(1.033), (I-130)+(1.019)+(1.034), (I-130)+(1.019)+(1.035), (I-130)+(1.019)+(1.036), (I-130)+(1.019)+(1.037), (I-130)+(1.019)+(1.038), (I-130)+(1.019)+(1.039), (I-130)+(1.019)+(1.040), (I-130)+(1.019)+(1.041), (I-130)+(1.019)+(1.042), (I-130)+(1.019)+(1.043), (I-130)+(1.019)+(1.044), (I-130)+(1.019)+(1.045), (I-130)+(1.019)+(1.046), (I-130)+(1.019)+(1.047), (I-130)+(1.019)+(1.048), (I-130)+(1.019)+(1.049), (I-130)+(1.019)+(1.050), (I-130)+(1.019)+(1.051), (I-130)+(1.019)+(1.052), (I-130)+(1.019)+(1.053), (I-130)+(1.019)+(1.054), (I-130)+(1.019)+(1.055), (I-130)+(1.019)+(1.056), (I-130)+(1.019)+(1.057), (I-130)+(1.019)+(1.058), (I-130)+(1.019)+(1.059), (I-130)+(1.019)+(1.060), (I-130)+(1.019)+(1.061), (I-130)+(1.019)+(1.062), (I-130)+(1.019)+(1.063), (I-130)+(1.019)+(1.064), (I-130)+(1.019)+(1.065), (I-130)+(1.019)+(1.066), (I-130)+(1.019)+(1.067), (I-130)+(1.019)+(1.068), (I-130)+(1.019)+(1.069), (I-130)+(1.019)+(1.070), (I-130)+(1.019)+(1.071), (I-130)+(1.019)+(1.072), (I-130)+(1.019)+(1.073), (I-130)+(1.019)+(1.074), (I-130)+(1.019)+(1.075), (I-130)+(1.019)+(1.076), (I-130)+(1.019)+(1.077), (I-130)+(1.019)+(1.078), (I-130)+(1.019)+(1.079), (I-130)+(1.019)+(1.080), (I-130)+(1.019)+(1.081), (I-130)+(1.019)+(1.082), (I-130)+(1.019)+(1.083), (I-130)+(1.019)+(1.084), (I-130)+(1.019)+(1.085), (I-130)+(1.019)+(1.086), (I-130)+(1.019)+(1.087), (I-130)+(1.019)+(1.088), (I-130)+(1.019)+(1.089), (I-130)+(1.019)+(1.090), (I-130)+(1.019)+(1.091), (I-130)+(1.019)+(1.092), (I-130)+(1.019)+(2.001), (I-130)+(1.019)+(2.002), (I-130)+(1.019)+(2.003), (I-130)+(1.019)+(2.004), (I-130)+(1.019)+(2.005), (I-130)+(1.019)+(2.006), (I-130)+(1.019)+(2.007), (I-130)+(1.019)+(2.008), (I-130)+(1.019)+(2.009), (I-130)+(1.019)+(2.010), (I-130)+(1.019)+(2.011), (I-130)+(1.019)+(2.012), (I-130)+(1.019)+(2.013), (I-130)+(1.019)+(2.014), (I-130)+(1.019)+(2.015), (I-130)+(1.019)+(2.016), (I-130)+(1.019)+(2.017), (I-130)+(1.019)+(2.018), (I-130)+(1.019)+(2.019), (I-130)+(1.019)+(2.020), (I-130)+(1.019)+(2.021), (I-130)+(1.019)+(2.022), (I-130)+(1.019)+(2.023), (I-130)+(1.019)+(2.024), (I-130)+(1.019)+(2.025), (I-130)+(1.019)+(2.026), (I-130)+(1.019)+(2.027), (I-130)+(1.019)+(2.028), (I-130)+(1.019)+(2.029), (I-130)+(1.019)+(2.030), (I-130)+(1.019)+(2.031), (I-130)+(1.019)+(2.032), (I-130)+(1.019)+(2.033), (I-130)+(1.019)+(2.034), (I-130)+(1.019)+(2.035), (I-130)+(1.019)+(2.036), (I-130)+(1.019)+(2.037), (I-130)+(1.019)+(2.038), (I-130)+(1.019)+(2.039), (I-130)+(1.019)+(2.040), (I-130)+(1.019)+(2.041), (I-130)+(1.019)+(2.042), (I-130)+(1.019)+(2.043), (I-130)+(1.019)+(2.044), (I-130)+(1.019)+(2.045), (I-130)+(1.019)+(2.046), (I-130)+(1.019)+(2.047), (I-130)+(1.019)+(2.048), (I-130)+(1.019)+(2.049), (I-130)+(1.019)+(2.050), (I-130)+(1.019)+(2.051), (I-130)+(1.019)+(2.052), (I-130)+(1.019)+(2.053), (I-130)+(1.019)+(2.054), (I-130)+(1.019)+(2.055), (I-130)+(1.019)+(2.056), (I-130)+(1.019)+(2.057), (I-130)+(1.019)+(2.058), (I-130)+(1.019)+(2.059), (I-130)+(1.019)+(3.001), (I-130)+(1.019)+(3.002), (I-130)+(1.019)+(3.003), (I-130)+(1.019)+(3.004), (I-130)+(1.019)+(3.005), (I-130)+(1.019)+(3.006), (I-130)+(1.019)+(3.007), (I-130)+(1.019)+(3.008), (I-130)+(1.019)+(3.009), (I-130)+(1.019)+(3.010), (I-130)+(1.019)+(3.011), (I-130)+(1.019)+(3.012), (I-130)+(1.019)+(3.013), (I-130)+(1.019)+(3.014), (I-130)+(1.019)+(3.015), (I-130)+(1.019)+(3.016), (I-130)+(1.019)+(3.017), (I-130)+(1.019)+(3.018), (I-130)+(1.019)+(3.019), (I-130)+(1.019)+(3.020), (I-130)+(1.019)+(3.021), (I-130)+(1.019)+(3.022), (I-130)+(1.019)+(3.023), (I-130)+(1.019)+(3.024), (I-130)+(1.019)+(3.025), (I-130)+(1.019)+(3.026), (I-130)+(1.019)+(3.027), (I-130)+(1.019)+(3.028), (I-130)+(1.019)+(3.029), (I-130)+(1.019)+(3.030), (I-130)+(1.019)+(3.031), (I-130)+(1.019)+(5.001), (I-130)+(1.019)+(5.002), (I-130)+(1.019)+(5.003), (I-130)+(1.019)+(5.004), (I-130)+(1.019)+(5.005), (I-130)+(1.019)+(5.006), (I-130)+(1.019)+(5.007), (I-130)+(1.019)+(5.008), (I-130)+(1.019)+(5.009), (I-130)+(1.019)+(5.010), (I-130)+(1.019)+(5.011), (I-130)+(1.019)+(5.012), (I-130)+(1.019)+(5.013), (I-130)+(1.019)+(5.014), (I-130)+(1.019)+(5.015), (I-130)+(1.019)+(5.016), (I-130)+(1.019)+(5.017), (I-130)+(1.019)+(5.018), (I-130)+(1.019)+(5.019), (I-130)+(1.019)+(5.020), (I-130)+(1.019)+(5.021), (I-130)+(1.019)+(5.022), (I-130)+(1.019)+(5.023), (I-130)+(1.019)+(6.001), (I-130)+(1.019)+(6.002), (I-130)+(1.019)+(6.003), (I-130)+(1.019)+(6.004), (I-130)+(1.019)+(7.001), (I-130)+(1.019)+(7.002), (I-130)+(1.019)+(7.003), (I-130)+(1.019)+(7.004), (I-130)+(1.019)+(7.005), (I-130)+(1.019)+(7.006), (I-130)+(1.019)+(9.001), (I-130)+(1.019)+(9.002), (I-130)+(1.019)+(9.003), (I-130)+(1.019)+(9.004), (I-130)+(1.019)+(9.005), (I-130)+(1.019)+(9.006), (I-130)+(1.019)+(9.007), (I-130)+(1.019)+(9.008), (I-130)+(1.019)+(9.009), (I-130)+(1.019)+(14.001), (I-130)+(1.019)+(14.002), (I-130)+(1.019)+(15.008), (I-130)+(1.019)+(15.011), (I-130)+(1.019)+(15.012), (I-130)+(1.019)+(15.016), (I-130)+(1.019)+(15.025), (I-130)+(1.019)+(15.027), (I-130)+(1.019)+(15.047), (I-130)+(1.019)+(15.063), (I-130)+(1.019)+(15.064), (I-130)+(1.019)+(16.001), (I-130)+(1.019)+(16.002), (I-130)+(1.019)+(16.003), (I-130)+(1.019)+(16.004), (I-130)+(1.019)+(16.005), (I-130)+(1.019)+(16.006), (I-130)+(1.019)+(16.007), (I-130)+(1.019)+(16.008), (I-130)+(1.019)+(17.001), (I-130)+(1.019)+(17.002), (I-130)+(1.019)+(17.003), (I-130)+(1.019)+(17.004), (I-130)+(1.019)+(17.005), (I-130)+(1.019)+(17.006), (I-130)+(1.019)+(17.007), (I-130)+(1.019)+(17.008), (I-130)+(1.019)+(17.009), (I-130)+(1.019)+(17.010), (I-130)+(1.019)+(17.011), (I-130)+(1.019)+(17.012), (I-130)+(1.019)+(18.001), (I-130)+(1.020)+(1.021), (I-130)+(1.020)+(1.022), (I-130)+(1.020)+(1.023), (I-130)+(1.020)+(1.024), (I-130)+(1.020)+(1.025), (I-130)+(1.020)+(1.026), (I-130)+(1.020)+(1.027), (I-130)+(1.020)+(1.028), (I-130)+(1.020)+(1.029), (I-130)+(1.020)+(1.030), (I-130)+(1.020)+(1.031), (I-130)+(1.020)+(1.032), (I-130)+(1.020)+(1.033), (I-130)+(1.020)+(1.034), (I-130)+(1.020)+(1.035), (I-130)+(1.020)+(1.036), (I-130)+(1.020)+(1.037), (I-130)+(1.020)+(1.038), (I-130)+(1.020)+(1.039), (I-130)+(1.020)+(1.040), (I-130)+(1.020)+(1.041), (I-130)+(1.020)+(1.042), (I-130)+(1.020)+(1.043), (I-130)+(1.020)+(1.044), (I-130)+(1.020)+(1.045), (I-130)+(1.020)+(1.046), (I-130)+(1.020)+(1.047), (I-130)+(1.020)+(1.048), (I-130)+(1.020)+(1.049), (I-130)+(1.020)+(1.050), (I-130)+(1.020)+(1.051), (I-130)+(1.020)+(1.052), (I-130)+(1.020)+(1.053), (I-130)+(1.020)+(1.054), (I-130)+(1.020)+(1.055), (I-130)+(1.020)+(1.056), (I-130)+(1.020)+(1.057), (I-130)+(1.020)+(1.058), (I-130)+(1.020)+(1.059), (I-130)+(1.020)+(1.060), (I-130)+(1.020)+(1.061), (I-130)+(1.020)+(1.062), (I-130)+(1.020)+(1.063), (I-130)+(1.020)+(1.064), (I-130)+(1.020)+(1.065), (I-130)+(1.020)+(1.066), (I-130)+(1.020)+(1.067), (I-130)+(1.020)+(1.068), (I-130)+(1.020)+(1.069), (I-130)+(1.020)+(1.070), (I-130)+(1.020)+(1.071), (I-130)+(1.020)+(1.072), (I-130)+(1.020)+(1.073), (I-130)+(1.020)+(1.074), (I-130)+(1.020)+(1.075), (I-130)+(1.020)+(1.076), (I-130)+(1.020)+(1.077), (I-130)+(1.020)+(1.078), (I-130)+(1.020)+(1.079), (I-130)+(1.020)+(1.080), (I-130)+(1.020)+(1.081), (I-130)+(1.020)+(1.082), (I-130)+(1.020)+(1.083), (I-130)+(1.020)+(1.084), (I-130)+(1.020)+(1.085), (I-130)+(1.020)+(1.086), (I-130)+(1.020)+(1.087), (I-130)+(1.020)+(1.088), (I-130)+(1.020)+(1.089), (I-130)+(1.020)+(1.090), (I-130)+(1.020)+(1.091), (I-130)+(1.020)+(1.092), (I-130)+(1.020)+(2.001), (I-130)+(1.020)+(2.002), (I-130)+(1.020)+(2.003), (I-130)+(1.020)+(2.004), (I-130)+(1.020)+(2.005), (I-130)+(1.020)+(2.006), (I-130)+(1.020)+(2.007), (I-130)+(1.020)+(2.008), (I-130)+(1.020)+(2.009), (I-130)+(1.020)+(2.010), (I-130)+(1.020)+(2.011), (I-130)+(1.020)+(2.012), (I-130)+(1.020)+(2.013), (I-130)+(1.020)+(2.014), (I-130)+(1.020)+(2.015), (I-130)+(1.020)+(2.016), (I-130)+(1.020)+(2.017), (I-130)+(1.020)+(2.018), (I-130)+(1.020)+(2.019), (I-130)+(1.020)+(2.020), (I-130)+(1.020)+(2.021), (I-130)+(1.020)+(2.022), (I-130)+(1.020)+(2.023), (I-130)+(1.020)+(2.024), (I-130)+(1.020)+(2.025), (I-130)+(1.020)+(2.026), (I-130)+(1.020)+(2.027), (I-130)+(1.020)+(2.028), (I-130)+(1.020)+(2.029), (I-130)+(1.020)+(2.030), (I-130)+(1.020)+(2.031), (I-130)+(1.020)+(2.032), (I-130)+(1.020)+(2.033), (I-130)+(1.020)+(2.034), (I-130)+(1.020)+(2.035), (I-130)+(1.020)+(2.036), (I-130)+(1.020)+(2.037), (I-130)+(1.020)+(2.038), (I-130)+(1.020)+(2.039), (I-130)+(1.020)+(2.040), (I-130)+(1.020)+(2.041), (I-130)+(1.020)+(2.042), (I-130)+(1.020)+(2.043), (I-130)+(1.020)+(2.044), (I-130)+(1.020)+(2.045), (I-130)+(1.020)+(2.046), (I-130)+(1.020)+(2.047), (I-130)+(1.020)+(2.048), (I-130)+(1.020)+(2.049), (I-130)+(1.020)+(2.050), (I-130)+(1.020)+(2.051), (I-130)+(1.020)+(2.052), (I-130)+(1.020)+(2.053), (I-130)+(1.020)+(2.054), (I-130)+(1.020)+(2.055), (I-130)+(1.020)+(2.056), (I-130)+(1.020)+(2.057), (I-130)+(1.020)+(2.058), (I-130)+(1.020)+(2.059), (I-130)+(1.020)+(3.001), (I-130)+(1.020)+(3.002), (I-130)+(1.020)+(3.003), (I-130)+(1.020)+(3.004), (I-130)+(1.020)+(3.005), (I-130)+(1.020)+(3.006), (I-130)+(1.020)+(3.007), (I-130)+(1.020)+(3.008), (I-130)+(1.020)+(3.009), (I-130)+(1.020)+(3.010), (I-130)+(1.020)+(3.011), (I-130)+(1.020)+(3.012), (I-130)+(1.020)+(3.013), (I-130)+(1.020)+(3.014), (I-130)+(1.020)+(3.015), (I-130)+(1.020)+(3.016), (I-130)+(1.020)+(3.017), (I-130)+(1.020)+(3.018), (I-130)+(1.020)+(3.019), (I-130)+(1.020)+(3.020), (I-130)+(1.020)+(3.021), (I-130)+(1.020)+(3.022), (I-130)+(1.020)+(3.023), (I-130)+(1.020)+(3.024), (I-130)+(1.020)+(3.025), (I-130)+(1.020)+(3.026), (I-130)+(1.020)+(3.027), (I-130)+(1.020)+(3.028), (I-130)+(1.020)+(3.029), (I-130)+(1.020)+(3.030), (I-130)+(1.020)+(3.031), (I-130)+(1.020)+(5.001), (I-130)+(1.020)+(5.002), (I-130)+(1.020)+(5.003), (I-130)+(1.020)+(5.004), (I-130)+(1.020)+(5.005), (I-130)+(1.020)+(5.006), (I-130)+(1.020)+(5.007), (I-130)+(1.020)+(5.008), (I-130)+(1.020)+(5.009), (I-130)+(1.020)+(5.010), (I-130)+(1.020)+(5.011), (I-130)+(1.020)+(5.012), (I-130)+(1.020)+(5.013), (I-130)+(1.020)+(5.014), (I-130)+(1.020)+(5.015), (I-130)+(1.020)+(5.016), (I-130)+(1.020)+(5.017), (I-130)+(1.020)+(5.018), (I-130)+(1.020)+(5.019), (I-130)+(1.020)+(5.020), (I-130)+(1.020)+(5.021), (I-130)+(1.020)+(5.022), (I-130)+(1.020)+(5.023), (I-130)+(1.020)+(6.001), (I-130)+(1.020)+(6.002), (I-130)+(1.020)+(6.003), (I-130)+(1.020)+(6.004), (I-130)+(1.020)+(7.001), (I-130)+(1.020)+(7.002), (I-130)+(1.020)+(7.003), (I-130)+(1.020)+(7.004), (I-130)+(1.020)+(7.005), (I-130)+(1.020)+(7.006), (I-130)+(1.020)+(9.001), (I-130)+(1.020)+(9.002), (I-130)+(1.020)+(9.003), (I-130)+(1.020)+(9.004), (I-130)+(1.020)+(9.005), (I-130)+(1.020)+(9.006), (I-130)+(1.020)+(9.007), (I-130)+(1.020)+(9.008), (I-130)+(1.020)+(9.009), (I-130)+(1.020)+(14.001), (I-130)+(1.020)+(14.002), (I-130)+(1.020)+(15.008), (I-130)+(1.020)+(15.011), (I-130)+(1.020)+(15.012), (I-130)+(1.020)+(15.016), (I-130)+(1.020)+(15.025), (I-130)+(1.020)+(15.027), (I-130)+(1.020)+(15.047), (I-130)+(1.020)+(15.063), (I-130)+(1.020)+(15.064), (I-130)+(1.020)+(16.001), (I-130)+(1.020)+(16.002), (I-130)+(1.020)+(16.003), (I-130)+(1.020)+(16.004), (I-130)+(1.020)+(16.005), (I-130)+(1.020)+(16.006), (I-130)+(1.020)+(16.007), (I-130)+(1.020)+(16.008), (I-130)+(1.020)+(17.001), (I-130)+(1.020)+(17.002), (I-130)+(1.020)+(17.003), (I-130)+(1.020)+(17.004), (I-130)+(1.020)+(17.005), (I-130)+(1.020)+(17.006), (I-130)+(1.020)+(17.007), (I-130)+(1.020)+(17.008), (I-130)+(1.020)+(17.009), (I-130)+(1.020)+(17.010), (I-130)+(1.020)+(17.011), (I-130)+(1.020)+(17.012), (I-130)+(1.020)+(18.001), (I-130)+(1.021)+(1.022), (I-130)+(1.021)+(1.023), (I-130)+(1.021)+(1.024), (I-130)+(1.021)+(1.025), (I-130)+(1.021)+(1.026), (I-130)+(1.021)+(1.027), (I-130)+(1.021)+(1.028), (I-130)+(1.021)+(1.029), (I-130)+(1.021)+(1.030), (I-130)+(1.021)+(1.031), (I-130)+(1.021)+(1.032), (I-130)+(1.021)+(1.033), (I-130)+(1.021)+(1.034), (I-130)+(1.021)+(1.035), (I-130)+(1.021)+(1.036), (I-130)+(1.021)+(1.037), (I-130)+(1.021)+(1.038), (I-130)+(1.021)+(1.039), (I-130)+(1.021)+(1.040), (I-130)+(1.021)+(1.041), (I-130)+(1.021)+(1.042), (I-130)+(1.021)+(1.043), (I-130)+(1.021)+(1.044), (I-130)+(1.021)+(1.045), (I-130)+(1.021)+(1.046), (I-130)+(1.021)+(1.047), (I-130)+(1.021)+(1.048), (I-130)+(1.021)+(1.049), (I-130)+(1.021)+(1.050), (I-130)+(1.021)+(1.051), (I-130)+(1.021)+(1.052), (I-130)+(1.021)+(1.053), (I-130)+(1.021)+(1.054), (I-130)+(1.021)+(1.055), (I-130)+(1.021)+(1.056), (I-130)+(1.021)+(1.057), (I-130)+(1.021)+(1.058), (I-130)+(1.021)+(1.059), (I-130)+(1.021)+(1.060), (I-130)+(1.021)+(1.061), (I-130)+(1.021)+(1.062), (I-130)+(1.021)+(1.063), (I-130)+(1.021)+(1.064), (I-130)+(1.021)+(1.065), (I-130)+(1.021)+(1.066), (I-130)+(1.021)+(1.067), (I-130)+(1.021)+(1.068), (I-130)+(1.021)+(1.069), (I-130)+(1.021)+(1.070), (I-130)+(1.021)+(1.071), (I-130)+(1.021)+(1.072), (I-130)+(1.021)+(1.073), (I-130)+(1.021)+(1.074), (I-130)+(1.021)+(1.075), (I-130)+(1.021)+(1.076), (I-130)+(1.021)+(1.077), (I-130)+(1.021)+(1.078), (I-130)+(1.021)+(1.079), (I-130)+(1.021)+(1.080), (I-130)+(1.021)+(1.081), (I-130)+(1.021)+(1.082), (I-130)+(1.021)+(1.083), (I-130)+(1.021)+(1.084), (I-130)+(1.021)+(1.085), (I-130)+(1.021)+(1.086), (I-130)+(1.021)+(1.087), (I-130)+(1.021)+(1.088), (I-130)+(1.021)+(1.089), (I-130)+(1.021)+(1.090), (I-130)+(1.021)+(1.091), (I-130)+(1.021)+(1.092), (I-130)+(1.021)+(2.001), (I-130)+(1.021)+(2.002), (I-130)+(1.021)+(2.003), (I-130)+(1.021)+(2.004), (I-130)+(1.021)+(2.005), (I-130)+(1.021)+(2.006), (I-130)+(1.021)+(2.007), (I-130)+(1.021)+(2.008), (I-130)+(1.021)+(2.009), (I-130)+(1.021)+(2.010), (I-130)+(1.021)+(2.011), (I-130)+(1.021)+(2.012), (I-130)+(1.021)+(2.013), (I-130)+(1.021)+(2.014), (I-130)+(1.021)+(2.015), (I-130)+(1.021)+(2.016), (I-130)+(1.021)+(2.017), (I-130)+(1.021)+(2.018), (I-130)+(1.021)+(2.019), (I-130)+(1.021)+(2.020), (I-130)+(1.021)+(2.021), (I-130)+(1.021)+(2.022), (I-130)+(1.021)+(2.023), (I-130)+(1.021)+(2.024), (I-130)+(1.021)+(2.025), (I-130)+(1.021)+(2.026), (I-130)+(1.021)+(2.027), (I-130)+(1.021)+(2.028), (I-130)+(1.021)+(2.029), (I-130)+(1.021)+(2.030), (I-130)+(1.021)+(2.031), (I-130)+(1.021)+(2.032), (I-130)+(1.021)+(2.033), (I-130)+(1.021)+(2.034), (I-130)+(1.021)+(2.035), (I-130)+(1.021)+(2.036), (I-130)+(1.021)+(2.037), (I-130)+(1.021)+(2.038), (I-130)+(1.021)+(2.039), (I-130)+(1.021)+(2.040), (I-130)+(1.021)+(2.041), (I-130)+(1.021)+(2.042), (I-130)+(1.021)+(2.043), (I-130)+(1.021)+(2.044), (I-130)+(1.021)+(2.045), (I-130)+(1.021)+(2.046), (I-130)+(1.021)+(2.047), (I-130)+(1.021)+(2.048), (I-130)+(1.021)+(2.049), (I-130)+(1.021)+(2.050), (I-130)+(1.021)+(2.051), (I-130)+(1.021)+(2.052), (I-130)+(1.021)+(2.053), (I-130)+(1.021)+(2.054), (I-130)+(1.021)+(2.055), (I-130)+(1.021)+(2.056), (I-130)+(1.021)+(2.057), (I-130)+(1.021)+(2.058), (I-130)+(1.021)+(2.059), (I-130)+(1.021)+(3.001), (I-130)+(1.021)+(3.002), (I-130)+(1.021)+(3.003), (I-130)+(1.021)+(3.004), (I-130)+(1.021)+(3.005), (I-130)+(1.021)+(3.006), (I-130)+(1.021)+(3.007), (I-130)+(1.021)+(3.008), (I-130)+(1.021)+(3.009), (I-130)+(1.021)+(3.010), (I-130)+(1.021)+(3.011), (I-130)+(1.021)+(3.012), (I-130)+(1.021)+(3.013), (I-130)+(1.021)+(3.014), (I-130)+(1.021)+(3.015), (I-130)+(1.021)+(3.016), (I-130)+(1.021)+(3.017), (I-130)+(1.021)+(3.018), (I-130)+(1.021)+(3.019), (I-130)+(1.021)+(3.020), (I-130)+(1.021)+(3.021), (I-130)+(1.021)+(3.022), (I-130)+(1.021)+(3.023), (I-130)+(1.021)+(3.024), (I-130)+(1.021)+(3.025), (I-130)+(1.021)+(3.026), (I-130)+(1.021)+(3.027), (I-130)+(1.021)+(3.028), (I-130)+(1.021)+(3.029), (I-130)+(1.021)+(3.030), (I-130)+(1.021)+(3.031), (I-130)+(1.021)+(5.001), (I-130)+(1.021)+(5.002), (I-130)+(1.021)+(5.003), (I-130)+(1.021)+(5.004), (I-130)+(1.021)+(5.005), (I-130)+(1.021)+(5.006), (I-130)+(1.021)+(5.007), (I-130)+(1.021)+(5.008), (I-130)+(1.021)+(5.009), (I-130)+(1.021)+(5.010), (I-130)+(1.021)+(5.011), (I-130)+(1.021)+(5.012), (I-130)+(1.021)+(5.013), (I-130)+(1.021)+(5.014), (I-130)+(1.021)+(5.015), (I-130)+(1.021)+(5.016), (I-130)+(1.021)+(5.017), (I-130)+(1.021)+(5.018), (I-130)+(1.021)+(5.019), (I-130)+(1.021)+(5.020), (I-130)+(1.021)+(5.021), (I-130)+(1.021)+(5.022), (I-130)+(1.021)+(5.023), (I-130)+(1.021)+(6.001), (I-130)+(1.021)+(6.002), (I-130)+(1.021)+(6.003), (I-130)+(1.021)+(6.004), (I-130)+(1.021)+(7.001), (I-130)+(1.021)+(7.002), (I-130)+(1.021)+(7.003), (I-130)+(1.021)+(7.004), (I-130)+(1.021)+(7.005), (I-130)+(1.021)+(7.006), (I-130)+(1.021)+(9.001), (I-130)+(1.021)+(9.002), (I-130)+(1.021)+(9.003), (I-130)+(1.021)+(9.004), (I-130)+(1.021)+(9.005), (I-130)+(1.021)+(9.006), (I-130)+(1.021)+(9.007), (I-130)+(1.021)+(9.008), (I-130)+(1.021)+(9.009), (I-130)+(1.021)+(14.001), (I-130)+(1.021)+(14.002), (I-130)+(1.021)+(15.008), (I-130)+(1.021)+(15.011), (I-130)+(1.021)+(15.012), (I-130)+(1.021)+(15.016), (I-130)+(1.021)+(15.025), (I-130)+(1.021)+(15.027), (I-130)+(1.021)+(15.047), (I-130)+(1.021)+(15.063), (I-130)+(1.021)+(15.064), (I-130)+(1.021)+(16.001), (I-130)+(1.021)+(16.002), (I-130)+(1.021)+(16.003), (I-130)+(1.021)+(16.004), (I-130)+(1.021)+(16.005), (I-130)+(1.021)+(16.006), (I-130)+(1.021)+(16.007), (I-130)+(1.021)+(16.008), (I-130)+(1.021)+(17.001), (I-130)+(1.021)+(17.002), (I-130)+(1.021)+(17.003), (I-130)+(1.021)+(17.004), (I-130)+(1.021)+(17.005), (I-130)+(1.021)+(17.006), (I-130)+(1.021)+(17.007), (I-130)+(1.021)+(17.008), (I-130)+(1.021)+(17.009), (I-130)+(1.021)+(17.010), (I-130)+(1.021)+(17.011), (I-130)+(1.021)+(17.012), (I-130)+(1.021)+(18.001), (I-130)+(1.022)+(1.023), (I-130)+(1.022)+(1.024), (I-130)+(1.022)+(1.025), (I-130)+(1.022)+(1.026), (I-130)+(1.022)+(1.027), (I-130)+(1.022)+(1.028), (I-130)+(1.022)+(1.029), (I-130)+(1.022)+(1.030), (I-130)+(1.022)+(1.031), (I-130)+(1.022)+(1.032), (I-130)+(1.022)+(1.033), (I-130)+(1.022)+(1.034), (I-130)+(1.022)+(1.035), (I-130)+(1.022)+(1.036), (I-130)+(1.022)+(1.037), (I-130)+(1.022)+(1.038), (I-130)+(1.022)+(1.039), (I-130)+(1.022)+(1.040), (I-130)+(1.022)+(1.041), (I-130)+(1.022)+(1.042), (I-130)+(1.022)+(1.043), (I-130)+(1.022)+(1.044), (I-130)+(1.022)+(1.045), (I-130)+(1.022)+(1.046), (I-130)+(1.022)+(1.047), (I-130)+(1.022)+(1.048), (I-130)+(1.022)+(1.049), (I-130)+(1.022)+(1.050), (I-130)+(1.022)+(1.051), (I-130)+(1.022)+(1.052), (I-130)+(1.022)+(1.053), (I-130)+(1.022)+(1.054), (I-130)+(1.022)+(1.055), (I-130)+(1.022)+(1.056), (I-130)+(1.022)+(1.057), (I-130)+(1.022)+(1.058), (I-130)+(1.022)+(1.059), (I-130)+(1.022)+(1.060), (I-130)+(1.022)+(1.061), (I-130)+(1.022)+(1.062), (I-130)+(1.022)+(1.063), (I-130)+(1.022)+(1.064), (I-130)+(1.022)+(1.065), (I-130)+(1.022)+(1.066), (I-130)+(1.022)+(1.067), (I-130)+(1.022)+(1.068), (I-130)+(1.022)+(1.069), (I-130)+(1.022)+(1.070), (I-130)+(1.022)+(1.071), (I-130)+(1.022)+(1.072), (I-130)+(1.022)+(1.073), (I-130)+(1.022)+(1.074), (I-130)+(1.022)+(1.075), (I-130)+(1.022)+(1.076), (I-130)+(1.022)+(1.077), (I-130)+(1.022)+(1.078), (I-130)+(1.022)+(1.079), (I-130)+(1.022)+(1.080), (I-130)+(1.022)+(1.081), (I-130)+(1.022)+(1.082), (I-130)+(1.022)+(1.083), (I-130)+(1.022)+(1.084), (I-130)+(1.022)+(1.085), (I-130)+(1.022)+(1.086), (I-130)+(1.022)+(1.087), (I-130)+(1.022)+(1.088), (I-130)+(1.022)+(1.089), (I-130)+(1.022)+(1.090), (I-130)+(1.022)+(1.091), (I-130)+(1.022)+(1.092), (I-130)+(1.022)+(2.001), (I-130)+(1.022)+(2.002), (I-130)+(1.022)+(2.003), (I-130)+(1.022)+(2.004), (I-130)+(1.022)+(2.005), (I-130)+(1.022)+(2.006), (I-130)+(1.022)+(2.007), (I-130)+(1.022)+(2.008), (I-130)+(1.022)+(2.009), (I-130)+(1.022)+(2.010), (I-130)+(1.022)+(2.011), (I-130)+(1.022)+(2.012), (I-130)+(1.022)+(2.013), (I-130)+(1.022)+(2.014), (I-130)+(1.022)+(2.015), (I-130)+(1.022)+(2.016), (I-130)+(1.022)+(2.017), (I-130)+(1.022)+(2.018), (I-130)+(1.022)+(2.019), (I-130)+(1.022)+(2.020), (I-130)+(1.022)+(2.021), (I-130)+(1.022)+(2.022), (I-130)+(1.022)+(2.023), (I-130)+(1.022)+(2.024), (I-130)+(1.022)+(2.025), (I-130)+(1.022)+(2.026), (I-130)+(1.022)+(2.027), (I-130)+(1.022)+(2.028), (I-130)+(1.022)+(2.029), (I-130)+(1.022)+(2.030), (I-130)+(1.022)+(2.031), (I-130)+(1.022)+(2.032), (I-130)+(1.022)+(2.033), (I-130)+(1.022)+(2.034), (I-130)+(1.022)+(2.035), (I-130)+(1.022)+(2.036), (I-130)+(1.022)+(2.037), (I-130)+(1.022)+(2.038), (I-130)+(1.022)+(2.039), (I-130)+(1.022)+(2.040), (I-130)+(1.022)+(2.041), (I-130)+(1.022)+(2.042), (I-130)+(1.022)+(2.043), (I-130)+(1.022)+(2.044), (I-130)+(1.022)+(2.045), (I-130)+(1.022)+(2.046), (I-130)+(1.022)+(2.047), (I-130)+(1.022)+(2.048), (I-130)+(1.022)+(2.049), (I-130)+(1.022)+(2.050), (I-130)+(1.022)+(2.051), (I-130)+(1.022)+(2.052), (I-130)+(1.022)+(2.053), (I-130)+(1.022)+(2.054), (I-130)+(1.022)+(2.055), (I-130)+(1.022)+(2.056), (I-130)+(1.022)+(2.057), (I-130)+(1.022)+(2.058), (I-130)+(1.022)+(2.059), (I-130)+(1.022)+(3.001), (I-130)+(1.022)+(3.002), (I-130)+(1.022)+(3.003), (I-130)+(1.022)+(3.004), (I-130)+(1.022)+(3.005), (I-130)+(1.022)+(3.006), (I-130)+(1.022)+(3.007), (I-130)+(1.022)+(3.008), (I-130)+(1.022)+(3.009), (I-130)+(1.022)+(3.010), (I-130)+(1.022)+(3.011), (I-130)+(1.022)+(3.012), (I-130)+(1.022)+(3.013), (I-130)+(1.022)+(3.014), (I-130)+(1.022)+(3.015), (I-130)+(1.022)+(3.016), (I-130)+(1.022)+(3.017), (I-130)+(1.022)+(3.018), (I-130)+(1.022)+(3.019), (I-130)+(1.022)+(3.020), (I-130)+(1.022)+(3.021), (I-130)+(1.022)+(3.022), (I-130)+(1.022)+(3.023), (I-130)+(1.022)+(3.024), (I-130)+(1.022)+(3.025), (I-130)+(1.022)+(3.026), (I-130)+(1.022)+(3.027), (I-130)+(1.022)+(3.028), (I-130)+(1.022)+(3.029), (I-130)+(1.022)+(3.030), (I-130)+(1.022)+(3.031), (I-130)+(1.022)+(5.001), (I-130)+(1.022)+(5.002), (I-130)+(1.022)+(5.003), (I-130)+(1.022)+(5.004), (I-130)+(1.022)+(5.005), (I-130)+(1.022)+(5.006), (I-130)+(1.022)+(5.007), (I-130)+(1.022)+(5.008), (I-130)+(1.022)+(5.009), (I-130)+(1.022)+(5.010), (I-130)+(1.022)+(5.011), (I-130)+(1.022)+(5.012), (I-130)+(1.022)+(5.013), (I-130)+(1.022)+(5.014), (I-130)+(1.022)+(5.015), (I-130)+(1.022)+(5.016), (I-130)+(1.022)+(5.017), (I-130)+(1.022)+(5.018), (I-130)+(1.022)+(5.019), (I-130)+(1.022)+(5.020), (I-130)+(1.022)+(5.021), (I-130)+(1.022)+(5.022), (I-130)+(1.022)+(5.023), (I-130)+(1.022)+(6.001), (I-130)+(1.022)+(6.002), (I-130)+(1.022)+(6.003), (I-130)+(1.022)+(6.004), (I-130)+(1.022)+(7.001), (I-130)+(1.022)+(7.002), (I-130)+(1.022)+(7.003), (I-130)+(1.022)+(7.004), (I-130)+(1.022)+(7.005), (I-130)+(1.022)+(7.006), (I-130)+(1.022)+(9.001), (I-130)+(1.022)+(9.002), (I-130)+(1.022)+(9.003), (I-130)+(1.022)+(9.004), (I-130)+(1.022)+(9.005), (I-130)+(1.022)+(9.006), (I-130)+(1.022)+(9.007), (I-130)+(1.022)+(9.008), (I-130)+(1.022)+(9.009), (I-130)+(1.022)+(14.001), (I-130)+(1.022)+(14.002), (I-130)+(1.022)+(15.008), (I-130)+(1.022)+(15.011), (I-130)+(1.022)+(15.012), (I-130)+(1.022)+(15.016), (I-130)+(1.022)+(15.025), (I-130)+(1.022)+(15.027), (I-130)+(1.022)+(15.047), (I-130)+(1.022)+(15.063), (I-130)+(1.022)+(15.064), (I-130)+(1.022)+(16.001), (I-130)+(1.022)+(16.002), (I-130)+(1.022)+(16.003), (I-130)+(1.022)+(16.004), (I-130)+(1.022)+(16.005), (I-130)+(1.022)+(16.006), (I-130)+(1.022)+(16.007), (I-130)+(1.022)+(16.008), (I-130)+(1.022)+(17.001), (I-130)+(1.022)+(17.002), (I-130)+(1.022)+(17.003), (I-130)+(1.022)+(17.004), (I-130)+(1.022)+(17.005), (I-130)+(1.022)+(17.006), (I-130)+(1.022)+(17.007), (I-130)+(1.022)+(17.008), (I-130)+(1.022)+(17.009), (I-130)+(1.022)+(17.010), (I-130)+(1.022)+(17.011), (I-130)+(1.022)+(17.012), (I-130)+(1.022)+(18.001), (I-130)+(1.023)+(1.024), (I-130)+(1.023)+(1.025), (I-130)+(1.023)+(1.026), (I-130)+(1.023)+(1.027), (I-130)+(1.023)+(1.028), (I-130)+(1.023)+(1.029), (I-130)+(1.023)+(1.030), (I-130)+(1.023)+(1.031), (I-130)+(1.023)+(1.032), (I-130)+(1.023)+(1.033), (I-130)+(1.023)+(1.034), (I-130)+(1.023)+(1.035), (I-130)+(1.023)+(1.036), (I-130)+(1.023)+(1.037), (I-130)+(1.023)+(1.038), (I-130)+(1.023)+(1.039), (I-130)+(1.023)+(1.040), (I-130)+(1.023)+(1.041), (I-130)+(1.023)+(1.042), (I-130)+(1.023)+(1.043), (I-130)+(1.023)+(1.044), (I-130)+(1.023)+(1.045), (I-130)+(1.023)+(1.046), (I-130)+(1.023)+(1.047), (I-130)+(1.023)+(1.048), (I-130)+(1.023)+(1.049), (I-130)+(1.023)+(1.050), (I-130)+(1.023)+(1.051), (I-130)+(1.023)+(1.052), (I-130)+(1.023)+(1.053), (I-130)+(1.023)+(1.054), (I-130)+(1.023)+(1.055), (I-130)+(1.023)+(1.056), (I-130)+(1.023)+(1.057), (I-130)+(1.023)+(1.058), (I-130)+(1.023)+(1.059), (I-130)+(1.023)+(1.060), (I-130)+(1.023)+(1.061), (I-130)+(1.023)+(1.062), (I-130)+(1.023)+(1.063), (I-130)+(1.023)+(1.064), (I-130)+(1.023)+(1.065), (I-130)+(1.023)+(1.066), (I-130)+(1.023)+(1.067), (I-130)+(1.023)+(1.068), (I-130)+(1.023)+(1.069), (I-130)+(1.023)+(1.070), (I-130)+(1.023)+(1.071), (I-130)+(1.023)+(1.072), (I-130)+(1.023)+(1.073), (I-130)+(1.023)+(1.074), (I-130)+(1.023)+(1.075), (I-130)+(1.023)+(1.076), (I-130)+(1.023)+(1.077), (I-130)+(1.023)+(1.078), (I-130)+(1.023)+(1.079), (I-130)+(1.023)+(1.080), (I-130)+(1.023)+(1.081), (I-130)+(1.023)+(1.082), (I-130)+(1.023)+(1.083), (I-130)+(1.023)+(1.084), (I-130)+(1.023)+(1.085), (I-130)+(1.023)+(1.086), (I-130)+(1.023)+(1.087), (I-130)+(1.023)+(1.088), (I-130)+(1.023)+(1.089), (I-130)+(1.023)+(1.090), (I-130)+(1.023)+(1.091), (I-130)+(1.023)+(1.092), (I-130)+(1.023)+(2.001), (I-130)+(1.023)+(2.002), (I-130)+(1.023)+(2.003), (I-130)+(1.023)+(2.004), (I-130)+(1.023)+(2.005), (I-130)+(1.023)+(2.006), (I-130)+(1.023)+(2.007), (I-130)+(1.023)+(2.008), (I-130)+(1.023)+(2.009), (I-130)+(1.023)+(2.010), (I-130)+(1.023)+(2.011), (I-130)+(1.023)+(2.012), (I-130)+(1.023)+(2.013), (I-130)+(1.023)+(2.014), (I-130)+(1.023)+(2.015), (I-130)+(1.023)+(2.016), (I-130)+(1.023)+(2.017), (I-130)+(1.023)+(2.018), (I-130)+(1.023)+(2.019), (I-130)+(1.023)+(2.020), (I-130)+(1.023)+(2.021), (I-130)+(1.023)+(2.022), (I-130)+(1.023)+(2.023), (I-130)+(1.023)+(2.024), (I-130)+(1.023)+(2.025), (I-130)+(1.023)+(2.026), (I-130)+(1.023)+(2.027), (I-130)+(1.023)+(2.028), (I-130)+(1.023)+(2.029), (I-130)+(1.023)+(2.030), (I-130)+(1.023)+(2.031), (I-130)+(1.023)+(2.032), (I-130)+(1.023)+(2.033), (I-130)+(1.023)+(2.034), (I-130)+(1.023)+(2.035), (I-130)+(1.023)+(2.036), (I-130)+(1.023)+(2.037), (I-130)+(1.023)+(2.038), (I-130)+(1.023)+(2.039), (I-130)+(1.023)+(2.040), (I-130)+(1.023)+(2.041), (I-130)+(1.023)+(2.042), (I-130)+(1.023)+(2.043), (I-130)+(1.023)+(2.044), (I-130)+(1.023)+(2.045), (I-130)+(1.023)+(2.046), (I-130)+(1.023)+(2.047), (I-130)+(1.023)+(2.048), (I-130)+(1.023)+(2.049), (I-130)+(1.023)+(2.050), (I-130)+(1.023)+(2.051), (I-130)+(1.023)+(2.052), (I-130)+(1.023)+(2.053), (I-130)+(1.023)+(2.054), (I-130)+(1.023)+(2.055), (I-130)+(1.023)+(2.056), (I-130)+(1.023)+(2.057), (I-130)+(1.023)+(2.058), (I-130)+(1.023)+(2.059), (I-130)+(1.023)+(3.001), (I-130)+(1.023)+(3.002), (I-130)+(1.023)+(3.003), (I-130)+(1.023)+(3.004), (I-130)+(1.023)+(3.005), (I-130)+(1.023)+(3.006), (I-130)+(1.023)+(3.007), (I-130)+(1.023)+(3.008), (I-130)+(1.023)+(3.009), (I-130)+(1.023)+(3.010), (I-130)+(1.023)+(3.011), (I-130)+(1.023)+(3.012), (I-130)+(1.023)+(3.013), (I-130)+(1.023)+(3.014), (I-130)+(1.023)+(3.015), (I-130)+(1.023)+(3.016), (I-130)+(1.023)+(3.017), (I-130)+(1.023)+(3.018), (I-130)+(1.023)+(3.019), (I-130)+(1.023)+(3.020), (I-130)+(1.023)+(3.021), (I-130)+(1.023)+(3.022), (I-130)+(1.023)+(3.023), (I-130)+(1.023)+(3.024), (I-130)+(1.023)+(3.025), (I-130)+(1.023)+(3.026), (I-130)+(1.023)+(3.027), (I-130)+(1.023)+(3.028), (I-130)+(1.023)+(3.029), (I-130)+(1.023)+(3.030), (I-130)+(1.023)+(3.031), (I-130)+(1.023)+(5.001), (I-130)+(1.023)+(5.002), (I-130)+(1.023)+(5.003), (I-130)+(1.023)+(5.004), (I-130)+(1.023)+(5.005), (I-130)+(1.023)+(5.006), (I-130)+(1.023)+(5.007), (I-130)+(1.023)+(5.008), (I-130)+(1.023)+(5.009), (I-130)+(1.023)+(5.010), (I-130)+(1.023)+(5.011), (I-130)+(1.023)+(5.012), (I-130)+(1.023)+(5.013), (I-130)+(1.023)+(5.014), (I-130)+(1.023)+(5.015), (I-130)+(1.023)+(5.016), (I-130)+(1.023)+(5.017), (I-130)+(1.023)+(5.018), (I-130)+(1.023)+(5.019), (I-130)+(1.023)+(5.020), (I-130)+(1.023)+(5.021), (I-130)+(1.023)+(5.022), (I-130)+(1.023)+(5.023), (I-130)+(1.023)+(6.001), (I-130)+(1.023)+(6.002), (I-130)+(1.023)+(6.003), (I-130)+(1.023)+(6.004), (I-130)+(1.023)+(7.001), (I-130)+(1.023)+(7.002), (I-130)+(1.023)+(7.003), (I-130)+(1.023)+(7.004), (I-130)+(1.023)+(7.005), (I-130)+(1.023)+(7.006), (I-130)+(1.023)+(9.001), (I-130)+(1.023)+(9.002), (I-130)+(1.023)+(9.003), (I-130)+(1.023)+(9.004), (I-130)+(1.023)+(9.005), (I-130)+(1.023)+(9.006), (I-130)+(1.023)+(9.007), (I-130)+(1.023)+(9.008), (I-130)+(1.023)+(9.009), (I-130)+(1.023)+(14.001), (I-130)+(1.023)+(14.002), (I-130)+(1.023)+(15.008), (I-130)+(1.023)+(15.011), (I-130)+(1.023)+(15.012), (I-130)+(1.023)+(15.016), (I-130)+(1.023)+(15.025), (I-130)+(1.023)+(15.027), (I-130)+(1.023)+(15.047), (I-130)+(1.023)+(15.063), (I-130)+(1.023)+(15.064), (I-130)+(1.023)+(16.001), (I-130)+(1.023)+(16.002), (I-130)+(1.023)+(16.003), (I-130)+(1.023)+(16.004), (I-130)+(1.023)+(16.005), (I-130)+(1.023)+(16.006), (I-130)+(1.023)+(16.007), (I-130)+(1.023)+(16.008), (I-130)+(1.023)+(17.001), (I-130)+(1.023)+(17.002), (I-130)+(1.023)+(17.003), (I-130)+(1.023)+(17.004), (I-130)+(1.023)+(17.005), (I-130)+(1.023)+(17.006), (I-130)+(1.023)+(17.007), (I-130)+(1.023)+(17.008), (I-130)+(1.023)+(17.009), (I-130)+(1.023)+(17.010), (I-130)+(1.023)+(17.011), (I-130)+(1.023)+(17.012), (I-130)+(1.023)+(18.001), (I-130)+(1.024)+(1.025), (I-130)+(1.024)+(1.026), (I-130)+(1.024)+(1.027), (I-130)+(1.024)+(1.028), (I-130)+(1.024)+(1.029), (I-130)+(1.024)+(1.030), (I-130)+(1.024)+(1.031), (I-130)+(1.024)+(1.032), (I-130)+(1.024)+(1.033), (I-130)+(1.024)+(1.034), (I-130)+(1.024)+(1.035), (I-130)+(1.024)+(1.036), (I-130)+(1.024)+(1.037), (I-130)+(1.024)+(1.038), (I-130)+(1.024)+(1.039), (I-130)+(1.024)+(1.040), (I-130)+(1.024)+(1.041), (I-130)+(1.024)+(1.042), (I-130)+(1.024)+(1.043), (I-130)+(1.024)+(1.044), (I-130)+(1.024)+(1.045), (I-130)+(1.024)+(1.046), (I-130)+(1.024)+(1.047), (I-130)+(1.024)+(1.048), (I-130)+(1.024)+(1.049), (I-130)+(1.024)+(1.050), (I-130)+(1.024)+(1.051), (I-130)+(1.024)+(1.052), (I-130)+(1.024)+(1.053), (I-130)+(1.024)+(1.054), (I-130)+(1.024)+(1.055), (I-130)+(1.024)+(1.056), (I-130)+(1.024)+(1.057), (I-130)+(1.024)+(1.058), (I-130)+(1.024)+(1.059), (I-130)+(1.024)+(1.060), (I-130)+(1.024)+(1.061), (I-130)+(1.024)+(1.062), (I-130)+(1.024)+(1.063), (I-130)+(1.024)+(1.064), (I-130)+(1.024)+(1.065), (I-130)+(1.024)+(1.066), (I-130)+(1.024)+(1.067), (I-130)+(1.024)+(1.068), (I-130)+(1.024)+(1.069), (I-130)+(1.024)+(1.070), (I-130)+(1.024)+(1.071), (I-130)+(1.024)+(1.072), (I-130)+(1.024)+(1.073), (I-130)+(1.024)+(1.074), (I-130)+(1.024)+(1.075), (I-130)+(1.024)+(1.076), (I-130)+(1.024)+(1.077), (I-130)+(1.024)+(1.078), (I-130)+(1.024)+(1.079), (I-130)+(1.024)+(1.080), (I-130)+(1.024)+(1.081), (I-130)+(1.024)+(1.082), (I-130)+(1.024)+(1.083), (I-130)+(1.024)+(1.084), (I-130)+(1.024)+(1.085), (I-130)+(1.024)+(1.086), (I-130)+(1.024)+(1.087), (I-130)+(1.024)+(1.088), (I-130)+(1.024)+(1.089), (I-130)+(1.024)+(1.090), (I-130)+(1.024)+(1.091), (I-130)+(1.024)+(1.092), (I-130)+(1.024)+(2.001), (I-130)+(1.024)+(2.002), (I-130)+(1.024)+(2.003), (I-130)+(1.024)+(2.004), (I-130)+(1.024)+(2.005), (I-130)+(1.024)+(2.006), (I-130)+(1.024)+(2.007), (I-130)+(1.024)+(2.008), (I-130)+(1.024)+(2.009), (I-130)+(1.024)+(2.010), (I-130)+(1.024)+(2.011), (I-130)+(1.024)+(2.012), (I-130)+(1.024)+(2.013), (I-130)+(1.024)+(2.014), (I-130)+(1.024)+(2.015), (I-130)+(1.024)+(2.016), (I-130)+(1.024)+(2.017), (I-130)+(1.024)+(2.018), (I-130)+(1.024)+(2.019), (I-130)+(1.024)+(2.020), (I-130)+(1.024)+(2.021), (I-130)+(1.024)+(2.022), (I-130)+(1.024)+(2.023), (I-130)+(1.024)+(2.024), (I-130)+(1.024)+(2.025), (I-130)+(1.024)+(2.026), (I-130)+(1.024)+(2.027), (I-130)+(1.024)+(2.028), (I-130)+(1.024)+(2.029), (I-130)+(1.024)+(2.030), (I-130)+(1.024)+(2.031), (I-130)+(1.024)+(2.032), (I-130)+(1.024)+(2.033), (I-130)+(1.024)+(2.034), (I-130)+(1.024)+(2.035), (I-130)+(1.024)+(2.036), (I-130)+(1.024)+(2.037), (I-130)+(1.024)+(2.038), (I-130)+(1.024)+(2.039), (I-130)+(1.024)+(2.040),
(I-130)+(1.024)+(2.041), (I-130)+(1.024)+(2.042),
(I-130)+(1.024)+(2.043), (I-130)+(1.024)+(2.044),
(I-130)+(1.024)+(2.045), (I-130)+(1.024)+(2.046),
(I-130)+(1.024)+(2.047), (I-130)+(1.024)+(2.048),
(I-130)+(1.024)+(2.049), (I-130)+(1.024)+(2.050),
(I-130)+(1.024)+(2.051), (I-130)+(1.024)+(2.052),
(I-130)+(1.024)+(2.053), (I-130)+(1.024)+(2.054),
(I-130)+(1.024)+(2.055), (I-130)+(1.024)+(2.056),
(I-130)+(1.024)+(2.057), (I-130)+(1.024)+(2.058),
(I-130)+(1.024)+(2.059), (I-130)+(1.024)+(3.001),
(I-130)+(1.024)+(3.002), (I-130)+(1.024)+(3.003),
(I-130)+(1.024)+(3.004), (I-130)+(1.024)+(3.005),
(I-130)+(1.024)+(3.006), (I-130)+(1.024)+(3.007),
(I-130)+(1.024)+(3.008), (I-130)+(1.024)+(3.009),
(I-130)+(1.024)+(3.010), (I-130)+(1.024)+(3.011),
(I-130)+(1.024)+(3.012), (I-130)+(1.024)+(3.013),
(I-130)+(1.024)+(3.014), (I-130)+(1.024)+(3.015),
(I-130)+(1.024)+(3.016), (I-130)+(1.024)+(3.017),
(I-130)+(1.024)+(3.018), (I-130)+(1.024)+(3.019),
(I-130)+(1.024)+(3.020), (I-130)+(1.024)+(3.021),
(I-130)+(1.024)+(3.022), (I-130)+(1.024)+(3.023),
(I-130)+(1.024)+(3.024), (I-130)+(1.024)+(3.025),
(I-130)+(1.024)+(3.026), (I-130)+(1.024)+(3.027),
(I-130)+(1.024)+(3.028), (I-130)+(1.024)+(3.029),
(I-130)+(1.024)+(3.030), (I-130)+(1.024)+(3.031),
(I-130)+(1.024)+(5.001), (I-130)+(1.024)+(5.002),
(I-130)+(1.024)+(5.003), (I-130)+(1.024)+(5.004),
(I-130)+(1.024)+(5.005), (I-130)+(1.024)+(5.006),
(I-130)+(1.024)+(5.007), (I-130)+(1.024)+(5.008),
(I-130)+(1.024)+(5.009), (I-130)+(1.024)+(5.010),
(I-130)+(1.024)+(5.011), (I-130)+(1.024)+(5.012),
(I-130)+(1.024)+(5.013), (I-130)+(1.024)+(5.014),
(I-130)+(1.024)+(5.015), (I-130)+(1.024)+(5.016),
(I-130)+(1.024)+(5.017), (I-130)+(1.024)+(5.018),
(I-130)+(1.024)+(5.019), (I-130)+(1.024)+(5.020),
(I-130)+(1.024)+(5.021), (I-130)+(1.024)+(5.022),
(I-130)+(1.024)+(5.023), (I-130)+(1.024)+(6.001),
(I-130)+(1.024)+(6.002), (I-130)+(1.024)+(6.003),
(I-130)+(1.024)+(6.004), (I-130)+(1.024)+(7.001),
(I-130)+(1.024)+(7.002), (I-130)+(1.024)+(7.003),
(I-130)+(1.024)+(7.004), (I-130)+(1.024)+(7.005),
(I-130)+(1.024)+(7.006), (I-130)+(1.024)+(9.001),
(I-130)+(1.024)+(9.002), (I-130)+(1.024)+(9.003),
(I-130)+(1.024)+(9.004), (I-130)+(1.024)+(9.005),
(I-130)+(1.024)+(9.006), (I-130)+(1.024)+(9.007),
(I-130)+(1.024)+(9.008), (I-130)+(1.024)+(9.009),
(I-130)+(1.024)+(14.001), (I-130)+(1.024)+(14.002),
(I-130)+(1.024)+(15.008), (I-130)+(1.024)+(15.011),
(I-130)+(1.024)+(15.012), (I-130)+(1.024)+(15.016),
(I-130)+(1.024)+(15.025), (I-130)+(1.024)+(15.027),
(I-130)+(1.024)+(15.047), (I-130)+(1.024)+(15.063),
(I-130)+(1.024)+(15.064), (I-130)+(1.024)+(16.001),
(I-130)+(1.024)+(16.002), (I-130)+(1.024)+(16.003),
(I-130)+(1.024)+(16.004), (I-130)+(1.024)+(16.005),
(I-130)+(1.024)+(16.006), (I-130)+(1.024)+(16.007),
(I-130)+(1.024)+(16.008), (I-130)+(1.024)+(17.001),
(I-130)+(1.024)+(17.002), (I-130)+(1.024)+(17.003),
(I-130)+(1.024)+(17.004), (I-130)+(1.024)+(17.005),
(I-130)+(1.024)+(17.006), (I-130)+(1.024)+(17.007),
(I-130)+(1.024)+(17.008), (I-130)+(1.024)+(17.009),
(I-130)+(1.024)+(17.010), (I-130)+(1.024)+(17.011),
(I-130)+(1.024)+(17.012), (I-130)+(1.024)+(18.001),
(I-130)+(1.025)+(1.026), (I-130)+(1.025)+(1.027),
(I-130)+(1.025)+(1.028), (I-130)+(1.025)+(1.029),
(I-130)+(1.025)+(1.030), (I-130)+(1.025)+(1.031),
(I-130)+(1.025)+(1.032), (I-130)+(1.025)+(1.033),
(I-130)+(1.025)+(1.034), (I-130)+(1.025)+(1.035),
(I-130)+(1.025)+(1.036), (I-130)+(1.025)+(1.037),
(I-130)+(1.025)+(1.038), (I-130)+(1.025)+(1.039),
(I-130)+(1.025)+(1.040), (I-130)+(1.025)+(1.041),
(I-130)+(1.025)+(1.042), (I-130)+(1.025)+(1.043),
(I-130)+(1.025)+(1.044), (I-130)+(1.025)+(1.045),
(I-130)+(1.025)+(1.046), (I-130)+(1.025)+(1.047),
(I-130)+(1.025)+(1.048), (I-130)+(1.025)+(1.049),
(I-130)+(1.025)+(1.050), (I-130)+(1.025)+(1.051),
(I-130)+(1.025)+(1.052), (I-130)+(1.025)+(1.053),
(I-130)+(1.025)+(1.054), (I-130)+(1.025)+(1.055),
(I-130)+(1.025)+(1.056), (I-130)+(1.025)+(1.057),
(I-130)+(1.025)+(1.058), (I-130)+(1.025)+(1.059),
(I-130)+(1.025)+(1.060), (I-130)+(1.025)+(1.061),
(I-130)+(1.025)+(1.062), (I-130)+(1.025)+(1.063),
(I-130)+(1.025)+(1.064), (I-130)+(1.025)+(1.065),
(I-130)+(1.025)+(1.066), (I-130)+(1.025)+(1.067),
(I-130)+(1.025)+(1.068), (I-130)+(1.025)+(1.069),
(I-130)+(1.025)+(1.070), (I-130)+(1.025)+(1.071),
(I-130)+(1.025)+(1.072), (I-130)+(1.025)+(1.073),
(I-130)+(1.025)+(1.074), (I-130)+(1.025)+(1.075),
(I-130)+(1.025)+(1.076), (I-130)+(1.025)+(1.077),
(I-130)+(1.025)+(1.078), (I-130)+(1.025)+(1.079),
(I-130)+(1.025)+(1.080), (I-130)+(1.025)+(1.081),
(I-130)+(1.025)+(1.082), (I-130)+(1.025)+(1.083),
(I-130)+(1.025)+(1.084), (I-130)+(1.025)+(1.085),
(I-130)+(1.025)+(1.086), (I-130)+(1.025)+(1.087),
(I-130)+(1.025)+(1.088), (I-130)+(1.025)+(1.089),
(I-130)+(1.025)+(1.090), (I-130)+(1.025)+(1.091),
(I-130)+(1.025)+(1.092), (I-130)+(1.025)+(2.001),
(I-130)+(1.025)+(2.002), (I-130)+(1.025)+(2.003),
(I-130)+(1.025)+(2.004), (I-130)+(1.025)+(2.005),
(I-130)+(1.025)+(2.006), (I-130)+(1.025)+(2.007),
(I-130)+(1.025)+(2.008), (I-130)+(1.025)+(2.009),
(I-130)+(1.025)+(2.010), (I-130)+(1.025)+(2.011),
(I-130)+(1.025)+(2.012), (I-130)+(1.025)+(2.013),
(I-130)+(1.025)+(2.014), (I-130)+(1.025)+(2.015),
(I-130)+(1.025)+(2.016), (I-130)+(1.025)+(2.017),
(I-130)+(1.025)+(2.018), (I-130)+(1.025)+(2.019),
(I-130)+(1.025)+(2.020), (I-130)+(1.025)+(2.021),
(I-130)+(1.025)+(2.022), (I-130)+(1.025)+(2.023),
(I-130)+(1.025)+(2.024), (I-130)+(1.025)+(2.025),
(I-130)+(1.025)+(2.026), (I-130)+(1.025)+(2.027),
(I-130)+(1.025)+(2.028), (I-130)+(1.025)+(2.029),
(I-130)+(1.025)+(2.030), (I-130)+(1.025)+(2.031),
(I-130)+(1.025)+(2.032), (I-130)+(1.025)+(2.033),
(I-130)+(1.025)+(2.034), (I-130)+(1.025)+(2.035),
(I-130)+(1.025)+(2.036), (I-130)+(1.025)+(2.037),
(I-130)+(1.025)+(2.038), (I-130)+(1.025)+(2.039),
(I-130)+(1.025)+(2.040), (I-130)+(1.025)+(2.041),
(I-130)+(1.025)+(2.042), (I-130)+(1.025)+(2.043),
(I-130)+(1.025)+(2.044), (I-130)+(1.025)+(2.045),
(I-130)+(1.025)+(2.046), (I-130)+(1.025)+(2.047),
(I-130)+(1.025)+(2.048), (I-130)+(1.025)+(2.049),
(I-130)+(1.025)+(2.050), (I-130)+(1.025)+(2.051),
(I-130)+(1.025)+(2.052), (I-130)+(1.025)+(2.053),
(I-130)+(1.025)+(2.054), (I-130)+(1.025)+(2.055),
(I-130)+(1.025)+(2.056), (I-130)+(1.025)+(2.057),
(I-130)+(1.025)+(2.058), (I-130)+(1.025)+(2.059),
(I-130)+(1.025)+(3.001), (I-130)+(1.025)+(3.002),
(I-130)+(1.025)+(3.003), (I-130)+(1.025)+(3.004),
(I-130)+(1.025)+(3.005), (I-130)+(1.025)+(3.006),
(I-130)+(1.025)+(3.007), (I-130)+(1.025)+(3.008),
(I-130)+(1.025)+(3.009), (I-130)+(1.025)+(3.010),
(I-130)+(1.025)+(3.011), (I-130)+(1.025)+(3.012),
(I-130)+(1.025)+(3.013), (I-130)+(1.025)+(3.014),
(I-130)+(1.025)+(3.015), (I-130)+(1.025)+(3.016), (I-130)+(1.025)+(3.017), (I-130)+(1.025)+(3.018),
(I-130)+(1.025)+(3.019), (I-130)+(1.025)+(3.020),
(I-130)+(1.025)+(3.021), (I-130)+(1.025)+(3.022),
(I-130)+(1.025)+(3.023), (I-130)+(1.025)+(3.024),
(I-130)+(1.025)+(3.025), (I-130)+(1.025)+(3.026),
(I-130)+(1.025)+(3.027), (I-130)+(1.025)+(3.028),
(I-130)+(1.025)+(3.029), (I-130)+(1.025)+(3.030),
(I-130)+(1.025)+(3.031), (I-130)+(1.025)+(5.001),
(I-130)+(1.025)+(5.002), (I-130)+(1.025)+(5.003),
(I-130)+(1.025)+(5.004), (I-130)+(1.025)+(5.005),
(I-130)+(1.025)+(5.006), (I-130)+(1.025)+(5.007),
(I-130)+(1.025)+(5.008), (I-130)+(1.025)+(5.009),
(I-130)+(1.025)+(5.010), (I-130)+(1.025)+(5.011),
(I-130)+(1.025)+(5.012), (I-130)+(1.025)+(5.013),
(I-130)+(1.025)+(5.014), (I-130)+(1.025)+(5.015),
(I-130)+(1.025)+(5.016), (I-130)+(1.025)+(5.017),
(I-130)+(1.025)+(5.018), (I-130)+(1.025)+(5.019),
(I-130)+(1.025)+(5.020), (I-130)+(1.025)+(5.021),
(I-130)+(1.025)+(5.022), (I-130)+(1.025)+(5.023),
(I-130)+(1.025)+(6.001), (I-130)+(1.025)+(6.002),
(I-130)+(1.025)+(6.003), (I-130)+(1.025)+(6.004),
(I-130)+(1.025)+(7.001), (I-130)+(1.025)+(7.002),
(I-130)+(1.025)+(7.003), (I-130)+(1.025)+(7.004),
(I-130)+(1.025)+(7.005), (I-130)+(1.025)+(7.006),
(I-130)+(1.025)+(9.001), (I-130)+(1.025)+(9.002),
(I-130)+(1.025)+(9.003), (I-130)+(1.025)+(9.004),
(I-130)+(1.025)+(9.005), (I-130)+(1.025)+(9.006),
(I-130)+(1.025)+(9.007), (I-130)+(1.025)+(9.008),
(I-130)+(1.025)+(9.009), (I-130)+(1.025)+(14.001),
(I-130)+(1.025)+(14.002), (I-130)+(1.025)+(15.008),
(I-130)+(1.025)+(15.011), (I-130)+(1.025)+(15.012),
(I-130)+(1.025)+(15.016), (I-130)+(1.025)+(15.025),
(I-130)+(1.025)+(15.027), (I-130)+(1.025)+(15.047),
(I-130)+(1.025)+(15.063), (I-130)+(1.025)+(15.064),
(I-130)+(1.025)+(16.001), (I-130)+(1.025)+(16.002),
(I-130)+(1.025)+(16.003), (I-130)+(1.025)+(16.004),
(I-130)+(1.025)+(16.005), (I-130)+(1.025)+(16.006),
(I-130)+(1.025)+(16.007), (I-130)+(1.025)+(16.008),
(I-130)+(1.025)+(17.001), (I-130)+(1.025)+(17.002),
(I-130)+(1.025)+(17.003), (I-130)+(1.025)+(17.004),
(I-130)+(1.025)+(17.005), (I-130)+(1.025)+(17.006),
(I-130)+(1.025)+(17.007), (I-130)+(1.025)+(17.008),
(I-130)+(1.025)+(17.009), (I-130)+(1.025)+(17.010),
(I-130)+(1.025)+(17.011), (I-130)+(1.025)+(17.012),
(I-130)+(1.025)+(18.001), (I-130)+(1.026)+(1.027), (I-130)+(1.026)+(1.028),
(I-130)+(1.026)+(1.029), (I-130)+(1.026)+(1.030),
(I-130)+(1.026)+(1.031), (I-130)+(1.026)+(1.032),
(I-130)+(1.026)+(1.033), (I-130)+(1.026)+(1.034),
(I-130)+(1.026)+(1.035), (I-130)+(1.026)+(1.036),
(I-130)+(1.026)+(1.037), (I-130)+(1.026)+(1.038),
(I-130)+(1.026)+(1.039), (I-130)+(1.026)+(1.040),
(I-130)+(1.026)+(1.041), (I-130)+(1.026)+(1.042),
(I-130)+(1.026)+(1.043), (I-130)+(1.026)+(1.044),
(I-130)+(1.026)+(1.045), (I-130)+(1.026)+(1.046),
(I-130)+(1.026)+(1.047), (I-130)+(1.026)+(1.048),
(I-130)+(1.026)+(1.049), (I-130)+(1.026)+(1.050),
(I-130)+(1.026)+(1.051), (I-130)+(1.026)+(1.052),
(I-130)+(1.026)+(1.053), (I-130)+(1.026)+(1.054),
(I-130)+(1.026)+(1.055), (I-130)+(1.026)+(1.056),
(I-130)+(1.026)+(1.057), (I-130)+(1.026)+(1.058),
(I-130)+(1.026)+(1.059), (I-130)+(1.026)+(1.060),
(I-130)+(1.026)+(1.061), (I-130)+(1.026)+(1.062),
(I-130)+(1.026)+(1.063), (I-130)+(1.026)+(1.064),
(I-130)+(1.026)+(1.065), (I-130)+(1.026)+(1.066),
(I-130)+(1.026)+(1.067), (I-130)+(1.026)+(1.068),
(I-130)+(1.026)+(1.069), (I-130)+(1.026)+(1.070),
(I-130)+(1.026)+(1.071), (I-130)+(1.026)+(1.072),
(I-130)+(1.026)+(1.073), (I-130)+(1.026)+(1.074),
(I-130)+(1.026)+(1.075), (I-130)+(1.026)+(1.076),
(I-130)+(1.026)+(1.077), (I-130)+(1.026)+(1.078),
(I-130)+(1.026)+(1.079), (I-130)+(1.026)+(1.080),
(I-130)+(1.026)+(1.081), (I-130)+(1.026)+(1.082),
(I-130)+(1.026)+(1.083), (I-130)+(1.026)+(1.084),
(I-130)+(1.026)+(1.085), (I-130)+(1.026)+(1.086),
(I-130)+(1.026)+(1.087), (I-130)+(1.026)+(1.088),
(I-130)+(1.026)+(1.089), (I-130)+(1.026)+(1.090),
(I-130)+(1.026)+(1.091), (I-130)+(1.026)+(1.092),
(I-130)+(1.026)+(2.001), (I-130)+(1.026)+(2.002),
(I-130)+(1.026)+(2.003), (I-130)+(1.026)+(2.004),
(I-130)+(1.026)+(2.005), (I-130)+(1.026)+(2.006),
(I-130)+(1.026)+(2.007), (I-130)+(1.026)+(2.008),
(I-130)+(1.026)+(2.009), (I-130)+(1.026)+(2.010),
(I-130)+(1.026)+(2.011), (I-130)+(1.026)+(2.012),
(I-130)+(1.026)+(2.013), (I-130)+(1.026)+(2.014),
(I-130)+(1.026)+(2.015), (I-130)+(1.026)+(2.016),
(I-130)+(1.026)+(2.017), (I-130)+(1.026)+(2.018),
(I-130)+(1.026)+(2.019), (I-130)+(1.026)+(2.020),
(I-130)+(1.026)+(2.021), (I-130)+(1.026)+(2.022),
(I-130)+(1.026)+(2.023), (I-130)+(1.026)+(2.024),
(I-130)+(1.026)+(2.025), (I-130)+(1.026)+(2.026),
(I-130)+(1.026)+(2.027), (I-130)+(1.026)+(2.028),
(I-130)+(1.026)+(2.029), (I-130)+(1.026)+(2.030),
(I-130)+(1.026)+(2.031), (I-130)+(1.026)+(2.032),
(I-130)+(1.026)+(2.033), (I-130)+(1.026)+(2.034),
(I-130)+(1.026)+(2.035), (I-130)+(1.026)+(2.036),
(I-130)+(1.026)+(2.037), (I-130)+(1.026)+(2.038),
(I-130)+(1.026)+(2.039), (I-130)+(1.026)+(2.040),
(I-130)+(1.026)+(2.041), (I-130)+(1.026)+(2.042),
(I-130)+(1.026)+(2.043), (I-130)+(1.026)+(2.044),
(I-130)+(1.026)+(2.045), (I-130)+(1.026)+(2.046),
(I-130)+(1.026)+(2.047), (I-130)+(1.026)+(2.048),
(I-130)+(1.026)+(2.049), (I-130)+(1.026)+(2.050),
(I-130)+(1.026)+(2.051), (I-130)+(1.026)+(2.052),
(I-130)+(1.026)+(2.053), (I-130)+(1.026)+(2.054),
(I-130)+(1.026)+(2.055), (I-130)+(1.026)+(2.056),
(I-130)+(1.026)+(2.057), (I-130)+(1.026)+(2.058),
(I-130)+(1.026)+(2.059), (I-130)+(1.026)+(3.001),
(I-130)+(1.026)+(3.002), (I-130)+(1.026)+(3.003),
(I-130)+(1.026)+(3.004), (I-130)+(1.026)+(3.005),
(I-130)+(1.026)+(3.006), (I-130)+(1.026)+(3.007),
(I-130)+(1.026)+(3.008), (I-130)+(1.026)+(3.009),
(I-130)+(1.026)+(3.010), (I-130)+(1.026)+(3.011),
(I-130)+(1.026)+(3.012), (I-130)+(1.026)+(3.013),
(I-130)+(1.026)+(3.014), (I-130)+(1.026)+(3.015),
(I-130)+(1.026)+(3.016), (I-130)+(1.026)+(3.017),
(I-130)+(1.026)+(3.018), (I-130)+(1.026)+(3.019),
(I-130)+(1.026)+(3.020), (I-130)+(1.026)+(3.021),
(I-130)+(1.026)+(3.022), (I-130)+(1.026)+(3.023),
(I-130)+(1.026)+(3.024), (I-130)+(1.026)+(3.025),
(I-130)+(1.026)+(3.026), (I-130)+(1.026)+(3.027),
(I-130)+(1.026)+(3.028), (I-130)+(1.026)+(3.029),
(I-130)+(1.026)+(3.030), (I-130)+(1.026)+(3.031),
(I-130)+(1.026)+(5.001), (I-130)+(1.026)+(5.002),
(I-130)+(1.026)+(5.003), (I-130)+(1.026)+(5.004),
(I-130)+(1.026)+(5.005), (I-130)+(1.026)+(5.006),
(I-130)+(1.026)+(5.007), (I-130)+(1.026)+(5.008),
(I-130)+(1.026)+(5.009), (I-130)+(1.026)+(5.010),
(I-130)+(1.026)+(5.011), (I-130)+(1.026)+(5.012),
(I-130)+(1.026)+(5.013), (I-130)+(1.026)+(5.014),
(I-130)+(1.026)+(5.015), (I-130)+(1.026)+(5.016),
(I-130)+(1.026)+(5.017), (I-130)+(1.026)+(5.018),
(I-130)+(1.026)+(5.019), (I-130)+(1.026)+(5.020),
(I-130)+(1.026)+(5.021), (I-130)+(1.026)+(5.022), (I-130)+(1.026)+(5.023), (I-130)+(1.026)+(6.001), (I-130)+(1.026)+(6.002), (I-130)+(1.026)+(6.003), (I-130)+(1.026)+(6.004), (I-130)+(1.026)+(7.001), (I-130)+(1.026)+(7.002), (I-130)+(1.026)+(7.003), (I-130)+(1.026)+(7.004), (I-130)+(1.026)+(7.005), (I-130)+(1.026)+(7.006), (I-130)+(1.026)+(9.001), (I-130)+(1.026)+(9.002), (I-130)+(1.026)+(9.003), (I-130)+(1.026)+(9.004), (I-130)+(1.026)+(9.005), (I-130)+(1.026)+(9.006), (I-130)+(1.026)+(9.007), (I-130)+(1.026)+(9.008), (I-130)+(1.026)+(9.009), (I-130)+(1.026)+(14.001), (I-130)+(1.026)+(14.002), (I-130)+(1.026)+(15.008), (I-130)+(1.026)+(15.011), (I-130)+(1.026)+(15.012), (I-130)+(1.026)+(15.016), (I-130)+(1.026)+(15.025), (I-130)+(1.026)+(15.027), (I-130)+(1.026)+(15.047), (I-130)+(1.026)+(15.063), (I-130)+(1.026)+(15.064), (I-130)+(1.026)+(16.001), (I-130)+(1.026)+(16.002), (I-130)+(1.026)+(16.003), (I-130)+(1.026)+(16.004), (I-130)+(1.026)+(16.005), (I-130)+(1.026)+(16.006), (I-130)+(1.026)+(16.007), (I-130)+(1.026)+(16.008), (I-130)+(1.026)+(17.001), (I-130)+(1.026)+(17.002), (I-130)+(1.026)+(17.003), (I-130)+(1.026)+(17.004), (I-130)+(1.026)+(17.005), (I-130)+(1.026)+(17.006), (I-130)+(1.026)+(17.007), (I-130)+(1.026)+(17.008), (I-130)+(1.026)+(17.009), (I-130)+(1.026)+(17.010), (I-130)+(1.026)+(17.011), (I-130)+(1.026)+(17.012), (I-130)+(1.026)+(18.001), (I-130)+(1.027)+(1.028), (I-130)+(1.027)+(1.029), (I-130)+(1.027)+(1.030), (I-130)+(1.027)+(1.031), (I-130)+(1.027)+(1.032), (I-130)+(1.027)+(1.033), (I-130)+(1.027)+(1.034), (I-130)+(1.027)+(1.035), (I-130)+(1.027)+(1.036), (I-130)+(1.027)+(1.037), (I-130)+(1.027)+(1.038), (I-130)+(1.027)+(1.039), (I-130)+(1.027)+(1.040), (I-130)+(1.027)+(1.041), (I-130)+(1.027)+(1.042), (I-130)+(1.027)+(1.043), (I-130)+(1.027)+(1.044), (I-130)+(1.027)+(1.045), (I-130)+(1.027)+(1.046), (I-130)+(1.027)+(1.047), (I-130)+(1.027)+(1.048), (I-130)+(1.027)+(1.049), (I-130)+(1.027)+(1.050), (I-130)+(1.027)+(1.051), (I-130)+(1.027)+(1.052), (I-130)+(1.027)+(1.053), (I-130)+(1.027)+(1.054), (I-130)+(1.027)+(1.055), (I-130)+(1.027)+(1.056), (I-130)+(1.027)+(1.057), (I-130)+(1.027)+(1.058), (I-130)+(1.027)+(1.059), (I-130)+(1.027)+(1.060), (I-130)+(1.027)+(1.061), (I-130)+(1.027)+(1.062), (I-130)+(1.027)+(1.063), (I-130)+(1.027)+(1.064), (I-130)+(1.027)+(1.065), (I-130)+(1.027)+(1.066), (I-130)+(1.027)+(1.067), (I-130)+(1.027)+(1.068), (I-130)+(1.027)+(1.069), (I-130)+(1.027)+(1.070), (I-130)+(1.027)+(1.071), (I-130)+(1.027)+(1.072), (I-130)+(1.027)+(1.073), (I-130)+(1.027)+(1.074), (I-130)+(1.027)+(1.075), (I-130)+(1.027)+(1.076), (I-130)+(1.027)+(1.077), (I-130)+(1.027)+(1.078), (I-130)+(1.027)+(1.079), (I-130)+(1.027)+(1.080), (I-130)+(1.027)+(1.081), (I-130)+(1.027)+(1.082), (I-130)+(1.027)+(1.083), (I-130)+(1.027)+(1.084), (I-130)+(1.027)+(1.085), (I-130)+(1.027)+(1.086), (I-130)+(1.027)+(1.087), (I-130)+(1.027)+(1.088), (I-130)+(1.027)+(1.089), (I-130)+(1.027)+(1.090), (I-130)+(1.027)+(1.091), (I-130)+(1.027)+(1.092), (I-130)+(1.027)+(2.001), (I-130)+(1.027)+(2.002), (I-130)+(1.027)+(2.003), (I-130)+(1.027)+(2.004), (I-130)+(1.027)+(2.005), (I-130)+(1.027)+(2.006), (I-130)+(1.027)+(2.007), (I-130)+(1.027)+(2.008), (I-130)+(1.027)+(2.009), (I-130)+(1.027)+(2.010), (I-130)+(1.027)+(2.011), (I-130)+(1.027)+(2.012), (I-130)+(1.027)+(2.013), (I-130)+(1.027)+(2.014), (I-130)+(1.027)+(2.015), (I-130)+(1.027)+(2.016), (I-130)+(1.027)+(2.017), (I-130)+(1.027)+(2.018), (I-130)+(1.027)+(2.019), (I-130)+(1.027)+(2.020), (I-130)+(1.027)+(2.021), (I-130)+(1.027)+(2.022), (I-130)+(1.027)+(2.023), (I-130)+(1.027)+(2.024), (I-130)+(1.027)+(2.025), (I-130)+(1.027)+(2.026), (I-130)+(1.027)+(2.027), (I-130)+(1.027)+(2.028), (I-130)+(1.027)+(2.029), (I-130)+(1.027)+(2.030), (I-130)+(1.027)+(2.031), (I-130)+(1.027)+(2.032), (I-130)+(1.027)+(2.033), (I-130)+(1.027)+(2.034), (I-130)+(1.027)+(2.035), (I-130)+(1.027)+(2.036), (I-130)+(1.027)+(2.037), (I-130)+(1.027)+(2.038), (I-130)+(1.027)+(2.039), (I-130)+(1.027)+(2.040), (I-130)+(1.027)+(2.041), (I-130)+(1.027)+(2.042), (I-130)+(1.027)+(2.043), (I-130)+(1.027)+(2.044), (I-130)+(1.027)+(2.045), (I-130)+(1.027)+(2.046), (I-130)+(1.027)+(2.047), (I-130)+(1.027)+(2.048), (I-130)+(1.027)+(2.049), (I-130)+(1.027)+(2.050), (I-130)+(1.027)+(2.051), (I-130)+(1.027)+(2.052), (I-130)+(1.027)+(2.053), (I-130)+(1.027)+(2.054), (I-130)+(1.027)+(2.055), (I-130)+(1.027)+(2.056), (I-130)+(1.027)+(2.057), (I-130)+(1.027)+(2.058), (I-130)+(1.027)+(2.059), (I-130)+(1.027)+(3.001), (I-130)+(1.027)+(3.002), (I-130)+(1.027)+(3.003), (I-130)+(1.027)+(3.004), (I-130)+(1.027)+(3.005), (I-130)+(1.027)+(3.006), (I-130)+(1.027)+(3.007), (I-130)+(1.027)+(3.008), (I-130)+(1.027)+(3.009), (I-130)+(1.027)+(3.010), (I-130)+(1.027)+(3.011), (I-130)+(1.027)+(3.012), (I-130)+(1.027)+(3.013), (I-130)+(1.027)+(3.014), (I-130)+(1.027)+(3.015), (I-130)+(1.027)+(3.016), (I-130)+(1.027)+(3.017), (I-130)+(1.027)+(3.018), (I-130)+(1.027)+(3.019), (I-130)+(1.027)+(3.020), (I-130)+(1.027)+(3.021), (I-130)+(1.027)+(3.022), (I-130)+(1.027)+(3.023), (I-130)+(1.027)+(3.024), (I-130)+(1.027)+(3.025), (I-130)+(1.027)+(3.026), (I-130)+(1.027)+(3.027), (I-130)+(1.027)+(3.028), (I-130)+(1.027)+(3.029), (I-130)+(1.027)+(3.030), (I-130)+(1.027)+(3.031), (I-130)+(1.027)+(5.001), (I-130)+(1.027)+(5.002), (I-130)+(1.027)+(5.003), (I-130)+(1.027)+(5.004), (I-130)+(1.027)+(5.005), (I-130)+(1.027)+(5.006), (I-130)+(1.027)+(5.007), (I-130)+(1.027)+(5.008), (I-130)+(1.027)+(5.009), (I-130)+(1.027)+(5.010), (I-130)+(1.027)+(5.011), (I-130)+(1.027)+(5.012), (I-130)+(1.027)+(5.013), (I-130)+(1.027)+(5.014), (I-130)+(1.027)+(5.015), (I-130)+(1.027)+(5.016), (I-130)+(1.027)+(5.017), (I-130)+(1.027)+(5.018), (I-130)+(1.027)+(5.019), (I-130)+(1.027)+(5.020), (I-130)+(1.027)+(5.021), (I-130)+(1.027)+(5.022), (I-130)+(1.027)+(5.023), (I-130)+(1.027)+(6.001), (I-130)+(1.027)+(6.002), (I-130)+(1.027)+(6.003), (I-130)+(1.027)+(6.004), (I-130)+(1.027)+(7.001), (I-130)+(1.027)+(7.002), (I-130)+(1.027)+(7.003), (I-130)+(1.027)+(7.004), (I-130)+(1.027)+(7.005), (I-130)+(1.027)+(7.006), (I-130)+(1.027)+(9.001), (I-130)+(1.027)+(9.002), (I-130)+(1.027)+(9.003), (I-130)+(1.027)+(9.004), (I-130)+(1.027)+(9.005), (I-130)+(1.027)+(9.006), (I-130)+(1.027)+(9.007), (I-130)+(1.027)+(9.008), (I-130)+(1.027)+(9.009), (I-130)+(1.027)+(14.001), (I-130)+(1.027)+(14.002), (I-130)+(1.027)+(15.008), (I-130)+(1.027)+(15.011), (I-130)+(1.027)+(15.012), (I-130)+(1.027)+(15.016), (I-130)+(1.027)+(15.025), (I-130)+(1.027)+(15.027), (I-130)+(1.027)+(15.047), (I-130)+(1.027)+(15.063), (I-130)+(1.027)+(15.064), (I-130)+(1.027)+(16.001), (I-130)+(1.027)+(16.002), (I-130)+(1.027)+(16.003), (I-130)+(1.027)+(16.004), (I-130)+(1.027)+(16.005), (I-130)+(1.027)+(16.006), (I-130)+(1.027)+(16.007), (I-130)+(1.027)+(16.008), (I-130)+(1.027)+(17.001), (I-130)+(1.027)+(17.002), (I-130)+(1.027)+(17.003), (I-130)+(1.027)+(17.004), (I-130)+(1.027)+(17.005), (I-130)+(1.027)+(17.006), (I-130)+(1.027)+(17.007), (I-130)+(1.027)+(17.008), (I-130)+(1.027)+(17.009), (I-130)+(1.027)+(17.010), (I-130)+(1.027)+(17.011), (I-130)+(1.027)+(17.012), (I-130)+(1.027)+(18.001), (I-130)+(1.028)+(1.029), (I-130)+(1.028)+(1.030), (I-130)+(1.028)+(1.031), (I-130)+(1.028)+(1.032), (I-130)+(1.028)+(1.033), (I-130)+(1.028)+(1.034), (I-130)+(1.028)+(1.035), (I-130)+(1.028)+(1.036), (I-130)+(1.028)+(1.037), (I-130)+(1.028)+(1.038), (I-130)+(1.028)+(1.039), (I-130)+(1.028)+(1.040), (I-130)+(1.028)+(1.041), (I-130)+(1.028)+(1.042), (I-130)+(1.028)+(1.043), (I-130)+(1.028)+(1.044), (I-130)+(1.028)+(1.045), (I-130)+(1.028)+(1.046), (I-130)+(1.028)+(1.047), (I-130)+(1.028)+(1.048), (I-130)+(1.028)+(1.049), (I-130)+(1.028)+(1.050), (I-130)+(1.028)+(1.051), (I-130)+(1.028)+(1.052), (I-130)+(1.028)+(1.053), (I-130)+(1.028)+(1.054), (I-130)+(1.028)+(1.055), (I-130)+(1.028)+(1.056), (I-130)+(1.028)+(1.057), (I-130)+(1.028)+(1.058), (I-130)+(1.028)+(1.059), (I-130)+(1.028)+(1.060), (I-130)+(1.028)+(1.061), (I-130)+(1.028)+(1.062), (I-130)+(1.028)+(1.063), (I-130)+(1.028)+(1.064), (I-130)+(1.028)+(1.065), (I-130)+(1.028)+(1.066), (I-130)+(1.028)+(1.067), (I-130)+(1.028)+(1.068), (I-130)+(1.028)+(1.069), (I-130)+(1.028)+(1.070), (I-130)+(1.028)+(1.071), (I-130)+(1.028)+(1.072), (I-130)+(1.028)+(1.073), (I-130)+(1.028)+(1.074), (I-130)+(1.028)+(1.075), (I-130)+(1.028)+(1.076), (I-130)+(1.028)+(1.077), (I-130)+(1.028)+(1.078), (I-130)+(1.028)+(1.079), (I-130)+(1.028)+(1.080), (I-130)+(1.028)+(1.081), (I-130)+(1.028)+(1.082), (I-130)+(1.028)+(1.083), (I-130)+(1.028)+(1.084), (I-130)+(1.028)+(1.085), (I-130)+(1.028)+(1.086), (I-130)+(1.028)+(1.087), (I-130)+(1.028)+(1.088), (I-130)+(1.028)+(1.089), (I-130)+(1.028)+(1.090), (I-130)+(1.028)+(1.091), (I-130)+(1.028)+(1.092), (I-130)+(1.028)+(2.001), (I-130)+(1.028)+(2.002), (I-130)+(1.028)+(2.003), (I-130)+(1.028)+(2.004), (I-130)+(1.028)+(2.005), (I-130)+(1.028)+(2.006), (I-130)+(1.028)+(2.007), (I-130)+(1.028)+(2.008), (I-130)+(1.028)+(2.009), (I-130)+(1.028)+(2.010), (I-130)+(1.028)+(2.011), (I-130)+(1.028)+(2.012), (I-130)+(1.028)+(2.013), (I-130)+(1.028)+(2.014), (I-130)+(1.028)+(2.015), (I-130)+(1.028)+(2.016), (I-130)+(1.028)+(2.017), (I-130)+(1.028)+(2.018), (I-130)+(1.028)+(2.019), (I-130)+(1.028)+(2.020), (I-130)+(1.028)+(2.021), (I-130)+(1.028)+(2.022), (I-130)+(1.028)+(2.023), (I-130)+(1.028)+(2.024), (I-130)+(1.028)+(2.025), (I-130)+(1.028)+(2.026), (I-130)+(1.028)+(2.027), (I-130)+(1.028)+(2.028), (I-130)+(1.028)+(2.029), (I-130)+(1.028)+(2.030), (I-130)+(1.028)+(2.031), (I-130)+(1.028)+(2.032), (I-130)+(1.028)+(2.033), (I-130)+(1.028)+(2.034), (I-130)+(1.028)+(2.035), (I-130)+(1.028)+(2.036), (I-130)+(1.028)+(2.037), (I-130)+(1.028)+(2.038), (I-130)+(1.028)+(2.039), (I-130)+(1.028)+(2.040), (I-130)+(1.028)+(2.041), (I-130)+(1.028)+(2.042), (I-130)+(1.028)+(2.043), (I-130)+(1.028)+(2.044), (I-130)+(1.028)+(2.045), (I-130)+(1.028)+(2.046), (I-130)+(1.028)+(2.047), (I-130)+(1.028)+(2.048), (I-130)+(1.028)+(2.049), (I-130)+(1.028)+(2.050), (I-130)+(1.028)+(2.051), (I-130)+(1.028)+(2.052), (I-130)+(1.028)+(2.053), (I-130)+(1.028)+(2.054), (I-130)+(1.028)+(2.055), (I-130)+(1.028)+(2.056), (I-130)+(1.028)+(2.057), (I-130)+(1.028)+(2.058), (I-130)+(1.028)+(2.059), (I-130)+(1.028)+(3.001), (I-130)+(1.028)+(3.002), (I-130)+(1.028)+(3.003), (I-130)+(1.028)+(3.004), (I-130)+(1.028)+(3.005), (I-130)+(1.028)+(3.006), (I-130)+(1.028)+(3.007), (I-130)+(1.028)+(3.008), (I-130)+(1.028)+(3.009), (I-130)+(1.028)+(3.010), (I-130)+(1.028)+(3.011), (I-130)+(1.028)+(3.012), (I-130)+(1.028)+(3.013), (I-130)+(1.028)+(3.014), (I-130)+(1.028)+(3.015), (I-130)+(1.028)+(3.016), (I-130)+(1.028)+(3.017), (I-130)+(1.028)+(3.018), (I-130)+(1.028)+(3.019), (I-130)+(1.028)+(3.020), (I-130)+(1.028)+(3.021), (I-130)+(1.028)+(3.022), (I-130)+(1.028)+(3.023), (I-130)+(1.028)+(3.024), (I-130)+(1.028)+(3.025), (I-130)+(1.028)+(3.026), (I-130)+(1.028)+(3.027), (I-130)+(1.028)+(3.028), (I-130)+(1.028)+(3.029), (I-130)+(1.028)+(3.030), (I-130)+(1.028)+(3.031), (I-130)+(1.028)+(5.001), (I-130)+(1.028)+(5.002), (I-130)+(1.028)+(5.003), (I-130)+(1.028)+(5.004), (I-130)+(1.028)+(5.005), (I-130)+(1.028)+(5.006), (I-130)+(1.028)+(5.007), (I-130)+(1.028)+(5.008), (I-130)+(1.028)+(5.009), (I-130)+(1.028)+(5.010), (I-130)+(1.028)+(5.011), (I-130)+(1.028)+(5.012), (I-130)+(1.028)+(5.013), (I-130)+(1.028)+(5.014), (I-130)+(1.028)+(5.015), (I-130)+(1.028)+(5.016), (I-130)+(1.028)+(5.017), (I-130)+(1.028)+(5.018), (I-130)+(1.028)+(5.019), (I-130)+(1.028)+(5.020), (I-130)+(1.028)+(5.021), (I-130)+(1.028)+(5.022), (I-130)+(1.028)+(5.023), (I-130)+(1.028)+(6.001), (I-130)+(1.028)+(6.002), (I-130)+(1.028)+(6.003), (I-130)+(1.028)+(6.004), (I-130)+(1.028)+(7.001), (I-130)+(1.028)+(7.002), (I-130)+(1.028)+(7.003), (I-130)+(1.028)+(7.004), (I-130)+(1.028)+(7.005), (I-130)+(1.028)+(7.006), (I-130)+(1.028)+(9.001), (I-130)+(1.028)+(9.002), (I-130)+(1.028)+(9.003), (I-130)+(1.028)+(9.004), (I-130)+(1.028)+(9.005), (I-130)+(1.028)+(9.006), (I-130)+(1.028)+(9.007), (I-130)+(1.028)+(9.008), (I-130)+(1.028)+(9.009), (I-130)+(1.028)+(14.001), (I-130)+(1.028)+(14.002), (I-130)+(1.028)+(15.008), (I-130)+(1.028)+(15.011), (I-130)+(1.028)+(15.012), (I-130)+(1.028)+(15.016), (I-130)+(1.028)+(15.025), (I-130)+(1.028)+(15.027), (I-130)+(1.028)+(15.047), (I-130)+(1.028)+(15.063), (I-130)+(1.028)+(15.064), (I-130)+(1.028)+(16.001), (I-130)+(1.028)+(16.002), (I-130)+(1.028)+(16.003), (I-130)+(1.028)+(16.004), (I-130)+(1.028)+(16.005), (I-130)+(1.028)+(16.006), (I-130)+(1.028)+(16.007), (I-130)+(1.028)+(16.008), (I-130)+(1.028)+(17.001), (I-130)+(1.028)+(17.002), (I-130)+(1.028)+(17.003), (I-130)+(1.028)+(17.004), (I-130)+(1.028)+(17.005), (I-130)+(1.028)+(17.006), (I-130)+(1.028)+(17.007), (I-130)+(1.028)+(17.008), (I-130)+(1.028)+(17.009), (I-130)+(1.028)+(17.010), (I-130)+(1.028)+(17.011), (I-130)+(1.028)+(17.012), (I-130)+(1.028)+(18.001), (I-130)+(1.029)+(1.030), (I-130)+(1.029)+(1.031), (I-130)+(1.029)+(1.032), (I-130)+(1.029)+(1.033), (I-130)+(1.029)+(1.034), (I-130)+(1.029)+(1.035), (I-130)+(1.029)+(1.036), (I-130)+(1.029)+(1.037), (I-130)+(1.029)+(1.038), (I-130)+(1.029)+(1.039), (I-130)+(1.029)+(1.040), (I-130)+(1.029)+(1.041), (I-130)+(1.029)+(1.042), (I-130)+(1.029)+(1.043), (I-130)+(1.029)+(1.044), (I-130)+(1.029)+(1.045), (I-130)+(1.029)+(1.046), (I-130)+(1.029)+(1.047), (I-130)+(1.029)+(1.048), (I-130)+(1.029)+(1.049), (I-130)+(1.029)+(1.050), (I-130)+(1.029)+(1.051), (I-130)+(1.029)+(1.052), (I-130)+(1.029)+(1.053), (I-130)+(1.029)+(1.054), (I-130)+(1.029)+(1.055), (I-130)+(1.029)+(1.056), (I-130)+(1.029)+(1.057), (I-130)+(1.029)+(1.058), (I-130)+(1.029)+(1.059), (I-130)+(1.029)+(1.060), (I-130)+(1.029)+(1.061), (I-130)+(1.029)+(1.062), (I-130)+(1.029)+(1.063), (I-130)+(1.029)+(1.064), (I-130)+(1.029)+(1.065), (I-130)+(1.029)+(1.066), (I-130)+(1.029)+(1.067), (I-130)+(1.029)+(1.068), (I-130)+(1.029)+(1.069), (I-130)+(1.029)+(1.070), (I-130)+(1.029)+(1.071), (I-130)+(1.029)+(1.072), (I-130)+(1.029)+(1.073), (I-130)+(1.029)+(1.074), (I-130)+(1.029)+(1.075), (I-130)+(1.029)+(1.076), (I-130)+(1.029)+(1.077), (I-130)+(1.029)+(1.078), (I-130)+(1.029)+(1.079), (I-130)+(1.029)+(1.080), (I-130)+(1.029)+(1.081), (I-130)+(1.029)+(1.082), (I-130)+(1.029)+(1.083), (I-130)+(1.029)+(1.084), (I-130)+(1.029)+(1.085), (I-130)+(1.029)+(1.086), (I-130)+(1.029)+(1.087), (I-130)+(1.029)+(1.088), (I-130)+(1.029)+(1.089), (I-130)+(1.029)+(1.090), (I-130)+(1.029)+(1.091), (I-130)+(1.029)+(1.092), (I-130)+(1.029)+(2.001), (I-130)+(1.029)+(2.002), (I-130)+(1.029)+(2.003), (I-130)+(1.029)+(2.004), (I-130)+(1.029)+(2.005), (I-130)+(1.029)+(2.006), (I-130)+(1.029)+(2.007), (I-130)+(1.029)+(2.008), (I-130)+(1.029)+(2.009), (I-130)+(1.029)+(2.010), (I-130)+(1.029)+(2.011), (I-130)+(1.029)+(2.012), (I-130)+(1.029)+(2.013), (I-130)+(1.029)+(2.014), (I-130)+(1.029)+(2.015), (I-130)+(1.029)+(2.016), (I-130)+(1.029)+(2.017), (I-130)+(1.029)+(2.018), (I-130)+(1.029)+(2.019), (I-130)+(1.029)+(2.020), (I-130)+(1.029)+(2.021), (I-130)+(1.029)+(2.022), (I-130)+(1.029)+(2.023), (I-130)+(1.029)+(2.024), (I-130)+(1.029)+(2.025), (I-130)+(1.029)+(2.026), (I-130)+(1.029)+(2.027), (I-130)+(1.029)+(2.028), (I-130)+(1.029)+(2.029), (I-130)+(1.029)+(2.030), (I-130)+(1.029)+(2.031), (I-130)+(1.029)+(2.032), (I-130)+(1.029)+(2.033), (I-130)+(1.029)+(2.034), (I-130)+(1.029)+(2.035), (I-130)+(1.029)+(2.036), (I-130)+(1.029)+(2.037), (I-130)+(1.029)+(2.038), (I-130)+(1.029)+(2.039), (I-130)+(1.029)+(2.040), (I-130)+(1.029)+(2.041), (I-130)+(1.029)+(2.042), (I-130)+(1.029)+(2.043), (I-130)+(1.029)+(2.044), (I-130)+(1.029)+(2.045), (I-130)+(1.029)+(2.046), (I-130)+(1.029)+(2.047), (I-130)+(1.029)+(2.048), (I-130)+(1.029)+(2.049), (I-130)+(1.029)+(2.050), (I-130)+(1.029)+(2.051), (I-130)+(1.029)+(2.052), (I-130)+(1.029)+(2.053), (I-130)+(1.029)+(2.054), (I-130)+(1.029)+(2.055), (I-130)+(1.029)+(2.056), (I-130)+(1.029)+(2.057), (I-130)+(1.029)+(2.058), (I-130)+(1.029)+(2.059), (I-130)+(1.029)+(3.001), (I-130)+(1.029)+(3.002), (I-130)+(1.029)+(3.003), (I-130)+(1.029)+(3.004), (I-130)+(1.029)+(3.005), (I-130)+(1.029)+(3.006), (I-130)+(1.029)+(3.007), (I-130)+(1.029)+(3.008), (I-130)+(1.029)+(3.009), (I-130)+(1.029)+(3.010), (I-130)+(1.029)+(3.011), (I-130)+(1.029)+(3.012), (I-130)+(1.029)+(3.013), (I-130)+(1.029)+(3.014), (I-130)+(1.029)+(3.015), (I-130)+(1.029)+(3.016), (I-130)+(1.029)+(3.017), (I-130)+(1.029)+(3.018), (I-130)+(1.029)+(3.019), (I-130)+(1.029)+(3.020), (I-130)+(1.029)+(3.021), (I-130)+(1.029)+(3.022), (I-130)+(1.029)+(3.023), (I-130)+(1.029)+(3.024), (I-130)+(1.029)+(3.025), (I-130)+(1.029)+(3.026), (I-130)+(1.029)+(3.027), (I-130)+(1.029)+(3.028), (I-130)+(1.029)+(3.029), (I-130)+(1.029)+(3.030), (I-130)+(1.029)+(3.031), (I-130)+(1.029)+(5.001), (I-130)+(1.029)+(5.002), (I-130)+(1.029)+(5.003), (I-130)+(1.029)+(5.004), (I-130)+(1.029)+(5.005), (I-130)+(1.029)+(5.006), (I-130)+(1.029)+(5.007), (I-130)+(1.029)+(5.008), (I-130)+(1.029)+(5.009), (I-130)+(1.029)+(5.010), (I-130)+(1.029)+(5.011), (I-130)+(1.029)+(5.012), (I-130)+(1.029)+(5.013), (I-130)+(1.029)+(5.014), (I-130)+(1.029)+(5.015), (I-130)+(1.029)+(5.016), (I-130)+(1.029)+(5.017), (I-130)+(1.029)+(5.018), (I-130)+(1.029)+(5.019), (I-130)+(1.029)+(5.020), (I-130)+(1.029)+(5.021), (I-130)+(1.029)+(5.022), (I-130)+(1.029)+(5.023), (I-130)+(1.029)+(6.001), (I-130)+(1.029)+(6.002), (I-130)+(1.029)+(6.003), (I-130)+(1.029)+(6.004), (I-130)+(1.029)+(7.001), (I-130)+(1.029)+(7.002), (I-130)+(1.029)+(7.003), (I-130)+(1.029)+(7.004), (I-130)+(1.029)+(7.005), (I-130)+(1.029)+(7.006), (I-130)+(1.029)+(9.001), (I-130)+(1.029)+(9.002), (I-130)+(1.029)+(9.003), (I-130)+(1.029)+(9.004), (I-130)+(1.029)+(9.005), (I-130)+(1.029)+(9.006), (I-130)+(1.029)+(9.007), (I-130)+(1.029)+(9.008), (I-130)+(1.029)+(9.009), (I-130)+(1.029)+(14.001), (I-130)+(1.029)+(14.002), (I-130)+(1.029)+(15.008), (I-130)+(1.029)+(15.011), (I-130)+(1.029)+(15.012), (I-130)+(1.029)+(15.016), (I-130)+(1.029)+(15.025), (I-130)+(1.029)+(15.027), (I-130)+(1.029)+(15.047), (I-130)+(1.029)+(15.063), (I-130)+(1.029)+(15.064), (I-130)+(1.029)+(16.001), (I-130)+(1.029)+(16.002), (I-130)+(1.029)+(16.003), (I-130)+(1.029)+(16.004), (I-130)+(1.029)+(16.005), (I-130)+(1.029)+(16.006), (I-130)+(1.029)+(16.007), (I-130)+(1.029)+(16.008), (I-130)+(1.029)+(17.001), (I-130)+(1.029)+(17.002), (I-130)+(1.029)+(17.003), (I-130)+(1.029)+(17.004), (I-130)+(1.029)+(17.005), (I-130)+(1.029)+(17.006), (I-130)+(1.029)+(17.007), (I-130)+(1.029)+(17.008), (I-130)+(1.029)+(17.009), (I-130)+(1.029)+(17.010), (I-130)+(1.029)+(17.011), (I-130)+(1.029)+(17.012), (I-130)+(1.029)+(18.001), (I-130)+(1.030)+(1.031), (I-130)+(1.030)+(1.032), (I-130)+(1.030)+(1.033), (I-130)+(1.030)+(1.034), (I-130)+(1.030)+(1.035), (I-130)+(1.030)+(1.036), (I-130)+(1.030)+(1.037), (I-130)+(1.030)+(1.038), (I-130)+(1.030)+(1.039), (I-130)+(1.030)+(1.040), (I-130)+(1.030)+(1.041), (I-130)+(1.030)+(1.042), (I-130)+(1.030)+(1.043), (I-130)+(1.030)+(1.044), (I-130)+(1.030)+(1.045), (I-130)+(1.030)+(1.046), (I-130)+(1.030)+(1.047), (I-130)+(1.030)+(1.048), (I-130)+(1.030)+(1.049), (I-130)+(1.030)+(1.050), (I-130)+(1.030)+(1.051), (I-130)+(1.030)+(1.052), (I-130)+(1.030)+(1.053), (I-130)+(1.030)+(1.054), (I-130)+(1.030)+(1.055), (I-130)+(1.030)+(1.056), (I-130)+(1.030)+(1.057), (I-130)+(1.030)+(1.058), (I-130)+(1.030)+(1.059), (I-130)+(1.030)+(1.060), (I-130)+(1.030)+(1.061), (I-130)+(1.030)+(1.062), (I-130)+(1.030)+(1.063), (I-130)+(1.030)+(1.064), (I-130)+(1.030)+(1.065), (I-130)+(1.030)+(1.066), (I-130)+(1.030)+(1.067), (I-130)+(1.030)+(1.068), (I-130)+(1.030)+(1.069), (I-130)+(1.030)+(1.070), (I-130)+(1.030)+(1.071), (I-130)+(1.030)+(1.072), (I-130)+(1.030)+(1.073), (I-130)+(1.030)+(1.074), (I-130)+(1.030)+(1.075), (I-130)+(1.030)+(1.076), (I-130)+(1.030)+(1.077), (I-130)+(1.030)+(1.078), (I-130)+(1.030)+(1.079), (I-130)+(1.030)+(1.080), (I-130)+(1.030)+(1.081), (I-130)+(1.030)+(1.082), (I-130)+(1.030)+(1.083), (I-130)+(1.030)+(1.084), (I-130)+(1.030)+(1.085), (I-130)+(1.030)+(1.086), (I-130)+(1.030)+(1.087), (I-130)+(1.030)+(1.088), (I-130)+(1.030)+(1.089), (I-130)+(1.030)+(1.090), (I-130)+(1.030)+(1.091), (I-130)+(1.030)+(1.092), (I-130)+(1.030)+(2.001), (I-130)+(1.030)+(2.002), (I-130)+(1.030)+(2.003), (I-130)+(1.030)+(2.004), (I-130)+(1.030)+(2.005), (I-130)+(1.030)+(2.006), (I-130)+(1.030)+(2.007), (I-130)+(1.030)+(2.008), (I-130)+(1.030)+(2.009), (I-130)+(1.030)+(2.010), (I-130)+(1.030)+(2.011), (I-130)+(1.030)+(2.012), (I-130)+(1.030)+(2.013), (I-130)+(1.030)+(2.014), (I-130)+(1.030)+(2.015), (I-130)+(1.030)+(2.016), (I-130)+(1.030)+(2.017), (I-130)+(1.030)+(2.018), (I-130)+(1.030)+(2.019), (I-130)+(1.030)+(2.020), (I-130)+(1.030)+(2.021), (I-130)+(1.030)+(2.022), (I-130)+(1.030)+(2.023), (I-130)+(1.030)+(2.024), (I-130)+(1.030)+(2.025), (I-130)+(1.030)+(2.026), (I-130)+(1.030)+(2.027), (I-130)+(1.030)+(2.028), (I-130)+(1.030)+(2.029), (I-130)+(1.030)+(2.030), (I-130)+(1.030)+(2.031), (I-130)+(1.030)+(2.032), (I-130)+(1.030)+(2.033), (I-130)+(1.030)+(2.034), (I-130)+(1.030)+(2.035), (I-130)+(1.030)+(2.036), (I-130)+(1.030)+(2.037), (I-130)+(1.030)+(2.038), (I-130)+(1.030)+(2.039), (I-130)+(1.030)+(2.040), (I-130)+(1.030)+(2.041), (I-130)+(1.030)+(2.042), (I-130)+(1.030)+(2.043), (I-130)+(1.030)+(2.044), (I-130)+(1.030)+(2.045), (I-130)+(1.030)+(2.046), (I-130)+(1.030)+(2.047), (I-130)+(1.030)+(2.048), (I-130)+(1.030)+(2.049), (I-130)+(1.030)+(2.050), (I-130)+(1.030)+(2.051), (I-130)+(1.030)+(2.052), (I-130)+(1.030)+(2.053), (I-130)+(1.030)+(2.054), (I-130)+(1.030)+(2.055), (I-130)+(1.030)+(2.056), (I-130)+(1.030)+(2.057), (I-130)+(1.030)+(2.058), (I-130)+(1.030)+(2.059), (I-130)+(1.030)+(3.001), (I-130)+(1.030)+(3.002), (I-130)+(1.030)+(3.003), (I-130)+(1.030)+(3.004), (I-130)+(1.030)+(3.005), (I-130)+(1.030)+(3.006), (I-130)+(1.030)+(3.007), (I-130)+(1.030)+(3.008), (I-130)+(1.030)+(3.009), (I-130)+(1.030)+(3.010), (I-130)+(1.030)+(3.011), (I-130)+(1.030)+(3.012), (I-130)+(1.030)+(3.013), (I-130)+(1.030)+(3.014), (I-130)+(1.030)+(3.015), (I-130)+(1.030)+(3.016), (I-130)+(1.030)+(3.017), (I-130)+(1.030)+(3.018), (I-130)+(1.030)+(3.019), (I-130)+(1.030)+(3.020), (I-130)+(1.030)+(3.021), (I-130)+(1.030)+(3.022), (I-130)+(1.030)+(3.023), (I-130)+(1.030)+(3.024), (I-130)+(1.030)+(3.025), (I-130)+(1.030)+(3.026), (I-130)+(1.030)+(3.027), (I-130)+(1.030)+(3.028), (I-130)+(1.030)+(3.029), (I-130)+(1.030)+(3.030), (I-130)+(1.030)+(3.031), (I-130)+(1.030)+(5.001), (I-130)+(1.030)+(5.002), (I-130)+(1.030)+(5.003), (I-130)+(1.030)+(5.004), (I-130)+(1.030)+(5.005), (I-130)+(1.030)+(5.006), (I-130)+(1.030)+(5.007), (I-130)+(1.030)+(5.008), (I-130)+(1.030)+(5.009), (I-130)+(1.030)+(5.010), (I-130)+(1.030)+(5.011), (I-130)+(1.030)+(5.012), (I-130)+(1.030)+(5.013), (I-130)+(1.030)+(5.014), (I-130)+(1.030)+(5.015), (I-130)+(1.030)+(5.016), (I-130)+(1.030)+(5.017), (I-130)+(1.030)+(5.018), (I-130)+(1.030)+(5.019), (I-130)+(1.030)+(5.020), (I-130)+(1.030)+(5.021), (I-130)+(1.030)+(5.022), (I-130)+(1.030)+(5.023), (I-130)+(1.030)+(6.001), (I-130)+(1.030)+(6.002), (I-130)+(1.030)+(6.003), (I-130)+(1.030)+(6.004), (I-130)+(1.030)+(7.001), (I-130)+(1.030)+(7.002), (I-130)+(1.030)+(7.003), (I-130)+(1.030)+(7.004), (I-130)+(1.030)+(7.005), (I-130)+(1.030)+(7.006), (I-130)+(1.030)+(9.001), (I-130)+(1.030)+(9.002), (I-130)+(1.030)+(9.003), (I-130)+(1.030)+(9.004), (I-130)+(1.030)+(9.005), (I-130)+(1.030)+(9.006), (I-130)+(1.030)+(9.007), (I-130)+(1.030)+(9.008), (I-130)+(1.030)+(9.009), (I-130)+(1.030)+(14.001), (I-130)+(1.030)+(14.002), (I-130)+(1.030)+(15.008), (I-130)+(1.030)+(15.011), (I-130)+(1.030)+(15.012), (I-130)+(1.030)+(15.016), (I-130)+(1.030)+(15.025), (I-130)+(1.030)+(15.027), (I-130)+(1.030)+(15.047), (I-130)+(1.030)+(15.063), (I-130)+(1.030)+(15.064), (I-130)+(1.030)+(16.001), (I-130)+(1.030)+(16.002), (I-130)+(1.030)+(16.003), (I-130)+(1.030)+(16.004), (I-130)+(1.030)+(16.005), (I-130)+(1.030)+(16.006), (I-130)+(1.030)+(16.007), (I-130)+(1.030)+(16.008), (I-130)+(1.030)+(17.001), (I-130)+(1.030)+(17.002), (I-130)+(1.030)+(17.003), (I-130)+(1.030)+(17.004), (I-130)+(1.030)+(17.005), (I-130)+(1.030)+(17.006), (I-130)+(1.030)+(17.007), (I-130)+(1.030)+(17.008), (I-130)+(1.030)+(17.009), (I-130)+(1.030)+(17.010), (I-130)+(1.030)+(17.011), (I-130)+(1.030)+(17.012), (I-130)+(1.030)+(18.001), (I-130)+(1.031)+(1.032), (I-130)+(1.031)+(1.033), (I-130)+(1.031)+(1.034), (I-130)+(1.031)+(1.035), (I-130)+(1.031)+(1.036), (I-130)+(1.031)+(1.037), (I-130)+(1.031)+(1.038), (I-130)+(1.031)+(1.039), (I-130)+(1.031)+(1.040), (I-130)+(1.031)+(1.041), (I-130)+(1.031)+(1.042), (I-130)+(1.031)+(1.043), (I-130)+(1.031)+(1.044), (I-130)+(1.031)+(1.045), (I-130)+(1.031)+(1.046), (I-130)+(1.031)+(1.047), (I-130)+(1.031)+(1.048), (I-130)+(1.031)+(1.049), (I-130)+(1.031)+(1.050), (I-130)+(1.031)+(1.051), (I-130)+(1.031)+(1.052), (I-130)+(1.031)+(1.053), (I-130)+(1.031)+(1.054), (I-130)+(1.031)+(1.055), (I-130)+(1.031)+(1.056), (I-130)+(1.031)+(1.057), (I-130)+(1.031)+(1.058), (I-130)+(1.031)+(1.059), (I-130)+(1.031)+(1.060), (I-130)+(1.031)+(1.061), (I-130)+(1.031)+(1.062), (I-130)+(1.031)+(1.063), (I-130)+(1.031)+(1.064), (I-130)+(1.031)+(1.065), (I-130)+(1.031)+(1.066), (I-130)+(1.031)+(1.067), (I-130)+(1.031)+(1.068), (I-130)+(1.031)+(1.069), (I-130)+(1.031)+(1.070), (I-130)+(1.031)+(1.071), (I-130)+(1.031)+(1.072), (I-130)+(1.031)+(1.073), (I-130)+(1.031)+(1.074), (I-130)+(1.031)+(1.075), (I-130)+(1.031)+(1.076), (I-130)+(1.031)+(1.077), (I-130)+(1.031)+(1.078), (I-130)+(1.031)+(1.079), (I-130)+(1.031)+(1.080), (I-130)+(1.031)+(1.081), (I-130)+(1.031)+(1.082), (I-130)+(1.031)+(1.083), (I-130)+(1.031)+(1.084), (I-130)+(1.031)+(1.085), (I-130)+(1.031)+(1.086), (I-130)+(1.031)+(1.087), (I-130)+(1.031)+(1.088), (I-130)+(1.031)+(1.089), (I-130)+(1.031)+(1.090), (I-130)+(1.031)+(1.091), (I-130)+(1.031)+(1.092), (I-130)+(1.031)+(2.001), (I-130)+(1.031)+(2.002), (I-130)+(1.031)+(2.003), (I-130)+(1.031)+(2.004), (I-130)+(1.031)+(2.005), (I-130)+(1.031)+(2.006), (I-130)+(1.031)+(2.007), (I-130)+(1.031)+(2.008), (I-130)+(1.031)+(2.009), (I-130)+(1.031)+(2.010), (I-130)+(1.031)+(2.011), (I-130)+(1.031)+(2.012), (I-130)+(1.031)+(2.013), (I-130)+(1.031)+(2.014), (I-130)+(1.031)+(2.015), (I-130)+(1.031)+(2.016), (I-130)+(1.031)+(2.017), (I-130)+(1.031)+(2.018), (I-130)+(1.031)+(2.019), (I-130)+(1.031)+(2.020), (I-130)+(1.031)+(2.021), (I-130)+(1.031)+(2.022), (I-130)+(1.031)+(2.023), (I-130)+(1.031)+(2.024), (I-130)+(1.031)+(2.025), (I-130)+(1.031)+(2.026), (I-130)+(1.031)+(2.027), (I-130)+(1.031)+(2.028), (I-130)+(1.031)+(2.029), (I-130)+(1.031)+(2.030), (I-130)+(1.031)+(2.031), (I-130)+(1.031)+(2.032), (I-130)+(1.031)+(2.033), (I-130)+(1.031)+(2.034), (I-130)+(1.031)+(2.035), (I-130)+(1.031)+(2.036), (I-130)+(1.031)+(2.037), (I-130)+(1.031)+(2.038), (I-130)+(1.031)+(2.039), (I-130)+(1.031)+(2.040), (I-130)+(1.031)+(2.041), (I-130)+(1.031)+(2.042), (I-130)+(1.031)+(2.043), (I-130)+(1.031)+(2.044), (I-130)+(1.031)+(2.045), (I-130)+(1.031)+(2.046), (I-130)+(1.031)+(2.047), (I-130)+(1.031)+(2.048), (I-130)+(1.031)+(2.049), (I-130)+(1.031)+(2.050), (I-130)+(1.031)+(2.051), (I-130)+(1.031)+(2.052), (I-130)+(1.031)+(2.053), (I-130)+(1.031)+(2.054), (I-130)+(1.031)+(2.055), (I-130)+(1.031)+(2.056), (I-130)+(1.031)+(2.057), (I-130)+(1.031)+(2.058), (I-130)+(1.031)+(2.059), (I-130)+(1.031)+(3.001), (I-130)+(1.031)+(3.002), (I-130)+(1.031)+(3.003), (I-130)+(1.031)+(3.004), (I-130)+(1.031)+(3.005), (I-130)+(1.031)+(3.006), (I-130)+(1.031)+(3.007), (I-130)+(1.031)+(3.008), (I-130)+(1.031)+(3.009), (I-130)+(1.031)+(3.010), (I-130)+(1.031)+(3.011), (I-130)+(1.031)+(3.012), (I-130)+(1.031)+(3.013), (I-130)+(1.031)+(3.014), (I-130)+(1.031)+(3.015), (I-130)+(1.031)+(3.016), (I-130)+(1.031)+(3.017), (I-130)+(1.031)+(3.018), (I-130)+(1.031)+(3.019), (I-130)+(1.031)+(3.020), (I-130)+(1.031)+(3.021), (I-130)+(1.031)+(3.022), (I-130)+(1.031)+(3.023), (I-130)+(1.031)+(3.024), (I-130)+(1.031)+(3.025), (I-130)+(1.031)+(3.026), (I-130)+(1.031)+(3.027), (I-130)+(1.031)+(3.028), (I-130)+(1.031)+(3.029), (I-130)+(1.031)+(3.030), (I-130)+(1.031)+(3.031), (I-130)+(1.031)+(5.001), (I-130)+(1.031)+(5.002), (I-130)+(1.031)+(5.003), (I-130)+(1.031)+(5.004), (I-130)+(1.031)+(5.005), (I-130)+(1.031)+(5.006), (I-130)+(1.031)+(5.007), (I-130)+(1.031)+(5.008), (I-130)+(1.031)+(5.009), (I-130)+(1.031)+(5.010), (I-130)+(1.031)+(5.011), (I-130)+(1.031)+(5.012), (I-130)+(1.031)+(5.013), (I-130)+(1.031)+(5.014), (I-130)+(1.031)+(5.015), (I-130)+(1.031)+(5.016), (I-130)+(1.031)+(5.017), (I-130)+(1.031)+(5.018), (I-130)+(1.031)+(5.019), (I-130)+(1.031)+(5.020), (I-130)+(1.031)+(5.021), (I-130)+(1.031)+(5.022), (I-130)+(1.031)+(5.023), (I-130)+(1.031)+(6.001), (I-130)+(1.031)+(6.002), (I-130)+(1.031)+(6.003), (I-130)+(1.031)+(6.004), (I-130)+(1.031)+(7.001), (I-130)+(1.031)+(7.002), (I-130)+(1.031)+(7.003), (I-130)+(1.031)+(7.004), (I-130)+(1.031)+(7.005), (I-130)+(1.031)+(7.006), (I-130)+(1.031)+(9.001), (I-130)+(1.031)+(9.002), (I-130)+(1.031)+(9.003), (I-130)+(1.031)+(9.004), (I-130)+(1.031)+(9.005), (I-130)+(1.031)+(9.006), (I-130)+(1.031)+(9.007), (I-130)+(1.031)+(9.008), (I-130)+(1.031)+(9.009), (I-130)+(1.031)+(14.001), (I-130)+(1.031)+(14.002), (I-130)+(1.031)+(15.008), (I-130)+(1.031)+(15.011), (I-130)+(1.031)+(15.012), (I-130)+(1.031)+(15.016), (I-130)+(1.031)+(15.025), (I-130)+(1.031)+(15.027), (I-130)+(1.031)+(15.047), (I-130)+(1.031)+(15.063), (I-130)+(1.031)+(15.064), (I-130)+(1.031)+(16.001), (I-130)+(1.031)+(16.002), (I-130)+(1.031)+(16.003), (I-130)+(1.031)+(16.004), (I-130)+(1.031)+(16.005), (I-130)+(1.031)+(16.006), (I-130)+(1.031)+(16.007), (I-130)+(1.031)+(16.008), (I-130)+(1.031)+(17.001), (I-130)+(1.031)+(17.002), (I-130)+(1.031)+(17.003), (I-130)+(1.031)+(17.004), (I-130)+(1.031)+(17.005), (I-130)+(1.031)+(17.006), (I-130)+(1.031)+(17.007), (I-130)+(1.031)+(17.008), (I-130)+(1.031)+(17.009), (I-130)+(1.031)+(17.010), (I-130)+(1.031)+(17.011), (I-130)+(1.031)+(17.012), (I-130)+(1.031)+(18.001), (I-130)+(1.032)+(1.033), (I-130)+(1.032)+(1.034), (I-130)+(1.032)+(1.035), (I-130)+(1.032)+(1.036), (I-130)+(1.032)+(1.037), (I-130)+(1.032)+(1.038), (I-130)+(1.032)+(1.039), (I-130)+(1.032)+(1.040), (I-130)+(1.032)+(1.041), (I-130)+(1.032)+(1.042), (I-130)+(1.032)+(1.043), (I-130)+(1.032)+(1.044), (I-130)+(1.032)+(1.045), (I-130)+(1.032)+(1.046), (I-130)+(1.032)+(1.047), (I-130)+(1.032)+(1.048), (I-130)+(1.032)+(1.049), (I-130)+(1.032)+(1.050), (I-130)+(1.032)+(1.051), (I-130)+(1.032)+(1.052), (I-130)+(1.032)+(1.053), (I-130)+(1.032)+(1.054), (I-130)+(1.032)+(1.055), (I-130)+(1.032)+(1.056), (I-130)+(1.032)+(1.057), (I-130)+(1.032)+(1.058), (I-130)+(1.032)+(1.059), (I-130)+(1.032)+(1.060), (I-130)+(1.032)+(1.061), (I-130)+(1.032)+(1.062), (I-130)+(1.032)+(1.063), (I-130)+(1.032)+(1.064), (I-130)+(1.032)+(1.065), (I-130)+(1.032)+(1.066), (I-130)+(1.032)+(1.067), (I-130)+(1.032)+(1.068), (I-130)+(1.032)+(1.069), (I-130)+(1.032)+(1.070), (I-130)+(1.032)+(1.071), (I-130)+(1.032)+(1.072), (I-130)+(1.032)+(1.073), (I-130)+(1.032)+(1.074), (I-130)+(1.032)+(1.075), (I-130)+(1.032)+(1.076), (I-130)+(1.032)+(1.077), (I-130)+(1.032)+(1.078), (I-130)+(1.032)+(1.079), (I-130)+(1.032)+(1.080), (I-130)+(1.032)+(1.081), (I-130)+(1.032)+(1.082), (I-130)+(1.032)+(1.083), (I-130)+(1.032)+(1.084), (I-130)+(1.032)+(1.085), (I-130)+(1.032)+(1.086), (I-130)+(1.032)+(1.087), (I-130)+(1.032)+(1.088), (I-130)+(1.032)+(1.089), (I-130)+(1.032)+(1.090), (I-130)+(1.032)+(1.091), (I-130)+(1.032)+(1.092), (I-130)+(1.032)+(2.001), (I-130)+(1.032)+(2.002), (I-130)+(1.032)+(2.003), (I-130)+(1.032)+(2.004), (I-130)+(1.032)+(2.005), (I-130)+(1.032)+(2.006), (I-130)+(1.032)+(2.007), (I-130)+(1.032)+(2.008), (I-130)+(1.032)+(2.009), (I-130)+(1.032)+(2.010), (I-130)+(1.032)+(2.011), (I-130)+(1.032)+(2.012), (I-130)+(1.032)+(2.013), (I-130)+(1.032)+(2.014), (I-130)+(1.032)+(2.015), (I-130)+(1.032)+(2.016), (I-130)+(1.032)+(2.017), (I-130)+(1.032)+(2.018), (I-130)+(1.032)+(2.019), (I-130)+(1.032)+(2.020), (I-130)+(1.032)+(2.021), (I-130)+(1.032)+(2.022), (I-130)+(1.032)+(2.023), (I-130)+(1.032)+(2.024), (I-130)+(1.032)+(2.025), (I-130)+(1.032)+(2.026), (I-130)+(1.032)+(2.027), (I-130)+(1.032)+(2.028), (I-130)+(1.032)+(2.029), (I-130)+(1.032)+(2.030), (I-130)+(1.032)+(2.031), (I-130)+(1.032)+(2.032), (I-130)+(1.032)+(2.033), (I-130)+(1.032)+(2.034), (I-130)+(1.032)+(2.035), (I-130)+(1.032)+(2.036), (I-130)+(1.032)+(2.037), (I-130)+(1.032)+(2.038), (I-130)+(1.032)+(2.039), (I-130)+(1.032)+(2.040), (I-130)+(1.032)+(2.041), (I-130)+(1.032)+(2.042), (I-130)+(1.032)+(2.043), (I-130)+(1.032)+(2.044), (I-130)+(1.032)+(2.045), (I-130)+(1.032)+(2.046), (I-130)+(1.032)+(2.047), (I-130)+(1.032)+(2.048), (I-130)+(1.032)+(2.049), (I-130)+(1.032)+(2.050), (I-130)+(1.032)+(2.051), (I-130)+(1.032)+(2.052), (I-130)+(1.032)+(2.053), (I-130)+(1.032)+(2.054), (I-130)+(1.032)+(2.055), (I-130)+(1.032)+(2.056), (I-130)+(1.032)+(2.057), (I-130)+(1.032)+(2.058), (I-130)+(1.032)+(2.059), (I-130)+(1.032)+(3.001), (I-130)+(1.032)+(3.002), (I-130)+(1.032)+(3.003), (I-130)+(1.032)+(3.004), (I-130)+(1.032)+(3.005), (I-130)+(1.032)+(3.006), (I-130)+(1.032)+(3.007), (I-130)+(1.032)+(3.008), (I-130)+(1.032)+(3.009), (I-130)+(1.032)+(3.010), (I-130)+(1.032)+(3.011), (I-130)+(1.032)+(3.012), (I-130)+(1.032)+(3.013), (I-130)+(1.032)+(3.014), (I-130)+(1.032)+(3.015), (I-130)+(1.032)+(3.016), (I-130)+(1.032)+(3.017), (I-130)+(1.032)+(3.018), (I-130)+(1.032)+(3.019), (I-130)+(1.032)+(3.020), (I-130)+(1.032)+(3.021), (I-130)+(1.032)+(3.022), (I-130)+(1.032)+(3.023), (I-130)+(1.032)+(3.024), (I-130)+(1.032)+(3.025), (I-130)+(1.032)+(3.026), (I-130)+(1.032)+(3.027), (I-130)+(1.032)+(3.028), (I-130)+(1.032)+(3.029), (I-130)+(1.032)+(3.030), (I-130)+(1.032)+(3.031), (I-130)+(1.032)+(5.001), (I-130)+(1.032)+(5.002), (I-130)+(1.032)+(5.003), (I-130)+(1.032)+(5.004), (I-130)+(1.032)+(5.005), (I-130)+(1.032)+(5.006), (I-130)+(1.032)+(5.007), (I-130)+(1.032)+(5.008), (I-130)+(1.032)+(5.009), (I-130)+(1.032)+(5.010), (I-130)+(1.032)+(5.011), (I-130)+(1.032)+(5.012), (I-130)+(1.032)+(5.013), (I-130)+(1.032)+(5.014), (I-130)+(1.032)+(5.015), (I-130)+(1.032)+(5.016), (I-130)+(1.032)+(5.017), (I-130)+(1.032)+(5.018), (I-130)+(1.032)+(5.019), (I-130)+(1.032)+(5.020), (I-130)+(1.032)+(5.021), (I-130)+(1.032)+(5.022), (I-130)+(1.032)+(5.023), (I-130)+(1.032)+(6.001), (I-130)+(1.032)+(6.002), (I-130)+(1.032)+(6.003), (I-130)+(1.032)+(6.004), (I-130)+(1.032)+(7.001), (I-130)+(1.032)+(7.002), (I-130)+(1.032)+(7.003), (I-130)+(1.032)+(7.004), (I-130)+(1.032)+(7.005), (I-130)+(1.032)+(7.006), (I-130)+(1.032)+(9.001), (I-130)+(1.032)+(9.002), (I-130)+(1.032)+(9.003), (I-130)+(1.032)+(9.004), (I-130)+(1.032)+(9.005), (I-130)+(1.032)+(9.006), (I-130)+(1.032)+(9.007), (I-130)+(1.032)+(9.008), (I-130)+(1.032)+(9.009), (I-130)+(1.032)+(14.001), (I-130)+(1.032)+(14.002), (I-130)+(1.032)+(15.008), (I-130)+(1.032)+(15.011), (I-130)+(1.032)+(15.012), (I-130)+(1.032)+(15.016), (I-130)+(1.032)+(15.025), (I-130)+(1.032)+(15.027), (I-130)+(1.032)+(15.047), (I-130)+(1.032)+(15.063), (I-130)+(1.032)+(15.064), (I-130)+(1.032)+(16.001), (I-130)+(1.032)+(16.002), (I-130)+(1.032)+(16.003), (I-130)+(1.032)+(16.004), (I-130)+(1.032)+(16.005), (I-130)+(1.032)+(16.006), (I-130)+(1.032)+(16.007), (I-130)+(1.032)+(16.008), (I-130)+(1.032)+(17.001), (I-130)+(1.032)+(17.002), (I-130)+(1.032)+(17.003), (I-130)+(1.032)+(17.004), (I-130)+(1.032)+(17.005), (I-130)+(1.032)+(17.006), (I-130)+(1.032)+(17.007), (I-130)+(1.032)+(17.008), (I-130)+(1.032)+(17.009), (I-130)+(1.032)+(17.010), (I-130)+(1.032)+(17.011), (I-130)+(1.032)+(17.012), (I-130)+(1.032)+(18.001), (I-130)+(1.033)+(1.034), (I-130)+(1.033)+(1.035), (I-130)+(1.033)+(1.036), (I-130)+(1.033)+(1.037), (I-130)+(1.033)+(1.038), (I-130)+(1.033)+(1.039), (I-130)+(1.033)+(1.040), (I-130)+(1.033)+(1.041), (I-130)+(1.033)+(1.042), (I-130)+(1.033)+(1.043), (I-130)+(1.033)+(1.044), (I-130)+(1.033)+(1.045), (I-130)+(1.033)+(1.046), (I-130)+(1.033)+(1.047), (I-130)+(1.033)+(1.048), (I-130)+(1.033)+(1.049), (I-130)+(1.033)+(1.050), (I-130)+(1.033)+(1.051), (I-130)+(1.033)+(1.052), (I-130)+(1.033)+(1.053), (I-130)+(1.033)+(1.054), (I-130)+(1.033)+(1.055), (I-130)+(1.033)+(1.056), (I-130)+(1.033)+(1.057), (I-130)+(1.033)+(1.058), (I-130)+(1.033)+(1.059), (I-130)+(1.033)+(1.060), (I-130)+(1.033)+(1.061), (I-130)+(1.033)+(1.062), (I-130)+(1.033)+(1.063), (I-130)+(1.033)+(1.064), (I-130)+(1.033)+(1.065), (I-130)+(1.033)+(1.066), (I-130)+(1.033)+(1.067), (I-130)+(1.033)+(1.068), (I-130)+(1.033)+(1.069), (I-130)+(1.033)+(1.070), (I-130)+(1.033)+(1.071), (I-130)+(1.033)+(1.072), (I-130)+(1.033)+(1.073), (I-130)+(1.033)+(1.074), (I-130)+(1.033)+(1.075), (I-130)+(1.033)+(1.076), (I-130)+(1.033)+(1.077), (I-130)+(1.033)+(1.078), (I-130)+(1.033)+(1.079), (I-130)+(1.033)+(1.080), (I-130)+(1.033)+(1.081), (I-130)+(1.033)+(1.082), (I-130)+(1.033)+(1.083), (I-130)+(1.033)+(1.084), (I-130)+(1.033)+(1.085), (I-130)+(1.033)+(1.086), (I-130)+(1.033)+(1.087), (I-130)+(1.033)+(1.088), (I-130)+(1.033)+(1.089), (I-130)+(1.033)+(1.090), (I-130)+(1.033)+(1.091), (I-130)+(1.033)+(1.092), (I-130)+(1.033)+(2.001), (I-130)+(1.033)+(2.002), (I-130)+(1.033)+(2.003), (I-130)+(1.033)+(2.004), (I-130)+(1.033)+(2.005), (I-130)+(1.033)+(2.006), (I-130)+(1.033)+(2.007), (I-130)+(1.033)+(2.008), (I-130)+(1.033)+(2.009), (I-130)+(1.033)+(2.010), (I-130)+(1.033)+(2.011), (I-130)+(1.033)+(2.012), (I-130)+(1.033)+(2.013), (I-130)+(1.033)+(2.014), (I-130)+(1.033)+(2.015), (I-130)+(1.033)+(2.016), (I-130)+(1.033)+(2.017), (I-130)+(1.033)+(2.018), (I-130)+(1.033)+(2.019), (I-130)+(1.033)+(2.020), (I-130)+(1.033)+(2.021), (I-130)+(1.033)+(2.022), (I-130)+(1.033)+(2.023), (I-130)+(1.033)+(2.024), (I-130)+(1.033)+(2.025), (I-130)+(1.033)+(2.026), (I-130)+(1.033)+(2.027), (I-130)+(1.033)+(2.028), (I-130)+(1.033)+(2.029), (I-130)+(1.033)+(2.030), (I-130)+(1.033)+(2.031), (I-130)+(1.033)+(2.032), (I-130)+(1.033)+(2.033), (I-130)+(1.033)+(2.034), (I-130)+(1.033)+(2.035), (I-130)+(1.033)+(2.036), (I-130)+(1.033)+(2.037), (I-130)+(1.033)+(2.038), (I-130)+(1.033)+(2.039), (I-130)+(1.033)+(2.040), (I-130)+(1.033)+(2.041), (I-130)+(1.033)+(2.042), (I-130)+(1.033)+(2.043), (I-130)+(1.033)+(2.044), (I-130)+(1.033)+(2.045), (I-130)+(1.033)+(2.046), (I-130)+(1.033)+(2.047), (I-130)+(1.033)+(2.048), (I-130)+(1.033)+(2.049), (I-130)+(1.033)+(2.050), (I-130)+(1.033)+(2.051), (I-130)+(1.033)+(2.052), (I-130)+(1.033)+(2.053), (I-130)+(1.033)+(2.054), (I-130)+(1.033)+(2.055), (I-130)+(1.033)+(2.056), (I-130)+(1.033)+(2.057), (I-130)+(1.033)+(2.058), (I-130)+(1.033)+(2.059), (I-130)+(1.033)+(3.001), (I-130)+(1.033)+(3.002), (I-130)+(1.033)+(3.003), (I-130)+(1.033)+(3.004), (I-130)+(1.033)+(3.005), (I-130)+(1.033)+(3.006), (I-130)+(1.033)+(3.007), (I-130)+(1.033)+(3.008), (I-130)+(1.033)+(3.009), (I-130)+(1.033)+(3.010), (I-130)+(1.033)+(3.011), (I-130)+(1.033)+(3.012), (I-130)+(1.033)+(3.013), (I-130)+(1.033)+(3.014), (I-130)+(1.033)+(3.015), (I-130)+(1.033)+(3.016), (I-130)+(1.033)+(3.017), (I-130)+(1.033)+(3.018), (I-130)+(1.033)+(3.019), (I-130)+(1.033)+(3.020), (I-130)+(1.033)+(3.021), (I-130)+(1.033)+(3.022), (I-130)+(1.033)+(3.023), (I-130)+(1.033)+(3.024), (I-130)+(1.033)+(3.025), (I-130)+(1.033)+(3.026), (I-130)+(1.033)+(3.027), (I-130)+(1.033)+(3.028), (I-130)+(1.033)+(3.029), (I-130)+(1.033)+(3.030), (I-130)+(1.033)+(3.031), (I-130)+(1.033)+(5.001), (I-130)+(1.033)+(5.002), (I-130)+(1.033)+(5.003), (I-130)+(1.033)+(5.004), (I-130)+(1.033)+(5.005), (I-130)+(1.033)+(5.006), (I-130)+(1.033)+(5.007), (I-130)+(1.033)+(5.008), (I-130)+(1.033)+(5.009), (I-130)+(1.033)+(5.010), (I-130)+(1.033)+(5.011), (I-130)+(1.033)+(5.012), (I-130)+(1.033)+(5.013), (I-130)+(1.033)+(5.014), (I-130)+(1.033)+(5.015), (I-130)+(1.033)+(5.016), (I-130)+(1.033)+(5.017), (I-130)+(1.033)+(5.018), (I-130)+(1.033)+(5.019), (I-130)+(1.033)+(5.020), (I-130)+(1.033)+(5.021), (I-130)+(1.033)+(5.022), (I-130)+(1.033)+(5.023), (I-130)+(1.033)+(6.001), (I-130)+(1.033)+(6.002), (I-130)+(1.033)+(6.003), (I-130)+(1.033)+(6.004), (I-130)+(1.033)+(7.001), (I-130)+(1.033)+(7.002), (I-130)+(1.033)+(7.003), (I-130)+(1.033)+(7.004), (I-130)+(1.033)+(7.005), (I-130)+(1.033)+(7.006), (I-130)+(1.033)+(9.001), (I-130)+(1.033)+(9.002), (I-130)+(1.033)+(9.003), (I-130)+(1.033)+(9.004), (I-130)+(1.033)+(9.005), (I-130)+(1.033)+(9.006), (I-130)+(1.033)+(9.007), (I-130)+(1.033)+(9.008), (I-130)+(1.033)+(9.009), (I-130)+(1.033)+(14.001), (I-130)+(1.033)+(14.002), (I-130)+(1.033)+(15.008), (I-130)+(1.033)+(15.011), (I-130)+(1.033)+(15.012), (I-130)+(1.033)+(15.016), (I-130)+(1.033)+(15.025), (I-130)+(1.033)+(15.027), (I-130)+(1.033)+(15.047), (I-130)+(1.033)+(15.063), (I-130)+(1.033)+(15.064), (I-130)+(1.033)+(16.001), (I-130)+(1.033)+(16.002), (I-130)+(1.033)+(16.003), (I-130)+(1.033)+(16.004), (I-130)+(1.033)+(16.005), (I-130)+(1.033)+(16.006), (I-130)+(1.033)+(16.007), (I-130)+(1.033)+(16.008), (I-130)+(1.033)+(17.001), (I-130)+(1.033)+(17.002), (I-130)+(1.033)+(17.003), (I-130)+(1.033)+(17.004), (I-130)+(1.033)+(17.005), (I-130)+(1.033)+(17.006), (I-130)+(1.033)+(17.007), (I-130)+(1.033)+(17.008), (I-130)+(1.033)+(17.009), (I-130)+(1.033)+(17.010), (I-130)+(1.033)+(17.011), (I-130)+(1.033)+(17.012), (I-130)+(1.033)+(18.001), (I-130)+(1.034)+(1.035), (I-130)+(1.034)+(1.036), (I-130)+(1.034)+(1.037), (I-130)+(1.034)+(1.038), (I-130)+(1.034)+(1.039), (I-130)+(1.034)+(1.040), (I-130)+(1.034)+(1.041), (I-130)+(1.034)+(1.042), (I-130)+(1.034)+(1.043), (I-130)+(1.034)+(1.044), (I-130)+(1.034)+(1.045), (I-130)+(1.034)+(1.046), (I-130)+(1.034)+(1.047), (I-130)+(1.034)+(1.048), (I-130)+(1.034)+(1.049), (I-130)+(1.034)+(1.050), (I-130)+(1.034)+(1.051), (I-130)+(1.034)+(1.052), (I-130)+(1.034)+(1.053), (I-130)+(1.034)+(1.054), (I-130)+(1.034)+(1.055), (I-130)+(1.034)+(1.056), (I-130)+(1.034)+(1.057), (I-130)+(1.034)+(1.058), (I-130)+(1.034)+(1.059), (I-130)+(1.034)+(1.060), (I-130)+(1.034)+(1.061), (I-130)+(1.034)+(1.062), (I-130)+(1.034)+(1.063), (I-130)+(1.034)+(1.064), (I-130)+(1.034)+(1.065), (I-130)+(1.034)+(1.066), (I-130)+(1.034)+(1.067), (I-130)+(1.034)+(1.068), (I-130)+(1.034)+(1.069), (I-130)+(1.034)+(1.070), (I-130)+(1.034)+(1.071), (I-130)+(1.034)+(1.072), (I-130)+(1.034)+(1.073), (I-130)+(1.034)+(1.074), (I-130)+(1.034)+(1.075), (I-130)+(1.034)+(1.076), (I-130)+(1.034)+(1.077), (I-130)+(1.034)+(1.078), (I-130)+(1.034)+(1.079), (I-130)+(1.034)+(1.080), (I-130)+(1.034)+(1.081), (I-130)+(1.034)+(1.082), (I-130)+(1.034)+(1.083), (I-130)+(1.034)+(1.084), (I-130)+(1.034)+(1.085), (I-130)+(1.034)+(1.086), (I-130)+(1.034)+(1.087), (I-130)+(1.034)+(1.088), (I-130)+(1.034)+(1.089), (I-130)+(1.034)+(1.090), (I-130)+(1.034)+(1.091), (I-130)+(1.034)+(1.092), (I-130)+(1.034)+(2.001), (I-130)+(1.034)+(2.002), (I-130)+(1.034)+(2.003), (I-130)+(1.034)+(2.004), (I-130)+(1.034)+(2.005), (I-130)+(1.034)+(2.006), (I-130)+(1.034)+(2.007), (I-130)+(1.034)+(2.008), (I-130)+(1.034)+(2.009), (I-130)+(1.034)+(2.010), (I-130)+(1.034)+(2.011), (I-130)+(1.034)+(2.012), (I-130)+(1.034)+(2.013), (I-130)+(1.034)+(2.014), (I-130)+(1.034)+(2.015), (I-130)+(1.034)+(2.016), (I-130)+(1.034)+(2.017), (I-130)+(1.034)+(2.018), (I-130)+(1.034)+(2.019), (I-130)+(1.034)+(2.020), (I-130)+(1.034)+(2.021), (I-130)+(1.034)+(2.022), (I-130)+(1.034)+(2.023), (I-130)+(1.034)+(2.024), (I-130)+(1.034)+(2.025), (I-130)+(1.034)+(2.026), (I-130)+(1.034)+(2.027), (I-130)+(1.034)+(2.028), (I-130)+(1.034)+(2.029), (I-130)+(1.034)+(2.030), (I-130)+(1.034)+(2.031), (I-130)+(1.034)+(2.032), (I-130)+(1.034)+(2.033), (I-130)+(1.034)+(2.034), (I-130)+(1.034)+(2.035), (I-130)+(1.034)+(2.036), (I-130)+(1.034)+(2.037), (I-130)+(1.034)+(2.038), (I-130)+(1.034)+(2.039), (I-130)+(1.034)+(2.040), (I-130)+(1.034)+(2.041), (I-130)+(1.034)+(2.042), (I-130)+(1.034)+(2.043), (I-130)+(1.034)+(2.044), (I-130)+(1.034)+(2.045), (I-130)+(1.034)+(2.046), (I-130)+(1.034)+(2.047), (I-130)+(1.034)+(2.048), (I-130)+(1.034)+(2.049), (I-130)+(1.034)+(2.050), (I-130)+(1.034)+(2.051), (I-130)+(1.034)+(2.052), (I-130)+(1.034)+(2.053), (I-130)+(1.034)+(2.054), (I-130)+(1.034)+(2.055), (I-130)+(1.034)+(2.056), (I-130)+(1.034)+(2.057), (I-130)+(1.034)+(2.058), (I-130)+(1.034)+(2.059), (I-130)+(1.034)+(3.001), (I-130)+(1.034)+(3.002), (I-130)+(1.034)+(3.003), (I-130)+(1.034)+(3.004), (I-130)+(1.034)+(3.005), (I-130)+(1.034)+(3.006), (I-130)+(1.034)+(3.007), (I-130)+(1.034)+(3.008), (I-130)+(1.034)+(3.009), (I-130)+(1.034)+(3.010), (I-130)+(1.034)+(3.011), (I-130)+(1.034)+(3.012), (I-130)+(1.034)+(3.013), (I-130)+(1.034)+(3.014), (I-130)+(1.034)+(3.015), (I-130)+(1.034)+(3.016), (I-130)+(1.034)+(3.017), (I-130)+(1.034)+(3.018), (I-130)+(1.034)+(3.019), (I-130)+(1.034)+(3.020), (I-130)+(1.034)+(3.021), (I-130)+(1.034)+(3.022), (I-130)+(1.034)+(3.023), (I-130)+(1.034)+(3.024), (I-130)+(1.034)+(3.025), (I-130)+(1.034)+(3.026), (I-130)+(1.034)+(3.027), (I-130)+(1.034)+(3.028), (I-130)+(1.034)+(3.029), (I-130)+(1.034)+(3.030), (I-130)+(1.034)+(3.031), (I-130)+(1.034)+(5.001), (I-130)+(1.034)+(5.002), (I-130)+(1.034)+(5.003), (I-130)+(1.034)+(5.004), (I-130)+(1.034)+(5.005), (I-130)+(1.034)+(5.006), (I-130)+(1.034)+(5.007), (I-130)+(1.034)+(5.008), (I-130)+(1.034)+(5.009), (I-130)+(1.034)+(5.010), (I-130)+(1.034)+(5.011), (I-130)+(1.034)+(5.012), (I-130)+(1.034)+(5.013), (I-130)+(1.034)+(5.014), (I-130)+(1.034)+(5.015), (I-130)+(1.034)+(5.016), (I-130)+(1.034)+(5.017), (I-130)+(1.034)+(5.018), (I-130)+(1.034)+(5.019), (I-130)+(1.034)+(5.020), (I-130)+(1.034)+(5.021), (I-130)+(1.034)+(5.022), (I-130)+(1.034)+(5.023), (I-130)+(1.034)+(6.001), (I-130)+(1.034)+(6.002), (I-130)+(1.034)+(6.003), (I-130)+(1.034)+(6.004), (I-130)+(1.034)+(7.001), (I-130)+(1.034)+(7.002), (I-130)+(1.034)+(7.003), (I-130)+(1.034)+(7.004), (I-130)+(1.034)+(7.005), (I-130)+(1.034)+(7.006), (I-130)+(1.034)+(9.001), (I-130)+(1.034)+(9.002), (I-130)+(1.034)+(9.003), (I-130)+(1.034)+(9.004), (I-130)+(1.034)+(9.005), (I-130)+(1.034)+(9.006), (I-130)+(1.034)+(9.007), (I-130)+(1.034)+(9.008), (I-130)+(1.034)+(9.009), (I-130)+(1.034)+(14.001), (I-130)+(1.034)+(14.002), (I-130)+(1.034)+(15.008), (I-130)+(1.034)+(15.011), (I-130)+(1.034)+(15.012), (I-130)+(1.034)+(15.016), (I-130)+(1.034)+(15.025), (I-130)+(1.034)+(15.027), (I-130)+(1.034)+(15.047), (I-130)+(1.034)+(15.063), (I-130)+(1.034)+(15.064), (I-130)+(1.034)+(16.001), (I-130)+(1.034)+(16.002), (I-130)+(1.034)+(16.003), (I-130)+(1.034)+(16.004), (I-130)+(1.034)+(16.005), (I-130)+(1.034)+(16.006), (I-130)+(1.034)+(16.007), (I-130)+(1.034)+(16.008), (I-130)+(1.034)+(17.001), (I-130)+(1.034)+(17.002), (I-130)+(1.034)+(17.003), (I-130)+(1.034)+(17.004), (I-130)+(1.034)+(17.005), (I-130)+(1.034)+(17.006), (I-130)+(1.034)+(17.007), (I-130)+(1.034)+(17.008), (I-130)+(1.034)+(17.009), (I-130)+(1.034)+(17.010), (I-130)+(1.034)+(17.011), (I-130)+(1.034)+(17.012), (I-130)+(1.034)+(18.001), (I-130)+(1.035)+(1.036), (I-130)+(1.035)+(1.037), (I-130)+(1.035)+(1.038), (I-130)+(1.035)+(1.039), (I-130)+(1.035)+(1.040), (I-130)+(1.035)+(1.041), (I-130)+(1.035)+(1.042), (I-130)+(1.035)+(1.043), (I-130)+(1.035)+(1.044), (I-130)+(1.035)+(1.045), (I-130)+(1.035)+(1.046), (I-130)+(1.035)+(1.047), (I-130)+(1.035)+(1.048), (I-130)+(1.035)+(1.049), (I-130)+(1.035)+(1.050), (I-130)+(1.035)+(1.051), (I-130)+(1.035)+(1.052), (I-130)+(1.035)+(1.053), (I-130)+(1.035)+(1.054), (I-130)+(1.035)+(1.055), (I-130)+(1.035)+(1.056), (I-130)+(1.035)+(1.057), (I-130)+(1.035)+(1.058), (I-130)+(1.035)+(1.059), (I-130)+(1.035)+(1.060), (I-130)+(1.035)+(1.061), (I-130)+(1.035)+(1.062), (I-130)+(1.035)+(1.063), (I-130)+(1.035)+(1.064), (I-130)+(1.035)+(1.065), (I-130)+(1.035)+(1.066), (I-130)+(1.035)+(1.067), (I-130)+(1.035)+(1.068), (I-130)+(1.035)+(1.069), (I-130)+(1.035)+(1.070), (I-130)+(1.035)+(1.071), (I-130)+(1.035)+(1.072), (I-130)+(1.035)+(1.073), (I-130)+(1.035)+(1.074), (I-130)+(1.035)+(1.075), (I-130)+(1.035)+(1.076), (I-130)+(1.035)+(1.077), (I-130)+(1.035)+(1.078), (I-130)+(1.035)+(1.079), (I-130)+(1.035)+(1.080), (I-130)+(1.035)+(1.081), (I-130)+(1.035)+(1.082), (I-130)+(1.035)+(1.083), (I-130)+(1.035)+(1.084), (I-130)+(1.035)+(1.085), (I-130)+(1.035)+(1.086), (I-130)+(1.035)+(1.087), (I-130)+(1.035)+(1.088), (I-130)+(1.035)+(1.089), (I-130)+(1.035)+(1.090), (I-130)+(1.035)+(1.091), (I-130)+(1.035)+(1.092), (I-130)+(1.035)+(2.001), (I-130)+(1.035)+(2.002), (I-130)+(1.035)+(2.003), (I-130)+(1.035)+(2.004), (I-130)+(1.035)+(2.005), (I-130)+(1.035)+(2.006), (I-130)+(1.035)+(2.007), (I-130)+(1.035)+(2.008), (I-130)+(1.035)+(2.009), (I-130)+(1.035)+(2.010), (I-130)+(1.035)+(2.011), (I-130)+(1.035)+(2.012), (I-130)+(1.035)+(2.013), (I-130)+(1.035)+(2.014), (I-130)+(1.035)+(2.015), (I-130)+(1.035)+(2.016), (I-130)+(1.035)+(2.017), (I-130)+(1.035)+(2.018), (I-130)+(1.035)+(2.019), (I-130)+(1.035)+(2.020), (I-130)+(1.035)+(2.021), (I-130)+(1.035)+(2.022), (I-130)+(1.035)+(2.023), (I-130)+(1.035)+(2.024), (I-130)+(1.035)+(2.025), (I-130)+(1.035)+(2.026), (I-130)+(1.035)+(2.027), (I-130)+(1.035)+(2.028), (I-130)+(1.035)+(2.029), (I-130)+(1.035)+(2.030), (I-130)+(1.035)+(2.031), (I-130)+(1.035)+(2.032), (I-130)+(1.035)+(2.033), (I-130)+(1.035)+(2.034), (I-130)+(1.035)+(2.035), (I-130)+(1.035)+(2.036), (I-130)+(1.035)+(2.037), (I-130)+(1.035)+(2.038), (I-130)+(1.035)+(2.039), (I-130)+(1.035)+(2.040), (I-130)+(1.035)+(2.041), (I-130)+(1.035)+(2.042), (I-130)+(1.035)+(2.043), (I-130)+(1.035)+(2.044), (I-130)+(1.035)+(2.045), (I-130)+(1.035)+(2.046), (I-130)+(1.035)+(2.047), (I-130)+(1.035)+(2.048), (I-130)+(1.035)+(2.049), (I-130)+(1.035)+(2.050), (I-130)+(1.035)+(2.051), (I-130)+(1.035)+(2.052), (I-130)+(1.035)+(2.053), (I-130)+(1.035)+(2.054), (I-130)+(1.035)+(2.055), (I-130)+(1.035)+(2.056), (I-130)+(1.035)+(2.057), (I-130)+(1.035)+(2.058), (I-130)+(1.035)+(2.059), (I-130)+(1.035)+(3.001), (I-130)+(1.035)+(3.002), (I-130)+(1.035)+(3.003), (I-130)+(1.035)+(3.004), (I-130)+(1.035)+(3.005), (I-130)+(1.035)+(3.006), (I-130)+(1.035)+(3.007), (I-130)+(1.035)+(3.008), (I-130)+(1.035)+(3.009), (I-130)+(1.035)+(3.010), (I-130)+(1.035)+(3.011), (I-130)+(1.035)+(3.012), (I-130)+(1.035)+(3.013), (I-130)+(1.035)+(3.014), (I-130)+(1.035)+(3.015), (I-130)+(1.035)+(3.016), (I-130)+(1.035)+(3.017), (I-130)+(1.035)+(3.018), (I-130)+(1.035)+(3.019), (I-130)+(1.035)+(3.020), (I-130)+(1.035)+(3.021), (I-130)+(1.035)+(3.022), (I-130)+(1.035)+(3.023), (I-130)+(1.035)+(3.024), (I-130)+(1.035)+(3.025), (I-130)+(1.035)+(3.026), (I-130)+(1.035)+(3.027), (I-130)+(1.035)+(3.028), (I-130)+(1.035)+(3.029), (I-130)+(1.035)+(3.030), (I-130)+(1.035)+(3.031), (I-130)+(1.035)+(5.001), (I-130)+(1.035)+(5.002), (I-130)+(1.035)+(5.003), (I-130)+(1.035)+(5.004), (I-130)+(1.035)+(5.005), (I-130)+(1.035)+(5.006), (I-130)+(1.035)+(5.007), (I-130)+(1.035)+(5.008), (I-130)+(1.035)+(5.009), (I-130)+(1.035)+(5.010), (I-130)+(1.035)+(5.011), (I-130)+(1.035)+(5.012), (I-130)+(1.035)+(5.013), (I-130)+(1.035)+(5.014), (I-130)+(1.035)+(5.015), (I-130)+(1.035)+(5.016), (I-130)+(1.035)+(5.017), (I-130)+(1.035)+(5.018), (I-130)+(1.035)+(5.019), (I-130)+(1.035)+(5.020), (I-130)+(1.035)+(5.021), (I-130)+(1.035)+(5.022), (I-130)+(1.035)+(5.023), (I-130)+(1.035)+(6.001), (I-130)+(1.035)+(6.002), (I-130)+(1.035)+(6.003), (I-130)+(1.035)+(6.004), (I-130)+(1.035)+(7.001), (I-130)+(1.035)+(7.002), (I-130)+(1.035)+(7.003), (I-130)+(1.035)+(7.004), (I-130)+(1.035)+(7.005), (I-130)+(1.035)+(7.006), (I-130)+(1.035)+(9.001), (I-130)+(1.035)+(9.002), (I-130)+(1.035)+(9.003), (I-130)+(1.035)+(9.004), (I-130)+(1.035)+(9.005), (I-130)+(1.035)+(9.006), (I-130)+(1.035)+(9.007), (I-130)+(1.035)+(9.008), (I-130)+(1.035)+(9.009), (I-130)+(1.035)+(14.001), (I-130)+(1.035)+(14.002), (I-130)+(1.035)+(15.008), (I-130)+(1.035)+(15.011), (I-130)+(1.035)+(15.012), (I-130)+(1.035)+(15.016), (I-130)+(1.035)+(15.025), (I-130)+(1.035)+(15.027), (I-130)+(1.035)+(15.047), (I-130)+(1.035)+(15.063), (I-130)+(1.035)+(15.064), (I-130)+(1.035)+(16.001), (I-130)+(1.035)+(16.002), (I-130)+(1.035)+(16.003), (I-130)+(1.035)+(16.004), (I-130)+(1.035)+(16.005), (I-130)+(1.035)+(16.006), (I-130)+(1.035)+(16.007), (I-130)+(1.035)+(16.008), (I-130)+(1.035)+(17.001), (I-130)+(1.035)+(17.002), (I-130)+(1.035)+(17.003), (I-130)+(1.035)+(17.004), (I-130)+(1.035)+(17.005), (I-130)+(1.035)+(17.006), (I-130)+(1.035)+(17.007), (I-130)+(1.035)+(17.008), (I-130)+(1.035)+(17.009), (I-130)+(1.035)+(17.010), (I-130)+(1.035)+(17.011), (I-130)+(1.035)+(17.012), (I-130)+(1.035)+(18.001), (I-130)+(1.036)+(1.037), (I-130)+(1.036)+(1.038), (I-130)+(1.036)+(1.039), (I-130)+(1.036)+(1.040), (I-130)+(1.036)+(1.041), (I-130)+(1.036)+(1.042), (I-130)+(1.036)+(1.043), (I-130)+(1.036)+(1.044), (I-130)+(1.036)+(1.045), (I-130)+(1.036)+(1.046), (I-130)+(1.036)+(1.047), (I-130)+(1.036)+(1.048), (I-130)+(1.036)+(1.049), (I-130)+(1.036)+(1.050), (I-130)+(1.036)+(1.051), (I-130)+(1.036)+(1.052), (I-130)+(1.036)+(1.053), (I-130)+(1.036)+(1.054), (I-130)+(1.036)+(1.055), (I-130)+(1.036)+(1.056), (I-130)+(1.036)+(1.057), (I-130)+(1.036)+(1.058), (I-130)+(1.036)+(1.059), (I-130)+(1.036)+(1.060), (I-130)+(1.036)+(1.061), (I-130)+(1.036)+(1.062), (I-130)+(1.036)+(1.063), (I-130)+(1.036)+(1.064), (I-130)+(1.036)+(1.065), (I-130)+(1.036)+(1.066), (I-130)+(1.036)+(1.067), (I-130)+(1.036)+(1.068), (I-130)+(1.036)+(1.069), (I-130)+(1.036)+(1.070), (I-130)+(1.036)+(1.071), (I-130)+(1.036)+(1.072), (I-130)+(1.036)+(1.073), (I-130)+(1.036)+(1.074), (I-130)+(1.036)+(1.075), (I-130)+(1.036)+(1.076), (I-130)+(1.036)+(1.077), (I-130)+(1.036)+(1.078), (I-130)+(1.036)+(1.079), (I-130)+(1.036)+(1.080), (I-130)+(1.036)+(1.081), (I-130)+(1.036)+(1.082), (I-130)+(1.036)+(1.083), (I-130)+(1.036)+(1.084), (I-130)+(1.036)+(1.085), (I-130)+(1.036)+(1.086), (I-130)+(1.036)+(1.087), (I-130)+(1.036)+(1.088), (I-130)+(1.036)+(1.089), (I-130)+(1.036)+(1.090), (I-130)+(1.036)+(1.091), (I-130)+(1.036)+(1.092), (I-130)+(1.036)+(2.001), (I-130)+(1.036)+(2.002), (I-130)+(1.036)+(2.003), (I-130)+(1.036)+(2.004), (I-130)+(1.036)+(2.005), (I-130)+(1.036)+(2.006), (I-130)+(1.036)+(2.007), (I-130)+(1.036)+(2.008), (I-130)+(1.036)+(2.009), (I-130)+(1.036)+(2.010), (I-130)+(1.036)+(2.011), (I-130)+(1.036)+(2.012), (I-130)+(1.036)+(2.013), (I-130)+(1.036)+(2.014), (I-130)+(1.036)+(2.015), (I-130)+(1.036)+(2.016), (I-130)+(1.036)+(2.017), (I-130)+(1.036)+(2.018), (I-130)+(1.036)+(2.019), (I-130)+(1.036)+(2.020), (I-130)+(1.036)+(2.021), (I-130)+(1.036)+(2.022), (I-130)+(1.036)+(2.023), (I-130)+(1.036)+(2.024), (I-130)+(1.036)+(2.025), (I-130)+(1.036)+(2.026), (I-130)+(1.036)+(2.027), (I-130)+(1.036)+(2.028), (I-130)+(1.036)+(2.029), (I-130)+(1.036)+(2.030), (I-130)+(1.036)+(2.031), (I-130)+(1.036)+(2.032), (I-130)+(1.036)+(2.033), (I-130)+(1.036)+(2.034), (I-130)+(1.036)+(2.035), (I-130)+(1.036)+(2.036), (I-130)+(1.036)+(2.037), (I-130)+(1.036)+(2.038), (I-130)+(1.036)+(2.039), (I-130)+(1.036)+(2.040), (I-130)+(1.036)+(2.041), (I-130)+(1.036)+(2.042), (I-130)+(1.036)+(2.043), (I-130)+(1.036)+(2.044), (I-130)+(1.036)+(2.045), (I-130)+(1.036)+(2.046), (I-130)+(1.036)+(2.047), (I-130)+(1.036)+(2.048), (I-130)+(1.036)+(2.049), (I-130)+(1.036)+(2.050), (I-130)+(1.036)+(2.051), (I-130)+(1.036)+(2.052), (I-130)+(1.036)+(2.053), (I-130)+(1.036)+(2.054), (I-130)+(1.036)+(2.055), (I-130)+(1.036)+(2.056), (I-130)+(1.036)+(2.057), (I-130)+(1.036)+(2.058), (I-130)+(1.036)+(2.059), (I-130)+(1.036)+(3.001), (I-130)+(1.036)+(3.002), (I-130)+(1.036)+(3.003), (I-130)+(1.036)+(3.004), (I-130)+(1.036)+(3.005), (I-130)+(1.036)+(3.006), (I-130)+(1.036)+(3.007), (I-130)+(1.036)+(3.008), (I-130)+(1.036)+(3.009), (I-130)+(1.036)+(3.010), (I-130)+(1.036)+(3.011), (I-130)+(1.036)+(3.012), (I-130)+(1.036)+(3.013), (I-130)+(1.036)+(3.014), (I-130)+(1.036)+(3.015), (I-130)+(1.036)+(3.016), (I-130)+(1.036)+(3.017), (I-130)+(1.036)+(3.018), (I-130)+(1.036)+(3.019), (I-130)+(1.036)+(3.020), (I-130)+(1.036)+(3.021), (I-130)+(1.036)+(3.022), (I-130)+(1.036)+(3.023), (I-130)+(1.036)+(3.024), (I-130)+(1.036)+(3.025), (I-130)+(1.036)+(3.026), (I-130)+(1.036)+(3.027), (I-130)+(1.036)+(3.028), (I-130)+(1.036)+(3.029), (I-130)+(1.036)+(3.030), (I-130)+(1.036)+(3.031), (I-130)+(1.036)+(5.001), (I-130)+(1.036)+(5.002), (I-130)+(1.036)+(5.003), (I-130)+(1.036)+(5.004), (I-130)+(1.036)+(5.005), (I-130)+(1.036)+(5.006), (I-130)+(1.036)+(5.007), (I-130)+(1.036)+(5.008), (I-130)+(1.036)+(5.009), (I-130)+(1.036)+(5.010), (I-130)+(1.036)+(5.011), (I-130)+(1.036)+(5.012), (I-130)+(1.036)+(5.013), (I-130)+(1.036)+(5.014), (I-130)+(1.036)+(5.015), (I-130)+(1.036)+(5.016), (I-130)+(1.036)+(5.017), (I-130)+(1.036)+(5.018), (I-130)+(1.036)+(5.019), (I-130)+(1.036)+(5.020), (I-130)+(1.036)+(5.021), (I-130)+(1.036)+(5.022), (I-130)+(1.036)+(5.023), (I-130)+(1.036)+(6.001), (I-130)+(1.036)+(6.002), (I-130)+(1.036)+(6.003), (I-130)+(1.036)+(6.004), (I-130)+(1.036)+(7.001), (I-130)+(1.036)+(7.002), (I-130)+(1.036)+(7.003), (I-130)+(1.036)+(7.004), (I-130)+(1.036)+(7.005), (I-130)+(1.036)+(7.006), (I-130)+(1.036)+(9.001), (I-130)+(1.036)+(9.002), (I-130)+(1.036)+(9.003), (I-130)+(1.036)+(9.004), (I-130)+(1.036)+(9.005), (I-130)+(1.036)+(9.006), (I-130)+(1.036)+(9.007), (I-130)+(1.036)+(9.008), (I-130)+(1.036)+(9.009), (I-130)+(1.036)+(14.001), (I-130)+(1.036)+(14.002), (I-130)+(1.036)+(15.008), (I-130)+(1.036)+(15.011), (I-130)+(1.036)+(15.012), (I-130)+(1.036)+(15.016), (I-130)+(1.036)+(15.025), (I-130)+(1.036)+(15.027), (I-130)+(1.036)+(15.047), (I-130)+(1.036)+(15.063), (I-130)+(1.036)+(15.064), (I-130)+(1.036)+(16.001), (I-130)+(1.036)+(16.002), (I-130)+(1.036)+(16.003), (I-130)+(1.036)+(16.004), (I-130)+(1.036)+(16.005), (I-130)+(1.036)+(16.006), (I-130)+(1.036)+(16.007), (I-130)+(1.036)+(16.008), (I-130)+(1.036)+(17.001), (I-130)+(1.036)+(17.002), (I-130)+(1.036)+(17.003), (I-130)+(1.036)+(17.004), (I-130)+(1.036)+(17.005), (I-130)+(1.036)+(17.006), (I-130)+(1.036)+(17.007), (I-130)+(1.036)+(17.008), (I-130)+(1.036)+(17.009), (I-130)+(1.036)+(17.010), (I-130)+(1.036)+(17.011), (I-130)+(1.036)+(17.012), (I-130)+(1.036)+(18.001), (I-130)+(1.037)+(1.038), (I-130)+(1.037)+(1.039), (I-130)+(1.037)+(1.040), (I-130)+(1.037)+(1.041), (I-130)+(1.037)+(1.042), (I-130)+(1.037)+(1.043), (I-130)+(1.037)+(1.044), (I-130)+(1.037)+(1.045), (I-130)+(1.037)+(1.046), (I-130)+(1.037)+(1.047), (I-130)+(1.037)+(1.048), (I-130)+(1.037)+(1.049), (I-130)+(1.037)+(1.050), (I-130)+(1.037)+(1.051), (I-130)+(1.037)+(1.052), (I-130)+(1.037)+(1.053), (I-130)+(1.037)+(1.054), (I-130)+(1.037)+(1.055), (I-130)+(1.037)+(1.056), (I-130)+(1.037)+(1.057), (I-130)+(1.037)+(1.058), (I-130)+(1.037)+(1.059), (I-130)+(1.037)+(1.060), (I-130)+(1.037)+(1.061), (I-130)+(1.037)+(1.062), (I-130)+(1.037)+(1.063), (I-130)+(1.037)+(1.064), (I-130)+(1.037)+(1.065), (I-130)+(1.037)+(1.066), (I-130)+(1.037)+(1.067), (I-130)+(1.037)+(1.068), (I-130)+(1.037)+(1.069), (I-130)+(1.037)+(1.070), (I-130)+(1.037)+(1.071), (I-130)+(1.037)+(1.072), (I-130)+(1.037)+(1.073), (I-130)+(1.037)+(1.074), (I-130)+(1.037)+(1.075), (I-130)+(1.037)+(1.076), (I-130)+(1.037)+(1.077), (I-130)+(1.037)+(1.078), (I-130)+(1.037)+(1.079), (I-130)+(1.037)+(1.080), (I-130)+(1.037)+(1.081), (I-130)+(1.037)+(1.082), (I-130)+(1.037)+(1.083), (I-130)+(1.037)+(1.084), (I-130)+(1.037)+(1.085), (I-130)+(1.037)+(1.086), (I-130)+(1.037)+(1.087), (I-130)+(1.037)+(1.088), (I-130)+(1.037)+(1.089), (I-130)+(1.037)+(1.090), (I-130)+(1.037)+(1.091), (I-130)+(1.037)+(1.092), (I-130)+(1.037)+(2.001), (I-130)+(1.037)+(2.002), (I-130)+(1.037)+(2.003), (I-130)+(1.037)+(2.004), (I-130)+(1.037)+(2.005), (I-130)+(1.037)+(2.006), (I-130)+(1.037)+(2.007), (I-130)+(1.037)+(2.008), (I-130)+(1.037)+(2.009), (I-130)+(1.037)+(2.010), (I-130)+(1.037)+(2.011), (I-130)+(1.037)+(2.012), (I-130)+(1.037)+(2.013), (I-130)+(1.037)+(2.014), (I-130)+(1.037)+(2.015), (I-130)+(1.037)+(2.016), (I-130)+(1.037)+(2.017), (I-130)+(1.037)+(2.018), (I-130)+(1.037)+(2.019), (I-130)+(1.037)+(2.020), (I-130)+(1.037)+(2.021), (I-130)+(1.037)+(2.022), (I-130)+(1.037)+(2.023), (I-130)+(1.037)+(2.024), (I-130)+(1.037)+(2.025), (I-130)+(1.037)+(2.026), (I-130)+(1.037)+(2.027), (I-130)+(1.037)+(2.028), (I-130)+(1.037)+(2.029), (I-130)+(1.037)+(2.030), (I-130)+(1.037)+(2.031), (I-130)+(1.037)+(2.032), (I-130)+(1.037)+(2.033), (I-130)+(1.037)+(2.034), (I-130)+(1.037)+(2.035), (I-130)+(1.037)+(2.036), (I-130)+(1.037)+(2.037), (I-130)+(1.037)+(2.038), (I-130)+(1.037)+(2.039), (I-130)+(1.037)+(2.040), (I-130)+(1.037)+(2.041), (I-130)+(1.037)+(2.042), (I-130)+(1.037)+(2.043), (I-130)+(1.037)+(2.044), (I-130)+(1.037)+(2.045), (I-130)+(1.037)+(2.046), (I-130)+(1.037)+(2.047), (I-130)+(1.037)+(2.048), (I-130)+(1.037)+(2.049), (I-130)+(1.037)+(2.050), (I-130)+(1.037)+(2.051), (I-130)+(1.037)+(2.052), (I-130)+(1.037)+(2.053), (I-130)+(1.037)+(2.054), (I-130)+(1.037)+(2.055), (I-130)+(1.037)+(2.056), (I-130)+(1.037)+(2.057), (I-130)+(1.037)+(2.058), (I-130)+(1.037)+(2.059), (I-130)+(1.037)+(3.001), (I-130)+(1.037)+(3.002), (I-130)+(1.037)+(3.003), (I-130)+(1.037)+(3.004), (I-130)+(1.037)+(3.005), (I-130)+(1.037)+(3.006), (I-130)+(1.037)+(3.007), (I-130)+(1.037)+(3.008), (I-130)+(1.037)+(3.009), (I-130)+(1.037)+(3.010), (I-130)+(1.037)+(3.011), (I-130)+(1.037)+(3.012), (I-130)+(1.037)+(3.013), (I-130)+(1.037)+(3.014), (I-130)+(1.037)+(3.015), (I-130)+(1.037)+(3.016), (I-130)+(1.037)+(3.017), (I-130)+(1.037)+(3.018), (I-130)+(1.037)+(3.019), (I-130)+(1.037)+(3.020), (I-130)+(1.037)+(3.021), (I-130)+(1.037)+(3.022), (I-130)+(1.037)+(3.023), (I-130)+(1.037)+(3.024), (I-130)+(1.037)+(3.025), (I-130)+(1.037)+(3.026), (I-130)+(1.037)+(3.027), (I-130)+(1.037)+(3.028), (I-130)+(1.037)+(3.029), (I-130)+(1.037)+(3.030), (I-130)+(1.037)+(3.031), (I-130)+(1.037)+(5.001), (I-130)+(1.037)+(5.002), (I-130)+(1.037)+(5.003), (I-130)+(1.037)+(5.004), (I-130)+(1.037)+(5.005), (I-130)+(1.037)+(5.006), (I-130)+(1.037)+(5.007), (I-130)+(1.037)+(5.008), (I-130)+(1.037)+(5.009), (I-130)+(1.037)+(5.010), (I-130)+(1.037)+(5.011), (I-130)+(1.037)+(5.012), (I-130)+(1.037)+(5.013), (I-130)+(1.037)+(5.014), (I-130)+(1.037)+(5.015), (I-130)+(1.037)+(5.016), (I-130)+(1.037)+(5.017), (I-130)+(1.037)+(5.018), (I-130)+(1.037)+(5.019), (I-130)+(1.037)+(5.020), (I-130)+(1.037)+(5.021), (I-130)+(1.037)+(5.022), (I-130)+(1.037)+(5.023), (I-130)+(1.037)+(6.001), (I-130)+(1.037)+(6.002), (I-130)+(1.037)+(6.003), (I-130)+(1.037)+(6.004), (I-130)+(1.037)+(7.001), (I-130)+(1.037)+(7.002), (I-130)+(1.037)+(7.003), (I-130)+(1.037)+(7.004), (I-130)+(1.037)+(7.005), (I-130)+(1.037)+(7.006), (I-130)+(1.037)+(9.001), (I-130)+(1.037)+(9.002), (I-130)+(1.037)+(9.003), (I-130)+(1.037)+(9.004), (I-130)+(1.037)+(9.005), (I-130)+(1.037)+(9.006), (I-130)+(1.037)+(9.007), (I-130)+(1.037)+(9.008), (I-130)+(1.037)+(9.009), (I-130)+(1.037)+(14.001), (I-130)+(1.037)+(14.002), (I-130)+(1.037)+(15.008), (I-130)+(1.037)+(15.011), (I-130)+(1.037)+(15.012), (I-130)+(1.037)+(15.016), (I-130)+(1.037)+(15.025), (I-130)+(1.037)+(15.027), (I-130)+(1.037)+(15.047), (I-130)+(1.037)+(15.063), (I-130)+(1.037)+(15.064), (I-130)+(1.037)+(16.001), (I-130)+(1.037)+(16.002), (I-130)+(1.037)+(16.003), (I-130)+(1.037)+(16.004), (I-130)+(1.037)+(16.005), (I-130)+(1.037)+(16.006), (I-130)+(1.037)+(16.007), (I-130)+(1.037)+(16.008), (I-130)+(1.037)+(17.001), (I-130)+(1.037)+(17.002), (I-130)+(1.037)+(17.003), (I-130)+(1.037)+(17.004), (I-130)+(1.037)+(17.005), (I-130)+(1.037)+(17.006), (I-130)+(1.037)+(17.007), (I-130)+(1.037)+(17.008), (I-130)+(1.037)+(17.009), (I-130)+(1.037)+(17.010), (I-130)+(1.037)+(17.011), (I-130)+(1.037)+(17.012), (I-130)+(1.037)+(18.001), (I-130)+(1.038)+(1.039), (I-130)+(1.038)+(1.040), (I-130)+(1.038)+(1.041), (I-130)+(1.038)+(1.042), (I-130)+(1.038)+(1.043), (I-130)+(1.038)+(1.044), (I-130)+(1.038)+(1.045), (I-130)+(1.038)+(1.046), (I-130)+(1.038)+(1.047), (I-130)+(1.038)+(1.048), (I-130)+(1.038)+(1.049), (I-130)+(1.038)+(1.050), (I-130)+(1.038)+(1.051), (I-130)+(1.038)+(1.052), (I-130)+(1.038)+(1.053), (I-130)+(1.038)+(1.054), (I-130)+(1.038)+(1.055), (I-130)+(1.038)+(1.056), (I-130)+(1.038)+(1.057), (I-130)+(1.038)+(1.058), (I-130)+(1.038)+(1.059), (I-130)+(1.038)+(1.060), (I-130)+(1.038)+(1.061), (I-130)+(1.038)+(1.062), (I-130)+(1.038)+(1.063), (I-130)+(1.038)+(1.064), (I-130)+(1.038)+(1.065), (I-130)+(1.038)+(1.066), (I-130)+(1.038)+(1.067), (I-130)+(1.038)+(1.068), (I-130)+(1.038)+(1.069), (I-130)+(1.038)+(1.070), (I-130)+(1.038)+(1.071), (I-130)+(1.038)+(1.072), (I-130)+(1.038)+(1.073), (I-130)+(1.038)+(1.074), (I-130)+(1.038)+(1.075), (I-130)+(1.038)+(1.076), (I-130)+(1.038)+(1.077), (I-130)+(1.038)+(1.078), (I-130)+(1.038)+(1.079), (I-130)+(1.038)+(1.080), (I-130)+(1.038)+(1.081), (I-130)+(1.038)+(1.082), (I-130)+(1.038)+(1.083), (I-130)+(1.038)+(1.084), (I-130)+(1.038)+(1.085), (I-130)+(1.038)+(1.086), (I-130)+(1.038)+(1.087), (I-130)+(1.038)+(1.088), (I-130)+(1.038)+(1.089), (I-130)+(1.038)+(1.090), (I-130)+(1.038)+(1.091), (I-130)+(1.038)+(1.092), (I-130)+(1.038)+(2.001), (I-130)+(1.038)+(2.002), (I-130)+(1.038)+(2.003), (I-130)+(1.038)+(2.004), (I-130)+(1.038)+(2.005), (I-130)+(1.038)+(2.006), (I-130)+(1.038)+(2.007), (I-130)+(1.038)+(2.008), (I-130)+(1.038)+(2.009), (I-130)+(1.038)+(2.010), (I-130)+(1.038)+(2.011), (I-130)+(1.038)+(2.012), (I-130)+(1.038)+(2.013), (I-130)+(1.038)+(2.014), (I-130)+(1.038)+(2.015), (I-130)+(1.038)+(2.016), (I-130)+(1.038)+(2.017), (I-130)+(1.038)+(2.018), (I-130)+(1.038)+(2.019), (I-130)+(1.038)+(2.020), (I-130)+(1.038)+(2.021), (I-130)+(1.038)+(2.022), (I-130)+(1.038)+(2.023), (I-130)+(1.038)+(2.024), (I-130)+(1.038)+(2.025), (I-130)+(1.038)+(2.026), (I-130)+(1.038)+(2.027), (I-130)+(1.038)+(2.028), (I-130)+(1.038)+(2.029), (I-130)+(1.038)+(2.030), (I-130)+(1.038)+(2.031), (I-130)+(1.038)+(2.032), (I-130)+(1.038)+(2.033), (I-130)+(1.038)+(2.034), (I-130)+(1.038)+(2.035), (I-130)+(1.038)+(2.036), (I-130)+(1.038)+(2.037), (I-130)+(1.038)+(2.038), (I-130)+(1.038)+(2.039), (I-130)+(1.038)+(2.040), (I-130)+(1.038)+(2.041), (I-130)+(1.038)+(2.042), (I-130)+(1.038)+(2.043), (I-130)+(1.038)+(2.044), (I-130)+(1.038)+(2.045), (I-130)+(1.038)+(2.046), (I-130)+(1.038)+(2.047), (I-130)+(1.038)+(2.048), (I-130)+(1.038)+(2.049), (I-130)+(1.038)+(2.050), (I-130)+(1.038)+(2.051), (I-130)+(1.038)+(2.052), (I-130)+(1.038)+(2.053), (I-130)+(1.038)+(2.054), (I-130)+(1.038)+(2.055), (I-130)+(1.038)+(2.056), (I-130)+(1.038)+(2.057), (I-130)+(1.038)+(2.058), (I-130)+(1.038)+(2.059), (I-130)+(1.038)+(3.001), (I-130)+(1.038)+(3.002), (I-130)+(1.038)+(3.003), (I-130)+(1.038)+(3.004), (I-130)+(1.038)+(3.005), (I-130)+(1.038)+(3.006), (I-130)+(1.038)+(3.007), (I-130)+(1.038)+(3.008), (I-130)+(1.038)+(3.009), (I-130)+(1.038)+(3.010), (I-130)+(1.038)+(3.011), (I-130)+(1.038)+(3.012), (I-130)+(1.038)+(3.013), (I-130)+(1.038)+(3.014), (I-130)+(1.038)+(3.015), (I-130)+(1.038)+(3.016), (I-130)+(1.038)+(3.017), (I-130)+(1.038)+(3.018), (I-130)+(1.038)+(3.019), (I-130)+(1.038)+(3.020), (I-130)+(1.038)+(3.021), (I-130)+(1.038)+(3.022), (I-130)+(1.038)+(3.023), (I-130)+(1.038)+(3.024), (I-130)+(1.038)+(3.025), (I-130)+(1.038)+(3.026), (I-130)+(1.038)+(3.027), (I-130)+(1.038)+(3.028), (I-130)+(1.038)+(3.029), (I-130)+(1.038)+(3.030), (I-130)+(1.038)+(3.031), (I-130)+(1.038)+(5.001), (I-130)+(1.038)+(5.002), (I-130)+(1.038)+(5.003), (I-130)+(1.038)+(5.004), (I-130)+(1.038)+(5.005), (I-130)+(1.038)+(5.006), (I-130)+(1.038)+(5.007), (I-130)+(1.038)+(5.008), (I-130)+(1.038)+(5.009), (I-130)+(1.038)+(5.010), (I-130)+(1.038)+(5.011), (I-130)+(1.038)+(5.012), (I-130)+(1.038)+(5.013), (I-130)+(1.038)+(5.014), (I-130)+(1.038)+(5.015), (I-130)+(1.038)+(5.016), (I-130)+(1.038)+(5.017), (I-130)+(1.038)+(5.018), (I-130)+(1.038)+(5.019), (I-130)+(1.038)+(5.020), (I-130)+(1.038)+(5.021), (I-130)+(1.038)+(5.022), (I-130)+(1.038)+(5.023), (I-130)+(1.038)+(6.001), (I-130)+(1.038)+(6.002), (I-130)+(1.038)+(6.003), (I-130)+(1.038)+(6.004), (I-130)+(1.038)+(7.001), (I-130)+(1.038)+(7.002), (I-130)+(1.038)+(7.003), (I-130)+(1.038)+(7.004), (I-130)+(1.038)+(7.005), (I-130)+(1.038)+(7.006), (I-130)+(1.038)+(9.001), (I-130)+(1.038)+(9.002), (I-130)+(1.038)+(9.003), (I-130)+(1.038)+(9.004), (I-130)+(1.038)+(9.005), (I-130)+(1.038)+(9.006), (I-130)+(1.038)+(9.007), (I-130)+(1.038)+(9.008), (I-130)+(1.038)+(9.009), (I-130)+(1.038)+(14.001), (I-130)+(1.038)+(14.002), (I-130)+(1.038)+(15.008), (I-130)+(1.038)+(15.011), (I-130)+(1.038)+(15.012), (I-130)+(1.038)+(15.016), (I-130)+(1.038)+(15.025), (I-130)+(1.038)+(15.027), (I-130)+(1.038)+(15.047), (I-130)+(1.038)+(15.063), (I-130)+(1.038)+(15.064), (I-130)+(1.038)+(16.001), (I-130)+(1.038)+(16.002), (I-130)+(1.038)+(16.003), (I-130)+(1.038)+(16.004), (I-130)+(1.038)+(16.005), (I-130)+(1.038)+(16.006), (I-130)+(1.038)+(16.007), (I-130)+(1.038)+(16.008), (I-130)+(1.038)+(17.001), (I-130)+(1.038)+(17.002), (I-130)+(1.038)+(17.003), (I-130)+(1.038)+(17.004), (I-130)+(1.038)+(17.005), (I-130)+(1.038)+(17.006), (I-130)+(1.038)+(17.007), (I-130)+(1.038)+(17.008), (I-130)+(1.038)+(17.009), (I-130)+(1.038)+(17.010), (I-130)+(1.038)+(17.011), (I-130)+(1.038)+(17.012), (I-130)+(1.038)+(18.001), (I-130)+(1.039)+(1.040), (I-130)+(1.039)+(1.041), (I-130)+(1.039)+(1.042), (I-130)+(1.039)+(1.043), (I-130)+(1.039)+(1.044), (I-130)+(1.039)+(1.045), (I-130)+(1.039)+(1.046), (I-130)+(1.039)+(1.047), (I-130)+(1.039)+(1.048), (I-130)+(1.039)+(1.049), (I-130)+(1.039)+(1.050), (I-130)+(1.039)+(1.051), (I-130)+(1.039)+(1.052), (I-130)+(1.039)+(1.053), (I-130)+(1.039)+(1.054), (I-130)+(1.039)+(1.055), (I-130)+(1.039)+(1.056), (I-130)+(1.039)+(1.057), (I-130)+(1.039)+(1.058), (I-130)+(1.039)+(1.059), (I-130)+(1.039)+(1.060), (I-130)+(1.039)+(1.061), (I-130)+(1.039)+(1.062), (I-130)+(1.039)+(1.063), (I-130)+(1.039)+(1.064), (I-130)+(1.039)+(1.065), (I-130)+(1.039)+(1.066), (I-130)+(1.039)+(1.067), (I-130)+(1.039)+(1.068), (I-130)+(1.039)+(1.069), (I-130)+(1.039)+(1.070), (I-130)+(1.039)+(1.071), (I-130)+(1.039)+(1.072), (I-130)+(1.039)+(1.073), (I-130)+(1.039)+(1.074), (I-130)+(1.039)+(1.075), (I-130)+(1.039)+(1.076), (I-130)+(1.039)+(1.077), (I-130)+(1.039)+(1.078), (I-130)+(1.039)+(1.079), (I-130)+(1.039)+(1.080), (I-130)+(1.039)+(1.081), (I-130)+(1.039)+(1.082), (I-130)+(1.039)+(1.083), (I-130)+(1.039)+(1.084), (I-130)+(1.039)+(1.085), (I-130)+(1.039)+(1.086), (I-130)+(1.039)+(1.087), (I-130)+(1.039)+(1.088), (I-130)+(1.039)+(1.089), (I-130)+(1.039)+(1.090), (I-130)+(1.039)+(1.091), (I-130)+(1.039)+(1.092), (I-130)+(1.039)+(2.001), (I-130)+(1.039)+(2.002), (I-130)+(1.039)+(2.003), (I-130)+(1.039)+(2.004), (I-130)+(1.039)+(2.005), (I-130)+(1.039)+(2.006), (I-130)+(1.039)+(2.007), (I-130)+(1.039)+(2.008), (I-130)+(1.039)+(2.009), (I-130)+(1.039)+(2.010), (I-130)+(1.039)+(2.011), (I-130)+(1.039)+(2.012), (I-130)+(1.039)+(2.013), (I-130)+(1.039)+(2.014), (I-130)+(1.039)+(2.015), (I-130)+(1.039)+(2.016), (I-130)+(1.039)+(2.017), (I-130)+(1.039)+(2.018), (I-130)+(1.039)+(2.019), (I-130)+(1.039)+(2.020), (I-130)+(1.039)+(2.021), (I-130)+(1.039)+(2.022), (I-130)+(1.039)+(2.023), (I-130)+(1.039)+(2.024), (I-130)+(1.039)+(2.025), (I-130)+(1.039)+(2.026), (I-130)+(1.039)+(2.027), (I-130)+(1.039)+(2.028), (I-130)+(1.039)+(2.029), (I-130)+(1.039)+(2.030), (I-130)+(1.039)+(2.031), (I-130)+(1.039)+(2.032), (I-130)+(1.039)+(2.033), (I-130)+(1.039)+(2.034), (I-130)+(1.039)+(2.035), (I-130)+(1.039)+(2.036), (I-130)+(1.039)+(2.037), (I-130)+(1.039)+(2.038), (I-130)+(1.039)+(2.039), (I-130)+(1.039)+(2.040), (I-130)+(1.039)+(2.041), (I-130)+(1.039)+(2.042), (I-130)+(1.039)+(2.043), (I-130)+(1.039)+(2.044), (I-130)+(1.039)+(2.045), (I-130)+(1.039)+(2.046), (I-130)+(1.039)+(2.047), (I-130)+(1.039)+(2.048), (I-130)+(1.039)+(2.049), (I-130)+(1.039)+(2.050), (I-130)+(1.039)+(2.051), (I-130)+(1.039)+(2.052), (I-130)+(1.039)+(2.053), (I-130)+(1.039)+(2.054), (I-130)+(1.039)+(2.055), (I-130)+(1.039)+(2.056), (I-130)+(1.039)+(2.057), (I-130)+(1.039)+(2.058), (I-130)+(1.039)+(2.059), (I-130)+(1.039)+(3.001), (I-130)+(1.039)+(3.002), (I-130)+(1.039)+(3.003), (I-130)+(1.039)+(3.004), (I-130)+(1.039)+(3.005), (I-130)+(1.039)+(3.006), (I-130)+(1.039)+(3.007), (I-130)+(1.039)+(3.008), (I-130)+(1.039)+(3.009), (I-130)+(1.039)+(3.010), (I-130)+(1.039)+(3.011), (I-130)+(1.039)+(3.012), (I-130)+(1.039)+(3.013), (I-130)+(1.039)+(3.014), (I-130)+(1.039)+(3.015), (I-130)+(1.039)+(3.016), (I-130)+(1.039)+(3.017), (I-130)+(1.039)+(3.018), (I-130)+(1.039)+(3.019), (I-130)+(1.039)+(3.020), (I-130)+(1.039)+(3.021), (I-130)+(1.039)+(3.022), (I-130)+(1.039)+(3.023), (I-130)+(1.039)+(3.024), (I-130)+(1.039)+(3.025), (I-130)+(1.039)+(3.026), (I-130)+(1.039)+(3.027), (I-130)+(1.039)+(3.028), (I-130)+(1.039)+(3.029), (I-130)+(1.039)+(3.030), (I-130)+(1.039)+(3.031), (I-130)+(1.039)+(5.001), (I-130)+(1.039)+(5.002), (I-130)+(1.039)+(5.003), (I-130)+(1.039)+(5.004), (I-130)+(1.039)+(5.005), (I-130)+(1.039)+(5.006), (I-130)+(1.039)+(5.007), (I-130)+(1.039)+(5.008), (I-130)+(1.039)+(5.009), (I-130)+(1.039)+(5.010), (I-130)+(1.039)+(5.011), (I-130)+(1.039)+(5.012), (I-130)+(1.039)+(5.013), (I-130)+(1.039)+(5.014), (I-130)+(1.039)+(5.015), (I-130)+(1.039)+(5.016), (I-130)+(1.039)+(5.017), (I-130)+(1.039)+(5.018), (I-130)+(1.039)+(5.019), (I-130)+(1.039)+(5.020), (I-130)+(1.039)+(5.021), (I-130)+(1.039)+(5.022), (I-130)+(1.039)+(5.023), (I-130)+(1.039)+(6.001), (I-130)+(1.039)+(6.002), (I-130)+(1.039)+(6.003), (I-130)+(1.039)+(6.004), (I-130)+(1.039)+(7.001), (I-130)+(1.039)+(7.002), (I-130)+(1.039)+(7.003), (I-130)+(1.039)+(7.004), (I-130)+(1.039)+(7.005), (I-130)+(1.039)+(7.006), (I-130)+(1.039)+(9.001), (I-130)+(1.039)+(9.002), (I-130)+(1.039)+(9.003), (I-130)+(1.039)+(9.004), (I-130)+(1.039)+(9.005), (I-130)+(1.039)+(9.006), (I-130)+(1.039)+(9.007), (I-130)+(1.039)+(9.008), (I-130)+(1.039)+(9.009), (I-130)+(1.039)+(14.001), (I-130)+(1.039)+(14.002), (I-130)+(1.039)+(15.008), (I-130)+(1.039)+(15.011), (I-130)+(1.039)+(15.012), (I-130)+(1.039)+(15.016), (I-130)+(1.039)+(15.025), (I-130)+(1.039)+(15.027), (I-130)+(1.039)+(15.047), (I-130)+(1.039)+(15.063), (I-130)+(1.039)+(15.064), (I-130)+(1.039)+(16.001), (I-130)+(1.039)+(16.002), (I-130)+(1.039)+(16.003), (I-130)+(1.039)+(16.004), (I-130)+(1.039)+(16.005), (I-130)+(1.039)+(16.006), (I-130)+(1.039)+(16.007), (I-130)+(1.039)+(16.008), (I-130)+(1.039)+(17.001), (I-130)+(1.039)+(17.002), (I-130)+(1.039)+(17.003), (I-130)+(1.039)+(17.004), (I-130)+(1.039)+(17.005), (I-130)+(1.039)+(17.006), (I-130)+(1.039)+(17.007), (I-130)+(1.039)+(17.008), (I-130)+(1.039)+(17.009), (I-130)+(1.039)+(17.010), (I-130)+(1.039)+(17.011), (I-130)+(1.039)+(17.012), (I-130)+(1.039)+(18.001), (I-130)+(1.040)+(1.041), (I-130)+(1.040)+(1.042), (I-130)+(1.040)+(1.043), (I-130)+(1.040)+(1.044), (I-130)+(1.040)+(1.045), (I-130)+(1.040)+(1.046), (I-130)+(1.040)+(1.047), (I-130)+(1.040)+(1.048), (I-130)+(1.040)+(1.049), (I-130)+(1.040)+(1.050), (I-130)+(1.040)+(1.051), (I-130)+(1.040)+(1.052), (I-130)+(1.040)+(1.053), (I-130)+(1.040)+(1.054), (I-130)+(1.040)+(1.055), (I-130)+(1.040)+(1.056), (I-130)+(1.040)+(1.057), (I-130)+(1.040)+(1.058), (I-130)+(1.040)+(1.059), (I-130)+(1.040)+(1.060), (I-130)+(1.040)+(1.061), (I-130)+(1.040)+(1.062), (I-130)+(1.040)+(1.063), (I-130)+(1.040)+(1.064), (I-130)+(1.040)+(1.065), (I-130)+(1.040)+(1.066), (I-130)+(1.040)+(1.067), (I-130)+(1.040)+(1.068), (I-130)+(1.040)+(1.069), (I-130)+(1.040)+(1.070), (I-130)+(1.040)+(1.071), (I-130)+(1.040)+(1.072), (I-130)+(1.040)+(1.073), (I-130)+(1.040)+(1.074), (I-130)+(1.040)+(1.075), (I-130)+(1.040)+(1.076), (I-130)+(1.040)+(1.077), (I-130)+(1.040)+(1.078), (I-130)+(1.040)+(1.079), (I-130)+(1.040)+(1.080), (I-130)+(1.040)+(1.081), (I-130)+(1.040)+(1.082), (I-130)+(1.040)+(1.083), (I-130)+(1.040)+(1.084), (I-130)+(1.040)+(1.085), (I-130)+(1.040)+(1.086), (I-130)+(1.040)+(1.087), (I-130)+(1.040)+(1.088), (I-130)+(1.040)+(1.089), (I-130)+(1.040)+(1.090), (I-130)+(1.040)+(1.091), (I-130)+(1.040)+(1.092), (I-130)+(1.040)+(2.001), (I-130)+(1.040)+(2.002), (I-130)+(1.040)+(2.003), (I-130)+(1.040)+(2.004), (I-130)+(1.040)+(2.005), (I-130)+(1.040)+(2.006), (I-130)+(1.040)+(2.007), (I-130)+(1.040)+(2.008), (I-130)+(1.040)+(2.009), (I-130)+(1.040)+(2.010), (I-130)+(1.040)+(2.011), (I-130)+(1.040)+(2.012), (I-130)+(1.040)+(2.013), (I-130)+(1.040)+(2.014), (I-130)+(1.040)+(2.015), (I-130)+(1.040)+(2.016), (I-130)+(1.040)+(2.017), (I-130)+(1.040)+(2.018), (I-130)+(1.040)+(2.019), (I-130)+(1.040)+(2.020), (I-130)+(1.040)+(2.021), (I-130)+(1.040)+(2.022), (I-130)+(1.040)+(2.023), (I-130)+(1.040)+(2.024), (I-130)+(1.040)+(2.025), (I-130)+(1.040)+(2.026), (I-130)+(1.040)+(2.027), (I-130)+(1.040)+(2.028), (I-130)+(1.040)+(2.029), (I-130)+(1.040)+(2.030), (I-130)+(1.040)+(2.031), (I-130)+(1.040)+(2.032), (I-130)+(1.040)+(2.033), (I-130)+(1.040)+(2.034), (I-130)+(1.040)+(2.035), (I-130)+(1.040)+(2.036), (I-130)+(1.040)+(2.037), (I-130)+(1.040)+(2.038), (I-130)+(1.040)+(2.039), (I-130)+(1.040)+(2.040), (I-130)+(1.040)+(2.041), (I-130)+(1.040)+(2.042), (I-130)+(1.040)+(2.043), (I-130)+(1.040)+(2.044), (I-130)+(1.040)+(2.045), (I-130)+(1.040)+(2.046), (I-130)+(1.040)+(2.047), (I-130)+(1.040)+(2.048), (I-130)+(1.040)+(2.049), (I-130)+(1.040)+(2.050), (I-130)+(1.040)+(2.051), (I-130)+(1.040)+(2.052), (I-130)+(1.040)+(2.053), (I-130)+(1.040)+(2.054), (I-130)+(1.040)+(2.055), (I-130)+(1.040)+(2.056), (I-130)+(1.040)+(2.057), (I-130)+(1.040)+(2.058), (I-130)+(1.040)+(2.059), (I-130)+(1.040)+(3.001), (I-130)+(1.040)+(3.002), (I-130)+(1.040)+(3.003), (I-130)+(1.040)+(3.004), (I-130)+(1.040)+(3.005), (I-130)+(1.040)+(3.006), (I-130)+(1.040)+(3.007), (I-130)+(1.040)+(3.008), (I-130)+(1.040)+(3.009), (I-130)+(1.040)+(3.010), (I-130)+(1.040)+(3.011), (I-130)+(1.040)+(3.012), (I-130)+(1.040)+(3.013), (I-130)+(1.040)+(3.014), (I-130)+(1.040)+(3.015), (I-130)+(1.040)+(3.016), (I-130)+(1.040)+(3.017), (I-130)+(1.040)+(3.018), (I-130)+(1.040)+(3.019), (I-130)+(1.040)+(3.020), (I-130)+(1.040)+(3.021), (I-130)+(1.040)+(3.022), (I-130)+(1.040)+(3.023), (I-130)+(1.040)+(3.024), (I-130)+(1.040)+(3.025), (I-130)+(1.040)+(3.026), (I-130)+(1.040)+(3.027), (I-130)+(1.040)+(3.028), (I-130)+(1.040)+(3.029), (I-130)+(1.040)+(3.030), (I-130)+(1.040)+(3.031), (I-130)+(1.040)+(5.001), (I-130)+(1.040)+(5.002), (I-130)+(1.040)+(5.003), (I-130)+(1.040)+(5.004), (I-130)+(1.040)+(5.005), (I-130)+(1.040)+(5.006), (I-130)+(1.040)+(5.007), (I-130)+(1.040)+(5.008), (I-130)+(1.040)+(5.009), (I-130)+(1.040)+(5.010), (I-130)+(1.040)+(5.011), (I-130)+(1.040)+(5.012), (I-130)+(1.040)+(5.013), (I-130)+(1.040)+(5.014), (I-130)+(1.040)+(5.015), (I-130)+(1.040)+(5.016), (I-130)+(1.040)+(5.017), (I-130)+(1.040)+(5.018), (I-130)+(1.040)+(5.019), (I-130)+(1.040)+(5.020), (I-130)+(1.040)+(5.021), (I-130)+(1.040)+(5.022), (I-130)+(1.040)+(5.023), (I-130)+(1.040)+(6.001), (I-130)+(1.040)+(6.002), (I-130)+(1.040)+(6.003), (I-130)+(1.040)+(6.004), (I-130)+(1.040)+(7.001), (I-130)+(1.040)+(7.002), (I-130)+(1.040)+(7.003), (I-130)+(1.040)+(7.004), (I-130)+(1.040)+(7.005), (I-130)+(1.040)+(7.006), (I-130)+(1.040)+(9.001), (I-130)+(1.040)+(9.002), (I-130)+(1.040)+(9.003), (I-130)+(1.040)+(9.004), (I-130)+(1.040)+(9.005), (I-130)+(1.040)+(9.006), (I-130)+(1.040)+(9.007), (I-130)+(1.040)+(9.008), (I-130)+(1.040)+(9.009), (I-130)+(1.040)+(14.001), (I-130)+(1.040)+(14.002), (I-130)+(1.040)+(15.008), (I-130)+(1.040)+(15.011), (I-130)+(1.040)+(15.012), (I-130)+(1.040)+(15.016), (I-130)+(1.040)+(15.025), (I-130)+(1.040)+(15.027), (I-130)+(1.040)+(15.047), (I-130)+(1.040)+(15.063), (I-130)+(1.040)+(15.064), (I-130)+(1.040)+(16.001), (I-130)+(1.040)+(16.002), (I-130)+(1.040)+(16.003), (I-130)+(1.040)+(16.004), (I-130)+(1.040)+(16.005), (I-130)+(1.040)+(16.006), (I-130)+(1.040)+(16.007), (I-130)+(1.040)+(16.008), (I-130)+(1.040)+(17.001), (I-130)+(1.040)+(17.002), (I-130)+(1.040)+(17.003), (I-130)+(1.040)+(17.004), (I-130)+(1.040)+(17.005), (I-130)+(1.040)+(17.006), (I-130)+(1.040)+(17.007), (I-130)+(1.040)+(17.008), (I-130)+(1.040)+(17.009), (I-130)+(1.040)+(17.010), (I-130)+(1.040)+(17.011), (I-130)+(1.040)+(17.012), (I-130)+(1.040)+(18.001), (I-130)+(1.041)+(1.042), (I-130)+(1.041)+(1.043), (I-130)+(1.041)+(1.044), (I-130)+(1.041)+(1.045), (I-130)+(1.041)+(1.046), (I-130)+(1.041)+(1.047), (I-130)+(1.041)+(1.048), (I-130)+(1.041)+(1.049), (I-130)+(1.041)+(1.050), (I-130)+(1.041)+(1.051), (I-130)+(1.041)+(1.052), (I-130)+(1.041)+(1.053), (I-130)+(1.041)+(1.054), (I-130)+(1.041)+(1.055), (I-130)+(1.041)+(1.056), (I-130)+(1.041)+(1.057), (I-130)+(1.041)+(1.058), (I-130)+(1.041)+(1.059), (I-130)+(1.041)+(1.060), (I-130)+(1.041)+(1.061), (I-130)+(1.041)+(1.062), (I-130)+(1.041)+(1.063), (I-130)+(1.041)+(1.064), (I-130)+(1.041)+(1.065), (I-130)+(1.041)+(1.066), (I-130)+(1.041)+(1.067), (I-130)+(1.041)+(1.068), (I-130)+(1.041)+(1.069), (I-130)+(1.041)+(1.070), (I-130)+(1.041)+(1.071), (I-130)+(1.041)+(1.072), (I-130)+(1.041)+(1.073), (I-130)+(1.041)+(1.074), (I-130)+(1.041)+(1.075), (I-130)+(1.041)+(1.076), (I-130)+(1.041)+(1.077), (I-130)+(1.041)+(1.078), (I-130)+(1.041)+(1.079), (I-130)+(1.041)+(1.080), (I-130)+(1.041)+(1.081),
(I-130)+(1.041)+(1.082), (I-130)+(1.041)+(1.083),
(I-130)+(1.041)+(1.084), (I-130)+(1.041)+(1.085),
(I-130)+(1.041)+(1.086), (I-130)+(1.041)+(1.087),
(I-130)+(1.041)+(1.088), (I-130)+(1.041)+(1.089),
(I-130)+(1.041)+(1.090), (I-130)+(1.041)+(1.091),
(I-130)+(1.041)+(1.092), (I-130)+(1.041)+(2.001),
(I-130)+(1.041)+(2.002), (I-130)+(1.041)+(2.003),
(I-130)+(1.041)+(2.004), (I-130)+(1.041)+(2.005),
(I-130)+(1.041)+(2.006), (I-130)+(1.041)+(2.007),
(I-130)+(1.041)+(2.008), (I-130)+(1.041)+(2.009),
(I-130)+(1.041)+(2.010), (I-130)+(1.041)+(2.011),
(I-130)+(1.041)+(2.012), (I-130)+(1.041)+(2.013),
(I-130)+(1.041)+(2.014), (I-130)+(1.041)+(2.015),
(I-130)+(1.041)+(2.016), (I-130)+(1.041)+(2.017),
(I-130)+(1.041)+(2.018), (I-130)+(1.041)+(2.019),
(I-130)+(1.041)+(2.020), (I-130)+(1.041)+(2.021),
(I-130)+(1.041)+(2.022), (I-130)+(1.041)+(2.023),
(I-130)+(1.041)+(2.024), (I-130)+(1.041)+(2.025),
(I-130)+(1.041)+(2.026), (I-130)+(1.041)+(2.027),
(I-130)+(1.041)+(2.028), (I-130)+(1.041)+(2.029),
(I-130)+(1.041)+(2.030), (I-130)+(1.041)+(2.031),
(I-130)+(1.041)+(2.032), (I-130)+(1.041)+(2.033),
(I-130)+(1.041)+(2.034), (I-130)+(1.041)+(2.035),
(I-130)+(1.041)+(2.036), (I-130)+(1.041)+(2.037),
(I-130)+(1.041)+(2.038), (I-130)+(1.041)+(2.039),
(I-130)+(1.041)+(2.040), (I-130)+(1.041)+(2.041),
(I-130)+(1.041)+(2.042), (I-130)+(1.041)+(2.043),
(I-130)+(1.041)+(2.044), (I-130)+(1.041)+(2.045),
(I-130)+(1.041)+(2.046), (I-130)+(1.041)+(2.047),
(I-130)+(1.041)+(2.048), (I-130)+(1.041)+(2.049),
(I-130)+(1.041)+(2.050), (I-130)+(1.041)+(2.051),
(I-130)+(1.041)+(2.052), (I-130)+(1.041)+(2.053),
(I-130)+(1.041)+(2.054), (I-130)+(1.041)+(2.055),
(I-130)+(1.041)+(2.056), (I-130)+(1.041)+(2.057),
(I-130)+(1.041)+(2.058), (I-130)+(1.041)+(2.059),
(I-130)+(1.041)+(3.001), (I-130)+(1.041)+(3.002),
(I-130)+(1.041)+(3.003), (I-130)+(1.041)+(3.004),
(I-130)+(1.041)+(3.005), (I-130)+(1.041)+(3.006),
(I-130)+(1.041)+(3.007), (I-130)+(1.041)+(3.008),
(I-130)+(1.041)+(3.009), (I-130)+(1.041)+(3.010),
(I-130)+(1.041)+(3.011), (I-130)+(1.041)+(3.012),
(I-130)+(1.041)+(3.013), (I-130)+(1.041)+(3.014),
(I-130)+(1.041)+(3.015), (I-130)+(1.041)+(3.016),
(I-130)+(1.041)+(3.017), (I-130)+(1.041)+(3.018),
(I-130)+(1.041)+(3.019), (I-130)+(1.041)+(3.020),
(I-130)+(1.041)+(3.021), (I-130)+(1.041)+(3.022),
(I-130)+(1.041)+(3.023), (I-130)+(1.041)+(3.024),
(I-130)+(1.041)+(3.025), (I-130)+(1.041)+(3.026),
(I-130)+(1.041)+(3.027), (I-130)+(1.041)+(3.028),
(I-130)+(1.041)+(3.029), (I-130)+(1.041)+(3.030),
(I-130)+(1.041)+(3.031), (I-130)+(1.041)+(5.001),
(I-130)+(1.041)+(5.002), (I-130)+(1.041)+(5.003),
(I-130)+(1.041)+(5.004), (I-130)+(1.041)+(5.005),
(I-130)+(1.041)+(5.006), (I-130)+(1.041)+(5.007),
(I-130)+(1.041)+(5.008), (I-130)+(1.041)+(5.009),
(I-130)+(1.041)+(5.010), (I-130)+(1.041)+(5.011),
(I-130)+(1.041)+(5.012), (I-130)+(1.041)+(5.013),
(I-130)+(1.041)+(5.014), (I-130)+(1.041)+(5.015),
(I-130)+(1.041)+(5.016), (I-130)+(1.041)+(5.017),
(I-130)+(1.041)+(5.018), (I-130)+(1.041)+(5.019),
(I-130)+(1.041)+(5.020), (I-130)+(1.041)+(5.021),
(I-130)+(1.041)+(5.022), (I-130)+(1.041)+(5.023),
(I-130)+(1.041)+(6.001), (I-130)+(1.041)+(6.002),
(I-130)+(1.041)+(6.003), (I-130)+(1.041)+(6.004),
(I-130)+(1.041)+(7.001), (I-130)+(1.041)+(7.002),
(I-130)+(1.041)+(7.003), (I-130)+(1.041)+(7.004),
(I-130)+(1.041)+(7.005), (I-130)+(1.041)+(7.006),
(I-130)+(1.041)+(9.001), (I-130)+(1.041)+(9.002),
(I-130)+(1.041)+(9.003), (I-130)+(1.041)+(9.004),
(I-130)+(1.041)+(9.005), (I-130)+(1.041)+(9.006),
(I-130)+(1.041)+(9.007), (I-130)+(1.041)+(9.008),
(I-130)+(1.041)+(9.009), (I-130)+(1.041)+(14.001),
(I-130)+(1.041)+(14.002), (I-130)+(1.041)+(15.008),
(I-130)+(1.041)+(15.011), (I-130)+(1.041)+(15.012),
(I-130)+(1.041)+(15.016), (I-130)+(1.041)+(15.025),
(I-130)+(1.041)+(15.027), (I-130)+(1.041)+(15.047),
(I-130)+(1.041)+(15.063), (I-130)+(1.041)+(15.064),
(I-130)+(1.041)+(16.001), (I-130)+(1.041)+(16.002),
(I-130)+(1.041)+(16.003), (I-130)+(1.041)+(16.004),
(I-130)+(1.041)+(16.005), (I-130)+(1.041)+(16.006),
(I-130)+(1.041)+(16.007), (I-130)+(1.041)+(16.008),
(I-130)+(1.041)+(17.001), (I-130)+(1.041)+(17.002),
(I-130)+(1.041)+(17.003), (I-130)+(1.041)+(17.004),
(I-130)+(1.041)+(17.005), (I-130)+(1.041)+(17.006),
(I-130)+(1.041)+(17.007), (I-130)+(1.041)+(17.008),
(I-130)+(1.041)+(17.009), (I-130)+(1.041)+(17.010),
(I-130)+(1.041)+(17.011), (I-130)+(1.041)+(17.012),
(I-130)+(1.041)+(18.001),
(I-130)+(1.042)+(1.043), (I-130)+(1.042)+(1.044),
(I-130)+(1.042)+(1.045), (I-130)+(1.042)+(1.046),
(I-130)+(1.042)+(1.047), (I-130)+(1.042)+(1.048),
(I-130)+(1.042)+(1.049), (I-130)+(1.042)+(1.050),
(I-130)+(1.042)+(1.051), (I-130)+(1.042)+(1.052),
(I-130)+(1.042)+(1.053), (I-130)+(1.042)+(1.054),
(I-130)+(1.042)+(1.055), (I-130)+(1.042)+(1.056),
(I-130)+(1.042)+(1.057), (I-130)+(1.042)+(1.058),
(I-130)+(1.042)+(1.059), (I-130)+(1.042)+(1.060),
(I-130)+(1.042)+(1.061), (I-130)+(1.042)+(1.062),
(I-130)+(1.042)+(1.063), (I-130)+(1.042)+(1.064),
(I-130)+(1.042)+(1.065), (I-130)+(1.042)+(1.066),
(I-130)+(1.042)+(1.067), (I-130)+(1.042)+(1.068),
(I-130)+(1.042)+(1.069), (I-130)+(1.042)+(1.070),
(I-130)+(1.042)+(1.071), (I-130)+(1.042)+(1.072),
(I-130)+(1.042)+(1.073), (I-130)+(1.042)+(1.074),
(I-130)+(1.042)+(1.075), (I-130)+(1.042)+(1.076),
(I-130)+(1.042)+(1.077), (I-130)+(1.042)+(1.078),
(I-130)+(1.042)+(1.079), (I-130)+(1.042)+(1.080),
(I-130)+(1.042)+(1.081), (I-130)+(1.042)+(1.082),
(I-130)+(1.042)+(1.083), (I-130)+(1.042)+(1.084),
(I-130)+(1.042)+(1.085), (I-130)+(1.042)+(1.086),
(I-130)+(1.042)+(1.087), (I-130)+(1.042)+(1.088),
(I-130)+(1.042)+(1.089), (I-130)+(1.042)+(1.090),
(I-130)+(1.042)+(1.091), (I-130)+(1.042)+(1.092),
(I-130)+(1.042)+(2.001), (I-130)+(1.042)+(2.002),
(I-130)+(1.042)+(2.003), (I-130)+(1.042)+(2.004),
(I-130)+(1.042)+(2.005), (I-130)+(1.042)+(2.006),
(I-130)+(1.042)+(2.007), (I-130)+(1.042)+(2.008),
(I-130)+(1.042)+(2.009), (I-130)+(1.042)+(2.010),
(I-130)+(1.042)+(2.011), (I-130)+(1.042)+(2.012),
(I-130)+(1.042)+(2.013), (I-130)+(1.042)+(2.014),
(I-130)+(1.042)+(2.015), (I-130)+(1.042)+(2.016),
(I-130)+(1.042)+(2.017), (I-130)+(1.042)+(2.018),
(I-130)+(1.042)+(2.019), (I-130)+(1.042)+(2.020),
(I-130)+(1.042)+(2.021), (I-130)+(1.042)+(2.022),
(I-130)+(1.042)+(2.023), (I-130)+(1.042)+(2.024),
(I-130)+(1.042)+(2.025), (I-130)+(1.042)+(2.026),
(I-130)+(1.042)+(2.027), (I-130)+(1.042)+(2.028),
(I-130)+(1.042)+(2.029), (I-130)+(1.042)+(2.030),
(I-130)+(1.042)+(2.031), (I-130)+(1.042)+(2.032),
(I-130)+(1.042)+(2.033), (I-130)+(1.042)+(2.034),
(I-130)+(1.042)+(2.035), (I-130)+(1.042)+(2.036),
(I-130)+(1.042)+(2.037), (I-130)+(1.042)+(2.038),
(I-130)+(1.042)+(2.039), (I-130)+(1.042)+(2.040), (I-130)+(1.042)+(2.041), (I-130)+(1.042)+(2.042), (I-130)+(1.042)+(2.043), (I-130)+(1.042)+(2.044), (I-130)+(1.042)+(2.045), (I-130)+(1.042)+(2.046), (I-130)+(1.042)+(2.047), (I-130)+(1.042)+(2.048), (I-130)+(1.042)+(2.049), (I-130)+(1.042)+(2.050), (I-130)+(1.042)+(2.051), (I-130)+(1.042)+(2.052), (I-130)+(1.042)+(2.053), (I-130)+(1.042)+(2.054), (I-130)+(1.042)+(2.055), (I-130)+(1.042)+(2.056), (I-130)+(1.042)+(2.057), (I-130)+(1.042)+(2.058), (I-130)+(1.042)+(2.059), (I-130)+(1.042)+(3.001), (I-130)+(1.042)+(3.002), (I-130)+(1.042)+(3.003), (I-130)+(1.042)+(3.004), (I-130)+(1.042)+(3.005), (I-130)+(1.042)+(3.006), (I-130)+(1.042)+(3.007), (I-130)+(1.042)+(3.008), (I-130)+(1.042)+(3.009), (I-130)+(1.042)+(3.010), (I-130)+(1.042)+(3.011), (I-130)+(1.042)+(3.012), (I-130)+(1.042)+(3.013), (I-130)+(1.042)+(3.014), (I-130)+(1.042)+(3.015), (I-130)+(1.042)+(3.016), (I-130)+(1.042)+(3.017), (I-130)+(1.042)+(3.018), (I-130)+(1.042)+(3.019), (I-130)+(1.042)+(3.020), (I-130)+(1.042)+(3.021), (I-130)+(1.042)+(3.022), (I-130)+(1.042)+(3.023), (I-130)+(1.042)+(3.024), (I-130)+(1.042)+(3.025), (I-130)+(1.042)+(3.026), (I-130)+(1.042)+(3.027), (I-130)+(1.042)+(3.028), (I-130)+(1.042)+(3.029), (I-130)+(1.042)+(3.030), (I-130)+(1.042)+(3.031), (I-130)+(1.042)+(5.001), (I-130)+(1.042)+(5.002), (I-130)+(1.042)+(5.003), (I-130)+(1.042)+(5.004), (I-130)+(1.042)+(5.005), (I-130)+(1.042)+(5.006), (I-130)+(1.042)+(5.007), (I-130)+(1.042)+(5.008), (I-130)+(1.042)+(5.009), (I-130)+(1.042)+(5.010), (I-130)+(1.042)+(5.011), (I-130)+(1.042)+(5.012), (I-130)+(1.042)+(5.013), (I-130)+(1.042)+(5.014), (I-130)+(1.042)+(5.015), (I-130)+(1.042)+(5.016), (I-130)+(1.042)+(5.017), (I-130)+(1.042)+(5.018), (I-130)+(1.042)+(5.019), (I-130)+(1.042)+(5.020), (I-130)+(1.042)+(5.021), (I-130)+(1.042)+(5.022), (I-130)+(1.042)+(5.023), (I-130)+(1.042)+(6.001), (I-130)+(1.042)+(6.002), (I-130)+(1.042)+(6.003), (I-130)+(1.042)+(6.004), (I-130)+(1.042)+(7.001), (I-130)+(1.042)+(7.002), (I-130)+(1.042)+(7.003), (I-130)+(1.042)+(7.004), (I-130)+(1.042)+(7.005), (I-130)+(1.042)+(7.006), (I-130)+(1.042)+(9.001), (I-130)+(1.042)+(9.002), (I-130)+(1.042)+(9.003), (I-130)+(1.042)+(9.004), (I-130)+(1.042)+(9.005), (I-130)+(1.042)+(9.006), (I-130)+(1.042)+(9.007), (I-130)+(1.042)+(9.008), (I-130)+(1.042)+(9.009), (I-130)+(1.042)+(14.001), (I-130)+(1.042)+(14.002), (I-130)+(1.042)+(15.008), (I-130)+(1.042)+(15.011), (I-130)+(1.042)+(15.012), (I-130)+(1.042)+(15.016), (I-130)+(1.042)+(15.025), (I-130)+(1.042)+(15.027), (I-130)+(1.042)+(15.047), (I-130)+(1.042)+(15.063), (I-130)+(1.042)+(15.064), (I-130)+(1.042)+(16.001), (I-130)+(1.042)+(16.002), (I-130)+(1.042)+(16.003), (I-130)+(1.042)+(16.004), (I-130)+(1.042)+(16.005), (I-130)+(1.042)+(16.006), (I-130)+(1.042)+(16.007), (I-130)+(1.042)+(16.008), (I-130)+(1.042)+(17.001), (I-130)+(1.042)+(17.002), (I-130)+(1.042)+(17.003), (I-130)+(1.042)+(17.004), (I-130)+(1.042)+(17.005), (I-130)+(1.042)+(17.006), (I-130)+(1.042)+(17.007), (I-130)+(1.042)+(17.008), (I-130)+(1.042)+(17.009), (I-130)+(1.042)+(17.010), (I-130)+(1.042)+(17.011), (I-130)+(1.042)+(17.012), (I-130)+(1.042)+(18.001), (I-130)+(1.043)+(1.044), (I-130)+(1.043)+(1.045), (I-130)+(1.043)+(1.046), (I-130)+(1.043)+(1.047), (I-130)+(1.043)+(1.048), (I-130)+(1.043)+(1.049), (I-130)+(1.043)+(1.050), (I-130)+(1.043)+(1.051), (I-130)+(1.043)+(1.052), (I-130)+(1.043)+(1.053), (I-130)+(1.043)+(1.054), (I-130)+(1.043)+(1.055), (I-130)+(1.043)+(1.056), (I-130)+(1.043)+(1.057), (I-130)+(1.043)+(1.058), (I-130)+(1.043)+(1.059), (I-130)+(1.043)+(1.060), (I-130)+(1.043)+(1.061), (I-130)+(1.043)+(1.062), (I-130)+(1.043)+(1.063), (I-130)+(1.043)+(1.064), (I-130)+(1.043)+(1.065), (I-130)+(1.043)+(1.066), (I-130)+(1.043)+(1.067), (I-130)+(1.043)+(1.068), (I-130)+(1.043)+(1.069), (I-130)+(1.043)+(1.070), (I-130)+(1.043)+(1.071), (I-130)+(1.043)+(1.072), (I-130)+(1.043)+(1.073), (I-130)+(1.043)+(1.074), (I-130)+(1.043)+(1.075), (I-130)+(1.043)+(1.076), (I-130)+(1.043)+(1.077), (I-130)+(1.043)+(1.078), (I-130)+(1.043)+(1.079), (I-130)+(1.043)+(1.080), (I-130)+(1.043)+(1.081), (I-130)+(1.043)+(1.082), (I-130)+(1.043)+(1.083), (I-130)+(1.043)+(1.084), (I-130)+(1.043)+(1.085), (I-130)+(1.043)+(1.086), (I-130)+(1.043)+(1.087), (I-130)+(1.043)+(1.088), (I-130)+(1.043)+(1.089), (I-130)+(1.043)+(1.090), (I-130)+(1.043)+(1.091), (I-130)+(1.043)+(1.092), (I-130)+(1.043)+(2.001), (I-130)+(1.043)+(2.002), (I-130)+(1.043)+(2.003), (I-130)+(1.043)+(2.004), (I-130)+(1.043)+(2.005), (I-130)+(1.043)+(2.006), (I-130)+(1.043)+(2.007), (I-130)+(1.043)+(2.008), (I-130)+(1.043)+(2.009), (I-130)+(1.043)+(2.010), (I-130)+(1.043)+(2.011), (I-130)+(1.043)+(2.012), (I-130)+(1.043)+(2.013), (I-130)+(1.043)+(2.014), (I-130)+(1.043)+(2.015), (I-130)+(1.043)+(2.016), (I-130)+(1.043)+(2.017), (I-130)+(1.043)+(2.018), (I-130)+(1.043)+(2.019), (I-130)+(1.043)+(2.020), (I-130)+(1.043)+(2.021), (I-130)+(1.043)+(2.022), (I-130)+(1.043)+(2.023), (I-130)+(1.043)+(2.024), (I-130)+(1.043)+(2.025), (I-130)+(1.043)+(2.026), (I-130)+(1.043)+(2.027), (I-130)+(1.043)+(2.028), (I-130)+(1.043)+(2.029), (I-130)+(1.043)+(2.030), (I-130)+(1.043)+(2.031), (I-130)+(1.043)+(2.032), (I-130)+(1.043)+(2.033), (I-130)+(1.043)+(2.034), (I-130)+(1.043)+(2.035), (I-130)+(1.043)+(2.036), (I-130)+(1.043)+(2.037), (I-130)+(1.043)+(2.038), (I-130)+(1.043)+(2.039), (I-130)+(1.043)+(2.040), (I-130)+(1.043)+(2.041), (I-130)+(1.043)+(2.042), (I-130)+(1.043)+(2.043), (I-130)+(1.043)+(2.044), (I-130)+(1.043)+(2.045), (I-130)+(1.043)+(2.046), (I-130)+(1.043)+(2.047), (I-130)+(1.043)+(2.048), (I-130)+(1.043)+(2.049), (I-130)+(1.043)+(2.050), (I-130)+(1.043)+(2.051), (I-130)+(1.043)+(2.052), (I-130)+(1.043)+(2.053), (I-130)+(1.043)+(2.054), (I-130)+(1.043)+(2.055), (I-130)+(1.043)+(2.056), (I-130)+(1.043)+(2.057), (I-130)+(1.043)+(2.058), (I-130)+(1.043)+(2.059), (I-130)+(1.043)+(3.001), (I-130)+(1.043)+(3.002), (I-130)+(1.043)+(3.003), (I-130)+(1.043)+(3.004), (I-130)+(1.043)+(3.005), (I-130)+(1.043)+(3.006), (I-130)+(1.043)+(3.007), (I-130)+(1.043)+(3.008), (I-130)+(1.043)+(3.009), (I-130)+(1.043)+(3.010), (I-130)+(1.043)+(3.011), (I-130)+(1.043)+(3.012), (I-130)+(1.043)+(3.013), (I-130)+(1.043)+(3.014), (I-130)+(1.043)+(3.015), (I-130)+(1.043)+(3.016), (I-130)+(1.043)+(3.017), (I-130)+(1.043)+(3.018), (I-130)+(1.043)+(3.019), (I-130)+(1.043)+(3.020), (I-130)+(1.043)+(3.021), (I-130)+(1.043)+(3.022), (I-130)+(1.043)+(3.023), (I-130)+(1.043)+(3.024), (I-130)+(1.043)+(3.025), (I-130)+(1.043)+(3.026), (I-130)+(1.043)+(3.027), (I-130)+(1.043)+(3.028), (I-130)+(1.043)+(3.029), (I-130)+(1.043)+(3.030), (I-130)+(1.043)+(3.031), (I-130)+(1.043)+(5.001), (I-130)+(1.043)+(5.002), (I-130)+(1.043)+(5.003), (I-130)+(1.043)+(5.004), (I-130)+(1.043)+(5.005), (I-130)+(1.043)+(5.006), (I-130)+(1.043)+(5.007), (I-130)+(1.043)+(5.008), (I-130)+(1.043)+(5.009), (I-130)+(1.043)+(5.010), (I-130)+(1.043)+(5.011), (I-130)+(1.043)+(5.012), (I-130)+(1.043)+(5.013), (I-130)+(1.043)+(5.014), (I-130)+(1.043)+(5.015), (I-130)+(1.043)+(5.016), (I-130)+(1.043)+(5.017), (I-130)+(1.043)+(5.018), (I-130)+(1.043)+(5.019), (I-130)+(1.043)+(5.020), (I-130)+(1.043)+(5.021), (I-130)+(1.043)+(5.022), (I-130)+(1.043)+(5.023), (I-130)+(1.043)+(6.001), (I-130)+(1.043)+(6.002), (I-130)+(1.043)+(6.003), (I-130)+(1.043)+(6.004), (I-130)+(1.043)+(7.001), (I-130)+(1.043)+(7.002), (I-130)+(1.043)+(7.003), (I-130)+(1.043)+(7.004), (I-130)+(1.043)+(7.005), (I-130)+(1.043)+(7.006), (I-130)+(1.043)+(9.001), (I-130)+(1.043)+(9.002), (I-130)+(1.043)+(9.003), (I-130)+(1.043)+(9.004), (I-130)+(1.043)+(9.005), (I-130)+(1.043)+(9.006), (I-130)+(1.043)+(9.007), (I-130)+(1.043)+(9.008), (I-130)+(1.043)+(9.009), (I-130)+(1.043)+(14.001), (I-130)+(1.043)+(14.002), (I-130)+(1.043)+(15.008), (I-130)+(1.043)+(15.011), (I-130)+(1.043)+(15.012), (I-130)+(1.043)+(15.016), (I-130)+(1.043)+(15.025), (I-130)+(1.043)+(15.027), (I-130)+(1.043)+(15.047), (I-130)+(1.043)+(15.063), (I-130)+(1.043)+(15.064), (I-130)+(1.043)+(16.001), (I-130)+(1.043)+(16.002), (I-130)+(1.043)+(16.003), (I-130)+(1.043)+(16.004), (I-130)+(1.043)+(16.005), (I-130)+(1.043)+(16.006), (I-130)+(1.043)+(16.007), (I-130)+(1.043)+(16.008), (I-130)+(1.043)+(17.001), (I-130)+(1.043)+(17.002), (I-130)+(1.043)+(17.003), (I-130)+(1.043)+(17.004), (I-130)+(1.043)+(17.005), (I-130)+(1.043)+(17.006), (I-130)+(1.043)+(17.007), (I-130)+(1.043)+(17.008), (I-130)+(1.043)+(17.009), (I-130)+(1.043)+(17.010), (I-130)+(1.043)+(17.011), (I-130)+(1.043)+(17.012), (I-130)+(1.043)+(18.001), (I-130)+(1.044)+(1.045), (I-130)+(1.044)+(1.046), (I-130)+(1.044)+(1.047), (I-130)+(1.044)+(1.048), (I-130)+(1.044)+(1.049), (I-130)+(1.044)+(1.050), (I-130)+(1.044)+(1.051), (I-130)+(1.044)+(1.052), (I-130)+(1.044)+(1.053), (I-130)+(1.044)+(1.054), (I-130)+(1.044)+(1.055), (I-130)+(1.044)+(1.056), (I-130)+(1.044)+(1.057), (I-130)+(1.044)+(1.058), (I-130)+(1.044)+(1.059), (I-130)+(1.044)+(1.060), (I-130)+(1.044)+(1.061), (I-130)+(1.044)+(1.062), (I-130)+(1.044)+(1.063), (I-130)+(1.044)+(1.064), (I-130)+(1.044)+(1.065), (I-130)+(1.044)+(1.066), (I-130)+(1.044)+(1.067), (I-130)+(1.044)+(1.068), (I-130)+(1.044)+(1.069), (I-130)+(1.044)+(1.070), (I-130)+(1.044)+(1.071), (I-130)+(1.044)+(1.072), (I-130)+(1.044)+(1.073), (I-130)+(1.044)+(1.074), (I-130)+(1.044)+(1.075), (I-130)+(1.044)+(1.076), (I-130)+(1.044)+(1.077), (I-130)+(1.044)+(1.078), (I-130)+(1.044)+(1.079), (I-130)+(1.044)+(1.080), (I-130)+(1.044)+(1.081), (I-130)+(1.044)+(1.082), (I-130)+(1.044)+(1.083), (I-130)+(1.044)+(1.084), (I-130)+(1.044)+(1.085), (I-130)+(1.044)+(1.086), (I-130)+(1.044)+(1.087), (I-130)+(1.044)+(1.088), (I-130)+(1.044)+(1.089), (I-130)+(1.044)+(1.090), (I-130)+(1.044)+(1.091), (I-130)+(1.044)+(1.092), (I-130)+(1.044)+(2.001), (I-130)+(1.044)+(2.002), (I-130)+(1.044)+(2.003), (I-130)+(1.044)+(2.004), (I-130)+(1.044)+(2.005), (I-130)+(1.044)+(2.006), (I-130)+(1.044)+(2.007), (I-130)+(1.044)+(2.008), (I-130)+(1.044)+(2.009), (I-130)+(1.044)+(2.010), (I-130)+(1.044)+(2.011), (I-130)+(1.044)+(2.012), (I-130)+(1.044)+(2.013), (I-130)+(1.044)+(2.014), (I-130)+(1.044)+(2.015), (I-130)+(1.044)+(2.016), (I-130)+(1.044)+(2.017), (I-130)+(1.044)+(2.018), (I-130)+(1.044)+(2.019), (I-130)+(1.044)+(2.020), (I-130)+(1.044)+(2.021), (I-130)+(1.044)+(2.022), (I-130)+(1.044)+(2.023), (I-130)+(1.044)+(2.024), (I-130)+(1.044)+(2.025), (I-130)+(1.044)+(2.026), (I-130)+(1.044)+(2.027), (I-130)+(1.044)+(2.028), (I-130)+(1.044)+(2.029), (I-130)+(1.044)+(2.030), (I-130)+(1.044)+(2.031), (I-130)+(1.044)+(2.032), (I-130)+(1.044)+(2.033), (I-130)+(1.044)+(2.034), (I-130)+(1.044)+(2.035), (I-130)+(1.044)+(2.036), (I-130)+(1.044)+(2.037), (I-130)+(1.044)+(2.038), (I-130)+(1.044)+(2.039), (I-130)+(1.044)+(2.040), (I-130)+(1.044)+(2.041), (I-130)+(1.044)+(2.042), (I-130)+(1.044)+(2.043), (I-130)+(1.044)+(2.044), (I-130)+(1.044)+(2.045), (I-130)+(1.044)+(2.046), (I-130)+(1.044)+(2.047), (I-130)+(1.044)+(2.048), (I-130)+(1.044)+(2.049), (I-130)+(1.044)+(2.050), (I-130)+(1.044)+(2.051), (I-130)+(1.044)+(2.052), (I-130)+(1.044)+(2.053), (I-130)+(1.044)+(2.054), (I-130)+(1.044)+(2.055), (I-130)+(1.044)+(2.056), (I-130)+(1.044)+(2.057), (I-130)+(1.044)+(2.058), (I-130)+(1.044)+(2.059), (I-130)+(1.044)+(3.001), (I-130)+(1.044)+(3.002), (I-130)+(1.044)+(3.003), (I-130)+(1.044)+(3.004), (I-130)+(1.044)+(3.005), (I-130)+(1.044)+(3.006), (I-130)+(1.044)+(3.007), (I-130)+(1.044)+(3.008), (I-130)+(1.044)+(3.009), (I-130)+(1.044)+(3.010), (I-130)+(1.044)+(3.011), (I-130)+(1.044)+(3.012), (I-130)+(1.044)+(3.013), (I-130)+(1.044)+(3.014), (I-130)+(1.044)+(3.015), (I-130)+(1.044)+(3.016), (I-130)+(1.044)+(3.017), (I-130)+(1.044)+(3.018), (I-130)+(1.044)+(3.019), (I-130)+(1.044)+(3.020), (I-130)+(1.044)+(3.021), (I-130)+(1.044)+(3.022), (I-130)+(1.044)+(3.023), (I-130)+(1.044)+(3.024), (I-130)+(1.044)+(3.025), (I-130)+(1.044)+(3.026), (I-130)+(1.044)+(3.027), (I-130)+(1.044)+(3.028), (I-130)+(1.044)+(3.029), (I-130)+(1.044)+(3.030), (I-130)+(1.044)+(3.031), (I-130)+(1.044)+(5.001), (I-130)+(1.044)+(5.002), (I-130)+(1.044)+(5.003), (I-130)+(1.044)+(5.004), (I-130)+(1.044)+(5.005), (I-130)+(1.044)+(5.006), (I-130)+(1.044)+(5.007), (I-130)+(1.044)+(5.008), (I-130)+(1.044)+(5.009), (I-130)+(1.044)+(5.010), (I-130)+(1.044)+(5.011), (I-130)+(1.044)+(5.012), (I-130)+(1.044)+(5.013), (I-130)+(1.044)+(5.014), (I-130)+(1.044)+(5.015), (I-130)+(1.044)+(5.016), (I-130)+(1.044)+(5.017), (I-130)+(1.044)+(5.018), (I-130)+(1.044)+(5.019), (I-130)+(1.044)+(5.020), (I-130)+(1.044)+(5.021), (I-130)+(1.044)+(5.022), (I-130)+(1.044)+(5.023), (I-130)+(1.044)+(6.001), (I-130)+(1.044)+(6.002), (I-130)+(1.044)+(6.003), (I-130)+(1.044)+(6.004), (I-130)+(1.044)+(7.001), (I-130)+(1.044)+(7.002), (I-130)+(1.044)+(7.003), (I-130)+(1.044)+(7.004), (I-130)+(1.044)+(7.005), (I-130)+(1.044)+(7.006), (I-130)+(1.044)+(9.001), (I-130)+(1.044)+(9.002), (I-130)+(1.044)+(9.003), (I-130)+(1.044)+(9.004), (I-130)+(1.044)+(9.005), (I-130)+(1.044)+(9.006), (I-130)+(1.044)+(9.007), (I-130)+(1.044)+(9.008), (I-130)+(1.044)+(9.009), (I-130)+(1.044)+(14.001), (I-130)+(1.044)+(14.002), (I-130)+(1.044)+(15.008), (I-130)+(1.044)+(15.011), (I-130)+(1.044)+(15.012), (I-130)+(1.044)+(15.016), (I-130)+(1.044)+(15.025), (I-130)+(1.044)+(15.027), (I-130)+(1.044)+(15.047), (I-130)+(1.044)+(15.063), (I-130)+(1.044)+(15.064), (I-130)+(1.044)+(16.001), (I-130)+(1.044)+(16.002), (I-130)+(1.044)+(16.003), (I-130)+(1.044)+(16.004), (I-130)+(1.044)+(16.005), (I-130)+(1.044)+(16.006), (I-130)+(1.044)+(16.007), (I-130)+(1.044)+(16.008), (I-130)+(1.044)+(17.001), (I-130)+(1.044)+(17.002), (I-130)+(1.044)+(17.003), (I-130)+(1.044)+(17.004), (I-130)+(1.044)+(17.005), (I-130)+(1.044)+(17.006), (I-130)+(1.044)+(17.007), (I-130)+(1.044)+(17.008), (I-130)+(1.044)+(17.009), (I-130)+(1.044)+(17.010), (I-130)+(1.044)+(17.011), (I-130)+(1.044)+(17.012), (I-130)+(1.044)+(18.001), (I-130)+(1.045)+(1.046), (I-130)+(1.045)+(1.047), (I-130)+(1.045)+(1.048), (I-130)+(1.045)+(1.049), (I-130)+(1.045)+(1.050), (I-130)+(1.045)+(1.051), (I-130)+(1.045)+(1.052), (I-130)+(1.045)+(1.053), (I-130)+(1.045)+(1.054), (I-130)+(1.045)+(1.055), (I-130)+(1.045)+(1.056), (I-130)+(1.045)+(1.057), (I-130)+(1.045)+(1.058), (I-130)+(1.045)+(1.059), (I-130)+(1.045)+(1.060), (I-130)+(1.045)+(1.061), (I-130)+(1.045)+(1.062), (I-130)+(1.045)+(1.063), (I-130)+(1.045)+(1.064), (I-130)+(1.045)+(1.065), (I-130)+(1.045)+(1.066), (I-130)+(1.045)+(1.067), (I-130)+(1.045)+(1.068), (I-130)+(1.045)+(1.069), (I-130)+(1.045)+(1.070), (I-130)+(1.045)+(1.071), (I-130)+(1.045)+(1.072), (I-130)+(1.045)+(1.073), (I-130)+(1.045)+(1.074), (I-130)+(1.045)+(1.075), (I-130)+(1.045)+(1.076), (I-130)+(1.045)+(1.077), (I-130)+(1.045)+(1.078), (I-130)+(1.045)+(1.079), (I-130)+(1.045)+(1.080), (I-130)+(1.045)+(1.081), (I-130)+(1.045)+(1.082), (I-130)+(1.045)+(1.083), (I-130)+(1.045)+(1.084), (I-130)+(1.045)+(1.085), (I-130)+(1.045)+(1.086), (I-130)+(1.045)+(1.087), (I-130)+(1.045)+(1.088), (I-130)+(1.045)+(1.089), (I-130)+(1.045)+(1.090), (I-130)+(1.045)+(1.091), (I-130)+(1.045)+(1.092), (I-130)+(1.045)+(2.001), (I-130)+(1.045)+(2.002), (I-130)+(1.045)+(2.003), (I-130)+(1.045)+(2.004), (I-130)+(1.045)+(2.005), (I-130)+(1.045)+(2.006), (I-130)+(1.045)+(2.007), (I-130)+(1.045)+(2.008), (I-130)+(1.045)+(2.009), (I-130)+(1.045)+(2.010), (I-130)+(1.045)+(2.011), (I-130)+(1.045)+(2.012), (I-130)+(1.045)+(2.013), (I-130)+(1.045)+(2.014), (I-130)+(1.045)+(2.015), (I-130)+(1.045)+(2.016), (I-130)+(1.045)+(2.017), (I-130)+(1.045)+(2.018), (I-130)+(1.045)+(2.019), (I-130)+(1.045)+(2.020), (I-130)+(1.045)+(2.021), (I-130)+(1.045)+(2.022), (I-130)+(1.045)+(2.023), (I-130)+(1.045)+(2.024), (I-130)+(1.045)+(2.025), (I-130)+(1.045)+(2.026), (I-130)+(1.045)+(2.027), (I-130)+(1.045)+(2.028), (I-130)+(1.045)+(2.029), (I-130)+(1.045)+(2.030), (I-130)+(1.045)+(2.031), (I-130)+(1.045)+(2.032), (I-130)+(1.045)+(2.033), (I-130)+(1.045)+(2.034), (I-130)+(1.045)+(2.035), (I-130)+(1.045)+(2.036), (I-130)+(1.045)+(2.037), (I-130)+(1.045)+(2.038), (I-130)+(1.045)+(2.039), (I-130)+(1.045)+(2.040), (I-130)+(1.045)+(2.041), (I-130)+(1.045)+(2.042), (I-130)+(1.045)+(2.043), (I-130)+(1.045)+(2.044), (I-130)+(1.045)+(2.045), (I-130)+(1.045)+(2.046), (I-130)+(1.045)+(2.047), (I-130)+(1.045)+(2.048), (I-130)+(1.045)+(2.049), (I-130)+(1.045)+(2.050), (I-130)+(1.045)+(2.051), (I-130)+(1.045)+(2.052), (I-130)+(1.045)+(2.053), (I-130)+(1.045)+(2.054), (I-130)+(1.045)+(2.055), (I-130)+(1.045)+(2.056), (I-130)+(1.045)+(2.057), (I-130)+(1.045)+(2.058), (I-130)+(1.045)+(2.059), (I-130)+(1.045)+(3.001), (I-130)+(1.045)+(3.002), (I-130)+(1.045)+(3.003), (I-130)+(1.045)+(3.004), (I-130)+(1.045)+(3.005), (I-130)+(1.045)+(3.006), (I-130)+(1.045)+(3.007), (I-130)+(1.045)+(3.008), (I-130)+(1.045)+(3.009), (I-130)+(1.045)+(3.010), (I-130)+(1.045)+(3.011), (I-130)+(1.045)+(3.012), (I-130)+(1.045)+(3.013), (I-130)+(1.045)+(3.014), (I-130)+(1.045)+(3.015), (I-130)+(1.045)+(3.016), (I-130)+(1.045)+(3.017), (I-130)+(1.045)+(3.018), (I-130)+(1.045)+(3.019), (I-130)+(1.045)+(3.020), (I-130)+(1.045)+(3.021), (I-130)+(1.045)+(3.022), (I-130)+(1.045)+(3.023), (I-130)+(1.045)+(3.024), (I-130)+(1.045)+(3.025), (I-130)+(1.045)+(3.026), (I-130)+(1.045)+(3.027), (I-130)+(1.045)+(3.028), (I-130)+(1.045)+(3.029), (I-130)+(1.045)+(3.030), (I-130)+(1.045)+(3.031), (I-130)+(1.045)+(5.001), (I-130)+(1.045)+(5.002), (I-130)+(1.045)+(5.003), (I-130)+(1.045)+(5.004), (I-130)+(1.045)+(5.005), (I-130)+(1.045)+(5.006), (I-130)+(1.045)+(5.007), (I-130)+(1.045)+(5.008), (I-130)+(1.045)+(5.009), (I-130)+(1.045)+(5.010), (I-130)+(1.045)+(5.011), (I-130)+(1.045)+(5.012), (I-130)+(1.045)+(5.013), (I-130)+(1.045)+(5.014), (I-130)+(1.045)+(5.015), (I-130)+(1.045)+(5.016), (I-130)+(1.045)+(5.017), (I-130)+(1.045)+(5.018), (I-130)+(1.045)+(5.019), (I-130)+(1.045)+(5.020), (I-130)+(1.045)+(5.021), (I-130)+(1.045)+(5.022), (I-130)+(1.045)+(5.023), (I-130)+(1.045)+(6.001), (I-130)+(1.045)+(6.002), (I-130)+(1.045)+(6.003), (I-130)+(1.045)+(6.004), (I-130)+(1.045)+(7.001), (I-130)+(1.045)+(7.002), (I-130)+(1.045)+(7.003), (I-130)+(1.045)+(7.004), (I-130)+(1.045)+(7.005), (I-130)+(1.045)+(7.006), (I-130)+(1.045)+(9.001), (I-130)+(1.045)+(9.002), (I-130)+(1.045)+(9.003), (I-130)+(1.045)+(9.004), (I-130)+(1.045)+(9.005), (I-130)+(1.045)+(9.006), (I-130)+(1.045)+(9.007), (I-130)+(1.045)+(9.008), (I-130)+(1.045)+(9.009), (I-130)+(1.045)+(14.001), (I-130)+(1.045)+(14.002), (I-130)+(1.045)+(15.008), (I-130)+(1.045)+(15.011), (I-130)+(1.045)+(15.012), (I-130)+(1.045)+(15.016), (I-130)+(1.045)+(15.025), (I-130)+(1.045)+(15.027), (I-130)+(1.045)+(15.047), (I-130)+(1.045)+(15.063), (I-130)+(1.045)+(15.064), (I-130)+(1.045)+(16.001), (I-130)+(1.045)+(16.002), (I-130)+(1.045)+(16.003), (I-130)+(1.045)+(16.004), (I-130)+(1.045)+(16.005), (I-130)+(1.045)+(16.006), (I-130)+(1.045)+(16.007), (I-130)+(1.045)+(16.008), (I-130)+(1.045)+(17.001), (I-130)+(1.045)+(17.002), (I-130)+(1.045)+(17.003), (I-130)+(1.045)+(17.004), (I-130)+(1.045)+(17.005), (I-130)+(1.045)+(17.006), (I-130)+(1.045)+(17.007), (I-130)+(1.045)+(17.008), (I-130)+(1.045)+(17.009), (I-130)+(1.045)+(17.010), (I-130)+(1.045)+(17.011), (I-130)+(1.045)+(17.012), (I-130)+(1.045)+(18.001), (I-130)+(1.046)+(1.047), (I-130)+(1.046)+(1.048), (I-130)+(1.046)+(1.049), (I-130)+(1.046)+(1.050), (I-130)+(1.046)+(1.051), (I-130)+(1.046)+(1.052), (I-130)+(1.046)+(1.053), (I-130)+(1.046)+(1.054), (I-130)+(1.046)+(1.055), (I-130)+(1.046)+(1.056), (I-130)+(1.046)+(1.057), (I-130)+(1.046)+(1.058), (I-130)+(1.046)+(1.059), (I-130)+(1.046)+(1.060), (I-130)+(1.046)+(1.061), (I-130)+(1.046)+(1.062), (I-130)+(1.046)+(1.063), (I-130)+(1.046)+(1.064), (I-130)+(1.046)+(1.065), (I-130)+(1.046)+(1.066), (I-130)+(1.046)+(1.067), (I-130)+(1.046)+(1.068), (I-130)+(1.046)+(1.069), (I-130)+(1.046)+(1.070), (I-130)+(1.046)+(1.071), (I-130)+(1.046)+(1.072), (I-130)+(1.046)+(1.073), (I-130)+(1.046)+(1.074), (I-130)+(1.046)+(1.075), (I-130)+(1.046)+(1.076), (I-130)+(1.046)+(1.077), (I-130)+(1.046)+(1.078), (I-130)+(1.046)+(1.079), (I-130)+(1.046)+(1.080), (I-130)+(1.046)+(1.081), (I-130)+(1.046)+(1.082), (I-130)+(1.046)+(1.083), (I-130)+(1.046)+(1.084), (I-130)+(1.046)+(1.085), (I-130)+(1.046)+(1.086), (I-130)+(1.046)+(1.087), (I-130)+(1.046)+(1.088), (I-130)+(1.046)+(1.089), (I-130)+(1.046)+(1.090), (I-130)+(1.046)+(1.091), (I-130)+(1.046)+(1.092), (I-130)+(1.046)+(2.001), (I-130)+(1.046)+(2.002), (I-130)+(1.046)+(2.003), (I-130)+(1.046)+(2.004), (I-130)+(1.046)+(2.005), (I-130)+(1.046)+(2.006), (I-130)+(1.046)+(2.007), (I-130)+(1.046)+(2.008), (I-130)+(1.046)+(2.009), (I-130)+(1.046)+(2.010), (I-130)+(1.046)+(2.011), (I-130)+(1.046)+(2.012), (I-130)+(1.046)+(2.013), (I-130)+(1.046)+(2.014), (I-130)+(1.046)+(2.015), (I-130)+(1.046)+(2.016), (I-130)+(1.046)+(2.017), (I-130)+(1.046)+(2.018), (I-130)+(1.046)+(2.019), (I-130)+(1.046)+(2.020), (I-130)+(1.046)+(2.021), (I-130)+(1.046)+(2.022), (I-130)+(1.046)+(2.023), (I-130)+(1.046)+(2.024), (I-130)+(1.046)+(2.025), (I-130)+(1.046)+(2.026), (I-130)+(1.046)+(2.027), (I-130)+(1.046)+(2.028), (I-130)+(1.046)+(2.029), (I-130)+(1.046)+(2.030), (I-130)+(1.046)+(2.031), (I-130)+(1.046)+(2.032), (I-130)+(1.046)+(2.033), (I-130)+(1.046)+(2.034), (I-130)+(1.046)+(2.035), (I-130)+(1.046)+(2.036), (I-130)+(1.046)+(2.037), (I-130)+(1.046)+(2.038), (I-130)+(1.046)+(2.039), (I-130)+(1.046)+(2.040), (I-130)+(1.046)+(2.041), (I-130)+(1.046)+(2.042), (I-130)+(1.046)+(2.043), (I-130)+(1.046)+(2.044), (I-130)+(1.046)+(2.045), (I-130)+(1.046)+(2.046), (I-130)+(1.046)+(2.047), (I-130)+(1.046)+(2.048), (I-130)+(1.046)+(2.049), (I-130)+(1.046)+(2.050), (I-130)+(1.046)+(2.051), (I-130)+(1.046)+(2.052), (I-130)+(1.046)+(2.053), (I-130)+(1.046)+(2.054), (I-130)+(1.046)+(2.055), (I-130)+(1.046)+(2.056), (I-130)+(1.046)+(2.057), (I-130)+(1.046)+(2.058), (I-130)+(1.046)+(2.059), (I-130)+(1.046)+(3.001), (I-130)+(1.046)+(3.002), (I-130)+(1.046)+(3.003), (I-130)+(1.046)+(3.004), (I-130)+(1.046)+(3.005), (I-130)+(1.046)+(3.006), (I-130)+(1.046)+(3.007), (I-130)+(1.046)+(3.008), (I-130)+(1.046)+(3.009), (I-130)+(1.046)+(3.010), (I-130)+(1.046)+(3.011), (I-130)+(1.046)+(3.012), (I-130)+(1.046)+(3.013), (I-130)+(1.046)+(3.014), (I-130)+(1.046)+(3.015), (I-130)+(1.046)+(3.016), (I-130)+(1.046)+(3.017), (I-130)+(1.046)+(3.018), (I-130)+(1.046)+(3.019), (I-130)+(1.046)+(3.020), (I-130)+(1.046)+(3.021), (I-130)+(1.046)+(3.022), (I-130)+(1.046)+(3.023), (I-130)+(1.046)+(3.024), (I-130)+(1.046)+(3.025), (I-130)+(1.046)+(3.026), (I-130)+(1.046)+(3.027), (I-130)+(1.046)+(3.028), (I-130)+(1.046)+(3.029), (I-130)+(1.046)+(3.030), (I-130)+(1.046)+(3.031), (I-130)+(1.046)+(5.001), (I-130)+(1.046)+(5.002), (I-130)+(1.046)+(5.003), (I-130)+(1.046)+(5.004), (I-130)+(1.046)+(5.005), (I-130)+(1.046)+(5.006), (I-130)+(1.046)+(5.007), (I-130)+(1.046)+(5.008), (I-130)+(1.046)+(5.009), (I-130)+(1.046)+(5.010), (I-130)+(1.046)+(5.011), (I-130)+(1.046)+(5.012), (I-130)+(1.046)+(5.013), (I-130)+(1.046)+(5.014), (I-130)+(1.046)+(5.015), (I-130)+(1.046)+(5.016), (I-130)+(1.046)+(5.017), (I-130)+(1.046)+(5.018), (I-130)+(1.046)+(5.019), (I-130)+(1.046)+(5.020), (I-130)+(1.046)+(5.021), (I-130)+(1.046)+(5.022), (I-130)+(1.046)+(5.023), (I-130)+(1.046)+(6.001), (I-130)+(1.046)+(6.002), (I-130)+(1.046)+(6.003), (I-130)+(1.046)+(6.004), (I-130)+(1.046)+(7.001), (I-130)+(1.046)+(7.002), (I-130)+(1.046)+(7.003), (I-130)+(1.046)+(7.004), (I-130)+(1.046)+(7.005), (I-130)+(1.046)+(7.006), (I-130)+(1.046)+(9.001), (I-130)+(1.046)+(9.002), (I-130)+(1.046)+(9.003), (I-130)+(1.046)+(9.004), (I-130)+(1.046)+(9.005), (I-130)+(1.046)+(9.006), (I-130)+(1.046)+(9.007), (I-130)+(1.046)+(9.008), (I-130)+(1.046)+(9.009), (I-130)+(1.046)+(14.001), (I-130)+(1.046)+(14.002), (I-130)+(1.046)+(15.008), (I-130)+(1.046)+(15.011), (I-130)+(1.046)+(15.012), (I-130)+(1.046)+(15.016), (I-130)+(1.046)+(15.025), (I-130)+(1.046)+(15.027), (I-130)+(1.046)+(15.047), (I-130)+(1.046)+(15.063), (I-130)+(1.046)+(15.064), (I-130)+(1.046)+(16.001), (I-130)+(1.046)+(16.002), (I-130)+(1.046)+(16.003), (I-130)+(1.046)+(16.004), (I-130)+(1.046)+(16.005), (I-130)+(1.046)+(16.006), (I-130)+(1.046)+(16.007), (I-130)+(1.046)+(16.008), (I-130)+(1.046)+(17.001), (I-130)+(1.046)+(17.002), (I-130)+(1.046)+(17.003), (I-130)+(1.046)+(17.004), (I-130)+(1.046)+(17.005), (I-130)+(1.046)+(17.006), (I-130)+(1.046)+(17.007), (I-130)+(1.046)+(17.008), (I-130)+(1.046)+(17.009), (I-130)+(1.046)+(17.010), (I-130)+(1.046)+(17.011), (I-130)+(1.046)+(17.012), (I-130)+(1.046)+(18.001), (I-130)+(1.047)+(1.048), (I-130)+(1.047)+(1.049), (I-130)+(1.047)+(1.050), (I-130)+(1.047)+(1.051), (I-130)+(1.047)+(1.052), (I-130)+(1.047)+(1.053), (I-130)+(1.047)+(1.054), (I-130)+(1.047)+(1.055), (I-130)+(1.047)+(1.056), (I-130)+(1.047)+(1.057), (I-130)+(1.047)+(1.058), (I-130)+(1.047)+(1.059), (I-130)+(1.047)+(1.060), (I-130)+(1.047)+(1.061), (I-130)+(1.047)+(1.062), (I-130)+(1.047)+(1.063), (I-130)+(1.047)+(1.064), (I-130)+(1.047)+(1.065), (I-130)+(1.047)+(1.066), (I-130)+(1.047)+(1.067), (I-130)+(1.047)+(1.068), (I-130)+(1.047)+(1.069), (I-130)+(1.047)+(1.070), (I-130)+(1.047)+(1.071), (I-130)+(1.047)+(1.072), (I-130)+(1.047)+(1.073), (I-130)+(1.047)+(1.074), (I-130)+(1.047)+(1.075), (I-130)+(1.047)+(1.076), (I-130)+(1.047)+(1.077), (I-130)+(1.047)+(1.078), (I-130)+(1.047)+(1.079), (I-130)+(1.047)+(1.080), (I-130)+(1.047)+(1.081), (I-130)+(1.047)+(1.082), (I-130)+(1.047)+(1.083), (I-130)+(1.047)+(1.084), (I-130)+(1.047)+(1.085), (I-130)+(1.047)+(1.086), (I-130)+(1.047)+(1.087), (I-130)+(1.047)+(1.088), (I-130)+(1.047)+(1.089), (I-130)+(1.047)+(1.090), (I-130)+(1.047)+(1.091), (I-130)+(1.047)+(1.092), (I-130)+(1.047)+(2.001), (I-130)+(1.047)+(2.002), (I-130)+(1.047)+(2.003), (I-130)+(1.047)+(2.004), (I-130)+(1.047)+(2.005), (I-130)+(1.047)+(2.006), (I-130)+(1.047)+(2.007), (I-130)+(1.047)+(2.008), (I-130)+(1.047)+(2.009), (I-130)+(1.047)+(2.010), (I-130)+(1.047)+(2.011), (I-130)+(1.047)+(2.012), (I-130)+(1.047)+(2.013), (I-130)+(1.047)+(2.014), (I-130)+(1.047)+(2.015), (I-130)+(1.047)+(2.016), (I-130)+(1.047)+(2.017), (I-130)+(1.047)+(2.018), (I-130)+(1.047)+(2.019), (I-130)+(1.047)+(2.020), (I-130)+(1.047)+(2.021), (I-130)+(1.047)+(2.022), (I-130)+(1.047)+(2.023), (I-130)+(1.047)+(2.024), (I-130)+(1.047)+(2.025), (I-130)+(1.047)+(2.026), (I-130)+(1.047)+(2.027), (I-130)+(1.047)+(2.028), (I-130)+(1.047)+(2.029), (I-130)+(1.047)+(2.030), (I-130)+(1.047)+(2.031), (I-130)+(1.047)+(2.032), (I-130)+(1.047)+(2.033), (I-130)+(1.047)+(2.034), (I-130)+(1.047)+(2.035), (I-130)+(1.047)+(2.036), (I-130)+(1.047)+(2.037), (I-130)+(1.047)+(2.038), (I-130)+(1.047)+(2.039), (I-130)+(1.047)+(2.040), (I-130)+(1.047)+(2.041), (I-130)+(1.047)+(2.042), (I-130)+(1.047)+(2.043), (I-130)+(1.047)+(2.044), (I-130)+(1.047)+(2.045), (I-130)+(1.047)+(2.046), (I-130)+(1.047)+(2.047), (I-130)+(1.047)+(2.048), (I-130)+(1.047)+(2.049), (I-130)+(1.047)+(2.050), (I-130)+(1.047)+(2.051), (I-130)+(1.047)+(2.052), (I-130)+(1.047)+(2.053), (I-130)+(1.047)+(2.054), (I-130)+(1.047)+(2.055), (I-130)+(1.047)+(2.056), (I-130)+(1.047)+(2.057), (I-130)+(1.047)+(2.058), (I-130)+(1.047)+(2.059), (I-130)+(1.047)+(3.001), (I-130)+(1.047)+(3.002), (I-130)+(1.047)+(3.003), (I-130)+(1.047)+(3.004), (I-130)+(1.047)+(3.005), (I-130)+(1.047)+(3.006), (I-130)+(1.047)+(3.007), (I-130)+(1.047)+(3.008), (I-130)+(1.047)+(3.009), (I-130)+(1.047)+(3.010), (I-130)+(1.047)+(3.011), (I-130)+(1.047)+(3.012), (I-130)+(1.047)+(3.013), (I-130)+(1.047)+(3.014), (I-130)+(1.047)+(3.015), (I-130)+(1.047)+(3.016), (I-130)+(1.047)+(3.017), (I-130)+(1.047)+(3.018), (I-130)+(1.047)+(3.019), (I-130)+(1.047)+(3.020), (I-130)+(1.047)+(3.021), (I-130)+(1.047)+(3.022), (I-130)+(1.047)+(3.023), (I-130)+(1.047)+(3.024), (I-130)+(1.047)+(3.025), (I-130)+(1.047)+(3.026), (I-130)+(1.047)+(3.027), (I-130)+(1.047)+(3.028), (I-130)+(1.047)+(3.029), (I-130)+(1.047)+(3.030), (I-130)+(1.047)+(3.031), (I-130)+(1.047)+(5.001), (I-130)+(1.047)+(5.002), (I-130)+(1.047)+(5.003), (I-130)+(1.047)+(5.004), (I-130)+(1.047)+(5.005), (I-130)+(1.047)+(5.006), (I-130)+(1.047)+(5.007), (I-130)+(1.047)+(5.008), (I-130)+(1.047)+(5.009), (I-130)+(1.047)+(5.010), (I-130)+(1.047)+(5.011), (I-130)+(1.047)+(5.012), (I-130)+(1.047)+(5.013), (I-130)+(1.047)+(5.014), (I-130)+(1.047)+(5.015), (I-130)+(1.047)+(5.016), (I-130)+(1.047)+(5.017), (I-130)+(1.047)+(5.018), (I-130)+(1.047)+(5.019), (I-130)+(1.047)+(5.020), (I-130)+(1.047)+(5.021), (I-130)+(1.047)+(5.022), (I-130)+(1.047)+(5.023), (I-130)+(1.047)+(6.001), (I-130)+(1.047)+(6.002), (I-130)+(1.047)+(6.003), (I-130)+(1.047)+(6.004), (I-130)+(1.047)+(7.001), (I-130)+(1.047)+(7.002), (I-130)+(1.047)+(7.003), (I-130)+(1.047)+(7.004), (I-130)+(1.047)+(7.005), (I-130)+(1.047)+(7.006), (I-130)+(1.047)+(9.001), (I-130)+(1.047)+(9.002), (I-130)+(1.047)+(9.003), (I-130)+(1.047)+(9.004), (I-130)+(1.047)+(9.005), (I-130)+(1.047)+(9.006), (I-130)+(1.047)+(9.007), (I-130)+(1.047)+(9.008), (I-130)+(1.047)+(9.009), (I-130)+(1.047)+(14.001), (I-130)+(1.047)+(14.002), (I-130)+(1.047)+(15.008), (I-130)+(1.047)+(15.011), (I-130)+(1.047)+(15.012), (I-130)+(1.047)+(15.016), (I-130)+(1.047)+(15.025), (I-130)+(1.047)+(15.027), (I-130)+(1.047)+(15.047), (I-130)+(1.047)+(15.063), (I-130)+(1.047)+(15.064), (I-130)+(1.047)+(16.001), (I-130)+(1.047)+(16.002), (I-130)+(1.047)+(16.003), (I-130)+(1.047)+(16.004), (I-130)+(1.047)+(16.005), (I-130)+(1.047)+(16.006), (I-130)+(1.047)+(16.007), (I-130)+(1.047)+(16.008), (I-130)+(1.047)+(17.001), (I-130)+(1.047)+(17.002), (I-130)+(1.047)+(17.003), (I-130)+(1.047)+(17.004), (I-130)+(1.047)+(17.005), (I-130)+(1.047)+(17.006), (I-130)+(1.047)+(17.007), (I-130)+(1.047)+(17.008), (I-130)+(1.047)+(17.009), (I-130)+(1.047)+(17.010), (I-130)+(1.047)+(17.011), (I-130)+(1.047)+(17.012), (I-130)+(1.047)+(18.001), (I-130)+(1.048)+(1.049), (I-130)+(1.048)+(1.050), (I-130)+(1.048)+(1.051), (I-130)+(1.048)+(1.052), (I-130)+(1.048)+(1.053), (I-130)+(1.048)+(1.054), (I-130)+(1.048)+(1.055), (I-130)+(1.048)+(1.056), (I-130)+(1.048)+(1.057), (I-130)+(1.048)+(1.058), (I-130)+(1.048)+(1.059), (I-130)+(1.048)+(1.060), (I-130)+(1.048)+(1.061), (I-130)+(1.048)+(1.062), (I-130)+(1.048)+(1.063), (I-130)+(1.048)+(1.064), (I-130)+(1.048)+(1.065), (I-130)+(1.048)+(1.066), (I-130)+(1.048)+(1.067), (I-130)+(1.048)+(1.068), (I-130)+(1.048)+(1.069), (I-130)+(1.048)+(1.070), (I-130)+(1.048)+(1.071), (I-130)+(1.048)+(1.072), (I-130)+(1.048)+(1.073), (I-130)+(1.048)+(1.074), (I-130)+(1.048)+(1.075), (I-130)+(1.048)+(1.076), (I-130)+(1.048)+(1.077), (I-130)+(1.048)+(1.078), (I-130)+(1.048)+(1.079), (I-130)+(1.048)+(1.080), (I-130)+(1.048)+(1.081), (I-130)+(1.048)+(1.082), (I-130)+(1.048)+(1.083), (I-130)+(1.048)+(1.084), (I-130)+(1.048)+(1.085), (I-130)+(1.048)+(1.086), (I-130)+(1.048)+(1.087), (I-130)+(1.048)+(1.088), (I-130)+(1.048)+(1.089), (I-130)+(1.048)+(1.090), (I-130)+(1.048)+(1.091), (I-130)+(1.048)+(1.092), (I-130)+(1.048)+(2.001), (I-130)+(1.048)+(2.002), (I-130)+(1.048)+(2.003), (I-130)+(1.048)+(2.004), (I-130)+(1.048)+(2.005), (I-130)+(1.048)+(2.006), (I-130)+(1.048)+(2.007), (I-130)+(1.048)+(2.008), (I-130)+(1.048)+(2.009), (I-130)+(1.048)+(2.010), (I-130)+(1.048)+(2.011), (I-130)+(1.048)+(2.012), (I-130)+(1.048)+(2.013), (I-130)+(1.048)+(2.014), (I-130)+(1.048)+(2.015), (I-130)+(1.048)+(2.016), (I-130)+(1.048)+(2.017), (I-130)+(1.048)+(2.018), (I-130)+(1.048)+(2.019), (I-130)+(1.048)+(2.020), (I-130)+(1.048)+(2.021), (I-130)+(1.048)+(2.022), (I-130)+(1.048)+(2.023), (I-130)+(1.048)+(2.024), (I-130)+(1.048)+(2.025), (I-130)+(1.048)+(2.026), (I-130)+(1.048)+(2.027), (I-130)+(1.048)+(2.028), (I-130)+(1.048)+(2.029), (I-130)+(1.048)+(2.030), (I-130)+(1.048)+(2.031), (I-130)+(1.048)+(2.032), (I-130)+(1.048)+(2.033), (I-130)+(1.048)+(2.034), (I-130)+(1.048)+(2.035), (I-130)+(1.048)+(2.036), (I-130)+(1.048)+(2.037), (I-130)+(1.048)+(2.038), (I-130)+(1.048)+(2.039), (I-130)+(1.048)+(2.040), (I-130)+(1.048)+(2.041), (I-130)+(1.048)+(2.042), (I-130)+(1.048)+(2.043), (I-130)+(1.048)+(2.044), (I-130)+(1.048)+(2.045), (I-130)+(1.048)+(2.046), (I-130)+(1.048)+(2.047), (I-130)+(1.048)+(2.048), (I-130)+(1.048)+(2.049), (I-130)+(1.048)+(2.050), (I-130)+(1.048)+(2.051), (I-130)+(1.048)+(2.052), (I-130)+(1.048)+(2.053), (I-130)+(1.048)+(2.054), (I-130)+(1.048)+(2.055), (I-130)+(1.048)+(2.056), (I-130)+(1.048)+(2.057), (I-130)+(1.048)+(2.058), (I-130)+(1.048)+(2.059), (I-130)+(1.048)+(3.001), (I-130)+(1.048)+(3.002), (I-130)+(1.048)+(3.003), (I-130)+(1.048)+(3.004), (I-130)+(1.048)+(3.005), (I-130)+(1.048)+(3.006), (I-130)+(1.048)+(3.007), (I-130)+(1.048)+(3.008), (I-130)+(1.048)+(3.009), (I-130)+(1.048)+(3.010), (I-130)+(1.048)+(3.011), (I-130)+(1.048)+(3.012), (I-130)+(1.048)+(3.013), (I-130)+(1.048)+(3.014), (I-130)+(1.048)+(3.015), (I-130)+(1.048)+(3.016), (I-130)+(1.048)+(3.017), (I-130)+(1.048)+(3.018), (I-130)+(1.048)+(3.019), (I-130)+(1.048)+(3.020), (I-130)+(1.048)+(3.021), (I-130)+(1.048)+(3.022), (I-130)+(1.048)+(3.023), (I-130)+(1.048)+(3.024), (I-130)+(1.048)+(3.025), (I-130)+(1.048)+(3.026), (I-130)+(1.048)+(3.027), (I-130)+(1.048)+(3.028), (I-130)+(1.048)+(3.029), (I-130)+(1.048)+(3.030), (I-130)+(1.048)+(3.031), (I-130)+(1.048)+(5.001), (I-130)+(1.048)+(5.002), (I-130)+(1.048)+(5.003), (I-130)+(1.048)+(5.004), (I-130)+(1.048)+(5.005), (I-130)+(1.048)+(5.006), (I-130)+(1.048)+(5.007), (I-130)+(1.048)+(5.008), (I-130)+(1.048)+(5.009), (I-130)+(1.048)+(5.010), (I-130)+(1.048)+(5.011), (I-130)+(1.048)+(5.012), (I-130)+(1.048)+(5.013), (I-130)+(1.048)+(5.014), (I-130)+(1.048)+(5.015), (I-130)+(1.048)+(5.016), (I-130)+(1.048)+(5.017), (I-130)+(1.048)+(5.018), (I-130)+(1.048)+(5.019), (I-130)+(1.048)+(5.020), (I-130)+(1.048)+(5.021), (I-130)+(1.048)+(5.022), (I-130)+(1.048)+(5.023), (I-130)+(1.048)+(6.001), (I-130)+(1.048)+(6.002), (I-130)+(1.048)+(6.003), (I-130)+(1.048)+(6.004), (I-130)+(1.048)+(7.001), (I-130)+(1.048)+(7.002), (I-130)+(1.048)+(7.003), (I-130)+(1.048)+(7.004), (I-130)+(1.048)+(7.005), (I-130)+(1.048)+(7.006), (I-130)+(1.048)+(9.001), (I-130)+(1.048)+(9.002), (I-130)+(1.048)+(9.003), (I-130)+(1.048)+(9.004), (I-130)+(1.048)+(9.005), (I-130)+(1.048)+(9.006), (I-130)+(1.048)+(9.007), (I-130)+(1.048)+(9.008), (I-130)+(1.048)+(9.009), (I-130)+(1.048)+(14.001), (I-130)+(1.048)+(14.002), (I-130)+(1.048)+(15.008), (I-130)+(1.048)+(15.011), (I-130)+(1.048)+(15.012), (I-130)+(1.048)+(15.016), (I-130)+(1.048)+(15.025), (I-130)+(1.048)+(15.027), (I-130)+(1.048)+(15.047), (I-130)+(1.048)+(15.063), (I-130)+(1.048)+(15.064), (I-130)+(1.048)+(16.001), (I-130)+(1.048)+(16.002), (I-130)+(1.048)+(16.003), (I-130)+(1.048)+(16.004), (I-130)+(1.048)+(16.005), (I-130)+(1.048)+(16.006), (I-130)+(1.048)+(16.007), (I-130)+(1.048)+(16.008), (I-130)+(1.048)+(17.001), (I-130)+(1.048)+(17.002), (I-130)+(1.048)+(17.003), (I-130)+(1.048)+(17.004), (I-130)+(1.048)+(17.005), (I-130)+(1.048)+(17.006), (I-130)+(1.048)+(17.007), (I-130)+(1.048)+(17.008), (I-130)+(1.048)+(17.009), (I-130)+(1.048)+(17.010), (I-130)+(1.048)+(17.011), (I-130)+(1.048)+(17.012), (I-130)+(1.048)+(18.001), (I-130)+(1.049)+(1.050), (I-130)+(1.049)+(1.051), (I-130)+(1.049)+(1.052), (I-130)+(1.049)+(1.053), (I-130)+(1.049)+(1.054), (I-130)+(1.049)+(1.055), (I-130)+(1.049)+(1.056), (I-130)+(1.049)+(1.057), (I-130)+(1.049)+(1.058), (I-130)+(1.049)+(1.059), (I-130)+(1.049)+(1.060), (I-130)+(1.049)+(1.061), (I-130)+(1.049)+(1.062), (I-130)+(1.049)+(1.063), (I-130)+(1.049)+(1.064), (I-130)+(1.049)+(1.065), (I-130)+(1.049)+(1.066), (I-130)+(1.049)+(1.067), (I-130)+(1.049)+(1.068), (I-130)+(1.049)+(1.069), (I-130)+(1.049)+(1.070), (I-130)+(1.049)+(1.071), (I-130)+(1.049)+(1.072), (I-130)+(1.049)+(1.073), (I-130)+(1.049)+(1.074), (I-130)+(1.049)+(1.075), (I-130)+(1.049)+(1.076), (I-130)+(1.049)+(1.077), (I-130)+(1.049)+(1.078), (I-130)+(1.049)+(1.079), (I-130)+(1.049)+(1.080), (I-130)+(1.049)+(1.081), (I-130)+(1.049)+(1.082), (I-130)+(1.049)+(1.083), (I-130)+(1.049)+(1.084), (I-130)+(1.049)+(1.085), (I-130)+(1.049)+(1.086), (I-130)+(1.049)+(1.087), (I-130)+(1.049)+(1.088), (I-130)+(1.049)+(1.089), (I-130)+(1.049)+(1.090), (I-130)+(1.049)+(1.091), (I-130)+(1.049)+(1.092), (I-130)+(1.049)+(2.001), (I-130)+(1.049)+(2.002), (I-130)+(1.049)+(2.003), (I-130)+(1.049)+(2.004), (I-130)+(1.049)+(2.005), (I-130)+(1.049)+(2.006), (I-130)+(1.049)+(2.007), (I-130)+(1.049)+(2.008), (I-130)+(1.049)+(2.009), (I-130)+(1.049)+(2.010), (I-130)+(1.049)+(2.011), (I-130)+(1.049)+(2.012), (I-130)+(1.049)+(2.013), (I-130)+(1.049)+(2.014), (I-130)+(1.049)+(2.015), (I-130)+(1.049)+(2.016), (I-130)+(1.049)+(2.017), (I-130)+(1.049)+(2.018), (I-130)+(1.049)+(2.019), (I-130)+(1.049)+(2.020), (I-130)+(1.049)+(2.021), (I-130)+(1.049)+(2.022), (I-130)+(1.049)+(2.023), (I-130)+(1.049)+(2.024), (I-130)+(1.049)+(2.025), (I-130)+(1.049)+(2.026), (I-130)+(1.049)+(2.027), (I-130)+(1.049)+(2.028), (I-130)+(1.049)+(2.029), (I-130)+(1.049)+(2.030), (I-130)+(1.049)+(2.031), (I-130)+(1.049)+(2.032), (I-130)+(1.049)+(2.033), (I-130)+(1.049)+(2.034), (I-130)+(1.049)+(2.035), (I-130)+(1.049)+(2.036), (I-130)+(1.049)+(2.037), (I-130)+(1.049)+(2.038), (I-130)+(1.049)+(2.039), (I-130)+(1.049)+(2.040), (I-130)+(1.049)+(2.041), (I-130)+(1.049)+(2.042), (I-130)+(1.049)+(2.043), (I-130)+(1.049)+(2.044), (I-130)+(1.049)+(2.045), (I-130)+(1.049)+(2.046), (I-130)+(1.049)+(2.047), (I-130)+(1.049)+(2.048), (I-130)+(1.049)+(2.049), (I-130)+(1.049)+(2.050), (I-130)+(1.049)+(2.051), (I-130)+(1.049)+(2.052), (I-130)+(1.049)+(2.053), (I-130)+(1.049)+(2.054), (I-130)+(1.049)+(2.055), (I-130)+(1.049)+(2.056), (I-130)+(1.049)+(2.057), (I-130)+(1.049)+(2.058), (I-130)+(1.049)+(2.059), (I-130)+(1.049)+(3.001), (I-130)+(1.049)+(3.002), (I-130)+(1.049)+(3.003), (I-130)+(1.049)+(3.004), (I-130)+(1.049)+(3.005), (I-130)+(1.049)+(3.006), (I-130)+(1.049)+(3.007), (I-130)+(1.049)+(3.008), (I-130)+(1.049)+(3.009), (I-130)+(1.049)+(3.010), (I-130)+(1.049)+(3.011), (I-130)+(1.049)+(3.012), (I-130)+(1.049)+(3.013), (I-130)+(1.049)+(3.014), (I-130)+(1.049)+(3.015), (I-130)+(1.049)+(3.016), (I-130)+(1.049)+(3.017), (I-130)+(1.049)+(3.018), (I-130)+(1.049)+(3.019), (I-130)+(1.049)+(3.020), (I-130)+(1.049)+(3.021), (I-130)+(1.049)+(3.022), (I-130)+(1.049)+(3.023), (I-130)+(1.049)+(3.024), (I-130)+(1.049)+(3.025), (I-130)+(1.049)+(3.026), (I-130)+(1.049)+(3.027), (I-130)+(1.049)+(3.028), (I-130)+(1.049)+(3.029), (I-130)+(1.049)+(3.030), (I-130)+(1.049)+(3.031), (I-130)+(1.049)+(5.001), (I-130)+(1.049)+(5.002), (I-130)+(1.049)+(5.003), (I-130)+(1.049)+(5.004), (I-130)+(1.049)+(5.005), (I-130)+(1.049)+(5.006), (I-130)+(1.049)+(5.007), (I-130)+(1.049)+(5.008), (I-130)+(1.049)+(5.009), (I-130)+(1.049)+(5.010), (I-130)+(1.049)+(5.011), (I-130)+(1.049)+(5.012), (I-130)+(1.049)+(5.013), (I-130)+(1.049)+(5.014), (I-130)+(1.049)+(5.015), (I-130)+(1.049)+(5.016), (I-130)+(1.049)+(5.017), (I-130)+(1.049)+(5.018), (I-130)+(1.049)+(5.019), (I-130)+(1.049)+(5.020), (I-130)+(1.049)+(5.021), (I-130)+(1.049)+(5.022), (I-130)+(1.049)+(5.023), (I-130)+(1.049)+(6.001), (I-130)+(1.049)+(6.002), (I-130)+(1.049)+(6.003), (I-130)+(1.049)+(6.004), (I-130)+(1.049)+(7.001), (I-130)+(1.049)+(7.002), (I-130)+(1.049)+(7.003), (I-130)+(1.049)+(7.004), (I-130)+(1.049)+(7.005), (I-130)+(1.049)+(7.006), (I-130)+(1.049)+(9.001), (I-130)+(1.049)+(9.002), (I-130)+(1.049)+(9.003), (I-130)+(1.049)+(9.004), (I-130)+(1.049)+(9.005), (I-130)+(1.049)+(9.006), (I-130)+(1.049)+(9.007), (I-130)+(1.049)+(9.008), (I-130)+(1.049)+(9.009), (I-130)+(1.049)+(14.001), (I-130)+(1.049)+(14.002), (I-130)+(1.049)+(15.008), (I-130)+(1.049)+(15.011), (I-130)+(1.049)+(15.012), (I-130)+(1.049)+(15.016), (I-130)+(1.049)+(15.025), (I-130)+(1.049)+(15.027), (I-130)+(1.049)+(15.047), (I-130)+(1.049)+(15.063), (I-130)+(1.049)+(15.064), (I-130)+(1.049)+(16.001), (I-130)+(1.049)+(16.002), (I-130)+(1.049)+(16.003), (I-130)+(1.049)+(16.004), (I-130)+(1.049)+(16.005), (I-130)+(1.049)+(16.006), (I-130)+(1.049)+(16.007), (I-130)+(1.049)+(16.008), (I-130)+(1.049)+(17.001), (I-130)+(1.049)+(17.002), (I-130)+(1.049)+(17.003), (I-130)+(1.049)+(17.004), (I-130)+(1.049)+(17.005), (I-130)+(1.049)+(17.006), (I-130)+(1.049)+(17.007), (I-130)+(1.049)+(17.008), (I-130)+(1.049)+(17.009), (I-130)+(1.049)+(17.010), (I-130)+(1.049)+(17.011), (I-130)+(1.049)+(17.012), (I-130)+(1.049)+(18.001), (I-130)+(1.050)+(1.051), (I-130)+(1.050)+(1.052), (I-130)+(1.050)+(1.053), (I-130)+(1.050)+(1.054), (I-130)+(1.050)+(1.055), (I-130)+(1.050)+(1.056), (I-130)+(1.050)+(1.057), (I-130)+(1.050)+(1.058), (I-130)+(1.050)+(1.059), (I-130)+(1.050)+(1.060), (I-130)+(1.050)+(1.061), (I-130)+(1.050)+(1.062), (I-130)+(1.050)+(1.063), (I-130)+(1.050)+(1.064), (I-130)+(1.050)+(1.065), (I-130)+(1.050)+(1.066), (I-130)+(1.050)+(1.067), (I-130)+(1.050)+(1.068), (I-130)+(1.050)+(1.069), (I-130)+(1.050)+(1.070), (I-130)+(1.050)+(1.071), (I-130)+(1.050)+(1.072), (I-130)+(1.050)+(1.073), (I-130)+(1.050)+(1.074), (I-130)+(1.050)+(1.075), (I-130)+(1.050)+(1.076), (I-130)+(1.050)+(1.077), (I-130)+(1.050)+(1.078), (I-130)+(1.050)+(1.079), (I-130)+(1.050)+(1.080), (I-130)+(1.050)+(1.081), (I-130)+(1.050)+(1.082), (I-130)+(1.050)+(1.083), (I-130)+(1.050)+(1.084), (I-130)+(1.050)+(1.085), (I-130)+(1.050)+(1.086), (I-130)+(1.050)+(1.087), (I-130)+(1.050)+(1.088), (I-130)+(1.050)+(1.089), (I-130)+(1.050)+(1.090), (I-130)+(1.050)+(1.091), (I-130)+(1.050)+(1.092), (I-130)+(1.050)+(2.001), (I-130)+(1.050)+(2.002), (I-130)+(1.050)+(2.003), (I-130)+(1.050)+(2.004), (I-130)+(1.050)+(2.005), (I-130)+(1.050)+(2.006), (I-130)+(1.050)+(2.007), (I-130)+(1.050)+(2.008), (I-130)+(1.050)+(2.009), (I-130)+(1.050)+(2.010), (I-130)+(1.050)+(2.011), (I-130)+(1.050)+(2.012), (I-130)+(1.050)+(2.013), (I-130)+(1.050)+(2.014), (I-130)+(1.050)+(2.015), (I-130)+(1.050)+(2.016), (I-130)+(1.050)+(2.017), (I-130)+(1.050)+(2.018), (I-130)+(1.050)+(2.019), (I-130)+(1.050)+(2.020), (I-130)+(1.050)+(2.021), (I-130)+(1.050)+(2.022), (I-130)+(1.050)+(2.023), (I-130)+(1.050)+(2.024), (I-130)+(1.050)+(2.025), (I-130)+(1.050)+(2.026), (I-130)+(1.050)+(2.027), (I-130)+(1.050)+(2.028), (I-130)+(1.050)+(2.029), (I-130)+(1.050)+(2.030), (I-130)+(1.050)+(2.031), (I-130)+(1.050)+(2.032), (I-130)+(1.050)+(2.033), (I-130)+(1.050)+(2.034), (I-130)+(1.050)+(2.035), (I-130)+(1.050)+(2.036), (I-130)+(1.050)+(2.037), (I-130)+(1.050)+(2.038), (I-130)+(1.050)+(2.039), (I-130)+(1.050)+(2.040), (I-130)+(1.050)+(2.041), (I-130)+(1.050)+(2.042), (I-130)+(1.050)+(2.043), (I-130)+(1.050)+(2.044), (I-130)+(1.050)+(2.045), (I-130)+(1.050)+(2.046), (I-130)+(1.050)+(2.047), (I-130)+(1.050)+(2.048), (I-130)+(1.050)+(2.049), (I-130)+(1.050)+(2.050), (I-130)+(1.050)+(2.051), (I-130)+(1.050)+(2.052), (I-130)+(1.050)+(2.053), (I-130)+(1.050)+(2.054), (I-130)+(1.050)+(2.055), (I-130)+(1.050)+(2.056), (I-130)+(1.050)+(2.057), (I-130)+(1.050)+(2.058), (I-130)+(1.050)+(2.059), (I-130)+(1.050)+(3.001), (I-130)+(1.050)+(3.002), (I-130)+(1.050)+(3.003), (I-130)+(1.050)+(3.004), (I-130)+(1.050)+(3.005), (I-130)+(1.050)+(3.006), (I-130)+(1.050)+(3.007), (I-130)+(1.050)+(3.008), (I-130)+(1.050)+(3.009), (I-130)+(1.050)+(3.010), (I-130)+(1.050)+(3.011), (I-130)+(1.050)+(3.012), (I-130)+(1.050)+(3.013), (I-130)+(1.050)+(3.014), (I-130)+(1.050)+(3.015), (I-130)+(1.050)+(3.016), (I-130)+(1.050)+(3.017), (I-130)+(1.050)+(3.018), (I-130)+(1.050)+(3.019), (I-130)+(1.050)+(3.020), (I-130)+(1.050)+(3.021), (I-130)+(1.050)+(3.022), (I-130)+(1.050)+(3.023), (I-130)+(1.050)+(3.024), (I-130)+(1.050)+(3.025), (I-130)+(1.050)+(3.026), (I-130)+(1.050)+(3.027), (I-130)+(1.050)+(3.028), (I-130)+(1.050)+(3.029), (I-130)+(1.050)+(3.030), (I-130)+(1.050)+(3.031), (I-130)+(1.050)+(5.001), (I-130)+(1.050)+(5.002), (I-130)+(1.050)+(5.003), (I-130)+(1.050)+(5.004), (I-130)+(1.050)+(5.005), (I-130)+(1.050)+(5.006), (I-130)+(1.050)+(5.007), (I-130)+(1.050)+(5.008), (I-130)+(1.050)+(5.009), (I-130)+(1.050)+(5.010), (I-130)+(1.050)+(5.011), (I-130)+(1.050)+(5.012), (I-130)+(1.050)+(5.013), (I-130)+(1.050)+(5.014), (I-130)+(1.050)+(5.015), (I-130)+(1.050)+(5.016), (I-130)+(1.050)+(5.017), (I-130)+(1.050)+(5.018), (I-130)+(1.050)+(5.019), (I-130)+(1.050)+(5.020), (I-130)+(1.050)+(5.021), (I-130)+(1.050)+(5.022), (I-130)+(1.050)+(5.023), (I-130)+(1.050)+(6.001), (I-130)+(1.050)+(6.002), (I-130)+(1.050)+(6.003), (I-130)+(1.050)+(6.004), (I-130)+(1.050)+(7.001), (I-130)+(1.050)+(7.002), (I-130)+(1.050)+(7.003), (I-130)+(1.050)+(7.004), (I-130)+(1.050)+(7.005), (I-130)+(1.050)+(7.006), (I-130)+(1.050)+(9.001), (I-130)+(1.050)+(9.002), (I-130)+(1.050)+(9.003), (I-130)+(1.050)+(9.004), (I-130)+(1.050)+(9.005), (I-130)+(1.050)+(9.006), (I-130)+(1.050)+(9.007), (I-130)+(1.050)+(9.008), (I-130)+(1.050)+(9.009), (I-130)+(1.050)+(14.001), (I-130)+(1.050)+(14.002), (I-130)+(1.050)+(15.008), (I-130)+(1.050)+(15.011), (I-130)+(1.050)+(15.012), (I-130)+(1.050)+(15.016), (I-130)+(1.050)+(15.025), (I-130)+(1.050)+(15.027), (I-130)+(1.050)+(15.047), (I-130)+(1.050)+(15.063), (I-130)+(1.050)+(15.064), (I-130)+(1.050)+(16.001), (I-130)+(1.050)+(16.002), (I-130)+(1.050)+(16.003), (I-130)+(1.050)+(16.004), (I-130)+(1.050)+(16.005), (I-130)+(1.050)+(16.006), (I-130)+(1.050)+(16.007), (I-130)+(1.050)+(16.008), (I-130)+(1.050)+(17.001), (I-130)+(1.050)+(17.002), (I-130)+(1.050)+(17.003), (I-130)+(1.050)+(17.004), (I-130)+(1.050)+(17.005), (I-130)+(1.050)+(17.006), (I-130)+(1.050)+(17.007), (I-130)+(1.050)+(17.008), (I-130)+(1.050)+(17.009), (I-130)+(1.050)+(17.010), (I-130)+(1.050)+(17.011), (I-130)+(1.050)+(17.012), (I-130)+(1.050)+(18.001), (I-130)+(1.051)+(1.052), (I-130)+(1.051)+(1.053), (I-130)+(1.051)+(1.054), (I-130)+(1.051)+(1.055), (I-130)+(1.051)+(1.056), (I-130)+(1.051)+(1.057), (I-130)+(1.051)+(1.058), (I-130)+(1.051)+(1.059), (I-130)+(1.051)+(1.060), (I-130)+(1.051)+(1.061), (I-130)+(1.051)+(1.062), (I-130)+(1.051)+(1.063), (I-130)+(1.051)+(1.064), (I-130)+(1.051)+(1.065), (I-130)+(1.051)+(1.066), (I-130)+(1.051)+(1.067), (I-130)+(1.051)+(1.068), (I-130)+(1.051)+(1.069), (I-130)+(1.051)+(1.070), (I-130)+(1.051)+(1.071), (I-130)+(1.051)+(1.072), (I-130)+(1.051)+(1.073), (I-130)+(1.051)+(1.074), (I-130)+(1.051)+(1.075), (I-130)+(1.051)+(1.076), (I-130)+(1.051)+(1.077), (I-130)+(1.051)+(1.078), (I-130)+(1.051)+(1.079), (I-130)+(1.051)+(1.080), (I-130)+(1.051)+(1.081), (I-130)+(1.051)+(1.082), (I-130)+(1.051)+(1.083), (I-130)+(1.051)+(1.084), (I-130)+(1.051)+(1.085), (I-130)+(1.051)+(1.086), (I-130)+(1.051)+(1.087), (I-130)+(1.051)+(1.088), (I-130)+(1.051)+(1.089), (I-130)+(1.051)+(1.090), (I-130)+(1.051)+(1.091), (I-130)+(1.051)+(1.092), (I-130)+(1.051)+(2.001), (I-130)+(1.051)+(2.002), (I-130)+(1.051)+(2.003), (I-130)+(1.051)+(2.004), (I-130)+(1.051)+(2.005), (I-130)+(1.051)+(2.006), (I-130)+(1.051)+(2.007), (I-130)+(1.051)+(2.008), (I-130)+(1.051)+(2.009), (I-130)+(1.051)+(2.010), (I-130)+(1.051)+(2.011), (I-130)+(1.051)+(2.012), (I-130)+(1.051)+(2.013), (I-130)+(1.051)+(2.014), (I-130)+(1.051)+(2.015), (I-130)+(1.051)+(2.016), (I-130)+(1.051)+(2.017), (I-130)+(1.051)+(2.018), (I-130)+(1.051)+(2.019), (I-130)+(1.051)+(2.020), (I-130)+(1.051)+(2.021), (I-130)+(1.051)+(2.022), (I-130)+(1.051)+(2.023), (I-130)+(1.051)+(2.024), (I-130)+(1.051)+(2.025), (I-130)+(1.051)+(2.026), (I-130)+(1.051)+(2.027), (I-130)+(1.051)+(2.028), (I-130)+(1.051)+(2.029), (I-130)+(1.051)+(2.030), (I-130)+(1.051)+(2.031), (I-130)+(1.051)+(2.032), (I-130)+(1.051)+(2.033), (I-130)+(1.051)+(2.034), (I-130)+(1.051)+(2.035), (I-130)+(1.051)+(2.036), (I-130)+(1.051)+(2.037), (I-130)+(1.051)+(2.038), (I-130)+(1.051)+(2.039), (I-130)+(1.051)+(2.040), (I-130)+(1.051)+(2.041), (I-130)+(1.051)+(2.042), (I-130)+(1.051)+(2.043), (I-130)+(1.051)+(2.044), (I-130)+(1.051)+(2.045), (I-130)+(1.051)+(2.046), (I-130)+(1.051)+(2.047), (I-130)+(1.051)+(2.048), (I-130)+(1.051)+(2.049), (I-130)+(1.051)+(2.050), (I-130)+(1.051)+(2.051), (I-130)+(1.051)+(2.052), (I-130)+(1.051)+(2.053), (I-130)+(1.051)+(2.054), (I-130)+(1.051)+(2.055), (I-130)+(1.051)+(2.056), (I-130)+(1.051)+(2.057), (I-130)+(1.051)+(2.058), (I-130)+(1.051)+(2.059), (I-130)+(1.051)+(3.001), (I-130)+(1.051)+(3.002), (I-130)+(1.051)+(3.003), (I-130)+(1.051)+(3.004), (I-130)+(1.051)+(3.005), (I-130)+(1.051)+(3.006), (I-130)+(1.051)+(3.007), (I-130)+(1.051)+(3.008), (I-130)+(1.051)+(3.009), (I-130)+(1.051)+(3.010), (I-130)+(1.051)+(3.011), (I-130)+(1.051)+(3.012), (I-130)+(1.051)+(3.013), (I-130)+(1.051)+(3.014), (I-130)+(1.051)+(3.015), (I-130)+(1.051)+(3.016), (I-130)+(1.051)+(3.017), (I-130)+(1.051)+(3.018), (I-130)+(1.051)+(3.019), (I-130)+(1.051)+(3.020), (I-130)+(1.051)+(3.021), (I-130)+(1.051)+(3.022), (I-130)+(1.051)+(3.023), (I-130)+(1.051)+(3.024), (I-130)+(1.051)+(3.025), (I-130)+(1.051)+(3.026), (I-130)+(1.051)+(3.027), (I-130)+(1.051)+(3.028), (I-130)+(1.051)+(3.029), (I-130)+(1.051)+(3.030), (I-130)+(1.051)+(3.031), (I-130)+(1.051)+(5.001), (I-130)+(1.051)+(5.002), (I-130)+(1.051)+(5.003), (I-130)+(1.051)+(5.004), (I-130)+(1.051)+(5.005), (I-130)+(1.051)+(5.006), (I-130)+(1.051)+(5.007), (I-130)+(1.051)+(5.008), (I-130)+(1.051)+(5.009), (I-130)+(1.051)+(5.010), (I-130)+(1.051)+(5.011), (I-130)+(1.051)+(5.012), (I-130)+(1.051)+(5.013), (I-130)+(1.051)+(5.014), (I-130)+(1.051)+(5.015), (I-130)+(1.051)+(5.016), (I-130)+(1.051)+(5.017), (I-130)+(1.051)+(5.018), (I-130)+(1.051)+(5.019), (I-130)+(1.051)+(5.020), (I-130)+(1.051)+(5.021), (I-130)+(1.051)+(5.022), (I-130)+(1.051)+(5.023), (I-130)+(1.051)+(6.001), (I-130)+(1.051)+(6.002), (I-130)+(1.051)+(6.003), (I-130)+(1.051)+(6.004), (I-130)+(1.051)+(7.001), (I-130)+(1.051)+(7.002), (I-130)+(1.051)+(7.003), (I-130)+(1.051)+(7.004), (I-130)+(1.051)+(7.005), (I-130)+(1.051)+(7.006), (I-130)+(1.051)+(9.001), (I-130)+(1.051)+(9.002), (I-130)+(1.051)+(9.003), (I-130)+(1.051)+(9.004), (I-130)+(1.051)+(9.005), (I-130)+(1.051)+(9.006), (I-130)+(1.051)+(9.007), (I-130)+(1.051)+(9.008), (I-130)+(1.051)+(9.009), (I-130)+(1.051)+(14.001), (I-130)+(1.051)+(14.002), (I-130)+(1.051)+(15.008), (I-130)+(1.051)+(15.011), (I-130)+(1.051)+(15.012), (I-130)+(1.051)+(15.016), (I-130)+(1.051)+(15.025), (I-130)+(1.051)+(15.027), (I-130)+(1.051)+(15.047), (I-130)+(1.051)+(15.063), (I-130)+(1.051)+(15.064), (I-130)+(1.051)+(16.001), (I-130)+(1.051)+(16.002), (I-130)+(1.051)+(16.003), (I-130)+(1.051)+(16.004), (I-130)+(1.051)+(16.005), (I-130)+(1.051)+(16.006), (I-130)+(1.051)+(16.007), (I-130)+(1.051)+(16.008), (I-130)+(1.051)+(17.001), (I-130)+(1.051)+(17.002), (I-130)+(1.051)+(17.003), (I-130)+(1.051)+(17.004), (I-130)+(1.051)+(17.005), (I-130)+(1.051)+(17.006), (I-130)+(1.051)+(17.007), (I-130)+(1.051)+(17.008), (I-130)+(1.051)+(17.009), (I-130)+(1.051)+(17.010), (I-130)+(1.051)+(17.011), (I-130)+(1.051)+(17.012), (I-130)+(1.051)+(18.001), (I-130)+(1.052)+(1.053), (I-130)+(1.052)+(1.054), (I-130)+(1.052)+(1.055), (I-130)+(1.052)+(1.056), (I-130)+(1.052)+(1.057), (I-130)+(1.052)+(1.058), (I-130)+(1.052)+(1.059), (I-130)+(1.052)+(1.060), (I-130)+(1.052)+(1.061), (I-130)+(1.052)+(1.062), (I-130)+(1.052)+(1.063), (I-130)+(1.052)+(1.064), (I-130)+(1.052)+(1.065), (I-130)+(1.052)+(1.066), (I-130)+(1.052)+(1.067), (I-130)+(1.052)+(1.068), (I-130)+(1.052)+(1.069), (I-130)+(1.052)+(1.070), (I-130)+(1.052)+(1.071), (I-130)+(1.052)+(1.072), (I-130)+(1.052)+(1.073), (I-130)+(1.052)+(1.074), (I-130)+(1.052)+(1.075), (I-130)+(1.052)+(1.076), (I-130)+(1.052)+(1.077), (I-130)+(1.052)+(1.078), (I-130)+(1.052)+(1.079), (I-130)+(1.052)+(1.080), (I-130)+(1.052)+(1.081), (I-130)+(1.052)+(1.082), (I-130)+(1.052)+(1.083), (I-130)+(1.052)+(1.084), (I-130)+(1.052)+(1.085), (I-130)+(1.052)+(1.086), (I-130)+(1.052)+(1.087), (I-130)+(1.052)+(1.088), (I-130)+(1.052)+(1.089), (I-130)+(1.052)+(1.090), (I-130)+(1.052)+(1.091), (I-130)+(1.052)+(1.092), (I-130)+(1.052)+(2.001), (I-130)+(1.052)+(2.002), (I-130)+(1.052)+(2.003), (I-130)+(1.052)+(2.004), (I-130)+(1.052)+(2.005), (I-130)+(1.052)+(2.006), (I-130)+(1.052)+(2.007), (I-130)+(1.052)+(2.008), (I-130)+(1.052)+(2.009), (I-130)+(1.052)+(2.010), (I-130)+(1.052)+(2.011), (I-130)+(1.052)+(2.012), (I-130)+(1.052)+(2.013), (I-130)+(1.052)+(2.014), (I-130)+(1.052)+(2.015), (I-130)+(1.052)+(2.016), (I-130)+(1.052)+(2.017), (I-130)+(1.052)+(2.018), (I-130)+(1.052)+(2.019), (I-130)+(1.052)+(2.020), (I-130)+(1.052)+(2.021), (I-130)+(1.052)+(2.022), (I-130)+(1.052)+(2.023), (I-130)+(1.052)+(2.024), (I-130)+(1.052)+(2.025), (I-130)+(1.052)+(2.026), (I-130)+(1.052)+(2.027), (I-130)+(1.052)+(2.028), (I-130)+(1.052)+(2.029), (I-130)+(1.052)+(2.030), (I-130)+(1.052)+(2.031), (I-130)+(1.052)+(2.032), (I-130)+(1.052)+(2.033), (I-130)+(1.052)+(2.034), (I-130)+(1.052)+(2.035), (I-130)+(1.052)+(2.036), (I-130)+(1.052)+(2.037), (I-130)+(1.052)+(2.038), (I-130)+(1.052)+(2.039), (I-130)+(1.052)+(2.040), (I-130)+(1.052)+(2.041), (I-130)+(1.052)+(2.042), (I-130)+(1.052)+(2.043), (I-130)+(1.052)+(2.044), (I-130)+(1.052)+(2.045), (I-130)+(1.052)+(2.046), (I-130)+(1.052)+(2.047), (I-130)+(1.052)+(2.048), (I-130)+(1.052)+(2.049), (I-130)+(1.052)+(2.050), (I-130)+(1.052)+(2.051), (I-130)+(1.052)+(2.052), (I-130)+(1.052)+(2.053), (I-130)+(1.052)+(2.054), (I-130)+(1.052)+(2.055), (I-130)+(1.052)+(2.056), (I-130)+(1.052)+(2.057), (I-130)+(1.052)+(2.058), (I-130)+(1.052)+(2.059), (I-130)+(1.052)+(3.001), (I-130)+(1.052)+(3.002), (I-130)+(1.052)+(3.003), (I-130)+(1.052)+(3.004), (I-130)+(1.052)+(3.005), (I-130)+(1.052)+(3.006), (I-130)+(1.052)+(3.007), (I-130)+(1.052)+(3.008), (I-130)+(1.052)+(3.009), (I-130)+(1.052)+(3.010), (I-130)+(1.052)+(3.011), (I-130)+(1.052)+(3.012), (I-130)+(1.052)+(3.013), (I-130)+(1.052)+(3.014), (I-130)+(1.052)+(3.015), (I-130)+(1.052)+(3.016), (I-130)+(1.052)+(3.017), (I-130)+(1.052)+(3.018), (I-130)+(1.052)+(3.019), (I-130)+(1.052)+(3.020), (I-130)+(1.052)+(3.021), (I-130)+(1.052)+(3.022), (I-130)+(1.052)+(3.023), (I-130)+(1.052)+(3.024), (I-130)+(1.052)+(3.025), (I-130)+(1.052)+(3.026), (I-130)+(1.052)+(3.027), (I-130)+(1.052)+(3.028), (I-130)+(1.052)+(3.029), (I-130)+(1.052)+(3.030), (I-130)+(1.052)+(3.031), (I-130)+(1.052)+(5.001), (I-130)+(1.052)+(5.002), (I-130)+(1.052)+(5.003), (I-130)+(1.052)+(5.004), (I-130)+(1.052)+(5.005), (I-130)+(1.052)+(5.006), (I-130)+(1.052)+(5.007), (I-130)+(1.052)+(5.008), (I-130)+(1.052)+(5.009), (I-130)+(1.052)+(5.010), (I-130)+(1.052)+(5.011), (I-130)+(1.052)+(5.012), (I-130)+(1.052)+(5.013), (I-130)+(1.052)+(5.014), (I-130)+(1.052)+(5.015), (I-130)+(1.052)+(5.016), (I-130)+(1.052)+(5.017), (I-130)+(1.052)+(5.018), (I-130)+(1.052)+(5.019), (I-130)+(1.052)+(5.020), (I-130)+(1.052)+(5.021), (I-130)+(1.052)+(5.022), (I-130)+(1.052)+(5.023), (I-130)+(1.052)+(6.001), (I-130)+(1.052)+(6.002), (I-130)+(1.052)+(6.003), (I-130)+(1.052)+(6.004), (I-130)+(1.052)+(7.001), (I-130)+(1.052)+(7.002), (I-130)+(1.052)+(7.003), (I-130)+(1.052)+(7.004), (I-130)+(1.052)+(7.005), (I-130)+(1.052)+(7.006), (I-130)+(1.052)+(9.001), (I-130)+(1.052)+(9.002), (I-130)+(1.052)+(9.003), (I-130)+(1.052)+(9.004), (I-130)+(1.052)+(9.005), (I-130)+(1.052)+(9.006), (I-130)+(1.052)+(9.007), (I-130)+(1.052)+(9.008), (I-130)+(1.052)+(9.009), (I-130)+(1.052)+(14.001), (I-130)+(1.052)+(14.002), (I-130)+(1.052)+(15.008), (I-130)+(1.052)+(15.011), (I-130)+(1.052)+(15.012), (I-130)+(1.052)+(15.016), (I-130)+(1.052)+(15.025), (I-130)+(1.052)+(15.027), (I-130)+(1.052)+(15.047), (I-130)+(1.052)+(15.063), (I-130)+(1.052)+(15.064), (I-130)+(1.052)+(16.001), (I-130)+(1.052)+(16.002), (I-130)+(1.052)+(16.003), (I-130)+(1.052)+(16.004), (I-130)+(1.052)+(16.005), (I-130)+(1.052)+(16.006), (I-130)+(1.052)+(16.007), (I-130)+(1.052)+(16.008), (I-130)+(1.052)+(17.001), (I-130)+(1.052)+(17.002), (I-130)+(1.052)+(17.003), (I-130)+(1.052)+(17.004), (I-130)+(1.052)+(17.005), (I-130)+(1.052)+(17.006), (I-130)+(1.052)+(17.007), (I-130)+(1.052)+(17.008), (I-130)+(1.052)+(17.009), (I-130)+(1.052)+(17.010), (I-130)+(1.052)+(17.011), (I-130)+(1.052)+(17.012), (I-130)+(1.052)+(18.001), (I-130)+(1.053)+(1.054), (I-130)+(1.053)+(1.055), (I-130)+(1.053)+(1.056), (I-130)+(1.053)+(1.057), (I-130)+(1.053)+(1.058), (I-130)+(1.053)+(1.059), (I-130)+(1.053)+(1.060), (I-130)+(1.053)+(1.061), (I-130)+(1.053)+(1.062), (I-130)+(1.053)+(1.063), (I-130)+(1.053)+(1.064), (I-130)+(1.053)+(1.065), (I-130)+(1.053)+(1.066), (I-130)+(1.053)+(1.067), (I-130)+(1.053)+(1.068), (I-130)+(1.053)+(1.069), (I-130)+(1.053)+(1.070), (I-130)+(1.053)+(1.071), (I-130)+(1.053)+(1.072), (I-130)+(1.053)+(1.073), (I-130)+(1.053)+(1.074), (I-130)+(1.053)+(1.075), (I-130)+(1.053)+(1.076), (I-130)+(1.053)+(1.077), (I-130)+(1.053)+(1.078), (I-130)+(1.053)+(1.079), (I-130)+(1.053)+(1.080), (I-130)+(1.053)+(1.081), (I-130)+(1.053)+(1.082), (I-130)+(1.053)+(1.083), (I-130)+(1.053)+(1.084), (I-130)+(1.053)+(1.085), (I-130)+(1.053)+(1.086), (I-130)+(1.053)+(1.087), (I-130)+(1.053)+(1.088), (I-130)+(1.053)+(1.089), (I-130)+(1.053)+(1.090), (I-130)+(1.053)+(1.091), (I-130)+(1.053)+(1.092), (I-130)+(1.053)+(2.001), (I-130)+(1.053)+(2.002), (I-130)+(1.053)+(2.003), (I-130)+(1.053)+(2.004), (I-130)+(1.053)+(2.005), (I-130)+(1.053)+(2.006), (I-130)+(1.053)+(2.007), (I-130)+(1.053)+(2.008), (I-130)+(1.053)+(2.009), (I-130)+(1.053)+(2.010), (I-130)+(1.053)+(2.011), (I-130)+(1.053)+(2.012), (I-130)+(1.053)+(2.013), (I-130)+(1.053)+(2.014), (I-130)+(1.053)+(2.015), (I-130)+(1.053)+(2.016), (I-130)+(1.053)+(2.017), (I-130)+(1.053)+(2.018), (I-130)+(1.053)+(2.019), (I-130)+(1.053)+(2.020), (I-130)+(1.053)+(2.021), (I-130)+(1.053)+(2.022), (I-130)+(1.053)+(2.023), (I-130)+(1.053)+(2.024), (I-130)+(1.053)+(2.025), (I-130)+(1.053)+(2.026), (I-130)+(1.053)+(2.027), (I-130)+(1.053)+(2.028), (I-130)+(1.053)+(2.029), (I-130)+(1.053)+(2.030), (I-130)+(1.053)+(2.031), (I-130)+(1.053)+(2.032), (I-130)+(1.053)+(2.033), (I-130)+(1.053)+(2.034), (I-130)+(1.053)+(2.035), (I-130)+(1.053)+(2.036), (I-130)+(1.053)+(2.037), (I-130)+(1.053)+(2.038), (I-130)+(1.053)+(2.039), (I-130)+(1.053)+(2.040), (I-130)+(1.053)+(2.041), (I-130)+(1.053)+(2.042), (I-130)+(1.053)+(2.043), (I-130)+(1.053)+(2.044), (I-130)+(1.053)+(2.045), (I-130)+(1.053)+(2.046), (I-130)+(1.053)+(2.047), (I-130)+(1.053)+(2.048), (I-130)+(1.053)+(2.049), (I-130)+(1.053)+(2.050), (I-130)+(1.053)+(2.051), (I-130)+(1.053)+(2.052), (I-130)+(1.053)+(2.053), (I-130)+(1.053)+(2.054), (I-130)+(1.053)+(2.055), (I-130)+(1.053)+(2.056), (I-130)+(1.053)+(2.057), (I-130)+(1.053)+(2.058), (I-130)+(1.053)+(2.059), (I-130)+(1.053)+(3.001), (I-130)+(1.053)+(3.002), (I-130)+(1.053)+(3.003), (I-130)+(1.053)+(3.004), (I-130)+(1.053)+(3.005), (I-130)+(1.053)+(3.006), (I-130)+(1.053)+(3.007), (I-130)+(1.053)+(3.008), (I-130)+(1.053)+(3.009), (I-130)+(1.053)+(3.010), (I-130)+(1.053)+(3.011), (I-130)+(1.053)+(3.012), (I-130)+(1.053)+(3.013), (I-130)+(1.053)+(3.014), (I-130)+(1.053)+(3.015), (I-130)+(1.053)+(3.016), (I-130)+(1.053)+(3.017), (I-130)+(1.053)+(3.018), (I-130)+(1.053)+(3.019), (I-130)+(1.053)+(3.020), (I-130)+(1.053)+(3.021), (I-130)+(1.053)+(3.022), (I-130)+(1.053)+(3.023), (I-130)+(1.053)+(3.024), (I-130)+(1.053)+(3.025), (I-130)+(1.053)+(3.026), (I-130)+(1.053)+(3.027), (I-130)+(1.053)+(3.028), (I-130)+(1.053)+(3.029), (I-130)+(1.053)+(3.030), (I-130)+(1.053)+(3.031), (I-130)+(1.053)+(5.001), (I-130)+(1.053)+(5.002), (I-130)+(1.053)+(5.003), (I-130)+(1.053)+(5.004), (I-130)+(1.053)+(5.005), (I-130)+(1.053)+(5.006), (I-130)+(1.053)+(5.007), (I-130)+(1.053)+(5.008), (I-130)+(1.053)+(5.009), (I-130)+(1.053)+(5.010), (I-130)+(1.053)+(5.011), (I-130)+(1.053)+(5.012), (I-130)+(1.053)+(5.013), (I-130)+(1.053)+(5.014), (I-130)+(1.053)+(5.015), (I-130)+(1.053)+(5.016), (I-130)+(1.053)+(5.017), (I-130)+(1.053)+(5.018), (I-130)+(1.053)+(5.019), (I-130)+(1.053)+(5.020), (I-130)+(1.053)+(5.021), (I-130)+(1.053)+(5.022), (I-130)+(1.053)+(5.023), (I-130)+(1.053)+(6.001), (I-130)+(1.053)+(6.002), (I-130)+(1.053)+(6.003), (I-130)+(1.053)+(6.004), (I-130)+(1.053)+(7.001), (I-130)+(1.053)+(7.002), (I-130)+(1.053)+(7.003), (I-130)+(1.053)+(7.004), (I-130)+(1.053)+(7.005), (I-130)+(1.053)+(7.006), (I-130)+(1.053)+(9.001), (I-130)+(1.053)+(9.002), (I-130)+(1.053)+(9.003), (I-130)+(1.053)+(9.004), (I-130)+(1.053)+(9.005), (I-130)+(1.053)+(9.006), (I-130)+(1.053)+(9.007), (I-130)+(1.053)+(9.008), (I-130)+(1.053)+(9.009), (I-130)+(1.053)+(14.001), (I-130)+(1.053)+(14.002), (I-130)+(1.053)+(15.008), (I-130)+(1.053)+(15.011), (I-130)+(1.053)+(15.012), (I-130)+(1.053)+(15.016), (I-130)+(1.053)+(15.025), (I-130)+(1.053)+(15.027), (I-130)+(1.053)+(15.047), (I-130)+(1.053)+(15.063), (I-130)+(1.053)+(15.064), (I-130)+(1.053)+(16.001), (I-130)+(1.053)+(16.002), (I-130)+(1.053)+(16.003), (I-130)+(1.053)+(16.004), (I-130)+(1.053)+(16.005), (I-130)+(1.053)+(16.006), (I-130)+(1.053)+(16.007), (I-130)+(1.053)+(16.008), (I-130)+(1.053)+(17.001), (I-130)+(1.053)+(17.002), (I-130)+(1.053)+(17.003), (I-130)+(1.053)+(17.004), (I-130)+(1.053)+(17.005), (I-130)+(1.053)+(17.006), (I-130)+(1.053)+(17.007), (I-130)+(1.053)+(17.008), (I-130)+(1.053)+(17.009), (I-130)+(1.053)+(17.010), (I-130)+(1.053)+(17.011), (I-130)+(1.053)+(17.012), (I-130)+(1.053)+(18.001), (I-130)+(1.054)+(1.055), (I-130)+(1.054)+(1.056), (I-130)+(1.054)+(1.057), (I-130)+(1.054)+(1.058), (I-130)+(1.054)+(1.059), (I-130)+(1.054)+(1.060), (I-130)+(1.054)+(1.061), (I-130)+(1.054)+(1.062), (I-130)+(1.054)+(1.063), (I-130)+(1.054)+(1.064), (I-130)+(1.054)+(1.065), (I-130)+(1.054)+(1.066), (I-130)+(1.054)+(1.067), (I-130)+(1.054)+(1.068), (I-130)+(1.054)+(1.069), (I-130)+(1.054)+(1.070), (I-130)+(1.054)+(1.071), (I-130)+(1.054)+(1.072), (I-130)+(1.054)+(1.073), (I-130)+(1.054)+(1.074), (I-130)+(1.054)+(1.075), (I-130)+(1.054)+(1.076), (I-130)+(1.054)+(1.077), (I-130)+(1.054)+(1.078), (I-130)+(1.054)+(1.079), (I-130)+(1.054)+(1.080), (I-130)+(1.054)+(1.081), (I-130)+(1.054)+(1.082), (I-130)+(1.054)+(1.083), (I-130)+(1.054)+(1.084), (I-130)+(1.054)+(1.085), (I-130)+(1.054)+(1.086), (I-130)+(1.054)+(1.087), (I-130)+(1.054)+(1.088), (I-130)+(1.054)+(1.089), (I-130)+(1.054)+(1.090), (I-130)+(1.054)+(1.091), (I-130)+(1.054)+(1.092), (I-130)+(1.054)+(2.001), (I-130)+(1.054)+(2.002), (I-130)+(1.054)+(2.003), (I-130)+(1.054)+(2.004), (I-130)+(1.054)+(2.005), (I-130)+(1.054)+(2.006), (I-130)+(1.054)+(2.007), (I-130)+(1.054)+(2.008), (I-130)+(1.054)+(2.009), (I-130)+(1.054)+(2.010), (I-130)+(1.054)+(2.011), (I-130)+(1.054)+(2.012), (I-130)+(1.054)+(2.013), (I-130)+(1.054)+(2.014), (I-130)+(1.054)+(2.015), (I-130)+(1.054)+(2.016), (I-130)+(1.054)+(2.017), (I-130)+(1.054)+(2.018), (I-130)+(1.054)+(2.019), (I-130)+(1.054)+(2.020), (I-130)+(1.054)+(2.021), (I-130)+(1.054)+(2.022), (I-130)+(1.054)+(2.023), (I-130)+(1.054)+(2.024), (I-130)+(1.054)+(2.025), (I-130)+(1.054)+(2.026), (I-130)+(1.054)+(2.027), (I-130)+(1.054)+(2.028), (I-130)+(1.054)+(2.029), (I-130)+(1.054)+(2.030), (I-130)+(1.054)+(2.031), (I-130)+(1.054)+(2.032), (I-130)+(1.054)+(2.033), (I-130)+(1.054)+(2.034), (I-130)+(1.054)+(2.035), (I-130)+(1.054)+(2.036), (I-130)+(1.054)+(2.037), (I-130)+(1.054)+(2.038), (I-130)+(1.054)+(2.039), (I-130)+(1.054)+(2.040), (I-130)+(1.054)+(2.041), (I-130)+(1.054)+(2.042), (I-130)+(1.054)+(2.043), (I-130)+(1.054)+(2.044), (I-130)+(1.054)+(2.045), (I-130)+(1.054)+(2.046), (I-130)+(1.054)+(2.047), (I-130)+(1.054)+(2.048), (I-130)+(1.054)+(2.049), (I-130)+(1.054)+(2.050), (I-130)+(1.054)+(2.051), (I-130)+(1.054)+(2.052), (I-130)+(1.054)+(2.053), (I-130)+(1.054)+(2.054), (I-130)+(1.054)+(2.055), (I-130)+(1.054)+(2.056), (I-130)+(1.054)+(2.057), (I-130)+(1.054)+(2.058), (I-130)+(1.054)+(2.059), (I-130)+(1.054)+(3.001), (I-130)+(1.054)+(3.002), (I-130)+(1.054)+(3.003), (I-130)+(1.054)+(3.004), (I-130)+(1.054)+(3.005), (I-130)+(1.054)+(3.006), (I-130)+(1.054)+(3.007), (I-130)+(1.054)+(3.008), (I-130)+(1.054)+(3.009), (I-130)+(1.054)+(3.010), (I-130)+(1.054)+(3.011), (I-130)+(1.054)+(3.012), (I-130)+(1.054)+(3.013), (I-130)+(1.054)+(3.014), (I-130)+(1.054)+(3.015), (I-130)+(1.054)+(3.016), (I-130)+(1.054)+(3.017), (I-130)+(1.054)+(3.018), (I-130)+(1.054)+(3.019), (I-130)+(1.054)+(3.020), (I-130)+(1.054)+(3.021), (I-130)+(1.054)+(3.022), (I-130)+(1.054)+(3.023), (I-130)+(1.054)+(3.024), (I-130)+(1.054)+(3.025), (I-130)+(1.054)+(3.026), (I-130)+(1.054)+(3.027), (I-130)+(1.054)+(3.028), (I-130)+(1.054)+(3.029), (I-130)+(1.054)+(3.030), (I-130)+(1.054)+(3.031), (I-130)+(1.054)+(5.001), (I-130)+(1.054)+(5.002), (I-130)+(1.054)+(5.003), (I-130)+(1.054)+(5.004), (I-130)+(1.054)+(5.005), (I-130)+(1.054)+(5.006), (I-130)+(1.054)+(5.007), (I-130)+(1.054)+(5.008), (I-130)+(1.054)+(5.009), (I-130)+(1.054)+(5.010), (I-130)+(1.054)+(5.011), (I-130)+(1.054)+(5.012), (I-130)+(1.054)+(5.013), (I-130)+(1.054)+(5.014), (I-130)+(1.054)+(5.015), (I-130)+(1.054)+(5.016), (I-130)+(1.054)+(5.017), (I-130)+(1.054)+(5.018), (I-130)+(1.054)+(5.019), (I-130)+(1.054)+(5.020), (I-130)+(1.054)+(5.021), (I-130)+(1.054)+(5.022), (I-130)+(1.054)+(5.023), (I-130)+(1.054)+(6.001), (I-130)+(1.054)+(6.002), (I-130)+(1.054)+(6.003), (I-130)+(1.054)+(6.004), (I-130)+(1.054)+(7.001), (I-130)+(1.054)+(7.002), (I-130)+(1.054)+(7.003), (I-130)+(1.054)+(7.004), (I-130)+(1.054)+(7.005), (I-130)+(1.054)+(7.006), (I-130)+(1.054)+(9.001), (I-130)+(1.054)+(9.002), (I-130)+(1.054)+(9.003), (I-130)+(1.054)+(9.004), (I-130)+(1.054)+(9.005), (I-130)+(1.054)+(9.006), (I-130)+(1.054)+(9.007), (I-130)+(1.054)+(9.008), (I-130)+(1.054)+(9.009), (I-130)+(1.054)+(14.001), (I-130)+(1.054)+(14.002), (I-130)+(1.054)+(15.008), (I-130)+(1.054)+(15.011), (I-130)+(1.054)+(15.012), (I-130)+(1.054)+(15.016), (I-130)+(1.054)+(15.025), (I-130)+(1.054)+(15.027), (I-130)+(1.054)+(15.047), (I-130)+(1.054)+(15.063), (I-130)+(1.054)+(15.064), (I-130)+(1.054)+(16.001), (I-130)+(1.054)+(16.002), (I-130)+(1.054)+(16.003), (I-130)+(1.054)+(16.004), (I-130)+(1.054)+(16.005), (I-130)+(1.054)+(16.006), (I-130)+(1.054)+(16.007), (I-130)+(1.054)+(16.008), (I-130)+(1.054)+(17.001), (I-130)+(1.054)+(17.002), (I-130)+(1.054)+(17.003), (I-130)+(1.054)+(17.004), (I-130)+(1.054)+(17.005), (I-130)+(1.054)+(17.006), (I-130)+(1.054)+(17.007), (I-130)+(1.054)+(17.008), (I-130)+(1.054)+(17.009), (I-130)+(1.054)+(17.010), (I-130)+(1.054)+(17.011), (I-130)+(1.054)+(17.012), (I-130)+(1.054)+(18.001), (I-130)+(1.055)+(1.056), (I-130)+(1.055)+(1.057), (I-130)+(1.055)+(1.058), (I-130)+(1.055)+(1.059), (I-130)+(1.055)+(1.060), (I-130)+(1.055)+(1.061), (I-130)+(1.055)+(1.062), (I-130)+(1.055)+(1.063), (I-130)+(1.055)+(1.064), (I-130)+(1.055)+(1.065), (I-130)+(1.055)+(1.066), (I-130)+(1.055)+(1.067), (I-130)+(1.055)+(1.068), (I-130)+(1.055)+(1.069), (I-130)+(1.055)+(1.070), (I-130)+(1.055)+(1.071), (I-130)+(1.055)+(1.072), (I-130)+(1.055)+(1.073), (I-130)+(1.055)+(1.074), (I-130)+(1.055)+(1.075), (I-130)+(1.055)+(1.076), (I-130)+(1.055)+(1.077), (I-130)+(1.055)+(1.078), (I-130)+(1.055)+(1.079), (I-130)+(1.055)+(1.080), (I-130)+(1.055)+(1.081), (I-130)+(1.055)+(1.082), (I-130)+(1.055)+(1.083), (I-130)+(1.055)+(1.084), (I-130)+(1.055)+(1.085), (I-130)+(1.055)+(1.086), (I-130)+(1.055)+(1.087), (I-130)+(1.055)+(1.088), (I-130)+(1.055)+(1.089), (I-130)+(1.055)+(1.090), (I-130)+(1.055)+(1.091), (I-130)+(1.055)+(1.092), (I-130)+(1.055)+(2.001), (I-130)+(1.055)+(2.002), (I-130)+(1.055)+(2.003), (I-130)+(1.055)+(2.004), (I-130)+(1.055)+(2.005), (I-130)+(1.055)+(2.006), (I-130)+(1.055)+(2.007), (I-130)+(1.055)+(2.008), (I-130)+(1.055)+(2.009), (I-130)+(1.055)+(2.010), (I-130)+(1.055)+(2.011), (I-130)+(1.055)+(2.012), (I-130)+(1.055)+(2.013), (I-130)+(1.055)+(2.014), (I-130)+(1.055)+(2.015), (I-130)+(1.055)+(2.016), (I-130)+(1.055)+(2.017), (I-130)+(1.055)+(2.018), (I-130)+(1.055)+(2.019), (I-130)+(1.055)+(2.020), (I-130)+(1.055)+(2.021), (I-130)+(1.055)+(2.022), (I-130)+(1.055)+(2.023), (I-130)+(1.055)+(2.024), (I-130)+(1.055)+(2.025), (I-130)+(1.055)+(2.026), (I-130)+(1.055)+(2.027), (I-130)+(1.055)+(2.028), (I-130)+(1.055)+(2.029), (I-130)+(1.055)+(2.030), (I-130)+(1.055)+(2.031), (I-130)+(1.055)+(2.032), (I-130)+(1.055)+(2.033), (I-130)+(1.055)+(2.034), (I-130)+(1.055)+(2.035), (I-130)+(1.055)+(2.036), (I-130)+(1.055)+(2.037), (I-130)+(1.055)+(2.038), (I-130)+(1.055)+(2.039), (I-130)+(1.055)+(2.040), (I-130)+(1.055)+(2.041), (I-130)+(1.055)+(2.042), (I-130)+(1.055)+(2.043), (I-130)+(1.055)+(2.044), (I-130)+(1.055)+(2.045), (I-130)+(1.055)+(2.046), (I-130)+(1.055)+(2.047), (I-130)+(1.055)+(2.048), (I-130)+(1.055)+(2.049), (I-130)+(1.055)+(2.050), (I-130)+(1.055)+(2.051), (I-130)+(1.055)+(2.052), (I-130)+(1.055)+(2.053), (I-130)+(1.055)+(2.054), (I-130)+(1.055)+(2.055), (I-130)+(1.055)+(2.056), (I-130)+(1.055)+(2.057), (I-130)+(1.055)+(2.058), (I-130)+(1.055)+(2.059), (I-130)+(1.055)+(3.001), (I-130)+(1.055)+(3.002), (I-130)+(1.055)+(3.003), (I-130)+(1.055)+(3.004), (I-130)+(1.055)+(3.005), (I-130)+(1.055)+(3.006), (I-130)+(1.055)+(3.007), (I-130)+(1.055)+(3.008), (I-130)+(1.055)+(3.009), (I-130)+(1.055)+(3.010), (I-130)+(1.055)+(3.011), (I-130)+(1.055)+(3.012), (I-130)+(1.055)+(3.013), (I-130)+(1.055)+(3.014), (I-130)+(1.055)+(3.015), (I-130)+(1.055)+(3.016), (I-130)+(1.055)+(3.017), (I-130)+(1.055)+(3.018), (I-130)+(1.055)+(3.019), (I-130)+(1.055)+(3.020), (I-130)+(1.055)+(3.021), (I-130)+(1.055)+(3.022), (I-130)+(1.055)+(3.023), (I-130)+(1.055)+(3.024), (I-130)+(1.055)+(3.025), (I-130)+(1.055)+(3.026), (I-130)+(1.055)+(3.027), (I-130)+(1.055)+(3.028), (I-130)+(1.055)+(3.029), (I-130)+(1.055)+(3.030), (I-130)+(1.055)+(3.031), (I-130)+(1.055)+(5.001), (I-130)+(1.055)+(5.002), (I-130)+(1.055)+(5.003), (I-130)+(1.055)+(5.004), (I-130)+(1.055)+(5.005), (I-130)+(1.055)+(5.006), (I-130)+(1.055)+(5.007), (I-130)+(1.055)+(5.008), (I-130)+(1.055)+(5.009), (I-130)+(1.055)+(5.010), (I-130)+(1.055)+(5.011), (I-130)+(1.055)+(5.012), (I-130)+(1.055)+(5.013), (I-130)+(1.055)+(5.014), (I-130)+(1.055)+(5.015), (I-130)+(1.055)+(5.016), (I-130)+(1.055)+(5.017), (I-130)+(1.055)+(5.018), (I-130)+(1.055)+(5.019), (I-130)+(1.055)+(5.020), (I-130)+(1.055)+(5.021), (I-130)+(1.055)+(5.022), (I-130)+(1.055)+(5.023), (I-130)+(1.055)+(6.001), (I-130)+(1.055)+(6.002), (I-130)+(1.055)+(6.003), (I-130)+(1.055)+(6.004), (I-130)+(1.055)+(7.001), (I-130)+(1.055)+(7.002), (I-130)+(1.055)+(7.003), (I-130)+(1.055)+(7.004), (I-130)+(1.055)+(7.005), (I-130)+(1.055)+(7.006), (I-130)+(1.055)+(9.001), (I-130)+(1.055)+(9.002), (I-130)+(1.055)+(9.003), (I-130)+(1.055)+(9.004), (I-130)+(1.055)+(9.005), (I-130)+(1.055)+(9.006), (I-130)+(1.055)+(9.007), (I-130)+(1.055)+(9.008), (I-130)+(1.055)+(9.009), (I-130)+(1.055)+(14.001), (I-130)+(1.055)+(14.002), (I-130)+(1.055)+(15.008), (I-130)+(1.055)+(15.011), (I-130)+(1.055)+(15.012), (I-130)+(1.055)+(15.016), (I-130)+(1.055)+(15.025), (I-130)+(1.055)+(15.027), (I-130)+(1.055)+(15.047), (I-130)+(1.055)+(15.063), (I-130)+(1.055)+(15.064), (I-130)+(1.055)+(16.001), (I-130)+(1.055)+(16.002), (I-130)+(1.055)+(16.003), (I-130)+(1.055)+(16.004), (I-130)+(1.055)+(16.005), (I-130)+(1.055)+(16.006), (I-130)+(1.055)+(16.007), (I-130)+(1.055)+(16.008), (I-130)+(1.055)+(17.001), (I-130)+(1.055)+(17.002), (I-130)+(1.055)+(17.003), (I-130)+(1.055)+(17.004), (I-130)+(1.055)+(17.005), (I-130)+(1.055)+(17.006), (I-130)+(1.055)+(17.007), (I-130)+(1.055)+(17.008), (I-130)+(1.055)+(17.009), (I-130)+(1.055)+(17.010), (I-130)+(1.055)+(17.011), (I-130)+(1.055)+(17.012), (I-130)+(1.055)+(18.001), (I-130)+(1.056)+(1.057), (I-130)+(1.056)+(1.058), (I-130)+(1.056)+(1.059), (I-130)+(1.056)+(1.060), (I-130)+(1.056)+(1.061), (I-130)+(1.056)+(1.062), (I-130)+(1.056)+(1.063), (I-130)+(1.056)+(1.064), (I-130)+(1.056)+(1.065), (I-130)+(1.056)+(1.066), (I-130)+(1.056)+(1.067), (I-130)+(1.056)+(1.068), (I-130)+(1.056)+(1.069), (I-130)+(1.056)+(1.070), (I-130)+(1.056)+(1.071), (I-130)+(1.056)+(1.072), (I-130)+(1.056)+(1.073), (I-130)+(1.056)+(1.074), (I-130)+(1.056)+(1.075), (I-130)+(1.056)+(1.076), (I-130)+(1.056)+(1.077), (I-130)+(1.056)+(1.078), (I-130)+(1.056)+(1.079), (I-130)+(1.056)+(1.080), (I-130)+(1.056)+(1.081), (I-130)+(1.056)+(1.082), (I-130)+(1.056)+(1.083), (I-130)+(1.056)+(1.084), (I-130)+(1.056)+(1.085), (I-130)+(1.056)+(1.086), (I-130)+(1.056)+(1.087), (I-130)+(1.056)+(1.088), (I-130)+(1.056)+(1.089), (I-130)+(1.056)+(1.090), (I-130)+(1.056)+(1.091), (I-130)+(1.056)+(1.092), (I-130)+(1.056)+(2.001), (I-130)+(1.056)+(2.002), (I-130)+(1.056)+(2.003), (I-130)+(1.056)+(2.004), (I-130)+(1.056)+(2.005), (I-130)+(1.056)+(2.006), (I-130)+(1.056)+(2.007), (I-130)+(1.056)+(2.008), (I-130)+(1.056)+(2.009), (I-130)+(1.056)+(2.010), (I-130)+(1.056)+(2.011), (I-130)+(1.056)+(2.012), (I-130)+(1.056)+(2.013), (I-130)+(1.056)+(2.014), (I-130)+(1.056)+(2.015), (I-130)+(1.056)+(2.016), (I-130)+(1.056)+(2.017), (I-130)+(1.056)+(2.018), (I-130)+(1.056)+(2.019), (I-130)+(1.056)+(2.020), (I-130)+(1.056)+(2.021), (I-130)+(1.056)+(2.022), (I-130)+(1.056)+(2.023), (I-130)+(1.056)+(2.024), (I-130)+(1.056)+(2.025), (I-130)+(1.056)+(2.026), (I-130)+(1.056)+(2.027), (I-130)+(1.056)+(2.028), (I-130)+(1.056)+(2.029), (I-130)+(1.056)+(2.030), (I-130)+(1.056)+(2.031), (I-130)+(1.056)+(2.032), (I-130)+(1.056)+(2.033), (I-130)+(1.056)+(2.034), (I-130)+(1.056)+(2.035), (I-130)+(1.056)+(2.036), (I-130)+(1.056)+(2.037), (I-130)+(1.056)+(2.038), (I-130)+(1.056)+(2.039), (I-130)+(1.056)+(2.040), (I-130)+(1.056)+(2.041), (I-130)+(1.056)+(2.042), (I-130)+(1.056)+(2.043), (I-130)+(1.056)+(2.044), (I-130)+(1.056)+(2.045), (I-130)+(1.056)+(2.046), (I-130)+(1.056)+(2.047), (I-130)+(1.056)+(2.048), (I-130)+(1.056)+(2.049), (I-130)+(1.056)+(2.050), (I-130)+(1.056)+(2.051), (I-130)+(1.056)+(2.052), (I-130)+(1.056)+(2.053), (I-130)+(1.056)+(2.054), (I-130)+(1.056)+(2.055), (I-130)+(1.056)+(2.056), (I-130)+(1.056)+(2.057), (I-130)+(1.056)+(2.058), (I-130)+(1.056)+(2.059), (I-130)+(1.056)+(3.001), (I-130)+(1.056)+(3.002), (I-130)+(1.056)+(3.003), (I-130)+(1.056)+(3.004), (I-130)+(1.056)+(3.005), (I-130)+(1.056)+(3.006), (I-130)+(1.056)+(3.007), (I-130)+(1.056)+(3.008), (I-130)+(1.056)+(3.009), (I-130)+(1.056)+(3.010), (I-130)+(1.056)+(3.011), (I-130)+(1.056)+(3.012), (I-130)+(1.056)+(3.013), (I-130)+(1.056)+(3.014), (I-130)+(1.056)+(3.015), (I-130)+(1.056)+(3.016), (I-130)+(1.056)+(3.017), (I-130)+(1.056)+(3.018), (I-130)+(1.056)+(3.019), (I-130)+(1.056)+(3.020), (I-130)+(1.056)+(3.021), (I-130)+(1.056)+(3.022), (I-130)+(1.056)+(3.023), (I-130)+(1.056)+(3.024), (I-130)+(1.056)+(3.025), (I-130)+(1.056)+(3.026), (I-130)+(1.056)+(3.027), (I-130)+(1.056)+(3.028), (I-130)+(1.056)+(3.029), (I-130)+(1.056)+(3.030), (I-130)+(1.056)+(3.031), (I-130)+(1.056)+(5.001), (I-130)+(1.056)+(5.002), (I-130)+(1.056)+(5.003), (I-130)+(1.056)+(5.004), (I-130)+(1.056)+(5.005), (I-130)+(1.056)+(5.006), (I-130)+(1.056)+(5.007), (I-130)+(1.056)+(5.008), (I-130)+(1.056)+(5.009), (I-130)+(1.056)+(5.010), (I-130)+(1.056)+(5.011), (I-130)+(1.056)+(5.012), (I-130)+(1.056)+(5.013), (I-130)+(1.056)+(5.014), (I-130)+(1.056)+(5.015), (I-130)+(1.056)+(5.016), (I-130)+(1.056)+(5.017), (I-130)+(1.056)+(5.018), (I-130)+(1.056)+(5.019), (I-130)+(1.056)+(5.020), (I-130)+(1.056)+(5.021), (I-130)+(1.056)+(5.022), (I-130)+(1.056)+(5.023), (I-130)+(1.056)+(6.001), (I-130)+(1.056)+(6.002), (I-130)+(1.056)+(6.003), (I-130)+(1.056)+(6.004), (I-130)+(1.056)+(7.001), (I-130)+(1.056)+(7.002), (I-130)+(1.056)+(7.003), (I-130)+(1.056)+(7.004), (I-130)+(1.056)+(7.005), (I-130)+(1.056)+(7.006), (I-130)+(1.056)+(9.001), (I-130)+(1.056)+(9.002), (I-130)+(1.056)+(9.003), (I-130)+(1.056)+(9.004), (I-130)+(1.056)+(9.005), (I-130)+(1.056)+(9.006), (I-130)+(1.056)+(9.007), (I-130)+(1.056)+(9.008), (I-130)+(1.056)+(9.009), (I-130)+(1.056)+(14.001), (I-130)+(1.056)+(14.002), (I-130)+(1.056)+(15.008), (I-130)+(1.056)+(15.011), (I-130)+(1.056)+(15.012), (I-130)+(1.056)+(15.016), (I-130)+(1.056)+(15.025), (I-130)+(1.056)+(15.027), (I-130)+(1.056)+(15.047), (I-130)+(1.056)+(15.063), (I-130)+(1.056)+(15.064), (I-130)+(1.056)+(16.001), (I-130)+(1.056)+(16.002), (I-130)+(1.056)+(16.003), (I-130)+(1.056)+(16.004), (I-130)+(1.056)+(16.005), (I-130)+(1.056)+(16.006), (I-130)+(1.056)+(16.007), (I-130)+(1.056)+(16.008), (I-130)+(1.056)+(17.001), (I-130)+(1.056)+(17.002), (I-130)+(1.056)+(17.003), (I-130)+(1.056)+(17.004), (I-130)+(1.056)+(17.005), (I-130)+(1.056)+(17.006), (I-130)+(1.056)+(17.007), (I-130)+(1.056)+(17.008), (I-130)+(1.056)+(17.009), (I-130)+(1.056)+(17.010), (I-130)+(1.056)+(17.011), (I-130)+(1.056)+(17.012), (I-130)+(1.056)+(18.001), (I-130)+(1.057)+(1.058), (I-130)+(1.057)+(1.059), (I-130)+(1.057)+(1.060), (I-130)+(1.057)+(1.061), (I-130)+(1.057)+(1.062), (I-130)+(1.057)+(1.063), (I-130)+(1.057)+(1.064), (I-130)+(1.057)+(1.065), (I-130)+(1.057)+(1.066), (I-130)+(1.057)+(1.067), (I-130)+(1.057)+(1.068), (I-130)+(1.057)+(1.069), (I-130)+(1.057)+(1.070), (I-130)+(1.057)+(1.071), (I-130)+(1.057)+(1.072), (I-130)+(1.057)+(1.073), (I-130)+(1.057)+(1.074), (I-130)+(1.057)+(1.075), (I-130)+(1.057)+(1.076), (I-130)+(1.057)+(1.077), (I-130)+(1.057)+(1.078), (I-130)+(1.057)+(1.079), (I-130)+(1.057)+(1.080), (I-130)+(1.057)+(1.081), (I-130)+(1.057)+(1.082), (I-130)+(1.057)+(1.083), (I-130)+(1.057)+(1.084), (I-130)+(1.057)+(1.085), (I-130)+(1.057)+(1.086), (I-130)+(1.057)+(1.087), (I-130)+(1.057)+(1.088), (I-130)+(1.057)+(1.089), (I-130)+(1.057)+(1.090), (I-130)+(1.057)+(1.091), (I-130)+(1.057)+(1.092), (I-130)+(1.057)+(2.001), (I-130)+(1.057)+(2.002), (I-130)+(1.057)+(2.003), (I-130)+(1.057)+(2.004), (I-130)+(1.057)+(2.005), (I-130)+(1.057)+(2.006), (I-130)+(1.057)+(2.007), (I-130)+(1.057)+(2.008), (I-130)+(1.057)+(2.009), (I-130)+(1.057)+(2.010), (I-130)+(1.057)+(2.011), (I-130)+(1.057)+(2.012), (I-130)+(1.057)+(2.013), (I-130)+(1.057)+(2.014), (I-130)+(1.057)+(2.015), (I-130)+(1.057)+(2.016), (I-130)+(1.057)+(2.017), (I-130)+(1.057)+(2.018), (I-130)+(1.057)+(2.019), (I-130)+(1.057)+(2.020), (I-130)+(1.057)+(2.021), (I-130)+(1.057)+(2.022), (I-130)+(1.057)+(2.023), (I-130)+(1.057)+(2.024), (I-130)+(1.057)+(2.025), (I-130)+(1.057)+(2.026), (I-130)+(1.057)+(2.027), (I-130)+(1.057)+(2.028), (I-130)+(1.057)+(2.029), (I-130)+(1.057)+(2.030), (I-130)+(1.057)+(2.031), (I-130)+(1.057)+(2.032), (I-130)+(1.057)+(2.033), (I-130)+(1.057)+(2.034), (I-130)+(1.057)+(2.035), (I-130)+(1.057)+(2.036), (I-130)+(1.057)+(2.037), (I-130)+(1.057)+(2.038), (I-130)+(1.057)+(2.039), (I-130)+(1.057)+(2.040), (I-130)+(1.057)+(2.041), (I-130)+(1.057)+(2.042), (I-130)+(1.057)+(2.043), (I-130)+(1.057)+(2.044), (I-130)+(1.057)+(2.045), (I-130)+(1.057)+(2.046), (I-130)+(1.057)+(2.047), (I-130)+(1.057)+(2.048), (I-130)+(1.057)+(2.049), (I-130)+(1.057)+(2.050), (I-130)+(1.057)+(2.051), (I-130)+(1.057)+(2.052), (I-130)+(1.057)+(2.053), (I-130)+(1.057)+(2.054), (I-130)+(1.057)+(2.055), (I-130)+(1.057)+(2.056), (I-130)+(1.057)+(2.057), (I-130)+(1.057)+(2.058), (I-130)+(1.057)+(2.059), (I-130)+(1.057)+(3.001), (I-130)+(1.057)+(3.002), (I-130)+(1.057)+(3.003), (I-130)+(1.057)+(3.004), (I-130)+(1.057)+(3.005), (I-130)+(1.057)+(3.006), (I-130)+(1.057)+(3.007), (I-130)+(1.057)+(3.008), (I-130)+(1.057)+(3.009), (I-130)+(1.057)+(3.010), (I-130)+(1.057)+(3.011), (I-130)+(1.057)+(3.012), (I-130)+(1.057)+(3.013), (I-130)+(1.057)+(3.014), (I-130)+(1.057)+(3.015), (I-130)+(1.057)+(3.016), (I-130)+(1.057)+(3.017), (I-130)+(1.057)+(3.018), (I-130)+(1.057)+(3.019), (I-130)+(1.057)+(3.020), (I-130)+(1.057)+(3.021), (I-130)+(1.057)+(3.022), (I-130)+(1.057)+(3.023), (I-130)+(1.057)+(3.024), (I-130)+(1.057)+(3.025), (I-130)+(1.057)+(3.026), (I-130)+(1.057)+(3.027), (I-130)+(1.057)+(3.028), (I-130)+(1.057)+(3.029), (I-130)+(1.057)+(3.030), (I-130)+(1.057)+(3.031), (I-130)+(1.057)+(5.001), (I-130)+(1.057)+(5.002), (I-130)+(1.057)+(5.003), (I-130)+(1.057)+(5.004), (I-130)+(1.057)+(5.005), (I-130)+(1.057)+(5.006), (I-130)+(1.057)+(5.007), (I-130)+(1.057)+(5.008), (I-130)+(1.057)+(5.009), (I-130)+(1.057)+(5.010), (I-130)+(1.057)+(5.011), (I-130)+(1.057)+(5.012), (I-130)+(1.057)+(5.013), (I-130)+(1.057)+(5.014), (I-130)+(1.057)+(5.015), (I-130)+(1.057)+(5.016), (I-130)+(1.057)+(5.017), (I-130)+(1.057)+(5.018), (I-130)+(1.057)+(5.019), (I-130)+(1.057)+(5.020), (I-130)+(1.057)+(5.021), (I-130)+(1.057)+(5.022), (I-130)+(1.057)+(5.023), (I-130)+(1.057)+(6.001), (I-130)+(1.057)+(6.002), (I-130)+(1.057)+(6.003), (I-130)+(1.057)+(6.004), (I-130)+(1.057)+(7.001), (I-130)+(1.057)+(7.002), (I-130)+(1.057)+(7.003), (I-130)+(1.057)+(7.004), (I-130)+(1.057)+(7.005), (I-130)+(1.057)+(7.006), (I-130)+(1.057)+(9.001), (I-130)+(1.057)+(9.002), (I-130)+(1.057)+(9.003), (I-130)+(1.057)+(9.004), (I-130)+(1.057)+(9.005), (I-130)+(1.057)+(9.006), (I-130)+(1.057)+(9.007), (I-130)+(1.057)+(9.008), (I-130)+(1.057)+(9.009), (I-130)+(1.057)+(14.001), (I-130)+(1.057)+(14.002), (I-130)+(1.057)+(15.008), (I-130)+(1.057)+(15.011), (I-130)+(1.057)+(15.012), (I-130)+(1.057)+(15.016), (I-130)+(1.057)+(15.025), (I-130)+(1.057)+(15.027), (I-130)+(1.057)+(15.047), (I-130)+(1.057)+(15.063), (I-130)+(1.057)+(15.064), (I-130)+(1.057)+(16.001), (I-130)+(1.057)+(16.002), (I-130)+(1.057)+(16.003), (I-130)+(1.057)+(16.004), (I-130)+(1.057)+(16.005), (I-130)+(1.057)+(16.006), (I-130)+(1.057)+(16.007), (I-130)+(1.057)+(16.008), (I-130)+(1.057)+(17.001), (I-130)+(1.057)+(17.002), (I-130)+(1.057)+(17.003), (I-130)+(1.057)+(17.004), (I-130)+(1.057)+(17.005), (I-130)+(1.057)+(17.006), (I-130)+(1.057)+(17.007), (I-130)+(1.057)+(17.008), (I-130)+(1.057)+(17.009), (I-130)+(1.057)+(17.010), (I-130)+(1.057)+(17.011), (I-130)+(1.057)+(17.012), (I-130)+(1.057)+(18.001),
(I-130)+(1.058)+(1.059), (I-130)+(1.058)+(1.060), (I-130)+(1.058)+(1.061), (I-130)+(1.058)+(1.062), (I-130)+(1.058)+(1.063), (I-130)+(1.058)+(1.064), (I-130)+(1.058)+(1.065), (I-130)+(1.058)+(1.066), (I-130)+(1.058)+(1.067), (I-130)+(1.058)+(1.068), (I-130)+(1.058)+(1.069), (I-130)+(1.058)+(1.070), (I-130)+(1.058)+(1.071), (I-130)+(1.058)+(1.072), (I-130)+(1.058)+(1.073), (I-130)+(1.058)+(1.074), (I-130)+(1.058)+(1.075), (I-130)+(1.058)+(1.076), (I-130)+(1.058)+(1.077), (I-130)+(1.058)+(1.078), (I-130)+(1.058)+(1.079), (I-130)+(1.058)+(1.080), (I-130)+(1.058)+(1.081), (I-130)+(1.058)+(1.082), (I-130)+(1.058)+(1.083), (I-130)+(1.058)+(1.084), (I-130)+(1.058)+(1.085), (I-130)+(1.058)+(1.086), (I-130)+(1.058)+(1.087), (I-130)+(1.058)+(1.088), (I-130)+(1.058)+(1.089), (I-130)+(1.058)+(1.090), (I-130)+(1.058)+(1.091), (I-130)+(1.058)+(1.092), (I-130)+(1.058)+(2.001), (I-130)+(1.058)+(2.002), (I-130)+(1.058)+(2.003), (I-130)+(1.058)+(2.004), (I-130)+(1.058)+(2.005), (I-130)+(1.058)+(2.006), (I-130)+(1.058)+(2.007), (I-130)+(1.058)+(2.008), (I-130)+(1.058)+(2.009), (I-130)+(1.058)+(2.010), (I-130)+(1.058)+(2.011), (I-130)+(1.058)+(2.012), (I-130)+(1.058)+(2.013), (I-130)+(1.058)+(2.014), (I-130)+(1.058)+(2.015), (I-130)+(1.058)+(2.016), (I-130)+(1.058)+(2.017), (I-130)+(1.058)+(2.018), (I-130)+(1.058)+(2.019), (I-130)+(1.058)+(2.020), (I-130)+(1.058)+(2.021), (I-130)+(1.058)+(2.022), (I-130)+(1.058)+(2.023), (I-130)+(1.058)+(2.024), (I-130)+(1.058)+(2.025), (I-130)+(1.058)+(2.026), (I-130)+(1.058)+(2.027), (I-130)+(1.058)+(2.028), (I-130)+(1.058)+(2.029), (I-130)+(1.058)+(2.030), (I-130)+(1.058)+(2.031), (I-130)+(1.058)+(2.032), (I-130)+(1.058)+(2.033), (I-130)+(1.058)+(2.034), (I-130)+(1.058)+(2.035), (I-130)+(1.058)+(2.036), (I-130)+(1.058)+(2.037), (I-130)+(1.058)+(2.038), (I-130)+(1.058)+(2.039), (I-130)+(1.058)+(2.040), (I-130)+(1.058)+(2.041), (I-130)+(1.058)+(2.042), (I-130)+(1.058)+(2.043), (I-130)+(1.058)+(2.044), (I-130)+(1.058)+(2.045), (I-130)+(1.058)+(2.046), (I-130)+(1.058)+(2.047), (I-130)+(1.058)+(2.048), (I-130)+(1.058)+(2.049), (I-130)+(1.058)+(2.050), (I-130)+(1.058)+(2.051), (I-130)+(1.058)+(2.052), (I-130)+(1.058)+(2.053), (I-130)+(1.058)+(2.054), (I-130)+(1.058)+(2.055), (I-130)+(1.058)+(2.056), (I-130)+(1.058)+(2.057), (I-130)+(1.058)+(2.058), (I-130)+(1.058)+(2.059), (I-130)+(1.058)+(3.001), (I-130)+(1.058)+(3.002), (I-130)+(1.058)+(3.003), (I-130)+(1.058)+(3.004), (I-130)+(1.058)+(3.005), (I-130)+(1.058)+(3.006), (I-130)+(1.058)+(3.007), (I-130)+(1.058)+(3.008), (I-130)+(1.058)+(3.009), (I-130)+(1.058)+(3.010), (I-130)+(1.058)+(3.011), (I-130)+(1.058)+(3.012), (I-130)+(1.058)+(3.013), (I-130)+(1.058)+(3.014), (I-130)+(1.058)+(3.015), (I-130)+(1.058)+(3.016), (I-130)+(1.058)+(3.017), (I-130)+(1.058)+(3.018), (I-130)+(1.058)+(3.019), (I-130)+(1.058)+(3.020), (I-130)+(1.058)+(3.021), (I-130)+(1.058)+(3.022), (I-130)+(1.058)+(3.023), (I-130)+(1.058)+(3.024), (I-130)+(1.058)+(3.025), (I-130)+(1.058)+(3.026), (I-130)+(1.058)+(3.027), (I-130)+(1.058)+(3.028), (I-130)+(1.058)+(3.029), (I-130)+(1.058)+(3.030), (I-130)+(1.058)+(3.031), (I-130)+(1.058)+(5.001), (I-130)+(1.058)+(5.002), (I-130)+(1.058)+(5.003), (I-130)+(1.058)+(5.004), (I-130)+(1.058)+(5.005), (I-130)+(1.058)+(5.006), (I-130)+(1.058)+(5.007), (I-130)+(1.058)+(5.008), (I-130)+(1.058)+(5.009), (I-130)+(1.058)+(5.010), (I-130)+(1.058)+(5.011), (I-130)+(1.058)+(5.012), (I-130)+(1.058)+(5.013), (I-130)+(1.058)+(5.014), (I-130)+(1.058)+(5.015), (I-130)+(1.058)+(5.016), (I-130)+(1.058)+(5.017), (I-130)+(1.058)+(5.018), (I-130)+(1.058)+(5.019), (I-130)+(1.058)+(5.020), (I-130)+(1.058)+(5.021), (I-130)+(1.058)+(5.022), (I-130)+(1.058)+(5.023), (I-130)+(1.058)+(6.001), (I-130)+(1.058)+(6.002), (I-130)+(1.058)+(6.003), (I-130)+(1.058)+(6.004), (I-130)+(1.058)+(7.001), (I-130)+(1.058)+(7.002), (I-130)+(1.058)+(7.003), (I-130)+(1.058)+(7.004), (I-130)+(1.058)+(7.005), (I-130)+(1.058)+(7.006), (I-130)+(1.058)+(9.001), (I-130)+(1.058)+(9.002), (I-130)+(1.058)+(9.003), (I-130)+(1.058)+(9.004), (I-130)+(1.058)+(9.005), (I-130)+(1.058)+(9.006), (I-130)+(1.058)+(9.007), (I-130)+(1.058)+(9.008), (I-130)+(1.058)+(9.009), (I-130)+(1.058)+(14.001), (I-130)+(1.058)+(14.002), (I-130)+(1.058)+(15.008), (I-130)+(1.058)+(15.011), (I-130)+(1.058)+(15.012), (I-130)+(1.058)+(15.016), (I-130)+(1.058)+(15.025), (I-130)+(1.058)+(15.027), (I-130)+(1.058)+(15.047), (I-130)+(1.058)+(15.063), (I-130)+(1.058)+(15.064), (I-130)+(1.058)+(16.001), (I-130)+(1.058)+(16.002), (I-130)+(1.058)+(16.003), (I-130)+(1.058)+(16.004), (I-130)+(1.058)+(16.005), (I-130)+(1.058)+(16.006), (I-130)+(1.058)+(16.007), (I-130)+(1.058)+(16.008), (I-130)+(1.058)+(17.001), (I-130)+(1.058)+(17.002), (I-130)+(1.058)+(17.003), (I-130)+(1.058)+(17.004), (I-130)+(1.058)+(17.005), (I-130)+(1.058)+(17.006), (I-130)+(1.058)+(17.007), (I-130)+(1.058)+(17.008), (I-130)+(1.058)+(17.009), (I-130)+(1.058)+(17.010), (I-130)+(1.058)+(17.011), (I-130)+(1.058)+(17.012), (I-130)+(1.058)+(18.001),
(I-130)+(1.059)+(1.060), (I-130)+(1.059)+(1.061), (I-130)+(1.059)+(1.062), (I-130)+(1.059)+(1.063), (I-130)+(1.059)+(1.064), (I-130)+(1.059)+(1.065), (I-130)+(1.059)+(1.066), (I-130)+(1.059)+(1.067), (I-130)+(1.059)+(1.068), (I-130)+(1.059)+(1.069), (I-130)+(1.059)+(1.070), (I-130)+(1.059)+(1.071), (I-130)+(1.059)+(1.072), (I-130)+(1.059)+(1.073), (I-130)+(1.059)+(1.074), (I-130)+(1.059)+(1.075), (I-130)+(1.059)+(1.076), (I-130)+(1.059)+(1.077), (I-130)+(1.059)+(1.078), (I-130)+(1.059)+(1.079), (I-130)+(1.059)+(1.080), (I-130)+(1.059)+(1.081), (I-130)+(1.059)+(1.082), (I-130)+(1.059)+(1.083), (I-130)+(1.059)+(1.084), (I-130)+(1.059)+(1.085), (I-130)+(1.059)+(1.086), (I-130)+(1.059)+(1.087), (I-130)+(1.059)+(1.088), (I-130)+(1.059)+(1.089), (I-130)+(1.059)+(1.090), (I-130)+(1.059)+(1.091), (I-130)+(1.059)+(1.092), (I-130)+(1.059)+(2.001), (I-130)+(1.059)+(2.002), (I-130)+(1.059)+(2.003), (I-130)+(1.059)+(2.004), (I-130)+(1.059)+(2.005), (I-130)+(1.059)+(2.006), (I-130)+(1.059)+(2.007), (I-130)+(1.059)+(2.008), (I-130)+(1.059)+(2.009), (I-130)+(1.059)+(2.010), (I-130)+(1.059)+(2.011), (I-130)+(1.059)+(2.012), (I-130)+(1.059)+(2.013), (I-130)+(1.059)+(2.014), (I-130)+(1.059)+(2.015), (I-130)+(1.059)+(2.016), (I-130)+(1.059)+(2.017), (I-130)+(1.059)+(2.018), (I-130)+(1.059)+(2.019), (I-130)+(1.059)+(2.020), (I-130)+(1.059)+(2.021), (I-130)+(1.059)+(2.022), (I-130)+(1.059)+(2.023), (I-130)+(1.059)+(2.024), (I-130)+(1.059)+(2.025), (I-130)+(1.059)+(2.026), (I-130)+(1.059)+(2.027), (I-130)+(1.059)+(2.028), (I-130)+(1.059)+(2.029), (I-130)+(1.059)+(2.030), (I-130)+(1.059)+(2.031), (I-130)+(1.059)+(2.032), (I-130)+(1.059)+(2.033), (I-130)+(1.059)+(2.034), (I-130)+(1.059)+(2.035), (I-130)+(1.059)+(2.036), (I-130)+(1.059)+(2.037), (I-130)+(1.059)+(2.038), (I-130)+(1.059)+(2.039), (I-130)+(1.059)+(2.040), (I-130)+(1.059)+(2.041), (I-130)+(1.059)+(2.042), (I-130)+(1.059)+(2.043), (I-130)+(1.059)+(2.044), (I-130)+(1.059)+(2.045), (I-130)+(1.059)+(2.046), (I-130)+(1.059)+(2.047), (I-130)+(1.059)+(2.048), (I-130)+(1.059)+(2.049), (I-130)+(1.059)+(2.050), (I-130)+(1.059)+(2.051), (I-130)+(1.059)+(2.052), (I-130)+(1.059)+(2.053), (I-130)+(1.059)+(2.054), (I-130)+(1.059)+(2.055), (I-130)+(1.059)+(2.056), (I-130)+(1.059)+(2.057), (I-130)+(1.059)+(2.058), (I-130)+(1.059)+(2.059), (I-130)+(1.059)+(3.001), (I-130)+(1.059)+(3.002), (I-130)+(1.059)+(3.003), (I-130)+(1.059)+(3.004), (I-130)+(1.059)+(3.005), (I-130)+(1.059)+(3.006), (I-130)+(1.059)+(3.007), (I-130)+(1.059)+(3.008), (I-130)+(1.059)+(3.009), (I-130)+(1.059)+(3.010), (I-130)+(1.059)+(3.011), (I-130)+(1.059)+(3.012), (I-130)+(1.059)+(3.013), (I-130)+(1.059)+(3.014), (I-130)+(1.059)+(3.015), (I-130)+(1.059)+(3.016), (I-130)+(1.059)+(3.017), (I-130)+(1.059)+(3.018), (I-130)+(1.059)+(3.019), (I-130)+(1.059)+(3.020), (I-130)+(1.059)+(3.021), (I-130)+(1.059)+(3.022), (I-130)+(1.059)+(3.023), (I-130)+(1.059)+(3.024), (I-130)+(1.059)+(3.025), (I-130)+(1.059)+(3.026), (I-130)+(1.059)+(3.027), (I-130)+(1.059)+(3.028), (I-130)+(1.059)+(3.029), (I-130)+(1.059)+(3.030), (I-130)+(1.059)+(3.031), (I-130)+(1.059)+(5.001), (I-130)+(1.059)+(5.002), (I-130)+(1.059)+(5.003), (I-130)+(1.059)+(5.004), (I-130)+(1.059)+(5.005), (I-130)+(1.059)+(5.006), (I-130)+(1.059)+(5.007), (I-130)+(1.059)+(5.008), (I-130)+(1.059)+(5.009), (I-130)+(1.059)+(5.010), (I-130)+(1.059)+(5.011), (I-130)+(1.059)+(5.012), (I-130)+(1.059)+(5.013), (I-130)+(1.059)+(5.014), (I-130)+(1.059)+(5.015), (I-130)+(1.059)+(5.016), (I-130)+(1.059)+(5.017), (I-130)+(1.059)+(5.018), (I-130)+(1.059)+(5.019), (I-130)+(1.059)+(5.020), (I-130)+(1.059)+(5.021), (I-130)+(1.059)+(5.022), (I-130)+(1.059)+(5.023), (I-130)+(1.059)+(6.001), (I-130)+(1.059)+(6.002), (I-130)+(1.059)+(6.003), (I-130)+(1.059)+(6.004), (I-130)+(1.059)+(7.001), (I-130)+(1.059)+(7.002), (I-130)+(1.059)+(7.003), (I-130)+(1.059)+(7.004), (I-130)+(1.059)+(7.005), (I-130)+(1.059)+(7.006), (I-130)+(1.059)+(9.001), (I-130)+(1.059)+(9.002), (I-130)+(1.059)+(9.003), (I-130)+(1.059)+(9.004), (I-130)+(1.059)+(9.005), (I-130)+(1.059)+(9.006), (I-130)+(1.059)+(9.007), (I-130)+(1.059)+(9.008), (I-130)+(1.059)+(9.009), (I-130)+(1.059)+(14.001), (I-130)+(1.059)+(14.002), (I-130)+(1.059)+(15.008), (I-130)+(1.059)+(15.011), (I-130)+(1.059)+(15.012), (I-130)+(1.059)+(15.016), (I-130)+(1.059)+(15.025), (I-130)+(1.059)+(15.027), (I-130)+(1.059)+(15.047), (I-130)+(1.059)+(15.063), (I-130)+(1.059)+(15.064), (I-130)+(1.059)+(16.001), (I-130)+(1.059)+(16.002), (I-130)+(1.059)+(16.003), (I-130)+(1.059)+(16.004), (I-130)+(1.059)+(16.005), (I-130)+(1.059)+(16.006), (I-130)+(1.059)+(16.007), (I-130)+(1.059)+(16.008), (I-130)+(1.059)+(17.001), (I-130)+(1.059)+(17.002), (I-130)+(1.059)+(17.003), (I-130)+(1.059)+(17.004), (I-130)+(1.059)+(17.005), (I-130)+(1.059)+(17.006), (I-130)+(1.059)+(17.007), (I-130)+(1.059)+(17.008), (I-130)+(1.059)+(17.009), (I-130)+(1.059)+(17.010), (I-130)+(1.059)+(17.011), (I-130)+(1.059)+(17.012), (I-130)+(1.059)+(18.001), (I-130)+(1.060)+(1.061), (I-130)+(1.060)+(1.062), (I-130)+(1.060)+(1.063), (I-130)+(1.060)+(1.064), (I-130)+(1.060)+(1.065), (I-130)+(1.060)+(1.066), (I-130)+(1.060)+(1.067), (I-130)+(1.060)+(1.068), (I-130)+(1.060)+(1.069), (I-130)+(1.060)+(1.070), (I-130)+(1.060)+(1.071), (I-130)+(1.060)+(1.072), (I-130)+(1.060)+(1.073), (I-130)+(1.060)+(1.074), (I-130)+(1.060)+(1.075), (I-130)+(1.060)+(1.076), (I-130)+(1.060)+(1.077), (I-130)+(1.060)+(1.078), (I-130)+(1.060)+(1.079), (I-130)+(1.060)+(1.080), (I-130)+(1.060)+(1.081), (I-130)+(1.060)+(1.082), (I-130)+(1.060)+(1.083), (I-130)+(1.060)+(1.084), (I-130)+(1.060)+(1.085), (I-130)+(1.060)+(1.086), (I-130)+(1.060)+(1.087), (I-130)+(1.060)+(1.088), (I-130)+(1.060)+(1.089), (I-130)+(1.060)+(1.090), (I-130)+(1.060)+(1.091), (I-130)+(1.060)+(1.092), (I-130)+(1.060)+(2.001), (I-130)+(1.060)+(2.002), (I-130)+(1.060)+(2.003), (I-130)+(1.060)+(2.004), (I-130)+(1.060)+(2.005), (I-130)+(1.060)+(2.006), (I-130)+(1.060)+(2.007), (I-130)+(1.060)+(2.008), (I-130)+(1.060)+(2.009), (I-130)+(1.060)+(2.010), (I-130)+(1.060)+(2.011), (I-130)+(1.060)+(2.012), (I-130)+(1.060)+(2.013), (I-130)+(1.060)+(2.014), (I-130)+(1.060)+(2.015), (I-130)+(1.060)+(2.016), (I-130)+(1.060)+(2.017), (I-130)+(1.060)+(2.018), (I-130)+(1.060)+(2.019), (I-130)+(1.060)+(2.020), (I-130)+(1.060)+(2.021), (I-130)+(1.060)+(2.022), (I-130)+(1.060)+(2.023), (I-130)+(1.060)+(2.024), (I-130)+(1.060)+(2.025), (I-130)+(1.060)+(2.026), (I-130)+(1.060)+(2.027), (I-130)+(1.060)+(2.028), (I-130)+(1.060)+(2.029), (I-130)+(1.060)+(2.030), (I-130)+(1.060)+(2.031), (I-130)+(1.060)+(2.032), (I-130)+(1.060)+(2.033), (I-130)+(1.060)+(2.034), (I-130)+(1.060)+(2.035), (I-130)+(1.060)+(2.036), (I-130)+(1.060)+(2.037), (I-130)+(1.060)+(2.038), (I-130)+(1.060)+(2.039), (I-130)+(1.060)+(2.040), (I-130)+(1.060)+(2.041), (I-130)+(1.060)+(2.042), (I-130)+(1.060)+(2.043), (I-130)+(1.060)+(2.044), (I-130)+(1.060)+(2.045), (I-130)+(1.060)+(2.046), (I-130)+(1.060)+(2.047), (I-130)+(1.060)+(2.048), (I-130)+(1.060)+(2.049), (I-130)+(1.060)+(2.050), (I-130)+(1.060)+(2.051), (I-130)+(1.060)+(2.052), (I-130)+(1.060)+(2.053), (I-130)+(1.060)+(2.054), (I-130)+(1.060)+(2.055), (I-130)+(1.060)+(2.056), (I-130)+(1.060)+(2.057), (I-130)+(1.060)+(2.058), (I-130)+(1.060)+(2.059), (I-130)+(1.060)+(3.001), (I-130)+(1.060)+(3.002), (I-130)+(1.060)+(3.003), (I-130)+(1.060)+(3.004), (I-130)+(1.060)+(3.005), (I-130)+(1.060)+(3.006), (I-130)+(1.060)+(3.007), (I-130)+(1.060)+(3.008), (I-130)+(1.060)+(3.009), (I-130)+(1.060)+(3.010), (I-130)+(1.060)+(3.011), (I-130)+(1.060)+(3.012), (I-130)+(1.060)+(3.013), (I-130)+(1.060)+(3.014), (I-130)+(1.060)+(3.015), (I-130)+(1.060)+(3.016), (I-130)+(1.060)+(3.017), (I-130)+(1.060)+(3.018), (I-130)+(1.060)+(3.019), (I-130)+(1.060)+(3.020), (I-130)+(1.060)+(3.021), (I-130)+(1.060)+(3.022), (I-130)+(1.060)+(3.023), (I-130)+(1.060)+(3.024), (I-130)+(1.060)+(3.025), (I-130)+(1.060)+(3.026), (I-130)+(1.060)+(3.027), (I-130)+(1.060)+(3.028), (I-130)+(1.060)+(3.029), (I-130)+(1.060)+(3.030), (I-130)+(1.060)+(3.031), (I-130)+(1.060)+(5.001), (I-130)+(1.060)+(5.002), (I-130)+(1.060)+(5.003), (I-130)+(1.060)+(5.004), (I-130)+(1.060)+(5.005), (I-130)+(1.060)+(5.006), (I-130)+(1.060)+(5.007), (I-130)+(1.060)+(5.008), (I-130)+(1.060)+(5.009), (I-130)+(1.060)+(5.010), (I-130)+(1.060)+(5.011), (I-130)+(1.060)+(5.012), (I-130)+(1.060)+(5.013), (I-130)+(1.060)+(5.014), (I-130)+(1.060)+(5.015), (I-130)+(1.060)+(5.016), (I-130)+(1.060)+(5.017), (I-130)+(1.060)+(5.018), (I-130)+(1.060)+(5.019), (I-130)+(1.060)+(5.020), (I-130)+(1.060)+(5.021), (I-130)+(1.060)+(5.022), (I-130)+(1.060)+(5.023), (I-130)+(1.060)+(6.001), (I-130)+(1.060)+(6.002), (I-130)+(1.060)+(6.003), (I-130)+(1.060)+(6.004), (I-130)+(1.060)+(7.001), (I-130)+(1.060)+(7.002), (I-130)+(1.060)+(7.003), (I-130)+(1.060)+(7.004), (I-130)+(1.060)+(7.005), (I-130)+(1.060)+(7.006), (I-130)+(1.060)+(9.001), (I-130)+(1.060)+(9.002), (I-130)+(1.060)+(9.003), (I-130)+(1.060)+(9.004), (I-130)+(1.060)+(9.005), (I-130)+(1.060)+(9.006), (I-130)+(1.060)+(9.007), (I-130)+(1.060)+(9.008), (I-130)+(1.060)+(9.009), (I-130)+(1.060)+(14.001), (I-130)+(1.060)+(14.002), (I-130)+(1.060)+(15.008), (I-130)+(1.060)+(15.011), (I-130)+(1.060)+(15.012), (I-130)+(1.060)+(15.016), (I-130)+(1.060)+(15.025), (I-130)+(1.060)+(15.027), (I-130)+(1.060)+(15.047), (I-130)+(1.060)+(15.063), (I-130)+(1.060)+(15.064), (I-130)+(1.060)+(16.001), (I-130)+(1.060)+(16.002), (I-130)+(1.060)+(16.003), (I-130)+(1.060)+(16.004), (I-130)+(1.060)+(16.005), (I-130)+(1.060)+(16.006), (I-130)+(1.060)+(16.007), (I-130)+(1.060)+(16.008), (I-130)+(1.060)+(17.001), (I-130)+(1.060)+(17.002), (I-130)+(1.060)+(17.003), (I-130)+(1.060)+(17.004), (I-130)+(1.060)+(17.005), (I-130)+(1.060)+(17.006), (I-130)+(1.060)+(17.007), (I-130)+(1.060)+(17.008), (I-130)+(1.060)+(17.009), (I-130)+(1.060)+(17.010), (I-130)+(1.060)+(17.011), (I-130)+(1.060)+(17.012), (I-130)+(1.060)+(18.001), (I-130)+(1.061)+(1.062), (I-130)+(1.061)+(1.063), (I-130)+(1.061)+(1.064), (I-130)+(1.061)+(1.065), (I-130)+(1.061)+(1.066), (I-130)+(1.061)+(1.067), (I-130)+(1.061)+(1.068), (I-130)+(1.061)+(1.069), (I-130)+(1.061)+(1.070), (I-130)+(1.061)+(1.071), (I-130)+(1.061)+(1.072), (I-130)+(1.061)+(1.073), (I-130)+(1.061)+(1.074), (I-130)+(1.061)+(1.075), (I-130)+(1.061)+(1.076), (I-130)+(1.061)+(1.077), (I-130)+(1.061)+(1.078), (I-130)+(1.061)+(1.079), (I-130)+(1.061)+(1.080), (I-130)+(1.061)+(1.081), (I-130)+(1.061)+(1.082), (I-130)+(1.061)+(1.083), (I-130)+(1.061)+(1.084), (I-130)+(1.061)+(1.085), (I-130)+(1.061)+(1.086), (I-130)+(1.061)+(1.087), (I-130)+(1.061)+(1.088), (I-130)+(1.061)+(1.089), (I-130)+(1.061)+(1.090), (I-130)+(1.061)+(1.091), (I-130)+(1.061)+(1.092), (I-130)+(1.061)+(2.001), (I-130)+(1.061)+(2.002), (I-130)+(1.061)+(2.003), (I-130)+(1.061)+(2.004), (I-130)+(1.061)+(2.005), (I-130)+(1.061)+(2.006), (I-130)+(1.061)+(2.007), (I-130)+(1.061)+(2.008), (I-130)+(1.061)+(2.009), (I-130)+(1.061)+(2.010), (I-130)+(1.061)+(2.011), (I-130)+(1.061)+(2.012), (I-130)+(1.061)+(2.013), (I-130)+(1.061)+(2.014), (I-130)+(1.061)+(2.015), (I-130)+(1.061)+(2.016), (I-130)+(1.061)+(2.017), (I-130)+(1.061)+(2.018), (I-130)+(1.061)+(2.019), (I-130)+(1.061)+(2.020), (I-130)+(1.061)+(2.021), (I-130)+(1.061)+(2.022), (I-130)+(1.061)+(2.023), (I-130)+(1.061)+(2.024), (I-130)+(1.061)+(2.025), (I-130)+(1.061)+(2.026), (I-130)+(1.061)+(2.027), (I-130)+(1.061)+(2.028), (I-130)+(1.061)+(2.029), (I-130)+(1.061)+(2.030), (I-130)+(1.061)+(2.031), (I-130)+(1.061)+(2.032), (I-130)+(1.061)+(2.033), (I-130)+(1.061)+(2.034), (I-130)+(1.061)+(2.035), (I-130)+(1.061)+(2.036), (I-130)+(1.061)+(2.037), (I-130)+(1.061)+(2.038), (I-130)+(1.061)+(2.039), (I-130)+(1.061)+(2.040), (I-130)+(1.061)+(2.041), (I-130)+(1.061)+(2.042), (I-130)+(1.061)+(2.043), (I-130)+(1.061)+(2.044), (I-130)+(1.061)+(2.045), (I-130)+(1.061)+(2.046), (I-130)+(1.061)+(2.047), (I-130)+(1.061)+(2.048), (I-130)+(1.061)+(2.049), (I-130)+(1.061)+(2.050), (I-130)+(1.061)+(2.051), (I-130)+(1.061)+(2.052), (I-130)+(1.061)+(2.053), (I-130)+(1.061)+(2.054), (I-130)+(1.061)+(2.055), (I-130)+(1.061)+(2.056), (I-130)+(1.061)+(2.057), (I-130)+(1.061)+(2.058), (I-130)+(1.061)+(2.059), (I-130)+(1.061)+(3.001), (I-130)+(1.061)+(3.002), (I-130)+(1.061)+(3.003), (I-130)+(1.061)+(3.004), (I-130)+(1.061)+(3.005), (I-130)+(1.061)+(3.006), (I-130)+(1.061)+(3.007), (I-130)+(1.061)+(3.008), (I-130)+(1.061)+(3.009), (I-130)+(1.061)+(3.010), (I-130)+(1.061)+(3.011), (I-130)+(1.061)+(3.012), (I-130)+(1.061)+(3.013), (I-130)+(1.061)+(3.014), (I-130)+(1.061)+(3.015), (I-130)+(1.061)+(3.016), (I-130)+(1.061)+(3.017), (I-130)+(1.061)+(3.018), (I-130)+(1.061)+(3.019), (I-130)+(1.061)+(3.020), (I-130)+(1.061)+(3.021), (I-130)+(1.061)+(3.022), (I-130)+(1.061)+(3.023), (I-130)+(1.061)+(3.024), (I-130)+(1.061)+(3.025), (I-130)+(1.061)+(3.026), (I-130)+(1.061)+(3.027), (I-130)+(1.061)+(3.028), (I-130)+(1.061)+(3.029), (I-130)+(1.061)+(3.030), (I-130)+(1.061)+(3.031), (I-130)+(1.061)+(5.001), (I-130)+(1.061)+(5.002), (I-130)+(1.061)+(5.003), (I-130)+(1.061)+(5.004), (I-130)+(1.061)+(5.005), (I-130)+(1.061)+(5.006), (I-130)+(1.061)+(5.007), (I-130)+(1.061)+(5.008), (I-130)+(1.061)+(5.009), (I-130)+(1.061)+(5.010), (I-130)+(1.061)+(5.011), (I-130)+(1.061)+(5.012), (I-130)+(1.061)+(5.013), (I-130)+(1.061)+(5.014), (I-130)+(1.061)+(5.015), (I-130)+(1.061)+(5.016), (I-130)+(1.061)+(5.017), (I-130)+(1.061)+(5.018), (I-130)+(1.061)+(5.019), (I-130)+(1.061)+(5.020), (I-130)+(1.061)+(5.021), (I-130)+(1.061)+(5.022), (I-130)+(1.061)+(5.023), (I-130)+(1.061)+(6.001), (I-130)+(1.061)+(6.002), (I-130)+(1.061)+(6.003), (I-130)+(1.061)+(6.004), (I-130)+(1.061)+(7.001), (I-130)+(1.061)+(7.002), (I-130)+(1.061)+(7.003), (I-130)+(1.061)+(7.004), (I-130)+(1.061)+(7.005), (I-130)+(1.061)+(7.006), (I-130)+(1.061)+(9.001), (I-130)+(1.061)+(9.002), (I-130)+(1.061)+(9.003), (I-130)+(1.061)+(9.004), (I-130)+(1.061)+(9.005), (I-130)+(1.061)+(9.006), (I-130)+(1.061)+(9.007), (I-130)+(1.061)+(9.008), (I-130)+(1.061)+(9.009), (I-130)+(1.061)+(14.001), (I-130)+(1.061)+(14.002), (I-130)+(1.061)+(15.008), (I-130)+(1.061)+(15.011), (I-130)+(1.061)+(15.012), (I-130)+(1.061)+(15.016), (I-130)+(1.061)+(15.025), (I-130)+(1.061)+(15.027), (I-130)+(1.061)+(15.047), (I-130)+(1.061)+(15.063), (I-130)+(1.061)+(15.064), (I-130)+(1.061)+(16.001), (I-130)+(1.061)+(16.002), (I-130)+(1.061)+(16.003), (I-130)+(1.061)+(16.004), (I-130)+(1.061)+(16.005), (I-130)+(1.061)+(16.006), (I-130)+(1.061)+(16.007), (I-130)+(1.061)+(16.008), (I-130)+(1.061)+(17.001), (I-130)+(1.061)+(17.002), (I-130)+(1.061)+(17.003), (I-130)+(1.061)+(17.004), (I-130)+(1.061)+(17.005), (I-130)+(1.061)+(17.006), (I-130)+(1.061)+(17.007), (I-130)+(1.061)+(17.008), (I-130)+(1.061)+(17.009), (I-130)+(1.061)+(17.010), (I-130)+(1.061)+(17.011), (I-130)+(1.061)+(17.012), (I-130)+(1.061)+(18.001), (I-130)+(1.062)+(1.063), (I-130)+(1.062)+(1.064), (I-130)+(1.062)+(1.065), (I-130)+(1.062)+(1.066), (I-130)+(1.062)+(1.067), (I-130)+(1.062)+(1.068), (I-130)+(1.062)+(1.069), (I-130)+(1.062)+(1.070), (I-130)+(1.062)+(1.071), (I-130)+(1.062)+(1.072), (I-130)+(1.062)+(1.073), (I-130)+(1.062)+(1.074), (I-130)+(1.062)+(1.075), (I-130)+(1.062)+(1.076), (I-130)+(1.062)+(1.077), (I-130)+(1.062)+(1.078), (I-130)+(1.062)+(1.079), (I-130)+(1.062)+(1.080), (I-130)+(1.062)+(1.081), (I-130)+(1.062)+(1.082), (I-130)+(1.062)+(1.083), (I-130)+(1.062)+(1.084), (I-130)+(1.062)+(1.085), (I-130)+(1.062)+(1.086), (I-130)+(1.062)+(1.087), (I-130)+(1.062)+(1.088), (I-130)+(1.062)+(1.089), (I-130)+(1.062)+(1.090), (I-130)+(1.062)+(1.091), (I-130)+(1.062)+(1.092), (I-130)+(1.062)+(2.001), (I-130)+(1.062)+(2.002), (I-130)+(1.062)+(2.003), (I-130)+(1.062)+(2.004), (I-130)+(1.062)+(2.005), (I-130)+(1.062)+(2.006), (I-130)+(1.062)+(2.007), (I-130)+(1.062)+(2.008), (I-130)+(1.062)+(2.009), (I-130)+(1.062)+(2.010), (I-130)+(1.062)+(2.011), (I-130)+(1.062)+(2.012), (I-130)+(1.062)+(2.013), (I-130)+(1.062)+(2.014), (I-130)+(1.062)+(2.015), (I-130)+(1.062)+(2.016), (I-130)+(1.062)+(2.017), (I-130)+(1.062)+(2.018), (I-130)+(1.062)+(2.019), (I-130)+(1.062)+(2.020), (I-130)+(1.062)+(2.021), (I-130)+(1.062)+(2.022), (I-130)+(1.062)+(2.023), (I-130)+(1.062)+(2.024), (I-130)+(1.062)+(2.025), (I-130)+(1.062)+(2.026), (I-130)+(1.062)+(2.027), (I-130)+(1.062)+(2.028), (I-130)+(1.062)+(2.029), (I-130)+(1.062)+(2.030), (I-130)+(1.062)+(2.031), (I-130)+(1.062)+(2.032), (I-130)+(1.062)+(2.033), (I-130)+(1.062)+(2.034), (I-130)+(1.062)+(2.035), (I-130)+(1.062)+(2.036), (I-130)+(1.062)+(2.037), (I-130)+(1.062)+(2.038), (I-130)+(1.062)+(2.039), (I-130)+(1.062)+(2.040), (I-130)+(1.062)+(2.041), (I-130)+(1.062)+(2.042), (I-130)+(1.062)+(2.043), (I-130)+(1.062)+(2.044), (I-130)+(1.062)+(2.045), (I-130)+(1.062)+(2.046), (I-130)+(1.062)+(2.047), (I-130)+(1.062)+(2.048), (I-130)+(1.062)+(2.049), (I-130)+(1.062)+(2.050), (I-130)+(1.062)+(2.051), (I-130)+(1.062)+(2.052), (I-130)+(1.062)+(2.053), (I-130)+(1.062)+(2.054), (I-130)+(1.062)+(2.055), (I-130)+(1.062)+(2.056), (I-130)+(1.062)+(2.057), (I-130)+(1.062)+(2.058), (I-130)+(1.062)+(2.059), (I-130)+(1.062)+(3.001), (I-130)+(1.062)+(3.002), (I-130)+(1.062)+(3.003), (I-130)+(1.062)+(3.004), (I-130)+(1.062)+(3.005), (I-130)+(1.062)+(3.006), (I-130)+(1.062)+(3.007), (I-130)+(1.062)+(3.008), (I-130)+(1.062)+(3.009), (I-130)+(1.062)+(3.010), (I-130)+(1.062)+(3.011), (I-130)+(1.062)+(3.012), (I-130)+(1.062)+(3.013), (I-130)+(1.062)+(3.014), (I-130)+(1.062)+(3.015), (I-130)+(1.062)+(3.016), (I-130)+(1.062)+(3.017), (I-130)+(1.062)+(3.018), (I-130)+(1.062)+(3.019), (I-130)+(1.062)+(3.020), (I-130)+(1.062)+(3.021), (I-130)+(1.062)+(3.022), (I-130)+(1.062)+(3.023), (I-130)+(1.062)+(3.024), (I-130)+(1.062)+(3.025), (I-130)+(1.062)+(3.026), (I-130)+(1.062)+(3.027), (I-130)+(1.062)+(3.028), (I-130)+(1.062)+(3.029), (I-130)+(1.062)+(3.030), (I-130)+(1.062)+(3.031), (I-130)+(1.062)+(5.001), (I-130)+(1.062)+(5.002), (I-130)+(1.062)+(5.003), (I-130)+(1.062)+(5.004), (I-130)+(1.062)+(5.005), (I-130)+(1.062)+(5.006), (I-130)+(1.062)+(5.007), (I-130)+(1.062)+(5.008), (I-130)+(1.062)+(5.009), (I-130)+(1.062)+(5.010), (I-130)+(1.062)+(5.011), (I-130)+(1.062)+(5.012), (I-130)+(1.062)+(5.013), (I-130)+(1.062)+(5.014), (I-130)+(1.062)+(5.015), (I-130)+(1.062)+(5.016), (I-130)+(1.062)+(5.017), (I-130)+(1.062)+(5.018), (I-130)+(1.062)+(5.019), (I-130)+(1.062)+(5.020), (I-130)+(1.062)+(5.021), (I-130)+(1.062)+(5.022), (I-130)+(1.062)+(5.023), (I-130)+(1.062)+(6.001), (I-130)+(1.062)+(6.002), (I-130)+(1.062)+(6.003), (I-130)+(1.062)+(6.004), (I-130)+(1.062)+(7.001), (I-130)+(1.062)+(7.002), (I-130)+(1.062)+(7.003), (I-130)+(1.062)+(7.004), (I-130)+(1.062)+(7.005), (I-130)+(1.062)+(7.006), (I-130)+(1.062)+(9.001), (I-130)+(1.062)+(9.002), (I-130)+(1.062)+(9.003), (I-130)+(1.062)+(9.004), (I-130)+(1.062)+(9.005), (I-130)+(1.062)+(9.006), (I-130)+(1.062)+(9.007), (I-130)+(1.062)+(9.008), (I-130)+(1.062)+(9.009), (I-130)+(1.062)+(14.001), (I-130)+(1.062)+(14.002), (I-130)+(1.062)+(15.008), (I-130)+(1.062)+(15.011), (I-130)+(1.062)+(15.012), (I-130)+(1.062)+(15.016), (I-130)+(1.062)+(15.025), (I-130)+(1.062)+(15.027), (I-130)+(1.062)+(15.047), (I-130)+(1.062)+(15.063), (I-130)+(1.062)+(15.064), (I-130)+(1.062)+(16.001), (I-130)+(1.062)+(16.002), (I-130)+(1.062)+(16.003), (I-130)+(1.062)+(16.004), (I-130)+(1.062)+(16.005), (I-130)+(1.062)+(16.006), (I-130)+(1.062)+(16.007), (I-130)+(1.062)+(16.008), (I-130)+(1.062)+(17.001), (I-130)+(1.062)+(17.002), (I-130)+(1.062)+(17.003), (I-130)+(1.062)+(17.004), (I-130)+(1.062)+(17.005), (I-130)+(1.062)+(17.006), (I-130)+(1.062)+(17.007), (I-130)+(1.062)+(17.008), (I-130)+(1.062)+(17.009), (I-130)+(1.062)+(17.010), (I-130)+(1.062)+(17.011), (I-130)+(1.062)+(17.012), (I-130)+(1.062)+(18.001), (I-130)+(1.063)+(1.064), (I-130)+(1.063)+(1.065), (I-130)+(1.063)+(1.066), (I-130)+(1.063)+(1.067), (I-130)+(1.063)+(1.068), (I-130)+(1.063)+(1.069), (I-130)+(1.063)+(1.070), (I-130)+(1.063)+(1.071), (I-130)+(1.063)+(1.072), (I-130)+(1.063)+(1.073), (I-130)+(1.063)+(1.074), (I-130)+(1.063)+(1.075), (I-130)+(1.063)+(1.076), (I-130)+(1.063)+(1.077), (I-130)+(1.063)+(1.078), (I-130)+(1.063)+(1.079), (I-130)+(1.063)+(1.080), (I-130)+(1.063)+(1.081), (I-130)+(1.063)+(1.082), (I-130)+(1.063)+(1.083), (I-130)+(1.063)+(1.084), (I-130)+(1.063)+(1.085), (I-130)+(1.063)+(1.086), (I-130)+(1.063)+(1.087), (I-130)+(1.063)+(1.088), (I-130)+(1.063)+(1.089), (I-130)+(1.063)+(1.090), (I-130)+(1.063)+(1.091), (I-130)+(1.063)+(1.092), (I-130)+(1.063)+(2.001), (I-130)+(1.063)+(2.002), (I-130)+(1.063)+(2.003), (I-130)+(1.063)+(2.004), (I-130)+(1.063)+(2.005), (I-130)+(1.063)+(2.006), (I-130)+(1.063)+(2.007), (I-130)+(1.063)+(2.008), (I-130)+(1.063)+(2.009), (I-130)+(1.063)+(2.010), (I-130)+(1.063)+(2.011), (I-130)+(1.063)+(2.012), (I-130)+(1.063)+(2.013), (I-130)+(1.063)+(2.014), (I-130)+(1.063)+(2.015), (I-130)+(1.063)+(2.016), (I-130)+(1.063)+(2.017), (I-130)+(1.063)+(2.018), (I-130)+(1.063)+(2.019), (I-130)+(1.063)+(2.020), (I-130)+(1.063)+(2.021), (I-130)+(1.063)+(2.022), (I-130)+(1.063)+(2.023), (I-130)+(1.063)+(2.024), (I-130)+(1.063)+(2.025), (I-130)+(1.063)+(2.026), (I-130)+(1.063)+(2.027), (I-130)+(1.063)+(2.028), (I-130)+(1.063)+(2.029), (I-130)+(1.063)+(2.030), (I-130)+(1.063)+(2.031), (I-130)+(1.063)+(2.032), (I-130)+(1.063)+(2.033), (I-130)+(1.063)+(2.034), (I-130)+(1.063)+(2.035), (I-130)+(1.063)+(2.036), (I-130)+(1.063)+(2.037), (I-130)+(1.063)+(2.038), (I-130)+(1.063)+(2.039), (I-130)+(1.063)+(2.040), (I-130)+(1.063)+(2.041), (I-130)+(1.063)+(2.042), (I-130)+(1.063)+(2.043), (I-130)+(1.063)+(2.044), (I-130)+(1.063)+(2.045), (I-130)+(1.063)+(2.046), (I-130)+(1.063)+(2.047), (I-130)+(1.063)+(2.048), (I-130)+(1.063)+(2.049), (I-130)+(1.063)+(2.050), (I-130)+(1.063)+(2.051), (I-130)+(1.063)+(2.052), (I-130)+(1.063)+(2.053), (I-130)+(1.063)+(2.054), (I-130)+(1.063)+(2.055), (I-130)+(1.063)+(2.056), (I-130)+(1.063)+(2.057), (I-130)+(1.063)+(2.058), (I-130)+(1.063)+(2.059), (I-130)+(1.063)+(3.001), (I-130)+(1.063)+(3.002), (I-130)+(1.063)+(3.003), (I-130)+(1.063)+(3.004), (I-130)+(1.063)+(3.005), (I-130)+(1.063)+(3.006), (I-130)+(1.063)+(3.007), (I-130)+(1.063)+(3.008), (I-130)+(1.063)+(3.009), (I-130)+(1.063)+(3.010), (I-130)+(1.063)+(3.011), (I-130)+(1.063)+(3.012), (I-130)+(1.063)+(3.013), (I-130)+(1.063)+(3.014), (I-130)+(1.063)+(3.015), (I-130)+(1.063)+(3.016), (I-130)+(1.063)+(3.017), (I-130)+(1.063)+(3.018), (I-130)+(1.063)+(3.019), (I-130)+(1.063)+(3.020), (I-130)+(1.063)+(3.021), (I-130)+(1.063)+(3.022), (I-130)+(1.063)+(3.023), (I-130)+(1.063)+(3.024), (I-130)+(1.063)+(3.025), (I-130)+(1.063)+(3.026), (I-130)+(1.063)+(3.027), (I-130)+(1.063)+(3.028), (I-130)+(1.063)+(3.029), (I-130)+(1.063)+(3.030), (I-130)+(1.063)+(3.031), (I-130)+(1.063)+(5.001), (I-130)+(1.063)+(5.002), (I-130)+(1.063)+(5.003), (I-130)+(1.063)+(5.004), (I-130)+(1.063)+(5.005), (I-130)+(1.063)+(5.006), (I-130)+(1.063)+(5.007), (I-130)+(1.063)+(5.008), (I-130)+(1.063)+(5.009), (I-130)+(1.063)+(5.010), (I-130)+(1.063)+(5.011), (I-130)+(1.063)+(5.012), (I-130)+(1.063)+(5.013), (I-130)+(1.063)+(5.014), (I-130)+(1.063)+(5.015), (I-130)+(1.063)+(5.016), (I-130)+(1.063)+(5.017), (I-130)+(1.063)+(5.018), (I-130)+(1.063)+(5.019), (I-130)+(1.063)+(5.020), (I-130)+(1.063)+(5.021), (I-130)+(1.063)+(5.022), (I-130)+(1.063)+(5.023), (I-130)+(1.063)+(6.001), (I-130)+(1.063)+(6.002), (I-130)+(1.063)+(6.003), (I-130)+(1.063)+(6.004), (I-130)+(1.063)+(7.001), (I-130)+(1.063)+(7.002), (I-130)+(1.063)+(7.003), (I-130)+(1.063)+(7.004), (I-130)+(1.063)+(7.005), (I-130)+(1.063)+(7.006), (I-130)+(1.063)+(9.001), (I-130)+(1.063)+(9.002), (I-130)+(1.063)+(9.003), (I-130)+(1.063)+(9.004), (I-130)+(1.063)+(9.005), (I-130)+(1.063)+(9.006), (I-130)+(1.063)+(9.007), (I-130)+(1.063)+(9.008), (I-130)+(1.063)+(9.009), (I-130)+(1.063)+(14.001), (I-130)+(1.063)+(14.002), (I-130)+(1.063)+(15.008), (I-130)+(1.063)+(15.011), (I-130)+(1.063)+(15.012), (I-130)+(1.063)+(15.016), (I-130)+(1.063)+(15.025), (I-130)+(1.063)+(15.027), (I-130)+(1.063)+(15.047), (I-130)+(1.063)+(15.063), (I-130)+(1.063)+(15.064), (I-130)+(1.063)+(16.001), (I-130)+(1.063)+(16.002), (I-130)+(1.063)+(16.003), (I-130)+(1.063)+(16.004), (I-130)+(1.063)+(16.005), (I-130)+(1.063)+(16.006), (I-130)+(1.063)+(16.007), (I-130)+(1.063)+(16.008), (I-130)+(1.063)+(17.001), (I-130)+(1.063)+(17.002), (I-130)+(1.063)+(17.003), (I-130)+(1.063)+(17.004), (I-130)+(1.063)+(17.005), (I-130)+(1.063)+(17.006), (I-130)+(1.063)+(17.007), (I-130)+(1.063)+(17.008), (I-130)+(1.063)+(17.009), (I-130)+(1.063)+(17.010), (I-130)+(1.063)+(17.011), (I-130)+(1.063)+(17.012), (I-130)+(1.063)+(18.001), (I-130)+(1.064)+(1.065), (I-130)+(1.064)+(1.066), (I-130)+(1.064)+(1.067), (I-130)+(1.064)+(1.068), (I-130)+(1.064)+(1.069), (I-130)+(1.064)+(1.070), (I-130)+(1.064)+(1.071), (I-130)+(1.064)+(1.072), (I-130)+(1.064)+(1.073), (I-130)+(1.064)+(1.074), (I-130)+(1.064)+(1.075), (I-130)+(1.064)+(1.076), (I-130)+(1.064)+(1.077), (I-130)+(1.064)+(1.078), (I-130)+(1.064)+(1.079), (I-130)+(1.064)+(1.080), (I-130)+(1.064)+(1.081), (I-130)+(1.064)+(1.082), (I-130)+(1.064)+(1.083), (I-130)+(1.064)+(1.084), (I-130)+(1.064)+(1.085), (I-130)+(1.064)+(1.086), (I-130)+(1.064)+(1.087), (I-130)+(1.064)+(1.088), (I-130)+(1.064)+(1.089), (I-130)+(1.064)+(1.090), (I-130)+(1.064)+(1.091), (I-130)+(1.064)+(1.092), (I-130)+(1.064)+(2.001), (I-130)+(1.064)+(2.002), (I-130)+(1.064)+(2.003), (I-130)+(1.064)+(2.004), (I-130)+(1.064)+(2.005), (I-130)+(1.064)+(2.006), (I-130)+(1.064)+(2.007), (I-130)+(1.064)+(2.008), (I-130)+(1.064)+(2.009), (I-130)+(1.064)+(2.010), (I-130)+(1.064)+(2.011), (I-130)+(1.064)+(2.012), (I-130)+(1.064)+(2.013), (I-130)+(1.064)+(2.014), (I-130)+(1.064)+(2.015), (I-130)+(1.064)+(2.016), (I-130)+(1.064)+(2.017), (I-130)+(1.064)+(2.018), (I-130)+(1.064)+(2.019), (I-130)+(1.064)+(2.020), (I-130)+(1.064)+(2.021), (I-130)+(1.064)+(2.022), (I-130)+(1.064)+(2.023), (I-130)+(1.064)+(2.024), (I-130)+(1.064)+(2.025), (I-130)+(1.064)+(2.026), (I-130)+(1.064)+(2.027), (I-130)+(1.064)+(2.028), (I-130)+(1.064)+(2.029), (I-130)+(1.064)+(2.030), (I-130)+(1.064)+(2.031), (I-130)+(1.064)+(2.032), (I-130)+(1.064)+(2.033), (I-130)+(1.064)+(2.034), (I-130)+(1.064)+(2.035), (I-130)+(1.064)+(2.036), (I-130)+(1.064)+(2.037), (I-130)+(1.064)+(2.038), (I-130)+(1.064)+(2.039), (I-130)+(1.064)+(2.040), (I-130)+(1.064)+(2.041), (I-130)+(1.064)+(2.042), (I-130)+(1.064)+(2.043), (I-130)+(1.064)+(2.044), (I-130)+(1.064)+(2.045), (I-130)+(1.064)+(2.046), (I-130)+(1.064)+(2.047), (I-130)+(1.064)+(2.048), (I-130)+(1.064)+(2.049), (I-130)+(1.064)+(2.050), (I-130)+(1.064)+(2.051), (I-130)+(1.064)+(2.052), (I-130)+(1.064)+(2.053), (I-130)+(1.064)+(2.054), (I-130)+(1.064)+(2.055), (I-130)+(1.064)+(2.056), (I-130)+(1.064)+(2.057), (I-130)+(1.064)+(2.058), (I-130)+(1.064)+(2.059), (I-130)+(1.064)+(3.001), (I-130)+(1.064)+(3.002), (I-130)+(1.064)+(3.003), (I-130)+(1.064)+(3.004), (I-130)+(1.064)+(3.005), (I-130)+(1.064)+(3.006), (I-130)+(1.064)+(3.007), (I-130)+(1.064)+(3.008), (I-130)+(1.064)+(3.009), (I-130)+(1.064)+(3.010), (I-130)+(1.064)+(3.011), (I-130)+(1.064)+(3.012), (I-130)+(1.064)+(3.013), (I-130)+(1.064)+(3.014), (I-130)+(1.064)+(3.015), (I-130)+(1.064)+(3.016), (I-130)+(1.064)+(3.017), (I-130)+(1.064)+(3.018), (I-130)+(1.064)+(3.019), (I-130)+(1.064)+(3.020), (I-130)+(1.064)+(3.021), (I-130)+(1.064)+(3.022), (I-130)+(1.064)+(3.023), (I-130)+(1.064)+(3.024), (I-130)+(1.064)+(3.025), (I-130)+(1.064)+(3.026), (I-130)+(1.064)+(3.027), (I-130)+(1.064)+(3.028), (I-130)+(1.064)+(3.029), (I-130)+(1.064)+(3.030), (I-130)+(1.064)+(3.031), (I-130)+(1.064)+(5.001), (I-130)+(1.064)+(5.002), (I-130)+(1.064)+(5.003), (I-130)+(1.064)+(5.004), (I-130)+(1.064)+(5.005), (I-130)+(1.064)+(5.006), (I-130)+(1.064)+(5.007), (I-130)+(1.064)+(5.008), (I-130)+(1.064)+(5.009), (I-130)+(1.064)+(5.010), (I-130)+(1.064)+(5.011), (I-130)+(1.064)+(5.012), (I-130)+(1.064)+(5.013), (I-130)+(1.064)+(5.014), (I-130)+(1.064)+(5.015), (I-130)+(1.064)+(5.016), (I-130)+(1.064)+(5.017), (I-130)+(1.064)+(5.018), (I-130)+(1.064)+(5.019), (I-130)+(1.064)+(5.020), (I-130)+(1.064)+(5.021), (I-130)+(1.064)+(5.022), (I-130)+(1.064)+(5.023), (I-130)+(1.064)+(6.001), (I-130)+(1.064)+(6.002), (I-130)+(1.064)+(6.003), (I-130)+(1.064)+(6.004), (I-130)+(1.064)+(7.001), (I-130)+(1.064)+(7.002), (I-130)+(1.064)+(7.003), (I-130)+(1.064)+(7.004), (I-130)+(1.064)+(7.005), (I-130)+(1.064)+(7.006), (I-130)+(1.064)+(9.001), (I-130)+(1.064)+(9.002), (I-130)+(1.064)+(9.003), (I-130)+(1.064)+(9.004), (I-130)+(1.064)+(9.005), (I-130)+(1.064)+(9.006), (I-130)+(1.064)+(9.007), (I-130)+(1.064)+(9.008), (I-130)+(1.064)+(9.009), (I-130)+(1.064)+(14.001), (I-130)+(1.064)+(14.002), (I-130)+(1.064)+(15.008), (I-130)+(1.064)+(15.011), (I-130)+(1.064)+(15.012), (I-130)+(1.064)+(15.016), (I-130)+(1.064)+(15.025), (I-130)+(1.064)+(15.027), (I-130)+(1.064)+(15.047), (I-130)+(1.064)+(15.063), (I-130)+(1.064)+(15.064), (I-130)+(1.064)+(16.001), (I-130)+(1.064)+(16.002), (I-130)+(1.064)+(16.003), (I-130)+(1.064)+(16.004), (I-130)+(1.064)+(16.005), (I-130)+(1.064)+(16.006), (I-130)+(1.064)+(16.007), (I-130)+(1.064)+(16.008), (I-130)+(1.064)+(17.001), (I-130)+(1.064)+(17.002), (I-130)+(1.064)+(17.003), (I-130)+(1.064)+(17.004), (I-130)+(1.064)+(17.005), (I-130)+(1.064)+(17.006), (I-130)+(1.064)+(17.007), (I-130)+(1.064)+(17.008), (I-130)+(1.064)+(17.009), (I-130)+(1.064)+(17.010), (I-130)+(1.064)+(17.011), (I-130)+(1.064)+(17.012), (I-130)+(1.064)+(18.001), (I-130)+(1.065)+(1.066), (I-130)+(1.065)+(1.067), (I-130)+(1.065)+(1.068), (I-130)+(1.065)+(1.069), (I-130)+(1.065)+(1.070), (I-130)+(1.065)+(1.071), (I-130)+(1.065)+(1.072), (I-130)+(1.065)+(1.073), (I-130)+(1.065)+(1.074), (I-130)+(1.065)+(1.075), (I-130)+(1.065)+(1.076), (I-130)+(1.065)+(1.077), (I-130)+(1.065)+(1.078), (I-130)+(1.065)+(1.079), (I-130)+(1.065)+(1.080), (I-130)+(1.065)+(1.081), (I-130)+(1.065)+(1.082), (I-130)+(1.065)+(1.083), (I-130)+(1.065)+(1.084), (I-130)+(1.065)+(1.085), (I-130)+(1.065)+(1.086), (I-130)+(1.065)+(1.087), (I-130)+(1.065)+(1.088), (I-130)+(1.065)+(1.089), (I-130)+(1.065)+(1.090), (I-130)+(1.065)+(1.091), (I-130)+(1.065)+(1.092), (I-130)+(1.065)+(2.001), (I-130)+(1.065)+(2.002), (I-130)+(1.065)+(2.003), (I-130)+(1.065)+(2.004), (I-130)+(1.065)+(2.005), (I-130)+(1.065)+(2.006), (I-130)+(1.065)+(2.007), (I-130)+(1.065)+(2.008), (I-130)+(1.065)+(2.009), (I-130)+(1.065)+(2.010), (I-130)+(1.065)+(2.011), (I-130)+(1.065)+(2.012), (I-130)+(1.065)+(2.013), (I-130)+(1.065)+(2.014), (I-130)+(1.065)+(2.015), (I-130)+(1.065)+(2.016), (I-130)+(1.065)+(2.017), (I-130)+(1.065)+(2.018), (I-130)+(1.065)+(2.019), (I-130)+(1.065)+(2.020), (I-130)+(1.065)+(2.021), (I-130)+(1.065)+(2.022), (I-130)+(1.065)+(2.023), (I-130)+(1.065)+(2.024), (I-130)+(1.065)+(2.025), (I-130)+(1.065)+(2.026), (I-130)+(1.065)+(2.027), (I-130)+(1.065)+(2.028), (I-130)+(1.065)+(2.029), (I-130)+(1.065)+(2.030), (I-130)+(1.065)+(2.031), (I-130)+(1.065)+(2.032), (I-130)+(1.065)+(2.033), (I-130)+(1.065)+(2.034), (I-130)+(1.065)+(2.035), (I-130)+(1.065)+(2.036), (I-130)+(1.065)+(2.037), (I-130)+(1.065)+(2.038), (I-130)+(1.065)+(2.039), (I-130)+(1.065)+(2.040), (I-130)+(1.065)+(2.041), (I-130)+(1.065)+(2.042), (I-130)+(1.065)+(2.043), (I-130)+(1.065)+(2.044), (I-130)+(1.065)+(2.045), (I-130)+(1.065)+(2.046), (I-130)+(1.065)+(2.047), (I-130)+(1.065)+(2.048), (I-130)+(1.065)+(2.049), (I-130)+(1.065)+(2.050), (I-130)+(1.065)+(2.051), (I-130)+(1.065)+(2.052), (I-130)+(1.065)+(2.053), (I-130)+(1.065)+(2.054), (I-130)+(1.065)+(2.055), (I-130)+(1.065)+(2.056), (I-130)+(1.065)+(2.057), (I-130)+(1.065)+(2.058), (I-130)+(1.065)+(2.059), (I-130)+(1.065)+(3.001), (I-130)+(1.065)+(3.002), (I-130)+(1.065)+(3.003), (I-130)+(1.065)+(3.004), (I-130)+(1.065)+(3.005), (I-130)+(1.065)+(3.006), (I-130)+(1.065)+(3.007), (I-130)+(1.065)+(3.008), (I-130)+(1.065)+(3.009), (I-130)+(1.065)+(3.010), (I-130)+(1.065)+(3.011), (I-130)+(1.065)+(3.012), (I-130)+(1.065)+(3.013), (I-130)+(1.065)+(3.014), (I-130)+(1.065)+(3.015), (I-130)+(1.065)+(3.016), (I-130)+(1.065)+(3.017), (I-130)+(1.065)+(3.018), (I-130)+(1.065)+(3.019), (I-130)+(1.065)+(3.020), (I-130)+(1.065)+(3.021), (I-130)+(1.065)+(3.022), (I-130)+(1.065)+(3.023), (I-130)+(1.065)+(3.024), (I-130)+(1.065)+(3.025), (I-130)+(1.065)+(3.026), (I-130)+(1.065)+(3.027), (I-130)+(1.065)+(3.028), (I-130)+(1.065)+(3.029), (I-130)+(1.065)+(3.030), (I-130)+(1.065)+(3.031), (I-130)+(1.065)+(5.001), (I-130)+(1.065)+(5.002), (I-130)+(1.065)+(5.003), (I-130)+(1.065)+(5.004), (I-130)+(1.065)+(5.005), (I-130)+(1.065)+(5.006), (I-130)+(1.065)+(5.007), (I-130)+(1.065)+(5.008), (I-130)+(1.065)+(5.009), (I-130)+(1.065)+(5.010), (I-130)+(1.065)+(5.011), (I-130)+(1.065)+(5.012), (I-130)+(1.065)+(5.013), (I-130)+(1.065)+(5.014), (I-130)+(1.065)+(5.015), (I-130)+(1.065)+(5.016), (I-130)+(1.065)+(5.017), (I-130)+(1.065)+(5.018), (I-130)+(1.065)+(5.019), (I-130)+(1.065)+(5.020), (I-130)+(1.065)+(5.021), (I-130)+(1.065)+(5.022), (I-130)+(1.065)+(5.023), (I-130)+(1.065)+(6.001), (I-130)+(1.065)+(6.002), (I-130)+(1.065)+(6.003), (I-130)+(1.065)+(6.004), (I-130)+(1.065)+(7.001), (I-130)+(1.065)+(7.002), (I-130)+(1.065)+(7.003), (I-130)+(1.065)+(7.004), (I-130)+(1.065)+(7.005), (I-130)+(1.065)+(7.006), (I-130)+(1.065)+(9.001), (I-130)+(1.065)+(9.002), (I-130)+(1.065)+(9.003), (I-130)+(1.065)+(9.004), (I-130)+(1.065)+(9.005), (I-130)+(1.065)+(9.006), (I-130)+(1.065)+(9.007), (I-130)+(1.065)+(9.008), (I-130)+(1.065)+(9.009), (I-130)+(1.065)+(14.001), (I-130)+(1.065)+(14.002), (I-130)+(1.065)+(15.008), (I-130)+(1.065)+(15.011), (I-130)+(1.065)+(15.012), (I-130)+(1.065)+(15.016), (I-130)+(1.065)+(15.025), (I-130)+(1.065)+(15.027), (I-130)+(1.065)+(15.047), (I-130)+(1.065)+(15.063), (I-130)+(1.065)+(15.064), (I-130)+(1.065)+(16.001), (I-130)+(1.065)+(16.002), (I-130)+(1.065)+(16.003), (I-130)+(1.065)+(16.004), (I-130)+(1.065)+(16.005), (I-130)+(1.065)+(16.006), (I-130)+(1.065)+(16.007), (I-130)+(1.065)+(16.008), (I-130)+(1.065)+(17.001), (I-130)+(1.065)+(17.002), (I-130)+(1.065)+(17.003), (I-130)+(1.065)+(17.004), (I-130)+(1.065)+(17.005), (I-130)+(1.065)+(17.006), (I-130)+(1.065)+(17.007), (I-130)+(1.065)+(17.008), (I-130)+(1.065)+(17.009), (I-130)+(1.065)+(17.010), (I-130)+(1.065)+(17.011), (I-130)+(1.065)+(17.012), (I-130)+(1.065)+(18.001), (I-130)+(1.066)+(1.067), (I-130)+(1.066)+(1.068), (I-130)+(1.066)+(1.069), (I-130)+(1.066)+(1.070), (I-130)+(1.066)+(1.071), (I-130)+(1.066)+(1.072), (I-130)+(1.066)+(1.073), (I-130)+(1.066)+(1.074), (I-130)+(1.066)+(1.075), (I-130)+(1.066)+(1.076), (I-130)+(1.066)+(1.077), (I-130)+(1.066)+(1.078), (I-130)+(1.066)+(1.079), (I-130)+(1.066)+(1.080), (I-130)+(1.066)+(1.081), (I-130)+(1.066)+(1.082), (I-130)+(1.066)+(1.083), (I-130)+(1.066)+(1.084), (I-130)+(1.066)+(1.085), (I-130)+(1.066)+(1.086), (I-130)+(1.066)+(1.087), (I-130)+(1.066)+(1.088), (I-130)+(1.066)+(1.089), (I-130)+(1.066)+(1.090), (I-130)+(1.066)+(1.091), (I-130)+(1.066)+(1.092), (I-130)+(1.066)+(2.001), (I-130)+(1.066)+(2.002), (I-130)+(1.066)+(2.003), (I-130)+(1.066)+(2.004), (I-130)+(1.066)+(2.005), (I-130)+(1.066)+(2.006), (I-130)+(1.066)+(2.007), (I-130)+(1.066)+(2.008), (I-130)+(1.066)+(2.009), (I-130)+(1.066)+(2.010), (I-130)+(1.066)+(2.011), (I-130)+(1.066)+(2.012), (I-130)+(1.066)+(2.013), (I-130)+(1.066)+(2.014), (I-130)+(1.066)+(2.015), (I-130)+(1.066)+(2.016), (I-130)+(1.066)+(2.017), (I-130)+(1.066)+(2.018), (I-130)+(1.066)+(2.019), (I-130)+(1.066)+(2.020), (I-130)+(1.066)+(2.021), (I-130)+(1.066)+(2.022), (I-130)+(1.066)+(2.023), (I-130)+(1.066)+(2.024), (I-130)+(1.066)+(2.025), (I-130)+(1.066)+(2.026), (I-130)+(1.066)+(2.027), (I-130)+(1.066)+(2.028), (I-130)+(1.066)+(2.029), (I-130)+(1.066)+(2.030), (I-130)+(1.066)+(2.031), (I-130)+(1.066)+(2.032), (I-130)+(1.066)+(2.033), (I-130)+(1.066)+(2.034), (I-130)+(1.066)+(2.035), (I-130)+(1.066)+(2.036), (I-130)+(1.066)+(2.037), (I-130)+(1.066)+(2.038), (I-130)+(1.066)+(2.039), (I-130)+(1.066)+(2.040), (I-130)+(1.066)+(2.041), (I-130)+(1.066)+(2.042), (I-130)+(1.066)+(2.043), (I-130)+(1.066)+(2.044), (I-130)+(1.066)+(2.045), (I-130)+(1.066)+(2.046), (I-130)+(1.066)+(2.047), (I-130)+(1.066)+(2.048), (I-130)+(1.066)+(2.049), (I-130)+(1.066)+(2.050), (I-130)+(1.066)+(2.051), (I-130)+(1.066)+(2.052), (I-130)+(1.066)+(2.053), (I-130)+(1.066)+(2.054), (I-130)+(1.066)+(2.055), (I-130)+(1.066)+(2.056), (I-130)+(1.066)+(2.057), (I-130)+(1.066)+(2.058), (I-130)+(1.066)+(2.059), (I-130)+(1.066)+(3.001), (I-130)+(1.066)+(3.002), (I-130)+(1.066)+(3.003), (I-130)+(1.066)+(3.004), (I-130)+(1.066)+(3.005), (I-130)+(1.066)+(3.006), (I-130)+(1.066)+(3.007), (I-130)+(1.066)+(3.008), (I-130)+(1.066)+(3.009), (I-130)+(1.066)+(3.010), (I-130)+(1.066)+(3.011), (I-130)+(1.066)+(3.012), (I-130)+(1.066)+(3.013), (I-130)+(1.066)+(3.014), (I-130)+(1.066)+(3.015), (I-130)+(1.066)+(3.016), (I-130)+(1.066)+(3.017), (I-130)+(1.066)+(3.018), (I-130)+(1.066)+(3.019), (I-130)+(1.066)+(3.020), (I-130)+(1.066)+(3.021), (I-130)+(1.066)+(3.022), (I-130)+(1.066)+(3.023), (I-130)+(1.066)+(3.024), (I-130)+(1.066)+(3.025), (I-130)+(1.066)+(3.026), (I-130)+(1.066)+(3.027), (I-130)+(1.066)+(3.028), (I-130)+(1.066)+(3.029), (I-130)+(1.066)+(3.030), (I-130)+(1.066)+(3.031), (I-130)+(1.066)+(5.001), (I-130)+(1.066)+(5.002), (I-130)+(1.066)+(5.003), (I-130)+(1.066)+(5.004), (I-130)+(1.066)+(5.005), (I-130)+(1.066)+(5.006), (I-130)+(1.066)+(5.007), (I-130)+(1.066)+(5.008), (I-130)+(1.066)+(5.009), (I-130)+(1.066)+(5.010), (I-130)+(1.066)+(5.011), (I-130)+(1.066)+(5.012), (I-130)+(1.066)+(5.013), (I-130)+(1.066)+(5.014), (I-130)+(1.066)+(5.015), (I-130)+(1.066)+(5.016), (I-130)+(1.066)+(5.017), (I-130)+(1.066)+(5.018), (I-130)+(1.066)+(5.019), (I-130)+(1.066)+(5.020), (I-130)+(1.066)+(5.021), (I-130)+(1.066)+(5.022), (I-130)+(1.066)+(5.023), (I-130)+(1.066)+(6.001), (I-130)+(1.066)+(6.002), (I-130)+(1.066)+(6.003), (I-130)+(1.066)+(6.004), (I-130)+(1.066)+(7.001), (I-130)+(1.066)+(7.002), (I-130)+(1.066)+(7.003), (I-130)+(1.066)+(7.004), (I-130)+(1.066)+(7.005), (I-130)+(1.066)+(7.006), (I-130)+(1.066)+(9.001), (I-130)+(1.066)+(9.002), (I-130)+(1.066)+(9.003), (I-130)+(1.066)+(9.004), (I-130)+(1.066)+(9.005), (I-130)+(1.066)+(9.006), (I-130)+(1.066)+(9.007), (I-130)+(1.066)+(9.008), (I-130)+(1.066)+(9.009), (I-130)+(1.066)+(14.001), (I-130)+(1.066)+(14.002), (I-130)+(1.066)+(15.008), (I-130)+(1.066)+(15.011), (I-130)+(1.066)+(15.012), (I-130)+(1.066)+(15.016), (I-130)+(1.066)+(15.025), (I-130)+(1.066)+(15.027), (I-130)+(1.066)+(15.047), (I-130)+(1.066)+(15.063), (I-130)+(1.066)+(15.064), (I-130)+(1.066)+(16.001), (I-130)+(1.066)+(16.002), (I-130)+(1.066)+(16.003), (I-130)+(1.066)+(16.004), (I-130)+(1.066)+(16.005), (I-130)+(1.066)+(16.006), (I-130)+(1.066)+(16.007), (I-130)+(1.066)+(16.008), (I-130)+(1.066)+(17.001), (I-130)+(1.066)+(17.002), (I-130)+(1.066)+(17.003), (I-130)+(1.066)+(17.004), (I-130)+(1.066)+(17.005), (I-130)+(1.066)+(17.006), (I-130)+(1.066)+(17.007), (I-130)+(1.066)+(17.008), (I-130)+(1.066)+(17.009), (I-130)+(1.066)+(17.010), (I-130)+(1.066)+(17.011), (I-130)+(1.066)+(17.012), (I-130)+(1.066)+(18.001), (I-130)+(1.067)+(1.068), (I-130)+(1.067)+(1.069), (I-130)+(1.067)+(1.070), (I-130)+(1.067)+(1.071), (I-130)+(1.067)+(1.072), (I-130)+(1.067)+(1.073), (I-130)+(1.067)+(1.074), (I-130)+(1.067)+(1.075), (I-130)+(1.067)+(1.076), (I-130)+(1.067)+(1.077), (I-130)+(1.067)+(1.078), (I-130)+(1.067)+(1.079), (I-130)+(1.067)+(1.080), (I-130)+(1.067)+(1.081), (I-130)+(1.067)+(1.082), (I-130)+(1.067)+(1.083), (I-130)+(1.067)+(1.084), (I-130)+(1.067)+(1.085), (I-130)+(1.067)+(1.086), (I-130)+(1.067)+(1.087), (I-130)+(1.067)+(1.088), (I-130)+(1.067)+(1.089), (I-130)+(1.067)+(1.090), (I-130)+(1.067)+(1.091), (I-130)+(1.067)+(1.092), (I-130)+(1.067)+(2.001), (I-130)+(1.067)+(2.002), (I-130)+(1.067)+(2.003), (I-130)+(1.067)+(2.004), (I-130)+(1.067)+(2.005), (I-130)+(1.067)+(2.006), (I-130)+(1.067)+(2.007), (I-130)+(1.067)+(2.008), (I-130)+(1.067)+(2.009), (I-130)+(1.067)+(2.010), (I-130)+(1.067)+(2.011), (I-130)+(1.067)+(2.012), (I-130)+(1.067)+(2.013), (I-130)+(1.067)+(2.014), (I-130)+(1.067)+(2.015), (I-130)+(1.067)+(2.016), (I-130)+(1.067)+(2.017), (I-130)+(1.067)+(2.018), (I-130)+(1.067)+(2.019), (I-130)+(1.067)+(2.020), (I-130)+(1.067)+(2.021), (I-130)+(1.067)+(2.022), (I-130)+(1.067)+(2.023), (I-130)+(1.067)+(2.024), (I-130)+(1.067)+(2.025), (I-130)+(1.067)+(2.026), (I-130)+(1.067)+(2.027), (I-130)+(1.067)+(2.028), (I-130)+(1.067)+(2.029), (I-130)+(1.067)+(2.030), (I-130)+(1.067)+(2.031), (I-130)+(1.067)+(2.032), (I-130)+(1.067)+(2.033), (I-130)+(1.067)+(2.034), (I-130)+(1.067)+(2.035), (I-130)+(1.067)+(2.036), (I-130)+(1.067)+(2.037), (I-130)+(1.067)+(2.038), (I-130)+(1.067)+(2.039), (I-130)+(1.067)+(2.040), (I-130)+(1.067)+(2.041), (I-130)+(1.067)+(2.042), (I-130)+(1.067)+(2.043), (I-130)+(1.067)+(2.044), (I-130)+(1.067)+(2.045), (I-130)+(1.067)+(2.046), (I-130)+(1.067)+(2.047), (I-130)+(1.067)+(2.048), (I-130)+(1.067)+(2.049), (I-130)+(1.067)+(2.050), (I-130)+(1.067)+(2.051), (I-130)+(1.067)+(2.052), (I-130)+(1.067)+(2.053), (I-130)+(1.067)+(2.054), (I-130)+(1.067)+(2.055), (I-130)+(1.067)+(2.056), (I-130)+(1.067)+(2.057), (I-130)+(1.067)+(2.058), (I-130)+(1.067)+(2.059), (I-130)+(1.067)+(3.001), (I-130)+(1.067)+(3.002), (I-130)+(1.067)+(3.003), (I-130)+(1.067)+(3.004), (I-130)+(1.067)+(3.005), (I-130)+(1.067)+(3.006), (I-130)+(1.067)+(3.007), (I-130)+(1.067)+(3.008), (I-130)+(1.067)+(3.009), (I-130)+(1.067)+(3.010), (I-130)+(1.067)+(3.011), (I-130)+(1.067)+(3.012), (I-130)+(1.067)+(3.013), (I-130)+(1.067)+(3.014), (I-130)+(1.067)+(3.015), (I-130)+(1.067)+(3.016), (I-130)+(1.067)+(3.017), (I-130)+(1.067)+(3.018), (I-130)+(1.067)+(3.019), (I-130)+(1.067)+(3.020), (I-130)+(1.067)+(3.021), (I-130)+(1.067)+(3.022), (I-130)+(1.067)+(3.023), (I-130)+(1.067)+(3.024), (I-130)+(1.067)+(3.025), (I-130)+(1.067)+(3.026), (I-130)+(1.067)+(3.027), (I-130)+(1.067)+(3.028), (I-130)+(1.067)+(3.029), (I-130)+(1.067)+(3.030), (I-130)+(1.067)+(3.031), (I-130)+(1.067)+(5.001), (I-130)+(1.067)+(5.002), (I-130)+(1.067)+(5.003), (I-130)+(1.067)+(5.004), (I-130)+(1.067)+(5.005), (I-130)+(1.067)+(5.006), (I-130)+(1.067)+(5.007), (I-130)+(1.067)+(5.008), (I-130)+(1.067)+(5.009), (I-130)+(1.067)+(5.010), (I-130)+(1.067)+(5.011), (I-130)+(1.067)+(5.012), (I-130)+(1.067)+(5.013), (I-130)+(1.067)+(5.014), (I-130)+(1.067)+(5.015), (I-130)+(1.067)+(5.016), (I-130)+(1.067)+(5.017), (I-130)+(1.067)+(5.018), (I-130)+(1.067)+(5.019), (I-130)+(1.067)+(5.020), (I-130)+(1.067)+(5.021), (I-130)+(1.067)+(5.022), (I-130)+(1.067)+(5.023), (I-130)+(1.067)+(6.001), (I-130)+(1.067)+(6.002), (I-130)+(1.067)+(6.003), (I-130)+(1.067)+(6.004), (I-130)+(1.067)+(7.001), (I-130)+(1.067)+(7.002), (I-130)+(1.067)+(7.003), (I-130)+(1.067)+(7.004), (I-130)+(1.067)+(7.005), (I-130)+(1.067)+(7.006), (I-130)+(1.067)+(9.001), (I-130)+(1.067)+(9.002), (I-130)+(1.067)+(9.003), (I-130)+(1.067)+(9.004), (I-130)+(1.067)+(9.005), (I-130)+(1.067)+(9.006), (I-130)+(1.067)+(9.007), (I-130)+(1.067)+(9.008), (I-130)+(1.067)+(9.009), (I-130)+(1.067)+(14.001), (I-130)+(1.067)+(14.002), (I-130)+(1.067)+(15.008), (I-130)+(1.067)+(15.011), (I-130)+(1.067)+(15.012), (I-130)+(1.067)+(15.016), (I-130)+(1.067)+(15.025), (I-130)+(1.067)+(15.027), (I-130)+(1.067)+(15.047), (I-130)+(1.067)+(15.063), (I-130)+(1.067)+(15.064), (I-130)+(1.067)+(16.001), (I-130)+(1.067)+(16.002), (I-130)+(1.067)+(16.003), (I-130)+(1.067)+(16.004), (I-130)+(1.067)+(16.005), (I-130)+(1.067)+(16.006), (I-130)+(1.067)+(16.007), (I-130)+(1.067)+(16.008), (I-130)+(1.067)+(17.001), (I-130)+(1.067)+(17.002), (I-130)+(1.067)+(17.003), (I-130)+(1.067)+(17.004), (I-130)+(1.067)+(17.005), (I-130)+(1.067)+(17.006), (I-130)+(1.067)+(17.007), (I-130)+(1.067)+(17.008), (I-130)+(1.067)+(17.009), (I-130)+(1.067)+(17.010), (I-130)+(1.067)+(17.011), (I-130)+(1.067)+(17.012), (I-130)+(1.067)+(18.001), (I-130)+(1.068)+(1.069), (I-130)+(1.068)+(1.070), (I-130)+(1.068)+(1.071), (I-130)+(1.068)+(1.072), (I-130)+(1.068)+(1.073), (I-130)+(1.068)+(1.074), (I-130)+(1.068)+(1.075), (I-130)+(1.068)+(1.076), (I-130)+(1.068)+(1.077), (I-130)+(1.068)+(1.078), (I-130)+(1.068)+(1.079), (I-130)+(1.068)+(1.080), (I-130)+(1.068)+(1.081), (I-130)+(1.068)+(1.082), (I-130)+(1.068)+(1.083), (I-130)+(1.068)+(1.084), (I-130)+(1.068)+(1.085), (I-130)+(1.068)+(1.086), (I-130)+(1.068)+(1.087), (I-130)+(1.068)+(1.088), (I-130)+(1.068)+(1.089), (I-130)+(1.068)+(1.090), (I-130)+(1.068)+(1.091), (I-130)+(1.068)+(1.092), (I-130)+(1.068)+(2.001), (I-130)+(1.068)+(2.002), (I-130)+(1.068)+(2.003), (I-130)+(1.068)+(2.004), (I-130)+(1.068)+(2.005), (I-130)+(1.068)+(2.006), (I-130)+(1.068)+(2.007), (I-130)+(1.068)+(2.008), (I-130)+(1.068)+(2.009), (I-130)+(1.068)+(2.010), (I-130)+(1.068)+(2.011), (I-130)+(1.068)+(2.012), (I-130)+(1.068)+(2.013), (I-130)+(1.068)+(2.014), (I-130)+(1.068)+(2.015), (I-130)+(1.068)+(2.016), (I-130)+(1.068)+(2.017), (I-130)+(1.068)+(2.018), (I-130)+(1.068)+(2.019), (I-130)+(1.068)+(2.020), (I-130)+(1.068)+(2.021), (I-130)+(1.068)+(2.022), (I-130)+(1.068)+(2.023), (I-130)+(1.068)+(2.024), (I-130)+(1.068)+(2.025), (I-130)+(1.068)+(2.026), (I-130)+(1.068)+(2.027), (I-130)+(1.068)+(2.028), (I-130)+(1.068)+(2.029), (I-130)+(1.068)+(2.030), (I-130)+(1.068)+(2.031), (I-130)+(1.068)+(2.032), (I-130)+(1.068)+(2.033), (I-130)+(1.068)+(2.034), (I-130)+(1.068)+(2.035), (I-130)+(1.068)+(2.036), (I-130)+(1.068)+(2.037), (I-130)+(1.068)+(2.038), (I-130)+(1.068)+(2.039), (I-130)+(1.068)+(2.040), (I-130)+(1.068)+(2.041), (I-130)+(1.068)+(2.042), (I-130)+(1.068)+(2.043), (I-130)+(1.068)+(2.044), (I-130)+(1.068)+(2.045), (I-130)+(1.068)+(2.046), (I-130)+(1.068)+(2.047), (I-130)+(1.068)+(2.048), (I-130)+(1.068)+(2.049), (I-130)+(1.068)+(2.050), (I-130)+(1.068)+(2.051), (I-130)+(1.068)+(2.052), (I-130)+(1.068)+(2.053), (I-130)+(1.068)+(2.054), (I-130)+(1.068)+(2.055), (I-130)+(1.068)+(2.056), (I-130)+(1.068)+(2.057), (I-130)+(1.068)+(2.058), (I-130)+(1.068)+(2.059), (I-130)+(1.068)+(3.001), (I-130)+(1.068)+(3.002), (I-130)+(1.068)+(3.003), (I-130)+(1.068)+(3.004), (I-130)+(1.068)+(3.005), (I-130)+(1.068)+(3.006), (I-130)+(1.068)+(3.007), (I-130)+(1.068)+(3.008), (I-130)+(1.068)+(3.009), (I-130)+(1.068)+(3.010), (I-130)+(1.068)+(3.011), (I-130)+(1.068)+(3.012), (I-130)+(1.068)+(3.013), (I-130)+(1.068)+(3.014), (I-130)+(1.068)+(3.015), (I-130)+(1.068)+(3.016), (I-130)+(1.068)+(3.017), (I-130)+(1.068)+(3.018), (I-130)+(1.068)+(3.019), (I-130)+(1.068)+(3.020), (I-130)+(1.068)+(3.021), (I-130)+(1.068)+(3.022), (I-130)+(1.068)+(3.023), (I-130)+(1.068)+(3.024), (I-130)+(1.068)+(3.025), (I-130)+(1.068)+(3.026), (I-130)+(1.068)+(3.027), (I-130)+(1.068)+(3.028), (I-130)+(1.068)+(3.029), (I-130)+(1.068)+(3.030), (I-130)+(1.068)+(3.031), (I-130)+(1.068)+(5.001), (I-130)+(1.068)+(5.002), (I-130)+(1.068)+(5.003), (I-130)+(1.068)+(5.004), (I-130)+(1.068)+(5.005), (I-130)+(1.068)+(5.006), (I-130)+(1.068)+(5.007), (I-130)+(1.068)+(5.008), (I-130)+(1.068)+(5.009), (I-130)+(1.068)+(5.010), (I-130)+(1.068)+(5.011), (I-130)+(1.068)+(5.012), (I-130)+(1.068)+(5.013), (I-130)+(1.068)+(5.014), (I-130)+(1.068)+(5.015), (I-130)+(1.068)+(5.016), (I-130)+(1.068)+(5.017), (I-130)+(1.068)+(5.018), (I-130)+(1.068)+(5.019), (I-130)+(1.068)+(5.020), (I-130)+(1.068)+(5.021), (I-130)+(1.068)+(5.022), (I-130)+(1.068)+(5.023), (I-130)+(1.068)+(6.001), (I-130)+(1.068)+(6.002), (I-130)+(1.068)+(6.003), (I-130)+(1.068)+(6.004), (I-130)+(1.068)+(7.001), (I-130)+(1.068)+(7.002), (I-130)+(1.068)+(7.003), (I-130)+(1.068)+(7.004), (I-130)+(1.068)+(7.005), (I-130)+(1.068)+(7.006), (I-130)+(1.068)+(9.001), (I-130)+(1.068)+(9.002), (I-130)+(1.068)+(9.003), (I-130)+(1.068)+(9.004), (I-130)+(1.068)+(9.005), (I-130)+(1.068)+(9.006), (I-130)+(1.068)+(9.007), (I-130)+(1.068)+(9.008), (I-130)+(1.068)+(9.009), (I-130)+(1.068)+(14.001), (I-130)+(1.068)+(14.002), (I-130)+(1.068)+(15.008), (I-130)+(1.068)+(15.011), (I-130)+(1.068)+(15.012), (I-130)+(1.068)+(15.016), (I-130)+(1.068)+(15.025), (I-130)+(1.068)+(15.027), (I-130)+(1.068)+(15.047), (I-130)+(1.068)+(15.063), (I-130)+(1.068)+(15.064), (I-130)+(1.068)+(16.001), (I-130)+(1.068)+(16.002), (I-130)+(1.068)+(16.003), (I-130)+(1.068)+(16.004), (I-130)+(1.068)+(16.005), (I-130)+(1.068)+(16.006), (I-130)+(1.068)+(16.007), (I-130)+(1.068)+(16.008), (I-130)+(1.068)+(17.001), (I-130)+(1.068)+(17.002), (I-130)+(1.068)+(17.003), (I-130)+(1.068)+(17.004), (I-130)+(1.068)+(17.005), (I-130)+(1.068)+(17.006), (I-130)+(1.068)+(17.007), (I-130)+(1.068)+(17.008), (I-130)+(1.068)+(17.009), (I-130)+(1.068)+(17.010), (I-130)+(1.068)+(17.011), (I-130)+(1.068)+(17.012), (I-130)+(1.068)+(18.001), (I-130)+(1.069)+(1.070), (I-130)+(1.069)+(1.071), (I-130)+(1.069)+(1.072), (I-130)+(1.069)+(1.073), (I-130)+(1.069)+(1.074), (I-130)+(1.069)+(1.075), (I-130)+(1.069)+(1.076), (I-130)+(1.069)+(1.077), (I-130)+(1.069)+(1.078), (I-130)+(1.069)+(1.079), (I-130)+(1.069)+(1.080), (I-130)+(1.069)+(1.081), (I-130)+(1.069)+(1.082), (I-130)+(1.069)+(1.083), (I-130)+(1.069)+(1.084), (I-130)+(1.069)+(1.085), (I-130)+(1.069)+(1.086), (I-130)+(1.069)+(1.087), (I-130)+(1.069)+(1.088), (I-130)+(1.069)+(1.089), (I-130)+(1.069)+(1.090), (I-130)+(1.069)+(1.091), (I-130)+(1.069)+(1.092), (I-130)+(1.069)+(2.001), (I-130)+(1.069)+(2.002), (I-130)+(1.069)+(2.003), (I-130)+(1.069)+(2.004), (I-130)+(1.069)+(2.005), (I-130)+(1.069)+(2.006), (I-130)+(1.069)+(2.007), (I-130)+(1.069)+(2.008), (I-130)+(1.069)+(2.009), (I-130)+(1.069)+(2.010), (I-130)+(1.069)+(2.011), (I-130)+(1.069)+(2.012), (I-130)+(1.069)+(2.013), (I-130)+(1.069)+(2.014), (I-130)+(1.069)+(2.015), (I-130)+(1.069)+(2.016), (I-130)+(1.069)+(2.017), (I-130)+(1.069)+(2.018), (I-130)+(1.069)+(2.019), (I-130)+(1.069)+(2.020), (I-130)+(1.069)+(2.021), (I-130)+(1.069)+(2.022), (I-130)+(1.069)+(2.023), (I-130)+(1.069)+(2.024), (I-130)+(1.069)+(2.025), (I-130)+(1.069)+(2.026), (I-130)+(1.069)+(2.027), (I-130)+(1.069)+(2.028), (I-130)+(1.069)+(2.029), (I-130)+(1.069)+(2.030), (I-130)+(1.069)+(2.031), (I-130)+(1.069)+(2.032), (I-130)+(1.069)+(2.033), (I-130)+(1.069)+(2.034), (I-130)+(1.069)+(2.035), (I-130)+(1.069)+(2.036), (I-130)+(1.069)+(2.037), (I-130)+(1.069)+(2.038), (I-130)+(1.069)+(2.039), (I-130)+(1.069)+(2.040), (I-130)+(1.069)+(2.041), (I-130)+(1.069)+(2.042), (I-130)+(1.069)+(2.043), (I-130)+(1.069)+(2.044), (I-130)+(1.069)+(2.045), (I-130)+(1.069)+(2.046), (I-130)+(1.069)+(2.047), (I-130)+(1.069)+(2.048), (I-130)+(1.069)+(2.049), (I-130)+(1.069)+(2.050), (I-130)+(1.069)+(2.051), (I-130)+(1.069)+(2.052), (I-130)+(1.069)+(2.053), (I-130)+(1.069)+(2.054), (I-130)+(1.069)+(2.055), (I-130)+(1.069)+(2.056), (I-130)+(1.069)+(2.057), (I-130)+(1.069)+(2.058), (I-130)+(1.069)+(2.059), (I-130)+(1.069)+(3.001), (I-130)+(1.069)+(3.002), (I-130)+(1.069)+(3.003), (I-130)+(1.069)+(3.004), (I-130)+(1.069)+(3.005), (I-130)+(1.069)+(3.006), (I-130)+(1.069)+(3.007), (I-130)+(1.069)+(3.008), (I-130)+(1.069)+(3.009), (I-130)+(1.069)+(3.010), (I-130)+(1.069)+(3.011), (I-130)+(1.069)+(3.012), (I-130)+(1.069)+(3.013), (I-130)+(1.069)+(3.014), (I-130)+(1.069)+(3.015), (I-130)+(1.069)+(3.016), (I-130)+(1.069)+(3.017), (I-130)+(1.069)+(3.018), (I-130)+(1.069)+(3.019), (I-130)+(1.069)+(3.020), (I-130)+(1.069)+(3.021), (I-130)+(1.069)+(3.022), (I-130)+(1.069)+(3.023), (I-130)+(1.069)+(3.024), (I-130)+(1.069)+(3.025), (I-130)+(1.069)+(3.026), (I-130)+(1.069)+(3.027), (I-130)+(1.069)+(3.028), (I-130)+(1.069)+(3.029), (I-130)+(1.069)+(3.030), (I-130)+(1.069)+(3.031), (I-130)+(1.069)+(5.001), (I-130)+(1.069)+(5.002), (I-130)+(1.069)+(5.003), (I-130)+(1.069)+(5.004), (I-130)+(1.069)+(5.005), (I-130)+(1.069)+(5.006), (I-130)+(1.069)+(5.007), (I-130)+(1.069)+(5.008), (I-130)+(1.069)+(5.009), (I-130)+(1.069)+(5.010), (I-130)+(1.069)+(5.011), (I-130)+(1.069)+(5.012), (I-130)+(1.069)+(5.013), (I-130)+(1.069)+(5.014), (I-130)+(1.069)+(5.015), (I-130)+(1.069)+(5.016), (I-130)+(1.069)+(5.017), (I-130)+(1.069)+(5.018), (I-130)+(1.069)+(5.019), (I-130)+(1.069)+(5.020), (I-130)+(1.069)+(5.021), (I-130)+(1.069)+(5.022), (I-130)+(1.069)+(5.023), (I-130)+(1.069)+(6.001), (I-130)+(1.069)+(6.002), (I-130)+(1.069)+(6.003), (I-130)+(1.069)+(6.004), (I-130)+(1.069)+(7.001), (I-130)+(1.069)+(7.002), (I-130)+(1.069)+(7.003), (I-130)+(1.069)+(7.004), (I-130)+(1.069)+(7.005), (I-130)+(1.069)+(7.006), (I-130)+(1.069)+(9.001), (I-130)+(1.069)+(9.002), (I-130)+(1.069)+(9.003), (I-130)+(1.069)+(9.004), (I-130)+(1.069)+(9.005), (I-130)+(1.069)+(9.006), (I-130)+(1.069)+(9.007), (I-130)+(1.069)+(9.008), (I-130)+(1.069)+(9.009), (I-130)+(1.069)+(14.001), (I-130)+(1.069)+(14.002), (I-130)+(1.069)+(15.008), (I-130)+(1.069)+(15.011), (I-130)+(1.069)+(15.012), (I-130)+(1.069)+(15.016), (I-130)+(1.069)+(15.025), (I-130)+(1.069)+(15.027), (I-130)+(1.069)+(15.047), (I-130)+(1.069)+(15.063), (I-130)+(1.069)+(15.064), (I-130)+(1.069)+(16.001), (I-130)+(1.069)+(16.002), (I-130)+(1.069)+(16.003), (I-130)+(1.069)+(16.004), (I-130)+(1.069)+(16.005), (I-130)+(1.069)+(16.006), (I-130)+(1.069)+(16.007), (I-130)+(1.069)+(16.008), (I-130)+(1.069)+(17.001), (I-130)+(1.069)+(17.002), (I-130)+(1.069)+(17.003), (I-130)+(1.069)+(17.004), (I-130)+(1.069)+(17.005), (I-130)+(1.069)+(17.006), (I-130)+(1.069)+(17.007), (I-130)+(1.069)+(17.008), (I-130)+(1.069)+(17.009), (I-130)+(1.069)+(17.010), (I-130)+(1.069)+(17.011), (I-130)+(1.069)+(17.012), (I-130)+(1.069)+(18.001), (I-130)+(1.070)+(1.071), (I-130)+(1.070)+(1.072), (I-130)+(1.070)+(1.073), (I-130)+(1.070)+(1.074), (I-130)+(1.070)+(1.075), (I-130)+(1.070)+(1.076), (I-130)+(1.070)+(1.077), (I-130)+(1.070)+(1.078), (I-130)+(1.070)+(1.079), (I-130)+(1.070)+(1.080), (I-130)+(1.070)+(1.081), (I-130)+(1.070)+(1.082), (I-130)+(1.070)+(1.083), (I-130)+(1.070)+(1.084), (I-130)+(1.070)+(1.085), (I-130)+(1.070)+(1.086), (I-130)+(1.070)+(1.087), (I-130)+(1.070)+(1.088), (I-130)+(1.070)+(1.089), (I-130)+(1.070)+(1.090), (I-130)+(1.070)+(1.091), (I-130)+(1.070)+(1.092), (I-130)+(1.070)+(2.001), (I-130)+(1.070)+(2.002), (I-130)+(1.070)+(2.003), (I-130)+(1.070)+(2.004), (I-130)+(1.070)+(2.005), (I-130)+(1.070)+(2.006), (I-130)+(1.070)+(2.007), (I-130)+(1.070)+(2.008), (I-130)+(1.070)+(2.009), (I-130)+(1.070)+(2.010), (I-130)+(1.070)+(2.011), (I-130)+(1.070)+(2.012), (I-130)+(1.070)+(2.013), (I-130)+(1.070)+(2.014), (I-130)+(1.070)+(2.015), (I-130)+(1.070)+(2.016), (I-130)+(1.070)+(2.017), (I-130)+(1.070)+(2.018), (I-130)+(1.070)+(2.019), (I-130)+(1.070)+(2.020), (I-130)+(1.070)+(2.021), (I-130)+(1.070)+(2.022), (I-130)+(1.070)+(2.023), (I-130)+(1.070)+(2.024), (I-130)+(1.070)+(2.025), (I-130)+(1.070)+(2.026), (I-130)+(1.070)+(2.027), (I-130)+(1.070)+(2.028), (I-130)+(1.070)+(2.029), (I-130)+(1.070)+(2.030), (I-130)+(1.070)+(2.031), (I-130)+(1.070)+(2.032), (I-130)+(1.070)+(2.033), (I-130)+(1.070)+(2.034), (I-130)+(1.070)+(2.035), (I-130)+(1.070)+(2.036), (I-130)+(1.070)+(2.037), (I-130)+(1.070)+(2.038), (I-130)+(1.070)+(2.039), (I-130)+(1.070)+(2.040), (I-130)+(1.070)+(2.041), (I-130)+(1.070)+(2.042), (I-130)+(1.070)+(2.043), (I-130)+(1.070)+(2.044), (I-130)+(1.070)+(2.045), (I-130)+(1.070)+(2.046), (I-130)+(1.070)+(2.047), (I-130)+(1.070)+(2.048), (I-130)+(1.070)+(2.049), (I-130)+(1.070)+(2.050), (I-130)+(1.070)+(2.051), (I-130)+(1.070)+(2.052), (I-130)+(1.070)+(2.053), (I-130)+(1.070)+(2.054), (I-130)+(1.070)+(2.055), (I-130)+(1.070)+(2.056), (I-130)+(1.070)+(2.057), (I-130)+(1.070)+(2.058), (I-130)+(1.070)+(2.059), (I-130)+(1.070)+(3.001), (I-130)+(1.070)+(3.002), (I-130)+(1.070)+(3.003), (I-130)+(1.070)+(3.004), (I-130)+(1.070)+(3.005), (I-130)+(1.070)+(3.006), (I-130)+(1.070)+(3.007), (I-130)+(1.070)+(3.008), (I-130)+(1.070)+(3.009), (I-130)+(1.070)+(3.010), (I-130)+(1.070)+(3.011), (I-130)+(1.070)+(3.012), (I-130)+(1.070)+(3.013), (I-130)+(1.070)+(3.014), (I-130)+(1.070)+(3.015), (I-130)+(1.070)+(3.016), (I-130)+(1.070)+(3.017), (I-130)+(1.070)+(3.018), (I-130)+(1.070)+(3.019), (I-130)+(1.070)+(3.020), (I-130)+(1.070)+(3.021), (I-130)+(1.070)+(3.022), (I-130)+(1.070)+(3.023), (I-130)+(1.070)+(3.024), (I-130)+(1.070)+(3.025), (I-130)+(1.070)+(3.026), (I-130)+(1.070)+(3.027), (I-130)+(1.070)+(3.028), (I-130)+(1.070)+(3.029), (I-130)+(1.070)+(3.030), (I-130)+(1.070)+(3.031), (I-130)+(1.070)+(5.001), (I-130)+(1.070)+(5.002), (I-130)+(1.070)+(5.003), (I-130)+(1.070)+(5.004), (I-130)+(1.070)+(5.005), (I-130)+(1.070)+(5.006), (I-130)+(1.070)+(5.007), (I-130)+(1.070)+(5.008), (I-130)+(1.070)+(5.009), (I-130)+(1.070)+(5.010), (I-130)+(1.070)+(5.011), (I-130)+(1.070)+(5.012), (I-130)+(1.070)+(5.013), (I-130)+(1.070)+(5.014), (I-130)+(1.070)+(5.015), (I-130)+(1.070)+(5.016), (I-130)+(1.070)+(5.017), (I-130)+(1.070)+(5.018), (I-130)+(1.070)+(5.019), (I-130)+(1.070)+(5.020), (I-130)+(1.070)+(5.021), (I-130)+(1.070)+(5.022), (I-130)+(1.070)+(5.023), (I-130)+(1.070)+(6.001), (I-130)+(1.070)+(6.002), (I-130)+(1.070)+(6.003), (I-130)+(1.070)+(6.004), (I-130)+(1.070)+(7.001), (I-130)+(1.070)+(7.002), (I-130)+(1.070)+(7.003), (I-130)+(1.070)+(7.004), (I-130)+(1.070)+(7.005), (I-130)+(1.070)+(7.006), (I-130)+(1.070)+(9.001), (I-130)+(1.070)+(9.002), (I-130)+(1.070)+(9.003), (I-130)+(1.070)+(9.004), (I-130)+(1.070)+(9.005), (I-130)+(1.070)+(9.006), (I-130)+(1.070)+(9.007), (I-130)+(1.070)+(9.008), (I-130)+(1.070)+(9.009), (I-130)+(1.070)+(14.001), (I-130)+(1.070)+(14.002), (I-130)+(1.070)+(15.008), (I-130)+(1.070)+(15.011), (I-130)+(1.070)+(15.012), (I-130)+(1.070)+(15.016), (I-130)+(1.070)+(15.025), (I-130)+(1.070)+(15.027), (I-130)+(1.070)+(15.047), (I-130)+(1.070)+(15.063), (I-130)+(1.070)+(15.064), (I-130)+(1.070)+(16.001), (I-130)+(1.070)+(16.002), (I-130)+(1.070)+(16.003), (I-130)+(1.070)+(16.004), (I-130)+(1.070)+(16.005), (I-130)+(1.070)+(16.006), (I-130)+(1.070)+(16.007), (I-130)+(1.070)+(16.008), (I-130)+(1.070)+(17.001), (I-130)+(1.070)+(17.002), (I-130)+(1.070)+(17.003), (I-130)+(1.070)+(17.004), (I-130)+(1.070)+(17.005), (I-130)+(1.070)+(17.006), (I-130)+(1.070)+(17.007), (I-130)+(1.070)+(17.008), (I-130)+(1.070)+(17.009), (I-130)+(1.070)+(17.010), (I-130)+(1.070)+(17.011), (I-130)+(1.070)+(17.012), (I-130)+(1.070)+(18.001),
(I-130)+(1.071)+(1.072), (I-130)+(1.071)+(1.073), (I-130)+(1.071)+(1.074), (I-130)+(1.071)+(1.075), (I-130)+(1.071)+(1.076), (I-130)+(1.071)+(1.077), (I-130)+(1.071)+(1.078), (I-130)+(1.071)+(1.079), (I-130)+(1.071)+(1.080), (I-130)+(1.071)+(1.081), (I-130)+(1.071)+(1.082), (I-130)+(1.071)+(1.083), (I-130)+(1.071)+(1.084), (I-130)+(1.071)+(1.085), (I-130)+(1.071)+(1.086), (I-130)+(1.071)+(1.087), (I-130)+(1.071)+(1.088), (I-130)+(1.071)+(1.089), (I-130)+(1.071)+(1.090), (I-130)+(1.071)+(1.091), (I-130)+(1.071)+(1.092), (I-130)+(1.071)+(2.001), (I-130)+(1.071)+(2.002), (I-130)+(1.071)+(2.003), (I-130)+(1.071)+(2.004), (I-130)+(1.071)+(2.005), (I-130)+(1.071)+(2.006), (I-130)+(1.071)+(2.007), (I-130)+(1.071)+(2.008), (I-130)+(1.071)+(2.009), (I-130)+(1.071)+(2.010), (I-130)+(1.071)+(2.011), (I-130)+(1.071)+(2.012), (I-130)+(1.071)+(2.013), (I-130)+(1.071)+(2.014), (I-130)+(1.071)+(2.015), (I-130)+(1.071)+(2.016), (I-130)+(1.071)+(2.017), (I-130)+(1.071)+(2.018), (I-130)+(1.071)+(2.019), (I-130)+(1.071)+(2.020), (I-130)+(1.071)+(2.021), (I-130)+(1.071)+(2.022), (I-130)+(1.071)+(2.023), (I-130)+(1.071)+(2.024), (I-130)+(1.071)+(2.025), (I-130)+(1.071)+(2.026), (I-130)+(1.071)+(2.027), (I-130)+(1.071)+(2.028), (I-130)+(1.071)+(2.029), (I-130)+(1.071)+(2.030), (I-130)+(1.071)+(2.031), (I-130)+(1.071)+(2.032), (I-130)+(1.071)+(2.033), (I-130)+(1.071)+(2.034), (I-130)+(1.071)+(2.035), (I-130)+(1.071)+(2.036), (I-130)+(1.071)+(2.037), (I-130)+(1.071)+(2.038), (I-130)+(1.071)+(2.039), (I-130)+(1.071)+(2.040), (I-130)+(1.071)+(2.041), (I-130)+(1.071)+(2.042), (I-130)+(1.071)+(2.043), (I-130)+(1.071)+(2.044), (I-130)+(1.071)+(2.045), (I-130)+(1.071)+(2.046), (I-130)+(1.071)+(2.047), (I-130)+(1.071)+(2.048), (I-130)+(1.071)+(2.049), (I-130)+(1.071)+(2.050), (I-130)+(1.071)+(2.051), (I-130)+(1.071)+(2.052), (I-130)+(1.071)+(2.053), (I-130)+(1.071)+(2.054), (I-130)+(1.071)+(2.055), (I-130)+(1.071)+(2.056), (I-130)+(1.071)+(2.057), (I-130)+(1.071)+(2.058), (I-130)+(1.071)+(2.059), (I-130)+(1.071)+(3.001), (I-130)+(1.071)+(3.002), (I-130)+(1.071)+(3.003), (I-130)+(1.071)+(3.004), (I-130)+(1.071)+(3.005), (I-130)+(1.071)+(3.006), (I-130)+(1.071)+(3.007), (I-130)+(1.071)+(3.008), (I-130)+(1.071)+(3.009), (I-130)+(1.071)+(3.010), (I-130)+(1.071)+(3.011), (I-130)+(1.071)+(3.012), (I-130)+(1.071)+(3.013), (I-130)+(1.071)+(3.014), (I-130)+(1.071)+(3.015), (I-130)+(1.071)+(3.016), (I-130)+(1.071)+(3.017), (I-130)+(1.071)+(3.018), (I-130)+(1.071)+(3.019), (I-130)+(1.071)+(3.020), (I-130)+(1.071)+(3.021), (I-130)+(1.071)+(3.022), (I-130)+(1.071)+(3.023), (I-130)+(1.071)+(3.024), (I-130)+(1.071)+(3.025), (I-130)+(1.071)+(3.026), (I-130)+(1.071)+(3.027), (I-130)+(1.071)+(3.028), (I-130)+(1.071)+(3.029), (I-130)+(1.071)+(3.030), (I-130)+(1.071)+(3.031), (I-130)+(1.071)+(5.001), (I-130)+(1.071)+(5.002), (I-130)+(1.071)+(5.003), (I-130)+(1.071)+(5.004), (I-130)+(1.071)+(5.005), (I-130)+(1.071)+(5.006), (I-130)+(1.071)+(5.007), (I-130)+(1.071)+(5.008), (I-130)+(1.071)+(5.009), (I-130)+(1.071)+(5.010), (I-130)+(1.071)+(5.011), (I-130)+(1.071)+(5.012), (I-130)+(1.071)+(5.013), (I-130)+(1.071)+(5.014), (I-130)+(1.071)+(5.015), (I-130)+(1.071)+(5.016), (I-130)+(1.071)+(5.017), (I-130)+(1.071)+(5.018), (I-130)+(1.071)+(5.019), (I-130)+(1.071)+(5.020), (I-130)+(1.071)+(5.021), (I-130)+(1.071)+(5.022), (I-130)+(1.071)+(5.023), (I-130)+(1.071)+(6.001), (I-130)+(1.071)+(6.002), (I-130)+(1.071)+(6.003), (I-130)+(1.071)+(6.004), (I-130)+(1.071)+(7.001), (I-130)+(1.071)+(7.002), (I-130)+(1.071)+(7.003), (I-130)+(1.071)+(7.004), (I-130)+(1.071)+(7.005), (I-130)+(1.071)+(7.006), (I-130)+(1.071)+(9.001), (I-130)+(1.071)+(9.002), (I-130)+(1.071)+(9.003), (I-130)+(1.071)+(9.004), (I-130)+(1.071)+(9.005), (I-130)+(1.071)+(9.006), (I-130)+(1.071)+(9.007), (I-130)+(1.071)+(9.008), (I-130)+(1.071)+(9.009), (I-130)+(1.071)+(14.001), (I-130)+(1.071)+(14.002), (I-130)+(1.071)+(15.008), (I-130)+(1.071)+(15.011), (I-130)+(1.071)+(15.012), (I-130)+(1.071)+(15.016), (I-130)+(1.071)+(15.025), (I-130)+(1.071)+(15.027), (I-130)+(1.071)+(15.047), (I-130)+(1.071)+(15.063), (I-130)+(1.071)+(15.064), (I-130)+(1.071)+(16.001), (I-130)+(1.071)+(16.002), (I-130)+(1.071)+(16.003), (I-130)+(1.071)+(16.004), (I-130)+(1.071)+(16.005), (I-130)+(1.071)+(16.006), (I-130)+(1.071)+(16.007), (I-130)+(1.071)+(16.008), (I-130)+(1.071)+(17.001), (I-130)+(1.071)+(17.002), (I-130)+(1.071)+(17.003), (I-130)+(1.071)+(17.004), (I-130)+(1.071)+(17.005), (I-130)+(1.071)+(17.006), (I-130)+(1.071)+(17.007), (I-130)+(1.071)+(17.008), (I-130)+(1.071)+(17.009), (I-130)+(1.071)+(17.010), (I-130)+(1.071)+(17.011), (I-130)+(1.071)+(17.012), (I-130)+(1.071)+(18.001), (I-130)+(1.072)+(1.073), (I-130)+(1.072)+(1.074), (I-130)+(1.072)+(1.075), (I-130)+(1.072)+(1.076), (I-130)+(1.072)+(1.077), (I-130)+(1.072)+(1.078), (I-130)+(1.072)+(1.079), (I-130)+(1.072)+(1.080), (I-130)+(1.072)+(1.081), (I-130)+(1.072)+(1.082), (I-130)+(1.072)+(1.083), (I-130)+(1.072)+(1.084), (I-130)+(1.072)+(1.085), (I-130)+(1.072)+(1.086), (I-130)+(1.072)+(1.087), (I-130)+(1.072)+(1.088), (I-130)+(1.072)+(1.089), (I-130)+(1.072)+(1.090), (I-130)+(1.072)+(1.091), (I-130)+(1.072)+(1.092), (I-130)+(1.072)+(2.001), (I-130)+(1.072)+(2.002), (I-130)+(1.072)+(2.003), (I-130)+(1.072)+(2.004), (I-130)+(1.072)+(2.005), (I-130)+(1.072)+(2.006), (I-130)+(1.072)+(2.007), (I-130)+(1.072)+(2.008), (I-130)+(1.072)+(2.009), (I-130)+(1.072)+(2.010), (I-130)+(1.072)+(2.011), (I-130)+(1.072)+(2.012), (I-130)+(1.072)+(2.013), (I-130)+(1.072)+(2.014), (I-130)+(1.072)+(2.015), (I-130)+(1.072)+(2.016), (I-130)+(1.072)+(2.017), (I-130)+(1.072)+(2.018), (I-130)+(1.072)+(2.019), (I-130)+(1.072)+(2.020), (I-130)+(1.072)+(2.021), (I-130)+(1.072)+(2.022), (I-130)+(1.072)+(2.023), (I-130)+(1.072)+(2.024), (I-130)+(1.072)+(2.025), (I-130)+(1.072)+(2.026), (I-130)+(1.072)+(2.027), (I-130)+(1.072)+(2.028), (I-130)+(1.072)+(2.029), (I-130)+(1.072)+(2.030), (I-130)+(1.072)+(2.031), (I-130)+(1.072)+(2.032), (I-130)+(1.072)+(2.033), (I-130)+(1.072)+(2.034), (I-130)+(1.072)+(2.035), (I-130)+(1.072)+(2.036), (I-130)+(1.072)+(2.037), (I-130)+(1.072)+(2.038), (I-130)+(1.072)+(2.039), (I-130)+(1.072)+(2.040), (I-130)+(1.072)+(2.041), (I-130)+(1.072)+(2.042), (I-130)+(1.072)+(2.043), (I-130)+(1.072)+(2.044), (I-130)+(1.072)+(2.045), (I-130)+(1.072)+(2.046), (I-130)+(1.072)+(2.047), (I-130)+(1.072)+(2.048), (I-130)+(1.072)+(2.049), (I-130)+(1.072)+(2.050), (I-130)+(1.072)+(2.051), (I-130)+(1.072)+(2.052), (I-130)+(1.072)+(2.053), (I-130)+(1.072)+(2.054), (I-130)+(1.072)+(2.055), (I-130)+(1.072)+(2.056), (I-130)+(1.072)+(2.057), (I-130)+(1.072)+(2.058), (I-130)+(1.072)+(2.059), (I-130)+(1.072)+(3.001), (I-130)+(1.072)+(3.002), (I-130)+(1.072)+(3.003), (I-130)+(1.072)+(3.004), (I-130)+(1.072)+(3.005), (I-130)+(1.072)+(3.006), (I-130)+(1.072)+(3.007), (I-130)+(1.072)+(3.008), (I-130)+(1.072)+(3.009), (I-130)+(1.072)+(3.010), (I-130)+(1.072)+(3.011), (I-130)+(1.072)+(3.012), (I-130)+(1.072)+(3.013), (I-130)+(1.072)+(3.014), (I-130)+(1.072)+(3.015), (I-130)+(1.072)+(3.016), (I-130)+(1.072)+(3.017), (I-130)+(1.072)+(3.018), (I-130)+(1.072)+(3.019), (I-130)+(1.072)+(3.020), (I-130)+(1.072)+(3.021), (I-130)+(1.072)+(3.022), (I-130)+(1.072)+(3.023), (I-130)+(1.072)+(3.024), (I-130)+(1.072)+(3.025), (I-130)+(1.072)+(3.026), (I-130)+(1.072)+(3.027), (I-130)+(1.072)+(3.028), (I-130)+(1.072)+(3.029), (I-130)+(1.072)+(3.030), (I-130)+(1.072)+(3.031), (I-130)+(1.072)+(5.001), (I-130)+(1.072)+(5.002), (I-130)+(1.072)+(5.003), (I-130)+(1.072)+(5.004), (I-130)+(1.072)+(5.005), (I-130)+(1.072)+(5.006), (I-130)+(1.072)+(5.007), (I-130)+(1.072)+(5.008), (I-130)+(1.072)+(5.009), (I-130)+(1.072)+(5.010), (I-130)+(1.072)+(5.011), (I-130)+(1.072)+(5.012), (I-130)+(1.072)+(5.013), (I-130)+(1.072)+(5.014), (I-130)+(1.072)+(5.015), (I-130)+(1.072)+(5.016), (I-130)+(1.072)+(5.017), (I-130)+(1.072)+(5.018), (I-130)+(1.072)+(5.019), (I-130)+(1.072)+(5.020), (I-130)+(1.072)+(5.021), (I-130)+(1.072)+(5.022), (I-130)+(1.072)+(5.023), (I-130)+(1.072)+(6.001), (I-130)+(1.072)+(6.002), (I-130)+(1.072)+(6.003), (I-130)+(1.072)+(6.004), (I-130)+(1.072)+(7.001), (I-130)+(1.072)+(7.002), (I-130)+(1.072)+(7.003), (I-130)+(1.072)+(7.004), (I-130)+(1.072)+(7.005), (I-130)+(1.072)+(7.006), (I-130)+(1.072)+(9.001), (I-130)+(1.072)+(9.002), (I-130)+(1.072)+(9.003), (I-130)+(1.072)+(9.004), (I-130)+(1.072)+(9.005), (I-130)+(1.072)+(9.006), (I-130)+(1.072)+(9.007), (I-130)+(1.072)+(9.008), (I-130)+(1.072)+(9.009), (I-130)+(1.072)+(14.001), (I-130)+(1.072)+(14.002), (I-130)+(1.072)+(15.008), (I-130)+(1.072)+(15.011), (I-130)+(1.072)+(15.012), (I-130)+(1.072)+(15.016), (I-130)+(1.072)+(15.025), (I-130)+(1.072)+(15.027), (I-130)+(1.072)+(15.047), (I-130)+(1.072)+(15.063), (I-130)+(1.072)+(15.064), (I-130)+(1.072)+(16.001), (I-130)+(1.072)+(16.002), (I-130)+(1.072)+(16.003), (I-130)+(1.072)+(16.004), (I-130)+(1.072)+(16.005), (I-130)+(1.072)+(16.006), (I-130)+(1.072)+(16.007), (I-130)+(1.072)+(16.008), (I-130)+(1.072)+(17.001), (I-130)+(1.072)+(17.002), (I-130)+(1.072)+(17.003), (I-130)+(1.072)+(17.004), (I-130)+(1.072)+(17.005), (I-130)+(1.072)+(17.006), (I-130)+(1.072)+(17.007), (I-130)+(1.072)+(17.008), (I-130)+(1.072)+(17.009), (I-130)+(1.072)+(17.010), (I-130)+(1.072)+(17.011), (I-130)+(1.072)+(17.012), (I-130)+(1.072)+(18.001), (I-130)+(1.073)+(1.074), (I-130)+(1.073)+(1.075), (I-130)+(1.073)+(1.076), (I-130)+(1.073)+(1.077), (I-130)+(1.073)+(1.078), (I-130)+(1.073)+(1.079), (I-130)+(1.073)+(1.080), (I-130)+(1.073)+(1.081), (I-130)+(1.073)+(1.082), (I-130)+(1.073)+(1.083), (I-130)+(1.073)+(1.084), (I-130)+(1.073)+(1.085), (I-130)+(1.073)+(1.086), (I-130)+(1.073)+(1.087), (I-130)+(1.073)+(1.088), (I-130)+(1.073)+(1.089), (I-130)+(1.073)+(1.090), (I-130)+(1.073)+(1.091), (I-130)+(1.073)+(1.092), (I-130)+(1.073)+(2.001), (I-130)+(1.073)+(2.002), (I-130)+(1.073)+(2.003), (I-130)+(1.073)+(2.004), (I-130)+(1.073)+(2.005), (I-130)+(1.073)+(2.006), (I-130)+(1.073)+(2.007), (I-130)+(1.073)+(2.008), (I-130)+(1.073)+(2.009), (I-130)+(1.073)+(2.010), (I-130)+(1.073)+(2.011), (I-130)+(1.073)+(2.012), (I-130)+(1.073)+(2.013), (I-130)+(1.073)+(2.014), (I-130)+(1.073)+(2.015), (I-130)+(1.073)+(2.016), (I-130)+(1.073)+(2.017), (I-130)+(1.073)+(2.018), (I-130)+(1.073)+(2.019), (I-130)+(1.073)+(2.020), (I-130)+(1.073)+(2.021), (I-130)+(1.073)+(2.022), (I-130)+(1.073)+(2.023), (I-130)+(1.073)+(2.024), (I-130)+(1.073)+(2.025), (I-130)+(1.073)+(2.026), (I-130)+(1.073)+(2.027), (I-130)+(1.073)+(2.028), (I-130)+(1.073)+(2.029), (I-130)+(1.073)+(2.030), (I-130)+(1.073)+(2.031), (I-130)+(1.073)+(2.032), (I-130)+(1.073)+(2.033), (I-130)+(1.073)+(2.034), (I-130)+(1.073)+(2.035), (I-130)+(1.073)+(2.036), (I-130)+(1.073)+(2.037), (I-130)+(1.073)+(2.038), (I-130)+(1.073)+(2.039), (I-130)+(1.073)+(2.040), (I-130)+(1.073)+(2.041), (I-130)+(1.073)+(2.042), (I-130)+(1.073)+(2.043), (I-130)+(1.073)+(2.044), (I-130)+(1.073)+(2.045), (I-130)+(1.073)+(2.046), (I-130)+(1.073)+(2.047), (I-130)+(1.073)+(2.048), (I-130)+(1.073)+(2.049), (I-130)+(1.073)+(2.050), (I-130)+(1.073)+(2.051), (I-130)+(1.073)+(2.052), (I-130)+(1.073)+(2.053), (I-130)+(1.073)+(2.054), (I-130)+(1.073)+(2.055), (I-130)+(1.073)+(2.056), (I-130)+(1.073)+(2.057), (I-130)+(1.073)+(2.058), (I-130)+(1.073)+(2.059), (I-130)+(1.073)+(3.001), (I-130)+(1.073)+(3.002), (I-130)+(1.073)+(3.003), (I-130)+(1.073)+(3.004), (I-130)+(1.073)+(3.005), (I-130)+(1.073)+(3.006), (I-130)+(1.073)+(3.007), (I-130)+(1.073)+(3.008), (I-130)+(1.073)+(3.009), (I-130)+(1.073)+(3.010), (I-130)+(1.073)+(3.011), (I-130)+(1.073)+(3.012), (I-130)+(1.073)+(3.013), (I-130)+(1.073)+(3.014), (I-130)+(1.073)+(3.015), (I-130)+(1.073)+(3.016), (I-130)+(1.073)+(3.017), (I-130)+(1.073)+(3.018), (I-130)+(1.073)+(3.019), (I-130)+(1.073)+(3.020), (I-130)+(1.073)+(3.021), (I-130)+(1.073)+(3.022), (I-130)+(1.073)+(3.023), (I-130)+(1.073)+(3.024), (I-130)+(1.073)+(3.025), (I-130)+(1.073)+(3.026), (I-130)+(1.073)+(3.027), (I-130)+(1.073)+(3.028), (I-130)+(1.073)+(3.029), (I-130)+(1.073)+(3.030), (I-130)+(1.073)+(3.031), (I-130)+(1.073)+(5.001), (I-130)+(1.073)+(5.002), (I-130)+(1.073)+(5.003), (I-130)+(1.073)+(5.004), (I-130)+(1.073)+(5.005), (I-130)+(1.073)+(5.006), (I-130)+(1.073)+(5.007), (I-130)+(1.073)+(5.008), (I-130)+(1.073)+(5.009), (I-130)+(1.073)+(5.010), (I-130)+(1.073)+(5.011), (I-130)+(1.073)+(5.012), (I-130)+(1.073)+(5.013), (I-130)+(1.073)+(5.014), (I-130)+(1.073)+(5.015), (I-130)+(1.073)+(5.016), (I-130)+(1.073)+(5.017), (I-130)+(1.073)+(5.018), (I-130)+(1.073)+(5.019), (I-130)+(1.073)+(5.020), (I-130)+(1.073)+(5.021), (I-130)+(1.073)+(5.022), (I-130)+(1.073)+(5.023), (I-130)+(1.073)+(6.001), (I-130)+(1.073)+(6.002), (I-130)+(1.073)+(6.003), (I-130)+(1.073)+(6.004), (I-130)+(1.073)+(7.001), (I-130)+(1.073)+(7.002), (I-130)+(1.073)+(7.003), (I-130)+(1.073)+(7.004), (I-130)+(1.073)+(7.005), (I-130)+(1.073)+(7.006), (I-130)+(1.073)+(9.001), (I-130)+(1.073)+(9.002), (I-130)+(1.073)+(9.003), (I-130)+(1.073)+(9.004), (I-130)+(1.073)+(9.005), (I-130)+(1.073)+(9.006), (I-130)+(1.073)+(9.007), (I-130)+(1.073)+(9.008), (I-130)+(1.073)+(9.009), (I-130)+(1.073)+(14.001), (I-130)+(1.073)+(14.002), (I-130)+(1.073)+(15.008), (I-130)+(1.073)+(15.011), (I-130)+(1.073)+(15.012), (I-130)+(1.073)+(15.016), (I-130)+(1.073)+(15.025), (I-130)+(1.073)+(15.027), (I-130)+(1.073)+(15.047), (I-130)+(1.073)+(15.063), (I-130)+(1.073)+(15.064), (I-130)+(1.073)+(16.001), (I-130)+(1.073)+(16.002), (I-130)+(1.073)+(16.003), (I-130)+(1.073)+(16.004), (I-130)+(1.073)+(16.005), (I-130)+(1.073)+(16.006), (I-130)+(1.073)+(16.007), (I-130)+(1.073)+(16.008), (I-130)+(1.073)+(17.001), (I-130)+(1.073)+(17.002), (I-130)+(1.073)+(17.003), (I-130)+(1.073)+(17.004), (I-130)+(1.073)+(17.005), (I-130)+(1.073)+(17.006), (I-130)+(1.073)+(17.007), (I-130)+(1.073)+(17.008), (I-130)+(1.073)+(17.009), (I-130)+(1.073)+(17.010), (I-130)+(1.073)+(17.011), (I-130)+(1.073)+(17.012), (I-130)+(1.073)+(18.001), (I-130)+(1.074)+(1.075), (I-130)+(1.074)+(1.076), (I-130)+(1.074)+(1.077), (I-130)+(1.074)+(1.078), (I-130)+(1.074)+(1.079), (I-130)+(1.074)+(1.080), (I-130)+(1.074)+(1.081), (I-130)+(1.074)+(1.082), (I-130)+(1.074)+(1.083), (I-130)+(1.074)+(1.084), (I-130)+(1.074)+(1.085), (I-130)+(1.074)+(1.086), (I-130)+(1.074)+(1.087), (I-130)+(1.074)+(1.088), (I-130)+(1.074)+(1.089), (I-130)+(1.074)+(1.090), (I-130)+(1.074)+(1.091), (I-130)+(1.074)+(1.092), (I-130)+(1.074)+(2.001), (I-130)+(1.074)+(2.002), (I-130)+(1.074)+(2.003), (I-130)+(1.074)+(2.004), (I-130)+(1.074)+(2.005), (I-130)+(1.074)+(2.006), (I-130)+(1.074)+(2.007), (I-130)+(1.074)+(2.008), (I-130)+(1.074)+(2.009), (I-130)+(1.074)+(2.010), (I-130)+(1.074)+(2.011), (I-130)+(1.074)+(2.012), (I-130)+(1.074)+(2.013), (I-130)+(1.074)+(2.014), (I-130)+(1.074)+(2.015), (I-130)+(1.074)+(2.016), (I-130)+(1.074)+(2.017), (I-130)+(1.074)+(2.018), (I-130)+(1.074)+(2.019), (I-130)+(1.074)+(2.020), (I-130)+(1.074)+(2.021), (I-130)+(1.074)+(2.022), (I-130)+(1.074)+(2.023), (I-130)+(1.074)+(2.024), (I-130)+(1.074)+(2.025), (I-130)+(1.074)+(2.026), (I-130)+(1.074)+(2.027), (I-130)+(1.074)+(2.028), (I-130)+(1.074)+(2.029), (I-130)+(1.074)+(2.030), (I-130)+(1.074)+(2.031), (I-130)+(1.074)+(2.032), (I-130)+(1.074)+(2.033), (I-130)+(1.074)+(2.034), (I-130)+(1.074)+(2.035), (I-130)+(1.074)+(2.036), (I-130)+(1.074)+(2.037), (I-130)+(1.074)+(2.038), (I-130)+(1.074)+(2.039), (I-130)+(1.074)+(2.040), (I-130)+(1.074)+(2.041), (I-130)+(1.074)+(2.042), (I-130)+(1.074)+(2.043), (I-130)+(1.074)+(2.044), (I-130)+(1.074)+(2.045), (I-130)+(1.074)+(2.046), (I-130)+(1.074)+(2.047), (I-130)+(1.074)+(2.048), (I-130)+(1.074)+(2.049), (I-130)+(1.074)+(2.050), (I-130)+(1.074)+(2.051), (I-130)+(1.074)+(2.052), (I-130)+(1.074)+(2.053), (I-130)+(1.074)+(2.054), (I-130)+(1.074)+(2.055), (I-130)+(1.074)+(2.056), (I-130)+(1.074)+(2.057), (I-130)+(1.074)+(2.058), (I-130)+(1.074)+(2.059), (I-130)+(1.074)+(3.001), (I-130)+(1.074)+(3.002), (I-130)+(1.074)+(3.003), (I-130)+(1.074)+(3.004), (I-130)+(1.074)+(3.005), (I-130)+(1.074)+(3.006), (I-130)+(1.074)+(3.007), (I-130)+(1.074)+(3.008), (I-130)+(1.074)+(3.009), (I-130)+(1.074)+(3.010), (I-130)+(1.074)+(3.011), (I-130)+(1.074)+(3.012), (I-130)+(1.074)+(3.013), (I-130)+(1.074)+(3.014), (I-130)+(1.074)+(3.015), (I-130)+(1.074)+(3.016), (I-130)+(1.074)+(3.017), (I-130)+(1.074)+(3.018), (I-130)+(1.074)+(3.019), (I-130)+(1.074)+(3.020), (I-130)+(1.074)+(3.021), (I-130)+(1.074)+(3.022), (I-130)+(1.074)+(3.023), (I-130)+(1.074)+(3.024), (I-130)+(1.074)+(3.025), (I-130)+(1.074)+(3.026), (I-130)+(1.074)+(3.027), (I-130)+(1.074)+(3.028), (I-130)+(1.074)+(3.029), (I-130)+(1.074)+(3.030), (I-130)+(1.074)+(3.031), (I-130)+(1.074)+(5.001), (I-130)+(1.074)+(5.002), (I-130)+(1.074)+(5.003), (I-130)+(1.074)+(5.004), (I-130)+(1.074)+(5.005), (I-130)+(1.074)+(5.006), (I-130)+(1.074)+(5.007), (I-130)+(1.074)+(5.008), (I-130)+(1.074)+(5.009), (I-130)+(1.074)+(5.010), (I-130)+(1.074)+(5.011), (I-130)+(1.074)+(5.012), (I-130)+(1.074)+(5.013), (I-130)+(1.074)+(5.014), (I-130)+(1.074)+(5.015), (I-130)+(1.074)+(5.016), (I-130)+(1.074)+(5.017), (I-130)+(1.074)+(5.018), (I-130)+(1.074)+(5.019), (I-130)+(1.074)+(5.020), (I-130)+(1.074)+(5.021), (I-130)+(1.074)+(5.022), (I-130)+(1.074)+(5.023), (I-130)+(1.074)+(6.001), (I-130)+(1.074)+(6.002), (I-130)+(1.074)+(6.003), (I-130)+(1.074)+(6.004), (I-130)+(1.074)+(7.001), (I-130)+(1.074)+(7.002), (I-130)+(1.074)+(7.003), (I-130)+(1.074)+(7.004), (I-130)+(1.074)+(7.005), (I-130)+(1.074)+(7.006), (I-130)+(1.074)+(9.001), (I-130)+(1.074)+(9.002), (I-130)+(1.074)+(9.003), (I-130)+(1.074)+(9.004), (I-130)+(1.074)+(9.005), (I-130)+(1.074)+(9.006), (I-130)+(1.074)+(9.007), (I-130)+(1.074)+(9.008), (I-130)+(1.074)+(9.009), (I-130)+(1.074)+(14.001), (I-130)+(1.074)+(14.002), (I-130)+(1.074)+(15.008), (I-130)+(1.074)+(15.011), (I-130)+(1.074)+(15.012), (I-130)+(1.074)+(15.016), (I-130)+(1.074)+(15.025), (I-130)+(1.074)+(15.027), (I-130)+(1.074)+(15.047), (I-130)+(1.074)+(15.063), (I-130)+(1.074)+(15.064), (I-130)+(1.074)+(16.001), (I-130)+(1.074)+(16.002), (I-130)+(1.074)+(16.003), (I-130)+(1.074)+(16.004), (I-130)+(1.074)+(16.005), (I-130)+(1.074)+(16.006), (I-130)+(1.074)+(16.007), (I-130)+(1.074)+(16.008), (I-130)+(1.074)+(17.001), (I-130)+(1.074)+(17.002), (I-130)+(1.074)+(17.003), (I-130)+(1.074)+(17.004), (I-130)+(1.074)+(17.005), (I-130)+(1.074)+(17.006), (I-130)+(1.074)+(17.007), (I-130)+(1.074)+(17.008), (I-130)+(1.074)+(17.009), (I-130)+(1.074)+(17.010), (I-130)+(1.074)+(17.011), (I-130)+(1.074)+(17.012), (I-130)+(1.074)+(18.001), (I-130)+(1.075)+(1.076), (I-130)+(1.075)+(1.077), (I-130)+(1.075)+(1.078), (I-130)+(1.075)+(1.079), (I-130)+(1.075)+(1.080), (I-130)+(1.075)+(1.081), (I-130)+(1.075)+(1.082), (I-130)+(1.075)+(1.083), (I-130)+(1.075)+(1.084), (I-130)+(1.075)+(1.085), (I-130)+(1.075)+(1.086), (I-130)+(1.075)+(1.087), (I-130)+(1.075)+(1.088), (I-130)+(1.075)+(1.089), (I-130)+(1.075)+(1.090), (I-130)+(1.075)+(1.091), (I-130)+(1.075)+(1.092), (I-130)+(1.075)+(2.001), (I-130)+(1.075)+(2.002), (I-130)+(1.075)+(2.003), (I-130)+(1.075)+(2.004), (I-130)+(1.075)+(2.005), (I-130)+(1.075)+(2.006), (I-130)+(1.075)+(2.007), (I-130)+(1.075)+(2.008), (I-130)+(1.075)+(2.009), (I-130)+(1.075)+(2.010), (I-130)+(1.075)+(2.011), (I-130)+(1.075)+(2.012), (I-130)+(1.075)+(2.013), (I-130)+(1.075)+(2.014), (I-130)+(1.075)+(2.015), (I-130)+(1.075)+(2.016), (I-130)+(1.075)+(2.017), (I-130)+(1.075)+(2.018), (I-130)+(1.075)+(2.019), (I-130)+(1.075)+(2.020), (I-130)+(1.075)+(2.021), (I-130)+(1.075)+(2.022), (I-130)+(1.075)+(2.023), (I-130)+(1.075)+(2.024), (I-130)+(1.075)+(2.025), (I-130)+(1.075)+(2.026), (I-130)+(1.075)+(2.027), (I-130)+(1.075)+(2.028), (I-130)+(1.075)+(2.029), (I-130)+(1.075)+(2.030), (I-130)+(1.075)+(2.031), (I-130)+(1.075)+(2.032), (I-130)+(1.075)+(2.033), (I-130)+(1.075)+(2.034), (I-130)+(1.075)+(2.035), (I-130)+(1.075)+(2.036), (I-130)+(1.075)+(2.037), (I-130)+(1.075)+(2.038), (I-130)+(1.075)+(2.039), (I-130)+(1.075)+(2.040), (I-130)+(1.075)+(2.041), (I-130)+(1.075)+(2.042), (I-130)+(1.075)+(2.043), (I-130)+(1.075)+(2.044), (I-130)+(1.075)+(2.045), (I-130)+(1.075)+(2.046), (I-130)+(1.075)+(2.047), (I-130)+(1.075)+(2.048), (I-130)+(1.075)+(2.049), (I-130)+(1.075)+(2.050), (I-130)+(1.075)+(2.051), (I-130)+(1.075)+(2.052), (I-130)+(1.075)+(2.053), (I-130)+(1.075)+(2.054), (I-130)+(1.075)+(2.055), (I-130)+(1.075)+(2.056), (I-130)+(1.075)+(2.057), (I-130)+(1.075)+(2.058), (I-130)+(1.075)+(2.059), (I-130)+(1.075)+(3.001), (I-130)+(1.075)+(3.002), (I-130)+(1.075)+(3.003), (I-130)+(1.075)+(3.004), (I-130)+(1.075)+(3.005), (I-130)+(1.075)+(3.006), (I-130)+(1.075)+(3.007), (I-130)+(1.075)+(3.008), (I-130)+(1.075)+(3.009), (I-130)+(1.075)+(3.010), (I-130)+(1.075)+(3.011), (I-130)+(1.075)+(3.012), (I-130)+(1.075)+(3.013), (I-130)+(1.075)+(3.014), (I-130)+(1.075)+(3.015), (I-130)+(1.075)+(3.016), (I-130)+(1.075)+(3.017), (I-130)+(1.075)+(3.018), (I-130)+(1.075)+(3.019), (I-130)+(1.075)+(3.020), (I-130)+(1.075)+(3.021), (I-130)+(1.075)+(3.022), (I-130)+(1.075)+(3.023), (I-130)+(1.075)+(3.024), (I-130)+(1.075)+(3.025), (I-130)+(1.075)+(3.026), (I-130)+(1.075)+(3.027), (I-130)+(1.075)+(3.028), (I-130)+(1.075)+(3.029), (I-130)+(1.075)+(3.030), (I-130)+(1.075)+(3.031), (I-130)+(1.075)+(5.001), (I-130)+(1.075)+(5.002), (I-130)+(1.075)+(5.003), (I-130)+(1.075)+(5.004), (I-130)+(1.075)+(5.005), (I-130)+(1.075)+(5.006), (I-130)+(1.075)+(5.007), (I-130)+(1.075)+(5.008), (I-130)+(1.075)+(5.009), (I-130)+(1.075)+(5.010), (I-130)+(1.075)+(5.011), (I-130)+(1.075)+(5.012), (I-130)+(1.075)+(5.013), (I-130)+(1.075)+(5.014), (I-130)+(1.075)+(5.015), (I-130)+(1.075)+(5.016), (I-130)+(1.075)+(5.017), (I-130)+(1.075)+(5.018), (I-130)+(1.075)+(5.019), (I-130)+(1.075)+(5.020), (I-130)+(1.075)+(5.021), (I-130)+(1.075)+(5.022), (I-130)+(1.075)+(5.023), (I-130)+(1.075)+(6.001), (I-130)+(1.075)+(6.002), (I-130)+(1.075)+(6.003), (I-130)+(1.075)+(6.004), (I-130)+(1.075)+(7.001), (I-130)+(1.075)+(7.002), (I-130)+(1.075)+(7.003), (I-130)+(1.075)+(7.004), (I-130)+(1.075)+(7.005), (I-130)+(1.075)+(7.006), (I-130)+(1.075)+(9.001), (I-130)+(1.075)+(9.002), (I-130)+(1.075)+(9.003), (I-130)+(1.075)+(9.004), (I-130)+(1.075)+(9.005), (I-130)+(1.075)+(9.006), (I-130)+(1.075)+(9.007), (I-130)+(1.075)+(9.008), (I-130)+(1.075)+(9.009), (I-130)+(1.075)+(14.001), (I-130)+(1.075)+(14.002), (I-130)+(1.075)+(15.008), (I-130)+(1.075)+(15.011), (I-130)+(1.075)+(15.012), (I-130)+(1.075)+(15.016), (I-130)+(1.075)+(15.025), (I-130)+(1.075)+(15.027), (I-130)+(1.075)+(15.047), (I-130)+(1.075)+(15.063), (I-130)+(1.075)+(15.064), (I-130)+(1.075)+(16.001), (I-130)+(1.075)+(16.002), (I-130)+(1.075)+(16.003), (I-130)+(1.075)+(16.004), (I-130)+(1.075)+(16.005), (I-130)+(1.075)+(16.006), (I-130)+(1.075)+(16.007), (I-130)+(1.075)+(16.008), (I-130)+(1.075)+(17.001), (I-130)+(1.075)+(17.002), (I-130)+(1.075)+(17.003), (I-130)+(1.075)+(17.004), (I-130)+(1.075)+(17.005), (I-130)+(1.075)+(17.006), (I-130)+(1.075)+(17.007), (I-130)+(1.075)+(17.008), (I-130)+(1.075)+(17.009), (I-130)+(1.075)+(17.010), (I-130)+(1.075)+(17.011), (I-130)+(1.075)+(17.012), (I-130)+(1.075)+(18.001), (I-130)+(1.076)+(1.077), (I-130)+(1.076)+(1.078), (I-130)+(1.076)+(1.079), (I-130)+(1.076)+(1.080), (I-130)+(1.076)+(1.081), (I-130)+(1.076)+(1.082), (I-130)+(1.076)+(1.083), (I-130)+(1.076)+(1.084), (I-130)+(1.076)+(1.085), (I-130)+(1.076)+(1.086), (I-130)+(1.076)+(1.087), (I-130)+(1.076)+(1.088), (I-130)+(1.076)+(1.089), (I-130)+(1.076)+(1.090), (I-130)+(1.076)+(1.091), (I-130)+(1.076)+(1.092), (I-130)+(1.076)+(2.001), (I-130)+(1.076)+(2.002), (I-130)+(1.076)+(2.003), (I-130)+(1.076)+(2.004), (I-130)+(1.076)+(2.005), (I-130)+(1.076)+(2.006), (I-130)+(1.076)+(2.007), (I-130)+(1.076)+(2.008), (I-130)+(1.076)+(2.009), (I-130)+(1.076)+(2.010), (I-130)+(1.076)+(2.011), (I-130)+(1.076)+(2.012), (I-130)+(1.076)+(2.013), (I-130)+(1.076)+(2.014), (I-130)+(1.076)+(2.015), (I-130)+(1.076)+(2.016), (I-130)+(1.076)+(2.017), (I-130)+(1.076)+(2.018), (I-130)+(1.076)+(2.019), (I-130)+(1.076)+(2.020), (I-130)+(1.076)+(2.021), (I-130)+(1.076)+(2.022), (I-130)+(1.076)+(2.023), (I-130)+(1.076)+(2.024), (I-130)+(1.076)+(2.025), (I-130)+(1.076)+(2.026), (I-130)+(1.076)+(2.027), (I-130)+(1.076)+(2.028), (I-130)+(1.076)+(2.029), (I-130)+(1.076)+(2.030), (I-130)+(1.076)+(2.031), (I-130)+(1.076)+(2.032), (I-130)+(1.076)+(2.033), (I-130)+(1.076)+(2.034), (I-130)+(1.076)+(2.035), (I-130)+(1.076)+(2.036), (I-130)+(1.076)+(2.037), (I-130)+(1.076)+(2.038), (I-130)+(1.076)+(2.039), (I-130)+(1.076)+(2.040), (I-130)+(1.076)+(2.041), (I-130)+(1.076)+(2.042), (I-130)+(1.076)+(2.043), (I-130)+(1.076)+(2.044), (I-130)+(1.076)+(2.045), (I-130)+(1.076)+(2.046), (I-130)+(1.076)+(2.047), (I-130)+(1.076)+(2.048), (I-130)+(1.076)+(2.049), (I-130)+(1.076)+(2.050), (I-130)+(1.076)+(2.051), (I-130)+(1.076)+(2.052), (I-130)+(1.076)+(2.053), (I-130)+(1.076)+(2.054), (I-130)+(1.076)+(2.055), (I-130)+(1.076)+(2.056), (I-130)+(1.076)+(2.057), (I-130)+(1.076)+(2.058), (I-130)+(1.076)+(2.059), (I-130)+(1.076)+(3.001), (I-130)+(1.076)+(3.002), (I-130)+(1.076)+(3.003), (I-130)+(1.076)+(3.004), (I-130)+(1.076)+(3.005), (I-130)+(1.076)+(3.006), (I-130)+(1.076)+(3.007), (I-130)+(1.076)+(3.008), (I-130)+(1.076)+(3.009), (I-130)+(1.076)+(3.010), (I-130)+(1.076)+(3.011), (I-130)+(1.076)+(3.012), (I-130)+(1.076)+(3.013), (I-130)+(1.076)+(3.014), (I-130)+(1.076)+(3.015), (I-130)+(1.076)+(3.016), (I-130)+(1.076)+(3.017), (I-130)+(1.076)+(3.018), (I-130)+(1.076)+(3.019), (I-130)+(1.076)+(3.020), (I-130)+(1.076)+(3.021), (I-130)+(1.076)+(3.022), (I-130)+(1.076)+(3.023), (I-130)+(1.076)+(3.024), (I-130)+(1.076)+(3.025), (I-130)+(1.076)+(3.026), (I-130)+(1.076)+(3.027), (I-130)+(1.076)+(3.028), (I-130)+(1.076)+(3.029), (I-130)+(1.076)+(3.030), (I-130)+(1.076)+(3.031), (I-130)+(1.076)+(5.001), (I-130)+(1.076)+(5.002), (I-130)+(1.076)+(5.003), (I-130)+(1.076)+(5.004), (I-130)+(1.076)+(5.005), (I-130)+(1.076)+(5.006), (I-130)+(1.076)+(5.007), (I-130)+(1.076)+(5.008), (I-130)+(1.076)+(5.009), (I-130)+(1.076)+(5.010), (I-130)+(1.076)+(5.011), (I-130)+(1.076)+(5.012), (I-130)+(1.076)+(5.013), (I-130)+(1.076)+(5.014), (I-130)+(1.076)+(5.015), (I-130)+(1.076)+(5.016), (I-130)+(1.076)+(5.017), (I-130)+(1.076)+(5.018), (I-130)+(1.076)+(5.019), (I-130)+(1.076)+(5.020), (I-130)+(1.076)+(5.021), (I-130)+(1.076)+(5.022), (I-130)+(1.076)+(5.023), (I-130)+(1.076)+(6.001), (I-130)+(1.076)+(6.002), (I-130)+(1.076)+(6.003), (I-130)+(1.076)+(6.004), (I-130)+(1.076)+(7.001), (I-130)+(1.076)+(7.002), (I-130)+(1.076)+(7.003), (I-130)+(1.076)+(7.004), (I-130)+(1.076)+(7.005), (I-130)+(1.076)+(7.006), (I-130)+(1.076)+(9.001), (I-130)+(1.076)+(9.002), (I-130)+(1.076)+(9.003), (I-130)+(1.076)+(9.004), (I-130)+(1.076)+(9.005), (I-130)+(1.076)+(9.006), (I-130)+(1.076)+(9.007), (I-130)+(1.076)+(9.008), (I-130)+(1.076)+(9.009), (I-130)+(1.076)+(14.001), (I-130)+(1.076)+(14.002), (I-130)+(1.076)+(15.008), (I-130)+(1.076)+(15.011), (I-130)+(1.076)+(15.012), (I-130)+(1.076)+(15.016), (I-130)+(1.076)+(15.025), (I-130)+(1.076)+(15.027), (I-130)+(1.076)+(15.047), (I-130)+(1.076)+(15.063), (I-130)+(1.076)+(15.064), (I-130)+(1.076)+(16.001), (I-130)+(1.076)+(16.002), (I-130)+(1.076)+(16.003), (I-130)+(1.076)+(16.004), (I-130)+(1.076)+(16.005), (I-130)+(1.076)+(16.006), (I-130)+(1.076)+(16.007), (I-130)+(1.076)+(16.008), (I-130)+(1.076)+(17.001), (I-130)+(1.076)+(17.002), (I-130)+(1.076)+(17.003), (I-130)+(1.076)+(17.004), (I-130)+(1.076)+(17.005), (I-130)+(1.076)+(17.006), (I-130)+(1.076)+(17.007), (I-130)+(1.076)+(17.008), (I-130)+(1.076)+(17.009), (I-130)+(1.076)+(17.010), (I-130)+(1.076)+(17.011), (I-130)+(1.076)+(17.012), (I-130)+(1.076)+(18.001), (I-130)+(1.077)+(1.078), (I-130)+(1.077)+(1.079), (I-130)+(1.077)+(1.080), (I-130)+(1.077)+(1.081), (I-130)+(1.077)+(1.082), (I-130)+(1.077)+(1.083), (I-130)+(1.077)+(1.084), (I-130)+(1.077)+(1.085), (I-130)+(1.077)+(1.086), (I-130)+(1.077)+(1.087), (I-130)+(1.077)+(1.088), (I-130)+(1.077)+(1.089), (I-130)+(1.077)+(1.090), (I-130)+(1.077)+(1.091), (I-130)+(1.077)+(1.092), (I-130)+(1.077)+(2.001), (I-130)+(1.077)+(2.002), (I-130)+(1.077)+(2.003), (I-130)+(1.077)+(2.004), (I-130)+(1.077)+(2.005), (I-130)+(1.077)+(2.006), (I-130)+(1.077)+(2.007), (I-130)+(1.077)+(2.008), (I-130)+(1.077)+(2.009), (I-130)+(1.077)+(2.010), (I-130)+(1.077)+(2.011), (I-130)+(1.077)+(2.012), (I-130)+(1.077)+(2.013), (I-130)+(1.077)+(2.014), (I-130)+(1.077)+(2.015), (I-130)+(1.077)+(2.016), (I-130)+(1.077)+(2.017), (I-130)+(1.077)+(2.018), (I-130)+(1.077)+(2.019), (I-130)+(1.077)+(2.020), (I-130)+(1.077)+(2.021), (I-130)+(1.077)+(2.022), (I-130)+(1.077)+(2.023), (I-130)+(1.077)+(2.024), (I-130)+(1.077)+(2.025), (I-130)+(1.077)+(2.026), (I-130)+(1.077)+(2.027), (I-130)+(1.077)+(2.028), (I-130)+(1.077)+(2.029), (I-130)+(1.077)+(2.030), (I-130)+(1.077)+(2.031), (I-130)+(1.077)+(2.032), (I-130)+(1.077)+(2.033), (I-130)+(1.077)+(2.034), (I-130)+(1.077)+(2.035), (I-130)+(1.077)+(2.036), (I-130)+(1.077)+(2.037), (I-130)+(1.077)+(2.038), (I-130)+(1.077)+(2.039), (I-130)+(1.077)+(2.040), (I-130)+(1.077)+(2.041), (I-130)+(1.077)+(2.042), (I-130)+(1.077)+(2.043), (I-130)+(1.077)+(2.044), (I-130)+(1.077)+(2.045), (I-130)+(1.077)+(2.046), (I-130)+(1.077)+(2.047), (I-130)+(1.077)+(2.048), (I-130)+(1.077)+(2.049), (I-130)+(1.077)+(2.050), (I-130)+(1.077)+(2.051), (I-130)+(1.077)+(2.052), (I-130)+(1.077)+(2.053), (I-130)+(1.077)+(2.054), (I-130)+(1.077)+(2.055), (I-130)+(1.077)+(2.056), (I-130)+(1.077)+(2.057), (I-130)+(1.077)+(2.058), (I-130)+(1.077)+(2.059), (I-130)+(1.077)+(3.001), (I-130)+(1.077)+(3.002), (I-130)+(1.077)+(3.003), (I-130)+(1.077)+(3.004), (I-130)+(1.077)+(3.005), (I-130)+(1.077)+(3.006), (I-130)+(1.077)+(3.007), (I-130)+(1.077)+(3.008), (I-130)+(1.077)+(3.009), (I-130)+(1.077)+(3.010), (I-130)+(1.077)+(3.011), (I-130)+(1.077)+(3.012), (I-130)+(1.077)+(3.013), (I-130)+(1.077)+(3.014), (I-130)+(1.077)+(3.015), (I-130)+(1.077)+(3.016), (I-130)+(1.077)+(3.017), (I-130)+(1.077)+(3.018), (I-130)+(1.077)+(3.019), (I-130)+(1.077)+(3.020), (I-130)+(1.077)+(3.021), (I-130)+(1.077)+(3.022), (I-130)+(1.077)+(3.023), (I-130)+(1.077)+(3.024), (I-130)+(1.077)+(3.025), (I-130)+(1.077)+(3.026), (I-130)+(1.077)+(3.027), (I-130)+(1.077)+(3.028), (I-130)+(1.077)+(3.029), (I-130)+(1.077)+(3.030), (I-130)+(1.077)+(3.031), (I-130)+(1.077)+(5.001), (I-130)+(1.077)+(5.002), (I-130)+(1.077)+(5.003), (I-130)+(1.077)+(5.004), (I-130)+(1.077)+(5.005), (I-130)+(1.077)+(5.006), (I-130)+(1.077)+(5.007), (I-130)+(1.077)+(5.008), (I-130)+(1.077)+(5.009), (I-130)+(1.077)+(5.010), (I-130)+(1.077)+(5.011), (I-130)+(1.077)+(5.012), (I-130)+(1.077)+(5.013), (I-130)+(1.077)+(5.014), (I-130)+(1.077)+(5.015), (I-130)+(1.077)+(5.016), (I-130)+(1.077)+(5.017), (I-130)+(1.077)+(5.018), (I-130)+(1.077)+(5.019), (I-130)+(1.077)+(5.020), (I-130)+(1.077)+(5.021), (I-130)+(1.077)+(5.022), (I-130)+(1.077)+(5.023), (I-130)+(1.077)+(6.001), (I-130)+(1.077)+(6.002), (I-130)+(1.077)+(6.003), (I-130)+(1.077)+(6.004), (I-130)+(1.077)+(7.001), (I-130)+(1.077)+(7.002), (I-130)+(1.077)+(7.003), (I-130)+(1.077)+(7.004), (I-130)+(1.077)+(7.005), (I-130)+(1.077)+(7.006), (I-130)+(1.077)+(9.001), (I-130)+(1.077)+(9.002), (I-130)+(1.077)+(9.003), (I-130)+(1.077)+(9.004), (I-130)+(1.077)+(9.005), (I-130)+(1.077)+(9.006), (I-130)+(1.077)+(9.007), (I-130)+(1.077)+(9.008), (I-130)+(1.077)+(9.009), (I-130)+(1.077)+(14.001), (I-130)+(1.077)+(14.002), (I-130)+(1.077)+(15.008), (I-130)+(1.077)+(15.011), (I-130)+(1.077)+(15.012), (I-130)+(1.077)+(15.016), (I-130)+(1.077)+(15.025), (I-130)+(1.077)+(15.027), (I-130)+(1.077)+(15.047), (I-130)+(1.077)+(15.063), (I-130)+(1.077)+(15.064), (I-130)+(1.077)+(16.001), (I-130)+(1.077)+(16.002), (I-130)+(1.077)+(16.003), (I-130)+(1.077)+(16.004), (I-130)+(1.077)+(16.005), (I-130)+(1.077)+(16.006), (I-130)+(1.077)+(16.007), (I-130)+(1.077)+(16.008), (I-130)+(1.077)+(17.001), (I-130)+(1.077)+(17.002), (I-130)+(1.077)+(17.003), (I-130)+(1.077)+(17.004), (I-130)+(1.077)+(17.005), (I-130)+(1.077)+(17.006), (I-130)+(1.077)+(17.007), (I-130)+(1.077)+(17.008), (I-130)+(1.077)+(17.009), (I-130)+(1.077)+(17.010), (I-130)+(1.077)+(17.011), (I-130)+(1.077)+(17.012), (I-130)+(1.077)+(18.001), (I-130)+(1.078)+(1.079), (I-130)+(1.078)+(1.080), (I-130)+(1.078)+(1.081), (I-130)+(1.078)+(1.082), (I-130)+(1.078)+(1.083), (I-130)+(1.078)+(1.084), (I-130)+(1.078)+(1.085), (I-130)+(1.078)+(1.086), (I-130)+(1.078)+(1.087), (I-130)+(1.078)+(1.088), (I-130)+(1.078)+(1.089), (I-130)+(1.078)+(1.090), (I-130)+(1.078)+(1.091), (I-130)+(1.078)+(1.092), (I-130)+(1.078)+(2.001), (I-130)+(1.078)+(2.002), (I-130)+(1.078)+(2.003), (I-130)+(1.078)+(2.004), (I-130)+(1.078)+(2.005), (I-130)+(1.078)+(2.006), (I-130)+(1.078)+(2.007), (I-130)+(1.078)+(2.008), (I-130)+(1.078)+(2.009), (I-130)+(1.078)+(2.010), (I-130)+(1.078)+(2.011), (I-130)+(1.078)+(2.012), (I-130)+(1.078)+(2.013), (I-130)+(1.078)+(2.014), (I-130)+(1.078)+(2.015), (I-130)+(1.078)+(2.016), (I-130)+(1.078)+(2.017), (I-130)+(1.078)+(2.018), (I-130)+(1.078)+(2.019), (I-130)+(1.078)+(2.020), (I-130)+(1.078)+(2.021), (I-130)+(1.078)+(2.022), (I-130)+(1.078)+(2.023), (I-130)+(1.078)+(2.024), (I-130)+(1.078)+(2.025), (I-130)+(1.078)+(2.026), (I-130)+(1.078)+(2.027), (I-130)+(1.078)+(2.028), (I-130)+(1.078)+(2.029), (I-130)+(1.078)+(2.030), (I-130)+(1.078)+(2.031), (I-130)+(1.078)+(2.032), (I-130)+(1.078)+(2.033), (I-130)+(1.078)+(2.034), (I-130)+(1.078)+(2.035), (I-130)+(1.078)+(2.036), (I-130)+(1.078)+(2.037), (I-130)+(1.078)+(2.038), (I-130)+(1.078)+(2.039), (I-130)+(1.078)+(2.040), (I-130)+(1.078)+(2.041), (I-130)+(1.078)+(2.042), (I-130)+(1.078)+(2.043), (I-130)+(1.078)+(2.044), (I-130)+(1.078)+(2.045), (I-130)+(1.078)+(2.046), (I-130)+(1.078)+(2.047), (I-130)+(1.078)+(2.048), (I-130)+(1.078)+(2.049), (I-130)+(1.078)+(2.050), (I-130)+(1.078)+(2.051), (I-130)+(1.078)+(2.052), (I-130)+(1.078)+(2.053), (I-130)+(1.078)+(2.054), (I-130)+(1.078)+(2.055), (I-130)+(1.078)+(2.056), (I-130)+(1.078)+(2.057), (I-130)+(1.078)+(2.058), (I-130)+(1.078)+(2.059), (I-130)+(1.078)+(3.001), (I-130)+(1.078)+(3.002), (I-130)+(1.078)+(3.003), (I-130)+(1.078)+(3.004), (I-130)+(1.078)+(3.005), (I-130)+(1.078)+(3.006), (I-130)+(1.078)+(3.007), (I-130)+(1.078)+(3.008), (I-130)+(1.078)+(3.009), (I-130)+(1.078)+(3.010), (I-130)+(1.078)+(3.011), (I-130)+(1.078)+(3.012), (I-130)+(1.078)+(3.013), (I-130)+(1.078)+(3.014), (I-130)+(1.078)+(3.015), (I-130)+(1.078)+(3.016), (I-130)+(1.078)+(3.017), (I-130)+(1.078)+(3.018), (I-130)+(1.078)+(3.019), (I-130)+(1.078)+(3.020), (I-130)+(1.078)+(3.021), (I-130)+(1.078)+(3.022), (I-130)+(1.078)+(3.023), (I-130)+(1.078)+(3.024), (I-130)+(1.078)+(3.025), (I-130)+(1.078)+(3.026), (I-130)+(1.078)+(3.027), (I-130)+(1.078)+(3.028), (I-130)+(1.078)+(3.029), (I-130)+(1.078)+(3.030), (I-130)+(1.078)+(3.031), (I-130)+(1.078)+(5.001), (I-130)+(1.078)+(5.002), (I-130)+(1.078)+(5.003), (I-130)+(1.078)+(5.004), (I-130)+(1.078)+(5.005), (I-130)+(1.078)+(5.006), (I-130)+(1.078)+(5.007), (I-130)+(1.078)+(5.008), (I-130)+(1.078)+(5.009), (I-130)+(1.078)+(5.010), (I-130)+(1.078)+(5.011), (I-130)+(1.078)+(5.012), (I-130)+(1.078)+(5.013), (I-130)+(1.078)+(5.014), (I-130)+(1.078)+(5.015), (I-130)+(1.078)+(5.016), (I-130)+(1.078)+(5.017), (I-130)+(1.078)+(5.018), (I-130)+(1.078)+(5.019), (I-130)+(1.078)+(5.020), (I-130)+(1.078)+(5.021), (I-130)+(1.078)+(5.022), (I-130)+(1.078)+(5.023), (I-130)+(1.078)+(6.001), (I-130)+(1.078)+(6.002), (I-130)+(1.078)+(6.003), (I-130)+(1.078)+(6.004), (I-130)+(1.078)+(7.001), (I-130)+(1.078)+(7.002), (I-130)+(1.078)+(7.003), (I-130)+(1.078)+(7.004), (I-130)+(1.078)+(7.005), (I-130)+(1.078)+(7.006), (I-130)+(1.078)+(9.001), (I-130)+(1.078)+(9.002), (I-130)+(1.078)+(9.003), (I-130)+(1.078)+(9.004), (I-130)+(1.078)+(9.005), (I-130)+(1.078)+(9.006), (I-130)+(1.078)+(9.007), (I-130)+(1.078)+(9.008), (I-130)+(1.078)+(9.009), (I-130)+(1.078)+(14.001), (I-130)+(1.078)+(14.002), (I-130)+(1.078)+(15.008), (I-130)+(1.078)+(15.011), (I-130)+(1.078)+(15.012), (I-130)+(1.078)+(15.016), (I-130)+(1.078)+(15.025), (I-130)+(1.078)+(15.027), (I-130)+(1.078)+(15.047), (I-130)+(1.078)+(15.063), (I-130)+(1.078)+(15.064), (I-130)+(1.078)+(16.001), (I-130)+(1.078)+(16.002), (I-130)+(1.078)+(16.003), (I-130)+(1.078)+(16.004), (I-130)+(1.078)+(16.005), (I-130)+(1.078)+(16.006), (I-130)+(1.078)+(16.007), (I-130)+(1.078)+(16.008), (I-130)+(1.078)+(17.001), (I-130)+(1.078)+(17.002), (I-130)+(1.078)+(17.003), (I-130)+(1.078)+(17.004), (I-130)+(1.078)+(17.005), (I-130)+(1.078)+(17.006), (I-130)+(1.078)+(17.007), (I-130)+(1.078)+(17.008), (I-130)+(1.078)+(17.009), (I-130)+(1.078)+(17.010), (I-130)+(1.078)+(17.011), (I-130)+(1.078)+(17.012), (I-130)+(1.078)+(18.001), (I-130)+(1.079)+(1.080), (I-130)+(1.079)+(1.081), (I-130)+(1.079)+(1.082), (I-130)+(1.079)+(1.083), (I-130)+(1.079)+(1.084), (I-130)+(1.079)+(1.085), (I-130)+(1.079)+(1.086), (I-130)+(1.079)+(1.087), (I-130)+(1.079)+(1.088), (I-130)+(1.079)+(1.089), (I-130)+(1.079)+(1.090), (I-130)+(1.079)+(1.091), (I-130)+(1.079)+(1.092), (I-130)+(1.079)+(2.001), (I-130)+(1.079)+(2.002), (I-130)+(1.079)+(2.003), (I-130)+(1.079)+(2.004), (I-130)+(1.079)+(2.005), (I-130)+(1.079)+(2.006), (I-130)+(1.079)+(2.007), (I-130)+(1.079)+(2.008), (I-130)+(1.079)+(2.009), (I-130)+(1.079)+(2.010), (I-130)+(1.079)+(2.011), (I-130)+(1.079)+(2.012), (I-130)+(1.079)+(2.013), (I-130)+(1.079)+(2.014), (I-130)+(1.079)+(2.015), (I-130)+(1.079)+(2.016), (I-130)+(1.079)+(2.017), (I-130)+(1.079)+(2.018), (I-130)+(1.079)+(2.019), (I-130)+(1.079)+(2.020), (I-130)+(1.079)+(2.021), (I-130)+(1.079)+(2.022), (I-130)+(1.079)+(2.023), (I-130)+(1.079)+(2.024), (I-130)+(1.079)+(2.025), (I-130)+(1.079)+(2.026), (I-130)+(1.079)+(2.027), (I-130)+(1.079)+(2.028), (I-130)+(1.079)+(2.029), (I-130)+(1.079)+(2.030), (I-130)+(1.079)+(2.031), (I-130)+(1.079)+(2.032), (I-130)+(1.079)+(2.033), (I-130)+(1.079)+(2.034), (I-130)+(1.079)+(2.035), (I-130)+(1.079)+(2.036), (I-130)+(1.079)+(2.037), (I-130)+(1.079)+(2.038), (I-130)+(1.079)+(2.039), (I-130)+(1.079)+(2.040), (I-130)+(1.079)+(2.041), (I-130)+(1.079)+(2.042), (I-130)+(1.079)+(2.043), (I-130)+(1.079)+(2.044), (I-130)+(1.079)+(2.045), (I-130)+(1.079)+(2.046), (I-130)+(1.079)+(2.047), (I-130)+(1.079)+(2.048), (I-130)+(1.079)+(2.049), (I-130)+(1.079)+(2.050), (I-130)+(1.079)+(2.051), (I-130)+(1.079)+(2.052), (I-130)+(1.079)+(2.053), (I-130)+(1.079)+(2.054), (I-130)+(1.079)+(2.055), (I-130)+(1.079)+(2.056), (I-130)+(1.079)+(2.057), (I-130)+(1.079)+(2.058), (I-130)+(1.079)+(2.059), (I-130)+(1.079)+(3.001), (I-130)+(1.079)+(3.002), (I-130)+(1.079)+(3.003), (I-130)+(1.079)+(3.004), (I-130)+(1.079)+(3.005), (I-130)+(1.079)+(3.006), (I-130)+(1.079)+(3.007), (I-130)+(1.079)+(3.008), (I-130)+(1.079)+(3.009), (I-130)+(1.079)+(3.010), (I-130)+(1.079)+(3.011), (I-130)+(1.079)+(3.012), (I-130)+(1.079)+(3.013), (I-130)+(1.079)+(3.014), (I-130)+(1.079)+(3.015), (I-130)+(1.079)+(3.016), (I-130)+(1.079)+(3.017), (I-130)+(1.079)+(3.018), (I-130)+(1.079)+(3.019), (I-130)+(1.079)+(3.020), (I-130)+(1.079)+(3.021), (I-130)+(1.079)+(3.022), (I-130)+(1.079)+(3.023), (I-130)+(1.079)+(3.024), (I-130)+(1.079)+(3.025), (I-130)+(1.079)+(3.026), (I-130)+(1.079)+(3.027), (I-130)+(1.079)+(3.028), (I-130)+(1.079)+(3.029), (I-130)+(1.079)+(3.030), (I-130)+(1.079)+(3.031), (I-130)+(1.079)+(5.001), (I-130)+(1.079)+(5.002), (I-130)+(1.079)+(5.003), (I-130)+(1.079)+(5.004), (I-130)+(1.079)+(5.005), (I-130)+(1.079)+(5.006), (I-130)+(1.079)+(5.007), (I-130)+(1.079)+(5.008), (I-130)+(1.079)+(5.009), (I-130)+(1.079)+(5.010), (I-130)+(1.079)+(5.011), (I-130)+(1.079)+(5.012), (I-130)+(1.079)+(5.013), (I-130)+(1.079)+(5.014), (I-130)+(1.079)+(5.015), (I-130)+(1.079)+(5.016), (I-130)+(1.079)+(5.017), (I-130)+(1.079)+(5.018), (I-130)+(1.079)+(5.019), (I-130)+(1.079)+(5.020), (I-130)+(1.079)+(5.021), (I-130)+(1.079)+(5.022), (I-130)+(1.079)+(5.023), (I-130)+(1.079)+(6.001), (I-130)+(1.079)+(6.002), (I-130)+(1.079)+(6.003), (I-130)+(1.079)+(6.004), (I-130)+(1.079)+(7.001), (I-130)+(1.079)+(7.002), (I-130)+(1.079)+(7.003), (I-130)+(1.079)+(7.004), (I-130)+(1.079)+(7.005), (I-130)+(1.079)+(7.006), (I-130)+(1.079)+(9.001), (I-130)+(1.079)+(9.002), (I-130)+(1.079)+(9.003), (I-130)+(1.079)+(9.004), (I-130)+(1.079)+(9.005), (I-130)+(1.079)+(9.006), (I-130)+(1.079)+(9.007), (I-130)+(1.079)+(9.008), (I-130)+(1.079)+(9.009), (I-130)+(1.079)+(14.001), (I-130)+(1.079)+(14.002), (I-130)+(1.079)+(15.008), (I-130)+(1.079)+(15.011), (I-130)+(1.079)+(15.012), (I-130)+(1.079)+(15.016), (I-130)+(1.079)+(15.025), (I-130)+(1.079)+(15.027), (I-130)+(1.079)+(15.047), (I-130)+(1.079)+(15.063), (I-130)+(1.079)+(15.064), (I-130)+(1.079)+(16.001), (I-130)+(1.079)+(16.002), (I-130)+(1.079)+(16.003), (I-130)+(1.079)+(16.004), (I-130)+(1.079)+(16.005), (I-130)+(1.079)+(16.006), (I-130)+(1.079)+(16.007), (I-130)+(1.079)+(16.008), (I-130)+(1.079)+(17.001), (I-130)+(1.079)+(17.002), (I-130)+(1.079)+(17.003), (I-130)+(1.079)+(17.004), (I-130)+(1.079)+(17.005), (I-130)+(1.079)+(17.006), (I-130)+(1.079)+(17.007), (I-130)+(1.079)+(17.008), (I-130)+(1.079)+(17.009), (I-130)+(1.079)+(17.010), (I-130)+(1.079)+(17.011), (I-130)+(1.079)+(17.012), (I-130)+(1.079)+(18.001), (I-130)+(1.080)+(1.081), (I-130)+(1.080)+(1.082), (I-130)+(1.080)+(1.083), (I-130)+(1.080)+(1.084), (I-130)+(1.080)+(1.085), (I-130)+(1.080)+(1.086), (I-130)+(1.080)+(1.087), (I-130)+(1.080)+(1.088), (I-130)+(1.080)+(1.089), (I-130)+(1.080)+(1.090), (I-130)+(1.080)+(1.091), (I-130)+(1.080)+(1.092), (I-130)+(1.080)+(2.001), (I-130)+(1.080)+(2.002), (I-130)+(1.080)+(2.003), (I-130)+(1.080)+(2.004), (I-130)+(1.080)+(2.005), (I-130)+(1.080)+(2.006), (I-130)+(1.080)+(2.007), (I-130)+(1.080)+(2.008), (I-130)+(1.080)+(2.009), (I-130)+(1.080)+(2.010), (I-130)+(1.080)+(2.011), (I-130)+(1.080)+(2.012), (I-130)+(1.080)+(2.013), (I-130)+(1.080)+(2.014), (I-130)+(1.080)+(2.015), (I-130)+(1.080)+(2.016), (I-130)+(1.080)+(2.017), (I-130)+(1.080)+(2.018), (I-130)+(1.080)+(2.019), (I-130)+(1.080)+(2.020), (I-130)+(1.080)+(2.021), (I-130)+(1.080)+(2.022), (I-130)+(1.080)+(2.023), (I-130)+(1.080)+(2.024), (I-130)+(1.080)+(2.025), (I-130)+(1.080)+(2.026), (I-130)+(1.080)+(2.027), (I-130)+(1.080)+(2.028), (I-130)+(1.080)+(2.029), (I-130)+(1.080)+(2.030), (I-130)+(1.080)+(2.031), (I-130)+(1.080)+(2.032), (I-130)+(1.080)+(2.033), (I-130)+(1.080)+(2.034), (I-130)+(1.080)+(2.035), (I-130)+(1.080)+(2.036), (I-130)+(1.080)+(2.037), (I-130)+(1.080)+(2.038), (I-130)+(1.080)+(2.039), (I-130)+(1.080)+(2.040), (I-130)+(1.080)+(2.041), (I-130)+(1.080)+(2.042), (I-130)+(1.080)+(2.043), (I-130)+(1.080)+(2.044), (I-130)+(1.080)+(2.045), (I-130)+(1.080)+(2.046), (I-130)+(1.080)+(2.047), (I-130)+(1.080)+(2.048), (I-130)+(1.080)+(2.049), (I-130)+(1.080)+(2.050), (I-130)+(1.080)+(2.051), (I-130)+(1.080)+(2.052), (I-130)+(1.080)+(2.053), (I-130)+(1.080)+(2.054), (I-130)+(1.080)+(2.055), (I-130)+(1.080)+(2.056), (I-130)+(1.080)+(2.057), (I-130)+(1.080)+(2.058), (I-130)+(1.080)+(2.059), (I-130)+(1.080)+(3.001), (I-130)+(1.080)+(3.002), (I-130)+(1.080)+(3.003), (I-130)+(1.080)+(3.004), (I-130)+(1.080)+(3.005), (I-130)+(1.080)+(3.006), (I-130)+(1.080)+(3.007), (I-130)+(1.080)+(3.008), (I-130)+(1.080)+(3.009), (I-130)+(1.080)+(3.010), (I-130)+(1.080)+(3.011), (I-130)+(1.080)+(3.012), (I-130)+(1.080)+(3.013), (I-130)+(1.080)+(3.014), (I-130)+(1.080)+(3.015), (I-130)+(1.080)+(3.016), (I-130)+(1.080)+(3.017), (I-130)+(1.080)+(3.018), (I-130)+(1.080)+(3.019), (I-130)+(1.080)+(3.020), (I-130)+(1.080)+(3.021), (I-130)+(1.080)+(3.022), (I-130)+(1.080)+(3.023), (I-130)+(1.080)+(3.024), (I-130)+(1.080)+(3.025), (I-130)+(1.080)+(3.026), (I-130)+(1.080)+(3.027), (I-130)+(1.080)+(3.028), (I-130)+(1.080)+(3.029), (I-130)+(1.080)+(3.030), (I-130)+(1.080)+(3.031), (I-130)+(1.080)+(5.001), (I-130)+(1.080)+(5.002), (I-130)+(1.080)+(5.003), (I-130)+(1.080)+(5.004), (I-130)+(1.080)+(5.005), (I-130)+(1.080)+(5.006), (I-130)+(1.080)+(5.007), (I-130)+(1.080)+(5.008), (I-130)+(1.080)+(5.009), (I-130)+(1.080)+(5.010), (I-130)+(1.080)+(5.011), (I-130)+(1.080)+(5.012), (I-130)+(1.080)+(5.013), (I-130)+(1.080)+(5.014), (I-130)+(1.080)+(5.015), (I-130)+(1.080)+(5.016), (I-130)+(1.080)+(5.017), (I-130)+(1.080)+(5.018), (I-130)+(1.080)+(5.019), (I-130)+(1.080)+(5.020), (I-130)+(1.080)+(5.021), (I-130)+(1.080)+(5.022), (I-130)+(1.080)+(5.023), (I-130)+(1.080)+(6.001), (I-130)+(1.080)+(6.002), (I-130)+(1.080)+(6.003), (I-130)+(1.080)+(6.004), (I-130)+(1.080)+(7.001), (I-130)+(1.080)+(7.002), (I-130)+(1.080)+(7.003), (I-130)+(1.080)+(7.004), (I-130)+(1.080)+(7.005), (I-130)+(1.080)+(7.006), (I-130)+(1.080)+(9.001), (I-130)+(1.080)+(9.002), (I-130)+(1.080)+(9.003), (I-130)+(1.080)+(9.004), (I-130)+(1.080)+(9.005), (I-130)+(1.080)+(9.006), (I-130)+(1.080)+(9.007), (I-130)+(1.080)+(9.008), (I-130)+(1.080)+(9.009), (I-130)+(1.080)+(14.001), (I-130)+(1.080)+(14.002), (I-130)+(1.080)+(15.008), (I-130)+(1.080)+(15.011), (I-130)+(1.080)+(15.012), (I-130)+(1.080)+(15.016), (I-130)+(1.080)+(15.025), (I-130)+(1.080)+(15.027), (I-130)+(1.080)+(15.047), (I-130)+(1.080)+(15.063), (I-130)+(1.080)+(15.064), (I-130)+(1.080)+(16.001), (I-130)+(1.080)+(16.002), (I-130)+(1.080)+(16.003), (I-130)+(1.080)+(16.004), (I-130)+(1.080)+(16.005), (I-130)+(1.080)+(16.006), (I-130)+(1.080)+(16.007), (I-130)+(1.080)+(16.008), (I-130)+(1.080)+(17.001), (I-130)+(1.080)+(17.002), (I-130)+(1.080)+(17.003), (I-130)+(1.080)+(17.004), (I-130)+(1.080)+(17.005), (I-130)+(1.080)+(17.006), (I-130)+(1.080)+(17.007), (I-130)+(1.080)+(17.008), (I-130)+(1.080)+(17.009), (I-130)+(1.080)+(17.010), (I-130)+(1.080)+(17.011), (I-130)+(1.080)+(17.012), (I-130)+(1.080)+(18.001), (I-130)+(1.081)+(1.082), (I-130)+(1.081)+(1.083), (I-130)+(1.081)+(1.084), (I-130)+(1.081)+(1.085), (I-130)+(1.081)+(1.086), (I-130)+(1.081)+(1.087), (I-130)+(1.081)+(1.088), (I-130)+(1.081)+(1.089), (I-130)+(1.081)+(1.090), (I-130)+(1.081)+(1.091), (I-130)+(1.081)+(1.092), (I-130)+(1.081)+(2.001), (I-130)+(1.081)+(2.002), (I-130)+(1.081)+(2.003), (I-130)+(1.081)+(2.004), (I-130)+(1.081)+(2.005), (I-130)+(1.081)+(2.006), (I-130)+(1.081)+(2.007), (I-130)+(1.081)+(2.008), (I-130)+(1.081)+(2.009), (I-130)+(1.081)+(2.010), (I-130)+(1.081)+(2.011), (I-130)+(1.081)+(2.012), (I-130)+(1.081)+(2.013), (I-130)+(1.081)+(2.014), (I-130)+(1.081)+(2.015), (I-130)+(1.081)+(2.016), (I-130)+(1.081)+(2.017), (I-130)+(1.081)+(2.018), (I-130)+(1.081)+(2.019), (I-130)+(1.081)+(2.020), (I-130)+(1.081)+(2.021), (I-130)+(1.081)+(2.022), (I-130)+(1.081)+(2.023), (I-130)+(1.081)+(2.024), (I-130)+(1.081)+(2.025), (I-130)+(1.081)+(2.026), (I-130)+(1.081)+(2.027), (I-130)+(1.081)+(2.028), (I-130)+(1.081)+(2.029), (I-130)+(1.081)+(2.030), (I-130)+(1.081)+(2.031), (I-130)+(1.081)+(2.032), (I-130)+(1.081)+(2.033), (I-130)+(1.081)+(2.034), (I-130)+(1.081)+(2.035), (I-130)+(1.081)+(2.036), (I-130)+(1.081)+(2.037), (I-130)+(1.081)+(2.038), (I-130)+(1.081)+(2.039), (I-130)+(1.081)+(2.040), (I-130)+(1.081)+(2.041), (I-130)+(1.081)+(2.042), (I-130)+(1.081)+(2.043), (I-130)+(1.081)+(2.044), (I-130)+(1.081)+(2.045), (I-130)+(1.081)+(2.046), (I-130)+(1.081)+(2.047), (I-130)+(1.081)+(2.048), (I-130)+(1.081)+(2.049), (I-130)+(1.081)+(2.050), (I-130)+(1.081)+(2.051), (I-130)+(1.081)+(2.052), (I-130)+(1.081)+(2.053), (I-130)+(1.081)+(2.054), (I-130)+(1.081)+(2.055), (I-130)+(1.081)+(2.056), (I-130)+(1.081)+(2.057), (I-130)+(1.081)+(2.058), (I-130)+(1.081)+(2.059), (I-130)+(1.081)+(3.001), (I-130)+(1.081)+(3.002), (I-130)+(1.081)+(3.003), (I-130)+(1.081)+(3.004), (I-130)+(1.081)+(3.005), (I-130)+(1.081)+(3.006), (I-130)+(1.081)+(3.007), (I-130)+(1.081)+(3.008), (I-130)+(1.081)+(3.009), (I-130)+(1.081)+(3.010), (I-130)+(1.081)+(3.011), (I-130)+(1.081)+(3.012), (I-130)+(1.081)+(3.013), (I-130)+(1.081)+(3.014), (I-130)+(1.081)+(3.015), (I-130)+(1.081)+(3.016), (I-130)+(1.081)+(3.017), (I-130)+(1.081)+(3.018), (I-130)+(1.081)+(3.019), (I-130)+(1.081)+(3.020), (I-130)+(1.081)+(3.021), (I-130)+(1.081)+(3.022), (I-130)+(1.081)+(3.023), (I-130)+(1.081)+(3.024), (I-130)+(1.081)+(3.025), (I-130)+(1.081)+(3.026), (I-130)+(1.081)+(3.027), (I-130)+(1.081)+(3.028), (I-130)+(1.081)+(3.029), (I-130)+(1.081)+(3.030), (I-130)+(1.081)+(3.031), (I-130)+(1.081)+(5.001), (I-130)+(1.081)+(5.002), (I-130)+(1.081)+(5.003), (I-130)+(1.081)+(5.004), (I-130)+(1.081)+(5.005), (I-130)+(1.081)+(5.006), (I-130)+(1.081)+(5.007), (I-130)+(1.081)+(5.008), (I-130)+(1.081)+(5.009), (I-130)+(1.081)+(5.010), (I-130)+(1.081)+(5.011), (I-130)+(1.081)+(5.012), (I-130)+(1.081)+(5.013), (I-130)+(1.081)+(5.014), (I-130)+(1.081)+(5.015), (I-130)+(1.081)+(5.016), (I-130)+(1.081)+(5.017), (I-130)+(1.081)+(5.018), (I-130)+(1.081)+(5.019), (I-130)+(1.081)+(5.020), (I-130)+(1.081)+(5.021), (I-130)+(1.081)+(5.022), (I-130)+(1.081)+(5.023), (I-130)+(1.081)+(6.001), (I-130)+(1.081)+(6.002), (I-130)+(1.081)+(6.003), (I-130)+(1.081)+(6.004), (I-130)+(1.081)+(7.001), (I-130)+(1.081)+(7.002), (I-130)+(1.081)+(7.003), (I-130)+(1.081)+(7.004), (I-130)+(1.081)+(7.005), (I-130)+(1.081)+(7.006), (I-130)+(1.081)+(9.001), (I-130)+(1.081)+(9.002), (I-130)+(1.081)+(9.003), (I-130)+(1.081)+(9.004), (I-130)+(1.081)+(9.005), (I-130)+(1.081)+(9.006), (I-130)+(1.081)+(9.007), (I-130)+(1.081)+(9.008), (I-130)+(1.081)+(9.009), (I-130)+(1.081)+(14.001), (I-130)+(1.081)+(14.002), (I-130)+(1.081)+(15.008), (I-130)+(1.081)+(15.011), (I-130)+(1.081)+(15.012), (I-130)+(1.081)+(15.016), (I-130)+(1.081)+(15.025), (I-130)+(1.081)+(15.027), (I-130)+(1.081)+(15.047), (I-130)+(1.081)+(15.063), (I-130)+(1.081)+(15.064), (I-130)+(1.081)+(16.001), (I-130)+(1.081)+(16.002), (I-130)+(1.081)+(16.003), (I-130)+(1.081)+(16.004), (I-130)+(1.081)+(16.005), (I-130)+(1.081)+(16.006), (I-130)+(1.081)+(16.007), (I-130)+(1.081)+(16.008), (I-130)+(1.081)+(17.001), (I-130)+(1.081)+(17.002), (I-130)+(1.081)+(17.003), (I-130)+(1.081)+(17.004), (I-130)+(1.081)+(17.005), (I-130)+(1.081)+(17.006), (I-130)+(1.081)+(17.007), (I-130)+(1.081)+(17.008), (I-130)+(1.081)+(17.009), (I-130)+(1.081)+(17.010), (I-130)+(1.081)+(17.011), (I-130)+(1.081)+(17.012), (I-130)+(1.081)+(18.001), (I-130)+(1.082)+(1.083), (I-130)+(1.082)+(1.084), (I-130)+(1.082)+(1.085), (I-130)+(1.082)+(1.086), (I-130)+(1.082)+(1.087), (I-130)+(1.082)+(1.088), (I-130)+(1.082)+(1.089), (I-130)+(1.082)+(1.090), (I-130)+(1.082)+(1.091), (I-130)+(1.082)+(1.092), (I-130)+(1.082)+(2.001), (I-130)+(1.082)+(2.002), (I-130)+(1.082)+(2.003), (I-130)+(1.082)+(2.004), (I-130)+(1.082)+(2.005), (I-130)+(1.082)+(2.006), (I-130)+(1.082)+(2.007), (I-130)+(1.082)+(2.008), (I-130)+(1.082)+(2.009), (I-130)+(1.082)+(2.010), (I-130)+(1.082)+(2.011), (I-130)+(1.082)+(2.012), (I-130)+(1.082)+(2.013), (I-130)+(1.082)+(2.014), (I-130)+(1.082)+(2.015), (I-130)+(1.082)+(2.016), (I-130)+(1.082)+(2.017), (I-130)+(1.082)+(2.018), (I-130)+(1.082)+(2.019), (I-130)+(1.082)+(2.020), (I-130)+(1.082)+(2.021), (I-130)+(1.082)+(2.022), (I-130)+(1.082)+(2.023), (I-130)+(1.082)+(2.024), (I-130)+(1.082)+(2.025), (I-130)+(1.082)+(2.026), (I-130)+(1.082)+(2.027), (I-130)+(1.082)+(2.028), (I-130)+(1.082)+(2.029), (I-130)+(1.082)+(2.030), (I-130)+(1.082)+(2.031), (I-130)+(1.082)+(2.032), (I-130)+(1.082)+(2.033), (I-130)+(1.082)+(2.034), (I-130)+(1.082)+(2.035), (I-130)+(1.082)+(2.036), (I-130)+(1.082)+(2.037), (I-130)+(1.082)+(2.038), (I-130)+(1.082)+(2.039), (I-130)+(1.082)+(2.040), (I-130)+(1.082)+(2.041), (I-130)+(1.082)+(2.042), (I-130)+(1.082)+(2.043), (I-130)+(1.082)+(2.044), (I-130)+(1.082)+(2.045), (I-130)+(1.082)+(2.046), (I-130)+(1.082)+(2.047), (I-130)+(1.082)+(2.048), (I-130)+(1.082)+(2.049), (I-130)+(1.082)+(2.050), (I-130)+(1.082)+(2.051), (I-130)+(1.082)+(2.052), (I-130)+(1.082)+(2.053), (I-130)+(1.082)+(2.054), (I-130)+(1.082)+(2.055), (I-130)+(1.082)+(2.056), (I-130)+(1.082)+(2.057), (I-130)+(1.082)+(2.058), (I-130)+(1.082)+(2.059), (I-130)+(1.082)+(3.001), (I-130)+(1.082)+(3.002), (I-130)+(1.082)+(3.003), (I-130)+(1.082)+(3.004), (I-130)+(1.082)+(3.005), (I-130)+(1.082)+(3.006), (I-130)+(1.082)+(3.007), (I-130)+(1.082)+(3.008), (I-130)+(1.082)+(3.009), (I-130)+(1.082)+(3.010), (I-130)+(1.082)+(3.011), (I-130)+(1.082)+(3.012), (I-130)+(1.082)+(3.013), (I-130)+(1.082)+(3.014), (I-130)+(1.082)+(3.015), (I-130)+(1.082)+(3.016), (I-130)+(1.082)+(3.017), (I-130)+(1.082)+(3.018), (I-130)+(1.082)+(3.019), (I-130)+(1.082)+(3.020), (I-130)+(1.082)+(3.021), (I-130)+(1.082)+(3.022), (I-130)+(1.082)+(3.023), (I-130)+(1.082)+(3.024), (I-130)+(1.082)+(3.025), (I-130)+(1.082)+(3.026), (I-130)+(1.082)+(3.027), (I-130)+(1.082)+(3.028), (I-130)+(1.082)+(3.029), (I-130)+(1.082)+(3.030), (I-130)+(1.082)+(3.031), (I-130)+(1.082)+(5.001), (I-130)+(1.082)+(5.002), (I-130)+(1.082)+(5.003), (I-130)+(1.082)+(5.004), (I-130)+(1.082)+(5.005), (I-130)+(1.082)+(5.006), (I-130)+(1.082)+(5.007), (I-130)+(1.082)+(5.008), (I-130)+(1.082)+(5.009), (I-130)+(1.082)+(5.010), (I-130)+(1.082)+(5.011), (I-130)+(1.082)+(5.012), (I-130)+(1.082)+(5.013), (I-130)+(1.082)+(5.014), (I-130)+(1.082)+(5.015), (I-130)+(1.082)+(5.016), (I-130)+(1.082)+(5.017), (I-130)+(1.082)+(5.018), (I-130)+(1.082)+(5.019), (I-130)+(1.082)+(5.020), (I-130)+(1.082)+(5.021), (I-130)+(1.082)+(5.022), (I-130)+(1.082)+(5.023), (I-130)+(1.082)+(6.001), (I-130)+(1.082)+(6.002), (I-130)+(1.082)+(6.003), (I-130)+(1.082)+(6.004), (I-130)+(1.082)+(7.001), (I-130)+(1.082)+(7.002), (I-130)+(1.082)+(7.003), (I-130)+(1.082)+(7.004), (I-130)+(1.082)+(7.005), (I-130)+(1.082)+(7.006), (I-130)+(1.082)+(9.001), (I-130)+(1.082)+(9.002), (I-130)+(1.082)+(9.003), (I-130)+(1.082)+(9.004), (I-130)+(1.082)+(9.005), (I-130)+(1.082)+(9.006), (I-130)+(1.082)+(9.007), (I-130)+(1.082)+(9.008), (I-130)+(1.082)+(9.009), (I-130)+(1.082)+(14.001), (I-130)+(1.082)+(14.002), (I-130)+(1.082)+(15.008), (I-130)+(1.082)+(15.011), (I-130)+(1.082)+(15.012), (I-130)+(1.082)+(15.016), (I-130)+(1.082)+(15.025), (I-130)+(1.082)+(15.027), (I-130)+(1.082)+(15.047), (I-130)+(1.082)+(15.063), (I-130)+(1.082)+(15.064), (I-130)+(1.082)+(16.001), (I-130)+(1.082)+(16.002), (I-130)+(1.082)+(16.003), (I-130)+(1.082)+(16.004), (I-130)+(1.082)+(16.005), (I-130)+(1.082)+(16.006), (I-130)+(1.082)+(16.007), (I-130)+(1.082)+(16.008), (I-130)+(1.082)+(17.001), (I-130)+(1.082)+(17.002), (I-130)+(1.082)+(17.003), (I-130)+(1.082)+(17.004), (I-130)+(1.082)+(17.005), (I-130)+(1.082)+(17.006), (I-130)+(1.082)+(17.007), (I-130)+(1.082)+(17.008), (I-130)+(1.082)+(17.009), (I-130)+(1.082)+(17.010), (I-130)+(1.082)+(17.011), (I-130)+(1.082)+(17.012), (I-130)+(1.082)+(18.001), (I-130)+(1.083)+(1.084), (I-130)+(1.083)+(1.085), (I-130)+(1.083)+(1.086), (I-130)+(1.083)+(1.087), (I-130)+(1.083)+(1.088), (I-130)+(1.083)+(1.089), (I-130)+(1.083)+(1.090), (I-130)+(1.083)+(1.091), (I-130)+(1.083)+(1.092), (I-130)+(1.083)+(2.001), (I-130)+(1.083)+(2.002), (I-130)+(1.083)+(2.003), (I-130)+(1.083)+(2.004), (I-130)+(1.083)+(2.005), (I-130)+(1.083)+(2.006), (I-130)+(1.083)+(2.007), (I-130)+(1.083)+(2.008), (I-130)+(1.083)+(2.009), (I-130)+(1.083)+(2.010), (I-130)+(1.083)+(2.011), (I-130)+(1.083)+(2.012), (I-130)+(1.083)+(2.013), (I-130)+(1.083)+(2.014), (I-130)+(1.083)+(2.015), (I-130)+(1.083)+(2.016), (I-130)+(1.083)+(2.017), (I-130)+(1.083)+(2.018), (I-130)+(1.083)+(2.019), (I-130)+(1.083)+(2.020), (I-130)+(1.083)+(2.021), (I-130)+(1.083)+(2.022), (I-130)+(1.083)+(2.023), (I-130)+(1.083)+(2.024), (I-130)+(1.083)+(2.025), (I-130)+(1.083)+(2.026), (I-130)+(1.083)+(2.027), (I-130)+(1.083)+(2.028), (I-130)+(1.083)+(2.029), (I-130)+(1.083)+(2.030), (I-130)+(1.083)+(2.031), (I-130)+(1.083)+(2.032), (I-130)+(1.083)+(2.033), (I-130)+(1.083)+(2.034), (I-130)+(1.083)+(2.035), (I-130)+(1.083)+(2.036), (I-130)+(1.083)+(2.037), (I-130)+(1.083)+(2.038), (I-130)+(1.083)+(2.039), (I-130)+(1.083)+(2.040), (I-130)+(1.083)+(2.041), (I-130)+(1.083)+(2.042), (I-130)+(1.083)+(2.043), (I-130)+(1.083)+(2.044), (I-130)+(1.083)+(2.045), (I-130)+(1.083)+(2.046), (I-130)+(1.083)+(2.047), (I-130)+(1.083)+(2.048), (I-130)+(1.083)+(2.049), (I-130)+(1.083)+(2.050), (I-130)+(1.083)+(2.051), (I-130)+(1.083)+(2.052), (I-130)+(1.083)+(2.053), (I-130)+(1.083)+(2.054), (I-130)+(1.083)+(2.055), (I-130)+(1.083)+(2.056), (I-130)+(1.083)+(2.057), (I-130)+(1.083)+(2.058), (I-130)+(1.083)+(2.059), (I-130)+(1.083)+(3.001), (I-130)+(1.083)+(3.002), (I-130)+(1.083)+(3.003), (I-130)+(1.083)+(3.004), (I-130)+(1.083)+(3.005), (I-130)+(1.083)+(3.006), (I-130)+(1.083)+(3.007), (I-130)+(1.083)+(3.008), (I-130)+(1.083)+(3.009), (I-130)+(1.083)+(3.010), (I-130)+(1.083)+(3.011), (I-130)+(1.083)+(3.012), (I-130)+(1.083)+(3.013), (I-130)+(1.083)+(3.014), (I-130)+(1.083)+(3.015), (I-130)+(1.083)+(3.016), (I-130)+(1.083)+(3.017), (I-130)+(1.083)+(3.018), (I-130)+(1.083)+(3.019), (I-130)+(1.083)+(3.020), (I-130)+(1.083)+(3.021), (I-130)+(1.083)+(3.022), (I-130)+(1.083)+(3.023), (I-130)+(1.083)+(3.024), (I-130)+(1.083)+(3.025), (I-130)+(1.083)+(3.026), (I-130)+(1.083)+(3.027), (I-130)+(1.083)+(3.028), (I-130)+(1.083)+(3.029), (I-130)+(1.083)+(3.030), (I-130)+(1.083)+(3.031), (I-130)+(1.083)+(5.001), (I-130)+(1.083)+(5.002), (I-130)+(1.083)+(5.003), (I-130)+(1.083)+(5.004), (I-130)+(1.083)+(5.005), (I-130)+(1.083)+(5.006), (I-130)+(1.083)+(5.007), (I-130)+(1.083)+(5.008), (I-130)+(1.083)+(5.009), (I-130)+(1.083)+(5.010), (I-130)+(1.083)+(5.011), (I-130)+(1.083)+(5.012), (I-130)+(1.083)+(5.013), (I-130)+(1.083)+(5.014), (I-130)+(1.083)+(5.015), (I-130)+(1.083)+(5.016), (I-130)+(1.083)+(5.017), (I-130)+(1.083)+(5.018), (I-130)+(1.083)+(5.019), (I-130)+(1.083)+(5.020), (I-130)+(1.083)+(5.021), (I-130)+(1.083)+(5.022), (I-130)+(1.083)+(5.023), (I-130)+(1.083)+(6.001), (I-130)+(1.083)+(6.002), (I-130)+(1.083)+(6.003), (I-130)+(1.083)+(6.004), (I-130)+(1.083)+(7.001), (I-130)+(1.083)+(7.002), (I-130)+(1.083)+(7.003), (I-130)+(1.083)+(7.004), (I-130)+(1.083)+(7.005), (I-130)+(1.083)+(7.006), (I-130)+(1.083)+(9.001), (I-130)+(1.083)+(9.002), (I-130)+(1.083)+(9.003), (I-130)+(1.083)+(9.004), (I-130)+(1.083)+(9.005), (I-130)+(1.083)+(9.006), (I-130)+(1.083)+(9.007), (I-130)+(1.083)+(9.008), (I-130)+(1.083)+(9.009), (I-130)+(1.083)+(14.001), (I-130)+(1.083)+(14.002), (I-130)+(1.083)+(15.008), (I-130)+(1.083)+(15.011), (I-130)+(1.083)+(15.012), (I-130)+(1.083)+(15.016), (I-130)+(1.083)+(15.025), (I-130)+(1.083)+(15.027), (I-130)+(1.083)+(15.047), (I-130)+(1.083)+(15.063), (I-130)+(1.083)+(15.064), (I-130)+(1.083)+(16.001), (I-130)+(1.083)+(16.002), (I-130)+(1.083)+(16.003), (I-130)+(1.083)+(16.004), (I-130)+(1.083)+(16.005), (I-130)+(1.083)+(16.006), (I-130)+(1.083)+(16.007), (I-130)+(1.083)+(16.008), (I-130)+(1.083)+(17.001), (I-130)+(1.083)+(17.002), (I-130)+(1.083)+(17.003), (I-130)+(1.083)+(17.004), (I-130)+(1.083)+(17.005), (I-130)+(1.083)+(17.006), (I-130)+(1.083)+(17.007), (I-130)+(1.083)+(17.008), (I-130)+(1.083)+(17.009), (I-130)+(1.083)+(17.010), (I-130)+(1.083)+(17.011), (I-130)+(1.083)+(17.012), (I-130)+(1.083)+(18.001), (I-130)+(1.084)+(1.085), (I-130)+(1.084)+(1.086), (I-130)+(1.084)+(1.087), (I-130)+(1.084)+(1.088), (I-130)+(1.084)+(1.089), (I-130)+(1.084)+(1.090), (I-130)+(1.084)+(1.091), (I-130)+(1.084)+(1.092), (I-130)+(1.084)+(2.001), (I-130)+(1.084)+(2.002), (I-130)+(1.084)+(2.003), (I-130)+(1.084)+(2.004), (I-130)+(1.084)+(2.005), (I-130)+(1.084)+(2.006), (I-130)+(1.084)+(2.007), (I-130)+(1.084)+(2.008), (I-130)+(1.084)+(2.009), (I-130)+(1.084)+(2.010), (I-130)+(1.084)+(2.011), (I-130)+(1.084)+(2.012), (I-130)+(1.084)+(2.013), (I-130)+(1.084)+(2.014), (I-130)+(1.084)+(2.015), (I-130)+(1.084)+(2.016), (I-130)+(1.084)+(2.017), (I-130)+(1.084)+(2.018), (I-130)+(1.084)+(2.019), (I-130)+(1.084)+(2.020), (I-130)+(1.084)+(2.021), (I-130)+(1.084)+(2.022), (I-130)+(1.084)+(2.023), (I-130)+(1.084)+(2.024), (I-130)+(1.084)+(2.025), (I-130)+(1.084)+(2.026), (I-130)+(1.084)+(2.027), (I-130)+(1.084)+(2.028), (I-130)+(1.084)+(2.029), (I-130)+(1.084)+(2.030), (I-130)+(1.084)+(2.031), (I-130)+(1.084)+(2.032), (I-130)+(1.084)+(2.033), (I-130)+(1.084)+(2.034), (I-130)+(1.084)+(2.035), (I-130)+(1.084)+(2.036), (I-130)+(1.084)+(2.037), (I-130)+(1.084)+(2.038), (I-130)+(1.084)+(2.039), (I-130)+(1.084)+(2.040), (I-130)+(1.084)+(2.041), (I-130)+(1.084)+(2.042), (I-130)+(1.084)+(2.043), (I-130)+(1.084)+(2.044), (I-130)+(1.084)+(2.045), (I-130)+(1.084)+(2.046), (I-130)+(1.084)+(2.047), (I-130)+(1.084)+(2.048), (I-130)+(1.084)+(2.049), (I-130)+(1.084)+(2.050), (I-130)+(1.084)+(2.051), (I-130)+(1.084)+(2.052), (I-130)+(1.084)+(2.053), (I-130)+(1.084)+(2.054), (I-130)+(1.084)+(2.055), (I-130)+(1.084)+(2.056), (I-130)+(1.084)+(2.057), (I-130)+(1.084)+(2.058), (I-130)+(1.084)+(2.059), (I-130)+(1.084)+(3.001), (I-130)+(1.084)+(3.002), (I-130)+(1.084)+(3.003), (I-130)+(1.084)+(3.004), (I-130)+(1.084)+(3.005), (I-130)+(1.084)+(3.006), (I-130)+(1.084)+(3.007), (I-130)+(1.084)+(3.008), (I-130)+(1.084)+(3.009), (I-130)+(1.084)+(3.010), (I-130)+(1.084)+(3.011), (I-130)+(1.084)+(3.012), (I-130)+(1.084)+(3.013), (I-130)+(1.084)+(3.014), (I-130)+(1.084)+(3.015), (I-130)+(1.084)+(3.016), (I-130)+(1.084)+(3.017), (I-130)+(1.084)+(3.018), (I-130)+(1.084)+(3.019), (I-130)+(1.084)+(3.020), (I-130)+(1.084)+(3.021), (I-130)+(1.084)+(3.022), (I-130)+(1.084)+(3.023), (I-130)+(1.084)+(3.024), (I-130)+(1.084)+(3.025), (I-130)+(1.084)+(3.026), (I-130)+(1.084)+(3.027), (I-130)+(1.084)+(3.028), (I-130)+(1.084)+(3.029), (I-130)+(1.084)+(3.030), (I-130)+(1.084)+(3.031), (I-130)+(1.084)+(5.001), (I-130)+(1.084)+(5.002), (I-130)+(1.084)+(5.003), (I-130)+(1.084)+(5.004), (I-130)+(1.084)+(5.005), (I-130)+(1.084)+(5.006), (I-130)+(1.084)+(5.007), (I-130)+(1.084)+(5.008), (I-130)+(1.084)+(5.009), (I-130)+(1.084)+(5.010), (I-130)+(1.084)+(5.011), (I-130)+(1.084)+(5.012), (I-130)+(1.084)+(5.013), (I-130)+(1.084)+(5.014), (I-130)+(1.084)+(5.015), (I-130)+(1.084)+(5.016), (I-130)+(1.084)+(5.017), (I-130)+(1.084)+(5.018), (I-130)+(1.084)+(5.019), (I-130)+(1.084)+(5.020), (I-130)+(1.084)+(5.021), (I-130)+(1.084)+(5.022), (I-130)+(1.084)+(5.023), (I-130)+(1.084)+(6.001), (I-130)+(1.084)+(6.002), (I-130)+(1.084)+(6.003), (I-130)+(1.084)+(6.004), (I-130)+(1.084)+(7.001), (I-130)+(1.084)+(7.002), (I-130)+(1.084)+(7.003), (I-130)+(1.084)+(7.004), (I-130)+(1.084)+(7.005), (I-130)+(1.084)+(7.006), (I-130)+(1.084)+(9.001), (I-130)+(1.084)+(9.002), (I-130)+(1.084)+(9.003), (I-130)+(1.084)+(9.004), (I-130)+(1.084)+(9.005), (I-130)+(1.084)+(9.006), (I-130)+(1.084)+(9.007), (I-130)+(1.084)+(9.008), (I-130)+(1.084)+(9.009), (I-130)+(1.084)+(14.001), (I-130)+(1.084)+(14.002), (I-130)+(1.084)+(15.008), (I-130)+(1.084)+(15.011), (I-130)+(1.084)+(15.012), (I-130)+(1.084)+(15.016), (I-130)+(1.084)+(15.025), (I-130)+(1.084)+(15.027), (I-130)+(1.084)+(15.047), (I-130)+(1.084)+(15.063), (I-130)+(1.084)+(15.064), (I-130)+(1.084)+(16.001), (I-130)+(1.084)+(16.002), (I-130)+(1.084)+(16.003), (I-130)+(1.084)+(16.004), (I-130)+(1.084)+(16.005), (I-130)+(1.084)+(16.006), (I-130)+(1.084)+(16.007), (I-130)+(1.084)+(16.008), (I-130)+(1.084)+(17.001), (I-130)+(1.084)+(17.002), (I-130)+(1.084)+(17.003), (I-130)+(1.084)+(17.004), (I-130)+(1.084)+(17.005), (I-130)+(1.084)+(17.006), (I-130)+(1.084)+(17.007), (I-130)+(1.084)+(17.008), (I-130)+(1.084)+(17.009), (I-130)+(1.084)+(17.010), (I-130)+(1.084)+(17.011), (I-130)+(1.084)+(17.012), (I-130)+(1.084)+(18.001), (I-130)+(1.085)+(1.086), (I-130)+(1.085)+(1.087), (I-130)+(1.085)+(1.088), (I-130)+(1.085)+(1.089), (I-130)+(1.085)+(1.090), (I-130)+(1.085)+(1.091), (I-130)+(1.085)+(1.092), (I-130)+(1.085)+(2.001), (I-130)+(1.085)+(2.002), (I-130)+(1.085)+(2.003), (I-130)+(1.085)+(2.004), (I-130)+(1.085)+(2.005), (I-130)+(1.085)+(2.006), (I-130)+(1.085)+(2.007), (I-130)+(1.085)+(2.008), (I-130)+(1.085)+(2.009), (I-130)+(1.085)+(2.010), (I-130)+(1.085)+(2.011), (I-130)+(1.085)+(2.012), (I-130)+(1.085)+(2.013), (I-130)+(1.085)+(2.014), (I-130)+(1.085)+(2.015), (I-130)+(1.085)+(2.016), (I-130)+(1.085)+(2.017), (I-130)+(1.085)+(2.018), (I-130)+(1.085)+(2.019), (I-130)+(1.085)+(2.020), (I-130)+(1.085)+(2.021), (I-130)+(1.085)+(2.022), (I-130)+(1.085)+(2.023), (I-130)+(1.085)+(2.024), (I-130)+(1.085)+(2.025), (I-130)+(1.085)+(2.026), (I-130)+(1.085)+(2.027), (I-130)+(1.085)+(2.028), (I-130)+(1.085)+(2.029), (I-130)+(1.085)+(2.030), (I-130)+(1.085)+(2.031), (I-130)+(1.085)+(2.032), (I-130)+(1.085)+(2.033), (I-130)+(1.085)+(2.034), (I-130)+(1.085)+(2.035), (I-130)+(1.085)+(2.036), (I-130)+(1.085)+(2.037), (I-130)+(1.085)+(2.038), (I-130)+(1.085)+(2.039), (I-130)+(1.085)+(2.040), (I-130)+(1.085)+(2.041), (I-130)+(1.085)+(2.042), (I-130)+(1.085)+(2.043), (I-130)+(1.085)+(2.044), (I-130)+(1.085)+(2.045), (I-130)+(1.085)+(2.046), (I-130)+(1.085)+(2.047), (I-130)+(1.085)+(2.048), (I-130)+(1.085)+(2.049), (I-130)+(1.085)+(2.050), (I-130)+(1.085)+(2.051), (I-130)+(1.085)+(2.052), (I-130)+(1.085)+(2.053), (I-130)+(1.085)+(2.054), (I-130)+(1.085)+(2.055), (I-130)+(1.085)+(2.056), (I-130)+(1.085)+(2.057), (I-130)+(1.085)+(2.058), (I-130)+(1.085)+(2.059), (I-130)+(1.085)+(3.001), (I-130)+(1.085)+(3.002), (I-130)+(1.085)+(3.003), (I-130)+(1.085)+(3.004), (I-130)+(1.085)+(3.005), (I-130)+(1.085)+(3.006), (I-130)+(1.085)+(3.007), (I-130)+(1.085)+(3.008), (I-130)+(1.085)+(3.009), (I-130)+(1.085)+(3.010), (I-130)+(1.085)+(3.011), (I-130)+(1.085)+(3.012), (I-130)+(1.085)+(3.013), (I-130)+(1.085)+(3.014), (I-130)+(1.085)+(3.015), (I-130)+(1.085)+(3.016), (I-130)+(1.085)+(3.017), (I-130)+(1.085)+(3.018), (I-130)+(1.085)+(3.019), (I-130)+(1.085)+(3.020), (I-130)+(1.085)+(3.021), (I-130)+(1.085)+(3.022), (I-130)+(1.085)+(3.023), (I-130)+(1.085)+(3.024), (I-130)+(1.085)+(3.025), (I-130)+(1.085)+(3.026), (I-130)+(1.085)+(3.027), (I-130)+(1.085)+(3.028), (I-130)+(1.085)+(3.029), (I-130)+(1.085)+(3.030), (I-130)+(1.085)+(3.031), (I-130)+(1.085)+(5.001), (I-130)+(1.085)+(5.002), (I-130)+(1.085)+(5.003), (I-130)+(1.085)+(5.004), (I-130)+(1.085)+(5.005), (I-130)+(1.085)+(5.006), (I-130)+(1.085)+(5.007), (I-130)+(1.085)+(5.008), (I-130)+(1.085)+(5.009), (I-130)+(1.085)+(5.010), (I-130)+(1.085)+(5.011), (I-130)+(1.085)+(5.012), (I-130)+(1.085)+(5.013), (I-130)+(1.085)+(5.014), (I-130)+(1.085)+(5.015), (I-130)+(1.085)+(5.016), (I-130)+(1.085)+(5.017), (I-130)+(1.085)+(5.018), (I-130)+(1.085)+(5.019), (I-130)+(1.085)+(5.020), (I-130)+(1.085)+(5.021), (I-130)+(1.085)+(5.022), (I-130)+(1.085)+(5.023), (I-130)+(1.085)+(6.001), (I-130)+(1.085)+(6.002), (I-130)+(1.085)+(6.003), (I-130)+(1.085)+(6.004), (I-130)+(1.085)+(7.001), (I-130)+(1.085)+(7.002), (I-130)+(1.085)+(7.003), (I-130)+(1.085)+(7.004), (I-130)+(1.085)+(7.005), (I-130)+(1.085)+(7.006), (I-130)+(1.085)+(9.001), (I-130)+(1.085)+(9.002), (I-130)+(1.085)+(9.003), (I-130)+(1.085)+(9.004), (I-130)+(1.085)+(9.005), (I-130)+(1.085)+(9.006), (I-130)+(1.085)+(9.007), (I-130)+(1.085)+(9.008), (I-130)+(1.085)+(9.009), (I-130)+(1.085)+(14.001), (I-130)+(1.085)+(14.002), (I-130)+(1.085)+(15.008), (I-130)+(1.085)+(15.011), (I-130)+(1.085)+(15.012), (I-130)+(1.085)+(15.016), (I-130)+(1.085)+(15.025), (I-130)+(1.085)+(15.027), (I-130)+(1.085)+(15.047), (I-130)+(1.085)+(15.063), (I-130)+(1.085)+(15.064), (I-130)+(1.085)+(16.001), (I-130)+(1.085)+(16.002), (I-130)+(1.085)+(16.003), (I-130)+(1.085)+(16.004), (I-130)+(1.085)+(16.005), (I-130)+(1.085)+(16.006), (I-130)+(1.085)+(16.007), (I-130)+(1.085)+(16.008), (I-130)+(1.085)+(17.001), (I-130)+(1.085)+(17.002), (I-130)+(1.085)+(17.003), (I-130)+(1.085)+(17.004), (I-130)+(1.085)+(17.005), (I-130)+(1.085)+(17.006), (I-130)+(1.085)+(17.007), (I-130)+(1.085)+(17.008), (I-130)+(1.085)+(17.009), (I-130)+(1.085)+(17.010), (I-130)+(1.085)+(17.011), (I-130)+(1.085)+(17.012), (I-130)+(1.085)+(18.001), (I-130)+(1.086)+(1.087), (I-130)+(1.086)+(1.088), (I-130)+(1.086)+(1.089), (I-130)+(1.086)+(1.090), (I-130)+(1.086)+(1.091), (I-130)+(1.086)+(1.092), (I-130)+(1.086)+(2.001), (I-130)+(1.086)+(2.002), (I-130)+(1.086)+(2.003), (I-130)+(1.086)+(2.004), (I-130)+(1.086)+(2.005), (I-130)+(1.086)+(2.006), (I-130)+(1.086)+(2.007), (I-130)+(1.086)+(2.008), (I-130)+(1.086)+(2.009), (I-130)+(1.086)+(2.010), (I-130)+(1.086)+(2.011), (I-130)+(1.086)+(2.012), (I-130)+(1.086)+(2.013), (I-130)+(1.086)+(2.014), (I-130)+(1.086)+(2.015), (I-130)+(1.086)+(2.016), (I-130)+(1.086)+(2.017), (I-130)+(1.086)+(2.018), (I-130)+(1.086)+(2.019), (I-130)+(1.086)+(2.020), (I-130)+(1.086)+(2.021), (I-130)+(1.086)+(2.022), (I-130)+(1.086)+(2.023), (I-130)+(1.086)+(2.024), (I-130)+(1.086)+(2.025), (I-130)+(1.086)+(2.026), (I-130)+(1.086)+(2.027), (I-130)+(1.086)+(2.028), (I-130)+(1.086)+(2.029), (I-130)+(1.086)+(2.030), (I-130)+(1.086)+(2.031), (I-130)+(1.086)+(2.032), (I-130)+(1.086)+(2.033), (I-130)+(1.086)+(2.034), (I-130)+(1.086)+(2.035), (I-130)+(1.086)+(2.036), (I-130)+(1.086)+(2.037), (I-130)+(1.086)+(2.038), (I-130)+(1.086)+(2.039), (I-130)+(1.086)+(2.040), (I-130)+(1.086)+(2.041), (I-130)+(1.086)+(2.042), (I-130)+(1.086)+(2.043), (I-130)+(1.086)+(2.044), (I-130)+(1.086)+(2.045), (I-130)+(1.086)+(2.046), (I-130)+(1.086)+(2.047), (I-130)+(1.086)+(2.048), (I-130)+(1.086)+(2.049), (I-130)+(1.086)+(2.050), (I-130)+(1.086)+(2.051), (I-130)+(1.086)+(2.052), (I-130)+(1.086)+(2.053), (I-130)+(1.086)+(2.054), (I-130)+(1.086)+(2.055), (I-130)+(1.086)+(2.056), (I-130)+(1.086)+(2.057), (I-130)+(1.086)+(2.058), (I-130)+(1.086)+(2.059), (I-130)+(1.086)+(3.001), (I-130)+(1.086)+(3.002), (I-130)+(1.086)+(3.003), (I-130)+(1.086)+(3.004), (I-130)+(1.086)+(3.005), (I-130)+(1.086)+(3.006), (I-130)+(1.086)+(3.007), (I-130)+(1.086)+(3.008), (I-130)+(1.086)+(3.009), (I-130)+(1.086)+(3.010), (I-130)+(1.086)+(3.011), (I-130)+(1.086)+(3.012), (I-130)+(1.086)+(3.013), (I-130)+(1.086)+(3.014), (I-130)+(1.086)+(3.015), (I-130)+(1.086)+(3.016), (I-130)+(1.086)+(3.017), (I-130)+(1.086)+(3.018), (I-130)+(1.086)+(3.019), (I-130)+(1.086)+(3.020), (I-130)+(1.086)+(3.021), (I-130)+(1.086)+(3.022), (I-130)+(1.086)+(3.023), (I-130)+(1.086)+(3.024), (I-130)+(1.086)+(3.025), (I-130)+(1.086)+(3.026), (I-130)+(1.086)+(3.027), (I-130)+(1.086)+(3.028), (I-130)+(1.086)+(3.029), (I-130)+(1.086)+(3.030), (I-130)+(1.086)+(3.031), (I-130)+(1.086)+(5.001), (I-130)+(1.086)+(5.002), (I-130)+(1.086)+(5.003), (I-130)+(1.086)+(5.004), (I-130)+(1.086)+(5.005), (I-130)+(1.086)+(5.006), (I-130)+(1.086)+(5.007), (I-130)+(1.086)+(5.008), (I-130)+(1.086)+(5.009), (I-130)+(1.086)+(5.010), (I-130)+(1.086)+(5.011), (I-130)+(1.086)+(5.012), (I-130)+(1.086)+(5.013), (I-130)+(1.086)+(5.014), (I-130)+(1.086)+(5.015), (I-130)+(1.086)+(5.016), (I-130)+(1.086)+(5.017), (I-130)+(1.086)+(5.018), (I-130)+(1.086)+(5.019), (I-130)+(1.086)+(5.020), (I-130)+(1.086)+(5.021), (I-130)+(1.086)+(5.022), (I-130)+(1.086)+(5.023), (I-130)+(1.086)+(6.001), (I-130)+(1.086)+(6.002), (I-130)+(1.086)+(6.003), (I-130)+(1.086)+(6.004), (I-130)+(1.086)+(7.001), (I-130)+(1.086)+(7.002), (I-130)+(1.086)+(7.003), (I-130)+(1.086)+(7.004), (I-130)+(1.086)+(7.005), (I-130)+(1.086)+(7.006), (I-130)+(1.086)+(9.001), (I-130)+(1.086)+(9.002), (I-130)+(1.086)+(9.003), (I-130)+(1.086)+(9.004), (I-130)+(1.086)+(9.005), (I-130)+(1.086)+(9.006), (I-130)+(1.086)+(9.007), (I-130)+(1.086)+(9.008), (I-130)+(1.086)+(9.009), (I-130)+(1.086)+(14.001), (I-130)+(1.086)+(14.002), (I-130)+(1.086)+(15.008), (I-130)+(1.086)+(15.011), (I-130)+(1.086)+(15.012), (I-130)+(1.086)+(15.016), (I-130)+(1.086)+(15.025), (I-130)+(1.086)+(15.027), (I-130)+(1.086)+(15.047), (I-130)+(1.086)+(15.063), (I-130)+(1.086)+(15.064), (I-130)+(1.086)+(16.001), (I-130)+(1.086)+(16.002), (I-130)+(1.086)+(16.003), (I-130)+(1.086)+(16.004), (I-130)+(1.086)+(16.005), (I-130)+(1.086)+(16.006), (I-130)+(1.086)+(16.007), (I-130)+(1.086)+(16.008), (I-130)+(1.086)+(17.001), (I-130)+(1.086)+(17.002), (I-130)+(1.086)+(17.003), (I-130)+(1.086)+(17.004), (I-130)+(1.086)+(17.005), (I-130)+(1.086)+(17.006), (I-130)+(1.086)+(17.007), (I-130)+(1.086)+(17.008), (I-130)+(1.086)+(17.009), (I-130)+(1.086)+(17.010), (I-130)+(1.086)+(17.011), (I-130)+(1.086)+(17.012), (I-130)+(1.086)+(18.001), (I-130)+(1.087)+(1.088), (I-130)+(1.087)+(1.089), (I-130)+(1.087)+(1.090), (I-130)+(1.087)+(1.091), (I-130)+(1.087)+(1.092), (I-130)+(1.087)+(2.001), (I-130)+(1.087)+(2.002), (I-130)+(1.087)+(2.003), (I-130)+(1.087)+(2.004), (I-130)+(1.087)+(2.005), (I-130)+(1.087)+(2.006), (I-130)+(1.087)+(2.007), (I-130)+(1.087)+(2.008), (I-130)+(1.087)+(2.009), (I-130)+(1.087)+(2.010), (I-130)+(1.087)+(2.011), (I-130)+(1.087)+(2.012), (I-130)+(1.087)+(2.013), (I-130)+(1.087)+(2.014), (I-130)+(1.087)+(2.015), (I-130)+(1.087)+(2.016), (I-130)+(1.087)+(2.017), (I-130)+(1.087)+(2.018), (I-130)+(1.087)+(2.019), (I-130)+(1.087)+(2.020), (I-130)+(1.087)+(2.021), (I-130)+(1.087)+(2.022), (I-130)+(1.087)+(2.023), (I-130)+(1.087)+(2.024), (I-130)+(1.087)+(2.025), (I-130)+(1.087)+(2.026), (I-130)+(1.087)+(2.027), (I-130)+(1.087)+(2.028), (I-130)+(1.087)+(2.029), (I-130)+(1.087)+(2.030), (I-130)+(1.087)+(2.031), (I-130)+(1.087)+(2.032), (I-130)+(1.087)+(2.033), (I-130)+(1.087)+(2.034), (I-130)+(1.087)+(2.035), (I-130)+(1.087)+(2.036), (I-130)+(1.087)+(2.037), (I-130)+(1.087)+(2.038), (I-130)+(1.087)+(2.039), (I-130)+(1.087)+(2.040), (I-130)+(1.087)+(2.041), (I-130)+(1.087)+(2.042), (I-130)+(1.087)+(2.043), (I-130)+(1.087)+(2.044), (I-130)+(1.087)+(2.045), (I-130)+(1.087)+(2.046), (I-130)+(1.087)+(2.047), (I-130)+(1.087)+(2.048), (I-130)+(1.087)+(2.049), (I-130)+(1.087)+(2.050), (I-130)+(1.087)+(2.051), (I-130)+(1.087)+(2.052), (I-130)+(1.087)+(2.053), (I-130)+(1.087)+(2.054), (I-130)+(1.087)+(2.055), (I-130)+(1.087)+(2.056), (I-130)+(1.087)+(2.057), (I-130)+(1.087)+(2.058), (I-130)+(1.087)+(2.059), (I-130)+(1.087)+(3.001), (I-130)+(1.087)+(3.002), (I-130)+(1.087)+(3.003), (I-130)+(1.087)+(3.004), (I-130)+(1.087)+(3.005), (I-130)+(1.087)+(3.006), (I-130)+(1.087)+(3.007), (I-130)+(1.087)+(3.008), (I-130)+(1.087)+(3.009), (I-130)+(1.087)+(3.010), (I-130)+(1.087)+(3.011), (I-130)+(1.087)+(3.012), (I-130)+(1.087)+(3.013), (I-130)+(1.087)+(3.014), (I-130)+(1.087)+(3.015), (I-130)+(1.087)+(3.016), (I-130)+(1.087)+(3.017), (I-130)+(1.087)+(3.018), (I-130)+(1.087)+(3.019), (I-130)+(1.087)+(3.020), (I-130)+(1.087)+(3.021), (I-130)+(1.087)+(3.022), (I-130)+(1.087)+(3.023), (I-130)+(1.087)+(3.024), (I-130)+(1.087)+(3.025), (I-130)+(1.087)+(3.026), (I-130)+(1.087)+(3.027), (I-130)+(1.087)+(3.028), (I-130)+(1.087)+(3.029), (I-130)+(1.087)+(3.030), (I-130)+(1.087)+(3.031), (I-130)+(1.087)+(5.001), (I-130)+(1.087)+(5.002), (I-130)+(1.087)+(5.003), (I-130)+(1.087)+(5.004), (I-130)+(1.087)+(5.005), (I-130)+(1.087)+(5.006), (I-130)+(1.087)+(5.007), (I-130)+(1.087)+(5.008), (I-130)+(1.087)+(5.009), (I-130)+(1.087)+(5.010), (I-130)+(1.087)+(5.011), (I-130)+(1.087)+(5.012), (I-130)+(1.087)+(5.013), (I-130)+(1.087)+(5.014), (I-130)+(1.087)+(5.015), (I-130)+(1.087)+(5.016), (I-130)+(1.087)+(5.017), (I-130)+(1.087)+(5.018), (I-130)+(1.087)+(5.019), (I-130)+(1.087)+(5.020), (I-130)+(1.087)+(5.021), (I-130)+(1.087)+(5.022), (I-130)+(1.087)+(5.023), (I-130)+(1.087)+(6.001), (I-130)+(1.087)+(6.002), (I-130)+(1.087)+(6.003), (I-130)+(1.087)+(6.004), (I-130)+(1.087)+(7.001), (I-130)+(1.087)+(7.002), (I-130)+(1.087)+(7.003), (I-130)+(1.087)+(7.004), (I-130)+(1.087)+(7.005), (I-130)+(1.087)+(7.006), (I-130)+(1.087)+(9.001), (I-130)+(1.087)+(9.002), (I-130)+(1.087)+(9.003), (I-130)+(1.087)+(9.004), (I-130)+(1.087)+(9.005), (I-130)+(1.087)+(9.006), (I-130)+(1.087)+(9.007), (I-130)+(1.087)+(9.008), (I-130)+(1.087)+(9.009), (I-130)+(1.087)+(14.001), (I-130)+(1.087)+(14.002), (I-130)+(1.087)+(15.008), (I-130)+(1.087)+(15.011), (I-130)+(1.087)+(15.012), (I-130)+(1.087)+(15.016), (I-130)+(1.087)+(15.025), (I-130)+(1.087)+(15.027), (I-130)+(1.087)+(15.047), (I-130)+(1.087)+(15.063), (I-130)+(1.087)+(15.064), (I-130)+(1.087)+(16.001), (I-130)+(1.087)+(16.002), (I-130)+(1.087)+(16.003), (I-130)+(1.087)+(16.004), (I-130)+(1.087)+(16.005), (I-130)+(1.087)+(16.006), (I-130)+(1.087)+(16.007), (I-130)+(1.087)+(16.008), (I-130)+(1.087)+(17.001), (I-130)+(1.087)+(17.002), (I-130)+(1.087)+(17.003), (I-130)+(1.087)+(17.004), (I-130)+(1.087)+(17.005), (I-130)+(1.087)+(17.006), (I-130)+(1.087)+(17.007), (I-130)+(1.087)+(17.008), (I-130)+(1.087)+(17.009), (I-130)+(1.087)+(17.010), (I-130)+(1.087)+(17.011), (I-130)+(1.087)+(17.012), (I-130)+(1.087)+(18.001), (I-130)+(1.088)+(1.089), (I-130)+(1.088)+(1.090), (I-130)+(1.088)+(1.091), (I-130)+(1.088)+(1.092), (I-130)+(1.088)+(2.001), (I-130)+(1.088)+(2.002), (I-130)+(1.088)+(2.003), (I-130)+(1.088)+(2.004), (I-130)+(1.088)+(2.005), (I-130)+(1.088)+(2.006), (I-130)+(1.088)+(2.007), (I-130)+(1.088)+(2.008), (I-130)+(1.088)+(2.009), (I-130)+(1.088)+(2.010), (I-130)+(1.088)+(2.011), (I-130)+(1.088)+(2.012), (I-130)+(1.088)+(2.013), (I-130)+(1.088)+(2.014), (I-130)+(1.088)+(2.015), (I-130)+(1.088)+(2.016), (I-130)+(1.088)+(2.017), (I-130)+(1.088)+(2.018), (I-130)+(1.088)+(2.019), (I-130)+(1.088)+(2.020), (I-130)+(1.088)+(2.021), (I-130)+(1.088)+(2.022), (I-130)+(1.088)+(2.023), (I-130)+(1.088)+(2.024), (I-130)+(1.088)+(2.025), (I-130)+(1.088)+(2.026), (I-130)+(1.088)+(2.027), (I-130)+(1.088)+(2.028), (I-130)+(1.088)+(2.029), (I-130)+(1.088)+(2.030), (I-130)+(1.088)+(2.031), (I-130)+(1.088)+(2.032), (I-130)+(1.088)+(2.033), (I-130)+(1.088)+(2.034), (I-130)+(1.088)+(2.035), (I-130)+(1.088)+(2.036), (I-130)+(1.088)+(2.037), (I-130)+(1.088)+(2.038), (I-130)+(1.088)+(2.039), (I-130)+(1.088)+(2.040), (I-130)+(1.088)+(2.041), (I-130)+(1.088)+(2.042), (I-130)+(1.088)+(2.043), (I-130)+(1.088)+(2.044), (I-130)+(1.088)+(2.045), (I-130)+(1.088)+(2.046), (I-130)+(1.088)+(2.047), (I-130)+(1.088)+(2.048), (I-130)+(1.088)+(2.049), (I-130)+(1.088)+(2.050), (I-130)+(1.088)+(2.051), (I-130)+(1.088)+(2.052), (I-130)+(1.088)+(2.053), (I-130)+(1.088)+(2.054), (I-130)+(1.088)+(2.055), (I-130)+(1.088)+(2.056), (I-130)+(1.088)+(2.057), (I-130)+(1.088)+(2.058), (I-130)+(1.088)+(2.059), (I-130)+(1.088)+(3.001), (I-130)+(1.088)+(3.002), (I-130)+(1.088)+(3.003), (I-130)+(1.088)+(3.004), (I-130)+(1.088)+(3.005), (I-130)+(1.088)+(3.006), (I-130)+(1.088)+(3.007), (I-130)+(1.088)+(3.008), (I-130)+(1.088)+(3.009), (I-130)+(1.088)+(3.010), (I-130)+(1.088)+(3.011), (I-130)+(1.088)+(3.012), (I-130)+(1.088)+(3.013), (I-130)+(1.088)+(3.014), (I-130)+(1.088)+(3.015), (I-130)+(1.088)+(3.016), (I-130)+(1.088)+(3.017), (I-130)+(1.088)+(3.018), (I-130)+(1.088)+(3.019), (I-130)+(1.088)+(3.020), (I-130)+(1.088)+(3.021), (I-130)+(1.088)+(3.022), (I-130)+(1.088)+(3.023), (I-130)+(1.088)+(3.024), (I-130)+(1.088)+(3.025), (I-130)+(1.088)+(3.026), (I-130)+(1.088)+(3.027), (I-130)+(1.088)+(3.028), (I-130)+(1.088)+(3.029), (I-130)+(1.088)+(3.030), (I-130)+(1.088)+(3.031), (I-130)+(1.088)+(5.001), (I-130)+(1.088)+(5.002), (I-130)+(1.088)+(5.003), (I-130)+(1.088)+(5.004), (I-130)+(1.088)+(5.005), (I-130)+(1.088)+(5.006), (I-130)+(1.088)+(5.007), (I-130)+(1.088)+(5.008), (I-130)+(1.088)+(5.009), (I-130)+(1.088)+(5.010), (I-130)+(1.088)+(5.011), (I-130)+(1.088)+(5.012), (I-130)+(1.088)+(5.013), (I-130)+(1.088)+(5.014), (I-130)+(1.088)+(5.015), (I-130)+(1.088)+(5.016), (I-130)+(1.088)+(5.017), (I-130)+(1.088)+(5.018), (I-130)+(1.088)+(5.019), (I-130)+(1.088)+(5.020), (I-130)+(1.088)+(5.021), (I-130)+(1.088)+(5.022), (I-130)+(1.088)+(5.023), (I-130)+(1.088)+(6.001), (I-130)+(1.088)+(6.002), (I-130)+(1.088)+(6.003), (I-130)+(1.088)+(6.004), (I-130)+(1.088)+(7.001), (I-130)+(1.088)+(7.002), (I-130)+(1.088)+(7.003), (I-130)+(1.088)+(7.004), (I-130)+(1.088)+(7.005), (I-130)+(1.088)+(7.006), (I-130)+(1.088)+(9.001), (I-130)+(1.088)+(9.002), (I-130)+(1.088)+(9.003), (I-130)+(1.088)+(9.004), (I-130)+(1.088)+(9.005), (I-130)+(1.088)+(9.006), (I-130)+(1.088)+(9.007), (I-130)+(1.088)+(9.008), (I-130)+(1.088)+(9.009), (I-130)+(1.088)+(14.001), (I-130)+(1.088)+(14.002), (I-130)+(1.088)+(15.008), (I-130)+(1.088)+(15.011), (I-130)+(1.088)+(15.012), (I-130)+(1.088)+(15.016), (I-130)+(1.088)+(15.025), (I-130)+(1.088)+(15.027), (I-130)+(1.088)+(15.047), (I-130)+(1.088)+(15.063), (I-130)+(1.088)+(15.064), (I-130)+(1.088)+(16.001), (I-130)+(1.088)+(16.002), (I-130)+(1.088)+(16.003), (I-130)+(1.088)+(16.004), (I-130)+(1.088)+(16.005), (I-130)+(1.088)+(16.006), (I-130)+(1.088)+(16.007), (I-130)+(1.088)+(16.008), (I-130)+(1.088)+(17.001), (I-130)+(1.088)+(17.002), (I-130)+(1.088)+(17.003), (I-130)+(1.088)+(17.004), (I-130)+(1.088)+(17.005), (I-130)+(1.088)+(17.006), (I-130)+(1.088)+(17.007), (I-130)+(1.088)+(17.008), (I-130)+(1.088)+(17.009), (I-130)+(1.088)+(17.010), (I-130)+(1.088)+(17.011), (I-130)+(1.088)+(17.012), (I-130)+(1.088)+(18.001), (I-130)+(1.089)+(1.090), (I-130)+(1.089)+(1.091), (I-130)+(1.089)+(1.092), (I-130)+(1.089)+(2.001), (I-130)+(1.089)+(2.002), (I-130)+(1.089)+(2.003), (I-130)+(1.089)+(2.004), (I-130)+(1.089)+(2.005), (I-130)+(1.089)+(2.006), (I-130)+(1.089)+(2.007), (I-130)+(1.089)+(2.008), (I-130)+(1.089)+(2.009), (I-130)+(1.089)+(2.010), (I-130)+(1.089)+(2.011), (I-130)+(1.089)+(2.012), (I-130)+(1.089)+(2.013), (I-130)+(1.089)+(2.014), (I-130)+(1.089)+(2.015), (I-130)+(1.089)+(2.016), (I-130)+(1.089)+(2.017), (I-130)+(1.089)+(2.018), (I-130)+(1.089)+(2.019), (I-130)+(1.089)+(2.020), (I-130)+(1.089)+(2.021), (I-130)+(1.089)+(2.022), (I-130)+(1.089)+(2.023), (I-130)+(1.089)+(2.024), (I-130)+(1.089)+(2.025), (I-130)+(1.089)+(2.026), (I-130)+(1.089)+(2.027), (I-130)+(1.089)+(2.028), (I-130)+(1.089)+(2.029), (I-130)+(1.089)+(2.030), (I-130)+(1.089)+(2.031), (I-130)+(1.089)+(2.032), (I-130)+(1.089)+(2.033), (I-130)+(1.089)+(2.034), (I-130)+(1.089)+(2.035), (I-130)+(1.089)+(2.036), (I-130)+(1.089)+(2.037), (I-130)+(1.089)+(2.038), (I-130)+(1.089)+(2.039), (I-130)+(1.089)+(2.040), (I-130)+(1.089)+(2.041), (I-130)+(1.089)+(2.042), (I-130)+(1.089)+(2.043), (I-130)+(1.089)+(2.044), (I-130)+(1.089)+(2.045), (I-130)+(1.089)+(2.046), (I-130)+(1.089)+(2.047), (I-130)+(1.089)+(2.048), (I-130)+(1.089)+(2.049), (I-130)+(1.089)+(2.050), (I-130)+(1.089)+(2.051), (I-130)+(1.089)+(2.052), (I-130)+(1.089)+(2.053), (I-130)+(1.089)+(2.054), (I-130)+(1.089)+(2.055), (I-130)+(1.089)+(2.056), (I-130)+(1.089)+(2.057), (I-130)+(1.089)+(2.058), (I-130)+(1.089)+(2.059), (I-130)+(1.089)+(3.001), (I-130)+(1.089)+(3.002), (I-130)+(1.089)+(3.003), (I-130)+(1.089)+(3.004), (I-130)+(1.089)+(3.005), (I-130)+(1.089)+(3.006), (I-130)+(1.089)+(3.007), (I-130)+(1.089)+(3.008), (I-130)+(1.089)+(3.009), (I-130)+(1.089)+(3.010), (I-130)+(1.089)+(3.011), (I-130)+(1.089)+(3.012), (I-130)+(1.089)+(3.013), (I-130)+(1.089)+(3.014), (I-130)+(1.089)+(3.015), (I-130)+(1.089)+(3.016), (I-130)+(1.089)+(3.017), (I-130)+(1.089)+(3.018), (I-130)+(1.089)+(3.019), (I-130)+(1.089)+(3.020), (I-130)+(1.089)+(3.021), (I-130)+(1.089)+(3.022), (I-130)+(1.089)+(3.023), (I-130)+(1.089)+(3.024), (I-130)+(1.089)+(3.025), (I-130)+(1.089)+(3.026), (I-130)+(1.089)+(3.027), (I-130)+(1.089)+(3.028), (I-130)+(1.089)+(3.029), (I-130)+(1.089)+(3.030), (I-130)+(1.089)+(3.031), (I-130)+(1.089)+(5.001), (I-130)+(1.089)+(5.002), (I-130)+(1.089)+(5.003), (I-130)+(1.089)+(5.004), (I-130)+(1.089)+(5.005), (I-130)+(1.089)+(5.006), (I-130)+(1.089)+(5.007), (I-130)+(1.089)+(5.008), (I-130)+(1.089)+(5.009), (I-130)+(1.089)+(5.010), (I-130)+(1.089)+(5.011), (I-130)+(1.089)+(5.012), (I-130)+(1.089)+(5.013), (I-130)+(1.089)+(5.014), (I-130)+(1.089)+(5.015), (I-130)+(1.089)+(5.016), (I-130)+(1.089)+(5.017), (I-130)+(1.089)+(5.018), (I-130)+(1.089)+(5.019), (I-130)+(1.089)+(5.020), (I-130)+(1.089)+(5.021), (I-130)+(1.089)+(5.022), (I-130)+(1.089)+(5.023), (I-130)+(1.089)+(6.001), (I-130)+(1.089)+(6.002), (I-130)+(1.089)+(6.003), (I-130)+(1.089)+(6.004), (I-130)+(1.089)+(7.001), (I-130)+(1.089)+(7.002), (I-130)+(1.089)+(7.003), (I-130)+(1.089)+(7.004), (I-130)+(1.089)+(7.005), (I-130)+(1.089)+(7.006), (I-130)+(1.089)+(9.001), (I-130)+(1.089)+(9.002), (I-130)+(1.089)+(9.003), (I-130)+(1.089)+(9.004), (I-130)+(1.089)+(9.005), (I-130)+(1.089)+(9.006), (I-130)+(1.089)+(9.007), (I-130)+(1.089)+(9.008), (I-130)+(1.089)+(9.009), (I-130)+(1.089)+(14.001), (I-130)+(1.089)+(14.002), (I-130)+(1.089)+(15.008), (I-130)+(1.089)+(15.011), (I-130)+(1.089)+(15.012), (I-130)+(1.089)+(15.016), (I-130)+(1.089)+(15.025), (I-130)+(1.089)+(15.027), (I-130)+(1.089)+(15.047), (I-130)+(1.089)+(15.063), (I-130)+(1.089)+(15.064), (I-130)+(1.089)+(16.001), (I-130)+(1.089)+(16.002), (I-130)+(1.089)+(16.003), (I-130)+(1.089)+(16.004), (I-130)+(1.089)+(16.005), (I-130)+(1.089)+(16.006), (I-130)+(1.089)+(16.007), (I-130)+(1.089)+(16.008), (I-130)+(1.089)+(17.001), (I-130)+(1.089)+(17.002), (I-130)+(1.089)+(17.003), (I-130)+(1.089)+(17.004), (I-130)+(1.089)+(17.005), (I-130)+(1.089)+(17.006), (I-130)+(1.089)+(17.007), (I-130)+(1.089)+(17.008), (I-130)+(1.089)+(17.009), (I-130)+(1.089)+(17.010), (I-130)+(1.089)+(17.011), (I-130)+(1.089)+(17.012), (I-130)+(1.089)+(18.001), (I-130)+(1.090)+(1.091), (I-130)+(1.090)+(1.092), (I-130)+(1.090)+(2.001), (I-130)+(1.090)+(2.002), (I-130)+(1.090)+(2.003), (I-130)+(1.090)+(2.004), (I-130)+(1.090)+(2.005), (I-130)+(1.090)+(2.006), (I-130)+(1.090)+(2.007), (I-130)+(1.090)+(2.008), (I-130)+(1.090)+(2.009), (I-130)+(1.090)+(2.010), (I-130)+(1.090)+(2.011), (I-130)+(1.090)+(2.012), (I-130)+(1.090)+(2.013), (I-130)+(1.090)+(2.014), (I-130)+(1.090)+(2.015), (I-130)+(1.090)+(2.016), (I-130)+(1.090)+(2.017), (I-130)+(1.090)+(2.018), (I-130)+(1.090)+(2.019), (I-130)+(1.090)+(2.020), (I-130)+(1.090)+(2.021), (I-130)+(1.090)+(2.022), (I-130)+(1.090)+(2.023), (I-130)+(1.090)+(2.024), (I-130)+(1.090)+(2.025), (I-130)+(1.090)+(2.026), (I-130)+(1.090)+(2.027), (I-130)+(1.090)+(2.028), (I-130)+(1.090)+(2.029), (I-130)+(1.090)+(2.030), (I-130)+(1.090)+(2.031), (I-130)+(1.090)+(2.032), (I-130)+(1.090)+(2.033), (I-130)+(1.090)+(2.034), (I-130)+(1.090)+(2.035), (I-130)+(1.090)+(2.036), (I-130)+(1.090)+(2.037), (I-130)+(1.090)+(2.038), (I-130)+(1.090)+(2.039), (I-130)+(1.090)+(2.040), (I-130)+(1.090)+(2.041), (I-130)+(1.090)+(2.042), (I-130)+(1.090)+(2.043), (I-130)+(1.090)+(2.044), (I-130)+(1.090)+(2.045), (I-130)+(1.090)+(2.046), (I-130)+(1.090)+(2.047), (I-130)+(1.090)+(2.048), (I-130)+(1.090)+(2.049), (I-130)+(1.090)+(2.050), (I-130)+(1.090)+(2.051), (I-130)+(1.090)+(2.052), (I-130)+(1.090)+(2.053), (I-130)+(1.090)+(2.054), (I-130)+(1.090)+(2.055), (I-130)+(1.090)+(2.056), (I-130)+(1.090)+(2.057), (I-130)+(1.090)+(2.058), (I-130)+(1.090)+(2.059), (I-130)+(1.090)+(3.001), (I-130)+(1.090)+(3.002), (I-130)+(1.090)+(3.003), (I-130)+(1.090)+(3.004), (I-130)+(1.090)+(3.005), (I-130)+(1.090)+(3.006), (I-130)+(1.090)+(3.007), (I-130)+(1.090)+(3.008), (I-130)+(1.090)+(3.009), (I-130)+(1.090)+(3.010), (I-130)+(1.090)+(3.011), (I-130)+(1.090)+(3.012), (I-130)+(1.090)+(3.013), (I-130)+(1.090)+(3.014), (I-130)+(1.090)+(3.015), (I-130)+(1.090)+(3.016), (I-130)+(1.090)+(3.017), (I-130)+(1.090)+(3.018), (I-130)+(1.090)+(3.019), (I-130)+(1.090)+(3.020), (I-130)+(1.090)+(3.021), (I-130)+(1.090)+(3.022), (I-130)+(1.090)+(3.023), (I-130)+(1.090)+(3.024), (I-130)+(1.090)+(3.025), (I-130)+(1.090)+(3.026), (I-130)+(1.090)+(3.027), (I-130)+(1.090)+(3.028), (I-130)+(1.090)+(3.029), (I-130)+(1.090)+(3.030), (I-130)+(1.090)+(3.031), (I-130)+(1.090)+(5.001), (I-130)+(1.090)+(5.002), (I-130)+(1.090)+(5.003), (I-130)+(1.090)+(5.004), (I-130)+(1.090)+(5.005), (I-130)+(1.090)+(5.006), (I-130)+(1.090)+(5.007), (I-130)+(1.090)+(5.008), (I-130)+(1.090)+(5.009), (I-130)+(1.090)+(5.010), (I-130)+(1.090)+(5.011), (I-130)+(1.090)+(5.012), (I-130)+(1.090)+(5.013), (I-130)+(1.090)+(5.014), (I-130)+(1.090)+(5.015), (I-130)+(1.090)+(5.016), (I-130)+(1.090)+(5.017), (I-130)+(1.090)+(5.018), (I-130)+(1.090)+(5.019), (I-130)+(1.090)+(5.020), (I-130)+(1.090)+(5.021), (I-130)+(1.090)+(5.022), (I-130)+(1.090)+(5.023), (I-130)+(1.090)+(6.001), (I-130)+(1.090)+(6.002), (I-130)+(1.090)+(6.003), (I-130)+(1.090)+(6.004), (I-130)+(1.090)+(7.001), (I-130)+(1.090)+(7.002), (I-130)+(1.090)+(7.003), (I-130)+(1.090)+(7.004), (I-130)+(1.090)+(7.005), (I-130)+(1.090)+(7.006), (I-130)+(1.090)+(9.001), (I-130)+(1.090)+(9.002), (I-130)+(1.090)+(9.003), (I-130)+(1.090)+(9.004), (I-130)+(1.090)+(9.005), (I-130)+(1.090)+(9.006), (I-130)+(1.090)+(9.007), (I-130)+(1.090)+(9.008), (I-130)+(1.090)+(9.009), (I-130)+(1.090)+(14.001), (I-130)+(1.090)+(14.002), (I-130)+(1.090)+(15.008), (I-130)+(1.090)+(15.011), (I-130)+(1.090)+(15.012), (I-130)+(1.090)+(15.016), (I-130)+(1.090)+(15.025), (I-130)+(1.090)+(15.027), (I-130)+(1.090)+(15.047), (I-130)+(1.090)+(15.063), (I-130)+(1.090)+(15.064), (I-130)+(1.090)+(16.001), (I-130)+(1.090)+(16.002), (I-130)+(1.090)+(16.003), (I-130)+(1.090)+(16.004), (I-130)+(1.090)+(16.005), (I-130)+(1.090)+(16.006), (I-130)+(1.090)+(16.007), (I-130)+(1.090)+(16.008), (I-130)+(1.090)+(17.001), (I-130)+(1.090)+(17.002), (I-130)+(1.090)+(17.003), (I-130)+(1.090)+(17.004), (I-130)+(1.090)+(17.005), (I-130)+(1.090)+(17.006), (I-130)+(1.090)+(17.007), (I-130)+(1.090)+(17.008), (I-130)+(1.090)+(17.009), (I-130)+(1.090)+(17.010), (I-130)+(1.090)+(17.011), (I-130)+(1.090)+(17.012), (I-130)+(1.090)+(18.001), (I-130)+(1.091)+(1.092), (I-130)+(1.091)+(2.001), (I-130)+(1.091)+(2.002), (I-130)+(1.091)+(2.003), (I-130)+(1.091)+(2.004), (I-130)+(1.091)+(2.005), (I-130)+(1.091)+(2.006), (I-130)+(1.091)+(2.007), (I-130)+(1.091)+(2.008), (I-130)+(1.091)+(2.009), (I-130)+(1.091)+(2.010), (I-130)+(1.091)+(2.011), (I-130)+(1.091)+(2.012), (I-130)+(1.091)+(2.013), (I-130)+(1.091)+(2.014), (I-130)+(1.091)+(2.015), (I-130)+(1.091)+(2.016), (I-130)+(1.091)+(2.017), (I-130)+(1.091)+(2.018), (I-130)+(1.091)+(2.019), (I-130)+(1.091)+(2.020), (I-130)+(1.091)+(2.021), (I-130)+(1.091)+(2.022), (I-130)+(1.091)+(2.023), (I-130)+(1.091)+(2.024), (I-130)+(1.091)+(2.025), (I-130)+(1.091)+(2.026), (I-130)+(1.091)+(2.027), (I-130)+(1.091)+(2.028), (I-130)+(1.091)+(2.029), (I-130)+(1.091)+(2.030), (I-130)+(1.091)+(2.031), (I-130)+(1.091)+(2.032), (I-130)+(1.091)+(2.033), (I-130)+(1.091)+(2.034), (I-130)+(1.091)+(2.035), (I-130)+(1.091)+(2.036), (I-130)+(1.091)+(2.037), (I-130)+(1.091)+(2.038), (I-130)+(1.091)+(2.039), (I-130)+(1.091)+(2.040), (I-130)+(1.091)+(2.041), (I-130)+(1.091)+(2.042), (I-130)+(1.091)+(2.043), (I-130)+(1.091)+(2.044), (I-130)+(1.091)+(2.045), (I-130)+(1.091)+(2.046), (I-130)+(1.091)+(2.047), (I-130)+(1.091)+(2.048), (I-130)+(1.091)+(2.049), (I-130)+(1.091)+(2.050), (I-130)+(1.091)+(2.051), (I-130)+(1.091)+(2.052), (I-130)+(1.091)+(2.053), (I-130)+(1.091)+(2.054), (I-130)+(1.091)+(2.055), (I-130)+(1.091)+(2.056), (I-130)+(1.091)+(2.057), (I-130)+(1.091)+(2.058), (I-130)+(1.091)+(2.059), (I-130)+(1.091)+(3.001), (I-130)+(1.091)+(3.002), (I-130)+(1.091)+(3.003), (I-130)+(1.091)+(3.004), (I-130)+(1.091)+(3.005), (I-130)+(1.091)+(3.006), (I-130)+(1.091)+(3.007), (I-130)+(1.091)+(3.008), (I-130)+(1.091)+(3.009), (I-130)+(1.091)+(3.010), (I-130)+(1.091)+(3.011), (I-130)+(1.091)+(3.012), (I-130)+(1.091)+(3.013), (I-130)+(1.091)+(3.014), (I-130)+(1.091)+(3.015), (I-130)+(1.091)+(3.016), (I-130)+(1.091)+(3.017), (I-130)+(1.091)+(3.018), (I-130)+(1.091)+(3.019), (I-130)+(1.091)+(3.020), (I-130)+(1.091)+(3.021), (I-130)+(1.091)+(3.022), (I-130)+(1.091)+(3.023), (I-130)+(1.091)+(3.024), (I-130)+(1.091)+(3.025), (I-130)+(1.091)+(3.026), (I-130)+(1.091)+(3.027), (I-130)+(1.091)+(3.028), (I-130)+(1.091)+(3.029), (I-130)+(1.091)+(3.030), (I-130)+(1.091)+(3.031), (I-130)+(1.091)+(5.001), (I-130)+(1.091)+(5.002), (I-130)+(1.091)+(5.003), (I-130)+(1.091)+(5.004), (I-130)+(1.091)+(5.005), (I-130)+(1.091)+(5.006), (I-130)+(1.091)+(5.007), (I-130)+(1.091)+(5.008), (I-130)+(1.091)+(5.009), (I-130)+(1.091)+(5.010), (I-130)+(1.091)+(5.011), (I-130)+(1.091)+(5.012), (I-130)+(1.091)+(5.013), (I-130)+(1.091)+(5.014), (I-130)+(1.091)+(5.015), (I-130)+(1.091)+(5.016), (I-130)+(1.091)+(5.017), (I-130)+(1.091)+(5.018), (I-130)+(1.091)+(5.019), (I-130)+(1.091)+(5.020), (I-130)+(1.091)+(5.021), (I-130)+(1.091)+(5.022), (I-130)+(1.091)+(5.023), (I-130)+(1.091)+(6.001), (I-130)+(1.091)+(6.002), (I-130)+(1.091)+(6.003), (I-130)+(1.091)+(6.004), (I-130)+(1.091)+(7.001), (I-130)+(1.091)+(7.002), (I-130)+(1.091)+(7.003), (I-130)+(1.091)+(7.004), (I-130)+(1.091)+(7.005), (I-130)+(1.091)+(7.006), (I-130)+(1.091)+(9.001), (I-130)+(1.091)+(9.002), (I-130)+(1.091)+(9.003), (I-130)+(1.091)+(9.004), (I-130)+(1.091)+(9.005), (I-130)+(1.091)+(9.006), (I-130)+(1.091)+(9.007), (I-130)+(1.091)+(9.008), (I-130)+(1.091)+(9.009), (I-130)+(1.091)+(14.001), (I-130)+(1.091)+(14.002), (I-130)+(1.091)+(15.008), (I-130)+(1.091)+(15.011), (I-130)+(1.091)+(15.012), (I-130)+(1.091)+(15.016), (I-130)+(1.091)+(15.025), (I-130)+(1.091)+(15.027), (I-130)+(1.091)+(15.047), (I-130)+(1.091)+(15.063), (I-130)+(1.091)+(15.064), (I-130)+(1.091)+(16.001), (I-130)+(1.091)+(16.002), (I-130)+(1.091)+(16.003), (I-130)+(1.091)+(16.004), (I-130)+(1.091)+(16.005), (I-130)+(1.091)+(16.006), (I-130)+(1.091)+(16.007), (I-130)+(1.091)+(16.008), (I-130)+(1.091)+(17.001), (I-130)+(1.091)+(17.002), (I-130)+(1.091)+(17.003), (I-130)+(1.091)+(17.004), (I-130)+(1.091)+(17.005), (I-130)+(1.091)+(17.006), (I-130)+(1.091)+(17.007), (I-130)+(1.091)+(17.008), (I-130)+(1.091)+(17.009), (I-130)+(1.091)+(17.010), (I-130)+(1.091)+(17.011), (I-130)+(1.091)+(17.012), (I-130)+(1.091)+(18.001), (I-130)+(1.092)+(2.001), (I-130)+(1.092)+(2.002), (I-130)+(1.092)+(2.003), (I-130)+(1.092)+(2.004), (I-130)+(1.092)+(2.005), (I-130)+(1.092)+(2.006), (I-130)+(1.092)+(2.007), (I-130)+(1.092)+(2.008), (I-130)+(1.092)+(2.009), (I-130)+(1.092)+(2.010), (I-130)+(1.092)+(2.011), (I-130)+(1.092)+(2.012), (I-130)+(1.092)+(2.013), (I-130)+(1.092)+(2.014), (I-130)+(1.092)+(2.015), (I-130)+(1.092)+(2.016), (I-130)+(1.092)+(2.017), (I-130)+(1.092)+(2.018), (I-130)+(1.092)+(2.019), (I-130)+(1.092)+(2.020), (I-130)+(1.092)+(2.021), (I-130)+(1.092)+(2.022), (I-130)+(1.092)+(2.023), (I-130)+(1.092)+(2.024), (I-130)+(1.092)+(2.025), (I-130)+(1.092)+(2.026), (I-130)+(1.092)+(2.027), (I-130)+(1.092)+(2.028), (I-130)+(1.092)+(2.029), (I-130)+(1.092)+(2.030), (I-130)+(1.092)+(2.031), (I-130)+(1.092)+(2.032), (I-130)+(1.092)+(2.033), (I-130)+(1.092)+(2.034), (I-130)+(1.092)+(2.035), (I-130)+(1.092)+(2.036), (I-130)+(1.092)+(2.037), (I-130)+(1.092)+(2.038), (I-130)+(1.092)+(2.039), (I-130)+(1.092)+(2.040), (I-130)+(1.092)+(2.041), (I-130)+(1.092)+(2.042), (I-130)+(1.092)+(2.043), (I-130)+(1.092)+(2.044), (I-130)+(1.092)+(2.045), (I-130)+(1.092)+(2.046), (I-130)+(1.092)+(2.047), (I-130)+(1.092)+(2.048), (I-130)+(1.092)+(2.049), (I-130)+(1.092)+(2.050), (I-130)+(1.092)+(2.051), (I-130)+(1.092)+(2.052), (I-130)+(1.092)+(2.053), (I-130)+(1.092)+(2.054), (I-130)+(1.092)+(2.055), (I-130)+(1.092)+(2.056), (I-130)+(1.092)+(2.057), (I-130)+(1.092)+(2.058), (I-130)+(1.092)+(2.059), (I-130)+(1.092)+(3.001), (I-130)+(1.092)+(3.002), (I-130)+(1.092)+(3.003), (I-130)+(1.092)+(3.004), (I-130)+(1.092)+(3.005), (I-130)+(1.092)+(3.006), (I-130)+(1.092)+(3.007), (I-130)+(1.092)+(3.008), (I-130)+(1.092)+(3.009), (I-130)+(1.092)+(3.010), (I-130)+(1.092)+(3.011), (I-130)+(1.092)+(3.012), (I-130)+(1.092)+(3.013), (I-130)+(1.092)+(3.014), (I-130)+(1.092)+(3.015), (I-130)+(1.092)+(3.016), (I-130)+(1.092)+(3.017), (I-130)+(1.092)+(3.018), (I-130)+(1.092)+(3.019), (I-130)+(1.092)+(3.020), (I-130)+(1.092)+(3.021), (I-130)+(1.092)+(3.022), (I-130)+(1.092)+(3.023), (I-130)+(1.092)+(3.024), (I-130)+(1.092)+(3.025), (I-130)+(1.092)+(3.026), (I-130)+(1.092)+(3.027), (I-130)+(1.092)+(3.028), (I-130)+(1.092)+(3.029), (I-130)+(1.092)+(3.030), (I-130)+(1.092)+(3.031), (I-130)+(1.092)+(5.001), (I-130)+(1.092)+(5.002), (I-130)+(1.092)+(5.003), (I-130)+(1.092)+(5.004), (I-130)+(1.092)+(5.005), (I-130)+(1.092)+(5.006), (I-130)+(1.092)+(5.007), (I-130)+(1.092)+(5.008), (I-130)+(1.092)+(5.009), (I-130)+(1.092)+(5.010), (I-130)+(1.092)+(5.011), (I-130)+(1.092)+(5.012), (I-130)+(1.092)+(5.013), (I-130)+(1.092)+(5.014), (I-130)+(1.092)+(5.015), (I-130)+(1.092)+(5.016), (I-130)+(1.092)+(5.017), (I-130)+(1.092)+(5.018), (I-130)+(1.092)+(5.019), (I-130)+(1.092)+(5.020), (I-130)+(1.092)+(5.021), (I-130)+(1.092)+(5.022), (I-130)+(1.092)+(5.023), (I-130)+(1.092)+(6.001), (I-130)+(1.092)+(6.002), (I-130)+(1.092)+(6.003), (I-130)+(1.092)+(6.004), (I-130)+(1.092)+(7.001), (I-130)+(1.092)+(7.002), (I-130)+(1.092)+(7.003), (I-130)+(1.092)+(7.004), (I-130)+(1.092)+(7.005), (I-130)+(1.092)+(7.006), (I-130)+(1.092)+(9.001), (I-130)+(1.092)+(9.002), (I-130)+(1.092)+(9.003), (I-130)+(1.092)+(9.004), (I-130)+(1.092)+(9.005), (I-130)+(1.092)+(9.006), (I-130)+(1.092)+(9.007), (I-130)+(1.092)+(9.008), (I-130)+(1.092)+(9.009), (I-130)+(1.092)+(14.001), (I-130)+(1.092)+(14.002), (I-130)+(1.092)+(15.008), (I-130)+(1.092)+(15.011), (I-130)+(1.092)+(15.012), (I-130)+(1.092)+(15.016), (I-130)+(1.092)+(15.025), (I-130)+(1.092)+(15.027), (I-130)+(1.092)+(15.047), (I-130)+(1.092)+(15.063), (I-130)+(1.092)+(15.064), (I-130)+(1.092)+(16.001), (I-130)+(1.092)+(16.002), (I-130)+(1.092)+(16.003), (I-130)+(1.092)+(16.004), (I-130)+(1.092)+(16.005), (I-130)+(1.092)+(16.006), (I-130)+(1.092)+(16.007), (I-130)+(1.092)+(16.008), (I-130)+(1.092)+(17.001), (I-130)+(1.092)+(17.002), (I-130)+(1.092)+(17.003), (I-130)+(1.092)+(17.004), (I-130)+(1.092)+(17.005), (I-130)+(1.092)+(17.006), (I-130)+(1.092)+(17.007), (I-130)+(1.092)+(17.008), (I-130)+(1.092)+(17.009), (I-130)+(1.092)+(17.010), (I-130)+(1.092)+(17.011), (I-130)+(1.092)+(17.012), (I-130)+(1.092)+(18.001), (I-130)+(2.001)+(3.001), (I-130)+(2.001)+(3.002), (I-130)+(2.001)+(3.003), (I-130)+(2.001)+(3.004), (I-130)+(2.001)+(3.005), (I-130)+(2.001)+(3.006), (I-130)+(2.001)+(3.007), (I-130)+(2.001)+(3.008), (I-130)+(2.001)+(3.009), (I-130)+(2.001)+(3.010), (I-130)+(2.001)+(3.011), (I-130)+(2.001)+(3.012), (I-130)+(2.001)+(3.013), (I-130)+(2.001)+(3.014), (I-130)+(2.001)+(3.015), (I-130)+(2.001)+(3.016), (I-130)+(2.001)+(3.017), (I-130)+(2.001)+(3.018), (I-130)+(2.001)+(3.019), (I-130)+(2.001)+(3.020), (I-130)+(2.001)+(3.021), (I-130)+(2.001)+(3.022), (I-130)+(2.001)+(3.023), (I-130)+(2.001)+(3.024), (I-130)+(2.001)+(3.025), (I-130)+(2.001)+(3.026), (I-130)+(2.001)+(3.027), (I-130)+(2.001)+(3.028), (I-130)+(2.001)+(3.029), (I-130)+(2.001)+(3.030), (I-130)+(2.001)+(3.031), (I-130)+(2.001)+(5.001), (I-130)+(2.001)+(5.002), (I-130)+(2.001)+(5.003), (I-130)+(2.001)+(5.004), (I-130)+(2.001)+(5.005), (I-130)+(2.001)+(5.006), (I-130)+(2.001)+(5.007), (I-130)+(2.001)+(5.008), (I-130)+(2.001)+(5.009), (I-130)+(2.001)+(5.010), (I-130)+(2.001)+(5.011), (I-130)+(2.001)+(5.012), (I-130)+(2.001)+(5.013), (I-130)+(2.001)+(5.014), (I-130)+(2.001)+(5.015), (I-130)+(2.001)+(5.016), (I-130)+(2.001)+(5.017), (I-130)+(2.001)+(5.018), (I-130)+(2.001)+(5.019), (I-130)+(2.001)+(5.020), (I-130)+(2.001)+(5.021), (I-130)+(2.001)+(5.022), (I-130)+(2.001)+(5.023), (I-130)+(2.001)+(6.001), (I-130)+(2.001)+(6.002), (I-130)+(2.001)+(6.003), (I-130)+(2.001)+(6.004), (I-130)+(2.001)+(7.001), (I-130)+(2.001)+(7.002), (I-130)+(2.001)+(7.003), (I-130)+(2.001)+(7.004), (I-130)+(2.001)+(7.005), (I-130)+(2.001)+(7.006), (I-130)+(2.001)+(9.001), (I-130)+(2.001)+(9.002), (I-130)+(2.001)+(9.003), (I-130)+(2.001)+(9.004), (I-130)+(2.001)+(9.005), (I-130)+(2.001)+(9.006), (I-130)+(2.001)+(9.007), (I-130)+(2.001)+(9.008), (I-130)+(2.001)+(9.009), (I-130)+(2.001)+(14.001), (I-130)+(2.001)+(14.002), (I-130)+(2.001)+(15.008), (I-130)+(2.001)+(15.011), (I-130)+(2.001)+(15.012), (I-130)+(2.001)+(15.016), (I-130)+(2.001)+(15.025), (I-130)+(2.001)+(15.027), (I-130)+(2.001)+(15.047), (I-130)+(2.001)+(15.063), (I-130)+(2.001)+(15.064), (I-130)+(2.001)+(16.001), (I-130)+(2.001)+(16.002), (I-130)+(2.001)+(16.003), (I-130)+(2.001)+(16.004), (I-130)+(2.001)+(16.005), (I-130)+(2.001)+(16.006), (I-130)+(2.001)+(16.007), (I-130)+(2.001)+(16.008), (I-130)+(2.001)+(17.001), (I-130)+(2.001)+(17.002), (I-130)+(2.001)+(17.003), (I-130)+(2.001)+(17.004), (I-130)+(2.001)+(17.005), (I-130)+(2.001)+(17.006), (I-130)+(2.001)+(17.007), (I-130)+(2.001)+(17.008), (I-130)+(2.001)+(17.009), (I-130)+(2.001)+(17.010), (I-130)+(2.001)+(17.011), (I-130)+(2.001)+(17.012), (I-130)+(2.001)+(18.001), (I-130)+(2.002)+(3.001), (I-130)+(2.002)+(3.002), (I-130)+(2.002)+(3.003), (I-130)+(2.002)+(3.004), (I-130)+(2.002)+(3.005), (I-130)+(2.002)+(3.006), (I-130)+(2.002)+(3.007), (I-130)+(2.002)+(3.008), (I-130)+(2.002)+(3.009), (I-130)+(2.002)+(3.010), (I-130)+(2.002)+(3.011), (I-130)+(2.002)+(3.012), (I-130)+(2.002)+(3.013), (I-130)+(2.002)+(3.014), (I-130)+(2.002)+(3.015), (I-130)+(2.002)+(3.016), (I-130)+(2.002)+(3.017), (I-130)+(2.002)+(3.018), (I-130)+(2.002)+(3.019), (I-130)+(2.002)+(3.020), (I-130)+(2.002)+(3.021), (I-130)+(2.002)+(3.022), (I-130)+(2.002)+(3.023), (I-130)+(2.002)+(3.024), (I-130)+(2.002)+(3.025), (I-130)+(2.002)+(3.026), (I-130)+(2.002)+(3.027), (I-130)+(2.002)+(3.028), (I-130)+(2.002)+(3.029), (I-130)+(2.002)+(3.030), (I-130)+(2.002)+(3.031), (I-130)+(2.002)+(5.001), (I-130)+(2.002)+(5.002), (I-130)+(2.002)+(5.003), (I-130)+(2.002)+(5.004), (I-130)+(2.002)+(5.005), (I-130)+(2.002)+(5.006), (I-130)+(2.002)+(5.007), (I-130)+(2.002)+(5.008), (I-130)+(2.002)+(5.009), (I-130)+(2.002)+(5.010), (I-130)+(2.002)+(5.011), (I-130)+(2.002)+(5.012), (I-130)+(2.002)+(5.013), (I-130)+(2.002)+(5.014), (I-130)+(2.002)+(5.015), (I-130)+(2.002)+(5.016), (I-130)+(2.002)+(5.017), (I-130)+(2.002)+(5.018), (I-130)+(2.002)+(5.019), (I-130)+(2.002)+(5.020), (I-130)+(2.002)+(5.021), (I-130)+(2.002)+(5.022), (I-130)+(2.002)+(5.023), (I-130)+(2.002)+(6.001), (I-130)+(2.002)+(6.002), (I-130)+(2.002)+(6.003), (I-130)+(2.002)+(6.004), (I-130)+(2.002)+(7.001), (I-130)+(2.002)+(7.002), (I-130)+(2.002)+(7.003), (I-130)+(2.002)+(7.004), (I-130)+(2.002)+(7.005), (I-130)+(2.002)+(7.006), (I-130)+(2.002)+(9.001), (I-130)+(2.002)+(9.002), (I-130)+(2.002)+(9.003), (I-130)+(2.002)+(9.004), (I-130)+(2.002)+(9.005), (I-130)+(2.002)+(9.006), (I-130)+(2.002)+(9.007), (I-130)+(2.002)+(9.008), (I-130)+(2.002)+(9.009), (I-130)+(2.002)+(14.001), (I-130)+(2.002)+(14.002), (I-130)+(2.002)+(15.008), (I-130)+(2.002)+(15.011), (I-130)+(2.002)+(15.012), (I-130)+(2.002)+(15.016), (I-130)+(2.002)+(15.025), (I-130)+(2.002)+(15.027), (I-130)+(2.002)+(15.047), (I-130)+(2.002)+(15.063), (I-130)+(2.002)+(15.064), (I-130)+(2.002)+(16.001), (I-130)+(2.002)+(16.002), (I-130)+(2.002)+(16.003), (I-130)+(2.002)+(16.004), (I-130)+(2.002)+(16.005), (I-130)+(2.002)+(16.006), (I-130)+(2.002)+(16.007), (I-130)+(2.002)+(16.008), (I-130)+(2.002)+(17.001), (I-130)+(2.002)+(17.002), (I-130)+(2.002)+(17.003), (I-130)+(2.002)+(17.004), (I-130)+(2.002)+(17.005), (I-130)+(2.002)+(17.006), (I-130)+(2.002)+(17.007), (I-130)+(2.002)+(17.008), (I-130)+(2.002)+(17.009), (I-130)+(2.002)+(17.010), (I-130)+(2.002)+(17.011), (I-130)+(2.002)+(17.012), (I-130)+(2.002)+(18.001), (I-130)+(2.003)+(3.001), (I-130)+(2.003)+(3.002), (I-130)+(2.003)+(3.003), (I-130)+(2.003)+(3.004), (I-130)+(2.003)+(3.005), (I-130)+(2.003)+(3.006), (I-130)+(2.003)+(3.007), (I-130)+(2.003)+(3.008), (I-130)+(2.003)+(3.009), (I-130)+(2.003)+(3.010), (I-130)+(2.003)+(3.011), (I-130)+(2.003)+(3.012), (I-130)+(2.003)+(3.013), (I-130)+(2.003)+(3.014), (I-130)+(2.003)+(3.015), (I-130)+(2.003)+(3.016), (I-130)+(2.003)+(3.017), (I-130)+(2.003)+(3.018), (I-130)+(2.003)+(3.019), (I-130)+(2.003)+(3.020), (I-130)+(2.003)+(3.021), (I-130)+(2.003)+(3.022), (I-130)+(2.003)+(3.023), (I-130)+(2.003)+(3.024), (I-130)+(2.003)+(3.025), (I-130)+(2.003)+(3.026), (I-130)+(2.003)+(3.027), (I-130)+(2.003)+(3.028), (I-130)+(2.003)+(3.029), (I-130)+(2.003)+(3.030), (I-130)+(2.003)+(3.031), (I-130)+(2.003)+(5.001), (I-130)+(2.003)+(5.002), (I-130)+(2.003)+(5.003), (I-130)+(2.003)+(5.004), (I-130)+(2.003)+(5.005), (I-130)+(2.003)+(5.006), (I-130)+(2.003)+(5.007), (I-130)+(2.003)+(5.008), (I-130)+(2.003)+(5.009), (I-130)+(2.003)+(5.010), (I-130)+(2.003)+(5.011), (I-130)+(2.003)+(5.012), (I-130)+(2.003)+(5.013), (I-130)+(2.003)+(5.014), (I-130)+(2.003)+(5.015), (I-130)+(2.003)+(5.016), (I-130)+(2.003)+(5.017), (I-130)+(2.003)+(5.018), (I-130)+(2.003)+(5.019), (I-130)+(2.003)+(5.020), (I-130)+(2.003)+(5.021), (I-130)+(2.003)+(5.022), (I-130)+(2.003)+(5.023), (I-130)+(2.003)+(6.001), (I-130)+(2.003)+(6.002), (I-130)+(2.003)+(6.003), (I-130)+(2.003)+(6.004), (I-130)+(2.003)+(7.001), (I-130)+(2.003)+(7.002), (I-130)+(2.003)+(7.003), (I-130)+(2.003)+(7.004), (I-130)+(2.003)+(7.005), (I-130)+(2.003)+(7.006), (I-130)+(2.003)+(9.001), (I-130)+(2.003)+(9.002), (I-130)+(2.003)+(9.003), (I-130)+(2.003)+(9.004), (I-130)+(2.003)+(9.005), (I-130)+(2.003)+(9.006), (I-130)+(2.003)+(9.007), (I-130)+(2.003)+(9.008), (I-130)+(2.003)+(9.009), (I-130)+(2.003)+(14.001), (I-130)+(2.003)+(14.002), (I-130)+(2.003)+(15.008), (I-130)+(2.003)+(15.011), (I-130)+(2.003)+(15.012), (I-130)+(2.003)+(15.016), (I-130)+(2.003)+(15.025), (I-130)+(2.003)+(15.027), (I-130)+(2.003)+(15.047), (I-130)+(2.003)+(15.063), (I-130)+(2.003)+(15.064), (I-130)+(2.003)+(16.001), (I-130)+(2.003)+(16.002), (I-130)+(2.003)+(16.003), (I-130)+(2.003)+(16.004), (I-130)+(2.003)+(16.005), (I-130)+(2.003)+(16.006), (I-130)+(2.003)+(16.007), (I-130)+(2.003)+(16.008), (I-130)+(2.003)+(17.001), (I-130)+(2.003)+(17.002), (I-130)+(2.003)+(17.003), (I-130)+(2.003)+(17.004), (I-130)+(2.003)+(17.005), (I-130)+(2.003)+(17.006), (I-130)+(2.003)+(17.007), (I-130)+(2.003)+(17.008), (I-130)+(2.003)+(17.009), (I-130)+(2.003)+(17.010), (I-130)+(2.003)+(17.011), (I-130)+(2.003)+(17.012), (I-130)+(2.003)+(18.001), (I-130)+(2.004)+(3.001), (I-130)+(2.004)+(3.002), (I-130)+(2.004)+(3.003), (I-130)+(2.004)+(3.004), (I-130)+(2.004)+(3.005), (I-130)+(2.004)+(3.006), (I-130)+(2.004)+(3.007), (I-130)+(2.004)+(3.008), (I-130)+(2.004)+(3.009), (I-130)+(2.004)+(3.010), (I-130)+(2.004)+(3.011), (I-130)+(2.004)+(3.012), (I-130)+(2.004)+(3.013), (I-130)+(2.004)+(3.014), (I-130)+(2.004)+(3.015), (I-130)+(2.004)+(3.016), (I-130)+(2.004)+(3.017), (I-130)+(2.004)+(3.018), (I-130)+(2.004)+(3.019), (I-130)+(2.004)+(3.020), (I-130)+(2.004)+(3.021), (I-130)+(2.004)+(3.022), (I-130)+(2.004)+(3.023), (I-130)+(2.004)+(3.024), (I-130)+(2.004)+(3.025), (I-130)+(2.004)+(3.026), (I-130)+(2.004)+(3.027), (I-130)+(2.004)+(3.028), (I-130)+(2.004)+(3.029), (I-130)+(2.004)+(3.030), (I-130)+(2.004)+(3.031), (I-130)+(2.004)+(5.001), (I-130)+(2.004)+(5.002), (I-130)+(2.004)+(5.003), (I-130)+(2.004)+(5.004), (I-130)+(2.004)+(5.005), (I-130)+(2.004)+(5.006), (I-130)+(2.004)+(5.007), (I-130)+(2.004)+(5.008), (I-130)+(2.004)+(5.009), (I-130)+(2.004)+(5.010), (I-130)+(2.004)+(5.011), (I-130)+(2.004)+(5.012), (I-130)+(2.004)+(5.013), (I-130)+(2.004)+(5.014), (I-130)+(2.004)+(5.015), (I-130)+(2.004)+(5.016), (I-130)+(2.004)+(5.017), (I-130)+(2.004)+(5.018), (I-130)+(2.004)+(5.019), (I-130)+(2.004)+(5.020), (I-130)+(2.004)+(5.021), (I-130)+(2.004)+(5.022), (I-130)+(2.004)+(5.023), (I-130)+(2.004)+(6.001), (I-130)+(2.004)+(6.002), (I-130)+(2.004)+(6.003), (I-130)+(2.004)+(6.004), (I-130)+(2.004)+(7.001), (I-130)+(2.004)+(7.002), (I-130)+(2.004)+(7.003), (I-130)+(2.004)+(7.004), (I-130)+(2.004)+(7.005), (I-130)+(2.004)+(7.006), (I-130)+(2.004)+(9.001), (I-130)+(2.004)+(9.002), (I-130)+(2.004)+(9.003), (I-130)+(2.004)+(9.004), (I-130)+(2.004)+(9.005), (I-130)+(2.004)+(9.006), (I-130)+(2.004)+(9.007), (I-130)+(2.004)+(9.008), (I-130)+(2.004)+(9.009), (I-130)+(2.004)+(14.001), (I-130)+(2.004)+(14.002), (I-130)+(2.004)+(15.008), (I-130)+(2.004)+(15.011), (I-130)+(2.004)+(15.012), (I-130)+(2.004)+(15.016), (I-130)+(2.004)+(15.025), (I-130)+(2.004)+(15.027), (I-130)+(2.004)+(15.047), (I-130)+(2.004)+(15.063), (I-130)+(2.004)+(15.064), (I-130)+(2.004)+(16.001), (I-130)+(2.004)+(16.002), (I-130)+(2.004)+(16.003), (I-130)+(2.004)+(16.004), (I-130)+(2.004)+(16.005), (I-130)+(2.004)+(16.006), (I-130)+(2.004)+(16.007), (I-130)+(2.004)+(16.008), (I-130)+(2.004)+(17.001), (I-130)+(2.004)+(17.002), (I-130)+(2.004)+(17.003), (I-130)+(2.004)+(17.004), (I-130)+(2.004)+(17.005), (I-130)+(2.004)+(17.006), (I-130)+(2.004)+(17.007), (I-130)+(2.004)+(17.008), (I-130)+(2.004)+(17.009), (I-130)+(2.004)+(17.010), (I-130)+(2.004)+(17.011), (I-130)+(2.004)+(17.012), (I-130)+(2.004)+(18.001), (I-130)+(2.005)+(3.001), (I-130)+(2.005)+(3.002), (I-130)+(2.005)+(3.003), (I-130)+(2.005)+(3.004), (I-130)+(2.005)+(3.005), (I-130)+(2.005)+(3.006), (I-130)+(2.005)+(3.007), (I-130)+(2.005)+(3.008), (I-130)+(2.005)+(3.009), (I-130)+(2.005)+(3.010), (I-130)+(2.005)+(3.011), (I-130)+(2.005)+(3.012), (I-130)+(2.005)+(3.013), (I-130)+(2.005)+(3.014), (I-130)+(2.005)+(3.015), (I-130)+(2.005)+(3.016), (I-130)+(2.005)+(3.017), (I-130)+(2.005)+(3.018), (I-130)+(2.005)+(3.019), (I-130)+(2.005)+(3.020), (I-130)+(2.005)+(3.021), (I-130)+(2.005)+(3.022), (I-130)+(2.005)+(3.023), (I-130)+(2.005)+(3.024), (I-130)+(2.005)+(3.025), (I-130)+(2.005)+(3.026), (I-130)+(2.005)+(3.027), (I-130)+(2.005)+(3.028), (I-130)+(2.005)+(3.029), (I-130)+(2.005)+(3.030), (I-130)+(2.005)+(3.031), (I-130)+(2.005)+(5.001), (I-130)+(2.005)+(5.002), (I-130)+(2.005)+(5.003), (I-130)+(2.005)+(5.004), (I-130)+(2.005)+(5.005), (I-130)+(2.005)+(5.006), (I-130)+(2.005)+(5.007), (I-130)+(2.005)+(5.008), (I-130)+(2.005)+(5.009), (I-130)+(2.005)+(5.010), (I-130)+(2.005)+(5.011), (I-130)+(2.005)+(5.012), (I-130)+(2.005)+(5.013), (I-130)+(2.005)+(5.014), (I-130)+(2.005)+(5.015), (I-130)+(2.005)+(5.016), (I-130)+(2.005)+(5.017), (I-130)+(2.005)+(5.018), (I-130)+(2.005)+(5.019), (I-130)+(2.005)+(5.020), (I-130)+(2.005)+(5.021), (I-130)+(2.005)+(5.022), (I-130)+(2.005)+(5.023), (I-130)+(2.005)+(6.001), (I-130)+(2.005)+(6.002), (I-130)+(2.005)+(6.003), (I-130)+(2.005)+(6.004), (I-130)+(2.005)+(7.001), (I-130)+(2.005)+(7.002), (I-130)+(2.005)+(7.003), (I-130)+(2.005)+(7.004), (I-130)+(2.005)+(7.005), (I-130)+(2.005)+(7.006), (I-130)+(2.005)+(9.001), (I-130)+(2.005)+(9.002), (I-130)+(2.005)+(9.003), (I-130)+(2.005)+(9.004), (I-130)+(2.005)+(9.005), (I-130)+(2.005)+(9.006), (I-130)+(2.005)+(9.007), (I-130)+(2.005)+(9.008), (I-130)+(2.005)+(9.009), (I-130)+(2.005)+(14.001), (I-130)+(2.005)+(14.002), (I-130)+(2.005)+(15.008), (I-130)+(2.005)+(15.011), (I-130)+(2.005)+(15.012), (I-130)+(2.005)+(15.016), (I-130)+(2.005)+(15.025), (I-130)+(2.005)+(15.027), (I-130)+(2.005)+(15.047), (I-130)+(2.005)+(15.063), (I-130)+(2.005)+(15.064), (I-130)+(2.005)+(16.001), (I-130)+(2.005)+(16.002), (I-130)+(2.005)+(16.003), (I-130)+(2.005)+(16.004), (I-130)+(2.005)+(16.005), (I-130)+(2.005)+(16.006), (I-130)+(2.005)+(16.007), (I-130)+(2.005)+(16.008), (I-130)+(2.005)+(17.001), (I-130)+(2.005)+(17.002), (I-130)+(2.005)+(17.003), (I-130)+(2.005)+(17.004), (I-130)+(2.005)+(17.005), (I-130)+(2.005)+(17.006), (I-130)+(2.005)+(17.007), (I-130)+(2.005)+(17.008), (I-130)+(2.005)+(17.009), (I-130)+(2.005)+(17.010), (I-130)+(2.005)+(17.011), (I-130)+(2.005)+(17.012), (I-130)+(2.005)+(18.001), (I-130)+(2.006)+(3.001), (I-130)+(2.006)+(3.002), (I-130)+(2.006)+(3.003), (I-130)+(2.006)+(3.004), (I-130)+(2.006)+(3.005), (I-130)+(2.006)+(3.006), (I-130)+(2.006)+(3.007), (I-130)+(2.006)+(3.008), (I-130)+(2.006)+(3.009), (I-130)+(2.006)+(3.010), (I-130)+(2.006)+(3.011), (I-130)+(2.006)+(3.012), (I-130)+(2.006)+(3.013), (I-130)+(2.006)+(3.014), (I-130)+(2.006)+(3.015), (I-130)+(2.006)+(3.016), (I-130)+(2.006)+(3.017), (I-130)+(2.006)+(3.018), (I-130)+(2.006)+(3.019), (I-130)+(2.006)+(3.020), (I-130)+(2.006)+(3.021), (I-130)+(2.006)+(3.022), (I-130)+(2.006)+(3.023), (I-130)+(2.006)+(3.024), (I-130)+(2.006)+(3.025), (I-130)+(2.006)+(3.026), (I-130)+(2.006)+(3.027), (I-130)+(2.006)+(3.028), (I-130)+(2.006)+(3.029), (I-130)+(2.006)+(3.030), (I-130)+(2.006)+(3.031), (I-130)+(2.006)+(5.001), (I-130)+(2.006)+(5.002), (I-130)+(2.006)+(5.003), (I-130)+(2.006)+(5.004), (I-130)+(2.006)+(5.005), (I-130)+(2.006)+(5.006), (I-130)+(2.006)+(5.007), (I-130)+(2.006)+(5.008), (I-130)+(2.006)+(5.009), (I-130)+(2.006)+(5.010), (I-130)+(2.006)+(5.011), (I-130)+(2.006)+(5.012), (I-130)+(2.006)+(5.013), (I-130)+(2.006)+(5.014), (I-130)+(2.006)+(5.015), (I-130)+(2.006)+(5.016), (I-130)+(2.006)+(5.017), (I-130)+(2.006)+(5.018), (I-130)+(2.006)+(5.019), (I-130)+(2.006)+(5.020), (I-130)+(2.006)+(5.021), (I-130)+(2.006)+(5.022), (I-130)+(2.006)+(5.023), (I-130)+(2.006)+(6.001), (I-130)+(2.006)+(6.002), (I-130)+(2.006)+(6.003), (I-130)+(2.006)+(6.004), (I-130)+(2.006)+(7.001), (I-130)+(2.006)+(7.002), (I-130)+(2.006)+(7.003), (I-130)+(2.006)+(7.004), (I-130)+(2.006)+(7.005), (I-130)+(2.006)+(7.006), (I-130)+(2.006)+(9.001), (I-130)+(2.006)+(9.002), (I-130)+(2.006)+(9.003), (I-130)+(2.006)+(9.004), (I-130)+(2.006)+(9.005), (I-130)+(2.006)+(9.006), (I-130)+(2.006)+(9.007), (I-130)+(2.006)+(9.008), (I-130)+(2.006)+(9.009), (I-130)+(2.006)+(14.001), (I-130)+(2.006)+(14.002), (I-130)+(2.006)+(15.008), (I-130)+(2.006)+(15.011), (I-130)+(2.006)+(15.012), (I-130)+(2.006)+(15.016), (I-130)+(2.006)+(15.025), (I-130)+(2.006)+(15.027), (I-130)+(2.006)+(15.047), (I-130)+(2.006)+(15.063), (I-130)+(2.006)+(15.064), (I-130)+(2.006)+(16.001), (I-130)+(2.006)+(16.002), (I-130)+(2.006)+(16.003), (I-130)+(2.006)+(16.004), (I-130)+(2.006)+(16.005), (I-130)+(2.006)+(16.006), (I-130)+(2.006)+(16.007), (I-130)+(2.006)+(16.008), (I-130)+(2.006)+(17.001), (I-130)+(2.006)+(17.002), (I-130)+(2.006)+(17.003), (I-130)+(2.006)+(17.004), (I-130)+(2.006)+(17.005), (I-130)+(2.006)+(17.006), (I-130)+(2.006)+(17.007), (I-130)+(2.006)+(17.008), (I-130)+(2.006)+(17.009), (I-130)+(2.006)+(17.010), (I-130)+(2.006)+(17.011), (I-130)+(2.006)+(17.012), (I-130)+(2.006)+(18.001), (I-130)+(2.007)+(3.001), (I-130)+(2.007)+(3.002), (I-130)+(2.007)+(3.003), (I-130)+(2.007)+(3.004), (I-130)+(2.007)+(3.005), (I-130)+(2.007)+(3.006), (I-130)+(2.007)+(3.007), (I-130)+(2.007)+(3.008), (I-130)+(2.007)+(3.009), (I-130)+(2.007)+(3.010), (I-130)+(2.007)+(3.011), (I-130)+(2.007)+(3.012), (I-130)+(2.007)+(3.013), (I-130)+(2.007)+(3.014), (I-130)+(2.007)+(3.015), (I-130)+(2.007)+(3.016), (I-130)+(2.007)+(3.017), (I-130)+(2.007)+(3.018), (I-130)+(2.007)+(3.019), (I-130)+(2.007)+(3.020), (I-130)+(2.007)+(3.021), (I-130)+(2.007)+(3.022), (I-130)+(2.007)+(3.023), (I-130)+(2.007)+(3.024), (I-130)+(2.007)+(3.025), (I-130)+(2.007)+(3.026), (I-130)+(2.007)+(3.027), (I-130)+(2.007)+(3.028), (I-130)+(2.007)+(3.029), (I-130)+(2.007)+(3.030), (I-130)+(2.007)+(3.031), (I-130)+(2.007)+(5.001), (I-130)+(2.007)+(5.002), (I-130)+(2.007)+(5.003), (I-130)+(2.007)+(5.004), (I-130)+(2.007)+(5.005), (I-130)+(2.007)+(5.006), (I-130)+(2.007)+(5.007), (I-130)+(2.007)+(5.008), (I-130)+(2.007)+(5.009), (I-130)+(2.007)+(5.010), (I-130)+(2.007)+(5.011), (I-130)+(2.007)+(5.012), (I-130)+(2.007)+(5.013), (I-130)+(2.007)+(5.014), (I-130)+(2.007)+(5.015), (I-130)+(2.007)+(5.016), (I-130)+(2.007)+(5.017), (I-130)+(2.007)+(5.018), (I-130)+(2.007)+(5.019), (I-130)+(2.007)+(5.020), (I-130)+(2.007)+(5.021), (I-130)+(2.007)+(5.022), (I-130)+(2.007)+(5.023), (I-130)+(2.007)+(6.001), (I-130)+(2.007)+(6.002), (I-130)+(2.007)+(6.003), (I-130)+(2.007)+(6.004), (I-130)+(2.007)+(7.001), (I-130)+(2.007)+(7.002), (I-130)+(2.007)+(7.003), (I-130)+(2.007)+(7.004), (I-130)+(2.007)+(7.005), (I-130)+(2.007)+(7.006), (I-130)+(2.007)+(9.001), (I-130)+(2.007)+(9.002), (I-130)+(2.007)+(9.003), (I-130)+(2.007)+(9.004), (I-130)+(2.007)+(9.005), (I-130)+(2.007)+(9.006), (I-130)+(2.007)+(9.007), (I-130)+(2.007)+(9.008), (I-130)+(2.007)+(9.009), (I-130)+(2.007)+(14.001), (I-130)+(2.007)+(14.002), (I-130)+(2.007)+(15.008), (I-130)+(2.007)+(15.011), (I-130)+(2.007)+(15.012), (I-130)+(2.007)+(15.016), (I-130)+(2.007)+(15.025), (I-130)+(2.007)+(15.027), (I-130)+(2.007)+(15.047), (I-130)+(2.007)+(15.063), (I-130)+(2.007)+(15.064), (I-130)+(2.007)+(16.001), (I-130)+(2.007)+(16.002), (I-130)+(2.007)+(16.003), (I-130)+(2.007)+(16.004), (I-130)+(2.007)+(16.005), (I-130)+(2.007)+(16.006), (I-130)+(2.007)+(16.007), (I-130)+(2.007)+(16.008), (I-130)+(2.007)+(17.001), (I-130)+(2.007)+(17.002), (I-130)+(2.007)+(17.003), (I-130)+(2.007)+(17.004), (I-130)+(2.007)+(17.005), (I-130)+(2.007)+(17.006), (I-130)+(2.007)+(17.007), (I-130)+(2.007)+(17.008), (I-130)+(2.007)+(17.009), (I-130)+(2.007)+(17.010), (I-130)+(2.007)+(17.011), (I-130)+(2.007)+(17.012), (I-130)+(2.007)+(18.001), (I-130)+(2.008)+(3.001), (I-130)+(2.008)+(3.002), (I-130)+(2.008)+(3.003), (I-130)+(2.008)+(3.004), (I-130)+(2.008)+(3.005), (I-130)+(2.008)+(3.006), (I-130)+(2.008)+(3.007), (I-130)+(2.008)+(3.008), (I-130)+(2.008)+(3.009), (I-130)+(2.008)+(3.010), (I-130)+(2.008)+(3.011), (I-130)+(2.008)+(3.012), (I-130)+(2.008)+(3.013), (I-130)+(2.008)+(3.014), (I-130)+(2.008)+(3.015), (I-130)+(2.008)+(3.016), (I-130)+(2.008)+(3.017), (I-130)+(2.008)+(3.018), (I-130)+(2.008)+(3.019), (I-130)+(2.008)+(3.020), (I-130)+(2.008)+(3.021), (I-130)+(2.008)+(3.022), (I-130)+(2.008)+(3.023), (I-130)+(2.008)+(3.024), (I-130)+(2.008)+(3.025), (I-130)+(2.008)+(3.026), (I-130)+(2.008)+(3.027), (I-130)+(2.008)+(3.028), (I-130)+(2.008)+(3.029), (I-130)+(2.008)+(3.030), (I-130)+(2.008)+(3.031), (I-130)+(2.008)+(5.001), (I-130)+(2.008)+(5.002), (I-130)+(2.008)+(5.003), (I-130)+(2.008)+(5.004), (I-130)+(2.008)+(5.005), (I-130)+(2.008)+(5.006), (I-130)+(2.008)+(5.007), (I-130)+(2.008)+(5.008), (I-130)+(2.008)+(5.009), (I-130)+(2.008)+(5.010), (I-130)+(2.008)+(5.011), (I-130)+(2.008)+(5.012), (I-130)+(2.008)+(5.013), (I-130)+(2.008)+(5.014), (I-130)+(2.008)+(5.015), (I-130)+(2.008)+(5.016), (I-130)+(2.008)+(5.017), (I-130)+(2.008)+(5.018), (I-130)+(2.008)+(5.019), (I-130)+(2.008)+(5.020), (I-130)+(2.008)+(5.021), (I-130)+(2.008)+(5.022), (I-130)+(2.008)+(5.023), (I-130)+(2.008)+(6.001), (I-130)+(2.008)+(6.002), (I-130)+(2.008)+(6.003), (I-130)+(2.008)+(6.004), (I-130)+(2.008)+(7.001), (I-130)+(2.008)+(7.002), (I-130)+(2.008)+(7.003), (I-130)+(2.008)+(7.004), (I-130)+(2.008)+(7.005), (I-130)+(2.008)+(7.006), (I-130)+(2.008)+(9.001), (I-130)+(2.008)+(9.002), (I-130)+(2.008)+(9.003), (I-130)+(2.008)+(9.004), (I-130)+(2.008)+(9.005), (I-130)+(2.008)+(9.006), (I-130)+(2.008)+(9.007), (I-130)+(2.008)+(9.008), (I-130)+(2.008)+(9.009), (I-130)+(2.008)+(14.001), (I-130)+(2.008)+(14.002), (I-130)+(2.008)+(15.008), (I-130)+(2.008)+(15.011), (I-130)+(2.008)+(15.012), (I-130)+(2.008)+(15.016), (I-130)+(2.008)+(15.025), (I-130)+(2.008)+(15.027), (I-130)+(2.008)+(15.047), (I-130)+(2.008)+(15.063), (I-130)+(2.008)+(15.064), (I-130)+(2.008)+(16.001), (I-130)+(2.008)+(16.002), (I-130)+(2.008)+(16.003), (I-130)+(2.008)+(16.004), (I-130)+(2.008)+(16.005), (I-130)+(2.008)+(16.006), (I-130)+(2.008)+(16.007), (I-130)+(2.008)+(16.008), (I-130)+(2.008)+(17.001), (I-130)+(2.008)+(17.002), (I-130)+(2.008)+(17.003), (I-130)+(2.008)+(17.004), (I-130)+(2.008)+(17.005), (I-130)+(2.008)+(17.006), (I-130)+(2.008)+(17.007), (I-130)+(2.008)+(17.008), (I-130)+(2.008)+(17.009), (I-130)+(2.008)+(17.010), (I-130)+(2.008)+(17.011), (I-130)+(2.008)+(17.012), (I-130)+(2.008)+(18.001), (I-130)+(2.009)+(3.001), (I-130)+(2.009)+(3.002), (I-130)+(2.009)+(3.003), (I-130)+(2.009)+(3.004), (I-130)+(2.009)+(3.005), (I-130)+(2.009)+(3.006), (I-130)+(2.009)+(3.007), (I-130)+(2.009)+(3.008), (I-130)+(2.009)+(3.009), (I-130)+(2.009)+(3.010), (I-130)+(2.009)+(3.011), (I-130)+(2.009)+(3.012), (I-130)+(2.009)+(3.013), (I-130)+(2.009)+(3.014), (I-130)+(2.009)+(3.015), (I-130)+(2.009)+(3.016), (I-130)+(2.009)+(3.017), (I-130)+(2.009)+(3.018), (I-130)+(2.009)+(3.019), (I-130)+(2.009)+(3.020), (I-130)+(2.009)+(3.021), (I-130)+(2.009)+(3.022), (I-130)+(2.009)+(3.023), (I-130)+(2.009)+(3.024), (I-130)+(2.009)+(3.025), (I-130)+(2.009)+(3.026), (I-130)+(2.009)+(3.027), (I-130)+(2.009)+(3.028), (I-130)+(2.009)+(3.029), (I-130)+(2.009)+(3.030), (I-130)+(2.009)+(3.031), (I-130)+(2.009)+(5.001), (I-130)+(2.009)+(5.002), (I-130)+(2.009)+(5.003), (I-130)+(2.009)+(5.004), (I-130)+(2.009)+(5.005), (I-130)+(2.009)+(5.006), (I-130)+(2.009)+(5.007), (I-130)+(2.009)+(5.008), (I-130)+(2.009)+(5.009), (I-130)+(2.009)+(5.010), (I-130)+(2.009)+(5.011), (I-130)+(2.009)+(5.012), (I-130)+(2.009)+(5.013), (I-130)+(2.009)+(5.014), (I-130)+(2.009)+(5.015), (I-130)+(2.009)+(5.016), (I-130)+(2.009)+(5.017), (I-130)+(2.009)+(5.018), (I-130)+(2.009)+(5.019), (I-130)+(2.009)+(5.020), (I-130)+(2.009)+(5.021), (I-130)+(2.009)+(5.022), (I-130)+(2.009)+(5.023), (I-130)+(2.009)+(6.001), (I-130)+(2.009)+(6.002), (I-130)+(2.009)+(6.003), (I-130)+(2.009)+(6.004), (I-130)+(2.009)+(7.001), (I-130)+(2.009)+(7.002), (I-130)+(2.009)+(7.003), (I-130)+(2.009)+(7.004), (I-130)+(2.009)+(7.005), (I-130)+(2.009)+(7.006), (I-130)+(2.009)+(9.001), (I-130)+(2.009)+(9.002), (I-130)+(2.009)+(9.003), (I-130)+(2.009)+(9.004), (I-130)+(2.009)+(9.005), (I-130)+(2.009)+(9.006), (I-130)+(2.009)+(9.007), (I-130)+(2.009)+(9.008), (I-130)+(2.009)+(9.009), (I-130)+(2.009)+(14.001), (I-130)+(2.009)+(14.002), (I-130)+(2.009)+(15.008), (I-130)+(2.009)+(15.011), (I-130)+(2.009)+(15.012), (I-130)+(2.009)+(15.016), (I-130)+(2.009)+(15.025), (I-130)+(2.009)+(15.027), (I-130)+(2.009)+(15.047), (I-130)+(2.009)+(15.063), (I-130)+(2.009)+(15.064), (I-130)+(2.009)+(16.001), (I-130)+(2.009)+(16.002), (I-130)+(2.009)+(16.003), (I-130)+(2.009)+(16.004), (I-130)+(2.009)+(16.005), (I-130)+(2.009)+(16.006), (I-130)+(2.009)+(16.007), (I-130)+(2.009)+(16.008), (I-130)+(2.009)+(17.001), (I-130)+(2.009)+(17.002), (I-130)+(2.009)+(17.003), (I-130)+(2.009)+(17.004), (I-130)+(2.009)+(17.005), (I-130)+(2.009)+(17.006), (I-130)+(2.009)+(17.007), (I-130)+(2.009)+(17.008), (I-130)+(2.009)+(17.009), (I-130)+(2.009)+(17.010), (I-130)+(2.009)+(17.011), (I-130)+(2.009)+(17.012), (I-130)+(2.009)+(18.001), (I-130)+(2.010)+(3.001), (I-130)+(2.010)+(3.002), (I-130)+(2.010)+(3.003), (I-130)+(2.010)+(3.004), (I-130)+(2.010)+(3.005), (I-130)+(2.010)+(3.006), (I-130)+(2.010)+(3.007), (I-130)+(2.010)+(3.008), (I-130)+(2.010)+(3.009), (I-130)+(2.010)+(3.010), (I-130)+(2.010)+(3.011), (I-130)+(2.010)+(3.012), (I-130)+(2.010)+(3.013), (I-130)+(2.010)+(3.014), (I-130)+(2.010)+(3.015), (I-130)+(2.010)+(3.016), (I-130)+(2.010)+(3.017), (I-130)+(2.010)+(3.018), (I-130)+(2.010)+(3.019), (I-130)+(2.010)+(3.020), (I-130)+(2.010)+(3.021), (I-130)+(2.010)+(3.022), (I-130)+(2.010)+(3.023), (I-130)+(2.010)+(3.024), (I-130)+(2.010)+(3.025), (I-130)+(2.010)+(3.026), (I-130)+(2.010)+(3.027), (I-130)+(2.010)+(3.028), (I-130)+(2.010)+(3.029), (I-130)+(2.010)+(3.030), (I-130)+(2.010)+(3.031), (I-130)+(2.010)+(5.001), (I-130)+(2.010)+(5.002), (I-130)+(2.010)+(5.003), (I-130)+(2.010)+(5.004), (I-130)+(2.010)+(5.005), (I-130)+(2.010)+(5.006), (I-130)+(2.010)+(5.007), (I-130)+(2.010)+(5.008), (I-130)+(2.010)+(5.009), (I-130)+(2.010)+(5.010), (I-130)+(2.010)+(5.011), (I-130)+(2.010)+(5.012), (I-130)+(2.010)+(5.013), (I-130)+(2.010)+(5.014), (I-130)+(2.010)+(5.015), (I-130)+(2.010)+(5.016), (I-130)+(2.010)+(5.017), (I-130)+(2.010)+(5.018), (I-130)+(2.010)+(5.019), (I-130)+(2.010)+(5.020), (I-130)+(2.010)+(5.021), (I-130)+(2.010)+(5.022), (I-130)+(2.010)+(5.023), (I-130)+(2.010)+(6.001), (I-130)+(2.010)+(6.002), (I-130)+(2.010)+(6.003), (I-130)+(2.010)+(6.004), (I-130)+(2.010)+(7.001), (I-130)+(2.010)+(7.002), (I-130)+(2.010)+(7.003), (I-130)+(2.010)+(7.004), (I-130)+(2.010)+(7.005), (I-130)+(2.010)+(7.006), (I-130)+(2.010)+(9.001), (I-130)+(2.010)+(9.002), (I-130)+(2.010)+(9.003), (I-130)+(2.010)+(9.004), (I-130)+(2.010)+(9.005), (I-130)+(2.010)+(9.006), (I-130)+(2.010)+(9.007), (I-130)+(2.010)+(9.008), (I-130)+(2.010)+(9.009), (I-130)+(2.010)+(14.001), (I-130)+(2.010)+(14.002), (I-130)+(2.010)+(15.008), (I-130)+(2.010)+(15.011), (I-130)+(2.010)+(15.012), (I-130)+(2.010)+(15.016), (I-130)+(2.010)+(15.025), (I-130)+(2.010)+(15.027), (I-130)+(2.010)+(15.047), (I-130)+(2.010)+(15.063), (I-130)+(2.010)+(15.064), (I-130)+(2.010)+(16.001), (I-130)+(2.010)+(16.002), (I-130)+(2.010)+(16.003), (I-130)+(2.010)+(16.004), (I-130)+(2.010)+(16.005), (I-130)+(2.010)+(16.006), (I-130)+(2.010)+(16.007), (I-130)+(2.010)+(16.008), (I-130)+(2.010)+(17.001), (I-130)+(2.010)+(17.002), (I-130)+(2.010)+(17.003), (I-130)+(2.010)+(17.004), (I-130)+(2.010)+(17.005), (I-130)+(2.010)+(17.006), (I-130)+(2.010)+(17.007), (I-130)+(2.010)+(17.008), (I-130)+(2.010)+(17.009), (I-130)+(2.010)+(17.010), (I-130)+(2.010)+(17.011), (I-130)+(2.010)+(17.012), (I-130)+(2.010)+(18.001), (I-130)+(2.011)+(3.001), (I-130)+(2.011)+(3.002), (I-130)+(2.011)+(3.003), (I-130)+(2.011)+(3.004), (I-130)+(2.011)+(3.005), (I-130)+(2.011)+(3.006), (I-130)+(2.011)+(3.007), (I-130)+(2.011)+(3.008), (I-130)+(2.011)+(3.009), (I-130)+(2.011)+(3.010), (I-130)+(2.011)+(3.011), (I-130)+(2.011)+(3.012), (I-130)+(2.011)+(3.013), (I-130)+(2.011)+(3.014), (I-130)+(2.011)+(3.015), (I-130)+(2.011)+(3.016), (I-130)+(2.011)+(3.017), (I-130)+(2.011)+(3.018), (I-130)+(2.011)+(3.019), (I-130)+(2.011)+(3.020), (I-130)+(2.011)+(3.021), (I-130)+(2.011)+(3.022), (I-130)+(2.011)+(3.023), (I-130)+(2.011)+(3.024), (I-130)+(2.011)+(3.025), (I-130)+(2.011)+(3.026), (I-130)+(2.011)+(3.027), (I-130)+(2.011)+(3.028), (I-130)+(2.011)+(3.029), (I-130)+(2.011)+(3.030), (I-130)+(2.011)+(3.031), (I-130)+(2.011)+(5.001), (I-130)+(2.011)+(5.002), (I-130)+(2.011)+(5.003), (I-130)+(2.011)+(5.004), (I-130)+(2.011)+(5.005), (I-130)+(2.011)+(5.006), (I-130)+(2.011)+(5.007), (I-130)+(2.011)+(5.008), (I-130)+(2.011)+(5.009), (I-130)+(2.011)+(5.010), (I-130)+(2.011)+(5.011), (I-130)+(2.011)+(5.012), (I-130)+(2.011)+(5.013), (I-130)+(2.011)+(5.014), (I-130)+(2.011)+(5.015), (I-130)+(2.011)+(5.016), (I-130)+(2.011)+(5.017), (I-130)+(2.011)+(5.018), (I-130)+(2.011)+(5.019), (I-130)+(2.011)+(5.020), (I-130)+(2.011)+(5.021), (I-130)+(2.011)+(5.022), (I-130)+(2.011)+(5.023), (I-130)+(2.011)+(6.001), (I-130)+(2.011)+(6.002), (I-130)+(2.011)+(6.003), (I-130)+(2.011)+(6.004), (I-130)+(2.011)+(7.001), (I-130)+(2.011)+(7.002), (I-130)+(2.011)+(7.003), (I-130)+(2.011)+(7.004), (I-130)+(2.011)+(7.005), (I-130)+(2.011)+(7.006), (I-130)+(2.011)+(9.001), (I-130)+(2.011)+(9.002), (I-130)+(2.011)+(9.003), (I-130)+(2.011)+(9.004), (I-130)+(2.011)+(9.005), (I-130)+(2.011)+(9.006), (I-130)+(2.011)+(9.007), (I-130)+(2.011)+(9.008), (I-130)+(2.011)+(9.009), (I-130)+(2.011)+(14.001), (I-130)+(2.011)+(14.002), (I-130)+(2.011)+(15.008), (I-130)+(2.011)+(15.011), (I-130)+(2.011)+(15.012), (I-130)+(2.011)+(15.016), (I-130)+(2.011)+(15.025), (I-130)+(2.011)+(15.027), (I-130)+(2.011)+(15.047), (I-130)+(2.011)+(15.063), (I-130)+(2.011)+(15.064), (I-130)+(2.011)+(16.001), (I-130)+(2.011)+(16.002), (I-130)+(2.011)+(16.003), (I-130)+(2.011)+(16.004), (I-130)+(2.011)+(16.005), (I-130)+(2.011)+(16.006), (I-130)+(2.011)+(16.007), (I-130)+(2.011)+(16.008), (I-130)+(2.011)+(17.001), (I-130)+(2.011)+(17.002), (I-130)+(2.011)+(17.003), (I-130)+(2.011)+(17.004), (I-130)+(2.011)+(17.005), (I-130)+(2.011)+(17.006), (I-130)+(2.011)+(17.007), (I-130)+(2.011)+(17.008), (I-130)+(2.011)+(17.009), (I-130)+(2.011)+(17.010), (I-130)+(2.011)+(17.011), (I-130)+(2.011)+(17.012), (I-130)+(2.011)+(18.001), (I-130)+(2.012)+(3.001), (I-130)+(2.012)+(3.002), (I-130)+(2.012)+(3.003), (I-130)+(2.012)+(3.004), (I-130)+(2.012)+(3.005), (I-130)+(2.012)+(3.006), (I-130)+(2.012)+(3.007), (I-130)+(2.012)+(3.008), (I-130)+(2.012)+(3.009), (I-130)+(2.012)+(3.010), (I-130)+(2.012)+(3.011), (I-130)+(2.012)+(3.012), (I-130)+(2.012)+(3.013), (I-130)+(2.012)+(3.014), (I-130)+(2.012)+(3.015), (I-130)+(2.012)+(3.016), (I-130)+(2.012)+(3.017), (I-130)+(2.012)+(3.018), (I-130)+(2.012)+(3.019), (I-130)+(2.012)+(3.020), (I-130)+(2.012)+(3.021), (I-130)+(2.012)+(3.022), (I-130)+(2.012)+(3.023), (I-130)+(2.012)+(3.024), (I-130)+(2.012)+(3.025), (I-130)+(2.012)+(3.026), (I-130)+(2.012)+(3.027), (I-130)+(2.012)+(3.028), (I-130)+(2.012)+(3.029), (I-130)+(2.012)+(3.030), (I-130)+(2.012)+(3.031), (I-130)+(2.012)+(5.001), (I-130)+(2.012)+(5.002), (I-130)+(2.012)+(5.003), (I-130)+(2.012)+(5.004), (I-130)+(2.012)+(5.005), (I-130)+(2.012)+(5.006), (I-130)+(2.012)+(5.007), (I-130)+(2.012)+(5.008), (I-130)+(2.012)+(5.009), (I-130)+(2.012)+(5.010), (I-130)+(2.012)+(5.011), (I-130)+(2.012)+(5.012), (I-130)+(2.012)+(5.013), (I-130)+(2.012)+(5.014), (I-130)+(2.012)+(5.015), (I-130)+(2.012)+(5.016), (I-130)+(2.012)+(5.017), (I-130)+(2.012)+(5.018), (I-130)+(2.012)+(5.019), (I-130)+(2.012)+(5.020), (I-130)+(2.012)+(5.021), (I-130)+(2.012)+(5.022), (I-130)+(2.012)+(5.023), (I-130)+(2.012)+(6.001), (I-130)+(2.012)+(6.002), (I-130)+(2.012)+(6.003), (I-130)+(2.012)+(6.004), (I-130)+(2.012)+(7.001), (I-130)+(2.012)+(7.002), (I-130)+(2.012)+(7.003), (I-130)+(2.012)+(7.004), (I-130)+(2.012)+(7.005), (I-130)+(2.012)+(7.006), (I-130)+(2.012)+(9.001), (I-130)+(2.012)+(9.002), (I-130)+(2.012)+(9.003), (I-130)+(2.012)+(9.004), (I-130)+(2.012)+(9.005), (I-130)+(2.012)+(9.006), (I-130)+(2.012)+(9.007), (I-130)+(2.012)+(9.008), (I-130)+(2.012)+(9.009), (I-130)+(2.012)+(14.001), (I-130)+(2.012)+(14.002), (I-130)+(2.012)+(15.008), (I-130)+(2.012)+(15.011), (I-130)+(2.012)+(15.012), (I-130)+(2.012)+(15.016), (I-130)+(2.012)+(15.025), (I-130)+(2.012)+(15.027), (I-130)+(2.012)+(15.047), (I-130)+(2.012)+(15.063), (I-130)+(2.012)+(15.064), (I-130)+(2.012)+(16.001), (I-130)+(2.012)+(16.002), (I-130)+(2.012)+(16.003), (I-130)+(2.012)+(16.004), (I-130)+(2.012)+(16.005), (I-130)+(2.012)+(16.006), (I-130)+(2.012)+(16.007), (I-130)+(2.012)+(16.008), (I-130)+(2.012)+(17.001), (I-130)+(2.012)+(17.002), (I-130)+(2.012)+(17.003), (I-130)+(2.012)+(17.004), (I-130)+(2.012)+(17.005), (I-130)+(2.012)+(17.006), (I-130)+(2.012)+(17.007), (I-130)+(2.012)+(17.008), (I-130)+(2.012)+(17.009), (I-130)+(2.012)+(17.010), (I-130)+(2.012)+(17.011), (I-130)+(2.012)+(17.012), (I-130)+(2.012)+(18.001), (I-130)+(2.013)+(3.001), (I-130)+(2.013)+(3.002), (I-130)+(2.013)+(3.003), (I-130)+(2.013)+(3.004), (I-130)+(2.013)+(3.005), (I-130)+(2.013)+(3.006), (I-130)+(2.013)+(3.007), (I-130)+(2.013)+(3.008), (I-130)+(2.013)+(3.009), (I-130)+(2.013)+(3.010), (I-130)+(2.013)+(3.011), (I-130)+(2.013)+(3.012), (I-130)+(2.013)+(3.013), (I-130)+(2.013)+(3.014), (I-130)+(2.013)+(3.015), (I-130)+(2.013)+(3.016), (I-130)+(2.013)+(3.017), (I-130)+(2.013)+(3.018), (I-130)+(2.013)+(3.019), (I-130)+(2.013)+(3.020), (I-130)+(2.013)+(3.021), (I-130)+(2.013)+(3.022), (I-130)+(2.013)+(3.023), (I-130)+(2.013)+(3.024), (I-130)+(2.013)+(3.025), (I-130)+(2.013)+(3.026), (I-130)+(2.013)+(3.027), (I-130)+(2.013)+(3.028), (I-130)+(2.013)+(3.029), (I-130)+(2.013)+(3.030), (I-130)+(2.013)+(3.031), (I-130)+(2.013)+(5.001), (I-130)+(2.013)+(5.002), (I-130)+(2.013)+(5.003), (I-130)+(2.013)+(5.004), (I-130)+(2.013)+(5.005), (I-130)+(2.013)+(5.006), (I-130)+(2.013)+(5.007), (I-130)+(2.013)+(5.008), (I-130)+(2.013)+(5.009), (I-130)+(2.013)+(5.010), (I-130)+(2.013)+(5.011), (I-130)+(2.013)+(5.012), (I-130)+(2.013)+(5.013), (I-130)+(2.013)+(5.014), (I-130)+(2.013)+(5.015), (I-130)+(2.013)+(5.016), (I-130)+(2.013)+(5.017), (I-130)+(2.013)+(5.018), (I-130)+(2.013)+(5.019), (I-130)+(2.013)+(5.020), (I-130)+(2.013)+(5.021), (I-130)+(2.013)+(5.022), (I-130)+(2.013)+(5.023), (I-130)+(2.013)+(6.001), (I-130)+(2.013)+(6.002), (I-130)+(2.013)+(6.003), (I-130)+(2.013)+(6.004), (I-130)+(2.013)+(7.001), (I-130)+(2.013)+(7.002), (I-130)+(2.013)+(7.003), (I-130)+(2.013)+(7.004), (I-130)+(2.013)+(7.005), (I-130)+(2.013)+(7.006), (I-130)+(2.013)+(9.001), (I-130)+(2.013)+(9.002), (I-130)+(2.013)+(9.003), (I-130)+(2.013)+(9.004), (I-130)+(2.013)+(9.005), (I-130)+(2.013)+(9.006), (I-130)+(2.013)+(9.007), (I-130)+(2.013)+(9.008), (I-130)+(2.013)+(9.009), (I-130)+(2.013)+(14.001), (I-130)+(2.013)+(14.002), (I-130)+(2.013)+(15.008), (I-130)+(2.013)+(15.011), (I-130)+(2.013)+(15.012), (I-130)+(2.013)+(15.016), (I-130)+(2.013)+(15.025), (I-130)+(2.013)+(15.027), (I-130)+(2.013)+(15.047), (I-130)+(2.013)+(15.063), (I-130)+(2.013)+(15.064), (I-130)+(2.013)+(16.001), (I-130)+(2.013)+(16.002), (I-130)+(2.013)+(16.003), (I-130)+(2.013)+(16.004), (I-130)+(2.013)+(16.005), (I-130)+(2.013)+(16.006), (I-130)+(2.013)+(16.007), (I-130)+(2.013)+(16.008), (I-130)+(2.013)+(17.001), (I-130)+(2.013)+(17.002), (I-130)+(2.013)+(17.003), (I-130)+(2.013)+(17.004), (I-130)+(2.013)+(17.005), (I-130)+(2.013)+(17.006), (I-130)+(2.013)+(17.007), (I-130)+(2.013)+(17.008), (I-130)+(2.013)+(17.009), (I-130)+(2.013)+(17.010), (I-130)+(2.013)+(17.011), (I-130)+(2.013)+(17.012), (I-130)+(2.013)+(18.001), (I-130)+(2.014)+(3.001), (I-130)+(2.014)+(3.002), (I-130)+(2.014)+(3.003), (I-130)+(2.014)+(3.004), (I-130)+(2.014)+(3.005), (I-130)+(2.014)+(3.006), (I-130)+(2.014)+(3.007), (I-130)+(2.014)+(3.008), (I-130)+(2.014)+(3.009), (I-130)+(2.014)+(3.010), (I-130)+(2.014)+(3.011), (I-130)+(2.014)+(3.012), (I-130)+(2.014)+(3.013), (I-130)+(2.014)+(3.014), (I-130)+(2.014)+(3.015), (I-130)+(2.014)+(3.016), (I-130)+(2.014)+(3.017), (I-130)+(2.014)+(3.018), (I-130)+(2.014)+(3.019), (I-130)+(2.014)+(3.020), (I-130)+(2.014)+(3.021), (I-130)+(2.014)+(3.022), (I-130)+(2.014)+(3.023), (I-130)+(2.014)+(3.024), (I-130)+(2.014)+(3.025), (I-130)+(2.014)+(3.026), (I-130)+(2.014)+(3.027), (I-130)+(2.014)+(3.028), (I-130)+(2.014)+(3.029), (I-130)+(2.014)+(3.030), (I-130)+(2.014)+(3.031), (I-130)+(2.014)+(5.001), (I-130)+(2.014)+(5.002), (I-130)+(2.014)+(5.003), (I-130)+(2.014)+(5.004), (I-130)+(2.014)+(5.005), (I-130)+(2.014)+(5.006), (I-130)+(2.014)+(5.007), (I-130)+(2.014)+(5.008), (I-130)+(2.014)+(5.009), (I-130)+(2.014)+(5.010), (I-130)+(2.014)+(5.011), (I-130)+(2.014)+(5.012), (I-130)+(2.014)+(5.013), (I-130)+(2.014)+(5.014), (I-130)+(2.014)+(5.015), (I-130)+(2.014)+(5.016), (I-130)+(2.014)+(5.017), (I-130)+(2.014)+(5.018), (I-130)+(2.014)+(5.019), (I-130)+(2.014)+(5.020), (I-130)+(2.014)+(5.021), (I-130)+(2.014)+(5.022), (I-130)+(2.014)+(5.023), (I-130)+(2.014)+(6.001), (I-130)+(2.014)+(6.002), (I-130)+(2.014)+(6.003), (I-130)+(2.014)+(6.004), (I-130)+(2.014)+(7.001), (I-130)+(2.014)+(7.002), (I-130)+(2.014)+(7.003), (I-130)+(2.014)+(7.004), (I-130)+(2.014)+(7.005), (I-130)+(2.014)+(7.006), (I-130)+(2.014)+(9.001), (I-130)+(2.014)+(9.002), (I-130)+(2.014)+(9.003), (I-130)+(2.014)+(9.004), (I-130)+(2.014)+(9.005), (I-130)+(2.014)+(9.006), (I-130)+(2.014)+(9.007), (I-130)+(2.014)+(9.008), (I-130)+(2.014)+(9.009), (I-130)+(2.014)+(14.001), (I-130)+(2.014)+(14.002), (I-130)+(2.014)+(15.008), (I-130)+(2.014)+(15.011), (I-130)+(2.014)+(15.012), (I-130)+(2.014)+(15.016), (I-130)+(2.014)+(15.025), (I-130)+(2.014)+(15.027), (I-130)+(2.014)+(15.047), (I-130)+(2.014)+(15.063), (I-130)+(2.014)+(15.064), (I-130)+(2.014)+(16.001), (I-130)+(2.014)+(16.002), (I-130)+(2.014)+(16.003), (I-130)+(2.014)+(16.004), (I-130)+(2.014)+(16.005), (I-130)+(2.014)+(16.006), (I-130)+(2.014)+(16.007), (I-130)+(2.014)+(16.008), (I-130)+(2.014)+(17.001), (I-130)+(2.014)+(17.002), (I-130)+(2.014)+(17.003), (I-130)+(2.014)+(17.004), (I-130)+(2.014)+(17.005), (I-130)+(2.014)+(17.006), (I-130)+(2.014)+(17.007), (I-130)+(2.014)+(17.008), (I-130)+(2.014)+(17.009), (I-130)+(2.014)+(17.010), (I-130)+(2.014)+(17.011), (I-130)+(2.014)+(17.012), (I-130)+(2.014)+(18.001), (I-130)+(2.015)+(3.001), (I-130)+(2.015)+(3.002), (I-130)+(2.015)+(3.003), (I-130)+(2.015)+(3.004), (I-130)+(2.015)+(3.005), (I-130)+(2.015)+(3.006), (I-130)+(2.015)+(3.007), (I-130)+(2.015)+(3.008), (I-130)+(2.015)+(3.009), (I-130)+(2.015)+(3.010), (I-130)+(2.015)+(3.011), (I-130)+(2.015)+(3.012), (I-130)+(2.015)+(3.013), (I-130)+(2.015)+(3.014), (I-130)+(2.015)+(3.015), (I-130)+(2.015)+(3.016), (I-130)+(2.015)+(3.017), (I-130)+(2.015)+(3.018), (I-130)+(2.015)+(3.019), (I-130)+(2.015)+(3.020), (I-130)+(2.015)+(3.021), (I-130)+(2.015)+(3.022), (I-130)+(2.015)+(3.023), (I-130)+(2.015)+(3.024), (I-130)+(2.015)+(3.025), (I-130)+(2.015)+(3.026), (I-130)+(2.015)+(3.027), (I-130)+(2.015)+(3.028), (I-130)+(2.015)+(3.029), (I-130)+(2.015)+(3.030), (I-130)+(2.015)+(3.031), (I-130)+(2.015)+(5.001), (I-130)+(2.015)+(5.002), (I-130)+(2.015)+(5.003), (I-130)+(2.015)+(5.004), (I-130)+(2.015)+(5.005), (I-130)+(2.015)+(5.006), (I-130)+(2.015)+(5.007), (I-130)+(2.015)+(5.008), (I-130)+(2.015)+(5.009), (I-130)+(2.015)+(5.010), (I-130)+(2.015)+(5.011), (I-130)+(2.015)+(5.012), (I-130)+(2.015)+(5.013), (I-130)+(2.015)+(5.014), (I-130)+(2.015)+(5.015), (I-130)+(2.015)+(5.016), (I-130)+(2.015)+(5.017), (I-130)+(2.015)+(5.018), (I-130)+(2.015)+(5.019), (I-130)+(2.015)+(5.020), (I-130)+(2.015)+(5.021), (I-130)+(2.015)+(5.022), (I-130)+(2.015)+(5.023), (I-130)+(2.015)+(6.001), (I-130)+(2.015)+(6.002), (I-130)+(2.015)+(6.003), (I-130)+(2.015)+(6.004), (I-130)+(2.015)+(7.001), (I-130)+(2.015)+(7.002), (I-130)+(2.015)+(7.003), (I-130)+(2.015)+(7.004), (I-130)+(2.015)+(7.005), (I-130)+(2.015)+(7.006), (I-130)+(2.015)+(9.001), (I-130)+(2.015)+(9.002), (I-130)+(2.015)+(9.003), (I-130)+(2.015)+(9.004), (I-130)+(2.015)+(9.005), (I-130)+(2.015)+(9.006), (I-130)+(2.015)+(9.007), (I-130)+(2.015)+(9.008), (I-130)+(2.015)+(9.009), (I-130)+(2.015)+(14.001), (I-130)+(2.015)+(14.002), (I-130)+(2.015)+(15.008), (I-130)+(2.015)+(15.011), (I-130)+(2.015)+(15.012), (I-130)+(2.015)+(15.016), (I-130)+(2.015)+(15.025), (I-130)+(2.015)+(15.027), (I-130)+(2.015)+(15.047), (I-130)+(2.015)+(15.063), (I-130)+(2.015)+(15.064), (I-130)+(2.015)+(16.001), (I-130)+(2.015)+(16.002), (I-130)+(2.015)+(16.003), (I-130)+(2.015)+(16.004), (I-130)+(2.015)+(16.005), (I-130)+(2.015)+(16.006), (I-130)+(2.015)+(16.007), (I-130)+(2.015)+(16.008), (I-130)+(2.015)+(17.001), (I-130)+(2.015)+(17.002), (I-130)+(2.015)+(17.003), (I-130)+(2.015)+(17.004), (I-130)+(2.015)+(17.005), (I-130)+(2.015)+(17.006), (I-130)+(2.015)+(17.007), (I-130)+(2.015)+(17.008), (I-130)+(2.015)+(17.009), (I-130)+(2.015)+(17.010), (I-130)+(2.015)+(17.011), (I-130)+(2.015)+(17.012), (I-130)+(2.015)+(18.001), (I-130)+(2.016)+(3.001), (I-130)+(2.016)+(3.002), (I-130)+(2.016)+(3.003), (I-130)+(2.016)+(3.004), (I-130)+(2.016)+(3.005), (I-130)+(2.016)+(3.006), (I-130)+(2.016)+(3.007), (I-130)+(2.016)+(3.008), (I-130)+(2.016)+(3.009), (I-130)+(2.016)+(3.010), (I-130)+(2.016)+(3.011), (I-130)+(2.016)+(3.012), (I-130)+(2.016)+(3.013), (I-130)+(2.016)+(3.014), (I-130)+(2.016)+(3.015), (I-130)+(2.016)+(3.016), (I-130)+(2.016)+(3.017), (I-130)+(2.016)+(3.018), (I-130)+(2.016)+(3.019), (I-130)+(2.016)+(3.020), (I-130)+(2.016)+(3.021), (I-130)+(2.016)+(3.022), (I-130)+(2.016)+(3.023), (I-130)+(2.016)+(3.024), (I-130)+(2.016)+(3.025), (I-130)+(2.016)+(3.026), (I-130)+(2.016)+(3.027), (I-130)+(2.016)+(3.028), (I-130)+(2.016)+(3.029), (I-130)+(2.016)+(3.030), (I-130)+(2.016)+(3.031), (I-130)+(2.016)+(5.001), (I-130)+(2.016)+(5.002), (I-130)+(2.016)+(5.003), (I-130)+(2.016)+(5.004), (I-130)+(2.016)+(5.005), (I-130)+(2.016)+(5.006), (I-130)+(2.016)+(5.007), (I-130)+(2.016)+(5.008), (I-130)+(2.016)+(5.009), (I-130)+(2.016)+(5.010), (I-130)+(2.016)+(5.011), (I-130)+(2.016)+(5.012), (I-130)+(2.016)+(5.013), (I-130)+(2.016)+(5.014), (I-130)+(2.016)+(5.015), (I-130)+(2.016)+(5.016), (I-130)+(2.016)+(5.017), (I-130)+(2.016)+(5.018), (I-130)+(2.016)+(5.019), (I-130)+(2.016)+(5.020), (I-130)+(2.016)+(5.021), (I-130)+(2.016)+(5.022), (I-130)+(2.016)+(5.023), (I-130)+(2.016)+(6.001), (I-130)+(2.016)+(6.002), (I-130)+(2.016)+(6.003), (I-130)+(2.016)+(6.004), (I-130)+(2.016)+(7.001), (I-130)+(2.016)+(7.002), (I-130)+(2.016)+(7.003), (I-130)+(2.016)+(7.004), (I-130)+(2.016)+(7.005), (I-130)+(2.016)+(7.006), (I-130)+(2.016)+(9.001), (I-130)+(2.016)+(9.002), (I-130)+(2.016)+(9.003), (I-130)+(2.016)+(9.004), (I-130)+(2.016)+(9.005), (I-130)+(2.016)+(9.006), (I-130)+(2.016)+(9.007), (I-130)+(2.016)+(9.008), (I-130)+(2.016)+(9.009), (I-130)+(2.016)+(14.001), (I-130)+(2.016)+(14.002), (I-130)+(2.016)+(15.008), (I-130)+(2.016)+(15.011), (I-130)+(2.016)+(15.012), (I-130)+(2.016)+(15.016), (I-130)+(2.016)+(15.025), (I-130)+(2.016)+(15.027), (I-130)+(2.016)+(15.047), (I-130)+(2.016)+(15.063), (I-130)+(2.016)+(15.064), (I-130)+(2.016)+(16.001), (I-130)+(2.016)+(16.002), (I-130)+(2.016)+(16.003), (I-130)+(2.016)+(16.004), (I-130)+(2.016)+(16.005), (I-130)+(2.016)+(16.006), (I-130)+(2.016)+(16.007), (I-130)+(2.016)+(16.008), (I-130)+(2.016)+(17.001), (I-130)+(2.016)+(17.002), (I-130)+(2.016)+(17.003), (I-130)+(2.016)+(17.004), (I-130)+(2.016)+(17.005), (I-130)+(2.016)+(17.006), (I-130)+(2.016)+(17.007), (I-130)+(2.016)+(17.008), (I-130)+(2.016)+(17.009), (I-130)+(2.016)+(17.010), (I-130)+(2.016)+(17.011), (I-130)+(2.016)+(17.012), (I-130)+(2.016)+(18.001), (I-130)+(2.017)+(3.001), (I-130)+(2.017)+(3.002), (I-130)+(2.017)+(3.003), (I-130)+(2.017)+(3.004), (I-130)+(2.017)+(3.005), (I-130)+(2.017)+(3.006), (I-130)+(2.017)+(3.007), (I-130)+(2.017)+(3.008), (I-130)+(2.017)+(3.009), (I-130)+(2.017)+(3.010), (I-130)+(2.017)+(3.011), (I-130)+(2.017)+(3.012), (I-130)+(2.017)+(3.013), (I-130)+(2.017)+(3.014), (I-130)+(2.017)+(3.015), (I-130)+(2.017)+(3.016), (I-130)+(2.017)+(3.017), (I-130)+(2.017)+(3.018), (I-130)+(2.017)+(3.019), (I-130)+(2.017)+(3.020), (I-130)+(2.017)+(3.021), (I-130)+(2.017)+(3.022), (I-130)+(2.017)+(3.023), (I-130)+(2.017)+(3.024), (I-130)+(2.017)+(3.025), (I-130)+(2.017)+(3.026), (I-130)+(2.017)+(3.027), (I-130)+(2.017)+(3.028), (I-130)+(2.017)+(3.029), (I-130)+(2.017)+(3.030), (I-130)+(2.017)+(3.031), (I-130)+(2.017)+(5.001), (I-130)+(2.017)+(5.002), (I-130)+(2.017)+(5.003), (I-130)+(2.017)+(5.004), (I-130)+(2.017)+(5.005), (I-130)+(2.017)+(5.006), (I-130)+(2.017)+(5.007), (I-130)+(2.017)+(5.008), (I-130)+(2.017)+(5.009), (I-130)+(2.017)+(5.010), (I-130)+(2.017)+(5.011), (I-130)+(2.017)+(5.012), (I-130)+(2.017)+(5.013), (I-130)+(2.017)+(5.014), (I-130)+(2.017)+(5.015), (I-130)+(2.017)+(5.016), (I-130)+(2.017)+(5.017), (I-130)+(2.017)+(5.018), (I-130)+(2.017)+(5.019), (I-130)+(2.017)+(5.020), (I-130)+(2.017)+(5.021), (I-130)+(2.017)+(5.022), (I-130)+(2.017)+(5.023), (I-130)+(2.017)+(6.001), (I-130)+(2.017)+(6.002), (I-130)+(2.017)+(6.003), (I-130)+(2.017)+(6.004), (I-130)+(2.017)+(7.001), (I-130)+(2.017)+(7.002), (I-130)+(2.017)+(7.003), (I-130)+(2.017)+(7.004), (I-130)+(2.017)+(7.005), (I-130)+(2.017)+(7.006), (I-130)+(2.017)+(9.001), (I-130)+(2.017)+(9.002), (I-130)+(2.017)+(9.003), (I-130)+(2.017)+(9.004), (I-130)+(2.017)+(9.005), (I-130)+(2.017)+(9.006), (I-130)+(2.017)+(9.007), (I-130)+(2.017)+(9.008), (I-130)+(2.017)+(9.009), (I-130)+(2.017)+(14.001), (I-130)+(2.017)+(14.002), (I-130)+(2.017)+(15.008), (I-130)+(2.017)+(15.011), (I-130)+(2.017)+(15.012), (I-130)+(2.017)+(15.016), (I-130)+(2.017)+(15.025), (I-130)+(2.017)+(15.027), (I-130)+(2.017)+(15.047), (I-130)+(2.017)+(15.063), (I-130)+(2.017)+(15.064), (I-130)+(2.017)+(16.001), (I-130)+(2.017)+(16.002), (I-130)+(2.017)+(16.003), (I-130)+(2.017)+(16.004), (I-130)+(2.017)+(16.005), (I-130)+(2.017)+(16.006), (I-130)+(2.017)+(16.007), (I-130)+(2.017)+(16.008), (I-130)+(2.017)+(17.001), (I-130)+(2.017)+(17.002), (I-130)+(2.017)+(17.003), (I-130)+(2.017)+(17.004), (I-130)+(2.017)+(17.005), (I-130)+(2.017)+(17.006), (I-130)+(2.017)+(17.007), (I-130)+(2.017)+(17.008), (I-130)+(2.017)+(17.009), (I-130)+(2.017)+(17.010), (I-130)+(2.017)+(17.011), (I-130)+(2.017)+(17.012), (I-130)+(2.017)+(18.001), (I-130)+(2.018)+(3.001), (I-130)+(2.018)+(3.002), (I-130)+(2.018)+(3.003), (I-130)+(2.018)+(3.004), (I-130)+(2.018)+(3.005), (I-130)+(2.018)+(3.006), (I-130)+(2.018)+(3.007), (I-130)+(2.018)+(3.008), (I-130)+(2.018)+(3.009), (I-130)+(2.018)+(3.010), (I-130)+(2.018)+(3.011), (I-130)+(2.018)+(3.012), (I-130)+(2.018)+(3.013), (I-130)+(2.018)+(3.014), (I-130)+(2.018)+(3.015), (I-130)+(2.018)+(3.016), (I-130)+(2.018)+(3.017), (I-130)+(2.018)+(3.018), (I-130)+(2.018)+(3.019), (I-130)+(2.018)+(3.020), (I-130)+(2.018)+(3.021), (I-130)+(2.018)+(3.022), (I-130)+(2.018)+(3.023), (I-130)+(2.018)+(3.024), (I-130)+(2.018)+(3.025), (I-130)+(2.018)+(3.026), (I-130)+(2.018)+(3.027), (I-130)+(2.018)+(3.028), (I-130)+(2.018)+(3.029), (I-130)+(2.018)+(3.030), (I-130)+(2.018)+(3.031), (I-130)+(2.018)+(5.001), (I-130)+(2.018)+(5.002), (I-130)+(2.018)+(5.003), (I-130)+(2.018)+(5.004), (I-130)+(2.018)+(5.005), (I-130)+(2.018)+(5.006), (I-130)+(2.018)+(5.007), (I-130)+(2.018)+(5.008), (I-130)+(2.018)+(5.009), (I-130)+(2.018)+(5.010), (I-130)+(2.018)+(5.011), (I-130)+(2.018)+(5.012), (I-130)+(2.018)+(5.013), (I-130)+(2.018)+(5.014), (I-130)+(2.018)+(5.015), (I-130)+(2.018)+(5.016), (I-130)+(2.018)+(5.017), (I-130)+(2.018)+(5.018), (I-130)+(2.018)+(5.019), (I-130)+(2.018)+(5.020), (I-130)+(2.018)+(5.021), (I-130)+(2.018)+(5.022), (I-130)+(2.018)+(5.023), (I-130)+(2.018)+(6.001), (I-130)+(2.018)+(6.002), (I-130)+(2.018)+(6.003), (I-130)+(2.018)+(6.004), (I-130)+(2.018)+(7.001), (I-130)+(2.018)+(7.002), (I-130)+(2.018)+(7.003), (I-130)+(2.018)+(7.004), (I-130)+(2.018)+(7.005), (I-130)+(2.018)+(7.006), (I-130)+(2.018)+(9.001), (I-130)+(2.018)+(9.002), (I-130)+(2.018)+(9.003), (I-130)+(2.018)+(9.004), (I-130)+(2.018)+(9.005), (I-130)+(2.018)+(9.006), (I-130)+(2.018)+(9.007), (I-130)+(2.018)+(9.008), (I-130)+(2.018)+(9.009), (I-130)+(2.018)+(14.001), (I-130)+(2.018)+(14.002), (I-130)+(2.018)+(15.008), (I-130)+(2.018)+(15.011), (I-130)+(2.018)+(15.012), (I-130)+(2.018)+(15.016), (I-130)+(2.018)+(15.025), (I-130)+(2.018)+(15.027), (I-130)+(2.018)+(15.047), (I-130)+(2.018)+(15.063), (I-130)+(2.018)+(15.064), (I-130)+(2.018)+(16.001), (I-130)+(2.018)+(16.002), (I-130)+(2.018)+(16.003), (I-130)+(2.018)+(16.004), (I-130)+(2.018)+(16.005), (I-130)+(2.018)+(16.006), (I-130)+(2.018)+(16.007), (I-130)+(2.018)+(16.008), (I-130)+(2.018)+(17.001), (I-130)+(2.018)+(17.002), (I-130)+(2.018)+(17.003), (I-130)+(2.018)+(17.004), (I-130)+(2.018)+(17.005), (I-130)+(2.018)+(17.006), (I-130)+(2.018)+(17.007), (I-130)+(2.018)+(17.008), (I-130)+(2.018)+(17.009), (I-130)+(2.018)+(17.010), (I-130)+(2.018)+(17.011), (I-130)+(2.018)+(17.012), (I-130)+(2.018)+(18.001), (I-130)+(2.019)+(3.001), (I-130)+(2.019)+(3.002), (I-130)+(2.019)+(3.003), (I-130)+(2.019)+(3.004), (I-130)+(2.019)+(3.005), (I-130)+(2.019)+(3.006), (I-130)+(2.019)+(3.007), (I-130)+(2.019)+(3.008), (I-130)+(2.019)+(3.009), (I-130)+(2.019)+(3.010), (I-130)+(2.019)+(3.011), (I-130)+(2.019)+(3.012), (I-130)+(2.019)+(3.013), (I-130)+(2.019)+(3.014), (I-130)+(2.019)+(3.015), (I-130)+(2.019)+(3.016), (I-130)+(2.019)+(3.017), (I-130)+(2.019)+(3.018), (I-130)+(2.019)+(3.019), (I-130)+(2.019)+(3.020), (I-130)+(2.019)+(3.021), (I-130)+(2.019)+(3.022), (I-130)+(2.019)+(3.023), (I-130)+(2.019)+(3.024), (I-130)+(2.019)+(3.025), (I-130)+(2.019)+(3.026), (I-130)+(2.019)+(3.027), (I-130)+(2.019)+(3.028), (I-130)+(2.019)+(3.029), (I-130)+(2.019)+(3.030), (I-130)+(2.019)+(3.031), (I-130)+(2.019)+(5.001), (I-130)+(2.019)+(5.002), (I-130)+(2.019)+(5.003), (I-130)+(2.019)+(5.004), (I-130)+(2.019)+(5.005), (I-130)+(2.019)+(5.006), (I-130)+(2.019)+(5.007), (I-130)+(2.019)+(5.008), (I-130)+(2.019)+(5.009), (I-130)+(2.019)+(5.010), (I-130)+(2.019)+(5.011), (I-130)+(2.019)+(5.012), (I-130)+(2.019)+(5.013), (I-130)+(2.019)+(5.014), (I-130)+(2.019)+(5.015), (I-130)+(2.019)+(5.016), (I-130)+(2.019)+(5.017), (I-130)+(2.019)+(5.018), (I-130)+(2.019)+(5.019), (I-130)+(2.019)+(5.020), (I-130)+(2.019)+(5.021), (I-130)+(2.019)+(5.022), (I-130)+(2.019)+(5.023), (I-130)+(2.019)+(6.001), (I-130)+(2.019)+(6.002), (I-130)+(2.019)+(6.003), (I-130)+(2.019)+(6.004), (I-130)+(2.019)+(7.001), (I-130)+(2.019)+(7.002), (I-130)+(2.019)+(7.003), (I-130)+(2.019)+(7.004), (I-130)+(2.019)+(7.005), (I-130)+(2.019)+(7.006), (I-130)+(2.019)+(9.001), (I-130)+(2.019)+(9.002), (I-130)+(2.019)+(9.003), (I-130)+(2.019)+(9.004), (I-130)+(2.019)+(9.005), (I-130)+(2.019)+(9.006), (I-130)+(2.019)+(9.007), (I-130)+(2.019)+(9.008), (I-130)+(2.019)+(9.009), (I-130)+(2.019)+(14.001), (I-130)+(2.019)+(14.002), (I-130)+(2.019)+(15.008), (I-130)+(2.019)+(15.011), (I-130)+(2.019)+(15.012), (I-130)+(2.019)+(15.016), (I-130)+(2.019)+(15.025), (I-130)+(2.019)+(15.027), (I-130)+(2.019)+(15.047), (I-130)+(2.019)+(15.063), (I-130)+(2.019)+(15.064), (I-130)+(2.019)+(16.001), (I-130)+(2.019)+(16.002), (I-130)+(2.019)+(16.003), (I-130)+(2.019)+(16.004), (I-130)+(2.019)+(16.005), (I-130)+(2.019)+(16.006), (I-130)+(2.019)+(16.007), (I-130)+(2.019)+(16.008), (I-130)+(2.019)+(17.001), (I-130)+(2.019)+(17.002), (I-130)+(2.019)+(17.003), (I-130)+(2.019)+(17.004), (I-130)+(2.019)+(17.005), (I-130)+(2.019)+(17.006), (I-130)+(2.019)+(17.007), (I-130)+(2.019)+(17.008), (I-130)+(2.019)+(17.009), (I-130)+(2.019)+(17.010), (I-130)+(2.019)+(17.011), (I-130)+(2.019)+(17.012), (I-130)+(2.019)+(18.001), (I-130)+(2.020)+(3.001), (I-130)+(2.020)+(3.002), (I-130)+(2.020)+(3.003), (I-130)+(2.020)+(3.004), (I-130)+(2.020)+(3.005), (I-130)+(2.020)+(3.006), (I-130)+(2.020)+(3.007), (I-130)+(2.020)+(3.008), (I-130)+(2.020)+(3.009), (I-130)+(2.020)+(3.010), (I-130)+(2.020)+(3.011), (I-130)+(2.020)+(3.012), (I-130)+(2.020)+(3.013), (I-130)+(2.020)+(3.014), (I-130)+(2.020)+(3.015), (I-130)+(2.020)+(3.016), (I-130)+(2.020)+(3.017), (I-130)+(2.020)+(3.018), (I-130)+(2.020)+(3.019), (I-130)+(2.020)+(3.020), (I-130)+(2.020)+(3.021), (I-130)+(2.020)+(3.022), (I-130)+(2.020)+(3.023), (I-130)+(2.020)+(3.024), (I-130)+(2.020)+(3.025), (I-130)+(2.020)+(3.026), (I-130)+(2.020)+(3.027), (I-130)+(2.020)+(3.028), (I-130)+(2.020)+(3.029), (I-130)+(2.020)+(3.030), (I-130)+(2.020)+(3.031), (I-130)+(2.020)+(5.001), (I-130)+(2.020)+(5.002), (I-130)+(2.020)+(5.003), (I-130)+(2.020)+(5.004), (I-130)+(2.020)+(5.005), (I-130)+(2.020)+(5.006), (I-130)+(2.020)+(5.007), (I-130)+(2.020)+(5.008), (I-130)+(2.020)+(5.009), (I-130)+(2.020)+(5.010), (I-130)+(2.020)+(5.011), (I-130)+(2.020)+(5.012), (I-130)+(2.020)+(5.013), (I-130)+(2.020)+(5.014), (I-130)+(2.020)+(5.015), (I-130)+(2.020)+(5.016), (I-130)+(2.020)+(5.017), (I-130)+(2.020)+(5.018), (I-130)+(2.020)+(5.019), (I-130)+(2.020)+(5.020), (I-130)+(2.020)+(5.021), (I-130)+(2.020)+(5.022), (I-130)+(2.020)+(5.023), (I-130)+(2.020)+(6.001), (I-130)+(2.020)+(6.002), (I-130)+(2.020)+(6.003), (I-130)+(2.020)+(6.004), (I-130)+(2.020)+(7.001), (I-130)+(2.020)+(7.002), (I-130)+(2.020)+(7.003), (I-130)+(2.020)+(7.004), (I-130)+(2.020)+(7.005), (I-130)+(2.020)+(7.006), (I-130)+(2.020)+(9.001), (I-130)+(2.020)+(9.002), (I-130)+(2.020)+(9.003), (I-130)+(2.020)+(9.004), (I-130)+(2.020)+(9.005), (I-130)+(2.020)+(9.006), (I-130)+(2.020)+(9.007), (I-130)+(2.020)+(9.008), (I-130)+(2.020)+(9.009), (I-130)+(2.020)+(14.001), (I-130)+(2.020)+(14.002), (I-130)+(2.020)+(15.008), (I-130)+(2.020)+(15.011), (I-130)+(2.020)+(15.012), (I-130)+(2.020)+(15.016), (I-130)+(2.020)+(15.025), (I-130)+(2.020)+(15.027), (I-130)+(2.020)+(15.047), (I-130)+(2.020)+(15.063), (I-130)+(2.020)+(15.064), (I-130)+(2.020)+(16.001), (I-130)+(2.020)+(16.002), (I-130)+(2.020)+(16.003), (I-130)+(2.020)+(16.004), (I-130)+(2.020)+(16.005), (I-130)+(2.020)+(16.006), (I-130)+(2.020)+(16.007), (I-130)+(2.020)+(16.008), (I-130)+(2.020)+(17.001), (I-130)+(2.020)+(17.002), (I-130)+(2.020)+(17.003), (I-130)+(2.020)+(17.004), (I-130)+(2.020)+(17.005), (I-130)+(2.020)+(17.006), (I-130)+(2.020)+(17.007), (I-130)+(2.020)+(17.008), (I-130)+(2.020)+(17.009), (I-130)+(2.020)+(17.010), (I-130)+(2.020)+(17.011), (I-130)+(2.020)+(17.012), (I-130)+(2.020)+(18.001), (I-130)+(2.021)+(3.001), (I-130)+(2.021)+(3.002), (I-130)+(2.021)+(3.003), (I-130)+(2.021)+(3.004), (I-130)+(2.021)+(3.005), (I-130)+(2.021)+(3.006), (I-130)+(2.021)+(3.007), (I-130)+(2.021)+(3.008), (I-130)+(2.021)+(3.009), (I-130)+(2.021)+(3.010), (I-130)+(2.021)+(3.011), (I-130)+(2.021)+(3.012), (I-130)+(2.021)+(3.013), (I-130)+(2.021)+(3.014), (I-130)+(2.021)+(3.015), (I-130)+(2.021)+(3.016), (I-130)+(2.021)+(3.017), (I-130)+(2.021)+(3.018), (I-130)+(2.021)+(3.019), (I-130)+(2.021)+(3.020), (I-130)+(2.021)+(3.021), (I-130)+(2.021)+(3.022), (I-130)+(2.021)+(3.023), (I-130)+(2.021)+(3.024), (I-130)+(2.021)+(3.025), (I-130)+(2.021)+(3.026), (I-130)+(2.021)+(3.027), (I-130)+(2.021)+(3.028), (I-130)+(2.021)+(3.029), (I-130)+(2.021)+(3.030), (I-130)+(2.021)+(3.031), (I-130)+(2.021)+(5.001), (I-130)+(2.021)+(5.002), (I-130)+(2.021)+(5.003), (I-130)+(2.021)+(5.004), (I-130)+(2.021)+(5.005), (I-130)+(2.021)+(5.006), (I-130)+(2.021)+(5.007), (I-130)+(2.021)+(5.008), (I-130)+(2.021)+(5.009), (I-130)+(2.021)+(5.010), (I-130)+(2.021)+(5.011), (I-130)+(2.021)+(5.012), (I-130)+(2.021)+(5.013), (I-130)+(2.021)+(5.014), (I-130)+(2.021)+(5.015), (I-130)+(2.021)+(5.016), (I-130)+(2.021)+(5.017), (I-130)+(2.021)+(5.018), (I-130)+(2.021)+(5.019), (I-130)+(2.021)+(5.020), (I-130)+(2.021)+(5.021), (I-130)+(2.021)+(5.022), (I-130)+(2.021)+(5.023), (I-130)+(2.021)+(6.001), (I-130)+(2.021)+(6.002), (I-130)+(2.021)+(6.003), (I-130)+(2.021)+(6.004), (I-130)+(2.021)+(7.001), (I-130)+(2.021)+(7.002), (I-130)+(2.021)+(7.003), (I-130)+(2.021)+(7.004), (I-130)+(2.021)+(7.005), (I-130)+(2.021)+(7.006), (I-130)+(2.021)+(9.001), (I-130)+(2.021)+(9.002), (I-130)+(2.021)+(9.003), (I-130)+(2.021)+(9.004), (I-130)+(2.021)+(9.005), (I-130)+(2.021)+(9.006), (I-130)+(2.021)+(9.007), (I-130)+(2.021)+(9.008), (I-130)+(2.021)+(9.009), (I-130)+(2.021)+(14.001), (I-130)+(2.021)+(14.002), (I-130)+(2.021)+(15.008), (I-130)+(2.021)+(15.011), (I-130)+(2.021)+(15.012), (I-130)+(2.021)+(15.016), (I-130)+(2.021)+(15.025), (I-130)+(2.021)+(15.027), (I-130)+(2.021)+(15.047), (I-130)+(2.021)+(15.063), (I-130)+(2.021)+(15.064), (I-130)+(2.021)+(16.001), (I-130)+(2.021)+(16.002), (I-130)+(2.021)+(16.003), (I-130)+(2.021)+(16.004), (I-130)+(2.021)+(16.005), (I-130)+(2.021)+(16.006), (I-130)+(2.021)+(16.007), (I-130)+(2.021)+(16.008), (I-130)+(2.021)+(17.001), (I-130)+(2.021)+(17.002), (I-130)+(2.021)+(17.003), (I-130)+(2.021)+(17.004), (I-130)+(2.021)+(17.005), (I-130)+(2.021)+(17.006), (I-130)+(2.021)+(17.007), (I-130)+(2.021)+(17.008), (I-130)+(2.021)+(17.009), (I-130)+(2.021)+(17.010), (I-130)+(2.021)+(17.011), (I-130)+(2.021)+(17.012), (I-130)+(2.021)+(18.001), (I-130)+(2.022)+(3.001), (I-130)+(2.022)+(3.002), (I-130)+(2.022)+(3.003), (I-130)+(2.022)+(3.004), (I-130)+(2.022)+(3.005), (I-130)+(2.022)+(3.006), (I-130)+(2.022)+(3.007), (I-130)+(2.022)+(3.008), (I-130)+(2.022)+(3.009), (I-130)+(2.022)+(3.010), (I-130)+(2.022)+(3.011), (I-130)+(2.022)+(3.012), (I-130)+(2.022)+(3.013), (I-130)+(2.022)+(3.014), (I-130)+(2.022)+(3.015), (I-130)+(2.022)+(3.016), (I-130)+(2.022)+(3.017), (I-130)+(2.022)+(3.018), (I-130)+(2.022)+(3.019), (I-130)+(2.022)+(3.020), (I-130)+(2.022)+(3.021), (I-130)+(2.022)+(3.022), (I-130)+(2.022)+(3.023), (I-130)+(2.022)+(3.024), (I-130)+(2.022)+(3.025), (I-130)+(2.022)+(3.026), (I-130)+(2.022)+(3.027), (I-130)+(2.022)+(3.028), (I-130)+(2.022)+(3.029), (I-130)+(2.022)+(3.030), (I-130)+(2.022)+(3.031), (I-130)+(2.022)+(5.001), (I-130)+(2.022)+(5.002), (I-130)+(2.022)+(5.003), (I-130)+(2.022)+(5.004), (I-130)+(2.022)+(5.005), (I-130)+(2.022)+(5.006), (I-130)+(2.022)+(5.007), (I-130)+(2.022)+(5.008), (I-130)+(2.022)+(5.009), (I-130)+(2.022)+(5.010), (I-130)+(2.022)+(5.011), (I-130)+(2.022)+(5.012), (I-130)+(2.022)+(5.013), (I-130)+(2.022)+(5.014), (I-130)+(2.022)+(5.015), (I-130)+(2.022)+(5.016), (I-130)+(2.022)+(5.017), (I-130)+(2.022)+(5.018), (I-130)+(2.022)+(5.019), (I-130)+(2.022)+(5.020), (I-130)+(2.022)+(5.021), (I-130)+(2.022)+(5.022), (I-130)+(2.022)+(5.023), (I-130)+(2.022)+(6.001), (I-130)+(2.022)+(6.002), (I-130)+(2.022)+(6.003), (I-130)+(2.022)+(6.004), (I-130)+(2.022)+(7.001), (I-130)+(2.022)+(7.002), (I-130)+(2.022)+(7.003), (I-130)+(2.022)+(7.004), (I-130)+(2.022)+(7.005), (I-130)+(2.022)+(7.006), (I-130)+(2.022)+(9.001), (I-130)+(2.022)+(9.002), (I-130)+(2.022)+(9.003), (I-130)+(2.022)+(9.004), (I-130)+(2.022)+(9.005), (I-130)+(2.022)+(9.006), (I-130)+(2.022)+(9.007), (I-130)+(2.022)+(9.008), (I-130)+(2.022)+(9.009), (I-130)+(2.022)+(14.001), (I-130)+(2.022)+(14.002), (I-130)+(2.022)+(15.008), (I-130)+(2.022)+(15.011), (I-130)+(2.022)+(15.012), (I-130)+(2.022)+(15.016), (I-130)+(2.022)+(15.025), (I-130)+(2.022)+(15.027), (I-130)+(2.022)+(15.047), (I-130)+(2.022)+(15.063), (I-130)+(2.022)+(15.064), (I-130)+(2.022)+(16.001), (I-130)+(2.022)+(16.002), (I-130)+(2.022)+(16.003), (I-130)+(2.022)+(16.004), (I-130)+(2.022)+(16.005), (I-130)+(2.022)+(16.006), (I-130)+(2.022)+(16.007), (I-130)+(2.022)+(16.008), (I-130)+(2.022)+(17.001), (I-130)+(2.022)+(17.002), (I-130)+(2.022)+(17.003), (I-130)+(2.022)+(17.004), (I-130)+(2.022)+(17.005), (I-130)+(2.022)+(17.006), (I-130)+(2.022)+(17.007), (I-130)+(2.022)+(17.008), (I-130)+(2.022)+(17.009), (I-130)+(2.022)+(17.010), (I-130)+(2.022)+(17.011), (I-130)+(2.022)+(17.012), (I-130)+(2.022)+(18.001), (I-130)+(2.023)+(3.001), (I-130)+(2.023)+(3.002), (I-130)+(2.023)+(3.003), (I-130)+(2.023)+(3.004), (I-130)+(2.023)+(3.005), (I-130)+(2.023)+(3.006), (I-130)+(2.023)+(3.007), (I-130)+(2.023)+(3.008), (I-130)+(2.023)+(3.009), (I-130)+(2.023)+(3.010), (I-130)+(2.023)+(3.011), (I-130)+(2.023)+(3.012), (I-130)+(2.023)+(3.013), (I-130)+(2.023)+(3.014), (I-130)+(2.023)+(3.015), (I-130)+(2.023)+(3.016), (I-130)+(2.023)+(3.017), (I-130)+(2.023)+(3.018), (I-130)+(2.023)+(3.019), (I-130)+(2.023)+(3.020), (I-130)+(2.023)+(3.021), (I-130)+(2.023)+(3.022), (I-130)+(2.023)+(3.023), (I-130)+(2.023)+(3.024), (I-130)+(2.023)+(3.025), (I-130)+(2.023)+(3.026), (I-130)+(2.023)+(3.027), (I-130)+(2.023)+(3.028), (I-130)+(2.023)+(3.029), (I-130)+(2.023)+(3.030), (I-130)+(2.023)+(3.031), (I-130)+(2.023)+(5.001), (I-130)+(2.023)+(5.002), (I-130)+(2.023)+(5.003), (I-130)+(2.023)+(5.004), (I-130)+(2.023)+(5.005), (I-130)+(2.023)+(5.006), (I-130)+(2.023)+(5.007), (I-130)+(2.023)+(5.008), (I-130)+(2.023)+(5.009), (I-130)+(2.023)+(5.010), (I-130)+(2.023)+(5.011), (I-130)+(2.023)+(5.012), (I-130)+(2.023)+(5.013), (I-130)+(2.023)+(5.014), (I-130)+(2.023)+(5.015), (I-130)+(2.023)+(5.016), (I-130)+(2.023)+(5.017), (I-130)+(2.023)+(5.018), (I-130)+(2.023)+(5.019), (I-130)+(2.023)+(5.020), (I-130)+(2.023)+(5.021), (I-130)+(2.023)+(5.022), (I-130)+(2.023)+(5.023), (I-130)+(2.023)+(6.001), (I-130)+(2.023)+(6.002), (I-130)+(2.023)+(6.003), (I-130)+(2.023)+(6.004), (I-130)+(2.023)+(7.001), (I-130)+(2.023)+(7.002), (I-130)+(2.023)+(7.003), (I-130)+(2.023)+(7.004), (I-130)+(2.023)+(7.005), (I-130)+(2.023)+(7.006), (I-130)+(2.023)+(9.001), (I-130)+(2.023)+(9.002), (I-130)+(2.023)+(9.003), (I-130)+(2.023)+(9.004), (I-130)+(2.023)+(9.005), (I-130)+(2.023)+(9.006), (I-130)+(2.023)+(9.007), (I-130)+(2.023)+(9.008), (I-130)+(2.023)+(9.009), (I-130)+(2.023)+(14.001), (I-130)+(2.023)+(14.002), (I-130)+(2.023)+(15.008), (I-130)+(2.023)+(15.011), (I-130)+(2.023)+(15.012), (I-130)+(2.023)+(15.016), (I-130)+(2.023)+(15.025), (I-130)+(2.023)+(15.027), (I-130)+(2.023)+(15.047), (I-130)+(2.023)+(15.063), (I-130)+(2.023)+(15.064), (I-130)+(2.023)+(16.001), (I-130)+(2.023)+(16.002), (I-130)+(2.023)+(16.003), (I-130)+(2.023)+(16.004), (I-130)+(2.023)+(16.005), (I-130)+(2.023)+(16.006), (I-130)+(2.023)+(16.007), (I-130)+(2.023)+(16.008), (I-130)+(2.023)+(17.001), (I-130)+(2.023)+(17.002), (I-130)+(2.023)+(17.003), (I-130)+(2.023)+(17.004), (I-130)+(2.023)+(17.005), (I-130)+(2.023)+(17.006), (I-130)+(2.023)+(17.007), (I-130)+(2.023)+(17.008), (I-130)+(2.023)+(17.009), (I-130)+(2.023)+(17.010), (I-130)+(2.023)+(17.011), (I-130)+(2.023)+(17.012), (I-130)+(2.023)+(18.001), (I-130)+(2.024)+(3.001), (I-130)+(2.024)+(3.002), (I-130)+(2.024)+(3.003), (I-130)+(2.024)+(3.004), (I-130)+(2.024)+(3.005), (I-130)+(2.024)+(3.006), (I-130)+(2.024)+(3.007), (I-130)+(2.024)+(3.008), (I-130)+(2.024)+(3.009), (I-130)+(2.024)+(3.010), (I-130)+(2.024)+(3.011), (I-130)+(2.024)+(3.012), (I-130)+(2.024)+(3.013), (I-130)+(2.024)+(3.014), (I-130)+(2.024)+(3.015), (I-130)+(2.024)+(3.016), (I-130)+(2.024)+(3.017), (I-130)+(2.024)+(3.018), (I-130)+(2.024)+(3.019), (I-130)+(2.024)+(3.020), (I-130)+(2.024)+(3.021), (I-130)+(2.024)+(3.022), (I-130)+(2.024)+(3.023), (I-130)+(2.024)+(3.024), (I-130)+(2.024)+(3.025), (I-130)+(2.024)+(3.026), (I-130)+(2.024)+(3.027), (I-130)+(2.024)+(3.028), (I-130)+(2.024)+(3.029), (I-130)+(2.024)+(3.030), (I-130)+(2.024)+(3.031), (I-130)+(2.024)+(5.001), (I-130)+(2.024)+(5.002), (I-130)+(2.024)+(5.003), (I-130)+(2.024)+(5.004), (I-130)+(2.024)+(5.005), (I-130)+(2.024)+(5.006), (I-130)+(2.024)+(5.007), (I-130)+(2.024)+(5.008), (I-130)+(2.024)+(5.009), (I-130)+(2.024)+(5.010), (I-130)+(2.024)+(5.011), (I-130)+(2.024)+(5.012), (I-130)+(2.024)+(5.013), (I-130)+(2.024)+(5.014), (I-130)+(2.024)+(5.015), (I-130)+(2.024)+(5.016), (I-130)+(2.024)+(5.017), (I-130)+(2.024)+(5.018), (I-130)+(2.024)+(5.019), (I-130)+(2.024)+(5.020), (I-130)+(2.024)+(5.021), (I-130)+(2.024)+(5.022), (I-130)+(2.024)+(5.023), (I-130)+(2.024)+(6.001), (I-130)+(2.024)+(6.002), (I-130)+(2.024)+(6.003), (I-130)+(2.024)+(6.004), (I-130)+(2.024)+(7.001), (I-130)+(2.024)+(7.002), (I-130)+(2.024)+(7.003), (I-130)+(2.024)+(7.004), (I-130)+(2.024)+(7.005), (I-130)+(2.024)+(7.006), (I-130)+(2.024)+(9.001), (I-130)+(2.024)+(9.002), (I-130)+(2.024)+(9.003), (I-130)+(2.024)+(9.004), (I-130)+(2.024)+(9.005), (I-130)+(2.024)+(9.006), (I-130)+(2.024)+(9.007), (I-130)+(2.024)+(9.008), (I-130)+(2.024)+(9.009), (I-130)+(2.024)+(14.001), (I-130)+(2.024)+(14.002), (I-130)+(2.024)+(15.008), (I-130)+(2.024)+(15.011), (I-130)+(2.024)+(15.012), (I-130)+(2.024)+(15.016), (I-130)+(2.024)+(15.025), (I-130)+(2.024)+(15.027), (I-130)+(2.024)+(15.047), (I-130)+(2.024)+(15.063), (I-130)+(2.024)+(15.064), (I-130)+(2.024)+(16.001), (I-130)+(2.024)+(16.002), (I-130)+(2.024)+(16.003), (I-130)+(2.024)+(16.004), (I-130)+(2.024)+(16.005), (I-130)+(2.024)+(16.006), (I-130)+(2.024)+(16.007), (I-130)+(2.024)+(16.008), (I-130)+(2.024)+(17.001), (I-130)+(2.024)+(17.002), (I-130)+(2.024)+(17.003), (I-130)+(2.024)+(17.004), (I-130)+(2.024)+(17.005), (I-130)+(2.024)+(17.006), (I-130)+(2.024)+(17.007), (I-130)+(2.024)+(17.008), (I-130)+(2.024)+(17.009), (I-130)+(2.024)+(17.010), (I-130)+(2.024)+(17.011), (I-130)+(2.024)+(17.012), (I-130)+(2.024)+(18.001), (I-130)+(2.025)+(3.001), (I-130)+(2.025)+(3.002), (I-130)+(2.025)+(3.003), (I-130)+(2.025)+(3.004), (I-130)+(2.025)+(3.005), (I-130)+(2.025)+(3.006), (I-130)+(2.025)+(3.007), (I-130)+(2.025)+(3.008), (I-130)+(2.025)+(3.009), (I-130)+(2.025)+(3.010), (I-130)+(2.025)+(3.011), (I-130)+(2.025)+(3.012), (I-130)+(2.025)+(3.013), (I-130)+(2.025)+(3.014), (I-130)+(2.025)+(3.015), (I-130)+(2.025)+(3.016), (I-130)+(2.025)+(3.017), (I-130)+(2.025)+(3.018), (I-130)+(2.025)+(3.019), (I-130)+(2.025)+(3.020), (I-130)+(2.025)+(3.021), (I-130)+(2.025)+(3.022), (I-130)+(2.025)+(3.023), (I-130)+(2.025)+(3.024), (I-130)+(2.025)+(3.025), (I-130)+(2.025)+(3.026), (I-130)+(2.025)+(3.027), (I-130)+(2.025)+(3.028), (I-130)+(2.025)+(3.029), (I-130)+(2.025)+(3.030), (I-130)+(2.025)+(3.031), (I-130)+(2.025)+(5.001), (I-130)+(2.025)+(5.002), (I-130)+(2.025)+(5.003), (I-130)+(2.025)+(5.004), (I-130)+(2.025)+(5.005), (I-130)+(2.025)+(5.006), (I-130)+(2.025)+(5.007), (I-130)+(2.025)+(5.008), (I-130)+(2.025)+(5.009), (I-130)+(2.025)+(5.010), (I-130)+(2.025)+(5.011), (I-130)+(2.025)+(5.012), (I-130)+(2.025)+(5.013), (I-130)+(2.025)+(5.014), (I-130)+(2.025)+(5.015), (I-130)+(2.025)+(5.016), (I-130)+(2.025)+(5.017), (I-130)+(2.025)+(5.018), (I-130)+(2.025)+(5.019), (I-130)+(2.025)+(5.020), (I-130)+(2.025)+(5.021), (I-130)+(2.025)+(5.022), (I-130)+(2.025)+(5.023), (I-130)+(2.025)+(6.001), (I-130)+(2.025)+(6.002), (I-130)+(2.025)+(6.003), (I-130)+(2.025)+(6.004), (I-130)+(2.025)+(7.001), (I-130)+(2.025)+(7.002), (I-130)+(2.025)+(7.003), (I-130)+(2.025)+(7.004), (I-130)+(2.025)+(7.005), (I-130)+(2.025)+(7.006), (I-130)+(2.025)+(9.001), (I-130)+(2.025)+(9.002), (I-130)+(2.025)+(9.003), (I-130)+(2.025)+(9.004), (I-130)+(2.025)+(9.005), (I-130)+(2.025)+(9.006), (I-130)+(2.025)+(9.007), (I-130)+(2.025)+(9.008), (I-130)+(2.025)+(9.009), (I-130)+(2.025)+(14.001), (I-130)+(2.025)+(14.002), (I-130)+(2.025)+(15.008), (I-130)+(2.025)+(15.011), (I-130)+(2.025)+(15.012), (I-130)+(2.025)+(15.016), (I-130)+(2.025)+(15.025), (I-130)+(2.025)+(15.027), (I-130)+(2.025)+(15.047), (I-130)+(2.025)+(15.063), (I-130)+(2.025)+(15.064), (I-130)+(2.025)+(16.001), (I-130)+(2.025)+(16.002), (I-130)+(2.025)+(16.003), (I-130)+(2.025)+(16.004), (I-130)+(2.025)+(16.005), (I-130)+(2.025)+(16.006), (I-130)+(2.025)+(16.007), (I-130)+(2.025)+(16.008), (I-130)+(2.025)+(17.001), (I-130)+(2.025)+(17.002), (I-130)+(2.025)+(17.003), (I-130)+(2.025)+(17.004), (I-130)+(2.025)+(17.005), (I-130)+(2.025)+(17.006), (I-130)+(2.025)+(17.007), (I-130)+(2.025)+(17.008), (I-130)+(2.025)+(17.009), (I-130)+(2.025)+(17.010), (I-130)+(2.025)+(17.011), (I-130)+(2.025)+(17.012), (I-130)+(2.025)+(18.001), (I-130)+(2.026)+(3.001), (I-130)+(2.026)+(3.002), (I-130)+(2.026)+(3.003), (I-130)+(2.026)+(3.004), (I-130)+(2.026)+(3.005), (I-130)+(2.026)+(3.006), (I-130)+(2.026)+(3.007), (I-130)+(2.026)+(3.008), (I-130)+(2.026)+(3.009), (I-130)+(2.026)+(3.010), (I-130)+(2.026)+(3.011), (I-130)+(2.026)+(3.012), (I-130)+(2.026)+(3.013), (I-130)+(2.026)+(3.014), (I-130)+(2.026)+(3.015), (I-130)+(2.026)+(3.016), (I-130)+(2.026)+(3.017), (I-130)+(2.026)+(3.018), (I-130)+(2.026)+(3.019), (I-130)+(2.026)+(3.020), (I-130)+(2.026)+(3.021), (I-130)+(2.026)+(3.022), (I-130)+(2.026)+(3.023), (I-130)+(2.026)+(3.024), (I-130)+(2.026)+(3.025), (I-130)+(2.026)+(3.026), (I-130)+(2.026)+(3.027), (I-130)+(2.026)+(3.028), (I-130)+(2.026)+(3.029), (I-130)+(2.026)+(3.030), (I-130)+(2.026)+(3.031), (I-130)+(2.026)+(5.001), (I-130)+(2.026)+(5.002), (I-130)+(2.026)+(5.003), (I-130)+(2.026)+(5.004), (I-130)+(2.026)+(5.005), (I-130)+(2.026)+(5.006), (I-130)+(2.026)+(5.007), (I-130)+(2.026)+(5.008), (I-130)+(2.026)+(5.009), (I-130)+(2.026)+(5.010), (I-130)+(2.026)+(5.011), (I-130)+(2.026)+(5.012), (I-130)+(2.026)+(5.013), (I-130)+(2.026)+(5.014), (I-130)+(2.026)+(5.015), (I-130)+(2.026)+(5.016), (I-130)+(2.026)+(5.017), (I-130)+(2.026)+(5.018), (I-130)+(2.026)+(5.019), (I-130)+(2.026)+(5.020), (I-130)+(2.026)+(5.021), (I-130)+(2.026)+(5.022), (I-130)+(2.026)+(5.023), (I-130)+(2.026)+(6.001), (I-130)+(2.026)+(6.002), (I-130)+(2.026)+(6.003), (I-130)+(2.026)+(6.004), (I-130)+(2.026)+(7.001), (I-130)+(2.026)+(7.002), (I-130)+(2.026)+(7.003), (I-130)+(2.026)+(7.004), (I-130)+(2.026)+(7.005), (I-130)+(2.026)+(7.006), (I-130)+(2.026)+(9.001), (I-130)+(2.026)+(9.002), (I-130)+(2.026)+(9.003), (I-130)+(2.026)+(9.004), (I-130)+(2.026)+(9.005), (I-130)+(2.026)+(9.006), (I-130)+(2.026)+(9.007), (I-130)+(2.026)+(9.008), (I-130)+(2.026)+(9.009), (I-130)+(2.026)+(14.001), (I-130)+(2.026)+(14.002), (I-130)+(2.026)+(15.008), (I-130)+(2.026)+(15.011), (I-130)+(2.026)+(15.012), (I-130)+(2.026)+(15.016), (I-130)+(2.026)+(15.025), (I-130)+(2.026)+(15.027), (I-130)+(2.026)+(15.047), (I-130)+(2.026)+(15.063), (I-130)+(2.026)+(15.064), (I-130)+(2.026)+(16.001), (I-130)+(2.026)+(16.002), (I-130)+(2.026)+(16.003), (I-130)+(2.026)+(16.004), (I-130)+(2.026)+(16.005), (I-130)+(2.026)+(16.006), (I-130)+(2.026)+(16.007), (I-130)+(2.026)+(16.008), (I-130)+(2.026)+(17.001), (I-130)+(2.026)+(17.002), (I-130)+(2.026)+(17.003), (I-130)+(2.026)+(17.004), (I-130)+(2.026)+(17.005), (I-130)+(2.026)+(17.006), (I-130)+(2.026)+(17.007), (I-130)+(2.026)+(17.008), (I-130)+(2.026)+(17.009), (I-130)+(2.026)+(17.010), (I-130)+(2.026)+(17.011), (I-130)+(2.026)+(17.012), (I-130)+(2.026)+(18.001),
(I-130)+(2.027)+(3.001), (I-130)+(2.027)+(3.002), (I-130)+(2.027)+(3.003), (I-130)+(2.027)+(3.004), (I-130)+(2.027)+(3.005), (I-130)+(2.027)+(3.006), (I-130)+(2.027)+(3.007), (I-130)+(2.027)+(3.008), (I-130)+(2.027)+(3.009), (I-130)+(2.027)+(3.010), (I-130)+(2.027)+(3.011), (I-130)+(2.027)+(3.012), (I-130)+(2.027)+(3.013), (I-130)+(2.027)+(3.014), (I-130)+(2.027)+(3.015), (I-130)+(2.027)+(3.016), (I-130)+(2.027)+(3.017), (I-130)+(2.027)+(3.018), (I-130)+(2.027)+(3.019), (I-130)+(2.027)+(3.020), (I-130)+(2.027)+(3.021), (I-130)+(2.027)+(3.022), (I-130)+(2.027)+(3.023), (I-130)+(2.027)+(3.024), (I-130)+(2.027)+(3.025), (I-130)+(2.027)+(3.026), (I-130)+(2.027)+(3.027), (I-130)+(2.027)+(3.028), (I-130)+(2.027)+(3.029), (I-130)+(2.027)+(3.030), (I-130)+(2.027)+(3.031), (I-130)+(2.027)+(5.001), (I-130)+(2.027)+(5.002), (I-130)+(2.027)+(5.003), (I-130)+(2.027)+(5.004), (I-130)+(2.027)+(5.005), (I-130)+(2.027)+(5.006), (I-130)+(2.027)+(5.007), (I-130)+(2.027)+(5.008), (I-130)+(2.027)+(5.009), (I-130)+(2.027)+(5.010), (I-130)+(2.027)+(5.011), (I-130)+(2.027)+(5.012), (I-130)+(2.027)+(5.013), (I-130)+(2.027)+(5.014), (I-130)+(2.027)+(5.015), (I-130)+(2.027)+(5.016), (I-130)+(2.027)+(5.017), (I-130)+(2.027)+(5.018), (I-130)+(2.027)+(5.019), (I-130)+(2.027)+(5.020), (I-130)+(2.027)+(5.021), (I-130)+(2.027)+(5.022), (I-130)+(2.027)+(5.023), (I-130)+(2.027)+(6.001), (I-130)+(2.027)+(6.002), (I-130)+(2.027)+(6.003), (I-130)+(2.027)+(6.004), (I-130)+(2.027)+(7.001), (I-130)+(2.027)+(7.002), (I-130)+(2.027)+(7.003), (I-130)+(2.027)+(7.004), (I-130)+(2.027)+(7.005), (I-130)+(2.027)+(7.006), (I-130)+(2.027)+(9.001), (I-130)+(2.027)+(9.002), (I-130)+(2.027)+(9.003), (I-130)+(2.027)+(9.004), (I-130)+(2.027)+(9.005), (I-130)+(2.027)+(9.006), (I-130)+(2.027)+(9.007), (I-130)+(2.027)+(9.008), (I-130)+(2.027)+(9.009), (I-130)+(2.027)+(14.001), (I-130)+(2.027)+(14.002), (I-130)+(2.027)+(15.008), (I-130)+(2.027)+(15.011), (I-130)+(2.027)+(15.012), (I-130)+(2.027)+(15.016), (I-130)+(2.027)+(15.025), (I-130)+(2.027)+(15.027), (I-130)+(2.027)+(15.047), (I-130)+(2.027)+(15.063), (I-130)+(2.027)+(15.064), (I-130)+(2.027)+(16.001), (I-130)+(2.027)+(16.002), (I-130)+(2.027)+(16.003), (I-130)+(2.027)+(16.004), (I-130)+(2.027)+(16.005), (I-130)+(2.027)+(16.006), (I-130)+(2.027)+(16.007), (I-130)+(2.027)+(16.008), (I-130)+(2.027)+(17.001), (I-130)+(2.027)+(17.002), (I-130)+(2.027)+(17.003), (I-130)+(2.027)+(17.004), (I-130)+(2.027)+(17.005), (I-130)+(2.027)+(17.006), (I-130)+(2.027)+(17.007), (I-130)+(2.027)+(17.008), (I-130)+(2.027)+(17.009), (I-130)+(2.027)+(17.010), (I-130)+(2.027)+(17.011), (I-130)+(2.027)+(17.012), (I-130)+(2.027)+(18.001),
(I-130)+(2.028)+(3.001), (I-130)+(2.028)+(3.002), (I-130)+(2.028)+(3.003), (I-130)+(2.028)+(3.004), (I-130)+(2.028)+(3.005), (I-130)+(2.028)+(3.006), (I-130)+(2.028)+(3.007), (I-130)+(2.028)+(3.008), (I-130)+(2.028)+(3.009), (I-130)+(2.028)+(3.010), (I-130)+(2.028)+(3.011), (I-130)+(2.028)+(3.012), (I-130)+(2.028)+(3.013), (I-130)+(2.028)+(3.014), (I-130)+(2.028)+(3.015), (I-130)+(2.028)+(3.016), (I-130)+(2.028)+(3.017), (I-130)+(2.028)+(3.018), (I-130)+(2.028)+(3.019), (I-130)+(2.028)+(3.020), (I-130)+(2.028)+(3.021), (I-130)+(2.028)+(3.022), (I-130)+(2.028)+(3.023), (I-130)+(2.028)+(3.024), (I-130)+(2.028)+(3.025), (I-130)+(2.028)+(3.026), (I-130)+(2.028)+(3.027), (I-130)+(2.028)+(3.028), (I-130)+(2.028)+(3.029), (I-130)+(2.028)+(3.030), (I-130)+(2.028)+(3.031), (I-130)+(2.028)+(5.001), (I-130)+(2.028)+(5.002), (I-130)+(2.028)+(5.003), (I-130)+(2.028)+(5.004), (I-130)+(2.028)+(5.005), (I-130)+(2.028)+(5.006), (I-130)+(2.028)+(5.007), (I-130)+(2.028)+(5.008), (I-130)+(2.028)+(5.009), (I-130)+(2.028)+(5.010), (I-130)+(2.028)+(5.011), (I-130)+(2.028)+(5.012), (I-130)+(2.028)+(5.013), (I-130)+(2.028)+(5.014), (I-130)+(2.028)+(5.015), (I-130)+(2.028)+(5.016), (I-130)+(2.028)+(5.017), (I-130)+(2.028)+(5.018), (I-130)+(2.028)+(5.019), (I-130)+(2.028)+(5.020), (I-130)+(2.028)+(5.021), (I-130)+(2.028)+(5.022), (I-130)+(2.028)+(5.023), (I-130)+(2.028)+(6.001), (I-130)+(2.028)+(6.002), (I-130)+(2.028)+(6.003), (I-130)+(2.028)+(6.004), (I-130)+(2.028)+(7.001), (I-130)+(2.028)+(7.002), (I-130)+(2.028)+(7.003), (I-130)+(2.028)+(7.004), (I-130)+(2.028)+(7.005), (I-130)+(2.028)+(7.006), (I-130)+(2.028)+(9.001), (I-130)+(2.028)+(9.002), (I-130)+(2.028)+(9.003), (I-130)+(2.028)+(9.004), (I-130)+(2.028)+(9.005), (I-130)+(2.028)+(9.006), (I-130)+(2.028)+(9.007), (I-130)+(2.028)+(9.008), (I-130)+(2.028)+(9.009), (I-130)+(2.028)+(14.001), (I-130)+(2.028)+(14.002), (I-130)+(2.028)+(15.008), (I-130)+(2.028)+(15.011), (I-130)+(2.028)+(15.012), (I-130)+(2.028)+(15.016), (I-130)+(2.028)+(15.025), (I-130)+(2.028)+(15.027), (I-130)+(2.028)+(15.047), (I-130)+(2.028)+(15.063), (I-130)+(2.028)+(15.064), (I-130)+(2.028)+(16.001), (I-130)+(2.028)+(16.002), (I-130)+(2.028)+(16.003), (I-130)+(2.028)+(16.004), (I-130)+(2.028)+(16.005), (I-130)+(2.028)+(16.006), (I-130)+(2.028)+(16.007), (I-130)+(2.028)+(16.008), (I-130)+(2.028)+(17.001), (I-130)+(2.028)+(17.002), (I-130)+(2.028)+(17.003), (I-130)+(2.028)+(17.004), (I-130)+(2.028)+(17.005), (I-130)+(2.028)+(17.006), (I-130)+(2.028)+(17.007), (I-130)+(2.028)+(17.008), (I-130)+(2.028)+(17.009), (I-130)+(2.028)+(17.010), (I-130)+(2.028)+(17.011), (I-130)+(2.028)+(17.012), (I-130)+(2.028)+(18.001),
(I-130)+(2.029)+(3.001), (I-130)+(2.029)+(3.002), (I-130)+(2.029)+(3.003), (I-130)+(2.029)+(3.004), (I-130)+(2.029)+(3.005), (I-130)+(2.029)+(3.006), (I-130)+(2.029)+(3.007), (I-130)+(2.029)+(3.008), (I-130)+(2.029)+(3.009), (I-130)+(2.029)+(3.010), (I-130)+(2.029)+(3.011), (I-130)+(2.029)+(3.012), (I-130)+(2.029)+(3.013), (I-130)+(2.029)+(3.014), (I-130)+(2.029)+(3.015), (I-130)+(2.029)+(3.016), (I-130)+(2.029)+(3.017), (I-130)+(2.029)+(3.018), (I-130)+(2.029)+(3.019), (I-130)+(2.029)+(3.020), (I-130)+(2.029)+(3.021), (I-130)+(2.029)+(3.022), (I-130)+(2.029)+(3.023), (I-130)+(2.029)+(3.024), (I-130)+(2.029)+(3.025), (I-130)+(2.029)+(3.026), (I-130)+(2.029)+(3.027), (I-130)+(2.029)+(3.028), (I-130)+(2.029)+(3.029), (I-130)+(2.029)+(3.030), (I-130)+(2.029)+(3.031), (I-130)+(2.029)+(5.001), (I-130)+(2.029)+(5.002), (I-130)+(2.029)+(5.003), (I-130)+(2.029)+(5.004), (I-130)+(2.029)+(5.005), (I-130)+(2.029)+(5.006), (I-130)+(2.029)+(5.007), (I-130)+(2.029)+(5.008), (I-130)+(2.029)+(5.009), (I-130)+(2.029)+(5.010), (I-130)+(2.029)+(5.011), (I-130)+(2.029)+(5.012), (I-130)+(2.029)+(5.013), (I-130)+(2.029)+(5.014), (I-130)+(2.029)+(5.015), (I-130)+(2.029)+(5.016), (I-130)+(2.029)+(5.017), (I-130)+(2.029)+(5.018), (I-130)+(2.029)+(5.019), (I-130)+(2.029)+(5.020), (I-130)+(2.029)+(5.021), (I-130)+(2.029)+(5.022), (I-130)+(2.029)+(5.023), (I-130)+(2.029)+(6.001), (I-130)+(2.029)+(6.002), (I-130)+(2.029)+(6.003), (I-130)+(2.029)+(6.004), (I-130)+(2.029)+(7.001), (I-130)+(2.029)+(7.002), (I-130)+(2.029)+(7.003), (I-130)+(2.029)+(7.004), (I-130)+(2.029)+(7.005), (I-130)+(2.029)+(7.006), (I-130)+(2.029)+(9.001), (I-130)+(2.029)+(9.002), (I-130)+(2.029)+(9.003), (I-130)+(2.029)+(9.004), (I-130)+(2.029)+(9.005), (I-130)+(2.029)+(9.006), (I-130)+(2.029)+(9.007), (I-130)+(2.029)+(9.008), (I-130)+(2.029)+(9.009), (I-130)+(2.029)+(14.001), (I-130)+(2.029)+(14.002), (I-130)+(2.029)+(15.008), (I-130)+(2.029)+(15.011), (I-130)+(2.029)+(15.012), (I-130)+(2.029)+(15.016), (I-130)+(2.029)+(15.025), (I-130)+(2.029)+(15.027), (I-130)+(2.029)+(15.047), (I-130)+(2.029)+(15.063), (I-130)+(2.029)+(15.064), (I-130)+(2.029)+(16.001), (I-130)+(2.029)+(16.002), (I-130)+(2.029)+(16.003), (I-130)+(2.029)+(16.004), (I-130)+(2.029)+(16.005), (I-130)+(2.029)+(16.006), (I-130)+(2.029)+(16.007), (I-130)+(2.029)+(16.008), (I-130)+(2.029)+(17.001), (I-130)+(2.029)+(17.002), (I-130)+(2.029)+(17.003), (I-130)+(2.029)+(17.004), (I-130)+(2.029)+(17.005), (I-130)+(2.029)+(17.006), (I-130)+(2.029)+(17.007), (I-130)+(2.029)+(17.008), (I-130)+(2.029)+(17.009), (I-130)+(2.029)+(17.010), (I-130)+(2.029)+(17.011), (I-130)+(2.029)+(17.012), (I-130)+(2.029)+(18.001), (I-130)+(2.030)+(3.001), (I-130)+(2.030)+(3.002), (I-130)+(2.030)+(3.003), (I-130)+(2.030)+(3.004), (I-130)+(2.030)+(3.005), (I-130)+(2.030)+(3.006), (I-130)+(2.030)+(3.007), (I-130)+(2.030)+(3.008), (I-130)+(2.030)+(3.009), (I-130)+(2.030)+(3.010), (I-130)+(2.030)+(3.011), (I-130)+(2.030)+(3.012), (I-130)+(2.030)+(3.013), (I-130)+(2.030)+(3.014), (I-130)+(2.030)+(3.015), (I-130)+(2.030)+(3.016), (I-130)+(2.030)+(3.017), (I-130)+(2.030)+(3.018), (I-130)+(2.030)+(3.019), (I-130)+(2.030)+(3.020), (I-130)+(2.030)+(3.021), (I-130)+(2.030)+(3.022), (I-130)+(2.030)+(3.023), (I-130)+(2.030)+(3.024), (I-130)+(2.030)+(3.025), (I-130)+(2.030)+(3.026), (I-130)+(2.030)+(3.027), (I-130)+(2.030)+(3.028), (I-130)+(2.030)+(3.029), (I-130)+(2.030)+(3.030), (I-130)+(2.030)+(3.031), (I-130)+(2.030)+(5.001), (I-130)+(2.030)+(5.002), (I-130)+(2.030)+(5.003), (I-130)+(2.030)+(5.004), (I-130)+(2.030)+(5.005), (I-130)+(2.030)+(5.006), (I-130)+(2.030)+(5.007), (I-130)+(2.030)+(5.008), (I-130)+(2.030)+(5.009), (I-130)+(2.030)+(5.010), (I-130)+(2.030)+(5.011), (I-130)+(2.030)+(5.012), (I-130)+(2.030)+(5.013), (I-130)+(2.030)+(5.014), (I-130)+(2.030)+(5.015), (I-130)+(2.030)+(5.016), (I-130)+(2.030)+(5.017), (I-130)+(2.030)+(5.018), (I-130)+(2.030)+(5.019), (I-130)+(2.030)+(5.020), (I-130)+(2.030)+(5.021), (I-130)+(2.030)+(5.022), (I-130)+(2.030)+(5.023), (I-130)+(2.030)+(6.001), (I-130)+(2.030)+(6.002), (I-130)+(2.030)+(6.003), (I-130)+(2.030)+(6.004), (I-130)+(2.030)+(7.001), (I-130)+(2.030)+(7.002), (I-130)+(2.030)+(7.003), (I-130)+(2.030)+(7.004), (I-130)+(2.030)+(7.005), (I-130)+(2.030)+(7.006), (I-130)+(2.030)+(9.001), (I-130)+(2.030)+(9.002), (I-130)+(2.030)+(9.003), (I-130)+(2.030)+(9.004), (I-130)+(2.030)+(9.005), (I-130)+(2.030)+(9.006), (I-130)+(2.030)+(9.007), (I-130)+(2.030)+(9.008), (I-130)+(2.030)+(9.009), (I-130)+(2.030)+(14.001), (I-130)+(2.030)+(14.002), (I-130)+(2.030)+(15.008), (I-130)+(2.030)+(15.011), (I-130)+(2.030)+(15.012), (I-130)+(2.030)+(15.016), (I-130)+(2.030)+(15.025), (I-130)+(2.030)+(15.027), (I-130)+(2.030)+(15.047), (I-130)+(2.030)+(15.063), (I-130)+(2.030)+(15.064), (I-130)+(2.030)+(16.001), (I-130)+(2.030)+(16.002), (I-130)+(2.030)+(16.003), (I-130)+(2.030)+(16.004), (I-130)+(2.030)+(16.005), (I-130)+(2.030)+(16.006), (I-130)+(2.030)+(16.007), (I-130)+(2.030)+(16.008), (I-130)+(2.030)+(17.001), (I-130)+(2.030)+(17.002), (I-130)+(2.030)+(17.003), (I-130)+(2.030)+(17.004), (I-130)+(2.030)+(17.005), (I-130)+(2.030)+(17.006), (I-130)+(2.030)+(17.007), (I-130)+(2.030)+(17.008), (I-130)+(2.030)+(17.009), (I-130)+(2.030)+(17.010), (I-130)+(2.030)+(17.011), (I-130)+(2.030)+(17.012), (I-130)+(2.030)+(18.001), (I-130)+(2.031)+(3.001), (I-130)+(2.031)+(3.002), (I-130)+(2.031)+(3.003), (I-130)+(2.031)+(3.004), (I-130)+(2.031)+(3.005), (I-130)+(2.031)+(3.006), (I-130)+(2.031)+(3.007), (I-130)+(2.031)+(3.008), (I-130)+(2.031)+(3.009), (I-130)+(2.031)+(3.010), (I-130)+(2.031)+(3.011), (I-130)+(2.031)+(3.012), (I-130)+(2.031)+(3.013), (I-130)+(2.031)+(3.014), (I-130)+(2.031)+(3.015), (I-130)+(2.031)+(3.016), (I-130)+(2.031)+(3.017), (I-130)+(2.031)+(3.018), (I-130)+(2.031)+(3.019), (I-130)+(2.031)+(3.020), (I-130)+(2.031)+(3.021), (I-130)+(2.031)+(3.022), (I-130)+(2.031)+(3.023), (I-130)+(2.031)+(3.024), (I-130)+(2.031)+(3.025), (I-130)+(2.031)+(3.026), (I-130)+(2.031)+(3.027), (I-130)+(2.031)+(3.028), (I-130)+(2.031)+(3.029), (I-130)+(2.031)+(3.030), (I-130)+(2.031)+(3.031), (I-130)+(2.031)+(5.001), (I-130)+(2.031)+(5.002), (I-130)+(2.031)+(5.003), (I-130)+(2.031)+(5.004), (I-130)+(2.031)+(5.005), (I-130)+(2.031)+(5.006), (I-130)+(2.031)+(5.007), (I-130)+(2.031)+(5.008), (I-130)+(2.031)+(5.009), (I-130)+(2.031)+(5.010), (I-130)+(2.031)+(5.011), (I-130)+(2.031)+(5.012), (I-130)+(2.031)+(5.013), (I-130)+(2.031)+(5.014), (I-130)+(2.031)+(5.015), (I-130)+(2.031)+(5.016), (I-130)+(2.031)+(5.017), (I-130)+(2.031)+(5.018), (I-130)+(2.031)+(5.019), (I-130)+(2.031)+(5.020), (I-130)+(2.031)+(5.021), (I-130)+(2.031)+(5.022), (I-130)+(2.031)+(5.023), (I-130)+(2.031)+(6.001), (I-130)+(2.031)+(6.002), (I-130)+(2.031)+(6.003), (I-130)+(2.031)+(6.004), (I-130)+(2.031)+(7.001), (I-130)+(2.031)+(7.002), (I-130)+(2.031)+(7.003), (I-130)+(2.031)+(7.004), (I-130)+(2.031)+(7.005), (I-130)+(2.031)+(7.006), (I-130)+(2.031)+(9.001), (I-130)+(2.031)+(9.002), (I-130)+(2.031)+(9.003), (I-130)+(2.031)+(9.004), (I-130)+(2.031)+(9.005), (I-130)+(2.031)+(9.006), (I-130)+(2.031)+(9.007), (I-130)+(2.031)+(9.008), (I-130)+(2.031)+(9.009), (I-130)+(2.031)+(14.001), (I-130)+(2.031)+(14.002), (I-130)+(2.031)+(15.008), (I-130)+(2.031)+(15.011), (I-130)+(2.031)+(15.012), (I-130)+(2.031)+(15.016), (I-130)+(2.031)+(15.025), (I-130)+(2.031)+(15.027), (I-130)+(2.031)+(15.047), (I-130)+(2.031)+(15.063), (I-130)+(2.031)+(15.064), (I-130)+(2.031)+(16.001), (I-130)+(2.031)+(16.002), (I-130)+(2.031)+(16.003), (I-130)+(2.031)+(16.004), (I-130)+(2.031)+(16.005), (I-130)+(2.031)+(16.006), (I-130)+(2.031)+(16.007), (I-130)+(2.031)+(16.008), (I-130)+(2.031)+(17.001), (I-130)+(2.031)+(17.002), (I-130)+(2.031)+(17.003), (I-130)+(2.031)+(17.004), (I-130)+(2.031)+(17.005), (I-130)+(2.031)+(17.006), (I-130)+(2.031)+(17.007), (I-130)+(2.031)+(17.008), (I-130)+(2.031)+(17.009), (I-130)+(2.031)+(17.010), (I-130)+(2.031)+(17.011), (I-130)+(2.031)+(17.012), (I-130)+(2.031)+(18.001), (I-130)+(2.032)+(3.001), (I-130)+(2.032)+(3.002), (I-130)+(2.032)+(3.003), (I-130)+(2.032)+(3.004), (I-130)+(2.032)+(3.005), (I-130)+(2.032)+(3.006), (I-130)+(2.032)+(3.007), (I-130)+(2.032)+(3.008), (I-130)+(2.032)+(3.009), (I-130)+(2.032)+(3.010), (I-130)+(2.032)+(3.011), (I-130)+(2.032)+(3.012), (I-130)+(2.032)+(3.013), (I-130)+(2.032)+(3.014), (I-130)+(2.032)+(3.015), (I-130)+(2.032)+(3.016), (I-130)+(2.032)+(3.017), (I-130)+(2.032)+(3.018), (I-130)+(2.032)+(3.019), (I-130)+(2.032)+(3.020), (I-130)+(2.032)+(3.021), (I-130)+(2.032)+(3.022), (I-130)+(2.032)+(3.023), (I-130)+(2.032)+(3.024), (I-130)+(2.032)+(3.025), (I-130)+(2.032)+(3.026), (I-130)+(2.032)+(3.027), (I-130)+(2.032)+(3.028), (I-130)+(2.032)+(3.029), (I-130)+(2.032)+(3.030), (I-130)+(2.032)+(3.031), (I-130)+(2.032)+(5.001), (I-130)+(2.032)+(5.002), (I-130)+(2.032)+(5.003), (I-130)+(2.032)+(5.004), (I-130)+(2.032)+(5.005), (I-130)+(2.032)+(5.006), (I-130)+(2.032)+(5.007), (I-130)+(2.032)+(5.008), (I-130)+(2.032)+(5.009), (I-130)+(2.032)+(5.010), (I-130)+(2.032)+(5.011), (I-130)+(2.032)+(5.012), (I-130)+(2.032)+(5.013), (I-130)+(2.032)+(5.014), (I-130)+(2.032)+(5.015), (I-130)+(2.032)+(5.016), (I-130)+(2.032)+(5.017), (I-130)+(2.032)+(5.018), (I-130)+(2.032)+(5.019), (I-130)+(2.032)+(5.020), (I-130)+(2.032)+(5.021), (I-130)+(2.032)+(5.022), (I-130)+(2.032)+(5.023), (I-130)+(2.032)+(6.001), (I-130)+(2.032)+(6.002), (I-130)+(2.032)+(6.003), (I-130)+(2.032)+(6.004), (I-130)+(2.032)+(7.001), (I-130)+(2.032)+(7.002), (I-130)+(2.032)+(7.003), (I-130)+(2.032)+(7.004), (I-130)+(2.032)+(7.005), (I-130)+(2.032)+(7.006), (I-130)+(2.032)+(9.001), (I-130)+(2.032)+(9.002), (I-130)+(2.032)+(9.003), (I-130)+(2.032)+(9.004), (I-130)+(2.032)+(9.005), (I-130)+(2.032)+(9.006), (I-130)+(2.032)+(9.007), (I-130)+(2.032)+(9.008), (I-130)+(2.032)+(9.009), (I-130)+(2.032)+(14.001), (I-130)+(2.032)+(14.002), (I-130)+(2.032)+(15.008), (I-130)+(2.032)+(15.011), (I-130)+(2.032)+(15.012), (I-130)+(2.032)+(15.016), (I-130)+(2.032)+(15.025), (I-130)+(2.032)+(15.027), (I-130)+(2.032)+(15.047), (I-130)+(2.032)+(15.063), (I-130)+(2.032)+(15.064), (I-130)+(2.032)+(16.001), (I-130)+(2.032)+(16.002), (I-130)+(2.032)+(16.003), (I-130)+(2.032)+(16.004), (I-130)+(2.032)+(16.005), (I-130)+(2.032)+(16.006), (I-130)+(2.032)+(16.007), (I-130)+(2.032)+(16.008), (I-130)+(2.032)+(17.001), (I-130)+(2.032)+(17.002), (I-130)+(2.032)+(17.003), (I-130)+(2.032)+(17.004), (I-130)+(2.032)+(17.005), (I-130)+(2.032)+(17.006), (I-130)+(2.032)+(17.007), (I-130)+(2.032)+(17.008), (I-130)+(2.032)+(17.009), (I-130)+(2.032)+(17.010), (I-130)+(2.032)+(17.011), (I-130)+(2.032)+(17.012), (I-130)+(2.032)+(18.001), (I-130)+(2.033)+(3.001), (I-130)+(2.033)+(3.002), (I-130)+(2.033)+(3.003), (I-130)+(2.033)+(3.004), (I-130)+(2.033)+(3.005), (I-130)+(2.033)+(3.006), (I-130)+(2.033)+(3.007), (I-130)+(2.033)+(3.008), (I-130)+(2.033)+(3.009), (I-130)+(2.033)+(3.010), (I-130)+(2.033)+(3.011), (I-130)+(2.033)+(3.012), (I-130)+(2.033)+(3.013), (I-130)+(2.033)+(3.014), (I-130)+(2.033)+(3.015), (I-130)+(2.033)+(3.016), (I-130)+(2.033)+(3.017), (I-130)+(2.033)+(3.018), (I-130)+(2.033)+(3.019), (I-130)+(2.033)+(3.020), (I-130)+(2.033)+(3.021), (I-130)+(2.033)+(3.022), (I-130)+(2.033)+(3.023), (I-130)+(2.033)+(3.024), (I-130)+(2.033)+(3.025), (I-130)+(2.033)+(3.026), (I-130)+(2.033)+(3.027), (I-130)+(2.033)+(3.028), (I-130)+(2.033)+(3.029), (I-130)+(2.033)+(3.030), (I-130)+(2.033)+(3.031), (I-130)+(2.033)+(5.001), (I-130)+(2.033)+(5.002), (I-130)+(2.033)+(5.003), (I-130)+(2.033)+(5.004), (I-130)+(2.033)+(5.005), (I-130)+(2.033)+(5.006), (I-130)+(2.033)+(5.007), (I-130)+(2.033)+(5.008), (I-130)+(2.033)+(5.009), (I-130)+(2.033)+(5.010), (I-130)+(2.033)+(5.011), (I-130)+(2.033)+(5.012), (I-130)+(2.033)+(5.013), (I-130)+(2.033)+(5.014), (I-130)+(2.033)+(5.015), (I-130)+(2.033)+(5.016), (I-130)+(2.033)+(5.017), (I-130)+(2.033)+(5.018), (I-130)+(2.033)+(5.019), (I-130)+(2.033)+(5.020), (I-130)+(2.033)+(5.021), (I-130)+(2.033)+(5.022), (I-130)+(2.033)+(5.023), (I-130)+(2.033)+(6.001), (I-130)+(2.033)+(6.002), (I-130)+(2.033)+(6.003), (I-130)+(2.033)+(6.004), (I-130)+(2.033)+(7.001), (I-130)+(2.033)+(7.002), (I-130)+(2.033)+(7.003), (I-130)+(2.033)+(7.004), (I-130)+(2.033)+(7.005), (I-130)+(2.033)+(7.006), (I-130)+(2.033)+(9.001), (I-130)+(2.033)+(9.002), (I-130)+(2.033)+(9.003), (I-130)+(2.033)+(9.004), (I-130)+(2.033)+(9.005), (I-130)+(2.033)+(9.006), (I-130)+(2.033)+(9.007), (I-130)+(2.033)+(9.008), (I-130)+(2.033)+(9.009), (I-130)+(2.033)+(14.001), (I-130)+(2.033)+(14.002), (I-130)+(2.033)+(15.008), (I-130)+(2.033)+(15.011), (I-130)+(2.033)+(15.012), (I-130)+(2.033)+(15.016), (I-130)+(2.033)+(15.025), (I-130)+(2.033)+(15.027), (I-130)+(2.033)+(15.047), (I-130)+(2.033)+(15.063), (I-130)+(2.033)+(15.064), (I-130)+(2.033)+(16.001), (I-130)+(2.033)+(16.002), (I-130)+(2.033)+(16.003), (I-130)+(2.033)+(16.004), (I-130)+(2.033)+(16.005), (I-130)+(2.033)+(16.006), (I-130)+(2.033)+(16.007), (I-130)+(2.033)+(16.008), (I-130)+(2.033)+(17.001), (I-130)+(2.033)+(17.002), (I-130)+(2.033)+(17.003), (I-130)+(2.033)+(17.004), (I-130)+(2.033)+(17.005), (I-130)+(2.033)+(17.006), (I-130)+(2.033)+(17.007), (I-130)+(2.033)+(17.008), (I-130)+(2.033)+(17.009), (I-130)+(2.033)+(17.010), (I-130)+(2.033)+(17.011), (I-130)+(2.033)+(17.012), (I-130)+(2.033)+(18.001), (I-130)+(2.034)+(3.001), (I-130)+(2.034)+(3.002), (I-130)+(2.034)+(3.003), (I-130)+(2.034)+(3.004), (I-130)+(2.034)+(3.005), (I-130)+(2.034)+(3.006), (I-130)+(2.034)+(3.007), (I-130)+(2.034)+(3.008), (I-130)+(2.034)+(3.009), (I-130)+(2.034)+(3.010), (I-130)+(2.034)+(3.011), (I-130)+(2.034)+(3.012), (I-130)+(2.034)+(3.013), (I-130)+(2.034)+(3.014), (I-130)+(2.034)+(3.015), (I-130)+(2.034)+(3.016), (I-130)+(2.034)+(3.017), (I-130)+(2.034)+(3.018), (I-130)+(2.034)+(3.019), (I-130)+(2.034)+(3.020), (I-130)+(2.034)+(3.021), (I-130)+(2.034)+(3.022), (I-130)+(2.034)+(3.023), (I-130)+(2.034)+(3.024), (I-130)+(2.034)+(3.025), (I-130)+(2.034)+(3.026), (I-130)+(2.034)+(3.027), (I-130)+(2.034)+(3.028), (I-130)+(2.034)+(3.029), (I-130)+(2.034)+(3.030), (I-130)+(2.034)+(3.031), (I-130)+(2.034)+(5.001), (I-130)+(2.034)+(5.002), (I-130)+(2.034)+(5.003), (I-130)+(2.034)+(5.004), (I-130)+(2.034)+(5.005), (I-130)+(2.034)+(5.006), (I-130)+(2.034)+(5.007), (I-130)+(2.034)+(5.008), (I-130)+(2.034)+(5.009), (I-130)+(2.034)+(5.010), (I-130)+(2.034)+(5.011), (I-130)+(2.034)+(5.012), (I-130)+(2.034)+(5.013), (I-130)+(2.034)+(5.014), (I-130)+(2.034)+(5.015), (I-130)+(2.034)+(5.016), (I-130)+(2.034)+(5.017), (I-130)+(2.034)+(5.018), (I-130)+(2.034)+(5.019), (I-130)+(2.034)+(5.020), (I-130)+(2.034)+(5.021), (I-130)+(2.034)+(5.022), (I-130)+(2.034)+(5.023), (I-130)+(2.034)+(6.001), (I-130)+(2.034)+(6.002), (I-130)+(2.034)+(6.003), (I-130)+(2.034)+(6.004), (I-130)+(2.034)+(7.001), (I-130)+(2.034)+(7.002), (I-130)+(2.034)+(7.003), (I-130)+(2.034)+(7.004), (I-130)+(2.034)+(7.005), (I-130)+(2.034)+(7.006), (I-130)+(2.034)+(9.001), (I-130)+(2.034)+(9.002), (I-130)+(2.034)+(9.003), (I-130)+(2.034)+(9.004), (I-130)+(2.034)+(9.005), (I-130)+(2.034)+(9.006), (I-130)+(2.034)+(9.007), (I-130)+(2.034)+(9.008), (I-130)+(2.034)+(9.009), (I-130)+(2.034)+(14.001), (I-130)+(2.034)+(14.002), (I-130)+(2.034)+(15.008), (I-130)+(2.034)+(15.011), (I-130)+(2.034)+(15.012), (I-130)+(2.034)+(15.016), (I-130)+(2.034)+(15.025), (I-130)+(2.034)+(15.027), (I-130)+(2.034)+(15.047), (I-130)+(2.034)+(15.063), (I-130)+(2.034)+(15.064), (I-130)+(2.034)+(16.001), (I-130)+(2.034)+(16.002), (I-130)+(2.034)+(16.003), (I-130)+(2.034)+(16.004), (I-130)+(2.034)+(16.005), (I-130)+(2.034)+(16.006), (I-130)+(2.034)+(16.007), (I-130)+(2.034)+(16.008), (I-130)+(2.034)+(17.001), (I-130)+(2.034)+(17.002), (I-130)+(2.034)+(17.003), (I-130)+(2.034)+(17.004), (I-130)+(2.034)+(17.005), (I-130)+(2.034)+(17.006), (I-130)+(2.034)+(17.007), (I-130)+(2.034)+(17.008), (I-130)+(2.034)+(17.009), (I-130)+(2.034)+(17.010), (I-130)+(2.034)+(17.011), (I-130)+(2.034)+(17.012), (I-130)+(2.034)+(18.001), (I-130)+(2.035)+(3.001), (I-130)+(2.035)+(3.002), (I-130)+(2.035)+(3.003), (I-130)+(2.035)+(3.004), (I-130)+(2.035)+(3.005), (I-130)+(2.035)+(3.006), (I-130)+(2.035)+(3.007), (I-130)+(2.035)+(3.008), (I-130)+(2.035)+(3.009), (I-130)+(2.035)+(3.010), (I-130)+(2.035)+(3.011), (I-130)+(2.035)+(3.012), (I-130)+(2.035)+(3.013), (I-130)+(2.035)+(3.014), (I-130)+(2.035)+(3.015), (I-130)+(2.035)+(3.016), (I-130)+(2.035)+(3.017), (I-130)+(2.035)+(3.018), (I-130)+(2.035)+(3.019), (I-130)+(2.035)+(3.020), (I-130)+(2.035)+(3.021), (I-130)+(2.035)+(3.022), (I-130)+(2.035)+(3.023), (I-130)+(2.035)+(3.024), (I-130)+(2.035)+(3.025), (I-130)+(2.035)+(3.026), (I-130)+(2.035)+(3.027), (I-130)+(2.035)+(3.028), (I-130)+(2.035)+(3.029), (I-130)+(2.035)+(3.030), (I-130)+(2.035)+(3.031), (I-130)+(2.035)+(5.001), (I-130)+(2.035)+(5.002), (I-130)+(2.035)+(5.003), (I-130)+(2.035)+(5.004), (I-130)+(2.035)+(5.005), (I-130)+(2.035)+(5.006), (I-130)+(2.035)+(5.007), (I-130)+(2.035)+(5.008), (I-130)+(2.035)+(5.009), (I-130)+(2.035)+(5.010), (I-130)+(2.035)+(5.011), (I-130)+(2.035)+(5.012), (I-130)+(2.035)+(5.013), (I-130)+(2.035)+(5.014), (I-130)+(2.035)+(5.015), (I-130)+(2.035)+(5.016), (I-130)+(2.035)+(5.017), (I-130)+(2.035)+(5.018), (I-130)+(2.035)+(5.019), (I-130)+(2.035)+(5.020), (I-130)+(2.035)+(5.021), (I-130)+(2.035)+(5.022), (I-130)+(2.035)+(5.023), (I-130)+(2.035)+(6.001), (I-130)+(2.035)+(6.002), (I-130)+(2.035)+(6.003), (I-130)+(2.035)+(6.004), (I-130)+(2.035)+(7.001), (I-130)+(2.035)+(7.002), (I-130)+(2.035)+(7.003), (I-130)+(2.035)+(7.004), (I-130)+(2.035)+(7.005), (I-130)+(2.035)+(7.006), (I-130)+(2.035)+(9.001), (I-130)+(2.035)+(9.002), (I-130)+(2.035)+(9.003), (I-130)+(2.035)+(9.004), (I-130)+(2.035)+(9.005), (I-130)+(2.035)+(9.006), (I-130)+(2.035)+(9.007), (I-130)+(2.035)+(9.008), (I-130)+(2.035)+(9.009), (I-130)+(2.035)+(14.001), (I-130)+(2.035)+(14.002), (I-130)+(2.035)+(15.008), (I-130)+(2.035)+(15.011), (I-130)+(2.035)+(15.012), (I-130)+(2.035)+(15.016), (I-130)+(2.035)+(15.025), (I-130)+(2.035)+(15.027), (I-130)+(2.035)+(15.047), (I-130)+(2.035)+(15.063), (I-130)+(2.035)+(15.064), (I-130)+(2.035)+(16.001), (I-130)+(2.035)+(16.002), (I-130)+(2.035)+(16.003), (I-130)+(2.035)+(16.004), (I-130)+(2.035)+(16.005), (I-130)+(2.035)+(16.006), (I-130)+(2.035)+(16.007), (I-130)+(2.035)+(16.008), (I-130)+(2.035)+(17.001), (I-130)+(2.035)+(17.002), (I-130)+(2.035)+(17.003), (I-130)+(2.035)+(17.004), (I-130)+(2.035)+(17.005), (I-130)+(2.035)+(17.006), (I-130)+(2.035)+(17.007), (I-130)+(2.035)+(17.008), (I-130)+(2.035)+(17.009), (I-130)+(2.035)+(17.010), (I-130)+(2.035)+(17.011), (I-130)+(2.035)+(17.012), (I-130)+(2.035)+(18.001), (I-130)+(2.036)+(3.001), (I-130)+(2.036)+(3.002), (I-130)+(2.036)+(3.003), (I-130)+(2.036)+(3.004), (I-130)+(2.036)+(3.005), (I-130)+(2.036)+(3.006), (I-130)+(2.036)+(3.007), (I-130)+(2.036)+(3.008), (I-130)+(2.036)+(3.009), (I-130)+(2.036)+(3.010), (I-130)+(2.036)+(3.011), (I-130)+(2.036)+(3.012), (I-130)+(2.036)+(3.013), (I-130)+(2.036)+(3.014), (I-130)+(2.036)+(3.015), (I-130)+(2.036)+(3.016), (I-130)+(2.036)+(3.017), (I-130)+(2.036)+(3.018), (I-130)+(2.036)+(3.019), (I-130)+(2.036)+(3.020), (I-130)+(2.036)+(3.021), (I-130)+(2.036)+(3.022), (I-130)+(2.036)+(3.023), (I-130)+(2.036)+(3.024), (I-130)+(2.036)+(3.025), (I-130)+(2.036)+(3.026), (I-130)+(2.036)+(3.027), (I-130)+(2.036)+(3.028), (I-130)+(2.036)+(3.029), (I-130)+(2.036)+(3.030), (I-130)+(2.036)+(3.031), (I-130)+(2.036)+(5.001), (I-130)+(2.036)+(5.002), (I-130)+(2.036)+(5.003), (I-130)+(2.036)+(5.004), (I-130)+(2.036)+(5.005), (I-130)+(2.036)+(5.006), (I-130)+(2.036)+(5.007), (I-130)+(2.036)+(5.008), (I-130)+(2.036)+(5.009), (I-130)+(2.036)+(5.010), (I-130)+(2.036)+(5.011), (I-130)+(2.036)+(5.012), (I-130)+(2.036)+(5.013), (I-130)+(2.036)+(5.014), (I-130)+(2.036)+(5.015), (I-130)+(2.036)+(5.016), (I-130)+(2.036)+(5.017), (I-130)+(2.036)+(5.018), (I-130)+(2.036)+(5.019), (I-130)+(2.036)+(5.020), (I-130)+(2.036)+(5.021), (I-130)+(2.036)+(5.022), (I-130)+(2.036)+(5.023), (I-130)+(2.036)+(6.001), (I-130)+(2.036)+(6.002), (I-130)+(2.036)+(6.003), (I-130)+(2.036)+(6.004), (I-130)+(2.036)+(7.001), (I-130)+(2.036)+(7.002), (I-130)+(2.036)+(7.003), (I-130)+(2.036)+(7.004), (I-130)+(2.036)+(7.005), (I-130)+(2.036)+(7.006), (I-130)+(2.036)+(9.001), (I-130)+(2.036)+(9.002), (I-130)+(2.036)+(9.003), (I-130)+(2.036)+(9.004), (I-130)+(2.036)+(9.005), (I-130)+(2.036)+(9.006), (I-130)+(2.036)+(9.007), (I-130)+(2.036)+(9.008), (I-130)+(2.036)+(9.009), (I-130)+(2.036)+(14.001), (I-130)+(2.036)+(14.002), (I-130)+(2.036)+(15.008), (I-130)+(2.036)+(15.011), (I-130)+(2.036)+(15.012), (I-130)+(2.036)+(15.016), (I-130)+(2.036)+(15.025), (I-130)+(2.036)+(15.027), (I-130)+(2.036)+(15.047), (I-130)+(2.036)+(15.063), (I-130)+(2.036)+(15.064), (I-130)+(2.036)+(16.001), (I-130)+(2.036)+(16.002), (I-130)+(2.036)+(16.003), (I-130)+(2.036)+(16.004), (I-130)+(2.036)+(16.005), (I-130)+(2.036)+(16.006), (I-130)+(2.036)+(16.007), (I-130)+(2.036)+(16.008), (I-130)+(2.036)+(17.001), (I-130)+(2.036)+(17.002), (I-130)+(2.036)+(17.003), (I-130)+(2.036)+(17.004), (I-130)+(2.036)+(17.005), (I-130)+(2.036)+(17.006), (I-130)+(2.036)+(17.007), (I-130)+(2.036)+(17.008), (I-130)+(2.036)+(17.009), (I-130)+(2.036)+(17.010), (I-130)+(2.036)+(17.011), (I-130)+(2.036)+(17.012), (I-130)+(2.036)+(18.001), (I-130)+(2.037)+(3.001), (I-130)+(2.037)+(3.002), (I-130)+(2.037)+(3.003), (I-130)+(2.037)+(3.004), (I-130)+(2.037)+(3.005), (I-130)+(2.037)+(3.006), (I-130)+(2.037)+(3.007), (I-130)+(2.037)+(3.008),
(I-130)+(2.037)+(3.009), (I-130)+(2.037)+(3.010),
(I-130)+(2.037)+(3.011), (I-130)+(2.037)+(3.012),
(I-130)+(2.037)+(3.013), (I-130)+(2.037)+(3.014),
(I-130)+(2.037)+(3.015), (I-130)+(2.037)+(3.016),
(I-130)+(2.037)+(3.017), (I-130)+(2.037)+(3.018),
(I-130)+(2.037)+(3.019), (I-130)+(2.037)+(3.020),
(I-130)+(2.037)+(3.021), (I-130)+(2.037)+(3.022),
(I-130)+(2.037)+(3.023), (I-130)+(2.037)+(3.024),
(I-130)+(2.037)+(3.025), (I-130)+(2.037)+(3.026),
(I-130)+(2.037)+(3.027), (I-130)+(2.037)+(3.028),
(I-130)+(2.037)+(3.029), (I-130)+(2.037)+(3.030),
(I-130)+(2.037)+(3.031), (I-130)+(2.037)+(5.001),
(I-130)+(2.037)+(5.002), (I-130)+(2.037)+(5.003),
(I-130)+(2.037)+(5.004), (I-130)+(2.037)+(5.005),
(I-130)+(2.037)+(5.006), (I-130)+(2.037)+(5.007),
(I-130)+(2.037)+(5.008), (I-130)+(2.037)+(5.009),
(I-130)+(2.037)+(5.010), (I-130)+(2.037)+(5.011),
(I-130)+(2.037)+(5.012), (I-130)+(2.037)+(5.013),
(I-130)+(2.037)+(5.014), (I-130)+(2.037)+(5.015),
(I-130)+(2.037)+(5.016), (I-130)+(2.037)+(5.017),
(I-130)+(2.037)+(5.018), (I-130)+(2.037)+(5.019),
(I-130)+(2.037)+(5.020), (I-130)+(2.037)+(5.021),
(I-130)+(2.037)+(5.022), (I-130)+(2.037)+(5.023),
(I-130)+(2.037)+(6.001), (I-130)+(2.037)+(6.002),
(I-130)+(2.037)+(6.003), (I-130)+(2.037)+(6.004),
(I-130)+(2.037)+(7.001), (I-130)+(2.037)+(7.002),
(I-130)+(2.037)+(7.003), (I-130)+(2.037)+(7.004),
(I-130)+(2.037)+(7.005), (I-130)+(2.037)+(7.006),
(I-130)+(2.037)+(9.001), (I-130)+(2.037)+(9.002),
(I-130)+(2.037)+(9.003), (I-130)+(2.037)+(9.004),
(I-130)+(2.037)+(9.005), (I-130)+(2.037)+(9.006),
(I-130)+(2.037)+(9.007), (I-130)+(2.037)+(9.008),
(I-130)+(2.037)+(9.009), (I-130)+(2.037)+(14.001),
(I-130)+(2.037)+(14.002), (I-130)+(2.037)+(15.008),
(I-130)+(2.037)+(15.011), (I-130)+(2.037)+(15.012),
(I-130)+(2.037)+(15.016), (I-130)+(2.037)+(15.025),
(I-130)+(2.037)+(15.027), (I-130)+(2.037)+(15.047),
(I-130)+(2.037)+(15.063), (I-130)+(2.037)+(15.064),
(I-130)+(2.037)+(16.001), (I-130)+(2.037)+(16.002),
(I-130)+(2.037)+(16.003), (I-130)+(2.037)+(16.004),
(I-130)+(2.037)+(16.005), (I-130)+(2.037)+(16.006),
(I-130)+(2.037)+(16.007), (I-130)+(2.037)+(16.008),
(I-130)+(2.037)+(17.001), (I-130)+(2.037)+(17.002),
(I-130)+(2.037)+(17.003), (I-130)+(2.037)+(17.004),
(I-130)+(2.037)+(17.005), (I-130)+(2.037)+(17.006),
(I-130)+(2.037)+(17.007), (I-130)+(2.037)+(17.008),
(I-130)+(2.037)+(17.009), (I-130)+(2.037)+(17.010),
(I-130)+(2.037)+(17.011), (I-130)+(2.037)+(17.012),
(I-130)+(2.037)+(18.001),
(I-130)+(2.038)+(3.001), (I-130)+(2.038)+(3.002),
(I-130)+(2.038)+(3.003), (I-130)+(2.038)+(3.004),
(I-130)+(2.038)+(3.005), (I-130)+(2.038)+(3.006),
(I-130)+(2.038)+(3.007), (I-130)+(2.038)+(3.008),
(I-130)+(2.038)+(3.009), (I-130)+(2.038)+(3.010),
(I-130)+(2.038)+(3.011), (I-130)+(2.038)+(3.012),
(I-130)+(2.038)+(3.013), (I-130)+(2.038)+(3.014),
(I-130)+(2.038)+(3.015), (I-130)+(2.038)+(3.016),
(I-130)+(2.038)+(3.017), (I-130)+(2.038)+(3.018),
(I-130)+(2.038)+(3.019), (I-130)+(2.038)+(3.020),
(I-130)+(2.038)+(3.021), (I-130)+(2.038)+(3.022),
(I-130)+(2.038)+(3.023), (I-130)+(2.038)+(3.024),
(I-130)+(2.038)+(3.025), (I-130)+(2.038)+(3.026),
(I-130)+(2.038)+(3.027), (I-130)+(2.038)+(3.028),
(I-130)+(2.038)+(3.029), (I-130)+(2.038)+(3.030),
(I-130)+(2.038)+(3.031), (I-130)+(2.038)+(5.001),
(I-130)+(2.038)+(5.002), (I-130)+(2.038)+(5.003),
(I-130)+(2.038)+(5.004), (I-130)+(2.038)+(5.005),
(I-130)+(2.038)+(5.006), (I-130)+(2.038)+(5.007),
(I-130)+(2.038)+(5.008), (I-130)+(2.038)+(5.009),
(I-130)+(2.038)+(5.010), (I-130)+(2.038)+(5.011),
(I-130)+(2.038)+(5.012), (I-130)+(2.038)+(5.013),
(I-130)+(2.038)+(5.014), (I-130)+(2.038)+(5.015),
(I-130)+(2.038)+(5.016), (I-130)+(2.038)+(5.017),
(I-130)+(2.038)+(5.018), (I-130)+(2.038)+(5.019),
(I-130)+(2.038)+(5.020), (I-130)+(2.038)+(5.021),
(I-130)+(2.038)+(5.022), (I-130)+(2.038)+(5.023),
(I-130)+(2.038)+(6.001), (I-130)+(2.038)+(6.002),
(I-130)+(2.038)+(6.003), (I-130)+(2.038)+(6.004),
(I-130)+(2.038)+(7.001), (I-130)+(2.038)+(7.002),
(I-130)+(2.038)+(7.003), (I-130)+(2.038)+(7.004),
(I-130)+(2.038)+(7.005), (I-130)+(2.038)+(7.006),
(I-130)+(2.038)+(9.001), (I-130)+(2.038)+(9.002),
(I-130)+(2.038)+(9.003), (I-130)+(2.038)+(9.004),
(I-130)+(2.038)+(9.005), (I-130)+(2.038)+(9.006),
(I-130)+(2.038)+(9.007), (I-130)+(2.038)+(9.008),
(I-130)+(2.038)+(9.009), (I-130)+(2.038)+(14.001),
(I-130)+(2.038)+(14.002), (I-130)+(2.038)+(15.008),
(I-130)+(2.038)+(15.011), (I-130)+(2.038)+(15.012),
(I-130)+(2.038)+(15.016), (I-130)+(2.038)+(15.025),
(I-130)+(2.038)+(15.027), (I-130)+(2.038)+(15.047),
(I-130)+(2.038)+(15.063), (I-130)+(2.038)+(15.064),
(I-130)+(2.038)+(16.001), (I-130)+(2.038)+(16.002),
(I-130)+(2.038)+(16.003), (I-130)+(2.038)+(16.004),
(I-130)+(2.038)+(16.005), (I-130)+(2.038)+(16.006),
(I-130)+(2.038)+(16.007), (I-130)+(2.038)+(16.008),
(I-130)+(2.038)+(17.001), (I-130)+(2.038)+(17.002),
(I-130)+(2.038)+(17.003), (I-130)+(2.038)+(17.004),
(I-130)+(2.038)+(17.005), (I-130)+(2.038)+(17.006),
(I-130)+(2.038)+(17.007), (I-130)+(2.038)+(17.008),
(I-130)+(2.038)+(17.009), (I-130)+(2.038)+(17.010),
(I-130)+(2.038)+(17.011), (I-130)+(2.038)+(17.012),
(I-130)+(2.038)+(18.001),
(I-130)+(2.039)+(3.001), (I-130)+(2.039)+(3.002),
(I-130)+(2.039)+(3.003), (I-130)+(2.039)+(3.004),
(I-130)+(2.039)+(3.005), (I-130)+(2.039)+(3.006),
(I-130)+(2.039)+(3.007), (I-130)+(2.039)+(3.008),
(I-130)+(2.039)+(3.009), (I-130)+(2.039)+(3.010),
(I-130)+(2.039)+(3.011), (I-130)+(2.039)+(3.012),
(I-130)+(2.039)+(3.013), (I-130)+(2.039)+(3.014),
(I-130)+(2.039)+(3.015), (I-130)+(2.039)+(3.016),
(I-130)+(2.039)+(3.017), (I-130)+(2.039)+(3.018),
(I-130)+(2.039)+(3.019), (I-130)+(2.039)+(3.020),
(I-130)+(2.039)+(3.021), (I-130)+(2.039)+(3.022),
(I-130)+(2.039)+(3.023), (I-130)+(2.039)+(3.024),
(I-130)+(2.039)+(3.025), (I-130)+(2.039)+(3.026),
(I-130)+(2.039)+(3.027), (I-130)+(2.039)+(3.028),
(I-130)+(2.039)+(3.029), (I-130)+(2.039)+(3.030),
(I-130)+(2.039)+(3.031), (I-130)+(2.039)+(5.001),
(I-130)+(2.039)+(5.002), (I-130)+(2.039)+(5.003),
(I-130)+(2.039)+(5.004), (I-130)+(2.039)+(5.005),
(I-130)+(2.039)+(5.006), (I-130)+(2.039)+(5.007),
(I-130)+(2.039)+(5.008), (I-130)+(2.039)+(5.009),
(I-130)+(2.039)+(5.010), (I-130)+(2.039)+(5.011),
(I-130)+(2.039)+(5.012), (I-130)+(2.039)+(5.013),
(I-130)+(2.039)+(5.014), (I-130)+(2.039)+(5.015),
(I-130)+(2.039)+(5.016), (I-130)+(2.039)+(5.017),
(I-130)+(2.039)+(5.018), (I-130)+(2.039)+(5.019),
(I-130)+(2.039)+(5.020), (I-130)+(2.039)+(5.021),
(I-130)+(2.039)+(5.022), (I-130)+(2.039)+(5.023),
(I-130)+(2.039)+(6.001), (I-130)+(2.039)+(6.002),
(I-130)+(2.039)+(6.003), (I-130)+(2.039)+(6.004),
(I-130)+(2.039)+(7.001), (I-130)+(2.039)+(7.002),
(I-130)+(2.039)+(7.003), (I-130)+(2.039)+(7.004), (I-130)+(2.039)+(7.005), (I-130)+(2.039)+(7.006), (I-130)+(2.039)+(9.001), (I-130)+(2.039)+(9.002), (I-130)+(2.039)+(9.003), (I-130)+(2.039)+(9.004), (I-130)+(2.039)+(9.005), (I-130)+(2.039)+(9.006), (I-130)+(2.039)+(9.007), (I-130)+(2.039)+(9.008), (I-130)+(2.039)+(9.009), (I-130)+(2.039)+(14.001), (I-130)+(2.039)+(14.002), (I-130)+(2.039)+(15.008), (I-130)+(2.039)+(15.011), (I-130)+(2.039)+(15.012), (I-130)+(2.039)+(15.016), (I-130)+(2.039)+(15.025), (I-130)+(2.039)+(15.027), (I-130)+(2.039)+(15.047), (I-130)+(2.039)+(15.063), (I-130)+(2.039)+(15.064), (I-130)+(2.039)+(16.001), (I-130)+(2.039)+(16.002), (I-130)+(2.039)+(16.003), (I-130)+(2.039)+(16.004), (I-130)+(2.039)+(16.005), (I-130)+(2.039)+(16.006), (I-130)+(2.039)+(16.007), (I-130)+(2.039)+(16.008), (I-130)+(2.039)+(17.001), (I-130)+(2.039)+(17.002), (I-130)+(2.039)+(17.003), (I-130)+(2.039)+(17.004), (I-130)+(2.039)+(17.005), (I-130)+(2.039)+(17.006), (I-130)+(2.039)+(17.007), (I-130)+(2.039)+(17.008), (I-130)+(2.039)+(17.009), (I-130)+(2.039)+(17.010), (I-130)+(2.039)+(17.011), (I-130)+(2.039)+(17.012), (I-130)+(2.039)+(18.001), (I-130)+(2.040)+(3.001), (I-130)+(2.040)+(3.002), (I-130)+(2.040)+(3.003), (I-130)+(2.040)+(3.004), (I-130)+(2.040)+(3.005), (I-130)+(2.040)+(3.006), (I-130)+(2.040)+(3.007), (I-130)+(2.040)+(3.008), (I-130)+(2.040)+(3.009), (I-130)+(2.040)+(3.010), (I-130)+(2.040)+(3.011), (I-130)+(2.040)+(3.012), (I-130)+(2.040)+(3.013), (I-130)+(2.040)+(3.014), (I-130)+(2.040)+(3.015), (I-130)+(2.040)+(3.016), (I-130)+(2.040)+(3.017), (I-130)+(2.040)+(3.018), (I-130)+(2.040)+(3.019), (I-130)+(2.040)+(3.020), (I-130)+(2.040)+(3.021), (I-130)+(2.040)+(3.022), (I-130)+(2.040)+(3.023), (I-130)+(2.040)+(3.024), (I-130)+(2.040)+(3.025), (I-130)+(2.040)+(3.026), (I-130)+(2.040)+(3.027), (I-130)+(2.040)+(3.028), (I-130)+(2.040)+(3.029), (I-130)+(2.040)+(3.030), (I-130)+(2.040)+(3.031), (I-130)+(2.040)+(5.001), (I-130)+(2.040)+(5.002), (I-130)+(2.040)+(5.003), (I-130)+(2.040)+(5.004), (I-130)+(2.040)+(5.005), (I-130)+(2.040)+(5.006), (I-130)+(2.040)+(5.007), (I-130)+(2.040)+(5.008), (I-130)+(2.040)+(5.009), (I-130)+(2.040)+(5.010), (I-130)+(2.040)+(5.011), (I-130)+(2.040)+(5.012), (I-130)+(2.040)+(5.013), (I-130)+(2.040)+(5.014), (I-130)+(2.040)+(5.015), (I-130)+(2.040)+(5.016), (I-130)+(2.040)+(5.017), (I-130)+(2.040)+(5.018), (I-130)+(2.040)+(5.019), (I-130)+(2.040)+(5.020), (I-130)+(2.040)+(5.021), (I-130)+(2.040)+(5.022), (I-130)+(2.040)+(5.023), (I-130)+(2.040)+(6.001), (I-130)+(2.040)+(6.002), (I-130)+(2.040)+(6.003), (I-130)+(2.040)+(6.004), (I-130)+(2.040)+(7.001), (I-130)+(2.040)+(7.002), (I-130)+(2.040)+(7.003), (I-130)+(2.040)+(7.004), (I-130)+(2.040)+(7.005), (I-130)+(2.040)+(7.006), (I-130)+(2.040)+(9.001), (I-130)+(2.040)+(9.002), (I-130)+(2.040)+(9.003), (I-130)+(2.040)+(9.004), (I-130)+(2.040)+(9.005), (I-130)+(2.040)+(9.006), (I-130)+(2.040)+(9.007), (I-130)+(2.040)+(9.008), (I-130)+(2.040)+(9.009), (I-130)+(2.040)+(14.001), (I-130)+(2.040)+(14.002), (I-130)+(2.040)+(15.008), (I-130)+(2.040)+(15.011), (I-130)+(2.040)+(15.012), (I-130)+(2.040)+(15.016), (I-130)+(2.040)+(15.025), (I-130)+(2.040)+(15.027), (I-130)+(2.040)+(15.047), (I-130)+(2.040)+(15.063), (I-130)+(2.040)+(15.064), (I-130)+(2.040)+(16.001), (I-130)+(2.040)+(16.002), (I-130)+(2.040)+(16.003), (I-130)+(2.040)+(16.004), (I-130)+(2.040)+(16.005), (I-130)+(2.040)+(16.006), (I-130)+(2.040)+(16.007), (I-130)+(2.040)+(16.008), (I-130)+(2.040)+(17.001), (I-130)+(2.040)+(17.002), (I-130)+(2.040)+(17.003), (I-130)+(2.040)+(17.004), (I-130)+(2.040)+(17.005), (I-130)+(2.040)+(17.006), (I-130)+(2.040)+(17.007), (I-130)+(2.040)+(17.008), (I-130)+(2.040)+(17.009), (I-130)+(2.040)+(17.010), (I-130)+(2.040)+(17.011), (I-130)+(2.040)+(17.012), (I-130)+(2.040)+(18.001), (I-130)+(2.041)+(3.001), (I-130)+(2.041)+(3.002), (I-130)+(2.041)+(3.003), (I-130)+(2.041)+(3.004), (I-130)+(2.041)+(3.005), (I-130)+(2.041)+(3.006), (I-130)+(2.041)+(3.007), (I-130)+(2.041)+(3.008), (I-130)+(2.041)+(3.009), (I-130)+(2.041)+(3.010), (I-130)+(2.041)+(3.011), (I-130)+(2.041)+(3.012), (I-130)+(2.041)+(3.013), (I-130)+(2.041)+(3.014), (I-130)+(2.041)+(3.015), (I-130)+(2.041)+(3.016), (I-130)+(2.041)+(3.017), (I-130)+(2.041)+(3.018), (I-130)+(2.041)+(3.019), (I-130)+(2.041)+(3.020), (I-130)+(2.041)+(3.021), (I-130)+(2.041)+(3.022), (I-130)+(2.041)+(3.023), (I-130)+(2.041)+(3.024), (I-130)+(2.041)+(3.025), (I-130)+(2.041)+(3.026), (I-130)+(2.041)+(3.027), (I-130)+(2.041)+(3.028), (I-130)+(2.041)+(3.029), (I-130)+(2.041)+(3.030), (I-130)+(2.041)+(3.031), (I-130)+(2.041)+(5.001), (I-130)+(2.041)+(5.002), (I-130)+(2.041)+(5.003), (I-130)+(2.041)+(5.004), (I-130)+(2.041)+(5.005), (I-130)+(2.041)+(5.006), (I-130)+(2.041)+(5.007), (I-130)+(2.041)+(5.008), (I-130)+(2.041)+(5.009), (I-130)+(2.041)+(5.010), (I-130)+(2.041)+(5.011), (I-130)+(2.041)+(5.012), (I-130)+(2.041)+(5.013), (I-130)+(2.041)+(5.014), (I-130)+(2.041)+(5.015), (I-130)+(2.041)+(5.016), (I-130)+(2.041)+(5.017), (I-130)+(2.041)+(5.018), (I-130)+(2.041)+(5.019), (I-130)+(2.041)+(5.020), (I-130)+(2.041)+(5.021), (I-130)+(2.041)+(5.022), (I-130)+(2.041)+(5.023), (I-130)+(2.041)+(6.001), (I-130)+(2.041)+(6.002), (I-130)+(2.041)+(6.003), (I-130)+(2.041)+(6.004), (I-130)+(2.041)+(7.001), (I-130)+(2.041)+(7.002), (I-130)+(2.041)+(7.003), (I-130)+(2.041)+(7.004), (I-130)+(2.041)+(7.005), (I-130)+(2.041)+(7.006), (I-130)+(2.041)+(9.001), (I-130)+(2.041)+(9.002), (I-130)+(2.041)+(9.003), (I-130)+(2.041)+(9.004), (I-130)+(2.041)+(9.005), (I-130)+(2.041)+(9.006), (I-130)+(2.041)+(9.007), (I-130)+(2.041)+(9.008), (I-130)+(2.041)+(9.009), (I-130)+(2.041)+(14.001), (I-130)+(2.041)+(14.002), (I-130)+(2.041)+(15.008), (I-130)+(2.041)+(15.011), (I-130)+(2.041)+(15.012), (I-130)+(2.041)+(15.016), (I-130)+(2.041)+(15.025), (I-130)+(2.041)+(15.027), (I-130)+(2.041)+(15.047), (I-130)+(2.041)+(15.063), (I-130)+(2.041)+(15.064), (I-130)+(2.041)+(16.001), (I-130)+(2.041)+(16.002), (I-130)+(2.041)+(16.003), (I-130)+(2.041)+(16.004), (I-130)+(2.041)+(16.005), (I-130)+(2.041)+(16.006), (I-130)+(2.041)+(16.007), (I-130)+(2.041)+(16.008), (I-130)+(2.041)+(17.001), (I-130)+(2.041)+(17.002), (I-130)+(2.041)+(17.003), (I-130)+(2.041)+(17.004), (I-130)+(2.041)+(17.005), (I-130)+(2.041)+(17.006), (I-130)+(2.041)+(17.007), (I-130)+(2.041)+(17.008), (I-130)+(2.041)+(17.009), (I-130)+(2.041)+(17.010), (I-130)+(2.041)+(17.011), (I-130)+(2.041)+(17.012), (I-130)+(2.041)+(18.001), (I-130)+(2.042)+(3.001), (I-130)+(2.042)+(3.002), (I-130)+(2.042)+(3.003), (I-130)+(2.042)+(3.004), (I-130)+(2.042)+(3.005), (I-130)+(2.042)+(3.006), (I-130)+(2.042)+(3.007), (I-130)+(2.042)+(3.008), (I-130)+(2.042)+(3.009), (I-130)+(2.042)+(3.010), (I-130)+(2.042)+(3.011), (I-130)+(2.042)+(3.012), (I-130)+(2.042)+(3.013), (I-130)+(2.042)+(3.014), (I-130)+(2.042)+(3.015), (I-130)+(2.042)+(3.016), (I-130)+(2.042)+(3.017), (I-130)+(2.042)+(3.018), (I-130)+(2.042)+(3.019), (I-130)+(2.042)+(3.020), (I-130)+(2.042)+(3.021), (I-130)+(2.042)+(3.022), (I-130)+(2.042)+(3.023), (I-130)+(2.042)+(3.024), (I-130)+(2.042)+(3.025), (I-130)+(2.042)+(3.026), (I-130)+(2.042)+(3.027), (I-130)+(2.042)+(3.028), (I-130)+(2.042)+(3.029), (I-130)+(2.042)+(3.030), (I-130)+(2.042)+(3.031), (I-130)+(2.042)+(5.001), (I-130)+(2.042)+(5.002), (I-130)+(2.042)+(5.003), (I-130)+(2.042)+(5.004), (I-130)+(2.042)+(5.005), (I-130)+(2.042)+(5.006), (I-130)+(2.042)+(5.007), (I-130)+(2.042)+(5.008), (I-130)+(2.042)+(5.009), (I-130)+(2.042)+(5.010), (I-130)+(2.042)+(5.011), (I-130)+(2.042)+(5.012), (I-130)+(2.042)+(5.013), (I-130)+(2.042)+(5.014), (I-130)+(2.042)+(5.015), (I-130)+(2.042)+(5.016), (I-130)+(2.042)+(5.017), (I-130)+(2.042)+(5.018), (I-130)+(2.042)+(5.019), (I-130)+(2.042)+(5.020), (I-130)+(2.042)+(5.021), (I-130)+(2.042)+(5.022), (I-130)+(2.042)+(5.023), (I-130)+(2.042)+(6.001), (I-130)+(2.042)+(6.002), (I-130)+(2.042)+(6.003), (I-130)+(2.042)+(6.004), (I-130)+(2.042)+(7.001), (I-130)+(2.042)+(7.002), (I-130)+(2.042)+(7.003), (I-130)+(2.042)+(7.004), (I-130)+(2.042)+(7.005), (I-130)+(2.042)+(7.006), (I-130)+(2.042)+(9.001), (I-130)+(2.042)+(9.002), (I-130)+(2.042)+(9.003), (I-130)+(2.042)+(9.004), (I-130)+(2.042)+(9.005), (I-130)+(2.042)+(9.006), (I-130)+(2.042)+(9.007), (I-130)+(2.042)+(9.008), (I-130)+(2.042)+(9.009), (I-130)+(2.042)+(14.001), (I-130)+(2.042)+(14.002), (I-130)+(2.042)+(15.008), (I-130)+(2.042)+(15.011), (I-130)+(2.042)+(15.012), (I-130)+(2.042)+(15.016), (I-130)+(2.042)+(15.025), (I-130)+(2.042)+(15.027), (I-130)+(2.042)+(15.047), (I-130)+(2.042)+(15.063), (I-130)+(2.042)+(15.064), (I-130)+(2.042)+(16.001), (I-130)+(2.042)+(16.002), (I-130)+(2.042)+(16.003), (I-130)+(2.042)+(16.004), (I-130)+(2.042)+(16.005), (I-130)+(2.042)+(16.006), (I-130)+(2.042)+(16.007), (I-130)+(2.042)+(16.008), (I-130)+(2.042)+(17.001), (I-130)+(2.042)+(17.002), (I-130)+(2.042)+(17.003), (I-130)+(2.042)+(17.004), (I-130)+(2.042)+(17.005), (I-130)+(2.042)+(17.006), (I-130)+(2.042)+(17.007), (I-130)+(2.042)+(17.008), (I-130)+(2.042)+(17.009), (I-130)+(2.042)+(17.010), (I-130)+(2.042)+(17.011), (I-130)+(2.042)+(17.012), (I-130)+(2.042)+(18.001), (I-130)+(2.043)+(3.001), (I-130)+(2.043)+(3.002), (I-130)+(2.043)+(3.003), (I-130)+(2.043)+(3.004), (I-130)+(2.043)+(3.005), (I-130)+(2.043)+(3.006), (I-130)+(2.043)+(3.007), (I-130)+(2.043)+(3.008), (I-130)+(2.043)+(3.009), (I-130)+(2.043)+(3.010), (I-130)+(2.043)+(3.011), (I-130)+(2.043)+(3.012), (I-130)+(2.043)+(3.013), (I-130)+(2.043)+(3.014), (I-130)+(2.043)+(3.015), (I-130)+(2.043)+(3.016), (I-130)+(2.043)+(3.017), (I-130)+(2.043)+(3.018), (I-130)+(2.043)+(3.019), (I-130)+(2.043)+(3.020), (I-130)+(2.043)+(3.021), (I-130)+(2.043)+(3.022), (I-130)+(2.043)+(3.023), (I-130)+(2.043)+(3.024), (I-130)+(2.043)+(3.025), (I-130)+(2.043)+(3.026), (I-130)+(2.043)+(3.027), (I-130)+(2.043)+(3.028), (I-130)+(2.043)+(3.029), (I-130)+(2.043)+(3.030), (I-130)+(2.043)+(3.031), (I-130)+(2.043)+(5.001), (I-130)+(2.043)+(5.002), (I-130)+(2.043)+(5.003), (I-130)+(2.043)+(5.004), (I-130)+(2.043)+(5.005), (I-130)+(2.043)+(5.006), (I-130)+(2.043)+(5.007), (I-130)+(2.043)+(5.008), (I-130)+(2.043)+(5.009), (I-130)+(2.043)+(5.010), (I-130)+(2.043)+(5.011), (I-130)+(2.043)+(5.012), (I-130)+(2.043)+(5.013), (I-130)+(2.043)+(5.014), (I-130)+(2.043)+(5.015), (I-130)+(2.043)+(5.016), (I-130)+(2.043)+(5.017), (I-130)+(2.043)+(5.018), (I-130)+(2.043)+(5.019), (I-130)+(2.043)+(5.020), (I-130)+(2.043)+(5.021), (I-130)+(2.043)+(5.022), (I-130)+(2.043)+(5.023), (I-130)+(2.043)+(6.001), (I-130)+(2.043)+(6.002), (I-130)+(2.043)+(6.003), (I-130)+(2.043)+(6.004), (I-130)+(2.043)+(7.001), (I-130)+(2.043)+(7.002), (I-130)+(2.043)+(7.003), (I-130)+(2.043)+(7.004), (I-130)+(2.043)+(7.005), (I-130)+(2.043)+(7.006), (I-130)+(2.043)+(9.001), (I-130)+(2.043)+(9.002), (I-130)+(2.043)+(9.003), (I-130)+(2.043)+(9.004), (I-130)+(2.043)+(9.005), (I-130)+(2.043)+(9.006), (I-130)+(2.043)+(9.007), (I-130)+(2.043)+(9.008), (I-130)+(2.043)+(9.009), (I-130)+(2.043)+(14.001), (I-130)+(2.043)+(14.002), (I-130)+(2.043)+(15.008), (I-130)+(2.043)+(15.011), (I-130)+(2.043)+(15.012), (I-130)+(2.043)+(15.016), (I-130)+(2.043)+(15.025), (I-130)+(2.043)+(15.027), (I-130)+(2.043)+(15.047), (I-130)+(2.043)+(15.063), (I-130)+(2.043)+(15.064), (I-130)+(2.043)+(16.001), (I-130)+(2.043)+(16.002), (I-130)+(2.043)+(16.003), (I-130)+(2.043)+(16.004), (I-130)+(2.043)+(16.005), (I-130)+(2.043)+(16.006), (I-130)+(2.043)+(16.007), (I-130)+(2.043)+(16.008), (I-130)+(2.043)+(17.001), (I-130)+(2.043)+(17.002), (I-130)+(2.043)+(17.003), (I-130)+(2.043)+(17.004), (I-130)+(2.043)+(17.005), (I-130)+(2.043)+(17.006), (I-130)+(2.043)+(17.007), (I-130)+(2.043)+(17.008), (I-130)+(2.043)+(17.009), (I-130)+(2.043)+(17.010), (I-130)+(2.043)+(17.011), (I-130)+(2.043)+(17.012), (I-130)+(2.043)+(18.001), (I-130)+(2.044)+(3.001), (I-130)+(2.044)+(3.002), (I-130)+(2.044)+(3.003), (I-130)+(2.044)+(3.004), (I-130)+(2.044)+(3.005), (I-130)+(2.044)+(3.006), (I-130)+(2.044)+(3.007), (I-130)+(2.044)+(3.008), (I-130)+(2.044)+(3.009), (I-130)+(2.044)+(3.010), (I-130)+(2.044)+(3.011), (I-130)+(2.044)+(3.012), (I-130)+(2.044)+(3.013), (I-130)+(2.044)+(3.014), (I-130)+(2.044)+(3.015), (I-130)+(2.044)+(3.016), (I-130)+(2.044)+(3.017), (I-130)+(2.044)+(3.018), (I-130)+(2.044)+(3.019), (I-130)+(2.044)+(3.020), (I-130)+(2.044)+(3.021), (I-130)+(2.044)+(3.022), (I-130)+(2.044)+(3.023), (I-130)+(2.044)+(3.024), (I-130)+(2.044)+(3.025), (I-130)+(2.044)+(3.026), (I-130)+(2.044)+(3.027), (I-130)+(2.044)+(3.028), (I-130)+(2.044)+(3.029), (I-130)+(2.044)+(3.030), (I-130)+(2.044)+(3.031), (I-130)+(2.044)+(5.001), (I-130)+(2.044)+(5.002), (I-130)+(2.044)+(5.003), (I-130)+(2.044)+(5.004), (I-130)+(2.044)+(5.005), (I-130)+(2.044)+(5.006), (I-130)+(2.044)+(5.007), (I-130)+(2.044)+(5.008), (I-130)+(2.044)+(5.009), (I-130)+(2.044)+(5.010), (I-130)+(2.044)+(5.011), (I-130)+(2.044)+(5.012), (I-130)+(2.044)+(5.013), (I-130)+(2.044)+(5.014), (I-130)+(2.044)+(5.015), (I-130)+(2.044)+(5.016), (I-130)+(2.044)+(5.017), (I-130)+(2.044)+(5.018), (I-130)+(2.044)+(5.019), (I-130)+(2.044)+(5.020), (I-130)+(2.044)+(5.021), (I-130)+(2.044)+(5.022), (I-130)+(2.044)+(5.023), (I-130)+(2.044)+(6.001), (I-130)+(2.044)+(6.002), (I-130)+(2.044)+(6.003), (I-130)+(2.044)+(6.004), (I-130)+(2.044)+(7.001), (I-130)+(2.044)+(7.002), (I-130)+(2.044)+(7.003), (I-130)+(2.044)+(7.004), (I-130)+(2.044)+(7.005), (I-130)+(2.044)+(7.006), (I-130)+(2.044)+(9.001), (I-130)+(2.044)+(9.002), (I-130)+(2.044)+(9.003), (I-130)+(2.044)+(9.004), (I-130)+(2.044)+(9.005), (I-130)+(2.044)+(9.006),
(I-130)+(2.044)+(9.007), (I-130)+(2.044)+(9.008),
(I-130)+(2.044)+(9.009), (I-130)+(2.044)+(14.001),
(I-130)+(2.044)+(14.002), (I-130)+(2.044)+(15.008),
(I-130)+(2.044)+(15.011), (I-130)+(2.044)+(15.012),
(I-130)+(2.044)+(15.016), (I-130)+(2.044)+(15.025),
(I-130)+(2.044)+(15.027), (I-130)+(2.044)+(15.047),
(I-130)+(2.044)+(15.063), (I-130)+(2.044)+(15.064),
(I-130)+(2.044)+(16.001), (I-130)+(2.044)+(16.002),
(I-130)+(2.044)+(16.003), (I-130)+(2.044)+(16.004),
(I-130)+(2.044)+(16.005), (I-130)+(2.044)+(16.006),
(I-130)+(2.044)+(16.007), (I-130)+(2.044)+(16.008),
(I-130)+(2.044)+(17.001), (I-130)+(2.044)+(17.002),
(I-130)+(2.044)+(17.003), (I-130)+(2.044)+(17.004),
(I-130)+(2.044)+(17.005), (I-130)+(2.044)+(17.006),
(I-130)+(2.044)+(17.007), (I-130)+(2.044)+(17.008),
(I-130)+(2.044)+(17.009), (I-130)+(2.044)+(17.010),
(I-130)+(2.044)+(17.011), (I-130)+(2.044)+(17.012),
(I-130)+(2.044)+(18.001),
(I-130)+(2.045)+(3.001), (I-130)+(2.045)+(3.002),
(I-130)+(2.045)+(3.003), (I-130)+(2.045)+(3.004),
(I-130)+(2.045)+(3.005), (I-130)+(2.045)+(3.006),
(I-130)+(2.045)+(3.007), (I-130)+(2.045)+(3.008),
(I-130)+(2.045)+(3.009), (I-130)+(2.045)+(3.010),
(I-130)+(2.045)+(3.011), (I-130)+(2.045)+(3.012),
(I-130)+(2.045)+(3.013), (I-130)+(2.045)+(3.014),
(I-130)+(2.045)+(3.015), (I-130)+(2.045)+(3.016),
(I-130)+(2.045)+(3.017), (I-130)+(2.045)+(3.018),
(I-130)+(2.045)+(3.019), (I-130)+(2.045)+(3.020),
(I-130)+(2.045)+(3.021), (I-130)+(2.045)+(3.022),
(I-130)+(2.045)+(3.023), (I-130)+(2.045)+(3.024),
(I-130)+(2.045)+(3.025), (I-130)+(2.045)+(3.026),
(I-130)+(2.045)+(3.027), (I-130)+(2.045)+(3.028),
(I-130)+(2.045)+(3.029), (I-130)+(2.045)+(3.030),
(I-130)+(2.045)+(3.031), (I-130)+(2.045)+(5.001),
(I-130)+(2.045)+(5.002), (I-130)+(2.045)+(5.003),
(I-130)+(2.045)+(5.004), (I-130)+(2.045)+(5.005),
(I-130)+(2.045)+(5.006), (I-130)+(2.045)+(5.007),
(I-130)+(2.045)+(5.008), (I-130)+(2.045)+(5.009),
(I-130)+(2.045)+(5.010), (I-130)+(2.045)+(5.011),
(I-130)+(2.045)+(5.012), (I-130)+(2.045)+(5.013),
(I-130)+(2.045)+(5.014), (I-130)+(2.045)+(5.015),
(I-130)+(2.045)+(5.016), (I-130)+(2.045)+(5.017),
(I-130)+(2.045)+(5.018), (I-130)+(2.045)+(5.019),
(I-130)+(2.045)+(5.020), (I-130)+(2.045)+(5.021),
(I-130)+(2.045)+(5.022), (I-130)+(2.045)+(5.023),
(I-130)+(2.045)+(6.001), (I-130)+(2.045)+(6.002),
(I-130)+(2.045)+(6.003), (I-130)+(2.045)+(6.004),
(I-130)+(2.045)+(7.001), (I-130)+(2.045)+(7.002),
(I-130)+(2.045)+(7.003), (I-130)+(2.045)+(7.004),
(I-130)+(2.045)+(7.005), (I-130)+(2.045)+(7.006),
(I-130)+(2.045)+(9.001), (I-130)+(2.045)+(9.002),
(I-130)+(2.045)+(9.003), (I-130)+(2.045)+(9.004),
(I-130)+(2.045)+(9.005), (I-130)+(2.045)+(9.006),
(I-130)+(2.045)+(9.007), (I-130)+(2.045)+(9.008),
(I-130)+(2.045)+(9.009), (I-130)+(2.045)+(14.001),
(I-130)+(2.045)+(14.002), (I-130)+(2.045)+(15.008),
(I-130)+(2.045)+(15.011), (I-130)+(2.045)+(15.012),
(I-130)+(2.045)+(15.016), (I-130)+(2.045)+(15.025),
(I-130)+(2.045)+(15.027), (I-130)+(2.045)+(15.047),
(I-130)+(2.045)+(15.063), (I-130)+(2.045)+(15.064),
(I-130)+(2.045)+(16.001), (I-130)+(2.045)+(16.002),
(I-130)+(2.045)+(16.003), (I-130)+(2.045)+(16.004),
(I-130)+(2.045)+(16.005), (I-130)+(2.045)+(16.006),
(I-130)+(2.045)+(16.007), (I-130)+(2.045)+(16.008),
(I-130)+(2.045)+(17.001), (I-130)+(2.045)+(17.002),
(I-130)+(2.045)+(17.003), (I-130)+(2.045)+(17.004),
(I-130)+(2.045)+(17.005), (I-130)+(2.045)+(17.006),
(I-130)+(2.045)+(17.007), (I-130)+(2.045)+(17.008),
(I-130)+(2.045)+(17.009), (I-130)+(2.045)+(17.010),
(I-130)+(2.045)+(17.011), (I-130)+(2.045)+(17.012),
(I-130)+(2.045)+(18.001),
(I-130)+(2.046)+(3.001), (I-130)+(2.046)+(3.002),
(I-130)+(2.046)+(3.003), (I-130)+(2.046)+(3.004),
(I-130)+(2.046)+(3.005), (I-130)+(2.046)+(3.006),
(I-130)+(2.046)+(3.007), (I-130)+(2.046)+(3.008),
(I-130)+(2.046)+(3.009), (I-130)+(2.046)+(3.010),
(I-130)+(2.046)+(3.011), (I-130)+(2.046)+(3.012),
(I-130)+(2.046)+(3.013), (I-130)+(2.046)+(3.014),
(I-130)+(2.046)+(3.015), (I-130)+(2.046)+(3.016),
(I-130)+(2.046)+(3.017), (I-130)+(2.046)+(3.018),
(I-130)+(2.046)+(3.019), (I-130)+(2.046)+(3.020),
(I-130)+(2.046)+(3.021), (I-130)+(2.046)+(3.022),
(I-130)+(2.046)+(3.023), (I-130)+(2.046)+(3.024),
(I-130)+(2.046)+(3.025), (I-130)+(2.046)+(3.026),
(I-130)+(2.046)+(3.027), (I-130)+(2.046)+(3.028),
(I-130)+(2.046)+(3.029), (I-130)+(2.046)+(3.030),
(I-130)+(2.046)+(3.031), (I-130)+(2.046)+(5.001),
(I-130)+(2.046)+(5.002), (I-130)+(2.046)+(5.003),
(I-130)+(2.046)+(5.004), (I-130)+(2.046)+(5.005),
(I-130)+(2.046)+(5.006), (I-130)+(2.046)+(5.007),
(I-130)+(2.046)+(5.008), (I-130)+(2.046)+(5.009),
(I-130)+(2.046)+(5.010), (I-130)+(2.046)+(5.011),
(I-130)+(2.046)+(5.012), (I-130)+(2.046)+(5.013),
(I-130)+(2.046)+(5.014), (I-130)+(2.046)+(5.015),
(I-130)+(2.046)+(5.016), (I-130)+(2.046)+(5.017),
(I-130)+(2.046)+(5.018), (I-130)+(2.046)+(5.019),
(I-130)+(2.046)+(5.020), (I-130)+(2.046)+(5.021),
(I-130)+(2.046)+(5.022), (I-130)+(2.046)+(5.023),
(I-130)+(2.046)+(6.001), (I-130)+(2.046)+(6.002),
(I-130)+(2.046)+(6.003), (I-130)+(2.046)+(6.004),
(I-130)+(2.046)+(7.001), (I-130)+(2.046)+(7.002),
(I-130)+(2.046)+(7.003), (I-130)+(2.046)+(7.004),
(I-130)+(2.046)+(7.005), (I-130)+(2.046)+(7.006),
(I-130)+(2.046)+(9.001), (I-130)+(2.046)+(9.002),
(I-130)+(2.046)+(9.003), (I-130)+(2.046)+(9.004),
(I-130)+(2.046)+(9.005), (I-130)+(2.046)+(9.006),
(I-130)+(2.046)+(9.007), (I-130)+(2.046)+(9.008),
(I-130)+(2.046)+(9.009), (I-130)+(2.046)+(14.001),
(I-130)+(2.046)+(14.002), (I-130)+(2.046)+(15.008),
(I-130)+(2.046)+(15.011), (I-130)+(2.046)+(15.012),
(I-130)+(2.046)+(15.016), (I-130)+(2.046)+(15.025),
(I-130)+(2.046)+(15.027), (I-130)+(2.046)+(15.047),
(I-130)+(2.046)+(15.063), (I-130)+(2.046)+(15.064),
(I-130)+(2.046)+(16.001), (I-130)+(2.046)+(16.002),
(I-130)+(2.046)+(16.003), (I-130)+(2.046)+(16.004),
(I-130)+(2.046)+(16.005), (I-130)+(2.046)+(16.006),
(I-130)+(2.046)+(16.007), (I-130)+(2.046)+(16.008),
(I-130)+(2.046)+(17.001), (I-130)+(2.046)+(17.002),
(I-130)+(2.046)+(17.003), (I-130)+(2.046)+(17.004),
(I-130)+(2.046)+(17.005), (I-130)+(2.046)+(17.006),
(I-130)+(2.046)+(17.007), (I-130)+(2.046)+(17.008),
(I-130)+(2.046)+(17.009), (I-130)+(2.046)+(17.010),
(I-130)+(2.046)+(17.011), (I-130)+(2.046)+(17.012),
(I-130)+(2.046)+(18.001),
(I-130)+(2.047)+(3.001), (I-130)+(2.047)+(3.002),
(I-130)+(2.047)+(3.003), (I-130)+(2.047)+(3.004),
(I-130)+(2.047)+(3.005), (I-130)+(2.047)+(3.006),
(I-130)+(2.047)+(3.007), (I-130)+(2.047)+(3.008),
(I-130)+(2.047)+(3.009), (I-130)+(2.047)+(3.010),
(I-130)+(2.047)+(3.011), (I-130)+(2.047)+(3.012),
(I-130)+(2.047)+(3.013), (I-130)+(2.047)+(3.014),
(I-130)+(2.047)+(3.015), (I-130)+(2.047)+(3.016),
(I-130)+(2.047)+(3.017), (I-130)+(2.047)+(3.018), (I-130)+(2.047)+(3.019), (I-130)+(2.047)+(3.020), (I-130)+(2.047)+(3.021), (I-130)+(2.047)+(3.022), (I-130)+(2.047)+(3.023), (I-130)+(2.047)+(3.024), (I-130)+(2.047)+(3.025), (I-130)+(2.047)+(3.026), (I-130)+(2.047)+(3.027), (I-130)+(2.047)+(3.028), (I-130)+(2.047)+(3.029), (I-130)+(2.047)+(3.030), (I-130)+(2.047)+(3.031), (I-130)+(2.047)+(5.001), (I-130)+(2.047)+(5.002), (I-130)+(2.047)+(5.003), (I-130)+(2.047)+(5.004), (I-130)+(2.047)+(5.005), (I-130)+(2.047)+(5.006), (I-130)+(2.047)+(5.007), (I-130)+(2.047)+(5.008), (I-130)+(2.047)+(5.009), (I-130)+(2.047)+(5.010), (I-130)+(2.047)+(5.011), (I-130)+(2.047)+(5.012), (I-130)+(2.047)+(5.013), (I-130)+(2.047)+(5.014), (I-130)+(2.047)+(5.015), (I-130)+(2.047)+(5.016), (I-130)+(2.047)+(5.017), (I-130)+(2.047)+(5.018), (I-130)+(2.047)+(5.019), (I-130)+(2.047)+(5.020), (I-130)+(2.047)+(5.021), (I-130)+(2.047)+(5.022), (I-130)+(2.047)+(5.023), (I-130)+(2.047)+(6.001), (I-130)+(2.047)+(6.002), (I-130)+(2.047)+(6.003), (I-130)+(2.047)+(6.004), (I-130)+(2.047)+(7.001), (I-130)+(2.047)+(7.002), (I-130)+(2.047)+(7.003), (I-130)+(2.047)+(7.004), (I-130)+(2.047)+(7.005), (I-130)+(2.047)+(7.006), (I-130)+(2.047)+(9.001), (I-130)+(2.047)+(9.002), (I-130)+(2.047)+(9.003), (I-130)+(2.047)+(9.004), (I-130)+(2.047)+(9.005), (I-130)+(2.047)+(9.006), (I-130)+(2.047)+(9.007), (I-130)+(2.047)+(9.008), (I-130)+(2.047)+(9.009), (I-130)+(2.047)+(14.001), (I-130)+(2.047)+(14.002), (I-130)+(2.047)+(15.008), (I-130)+(2.047)+(15.011), (I-130)+(2.047)+(15.012), (I-130)+(2.047)+(15.016), (I-130)+(2.047)+(15.025), (I-130)+(2.047)+(15.027), (I-130)+(2.047)+(15.047), (I-130)+(2.047)+(15.063), (I-130)+(2.047)+(15.064), (I-130)+(2.047)+(16.001), (I-130)+(2.047)+(16.002), (I-130)+(2.047)+(16.003), (I-130)+(2.047)+(16.004), (I-130)+(2.047)+(16.005), (I-130)+(2.047)+(16.006), (I-130)+(2.047)+(16.007), (I-130)+(2.047)+(16.008), (I-130)+(2.047)+(17.001), (I-130)+(2.047)+(17.002), (I-130)+(2.047)+(17.003), (I-130)+(2.047)+(17.004), (I-130)+(2.047)+(17.005), (I-130)+(2.047)+(17.006), (I-130)+(2.047)+(17.007), (I-130)+(2.047)+(17.008), (I-130)+(2.047)+(17.009), (I-130)+(2.047)+(17.010), (I-130)+(2.047)+(17.011), (I-130)+(2.047)+(17.012), (I-130)+(2.047)+(18.001), (I-130)+(2.048)+(3.001), (I-130)+(2.048)+(3.002), (I-130)+(2.048)+(3.003), (I-130)+(2.048)+(3.004), (I-130)+(2.048)+(3.005), (I-130)+(2.048)+(3.006), (I-130)+(2.048)+(3.007), (I-130)+(2.048)+(3.008), (I-130)+(2.048)+(3.009), (I-130)+(2.048)+(3.010), (I-130)+(2.048)+(3.011), (I-130)+(2.048)+(3.012), (I-130)+(2.048)+(3.013), (I-130)+(2.048)+(3.014), (I-130)+(2.048)+(3.015), (I-130)+(2.048)+(3.016), (I-130)+(2.048)+(3.017), (I-130)+(2.048)+(3.018), (I-130)+(2.048)+(3.019), (I-130)+(2.048)+(3.020), (I-130)+(2.048)+(3.021), (I-130)+(2.048)+(3.022), (I-130)+(2.048)+(3.023), (I-130)+(2.048)+(3.024), (I-130)+(2.048)+(3.025), (I-130)+(2.048)+(3.026), (I-130)+(2.048)+(3.027), (I-130)+(2.048)+(3.028), (I-130)+(2.048)+(3.029), (I-130)+(2.048)+(3.030), (I-130)+(2.048)+(3.031), (I-130)+(2.048)+(5.001), (I-130)+(2.048)+(5.002), (I-130)+(2.048)+(5.003), (I-130)+(2.048)+(5.004), (I-130)+(2.048)+(5.005), (I-130)+(2.048)+(5.006), (I-130)+(2.048)+(5.007), (I-130)+(2.048)+(5.008), (I-130)+(2.048)+(5.009), (I-130)+(2.048)+(5.010), (I-130)+(2.048)+(5.011), (I-130)+(2.048)+(5.012), (I-130)+(2.048)+(5.013), (I-130)+(2.048)+(5.014), (I-130)+(2.048)+(5.015), (I-130)+(2.048)+(5.016), (I-130)+(2.048)+(5.017), (I-130)+(2.048)+(5.018), (I-130)+(2.048)+(5.019), (I-130)+(2.048)+(5.020), (I-130)+(2.048)+(5.021), (I-130)+(2.048)+(5.022), (I-130)+(2.048)+(5.023), (I-130)+(2.048)+(6.001), (I-130)+(2.048)+(6.002), (I-130)+(2.048)+(6.003), (I-130)+(2.048)+(6.004), (I-130)+(2.048)+(7.001), (I-130)+(2.048)+(7.002), (I-130)+(2.048)+(7.003), (I-130)+(2.048)+(7.004), (I-130)+(2.048)+(7.005), (I-130)+(2.048)+(7.006), (I-130)+(2.048)+(9.001), (I-130)+(2.048)+(9.002), (I-130)+(2.048)+(9.003), (I-130)+(2.048)+(9.004), (I-130)+(2.048)+(9.005), (I-130)+(2.048)+(9.006), (I-130)+(2.048)+(9.007), (I-130)+(2.048)+(9.008), (I-130)+(2.048)+(9.009), (I-130)+(2.048)+(14.001), (I-130)+(2.048)+(14.002), (I-130)+(2.048)+(15.008), (I-130)+(2.048)+(15.011), (I-130)+(2.048)+(15.012), (I-130)+(2.048)+(15.016), (I-130)+(2.048)+(15.025), (I-130)+(2.048)+(15.027), (I-130)+(2.048)+(15.047), (I-130)+(2.048)+(15.063), (I-130)+(2.048)+(15.064), (I-130)+(2.048)+(16.001), (I-130)+(2.048)+(16.002), (I-130)+(2.048)+(16.003), (I-130)+(2.048)+(16.004), (I-130)+(2.048)+(16.005), (I-130)+(2.048)+(16.006), (I-130)+(2.048)+(16.007), (I-130)+(2.048)+(16.008), (I-130)+(2.048)+(17.001), (I-130)+(2.048)+(17.002), (I-130)+(2.048)+(17.003), (I-130)+(2.048)+(17.004), (I-130)+(2.048)+(17.005), (I-130)+(2.048)+(17.006), (I-130)+(2.048)+(17.007), (I-130)+(2.048)+(17.008), (I-130)+(2.048)+(17.009), (I-130)+(2.048)+(17.010), (I-130)+(2.048)+(17.011), (I-130)+(2.048)+(17.012), (I-130)+(2.048)+(18.001), (I-130)+(2.049)+(3.001), (I-130)+(2.049)+(3.002), (I-130)+(2.049)+(3.003), (I-130)+(2.049)+(3.004), (I-130)+(2.049)+(3.005), (I-130)+(2.049)+(3.006), (I-130)+(2.049)+(3.007), (I-130)+(2.049)+(3.008), (I-130)+(2.049)+(3.009), (I-130)+(2.049)+(3.010), (I-130)+(2.049)+(3.011), (I-130)+(2.049)+(3.012), (I-130)+(2.049)+(3.013), (I-130)+(2.049)+(3.014), (I-130)+(2.049)+(3.015), (I-130)+(2.049)+(3.016), (I-130)+(2.049)+(3.017), (I-130)+(2.049)+(3.018), (I-130)+(2.049)+(3.019), (I-130)+(2.049)+(3.020), (I-130)+(2.049)+(3.021), (I-130)+(2.049)+(3.022), (I-130)+(2.049)+(3.023), (I-130)+(2.049)+(3.024), (I-130)+(2.049)+(3.025), (I-130)+(2.049)+(3.026), (I-130)+(2.049)+(3.027), (I-130)+(2.049)+(3.028), (I-130)+(2.049)+(3.029), (I-130)+(2.049)+(3.030), (I-130)+(2.049)+(3.031), (I-130)+(2.049)+(5.001), (I-130)+(2.049)+(5.002), (I-130)+(2.049)+(5.003), (I-130)+(2.049)+(5.004), (I-130)+(2.049)+(5.005), (I-130)+(2.049)+(5.006), (I-130)+(2.049)+(5.007), (I-130)+(2.049)+(5.008), (I-130)+(2.049)+(5.009), (I-130)+(2.049)+(5.010), (I-130)+(2.049)+(5.011), (I-130)+(2.049)+(5.012), (I-130)+(2.049)+(5.013), (I-130)+(2.049)+(5.014), (I-130)+(2.049)+(5.015), (I-130)+(2.049)+(5.016), (I-130)+(2.049)+(5.017), (I-130)+(2.049)+(5.018), (I-130)+(2.049)+(5.019), (I-130)+(2.049)+(5.020), (I-130)+(2.049)+(5.021), (I-130)+(2.049)+(5.022), (I-130)+(2.049)+(5.023), (I-130)+(2.049)+(6.001), (I-130)+(2.049)+(6.002), (I-130)+(2.049)+(6.003), (I-130)+(2.049)+(6.004), (I-130)+(2.049)+(7.001), (I-130)+(2.049)+(7.002), (I-130)+(2.049)+(7.003), (I-130)+(2.049)+(7.004), (I-130)+(2.049)+(7.005), (I-130)+(2.049)+(7.006), (I-130)+(2.049)+(9.001), (I-130)+(2.049)+(9.002), (I-130)+(2.049)+(9.003), (I-130)+(2.049)+(9.004), (I-130)+(2.049)+(9.005), (I-130)+(2.049)+(9.006), (I-130)+(2.049)+(9.007), (I-130)+(2.049)+(9.008), (I-130)+(2.049)+(9.009), (I-130)+(2.049)+(14.001), (I-130)+(2.049)+(14.002), (I-130)+(2.049)+(15.008), (I-130)+(2.049)+(15.011), (I-130)+(2.049)+(15.012), (I-130)+(2.049)+(15.016), (I-130)+(2.049)+(15.025), (I-130)+(2.049)+(15.027), (I-130)+(2.049)+(15.047), (I-130)+(2.049)+(15.063), (I-130)+(2.049)+(15.064), (I-130)+(2.049)+(16.001), (I-130)+(2.049)+(16.002), (I-130)+(2.049)+(16.003), (I-130)+(2.049)+(16.004), (I-130)+(2.049)+(16.005), (I-130)+(2.049)+(16.006), (I-130)+(2.049)+(16.007), (I-130)+(2.049)+(16.008), (I-130)+(2.049)+(17.001), (I-130)+(2.049)+(17.002), (I-130)+(2.049)+(17.003), (I-130)+(2.049)+(17.004), (I-130)+(2.049)+(17.005), (I-130)+(2.049)+(17.006), (I-130)+(2.049)+(17.007), (I-130)+(2.049)+(17.008), (I-130)+(2.049)+(17.009), (I-130)+(2.049)+(17.010), (I-130)+(2.049)+(17.011), (I-130)+(2.049)+(17.012), (I-130)+(2.049)+(18.001), (I-130)+(2.050)+(3.001), (I-130)+(2.050)+(3.002), (I-130)+(2.050)+(3.003), (I-130)+(2.050)+(3.004), (I-130)+(2.050)+(3.005), (I-130)+(2.050)+(3.006), (I-130)+(2.050)+(3.007), (I-130)+(2.050)+(3.008), (I-130)+(2.050)+(3.009), (I-130)+(2.050)+(3.010), (I-130)+(2.050)+(3.011), (I-130)+(2.050)+(3.012), (I-130)+(2.050)+(3.013), (I-130)+(2.050)+(3.014), (I-130)+(2.050)+(3.015), (I-130)+(2.050)+(3.016), (I-130)+(2.050)+(3.017), (I-130)+(2.050)+(3.018), (I-130)+(2.050)+(3.019), (I-130)+(2.050)+(3.020), (I-130)+(2.050)+(3.021), (I-130)+(2.050)+(3.022), (I-130)+(2.050)+(3.023), (I-130)+(2.050)+(3.024), (I-130)+(2.050)+(3.025), (I-130)+(2.050)+(3.026), (I-130)+(2.050)+(3.027), (I-130)+(2.050)+(3.028), (I-130)+(2.050)+(3.029), (I-130)+(2.050)+(3.030), (I-130)+(2.050)+(3.031), (I-130)+(2.050)+(5.001), (I-130)+(2.050)+(5.002), (I-130)+(2.050)+(5.003), (I-130)+(2.050)+(5.004), (I-130)+(2.050)+(5.005), (I-130)+(2.050)+(5.006), (I-130)+(2.050)+(5.007), (I-130)+(2.050)+(5.008), (I-130)+(2.050)+(5.009), (I-130)+(2.050)+(5.010), (I-130)+(2.050)+(5.011), (I-130)+(2.050)+(5.012), (I-130)+(2.050)+(5.013), (I-130)+(2.050)+(5.014), (I-130)+(2.050)+(5.015), (I-130)+(2.050)+(5.016), (I-130)+(2.050)+(5.017), (I-130)+(2.050)+(5.018), (I-130)+(2.050)+(5.019), (I-130)+(2.050)+(5.020), (I-130)+(2.050)+(5.021), (I-130)+(2.050)+(5.022), (I-130)+(2.050)+(5.023), (I-130)+(2.050)+(6.001), (I-130)+(2.050)+(6.002), (I-130)+(2.050)+(6.003), (I-130)+(2.050)+(6.004), (I-130)+(2.050)+(7.001), (I-130)+(2.050)+(7.002), (I-130)+(2.050)+(7.003), (I-130)+(2.050)+(7.004), (I-130)+(2.050)+(7.005), (I-130)+(2.050)+(7.006), (I-130)+(2.050)+(9.001), (I-130)+(2.050)+(9.002), (I-130)+(2.050)+(9.003), (I-130)+(2.050)+(9.004), (I-130)+(2.050)+(9.005), (I-130)+(2.050)+(9.006), (I-130)+(2.050)+(9.007), (I-130)+(2.050)+(9.008), (I-130)+(2.050)+(9.009), (I-130)+(2.050)+(14.001), (I-130)+(2.050)+(14.002), (I-130)+(2.050)+(15.008), (I-130)+(2.050)+(15.011), (I-130)+(2.050)+(15.012), (I-130)+(2.050)+(15.016), (I-130)+(2.050)+(15.025), (I-130)+(2.050)+(15.027), (I-130)+(2.050)+(15.047), (I-130)+(2.050)+(15.063), (I-130)+(2.050)+(15.064), (I-130)+(2.050)+(16.001), (I-130)+(2.050)+(16.002), (I-130)+(2.050)+(16.003), (I-130)+(2.050)+(16.004), (I-130)+(2.050)+(16.005), (I-130)+(2.050)+(16.006), (I-130)+(2.050)+(16.007), (I-130)+(2.050)+(16.008), (I-130)+(2.050)+(17.001), (I-130)+(2.050)+(17.002), (I-130)+(2.050)+(17.003), (I-130)+(2.050)+(17.004), (I-130)+(2.050)+(17.005), (I-130)+(2.050)+(17.006), (I-130)+(2.050)+(17.007), (I-130)+(2.050)+(17.008), (I-130)+(2.050)+(17.009), (I-130)+(2.050)+(17.010), (I-130)+(2.050)+(17.011), (I-130)+(2.050)+(17.012), (I-130)+(2.050)+(18.001), (I-130)+(2.051)+(3.001), (I-130)+(2.051)+(3.002), (I-130)+(2.051)+(3.003), (I-130)+(2.051)+(3.004), (I-130)+(2.051)+(3.005), (I-130)+(2.051)+(3.006), (I-130)+(2.051)+(3.007), (I-130)+(2.051)+(3.008), (I-130)+(2.051)+(3.009), (I-130)+(2.051)+(3.010), (I-130)+(2.051)+(3.011), (I-130)+(2.051)+(3.012), (I-130)+(2.051)+(3.013), (I-130)+(2.051)+(3.014), (I-130)+(2.051)+(3.015), (I-130)+(2.051)+(3.016), (I-130)+(2.051)+(3.017), (I-130)+(2.051)+(3.018), (I-130)+(2.051)+(3.019), (I-130)+(2.051)+(3.020), (I-130)+(2.051)+(3.021), (I-130)+(2.051)+(3.022), (I-130)+(2.051)+(3.023), (I-130)+(2.051)+(3.024), (I-130)+(2.051)+(3.025), (I-130)+(2.051)+(3.026), (I-130)+(2.051)+(3.027), (I-130)+(2.051)+(3.028), (I-130)+(2.051)+(3.029), (I-130)+(2.051)+(3.030), (I-130)+(2.051)+(3.031), (I-130)+(2.051)+(5.001), (I-130)+(2.051)+(5.002), (I-130)+(2.051)+(5.003), (I-130)+(2.051)+(5.004), (I-130)+(2.051)+(5.005), (I-130)+(2.051)+(5.006), (I-130)+(2.051)+(5.007), (I-130)+(2.051)+(5.008), (I-130)+(2.051)+(5.009), (I-130)+(2.051)+(5.010), (I-130)+(2.051)+(5.011), (I-130)+(2.051)+(5.012), (I-130)+(2.051)+(5.013), (I-130)+(2.051)+(5.014), (I-130)+(2.051)+(5.015), (I-130)+(2.051)+(5.016), (I-130)+(2.051)+(5.017), (I-130)+(2.051)+(5.018), (I-130)+(2.051)+(5.019), (I-130)+(2.051)+(5.020), (I-130)+(2.051)+(5.021), (I-130)+(2.051)+(5.022), (I-130)+(2.051)+(5.023), (I-130)+(2.051)+(6.001), (I-130)+(2.051)+(6.002), (I-130)+(2.051)+(6.003), (I-130)+(2.051)+(6.004), (I-130)+(2.051)+(7.001), (I-130)+(2.051)+(7.002), (I-130)+(2.051)+(7.003), (I-130)+(2.051)+(7.004), (I-130)+(2.051)+(7.005), (I-130)+(2.051)+(7.006), (I-130)+(2.051)+(9.001), (I-130)+(2.051)+(9.002), (I-130)+(2.051)+(9.003), (I-130)+(2.051)+(9.004), (I-130)+(2.051)+(9.005), (I-130)+(2.051)+(9.006), (I-130)+(2.051)+(9.007), (I-130)+(2.051)+(9.008), (I-130)+(2.051)+(9.009), (I-130)+(2.051)+(14.001), (I-130)+(2.051)+(14.002), (I-130)+(2.051)+(15.008), (I-130)+(2.051)+(15.011), (I-130)+(2.051)+(15.012), (I-130)+(2.051)+(15.016), (I-130)+(2.051)+(15.025), (I-130)+(2.051)+(15.027), (I-130)+(2.051)+(15.047), (I-130)+(2.051)+(15.063), (I-130)+(2.051)+(15.064), (I-130)+(2.051)+(16.001), (I-130)+(2.051)+(16.002), (I-130)+(2.051)+(16.003), (I-130)+(2.051)+(16.004), (I-130)+(2.051)+(16.005), (I-130)+(2.051)+(16.006), (I-130)+(2.051)+(16.007), (I-130)+(2.051)+(16.008), (I-130)+(2.051)+(17.001), (I-130)+(2.051)+(17.002), (I-130)+(2.051)+(17.003), (I-130)+(2.051)+(17.004), (I-130)+(2.051)+(17.005), (I-130)+(2.051)+(17.006), (I-130)+(2.051)+(17.007), (I-130)+(2.051)+(17.008), (I-130)+(2.051)+(17.009), (I-130)+(2.051)+(17.010), (I-130)+(2.051)+(17.011), (I-130)+(2.051)+(17.012), (I-130)+(2.051)+(18.001), (I-130)+(2.052)+(3.001), (I-130)+(2.052)+(3.002), (I-130)+(2.052)+(3.003), (I-130)+(2.052)+(3.004), (I-130)+(2.052)+(3.005), (I-130)+(2.052)+(3.006), (I-130)+(2.052)+(3.007), (I-130)+(2.052)+(3.008), (I-130)+(2.052)+(3.009), (I-130)+(2.052)+(3.010), (I-130)+(2.052)+(3.011), (I-130)+(2.052)+(3.012), (I-130)+(2.052)+(3.013), (I-130)+(2.052)+(3.014), (I-130)+(2.052)+(3.015), (I-130)+(2.052)+(3.016), (I-130)+(2.052)+(3.017), (I-130)+(2.052)+(3.018), (I-130)+(2.052)+(3.019), (I-130)+(2.052)+(3.020), (I-130)+(2.052)+(3.021), (I-130)+(2.052)+(3.022), (I-130)+(2.052)+(3.023), (I-130)+(2.052)+(3.024), (I-130)+(2.052)+(3.025), (I-130)+(2.052)+(3.026), (I-130)+(2.052)+(3.027), (I-130)+(2.052)+(3.028), (I-130)+(2.052)+(3.029), (I-130)+(2.052)+(3.030), (I-130)+(2.052)+(3.031), (I-130)+(2.052)+(5.001), (I-130)+(2.052)+(5.002), (I-130)+(2.052)+(5.003), (I-130)+(2.052)+(5.004), (I-130)+(2.052)+(5.005), (I-130)+(2.052)+(5.006), (I-130)+(2.052)+(5.007), (I-130)+(2.052)+(5.008), (I-130)+(2.052)+(5.009), (I-130)+(2.052)+(5.010), (I-130)+(2.052)+(5.011), (I-130)+(2.052)+(5.012), (I-130)+(2.052)+(5.013), (I-130)+(2.052)+(5.014), (I-130)+(2.052)+(5.015), (I-130)+(2.052)+(5.016), (I-130)+(2.052)+(5.017), (I-130)+(2.052)+(5.018), (I-130)+(2.052)+(5.019), (I-130)+(2.052)+(5.020), (I-130)+(2.052)+(5.021), (I-130)+(2.052)+(5.022), (I-130)+(2.052)+(5.023), (I-130)+(2.052)+(6.001), (I-130)+(2.052)+(6.002), (I-130)+(2.052)+(6.003), (I-130)+(2.052)+(6.004), (I-130)+(2.052)+(7.001), (I-130)+(2.052)+(7.002), (I-130)+(2.052)+(7.003), (I-130)+(2.052)+(7.004), (I-130)+(2.052)+(7.005), (I-130)+(2.052)+(7.006), (I-130)+(2.052)+(9.001), (I-130)+(2.052)+(9.002), (I-130)+(2.052)+(9.003), (I-130)+(2.052)+(9.004), (I-130)+(2.052)+(9.005), (I-130)+(2.052)+(9.006), (I-130)+(2.052)+(9.007), (I-130)+(2.052)+(9.008), (I-130)+(2.052)+(9.009), (I-130)+(2.052)+(14.001), (I-130)+(2.052)+(14.002), (I-130)+(2.052)+(15.008), (I-130)+(2.052)+(15.011), (I-130)+(2.052)+(15.012), (I-130)+(2.052)+(15.016), (I-130)+(2.052)+(15.025), (I-130)+(2.052)+(15.027), (I-130)+(2.052)+(15.047), (I-130)+(2.052)+(15.063), (I-130)+(2.052)+(15.064), (I-130)+(2.052)+(16.001), (I-130)+(2.052)+(16.002), (I-130)+(2.052)+(16.003), (I-130)+(2.052)+(16.004), (I-130)+(2.052)+(16.005), (I-130)+(2.052)+(16.006), (I-130)+(2.052)+(16.007), (I-130)+(2.052)+(16.008), (I-130)+(2.052)+(17.001), (I-130)+(2.052)+(17.002), (I-130)+(2.052)+(17.003), (I-130)+(2.052)+(17.004), (I-130)+(2.052)+(17.005), (I-130)+(2.052)+(17.006), (I-130)+(2.052)+(17.007), (I-130)+(2.052)+(17.008), (I-130)+(2.052)+(17.009), (I-130)+(2.052)+(17.010), (I-130)+(2.052)+(17.011), (I-130)+(2.052)+(17.012), (I-130)+(2.052)+(18.001), (I-130)+(2.053)+(3.001), (I-130)+(2.053)+(3.002), (I-130)+(2.053)+(3.003), (I-130)+(2.053)+(3.004), (I-130)+(2.053)+(3.005), (I-130)+(2.053)+(3.006), (I-130)+(2.053)+(3.007), (I-130)+(2.053)+(3.008), (I-130)+(2.053)+(3.009), (I-130)+(2.053)+(3.010), (I-130)+(2.053)+(3.011), (I-130)+(2.053)+(3.012), (I-130)+(2.053)+(3.013), (I-130)+(2.053)+(3.014), (I-130)+(2.053)+(3.015), (I-130)+(2.053)+(3.016), (I-130)+(2.053)+(3.017), (I-130)+(2.053)+(3.018), (I-130)+(2.053)+(3.019), (I-130)+(2.053)+(3.020), (I-130)+(2.053)+(3.021), (I-130)+(2.053)+(3.022), (I-130)+(2.053)+(3.023), (I-130)+(2.053)+(3.024), (I-130)+(2.053)+(3.025), (I-130)+(2.053)+(3.026), (I-130)+(2.053)+(3.027), (I-130)+(2.053)+(3.028), (I-130)+(2.053)+(3.029), (I-130)+(2.053)+(3.030), (I-130)+(2.053)+(3.031), (I-130)+(2.053)+(5.001), (I-130)+(2.053)+(5.002), (I-130)+(2.053)+(5.003), (I-130)+(2.053)+(5.004), (I-130)+(2.053)+(5.005), (I-130)+(2.053)+(5.006), (I-130)+(2.053)+(5.007), (I-130)+(2.053)+(5.008), (I-130)+(2.053)+(5.009), (I-130)+(2.053)+(5.010), (I-130)+(2.053)+(5.011), (I-130)+(2.053)+(5.012), (I-130)+(2.053)+(5.013), (I-130)+(2.053)+(5.014), (I-130)+(2.053)+(5.015), (I-130)+(2.053)+(5.016), (I-130)+(2.053)+(5.017), (I-130)+(2.053)+(5.018), (I-130)+(2.053)+(5.019), (I-130)+(2.053)+(5.020), (I-130)+(2.053)+(5.021), (I-130)+(2.053)+(5.022), (I-130)+(2.053)+(5.023), (I-130)+(2.053)+(6.001), (I-130)+(2.053)+(6.002), (I-130)+(2.053)+(6.003), (I-130)+(2.053)+(6.004), (I-130)+(2.053)+(7.001), (I-130)+(2.053)+(7.002), (I-130)+(2.053)+(7.003), (I-130)+(2.053)+(7.004), (I-130)+(2.053)+(7.005), (I-130)+(2.053)+(7.006), (I-130)+(2.053)+(9.001), (I-130)+(2.053)+(9.002), (I-130)+(2.053)+(9.003), (I-130)+(2.053)+(9.004), (I-130)+(2.053)+(9.005), (I-130)+(2.053)+(9.006), (I-130)+(2.053)+(9.007), (I-130)+(2.053)+(9.008), (I-130)+(2.053)+(9.009), (I-130)+(2.053)+(14.001), (I-130)+(2.053)+(14.002), (I-130)+(2.053)+(15.008), (I-130)+(2.053)+(15.011), (I-130)+(2.053)+(15.012), (I-130)+(2.053)+(15.016), (I-130)+(2.053)+(15.025), (I-130)+(2.053)+(15.027), (I-130)+(2.053)+(15.047), (I-130)+(2.053)+(15.063), (I-130)+(2.053)+(15.064), (I-130)+(2.053)+(16.001), (I-130)+(2.053)+(16.002), (I-130)+(2.053)+(16.003), (I-130)+(2.053)+(16.004), (I-130)+(2.053)+(16.005), (I-130)+(2.053)+(16.006), (I-130)+(2.053)+(16.007), (I-130)+(2.053)+(16.008), (I-130)+(2.053)+(17.001), (I-130)+(2.053)+(17.002), (I-130)+(2.053)+(17.003), (I-130)+(2.053)+(17.004), (I-130)+(2.053)+(17.005), (I-130)+(2.053)+(17.006), (I-130)+(2.053)+(17.007), (I-130)+(2.053)+(17.008), (I-130)+(2.053)+(17.009), (I-130)+(2.053)+(17.010), (I-130)+(2.053)+(17.011), (I-130)+(2.053)+(17.012), (I-130)+(2.053)+(18.001), (I-130)+(2.054)+(3.001), (I-130)+(2.054)+(3.002), (I-130)+(2.054)+(3.003), (I-130)+(2.054)+(3.004), (I-130)+(2.054)+(3.005), (I-130)+(2.054)+(3.006), (I-130)+(2.054)+(3.007), (I-130)+(2.054)+(3.008), (I-130)+(2.054)+(3.009), (I-130)+(2.054)+(3.010), (I-130)+(2.054)+(3.011), (I-130)+(2.054)+(3.012), (I-130)+(2.054)+(3.013), (I-130)+(2.054)+(3.014), (I-130)+(2.054)+(3.015), (I-130)+(2.054)+(3.016), (I-130)+(2.054)+(3.017), (I-130)+(2.054)+(3.018), (I-130)+(2.054)+(3.019), (I-130)+(2.054)+(3.020), (I-130)+(2.054)+(3.021), (I-130)+(2.054)+(3.022), (I-130)+(2.054)+(3.023), (I-130)+(2.054)+(3.024), (I-130)+(2.054)+(3.025), (I-130)+(2.054)+(3.026), (I-130)+(2.054)+(3.027), (I-130)+(2.054)+(3.028), (I-130)+(2.054)+(3.029), (I-130)+(2.054)+(3.030), (I-130)+(2.054)+(3.031), (I-130)+(2.054)+(5.001), (I-130)+(2.054)+(5.002), (I-130)+(2.054)+(5.003), (I-130)+(2.054)+(5.004), (I-130)+(2.054)+(5.005), (I-130)+(2.054)+(5.006), (I-130)+(2.054)+(5.007), (I-130)+(2.054)+(5.008), (I-130)+(2.054)+(5.009), (I-130)+(2.054)+(5.010), (I-130)+(2.054)+(5.011), (I-130)+(2.054)+(5.012), (I-130)+(2.054)+(5.013), (I-130)+(2.054)+(5.014), (I-130)+(2.054)+(5.015), (I-130)+(2.054)+(5.016), (I-130)+(2.054)+(5.017), (I-130)+(2.054)+(5.018), (I-130)+(2.054)+(5.019), (I-130)+(2.054)+(5.020), (I-130)+(2.054)+(5.021), (I-130)+(2.054)+(5.022), (I-130)+(2.054)+(5.023), (I-130)+(2.054)+(6.001), (I-130)+(2.054)+(6.002), (I-130)+(2.054)+(6.003), (I-130)+(2.054)+(6.004), (I-130)+(2.054)+(7.001), (I-130)+(2.054)+(7.002), (I-130)+(2.054)+(7.003), (I-130)+(2.054)+(7.004), (I-130)+(2.054)+(7.005), (I-130)+(2.054)+(7.006), (I-130)+(2.054)+(9.001), (I-130)+(2.054)+(9.002), (I-130)+(2.054)+(9.003), (I-130)+(2.054)+(9.004), (I-130)+(2.054)+(9.005), (I-130)+(2.054)+(9.006), (I-130)+(2.054)+(9.007), (I-130)+(2.054)+(9.008), (I-130)+(2.054)+(9.009), (I-130)+(2.054)+(14.001), (I-130)+(2.054)+(14.002), (I-130)+(2.054)+(15.008), (I-130)+(2.054)+(15.011), (I-130)+(2.054)+(15.012), (I-130)+(2.054)+(15.016), (I-130)+(2.054)+(15.025), (I-130)+(2.054)+(15.027), (I-130)+(2.054)+(15.047), (I-130)+(2.054)+(15.063), (I-130)+(2.054)+(15.064), (I-130)+(2.054)+(16.001), (I-130)+(2.054)+(16.002), (I-130)+(2.054)+(16.003), (I-130)+(2.054)+(16.004), (I-130)+(2.054)+(16.005), (I-130)+(2.054)+(16.006), (I-130)+(2.054)+(16.007), (I-130)+(2.054)+(16.008), (I-130)+(2.054)+(17.001), (I-130)+(2.054)+(17.002), (I-130)+(2.054)+(17.003), (I-130)+(2.054)+(17.004), (I-130)+(2.054)+(17.005), (I-130)+(2.054)+(17.006), (I-130)+(2.054)+(17.007), (I-130)+(2.054)+(17.008), (I-130)+(2.054)+(17.009), (I-130)+(2.054)+(17.010), (I-130)+(2.054)+(17.011), (I-130)+(2.054)+(17.012), (I-130)+(2.054)+(18.001), (I-130)+(2.055)+(3.001), (I-130)+(2.055)+(3.002), (I-130)+(2.055)+(3.003), (I-130)+(2.055)+(3.004), (I-130)+(2.055)+(3.005), (I-130)+(2.055)+(3.006), (I-130)+(2.055)+(3.007), (I-130)+(2.055)+(3.008), (I-130)+(2.055)+(3.009), (I-130)+(2.055)+(3.010), (I-130)+(2.055)+(3.011), (I-130)+(2.055)+(3.012), (I-130)+(2.055)+(3.013), (I-130)+(2.055)+(3.014), (I-130)+(2.055)+(3.015), (I-130)+(2.055)+(3.016), (I-130)+(2.055)+(3.017), (I-130)+(2.055)+(3.018), (I-130)+(2.055)+(3.019), (I-130)+(2.055)+(3.020), (I-130)+(2.055)+(3.021), (I-130)+(2.055)+(3.022), (I-130)+(2.055)+(3.023), (I-130)+(2.055)+(3.024), (I-130)+(2.055)+(3.025), (I-130)+(2.055)+(3.026), (I-130)+(2.055)+(3.027), (I-130)+(2.055)+(3.028), (I-130)+(2.055)+(3.029), (I-130)+(2.055)+(3.030), (I-130)+(2.055)+(3.031), (I-130)+(2.055)+(5.001), (I-130)+(2.055)+(5.002), (I-130)+(2.055)+(5.003), (I-130)+(2.055)+(5.004), (I-130)+(2.055)+(5.005), (I-130)+(2.055)+(5.006), (I-130)+(2.055)+(5.007), (I-130)+(2.055)+(5.008), (I-130)+(2.055)+(5.009), (I-130)+(2.055)+(5.010), (I-130)+(2.055)+(5.011), (I-130)+(2.055)+(5.012), (I-130)+(2.055)+(5.013), (I-130)+(2.055)+(5.014), (I-130)+(2.055)+(5.015), (I-130)+(2.055)+(5.016), (I-130)+(2.055)+(5.017), (I-130)+(2.055)+(5.018), (I-130)+(2.055)+(5.019), (I-130)+(2.055)+(5.020), (I-130)+(2.055)+(5.021), (I-130)+(2.055)+(5.022), (I-130)+(2.055)+(5.023), (I-130)+(2.055)+(6.001), (I-130)+(2.055)+(6.002), (I-130)+(2.055)+(6.003), (I-130)+(2.055)+(6.004), (I-130)+(2.055)+(7.001), (I-130)+(2.055)+(7.002), (I-130)+(2.055)+(7.003), (I-130)+(2.055)+(7.004), (I-130)+(2.055)+(7.005), (I-130)+(2.055)+(7.006), (I-130)+(2.055)+(9.001), (I-130)+(2.055)+(9.002), (I-130)+(2.055)+(9.003), (I-130)+(2.055)+(9.004), (I-130)+(2.055)+(9.005), (I-130)+(2.055)+(9.006), (I-130)+(2.055)+(9.007), (I-130)+(2.055)+(9.008), (I-130)+(2.055)+(9.009), (I-130)+(2.055)+(14.001), (I-130)+(2.055)+(14.002), (I-130)+(2.055)+(15.008), (I-130)+(2.055)+(15.011), (I-130)+(2.055)+(15.012), (I-130)+(2.055)+(15.016), (I-130)+(2.055)+(15.025), (I-130)+(2.055)+(15.027), (I-130)+(2.055)+(15.047), (I-130)+(2.055)+(15.063), (I-130)+(2.055)+(15.064), (I-130)+(2.055)+(16.001), (I-130)+(2.055)+(16.002), (I-130)+(2.055)+(16.003), (I-130)+(2.055)+(16.004), (I-130)+(2.055)+(16.005), (I-130)+(2.055)+(16.006), (I-130)+(2.055)+(16.007), (I-130)+(2.055)+(16.008), (I-130)+(2.055)+(17.001), (I-130)+(2.055)+(17.002), (I-130)+(2.055)+(17.003), (I-130)+(2.055)+(17.004), (I-130)+(2.055)+(17.005), (I-130)+(2.055)+(17.006), (I-130)+(2.055)+(17.007), (I-130)+(2.055)+(17.008), (I-130)+(2.055)+(17.009), (I-130)+(2.055)+(17.010), (I-130)+(2.055)+(17.011), (I-130)+(2.055)+(17.012), (I-130)+(2.055)+(18.001), (I-130)+(2.056)+(3.001), (I-130)+(2.056)+(3.002), (I-130)+(2.056)+(3.003), (I-130)+(2.056)+(3.004), (I-130)+(2.056)+(3.005), (I-130)+(2.056)+(3.006), (I-130)+(2.056)+(3.007), (I-130)+(2.056)+(3.008), (I-130)+(2.056)+(3.009), (I-130)+(2.056)+(3.010), (I-130)+(2.056)+(3.011), (I-130)+(2.056)+(3.012), (I-130)+(2.056)+(3.013), (I-130)+(2.056)+(3.014), (I-130)+(2.056)+(3.015), (I-130)+(2.056)+(3.016), (I-130)+(2.056)+(3.017), (I-130)+(2.056)+(3.018), (I-130)+(2.056)+(3.019), (I-130)+(2.056)+(3.020), (I-130)+(2.056)+(3.021), (I-130)+(2.056)+(3.022), (I-130)+(2.056)+(3.023), (I-130)+(2.056)+(3.024), (I-130)+(2.056)+(3.025), (I-130)+(2.056)+(3.026), (I-130)+(2.056)+(3.027), (I-130)+(2.056)+(3.028), (I-130)+(2.056)+(3.029), (I-130)+(2.056)+(3.030), (I-130)+(2.056)+(3.031), (I-130)+(2.056)+(5.001), (I-130)+(2.056)+(5.002), (I-130)+(2.056)+(5.003), (I-130)+(2.056)+(5.004), (I-130)+(2.056)+(5.005), (I-130)+(2.056)+(5.006), (I-130)+(2.056)+(5.007), (I-130)+(2.056)+(5.008), (I-130)+(2.056)+(5.009), (I-130)+(2.056)+(5.010), (I-130)+(2.056)+(5.011), (I-130)+(2.056)+(5.012), (I-130)+(2.056)+(5.013), (I-130)+(2.056)+(5.014), (I-130)+(2.056)+(5.015), (I-130)+(2.056)+(5.016), (I-130)+(2.056)+(5.017), (I-130)+(2.056)+(5.018), (I-130)+(2.056)+(5.019), (I-130)+(2.056)+(5.020), (I-130)+(2.056)+(5.021), (I-130)+(2.056)+(5.022), (I-130)+(2.056)+(5.023), (I-130)+(2.056)+(6.001), (I-130)+(2.056)+(6.002), (I-130)+(2.056)+(6.003), (I-130)+(2.056)+(6.004), (I-130)+(2.056)+(7.001), (I-130)+(2.056)+(7.002), (I-130)+(2.056)+(7.003), (I-130)+(2.056)+(7.004), (I-130)+(2.056)+(7.005), (I-130)+(2.056)+(7.006), (I-130)+(2.056)+(9.001), (I-130)+(2.056)+(9.002), (I-130)+(2.056)+(9.003), (I-130)+(2.056)+(9.004), (I-130)+(2.056)+(9.005), (I-130)+(2.056)+(9.006), (I-130)+(2.056)+(9.007), (I-130)+(2.056)+(9.008), (I-130)+(2.056)+(9.009), (I-130)+(2.056)+(14.001), (I-130)+(2.056)+(14.002), (I-130)+(2.056)+(15.008), (I-130)+(2.056)+(15.011), (I-130)+(2.056)+(15.012), (I-130)+(2.056)+(15.016), (I-130)+(2.056)+(15.025), (I-130)+(2.056)+(15.027), (I-130)+(2.056)+(15.047), (I-130)+(2.056)+(15.063), (I-130)+(2.056)+(15.064), (I-130)+(2.056)+(16.001), (I-130)+(2.056)+(16.002), (I-130)+(2.056)+(16.003), (I-130)+(2.056)+(16.004), (I-130)+(2.056)+(16.005), (I-130)+(2.056)+(16.006), (I-130)+(2.056)+(16.007), (I-130)+(2.056)+(16.008), (I-130)+(2.056)+(17.001), (I-130)+(2.056)+(17.002), (I-130)+(2.056)+(17.003), (I-130)+(2.056)+(17.004), (I-130)+(2.056)+(17.005), (I-130)+(2.056)+(17.006), (I-130)+(2.056)+(17.007), (I-130)+(2.056)+(17.008), (I-130)+(2.056)+(17.009), (I-130)+(2.056)+(17.010), (I-130)+(2.056)+(17.011), (I-130)+(2.056)+(17.012), (I-130)+(2.056)+(18.001), (I-130)+(2.057)+(3.001), (I-130)+(2.057)+(3.002), (I-130)+(2.057)+(3.003), (I-130)+(2.057)+(3.004), (I-130)+(2.057)+(3.005), (I-130)+(2.057)+(3.006), (I-130)+(2.057)+(3.007), (I-130)+(2.057)+(3.008), (I-130)+(2.057)+(3.009), (I-130)+(2.057)+(3.010), (I-130)+(2.057)+(3.011), (I-130)+(2.057)+(3.012), (I-130)+(2.057)+(3.013), (I-130)+(2.057)+(3.014), (I-130)+(2.057)+(3.015), (I-130)+(2.057)+(3.016), (I-130)+(2.057)+(3.017), (I-130)+(2.057)+(3.018), (I-130)+(2.057)+(3.019), (I-130)+(2.057)+(3.020), (I-130)+(2.057)+(3.021), (I-130)+(2.057)+(3.022), (I-130)+(2.057)+(3.023), (I-130)+(2.057)+(3.024), (I-130)+(2.057)+(3.025), (I-130)+(2.057)+(3.026), (I-130)+(2.057)+(3.027), (I-130)+(2.057)+(3.028), (I-130)+(2.057)+(3.029), (I-130)+(2.057)+(3.030), (I-130)+(2.057)+(3.031), (I-130)+(2.057)+(5.001), (I-130)+(2.057)+(5.002), (I-130)+(2.057)+(5.003), (I-130)+(2.057)+(5.004), (I-130)+(2.057)+(5.005), (I-130)+(2.057)+(5.006), (I-130)+(2.057)+(5.007), (I-130)+(2.057)+(5.008), (I-130)+(2.057)+(5.009), (I-130)+(2.057)+(5.010), (I-130)+(2.057)+(5.011), (I-130)+(2.057)+(5.012), (I-130)+(2.057)+(5.013), (I-130)+(2.057)+(5.014), (I-130)+(2.057)+(5.015), (I-130)+(2.057)+(5.016), (I-130)+(2.057)+(5.017), (I-130)+(2.057)+(5.018), (I-130)+(2.057)+(5.019), (I-130)+(2.057)+(5.020), (I-130)+(2.057)+(5.021), (I-130)+(2.057)+(5.022), (I-130)+(2.057)+(5.023), (I-130)+(2.057)+(6.001), (I-130)+(2.057)+(6.002), (I-130)+(2.057)+(6.003), (I-130)+(2.057)+(6.004), (I-130)+(2.057)+(7.001), (I-130)+(2.057)+(7.002), (I-130)+(2.057)+(7.003), (I-130)+(2.057)+(7.004), (I-130)+(2.057)+(7.005), (I-130)+(2.057)+(7.006), (I-130)+(2.057)+(9.001), (I-130)+(2.057)+(9.002), (I-130)+(2.057)+(9.003), (I-130)+(2.057)+(9.004), (I-130)+(2.057)+(9.005), (I-130)+(2.057)+(9.006), (I-130)+(2.057)+(9.007), (I-130)+(2.057)+(9.008), (I-130)+(2.057)+(9.009), (I-130)+(2.057)+(14.001), (I-130)+(2.057)+(14.002), (I-130)+(2.057)+(15.008), (I-130)+(2.057)+(15.011), (I-130)+(2.057)+(15.012), (I-130)+(2.057)+(15.016), (I-130)+(2.057)+(15.025), (I-130)+(2.057)+(15.027), (I-130)+(2.057)+(15.047), (I-130)+(2.057)+(15.063), (I-130)+(2.057)+(15.064), (I-130)+(2.057)+(16.001), (I-130)+(2.057)+(16.002), (I-130)+(2.057)+(16.003), (I-130)+(2.057)+(16.004), (I-130)+(2.057)+(16.005), (I-130)+(2.057)+(16.006), (I-130)+(2.057)+(16.007), (I-130)+(2.057)+(16.008), (I-130)+(2.057)+(17.001), (I-130)+(2.057)+(17.002), (I-130)+(2.057)+(17.003), (I-130)+(2.057)+(17.004), (I-130)+(2.057)+(17.005), (I-130)+(2.057)+(17.006), (I-130)+(2.057)+(17.007), (I-130)+(2.057)+(17.008), (I-130)+(2.057)+(17.009), (I-130)+(2.057)+(17.010), (I-130)+(2.057)+(17.011), (I-130)+(2.057)+(17.012), (I-130)+(2.057)+(18.001), (I-130)+(2.058)+(3.001), (I-130)+(2.058)+(3.002), (I-130)+(2.058)+(3.003), (I-130)+(2.058)+(3.004), (I-130)+(2.058)+(3.005), (I-130)+(2.058)+(3.006), (I-130)+(2.058)+(3.007), (I-130)+(2.058)+(3.008), (I-130)+(2.058)+(3.009), (I-130)+(2.058)+(3.010), (I-130)+(2.058)+(3.011), (I-130)+(2.058)+(3.012), (I-130)+(2.058)+(3.013), (I-130)+(2.058)+(3.014), (I-130)+(2.058)+(3.015), (I-130)+(2.058)+(3.016), (I-130)+(2.058)+(3.017), (I-130)+(2.058)+(3.018), (I-130)+(2.058)+(3.019), (I-130)+(2.058)+(3.020), (I-130)+(2.058)+(3.021), (I-130)+(2.058)+(3.022), (I-130)+(2.058)+(3.023), (I-130)+(2.058)+(3.024), (I-130)+(2.058)+(3.025), (I-130)+(2.058)+(3.026), (I-130)+(2.058)+(3.027), (I-130)+(2.058)+(3.028), (I-130)+(2.058)+(3.029), (I-130)+(2.058)+(3.030), (I-130)+(2.058)+(3.031), (I-130)+(2.058)+(5.001), (I-130)+(2.058)+(5.002), (I-130)+(2.058)+(5.003), (I-130)+(2.058)+(5.004), (I-130)+(2.058)+(5.005), (I-130)+(2.058)+(5.006), (I-130)+(2.058)+(5.007), (I-130)+(2.058)+(5.008), (I-130)+(2.058)+(5.009), (I-130)+(2.058)+(5.010), (I-130)+(2.058)+(5.011), (I-130)+(2.058)+(5.012), (I-130)+(2.058)+(5.013), (I-130)+(2.058)+(5.014), (I-130)+(2.058)+(5.015), (I-130)+(2.058)+(5.016), (I-130)+(2.058)+(5.017), (I-130)+(2.058)+(5.018), (I-130)+(2.058)+(5.019), (I-130)+(2.058)+(5.020), (I-130)+(2.058)+(5.021), (I-130)+(2.058)+(5.022), (I-130)+(2.058)+(5.023), (I-130)+(2.058)+(6.001), (I-130)+(2.058)+(6.002), (I-130)+(2.058)+(6.003), (I-130)+(2.058)+(6.004), (I-130)+(2.058)+(7.001), (I-130)+(2.058)+(7.002), (I-130)+(2.058)+(7.003), (I-130)+(2.058)+(7.004), (I-130)+(2.058)+(7.005), (I-130)+(2.058)+(7.006), (I-130)+(2.058)+(9.001), (I-130)+(2.058)+(9.002), (I-130)+(2.058)+(9.003), (I-130)+(2.058)+(9.004), (I-130)+(2.058)+(9.005), (I-130)+(2.058)+(9.006), (I-130)+(2.058)+(9.007), (I-130)+(2.058)+(9.008), (I-130)+(2.058)+(9.009), (I-130)+(2.058)+(14.001), (I-130)+(2.058)+(14.002), (I-130)+(2.058)+(15.008), (I-130)+(2.058)+(15.011), (I-130)+(2.058)+(15.012), (I-130)+(2.058)+(15.016), (I-130)+(2.058)+(15.025), (I-130)+(2.058)+(15.027), (I-130)+(2.058)+(15.047), (I-130)+(2.058)+(15.063), (I-130)+(2.058)+(15.064), (I-130)+(2.058)+(16.001), (I-130)+(2.058)+(16.002), (I-130)+(2.058)+(16.003), (I-130)+(2.058)+(16.004), (I-130)+(2.058)+(16.005), (I-130)+(2.058)+(16.006), (I-130)+(2.058)+(16.007), (I-130)+(2.058)+(16.008), (I-130)+(2.058)+(17.001), (I-130)+(2.058)+(17.002), (I-130)+(2.058)+(17.003), (I-130)+(2.058)+(17.004), (I-130)+(2.058)+(17.005), (I-130)+(2.058)+(17.006), (I-130)+(2.058)+(17.007), (I-130)+(2.058)+(17.008), (I-130)+(2.058)+(17.009), (I-130)+(2.058)+(17.010), (I-130)+(2.058)+(17.011), (I-130)+(2.058)+(17.012), (I-130)+(2.058)+(18.001), (I-130)+(2.059)+(3.001), (I-130)+(2.059)+(3.002), (I-130)+(2.059)+(3.003), (I-130)+(2.059)+(3.004), (I-130)+(2.059)+(3.005), (I-130)+(2.059)+(3.006), (I-130)+(2.059)+(3.007), (I-130)+(2.059)+(3.008), (I-130)+(2.059)+(3.009), (I-130)+(2.059)+(3.010), (I-130)+(2.059)+(3.011), (I-130)+(2.059)+(3.012), (I-130)+(2.059)+(3.013), (I-130)+(2.059)+(3.014), (I-130)+(2.059)+(3.015), (I-130)+(2.059)+(3.016), (I-130)+(2.059)+(3.017), (I-130)+(2.059)+(3.018), (I-130)+(2.059)+(3.019), (I-130)+(2.059)+(3.020), (I-130)+(2.059)+(3.021), (I-130)+(2.059)+(3.022), (I-130)+(2.059)+(3.023), (I-130)+(2.059)+(3.024), (I-130)+(2.059)+(3.025), (I-130)+(2.059)+(3.026), (I-130)+(2.059)+(3.027), (I-130)+(2.059)+(3.028), (I-130)+(2.059)+(3.029), (I-130)+(2.059)+(3.030), (I-130)+(2.059)+(3.031), (I-130)+(2.059)+(5.001), (I-130)+(2.059)+(5.002), (I-130)+(2.059)+(5.003), (I-130)+(2.059)+(5.004), (I-130)+(2.059)+(5.005), (I-130)+(2.059)+(5.006), (I-130)+(2.059)+(5.007), (I-130)+(2.059)+(5.008), (I-130)+(2.059)+(5.009), (I-130)+(2.059)+(5.010), (I-130)+(2.059)+(5.011), (I-130)+(2.059)+(5.012), (I-130)+(2.059)+(5.013), (I-130)+(2.059)+(5.014), (I-130)+(2.059)+(5.015), (I-130)+(2.059)+(5.016), (I-130)+(2.059)+(5.017), (I-130)+(2.059)+(5.018), (I-130)+(2.059)+(5.019), (I-130)+(2.059)+(5.020), (I-130)+(2.059)+(5.021), (I-130)+(2.059)+(5.022), (I-130)+(2.059)+(5.023), (I-130)+(2.059)+(6.001), (I-130)+(2.059)+(6.002), (I-130)+(2.059)+(6.003), (I-130)+(2.059)+(6.004), (I-130)+(2.059)+(7.001), (I-130)+(2.059)+(7.002), (I-130)+(2.059)+(7.003), (I-130)+(2.059)+(7.004), (I-130)+(2.059)+(7.005), (I-130)+(2.059)+(7.006), (I-130)+(2.059)+(9.001), (I-130)+(2.059)+(9.002), (I-130)+(2.059)+(9.003), (I-130)+(2.059)+(9.004), (I-130)+(2.059)+(9.005), (I-130)+(2.059)+(9.006), (I-130)+(2.059)+(9.007), (I-130)+(2.059)+(9.008), (I-130)+(2.059)+(9.009), (I-130)+(2.059)+(14.001), (I-130)+(2.059)+(14.002), (I-130)+(2.059)+(15.008), (I-130)+(2.059)+(15.011), (I-130)+(2.059)+(15.012), (I-130)+(2.059)+(15.016), (I-130)+(2.059)+(15.025), (I-130)+(2.059)+(15.027), (I-130)+(2.059)+(15.047), (I-130)+(2.059)+(15.063), (I-130)+(2.059)+(15.064), (I-130)+(2.059)+(16.001), (I-130)+(2.059)+(16.002), (I-130)+(2.059)+(16.003), (I-130)+(2.059)+(16.004), (I-130)+(2.059)+(16.005), (I-130)+(2.059)+(16.006), (I-130)+(2.059)+(16.007), (I-130)+(2.059)+(16.008), (I-130)+(2.059)+(17.001), (I-130)+(2.059)+(17.002), (I-130)+(2.059)+(17.003), (I-130)+(2.059)+(17.004), (I-130)+(2.059)+(17.005), (I-130)+(2.059)+(17.006), (I-130)+(2.059)+(17.007), (I-130)+(2.059)+(17.008), (I-130)+(2.059)+(17.009), (I-130)+(2.059)+(17.010), (I-130)+(2.059)+(17.011), (I-130)+(2.059)+(17.012), (I-130)+(2.059)+(18.001), (I-130)+(3.001)+(3.025), (I-130)+(3.001)+(3.030), (I-130)+(3.001)+(3.031), (I-130)+(3.001)+(5.001), (I-130)+(3.001)+(5.002), (I-130)+(3.001)+(5.003), (I-130)+(3.001)+(5.004), (I-130)+(3.001)+(5.005), (I-130)+(3.001)+(5.006), (I-130)+(3.001)+(5.007), (I-130)+(3.001)+(5.008), (I-130)+(3.001)+(5.009), (I-130)+(3.001)+(5.010), (I-130)+(3.001)+(5.011), (I-130)+(3.001)+(5.012), (I-130)+(3.001)+(5.013), (I-130)+(3.001)+(5.014), (I-130)+(3.001)+(5.015), (I-130)+(3.001)+(5.016), (I-130)+(3.001)+(5.017), (I-130)+(3.001)+(5.018), (I-130)+(3.001)+(5.019), (I-130)+(3.001)+(5.020), (I-130)+(3.001)+(5.021), (I-130)+(3.001)+(5.022), (I-130)+(3.001)+(5.023), (I-130)+(3.001)+(6.001), (I-130)+(3.001)+(6.002), (I-130)+(3.001)+(6.003), (I-130)+(3.001)+(6.004), (I-130)+(3.001)+(7.001), (I-130)+(3.001)+(7.002), (I-130)+(3.001)+(7.003), (I-130)+(3.001)+(7.004), (I-130)+(3.001)+(7.005), (I-130)+(3.001)+(7.006), (I-130)+(3.001)+(9.001), (I-130)+(3.001)+(9.002), (I-130)+(3.001)+(9.003), (I-130)+(3.001)+(9.004), (I-130)+(3.001)+(9.005), (I-130)+(3.001)+(9.006), (I-130)+(3.001)+(9.007), (I-130)+(3.001)+(9.008), (I-130)+(3.001)+(9.009), (I-130)+(3.001)+(14.001), (I-130)+(3.001)+(14.002), (I-130)+(3.001)+(15.008), (I-130)+(3.001)+(15.011), (I-130)+(3.001)+(15.012), (I-130)+(3.001)+(15.016), (I-130)+(3.001)+(15.025), (I-130)+(3.001)+(15.027), (I-130)+(3.001)+(15.047), (I-130)+(3.001)+(15.063), (I-130)+(3.001)+(15.064), (I-130)+(3.001)+(16.001), (I-130)+(3.001)+(16.002), (I-130)+(3.001)+(16.003), (I-130)+(3.001)+(16.004), (I-130)+(3.001)+(16.005), (I-130)+(3.001)+(16.006), (I-130)+(3.001)+(16.007), (I-130)+(3.001)+(16.008), (I-130)+(3.001)+(17.001), (I-130)+(3.001)+(17.002), (I-130)+(3.001)+(17.003), (I-130)+(3.001)+(17.004), (I-130)+(3.001)+(17.005), (I-130)+(3.001)+(17.006), (I-130)+(3.001)+(17.007), (I-130)+(3.001)+(17.008), (I-130)+(3.001)+(17.009), (I-130)+(3.001)+(17.010), (I-130)+(3.001)+(17.011), (I-130)+(3.001)+(17.012), (I-130)+(3.001)+(18.001), (I-130)+(3.002)+(3.025), (I-130)+(3.002)+(3.030), (I-130)+(3.002)+(3.031), (I-130)+(3.002)+(5.001), (I-130)+(3.002)+(5.002), (I-130)+(3.002)+(5.003), (I-130)+(3.002)+(5.004), (I-130)+(3.002)+(5.005), (I-130)+(3.002)+(5.006), (I-130)+(3.002)+(5.007), (I-130)+(3.002)+(5.008), (I-130)+(3.002)+(5.009), (I-130)+(3.002)+(5.010), (I-130)+(3.002)+(5.011), (I-130)+(3.002)+(5.012), (I-130)+(3.002)+(5.013), (I-130)+(3.002)+(5.014), (I-130)+(3.002)+(5.015), (I-130)+(3.002)+(5.016), (I-130)+(3.002)+(5.017), (I-130)+(3.002)+(5.018), (I-130)+(3.002)+(5.019), (I-130)+(3.002)+(5.020), (I-130)+(3.002)+(5.021), (I-130)+(3.002)+(5.022), (I-130)+(3.002)+(5.023), (I-130)+(3.002)+(6.001), (I-130)+(3.002)+(6.002), (I-130)+(3.002)+(6.003), (I-130)+(3.002)+(6.004), (I-130)+(3.002)+(7.001), (I-130)+(3.002)+(7.002), (I-130)+(3.002)+(7.003), (I-130)+(3.002)+(7.004), (I-130)+(3.002)+(7.005), (I-130)+(3.002)+(7.006), (I-130)+(3.002)+(9.001), (I-130)+(3.002)+(9.002), (I-130)+(3.002)+(9.003), (I-130)+(3.002)+(9.004), (I-130)+(3.002)+(9.005), (I-130)+(3.002)+(9.006), (I-130)+(3.002)+(9.007), (I-130)+(3.002)+(9.008), (I-130)+(3.002)+(9.009), (I-130)+(3.002)+(14.001), (I-130)+(3.002)+(14.002), (I-130)+(3.002)+(15.008), (I-130)+(3.002)+(15.011), (I-130)+(3.002)+(15.012), (I-130)+(3.002)+(15.016), (I-130)+(3.002)+(15.025), (I-130)+(3.002)+(15.027), (I-130)+(3.002)+(15.047), (I-130)+(3.002)+(15.063), (I-130)+(3.002)+(15.064), (I-130)+(3.002)+(16.001), (I-130)+(3.002)+(16.002), (I-130)+(3.002)+(16.003), (I-130)+(3.002)+(16.004), (I-130)+(3.002)+(16.005), (I-130)+(3.002)+(16.006), (I-130)+(3.002)+(16.007), (I-130)+(3.002)+(16.008), (I-130)+(3.002)+(17.001), (I-130)+(3.002)+(17.002), (I-130)+(3.002)+(17.003), (I-130)+(3.002)+(17.004), (I-130)+(3.002)+(17.005), (I-130)+(3.002)+(17.006), (I-130)+(3.002)+(17.007), (I-130)+(3.002)+(17.008), (I-130)+(3.002)+(17.009), (I-130)+(3.002)+(17.010), (I-130)+(3.002)+(17.011), (I-130)+(3.002)+(17.012), (I-130)+(3.002)+(18.001), (I-130)+(3.003)+(3.025), (I-130)+(3.003)+(3.030), (I-130)+(3.003)+(3.031), (I-130)+(3.003)+(5.001), (I-130)+(3.003)+(5.002), (I-130)+(3.003)+(5.003), (I-130)+(3.003)+(5.004), (I-130)+(3.003)+(5.005), (I-130)+(3.003)+(5.006), (I-130)+(3.003)+(5.007), (I-130)+(3.003)+(5.008), (I-130)+(3.003)+(5.009), (I-130)+(3.003)+(5.010), (I-130)+(3.003)+(5.011), (I-130)+(3.003)+(5.012), (I-130)+(3.003)+(5.013), (I-130)+(3.003)+(5.014), (I-130)+(3.003)+(5.015), (I-130)+(3.003)+(5.016), (I-130)+(3.003)+(5.017), (I-130)+(3.003)+(5.018), (I-130)+(3.003)+(5.019), (I-130)+(3.003)+(5.020), (I-130)+(3.003)+(5.021), (I-130)+(3.003)+(5.022), (I-130)+(3.003)+(5.023), (I-130)+(3.003)+(6.001), (I-130)+(3.003)+(6.002), (I-130)+(3.003)+(6.003), (I-130)+(3.003)+(6.004), (I-130)+(3.003)+(7.001), (I-130)+(3.003)+(7.002), (I-130)+(3.003)+(7.003), (I-130)+(3.003)+(7.004), (I-130)+(3.003)+(7.005), (I-130)+(3.003)+(7.006), (I-130)+(3.003)+(9.001), (I-130)+(3.003)+(9.002), (I-130)+(3.003)+(9.003), (I-130)+(3.003)+(9.004), (I-130)+(3.003)+(9.005), (I-130)+(3.003)+(9.006), (I-130)+(3.003)+(9.007), (I-130)+(3.003)+(9.008), (I-130)+(3.003)+(9.009), (I-130)+(3.003)+(14.001), (I-130)+(3.003)+(14.002), (I-130)+(3.003)+(15.008), (I-130)+(3.003)+(15.011), (I-130)+(3.003)+(15.012), (I-130)+(3.003)+(15.016), (I-130)+(3.003)+(15.025), (I-130)+(3.003)+(15.027), (I-130)+(3.003)+(15.047), (I-130)+(3.003)+(15.063), (I-130)+(3.003)+(15.064), (I-130)+(3.003)+(16.001), (I-130)+(3.003)+(16.002), (I-130)+(3.003)+(16.003), (I-130)+(3.003)+(16.004), (I-130)+(3.003)+(16.005), (I-130)+(3.003)+(16.006), (I-130)+(3.003)+(16.007), (I-130)+(3.003)+(16.008), (I-130)+(3.003)+(17.001), (I-130)+(3.003)+(17.002), (I-130)+(3.003)+(17.003), (I-130)+(3.003)+(17.004), (I-130)+(3.003)+(17.005), (I-130)+(3.003)+(17.006), (I-130)+(3.003)+(17.007), (I-130)+(3.003)+(17.008), (I-130)+(3.003)+(17.009), (I-130)+(3.003)+(17.010), (I-130)+(3.003)+(17.011), (I-130)+(3.003)+(17.012), (I-130)+(3.003)+(18.001), (I-130)+(3.004)+(3.025), (I-130)+(3.004)+(3.030), (I-130)+(3.004)+(3.031), (I-130)+(3.004)+(5.001), (I-130)+(3.004)+(5.002), (I-130)+(3.004)+(5.003), (I-130)+(3.004)+(5.004), (I-130)+(3.004)+(5.005), (I-130)+(3.004)+(5.006), (I-130)+(3.004)+(5.007), (I-130)+(3.004)+(5.008), (I-130)+(3.004)+(5.009), (I-130)+(3.004)+(5.010), (I-130)+(3.004)+(5.011), (I-130)+(3.004)+(5.012), (I-130)+(3.004)+(5.013), (I-130)+(3.004)+(5.014), (I-130)+(3.004)+(5.015), (I-130)+(3.004)+(5.016), (I-130)+(3.004)+(5.017), (I-130)+(3.004)+(5.018), (I-130)+(3.004)+(5.019), (I-130)+(3.004)+(5.020), (I-130)+(3.004)+(5.021), (I-130)+(3.004)+(5.022), (I-130)+(3.004)+(5.023), (I-130)+(3.004)+(6.001), (I-130)+(3.004)+(6.002), (I-130)+(3.004)+(6.003), (I-130)+(3.004)+(6.004), (I-130)+(3.004)+(7.001), (I-130)+(3.004)+(7.002), (I-130)+(3.004)+(7.003), (I-130)+(3.004)+(7.004), (I-130)+(3.004)+(7.005), (I-130)+(3.004)+(7.006), (I-130)+(3.004)+(9.001), (I-130)+(3.004)+(9.002), (I-130)+(3.004)+(9.003), (I-130)+(3.004)+(9.004), (I-130)+(3.004)+(9.005), (I-130)+(3.004)+(9.006), (I-130)+(3.004)+(9.007), (I-130)+(3.004)+(9.008), (I-130)+(3.004)+(9.009), (I-130)+(3.004)+(14.001), (I-130)+(3.004)+(14.002), (I-130)+(3.004)+(15.008), (I-130)+(3.004)+(15.011), (I-130)+(3.004)+(15.012), (I-130)+(3.004)+(15.016), (I-130)+(3.004)+(15.025), (I-130)+(3.004)+(15.027), (I-130)+(3.004)+(15.047), (I-130)+(3.004)+(15.063), (I-130)+(3.004)+(15.064), (I-130)+(3.004)+(16.001), (I-130)+(3.004)+(16.002), (I-130)+(3.004)+(16.003), (I-130)+(3.004)+(16.004), (I-130)+(3.004)+(16.005), (I-130)+(3.004)+(16.006), (I-130)+(3.004)+(16.007), (I-130)+(3.004)+(16.008), (I-130)+(3.004)+(17.001), (I-130)+(3.004)+(17.002), (I-130)+(3.004)+(17.003), (I-130)+(3.004)+(17.004), (I-130)+(3.004)+(17.005), (I-130)+(3.004)+(17.006), (I-130)+(3.004)+(17.007), (I-130)+(3.004)+(17.008), (I-130)+(3.004)+(17.009), (I-130)+(3.004)+(17.010), (I-130)+(3.004)+(17.011), (I-130)+(3.004)+(17.012), (I-130)+(3.004)+(18.001), (I-130)+(3.005)+(3.025), (I-130)+(3.005)+(3.030), (I-130)+(3.005)+(3.031), (I-130)+(3.005)+(5.001), (I-130)+(3.005)+(5.002), (I-130)+(3.005)+(5.003), (I-130)+(3.005)+(5.004), (I-130)+(3.005)+(5.005), (I-130)+(3.005)+(5.006), (I-130)+(3.005)+(5.007), (I-130)+(3.005)+(5.008), (I-130)+(3.005)+(5.009), (I-130)+(3.005)+(5.010), (I-130)+(3.005)+(5.011), (I-130)+(3.005)+(5.012), (I-130)+(3.005)+(5.013), (I-130)+(3.005)+(5.014), (I-130)+(3.005)+(5.015), (I-130)+(3.005)+(5.016), (I-130)+(3.005)+(5.017), (I-130)+(3.005)+(5.018), (I-130)+(3.005)+(5.019), (I-130)+(3.005)+(5.020), (I-130)+(3.005)+(5.021), (I-130)+(3.005)+(5.022), (I-130)+(3.005)+(5.023), (I-130)+(3.005)+(6.001), (I-130)+(3.005)+(6.002), (I-130)+(3.005)+(6.003), (I-130)+(3.005)+(6.004), (I-130)+(3.005)+(7.001), (I-130)+(3.005)+(7.002), (I-130)+(3.005)+(7.003), (I-130)+(3.005)+(7.004), (I-130)+(3.005)+(7.005), (I-130)+(3.005)+(7.006), (I-130)+(3.005)+(9.001), (I-130)+(3.005)+(9.002), (I-130)+(3.005)+(9.003), (I-130)+(3.005)+(9.004), (I-130)+(3.005)+(9.005), (I-130)+(3.005)+(9.006), (I-130)+(3.005)+(9.007), (I-130)+(3.005)+(9.008), (I-130)+(3.005)+(9.009), (I-130)+(3.005)+(14.001), (I-130)+(3.005)+(14.002), (I-130)+(3.005)+(15.008), (I-130)+(3.005)+(15.011), (I-130)+(3.005)+(15.012), (I-130)+(3.005)+(15.016), (I-130)+(3.005)+(15.025), (I-130)+(3.005)+(15.027), (I-130)+(3.005)+(15.047), (I-130)+(3.005)+(15.063), (I-130)+(3.005)+(15.064), (I-130)+(3.005)+(16.001), (I-130)+(3.005)+(16.002), (I-130)+(3.005)+(16.003), (I-130)+(3.005)+(16.004), (I-130)+(3.005)+(16.005), (I-130)+(3.005)+(16.006), (I-130)+(3.005)+(16.007), (I-130)+(3.005)+(16.008), (I-130)+(3.005)+(17.001), (I-130)+(3.005)+(17.002), (I-130)+(3.005)+(17.003), (I-130)+(3.005)+(17.004), (I-130)+(3.005)+(17.005), (I-130)+(3.005)+(17.006), (I-130)+(3.005)+(17.007), (I-130)+(3.005)+(17.008), (I-130)+(3.005)+(17.009), (I-130)+(3.005)+(17.010), (I-130)+(3.005)+(17.011), (I-130)+(3.005)+(17.012), (I-130)+(3.005)+(18.001), (I-130)+(3.006)+(3.025), (I-130)+(3.006)+(3.030), (I-130)+(3.006)+(3.031), (I-130)+(3.006)+(5.001), (I-130)+(3.006)+(5.002), (I-130)+(3.006)+(5.003), (I-130)+(3.006)+(5.004), (I-130)+(3.006)+(5.005), (I-130)+(3.006)+(5.006), (I-130)+(3.006)+(5.007), (I-130)+(3.006)+(5.008), (I-130)+(3.006)+(5.009), (I-130)+(3.006)+(5.010), (I-130)+(3.006)+(5.011), (I-130)+(3.006)+(5.012), (I-130)+(3.006)+(5.013), (I-130)+(3.006)+(5.014), (I-130)+(3.006)+(5.015), (I-130)+(3.006)+(5.016), (I-130)+(3.006)+(5.017), (I-130)+(3.006)+(5.018), (I-130)+(3.006)+(5.019), (I-130)+(3.006)+(5.020), (I-130)+(3.006)+(5.021), (I-130)+(3.006)+(5.022), (I-130)+(3.006)+(5.023), (I-130)+(3.006)+(6.001), (I-130)+(3.006)+(6.002), (I-130)+(3.006)+(6.003), (I-130)+(3.006)+(6.004), (I-130)+(3.006)+(7.001), (I-130)+(3.006)+(7.002), (I-130)+(3.006)+(7.003), (I-130)+(3.006)+(7.004), (I-130)+(3.006)+(7.005), (I-130)+(3.006)+(7.006), (I-130)+(3.006)+(9.001), (I-130)+(3.006)+(9.002), (I-130)+(3.006)+(9.003), (I-130)+(3.006)+(9.004), (I-130)+(3.006)+(9.005), (I-130)+(3.006)+(9.006), (I-130)+(3.006)+(9.007), (I-130)+(3.006)+(9.008), (I-130)+(3.006)+(9.009), (I-130)+(3.006)+(14.001), (I-130)+(3.006)+(14.002), (I-130)+(3.006)+(15.008), (I-130)+(3.006)+(15.011), (I-130)+(3.006)+(15.012), (I-130)+(3.006)+(15.016), (I-130)+(3.006)+(15.025), (I-130)+(3.006)+(15.027), (I-130)+(3.006)+(15.047), (I-130)+(3.006)+(15.063), (I-130)+(3.006)+(15.064), (I-130)+(3.006)+(16.001), (I-130)+(3.006)+(16.002), (I-130)+(3.006)+(16.003), (I-130)+(3.006)+(16.004), (I-130)+(3.006)+(16.005), (I-130)+(3.006)+(16.006), (I-130)+(3.006)+(16.007), (I-130)+(3.006)+(16.008), (I-130)+(3.006)+(17.001), (I-130)+(3.006)+(17.002), (I-130)+(3.006)+(17.003), (I-130)+(3.006)+(17.004), (I-130)+(3.006)+(17.005), (I-130)+(3.006)+(17.006), (I-130)+(3.006)+(17.007), (I-130)+(3.006)+(17.008), (I-130)+(3.006)+(17.009), (I-130)+(3.006)+(17.010), (I-130)+(3.006)+(17.011), (I-130)+(3.006)+(17.012), (I-130)+(3.006)+(18.001), (I-130)+(3.007)+(3.025), (I-130)+(3.007)+(3.030), (I-130)+(3.007)+(3.031), (I-130)+(3.007)+(5.001), (I-130)+(3.007)+(5.002), (I-130)+(3.007)+(5.003), (I-130)+(3.007)+(5.004), (I-130)+(3.007)+(5.005), (I-130)+(3.007)+(5.006), (I-130)+(3.007)+(5.007), (I-130)+(3.007)+(5.008), (I-130)+(3.007)+(5.009), (I-130)+(3.007)+(5.010), (I-130)+(3.007)+(5.011), (I-130)+(3.007)+(5.012), (I-130)+(3.007)+(5.013), (I-130)+(3.007)+(5.014), (I-130)+(3.007)+(5.015), (I-130)+(3.007)+(5.016), (I-130)+(3.007)+(5.017), (I-130)+(3.007)+(5.018), (I-130)+(3.007)+(5.019), (I-130)+(3.007)+(5.020), (I-130)+(3.007)+(5.021), (I-130)+(3.007)+(5.022), (I-130)+(3.007)+(5.023), (I-130)+(3.007)+(6.001), (I-130)+(3.007)+(6.002), (I-130)+(3.007)+(6.003), (I-130)+(3.007)+(6.004), (I-130)+(3.007)+(7.001), (I-130)+(3.007)+(7.002), (I-130)+(3.007)+(7.003), (I-130)+(3.007)+(7.004), (I-130)+(3.007)+(7.005), (I-130)+(3.007)+(7.006), (I-130)+(3.007)+(9.001), (I-130)+(3.007)+(9.002), (I-130)+(3.007)+(9.003), (I-130)+(3.007)+(9.004), (I-130)+(3.007)+(9.005), (I-130)+(3.007)+(9.006), (I-130)+(3.007)+(9.007), (I-130)+(3.007)+(9.008), (I-130)+(3.007)+(9.009), (I-130)+(3.007)+(14.001), (I-130)+(3.007)+(14.002), (I-130)+(3.007)+(15.008), (I-130)+(3.007)+(15.011), (I-130)+(3.007)+(15.012), (I-130)+(3.007)+(15.016), (I-130)+(3.007)+(15.025), (I-130)+(3.007)+(15.027), (I-130)+(3.007)+(15.047), (I-130)+(3.007)+(15.063), (I-130)+(3.007)+(15.064), (I-130)+(3.007)+(16.001), (I-130)+(3.007)+(16.002), (I-130)+(3.007)+(16.003), (I-130)+(3.007)+(16.004), (I-130)+(3.007)+(16.005), (I-130)+(3.007)+(16.006), (I-130)+(3.007)+(16.007), (I-130)+(3.007)+(16.008), (I-130)+(3.007)+(17.001), (I-130)+(3.007)+(17.002), (I-130)+(3.007)+(17.003), (I-130)+(3.007)+(17.004), (I-130)+(3.007)+(17.005), (I-130)+(3.007)+(17.006), (I-130)+(3.007)+(17.007), (I-130)+(3.007)+(17.008), (I-130)+(3.007)+(17.009), (I-130)+(3.007)+(17.010), (I-130)+(3.007)+(17.011), (I-130)+(3.007)+(17.012), (I-130)+(3.007)+(18.001), (I-130)+(3.008)+(3.025), (I-130)+(3.008)+(3.030), (I-130)+(3.008)+(3.031), (I-130)+(3.008)+(5.001), (I-130)+(3.008)+(5.002), (I-130)+(3.008)+(5.003), (I-130)+(3.008)+(5.004), (I-130)+(3.008)+(5.005), (I-130)+(3.008)+(5.006), (I-130)+(3.008)+(5.007), (I-130)+(3.008)+(5.008), (I-130)+(3.008)+(5.009), (I-130)+(3.008)+(5.010), (I-130)+(3.008)+(5.011), (I-130)+(3.008)+(5.012), (I-130)+(3.008)+(5.013), (I-130)+(3.008)+(5.014), (I-130)+(3.008)+(5.015), (I-130)+(3.008)+(5.016), (I-130)+(3.008)+(5.017), (I-130)+(3.008)+(5.018), (I-130)+(3.008)+(5.019), (I-130)+(3.008)+(5.020), (I-130)+(3.008)+(5.021), (I-130)+(3.008)+(5.022), (I-130)+(3.008)+(5.023), (I-130)+(3.008)+(6.001), (I-130)+(3.008)+(6.002), (I-130)+(3.008)+(6.003), (I-130)+(3.008)+(6.004), (I-130)+(3.008)+(7.001), (I-130)+(3.008)+(7.002), (I-130)+(3.008)+(7.003), (I-130)+(3.008)+(7.004), (I-130)+(3.008)+(7.005), (I-130)+(3.008)+(7.006), (I-130)+(3.008)+(9.001), (I-130)+(3.008)+(9.002), (I-130)+(3.008)+(9.003), (I-130)+(3.008)+(9.004), (I-130)+(3.008)+(9.005), (I-130)+(3.008)+(9.006), (I-130)+(3.008)+(9.007), (I-130)+(3.008)+(9.008), (I-130)+(3.008)+(9.009), (I-130)+(3.008)+(14.001), (I-130)+(3.008)+(14.002), (I-130)+(3.008)+(15.008), (I-130)+(3.008)+(15.011), (I-130)+(3.008)+(15.012), (I-130)+(3.008)+(15.016), (I-130)+(3.008)+(15.025), (I-130)+(3.008)+(15.027), (I-130)+(3.008)+(15.047), (I-130)+(3.008)+(15.063), (I-130)+(3.008)+(15.064), (I-130)+(3.008)+(16.001), (I-130)+(3.008)+(16.002), (I-130)+(3.008)+(16.003), (I-130)+(3.008)+(16.004), (I-130)+(3.008)+(16.005), (I-130)+(3.008)+(16.006), (I-130)+(3.008)+(16.007), (I-130)+(3.008)+(16.008), (I-130)+(3.008)+(17.001), (I-130)+(3.008)+(17.002), (I-130)+(3.008)+(17.003), (I-130)+(3.008)+(17.004), (I-130)+(3.008)+(17.005), (I-130)+(3.008)+(17.006), (I-130)+(3.008)+(17.007), (I-130)+(3.008)+(17.008), (I-130)+(3.008)+(17.009), (I-130)+(3.008)+(17.010), (I-130)+(3.008)+(17.011), (I-130)+(3.008)+(17.012), (I-130)+(3.008)+(18.001), (I-130)+(3.009)+(3.025), (I-130)+(3.009)+(3.030), (I-130)+(3.009)+(3.031), (I-130)+(3.009)+(5.001), (I-130)+(3.009)+(5.002), (I-130)+(3.009)+(5.003), (I-130)+(3.009)+(5.004), (I-130)+(3.009)+(5.005), (I-130)+(3.009)+(5.006), (I-130)+(3.009)+(5.007), (I-130)+(3.009)+(5.008), (I-130)+(3.009)+(5.009), (I-130)+(3.009)+(5.010), (I-130)+(3.009)+(5.011), (I-130)+(3.009)+(5.012), (I-130)+(3.009)+(5.013), (I-130)+(3.009)+(5.014), (I-130)+(3.009)+(5.015), (I-130)+(3.009)+(5.016), (I-130)+(3.009)+(5.017), (I-130)+(3.009)+(5.018), (I-130)+(3.009)+(5.019), (I-130)+(3.009)+(5.020), (I-130)+(3.009)+(5.021), (I-130)+(3.009)+(5.022), (I-130)+(3.009)+(5.023), (I-130)+(3.009)+(6.001), (I-130)+(3.009)+(6.002), (I-130)+(3.009)+(6.003), (I-130)+(3.009)+(6.004), (I-130)+(3.009)+(7.001), (I-130)+(3.009)+(7.002), (I-130)+(3.009)+(7.003), (I-130)+(3.009)+(7.004), (I-130)+(3.009)+(7.005), (I-130)+(3.009)+(7.006), (I-130)+(3.009)+(9.001), (I-130)+(3.009)+(9.002), (I-130)+(3.009)+(9.003), (I-130)+(3.009)+(9.004), (I-130)+(3.009)+(9.005), (I-130)+(3.009)+(9.006), (I-130)+(3.009)+(9.007), (I-130)+(3.009)+(9.008), (I-130)+(3.009)+(9.009), (I-130)+(3.009)+(14.001), (I-130)+(3.009)+(14.002), (I-130)+(3.009)+(15.008), (I-130)+(3.009)+(15.011), (I-130)+(3.009)+(15.012), (I-130)+(3.009)+(15.016), (I-130)+(3.009)+(15.025), (I-130)+(3.009)+(15.027), (I-130)+(3.009)+(15.047), (I-130)+(3.009)+(15.063), (I-130)+(3.009)+(15.064), (I-130)+(3.009)+(16.001), (I-130)+(3.009)+(16.002), (I-130)+(3.009)+(16.003), (I-130)+(3.009)+(16.004), (I-130)+(3.009)+(16.005), (I-130)+(3.009)+(16.006), (I-130)+(3.009)+(16.007), (I-130)+(3.009)+(16.008), (I-130)+(3.009)+(17.001), (I-130)+(3.009)+(17.002), (I-130)+(3.009)+(17.003), (I-130)+(3.009)+(17.004), (I-130)+(3.009)+(17.005), (I-130)+(3.009)+(17.006), (I-130)+(3.009)+(17.007), (I-130)+(3.009)+(17.008), (I-130)+(3.009)+(17.009), (I-130)+(3.009)+(17.010), (I-130)+(3.009)+(17.011), (I-130)+(3.009)+(17.012), (I-130)+(3.009)+(18.001), (I-130)+(3.010)+(3.025), (I-130)+(3.010)+(3.030), (I-130)+(3.010)+(3.031), (I-130)+(3.010)+(5.001), (I-130)+(3.010)+(5.002), (I-130)+(3.010)+(5.003), (I-130)+(3.010)+(5.004), (I-130)+(3.010)+(5.005), (I-130)+(3.010)+(5.006), (I-130)+(3.010)+(5.007), (I-130)+(3.010)+(5.008), (I-130)+(3.010)+(5.009), (I-130)+(3.010)+(5.010), (I-130)+(3.010)+(5.011), (I-130)+(3.010)+(5.012), (I-130)+(3.010)+(5.013), (I-130)+(3.010)+(5.014), (I-130)+(3.010)+(5.015), (I-130)+(3.010)+(5.016), (I-130)+(3.010)+(5.017), (I-130)+(3.010)+(5.018), (I-130)+(3.010)+(5.019), (I-130)+(3.010)+(5.020), (I-130)+(3.010)+(5.021), (I-130)+(3.010)+(5.022), (I-130)+(3.010)+(5.023), (I-130)+(3.010)+(6.001), (I-130)+(3.010)+(6.002), (I-130)+(3.010)+(6.003), (I-130)+(3.010)+(6.004), (I-130)+(3.010)+(7.001), (I-130)+(3.010)+(7.002), (I-130)+(3.010)+(7.003), (I-130)+(3.010)+(7.004), (I-130)+(3.010)+(7.005), (I-130)+(3.010)+(7.006), (I-130)+(3.010)+(9.001), (I-130)+(3.010)+(9.002), (I-130)+(3.010)+(9.003), (I-130)+(3.010)+(9.004), (I-130)+(3.010)+(9.005), (I-130)+(3.010)+(9.006), (I-130)+(3.010)+(9.007), (I-130)+(3.010)+(9.008), (I-130)+(3.010)+(9.009), (I-130)+(3.010)+(14.001), (I-130)+(3.010)+(14.002), (I-130)+(3.010)+(15.008), (I-130)+(3.010)+(15.011), (I-130)+(3.010)+(15.012), (I-130)+(3.010)+(15.016), (I-130)+(3.010)+(15.025), (I-130)+(3.010)+(15.027), (I-130)+(3.010)+(15.047), (I-130)+(3.010)+(15.063), (I-130)+(3.010)+(15.064), (I-130)+(3.010)+(16.001), (I-130)+(3.010)+(16.002), (I-130)+(3.010)+(16.003), (I-130)+(3.010)+(16.004), (I-130)+(3.010)+(16.005), (I-130)+(3.010)+(16.006), (I-130)+(3.010)+(16.007), (I-130)+(3.010)+(16.008), (I-130)+(3.010)+(17.001), (I-130)+(3.010)+(17.002), (I-130)+(3.010)+(17.003), (I-130)+(3.010)+(17.004), (I-130)+(3.010)+(17.005), (I-130)+(3.010)+(17.006), (I-130)+(3.010)+(17.007), (I-130)+(3.010)+(17.008), (I-130)+(3.010)+(17.009), (I-130)+(3.010)+(17.010), (I-130)+(3.010)+(17.011), (I-130)+(3.010)+(17.012), (I-130)+(3.010)+(18.001), (I-130)+(3.011)+(3.025), (I-130)+(3.011)+(3.030), (I-130)+(3.011)+(3.031), (I-130)+(3.011)+(5.001), (I-130)+(3.011)+(5.002), (I-130)+(3.011)+(5.003), (I-130)+(3.011)+(5.004), (I-130)+(3.011)+(5.005), (I-130)+(3.011)+(5.006), (I-130)+(3.011)+(5.007), (I-130)+(3.011)+(5.008), (I-130)+(3.011)+(5.009), (I-130)+(3.011)+(5.010), (I-130)+(3.011)+(5.011), (I-130)+(3.011)+(5.012), (I-130)+(3.011)+(5.013), (I-130)+(3.011)+(5.014), (I-130)+(3.011)+(5.015), (I-130)+(3.011)+(5.016), (I-130)+(3.011)+(5.017), (I-130)+(3.011)+(5.018), (I-130)+(3.011)+(5.019), (I-130)+(3.011)+(5.020), (I-130)+(3.011)+(5.021), (I-130)+(3.011)+(5.022), (I-130)+(3.011)+(5.023), (I-130)+(3.011)+(6.001), (I-130)+(3.011)+(6.002), (I-130)+(3.011)+(6.003), (I-130)+(3.011)+(6.004), (I-130)+(3.011)+(7.001), (I-130)+(3.011)+(7.002), (I-130)+(3.011)+(7.003), (I-130)+(3.011)+(7.004), (I-130)+(3.011)+(7.005), (I-130)+(3.011)+(7.006), (I-130)+(3.011)+(9.001), (I-130)+(3.011)+(9.002), (I-130)+(3.011)+(9.003), (I-130)+(3.011)+(9.004), (I-130)+(3.011)+(9.005), (I-130)+(3.011)+(9.006), (I-130)+(3.011)+(9.007), (I-130)+(3.011)+(9.008), (I-130)+(3.011)+(9.009), (I-130)+(3.011)+(14.001), (I-130)+(3.011)+(14.002), (I-130)+(3.011)+(15.008), (I-130)+(3.011)+(15.011), (I-130)+(3.011)+(15.012), (I-130)+(3.011)+(15.016), (I-130)+(3.011)+(15.025), (I-130)+(3.011)+(15.027), (I-130)+(3.011)+(15.047), (I-130)+(3.011)+(15.063), (I-130)+(3.011)+(15.064), (I-130)+(3.011)+(16.001), (I-130)+(3.011)+(16.002), (I-130)+(3.011)+(16.003), (I-130)+(3.011)+(16.004), (I-130)+(3.011)+(16.005), (I-130)+(3.011)+(16.006), (I-130)+(3.011)+(16.007), (I-130)+(3.011)+(16.008), (I-130)+(3.011)+(17.001), (I-130)+(3.011)+(17.002), (I-130)+(3.011)+(17.003), (I-130)+(3.011)+(17.004), (I-130)+(3.011)+(17.005), (I-130)+(3.011)+(17.006), (I-130)+(3.011)+(17.007), (I-130)+(3.011)+(17.008), (I-130)+(3.011)+(17.009), (I-130)+(3.011)+(17.010), (I-130)+(3.011)+(17.011), (I-130)+(3.011)+(17.012), (I-130)+(3.011)+(18.001), (I-130)+(3.012)+(3.025), (I-130)+(3.012)+(3.030), (I-130)+(3.012)+(3.031), (I-130)+(3.012)+(5.001), (I-130)+(3.012)+(5.002), (I-130)+(3.012)+(5.003), (I-130)+(3.012)+(5.004), (I-130)+(3.012)+(5.005), (I-130)+(3.012)+(5.006), (I-130)+(3.012)+(5.007), (I-130)+(3.012)+(5.008), (I-130)+(3.012)+(5.009), (I-130)+(3.012)+(5.010), (I-130)+(3.012)+(5.011), (I-130)+(3.012)+(5.012), (I-130)+(3.012)+(5.013), (I-130)+(3.012)+(5.014), (I-130)+(3.012)+(5.015), (I-130)+(3.012)+(5.016), (I-130)+(3.012)+(5.017), (I-130)+(3.012)+(5.018), (I-130)+(3.012)+(5.019), (I-130)+(3.012)+(5.020), (I-130)+(3.012)+(5.021), (I-130)+(3.012)+(5.022), (I-130)+(3.012)+(5.023), (I-130)+(3.012)+(6.001), (I-130)+(3.012)+(6.002), (I-130)+(3.012)+(6.003), (I-130)+(3.012)+(6.004), (I-130)+(3.012)+(7.001), (I-130)+(3.012)+(7.002), (I-130)+(3.012)+(7.003), (I-130)+(3.012)+(7.004), (I-130)+(3.012)+(7.005), (I-130)+(3.012)+(7.006), (I-130)+(3.012)+(9.001), (I-130)+(3.012)+(9.002), (I-130)+(3.012)+(9.003), (I-130)+(3.012)+(9.004), (I-130)+(3.012)+(9.005), (I-130)+(3.012)+(9.006), (I-130)+(3.012)+(9.007), (I-130)+(3.012)+(9.008), (I-130)+(3.012)+(9.009), (I-130)+(3.012)+(14.001), (I-130)+(3.012)+(14.002), (I-130)+(3.012)+(15.008), (I-130)+(3.012)+(15.011), (I-130)+(3.012)+(15.012), (I-130)+(3.012)+(15.016), (I-130)+(3.012)+(15.025), (I-130)+(3.012)+(15.027), (I-130)+(3.012)+(15.047), (I-130)+(3.012)+(15.063), (I-130)+(3.012)+(15.064), (I-130)+(3.012)+(16.001), (I-130)+(3.012)+(16.002), (I-130)+(3.012)+(16.003), (I-130)+(3.012)+(16.004), (I-130)+(3.012)+(16.005), (I-130)+(3.012)+(16.006), (I-130)+(3.012)+(16.007), (I-130)+(3.012)+(16.008), (I-130)+(3.012)+(17.001), (I-130)+(3.012)+(17.002), (I-130)+(3.012)+(17.003), (I-130)+(3.012)+(17.004), (I-130)+(3.012)+(17.005), (I-130)+(3.012)+(17.006), (I-130)+(3.012)+(17.007), (I-130)+(3.012)+(17.008), (I-130)+(3.012)+(17.009), (I-130)+(3.012)+(17.010), (I-130)+(3.012)+(17.011), (I-130)+(3.012)+(17.012), (I-130)+(3.012)+(18.001), (I-130)+(3.013)+(3.025), (I-130)+(3.013)+(3.030), (I-130)+(3.013)+(3.031), (I-130)+(3.013)+(5.001), (I-130)+(3.013)+(5.002), (I-130)+(3.013)+(5.003), (I-130)+(3.013)+(5.004), (I-130)+(3.013)+(5.005), (I-130)+(3.013)+(5.006), (I-130)+(3.013)+(5.007), (I-130)+(3.013)+(5.008), (I-130)+(3.013)+(5.009), (I-130)+(3.013)+(5.010), (I-130)+(3.013)+(5.011), (I-130)+(3.013)+(5.012), (I-130)+(3.013)+(5.013), (I-130)+(3.013)+(5.014), (I-130)+(3.013)+(5.015), (I-130)+(3.013)+(5.016), (I-130)+(3.013)+(5.017), (I-130)+(3.013)+(5.018), (I-130)+(3.013)+(5.019), (I-130)+(3.013)+(5.020), (I-130)+(3.013)+(5.021), (I-130)+(3.013)+(5.022), (I-130)+(3.013)+(5.023), (I-130)+(3.013)+(6.001), (I-130)+(3.013)+(6.002), (I-130)+(3.013)+(6.003), (I-130)+(3.013)+(6.004), (I-130)+(3.013)+(7.001), (I-130)+(3.013)+(7.002), (I-130)+(3.013)+(7.003), (I-130)+(3.013)+(7.004), (I-130)+(3.013)+(7.005), (I-130)+(3.013)+(7.006), (I-130)+(3.013)+(9.001), (I-130)+(3.013)+(9.002), (I-130)+(3.013)+(9.003), (I-130)+(3.013)+(9.004), (I-130)+(3.013)+(9.005), (I-130)+(3.013)+(9.006), (I-130)+(3.013)+(9.007), (I-130)+(3.013)+(9.008), (I-130)+(3.013)+(9.009), (I-130)+(3.013)+(14.001), (I-130)+(3.013)+(14.002), (I-130)+(3.013)+(15.008), (I-130)+(3.013)+(15.011), (I-130)+(3.013)+(15.012), (I-130)+(3.013)+(15.016), (I-130)+(3.013)+(15.025), (I-130)+(3.013)+(15.027), (I-130)+(3.013)+(15.047), (I-130)+(3.013)+(15.063), (I-130)+(3.013)+(15.064), (I-130)+(3.013)+(16.001), (I-130)+(3.013)+(16.002), (I-130)+(3.013)+(16.003), (I-130)+(3.013)+(16.004), (I-130)+(3.013)+(16.005), (I-130)+(3.013)+(16.006), (I-130)+(3.013)+(16.007), (I-130)+(3.013)+(16.008), (I-130)+(3.013)+(17.001), (I-130)+(3.013)+(17.002), (I-130)+(3.013)+(17.003), (I-130)+(3.013)+(17.004), (I-130)+(3.013)+(17.005), (I-130)+(3.013)+(17.006), (I-130)+(3.013)+(17.007), (I-130)+(3.013)+(17.008), (I-130)+(3.013)+(17.009), (I-130)+(3.013)+(17.010), (I-130)+(3.013)+(17.011), (I-130)+(3.013)+(17.012), (I-130)+(3.013)+(18.001), (I-130)+(3.014)+(3.025), (I-130)+(3.014)+(3.030), (I-130)+(3.014)+(3.031), (I-130)+(3.014)+(5.001), (I-130)+(3.014)+(5.002), (I-130)+(3.014)+(5.003), (I-130)+(3.014)+(5.004), (I-130)+(3.014)+(5.005), (I-130)+(3.014)+(5.006), (I-130)+(3.014)+(5.007), (I-130)+(3.014)+(5.008), (I-130)+(3.014)+(5.009), (I-130)+(3.014)+(5.010), (I-130)+(3.014)+(5.011), (I-130)+(3.014)+(5.012), (I-130)+(3.014)+(5.013), (I-130)+(3.014)+(5.014), (I-130)+(3.014)+(5.015), (I-130)+(3.014)+(5.016), (I-130)+(3.014)+(5.017), (I-130)+(3.014)+(5.018), (I-130)+(3.014)+(5.019), (I-130)+(3.014)+(5.020), (I-130)+(3.014)+(5.021), (I-130)+(3.014)+(5.022), (I-130)+(3.014)+(5.023), (I-130)+(3.014)+(6.001), (I-130)+(3.014)+(6.002), (I-130)+(3.014)+(6.003), (I-130)+(3.014)+(6.004), (I-130)+(3.014)+(7.001), (I-130)+(3.014)+(7.002), (I-130)+(3.014)+(7.003), (I-130)+(3.014)+(7.004), (I-130)+(3.014)+(7.005), (I-130)+(3.014)+(7.006), (I-130)+(3.014)+(9.001), (I-130)+(3.014)+(9.002), (I-130)+(3.014)+(9.003), (I-130)+(3.014)+(9.004), (I-130)+(3.014)+(9.005), (I-130)+(3.014)+(9.006), (I-130)+(3.014)+(9.007), (I-130)+(3.014)+(9.008), (I-130)+(3.014)+(9.009), (I-130)+(3.014)+(14.001), (I-130)+(3.014)+(14.002), (I-130)+(3.014)+(15.008), (I-130)+(3.014)+(15.011), (I-130)+(3.014)+(15.012), (I-130)+(3.014)+(15.016), (I-130)+(3.014)+(15.025), (I-130)+(3.014)+(15.027), (I-130)+(3.014)+(15.047), (I-130)+(3.014)+(15.063), (I-130)+(3.014)+(15.064), (I-130)+(3.014)+(16.001), (I-130)+(3.014)+(16.002), (I-130)+(3.014)+(16.003), (I-130)+(3.014)+(16.004), (I-130)+(3.014)+(16.005), (I-130)+(3.014)+(16.006), (I-130)+(3.014)+(16.007), (I-130)+(3.014)+(16.008), (I-130)+(3.014)+(17.001), (I-130)+(3.014)+(17.002), (I-130)+(3.014)+(17.003), (I-130)+(3.014)+(17.004), (I-130)+(3.014)+(17.005), (I-130)+(3.014)+(17.006), (I-130)+(3.014)+(17.007), (I-130)+(3.014)+(17.008), (I-130)+(3.014)+(17.009), (I-130)+(3.014)+(17.010), (I-130)+(3.014)+(17.011), (I-130)+(3.014)+(17.012), (I-130)+(3.014)+(18.001), (I-130)+(3.015)+(3.025), (I-130)+(3.015)+(3.030), (I-130)+(3.015)+(3.031), (I-130)+(3.015)+(5.001), (I-130)+(3.015)+(5.002), (I-130)+(3.015)+(5.003), (I-130)+(3.015)+(5.004), (I-130)+(3.015)+(5.005), (I-130)+(3.015)+(5.006), (I-130)+(3.015)+(5.007), (I-130)+(3.015)+(5.008), (I-130)+(3.015)+(5.009), (I-130)+(3.015)+(5.010), (I-130)+(3.015)+(5.011), (I-130)+(3.015)+(5.012), (I-130)+(3.015)+(5.013), (I-130)+(3.015)+(5.014), (I-130)+(3.015)+(5.015), (I-130)+(3.015)+(5.016), (I-130)+(3.015)+(5.017), (I-130)+(3.015)+(5.018), (I-130)+(3.015)+(5.019), (I-130)+(3.015)+(5.020), (I-130)+(3.015)+(5.021), (I-130)+(3.015)+(5.022), (I-130)+(3.015)+(5.023), (I-130)+(3.015)+(6.001), (I-130)+(3.015)+(6.002), (I-130)+(3.015)+(6.003), (I-130)+(3.015)+(6.004), (I-130)+(3.015)+(7.001), (I-130)+(3.015)+(7.002), (I-130)+(3.015)+(7.003), (I-130)+(3.015)+(7.004), (I-130)+(3.015)+(7.005), (I-130)+(3.015)+(7.006), (I-130)+(3.015)+(9.001), (I-130)+(3.015)+(9.002), (I-130)+(3.015)+(9.003), (I-130)+(3.015)+(9.004), (I-130)+(3.015)+(9.005), (I-130)+(3.015)+(9.006), (I-130)+(3.015)+(9.007), (I-130)+(3.015)+(9.008), (I-130)+(3.015)+(9.009), (I-130)+(3.015)+(14.001), (I-130)+(3.015)+(14.002), (I-130)+(3.015)+(15.008), (I-130)+(3.015)+(15.011), (I-130)+(3.015)+(15.012), (I-130)+(3.015)+(15.016), (I-130)+(3.015)+(15.025), (I-130)+(3.015)+(15.027), (I-130)+(3.015)+(15.047), (I-130)+(3.015)+(15.063), (I-130)+(3.015)+(15.064), (I-130)+(3.015)+(16.001), (I-130)+(3.015)+(16.002), (I-130)+(3.015)+(16.003), (I-130)+(3.015)+(16.004), (I-130)+(3.015)+(16.005), (I-130)+(3.015)+(16.006), (I-130)+(3.015)+(16.007), (I-130)+(3.015)+(16.008), (I-130)+(3.015)+(17.001), (I-130)+(3.015)+(17.002), (I-130)+(3.015)+(17.003), (I-130)+(3.015)+(17.004), (I-130)+(3.015)+(17.005), (I-130)+(3.015)+(17.006), (I-130)+(3.015)+(17.007), (I-130)+(3.015)+(17.008), (I-130)+(3.015)+(17.009), (I-130)+(3.015)+(17.010), (I-130)+(3.015)+(17.011), (I-130)+(3.015)+(17.012), (I-130)+(3.015)+(18.001), (I-130)+(3.016)+(3.025), (I-130)+(3.016)+(3.030), (I-130)+(3.016)+(3.031), (I-130)+(3.016)+(5.001), (I-130)+(3.016)+(5.002), (I-130)+(3.016)+(5.003), (I-130)+(3.016)+(5.004), (I-130)+(3.016)+(5.005), (I-130)+(3.016)+(5.006), (I-130)+(3.016)+(5.007), (I-130)+(3.016)+(5.008), (I-130)+(3.016)+(5.009), (I-130)+(3.016)+(5.010), (I-130)+(3.016)+(5.011), (I-130)+(3.016)+(5.012), (I-130)+(3.016)+(5.013), (I-130)+(3.016)+(5.014), (I-130)+(3.016)+(5.015), (I-130)+(3.016)+(5.016), (I-130)+(3.016)+(5.017), (I-130)+(3.016)+(5.018), (I-130)+(3.016)+(5.019), (I-130)+(3.016)+(5.020), (I-130)+(3.016)+(5.021), (I-130)+(3.016)+(5.022), (I-130)+(3.016)+(5.023), (I-130)+(3.016)+(6.001), (I-130)+(3.016)+(6.002), (I-130)+(3.016)+(6.003), (I-130)+(3.016)+(6.004), (I-130)+(3.016)+(7.001), (I-130)+(3.016)+(7.002), (I-130)+(3.016)+(7.003), (I-130)+(3.016)+(7.004), (I-130)+(3.016)+(7.005), (I-130)+(3.016)+(7.006), (I-130)+(3.016)+(9.001), (I-130)+(3.016)+(9.002), (I-130)+(3.016)+(9.003), (I-130)+(3.016)+(9.004), (I-130)+(3.016)+(9.005), (I-130)+(3.016)+(9.006), (I-130)+(3.016)+(9.007), (I-130)+(3.016)+(9.008), (I-130)+(3.016)+(9.009), (I-130)+(3.016)+(14.001), (I-130)+(3.016)+(14.002), (I-130)+(3.016)+(15.008), (I-130)+(3.016)+(15.011), (I-130)+(3.016)+(15.012), (I-130)+(3.016)+(15.016), (I-130)+(3.016)+(15.025), (I-130)+(3.016)+(15.027), (I-130)+(3.016)+(15.047), (I-130)+(3.016)+(15.063), (I-130)+(3.016)+(15.064), (I-130)+(3.016)+(16.001), (I-130)+(3.016)+(16.002), (I-130)+(3.016)+(16.003), (I-130)+(3.016)+(16.004), (I-130)+(3.016)+(16.005), (I-130)+(3.016)+(16.006), (I-130)+(3.016)+(16.007), (I-130)+(3.016)+(16.008), (I-130)+(3.016)+(17.001), (I-130)+(3.016)+(17.002), (I-130)+(3.016)+(17.003), (I-130)+(3.016)+(17.004), (I-130)+(3.016)+(17.005), (I-130)+(3.016)+(17.006), (I-130)+(3.016)+(17.007), (I-130)+(3.016)+(17.008), (I-130)+(3.016)+(17.009), (I-130)+(3.016)+(17.010), (I-130)+(3.016)+(17.011), (I-130)+(3.016)+(17.012), (I-130)+(3.016)+(18.001), (I-130)+(3.017)+(3.025), (I-130)+(3.017)+(3.030), (I-130)+(3.017)+(3.031), (I-130)+(3.017)+(5.001), (I-130)+(3.017)+(5.002), (I-130)+(3.017)+(5.003), (I-130)+(3.017)+(5.004), (I-130)+(3.017)+(5.005), (I-130)+(3.017)+(5.006), (I-130)+(3.017)+(5.007), (I-130)+(3.017)+(5.008), (I-130)+(3.017)+(5.009), (I-130)+(3.017)+(5.010), (I-130)+(3.017)+(5.011), (I-130)+(3.017)+(5.012), (I-130)+(3.017)+(5.013), (I-130)+(3.017)+(5.014), (I-130)+(3.017)+(5.015), (I-130)+(3.017)+(5.016), (I-130)+(3.017)+(5.017), (I-130)+(3.017)+(5.018), (I-130)+(3.017)+(5.019), (I-130)+(3.017)+(5.020), (I-130)+(3.017)+(5.021), (I-130)+(3.017)+(5.022), (I-130)+(3.017)+(5.023), (I-130)+(3.017)+(6.001), (I-130)+(3.017)+(6.002), (I-130)+(3.017)+(6.003), (I-130)+(3.017)+(6.004), (I-130)+(3.017)+(7.001), (I-130)+(3.017)+(7.002), (I-130)+(3.017)+(7.003), (I-130)+(3.017)+(7.004), (I-130)+(3.017)+(7.005), (I-130)+(3.017)+(7.006), (I-130)+(3.017)+(9.001), (I-130)+(3.017)+(9.002), (I-130)+(3.017)+(9.003), (I-130)+(3.017)+(9.004), (I-130)+(3.017)+(9.005), (I-130)+(3.017)+(9.006), (I-130)+(3.017)+(9.007), (I-130)+(3.017)+(9.008), (I-130)+(3.017)+(9.009), (I-130)+(3.017)+(14.001), (I-130)+(3.017)+(14.002), (I-130)+(3.017)+(15.008), (I-130)+(3.017)+(15.011), (I-130)+(3.017)+(15.012), (I-130)+(3.017)+(15.016), (I-130)+(3.017)+(15.025), (I-130)+(3.017)+(15.027), (I-130)+(3.017)+(15.047), (I-130)+(3.017)+(15.063), (I-130)+(3.017)+(15.064), (I-130)+(3.017)+(16.001), (I-130)+(3.017)+(16.002), (I-130)+(3.017)+(16.003), (I-130)+(3.017)+(16.004), (I-130)+(3.017)+(16.005), (I-130)+(3.017)+(16.006), (I-130)+(3.017)+(16.007), (I-130)+(3.017)+(16.008), (I-130)+(3.017)+(17.001), (I-130)+(3.017)+(17.002), (I-130)+(3.017)+(17.003), (I-130)+(3.017)+(17.004), (I-130)+(3.017)+(17.005), (I-130)+(3.017)+(17.006), (I-130)+(3.017)+(17.007), (I-130)+(3.017)+(17.008), (I-130)+(3.017)+(17.009), (I-130)+(3.017)+(17.010), (I-130)+(3.017)+(17.011), (I-130)+(3.017)+(17.012), (I-130)+(3.017)+(18.001),
(I-130)+(3.018)+(3.025), (I-130)+(3.018)+(3.030), (I-130)+(3.018)+(3.031), (I-130)+(3.018)+(5.001), (I-130)+(3.018)+(5.002), (I-130)+(3.018)+(5.003), (I-130)+(3.018)+(5.004), (I-130)+(3.018)+(5.005), (I-130)+(3.018)+(5.006), (I-130)+(3.018)+(5.007), (I-130)+(3.018)+(5.008), (I-130)+(3.018)+(5.009), (I-130)+(3.018)+(5.010), (I-130)+(3.018)+(5.011), (I-130)+(3.018)+(5.012), (I-130)+(3.018)+(5.013), (I-130)+(3.018)+(5.014), (I-130)+(3.018)+(5.015), (I-130)+(3.018)+(5.016), (I-130)+(3.018)+(5.017), (I-130)+(3.018)+(5.018), (I-130)+(3.018)+(5.019), (I-130)+(3.018)+(5.020), (I-130)+(3.018)+(5.021), (I-130)+(3.018)+(5.022), (I-130)+(3.018)+(5.023), (I-130)+(3.018)+(6.001), (I-130)+(3.018)+(6.002), (I-130)+(3.018)+(6.003), (I-130)+(3.018)+(6.004), (I-130)+(3.018)+(7.001), (I-130)+(3.018)+(7.002), (I-130)+(3.018)+(7.003), (I-130)+(3.018)+(7.004), (I-130)+(3.018)+(7.005), (I-130)+(3.018)+(7.006), (I-130)+(3.018)+(9.001), (I-130)+(3.018)+(9.002), (I-130)+(3.018)+(9.003), (I-130)+(3.018)+(9.004), (I-130)+(3.018)+(9.005), (I-130)+(3.018)+(9.006), (I-130)+(3.018)+(9.007), (I-130)+(3.018)+(9.008), (I-130)+(3.018)+(9.009), (I-130)+(3.018)+(14.001), (I-130)+(3.018)+(14.002), (I-130)+(3.018)+(15.008), (I-130)+(3.018)+(15.011), (I-130)+(3.018)+(15.012), (I-130)+(3.018)+(15.016), (I-130)+(3.018)+(15.025), (I-130)+(3.018)+(15.027), (I-130)+(3.018)+(15.047), (I-130)+(3.018)+(15.063), (I-130)+(3.018)+(15.064), (I-130)+(3.018)+(16.001), (I-130)+(3.018)+(16.002), (I-130)+(3.018)+(16.003), (I-130)+(3.018)+(16.004), (I-130)+(3.018)+(16.005), (I-130)+(3.018)+(16.006), (I-130)+(3.018)+(16.007), (I-130)+(3.018)+(16.008), (I-130)+(3.018)+(17.001), (I-130)+(3.018)+(17.002), (I-130)+(3.018)+(17.003), (I-130)+(3.018)+(17.004), (I-130)+(3.018)+(17.005), (I-130)+(3.018)+(17.006), (I-130)+(3.018)+(17.007), (I-130)+(3.018)+(17.008), (I-130)+(3.018)+(17.009), (I-130)+(3.018)+(17.010), (I-130)+(3.018)+(17.011), (I-130)+(3.018)+(17.012), (I-130)+(3.018)+(18.001),
(I-130)+(3.019)+(3.025), (I-130)+(3.019)+(3.030), (I-130)+(3.019)+(3.031), (I-130)+(3.019)+(5.001), (I-130)+(3.019)+(5.002), (I-130)+(3.019)+(5.003), (I-130)+(3.019)+(5.004), (I-130)+(3.019)+(5.005), (I-130)+(3.019)+(5.006), (I-130)+(3.019)+(5.007), (I-130)+(3.019)+(5.008), (I-130)+(3.019)+(5.009), (I-130)+(3.019)+(5.010), (I-130)+(3.019)+(5.011), (I-130)+(3.019)+(5.012), (I-130)+(3.019)+(5.013), (I-130)+(3.019)+(5.014), (I-130)+(3.019)+(5.015), (I-130)+(3.019)+(5.016), (I-130)+(3.019)+(5.017), (I-130)+(3.019)+(5.018), (I-130)+(3.019)+(5.019), (I-130)+(3.019)+(5.020), (I-130)+(3.019)+(5.021), (I-130)+(3.019)+(5.022), (I-130)+(3.019)+(5.023), (I-130)+(3.019)+(6.001), (I-130)+(3.019)+(6.002), (I-130)+(3.019)+(6.003), (I-130)+(3.019)+(6.004), (I-130)+(3.019)+(7.001), (I-130)+(3.019)+(7.002), (I-130)+(3.019)+(7.003), (I-130)+(3.019)+(7.004), (I-130)+(3.019)+(7.005), (I-130)+(3.019)+(7.006), (I-130)+(3.019)+(9.001), (I-130)+(3.019)+(9.002), (I-130)+(3.019)+(9.003), (I-130)+(3.019)+(9.004), (I-130)+(3.019)+(9.005), (I-130)+(3.019)+(9.006), (I-130)+(3.019)+(9.007), (I-130)+(3.019)+(9.008), (I-130)+(3.019)+(9.009), (I-130)+(3.019)+(14.001), (I-130)+(3.019)+(14.002), (I-130)+(3.019)+(15.008), (I-130)+(3.019)+(15.011), (I-130)+(3.019)+(15.012), (I-130)+(3.019)+(15.016), (I-130)+(3.019)+(15.025), (I-130)+(3.019)+(15.027), (I-130)+(3.019)+(15.047), (I-130)+(3.019)+(15.063), (I-130)+(3.019)+(15.064), (I-130)+(3.019)+(16.001), (I-130)+(3.019)+(16.002), (I-130)+(3.019)+(16.003), (I-130)+(3.019)+(16.004), (I-130)+(3.019)+(16.005), (I-130)+(3.019)+(16.006), (I-130)+(3.019)+(16.007), (I-130)+(3.019)+(16.008), (I-130)+(3.019)+(17.001), (I-130)+(3.019)+(17.002), (I-130)+(3.019)+(17.003), (I-130)+(3.019)+(17.004), (I-130)+(3.019)+(17.005), (I-130)+(3.019)+(17.006), (I-130)+(3.019)+(17.007), (I-130)+(3.019)+(17.008), (I-130)+(3.019)+(17.009), (I-130)+(3.019)+(17.010), (I-130)+(3.019)+(17.011), (I-130)+(3.019)+(17.012), (I-130)+(3.019)+(18.001),
(I-130)+(3.020)+(3.025), (I-130)+(3.020)+(3.030), (I-130)+(3.020)+(3.031), (I-130)+(3.020)+(5.001), (I-130)+(3.020)+(5.002), (I-130)+(3.020)+(5.003), (I-130)+(3.020)+(5.004), (I-130)+(3.020)+(5.005), (I-130)+(3.020)+(5.006), (I-130)+(3.020)+(5.007), (I-130)+(3.020)+(5.008), (I-130)+(3.020)+(5.009), (I-130)+(3.020)+(5.010), (I-130)+(3.020)+(5.011), (I-130)+(3.020)+(5.012), (I-130)+(3.020)+(5.013), (I-130)+(3.020)+(5.014), (I-130)+(3.020)+(5.015), (I-130)+(3.020)+(5.016), (I-130)+(3.020)+(5.017), (I-130)+(3.020)+(5.018), (I-130)+(3.020)+(5.019), (I-130)+(3.020)+(5.020), (I-130)+(3.020)+(5.021), (I-130)+(3.020)+(5.022), (I-130)+(3.020)+(5.023), (I-130)+(3.020)+(6.001), (I-130)+(3.020)+(6.002), (I-130)+(3.020)+(6.003), (I-130)+(3.020)+(6.004), (I-130)+(3.020)+(7.001), (I-130)+(3.020)+(7.002), (I-130)+(3.020)+(7.003), (I-130)+(3.020)+(7.004), (I-130)+(3.020)+(7.005), (I-130)+(3.020)+(7.006), (I-130)+(3.020)+(9.001), (I-130)+(3.020)+(9.002), (I-130)+(3.020)+(9.003), (I-130)+(3.020)+(9.004), (I-130)+(3.020)+(9.005), (I-130)+(3.020)+(9.006), (I-130)+(3.020)+(9.007), (I-130)+(3.020)+(9.008), (I-130)+(3.020)+(9.009), (I-130)+(3.020)+(14.001), (I-130)+(3.020)+(14.002), (I-130)+(3.020)+(15.008), (I-130)+(3.020)+(15.011), (I-130)+(3.020)+(15.012), (I-130)+(3.020)+(15.016), (I-130)+(3.020)+(15.025), (I-130)+(3.020)+(15.027), (I-130)+(3.020)+(15.047), (I-130)+(3.020)+(15.063), (I-130)+(3.020)+(15.064), (I-130)+(3.020)+(16.001), (I-130)+(3.020)+(16.002), (I-130)+(3.020)+(16.003), (I-130)+(3.020)+(16.004), (I-130)+(3.020)+(16.005), (I-130)+(3.020)+(16.006), (I-130)+(3.020)+(16.007), (I-130)+(3.020)+(16.008), (I-130)+(3.020)+(17.001), (I-130)+(3.020)+(17.002), (I-130)+(3.020)+(17.003), (I-130)+(3.020)+(17.004), (I-130)+(3.020)+(17.005), (I-130)+(3.020)+(17.006), (I-130)+(3.020)+(17.007), (I-130)+(3.020)+(17.008), (I-130)+(3.020)+(17.009), (I-130)+(3.020)+(17.010), (I-130)+(3.020)+(17.011), (I-130)+(3.020)+(17.012), (I-130)+(3.020)+(18.001),
(I-130)+(3.021)+(3.025), (I-130)+(3.021)+(3.030), (I-130)+(3.021)+(3.031), (I-130)+(3.021)+(5.001), (I-130)+(3.021)+(5.002), (I-130)+(3.021)+(5.003), (I-130)+(3.021)+(5.004), (I-130)+(3.021)+(5.005), (I-130)+(3.021)+(5.006), (I-130)+(3.021)+(5.007), (I-130)+(3.021)+(5.008), (I-130)+(3.021)+(5.009), (I-130)+(3.021)+(5.010), (I-130)+(3.021)+(5.011), (I-130)+(3.021)+(5.012), (I-130)+(3.021)+(5.013), (I-130)+(3.021)+(5.014), (I-130)+(3.021)+(5.015), (I-130)+(3.021)+(5.016), (I-130)+(3.021)+(5.017), (I-130)+(3.021)+(5.018), (I-130)+(3.021)+(5.019), (I-130)+(3.021)+(5.020), (I-130)+(3.021)+(5.021), (I-130)+(3.021)+(5.022), (I-130)+(3.021)+(5.023), (I-130)+(3.021)+(6.001), (I-130)+(3.021)+(6.002), (I-130)+(3.021)+(6.003), (I-130)+(3.021)+(6.004), (I-130)+(3.021)+(7.001), (I-130)+(3.021)+(7.002), (I-130)+(3.021)+(7.003), (I-130)+(3.021)+(7.004), (I-130)+(3.021)+(7.005), (I-130)+(3.021)+(7.006), (I-130)+(3.021)+(9.001), (I-130)+(3.021)+(9.002), (I-130)+(3.021)+(9.003), (I-130)+(3.021)+(9.004), (I-130)+(3.021)+(9.005), (I-130)+(3.021)+(9.006), (I-130)+(3.021)+(9.007), (I-130)+(3.021)+(9.008), (I-130)+(3.021)+(9.009), (I-130)+(3.021)+(14.001), (I-130)+(3.021)+(14.002), (I-130)+(3.021)+(15.008), (I-130)+(3.021)+(15.011), (I-130)+(3.021)+(15.012), (I-130)+(3.021)+(15.016), (I-130)+(3.021)+(15.025), (I-130)+(3.021)+(15.027), (I-130)+(3.021)+(15.047), (I-130)+(3.021)+(15.063), (I-130)+(3.021)+(15.064), (I-130)+(3.021)+(16.001), (I-130)+(3.021)+(16.002), (I-130)+(3.021)+(16.003), (I-130)+(3.021)+(16.004), (I-130)+(3.021)+(16.005), (I-130)+(3.021)+(16.006), (I-130)+(3.021)+(16.007), (I-130)+(3.021)+(16.008), (I-130)+(3.021)+(17.001), (I-130)+(3.021)+(17.002), (I-130)+(3.021)+(17.003), (I-130)+(3.021)+(17.004), (I-130)+(3.021)+(17.005), (I-130)+(3.021)+(17.006), (I-130)+(3.021)+(17.007), (I-130)+(3.021)+(17.008), (I-130)+(3.021)+(17.009), (I-130)+(3.021)+(17.010), (I-130)+(3.021)+(17.011), (I-130)+(3.021)+(17.012), (I-130)+(3.021)+(18.001), (I-130)+(3.022)+(3.025), (I-130)+(3.022)+(3.030), (I-130)+(3.022)+(3.031), (I-130)+(3.022)+(5.001), (I-130)+(3.022)+(5.002), (I-130)+(3.022)+(5.003), (I-130)+(3.022)+(5.004), (I-130)+(3.022)+(5.005), (I-130)+(3.022)+(5.006), (I-130)+(3.022)+(5.007), (I-130)+(3.022)+(5.008), (I-130)+(3.022)+(5.009), (I-130)+(3.022)+(5.010), (I-130)+(3.022)+(5.011), (I-130)+(3.022)+(5.012), (I-130)+(3.022)+(5.013), (I-130)+(3.022)+(5.014), (I-130)+(3.022)+(5.015), (I-130)+(3.022)+(5.016), (I-130)+(3.022)+(5.017), (I-130)+(3.022)+(5.018), (I-130)+(3.022)+(5.019), (I-130)+(3.022)+(5.020), (I-130)+(3.022)+(5.021), (I-130)+(3.022)+(5.022), (I-130)+(3.022)+(5.023), (I-130)+(3.022)+(6.001), (I-130)+(3.022)+(6.002), (I-130)+(3.022)+(6.003), (I-130)+(3.022)+(6.004), (I-130)+(3.022)+(7.001), (I-130)+(3.022)+(7.002), (I-130)+(3.022)+(7.003), (I-130)+(3.022)+(7.004), (I-130)+(3.022)+(7.005), (I-130)+(3.022)+(7.006), (I-130)+(3.022)+(9.001), (I-130)+(3.022)+(9.002), (I-130)+(3.022)+(9.003), (I-130)+(3.022)+(9.004), (I-130)+(3.022)+(9.005), (I-130)+(3.022)+(9.006), (I-130)+(3.022)+(9.007), (I-130)+(3.022)+(9.008), (I-130)+(3.022)+(9.009), (I-130)+(3.022)+(14.001), (I-130)+(3.022)+(14.002), (I-130)+(3.022)+(15.008), (I-130)+(3.022)+(15.011), (I-130)+(3.022)+(15.012), (I-130)+(3.022)+(15.016), (I-130)+(3.022)+(15.025), (I-130)+(3.022)+(15.027), (I-130)+(3.022)+(15.047), (I-130)+(3.022)+(15.063), (I-130)+(3.022)+(15.064), (I-130)+(3.022)+(16.001), (I-130)+(3.022)+(16.002), (I-130)+(3.022)+(16.003), (I-130)+(3.022)+(16.004), (I-130)+(3.022)+(16.005), (I-130)+(3.022)+(16.006), (I-130)+(3.022)+(16.007), (I-130)+(3.022)+(16.008), (I-130)+(3.022)+(17.001), (I-130)+(3.022)+(17.002), (I-130)+(3.022)+(17.003), (I-130)+(3.022)+(17.004), (I-130)+(3.022)+(17.005), (I-130)+(3.022)+(17.006), (I-130)+(3.022)+(17.007), (I-130)+(3.022)+(17.008), (I-130)+(3.022)+(17.009), (I-130)+(3.022)+(17.010), (I-130)+(3.022)+(17.011), (I-130)+(3.022)+(17.012), (I-130)+(3.022)+(18.001), (I-130)+(3.023)+(3.025), (I-130)+(3.023)+(3.030), (I-130)+(3.023)+(3.031), (I-130)+(3.023)+(5.001), (I-130)+(3.023)+(5.002), (I-130)+(3.023)+(5.003), (I-130)+(3.023)+(5.004), (I-130)+(3.023)+(5.005), (I-130)+(3.023)+(5.006), (I-130)+(3.023)+(5.007), (I-130)+(3.023)+(5.008), (I-130)+(3.023)+(5.009), (I-130)+(3.023)+(5.010), (I-130)+(3.023)+(5.011), (I-130)+(3.023)+(5.012), (I-130)+(3.023)+(5.013), (I-130)+(3.023)+(5.014), (I-130)+(3.023)+(5.015), (I-130)+(3.023)+(5.016), (I-130)+(3.023)+(5.017), (I-130)+(3.023)+(5.018), (I-130)+(3.023)+(5.019), (I-130)+(3.023)+(5.020), (I-130)+(3.023)+(5.021), (I-130)+(3.023)+(5.022), (I-130)+(3.023)+(5.023), (I-130)+(3.023)+(6.001), (I-130)+(3.023)+(6.002), (I-130)+(3.023)+(6.003), (I-130)+(3.023)+(6.004), (I-130)+(3.023)+(7.001), (I-130)+(3.023)+(7.002), (I-130)+(3.023)+(7.003), (I-130)+(3.023)+(7.004), (I-130)+(3.023)+(7.005), (I-130)+(3.023)+(7.006), (I-130)+(3.023)+(9.001), (I-130)+(3.023)+(9.002), (I-130)+(3.023)+(9.003), (I-130)+(3.023)+(9.004), (I-130)+(3.023)+(9.005), (I-130)+(3.023)+(9.006), (I-130)+(3.023)+(9.007), (I-130)+(3.023)+(9.008), (I-130)+(3.023)+(9.009), (I-130)+(3.023)+(14.001), (I-130)+(3.023)+(14.002), (I-130)+(3.023)+(15.008), (I-130)+(3.023)+(15.011), (I-130)+(3.023)+(15.012), (I-130)+(3.023)+(15.016), (I-130)+(3.023)+(15.025), (I-130)+(3.023)+(15.027), (I-130)+(3.023)+(15.047), (I-130)+(3.023)+(15.063), (I-130)+(3.023)+(15.064), (I-130)+(3.023)+(16.001), (I-130)+(3.023)+(16.002), (I-130)+(3.023)+(16.003), (I-130)+(3.023)+(16.004), (I-130)+(3.023)+(16.005), (I-130)+(3.023)+(16.006), (I-130)+(3.023)+(16.007), (I-130)+(3.023)+(16.008), (I-130)+(3.023)+(17.001), (I-130)+(3.023)+(17.002), (I-130)+(3.023)+(17.003), (I-130)+(3.023)+(17.004), (I-130)+(3.023)+(17.005), (I-130)+(3.023)+(17.006), (I-130)+(3.023)+(17.007), (I-130)+(3.023)+(17.008), (I-130)+(3.023)+(17.009), (I-130)+(3.023)+(17.010), (I-130)+(3.023)+(17.011), (I-130)+(3.023)+(17.012), (I-130)+(3.023)+(18.001), (I-130)+(3.024)+(3.025), (I-130)+(3.024)+(3.030), (I-130)+(3.024)+(3.031), (I-130)+(3.024)+(5.001), (I-130)+(3.024)+(5.002), (I-130)+(3.024)+(5.003), (I-130)+(3.024)+(5.004), (I-130)+(3.024)+(5.005), (I-130)+(3.024)+(5.006), (I-130)+(3.024)+(5.007), (I-130)+(3.024)+(5.008), (I-130)+(3.024)+(5.009), (I-130)+(3.024)+(5.010), (I-130)+(3.024)+(5.011), (I-130)+(3.024)+(5.012), (I-130)+(3.024)+(5.013), (I-130)+(3.024)+(5.014), (I-130)+(3.024)+(5.015), (I-130)+(3.024)+(5.016), (I-130)+(3.024)+(5.017), (I-130)+(3.024)+(5.018), (I-130)+(3.024)+(5.019), (I-130)+(3.024)+(5.020), (I-130)+(3.024)+(5.021), (I-130)+(3.024)+(5.022), (I-130)+(3.024)+(5.023), (I-130)+(3.024)+(6.001), (I-130)+(3.024)+(6.002), (I-130)+(3.024)+(6.003), (I-130)+(3.024)+(6.004), (I-130)+(3.024)+(7.001), (I-130)+(3.024)+(7.002), (I-130)+(3.024)+(7.003), (I-130)+(3.024)+(7.004), (I-130)+(3.024)+(7.005), (I-130)+(3.024)+(7.006), (I-130)+(3.024)+(9.001), (I-130)+(3.024)+(9.002), (I-130)+(3.024)+(9.003), (I-130)+(3.024)+(9.004), (I-130)+(3.024)+(9.005), (I-130)+(3.024)+(9.006), (I-130)+(3.024)+(9.007), (I-130)+(3.024)+(9.008), (I-130)+(3.024)+(9.009), (I-130)+(3.024)+(14.001), (I-130)+(3.024)+(14.002), (I-130)+(3.024)+(15.008), (I-130)+(3.024)+(15.011), (I-130)+(3.024)+(15.012), (I-130)+(3.024)+(15.016), (I-130)+(3.024)+(15.025), (I-130)+(3.024)+(15.027), (I-130)+(3.024)+(15.047), (I-130)+(3.024)+(15.063), (I-130)+(3.024)+(15.064), (I-130)+(3.024)+(16.001), (I-130)+(3.024)+(16.002), (I-130)+(3.024)+(16.003), (I-130)+(3.024)+(16.004), (I-130)+(3.024)+(16.005), (I-130)+(3.024)+(16.006), (I-130)+(3.024)+(16.007), (I-130)+(3.024)+(16.008), (I-130)+(3.024)+(17.001), (I-130)+(3.024)+(17.002), (I-130)+(3.024)+(17.003), (I-130)+(3.024)+(17.004), (I-130)+(3.024)+(17.005), (I-130)+(3.024)+(17.006), (I-130)+(3.024)+(17.007), (I-130)+(3.024)+(17.008), (I-130)+(3.024)+(17.009), (I-130)+(3.024)+(17.010), (I-130)+(3.024)+(17.011), (I-130)+(3.024)+(17.012), (I-130)+(3.024)+(18.001), (I-130)+(3.025)+(3.030), (I-130)+(3.025)+(3.031), (I-130)+(3.025)+(5.001), (I-130)+(3.025)+(5.002), (I-130)+(3.025)+(5.003), (I-130)+(3.025)+(5.004), (I-130)+(3.025)+(5.005), (I-130)+(3.025)+(5.006), (I-130)+(3.025)+(5.007), (I-130)+(3.025)+(5.008), (I-130)+(3.025)+(5.009), (I-130)+(3.025)+(5.010), (I-130)+(3.025)+(5.011), (I-130)+(3.025)+(5.012), (I-130)+(3.025)+(5.013), (I-130)+(3.025)+(5.014), (I-130)+(3.025)+(5.015), (I-130)+(3.025)+(5.016), (I-130)+(3.025)+(5.017), (I-130)+(3.025)+(5.018), (I-130)+(3.025)+(5.019), (I-130)+(3.025)+(5.020), (I-130)+(3.025)+(5.021), (I-130)+(3.025)+(5.022), (I-130)+(3.025)+(5.023), (I-130)+(3.025)+(6.001), (I-130)+(3.025)+(6.002), (I-130)+(3.025)+(6.003), (I-130)+(3.025)+(6.004), (I-130)+(3.025)+(7.001), (I-130)+(3.025)+(7.002), (I-130)+(3.025)+(7.003), (I-130)+(3.025)+(7.004), (I-130)+(3.025)+(7.005), (I-130)+(3.025)+(7.006), (I-130)+(3.025)+(9.001), (I-130)+(3.025)+(9.002), (I-130)+(3.025)+(9.003), (I-130)+(3.025)+(9.004), (I-130)+(3.025)+(9.005), (I-130)+(3.025)+(9.006), (I-130)+(3.025)+(9.007), (I-130)+(3.025)+(9.008), (I-130)+(3.025)+(9.009), (I-130)+(3.025)+(14.001), (I-130)+(3.025)+(14.002), (I-130)+(3.025)+(15.008), (I-130)+(3.025)+(15.011), (I-130)+(3.025)+(15.012), (I-130)+(3.025)+(15.016), (I-130)+(3.025)+(15.025), (I-130)+(3.025)+(15.027), (I-130)+(3.025)+(15.047), (I-130)+(3.025)+(15.063), (I-130)+(3.025)+(15.064), (I-130)+(3.025)+(16.001), (I-130)+(3.025)+(16.002), (I-130)+(3.025)+(16.003), (I-130)+(3.025)+(16.004), (I-130)+(3.025)+(16.005), (I-130)+(3.025)+(16.006), (I-130)+(3.025)+(16.007), (I-130)+(3.025)+(16.008), (I-130)+(3.025)+(17.001), (I-130)+(3.025)+(17.002), (I-130)+(3.025)+(17.003), (I-130)+(3.025)+(17.004), (I-130)+(3.025)+(17.005), (I-130)+(3.025)+(17.006), (I-130)+(3.025)+(17.007), (I-130)+(3.025)+(17.008), (I-130)+(3.025)+(17.009), (I-130)+(3.025)+(17.010), (I-130)+(3.025)+(17.011), (I-130)+(3.025)+(17.012), (I-130)+(3.025)+(18.001), (I-130)+(3.026)+(3.025), (I-130)+(3.026)+(3.030), (I-130)+(3.026)+(3.031), (I-130)+(3.026)+(5.001), (I-130)+(3.026)+(5.002), (I-130)+(3.026)+(5.003), (I-130)+(3.026)+(5.004), (I-130)+(3.026)+(5.005), (I-130)+(3.026)+(5.006), (I-130)+(3.026)+(5.007), (I-130)+(3.026)+(5.008), (I-130)+(3.026)+(5.009), (I-130)+(3.026)+(5.010), (I-130)+(3.026)+(5.011), (I-130)+(3.026)+(5.012), (I-130)+(3.026)+(5.013), (I-130)+(3.026)+(5.014), (I-130)+(3.026)+(5.015), (I-130)+(3.026)+(5.016), (I-130)+(3.026)+(5.017), (I-130)+(3.026)+(5.018), (I-130)+(3.026)+(5.019), (I-130)+(3.026)+(5.020), (I-130)+(3.026)+(5.021), (I-130)+(3.026)+(5.022), (I-130)+(3.026)+(5.023), (I-130)+(3.026)+(6.001), (I-130)+(3.026)+(6.002), (I-130)+(3.026)+(6.003), (I-130)+(3.026)+(6.004), (I-130)+(3.026)+(7.001), (I-130)+(3.026)+(7.002), (I-130)+(3.026)+(7.003), (I-130)+(3.026)+(7.004), (I-130)+(3.026)+(7.005), (I-130)+(3.026)+(7.006), (I-130)+(3.026)+(9.001), (I-130)+(3.026)+(9.002), (I-130)+(3.026)+(9.003), (I-130)+(3.026)+(9.004), (I-130)+(3.026)+(9.005), (I-130)+(3.026)+(9.006), (I-130)+(3.026)+(9.007), (I-130)+(3.026)+(9.008), (I-130)+(3.026)+(9.009), (I-130)+(3.026)+(14.001), (I-130)+(3.026)+(14.002), (I-130)+(3.026)+(15.008), (I-130)+(3.026)+(15.011), (I-130)+(3.026)+(15.012), (I-130)+(3.026)+(15.016), (I-130)+(3.026)+(15.025), (I-130)+(3.026)+(15.027), (I-130)+(3.026)+(15.047), (I-130)+(3.026)+(15.063), (I-130)+(3.026)+(15.064), (I-130)+(3.026)+(16.001), (I-130)+(3.026)+(16.002), (I-130)+(3.026)+(16.003), (I-130)+(3.026)+(16.004), (I-130)+(3.026)+(16.005), (I-130)+(3.026)+(16.006), (I-130)+(3.026)+(16.007), (I-130)+(3.026)+(16.008), (I-130)+(3.026)+(17.001), (I-130)+(3.026)+(17.002), (I-130)+(3.026)+(17.003), (I-130)+(3.026)+(17.004), (I-130)+(3.026)+(17.005), (I-130)+(3.026)+(17.006), (I-130)+(3.026)+(17.007), (I-130)+(3.026)+(17.008), (I-130)+(3.026)+(17.009), (I-130)+(3.026)+(17.010), (I-130)+(3.026)+(17.011), (I-130)+(3.026)+(17.012), (I-130)+(3.026)+(18.001), (I-130)+(3.027)+(3.025), (I-130)+(3.027)+(3.030), (I-130)+(3.027)+(3.031), (I-130)+(3.027)+(5.001), (I-130)+(3.027)+(5.002), (I-130)+(3.027)+(5.003), (I-130)+(3.027)+(5.004), (I-130)+(3.027)+(5.005), (I-130)+(3.027)+(5.006), (I-130)+(3.027)+(5.007), (I-130)+(3.027)+(5.008), (I-130)+(3.027)+(5.009), (I-130)+(3.027)+(5.010), (I-130)+(3.027)+(5.011), (I-130)+(3.027)+(5.012), (I-130)+(3.027)+(5.013), (I-130)+(3.027)+(5.014), (I-130)+(3.027)+(5.015), (I-130)+(3.027)+(5.016), (I-130)+(3.027)+(5.017), (I-130)+(3.027)+(5.018), (I-130)+(3.027)+(5.019), (I-130)+(3.027)+(5.020), (I-130)+(3.027)+(5.021), (I-130)+(3.027)+(5.022), (I-130)+(3.027)+(5.023), (I-130)+(3.027)+(6.001), (I-130)+(3.027)+(6.002), (I-130)+(3.027)+(6.003), (I-130)+(3.027)+(6.004), (I-130)+(3.027)+(7.001), (I-130)+(3.027)+(7.002), (I-130)+(3.027)+(7.003), (I-130)+(3.027)+(7.004), (I-130)+(3.027)+(7.005), (I-130)+(3.027)+(7.006), (I-130)+(3.027)+(9.001), (I-130)+(3.027)+(9.002), (I-130)+(3.027)+(9.003), (I-130)+(3.027)+(9.004), (I-130)+(3.027)+(9.005), (I-130)+(3.027)+(9.006), (I-130)+(3.027)+(9.007), (I-130)+(3.027)+(9.008), (I-130)+(3.027)+(9.009), (I-130)+(3.027)+(14.001), (I-130)+(3.027)+(14.002), (I-130)+(3.027)+(15.008), (I-130)+(3.027)+(15.011), (I-130)+(3.027)+(15.012), (I-130)+(3.027)+(15.016), (I-130)+(3.027)+(15.025), (I-130)+(3.027)+(15.027), (I-130)+(3.027)+(15.047), (I-130)+(3.027)+(15.063), (I-130)+(3.027)+(15.064), (I-130)+(3.027)+(16.001), (I-130)+(3.027)+(16.002), (I-130)+(3.027)+(16.003), (I-130)+(3.027)+(16.004), (I-130)+(3.027)+(16.005), (I-130)+(3.027)+(16.006), (I-130)+(3.027)+(16.007), (I-130)+(3.027)+(16.008), (I-130)+(3.027)+(17.001), (I-130)+(3.027)+(17.002), (I-130)+(3.027)+(17.003), (I-130)+(3.027)+(17.004), (I-130)+(3.027)+(17.005), (I-130)+(3.027)+(17.006), (I-130)+(3.027)+(17.007), (I-130)+(3.027)+(17.008), (I-130)+(3.027)+(17.009), (I-130)+(3.027)+(17.010), (I-130)+(3.027)+(17.011), (I-130)+(3.027)+(17.012), (I-130)+(3.027)+(18.001), (I-130)+(3.028)+(3.025), (I-130)+(3.028)+(3.030), (I-130)+(3.028)+(3.031), (I-130)+(3.028)+(5.001), (I-130)+(3.028)+(5.002), (I-130)+(3.028)+(5.003), (I-130)+(3.028)+(5.004), (I-130)+(3.028)+(5.005), (I-130)+(3.028)+(5.006), (I-130)+(3.028)+(5.007), (I-130)+(3.028)+(5.008), (I-130)+(3.028)+(5.009), (I-130)+(3.028)+(5.010), (I-130)+(3.028)+(5.011), (I-130)+(3.028)+(5.012), (I-130)+(3.028)+(5.013), (I-130)+(3.028)+(5.014), (I-130)+(3.028)+(5.015), (I-130)+(3.028)+(5.016), (I-130)+(3.028)+(5.017), (I-130)+(3.028)+(5.018), (I-130)+(3.028)+(5.019), (I-130)+(3.028)+(5.020), (I-130)+(3.028)+(5.021), (I-130)+(3.028)+(5.022), (I-130)+(3.028)+(5.023), (I-130)+(3.028)+(6.001), (I-130)+(3.028)+(6.002), (I-130)+(3.028)+(6.003), (I-130)+(3.028)+(6.004), (I-130)+(3.028)+(7.001), (I-130)+(3.028)+(7.002), (I-130)+(3.028)+(7.003), (I-130)+(3.028)+(7.004), (I-130)+(3.028)+(7.005), (I-130)+(3.028)+(7.006), (I-130)+(3.028)+(9.001), (I-130)+(3.028)+(9.002), (I-130)+(3.028)+(9.003), (I-130)+(3.028)+(9.004), (I-130)+(3.028)+(9.005), (I-130)+(3.028)+(9.006), (I-130)+(3.028)+(9.007), (I-130)+(3.028)+(9.008), (I-130)+(3.028)+(9.009), (I-130)+(3.028)+(14.001), (I-130)+(3.028)+(14.002), (I-130)+(3.028)+(15.008), (I-130)+(3.028)+(15.011), (I-130)+(3.028)+(15.012), (I-130)+(3.028)+(15.016), (I-130)+(3.028)+(15.025), (I-130)+(3.028)+(15.027), (I-130)+(3.028)+(15.047), (I-130)+(3.028)+(15.063), (I-130)+(3.028)+(15.064), (I-130)+(3.028)+(16.001), (I-130)+(3.028)+(16.002), (I-130)+(3.028)+(16.003), (I-130)+(3.028)+(16.004), (I-130)+(3.028)+(16.005), (I-130)+(3.028)+(16.006), (I-130)+(3.028)+(16.007), (I-130)+(3.028)+(16.008), (I-130)+(3.028)+(17.001), (I-130)+(3.028)+(17.002), (I-130)+(3.028)+(17.003), (I-130)+(3.028)+(17.004), (I-130)+(3.028)+(17.005), (I-130)+(3.028)+(17.006), (I-130)+(3.028)+(17.007), (I-130)+(3.028)+(17.008), (I-130)+(3.028)+(17.009), (I-130)+(3.028)+(17.010), (I-130)+(3.028)+(17.011), (I-130)+(3.028)+(17.012), (I-130)+(3.028)+(18.001), (I-130)+(3.029)+(3.025), (I-130)+(3.029)+(3.030), (I-130)+(3.029)+(3.031), (I-130)+(3.029)+(5.001), (I-130)+(3.029)+(5.002), (I-130)+(3.029)+(5.003), (I-130)+(3.029)+(5.004), (I-130)+(3.029)+(5.005), (I-130)+(3.029)+(5.006), (I-130)+(3.029)+(5.007), (I-130)+(3.029)+(5.008), (I-130)+(3.029)+(5.009), (I-130)+(3.029)+(5.010), (I-130)+(3.029)+(5.011), (I-130)+(3.029)+(5.012), (I-130)+(3.029)+(5.013), (I-130)+(3.029)+(5.014), (I-130)+(3.029)+(5.015), (I-130)+(3.029)+(5.016), (I-130)+(3.029)+(5.017), (I-130)+(3.029)+(5.018), (I-130)+(3.029)+(5.019), (I-130)+(3.029)+(5.020), (I-130)+(3.029)+(5.021), (I-130)+(3.029)+(5.022), (I-130)+(3.029)+(5.023), (I-130)+(3.029)+(6.001), (I-130)+(3.029)+(6.002), (I-130)+(3.029)+(6.003), (I-130)+(3.029)+(6.004), (I-130)+(3.029)+(7.001), (I-130)+(3.029)+(7.002), (I-130)+(3.029)+(7.003), (I-130)+(3.029)+(7.004), (I-130)+(3.029)+(7.005), (I-130)+(3.029)+(7.006), (I-130)+(3.029)+(9.001), (I-130)+(3.029)+(9.002), (I-130)+(3.029)+(9.003), (I-130)+(3.029)+(9.004), (I-130)+(3.029)+(9.005), (I-130)+(3.029)+(9.006), (I-130)+(3.029)+(9.007), (I-130)+(3.029)+(9.008), (I-130)+(3.029)+(9.009), (I-130)+(3.029)+(14.001), (I-130)+(3.029)+(14.002), (I-130)+(3.029)+(15.008), (I-130)+(3.029)+(15.011), (I-130)+(3.029)+(15.012), (I-130)+(3.029)+(15.016), (I-130)+(3.029)+(15.025), (I-130)+(3.029)+(15.027), (I-130)+(3.029)+(15.047), (I-130)+(3.029)+(15.063), (I-130)+(3.029)+(15.064), (I-130)+(3.029)+(16.001), (I-130)+(3.029)+(16.002), (I-130)+(3.029)+(16.003), (I-130)+(3.029)+(16.004), (I-130)+(3.029)+(16.005), (I-130)+(3.029)+(16.006), (I-130)+(3.029)+(16.007), (I-130)+(3.029)+(16.008), (I-130)+(3.029)+(17.001), (I-130)+(3.029)+(17.002), (I-130)+(3.029)+(17.003), (I-130)+(3.029)+(17.004), (I-130)+(3.029)+(17.005), (I-130)+(3.029)+(17.006), (I-130)+(3.029)+(17.007), (I-130)+(3.029)+(17.008), (I-130)+(3.029)+(17.009), (I-130)+(3.029)+(17.010), (I-130)+(3.029)+(17.011), (I-130)+(3.029)+(17.012), (I-130)+(3.029)+(18.001), (I-130)+(3.030)+(3.025), (I-130)+(3.030)+(3.031), (I-130)+(3.030)+(5.001), (I-130)+(3.030)+(5.002), (I-130)+(3.030)+(5.003), (I-130)+(3.030)+(5.004), (I-130)+(3.030)+(5.005), (I-130)+(3.030)+(5.006), (I-130)+(3.030)+(5.007), (I-130)+(3.030)+(5.008), (I-130)+(3.030)+(5.009), (I-130)+(3.030)+(5.010), (I-130)+(3.030)+(5.011), (I-130)+(3.030)+(5.012), (I-130)+(3.030)+(5.013), (I-130)+(3.030)+(5.014), (I-130)+(3.030)+(5.015), (I-130)+(3.030)+(5.016), (I-130)+(3.030)+(5.017), (I-130)+(3.030)+(5.018), (I-130)+(3.030)+(5.019), (I-130)+(3.030)+(5.020), (I-130)+(3.030)+(5.021), (I-130)+(3.030)+(5.022), (I-130)+(3.030)+(5.023), (I-130)+(3.030)+(6.001), (I-130)+(3.030)+(6.002), (I-130)+(3.030)+(6.003), (I-130)+(3.030)+(6.004), (I-130)+(3.030)+(7.001), (I-130)+(3.030)+(7.002), (I-130)+(3.030)+(7.003), (I-130)+(3.030)+(7.004), (I-130)+(3.030)+(7.005), (I-130)+(3.030)+(7.006), (I-130)+(3.030)+(9.001), (I-130)+(3.030)+(9.002), (I-130)+(3.030)+(9.003), (I-130)+(3.030)+(9.004), (I-130)+(3.030)+(9.005), (I-130)+(3.030)+(9.006), (I-130)+(3.030)+(9.007), (I-130)+(3.030)+(9.008), (I-130)+(3.030)+(9.009), (I-130)+(3.030)+(14.001), (I-130)+(3.030)+(14.002), (I-130)+(3.030)+(15.008), (I-130)+(3.030)+(15.011), (I-130)+(3.030)+(15.012), (I-130)+(3.030)+(15.016), (I-130)+(3.030)+(15.025), (I-130)+(3.030)+(15.027), (I-130)+(3.030)+(15.047), (I-130)+(3.030)+(15.063), (I-130)+(3.030)+(15.064), (I-130)+(3.030)+(16.001), (I-130)+(3.030)+(16.002), (I-130)+(3.030)+(16.003), (I-130)+(3.030)+(16.004), (I-130)+(3.030)+(16.005), (I-130)+(3.030)+(16.006), (I-130)+(3.030)+(16.007), (I-130)+(3.030)+(16.008), (I-130)+(3.030)+(17.001), (I-130)+(3.030)+(17.002), (I-130)+(3.030)+(17.003), (I-130)+(3.030)+(17.004), (I-130)+(3.030)+(17.005), (I-130)+(3.030)+(17.006), (I-130)+(3.030)+(17.007), (I-130)+(3.030)+(17.008), (I-130)+(3.030)+(17.009), (I-130)+(3.030)+(17.010), (I-130)+(3.030)+(17.011), (I-130)+(3.030)+(17.012), (I-130)+(3.030)+(18.001), (I-130)+(3.031)+(3.025), (I-130)+(3.031)+(3.030), (I-130)+(3.031)+(5.001), (I-130)+(3.031)+(5.002), (I-130)+(3.031)+(5.003), (I-130)+(3.031)+(5.004), (I-130)+(3.031)+(5.005), (I-130)+(3.031)+(5.006), (I-130)+(3.031)+(5.007), (I-130)+(3.031)+(5.008), (I-130)+(3.031)+(5.009), (I-130)+(3.031)+(5.010), (I-130)+(3.031)+(5.011), (I-130)+(3.031)+(5.012), (I-130)+(3.031)+(5.013), (I-130)+(3.031)+(5.014), (I-130)+(3.031)+(5.015), (I-130)+(3.031)+(5.016), (I-130)+(3.031)+(5.017), (I-130)+(3.031)+(5.018), (I-130)+(3.031)+(5.019), (I-130)+(3.031)+(5.020), (I-130)+(3.031)+(5.021), (I-130)+(3.031)+(5.022), (I-130)+(3.031)+(5.023), (I-130)+(3.031)+(6.001), (I-130)+(3.031)+(6.002), (I-130)+(3.031)+(6.003), (I-130)+(3.031)+(6.004), (I-130)+(3.031)+(7.001), (I-130)+(3.031)+(7.002), (I-130)+(3.031)+(7.003), (I-130)+(3.031)+(7.004), (I-130)+(3.031)+(7.005), (I-130)+(3.031)+(7.006), (I-130)+(3.031)+(9.001), (I-130)+(3.031)+(9.002), (I-130)+(3.031)+(9.003), (I-130)+(3.031)+(9.004), (I-130)+(3.031)+(9.005), (I-130)+(3.031)+(9.006), (I-130)+(3.031)+(9.007), (I-130)+(3.031)+(9.008), (I-130)+(3.031)+(9.009), (I-130)+(3.031)+(14.001), (I-130)+(3.031)+(14.002), (I-130)+(3.031)+(15.008), (I-130)+(3.031)+(15.011), (I-130)+(3.031)+(15.012), (I-130)+(3.031)+(15.016), (I-130)+(3.031)+(15.025), (I-130)+(3.031)+(15.027), (I-130)+(3.031)+(15.047), (I-130)+(3.031)+(15.063), (I-130)+(3.031)+(15.064), (I-130)+(3.031)+(16.001), (I-130)+(3.031)+(16.002), (I-130)+(3.031)+(16.003), (I-130)+(3.031)+(16.004), (I-130)+(3.031)+(16.005), (I-130)+(3.031)+(16.006), (I-130)+(3.031)+(16.007), (I-130)+(3.031)+(16.008), (I-130)+(3.031)+(17.001), (I-130)+(3.031)+(17.002), (I-130)+(3.031)+(17.003), (I-130)+(3.031)+(17.004), (I-130)+(3.031)+(17.005), (I-130)+(3.031)+(17.006), (I-130)+(3.031)+(17.007), (I-130)+(3.031)+(17.008), (I-130)+(3.031)+(17.009), (I-130)+(3.031)+(17.010), (I-130)+(3.031)+(17.011), (I-130)+(3.031)+(17.012), (I-130)+(3.031)+(18.001), (I-130)+(5.001)+(9.001), (I-130)+(5.001)+(9.002), (I-130)+(5.001)+(9.003), (I-130)+(5.001)+(9.004), (I-130)+(5.001)+(9.005), (I-130)+(5.001)+(9.006), (I-130)+(5.001)+(9.007), (I-130)+(5.001)+(9.008), (I-130)+(5.001)+(9.009), (I-130)+(5.001)+(15.012), (I-130)+(5.001)+(15.016), (I-130)+(5.001)+(15.025), (I-130)+(5.001)+(15.027), (I-130)+(5.001)+(15.047), (I-130)+(5.001)+(15.063), (I-130)+(5.001)+(15.064), (I-130)+(5.002)+(9.001), (I-130)+(5.002)+(9.002), (I-130)+(5.002)+(9.003), (I-130)+(5.002)+(9.004), (I-130)+(5.002)+(9.005), (I-130)+(5.002)+(9.006), (I-130)+(5.002)+(9.007), (I-130)+(5.002)+(9.008), (I-130)+(5.002)+(9.009), (I-130)+(5.002)+(15.012), (I-130)+(5.002)+(15.016), (I-130)+(5.002)+(15.025), (I-130)+(5.002)+(15.027), (I-130)+(5.002)+(15.047), (I-130)+(5.002)+(15.063), (I-130)+(5.002)+(15.064), (I-130)+(5.003)+(9.001), (I-130)+(5.003)+(9.002), (I-130)+(5.003)+(9.003), (I-130)+(5.003)+(9.004), (I-130)+(5.003)+(9.005), (I-130)+(5.003)+(9.006), (I-130)+(5.003)+(9.007), (I-130)+(5.003)+(9.008), (I-130)+(5.003)+(9.009), (I-130)+(5.003)+(15.012), (I-130)+(5.003)+(15.016), (I-130)+(5.003)+(15.025), (I-130)+(5.003)+(15.027), (I-130)+(5.003)+(15.047), (I-130)+(5.003)+(15.063), (I-130)+(5.003)+(15.064), (I-130)+(5.004)+(9.001), (I-130)+(5.004)+(9.002), (I-130)+(5.004)+(9.003), (I-130)+(5.004)+(9.004), (I-130)+(5.004)+(9.005), (I-130)+(5.004)+(9.006), (I-130)+(5.004)+(9.007), (I-130)+(5.004)+(9.008), (I-130)+(5.004)+(9.009), (I-130)+(5.004)+(15.012), (I-130)+(5.004)+(15.016), (I-130)+(5.004)+(15.025), (I-130)+(5.004)+(15.027), (I-130)+(5.004)+(15.047), (I-130)+(5.004)+(15.063), (I-130)+(5.004)+(15.064), (I-130)+(5.005)+(9.001), (I-130)+(5.005)+(9.002), (I-130)+(5.005)+(9.003), (I-130)+(5.005)+(9.004), (I-130)+(5.005)+(9.005), (I-130)+(5.005)+(9.006), (I-130)+(5.005)+(9.007), (I-130)+(5.005)+(9.008), (I-130)+(5.005)+(9.009), (I-130)+(5.005)+(15.012), (I-130)+(5.005)+(15.016), (I-130)+(5.005)+(15.025), (I-130)+(5.005)+(15.027), (I-130)+(5.005)+(15.047), (I-130)+(5.005)+(15.063), (I-130)+(5.005)+(15.064), (I-130)+(5.006)+(9.001), (I-130)+(5.006)+(9.002), (I-130)+(5.006)+(9.003), (I-130)+(5.006)+(9.004), (I-130)+(5.006)+(9.005), (I-130)+(5.006)+(9.006), (I-130)+(5.006)+(9.007), (I-130)+(5.006)+(9.008), (I-130)+(5.006)+(9.009), (I-130)+(5.006)+(15.012), (I-130)+(5.006)+(15.016), (I-130)+(5.006)+(15.025), (I-130)+(5.006)+(15.027), (I-130)+(5.006)+(15.047), (I-130)+(5.006)+(15.063), (I-130)+(5.006)+(15.064), (I-130)+(5.007)+(9.001), (I-130)+(5.007)+(9.002), (I-130)+(5.007)+(9.003), (I-130)+(5.007)+(9.004), (I-130)+(5.007)+(9.005), (I-130)+(5.007)+(9.006), (I-130)+(5.007)+(9.007), (I-130)+(5.007)+(9.008), (I-130)+(5.007)+(9.009), (I-130)+(5.007)+(15.012), (I-130)+(5.007)+(15.016), (I-130)+(5.007)+(15.025), (I-130)+(5.007)+(15.027), (I-130)+(5.007)+(15.047), (I-130)+(5.007)+(15.063), (I-130)+(5.007)+(15.064), (I-130)+(5.008)+(9.001), (I-130)+(5.008)+(9.002), (I-130)+(5.008)+(9.003), (I-130)+(5.008)+(9.004), (I-130)+(5.008)+(9.005), (I-130)+(5.008)+(9.006), (I-130)+(5.008)+(9.007), (I-130)+(5.008)+(9.008), (I-130)+(5.008)+(9.009), (I-130)+(5.008)+(15.012), (I-130)+(5.008)+(15.016), (I-130)+(5.008)+(15.025), (I-130)+(5.008)+(15.027), (I-130)+(5.008)+(15.047), (I-130)+(5.008)+(15.063), (I-130)+(5.008)+(15.064), (I-130)+(5.009)+(9.001), (I-130)+(5.009)+(9.002), (I-130)+(5.009)+(9.003), (I-130)+(5.009)+(9.004), (I-130)+(5.009)+(9.005), (I-130)+(5.009)+(9.006), (I-130)+(5.009)+(9.007), (I-130)+(5.009)+(9.008), (I-130)+(5.009)+(9.009), (I-130)+(5.009)+(15.012), (I-130)+(5.009)+(15.016), (I-130)+(5.009)+(15.025), (I-130)+(5.009)+(15.027), (I-130)+(5.009)+(15.047), (I-130)+(5.009)+(15.063), (I-130)+(5.009)+(15.064), (I-130)+(5.010)+(9.001), (I-130)+(5.010)+(9.002), (I-130)+(5.010)+(9.003), (I-130)+(5.010)+(9.004), (I-130)+(5.010)+(9.005), (I-130)+(5.010)+(9.006), (I-130)+(5.010)+(9.007), (I-130)+(5.010)+(9.008), (I-130)+(5.010)+(9.009), (I-130)+(5.010)+(15.012), (I-130)+(5.010)+(15.016), (I-130)+(5.010)+(15.025), (I-130)+(5.010)+(15.027), (I-130)+(5.010)+(15.047), (I-130)+(5.010)+(15.063), (I-130)+(5.010)+(15.064), (I-130)+(5.011)+(9.001), (I-130)+(5.011)+(9.002), (I-130)+(5.011)+(9.003), (I-130)+(5.011)+(9.004), (I-130)+(5.011)+(9.005), (I-130)+(5.011)+(9.006), (I-130)+(5.011)+(9.007), (I-130)+(5.011)+(9.008), (I-130)+(5.011)+(9.009), (I-130)+(5.011)+(15.012), (I-130)+(5.011)+(15.016), (I-130)+(5.011)+(15.025), (I-130)+(5.011)+(15.027), (I-130)+(5.011)+(15.047), (I-130)+(5.011)+(15.063), (I-130)+(5.011)+(15.064), (I-130)+(5.012)+(9.001), (I-130)+(5.012)+(9.002), (I-130)+(5.012)+(9.003), (I-130)+(5.012)+(9.004), (I-130)+(5.012)+(9.005), (I-130)+(5.012)+(9.006), (I-130)+(5.012)+(9.007), (I-130)+(5.012)+(9.008), (I-130)+(5.012)+(9.009), (I-130)+(5.012)+(15.012), (I-130)+(5.012)+(15.016), (I-130)+(5.012)+(15.025), (I-130)+(5.012)+(15.027), (I-130)+(5.012)+(15.047), (I-130)+(5.012)+(15.063), (I-130)+(5.012)+(15.064), (I-130)+(5.013)+(9.001), (I-130)+(5.013)+(9.002), (I-130)+(5.013)+(9.003), (I-130)+(5.013)+(9.004), (I-130)+(5.013)+(9.005), (I-130)+(5.013)+(9.006), (I-130)+(5.013)+(9.007), (I-130)+(5.013)+(9.008), (I-130)+(5.013)+(9.009), (I-130)+(5.013)+(15.012), (I-130)+(5.013)+(15.016), (I-130)+(5.013)+(15.025), (I-130)+(5.013)+(15.027), (I-130)+(5.013)+(15.047), (I-130)+(5.013)+(15.063), (I-130)+(5.013)+(15.064), (I-130)+(5.014)+(9.001), (I-130)+(5.014)+(9.002), (I-130)+(5.014)+(9.003), (I-130)+(5.014)+(9.004), (I-130)+(5.014)+(9.005), (I-130)+(5.014)+(9.006), (I-130)+(5.014)+(9.007), (I-130)+(5.014)+(9.008), (I-130)+(5.014)+(9.009), (I-130)+(5.014)+(15.012), (I-130)+(5.014)+(15.016), (I-130)+(5.014)+(15.025), (I-130)+(5.014)+(15.027), (I-130)+(5.014)+(15.047), (I-130)+(5.014)+(15.063), (I-130)+(5.014)+(15.064), (I-130)+(5.015)+(9.001), (I-130)+(5.015)+(9.002), (I-130)+(5.015)+(9.003), (I-130)+(5.015)+(9.004), (I-130)+(5.015)+(9.005), (I-130)+(5.015)+(9.006), (I-130)+(5.015)+(9.007), (I-130)+(5.015)+(9.008), (I-130)+(5.015)+(9.009), (I-130)+(5.015)+(15.012), (I-130)+(5.015)+(15.016), (I-130)+(5.015)+(15.025), (I-130)+(5.015)+(15.027), (I-130)+(5.015)+(15.047), (I-130)+(5.015)+(15.063), (I-130)+(5.015)+(15.064), (I-130)+(5.016)+(9.001), (I-130)+(5.016)+(9.002), (I-130)+(5.016)+(9.003), (I-130)+(5.016)+(9.004), (I-130)+(5.016)+(9.005), (I-130)+(5.016)+(9.006), (I-130)+(5.016)+(9.007), (I-130)+(5.016)+(9.008), (I-130)+(5.016)+(9.009), (I-130)+(5.016)+(15.012), (I-130)+(5.016)+(15.016), (I-130)+(5.016)+(15.025), (I-130)+(5.016)+(15.027), (I-130)+(5.016)+(15.047), (I-130)+(5.016)+(15.063), (I-130)+(5.016)+(15.064), (I-130)+(5.017)+(9.001), (I-130)+(5.017)+(9.002), (I-130)+(5.017)+(9.003), (I-130)+(5.017)+(9.004), (I-130)+(5.017)+(9.005), (I-130)+(5.017)+(9.006), (I-130)+(5.017)+(9.007), (I-130)+(5.017)+(9.008), (I-130)+(5.017)+(9.009), (I-130)+(5.017)+(15.012), (I-130)+(5.017)+(15.016), (I-130)+(5.017)+(15.025), (I-130)+(5.017)+(15.027), (I-130)+(5.017)+(15.047), (I-130)+(5.017)+(15.063), (I-130)+(5.017)+(15.064), (I-130)+(5.018)+(9.001), (I-130)+(5.018)+(9.002), (I-130)+(5.018)+(9.003), (I-130)+(5.018)+(9.004), (I-130)+(5.018)+(9.005), (I-130)+(5.018)+(9.006), (I-130)+(5.018)+(9.007), (I-130)+(5.018)+(9.008), (I-130)+(5.018)+(9.009), (I-130)+(5.018)+(15.012), (I-130)+(5.018)+(15.016), (I-130)+(5.018)+(15.025), (I-130)+(5.018)+(15.027), (I-130)+(5.018)+(15.047), (I-130)+(5.018)+(15.063), (I-130)+(5.018)+(15.064), (I-130)+(5.019)+(9.001), (I-130)+(5.019)+(9.002), (I-130)+(5.019)+(9.003), (I-130)+(5.019)+(9.004), (I-130)+(5.019)+(9.005), (I-130)+(5.019)+(9.006), (I-130)+(5.019)+(9.007), (I-130)+(5.019)+(9.008), (I-130)+(5.019)+(9.009), (I-130)+(5.019)+(15.012), (I-130)+(5.019)+(15.016), (I-130)+(5.019)+(15.025), (I-130)+(5.019)+(15.027), (I-130)+(5.019)+(15.047), (I-130)+(5.019)+(15.063), (I-130)+(5.019)+(15.064), (I-130)+(5.020)+(9.001), (I-130)+(5.020)+(9.002), (I-130)+(5.020)+(9.003), (I-130)+(5.020)+(9.004), (I-130)+(5.020)+(9.005), (I-130)+(5.020)+(9.006), (I-130)+(5.020)+(9.007), (I-130)+(5.020)+(9.008), (I-130)+(5.020)+(9.009), (I-130)+(5.020)+(15.012), (I-130)+(5.020)+(15.016), (I-130)+(5.020)+(15.025), (I-130)+(5.020)+(15.027), (I-130)+(5.020)+(15.047), (I-130)+(5.020)+(15.063), (I-130)+(5.020)+(15.064), (I-130)+(5.021)+(9.001), (I-130)+(5.021)+(9.002), (I-130)+(5.021)+(9.003), (I-130)+(5.021)+(9.004), (I-130)+(5.021)+(9.005), (I-130)+(5.021)+(9.006), (I-130)+(5.021)+(9.007), (I-130)+(5.021)+(9.008), (I-130)+(5.021)+(9.009), (I-130)+(5.021)+(15.012), (I-130)+(5.021)+(15.016), (I-130)+(5.021)+(15.025), (I-130)+(5.021)+(15.027), (I-130)+(5.021)+(15.047), (I-130)+(5.021)+(15.063), (I-130)+(5.021)+(15.064), (I-130)+(5.022)+(9.001), (I-130)+(5.022)+(9.002), (I-130)+(5.022)+(9.003), (I-130)+(5.022)+(9.004), (I-130)+(5.022)+(9.005), (I-130)+(5.022)+(9.006), (I-130)+(5.022)+(9.007), (I-130)+(5.022)+(9.008), (I-130)+(5.022)+(9.009), (I-130)+(5.022)+(15.012), (I-130)+(5.022)+(15.016), (I-130)+(5.022)+(15.025), (I-130)+(5.022)+(15.027), (I-130)+(5.022)+(15.047), (I-130)+(5.022)+(15.063), (I-130)+(5.022)+(15.064), (I-130)+(5.023)+(9.001), (I-130)+(5.023)+(9.002), (I-130)+(5.023)+(9.003), (I-130)+(5.023)+(9.004), (I-130)+(5.023)+(9.005), (I-130)+(5.023)+(9.006), (I-130)+(5.023)+(9.007), (I-130)+(5.023)+(9.008), (I-130)+(5.023)+(9.009), (I-130)+(5.023)+(15.012), (I-130)+(5.023)+(15.016), (I-130)+(5.023)+(15.025), (I-130)+(5.023)+(15.027), (I-130)+(5.023)+(15.047), (I-130)+(5.023)+(15.063), (I-130)+(5.023)+(15.064).

If two compounds (B) are present in the combinations according to the invention, preferred compound combinations are also selected from the group (G3-C) consisting of the following mixtures:

(I-300)+(1.001)+(1.002), (I-300)+(1.001)+(1.003), (I-300)+(1.001)+(1.004), (I-300)+(1.001)+(1.005), (I-300)+(1.001)+(1.006), (I-300)+(1.001)+(1.007), (I-300)+(1.001)+(1.008), (I-300)+(1.001)+(1.009), (I-300)+(1.001)+(1.010), (I-300)+(1.001)+(1.011), (I-300)+(1.001)+(1.012), (I-300)+(1.001)+(1.013), (I-300)+(1.001)+(1.014), (I-300)+(1.001)+(1.015), (I-300)+(1.001)+(1.016), (I-300)+(1.001)+(1.017), (I-300)+(1.001)+(1.018), (I-300)+(1.001)+(1.019), (I-300)+(1.001)+(1.020), (I-300)+(1.001)+(1.021), (I-300)+(1.001)+(1.022), (I-300)+(1.001)+(1.023), (I-300)+(1.001)+(1.024), (I-300)+(1.001)+(1.025), (I-300)+(1.001)+(1.026), (I-300)+(1.001)+(1.027), (I-300)+(1.001)+(1.028), (I-300)+(1.001)+(1.029), (I-300)+(1.001)+(1.030), (I-300)+(1.001)+(1.031), (I-300)+(1.001)+(1.032), (I-300)+(1.001)+(1.033), (I-300)+(1.001)+(1.034), (I-300)+(1.001)+(1.035), (I-300)+(1.001)+(1.036), (I-300)+(1.001)+(1.037), (I-300)+(1.001)+(1.038), (I-300)+(1.001)+(1.039), (I-300)+(1.001)+(1.040), (I-300)+(1.001)+(1.041), (I-300)+(1.001)+(1.042), (I-300)+(1.001)+(1.043), (I-300)+(1.001)+(1.044), (I-300)+(1.001)+(1.045), (I-300)+(1.001)+(1.046), (I-300)+(1.001)+(1.047), (I-300)+(1.001)+(1.048), (I-300)+(1.001)+(1.049), (I-300)+(1.001)+(1.050), (I-300)+(1.001)+(1.051), (I-300)+(1.001)+(1.052), (I-300)+(1.001)+(1.053), (I-300)+(1.001)+(1.054), (I-300)+(1.001)+(1.055), (I-300)+(1.001)+(1.056), (I-300)+(1.001)+(1.057), (I-300)+(1.001)+(1.058), (I-300)+(1.001)+(1.059), (I-300)+(1.001)+(1.060), (I-300)+(1.001)+(1.061), (I-300)+(1.001)+(1.062), (I-300)+(1.001)+(1.063), (I-300)+(1.001)+(1.064), (I-300)+(1.001)+(1.065), (I-300)+(1.001)+(1.066), (I-300)+(1.001)+(1.067), (I-300)+(1.001)+(1.068), (I-300)+(1.001)+(1.069), (I-300)+(1.001)+(1.070), (I-300)+(1.001)+(1.071), (I-300)+(1.001)+(1.072), (I-300)+(1.001)+(1.073), (I-300)+(1.001)+(1.074), (I-300)+(1.001)+(1.075), (I-300)+(1.001)+(1.076), (I-300)+(1.001)+(1.077), (I-300)+(1.001)+(1.078), (I-300)+(1.001)+(1.079), (I-300)+(1.001)+(1.080), (I-300)+(1.001)+(1.081), (I-300)+(1.001)+(1.082), (I-300)+(1.001)+(1.083), (I-300)+(1.001)+(1.084), (I-300)+(1.001)+(1.085), (I-300)+(1.001)+(1.086), (I-300)+(1.001)+(1.087), (I-300)+(1.001)+(1.088), (I-300)+(1.001)+(1.089), (I-300)+(1.001)+(1.090), (I-300)+(1.001)+(1.091), (I-300)+(1.001)+(1.092), (I-300)+(1.001)+(2.001), (I-300)+(1.001)+(2.002), (I-300)+(1.001)+(2.003), (I-300)+(1.001)+(2.004), (I-300)+(1.001)+(2.005), (I-300)+(1.001)+(2.006), (I-300)+(1.001)+(2.007), (I-300)+(1.001)+(2.008), (I-300)+(1.001)+(2.009), (I-300)+(1.001)+(2.010), (I-300)+(1.001)+(2.011), (I-300)+(1.001)+(2.012), (I-300)+(1.001)+(2.013), (I-300)+(1.001)+(2.014), (I-300)+(1.001)+(2.015), (I-300)+(1.001)+(2.016), (I-300)+(1.001)+(2.017), (I-300)+(1.001)+(2.018), (I-300)+(1.001)+(2.019), (I-300)+(1.001)+(2.020), (I-300)+(1.001)+(2.021), (I-300)+(1.001)+(2.022), (I-300)+(1.001)+(2.023), (I-300)+(1.001)+(2.024), (I-300)+(1.001)+(2.025), (I-300)+(1.001)+(2.026), (I-300)+(1.001)+(2.027), (I-300)+(1.001)+(2.028), (I-300)+(1.001)+(2.029), (I-300)+(1.001)+(2.030), (I-300)+(1.001)+(2.031), (I-300)+(1.001)+(2.032), (I-300)+(1.001)+(2.033), (I-300)+(1.001)+(2.034), (I-300)+(1.001)+(2.035), (I-300)+(1.001)+(2.036), (I-300)+(1.001)+(2.037),
(I-300)+(1.001)+(2.038), (I-300)+(1.001)+(2.039),
(I-300)+(1.001)+(2.040), (I-300)+(1.001)+(2.041),
(I-300)+(1.001)+(2.042), (I-300)+(1.001)+(2.043),
(I-300)+(1.001)+(2.044), (I-300)+(1.001)+(2.045),
(I-300)+(1.001)+(2.046), (I-300)+(1.001)+(2.047),
(I-300)+(1.001)+(2.048), (I-300)+(1.001)+(2.049),
(I-300)+(1.001)+(2.050), (I-300)+(1.001)+(2.051),
(I-300)+(1.001)+(2.052), (I-300)+(1.001)+(2.053),
(I-300)+(1.001)+(2.054), (I-300)+(1.001)+(2.055),
(I-300)+(1.001)+(2.056), (I-300)+(1.001)+(2.057),
(I-300)+(1.001)+(2.058), (I-300)+(1.001)+(2.059),
(I-300)+(1.001)+(3.001), (I-300)+(1.001)+(3.002),
(I-300)+(1.001)+(3.003), (I-300)+(1.001)+(3.004),
(I-300)+(1.001)+(3.005), (I-300)+(1.001)+(3.006),
(I-300)+(1.001)+(3.007), (I-300)+(1.001)+(3.008),
(I-300)+(1.001)+(3.009), (I-300)+(1.001)+(3.010),
(I-300)+(1.001)+(3.011), (I-300)+(1.001)+(3.012),
(I-300)+(1.001)+(3.013), (I-300)+(1.001)+(3.014),
(I-300)+(1.001)+(3.015), (I-300)+(1.001)+(3.016),
(I-300)+(1.001)+(3.017), (I-300)+(1.001)+(3.018),
(I-300)+(1.001)+(3.019), (I-300)+(1.001)+(3.020),
(I-300)+(1.001)+(3.021), (I-300)+(1.001)+(3.022),
(I-300)+(1.001)+(3.023), (I-300)+(1.001)+(3.024),
(I-300)+(1.001)+(3.025), (I-300)+(1.001)+(3.026),
(I-300)+(1.001)+(3.027), (I-300)+(1.001)+(3.028),
(I-300)+(1.001)+(3.029), (I-300)+(1.001)+(3.030),
(I-300)+(1.001)+(3.031), (I-300)+(1.001)+(5.001),
(I-300)+(1.001)+(5.002), (I-300)+(1.001)+(5.003),
(I-300)+(1.001)+(5.004), (I-300)+(1.001)+(5.005),
(I-300)+(1.001)+(5.006), (I-300)+(1.001)+(5.007),
(I-300)+(1.001)+(5.008), (I-300)+(1.001)+(5.009),
(I-300)+(1.001)+(5.010), (I-300)+(1.001)+(5.011),
(I-300)+(1.001)+(5.012), (I-300)+(1.001)+(5.013),
(I-300)+(1.001)+(5.014), (I-300)+(1.001)+(5.015),
(I-300)+(1.001)+(5.016), (I-300)+(1.001)+(5.017),
(I-300)+(1.001)+(5.018), (I-300)+(1.001)+(5.019),
(I-300)+(1.001)+(5.020), (I-300)+(1.001)+(5.021),
(I-300)+(1.001)+(5.022), (I-300)+(1.001)+(5.023),
(I-300)+(1.001)+(6.001), (I-300)+(1.001)+(6.002),
(I-300)+(1.001)+(6.003), (I-300)+(1.001)+(6.004),
(I-300)+(1.001)+(7.001), (I-300)+(1.001)+(7.002),
(I-300)+(1.001)+(7.003), (I-300)+(1.001)+(7.004),
(I-300)+(1.001)+(7.005), (I-300)+(1.001)+(7.006),
(I-300)+(1.001)+(9.001), (I-300)+(1.001)+(9.002),
(I-300)+(1.001)+(9.003), (I-300)+(1.001)+(9.004),
(I-300)+(1.001)+(9.005), (I-300)+(1.001)+(9.006),
(I-300)+(1.001)+(9.007), (I-300)+(1.001)+(9.008),
(I-300)+(1.001)+(9.009), (I-300)+(1.001)+(14.001),
(I-300)+(1.001)+(14.002), (I-300)+(1.001)+(15.008),
(I-300)+(1.001)+(15.011), (I-300)+(1.001)+(15.012),
(I-300)+(1.001)+(15.016), (I-300)+(1.001)+(15.025),
(I-300)+(1.001)+(15.027), (I-300)+(1.001)+(15.047),
(I-300)+(1.001)+(15.063), (I-300)+(1.001)+(15.064),
(I-300)+(1.001)+(16.001), (I-300)+(1.001)+(16.002),
(I-300)+(1.001)+(16.003), (I-300)+(1.001)+(16.004),
(I-300)+(1.001)+(16.005), (I-300)+(1.001)+(16.006),
(I-300)+(1.001)+(16.007), (I-300)+(1.001)+(16.008),
(I-300)+(1.001)+(17.001), (I-300)+(1.001)+(17.002),
(I-300)+(1.001)+(17.003), (I-300)+(1.001)+(17.004),
(I-300)+(1.001)+(17.005), (I-300)+(1.001)+(17.006),
(I-300)+(1.001)+(17.007), (I-300)+(1.001)+(17.008),
(I-300)+(1.001)+(17.009), (I-300)+(1.001)+(17.010),
(I-300)+(1.001)+(17.011), (I-300)+(1.001)+(17.012),
(I-300)+(1.001)+(18.001),
(I-300)+(1.002)+(1.003), (I-300)+(1.002)+(1.004),
(I-300)+(1.002)+(1.005), (I-300)+(1.002)+(1.006),
(I-300)+(1.002)+(1.007), (I-300)+(1.002)+(1.008),
(I-300)+(1.002)+(1.009), (I-300)+(1.002)+(1.010),
(I-300)+(1.002)+(1.011), (I-300)+(1.002)+(1.012),
(I-300)+(1.002)+(1.013), (I-300)+(1.002)+(1.014),
(I-300)+(1.002)+(1.015), (I-300)+(1.002)+(1.016),
(I-300)+(1.002)+(1.017), (I-300)+(1.002)+(1.018),
(I-300)+(1.002)+(1.019), (I-300)+(1.002)+(1.020),
(I-300)+(1.002)+(1.021), (I-300)+(1.002)+(1.022),
(I-300)+(1.002)+(1.023), (I-300)+(1.002)+(1.024),
(I-300)+(1.002)+(1.025), (I-300)+(1.002)+(1.026),
(I-300)+(1.002)+(1.027), (I-300)+(1.002)+(1.028),
(I-300)+(1.002)+(1.029), (I-300)+(1.002)+(1.030),
(I-300)+(1.002)+(1.031), (I-300)+(1.002)+(1.032),
(I-300)+(1.002)+(1.033), (I-300)+(1.002)+(1.034),
(I-300)+(1.002)+(1.035), (I-300)+(1.002)+(1.036),
(I-300)+(1.002)+(1.037), (I-300)+(1.002)+(1.038),
(I-300)+(1.002)+(1.039), (I-300)+(1.002)+(1.040),
(I-300)+(1.002)+(1.041), (I-300)+(1.002)+(1.042),
(I-300)+(1.002)+(1.043), (I-300)+(1.002)+(1.044),
(I-300)+(1.002)+(1.045), (I-300)+(1.002)+(1.046),
(I-300)+(1.002)+(1.047), (I-300)+(1.002)+(1.048),
(I-300)+(1.002)+(1.049), (I-300)+(1.002)+(1.050),
(I-300)+(1.002)+(1.051), (I-300)+(1.002)+(1.052),
(I-300)+(1.002)+(1.053), (I-300)+(1.002)+(1.054),
(I-300)+(1.002)+(1.055), (I-300)+(1.002)+(1.056),
(I-300)+(1.002)+(1.057), (I-300)+(1.002)+(1.058),
(I-300)+(1.002)+(1.059), (I-300)+(1.002)+(1.060),
(I-300)+(1.002)+(1.061), (I-300)+(1.002)+(1.062),
(I-300)+(1.002)+(1.063), (I-300)+(1.002)+(1.064),
(I-300)+(1.002)+(1.065), (I-300)+(1.002)+(1.066),
(I-300)+(1.002)+(1.067), (I-300)+(1.002)+(1.068),
(I-300)+(1.002)+(1.069), (I-300)+(1.002)+(1.070),
(I-300)+(1.002)+(1.071), (I-300)+(1.002)+(1.072),
(I-300)+(1.002)+(1.073), (I-300)+(1.002)+(1.074),
(I-300)+(1.002)+(1.075), (I-300)+(1.002)+(1.076),
(I-300)+(1.002)+(1.077), (I-300)+(1.002)+(1.078),
(I-300)+(1.002)+(1.079), (I-300)+(1.002)+(1.080),
(I-300)+(1.002)+(1.081), (I-300)+(1.002)+(1.082),
(I-300)+(1.002)+(1.083), (I-300)+(1.002)+(1.084),
(I-300)+(1.002)+(1.085), (I-300)+(1.002)+(1.086),
(I-300)+(1.002)+(1.087), (I-300)+(1.002)+(1.088),
(I-300)+(1.002)+(1.089), (I-300)+(1.002)+(1.090),
(I-300)+(1.002)+(1.091), (I-300)+(1.002)+(1.092),
(I-300)+(1.002)+(2.001), (I-300)+(1.002)+(2.002),
(I-300)+(1.002)+(2.003), (I-300)+(1.002)+(2.004),
(I-300)+(1.002)+(2.005), (I-300)+(1.002)+(2.006),
(I-300)+(1.002)+(2.007), (I-300)+(1.002)+(2.008),
(I-300)+(1.002)+(2.009), (I-300)+(1.002)+(2.010),
(I-300)+(1.002)+(2.011), (I-300)+(1.002)+(2.012),
(I-300)+(1.002)+(2.013), (I-300)+(1.002)+(2.014),
(I-300)+(1.002)+(2.015), (I-300)+(1.002)+(2.016),
(I-300)+(1.002)+(2.017), (I-300)+(1.002)+(2.018),
(I-300)+(1.002)+(2.019), (I-300)+(1.002)+(2.020),
(I-300)+(1.002)+(2.021), (I-300)+(1.002)+(2.022),
(I-300)+(1.002)+(2.023), (I-300)+(1.002)+(2.024),
(I-300)+(1.002)+(2.025), (I-300)+(1.002)+(2.026),
(I-300)+(1.002)+(2.027), (I-300)+(1.002)+(2.028),
(I-300)+(1.002)+(2.029), (I-300)+(1.002)+(2.030),
(I-300)+(1.002)+(2.031), (I-300)+(1.002)+(2.032),
(I-300)+(1.002)+(2.033), (I-300)+(1.002)+(2.034),
(I-300)+(1.002)+(2.035), (I-300)+(1.002)+(2.036),
(I-300)+(1.002)+(2.037), (I-300)+(1.002)+(2.038),
(I-300)+(1.002)+(2.039), (I-300)+(1.002)+(2.040),
(I-300)+(1.002)+(2.041), (I-300)+(1.002)+(2.042),
(I-300)+(1.002)+(2.043), (I-300)+(1.002)+(2.044),
(I-300)+(1.002)+(2.045), (I-300)+(1.002)+(2.046),
(I-300)+(1.002)+(2.047), (I-300)+(1.002)+(2.048), (I-300)+(1.002)+(2.049), (I-300)+(1.002)+(2.050), (I-300)+(1.002)+(2.051), (I-300)+(1.002)+(2.052), (I-300)+(1.002)+(2.053), (I-300)+(1.002)+(2.054), (I-300)+(1.002)+(2.055), (I-300)+(1.002)+(2.056), (I-300)+(1.002)+(2.057), (I-300)+(1.002)+(2.058), (I-300)+(1.002)+(2.059), (I-300)+(1.002)+(3.001), (I-300)+(1.002)+(3.002), (I-300)+(1.002)+(3.003), (I-300)+(1.002)+(3.004), (I-300)+(1.002)+(3.005), (I-300)+(1.002)+(3.006), (I-300)+(1.002)+(3.007), (I-300)+(1.002)+(3.008), (I-300)+(1.002)+(3.009), (I-300)+(1.002)+(3.010), (I-300)+(1.002)+(3.011), (I-300)+(1.002)+(3.012), (I-300)+(1.002)+(3.013), (I-300)+(1.002)+(3.014), (I-300)+(1.002)+(3.015), (I-300)+(1.002)+(3.016), (I-300)+(1.002)+(3.017), (I-300)+(1.002)+(3.018), (I-300)+(1.002)+(3.019), (I-300)+(1.002)+(3.020), (I-300)+(1.002)+(3.021), (I-300)+(1.002)+(3.022), (I-300)+(1.002)+(3.023), (I-300)+(1.002)+(3.024), (I-300)+(1.002)+(3.025), (I-300)+(1.002)+(3.026), (I-300)+(1.002)+(3.027), (I-300)+(1.002)+(3.028), (I-300)+(1.002)+(3.029), (I-300)+(1.002)+(3.030), (I-300)+(1.002)+(3.031), (I-300)+(1.002)+(5.001), (I-300)+(1.002)+(5.002), (I-300)+(1.002)+(5.003), (I-300)+(1.002)+(5.004), (I-300)+(1.002)+(5.005), (I-300)+(1.002)+(5.006), (I-300)+(1.002)+(5.007), (I-300)+(1.002)+(5.008), (I-300)+(1.002)+(5.009), (I-300)+(1.002)+(5.010), (I-300)+(1.002)+(5.011), (I-300)+(1.002)+(5.012), (I-300)+(1.002)+(5.013), (I-300)+(1.002)+(5.014), (I-300)+(1.002)+(5.015), (I-300)+(1.002)+(5.016), (I-300)+(1.002)+(5.017), (I-300)+(1.002)+(5.018), (I-300)+(1.002)+(5.019), (I-300)+(1.002)+(5.020), (I-300)+(1.002)+(5.021), (I-300)+(1.002)+(5.022), (I-300)+(1.002)+(5.023), (I-300)+(1.002)+(6.001), (I-300)+(1.002)+(6.002), (I-300)+(1.002)+(6.003), (I-300)+(1.002)+(6.004), (I-300)+(1.002)+(7.001), (I-300)+(1.002)+(7.002), (I-300)+(1.002)+(7.003), (I-300)+(1.002)+(7.004), (I-300)+(1.002)+(7.005), (I-300)+(1.002)+(7.006), (I-300)+(1.002)+(9.001), (I-300)+(1.002)+(9.002), (I-300)+(1.002)+(9.003), (I-300)+(1.002)+(9.004), (I-300)+(1.002)+(9.005), (I-300)+(1.002)+(9.006), (I-300)+(1.002)+(9.007), (I-300)+(1.002)+(9.008), (I-300)+(1.002)+(9.009), (I-300)+(1.002)+(14.001), (I-300)+(1.002)+(14.002), (I-300)+(1.002)+(15.008), (I-300)+(1.002)+(15.011), (I-300)+(1.002)+(15.012), (I-300)+(1.002)+(15.016), (I-300)+(1.002)+(15.025), (I-300)+(1.002)+(15.027), (I-300)+(1.002)+(15.047), (I-300)+(1.002)+(15.063), (I-300)+(1.002)+(15.064), (I-300)+(1.002)+(16.001), (I-300)+(1.002)+(16.002), (I-300)+(1.002)+(16.003), (I-300)+(1.002)+(16.004), (I-300)+(1.002)+(16.005), (I-300)+(1.002)+(16.006), (I-300)+(1.002)+(16.007), (I-300)+(1.002)+(16.008), (I-300)+(1.002)+(17.001), (I-300)+(1.002)+(17.002), (I-300)+(1.002)+(17.003), (I-300)+(1.002)+(17.004), (I-300)+(1.002)+(17.005), (I-300)+(1.002)+(17.006), (I-300)+(1.002)+(17.007), (I-300)+(1.002)+(17.008), (I-300)+(1.002)+(17.009), (I-300)+(1.002)+(17.010), (I-300)+(1.002)+(17.011), (I-300)+(1.002)+(17.012), (I-300)+(1.002)+(18.001), (I-300)+(1.003)+(1.004), (I-300)+(1.003)+(1.005), (I-300)+(1.003)+(1.006), (I-300)+(1.003)+(1.007), (I-300)+(1.003)+(1.008), (I-300)+(1.003)+(1.009), (I-300)+(1.003)+(1.010), (I-300)+(1.003)+(1.011), (I-300)+(1.003)+(1.012), (I-300)+(1.003)+(1.013), (I-300)+(1.003)+(1.014), (I-300)+(1.003)+(1.015), (I-300)+(1.003)+(1.016), (I-300)+(1.003)+(1.017), (I-300)+(1.003)+(1.018), (I-300)+(1.003)+(1.019), (I-300)+(1.003)+(1.020), (I-300)+(1.003)+(1.021), (I-300)+(1.003)+(1.022), (I-300)+(1.003)+(1.023), (I-300)+(1.003)+(1.024), (I-300)+(1.003)+(1.025), (I-300)+(1.003)+(1.026), (I-300)+(1.003)+(1.027), (I-300)+(1.003)+(1.028), (I-300)+(1.003)+(1.029), (I-300)+(1.003)+(1.030), (I-300)+(1.003)+(1.031), (I-300)+(1.003)+(1.032), (I-300)+(1.003)+(1.033), (I-300)+(1.003)+(1.034), (I-300)+(1.003)+(1.035), (I-300)+(1.003)+(1.036), (I-300)+(1.003)+(1.037), (I-300)+(1.003)+(1.038), (I-300)+(1.003)+(1.039), (I-300)+(1.003)+(1.040), (I-300)+(1.003)+(1.041), (I-300)+(1.003)+(1.042), (I-300)+(1.003)+(1.043), (I-300)+(1.003)+(1.044), (I-300)+(1.003)+(1.045), (I-300)+(1.003)+(1.046), (I-300)+(1.003)+(1.047), (I-300)+(1.003)+(1.048), (I-300)+(1.003)+(1.049), (I-300)+(1.003)+(1.050), (I-300)+(1.003)+(1.051), (I-300)+(1.003)+(1.052), (I-300)+(1.003)+(1.053), (I-300)+(1.003)+(1.054), (I-300)+(1.003)+(1.055), (I-300)+(1.003)+(1.056), (I-300)+(1.003)+(1.057), (I-300)+(1.003)+(1.058), (I-300)+(1.003)+(1.059), (I-300)+(1.003)+(1.060), (I-300)+(1.003)+(1.061), (I-300)+(1.003)+(1.062), (I-300)+(1.003)+(1.063), (I-300)+(1.003)+(1.064), (I-300)+(1.003)+(1.065), (I-300)+(1.003)+(1.066), (I-300)+(1.003)+(1.067), (I-300)+(1.003)+(1.068), (I-300)+(1.003)+(1.069), (I-300)+(1.003)+(1.070), (I-300)+(1.003)+(1.071), (I-300)+(1.003)+(1.072), (I-300)+(1.003)+(1.073), (I-300)+(1.003)+(1.074), (I-300)+(1.003)+(1.075), (I-300)+(1.003)+(1.076), (I-300)+(1.003)+(1.077), (I-300)+(1.003)+(1.078), (I-300)+(1.003)+(1.079), (I-300)+(1.003)+(1.080), (I-300)+(1.003)+(1.081), (I-300)+(1.003)+(1.082), (I-300)+(1.003)+(1.083), (I-300)+(1.003)+(1.084), (I-300)+(1.003)+(1.085), (I-300)+(1.003)+(1.086), (I-300)+(1.003)+(1.087), (I-300)+(1.003)+(1.088), (I-300)+(1.003)+(1.089), (I-300)+(1.003)+(1.090), (I-300)+(1.003)+(1.091), (I-300)+(1.003)+(1.092), (I-300)+(1.003)+(2.001), (I-300)+(1.003)+(2.002), (I-300)+(1.003)+(2.003), (I-300)+(1.003)+(2.004), (I-300)+(1.003)+(2.005), (I-300)+(1.003)+(2.006), (I-300)+(1.003)+(2.007), (I-300)+(1.003)+(2.008), (I-300)+(1.003)+(2.009), (I-300)+(1.003)+(2.010), (I-300)+(1.003)+(2.011), (I-300)+(1.003)+(2.012), (I-300)+(1.003)+(2.013), (I-300)+(1.003)+(2.014), (I-300)+(1.003)+(2.015), (I-300)+(1.003)+(2.016), (I-300)+(1.003)+(2.017), (I-300)+(1.003)+(2.018), (I-300)+(1.003)+(2.019), (I-300)+(1.003)+(2.020), (I-300)+(1.003)+(2.021), (I-300)+(1.003)+(2.022), (I-300)+(1.003)+(2.023), (I-300)+(1.003)+(2.024), (I-300)+(1.003)+(2.025), (I-300)+(1.003)+(2.026), (I-300)+(1.003)+(2.027), (I-300)+(1.003)+(2.028), (I-300)+(1.003)+(2.029), (I-300)+(1.003)+(2.030), (I-300)+(1.003)+(2.031), (I-300)+(1.003)+(2.032), (I-300)+(1.003)+(2.033), (I-300)+(1.003)+(2.034), (I-300)+(1.003)+(2.035), (I-300)+(1.003)+(2.036), (I-300)+(1.003)+(2.037), (I-300)+(1.003)+(2.038), (I-300)+(1.003)+(2.039), (I-300)+(1.003)+(2.040), (I-300)+(1.003)+(2.041), (I-300)+(1.003)+(2.042), (I-300)+(1.003)+(2.043), (I-300)+(1.003)+(2.044), (I-300)+(1.003)+(2.045), (I-300)+(1.003)+(2.046), (I-300)+(1.003)+(2.047), (I-300)+(1.003)+(2.048), (I-300)+(1.003)+(2.049), (I-300)+(1.003)+(2.050), (I-300)+(1.003)+(2.051), (I-300)+(1.003)+(2.052), (I-300)+(1.003)+(2.053), (I-300)+(1.003)+(2.054), (I-300)+(1.003)+(2.055), (I-300)+(1.003)+(2.056), (I-300)+(1.003)+(2.057), (I-300)+(1.003)+(2.058), (I-300)+(1.003)+(2.059), (I-300)+(1.003)+(3.001), (I-300)+(1.003)+(3.002), (I-300)+(1.003)+(3.003), (I-300)+(1.003)+(3.004), (I-300)+(1.003)+(3.005), (I-300)+(1.003)+(3.006), (I-300)+(1.003)+(3.007), (I-300)+(1.003)+(3.008), (I-300)+(1.003)+(3.009), (I-300)+(1.003)+(3.010), (I-300)+(1.003)+(3.011), (I-300)+(1.003)+(3.012), (I-300)+(1.003)+(3.013), (I-300)+(1.003)+(3.014), (I-300)+(1.003)+(3.015), (I-300)+(1.003)+(3.016), (I-300)+(1.003)+(3.017), (I-300)+(1.003)+(3.018), (I-300)+(1.003)+(3.019), (I-300)+(1.003)+(3.020), (I-300)+(1.003)+(3.021), (I-300)+(1.003)+(3.022), (I-300)+(1.003)+(3.023), (I-300)+(1.003)+(3.024), (I-300)+(1.003)+(3.025), (I-300)+(1.003)+(3.026), (I-300)+(1.003)+(3.027), (I-300)+(1.003)+(3.028), (I-300)+(1.003)+(3.029), (I-300)+(1.003)+(3.030), (I-300)+(1.003)+(3.031), (I-300)+(1.003)+(5.001), (I-300)+(1.003)+(5.002), (I-300)+(1.003)+(5.003), (I-300)+(1.003)+(5.004), (I-300)+(1.003)+(5.005), (I-300)+(1.003)+(5.006), (I-300)+(1.003)+(5.007), (I-300)+(1.003)+(5.008), (I-300)+(1.003)+(5.009), (I-300)+(1.003)+(5.010), (I-300)+(1.003)+(5.011), (I-300)+(1.003)+(5.012), (I-300)+(1.003)+(5.013), (I-300)+(1.003)+(5.014), (I-300)+(1.003)+(5.015), (I-300)+(1.003)+(5.016), (I-300)+(1.003)+(5.017), (I-300)+(1.003)+(5.018), (I-300)+(1.003)+(5.019), (I-300)+(1.003)+(5.020), (I-300)+(1.003)+(5.021), (I-300)+(1.003)+(5.022), (I-300)+(1.003)+(5.023), (I-300)+(1.003)+(6.001), (I-300)+(1.003)+(6.002), (I-300)+(1.003)+(6.003), (I-300)+(1.003)+(6.004), (I-300)+(1.003)+(7.001), (I-300)+(1.003)+(7.002), (I-300)+(1.003)+(7.003), (I-300)+(1.003)+(7.004), (I-300)+(1.003)+(7.005), (I-300)+(1.003)+(7.006), (I-300)+(1.003)+(9.001), (I-300)+(1.003)+(9.002), (I-300)+(1.003)+(9.003), (I-300)+(1.003)+(9.004), (I-300)+(1.003)+(9.005), (I-300)+(1.003)+(9.006), (I-300)+(1.003)+(9.007), (I-300)+(1.003)+(9.008), (I-300)+(1.003)+(9.009), (I-300)+(1.003)+(14.001), (I-300)+(1.003)+(14.002), (I-300)+(1.003)+(15.008), (I-300)+(1.003)+(15.011), (I-300)+(1.003)+(15.012), (I-300)+(1.003)+(15.016), (I-300)+(1.003)+(15.025), (I-300)+(1.003)+(15.027), (I-300)+(1.003)+(15.047), (I-300)+(1.003)+(15.063), (I-300)+(1.003)+(15.064), (I-300)+(1.003)+(16.001), (I-300)+(1.003)+(16.002), (I-300)+(1.003)+(16.003), (I-300)+(1.003)+(16.004), (I-300)+(1.003)+(16.005), (I-300)+(1.003)+(16.006), (I-300)+(1.003)+(16.007), (I-300)+(1.003)+(16.008), (I-300)+(1.003)+(17.001), (I-300)+(1.003)+(17.002), (I-300)+(1.003)+(17.003), (I-300)+(1.003)+(17.004), (I-300)+(1.003)+(17.005), (I-300)+(1.003)+(17.006), (I-300)+(1.003)+(17.007), (I-300)+(1.003)+(17.008), (I-300)+(1.003)+(17.009), (I-300)+(1.003)+(17.010), (I-300)+(1.003)+(17.011), (I-300)+(1.003)+(17.012), (I-300)+(1.003)+(18.001), (I-300)+(1.004)+(1.005), (I-300)+(1.004)+(1.006), (I-300)+(1.004)+(1.007), (I-300)+(1.004)+(1.008), (I-300)+(1.004)+(1.009), (I-300)+(1.004)+(1.010), (I-300)+(1.004)+(1.011), (I-300)+(1.004)+(1.012), (I-300)+(1.004)+(1.013), (I-300)+(1.004)+(1.014), (I-300)+(1.004)+(1.015), (I-300)+(1.004)+(1.016), (I-300)+(1.004)+(1.017), (I-300)+(1.004)+(1.018), (I-300)+(1.004)+(1.019), (I-300)+(1.004)+(1.020), (I-300)+(1.004)+(1.021), (I-300)+(1.004)+(1.022), (I-300)+(1.004)+(1.023), (I-300)+(1.004)+(1.024), (I-300)+(1.004)+(1.025), (I-300)+(1.004)+(1.026), (I-300)+(1.004)+(1.027), (I-300)+(1.004)+(1.028), (I-300)+(1.004)+(1.029), (I-300)+(1.004)+(1.030), (I-300)+(1.004)+(1.031), (I-300)+(1.004)+(1.032), (I-300)+(1.004)+(1.033), (I-300)+(1.004)+(1.034), (I-300)+(1.004)+(1.035), (I-300)+(1.004)+(1.036), (I-300)+(1.004)+(1.037), (I-300)+(1.004)+(1.038), (I-300)+(1.004)+(1.039), (I-300)+(1.004)+(1.040), (I-300)+(1.004)+(1.041), (I-300)+(1.004)+(1.042), (I-300)+(1.004)+(1.043), (I-300)+(1.004)+(1.044), (I-300)+(1.004)+(1.045), (I-300)+(1.004)+(1.046), (I-300)+(1.004)+(1.047), (I-300)+(1.004)+(1.048), (I-300)+(1.004)+(1.049), (I-300)+(1.004)+(1.050), (I-300)+(1.004)+(1.051), (I-300)+(1.004)+(1.052), (I-300)+(1.004)+(1.053), (I-300)+(1.004)+(1.054), (I-300)+(1.004)+(1.055), (I-300)+(1.004)+(1.056), (I-300)+(1.004)+(1.057), (I-300)+(1.004)+(1.058), (I-300)+(1.004)+(1.059), (I-300)+(1.004)+(1.060), (I-300)+(1.004)+(1.061), (I-300)+(1.004)+(1.062), (I-300)+(1.004)+(1.063), (I-300)+(1.004)+(1.064), (I-300)+(1.004)+(1.065), (I-300)+(1.004)+(1.066), (I-300)+(1.004)+(1.067), (I-300)+(1.004)+(1.068), (I-300)+(1.004)+(1.069), (I-300)+(1.004)+(1.070), (I-300)+(1.004)+(1.071), (I-300)+(1.004)+(1.072), (I-300)+(1.004)+(1.073), (I-300)+(1.004)+(1.074), (I-300)+(1.004)+(1.075), (I-300)+(1.004)+(1.076), (I-300)+(1.004)+(1.077), (I-300)+(1.004)+(1.078), (I-300)+(1.004)+(1.079), (I-300)+(1.004)+(1.080), (I-300)+(1.004)+(1.081), (I-300)+(1.004)+(1.082), (I-300)+(1.004)+(1.083), (I-300)+(1.004)+(1.084), (I-300)+(1.004)+(1.085), (I-300)+(1.004)+(1.086), (I-300)+(1.004)+(1.087), (I-300)+(1.004)+(1.088), (I-300)+(1.004)+(1.089), (I-300)+(1.004)+(1.090), (I-300)+(1.004)+(1.091), (I-300)+(1.004)+(1.092), (I-300)+(1.004)+(2.001), (I-300)+(1.004)+(2.002), (I-300)+(1.004)+(2.003), (I-300)+(1.004)+(2.004), (I-300)+(1.004)+(2.005), (I-300)+(1.004)+(2.006), (I-300)+(1.004)+(2.007), (I-300)+(1.004)+(2.008), (I-300)+(1.004)+(2.009), (I-300)+(1.004)+(2.010), (I-300)+(1.004)+(2.011), (I-300)+(1.004)+(2.012), (I-300)+(1.004)+(2.013), (I-300)+(1.004)+(2.014), (I-300)+(1.004)+(2.015), (I-300)+(1.004)+(2.016), (I-300)+(1.004)+(2.017), (I-300)+(1.004)+(2.018), (I-300)+(1.004)+(2.019), (I-300)+(1.004)+(2.020), (I-300)+(1.004)+(2.021), (I-300)+(1.004)+(2.022), (I-300)+(1.004)+(2.023), (I-300)+(1.004)+(2.024), (I-300)+(1.004)+(2.025), (I-300)+(1.004)+(2.026), (I-300)+(1.004)+(2.027), (I-300)+(1.004)+(2.028), (I-300)+(1.004)+(2.029), (I-300)+(1.004)+(2.030), (I-300)+(1.004)+(2.031), (I-300)+(1.004)+(2.032), (I-300)+(1.004)+(2.033), (I-300)+(1.004)+(2.034), (I-300)+(1.004)+(2.035), (I-300)+(1.004)+(2.036), (I-300)+(1.004)+(2.037), (I-300)+(1.004)+(2.038), (I-300)+(1.004)+(2.039), (I-300)+(1.004)+(2.040), (I-300)+(1.004)+(2.041), (I-300)+(1.004)+(2.042), (I-300)+(1.004)+(2.043), (I-300)+(1.004)+(2.044), (I-300)+(1.004)+(2.045), (I-300)+(1.004)+(2.046), (I-300)+(1.004)+(2.047), (I-300)+(1.004)+(2.048), (I-300)+(1.004)+(2.049), (I-300)+(1.004)+(2.050), (I-300)+(1.004)+(2.051), (I-300)+(1.004)+(2.052), (I-300)+(1.004)+(2.053), (I-300)+(1.004)+(2.054), (I-300)+(1.004)+(2.055), (I-300)+(1.004)+(2.056), (I-300)+(1.004)+(2.057), (I-300)+(1.004)+(2.058), (I-300)+(1.004)+(2.059), (I-300)+(1.004)+(3.001), (I-300)+(1.004)+(3.002), (I-300)+(1.004)+(3.003), (I-300)+(1.004)+(3.004), (I-300)+(1.004)+(3.005), (I-300)+(1.004)+(3.006), (I-300)+(1.004)+(3.007), (I-300)+(1.004)+(3.008), (I-300)+(1.004)+(3.009), (I-300)+(1.004)+(3.010), (I-300)+(1.004)+(3.011), (I-300)+(1.004)+(3.012), (I-300)+(1.004)+(3.013), (I-300)+(1.004)+(3.014), (I-300)+(1.004)+(3.015), (I-300)+(1.004)+(3.016), (I-300)+(1.004)+(3.017), (I-300)+(1.004)+(3.018), (I-300)+(1.004)+(3.019), (I-300)+(1.004)+(3.020), (I-300)+(1.004)+(3.021), (I-300)+(1.004)+(3.022), (I-300)+(1.004)+(3.023), (I-300)+(1.004)+(3.024), (I-300)+(1.004)+(3.025), (I-300)+(1.004)+(3.026), (I-300)+(1.004)+(3.027), (I-300)+(1.004)+(3.028), (I-300)+(1.004)+(3.029), (I-300)+(1.004)+(3.030), (I-300)+(1.004)+(3.031), (I-300)+(1.004)+(5.001), (I-300)+(1.004)+(5.002), (I-300)+(1.004)+(5.003), (I-300)+(1.004)+(5.004), (I-300)+(1.004)+(5.005), (I-300)+(1.004)+(5.006), (I-300)+(1.004)+(5.007), (I-300)+(1.004)+(5.008), (I-300)+(1.004)+(5.009), (I-300)+(1.004)+(5.010), (I-300)+(1.004)+(5.011), (I-300)+(1.004)+(5.012), (I-300)+(1.004)+(5.013), (I-300)+(1.004)+(5.014), (I-300)+(1.004)+(5.015), (I-300)+(1.004)+(5.016), (I-300)+(1.004)+(5.017), (I-300)+(1.004)+(5.018), (I-300)+(1.004)+(5.019), (I-300)+(1.004)+(5.020), (I-300)+(1.004)+(5.021), (I-300)+(1.004)+(5.022), (I-300)+(1.004)+(5.023), (I-300)+(1.004)+(6.001), (I-300)+(1.004)+(6.002), (I-300)+(1.004)+(6.003), (I-300)+(1.004)+(6.004), (I-300)+(1.004)+(7.001), (I-300)+(1.004)+(7.002), (I-300)+(1.004)+(7.003), (I-300)+(1.004)+(7.004), (I-300)+(1.004)+(7.005), (I-300)+(1.004)+(7.006), (I-300)+(1.004)+(9.001), (I-300)+(1.004)+(9.002), (I-300)+(1.004)+(9.003), (I-300)+(1.004)+(9.004), (I-300)+(1.004)+(9.005), (I-300)+(1.004)+(9.006), (I-300)+(1.004)+(9.007), (I-300)+(1.004)+(9.008), (I-300)+(1.004)+(9.009), (I-300)+(1.004)+(14.001), (I-300)+(1.004)+(14.002), (I-300)+(1.004)+(15.008), (I-300)+(1.004)+(15.011), (I-300)+(1.004)+(15.012), (I-300)+(1.004)+(15.016), (I-300)+(1.004)+(15.025), (I-300)+(1.004)+(15.027), (I-300)+(1.004)+(15.047), (I-300)+(1.004)+(15.063), (I-300)+(1.004)+(15.064), (I-300)+(1.004)+(16.001), (I-300)+(1.004)+(16.002), (I-300)+(1.004)+(16.003), (I-300)+(1.004)+(16.004), (I-300)+(1.004)+(16.005), (I-300)+(1.004)+(16.006), (I-300)+(1.004)+(16.007), (I-300)+(1.004)+(16.008), (I-300)+(1.004)+(17.001), (I-300)+(1.004)+(17.002), (I-300)+(1.004)+(17.003), (I-300)+(1.004)+(17.004), (I-300)+(1.004)+(17.005), (I-300)+(1.004)+(17.006), (I-300)+(1.004)+(17.007), (I-300)+(1.004)+(17.008), (I-300)+(1.004)+(17.009), (I-300)+(1.004)+(17.010), (I-300)+(1.004)+(17.011), (I-300)+(1.004)+(17.012), (I-300)+(1.004)+(18.001), (I-300)+(1.005)+(1.006), (I-300)+(1.005)+(1.007), (I-300)+(1.005)+(1.008), (I-300)+(1.005)+(1.009), (I-300)+(1.005)+(1.010), (I-300)+(1.005)+(1.011), (I-300)+(1.005)+(1.012), (I-300)+(1.005)+(1.013), (I-300)+(1.005)+(1.014), (I-300)+(1.005)+(1.015), (I-300)+(1.005)+(1.016), (I-300)+(1.005)+(1.017), (I-300)+(1.005)+(1.018), (I-300)+(1.005)+(1.019), (I-300)+(1.005)+(1.020), (I-300)+(1.005)+(1.021), (I-300)+(1.005)+(1.022), (I-300)+(1.005)+(1.023), (I-300)+(1.005)+(1.024), (I-300)+(1.005)+(1.025), (I-300)+(1.005)+(1.026), (I-300)+(1.005)+(1.027), (I-300)+(1.005)+(1.028), (I-300)+(1.005)+(1.029), (I-300)+(1.005)+(1.030), (I-300)+(1.005)+(1.031), (I-300)+(1.005)+(1.032), (I-300)+(1.005)+(1.033), (I-300)+(1.005)+(1.034), (I-300)+(1.005)+(1.035), (I-300)+(1.005)+(1.036), (I-300)+(1.005)+(1.037), (I-300)+(1.005)+(1.038), (I-300)+(1.005)+(1.039), (I-300)+(1.005)+(1.040), (I-300)+(1.005)+(1.041), (I-300)+(1.005)+(1.042), (I-300)+(1.005)+(1.043), (I-300)+(1.005)+(1.044), (I-300)+(1.005)+(1.045), (I-300)+(1.005)+(1.046), (I-300)+(1.005)+(1.047), (I-300)+(1.005)+(1.048), (I-300)+(1.005)+(1.049), (I-300)+(1.005)+(1.050), (I-300)+(1.005)+(1.051), (I-300)+(1.005)+(1.052), (I-300)+(1.005)+(1.053), (I-300)+(1.005)+(1.054), (I-300)+(1.005)+(1.055), (I-300)+(1.005)+(1.056), (I-300)+(1.005)+(1.057), (I-300)+(1.005)+(1.058), (I-300)+(1.005)+(1.059), (I-300)+(1.005)+(1.060), (I-300)+(1.005)+(1.061), (I-300)+(1.005)+(1.062), (I-300)+(1.005)+(1.063), (I-300)+(1.005)+(1.064), (I-300)+(1.005)+(1.065), (I-300)+(1.005)+(1.066), (I-300)+(1.005)+(1.067), (I-300)+(1.005)+(1.068), (I-300)+(1.005)+(1.069), (I-300)+(1.005)+(1.070), (I-300)+(1.005)+(1.071), (I-300)+(1.005)+(1.072), (I-300)+(1.005)+(1.073), (I-300)+(1.005)+(1.074), (I-300)+(1.005)+(1.075), (I-300)+(1.005)+(1.076), (I-300)+(1.005)+(1.077), (I-300)+(1.005)+(1.078), (I-300)+(1.005)+(1.079), (I-300)+(1.005)+(1.080), (I-300)+(1.005)+(1.081), (I-300)+(1.005)+(1.082), (I-300)+(1.005)+(1.083), (I-300)+(1.005)+(1.084), (I-300)+(1.005)+(1.085), (I-300)+(1.005)+(1.086), (I-300)+(1.005)+(1.087), (I-300)+(1.005)+(1.088), (I-300)+(1.005)+(1.089), (I-300)+(1.005)+(1.090), (I-300)+(1.005)+(1.091), (I-300)+(1.005)+(1.092), (I-300)+(1.005)+(2.001), (I-300)+(1.005)+(2.002), (I-300)+(1.005)+(2.003), (I-300)+(1.005)+(2.004), (I-300)+(1.005)+(2.005), (I-300)+(1.005)+(2.006), (I-300)+(1.005)+(2.007), (I-300)+(1.005)+(2.008), (I-300)+(1.005)+(2.009), (I-300)+(1.005)+(2.010), (I-300)+(1.005)+(2.011), (I-300)+(1.005)+(2.012), (I-300)+(1.005)+(2.013), (I-300)+(1.005)+(2.014), (I-300)+(1.005)+(2.015), (I-300)+(1.005)+(2.016), (I-300)+(1.005)+(2.017), (I-300)+(1.005)+(2.018), (I-300)+(1.005)+(2.019), (I-300)+(1.005)+(2.020), (I-300)+(1.005)+(2.021), (I-300)+(1.005)+(2.022), (I-300)+(1.005)+(2.023), (I-300)+(1.005)+(2.024), (I-300)+(1.005)+(2.025), (I-300)+(1.005)+(2.026), (I-300)+(1.005)+(2.027), (I-300)+(1.005)+(2.028), (I-300)+(1.005)+(2.029), (I-300)+(1.005)+(2.030), (I-300)+(1.005)+(2.031), (I-300)+(1.005)+(2.032), (I-300)+(1.005)+(2.033), (I-300)+(1.005)+(2.034), (I-300)+(1.005)+(2.035), (I-300)+(1.005)+(2.036), (I-300)+(1.005)+(2.037), (I-300)+(1.005)+(2.038), (I-300)+(1.005)+(2.039), (I-300)+(1.005)+(2.040), (I-300)+(1.005)+(2.041), (I-300)+(1.005)+(2.042), (I-300)+(1.005)+(2.043), (I-300)+(1.005)+(2.044), (I-300)+(1.005)+(2.045), (I-300)+(1.005)+(2.046), (I-300)+(1.005)+(2.047), (I-300)+(1.005)+(2.048), (I-300)+(1.005)+(2.049), (I-300)+(1.005)+(2.050), (I-300)+(1.005)+(2.051), (I-300)+(1.005)+(2.052), (I-300)+(1.005)+(2.053), (I-300)+(1.005)+(2.054), (I-300)+(1.005)+(2.055), (I-300)+(1.005)+(2.056), (I-300)+(1.005)+(2.057), (I-300)+(1.005)+(2.058), (I-300)+(1.005)+(2.059), (I-300)+(1.005)+(3.001), (I-300)+(1.005)+(3.002), (I-300)+(1.005)+(3.003), (I-300)+(1.005)+(3.004), (I-300)+(1.005)+(3.005), (I-300)+(1.005)+(3.006), (I-300)+(1.005)+(3.007), (I-300)+(1.005)+(3.008), (I-300)+(1.005)+(3.009), (I-300)+(1.005)+(3.010), (I-300)+(1.005)+(3.011), (I-300)+(1.005)+(3.012), (I-300)+(1.005)+(3.013), (I-300)+(1.005)+(3.014), (I-300)+(1.005)+(3.015), (I-300)+(1.005)+(3.016), (I-300)+(1.005)+(3.017), (I-300)+(1.005)+(3.018), (I-300)+(1.005)+(3.019), (I-300)+(1.005)+(3.020), (I-300)+(1.005)+(3.021), (I-300)+(1.005)+(3.022), (I-300)+(1.005)+(3.023), (I-300)+(1.005)+(3.024), (I-300)+(1.005)+(3.025), (I-300)+(1.005)+(3.026), (I-300)+(1.005)+(3.027), (I-300)+(1.005)+(3.028), (I-300)+(1.005)+(3.029), (I-300)+(1.005)+(3.030), (I-300)+(1.005)+(3.031), (I-300)+(1.005)+(5.001), (I-300)+(1.005)+(5.002), (I-300)+(1.005)+(5.003), (I-300)+(1.005)+(5.004), (I-300)+(1.005)+(5.005), (I-300)+(1.005)+(5.006), (I-300)+(1.005)+(5.007), (I-300)+(1.005)+(5.008), (I-300)+(1.005)+(5.009), (I-300)+(1.005)+(5.010), (I-300)+(1.005)+(5.011), (I-300)+(1.005)+(5.012), (I-300)+(1.005)+(5.013), (I-300)+(1.005)+(5.014), (I-300)+(1.005)+(5.015), (I-300)+(1.005)+(5.016), (I-300)+(1.005)+(5.017), (I-300)+(1.005)+(5.018), (I-300)+(1.005)+(5.019), (I-300)+(1.005)+(5.020), (I-300)+(1.005)+(5.021), (I-300)+(1.005)+(5.022), (I-300)+(1.005)+(5.023), (I-300)+(1.005)+(6.001), (I-300)+(1.005)+(6.002), (I-300)+(1.005)+(6.003), (I-300)+(1.005)+(6.004), (I-300)+(1.005)+(7.001), (I-300)+(1.005)+(7.002), (I-300)+(1.005)+(7.003), (I-300)+(1.005)+(7.004), (I-300)+(1.005)+(7.005), (I-300)+(1.005)+(7.006), (I-300)+(1.005)+(9.001), (I-300)+(1.005)+(9.002), (I-300)+(1.005)+(9.003), (I-300)+(1.005)+(9.004), (I-300)+(1.005)+(9.005), (I-300)+(1.005)+(9.006), (I-300)+(1.005)+(9.007), (I-300)+(1.005)+(9.008), (I-300)+(1.005)+(9.009), (I-300)+(1.005)+(14.001), (I-300)+(1.005)+(14.002), (I-300)+(1.005)+(15.008), (I-300)+(1.005)+(15.011), (I-300)+(1.005)+(15.012), (I-300)+(1.005)+(15.016), (I-300)+(1.005)+(15.025), (I-300)+(1.005)+(15.027), (I-300)+(1.005)+(15.047), (I-300)+(1.005)+(15.063), (I-300)+(1.005)+(15.064), (I-300)+(1.005)+(16.001), (I-300)+(1.005)+(16.002), (I-300)+(1.005)+(16.003), (I-300)+(1.005)+(16.004), (I-300)+(1.005)+(16.005), (I-300)+(1.005)+(16.006), (I-300)+(1.005)+(16.007), (I-300)+(1.005)+(16.008), (I-300)+(1.005)+(17.001), (I-300)+(1.005)+(17.002), (I-300)+(1.005)+(17.003), (I-300)+(1.005)+(17.004), (I-300)+(1.005)+(17.005), (I-300)+(1.005)+(17.006), (I-300)+(1.005)+(17.007), (I-300)+(1.005)+(17.008), (I-300)+(1.005)+(17.009), (I-300)+(1.005)+(17.010), (I-300)+(1.005)+(17.011), (I-300)+(1.005)+(17.012), (I-300)+(1.005)+(18.001), (I-300)+(1.006)+(1.007), (I-300)+(1.006)+(1.008), (I-300)+(1.006)+(1.009), (I-300)+(1.006)+(1.010), (I-300)+(1.006)+(1.011), (I-300)+(1.006)+(1.012), (I-300)+(1.006)+(1.013), (I-300)+(1.006)+(1.014), (I-300)+(1.006)+(1.015), (I-300)+(1.006)+(1.016), (I-300)+(1.006)+(1.017), (I-300)+(1.006)+(1.018), (I-300)+(1.006)+(1.019), (I-300)+(1.006)+(1.020), (I-300)+(1.006)+(1.021), (I-300)+(1.006)+(1.022), (I-300)+(1.006)+(1.023), (I-300)+(1.006)+(1.024), (I-300)+(1.006)+(1.025), (I-300)+(1.006)+(1.026), (I-300)+(1.006)+(1.027), (I-300)+(1.006)+(1.028), (I-300)+(1.006)+(1.029), (I-300)+(1.006)+(1.030), (I-300)+(1.006)+(1.031), (I-300)+(1.006)+(1.032), (I-300)+(1.006)+(1.033), (I-300)+(1.006)+(1.034), (I-300)+(1.006)+(1.035), (I-300)+(1.006)+(1.036), (I-300)+(1.006)+(1.037), (I-300)+(1.006)+(1.038), (I-300)+(1.006)+(1.039), (I-300)+(1.006)+(1.040), (I-300)+(1.006)+(1.041), (I-300)+(1.006)+(1.042), (I-300)+(1.006)+(1.043), (I-300)+(1.006)+(1.044), (I-300)+(1.006)+(1.045), (I-300)+(1.006)+(1.046), (I-300)+(1.006)+(1.047), (I-300)+(1.006)+(1.048), (I-300)+(1.006)+(1.049), (I-300)+(1.006)+(1.050), (I-300)+(1.006)+(1.051), (I-300)+(1.006)+(1.052), (I-300)+(1.006)+(1.053), (I-300)+(1.006)+(1.054), (I-300)+(1.006)+(1.055), (I-300)+(1.006)+(1.056), (I-300)+(1.006)+(1.057), (I-300)+(1.006)+(1.058), (I-300)+(1.006)+(1.059), (I-300)+(1.006)+(1.060), (I-300)+(1.006)+(1.061), (I-300)+(1.006)+(1.062), (I-300)+(1.006)+(1.063), (I-300)+(1.006)+(1.064), (I-300)+(1.006)+(1.065), (I-300)+(1.006)+(1.066), (I-300)+(1.006)+(1.067), (I-300)+(1.006)+(1.068), (I-300)+(1.006)+(1.069), (I-300)+(1.006)+(1.070), (I-300)+(1.006)+(1.071), (I-300)+(1.006)+(1.072), (I-300)+(1.006)+(1.073), (I-300)+(1.006)+(1.074), (I-300)+(1.006)+(1.075), (I-300)+(1.006)+(1.076), (I-300)+(1.006)+(1.077), (I-300)+(1.006)+(1.078), (I-300)+(1.006)+(1.079), (I-300)+(1.006)+(1.080), (I-300)+(1.006)+(1.081), (I-300)+(1.006)+(1.082), (I-300)+(1.006)+(1.083), (I-300)+(1.006)+(1.084), (I-300)+(1.006)+(1.085), (I-300)+(1.006)+(1.086), (I-300)+(1.006)+(1.087), (I-300)+(1.006)+(1.088), (I-300)+(1.006)+(1.089), (I-300)+(1.006)+(1.090), (I-300)+(1.006)+(1.091), (I-300)+(1.006)+(1.092), (I-300)+(1.006)+(2.001), (I-300)+(1.006)+(2.002), (I-300)+(1.006)+(2.003), (I-300)+(1.006)+(2.004), (I-300)+(1.006)+(2.005), (I-300)+(1.006)+(2.006), (I-300)+(1.006)+(2.007), (I-300)+(1.006)+(2.008), (I-300)+(1.006)+(2.009), (I-300)+(1.006)+(2.010), (I-300)+(1.006)+(2.011), (I-300)+(1.006)+(2.012), (I-300)+(1.006)+(2.013), (I-300)+(1.006)+(2.014), (I-300)+(1.006)+(2.015), (I-300)+(1.006)+(2.016), (I-300)+(1.006)+(2.017), (I-300)+(1.006)+(2.018), (I-300)+(1.006)+(2.019), (I-300)+(1.006)+(2.020), (I-300)+(1.006)+(2.021), (I-300)+(1.006)+(2.022), (I-300)+(1.006)+(2.023), (I-300)+(1.006)+(2.024), (I-300)+(1.006)+(2.025), (I-300)+(1.006)+(2.026), (I-300)+(1.006)+(2.027), (I-300)+(1.006)+(2.028), (I-300)+(1.006)+(2.029), (I-300)+(1.006)+(2.030), (I-300)+(1.006)+(2.031), (I-300)+(1.006)+(2.032), (I-300)+(1.006)+(2.033), (I-300)+(1.006)+(2.034), (I-300)+(1.006)+(2.035), (I-300)+(1.006)+(2.036), (I-300)+(1.006)+(2.037), (I-300)+(1.006)+(2.038), (I-300)+(1.006)+(2.039), (I-300)+(1.006)+(2.040), (I-300)+(1.006)+(2.041), (I-300)+(1.006)+(2.042), (I-300)+(1.006)+(2.043), (I-300)+(1.006)+(2.044), (I-300)+(1.006)+(2.045), (I-300)+(1.006)+(2.046), (I-300)+(1.006)+(2.047), (I-300)+(1.006)+(2.048), (I-300)+(1.006)+(2.049), (I-300)+(1.006)+(2.050), (I-300)+(1.006)+(2.051), (I-300)+(1.006)+(2.052), (I-300)+(1.006)+(2.053), (I-300)+(1.006)+(2.054), (I-300)+(1.006)+(2.055), (I-300)+(1.006)+(2.056), (I-300)+(1.006)+(2.057), (I-300)+(1.006)+(2.058), (I-300)+(1.006)+(2.059), (I-300)+(1.006)+(3.001), (I-300)+(1.006)+(3.002), (I-300)+(1.006)+(3.003), (I-300)+(1.006)+(3.004), (I-300)+(1.006)+(3.005), (I-300)+(1.006)+(3.006), (I-300)+(1.006)+(3.007), (I-300)+(1.006)+(3.008), (I-300)+(1.006)+(3.009), (I-300)+(1.006)+(3.010), (I-300)+(1.006)+(3.011), (I-300)+(1.006)+(3.012), (I-300)+(1.006)+(3.013), (I-300)+(1.006)+(3.014), (I-300)+(1.006)+(3.015), (I-300)+(1.006)+(3.016), (I-300)+(1.006)+(3.017), (I-300)+(1.006)+(3.018), (I-300)+(1.006)+(3.019), (I-300)+(1.006)+(3.020), (I-300)+(1.006)+(3.021), (I-300)+(1.006)+(3.022), (I-300)+(1.006)+(3.023), (I-300)+(1.006)+(3.024), (I-300)+(1.006)+(3.025), (I-300)+(1.006)+(3.026), (I-300)+(1.006)+(3.027), (I-300)+(1.006)+(3.028), (I-300)+(1.006)+(3.029), (I-300)+(1.006)+(3.030), (I-300)+(1.006)+(3.031), (I-300)+(1.006)+(5.001), (I-300)+(1.006)+(5.002), (I-300)+(1.006)+(5.003), (I-300)+(1.006)+(5.004), (I-300)+(1.006)+(5.005), (I-300)+(1.006)+(5.006), (I-300)+(1.006)+(5.007), (I-300)+(1.006)+(5.008), (I-300)+(1.006)+(5.009), (I-300)+(1.006)+(5.010), (I-300)+(1.006)+(5.011), (I-300)+(1.006)+(5.012), (I-300)+(1.006)+(5.013), (I-300)+(1.006)+(5.014), (I-300)+(1.006)+(5.015), (I-300)+(1.006)+(5.016), (I-300)+(1.006)+(5.017), (I-300)+(1.006)+(5.018), (I-300)+(1.006)+(5.019), (I-300)+(1.006)+(5.020), (I-300)+(1.006)+(5.021), (I-300)+(1.006)+(5.022), (I-300)+(1.006)+(5.023), (I-300)+(1.006)+(6.001),
(I-300)+(1.006)+(6.002), (I-300)+(1.006)+(6.003),
(I-300)+(1.006)+(6.004), (I-300)+(1.006)+(7.001),
(I-300)+(1.006)+(7.002), (I-300)+(1.006)+(7.003),
(I-300)+(1.006)+(7.004), (I-300)+(1.006)+(7.005),
(I-300)+(1.006)+(7.006), (I-300)+(1.006)+(9.001),
(I-300)+(1.006)+(9.002), (I-300)+(1.006)+(9.003),
(I-300)+(1.006)+(9.004), (I-300)+(1.006)+(9.005),
(I-300)+(1.006)+(9.006), (I-300)+(1.006)+(9.007),
(I-300)+(1.006)+(9.008), (I-300)+(1.006)+(9.009),
(I-300)+(1.006)+(14.001), (I-300)+(1.006)+(14.002),
(I-300)+(1.006)+(15.008), (I-300)+(1.006)+(15.011),
(I-300)+(1.006)+(15.012), (I-300)+(1.006)+(15.016),
(I-300)+(1.006)+(15.025), (I-300)+(1.006)+(15.027),
(I-300)+(1.006)+(15.047), (I-300)+(1.006)+(15.063),
(I-300)+(1.006)+(15.064), (I-300)+(1.006)+(16.001),
(I-300)+(1.006)+(16.002), (I-300)+(1.006)+(16.003),
(I-300)+(1.006)+(16.004), (I-300)+(1.006)+(16.005),
(I-300)+(1.006)+(16.006), (I-300)+(1.006)+(16.007),
(I-300)+(1.006)+(16.008), (I-300)+(1.006)+(17.001),
(I-300)+(1.006)+(17.002), (I-300)+(1.006)+(17.003),
(I-300)+(1.006)+(17.004), (I-300)+(1.006)+(17.005),
(I-300)+(1.006)+(17.006), (I-300)+(1.006)+(17.007),
(I-300)+(1.006)+(17.008), (I-300)+(1.006)+(17.009),
(I-300)+(1.006)+(17.010), (I-300)+(1.006)+(17.011),
(I-300)+(1.006)+(17.012), (I-300)+(1.006)+(18.001),
(I-300)+(1.007)+(1.008), (I-300)+(1.007)+(1.009),
(I-300)+(1.007)+(1.010), (I-300)+(1.007)+(1.011),
(I-300)+(1.007)+(1.012), (I-300)+(1.007)+(1.013),
(I-300)+(1.007)+(1.014), (I-300)+(1.007)+(1.015),
(I-300)+(1.007)+(1.016), (I-300)+(1.007)+(1.017),
(I-300)+(1.007)+(1.018), (I-300)+(1.007)+(1.019),
(I-300)+(1.007)+(1.020), (I-300)+(1.007)+(1.021),
(I-300)+(1.007)+(1.022), (I-300)+(1.007)+(1.023),
(I-300)+(1.007)+(1.024), (I-300)+(1.007)+(1.025),
(I-300)+(1.007)+(1.026), (I-300)+(1.007)+(1.027),
(I-300)+(1.007)+(1.028), (I-300)+(1.007)+(1.029),
(I-300)+(1.007)+(1.030), (I-300)+(1.007)+(1.031),
(I-300)+(1.007)+(1.032), (I-300)+(1.007)+(1.033),
(I-300)+(1.007)+(1.034), (I-300)+(1.007)+(1.035),
(I-300)+(1.007)+(1.036), (I-300)+(1.007)+(1.037),
(I-300)+(1.007)+(1.038), (I-300)+(1.007)+(1.039),
(I-300)+(1.007)+(1.040), (I-300)+(1.007)+(1.041),
(I-300)+(1.007)+(1.042), (I-300)+(1.007)+(1.043),
(I-300)+(1.007)+(1.044), (I-300)+(1.007)+(1.045),
(I-300)+(1.007)+(1.046), (I-300)+(1.007)+(1.047),
(I-300)+(1.007)+(1.048), (I-300)+(1.007)+(1.049),
(I-300)+(1.007)+(1.050), (I-300)+(1.007)+(1.051),
(I-300)+(1.007)+(1.052), (I-300)+(1.007)+(1.053),
(I-300)+(1.007)+(1.054), (I-300)+(1.007)+(1.055),
(I-300)+(1.007)+(1.056), (I-300)+(1.007)+(1.057),
(I-300)+(1.007)+(1.058), (I-300)+(1.007)+(1.059),
(I-300)+(1.007)+(1.060), (I-300)+(1.007)+(1.061),
(I-300)+(1.007)+(1.062), (I-300)+(1.007)+(1.063),
(I-300)+(1.007)+(1.064), (I-300)+(1.007)+(1.065),
(I-300)+(1.007)+(1.066), (I-300)+(1.007)+(1.067),
(I-300)+(1.007)+(1.068), (I-300)+(1.007)+(1.069),
(I-300)+(1.007)+(1.070), (I-300)+(1.007)+(1.071),
(I-300)+(1.007)+(1.072), (I-300)+(1.007)+(1.073),
(I-300)+(1.007)+(1.074), (I-300)+(1.007)+(1.075),
(I-300)+(1.007)+(1.076), (I-300)+(1.007)+(1.077),
(I-300)+(1.007)+(1.078), (I-300)+(1.007)+(1.079),
(I-300)+(1.007)+(1.080), (I-300)+(1.007)+(1.081),
(I-300)+(1.007)+(1.082), (I-300)+(1.007)+(1.083),
(I-300)+(1.007)+(1.084), (I-300)+(1.007)+(1.085),
(I-300)+(1.007)+(1.086), (I-300)+(1.007)+(1.087),
(I-300)+(1.007)+(1.088), (I-300)+(1.007)+(1.089),
(I-300)+(1.007)+(1.090), (I-300)+(1.007)+(1.091),
(I-300)+(1.007)+(1.092), (I-300)+(1.007)+(2.001),
(I-300)+(1.007)+(2.002), (I-300)+(1.007)+(2.003),
(I-300)+(1.007)+(2.004), (I-300)+(1.007)+(2.005),
(I-300)+(1.007)+(2.006), (I-300)+(1.007)+(2.007),
(I-300)+(1.007)+(2.008), (I-300)+(1.007)+(2.009),
(I-300)+(1.007)+(2.010), (I-300)+(1.007)+(2.011),
(I-300)+(1.007)+(2.012), (I-300)+(1.007)+(2.013),
(I-300)+(1.007)+(2.014), (I-300)+(1.007)+(2.015),
(I-300)+(1.007)+(2.016), (I-300)+(1.007)+(2.017),
(I-300)+(1.007)+(2.018), (I-300)+(1.007)+(2.019),
(I-300)+(1.007)+(2.020), (I-300)+(1.007)+(2.021),
(I-300)+(1.007)+(2.022), (I-300)+(1.007)+(2.023),
(I-300)+(1.007)+(2.024), (I-300)+(1.007)+(2.025),
(I-300)+(1.007)+(2.026), (I-300)+(1.007)+(2.027),
(I-300)+(1.007)+(2.028), (I-300)+(1.007)+(2.029),
(I-300)+(1.007)+(2.030), (I-300)+(1.007)+(2.031),
(I-300)+(1.007)+(2.032), (I-300)+(1.007)+(2.033),
(I-300)+(1.007)+(2.034), (I-300)+(1.007)+(2.035),
(I-300)+(1.007)+(2.036), (I-300)+(1.007)+(2.037),
(I-300)+(1.007)+(2.038), (I-300)+(1.007)+(2.039),
(I-300)+(1.007)+(2.040), (I-300)+(1.007)+(2.041),
(I-300)+(1.007)+(2.042), (I-300)+(1.007)+(2.043),
(I-300)+(1.007)+(2.044), (I-300)+(1.007)+(2.045),
(I-300)+(1.007)+(2.046), (I-300)+(1.007)+(2.047),
(I-300)+(1.007)+(2.048), (I-300)+(1.007)+(2.049),
(I-300)+(1.007)+(2.050), (I-300)+(1.007)+(2.051),
(I-300)+(1.007)+(2.052), (I-300)+(1.007)+(2.053),
(I-300)+(1.007)+(2.054), (I-300)+(1.007)+(2.055),
(I-300)+(1.007)+(2.056), (I-300)+(1.007)+(2.057),
(I-300)+(1.007)+(2.058), (I-300)+(1.007)+(2.059),
(I-300)+(1.007)+(3.001), (I-300)+(1.007)+(3.002),
(I-300)+(1.007)+(3.003), (I-300)+(1.007)+(3.004),
(I-300)+(1.007)+(3.005), (I-300)+(1.007)+(3.006),
(I-300)+(1.007)+(3.007), (I-300)+(1.007)+(3.008),
(I-300)+(1.007)+(3.009), (I-300)+(1.007)+(3.010),
(I-300)+(1.007)+(3.011), (I-300)+(1.007)+(3.012),
(I-300)+(1.007)+(3.013), (I-300)+(1.007)+(3.014),
(I-300)+(1.007)+(3.015), (I-300)+(1.007)+(3.016),
(I-300)+(1.007)+(3.017), (I-300)+(1.007)+(3.018),
(I-300)+(1.007)+(3.019), (I-300)+(1.007)+(3.020),
(I-300)+(1.007)+(3.021), (I-300)+(1.007)+(3.022),
(I-300)+(1.007)+(3.023), (I-300)+(1.007)+(3.024),
(I-300)+(1.007)+(3.025), (I-300)+(1.007)+(3.026),
(I-300)+(1.007)+(3.027), (I-300)+(1.007)+(3.028),
(I-300)+(1.007)+(3.029), (I-300)+(1.007)+(3.030),
(I-300)+(1.007)+(3.031), (I-300)+(1.007)+(5.001),
(I-300)+(1.007)+(5.002), (I-300)+(1.007)+(5.003),
(I-300)+(1.007)+(5.004), (I-300)+(1.007)+(5.005),
(I-300)+(1.007)+(5.006), (I-300)+(1.007)+(5.007),
(I-300)+(1.007)+(5.008), (I-300)+(1.007)+(5.009),
(I-300)+(1.007)+(5.010), (I-300)+(1.007)+(5.011),
(I-300)+(1.007)+(5.012), (I-300)+(1.007)+(5.013),
(I-300)+(1.007)+(5.014), (I-300)+(1.007)+(5.015),
(I-300)+(1.007)+(5.016), (I-300)+(1.007)+(5.017),
(I-300)+(1.007)+(5.018), (I-300)+(1.007)+(5.019),
(I-300)+(1.007)+(5.020), (I-300)+(1.007)+(5.021),
(I-300)+(1.007)+(5.022), (I-300)+(1.007)+(5.023),
(I-300)+(1.007)+(6.001), (I-300)+(1.007)+(6.002),
(I-300)+(1.007)+(6.003), (I-300)+(1.007)+(6.004),
(I-300)+(1.007)+(7.001), (I-300)+(1.007)+(7.002),
(I-300)+(1.007)+(7.003), (I-300)+(1.007)+(7.004),
(I-300)+(1.007)+(7.005), (I-300)+(1.007)+(7.006),
(I-300)+(1.007)+(9.001), (I-300)+(1.007)+(9.002),
(I-300)+(1.007)+(9.003), (I-300)+(1.007)+(9.004),
(I-300)+(1.007)+(9.005), (I-300)+(1.007)+(9.006),
(I-300)+(1.007)+(9.007), (I-300)+(1.007)+(9.008), (I-300)+(1.007)+(9.009), (I-300)+(1.007)+(14.001), (I-300)+(1.007)+(14.002), (I-300)+(1.007)+(15.008), (I-300)+(1.007)+(15.011), (I-300)+(1.007)+(15.012), (I-300)+(1.007)+(15.016), (I-300)+(1.007)+(15.025), (I-300)+(1.007)+(15.027), (I-300)+(1.007)+(15.047), (I-300)+(1.007)+(15.063), (I-300)+(1.007)+(15.064), (I-300)+(1.007)+(16.001), (I-300)+(1.007)+(16.002), (I-300)+(1.007)+(16.003), (I-300)+(1.007)+(16.004), (I-300)+(1.007)+(16.005), (I-300)+(1.007)+(16.006), (I-300)+(1.007)+(16.007), (I-300)+(1.007)+(16.008), (I-300)+(1.007)+(17.001), (I-300)+(1.007)+(17.002), (I-300)+(1.007)+(17.003), (I-300)+(1.007)+(17.004), (I-300)+(1.007)+(17.005), (I-300)+(1.007)+(17.006), (I-300)+(1.007)+(17.007), (I-300)+(1.007)+(17.008), (I-300)+(1.007)+(17.009), (I-300)+(1.007)+(17.010), (I-300)+(1.007)+(17.011), (I-300)+(1.007)+(17.012), (I-300)+(1.007)+(18.001), (I-300)+(1.008)+(1.009), (I-300)+(1.008)+(1.010), (I-300)+(1.008)+(1.011), (I-300)+(1.008)+(1.012), (I-300)+(1.008)+(1.013), (I-300)+(1.008)+(1.014), (I-300)+(1.008)+(1.015), (I-300)+(1.008)+(1.016), (I-300)+(1.008)+(1.017), (I-300)+(1.008)+(1.018), (I-300)+(1.008)+(1.019), (I-300)+(1.008)+(1.020), (I-300)+(1.008)+(1.021), (I-300)+(1.008)+(1.022), (I-300)+(1.008)+(1.023), (I-300)+(1.008)+(1.024), (I-300)+(1.008)+(1.025), (I-300)+(1.008)+(1.026), (I-300)+(1.008)+(1.027), (I-300)+(1.008)+(1.028), (I-300)+(1.008)+(1.029), (I-300)+(1.008)+(1.030), (I-300)+(1.008)+(1.031), (I-300)+(1.008)+(1.032), (I-300)+(1.008)+(1.033), (I-300)+(1.008)+(1.034), (I-300)+(1.008)+(1.035), (I-300)+(1.008)+(1.036), (I-300)+(1.008)+(1.037), (I-300)+(1.008)+(1.038), (I-300)+(1.008)+(1.039), (I-300)+(1.008)+(1.040), (I-300)+(1.008)+(1.041), (I-300)+(1.008)+(1.042), (I-300)+(1.008)+(1.043), (I-300)+(1.008)+(1.044), (I-300)+(1.008)+(1.045), (I-300)+(1.008)+(1.046), (I-300)+(1.008)+(1.047), (I-300)+(1.008)+(1.048), (I-300)+(1.008)+(1.049), (I-300)+(1.008)+(1.050), (I-300)+(1.008)+(1.051), (I-300)+(1.008)+(1.052), (I-300)+(1.008)+(1.053), (I-300)+(1.008)+(1.054), (I-300)+(1.008)+(1.055), (I-300)+(1.008)+(1.056), (I-300)+(1.008)+(1.057), (I-300)+(1.008)+(1.058), (I-300)+(1.008)+(1.059), (I-300)+(1.008)+(1.060), (I-300)+(1.008)+(1.061), (I-300)+(1.008)+(1.062), (I-300)+(1.008)+(1.063), (I-300)+(1.008)+(1.064), (I-300)+(1.008)+(1.065), (I-300)+(1.008)+(1.066), (I-300)+(1.008)+(1.067), (I-300)+(1.008)+(1.068), (I-300)+(1.008)+(1.069), (I-300)+(1.008)+(1.070), (I-300)+(1.008)+(1.071), (I-300)+(1.008)+(1.072), (I-300)+(1.008)+(1.073), (I-300)+(1.008)+(1.074), (I-300)+(1.008)+(1.075), (I-300)+(1.008)+(1.076), (I-300)+(1.008)+(1.077), (I-300)+(1.008)+(1.078), (I-300)+(1.008)+(1.079), (I-300)+(1.008)+(1.080), (I-300)+(1.008)+(1.081), (I-300)+(1.008)+(1.082), (I-300)+(1.008)+(1.083), (I-300)+(1.008)+(1.084), (I-300)+(1.008)+(1.085), (I-300)+(1.008)+(1.086), (I-300)+(1.008)+(1.087), (I-300)+(1.008)+(1.088), (I-300)+(1.008)+(1.089), (I-300)+(1.008)+(1.090), (I-300)+(1.008)+(1.091), (I-300)+(1.008)+(1.092), (I-300)+(1.008)+(2.001), (I-300)+(1.008)+(2.002), (I-300)+(1.008)+(2.003), (I-300)+(1.008)+(2.004), (I-300)+(1.008)+(2.005), (I-300)+(1.008)+(2.006), (I-300)+(1.008)+(2.007), (I-300)+(1.008)+(2.008), (I-300)+(1.008)+(2.009), (I-300)+(1.008)+(2.010), (I-300)+(1.008)+(2.011), (I-300)+(1.008)+(2.012), (I-300)+(1.008)+(2.013), (I-300)+(1.008)+(2.014), (I-300)+(1.008)+(2.015), (I-300)+(1.008)+(2.016), (I-300)+(1.008)+(2.017), (I-300)+(1.008)+(2.018), (I-300)+(1.008)+(2.019), (I-300)+(1.008)+(2.020), (I-300)+(1.008)+(2.021), (I-300)+(1.008)+(2.022), (I-300)+(1.008)+(2.023), (I-300)+(1.008)+(2.024), (I-300)+(1.008)+(2.025), (I-300)+(1.008)+(2.026), (I-300)+(1.008)+(2.027), (I-300)+(1.008)+(2.028), (I-300)+(1.008)+(2.029), (I-300)+(1.008)+(2.030), (I-300)+(1.008)+(2.031), (I-300)+(1.008)+(2.032), (I-300)+(1.008)+(2.033), (I-300)+(1.008)+(2.034), (I-300)+(1.008)+(2.035), (I-300)+(1.008)+(2.036), (I-300)+(1.008)+(2.037), (I-300)+(1.008)+(2.038), (I-300)+(1.008)+(2.039), (I-300)+(1.008)+(2.040), (I-300)+(1.008)+(2.041), (I-300)+(1.008)+(2.042), (I-300)+(1.008)+(2.043), (I-300)+(1.008)+(2.044), (I-300)+(1.008)+(2.045), (I-300)+(1.008)+(2.046), (I-300)+(1.008)+(2.047), (I-300)+(1.008)+(2.048), (I-300)+(1.008)+(2.049), (I-300)+(1.008)+(2.050), (I-300)+(1.008)+(2.051), (I-300)+(1.008)+(2.052), (I-300)+(1.008)+(2.053), (I-300)+(1.008)+(2.054), (I-300)+(1.008)+(2.055), (I-300)+(1.008)+(2.056), (I-300)+(1.008)+(2.057), (I-300)+(1.008)+(2.058), (I-300)+(1.008)+(2.059), (I-300)+(1.008)+(3.001), (I-300)+(1.008)+(3.002), (I-300)+(1.008)+(3.003), (I-300)+(1.008)+(3.004), (I-300)+(1.008)+(3.005), (I-300)+(1.008)+(3.006), (I-300)+(1.008)+(3.007), (I-300)+(1.008)+(3.008), (I-300)+(1.008)+(3.009), (I-300)+(1.008)+(3.010), (I-300)+(1.008)+(3.011), (I-300)+(1.008)+(3.012), (I-300)+(1.008)+(3.013), (I-300)+(1.008)+(3.014), (I-300)+(1.008)+(3.015), (I-300)+(1.008)+(3.016), (I-300)+(1.008)+(3.017), (I-300)+(1.008)+(3.018), (I-300)+(1.008)+(3.019), (I-300)+(1.008)+(3.020), (I-300)+(1.008)+(3.021), (I-300)+(1.008)+(3.022), (I-300)+(1.008)+(3.023), (I-300)+(1.008)+(3.024), (I-300)+(1.008)+(3.025), (I-300)+(1.008)+(3.026), (I-300)+(1.008)+(3.027), (I-300)+(1.008)+(3.028), (I-300)+(1.008)+(3.029), (I-300)+(1.008)+(3.030), (I-300)+(1.008)+(3.031), (I-300)+(1.008)+(5.001), (I-300)+(1.008)+(5.002), (I-300)+(1.008)+(5.003), (I-300)+(1.008)+(5.004), (I-300)+(1.008)+(5.005), (I-300)+(1.008)+(5.006), (I-300)+(1.008)+(5.007), (I-300)+(1.008)+(5.008), (I-300)+(1.008)+(5.009), (I-300)+(1.008)+(5.010), (I-300)+(1.008)+(5.011), (I-300)+(1.008)+(5.012), (I-300)+(1.008)+(5.013), (I-300)+(1.008)+(5.014), (I-300)+(1.008)+(5.015), (I-300)+(1.008)+(5.016), (I-300)+(1.008)+(5.017), (I-300)+(1.008)+(5.018), (I-300)+(1.008)+(5.019), (I-300)+(1.008)+(5.020), (I-300)+(1.008)+(5.021), (I-300)+(1.008)+(5.022), (I-300)+(1.008)+(5.023), (I-300)+(1.008)+(6.001), (I-300)+(1.008)+(6.002), (I-300)+(1.008)+(6.003), (I-300)+(1.008)+(6.004), (I-300)+(1.008)+(7.001), (I-300)+(1.008)+(7.002), (I-300)+(1.008)+(7.003), (I-300)+(1.008)+(7.004), (I-300)+(1.008)+(7.005), (I-300)+(1.008)+(7.006), (I-300)+(1.008)+(9.001), (I-300)+(1.008)+(9.002), (I-300)+(1.008)+(9.003), (I-300)+(1.008)+(9.004), (I-300)+(1.008)+(9.005), (I-300)+(1.008)+(9.006), (I-300)+(1.008)+(9.007), (I-300)+(1.008)+(9.008), (I-300)+(1.008)+(9.009), (I-300)+(1.008)+(14.001), (I-300)+(1.008)+(14.002), (I-300)+(1.008)+(15.008), (I-300)+(1.008)+(15.011), (I-300)+(1.008)+(15.012), (I-300)+(1.008)+(15.016), (I-300)+(1.008)+(15.025), (I-300)+(1.008)+(15.027), (I-300)+(1.008)+(15.047), (I-300)+(1.008)+(15.063), (I-300)+(1.008)+(15.064), (I-300)+(1.008)+(16.001), (I-300)+(1.008)+(16.002), (I-300)+(1.008)+(16.003), (I-300)+(1.008)+(16.004), (I-300)+(1.008)+(16.005), (I-300)+(1.008)+(16.006), (I-300)+(1.008)+(16.007), (I-300)+(1.008)+(16.008), (I-300)+(1.008)+(17.001), (I-300)+(1.008)+(17.002), (I-300)+(1.008)+(17.003), (I-300)+(1.008)+(17.004), (I-300)+(1.008)+(17.005), (I-300)+(1.008)+(17.006), (I-300)+(1.008)+(17.007), (I-300)+(1.008)+(17.008), (I-300)+(1.008)+(17.009), (I-300)+(1.008)+(17.010), (I-300)+(1.008)+(17.011), (I-300)+(1.008)+(17.012), (I-300)+(1.008)+(18.001), (I-300)+(1.009)+(1.010), (I-300)+(1.009)+(1.011), (I-300)+(1.009)+(1.012), (I-300)+(1.009)+(1.013), (I-300)+(1.009)+(1.014), (I-300)+(1.009)+(1.015), (I-300)+(1.009)+(1.016), (I-300)+(1.009)+(1.017), (I-300)+(1.009)+(1.018), (I-300)+(1.009)+(1.019), (I-300)+(1.009)+(1.020), (I-300)+(1.009)+(1.021), (I-300)+(1.009)+(1.022), (I-300)+(1.009)+(1.023), (I-300)+(1.009)+(1.024), (I-300)+(1.009)+(1.025), (I-300)+(1.009)+(1.026), (I-300)+(1.009)+(1.027), (I-300)+(1.009)+(1.028), (I-300)+(1.009)+(1.029), (I-300)+(1.009)+(1.030), (I-300)+(1.009)+(1.031), (I-300)+(1.009)+(1.032), (I-300)+(1.009)+(1.033), (I-300)+(1.009)+(1.034), (I-300)+(1.009)+(1.035), (I-300)+(1.009)+(1.036), (I-300)+(1.009)+(1.037), (I-300)+(1.009)+(1.038), (I-300)+(1.009)+(1.039), (I-300)+(1.009)+(1.040), (I-300)+(1.009)+(1.041), (I-300)+(1.009)+(1.042), (I-300)+(1.009)+(1.043), (I-300)+(1.009)+(1.044), (I-300)+(1.009)+(1.045), (I-300)+(1.009)+(1.046), (I-300)+(1.009)+(1.047), (I-300)+(1.009)+(1.048), (I-300)+(1.009)+(1.049), (I-300)+(1.009)+(1.050), (I-300)+(1.009)+(1.051), (I-300)+(1.009)+(1.052), (I-300)+(1.009)+(1.053), (I-300)+(1.009)+(1.054), (I-300)+(1.009)+(1.055), (I-300)+(1.009)+(1.056), (I-300)+(1.009)+(1.057), (I-300)+(1.009)+(1.058), (I-300)+(1.009)+(1.059), (I-300)+(1.009)+(1.060), (I-300)+(1.009)+(1.061), (I-300)+(1.009)+(1.062), (I-300)+(1.009)+(1.063), (I-300)+(1.009)+(1.064), (I-300)+(1.009)+(1.065), (I-300)+(1.009)+(1.066), (I-300)+(1.009)+(1.067), (I-300)+(1.009)+(1.068), (I-300)+(1.009)+(1.069), (I-300)+(1.009)+(1.070), (I-300)+(1.009)+(1.071), (I-300)+(1.009)+(1.072), (I-300)+(1.009)+(1.073), (I-300)+(1.009)+(1.074), (I-300)+(1.009)+(1.075), (I-300)+(1.009)+(1.076), (I-300)+(1.009)+(1.077), (I-300)+(1.009)+(1.078), (I-300)+(1.009)+(1.079), (I-300)+(1.009)+(1.080), (I-300)+(1.009)+(1.081), (I-300)+(1.009)+(1.082), (I-300)+(1.009)+(1.083), (I-300)+(1.009)+(1.084), (I-300)+(1.009)+(1.085), (I-300)+(1.009)+(1.086), (I-300)+(1.009)+(1.087), (I-300)+(1.009)+(1.088), (I-300)+(1.009)+(1.089), (I-300)+(1.009)+(1.090), (I-300)+(1.009)+(1.091), (I-300)+(1.009)+(1.092), (I-300)+(1.009)+(2.001), (I-300)+(1.009)+(2.002), (I-300)+(1.009)+(2.003), (I-300)+(1.009)+(2.004), (I-300)+(1.009)+(2.005), (I-300)+(1.009)+(2.006), (I-300)+(1.009)+(2.007), (I-300)+(1.009)+(2.008), (I-300)+(1.009)+(2.009), (I-300)+(1.009)+(2.010), (I-300)+(1.009)+(2.011), (I-300)+(1.009)+(2.012), (I-300)+(1.009)+(2.013), (I-300)+(1.009)+(2.014), (I-300)+(1.009)+(2.015), (I-300)+(1.009)+(2.016), (I-300)+(1.009)+(2.017), (I-300)+(1.009)+(2.018), (I-300)+(1.009)+(2.019), (I-300)+(1.009)+(2.020), (I-300)+(1.009)+(2.021), (I-300)+(1.009)+(2.022), (I-300)+(1.009)+(2.023), (I-300)+(1.009)+(2.024), (I-300)+(1.009)+(2.025), (I-300)+(1.009)+(2.026), (I-300)+(1.009)+(2.027), (I-300)+(1.009)+(2.028), (I-300)+(1.009)+(2.029), (I-300)+(1.009)+(2.030), (I-300)+(1.009)+(2.031), (I-300)+(1.009)+(2.032), (I-300)+(1.009)+(2.033), (I-300)+(1.009)+(2.034), (I-300)+(1.009)+(2.035), (I-300)+(1.009)+(2.036), (I-300)+(1.009)+(2.037), (I-300)+(1.009)+(2.038), (I-300)+(1.009)+(2.039), (I-300)+(1.009)+(2.040), (I-300)+(1.009)+(2.041), (I-300)+(1.009)+(2.042), (I-300)+(1.009)+(2.043), (I-300)+(1.009)+(2.044), (I-300)+(1.009)+(2.045), (I-300)+(1.009)+(2.046), (I-300)+(1.009)+(2.047), (I-300)+(1.009)+(2.048), (I-300)+(1.009)+(2.049), (I-300)+(1.009)+(2.050), (I-300)+(1.009)+(2.051), (I-300)+(1.009)+(2.052), (I-300)+(1.009)+(2.053), (I-300)+(1.009)+(2.054), (I-300)+(1.009)+(2.055), (I-300)+(1.009)+(2.056), (I-300)+(1.009)+(2.057), (I-300)+(1.009)+(2.058), (I-300)+(1.009)+(2.059), (I-300)+(1.009)+(3.001), (I-300)+(1.009)+(3.002), (I-300)+(1.009)+(3.003), (I-300)+(1.009)+(3.004), (I-300)+(1.009)+(3.005), (I-300)+(1.009)+(3.006), (I-300)+(1.009)+(3.007), (I-300)+(1.009)+(3.008), (I-300)+(1.009)+(3.009), (I-300)+(1.009)+(3.010), (I-300)+(1.009)+(3.011), (I-300)+(1.009)+(3.012), (I-300)+(1.009)+(3.013), (I-300)+(1.009)+(3.014), (I-300)+(1.009)+(3.015), (I-300)+(1.009)+(3.016), (I-300)+(1.009)+(3.017), (I-300)+(1.009)+(3.018), (I-300)+(1.009)+(3.019), (I-300)+(1.009)+(3.020), (I-300)+(1.009)+(3.021), (I-300)+(1.009)+(3.022), (I-300)+(1.009)+(3.023), (I-300)+(1.009)+(3.024), (I-300)+(1.009)+(3.025), (I-300)+(1.009)+(3.026), (I-300)+(1.009)+(3.027), (I-300)+(1.009)+(3.028), (I-300)+(1.009)+(3.029), (I-300)+(1.009)+(3.030), (I-300)+(1.009)+(3.031), (I-300)+(1.009)+(5.001), (I-300)+(1.009)+(5.002), (I-300)+(1.009)+(5.003), (I-300)+(1.009)+(5.004), (I-300)+(1.009)+(5.005), (I-300)+(1.009)+(5.006), (I-300)+(1.009)+(5.007), (I-300)+(1.009)+(5.008), (I-300)+(1.009)+(5.009), (I-300)+(1.009)+(5.010), (I-300)+(1.009)+(5.011), (I-300)+(1.009)+(5.012), (I-300)+(1.009)+(5.013), (I-300)+(1.009)+(5.014), (I-300)+(1.009)+(5.015), (I-300)+(1.009)+(5.016), (I-300)+(1.009)+(5.017), (I-300)+(1.009)+(5.018), (I-300)+(1.009)+(5.019), (I-300)+(1.009)+(5.020), (I-300)+(1.009)+(5.021), (I-300)+(1.009)+(5.022), (I-300)+(1.009)+(5.023), (I-300)+(1.009)+(6.001), (I-300)+(1.009)+(6.002), (I-300)+(1.009)+(6.003), (I-300)+(1.009)+(6.004), (I-300)+(1.009)+(7.001), (I-300)+(1.009)+(7.002), (I-300)+(1.009)+(7.003), (I-300)+(1.009)+(7.004), (I-300)+(1.009)+(7.005), (I-300)+(1.009)+(7.006), (I-300)+(1.009)+(9.001), (I-300)+(1.009)+(9.002), (I-300)+(1.009)+(9.003), (I-300)+(1.009)+(9.004), (I-300)+(1.009)+(9.005), (I-300)+(1.009)+(9.006), (I-300)+(1.009)+(9.007), (I-300)+(1.009)+(9.008), (I-300)+(1.009)+(9.009), (I-300)+(1.009)+(14.001), (I-300)+(1.009)+(14.002), (I-300)+(1.009)+(15.008), (I-300)+(1.009)+(15.011), (I-300)+(1.009)+(15.012), (I-300)+(1.009)+(15.016), (I-300)+(1.009)+(15.025), (I-300)+(1.009)+(15.027), (I-300)+(1.009)+(15.047), (I-300)+(1.009)+(15.063), (I-300)+(1.009)+(15.064), (I-300)+(1.009)+(16.001), (I-300)+(1.009)+(16.002), (I-300)+(1.009)+(16.003), (I-300)+(1.009)+(16.004), (I-300)+(1.009)+(16.005), (I-300)+(1.009)+(16.006), (I-300)+(1.009)+(16.007), (I-300)+(1.009)+(16.008), (I-300)+(1.009)+(17.001), (I-300)+(1.009)+(17.002), (I-300)+(1.009)+(17.003), (I-300)+(1.009)+(17.004), (I-300)+(1.009)+(17.005), (I-300)+(1.009)+(17.006), (I-300)+(1.009)+(17.007), (I-300)+(1.009)+(17.008), (I-300)+(1.009)+(17.009), (I-300)+(1.009)+(17.010), (I-300)+(1.009)+(17.011), (I-300)+(1.009)+(17.012), (I-300)+(1.009)+(18.001), (I-300)+(1.010)+(1.011), (I-300)+(1.010)+(1.012), (I-300)+(1.010)+(1.013), (I-300)+(1.010)+(1.014), (I-300)+(1.010)+(1.015), (I-300)+(1.010)+(1.016), (I-300)+(1.010)+(1.017), (I-300)+(1.010)+(1.018), (I-300)+(1.010)+(1.019), (I-300)+(1.010)+(1.020), (I-300)+(1.010)+(1.021), (I-300)+(1.010)+(1.022), (I-300)+(1.010)+(1.023), (I-300)+(1.010)+(1.024), (I-300)+(1.010)+(1.025), (I-300)+(1.010)+(1.026), (I-300)+(1.010)+(1.027), (I-300)+(1.010)+(1.028), (I-300)+(1.010)+(1.029), (I-300)+(1.010)+(1.030), (I-300)+(1.010)+(1.031), (I-300)+(1.010)+(1.032), (I-300)+(1.010)+(1.033), (I-300)+(1.010)+(1.034), (I-300)+(1.010)+(1.035), (I-300)+(1.010)+(1.036), (I-300)+(1.010)+(1.037), (I-300)+(1.010)+(1.038), (I-300)+(1.010)+(1.039), (I-300)+(1.010)+(1.040), (I-300)+(1.010)+(1.041), (I-300)+(1.010)+(1.042), (I-300)+(1.010)+(1.043), (I-300)+(1.010)+(1.044), (I-300)+(1.010)+(1.045), (I-300)+(1.010)+(1.046), (I-300)+(1.010)+(1.047), (I-300)+(1.010)+(1.048), (I-300)+(1.010)+(1.049), (I-300)+(1.010)+(1.050), (I-300)+(1.010)+(1.051), (I-300)+(1.010)+(1.052), (I-300)+(1.010)+(1.053), (I-300)+(1.010)+(1.054), (I-300)+(1.010)+(1.055), (I-300)+(1.010)+(1.056), (I-300)+(1.010)+(1.057), (I-300)+(1.010)+(1.058), (I-300)+(1.010)+(1.059), (I-300)+(1.010)+(1.060), (I-300)+(1.010)+(1.061), (I-300)+(1.010)+(1.062), (I-300)+(1.010)+(1.063), (I-300)+(1.010)+(1.064), (I-300)+(1.010)+(1.065), (I-300)+(1.010)+(1.066), (I-300)+(1.010)+(1.067), (I-300)+(1.010)+(1.068), (I-300)+(1.010)+(1.069), (I-300)+(1.010)+(1.070), (I-300)+(1.010)+(1.071), (I-300)+(1.010)+(1.072), (I-300)+(1.010)+(1.073), (I-300)+(1.010)+(1.074), (I-300)+(1.010)+(1.075), (I-300)+(1.010)+(1.076), (I-300)+(1.010)+(1.077), (I-300)+(1.010)+(1.078), (I-300)+(1.010)+(1.079), (I-300)+(1.010)+(1.080), (I-300)+(1.010)+(1.081), (I-300)+(1.010)+(1.082), (I-300)+(1.010)+(1.083), (I-300)+(1.010)+(1.084), (I-300)+(1.010)+(1.085), (I-300)+(1.010)+(1.086), (I-300)+(1.010)+(1.087), (I-300)+(1.010)+(1.088), (I-300)+(1.010)+(1.089), (I-300)+(1.010)+(1.090), (I-300)+(1.010)+(1.091), (I-300)+(1.010)+(1.092), (I-300)+(1.010)+(2.001), (I-300)+(1.010)+(2.002), (I-300)+(1.010)+(2.003), (I-300)+(1.010)+(2.004), (I-300)+(1.010)+(2.005), (I-300)+(1.010)+(2.006), (I-300)+(1.010)+(2.007), (I-300)+(1.010)+(2.008), (I-300)+(1.010)+(2.009), (I-300)+(1.010)+(2.010), (I-300)+(1.010)+(2.011), (I-300)+(1.010)+(2.012), (I-300)+(1.010)+(2.013), (I-300)+(1.010)+(2.014), (I-300)+(1.010)+(2.015), (I-300)+(1.010)+(2.016), (I-300)+(1.010)+(2.017), (I-300)+(1.010)+(2.018), (I-300)+(1.010)+(2.019), (I-300)+(1.010)+(2.020), (I-300)+(1.010)+(2.021), (I-300)+(1.010)+(2.022), (I-300)+(1.010)+(2.023), (I-300)+(1.010)+(2.024), (I-300)+(1.010)+(2.025), (I-300)+(1.010)+(2.026), (I-300)+(1.010)+(2.027), (I-300)+(1.010)+(2.028), (I-300)+(1.010)+(2.029), (I-300)+(1.010)+(2.030), (I-300)+(1.010)+(2.031), (I-300)+(1.010)+(2.032), (I-300)+(1.010)+(2.033), (I-300)+(1.010)+(2.034), (I-300)+(1.010)+(2.035), (I-300)+(1.010)+(2.036), (I-300)+(1.010)+(2.037), (I-300)+(1.010)+(2.038), (I-300)+(1.010)+(2.039), (I-300)+(1.010)+(2.040), (I-300)+(1.010)+(2.041), (I-300)+(1.010)+(2.042), (I-300)+(1.010)+(2.043), (I-300)+(1.010)+(2.044), (I-300)+(1.010)+(2.045), (I-300)+(1.010)+(2.046), (I-300)+(1.010)+(2.047), (I-300)+(1.010)+(2.048), (I-300)+(1.010)+(2.049), (I-300)+(1.010)+(2.050), (I-300)+(1.010)+(2.051), (I-300)+(1.010)+(2.052), (I-300)+(1.010)+(2.053), (I-300)+(1.010)+(2.054), (I-300)+(1.010)+(2.055), (I-300)+(1.010)+(2.056), (I-300)+(1.010)+(2.057), (I-300)+(1.010)+(2.058), (I-300)+(1.010)+(2.059), (I-300)+(1.010)+(3.001), (I-300)+(1.010)+(3.002), (I-300)+(1.010)+(3.003), (I-300)+(1.010)+(3.004), (I-300)+(1.010)+(3.005), (I-300)+(1.010)+(3.006), (I-300)+(1.010)+(3.007), (I-300)+(1.010)+(3.008), (I-300)+(1.010)+(3.009), (I-300)+(1.010)+(3.010), (I-300)+(1.010)+(3.011), (I-300)+(1.010)+(3.012), (I-300)+(1.010)+(3.013), (I-300)+(1.010)+(3.014), (I-300)+(1.010)+(3.015), (I-300)+(1.010)+(3.016), (I-300)+(1.010)+(3.017), (I-300)+(1.010)+(3.018), (I-300)+(1.010)+(3.019), (I-300)+(1.010)+(3.020), (I-300)+(1.010)+(3.021), (I-300)+(1.010)+(3.022), (I-300)+(1.010)+(3.023), (I-300)+(1.010)+(3.024), (I-300)+(1.010)+(3.025), (I-300)+(1.010)+(3.026), (I-300)+(1.010)+(3.027), (I-300)+(1.010)+(3.028), (I-300)+(1.010)+(3.029), (I-300)+(1.010)+(3.030), (I-300)+(1.010)+(3.031), (I-300)+(1.010)+(5.001), (I-300)+(1.010)+(5.002), (I-300)+(1.010)+(5.003), (I-300)+(1.010)+(5.004), (I-300)+(1.010)+(5.005), (I-300)+(1.010)+(5.006), (I-300)+(1.010)+(5.007), (I-300)+(1.010)+(5.008), (I-300)+(1.010)+(5.009), (I-300)+(1.010)+(5.010), (I-300)+(1.010)+(5.011), (I-300)+(1.010)+(5.012), (I-300)+(1.010)+(5.013), (I-300)+(1.010)+(5.014), (I-300)+(1.010)+(5.015), (I-300)+(1.010)+(5.016), (I-300)+(1.010)+(5.017), (I-300)+(1.010)+(5.018), (I-300)+(1.010)+(5.019), (I-300)+(1.010)+(5.020), (I-300)+(1.010)+(5.021), (I-300)+(1.010)+(5.022), (I-300)+(1.010)+(5.023), (I-300)+(1.010)+(6.001), (I-300)+(1.010)+(6.002), (I-300)+(1.010)+(6.003), (I-300)+(1.010)+(6.004), (I-300)+(1.010)+(7.001), (I-300)+(1.010)+(7.002), (I-300)+(1.010)+(7.003), (I-300)+(1.010)+(7.004), (I-300)+(1.010)+(7.005), (I-300)+(1.010)+(7.006), (I-300)+(1.010)+(9.001), (I-300)+(1.010)+(9.002), (I-300)+(1.010)+(9.003), (I-300)+(1.010)+(9.004), (I-300)+(1.010)+(9.005), (I-300)+(1.010)+(9.006), (I-300)+(1.010)+(9.007), (I-300)+(1.010)+(9.008), (I-300)+(1.010)+(9.009), (I-300)+(1.010)+(14.001), (I-300)+(1.010)+(14.002), (I-300)+(1.010)+(15.008), (I-300)+(1.010)+(15.011), (I-300)+(1.010)+(15.012), (I-300)+(1.010)+(15.016), (I-300)+(1.010)+(15.025), (I-300)+(1.010)+(15.027), (I-300)+(1.010)+(15.047), (I-300)+(1.010)+(15.063), (I-300)+(1.010)+(15.064), (I-300)+(1.010)+(16.001), (I-300)+(1.010)+(16.002), (I-300)+(1.010)+(16.003), (I-300)+(1.010)+(16.004), (I-300)+(1.010)+(16.005), (I-300)+(1.010)+(16.006), (I-300)+(1.010)+(16.007), (I-300)+(1.010)+(16.008), (I-300)+(1.010)+(17.001), (I-300)+(1.010)+(17.002), (I-300)+(1.010)+(17.003), (I-300)+(1.010)+(17.004), (I-300)+(1.010)+(17.005), (I-300)+(1.010)+(17.006), (I-300)+(1.010)+(17.007), (I-300)+(1.010)+(17.008), (I-300)+(1.010)+(17.009), (I-300)+(1.010)+(17.010), (I-300)+(1.010)+(17.011), (I-300)+(1.010)+(17.012), (I-300)+(1.010)+(18.001), (I-300)+(1.011)+(1.012), (I-300)+(1.011)+(1.013), (I-300)+(1.011)+(1.014), (I-300)+(1.011)+(1.015), (I-300)+(1.011)+(1.016), (I-300)+(1.011)+(1.017), (I-300)+(1.011)+(1.018), (I-300)+(1.011)+(1.019), (I-300)+(1.011)+(1.020), (I-300)+(1.011)+(1.021), (I-300)+(1.011)+(1.022), (I-300)+(1.011)+(1.023), (I-300)+(1.011)+(1.024), (I-300)+(1.011)+(1.025), (I-300)+(1.011)+(1.026), (I-300)+(1.011)+(1.027), (I-300)+(1.011)+(1.028), (I-300)+(1.011)+(1.029), (I-300)+(1.011)+(1.030), (I-300)+(1.011)+(1.031), (I-300)+(1.011)+(1.032), (I-300)+(1.011)+(1.033), (I-300)+(1.011)+(1.034), (I-300)+(1.011)+(1.035), (I-300)+(1.011)+(1.036), (I-300)+(1.011)+(1.037), (I-300)+(1.011)+(1.038), (I-300)+(1.011)+(1.039), (I-300)+(1.011)+(1.040), (I-300)+(1.011)+(1.041), (I-300)+(1.011)+(1.042), (I-300)+(1.011)+(1.043), (I-300)+(1.011)+(1.044), (I-300)+(1.011)+(1.045), (I-300)+(1.011)+(1.046), (I-300)+(1.011)+(1.047), (I-300)+(1.011)+(1.048), (I-300)+(1.011)+(1.049), (I-300)+(1.011)+(1.050), (I-300)+(1.011)+(1.051), (I-300)+(1.011)+(1.052), (I-300)+(1.011)+(1.053), (I-300)+(1.011)+(1.054), (I-300)+(1.011)+(1.055), (I-300)+(1.011)+(1.056), (I-300)+(1.011)+(1.057), (I-300)+(1.011)+(1.058), (I-300)+(1.011)+(1.059), (I-300)+(1.011)+(1.060), (I-300)+(1.011)+(1.061), (I-300)+(1.011)+(1.062), (I-300)+(1.011)+(1.063), (I-300)+(1.011)+(1.064), (I-300)+(1.011)+(1.065), (I-300)+(1.011)+(1.066), (I-300)+(1.011)+(1.067), (I-300)+(1.011)+(1.068), (I-300)+(1.011)+(1.069), (I-300)+(1.011)+(1.070), (I-300)+(1.011)+(1.071), (I-300)+(1.011)+(1.072), (I-300)+(1.011)+(1.073), (I-300)+(1.011)+(1.074), (I-300)+(1.011)+(1.075), (I-300)+(1.011)+(1.076), (I-300)+(1.011)+(1.077), (I-300)+(1.011)+(1.078), (I-300)+(1.011)+(1.079), (I-300)+(1.011)+(1.080), (I-300)+(1.011)+(1.081), (I-300)+(1.011)+(1.082), (I-300)+(1.011)+(1.083), (I-300)+(1.011)+(1.084), (I-300)+(1.011)+(1.085), (I-300)+(1.011)+(1.086), (I-300)+(1.011)+(1.087), (I-300)+(1.011)+(1.088), (I-300)+(1.011)+(1.089), (I-300)+(1.011)+(1.090), (I-300)+(1.011)+(1.091), (I-300)+(1.011)+(1.092), (I-300)+(1.011)+(2.001), (I-300)+(1.011)+(2.002), (I-300)+(1.011)+(2.003), (I-300)+(1.011)+(2.004), (I-300)+(1.011)+(2.005), (I-300)+(1.011)+(2.006), (I-300)+(1.011)+(2.007), (I-300)+(1.011)+(2.008), (I-300)+(1.011)+(2.009), (I-300)+(1.011)+(2.010), (I-300)+(1.011)+(2.011), (I-300)+(1.011)+(2.012), (I-300)+(1.011)+(2.013), (I-300)+(1.011)+(2.014), (I-300)+(1.011)+(2.015), (I-300)+(1.011)+(2.016), (I-300)+(1.011)+(2.017), (I-300)+(1.011)+(2.018), (I-300)+(1.011)+(2.019), (I-300)+(1.011)+(2.020), (I-300)+(1.011)+(2.021), (I-300)+(1.011)+(2.022), (I-300)+(1.011)+(2.023), (I-300)+(1.011)+(2.024), (I-300)+(1.011)+(2.025), (I-300)+(1.011)+(2.026), (I-300)+(1.011)+(2.027), (I-300)+(1.011)+(2.028), (I-300)+(1.011)+(2.029), (I-300)+(1.011)+(2.030), (I-300)+(1.011)+(2.031), (I-300)+(1.011)+(2.032), (I-300)+(1.011)+(2.033), (I-300)+(1.011)+(2.034), (I-300)+(1.011)+(2.035), (I-300)+(1.011)+(2.036), (I-300)+(1.011)+(2.037), (I-300)+(1.011)+(2.038), (I-300)+(1.011)+(2.039), (I-300)+(1.011)+(2.040), (I-300)+(1.011)+(2.041), (I-300)+(1.011)+(2.042), (I-300)+(1.011)+(2.043), (I-300)+(1.011)+(2.044), (I-300)+(1.011)+(2.045), (I-300)+(1.011)+(2.046), (I-300)+(1.011)+(2.047), (I-300)+(1.011)+(2.048), (I-300)+(1.011)+(2.049), (I-300)+(1.011)+(2.050), (I-300)+(1.011)+(2.051), (I-300)+(1.011)+(2.052), (I-300)+(1.011)+(2.053), (I-300)+(1.011)+(2.054), (I-300)+(1.011)+(2.055), (I-300)+(1.011)+(2.056), (I-300)+(1.011)+(2.057), (I-300)+(1.011)+(2.058), (I-300)+(1.011)+(2.059), (I-300)+(1.011)+(3.001), (I-300)+(1.011)+(3.002), (I-300)+(1.011)+(3.003), (I-300)+(1.011)+(3.004), (I-300)+(1.011)+(3.005), (I-300)+(1.011)+(3.006), (I-300)+(1.011)+(3.007), (I-300)+(1.011)+(3.008), (I-300)+(1.011)+(3.009), (I-300)+(1.011)+(3.010), (I-300)+(1.011)+(3.011), (I-300)+(1.011)+(3.012), (I-300)+(1.011)+(3.013), (I-300)+(1.011)+(3.014), (I-300)+(1.011)+(3.015), (I-300)+(1.011)+(3.016), (I-300)+(1.011)+(3.017), (I-300)+(1.011)+(3.018), (I-300)+(1.011)+(3.019), (I-300)+(1.011)+(3.020), (I-300)+(1.011)+(3.021), (I-300)+(1.011)+(3.022), (I-300)+(1.011)+(3.023), (I-300)+(1.011)+(3.024), (I-300)+(1.011)+(3.025), (I-300)+(1.011)+(3.026), (I-300)+(1.011)+(3.027), (I-300)+(1.011)+(3.028), (I-300)+(1.011)+(3.029), (I-300)+(1.011)+(3.030), (I-300)+(1.011)+(3.031), (I-300)+(1.011)+(5.001), (I-300)+(1.011)+(5.002), (I-300)+(1.011)+(5.003), (I-300)+(1.011)+(5.004), (I-300)+(1.011)+(5.005), (I-300)+(1.011)+(5.006), (I-300)+(1.011)+(5.007), (I-300)+(1.011)+(5.008), (I-300)+(1.011)+(5.009), (I-300)+(1.011)+(5.010), (I-300)+(1.011)+(5.011), (I-300)+(1.011)+(5.012), (I-300)+(1.011)+(5.013), (I-300)+(1.011)+(5.014), (I-300)+(1.011)+(5.015), (I-300)+(1.011)+(5.016), (I-300)+(1.011)+(5.017), (I-300)+(1.011)+(5.018), (I-300)+(1.011)+(5.019), (I-300)+(1.011)+(5.020), (I-300)+(1.011)+(5.021), (I-300)+(1.011)+(5.022), (I-300)+(1.011)+(5.023), (I-300)+(1.011)+(6.001), (I-300)+(1.011)+(6.002), (I-300)+(1.011)+(6.003), (I-300)+(1.011)+(6.004), (I-300)+(1.011)+(7.001), (I-300)+(1.011)+(7.002), (I-300)+(1.011)+(7.003), (I-300)+(1.011)+(7.004), (I-300)+(1.011)+(7.005), (I-300)+(1.011)+(7.006), (I-300)+(1.011)+(9.001), (I-300)+(1.011)+(9.002), (I-300)+(1.011)+(9.003), (I-300)+(1.011)+(9.004), (I-300)+(1.011)+(9.005), (I-300)+(1.011)+(9.006), (I-300)+(1.011)+(9.007), (I-300)+(1.011)+(9.008), (I-300)+(1.011)+(9.009), (I-300)+(1.011)+(14.001), (I-300)+(1.011)+(14.002), (I-300)+(1.011)+(15.008), (I-300)+(1.011)+(15.011), (I-300)+(1.011)+(15.012), (I-300)+(1.011)+(15.016), (I-300)+(1.011)+(15.025), (I-300)+(1.011)+(15.027), (I-300)+(1.011)+(15.047), (I-300)+(1.011)+(15.063), (I-300)+(1.011)+(15.064), (I-300)+(1.011)+(16.001), (I-300)+(1.011)+(16.002), (I-300)+(1.011)+(16.003), (I-300)+(1.011)+(16.004), (I-300)+(1.011)+(16.005), (I-300)+(1.011)+(16.006), (I-300)+(1.011)+(16.007), (I-300)+(1.011)+(16.008), (I-300)+(1.011)+(17.001), (I-300)+(1.011)+(17.002), (I-300)+(1.011)+(17.003), (I-300)+(1.011)+(17.004), (I-300)+(1.011)+(17.005), (I-300)+(1.011)+(17.006), (I-300)+(1.011)+(17.007), (I-300)+(1.011)+(17.008), (I-300)+(1.011)+(17.009), (I-300)+(1.011)+(17.010), (I-300)+(1.011)+(17.011), (I-300)+(1.011)+(17.012), (I-300)+(1.011)+(18.001), (I-300)+(1.012)+(1.013), (I-300)+(1.012)+(1.014), (I-300)+(1.012)+(1.015), (I-300)+(1.012)+(1.016), (I-300)+(1.012)+(1.017), (I-300)+(1.012)+(1.018), (I-300)+(1.012)+(1.019), (I-300)+(1.012)+(1.020), (I-300)+(1.012)+(1.021), (I-300)+(1.012)+(1.022), (I-300)+(1.012)+(1.023), (I-300)+(1.012)+(1.024), (I-300)+(1.012)+(1.025), (I-300)+(1.012)+(1.026), (I-300)+(1.012)+(1.027), (I-300)+(1.012)+(1.028), (I-300)+(1.012)+(1.029), (I-300)+(1.012)+(1.030), (I-300)+(1.012)+(1.031), (I-300)+(1.012)+(1.032), (I-300)+(1.012)+(1.033), (I-300)+(1.012)+(1.034), (I-300)+(1.012)+(1.035), (I-300)+(1.012)+(1.036), (I-300)+(1.012)+(1.037), (I-300)+(1.012)+(1.038), (I-300)+(1.012)+(1.039), (I-300)+(1.012)+(1.040), (I-300)+(1.012)+(1.041), (I-300)+(1.012)+(1.042), (I-300)+(1.012)+(1.043), (I-300)+(1.012)+(1.044), (I-300)+(1.012)+(1.045), (I-300)+(1.012)+(1.046), (I-300)+(1.012)+(1.047), (I-300)+(1.012)+(1.048), (I-300)+(1.012)+(1.049), (I-300)+(1.012)+(1.050), (I-300)+(1.012)+(1.051), (I-300)+(1.012)+(1.052), (I-300)+(1.012)+(1.053), (I-300)+(1.012)+(1.054), (I-300)+(1.012)+(1.055), (I-300)+(1.012)+(1.056), (I-300)+(1.012)+(1.057), (I-300)+(1.012)+(1.058), (I-300)+(1.012)+(1.059), (I-300)+(1.012)+(1.060), (I-300)+(1.012)+(1.061), (I-300)+(1.012)+(1.062), (I-300)+(1.012)+(1.063), (I-300)+(1.012)+(1.064), (I-300)+(1.012)+(1.065), (I-300)+(1.012)+(1.066), (I-300)+(1.012)+(1.067), (I-300)+(1.012)+(1.068), (I-300)+(1.012)+(1.069), (I-300)+(1.012)+(1.070), (I-300)+(1.012)+(1.071), (I-300)+(1.012)+(1.072), (I-300)+(1.012)+(1.073), (I-300)+(1.012)+(1.074), (I-300)+(1.012)+(1.075), (I-300)+(1.012)+(1.076), (I-300)+(1.012)+(1.077), (I-300)+(1.012)+(1.078), (I-300)+(1.012)+(1.079), (I-300)+(1.012)+(1.080), (I-300)+(1.012)+(1.081), (I-300)+(1.012)+(1.082), (I-300)+(1.012)+(1.083), (I-300)+(1.012)+(1.084), (I-300)+(1.012)+(1.085), (I-300)+(1.012)+(1.086), (I-300)+(1.012)+(1.087), (I-300)+(1.012)+(1.088), (I-300)+(1.012)+(1.089), (I-300)+(1.012)+(1.090), (I-300)+(1.012)+(1.091), (I-300)+(1.012)+(1.092), (I-300)+(1.012)+(2.001), (I-300)+(1.012)+(2.002), (I-300)+(1.012)+(2.003), (I-300)+(1.012)+(2.004), (I-300)+(1.012)+(2.005), (I-300)+(1.012)+(2.006), (I-300)+(1.012)+(2.007), (I-300)+(1.012)+(2.008), (I-300)+(1.012)+(2.009), (I-300)+(1.012)+(2.010), (I-300)+(1.012)+(2.011), (I-300)+(1.012)+(2.012), (I-300)+(1.012)+(2.013), (I-300)+(1.012)+(2.014), (I-300)+(1.012)+(2.015), (I-300)+(1.012)+(2.016), (I-300)+(1.012)+(2.017), (I-300)+(1.012)+(2.018), (I-300)+(1.012)+(2.019), (I-300)+(1.012)+(2.020), (I-300)+(1.012)+(2.021), (I-300)+(1.012)+(2.022), (I-300)+(1.012)+(2.023), (I-300)+(1.012)+(2.024), (I-300)+(1.012)+(2.025), (I-300)+(1.012)+(2.026), (I-300)+(1.012)+(2.027), (I-300)+(1.012)+(2.028), (I-300)+(1.012)+(2.029), (I-300)+(1.012)+(2.030), (I-300)+(1.012)+(2.031), (I-300)+(1.012)+(2.032), (I-300)+(1.012)+(2.033), (I-300)+(1.012)+(2.034), (I-300)+(1.012)+(2.035), (I-300)+(1.012)+(2.036), (I-300)+(1.012)+(2.037), (I-300)+(1.012)+(2.038), (I-300)+(1.012)+(2.039), (I-300)+(1.012)+(2.040), (I-300)+(1.012)+(2.041), (I-300)+(1.012)+(2.042), (I-300)+(1.012)+(2.043), (I-300)+(1.012)+(2.044), (I-300)+(1.012)+(2.045), (I-300)+(1.012)+(2.046), (I-300)+(1.012)+(2.047), (I-300)+(1.012)+(2.048), (I-300)+(1.012)+(2.049), (I-300)+(1.012)+(2.050), (I-300)+(1.012)+(2.051), (I-300)+(1.012)+(2.052), (I-300)+(1.012)+(2.053), (I-300)+(1.012)+(2.054), (I-300)+(1.012)+(2.055), (I-300)+(1.012)+(2.056), (I-300)+(1.012)+(2.057), (I-300)+(1.012)+(2.058), (I-300)+(1.012)+(2.059), (I-300)+(1.012)+(3.001), (I-300)+(1.012)+(3.002), (I-300)+(1.012)+(3.003), (I-300)+(1.012)+(3.004), (I-300)+(1.012)+(3.005), (I-300)+(1.012)+(3.006), (I-300)+(1.012)+(3.007), (I-300)+(1.012)+(3.008), (I-300)+(1.012)+(3.009), (I-300)+(1.012)+(3.010), (I-300)+(1.012)+(3.011), (I-300)+(1.012)+(3.012), (I-300)+(1.012)+(3.013), (I-300)+(1.012)+(3.014), (I-300)+(1.012)+(3.015), (I-300)+(1.012)+(3.016), (I-300)+(1.012)+(3.017), (I-300)+(1.012)+(3.018), (I-300)+(1.012)+(3.019), (I-300)+(1.012)+(3.020), (I-300)+(1.012)+(3.021), (I-300)+(1.012)+(3.022), (I-300)+(1.012)+(3.023), (I-300)+(1.012)+(3.024), (I-300)+(1.012)+(3.025), (I-300)+(1.012)+(3.026), (I-300)+(1.012)+(3.027), (I-300)+(1.012)+(3.028), (I-300)+(1.012)+(3.029), (I-300)+(1.012)+(3.030), (I-300)+(1.012)+(3.031), (I-300)+(1.012)+(5.001), (I-300)+(1.012)+(5.002), (I-300)+(1.012)+(5.003), (I-300)+(1.012)+(5.004), (I-300)+(1.012)+(5.005), (I-300)+(1.012)+(5.006), (I-300)+(1.012)+(5.007), (I-300)+(1.012)+(5.008), (I-300)+(1.012)+(5.009), (I-300)+(1.012)+(5.010), (I-300)+(1.012)+(5.011), (I-300)+(1.012)+(5.012), (I-300)+(1.012)+(5.013), (I-300)+(1.012)+(5.014), (I-300)+(1.012)+(5.015), (I-300)+(1.012)+(5.016), (I-300)+(1.012)+(5.017), (I-300)+(1.012)+(5.018), (I-300)+(1.012)+(5.019), (I-300)+(1.012)+(5.020), (I-300)+(1.012)+(5.021), (I-300)+(1.012)+(5.022), (I-300)+(1.012)+(5.023), (I-300)+(1.012)+(6.001), (I-300)+(1.012)+(6.002), (I-300)+(1.012)+(6.003), (I-300)+(1.012)+(6.004), (I-300)+(1.012)+(7.001), (I-300)+(1.012)+(7.002), (I-300)+(1.012)+(7.003), (I-300)+(1.012)+(7.004), (I-300)+(1.012)+(7.005), (I-300)+(1.012)+(7.006), (I-300)+(1.012)+(9.001), (I-300)+(1.012)+(9.002), (I-300)+(1.012)+(9.003), (I-300)+(1.012)+(9.004), (I-300)+(1.012)+(9.005), (I-300)+(1.012)+(9.006), (I-300)+(1.012)+(9.007), (I-300)+(1.012)+(9.008), (I-300)+(1.012)+(9.009), (I-300)+(1.012)+(14.001), (I-300)+(1.012)+(14.002), (I-300)+(1.012)+(15.008), (I-300)+(1.012)+(15.011), (I-300)+(1.012)+(15.012), (I-300)+(1.012)+(15.016), (I-300)+(1.012)+(15.025), (I-300)+(1.012)+(15.027), (I-300)+(1.012)+(15.047), (I-300)+(1.012)+(15.063), (I-300)+(1.012)+(15.064), (I-300)+(1.012)+(16.001), (I-300)+(1.012)+(16.002), (I-300)+(1.012)+(16.003), (I-300)+(1.012)+(16.004), (I-300)+(1.012)+(16.005), (I-300)+(1.012)+(16.006), (I-300)+(1.012)+(16.007), (I-300)+(1.012)+(16.008), (I-300)+(1.012)+(17.001), (I-300)+(1.012)+(17.002), (I-300)+(1.012)+(17.003), (I-300)+(1.012)+(17.004), (I-300)+(1.012)+(17.005), (I-300)+(1.012)+(17.006), (I-300)+(1.012)+(17.007), (I-300)+(1.012)+(17.008), (I-300)+(1.012)+(17.009), (I-300)+(1.012)+(17.010), (I-300)+(1.012)+(17.011), (I-300)+(1.012)+(17.012), (I-300)+(1.012)+(18.001), (I-300)+(1.013)+(1.014), (I-300)+(1.013)+(1.015), (I-300)+(1.013)+(1.016), (I-300)+(1.013)+(1.017), (I-300)+(1.013)+(1.018), (I-300)+(1.013)+(1.019), (I-300)+(1.013)+(1.020), (I-300)+(1.013)+(1.021), (I-300)+(1.013)+(1.022), (I-300)+(1.013)+(1.023), (I-300)+(1.013)+(1.024), (I-300)+(1.013)+(1.025), (I-300)+(1.013)+(1.026), (I-300)+(1.013)+(1.027), (I-300)+(1.013)+(1.028), (I-300)+(1.013)+(1.029), (I-300)+(1.013)+(1.030), (I-300)+(1.013)+(1.031), (I-300)+(1.013)+(1.032), (I-300)+(1.013)+(1.033), (I-300)+(1.013)+(1.034), (I-300)+(1.013)+(1.035), (I-300)+(1.013)+(1.036), (I-300)+(1.013)+(1.037), (I-300)+(1.013)+(1.038), (I-300)+(1.013)+(1.039), (I-300)+(1.013)+(1.040), (I-300)+(1.013)+(1.041), (I-300)+(1.013)+(1.042), (I-300)+(1.013)+(1.043), (I-300)+(1.013)+(1.044), (I-300)+(1.013)+(1.045), (I-300)+(1.013)+(1.046), (I-300)+(1.013)+(1.047), (I-300)+(1.013)+(1.048), (I-300)+(1.013)+(1.049), (I-300)+(1.013)+(1.050), (I-300)+(1.013)+(1.051), (I-300)+(1.013)+(1.052), (I-300)+(1.013)+(1.053), (I-300)+(1.013)+(1.054), (I-300)+(1.013)+(1.055), (I-300)+(1.013)+(1.056), (I-300)+(1.013)+(1.057), (I-300)+(1.013)+(1.058), (I-300)+(1.013)+(1.059), (I-300)+(1.013)+(1.060), (I-300)+(1.013)+(1.061), (I-300)+(1.013)+(1.062), (I-300)+(1.013)+(1.063), (I-300)+(1.013)+(1.064), (I-300)+(1.013)+(1.065), (I-300)+(1.013)+(1.066), (I-300)+(1.013)+(1.067), (I-300)+(1.013)+(1.068), (I-300)+(1.013)+(1.069), (I-300)+(1.013)+(1.070), (I-300)+(1.013)+(1.071), (I-300)+(1.013)+(1.072), (I-300)+(1.013)+(1.073), (I-300)+(1.013)+(1.074), (I-300)+(1.013)+(1.075), (I-300)+(1.013)+(1.076), (I-300)+(1.013)+(1.077), (I-300)+(1.013)+(1.078), (I-300)+(1.013)+(1.079), (I-300)+(1.013)+(1.080), (I-300)+(1.013)+(1.081), (I-300)+(1.013)+(1.082), (I-300)+(1.013)+(1.083), (I-300)+(1.013)+(1.084), (I-300)+(1.013)+(1.085), (I-300)+(1.013)+(1.086), (I-300)+(1.013)+(1.087), (I-300)+(1.013)+(1.088), (I-300)+(1.013)+(1.089), (I-300)+(1.013)+(1.090), (I-300)+(1.013)+(1.091), (I-300)+(1.013)+(1.092), (I-300)+(1.013)+(2.001), (I-300)+(1.013)+(2.002), (I-300)+(1.013)+(2.003), (I-300)+(1.013)+(2.004), (I-300)+(1.013)+(2.005), (I-300)+(1.013)+(2.006), (I-300)+(1.013)+(2.007), (I-300)+(1.013)+(2.008), (I-300)+(1.013)+(2.009), (I-300)+(1.013)+(2.010), (I-300)+(1.013)+(2.011), (I-300)+(1.013)+(2.012), (I-300)+(1.013)+(2.013), (I-300)+(1.013)+(2.014), (I-300)+(1.013)+(2.015), (I-300)+(1.013)+(2.016), (I-300)+(1.013)+(2.017), (I-300)+(1.013)+(2.018), (I-300)+(1.013)+(2.019), (I-300)+(1.013)+(2.020), (I-300)+(1.013)+(2.021), (I-300)+(1.013)+(2.022), (I-300)+(1.013)+(2.023), (I-300)+(1.013)+(2.024), (I-300)+(1.013)+(2.025), (I-300)+(1.013)+(2.026), (I-300)+(1.013)+(2.027), (I-300)+(1.013)+(2.028), (I-300)+(1.013)+(2.029), (I-300)+(1.013)+(2.030), (I-300)+(1.013)+(2.031), (I-300)+(1.013)+(2.032), (I-300)+(1.013)+(2.033), (I-300)+(1.013)+(2.034), (I-300)+(1.013)+(2.035), (I-300)+(1.013)+(2.036), (I-300)+(1.013)+(2.037), (I-300)+(1.013)+(2.038), (I-300)+(1.013)+(2.039), (I-300)+(1.013)+(2.040), (I-300)+(1.013)+(2.041), (I-300)+(1.013)+(2.042), (I-300)+(1.013)+(2.043), (I-300)+(1.013)+(2.044), (I-300)+(1.013)+(2.045), (I-300)+(1.013)+(2.046), (I-300)+(1.013)+(2.047), (I-300)+(1.013)+(2.048), (I-300)+(1.013)+(2.049), (I-300)+(1.013)+(2.050), (I-300)+(1.013)+(2.051), (I-300)+(1.013)+(2.052), (I-300)+(1.013)+(2.053), (I-300)+(1.013)+(2.054), (I-300)+(1.013)+(2.055), (I-300)+(1.013)+(2.056), (I-300)+(1.013)+(2.057), (I-300)+(1.013)+(2.058), (I-300)+(1.013)+(2.059), (I-300)+(1.013)+(3.001), (I-300)+(1.013)+(3.002), (I-300)+(1.013)+(3.003), (I-300)+(1.013)+(3.004), (I-300)+(1.013)+(3.005), (I-300)+(1.013)+(3.006), (I-300)+(1.013)+(3.007), (I-300)+(1.013)+(3.008), (I-300)+(1.013)+(3.009), (I-300)+(1.013)+(3.010), (I-300)+(1.013)+(3.011), (I-300)+(1.013)+(3.012), (I-300)+(1.013)+(3.013), (I-300)+(1.013)+(3.014), (I-300)+(1.013)+(3.015), (I-300)+(1.013)+(3.016), (I-300)+(1.013)+(3.017), (I-300)+(1.013)+(3.018), (I-300)+(1.013)+(3.019), (I-300)+(1.013)+(3.020), (I-300)+(1.013)+(3.021), (I-300)+(1.013)+(3.022), (I-300)+(1.013)+(3.023), (I-300)+(1.013)+(3.024), (I-300)+(1.013)+(3.025), (I-300)+(1.013)+(3.026), (I-300)+(1.013)+(3.027), (I-300)+(1.013)+(3.028), (I-300)+(1.013)+(3.029), (I-300)+(1.013)+(3.030), (I-300)+(1.013)+(3.031), (I-300)+(1.013)+(5.001), (I-300)+(1.013)+(5.002), (I-300)+(1.013)+(5.003), (I-300)+(1.013)+(5.004), (I-300)+(1.013)+(5.005), (I-300)+(1.013)+(5.006), (I-300)+(1.013)+(5.007), (I-300)+(1.013)+(5.008), (I-300)+(1.013)+(5.009), (I-300)+(1.013)+(5.010), (I-300)+(1.013)+(5.011), (I-300)+(1.013)+(5.012), (I-300)+(1.013)+(5.013), (I-300)+(1.013)+(5.014), (I-300)+(1.013)+(5.015), (I-300)+(1.013)+(5.016), (I-300)+(1.013)+(5.017), (I-300)+(1.013)+(5.018), (I-300)+(1.013)+(5.019), (I-300)+(1.013)+(5.020), (I-300)+(1.013)+(5.021), (I-300)+(1.013)+(5.022), (I-300)+(1.013)+(5.023), (I-300)+(1.013)+(6.001), (I-300)+(1.013)+(6.002), (I-300)+(1.013)+(6.003), (I-300)+(1.013)+(6.004), (I-300)+(1.013)+(7.001), (I-300)+(1.013)+(7.002), (I-300)+(1.013)+(7.003), (I-300)+(1.013)+(7.004), (I-300)+(1.013)+(7.005), (I-300)+(1.013)+(7.006), (I-300)+(1.013)+(9.001), (I-300)+(1.013)+(9.002), (I-300)+(1.013)+(9.003), (I-300)+(1.013)+(9.004), (I-300)+(1.013)+(9.005), (I-300)+(1.013)+(9.006), (I-300)+(1.013)+(9.007), (I-300)+(1.013)+(9.008), (I-300)+(1.013)+(9.009), (I-300)+(1.013)+(14.001), (I-300)+(1.013)+(14.002), (I-300)+(1.013)+(15.008), (I-300)+(1.013)+(15.011), (I-300)+(1.013)+(15.012), (I-300)+(1.013)+(15.016), (I-300)+(1.013)+(15.025), (I-300)+(1.013)+(15.027), (I-300)+(1.013)+(15.047), (I-300)+(1.013)+(15.063), (I-300)+(1.013)+(15.064), (I-300)+(1.013)+(16.001), (I-300)+(1.013)+(16.002), (I-300)+(1.013)+(16.003), (I-300)+(1.013)+(16.004), (I-300)+(1.013)+(16.005), (I-300)+(1.013)+(16.006), (I-300)+(1.013)+(16.007), (I-300)+(1.013)+(16.008), (I-300)+(1.013)+(17.001), (I-300)+(1.013)+(17.002), (I-300)+(1.013)+(17.003), (I-300)+(1.013)+(17.004), (I-300)+(1.013)+(17.005), (I-300)+(1.013)+(17.006), (I-300)+(1.013)+(17.007), (I-300)+(1.013)+(17.008), (I-300)+(1.013)+(17.009), (I-300)+(1.013)+(17.010), (I-300)+(1.013)+(17.011), (I-300)+(1.013)+(17.012), (I-300)+(1.013)+(18.001), (I-300)+(1.014)+(1.015), (I-300)+(1.014)+(1.016), (I-300)+(1.014)+(1.017), (I-300)+(1.014)+(1.018), (I-300)+(1.014)+(1.019), (I-300)+(1.014)+(1.020), (I-300)+(1.014)+(1.021), (I-300)+(1.014)+(1.022), (I-300)+(1.014)+(1.023), (I-300)+(1.014)+(1.024), (I-300)+(1.014)+(1.025), (I-300)+(1.014)+(1.026), (I-300)+(1.014)+(1.027), (I-300)+(1.014)+(1.028), (I-300)+(1.014)+(1.029), (I-300)+(1.014)+(1.030), (I-300)+(1.014)+(1.031), (I-300)+(1.014)+(1.032), (I-300)+(1.014)+(1.033), (I-300)+(1.014)+(1.034), (I-300)+(1.014)+(1.035), (I-300)+(1.014)+(1.036), (I-300)+(1.014)+(1.037), (I-300)+(1.014)+(1.038), (I-300)+(1.014)+(1.039), (I-300)+(1.014)+(1.040), (I-300)+(1.014)+(1.041), (I-300)+(1.014)+(1.042), (I-300)+(1.014)+(1.043), (I-300)+(1.014)+(1.044), (I-300)+(1.014)+(1.045), (I-300)+(1.014)+(1.046), (I-300)+(1.014)+(1.047), (I-300)+(1.014)+(1.048), (I-300)+(1.014)+(1.049), (I-300)+(1.014)+(1.050), (I-300)+(1.014)+(1.051), (I-300)+(1.014)+(1.052), (I-300)+(1.014)+(1.053), (I-300)+(1.014)+(1.054), (I-300)+(1.014)+(1.055), (I-300)+(1.014)+(1.056), (I-300)+(1.014)+(1.057), (I-300)+(1.014)+(1.058), (I-300)+(1.014)+(1.059), (I-300)+(1.014)+(1.060), (I-300)+(1.014)+(1.061), (I-300)+(1.014)+(1.062), (I-300)+(1.014)+(1.063), (I-300)+(1.014)+(1.064), (I-300)+(1.014)+(1.065), (I-300)+(1.014)+(1.066), (I-300)+(1.014)+(1.067), (I-300)+(1.014)+(1.068), (I-300)+(1.014)+(1.069), (I-300)+(1.014)+(1.070), (I-300)+(1.014)+(1.071), (I-300)+(1.014)+(1.072), (I-300)+(1.014)+(1.073), (I-300)+(1.014)+(1.074), (I-300)+(1.014)+(1.075), (I-300)+(1.014)+(1.076), (I-300)+(1.014)+(1.077), (I-300)+(1.014)+(1.078), (I-300)+(1.014)+(1.079), (I-300)+(1.014)+(1.080), (I-300)+(1.014)+(1.081), (I-300)+(1.014)+(1.082), (I-300)+(1.014)+(1.083), (I-300)+(1.014)+(1.084), (I-300)+(1.014)+(1.085), (I-300)+(1.014)+(1.086), (I-300)+(1.014)+(1.087), (I-300)+(1.014)+(1.088), (I-300)+(1.014)+(1.089), (I-300)+(1.014)+(1.090), (I-300)+(1.014)+(1.091), (I-300)+(1.014)+(1.092), (I-300)+(1.014)+(2.001), (I-300)+(1.014)+(2.002), (I-300)+(1.014)+(2.003), (I-300)+(1.014)+(2.004), (I-300)+(1.014)+(2.005), (I-300)+(1.014)+(2.006), (I-300)+(1.014)+(2.007), (I-300)+(1.014)+(2.008), (I-300)+(1.014)+(2.009), (I-300)+(1.014)+(2.010), (I-300)+(1.014)+(2.011), (I-300)+(1.014)+(2.012), (I-300)+(1.014)+(2.013), (I-300)+(1.014)+(2.014), (I-300)+(1.014)+(2.015), (I-300)+(1.014)+(2.016), (I-300)+(1.014)+(2.017), (I-300)+(1.014)+(2.018), (I-300)+(1.014)+(2.019), (I-300)+(1.014)+(2.020), (I-300)+(1.014)+(2.021), (I-300)+(1.014)+(2.022), (I-300)+(1.014)+(2.023), (I-300)+(1.014)+(2.024), (I-300)+(1.014)+(2.025), (I-300)+(1.014)+(2.026), (I-300)+(1.014)+(2.027), (I-300)+(1.014)+(2.028), (I-300)+(1.014)+(2.029), (I-300)+(1.014)+(2.030), (I-300)+(1.014)+(2.031), (I-300)+(1.014)+(2.032), (I-300)+(1.014)+(2.033), (I-300)+(1.014)+(2.034), (I-300)+(1.014)+(2.035), (I-300)+(1.014)+(2.036), (I-300)+(1.014)+(2.037), (I-300)+(1.014)+(2.038), (I-300)+(1.014)+(2.039), (I-300)+(1.014)+(2.040), (I-300)+(1.014)+(2.041), (I-300)+(1.014)+(2.042), (I-300)+(1.014)+(2.043), (I-300)+(1.014)+(2.044), (I-300)+(1.014)+(2.045), (I-300)+(1.014)+(2.046), (I-300)+(1.014)+(2.047), (I-300)+(1.014)+(2.048), (I-300)+(1.014)+(2.049), (I-300)+(1.014)+(2.050), (I-300)+(1.014)+(2.051), (I-300)+(1.014)+(2.052), (I-300)+(1.014)+(2.053), (I-300)+(1.014)+(2.054), (I-300)+(1.014)+(2.055), (I-300)+(1.014)+(2.056), (I-300)+(1.014)+(2.057), (I-300)+(1.014)+(2.058), (I-300)+(1.014)+(2.059), (I-300)+(1.014)+(3.001), (I-300)+(1.014)+(3.002), (I-300)+(1.014)+(3.003), (I-300)+(1.014)+(3.004), (I-300)+(1.014)+(3.005), (I-300)+(1.014)+(3.006), (I-300)+(1.014)+(3.007), (I-300)+(1.014)+(3.008), (I-300)+(1.014)+(3.009), (I-300)+(1.014)+(3.010), (I-300)+(1.014)+(3.011), (I-300)+(1.014)+(3.012), (I-300)+(1.014)+(3.013), (I-300)+(1.014)+(3.014), (I-300)+(1.014)+(3.015), (I-300)+(1.014)+(3.016), (I-300)+(1.014)+(3.017), (I-300)+(1.014)+(3.018), (I-300)+(1.014)+(3.019), (I-300)+(1.014)+(3.020), (I-300)+(1.014)+(3.021), (I-300)+(1.014)+(3.022), (I-300)+(1.014)+(3.023), (I-300)+(1.014)+(3.024), (I-300)+(1.014)+(3.025), (I-300)+(1.014)+(3.026), (I-300)+(1.014)+(3.027), (I-300)+(1.014)+(3.028), (I-300)+(1.014)+(3.029), (I-300)+(1.014)+(3.030), (I-300)+(1.014)+(3.031), (I-300)+(1.014)+(5.001), (I-300)+(1.014)+(5.002), (I-300)+(1.014)+(5.003), (I-300)+(1.014)+(5.004), (I-300)+(1.014)+(5.005), (I-300)+(1.014)+(5.006), (I-300)+(1.014)+(5.007), (I-300)+(1.014)+(5.008), (I-300)+(1.014)+(5.009), (I-300)+(1.014)+(5.010), (I-300)+(1.014)+(5.011), (I-300)+(1.014)+(5.012), (I-300)+(1.014)+(5.013), (I-300)+(1.014)+(5.014), (I-300)+(1.014)+(5.015), (I-300)+(1.014)+(5.016), (I-300)+(1.014)+(5.017), (I-300)+(1.014)+(5.018), (I-300)+(1.014)+(5.019), (I-300)+(1.014)+(5.020), (I-300)+(1.014)+(5.021), (I-300)+(1.014)+(5.022), (I-300)+(1.014)+(5.023), (I-300)+(1.014)+(6.001), (I-300)+(1.014)+(6.002), (I-300)+(1.014)+(6.003), (I-300)+(1.014)+(6.004), (I-300)+(1.014)+(7.001), (I-300)+(1.014)+(7.002), (I-300)+(1.014)+(7.003), (I-300)+(1.014)+(7.004), (I-300)+(1.014)+(7.005), (I-300)+(1.014)+(7.006), (I-300)+(1.014)+(9.001), (I-300)+(1.014)+(9.002), (I-300)+(1.014)+(9.003), (I-300)+(1.014)+(9.004), (I-300)+(1.014)+(9.005), (I-300)+(1.014)+(9.006), (I-300)+(1.014)+(9.007), (I-300)+(1.014)+(9.008), (I-300)+(1.014)+(9.009), (I-300)+(1.014)+(14.001), (I-300)+(1.014)+(14.002), (I-300)+(1.014)+(15.008), (I-300)+(1.014)+(15.011), (I-300)+(1.014)+(15.012), (I-300)+(1.014)+(15.016), (I-300)+(1.014)+(15.025), (I-300)+(1.014)+(15.027), (I-300)+(1.014)+(15.047), (I-300)+(1.014)+(15.063), (I-300)+(1.014)+(15.064), (I-300)+(1.014)+(16.001), (I-300)+(1.014)+(16.002), (I-300)+(1.014)+(16.003), (I-300)+(1.014)+(16.004), (I-300)+(1.014)+(16.005), (I-300)+(1.014)+(16.006), (I-300)+(1.014)+(16.007), (I-300)+(1.014)+(16.008), (I-300)+(1.014)+(17.001), (I-300)+(1.014)+(17.002), (I-300)+(1.014)+(17.003), (I-300)+(1.014)+(17.004), (I-300)+(1.014)+(17.005), (I-300)+(1.014)+(17.006), (I-300)+(1.014)+(17.007), (I-300)+(1.014)+(17.008), (I-300)+(1.014)+(17.009), (I-300)+(1.014)+(17.010), (I-300)+(1.014)+(17.011), (I-300)+(1.014)+(17.012), (I-300)+(1.014)+(18.001), (I-300)+(1.015)+(1.016), (I-300)+(1.015)+(1.017), (I-300)+(1.015)+(1.018), (I-300)+(1.015)+(1.019), (I-300)+(1.015)+(1.020), (I-300)+(1.015)+(1.021), (I-300)+(1.015)+(1.022), (I-300)+(1.015)+(1.023), (I-300)+(1.015)+(1.024), (I-300)+(1.015)+(1.025), (I-300)+(1.015)+(1.026), (I-300)+(1.015)+(1.027), (I-300)+(1.015)+(1.028), (I-300)+(1.015)+(1.029), (I-300)+(1.015)+(1.030), (I-300)+(1.015)+(1.031), (I-300)+(1.015)+(1.032), (I-300)+(1.015)+(1.033), (I-300)+(1.015)+(1.034), (I-300)+(1.015)+(1.035), (I-300)+(1.015)+(1.036), (I-300)+(1.015)+(1.037), (I-300)+(1.015)+(1.038), (I-300)+(1.015)+(1.039), (I-300)+(1.015)+(1.040), (I-300)+(1.015)+(1.041), (I-300)+(1.015)+(1.042), (I-300)+(1.015)+(1.043), (I-300)+(1.015)+(1.044), (I-300)+(1.015)+(1.045), (I-300)+(1.015)+(1.046), (I-300)+(1.015)+(1.047), (I-300)+(1.015)+(1.048), (I-300)+(1.015)+(1.049), (I-300)+(1.015)+(1.050), (I-300)+(1.015)+(1.051), (I-300)+(1.015)+(1.052), (I-300)+(1.015)+(1.053), (I-300)+(1.015)+(1.054), (I-300)+(1.015)+(1.055), (I-300)+(1.015)+(1.056), (I-300)+(1.015)+(1.057), (I-300)+(1.015)+(1.058), (I-300)+(1.015)+(1.059), (I-300)+(1.015)+(1.060), (I-300)+(1.015)+(1.061), (I-300)+(1.015)+(1.062), (I-300)+(1.015)+(1.063), (I-300)+(1.015)+(1.064), (I-300)+(1.015)+(1.065), (I-300)+(1.015)+(1.066), (I-300)+(1.015)+(1.067), (I-300)+(1.015)+(1.068), (I-300)+(1.015)+(1.069), (I-300)+(1.015)+(1.070), (I-300)+(1.015)+(1.071), (I-300)+(1.015)+(1.072), (I-300)+(1.015)+(1.073), (I-300)+(1.015)+(1.074), (I-300)+(1.015)+(1.075), (I-300)+(1.015)+(1.076), (I-300)+(1.015)+(1.077), (I-300)+(1.015)+(1.078), (I-300)+(1.015)+(1.079), (I-300)+(1.015)+(1.080), (I-300)+(1.015)+(1.081), (I-300)+(1.015)+(1.082), (I-300)+(1.015)+(1.083), (I-300)+(1.015)+(1.084), (I-300)+(1.015)+(1.085), (I-300)+(1.015)+(1.086), (I-300)+(1.015)+(1.087), (I-300)+(1.015)+(1.088), (I-300)+(1.015)+(1.089), (I-300)+(1.015)+(1.090), (I-300)+(1.015)+(1.091), (I-300)+(1.015)+(1.092), (I-300)+(1.015)+(2.001), (I-300)+(1.015)+(2.002), (I-300)+(1.015)+(2.003), (I-300)+(1.015)+(2.004), (I-300)+(1.015)+(2.005), (I-300)+(1.015)+(2.006), (I-300)+(1.015)+(2.007), (I-300)+(1.015)+(2.008), (I-300)+(1.015)+(2.009), (I-300)+(1.015)+(2.010), (I-300)+(1.015)+(2.011), (I-300)+(1.015)+(2.012), (I-300)+(1.015)+(2.013), (I-300)+(1.015)+(2.014), (I-300)+(1.015)+(2.015), (I-300)+(1.015)+(2.016), (I-300)+(1.015)+(2.017), (I-300)+(1.015)+(2.018), (I-300)+(1.015)+(2.019), (I-300)+(1.015)+(2.020), (I-300)+(1.015)+(2.021), (I-300)+(1.015)+(2.022), (I-300)+(1.015)+(2.023), (I-300)+(1.015)+(2.024), (I-300)+(1.015)+(2.025), (I-300)+(1.015)+(2.026), (I-300)+(1.015)+(2.027), (I-300)+(1.015)+(2.028), (I-300)+(1.015)+(2.029), (I-300)+(1.015)+(2.030), (I-300)+(1.015)+(2.031), (I-300)+(1.015)+(2.032), (I-300)+(1.015)+(2.033), (I-300)+(1.015)+(2.034), (I-300)+(1.015)+(2.035), (I-300)+(1.015)+(2.036), (I-300)+(1.015)+(2.037), (I-300)+(1.015)+(2.038), (I-300)+(1.015)+(2.039), (I-300)+(1.015)+(2.040), (I-300)+(1.015)+(2.041), (I-300)+(1.015)+(2.042), (I-300)+(1.015)+(2.043), (I-300)+(1.015)+(2.044), (I-300)+(1.015)+(2.045), (I-300)+(1.015)+(2.046), (I-300)+(1.015)+(2.047), (I-300)+(1.015)+(2.048), (I-300)+(1.015)+(2.049),
(I-300)+(1.015)+(2.050), (I-300)+(1.015)+(2.051),
(I-300)+(1.015)+(2.052), (I-300)+(1.015)+(2.053),
(I-300)+(1.015)+(2.054), (I-300)+(1.015)+(2.055),
(I-300)+(1.015)+(2.056), (I-300)+(1.015)+(2.057),
(I-300)+(1.015)+(2.058), (I-300)+(1.015)+(2.059),
(I-300)+(1.015)+(3.001), (I-300)+(1.015)+(3.002),
(I-300)+(1.015)+(3.003), (I-300)+(1.015)+(3.004),
(I-300)+(1.015)+(3.005), (I-300)+(1.015)+(3.006),
(I-300)+(1.015)+(3.007), (I-300)+(1.015)+(3.008),
(I-300)+(1.015)+(3.009), (I-300)+(1.015)+(3.010),
(I-300)+(1.015)+(3.011), (I-300)+(1.015)+(3.012),
(I-300)+(1.015)+(3.013), (I-300)+(1.015)+(3.014),
(I-300)+(1.015)+(3.015), (I-300)+(1.015)+(3.016),
(I-300)+(1.015)+(3.017), (I-300)+(1.015)+(3.018),
(I-300)+(1.015)+(3.019), (I-300)+(1.015)+(3.020),
(I-300)+(1.015)+(3.021), (I-300)+(1.015)+(3.022),
(I-300)+(1.015)+(3.023), (I-300)+(1.015)+(3.024),
(I-300)+(1.015)+(3.025), (I-300)+(1.015)+(3.026),
(I-300)+(1.015)+(3.027), (I-300)+(1.015)+(3.028),
(I-300)+(1.015)+(3.029), (I-300)+(1.015)+(3.030),
(I-300)+(1.015)+(3.031), (I-300)+(1.015)+(5.001),
(I-300)+(1.015)+(5.002), (I-300)+(1.015)+(5.003),
(I-300)+(1.015)+(5.004), (I-300)+(1.015)+(5.005),
(I-300)+(1.015)+(5.006), (I-300)+(1.015)+(5.007),
(I-300)+(1.015)+(5.008), (I-300)+(1.015)+(5.009),
(I-300)+(1.015)+(5.010), (I-300)+(1.015)+(5.011),
(I-300)+(1.015)+(5.012), (I-300)+(1.015)+(5.013),
(I-300)+(1.015)+(5.014), (I-300)+(1.015)+(5.015),
(I-300)+(1.015)+(5.016), (I-300)+(1.015)+(5.017),
(I-300)+(1.015)+(5.018), (I-300)+(1.015)+(5.019),
(I-300)+(1.015)+(5.020), (I-300)+(1.015)+(5.021),
(I-300)+(1.015)+(5.022), (I-300)+(1.015)+(5.023),
(I-300)+(1.015)+(6.001), (I-300)+(1.015)+(6.002),
(I-300)+(1.015)+(6.003), (I-300)+(1.015)+(6.004),
(I-300)+(1.015)+(7.001), (I-300)+(1.015)+(7.002),
(I-300)+(1.015)+(7.003), (I-300)+(1.015)+(7.004),
(I-300)+(1.015)+(7.005), (I-300)+(1.015)+(7.006),
(I-300)+(1.015)+(9.001), (I-300)+(1.015)+(9.002),
(I-300)+(1.015)+(9.003), (I-300)+(1.015)+(9.004),
(I-300)+(1.015)+(9.005), (I-300)+(1.015)+(9.006),
(I-300)+(1.015)+(9.007), (I-300)+(1.015)+(9.008),
(I-300)+(1.015)+(9.009), (I-300)+(1.015)+(14.001),
(I-300)+(1.015)+(14.002), (I-300)+(1.015)+(15.008),
(I-300)+(1.015)+(15.011), (I-300)+(1.015)+(15.012),
(I-300)+(1.015)+(15.016), (I-300)+(1.015)+(15.025),
(I-300)+(1.015)+(15.027), (I-300)+(1.015)+(15.047),
(I-300)+(1.015)+(15.063), (I-300)+(1.015)+(15.064),
(I-300)+(1.015)+(16.001), (I-300)+(1.015)+(16.002),
(I-300)+(1.015)+(16.003), (I-300)+(1.015)+(16.004),
(I-300)+(1.015)+(16.005), (I-300)+(1.015)+(16.006),
(I-300)+(1.015)+(16.007), (I-300)+(1.015)+(16.008),
(I-300)+(1.015)+(17.001), (I-300)+(1.015)+(17.002),
(I-300)+(1.015)+(17.003), (I-300)+(1.015)+(17.004),
(I-300)+(1.015)+(17.005), (I-300)+(1.015)+(17.006),
(I-300)+(1.015)+(17.007), (I-300)+(1.015)+(17.008),
(I-300)+(1.015)+(17.009), (I-300)+(1.015)+(17.010),
(I-300)+(1.015)+(17.011), (I-300)+(1.015)+(17.012),
(I-300)+(1.015)+(18.001), (I-300)+(1.016)+(1.017), (I-300)+(1.016)+(1.018),
(I-300)+(1.016)+(1.019), (I-300)+(1.016)+(1.020),
(I-300)+(1.016)+(1.021), (I-300)+(1.016)+(1.022),
(I-300)+(1.016)+(1.023), (I-300)+(1.016)+(1.024),
(I-300)+(1.016)+(1.025), (I-300)+(1.016)+(1.026),
(I-300)+(1.016)+(1.027), (I-300)+(1.016)+(1.028),
(I-300)+(1.016)+(1.029), (I-300)+(1.016)+(1.030),
(I-300)+(1.016)+(1.031), (I-300)+(1.016)+(1.032),
(I-300)+(1.016)+(1.033), (I-300)+(1.016)+(1.034),
(I-300)+(1.016)+(1.035), (I-300)+(1.016)+(1.036),
(I-300)+(1.016)+(1.037), (I-300)+(1.016)+(1.038),
(I-300)+(1.016)+(1.039), (I-300)+(1.016)+(1.040),
(I-300)+(1.016)+(1.041), (I-300)+(1.016)+(1.042),
(I-300)+(1.016)+(1.043), (I-300)+(1.016)+(1.044),
(I-300)+(1.016)+(1.045), (I-300)+(1.016)+(1.046),
(I-300)+(1.016)+(1.047), (I-300)+(1.016)+(1.048),
(I-300)+(1.016)+(1.049), (I-300)+(1.016)+(1.050),
(I-300)+(1.016)+(1.051), (I-300)+(1.016)+(1.052),
(I-300)+(1.016)+(1.053), (I-300)+(1.016)+(1.054),
(I-300)+(1.016)+(1.055), (I-300)+(1.016)+(1.056),
(I-300)+(1.016)+(1.057), (I-300)+(1.016)+(1.058),
(I-300)+(1.016)+(1.059), (I-300)+(1.016)+(1.060),
(I-300)+(1.016)+(1.061), (I-300)+(1.016)+(1.062),
(I-300)+(1.016)+(1.063), (I-300)+(1.016)+(1.064),
(I-300)+(1.016)+(1.065), (I-300)+(1.016)+(1.066),
(I-300)+(1.016)+(1.067), (I-300)+(1.016)+(1.068),
(I-300)+(1.016)+(1.069), (I-300)+(1.016)+(1.070),
(I-300)+(1.016)+(1.071), (I-300)+(1.016)+(1.072),
(I-300)+(1.016)+(1.073), (I-300)+(1.016)+(1.074),
(I-300)+(1.016)+(1.075), (I-300)+(1.016)+(1.076),
(I-300)+(1.016)+(1.077), (I-300)+(1.016)+(1.078),
(I-300)+(1.016)+(1.079), (I-300)+(1.016)+(1.080),
(I-300)+(1.016)+(1.081), (I-300)+(1.016)+(1.082),
(I-300)+(1.016)+(1.083), (I-300)+(1.016)+(1.084),
(I-300)+(1.016)+(1.085), (I-300)+(1.016)+(1.086),
(I-300)+(1.016)+(1.087), (I-300)+(1.016)+(1.088),
(I-300)+(1.016)+(1.089), (I-300)+(1.016)+(1.090),
(I-300)+(1.016)+(1.091), (I-300)+(1.016)+(1.092),
(I-300)+(1.016)+(2.001), (I-300)+(1.016)+(2.002),
(I-300)+(1.016)+(2.003), (I-300)+(1.016)+(2.004),
(I-300)+(1.016)+(2.005), (I-300)+(1.016)+(2.006),
(I-300)+(1.016)+(2.007), (I-300)+(1.016)+(2.008),
(I-300)+(1.016)+(2.009), (I-300)+(1.016)+(2.010),
(I-300)+(1.016)+(2.011), (I-300)+(1.016)+(2.012),
(I-300)+(1.016)+(2.013), (I-300)+(1.016)+(2.014),
(I-300)+(1.016)+(2.015), (I-300)+(1.016)+(2.016),
(I-300)+(1.016)+(2.017), (I-300)+(1.016)+(2.018),
(I-300)+(1.016)+(2.019), (I-300)+(1.016)+(2.020),
(I-300)+(1.016)+(2.021), (I-300)+(1.016)+(2.022),
(I-300)+(1.016)+(2.023), (I-300)+(1.016)+(2.024),
(I-300)+(1.016)+(2.025), (I-300)+(1.016)+(2.026),
(I-300)+(1.016)+(2.027), (I-300)+(1.016)+(2.028),
(I-300)+(1.016)+(2.029), (I-300)+(1.016)+(2.030),
(I-300)+(1.016)+(2.031), (I-300)+(1.016)+(2.032),
(I-300)+(1.016)+(2.033), (I-300)+(1.016)+(2.034),
(I-300)+(1.016)+(2.035), (I-300)+(1.016)+(2.036),
(I-300)+(1.016)+(2.037), (I-300)+(1.016)+(2.038),
(I-300)+(1.016)+(2.039), (I-300)+(1.016)+(2.040),
(I-300)+(1.016)+(2.041), (I-300)+(1.016)+(2.042),
(I-300)+(1.016)+(2.043), (I-300)+(1.016)+(2.044),
(I-300)+(1.016)+(2.045), (I-300)+(1.016)+(2.046),
(I-300)+(1.016)+(2.047), (I-300)+(1.016)+(2.048),
(I-300)+(1.016)+(2.049), (I-300)+(1.016)+(2.050),
(I-300)+(1.016)+(2.051), (I-300)+(1.016)+(2.052),
(I-300)+(1.016)+(2.053), (I-300)+(1.016)+(2.054),
(I-300)+(1.016)+(2.055), (I-300)+(1.016)+(2.056),
(I-300)+(1.016)+(2.057), (I-300)+(1.016)+(2.058),
(I-300)+(1.016)+(2.059), (I-300)+(1.016)+(3.001),
(I-300)+(1.016)+(3.002), (I-300)+(1.016)+(3.003),
(I-300)+(1.016)+(3.004), (I-300)+(1.016)+(3.005),
(I-300)+(1.016)+(3.006), (I-300)+(1.016)+(3.007),
(I-300)+(1.016)+(3.008), (I-300)+(1.016)+(3.009),
(I-300)+(1.016)+(3.010), (I-300)+(1.016)+(3.011),
(I-300)+(1.016)+(3.012), (I-300)+(1.016)+(3.013),
(I-300)+(1.016)+(3.014), (I-300)+(1.016)+(3.015), (I-300)+(1.016)+(3.016), (I-300)+(1.016)+(3.017), (I-300)+(1.016)+(3.018), (I-300)+(1.016)+(3.019), (I-300)+(1.016)+(3.020), (I-300)+(1.016)+(3.021), (I-300)+(1.016)+(3.022), (I-300)+(1.016)+(3.023), (I-300)+(1.016)+(3.024), (I-300)+(1.016)+(3.025), (I-300)+(1.016)+(3.026), (I-300)+(1.016)+(3.027), (I-300)+(1.016)+(3.028), (I-300)+(1.016)+(3.029), (I-300)+(1.016)+(3.030), (I-300)+(1.016)+(3.031), (I-300)+(1.016)+(5.001), (I-300)+(1.016)+(5.002), (I-300)+(1.016)+(5.003), (I-300)+(1.016)+(5.004), (I-300)+(1.016)+(5.005), (I-300)+(1.016)+(5.006), (I-300)+(1.016)+(5.007), (I-300)+(1.016)+(5.008), (I-300)+(1.016)+(5.009), (I-300)+(1.016)+(5.010), (I-300)+(1.016)+(5.011), (I-300)+(1.016)+(5.012), (I-300)+(1.016)+(5.013), (I-300)+(1.016)+(5.014), (I-300)+(1.016)+(5.015), (I-300)+(1.016)+(5.016), (I-300)+(1.016)+(5.017), (I-300)+(1.016)+(5.018), (I-300)+(1.016)+(5.019), (I-300)+(1.016)+(5.020), (I-300)+(1.016)+(5.021), (I-300)+(1.016)+(5.022), (I-300)+(1.016)+(5.023), (I-300)+(1.016)+(6.001), (I-300)+(1.016)+(6.002), (I-300)+(1.016)+(6.003), (I-300)+(1.016)+(6.004), (I-300)+(1.016)+(7.001), (I-300)+(1.016)+(7.002), (I-300)+(1.016)+(7.003), (I-300)+(1.016)+(7.004), (I-300)+(1.016)+(7.005), (I-300)+(1.016)+(7.006), (I-300)+(1.016)+(9.001), (I-300)+(1.016)+(9.002), (I-300)+(1.016)+(9.003), (I-300)+(1.016)+(9.004), (I-300)+(1.016)+(9.005), (I-300)+(1.016)+(9.006), (I-300)+(1.016)+(9.007), (I-300)+(1.016)+(9.008), (I-300)+(1.016)+(9.009), (I-300)+(1.016)+(14.001), (I-300)+(1.016)+(14.002), (I-300)+(1.016)+(15.008), (I-300)+(1.016)+(15.011), (I-300)+(1.016)+(15.012), (I-300)+(1.016)+(15.016), (I-300)+(1.016)+(15.025), (I-300)+(1.016)+(15.027), (I-300)+(1.016)+(15.047), (I-300)+(1.016)+(15.063), (I-300)+(1.016)+(15.064), (I-300)+(1.016)+(16.001), (I-300)+(1.016)+(16.002), (I-300)+(1.016)+(16.003), (I-300)+(1.016)+(16.004), (I-300)+(1.016)+(16.005), (I-300)+(1.016)+(16.006), (I-300)+(1.016)+(16.007), (I-300)+(1.016)+(16.008), (I-300)+(1.016)+(17.001), (I-300)+(1.016)+(17.002), (I-300)+(1.016)+(17.003), (I-300)+(1.016)+(17.004), (I-300)+(1.016)+(17.005), (I-300)+(1.016)+(17.006), (I-300)+(1.016)+(17.007), (I-300)+(1.016)+(17.008), (I-300)+(1.016)+(17.009), (I-300)+(1.016)+(17.010), (I-300)+(1.016)+(17.011), (I-300)+(1.016)+(17.012), (I-300)+(1.016)+(18.001),
(I-300)+(1.017)+(1.018), (I-300)+(1.017)+(1.019), (I-300)+(1.017)+(1.020), (I-300)+(1.017)+(1.021), (I-300)+(1.017)+(1.022), (I-300)+(1.017)+(1.023), (I-300)+(1.017)+(1.024), (I-300)+(1.017)+(1.025), (I-300)+(1.017)+(1.026), (I-300)+(1.017)+(1.027), (I-300)+(1.017)+(1.028), (I-300)+(1.017)+(1.029), (I-300)+(1.017)+(1.030), (I-300)+(1.017)+(1.031), (I-300)+(1.017)+(1.032), (I-300)+(1.017)+(1.033), (I-300)+(1.017)+(1.034), (I-300)+(1.017)+(1.035), (I-300)+(1.017)+(1.036), (I-300)+(1.017)+(1.037), (I-300)+(1.017)+(1.038), (I-300)+(1.017)+(1.039), (I-300)+(1.017)+(1.040), (I-300)+(1.017)+(1.041), (I-300)+(1.017)+(1.042), (I-300)+(1.017)+(1.043), (I-300)+(1.017)+(1.044), (I-300)+(1.017)+(1.045), (I-300)+(1.017)+(1.046), (I-300)+(1.017)+(1.047), (I-300)+(1.017)+(1.048), (I-300)+(1.017)+(1.049), (I-300)+(1.017)+(1.050), (I-300)+(1.017)+(1.051), (I-300)+(1.017)+(1.052), (I-300)+(1.017)+(1.053), (I-300)+(1.017)+(1.054), (I-300)+(1.017)+(1.055), (I-300)+(1.017)+(1.056), (I-300)+(1.017)+(1.057), (I-300)+(1.017)+(1.058), (I-300)+(1.017)+(1.059), (I-300)+(1.017)+(1.060), (I-300)+(1.017)+(1.061), (I-300)+(1.017)+(1.062), (I-300)+(1.017)+(1.063), (I-300)+(1.017)+(1.064), (I-300)+(1.017)+(1.065), (I-300)+(1.017)+(1.066), (I-300)+(1.017)+(1.067), (I-300)+(1.017)+(1.068), (I-300)+(1.017)+(1.069), (I-300)+(1.017)+(1.070), (I-300)+(1.017)+(1.071), (I-300)+(1.017)+(1.072), (I-300)+(1.017)+(1.073), (I-300)+(1.017)+(1.074), (I-300)+(1.017)+(1.075), (I-300)+(1.017)+(1.076), (I-300)+(1.017)+(1.077), (I-300)+(1.017)+(1.078), (I-300)+(1.017)+(1.079), (I-300)+(1.017)+(1.080), (I-300)+(1.017)+(1.081), (I-300)+(1.017)+(1.082), (I-300)+(1.017)+(1.083), (I-300)+(1.017)+(1.084), (I-300)+(1.017)+(1.085), (I-300)+(1.017)+(1.086), (I-300)+(1.017)+(1.087), (I-300)+(1.017)+(1.088), (I-300)+(1.017)+(1.089), (I-300)+(1.017)+(1.090), (I-300)+(1.017)+(1.091), (I-300)+(1.017)+(1.092), (I-300)+(1.017)+(2.001), (I-300)+(1.017)+(2.002), (I-300)+(1.017)+(2.003), (I-300)+(1.017)+(2.004), (I-300)+(1.017)+(2.005), (I-300)+(1.017)+(2.006), (I-300)+(1.017)+(2.007), (I-300)+(1.017)+(2.008), (I-300)+(1.017)+(2.009), (I-300)+(1.017)+(2.010), (I-300)+(1.017)+(2.011), (I-300)+(1.017)+(2.012), (I-300)+(1.017)+(2.013), (I-300)+(1.017)+(2.014), (I-300)+(1.017)+(2.015), (I-300)+(1.017)+(2.016), (I-300)+(1.017)+(2.017), (I-300)+(1.017)+(2.018), (I-300)+(1.017)+(2.019), (I-300)+(1.017)+(2.020), (I-300)+(1.017)+(2.021), (I-300)+(1.017)+(2.022), (I-300)+(1.017)+(2.023), (I-300)+(1.017)+(2.024), (I-300)+(1.017)+(2.025), (I-300)+(1.017)+(2.026), (I-300)+(1.017)+(2.027), (I-300)+(1.017)+(2.028), (I-300)+(1.017)+(2.029), (I-300)+(1.017)+(2.030), (I-300)+(1.017)+(2.031), (I-300)+(1.017)+(2.032), (I-300)+(1.017)+(2.033), (I-300)+(1.017)+(2.034), (I-300)+(1.017)+(2.035), (I-300)+(1.017)+(2.036), (I-300)+(1.017)+(2.037), (I-300)+(1.017)+(2.038), (I-300)+(1.017)+(2.039), (I-300)+(1.017)+(2.040), (I-300)+(1.017)+(2.041), (I-300)+(1.017)+(2.042), (I-300)+(1.017)+(2.043), (I-300)+(1.017)+(2.044), (I-300)+(1.017)+(2.045), (I-300)+(1.017)+(2.046), (I-300)+(1.017)+(2.047), (I-300)+(1.017)+(2.048), (I-300)+(1.017)+(2.049), (I-300)+(1.017)+(2.050), (I-300)+(1.017)+(2.051), (I-300)+(1.017)+(2.052), (I-300)+(1.017)+(2.053), (I-300)+(1.017)+(2.054), (I-300)+(1.017)+(2.055), (I-300)+(1.017)+(2.056), (I-300)+(1.017)+(2.057), (I-300)+(1.017)+(2.058), (I-300)+(1.017)+(2.059), (I-300)+(1.017)+(3.001), (I-300)+(1.017)+(3.002), (I-300)+(1.017)+(3.003), (I-300)+(1.017)+(3.004), (I-300)+(1.017)+(3.005), (I-300)+(1.017)+(3.006), (I-300)+(1.017)+(3.007), (I-300)+(1.017)+(3.008), (I-300)+(1.017)+(3.009), (I-300)+(1.017)+(3.010), (I-300)+(1.017)+(3.011), (I-300)+(1.017)+(3.012), (I-300)+(1.017)+(3.013), (I-300)+(1.017)+(3.014), (I-300)+(1.017)+(3.015), (I-300)+(1.017)+(3.016), (I-300)+(1.017)+(3.017), (I-300)+(1.017)+(3.018), (I-300)+(1.017)+(3.019), (I-300)+(1.017)+(3.020), (I-300)+(1.017)+(3.021), (I-300)+(1.017)+(3.022), (I-300)+(1.017)+(3.023), (I-300)+(1.017)+(3.024), (I-300)+(1.017)+(3.025), (I-300)+(1.017)+(3.026), (I-300)+(1.017)+(3.027), (I-300)+(1.017)+(3.028), (I-300)+(1.017)+(3.029), (I-300)+(1.017)+(3.030), (I-300)+(1.017)+(3.031), (I-300)+(1.017)+(5.001), (I-300)+(1.017)+(5.002), (I-300)+(1.017)+(5.003), (I-300)+(1.017)+(5.004), (I-300)+(1.017)+(5.005), (I-300)+(1.017)+(5.006), (I-300)+(1.017)+(5.007), (I-300)+(1.017)+(5.008), (I-300)+(1.017)+(5.009), (I-300)+(1.017)+(5.010), (I-300)+(1.017)+(5.011), (I-300)+(1.017)+(5.012), (I-300)+(1.017)+(5.013), (I-300)+(1.017)+(5.014), (I-300)+(1.017)+(5.015), (I-300)+(1.017)+(5.016), (I-300)+(1.017)+(5.017), (I-300)+(1.017)+(5.018), (I-300)+(1.017)+(5.019), (I-300)+(1.017)+(5.020), (I-300)+(1.017)+(5.021), (I-300)+(1.017)+(5.022), (I-300)+(1.017)+(5.023), (I-300)+(1.017)+(6.001), (I-300)+(1.017)+(6.002), (I-300)+(1.017)+(6.003), (I-300)+(1.017)+(6.004), (I-300)+(1.017)+(7.001), (I-300)+(1.017)+(7.002), (I-300)+(1.017)+(7.003), (I-300)+(1.017)+(7.004), (I-300)+(1.017)+(7.005), (I-300)+(1.017)+(7.006), (I-300)+(1.017)+(9.001), (I-300)+(1.017)+(9.002), (I-300)+(1.017)+(9.003), (I-300)+(1.017)+(9.004), (I-300)+(1.017)+(9.005), (I-300)+(1.017)+(9.006), (I-300)+(1.017)+(9.007), (I-300)+(1.017)+(9.008), (I-300)+(1.017)+(9.009), (I-300)+(1.017)+(14.001), (I-300)+(1.017)+(14.002), (I-300)+(1.017)+(15.008), (I-300)+(1.017)+(15.011), (I-300)+(1.017)+(15.012), (I-300)+(1.017)+(15.016), (I-300)+(1.017)+(15.025), (I-300)+(1.017)+(15.027), (I-300)+(1.017)+(15.047), (I-300)+(1.017)+(15.063), (I-300)+(1.017)+(15.064), (I-300)+(1.017)+(16.001), (I-300)+(1.017)+(16.002), (I-300)+(1.017)+(16.003), (I-300)+(1.017)+(16.004), (I-300)+(1.017)+(16.005), (I-300)+(1.017)+(16.006), (I-300)+(1.017)+(16.007), (I-300)+(1.017)+(16.008), (I-300)+(1.017)+(17.001), (I-300)+(1.017)+(17.002), (I-300)+(1.017)+(17.003), (I-300)+(1.017)+(17.004), (I-300)+(1.017)+(17.005), (I-300)+(1.017)+(17.006), (I-300)+(1.017)+(17.007), (I-300)+(1.017)+(17.008), (I-300)+(1.017)+(17.009), (I-300)+(1.017)+(17.010), (I-300)+(1.017)+(17.011), (I-300)+(1.017)+(17.012), (I-300)+(1.017)+(18.001), (I-300)+(1.018)+(1.019), (I-300)+(1.018)+(1.020), (I-300)+(1.018)+(1.021), (I-300)+(1.018)+(1.022), (I-300)+(1.018)+(1.023), (I-300)+(1.018)+(1.024), (I-300)+(1.018)+(1.025), (I-300)+(1.018)+(1.026), (I-300)+(1.018)+(1.027), (I-300)+(1.018)+(1.028), (I-300)+(1.018)+(1.029), (I-300)+(1.018)+(1.030), (I-300)+(1.018)+(1.031), (I-300)+(1.018)+(1.032), (I-300)+(1.018)+(1.033), (I-300)+(1.018)+(1.034), (I-300)+(1.018)+(1.035), (I-300)+(1.018)+(1.036), (I-300)+(1.018)+(1.037), (I-300)+(1.018)+(1.038), (I-300)+(1.018)+(1.039), (I-300)+(1.018)+(1.040), (I-300)+(1.018)+(1.041), (I-300)+(1.018)+(1.042), (I-300)+(1.018)+(1.043), (I-300)+(1.018)+(1.044), (I-300)+(1.018)+(1.045), (I-300)+(1.018)+(1.046), (I-300)+(1.018)+(1.047), (I-300)+(1.018)+(1.048), (I-300)+(1.018)+(1.049), (I-300)+(1.018)+(1.050), (I-300)+(1.018)+(1.051), (I-300)+(1.018)+(1.052), (I-300)+(1.018)+(1.053), (I-300)+(1.018)+(1.054), (I-300)+(1.018)+(1.055), (I-300)+(1.018)+(1.056), (I-300)+(1.018)+(1.057), (I-300)+(1.018)+(1.058), (I-300)+(1.018)+(1.059), (I-300)+(1.018)+(1.060), (I-300)+(1.018)+(1.061), (I-300)+(1.018)+(1.062), (I-300)+(1.018)+(1.063), (I-300)+(1.018)+(1.064), (I-300)+(1.018)+(1.065), (I-300)+(1.018)+(1.066), (I-300)+(1.018)+(1.067), (I-300)+(1.018)+(1.068), (I-300)+(1.018)+(1.069), (I-300)+(1.018)+(1.070), (I-300)+(1.018)+(1.071), (I-300)+(1.018)+(1.072), (I-300)+(1.018)+(1.073), (I-300)+(1.018)+(1.074), (I-300)+(1.018)+(1.075), (I-300)+(1.018)+(1.076), (I-300)+(1.018)+(1.077), (I-300)+(1.018)+(1.078), (I-300)+(1.018)+(1.079), (I-300)+(1.018)+(1.080), (I-300)+(1.018)+(1.081), (I-300)+(1.018)+(1.082), (I-300)+(1.018)+(1.083), (I-300)+(1.018)+(1.084), (I-300)+(1.018)+(1.085), (I-300)+(1.018)+(1.086), (I-300)+(1.018)+(1.087), (I-300)+(1.018)+(1.088), (I-300)+(1.018)+(1.089), (I-300)+(1.018)+(1.090), (I-300)+(1.018)+(1.091), (I-300)+(1.018)+(1.092), (I-300)+(1.018)+(2.001), (I-300)+(1.018)+(2.002), (I-300)+(1.018)+(2.003), (I-300)+(1.018)+(2.004), (I-300)+(1.018)+(2.005), (I-300)+(1.018)+(2.006), (I-300)+(1.018)+(2.007), (I-300)+(1.018)+(2.008), (I-300)+(1.018)+(2.009), (I-300)+(1.018)+(2.010), (I-300)+(1.018)+(2.011), (I-300)+(1.018)+(2.012), (I-300)+(1.018)+(2.013), (I-300)+(1.018)+(2.014), (I-300)+(1.018)+(2.015), (I-300)+(1.018)+(2.016), (I-300)+(1.018)+(2.017), (I-300)+(1.018)+(2.018), (I-300)+(1.018)+(2.019), (I-300)+(1.018)+(2.020), (I-300)+(1.018)+(2.021), (I-300)+(1.018)+(2.022), (I-300)+(1.018)+(2.023), (I-300)+(1.018)+(2.024), (I-300)+(1.018)+(2.025), (I-300)+(1.018)+(2.026), (I-300)+(1.018)+(2.027), (I-300)+(1.018)+(2.028), (I-300)+(1.018)+(2.029), (I-300)+(1.018)+(2.030), (I-300)+(1.018)+(2.031), (I-300)+(1.018)+(2.032), (I-300)+(1.018)+(2.033), (I-300)+(1.018)+(2.034), (I-300)+(1.018)+(2.035), (I-300)+(1.018)+(2.036), (I-300)+(1.018)+(2.037), (I-300)+(1.018)+(2.038), (I-300)+(1.018)+(2.039), (I-300)+(1.018)+(2.040), (I-300)+(1.018)+(2.041), (I-300)+(1.018)+(2.042), (I-300)+(1.018)+(2.043), (I-300)+(1.018)+(2.044), (I-300)+(1.018)+(2.045), (I-300)+(1.018)+(2.046), (I-300)+(1.018)+(2.047), (I-300)+(1.018)+(2.048), (I-300)+(1.018)+(2.049), (I-300)+(1.018)+(2.050), (I-300)+(1.018)+(2.051), (I-300)+(1.018)+(2.052), (I-300)+(1.018)+(2.053), (I-300)+(1.018)+(2.054), (I-300)+(1.018)+(2.055), (I-300)+(1.018)+(2.056), (I-300)+(1.018)+(2.057), (I-300)+(1.018)+(2.058), (I-300)+(1.018)+(2.059), (I-300)+(1.018)+(3.001), (I-300)+(1.018)+(3.002), (I-300)+(1.018)+(3.003), (I-300)+(1.018)+(3.004), (I-300)+(1.018)+(3.005), (I-300)+(1.018)+(3.006), (I-300)+(1.018)+(3.007), (I-300)+(1.018)+(3.008), (I-300)+(1.018)+(3.009), (I-300)+(1.018)+(3.010), (I-300)+(1.018)+(3.011), (I-300)+(1.018)+(3.012), (I-300)+(1.018)+(3.013), (I-300)+(1.018)+(3.014), (I-300)+(1.018)+(3.015), (I-300)+(1.018)+(3.016), (I-300)+(1.018)+(3.017), (I-300)+(1.018)+(3.018), (I-300)+(1.018)+(3.019), (I-300)+(1.018)+(3.020), (I-300)+(1.018)+(3.021), (I-300)+(1.018)+(3.022), (I-300)+(1.018)+(3.023), (I-300)+(1.018)+(3.024), (I-300)+(1.018)+(3.025), (I-300)+(1.018)+(3.026), (I-300)+(1.018)+(3.027), (I-300)+(1.018)+(3.028), (I-300)+(1.018)+(3.029), (I-300)+(1.018)+(3.030), (I-300)+(1.018)+(3.031), (I-300)+(1.018)+(5.001), (I-300)+(1.018)+(5.002), (I-300)+(1.018)+(5.003), (I-300)+(1.018)+(5.004), (I-300)+(1.018)+(5.005), (I-300)+(1.018)+(5.006), (I-300)+(1.018)+(5.007), (I-300)+(1.018)+(5.008), (I-300)+(1.018)+(5.009), (I-300)+(1.018)+(5.010), (I-300)+(1.018)+(5.011), (I-300)+(1.018)+(5.012), (I-300)+(1.018)+(5.013), (I-300)+(1.018)+(5.014), (I-300)+(1.018)+(5.015), (I-300)+(1.018)+(5.016), (I-300)+(1.018)+(5.017), (I-300)+(1.018)+(5.018), (I-300)+(1.018)+(5.019), (I-300)+(1.018)+(5.020), (I-300)+(1.018)+(5.021), (I-300)+(1.018)+(5.022), (I-300)+(1.018)+(5.023), (I-300)+(1.018)+(6.001), (I-300)+(1.018)+(6.002), (I-300)+(1.018)+(6.003), (I-300)+(1.018)+(6.004), (I-300)+(1.018)+(7.001), (I-300)+(1.018)+(7.002), (I-300)+(1.018)+(7.003), (I-300)+(1.018)+(7.004), (I-300)+(1.018)+(7.005), (I-300)+(1.018)+(7.006), (I-300)+(1.018)+(9.001), (I-300)+(1.018)+(9.002), (I-300)+(1.018)+(9.003), (I-300)+(1.018)+(9.004), (I-300)+(1.018)+(9.005), (I-300)+(1.018)+(9.006), (I-300)+(1.018)+(9.007), (I-300)+(1.018)+(9.008), (I-300)+(1.018)+(9.009), (I-300)+(1.018)+(14.001), (I-300)+(1.018)+(14.002), (I-300)+(1.018)+(15.008), (I-300)+(1.018)+(15.011), (I-300)+(1.018)+(15.012), (I-300)+(1.018)+(15.016), (I-300)+(1.018)+(15.025), (I-300)+(1.018)+(15.027), (I-300)+(1.018)+(15.047), (I-300)+(1.018)+(15.063), (I-300)+(1.018)+(15.064), (I-300)+(1.018)+(16.001), (I-300)+(1.018)+(16.002), (I-300)+(1.018)+(16.003), (I-300)+(1.018)+(16.004), (I-300)+(1.018)+(16.005), (I-300)+(1.018)+(16.006), (I-300)+(1.018)+(16.007), (I-300)+(1.018)+(16.008), (I-300)+(1.018)+(17.001), (I-300)+(1.018)+(17.002), (I-300)+(1.018)+(17.003), (I-300)+(1.018)+(17.004), (I-300)+(1.018)+(17.005), (I-300)+(1.018)+(17.006), (I-300)+(1.018)+(17.007), (I-300)+(1.018)+(17.008), (I-300)+(1.018)+(17.009), (I-300)+(1.018)+(17.010), (I-300)+(1.018)+(17.011), (I-300)+(1.018)+(17.012), (I-300)+(1.018)+(18.001), (I-300)+(1.019)+(1.020), (I-300)+(1.019)+(1.021), (I-300)+(1.019)+(1.022), (I-300)+(1.019)+(1.023), (I-300)+(1.019)+(1.024), (I-300)+(1.019)+(1.025), (I-300)+(1.019)+(1.026), (I-300)+(1.019)+(1.027), (I-300)+(1.019)+(1.028), (I-300)+(1.019)+(1.029), (I-300)+(1.019)+(1.030), (I-300)+(1.019)+(1.031), (I-300)+(1.019)+(1.032), (I-300)+(1.019)+(1.033), (I-300)+(1.019)+(1.034), (I-300)+(1.019)+(1.035), (I-300)+(1.019)+(1.036), (I-300)+(1.019)+(1.037), (I-300)+(1.019)+(1.038), (I-300)+(1.019)+(1.039), (I-300)+(1.019)+(1.040), (I-300)+(1.019)+(1.041), (I-300)+(1.019)+(1.042), (I-300)+(1.019)+(1.043), (I-300)+(1.019)+(1.044), (I-300)+(1.019)+(1.045), (I-300)+(1.019)+(1.046), (I-300)+(1.019)+(1.047), (I-300)+(1.019)+(1.048), (I-300)+(1.019)+(1.049), (I-300)+(1.019)+(1.050), (I-300)+(1.019)+(1.051), (I-300)+(1.019)+(1.052), (I-300)+(1.019)+(1.053), (I-300)+(1.019)+(1.054), (I-300)+(1.019)+(1.055), (I-300)+(1.019)+(1.056), (I-300)+(1.019)+(1.057), (I-300)+(1.019)+(1.058), (I-300)+(1.019)+(1.059), (I-300)+(1.019)+(1.060), (I-300)+(1.019)+(1.061), (I-300)+(1.019)+(1.062), (I-300)+(1.019)+(1.063), (I-300)+(1.019)+(1.064), (I-300)+(1.019)+(1.065), (I-300)+(1.019)+(1.066), (I-300)+(1.019)+(1.067), (I-300)+(1.019)+(1.068), (I-300)+(1.019)+(1.069), (I-300)+(1.019)+(1.070), (I-300)+(1.019)+(1.071), (I-300)+(1.019)+(1.072), (I-300)+(1.019)+(1.073), (I-300)+(1.019)+(1.074), (I-300)+(1.019)+(1.075), (I-300)+(1.019)+(1.076), (I-300)+(1.019)+(1.077), (I-300)+(1.019)+(1.078), (I-300)+(1.019)+(1.079), (I-300)+(1.019)+(1.080), (I-300)+(1.019)+(1.081), (I-300)+(1.019)+(1.082), (I-300)+(1.019)+(1.083), (I-300)+(1.019)+(1.084), (I-300)+(1.019)+(1.085), (I-300)+(1.019)+(1.086), (I-300)+(1.019)+(1.087), (I-300)+(1.019)+(1.088), (I-300)+(1.019)+(1.089), (I-300)+(1.019)+(1.090), (I-300)+(1.019)+(1.091), (I-300)+(1.019)+(1.092), (I-300)+(1.019)+(2.001), (I-300)+(1.019)+(2.002), (I-300)+(1.019)+(2.003), (I-300)+(1.019)+(2.004), (I-300)+(1.019)+(2.005), (I-300)+(1.019)+(2.006), (I-300)+(1.019)+(2.007), (I-300)+(1.019)+(2.008), (I-300)+(1.019)+(2.009), (I-300)+(1.019)+(2.010), (I-300)+(1.019)+(2.011), (I-300)+(1.019)+(2.012), (I-300)+(1.019)+(2.013), (I-300)+(1.019)+(2.014), (I-300)+(1.019)+(2.015), (I-300)+(1.019)+(2.016), (I-300)+(1.019)+(2.017), (I-300)+(1.019)+(2.018), (I-300)+(1.019)+(2.019), (I-300)+(1.019)+(2.020), (I-300)+(1.019)+(2.021), (I-300)+(1.019)+(2.022), (I-300)+(1.019)+(2.023), (I-300)+(1.019)+(2.024), (I-300)+(1.019)+(2.025), (I-300)+(1.019)+(2.026), (I-300)+(1.019)+(2.027), (I-300)+(1.019)+(2.028), (I-300)+(1.019)+(2.029), (I-300)+(1.019)+(2.030), (I-300)+(1.019)+(2.031), (I-300)+(1.019)+(2.032), (I-300)+(1.019)+(2.033), (I-300)+(1.019)+(2.034), (I-300)+(1.019)+(2.035), (I-300)+(1.019)+(2.036), (I-300)+(1.019)+(2.037), (I-300)+(1.019)+(2.038), (I-300)+(1.019)+(2.039), (I-300)+(1.019)+(2.040), (I-300)+(1.019)+(2.041), (I-300)+(1.019)+(2.042), (I-300)+(1.019)+(2.043), (I-300)+(1.019)+(2.044), (I-300)+(1.019)+(2.045), (I-300)+(1.019)+(2.046), (I-300)+(1.019)+(2.047), (I-300)+(1.019)+(2.048), (I-300)+(1.019)+(2.049), (I-300)+(1.019)+(2.050), (I-300)+(1.019)+(2.051), (I-300)+(1.019)+(2.052), (I-300)+(1.019)+(2.053), (I-300)+(1.019)+(2.054), (I-300)+(1.019)+(2.055), (I-300)+(1.019)+(2.056), (I-300)+(1.019)+(2.057), (I-300)+(1.019)+(2.058), (I-300)+(1.019)+(2.059), (I-300)+(1.019)+(3.001), (I-300)+(1.019)+(3.002), (I-300)+(1.019)+(3.003), (I-300)+(1.019)+(3.004), (I-300)+(1.019)+(3.005), (I-300)+(1.019)+(3.006), (I-300)+(1.019)+(3.007), (I-300)+(1.019)+(3.008), (I-300)+(1.019)+(3.009), (I-300)+(1.019)+(3.010), (I-300)+(1.019)+(3.011), (I-300)+(1.019)+(3.012), (I-300)+(1.019)+(3.013), (I-300)+(1.019)+(3.014), (I-300)+(1.019)+(3.015), (I-300)+(1.019)+(3.016), (I-300)+(1.019)+(3.017), (I-300)+(1.019)+(3.018), (I-300)+(1.019)+(3.019), (I-300)+(1.019)+(3.020), (I-300)+(1.019)+(3.021), (I-300)+(1.019)+(3.022), (I-300)+(1.019)+(3.023), (I-300)+(1.019)+(3.024), (I-300)+(1.019)+(3.025), (I-300)+(1.019)+(3.026), (I-300)+(1.019)+(3.027), (I-300)+(1.019)+(3.028), (I-300)+(1.019)+(3.029), (I-300)+(1.019)+(3.030), (I-300)+(1.019)+(3.031), (I-300)+(1.019)+(5.001), (I-300)+(1.019)+(5.002), (I-300)+(1.019)+(5.003), (I-300)+(1.019)+(5.004), (I-300)+(1.019)+(5.005), (I-300)+(1.019)+(5.006), (I-300)+(1.019)+(5.007), (I-300)+(1.019)+(5.008), (I-300)+(1.019)+(5.009), (I-300)+(1.019)+(5.010), (I-300)+(1.019)+(5.011), (I-300)+(1.019)+(5.012), (I-300)+(1.019)+(5.013), (I-300)+(1.019)+(5.014), (I-300)+(1.019)+(5.015), (I-300)+(1.019)+(5.016), (I-300)+(1.019)+(5.017), (I-300)+(1.019)+(5.018), (I-300)+(1.019)+(5.019), (I-300)+(1.019)+(5.020), (I-300)+(1.019)+(5.021), (I-300)+(1.019)+(5.022), (I-300)+(1.019)+(5.023), (I-300)+(1.019)+(6.001), (I-300)+(1.019)+(6.002), (I-300)+(1.019)+(6.003), (I-300)+(1.019)+(6.004), (I-300)+(1.019)+(7.001), (I-300)+(1.019)+(7.002), (I-300)+(1.019)+(7.003), (I-300)+(1.019)+(7.004), (I-300)+(1.019)+(7.005), (I-300)+(1.019)+(7.006), (I-300)+(1.019)+(9.001), (I-300)+(1.019)+(9.002), (I-300)+(1.019)+(9.003), (I-300)+(1.019)+(9.004), (I-300)+(1.019)+(9.005), (I-300)+(1.019)+(9.006), (I-300)+(1.019)+(9.007), (I-300)+(1.019)+(9.008), (I-300)+(1.019)+(9.009), (I-300)+(1.019)+(14.001), (I-300)+(1.019)+(14.002), (I-300)+(1.019)+(15.008), (I-300)+(1.019)+(15.011), (I-300)+(1.019)+(15.012), (I-300)+(1.019)+(15.016), (I-300)+(1.019)+(15.025), (I-300)+(1.019)+(15.027), (I-300)+(1.019)+(15.047), (I-300)+(1.019)+(15.063), (I-300)+(1.019)+(15.064), (I-300)+(1.019)+(16.001), (I-300)+(1.019)+(16.002), (I-300)+(1.019)+(16.003), (I-300)+(1.019)+(16.004), (I-300)+(1.019)+(16.005), (I-300)+(1.019)+(16.006), (I-300)+(1.019)+(16.007), (I-300)+(1.019)+(16.008), (I-300)+(1.019)+(17.001), (I-300)+(1.019)+(17.002), (I-300)+(1.019)+(17.003), (I-300)+(1.019)+(17.004), (I-300)+(1.019)+(17.005), (I-300)+(1.019)+(17.006), (I-300)+(1.019)+(17.007), (I-300)+(1.019)+(17.008), (I-300)+(1.019)+(17.009), (I-300)+(1.019)+(17.010), (I-300)+(1.019)+(17.011), (I-300)+(1.019)+(17.012), (I-300)+(1.019)+(18.001),
(I-300)+(1.020)+(1.021), (I-300)+(1.020)+(1.022), (I-300)+(1.020)+(1.023), (I-300)+(1.020)+(1.024), (I-300)+(1.020)+(1.025), (I-300)+(1.020)+(1.026), (I-300)+(1.020)+(1.027), (I-300)+(1.020)+(1.028), (I-300)+(1.020)+(1.029), (I-300)+(1.020)+(1.030), (I-300)+(1.020)+(1.031), (I-300)+(1.020)+(1.032), (I-300)+(1.020)+(1.033), (I-300)+(1.020)+(1.034), (I-300)+(1.020)+(1.035), (I-300)+(1.020)+(1.036), (I-300)+(1.020)+(1.037), (I-300)+(1.020)+(1.038), (I-300)+(1.020)+(1.039), (I-300)+(1.020)+(1.040), (I-300)+(1.020)+(1.041), (I-300)+(1.020)+(1.042), (I-300)+(1.020)+(1.043), (I-300)+(1.020)+(1.044), (I-300)+(1.020)+(1.045), (I-300)+(1.020)+(1.046), (I-300)+(1.020)+(1.047), (I-300)+(1.020)+(1.048), (I-300)+(1.020)+(1.049), (I-300)+(1.020)+(1.050), (I-300)+(1.020)+(1.051), (I-300)+(1.020)+(1.052), (I-300)+(1.020)+(1.053), (I-300)+(1.020)+(1.054), (I-300)+(1.020)+(1.055), (I-300)+(1.020)+(1.056), (I-300)+(1.020)+(1.057), (I-300)+(1.020)+(1.058), (I-300)+(1.020)+(1.059), (I-300)+(1.020)+(1.060), (I-300)+(1.020)+(1.061), (I-300)+(1.020)+(1.062), (I-300)+(1.020)+(1.063), (I-300)+(1.020)+(1.064), (I-300)+(1.020)+(1.065), (I-300)+(1.020)+(1.066), (I-300)+(1.020)+(1.067), (I-300)+(1.020)+(1.068), (I-300)+(1.020)+(1.069), (I-300)+(1.020)+(1.070), (I-300)+(1.020)+(1.071), (I-300)+(1.020)+(1.072), (I-300)+(1.020)+(1.073), (I-300)+(1.020)+(1.074), (I-300)+(1.020)+(1.075), (I-300)+(1.020)+(1.076), (I-300)+(1.020)+(1.077), (I-300)+(1.020)+(1.078), (I-300)+(1.020)+(1.079), (I-300)+(1.020)+(1.080), (I-300)+(1.020)+(1.081), (I-300)+(1.020)+(1.082), (I-300)+(1.020)+(1.083), (I-300)+(1.020)+(1.084), (I-300)+(1.020)+(1.085), (I-300)+(1.020)+(1.086), (I-300)+(1.020)+(1.087), (I-300)+(1.020)+(1.088), (I-300)+(1.020)+(1.089), (I-300)+(1.020)+(1.090), (I-300)+(1.020)+(1.091), (I-300)+(1.020)+(1.092), (I-300)+(1.020)+(2.001), (I-300)+(1.020)+(2.002), (I-300)+(1.020)+(2.003), (I-300)+(1.020)+(2.004), (I-300)+(1.020)+(2.005), (I-300)+(1.020)+(2.006), (I-300)+(1.020)+(2.007), (I-300)+(1.020)+(2.008), (I-300)+(1.020)+(2.009), (I-300)+(1.020)+(2.010), (I-300)+(1.020)+(2.011), (I-300)+(1.020)+(2.012), (I-300)+(1.020)+(2.013), (I-300)+(1.020)+(2.014), (I-300)+(1.020)+(2.015), (I-300)+(1.020)+(2.016), (I-300)+(1.020)+(2.017), (I-300)+(1.020)+(2.018), (I-300)+(1.020)+(2.019), (I-300)+(1.020)+(2.020), (I-300)+(1.020)+(2.021), (I-300)+(1.020)+(2.022), (I-300)+(1.020)+(2.023), (I-300)+(1.020)+(2.024), (I-300)+(1.020)+(2.025), (I-300)+(1.020)+(2.026), (I-300)+(1.020)+(2.027), (I-300)+(1.020)+(2.028), (I-300)+(1.020)+(2.029), (I-300)+(1.020)+(2.030), (I-300)+(1.020)+(2.031), (I-300)+(1.020)+(2.032), (I-300)+(1.020)+(2.033), (I-300)+(1.020)+(2.034), (I-300)+(1.020)+(2.035), (I-300)+(1.020)+(2.036), (I-300)+(1.020)+(2.037), (I-300)+(1.020)+(2.038), (I-300)+(1.020)+(2.039), (I-300)+(1.020)+(2.040), (I-300)+(1.020)+(2.041), (I-300)+(1.020)+(2.042), (I-300)+(1.020)+(2.043), (I-300)+(1.020)+(2.044), (I-300)+(1.020)+(2.045), (I-300)+(1.020)+(2.046), (I-300)+(1.020)+(2.047), (I-300)+(1.020)+(2.048), (I-300)+(1.020)+(2.049), (I-300)+(1.020)+(2.050), (I-300)+(1.020)+(2.051), (I-300)+(1.020)+(2.052), (I-300)+(1.020)+(2.053), (I-300)+(1.020)+(2.054), (I-300)+(1.020)+(2.055), (I-300)+(1.020)+(2.056), (I-300)+(1.020)+(2.057), (I-300)+(1.020)+(2.058), (I-300)+(1.020)+(2.059), (I-300)+(1.020)+(3.001), (I-300)+(1.020)+(3.002), (I-300)+(1.020)+(3.003), (I-300)+(1.020)+(3.004), (I-300)+(1.020)+(3.005), (I-300)+(1.020)+(3.006), (I-300)+(1.020)+(3.007), (I-300)+(1.020)+(3.008), (I-300)+(1.020)+(3.009), (I-300)+(1.020)+(3.010), (I-300)+(1.020)+(3.011), (I-300)+(1.020)+(3.012), (I-300)+(1.020)+(3.013), (I-300)+(1.020)+(3.014), (I-300)+(1.020)+(3.015), (I-300)+(1.020)+(3.016), (I-300)+(1.020)+(3.017), (I-300)+(1.020)+(3.018), (I-300)+(1.020)+(3.019), (I-300)+(1.020)+(3.020), (I-300)+(1.020)+(3.021), (I-300)+(1.020)+(3.022), (I-300)+(1.020)+(3.023), (I-300)+(1.020)+(3.024), (I-300)+(1.020)+(3.025), (I-300)+(1.020)+(3.026), (I-300)+(1.020)+(3.027), (I-300)+(1.020)+(3.028), (I-300)+(1.020)+(3.029), (I-300)+(1.020)+(3.030), (I-300)+(1.020)+(3.031), (I-300)+(1.020)+(5.001), (I-300)+(1.020)+(5.002), (I-300)+(1.020)+(5.003), (I-300)+(1.020)+(5.004), (I-300)+(1.020)+(5.005), (I-300)+(1.020)+(5.006), (I-300)+(1.020)+(5.007), (I-300)+(1.020)+(5.008), (I-300)+(1.020)+(5.009), (I-300)+(1.020)+(5.010), (I-300)+(1.020)+(5.011), (I-300)+(1.020)+(5.012), (I-300)+(1.020)+(5.013), (I-300)+(1.020)+(5.014), (I-300)+(1.020)+(5.015), (I-300)+(1.020)+(5.016), (I-300)+(1.020)+(5.017), (I-300)+(1.020)+(5.018), (I-300)+(1.020)+(5.019), (I-300)+(1.020)+(5.020), (I-300)+(1.020)+(5.021), (I-300)+(1.020)+(5.022), (I-300)+(1.020)+(5.023), (I-300)+(1.020)+(6.001), (I-300)+(1.020)+(6.002), (I-300)+(1.020)+(6.003), (I-300)+(1.020)+(6.004), (I-300)+(1.020)+(7.001), (I-300)+(1.020)+(7.002), (I-300)+(1.020)+(7.003), (I-300)+(1.020)+(7.004), (I-300)+(1.020)+(7.005), (I-300)+(1.020)+(7.006), (I-300)+(1.020)+(9.001), (I-300)+(1.020)+(9.002), (I-300)+(1.020)+(9.003), (I-300)+(1.020)+(9.004), (I-300)+(1.020)+(9.005), (I-300)+(1.020)+(9.006), (I-300)+(1.020)+(9.007), (I-300)+(1.020)+(9.008), (I-300)+(1.020)+(9.009), (I-300)+(1.020)+(14.001), (I-300)+(1.020)+(14.002), (I-300)+(1.020)+(15.008), (I-300)+(1.020)+(15.011), (I-300)+(1.020)+(15.012), (I-300)+(1.020)+(15.016), (I-300)+(1.020)+(15.025), (I-300)+(1.020)+(15.027), (I-300)+(1.020)+(15.047), (I-300)+(1.020)+(15.063), (I-300)+(1.020)+(15.064), (I-300)+(1.020)+(16.001), (I-300)+(1.020)+(16.002), (I-300)+(1.020)+(16.003), (I-300)+(1.020)+(16.004), (I-300)+(1.020)+(16.005), (I-300)+(1.020)+(16.006), (I-300)+(1.020)+(16.007), (I-300)+(1.020)+(16.008), (I-300)+(1.020)+(17.001), (I-300)+(1.020)+(17.002), (I-300)+(1.020)+(17.003), (I-300)+(1.020)+(17.004), (I-300)+(1.020)+(17.005), (I-300)+(1.020)+(17.006), (I-300)+(1.020)+(17.007), (I-300)+(1.020)+(17.008), (I-300)+(1.020)+(17.009), (I-300)+(1.020)+(17.010), (I-300)+(1.020)+(17.011), (I-300)+(1.020)+(17.012), (I-300)+(1.020)+(18.001),
(I-300)+(1.021)+(1.022), (I-300)+(1.021)+(1.023), (I-300)+(1.021)+(1.024), (I-300)+(1.021)+(1.025), (I-300)+(1.021)+(1.026), (I-300)+(1.021)+(1.027), (I-300)+(1.021)+(1.028), (I-300)+(1.021)+(1.029), (I-300)+(1.021)+(1.030), (I-300)+(1.021)+(1.031), (I-300)+(1.021)+(1.032), (I-300)+(1.021)+(1.033), (I-300)+(1.021)+(1.034), (I-300)+(1.021)+(1.035), (I-300)+(1.021)+(1.036), (I-300)+(1.021)+(1.037), (I-300)+(1.021)+(1.038), (I-300)+(1.021)+(1.039), (I-300)+(1.021)+(1.040), (I-300)+(1.021)+(1.041), (I-300)+(1.021)+(1.042), (I-300)+(1.021)+(1.043), (I-300)+(1.021)+(1.044), (I-300)+(1.021)+(1.045), (I-300)+(1.021)+(1.046), (I-300)+(1.021)+(1.047), (I-300)+(1.021)+(1.048), (I-300)+(1.021)+(1.049), (I-300)+(1.021)+(1.050), (I-300)+(1.021)+(1.051), (I-300)+(1.021)+(1.052), (I-300)+(1.021)+(1.053), (I-300)+(1.021)+(1.054), (I-300)+(1.021)+(1.055), (I-300)+(1.021)+(1.056), (I-300)+(1.021)+(1.057), (I-300)+(1.021)+(1.058), (I-300)+(1.021)+(1.059), (I-300)+(1.021)+(1.060), (I-300)+(1.021)+(1.061), (I-300)+(1.021)+(1.062), (I-300)+(1.021)+(1.063), (I-300)+(1.021)+(1.064), (I-300)+(1.021)+(1.065), (I-300)+(1.021)+(1.066), (I-300)+(1.021)+(1.067), (I-300)+(1.021)+(1.068), (I-300)+(1.021)+(1.069), (I-300)+(1.021)+(1.070), (I-300)+(1.021)+(1.071), (I-300)+(1.021)+(1.072), (I-300)+(1.021)+(1.073), (I-300)+(1.021)+(1.074), (I-300)+(1.021)+(1.075), (I-300)+(1.021)+(1.076), (I-300)+(1.021)+(1.077), (I-300)+(1.021)+(1.078), (I-300)+(1.021)+(1.079), (I-300)+(1.021)+(1.080), (I-300)+(1.021)+(1.081), (I-300)+(1.021)+(1.082), (I-300)+(1.021)+(1.083), (I-300)+(1.021)+(1.084), (I-300)+(1.021)+(1.085), (I-300)+(1.021)+(1.086), (I-300)+(1.021)+(1.087), (I-300)+(1.021)+(1.088), (I-300)+(1.021)+(1.089), (I-300)+(1.021)+(1.090), (I-300)+(1.021)+(1.091), (I-300)+(1.021)+(1.092), (I-300)+(1.021)+(2.001), (I-300)+(1.021)+(2.002), (I-300)+(1.021)+(2.003), (I-300)+(1.021)+(2.004), (I-300)+(1.021)+(2.005), (I-300)+(1.021)+(2.006), (I-300)+(1.021)+(2.007), (I-300)+(1.021)+(2.008), (I-300)+(1.021)+(2.009), (I-300)+(1.021)+(2.010), (I-300)+(1.021)+(2.011), (I-300)+(1.021)+(2.012), (I-300)+(1.021)+(2.013), (I-300)+(1.021)+(2.014), (I-300)+(1.021)+(2.015), (I-300)+(1.021)+(2.016), (I-300)+(1.021)+(2.017), (I-300)+(1.021)+(2.018), (I-300)+(1.021)+(2.019), (I-300)+(1.021)+(2.020), (I-300)+(1.021)+(2.021), (I-300)+(1.021)+(2.022), (I-300)+(1.021)+(2.023), (I-300)+(1.021)+(2.024), (I-300)+(1.021)+(2.025), (I-300)+(1.021)+(2.026), (I-300)+(1.021)+(2.027), (I-300)+(1.021)+(2.028), (I-300)+(1.021)+(2.029), (I-300)+(1.021)+(2.030), (I-300)+(1.021)+(2.031), (I-300)+(1.021)+(2.032), (I-300)+(1.021)+(2.033), (I-300)+(1.021)+(2.034), (I-300)+(1.021)+(2.035), (I-300)+(1.021)+(2.036), (I-300)+(1.021)+(2.037), (I-300)+(1.021)+(2.038), (I-300)+(1.021)+(2.039), (I-300)+(1.021)+(2.040), (I-300)+(1.021)+(2.041), (I-300)+(1.021)+(2.042), (I-300)+(1.021)+(2.043), (I-300)+(1.021)+(2.044), (I-300)+(1.021)+(2.045), (I-300)+(1.021)+(2.046), (I-300)+(1.021)+(2.047), (I-300)+(1.021)+(2.048), (I-300)+(1.021)+(2.049), (I-300)+(1.021)+(2.050), (I-300)+(1.021)+(2.051), (I-300)+(1.021)+(2.052), (I-300)+(1.021)+(2.053), (I-300)+(1.021)+(2.054), (I-300)+(1.021)+(2.055), (I-300)+(1.021)+(2.056), (I-300)+(1.021)+(2.057), (I-300)+(1.021)+(2.058), (I-300)+(1.021)+(2.059), (I-300)+(1.021)+(3.001), (I-300)+(1.021)+(3.002), (I-300)+(1.021)+(3.003), (I-300)+(1.021)+(3.004), (I-300)+(1.021)+(3.005), (I-300)+(1.021)+(3.006), (I-300)+(1.021)+(3.007), (I-300)+(1.021)+(3.008), (I-300)+(1.021)+(3.009), (I-300)+(1.021)+(3.010), (I-300)+(1.021)+(3.011), (I-300)+(1.021)+(3.012), (I-300)+(1.021)+(3.013), (I-300)+(1.021)+(3.014), (I-300)+(1.021)+(3.015), (I-300)+(1.021)+(3.016), (I-300)+(1.021)+(3.017), (I-300)+(1.021)+(3.018), (I-300)+(1.021)+(3.019), (I-300)+(1.021)+(3.020), (I-300)+(1.021)+(3.021), (I-300)+(1.021)+(3.022), (I-300)+(1.021)+(3.023), (I-300)+(1.021)+(3.024), (I-300)+(1.021)+(3.025), (I-300)+(1.021)+(3.026), (I-300)+(1.021)+(3.027), (I-300)+(1.021)+(3.028), (I-300)+(1.021)+(3.029), (I-300)+(1.021)+(3.030), (I-300)+(1.021)+(3.031), (I-300)+(1.021)+(5.001), (I-300)+(1.021)+(5.002), (I-300)+(1.021)+(5.003), (I-300)+(1.021)+(5.004), (I-300)+(1.021)+(5.005), (I-300)+(1.021)+(5.006), (I-300)+(1.021)+(5.007), (I-300)+(1.021)+(5.008), (I-300)+(1.021)+(5.009), (I-300)+(1.021)+(5.010), (I-300)+(1.021)+(5.011), (I-300)+(1.021)+(5.012), (I-300)+(1.021)+(5.013), (I-300)+(1.021)+(5.014), (I-300)+(1.021)+(5.015), (I-300)+(1.021)+(5.016), (I-300)+(1.021)+(5.017), (I-300)+(1.021)+(5.018), (I-300)+(1.021)+(5.019), (I-300)+(1.021)+(5.020), (I-300)+(1.021)+(5.021), (I-300)+(1.021)+(5.022), (I-300)+(1.021)+(5.023), (I-300)+(1.021)+(6.001), (I-300)+(1.021)+(6.002), (I-300)+(1.021)+(6.003), (I-300)+(1.021)+(6.004), (I-300)+(1.021)+(7.001), (I-300)+(1.021)+(7.002), (I-300)+(1.021)+(7.003), (I-300)+(1.021)+(7.004), (I-300)+(1.021)+(7.005), (I-300)+(1.021)+(7.006), (I-300)+(1.021)+(9.001), (I-300)+(1.021)+(9.002), (I-300)+(1.021)+(9.003), (I-300)+(1.021)+(9.004), (I-300)+(1.021)+(9.005), (I-300)+(1.021)+(9.006), (I-300)+(1.021)+(9.007), (I-300)+(1.021)+(9.008), (I-300)+(1.021)+(9.009), (I-300)+(1.021)+(14.001), (I-300)+(1.021)+(14.002), (I-300)+(1.021)+(15.008), (I-300)+(1.021)+(15.011), (I-300)+(1.021)+(15.012), (I-300)+(1.021)+(15.016), (I-300)+(1.021)+(15.025), (I-300)+(1.021)+(15.027), (I-300)+(1.021)+(15.047), (I-300)+(1.021)+(15.063), (I-300)+(1.021)+(15.064), (I-300)+(1.021)+(16.001), (I-300)+(1.021)+(16.002), (I-300)+(1.021)+(16.003), (I-300)+(1.021)+(16.004), (I-300)+(1.021)+(16.005), (I-300)+(1.021)+(16.006), (I-300)+(1.021)+(16.007), (I-300)+(1.021)+(16.008), (I-300)+(1.021)+(17.001), (I-300)+(1.021)+(17.002), (I-300)+(1.021)+(17.003), (I-300)+(1.021)+(17.004), (I-300)+(1.021)+(17.005), (I-300)+(1.021)+(17.006), (I-300)+(1.021)+(17.007), (I-300)+(1.021)+(17.008), (I-300)+(1.021)+(17.009), (I-300)+(1.021)+(17.010), (I-300)+(1.021)+(17.011), (I-300)+(1.021)+(17.012), (I-300)+(1.021)+(18.001), (I-300)+(1.022)+(1.023), (I-300)+(1.022)+(1.024), (I-300)+(1.022)+(1.025), (I-300)+(1.022)+(1.026), (I-300)+(1.022)+(1.027), (I-300)+(1.022)+(1.028), (I-300)+(1.022)+(1.029), (I-300)+(1.022)+(1.030), (I-300)+(1.022)+(1.031), (I-300)+(1.022)+(1.032), (I-300)+(1.022)+(1.033), (I-300)+(1.022)+(1.034), (I-300)+(1.022)+(1.035), (I-300)+(1.022)+(1.036), (I-300)+(1.022)+(1.037), (I-300)+(1.022)+(1.038), (I-300)+(1.022)+(1.039), (I-300)+(1.022)+(1.040), (I-300)+(1.022)+(1.041), (I-300)+(1.022)+(1.042), (I-300)+(1.022)+(1.043), (I-300)+(1.022)+(1.044), (I-300)+(1.022)+(1.045), (I-300)+(1.022)+(1.046), (I-300)+(1.022)+(1.047), (I-300)+(1.022)+(1.048), (I-300)+(1.022)+(1.049), (I-300)+(1.022)+(1.050), (I-300)+(1.022)+(1.051), (I-300)+(1.022)+(1.052), (I-300)+(1.022)+(1.053), (I-300)+(1.022)+(1.054), (I-300)+(1.022)+(1.055), (I-300)+(1.022)+(1.056), (I-300)+(1.022)+(1.057), (I-300)+(1.022)+(1.058), (I-300)+(1.022)+(1.059), (I-300)+(1.022)+(1.060), (I-300)+(1.022)+(1.061), (I-300)+(1.022)+(1.062), (I-300)+(1.022)+(1.063), (I-300)+(1.022)+(1.064), (I-300)+(1.022)+(1.065), (I-300)+(1.022)+(1.066), (I-300)+(1.022)+(1.067), (I-300)+(1.022)+(1.068), (I-300)+(1.022)+(1.069), (I-300)+(1.022)+(1.070), (I-300)+(1.022)+(1.071), (I-300)+(1.022)+(1.072), (I-300)+(1.022)+(1.073), (I-300)+(1.022)+(1.074), (I-300)+(1.022)+(1.075), (I-300)+(1.022)+(1.076), (I-300)+(1.022)+(1.077), (I-300)+(1.022)+(1.078), (I-300)+(1.022)+(1.079), (I-300)+(1.022)+(1.080), (I-300)+(1.022)+(1.081), (I-300)+(1.022)+(1.082), (I-300)+(1.022)+(1.083), (I-300)+(1.022)+(1.084), (I-300)+(1.022)+(1.085), (I-300)+(1.022)+(1.086), (I-300)+(1.022)+(1.087), (I-300)+(1.022)+(1.088), (I-300)+(1.022)+(1.089), (I-300)+(1.022)+(1.090), (I-300)+(1.022)+(1.091), (I-300)+(1.022)+(1.092), (I-300)+(1.022)+(2.001), (I-300)+(1.022)+(2.002), (I-300)+(1.022)+(2.003), (I-300)+(1.022)+(2.004), (I-300)+(1.022)+(2.005), (I-300)+(1.022)+(2.006), (I-300)+(1.022)+(2.007), (I-300)+(1.022)+(2.008), (I-300)+(1.022)+(2.009), (I-300)+(1.022)+(2.010), (I-300)+(1.022)+(2.011), (I-300)+(1.022)+(2.012), (I-300)+(1.022)+(2.013), (I-300)+(1.022)+(2.014), (I-300)+(1.022)+(2.015), (I-300)+(1.022)+(2.016), (I-300)+(1.022)+(2.017), (I-300)+(1.022)+(2.018), (I-300)+(1.022)+(2.019), (I-300)+(1.022)+(2.020), (I-300)+(1.022)+(2.021), (I-300)+(1.022)+(2.022), (I-300)+(1.022)+(2.023), (I-300)+(1.022)+(2.024), (I-300)+(1.022)+(2.025), (I-300)+(1.022)+(2.026), (I-300)+(1.022)+(2.027), (I-300)+(1.022)+(2.028), (I-300)+(1.022)+(2.029), (I-300)+(1.022)+(2.030), (I-300)+(1.022)+(2.031), (I-300)+(1.022)+(2.032), (I-300)+(1.022)+(2.033), (I-300)+(1.022)+(2.034), (I-300)+(1.022)+(2.035), (I-300)+(1.022)+(2.036), (I-300)+(1.022)+(2.037), (I-300)+(1.022)+(2.038), (I-300)+(1.022)+(2.039), (I-300)+(1.022)+(2.040), (I-300)+(1.022)+(2.041), (I-300)+(1.022)+(2.042), (I-300)+(1.022)+(2.043), (I-300)+(1.022)+(2.044), (I-300)+(1.022)+(2.045), (I-300)+(1.022)+(2.046), (I-300)+(1.022)+(2.047), (I-300)+(1.022)+(2.048), (I-300)+(1.022)+(2.049), (I-300)+(1.022)+(2.050), (I-300)+(1.022)+(2.051), (I-300)+(1.022)+(2.052), (I-300)+(1.022)+(2.053), (I-300)+(1.022)+(2.054), (I-300)+(1.022)+(2.055), (I-300)+(1.022)+(2.056), (I-300)+(1.022)+(2.057), (I-300)+(1.022)+(2.058), (I-300)+(1.022)+(2.059), (I-300)+(1.022)+(3.001), (I-300)+(1.022)+(3.002), (I-300)+(1.022)+(3.003), (I-300)+(1.022)+(3.004), (I-300)+(1.022)+(3.005), (I-300)+(1.022)+(3.006), (I-300)+(1.022)+(3.007), (I-300)+(1.022)+(3.008), (I-300)+(1.022)+(3.009), (I-300)+(1.022)+(3.010), (I-300)+(1.022)+(3.011), (I-300)+(1.022)+(3.012), (I-300)+(1.022)+(3.013), (I-300)+(1.022)+(3.014), (I-300)+(1.022)+(3.015), (I-300)+(1.022)+(3.016), (I-300)+(1.022)+(3.017), (I-300)+(1.022)+(3.018), (I-300)+(1.022)+(3.019), (I-300)+(1.022)+(3.020), (I-300)+(1.022)+(3.021), (I-300)+(1.022)+(3.022), (I-300)+(1.022)+(3.023), (I-300)+(1.022)+(3.024), (I-300)+(1.022)+(3.025), (I-300)+(1.022)+(3.026), (I-300)+(1.022)+(3.027), (I-300)+(1.022)+(3.028), (I-300)+(1.022)+(3.029), (I-300)+(1.022)+(3.030), (I-300)+(1.022)+(3.031), (I-300)+(1.022)+(5.001), (I-300)+(1.022)+(5.002), (I-300)+(1.022)+(5.003), (I-300)+(1.022)+(5.004), (I-300)+(1.022)+(5.005), (I-300)+(1.022)+(5.006), (I-300)+(1.022)+(5.007), (I-300)+(1.022)+(5.008), (I-300)+(1.022)+(5.009), (I-300)+(1.022)+(5.010), (I-300)+(1.022)+(5.011), (I-300)+(1.022)+(5.012), (I-300)+(1.022)+(5.013), (I-300)+(1.022)+(5.014), (I-300)+(1.022)+(5.015), (I-300)+(1.022)+(5.016), (I-300)+(1.022)+(5.017), (I-300)+(1.022)+(5.018), (I-300)+(1.022)+(5.019), (I-300)+(1.022)+(5.020), (I-300)+(1.022)+(5.021), (I-300)+(1.022)+(5.022), (I-300)+(1.022)+(5.023), (I-300)+(1.022)+(6.001), (I-300)+(1.022)+(6.002), (I-300)+(1.022)+(6.003), (I-300)+(1.022)+(6.004), (I-300)+(1.022)+(7.001), (I-300)+(1.022)+(7.002), (I-300)+(1.022)+(7.003), (I-300)+(1.022)+(7.004), (I-300)+(1.022)+(7.005), (I-300)+(1.022)+(7.006), (I-300)+(1.022)+(9.001), (I-300)+(1.022)+(9.002), (I-300)+(1.022)+(9.003), (I-300)+(1.022)+(9.004), (I-300)+(1.022)+(9.005), (I-300)+(1.022)+(9.006), (I-300)+(1.022)+(9.007), (I-300)+(1.022)+(9.008), (I-300)+(1.022)+(9.009), (I-300)+(1.022)+(14.001), (I-300)+(1.022)+(14.002), (I-300)+(1.022)+(15.008), (I-300)+(1.022)+(15.011), (I-300)+(1.022)+(15.012), (I-300)+(1.022)+(15.016), (I-300)+(1.022)+(15.025), (I-300)+(1.022)+(15.027), (I-300)+(1.022)+(15.047), (I-300)+(1.022)+(15.063), (I-300)+(1.022)+(15.064), (I-300)+(1.022)+(16.001), (I-300)+(1.022)+(16.002), (I-300)+(1.022)+(16.003), (I-300)+(1.022)+(16.004), (I-300)+(1.022)+(16.005), (I-300)+(1.022)+(16.006), (I-300)+(1.022)+(16.007), (I-300)+(1.022)+(16.008), (I-300)+(1.022)+(17.001), (I-300)+(1.022)+(17.002), (I-300)+(1.022)+(17.003), (I-300)+(1.022)+(17.004), (I-300)+(1.022)+(17.005), (I-300)+(1.022)+(17.006), (I-300)+(1.022)+(17.007), (I-300)+(1.022)+(17.008), (I-300)+(1.022)+(17.009), (I-300)+(1.022)+(17.010), (I-300)+(1.022)+(17.011), (I-300)+(1.022)+(17.012), (I-300)+(1.022)+(18.001), (I-300)+(1.023)+(1.024), (I-300)+(1.023)+(1.025), (I-300)+(1.023)+(1.026), (I-300)+(1.023)+(1.027), (I-300)+(1.023)+(1.028), (I-300)+(1.023)+(1.029), (I-300)+(1.023)+(1.030), (I-300)+(1.023)+(1.031), (I-300)+(1.023)+(1.032), (I-300)+(1.023)+(1.033), (I-300)+(1.023)+(1.034), (I-300)+(1.023)+(1.035), (I-300)+(1.023)+(1.036), (I-300)+(1.023)+(1.037), (I-300)+(1.023)+(1.038), (I-300)+(1.023)+(1.039), (I-300)+(1.023)+(1.040), (I-300)+(1.023)+(1.041), (I-300)+(1.023)+(1.042), (I-300)+(1.023)+(1.043), (I-300)+(1.023)+(1.044), (I-300)+(1.023)+(1.045), (I-300)+(1.023)+(1.046), (I-300)+(1.023)+(1.047), (I-300)+(1.023)+(1.048), (I-300)+(1.023)+(1.049), (I-300)+(1.023)+(1.050), (I-300)+(1.023)+(1.051), (I-300)+(1.023)+(1.052), (I-300)+(1.023)+(1.053), (I-300)+(1.023)+(1.054), (I-300)+(1.023)+(1.055), (I-300)+(1.023)+(1.056), (I-300)+(1.023)+(1.057), (I-300)+(1.023)+(1.058), (I-300)+(1.023)+(1.059), (I-300)+(1.023)+(1.060), (I-300)+(1.023)+(1.061), (I-300)+(1.023)+(1.062), (I-300)+(1.023)+(1.063), (I-300)+(1.023)+(1.064), (I-300)+(1.023)+(1.065), (I-300)+(1.023)+(1.066), (I-300)+(1.023)+(1.067), (I-300)+(1.023)+(1.068), (I-300)+(1.023)+(1.069), (I-300)+(1.023)+(1.070), (I-300)+(1.023)+(1.071), (I-300)+(1.023)+(1.072), (I-300)+(1.023)+(1.073), (I-300)+(1.023)+(1.074), (I-300)+(1.023)+(1.075), (I-300)+(1.023)+(1.076), (I-300)+(1.023)+(1.077), (I-300)+(1.023)+(1.078), (I-300)+(1.023)+(1.079), (I-300)+(1.023)+(1.080), (I-300)+(1.023)+(1.081), (I-300)+(1.023)+(1.082), (I-300)+(1.023)+(1.083), (I-300)+(1.023)+(1.084), (I-300)+(1.023)+(1.085), (I-300)+(1.023)+(1.086), (I-300)+(1.023)+(1.087), (I-300)+(1.023)+(1.088), (I-300)+(1.023)+(1.089), (I-300)+(1.023)+(1.090), (I-300)+(1.023)+(1.091), (I-300)+(1.023)+(1.092), (I-300)+(1.023)+(2.001), (I-300)+(1.023)+(2.002), (I-300)+(1.023)+(2.003), (I-300)+(1.023)+(2.004), (I-300)+(1.023)+(2.005), (I-300)+(1.023)+(2.006), (I-300)+(1.023)+(2.007), (I-300)+(1.023)+(2.008), (I-300)+(1.023)+(2.009), (I-300)+(1.023)+(2.010), (I-300)+(1.023)+(2.011), (I-300)+(1.023)+(2.012), (I-300)+(1.023)+(2.013), (I-300)+(1.023)+(2.014), (I-300)+(1.023)+(2.015), (I-300)+(1.023)+(2.016), (I-300)+(1.023)+(2.017), (I-300)+(1.023)+(2.018), (I-300)+(1.023)+(2.019), (I-300)+(1.023)+(2.020), (I-300)+(1.023)+(2.021), (I-300)+(1.023)+(2.022), (I-300)+(1.023)+(2.023), (I-300)+(1.023)+(2.024), (I-300)+(1.023)+(2.025), (I-300)+(1.023)+(2.026), (I-300)+(1.023)+(2.027), (I-300)+(1.023)+(2.028), (I-300)+(1.023)+(2.029), (I-300)+(1.023)+(2.030), (I-300)+(1.023)+(2.031), (I-300)+(1.023)+(2.032), (I-300)+(1.023)+(2.033), (I-300)+(1.023)+(2.034), (I-300)+(1.023)+(2.035), (I-300)+(1.023)+(2.036), (I-300)+(1.023)+(2.037), (I-300)+(1.023)+(2.038), (I-300)+(1.023)+(2.039), (I-300)+(1.023)+(2.040), (I-300)+(1.023)+(2.041), (I-300)+(1.023)+(2.042), (I-300)+(1.023)+(2.043), (I-300)+(1.023)+(2.044), (I-300)+(1.023)+(2.045), (I-300)+(1.023)+(2.046), (I-300)+(1.023)+(2.047), (I-300)+(1.023)+(2.048), (I-300)+(1.023)+(2.049), (I-300)+(1.023)+(2.050), (I-300)+(1.023)+(2.051), (I-300)+(1.023)+(2.052), (I-300)+(1.023)+(2.053), (I-300)+(1.023)+(2.054), (I-300)+(1.023)+(2.055), (I-300)+(1.023)+(2.056), (I-300)+(1.023)+(2.057), (I-300)+(1.023)+(2.058), (I-300)+(1.023)+(2.059), (I-300)+(1.023)+(3.001), (I-300)+(1.023)+(3.002), (I-300)+(1.023)+(3.003), (I-300)+(1.023)+(3.004), (I-300)+(1.023)+(3.005), (I-300)+(1.023)+(3.006), (I-300)+(1.023)+(3.007), (I-300)+(1.023)+(3.008), (I-300)+(1.023)+(3.009), (I-300)+(1.023)+(3.010), (I-300)+(1.023)+(3.011), (I-300)+(1.023)+(3.012), (I-300)+(1.023)+(3.013), (I-300)+(1.023)+(3.014), (I-300)+(1.023)+(3.015), (I-300)+(1.023)+(3.016), (I-300)+(1.023)+(3.017), (I-300)+(1.023)+(3.018), (I-300)+(1.023)+(3.019), (I-300)+(1.023)+(3.020), (I-300)+(1.023)+(3.021), (I-300)+(1.023)+(3.022), (I-300)+(1.023)+(3.023), (I-300)+(1.023)+(3.024), (I-300)+(1.023)+(3.025), (I-300)+(1.023)+(3.026), (I-300)+(1.023)+(3.027), (I-300)+(1.023)+(3.028), (I-300)+(1.023)+(3.029), (I-300)+(1.023)+(3.030), (I-300)+(1.023)+(3.031), (I-300)+(1.023)+(5.001), (I-300)+(1.023)+(5.002), (I-300)+(1.023)+(5.003), (I-300)+(1.023)+(5.004), (I-300)+(1.023)+(5.005), (I-300)+(1.023)+(5.006), (I-300)+(1.023)+(5.007), (I-300)+(1.023)+(5.008), (I-300)+(1.023)+(5.009), (I-300)+(1.023)+(5.010), (I-300)+(1.023)+(5.011), (I-300)+(1.023)+(5.012), (I-300)+(1.023)+(5.013), (I-300)+(1.023)+(5.014), (I-300)+(1.023)+(5.015), (I-300)+(1.023)+(5.016), (I-300)+(1.023)+(5.017), (I-300)+(1.023)+(5.018), (I-300)+(1.023)+(5.019), (I-300)+(1.023)+(5.020), (I-300)+(1.023)+(5.021), (I-300)+(1.023)+(5.022), (I-300)+(1.023)+(5.023), (I-300)+(1.023)+(6.001), (I-300)+(1.023)+(6.002), (I-300)+(1.023)+(6.003), (I-300)+(1.023)+(6.004), (I-300)+(1.023)+(7.001), (I-300)+(1.023)+(7.002), (I-300)+(1.023)+(7.003), (I-300)+(1.023)+(7.004), (I-300)+(1.023)+(7.005), (I-300)+(1.023)+(7.006), (I-300)+(1.023)+(9.001), (I-300)+(1.023)+(9.002), (I-300)+(1.023)+(9.003), (I-300)+(1.023)+(9.004), (I-300)+(1.023)+(9.005), (I-300)+(1.023)+(9.006), (I-300)+(1.023)+(9.007), (I-300)+(1.023)+(9.008), (I-300)+(1.023)+(9.009), (I-300)+(1.023)+(14.001), (I-300)+(1.023)+(14.002), (I-300)+(1.023)+(15.008), (I-300)+(1.023)+(15.011), (I-300)+(1.023)+(15.012), (I-300)+(1.023)+(15.016), (I-300)+(1.023)+(15.025), (I-300)+(1.023)+(15.027), (I-300)+(1.023)+(15.047), (I-300)+(1.023)+(15.063), (I-300)+(1.023)+(15.064), (I-300)+(1.023)+(16.001), (I-300)+(1.023)+(16.002), (I-300)+(1.023)+(16.003), (I-300)+(1.023)+(16.004), (I-300)+(1.023)+(16.005), (I-300)+(1.023)+(16.006), (I-300)+(1.023)+(16.007), (I-300)+(1.023)+(16.008), (I-300)+(1.023)+(17.001), (I-300)+(1.023)+(17.002), (I-300)+(1.023)+(17.003), (I-300)+(1.023)+(17.004), (I-300)+(1.023)+(17.005), (I-300)+(1.023)+(17.006), (I-300)+(1.023)+(17.007), (I-300)+(1.023)+(17.008), (I-300)+(1.023)+(17.009), (I-300)+(1.023)+(17.010), (I-300)+(1.023)+(17.011), (I-300)+(1.023)+(17.012), (I-300)+(1.023)+(18.001), (I-300)+(1.024)+(1.025), (I-300)+(1.024)+(1.026), (I-300)+(1.024)+(1.027), (I-300)+(1.024)+(1.028), (I-300)+(1.024)+(1.029), (I-300)+(1.024)+(1.030), (I-300)+(1.024)+(1.031), (I-300)+(1.024)+(1.032), (I-300)+(1.024)+(1.033), (I-300)+(1.024)+(1.034), (I-300)+(1.024)+(1.035), (I-300)+(1.024)+(1.036), (I-300)+(1.024)+(1.037), (I-300)+(1.024)+(1.038), (I-300)+(1.024)+(1.039), (I-300)+(1.024)+(1.040), (I-300)+(1.024)+(1.041), (I-300)+(1.024)+(1.042), (I-300)+(1.024)+(1.043), (I-300)+(1.024)+(1.044), (I-300)+(1.024)+(1.045), (I-300)+(1.024)+(1.046), (I-300)+(1.024)+(1.047), (I-300)+(1.024)+(1.048), (I-300)+(1.024)+(1.049), (I-300)+(1.024)+(1.050), (I-300)+(1.024)+(1.051), (I-300)+(1.024)+(1.052), (I-300)+(1.024)+(1.053), (I-300)+(1.024)+(1.054), (I-300)+(1.024)+(1.055), (I-300)+(1.024)+(1.056), (I-300)+(1.024)+(1.057), (I-300)+(1.024)+(1.058), (I-300)+(1.024)+(1.059), (I-300)+(1.024)+(1.060), (I-300)+(1.024)+(1.061), (I-300)+(1.024)+(1.062), (I-300)+(1.024)+(1.063), (I-300)+(1.024)+(1.064), (I-300)+(1.024)+(1.065), (I-300)+(1.024)+(1.066), (I-300)+(1.024)+(1.067), (I-300)+(1.024)+(1.068), (I-300)+(1.024)+(1.069), (I-300)+(1.024)+(1.070), (I-300)+(1.024)+(1.071), (I-300)+(1.024)+(1.072), (I-300)+(1.024)+(1.073), (I-300)+(1.024)+(1.074), (I-300)+(1.024)+(1.075), (I-300)+(1.024)+(1.076), (I-300)+(1.024)+(1.077), (I-300)+(1.024)+(1.078), (I-300)+(1.024)+(1.079), (I-300)+(1.024)+(1.080), (I-300)+(1.024)+(1.081), (I-300)+(1.024)+(1.082), (I-300)+(1.024)+(1.083), (I-300)+(1.024)+(1.084), (I-300)+(1.024)+(1.085), (I-300)+(1.024)+(1.086), (I-300)+(1.024)+(1.087), (I-300)+(1.024)+(1.088), (I-300)+(1.024)+(1.089), (I-300)+(1.024)+(1.090), (I-300)+(1.024)+(1.091), (I-300)+(1.024)+(1.092), (I-300)+(1.024)+(2.001), (I-300)+(1.024)+(2.002), (I-300)+(1.024)+(2.003), (I-300)+(1.024)+(2.004), (I-300)+(1.024)+(2.005), (I-300)+(1.024)+(2.006), (I-300)+(1.024)+(2.007), (I-300)+(1.024)+(2.008), (I-300)+(1.024)+(2.009), (I-300)+(1.024)+(2.010), (I-300)+(1.024)+(2.011), (I-300)+(1.024)+(2.012), (I-300)+(1.024)+(2.013), (I-300)+(1.024)+(2.014), (I-300)+(1.024)+(2.015), (I-300)+(1.024)+(2.016), (I-300)+(1.024)+(2.017), (I-300)+(1.024)+(2.018), (I-300)+(1.024)+(2.019), (I-300)+(1.024)+(2.020), (I-300)+(1.024)+(2.021), (I-300)+(1.024)+(2.022), (I-300)+(1.024)+(2.023), (I-300)+(1.024)+(2.024), (I-300)+(1.024)+(2.025), (I-300)+(1.024)+(2.026), (I-300)+(1.024)+(2.027), (I-300)+(1.024)+(2.028), (I-300)+(1.024)+(2.029), (I-300)+(1.024)+(2.030), (I-300)+(1.024)+(2.031), (I-300)+(1.024)+(2.032), (I-300)+(1.024)+(2.033), (I-300)+(1.024)+(2.034), (I-300)+(1.024)+(2.035), (I-300)+(1.024)+(2.036), (I-300)+(1.024)+(2.037), (I-300)+(1.024)+(2.038), (I-300)+(1.024)+(2.039), (I-300)+(1.024)+(2.040), (I-300)+(1.024)+(2.041), (I-300)+(1.024)+(2.042), (I-300)+(1.024)+(2.043), (I-300)+(1.024)+(2.044), (I-300)+(1.024)+(2.045), (I-300)+(1.024)+(2.046), (I-300)+(1.024)+(2.047), (I-300)+(1.024)+(2.048), (I-300)+(1.024)+(2.049), (I-300)+(1.024)+(2.050), (I-300)+(1.024)+(2.051), (I-300)+(1.024)+(2.052), (I-300)+(1.024)+(2.053), (I-300)+(1.024)+(2.054), (I-300)+(1.024)+(2.055), (I-300)+(1.024)+(2.056), (I-300)+(1.024)+(2.057), (I-300)+(1.024)+(2.058), (I-300)+(1.024)+(2.059), (I-300)+(1.024)+(3.001), (I-300)+(1.024)+(3.002), (I-300)+(1.024)+(3.003), (I-300)+(1.024)+(3.004), (I-300)+(1.024)+(3.005), (I-300)+(1.024)+(3.006), (I-300)+(1.024)+(3.007), (I-300)+(1.024)+(3.008), (I-300)+(1.024)+(3.009), (I-300)+(1.024)+(3.010), (I-300)+(1.024)+(3.011), (I-300)+(1.024)+(3.012), (I-300)+(1.024)+(3.013), (I-300)+(1.024)+(3.014), (I-300)+(1.024)+(3.015), (I-300)+(1.024)+(3.016), (I-300)+(1.024)+(3.017), (I-300)+(1.024)+(3.018), (I-300)+(1.024)+(3.019), (I-300)+(1.024)+(3.020), (I-300)+(1.024)+(3.021), (I-300)+(1.024)+(3.022), (I-300)+(1.024)+(3.023), (I-300)+(1.024)+(3.024), (I-300)+(1.024)+(3.025), (I-300)+(1.024)+(3.026), (I-300)+(1.024)+(3.027), (I-300)+(1.024)+(3.028), (I-300)+(1.024)+(3.029), (I-300)+(1.024)+(3.030), (I-300)+(1.024)+(3.031), (I-300)+(1.024)+(5.001), (I-300)+(1.024)+(5.002), (I-300)+(1.024)+(5.003), (I-300)+(1.024)+(5.004), (I-300)+(1.024)+(5.005), (I-300)+(1.024)+(5.006), (I-300)+(1.024)+(5.007), (I-300)+(1.024)+(5.008), (I-300)+(1.024)+(5.009), (I-300)+(1.024)+(5.010), (I-300)+(1.024)+(5.011), (I-300)+(1.024)+(5.012), (I-300)+(1.024)+(5.013), (I-300)+(1.024)+(5.014), (I-300)+(1.024)+(5.015), (I-300)+(1.024)+(5.016), (I-300)+(1.024)+(5.017), (I-300)+(1.024)+(5.018), (I-300)+(1.024)+(5.019), (I-300)+(1.024)+(5.020), (I-300)+(1.024)+(5.021), (I-300)+(1.024)+(5.022), (I-300)+(1.024)+(5.023), (I-300)+(1.024)+(6.001), (I-300)+(1.024)+(6.002), (I-300)+(1.024)+(6.003), (I-300)+(1.024)+(6.004), (I-300)+(1.024)+(7.001), (I-300)+(1.024)+(7.002), (I-300)+(1.024)+(7.003), (I-300)+(1.024)+(7.004), (I-300)+(1.024)+(7.005), (I-300)+(1.024)+(7.006), (I-300)+(1.024)+(9.001), (I-300)+(1.024)+(9.002), (I-300)+(1.024)+(9.003), (I-300)+(1.024)+(9.004), (I-300)+(1.024)+(9.005), (I-300)+(1.024)+(9.006), (I-300)+(1.024)+(9.007), (I-300)+(1.024)+(9.008), (I-300)+(1.024)+(9.009), (I-300)+(1.024)+(14.001), (I-300)+(1.024)+(14.002), (I-300)+(1.024)+(15.008), (I-300)+(1.024)+(15.011), (I-300)+(1.024)+(15.012), (I-300)+(1.024)+(15.016), (I-300)+(1.024)+(15.025), (I-300)+(1.024)+(15.027), (I-300)+(1.024)+(15.047), (I-300)+(1.024)+(15.063), (I-300)+(1.024)+(15.064), (I-300)+(1.024)+(16.001), (I-300)+(1.024)+(16.002), (I-300)+(1.024)+(16.003), (I-300)+(1.024)+(16.004), (I-300)+(1.024)+(16.005), (I-300)+(1.024)+(16.006), (I-300)+(1.024)+(16.007), (I-300)+(1.024)+(16.008), (I-300)+(1.024)+(17.001), (I-300)+(1.024)+(17.002), (I-300)+(1.024)+(17.003), (I-300)+(1.024)+(17.004), (I-300)+(1.024)+(17.005), (I-300)+(1.024)+(17.006), (I-300)+(1.024)+(17.007), (I-300)+(1.024)+(17.008), (I-300)+(1.024)+(17.009), (I-300)+(1.024)+(17.010), (I-300)+(1.024)+(17.011), (I-300)+(1.024)+(17.012), (I-300)+(1.024)+(18.001), (I-300)+(1.025)+(1.026), (I-300)+(1.025)+(1.027), (I-300)+(1.025)+(1.028), (I-300)+(1.025)+(1.029), (I-300)+(1.025)+(1.030), (I-300)+(1.025)+(1.031), (I-300)+(1.025)+(1.032), (I-300)+(1.025)+(1.033), (I-300)+(1.025)+(1.034), (I-300)+(1.025)+(1.035), (I-300)+(1.025)+(1.036), (I-300)+(1.025)+(1.037), (I-300)+(1.025)+(1.038), (I-300)+(1.025)+(1.039), (I-300)+(1.025)+(1.040), (I-300)+(1.025)+(1.041), (I-300)+(1.025)+(1.042), (I-300)+(1.025)+(1.043), (I-300)+(1.025)+(1.044), (I-300)+(1.025)+(1.045), (I-300)+(1.025)+(1.046), (I-300)+(1.025)+(1.047), (I-300)+(1.025)+(1.048), (I-300)+(1.025)+(1.049), (I-300)+(1.025)+(1.050), (I-300)+(1.025)+(1.051), (I-300)+(1.025)+(1.052), (I-300)+(1.025)+(1.053), (I-300)+(1.025)+(1.054), (I-300)+(1.025)+(1.055), (I-300)+(1.025)+(1.056), (I-300)+(1.025)+(1.057), (I-300)+(1.025)+(1.058), (I-300)+(1.025)+(1.059), (I-300)+(1.025)+(1.060), (I-300)+(1.025)+(1.061), (I-300)+(1.025)+(1.062), (I-300)+(1.025)+(1.063), (I-300)+(1.025)+(1.064), (I-300)+(1.025)+(1.065), (I-300)+(1.025)+(1.066), (I-300)+(1.025)+(1.067), (I-300)+(1.025)+(1.068), (I-300)+(1.025)+(1.069), (I-300)+(1.025)+(1.070), (I-300)+(1.025)+(1.071), (I-300)+(1.025)+(1.072), (I-300)+(1.025)+(1.073), (I-300)+(1.025)+(1.074), (I-300)+(1.025)+(1.075), (I-300)+(1.025)+(1.076), (I-300)+(1.025)+(1.077), (I-300)+(1.025)+(1.078), (I-300)+(1.025)+(1.079), (I-300)+(1.025)+(1.080), (I-300)+(1.025)+(1.081), (I-300)+(1.025)+(1.082), (I-300)+(1.025)+(1.083), (I-300)+(1.025)+(1.084), (I-300)+(1.025)+(1.085), (I-300)+(1.025)+(1.086), (I-300)+(1.025)+(1.087), (I-300)+(1.025)+(1.088), (I-300)+(1.025)+(1.089), (I-300)+(1.025)+(1.090), (I-300)+(1.025)+(1.091), (I-300)+(1.025)+(1.092), (I-300)+(1.025)+(2.001), (I-300)+(1.025)+(2.002), (I-300)+(1.025)+(2.003), (I-300)+(1.025)+(2.004), (I-300)+(1.025)+(2.005), (I-300)+(1.025)+(2.006), (I-300)+(1.025)+(2.007), (I-300)+(1.025)+(2.008), (I-300)+(1.025)+(2.009), (I-300)+(1.025)+(2.010), (I-300)+(1.025)+(2.011), (I-300)+(1.025)+(2.012), (I-300)+(1.025)+(2.013), (I-300)+(1.025)+(2.014), (I-300)+(1.025)+(2.015), (I-300)+(1.025)+(2.016), (I-300)+(1.025)+(2.017), (I-300)+(1.025)+(2.018), (I-300)+(1.025)+(2.019), (I-300)+(1.025)+(2.020), (I-300)+(1.025)+(2.021), (I-300)+(1.025)+(2.022), (I-300)+(1.025)+(2.023), (I-300)+(1.025)+(2.024), (I-300)+(1.025)+(2.025), (I-300)+(1.025)+(2.026), (I-300)+(1.025)+(2.027), (I-300)+(1.025)+(2.028), (I-300)+(1.025)+(2.029), (I-300)+(1.025)+(2.030), (I-300)+(1.025)+(2.031), (I-300)+(1.025)+(2.032), (I-300)+(1.025)+(2.033), (I-300)+(1.025)+(2.034), (I-300)+(1.025)+(2.035), (I-300)+(1.025)+(2.036), (I-300)+(1.025)+(2.037), (I-300)+(1.025)+(2.038), (I-300)+(1.025)+(2.039), (I-300)+(1.025)+(2.040), (I-300)+(1.025)+(2.041), (I-300)+(1.025)+(2.042), (I-300)+(1.025)+(2.043), (I-300)+(1.025)+(2.044), (I-300)+(1.025)+(2.045), (I-300)+(1.025)+(2.046), (I-300)+(1.025)+(2.047), (I-300)+(1.025)+(2.048), (I-300)+(1.025)+(2.049), (I-300)+(1.025)+(2.050), (I-300)+(1.025)+(2.051), (I-300)+(1.025)+(2.052), (I-300)+(1.025)+(2.053), (I-300)+(1.025)+(2.054), (I-300)+(1.025)+(2.055), (I-300)+(1.025)+(2.056), (I-300)+(1.025)+(2.057), (I-300)+(1.025)+(2.058), (I-300)+(1.025)+(2.059), (I-300)+(1.025)+(3.001), (I-300)+(1.025)+(3.002), (I-300)+(1.025)+(3.003), (I-300)+(1.025)+(3.004), (I-300)+(1.025)+(3.005), (I-300)+(1.025)+(3.006), (I-300)+(1.025)+(3.007), (I-300)+(1.025)+(3.008), (I-300)+(1.025)+(3.009), (I-300)+(1.025)+(3.010), (I-300)+(1.025)+(3.011), (I-300)+(1.025)+(3.012), (I-300)+(1.025)+(3.013), (I-300)+(1.025)+(3.014), (I-300)+(1.025)+(3.015), (I-300)+(1.025)+(3.016), (I-300)+(1.025)+(3.017), (I-300)+(1.025)+(3.018), (I-300)+(1.025)+(3.019), (I-300)+(1.025)+(3.020), (I-300)+(1.025)+(3.021), (I-300)+(1.025)+(3.022), (I-300)+(1.025)+(3.023), (I-300)+(1.025)+(3.024), (I-300)+(1.025)+(3.025), (I-300)+(1.025)+(3.026), (I-300)+(1.025)+(3.027), (I-300)+(1.025)+(3.028), (I-300)+(1.025)+(3.029), (I-300)+(1.025)+(3.030), (I-300)+(1.025)+(3.031), (I-300)+(1.025)+(5.001), (I-300)+(1.025)+(5.002), (I-300)+(1.025)+(5.003), (I-300)+(1.025)+(5.004), (I-300)+(1.025)+(5.005), (I-300)+(1.025)+(5.006), (I-300)+(1.025)+(5.007),
(I-300)+(1.025)+(5.008), (I-300)+(1.025)+(5.009),
(I-300)+(1.025)+(5.010), (I-300)+(1.025)+(5.011),
(I-300)+(1.025)+(5.012), (I-300)+(1.025)+(5.013),
(I-300)+(1.025)+(5.014), (I-300)+(1.025)+(5.015),
(I-300)+(1.025)+(5.016), (I-300)+(1.025)+(5.017),
(I-300)+(1.025)+(5.018), (I-300)+(1.025)+(5.019),
(I-300)+(1.025)+(5.020), (I-300)+(1.025)+(5.021),
(I-300)+(1.025)+(5.022), (I-300)+(1.025)+(5.023),
(I-300)+(1.025)+(6.001), (I-300)+(1.025)+(6.002),
(I-300)+(1.025)+(6.003), (I-300)+(1.025)+(6.004),
(I-300)+(1.025)+(7.001), (I-300)+(1.025)+(7.002),
(I-300)+(1.025)+(7.003), (I-300)+(1.025)+(7.004),
(I-300)+(1.025)+(7.005), (I-300)+(1.025)+(7.006),
(I-300)+(1.025)+(9.001), (I-300)+(1.025)+(9.002),
(I-300)+(1.025)+(9.003), (I-300)+(1.025)+(9.004),
(I-300)+(1.025)+(9.005), (I-300)+(1.025)+(9.006),
(I-300)+(1.025)+(9.007), (I-300)+(1.025)+(9.008),
(I-300)+(1.025)+(9.009), (I-300)+(1.025)+(14.001),
(I-300)+(1.025)+(14.002), (I-300)+(1.025)+(15.008),
(I-300)+(1.025)+(15.011), (I-300)+(1.025)+(15.012),
(I-300)+(1.025)+(15.016), (I-300)+(1.025)+(15.025),
(I-300)+(1.025)+(15.027), (I-300)+(1.025)+(15.047),
(I-300)+(1.025)+(15.063), (I-300)+(1.025)+(15.064),
(I-300)+(1.025)+(16.001), (I-300)+(1.025)+(16.002),
(I-300)+(1.025)+(16.003), (I-300)+(1.025)+(16.004),
(I-300)+(1.025)+(16.005), (I-300)+(1.025)+(16.006),
(I-300)+(1.025)+(16.007), (I-300)+(1.025)+(16.008),
(I-300)+(1.025)+(17.001), (I-300)+(1.025)+(17.002),
(I-300)+(1.025)+(17.003), (I-300)+(1.025)+(17.004),
(I-300)+(1.025)+(17.005), (I-300)+(1.025)+(17.006),
(I-300)+(1.025)+(17.007), (I-300)+(1.025)+(17.008),
(I-300)+(1.025)+(17.009), (I-300)+(1.025)+(17.010),
(I-300)+(1.025)+(17.011), (I-300)+(1.025)+(17.012),
(I-300)+(1.025)+(18.001), (I-300)+(1.026)+(1.027), (I-300)+(1.026)+(1.028),
(I-300)+(1.026)+(1.029), (I-300)+(1.026)+(1.030),
(I-300)+(1.026)+(1.031), (I-300)+(1.026)+(1.032),
(I-300)+(1.026)+(1.033), (I-300)+(1.026)+(1.034),
(I-300)+(1.026)+(1.035), (I-300)+(1.026)+(1.036),
(I-300)+(1.026)+(1.037), (I-300)+(1.026)+(1.038),
(I-300)+(1.026)+(1.039), (I-300)+(1.026)+(1.040),
(I-300)+(1.026)+(1.041), (I-300)+(1.026)+(1.042),
(I-300)+(1.026)+(1.043), (I-300)+(1.026)+(1.044),
(I-300)+(1.026)+(1.045), (I-300)+(1.026)+(1.046),
(I-300)+(1.026)+(1.047), (I-300)+(1.026)+(1.048),
(I-300)+(1.026)+(1.049), (I-300)+(1.026)+(1.050),
(I-300)+(1.026)+(1.051), (I-300)+(1.026)+(1.052),
(I-300)+(1.026)+(1.053), (I-300)+(1.026)+(1.054),
(I-300)+(1.026)+(1.055), (I-300)+(1.026)+(1.056),
(I-300)+(1.026)+(1.057), (I-300)+(1.026)+(1.058),
(I-300)+(1.026)+(1.059), (I-300)+(1.026)+(1.060),
(I-300)+(1.026)+(1.061), (I-300)+(1.026)+(1.062),
(I-300)+(1.026)+(1.063), (I-300)+(1.026)+(1.064),
(I-300)+(1.026)+(1.065), (I-300)+(1.026)+(1.066),
(I-300)+(1.026)+(1.067), (I-300)+(1.026)+(1.068),
(I-300)+(1.026)+(1.069), (I-300)+(1.026)+(1.070),
(I-300)+(1.026)+(1.071), (I-300)+(1.026)+(1.072),
(I-300)+(1.026)+(1.073), (I-300)+(1.026)+(1.074),
(I-300)+(1.026)+(1.075), (I-300)+(1.026)+(1.076),
(I-300)+(1.026)+(1.077), (I-300)+(1.026)+(1.078),
(I-300)+(1.026)+(1.079), (I-300)+(1.026)+(1.080),
(I-300)+(1.026)+(1.081), (I-300)+(1.026)+(1.082),
(I-300)+(1.026)+(1.083), (I-300)+(1.026)+(1.084),
(I-300)+(1.026)+(1.085), (I-300)+(1.026)+(1.086),
(I-300)+(1.026)+(1.087), (I-300)+(1.026)+(1.088),
(I-300)+(1.026)+(1.089), (I-300)+(1.026)+(1.090),
(I-300)+(1.026)+(1.091), (I-300)+(1.026)+(1.092),
(I-300)+(1.026)+(2.001), (I-300)+(1.026)+(2.002),
(I-300)+(1.026)+(2.003), (I-300)+(1.026)+(2.004),
(I-300)+(1.026)+(2.005), (I-300)+(1.026)+(2.006),
(I-300)+(1.026)+(2.007), (I-300)+(1.026)+(2.008),
(I-300)+(1.026)+(2.009), (I-300)+(1.026)+(2.010),
(I-300)+(1.026)+(2.011), (I-300)+(1.026)+(2.012),
(I-300)+(1.026)+(2.013), (I-300)+(1.026)+(2.014),
(I-300)+(1.026)+(2.015), (I-300)+(1.026)+(2.016),
(I-300)+(1.026)+(2.017), (I-300)+(1.026)+(2.018),
(I-300)+(1.026)+(2.019), (I-300)+(1.026)+(2.020),
(I-300)+(1.026)+(2.021), (I-300)+(1.026)+(2.022),
(I-300)+(1.026)+(2.023), (I-300)+(1.026)+(2.024),
(I-300)+(1.026)+(2.025), (I-300)+(1.026)+(2.026),
(I-300)+(1.026)+(2.027), (I-300)+(1.026)+(2.028),
(I-300)+(1.026)+(2.029), (I-300)+(1.026)+(2.030),
(I-300)+(1.026)+(2.031), (I-300)+(1.026)+(2.032),
(I-300)+(1.026)+(2.033), (I-300)+(1.026)+(2.034),
(I-300)+(1.026)+(2.035), (I-300)+(1.026)+(2.036),
(I-300)+(1.026)+(2.037), (I-300)+(1.026)+(2.038),
(I-300)+(1.026)+(2.039), (I-300)+(1.026)+(2.040),
(I-300)+(1.026)+(2.041), (I-300)+(1.026)+(2.042),
(I-300)+(1.026)+(2.043), (I-300)+(1.026)+(2.044),
(I-300)+(1.026)+(2.045), (I-300)+(1.026)+(2.046),
(I-300)+(1.026)+(2.047), (I-300)+(1.026)+(2.048),
(I-300)+(1.026)+(2.049), (I-300)+(1.026)+(2.050),
(I-300)+(1.026)+(2.051), (I-300)+(1.026)+(2.052),
(I-300)+(1.026)+(2.053), (I-300)+(1.026)+(2.054),
(I-300)+(1.026)+(2.055), (I-300)+(1.026)+(2.056),
(I-300)+(1.026)+(2.057), (I-300)+(1.026)+(2.058),
(I-300)+(1.026)+(2.059), (I-300)+(1.026)+(3.001),
(I-300)+(1.026)+(3.002), (I-300)+(1.026)+(3.003),
(I-300)+(1.026)+(3.004), (I-300)+(1.026)+(3.005),
(I-300)+(1.026)+(3.006), (I-300)+(1.026)+(3.007),
(I-300)+(1.026)+(3.008), (I-300)+(1.026)+(3.009),
(I-300)+(1.026)+(3.010), (I-300)+(1.026)+(3.011),
(I-300)+(1.026)+(3.012), (I-300)+(1.026)+(3.013),
(I-300)+(1.026)+(3.014), (I-300)+(1.026)+(3.015),
(I-300)+(1.026)+(3.016), (I-300)+(1.026)+(3.017),
(I-300)+(1.026)+(3.018), (I-300)+(1.026)+(3.019),
(I-300)+(1.026)+(3.020), (I-300)+(1.026)+(3.021),
(I-300)+(1.026)+(3.022), (I-300)+(1.026)+(3.023),
(I-300)+(1.026)+(3.024), (I-300)+(1.026)+(3.025),
(I-300)+(1.026)+(3.026), (I-300)+(1.026)+(3.027),
(I-300)+(1.026)+(3.028), (I-300)+(1.026)+(3.029),
(I-300)+(1.026)+(3.030), (I-300)+(1.026)+(3.031),
(I-300)+(1.026)+(5.001), (I-300)+(1.026)+(5.002),
(I-300)+(1.026)+(5.003), (I-300)+(1.026)+(5.004),
(I-300)+(1.026)+(5.005), (I-300)+(1.026)+(5.006),
(I-300)+(1.026)+(5.007), (I-300)+(1.026)+(5.008),
(I-300)+(1.026)+(5.009), (I-300)+(1.026)+(5.010),
(I-300)+(1.026)+(5.011), (I-300)+(1.026)+(5.012),
(I-300)+(1.026)+(5.013), (I-300)+(1.026)+(5.014),
(I-300)+(1.026)+(5.015), (I-300)+(1.026)+(5.016),
(I-300)+(1.026)+(5.017), (I-300)+(1.026)+(5.018),
(I-300)+(1.026)+(5.019), (I-300)+(1.026)+(5.020),
(I-300)+(1.026)+(5.021), (I-300)+(1.026)+(5.022),
(I-300)+(1.026)+(5.023), (I-300)+(1.026)+(6.001),
(I-300)+(1.026)+(6.002), (I-300)+(1.026)+(6.003),
(I-300)+(1.026)+(6.004), (I-300)+(1.026)+(7.001),
(I-300)+(1.026)+(7.002), (I-300)+(1.026)+(7.003),
(I-300)+(1.026)+(7.004), (I-300)+(1.026)+(7.005),
(I-300)+(1.026)+(7.006), (I-300)+(1.026)+(9.001),
(I-300)+(1.026)+(9.002), (I-300)+(1.026)+(9.003),
(I-300)+(1.026)+(9.004), (I-300)+(1.026)+(9.005),
(I-300)+(1.026)+(9.006), (I-300)+(1.026)+(9.007),
(I-300)+(1.026)+(9.008), (I-300)+(1.026)+(9.009), (I-300)+(1.026)+(14.001), (I-300)+(1.026)+(14.002), (I-300)+(1.026)+(15.008), (I-300)+(1.026)+(15.011), (I-300)+(1.026)+(15.012), (I-300)+(1.026)+(15.016), (I-300)+(1.026)+(15.025), (I-300)+(1.026)+(15.027), (I-300)+(1.026)+(15.047), (I-300)+(1.026)+(15.063), (I-300)+(1.026)+(15.064), (I-300)+(1.026)+(16.001), (I-300)+(1.026)+(16.002), (I-300)+(1.026)+(16.003), (I-300)+(1.026)+(16.004), (I-300)+(1.026)+(16.005), (I-300)+(1.026)+(16.006), (I-300)+(1.026)+(16.007), (I-300)+(1.026)+(16.008), (I-300)+(1.026)+(17.001), (I-300)+(1.026)+(17.002), (I-300)+(1.026)+(17.003), (I-300)+(1.026)+(17.004), (I-300)+(1.026)+(17.005), (I-300)+(1.026)+(17.006), (I-300)+(1.026)+(17.007), (I-300)+(1.026)+(17.008), (I-300)+(1.026)+(17.009), (I-300)+(1.026)+(17.010), (I-300)+(1.026)+(17.011), (I-300)+(1.026)+(17.012), (I-300)+(1.026)+(18.001), (I-300)+(1.027)+(1.028), (I-300)+(1.027)+(1.029), (I-300)+(1.027)+(1.030), (I-300)+(1.027)+(1.031), (I-300)+(1.027)+(1.032), (I-300)+(1.027)+(1.033), (I-300)+(1.027)+(1.034), (I-300)+(1.027)+(1.035), (I-300)+(1.027)+(1.036), (I-300)+(1.027)+(1.037), (I-300)+(1.027)+(1.038), (I-300)+(1.027)+(1.039), (I-300)+(1.027)+(1.040), (I-300)+(1.027)+(1.041), (I-300)+(1.027)+(1.042), (I-300)+(1.027)+(1.043), (I-300)+(1.027)+(1.044), (I-300)+(1.027)+(1.045), (I-300)+(1.027)+(1.046), (I-300)+(1.027)+(1.047), (I-300)+(1.027)+(1.048), (I-300)+(1.027)+(1.049), (I-300)+(1.027)+(1.050), (I-300)+(1.027)+(1.051), (I-300)+(1.027)+(1.052), (I-300)+(1.027)+(1.053), (I-300)+(1.027)+(1.054), (I-300)+(1.027)+(1.055), (I-300)+(1.027)+(1.056), (I-300)+(1.027)+(1.057), (I-300)+(1.027)+(1.058), (I-300)+(1.027)+(1.059), (I-300)+(1.027)+(1.060), (I-300)+(1.027)+(1.061), (I-300)+(1.027)+(1.062), (I-300)+(1.027)+(1.063), (I-300)+(1.027)+(1.064), (I-300)+(1.027)+(1.065), (I-300)+(1.027)+(1.066), (I-300)+(1.027)+(1.067), (I-300)+(1.027)+(1.068), (I-300)+(1.027)+(1.069), (I-300)+(1.027)+(1.070), (I-300)+(1.027)+(1.071), (I-300)+(1.027)+(1.072), (I-300)+(1.027)+(1.073), (I-300)+(1.027)+(1.074), (I-300)+(1.027)+(1.075), (I-300)+(1.027)+(1.076), (I-300)+(1.027)+(1.077), (I-300)+(1.027)+(1.078), (I-300)+(1.027)+(1.079), (I-300)+(1.027)+(1.080), (I-300)+(1.027)+(1.081), (I-300)+(1.027)+(1.082), (I-300)+(1.027)+(1.083), (I-300)+(1.027)+(1.084), (I-300)+(1.027)+(1.085), (I-300)+(1.027)+(1.086), (I-300)+(1.027)+(1.087), (I-300)+(1.027)+(1.088), (I-300)+(1.027)+(1.089), (I-300)+(1.027)+(1.090), (I-300)+(1.027)+(1.091), (I-300)+(1.027)+(1.092), (I-300)+(1.027)+(2.001), (I-300)+(1.027)+(2.002), (I-300)+(1.027)+(2.003), (I-300)+(1.027)+(2.004), (I-300)+(1.027)+(2.005), (I-300)+(1.027)+(2.006), (I-300)+(1.027)+(2.007), (I-300)+(1.027)+(2.008), (I-300)+(1.027)+(2.009), (I-300)+(1.027)+(2.010), (I-300)+(1.027)+(2.011), (I-300)+(1.027)+(2.012), (I-300)+(1.027)+(2.013), (I-300)+(1.027)+(2.014), (I-300)+(1.027)+(2.015), (I-300)+(1.027)+(2.016), (I-300)+(1.027)+(2.017), (I-300)+(1.027)+(2.018), (I-300)+(1.027)+(2.019), (I-300)+(1.027)+(2.020), (I-300)+(1.027)+(2.021), (I-300)+(1.027)+(2.022), (I-300)+(1.027)+(2.023), (I-300)+(1.027)+(2.024), (I-300)+(1.027)+(2.025), (I-300)+(1.027)+(2.026), (I-300)+(1.027)+(2.027), (I-300)+(1.027)+(2.028), (I-300)+(1.027)+(2.029), (I-300)+(1.027)+(2.030), (I-300)+(1.027)+(2.031), (I-300)+(1.027)+(2.032), (I-300)+(1.027)+(2.033), (I-300)+(1.027)+(2.034), (I-300)+(1.027)+(2.035), (I-300)+(1.027)+(2.036), (I-300)+(1.027)+(2.037), (I-300)+(1.027)+(2.038), (I-300)+(1.027)+(2.039), (I-300)+(1.027)+(2.040), (I-300)+(1.027)+(2.041), (I-300)+(1.027)+(2.042), (I-300)+(1.027)+(2.043), (I-300)+(1.027)+(2.044), (I-300)+(1.027)+(2.045), (I-300)+(1.027)+(2.046), (I-300)+(1.027)+(2.047), (I-300)+(1.027)+(2.048), (I-300)+(1.027)+(2.049), (I-300)+(1.027)+(2.050), (I-300)+(1.027)+(2.051), (I-300)+(1.027)+(2.052), (I-300)+(1.027)+(2.053), (I-300)+(1.027)+(2.054), (I-300)+(1.027)+(2.055), (I-300)+(1.027)+(2.056), (I-300)+(1.027)+(2.057), (I-300)+(1.027)+(2.058), (I-300)+(1.027)+(2.059), (I-300)+(1.027)+(3.001), (I-300)+(1.027)+(3.002), (I-300)+(1.027)+(3.003), (I-300)+(1.027)+(3.004), (I-300)+(1.027)+(3.005), (I-300)+(1.027)+(3.006), (I-300)+(1.027)+(3.007), (I-300)+(1.027)+(3.008), (I-300)+(1.027)+(3.009), (I-300)+(1.027)+(3.010), (I-300)+(1.027)+(3.011), (I-300)+(1.027)+(3.012), (I-300)+(1.027)+(3.013), (I-300)+(1.027)+(3.014), (I-300)+(1.027)+(3.015), (I-300)+(1.027)+(3.016), (I-300)+(1.027)+(3.017), (I-300)+(1.027)+(3.018), (I-300)+(1.027)+(3.019), (I-300)+(1.027)+(3.020), (I-300)+(1.027)+(3.021), (I-300)+(1.027)+(3.022), (I-300)+(1.027)+(3.023), (I-300)+(1.027)+(3.024), (I-300)+(1.027)+(3.025), (I-300)+(1.027)+(3.026), (I-300)+(1.027)+(3.027), (I-300)+(1.027)+(3.028), (I-300)+(1.027)+(3.029), (I-300)+(1.027)+(3.030), (I-300)+(1.027)+(3.031), (I-300)+(1.027)+(5.001), (I-300)+(1.027)+(5.002), (I-300)+(1.027)+(5.003), (I-300)+(1.027)+(5.004), (I-300)+(1.027)+(5.005), (I-300)+(1.027)+(5.006), (I-300)+(1.027)+(5.007), (I-300)+(1.027)+(5.008), (I-300)+(1.027)+(5.009), (I-300)+(1.027)+(5.010), (I-300)+(1.027)+(5.011), (I-300)+(1.027)+(5.012), (I-300)+(1.027)+(5.013), (I-300)+(1.027)+(5.014), (I-300)+(1.027)+(5.015), (I-300)+(1.027)+(5.016), (I-300)+(1.027)+(5.017), (I-300)+(1.027)+(5.018), (I-300)+(1.027)+(5.019), (I-300)+(1.027)+(5.020), (I-300)+(1.027)+(5.021), (I-300)+(1.027)+(5.022), (I-300)+(1.027)+(5.023), (I-300)+(1.027)+(6.001), (I-300)+(1.027)+(6.002), (I-300)+(1.027)+(6.003), (I-300)+(1.027)+(6.004), (I-300)+(1.027)+(7.001), (I-300)+(1.027)+(7.002), (I-300)+(1.027)+(7.003), (I-300)+(1.027)+(7.004), (I-300)+(1.027)+(7.005), (I-300)+(1.027)+(7.006), (I-300)+(1.027)+(9.001), (I-300)+(1.027)+(9.002), (I-300)+(1.027)+(9.003), (I-300)+(1.027)+(9.004), (I-300)+(1.027)+(9.005), (I-300)+(1.027)+(9.006), (I-300)+(1.027)+(9.007), (I-300)+(1.027)+(9.008), (I-300)+(1.027)+(9.009), (I-300)+(1.027)+(14.001), (I-300)+(1.027)+(14.002), (I-300)+(1.027)+(15.008), (I-300)+(1.027)+(15.011), (I-300)+(1.027)+(15.012), (I-300)+(1.027)+(15.016), (I-300)+(1.027)+(15.025), (I-300)+(1.027)+(15.027), (I-300)+(1.027)+(15.047), (I-300)+(1.027)+(15.063), (I-300)+(1.027)+(15.064), (I-300)+(1.027)+(16.001), (I-300)+(1.027)+(16.002), (I-300)+(1.027)+(16.003), (I-300)+(1.027)+(16.004), (I-300)+(1.027)+(16.005), (I-300)+(1.027)+(16.006), (I-300)+(1.027)+(16.007), (I-300)+(1.027)+(16.008), (I-300)+(1.027)+(17.001), (I-300)+(1.027)+(17.002), (I-300)+(1.027)+(17.003), (I-300)+(1.027)+(17.004), (I-300)+(1.027)+(17.005), (I-300)+(1.027)+(17.006), (I-300)+(1.027)+(17.007), (I-300)+(1.027)+(17.008), (I-300)+(1.027)+(17.009), (I-300)+(1.027)+(17.010), (I-300)+(1.027)+(17.011), (I-300)+(1.027)+(17.012), (I-300)+(1.027)+(18.001), (I-300)+(1.028)+(1.029), (I-300)+(1.028)+(1.030), (I-300)+(1.028)+(1.031), (I-300)+(1.028)+(1.032), (I-300)+(1.028)+(1.033), (I-300)+(1.028)+(1.034), (I-300)+(1.028)+(1.035), (I-300)+(1.028)+(1.036), (I-300)+(1.028)+(1.037), (I-300)+(1.028)+(1.038), (I-300)+(1.028)+(1.039), (I-300)+(1.028)+(1.040), (I-300)+(1.028)+(1.041), (I-300)+(1.028)+(1.042), (I-300)+(1.028)+(1.043), (I-300)+(1.028)+(1.044), (I-300)+(1.028)+(1.045), (I-300)+(1.028)+(1.046), (I-300)+(1.028)+(1.047), (I-300)+(1.028)+(1.048), (I-300)+(1.028)+(1.049), (I-300)+(1.028)+(1.050), (I-300)+(1.028)+(1.051), (I-300)+(1.028)+(1.052), (I-300)+(1.028)+(1.053), (I-300)+(1.028)+(1.054), (I-300)+(1.028)+(1.055), (I-300)+(1.028)+(1.056), (I-300)+(1.028)+(1.057), (I-300)+(1.028)+(1.058), (I-300)+(1.028)+(1.059), (I-300)+(1.028)+(1.060), (I-300)+(1.028)+(1.061), (I-300)+(1.028)+(1.062), (I-300)+(1.028)+(1.063), (I-300)+(1.028)+(1.064), (I-300)+(1.028)+(1.065), (I-300)+(1.028)+(1.066), (I-300)+(1.028)+(1.067), (I-300)+(1.028)+(1.068), (I-300)+(1.028)+(1.069), (I-300)+(1.028)+(1.070), (I-300)+(1.028)+(1.071), (I-300)+(1.028)+(1.072), (I-300)+(1.028)+(1.073), (I-300)+(1.028)+(1.074), (I-300)+(1.028)+(1.075), (I-300)+(1.028)+(1.076), (I-300)+(1.028)+(1.077), (I-300)+(1.028)+(1.078), (I-300)+(1.028)+(1.079), (I-300)+(1.028)+(1.080), (I-300)+(1.028)+(1.081), (I-300)+(1.028)+(1.082), (I-300)+(1.028)+(1.083), (I-300)+(1.028)+(1.084), (I-300)+(1.028)+(1.085), (I-300)+(1.028)+(1.086), (I-300)+(1.028)+(1.087), (I-300)+(1.028)+(1.088), (I-300)+(1.028)+(1.089), (I-300)+(1.028)+(1.090), (I-300)+(1.028)+(1.091), (I-300)+(1.028)+(1.092), (I-300)+(1.028)+(2.001), (I-300)+(1.028)+(2.002), (I-300)+(1.028)+(2.003), (I-300)+(1.028)+(2.004), (I-300)+(1.028)+(2.005), (I-300)+(1.028)+(2.006), (I-300)+(1.028)+(2.007), (I-300)+(1.028)+(2.008), (I-300)+(1.028)+(2.009), (I-300)+(1.028)+(2.010), (I-300)+(1.028)+(2.011), (I-300)+(1.028)+(2.012), (I-300)+(1.028)+(2.013), (I-300)+(1.028)+(2.014), (I-300)+(1.028)+(2.015), (I-300)+(1.028)+(2.016), (I-300)+(1.028)+(2.017), (I-300)+(1.028)+(2.018), (I-300)+(1.028)+(2.019), (I-300)+(1.028)+(2.020), (I-300)+(1.028)+(2.021), (I-300)+(1.028)+(2.022), (I-300)+(1.028)+(2.023), (I-300)+(1.028)+(2.024), (I-300)+(1.028)+(2.025), (I-300)+(1.028)+(2.026), (I-300)+(1.028)+(2.027), (I-300)+(1.028)+(2.028), (I-300)+(1.028)+(2.029), (I-300)+(1.028)+(2.030), (I-300)+(1.028)+(2.031), (I-300)+(1.028)+(2.032), (I-300)+(1.028)+(2.033), (I-300)+(1.028)+(2.034), (I-300)+(1.028)+(2.035), (I-300)+(1.028)+(2.036), (I-300)+(1.028)+(2.037), (I-300)+(1.028)+(2.038), (I-300)+(1.028)+(2.039), (I-300)+(1.028)+(2.040), (I-300)+(1.028)+(2.041), (I-300)+(1.028)+(2.042), (I-300)+(1.028)+(2.043), (I-300)+(1.028)+(2.044), (I-300)+(1.028)+(2.045), (I-300)+(1.028)+(2.046), (I-300)+(1.028)+(2.047), (I-300)+(1.028)+(2.048), (I-300)+(1.028)+(2.049), (I-300)+(1.028)+(2.050), (I-300)+(1.028)+(2.051), (I-300)+(1.028)+(2.052), (I-300)+(1.028)+(2.053), (I-300)+(1.028)+(2.054), (I-300)+(1.028)+(2.055), (I-300)+(1.028)+(2.056), (I-300)+(1.028)+(2.057), (I-300)+(1.028)+(2.058), (I-300)+(1.028)+(2.059), (I-300)+(1.028)+(3.001), (I-300)+(1.028)+(3.002), (I-300)+(1.028)+(3.003), (I-300)+(1.028)+(3.004), (I-300)+(1.028)+(3.005), (I-300)+(1.028)+(3.006), (I-300)+(1.028)+(3.007), (I-300)+(1.028)+(3.008), (I-300)+(1.028)+(3.009), (I-300)+(1.028)+(3.010), (I-300)+(1.028)+(3.011), (I-300)+(1.028)+(3.012), (I-300)+(1.028)+(3.013), (I-300)+(1.028)+(3.014), (I-300)+(1.028)+(3.015), (I-300)+(1.028)+(3.016), (I-300)+(1.028)+(3.017), (I-300)+(1.028)+(3.018), (I-300)+(1.028)+(3.019), (I-300)+(1.028)+(3.020), (I-300)+(1.028)+(3.021), (I-300)+(1.028)+(3.022), (I-300)+(1.028)+(3.023), (I-300)+(1.028)+(3.024), (I-300)+(1.028)+(3.025), (I-300)+(1.028)+(3.026), (I-300)+(1.028)+(3.027), (I-300)+(1.028)+(3.028), (I-300)+(1.028)+(3.029), (I-300)+(1.028)+(3.030), (I-300)+(1.028)+(3.031), (I-300)+(1.028)+(5.001), (I-300)+(1.028)+(5.002), (I-300)+(1.028)+(5.003), (I-300)+(1.028)+(5.004), (I-300)+(1.028)+(5.005), (I-300)+(1.028)+(5.006), (I-300)+(1.028)+(5.007), (I-300)+(1.028)+(5.008), (I-300)+(1.028)+(5.009), (I-300)+(1.028)+(5.010), (I-300)+(1.028)+(5.011), (I-300)+(1.028)+(5.012), (I-300)+(1.028)+(5.013), (I-300)+(1.028)+(5.014), (I-300)+(1.028)+(5.015), (I-300)+(1.028)+(5.016), (I-300)+(1.028)+(5.017), (I-300)+(1.028)+(5.018), (I-300)+(1.028)+(5.019), (I-300)+(1.028)+(5.020), (I-300)+(1.028)+(5.021), (I-300)+(1.028)+(5.022), (I-300)+(1.028)+(5.023), (I-300)+(1.028)+(6.001), (I-300)+(1.028)+(6.002), (I-300)+(1.028)+(6.003), (I-300)+(1.028)+(6.004), (I-300)+(1.028)+(7.001), (I-300)+(1.028)+(7.002), (I-300)+(1.028)+(7.003), (I-300)+(1.028)+(7.004), (I-300)+(1.028)+(7.005), (I-300)+(1.028)+(7.006), (I-300)+(1.028)+(9.001), (I-300)+(1.028)+(9.002), (I-300)+(1.028)+(9.003), (I-300)+(1.028)+(9.004), (I-300)+(1.028)+(9.005), (I-300)+(1.028)+(9.006), (I-300)+(1.028)+(9.007), (I-300)+(1.028)+(9.008), (I-300)+(1.028)+(9.009), (I-300)+(1.028)+(14.001), (I-300)+(1.028)+(14.002), (I-300)+(1.028)+(15.008), (I-300)+(1.028)+(15.011), (I-300)+(1.028)+(15.012), (I-300)+(1.028)+(15.016), (I-300)+(1.028)+(15.025), (I-300)+(1.028)+(15.027), (I-300)+(1.028)+(15.047), (I-300)+(1.028)+(15.063), (I-300)+(1.028)+(15.064), (I-300)+(1.028)+(16.001), (I-300)+(1.028)+(16.002), (I-300)+(1.028)+(16.003), (I-300)+(1.028)+(16.004), (I-300)+(1.028)+(16.005), (I-300)+(1.028)+(16.006), (I-300)+(1.028)+(16.007), (I-300)+(1.028)+(16.008), (I-300)+(1.028)+(17.001), (I-300)+(1.028)+(17.002), (I-300)+(1.028)+(17.003), (I-300)+(1.028)+(17.004), (I-300)+(1.028)+(17.005), (I-300)+(1.028)+(17.006), (I-300)+(1.028)+(17.007), (I-300)+(1.028)+(17.008), (I-300)+(1.028)+(17.009), (I-300)+(1.028)+(17.010), (I-300)+(1.028)+(17.011), (I-300)+(1.028)+(17.012), (I-300)+(1.028)+(18.001), (I-300)+(1.029)+(1.030), (I-300)+(1.029)+(1.031), (I-300)+(1.029)+(1.032), (I-300)+(1.029)+(1.033), (I-300)+(1.029)+(1.034), (I-300)+(1.029)+(1.035), (I-300)+(1.029)+(1.036), (I-300)+(1.029)+(1.037), (I-300)+(1.029)+(1.038), (I-300)+(1.029)+(1.039), (I-300)+(1.029)+(1.040), (I-300)+(1.029)+(1.041), (I-300)+(1.029)+(1.042), (I-300)+(1.029)+(1.043), (I-300)+(1.029)+(1.044), (I-300)+(1.029)+(1.045), (I-300)+(1.029)+(1.046), (I-300)+(1.029)+(1.047), (I-300)+(1.029)+(1.048), (I-300)+(1.029)+(1.049), (I-300)+(1.029)+(1.050), (I-300)+(1.029)+(1.051), (I-300)+(1.029)+(1.052), (I-300)+(1.029)+(1.053), (I-300)+(1.029)+(1.054), (I-300)+(1.029)+(1.055), (I-300)+(1.029)+(1.056), (I-300)+(1.029)+(1.057), (I-300)+(1.029)+(1.058), (I-300)+(1.029)+(1.059), (I-300)+(1.029)+(1.060), (I-300)+(1.029)+(1.061), (I-300)+(1.029)+(1.062), (I-300)+(1.029)+(1.063), (I-300)+(1.029)+(1.064), (I-300)+(1.029)+(1.065), (I-300)+(1.029)+(1.066), (I-300)+(1.029)+(1.067), (I-300)+(1.029)+(1.068), (I-300)+(1.029)+(1.069), (I-300)+(1.029)+(1.070), (I-300)+(1.029)+(1.071), (I-300)+(1.029)+(1.072), (I-300)+(1.029)+(1.073), (I-300)+(1.029)+(1.074), (I-300)+(1.029)+(1.075), (I-300)+(1.029)+(1.076), (I-300)+(1.029)+(1.077), (I-300)+(1.029)+(1.078), (I-300)+(1.029)+(1.079), (I-300)+(1.029)+(1.080), (I-300)+(1.029)+(1.081), (I-300)+(1.029)+(1.082), (I-300)+(1.029)+(1.083), (I-300)+(1.029)+(1.084), (I-300)+(1.029)+(1.085), (I-300)+(1.029)+(1.086), (I-300)+(1.029)+(1.087), (I-300)+(1.029)+(1.088), (I-300)+(1.029)+(1.089), (I-300)+(1.029)+(1.090), (I-300)+(1.029)+(1.091), (I-300)+(1.029)+(1.092), (I-300)+(1.029)+(2.001), (I-300)+(1.029)+(2.002), (I-300)+(1.029)+(2.003), (I-300)+(1.029)+(2.004), (I-300)+(1.029)+(2.005), (I-300)+(1.029)+(2.006), (I-300)+(1.029)+(2.007), (I-300)+(1.029)+(2.008), (I-300)+(1.029)+(2.009), (I-300)+(1.029)+(2.010), (I-300)+(1.029)+(2.011), (I-300)+(1.029)+(2.012), (I-300)+(1.029)+(2.013), (I-300)+(1.029)+(2.014), (I-300)+(1.029)+(2.015), (I-300)+(1.029)+(2.016), (I-300)+(1.029)+(2.017), (I-300)+(1.029)+(2.018), (I-300)+(1.029)+(2.019), (I-300)+(1.029)+(2.020), (I-300)+(1.029)+(2.021), (I-300)+(1.029)+(2.022), (I-300)+(1.029)+(2.023), (I-300)+(1.029)+(2.024), (I-300)+(1.029)+(2.025), (I-300)+(1.029)+(2.026), (I-300)+(1.029)+(2.027), (I-300)+(1.029)+(2.028), (I-300)+(1.029)+(2.029), (I-300)+(1.029)+(2.030), (I-300)+(1.029)+(2.031), (I-300)+(1.029)+(2.032), (I-300)+(1.029)+(2.033), (I-300)+(1.029)+(2.034), (I-300)+(1.029)+(2.035), (I-300)+(1.029)+(2.036), (I-300)+(1.029)+(2.037), (I-300)+(1.029)+(2.038), (I-300)+(1.029)+(2.039), (I-300)+(1.029)+(2.040), (I-300)+(1.029)+(2.041), (I-300)+(1.029)+(2.042), (I-300)+(1.029)+(2.043), (I-300)+(1.029)+(2.044), (I-300)+(1.029)+(2.045), (I-300)+(1.029)+(2.046), (I-300)+(1.029)+(2.047), (I-300)+(1.029)+(2.048), (I-300)+(1.029)+(2.049), (I-300)+(1.029)+(2.050), (I-300)+(1.029)+(2.051), (I-300)+(1.029)+(2.052), (I-300)+(1.029)+(2.053), (I-300)+(1.029)+(2.054), (I-300)+(1.029)+(2.055), (I-300)+(1.029)+(2.056), (I-300)+(1.029)+(2.057), (I-300)+(1.029)+(2.058), (I-300)+(1.029)+(2.059), (I-300)+(1.029)+(3.001), (I-300)+(1.029)+(3.002), (I-300)+(1.029)+(3.003), (I-300)+(1.029)+(3.004), (I-300)+(1.029)+(3.005), (I-300)+(1.029)+(3.006), (I-300)+(1.029)+(3.007), (I-300)+(1.029)+(3.008), (I-300)+(1.029)+(3.009), (I-300)+(1.029)+(3.010), (I-300)+(1.029)+(3.011), (I-300)+(1.029)+(3.012), (I-300)+(1.029)+(3.013), (I-300)+(1.029)+(3.014), (I-300)+(1.029)+(3.015), (I-300)+(1.029)+(3.016), (I-300)+(1.029)+(3.017), (I-300)+(1.029)+(3.018), (I-300)+(1.029)+(3.019), (I-300)+(1.029)+(3.020), (I-300)+(1.029)+(3.021), (I-300)+(1.029)+(3.022), (I-300)+(1.029)+(3.023), (I-300)+(1.029)+(3.024), (I-300)+(1.029)+(3.025), (I-300)+(1.029)+(3.026), (I-300)+(1.029)+(3.027), (I-300)+(1.029)+(3.028), (I-300)+(1.029)+(3.029), (I-300)+(1.029)+(3.030), (I-300)+(1.029)+(3.031), (I-300)+(1.029)+(5.001), (I-300)+(1.029)+(5.002), (I-300)+(1.029)+(5.003), (I-300)+(1.029)+(5.004), (I-300)+(1.029)+(5.005), (I-300)+(1.029)+(5.006), (I-300)+(1.029)+(5.007), (I-300)+(1.029)+(5.008), (I-300)+(1.029)+(5.009), (I-300)+(1.029)+(5.010), (I-300)+(1.029)+(5.011), (I-300)+(1.029)+(5.012), (I-300)+(1.029)+(5.013), (I-300)+(1.029)+(5.014), (I-300)+(1.029)+(5.015), (I-300)+(1.029)+(5.016), (I-300)+(1.029)+(5.017), (I-300)+(1.029)+(5.018), (I-300)+(1.029)+(5.019), (I-300)+(1.029)+(5.020), (I-300)+(1.029)+(5.021), (I-300)+(1.029)+(5.022), (I-300)+(1.029)+(5.023), (I-300)+(1.029)+(6.001), (I-300)+(1.029)+(6.002), (I-300)+(1.029)+(6.003), (I-300)+(1.029)+(6.004), (I-300)+(1.029)+(7.001), (I-300)+(1.029)+(7.002), (I-300)+(1.029)+(7.003), (I-300)+(1.029)+(7.004), (I-300)+(1.029)+(7.005), (I-300)+(1.029)+(7.006), (I-300)+(1.029)+(9.001), (I-300)+(1.029)+(9.002), (I-300)+(1.029)+(9.003), (I-300)+(1.029)+(9.004), (I-300)+(1.029)+(9.005), (I-300)+(1.029)+(9.006), (I-300)+(1.029)+(9.007), (I-300)+(1.029)+(9.008), (I-300)+(1.029)+(9.009), (I-300)+(1.029)+(14.001), (I-300)+(1.029)+(14.002), (I-300)+(1.029)+(15.008), (I-300)+(1.029)+(15.011), (I-300)+(1.029)+(15.012), (I-300)+(1.029)+(15.016), (I-300)+(1.029)+(15.025), (I-300)+(1.029)+(15.027), (I-300)+(1.029)+(15.047), (I-300)+(1.029)+(15.063), (I-300)+(1.029)+(15.064), (I-300)+(1.029)+(16.001), (I-300)+(1.029)+(16.002), (I-300)+(1.029)+(16.003), (I-300)+(1.029)+(16.004), (I-300)+(1.029)+(16.005), (I-300)+(1.029)+(16.006), (I-300)+(1.029)+(16.007), (I-300)+(1.029)+(16.008), (I-300)+(1.029)+(17.001), (I-300)+(1.029)+(17.002), (I-300)+(1.029)+(17.003), (I-300)+(1.029)+(17.004), (I-300)+(1.029)+(17.005), (I-300)+(1.029)+(17.006), (I-300)+(1.029)+(17.007), (I-300)+(1.029)+(17.008), (I-300)+(1.029)+(17.009), (I-300)+(1.029)+(17.010), (I-300)+(1.029)+(17.011), (I-300)+(1.029)+(17.012), (I-300)+(1.029)+(18.001), (I-300)+(1.030)+(1.031), (I-300)+(1.030)+(1.032), (I-300)+(1.030)+(1.033), (I-300)+(1.030)+(1.034), (I-300)+(1.030)+(1.035), (I-300)+(1.030)+(1.036), (I-300)+(1.030)+(1.037), (I-300)+(1.030)+(1.038), (I-300)+(1.030)+(1.039), (I-300)+(1.030)+(1.040), (I-300)+(1.030)+(1.041), (I-300)+(1.030)+(1.042), (I-300)+(1.030)+(1.043), (I-300)+(1.030)+(1.044), (I-300)+(1.030)+(1.045), (I-300)+(1.030)+(1.046), (I-300)+(1.030)+(1.047), (I-300)+(1.030)+(1.048), (I-300)+(1.030)+(1.049), (I-300)+(1.030)+(1.050), (I-300)+(1.030)+(1.051), (I-300)+(1.030)+(1.052), (I-300)+(1.030)+(1.053), (I-300)+(1.030)+(1.054), (I-300)+(1.030)+(1.055), (I-300)+(1.030)+(1.056), (I-300)+(1.030)+(1.057), (I-300)+(1.030)+(1.058), (I-300)+(1.030)+(1.059), (I-300)+(1.030)+(1.060), (I-300)+(1.030)+(1.061), (I-300)+(1.030)+(1.062), (I-300)+(1.030)+(1.063), (I-300)+(1.030)+(1.064), (I-300)+(1.030)+(1.065), (I-300)+(1.030)+(1.066), (I-300)+(1.030)+(1.067), (I-300)+(1.030)+(1.068), (I-300)+(1.030)+(1.069), (I-300)+(1.030)+(1.070), (I-300)+(1.030)+(1.071), (I-300)+(1.030)+(1.072), (I-300)+(1.030)+(1.073), (I-300)+(1.030)+(1.074), (I-300)+(1.030)+(1.075), (I-300)+(1.030)+(1.076), (I-300)+(1.030)+(1.077), (I-300)+(1.030)+(1.078), (I-300)+(1.030)+(1.079), (I-300)+(1.030)+(1.080), (I-300)+(1.030)+(1.081), (I-300)+(1.030)+(1.082), (I-300)+(1.030)+(1.083), (I-300)+(1.030)+(1.084), (I-300)+(1.030)+(1.085), (I-300)+(1.030)+(1.086), (I-300)+(1.030)+(1.087), (I-300)+(1.030)+(1.088), (I-300)+(1.030)+(1.089), (I-300)+(1.030)+(1.090), (I-300)+(1.030)+(1.091), (I-300)+(1.030)+(1.092), (I-300)+(1.030)+(2.001), (I-300)+(1.030)+(2.002), (I-300)+(1.030)+(2.003), (I-300)+(1.030)+(2.004), (I-300)+(1.030)+(2.005), (I-300)+(1.030)+(2.006), (I-300)+(1.030)+(2.007), (I-300)+(1.030)+(2.008), (I-300)+(1.030)+(2.009), (I-300)+(1.030)+(2.010), (I-300)+(1.030)+(2.011), (I-300)+(1.030)+(2.012), (I-300)+(1.030)+(2.013), (I-300)+(1.030)+(2.014), (I-300)+(1.030)+(2.015), (I-300)+(1.030)+(2.016), (I-300)+(1.030)+(2.017), (I-300)+(1.030)+(2.018), (I-300)+(1.030)+(2.019), (I-300)+(1.030)+(2.020), (I-300)+(1.030)+(2.021), (I-300)+(1.030)+(2.022), (I-300)+(1.030)+(2.023), (I-300)+(1.030)+(2.024), (I-300)+(1.030)+(2.025), (I-300)+(1.030)+(2.026), (I-300)+(1.030)+(2.027), (I-300)+(1.030)+(2.028), (I-300)+(1.030)+(2.029), (I-300)+(1.030)+(2.030), (I-300)+(1.030)+(2.031), (I-300)+(1.030)+(2.032), (I-300)+(1.030)+(2.033), (I-300)+(1.030)+(2.034), (I-300)+(1.030)+(2.035), (I-300)+(1.030)+(2.036), (I-300)+(1.030)+(2.037), (I-300)+(1.030)+(2.038), (I-300)+(1.030)+(2.039), (I-300)+(1.030)+(2.040), (I-300)+(1.030)+(2.041), (I-300)+(1.030)+(2.042), (I-300)+(1.030)+(2.043), (I-300)+(1.030)+(2.044), (I-300)+(1.030)+(2.045), (I-300)+(1.030)+(2.046), (I-300)+(1.030)+(2.047), (I-300)+(1.030)+(2.048), (I-300)+(1.030)+(2.049), (I-300)+(1.030)+(2.050), (I-300)+(1.030)+(2.051), (I-300)+(1.030)+(2.052), (I-300)+(1.030)+(2.053), (I-300)+(1.030)+(2.054), (I-300)+(1.030)+(2.055), (I-300)+(1.030)+(2.056), (I-300)+(1.030)+(2.057), (I-300)+(1.030)+(2.058), (I-300)+(1.030)+(2.059), (I-300)+(1.030)+(3.001), (I-300)+(1.030)+(3.002), (I-300)+(1.030)+(3.003), (I-300)+(1.030)+(3.004), (I-300)+(1.030)+(3.005), (I-300)+(1.030)+(3.006), (I-300)+(1.030)+(3.007), (I-300)+(1.030)+(3.008), (I-300)+(1.030)+(3.009), (I-300)+(1.030)+(3.010), (I-300)+(1.030)+(3.011), (I-300)+(1.030)+(3.012), (I-300)+(1.030)+(3.013), (I-300)+(1.030)+(3.014), (I-300)+(1.030)+(3.015), (I-300)+(1.030)+(3.016), (I-300)+(1.030)+(3.017), (I-300)+(1.030)+(3.018), (I-300)+(1.030)+(3.019), (I-300)+(1.030)+(3.020), (I-300)+(1.030)+(3.021), (I-300)+(1.030)+(3.022), (I-300)+(1.030)+(3.023), (I-300)+(1.030)+(3.024), (I-300)+(1.030)+(3.025), (I-300)+(1.030)+(3.026), (I-300)+(1.030)+(3.027), (I-300)+(1.030)+(3.028), (I-300)+(1.030)+(3.029), (I-300)+(1.030)+(3.030), (I-300)+(1.030)+(3.031), (I-300)+(1.030)+(5.001), (I-300)+(1.030)+(5.002), (I-300)+(1.030)+(5.003), (I-300)+(1.030)+(5.004), (I-300)+(1.030)+(5.005), (I-300)+(1.030)+(5.006), (I-300)+(1.030)+(5.007), (I-300)+(1.030)+(5.008), (I-300)+(1.030)+(5.009), (I-300)+(1.030)+(5.010), (I-300)+(1.030)+(5.011), (I-300)+(1.030)+(5.012), (I-300)+(1.030)+(5.013), (I-300)+(1.030)+(5.014), (I-300)+(1.030)+(5.015), (I-300)+(1.030)+(5.016), (I-300)+(1.030)+(5.017), (I-300)+(1.030)+(5.018), (I-300)+(1.030)+(5.019), (I-300)+(1.030)+(5.020), (I-300)+(1.030)+(5.021), (I-300)+(1.030)+(5.022), (I-300)+(1.030)+(5.023), (I-300)+(1.030)+(6.001), (I-300)+(1.030)+(6.002), (I-300)+(1.030)+(6.003), (I-300)+(1.030)+(6.004), (I-300)+(1.030)+(7.001), (I-300)+(1.030)+(7.002), (I-300)+(1.030)+(7.003), (I-300)+(1.030)+(7.004), (I-300)+(1.030)+(7.005), (I-300)+(1.030)+(7.006), (I-300)+(1.030)+(9.001), (I-300)+(1.030)+(9.002), (I-300)+(1.030)+(9.003), (I-300)+(1.030)+(9.004), (I-300)+(1.030)+(9.005), (I-300)+(1.030)+(9.006), (I-300)+(1.030)+(9.007), (I-300)+(1.030)+(9.008), (I-300)+(1.030)+(9.009), (I-300)+(1.030)+(14.001), (I-300)+(1.030)+(14.002), (I-300)+(1.030)+(15.008), (I-300)+(1.030)+(15.011), (I-300)+(1.030)+(15.012), (I-300)+(1.030)+(15.016), (I-300)+(1.030)+(15.025), (I-300)+(1.030)+(15.027), (I-300)+(1.030)+(15.047), (I-300)+(1.030)+(15.063), (I-300)+(1.030)+(15.064), (I-300)+(1.030)+(16.001), (I-300)+(1.030)+(16.002), (I-300)+(1.030)+(16.003), (I-300)+(1.030)+(16.004), (I-300)+(1.030)+(16.005), (I-300)+(1.030)+(16.006), (I-300)+(1.030)+(16.007), (I-300)+(1.030)+(16.008), (I-300)+(1.030)+(17.001), (I-300)+(1.030)+(17.002), (I-300)+(1.030)+(17.003), (I-300)+(1.030)+(17.004), (I-300)+(1.030)+(17.005), (I-300)+(1.030)+(17.006), (I-300)+(1.030)+(17.007), (I-300)+(1.030)+(17.008), (I-300)+(1.030)+(17.009), (I-300)+(1.030)+(17.010), (I-300)+(1.030)+(17.011), (I-300)+(1.030)+(17.012), (I-300)+(1.030)+(18.001), (I-300)+(1.031)+(1.032), (I-300)+(1.031)+(1.033), (I-300)+(1.031)+(1.034), (I-300)+(1.031)+(1.035), (I-300)+(1.031)+(1.036), (I-300)+(1.031)+(1.037), (I-300)+(1.031)+(1.038), (I-300)+(1.031)+(1.039), (I-300)+(1.031)+(1.040), (I-300)+(1.031)+(1.041), (I-300)+(1.031)+(1.042), (I-300)+(1.031)+(1.043), (I-300)+(1.031)+(1.044), (I-300)+(1.031)+(1.045), (I-300)+(1.031)+(1.046), (I-300)+(1.031)+(1.047), (I-300)+(1.031)+(1.048), (I-300)+(1.031)+(1.049), (I-300)+(1.031)+(1.050), (I-300)+(1.031)+(1.051), (I-300)+(1.031)+(1.052), (I-300)+(1.031)+(1.053), (I-300)+(1.031)+(1.054), (I-300)+(1.031)+(1.055), (I-300)+(1.031)+(1.056), (I-300)+(1.031)+(1.057), (I-300)+(1.031)+(1.058), (I-300)+(1.031)+(1.059), (I-300)+(1.031)+(1.060), (I-300)+(1.031)+(1.061), (I-300)+(1.031)+(1.062), (I-300)+(1.031)+(1.063), (I-300)+(1.031)+(1.064), (I-300)+(1.031)+(1.065), (I-300)+(1.031)+(1.066), (I-300)+(1.031)+(1.067), (I-300)+(1.031)+(1.068), (I-300)+(1.031)+(1.069), (I-300)+(1.031)+(1.070), (I-300)+(1.031)+(1.071), (I-300)+(1.031)+(1.072), (I-300)+(1.031)+(1.073), (I-300)+(1.031)+(1.074), (I-300)+(1.031)+(1.075), (I-300)+(1.031)+(1.076), (I-300)+(1.031)+(1.077), (I-300)+(1.031)+(1.078), (I-300)+(1.031)+(1.079), (I-300)+(1.031)+(1.080), (I-300)+(1.031)+(1.081), (I-300)+(1.031)+(1.082), (I-300)+(1.031)+(1.083), (I-300)+(1.031)+(1.084), (I-300)+(1.031)+(1.085), (I-300)+(1.031)+(1.086), (I-300)+(1.031)+(1.087), (I-300)+(1.031)+(1.088), (I-300)+(1.031)+(1.089), (I-300)+(1.031)+(1.090), (I-300)+(1.031)+(1.091), (I-300)+(1.031)+(1.092), (I-300)+(1.031)+(2.001), (I-300)+(1.031)+(2.002), (I-300)+(1.031)+(2.003), (I-300)+(1.031)+(2.004), (I-300)+(1.031)+(2.005), (I-300)+(1.031)+(2.006), (I-300)+(1.031)+(2.007), (I-300)+(1.031)+(2.008), (I-300)+(1.031)+(2.009), (I-300)+(1.031)+(2.010), (I-300)+(1.031)+(2.011), (I-300)+(1.031)+(2.012), (I-300)+(1.031)+(2.013), (I-300)+(1.031)+(2.014), (I-300)+(1.031)+(2.015), (I-300)+(1.031)+(2.016), (I-300)+(1.031)+(2.017), (I-300)+(1.031)+(2.018), (I-300)+(1.031)+(2.019), (I-300)+(1.031)+(2.020), (I-300)+(1.031)+(2.021), (I-300)+(1.031)+(2.022), (I-300)+(1.031)+(2.023), (I-300)+(1.031)+(2.024), (I-300)+(1.031)+(2.025), (I-300)+(1.031)+(2.026), (I-300)+(1.031)+(2.027), (I-300)+(1.031)+(2.028), (I-300)+(1.031)+(2.029), (I-300)+(1.031)+(2.030), (I-300)+(1.031)+(2.031), (I-300)+(1.031)+(2.032), (I-300)+(1.031)+(2.033), (I-300)+(1.031)+(2.034), (I-300)+(1.031)+(2.035), (I-300)+(1.031)+(2.036), (I-300)+(1.031)+(2.037), (I-300)+(1.031)+(2.038), (I-300)+(1.031)+(2.039), (I-300)+(1.031)+(2.040), (I-300)+(1.031)+(2.041), (I-300)+(1.031)+(2.042), (I-300)+(1.031)+(2.043), (I-300)+(1.031)+(2.044), (I-300)+(1.031)+(2.045), (I-300)+(1.031)+(2.046), (I-300)+(1.031)+(2.047), (I-300)+(1.031)+(2.048), (I-300)+(1.031)+(2.049), (I-300)+(1.031)+(2.050), (I-300)+(1.031)+(2.051), (I-300)+(1.031)+(2.052), (I-300)+(1.031)+(2.053), (I-300)+(1.031)+(2.054), (I-300)+(1.031)+(2.055), (I-300)+(1.031)+(2.056), (I-300)+(1.031)+(2.057), (I-300)+(1.031)+(2.058), (I-300)+(1.031)+(2.059), (I-300)+(1.031)+(3.001), (I-300)+(1.031)+(3.002), (I-300)+(1.031)+(3.003), (I-300)+(1.031)+(3.004), (I-300)+(1.031)+(3.005), (I-300)+(1.031)+(3.006), (I-300)+(1.031)+(3.007), (I-300)+(1.031)+(3.008), (I-300)+(1.031)+(3.009), (I-300)+(1.031)+(3.010), (I-300)+(1.031)+(3.011), (I-300)+(1.031)+(3.012), (I-300)+(1.031)+(3.013), (I-300)+(1.031)+(3.014), (I-300)+(1.031)+(3.015), (I-300)+(1.031)+(3.016), (I-300)+(1.031)+(3.017), (I-300)+(1.031)+(3.018), (I-300)+(1.031)+(3.019), (I-300)+(1.031)+(3.020), (I-300)+(1.031)+(3.021), (I-300)+(1.031)+(3.022), (I-300)+(1.031)+(3.023), (I-300)+(1.031)+(3.024), (I-300)+(1.031)+(3.025), (I-300)+(1.031)+(3.026), (I-300)+(1.031)+(3.027), (I-300)+(1.031)+(3.028), (I-300)+(1.031)+(3.029), (I-300)+(1.031)+(3.030), (I-300)+(1.031)+(3.031), (I-300)+(1.031)+(5.001), (I-300)+(1.031)+(5.002), (I-300)+(1.031)+(5.003), (I-300)+(1.031)+(5.004), (I-300)+(1.031)+(5.005), (I-300)+(1.031)+(5.006), (I-300)+(1.031)+(5.007), (I-300)+(1.031)+(5.008), (I-300)+(1.031)+(5.009), (I-300)+(1.031)+(5.010), (I-300)+(1.031)+(5.011), (I-300)+(1.031)+(5.012), (I-300)+(1.031)+(5.013), (I-300)+(1.031)+(5.014), (I-300)+(1.031)+(5.015), (I-300)+(1.031)+(5.016), (I-300)+(1.031)+(5.017), (I-300)+(1.031)+(5.018), (I-300)+(1.031)+(5.019), (I-300)+(1.031)+(5.020), (I-300)+(1.031)+(5.021), (I-300)+(1.031)+(5.022), (I-300)+(1.031)+(5.023), (I-300)+(1.031)+(6.001), (I-300)+(1.031)+(6.002), (I-300)+(1.031)+(6.003), (I-300)+(1.031)+(6.004), (I-300)+(1.031)+(7.001), (I-300)+(1.031)+(7.002), (I-300)+(1.031)+(7.003), (I-300)+(1.031)+(7.004), (I-300)+(1.031)+(7.005), (I-300)+(1.031)+(7.006), (I-300)+(1.031)+(9.001), (I-300)+(1.031)+(9.002), (I-300)+(1.031)+(9.003), (I-300)+(1.031)+(9.004), (I-300)+(1.031)+(9.005), (I-300)+(1.031)+(9.006), (I-300)+(1.031)+(9.007), (I-300)+(1.031)+(9.008), (I-300)+(1.031)+(9.009), (I-300)+(1.031)+(14.001), (I-300)+(1.031)+(14.002), (I-300)+(1.031)+(15.008), (I-300)+(1.031)+(15.011), (I-300)+(1.031)+(15.012), (I-300)+(1.031)+(15.016), (I-300)+(1.031)+(15.025), (I-300)+(1.031)+(15.027), (I-300)+(1.031)+(15.047), (I-300)+(1.031)+(15.063), (I-300)+(1.031)+(15.064), (I-300)+(1.031)+(16.001), (I-300)+(1.031)+(16.002), (I-300)+(1.031)+(16.003), (I-300)+(1.031)+(16.004), (I-300)+(1.031)+(16.005), (I-300)+(1.031)+(16.006), (I-300)+(1.031)+(16.007), (I-300)+(1.031)+(16.008), (I-300)+(1.031)+(17.001), (I-300)+(1.031)+(17.002), (I-300)+(1.031)+(17.003), (I-300)+(1.031)+(17.004), (I-300)+(1.031)+(17.005), (I-300)+(1.031)+(17.006), (I-300)+(1.031)+(17.007), (I-300)+(1.031)+(17.008), (I-300)+(1.031)+(17.009), (I-300)+(1.031)+(17.010), (I-300)+(1.031)+(17.011), (I-300)+(1.031)+(17.012), (I-300)+(1.031)+(18.001), (I-300)+(1.032)+(1.033), (I-300)+(1.032)+(1.034), (I-300)+(1.032)+(1.035), (I-300)+(1.032)+(1.036), (I-300)+(1.032)+(1.037), (I-300)+(1.032)+(1.038), (I-300)+(1.032)+(1.039), (I-300)+(1.032)+(1.040), (I-300)+(1.032)+(1.041), (I-300)+(1.032)+(1.042), (I-300)+(1.032)+(1.043), (I-300)+(1.032)+(1.044), (I-300)+(1.032)+(1.045), (I-300)+(1.032)+(1.046), (I-300)+(1.032)+(1.047), (I-300)+(1.032)+(1.048), (I-300)+(1.032)+(1.049), (I-300)+(1.032)+(1.050), (I-300)+(1.032)+(1.051), (I-300)+(1.032)+(1.052), (I-300)+(1.032)+(1.053), (I-300)+(1.032)+(1.054), (I-300)+(1.032)+(1.055), (I-300)+(1.032)+(1.056), (I-300)+(1.032)+(1.057), (I-300)+(1.032)+(1.058), (I-300)+(1.032)+(1.059), (I-300)+(1.032)+(1.060), (I-300)+(1.032)+(1.061), (I-300)+(1.032)+(1.062), (I-300)+(1.032)+(1.063), (I-300)+(1.032)+(1.064), (I-300)+(1.032)+(1.065), (I-300)+(1.032)+(1.066), (I-300)+(1.032)+(1.067), (I-300)+(1.032)+(1.068), (I-300)+(1.032)+(1.069), (I-300)+(1.032)+(1.070), (I-300)+(1.032)+(1.071), (I-300)+(1.032)+(1.072), (I-300)+(1.032)+(1.073), (I-300)+(1.032)+(1.074), (I-300)+(1.032)+(1.075), (I-300)+(1.032)+(1.076), (I-300)+(1.032)+(1.077), (I-300)+(1.032)+(1.078), (I-300)+(1.032)+(1.079), (I-300)+(1.032)+(1.080), (I-300)+(1.032)+(1.081), (I-300)+(1.032)+(1.082), (I-300)+(1.032)+(1.083), (I-300)+(1.032)+(1.084), (I-300)+(1.032)+(1.085), (I-300)+(1.032)+(1.086), (I-300)+(1.032)+(1.087), (I-300)+(1.032)+(1.088), (I-300)+(1.032)+(1.089), (I-300)+(1.032)+(1.090), (I-300)+(1.032)+(1.091), (I-300)+(1.032)+(1.092), (I-300)+(1.032)+(2.001), (I-300)+(1.032)+(2.002), (I-300)+(1.032)+(2.003), (I-300)+(1.032)+(2.004), (I-300)+(1.032)+(2.005), (I-300)+(1.032)+(2.006), (I-300)+(1.032)+(2.007), (I-300)+(1.032)+(2.008), (I-300)+(1.032)+(2.009), (I-300)+(1.032)+(2.010), (I-300)+(1.032)+(2.011), (I-300)+(1.032)+(2.012), (I-300)+(1.032)+(2.013), (I-300)+(1.032)+(2.014), (I-300)+(1.032)+(2.015), (I-300)+(1.032)+(2.016), (I-300)+(1.032)+(2.017), (I-300)+(1.032)+(2.018), (I-300)+(1.032)+(2.019), (I-300)+(1.032)+(2.020), (I-300)+(1.032)+(2.021), (I-300)+(1.032)+(2.022), (I-300)+(1.032)+(2.023), (I-300)+(1.032)+(2.024), (I-300)+(1.032)+(2.025), (I-300)+(1.032)+(2.026), (I-300)+(1.032)+(2.027), (I-300)+(1.032)+(2.028), (I-300)+(1.032)+(2.029), (I-300)+(1.032)+(2.030), (I-300)+(1.032)+(2.031), (I-300)+(1.032)+(2.032), (I-300)+(1.032)+(2.033), (I-300)+(1.032)+(2.034), (I-300)+(1.032)+(2.035), (I-300)+(1.032)+(2.036), (I-300)+(1.032)+(2.037), (I-300)+(1.032)+(2.038), (I-300)+(1.032)+(2.039), (I-300)+(1.032)+(2.040), (I-300)+(1.032)+(2.041), (I-300)+(1.032)+(2.042), (I-300)+(1.032)+(2.043), (I-300)+(1.032)+(2.044), (I-300)+(1.032)+(2.045), (I-300)+(1.032)+(2.046), (I-300)+(1.032)+(2.047), (I-300)+(1.032)+(2.048), (I-300)+(1.032)+(2.049), (I-300)+(1.032)+(2.050), (I-300)+(1.032)+(2.051), (I-300)+(1.032)+(2.052), (I-300)+(1.032)+(2.053), (I-300)+(1.032)+(2.054), (I-300)+(1.032)+(2.055), (I-300)+(1.032)+(2.056), (I-300)+(1.032)+(2.057), (I-300)+(1.032)+(2.058), (I-300)+(1.032)+(2.059), (I-300)+(1.032)+(3.001), (I-300)+(1.032)+(3.002), (I-300)+(1.032)+(3.003), (I-300)+(1.032)+(3.004), (I-300)+(1.032)+(3.005), (I-300)+(1.032)+(3.006), (I-300)+(1.032)+(3.007), (I-300)+(1.032)+(3.008), (I-300)+(1.032)+(3.009), (I-300)+(1.032)+(3.010), (I-300)+(1.032)+(3.011), (I-300)+(1.032)+(3.012), (I-300)+(1.032)+(3.013), (I-300)+(1.032)+(3.014), (I-300)+(1.032)+(3.015), (I-300)+(1.032)+(3.016), (I-300)+(1.032)+(3.017), (I-300)+(1.032)+(3.018), (I-300)+(1.032)+(3.019), (I-300)+(1.032)+(3.020), (I-300)+(1.032)+(3.021), (I-300)+(1.032)+(3.022), (I-300)+(1.032)+(3.023), (I-300)+(1.032)+(3.024), (I-300)+(1.032)+(3.025), (I-300)+(1.032)+(3.026), (I-300)+(1.032)+(3.027), (I-300)+(1.032)+(3.028), (I-300)+(1.032)+(3.029), (I-300)+(1.032)+(3.030), (I-300)+(1.032)+(3.031), (I-300)+(1.032)+(5.001), (I-300)+(1.032)+(5.002), (I-300)+(1.032)+(5.003), (I-300)+(1.032)+(5.004), (I-300)+(1.032)+(5.005), (I-300)+(1.032)+(5.006), (I-300)+(1.032)+(5.007), (I-300)+(1.032)+(5.008), (I-300)+(1.032)+(5.009), (I-300)+(1.032)+(5.010), (I-300)+(1.032)+(5.011), (I-300)+(1.032)+(5.012), (I-300)+(1.032)+(5.013), (I-300)+(1.032)+(5.014), (I-300)+(1.032)+(5.015), (I-300)+(1.032)+(5.016), (I-300)+(1.032)+(5.017), (I-300)+(1.032)+(5.018), (I-300)+(1.032)+(5.019), (I-300)+(1.032)+(5.020), (I-300)+(1.032)+(5.021), (I-300)+(1.032)+(5.022), (I-300)+(1.032)+(5.023), (I-300)+(1.032)+(6.001), (I-300)+(1.032)+(6.002), (I-300)+(1.032)+(6.003), (I-300)+(1.032)+(6.004), (I-300)+(1.032)+(7.001), (I-300)+(1.032)+(7.002), (I-300)+(1.032)+(7.003), (I-300)+(1.032)+(7.004), (I-300)+(1.032)+(7.005), (I-300)+(1.032)+(7.006), (I-300)+(1.032)+(9.001), (I-300)+(1.032)+(9.002), (I-300)+(1.032)+(9.003), (I-300)+(1.032)+(9.004), (I-300)+(1.032)+(9.005), (I-300)+(1.032)+(9.006), (I-300)+(1.032)+(9.007), (I-300)+(1.032)+(9.008), (I-300)+(1.032)+(9.009), (I-300)+(1.032)+(14.001), (I-300)+(1.032)+(14.002), (I-300)+(1.032)+(15.008), (I-300)+(1.032)+(15.011), (I-300)+(1.032)+(15.012), (I-300)+(1.032)+(15.016), (I-300)+(1.032)+(15.025), (I-300)+(1.032)+(15.027), (I-300)+(1.032)+(15.047), (I-300)+(1.032)+(15.063), (I-300)+(1.032)+(15.064), (I-300)+(1.032)+(16.001), (I-300)+(1.032)+(16.002), (I-300)+(1.032)+(16.003), (I-300)+(1.032)+(16.004), (I-300)+(1.032)+(16.005), (I-300)+(1.032)+(16.006), (I-300)+(1.032)+(16.007), (I-300)+(1.032)+(16.008), (I-300)+(1.032)+(17.001), (I-300)+(1.032)+(17.002), (I-300)+(1.032)+(17.003), (I-300)+(1.032)+(17.004), (I-300)+(1.032)+(17.005), (I-300)+(1.032)+(17.006), (I-300)+(1.032)+(17.007), (I-300)+(1.032)+(17.008), (I-300)+(1.032)+(17.009), (I-300)+(1.032)+(17.010), (I-300)+(1.032)+(17.011), (I-300)+(1.032)+(17.012), (I-300)+(1.032)+(18.001), (I-300)+(1.033)+(1.034), (I-300)+(1.033)+(1.035), (I-300)+(1.033)+(1.036), (I-300)+(1.033)+(1.037), (I-300)+(1.033)+(1.038), (I-300)+(1.033)+(1.039), (I-300)+(1.033)+(1.040), (I-300)+(1.033)+(1.041), (I-300)+(1.033)+(1.042), (I-300)+(1.033)+(1.043), (I-300)+(1.033)+(1.044), (I-300)+(1.033)+(1.045), (I-300)+(1.033)+(1.046), (I-300)+(1.033)+(1.047), (I-300)+(1.033)+(1.048), (I-300)+(1.033)+(1.049), (I-300)+(1.033)+(1.050), (I-300)+(1.033)+(1.051), (I-300)+(1.033)+(1.052), (I-300)+(1.033)+(1.053), (I-300)+(1.033)+(1.054), (I-300)+(1.033)+(1.055), (I-300)+(1.033)+(1.056), (I-300)+(1.033)+(1.057), (I-300)+(1.033)+(1.058), (I-300)+(1.033)+(1.059), (I-300)+(1.033)+(1.060), (I-300)+(1.033)+(1.061), (I-300)+(1.033)+(1.062), (I-300)+(1.033)+(1.063), (I-300)+(1.033)+(1.064), (I-300)+(1.033)+(1.065), (I-300)+(1.033)+(1.066), (I-300)+(1.033)+(1.067), (I-300)+(1.033)+(1.068), (I-300)+(1.033)+(1.069), (I-300)+(1.033)+(1.070), (I-300)+(1.033)+(1.071), (I-300)+(1.033)+(1.072), (I-300)+(1.033)+(1.073), (I-300)+(1.033)+(1.074), (I-300)+(1.033)+(1.075), (I-300)+(1.033)+(1.076), (I-300)+(1.033)+(1.077), (I-300)+(1.033)+(1.078), (I-300)+(1.033)+(1.079), (I-300)+(1.033)+(1.080), (I-300)+(1.033)+(1.081), (I-300)+(1.033)+(1.082), (I-300)+(1.033)+(1.083), (I-300)+(1.033)+(1.084), (I-300)+(1.033)+(1.085), (I-300)+(1.033)+(1.086), (I-300)+(1.033)+(1.087), (I-300)+(1.033)+(1.088), (I-300)+(1.033)+(1.089), (I-300)+(1.033)+(1.090), (I-300)+(1.033)+(1.091), (I-300)+(1.033)+(1.092), (I-300)+(1.033)+(2.001), (I-300)+(1.033)+(2.002), (I-300)+(1.033)+(2.003), (I-300)+(1.033)+(2.004), (I-300)+(1.033)+(2.005), (I-300)+(1.033)+(2.006), (I-300)+(1.033)+(2.007), (I-300)+(1.033)+(2.008), (I-300)+(1.033)+(2.009), (I-300)+(1.033)+(2.010), (I-300)+(1.033)+(2.011), (I-300)+(1.033)+(2.012), (I-300)+(1.033)+(2.013), (I-300)+(1.033)+(2.014), (I-300)+(1.033)+(2.015), (I-300)+(1.033)+(2.016), (I-300)+(1.033)+(2.017), (I-300)+(1.033)+(2.018), (I-300)+(1.033)+(2.019), (I-300)+(1.033)+(2.020), (I-300)+(1.033)+(2.021), (I-300)+(1.033)+(2.022), (I-300)+(1.033)+(2.023), (I-300)+(1.033)+(2.024), (I-300)+(1.033)+(2.025), (I-300)+(1.033)+(2.026), (I-300)+(1.033)+(2.027), (I-300)+(1.033)+(2.028), (I-300)+(1.033)+(2.029), (I-300)+(1.033)+(2.030), (I-300)+(1.033)+(2.031), (I-300)+(1.033)+(2.032), (I-300)+(1.033)+(2.033), (I-300)+(1.033)+(2.034), (I-300)+(1.033)+(2.035), (I-300)+(1.033)+(2.036), (I-300)+(1.033)+(2.037), (I-300)+(1.033)+(2.038), (I-300)+(1.033)+(2.039), (I-300)+(1.033)+(2.040), (I-300)+(1.033)+(2.041), (I-300)+(1.033)+(2.042), (I-300)+(1.033)+(2.043), (I-300)+(1.033)+(2.044), (I-300)+(1.033)+(2.045), (I-300)+(1.033)+(2.046), (I-300)+(1.033)+(2.047), (I-300)+(1.033)+(2.048), (I-300)+(1.033)+(2.049), (I-300)+(1.033)+(2.050), (I-300)+(1.033)+(2.051), (I-300)+(1.033)+(2.052), (I-300)+(1.033)+(2.053), (I-300)+(1.033)+(2.054), (I-300)+(1.033)+(2.055), (I-300)+(1.033)+(2.056), (I-300)+(1.033)+(2.057), (I-300)+(1.033)+(2.058), (I-300)+(1.033)+(2.059), (I-300)+(1.033)+(3.001), (I-300)+(1.033)+(3.002), (I-300)+(1.033)+(3.003), (I-300)+(1.033)+(3.004), (I-300)+(1.033)+(3.005), (I-300)+(1.033)+(3.006), (I-300)+(1.033)+(3.007), (I-300)+(1.033)+(3.008), (I-300)+(1.033)+(3.009), (I-300)+(1.033)+(3.010), (I-300)+(1.033)+(3.011), (I-300)+(1.033)+(3.012), (I-300)+(1.033)+(3.013), (I-300)+(1.033)+(3.014), (I-300)+(1.033)+(3.015), (I-300)+(1.033)+(3.016), (I-300)+(1.033)+(3.017), (I-300)+(1.033)+(3.018), (I-300)+(1.033)+(3.019), (I-300)+(1.033)+(3.020), (I-300)+(1.033)+(3.021), (I-300)+(1.033)+(3.022), (I-300)+(1.033)+(3.023), (I-300)+(1.033)+(3.024), (I-300)+(1.033)+(3.025), (I-300)+(1.033)+(3.026), (I-300)+(1.033)+(3.027), (I-300)+(1.033)+(3.028), (I-300)+(1.033)+(3.029), (I-300)+(1.033)+(3.030), (I-300)+(1.033)+(3.031), (I-300)+(1.033)+(5.001), (I-300)+(1.033)+(5.002), (I-300)+(1.033)+(5.003), (I-300)+(1.033)+(5.004), (I-300)+(1.033)+(5.005), (I-300)+(1.033)+(5.006), (I-300)+(1.033)+(5.007), (I-300)+(1.033)+(5.008), (I-300)+(1.033)+(5.009), (I-300)+(1.033)+(5.010), (I-300)+(1.033)+(5.011), (I-300)+(1.033)+(5.012), (I-300)+(1.033)+(5.013), (I-300)+(1.033)+(5.014), (I-300)+(1.033)+(5.015), (I-300)+(1.033)+(5.016), (I-300)+(1.033)+(5.017), (I-300)+(1.033)+(5.018), (I-300)+(1.033)+(5.019), (I-300)+(1.033)+(5.020), (I-300)+(1.033)+(5.021), (I-300)+(1.033)+(5.022), (I-300)+(1.033)+(5.023), (I-300)+(1.033)+(6.001), (I-300)+(1.033)+(6.002), (I-300)+(1.033)+(6.003), (I-300)+(1.033)+(6.004), (I-300)+(1.033)+(7.001), (I-300)+(1.033)+(7.002), (I-300)+(1.033)+(7.003), (I-300)+(1.033)+(7.004), (I-300)+(1.033)+(7.005), (I-300)+(1.033)+(7.006), (I-300)+(1.033)+(9.001), (I-300)+(1.033)+(9.002), (I-300)+(1.033)+(9.003), (I-300)+(1.033)+(9.004), (I-300)+(1.033)+(9.005), (I-300)+(1.033)+(9.006), (I-300)+(1.033)+(9.007), (I-300)+(1.033)+(9.008), (I-300)+(1.033)+(9.009), (I-300)+(1.033)+(14.001), (I-300)+(1.033)+(14.002), (I-300)+(1.033)+(15.008), (I-300)+(1.033)+(15.011), (I-300)+(1.033)+(15.012), (I-300)+(1.033)+(15.016), (I-300)+(1.033)+(15.025), (I-300)+(1.033)+(15.027), (I-300)+(1.033)+(15.047), (I-300)+(1.033)+(15.063), (I-300)+(1.033)+(15.064), (I-300)+(1.033)+(16.001), (I-300)+(1.033)+(16.002), (I-300)+(1.033)+(16.003), (I-300)+(1.033)+(16.004), (I-300)+(1.033)+(16.005), (I-300)+(1.033)+(16.006), (I-300)+(1.033)+(16.007), (I-300)+(1.033)+(16.008), (I-300)+(1.033)+(17.001), (I-300)+(1.033)+(17.002), (I-300)+(1.033)+(17.003), (I-300)+(1.033)+(17.004), (I-300)+(1.033)+(17.005), (I-300)+(1.033)+(17.006), (I-300)+(1.033)+(17.007), (I-300)+(1.033)+(17.008), (I-300)+(1.033)+(17.009), (I-300)+(1.033)+(17.010), (I-300)+(1.033)+(17.011), (I-300)+(1.033)+(17.012), (I-300)+(1.033)+(18.001), (I-300)+(1.034)+(1.035), (I-300)+(1.034)+(1.036), (I-300)+(1.034)+(1.037), (I-300)+(1.034)+(1.038), (I-300)+(1.034)+(1.039), (I-300)+(1.034)+(1.040), (I-300)+(1.034)+(1.041), (I-300)+(1.034)+(1.042), (I-300)+(1.034)+(1.043), (I-300)+(1.034)+(1.044), (I-300)+(1.034)+(1.045), (I-300)+(1.034)+(1.046), (I-300)+(1.034)+(1.047), (I-300)+(1.034)+(1.048), (I-300)+(1.034)+(1.049), (I-300)+(1.034)+(1.050), (I-300)+(1.034)+(1.051), (I-300)+(1.034)+(1.052), (I-300)+(1.034)+(1.053), (I-300)+(1.034)+(1.054), (I-300)+(1.034)+(1.055), (I-300)+(1.034)+(1.056), (I-300)+(1.034)+(1.057), (I-300)+(1.034)+(1.058), (I-300)+(1.034)+(1.059), (I-300)+(1.034)+(1.060), (I-300)+(1.034)+(1.061), (I-300)+(1.034)+(1.062), (I-300)+(1.034)+(1.063), (I-300)+(1.034)+(1.064), (I-300)+(1.034)+(1.065), (I-300)+(1.034)+(1.066), (I-300)+(1.034)+(1.067), (I-300)+(1.034)+(1.068), (I-300)+(1.034)+(1.069), (I-300)+(1.034)+(1.070), (I-300)+(1.034)+(1.071), (I-300)+(1.034)+(1.072), (I-300)+(1.034)+(1.073), (I-300)+(1.034)+(1.074), (I-300)+(1.034)+(1.075), (I-300)+(1.034)+(1.076), (I-300)+(1.034)+(1.077), (I-300)+(1.034)+(1.078), (I-300)+(1.034)+(1.079), (I-300)+(1.034)+(1.080), (I-300)+(1.034)+(1.081), (I-300)+(1.034)+(1.082), (I-300)+(1.034)+(1.083), (I-300)+(1.034)+(1.084), (I-300)+(1.034)+(1.085), (I-300)+(1.034)+(1.086), (I-300)+(1.034)+(1.087), (I-300)+(1.034)+(1.088), (I-300)+(1.034)+(1.089), (I-300)+(1.034)+(1.090), (I-300)+(1.034)+(1.091), (I-300)+(1.034)+(1.092), (I-300)+(1.034)+(2.001), (I-300)+(1.034)+(2.002), (I-300)+(1.034)+(2.003), (I-300)+(1.034)+(2.004), (I-300)+(1.034)+(2.005), (I-300)+(1.034)+(2.006), (I-300)+(1.034)+(2.007), (I-300)+(1.034)+(2.008), (I-300)+(1.034)+(2.009), (I-300)+(1.034)+(2.010), (I-300)+(1.034)+(2.011), (I-300)+(1.034)+(2.012), (I-300)+(1.034)+(2.013), (I-300)+(1.034)+(2.014), (I-300)+(1.034)+(2.015), (I-300)+(1.034)+(2.016), (I-300)+(1.034)+(2.017), (I-300)+(1.034)+(2.018), (I-300)+(1.034)+(2.019), (I-300)+(1.034)+(2.020), (I-300)+(1.034)+(2.021), (I-300)+(1.034)+(2.022), (I-300)+(1.034)+(2.023), (I-300)+(1.034)+(2.024), (I-300)+(1.034)+(2.025), (I-300)+(1.034)+(2.026), (I-300)+(1.034)+(2.027), (I-300)+(1.034)+(2.028), (I-300)+(1.034)+(2.029), (I-300)+(1.034)+(2.030), (I-300)+(1.034)+(2.031), (I-300)+(1.034)+(2.032), (I-300)+(1.034)+(2.033), (I-300)+(1.034)+(2.034), (I-300)+(1.034)+(2.035), (I-300)+(1.034)+(2.036), (I-300)+(1.034)+(2.037), (I-300)+(1.034)+(2.038), (I-300)+(1.034)+(2.039), (I-300)+(1.034)+(2.040), (I-300)+(1.034)+(2.041), (I-300)+(1.034)+(2.042), (I-300)+(1.034)+(2.043), (I-300)+(1.034)+(2.044), (I-300)+(1.034)+(2.045), (I-300)+(1.034)+(2.046), (I-300)+(1.034)+(2.047), (I-300)+(1.034)+(2.048), (I-300)+(1.034)+(2.049), (I-300)+(1.034)+(2.050), (I-300)+(1.034)+(2.051), (I-300)+(1.034)+(2.052), (I-300)+(1.034)+(2.053), (I-300)+(1.034)+(2.054), (I-300)+(1.034)+(2.055), (I-300)+(1.034)+(2.056), (I-300)+(1.034)+(2.057), (I-300)+(1.034)+(2.058), (I-300)+(1.034)+(2.059), (I-300)+(1.034)+(3.001), (I-300)+(1.034)+(3.002), (I-300)+(1.034)+(3.003), (I-300)+(1.034)+(3.004), (I-300)+(1.034)+(3.005), (I-300)+(1.034)+(3.006), (I-300)+(1.034)+(3.007), (I-300)+(1.034)+(3.008), (I-300)+(1.034)+(3.009), (I-300)+(1.034)+(3.010), (I-300)+(1.034)+(3.011), (I-300)+(1.034)+(3.012), (I-300)+(1.034)+(3.013), (I-300)+(1.034)+(3.014), (I-300)+(1.034)+(3.015), (I-300)+(1.034)+(3.016), (I-300)+(1.034)+(3.017), (I-300)+(1.034)+(3.018), (I-300)+(1.034)+(3.019), (I-300)+(1.034)+(3.020), (I-300)+(1.034)+(3.021), (I-300)+(1.034)+(3.022), (I-300)+(1.034)+(3.023), (I-300)+(1.034)+(3.024), (I-300)+(1.034)+(3.025), (I-300)+(1.034)+(3.026), (I-300)+(1.034)+(3.027), (I-300)+(1.034)+(3.028), (I-300)+(1.034)+(3.029), (I-300)+(1.034)+(3.030), (I-300)+(1.034)+(3.031), (I-300)+(1.034)+(5.001), (I-300)+(1.034)+(5.002), (I-300)+(1.034)+(5.003), (I-300)+(1.034)+(5.004), (I-300)+(1.034)+(5.005), (I-300)+(1.034)+(5.006), (I-300)+(1.034)+(5.007), (I-300)+(1.034)+(5.008), (I-300)+(1.034)+(5.009), (I-300)+(1.034)+(5.010), (I-300)+(1.034)+(5.011), (I-300)+(1.034)+(5.012), (I-300)+(1.034)+(5.013), (I-300)+(1.034)+(5.014), (I-300)+(1.034)+(5.015), (I-300)+(1.034)+(5.016), (I-300)+(1.034)+(5.017), (I-300)+(1.034)+(5.018), (I-300)+(1.034)+(5.019), (I-300)+(1.034)+(5.020), (I-300)+(1.034)+(5.021), (I-300)+(1.034)+(5.022), (I-300)+(1.034)+(5.023), (I-300)+(1.034)+(6.001), (I-300)+(1.034)+(6.002), (I-300)+(1.034)+(6.003), (I-300)+(1.034)+(6.004), (I-300)+(1.034)+(7.001), (I-300)+(1.034)+(7.002), (I-300)+(1.034)+(7.003), (I-300)+(1.034)+(7.004), (I-300)+(1.034)+(7.005), (I-300)+(1.034)+(7.006), (I-300)+(1.034)+(9.001), (I-300)+(1.034)+(9.002), (I-300)+(1.034)+(9.003), (I-300)+(1.034)+(9.004), (I-300)+(1.034)+(9.005), (I-300)+(1.034)+(9.006), (I-300)+(1.034)+(9.007), (I-300)+(1.034)+(9.008), (I-300)+(1.034)+(9.009), (I-300)+(1.034)+(14.001), (I-300)+(1.034)+(14.002), (I-300)+(1.034)+(15.008), (I-300)+(1.034)+(15.011), (I-300)+(1.034)+(15.012), (I-300)+(1.034)+(15.016), (I-300)+(1.034)+(15.025), (I-300)+(1.034)+(15.027), (I-300)+(1.034)+(15.047), (I-300)+(1.034)+(15.063), (I-300)+(1.034)+(15.064), (I-300)+(1.034)+(16.001), (I-300)+(1.034)+(16.002), (I-300)+(1.034)+(16.003), (I-300)+(1.034)+(16.004), (I-300)+(1.034)+(16.005), (I-300)+(1.034)+(16.006), (I-300)+(1.034)+(16.007), (I-300)+(1.034)+(16.008), (I-300)+(1.034)+(17.001), (I-300)+(1.034)+(17.002), (I-300)+(1.034)+(17.003), (I-300)+(1.034)+(17.004), (I-300)+(1.034)+(17.005), (I-300)+(1.034)+(17.006), (I-300)+(1.034)+(17.007), (I-300)+(1.034)+(17.008), (I-300)+(1.034)+(17.009), (I-300)+(1.034)+(17.010), (I-300)+(1.034)+(17.011), (I-300)+(1.034)+(17.012), (I-300)+(1.034)+(18.001), (I-300)+(1.035)+(1.036), (I-300)+(1.035)+(1.037), (I-300)+(1.035)+(1.038), (I-300)+(1.035)+(1.039), (I-300)+(1.035)+(1.040), (I-300)+(1.035)+(1.041), (I-300)+(1.035)+(1.042), (I-300)+(1.035)+(1.043), (I-300)+(1.035)+(1.044), (I-300)+(1.035)+(1.045), (I-300)+(1.035)+(1.046), (I-300)+(1.035)+(1.047), (I-300)+(1.035)+(1.048), (I-300)+(1.035)+(1.049), (I-300)+(1.035)+(1.050), (I-300)+(1.035)+(1.051), (I-300)+(1.035)+(1.052), (I-300)+(1.035)+(1.053), (I-300)+(1.035)+(1.054), (I-300)+(1.035)+(1.055), (I-300)+(1.035)+(1.056), (I-300)+(1.035)+(1.057), (I-300)+(1.035)+(1.058), (I-300)+(1.035)+(1.059), (I-300)+(1.035)+(1.060), (I-300)+(1.035)+(1.061), (I-300)+(1.035)+(1.062), (I-300)+(1.035)+(1.063), (I-300)+(1.035)+(1.064), (I-300)+(1.035)+(1.065), (I-300)+(1.035)+(1.066), (I-300)+(1.035)+(1.067), (I-300)+(1.035)+(1.068), (I-300)+(1.035)+(1.069), (I-300)+(1.035)+(1.070), (I-300)+(1.035)+(1.071), (I-300)+(1.035)+(1.072), (I-300)+(1.035)+(1.073),
(I-300)+(1.035)+(1.074), (I-300)+(1.035)+(1.075),
(I-300)+(1.035)+(1.076), (I-300)+(1.035)+(1.077),
(I-300)+(1.035)+(1.078), (I-300)+(1.035)+(1.079),
(I-300)+(1.035)+(1.080), (I-300)+(1.035)+(1.081),
(I-300)+(1.035)+(1.082), (I-300)+(1.035)+(1.083),
(I-300)+(1.035)+(1.084), (I-300)+(1.035)+(1.085),
(I-300)+(1.035)+(1.086), (I-300)+(1.035)+(1.087),
(I-300)+(1.035)+(1.088), (I-300)+(1.035)+(1.089),
(I-300)+(1.035)+(1.090), (I-300)+(1.035)+(1.091),
(I-300)+(1.035)+(1.092), (I-300)+(1.035)+(2.001),
(I-300)+(1.035)+(2.002), (I-300)+(1.035)+(2.003),
(I-300)+(1.035)+(2.004), (I-300)+(1.035)+(2.005),
(I-300)+(1.035)+(2.006), (I-300)+(1.035)+(2.007),
(I-300)+(1.035)+(2.008), (I-300)+(1.035)+(2.009),
(I-300)+(1.035)+(2.010), (I-300)+(1.035)+(2.011),
(I-300)+(1.035)+(2.012), (I-300)+(1.035)+(2.013),
(I-300)+(1.035)+(2.014), (I-300)+(1.035)+(2.015),
(I-300)+(1.035)+(2.016), (I-300)+(1.035)+(2.017),
(I-300)+(1.035)+(2.018), (I-300)+(1.035)+(2.019),
(I-300)+(1.035)+(2.020), (I-300)+(1.035)+(2.021),
(I-300)+(1.035)+(2.022), (I-300)+(1.035)+(2.023),
(I-300)+(1.035)+(2.024), (I-300)+(1.035)+(2.025),
(I-300)+(1.035)+(2.026), (I-300)+(1.035)+(2.027),
(I-300)+(1.035)+(2.028), (I-300)+(1.035)+(2.029),
(I-300)+(1.035)+(2.030), (I-300)+(1.035)+(2.031),
(I-300)+(1.035)+(2.032), (I-300)+(1.035)+(2.033),
(I-300)+(1.035)+(2.034), (I-300)+(1.035)+(2.035),
(I-300)+(1.035)+(2.036), (I-300)+(1.035)+(2.037),
(I-300)+(1.035)+(2.038), (I-300)+(1.035)+(2.039),
(I-300)+(1.035)+(2.040), (I-300)+(1.035)+(2.041),
(I-300)+(1.035)+(2.042), (I-300)+(1.035)+(2.043),
(I-300)+(1.035)+(2.044), (I-300)+(1.035)+(2.045),
(I-300)+(1.035)+(2.046), (I-300)+(1.035)+(2.047),
(I-300)+(1.035)+(2.048), (I-300)+(1.035)+(2.049),
(I-300)+(1.035)+(2.050), (I-300)+(1.035)+(2.051),
(I-300)+(1.035)+(2.052), (I-300)+(1.035)+(2.053),
(I-300)+(1.035)+(2.054), (I-300)+(1.035)+(2.055),
(I-300)+(1.035)+(2.056), (I-300)+(1.035)+(2.057),
(I-300)+(1.035)+(2.058), (I-300)+(1.035)+(2.059),
(I-300)+(1.035)+(3.001), (I-300)+(1.035)+(3.002),
(I-300)+(1.035)+(3.003), (I-300)+(1.035)+(3.004),
(I-300)+(1.035)+(3.005), (I-300)+(1.035)+(3.006),
(I-300)+(1.035)+(3.007), (I-300)+(1.035)+(3.008),
(I-300)+(1.035)+(3.009), (I-300)+(1.035)+(3.010),
(I-300)+(1.035)+(3.011), (I-300)+(1.035)+(3.012),
(I-300)+(1.035)+(3.013), (I-300)+(1.035)+(3.014),
(I-300)+(1.035)+(3.015), (I-300)+(1.035)+(3.016),
(I-300)+(1.035)+(3.017), (I-300)+(1.035)+(3.018),
(I-300)+(1.035)+(3.019), (I-300)+(1.035)+(3.020),
(I-300)+(1.035)+(3.021), (I-300)+(1.035)+(3.022),
(I-300)+(1.035)+(3.023), (I-300)+(1.035)+(3.024),
(I-300)+(1.035)+(3.025), (I-300)+(1.035)+(3.026),
(I-300)+(1.035)+(3.027), (I-300)+(1.035)+(3.028),
(I-300)+(1.035)+(3.029), (I-300)+(1.035)+(3.030),
(I-300)+(1.035)+(3.031), (I-300)+(1.035)+(5.001),
(I-300)+(1.035)+(5.002), (I-300)+(1.035)+(5.003),
(I-300)+(1.035)+(5.004), (I-300)+(1.035)+(5.005),
(I-300)+(1.035)+(5.006), (I-300)+(1.035)+(5.007),
(I-300)+(1.035)+(5.008), (I-300)+(1.035)+(5.009),
(I-300)+(1.035)+(5.010), (I-300)+(1.035)+(5.011),
(I-300)+(1.035)+(5.012), (I-300)+(1.035)+(5.013),
(I-300)+(1.035)+(5.014), (I-300)+(1.035)+(5.015),
(I-300)+(1.035)+(5.016), (I-300)+(1.035)+(5.017),
(I-300)+(1.035)+(5.018), (I-300)+(1.035)+(5.019),
(I-300)+(1.035)+(5.020), (I-300)+(1.035)+(5.021),
(I-300)+(1.035)+(5.022), (I-300)+(1.035)+(5.023),
(I-300)+(1.035)+(6.001), (I-300)+(1.035)+(6.002),
(I-300)+(1.035)+(6.003), (I-300)+(1.035)+(6.004),
(I-300)+(1.035)+(7.001), (I-300)+(1.035)+(7.002),
(I-300)+(1.035)+(7.003), (I-300)+(1.035)+(7.004),
(I-300)+(1.035)+(7.005), (I-300)+(1.035)+(7.006),
(I-300)+(1.035)+(9.001), (I-300)+(1.035)+(9.002),
(I-300)+(1.035)+(9.003), (I-300)+(1.035)+(9.004),
(I-300)+(1.035)+(9.005), (I-300)+(1.035)+(9.006),
(I-300)+(1.035)+(9.007), (I-300)+(1.035)+(9.008),
(I-300)+(1.035)+(9.009), (I-300)+(1.035)+(14.001),
(I-300)+(1.035)+(14.002), (I-300)+(1.035)+(15.008),
(I-300)+(1.035)+(15.011), (I-300)+(1.035)+(15.012),
(I-300)+(1.035)+(15.016), (I-300)+(1.035)+(15.025),
(I-300)+(1.035)+(15.027), (I-300)+(1.035)+(15.047),
(I-300)+(1.035)+(15.063), (I-300)+(1.035)+(15.064),
(I-300)+(1.035)+(16.001), (I-300)+(1.035)+(16.002),
(I-300)+(1.035)+(16.003), (I-300)+(1.035)+(16.004),
(I-300)+(1.035)+(16.005), (I-300)+(1.035)+(16.006),
(I-300)+(1.035)+(16.007), (I-300)+(1.035)+(16.008),
(I-300)+(1.035)+(17.001), (I-300)+(1.035)+(17.002),
(I-300)+(1.035)+(17.003), (I-300)+(1.035)+(17.004),
(I-300)+(1.035)+(17.005), (I-300)+(1.035)+(17.006),
(I-300)+(1.035)+(17.007), (I-300)+(1.035)+(17.008),
(I-300)+(1.035)+(17.009), (I-300)+(1.035)+(17.010),
(I-300)+(1.035)+(17.011), (I-300)+(1.035)+(17.012),
(I-300)+(1.035)+(18.001),
(I-300)+(1.036)+(1.037), (I-300)+(1.036)+(1.038),
(I-300)+(1.036)+(1.039), (I-300)+(1.036)+(1.040),
(I-300)+(1.036)+(1.041), (I-300)+(1.036)+(1.042),
(I-300)+(1.036)+(1.043), (I-300)+(1.036)+(1.044),
(I-300)+(1.036)+(1.045), (I-300)+(1.036)+(1.046),
(I-300)+(1.036)+(1.047), (I-300)+(1.036)+(1.048),
(I-300)+(1.036)+(1.049), (I-300)+(1.036)+(1.050),
(I-300)+(1.036)+(1.051), (I-300)+(1.036)+(1.052),
(I-300)+(1.036)+(1.053), (I-300)+(1.036)+(1.054),
(I-300)+(1.036)+(1.055), (I-300)+(1.036)+(1.056),
(I-300)+(1.036)+(1.057), (I-300)+(1.036)+(1.058),
(I-300)+(1.036)+(1.059), (I-300)+(1.036)+(1.060),
(I-300)+(1.036)+(1.061), (I-300)+(1.036)+(1.062),
(I-300)+(1.036)+(1.063), (I-300)+(1.036)+(1.064),
(I-300)+(1.036)+(1.065), (I-300)+(1.036)+(1.066),
(I-300)+(1.036)+(1.067), (I-300)+(1.036)+(1.068),
(I-300)+(1.036)+(1.069), (I-300)+(1.036)+(1.070),
(I-300)+(1.036)+(1.071), (I-300)+(1.036)+(1.072),
(I-300)+(1.036)+(1.073), (I-300)+(1.036)+(1.074),
(I-300)+(1.036)+(1.075), (I-300)+(1.036)+(1.076),
(I-300)+(1.036)+(1.077), (I-300)+(1.036)+(1.078),
(I-300)+(1.036)+(1.079), (I-300)+(1.036)+(1.080),
(I-300)+(1.036)+(1.081), (I-300)+(1.036)+(1.082),
(I-300)+(1.036)+(1.083), (I-300)+(1.036)+(1.084),
(I-300)+(1.036)+(1.085), (I-300)+(1.036)+(1.086),
(I-300)+(1.036)+(1.087), (I-300)+(1.036)+(1.088),
(I-300)+(1.036)+(1.089), (I-300)+(1.036)+(1.090),
(I-300)+(1.036)+(1.091), (I-300)+(1.036)+(1.092),
(I-300)+(1.036)+(2.001), (I-300)+(1.036)+(2.002),
(I-300)+(1.036)+(2.003), (I-300)+(1.036)+(2.004),
(I-300)+(1.036)+(2.005), (I-300)+(1.036)+(2.006),
(I-300)+(1.036)+(2.007), (I-300)+(1.036)+(2.008),
(I-300)+(1.036)+(2.009), (I-300)+(1.036)+(2.010),
(I-300)+(1.036)+(2.011), (I-300)+(1.036)+(2.012),
(I-300)+(1.036)+(2.013), (I-300)+(1.036)+(2.014),
(I-300)+(1.036)+(2.015), (I-300)+(1.036)+(2.016),
(I-300)+(1.036)+(2.017), (I-300)+(1.036)+(2.018),
(I-300)+(1.036)+(2.019), (I-300)+(1.036)+(2.020),
(I-300)+(1.036)+(2.021), (I-300)+(1.036)+(2.022),
(I-300)+(1.036)+(2.023), (I-300)+(1.036)+(2.024),
(I-300)+(1.036)+(2.025), (I-300)+(1.036)+(2.026), (I-300)+(1.036)+(2.027), (I-300)+(1.036)+(2.028), (I-300)+(1.036)+(2.029), (I-300)+(1.036)+(2.030), (I-300)+(1.036)+(2.031), (I-300)+(1.036)+(2.032), (I-300)+(1.036)+(2.033), (I-300)+(1.036)+(2.034), (I-300)+(1.036)+(2.035), (I-300)+(1.036)+(2.036), (I-300)+(1.036)+(2.037), (I-300)+(1.036)+(2.038), (I-300)+(1.036)+(2.039), (I-300)+(1.036)+(2.040), (I-300)+(1.036)+(2.041), (I-300)+(1.036)+(2.042), (I-300)+(1.036)+(2.043), (I-300)+(1.036)+(2.044), (I-300)+(1.036)+(2.045), (I-300)+(1.036)+(2.046), (I-300)+(1.036)+(2.047), (I-300)+(1.036)+(2.048), (I-300)+(1.036)+(2.049), (I-300)+(1.036)+(2.050), (I-300)+(1.036)+(2.051), (I-300)+(1.036)+(2.052), (I-300)+(1.036)+(2.053), (I-300)+(1.036)+(2.054), (I-300)+(1.036)+(2.055), (I-300)+(1.036)+(2.056), (I-300)+(1.036)+(2.057), (I-300)+(1.036)+(2.058), (I-300)+(1.036)+(2.059), (I-300)+(1.036)+(3.001), (I-300)+(1.036)+(3.002), (I-300)+(1.036)+(3.003), (I-300)+(1.036)+(3.004), (I-300)+(1.036)+(3.005), (I-300)+(1.036)+(3.006), (I-300)+(1.036)+(3.007), (I-300)+(1.036)+(3.008), (I-300)+(1.036)+(3.009), (I-300)+(1.036)+(3.010), (I-300)+(1.036)+(3.011), (I-300)+(1.036)+(3.012), (I-300)+(1.036)+(3.013), (I-300)+(1.036)+(3.014), (I-300)+(1.036)+(3.015), (I-300)+(1.036)+(3.016), (I-300)+(1.036)+(3.017), (I-300)+(1.036)+(3.018), (I-300)+(1.036)+(3.019), (I-300)+(1.036)+(3.020), (I-300)+(1.036)+(3.021), (I-300)+(1.036)+(3.022), (I-300)+(1.036)+(3.023), (I-300)+(1.036)+(3.024), (I-300)+(1.036)+(3.025), (I-300)+(1.036)+(3.026), (I-300)+(1.036)+(3.027), (I-300)+(1.036)+(3.028), (I-300)+(1.036)+(3.029), (I-300)+(1.036)+(3.030), (I-300)+(1.036)+(3.031), (I-300)+(1.036)+(5.001), (I-300)+(1.036)+(5.002), (I-300)+(1.036)+(5.003), (I-300)+(1.036)+(5.004), (I-300)+(1.036)+(5.005), (I-300)+(1.036)+(5.006), (I-300)+(1.036)+(5.007), (I-300)+(1.036)+(5.008), (I-300)+(1.036)+(5.009), (I-300)+(1.036)+(5.010), (I-300)+(1.036)+(5.011), (I-300)+(1.036)+(5.012), (I-300)+(1.036)+(5.013), (I-300)+(1.036)+(5.014), (I-300)+(1.036)+(5.015), (I-300)+(1.036)+(5.016), (I-300)+(1.036)+(5.017), (I-300)+(1.036)+(5.018), (I-300)+(1.036)+(5.019), (I-300)+(1.036)+(5.020), (I-300)+(1.036)+(5.021), (I-300)+(1.036)+(5.022), (I-300)+(1.036)+(5.023), (I-300)+(1.036)+(6.001), (I-300)+(1.036)+(6.002), (I-300)+(1.036)+(6.003), (I-300)+(1.036)+(6.004), (I-300)+(1.036)+(7.001), (I-300)+(1.036)+(7.002), (I-300)+(1.036)+(7.003), (I-300)+(1.036)+(7.004), (I-300)+(1.036)+(7.005), (I-300)+(1.036)+(7.006), (I-300)+(1.036)+(9.001), (I-300)+(1.036)+(9.002), (I-300)+(1.036)+(9.003), (I-300)+(1.036)+(9.004), (I-300)+(1.036)+(9.005), (I-300)+(1.036)+(9.006), (I-300)+(1.036)+(9.007), (I-300)+(1.036)+(9.008), (I-300)+(1.036)+(9.009), (I-300)+(1.036)+(14.001), (I-300)+(1.036)+(14.002), (I-300)+(1.036)+(15.008), (I-300)+(1.036)+(15.011), (I-300)+(1.036)+(15.012), (I-300)+(1.036)+(15.016), (I-300)+(1.036)+(15.025), (I-300)+(1.036)+(15.027), (I-300)+(1.036)+(15.047), (I-300)+(1.036)+(15.063), (I-300)+(1.036)+(15.064), (I-300)+(1.036)+(16.001), (I-300)+(1.036)+(16.002), (I-300)+(1.036)+(16.003), (I-300)+(1.036)+(16.004), (I-300)+(1.036)+(16.005), (I-300)+(1.036)+(16.006), (I-300)+(1.036)+(16.007), (I-300)+(1.036)+(16.008), (I-300)+(1.036)+(17.001), (I-300)+(1.036)+(17.002), (I-300)+(1.036)+(17.003), (I-300)+(1.036)+(17.004), (I-300)+(1.036)+(17.005), (I-300)+(1.036)+(17.006), (I-300)+(1.036)+(17.007), (I-300)+(1.036)+(17.008), (I-300)+(1.036)+(17.009), (I-300)+(1.036)+(17.010), (I-300)+(1.036)+(17.011), (I-300)+(1.036)+(17.012), (I-300)+(1.036)+(18.001), (I-300)+(1.037)+(1.038), (I-300)+(1.037)+(1.039), (I-300)+(1.037)+(1.040), (I-300)+(1.037)+(1.041), (I-300)+(1.037)+(1.042), (I-300)+(1.037)+(1.043), (I-300)+(1.037)+(1.044), (I-300)+(1.037)+(1.045), (I-300)+(1.037)+(1.046), (I-300)+(1.037)+(1.047), (I-300)+(1.037)+(1.048), (I-300)+(1.037)+(1.049), (I-300)+(1.037)+(1.050), (I-300)+(1.037)+(1.051), (I-300)+(1.037)+(1.052), (I-300)+(1.037)+(1.053), (I-300)+(1.037)+(1.054), (I-300)+(1.037)+(1.055), (I-300)+(1.037)+(1.056), (I-300)+(1.037)+(1.057), (I-300)+(1.037)+(1.058), (I-300)+(1.037)+(1.059), (I-300)+(1.037)+(1.060), (I-300)+(1.037)+(1.061), (I-300)+(1.037)+(1.062), (I-300)+(1.037)+(1.063), (I-300)+(1.037)+(1.064), (I-300)+(1.037)+(1.065), (I-300)+(1.037)+(1.066), (I-300)+(1.037)+(1.067), (I-300)+(1.037)+(1.068), (I-300)+(1.037)+(1.069), (I-300)+(1.037)+(1.070), (I-300)+(1.037)+(1.071), (I-300)+(1.037)+(1.072), (I-300)+(1.037)+(1.073), (I-300)+(1.037)+(1.074), (I-300)+(1.037)+(1.075), (I-300)+(1.037)+(1.076), (I-300)+(1.037)+(1.077), (I-300)+(1.037)+(1.078), (I-300)+(1.037)+(1.079), (I-300)+(1.037)+(1.080), (I-300)+(1.037)+(1.081), (I-300)+(1.037)+(1.082), (I-300)+(1.037)+(1.083), (I-300)+(1.037)+(1.084), (I-300)+(1.037)+(1.085), (I-300)+(1.037)+(1.086), (I-300)+(1.037)+(1.087), (I-300)+(1.037)+(1.088), (I-300)+(1.037)+(1.089), (I-300)+(1.037)+(1.090), (I-300)+(1.037)+(1.091), (I-300)+(1.037)+(1.092), (I-300)+(1.037)+(2.001), (I-300)+(1.037)+(2.002), (I-300)+(1.037)+(2.003), (I-300)+(1.037)+(2.004), (I-300)+(1.037)+(2.005), (I-300)+(1.037)+(2.006), (I-300)+(1.037)+(2.007), (I-300)+(1.037)+(2.008), (I-300)+(1.037)+(2.009), (I-300)+(1.037)+(2.010), (I-300)+(1.037)+(2.011), (I-300)+(1.037)+(2.012), (I-300)+(1.037)+(2.013), (I-300)+(1.037)+(2.014), (I-300)+(1.037)+(2.015), (I-300)+(1.037)+(2.016), (I-300)+(1.037)+(2.017), (I-300)+(1.037)+(2.018), (I-300)+(1.037)+(2.019), (I-300)+(1.037)+(2.020), (I-300)+(1.037)+(2.021), (I-300)+(1.037)+(2.022), (I-300)+(1.037)+(2.023), (I-300)+(1.037)+(2.024), (I-300)+(1.037)+(2.025), (I-300)+(1.037)+(2.026), (I-300)+(1.037)+(2.027), (I-300)+(1.037)+(2.028), (I-300)+(1.037)+(2.029), (I-300)+(1.037)+(2.030), (I-300)+(1.037)+(2.031), (I-300)+(1.037)+(2.032), (I-300)+(1.037)+(2.033), (I-300)+(1.037)+(2.034), (I-300)+(1.037)+(2.035), (I-300)+(1.037)+(2.036), (I-300)+(1.037)+(2.037), (I-300)+(1.037)+(2.038), (I-300)+(1.037)+(2.039), (I-300)+(1.037)+(2.040), (I-300)+(1.037)+(2.041), (I-300)+(1.037)+(2.042), (I-300)+(1.037)+(2.043), (I-300)+(1.037)+(2.044), (I-300)+(1.037)+(2.045), (I-300)+(1.037)+(2.046), (I-300)+(1.037)+(2.047), (I-300)+(1.037)+(2.048), (I-300)+(1.037)+(2.049), (I-300)+(1.037)+(2.050), (I-300)+(1.037)+(2.051), (I-300)+(1.037)+(2.052), (I-300)+(1.037)+(2.053), (I-300)+(1.037)+(2.054), (I-300)+(1.037)+(2.055), (I-300)+(1.037)+(2.056), (I-300)+(1.037)+(2.057), (I-300)+(1.037)+(2.058), (I-300)+(1.037)+(2.059), (I-300)+(1.037)+(3.001), (I-300)+(1.037)+(3.002), (I-300)+(1.037)+(3.003), (I-300)+(1.037)+(3.004), (I-300)+(1.037)+(3.005), (I-300)+(1.037)+(3.006), (I-300)+(1.037)+(3.007), (I-300)+(1.037)+(3.008), (I-300)+(1.037)+(3.009), (I-300)+(1.037)+(3.010), (I-300)+(1.037)+(3.011), (I-300)+(1.037)+(3.012), (I-300)+(1.037)+(3.013), (I-300)+(1.037)+(3.014), (I-300)+(1.037)+(3.015), (I-300)+(1.037)+(3.016), (I-300)+(1.037)+(3.017), (I-300)+(1.037)+(3.018), (I-300)+(1.037)+(3.019), (I-300)+(1.037)+(3.020), (I-300)+(1.037)+(3.021), (I-300)+(1.037)+(3.022), (I-300)+(1.037)+(3.023), (I-300)+(1.037)+(3.024), (I-300)+(1.037)+(3.025), (I-300)+(1.037)+(3.026), (I-300)+(1.037)+(3.027), (I-300)+(1.037)+(3.028), (I-300)+(1.037)+(3.029), (I-300)+(1.037)+(3.030), (I-300)+(1.037)+(3.031), (I-300)+(1.037)+(5.001), (I-300)+(1.037)+(5.002), (I-300)+(1.037)+(5.003), (I-300)+(1.037)+(5.004), (I-300)+(1.037)+(5.005), (I-300)+(1.037)+(5.006), (I-300)+(1.037)+(5.007), (I-300)+(1.037)+(5.008), (I-300)+(1.037)+(5.009), (I-300)+(1.037)+(5.010), (I-300)+(1.037)+(5.011), (I-300)+(1.037)+(5.012), (I-300)+(1.037)+(5.013), (I-300)+(1.037)+(5.014), (I-300)+(1.037)+(5.015), (I-300)+(1.037)+(5.016), (I-300)+(1.037)+(5.017), (I-300)+(1.037)+(5.018), (I-300)+(1.037)+(5.019), (I-300)+(1.037)+(5.020), (I-300)+(1.037)+(5.021), (I-300)+(1.037)+(5.022), (I-300)+(1.037)+(5.023), (I-300)+(1.037)+(6.001), (I-300)+(1.037)+(6.002), (I-300)+(1.037)+(6.003), (I-300)+(1.037)+(6.004), (I-300)+(1.037)+(7.001), (I-300)+(1.037)+(7.002), (I-300)+(1.037)+(7.003), (I-300)+(1.037)+(7.004), (I-300)+(1.037)+(7.005), (I-300)+(1.037)+(7.006), (I-300)+(1.037)+(9.001), (I-300)+(1.037)+(9.002), (I-300)+(1.037)+(9.003), (I-300)+(1.037)+(9.004), (I-300)+(1.037)+(9.005), (I-300)+(1.037)+(9.006), (I-300)+(1.037)+(9.007), (I-300)+(1.037)+(9.008), (I-300)+(1.037)+(9.009), (I-300)+(1.037)+(14.001), (I-300)+(1.037)+(14.002), (I-300)+(1.037)+(15.008), (I-300)+(1.037)+(15.011), (I-300)+(1.037)+(15.012), (I-300)+(1.037)+(15.016), (I-300)+(1.037)+(15.025), (I-300)+(1.037)+(15.027), (I-300)+(1.037)+(15.047), (I-300)+(1.037)+(15.063), (I-300)+(1.037)+(15.064), (I-300)+(1.037)+(16.001), (I-300)+(1.037)+(16.002), (I-300)+(1.037)+(16.003), (I-300)+(1.037)+(16.004), (I-300)+(1.037)+(16.005), (I-300)+(1.037)+(16.006), (I-300)+(1.037)+(16.007), (I-300)+(1.037)+(16.008), (I-300)+(1.037)+(17.001), (I-300)+(1.037)+(17.002), (I-300)+(1.037)+(17.003), (I-300)+(1.037)+(17.004), (I-300)+(1.037)+(17.005), (I-300)+(1.037)+(17.006), (I-300)+(1.037)+(17.007), (I-300)+(1.037)+(17.008), (I-300)+(1.037)+(17.009), (I-300)+(1.037)+(17.010), (I-300)+(1.037)+(17.011), (I-300)+(1.037)+(17.012), (I-300)+(1.037)+(18.001), (I-300)+(1.038)+(1.039), (I-300)+(1.038)+(1.040), (I-300)+(1.038)+(1.041), (I-300)+(1.038)+(1.042), (I-300)+(1.038)+(1.043), (I-300)+(1.038)+(1.044), (I-300)+(1.038)+(1.045), (I-300)+(1.038)+(1.046), (I-300)+(1.038)+(1.047), (I-300)+(1.038)+(1.048), (I-300)+(1.038)+(1.049), (I-300)+(1.038)+(1.050), (I-300)+(1.038)+(1.051), (I-300)+(1.038)+(1.052), (I-300)+(1.038)+(1.053), (I-300)+(1.038)+(1.054), (I-300)+(1.038)+(1.055), (I-300)+(1.038)+(1.056), (I-300)+(1.038)+(1.057), (I-300)+(1.038)+(1.058), (I-300)+(1.038)+(1.059), (I-300)+(1.038)+(1.060), (I-300)+(1.038)+(1.061), (I-300)+(1.038)+(1.062), (I-300)+(1.038)+(1.063), (I-300)+(1.038)+(1.064), (I-300)+(1.038)+(1.065), (I-300)+(1.038)+(1.066), (I-300)+(1.038)+(1.067), (I-300)+(1.038)+(1.068), (I-300)+(1.038)+(1.069), (I-300)+(1.038)+(1.070), (I-300)+(1.038)+(1.071), (I-300)+(1.038)+(1.072), (I-300)+(1.038)+(1.073), (I-300)+(1.038)+(1.074), (I-300)+(1.038)+(1.075), (I-300)+(1.038)+(1.076), (I-300)+(1.038)+(1.077), (I-300)+(1.038)+(1.078), (I-300)+(1.038)+(1.079), (I-300)+(1.038)+(1.080), (I-300)+(1.038)+(1.081), (I-300)+(1.038)+(1.082), (I-300)+(1.038)+(1.083), (I-300)+(1.038)+(1.084), (I-300)+(1.038)+(1.085), (I-300)+(1.038)+(1.086), (I-300)+(1.038)+(1.087), (I-300)+(1.038)+(1.088), (I-300)+(1.038)+(1.089), (I-300)+(1.038)+(1.090), (I-300)+(1.038)+(1.091), (I-300)+(1.038)+(1.092), (I-300)+(1.038)+(2.001), (I-300)+(1.038)+(2.002), (I-300)+(1.038)+(2.003), (I-300)+(1.038)+(2.004), (I-300)+(1.038)+(2.005), (I-300)+(1.038)+(2.006), (I-300)+(1.038)+(2.007), (I-300)+(1.038)+(2.008), (I-300)+(1.038)+(2.009), (I-300)+(1.038)+(2.010), (I-300)+(1.038)+(2.011), (I-300)+(1.038)+(2.012), (I-300)+(1.038)+(2.013), (I-300)+(1.038)+(2.014), (I-300)+(1.038)+(2.015), (I-300)+(1.038)+(2.016), (I-300)+(1.038)+(2.017), (I-300)+(1.038)+(2.018), (I-300)+(1.038)+(2.019), (I-300)+(1.038)+(2.020), (I-300)+(1.038)+(2.021), (I-300)+(1.038)+(2.022), (I-300)+(1.038)+(2.023), (I-300)+(1.038)+(2.024), (I-300)+(1.038)+(2.025), (I-300)+(1.038)+(2.026), (I-300)+(1.038)+(2.027), (I-300)+(1.038)+(2.028), (I-300)+(1.038)+(2.029), (I-300)+(1.038)+(2.030), (I-300)+(1.038)+(2.031), (I-300)+(1.038)+(2.032), (I-300)+(1.038)+(2.033), (I-300)+(1.038)+(2.034), (I-300)+(1.038)+(2.035), (I-300)+(1.038)+(2.036), (I-300)+(1.038)+(2.037), (I-300)+(1.038)+(2.038), (I-300)+(1.038)+(2.039), (I-300)+(1.038)+(2.040), (I-300)+(1.038)+(2.041), (I-300)+(1.038)+(2.042), (I-300)+(1.038)+(2.043), (I-300)+(1.038)+(2.044), (I-300)+(1.038)+(2.045), (I-300)+(1.038)+(2.046), (I-300)+(1.038)+(2.047), (I-300)+(1.038)+(2.048), (I-300)+(1.038)+(2.049), (I-300)+(1.038)+(2.050), (I-300)+(1.038)+(2.051), (I-300)+(1.038)+(2.052), (I-300)+(1.038)+(2.053), (I-300)+(1.038)+(2.054), (I-300)+(1.038)+(2.055), (I-300)+(1.038)+(2.056), (I-300)+(1.038)+(2.057), (I-300)+(1.038)+(2.058), (I-300)+(1.038)+(2.059), (I-300)+(1.038)+(3.001), (I-300)+(1.038)+(3.002), (I-300)+(1.038)+(3.003), (I-300)+(1.038)+(3.004), (I-300)+(1.038)+(3.005), (I-300)+(1.038)+(3.006), (I-300)+(1.038)+(3.007), (I-300)+(1.038)+(3.008), (I-300)+(1.038)+(3.009), (I-300)+(1.038)+(3.010), (I-300)+(1.038)+(3.011), (I-300)+(1.038)+(3.012), (I-300)+(1.038)+(3.013), (I-300)+(1.038)+(3.014), (I-300)+(1.038)+(3.015), (I-300)+(1.038)+(3.016), (I-300)+(1.038)+(3.017), (I-300)+(1.038)+(3.018), (I-300)+(1.038)+(3.019), (I-300)+(1.038)+(3.020), (I-300)+(1.038)+(3.021), (I-300)+(1.038)+(3.022), (I-300)+(1.038)+(3.023), (I-300)+(1.038)+(3.024), (I-300)+(1.038)+(3.025), (I-300)+(1.038)+(3.026), (I-300)+(1.038)+(3.027), (I-300)+(1.038)+(3.028), (I-300)+(1.038)+(3.029), (I-300)+(1.038)+(3.030), (I-300)+(1.038)+(3.031), (I-300)+(1.038)+(5.001), (I-300)+(1.038)+(5.002), (I-300)+(1.038)+(5.003), (I-300)+(1.038)+(5.004), (I-300)+(1.038)+(5.005), (I-300)+(1.038)+(5.006), (I-300)+(1.038)+(5.007), (I-300)+(1.038)+(5.008), (I-300)+(1.038)+(5.009), (I-300)+(1.038)+(5.010), (I-300)+(1.038)+(5.011), (I-300)+(1.038)+(5.012), (I-300)+(1.038)+(5.013), (I-300)+(1.038)+(5.014), (I-300)+(1.038)+(5.015), (I-300)+(1.038)+(5.016), (I-300)+(1.038)+(5.017), (I-300)+(1.038)+(5.018), (I-300)+(1.038)+(5.019), (I-300)+(1.038)+(5.020), (I-300)+(1.038)+(5.021), (I-300)+(1.038)+(5.022), (I-300)+(1.038)+(5.023), (I-300)+(1.038)+(6.001), (I-300)+(1.038)+(6.002), (I-300)+(1.038)+(6.003), (I-300)+(1.038)+(6.004), (I-300)+(1.038)+(7.001), (I-300)+(1.038)+(7.002), (I-300)+(1.038)+(7.003), (I-300)+(1.038)+(7.004), (I-300)+(1.038)+(7.005), (I-300)+(1.038)+(7.006), (I-300)+(1.038)+(9.001), (I-300)+(1.038)+(9.002), (I-300)+(1.038)+(9.003), (I-300)+(1.038)+(9.004), (I-300)+(1.038)+(9.005), (I-300)+(1.038)+(9.006), (I-300)+(1.038)+(9.007), (I-300)+(1.038)+(9.008), (I-300)+(1.038)+(9.009), (I-300)+(1.038)+(14.001), (I-300)+(1.038)+(14.002), (I-300)+(1.038)+(15.008), (I-300)+(1.038)+(15.011), (I-300)+(1.038)+(15.012), (I-300)+(1.038)+(15.016), (I-300)+(1.038)+(15.025), (I-300)+(1.038)+(15.027), (I-300)+(1.038)+(15.047), (I-300)+(1.038)+(15.063), (I-300)+(1.038)+(15.064), (I-300)+(1.038)+(16.001), (I-300)+(1.038)+(16.002), (I-300)+(1.038)+(16.003), (I-300)+(1.038)+(16.004), (I-300)+(1.038)+(16.005), (I-300)+(1.038)+(16.006), (I-300)+(1.038)+(16.007), (I-300)+(1.038)+(16.008), (I-300)+(1.038)+(17.001), (I-300)+(1.038)+(17.002), (I-300)+(1.038)+(17.003), (I-300)+(1.038)+(17.004), (I-300)+(1.038)+(17.005), (I-300)+(1.038)+(17.006), (I-300)+(1.038)+(17.007), (I-300)+(1.038)+(17.008), (I-300)+(1.038)+(17.009), (I-300)+(1.038)+(17.010), (I-300)+(1.038)+(17.011), (I-300)+(1.038)+(17.012), (I-300)+(1.038)+(18.001), (I-300)+(1.039)+(1.040), (I-300)+(1.039)+(1.041), (I-300)+(1.039)+(1.042), (I-300)+(1.039)+(1.043), (I-300)+(1.039)+(1.044), (I-300)+(1.039)+(1.045), (I-300)+(1.039)+(1.046), (I-300)+(1.039)+(1.047), (I-300)+(1.039)+(1.048), (I-300)+(1.039)+(1.049), (I-300)+(1.039)+(1.050), (I-300)+(1.039)+(1.051), (I-300)+(1.039)+(1.052), (I-300)+(1.039)+(1.053), (I-300)+(1.039)+(1.054), (I-300)+(1.039)+(1.055), (I-300)+(1.039)+(1.056), (I-300)+(1.039)+(1.057), (I-300)+(1.039)+(1.058), (I-300)+(1.039)+(1.059), (I-300)+(1.039)+(1.060), (I-300)+(1.039)+(1.061), (I-300)+(1.039)+(1.062), (I-300)+(1.039)+(1.063), (I-300)+(1.039)+(1.064), (I-300)+(1.039)+(1.065), (I-300)+(1.039)+(1.066), (I-300)+(1.039)+(1.067), (I-300)+(1.039)+(1.068), (I-300)+(1.039)+(1.069), (I-300)+(1.039)+(1.070), (I-300)+(1.039)+(1.071), (I-300)+(1.039)+(1.072), (I-300)+(1.039)+(1.073), (I-300)+(1.039)+(1.074), (I-300)+(1.039)+(1.075), (I-300)+(1.039)+(1.076), (I-300)+(1.039)+(1.077), (I-300)+(1.039)+(1.078), (I-300)+(1.039)+(1.079), (I-300)+(1.039)+(1.080), (I-300)+(1.039)+(1.081), (I-300)+(1.039)+(1.082), (I-300)+(1.039)+(1.083), (I-300)+(1.039)+(1.084), (I-300)+(1.039)+(1.085), (I-300)+(1.039)+(1.086), (I-300)+(1.039)+(1.087), (I-300)+(1.039)+(1.088), (I-300)+(1.039)+(1.089), (I-300)+(1.039)+(1.090), (I-300)+(1.039)+(1.091), (I-300)+(1.039)+(1.092), (I-300)+(1.039)+(2.001), (I-300)+(1.039)+(2.002), (I-300)+(1.039)+(2.003), (I-300)+(1.039)+(2.004), (I-300)+(1.039)+(2.005), (I-300)+(1.039)+(2.006), (I-300)+(1.039)+(2.007), (I-300)+(1.039)+(2.008), (I-300)+(1.039)+(2.009), (I-300)+(1.039)+(2.010), (I-300)+(1.039)+(2.011), (I-300)+(1.039)+(2.012), (I-300)+(1.039)+(2.013), (I-300)+(1.039)+(2.014), (I-300)+(1.039)+(2.015), (I-300)+(1.039)+(2.016), (I-300)+(1.039)+(2.017), (I-300)+(1.039)+(2.018), (I-300)+(1.039)+(2.019), (I-300)+(1.039)+(2.020), (I-300)+(1.039)+(2.021), (I-300)+(1.039)+(2.022), (I-300)+(1.039)+(2.023), (I-300)+(1.039)+(2.024), (I-300)+(1.039)+(2.025), (I-300)+(1.039)+(2.026), (I-300)+(1.039)+(2.027), (I-300)+(1.039)+(2.028), (I-300)+(1.039)+(2.029), (I-300)+(1.039)+(2.030), (I-300)+(1.039)+(2.031), (I-300)+(1.039)+(2.032), (I-300)+(1.039)+(2.033), (I-300)+(1.039)+(2.034), (I-300)+(1.039)+(2.035), (I-300)+(1.039)+(2.036), (I-300)+(1.039)+(2.037), (I-300)+(1.039)+(2.038), (I-300)+(1.039)+(2.039), (I-300)+(1.039)+(2.040), (I-300)+(1.039)+(2.041), (I-300)+(1.039)+(2.042), (I-300)+(1.039)+(2.043), (I-300)+(1.039)+(2.044), (I-300)+(1.039)+(2.045), (I-300)+(1.039)+(2.046), (I-300)+(1.039)+(2.047), (I-300)+(1.039)+(2.048), (I-300)+(1.039)+(2.049), (I-300)+(1.039)+(2.050), (I-300)+(1.039)+(2.051), (I-300)+(1.039)+(2.052), (I-300)+(1.039)+(2.053), (I-300)+(1.039)+(2.054), (I-300)+(1.039)+(2.055), (I-300)+(1.039)+(2.056), (I-300)+(1.039)+(2.057), (I-300)+(1.039)+(2.058), (I-300)+(1.039)+(2.059), (I-300)+(1.039)+(3.001), (I-300)+(1.039)+(3.002), (I-300)+(1.039)+(3.003), (I-300)+(1.039)+(3.004), (I-300)+(1.039)+(3.005), (I-300)+(1.039)+(3.006), (I-300)+(1.039)+(3.007), (I-300)+(1.039)+(3.008), (I-300)+(1.039)+(3.009), (I-300)+(1.039)+(3.010), (I-300)+(1.039)+(3.011), (I-300)+(1.039)+(3.012), (I-300)+(1.039)+(3.013), (I-300)+(1.039)+(3.014), (I-300)+(1.039)+(3.015), (I-300)+(1.039)+(3.016), (I-300)+(1.039)+(3.017), (I-300)+(1.039)+(3.018), (I-300)+(1.039)+(3.019), (I-300)+(1.039)+(3.020), (I-300)+(1.039)+(3.021), (I-300)+(1.039)+(3.022), (I-300)+(1.039)+(3.023), (I-300)+(1.039)+(3.024), (I-300)+(1.039)+(3.025), (I-300)+(1.039)+(3.026), (I-300)+(1.039)+(3.027), (I-300)+(1.039)+(3.028), (I-300)+(1.039)+(3.029), (I-300)+(1.039)+(3.030), (I-300)+(1.039)+(3.031), (I-300)+(1.039)+(5.001), (I-300)+(1.039)+(5.002), (I-300)+(1.039)+(5.003), (I-300)+(1.039)+(5.004), (I-300)+(1.039)+(5.005), (I-300)+(1.039)+(5.006), (I-300)+(1.039)+(5.007), (I-300)+(1.039)+(5.008), (I-300)+(1.039)+(5.009), (I-300)+(1.039)+(5.010), (I-300)+(1.039)+(5.011), (I-300)+(1.039)+(5.012), (I-300)+(1.039)+(5.013), (I-300)+(1.039)+(5.014), (I-300)+(1.039)+(5.015), (I-300)+(1.039)+(5.016), (I-300)+(1.039)+(5.017), (I-300)+(1.039)+(5.018), (I-300)+(1.039)+(5.019), (I-300)+(1.039)+(5.020), (I-300)+(1.039)+(5.021), (I-300)+(1.039)+(5.022), (I-300)+(1.039)+(5.023), (I-300)+(1.039)+(6.001), (I-300)+(1.039)+(6.002), (I-300)+(1.039)+(6.003), (I-300)+(1.039)+(6.004), (I-300)+(1.039)+(7.001), (I-300)+(1.039)+(7.002), (I-300)+(1.039)+(7.003), (I-300)+(1.039)+(7.004), (I-300)+(1.039)+(7.005), (I-300)+(1.039)+(7.006), (I-300)+(1.039)+(9.001), (I-300)+(1.039)+(9.002), (I-300)+(1.039)+(9.003), (I-300)+(1.039)+(9.004), (I-300)+(1.039)+(9.005), (I-300)+(1.039)+(9.006), (I-300)+(1.039)+(9.007), (I-300)+(1.039)+(9.008), (I-300)+(1.039)+(9.009), (I-300)+(1.039)+(14.001), (I-300)+(1.039)+(14.002), (I-300)+(1.039)+(15.008), (I-300)+(1.039)+(15.011), (I-300)+(1.039)+(15.012), (I-300)+(1.039)+(15.016), (I-300)+(1.039)+(15.025), (I-300)+(1.039)+(15.027), (I-300)+(1.039)+(15.047), (I-300)+(1.039)+(15.063), (I-300)+(1.039)+(15.064), (I-300)+(1.039)+(16.001), (I-300)+(1.039)+(16.002), (I-300)+(1.039)+(16.003), (I-300)+(1.039)+(16.004), (I-300)+(1.039)+(16.005), (I-300)+(1.039)+(16.006), (I-300)+(1.039)+(16.007), (I-300)+(1.039)+(16.008), (I-300)+(1.039)+(17.001), (I-300)+(1.039)+(17.002), (I-300)+(1.039)+(17.003), (I-300)+(1.039)+(17.004), (I-300)+(1.039)+(17.005), (I-300)+(1.039)+(17.006), (I-300)+(1.039)+(17.007), (I-300)+(1.039)+(17.008), (I-300)+(1.039)+(17.009), (I-300)+(1.039)+(17.010), (I-300)+(1.039)+(17.011), (I-300)+(1.039)+(17.012), (I-300)+(1.039)+(18.001), (I-300)+(1.040)+(1.041), (I-300)+(1.040)+(1.042), (I-300)+(1.040)+(1.043), (I-300)+(1.040)+(1.044), (I-300)+(1.040)+(1.045), (I-300)+(1.040)+(1.046), (I-300)+(1.040)+(1.047), (I-300)+(1.040)+(1.048), (I-300)+(1.040)+(1.049), (I-300)+(1.040)+(1.050), (I-300)+(1.040)+(1.051), (I-300)+(1.040)+(1.052), (I-300)+(1.040)+(1.053), (I-300)+(1.040)+(1.054), (I-300)+(1.040)+(1.055), (I-300)+(1.040)+(1.056), (I-300)+(1.040)+(1.057), (I-300)+(1.040)+(1.058), (I-300)+(1.040)+(1.059), (I-300)+(1.040)+(1.060), (I-300)+(1.040)+(1.061), (I-300)+(1.040)+(1.062), (I-300)+(1.040)+(1.063), (I-300)+(1.040)+(1.064), (I-300)+(1.040)+(1.065), (I-300)+(1.040)+(1.066), (I-300)+(1.040)+(1.067), (I-300)+(1.040)+(1.068), (I-300)+(1.040)+(1.069), (I-300)+(1.040)+(1.070), (I-300)+(1.040)+(1.071), (I-300)+(1.040)+(1.072), (I-300)+(1.040)+(1.073), (I-300)+(1.040)+(1.074), (I-300)+(1.040)+(1.075), (I-300)+(1.040)+(1.076), (I-300)+(1.040)+(1.077), (I-300)+(1.040)+(1.078), (I-300)+(1.040)+(1.079), (I-300)+(1.040)+(1.080), (I-300)+(1.040)+(1.081), (I-300)+(1.040)+(1.082), (I-300)+(1.040)+(1.083), (I-300)+(1.040)+(1.084), (I-300)+(1.040)+(1.085), (I-300)+(1.040)+(1.086), (I-300)+(1.040)+(1.087), (I-300)+(1.040)+(1.088), (I-300)+(1.040)+(1.089), (I-300)+(1.040)+(1.090), (I-300)+(1.040)+(1.091), (I-300)+(1.040)+(1.092), (I-300)+(1.040)+(2.001), (I-300)+(1.040)+(2.002), (I-300)+(1.040)+(2.003), (I-300)+(1.040)+(2.004), (I-300)+(1.040)+(2.005), (I-300)+(1.040)+(2.006), (I-300)+(1.040)+(2.007), (I-300)+(1.040)+(2.008), (I-300)+(1.040)+(2.009), (I-300)+(1.040)+(2.010), (I-300)+(1.040)+(2.011), (I-300)+(1.040)+(2.012), (I-300)+(1.040)+(2.013), (I-300)+(1.040)+(2.014), (I-300)+(1.040)+(2.015), (I-300)+(1.040)+(2.016), (I-300)+(1.040)+(2.017), (I-300)+(1.040)+(2.018), (I-300)+(1.040)+(2.019), (I-300)+(1.040)+(2.020), (I-300)+(1.040)+(2.021), (I-300)+(1.040)+(2.022), (I-300)+(1.040)+(2.023), (I-300)+(1.040)+(2.024), (I-300)+(1.040)+(2.025), (I-300)+(1.040)+(2.026), (I-300)+(1.040)+(2.027), (I-300)+(1.040)+(2.028), (I-300)+(1.040)+(2.029), (I-300)+(1.040)+(2.030), (I-300)+(1.040)+(2.031), (I-300)+(1.040)+(2.032), (I-300)+(1.040)+(2.033), (I-300)+(1.040)+(2.034), (I-300)+(1.040)+(2.035), (I-300)+(1.040)+(2.036), (I-300)+(1.040)+(2.037), (I-300)+(1.040)+(2.038), (I-300)+(1.040)+(2.039), (I-300)+(1.040)+(2.040), (I-300)+(1.040)+(2.041), (I-300)+(1.040)+(2.042), (I-300)+(1.040)+(2.043), (I-300)+(1.040)+(2.044), (I-300)+(1.040)+(2.045), (I-300)+(1.040)+(2.046), (I-300)+(1.040)+(2.047), (I-300)+(1.040)+(2.048), (I-300)+(1.040)+(2.049), (I-300)+(1.040)+(2.050), (I-300)+(1.040)+(2.051), (I-300)+(1.040)+(2.052), (I-300)+(1.040)+(2.053), (I-300)+(1.040)+(2.054), (I-300)+(1.040)+(2.055), (I-300)+(1.040)+(2.056), (I-300)+(1.040)+(2.057), (I-300)+(1.040)+(2.058), (I-300)+(1.040)+(2.059), (I-300)+(1.040)+(3.001), (I-300)+(1.040)+(3.002), (I-300)+(1.040)+(3.003), (I-300)+(1.040)+(3.004), (I-300)+(1.040)+(3.005), (I-300)+(1.040)+(3.006), (I-300)+(1.040)+(3.007), (I-300)+(1.040)+(3.008), (I-300)+(1.040)+(3.009), (I-300)+(1.040)+(3.010), (I-300)+(1.040)+(3.011), (I-300)+(1.040)+(3.012), (I-300)+(1.040)+(3.013), (I-300)+(1.040)+(3.014), (I-300)+(1.040)+(3.015), (I-300)+(1.040)+(3.016), (I-300)+(1.040)+(3.017), (I-300)+(1.040)+(3.018), (I-300)+(1.040)+(3.019), (I-300)+(1.040)+(3.020), (I-300)+(1.040)+(3.021), (I-300)+(1.040)+(3.022), (I-300)+(1.040)+(3.023), (I-300)+(1.040)+(3.024), (I-300)+(1.040)+(3.025), (I-300)+(1.040)+(3.026), (I-300)+(1.040)+(3.027), (I-300)+(1.040)+(3.028), (I-300)+(1.040)+(3.029), (I-300)+(1.040)+(3.030), (I-300)+(1.040)+(3.031), (I-300)+(1.040)+(5.001), (I-300)+(1.040)+(5.002), (I-300)+(1.040)+(5.003), (I-300)+(1.040)+(5.004), (I-300)+(1.040)+(5.005), (I-300)+(1.040)+(5.006), (I-300)+(1.040)+(5.007), (I-300)+(1.040)+(5.008), (I-300)+(1.040)+(5.009), (I-300)+(1.040)+(5.010), (I-300)+(1.040)+(5.011), (I-300)+(1.040)+(5.012), (I-300)+(1.040)+(5.013), (I-300)+(1.040)+(5.014), (I-300)+(1.040)+(5.015), (I-300)+(1.040)+(5.016), (I-300)+(1.040)+(5.017), (I-300)+(1.040)+(5.018), (I-300)+(1.040)+(5.019), (I-300)+(1.040)+(5.020), (I-300)+(1.040)+(5.021), (I-300)+(1.040)+(5.022), (I-300)+(1.040)+(5.023), (I-300)+(1.040)+(6.001), (I-300)+(1.040)+(6.002), (I-300)+(1.040)+(6.003), (I-300)+(1.040)+(6.004), (I-300)+(1.040)+(7.001), (I-300)+(1.040)+(7.002), (I-300)+(1.040)+(7.003), (I-300)+(1.040)+(7.004), (I-300)+(1.040)+(7.005), (I-300)+(1.040)+(7.006), (I-300)+(1.040)+(9.001), (I-300)+(1.040)+(9.002), (I-300)+(1.040)+(9.003), (I-300)+(1.040)+(9.004), (I-300)+(1.040)+(9.005), (I-300)+(1.040)+(9.006), (I-300)+(1.040)+(9.007), (I-300)+(1.040)+(9.008), (I-300)+(1.040)+(9.009), (I-300)+(1.040)+(14.001), (I-300)+(1.040)+(14.002), (I-300)+(1.040)+(15.008), (I-300)+(1.040)+(15.011), (I-300)+(1.040)+(15.012), (I-300)+(1.040)+(15.016), (I-300)+(1.040)+(15.025), (I-300)+(1.040)+(15.027), (I-300)+(1.040)+(15.047), (I-300)+(1.040)+(15.063), (I-300)+(1.040)+(15.064), (I-300)+(1.040)+(16.001), (I-300)+(1.040)+(16.002), (I-300)+(1.040)+(16.003), (I-300)+(1.040)+(16.004), (I-300)+(1.040)+(16.005), (I-300)+(1.040)+(16.006), (I-300)+(1.040)+(16.007), (I-300)+(1.040)+(16.008), (I-300)+(1.040)+(17.001), (I-300)+(1.040)+(17.002), (I-300)+(1.040)+(17.003), (I-300)+(1.040)+(17.004), (I-300)+(1.040)+(17.005), (I-300)+(1.040)+(17.006), (I-300)+(1.040)+(17.007), (I-300)+(1.040)+(17.008), (I-300)+(1.040)+(17.009), (I-300)+(1.040)+(17.010), (I-300)+(1.040)+(17.011), (I-300)+(1.040)+(17.012), (I-300)+(1.040)+(18.001), (I-300)+(1.041)+(1.042), (I-300)+(1.041)+(1.043), (I-300)+(1.041)+(1.044), (I-300)+(1.041)+(1.045), (I-300)+(1.041)+(1.046), (I-300)+(1.041)+(1.047), (I-300)+(1.041)+(1.048), (I-300)+(1.041)+(1.049), (I-300)+(1.041)+(1.050), (I-300)+(1.041)+(1.051), (I-300)+(1.041)+(1.052), (I-300)+(1.041)+(1.053), (I-300)+(1.041)+(1.054), (I-300)+(1.041)+(1.055), (I-300)+(1.041)+(1.056), (I-300)+(1.041)+(1.057), (I-300)+(1.041)+(1.058), (I-300)+(1.041)+(1.059), (I-300)+(1.041)+(1.060), (I-300)+(1.041)+(1.061), (I-300)+(1.041)+(1.062), (I-300)+(1.041)+(1.063), (I-300)+(1.041)+(1.064), (I-300)+(1.041)+(1.065), (I-300)+(1.041)+(1.066), (I-300)+(1.041)+(1.067), (I-300)+(1.041)+(1.068), (I-300)+(1.041)+(1.069), (I-300)+(1.041)+(1.070), (I-300)+(1.041)+(1.071), (I-300)+(1.041)+(1.072), (I-300)+(1.041)+(1.073), (I-300)+(1.041)+(1.074), (I-300)+(1.041)+(1.075), (I-300)+(1.041)+(1.076), (I-300)+(1.041)+(1.077), (I-300)+(1.041)+(1.078), (I-300)+(1.041)+(1.079), (I-300)+(1.041)+(1.080), (I-300)+(1.041)+(1.081), (I-300)+(1.041)+(1.082), (I-300)+(1.041)+(1.083), (I-300)+(1.041)+(1.084), (I-300)+(1.041)+(1.085), (I-300)+(1.041)+(1.086), (I-300)+(1.041)+(1.087), (I-300)+(1.041)+(1.088), (I-300)+(1.041)+(1.089), (I-300)+(1.041)+(1.090), (I-300)+(1.041)+(1.091), (I-300)+(1.041)+(1.092), (I-300)+(1.041)+(2.001), (I-300)+(1.041)+(2.002), (I-300)+(1.041)+(2.003), (I-300)+(1.041)+(2.004), (I-300)+(1.041)+(2.005), (I-300)+(1.041)+(2.006), (I-300)+(1.041)+(2.007), (I-300)+(1.041)+(2.008), (I-300)+(1.041)+(2.009), (I-300)+(1.041)+(2.010), (I-300)+(1.041)+(2.011), (I-300)+(1.041)+(2.012), (I-300)+(1.041)+(2.013), (I-300)+(1.041)+(2.014), (I-300)+(1.041)+(2.015), (I-300)+(1.041)+(2.016), (I-300)+(1.041)+(2.017), (I-300)+(1.041)+(2.018), (I-300)+(1.041)+(2.019), (I-300)+(1.041)+(2.020), (I-300)+(1.041)+(2.021), (I-300)+(1.041)+(2.022), (I-300)+(1.041)+(2.023), (I-300)+(1.041)+(2.024), (I-300)+(1.041)+(2.025), (I-300)+(1.041)+(2.026), (I-300)+(1.041)+(2.027), (I-300)+(1.041)+(2.028), (I-300)+(1.041)+(2.029), (I-300)+(1.041)+(2.030), (I-300)+(1.041)+(2.031), (I-300)+(1.041)+(2.032), (I-300)+(1.041)+(2.033), (I-300)+(1.041)+(2.034), (I-300)+(1.041)+(2.035), (I-300)+(1.041)+(2.036), (I-300)+(1.041)+(2.037), (I-300)+(1.041)+(2.038), (I-300)+(1.041)+(2.039), (I-300)+(1.041)+(2.040), (I-300)+(1.041)+(2.041), (I-300)+(1.041)+(2.042), (I-300)+(1.041)+(2.043), (I-300)+(1.041)+(2.044), (I-300)+(1.041)+(2.045), (I-300)+(1.041)+(2.046), (I-300)+(1.041)+(2.047), (I-300)+(1.041)+(2.048), (I-300)+(1.041)+(2.049), (I-300)+(1.041)+(2.050), (I-300)+(1.041)+(2.051), (I-300)+(1.041)+(2.052), (I-300)+(1.041)+(2.053), (I-300)+(1.041)+(2.054), (I-300)+(1.041)+(2.055), (I-300)+(1.041)+(2.056), (I-300)+(1.041)+(2.057), (I-300)+(1.041)+(2.058), (I-300)+(1.041)+(2.059), (I-300)+(1.041)+(3.001), (I-300)+(1.041)+(3.002), (I-300)+(1.041)+(3.003), (I-300)+(1.041)+(3.004), (I-300)+(1.041)+(3.005), (I-300)+(1.041)+(3.006), (I-300)+(1.041)+(3.007), (I-300)+(1.041)+(3.008), (I-300)+(1.041)+(3.009), (I-300)+(1.041)+(3.010), (I-300)+(1.041)+(3.011), (I-300)+(1.041)+(3.012), (I-300)+(1.041)+(3.013), (I-300)+(1.041)+(3.014), (I-300)+(1.041)+(3.015), (I-300)+(1.041)+(3.016), (I-300)+(1.041)+(3.017), (I-300)+(1.041)+(3.018), (I-300)+(1.041)+(3.019), (I-300)+(1.041)+(3.020), (I-300)+(1.041)+(3.021), (I-300)+(1.041)+(3.022), (I-300)+(1.041)+(3.023), (I-300)+(1.041)+(3.024), (I-300)+(1.041)+(3.025), (I-300)+(1.041)+(3.026), (I-300)+(1.041)+(3.027), (I-300)+(1.041)+(3.028), (I-300)+(1.041)+(3.029), (I-300)+(1.041)+(3.030), (I-300)+(1.041)+(3.031), (I-300)+(1.041)+(5.001), (I-300)+(1.041)+(5.002), (I-300)+(1.041)+(5.003), (I-300)+(1.041)+(5.004), (I-300)+(1.041)+(5.005), (I-300)+(1.041)+(5.006), (I-300)+(1.041)+(5.007), (I-300)+(1.041)+(5.008), (I-300)+(1.041)+(5.009), (I-300)+(1.041)+(5.010), (I-300)+(1.041)+(5.011), (I-300)+(1.041)+(5.012), (I-300)+(1.041)+(5.013), (I-300)+(1.041)+(5.014), (I-300)+(1.041)+(5.015), (I-300)+(1.041)+(5.016), (I-300)+(1.041)+(5.017), (I-300)+(1.041)+(5.018), (I-300)+(1.041)+(5.019), (I-300)+(1.041)+(5.020), (I-300)+(1.041)+(5.021), (I-300)+(1.041)+(5.022), (I-300)+(1.041)+(5.023), (I-300)+(1.041)+(6.001), (I-300)+(1.041)+(6.002), (I-300)+(1.041)+(6.003), (I-300)+(1.041)+(6.004), (I-300)+(1.041)+(7.001), (I-300)+(1.041)+(7.002), (I-300)+(1.041)+(7.003), (I-300)+(1.041)+(7.004), (I-300)+(1.041)+(7.005), (I-300)+(1.041)+(7.006), (I-300)+(1.041)+(9.001), (I-300)+(1.041)+(9.002), (I-300)+(1.041)+(9.003), (I-300)+(1.041)+(9.004), (I-300)+(1.041)+(9.005), (I-300)+(1.041)+(9.006), (I-300)+(1.041)+(9.007), (I-300)+(1.041)+(9.008), (I-300)+(1.041)+(9.009), (I-300)+(1.041)+(14.001), (I-300)+(1.041)+(14.002), (I-300)+(1.041)+(15.008), (I-300)+(1.041)+(15.011), (I-300)+(1.041)+(15.012), (I-300)+(1.041)+(15.016), (I-300)+(1.041)+(15.025), (I-300)+(1.041)+(15.027), (I-300)+(1.041)+(15.047), (I-300)+(1.041)+(15.063), (I-300)+(1.041)+(15.064), (I-300)+(1.041)+(16.001), (I-300)+(1.041)+(16.002), (I-300)+(1.041)+(16.003), (I-300)+(1.041)+(16.004), (I-300)+(1.041)+(16.005), (I-300)+(1.041)+(16.006), (I-300)+(1.041)+(16.007), (I-300)+(1.041)+(16.008), (I-300)+(1.041)+(17.001), (I-300)+(1.041)+(17.002), (I-300)+(1.041)+(17.003), (I-300)+(1.041)+(17.004), (I-300)+(1.041)+(17.005), (I-300)+(1.041)+(17.006), (I-300)+(1.041)+(17.007), (I-300)+(1.041)+(17.008), (I-300)+(1.041)+(17.009), (I-300)+(1.041)+(17.010), (I-300)+(1.041)+(17.011), (I-300)+(1.041)+(17.012), (I-300)+(1.041)+(18.001), (I-300)+(1.042)+(1.043), (I-300)+(1.042)+(1.044), (I-300)+(1.042)+(1.045), (I-300)+(1.042)+(1.046), (I-300)+(1.042)+(1.047), (I-300)+(1.042)+(1.048), (I-300)+(1.042)+(1.049), (I-300)+(1.042)+(1.050), (I-300)+(1.042)+(1.051), (I-300)+(1.042)+(1.052), (I-300)+(1.042)+(1.053), (I-300)+(1.042)+(1.054), (I-300)+(1.042)+(1.055), (I-300)+(1.042)+(1.056), (I-300)+(1.042)+(1.057), (I-300)+(1.042)+(1.058), (I-300)+(1.042)+(1.059), (I-300)+(1.042)+(1.060), (I-300)+(1.042)+(1.061), (I-300)+(1.042)+(1.062), (I-300)+(1.042)+(1.063), (I-300)+(1.042)+(1.064), (I-300)+(1.042)+(1.065), (I-300)+(1.042)+(1.066), (I-300)+(1.042)+(1.067), (I-300)+(1.042)+(1.068), (I-300)+(1.042)+(1.069), (I-300)+(1.042)+(1.070), (I-300)+(1.042)+(1.071), (I-300)+(1.042)+(1.072), (I-300)+(1.042)+(1.073), (I-300)+(1.042)+(1.074), (I-300)+(1.042)+(1.075), (I-300)+(1.042)+(1.076), (I-300)+(1.042)+(1.077), (I-300)+(1.042)+(1.078), (I-300)+(1.042)+(1.079), (I-300)+(1.042)+(1.080), (I-300)+(1.042)+(1.081), (I-300)+(1.042)+(1.082), (I-300)+(1.042)+(1.083), (I-300)+(1.042)+(1.084), (I-300)+(1.042)+(1.085), (I-300)+(1.042)+(1.086), (I-300)+(1.042)+(1.087), (I-300)+(1.042)+(1.088), (I-300)+(1.042)+(1.089), (I-300)+(1.042)+(1.090), (I-300)+(1.042)+(1.091), (I-300)+(1.042)+(1.092), (I-300)+(1.042)+(2.001), (I-300)+(1.042)+(2.002), (I-300)+(1.042)+(2.003), (I-300)+(1.042)+(2.004), (I-300)+(1.042)+(2.005), (I-300)+(1.042)+(2.006), (I-300)+(1.042)+(2.007), (I-300)+(1.042)+(2.008), (I-300)+(1.042)+(2.009), (I-300)+(1.042)+(2.010), (I-300)+(1.042)+(2.011), (I-300)+(1.042)+(2.012), (I-300)+(1.042)+(2.013), (I-300)+(1.042)+(2.014), (I-300)+(1.042)+(2.015), (I-300)+(1.042)+(2.016), (I-300)+(1.042)+(2.017), (I-300)+(1.042)+(2.018), (I-300)+(1.042)+(2.019), (I-300)+(1.042)+(2.020), (I-300)+(1.042)+(2.021), (I-300)+(1.042)+(2.022), (I-300)+(1.042)+(2.023), (I-300)+(1.042)+(2.024), (I-300)+(1.042)+(2.025), (I-300)+(1.042)+(2.026), (I-300)+(1.042)+(2.027), (I-300)+(1.042)+(2.028), (I-300)+(1.042)+(2.029), (I-300)+(1.042)+(2.030), (I-300)+(1.042)+(2.031), (I-300)+(1.042)+(2.032), (I-300)+(1.042)+(2.033), (I-300)+(1.042)+(2.034), (I-300)+(1.042)+(2.035), (I-300)+(1.042)+(2.036), (I-300)+(1.042)+(2.037), (I-300)+(1.042)+(2.038), (I-300)+(1.042)+(2.039), (I-300)+(1.042)+(2.040), (I-300)+(1.042)+(2.041), (I-300)+(1.042)+(2.042), (I-300)+(1.042)+(2.043), (I-300)+(1.042)+(2.044), (I-300)+(1.042)+(2.045), (I-300)+(1.042)+(2.046), (I-300)+(1.042)+(2.047), (I-300)+(1.042)+(2.048), (I-300)+(1.042)+(2.049), (I-300)+(1.042)+(2.050), (I-300)+(1.042)+(2.051), (I-300)+(1.042)+(2.052), (I-300)+(1.042)+(2.053), (I-300)+(1.042)+(2.054), (I-300)+(1.042)+(2.055), (I-300)+(1.042)+(2.056), (I-300)+(1.042)+(2.057), (I-300)+(1.042)+(2.058), (I-300)+(1.042)+(2.059), (I-300)+(1.042)+(3.001), (I-300)+(1.042)+(3.002), (I-300)+(1.042)+(3.003), (I-300)+(1.042)+(3.004), (I-300)+(1.042)+(3.005), (I-300)+(1.042)+(3.006), (I-300)+(1.042)+(3.007), (I-300)+(1.042)+(3.008), (I-300)+(1.042)+(3.009), (I-300)+(1.042)+(3.010), (I-300)+(1.042)+(3.011), (I-300)+(1.042)+(3.012), (I-300)+(1.042)+(3.013), (I-300)+(1.042)+(3.014), (I-300)+(1.042)+(3.015), (I-300)+(1.042)+(3.016), (I-300)+(1.042)+(3.017), (I-300)+(1.042)+(3.018), (I-300)+(1.042)+(3.019), (I-300)+(1.042)+(3.020), (I-300)+(1.042)+(3.021), (I-300)+(1.042)+(3.022), (I-300)+(1.042)+(3.023), (I-300)+(1.042)+(3.024), (I-300)+(1.042)+(3.025), (I-300)+(1.042)+(3.026), (I-300)+(1.042)+(3.027), (I-300)+(1.042)+(3.028), (I-300)+(1.042)+(3.029), (I-300)+(1.042)+(3.030), (I-300)+(1.042)+(3.031), (I-300)+(1.042)+(5.001), (I-300)+(1.042)+(5.002), (I-300)+(1.042)+(5.003), (I-300)+(1.042)+(5.004), (I-300)+(1.042)+(5.005), (I-300)+(1.042)+(5.006), (I-300)+(1.042)+(5.007), (I-300)+(1.042)+(5.008), (I-300)+(1.042)+(5.009), (I-300)+(1.042)+(5.010), (I-300)+(1.042)+(5.011), (I-300)+(1.042)+(5.012), (I-300)+(1.042)+(5.013), (I-300)+(1.042)+(5.014), (I-300)+(1.042)+(5.015), (I-300)+(1.042)+(5.016), (I-300)+(1.042)+(5.017), (I-300)+(1.042)+(5.018), (I-300)+(1.042)+(5.019), (I-300)+(1.042)+(5.020), (I-300)+(1.042)+(5.021), (I-300)+(1.042)+(5.022), (I-300)+(1.042)+(5.023), (I-300)+(1.042)+(6.001), (I-300)+(1.042)+(6.002), (I-300)+(1.042)+(6.003), (I-300)+(1.042)+(6.004), (I-300)+(1.042)+(7.001), (I-300)+(1.042)+(7.002), (I-300)+(1.042)+(7.003), (I-300)+(1.042)+(7.004), (I-300)+(1.042)+(7.005), (I-300)+(1.042)+(7.006), (I-300)+(1.042)+(9.001), (I-300)+(1.042)+(9.002), (I-300)+(1.042)+(9.003), (I-300)+(1.042)+(9.004), (I-300)+(1.042)+(9.005), (I-300)+(1.042)+(9.006), (I-300)+(1.042)+(9.007), (I-300)+(1.042)+(9.008), (I-300)+(1.042)+(9.009), (I-300)+(1.042)+(14.001), (I-300)+(1.042)+(14.002), (I-300)+(1.042)+(15.008), (I-300)+(1.042)+(15.011), (I-300)+(1.042)+(15.012), (I-300)+(1.042)+(15.016), (I-300)+(1.042)+(15.025), (I-300)+(1.042)+(15.027), (I-300)+(1.042)+(15.047), (I-300)+(1.042)+(15.063), (I-300)+(1.042)+(15.064), (I-300)+(1.042)+(16.001), (I-300)+(1.042)+(16.002), (I-300)+(1.042)+(16.003), (I-300)+(1.042)+(16.004), (I-300)+(1.042)+(16.005), (I-300)+(1.042)+(16.006), (I-300)+(1.042)+(16.007), (I-300)+(1.042)+(16.008), (I-300)+(1.042)+(17.001), (I-300)+(1.042)+(17.002), (I-300)+(1.042)+(17.003), (I-300)+(1.042)+(17.004), (I-300)+(1.042)+(17.005), (I-300)+(1.042)+(17.006), (I-300)+(1.042)+(17.007), (I-300)+(1.042)+(17.008), (I-300)+(1.042)+(17.009), (I-300)+(1.042)+(17.010), (I-300)+(1.042)+(17.011), (I-300)+(1.042)+(17.012), (I-300)+(1.042)+(18.001), (I-300)+(1.043)+(1.044), (I-300)+(1.043)+(1.045), (I-300)+(1.043)+(1.046), (I-300)+(1.043)+(1.047), (I-300)+(1.043)+(1.048), (I-300)+(1.043)+(1.049), (I-300)+(1.043)+(1.050), (I-300)+(1.043)+(1.051), (I-300)+(1.043)+(1.052), (I-300)+(1.043)+(1.053), (I-300)+(1.043)+(1.054), (I-300)+(1.043)+(1.055), (I-300)+(1.043)+(1.056), (I-300)+(1.043)+(1.057), (I-300)+(1.043)+(1.058), (I-300)+(1.043)+(1.059), (I-300)+(1.043)+(1.060), (I-300)+(1.043)+(1.061), (I-300)+(1.043)+(1.062), (I-300)+(1.043)+(1.063), (I-300)+(1.043)+(1.064), (I-300)+(1.043)+(1.065), (I-300)+(1.043)+(1.066), (I-300)+(1.043)+(1.067), (I-300)+(1.043)+(1.068), (I-300)+(1.043)+(1.069), (I-300)+(1.043)+(1.070), (I-300)+(1.043)+(1.071), (I-300)+(1.043)+(1.072), (I-300)+(1.043)+(1.073), (I-300)+(1.043)+(1.074), (I-300)+(1.043)+(1.075), (I-300)+(1.043)+(1.076), (I-300)+(1.043)+(1.077), (I-300)+(1.043)+(1.078), (I-300)+(1.043)+(1.079), (I-300)+(1.043)+(1.080), (I-300)+(1.043)+(1.081), (I-300)+(1.043)+(1.082), (I-300)+(1.043)+(1.083), (I-300)+(1.043)+(1.084), (I-300)+(1.043)+(1.085), (I-300)+(1.043)+(1.086), (I-300)+(1.043)+(1.087), (I-300)+(1.043)+(1.088), (I-300)+(1.043)+(1.089), (I-300)+(1.043)+(1.090), (I-300)+(1.043)+(1.091), (I-300)+(1.043)+(1.092), (I-300)+(1.043)+(2.001), (I-300)+(1.043)+(2.002), (I-300)+(1.043)+(2.003), (I-300)+(1.043)+(2.004), (I-300)+(1.043)+(2.005), (I-300)+(1.043)+(2.006), (I-300)+(1.043)+(2.007), (I-300)+(1.043)+(2.008), (I-300)+(1.043)+(2.009), (I-300)+(1.043)+(2.010), (I-300)+(1.043)+(2.011), (I-300)+(1.043)+(2.012), (I-300)+(1.043)+(2.013), (I-300)+(1.043)+(2.014), (I-300)+(1.043)+(2.015), (I-300)+(1.043)+(2.016), (I-300)+(1.043)+(2.017), (I-300)+(1.043)+(2.018), (I-300)+(1.043)+(2.019), (I-300)+(1.043)+(2.020), (I-300)+(1.043)+(2.021), (I-300)+(1.043)+(2.022), (I-300)+(1.043)+(2.023), (I-300)+(1.043)+(2.024), (I-300)+(1.043)+(2.025), (I-300)+(1.043)+(2.026), (I-300)+(1.043)+(2.027), (I-300)+(1.043)+(2.028), (I-300)+(1.043)+(2.029), (I-300)+(1.043)+(2.030), (I-300)+(1.043)+(2.031), (I-300)+(1.043)+(2.032), (I-300)+(1.043)+(2.033), (I-300)+(1.043)+(2.034), (I-300)+(1.043)+(2.035), (I-300)+(1.043)+(2.036), (I-300)+(1.043)+(2.037), (I-300)+(1.043)+(2.038), (I-300)+(1.043)+(2.039), (I-300)+(1.043)+(2.040), (I-300)+(1.043)+(2.041), (I-300)+(1.043)+(2.042), (I-300)+(1.043)+(2.043), (I-300)+(1.043)+(2.044), (I-300)+(1.043)+(2.045), (I-300)+(1.043)+(2.046), (I-300)+(1.043)+(2.047), (I-300)+(1.043)+(2.048), (I-300)+(1.043)+(2.049), (I-300)+(1.043)+(2.050), (I-300)+(1.043)+(2.051), (I-300)+(1.043)+(2.052), (I-300)+(1.043)+(2.053), (I-300)+(1.043)+(2.054), (I-300)+(1.043)+(2.055), (I-300)+(1.043)+(2.056), (I-300)+(1.043)+(2.057), (I-300)+(1.043)+(2.058), (I-300)+(1.043)+(2.059), (I-300)+(1.043)+(3.001), (I-300)+(1.043)+(3.002), (I-300)+(1.043)+(3.003), (I-300)+(1.043)+(3.004), (I-300)+(1.043)+(3.005), (I-300)+(1.043)+(3.006), (I-300)+(1.043)+(3.007), (I-300)+(1.043)+(3.008), (I-300)+(1.043)+(3.009), (I-300)+(1.043)+(3.010), (I-300)+(1.043)+(3.011), (I-300)+(1.043)+(3.012), (I-300)+(1.043)+(3.013), (I-300)+(1.043)+(3.014), (I-300)+(1.043)+(3.015), (I-300)+(1.043)+(3.016), (I-300)+(1.043)+(3.017), (I-300)+(1.043)+(3.018), (I-300)+(1.043)+(3.019), (I-300)+(1.043)+(3.020), (I-300)+(1.043)+(3.021), (I-300)+(1.043)+(3.022), (I-300)+(1.043)+(3.023), (I-300)+(1.043)+(3.024), (I-300)+(1.043)+(3.025), (I-300)+(1.043)+(3.026), (I-300)+(1.043)+(3.027), (I-300)+(1.043)+(3.028), (I-300)+(1.043)+(3.029), (I-300)+(1.043)+(3.030), (I-300)+(1.043)+(3.031), (I-300)+(1.043)+(5.001), (I-300)+(1.043)+(5.002), (I-300)+(1.043)+(5.003), (I-300)+(1.043)+(5.004), (I-300)+(1.043)+(5.005), (I-300)+(1.043)+(5.006), (I-300)+(1.043)+(5.007), (I-300)+(1.043)+(5.008), (I-300)+(1.043)+(5.009), (I-300)+(1.043)+(5.010), (I-300)+(1.043)+(5.011), (I-300)+(1.043)+(5.012), (I-300)+(1.043)+(5.013), (I-300)+(1.043)+(5.014), (I-300)+(1.043)+(5.015), (I-300)+(1.043)+(5.016), (I-300)+(1.043)+(5.017), (I-300)+(1.043)+(5.018), (I-300)+(1.043)+(5.019), (I-300)+(1.043)+(5.020), (I-300)+(1.043)+(5.021), (I-300)+(1.043)+(5.022), (I-300)+(1.043)+(5.023), (I-300)+(1.043)+(6.001), (I-300)+(1.043)+(6.002), (I-300)+(1.043)+(6.003), (I-300)+(1.043)+(6.004), (I-300)+(1.043)+(7.001), (I-300)+(1.043)+(7.002), (I-300)+(1.043)+(7.003), (I-300)+(1.043)+(7.004), (I-300)+(1.043)+(7.005), (I-300)+(1.043)+(7.006), (I-300)+(1.043)+(9.001), (I-300)+(1.043)+(9.002), (I-300)+(1.043)+(9.003), (I-300)+(1.043)+(9.004), (I-300)+(1.043)+(9.005), (I-300)+(1.043)+(9.006), (I-300)+(1.043)+(9.007), (I-300)+(1.043)+(9.008), (I-300)+(1.043)+(9.009), (I-300)+(1.043)+(14.001), (I-300)+(1.043)+(14.002), (I-300)+(1.043)+(15.008), (I-300)+(1.043)+(15.011), (I-300)+(1.043)+(15.012), (I-300)+(1.043)+(15.016), (I-300)+(1.043)+(15.025), (I-300)+(1.043)+(15.027), (I-300)+(1.043)+(15.047), (I-300)+(1.043)+(15.063), (I-300)+(1.043)+(15.064), (I-300)+(1.043)+(16.001), (I-300)+(1.043)+(16.002), (I-300)+(1.043)+(16.003), (I-300)+(1.043)+(16.004), (I-300)+(1.043)+(16.005), (I-300)+(1.043)+(16.006), (I-300)+(1.043)+(16.007), (I-300)+(1.043)+(16.008), (I-300)+(1.043)+(17.001), (I-300)+(1.043)+(17.002), (I-300)+(1.043)+(17.003), (I-300)+(1.043)+(17.004), (I-300)+(1.043)+(17.005), (I-300)+(1.043)+(17.006), (I-300)+(1.043)+(17.007), (I-300)+(1.043)+(17.008), (I-300)+(1.043)+(17.009), (I-300)+(1.043)+(17.010), (I-300)+(1.043)+(17.011), (I-300)+(1.043)+(17.012), (I-300)+(1.043)+(18.001), (I-300)+(1.044)+(1.045), (I-300)+(1.044)+(1.046), (I-300)+(1.044)+(1.047), (I-300)+(1.044)+(1.048), (I-300)+(1.044)+(1.049), (I-300)+(1.044)+(1.050), (I-300)+(1.044)+(1.051), (I-300)+(1.044)+(1.052), (I-300)+(1.044)+(1.053), (I-300)+(1.044)+(1.054), (I-300)+(1.044)+(1.055), (I-300)+(1.044)+(1.056), (I-300)+(1.044)+(1.057), (I-300)+(1.044)+(1.058), (I-300)+(1.044)+(1.059), (I-300)+(1.044)+(1.060), (I-300)+(1.044)+(1.061), (I-300)+(1.044)+(1.062), (I-300)+(1.044)+(1.063), (I-300)+(1.044)+(1.064), (I-300)+(1.044)+(1.065), (I-300)+(1.044)+(1.066), (I-300)+(1.044)+(1.067), (I-300)+(1.044)+(1.068), (I-300)+(1.044)+(1.069), (I-300)+(1.044)+(1.070), (I-300)+(1.044)+(1.071), (I-300)+(1.044)+(1.072), (I-300)+(1.044)+(1.073), (I-300)+(1.044)+(1.074), (I-300)+(1.044)+(1.075), (I-300)+(1.044)+(1.076), (I-300)+(1.044)+(1.077), (I-300)+(1.044)+(1.078), (I-300)+(1.044)+(1.079), (I-300)+(1.044)+(1.080), (I-300)+(1.044)+(1.081), (I-300)+(1.044)+(1.082), (I-300)+(1.044)+(1.083), (I-300)+(1.044)+(1.084), (I-300)+(1.044)+(1.085), (I-300)+(1.044)+(1.086), (I-300)+(1.044)+(1.087), (I-300)+(1.044)+(1.088), (I-300)+(1.044)+(1.089), (I-300)+(1.044)+(1.090), (I-300)+(1.044)+(1.091), (I-300)+(1.044)+(1.092), (I-300)+(1.044)+(2.001), (I-300)+(1.044)+(2.002), (I-300)+(1.044)+(2.003), (I-300)+(1.044)+(2.004), (I-300)+(1.044)+(2.005), (I-300)+(1.044)+(2.006), (I-300)+(1.044)+(2.007), (I-300)+(1.044)+(2.008), (I-300)+(1.044)+(2.009), (I-300)+(1.044)+(2.010), (I-300)+(1.044)+(2.011), (I-300)+(1.044)+(2.012), (I-300)+(1.044)+(2.013), (I-300)+(1.044)+(2.014), (I-300)+(1.044)+(2.015), (I-300)+(1.044)+(2.016), (I-300)+(1.044)+(2.017), (I-300)+(1.044)+(2.018), (I-300)+(1.044)+(2.019), (I-300)+(1.044)+(2.020), (I-300)+(1.044)+(2.021), (I-300)+(1.044)+(2.022), (I-300)+(1.044)+(2.023), (I-300)+(1.044)+(2.024), (I-300)+(1.044)+(2.025), (I-300)+(1.044)+(2.026), (I-300)+(1.044)+(2.027), (I-300)+(1.044)+(2.028), (I-300)+(1.044)+(2.029), (I-300)+(1.044)+(2.030), (I-300)+(1.044)+(2.031), (I-300)+(1.044)+(2.032), (I-300)+(1.044)+(2.033), (I-300)+(1.044)+(2.034), (I-300)+(1.044)+(2.035), (I-300)+(1.044)+(2.036), (I-300)+(1.044)+(2.037), (I-300)+(1.044)+(2.038), (I-300)+(1.044)+(2.039), (I-300)+(1.044)+(2.040), (I-300)+(1.044)+(2.041), (I-300)+(1.044)+(2.042), (I-300)+(1.044)+(2.043), (I-300)+(1.044)+(2.044), (I-300)+(1.044)+(2.045), (I-300)+(1.044)+(2.046), (I-300)+(1.044)+(2.047), (I-300)+(1.044)+(2.048), (I-300)+(1.044)+(2.049), (I-300)+(1.044)+(2.050), (I-300)+(1.044)+(2.051), (I-300)+(1.044)+(2.052), (I-300)+(1.044)+(2.053), (I-300)+(1.044)+(2.054), (I-300)+(1.044)+(2.055), (I-300)+(1.044)+(2.056), (I-300)+(1.044)+(2.057), (I-300)+(1.044)+(2.058), (I-300)+(1.044)+(2.059), (I-300)+(1.044)+(3.001), (I-300)+(1.044)+(3.002), (I-300)+(1.044)+(3.003), (I-300)+(1.044)+(3.004), (I-300)+(1.044)+(3.005), (I-300)+(1.044)+(3.006), (I-300)+(1.044)+(3.007), (I-300)+(1.044)+(3.008), (I-300)+(1.044)+(3.009), (I-300)+(1.044)+(3.010), (I-300)+(1.044)+(3.011), (I-300)+(1.044)+(3.012), (I-300)+(1.044)+(3.013), (I-300)+(1.044)+(3.014), (I-300)+(1.044)+(3.015), (I-300)+(1.044)+(3.016), (I-300)+(1.044)+(3.017), (I-300)+(1.044)+(3.018), (I-300)+(1.044)+(3.019), (I-300)+(1.044)+(3.020), (I-300)+(1.044)+(3.021), (I-300)+(1.044)+(3.022), (I-300)+(1.044)+(3.023), (I-300)+(1.044)+(3.024), (I-300)+(1.044)+(3.025), (I-300)+(1.044)+(3.026), (I-300)+(1.044)+(3.027), (I-300)+(1.044)+(3.028), (I-300)+(1.044)+(3.029), (I-300)+(1.044)+(3.030), (I-300)+(1.044)+(3.031), (I-300)+(1.044)+(5.001), (I-300)+(1.044)+(5.002), (I-300)+(1.044)+(5.003), (I-300)+(1.044)+(5.004), (I-300)+(1.044)+(5.005), (I-300)+(1.044)+(5.006), (I-300)+(1.044)+(5.007), (I-300)+(1.044)+(5.008), (I-300)+(1.044)+(5.009), (I-300)+(1.044)+(5.010), (I-300)+(1.044)+(5.011), (I-300)+(1.044)+(5.012), (I-300)+(1.044)+(5.013), (I-300)+(1.044)+(5.014), (I-300)+(1.044)+(5.015), (I-300)+(1.044)+(5.016), (I-300)+(1.044)+(5.017), (I-300)+(1.044)+(5.018), (I-300)+(1.044)+(5.019), (I-300)+(1.044)+(5.020), (I-300)+(1.044)+(5.021), (I-300)+(1.044)+(5.022), (I-300)+(1.044)+(5.023), (I-300)+(1.044)+(6.001), (I-300)+(1.044)+(6.002), (I-300)+(1.044)+(6.003), (I-300)+(1.044)+(6.004), (I-300)+(1.044)+(7.001), (I-300)+(1.044)+(7.002), (I-300)+(1.044)+(7.003), (I-300)+(1.044)+(7.004), (I-300)+(1.044)+(7.005), (I-300)+(1.044)+(7.006), (I-300)+(1.044)+(9.001), (I-300)+(1.044)+(9.002), (I-300)+(1.044)+(9.003), (I-300)+(1.044)+(9.004), (I-300)+(1.044)+(9.005), (I-300)+(1.044)+(9.006), (I-300)+(1.044)+(9.007), (I-300)+(1.044)+(9.008), (I-300)+(1.044)+(9.009), (I-300)+(1.044)+(14.001), (I-300)+(1.044)+(14.002), (I-300)+(1.044)+(15.008), (I-300)+(1.044)+(15.011), (I-300)+(1.044)+(15.012), (I-300)+(1.044)+(15.016), (I-300)+(1.044)+(15.025), (I-300)+(1.044)+(15.027), (I-300)+(1.044)+(15.047), (I-300)+(1.044)+(15.063), (I-300)+(1.044)+(15.064), (I-300)+(1.044)+(16.001), (I-300)+(1.044)+(16.002), (I-300)+(1.044)+(16.003), (I-300)+(1.044)+(16.004), (I-300)+(1.044)+(16.005), (I-300)+(1.044)+(16.006), (I-300)+(1.044)+(16.007), (I-300)+(1.044)+(16.008), (I-300)+(1.044)+(17.001), (I-300)+(1.044)+(17.002), (I-300)+(1.044)+(17.003), (I-300)+(1.044)+(17.004), (I-300)+(1.044)+(17.005), (I-300)+(1.044)+(17.006), (I-300)+(1.044)+(17.007), (I-300)+(1.044)+(17.008), (I-300)+(1.044)+(17.009), (I-300)+(1.044)+(17.010), (I-300)+(1.044)+(17.011), (I-300)+(1.044)+(17.012), (I-300)+(1.044)+(18.001), (I-300)+(1.045)+(1.046), (I-300)+(1.045)+(1.047), (I-300)+(1.045)+(1.048), (I-300)+(1.045)+(1.049), (I-300)+(1.045)+(1.050), (I-300)+(1.045)+(1.051), (I-300)+(1.045)+(1.052), (I-300)+(1.045)+(1.053), (I-300)+(1.045)+(1.054), (I-300)+(1.045)+(1.055), (I-300)+(1.045)+(1.056), (I-300)+(1.045)+(1.057), (I-300)+(1.045)+(1.058), (I-300)+(1.045)+(1.059), (I-300)+(1.045)+(1.060), (I-300)+(1.045)+(1.061), (I-300)+(1.045)+(1.062), (I-300)+(1.045)+(1.063), (I-300)+(1.045)+(1.064), (I-300)+(1.045)+(1.065), (I-300)+(1.045)+(1.066), (I-300)+(1.045)+(1.067), (I-300)+(1.045)+(1.068), (I-300)+(1.045)+(1.069), (I-300)+(1.045)+(1.070), (I-300)+(1.045)+(1.071), (I-300)+(1.045)+(1.072), (I-300)+(1.045)+(1.073), (I-300)+(1.045)+(1.074), (I-300)+(1.045)+(1.075), (I-300)+(1.045)+(1.076), (I-300)+(1.045)+(1.077), (I-300)+(1.045)+(1.078), (I-300)+(1.045)+(1.079), (I-300)+(1.045)+(1.080), (I-300)+(1.045)+(1.081), (I-300)+(1.045)+(1.082), (I-300)+(1.045)+(1.083), (I-300)+(1.045)+(1.084), (I-300)+(1.045)+(1.085), (I-300)+(1.045)+(1.086), (I-300)+(1.045)+(1.087), (I-300)+(1.045)+(1.088), (I-300)+(1.045)+(1.089), (I-300)+(1.045)+(1.090), (I-300)+(1.045)+(1.091), (I-300)+(1.045)+(1.092), (I-300)+(1.045)+(2.001), (I-300)+(1.045)+(2.002), (I-300)+(1.045)+(2.003), (I-300)+(1.045)+(2.004), (I-300)+(1.045)+(2.005), (I-300)+(1.045)+(2.006), (I-300)+(1.045)+(2.007), (I-300)+(1.045)+(2.008), (I-300)+(1.045)+(2.009), (I-300)+(1.045)+(2.010), (I-300)+(1.045)+(2.011), (I-300)+(1.045)+(2.012), (I-300)+(1.045)+(2.013), (I-300)+(1.045)+(2.014), (I-300)+(1.045)+(2.015), (I-300)+(1.045)+(2.016), (I-300)+(1.045)+(2.017), (I-300)+(1.045)+(2.018), (I-300)+(1.045)+(2.019), (I-300)+(1.045)+(2.020), (I-300)+(1.045)+(2.021), (I-300)+(1.045)+(2.022), (I-300)+(1.045)+(2.023), (I-300)+(1.045)+(2.024), (I-300)+(1.045)+(2.025), (I-300)+(1.045)+(2.026), (I-300)+(1.045)+(2.027), (I-300)+(1.045)+(2.028), (I-300)+(1.045)+(2.029), (I-300)+(1.045)+(2.030), (I-300)+(1.045)+(2.031), (I-300)+(1.045)+(2.032), (I-300)+(1.045)+(2.033), (I-300)+(1.045)+(2.034), (I-300)+(1.045)+(2.035), (I-300)+(1.045)+(2.036), (I-300)+(1.045)+(2.037), (I-300)+(1.045)+(2.038), (I-300)+(1.045)+(2.039), (I-300)+(1.045)+(2.040), (I-300)+(1.045)+(2.041), (I-300)+(1.045)+(2.042), (I-300)+(1.045)+(2.043), (I-300)+(1.045)+(2.044), (I-300)+(1.045)+(2.045), (I-300)+(1.045)+(2.046), (I-300)+(1.045)+(2.047), (I-300)+(1.045)+(2.048), (I-300)+(1.045)+(2.049), (I-300)+(1.045)+(2.050), (I-300)+(1.045)+(2.051), (I-300)+(1.045)+(2.052), (I-300)+(1.045)+(2.053), (I-300)+(1.045)+(2.054), (I-300)+(1.045)+(2.055), (I-300)+(1.045)+(2.056), (I-300)+(1.045)+(2.057), (I-300)+(1.045)+(2.058), (I-300)+(1.045)+(2.059), (I-300)+(1.045)+(3.001), (I-300)+(1.045)+(3.002), (I-300)+(1.045)+(3.003), (I-300)+(1.045)+(3.004), (I-300)+(1.045)+(3.005), (I-300)+(1.045)+(3.006), (I-300)+(1.045)+(3.007), (I-300)+(1.045)+(3.008), (I-300)+(1.045)+(3.009), (I-300)+(1.045)+(3.010), (I-300)+(1.045)+(3.011), (I-300)+(1.045)+(3.012), (I-300)+(1.045)+(3.013), (I-300)+(1.045)+(3.014), (I-300)+(1.045)+(3.015), (I-300)+(1.045)+(3.016), (I-300)+(1.045)+(3.017), (I-300)+(1.045)+(3.018), (I-300)+(1.045)+(3.019), (I-300)+(1.045)+(3.020), (I-300)+(1.045)+(3.021), (I-300)+(1.045)+(3.022), (I-300)+(1.045)+(3.023), (I-300)+(1.045)+(3.024), (I-300)+(1.045)+(3.025), (I-300)+(1.045)+(3.026), (I-300)+(1.045)+(3.027), (I-300)+(1.045)+(3.028), (I-300)+(1.045)+(3.029), (I-300)+(1.045)+(3.030), (I-300)+(1.045)+(3.031), (I-300)+(1.045)+(5.001), (I-300)+(1.045)+(5.002), (I-300)+(1.045)+(5.003), (I-300)+(1.045)+(5.004), (I-300)+(1.045)+(5.005), (I-300)+(1.045)+(5.006), (I-300)+(1.045)+(5.007), (I-300)+(1.045)+(5.008), (I-300)+(1.045)+(5.009), (I-300)+(1.045)+(5.010), (I-300)+(1.045)+(5.011), (I-300)+(1.045)+(5.012), (I-300)+(1.045)+(5.013), (I-300)+(1.045)+(5.014), (I-300)+(1.045)+(5.015), (I-300)+(1.045)+(5.016), (I-300)+(1.045)+(5.017), (I-300)+(1.045)+(5.018), (I-300)+(1.045)+(5.019), (I-300)+(1.045)+(5.020), (I-300)+(1.045)+(5.021), (I-300)+(1.045)+(5.022), (I-300)+(1.045)+(5.023), (I-300)+(1.045)+(6.001), (I-300)+(1.045)+(6.002), (I-300)+(1.045)+(6.003), (I-300)+(1.045)+(6.004), (I-300)+(1.045)+(7.001), (I-300)+(1.045)+(7.002), (I-300)+(1.045)+(7.003), (I-300)+(1.045)+(7.004), (I-300)+(1.045)+(7.005), (I-300)+(1.045)+(7.006), (I-300)+(1.045)+(9.001), (I-300)+(1.045)+(9.002), (I-300)+(1.045)+(9.003), (I-300)+(1.045)+(9.004), (I-300)+(1.045)+(9.005), (I-300)+(1.045)+(9.006), (I-300)+(1.045)+(9.007), (I-300)+(1.045)+(9.008), (I-300)+(1.045)+(9.009), (I-300)+(1.045)+(14.001), (I-300)+(1.045)+(14.002), (I-300)+(1.045)+(15.008), (I-300)+(1.045)+(15.011), (I-300)+(1.045)+(15.012), (I-300)+(1.045)+(15.016), (I-300)+(1.045)+(15.025), (I-300)+(1.045)+(15.027), (I-300)+(1.045)+(15.047), (I-300)+(1.045)+(15.063), (I-300)+(1.045)+(15.064), (I-300)+(1.045)+(16.001), (I-300)+(1.045)+(16.002), (I-300)+(1.045)+(16.003), (I-300)+(1.045)+(16.004), (I-300)+(1.045)+(16.005), (I-300)+(1.045)+(16.006), (I-300)+(1.045)+(16.007), (I-300)+(1.045)+(16.008), (I-300)+(1.045)+(17.001), (I-300)+(1.045)+(17.002), (I-300)+(1.045)+(17.003), (I-300)+(1.045)+(17.004), (I-300)+(1.045)+(17.005), (I-300)+(1.045)+(17.006), (I-300)+(1.045)+(17.007), (I-300)+(1.045)+(17.008), (I-300)+(1.045)+(17.009), (I-300)+(1.045)+(17.010), (I-300)+(1.045)+(17.011), (I-300)+(1.045)+(17.012), (I-300)+(1.045)+(18.001), (I-300)+(1.046)+(1.047), (I-300)+(1.046)+(1.048), (I-300)+(1.046)+(1.049), (I-300)+(1.046)+(1.050), (I-300)+(1.046)+(1.051), (I-300)+(1.046)+(1.052), (I-300)+(1.046)+(1.053), (I-300)+(1.046)+(1.054), (I-300)+(1.046)+(1.055), (I-300)+(1.046)+(1.056), (I-300)+(1.046)+(1.057), (I-300)+(1.046)+(1.058), (I-300)+(1.046)+(1.059), (I-300)+(1.046)+(1.060), (I-300)+(1.046)+(1.061), (I-300)+(1.046)+(1.062), (I-300)+(1.046)+(1.063), (I-300)+(1.046)+(1.064), (I-300)+(1.046)+(1.065), (I-300)+(1.046)+(1.066), (I-300)+(1.046)+(1.067), (I-300)+(1.046)+(1.068), (I-300)+(1.046)+(1.069), (I-300)+(1.046)+(1.070), (I-300)+(1.046)+(1.071), (I-300)+(1.046)+(1.072), (I-300)+(1.046)+(1.073), (I-300)+(1.046)+(1.074), (I-300)+(1.046)+(1.075), (I-300)+(1.046)+(1.076), (I-300)+(1.046)+(1.077), (I-300)+(1.046)+(1.078), (I-300)+(1.046)+(1.079), (I-300)+(1.046)+(1.080), (I-300)+(1.046)+(1.081), (I-300)+(1.046)+(1.082), (I-300)+(1.046)+(1.083), (I-300)+(1.046)+(1.084), (I-300)+(1.046)+(1.085), (I-300)+(1.046)+(1.086), (I-300)+(1.046)+(1.087), (I-300)+(1.046)+(1.088), (I-300)+(1.046)+(1.089), (I-300)+(1.046)+(1.090), (I-300)+(1.046)+(1.091), (I-300)+(1.046)+(1.092), (I-300)+(1.046)+(2.001), (I-300)+(1.046)+(2.002), (I-300)+(1.046)+(2.003), (I-300)+(1.046)+(2.004), (I-300)+(1.046)+(2.005), (I-300)+(1.046)+(2.006), (I-300)+(1.046)+(2.007), (I-300)+(1.046)+(2.008), (I-300)+(1.046)+(2.009), (I-300)+(1.046)+(2.010), (I-300)+(1.046)+(2.011), (I-300)+(1.046)+(2.012), (I-300)+(1.046)+(2.013), (I-300)+(1.046)+(2.014), (I-300)+(1.046)+(2.015), (I-300)+(1.046)+(2.016), (I-300)+(1.046)+(2.017), (I-300)+(1.046)+(2.018), (I-300)+(1.046)+(2.019), (I-300)+(1.046)+(2.020), (I-300)+(1.046)+(2.021), (I-300)+(1.046)+(2.022), (I-300)+(1.046)+(2.023), (I-300)+(1.046)+(2.024), (I-300)+(1.046)+(2.025), (I-300)+(1.046)+(2.026), (I-300)+(1.046)+(2.027), (I-300)+(1.046)+(2.028), (I-300)+(1.046)+(2.029), (I-300)+(1.046)+(2.030), (I-300)+(1.046)+(2.031), (I-300)+(1.046)+(2.032), (I-300)+(1.046)+(2.033), (I-300)+(1.046)+(2.034), (I-300)+(1.046)+(2.035), (I-300)+(1.046)+(2.036), (I-300)+(1.046)+(2.037), (I-300)+(1.046)+(2.038), (I-300)+(1.046)+(2.039), (I-300)+(1.046)+(2.040), (I-300)+(1.046)+(2.041), (I-300)+(1.046)+(2.042), (I-300)+(1.046)+(2.043), (I-300)+(1.046)+(2.044), (I-300)+(1.046)+(2.045), (I-300)+(1.046)+(2.046), (I-300)+(1.046)+(2.047), (I-300)+(1.046)+(2.048), (I-300)+(1.046)+(2.049), (I-300)+(1.046)+(2.050), (I-300)+(1.046)+(2.051), (I-300)+(1.046)+(2.052), (I-300)+(1.046)+(2.053), (I-300)+(1.046)+(2.054), (I-300)+(1.046)+(2.055), (I-300)+(1.046)+(2.056), (I-300)+(1.046)+(2.057), (I-300)+(1.046)+(2.058), (I-300)+(1.046)+(2.059), (I-300)+(1.046)+(3.001), (I-300)+(1.046)+(3.002), (I-300)+(1.046)+(3.003), (I-300)+(1.046)+(3.004), (I-300)+(1.046)+(3.005), (I-300)+(1.046)+(3.006), (I-300)+(1.046)+(3.007), (I-300)+(1.046)+(3.008), (I-300)+(1.046)+(3.009), (I-300)+(1.046)+(3.010), (I-300)+(1.046)+(3.011), (I-300)+(1.046)+(3.012), (I-300)+(1.046)+(3.013), (I-300)+(1.046)+(3.014), (I-300)+(1.046)+(3.015), (I-300)+(1.046)+(3.016), (I-300)+(1.046)+(3.017), (I-300)+(1.046)+(3.018), (I-300)+(1.046)+(3.019), (I-300)+(1.046)+(3.020), (I-300)+(1.046)+(3.021), (I-300)+(1.046)+(3.022), (I-300)+(1.046)+(3.023), (I-300)+(1.046)+(3.024), (I-300)+(1.046)+(3.025), (I-300)+(1.046)+(3.026), (I-300)+(1.046)+(3.027), (I-300)+(1.046)+(3.028), (I-300)+(1.046)+(3.029), (I-300)+(1.046)+(3.030), (I-300)+(1.046)+(3.031), (I-300)+(1.046)+(5.001), (I-300)+(1.046)+(5.002), (I-300)+(1.046)+(5.003), (I-300)+(1.046)+(5.004), (I-300)+(1.046)+(5.005), (I-300)+(1.046)+(5.006), (I-300)+(1.046)+(5.007), (I-300)+(1.046)+(5.008), (I-300)+(1.046)+(5.009), (I-300)+(1.046)+(5.010), (I-300)+(1.046)+(5.011), (I-300)+(1.046)+(5.012), (I-300)+(1.046)+(5.013), (I-300)+(1.046)+(5.014), (I-300)+(1.046)+(5.015), (I-300)+(1.046)+(5.016), (I-300)+(1.046)+(5.017), (I-300)+(1.046)+(5.018), (I-300)+(1.046)+(5.019), (I-300)+(1.046)+(5.020), (I-300)+(1.046)+(5.021), (I-300)+(1.046)+(5.022), (I-300)+(1.046)+(5.023), (I-300)+(1.046)+(6.001), (I-300)+(1.046)+(6.002), (I-300)+(1.046)+(6.003), (I-300)+(1.046)+(6.004), (I-300)+(1.046)+(7.001), (I-300)+(1.046)+(7.002), (I-300)+(1.046)+(7.003), (I-300)+(1.046)+(7.004), (I-300)+(1.046)+(7.005), (I-300)+(1.046)+(7.006), (I-300)+(1.046)+(9.001), (I-300)+(1.046)+(9.002), (I-300)+(1.046)+(9.003), (I-300)+(1.046)+(9.004), (I-300)+(1.046)+(9.005), (I-300)+(1.046)+(9.006), (I-300)+(1.046)+(9.007), (I-300)+(1.046)+(9.008), (I-300)+(1.046)+(9.009), (I-300)+(1.046)+(14.001), (I-300)+(1.046)+(14.002), (I-300)+(1.046)+(15.008), (I-300)+(1.046)+(15.011), (I-300)+(1.046)+(15.012), (I-300)+(1.046)+(15.016), (I-300)+(1.046)+(15.025), (I-300)+(1.046)+(15.027), (I-300)+(1.046)+(15.047), (I-300)+(1.046)+(15.063), (I-300)+(1.046)+(15.064), (I-300)+(1.046)+(16.001), (I-300)+(1.046)+(16.002), (I-300)+(1.046)+(16.003), (I-300)+(1.046)+(16.004), (I-300)+(1.046)+(16.005), (I-300)+(1.046)+(16.006), (I-300)+(1.046)+(16.007), (I-300)+(1.046)+(16.008), (I-300)+(1.046)+(17.001), (I-300)+(1.046)+(17.002), (I-300)+(1.046)+(17.003), (I-300)+(1.046)+(17.004), (I-300)+(1.046)+(17.005), (I-300)+(1.046)+(17.006), (I-300)+(1.046)+(17.007), (I-300)+(1.046)+(17.008), (I-300)+(1.046)+(17.009), (I-300)+(1.046)+(17.010), (I-300)+(1.046)+(17.011), (I-300)+(1.046)+(17.012), (I-300)+(1.046)+(18.001), (I-300)+(1.047)+(1.048), (I-300)+(1.047)+(1.049), (I-300)+(1.047)+(1.050), (I-300)+(1.047)+(1.051), (I-300)+(1.047)+(1.052), (I-300)+(1.047)+(1.053), (I-300)+(1.047)+(1.054), (I-300)+(1.047)+(1.055), (I-300)+(1.047)+(1.056), (I-300)+(1.047)+(1.057), (I-300)+(1.047)+(1.058), (I-300)+(1.047)+(1.059), (I-300)+(1.047)+(1.060), (I-300)+(1.047)+(1.061), (I-300)+(1.047)+(1.062), (I-300)+(1.047)+(1.063), (I-300)+(1.047)+(1.064), (I-300)+(1.047)+(1.065), (I-300)+(1.047)+(1.066), (I-300)+(1.047)+(1.067), (I-300)+(1.047)+(1.068), (I-300)+(1.047)+(1.069), (I-300)+(1.047)+(1.070), (I-300)+(1.047)+(1.071), (I-300)+(1.047)+(1.072), (I-300)+(1.047)+(1.073), (I-300)+(1.047)+(1.074), (I-300)+(1.047)+(1.075), (I-300)+(1.047)+(1.076), (I-300)+(1.047)+(1.077), (I-300)+(1.047)+(1.078), (I-300)+(1.047)+(1.079), (I-300)+(1.047)+(1.080), (I-300)+(1.047)+(1.081), (I-300)+(1.047)+(1.082), (I-300)+(1.047)+(1.083), (I-300)+(1.047)+(1.084), (I-300)+(1.047)+(1.085), (I-300)+(1.047)+(1.086), (I-300)+(1.047)+(1.087), (I-300)+(1.047)+(1.088), (I-300)+(1.047)+(1.089), (I-300)+(1.047)+(1.090), (I-300)+(1.047)+(1.091), (I-300)+(1.047)+(1.092), (I-300)+(1.047)+(2.001), (I-300)+(1.047)+(2.002), (I-300)+(1.047)+(2.003), (I-300)+(1.047)+(2.004), (I-300)+(1.047)+(2.005), (I-300)+(1.047)+(2.006), (I-300)+(1.047)+(2.007), (I-300)+(1.047)+(2.008), (I-300)+(1.047)+(2.009), (I-300)+(1.047)+(2.010), (I-300)+(1.047)+(2.011), (I-300)+(1.047)+(2.012), (I-300)+(1.047)+(2.013), (I-300)+(1.047)+(2.014), (I-300)+(1.047)+(2.015), (I-300)+(1.047)+(2.016), (I-300)+(1.047)+(2.017), (I-300)+(1.047)+(2.018), (I-300)+(1.047)+(2.019), (I-300)+(1.047)+(2.020), (I-300)+(1.047)+(2.021), (I-300)+(1.047)+(2.022), (I-300)+(1.047)+(2.023), (I-300)+(1.047)+(2.024), (I-300)+(1.047)+(2.025), (I-300)+(1.047)+(2.026), (I-300)+(1.047)+(2.027), (I-300)+(1.047)+(2.028), (I-300)+(1.047)+(2.029), (I-300)+(1.047)+(2.030), (I-300)+(1.047)+(2.031), (I-300)+(1.047)+(2.032), (I-300)+(1.047)+(2.033), (I-300)+(1.047)+(2.034), (I-300)+(1.047)+(2.035), (I-300)+(1.047)+(2.036), (I-300)+(1.047)+(2.037), (I-300)+(1.047)+(2.038), (I-300)+(1.047)+(2.039), (I-300)+(1.047)+(2.040), (I-300)+(1.047)+(2.041), (I-300)+(1.047)+(2.042), (I-300)+(1.047)+(2.043), (I-300)+(1.047)+(2.044), (I-300)+(1.047)+(2.045), (I-300)+(1.047)+(2.046), (I-300)+(1.047)+(2.047), (I-300)+(1.047)+(2.048), (I-300)+(1.047)+(2.049), (I-300)+(1.047)+(2.050), (I-300)+(1.047)+(2.051), (I-300)+(1.047)+(2.052), (I-300)+(1.047)+(2.053), (I-300)+(1.047)+(2.054), (I-300)+(1.047)+(2.055), (I-300)+(1.047)+(2.056), (I-300)+(1.047)+(2.057), (I-300)+(1.047)+(2.058), (I-300)+(1.047)+(2.059), (I-300)+(1.047)+(3.001), (I-300)+(1.047)+(3.002), (I-300)+(1.047)+(3.003), (I-300)+(1.047)+(3.004), (I-300)+(1.047)+(3.005), (I-300)+(1.047)+(3.006), (I-300)+(1.047)+(3.007), (I-300)+(1.047)+(3.008), (I-300)+(1.047)+(3.009), (I-300)+(1.047)+(3.010), (I-300)+(1.047)+(3.011), (I-300)+(1.047)+(3.012), (I-300)+(1.047)+(3.013), (I-300)+(1.047)+(3.014), (I-300)+(1.047)+(3.015), (I-300)+(1.047)+(3.016), (I-300)+(1.047)+(3.017), (I-300)+(1.047)+(3.018), (I-300)+(1.047)+(3.019), (I-300)+(1.047)+(3.020), (I-300)+(1.047)+(3.021), (I-300)+(1.047)+(3.022), (I-300)+(1.047)+(3.023), (I-300)+(1.047)+(3.024), (I-300)+(1.047)+(3.025), (I-300)+(1.047)+(3.026), (I-300)+(1.047)+(3.027), (I-300)+(1.047)+(3.028), (I-300)+(1.047)+(3.029), (I-300)+(1.047)+(3.030), (I-300)+(1.047)+(3.031), (I-300)+(1.047)+(5.001), (I-300)+(1.047)+(5.002), (I-300)+(1.047)+(5.003), (I-300)+(1.047)+(5.004), (I-300)+(1.047)+(5.005), (I-300)+(1.047)+(5.006), (I-300)+(1.047)+(5.007), (I-300)+(1.047)+(5.008), (I-300)+(1.047)+(5.009), (I-300)+(1.047)+(5.010), (I-300)+(1.047)+(5.011), (I-300)+(1.047)+(5.012), (I-300)+(1.047)+(5.013), (I-300)+(1.047)+(5.014), (I-300)+(1.047)+(5.015), (I-300)+(1.047)+(5.016), (I-300)+(1.047)+(5.017), (I-300)+(1.047)+(5.018), (I-300)+(1.047)+(5.019), (I-300)+(1.047)+(5.020), (I-300)+(1.047)+(5.021), (I-300)+(1.047)+(5.022), (I-300)+(1.047)+(5.023), (I-300)+(1.047)+(6.001), (I-300)+(1.047)+(6.002), (I-300)+(1.047)+(6.003), (I-300)+(1.047)+(6.004), (I-300)+(1.047)+(7.001), (I-300)+(1.047)+(7.002), (I-300)+(1.047)+(7.003), (I-300)+(1.047)+(7.004), (I-300)+(1.047)+(7.005), (I-300)+(1.047)+(7.006), (I-300)+(1.047)+(9.001), (I-300)+(1.047)+(9.002), (I-300)+(1.047)+(9.003), (I-300)+(1.047)+(9.004), (I-300)+(1.047)+(9.005), (I-300)+(1.047)+(9.006), (I-300)+(1.047)+(9.007), (I-300)+(1.047)+(9.008), (I-300)+(1.047)+(9.009), (I-300)+(1.047)+(14.001), (I-300)+(1.047)+(14.002), (I-300)+(1.047)+(15.008), (I-300)+(1.047)+(15.011), (I-300)+(1.047)+(15.012), (I-300)+(1.047)+(15.016), (I-300)+(1.047)+(15.025), (I-300)+(1.047)+(15.027), (I-300)+(1.047)+(15.047), (I-300)+(1.047)+(15.063), (I-300)+(1.047)+(15.064), (I-300)+(1.047)+(16.001), (I-300)+(1.047)+(16.002), (I-300)+(1.047)+(16.003), (I-300)+(1.047)+(16.004), (I-300)+(1.047)+(16.005), (I-300)+(1.047)+(16.006), (I-300)+(1.047)+(16.007), (I-300)+(1.047)+(16.008), (I-300)+(1.047)+(17.001), (I-300)+(1.047)+(17.002), (I-300)+(1.047)+(17.003), (I-300)+(1.047)+(17.004), (I-300)+(1.047)+(17.005), (I-300)+(1.047)+(17.006), (I-300)+(1.047)+(17.007), (I-300)+(1.047)+(17.008), (I-300)+(1.047)+(17.009), (I-300)+(1.047)+(17.010), (I-300)+(1.047)+(17.011), (I-300)+(1.047)+(17.012), (I-300)+(1.047)+(18.001), (I-300)+(1.048)+(1.049), (I-300)+(1.048)+(1.050), (I-300)+(1.048)+(1.051), (I-300)+(1.048)+(1.052), (I-300)+(1.048)+(1.053), (I-300)+(1.048)+(1.054), (I-300)+(1.048)+(1.055), (I-300)+(1.048)+(1.056), (I-300)+(1.048)+(1.057), (I-300)+(1.048)+(1.058), (I-300)+(1.048)+(1.059), (I-300)+(1.048)+(1.060), (I-300)+(1.048)+(1.061), (I-300)+(1.048)+(1.062), (I-300)+(1.048)+(1.063), (I-300)+(1.048)+(1.064), (I-300)+(1.048)+(1.065), (I-300)+(1.048)+(1.066), (I-300)+(1.048)+(1.067), (I-300)+(1.048)+(1.068), (I-300)+(1.048)+(1.069), (I-300)+(1.048)+(1.070), (I-300)+(1.048)+(1.071), (I-300)+(1.048)+(1.072), (I-300)+(1.048)+(1.073), (I-300)+(1.048)+(1.074), (I-300)+(1.048)+(1.075), (I-300)+(1.048)+(1.076), (I-300)+(1.048)+(1.077), (I-300)+(1.048)+(1.078), (I-300)+(1.048)+(1.079), (I-300)+(1.048)+(1.080), (I-300)+(1.048)+(1.081), (I-300)+(1.048)+(1.082), (I-300)+(1.048)+(1.083), (I-300)+(1.048)+(1.084), (I-300)+(1.048)+(1.085), (I-300)+(1.048)+(1.086), (I-300)+(1.048)+(1.087), (I-300)+(1.048)+(1.088), (I-300)+(1.048)+(1.089), (I-300)+(1.048)+(1.090), (I-300)+(1.048)+(1.091), (I-300)+(1.048)+(1.092), (I-300)+(1.048)+(2.001), (I-300)+(1.048)+(2.002), (I-300)+(1.048)+(2.003), (I-300)+(1.048)+(2.004), (I-300)+(1.048)+(2.005), (I-300)+(1.048)+(2.006), (I-300)+(1.048)+(2.007), (I-300)+(1.048)+(2.008), (I-300)+(1.048)+(2.009), (I-300)+(1.048)+(2.010), (I-300)+(1.048)+(2.011), (I-300)+(1.048)+(2.012), (I-300)+(1.048)+(2.013), (I-300)+(1.048)+(2.014), (I-300)+(1.048)+(2.015), (I-300)+(1.048)+(2.016), (I-300)+(1.048)+(2.017), (I-300)+(1.048)+(2.018), (I-300)+(1.048)+(2.019), (I-300)+(1.048)+(2.020), (I-300)+(1.048)+(2.021), (I-300)+(1.048)+(2.022), (I-300)+(1.048)+(2.023), (I-300)+(1.048)+(2.024), (I-300)+(1.048)+(2.025), (I-300)+(1.048)+(2.026), (I-300)+(1.048)+(2.027), (I-300)+(1.048)+(2.028), (I-300)+(1.048)+(2.029), (I-300)+(1.048)+(2.030), (I-300)+(1.048)+(2.031), (I-300)+(1.048)+(2.032), (I-300)+(1.048)+(2.033), (I-300)+(1.048)+(2.034), (I-300)+(1.048)+(2.035), (I-300)+(1.048)+(2.036), (I-300)+(1.048)+(2.037), (I-300)+(1.048)+(2.038), (I-300)+(1.048)+(2.039), (I-300)+(1.048)+(2.040), (I-300)+(1.048)+(2.041), (I-300)+(1.048)+(2.042), (I-300)+(1.048)+(2.043), (I-300)+(1.048)+(2.044), (I-300)+(1.048)+(2.045), (I-300)+(1.048)+(2.046), (I-300)+(1.048)+(2.047), (I-300)+(1.048)+(2.048), (I-300)+(1.048)+(2.049), (I-300)+(1.048)+(2.050), (I-300)+(1.048)+(2.051), (I-300)+(1.048)+(2.052), (I-300)+(1.048)+(2.053), (I-300)+(1.048)+(2.054), (I-300)+(1.048)+(2.055), (I-300)+(1.048)+(2.056), (I-300)+(1.048)+(2.057), (I-300)+(1.048)+(2.058), (I-300)+(1.048)+(2.059), (I-300)+(1.048)+(3.001), (I-300)+(1.048)+(3.002), (I-300)+(1.048)+(3.003), (I-300)+(1.048)+(3.004), (I-300)+(1.048)+(3.005), (I-300)+(1.048)+(3.006), (I-300)+(1.048)+(3.007), (I-300)+(1.048)+(3.008), (I-300)+(1.048)+(3.009), (I-300)+(1.048)+(3.010), (I-300)+(1.048)+(3.011), (I-300)+(1.048)+(3.012), (I-300)+(1.048)+(3.013), (I-300)+(1.048)+(3.014), (I-300)+(1.048)+(3.015), (I-300)+(1.048)+(3.016), (I-300)+(1.048)+(3.017), (I-300)+(1.048)+(3.018), (I-300)+(1.048)+(3.019), (I-300)+(1.048)+(3.020), (I-300)+(1.048)+(3.021), (I-300)+(1.048)+(3.022), (I-300)+(1.048)+(3.023), (I-300)+(1.048)+(3.024), (I-300)+(1.048)+(3.025), (I-300)+(1.048)+(3.026), (I-300)+(1.048)+(3.027), (I-300)+(1.048)+(3.028), (I-300)+(1.048)+(3.029), (I-300)+(1.048)+(3.030), (I-300)+(1.048)+(3.031), (I-300)+(1.048)+(5.001), (I-300)+(1.048)+(5.002), (I-300)+(1.048)+(5.003), (I-300)+(1.048)+(5.004), (I-300)+(1.048)+(5.005), (I-300)+(1.048)+(5.006), (I-300)+(1.048)+(5.007), (I-300)+(1.048)+(5.008), (I-300)+(1.048)+(5.009), (I-300)+(1.048)+(5.010), (I-300)+(1.048)+(5.011), (I-300)+(1.048)+(5.012), (I-300)+(1.048)+(5.013), (I-300)+(1.048)+(5.014), (I-300)+(1.048)+(5.015), (I-300)+(1.048)+(5.016), (I-300)+(1.048)+(5.017), (I-300)+(1.048)+(5.018), (I-300)+(1.048)+(5.019), (I-300)+(1.048)+(5.020), (I-300)+(1.048)+(5.021), (I-300)+(1.048)+(5.022), (I-300)+(1.048)+(5.023), (I-300)+(1.048)+(6.001), (I-300)+(1.048)+(6.002), (I-300)+(1.048)+(6.003), (I-300)+(1.048)+(6.004), (I-300)+(1.048)+(7.001), (I-300)+(1.048)+(7.002), (I-300)+(1.048)+(7.003), (I-300)+(1.048)+(7.004), (I-300)+(1.048)+(7.005), (I-300)+(1.048)+(7.006), (I-300)+(1.048)+(9.001), (I-300)+(1.048)+(9.002), (I-300)+(1.048)+(9.003), (I-300)+(1.048)+(9.004), (I-300)+(1.048)+(9.005), (I-300)+(1.048)+(9.006), (I-300)+(1.048)+(9.007), (I-300)+(1.048)+(9.008), (I-300)+(1.048)+(9.009), (I-300)+(1.048)+(14.001), (I-300)+(1.048)+(14.002), (I-300)+(1.048)+(15.008), (I-300)+(1.048)+(15.011), (I-300)+(1.048)+(15.012), (I-300)+(1.048)+(15.016), (I-300)+(1.048)+(15.025), (I-300)+(1.048)+(15.027), (I-300)+(1.048)+(15.047), (I-300)+(1.048)+(15.063), (I-300)+(1.048)+(15.064), (I-300)+(1.048)+(16.001), (I-300)+(1.048)+(16.002), (I-300)+(1.048)+(16.003), (I-300)+(1.048)+(16.004), (I-300)+(1.048)+(16.005), (I-300)+(1.048)+(16.006), (I-300)+(1.048)+(16.007), (I-300)+(1.048)+(16.008), (I-300)+(1.048)+(17.001), (I-300)+(1.048)+(17.002), (I-300)+(1.048)+(17.003), (I-300)+(1.048)+(17.004), (I-300)+(1.048)+(17.005), (I-300)+(1.048)+(17.006), (I-300)+(1.048)+(17.007), (I-300)+(1.048)+(17.008), (I-300)+(1.048)+(17.009), (I-300)+(1.048)+(17.010), (I-300)+(1.048)+(17.011), (I-300)+(1.048)+(17.012), (I-300)+(1.048)+(18.001), (I-300)+(1.049)+(1.050), (I-300)+(1.049)+(1.051), (I-300)+(1.049)+(1.052), (I-300)+(1.049)+(1.053), (I-300)+(1.049)+(1.054), (I-300)+(1.049)+(1.055), (I-300)+(1.049)+(1.056), (I-300)+(1.049)+(1.057), (I-300)+(1.049)+(1.058), (I-300)+(1.049)+(1.059), (I-300)+(1.049)+(1.060), (I-300)+(1.049)+(1.061), (I-300)+(1.049)+(1.062), (I-300)+(1.049)+(1.063), (I-300)+(1.049)+(1.064), (I-300)+(1.049)+(1.065), (I-300)+(1.049)+(1.066), (I-300)+(1.049)+(1.067), (I-300)+(1.049)+(1.068), (I-300)+(1.049)+(1.069), (I-300)+(1.049)+(1.070), (I-300)+(1.049)+(1.071), (I-300)+(1.049)+(1.072), (I-300)+(1.049)+(1.073), (I-300)+(1.049)+(1.074), (I-300)+(1.049)+(1.075), (I-300)+(1.049)+(1.076), (I-300)+(1.049)+(1.077), (I-300)+(1.049)+(1.078), (I-300)+(1.049)+(1.079), (I-300)+(1.049)+(1.080), (I-300)+(1.049)+(1.081), (I-300)+(1.049)+(1.082), (I-300)+(1.049)+(1.083), (I-300)+(1.049)+(1.084), (I-300)+(1.049)+(1.085), (I-300)+(1.049)+(1.086), (I-300)+(1.049)+(1.087), (I-300)+(1.049)+(1.088), (I-300)+(1.049)+(1.089), (I-300)+(1.049)+(1.090), (I-300)+(1.049)+(1.091), (I-300)+(1.049)+(1.092), (I-300)+(1.049)+(2.001), (I-300)+(1.049)+(2.002), (I-300)+(1.049)+(2.003), (I-300)+(1.049)+(2.004), (I-300)+(1.049)+(2.005), (I-300)+(1.049)+(2.006), (I-300)+(1.049)+(2.007), (I-300)+(1.049)+(2.008), (I-300)+(1.049)+(2.009), (I-300)+(1.049)+(2.010), (I-300)+(1.049)+(2.011), (I-300)+(1.049)+(2.012), (I-300)+(1.049)+(2.013), (I-300)+(1.049)+(2.014), (I-300)+(1.049)+(2.015), (I-300)+(1.049)+(2.016), (I-300)+(1.049)+(2.017), (I-300)+(1.049)+(2.018), (I-300)+(1.049)+(2.019), (I-300)+(1.049)+(2.020), (I-300)+(1.049)+(2.021), (I-300)+(1.049)+(2.022), (I-300)+(1.049)+(2.023), (I-300)+(1.049)+(2.024), (I-300)+(1.049)+(2.025), (I-300)+(1.049)+(2.026), (I-300)+(1.049)+(2.027), (I-300)+(1.049)+(2.028), (I-300)+(1.049)+(2.029), (I-300)+(1.049)+(2.030), (I-300)+(1.049)+(2.031), (I-300)+(1.049)+(2.032), (I-300)+(1.049)+(2.033), (I-300)+(1.049)+(2.034), (I-300)+(1.049)+(2.035), (I-300)+(1.049)+(2.036), (I-300)+(1.049)+(2.037), (I-300)+(1.049)+(2.038), (I-300)+(1.049)+(2.039), (I-300)+(1.049)+(2.040), (I-300)+(1.049)+(2.041), (I-300)+(1.049)+(2.042), (I-300)+(1.049)+(2.043), (I-300)+(1.049)+(2.044), (I-300)+(1.049)+(2.045), (I-300)+(1.049)+(2.046), (I-300)+(1.049)+(2.047), (I-300)+(1.049)+(2.048), (I-300)+(1.049)+(2.049), (I-300)+(1.049)+(2.050), (I-300)+(1.049)+(2.051), (I-300)+(1.049)+(2.052), (I-300)+(1.049)+(2.053), (I-300)+(1.049)+(2.054), (I-300)+(1.049)+(2.055), (I-300)+(1.049)+(2.056), (I-300)+(1.049)+(2.057), (I-300)+(1.049)+(2.058), (I-300)+(1.049)+(2.059), (I-300)+(1.049)+(3.001), (I-300)+(1.049)+(3.002), (I-300)+(1.049)+(3.003), (I-300)+(1.049)+(3.004), (I-300)+(1.049)+(3.005), (I-300)+(1.049)+(3.006), (I-300)+(1.049)+(3.007), (I-300)+(1.049)+(3.008), (I-300)+(1.049)+(3.009), (I-300)+(1.049)+(3.010), (I-300)+(1.049)+(3.011), (I-300)+(1.049)+(3.012), (I-300)+(1.049)+(3.013), (I-300)+(1.049)+(3.014), (I-300)+(1.049)+(3.015), (I-300)+(1.049)+(3.016), (I-300)+(1.049)+(3.017), (I-300)+(1.049)+(3.018), (I-300)+(1.049)+(3.019), (I-300)+(1.049)+(3.020), (I-300)+(1.049)+(3.021), (I-300)+(1.049)+(3.022), (I-300)+(1.049)+(3.023), (I-300)+(1.049)+(3.024), (I-300)+(1.049)+(3.025), (I-300)+(1.049)+(3.026), (I-300)+(1.049)+(3.027), (I-300)+(1.049)+(3.028), (I-300)+(1.049)+(3.029), (I-300)+(1.049)+(3.030), (I-300)+(1.049)+(3.031), (I-300)+(1.049)+(5.001), (I-300)+(1.049)+(5.002), (I-300)+(1.049)+(5.003), (I-300)+(1.049)+(5.004), (I-300)+(1.049)+(5.005), (I-300)+(1.049)+(5.006), (I-300)+(1.049)+(5.007), (I-300)+(1.049)+(5.008), (I-300)+(1.049)+(5.009), (I-300)+(1.049)+(5.010), (I-300)+(1.049)+(5.011), (I-300)+(1.049)+(5.012), (I-300)+(1.049)+(5.013), (I-300)+(1.049)+(5.014), (I-300)+(1.049)+(5.015), (I-300)+(1.049)+(5.016), (I-300)+(1.049)+(5.017), (I-300)+(1.049)+(5.018), (I-300)+(1.049)+(5.019), (I-300)+(1.049)+(5.020), (I-300)+(1.049)+(5.021), (I-300)+(1.049)+(5.022), (I-300)+(1.049)+(5.023), (I-300)+(1.049)+(6.001), (I-300)+(1.049)+(6.002), (I-300)+(1.049)+(6.003), (I-300)+(1.049)+(6.004), (I-300)+(1.049)+(7.001), (I-300)+(1.049)+(7.002), (I-300)+(1.049)+(7.003), (I-300)+(1.049)+(7.004), (I-300)+(1.049)+(7.005), (I-300)+(1.049)+(7.006), (I-300)+(1.049)+(9.001), (I-300)+(1.049)+(9.002), (I-300)+(1.049)+(9.003), (I-300)+(1.049)+(9.004), (I-300)+(1.049)+(9.005), (I-300)+(1.049)+(9.006), (I-300)+(1.049)+(9.007), (I-300)+(1.049)+(9.008), (I-300)+(1.049)+(9.009), (I-300)+(1.049)+(14.001), (I-300)+(1.049)+(14.002), (I-300)+(1.049)+(15.008), (I-300)+(1.049)+(15.011), (I-300)+(1.049)+(15.012), (I-300)+(1.049)+(15.016), (I-300)+(1.049)+(15.025), (I-300)+(1.049)+(15.027), (I-300)+(1.049)+(15.047), (I-300)+(1.049)+(15.063), (I-300)+(1.049)+(15.064), (I-300)+(1.049)+(16.001), (I-300)+(1.049)+(16.002), (I-300)+(1.049)+(16.003), (I-300)+(1.049)+(16.004), (I-300)+(1.049)+(16.005), (I-300)+(1.049)+(16.006), (I-300)+(1.049)+(16.007), (I-300)+(1.049)+(16.008), (I-300)+(1.049)+(17.001), (I-300)+(1.049)+(17.002), (I-300)+(1.049)+(17.003), (I-300)+(1.049)+(17.004), (I-300)+(1.049)+(17.005), (I-300)+(1.049)+(17.006), (I-300)+(1.049)+(17.007), (I-300)+(1.049)+(17.008), (I-300)+(1.049)+(17.009), (I-300)+(1.049)+(17.010), (I-300)+(1.049)+(17.011), (I-300)+(1.049)+(17.012), (I-300)+(1.049)+(18.001), (I-300)+(1.050)+(1.051), (I-300)+(1.050)+(1.052), (I-300)+(1.050)+(1.053), (I-300)+(1.050)+(1.054), (I-300)+(1.050)+(1.055), (I-300)+(1.050)+(1.056), (I-300)+(1.050)+(1.057), (I-300)+(1.050)+(1.058), (I-300)+(1.050)+(1.059), (I-300)+(1.050)+(1.060), (I-300)+(1.050)+(1.061), (I-300)+(1.050)+(1.062), (I-300)+(1.050)+(1.063), (I-300)+(1.050)+(1.064), (I-300)+(1.050)+(1.065), (I-300)+(1.050)+(1.066), (I-300)+(1.050)+(1.067), (I-300)+(1.050)+(1.068), (I-300)+(1.050)+(1.069), (I-300)+(1.050)+(1.070), (I-300)+(1.050)+(1.071), (I-300)+(1.050)+(1.072), (I-300)+(1.050)+(1.073), (I-300)+(1.050)+(1.074), (I-300)+(1.050)+(1.075), (I-300)+(1.050)+(1.076), (I-300)+(1.050)+(1.077), (I-300)+(1.050)+(1.078), (I-300)+(1.050)+(1.079), (I-300)+(1.050)+(1.080), (I-300)+(1.050)+(1.081), (I-300)+(1.050)+(1.082), (I-300)+(1.050)+(1.083), (I-300)+(1.050)+(1.084), (I-300)+(1.050)+(1.085), (I-300)+(1.050)+(1.086), (I-300)+(1.050)+(1.087), (I-300)+(1.050)+(1.088), (I-300)+(1.050)+(1.089), (I-300)+(1.050)+(1.090), (I-300)+(1.050)+(1.091), (I-300)+(1.050)+(1.092), (I-300)+(1.050)+(2.001), (I-300)+(1.050)+(2.002), (I-300)+(1.050)+(2.003), (I-300)+(1.050)+(2.004), (I-300)+(1.050)+(2.005), (I-300)+(1.050)+(2.006), (I-300)+(1.050)+(2.007), (I-300)+(1.050)+(2.008), (I-300)+(1.050)+(2.009), (I-300)+(1.050)+(2.010), (I-300)+(1.050)+(2.011), (I-300)+(1.050)+(2.012), (I-300)+(1.050)+(2.013), (I-300)+(1.050)+(2.014), (I-300)+(1.050)+(2.015), (I-300)+(1.050)+(2.016), (I-300)+(1.050)+(2.017), (I-300)+(1.050)+(2.018), (I-300)+(1.050)+(2.019), (I-300)+(1.050)+(2.020), (I-300)+(1.050)+(2.021), (I-300)+(1.050)+(2.022), (I-300)+(1.050)+(2.023), (I-300)+(1.050)+(2.024), (I-300)+(1.050)+(2.025), (I-300)+(1.050)+(2.026), (I-300)+(1.050)+(2.027), (I-300)+(1.050)+(2.028), (I-300)+(1.050)+(2.029), (I-300)+(1.050)+(2.030), (I-300)+(1.050)+(2.031), (I-300)+(1.050)+(2.032), (I-300)+(1.050)+(2.033), (I-300)+(1.050)+(2.034), (I-300)+(1.050)+(2.035), (I-300)+(1.050)+(2.036), (I-300)+(1.050)+(2.037), (I-300)+(1.050)+(2.038), (I-300)+(1.050)+(2.039), (I-300)+(1.050)+(2.040), (I-300)+(1.050)+(2.041), (I-300)+(1.050)+(2.042), (I-300)+(1.050)+(2.043), (I-300)+(1.050)+(2.044), (I-300)+(1.050)+(2.045), (I-300)+(1.050)+(2.046), (I-300)+(1.050)+(2.047), (I-300)+(1.050)+(2.048), (I-300)+(1.050)+(2.049), (I-300)+(1.050)+(2.050), (I-300)+(1.050)+(2.051), (I-300)+(1.050)+(2.052), (I-300)+(1.050)+(2.053), (I-300)+(1.050)+(2.054), (I-300)+(1.050)+(2.055), (I-300)+(1.050)+(2.056), (I-300)+(1.050)+(2.057), (I-300)+(1.050)+(2.058), (I-300)+(1.050)+(2.059), (I-300)+(1.050)+(3.001), (I-300)+(1.050)+(3.002), (I-300)+(1.050)+(3.003), (I-300)+(1.050)+(3.004), (I-300)+(1.050)+(3.005), (I-300)+(1.050)+(3.006), (I-300)+(1.050)+(3.007), (I-300)+(1.050)+(3.008), (I-300)+(1.050)+(3.009), (I-300)+(1.050)+(3.010), (I-300)+(1.050)+(3.011), (I-300)+(1.050)+(3.012), (I-300)+(1.050)+(3.013), (I-300)+(1.050)+(3.014), (I-300)+(1.050)+(3.015), (I-300)+(1.050)+(3.016), (I-300)+(1.050)+(3.017), (I-300)+(1.050)+(3.018), (I-300)+(1.050)+(3.019), (I-300)+(1.050)+(3.020), (I-300)+(1.050)+(3.021), (I-300)+(1.050)+(3.022), (I-300)+(1.050)+(3.023), (I-300)+(1.050)+(3.024), (I-300)+(1.050)+(3.025), (I-300)+(1.050)+(3.026), (I-300)+(1.050)+(3.027), (I-300)+(1.050)+(3.028), (I-300)+(1.050)+(3.029), (I-300)+(1.050)+(3.030), (I-300)+(1.050)+(3.031), (I-300)+(1.050)+(5.001), (I-300)+(1.050)+(5.002), (I-300)+(1.050)+(5.003), (I-300)+(1.050)+(5.004), (I-300)+(1.050)+(5.005), (I-300)+(1.050)+(5.006), (I-300)+(1.050)+(5.007), (I-300)+(1.050)+(5.008), (I-300)+(1.050)+(5.009), (I-300)+(1.050)+(5.010), (I-300)+(1.050)+(5.011), (I-300)+(1.050)+(5.012), (I-300)+(1.050)+(5.013), (I-300)+(1.050)+(5.014), (I-300)+(1.050)+(5.015), (I-300)+(1.050)+(5.016), (I-300)+(1.050)+(5.017), (I-300)+(1.050)+(5.018), (I-300)+(1.050)+(5.019), (I-300)+(1.050)+(5.020), (I-300)+(1.050)+(5.021), (I-300)+(1.050)+(5.022), (I-300)+(1.050)+(5.023), (I-300)+(1.050)+(6.001), (I-300)+(1.050)+(6.002), (I-300)+(1.050)+(6.003), (I-300)+(1.050)+(6.004), (I-300)+(1.050)+(7.001), (I-300)+(1.050)+(7.002), (I-300)+(1.050)+(7.003), (I-300)+(1.050)+(7.004), (I-300)+(1.050)+(7.005), (I-300)+(1.050)+(7.006), (I-300)+(1.050)+(9.001), (I-300)+(1.050)+(9.002), (I-300)+(1.050)+(9.003), (I-300)+(1.050)+(9.004), (I-300)+(1.050)+(9.005), (I-300)+(1.050)+(9.006), (I-300)+(1.050)+(9.007), (I-300)+(1.050)+(9.008), (I-300)+(1.050)+(9.009), (I-300)+(1.050)+(14.001), (I-300)+(1.050)+(14.002), (I-300)+(1.050)+(15.008), (I-300)+(1.050)+(15.011), (I-300)+(1.050)+(15.012), (I-300)+(1.050)+(15.016), (I-300)+(1.050)+(15.025), (I-300)+(1.050)+(15.027), (I-300)+(1.050)+(15.047), (I-300)+(1.050)+(15.063), (I-300)+(1.050)+(15.064), (I-300)+(1.050)+(16.001), (I-300)+(1.050)+(16.002), (I-300)+(1.050)+(16.003), (I-300)+(1.050)+(16.004), (I-300)+(1.050)+(16.005), (I-300)+(1.050)+(16.006), (I-300)+(1.050)+(16.007), (I-300)+(1.050)+(16.008), (I-300)+(1.050)+(17.001), (I-300)+(1.050)+(17.002), (I-300)+(1.050)+(17.003), (I-300)+(1.050)+(17.004), (I-300)+(1.050)+(17.005), (I-300)+(1.050)+(17.006), (I-300)+(1.050)+(17.007), (I-300)+(1.050)+(17.008), (I-300)+(1.050)+(17.009), (I-300)+(1.050)+(17.010), (I-300)+(1.050)+(17.011), (I-300)+(1.050)+(17.012), (I-300)+(1.050)+(18.001), (I-300)+(1.051)+(1.052), (I-300)+(1.051)+(1.053), (I-300)+(1.051)+(1.054), (I-300)+(1.051)+(1.055), (I-300)+(1.051)+(1.056), (I-300)+(1.051)+(1.057), (I-300)+(1.051)+(1.058), (I-300)+(1.051)+(1.059), (I-300)+(1.051)+(1.060), (I-300)+(1.051)+(1.061), (I-300)+(1.051)+(1.062), (I-300)+(1.051)+(1.063), (I-300)+(1.051)+(1.064), (I-300)+(1.051)+(1.065), (I-300)+(1.051)+(1.066), (I-300)+(1.051)+(1.067), (I-300)+(1.051)+(1.068), (I-300)+(1.051)+(1.069), (I-300)+(1.051)+(1.070), (I-300)+(1.051)+(1.071), (I-300)+(1.051)+(1.072), (I-300)+(1.051)+(1.073), (I-300)+(1.051)+(1.074), (I-300)+(1.051)+(1.075), (I-300)+(1.051)+(1.076), (I-300)+(1.051)+(1.077), (I-300)+(1.051)+(1.078), (I-300)+(1.051)+(1.079), (I-300)+(1.051)+(1.080), (I-300)+(1.051)+(1.081), (I-300)+(1.051)+(1.082), (I-300)+(1.051)+(1.083), (I-300)+(1.051)+(1.084), (I-300)+(1.051)+(1.085), (I-300)+(1.051)+(1.086), (I-300)+(1.051)+(1.087), (I-300)+(1.051)+(1.088), (I-300)+(1.051)+(1.089), (I-300)+(1.051)+(1.090), (I-300)+(1.051)+(1.091), (I-300)+(1.051)+(1.092), (I-300)+(1.051)+(2.001), (I-300)+(1.051)+(2.002), (I-300)+(1.051)+(2.003), (I-300)+(1.051)+(2.004), (I-300)+(1.051)+(2.005), (I-300)+(1.051)+(2.006), (I-300)+(1.051)+(2.007), (I-300)+(1.051)+(2.008), (I-300)+(1.051)+(2.009), (I-300)+(1.051)+(2.010), (I-300)+(1.051)+(2.011), (I-300)+(1.051)+(2.012), (I-300)+(1.051)+(2.013), (I-300)+(1.051)+(2.014), (I-300)+(1.051)+(2.015), (I-300)+(1.051)+(2.016), (I-300)+(1.051)+(2.017), (I-300)+(1.051)+(2.018), (I-300)+(1.051)+(2.019), (I-300)+(1.051)+(2.020), (I-300)+(1.051)+(2.021), (I-300)+(1.051)+(2.022), (I-300)+(1.051)+(2.023), (I-300)+(1.051)+(2.024), (I-300)+(1.051)+(2.025), (I-300)+(1.051)+(2.026), (I-300)+(1.051)+(2.027), (I-300)+(1.051)+(2.028), (I-300)+(1.051)+(2.029), (I-300)+(1.051)+(2.030), (I-300)+(1.051)+(2.031), (I-300)+(1.051)+(2.032), (I-300)+(1.051)+(2.033), (I-300)+(1.051)+(2.034), (I-300)+(1.051)+(2.035), (I-300)+(1.051)+(2.036), (I-300)+(1.051)+(2.037), (I-300)+(1.051)+(2.038), (I-300)+(1.051)+(2.039), (I-300)+(1.051)+(2.040), (I-300)+(1.051)+(2.041), (I-300)+(1.051)+(2.042), (I-300)+(1.051)+(2.043), (I-300)+(1.051)+(2.044), (I-300)+(1.051)+(2.045), (I-300)+(1.051)+(2.046), (I-300)+(1.051)+(2.047), (I-300)+(1.051)+(2.048), (I-300)+(1.051)+(2.049), (I-300)+(1.051)+(2.050), (I-300)+(1.051)+(2.051), (I-300)+(1.051)+(2.052), (I-300)+(1.051)+(2.053), (I-300)+(1.051)+(2.054), (I-300)+(1.051)+(2.055), (I-300)+(1.051)+(2.056), (I-300)+(1.051)+(2.057), (I-300)+(1.051)+(2.058), (I-300)+(1.051)+(2.059), (I-300)+(1.051)+(3.001), (I-300)+(1.051)+(3.002), (I-300)+(1.051)+(3.003), (I-300)+(1.051)+(3.004), (I-300)+(1.051)+(3.005), (I-300)+(1.051)+(3.006), (I-300)+(1.051)+(3.007), (I-300)+(1.051)+(3.008), (I-300)+(1.051)+(3.009), (I-300)+(1.051)+(3.010), (I-300)+(1.051)+(3.011), (I-300)+(1.051)+(3.012), (I-300)+(1.051)+(3.013), (I-300)+(1.051)+(3.014), (I-300)+(1.051)+(3.015), (I-300)+(1.051)+(3.016), (I-300)+(1.051)+(3.017), (I-300)+(1.051)+(3.018), (I-300)+(1.051)+(3.019), (I-300)+(1.051)+(3.020), (I-300)+(1.051)+(3.021), (I-300)+(1.051)+(3.022), (I-300)+(1.051)+(3.023), (I-300)+(1.051)+(3.024), (I-300)+(1.051)+(3.025), (I-300)+(1.051)+(3.026), (I-300)+(1.051)+(3.027), (I-300)+(1.051)+(3.028), (I-300)+(1.051)+(3.029), (I-300)+(1.051)+(3.030), (I-300)+(1.051)+(3.031), (I-300)+(1.051)+(5.001), (I-300)+(1.051)+(5.002), (I-300)+(1.051)+(5.003), (I-300)+(1.051)+(5.004), (I-300)+(1.051)+(5.005), (I-300)+(1.051)+(5.006), (I-300)+(1.051)+(5.007), (I-300)+(1.051)+(5.008), (I-300)+(1.051)+(5.009), (I-300)+(1.051)+(5.010), (I-300)+(1.051)+(5.011), (I-300)+(1.051)+(5.012), (I-300)+(1.051)+(5.013), (I-300)+(1.051)+(5.014), (I-300)+(1.051)+(5.015), (I-300)+(1.051)+(5.016), (I-300)+(1.051)+(5.017), (I-300)+(1.051)+(5.018), (I-300)+(1.051)+(5.019), (I-300)+(1.051)+(5.020), (I-300)+(1.051)+(5.021), (I-300)+(1.051)+(5.022), (I-300)+(1.051)+(5.023), (I-300)+(1.051)+(6.001), (I-300)+(1.051)+(6.002), (I-300)+(1.051)+(6.003), (I-300)+(1.051)+(6.004), (I-300)+(1.051)+(7.001), (I-300)+(1.051)+(7.002), (I-300)+(1.051)+(7.003), (I-300)+(1.051)+(7.004), (I-300)+(1.051)+(7.005), (I-300)+(1.051)+(7.006), (I-300)+(1.051)+(9.001), (I-300)+(1.051)+(9.002), (I-300)+(1.051)+(9.003), (I-300)+(1.051)+(9.004), (I-300)+(1.051)+(9.005), (I-300)+(1.051)+(9.006), (I-300)+(1.051)+(9.007), (I-300)+(1.051)+(9.008), (I-300)+(1.051)+(9.009), (I-300)+(1.051)+(14.001), (I-300)+(1.051)+(14.002), (I-300)+(1.051)+(15.008), (I-300)+(1.051)+(15.011), (I-300)+(1.051)+(15.012), (I-300)+(1.051)+(15.016), (I-300)+(1.051)+(15.025), (I-300)+(1.051)+(15.027), (I-300)+(1.051)+(15.047), (I-300)+(1.051)+(15.063), (I-300)+(1.051)+(15.064), (I-300)+(1.051)+(16.001), (I-300)+(1.051)+(16.002), (I-300)+(1.051)+(16.003), (I-300)+(1.051)+(16.004), (I-300)+(1.051)+(16.005), (I-300)+(1.051)+(16.006), (I-300)+(1.051)+(16.007), (I-300)+(1.051)+(16.008), (I-300)+(1.051)+(17.001), (I-300)+(1.051)+(17.002), (I-300)+(1.051)+(17.003), (I-300)+(1.051)+(17.004), (I-300)+(1.051)+(17.005), (I-300)+(1.051)+(17.006), (I-300)+(1.051)+(17.007), (I-300)+(1.051)+(17.008), (I-300)+(1.051)+(17.009), (I-300)+(1.051)+(17.010), (I-300)+(1.051)+(17.011), (I-300)+(1.051)+(17.012), (I-300)+(1.051)+(18.001), (I-300)+(1.052)+(1.053), (I-300)+(1.052)+(1.054), (I-300)+(1.052)+(1.055), (I-300)+(1.052)+(1.056), (I-300)+(1.052)+(1.057), (I-300)+(1.052)+(1.058), (I-300)+(1.052)+(1.059), (I-300)+(1.052)+(1.060), (I-300)+(1.052)+(1.061), (I-300)+(1.052)+(1.062), (I-300)+(1.052)+(1.063), (I-300)+(1.052)+(1.064), (I-300)+(1.052)+(1.065), (I-300)+(1.052)+(1.066), (I-300)+(1.052)+(1.067), (I-300)+(1.052)+(1.068), (I-300)+(1.052)+(1.069), (I-300)+(1.052)+(1.070), (I-300)+(1.052)+(1.071), (I-300)+(1.052)+(1.072), (I-300)+(1.052)+(1.073), (I-300)+(1.052)+(1.074), (I-300)+(1.052)+(1.075), (I-300)+(1.052)+(1.076), (I-300)+(1.052)+(1.077), (I-300)+(1.052)+(1.078), (I-300)+(1.052)+(1.079), (I-300)+(1.052)+(1.080), (I-300)+(1.052)+(1.081), (I-300)+(1.052)+(1.082), (I-300)+(1.052)+(1.083), (I-300)+(1.052)+(1.084), (I-300)+(1.052)+(1.085), (I-300)+(1.052)+(1.086), (I-300)+(1.052)+(1.087), (I-300)+(1.052)+(1.088), (I-300)+(1.052)+(1.089), (I-300)+(1.052)+(1.090), (I-300)+(1.052)+(1.091), (I-300)+(1.052)+(1.092), (I-300)+(1.052)+(2.001), (I-300)+(1.052)+(2.002), (I-300)+(1.052)+(2.003), (I-300)+(1.052)+(2.004), (I-300)+(1.052)+(2.005), (I-300)+(1.052)+(2.006), (I-300)+(1.052)+(2.007), (I-300)+(1.052)+(2.008), (I-300)+(1.052)+(2.009), (I-300)+(1.052)+(2.010), (I-300)+(1.052)+(2.011), (I-300)+(1.052)+(2.012), (I-300)+(1.052)+(2.013), (I-300)+(1.052)+(2.014), (I-300)+(1.052)+(2.015), (I-300)+(1.052)+(2.016), (I-300)+(1.052)+(2.017), (I-300)+(1.052)+(2.018), (I-300)+(1.052)+(2.019), (I-300)+(1.052)+(2.020), (I-300)+(1.052)+(2.021), (I-300)+(1.052)+(2.022), (I-300)+(1.052)+(2.023), (I-300)+(1.052)+(2.024), (I-300)+(1.052)+(2.025), (I-300)+(1.052)+(2.026), (I-300)+(1.052)+(2.027), (I-300)+(1.052)+(2.028), (I-300)+(1.052)+(2.029), (I-300)+(1.052)+(2.030), (I-300)+(1.052)+(2.031), (I-300)+(1.052)+(2.032), (I-300)+(1.052)+(2.033), (I-300)+(1.052)+(2.034), (I-300)+(1.052)+(2.035), (I-300)+(1.052)+(2.036), (I-300)+(1.052)+(2.037), (I-300)+(1.052)+(2.038), (I-300)+(1.052)+(2.039), (I-300)+(1.052)+(2.040), (I-300)+(1.052)+(2.041), (I-300)+(1.052)+(2.042), (I-300)+(1.052)+(2.043), (I-300)+(1.052)+(2.044), (I-300)+(1.052)+(2.045), (I-300)+(1.052)+(2.046), (I-300)+(1.052)+(2.047), (I-300)+(1.052)+(2.048), (I-300)+(1.052)+(2.049), (I-300)+(1.052)+(2.050), (I-300)+(1.052)+(2.051), (I-300)+(1.052)+(2.052), (I-300)+(1.052)+(2.053), (I-300)+(1.052)+(2.054), (I-300)+(1.052)+(2.055), (I-300)+(1.052)+(2.056), (I-300)+(1.052)+(2.057), (I-300)+(1.052)+(2.058), (I-300)+(1.052)+(2.059), (I-300)+(1.052)+(3.001), (I-300)+(1.052)+(3.002), (I-300)+(1.052)+(3.003), (I-300)+(1.052)+(3.004), (I-300)+(1.052)+(3.005), (I-300)+(1.052)+(3.006), (I-300)+(1.052)+(3.007), (I-300)+(1.052)+(3.008), (I-300)+(1.052)+(3.009), (I-300)+(1.052)+(3.010), (I-300)+(1.052)+(3.011), (I-300)+(1.052)+(3.012), (I-300)+(1.052)+(3.013), (I-300)+(1.052)+(3.014), (I-300)+(1.052)+(3.015), (I-300)+(1.052)+(3.016), (I-300)+(1.052)+(3.017), (I-300)+(1.052)+(3.018), (I-300)+(1.052)+(3.019), (I-300)+(1.052)+(3.020), (I-300)+(1.052)+(3.021), (I-300)+(1.052)+(3.022), (I-300)+(1.052)+(3.023), (I-300)+(1.052)+(3.024), (I-300)+(1.052)+(3.025), (I-300)+(1.052)+(3.026), (I-300)+(1.052)+(3.027), (I-300)+(1.052)+(3.028), (I-300)+(1.052)+(3.029), (I-300)+(1.052)+(3.030), (I-300)+(1.052)+(3.031), (I-300)+(1.052)+(5.001), (I-300)+(1.052)+(5.002), (I-300)+(1.052)+(5.003), (I-300)+(1.052)+(5.004), (I-300)+(1.052)+(5.005), (I-300)+(1.052)+(5.006), (I-300)+(1.052)+(5.007), (I-300)+(1.052)+(5.008), (I-300)+(1.052)+(5.009), (I-300)+(1.052)+(5.010), (I-300)+(1.052)+(5.011), (I-300)+(1.052)+(5.012), (I-300)+(1.052)+(5.013), (I-300)+(1.052)+(5.014), (I-300)+(1.052)+(5.015), (I-300)+(1.052)+(5.016), (I-300)+(1.052)+(5.017), (I-300)+(1.052)+(5.018), (I-300)+(1.052)+(5.019), (I-300)+(1.052)+(5.020), (I-300)+(1.052)+(5.021), (I-300)+(1.052)+(5.022), (I-300)+(1.052)+(5.023), (I-300)+(1.052)+(6.001), (I-300)+(1.052)+(6.002), (I-300)+(1.052)+(6.003), (I-300)+(1.052)+(6.004), (I-300)+(1.052)+(7.001), (I-300)+(1.052)+(7.002), (I-300)+(1.052)+(7.003), (I-300)+(1.052)+(7.004), (I-300)+(1.052)+(7.005), (I-300)+(1.052)+(7.006), (I-300)+(1.052)+(9.001), (I-300)+(1.052)+(9.002), (I-300)+(1.052)+(9.003), (I-300)+(1.052)+(9.004), (I-300)+(1.052)+(9.005), (I-300)+(1.052)+(9.006), (I-300)+(1.052)+(9.007), (I-300)+(1.052)+(9.008), (I-300)+(1.052)+(9.009), (I-300)+(1.052)+(14.001), (I-300)+(1.052)+(14.002), (I-300)+(1.052)+(15.008), (I-300)+(1.052)+(15.011), (I-300)+(1.052)+(15.012), (I-300)+(1.052)+(15.016), (I-300)+(1.052)+(15.025), (I-300)+(1.052)+(15.027), (I-300)+(1.052)+(15.047), (I-300)+(1.052)+(15.063), (I-300)+(1.052)+(15.064), (I-300)+(1.052)+(16.001), (I-300)+(1.052)+(16.002), (I-300)+(1.052)+(16.003), (I-300)+(1.052)+(16.004), (I-300)+(1.052)+(16.005), (I-300)+(1.052)+(16.006), (I-300)+(1.052)+(16.007), (I-300)+(1.052)+(16.008), (I-300)+(1.052)+(17.001), (I-300)+(1.052)+(17.002), (I-300)+(1.052)+(17.003), (I-300)+(1.052)+(17.004), (I-300)+(1.052)+(17.005), (I-300)+(1.052)+(17.006), (I-300)+(1.052)+(17.007), (I-300)+(1.052)+(17.008), (I-300)+(1.052)+(17.009), (I-300)+(1.052)+(17.010), (I-300)+(1.052)+(17.011), (I-300)+(1.052)+(17.012), (I-300)+(1.052)+(18.001), (I-300)+(1.053)+(1.054), (I-300)+(1.053)+(1.055), (I-300)+(1.053)+(1.056), (I-300)+(1.053)+(1.057), (I-300)+(1.053)+(1.058), (I-300)+(1.053)+(1.059), (I-300)+(1.053)+(1.060), (I-300)+(1.053)+(1.061), (I-300)+(1.053)+(1.062), (I-300)+(1.053)+(1.063), (I-300)+(1.053)+(1.064), (I-300)+(1.053)+(1.065), (I-300)+(1.053)+(1.066), (I-300)+(1.053)+(1.067), (I-300)+(1.053)+(1.068), (I-300)+(1.053)+(1.069), (I-300)+(1.053)+(1.070), (I-300)+(1.053)+(1.071), (I-300)+(1.053)+(1.072), (I-300)+(1.053)+(1.073), (I-300)+(1.053)+(1.074), (I-300)+(1.053)+(1.075), (I-300)+(1.053)+(1.076), (I-300)+(1.053)+(1.077), (I-300)+(1.053)+(1.078), (I-300)+(1.053)+(1.079), (I-300)+(1.053)+(1.080), (I-300)+(1.053)+(1.081), (I-300)+(1.053)+(1.082), (I-300)+(1.053)+(1.083), (I-300)+(1.053)+(1.084), (I-300)+(1.053)+(1.085), (I-300)+(1.053)+(1.086), (I-300)+(1.053)+(1.087), (I-300)+(1.053)+(1.088), (I-300)+(1.053)+(1.089), (I-300)+(1.053)+(1.090), (I-300)+(1.053)+(1.091), (I-300)+(1.053)+(1.092), (I-300)+(1.053)+(2.001), (I-300)+(1.053)+(2.002), (I-300)+(1.053)+(2.003), (I-300)+(1.053)+(2.004), (I-300)+(1.053)+(2.005), (I-300)+(1.053)+(2.006), (I-300)+(1.053)+(2.007), (I-300)+(1.053)+(2.008), (I-300)+(1.053)+(2.009), (I-300)+(1.053)+(2.010), (I-300)+(1.053)+(2.011), (I-300)+(1.053)+(2.012), (I-300)+(1.053)+(2.013), (I-300)+(1.053)+(2.014), (I-300)+(1.053)+(2.015), (I-300)+(1.053)+(2.016), (I-300)+(1.053)+(2.017), (I-300)+(1.053)+(2.018), (I-300)+(1.053)+(2.019), (I-300)+(1.053)+(2.020), (I-300)+(1.053)+(2.021), (I-300)+(1.053)+(2.022), (I-300)+(1.053)+(2.023), (I-300)+(1.053)+(2.024), (I-300)+(1.053)+(2.025), (I-300)+(1.053)+(2.026), (I-300)+(1.053)+(2.027), (I-300)+(1.053)+(2.028), (I-300)+(1.053)+(2.029), (I-300)+(1.053)+(2.030), (I-300)+(1.053)+(2.031), (I-300)+(1.053)+(2.032), (I-300)+(1.053)+(2.033), (I-300)+(1.053)+(2.034), (I-300)+(1.053)+(2.035), (I-300)+(1.053)+(2.036), (I-300)+(1.053)+(2.037), (I-300)+(1.053)+(2.038), (I-300)+(1.053)+(2.039), (I-300)+(1.053)+(2.040), (I-300)+(1.053)+(2.041), (I-300)+(1.053)+(2.042), (I-300)+(1.053)+(2.043), (I-300)+(1.053)+(2.044), (I-300)+(1.053)+(2.045), (I-300)+(1.053)+(2.046), (I-300)+(1.053)+(2.047), (I-300)+(1.053)+(2.048), (I-300)+(1.053)+(2.049), (I-300)+(1.053)+(2.050), (I-300)+(1.053)+(2.051), (I-300)+(1.053)+(2.052), (I-300)+(1.053)+(2.053), (I-300)+(1.053)+(2.054), (I-300)+(1.053)+(2.055), (I-300)+(1.053)+(2.056), (I-300)+(1.053)+(2.057), (I-300)+(1.053)+(2.058), (I-300)+(1.053)+(2.059), (I-300)+(1.053)+(3.001), (I-300)+(1.053)+(3.002), (I-300)+(1.053)+(3.003), (I-300)+(1.053)+(3.004), (I-300)+(1.053)+(3.005), (I-300)+(1.053)+(3.006), (I-300)+(1.053)+(3.007), (I-300)+(1.053)+(3.008), (I-300)+(1.053)+(3.009), (I-300)+(1.053)+(3.010), (I-300)+(1.053)+(3.011), (I-300)+(1.053)+(3.012), (I-300)+(1.053)+(3.013), (I-300)+(1.053)+(3.014), (I-300)+(1.053)+(3.015), (I-300)+(1.053)+(3.016), (I-300)+(1.053)+(3.017), (I-300)+(1.053)+(3.018), (I-300)+(1.053)+(3.019), (I-300)+(1.053)+(3.020), (I-300)+(1.053)+(3.021), (I-300)+(1.053)+(3.022), (I-300)+(1.053)+(3.023), (I-300)+(1.053)+(3.024), (I-300)+(1.053)+(3.025), (I-300)+(1.053)+(3.026), (I-300)+(1.053)+(3.027), (I-300)+(1.053)+(3.028), (I-300)+(1.053)+(3.029), (I-300)+(1.053)+(3.030), (I-300)+(1.053)+(3.031), (I-300)+(1.053)+(5.001), (I-300)+(1.053)+(5.002), (I-300)+(1.053)+(5.003), (I-300)+(1.053)+(5.004), (I-300)+(1.053)+(5.005), (I-300)+(1.053)+(5.006), (I-300)+(1.053)+(5.007), (I-300)+(1.053)+(5.008), (I-300)+(1.053)+(5.009), (I-300)+(1.053)+(5.010), (I-300)+(1.053)+(5.011), (I-300)+(1.053)+(5.012), (I-300)+(1.053)+(5.013), (I-300)+(1.053)+(5.014), (I-300)+(1.053)+(5.015), (I-300)+(1.053)+(5.016), (I-300)+(1.053)+(5.017), (I-300)+(1.053)+(5.018), (I-300)+(1.053)+(5.019), (I-300)+(1.053)+(5.020), (I-300)+(1.053)+(5.021), (I-300)+(1.053)+(5.022), (I-300)+(1.053)+(5.023), (I-300)+(1.053)+(6.001), (I-300)+(1.053)+(6.002), (I-300)+(1.053)+(6.003), (I-300)+(1.053)+(6.004), (I-300)+(1.053)+(7.001), (I-300)+(1.053)+(7.002), (I-300)+(1.053)+(7.003), (I-300)+(1.053)+(7.004), (I-300)+(1.053)+(7.005), (I-300)+(1.053)+(7.006), (I-300)+(1.053)+(9.001), (I-300)+(1.053)+(9.002), (I-300)+(1.053)+(9.003), (I-300)+(1.053)+(9.004), (I-300)+(1.053)+(9.005), (I-300)+(1.053)+(9.006), (I-300)+(1.053)+(9.007), (I-300)+(1.053)+(9.008), (I-300)+(1.053)+(9.009), (I-300)+(1.053)+(14.001), (I-300)+(1.053)+(14.002), (I-300)+(1.053)+(15.008), (I-300)+(1.053)+(15.011), (I-300)+(1.053)+(15.012), (I-300)+(1.053)+(15.016), (I-300)+(1.053)+(15.025), (I-300)+(1.053)+(15.027), (I-300)+(1.053)+(15.047), (I-300)+(1.053)+(15.063), (I-300)+(1.053)+(15.064), (I-300)+(1.053)+(16.001), (I-300)+(1.053)+(16.002), (I-300)+(1.053)+(16.003), (I-300)+(1.053)+(16.004), (I-300)+(1.053)+(16.005), (I-300)+(1.053)+(16.006), (I-300)+(1.053)+(16.007), (I-300)+(1.053)+(16.008), (I-300)+(1.053)+(17.001), (I-300)+(1.053)+(17.002), (I-300)+(1.053)+(17.003), (I-300)+(1.053)+(17.004), (I-300)+(1.053)+(17.005), (I-300)+(1.053)+(17.006), (I-300)+(1.053)+(17.007), (I-300)+(1.053)+(17.008), (I-300)+(1.053)+(17.009), (I-300)+(1.053)+(17.010), (I-300)+(1.053)+(17.011), (I-300)+(1.053)+(17.012), (I-300)+(1.053)+(18.001), (I-300)+(1.054)+(1.055), (I-300)+(1.054)+(1.056), (I-300)+(1.054)+(1.057), (I-300)+(1.054)+(1.058), (I-300)+(1.054)+(1.059), (I-300)+(1.054)+(1.060), (I-300)+(1.054)+(1.061), (I-300)+(1.054)+(1.062), (I-300)+(1.054)+(1.063), (I-300)+(1.054)+(1.064), (I-300)+(1.054)+(1.065), (I-300)+(1.054)+(1.066), (I-300)+(1.054)+(1.067), (I-300)+(1.054)+(1.068), (I-300)+(1.054)+(1.069), (I-300)+(1.054)+(1.070), (I-300)+(1.054)+(1.071), (I-300)+(1.054)+(1.072), (I-300)+(1.054)+(1.073), (I-300)+(1.054)+(1.074), (I-300)+(1.054)+(1.075), (I-300)+(1.054)+(1.076), (I-300)+(1.054)+(1.077), (I-300)+(1.054)+(1.078), (I-300)+(1.054)+(1.079), (I-300)+(1.054)+(1.080), (I-300)+(1.054)+(1.081), (I-300)+(1.054)+(1.082), (I-300)+(1.054)+(1.083), (I-300)+(1.054)+(1.084), (I-300)+(1.054)+(1.085), (I-300)+(1.054)+(1.086), (I-300)+(1.054)+(1.087), (I-300)+(1.054)+(1.088), (I-300)+(1.054)+(1.089), (I-300)+(1.054)+(1.090), (I-300)+(1.054)+(1.091), (I-300)+(1.054)+(1.092), (I-300)+(1.054)+(2.001), (I-300)+(1.054)+(2.002), (I-300)+(1.054)+(2.003), (I-300)+(1.054)+(2.004), (I-300)+(1.054)+(2.005), (I-300)+(1.054)+(2.006), (I-300)+(1.054)+(2.007), (I-300)+(1.054)+(2.008), (I-300)+(1.054)+(2.009), (I-300)+(1.054)+(2.010), (I-300)+(1.054)+(2.011), (I-300)+(1.054)+(2.012), (I-300)+(1.054)+(2.013), (I-300)+(1.054)+(2.014), (I-300)+(1.054)+(2.015), (I-300)+(1.054)+(2.016), (I-300)+(1.054)+(2.017), (I-300)+(1.054)+(2.018), (I-300)+(1.054)+(2.019), (I-300)+(1.054)+(2.020), (I-300)+(1.054)+(2.021), (I-300)+(1.054)+(2.022), (I-300)+(1.054)+(2.023), (I-300)+(1.054)+(2.024), (I-300)+(1.054)+(2.025), (I-300)+(1.054)+(2.026), (I-300)+(1.054)+(2.027), (I-300)+(1.054)+(2.028), (I-300)+(1.054)+(2.029), (I-300)+(1.054)+(2.030), (I-300)+(1.054)+(2.031), (I-300)+(1.054)+(2.032), (I-300)+(1.054)+(2.033), (I-300)+(1.054)+(2.034), (I-300)+(1.054)+(2.035), (I-300)+(1.054)+(2.036), (I-300)+(1.054)+(2.037), (I-300)+(1.054)+(2.038), (I-300)+(1.054)+(2.039), (I-300)+(1.054)+(2.040), (I-300)+(1.054)+(2.041), (I-300)+(1.054)+(2.042), (I-300)+(1.054)+(2.043), (I-300)+(1.054)+(2.044), (I-300)+(1.054)+(2.045), (I-300)+(1.054)+(2.046), (I-300)+(1.054)+(2.047), (I-300)+(1.054)+(2.048), (I-300)+(1.054)+(2.049), (I-300)+(1.054)+(2.050), (I-300)+(1.054)+(2.051), (I-300)+(1.054)+(2.052), (I-300)+(1.054)+(2.053), (I-300)+(1.054)+(2.054), (I-300)+(1.054)+(2.055), (I-300)+(1.054)+(2.056), (I-300)+(1.054)+(2.057), (I-300)+(1.054)+(2.058), (I-300)+(1.054)+(2.059), (I-300)+(1.054)+(3.001), (I-300)+(1.054)+(3.002), (I-300)+(1.054)+(3.003), (I-300)+(1.054)+(3.004), (I-300)+(1.054)+(3.005), (I-300)+(1.054)+(3.006), (I-300)+(1.054)+(3.007), (I-300)+(1.054)+(3.008), (I-300)+(1.054)+(3.009), (I-300)+(1.054)+(3.010), (I-300)+(1.054)+(3.011), (I-300)+(1.054)+(3.012), (I-300)+(1.054)+(3.013), (I-300)+(1.054)+(3.014), (I-300)+(1.054)+(3.015), (I-300)+(1.054)+(3.016), (I-300)+(1.054)+(3.017), (I-300)+(1.054)+(3.018), (I-300)+(1.054)+(3.019), (I-300)+(1.054)+(3.020), (I-300)+(1.054)+(3.021), (I-300)+(1.054)+(3.022), (I-300)+(1.054)+(3.023), (I-300)+(1.054)+(3.024), (I-300)+(1.054)+(3.025), (I-300)+(1.054)+(3.026), (I-300)+(1.054)+(3.027), (I-300)+(1.054)+(3.028), (I-300)+(1.054)+(3.029), (I-300)+(1.054)+(3.030), (I-300)+(1.054)+(3.031), (I-300)+(1.054)+(5.001), (I-300)+(1.054)+(5.002), (I-300)+(1.054)+(5.003), (I-300)+(1.054)+(5.004), (I-300)+(1.054)+(5.005), (I-300)+(1.054)+(5.006), (I-300)+(1.054)+(5.007), (I-300)+(1.054)+(5.008), (I-300)+(1.054)+(5.009), (I-300)+(1.054)+(5.010), (I-300)+(1.054)+(5.011), (I-300)+(1.054)+(5.012), (I-300)+(1.054)+(5.013), (I-300)+(1.054)+(5.014), (I-300)+(1.054)+(5.015), (I-300)+(1.054)+(5.016), (I-300)+(1.054)+(5.017), (I-300)+(1.054)+(5.018), (I-300)+(1.054)+(5.019), (I-300)+(1.054)+(5.020), (I-300)+(1.054)+(5.021), (I-300)+(1.054)+(5.022), (I-300)+(1.054)+(5.023), (I-300)+(1.054)+(6.001), (I-300)+(1.054)+(6.002), (I-300)+(1.054)+(6.003), (I-300)+(1.054)+(6.004), (I-300)+(1.054)+(7.001), (I-300)+(1.054)+(7.002), (I-300)+(1.054)+(7.003), (I-300)+(1.054)+(7.004), (I-300)+(1.054)+(7.005), (I-300)+(1.054)+(7.006), (I-300)+(1.054)+(9.001), (I-300)+(1.054)+(9.002), (I-300)+(1.054)+(9.003), (I-300)+(1.054)+(9.004), (I-300)+(1.054)+(9.005), (I-300)+(1.054)+(9.006), (I-300)+(1.054)+(9.007), (I-300)+(1.054)+(9.008), (I-300)+(1.054)+(9.009), (I-300)+(1.054)+(14.001), (I-300)+(1.054)+(14.002), (I-300)+(1.054)+(15.008), (I-300)+(1.054)+(15.011), (I-300)+(1.054)+(15.012), (I-300)+(1.054)+(15.016), (I-300)+(1.054)+(15.025), (I-300)+(1.054)+(15.027), (I-300)+(1.054)+(15.047), (I-300)+(1.054)+(15.063), (I-300)+(1.054)+(15.064), (I-300)+(1.054)+(16.001), (I-300)+(1.054)+(16.002), (I-300)+(1.054)+(16.003), (I-300)+(1.054)+(16.004), (I-300)+(1.054)+(16.005), (I-300)+(1.054)+(16.006), (I-300)+(1.054)+(16.007), (I-300)+(1.054)+(16.008), (I-300)+(1.054)+(17.001), (I-300)+(1.054)+(17.002), (I-300)+(1.054)+(17.003), (I-300)+(1.054)+(17.004), (I-300)+(1.054)+(17.005), (I-300)+(1.054)+(17.006), (I-300)+(1.054)+(17.007), (I-300)+(1.054)+(17.008), (I-300)+(1.054)+(17.009), (I-300)+(1.054)+(17.010), (I-300)+(1.054)+(17.011), (I-300)+(1.054)+(17.012), (I-300)+(1.054)+(18.001), (I-300)+(1.055)+(1.056), (I-300)+(1.055)+(1.057), (I-300)+(1.055)+(1.058), (I-300)+(1.055)+(1.059), (I-300)+(1.055)+(1.060), (I-300)+(1.055)+(1.061), (I-300)+(1.055)+(1.062), (I-300)+(1.055)+(1.063), (I-300)+(1.055)+(1.064), (I-300)+(1.055)+(1.065), (I-300)+(1.055)+(1.066), (I-300)+(1.055)+(1.067), (I-300)+(1.055)+(1.068), (I-300)+(1.055)+(1.069), (I-300)+(1.055)+(1.070), (I-300)+(1.055)+(1.071), (I-300)+(1.055)+(1.072), (I-300)+(1.055)+(1.073), (I-300)+(1.055)+(1.074), (I-300)+(1.055)+(1.075), (I-300)+(1.055)+(1.076), (I-300)+(1.055)+(1.077), (I-300)+(1.055)+(1.078), (I-300)+(1.055)+(1.079), (I-300)+(1.055)+(1.080), (I-300)+(1.055)+(1.081), (I-300)+(1.055)+(1.082), (I-300)+(1.055)+(1.083), (I-300)+(1.055)+(1.084), (I-300)+(1.055)+(1.085), (I-300)+(1.055)+(1.086), (I-300)+(1.055)+(1.087), (I-300)+(1.055)+(1.088), (I-300)+(1.055)+(1.089), (I-300)+(1.055)+(1.090), (I-300)+(1.055)+(1.091), (I-300)+(1.055)+(1.092), (I-300)+(1.055)+(2.001), (I-300)+(1.055)+(2.002), (I-300)+(1.055)+(2.003), (I-300)+(1.055)+(2.004), (I-300)+(1.055)+(2.005), (I-300)+(1.055)+(2.006), (I-300)+(1.055)+(2.007), (I-300)+(1.055)+(2.008), (I-300)+(1.055)+(2.009), (I-300)+(1.055)+(2.010), (I-300)+(1.055)+(2.011), (I-300)+(1.055)+(2.012), (I-300)+(1.055)+(2.013), (I-300)+(1.055)+(2.014), (I-300)+(1.055)+(2.015), (I-300)+(1.055)+(2.016), (I-300)+(1.055)+(2.017), (I-300)+(1.055)+(2.018), (I-300)+(1.055)+(2.019), (I-300)+(1.055)+(2.020), (I-300)+(1.055)+(2.021), (I-300)+(1.055)+(2.022), (I-300)+(1.055)+(2.023), (I-300)+(1.055)+(2.024), (I-300)+(1.055)+(2.025), (I-300)+(1.055)+(2.026), (I-300)+(1.055)+(2.027), (I-300)+(1.055)+(2.028), (I-300)+(1.055)+(2.029), (I-300)+(1.055)+(2.030), (I-300)+(1.055)+(2.031), (I-300)+(1.055)+(2.032), (I-300)+(1.055)+(2.033), (I-300)+(1.055)+(2.034), (I-300)+(1.055)+(2.035), (I-300)+(1.055)+(2.036), (I-300)+(1.055)+(2.037), (I-300)+(1.055)+(2.038), (I-300)+(1.055)+(2.039), (I-300)+(1.055)+(2.040), (I-300)+(1.055)+(2.041), (I-300)+(1.055)+(2.042), (I-300)+(1.055)+(2.043), (I-300)+(1.055)+(2.044), (I-300)+(1.055)+(2.045), (I-300)+(1.055)+(2.046), (I-300)+(1.055)+(2.047), (I-300)+(1.055)+(2.048), (I-300)+(1.055)+(2.049), (I-300)+(1.055)+(2.050), (I-300)+(1.055)+(2.051), (I-300)+(1.055)+(2.052), (I-300)+(1.055)+(2.053), (I-300)+(1.055)+(2.054), (I-300)+(1.055)+(2.055), (I-300)+(1.055)+(2.056), (I-300)+(1.055)+(2.057), (I-300)+(1.055)+(2.058), (I-300)+(1.055)+(2.059), (I-300)+(1.055)+(3.001), (I-300)+(1.055)+(3.002), (I-300)+(1.055)+(3.003), (I-300)+(1.055)+(3.004), (I-300)+(1.055)+(3.005), (I-300)+(1.055)+(3.006), (I-300)+(1.055)+(3.007), (I-300)+(1.055)+(3.008), (I-300)+(1.055)+(3.009), (I-300)+(1.055)+(3.010), (I-300)+(1.055)+(3.011), (I-300)+(1.055)+(3.012), (I-300)+(1.055)+(3.013), (I-300)+(1.055)+(3.014), (I-300)+(1.055)+(3.015), (I-300)+(1.055)+(3.016), (I-300)+(1.055)+(3.017), (I-300)+(1.055)+(3.018), (I-300)+(1.055)+(3.019), (I-300)+(1.055)+(3.020), (I-300)+(1.055)+(3.021), (I-300)+(1.055)+(3.022), (I-300)+(1.055)+(3.023), (I-300)+(1.055)+(3.024), (I-300)+(1.055)+(3.025), (I-300)+(1.055)+(3.026), (I-300)+(1.055)+(3.027), (I-300)+(1.055)+(3.028), (I-300)+(1.055)+(3.029), (I-300)+(1.055)+(3.030), (I-300)+(1.055)+(3.031), (I-300)+(1.055)+(5.001), (I-300)+(1.055)+(5.002), (I-300)+(1.055)+(5.003), (I-300)+(1.055)+(5.004), (I-300)+(1.055)+(5.005), (I-300)+(1.055)+(5.006), (I-300)+(1.055)+(5.007), (I-300)+(1.055)+(5.008), (I-300)+(1.055)+(5.009), (I-300)+(1.055)+(5.010), (I-300)+(1.055)+(5.011), (I-300)+(1.055)+(5.012), (I-300)+(1.055)+(5.013), (I-300)+(1.055)+(5.014), (I-300)+(1.055)+(5.015), (I-300)+(1.055)+(5.016), (I-300)+(1.055)+(5.017), (I-300)+(1.055)+(5.018), (I-300)+(1.055)+(5.019), (I-300)+(1.055)+(5.020), (I-300)+(1.055)+(5.021), (I-300)+(1.055)+(5.022), (I-300)+(1.055)+(5.023), (I-300)+(1.055)+(6.001), (I-300)+(1.055)+(6.002), (I-300)+(1.055)+(6.003), (I-300)+(1.055)+(6.004), (I-300)+(1.055)+(7.001), (I-300)+(1.055)+(7.002), (I-300)+(1.055)+(7.003), (I-300)+(1.055)+(7.004), (I-300)+(1.055)+(7.005), (I-300)+(1.055)+(7.006), (I-300)+(1.055)+(9.001), (I-300)+(1.055)+(9.002), (I-300)+(1.055)+(9.003), (I-300)+(1.055)+(9.004), (I-300)+(1.055)+(9.005), (I-300)+(1.055)+(9.006), (I-300)+(1.055)+(9.007), (I-300)+(1.055)+(9.008), (I-300)+(1.055)+(9.009), (I-300)+(1.055)+(14.001), (I-300)+(1.055)+(14.002), (I-300)+(1.055)+(15.008), (I-300)+(1.055)+(15.011), (I-300)+(1.055)+(15.012), (I-300)+(1.055)+(15.016), (I-300)+(1.055)+(15.025), (I-300)+(1.055)+(15.027), (I-300)+(1.055)+(15.047), (I-300)+(1.055)+(15.063), (I-300)+(1.055)+(15.064), (I-300)+(1.055)+(16.001), (I-300)+(1.055)+(16.002), (I-300)+(1.055)+(16.003), (I-300)+(1.055)+(16.004), (I-300)+(1.055)+(16.005), (I-300)+(1.055)+(16.006), (I-300)+(1.055)+(16.007), (I-300)+(1.055)+(16.008), (I-300)+(1.055)+(17.001), (I-300)+(1.055)+(17.002), (I-300)+(1.055)+(17.003), (I-300)+(1.055)+(17.004), (I-300)+(1.055)+(17.005), (I-300)+(1.055)+(17.006), (I-300)+(1.055)+(17.007), (I-300)+(1.055)+(17.008), (I-300)+(1.055)+(17.009), (I-300)+(1.055)+(17.010), (I-300)+(1.055)+(17.011), (I-300)+(1.055)+(17.012), (I-300)+(1.055)+(18.001), (I-300)+(1.056)+(1.057), (I-300)+(1.056)+(1.058), (I-300)+(1.056)+(1.059), (I-300)+(1.056)+(1.060), (I-300)+(1.056)+(1.061), (I-300)+(1.056)+(1.062), (I-300)+(1.056)+(1.063), (I-300)+(1.056)+(1.064), (I-300)+(1.056)+(1.065), (I-300)+(1.056)+(1.066), (I-300)+(1.056)+(1.067), (I-300)+(1.056)+(1.068), (I-300)+(1.056)+(1.069), (I-300)+(1.056)+(1.070), (I-300)+(1.056)+(1.071), (I-300)+(1.056)+(1.072), (I-300)+(1.056)+(1.073), (I-300)+(1.056)+(1.074), (I-300)+(1.056)+(1.075), (I-300)+(1.056)+(1.076), (I-300)+(1.056)+(1.077), (I-300)+(1.056)+(1.078), (I-300)+(1.056)+(1.079), (I-300)+(1.056)+(1.080), (I-300)+(1.056)+(1.081), (I-300)+(1.056)+(1.082), (I-300)+(1.056)+(1.083), (I-300)+(1.056)+(1.084), (I-300)+(1.056)+(1.085), (I-300)+(1.056)+(1.086), (I-300)+(1.056)+(1.087), (I-300)+(1.056)+(1.088), (I-300)+(1.056)+(1.089), (I-300)+(1.056)+(1.090), (I-300)+(1.056)+(1.091), (I-300)+(1.056)+(1.092), (I-300)+(1.056)+(2.001), (I-300)+(1.056)+(2.002), (I-300)+(1.056)+(2.003), (I-300)+(1.056)+(2.004), (I-300)+(1.056)+(2.005), (I-300)+(1.056)+(2.006), (I-300)+(1.056)+(2.007), (I-300)+(1.056)+(2.008), (I-300)+(1.056)+(2.009), (I-300)+(1.056)+(2.010), (I-300)+(1.056)+(2.011), (I-300)+(1.056)+(2.012), (I-300)+(1.056)+(2.013), (I-300)+(1.056)+(2.014), (I-300)+(1.056)+(2.015), (I-300)+(1.056)+(2.016), (I-300)+(1.056)+(2.017), (I-300)+(1.056)+(2.018), (I-300)+(1.056)+(2.019), (I-300)+(1.056)+(2.020), (I-300)+(1.056)+(2.021), (I-300)+(1.056)+(2.022), (I-300)+(1.056)+(2.023), (I-300)+(1.056)+(2.024), (I-300)+(1.056)+(2.025), (I-300)+(1.056)+(2.026), (I-300)+(1.056)+(2.027), (I-300)+(1.056)+(2.028), (I-300)+(1.056)+(2.029), (I-300)+(1.056)+(2.030), (I-300)+(1.056)+(2.031), (I-300)+(1.056)+(2.032), (I-300)+(1.056)+(2.033), (I-300)+(1.056)+(2.034), (I-300)+(1.056)+(2.035), (I-300)+(1.056)+(2.036), (I-300)+(1.056)+(2.037), (I-300)+(1.056)+(2.038), (I-300)+(1.056)+(2.039), (I-300)+(1.056)+(2.040), (I-300)+(1.056)+(2.041), (I-300)+(1.056)+(2.042), (I-300)+(1.056)+(2.043), (I-300)+(1.056)+(2.044), (I-300)+(1.056)+(2.045), (I-300)+(1.056)+(2.046), (I-300)+(1.056)+(2.047), (I-300)+(1.056)+(2.048), (I-300)+(1.056)+(2.049), (I-300)+(1.056)+(2.050), (I-300)+(1.056)+(2.051), (I-300)+(1.056)+(2.052), (I-300)+(1.056)+(2.053), (I-300)+(1.056)+(2.054), (I-300)+(1.056)+(2.055), (I-300)+(1.056)+(2.056), (I-300)+(1.056)+(2.057), (I-300)+(1.056)+(2.058), (I-300)+(1.056)+(2.059), (I-300)+(1.056)+(3.001), (I-300)+(1.056)+(3.002), (I-300)+(1.056)+(3.003), (I-300)+(1.056)+(3.004), (I-300)+(1.056)+(3.005), (I-300)+(1.056)+(3.006), (I-300)+(1.056)+(3.007), (I-300)+(1.056)+(3.008), (I-300)+(1.056)+(3.009), (I-300)+(1.056)+(3.010), (I-300)+(1.056)+(3.011), (I-300)+(1.056)+(3.012), (I-300)+(1.056)+(3.013), (I-300)+(1.056)+(3.014), (I-300)+(1.056)+(3.015), (I-300)+(1.056)+(3.016), (I-300)+(1.056)+(3.017), (I-300)+(1.056)+(3.018), (I-300)+(1.056)+(3.019), (I-300)+(1.056)+(3.020), (I-300)+(1.056)+(3.021), (I-300)+(1.056)+(3.022), (I-300)+(1.056)+(3.023), (I-300)+(1.056)+(3.024), (I-300)+(1.056)+(3.025), (I-300)+(1.056)+(3.026), (I-300)+(1.056)+(3.027), (I-300)+(1.056)+(3.028), (I-300)+(1.056)+(3.029), (I-300)+(1.056)+(3.030), (I-300)+(1.056)+(3.031), (I-300)+(1.056)+(5.001), (I-300)+(1.056)+(5.002), (I-300)+(1.056)+(5.003), (I-300)+(1.056)+(5.004), (I-300)+(1.056)+(5.005), (I-300)+(1.056)+(5.006), (I-300)+(1.056)+(5.007), (I-300)+(1.056)+(5.008), (I-300)+(1.056)+(5.009), (I-300)+(1.056)+(5.010), (I-300)+(1.056)+(5.011), (I-300)+(1.056)+(5.012), (I-300)+(1.056)+(5.013), (I-300)+(1.056)+(5.014), (I-300)+(1.056)+(5.015), (I-300)+(1.056)+(5.016), (I-300)+(1.056)+(5.017), (I-300)+(1.056)+(5.018), (I-300)+(1.056)+(5.019), (I-300)+(1.056)+(5.020), (I-300)+(1.056)+(5.021), (I-300)+(1.056)+(5.022), (I-300)+(1.056)+(5.023), (I-300)+(1.056)+(6.001), (I-300)+(1.056)+(6.002), (I-300)+(1.056)+(6.003), (I-300)+(1.056)+(6.004), (I-300)+(1.056)+(7.001), (I-300)+(1.056)+(7.002), (I-300)+(1.056)+(7.003), (I-300)+(1.056)+(7.004), (I-300)+(1.056)+(7.005), (I-300)+(1.056)+(7.006), (I-300)+(1.056)+(9.001), (I-300)+(1.056)+(9.002), (I-300)+(1.056)+(9.003), (I-300)+(1.056)+(9.004), (I-300)+(1.056)+(9.005), (I-300)+(1.056)+(9.006), (I-300)+(1.056)+(9.007), (I-300)+(1.056)+(9.008), (I-300)+(1.056)+(9.009), (I-300)+(1.056)+(14.001), (I-300)+(1.056)+(14.002), (I-300)+(1.056)+(15.008), (I-300)+(1.056)+(15.011), (I-300)+(1.056)+(15.012), (I-300)+(1.056)+(15.016), (I-300)+(1.056)+(15.025), (I-300)+(1.056)+(15.027), (I-300)+(1.056)+(15.047), (I-300)+(1.056)+(15.063), (I-300)+(1.056)+(15.064), (I-300)+(1.056)+(16.001), (I-300)+(1.056)+(16.002), (I-300)+(1.056)+(16.003), (I-300)+(1.056)+(16.004), (I-300)+(1.056)+(16.005), (I-300)+(1.056)+(16.006), (I-300)+(1.056)+(16.007), (I-300)+(1.056)+(16.008), (I-300)+(1.056)+(17.001), (I-300)+(1.056)+(17.002), (I-300)+(1.056)+(17.003), (I-300)+(1.056)+(17.004), (I-300)+(1.056)+(17.005), (I-300)+(1.056)+(17.006), (I-300)+(1.056)+(17.007), (I-300)+(1.056)+(17.008), (I-300)+(1.056)+(17.009), (I-300)+(1.056)+(17.010), (I-300)+(1.056)+(17.011), (I-300)+(1.056)+(17.012), (I-300)+(1.056)+(18.001), (I-300)+(1.057)+(1.058), (I-300)+(1.057)+(1.059), (I-300)+(1.057)+(1.060), (I-300)+(1.057)+(1.061), (I-300)+(1.057)+(1.062), (I-300)+(1.057)+(1.063), (I-300)+(1.057)+(1.064), (I-300)+(1.057)+(1.065), (I-300)+(1.057)+(1.066), (I-300)+(1.057)+(1.067), (I-300)+(1.057)+(1.068), (I-300)+(1.057)+(1.069), (I-300)+(1.057)+(1.070), (I-300)+(1.057)+(1.071), (I-300)+(1.057)+(1.072), (I-300)+(1.057)+(1.073), (I-300)+(1.057)+(1.074), (I-300)+(1.057)+(1.075), (I-300)+(1.057)+(1.076), (I-300)+(1.057)+(1.077), (I-300)+(1.057)+(1.078), (I-300)+(1.057)+(1.079), (I-300)+(1.057)+(1.080), (I-300)+(1.057)+(1.081), (I-300)+(1.057)+(1.082), (I-300)+(1.057)+(1.083), (I-300)+(1.057)+(1.084), (I-300)+(1.057)+(1.085), (I-300)+(1.057)+(1.086), (I-300)+(1.057)+(1.087), (I-300)+(1.057)+(1.088), (I-300)+(1.057)+(1.089), (I-300)+(1.057)+(1.090), (I-300)+(1.057)+(1.091), (I-300)+(1.057)+(1.092), (I-300)+(1.057)+(2.001), (I-300)+(1.057)+(2.002), (I-300)+(1.057)+(2.003), (I-300)+(1.057)+(2.004), (I-300)+(1.057)+(2.005), (I-300)+(1.057)+(2.006), (I-300)+(1.057)+(2.007), (I-300)+(1.057)+(2.008), (I-300)+(1.057)+(2.009), (I-300)+(1.057)+(2.010), (I-300)+(1.057)+(2.011), (I-300)+(1.057)+(2.012), (I-300)+(1.057)+(2.013), (I-300)+(1.057)+(2.014), (I-300)+(1.057)+(2.015), (I-300)+(1.057)+(2.016), (I-300)+(1.057)+(2.017), (I-300)+(1.057)+(2.018), (I-300)+(1.057)+(2.019), (I-300)+(1.057)+(2.020), (I-300)+(1.057)+(2.021), (I-300)+(1.057)+(2.022), (I-300)+(1.057)+(2.023), (I-300)+(1.057)+(2.024), (I-300)+(1.057)+(2.025), (I-300)+(1.057)+(2.026), (I-300)+(1.057)+(2.027), (I-300)+(1.057)+(2.028), (I-300)+(1.057)+(2.029), (I-300)+(1.057)+(2.030), (I-300)+(1.057)+(2.031), (I-300)+(1.057)+(2.032), (I-300)+(1.057)+(2.033), (I-300)+(1.057)+(2.034), (I-300)+(1.057)+(2.035), (I-300)+(1.057)+(2.036), (I-300)+(1.057)+(2.037), (I-300)+(1.057)+(2.038), (I-300)+(1.057)+(2.039), (I-300)+(1.057)+(2.040), (I-300)+(1.057)+(2.041), (I-300)+(1.057)+(2.042), (I-300)+(1.057)+(2.043), (I-300)+(1.057)+(2.044), (I-300)+(1.057)+(2.045), (I-300)+(1.057)+(2.046), (I-300)+(1.057)+(2.047), (I-300)+(1.057)+(2.048), (I-300)+(1.057)+(2.049), (I-300)+(1.057)+(2.050), (I-300)+(1.057)+(2.051), (I-300)+(1.057)+(2.052), (I-300)+(1.057)+(2.053), (I-300)+(1.057)+(2.054), (I-300)+(1.057)+(2.055), (I-300)+(1.057)+(2.056), (I-300)+(1.057)+(2.057), (I-300)+(1.057)+(2.058), (I-300)+(1.057)+(2.059), (I-300)+(1.057)+(3.001), (I-300)+(1.057)+(3.002), (I-300)+(1.057)+(3.003), (I-300)+(1.057)+(3.004), (I-300)+(1.057)+(3.005), (I-300)+(1.057)+(3.006), (I-300)+(1.057)+(3.007), (I-300)+(1.057)+(3.008), (I-300)+(1.057)+(3.009), (I-300)+(1.057)+(3.010), (I-300)+(1.057)+(3.011), (I-300)+(1.057)+(3.012), (I-300)+(1.057)+(3.013), (I-300)+(1.057)+(3.014), (I-300)+(1.057)+(3.015), (I-300)+(1.057)+(3.016), (I-300)+(1.057)+(3.017), (I-300)+(1.057)+(3.018), (I-300)+(1.057)+(3.019), (I-300)+(1.057)+(3.020), (I-300)+(1.057)+(3.021), (I-300)+(1.057)+(3.022), (I-300)+(1.057)+(3.023), (I-300)+(1.057)+(3.024), (I-300)+(1.057)+(3.025), (I-300)+(1.057)+(3.026), (I-300)+(1.057)+(3.027), (I-300)+(1.057)+(3.028), (I-300)+(1.057)+(3.029), (I-300)+(1.057)+(3.030), (I-300)+(1.057)+(3.031), (I-300)+(1.057)+(5.001), (I-300)+(1.057)+(5.002), (I-300)+(1.057)+(5.003), (I-300)+(1.057)+(5.004), (I-300)+(1.057)+(5.005), (I-300)+(1.057)+(5.006), (I-300)+(1.057)+(5.007), (I-300)+(1.057)+(5.008), (I-300)+(1.057)+(5.009), (I-300)+(1.057)+(5.010), (I-300)+(1.057)+(5.011), (I-300)+(1.057)+(5.012), (I-300)+(1.057)+(5.013), (I-300)+(1.057)+(5.014), (I-300)+(1.057)+(5.015), (I-300)+(1.057)+(5.016), (I-300)+(1.057)+(5.017), (I-300)+(1.057)+(5.018), (I-300)+(1.057)+(5.019), (I-300)+(1.057)+(5.020), (I-300)+(1.057)+(5.021), (I-300)+(1.057)+(5.022), (I-300)+(1.057)+(5.023), (I-300)+(1.057)+(6.001), (I-300)+(1.057)+(6.002), (I-300)+(1.057)+(6.003), (I-300)+(1.057)+(6.004), (I-300)+(1.057)+(7.001), (I-300)+(1.057)+(7.002), (I-300)+(1.057)+(7.003), (I-300)+(1.057)+(7.004), (I-300)+(1.057)+(7.005), (I-300)+(1.057)+(7.006), (I-300)+(1.057)+(9.001), (I-300)+(1.057)+(9.002), (I-300)+(1.057)+(9.003), (I-300)+(1.057)+(9.004), (I-300)+(1.057)+(9.005), (I-300)+(1.057)+(9.006), (I-300)+(1.057)+(9.007), (I-300)+(1.057)+(9.008), (I-300)+(1.057)+(9.009), (I-300)+(1.057)+(14.001), (I-300)+(1.057)+(14.002), (I-300)+(1.057)+(15.008), (I-300)+(1.057)+(15.011), (I-300)+(1.057)+(15.012), (I-300)+(1.057)+(15.016), (I-300)+(1.057)+(15.025), (I-300)+(1.057)+(15.027), (I-300)+(1.057)+(15.047), (I-300)+(1.057)+(15.063), (I-300)+(1.057)+(15.064), (I-300)+(1.057)+(16.001), (I-300)+(1.057)+(16.002), (I-300)+(1.057)+(16.003), (I-300)+(1.057)+(16.004), (I-300)+(1.057)+(16.005), (I-300)+(1.057)+(16.006), (I-300)+(1.057)+(16.007), (I-300)+(1.057)+(16.008), (I-300)+(1.057)+(17.001), (I-300)+(1.057)+(17.002), (I-300)+(1.057)+(17.003), (I-300)+(1.057)+(17.004), (I-300)+(1.057)+(17.005), (I-300)+(1.057)+(17.006), (I-300)+(1.057)+(17.007), (I-300)+(1.057)+(17.008), (I-300)+(1.057)+(17.009), (I-300)+(1.057)+(17.010), (I-300)+(1.057)+(17.011), (I-300)+(1.057)+(17.012), (I-300)+(1.057)+(18.001), (I-300)+(1.058)+(1.059), (I-300)+(1.058)+(1.060), (I-300)+(1.058)+(1.061), (I-300)+(1.058)+(1.062), (I-300)+(1.058)+(1.063), (I-300)+(1.058)+(1.064), (I-300)+(1.058)+(1.065), (I-300)+(1.058)+(1.066), (I-300)+(1.058)+(1.067), (I-300)+(1.058)+(1.068), (I-300)+(1.058)+(1.069), (I-300)+(1.058)+(1.070), (I-300)+(1.058)+(1.071), (I-300)+(1.058)+(1.072), (I-300)+(1.058)+(1.073), (I-300)+(1.058)+(1.074), (I-300)+(1.058)+(1.075), (I-300)+(1.058)+(1.076), (I-300)+(1.058)+(1.077), (I-300)+(1.058)+(1.078), (I-300)+(1.058)+(1.079), (I-300)+(1.058)+(1.080), (I-300)+(1.058)+(1.081), (I-300)+(1.058)+(1.082), (I-300)+(1.058)+(1.083), (I-300)+(1.058)+(1.084), (I-300)+(1.058)+(1.085), (I-300)+(1.058)+(1.086), (I-300)+(1.058)+(1.087), (I-300)+(1.058)+(1.088), (I-300)+(1.058)+(1.089), (I-300)+(1.058)+(1.090), (I-300)+(1.058)+(1.091), (I-300)+(1.058)+(1.092), (I-300)+(1.058)+(2.001), (I-300)+(1.058)+(2.002), (I-300)+(1.058)+(2.003), (I-300)+(1.058)+(2.004), (I-300)+(1.058)+(2.005), (I-300)+(1.058)+(2.006), (I-300)+(1.058)+(2.007), (I-300)+(1.058)+(2.008), (I-300)+(1.058)+(2.009), (I-300)+(1.058)+(2.010), (I-300)+(1.058)+(2.011), (I-300)+(1.058)+(2.012), (I-300)+(1.058)+(2.013), (I-300)+(1.058)+(2.014), (I-300)+(1.058)+(2.015), (I-300)+(1.058)+(2.016), (I-300)+(1.058)+(2.017), (I-300)+(1.058)+(2.018), (I-300)+(1.058)+(2.019), (I-300)+(1.058)+(2.020), (I-300)+(1.058)+(2.021), (I-300)+(1.058)+(2.022), (I-300)+(1.058)+(2.023), (I-300)+(1.058)+(2.024), (I-300)+(1.058)+(2.025), (I-300)+(1.058)+(2.026), (I-300)+(1.058)+(2.027), (I-300)+(1.058)+(2.028), (I-300)+(1.058)+(2.029), (I-300)+(1.058)+(2.030), (I-300)+(1.058)+(2.031), (I-300)+(1.058)+(2.032), (I-300)+(1.058)+(2.033), (I-300)+(1.058)+(2.034), (I-300)+(1.058)+(2.035), (I-300)+(1.058)+(2.036), (I-300)+(1.058)+(2.037), (I-300)+(1.058)+(2.038), (I-300)+(1.058)+(2.039), (I-300)+(1.058)+(2.040), (I-300)+(1.058)+(2.041), (I-300)+(1.058)+(2.042), (I-300)+(1.058)+(2.043), (I-300)+(1.058)+(2.044), (I-300)+(1.058)+(2.045), (I-300)+(1.058)+(2.046), (I-300)+(1.058)+(2.047), (I-300)+(1.058)+(2.048), (I-300)+(1.058)+(2.049), (I-300)+(1.058)+(2.050), (I-300)+(1.058)+(2.051), (I-300)+(1.058)+(2.052), (I-300)+(1.058)+(2.053), (I-300)+(1.058)+(2.054), (I-300)+(1.058)+(2.055), (I-300)+(1.058)+(2.056), (I-300)+(1.058)+(2.057), (I-300)+(1.058)+(2.058), (I-300)+(1.058)+(2.059), (I-300)+(1.058)+(3.001), (I-300)+(1.058)+(3.002), (I-300)+(1.058)+(3.003), (I-300)+(1.058)+(3.004), (I-300)+(1.058)+(3.005), (I-300)+(1.058)+(3.006), (I-300)+(1.058)+(3.007), (I-300)+(1.058)+(3.008), (I-300)+(1.058)+(3.009), (I-300)+(1.058)+(3.010), (I-300)+(1.058)+(3.011), (I-300)+(1.058)+(3.012), (I-300)+(1.058)+(3.013), (I-300)+(1.058)+(3.014), (I-300)+(1.058)+(3.015), (I-300)+(1.058)+(3.016), (I-300)+(1.058)+(3.017), (I-300)+(1.058)+(3.018), (I-300)+(1.058)+(3.019), (I-300)+(1.058)+(3.020), (I-300)+(1.058)+(3.021), (I-300)+(1.058)+(3.022), (I-300)+(1.058)+(3.023), (I-300)+(1.058)+(3.024), (I-300)+(1.058)+(3.025), (I-300)+(1.058)+(3.026), (I-300)+(1.058)+(3.027), (I-300)+(1.058)+(3.028), (I-300)+(1.058)+(3.029), (I-300)+(1.058)+(3.030), (I-300)+(1.058)+(3.031), (I-300)+(1.058)+(5.001), (I-300)+(1.058)+(5.002), (I-300)+(1.058)+(5.003), (I-300)+(1.058)+(5.004), (I-300)+(1.058)+(5.005), (I-300)+(1.058)+(5.006), (I-300)+(1.058)+(5.007), (I-300)+(1.058)+(5.008), (I-300)+(1.058)+(5.009), (I-300)+(1.058)+(5.010), (I-300)+(1.058)+(5.011), (I-300)+(1.058)+(5.012), (I-300)+(1.058)+(5.013), (I-300)+(1.058)+(5.014), (I-300)+(1.058)+(5.015), (I-300)+(1.058)+(5.016), (I-300)+(1.058)+(5.017), (I-300)+(1.058)+(5.018), (I-300)+(1.058)+(5.019), (I-300)+(1.058)+(5.020), (I-300)+(1.058)+(5.021), (I-300)+(1.058)+(5.022), (I-300)+(1.058)+(5.023), (I-300)+(1.058)+(6.001), (I-300)+(1.058)+(6.002), (I-300)+(1.058)+(6.003), (I-300)+(1.058)+(6.004), (I-300)+(1.058)+(7.001), (I-300)+(1.058)+(7.002), (I-300)+(1.058)+(7.003), (I-300)+(1.058)+(7.004), (I-300)+(1.058)+(7.005), (I-300)+(1.058)+(7.006), (I-300)+(1.058)+(9.001), (I-300)+(1.058)+(9.002), (I-300)+(1.058)+(9.003), (I-300)+(1.058)+(9.004), (I-300)+(1.058)+(9.005), (I-300)+(1.058)+(9.006), (I-300)+(1.058)+(9.007), (I-300)+(1.058)+(9.008), (I-300)+(1.058)+(9.009), (I-300)+(1.058)+(14.001), (I-300)+(1.058)+(14.002), (I-300)+(1.058)+(15.008), (I-300)+(1.058)+(15.011), (I-300)+(1.058)+(15.012), (I-300)+(1.058)+(15.016), (I-300)+(1.058)+(15.025), (I-300)+(1.058)+(15.027), (I-300)+(1.058)+(15.047), (I-300)+(1.058)+(15.063), (I-300)+(1.058)+(15.064), (I-300)+(1.058)+(16.001), (I-300)+(1.058)+(16.002), (I-300)+(1.058)+(16.003), (I-300)+(1.058)+(16.004), (I-300)+(1.058)+(16.005), (I-300)+(1.058)+(16.006), (I-300)+(1.058)+(16.007), (I-300)+(1.058)+(16.008), (I-300)+(1.058)+(17.001), (I-300)+(1.058)+(17.002), (I-300)+(1.058)+(17.003), (I-300)+(1.058)+(17.004), (I-300)+(1.058)+(17.005), (I-300)+(1.058)+(17.006), (I-300)+(1.058)+(17.007), (I-300)+(1.058)+(17.008), (I-300)+(1.058)+(17.009), (I-300)+(1.058)+(17.010), (I-300)+(1.058)+(17.011), (I-300)+(1.058)+(17.012), (I-300)+(1.058)+(18.001), (I-300)+(1.059)+(1.060), (I-300)+(1.059)+(1.061), (I-300)+(1.059)+(1.062), (I-300)+(1.059)+(1.063), (I-300)+(1.059)+(1.064), (I-300)+(1.059)+(1.065), (I-300)+(1.059)+(1.066), (I-300)+(1.059)+(1.067), (I-300)+(1.059)+(1.068), (I-300)+(1.059)+(1.069), (I-300)+(1.059)+(1.070), (I-300)+(1.059)+(1.071), (I-300)+(1.059)+(1.072), (I-300)+(1.059)+(1.073), (I-300)+(1.059)+(1.074), (I-300)+(1.059)+(1.075), (I-300)+(1.059)+(1.076), (I-300)+(1.059)+(1.077), (I-300)+(1.059)+(1.078), (I-300)+(1.059)+(1.079), (I-300)+(1.059)+(1.080), (I-300)+(1.059)+(1.081), (I-300)+(1.059)+(1.082), (I-300)+(1.059)+(1.083), (I-300)+(1.059)+(1.084), (I-300)+(1.059)+(1.085), (I-300)+(1.059)+(1.086), (I-300)+(1.059)+(1.087), (I-300)+(1.059)+(1.088), (I-300)+(1.059)+(1.089), (I-300)+(1.059)+(1.090), (I-300)+(1.059)+(1.091), (I-300)+(1.059)+(1.092), (I-300)+(1.059)+(2.001), (I-300)+(1.059)+(2.002), (I-300)+(1.059)+(2.003), (I-300)+(1.059)+(2.004), (I-300)+(1.059)+(2.005), (I-300)+(1.059)+(2.006), (I-300)+(1.059)+(2.007), (I-300)+(1.059)+(2.008), (I-300)+(1.059)+(2.009), (I-300)+(1.059)+(2.010), (I-300)+(1.059)+(2.011), (I-300)+(1.059)+(2.012), (I-300)+(1.059)+(2.013), (I-300)+(1.059)+(2.014), (I-300)+(1.059)+(2.015), (I-300)+(1.059)+(2.016), (I-300)+(1.059)+(2.017), (I-300)+(1.059)+(2.018), (I-300)+(1.059)+(2.019), (I-300)+(1.059)+(2.020), (I-300)+(1.059)+(2.021), (I-300)+(1.059)+(2.022), (I-300)+(1.059)+(2.023), (I-300)+(1.059)+(2.024), (I-300)+(1.059)+(2.025), (I-300)+(1.059)+(2.026), (I-300)+(1.059)+(2.027), (I-300)+(1.059)+(2.028), (I-300)+(1.059)+(2.029), (I-300)+(1.059)+(2.030), (I-300)+(1.059)+(2.031), (I-300)+(1.059)+(2.032), (I-300)+(1.059)+(2.033), (I-300)+(1.059)+(2.034), (I-300)+(1.059)+(2.035), (I-300)+(1.059)+(2.036), (I-300)+(1.059)+(2.037), (I-300)+(1.059)+(2.038), (I-300)+(1.059)+(2.039), (I-300)+(1.059)+(2.040), (I-300)+(1.059)+(2.041), (I-300)+(1.059)+(2.042), (I-300)+(1.059)+(2.043), (I-300)+(1.059)+(2.044), (I-300)+(1.059)+(2.045), (I-300)+(1.059)+(2.046), (I-300)+(1.059)+(2.047), (I-300)+(1.059)+(2.048), (I-300)+(1.059)+(2.049), (I-300)+(1.059)+(2.050), (I-300)+(1.059)+(2.051), (I-300)+(1.059)+(2.052), (I-300)+(1.059)+(2.053), (I-300)+(1.059)+(2.054), (I-300)+(1.059)+(2.055), (I-300)+(1.059)+(2.056), (I-300)+(1.059)+(2.057), (I-300)+(1.059)+(2.058), (I-300)+(1.059)+(2.059), (I-300)+(1.059)+(3.001), (I-300)+(1.059)+(3.002), (I-300)+(1.059)+(3.003), (I-300)+(1.059)+(3.004), (I-300)+(1.059)+(3.005), (I-300)+(1.059)+(3.006), (I-300)+(1.059)+(3.007), (I-300)+(1.059)+(3.008), (I-300)+(1.059)+(3.009), (I-300)+(1.059)+(3.010), (I-300)+(1.059)+(3.011), (I-300)+(1.059)+(3.012), (I-300)+(1.059)+(3.013), (I-300)+(1.059)+(3.014), (I-300)+(1.059)+(3.015), (I-300)+(1.059)+(3.016), (I-300)+(1.059)+(3.017), (I-300)+(1.059)+(3.018), (I-300)+(1.059)+(3.019), (I-300)+(1.059)+(3.020), (I-300)+(1.059)+(3.021), (I-300)+(1.059)+(3.022), (I-300)+(1.059)+(3.023), (I-300)+(1.059)+(3.024), (I-300)+(1.059)+(3.025), (I-300)+(1.059)+(3.026), (I-300)+(1.059)+(3.027), (I-300)+(1.059)+(3.028), (I-300)+(1.059)+(3.029), (I-300)+(1.059)+(3.030), (I-300)+(1.059)+(3.031), (I-300)+(1.059)+(5.001), (I-300)+(1.059)+(5.002), (I-300)+(1.059)+(5.003), (I-300)+(1.059)+(5.004), (I-300)+(1.059)+(5.005), (I-300)+(1.059)+(5.006), (I-300)+(1.059)+(5.007), (I-300)+(1.059)+(5.008), (I-300)+(1.059)+(5.009), (I-300)+(1.059)+(5.010), (I-300)+(1.059)+(5.011), (I-300)+(1.059)+(5.012), (I-300)+(1.059)+(5.013), (I-300)+(1.059)+(5.014), (I-300)+(1.059)+(5.015), (I-300)+(1.059)+(5.016), (I-300)+(1.059)+(5.017), (I-300)+(1.059)+(5.018), (I-300)+(1.059)+(5.019), (I-300)+(1.059)+(5.020), (I-300)+(1.059)+(5.021), (I-300)+(1.059)+(5.022), (I-300)+(1.059)+(5.023), (I-300)+(1.059)+(6.001), (I-300)+(1.059)+(6.002), (I-300)+(1.059)+(6.003), (I-300)+(1.059)+(6.004), (I-300)+(1.059)+(7.001), (I-300)+(1.059)+(7.002), (I-300)+(1.059)+(7.003), (I-300)+(1.059)+(7.004), (I-300)+(1.059)+(7.005), (I-300)+(1.059)+(7.006), (I-300)+(1.059)+(9.001), (I-300)+(1.059)+(9.002), (I-300)+(1.059)+(9.003), (I-300)+(1.059)+(9.004), (I-300)+(1.059)+(9.005), (I-300)+(1.059)+(9.006), (I-300)+(1.059)+(9.007), (I-300)+(1.059)+(9.008), (I-300)+(1.059)+(9.009), (I-300)+(1.059)+(14.001), (I-300)+(1.059)+(14.002), (I-300)+(1.059)+(15.008), (I-300)+(1.059)+(15.011), (I-300)+(1.059)+(15.012), (I-300)+(1.059)+(15.016), (I-300)+(1.059)+(15.025), (I-300)+(1.059)+(15.027), (I-300)+(1.059)+(15.047), (I-300)+(1.059)+(15.063), (I-300)+(1.059)+(15.064), (I-300)+(1.059)+(16.001), (I-300)+(1.059)+(16.002), (I-300)+(1.059)+(16.003), (I-300)+(1.059)+(16.004), (I-300)+(1.059)+(16.005), (I-300)+(1.059)+(16.006), (I-300)+(1.059)+(16.007), (I-300)+(1.059)+(16.008), (I-300)+(1.059)+(17.001), (I-300)+(1.059)+(17.002), (I-300)+(1.059)+(17.003), (I-300)+(1.059)+(17.004), (I-300)+(1.059)+(17.005), (I-300)+(1.059)+(17.006), (I-300)+(1.059)+(17.007), (I-300)+(1.059)+(17.008), (I-300)+(1.059)+(17.009), (I-300)+(1.059)+(17.010), (I-300)+(1.059)+(17.011), (I-300)+(1.059)+(17.012), (I-300)+(1.059)+(18.001), (I-300)+(1.060)+(1.061), (I-300)+(1.060)+(1.062), (I-300)+(1.060)+(1.063), (I-300)+(1.060)+(1.064), (I-300)+(1.060)+(1.065), (I-300)+(1.060)+(1.066), (I-300)+(1.060)+(1.067), (I-300)+(1.060)+(1.068), (I-300)+(1.060)+(1.069), (I-300)+(1.060)+(1.070), (I-300)+(1.060)+(1.071), (I-300)+(1.060)+(1.072), (I-300)+(1.060)+(1.073), (I-300)+(1.060)+(1.074), (I-300)+(1.060)+(1.075), (I-300)+(1.060)+(1.076), (I-300)+(1.060)+(1.077), (I-300)+(1.060)+(1.078), (I-300)+(1.060)+(1.079), (I-300)+(1.060)+(1.080), (I-300)+(1.060)+(1.081), (I-300)+(1.060)+(1.082), (I-300)+(1.060)+(1.083), (I-300)+(1.060)+(1.084), (I-300)+(1.060)+(1.085), (I-300)+(1.060)+(1.086), (I-300)+(1.060)+(1.087), (I-300)+(1.060)+(1.088), (I-300)+(1.060)+(1.089), (I-300)+(1.060)+(1.090), (I-300)+(1.060)+(1.091), (I-300)+(1.060)+(1.092), (I-300)+(1.060)+(2.001), (I-300)+(1.060)+(2.002), (I-300)+(1.060)+(2.003), (I-300)+(1.060)+(2.004), (I-300)+(1.060)+(2.005), (I-300)+(1.060)+(2.006), (I-300)+(1.060)+(2.007), (I-300)+(1.060)+(2.008), (I-300)+(1.060)+(2.009), (I-300)+(1.060)+(2.010), (I-300)+(1.060)+(2.011), (I-300)+(1.060)+(2.012), (I-300)+(1.060)+(2.013), (I-300)+(1.060)+(2.014), (I-300)+(1.060)+(2.015), (I-300)+(1.060)+(2.016), (I-300)+(1.060)+(2.017), (I-300)+(1.060)+(2.018), (I-300)+(1.060)+(2.019), (I-300)+(1.060)+(2.020), (I-300)+(1.060)+(2.021), (I-300)+(1.060)+(2.022), (I-300)+(1.060)+(2.023), (I-300)+(1.060)+(2.024), (I-300)+(1.060)+(2.025), (I-300)+(1.060)+(2.026), (I-300)+(1.060)+(2.027), (I-300)+(1.060)+(2.028), (I-300)+(1.060)+(2.029), (I-300)+(1.060)+(2.030), (I-300)+(1.060)+(2.031), (I-300)+(1.060)+(2.032), (I-300)+(1.060)+(2.033), (I-300)+(1.060)+(2.034), (I-300)+(1.060)+(2.035), (I-300)+(1.060)+(2.036), (I-300)+(1.060)+(2.037), (I-300)+(1.060)+(2.038), (I-300)+(1.060)+(2.039), (I-300)+(1.060)+(2.040), (I-300)+(1.060)+(2.041), (I-300)+(1.060)+(2.042), (I-300)+(1.060)+(2.043), (I-300)+(1.060)+(2.044), (I-300)+(1.060)+(2.045), (I-300)+(1.060)+(2.046), (I-300)+(1.060)+(2.047), (I-300)+(1.060)+(2.048), (I-300)+(1.060)+(2.049), (I-300)+(1.060)+(2.050), (I-300)+(1.060)+(2.051), (I-300)+(1.060)+(2.052), (I-300)+(1.060)+(2.053), (I-300)+(1.060)+(2.054), (I-300)+(1.060)+(2.055), (I-300)+(1.060)+(2.056), (I-300)+(1.060)+(2.057), (I-300)+(1.060)+(2.058), (I-300)+(1.060)+(2.059), (I-300)+(1.060)+(3.001), (I-300)+(1.060)+(3.002), (I-300)+(1.060)+(3.003), (I-300)+(1.060)+(3.004), (I-300)+(1.060)+(3.005), (I-300)+(1.060)+(3.006), (I-300)+(1.060)+(3.007), (I-300)+(1.060)+(3.008), (I-300)+(1.060)+(3.009), (I-300)+(1.060)+(3.010), (I-300)+(1.060)+(3.011), (I-300)+(1.060)+(3.012), (I-300)+(1.060)+(3.013), (I-300)+(1.060)+(3.014), (I-300)+(1.060)+(3.015), (I-300)+(1.060)+(3.016), (I-300)+(1.060)+(3.017), (I-300)+(1.060)+(3.018), (I-300)+(1.060)+(3.019), (I-300)+(1.060)+(3.020), (I-300)+(1.060)+(3.021), (I-300)+(1.060)+(3.022), (I-300)+(1.060)+(3.023), (I-300)+(1.060)+(3.024), (I-300)+(1.060)+(3.025), (I-300)+(1.060)+(3.026), (I-300)+(1.060)+(3.027), (I-300)+(1.060)+(3.028), (I-300)+(1.060)+(3.029), (I-300)+(1.060)+(3.030), (I-300)+(1.060)+(3.031), (I-300)+(1.060)+(5.001), (I-300)+(1.060)+(5.002), (I-300)+(1.060)+(5.003), (I-300)+(1.060)+(5.004), (I-300)+(1.060)+(5.005), (I-300)+(1.060)+(5.006), (I-300)+(1.060)+(5.007), (I-300)+(1.060)+(5.008), (I-300)+(1.060)+(5.009), (I-300)+(1.060)+(5.010), (I-300)+(1.060)+(5.011), (I-300)+(1.060)+(5.012), (I-300)+(1.060)+(5.013), (I-300)+(1.060)+(5.014), (I-300)+(1.060)+(5.015), (I-300)+(1.060)+(5.016), (I-300)+(1.060)+(5.017), (I-300)+(1.060)+(5.018), (I-300)+(1.060)+(5.019), (I-300)+(1.060)+(5.020), (I-300)+(1.060)+(5.021), (I-300)+(1.060)+(5.022), (I-300)+(1.060)+(5.023), (I-300)+(1.060)+(6.001), (I-300)+(1.060)+(6.002), (I-300)+(1.060)+(6.003), (I-300)+(1.060)+(6.004), (I-300)+(1.060)+(7.001), (I-300)+(1.060)+(7.002), (I-300)+(1.060)+(7.003), (I-300)+(1.060)+(7.004), (I-300)+(1.060)+(7.005), (I-300)+(1.060)+(7.006), (I-300)+(1.060)+(9.001), (I-300)+(1.060)+(9.002), (I-300)+(1.060)+(9.003), (I-300)+(1.060)+(9.004), (I-300)+(1.060)+(9.005), (I-300)+(1.060)+(9.006), (I-300)+(1.060)+(9.007), (I-300)+(1.060)+(9.008), (I-300)+(1.060)+(9.009), (I-300)+(1.060)+(14.001), (I-300)+(1.060)+(14.002), (I-300)+(1.060)+(15.008), (I-300)+(1.060)+(15.011), (I-300)+(1.060)+(15.012), (I-300)+(1.060)+(15.016), (I-300)+(1.060)+(15.025), (I-300)+(1.060)+(15.027), (I-300)+(1.060)+(15.047), (I-300)+(1.060)+(15.063), (I-300)+(1.060)+(15.064), (I-300)+(1.060)+(16.001), (I-300)+(1.060)+(16.002), (I-300)+(1.060)+(16.003), (I-300)+(1.060)+(16.004), (I-300)+(1.060)+(16.005), (I-300)+(1.060)+(16.006), (I-300)+(1.060)+(16.007), (I-300)+(1.060)+(16.008), (I-300)+(1.060)+(17.001), (I-300)+(1.060)+(17.002), (I-300)+(1.060)+(17.003), (I-300)+(1.060)+(17.004), (I-300)+(1.060)+(17.005), (I-300)+(1.060)+(17.006), (I-300)+(1.060)+(17.007), (I-300)+(1.060)+(17.008), (I-300)+(1.060)+(17.009), (I-300)+(1.060)+(17.010), (I-300)+(1.060)+(17.011), (I-300)+(1.060)+(17.012), (I-300)+(1.060)+(18.001), (I-300)+(1.061)+(1.062), (I-300)+(1.061)+(1.063), (I-300)+(1.061)+(1.064), (I-300)+(1.061)+(1.065), (I-300)+(1.061)+(1.066), (I-300)+(1.061)+(1.067), (I-300)+(1.061)+(1.068), (I-300)+(1.061)+(1.069), (I-300)+(1.061)+(1.070), (I-300)+(1.061)+(1.071), (I-300)+(1.061)+(1.072), (I-300)+(1.061)+(1.073), (I-300)+(1.061)+(1.074), (I-300)+(1.061)+(1.075), (I-300)+(1.061)+(1.076), (I-300)+(1.061)+(1.077), (I-300)+(1.061)+(1.078), (I-300)+(1.061)+(1.079), (I-300)+(1.061)+(1.080), (I-300)+(1.061)+(1.081), (I-300)+(1.061)+(1.082), (I-300)+(1.061)+(1.083), (I-300)+(1.061)+(1.084), (I-300)+(1.061)+(1.085), (I-300)+(1.061)+(1.086), (I-300)+(1.061)+(1.087), (I-300)+(1.061)+(1.088), (I-300)+(1.061)+(1.089), (I-300)+(1.061)+(1.090), (I-300)+(1.061)+(1.091), (I-300)+(1.061)+(1.092), (I-300)+(1.061)+(2.001), (I-300)+(1.061)+(2.002), (I-300)+(1.061)+(2.003), (I-300)+(1.061)+(2.004), (I-300)+(1.061)+(2.005), (I-300)+(1.061)+(2.006), (I-300)+(1.061)+(2.007), (I-300)+(1.061)+(2.008), (I-300)+(1.061)+(2.009), (I-300)+(1.061)+(2.010), (I-300)+(1.061)+(2.011), (I-300)+(1.061)+(2.012), (I-300)+(1.061)+(2.013), (I-300)+(1.061)+(2.014), (I-300)+(1.061)+(2.015), (I-300)+(1.061)+(2.016), (I-300)+(1.061)+(2.017), (I-300)+(1.061)+(2.018), (I-300)+(1.061)+(2.019), (I-300)+(1.061)+(2.020), (I-300)+(1.061)+(2.021), (I-300)+(1.061)+(2.022), (I-300)+(1.061)+(2.023), (I-300)+(1.061)+(2.024), (I-300)+(1.061)+(2.025), (I-300)+(1.061)+(2.026), (I-300)+(1.061)+(2.027), (I-300)+(1.061)+(2.028), (I-300)+(1.061)+(2.029), (I-300)+(1.061)+(2.030), (I-300)+(1.061)+(2.031), (I-300)+(1.061)+(2.032), (I-300)+(1.061)+(2.033), (I-300)+(1.061)+(2.034), (I-300)+(1.061)+(2.035), (I-300)+(1.061)+(2.036), (I-300)+(1.061)+(2.037), (I-300)+(1.061)+(2.038), (I-300)+(1.061)+(2.039), (I-300)+(1.061)+(2.040), (I-300)+(1.061)+(2.041), (I-300)+(1.061)+(2.042), (I-300)+(1.061)+(2.043), (I-300)+(1.061)+(2.044), (I-300)+(1.061)+(2.045), (I-300)+(1.061)+(2.046), (I-300)+(1.061)+(2.047), (I-300)+(1.061)+(2.048), (I-300)+(1.061)+(2.049), (I-300)+(1.061)+(2.050), (I-300)+(1.061)+(2.051), (I-300)+(1.061)+(2.052), (I-300)+(1.061)+(2.053), (I-300)+(1.061)+(2.054), (I-300)+(1.061)+(2.055), (I-300)+(1.061)+(2.056), (I-300)+(1.061)+(2.057), (I-300)+(1.061)+(2.058), (I-300)+(1.061)+(2.059), (I-300)+(1.061)+(3.001), (I-300)+(1.061)+(3.002), (I-300)+(1.061)+(3.003), (I-300)+(1.061)+(3.004), (I-300)+(1.061)+(3.005), (I-300)+(1.061)+(3.006), (I-300)+(1.061)+(3.007), (I-300)+(1.061)+(3.008), (I-300)+(1.061)+(3.009), (I-300)+(1.061)+(3.010), (I-300)+(1.061)+(3.011), (I-300)+(1.061)+(3.012), (I-300)+(1.061)+(3.013), (I-300)+(1.061)+(3.014), (I-300)+(1.061)+(3.015), (I-300)+(1.061)+(3.016), (I-300)+(1.061)+(3.017), (I-300)+(1.061)+(3.018), (I-300)+(1.061)+(3.019), (I-300)+(1.061)+(3.020), (I-300)+(1.061)+(3.021), (I-300)+(1.061)+(3.022), (I-300)+(1.061)+(3.023), (I-300)+(1.061)+(3.024), (I-300)+(1.061)+(3.025), (I-300)+(1.061)+(3.026), (I-300)+(1.061)+(3.027), (I-300)+(1.061)+(3.028), (I-300)+(1.061)+(3.029), (I-300)+(1.061)+(3.030), (I-300)+(1.061)+(3.031), (I-300)+(1.061)+(5.001), (I-300)+(1.061)+(5.002), (I-300)+(1.061)+(5.003), (I-300)+(1.061)+(5.004), (I-300)+(1.061)+(5.005), (I-300)+(1.061)+(5.006), (I-300)+(1.061)+(5.007), (I-300)+(1.061)+(5.008), (I-300)+(1.061)+(5.009), (I-300)+(1.061)+(5.010), (I-300)+(1.061)+(5.011), (I-300)+(1.061)+(5.012), (I-300)+(1.061)+(5.013), (I-300)+(1.061)+(5.014), (I-300)+(1.061)+(5.015), (I-300)+(1.061)+(5.016), (I-300)+(1.061)+(5.017), (I-300)+(1.061)+(5.018), (I-300)+(1.061)+(5.019), (I-300)+(1.061)+(5.020), (I-300)+(1.061)+(5.021), (I-300)+(1.061)+(5.022), (I-300)+(1.061)+(5.023), (I-300)+(1.061)+(6.001), (I-300)+(1.061)+(6.002), (I-300)+(1.061)+(6.003), (I-300)+(1.061)+(6.004), (I-300)+(1.061)+(7.001), (I-300)+(1.061)+(7.002), (I-300)+(1.061)+(7.003), (I-300)+(1.061)+(7.004), (I-300)+(1.061)+(7.005), (I-300)+(1.061)+(7.006), (I-300)+(1.061)+(9.001), (I-300)+(1.061)+(9.002), (I-300)+(1.061)+(9.003), (I-300)+(1.061)+(9.004), (I-300)+(1.061)+(9.005), (I-300)+(1.061)+(9.006), (I-300)+(1.061)+(9.007), (I-300)+(1.061)+(9.008), (I-300)+(1.061)+(9.009), (I-300)+(1.061)+(14.001), (I-300)+(1.061)+(14.002), (I-300)+(1.061)+(15.008), (I-300)+(1.061)+(15.011), (I-300)+(1.061)+(15.012), (I-300)+(1.061)+(15.016), (I-300)+(1.061)+(15.025), (I-300)+(1.061)+(15.027), (I-300)+(1.061)+(15.047), (I-300)+(1.061)+(15.063), (I-300)+(1.061)+(15.064), (I-300)+(1.061)+(16.001), (I-300)+(1.061)+(16.002), (I-300)+(1.061)+(16.003), (I-300)+(1.061)+(16.004), (I-300)+(1.061)+(16.005), (I-300)+(1.061)+(16.006), (I-300)+(1.061)+(16.007), (I-300)+(1.061)+(16.008), (I-300)+(1.061)+(17.001), (I-300)+(1.061)+(17.002), (I-300)+(1.061)+(17.003), (I-300)+(1.061)+(17.004), (I-300)+(1.061)+(17.005), (I-300)+(1.061)+(17.006), (I-300)+(1.061)+(17.007), (I-300)+(1.061)+(17.008), (I-300)+(1.061)+(17.009), (I-300)+(1.061)+(17.010), (I-300)+(1.061)+(17.011), (I-300)+(1.061)+(17.012), (I-300)+(1.061)+(18.001), (I-300)+(1.062)+(1.063), (I-300)+(1.062)+(1.064), (I-300)+(1.062)+(1.065), (I-300)+(1.062)+(1.066), (I-300)+(1.062)+(1.067), (I-300)+(1.062)+(1.068), (I-300)+(1.062)+(1.069), (I-300)+(1.062)+(1.070), (I-300)+(1.062)+(1.071), (I-300)+(1.062)+(1.072), (I-300)+(1.062)+(1.073), (I-300)+(1.062)+(1.074), (I-300)+(1.062)+(1.075), (I-300)+(1.062)+(1.076), (I-300)+(1.062)+(1.077), (I-300)+(1.062)+(1.078), (I-300)+(1.062)+(1.079), (I-300)+(1.062)+(1.080), (I-300)+(1.062)+(1.081), (I-300)+(1.062)+(1.082), (I-300)+(1.062)+(1.083), (I-300)+(1.062)+(1.084), (I-300)+(1.062)+(1.085), (I-300)+(1.062)+(1.086), (I-300)+(1.062)+(1.087), (I-300)+(1.062)+(1.088), (I-300)+(1.062)+(1.089), (I-300)+(1.062)+(1.090), (I-300)+(1.062)+(1.091), (I-300)+(1.062)+(1.092), (I-300)+(1.062)+(2.001), (I-300)+(1.062)+(2.002), (I-300)+(1.062)+(2.003), (I-300)+(1.062)+(2.004), (I-300)+(1.062)+(2.005), (I-300)+(1.062)+(2.006), (I-300)+(1.062)+(2.007), (I-300)+(1.062)+(2.008), (I-300)+(1.062)+(2.009), (I-300)+(1.062)+(2.010), (I-300)+(1.062)+(2.011), (I-300)+(1.062)+(2.012), (I-300)+(1.062)+(2.013), (I-300)+(1.062)+(2.014), (I-300)+(1.062)+(2.015), (I-300)+(1.062)+(2.016), (I-300)+(1.062)+(2.017), (I-300)+(1.062)+(2.018), (I-300)+(1.062)+(2.019), (I-300)+(1.062)+(2.020), (I-300)+(1.062)+(2.021), (I-300)+(1.062)+(2.022), (I-300)+(1.062)+(2.023), (I-300)+(1.062)+(2.024), (I-300)+(1.062)+(2.025), (I-300)+(1.062)+(2.026), (I-300)+(1.062)+(2.027), (I-300)+(1.062)+(2.028), (I-300)+(1.062)+(2.029), (I-300)+(1.062)+(2.030), (I-300)+(1.062)+(2.031), (I-300)+(1.062)+(2.032), (I-300)+(1.062)+(2.033), (I-300)+(1.062)+(2.034), (I-300)+(1.062)+(2.035), (I-300)+(1.062)+(2.036), (I-300)+(1.062)+(2.037), (I-300)+(1.062)+(2.038), (I-300)+(1.062)+(2.039), (I-300)+(1.062)+(2.040), (I-300)+(1.062)+(2.041), (I-300)+(1.062)+(2.042), (I-300)+(1.062)+(2.043), (I-300)+(1.062)+(2.044), (I-300)+(1.062)+(2.045), (I-300)+(1.062)+(2.046), (I-300)+(1.062)+(2.047), (I-300)+(1.062)+(2.048), (I-300)+(1.062)+(2.049), (I-300)+(1.062)+(2.050), (I-300)+(1.062)+(2.051), (I-300)+(1.062)+(2.052), (I-300)+(1.062)+(2.053), (I-300)+(1.062)+(2.054), (I-300)+(1.062)+(2.055), (I-300)+(1.062)+(2.056), (I-300)+(1.062)+(2.057), (I-300)+(1.062)+(2.058), (I-300)+(1.062)+(2.059), (I-300)+(1.062)+(3.001), (I-300)+(1.062)+(3.002), (I-300)+(1.062)+(3.003), (I-300)+(1.062)+(3.004), (I-300)+(1.062)+(3.005), (I-300)+(1.062)+(3.006), (I-300)+(1.062)+(3.007), (I-300)+(1.062)+(3.008), (I-300)+(1.062)+(3.009), (I-300)+(1.062)+(3.010), (I-300)+(1.062)+(3.011), (I-300)+(1.062)+(3.012), (I-300)+(1.062)+(3.013), (I-300)+(1.062)+(3.014), (I-300)+(1.062)+(3.015), (I-300)+(1.062)+(3.016), (I-300)+(1.062)+(3.017), (I-300)+(1.062)+(3.018), (I-300)+(1.062)+(3.019), (I-300)+(1.062)+(3.020), (I-300)+(1.062)+(3.021), (I-300)+(1.062)+(3.022), (I-300)+(1.062)+(3.023), (I-300)+(1.062)+(3.024), (I-300)+(1.062)+(3.025), (I-300)+(1.062)+(3.026), (I-300)+(1.062)+(3.027), (I-300)+(1.062)+(3.028), (I-300)+(1.062)+(3.029), (I-300)+(1.062)+(3.030), (I-300)+(1.062)+(3.031), (I-300)+(1.062)+(5.001), (I-300)+(1.062)+(5.002), (I-300)+(1.062)+(5.003), (I-300)+(1.062)+(5.004), (I-300)+(1.062)+(5.005), (I-300)+(1.062)+(5.006), (I-300)+(1.062)+(5.007), (I-300)+(1.062)+(5.008), (I-300)+(1.062)+(5.009), (I-300)+(1.062)+(5.010), (I-300)+(1.062)+(5.011), (I-300)+(1.062)+(5.012), (I-300)+(1.062)+(5.013), (I-300)+(1.062)+(5.014), (I-300)+(1.062)+(5.015), (I-300)+(1.062)+(5.016), (I-300)+(1.062)+(5.017), (I-300)+(1.062)+(5.018), (I-300)+(1.062)+(5.019), (I-300)+(1.062)+(5.020), (I-300)+(1.062)+(5.021), (I-300)+(1.062)+(5.022), (I-300)+(1.062)+(5.023), (I-300)+(1.062)+(6.001), (I-300)+(1.062)+(6.002), (I-300)+(1.062)+(6.003), (I-300)+(1.062)+(6.004), (I-300)+(1.062)+(7.001), (I-300)+(1.062)+(7.002), (I-300)+(1.062)+(7.003), (I-300)+(1.062)+(7.004), (I-300)+(1.062)+(7.005), (I-300)+(1.062)+(7.006), (I-300)+(1.062)+(9.001), (I-300)+(1.062)+(9.002), (I-300)+(1.062)+(9.003), (I-300)+(1.062)+(9.004), (I-300)+(1.062)+(9.005), (I-300)+(1.062)+(9.006), (I-300)+(1.062)+(9.007), (I-300)+(1.062)+(9.008), (I-300)+(1.062)+(9.009), (I-300)+(1.062)+(14.001), (I-300)+(1.062)+(14.002), (I-300)+(1.062)+(15.008), (I-300)+(1.062)+(15.011), (I-300)+(1.062)+(15.012), (I-300)+(1.062)+(15.016), (I-300)+(1.062)+(15.025), (I-300)+(1.062)+(15.027), (I-300)+(1.062)+(15.047), (I-300)+(1.062)+(15.063), (I-300)+(1.062)+(15.064), (I-300)+(1.062)+(16.001), (I-300)+(1.062)+(16.002), (I-300)+(1.062)+(16.003), (I-300)+(1.062)+(16.004), (I-300)+(1.062)+(16.005), (I-300)+(1.062)+(16.006), (I-300)+(1.062)+(16.007), (I-300)+(1.062)+(16.008), (I-300)+(1.062)+(17.001), (I-300)+(1.062)+(17.002), (I-300)+(1.062)+(17.003), (I-300)+(1.062)+(17.004), (I-300)+(1.062)+(17.005), (I-300)+(1.062)+(17.006), (I-300)+(1.062)+(17.007), (I-300)+(1.062)+(17.008), (I-300)+(1.062)+(17.009), (I-300)+(1.062)+(17.010), (I-300)+(1.062)+(17.011), (I-300)+(1.062)+(17.012), (I-300)+(1.062)+(18.001), (I-300)+(1.063)+(1.064), (I-300)+(1.063)+(1.065), (I-300)+(1.063)+(1.066), (I-300)+(1.063)+(1.067), (I-300)+(1.063)+(1.068), (I-300)+(1.063)+(1.069), (I-300)+(1.063)+(1.070), (I-300)+(1.063)+(1.071), (I-300)+(1.063)+(1.072), (I-300)+(1.063)+(1.073), (I-300)+(1.063)+(1.074), (I-300)+(1.063)+(1.075), (I-300)+(1.063)+(1.076), (I-300)+(1.063)+(1.077), (I-300)+(1.063)+(1.078), (I-300)+(1.063)+(1.079), (I-300)+(1.063)+(1.080), (I-300)+(1.063)+(1.081), (I-300)+(1.063)+(1.082), (I-300)+(1.063)+(1.083), (I-300)+(1.063)+(1.084), (I-300)+(1.063)+(1.085), (I-300)+(1.063)+(1.086), (I-300)+(1.063)+(1.087), (I-300)+(1.063)+(1.088), (I-300)+(1.063)+(1.089), (I-300)+(1.063)+(1.090), (I-300)+(1.063)+(1.091), (I-300)+(1.063)+(1.092), (I-300)+(1.063)+(2.001), (I-300)+(1.063)+(2.002), (I-300)+(1.063)+(2.003), (I-300)+(1.063)+(2.004), (I-300)+(1.063)+(2.005), (I-300)+(1.063)+(2.006), (I-300)+(1.063)+(2.007), (I-300)+(1.063)+(2.008), (I-300)+(1.063)+(2.009), (I-300)+(1.063)+(2.010), (I-300)+(1.063)+(2.011), (I-300)+(1.063)+(2.012), (I-300)+(1.063)+(2.013), (I-300)+(1.063)+(2.014), (I-300)+(1.063)+(2.015), (I-300)+(1.063)+(2.016), (I-300)+(1.063)+(2.017), (I-300)+(1.063)+(2.018), (I-300)+(1.063)+(2.019), (I-300)+(1.063)+(2.020), (I-300)+(1.063)+(2.021), (I-300)+(1.063)+(2.022), (I-300)+(1.063)+(2.023), (I-300)+(1.063)+(2.024), (I-300)+(1.063)+(2.025), (I-300)+(1.063)+(2.026), (I-300)+(1.063)+(2.027), (I-300)+(1.063)+(2.028), (I-300)+(1.063)+(2.029), (I-300)+(1.063)+(2.030), (I-300)+(1.063)+(2.031), (I-300)+(1.063)+(2.032), (I-300)+(1.063)+(2.033), (I-300)+(1.063)+(2.034), (I-300)+(1.063)+(2.035), (I-300)+(1.063)+(2.036), (I-300)+(1.063)+(2.037), (I-300)+(1.063)+(2.038), (I-300)+(1.063)+(2.039), (I-300)+(1.063)+(2.040), (I-300)+(1.063)+(2.041), (I-300)+(1.063)+(2.042), (I-300)+(1.063)+(2.043), (I-300)+(1.063)+(2.044), (I-300)+(1.063)+(2.045), (I-300)+(1.063)+(2.046), (I-300)+(1.063)+(2.047), (I-300)+(1.063)+(2.048), (I-300)+(1.063)+(2.049), (I-300)+(1.063)+(2.050), (I-300)+(1.063)+(2.051), (I-300)+(1.063)+(2.052), (I-300)+(1.063)+(2.053), (I-300)+(1.063)+(2.054), (I-300)+(1.063)+(2.055), (I-300)+(1.063)+(2.056), (I-300)+(1.063)+(2.057), (I-300)+(1.063)+(2.058), (I-300)+(1.063)+(2.059), (I-300)+(1.063)+(3.001), (I-300)+(1.063)+(3.002), (I-300)+(1.063)+(3.003), (I-300)+(1.063)+(3.004), (I-300)+(1.063)+(3.005), (I-300)+(1.063)+(3.006), (I-300)+(1.063)+(3.007), (I-300)+(1.063)+(3.008), (I-300)+(1.063)+(3.009), (I-300)+(1.063)+(3.010), (I-300)+(1.063)+(3.011), (I-300)+(1.063)+(3.012), (I-300)+(1.063)+(3.013), (I-300)+(1.063)+(3.014), (I-300)+(1.063)+(3.015), (I-300)+(1.063)+(3.016), (I-300)+(1.063)+(3.017), (I-300)+(1.063)+(3.018), (I-300)+(1.063)+(3.019), (I-300)+(1.063)+(3.020), (I-300)+(1.063)+(3.021), (I-300)+(1.063)+(3.022), (I-300)+(1.063)+(3.023), (I-300)+(1.063)+(3.024), (I-300)+(1.063)+(3.025), (I-300)+(1.063)+(3.026), (I-300)+(1.063)+(3.027), (I-300)+(1.063)+(3.028), (I-300)+(1.063)+(3.029), (I-300)+(1.063)+(3.030), (I-300)+(1.063)+(3.031), (I-300)+(1.063)+(5.001), (I-300)+(1.063)+(5.002), (I-300)+(1.063)+(5.003), (I-300)+(1.063)+(5.004), (I-300)+(1.063)+(5.005), (I-300)+(1.063)+(5.006), (I-300)+(1.063)+(5.007), (I-300)+(1.063)+(5.008), (I-300)+(1.063)+(5.009), (I-300)+(1.063)+(5.010), (I-300)+(1.063)+(5.011), (I-300)+(1.063)+(5.012), (I-300)+(1.063)+(5.013), (I-300)+(1.063)+(5.014), (I-300)+(1.063)+(5.015), (I-300)+(1.063)+(5.016), (I-300)+(1.063)+(5.017), (I-300)+(1.063)+(5.018), (I-300)+(1.063)+(5.019), (I-300)+(1.063)+(5.020), (I-300)+(1.063)+(5.021), (I-300)+(1.063)+(5.022), (I-300)+(1.063)+(5.023), (I-300)+(1.063)+(6.001), (I-300)+(1.063)+(6.002), (I-300)+(1.063)+(6.003), (I-300)+(1.063)+(6.004), (I-300)+(1.063)+(7.001), (I-300)+(1.063)+(7.002), (I-300)+(1.063)+(7.003), (I-300)+(1.063)+(7.004), (I-300)+(1.063)+(7.005), (I-300)+(1.063)+(7.006), (I-300)+(1.063)+(9.001), (I-300)+(1.063)+(9.002), (I-300)+(1.063)+(9.003), (I-300)+(1.063)+(9.004), (I-300)+(1.063)+(9.005), (I-300)+(1.063)+(9.006), (I-300)+(1.063)+(9.007), (I-300)+(1.063)+(9.008), (I-300)+(1.063)+(9.009), (I-300)+(1.063)+(14.001), (I-300)+(1.063)+(14.002), (I-300)+(1.063)+(15.008), (I-300)+(1.063)+(15.011), (I-300)+(1.063)+(15.012), (I-300)+(1.063)+(15.016), (I-300)+(1.063)+(15.025), (I-300)+(1.063)+(15.027), (I-300)+(1.063)+(15.047), (I-300)+(1.063)+(15.063), (I-300)+(1.063)+(15.064), (I-300)+(1.063)+(16.001), (I-300)+(1.063)+(16.002), (I-300)+(1.063)+(16.003), (I-300)+(1.063)+(16.004), (I-300)+(1.063)+(16.005), (I-300)+(1.063)+(16.006), (I-300)+(1.063)+(16.007), (I-300)+(1.063)+(16.008), (I-300)+(1.063)+(17.001), (I-300)+(1.063)+(17.002), (I-300)+(1.063)+(17.003), (I-300)+(1.063)+(17.004), (I-300)+(1.063)+(17.005), (I-300)+(1.063)+(17.006), (I-300)+(1.063)+(17.007), (I-300)+(1.063)+(17.008), (I-300)+(1.063)+(17.009), (I-300)+(1.063)+(17.010), (I-300)+(1.063)+(17.011), (I-300)+(1.063)+(17.012), (I-300)+(1.063)+(18.001), (I-300)+(1.064)+(1.065), (I-300)+(1.064)+(1.066), (I-300)+(1.064)+(1.067), (I-300)+(1.064)+(1.068), (I-300)+(1.064)+(1.069), (I-300)+(1.064)+(1.070), (I-300)+(1.064)+(1.071), (I-300)+(1.064)+(1.072), (I-300)+(1.064)+(1.073), (I-300)+(1.064)+(1.074), (I-300)+(1.064)+(1.075), (I-300)+(1.064)+(1.076), (I-300)+(1.064)+(1.077), (I-300)+(1.064)+(1.078), (I-300)+(1.064)+(1.079), (I-300)+(1.064)+(1.080), (I-300)+(1.064)+(1.081), (I-300)+(1.064)+(1.082), (I-300)+(1.064)+(1.083), (I-300)+(1.064)+(1.084), (I-300)+(1.064)+(1.085), (I-300)+(1.064)+(1.086), (I-300)+(1.064)+(1.087), (I-300)+(1.064)+(1.088), (I-300)+(1.064)+(1.089), (I-300)+(1.064)+(1.090), (I-300)+(1.064)+(1.091), (I-300)+(1.064)+(1.092), (I-300)+(1.064)+(2.001), (I-300)+(1.064)+(2.002), (I-300)+(1.064)+(2.003), (I-300)+(1.064)+(2.004), (I-300)+(1.064)+(2.005), (I-300)+(1.064)+(2.006), (I-300)+(1.064)+(2.007), (I-300)+(1.064)+(2.008), (I-300)+(1.064)+(2.009), (I-300)+(1.064)+(2.010), (I-300)+(1.064)+(2.011), (I-300)+(1.064)+(2.012), (I-300)+(1.064)+(2.013), (I-300)+(1.064)+(2.014), (I-300)+(1.064)+(2.015), (I-300)+(1.064)+(2.016), (I-300)+(1.064)+(2.017), (I-300)+(1.064)+(2.018), (I-300)+(1.064)+(2.019), (I-300)+(1.064)+(2.020), (I-300)+(1.064)+(2.021), (I-300)+(1.064)+(2.022), (I-300)+(1.064)+(2.023), (I-300)+(1.064)+(2.024), (I-300)+(1.064)+(2.025), (I-300)+(1.064)+(2.026), (I-300)+(1.064)+(2.027), (I-300)+(1.064)+(2.028), (I-300)+(1.064)+(2.029), (I-300)+(1.064)+(2.030), (I-300)+(1.064)+(2.031), (I-300)+(1.064)+(2.032), (I-300)+(1.064)+(2.033), (I-300)+(1.064)+(2.034), (I-300)+(1.064)+(2.035), (I-300)+(1.064)+(2.036), (I-300)+(1.064)+(2.037), (I-300)+(1.064)+(2.038), (I-300)+(1.064)+(2.039), (I-300)+(1.064)+(2.040), (I-300)+(1.064)+(2.041), (I-300)+(1.064)+(2.042), (I-300)+(1.064)+(2.043), (I-300)+(1.064)+(2.044), (I-300)+(1.064)+(2.045), (I-300)+(1.064)+(2.046), (I-300)+(1.064)+(2.047), (I-300)+(1.064)+(2.048), (I-300)+(1.064)+(2.049), (I-300)+(1.064)+(2.050), (I-300)+(1.064)+(2.051), (I-300)+(1.064)+(2.052), (I-300)+(1.064)+(2.053), (I-300)+(1.064)+(2.054), (I-300)+(1.064)+(2.055), (I-300)+(1.064)+(2.056), (I-300)+(1.064)+(2.057), (I-300)+(1.064)+(2.058), (I-300)+(1.064)+(2.059), (I-300)+(1.064)+(3.001), (I-300)+(1.064)+(3.002), (I-300)+(1.064)+(3.003), (I-300)+(1.064)+(3.004), (I-300)+(1.064)+(3.005), (I-300)+(1.064)+(3.006), (I-300)+(1.064)+(3.007), (I-300)+(1.064)+(3.008), (I-300)+(1.064)+(3.009), (I-300)+(1.064)+(3.010), (I-300)+(1.064)+(3.011), (I-300)+(1.064)+(3.012), (I-300)+(1.064)+(3.013), (I-300)+(1.064)+(3.014), (I-300)+(1.064)+(3.015), (I-300)+(1.064)+(3.016), (I-300)+(1.064)+(3.017), (I-300)+(1.064)+(3.018), (I-300)+(1.064)+(3.019), (I-300)+(1.064)+(3.020), (I-300)+(1.064)+(3.021), (I-300)+(1.064)+(3.022), (I-300)+(1.064)+(3.023), (I-300)+(1.064)+(3.024), (I-300)+(1.064)+(3.025), (I-300)+(1.064)+(3.026), (I-300)+(1.064)+(3.027), (I-300)+(1.064)+(3.028), (I-300)+(1.064)+(3.029), (I-300)+(1.064)+(3.030), (I-300)+(1.064)+(3.031), (I-300)+(1.064)+(5.001), (I-300)+(1.064)+(5.002), (I-300)+(1.064)+(5.003), (I-300)+(1.064)+(5.004), (I-300)+(1.064)+(5.005), (I-300)+(1.064)+(5.006), (I-300)+(1.064)+(5.007), (I-300)+(1.064)+(5.008), (I-300)+(1.064)+(5.009), (I-300)+(1.064)+(5.010), (I-300)+(1.064)+(5.011), (I-300)+(1.064)+(5.012), (I-300)+(1.064)+(5.013), (I-300)+(1.064)+(5.014), (I-300)+(1.064)+(5.015), (I-300)+(1.064)+(5.016), (I-300)+(1.064)+(5.017), (I-300)+(1.064)+(5.018), (I-300)+(1.064)+(5.019), (I-300)+(1.064)+(5.020), (I-300)+(1.064)+(5.021), (I-300)+(1.064)+(5.022), (I-300)+(1.064)+(5.023), (I-300)+(1.064)+(6.001), (I-300)+(1.064)+(6.002), (I-300)+(1.064)+(6.003), (I-300)+(1.064)+(6.004), (I-300)+(1.064)+(7.001), (I-300)+(1.064)+(7.002), (I-300)+(1.064)+(7.003), (I-300)+(1.064)+(7.004), (I-300)+(1.064)+(7.005), (I-300)+(1.064)+(7.006), (I-300)+(1.064)+(9.001), (I-300)+(1.064)+(9.002), (I-300)+(1.064)+(9.003), (I-300)+(1.064)+(9.004), (I-300)+(1.064)+(9.005), (I-300)+(1.064)+(9.006), (I-300)+(1.064)+(9.007), (I-300)+(1.064)+(9.008), (I-300)+(1.064)+(9.009), (I-300)+(1.064)+(14.001), (I-300)+(1.064)+(14.002), (I-300)+(1.064)+(15.008), (I-300)+(1.064)+(15.011), (I-300)+(1.064)+(15.012), (I-300)+(1.064)+(15.016), (I-300)+(1.064)+(15.025), (I-300)+(1.064)+(15.027), (I-300)+(1.064)+(15.047), (I-300)+(1.064)+(15.063), (I-300)+(1.064)+(15.064), (I-300)+(1.064)+(16.001), (I-300)+(1.064)+(16.002), (I-300)+(1.064)+(16.003), (I-300)+(1.064)+(16.004), (I-300)+(1.064)+(16.005), (I-300)+(1.064)+(16.006), (I-300)+(1.064)+(16.007), (I-300)+(1.064)+(16.008), (I-300)+(1.064)+(17.001), (I-300)+(1.064)+(17.002), (I-300)+(1.064)+(17.003), (I-300)+(1.064)+(17.004), (I-300)+(1.064)+(17.005), (I-300)+(1.064)+(17.006), (I-300)+(1.064)+(17.007), (I-300)+(1.064)+(17.008), (I-300)+(1.064)+(17.009), (I-300)+(1.064)+(17.010), (I-300)+(1.064)+(17.011), (I-300)+(1.064)+(17.012), (I-300)+(1.064)+(18.001), (I-300)+(1.065)+(1.066), (I-300)+(1.065)+(1.067), (I-300)+(1.065)+(1.068), (I-300)+(1.065)+(1.069), (I-300)+(1.065)+(1.070), (I-300)+(1.065)+(1.071), (I-300)+(1.065)+(1.072), (I-300)+(1.065)+(1.073), (I-300)+(1.065)+(1.074), (I-300)+(1.065)+(1.075), (I-300)+(1.065)+(1.076), (I-300)+(1.065)+(1.077), (I-300)+(1.065)+(1.078), (I-300)+(1.065)+(1.079), (I-300)+(1.065)+(1.080), (I-300)+(1.065)+(1.081), (I-300)+(1.065)+(1.082), (I-300)+(1.065)+(1.083), (I-300)+(1.065)+(1.084), (I-300)+(1.065)+(1.085), (I-300)+(1.065)+(1.086), (I-300)+(1.065)+(1.087), (I-300)+(1.065)+(1.088), (I-300)+(1.065)+(1.089), (I-300)+(1.065)+(1.090), (I-300)+(1.065)+(1.091), (I-300)+(1.065)+(1.092), (I-300)+(1.065)+(2.001), (I-300)+(1.065)+(2.002), (I-300)+(1.065)+(2.003), (I-300)+(1.065)+(2.004), (I-300)+(1.065)+(2.005), (I-300)+(1.065)+(2.006), (I-300)+(1.065)+(2.007), (I-300)+(1.065)+(2.008), (I-300)+(1.065)+(2.009), (I-300)+(1.065)+(2.010), (I-300)+(1.065)+(2.011), (I-300)+(1.065)+(2.012), (I-300)+(1.065)+(2.013), (I-300)+(1.065)+(2.014), (I-300)+(1.065)+(2.015), (I-300)+(1.065)+(2.016), (I-300)+(1.065)+(2.017), (I-300)+(1.065)+(2.018), (I-300)+(1.065)+(2.019), (I-300)+(1.065)+(2.020), (I-300)+(1.065)+(2.021), (I-300)+(1.065)+(2.022), (I-300)+(1.065)+(2.023), (I-300)+(1.065)+(2.024), (I-300)+(1.065)+(2.025), (I-300)+(1.065)+(2.026), (I-300)+(1.065)+(2.027), (I-300)+(1.065)+(2.028), (I-300)+(1.065)+(2.029), (I-300)+(1.065)+(2.030), (I-300)+(1.065)+(2.031), (I-300)+(1.065)+(2.032), (I-300)+(1.065)+(2.033), (I-300)+(1.065)+(2.034), (I-300)+(1.065)+(2.035), (I-300)+(1.065)+(2.036), (I-300)+(1.065)+(2.037), (I-300)+(1.065)+(2.038), (I-300)+(1.065)+(2.039), (I-300)+(1.065)+(2.040), (I-300)+(1.065)+(2.041), (I-300)+(1.065)+(2.042), (I-300)+(1.065)+(2.043), (I-300)+(1.065)+(2.044), (I-300)+(1.065)+(2.045), (I-300)+(1.065)+(2.046), (I-300)+(1.065)+(2.047), (I-300)+(1.065)+(2.048), (I-300)+(1.065)+(2.049), (I-300)+(1.065)+(2.050), (I-300)+(1.065)+(2.051), (I-300)+(1.065)+(2.052), (I-300)+(1.065)+(2.053), (I-300)+(1.065)+(2.054), (I-300)+(1.065)+(2.055), (I-300)+(1.065)+(2.056), (I-300)+(1.065)+(2.057), (I-300)+(1.065)+(2.058), (I-300)+(1.065)+(2.059), (I-300)+(1.065)+(3.001), (I-300)+(1.065)+(3.002), (I-300)+(1.065)+(3.003), (I-300)+(1.065)+(3.004), (I-300)+(1.065)+(3.005), (I-300)+(1.065)+(3.006), (I-300)+(1.065)+(3.007), (I-300)+(1.065)+(3.008), (I-300)+(1.065)+(3.009), (I-300)+(1.065)+(3.010), (I-300)+(1.065)+(3.011), (I-300)+(1.065)+(3.012), (I-300)+(1.065)+(3.013), (I-300)+(1.065)+(3.014), (I-300)+(1.065)+(3.015), (I-300)+(1.065)+(3.016), (I-300)+(1.065)+(3.017), (I-300)+(1.065)+(3.018), (I-300)+(1.065)+(3.019), (I-300)+(1.065)+(3.020), (I-300)+(1.065)+(3.021), (I-300)+(1.065)+(3.022), (I-300)+(1.065)+(3.023), (I-300)+(1.065)+(3.024), (I-300)+(1.065)+(3.025), (I-300)+(1.065)+(3.026), (I-300)+(1.065)+(3.027), (I-300)+(1.065)+(3.028), (I-300)+(1.065)+(3.029), (I-300)+(1.065)+(3.030), (I-300)+(1.065)+(3.031), (I-300)+(1.065)+(5.001), (I-300)+(1.065)+(5.002), (I-300)+(1.065)+(5.003), (I-300)+(1.065)+(5.004), (I-300)+(1.065)+(5.005), (I-300)+(1.065)+(5.006), (I-300)+(1.065)+(5.007), (I-300)+(1.065)+(5.008), (I-300)+(1.065)+(5.009), (I-300)+(1.065)+(5.010), (I-300)+(1.065)+(5.011), (I-300)+(1.065)+(5.012), (I-300)+(1.065)+(5.013), (I-300)+(1.065)+(5.014), (I-300)+(1.065)+(5.015), (I-300)+(1.065)+(5.016), (I-300)+(1.065)+(5.017), (I-300)+(1.065)+(5.018), (I-300)+(1.065)+(5.019), (I-300)+(1.065)+(5.020), (I-300)+(1.065)+(5.021), (I-300)+(1.065)+(5.022), (I-300)+(1.065)+(5.023), (I-300)+(1.065)+(6.001), (I-300)+(1.065)+(6.002), (I-300)+(1.065)+(6.003), (I-300)+(1.065)+(6.004), (I-300)+(1.065)+(7.001), (I-300)+(1.065)+(7.002), (I-300)+(1.065)+(7.003), (I-300)+(1.065)+(7.004), (I-300)+(1.065)+(7.005), (I-300)+(1.065)+(7.006), (I-300)+(1.065)+(9.001), (I-300)+(1.065)+(9.002), (I-300)+(1.065)+(9.003), (I-300)+(1.065)+(9.004), (I-300)+(1.065)+(9.005), (I-300)+(1.065)+(9.006), (I-300)+(1.065)+(9.007), (I-300)+(1.065)+(9.008), (I-300)+(1.065)+(9.009), (I-300)+(1.065)+(14.001), (I-300)+(1.065)+(14.002), (I-300)+(1.065)+(15.008), (I-300)+(1.065)+(15.011), (I-300)+(1.065)+(15.012), (I-300)+(1.065)+(15.016), (I-300)+(1.065)+(15.025), (I-300)+(1.065)+(15.027), (I-300)+(1.065)+(15.047), (I-300)+(1.065)+(15.063), (I-300)+(1.065)+(15.064), (I-300)+(1.065)+(16.001), (I-300)+(1.065)+(16.002), (I-300)+(1.065)+(16.003), (I-300)+(1.065)+(16.004), (I-300)+(1.065)+(16.005), (I-300)+(1.065)+(16.006), (I-300)+(1.065)+(16.007), (I-300)+(1.065)+(16.008), (I-300)+(1.065)+(17.001), (I-300)+(1.065)+(17.002), (I-300)+(1.065)+(17.003), (I-300)+(1.065)+(17.004), (I-300)+(1.065)+(17.005), (I-300)+(1.065)+(17.006), (I-300)+(1.065)+(17.007), (I-300)+(1.065)+(17.008), (I-300)+(1.065)+(17.009), (I-300)+(1.065)+(17.010), (I-300)+(1.065)+(17.011), (I-300)+(1.065)+(17.012), (I-300)+(1.065)+(18.001), (I-300)+(1.066)+(1.067), (I-300)+(1.066)+(1.068), (I-300)+(1.066)+(1.069), (I-300)+(1.066)+(1.070), (I-300)+(1.066)+(1.071), (I-300)+(1.066)+(1.072), (I-300)+(1.066)+(1.073), (I-300)+(1.066)+(1.074), (I-300)+(1.066)+(1.075), (I-300)+(1.066)+(1.076), (I-300)+(1.066)+(1.077), (I-300)+(1.066)+(1.078), (I-300)+(1.066)+(1.079), (I-300)+(1.066)+(1.080), (I-300)+(1.066)+(1.081), (I-300)+(1.066)+(1.082), (I-300)+(1.066)+(1.083), (I-300)+(1.066)+(1.084), (I-300)+(1.066)+(1.085), (I-300)+(1.066)+(1.086), (I-300)+(1.066)+(1.087), (I-300)+(1.066)+(1.088), (I-300)+(1.066)+(1.089), (I-300)+(1.066)+(1.090), (I-300)+(1.066)+(1.091), (I-300)+(1.066)+(1.092), (I-300)+(1.066)+(2.001), (I-300)+(1.066)+(2.002), (I-300)+(1.066)+(2.003), (I-300)+(1.066)+(2.004), (I-300)+(1.066)+(2.005), (I-300)+(1.066)+(2.006), (I-300)+(1.066)+(2.007), (I-300)+(1.066)+(2.008), (I-300)+(1.066)+(2.009), (I-300)+(1.066)+(2.010), (I-300)+(1.066)+(2.011), (I-300)+(1.066)+(2.012), (I-300)+(1.066)+(2.013), (I-300)+(1.066)+(2.014), (I-300)+(1.066)+(2.015), (I-300)+(1.066)+(2.016), (I-300)+(1.066)+(2.017), (I-300)+(1.066)+(2.018), (I-300)+(1.066)+(2.019), (I-300)+(1.066)+(2.020), (I-300)+(1.066)+(2.021), (I-300)+(1.066)+(2.022), (I-300)+(1.066)+(2.023), (I-300)+(1.066)+(2.024), (I-300)+(1.066)+(2.025), (I-300)+(1.066)+(2.026), (I-300)+(1.066)+(2.027), (I-300)+(1.066)+(2.028), (I-300)+(1.066)+(2.029), (I-300)+(1.066)+(2.030), (I-300)+(1.066)+(2.031), (I-300)+(1.066)+(2.032), (I-300)+(1.066)+(2.033), (I-300)+(1.066)+(2.034), (I-300)+(1.066)+(2.035), (I-300)+(1.066)+(2.036), (I-300)+(1.066)+(2.037), (I-300)+(1.066)+(2.038), (I-300)+(1.066)+(2.039), (I-300)+(1.066)+(2.040), (I-300)+(1.066)+(2.041), (I-300)+(1.066)+(2.042), (I-300)+(1.066)+(2.043), (I-300)+(1.066)+(2.044), (I-300)+(1.066)+(2.045), (I-300)+(1.066)+(2.046), (I-300)+(1.066)+(2.047), (I-300)+(1.066)+(2.048), (I-300)+(1.066)+(2.049), (I-300)+(1.066)+(2.050), (I-300)+(1.066)+(2.051), (I-300)+(1.066)+(2.052), (I-300)+(1.066)+(2.053), (I-300)+(1.066)+(2.054), (I-300)+(1.066)+(2.055), (I-300)+(1.066)+(2.056), (I-300)+(1.066)+(2.057), (I-300)+(1.066)+(2.058), (I-300)+(1.066)+(2.059), (I-300)+(1.066)+(3.001), (I-300)+(1.066)+(3.002), (I-300)+(1.066)+(3.003), (I-300)+(1.066)+(3.004), (I-300)+(1.066)+(3.005), (I-300)+(1.066)+(3.006), (I-300)+(1.066)+(3.007), (I-300)+(1.066)+(3.008), (I-300)+(1.066)+(3.009), (I-300)+(1.066)+(3.010), (I-300)+(1.066)+(3.011), (I-300)+(1.066)+(3.012), (I-300)+(1.066)+(3.013), (I-300)+(1.066)+(3.014), (I-300)+(1.066)+(3.015), (I-300)+(1.066)+(3.016), (I-300)+(1.066)+(3.017), (I-300)+(1.066)+(3.018), (I-300)+(1.066)+(3.019), (I-300)+(1.066)+(3.020), (I-300)+(1.066)+(3.021), (I-300)+(1.066)+(3.022), (I-300)+(1.066)+(3.023), (I-300)+(1.066)+(3.024), (I-300)+(1.066)+(3.025), (I-300)+(1.066)+(3.026), (I-300)+(1.066)+(3.027), (I-300)+(1.066)+(3.028), (I-300)+(1.066)+(3.029), (I-300)+(1.066)+(3.030), (I-300)+(1.066)+(3.031), (I-300)+(1.066)+(5.001), (I-300)+(1.066)+(5.002), (I-300)+(1.066)+(5.003), (I-300)+(1.066)+(5.004), (I-300)+(1.066)+(5.005), (I-300)+(1.066)+(5.006), (I-300)+(1.066)+(5.007), (I-300)+(1.066)+(5.008), (I-300)+(1.066)+(5.009), (I-300)+(1.066)+(5.010), (I-300)+(1.066)+(5.011), (I-300)+(1.066)+(5.012), (I-300)+(1.066)+(5.013), (I-300)+(1.066)+(5.014), (I-300)+(1.066)+(5.015), (I-300)+(1.066)+(5.016), (I-300)+(1.066)+(5.017), (I-300)+(1.066)+(5.018), (I-300)+(1.066)+(5.019), (I-300)+(1.066)+(5.020), (I-300)+(1.066)+(5.021), (I-300)+(1.066)+(5.022), (I-300)+(1.066)+(5.023), (I-300)+(1.066)+(6.001), (I-300)+(1.066)+(6.002), (I-300)+(1.066)+(6.003), (I-300)+(1.066)+(6.004), (I-300)+(1.066)+(7.001), (I-300)+(1.066)+(7.002), (I-300)+(1.066)+(7.003), (I-300)+(1.066)+(7.004), (I-300)+(1.066)+(7.005), (I-300)+(1.066)+(7.006), (I-300)+(1.066)+(9.001), (I-300)+(1.066)+(9.002), (I-300)+(1.066)+(9.003), (I-300)+(1.066)+(9.004), (I-300)+(1.066)+(9.005), (I-300)+(1.066)+(9.006), (I-300)+(1.066)+(9.007), (I-300)+(1.066)+(9.008), (I-300)+(1.066)+(9.009), (I-300)+(1.066)+(14.001), (I-300)+(1.066)+(14.002), (I-300)+(1.066)+(15.008), (I-300)+(1.066)+(15.011), (I-300)+(1.066)+(15.012), (I-300)+(1.066)+(15.016), (I-300)+(1.066)+(15.025), (I-300)+(1.066)+(15.027), (I-300)+(1.066)+(15.047), (I-300)+(1.066)+(15.063), (I-300)+(1.066)+(15.064), (I-300)+(1.066)+(16.001), (I-300)+(1.066)+(16.002), (I-300)+(1.066)+(16.003), (I-300)+(1.066)+(16.004), (I-300)+(1.066)+(16.005), (I-300)+(1.066)+(16.006), (I-300)+(1.066)+(16.007), (I-300)+(1.066)+(16.008), (I-300)+(1.066)+(17.001), (I-300)+(1.066)+(17.002), (I-300)+(1.066)+(17.003), (I-300)+(1.066)+(17.004), (I-300)+(1.066)+(17.005), (I-300)+(1.066)+(17.006), (I-300)+(1.066)+(17.007), (I-300)+(1.066)+(17.008), (I-300)+(1.066)+(17.009), (I-300)+(1.066)+(17.010), (I-300)+(1.066)+(17.011), (I-300)+(1.066)+(17.012), (I-300)+(1.066)+(18.001), (I-300)+(1.067)+(1.068), (I-300)+(1.067)+(1.069), (I-300)+(1.067)+(1.070), (I-300)+(1.067)+(1.071), (I-300)+(1.067)+(1.072), (I-300)+(1.067)+(1.073), (I-300)+(1.067)+(1.074), (I-300)+(1.067)+(1.075), (I-300)+(1.067)+(1.076), (I-300)+(1.067)+(1.077), (I-300)+(1.067)+(1.078), (I-300)+(1.067)+(1.079), (I-300)+(1.067)+(1.080), (I-300)+(1.067)+(1.081), (I-300)+(1.067)+(1.082), (I-300)+(1.067)+(1.083), (I-300)+(1.067)+(1.084), (I-300)+(1.067)+(1.085), (I-300)+(1.067)+(1.086), (I-300)+(1.067)+(1.087), (I-300)+(1.067)+(1.088), (I-300)+(1.067)+(1.089), (I-300)+(1.067)+(1.090), (I-300)+(1.067)+(1.091), (I-300)+(1.067)+(1.092), (I-300)+(1.067)+(2.001), (I-300)+(1.067)+(2.002), (I-300)+(1.067)+(2.003), (I-300)+(1.067)+(2.004), (I-300)+(1.067)+(2.005), (I-300)+(1.067)+(2.006), (I-300)+(1.067)+(2.007), (I-300)+(1.067)+(2.008), (I-300)+(1.067)+(2.009), (I-300)+(1.067)+(2.010), (I-300)+(1.067)+(2.011), (I-300)+(1.067)+(2.012), (I-300)+(1.067)+(2.013), (I-300)+(1.067)+(2.014), (I-300)+(1.067)+(2.015), (I-300)+(1.067)+(2.016), (I-300)+(1.067)+(2.017), (I-300)+(1.067)+(2.018), (I-300)+(1.067)+(2.019), (I-300)+(1.067)+(2.020), (I-300)+(1.067)+(2.021), (I-300)+(1.067)+(2.022), (I-300)+(1.067)+(2.023), (I-300)+(1.067)+(2.024), (I-300)+(1.067)+(2.025), (I-300)+(1.067)+(2.026), (I-300)+(1.067)+(2.027), (I-300)+(1.067)+(2.028), (I-300)+(1.067)+(2.029), (I-300)+(1.067)+(2.030), (I-300)+(1.067)+(2.031), (I-300)+(1.067)+(2.032), (I-300)+(1.067)+(2.033), (I-300)+(1.067)+(2.034), (I-300)+(1.067)+(2.035), (I-300)+(1.067)+(2.036), (I-300)+(1.067)+(2.037), (I-300)+(1.067)+(2.038), (I-300)+(1.067)+(2.039), (I-300)+(1.067)+(2.040), (I-300)+(1.067)+(2.041), (I-300)+(1.067)+(2.042), (I-300)+(1.067)+(2.043), (I-300)+(1.067)+(2.044), (I-300)+(1.067)+(2.045), (I-300)+(1.067)+(2.046), (I-300)+(1.067)+(2.047), (I-300)+(1.067)+(2.048), (I-300)+(1.067)+(2.049), (I-300)+(1.067)+(2.050), (I-300)+(1.067)+(2.051), (I-300)+(1.067)+(2.052), (I-300)+(1.067)+(2.053), (I-300)+(1.067)+(2.054), (I-300)+(1.067)+(2.055), (I-300)+(1.067)+(2.056), (I-300)+(1.067)+(2.057), (I-300)+(1.067)+(2.058), (I-300)+(1.067)+(2.059), (I-300)+(1.067)+(3.001), (I-300)+(1.067)+(3.002), (I-300)+(1.067)+(3.003), (I-300)+(1.067)+(3.004), (I-300)+(1.067)+(3.005), (I-300)+(1.067)+(3.006), (I-300)+(1.067)+(3.007), (I-300)+(1.067)+(3.008), (I-300)+(1.067)+(3.009), (I-300)+(1.067)+(3.010), (I-300)+(1.067)+(3.011), (I-300)+(1.067)+(3.012), (I-300)+(1.067)+(3.013), (I-300)+(1.067)+(3.014), (I-300)+(1.067)+(3.015), (I-300)+(1.067)+(3.016), (I-300)+(1.067)+(3.017), (I-300)+(1.067)+(3.018), (I-300)+(1.067)+(3.019), (I-300)+(1.067)+(3.020), (I-300)+(1.067)+(3.021), (I-300)+(1.067)+(3.022), (I-300)+(1.067)+(3.023), (I-300)+(1.067)+(3.024), (I-300)+(1.067)+(3.025), (I-300)+(1.067)+(3.026), (I-300)+(1.067)+(3.027), (I-300)+(1.067)+(3.028), (I-300)+(1.067)+(3.029), (I-300)+(1.067)+(3.030), (I-300)+(1.067)+(3.031), (I-300)+(1.067)+(5.001), (I-300)+(1.067)+(5.002), (I-300)+(1.067)+(5.003), (I-300)+(1.067)+(5.004), (I-300)+(1.067)+(5.005), (I-300)+(1.067)+(5.006), (I-300)+(1.067)+(5.007), (I-300)+(1.067)+(5.008), (I-300)+(1.067)+(5.009), (I-300)+(1.067)+(5.010), (I-300)+(1.067)+(5.011), (I-300)+(1.067)+(5.012), (I-300)+(1.067)+(5.013), (I-300)+(1.067)+(5.014), (I-300)+(1.067)+(5.015), (I-300)+(1.067)+(5.016), (I-300)+(1.067)+(5.017), (I-300)+(1.067)+(5.018), (I-300)+(1.067)+(5.019), (I-300)+(1.067)+(5.020), (I-300)+(1.067)+(5.021), (I-300)+(1.067)+(5.022), (I-300)+(1.067)+(5.023), (I-300)+(1.067)+(6.001), (I-300)+(1.067)+(6.002), (I-300)+(1.067)+(6.003), (I-300)+(1.067)+(6.004), (I-300)+(1.067)+(7.001), (I-300)+(1.067)+(7.002), (I-300)+(1.067)+(7.003), (I-300)+(1.067)+(7.004), (I-300)+(1.067)+(7.005), (I-300)+(1.067)+(7.006), (I-300)+(1.067)+(9.001), (I-300)+(1.067)+(9.002), (I-300)+(1.067)+(9.003), (I-300)+(1.067)+(9.004), (I-300)+(1.067)+(9.005), (I-300)+(1.067)+(9.006), (I-300)+(1.067)+(9.007), (I-300)+(1.067)+(9.008), (I-300)+(1.067)+(9.009), (I-300)+(1.067)+(14.001), (I-300)+(1.067)+(14.002), (I-300)+(1.067)+(15.008), (I-300)+(1.067)+(15.011), (I-300)+(1.067)+(15.012), (I-300)+(1.067)+(15.016), (I-300)+(1.067)+(15.025), (I-300)+(1.067)+(15.027), (I-300)+(1.067)+(15.047), (I-300)+(1.067)+(15.063), (I-300)+(1.067)+(15.064), (I-300)+(1.067)+(16.001), (I-300)+(1.067)+(16.002), (I-300)+(1.067)+(16.003), (I-300)+(1.067)+(16.004), (I-300)+(1.067)+(16.005), (I-300)+(1.067)+(16.006), (I-300)+(1.067)+(16.007), (I-300)+(1.067)+(16.008), (I-300)+(1.067)+(17.001), (I-300)+(1.067)+(17.002), (I-300)+(1.067)+(17.003), (I-300)+(1.067)+(17.004), (I-300)+(1.067)+(17.005), (I-300)+(1.067)+(17.006), (I-300)+(1.067)+(17.007), (I-300)+(1.067)+(17.008), (I-300)+(1.067)+(17.009), (I-300)+(1.067)+(17.010), (I-300)+(1.067)+(17.011), (I-300)+(1.067)+(17.012), (I-300)+(1.067)+(18.001), (I-300)+(1.068)+(1.069), (I-300)+(1.068)+(1.070), (I-300)+(1.068)+(1.071), (I-300)+(1.068)+(1.072), (I-300)+(1.068)+(1.073), (I-300)+(1.068)+(1.074), (I-300)+(1.068)+(1.075), (I-300)+(1.068)+(1.076), (I-300)+(1.068)+(1.077), (I-300)+(1.068)+(1.078), (I-300)+(1.068)+(1.079), (I-300)+(1.068)+(1.080), (I-300)+(1.068)+(1.081), (I-300)+(1.068)+(1.082), (I-300)+(1.068)+(1.083), (I-300)+(1.068)+(1.084), (I-300)+(1.068)+(1.085), (I-300)+(1.068)+(1.086), (I-300)+(1.068)+(1.087), (I-300)+(1.068)+(1.088), (I-300)+(1.068)+(1.089), (I-300)+(1.068)+(1.090), (I-300)+(1.068)+(1.091), (I-300)+(1.068)+(1.092), (I-300)+(1.068)+(2.001), (I-300)+(1.068)+(2.002), (I-300)+(1.068)+(2.003), (I-300)+(1.068)+(2.004), (I-300)+(1.068)+(2.005), (I-300)+(1.068)+(2.006), (I-300)+(1.068)+(2.007), (I-300)+(1.068)+(2.008), (I-300)+(1.068)+(2.009), (I-300)+(1.068)+(2.010), (I-300)+(1.068)+(2.011), (I-300)+(1.068)+(2.012), (I-300)+(1.068)+(2.013), (I-300)+(1.068)+(2.014), (I-300)+(1.068)+(2.015), (I-300)+(1.068)+(2.016), (I-300)+(1.068)+(2.017), (I-300)+(1.068)+(2.018), (I-300)+(1.068)+(2.019), (I-300)+(1.068)+(2.020), (I-300)+(1.068)+(2.021), (I-300)+(1.068)+(2.022), (I-300)+(1.068)+(2.023), (I-300)+(1.068)+(2.024), (I-300)+(1.068)+(2.025), (I-300)+(1.068)+(2.026), (I-300)+(1.068)+(2.027), (I-300)+(1.068)+(2.028), (I-300)+(1.068)+(2.029), (I-300)+(1.068)+(2.030), (I-300)+(1.068)+(2.031), (I-300)+(1.068)+(2.032), (I-300)+(1.068)+(2.033), (I-300)+(1.068)+(2.034), (I-300)+(1.068)+(2.035), (I-300)+(1.068)+(2.036), (I-300)+(1.068)+(2.037), (I-300)+(1.068)+(2.038), (I-300)+(1.068)+(2.039), (I-300)+(1.068)+(2.040), (I-300)+(1.068)+(2.041), (I-300)+(1.068)+(2.042), (I-300)+(1.068)+(2.043), (I-300)+(1.068)+(2.044), (I-300)+(1.068)+(2.045), (I-300)+(1.068)+(2.046), (I-300)+(1.068)+(2.047), (I-300)+(1.068)+(2.048), (I-300)+(1.068)+(2.049), (I-300)+(1.068)+(2.050), (I-300)+(1.068)+(2.051), (I-300)+(1.068)+(2.052), (I-300)+(1.068)+(2.053), (I-300)+(1.068)+(2.054), (I-300)+(1.068)+(2.055), (I-300)+(1.068)+(2.056), (I-300)+(1.068)+(2.057), (I-300)+(1.068)+(2.058), (I-300)+(1.068)+(2.059), (I-300)+(1.068)+(3.001), (I-300)+(1.068)+(3.002), (I-300)+(1.068)+(3.003), (I-300)+(1.068)+(3.004), (I-300)+(1.068)+(3.005), (I-300)+(1.068)+(3.006), (I-300)+(1.068)+(3.007), (I-300)+(1.068)+(3.008), (I-300)+(1.068)+(3.009), (I-300)+(1.068)+(3.010), (I-300)+(1.068)+(3.011), (I-300)+(1.068)+(3.012), (I-300)+(1.068)+(3.013), (I-300)+(1.068)+(3.014), (I-300)+(1.068)+(3.015), (I-300)+(1.068)+(3.016), (I-300)+(1.068)+(3.017), (I-300)+(1.068)+(3.018), (I-300)+(1.068)+(3.019), (I-300)+(1.068)+(3.020), (I-300)+(1.068)+(3.021), (I-300)+(1.068)+(3.022), (I-300)+(1.068)+(3.023), (I-300)+(1.068)+(3.024), (I-300)+(1.068)+(3.025), (I-300)+(1.068)+(3.026), (I-300)+(1.068)+(3.027), (I-300)+(1.068)+(3.028), (I-300)+(1.068)+(3.029), (I-300)+(1.068)+(3.030), (I-300)+(1.068)+(3.031), (I-300)+(1.068)+(5.001), (I-300)+(1.068)+(5.002), (I-300)+(1.068)+(5.003), (I-300)+(1.068)+(5.004), (I-300)+(1.068)+(5.005), (I-300)+(1.068)+(5.006), (I-300)+(1.068)+(5.007), (I-300)+(1.068)+(5.008), (I-300)+(1.068)+(5.009), (I-300)+(1.068)+(5.010), (I-300)+(1.068)+(5.011), (I-300)+(1.068)+(5.012), (I-300)+(1.068)+(5.013), (I-300)+(1.068)+(5.014), (I-300)+(1.068)+(5.015), (I-300)+(1.068)+(5.016), (I-300)+(1.068)+(5.017), (I-300)+(1.068)+(5.018), (I-300)+(1.068)+(5.019), (I-300)+(1.068)+(5.020), (I-300)+(1.068)+(5.021), (I-300)+(1.068)+(5.022), (I-300)+(1.068)+(5.023), (I-300)+(1.068)+(6.001), (I-300)+(1.068)+(6.002), (I-300)+(1.068)+(6.003), (I-300)+(1.068)+(6.004), (I-300)+(1.068)+(7.001), (I-300)+(1.068)+(7.002), (I-300)+(1.068)+(7.003), (I-300)+(1.068)+(7.004), (I-300)+(1.068)+(7.005), (I-300)+(1.068)+(7.006), (I-300)+(1.068)+(9.001), (I-300)+(1.068)+(9.002), (I-300)+(1.068)+(9.003), (I-300)+(1.068)+(9.004), (I-300)+(1.068)+(9.005), (I-300)+(1.068)+(9.006), (I-300)+(1.068)+(9.007), (I-300)+(1.068)+(9.008), (I-300)+(1.068)+(9.009), (I-300)+(1.068)+(14.001), (I-300)+(1.068)+(14.002), (I-300)+(1.068)+(15.008), (I-300)+(1.068)+(15.011), (I-300)+(1.068)+(15.012), (I-300)+(1.068)+(15.016), (I-300)+(1.068)+(15.025), (I-300)+(1.068)+(15.027), (I-300)+(1.068)+(15.047), (I-300)+(1.068)+(15.063), (I-300)+(1.068)+(15.064), (I-300)+(1.068)+(16.001), (I-300)+(1.068)+(16.002), (I-300)+(1.068)+(16.003), (I-300)+(1.068)+(16.004), (I-300)+(1.068)+(16.005), (I-300)+(1.068)+(16.006), (I-300)+(1.068)+(16.007), (I-300)+(1.068)+(16.008), (I-300)+(1.068)+(17.001), (I-300)+(1.068)+(17.002), (I-300)+(1.068)+(17.003), (I-300)+(1.068)+(17.004), (I-300)+(1.068)+(17.005), (I-300)+(1.068)+(17.006), (I-300)+(1.068)+(17.007), (I-300)+(1.068)+(17.008), (I-300)+(1.068)+(17.009), (I-300)+(1.068)+(17.010), (I-300)+(1.068)+(17.011), (I-300)+(1.068)+(17.012), (I-300)+(1.068)+(18.001), (I-300)+(1.069)+(1.070), (I-300)+(1.069)+(1.071), (I-300)+(1.069)+(1.072), (I-300)+(1.069)+(1.073), (I-300)+(1.069)+(1.074), (I-300)+(1.069)+(1.075), (I-300)+(1.069)+(1.076), (I-300)+(1.069)+(1.077), (I-300)+(1.069)+(1.078), (I-300)+(1.069)+(1.079), (I-300)+(1.069)+(1.080), (I-300)+(1.069)+(1.081), (I-300)+(1.069)+(1.082), (I-300)+(1.069)+(1.083), (I-300)+(1.069)+(1.084), (I-300)+(1.069)+(1.085), (I-300)+(1.069)+(1.086), (I-300)+(1.069)+(1.087), (I-300)+(1.069)+(1.088), (I-300)+(1.069)+(1.089), (I-300)+(1.069)+(1.090), (I-300)+(1.069)+(1.091), (I-300)+(1.069)+(1.092), (I-300)+(1.069)+(2.001), (I-300)+(1.069)+(2.002), (I-300)+(1.069)+(2.003), (I-300)+(1.069)+(2.004), (I-300)+(1.069)+(2.005), (I-300)+(1.069)+(2.006), (I-300)+(1.069)+(2.007), (I-300)+(1.069)+(2.008), (I-300)+(1.069)+(2.009), (I-300)+(1.069)+(2.010), (I-300)+(1.069)+(2.011), (I-300)+(1.069)+(2.012), (I-300)+(1.069)+(2.013), (I-300)+(1.069)+(2.014), (I-300)+(1.069)+(2.015), (I-300)+(1.069)+(2.016), (I-300)+(1.069)+(2.017), (I-300)+(1.069)+(2.018), (I-300)+(1.069)+(2.019), (I-300)+(1.069)+(2.020), (I-300)+(1.069)+(2.021), (I-300)+(1.069)+(2.022), (I-300)+(1.069)+(2.023), (I-300)+(1.069)+(2.024), (I-300)+(1.069)+(2.025), (I-300)+(1.069)+(2.026), (I-300)+(1.069)+(2.027), (I-300)+(1.069)+(2.028), (I-300)+(1.069)+(2.029), (I-300)+(1.069)+(2.030), (I-300)+(1.069)+(2.031), (I-300)+(1.069)+(2.032), (I-300)+(1.069)+(2.033), (I-300)+(1.069)+(2.034), (I-300)+(1.069)+(2.035), (I-300)+(1.069)+(2.036), (I-300)+(1.069)+(2.037), (I-300)+(1.069)+(2.038), (I-300)+(1.069)+(2.039), (I-300)+(1.069)+(2.040), (I-300)+(1.069)+(2.041), (I-300)+(1.069)+(2.042), (I-300)+(1.069)+(2.043), (I-300)+(1.069)+(2.044), (I-300)+(1.069)+(2.045), (I-300)+(1.069)+(2.046), (I-300)+(1.069)+(2.047), (I-300)+(1.069)+(2.048), (I-300)+(1.069)+(2.049), (I-300)+(1.069)+(2.050), (I-300)+(1.069)+(2.051), (I-300)+(1.069)+(2.052), (I-300)+(1.069)+(2.053), (I-300)+(1.069)+(2.054), (I-300)+(1.069)+(2.055), (I-300)+(1.069)+(2.056), (I-300)+(1.069)+(2.057), (I-300)+(1.069)+(2.058), (I-300)+(1.069)+(2.059), (I-300)+(1.069)+(3.001), (I-300)+(1.069)+(3.002), (I-300)+(1.069)+(3.003), (I-300)+(1.069)+(3.004), (I-300)+(1.069)+(3.005), (I-300)+(1.069)+(3.006), (I-300)+(1.069)+(3.007), (I-300)+(1.069)+(3.008), (I-300)+(1.069)+(3.009), (I-300)+(1.069)+(3.010), (I-300)+(1.069)+(3.011), (I-300)+(1.069)+(3.012), (I-300)+(1.069)+(3.013), (I-300)+(1.069)+(3.014), (I-300)+(1.069)+(3.015), (I-300)+(1.069)+(3.016), (I-300)+(1.069)+(3.017), (I-300)+(1.069)+(3.018), (I-300)+(1.069)+(3.019), (I-300)+(1.069)+(3.020), (I-300)+(1.069)+(3.021), (I-300)+(1.069)+(3.022), (I-300)+(1.069)+(3.023), (I-300)+(1.069)+(3.024), (I-300)+(1.069)+(3.025), (I-300)+(1.069)+(3.026), (I-300)+(1.069)+(3.027), (I-300)+(1.069)+(3.028), (I-300)+(1.069)+(3.029), (I-300)+(1.069)+(3.030), (I-300)+(1.069)+(3.031), (I-300)+(1.069)+(5.001), (I-300)+(1.069)+(5.002), (I-300)+(1.069)+(5.003), (I-300)+(1.069)+(5.004), (I-300)+(1.069)+(5.005), (I-300)+(1.069)+(5.006), (I-300)+(1.069)+(5.007), (I-300)+(1.069)+(5.008), (I-300)+(1.069)+(5.009), (I-300)+(1.069)+(5.010), (I-300)+(1.069)+(5.011), (I-300)+(1.069)+(5.012), (I-300)+(1.069)+(5.013), (I-300)+(1.069)+(5.014), (I-300)+(1.069)+(5.015), (I-300)+(1.069)+(5.016), (I-300)+(1.069)+(5.017), (I-300)+(1.069)+(5.018), (I-300)+(1.069)+(5.019), (I-300)+(1.069)+(5.020), (I-300)+(1.069)+(5.021), (I-300)+(1.069)+(5.022), (I-300)+(1.069)+(5.023), (I-300)+(1.069)+(6.001), (I-300)+(1.069)+(6.002), (I-300)+(1.069)+(6.003), (I-300)+(1.069)+(6.004), (I-300)+(1.069)+(7.001), (I-300)+(1.069)+(7.002), (I-300)+(1.069)+(7.003), (I-300)+(1.069)+(7.004), (I-300)+(1.069)+(7.005), (I-300)+(1.069)+(7.006), (I-300)+(1.069)+(9.001), (I-300)+(1.069)+(9.002), (I-300)+(1.069)+(9.003), (I-300)+(1.069)+(9.004), (I-300)+(1.069)+(9.005), (I-300)+(1.069)+(9.006), (I-300)+(1.069)+(9.007), (I-300)+(1.069)+(9.008), (I-300)+(1.069)+(9.009), (I-300)+(1.069)+(14.001), (I-300)+(1.069)+(14.002), (I-300)+(1.069)+(15.008), (I-300)+(1.069)+(15.011), (I-300)+(1.069)+(15.012), (I-300)+(1.069)+(15.016), (I-300)+(1.069)+(15.025), (I-300)+(1.069)+(15.027), (I-300)+(1.069)+(15.047), (I-300)+(1.069)+(15.063), (I-300)+(1.069)+(15.064), (I-300)+(1.069)+(16.001), (I-300)+(1.069)+(16.002), (I-300)+(1.069)+(16.003), (I-300)+(1.069)+(16.004), (I-300)+(1.069)+(16.005), (I-300)+(1.069)+(16.006), (I-300)+(1.069)+(16.007), (I-300)+(1.069)+(16.008), (I-300)+(1.069)+(17.001), (I-300)+(1.069)+(17.002), (I-300)+(1.069)+(17.003), (I-300)+(1.069)+(17.004), (I-300)+(1.069)+(17.005), (I-300)+(1.069)+(17.006), (I-300)+(1.069)+(17.007), (I-300)+(1.069)+(17.008), (I-300)+(1.069)+(17.009), (I-300)+(1.069)+(17.010), (I-300)+(1.069)+(17.011), (I-300)+(1.069)+(17.012), (I-300)+(1.069)+(18.001), (I-300)+(1.070)+(1.071), (I-300)+(1.070)+(1.072), (I-300)+(1.070)+(1.073), (I-300)+(1.070)+(1.074), (I-300)+(1.070)+(1.075), (I-300)+(1.070)+(1.076), (I-300)+(1.070)+(1.077), (I-300)+(1.070)+(1.078), (I-300)+(1.070)+(1.079), (I-300)+(1.070)+(1.080), (I-300)+(1.070)+(1.081), (I-300)+(1.070)+(1.082), (I-300)+(1.070)+(1.083), (I-300)+(1.070)+(1.084), (I-300)+(1.070)+(1.085), (I-300)+(1.070)+(1.086), (I-300)+(1.070)+(1.087), (I-300)+(1.070)+(1.088), (I-300)+(1.070)+(1.089), (I-300)+(1.070)+(1.090), (I-300)+(1.070)+(1.091), (I-300)+(1.070)+(1.092), (I-300)+(1.070)+(2.001), (I-300)+(1.070)+(2.002), (I-300)+(1.070)+(2.003), (I-300)+(1.070)+(2.004), (I-300)+(1.070)+(2.005), (I-300)+(1.070)+(2.006), (I-300)+(1.070)+(2.007), (I-300)+(1.070)+(2.008), (I-300)+(1.070)+(2.009), (I-300)+(1.070)+(2.010), (I-300)+(1.070)+(2.011), (I-300)+(1.070)+(2.012), (I-300)+(1.070)+(2.013), (I-300)+(1.070)+(2.014), (I-300)+(1.070)+(2.015), (I-300)+(1.070)+(2.016), (I-300)+(1.070)+(2.017), (I-300)+(1.070)+(2.018), (I-300)+(1.070)+(2.019), (I-300)+(1.070)+(2.020), (I-300)+(1.070)+(2.021), (I-300)+(1.070)+(2.022), (I-300)+(1.070)+(2.023), (I-300)+(1.070)+(2.024), (I-300)+(1.070)+(2.025), (I-300)+(1.070)+(2.026), (I-300)+(1.070)+(2.027), (I-300)+(1.070)+(2.028), (I-300)+(1.070)+(2.029), (I-300)+(1.070)+(2.030), (I-300)+(1.070)+(2.031), (I-300)+(1.070)+(2.032), (I-300)+(1.070)+(2.033), (I-300)+(1.070)+(2.034), (I-300)+(1.070)+(2.035), (I-300)+(1.070)+(2.036), (I-300)+(1.070)+(2.037), (I-300)+(1.070)+(2.038), (I-300)+(1.070)+(2.039), (I-300)+(1.070)+(2.040), (I-300)+(1.070)+(2.041), (I-300)+(1.070)+(2.042), (I-300)+(1.070)+(2.043), (I-300)+(1.070)+(2.044), (I-300)+(1.070)+(2.045), (I-300)+(1.070)+(2.046), (I-300)+(1.070)+(2.047), (I-300)+(1.070)+(2.048), (I-300)+(1.070)+(2.049), (I-300)+(1.070)+(2.050), (I-300)+(1.070)+(2.051), (I-300)+(1.070)+(2.052), (I-300)+(1.070)+(2.053), (I-300)+(1.070)+(2.054), (I-300)+(1.070)+(2.055), (I-300)+(1.070)+(2.056), (I-300)+(1.070)+(2.057), (I-300)+(1.070)+(2.058), (I-300)+(1.070)+(2.059), (I-300)+(1.070)+(3.001), (I-300)+(1.070)+(3.002), (I-300)+(1.070)+(3.003), (I-300)+(1.070)+(3.004), (I-300)+(1.070)+(3.005), (I-300)+(1.070)+(3.006), (I-300)+(1.070)+(3.007), (I-300)+(1.070)+(3.008), (I-300)+(1.070)+(3.009), (I-300)+(1.070)+(3.010), (I-300)+(1.070)+(3.011), (I-300)+(1.070)+(3.012), (I-300)+(1.070)+(3.013), (I-300)+(1.070)+(3.014), (I-300)+(1.070)+(3.015), (I-300)+(1.070)+(3.016), (I-300)+(1.070)+(3.017), (I-300)+(1.070)+(3.018), (I-300)+(1.070)+(3.019), (I-300)+(1.070)+(3.020), (I-300)+(1.070)+(3.021), (I-300)+(1.070)+(3.022), (I-300)+(1.070)+(3.023), (I-300)+(1.070)+(3.024), (I-300)+(1.070)+(3.025), (I-300)+(1.070)+(3.026), (I-300)+(1.070)+(3.027), (I-300)+(1.070)+(3.028), (I-300)+(1.070)+(3.029), (I-300)+(1.070)+(3.030), (I-300)+(1.070)+(3.031), (I-300)+(1.070)+(5.001), (I-300)+(1.070)+(5.002), (I-300)+(1.070)+(5.003), (I-300)+(1.070)+(5.004), (I-300)+(1.070)+(5.005), (I-300)+(1.070)+(5.006), (I-300)+(1.070)+(5.007), (I-300)+(1.070)+(5.008), (I-300)+(1.070)+(5.009), (I-300)+(1.070)+(5.010), (I-300)+(1.070)+(5.011), (I-300)+(1.070)+(5.012), (I-300)+(1.070)+(5.013), (I-300)+(1.070)+(5.014), (I-300)+(1.070)+(5.015), (I-300)+(1.070)+(5.016), (I-300)+(1.070)+(5.017), (I-300)+(1.070)+(5.018), (I-300)+(1.070)+(5.019), (I-300)+(1.070)+(5.020), (I-300)+(1.070)+(5.021), (I-300)+(1.070)+(5.022), (I-300)+(1.070)+(5.023), (I-300)+(1.070)+(6.001), (I-300)+(1.070)+(6.002), (I-300)+(1.070)+(6.003), (I-300)+(1.070)+(6.004), (I-300)+(1.070)+(7.001), (I-300)+(1.070)+(7.002), (I-300)+(1.070)+(7.003), (I-300)+(1.070)+(7.004), (I-300)+(1.070)+(7.005), (I-300)+(1.070)+(7.006), (I-300)+(1.070)+(9.001), (I-300)+(1.070)+(9.002), (I-300)+(1.070)+(9.003), (I-300)+(1.070)+(9.004), (I-300)+(1.070)+(9.005), (I-300)+(1.070)+(9.006), (I-300)+(1.070)+(9.007), (I-300)+(1.070)+(9.008), (I-300)+(1.070)+(9.009), (I-300)+(1.070)+(14.001), (I-300)+(1.070)+(14.002), (I-300)+(1.070)+(15.008), (I-300)+(1.070)+(15.011), (I-300)+(1.070)+(15.012), (I-300)+(1.070)+(15.016), (I-300)+(1.070)+(15.025), (I-300)+(1.070)+(15.027), (I-300)+(1.070)+(15.047), (I-300)+(1.070)+(15.063), (I-300)+(1.070)+(15.064), (I-300)+(1.070)+(16.001), (I-300)+(1.070)+(16.002), (I-300)+(1.070)+(16.003), (I-300)+(1.070)+(16.004), (I-300)+(1.070)+(16.005), (I-300)+(1.070)+(16.006), (I-300)+(1.070)+(16.007), (I-300)+(1.070)+(16.008), (I-300)+(1.070)+(17.001), (I-300)+(1.070)+(17.002), (I-300)+(1.070)+(17.003), (I-300)+(1.070)+(17.004), (I-300)+(1.070)+(17.005), (I-300)+(1.070)+(17.006), (I-300)+(1.070)+(17.007), (I-300)+(1.070)+(17.008), (I-300)+(1.070)+(17.009), (I-300)+(1.070)+(17.010), (I-300)+(1.070)+(17.011), (I-300)+(1.070)+(17.012), (I-300)+(1.070)+(18.001), (I-300)+(1.071)+(1.072), (I-300)+(1.071)+(1.073), (I-300)+(1.071)+(1.074), (I-300)+(1.071)+(1.075), (I-300)+(1.071)+(1.076), (I-300)+(1.071)+(1.077), (I-300)+(1.071)+(1.078), (I-300)+(1.071)+(1.079), (I-300)+(1.071)+(1.080), (I-300)+(1.071)+(1.081), (I-300)+(1.071)+(1.082), (I-300)+(1.071)+(1.083), (I-300)+(1.071)+(1.084), (I-300)+(1.071)+(1.085), (I-300)+(1.071)+(1.086), (I-300)+(1.071)+(1.087), (I-300)+(1.071)+(1.088), (I-300)+(1.071)+(1.089), (I-300)+(1.071)+(1.090), (I-300)+(1.071)+(1.091), (I-300)+(1.071)+(1.092), (I-300)+(1.071)+(2.001), (I-300)+(1.071)+(2.002), (I-300)+(1.071)+(2.003), (I-300)+(1.071)+(2.004), (I-300)+(1.071)+(2.005), (I-300)+(1.071)+(2.006), (I-300)+(1.071)+(2.007), (I-300)+(1.071)+(2.008), (I-300)+(1.071)+(2.009), (I-300)+(1.071)+(2.010), (I-300)+(1.071)+(2.011), (I-300)+(1.071)+(2.012), (I-300)+(1.071)+(2.013), (I-300)+(1.071)+(2.014), (I-300)+(1.071)+(2.015), (I-300)+(1.071)+(2.016), (I-300)+(1.071)+(2.017), (I-300)+(1.071)+(2.018), (I-300)+(1.071)+(2.019), (I-300)+(1.071)+(2.020), (I-300)+(1.071)+(2.021), (I-300)+(1.071)+(2.022), (I-300)+(1.071)+(2.023), (I-300)+(1.071)+(2.024), (I-300)+(1.071)+(2.025), (I-300)+(1.071)+(2.026), (I-300)+(1.071)+(2.027), (I-300)+(1.071)+(2.028), (I-300)+(1.071)+(2.029), (I-300)+(1.071)+(2.030), (I-300)+(1.071)+(2.031), (I-300)+(1.071)+(2.032), (I-300)+(1.071)+(2.033), (I-300)+(1.071)+(2.034), (I-300)+(1.071)+(2.035), (I-300)+(1.071)+(2.036), (I-300)+(1.071)+(2.037), (I-300)+(1.071)+(2.038), (I-300)+(1.071)+(2.039), (I-300)+(1.071)+(2.040), (I-300)+(1.071)+(2.041), (I-300)+(1.071)+(2.042), (I-300)+(1.071)+(2.043), (I-300)+(1.071)+(2.044), (I-300)+(1.071)+(2.045), (I-300)+(1.071)+(2.046), (I-300)+(1.071)+(2.047), (I-300)+(1.071)+(2.048), (I-300)+(1.071)+(2.049), (I-300)+(1.071)+(2.050), (I-300)+(1.071)+(2.051), (I-300)+(1.071)+(2.052), (I-300)+(1.071)+(2.053), (I-300)+(1.071)+(2.054), (I-300)+(1.071)+(2.055), (I-300)+(1.071)+(2.056), (I-300)+(1.071)+(2.057), (I-300)+(1.071)+(2.058), (I-300)+(1.071)+(2.059), (I-300)+(1.071)+(3.001), (I-300)+(1.071)+(3.002), (I-300)+(1.071)+(3.003), (I-300)+(1.071)+(3.004), (I-300)+(1.071)+(3.005), (I-300)+(1.071)+(3.006), (I-300)+(1.071)+(3.007), (I-300)+(1.071)+(3.008), (I-300)+(1.071)+(3.009), (I-300)+(1.071)+(3.010), (I-300)+(1.071)+(3.011), (I-300)+(1.071)+(3.012), (I-300)+(1.071)+(3.013), (I-300)+(1.071)+(3.014), (I-300)+(1.071)+(3.015), (I-300)+(1.071)+(3.016), (I-300)+(1.071)+(3.017), (I-300)+(1.071)+(3.018), (I-300)+(1.071)+(3.019), (I-300)+(1.071)+(3.020), (I-300)+(1.071)+(3.021), (I-300)+(1.071)+(3.022), (I-300)+(1.071)+(3.023), (I-300)+(1.071)+(3.024), (I-300)+(1.071)+(3.025), (I-300)+(1.071)+(3.026), (I-300)+(1.071)+(3.027), (I-300)+(1.071)+(3.028), (I-300)+(1.071)+(3.029), (I-300)+(1.071)+(3.030), (I-300)+(1.071)+(3.031), (I-300)+(1.071)+(5.001), (I-300)+(1.071)+(5.002), (I-300)+(1.071)+(5.003), (I-300)+(1.071)+(5.004), (I-300)+(1.071)+(5.005), (I-300)+(1.071)+(5.006), (I-300)+(1.071)+(5.007), (I-300)+(1.071)+(5.008), (I-300)+(1.071)+(5.009), (I-300)+(1.071)+(5.010), (I-300)+(1.071)+(5.011), (I-300)+(1.071)+(5.012), (I-300)+(1.071)+(5.013), (I-300)+(1.071)+(5.014), (I-300)+(1.071)+(5.015), (I-300)+(1.071)+(5.016), (I-300)+(1.071)+(5.017), (I-300)+(1.071)+(5.018), (I-300)+(1.071)+(5.019), (I-300)+(1.071)+(5.020), (I-300)+(1.071)+(5.021), (I-300)+(1.071)+(5.022), (I-300)+(1.071)+(5.023), (I-300)+(1.071)+(6.001), (I-300)+(1.071)+(6.002), (I-300)+(1.071)+(6.003), (I-300)+(1.071)+(6.004), (I-300)+(1.071)+(7.001), (I-300)+(1.071)+(7.002), (I-300)+(1.071)+(7.003), (I-300)+(1.071)+(7.004), (I-300)+(1.071)+(7.005), (I-300)+(1.071)+(7.006), (I-300)+(1.071)+(9.001), (I-300)+(1.071)+(9.002), (I-300)+(1.071)+(9.003), (I-300)+(1.071)+(9.004), (I-300)+(1.071)+(9.005), (I-300)+(1.071)+(9.006), (I-300)+(1.071)+(9.007), (I-300)+(1.071)+(9.008), (I-300)+(1.071)+(9.009), (I-300)+(1.071)+(14.001), (I-300)+(1.071)+(14.002), (I-300)+(1.071)+(15.008), (I-300)+(1.071)+(15.011), (I-300)+(1.071)+(15.012), (I-300)+(1.071)+(15.016), (I-300)+(1.071)+(15.025), (I-300)+(1.071)+(15.027), (I-300)+(1.071)+(15.047), (I-300)+(1.071)+(15.063), (I-300)+(1.071)+(15.064), (I-300)+(1.071)+(16.001), (I-300)+(1.071)+(16.002), (I-300)+(1.071)+(16.003), (I-300)+(1.071)+(16.004), (I-300)+(1.071)+(16.005), (I-300)+(1.071)+(16.006), (I-300)+(1.071)+(16.007), (I-300)+(1.071)+(16.008), (I-300)+(1.071)+(17.001), (I-300)+(1.071)+(17.002), (I-300)+(1.071)+(17.003), (I-300)+(1.071)+(17.004), (I-300)+(1.071)+(17.005), (I-300)+(1.071)+(17.006), (I-300)+(1.071)+(17.007), (I-300)+(1.071)+(17.008), (I-300)+(1.071)+(17.009), (I-300)+(1.071)+(17.010), (I-300)+(1.071)+(17.011), (I-300)+(1.071)+(17.012), (I-300)+(1.071)+(18.001), (I-300)+(1.072)+(1.073), (I-300)+(1.072)+(1.074), (I-300)+(1.072)+(1.075), (I-300)+(1.072)+(1.076), (I-300)+(1.072)+(1.077), (I-300)+(1.072)+(1.078), (I-300)+(1.072)+(1.079), (I-300)+(1.072)+(1.080), (I-300)+(1.072)+(1.081), (I-300)+(1.072)+(1.082), (I-300)+(1.072)+(1.083), (I-300)+(1.072)+(1.084), (I-300)+(1.072)+(1.085), (I-300)+(1.072)+(1.086), (I-300)+(1.072)+(1.087), (I-300)+(1.072)+(1.088), (I-300)+(1.072)+(1.089), (I-300)+(1.072)+(1.090), (I-300)+(1.072)+(1.091), (I-300)+(1.072)+(1.092), (I-300)+(1.072)+(2.001), (I-300)+(1.072)+(2.002), (I-300)+(1.072)+(2.003), (I-300)+(1.072)+(2.004), (I-300)+(1.072)+(2.005), (I-300)+(1.072)+(2.006), (I-300)+(1.072)+(2.007), (I-300)+(1.072)+(2.008), (I-300)+(1.072)+(2.009), (I-300)+(1.072)+(2.010), (I-300)+(1.072)+(2.011), (I-300)+(1.072)+(2.012), (I-300)+(1.072)+(2.013), (I-300)+(1.072)+(2.014), (I-300)+(1.072)+(2.015), (I-300)+(1.072)+(2.016), (I-300)+(1.072)+(2.017), (I-300)+(1.072)+(2.018), (I-300)+(1.072)+(2.019), (I-300)+(1.072)+(2.020), (I-300)+(1.072)+(2.021), (I-300)+(1.072)+(2.022), (I-300)+(1.072)+(2.023), (I-300)+(1.072)+(2.024), (I-300)+(1.072)+(2.025), (I-300)+(1.072)+(2.026), (I-300)+(1.072)+(2.027), (I-300)+(1.072)+(2.028), (I-300)+(1.072)+(2.029), (I-300)+(1.072)+(2.030), (I-300)+(1.072)+(2.031), (I-300)+(1.072)+(2.032), (I-300)+(1.072)+(2.033), (I-300)+(1.072)+(2.034), (I-300)+(1.072)+(2.035), (I-300)+(1.072)+(2.036), (I-300)+(1.072)+(2.037), (I-300)+(1.072)+(2.038), (I-300)+(1.072)+(2.039), (I-300)+(1.072)+(2.040), (I-300)+(1.072)+(2.041), (I-300)+(1.072)+(2.042), (I-300)+(1.072)+(2.043), (I-300)+(1.072)+(2.044), (I-300)+(1.072)+(2.045), (I-300)+(1.072)+(2.046), (I-300)+(1.072)+(2.047), (I-300)+(1.072)+(2.048), (I-300)+(1.072)+(2.049), (I-300)+(1.072)+(2.050), (I-300)+(1.072)+(2.051), (I-300)+(1.072)+(2.052), (I-300)+(1.072)+(2.053), (I-300)+(1.072)+(2.054), (I-300)+(1.072)+(2.055), (I-300)+(1.072)+(2.056), (I-300)+(1.072)+(2.057), (I-300)+(1.072)+(2.058), (I-300)+(1.072)+(2.059), (I-300)+(1.072)+(3.001), (I-300)+(1.072)+(3.002), (I-300)+(1.072)+(3.003), (I-300)+(1.072)+(3.004), (I-300)+(1.072)+(3.005), (I-300)+(1.072)+(3.006), (I-300)+(1.072)+(3.007), (I-300)+(1.072)+(3.008), (I-300)+(1.072)+(3.009), (I-300)+(1.072)+(3.010), (I-300)+(1.072)+(3.011), (I-300)+(1.072)+(3.012), (I-300)+(1.072)+(3.013), (I-300)+(1.072)+(3.014), (I-300)+(1.072)+(3.015), (I-300)+(1.072)+(3.016), (I-300)+(1.072)+(3.017), (I-300)+(1.072)+(3.018), (I-300)+(1.072)+(3.019), (I-300)+(1.072)+(3.020), (I-300)+(1.072)+(3.021), (I-300)+(1.072)+(3.022), (I-300)+(1.072)+(3.023), (I-300)+(1.072)+(3.024), (I-300)+(1.072)+(3.025), (I-300)+(1.072)+(3.026), (I-300)+(1.072)+(3.027), (I-300)+(1.072)+(3.028), (I-300)+(1.072)+(3.029), (I-300)+(1.072)+(3.030), (I-300)+(1.072)+(3.031), (I-300)+(1.072)+(5.001), (I-300)+(1.072)+(5.002), (I-300)+(1.072)+(5.003), (I-300)+(1.072)+(5.004), (I-300)+(1.072)+(5.005), (I-300)+(1.072)+(5.006), (I-300)+(1.072)+(5.007), (I-300)+(1.072)+(5.008), (I-300)+(1.072)+(5.009), (I-300)+(1.072)+(5.010), (I-300)+(1.072)+(5.011), (I-300)+(1.072)+(5.012), (I-300)+(1.072)+(5.013), (I-300)+(1.072)+(5.014), (I-300)+(1.072)+(5.015), (I-300)+(1.072)+(5.016), (I-300)+(1.072)+(5.017), (I-300)+(1.072)+(5.018), (I-300)+(1.072)+(5.019), (I-300)+(1.072)+(5.020), (I-300)+(1.072)+(5.021), (I-300)+(1.072)+(5.022), (I-300)+(1.072)+(5.023), (I-300)+(1.072)+(6.001), (I-300)+(1.072)+(6.002), (I-300)+(1.072)+(6.003), (I-300)+(1.072)+(6.004), (I-300)+(1.072)+(7.001), (I-300)+(1.072)+(7.002), (I-300)+(1.072)+(7.003), (I-300)+(1.072)+(7.004), (I-300)+(1.072)+(7.005), (I-300)+(1.072)+(7.006), (I-300)+(1.072)+(9.001), (I-300)+(1.072)+(9.002), (I-300)+(1.072)+(9.003), (I-300)+(1.072)+(9.004), (I-300)+(1.072)+(9.005), (I-300)+(1.072)+(9.006), (I-300)+(1.072)+(9.007), (I-300)+(1.072)+(9.008), (I-300)+(1.072)+(9.009), (I-300)+(1.072)+(14.001), (I-300)+(1.072)+(14.002), (I-300)+(1.072)+(15.008), (I-300)+(1.072)+(15.011), (I-300)+(1.072)+(15.012), (I-300)+(1.072)+(15.016), (I-300)+(1.072)+(15.025), (I-300)+(1.072)+(15.027), (I-300)+(1.072)+(15.047), (I-300)+(1.072)+(15.063), (I-300)+(1.072)+(15.064), (I-300)+(1.072)+(16.001), (I-300)+(1.072)+(16.002), (I-300)+(1.072)+(16.003), (I-300)+(1.072)+(16.004), (I-300)+(1.072)+(16.005), (I-300)+(1.072)+(16.006), (I-300)+(1.072)+(16.007), (I-300)+(1.072)+(16.008), (I-300)+(1.072)+(17.001), (I-300)+(1.072)+(17.002), (I-300)+(1.072)+(17.003), (I-300)+(1.072)+(17.004), (I-300)+(1.072)+(17.005), (I-300)+(1.072)+(17.006), (I-300)+(1.072)+(17.007), (I-300)+(1.072)+(17.008), (I-300)+(1.072)+(17.009), (I-300)+(1.072)+(17.010), (I-300)+(1.072)+(17.011), (I-300)+(1.072)+(17.012), (I-300)+(1.072)+(18.001), (I-300)+(1.073)+(1.074), (I-300)+(1.073)+(1.075), (I-300)+(1.073)+(1.076), (I-300)+(1.073)+(1.077), (I-300)+(1.073)+(1.078), (I-300)+(1.073)+(1.079), (I-300)+(1.073)+(1.080), (I-300)+(1.073)+(1.081), (I-300)+(1.073)+(1.082), (I-300)+(1.073)+(1.083), (I-300)+(1.073)+(1.084), (I-300)+(1.073)+(1.085), (I-300)+(1.073)+(1.086), (I-300)+(1.073)+(1.087), (I-300)+(1.073)+(1.088), (I-300)+(1.073)+(1.089), (I-300)+(1.073)+(1.090), (I-300)+(1.073)+(1.091), (I-300)+(1.073)+(1.092), (I-300)+(1.073)+(2.001), (I-300)+(1.073)+(2.002), (I-300)+(1.073)+(2.003), (I-300)+(1.073)+(2.004), (I-300)+(1.073)+(2.005), (I-300)+(1.073)+(2.006), (I-300)+(1.073)+(2.007), (I-300)+(1.073)+(2.008), (I-300)+(1.073)+(2.009), (I-300)+(1.073)+(2.010), (I-300)+(1.073)+(2.011), (I-300)+(1.073)+(2.012), (I-300)+(1.073)+(2.013), (I-300)+(1.073)+(2.014), (I-300)+(1.073)+(2.015), (I-300)+(1.073)+(2.016), (I-300)+(1.073)+(2.017), (I-300)+(1.073)+(2.018), (I-300)+(1.073)+(2.019), (I-300)+(1.073)+(2.020), (I-300)+(1.073)+(2.021), (I-300)+(1.073)+(2.022), (I-300)+(1.073)+(2.023), (I-300)+(1.073)+(2.024), (I-300)+(1.073)+(2.025), (I-300)+(1.073)+(2.026), (I-300)+(1.073)+(2.027), (I-300)+(1.073)+(2.028), (I-300)+(1.073)+(2.029), (I-300)+(1.073)+(2.030), (I-300)+(1.073)+(2.031), (I-300)+(1.073)+(2.032), (I-300)+(1.073)+(2.033), (I-300)+(1.073)+(2.034), (I-300)+(1.073)+(2.035), (I-300)+(1.073)+(2.036), (I-300)+(1.073)+(2.037), (I-300)+(1.073)+(2.038), (I-300)+(1.073)+(2.039), (I-300)+(1.073)+(2.040), (I-300)+(1.073)+(2.041), (I-300)+(1.073)+(2.042), (I-300)+(1.073)+(2.043), (I-300)+(1.073)+(2.044), (I-300)+(1.073)+(2.045), (I-300)+(1.073)+(2.046), (I-300)+(1.073)+(2.047), (I-300)+(1.073)+(2.048), (I-300)+(1.073)+(2.049), (I-300)+(1.073)+(2.050), (I-300)+(1.073)+(2.051), (I-300)+(1.073)+(2.052), (I-300)+(1.073)+(2.053), (I-300)+(1.073)+(2.054), (I-300)+(1.073)+(2.055), (I-300)+(1.073)+(2.056), (I-300)+(1.073)+(2.057), (I-300)+(1.073)+(2.058), (I-300)+(1.073)+(2.059), (I-300)+(1.073)+(3.001), (I-300)+(1.073)+(3.002), (I-300)+(1.073)+(3.003), (I-300)+(1.073)+(3.004), (I-300)+(1.073)+(3.005), (I-300)+(1.073)+(3.006), (I-300)+(1.073)+(3.007), (I-300)+(1.073)+(3.008), (I-300)+(1.073)+(3.009), (I-300)+(1.073)+(3.010), (I-300)+(1.073)+(3.011), (I-300)+(1.073)+(3.012), (I-300)+(1.073)+(3.013), (I-300)+(1.073)+(3.014), (I-300)+(1.073)+(3.015), (I-300)+(1.073)+(3.016), (I-300)+(1.073)+(3.017), (I-300)+(1.073)+(3.018), (I-300)+(1.073)+(3.019), (I-300)+(1.073)+(3.020), (I-300)+(1.073)+(3.021), (I-300)+(1.073)+(3.022), (I-300)+(1.073)+(3.023), (I-300)+(1.073)+(3.024), (I-300)+(1.073)+(3.025), (I-300)+(1.073)+(3.026), (I-300)+(1.073)+(3.027), (I-300)+(1.073)+(3.028), (I-300)+(1.073)+(3.029), (I-300)+(1.073)+(3.030), (I-300)+(1.073)+(3.031), (I-300)+(1.073)+(5.001), (I-300)+(1.073)+(5.002), (I-300)+(1.073)+(5.003), (I-300)+(1.073)+(5.004), (I-300)+(1.073)+(5.005), (I-300)+(1.073)+(5.006), (I-300)+(1.073)+(5.007), (I-300)+(1.073)+(5.008), (I-300)+(1.073)+(5.009), (I-300)+(1.073)+(5.010), (I-300)+(1.073)+(5.011), (I-300)+(1.073)+(5.012), (I-300)+(1.073)+(5.013), (I-300)+(1.073)+(5.014), (I-300)+(1.073)+(5.015), (I-300)+(1.073)+(5.016), (I-300)+(1.073)+(5.017), (I-300)+(1.073)+(5.018), (I-300)+(1.073)+(5.019), (I-300)+(1.073)+(5.020), (I-300)+(1.073)+(5.021), (I-300)+(1.073)+(5.022), (I-300)+(1.073)+(5.023), (I-300)+(1.073)+(6.001), (I-300)+(1.073)+(6.002), (I-300)+(1.073)+(6.003), (I-300)+(1.073)+(6.004), (I-300)+(1.073)+(7.001), (I-300)+(1.073)+(7.002), (I-300)+(1.073)+(7.003), (I-300)+(1.073)+(7.004), (I-300)+(1.073)+(7.005), (I-300)+(1.073)+(7.006), (I-300)+(1.073)+(9.001), (I-300)+(1.073)+(9.002), (I-300)+(1.073)+(9.003), (I-300)+(1.073)+(9.004), (I-300)+(1.073)+(9.005), (I-300)+(1.073)+(9.006), (I-300)+(1.073)+(9.007), (I-300)+(1.073)+(9.008), (I-300)+(1.073)+(9.009), (I-300)+(1.073)+(14.001), (I-300)+(1.073)+(14.002), (I-300)+(1.073)+(15.008), (I-300)+(1.073)+(15.011), (I-300)+(1.073)+(15.012), (I-300)+(1.073)+(15.016), (I-300)+(1.073)+(15.025), (I-300)+(1.073)+(15.027), (I-300)+(1.073)+(15.047), (I-300)+(1.073)+(15.063), (I-300)+(1.073)+(15.064), (I-300)+(1.073)+(16.001), (I-300)+(1.073)+(16.002), (I-300)+(1.073)+(16.003), (I-300)+(1.073)+(16.004), (I-300)+(1.073)+(16.005), (I-300)+(1.073)+(16.006), (I-300)+(1.073)+(16.007), (I-300)+(1.073)+(16.008), (I-300)+(1.073)+(17.001), (I-300)+(1.073)+(17.002), (I-300)+(1.073)+(17.003), (I-300)+(1.073)+(17.004), (I-300)+(1.073)+(17.005), (I-300)+(1.073)+(17.006), (I-300)+(1.073)+(17.007), (I-300)+(1.073)+(17.008), (I-300)+(1.073)+(17.009), (I-300)+(1.073)+(17.010), (I-300)+(1.073)+(17.011), (I-300)+(1.073)+(17.012), (I-300)+(1.073)+(18.001), (I-300)+(1.074)+(1.075), (I-300)+(1.074)+(1.076), (I-300)+(1.074)+(1.077), (I-300)+(1.074)+(1.078), (I-300)+(1.074)+(1.079), (I-300)+(1.074)+(1.080), (I-300)+(1.074)+(1.081), (I-300)+(1.074)+(1.082), (I-300)+(1.074)+(1.083), (I-300)+(1.074)+(1.084), (I-300)+(1.074)+(1.085), (I-300)+(1.074)+(1.086), (I-300)+(1.074)+(1.087), (I-300)+(1.074)+(1.088), (I-300)+(1.074)+(1.089), (I-300)+(1.074)+(1.090), (I-300)+(1.074)+(1.091), (I-300)+(1.074)+(1.092), (I-300)+(1.074)+(2.001), (I-300)+(1.074)+(2.002), (I-300)+(1.074)+(2.003), (I-300)+(1.074)+(2.004), (I-300)+(1.074)+(2.005), (I-300)+(1.074)+(2.006), (I-300)+(1.074)+(2.007), (I-300)+(1.074)+(2.008), (I-300)+(1.074)+(2.009), (I-300)+(1.074)+(2.010), (I-300)+(1.074)+(2.011), (I-300)+(1.074)+(2.012), (I-300)+(1.074)+(2.013), (I-300)+(1.074)+(2.014), (I-300)+(1.074)+(2.015), (I-300)+(1.074)+(2.016), (I-300)+(1.074)+(2.017), (I-300)+(1.074)+(2.018), (I-300)+(1.074)+(2.019), (I-300)+(1.074)+(2.020), (I-300)+(1.074)+(2.021), (I-300)+(1.074)+(2.022), (I-300)+(1.074)+(2.023), (I-300)+(1.074)+(2.024), (I-300)+(1.074)+(2.025), (I-300)+(1.074)+(2.026), (I-300)+(1.074)+(2.027), (I-300)+(1.074)+(2.028), (I-300)+(1.074)+(2.029), (I-300)+(1.074)+(2.030), (I-300)+(1.074)+(2.031), (I-300)+(1.074)+(2.032), (I-300)+(1.074)+(2.033), (I-300)+(1.074)+(2.034), (I-300)+(1.074)+(2.035), (I-300)+(1.074)+(2.036), (I-300)+(1.074)+(2.037), (I-300)+(1.074)+(2.038), (I-300)+(1.074)+(2.039), (I-300)+(1.074)+(2.040), (I-300)+(1.074)+(2.041), (I-300)+(1.074)+(2.042), (I-300)+(1.074)+(2.043), (I-300)+(1.074)+(2.044), (I-300)+(1.074)+(2.045), (I-300)+(1.074)+(2.046), (I-300)+(1.074)+(2.047), (I-300)+(1.074)+(2.048), (I-300)+(1.074)+(2.049), (I-300)+(1.074)+(2.050), (I-300)+(1.074)+(2.051), (I-300)+(1.074)+(2.052), (I-300)+(1.074)+(2.053), (I-300)+(1.074)+(2.054), (I-300)+(1.074)+(2.055), (I-300)+(1.074)+(2.056), (I-300)+(1.074)+(2.057), (I-300)+(1.074)+(2.058), (I-300)+(1.074)+(2.059), (I-300)+(1.074)+(3.001), (I-300)+(1.074)+(3.002), (I-300)+(1.074)+(3.003), (I-300)+(1.074)+(3.004), (I-300)+(1.074)+(3.005), (I-300)+(1.074)+(3.006), (I-300)+(1.074)+(3.007), (I-300)+(1.074)+(3.008), (I-300)+(1.074)+(3.009), (I-300)+(1.074)+(3.010), (I-300)+(1.074)+(3.011), (I-300)+(1.074)+(3.012), (I-300)+(1.074)+(3.013), (I-300)+(1.074)+(3.014), (I-300)+(1.074)+(3.015), (I-300)+(1.074)+(3.016), (I-300)+(1.074)+(3.017), (I-300)+(1.074)+(3.018), (I-300)+(1.074)+(3.019), (I-300)+(1.074)+(3.020), (I-300)+(1.074)+(3.021), (I-300)+(1.074)+(3.022), (I-300)+(1.074)+(3.023), (I-300)+(1.074)+(3.024), (I-300)+(1.074)+(3.025), (I-300)+(1.074)+(3.026), (I-300)+(1.074)+(3.027), (I-300)+(1.074)+(3.028), (I-300)+(1.074)+(3.029), (I-300)+(1.074)+(3.030), (I-300)+(1.074)+(3.031), (I-300)+(1.074)+(5.001), (I-300)+(1.074)+(5.002), (I-300)+(1.074)+(5.003), (I-300)+(1.074)+(5.004), (I-300)+(1.074)+(5.005), (I-300)+(1.074)+(5.006), (I-300)+(1.074)+(5.007), (I-300)+(1.074)+(5.008), (I-300)+(1.074)+(5.009), (I-300)+(1.074)+(5.010), (I-300)+(1.074)+(5.011), (I-300)+(1.074)+(5.012), (I-300)+(1.074)+(5.013), (I-300)+(1.074)+(5.014), (I-300)+(1.074)+(5.015), (I-300)+(1.074)+(5.016), (I-300)+(1.074)+(5.017), (I-300)+(1.074)+(5.018), (I-300)+(1.074)+(5.019), (I-300)+(1.074)+(5.020), (I-300)+(1.074)+(5.021), (I-300)+(1.074)+(5.022), (I-300)+(1.074)+(5.023), (I-300)+(1.074)+(6.001), (I-300)+(1.074)+(6.002), (I-300)+(1.074)+(6.003), (I-300)+(1.074)+(6.004), (I-300)+(1.074)+(7.001), (I-300)+(1.074)+(7.002), (I-300)+(1.074)+(7.003), (I-300)+(1.074)+(7.004), (I-300)+(1.074)+(7.005), (I-300)+(1.074)+(7.006), (I-300)+(1.074)+(9.001), (I-300)+(1.074)+(9.002), (I-300)+(1.074)+(9.003), (I-300)+(1.074)+(9.004), (I-300)+(1.074)+(9.005), (I-300)+(1.074)+(9.006), (I-300)+(1.074)+(9.007), (I-300)+(1.074)+(9.008), (I-300)+(1.074)+(9.009), (I-300)+(1.074)+(14.001), (I-300)+(1.074)+(14.002), (I-300)+(1.074)+(15.008), (I-300)+(1.074)+(15.011), (I-300)+(1.074)+(15.012), (I-300)+(1.074)+(15.016), (I-300)+(1.074)+(15.025), (I-300)+(1.074)+(15.027), (I-300)+(1.074)+(15.047), (I-300)+(1.074)+(15.063), (I-300)+(1.074)+(15.064), (I-300)+(1.074)+(16.001), (I-300)+(1.074)+(16.002), (I-300)+(1.074)+(16.003), (I-300)+(1.074)+(16.004), (I-300)+(1.074)+(16.005), (I-300)+(1.074)+(16.006), (I-300)+(1.074)+(16.007), (I-300)+(1.074)+(16.008), (I-300)+(1.074)+(17.001), (I-300)+(1.074)+(17.002), (I-300)+(1.074)+(17.003), (I-300)+(1.074)+(17.004), (I-300)+(1.074)+(17.005), (I-300)+(1.074)+(17.006), (I-300)+(1.074)+(17.007), (I-300)+(1.074)+(17.008), (I-300)+(1.074)+(17.009), (I-300)+(1.074)+(17.010), (I-300)+(1.074)+(17.011), (I-300)+(1.074)+(17.012), (I-300)+(1.074)+(18.001), (I-300)+(1.075)+(1.076), (I-300)+(1.075)+(1.077), (I-300)+(1.075)+(1.078), (I-300)+(1.075)+(1.079), (I-300)+(1.075)+(1.080), (I-300)+(1.075)+(1.081), (I-300)+(1.075)+(1.082), (I-300)+(1.075)+(1.083), (I-300)+(1.075)+(1.084), (I-300)+(1.075)+(1.085), (I-300)+(1.075)+(1.086), (I-300)+(1.075)+(1.087), (I-300)+(1.075)+(1.088), (I-300)+(1.075)+(1.089), (I-300)+(1.075)+(1.090), (I-300)+(1.075)+(1.091), (I-300)+(1.075)+(1.092), (I-300)+(1.075)+(2.001), (I-300)+(1.075)+(2.002), (I-300)+(1.075)+(2.003), (I-300)+(1.075)+(2.004), (I-300)+(1.075)+(2.005), (I-300)+(1.075)+(2.006), (I-300)+(1.075)+(2.007), (I-300)+(1.075)+(2.008), (I-300)+(1.075)+(2.009), (I-300)+(1.075)+(2.010), (I-300)+(1.075)+(2.011), (I-300)+(1.075)+(2.012), (I-300)+(1.075)+(2.013), (I-300)+(1.075)+(2.014), (I-300)+(1.075)+(2.015), (I-300)+(1.075)+(2.016), (I-300)+(1.075)+(2.017), (I-300)+(1.075)+(2.018), (I-300)+(1.075)+(2.019), (I-300)+(1.075)+(2.020), (I-300)+(1.075)+(2.021), (I-300)+(1.075)+(2.022), (I-300)+(1.075)+(2.023), (I-300)+(1.075)+(2.024), (I-300)+(1.075)+(2.025), (I-300)+(1.075)+(2.026), (I-300)+(1.075)+(2.027), (I-300)+(1.075)+(2.028), (I-300)+(1.075)+(2.029), (I-300)+(1.075)+(2.030), (I-300)+(1.075)+(2.031), (I-300)+(1.075)+(2.032), (I-300)+(1.075)+(2.033), (I-300)+(1.075)+(2.034), (I-300)+(1.075)+(2.035), (I-300)+(1.075)+(2.036), (I-300)+(1.075)+(2.037), (I-300)+(1.075)+(2.038), (I-300)+(1.075)+(2.039), (I-300)+(1.075)+(2.040), (I-300)+(1.075)+(2.041), (I-300)+(1.075)+(2.042), (I-300)+(1.075)+(2.043), (I-300)+(1.075)+(2.044), (I-300)+(1.075)+(2.045), (I-300)+(1.075)+(2.046), (I-300)+(1.075)+(2.047), (I-300)+(1.075)+(2.048), (I-300)+(1.075)+(2.049), (I-300)+(1.075)+(2.050), (I-300)+(1.075)+(2.051), (I-300)+(1.075)+(2.052), (I-300)+(1.075)+(2.053), (I-300)+(1.075)+(2.054), (I-300)+(1.075)+(2.055), (I-300)+(1.075)+(2.056), (I-300)+(1.075)+(2.057), (I-300)+(1.075)+(2.058), (I-300)+(1.075)+(2.059), (I-300)+(1.075)+(3.001), (I-300)+(1.075)+(3.002), (I-300)+(1.075)+(3.003), (I-300)+(1.075)+(3.004), (I-300)+(1.075)+(3.005), (I-300)+(1.075)+(3.006), (I-300)+(1.075)+(3.007), (I-300)+(1.075)+(3.008), (I-300)+(1.075)+(3.009), (I-300)+(1.075)+(3.010), (I-300)+(1.075)+(3.011), (I-300)+(1.075)+(3.012), (I-300)+(1.075)+(3.013), (I-300)+(1.075)+(3.014), (I-300)+(1.075)+(3.015), (I-300)+(1.075)+(3.016), (I-300)+(1.075)+(3.017), (I-300)+(1.075)+(3.018), (I-300)+(1.075)+(3.019), (I-300)+(1.075)+(3.020), (I-300)+(1.075)+(3.021), (I-300)+(1.075)+(3.022), (I-300)+(1.075)+(3.023), (I-300)+(1.075)+(3.024), (I-300)+(1.075)+(3.025), (I-300)+(1.075)+(3.026), (I-300)+(1.075)+(3.027), (I-300)+(1.075)+(3.028), (I-300)+(1.075)+(3.029), (I-300)+(1.075)+(3.030), (I-300)+(1.075)+(3.031), (I-300)+(1.075)+(5.001), (I-300)+(1.075)+(5.002), (I-300)+(1.075)+(5.003), (I-300)+(1.075)+(5.004), (I-300)+(1.075)+(5.005), (I-300)+(1.075)+(5.006), (I-300)+(1.075)+(5.007), (I-300)+(1.075)+(5.008), (I-300)+(1.075)+(5.009), (I-300)+(1.075)+(5.010), (I-300)+(1.075)+(5.011), (I-300)+(1.075)+(5.012), (I-300)+(1.075)+(5.013), (I-300)+(1.075)+(5.014), (I-300)+(1.075)+(5.015), (I-300)+(1.075)+(5.016), (I-300)+(1.075)+(5.017), (I-300)+(1.075)+(5.018), (I-300)+(1.075)+(5.019), (I-300)+(1.075)+(5.020), (I-300)+(1.075)+(5.021), (I-300)+(1.075)+(5.022), (I-300)+(1.075)+(5.023), (I-300)+(1.075)+(6.001), (I-300)+(1.075)+(6.002), (I-300)+(1.075)+(6.003), (I-300)+(1.075)+(6.004), (I-300)+(1.075)+(7.001), (I-300)+(1.075)+(7.002), (I-300)+(1.075)+(7.003), (I-300)+(1.075)+(7.004), (I-300)+(1.075)+(7.005), (I-300)+(1.075)+(7.006), (I-300)+(1.075)+(9.001), (I-300)+(1.075)+(9.002), (I-300)+(1.075)+(9.003), (I-300)+(1.075)+(9.004), (I-300)+(1.075)+(9.005), (I-300)+(1.075)+(9.006), (I-300)+(1.075)+(9.007), (I-300)+(1.075)+(9.008), (I-300)+(1.075)+(9.009), (I-300)+(1.075)+(14.001), (I-300)+(1.075)+(14.002), (I-300)+(1.075)+(15.008), (I-300)+(1.075)+(15.011), (I-300)+(1.075)+(15.012), (I-300)+(1.075)+(15.016), (I-300)+(1.075)+(15.025), (I-300)+(1.075)+(15.027), (I-300)+(1.075)+(15.047), (I-300)+(1.075)+(15.063), (I-300)+(1.075)+(15.064), (I-300)+(1.075)+(16.001), (I-300)+(1.075)+(16.002), (I-300)+(1.075)+(16.003), (I-300)+(1.075)+(16.004), (I-300)+(1.075)+(16.005), (I-300)+(1.075)+(16.006), (I-300)+(1.075)+(16.007), (I-300)+(1.075)+(16.008), (I-300)+(1.075)+(17.001), (I-300)+(1.075)+(17.002), (I-300)+(1.075)+(17.003), (I-300)+(1.075)+(17.004), (I-300)+(1.075)+(17.005), (I-300)+(1.075)+(17.006), (I-300)+(1.075)+(17.007), (I-300)+(1.075)+(17.008), (I-300)+(1.075)+(17.009), (I-300)+(1.075)+(17.010), (I-300)+(1.075)+(17.011), (I-300)+(1.075)+(17.012), (I-300)+(1.075)+(18.001), (I-300)+(1.076)+(1.077), (I-300)+(1.076)+(1.078), (I-300)+(1.076)+(1.079), (I-300)+(1.076)+(1.080), (I-300)+(1.076)+(1.081), (I-300)+(1.076)+(1.082), (I-300)+(1.076)+(1.083), (I-300)+(1.076)+(1.084), (I-300)+(1.076)+(1.085), (I-300)+(1.076)+(1.086), (I-300)+(1.076)+(1.087), (I-300)+(1.076)+(1.088), (I-300)+(1.076)+(1.089), (I-300)+(1.076)+(1.090), (I-300)+(1.076)+(1.091), (I-300)+(1.076)+(1.092), (I-300)+(1.076)+(2.001), (I-300)+(1.076)+(2.002), (I-300)+(1.076)+(2.003), (I-300)+(1.076)+(2.004), (I-300)+(1.076)+(2.005), (I-300)+(1.076)+(2.006), (I-300)+(1.076)+(2.007), (I-300)+(1.076)+(2.008), (I-300)+(1.076)+(2.009), (I-300)+(1.076)+(2.010), (I-300)+(1.076)+(2.011), (I-300)+(1.076)+(2.012), (I-300)+(1.076)+(2.013), (I-300)+(1.076)+(2.014), (I-300)+(1.076)+(2.015), (I-300)+(1.076)+(2.016), (I-300)+(1.076)+(2.017), (I-300)+(1.076)+(2.018), (I-300)+(1.076)+(2.019), (I-300)+(1.076)+(2.020), (I-300)+(1.076)+(2.021), (I-300)+(1.076)+(2.022), (I-300)+(1.076)+(2.023), (I-300)+(1.076)+(2.024), (I-300)+(1.076)+(2.025), (I-300)+(1.076)+(2.026), (I-300)+(1.076)+(2.027), (I-300)+(1.076)+(2.028), (I-300)+(1.076)+(2.029), (I-300)+(1.076)+(2.030), (I-300)+(1.076)+(2.031), (I-300)+(1.076)+(2.032), (I-300)+(1.076)+(2.033), (I-300)+(1.076)+(2.034), (I-300)+(1.076)+(2.035), (I-300)+(1.076)+(2.036), (I-300)+(1.076)+(2.037), (I-300)+(1.076)+(2.038), (I-300)+(1.076)+(2.039), (I-300)+(1.076)+(2.040), (I-300)+(1.076)+(2.041), (I-300)+(1.076)+(2.042), (I-300)+(1.076)+(2.043), (I-300)+(1.076)+(2.044), (I-300)+(1.076)+(2.045), (I-300)+(1.076)+(2.046), (I-300)+(1.076)+(2.047), (I-300)+(1.076)+(2.048), (I-300)+(1.076)+(2.049), (I-300)+(1.076)+(2.050), (I-300)+(1.076)+(2.051), (I-300)+(1.076)+(2.052), (I-300)+(1.076)+(2.053), (I-300)+(1.076)+(2.054), (I-300)+(1.076)+(2.055), (I-300)+(1.076)+(2.056), (I-300)+(1.076)+(2.057), (I-300)+(1.076)+(2.058), (I-300)+(1.076)+(2.059), (I-300)+(1.076)+(3.001), (I-300)+(1.076)+(3.002), (I-300)+(1.076)+(3.003), (I-300)+(1.076)+(3.004), (I-300)+(1.076)+(3.005), (I-300)+(1.076)+(3.006), (I-300)+(1.076)+(3.007), (I-300)+(1.076)+(3.008), (I-300)+(1.076)+(3.009), (I-300)+(1.076)+(3.010), (I-300)+(1.076)+(3.011), (I-300)+(1.076)+(3.012), (I-300)+(1.076)+(3.013), (I-300)+(1.076)+(3.014), (I-300)+(1.076)+(3.015), (I-300)+(1.076)+(3.016), (I-300)+(1.076)+(3.017), (I-300)+(1.076)+(3.018), (I-300)+(1.076)+(3.019), (I-300)+(1.076)+(3.020), (I-300)+(1.076)+(3.021), (I-300)+(1.076)+(3.022), (I-300)+(1.076)+(3.023), (I-300)+(1.076)+(3.024), (I-300)+(1.076)+(3.025), (I-300)+(1.076)+(3.026), (I-300)+(1.076)+(3.027), (I-300)+(1.076)+(3.028), (I-300)+(1.076)+(3.029), (I-300)+(1.076)+(3.030), (I-300)+(1.076)+(3.031), (I-300)+(1.076)+(5.001), (I-300)+(1.076)+(5.002), (I-300)+(1.076)+(5.003), (I-300)+(1.076)+(5.004), (I-300)+(1.076)+(5.005), (I-300)+(1.076)+(5.006), (I-300)+(1.076)+(5.007), (I-300)+(1.076)+(5.008), (I-300)+(1.076)+(5.009), (I-300)+(1.076)+(5.010), (I-300)+(1.076)+(5.011), (I-300)+(1.076)+(5.012), (I-300)+(1.076)+(5.013), (I-300)+(1.076)+(5.014), (I-300)+(1.076)+(5.015), (I-300)+(1.076)+(5.016), (I-300)+(1.076)+(5.017), (I-300)+(1.076)+(5.018), (I-300)+(1.076)+(5.019), (I-300)+(1.076)+(5.020), (I-300)+(1.076)+(5.021), (I-300)+(1.076)+(5.022), (I-300)+(1.076)+(5.023), (I-300)+(1.076)+(6.001), (I-300)+(1.076)+(6.002), (I-300)+(1.076)+(6.003), (I-300)+(1.076)+(6.004), (I-300)+(1.076)+(7.001), (I-300)+(1.076)+(7.002), (I-300)+(1.076)+(7.003), (I-300)+(1.076)+(7.004), (I-300)+(1.076)+(7.005), (I-300)+(1.076)+(7.006), (I-300)+(1.076)+(9.001), (I-300)+(1.076)+(9.002), (I-300)+(1.076)+(9.003), (I-300)+(1.076)+(9.004), (I-300)+(1.076)+(9.005), (I-300)+(1.076)+(9.006), (I-300)+(1.076)+(9.007), (I-300)+(1.076)+(9.008), (I-300)+(1.076)+(9.009), (I-300)+(1.076)+(14.001), (I-300)+(1.076)+(14.002), (I-300)+(1.076)+(15.008), (I-300)+(1.076)+(15.011), (I-300)+(1.076)+(15.012), (I-300)+(1.076)+(15.016), (I-300)+(1.076)+(15.025), (I-300)+(1.076)+(15.027), (I-300)+(1.076)+(15.047), (I-300)+(1.076)+(15.063), (I-300)+(1.076)+(15.064), (I-300)+(1.076)+(16.001), (I-300)+(1.076)+(16.002), (I-300)+(1.076)+(16.003), (I-300)+(1.076)+(16.004), (I-300)+(1.076)+(16.005), (I-300)+(1.076)+(16.006), (I-300)+(1.076)+(16.007), (I-300)+(1.076)+(16.008), (I-300)+(1.076)+(17.001), (I-300)+(1.076)+(17.002), (I-300)+(1.076)+(17.003), (I-300)+(1.076)+(17.004), (I-300)+(1.076)+(17.005), (I-300)+(1.076)+(17.006), (I-300)+(1.076)+(17.007), (I-300)+(1.076)+(17.008), (I-300)+(1.076)+(17.009), (I-300)+(1.076)+(17.010), (I-300)+(1.076)+(17.011), (I-300)+(1.076)+(17.012), (I-300)+(1.076)+(18.001), (I-300)+(1.077)+(1.078), (I-300)+(1.077)+(1.079), (I-300)+(1.077)+(1.080), (I-300)+(1.077)+(1.081), (I-300)+(1.077)+(1.082), (I-300)+(1.077)+(1.083), (I-300)+(1.077)+(1.084), (I-300)+(1.077)+(1.085), (I-300)+(1.077)+(1.086), (I-300)+(1.077)+(1.087), (I-300)+(1.077)+(1.088), (I-300)+(1.077)+(1.089), (I-300)+(1.077)+(1.090), (I-300)+(1.077)+(1.091), (I-300)+(1.077)+(1.092), (I-300)+(1.077)+(2.001), (I-300)+(1.077)+(2.002), (I-300)+(1.077)+(2.003), (I-300)+(1.077)+(2.004), (I-300)+(1.077)+(2.005), (I-300)+(1.077)+(2.006), (I-300)+(1.077)+(2.007), (I-300)+(1.077)+(2.008), (I-300)+(1.077)+(2.009), (I-300)+(1.077)+(2.010), (I-300)+(1.077)+(2.011), (I-300)+(1.077)+(2.012), (I-300)+(1.077)+(2.013), (I-300)+(1.077)+(2.014), (I-300)+(1.077)+(2.015), (I-300)+(1.077)+(2.016), (I-300)+(1.077)+(2.017), (I-300)+(1.077)+(2.018), (I-300)+(1.077)+(2.019), (I-300)+(1.077)+(2.020), (I-300)+(1.077)+(2.021), (I-300)+(1.077)+(2.022), (I-300)+(1.077)+(2.023), (I-300)+(1.077)+(2.024), (I-300)+(1.077)+(2.025), (I-300)+(1.077)+(2.026), (I-300)+(1.077)+(2.027), (I-300)+(1.077)+(2.028), (I-300)+(1.077)+(2.029), (I-300)+(1.077)+(2.030), (I-300)+(1.077)+(2.031), (I-300)+(1.077)+(2.032), (I-300)+(1.077)+(2.033), (I-300)+(1.077)+(2.034), (I-300)+(1.077)+(2.035), (I-300)+(1.077)+(2.036), (I-300)+(1.077)+(2.037), (I-300)+(1.077)+(2.038), (I-300)+(1.077)+(2.039), (I-300)+(1.077)+(2.040), (I-300)+(1.077)+(2.041), (I-300)+(1.077)+(2.042), (I-300)+(1.077)+(2.043), (I-300)+(1.077)+(2.044), (I-300)+(1.077)+(2.045), (I-300)+(1.077)+(2.046), (I-300)+(1.077)+(2.047), (I-300)+(1.077)+(2.048), (I-300)+(1.077)+(2.049), (I-300)+(1.077)+(2.050), (I-300)+(1.077)+(2.051), (I-300)+(1.077)+(2.052), (I-300)+(1.077)+(2.053), (I-300)+(1.077)+(2.054), (I-300)+(1.077)+(2.055), (I-300)+(1.077)+(2.056), (I-300)+(1.077)+(2.057), (I-300)+(1.077)+(2.058), (I-300)+(1.077)+(2.059), (I-300)+(1.077)+(3.001), (I-300)+(1.077)+(3.002), (I-300)+(1.077)+(3.003), (I-300)+(1.077)+(3.004), (I-300)+(1.077)+(3.005), (I-300)+(1.077)+(3.006), (I-300)+(1.077)+(3.007), (I-300)+(1.077)+(3.008), (I-300)+(1.077)+(3.009), (I-300)+(1.077)+(3.010), (I-300)+(1.077)+(3.011), (I-300)+(1.077)+(3.012), (I-300)+(1.077)+(3.013), (I-300)+(1.077)+(3.014), (I-300)+(1.077)+(3.015), (I-300)+(1.077)+(3.016), (I-300)+(1.077)+(3.017), (I-300)+(1.077)+(3.018), (I-300)+(1.077)+(3.019), (I-300)+(1.077)+(3.020), (I-300)+(1.077)+(3.021), (I-300)+(1.077)+(3.022), (I-300)+(1.077)+(3.023), (I-300)+(1.077)+(3.024), (I-300)+(1.077)+(3.025), (I-300)+(1.077)+(3.026), (I-300)+(1.077)+(3.027), (I-300)+(1.077)+(3.028), (I-300)+(1.077)+(3.029), (I-300)+(1.077)+(3.030), (I-300)+(1.077)+(3.031), (I-300)+(1.077)+(5.001), (I-300)+(1.077)+(5.002), (I-300)+(1.077)+(5.003), (I-300)+(1.077)+(5.004), (I-300)+(1.077)+(5.005), (I-300)+(1.077)+(5.006), (I-300)+(1.077)+(5.007), (I-300)+(1.077)+(5.008), (I-300)+(1.077)+(5.009), (I-300)+(1.077)+(5.010), (I-300)+(1.077)+(5.011), (I-300)+(1.077)+(5.012), (I-300)+(1.077)+(5.013), (I-300)+(1.077)+(5.014), (I-300)+(1.077)+(5.015), (I-300)+(1.077)+(5.016), (I-300)+(1.077)+(5.017), (I-300)+(1.077)+(5.018), (I-300)+(1.077)+(5.019), (I-300)+(1.077)+(5.020), (I-300)+(1.077)+(5.021), (I-300)+(1.077)+(5.022), (I-300)+(1.077)+(5.023), (I-300)+(1.077)+(6.001), (I-300)+(1.077)+(6.002), (I-300)+(1.077)+(6.003), (I-300)+(1.077)+(6.004), (I-300)+(1.077)+(7.001), (I-300)+(1.077)+(7.002), (I-300)+(1.077)+(7.003), (I-300)+(1.077)+(7.004), (I-300)+(1.077)+(7.005), (I-300)+(1.077)+(7.006), (I-300)+(1.077)+(9.001), (I-300)+(1.077)+(9.002), (I-300)+(1.077)+(9.003), (I-300)+(1.077)+(9.004), (I-300)+(1.077)+(9.005), (I-300)+(1.077)+(9.006), (I-300)+(1.077)+(9.007), (I-300)+(1.077)+(9.008), (I-300)+(1.077)+(9.009), (I-300)+(1.077)+(14.001), (I-300)+(1.077)+(14.002), (I-300)+(1.077)+(15.008), (I-300)+(1.077)+(15.011), (I-300)+(1.077)+(15.012), (I-300)+(1.077)+(15.016), (I-300)+(1.077)+(15.025), (I-300)+(1.077)+(15.027), (I-300)+(1.077)+(15.047), (I-300)+(1.077)+(15.063), (I-300)+(1.077)+(15.064), (I-300)+(1.077)+(16.001), (I-300)+(1.077)+(16.002), (I-300)+(1.077)+(16.003), (I-300)+(1.077)+(16.004), (I-300)+(1.077)+(16.005), (I-300)+(1.077)+(16.006), (I-300)+(1.077)+(16.007), (I-300)+(1.077)+(16.008), (I-300)+(1.077)+(17.001), (I-300)+(1.077)+(17.002), (I-300)+(1.077)+(17.003), (I-300)+(1.077)+(17.004), (I-300)+(1.077)+(17.005), (I-300)+(1.077)+(17.006), (I-300)+(1.077)+(17.007), (I-300)+(1.077)+(17.008), (I-300)+(1.077)+(17.009), (I-300)+(1.077)+(17.010), (I-300)+(1.077)+(17.011), (I-300)+(1.077)+(17.012), (I-300)+(1.077)+(18.001), (I-300)+(1.078)+(1.079), (I-300)+(1.078)+(1.080), (I-300)+(1.078)+(1.081), (I-300)+(1.078)+(1.082), (I-300)+(1.078)+(1.083), (I-300)+(1.078)+(1.084), (I-300)+(1.078)+(1.085), (I-300)+(1.078)+(1.086), (I-300)+(1.078)+(1.087), (I-300)+(1.078)+(1.088), (I-300)+(1.078)+(1.089), (I-300)+(1.078)+(1.090), (I-300)+(1.078)+(1.091), (I-300)+(1.078)+(1.092), (I-300)+(1.078)+(2.001), (I-300)+(1.078)+(2.002), (I-300)+(1.078)+(2.003), (I-300)+(1.078)+(2.004), (I-300)+(1.078)+(2.005), (I-300)+(1.078)+(2.006), (I-300)+(1.078)+(2.007), (I-300)+(1.078)+(2.008), (I-300)+(1.078)+(2.009), (I-300)+(1.078)+(2.010), (I-300)+(1.078)+(2.011), (I-300)+(1.078)+(2.012), (I-300)+(1.078)+(2.013), (I-300)+(1.078)+(2.014), (I-300)+(1.078)+(2.015), (I-300)+(1.078)+(2.016), (I-300)+(1.078)+(2.017), (I-300)+(1.078)+(2.018), (I-300)+(1.078)+(2.019), (I-300)+(1.078)+(2.020), (I-300)+(1.078)+(2.021), (I-300)+(1.078)+(2.022), (I-300)+(1.078)+(2.023), (I-300)+(1.078)+(2.024), (I-300)+(1.078)+(2.025), (I-300)+(1.078)+(2.026), (I-300)+(1.078)+(2.027), (I-300)+(1.078)+(2.028), (I-300)+(1.078)+(2.029), (I-300)+(1.078)+(2.030), (I-300)+(1.078)+(2.031), (I-300)+(1.078)+(2.032), (I-300)+(1.078)+(2.033), (I-300)+(1.078)+(2.034), (I-300)+(1.078)+(2.035), (I-300)+(1.078)+(2.036), (I-300)+(1.078)+(2.037), (I-300)+(1.078)+(2.038), (I-300)+(1.078)+(2.039), (I-300)+(1.078)+(2.040), (I-300)+(1.078)+(2.041), (I-300)+(1.078)+(2.042), (I-300)+(1.078)+(2.043), (I-300)+(1.078)+(2.044), (I-300)+(1.078)+(2.045), (I-300)+(1.078)+(2.046), (I-300)+(1.078)+(2.047), (I-300)+(1.078)+(2.048), (I-300)+(1.078)+(2.049), (I-300)+(1.078)+(2.050), (I-300)+(1.078)+(2.051), (I-300)+(1.078)+(2.052), (I-300)+(1.078)+(2.053), (I-300)+(1.078)+(2.054), (I-300)+(1.078)+(2.055), (I-300)+(1.078)+(2.056), (I-300)+(1.078)+(2.057), (I-300)+(1.078)+(2.058), (I-300)+(1.078)+(2.059), (I-300)+(1.078)+(3.001), (I-300)+(1.078)+(3.002), (I-300)+(1.078)+(3.003), (I-300)+(1.078)+(3.004), (I-300)+(1.078)+(3.005), (I-300)+(1.078)+(3.006), (I-300)+(1.078)+(3.007), (I-300)+(1.078)+(3.008), (I-300)+(1.078)+(3.009), (I-300)+(1.078)+(3.010), (I-300)+(1.078)+(3.011), (I-300)+(1.078)+(3.012), (I-300)+(1.078)+(3.013), (I-300)+(1.078)+(3.014), (I-300)+(1.078)+(3.015), (I-300)+(1.078)+(3.016), (I-300)+(1.078)+(3.017), (I-300)+(1.078)+(3.018), (I-300)+(1.078)+(3.019), (I-300)+(1.078)+(3.020), (I-300)+(1.078)+(3.021), (I-300)+(1.078)+(3.022), (I-300)+(1.078)+(3.023), (I-300)+(1.078)+(3.024), (I-300)+(1.078)+(3.025), (I-300)+(1.078)+(3.026), (I-300)+(1.078)+(3.027), (I-300)+(1.078)+(3.028), (I-300)+(1.078)+(3.029), (I-300)+(1.078)+(3.030), (I-300)+(1.078)+(3.031), (I-300)+(1.078)+(5.001), (I-300)+(1.078)+(5.002), (I-300)+(1.078)+(5.003), (I-300)+(1.078)+(5.004), (I-300)+(1.078)+(5.005), (I-300)+(1.078)+(5.006), (I-300)+(1.078)+(5.007), (I-300)+(1.078)+(5.008), (I-300)+(1.078)+(5.009), (I-300)+(1.078)+(5.010), (I-300)+(1.078)+(5.011), (I-300)+(1.078)+(5.012), (I-300)+(1.078)+(5.013), (I-300)+(1.078)+(5.014), (I-300)+(1.078)+(5.015), (I-300)+(1.078)+(5.016), (I-300)+(1.078)+(5.017), (I-300)+(1.078)+(5.018), (I-300)+(1.078)+(5.019), (I-300)+(1.078)+(5.020), (I-300)+(1.078)+(5.021), (I-300)+(1.078)+(5.022), (I-300)+(1.078)+(5.023), (I-300)+(1.078)+(6.001), (I-300)+(1.078)+(6.002), (I-300)+(1.078)+(6.003), (I-300)+(1.078)+(6.004), (I-300)+(1.078)+(7.001), (I-300)+(1.078)+(7.002), (I-300)+(1.078)+(7.003), (I-300)+(1.078)+(7.004), (I-300)+(1.078)+(7.005), (I-300)+(1.078)+(7.006), (I-300)+(1.078)+(9.001), (I-300)+(1.078)+(9.002), (I-300)+(1.078)+(9.003), (I-300)+(1.078)+(9.004), (I-300)+(1.078)+(9.005), (I-300)+(1.078)+(9.006), (I-300)+(1.078)+(9.007), (I-300)+(1.078)+(9.008), (I-300)+(1.078)+(9.009), (I-300)+(1.078)+(14.001), (I-300)+(1.078)+(14.002), (I-300)+(1.078)+(15.008), (I-300)+(1.078)+(15.011), (I-300)+(1.078)+(15.012), (I-300)+(1.078)+(15.016), (I-300)+(1.078)+(15.025), (I-300)+(1.078)+(15.027), (I-300)+(1.078)+(15.047), (I-300)+(1.078)+(15.063), (I-300)+(1.078)+(15.064), (I-300)+(1.078)+(16.001), (I-300)+(1.078)+(16.002), (I-300)+(1.078)+(16.003), (I-300)+(1.078)+(16.004), (I-300)+(1.078)+(16.005), (I-300)+(1.078)+(16.006), (I-300)+(1.078)+(16.007), (I-300)+(1.078)+(16.008), (I-300)+(1.078)+(17.001), (I-300)+(1.078)+(17.002), (I-300)+(1.078)+(17.003), (I-300)+(1.078)+(17.004), (I-300)+(1.078)+(17.005), (I-300)+(1.078)+(17.006), (I-300)+(1.078)+(17.007), (I-300)+(1.078)+(17.008), (I-300)+(1.078)+(17.009), (I-300)+(1.078)+(17.010), (I-300)+(1.078)+(17.011), (I-300)+(1.078)+(17.012), (I-300)+(1.078)+(18.001), (I-300)+(1.079)+(1.080), (I-300)+(1.079)+(1.081), (I-300)+(1.079)+(1.082), (I-300)+(1.079)+(1.083), (I-300)+(1.079)+(1.084), (I-300)+(1.079)+(1.085), (I-300)+(1.079)+(1.086), (I-300)+(1.079)+(1.087), (I-300)+(1.079)+(1.088), (I-300)+(1.079)+(1.089), (I-300)+(1.079)+(1.090), (I-300)+(1.079)+(1.091), (I-300)+(1.079)+(1.092), (I-300)+(1.079)+(2.001), (I-300)+(1.079)+(2.002), (I-300)+(1.079)+(2.003), (I-300)+(1.079)+(2.004), (I-300)+(1.079)+(2.005), (I-300)+(1.079)+(2.006), (I-300)+(1.079)+(2.007), (I-300)+(1.079)+(2.008), (I-300)+(1.079)+(2.009), (I-300)+(1.079)+(2.010), (I-300)+(1.079)+(2.011), (I-300)+(1.079)+(2.012), (I-300)+(1.079)+(2.013), (I-300)+(1.079)+(2.014), (I-300)+(1.079)+(2.015), (I-300)+(1.079)+(2.016), (I-300)+(1.079)+(2.017), (I-300)+(1.079)+(2.018), (I-300)+(1.079)+(2.019), (I-300)+(1.079)+(2.020), (I-300)+(1.079)+(2.021), (I-300)+(1.079)+(2.022), (I-300)+(1.079)+(2.023), (I-300)+(1.079)+(2.024), (I-300)+(1.079)+(2.025), (I-300)+(1.079)+(2.026), (I-300)+(1.079)+(2.027), (I-300)+(1.079)+(2.028), (I-300)+(1.079)+(2.029), (I-300)+(1.079)+(2.030), (I-300)+(1.079)+(2.031), (I-300)+(1.079)+(2.032), (I-300)+(1.079)+(2.033), (I-300)+(1.079)+(2.034), (I-300)+(1.079)+(2.035), (I-300)+(1.079)+(2.036), (I-300)+(1.079)+(2.037), (I-300)+(1.079)+(2.038), (I-300)+(1.079)+(2.039), (I-300)+(1.079)+(2.040), (I-300)+(1.079)+(2.041), (I-300)+(1.079)+(2.042), (I-300)+(1.079)+(2.043), (I-300)+(1.079)+(2.044), (I-300)+(1.079)+(2.045), (I-300)+(1.079)+(2.046), (I-300)+(1.079)+(2.047), (I-300)+(1.079)+(2.048), (I-300)+(1.079)+(2.049), (I-300)+(1.079)+(2.050), (I-300)+(1.079)+(2.051), (I-300)+(1.079)+(2.052), (I-300)+(1.079)+(2.053), (I-300)+(1.079)+(2.054), (I-300)+(1.079)+(2.055), (I-300)+(1.079)+(2.056), (I-300)+(1.079)+(2.057), (I-300)+(1.079)+(2.058), (I-300)+(1.079)+(2.059), (I-300)+(1.079)+(3.001), (I-300)+(1.079)+(3.002), (I-300)+(1.079)+(3.003), (I-300)+(1.079)+(3.004), (I-300)+(1.079)+(3.005), (I-300)+(1.079)+(3.006), (I-300)+(1.079)+(3.007), (I-300)+(1.079)+(3.008), (I-300)+(1.079)+(3.009), (I-300)+(1.079)+(3.010), (I-300)+(1.079)+(3.011), (I-300)+(1.079)+(3.012), (I-300)+(1.079)+(3.013), (I-300)+(1.079)+(3.014), (I-300)+(1.079)+(3.015), (I-300)+(1.079)+(3.016), (I-300)+(1.079)+(3.017), (I-300)+(1.079)+(3.018), (I-300)+(1.079)+(3.019), (I-300)+(1.079)+(3.020), (I-300)+(1.079)+(3.021), (I-300)+(1.079)+(3.022), (I-300)+(1.079)+(3.023), (I-300)+(1.079)+(3.024), (I-300)+(1.079)+(3.025), (I-300)+(1.079)+(3.026), (I-300)+(1.079)+(3.027), (I-300)+(1.079)+(3.028), (I-300)+(1.079)+(3.029), (I-300)+(1.079)+(3.030), (I-300)+(1.079)+(3.031), (I-300)+(1.079)+(5.001), (I-300)+(1.079)+(5.002), (I-300)+(1.079)+(5.003), (I-300)+(1.079)+(5.004), (I-300)+(1.079)+(5.005), (I-300)+(1.079)+(5.006), (I-300)+(1.079)+(5.007), (I-300)+(1.079)+(5.008), (I-300)+(1.079)+(5.009), (I-300)+(1.079)+(5.010), (I-300)+(1.079)+(5.011), (I-300)+(1.079)+(5.012), (I-300)+(1.079)+(5.013), (I-300)+(1.079)+(5.014), (I-300)+(1.079)+(5.015), (I-300)+(1.079)+(5.016), (I-300)+(1.079)+(5.017), (I-300)+(1.079)+(5.018), (I-300)+(1.079)+(5.019), (I-300)+(1.079)+(5.020), (I-300)+(1.079)+(5.021), (I-300)+(1.079)+(5.022), (I-300)+(1.079)+(5.023), (I-300)+(1.079)+(6.001), (I-300)+(1.079)+(6.002), (I-300)+(1.079)+(6.003), (I-300)+(1.079)+(6.004), (I-300)+(1.079)+(7.001), (I-300)+(1.079)+(7.002), (I-300)+(1.079)+(7.003), (I-300)+(1.079)+(7.004), (I-300)+(1.079)+(7.005), (I-300)+(1.079)+(7.006), (I-300)+(1.079)+(9.001), (I-300)+(1.079)+(9.002), (I-300)+(1.079)+(9.003), (I-300)+(1.079)+(9.004), (I-300)+(1.079)+(9.005), (I-300)+(1.079)+(9.006), (I-300)+(1.079)+(9.007), (I-300)+(1.079)+(9.008), (I-300)+(1.079)+(9.009), (I-300)+(1.079)+(14.001), (I-300)+(1.079)+(14.002), (I-300)+(1.079)+(15.008), (I-300)+(1.079)+(15.011), (I-300)+(1.079)+(15.012), (I-300)+(1.079)+(15.016), (I-300)+(1.079)+(15.025), (I-300)+(1.079)+(15.027), (I-300)+(1.079)+(15.047), (I-300)+(1.079)+(15.063), (I-300)+(1.079)+(15.064), (I-300)+(1.079)+(16.001), (I-300)+(1.079)+(16.002), (I-300)+(1.079)+(16.003), (I-300)+(1.079)+(16.004), (I-300)+(1.079)+(16.005), (I-300)+(1.079)+(16.006), (I-300)+(1.079)+(16.007), (I-300)+(1.079)+(16.008), (I-300)+(1.079)+(17.001), (I-300)+(1.079)+(17.002), (I-300)+(1.079)+(17.003), (I-300)+(1.079)+(17.004), (I-300)+(1.079)+(17.005), (I-300)+(1.079)+(17.006), (I-300)+(1.079)+(17.007), (I-300)+(1.079)+(17.008), (I-300)+(1.079)+(17.009), (I-300)+(1.079)+(17.010), (I-300)+(1.079)+(17.011), (I-300)+(1.079)+(17.012), (I-300)+(1.079)+(18.001), (I-300)+(1.080)+(1.081), (I-300)+(1.080)+(1.082), (I-300)+(1.080)+(1.083), (I-300)+(1.080)+(1.084), (I-300)+(1.080)+(1.085), (I-300)+(1.080)+(1.086), (I-300)+(1.080)+(1.087), (I-300)+(1.080)+(1.088), (I-300)+(1.080)+(1.089), (I-300)+(1.080)+(1.090), (I-300)+(1.080)+(1.091), (I-300)+(1.080)+(1.092), (I-300)+(1.080)+(2.001), (I-300)+(1.080)+(2.002), (I-300)+(1.080)+(2.003), (I-300)+(1.080)+(2.004), (I-300)+(1.080)+(2.005), (I-300)+(1.080)+(2.006), (I-300)+(1.080)+(2.007), (I-300)+(1.080)+(2.008), (I-300)+(1.080)+(2.009), (I-300)+(1.080)+(2.010), (I-300)+(1.080)+(2.011), (I-300)+(1.080)+(2.012), (I-300)+(1.080)+(2.013), (I-300)+(1.080)+(2.014), (I-300)+(1.080)+(2.015), (I-300)+(1.080)+(2.016), (I-300)+(1.080)+(2.017), (I-300)+(1.080)+(2.018), (I-300)+(1.080)+(2.019), (I-300)+(1.080)+(2.020), (I-300)+(1.080)+(2.021), (I-300)+(1.080)+(2.022), (I-300)+(1.080)+(2.023), (I-300)+(1.080)+(2.024), (I-300)+(1.080)+(2.025), (I-300)+(1.080)+(2.026), (I-300)+(1.080)+(2.027), (I-300)+(1.080)+(2.028), (I-300)+(1.080)+(2.029), (I-300)+(1.080)+(2.030), (I-300)+(1.080)+(2.031), (I-300)+(1.080)+(2.032), (I-300)+(1.080)+(2.033), (I-300)+(1.080)+(2.034), (I-300)+(1.080)+(2.035), (I-300)+(1.080)+(2.036), (I-300)+(1.080)+(2.037), (I-300)+(1.080)+(2.038), (I-300)+(1.080)+(2.039), (I-300)+(1.080)+(2.040), (I-300)+(1.080)+(2.041), (I-300)+(1.080)+(2.042), (I-300)+(1.080)+(2.043), (I-300)+(1.080)+(2.044), (I-300)+(1.080)+(2.045), (I-300)+(1.080)+(2.046), (I-300)+(1.080)+(2.047), (I-300)+(1.080)+(2.048), (I-300)+(1.080)+(2.049), (I-300)+(1.080)+(2.050), (I-300)+(1.080)+(2.051), (I-300)+(1.080)+(2.052), (I-300)+(1.080)+(2.053), (I-300)+(1.080)+(2.054), (I-300)+(1.080)+(2.055), (I-300)+(1.080)+(2.056), (I-300)+(1.080)+(2.057), (I-300)+(1.080)+(2.058), (I-300)+(1.080)+(2.059), (I-300)+(1.080)+(3.001), (I-300)+(1.080)+(3.002), (I-300)+(1.080)+(3.003), (I-300)+(1.080)+(3.004), (I-300)+(1.080)+(3.005), (I-300)+(1.080)+(3.006), (I-300)+(1.080)+(3.007), (I-300)+(1.080)+(3.008), (I-300)+(1.080)+(3.009), (I-300)+(1.080)+(3.010), (I-300)+(1.080)+(3.011), (I-300)+(1.080)+(3.012), (I-300)+(1.080)+(3.013), (I-300)+(1.080)+(3.014), (I-300)+(1.080)+(3.015), (I-300)+(1.080)+(3.016), (I-300)+(1.080)+(3.017), (I-300)+(1.080)+(3.018), (I-300)+(1.080)+(3.019), (I-300)+(1.080)+(3.020), (I-300)+(1.080)+(3.021), (I-300)+(1.080)+(3.022), (I-300)+(1.080)+(3.023), (I-300)+(1.080)+(3.024), (I-300)+(1.080)+(3.025), (I-300)+(1.080)+(3.026), (I-300)+(1.080)+(3.027), (I-300)+(1.080)+(3.028), (I-300)+(1.080)+(3.029), (I-300)+(1.080)+(3.030), (I-300)+(1.080)+(3.031), (I-300)+(1.080)+(5.001), (I-300)+(1.080)+(5.002), (I-300)+(1.080)+(5.003), (I-300)+(1.080)+(5.004), (I-300)+(1.080)+(5.005), (I-300)+(1.080)+(5.006), (I-300)+(1.080)+(5.007), (I-300)+(1.080)+(5.008), (I-300)+(1.080)+(5.009), (I-300)+(1.080)+(5.010), (I-300)+(1.080)+(5.011), (I-300)+(1.080)+(5.012), (I-300)+(1.080)+(5.013), (I-300)+(1.080)+(5.014), (I-300)+(1.080)+(5.015), (I-300)+(1.080)+(5.016), (I-300)+(1.080)+(5.017), (I-300)+(1.080)+(5.018), (I-300)+(1.080)+(5.019), (I-300)+(1.080)+(5.020), (I-300)+(1.080)+(5.021), (I-300)+(1.080)+(5.022), (I-300)+(1.080)+(5.023), (I-300)+(1.080)+(6.001), (I-300)+(1.080)+(6.002), (I-300)+(1.080)+(6.003), (I-300)+(1.080)+(6.004), (I-300)+(1.080)+(7.001), (I-300)+(1.080)+(7.002), (I-300)+(1.080)+(7.003), (I-300)+(1.080)+(7.004), (I-300)+(1.080)+(7.005), (I-300)+(1.080)+(7.006), (I-300)+(1.080)+(9.001), (I-300)+(1.080)+(9.002), (I-300)+(1.080)+(9.003), (I-300)+(1.080)+(9.004), (I-300)+(1.080)+(9.005), (I-300)+(1.080)+(9.006), (I-300)+(1.080)+(9.007), (I-300)+(1.080)+(9.008), (I-300)+(1.080)+(9.009), (I-300)+(1.080)+(14.001), (I-300)+(1.080)+(14.002), (I-300)+(1.080)+(15.008), (I-300)+(1.080)+(15.011), (I-300)+(1.080)+(15.012), (I-300)+(1.080)+(15.016), (I-300)+(1.080)+(15.025), (I-300)+(1.080)+(15.027), (I-300)+(1.080)+(15.047), (I-300)+(1.080)+(15.063), (I-300)+(1.080)+(15.064), (I-300)+(1.080)+(16.001), (I-300)+(1.080)+(16.002), (I-300)+(1.080)+(16.003), (I-300)+(1.080)+(16.004), (I-300)+(1.080)+(16.005), (I-300)+(1.080)+(16.006), (I-300)+(1.080)+(16.007), (I-300)+(1.080)+(16.008), (I-300)+(1.080)+(17.001), (I-300)+(1.080)+(17.002), (I-300)+(1.080)+(17.003), (I-300)+(1.080)+(17.004), (I-300)+(1.080)+(17.005), (I-300)+(1.080)+(17.006), (I-300)+(1.080)+(17.007), (I-300)+(1.080)+(17.008), (I-300)+(1.080)+(17.009), (I-300)+(1.080)+(17.010), (I-300)+(1.080)+(17.011), (I-300)+(1.080)+(17.012), (I-300)+(1.080)+(18.001),
(I-300)+(1.081)+(1.082), (I-300)+(1.081)+(1.083), (I-300)+(1.081)+(1.084), (I-300)+(1.081)+(1.085), (I-300)+(1.081)+(1.086), (I-300)+(1.081)+(1.087), (I-300)+(1.081)+(1.088), (I-300)+(1.081)+(1.089), (I-300)+(1.081)+(1.090), (I-300)+(1.081)+(1.091), (I-300)+(1.081)+(1.092), (I-300)+(1.081)+(2.001), (I-300)+(1.081)+(2.002), (I-300)+(1.081)+(2.003), (I-300)+(1.081)+(2.004), (I-300)+(1.081)+(2.005), (I-300)+(1.081)+(2.006), (I-300)+(1.081)+(2.007), (I-300)+(1.081)+(2.008), (I-300)+(1.081)+(2.009), (I-300)+(1.081)+(2.010), (I-300)+(1.081)+(2.011), (I-300)+(1.081)+(2.012), (I-300)+(1.081)+(2.013), (I-300)+(1.081)+(2.014), (I-300)+(1.081)+(2.015), (I-300)+(1.081)+(2.016), (I-300)+(1.081)+(2.017), (I-300)+(1.081)+(2.018), (I-300)+(1.081)+(2.019), (I-300)+(1.081)+(2.020), (I-300)+(1.081)+(2.021), (I-300)+(1.081)+(2.022), (I-300)+(1.081)+(2.023), (I-300)+(1.081)+(2.024), (I-300)+(1.081)+(2.025), (I-300)+(1.081)+(2.026), (I-300)+(1.081)+(2.027), (I-300)+(1.081)+(2.028), (I-300)+(1.081)+(2.029), (I-300)+(1.081)+(2.030), (I-300)+(1.081)+(2.031), (I-300)+(1.081)+(2.032), (I-300)+(1.081)+(2.033), (I-300)+(1.081)+(2.034), (I-300)+(1.081)+(2.035), (I-300)+(1.081)+(2.036), (I-300)+(1.081)+(2.037), (I-300)+(1.081)+(2.038), (I-300)+(1.081)+(2.039), (I-300)+(1.081)+(2.040), (I-300)+(1.081)+(2.041), (I-300)+(1.081)+(2.042), (I-300)+(1.081)+(2.043), (I-300)+(1.081)+(2.044), (I-300)+(1.081)+(2.045), (I-300)+(1.081)+(2.046), (I-300)+(1.081)+(2.047), (I-300)+(1.081)+(2.048), (I-300)+(1.081)+(2.049), (I-300)+(1.081)+(2.050), (I-300)+(1.081)+(2.051), (I-300)+(1.081)+(2.052), (I-300)+(1.081)+(2.053), (I-300)+(1.081)+(2.054), (I-300)+(1.081)+(2.055), (I-300)+(1.081)+(2.056), (I-300)+(1.081)+(2.057), (I-300)+(1.081)+(2.058), (I-300)+(1.081)+(2.059), (I-300)+(1.081)+(3.001), (I-300)+(1.081)+(3.002), (I-300)+(1.081)+(3.003), (I-300)+(1.081)+(3.004), (I-300)+(1.081)+(3.005), (I-300)+(1.081)+(3.006), (I-300)+(1.081)+(3.007), (I-300)+(1.081)+(3.008), (I-300)+(1.081)+(3.009), (I-300)+(1.081)+(3.010), (I-300)+(1.081)+(3.011), (I-300)+(1.081)+(3.012), (I-300)+(1.081)+(3.013), (I-300)+(1.081)+(3.014), (I-300)+(1.081)+(3.015), (I-300)+(1.081)+(3.016), (I-300)+(1.081)+(3.017), (I-300)+(1.081)+(3.018), (I-300)+(1.081)+(3.019), (I-300)+(1.081)+(3.020), (I-300)+(1.081)+(3.021), (I-300)+(1.081)+(3.022), (I-300)+(1.081)+(3.023), (I-300)+(1.081)+(3.024), (I-300)+(1.081)+(3.025), (I-300)+(1.081)+(3.026), (I-300)+(1.081)+(3.027), (I-300)+(1.081)+(3.028), (I-300)+(1.081)+(3.029), (I-300)+(1.081)+(3.030), (I-300)+(1.081)+(3.031), (I-300)+(1.081)+(5.001), (I-300)+(1.081)+(5.002), (I-300)+(1.081)+(5.003), (I-300)+(1.081)+(5.004), (I-300)+(1.081)+(5.005), (I-300)+(1.081)+(5.006), (I-300)+(1.081)+(5.007), (I-300)+(1.081)+(5.008), (I-300)+(1.081)+(5.009), (I-300)+(1.081)+(5.010), (I-300)+(1.081)+(5.011), (I-300)+(1.081)+(5.012), (I-300)+(1.081)+(5.013), (I-300)+(1.081)+(5.014), (I-300)+(1.081)+(5.015), (I-300)+(1.081)+(5.016), (I-300)+(1.081)+(5.017), (I-300)+(1.081)+(5.018), (I-300)+(1.081)+(5.019), (I-300)+(1.081)+(5.020), (I-300)+(1.081)+(5.021), (I-300)+(1.081)+(5.022), (I-300)+(1.081)+(5.023), (I-300)+(1.081)+(6.001), (I-300)+(1.081)+(6.002), (I-300)+(1.081)+(6.003), (I-300)+(1.081)+(6.004), (I-300)+(1.081)+(7.001), (I-300)+(1.081)+(7.002), (I-300)+(1.081)+(7.003), (I-300)+(1.081)+(7.004), (I-300)+(1.081)+(7.005), (I-300)+(1.081)+(7.006), (I-300)+(1.081)+(9.001), (I-300)+(1.081)+(9.002), (I-300)+(1.081)+(9.003), (I-300)+(1.081)+(9.004), (I-300)+(1.081)+(9.005), (I-300)+(1.081)+(9.006), (I-300)+(1.081)+(9.007), (I-300)+(1.081)+(9.008), (I-300)+(1.081)+(9.009), (I-300)+(1.081)+(14.001), (I-300)+(1.081)+(14.002), (I-300)+(1.081)+(15.008), (I-300)+(1.081)+(15.011), (I-300)+(1.081)+(15.012), (I-300)+(1.081)+(15.016), (I-300)+(1.081)+(15.025), (I-300)+(1.081)+(15.027), (I-300)+(1.081)+(15.047), (I-300)+(1.081)+(15.063), (I-300)+(1.081)+(15.064), (I-300)+(1.081)+(16.001), (I-300)+(1.081)+(16.002), (I-300)+(1.081)+(16.003), (I-300)+(1.081)+(16.004), (I-300)+(1.081)+(16.005), (I-300)+(1.081)+(16.006), (I-300)+(1.081)+(16.007), (I-300)+(1.081)+(16.008), (I-300)+(1.081)+(17.001), (I-300)+(1.081)+(17.002), (I-300)+(1.081)+(17.003), (I-300)+(1.081)+(17.004), (I-300)+(1.081)+(17.005), (I-300)+(1.081)+(17.006), (I-300)+(1.081)+(17.007), (I-300)+(1.081)+(17.008), (I-300)+(1.081)+(17.009), (I-300)+(1.081)+(17.010), (I-300)+(1.081)+(17.011), (I-300)+(1.081)+(17.012), (I-300)+(1.081)+(18.001),
(I-300)+(1.082)+(1.083), (I-300)+(1.082)+(1.084), (I-300)+(1.082)+(1.085), (I-300)+(1.082)+(1.086), (I-300)+(1.082)+(1.087), (I-300)+(1.082)+(1.088), (I-300)+(1.082)+(1.089), (I-300)+(1.082)+(1.090), (I-300)+(1.082)+(1.091), (I-300)+(1.082)+(1.092), (I-300)+(1.082)+(2.001), (I-300)+(1.082)+(2.002), (I-300)+(1.082)+(2.003), (I-300)+(1.082)+(2.004), (I-300)+(1.082)+(2.005), (I-300)+(1.082)+(2.006), (I-300)+(1.082)+(2.007), (I-300)+(1.082)+(2.008), (I-300)+(1.082)+(2.009), (I-300)+(1.082)+(2.010), (I-300)+(1.082)+(2.011), (I-300)+(1.082)+(2.012), (I-300)+(1.082)+(2.013), (I-300)+(1.082)+(2.014), (I-300)+(1.082)+(2.015), (I-300)+(1.082)+(2.016), (I-300)+(1.082)+(2.017), (I-300)+(1.082)+(2.018), (I-300)+(1.082)+(2.019), (I-300)+(1.082)+(2.020), (I-300)+(1.082)+(2.021), (I-300)+(1.082)+(2.022), (I-300)+(1.082)+(2.023), (I-300)+(1.082)+(2.024), (I-300)+(1.082)+(2.025), (I-300)+(1.082)+(2.026), (I-300)+(1.082)+(2.027), (I-300)+(1.082)+(2.028), (I-300)+(1.082)+(2.029), (I-300)+(1.082)+(2.030), (I-300)+(1.082)+(2.031), (I-300)+(1.082)+(2.032), (I-300)+(1.082)+(2.033), (I-300)+(1.082)+(2.034), (I-300)+(1.082)+(2.035), (I-300)+(1.082)+(2.036), (I-300)+(1.082)+(2.037), (I-300)+(1.082)+(2.038), (I-300)+(1.082)+(2.039), (I-300)+(1.082)+(2.040), (I-300)+(1.082)+(2.041), (I-300)+(1.082)+(2.042), (I-300)+(1.082)+(2.043), (I-300)+(1.082)+(2.044), (I-300)+(1.082)+(2.045), (I-300)+(1.082)+(2.046), (I-300)+(1.082)+(2.047), (I-300)+(1.082)+(2.048), (I-300)+(1.082)+(2.049), (I-300)+(1.082)+(2.050), (I-300)+(1.082)+(2.051), (I-300)+(1.082)+(2.052), (I-300)+(1.082)+(2.053), (I-300)+(1.082)+(2.054), (I-300)+(1.082)+(2.055), (I-300)+(1.082)+(2.056), (I-300)+(1.082)+(2.057), (I-300)+(1.082)+(2.058), (I-300)+(1.082)+(2.059), (I-300)+(1.082)+(3.001), (I-300)+(1.082)+(3.002), (I-300)+(1.082)+(3.003), (I-300)+(1.082)+(3.004), (I-300)+(1.082)+(3.005), (I-300)+(1.082)+(3.006), (I-300)+(1.082)+(3.007), (I-300)+(1.082)+(3.008), (I-300)+(1.082)+(3.009), (I-300)+(1.082)+(3.010), (I-300)+(1.082)+(3.011), (I-300)+(1.082)+(3.012), (I-300)+(1.082)+(3.013), (I-300)+(1.082)+(3.014), (I-300)+(1.082)+(3.015), (I-300)+(1.082)+(3.016), (I-300)+(1.082)+(3.017), (I-300)+(1.082)+(3.018), (I-300)+(1.082)+(3.019), (I-300)+(1.082)+(3.020), (I-300)+(1.082)+(3.021), (I-300)+(1.082)+(3.022), (I-300)+(1.082)+(3.023), (I-300)+(1.082)+(3.024), (I-300)+(1.082)+(3.025), (I-300)+(1.082)+(3.026), (I-300)+(1.082)+(3.027), (I-300)+(1.082)+(3.028), (I-300)+(1.082)+(3.029), (I-300)+(1.082)+(3.030), (I-300)+(1.082)+(3.031), (I-300)+(1.082)+(5.001), (I-300)+(1.082)+(5.002), (I-300)+(1.082)+(5.003), (I-300)+(1.082)+(5.004), (I-300)+(1.082)+(5.005), (I-300)+(1.082)+(5.006), (I-300)+(1.082)+(5.007), (I-300)+(1.082)+(5.008), (I-300)+(1.082)+(5.009), (I-300)+(1.082)+(5.010), (I-300)+(1.082)+(5.011), (I-300)+(1.082)+(5.012), (I-300)+(1.082)+(5.013), (I-300)+(1.082)+(5.014), (I-300)+(1.082)+(5.015), (I-300)+(1.082)+(5.016), (I-300)+(1.082)+(5.017), (I-300)+(1.082)+(5.018), (I-300)+(1.082)+(5.019), (I-300)+(1.082)+(5.020), (I-300)+(1.082)+(5.021), (I-300)+(1.082)+(5.022), (I-300)+(1.082)+(5.023), (I-300)+(1.082)+(6.001), (I-300)+(1.082)+(6.002), (I-300)+(1.082)+(6.003), (I-300)+(1.082)+(6.004), (I-300)+(1.082)+(7.001), (I-300)+(1.082)+(7.002), (I-300)+(1.082)+(7.003), (I-300)+(1.082)+(7.004), (I-300)+(1.082)+(7.005), (I-300)+(1.082)+(7.006), (I-300)+(1.082)+(9.001), (I-300)+(1.082)+(9.002), (I-300)+(1.082)+(9.003), (I-300)+(1.082)+(9.004), (I-300)+(1.082)+(9.005), (I-300)+(1.082)+(9.006), (I-300)+(1.082)+(9.007), (I-300)+(1.082)+(9.008), (I-300)+(1.082)+(9.009), (I-300)+(1.082)+(14.001), (I-300)+(1.082)+(14.002), (I-300)+(1.082)+(15.008), (I-300)+(1.082)+(15.011), (I-300)+(1.082)+(15.012), (I-300)+(1.082)+(15.016), (I-300)+(1.082)+(15.025), (I-300)+(1.082)+(15.027), (I-300)+(1.082)+(15.047), (I-300)+(1.082)+(15.063), (I-300)+(1.082)+(15.064), (I-300)+(1.082)+(16.001), (I-300)+(1.082)+(16.002), (I-300)+(1.082)+(16.003), (I-300)+(1.082)+(16.004), (I-300)+(1.082)+(16.005), (I-300)+(1.082)+(16.006), (I-300)+(1.082)+(16.007), (I-300)+(1.082)+(16.008), (I-300)+(1.082)+(17.001), (I-300)+(1.082)+(17.002), (I-300)+(1.082)+(17.003), (I-300)+(1.082)+(17.004), (I-300)+(1.082)+(17.005), (I-300)+(1.082)+(17.006), (I-300)+(1.082)+(17.007), (I-300)+(1.082)+(17.008), (I-300)+(1.082)+(17.009), (I-300)+(1.082)+(17.010), (I-300)+(1.082)+(17.011), (I-300)+(1.082)+(17.012), (I-300)+(1.082)+(18.001), (I-300)+(1.083)+(1.084), (I-300)+(1.083)+(1.085), (I-300)+(1.083)+(1.086), (I-300)+(1.083)+(1.087), (I-300)+(1.083)+(1.088), (I-300)+(1.083)+(1.089), (I-300)+(1.083)+(1.090), (I-300)+(1.083)+(1.091), (I-300)+(1.083)+(1.092), (I-300)+(1.083)+(2.001), (I-300)+(1.083)+(2.002), (I-300)+(1.083)+(2.003), (I-300)+(1.083)+(2.004), (I-300)+(1.083)+(2.005), (I-300)+(1.083)+(2.006), (I-300)+(1.083)+(2.007), (I-300)+(1.083)+(2.008), (I-300)+(1.083)+(2.009), (I-300)+(1.083)+(2.010), (I-300)+(1.083)+(2.011), (I-300)+(1.083)+(2.012), (I-300)+(1.083)+(2.013), (I-300)+(1.083)+(2.014), (I-300)+(1.083)+(2.015), (I-300)+(1.083)+(2.016), (I-300)+(1.083)+(2.017), (I-300)+(1.083)+(2.018), (I-300)+(1.083)+(2.019), (I-300)+(1.083)+(2.020), (I-300)+(1.083)+(2.021), (I-300)+(1.083)+(2.022), (I-300)+(1.083)+(2.023), (I-300)+(1.083)+(2.024), (I-300)+(1.083)+(2.025), (I-300)+(1.083)+(2.026), (I-300)+(1.083)+(2.027), (I-300)+(1.083)+(2.028), (I-300)+(1.083)+(2.029), (I-300)+(1.083)+(2.030), (I-300)+(1.083)+(2.031), (I-300)+(1.083)+(2.032), (I-300)+(1.083)+(2.033), (I-300)+(1.083)+(2.034), (I-300)+(1.083)+(2.035), (I-300)+(1.083)+(2.036), (I-300)+(1.083)+(2.037), (I-300)+(1.083)+(2.038), (I-300)+(1.083)+(2.039), (I-300)+(1.083)+(2.040), (I-300)+(1.083)+(2.041), (I-300)+(1.083)+(2.042), (I-300)+(1.083)+(2.043), (I-300)+(1.083)+(2.044), (I-300)+(1.083)+(2.045), (I-300)+(1.083)+(2.046), (I-300)+(1.083)+(2.047), (I-300)+(1.083)+(2.048), (I-300)+(1.083)+(2.049), (I-300)+(1.083)+(2.050), (I-300)+(1.083)+(2.051), (I-300)+(1.083)+(2.052), (I-300)+(1.083)+(2.053), (I-300)+(1.083)+(2.054), (I-300)+(1.083)+(2.055), (I-300)+(1.083)+(2.056), (I-300)+(1.083)+(2.057), (I-300)+(1.083)+(2.058), (I-300)+(1.083)+(2.059), (I-300)+(1.083)+(3.001), (I-300)+(1.083)+(3.002), (I-300)+(1.083)+(3.003), (I-300)+(1.083)+(3.004), (I-300)+(1.083)+(3.005), (I-300)+(1.083)+(3.006), (I-300)+(1.083)+(3.007), (I-300)+(1.083)+(3.008), (I-300)+(1.083)+(3.009), (I-300)+(1.083)+(3.010), (I-300)+(1.083)+(3.011), (I-300)+(1.083)+(3.012), (I-300)+(1.083)+(3.013), (I-300)+(1.083)+(3.014), (I-300)+(1.083)+(3.015), (I-300)+(1.083)+(3.016), (I-300)+(1.083)+(3.017), (I-300)+(1.083)+(3.018), (I-300)+(1.083)+(3.019), (I-300)+(1.083)+(3.020), (I-300)+(1.083)+(3.021), (I-300)+(1.083)+(3.022), (I-300)+(1.083)+(3.023), (I-300)+(1.083)+(3.024), (I-300)+(1.083)+(3.025), (I-300)+(1.083)+(3.026), (I-300)+(1.083)+(3.027), (I-300)+(1.083)+(3.028), (I-300)+(1.083)+(3.029), (I-300)+(1.083)+(3.030), (I-300)+(1.083)+(3.031), (I-300)+(1.083)+(5.001), (I-300)+(1.083)+(5.002), (I-300)+(1.083)+(5.003), (I-300)+(1.083)+(5.004), (I-300)+(1.083)+(5.005), (I-300)+(1.083)+(5.006), (I-300)+(1.083)+(5.007), (I-300)+(1.083)+(5.008), (I-300)+(1.083)+(5.009), (I-300)+(1.083)+(5.010), (I-300)+(1.083)+(5.011), (I-300)+(1.083)+(5.012), (I-300)+(1.083)+(5.013), (I-300)+(1.083)+(5.014), (I-300)+(1.083)+(5.015), (I-300)+(1.083)+(5.016), (I-300)+(1.083)+(5.017), (I-300)+(1.083)+(5.018), (I-300)+(1.083)+(5.019), (I-300)+(1.083)+(5.020), (I-300)+(1.083)+(5.021), (I-300)+(1.083)+(5.022), (I-300)+(1.083)+(5.023), (I-300)+(1.083)+(6.001), (I-300)+(1.083)+(6.002), (I-300)+(1.083)+(6.003), (I-300)+(1.083)+(6.004), (I-300)+(1.083)+(7.001), (I-300)+(1.083)+(7.002), (I-300)+(1.083)+(7.003), (I-300)+(1.083)+(7.004), (I-300)+(1.083)+(7.005), (I-300)+(1.083)+(7.006), (I-300)+(1.083)+(9.001), (I-300)+(1.083)+(9.002), (I-300)+(1.083)+(9.003), (I-300)+(1.083)+(9.004), (I-300)+(1.083)+(9.005), (I-300)+(1.083)+(9.006), (I-300)+(1.083)+(9.007), (I-300)+(1.083)+(9.008), (I-300)+(1.083)+(9.009), (I-300)+(1.083)+(14.001), (I-300)+(1.083)+(14.002), (I-300)+(1.083)+(15.008), (I-300)+(1.083)+(15.011), (I-300)+(1.083)+(15.012), (I-300)+(1.083)+(15.016), (I-300)+(1.083)+(15.025), (I-300)+(1.083)+(15.027), (I-300)+(1.083)+(15.047), (I-300)+(1.083)+(15.063), (I-300)+(1.083)+(15.064), (I-300)+(1.083)+(16.001), (I-300)+(1.083)+(16.002), (I-300)+(1.083)+(16.003), (I-300)+(1.083)+(16.004), (I-300)+(1.083)+(16.005), (I-300)+(1.083)+(16.006), (I-300)+(1.083)+(16.007), (I-300)+(1.083)+(16.008), (I-300)+(1.083)+(17.001), (I-300)+(1.083)+(17.002), (I-300)+(1.083)+(17.003), (I-300)+(1.083)+(17.004), (I-300)+(1.083)+(17.005), (I-300)+(1.083)+(17.006), (I-300)+(1.083)+(17.007), (I-300)+(1.083)+(17.008), (I-300)+(1.083)+(17.009), (I-300)+(1.083)+(17.010), (I-300)+(1.083)+(17.011), (I-300)+(1.083)+(17.012), (I-300)+(1.083)+(18.001), (I-300)+(1.084)+(1.085), (I-300)+(1.084)+(1.086), (I-300)+(1.084)+(1.087), (I-300)+(1.084)+(1.088), (I-300)+(1.084)+(1.089), (I-300)+(1.084)+(1.090), (I-300)+(1.084)+(1.091), (I-300)+(1.084)+(1.092), (I-300)+(1.084)+(2.001), (I-300)+(1.084)+(2.002), (I-300)+(1.084)+(2.003), (I-300)+(1.084)+(2.004), (I-300)+(1.084)+(2.005), (I-300)+(1.084)+(2.006), (I-300)+(1.084)+(2.007), (I-300)+(1.084)+(2.008), (I-300)+(1.084)+(2.009), (I-300)+(1.084)+(2.010), (I-300)+(1.084)+(2.011), (I-300)+(1.084)+(2.012), (I-300)+(1.084)+(2.013), (I-300)+(1.084)+(2.014), (I-300)+(1.084)+(2.015), (I-300)+(1.084)+(2.016), (I-300)+(1.084)+(2.017), (I-300)+(1.084)+(2.018), (I-300)+(1.084)+(2.019), (I-300)+(1.084)+(2.020), (I-300)+(1.084)+(2.021), (I-300)+(1.084)+(2.022), (I-300)+(1.084)+(2.023), (I-300)+(1.084)+(2.024), (I-300)+(1.084)+(2.025), (I-300)+(1.084)+(2.026), (I-300)+(1.084)+(2.027), (I-300)+(1.084)+(2.028), (I-300)+(1.084)+(2.029), (I-300)+(1.084)+(2.030), (I-300)+(1.084)+(2.031), (I-300)+(1.084)+(2.032), (I-300)+(1.084)+(2.033), (I-300)+(1.084)+(2.034), (I-300)+(1.084)+(2.035), (I-300)+(1.084)+(2.036), (I-300)+(1.084)+(2.037), (I-300)+(1.084)+(2.038), (I-300)+(1.084)+(2.039), (I-300)+(1.084)+(2.040), (I-300)+(1.084)+(2.041), (I-300)+(1.084)+(2.042), (I-300)+(1.084)+(2.043), (I-300)+(1.084)+(2.044), (I-300)+(1.084)+(2.045), (I-300)+(1.084)+(2.046), (I-300)+(1.084)+(2.047), (I-300)+(1.084)+(2.048), (I-300)+(1.084)+(2.049), (I-300)+(1.084)+(2.050), (I-300)+(1.084)+(2.051), (I-300)+(1.084)+(2.052), (I-300)+(1.084)+(2.053), (I-300)+(1.084)+(2.054), (I-300)+(1.084)+(2.055), (I-300)+(1.084)+(2.056), (I-300)+(1.084)+(2.057), (I-300)+(1.084)+(2.058), (I-300)+(1.084)+(2.059), (I-300)+(1.084)+(3.001), (I-300)+(1.084)+(3.002), (I-300)+(1.084)+(3.003), (I-300)+(1.084)+(3.004), (I-300)+(1.084)+(3.005), (I-300)+(1.084)+(3.006), (I-300)+(1.084)+(3.007), (I-300)+(1.084)+(3.008), (I-300)+(1.084)+(3.009), (I-300)+(1.084)+(3.010), (I-300)+(1.084)+(3.011), (I-300)+(1.084)+(3.012), (I-300)+(1.084)+(3.013), (I-300)+(1.084)+(3.014), (I-300)+(1.084)+(3.015), (I-300)+(1.084)+(3.016), (I-300)+(1.084)+(3.017), (I-300)+(1.084)+(3.018), (I-300)+(1.084)+(3.019), (I-300)+(1.084)+(3.020), (I-300)+(1.084)+(3.021), (I-300)+(1.084)+(3.022), (I-300)+(1.084)+(3.023), (I-300)+(1.084)+(3.024), (I-300)+(1.084)+(3.025), (I-300)+(1.084)+(3.026), (I-300)+(1.084)+(3.027), (I-300)+(1.084)+(3.028), (I-300)+(1.084)+(3.029), (I-300)+(1.084)+(3.030), (I-300)+(1.084)+(3.031), (I-300)+(1.084)+(5.001), (I-300)+(1.084)+(5.002), (I-300)+(1.084)+(5.003), (I-300)+(1.084)+(5.004), (I-300)+(1.084)+(5.005), (I-300)+(1.084)+(5.006), (I-300)+(1.084)+(5.007), (I-300)+(1.084)+(5.008), (I-300)+(1.084)+(5.009), (I-300)+(1.084)+(5.010), (I-300)+(1.084)+(5.011), (I-300)+(1.084)+(5.012), (I-300)+(1.084)+(5.013), (I-300)+(1.084)+(5.014), (I-300)+(1.084)+(5.015), (I-300)+(1.084)+(5.016), (I-300)+(1.084)+(5.017), (I-300)+(1.084)+(5.018), (I-300)+(1.084)+(5.019), (I-300)+(1.084)+(5.020), (I-300)+(1.084)+(5.021), (I-300)+(1.084)+(5.022), (I-300)+(1.084)+(5.023), (I-300)+(1.084)+(6.001), (I-300)+(1.084)+(6.002), (I-300)+(1.084)+(6.003), (I-300)+(1.084)+(6.004), (I-300)+(1.084)+(7.001), (I-300)+(1.084)+(7.002), (I-300)+(1.084)+(7.003), (I-300)+(1.084)+(7.004), (I-300)+(1.084)+(7.005), (I-300)+(1.084)+(7.006), (I-300)+(1.084)+(9.001), (I-300)+(1.084)+(9.002), (I-300)+(1.084)+(9.003), (I-300)+(1.084)+(9.004), (I-300)+(1.084)+(9.005), (I-300)+(1.084)+(9.006), (I-300)+(1.084)+(9.007), (I-300)+(1.084)+(9.008), (I-300)+(1.084)+(9.009), (I-300)+(1.084)+(14.001), (I-300)+(1.084)+(14.002), (I-300)+(1.084)+(15.008), (I-300)+(1.084)+(15.011), (I-300)+(1.084)+(15.012), (I-300)+(1.084)+(15.016), (I-300)+(1.084)+(15.025), (I-300)+(1.084)+(15.027), (I-300)+(1.084)+(15.047), (I-300)+(1.084)+(15.063), (I-300)+(1.084)+(15.064), (I-300)+(1.084)+(16.001), (I-300)+(1.084)+(16.002), (I-300)+(1.084)+(16.003), (I-300)+(1.084)+(16.004), (I-300)+(1.084)+(16.005), (I-300)+(1.084)+(16.006), (I-300)+(1.084)+(16.007), (I-300)+(1.084)+(16.008), (I-300)+(1.084)+(17.001), (I-300)+(1.084)+(17.002), (I-300)+(1.084)+(17.003), (I-300)+(1.084)+(17.004), (I-300)+(1.084)+(17.005), (I-300)+(1.084)+(17.006), (I-300)+(1.084)+(17.007), (I-300)+(1.084)+(17.008), (I-300)+(1.084)+(17.009), (I-300)+(1.084)+(17.010), (I-300)+(1.084)+(17.011), (I-300)+(1.084)+(17.012), (I-300)+(1.084)+(18.001), (I-300)+(1.085)+(1.086), (I-300)+(1.085)+(1.087), (I-300)+(1.085)+(1.088), (I-300)+(1.085)+(1.089), (I-300)+(1.085)+(1.090), (I-300)+(1.085)+(1.091), (I-300)+(1.085)+(1.092), (I-300)+(1.085)+(2.001), (I-300)+(1.085)+(2.002), (I-300)+(1.085)+(2.003), (I-300)+(1.085)+(2.004), (I-300)+(1.085)+(2.005), (I-300)+(1.085)+(2.006), (I-300)+(1.085)+(2.007), (I-300)+(1.085)+(2.008), (I-300)+(1.085)+(2.009), (I-300)+(1.085)+(2.010), (I-300)+(1.085)+(2.011), (I-300)+(1.085)+(2.012), (I-300)+(1.085)+(2.013), (I-300)+(1.085)+(2.014), (I-300)+(1.085)+(2.015), (I-300)+(1.085)+(2.016), (I-300)+(1.085)+(2.017), (I-300)+(1.085)+(2.018), (I-300)+(1.085)+(2.019), (I-300)+(1.085)+(2.020), (I-300)+(1.085)+(2.021), (I-300)+(1.085)+(2.022), (I-300)+(1.085)+(2.023), (I-300)+(1.085)+(2.024), (I-300)+(1.085)+(2.025), (I-300)+(1.085)+(2.026), (I-300)+(1.085)+(2.027), (I-300)+(1.085)+(2.028), (I-300)+(1.085)+(2.029), (I-300)+(1.085)+(2.030), (I-300)+(1.085)+(2.031), (I-300)+(1.085)+(2.032), (I-300)+(1.085)+(2.033), (I-300)+(1.085)+(2.034), (I-300)+(1.085)+(2.035), (I-300)+(1.085)+(2.036), (I-300)+(1.085)+(2.037), (I-300)+(1.085)+(2.038), (I-300)+(1.085)+(2.039), (I-300)+(1.085)+(2.040), (I-300)+(1.085)+(2.041), (I-300)+(1.085)+(2.042), (I-300)+(1.085)+(2.043), (I-300)+(1.085)+(2.044), (I-300)+(1.085)+(2.045), (I-300)+(1.085)+(2.046), (I-300)+(1.085)+(2.047), (I-300)+(1.085)+(2.048), (I-300)+(1.085)+(2.049), (I-300)+(1.085)+(2.050), (I-300)+(1.085)+(2.051), (I-300)+(1.085)+(2.052), (I-300)+(1.085)+(2.053), (I-300)+(1.085)+(2.054), (I-300)+(1.085)+(2.055), (I-300)+(1.085)+(2.056), (I-300)+(1.085)+(2.057), (I-300)+(1.085)+(2.058), (I-300)+(1.085)+(2.059), (I-300)+(1.085)+(3.001), (I-300)+(1.085)+(3.002), (I-300)+(1.085)+(3.003), (I-300)+(1.085)+(3.004), (I-300)+(1.085)+(3.005), (I-300)+(1.085)+(3.006), (I-300)+(1.085)+(3.007), (I-300)+(1.085)+(3.008), (I-300)+(1.085)+(3.009), (I-300)+(1.085)+(3.010), (I-300)+(1.085)+(3.011), (I-300)+(1.085)+(3.012), (I-300)+(1.085)+(3.013), (I-300)+(1.085)+(3.014), (I-300)+(1.085)+(3.015), (I-300)+(1.085)+(3.016), (I-300)+(1.085)+(3.017), (I-300)+(1.085)+(3.018), (I-300)+(1.085)+(3.019), (I-300)+(1.085)+(3.020), (I-300)+(1.085)+(3.021), (I-300)+(1.085)+(3.022), (I-300)+(1.085)+(3.023), (I-300)+(1.085)+(3.024), (I-300)+(1.085)+(3.025), (I-300)+(1.085)+(3.026), (I-300)+(1.085)+(3.027), (I-300)+(1.085)+(3.028), (I-300)+(1.085)+(3.029), (I-300)+(1.085)+(3.030), (I-300)+(1.085)+(3.031), (I-300)+(1.085)+(5.001), (I-300)+(1.085)+(5.002), (I-300)+(1.085)+(5.003), (I-300)+(1.085)+(5.004), (I-300)+(1.085)+(5.005), (I-300)+(1.085)+(5.006), (I-300)+(1.085)+(5.007), (I-300)+(1.085)+(5.008), (I-300)+(1.085)+(5.009), (I-300)+(1.085)+(5.010), (I-300)+(1.085)+(5.011), (I-300)+(1.085)+(5.012), (I-300)+(1.085)+(5.013), (I-300)+(1.085)+(5.014), (I-300)+(1.085)+(5.015), (I-300)+(1.085)+(5.016), (I-300)+(1.085)+(5.017), (I-300)+(1.085)+(5.018), (I-300)+(1.085)+(5.019), (I-300)+(1.085)+(5.020), (I-300)+(1.085)+(5.021), (I-300)+(1.085)+(5.022), (I-300)+(1.085)+(5.023), (I-300)+(1.085)+(6.001), (I-300)+(1.085)+(6.002), (I-300)+(1.085)+(6.003), (I-300)+(1.085)+(6.004), (I-300)+(1.085)+(7.001), (I-300)+(1.085)+(7.002), (I-300)+(1.085)+(7.003), (I-300)+(1.085)+(7.004), (I-300)+(1.085)+(7.005), (I-300)+(1.085)+(7.006), (I-300)+(1.085)+(9.001), (I-300)+(1.085)+(9.002), (I-300)+(1.085)+(9.003), (I-300)+(1.085)+(9.004), (I-300)+(1.085)+(9.005), (I-300)+(1.085)+(9.006), (I-300)+(1.085)+(9.007), (I-300)+(1.085)+(9.008), (I-300)+(1.085)+(9.009), (I-300)+(1.085)+(14.001), (I-300)+(1.085)+(14.002), (I-300)+(1.085)+(15.008), (I-300)+(1.085)+(15.011), (I-300)+(1.085)+(15.012), (I-300)+(1.085)+(15.016), (I-300)+(1.085)+(15.025), (I-300)+(1.085)+(15.027), (I-300)+(1.085)+(15.047), (I-300)+(1.085)+(15.063), (I-300)+(1.085)+(15.064), (I-300)+(1.085)+(16.001), (I-300)+(1.085)+(16.002), (I-300)+(1.085)+(16.003), (I-300)+(1.085)+(16.004), (I-300)+(1.085)+(16.005), (I-300)+(1.085)+(16.006), (I-300)+(1.085)+(16.007), (I-300)+(1.085)+(16.008), (I-300)+(1.085)+(17.001), (I-300)+(1.085)+(17.002), (I-300)+(1.085)+(17.003), (I-300)+(1.085)+(17.004), (I-300)+(1.085)+(17.005), (I-300)+(1.085)+(17.006), (I-300)+(1.085)+(17.007), (I-300)+(1.085)+(17.008), (I-300)+(1.085)+(17.009), (I-300)+(1.085)+(17.010), (I-300)+(1.085)+(17.011), (I-300)+(1.085)+(17.012), (I-300)+(1.085)+(18.001), (I-300)+(1.086)+(1.087), (I-300)+(1.086)+(1.088), (I-300)+(1.086)+(1.089), (I-300)+(1.086)+(1.090), (I-300)+(1.086)+(1.091), (I-300)+(1.086)+(1.092), (I-300)+(1.086)+(2.001), (I-300)+(1.086)+(2.002), (I-300)+(1.086)+(2.003), (I-300)+(1.086)+(2.004), (I-300)+(1.086)+(2.005), (I-300)+(1.086)+(2.006), (I-300)+(1.086)+(2.007), (I-300)+(1.086)+(2.008), (I-300)+(1.086)+(2.009), (I-300)+(1.086)+(2.010), (I-300)+(1.086)+(2.011), (I-300)+(1.086)+(2.012), (I-300)+(1.086)+(2.013), (I-300)+(1.086)+(2.014), (I-300)+(1.086)+(2.015), (I-300)+(1.086)+(2.016), (I-300)+(1.086)+(2.017), (I-300)+(1.086)+(2.018), (I-300)+(1.086)+(2.019), (I-300)+(1.086)+(2.020), (I-300)+(1.086)+(2.021), (I-300)+(1.086)+(2.022), (I-300)+(1.086)+(2.023), (I-300)+(1.086)+(2.024), (I-300)+(1.086)+(2.025), (I-300)+(1.086)+(2.026), (I-300)+(1.086)+(2.027), (I-300)+(1.086)+(2.028), (I-300)+(1.086)+(2.029), (I-300)+(1.086)+(2.030), (I-300)+(1.086)+(2.031), (I-300)+(1.086)+(2.032), (I-300)+(1.086)+(2.033), (I-300)+(1.086)+(2.034), (I-300)+(1.086)+(2.035), (I-300)+(1.086)+(2.036), (I-300)+(1.086)+(2.037), (I-300)+(1.086)+(2.038), (I-300)+(1.086)+(2.039), (I-300)+(1.086)+(2.040), (I-300)+(1.086)+(2.041), (I-300)+(1.086)+(2.042), (I-300)+(1.086)+(2.043), (I-300)+(1.086)+(2.044), (I-300)+(1.086)+(2.045), (I-300)+(1.086)+(2.046), (I-300)+(1.086)+(2.047), (I-300)+(1.086)+(2.048), (I-300)+(1.086)+(2.049), (I-300)+(1.086)+(2.050), (I-300)+(1.086)+(2.051), (I-300)+(1.086)+(2.052), (I-300)+(1.086)+(2.053), (I-300)+(1.086)+(2.054), (I-300)+(1.086)+(2.055), (I-300)+(1.086)+(2.056), (I-300)+(1.086)+(2.057), (I-300)+(1.086)+(2.058), (I-300)+(1.086)+(2.059), (I-300)+(1.086)+(3.001), (I-300)+(1.086)+(3.002), (I-300)+(1.086)+(3.003), (I-300)+(1.086)+(3.004), (I-300)+(1.086)+(3.005), (I-300)+(1.086)+(3.006), (I-300)+(1.086)+(3.007), (I-300)+(1.086)+(3.008), (I-300)+(1.086)+(3.009), (I-300)+(1.086)+(3.010), (I-300)+(1.086)+(3.011), (I-300)+(1.086)+(3.012), (I-300)+(1.086)+(3.013), (I-300)+(1.086)+(3.014), (I-300)+(1.086)+(3.015), (I-300)+(1.086)+(3.016), (I-300)+(1.086)+(3.017), (I-300)+(1.086)+(3.018), (I-300)+(1.086)+(3.019), (I-300)+(1.086)+(3.020), (I-300)+(1.086)+(3.021), (I-300)+(1.086)+(3.022), (I-300)+(1.086)+(3.023), (I-300)+(1.086)+(3.024), (I-300)+(1.086)+(3.025), (I-300)+(1.086)+(3.026), (I-300)+(1.086)+(3.027), (I-300)+(1.086)+(3.028), (I-300)+(1.086)+(3.029), (I-300)+(1.086)+(3.030), (I-300)+(1.086)+(3.031), (I-300)+(1.086)+(5.001), (I-300)+(1.086)+(5.002), (I-300)+(1.086)+(5.003), (I-300)+(1.086)+(5.004), (I-300)+(1.086)+(5.005), (I-300)+(1.086)+(5.006), (I-300)+(1.086)+(5.007), (I-300)+(1.086)+(5.008), (I-300)+(1.086)+(5.009), (I-300)+(1.086)+(5.010), (I-300)+(1.086)+(5.011), (I-300)+(1.086)+(5.012), (I-300)+(1.086)+(5.013), (I-300)+(1.086)+(5.014), (I-300)+(1.086)+(5.015), (I-300)+(1.086)+(5.016), (I-300)+(1.086)+(5.017), (I-300)+(1.086)+(5.018), (I-300)+(1.086)+(5.019), (I-300)+(1.086)+(5.020), (I-300)+(1.086)+(5.021), (I-300)+(1.086)+(5.022), (I-300)+(1.086)+(5.023), (I-300)+(1.086)+(6.001), (I-300)+(1.086)+(6.002), (I-300)+(1.086)+(6.003), (I-300)+(1.086)+(6.004), (I-300)+(1.086)+(7.001), (I-300)+(1.086)+(7.002), (I-300)+(1.086)+(7.003), (I-300)+(1.086)+(7.004), (I-300)+(1.086)+(7.005), (I-300)+(1.086)+(7.006), (I-300)+(1.086)+(9.001), (I-300)+(1.086)+(9.002), (I-300)+(1.086)+(9.003), (I-300)+(1.086)+(9.004), (I-300)+(1.086)+(9.005), (I-300)+(1.086)+(9.006), (I-300)+(1.086)+(9.007), (I-300)+(1.086)+(9.008), (I-300)+(1.086)+(9.009), (I-300)+(1.086)+(14.001), (I-300)+(1.086)+(14.002), (I-300)+(1.086)+(15.008), (I-300)+(1.086)+(15.011), (I-300)+(1.086)+(15.012), (I-300)+(1.086)+(15.016), (I-300)+(1.086)+(15.025), (I-300)+(1.086)+(15.027), (I-300)+(1.086)+(15.047), (I-300)+(1.086)+(15.063), (I-300)+(1.086)+(15.064), (I-300)+(1.086)+(16.001), (I-300)+(1.086)+(16.002), (I-300)+(1.086)+(16.003), (I-300)+(1.086)+(16.004), (I-300)+(1.086)+(16.005), (I-300)+(1.086)+(16.006), (I-300)+(1.086)+(16.007), (I-300)+(1.086)+(16.008), (I-300)+(1.086)+(17.001), (I-300)+(1.086)+(17.002), (I-300)+(1.086)+(17.003), (I-300)+(1.086)+(17.004), (I-300)+(1.086)+(17.005), (I-300)+(1.086)+(17.006), (I-300)+(1.086)+(17.007), (I-300)+(1.086)+(17.008), (I-300)+(1.086)+(17.009), (I-300)+(1.086)+(17.010), (I-300)+(1.086)+(17.011), (I-300)+(1.086)+(17.012), (I-300)+(1.086)+(18.001), (I-300)+(1.087)+(1.088), (I-300)+(1.087)+(1.089), (I-300)+(1.087)+(1.090), (I-300)+(1.087)+(1.091), (I-300)+(1.087)+(1.092), (I-300)+(1.087)+(2.001), (I-300)+(1.087)+(2.002), (I-300)+(1.087)+(2.003), (I-300)+(1.087)+(2.004), (I-300)+(1.087)+(2.005), (I-300)+(1.087)+(2.006), (I-300)+(1.087)+(2.007), (I-300)+(1.087)+(2.008), (I-300)+(1.087)+(2.009), (I-300)+(1.087)+(2.010), (I-300)+(1.087)+(2.011), (I-300)+(1.087)+(2.012), (I-300)+(1.087)+(2.013), (I-300)+(1.087)+(2.014), (I-300)+(1.087)+(2.015), (I-300)+(1.087)+(2.016), (I-300)+(1.087)+(2.017), (I-300)+(1.087)+(2.018), (I-300)+(1.087)+(2.019), (I-300)+(1.087)+(2.020), (I-300)+(1.087)+(2.021), (I-300)+(1.087)+(2.022), (I-300)+(1.087)+(2.023), (I-300)+(1.087)+(2.024), (I-300)+(1.087)+(2.025), (I-300)+(1.087)+(2.026), (I-300)+(1.087)+(2.027), (I-300)+(1.087)+(2.028), (I-300)+(1.087)+(2.029), (I-300)+(1.087)+(2.030), (I-300)+(1.087)+(2.031), (I-300)+(1.087)+(2.032), (I-300)+(1.087)+(2.033), (I-300)+(1.087)+(2.034), (I-300)+(1.087)+(2.035), (I-300)+(1.087)+(2.036), (I-300)+(1.087)+(2.037), (I-300)+(1.087)+(2.038), (I-300)+(1.087)+(2.039), (I-300)+(1.087)+(2.040), (I-300)+(1.087)+(2.041), (I-300)+(1.087)+(2.042), (I-300)+(1.087)+(2.043), (I-300)+(1.087)+(2.044), (I-300)+(1.087)+(2.045), (I-300)+(1.087)+(2.046), (I-300)+(1.087)+(2.047), (I-300)+(1.087)+(2.048), (I-300)+(1.087)+(2.049), (I-300)+(1.087)+(2.050), (I-300)+(1.087)+(2.051), (I-300)+(1.087)+(2.052), (I-300)+(1.087)+(2.053), (I-300)+(1.087)+(2.054), (I-300)+(1.087)+(2.055), (I-300)+(1.087)+(2.056), (I-300)+(1.087)+(2.057), (I-300)+(1.087)+(2.058), (I-300)+(1.087)+(2.059), (I-300)+(1.087)+(3.001), (I-300)+(1.087)+(3.002), (I-300)+(1.087)+(3.003), (I-300)+(1.087)+(3.004), (I-300)+(1.087)+(3.005), (I-300)+(1.087)+(3.006), (I-300)+(1.087)+(3.007), (I-300)+(1.087)+(3.008), (I-300)+(1.087)+(3.009), (I-300)+(1.087)+(3.010), (I-300)+(1.087)+(3.011), (I-300)+(1.087)+(3.012), (I-300)+(1.087)+(3.013), (I-300)+(1.087)+(3.014), (I-300)+(1.087)+(3.015), (I-300)+(1.087)+(3.016), (I-300)+(1.087)+(3.017), (I-300)+(1.087)+(3.018), (I-300)+(1.087)+(3.019), (I-300)+(1.087)+(3.020), (I-300)+(1.087)+(3.021), (I-300)+(1.087)+(3.022), (I-300)+(1.087)+(3.023), (I-300)+(1.087)+(3.024), (I-300)+(1.087)+(3.025), (I-300)+(1.087)+(3.026), (I-300)+(1.087)+(3.027), (I-300)+(1.087)+(3.028), (I-300)+(1.087)+(3.029), (I-300)+(1.087)+(3.030), (I-300)+(1.087)+(3.031), (I-300)+(1.087)+(5.001), (I-300)+(1.087)+(5.002), (I-300)+(1.087)+(5.003), (I-300)+(1.087)+(5.004), (I-300)+(1.087)+(5.005), (I-300)+(1.087)+(5.006), (I-300)+(1.087)+(5.007), (I-300)+(1.087)+(5.008), (I-300)+(1.087)+(5.009), (I-300)+(1.087)+(5.010), (I-300)+(1.087)+(5.011), (I-300)+(1.087)+(5.012), (I-300)+(1.087)+(5.013), (I-300)+(1.087)+(5.014), (I-300)+(1.087)+(5.015), (I-300)+(1.087)+(5.016), (I-300)+(1.087)+(5.017), (I-300)+(1.087)+(5.018), (I-300)+(1.087)+(5.019), (I-300)+(1.087)+(5.020), (I-300)+(1.087)+(5.021), (I-300)+(1.087)+(5.022), (I-300)+(1.087)+(5.023), (I-300)+(1.087)+(6.001), (I-300)+(1.087)+(6.002), (I-300)+(1.087)+(6.003), (I-300)+(1.087)+(6.004), (I-300)+(1.087)+(7.001), (I-300)+(1.087)+(7.002), (I-300)+(1.087)+(7.003), (I-300)+(1.087)+(7.004), (I-300)+(1.087)+(7.005), (I-300)+(1.087)+(7.006), (I-300)+(1.087)+(9.001), (I-300)+(1.087)+(9.002), (I-300)+(1.087)+(9.003), (I-300)+(1.087)+(9.004), (I-300)+(1.087)+(9.005), (I-300)+(1.087)+(9.006), (I-300)+(1.087)+(9.007), (I-300)+(1.087)+(9.008), (I-300)+(1.087)+(9.009), (I-300)+(1.087)+(14.001), (I-300)+(1.087)+(14.002), (I-300)+(1.087)+(15.008), (I-300)+(1.087)+(15.011), (I-300)+(1.087)+(15.012), (I-300)+(1.087)+(15.016), (I-300)+(1.087)+(15.025), (I-300)+(1.087)+(15.027), (I-300)+(1.087)+(15.047), (I-300)+(1.087)+(15.063), (I-300)+(1.087)+(15.064), (I-300)+(1.087)+(16.001), (I-300)+(1.087)+(16.002), (I-300)+(1.087)+(16.003), (I-300)+(1.087)+(16.004), (I-300)+(1.087)+(16.005), (I-300)+(1.087)+(16.006), (I-300)+(1.087)+(16.007), (I-300)+(1.087)+(16.008), (I-300)+(1.087)+(17.001), (I-300)+(1.087)+(17.002), (I-300)+(1.087)+(17.003), (I-300)+(1.087)+(17.004), (I-300)+(1.087)+(17.005), (I-300)+(1.087)+(17.006), (I-300)+(1.087)+(17.007), (I-300)+(1.087)+(17.008), (I-300)+(1.087)+(17.009), (I-300)+(1.087)+(17.010), (I-300)+(1.087)+(17.011), (I-300)+(1.087)+(17.012), (I-300)+(1.087)+(18.001), (I-300)+(1.088)+(1.089), (I-300)+(1.088)+(1.090), (I-300)+(1.088)+(1.091), (I-300)+(1.088)+(1.092), (I-300)+(1.088)+(2.001), (I-300)+(1.088)+(2.002), (I-300)+(1.088)+(2.003), (I-300)+(1.088)+(2.004), (I-300)+(1.088)+(2.005), (I-300)+(1.088)+(2.006), (I-300)+(1.088)+(2.007), (I-300)+(1.088)+(2.008), (I-300)+(1.088)+(2.009), (I-300)+(1.088)+(2.010), (I-300)+(1.088)+(2.011), (I-300)+(1.088)+(2.012), (I-300)+(1.088)+(2.013), (I-300)+(1.088)+(2.014), (I-300)+(1.088)+(2.015), (I-300)+(1.088)+(2.016), (I-300)+(1.088)+(2.017), (I-300)+(1.088)+(2.018), (I-300)+(1.088)+(2.019), (I-300)+(1.088)+(2.020), (I-300)+(1.088)+(2.021), (I-300)+(1.088)+(2.022), (I-300)+(1.088)+(2.023), (I-300)+(1.088)+(2.024), (I-300)+(1.088)+(2.025), (I-300)+(1.088)+(2.026), (I-300)+(1.088)+(2.027), (I-300)+(1.088)+(2.028), (I-300)+(1.088)+(2.029), (I-300)+(1.088)+(2.030), (I-300)+(1.088)+(2.031), (I-300)+(1.088)+(2.032), (I-300)+(1.088)+(2.033), (I-300)+(1.088)+(2.034), (I-300)+(1.088)+(2.035), (I-300)+(1.088)+(2.036), (I-300)+(1.088)+(2.037), (I-300)+(1.088)+(2.038), (I-300)+(1.088)+(2.039), (I-300)+(1.088)+(2.040), (I-300)+(1.088)+(2.041), (I-300)+(1.088)+(2.042), (I-300)+(1.088)+(2.043), (I-300)+(1.088)+(2.044), (I-300)+(1.088)+(2.045), (I-300)+(1.088)+(2.046), (I-300)+(1.088)+(2.047), (I-300)+(1.088)+(2.048), (I-300)+(1.088)+(2.049), (I-300)+(1.088)+(2.050), (I-300)+(1.088)+(2.051), (I-300)+(1.088)+(2.052), (I-300)+(1.088)+(2.053), (I-300)+(1.088)+(2.054), (I-300)+(1.088)+(2.055), (I-300)+(1.088)+(2.056), (I-300)+(1.088)+(2.057), (I-300)+(1.088)+(2.058), (I-300)+(1.088)+(2.059), (I-300)+(1.088)+(3.001), (I-300)+(1.088)+(3.002), (I-300)+(1.088)+(3.003), (I-300)+(1.088)+(3.004), (I-300)+(1.088)+(3.005), (I-300)+(1.088)+(3.006), (I-300)+(1.088)+(3.007), (I-300)+(1.088)+(3.008), (I-300)+(1.088)+(3.009), (I-300)+(1.088)+(3.010), (I-300)+(1.088)+(3.011), (I-300)+(1.088)+(3.012), (I-300)+(1.088)+(3.013), (I-300)+(1.088)+(3.014), (I-300)+(1.088)+(3.015), (I-300)+(1.088)+(3.016), (I-300)+(1.088)+(3.017), (I-300)+(1.088)+(3.018), (I-300)+(1.088)+(3.019), (I-300)+(1.088)+(3.020), (I-300)+(1.088)+(3.021), (I-300)+(1.088)+(3.022), (I-300)+(1.088)+(3.023), (I-300)+(1.088)+(3.024), (I-300)+(1.088)+(3.025), (I-300)+(1.088)+(3.026), (I-300)+(1.088)+(3.027), (I-300)+(1.088)+(3.028), (I-300)+(1.088)+(3.029), (I-300)+(1.088)+(3.030), (I-300)+(1.088)+(3.031), (I-300)+(1.088)+(5.001), (I-300)+(1.088)+(5.002), (I-300)+(1.088)+(5.003), (I-300)+(1.088)+(5.004), (I-300)+(1.088)+(5.005), (I-300)+(1.088)+(5.006), (I-300)+(1.088)+(5.007), (I-300)+(1.088)+(5.008), (I-300)+(1.088)+(5.009), (I-300)+(1.088)+(5.010), (I-300)+(1.088)+(5.011), (I-300)+(1.088)+(5.012), (I-300)+(1.088)+(5.013), (I-300)+(1.088)+(5.014), (I-300)+(1.088)+(5.015), (I-300)+(1.088)+(5.016), (I-300)+(1.088)+(5.017), (I-300)+(1.088)+(5.018), (I-300)+(1.088)+(5.019), (I-300)+(1.088)+(5.020), (I-300)+(1.088)+(5.021), (I-300)+(1.088)+(5.022), (I-300)+(1.088)+(5.023), (I-300)+(1.088)+(6.001), (I-300)+(1.088)+(6.002), (I-300)+(1.088)+(6.003), (I-300)+(1.088)+(6.004), (I-300)+(1.088)+(7.001), (I-300)+(1.088)+(7.002), (I-300)+(1.088)+(7.003), (I-300)+(1.088)+(7.004), (I-300)+(1.088)+(7.005), (I-300)+(1.088)+(7.006), (I-300)+(1.088)+(9.001), (I-300)+(1.088)+(9.002), (I-300)+(1.088)+(9.003), (I-300)+(1.088)+(9.004), (I-300)+(1.088)+(9.005), (I-300)+(1.088)+(9.006), (I-300)+(1.088)+(9.007), (I-300)+(1.088)+(9.008), (I-300)+(1.088)+(9.009), (I-300)+(1.088)+(14.001), (I-300)+(1.088)+(14.002), (I-300)+(1.088)+(15.008), (I-300)+(1.088)+(15.011), (I-300)+(1.088)+(15.012), (I-300)+(1.088)+(15.016), (I-300)+(1.088)+(15.025), (I-300)+(1.088)+(15.027), (I-300)+(1.088)+(15.047), (I-300)+(1.088)+(15.063), (I-300)+(1.088)+(15.064), (I-300)+(1.088)+(16.001), (I-300)+(1.088)+(16.002), (I-300)+(1.088)+(16.003), (I-300)+(1.088)+(16.004), (I-300)+(1.088)+(16.005), (I-300)+(1.088)+(16.006), (I-300)+(1.088)+(16.007), (I-300)+(1.088)+(16.008), (I-300)+(1.088)+(17.001), (I-300)+(1.088)+(17.002), (I-300)+(1.088)+(17.003), (I-300)+(1.088)+(17.004), (I-300)+(1.088)+(17.005), (I-300)+(1.088)+(17.006), (I-300)+(1.088)+(17.007), (I-300)+(1.088)+(17.008), (I-300)+(1.088)+(17.009), (I-300)+(1.088)+(17.010), (I-300)+(1.088)+(17.011), (I-300)+(1.088)+(17.012), (I-300)+(1.088)+(18.001), (I-300)+(1.089)+(1.090), (I-300)+(1.089)+(1.091), (I-300)+(1.089)+(1.092), (I-300)+(1.089)+(2.001), (I-300)+(1.089)+(2.002), (I-300)+(1.089)+(2.003), (I-300)+(1.089)+(2.004), (I-300)+(1.089)+(2.005), (I-300)+(1.089)+(2.006), (I-300)+(1.089)+(2.007), (I-300)+(1.089)+(2.008), (I-300)+(1.089)+(2.009), (I-300)+(1.089)+(2.010), (I-300)+(1.089)+(2.011), (I-300)+(1.089)+(2.012), (I-300)+(1.089)+(2.013), (I-300)+(1.089)+(2.014), (I-300)+(1.089)+(2.015), (I-300)+(1.089)+(2.016), (I-300)+(1.089)+(2.017), (I-300)+(1.089)+(2.018), (I-300)+(1.089)+(2.019), (I-300)+(1.089)+(2.020), (I-300)+(1.089)+(2.021), (I-300)+(1.089)+(2.022), (I-300)+(1.089)+(2.023), (I-300)+(1.089)+(2.024), (I-300)+(1.089)+(2.025), (I-300)+(1.089)+(2.026), (I-300)+(1.089)+(2.027), (I-300)+(1.089)+(2.028), (I-300)+(1.089)+(2.029), (I-300)+(1.089)+(2.030), (I-300)+(1.089)+(2.031), (I-300)+(1.089)+(2.032), (I-300)+(1.089)+(2.033), (I-300)+(1.089)+(2.034), (I-300)+(1.089)+(2.035), (I-300)+(1.089)+(2.036), (I-300)+(1.089)+(2.037), (I-300)+(1.089)+(2.038), (I-300)+(1.089)+(2.039), (I-300)+(1.089)+(2.040), (I-300)+(1.089)+(2.041), (I-300)+(1.089)+(2.042), (I-300)+(1.089)+(2.043), (I-300)+(1.089)+(2.044), (I-300)+(1.089)+(2.045), (I-300)+(1.089)+(2.046), (I-300)+(1.089)+(2.047), (I-300)+(1.089)+(2.048), (I-300)+(1.089)+(2.049), (I-300)+(1.089)+(2.050), (I-300)+(1.089)+(2.051), (I-300)+(1.089)+(2.052), (I-300)+(1.089)+(2.053), (I-300)+(1.089)+(2.054), (I-300)+(1.089)+(2.055), (I-300)+(1.089)+(2.056), (I-300)+(1.089)+(2.057), (I-300)+(1.089)+(2.058), (I-300)+(1.089)+(2.059), (I-300)+(1.089)+(3.001), (I-300)+(1.089)+(3.002), (I-300)+(1.089)+(3.003), (I-300)+(1.089)+(3.004), (I-300)+(1.089)+(3.005), (I-300)+(1.089)+(3.006), (I-300)+(1.089)+(3.007), (I-300)+(1.089)+(3.008), (I-300)+(1.089)+(3.009), (I-300)+(1.089)+(3.010), (I-300)+(1.089)+(3.011), (I-300)+(1.089)+(3.012), (I-300)+(1.089)+(3.013), (I-300)+(1.089)+(3.014), (I-300)+(1.089)+(3.015), (I-300)+(1.089)+(3.016), (I-300)+(1.089)+(3.017), (I-300)+(1.089)+(3.018), (I-300)+(1.089)+(3.019), (I-300)+(1.089)+(3.020), (I-300)+(1.089)+(3.021), (I-300)+(1.089)+(3.022), (I-300)+(1.089)+(3.023), (I-300)+(1.089)+(3.024), (I-300)+(1.089)+(3.025), (I-300)+(1.089)+(3.026), (I-300)+(1.089)+(3.027), (I-300)+(1.089)+(3.028), (I-300)+(1.089)+(3.029), (I-300)+(1.089)+(3.030), (I-300)+(1.089)+(3.031), (I-300)+(1.089)+(5.001), (I-300)+(1.089)+(5.002), (I-300)+(1.089)+(5.003), (I-300)+(1.089)+(5.004), (I-300)+(1.089)+(5.005), (I-300)+(1.089)+(5.006), (I-300)+(1.089)+(5.007), (I-300)+(1.089)+(5.008), (I-300)+(1.089)+(5.009), (I-300)+(1.089)+(5.010), (I-300)+(1.089)+(5.011), (I-300)+(1.089)+(5.012), (I-300)+(1.089)+(5.013), (I-300)+(1.089)+(5.014), (I-300)+(1.089)+(5.015), (I-300)+(1.089)+(5.016), (I-300)+(1.089)+(5.017), (I-300)+(1.089)+(5.018), (I-300)+(1.089)+(5.019), (I-300)+(1.089)+(5.020), (I-300)+(1.089)+(5.021), (I-300)+(1.089)+(5.022), (I-300)+(1.089)+(5.023), (I-300)+(1.089)+(6.001), (I-300)+(1.089)+(6.002), (I-300)+(1.089)+(6.003), (I-300)+(1.089)+(6.004), (I-300)+(1.089)+(7.001), (I-300)+(1.089)+(7.002), (I-300)+(1.089)+(7.003), (I-300)+(1.089)+(7.004), (I-300)+(1.089)+(7.005), (I-300)+(1.089)+(7.006), (I-300)+(1.089)+(9.001), (I-300)+(1.089)+(9.002), (I-300)+(1.089)+(9.003), (I-300)+(1.089)+(9.004), (I-300)+(1.089)+(9.005), (I-300)+(1.089)+(9.006), (I-300)+(1.089)+(9.007), (I-300)+(1.089)+(9.008), (I-300)+(1.089)+(9.009), (I-300)+(1.089)+(14.001), (I-300)+(1.089)+(14.002), (I-300)+(1.089)+(15.008), (I-300)+(1.089)+(15.011), (I-300)+(1.089)+(15.012), (I-300)+(1.089)+(15.016), (I-300)+(1.089)+(15.025), (I-300)+(1.089)+(15.027), (I-300)+(1.089)+(15.047), (I-300)+(1.089)+(15.063), (I-300)+(1.089)+(15.064), (I-300)+(1.089)+(16.001), (I-300)+(1.089)+(16.002), (I-300)+(1.089)+(16.003), (I-300)+(1.089)+(16.004), (I-300)+(1.089)+(16.005), (I-300)+(1.089)+(16.006), (I-300)+(1.089)+(16.007), (I-300)+(1.089)+(16.008), (I-300)+(1.089)+(17.001), (I-300)+(1.089)+(17.002), (I-300)+(1.089)+(17.003), (I-300)+(1.089)+(17.004), (I-300)+(1.089)+(17.005), (I-300)+(1.089)+(17.006), (I-300)+(1.089)+(17.007), (I-300)+(1.089)+(17.008), (I-300)+(1.089)+(17.009), (I-300)+(1.089)+(17.010), (I-300)+(1.089)+(17.011), (I-300)+(1.089)+(17.012), (I-300)+(1.089)+(18.001), (I-300)+(1.090)+(1.091), (I-300)+(1.090)+(1.092), (I-300)+(1.090)+(2.001), (I-300)+(1.090)+(2.002), (I-300)+(1.090)+(2.003), (I-300)+(1.090)+(2.004), (I-300)+(1.090)+(2.005), (I-300)+(1.090)+(2.006), (I-300)+(1.090)+(2.007), (I-300)+(1.090)+(2.008), (I-300)+(1.090)+(2.009), (I-300)+(1.090)+(2.010), (I-300)+(1.090)+(2.011), (I-300)+(1.090)+(2.012), (I-300)+(1.090)+(2.013), (I-300)+(1.090)+(2.014), (I-300)+(1.090)+(2.015), (I-300)+(1.090)+(2.016), (I-300)+(1.090)+(2.017), (I-300)+(1.090)+(2.018), (I-300)+(1.090)+(2.019), (I-300)+(1.090)+(2.020), (I-300)+(1.090)+(2.021), (I-300)+(1.090)+(2.022), (I-300)+(1.090)+(2.023), (I-300)+(1.090)+(2.024), (I-300)+(1.090)+(2.025), (I-300)+(1.090)+(2.026), (I-300)+(1.090)+(2.027), (I-300)+(1.090)+(2.028), (I-300)+(1.090)+(2.029), (I-300)+(1.090)+(2.030), (I-300)+(1.090)+(2.031), (I-300)+(1.090)+(2.032), (I-300)+(1.090)+(2.033), (I-300)+(1.090)+(2.034), (I-300)+(1.090)+(2.035), (I-300)+(1.090)+(2.036), (I-300)+(1.090)+(2.037), (I-300)+(1.090)+(2.038), (I-300)+(1.090)+(2.039), (I-300)+(1.090)+(2.040), (I-300)+(1.090)+(2.041), (I-300)+(1.090)+(2.042), (I-300)+(1.090)+(2.043), (I-300)+(1.090)+(2.044), (I-300)+(1.090)+(2.045), (I-300)+(1.090)+(2.046), (I-300)+(1.090)+(2.047), (I-300)+(1.090)+(2.048), (I-300)+(1.090)+(2.049), (I-300)+(1.090)+(2.050), (I-300)+(1.090)+(2.051), (I-300)+(1.090)+(2.052), (I-300)+(1.090)+(2.053), (I-300)+(1.090)+(2.054), (I-300)+(1.090)+(2.055), (I-300)+(1.090)+(2.056), (I-300)+(1.090)+(2.057), (I-300)+(1.090)+(2.058), (I-300)+(1.090)+(2.059), (I-300)+(1.090)+(3.001), (I-300)+(1.090)+(3.002), (I-300)+(1.090)+(3.003), (I-300)+(1.090)+(3.004), (I-300)+(1.090)+(3.005), (I-300)+(1.090)+(3.006), (I-300)+(1.090)+(3.007), (I-300)+(1.090)+(3.008), (I-300)+(1.090)+(3.009), (I-300)+(1.090)+(3.010), (I-300)+(1.090)+(3.011), (I-300)+(1.090)+(3.012), (I-300)+(1.090)+(3.013), (I-300)+(1.090)+(3.014), (I-300)+(1.090)+(3.015), (I-300)+(1.090)+(3.016), (I-300)+(1.090)+(3.017), (I-300)+(1.090)+(3.018), (I-300)+(1.090)+(3.019), (I-300)+(1.090)+(3.020), (I-300)+(1.090)+(3.021), (I-300)+(1.090)+(3.022), (I-300)+(1.090)+(3.023), (I-300)+(1.090)+(3.024), (I-300)+(1.090)+(3.025), (I-300)+(1.090)+(3.026), (I-300)+(1.090)+(3.027), (I-300)+(1.090)+(3.028), (I-300)+(1.090)+(3.029), (I-300)+(1.090)+(3.030), (I-300)+(1.090)+(3.031), (I-300)+(1.090)+(5.001), (I-300)+(1.090)+(5.002), (I-300)+(1.090)+(5.003), (I-300)+(1.090)+(5.004), (I-300)+(1.090)+(5.005), (I-300)+(1.090)+(5.006), (I-300)+(1.090)+(5.007), (I-300)+(1.090)+(5.008), (I-300)+(1.090)+(5.009), (I-300)+(1.090)+(5.010), (I-300)+(1.090)+(5.011), (I-300)+(1.090)+(5.012), (I-300)+(1.090)+(5.013), (I-300)+(1.090)+(5.014), (I-300)+(1.090)+(5.015), (I-300)+(1.090)+(5.016), (I-300)+(1.090)+(5.017), (I-300)+(1.090)+(5.018), (I-300)+(1.090)+(5.019), (I-300)+(1.090)+(5.020), (I-300)+(1.090)+(5.021), (I-300)+(1.090)+(5.022), (I-300)+(1.090)+(5.023), (I-300)+(1.090)+(6.001), (I-300)+(1.090)+(6.002), (I-300)+(1.090)+(6.003), (I-300)+(1.090)+(6.004), (I-300)+(1.090)+(7.001), (I-300)+(1.090)+(7.002), (I-300)+(1.090)+(7.003), (I-300)+(1.090)+(7.004), (I-300)+(1.090)+(7.005), (I-300)+(1.090)+(7.006), (I-300)+(1.090)+(9.001), (I-300)+(1.090)+(9.002), (I-300)+(1.090)+(9.003), (I-300)+(1.090)+(9.004), (I-300)+(1.090)+(9.005), (I-300)+(1.090)+(9.006), (I-300)+(1.090)+(9.007), (I-300)+(1.090)+(9.008), (I-300)+(1.090)+(9.009), (I-300)+(1.090)+(14.001), (I-300)+(1.090)+(14.002), (I-300)+(1.090)+(15.008), (I-300)+(1.090)+(15.011), (I-300)+(1.090)+(15.012), (I-300)+(1.090)+(15.016), (I-300)+(1.090)+(15.025), (I-300)+(1.090)+(15.027), (I-300)+(1.090)+(15.047), (I-300)+(1.090)+(15.063), (I-300)+(1.090)+(15.064), (I-300)+(1.090)+(16.001), (I-300)+(1.090)+(16.002), (I-300)+(1.090)+(16.003), (I-300)+(1.090)+(16.004), (I-300)+(1.090)+(16.005), (I-300)+(1.090)+(16.006), (I-300)+(1.090)+(16.007), (I-300)+(1.090)+(16.008), (I-300)+(1.090)+(17.001), (I-300)+(1.090)+(17.002), (I-300)+(1.090)+(17.003), (I-300)+(1.090)+(17.004), (I-300)+(1.090)+(17.005), (I-300)+(1.090)+(17.006), (I-300)+(1.090)+(17.007), (I-300)+(1.090)+(17.008), (I-300)+(1.090)+(17.009), (I-300)+(1.090)+(17.010), (I-300)+(1.090)+(17.011), (I-300)+(1.090)+(17.012), (I-300)+(1.090)+(18.001), (I-300)+(1.091)+(1.092), (I-300)+(1.091)+(2.001), (I-300)+(1.091)+(2.002), (I-300)+(1.091)+(2.003), (I-300)+(1.091)+(2.004), (I-300)+(1.091)+(2.005), (I-300)+(1.091)+(2.006), (I-300)+(1.091)+(2.007), (I-300)+(1.091)+(2.008), (I-300)+(1.091)+(2.009), (I-300)+(1.091)+(2.010), (I-300)+(1.091)+(2.011), (I-300)+(1.091)+(2.012), (I-300)+(1.091)+(2.013), (I-300)+(1.091)+(2.014), (I-300)+(1.091)+(2.015), (I-300)+(1.091)+(2.016), (I-300)+(1.091)+(2.017), (I-300)+(1.091)+(2.018), (I-300)+(1.091)+(2.019), (I-300)+(1.091)+(2.020), (I-300)+(1.091)+(2.021), (I-300)+(1.091)+(2.022), (I-300)+(1.091)+(2.023), (I-300)+(1.091)+(2.024), (I-300)+(1.091)+(2.025), (I-300)+(1.091)+(2.026), (I-300)+(1.091)+(2.027), (I-300)+(1.091)+(2.028), (I-300)+(1.091)+(2.029), (I-300)+(1.091)+(2.030), (I-300)+(1.091)+(2.031), (I-300)+(1.091)+(2.032), (I-300)+(1.091)+(2.033), (I-300)+(1.091)+(2.034), (I-300)+(1.091)+(2.035), (I-300)+(1.091)+(2.036), (I-300)+(1.091)+(2.037), (I-300)+(1.091)+(2.038), (I-300)+(1.091)+(2.039), (I-300)+(1.091)+(2.040), (I-300)+(1.091)+(2.041), (I-300)+(1.091)+(2.042), (I-300)+(1.091)+(2.043), (I-300)+(1.091)+(2.044), (I-300)+(1.091)+(2.045), (I-300)+(1.091)+(2.046), (I-300)+(1.091)+(2.047), (I-300)+(1.091)+(2.048), (I-300)+(1.091)+(2.049), (I-300)+(1.091)+(2.050), (I-300)+(1.091)+(2.051), (I-300)+(1.091)+(2.052), (I-300)+(1.091)+(2.053), (I-300)+(1.091)+(2.054), (I-300)+(1.091)+(2.055), (I-300)+(1.091)+(2.056), (I-300)+(1.091)+(2.057), (I-300)+(1.091)+(2.058), (I-300)+(1.091)+(2.059), (I-300)+(1.091)+(3.001), (I-300)+(1.091)+(3.002), (I-300)+(1.091)+(3.003), (I-300)+(1.091)+(3.004), (I-300)+(1.091)+(3.005), (I-300)+(1.091)+(3.006), (I-300)+(1.091)+(3.007), (I-300)+(1.091)+(3.008), (I-300)+(1.091)+(3.009), (I-300)+(1.091)+(3.010), (I-300)+(1.091)+(3.011), (I-300)+(1.091)+(3.012), (I-300)+(1.091)+(3.013), (I-300)+(1.091)+(3.014), (I-300)+(1.091)+(3.015), (I-300)+(1.091)+(3.016), (I-300)+(1.091)+(3.017), (I-300)+(1.091)+(3.018), (I-300)+(1.091)+(3.019), (I-300)+(1.091)+(3.020), (I-300)+(1.091)+(3.021), (I-300)+(1.091)+(3.022), (I-300)+(1.091)+(3.023), (I-300)+(1.091)+(3.024), (I-300)+(1.091)+(3.025), (I-300)+(1.091)+(3.026), (I-300)+(1.091)+(3.027), (I-300)+(1.091)+(3.028), (I-300)+(1.091)+(3.029), (I-300)+(1.091)+(3.030), (I-300)+(1.091)+(3.031), (I-300)+(1.091)+(5.001), (I-300)+(1.091)+(5.002), (I-300)+(1.091)+(5.003), (I-300)+(1.091)+(5.004), (I-300)+(1.091)+(5.005), (I-300)+(1.091)+(5.006), (I-300)+(1.091)+(5.007), (I-300)+(1.091)+(5.008), (I-300)+(1.091)+(5.009), (I-300)+(1.091)+(5.010), (I-300)+(1.091)+(5.011), (I-300)+(1.091)+(5.012), (I-300)+(1.091)+(5.013), (I-300)+(1.091)+(5.014), (I-300)+(1.091)+(5.015), (I-300)+(1.091)+(5.016), (I-300)+(1.091)+(5.017), (I-300)+(1.091)+(5.018), (I-300)+(1.091)+(5.019), (I-300)+(1.091)+(5.020), (I-300)+(1.091)+(5.021), (I-300)+(1.091)+(5.022), (I-300)+(1.091)+(5.023), (I-300)+(1.091)+(6.001), (I-300)+(1.091)+(6.002), (I-300)+(1.091)+(6.003), (I-300)+(1.091)+(6.004), (I-300)+(1.091)+(7.001), (I-300)+(1.091)+(7.002), (I-300)+(1.091)+(7.003), (I-300)+(1.091)+(7.004), (I-300)+(1.091)+(7.005), (I-300)+(1.091)+(7.006), (I-300)+(1.091)+(9.001), (I-300)+(1.091)+(9.002), (I-300)+(1.091)+(9.003), (I-300)+(1.091)+(9.004), (I-300)+(1.091)+(9.005), (I-300)+(1.091)+(9.006), (I-300)+(1.091)+(9.007), (I-300)+(1.091)+(9.008), (I-300)+(1.091)+(9.009), (I-300)+(1.091)+(14.001), (I-300)+(1.091)+(14.002), (I-300)+(1.091)+(15.008), (I-300)+(1.091)+(15.011), (I-300)+(1.091)+(15.012), (I-300)+(1.091)+(15.016), (I-300)+(1.091)+(15.025), (I-300)+(1.091)+(15.027), (I-300)+(1.091)+(15.047), (I-300)+(1.091)+(15.063), (I-300)+(1.091)+(15.064), (I-300)+(1.091)+(16.001), (I-300)+(1.091)+(16.002), (I-300)+(1.091)+(16.003), (I-300)+(1.091)+(16.004), (I-300)+(1.091)+(16.005), (I-300)+(1.091)+(16.006), (I-300)+(1.091)+(16.007), (I-300)+(1.091)+(16.008), (I-300)+(1.091)+(17.001), (I-300)+(1.091)+(17.002), (I-300)+(1.091)+(17.003), (I-300)+(1.091)+(17.004), (I-300)+(1.091)+(17.005), (I-300)+(1.091)+(17.006), (I-300)+(1.091)+(17.007), (I-300)+(1.091)+(17.008), (I-300)+(1.091)+(17.009), (I-300)+(1.091)+(17.010), (I-300)+(1.091)+(17.011), (I-300)+(1.091)+(17.012), (I-300)+(1.091)+(18.001), (I-300)+(1.092)+(2.001), (I-300)+(1.092)+(2.002), (I-300)+(1.092)+(2.003), (I-300)+(1.092)+(2.004), (I-300)+(1.092)+(2.005), (I-300)+(1.092)+(2.006), (I-300)+(1.092)+(2.007), (I-300)+(1.092)+(2.008), (I-300)+(1.092)+(2.009), (I-300)+(1.092)+(2.010), (I-300)+(1.092)+(2.011), (I-300)+(1.092)+(2.012), (I-300)+(1.092)+(2.013), (I-300)+(1.092)+(2.014), (I-300)+(1.092)+(2.015), (I-300)+(1.092)+(2.016), (I-300)+(1.092)+(2.017), (I-300)+(1.092)+(2.018), (I-300)+(1.092)+(2.019), (I-300)+(1.092)+(2.020), (I-300)+(1.092)+(2.021), (I-300)+(1.092)+(2.022), (I-300)+(1.092)+(2.023), (I-300)+(1.092)+(2.024), (I-300)+(1.092)+(2.025), (I-300)+(1.092)+(2.026), (I-300)+(1.092)+(2.027), (I-300)+(1.092)+(2.028), (I-300)+(1.092)+(2.029), (I-300)+(1.092)+(2.030), (I-300)+(1.092)+(2.031), (I-300)+(1.092)+(2.032), (I-300)+(1.092)+(2.033), (I-300)+(1.092)+(2.034), (I-300)+(1.092)+(2.035), (I-300)+(1.092)+(2.036), (I-300)+(1.092)+(2.037), (I-300)+(1.092)+(2.038), (I-300)+(1.092)+(2.039), (I-300)+(1.092)+(2.040), (I-300)+(1.092)+(2.041), (I-300)+(1.092)+(2.042), (I-300)+(1.092)+(2.043), (I-300)+(1.092)+(2.044), (I-300)+(1.092)+(2.045), (I-300)+(1.092)+(2.046), (I-300)+(1.092)+(2.047), (I-300)+(1.092)+(2.048), (I-300)+(1.092)+(2.049), (I-300)+(1.092)+(2.050), (I-300)+(1.092)+(2.051), (I-300)+(1.092)+(2.052), (I-300)+(1.092)+(2.053), (I-300)+(1.092)+(2.054), (I-300)+(1.092)+(2.055), (I-300)+(1.092)+(2.056), (I-300)+(1.092)+(2.057), (I-300)+(1.092)+(2.058), (I-300)+(1.092)+(2.059), (I-300)+(1.092)+(3.001), (I-300)+(1.092)+(3.002), (I-300)+(1.092)+(3.003), (I-300)+(1.092)+(3.004), (I-300)+(1.092)+(3.005), (I-300)+(1.092)+(3.006), (I-300)+(1.092)+(3.007), (I-300)+(1.092)+(3.008), (I-300)+(1.092)+(3.009), (I-300)+(1.092)+(3.010), (I-300)+(1.092)+(3.011), (I-300)+(1.092)+(3.012), (I-300)+(1.092)+(3.013), (I-300)+(1.092)+(3.014), (I-300)+(1.092)+(3.015), (I-300)+(1.092)+(3.016), (I-300)+(1.092)+(3.017), (I-300)+(1.092)+(3.018), (I-300)+(1.092)+(3.019), (I-300)+(1.092)+(3.020), (I-300)+(1.092)+(3.021), (I-300)+(1.092)+(3.022), (I-300)+(1.092)+(3.023), (I-300)+(1.092)+(3.024), (I-300)+(1.092)+(3.025), (I-300)+(1.092)+(3.026), (I-300)+(1.092)+(3.027), (I-300)+(1.092)+(3.028), (I-300)+(1.092)+(3.029), (I-300)+(1.092)+(3.030), (I-300)+(1.092)+(3.031), (I-300)+(1.092)+(5.001), (I-300)+(1.092)+(5.002), (I-300)+(1.092)+(5.003), (I-300)+(1.092)+(5.004), (I-300)+(1.092)+(5.005), (I-300)+(1.092)+(5.006), (I-300)+(1.092)+(5.007), (I-300)+(1.092)+(5.008), (I-300)+(1.092)+(5.009), (I-300)+(1.092)+(5.010), (I-300)+(1.092)+(5.011), (I-300)+(1.092)+(5.012), (I-300)+(1.092)+(5.013), (I-300)+(1.092)+(5.014), (I-300)+(1.092)+(5.015), (I-300)+(1.092)+(5.016), (I-300)+(1.092)+(5.017), (I-300)+(1.092)+(5.018), (I-300)+(1.092)+(5.019), (I-300)+(1.092)+(5.020), (I-300)+(1.092)+(5.021), (I-300)+(1.092)+(5.022), (I-300)+(1.092)+(5.023), (I-300)+(1.092)+(6.001), (I-300)+(1.092)+(6.002), (I-300)+(1.092)+(6.003), (I-300)+(1.092)+(6.004), (I-300)+(1.092)+(7.001), (I-300)+(1.092)+(7.002), (I-300)+(1.092)+(7.003), (I-300)+(1.092)+(7.004), (I-300)+(1.092)+(7.005), (I-300)+(1.092)+(7.006), (I-300)+(1.092)+(9.001), (I-300)+(1.092)+(9.002), (I-300)+(1.092)+(9.003), (I-300)+(1.092)+(9.004), (I-300)+(1.092)+(9.005), (I-300)+(1.092)+(9.006), (I-300)+(1.092)+(9.007), (I-300)+(1.092)+(9.008), (I-300)+(1.092)+(9.009), (I-300)+(1.092)+(14.001), (I-300)+(1.092)+(14.002), (I-300)+(1.092)+(15.008), (I-300)+(1.092)+(15.011), (I-300)+(1.092)+(15.012), (I-300)+(1.092)+(15.016), (I-300)+(1.092)+(15.025), (I-300)+(1.092)+(15.027), (I-300)+(1.092)+(15.047), (I-300)+(1.092)+(15.063), (I-300)+(1.092)+(15.064), (I-300)+(1.092)+(16.001), (I-300)+(1.092)+(16.002), (I-300)+(1.092)+(16.003), (I-300)+(1.092)+(16.004), (I-300)+(1.092)+(16.005), (I-300)+(1.092)+(16.006), (I-300)+(1.092)+(16.007), (I-300)+(1.092)+(16.008), (I-300)+(1.092)+(17.001), (I-300)+(1.092)+(17.002), (I-300)+(1.092)+(17.003), (I-300)+(1.092)+(17.004), (I-300)+(1.092)+(17.005), (I-300)+(1.092)+(17.006), (I-300)+(1.092)+(17.007), (I-300)+(1.092)+(17.008), (I-300)+(1.092)+(17.009), (I-300)+(1.092)+(17.010), (I-300)+(1.092)+(17.011), (I-300)+(1.092)+(17.012), (I-300)+(1.092)+(18.001), (I-300)+(2.001)+(3.001), (I-300)+(2.001)+(3.002), (I-300)+(2.001)+(3.003), (I-300)+(2.001)+(3.004), (I-300)+(2.001)+(3.005), (I-300)+(2.001)+(3.006), (I-300)+(2.001)+(3.007), (I-300)+(2.001)+(3.008), (I-300)+(2.001)+(3.009), (I-300)+(2.001)+(3.010), (I-300)+(2.001)+(3.011), (I-300)+(2.001)+(3.012), (I-300)+(2.001)+(3.013), (I-300)+(2.001)+(3.014), (I-300)+(2.001)+(3.015), (I-300)+(2.001)+(3.016), (I-300)+(2.001)+(3.017), (I-300)+(2.001)+(3.018), (I-300)+(2.001)+(3.019), (I-300)+(2.001)+(3.020), (I-300)+(2.001)+(3.021), (I-300)+(2.001)+(3.022), (I-300)+(2.001)+(3.023), (I-300)+(2.001)+(3.024), (I-300)+(2.001)+(3.025), (I-300)+(2.001)+(3.026), (I-300)+(2.001)+(3.027), (I-300)+(2.001)+(3.028), (I-300)+(2.001)+(3.029), (I-300)+(2.001)+(3.030), (I-300)+(2.001)+(3.031), (I-300)+(2.001)+(5.001), (I-300)+(2.001)+(5.002), (I-300)+(2.001)+(5.003), (I-300)+(2.001)+(5.004), (I-300)+(2.001)+(5.005), (I-300)+(2.001)+(5.006), (I-300)+(2.001)+(5.007), (I-300)+(2.001)+(5.008), (I-300)+(2.001)+(5.009), (I-300)+(2.001)+(5.010), (I-300)+(2.001)+(5.011), (I-300)+(2.001)+(5.012), (I-300)+(2.001)+(5.013), (I-300)+(2.001)+(5.014), (I-300)+(2.001)+(5.015), (I-300)+(2.001)+(5.016), (I-300)+(2.001)+(5.017), (I-300)+(2.001)+(5.018), (I-300)+(2.001)+(5.019), (I-300)+(2.001)+(5.020), (I-300)+(2.001)+(5.021), (I-300)+(2.001)+(5.022), (I-300)+(2.001)+(5.023), (I-300)+(2.001)+(6.001), (I-300)+(2.001)+(6.002), (I-300)+(2.001)+(6.003), (I-300)+(2.001)+(6.004), (I-300)+(2.001)+(7.001), (I-300)+(2.001)+(7.002), (I-300)+(2.001)+(7.003), (I-300)+(2.001)+(7.004), (I-300)+(2.001)+(7.005), (I-300)+(2.001)+(7.006), (I-300)+(2.001)+(9.001), (I-300)+(2.001)+(9.002), (I-300)+(2.001)+(9.003), (I-300)+(2.001)+(9.004), (I-300)+(2.001)+(9.005), (I-300)+(2.001)+(9.006), (I-300)+(2.001)+(9.007), (I-300)+(2.001)+(9.008), (I-300)+(2.001)+(9.009), (I-300)+(2.001)+(14.001), (I-300)+(2.001)+(14.002), (I-300)+(2.001)+(15.008), (I-300)+(2.001)+(15.011), (I-300)+(2.001)+(15.012), (I-300)+(2.001)+(15.016), (I-300)+(2.001)+(15.025), (I-300)+(2.001)+(15.027), (I-300)+(2.001)+(15.047), (I-300)+(2.001)+(15.063), (I-300)+(2.001)+(15.064), (I-300)+(2.001)+(16.001), (I-300)+(2.001)+(16.002), (I-300)+(2.001)+(16.003), (I-300)+(2.001)+(16.004), (I-300)+(2.001)+(16.005), (I-300)+(2.001)+(16.006), (I-300)+(2.001)+(16.007), (I-300)+(2.001)+(16.008), (I-300)+(2.001)+(17.001), (I-300)+(2.001)+(17.002), (I-300)+(2.001)+(17.003), (I-300)+(2.001)+(17.004), (I-300)+(2.001)+(17.005), (I-300)+(2.001)+(17.006), (I-300)+(2.001)+(17.007), (I-300)+(2.001)+(17.008), (I-300)+(2.001)+(17.009), (I-300)+(2.001)+(17.010), (I-300)+(2.001)+(17.011), (I-300)+(2.001)+(17.012), (I-300)+(2.001)+(18.001), (I-300)+(2.002)+(3.001), (I-300)+(2.002)+(3.002), (I-300)+(2.002)+(3.003), (I-300)+(2.002)+(3.004), (I-300)+(2.002)+(3.005), (I-300)+(2.002)+(3.006), (I-300)+(2.002)+(3.007), (I-300)+(2.002)+(3.008), (I-300)+(2.002)+(3.009), (I-300)+(2.002)+(3.010), (I-300)+(2.002)+(3.011), (I-300)+(2.002)+(3.012), (I-300)+(2.002)+(3.013), (I-300)+(2.002)+(3.014), (I-300)+(2.002)+(3.015), (I-300)+(2.002)+(3.016), (I-300)+(2.002)+(3.017), (I-300)+(2.002)+(3.018), (I-300)+(2.002)+(3.019), (I-300)+(2.002)+(3.020), (I-300)+(2.002)+(3.021), (I-300)+(2.002)+(3.022), (I-300)+(2.002)+(3.023), (I-300)+(2.002)+(3.024), (I-300)+(2.002)+(3.025), (I-300)+(2.002)+(3.026), (I-300)+(2.002)+(3.027), (I-300)+(2.002)+(3.028), (I-300)+(2.002)+(3.029), (I-300)+(2.002)+(3.030), (I-300)+(2.002)+(3.031), (I-300)+(2.002)+(5.001), (I-300)+(2.002)+(5.002), (I-300)+(2.002)+(5.003), (I-300)+(2.002)+(5.004), (I-300)+(2.002)+(5.005), (I-300)+(2.002)+(5.006), (I-300)+(2.002)+(5.007), (I-300)+(2.002)+(5.008), (I-300)+(2.002)+(5.009), (I-300)+(2.002)+(5.010), (I-300)+(2.002)+(5.011), (I-300)+(2.002)+(5.012), (I-300)+(2.002)+(5.013), (I-300)+(2.002)+(5.014), (I-300)+(2.002)+(5.015), (I-300)+(2.002)+(5.016), (I-300)+(2.002)+(5.017), (I-300)+(2.002)+(5.018), (I-300)+(2.002)+(5.019), (I-300)+(2.002)+(5.020), (I-300)+(2.002)+(5.021), (I-300)+(2.002)+(5.022), (I-300)+(2.002)+(5.023), (I-300)+(2.002)+(6.001), (I-300)+(2.002)+(6.002), (I-300)+(2.002)+(6.003), (I-300)+(2.002)+(6.004), (I-300)+(2.002)+(7.001), (I-300)+(2.002)+(7.002), (I-300)+(2.002)+(7.003), (I-300)+(2.002)+(7.004), (I-300)+(2.002)+(7.005), (I-300)+(2.002)+(7.006), (I-300)+(2.002)+(9.001), (I-300)+(2.002)+(9.002), (I-300)+(2.002)+(9.003), (I-300)+(2.002)+(9.004), (I-300)+(2.002)+(9.005), (I-300)+(2.002)+(9.006), (I-300)+(2.002)+(9.007), (I-300)+(2.002)+(9.008), (I-300)+(2.002)+(9.009), (I-300)+(2.002)+(14.001), (I-300)+(2.002)+(14.002), (I-300)+(2.002)+(15.008), (I-300)+(2.002)+(15.011), (I-300)+(2.002)+(15.012), (I-300)+(2.002)+(15.016), (I-300)+(2.002)+(15.025), (I-300)+(2.002)+(15.027), (I-300)+(2.002)+(15.047), (I-300)+(2.002)+(15.063), (I-300)+(2.002)+(15.064), (I-300)+(2.002)+(16.001), (I-300)+(2.002)+(16.002), (I-300)+(2.002)+(16.003), (I-300)+(2.002)+(16.004), (I-300)+(2.002)+(16.005), (I-300)+(2.002)+(16.006), (I-300)+(2.002)+(16.007), (I-300)+(2.002)+(16.008), (I-300)+(2.002)+(17.001), (I-300)+(2.002)+(17.002), (I-300)+(2.002)+(17.003), (I-300)+(2.002)+(17.004), (I-300)+(2.002)+(17.005), (I-300)+(2.002)+(17.006), (I-300)+(2.002)+(17.007), (I-300)+(2.002)+(17.008), (I-300)+(2.002)+(17.009), (I-300)+(2.002)+(17.010), (I-300)+(2.002)+(17.011), (I-300)+(2.002)+(17.012), (I-300)+(2.002)+(18.001), (I-300)+(2.003)+(3.001), (I-300)+(2.003)+(3.002), (I-300)+(2.003)+(3.003), (I-300)+(2.003)+(3.004), (I-300)+(2.003)+(3.005), (I-300)+(2.003)+(3.006), (I-300)+(2.003)+(3.007), (I-300)+(2.003)+(3.008), (I-300)+(2.003)+(3.009), (I-300)+(2.003)+(3.010), (I-300)+(2.003)+(3.011), (I-300)+(2.003)+(3.012), (I-300)+(2.003)+(3.013), (I-300)+(2.003)+(3.014), (I-300)+(2.003)+(3.015), (I-300)+(2.003)+(3.016), (I-300)+(2.003)+(3.017), (I-300)+(2.003)+(3.018), (I-300)+(2.003)+(3.019), (I-300)+(2.003)+(3.020), (I-300)+(2.003)+(3.021), (I-300)+(2.003)+(3.022), (I-300)+(2.003)+(3.023), (I-300)+(2.003)+(3.024), (I-300)+(2.003)+(3.025), (I-300)+(2.003)+(3.026), (I-300)+(2.003)+(3.027), (I-300)+(2.003)+(3.028), (I-300)+(2.003)+(3.029), (I-300)+(2.003)+(3.030), (I-300)+(2.003)+(3.031), (I-300)+(2.003)+(5.001), (I-300)+(2.003)+(5.002), (I-300)+(2.003)+(5.003), (I-300)+(2.003)+(5.004), (I-300)+(2.003)+(5.005), (I-300)+(2.003)+(5.006), (I-300)+(2.003)+(5.007), (I-300)+(2.003)+(5.008), (I-300)+(2.003)+(5.009), (I-300)+(2.003)+(5.010), (I-300)+(2.003)+(5.011), (I-300)+(2.003)+(5.012), (I-300)+(2.003)+(5.013), (I-300)+(2.003)+(5.014), (I-300)+(2.003)+(5.015), (I-300)+(2.003)+(5.016), (I-300)+(2.003)+(5.017), (I-300)+(2.003)+(5.018), (I-300)+(2.003)+(5.019), (I-300)+(2.003)+(5.020), (I-300)+(2.003)+(5.021), (I-300)+(2.003)+(5.022), (I-300)+(2.003)+(5.023), (I-300)+(2.003)+(6.001), (I-300)+(2.003)+(6.002), (I-300)+(2.003)+(6.003), (I-300)+(2.003)+(6.004), (I-300)+(2.003)+(7.001), (I-300)+(2.003)+(7.002), (I-300)+(2.003)+(7.003), (I-300)+(2.003)+(7.004), (I-300)+(2.003)+(7.005), (I-300)+(2.003)+(7.006), (I-300)+(2.003)+(9.001), (I-300)+(2.003)+(9.002), (I-300)+(2.003)+(9.003), (I-300)+(2.003)+(9.004), (I-300)+(2.003)+(9.005), (I-300)+(2.003)+(9.006), (I-300)+(2.003)+(9.007), (I-300)+(2.003)+(9.008), (I-300)+(2.003)+(9.009), (I-300)+(2.003)+(14.001), (I-300)+(2.003)+(14.002), (I-300)+(2.003)+(15.008), (I-300)+(2.003)+(15.011), (I-300)+(2.003)+(15.012), (I-300)+(2.003)+(15.016), (I-300)+(2.003)+(15.025), (I-300)+(2.003)+(15.027), (I-300)+(2.003)+(15.047), (I-300)+(2.003)+(15.063), (I-300)+(2.003)+(15.064), (I-300)+(2.003)+(16.001), (I-300)+(2.003)+(16.002), (I-300)+(2.003)+(16.003), (I-300)+(2.003)+(16.004), (I-300)+(2.003)+(16.005), (I-300)+(2.003)+(16.006), (I-300)+(2.003)+(16.007), (I-300)+(2.003)+(16.008), (I-300)+(2.003)+(17.001), (I-300)+(2.003)+(17.002), (I-300)+(2.003)+(17.003), (I-300)+(2.003)+(17.004), (I-300)+(2.003)+(17.005), (I-300)+(2.003)+(17.006), (I-300)+(2.003)+(17.007), (I-300)+(2.003)+(17.008), (I-300)+(2.003)+(17.009), (I-300)+(2.003)+(17.010), (I-300)+(2.003)+(17.011), (I-300)+(2.003)+(17.012), (I-300)+(2.003)+(18.001), (I-300)+(2.004)+(3.001), (I-300)+(2.004)+(3.002), (I-300)+(2.004)+(3.003), (I-300)+(2.004)+(3.004), (I-300)+(2.004)+(3.005), (I-300)+(2.004)+(3.006), (I-300)+(2.004)+(3.007), (I-300)+(2.004)+(3.008), (I-300)+(2.004)+(3.009), (I-300)+(2.004)+(3.010), (I-300)+(2.004)+(3.011), (I-300)+(2.004)+(3.012), (I-300)+(2.004)+(3.013), (I-300)+(2.004)+(3.014), (I-300)+(2.004)+(3.015), (I-300)+(2.004)+(3.016), (I-300)+(2.004)+(3.017), (I-300)+(2.004)+(3.018), (I-300)+(2.004)+(3.019), (I-300)+(2.004)+(3.020), (I-300)+(2.004)+(3.021), (I-300)+(2.004)+(3.022), (I-300)+(2.004)+(3.023), (I-300)+(2.004)+(3.024), (I-300)+(2.004)+(3.025), (I-300)+(2.004)+(3.026), (I-300)+(2.004)+(3.027), (I-300)+(2.004)+(3.028), (I-300)+(2.004)+(3.029), (I-300)+(2.004)+(3.030), (I-300)+(2.004)+(3.031), (I-300)+(2.004)+(5.001), (I-300)+(2.004)+(5.002), (I-300)+(2.004)+(5.003), (I-300)+(2.004)+(5.004), (I-300)+(2.004)+(5.005), (I-300)+(2.004)+(5.006), (I-300)+(2.004)+(5.007), (I-300)+(2.004)+(5.008), (I-300)+(2.004)+(5.009), (I-300)+(2.004)+(5.010), (I-300)+(2.004)+(5.011), (I-300)+(2.004)+(5.012), (I-300)+(2.004)+(5.013), (I-300)+(2.004)+(5.014), (I-300)+(2.004)+(5.015), (I-300)+(2.004)+(5.016), (I-300)+(2.004)+(5.017), (I-300)+(2.004)+(5.018), (I-300)+(2.004)+(5.019), (I-300)+(2.004)+(5.020), (I-300)+(2.004)+(5.021), (I-300)+(2.004)+(5.022), (I-300)+(2.004)+(5.023), (I-300)+(2.004)+(6.001), (I-300)+(2.004)+(6.002), (I-300)+(2.004)+(6.003), (I-300)+(2.004)+(6.004), (I-300)+(2.004)+(7.001), (I-300)+(2.004)+(7.002), (I-300)+(2.004)+(7.003), (I-300)+(2.004)+(7.004), (I-300)+(2.004)+(7.005), (I-300)+(2.004)+(7.006), (I-300)+(2.004)+(9.001), (I-300)+(2.004)+(9.002), (I-300)+(2.004)+(9.003), (I-300)+(2.004)+(9.004), (I-300)+(2.004)+(9.005), (I-300)+(2.004)+(9.006), (I-300)+(2.004)+(9.007), (I-300)+(2.004)+(9.008), (I-300)+(2.004)+(9.009), (I-300)+(2.004)+(14.001), (I-300)+(2.004)+(14.002), (I-300)+(2.004)+(15.008), (I-300)+(2.004)+(15.011), (I-300)+(2.004)+(15.012), (I-300)+(2.004)+(15.016), (I-300)+(2.004)+(15.025), (I-300)+(2.004)+(15.027), (I-300)+(2.004)+(15.047), (I-300)+(2.004)+(15.063), (I-300)+(2.004)+(15.064), (I-300)+(2.004)+(16.001), (I-300)+(2.004)+(16.002), (I-300)+(2.004)+(16.003), (I-300)+(2.004)+(16.004), (I-300)+(2.004)+(16.005), (I-300)+(2.004)+(16.006), (I-300)+(2.004)+(16.007), (I-300)+(2.004)+(16.008), (I-300)+(2.004)+(17.001), (I-300)+(2.004)+(17.002), (I-300)+(2.004)+(17.003), (I-300)+(2.004)+(17.004), (I-300)+(2.004)+(17.005), (I-300)+(2.004)+(17.006), (I-300)+(2.004)+(17.007), (I-300)+(2.004)+(17.008), (I-300)+(2.004)+(17.009), (I-300)+(2.004)+(17.010), (I-300)+(2.004)+(17.011), (I-300)+(2.004)+(17.012), (I-300)+(2.004)+(18.001), (I-300)+(2.005)+(3.001), (I-300)+(2.005)+(3.002), (I-300)+(2.005)+(3.003), (I-300)+(2.005)+(3.004), (I-300)+(2.005)+(3.005), (I-300)+(2.005)+(3.006), (I-300)+(2.005)+(3.007), (I-300)+(2.005)+(3.008), (I-300)+(2.005)+(3.009), (I-300)+(2.005)+(3.010), (I-300)+(2.005)+(3.011), (I-300)+(2.005)+(3.012), (I-300)+(2.005)+(3.013), (I-300)+(2.005)+(3.014), (I-300)+(2.005)+(3.015), (I-300)+(2.005)+(3.016), (I-300)+(2.005)+(3.017), (I-300)+(2.005)+(3.018), (I-300)+(2.005)+(3.019), (I-300)+(2.005)+(3.020), (I-300)+(2.005)+(3.021), (I-300)+(2.005)+(3.022), (I-300)+(2.005)+(3.023), (I-300)+(2.005)+(3.024), (I-300)+(2.005)+(3.025), (I-300)+(2.005)+(3.026), (I-300)+(2.005)+(3.027), (I-300)+(2.005)+(3.028), (I-300)+(2.005)+(3.029), (I-300)+(2.005)+(3.030), (I-300)+(2.005)+(3.031), (I-300)+(2.005)+(5.001), (I-300)+(2.005)+(5.002), (I-300)+(2.005)+(5.003), (I-300)+(2.005)+(5.004), (I-300)+(2.005)+(5.005), (I-300)+(2.005)+(5.006), (I-300)+(2.005)+(5.007), (I-300)+(2.005)+(5.008), (I-300)+(2.005)+(5.009), (I-300)+(2.005)+(5.010), (I-300)+(2.005)+(5.011), (I-300)+(2.005)+(5.012), (I-300)+(2.005)+(5.013), (I-300)+(2.005)+(5.014), (I-300)+(2.005)+(5.015), (I-300)+(2.005)+(5.016), (I-300)+(2.005)+(5.017), (I-300)+(2.005)+(5.018), (I-300)+(2.005)+(5.019), (I-300)+(2.005)+(5.020), (I-300)+(2.005)+(5.021), (I-300)+(2.005)+(5.022), (I-300)+(2.005)+(5.023), (I-300)+(2.005)+(6.001), (I-300)+(2.005)+(6.002), (I-300)+(2.005)+(6.003), (I-300)+(2.005)+(6.004), (I-300)+(2.005)+(7.001), (I-300)+(2.005)+(7.002), (I-300)+(2.005)+(7.003), (I-300)+(2.005)+(7.004), (I-300)+(2.005)+(7.005), (I-300)+(2.005)+(7.006), (I-300)+(2.005)+(9.001), (I-300)+(2.005)+(9.002), (I-300)+(2.005)+(9.003), (I-300)+(2.005)+(9.004), (I-300)+(2.005)+(9.005), (I-300)+(2.005)+(9.006), (I-300)+(2.005)+(9.007), (I-300)+(2.005)+(9.008), (I-300)+(2.005)+(9.009), (I-300)+(2.005)+(14.001), (I-300)+(2.005)+(14.002), (I-300)+(2.005)+(15.008), (I-300)+(2.005)+(15.011), (I-300)+(2.005)+(15.012), (I-300)+(2.005)+(15.016), (I-300)+(2.005)+(15.025), (I-300)+(2.005)+(15.027), (I-300)+(2.005)+(15.047), (I-300)+(2.005)+(15.063), (I-300)+(2.005)+(15.064), (I-300)+(2.005)+(16.001), (I-300)+(2.005)+(16.002), (I-300)+(2.005)+(16.003), (I-300)+(2.005)+(16.004), (I-300)+(2.005)+(16.005), (I-300)+(2.005)+(16.006), (I-300)+(2.005)+(16.007), (I-300)+(2.005)+(16.008), (I-300)+(2.005)+(17.001), (I-300)+(2.005)+(17.002), (I-300)+(2.005)+(17.003), (I-300)+(2.005)+(17.004), (I-300)+(2.005)+(17.005), (I-300)+(2.005)+(17.006), (I-300)+(2.005)+(17.007), (I-300)+(2.005)+(17.008), (I-300)+(2.005)+(17.009), (I-300)+(2.005)+(17.010), (I-300)+(2.005)+(17.011), (I-300)+(2.005)+(17.012), (I-300)+(2.005)+(18.001), (I-300)+(2.006)+(3.001), (I-300)+(2.006)+(3.002), (I-300)+(2.006)+(3.003), (I-300)+(2.006)+(3.004), (I-300)+(2.006)+(3.005), (I-300)+(2.006)+(3.006), (I-300)+(2.006)+(3.007), (I-300)+(2.006)+(3.008), (I-300)+(2.006)+(3.009), (I-300)+(2.006)+(3.010), (I-300)+(2.006)+(3.011), (I-300)+(2.006)+(3.012), (I-300)+(2.006)+(3.013), (I-300)+(2.006)+(3.014), (I-300)+(2.006)+(3.015), (I-300)+(2.006)+(3.016), (I-300)+(2.006)+(3.017), (I-300)+(2.006)+(3.018), (I-300)+(2.006)+(3.019), (I-300)+(2.006)+(3.020), (I-300)+(2.006)+(3.021), (I-300)+(2.006)+(3.022), (I-300)+(2.006)+(3.023), (I-300)+(2.006)+(3.024), (I-300)+(2.006)+(3.025), (I-300)+(2.006)+(3.026), (I-300)+(2.006)+(3.027), (I-300)+(2.006)+(3.028), (I-300)+(2.006)+(3.029), (I-300)+(2.006)+(3.030), (I-300)+(2.006)+(3.031), (I-300)+(2.006)+(5.001), (I-300)+(2.006)+(5.002), (I-300)+(2.006)+(5.003), (I-300)+(2.006)+(5.004), (I-300)+(2.006)+(5.005), (I-300)+(2.006)+(5.006), (I-300)+(2.006)+(5.007), (I-300)+(2.006)+(5.008), (I-300)+(2.006)+(5.009), (I-300)+(2.006)+(5.010), (I-300)+(2.006)+(5.011), (I-300)+(2.006)+(5.012), (I-300)+(2.006)+(5.013), (I-300)+(2.006)+(5.014), (I-300)+(2.006)+(5.015), (I-300)+(2.006)+(5.016), (I-300)+(2.006)+(5.017), (I-300)+(2.006)+(5.018), (I-300)+(2.006)+(5.019), (I-300)+(2.006)+(5.020), (I-300)+(2.006)+(5.021), (I-300)+(2.006)+(5.022), (I-300)+(2.006)+(5.023), (I-300)+(2.006)+(6.001), (I-300)+(2.006)+(6.002), (I-300)+(2.006)+(6.003), (I-300)+(2.006)+(6.004), (I-300)+(2.006)+(7.001), (I-300)+(2.006)+(7.002), (I-300)+(2.006)+(7.003), (I-300)+(2.006)+(7.004), (I-300)+(2.006)+(7.005), (I-300)+(2.006)+(7.006), (I-300)+(2.006)+(9.001), (I-300)+(2.006)+(9.002), (I-300)+(2.006)+(9.003), (I-300)+(2.006)+(9.004), (I-300)+(2.006)+(9.005), (I-300)+(2.006)+(9.006), (I-300)+(2.006)+(9.007), (I-300)+(2.006)+(9.008), (I-300)+(2.006)+(9.009), (I-300)+(2.006)+(14.001), (I-300)+(2.006)+(14.002), (I-300)+(2.006)+(15.008), (I-300)+(2.006)+(15.011), (I-300)+(2.006)+(15.012), (I-300)+(2.006)+(15.016), (I-300)+(2.006)+(15.025), (I-300)+(2.006)+(15.027), (I-300)+(2.006)+(15.047), (I-300)+(2.006)+(15.063), (I-300)+(2.006)+(15.064), (I-300)+(2.006)+(16.001), (I-300)+(2.006)+(16.002), (I-300)+(2.006)+(16.003), (I-300)+(2.006)+(16.004), (I-300)+(2.006)+(16.005), (I-300)+(2.006)+(16.006), (I-300)+(2.006)+(16.007), (I-300)+(2.006)+(16.008), (I-300)+(2.006)+(17.001), (I-300)+(2.006)+(17.002), (I-300)+(2.006)+(17.003), (I-300)+(2.006)+(17.004), (I-300)+(2.006)+(17.005), (I-300)+(2.006)+(17.006), (I-300)+(2.006)+(17.007), (I-300)+(2.006)+(17.008), (I-300)+(2.006)+(17.009), (I-300)+(2.006)+(17.010), (I-300)+(2.006)+(17.011), (I-300)+(2.006)+(17.012), (I-300)+(2.006)+(18.001), (I-300)+(2.007)+(3.001), (I-300)+(2.007)+(3.002), (I-300)+(2.007)+(3.003), (I-300)+(2.007)+(3.004), (I-300)+(2.007)+(3.005), (I-300)+(2.007)+(3.006), (I-300)+(2.007)+(3.007), (I-300)+(2.007)+(3.008), (I-300)+(2.007)+(3.009), (I-300)+(2.007)+(3.010), (I-300)+(2.007)+(3.011), (I-300)+(2.007)+(3.012), (I-300)+(2.007)+(3.013), (I-300)+(2.007)+(3.014), (I-300)+(2.007)+(3.015), (I-300)+(2.007)+(3.016), (I-300)+(2.007)+(3.017), (I-300)+(2.007)+(3.018), (I-300)+(2.007)+(3.019), (I-300)+(2.007)+(3.020), (I-300)+(2.007)+(3.021), (I-300)+(2.007)+(3.022), (I-300)+(2.007)+(3.023), (I-300)+(2.007)+(3.024), (I-300)+(2.007)+(3.025), (I-300)+(2.007)+(3.026), (I-300)+(2.007)+(3.027), (I-300)+(2.007)+(3.028), (I-300)+(2.007)+(3.029), (I-300)+(2.007)+(3.030), (I-300)+(2.007)+(3.031), (I-300)+(2.007)+(5.001), (I-300)+(2.007)+(5.002), (I-300)+(2.007)+(5.003), (I-300)+(2.007)+(5.004), (I-300)+(2.007)+(5.005), (I-300)+(2.007)+(5.006), (I-300)+(2.007)+(5.007), (I-300)+(2.007)+(5.008), (I-300)+(2.007)+(5.009), (I-300)+(2.007)+(5.010), (I-300)+(2.007)+(5.011), (I-300)+(2.007)+(5.012), (I-300)+(2.007)+(5.013), (I-300)+(2.007)+(5.014), (I-300)+(2.007)+(5.015), (I-300)+(2.007)+(5.016), (I-300)+(2.007)+(5.017), (I-300)+(2.007)+(5.018), (I-300)+(2.007)+(5.019), (I-300)+(2.007)+(5.020), (I-300)+(2.007)+(5.021), (I-300)+(2.007)+(5.022), (I-300)+(2.007)+(5.023), (I-300)+(2.007)+(6.001), (I-300)+(2.007)+(6.002), (I-300)+(2.007)+(6.003), (I-300)+(2.007)+(6.004), (I-300)+(2.007)+(7.001), (I-300)+(2.007)+(7.002), (I-300)+(2.007)+(7.003), (I-300)+(2.007)+(7.004), (I-300)+(2.007)+(7.005), (I-300)+(2.007)+(7.006), (I-300)+(2.007)+(9.001), (I-300)+(2.007)+(9.002), (I-300)+(2.007)+(9.003), (I-300)+(2.007)+(9.004), (I-300)+(2.007)+(9.005), (I-300)+(2.007)+(9.006), (I-300)+(2.007)+(9.007), (I-300)+(2.007)+(9.008), (I-300)+(2.007)+(9.009), (I-300)+(2.007)+(14.001), (I-300)+(2.007)+(14.002), (I-300)+(2.007)+(15.008), (I-300)+(2.007)+(15.011), (I-300)+(2.007)+(15.012), (I-300)+(2.007)+(15.016), (I-300)+(2.007)+(15.025), (I-300)+(2.007)+(15.027), (I-300)+(2.007)+(15.047), (I-300)+(2.007)+(15.063), (I-300)+(2.007)+(15.064), (I-300)+(2.007)+(16.001), (I-300)+(2.007)+(16.002), (I-300)+(2.007)+(16.003), (I-300)+(2.007)+(16.004), (I-300)+(2.007)+(16.005), (I-300)+(2.007)+(16.006), (I-300)+(2.007)+(16.007), (I-300)+(2.007)+(16.008), (I-300)+(2.007)+(17.001), (I-300)+(2.007)+(17.002), (I-300)+(2.007)+(17.003), (I-300)+(2.007)+(17.004), (I-300)+(2.007)+(17.005), (I-300)+(2.007)+(17.006), (I-300)+(2.007)+(17.007), (I-300)+(2.007)+(17.008), (I-300)+(2.007)+(17.009), (I-300)+(2.007)+(17.010), (I-300)+(2.007)+(17.011), (I-300)+(2.007)+(17.012), (I-300)+(2.007)+(18.001), (I-300)+(2.008)+(3.001), (I-300)+(2.008)+(3.002), (I-300)+(2.008)+(3.003), (I-300)+(2.008)+(3.004), (I-300)+(2.008)+(3.005), (I-300)+(2.008)+(3.006), (I-300)+(2.008)+(3.007), (I-300)+(2.008)+(3.008), (I-300)+(2.008)+(3.009), (I-300)+(2.008)+(3.010), (I-300)+(2.008)+(3.011), (I-300)+(2.008)+(3.012), (I-300)+(2.008)+(3.013), (I-300)+(2.008)+(3.014), (I-300)+(2.008)+(3.015), (I-300)+(2.008)+(3.016), (I-300)+(2.008)+(3.017), (I-300)+(2.008)+(3.018), (I-300)+(2.008)+(3.019), (I-300)+(2.008)+(3.020), (I-300)+(2.008)+(3.021), (I-300)+(2.008)+(3.022), (I-300)+(2.008)+(3.023), (I-300)+(2.008)+(3.024), (I-300)+(2.008)+(3.025), (I-300)+(2.008)+(3.026), (I-300)+(2.008)+(3.027), (I-300)+(2.008)+(3.028), (I-300)+(2.008)+(3.029), (I-300)+(2.008)+(3.030), (I-300)+(2.008)+(3.031), (I-300)+(2.008)+(5.001), (I-300)+(2.008)+(5.002), (I-300)+(2.008)+(5.003), (I-300)+(2.008)+(5.004), (I-300)+(2.008)+(5.005), (I-300)+(2.008)+(5.006), (I-300)+(2.008)+(5.007), (I-300)+(2.008)+(5.008), (I-300)+(2.008)+(5.009), (I-300)+(2.008)+(5.010), (I-300)+(2.008)+(5.011), (I-300)+(2.008)+(5.012), (I-300)+(2.008)+(5.013), (I-300)+(2.008)+(5.014), (I-300)+(2.008)+(5.015), (I-300)+(2.008)+(5.016), (I-300)+(2.008)+(5.017), (I-300)+(2.008)+(5.018), (I-300)+(2.008)+(5.019), (I-300)+(2.008)+(5.020), (I-300)+(2.008)+(5.021), (I-300)+(2.008)+(5.022), (I-300)+(2.008)+(5.023), (I-300)+(2.008)+(6.001), (I-300)+(2.008)+(6.002), (I-300)+(2.008)+(6.003), (I-300)+(2.008)+(6.004), (I-300)+(2.008)+(7.001), (I-300)+(2.008)+(7.002), (I-300)+(2.008)+(7.003), (I-300)+(2.008)+(7.004), (I-300)+(2.008)+(7.005), (I-300)+(2.008)+(7.006), (I-300)+(2.008)+(9.001), (I-300)+(2.008)+(9.002), (I-300)+(2.008)+(9.003), (I-300)+(2.008)+(9.004), (I-300)+(2.008)+(9.005), (I-300)+(2.008)+(9.006), (I-300)+(2.008)+(9.007), (I-300)+(2.008)+(9.008), (I-300)+(2.008)+(9.009), (I-300)+(2.008)+(14.001), (I-300)+(2.008)+(14.002), (I-300)+(2.008)+(15.008), (I-300)+(2.008)+(15.011), (I-300)+(2.008)+(15.012), (I-300)+(2.008)+(15.016), (I-300)+(2.008)+(15.025), (I-300)+(2.008)+(15.027), (I-300)+(2.008)+(15.047), (I-300)+(2.008)+(15.063), (I-300)+(2.008)+(15.064), (I-300)+(2.008)+(16.001), (I-300)+(2.008)+(16.002), (I-300)+(2.008)+(16.003), (I-300)+(2.008)+(16.004), (I-300)+(2.008)+(16.005), (I-300)+(2.008)+(16.006), (I-300)+(2.008)+(16.007), (I-300)+(2.008)+(16.008), (I-300)+(2.008)+(17.001), (I-300)+(2.008)+(17.002), (I-300)+(2.008)+(17.003), (I-300)+(2.008)+(17.004), (I-300)+(2.008)+(17.005), (I-300)+(2.008)+(17.006), (I-300)+(2.008)+(17.007), (I-300)+(2.008)+(17.008), (I-300)+(2.008)+(17.009), (I-300)+(2.008)+(17.010), (I-300)+(2.008)+(17.011), (I-300)+(2.008)+(17.012), (I-300)+(2.008)+(18.001), (I-300)+(2.009)+(3.001), (I-300)+(2.009)+(3.002), (I-300)+(2.009)+(3.003), (I-300)+(2.009)+(3.004), (I-300)+(2.009)+(3.005), (I-300)+(2.009)+(3.006), (I-300)+(2.009)+(3.007), (I-300)+(2.009)+(3.008), (I-300)+(2.009)+(3.009), (I-300)+(2.009)+(3.010), (I-300)+(2.009)+(3.011), (I-300)+(2.009)+(3.012), (I-300)+(2.009)+(3.013), (I-300)+(2.009)+(3.014), (I-300)+(2.009)+(3.015), (I-300)+(2.009)+(3.016), (I-300)+(2.009)+(3.017), (I-300)+(2.009)+(3.018), (I-300)+(2.009)+(3.019), (I-300)+(2.009)+(3.020), (I-300)+(2.009)+(3.021), (I-300)+(2.009)+(3.022), (I-300)+(2.009)+(3.023), (I-300)+(2.009)+(3.024), (I-300)+(2.009)+(3.025), (I-300)+(2.009)+(3.026), (I-300)+(2.009)+(3.027), (I-300)+(2.009)+(3.028), (I-300)+(2.009)+(3.029), (I-300)+(2.009)+(3.030), (I-300)+(2.009)+(3.031), (I-300)+(2.009)+(5.001), (I-300)+(2.009)+(5.002), (I-300)+(2.009)+(5.003), (I-300)+(2.009)+(5.004), (I-300)+(2.009)+(5.005), (I-300)+(2.009)+(5.006), (I-300)+(2.009)+(5.007), (I-300)+(2.009)+(5.008), (I-300)+(2.009)+(5.009), (I-300)+(2.009)+(5.010), (I-300)+(2.009)+(5.011), (I-300)+(2.009)+(5.012), (I-300)+(2.009)+(5.013), (I-300)+(2.009)+(5.014), (I-300)+(2.009)+(5.015), (I-300)+(2.009)+(5.016), (I-300)+(2.009)+(5.017), (I-300)+(2.009)+(5.018), (I-300)+(2.009)+(5.019), (I-300)+(2.009)+(5.020), (I-300)+(2.009)+(5.021), (I-300)+(2.009)+(5.022), (I-300)+(2.009)+(5.023), (I-300)+(2.009)+(6.001), (I-300)+(2.009)+(6.002), (I-300)+(2.009)+(6.003), (I-300)+(2.009)+(6.004), (I-300)+(2.009)+(7.001), (I-300)+(2.009)+(7.002), (I-300)+(2.009)+(7.003), (I-300)+(2.009)+(7.004), (I-300)+(2.009)+(7.005), (I-300)+(2.009)+(7.006), (I-300)+(2.009)+(9.001), (I-300)+(2.009)+(9.002), (I-300)+(2.009)+(9.003), (I-300)+(2.009)+(9.004), (I-300)+(2.009)+(9.005), (I-300)+(2.009)+(9.006), (I-300)+(2.009)+(9.007), (I-300)+(2.009)+(9.008), (I-300)+(2.009)+(9.009), (I-300)+(2.009)+(14.001), (I-300)+(2.009)+(14.002), (I-300)+(2.009)+(15.008), (I-300)+(2.009)+(15.011), (I-300)+(2.009)+(15.012), (I-300)+(2.009)+(15.016), (I-300)+(2.009)+(15.025), (I-300)+(2.009)+(15.027), (I-300)+(2.009)+(15.047), (I-300)+(2.009)+(15.063), (I-300)+(2.009)+(15.064), (I-300)+(2.009)+(16.001), (I-300)+(2.009)+(16.002), (I-300)+(2.009)+(16.003), (I-300)+(2.009)+(16.004), (I-300)+(2.009)+(16.005), (I-300)+(2.009)+(16.006), (I-300)+(2.009)+(16.007), (I-300)+(2.009)+(16.008), (I-300)+(2.009)+(17.001), (I-300)+(2.009)+(17.002), (I-300)+(2.009)+(17.003), (I-300)+(2.009)+(17.004), (I-300)+(2.009)+(17.005), (I-300)+(2.009)+(17.006), (I-300)+(2.009)+(17.007), (I-300)+(2.009)+(17.008), (I-300)+(2.009)+(17.009), (I-300)+(2.009)+(17.010), (I-300)+(2.009)+(17.011), (I-300)+(2.009)+(17.012), (I-300)+(2.009)+(18.001), (I-300)+(2.010)+(3.001), (I-300)+(2.010)+(3.002), (I-300)+(2.010)+(3.003), (I-300)+(2.010)+(3.004), (I-300)+(2.010)+(3.005), (I-300)+(2.010)+(3.006), (I-300)+(2.010)+(3.007), (I-300)+(2.010)+(3.008), (I-300)+(2.010)+(3.009), (I-300)+(2.010)+(3.010), (I-300)+(2.010)+(3.011), (I-300)+(2.010)+(3.012), (I-300)+(2.010)+(3.013), (I-300)+(2.010)+(3.014), (I-300)+(2.010)+(3.015), (I-300)+(2.010)+(3.016), (I-300)+(2.010)+(3.017), (I-300)+(2.010)+(3.018), (I-300)+(2.010)+(3.019), (I-300)+(2.010)+(3.020), (I-300)+(2.010)+(3.021), (I-300)+(2.010)+(3.022), (I-300)+(2.010)+(3.023), (I-300)+(2.010)+(3.024), (I-300)+(2.010)+(3.025), (I-300)+(2.010)+(3.026), (I-300)+(2.010)+(3.027), (I-300)+(2.010)+(3.028), (I-300)+(2.010)+(3.029), (I-300)+(2.010)+(3.030), (I-300)+(2.010)+(3.031), (I-300)+(2.010)+(5.001), (I-300)+(2.010)+(5.002), (I-300)+(2.010)+(5.003), (I-300)+(2.010)+(5.004), (I-300)+(2.010)+(5.005), (I-300)+(2.010)+(5.006), (I-300)+(2.010)+(5.007), (I-300)+(2.010)+(5.008), (I-300)+(2.010)+(5.009), (I-300)+(2.010)+(5.010), (I-300)+(2.010)+(5.011), (I-300)+(2.010)+(5.012), (I-300)+(2.010)+(5.013), (I-300)+(2.010)+(5.014), (I-300)+(2.010)+(5.015), (I-300)+(2.010)+(5.016), (I-300)+(2.010)+(5.017), (I-300)+(2.010)+(5.018), (I-300)+(2.010)+(5.019), (I-300)+(2.010)+(5.020), (I-300)+(2.010)+(5.021), (I-300)+(2.010)+(5.022), (I-300)+(2.010)+(5.023), (I-300)+(2.010)+(6.001), (I-300)+(2.010)+(6.002), (I-300)+(2.010)+(6.003), (I-300)+(2.010)+(6.004), (I-300)+(2.010)+(7.001), (I-300)+(2.010)+(7.002), (I-300)+(2.010)+(7.003), (I-300)+(2.010)+(7.004), (I-300)+(2.010)+(7.005), (I-300)+(2.010)+(7.006), (I-300)+(2.010)+(9.001), (I-300)+(2.010)+(9.002), (I-300)+(2.010)+(9.003), (I-300)+(2.010)+(9.004), (I-300)+(2.010)+(9.005), (I-300)+(2.010)+(9.006), (I-300)+(2.010)+(9.007), (I-300)+(2.010)+(9.008), (I-300)+(2.010)+(9.009), (I-300)+(2.010)+(14.001), (I-300)+(2.010)+(14.002), (I-300)+(2.010)+(15.008), (I-300)+(2.010)+(15.011), (I-300)+(2.010)+(15.012), (I-300)+(2.010)+(15.016), (I-300)+(2.010)+(15.025), (I-300)+(2.010)+(15.027), (I-300)+(2.010)+(15.047), (I-300)+(2.010)+(15.063), (I-300)+(2.010)+(15.064), (I-300)+(2.010)+(16.001), (I-300)+(2.010)+(16.002), (I-300)+(2.010)+(16.003), (I-300)+(2.010)+(16.004), (I-300)+(2.010)+(16.005), (I-300)+(2.010)+(16.006), (I-300)+(2.010)+(16.007), (I-300)+(2.010)+(16.008), (I-300)+(2.010)+(17.001), (I-300)+(2.010)+(17.002), (I-300)+(2.010)+(17.003), (I-300)+(2.010)+(17.004), (I-300)+(2.010)+(17.005), (I-300)+(2.010)+(17.006), (I-300)+(2.010)+(17.007), (I-300)+(2.010)+(17.008), (I-300)+(2.010)+(17.009), (I-300)+(2.010)+(17.010), (I-300)+(2.010)+(17.011), (I-300)+(2.010)+(17.012), (I-300)+(2.010)+(18.001), (I-300)+(2.011)+(3.001), (I-300)+(2.011)+(3.002), (I-300)+(2.011)+(3.003), (I-300)+(2.011)+(3.004), (I-300)+(2.011)+(3.005), (I-300)+(2.011)+(3.006), (I-300)+(2.011)+(3.007), (I-300)+(2.011)+(3.008), (I-300)+(2.011)+(3.009), (I-300)+(2.011)+(3.010), (I-300)+(2.011)+(3.011), (I-300)+(2.011)+(3.012), (I-300)+(2.011)+(3.013), (I-300)+(2.011)+(3.014), (I-300)+(2.011)+(3.015), (I-300)+(2.011)+(3.016), (I-300)+(2.011)+(3.017), (I-300)+(2.011)+(3.018), (I-300)+(2.011)+(3.019), (I-300)+(2.011)+(3.020), (I-300)+(2.011)+(3.021), (I-300)+(2.011)+(3.022), (I-300)+(2.011)+(3.023), (I-300)+(2.011)+(3.024), (I-300)+(2.011)+(3.025), (I-300)+(2.011)+(3.026), (I-300)+(2.011)+(3.027), (I-300)+(2.011)+(3.028), (I-300)+(2.011)+(3.029), (I-300)+(2.011)+(3.030), (I-300)+(2.011)+(3.031), (I-300)+(2.011)+(5.001), (I-300)+(2.011)+(5.002), (I-300)+(2.011)+(5.003), (I-300)+(2.011)+(5.004), (I-300)+(2.011)+(5.005), (I-300)+(2.011)+(5.006), (I-300)+(2.011)+(5.007), (I-300)+(2.011)+(5.008), (I-300)+(2.011)+(5.009), (I-300)+(2.011)+(5.010), (I-300)+(2.011)+(5.011), (I-300)+(2.011)+(5.012), (I-300)+(2.011)+(5.013), (I-300)+(2.011)+(5.014), (I-300)+(2.011)+(5.015), (I-300)+(2.011)+(5.016), (I-300)+(2.011)+(5.017), (I-300)+(2.011)+(5.018), (I-300)+(2.011)+(5.019), (I-300)+(2.011)+(5.020), (I-300)+(2.011)+(5.021), (I-300)+(2.011)+(5.022), (I-300)+(2.011)+(5.023), (I-300)+(2.011)+(6.001), (I-300)+(2.011)+(6.002), (I-300)+(2.011)+(6.003), (I-300)+(2.011)+(6.004), (I-300)+(2.011)+(7.001), (I-300)+(2.011)+(7.002), (I-300)+(2.011)+(7.003), (I-300)+(2.011)+(7.004), (I-300)+(2.011)+(7.005), (I-300)+(2.011)+(7.006), (I-300)+(2.011)+(9.001), (I-300)+(2.011)+(9.002), (I-300)+(2.011)+(9.003), (I-300)+(2.011)+(9.004), (I-300)+(2.011)+(9.005), (I-300)+(2.011)+(9.006), (I-300)+(2.011)+(9.007), (I-300)+(2.011)+(9.008), (I-300)+(2.011)+(9.009), (I-300)+(2.011)+(14.001), (I-300)+(2.011)+(14.002), (I-300)+(2.011)+(15.008), (I-300)+(2.011)+(15.011), (I-300)+(2.011)+(15.012), (I-300)+(2.011)+(15.016), (I-300)+(2.011)+(15.025), (I-300)+(2.011)+(15.027), (I-300)+(2.011)+(15.047), (I-300)+(2.011)+(15.063), (I-300)+(2.011)+(15.064), (I-300)+(2.011)+(16.001), (I-300)+(2.011)+(16.002), (I-300)+(2.011)+(16.003), (I-300)+(2.011)+(16.004), (I-300)+(2.011)+(16.005), (I-300)+(2.011)+(16.006), (I-300)+(2.011)+(16.007), (I-300)+(2.011)+(16.008), (I-300)+(2.011)+(17.001), (I-300)+(2.011)+(17.002), (I-300)+(2.011)+(17.003), (I-300)+(2.011)+(17.004), (I-300)+(2.011)+(17.005), (I-300)+(2.011)+(17.006), (I-300)+(2.011)+(17.007), (I-300)+(2.011)+(17.008), (I-300)+(2.011)+(17.009), (I-300)+(2.011)+(17.010), (I-300)+(2.011)+(17.011), (I-300)+(2.011)+(17.012), (I-300)+(2.011)+(18.001), (I-300)+(2.012)+(3.001), (I-300)+(2.012)+(3.002), (I-300)+(2.012)+(3.003), (I-300)+(2.012)+(3.004), (I-300)+(2.012)+(3.005), (I-300)+(2.012)+(3.006), (I-300)+(2.012)+(3.007), (I-300)+(2.012)+(3.008), (I-300)+(2.012)+(3.009), (I-300)+(2.012)+(3.010), (I-300)+(2.012)+(3.011), (I-300)+(2.012)+(3.012), (I-300)+(2.012)+(3.013), (I-300)+(2.012)+(3.014), (I-300)+(2.012)+(3.015), (I-300)+(2.012)+(3.016), (I-300)+(2.012)+(3.017), (I-300)+(2.012)+(3.018), (I-300)+(2.012)+(3.019), (I-300)+(2.012)+(3.020), (I-300)+(2.012)+(3.021), (I-300)+(2.012)+(3.022), (I-300)+(2.012)+(3.023), (I-300)+(2.012)+(3.024), (I-300)+(2.012)+(3.025), (I-300)+(2.012)+(3.026), (I-300)+(2.012)+(3.027), (I-300)+(2.012)+(3.028), (I-300)+(2.012)+(3.029), (I-300)+(2.012)+(3.030), (I-300)+(2.012)+(3.031), (I-300)+(2.012)+(5.001), (I-300)+(2.012)+(5.002), (I-300)+(2.012)+(5.003), (I-300)+(2.012)+(5.004), (I-300)+(2.012)+(5.005), (I-300)+(2.012)+(5.006), (I-300)+(2.012)+(5.007), (I-300)+(2.012)+(5.008), (I-300)+(2.012)+(5.009), (I-300)+(2.012)+(5.010), (I-300)+(2.012)+(5.011), (I-300)+(2.012)+(5.012), (I-300)+(2.012)+(5.013), (I-300)+(2.012)+(5.014), (I-300)+(2.012)+(5.015), (I-300)+(2.012)+(5.016), (I-300)+(2.012)+(5.017), (I-300)+(2.012)+(5.018), (I-300)+(2.012)+(5.019), (I-300)+(2.012)+(5.020), (I-300)+(2.012)+(5.021), (I-300)+(2.012)+(5.022), (I-300)+(2.012)+(5.023), (I-300)+(2.012)+(6.001), (I-300)+(2.012)+(6.002), (I-300)+(2.012)+(6.003), (I-300)+(2.012)+(6.004), (I-300)+(2.012)+(7.001), (I-300)+(2.012)+(7.002), (I-300)+(2.012)+(7.003), (I-300)+(2.012)+(7.004), (I-300)+(2.012)+(7.005), (I-300)+(2.012)+(7.006), (I-300)+(2.012)+(9.001), (I-300)+(2.012)+(9.002), (I-300)+(2.012)+(9.003), (I-300)+(2.012)+(9.004), (I-300)+(2.012)+(9.005), (I-300)+(2.012)+(9.006), (I-300)+(2.012)+(9.007), (I-300)+(2.012)+(9.008), (I-300)+(2.012)+(9.009), (I-300)+(2.012)+(14.001), (I-300)+(2.012)+(14.002), (I-300)+(2.012)+(15.008), (I-300)+(2.012)+(15.011), (I-300)+(2.012)+(15.012), (I-300)+(2.012)+(15.016), (I-300)+(2.012)+(15.025), (I-300)+(2.012)+(15.027), (I-300)+(2.012)+(15.047), (I-300)+(2.012)+(15.063), (I-300)+(2.012)+(15.064), (I-300)+(2.012)+(16.001), (I-300)+(2.012)+(16.002), (I-300)+(2.012)+(16.003), (I-300)+(2.012)+(16.004), (I-300)+(2.012)+(16.005), (I-300)+(2.012)+(16.006), (I-300)+(2.012)+(16.007), (I-300)+(2.012)+(16.008), (I-300)+(2.012)+(17.001), (I-300)+(2.012)+(17.002), (I-300)+(2.012)+(17.003), (I-300)+(2.012)+(17.004), (I-300)+(2.012)+(17.005), (I-300)+(2.012)+(17.006), (I-300)+(2.012)+(17.007), (I-300)+(2.012)+(17.008), (I-300)+(2.012)+(17.009), (I-300)+(2.012)+(17.010), (I-300)+(2.012)+(17.011), (I-300)+(2.012)+(17.012), (I-300)+(2.012)+(18.001), (I-300)+(2.013)+(3.001), (I-300)+(2.013)+(3.002), (I-300)+(2.013)+(3.003), (I-300)+(2.013)+(3.004), (I-300)+(2.013)+(3.005), (I-300)+(2.013)+(3.006), (I-300)+(2.013)+(3.007), (I-300)+(2.013)+(3.008), (I-300)+(2.013)+(3.009), (I-300)+(2.013)+(3.010), (I-300)+(2.013)+(3.011), (I-300)+(2.013)+(3.012), (I-300)+(2.013)+(3.013), (I-300)+(2.013)+(3.014), (I-300)+(2.013)+(3.015), (I-300)+(2.013)+(3.016), (I-300)+(2.013)+(3.017), (I-300)+(2.013)+(3.018), (I-300)+(2.013)+(3.019), (I-300)+(2.013)+(3.020), (I-300)+(2.013)+(3.021), (I-300)+(2.013)+(3.022), (I-300)+(2.013)+(3.023), (I-300)+(2.013)+(3.024), (I-300)+(2.013)+(3.025), (I-300)+(2.013)+(3.026), (I-300)+(2.013)+(3.027), (I-300)+(2.013)+(3.028), (I-300)+(2.013)+(3.029), (I-300)+(2.013)+(3.030), (I-300)+(2.013)+(3.031), (I-300)+(2.013)+(5.001), (I-300)+(2.013)+(5.002), (I-300)+(2.013)+(5.003), (I-300)+(2.013)+(5.004), (I-300)+(2.013)+(5.005), (I-300)+(2.013)+(5.006), (I-300)+(2.013)+(5.007), (I-300)+(2.013)+(5.008), (I-300)+(2.013)+(5.009), (I-300)+(2.013)+(5.010), (I-300)+(2.013)+(5.011), (I-300)+(2.013)+(5.012), (I-300)+(2.013)+(5.013), (I-300)+(2.013)+(5.014), (I-300)+(2.013)+(5.015), (I-300)+(2.013)+(5.016), (I-300)+(2.013)+(5.017), (I-300)+(2.013)+(5.018), (I-300)+(2.013)+(5.019), (I-300)+(2.013)+(5.020), (I-300)+(2.013)+(5.021), (I-300)+(2.013)+(5.022), (I-300)+(2.013)+(5.023), (I-300)+(2.013)+(6.001), (I-300)+(2.013)+(6.002), (I-300)+(2.013)+(6.003), (I-300)+(2.013)+(6.004), (I-300)+(2.013)+(7.001), (I-300)+(2.013)+(7.002), (I-300)+(2.013)+(7.003), (I-300)+(2.013)+(7.004), (I-300)+(2.013)+(7.005), (I-300)+(2.013)+(7.006), (I-300)+(2.013)+(9.001), (I-300)+(2.013)+(9.002), (I-300)+(2.013)+(9.003), (I-300)+(2.013)+(9.004), (I-300)+(2.013)+(9.005), (I-300)+(2.013)+(9.006), (I-300)+(2.013)+(9.007), (I-300)+(2.013)+(9.008), (I-300)+(2.013)+(9.009), (I-300)+(2.013)+(14.001), (I-300)+(2.013)+(14.002), (I-300)+(2.013)+(15.008), (I-300)+(2.013)+(15.011), (I-300)+(2.013)+(15.012), (I-300)+(2.013)+(15.016), (I-300)+(2.013)+(15.025), (I-300)+(2.013)+(15.027), (I-300)+(2.013)+(15.047), (I-300)+(2.013)+(15.063), (I-300)+(2.013)+(15.064), (I-300)+(2.013)+(16.001), (I-300)+(2.013)+(16.002), (I-300)+(2.013)+(16.003), (I-300)+(2.013)+(16.004), (I-300)+(2.013)+(16.005), (I-300)+(2.013)+(16.006), (I-300)+(2.013)+(16.007), (I-300)+(2.013)+(16.008), (I-300)+(2.013)+(17.001), (I-300)+(2.013)+(17.002), (I-300)+(2.013)+(17.003), (I-300)+(2.013)+(17.004), (I-300)+(2.013)+(17.005), (I-300)+(2.013)+(17.006), (I-300)+(2.013)+(17.007), (I-300)+(2.013)+(17.008), (I-300)+(2.013)+(17.009), (I-300)+(2.013)+(17.010), (I-300)+(2.013)+(17.011), (I-300)+(2.013)+(17.012), (I-300)+(2.013)+(18.001), (I-300)+(2.014)+(3.001), (I-300)+(2.014)+(3.002), (I-300)+(2.014)+(3.003), (I-300)+(2.014)+(3.004), (I-300)+(2.014)+(3.005), (I-300)+(2.014)+(3.006), (I-300)+(2.014)+(3.007), (I-300)+(2.014)+(3.008), (I-300)+(2.014)+(3.009), (I-300)+(2.014)+(3.010), (I-300)+(2.014)+(3.011), (I-300)+(2.014)+(3.012), (I-300)+(2.014)+(3.013), (I-300)+(2.014)+(3.014), (I-300)+(2.014)+(3.015), (I-300)+(2.014)+(3.016), (I-300)+(2.014)+(3.017), (I-300)+(2.014)+(3.018), (I-300)+(2.014)+(3.019), (I-300)+(2.014)+(3.020), (I-300)+(2.014)+(3.021), (I-300)+(2.014)+(3.022), (I-300)+(2.014)+(3.023), (I-300)+(2.014)+(3.024), (I-300)+(2.014)+(3.025), (I-300)+(2.014)+(3.026), (I-300)+(2.014)+(3.027), (I-300)+(2.014)+(3.028), (I-300)+(2.014)+(3.029), (I-300)+(2.014)+(3.030), (I-300)+(2.014)+(3.031), (I-300)+(2.014)+(5.001), (I-300)+(2.014)+(5.002), (I-300)+(2.014)+(5.003), (I-300)+(2.014)+(5.004), (I-300)+(2.014)+(5.005), (I-300)+(2.014)+(5.006), (I-300)+(2.014)+(5.007), (I-300)+(2.014)+(5.008), (I-300)+(2.014)+(5.009), (I-300)+(2.014)+(5.010), (I-300)+(2.014)+(5.011), (I-300)+(2.014)+(5.012), (I-300)+(2.014)+(5.013), (I-300)+(2.014)+(5.014), (I-300)+(2.014)+(5.015), (I-300)+(2.014)+(5.016), (I-300)+(2.014)+(5.017), (I-300)+(2.014)+(5.018), (I-300)+(2.014)+(5.019), (I-300)+(2.014)+(5.020), (I-300)+(2.014)+(5.021), (I-300)+(2.014)+(5.022), (I-300)+(2.014)+(5.023), (I-300)+(2.014)+(6.001), (I-300)+(2.014)+(6.002), (I-300)+(2.014)+(6.003), (I-300)+(2.014)+(6.004), (I-300)+(2.014)+(7.001), (I-300)+(2.014)+(7.002), (I-300)+(2.014)+(7.003), (I-300)+(2.014)+(7.004), (I-300)+(2.014)+(7.005), (I-300)+(2.014)+(7.006), (I-300)+(2.014)+(9.001), (I-300)+(2.014)+(9.002), (I-300)+(2.014)+(9.003), (I-300)+(2.014)+(9.004), (I-300)+(2.014)+(9.005), (I-300)+(2.014)+(9.006), (I-300)+(2.014)+(9.007), (I-300)+(2.014)+(9.008), (I-300)+(2.014)+(9.009), (I-300)+(2.014)+(14.001), (I-300)+(2.014)+(14.002), (I-300)+(2.014)+(15.008), (I-300)+(2.014)+(15.011), (I-300)+(2.014)+(15.012), (I-300)+(2.014)+(15.016), (I-300)+(2.014)+(15.025), (I-300)+(2.014)+(15.027), (I-300)+(2.014)+(15.047), (I-300)+(2.014)+(15.063), (I-300)+(2.014)+(15.064), (I-300)+(2.014)+(16.001), (I-300)+(2.014)+(16.002), (I-300)+(2.014)+(16.003), (I-300)+(2.014)+(16.004), (I-300)+(2.014)+(16.005), (I-300)+(2.014)+(16.006), (I-300)+(2.014)+(16.007), (I-300)+(2.014)+(16.008), (I-300)+(2.014)+(17.001), (I-300)+(2.014)+(17.002), (I-300)+(2.014)+(17.003), (I-300)+(2.014)+(17.004), (I-300)+(2.014)+(17.005), (I-300)+(2.014)+(17.006), (I-300)+(2.014)+(17.007), (I-300)+(2.014)+(17.008), (I-300)+(2.014)+(17.009), (I-300)+(2.014)+(17.010), (I-300)+(2.014)+(17.011), (I-300)+(2.014)+(17.012), (I-300)+(2.014)+(18.001), (I-300)+(2.015)+(3.001), (I-300)+(2.015)+(3.002), (I-300)+(2.015)+(3.003), (I-300)+(2.015)+(3.004), (I-300)+(2.015)+(3.005), (I-300)+(2.015)+(3.006), (I-300)+(2.015)+(3.007), (I-300)+(2.015)+(3.008), (I-300)+(2.015)+(3.009), (I-300)+(2.015)+(3.010), (I-300)+(2.015)+(3.011), (I-300)+(2.015)+(3.012), (I-300)+(2.015)+(3.013), (I-300)+(2.015)+(3.014), (I-300)+(2.015)+(3.015), (I-300)+(2.015)+(3.016), (I-300)+(2.015)+(3.017), (I-300)+(2.015)+(3.018), (I-300)+(2.015)+(3.019), (I-300)+(2.015)+(3.020), (I-300)+(2.015)+(3.021), (I-300)+(2.015)+(3.022), (I-300)+(2.015)+(3.023), (I-300)+(2.015)+(3.024), (I-300)+(2.015)+(3.025), (I-300)+(2.015)+(3.026), (I-300)+(2.015)+(3.027), (I-300)+(2.015)+(3.028), (I-300)+(2.015)+(3.029), (I-300)+(2.015)+(3.030), (I-300)+(2.015)+(3.031), (I-300)+(2.015)+(5.001), (I-300)+(2.015)+(5.002), (I-300)+(2.015)+(5.003), (I-300)+(2.015)+(5.004), (I-300)+(2.015)+(5.005), (I-300)+(2.015)+(5.006), (I-300)+(2.015)+(5.007), (I-300)+(2.015)+(5.008), (I-300)+(2.015)+(5.009), (I-300)+(2.015)+(5.010), (I-300)+(2.015)+(5.011), (I-300)+(2.015)+(5.012), (I-300)+(2.015)+(5.013), (I-300)+(2.015)+(5.014), (I-300)+(2.015)+(5.015), (I-300)+(2.015)+(5.016), (I-300)+(2.015)+(5.017), (I-300)+(2.015)+(5.018), (I-300)+(2.015)+(5.019), (I-300)+(2.015)+(5.020), (I-300)+(2.015)+(5.021), (I-300)+(2.015)+(5.022), (I-300)+(2.015)+(5.023), (I-300)+(2.015)+(6.001), (I-300)+(2.015)+(6.002), (I-300)+(2.015)+(6.003), (I-300)+(2.015)+(6.004), (I-300)+(2.015)+(7.001), (I-300)+(2.015)+(7.002), (I-300)+(2.015)+(7.003), (I-300)+(2.015)+(7.004), (I-300)+(2.015)+(7.005), (I-300)+(2.015)+(7.006), (I-300)+(2.015)+(9.001), (I-300)+(2.015)+(9.002), (I-300)+(2.015)+(9.003), (I-300)+(2.015)+(9.004), (I-300)+(2.015)+(9.005), (I-300)+(2.015)+(9.006), (I-300)+(2.015)+(9.007), (I-300)+(2.015)+(9.008), (I-300)+(2.015)+(9.009), (I-300)+(2.015)+(14.001), (I-300)+(2.015)+(14.002), (I-300)+(2.015)+(15.008), (I-300)+(2.015)+(15.011), (I-300)+(2.015)+(15.012), (I-300)+(2.015)+(15.016), (I-300)+(2.015)+(15.025), (I-300)+(2.015)+(15.027), (I-300)+(2.015)+(15.047), (I-300)+(2.015)+(15.063), (I-300)+(2.015)+(15.064), (I-300)+(2.015)+(16.001), (I-300)+(2.015)+(16.002), (I-300)+(2.015)+(16.003), (I-300)+(2.015)+(16.004), (I-300)+(2.015)+(16.005), (I-300)+(2.015)+(16.006), (I-300)+(2.015)+(16.007), (I-300)+(2.015)+(16.008), (I-300)+(2.015)+(17.001), (I-300)+(2.015)+(17.002), (I-300)+(2.015)+(17.003), (I-300)+(2.015)+(17.004), (I-300)+(2.015)+(17.005), (I-300)+(2.015)+(17.006), (I-300)+(2.015)+(17.007), (I-300)+(2.015)+(17.008), (I-300)+(2.015)+(17.009), (I-300)+(2.015)+(17.010), (I-300)+(2.015)+(17.011), (I-300)+(2.015)+(17.012), (I-300)+(2.015)+(18.001), (I-300)+(2.016)+(3.001), (I-300)+(2.016)+(3.002), (I-300)+(2.016)+(3.003), (I-300)+(2.016)+(3.004), (I-300)+(2.016)+(3.005), (I-300)+(2.016)+(3.006), (I-300)+(2.016)+(3.007), (I-300)+(2.016)+(3.008), (I-300)+(2.016)+(3.009), (I-300)+(2.016)+(3.010), (I-300)+(2.016)+(3.011), (I-300)+(2.016)+(3.012), (I-300)+(2.016)+(3.013), (I-300)+(2.016)+(3.014), (I-300)+(2.016)+(3.015), (I-300)+(2.016)+(3.016), (I-300)+(2.016)+(3.017), (I-300)+(2.016)+(3.018), (I-300)+(2.016)+(3.019), (I-300)+(2.016)+(3.020), (I-300)+(2.016)+(3.021), (I-300)+(2.016)+(3.022), (I-300)+(2.016)+(3.023), (I-300)+(2.016)+(3.024), (I-300)+(2.016)+(3.025), (I-300)+(2.016)+(3.026), (I-300)+(2.016)+(3.027), (I-300)+(2.016)+(3.028), (I-300)+(2.016)+(3.029), (I-300)+(2.016)+(3.030), (I-300)+(2.016)+(3.031), (I-300)+(2.016)+(5.001), (I-300)+(2.016)+(5.002), (I-300)+(2.016)+(5.003), (I-300)+(2.016)+(5.004), (I-300)+(2.016)+(5.005), (I-300)+(2.016)+(5.006), (I-300)+(2.016)+(5.007), (I-300)+(2.016)+(5.008), (I-300)+(2.016)+(5.009), (I-300)+(2.016)+(5.010), (I-300)+(2.016)+(5.011), (I-300)+(2.016)+(5.012), (I-300)+(2.016)+(5.013), (I-300)+(2.016)+(5.014), (I-300)+(2.016)+(5.015), (I-300)+(2.016)+(5.016), (I-300)+(2.016)+(5.017), (I-300)+(2.016)+(5.018), (I-300)+(2.016)+(5.019), (I-300)+(2.016)+(5.020), (I-300)+(2.016)+(5.021), (I-300)+(2.016)+(5.022), (I-300)+(2.016)+(5.023), (I-300)+(2.016)+(6.001), (I-300)+(2.016)+(6.002), (I-300)+(2.016)+(6.003), (I-300)+(2.016)+(6.004), (I-300)+(2.016)+(7.001), (I-300)+(2.016)+(7.002), (I-300)+(2.016)+(7.003), (I-300)+(2.016)+(7.004), (I-300)+(2.016)+(7.005), (I-300)+(2.016)+(7.006), (I-300)+(2.016)+(9.001), (I-300)+(2.016)+(9.002), (I-300)+(2.016)+(9.003), (I-300)+(2.016)+(9.004), (I-300)+(2.016)+(9.005), (I-300)+(2.016)+(9.006), (I-300)+(2.016)+(9.007), (I-300)+(2.016)+(9.008), (I-300)+(2.016)+(9.009), (I-300)+(2.016)+(14.001), (I-300)+(2.016)+(14.002), (I-300)+(2.016)+(15.008), (I-300)+(2.016)+(15.011), (I-300)+(2.016)+(15.012), (I-300)+(2.016)+(15.016), (I-300)+(2.016)+(15.025), (I-300)+(2.016)+(15.027), (I-300)+(2.016)+(15.047), (I-300)+(2.016)+(15.063), (I-300)+(2.016)+(15.064), (I-300)+(2.016)+(16.001), (I-300)+(2.016)+(16.002), (I-300)+(2.016)+(16.003), (I-300)+(2.016)+(16.004), (I-300)+(2.016)+(16.005), (I-300)+(2.016)+(16.006), (I-300)+(2.016)+(16.007), (I-300)+(2.016)+(16.008), (I-300)+(2.016)+(17.001), (I-300)+(2.016)+(17.002), (I-300)+(2.016)+(17.003), (I-300)+(2.016)+(17.004), (I-300)+(2.016)+(17.005), (I-300)+(2.016)+(17.006), (I-300)+(2.016)+(17.007), (I-300)+(2.016)+(17.008), (I-300)+(2.016)+(17.009), (I-300)+(2.016)+(17.010), (I-300)+(2.016)+(17.011), (I-300)+(2.016)+(17.012), (I-300)+(2.016)+(18.001), (I-300)+(2.017)+(3.001), (I-300)+(2.017)+(3.002), (I-300)+(2.017)+(3.003), (I-300)+(2.017)+(3.004), (I-300)+(2.017)+(3.005), (I-300)+(2.017)+(3.006), (I-300)+(2.017)+(3.007), (I-300)+(2.017)+(3.008), (I-300)+(2.017)+(3.009), (I-300)+(2.017)+(3.010), (I-300)+(2.017)+(3.011), (I-300)+(2.017)+(3.012), (I-300)+(2.017)+(3.013), (I-300)+(2.017)+(3.014), (I-300)+(2.017)+(3.015), (I-300)+(2.017)+(3.016), (I-300)+(2.017)+(3.017), (I-300)+(2.017)+(3.018), (I-300)+(2.017)+(3.019), (I-300)+(2.017)+(3.020), (I-300)+(2.017)+(3.021), (I-300)+(2.017)+(3.022), (I-300)+(2.017)+(3.023), (I-300)+(2.017)+(3.024), (I-300)+(2.017)+(3.025), (I-300)+(2.017)+(3.026), (I-300)+(2.017)+(3.027), (I-300)+(2.017)+(3.028), (I-300)+(2.017)+(3.029), (I-300)+(2.017)+(3.030), (I-300)+(2.017)+(3.031), (I-300)+(2.017)+(5.001), (I-300)+(2.017)+(5.002), (I-300)+(2.017)+(5.003), (I-300)+(2.017)+(5.004), (I-300)+(2.017)+(5.005), (I-300)+(2.017)+(5.006), (I-300)+(2.017)+(5.007), (I-300)+(2.017)+(5.008), (I-300)+(2.017)+(5.009), (I-300)+(2.017)+(5.010), (I-300)+(2.017)+(5.011), (I-300)+(2.017)+(5.012), (I-300)+(2.017)+(5.013), (I-300)+(2.017)+(5.014), (I-300)+(2.017)+(5.015), (I-300)+(2.017)+(5.016), (I-300)+(2.017)+(5.017), (I-300)+(2.017)+(5.018), (I-300)+(2.017)+(5.019), (I-300)+(2.017)+(5.020), (I-300)+(2.017)+(5.021), (I-300)+(2.017)+(5.022), (I-300)+(2.017)+(5.023), (I-300)+(2.017)+(6.001), (I-300)+(2.017)+(6.002), (I-300)+(2.017)+(6.003), (I-300)+(2.017)+(6.004), (I-300)+(2.017)+(7.001), (I-300)+(2.017)+(7.002), (I-300)+(2.017)+(7.003), (I-300)+(2.017)+(7.004), (I-300)+(2.017)+(7.005), (I-300)+(2.017)+(7.006), (I-300)+(2.017)+(9.001), (I-300)+(2.017)+(9.002), (I-300)+(2.017)+(9.003), (I-300)+(2.017)+(9.004), (I-300)+(2.017)+(9.005), (I-300)+(2.017)+(9.006), (I-300)+(2.017)+(9.007), (I-300)+(2.017)+(9.008), (I-300)+(2.017)+(9.009), (I-300)+(2.017)+(14.001), (I-300)+(2.017)+(14.002), (I-300)+(2.017)+(15.008), (I-300)+(2.017)+(15.011), (I-300)+(2.017)+(15.012), (I-300)+(2.017)+(15.016), (I-300)+(2.017)+(15.025), (I-300)+(2.017)+(15.027), (I-300)+(2.017)+(15.047), (I-300)+(2.017)+(15.063), (I-300)+(2.017)+(15.064), (I-300)+(2.017)+(16.001), (I-300)+(2.017)+(16.002), (I-300)+(2.017)+(16.003), (I-300)+(2.017)+(16.004), (I-300)+(2.017)+(16.005), (I-300)+(2.017)+(16.006), (I-300)+(2.017)+(16.007), (I-300)+(2.017)+(16.008), (I-300)+(2.017)+(17.001), (I-300)+(2.017)+(17.002), (I-300)+(2.017)+(17.003), (I-300)+(2.017)+(17.004), (I-300)+(2.017)+(17.005), (I-300)+(2.017)+(17.006), (I-300)+(2.017)+(17.007), (I-300)+(2.017)+(17.008), (I-300)+(2.017)+(17.009), (I-300)+(2.017)+(17.010), (I-300)+(2.017)+(17.011), (I-300)+(2.017)+(17.012), (I-300)+(2.017)+(18.001), (I-300)+(2.018)+(3.001), (I-300)+(2.018)+(3.002), (I-300)+(2.018)+(3.003), (I-300)+(2.018)+(3.004), (I-300)+(2.018)+(3.005), (I-300)+(2.018)+(3.006), (I-300)+(2.018)+(3.007), (I-300)+(2.018)+(3.008), (I-300)+(2.018)+(3.009), (I-300)+(2.018)+(3.010), (I-300)+(2.018)+(3.011), (I-300)+(2.018)+(3.012), (I-300)+(2.018)+(3.013), (I-300)+(2.018)+(3.014), (I-300)+(2.018)+(3.015), (I-300)+(2.018)+(3.016), (I-300)+(2.018)+(3.017), (I-300)+(2.018)+(3.018), (I-300)+(2.018)+(3.019), (I-300)+(2.018)+(3.020), (I-300)+(2.018)+(3.021), (I-300)+(2.018)+(3.022), (I-300)+(2.018)+(3.023), (I-300)+(2.018)+(3.024), (I-300)+(2.018)+(3.025), (I-300)+(2.018)+(3.026), (I-300)+(2.018)+(3.027), (I-300)+(2.018)+(3.028), (I-300)+(2.018)+(3.029), (I-300)+(2.018)+(3.030), (I-300)+(2.018)+(3.031), (I-300)+(2.018)+(5.001), (I-300)+(2.018)+(5.002), (I-300)+(2.018)+(5.003), (I-300)+(2.018)+(5.004), (I-300)+(2.018)+(5.005), (I-300)+(2.018)+(5.006), (I-300)+(2.018)+(5.007), (I-300)+(2.018)+(5.008), (I-300)+(2.018)+(5.009), (I-300)+(2.018)+(5.010), (I-300)+(2.018)+(5.011), (I-300)+(2.018)+(5.012), (I-300)+(2.018)+(5.013), (I-300)+(2.018)+(5.014), (I-300)+(2.018)+(5.015), (I-300)+(2.018)+(5.016), (I-300)+(2.018)+(5.017), (I-300)+(2.018)+(5.018), (I-300)+(2.018)+(5.019), (I-300)+(2.018)+(5.020), (I-300)+(2.018)+(5.021), (I-300)+(2.018)+(5.022), (I-300)+(2.018)+(5.023), (I-300)+(2.018)+(6.001), (I-300)+(2.018)+(6.002), (I-300)+(2.018)+(6.003), (I-300)+(2.018)+(6.004), (I-300)+(2.018)+(7.001), (I-300)+(2.018)+(7.002), (I-300)+(2.018)+(7.003), (I-300)+(2.018)+(7.004), (I-300)+(2.018)+(7.005), (I-300)+(2.018)+(7.006), (I-300)+(2.018)+(9.001), (I-300)+(2.018)+(9.002), (I-300)+(2.018)+(9.003), (I-300)+(2.018)+(9.004), (I-300)+(2.018)+(9.005), (I-300)+(2.018)+(9.006), (I-300)+(2.018)+(9.007), (I-300)+(2.018)+(9.008), (I-300)+(2.018)+(9.009), (I-300)+(2.018)+(14.001), (I-300)+(2.018)+(14.002), (I-300)+(2.018)+(15.008), (I-300)+(2.018)+(15.011), (I-300)+(2.018)+(15.012), (I-300)+(2.018)+(15.016), (I-300)+(2.018)+(15.025), (I-300)+(2.018)+(15.027), (I-300)+(2.018)+(15.047), (I-300)+(2.018)+(15.063), (I-300)+(2.018)+(15.064), (I-300)+(2.018)+(16.001), (I-300)+(2.018)+(16.002), (I-300)+(2.018)+(16.003), (I-300)+(2.018)+(16.004), (I-300)+(2.018)+(16.005), (I-300)+(2.018)+(16.006), (I-300)+(2.018)+(16.007), (I-300)+(2.018)+(16.008), (I-300)+(2.018)+(17.001), (I-300)+(2.018)+(17.002), (I-300)+(2.018)+(17.003), (I-300)+(2.018)+(17.004), (I-300)+(2.018)+(17.005), (I-300)+(2.018)+(17.006), (I-300)+(2.018)+(17.007), (I-300)+(2.018)+(17.008), (I-300)+(2.018)+(17.009), (I-300)+(2.018)+(17.010), (I-300)+(2.018)+(17.011), (I-300)+(2.018)+(17.012), (I-300)+(2.018)+(18.001), (I-300)+(2.019)+(3.001), (I-300)+(2.019)+(3.002), (I-300)+(2.019)+(3.003), (I-300)+(2.019)+(3.004), (I-300)+(2.019)+(3.005), (I-300)+(2.019)+(3.006), (I-300)+(2.019)+(3.007), (I-300)+(2.019)+(3.008), (I-300)+(2.019)+(3.009), (I-300)+(2.019)+(3.010), (I-300)+(2.019)+(3.011), (I-300)+(2.019)+(3.012), (I-300)+(2.019)+(3.013), (I-300)+(2.019)+(3.014), (I-300)+(2.019)+(3.015), (I-300)+(2.019)+(3.016), (I-300)+(2.019)+(3.017), (I-300)+(2.019)+(3.018), (I-300)+(2.019)+(3.019), (I-300)+(2.019)+(3.020), (I-300)+(2.019)+(3.021), (I-300)+(2.019)+(3.022), (I-300)+(2.019)+(3.023), (I-300)+(2.019)+(3.024), (I-300)+(2.019)+(3.025), (I-300)+(2.019)+(3.026), (I-300)+(2.019)+(3.027), (I-300)+(2.019)+(3.028), (I-300)+(2.019)+(3.029), (I-300)+(2.019)+(3.030), (I-300)+(2.019)+(3.031), (I-300)+(2.019)+(5.001), (I-300)+(2.019)+(5.002), (I-300)+(2.019)+(5.003), (I-300)+(2.019)+(5.004), (I-300)+(2.019)+(5.005), (I-300)+(2.019)+(5.006), (I-300)+(2.019)+(5.007), (I-300)+(2.019)+(5.008), (I-300)+(2.019)+(5.009), (I-300)+(2.019)+(5.010), (I-300)+(2.019)+(5.011), (I-300)+(2.019)+(5.012), (I-300)+(2.019)+(5.013), (I-300)+(2.019)+(5.014), (I-300)+(2.019)+(5.015), (I-300)+(2.019)+(5.016), (I-300)+(2.019)+(5.017), (I-300)+(2.019)+(5.018), (I-300)+(2.019)+(5.019), (I-300)+(2.019)+(5.020), (I-300)+(2.019)+(5.021), (I-300)+(2.019)+(5.022), (I-300)+(2.019)+(5.023), (I-300)+(2.019)+(6.001), (I-300)+(2.019)+(6.002), (I-300)+(2.019)+(6.003), (I-300)+(2.019)+(6.004), (I-300)+(2.019)+(7.001), (I-300)+(2.019)+(7.002), (I-300)+(2.019)+(7.003), (I-300)+(2.019)+(7.004), (I-300)+(2.019)+(7.005), (I-300)+(2.019)+(7.006), (I-300)+(2.019)+(9.001), (I-300)+(2.019)+(9.002), (I-300)+(2.019)+(9.003), (I-300)+(2.019)+(9.004), (I-300)+(2.019)+(9.005), (I-300)+(2.019)+(9.006), (I-300)+(2.019)+(9.007), (I-300)+(2.019)+(9.008), (I-300)+(2.019)+(9.009), (I-300)+(2.019)+(14.001), (I-300)+(2.019)+(14.002), (I-300)+(2.019)+(15.008), (I-300)+(2.019)+(15.011), (I-300)+(2.019)+(15.012), (I-300)+(2.019)+(15.016), (I-300)+(2.019)+(15.025), (I-300)+(2.019)+(15.027), (I-300)+(2.019)+(15.047), (I-300)+(2.019)+(15.063), (I-300)+(2.019)+(15.064), (I-300)+(2.019)+(16.001), (I-300)+(2.019)+(16.002), (I-300)+(2.019)+(16.003), (I-300)+(2.019)+(16.004), (I-300)+(2.019)+(16.005), (I-300)+(2.019)+(16.006), (I-300)+(2.019)+(16.007), (I-300)+(2.019)+(16.008), (I-300)+(2.019)+(17.001), (I-300)+(2.019)+(17.002), (I-300)+(2.019)+(17.003), (I-300)+(2.019)+(17.004), (I-300)+(2.019)+(17.005), (I-300)+(2.019)+(17.006), (I-300)+(2.019)+(17.007), (I-300)+(2.019)+(17.008), (I-300)+(2.019)+(17.009), (I-300)+(2.019)+(17.010), (I-300)+(2.019)+(17.011), (I-300)+(2.019)+(17.012), (I-300)+(2.019)+(18.001), (I-300)+(2.020)+(3.001), (I-300)+(2.020)+(3.002), (I-300)+(2.020)+(3.003), (I-300)+(2.020)+(3.004), (I-300)+(2.020)+(3.005), (I-300)+(2.020)+(3.006), (I-300)+(2.020)+(3.007), (I-300)+(2.020)+(3.008), (I-300)+(2.020)+(3.009), (I-300)+(2.020)+(3.010), (I-300)+(2.020)+(3.011), (I-300)+(2.020)+(3.012), (I-300)+(2.020)+(3.013), (I-300)+(2.020)+(3.014), (I-300)+(2.020)+(3.015), (I-300)+(2.020)+(3.016), (I-300)+(2.020)+(3.017), (I-300)+(2.020)+(3.018), (I-300)+(2.020)+(3.019), (I-300)+(2.020)+(3.020), (I-300)+(2.020)+(3.021), (I-300)+(2.020)+(3.022), (I-300)+(2.020)+(3.023), (I-300)+(2.020)+(3.024), (I-300)+(2.020)+(3.025), (I-300)+(2.020)+(3.026), (I-300)+(2.020)+(3.027), (I-300)+(2.020)+(3.028), (I-300)+(2.020)+(3.029), (I-300)+(2.020)+(3.030), (I-300)+(2.020)+(3.031), (I-300)+(2.020)+(5.001), (I-300)+(2.020)+(5.002), (I-300)+(2.020)+(5.003), (I-300)+(2.020)+(5.004), (I-300)+(2.020)+(5.005), (I-300)+(2.020)+(5.006), (I-300)+(2.020)+(5.007), (I-300)+(2.020)+(5.008), (I-300)+(2.020)+(5.009), (I-300)+(2.020)+(5.010), (I-300)+(2.020)+(5.011), (I-300)+(2.020)+(5.012), (I-300)+(2.020)+(5.013), (I-300)+(2.020)+(5.014), (I-300)+(2.020)+(5.015), (I-300)+(2.020)+(5.016), (I-300)+(2.020)+(5.017), (I-300)+(2.020)+(5.018), (I-300)+(2.020)+(5.019), (I-300)+(2.020)+(5.020), (I-300)+(2.020)+(5.021), (I-300)+(2.020)+(5.022), (I-300)+(2.020)+(5.023), (I-300)+(2.020)+(6.001), (I-300)+(2.020)+(6.002), (I-300)+(2.020)+(6.003), (I-300)+(2.020)+(6.004), (I-300)+(2.020)+(7.001), (I-300)+(2.020)+(7.002), (I-300)+(2.020)+(7.003), (I-300)+(2.020)+(7.004), (I-300)+(2.020)+(7.005), (I-300)+(2.020)+(7.006), (I-300)+(2.020)+(9.001), (I-300)+(2.020)+(9.002), (I-300)+(2.020)+(9.003), (I-300)+(2.020)+(9.004), (I-300)+(2.020)+(9.005), (I-300)+(2.020)+(9.006), (I-300)+(2.020)+(9.007), (I-300)+(2.020)+(9.008), (I-300)+(2.020)+(9.009), (I-300)+(2.020)+(14.001), (I-300)+(2.020)+(14.002), (I-300)+(2.020)+(15.008), (I-300)+(2.020)+(15.011), (I-300)+(2.020)+(15.012), (I-300)+(2.020)+(15.016), (I-300)+(2.020)+(15.025), (I-300)+(2.020)+(15.027), (I-300)+(2.020)+(15.047), (I-300)+(2.020)+(15.063), (I-300)+(2.020)+(15.064), (I-300)+(2.020)+(16.001), (I-300)+(2.020)+(16.002), (I-300)+(2.020)+(16.003), (I-300)+(2.020)+(16.004), (I-300)+(2.020)+(16.005), (I-300)+(2.020)+(16.006), (I-300)+(2.020)+(16.007), (I-300)+(2.020)+(16.008), (I-300)+(2.020)+(17.001), (I-300)+(2.020)+(17.002), (I-300)+(2.020)+(17.003), (I-300)+(2.020)+(17.004), (I-300)+(2.020)+(17.005), (I-300)+(2.020)+(17.006), (I-300)+(2.020)+(17.007), (I-300)+(2.020)+(17.008), (I-300)+(2.020)+(17.009), (I-300)+(2.020)+(17.010), (I-300)+(2.020)+(17.011), (I-300)+(2.020)+(17.012), (I-300)+(2.020)+(18.001), (I-300)+(2.021)+(3.001), (I-300)+(2.021)+(3.002), (I-300)+(2.021)+(3.003), (I-300)+(2.021)+(3.004), (I-300)+(2.021)+(3.005), (I-300)+(2.021)+(3.006), (I-300)+(2.021)+(3.007), (I-300)+(2.021)+(3.008), (I-300)+(2.021)+(3.009), (I-300)+(2.021)+(3.010), (I-300)+(2.021)+(3.011), (I-300)+(2.021)+(3.012), (I-300)+(2.021)+(3.013), (I-300)+(2.021)+(3.014), (I-300)+(2.021)+(3.015), (I-300)+(2.021)+(3.016), (I-300)+(2.021)+(3.017), (I-300)+(2.021)+(3.018), (I-300)+(2.021)+(3.019), (I-300)+(2.021)+(3.020), (I-300)+(2.021)+(3.021), (I-300)+(2.021)+(3.022), (I-300)+(2.021)+(3.023), (I-300)+(2.021)+(3.024), (I-300)+(2.021)+(3.025), (I-300)+(2.021)+(3.026), (I-300)+(2.021)+(3.027), (I-300)+(2.021)+(3.028), (I-300)+(2.021)+(3.029), (I-300)+(2.021)+(3.030), (I-300)+(2.021)+(3.031), (I-300)+(2.021)+(5.001), (I-300)+(2.021)+(5.002), (I-300)+(2.021)+(5.003), (I-300)+(2.021)+(5.004), (I-300)+(2.021)+(5.005), (I-300)+(2.021)+(5.006), (I-300)+(2.021)+(5.007), (I-300)+(2.021)+(5.008), (I-300)+(2.021)+(5.009), (I-300)+(2.021)+(5.010), (I-300)+(2.021)+(5.011), (I-300)+(2.021)+(5.012), (I-300)+(2.021)+(5.013), (I-300)+(2.021)+(5.014), (I-300)+(2.021)+(5.015), (I-300)+(2.021)+(5.016), (I-300)+(2.021)+(5.017), (I-300)+(2.021)+(5.018), (I-300)+(2.021)+(5.019), (I-300)+(2.021)+(5.020), (I-300)+(2.021)+(5.021), (I-300)+(2.021)+(5.022), (I-300)+(2.021)+(5.023), (I-300)+(2.021)+(6.001), (I-300)+(2.021)+(6.002), (I-300)+(2.021)+(6.003), (I-300)+(2.021)+(6.004), (I-300)+(2.021)+(7.001), (I-300)+(2.021)+(7.002), (I-300)+(2.021)+(7.003), (I-300)+(2.021)+(7.004), (I-300)+(2.021)+(7.005), (I-300)+(2.021)+(7.006), (I-300)+(2.021)+(9.001), (I-300)+(2.021)+(9.002), (I-300)+(2.021)+(9.003), (I-300)+(2.021)+(9.004), (I-300)+(2.021)+(9.005), (I-300)+(2.021)+(9.006), (I-300)+(2.021)+(9.007), (I-300)+(2.021)+(9.008), (I-300)+(2.021)+(9.009), (I-300)+(2.021)+(14.001), (I-300)+(2.021)+(14.002), (I-300)+(2.021)+(15.008), (I-300)+(2.021)+(15.011), (I-300)+(2.021)+(15.012), (I-300)+(2.021)+(15.016), (I-300)+(2.021)+(15.025), (I-300)+(2.021)+(15.027), (I-300)+(2.021)+(15.047), (I-300)+(2.021)+(15.063), (I-300)+(2.021)+(15.064), (I-300)+(2.021)+(16.001), (I-300)+(2.021)+(16.002), (I-300)+(2.021)+(16.003), (I-300)+(2.021)+(16.004), (I-300)+(2.021)+(16.005), (I-300)+(2.021)+(16.006), (I-300)+(2.021)+(16.007), (I-300)+(2.021)+(16.008), (I-300)+(2.021)+(17.001), (I-300)+(2.021)+(17.002), (I-300)+(2.021)+(17.003), (I-300)+(2.021)+(17.004), (I-300)+(2.021)+(17.005), (I-300)+(2.021)+(17.006), (I-300)+(2.021)+(17.007), (I-300)+(2.021)+(17.008), (I-300)+(2.021)+(17.009), (I-300)+(2.021)+(17.010), (I-300)+(2.021)+(17.011), (I-300)+(2.021)+(17.012), (I-300)+(2.021)+(18.001), (I-300)+(2.022)+(3.001), (I-300)+(2.022)+(3.002), (I-300)+(2.022)+(3.003), (I-300)+(2.022)+(3.004), (I-300)+(2.022)+(3.005), (I-300)+(2.022)+(3.006), (I-300)+(2.022)+(3.007), (I-300)+(2.022)+(3.008), (I-300)+(2.022)+(3.009), (I-300)+(2.022)+(3.010), (I-300)+(2.022)+(3.011), (I-300)+(2.022)+(3.012), (I-300)+(2.022)+(3.013), (I-300)+(2.022)+(3.014), (I-300)+(2.022)+(3.015), (I-300)+(2.022)+(3.016), (I-300)+(2.022)+(3.017), (I-300)+(2.022)+(3.018), (I-300)+(2.022)+(3.019), (I-300)+(2.022)+(3.020), (I-300)+(2.022)+(3.021), (I-300)+(2.022)+(3.022), (I-300)+(2.022)+(3.023), (I-300)+(2.022)+(3.024), (I-300)+(2.022)+(3.025), (I-300)+(2.022)+(3.026), (I-300)+(2.022)+(3.027), (I-300)+(2.022)+(3.028), (I-300)+(2.022)+(3.029), (I-300)+(2.022)+(3.030), (I-300)+(2.022)+(3.031), (I-300)+(2.022)+(5.001), (I-300)+(2.022)+(5.002), (I-300)+(2.022)+(5.003), (I-300)+(2.022)+(5.004), (I-300)+(2.022)+(5.005), (I-300)+(2.022)+(5.006), (I-300)+(2.022)+(5.007), (I-300)+(2.022)+(5.008), (I-300)+(2.022)+(5.009), (I-300)+(2.022)+(5.010), (I-300)+(2.022)+(5.011), (I-300)+(2.022)+(5.012), (I-300)+(2.022)+(5.013), (I-300)+(2.022)+(5.014), (I-300)+(2.022)+(5.015), (I-300)+(2.022)+(5.016), (I-300)+(2.022)+(5.017), (I-300)+(2.022)+(5.018), (I-300)+(2.022)+(5.019), (I-300)+(2.022)+(5.020), (I-300)+(2.022)+(5.021), (I-300)+(2.022)+(5.022), (I-300)+(2.022)+(5.023), (I-300)+(2.022)+(6.001), (I-300)+(2.022)+(6.002), (I-300)+(2.022)+(6.003), (I-300)+(2.022)+(6.004), (I-300)+(2.022)+(7.001), (I-300)+(2.022)+(7.002), (I-300)+(2.022)+(7.003), (I-300)+(2.022)+(7.004), (I-300)+(2.022)+(7.005), (I-300)+(2.022)+(7.006), (I-300)+(2.022)+(9.001), (I-300)+(2.022)+(9.002), (I-300)+(2.022)+(9.003), (I-300)+(2.022)+(9.004), (I-300)+(2.022)+(9.005), (I-300)+(2.022)+(9.006), (I-300)+(2.022)+(9.007), (I-300)+(2.022)+(9.008), (I-300)+(2.022)+(9.009), (I-300)+(2.022)+(14.001), (I-300)+(2.022)+(14.002), (I-300)+(2.022)+(15.008), (I-300)+(2.022)+(15.011), (I-300)+(2.022)+(15.012), (I-300)+(2.022)+(15.016), (I-300)+(2.022)+(15.025), (I-300)+(2.022)+(15.027), (I-300)+(2.022)+(15.047), (I-300)+(2.022)+(15.063), (I-300)+(2.022)+(15.064), (I-300)+(2.022)+(16.001), (I-300)+(2.022)+(16.002), (I-300)+(2.022)+(16.003), (I-300)+(2.022)+(16.004), (I-300)+(2.022)+(16.005), (I-300)+(2.022)+(16.006), (I-300)+(2.022)+(16.007), (I-300)+(2.022)+(16.008), (I-300)+(2.022)+(17.001), (I-300)+(2.022)+(17.002), (I-300)+(2.022)+(17.003), (I-300)+(2.022)+(17.004), (I-300)+(2.022)+(17.005), (I-300)+(2.022)+(17.006), (I-300)+(2.022)+(17.007), (I-300)+(2.022)+(17.008), (I-300)+(2.022)+(17.009), (I-300)+(2.022)+(17.010), (I-300)+(2.022)+(17.011), (I-300)+(2.022)+(17.012), (I-300)+(2.022)+(18.001), (I-300)+(2.023)+(3.001), (I-300)+(2.023)+(3.002), (I-300)+(2.023)+(3.003), (I-300)+(2.023)+(3.004), (I-300)+(2.023)+(3.005), (I-300)+(2.023)+(3.006), (I-300)+(2.023)+(3.007), (I-300)+(2.023)+(3.008), (I-300)+(2.023)+(3.009), (I-300)+(2.023)+(3.010), (I-300)+(2.023)+(3.011), (I-300)+(2.023)+(3.012), (I-300)+(2.023)+(3.013), (I-300)+(2.023)+(3.014), (I-300)+(2.023)+(3.015), (I-300)+(2.023)+(3.016), (I-300)+(2.023)+(3.017), (I-300)+(2.023)+(3.018), (I-300)+(2.023)+(3.019), (I-300)+(2.023)+(3.020), (I-300)+(2.023)+(3.021), (I-300)+(2.023)+(3.022), (I-300)+(2.023)+(3.023), (I-300)+(2.023)+(3.024), (I-300)+(2.023)+(3.025), (I-300)+(2.023)+(3.026), (I-300)+(2.023)+(3.027), (I-300)+(2.023)+(3.028), (I-300)+(2.023)+(3.029), (I-300)+(2.023)+(3.030), (I-300)+(2.023)+(3.031), (I-300)+(2.023)+(5.001), (I-300)+(2.023)+(5.002), (I-300)+(2.023)+(5.003), (I-300)+(2.023)+(5.004), (I-300)+(2.023)+(5.005), (I-300)+(2.023)+(5.006), (I-300)+(2.023)+(5.007), (I-300)+(2.023)+(5.008), (I-300)+(2.023)+(5.009), (I-300)+(2.023)+(5.010), (I-300)+(2.023)+(5.011), (I-300)+(2.023)+(5.012), (I-300)+(2.023)+(5.013), (I-300)+(2.023)+(5.014), (I-300)+(2.023)+(5.015), (I-300)+(2.023)+(5.016), (I-300)+(2.023)+(5.017), (I-300)+(2.023)+(5.018), (I-300)+(2.023)+(5.019), (I-300)+(2.023)+(5.020), (I-300)+(2.023)+(5.021), (I-300)+(2.023)+(5.022), (I-300)+(2.023)+(5.023), (I-300)+(2.023)+(6.001), (I-300)+(2.023)+(6.002), (I-300)+(2.023)+(6.003), (I-300)+(2.023)+(6.004), (I-300)+(2.023)+(7.001), (I-300)+(2.023)+(7.002), (I-300)+(2.023)+(7.003), (I-300)+(2.023)+(7.004), (I-300)+(2.023)+(7.005), (I-300)+(2.023)+(7.006), (I-300)+(2.023)+(9.001), (I-300)+(2.023)+(9.002), (I-300)+(2.023)+(9.003), (I-300)+(2.023)+(9.004), (I-300)+(2.023)+(9.005), (I-300)+(2.023)+(9.006), (I-300)+(2.023)+(9.007), (I-300)+(2.023)+(9.008), (I-300)+(2.023)+(9.009), (I-300)+(2.023)+(14.001), (I-300)+(2.023)+(14.002), (I-300)+(2.023)+(15.008), (I-300)+(2.023)+(15.011), (I-300)+(2.023)+(15.012), (I-300)+(2.023)+(15.016), (I-300)+(2.023)+(15.025), (I-300)+(2.023)+(15.027), (I-300)+(2.023)+(15.047), (I-300)+(2.023)+(15.063), (I-300)+(2.023)+(15.064), (I-300)+(2.023)+(16.001), (I-300)+(2.023)+(16.002), (I-300)+(2.023)+(16.003), (I-300)+(2.023)+(16.004), (I-300)+(2.023)+(16.005), (I-300)+(2.023)+(16.006), (I-300)+(2.023)+(16.007), (I-300)+(2.023)+(16.008), (I-300)+(2.023)+(17.001), (I-300)+(2.023)+(17.002), (I-300)+(2.023)+(17.003), (I-300)+(2.023)+(17.004), (I-300)+(2.023)+(17.005), (I-300)+(2.023)+(17.006), (I-300)+(2.023)+(17.007), (I-300)+(2.023)+(17.008), (I-300)+(2.023)+(17.009), (I-300)+(2.023)+(17.010), (I-300)+(2.023)+(17.011), (I-300)+(2.023)+(17.012), (I-300)+(2.023)+(18.001), (I-300)+(2.024)+(3.001), (I-300)+(2.024)+(3.002), (I-300)+(2.024)+(3.003), (I-300)+(2.024)+(3.004), (I-300)+(2.024)+(3.005), (I-300)+(2.024)+(3.006), (I-300)+(2.024)+(3.007), (I-300)+(2.024)+(3.008), (I-300)+(2.024)+(3.009), (I-300)+(2.024)+(3.010), (I-300)+(2.024)+(3.011), (I-300)+(2.024)+(3.012), (I-300)+(2.024)+(3.013), (I-300)+(2.024)+(3.014), (I-300)+(2.024)+(3.015), (I-300)+(2.024)+(3.016), (I-300)+(2.024)+(3.017), (I-300)+(2.024)+(3.018), (I-300)+(2.024)+(3.019), (I-300)+(2.024)+(3.020), (I-300)+(2.024)+(3.021), (I-300)+(2.024)+(3.022), (I-300)+(2.024)+(3.023), (I-300)+(2.024)+(3.024), (I-300)+(2.024)+(3.025), (I-300)+(2.024)+(3.026), (I-300)+(2.024)+(3.027), (I-300)+(2.024)+(3.028), (I-300)+(2.024)+(3.029), (I-300)+(2.024)+(3.030), (I-300)+(2.024)+(3.031), (I-300)+(2.024)+(5.001), (I-300)+(2.024)+(5.002), (I-300)+(2.024)+(5.003), (I-300)+(2.024)+(5.004), (I-300)+(2.024)+(5.005), (I-300)+(2.024)+(5.006), (I-300)+(2.024)+(5.007), (I-300)+(2.024)+(5.008), (I-300)+(2.024)+(5.009), (I-300)+(2.024)+(5.010), (I-300)+(2.024)+(5.011), (I-300)+(2.024)+(5.012), (I-300)+(2.024)+(5.013), (I-300)+(2.024)+(5.014), (I-300)+(2.024)+(5.015), (I-300)+(2.024)+(5.016), (I-300)+(2.024)+(5.017), (I-300)+(2.024)+(5.018), (I-300)+(2.024)+(5.019), (I-300)+(2.024)+(5.020), (I-300)+(2.024)+(5.021), (I-300)+(2.024)+(5.022), (I-300)+(2.024)+(5.023), (I-300)+(2.024)+(6.001), (I-300)+(2.024)+(6.002), (I-300)+(2.024)+(6.003), (I-300)+(2.024)+(6.004), (I-300)+(2.024)+(7.001), (I-300)+(2.024)+(7.002), (I-300)+(2.024)+(7.003), (I-300)+(2.024)+(7.004), (I-300)+(2.024)+(7.005), (I-300)+(2.024)+(7.006), (I-300)+(2.024)+(9.001), (I-300)+(2.024)+(9.002), (I-300)+(2.024)+(9.003), (I-300)+(2.024)+(9.004), (I-300)+(2.024)+(9.005), (I-300)+(2.024)+(9.006), (I-300)+(2.024)+(9.007), (I-300)+(2.024)+(9.008), (I-300)+(2.024)+(9.009), (I-300)+(2.024)+(14.001), (I-300)+(2.024)+(14.002), (I-300)+(2.024)+(15.008), (I-300)+(2.024)+(15.011), (I-300)+(2.024)+(15.012), (I-300)+(2.024)+(15.016), (I-300)+(2.024)+(15.025), (I-300)+(2.024)+(15.027), (I-300)+(2.024)+(15.047), (I-300)+(2.024)+(15.063), (I-300)+(2.024)+(15.064), (I-300)+(2.024)+(16.001), (I-300)+(2.024)+(16.002), (I-300)+(2.024)+(16.003), (I-300)+(2.024)+(16.004), (I-300)+(2.024)+(16.005), (I-300)+(2.024)+(16.006), (I-300)+(2.024)+(16.007), (I-300)+(2.024)+(16.008), (I-300)+(2.024)+(17.001), (I-300)+(2.024)+(17.002), (I-300)+(2.024)+(17.003), (I-300)+(2.024)+(17.004), (I-300)+(2.024)+(17.005), (I-300)+(2.024)+(17.006), (I-300)+(2.024)+(17.007), (I-300)+(2.024)+(17.008), (I-300)+(2.024)+(17.009), (I-300)+(2.024)+(17.010), (I-300)+(2.024)+(17.011), (I-300)+(2.024)+(17.012), (I-300)+(2.024)+(18.001), (I-300)+(2.025)+(3.001), (I-300)+(2.025)+(3.002), (I-300)+(2.025)+(3.003), (I-300)+(2.025)+(3.004), (I-300)+(2.025)+(3.005), (I-300)+(2.025)+(3.006), (I-300)+(2.025)+(3.007), (I-300)+(2.025)+(3.008), (I-300)+(2.025)+(3.009), (I-300)+(2.025)+(3.010), (I-300)+(2.025)+(3.011), (I-300)+(2.025)+(3.012), (I-300)+(2.025)+(3.013), (I-300)+(2.025)+(3.014), (I-300)+(2.025)+(3.015), (I-300)+(2.025)+(3.016), (I-300)+(2.025)+(3.017), (I-300)+(2.025)+(3.018), (I-300)+(2.025)+(3.019), (I-300)+(2.025)+(3.020), (I-300)+(2.025)+(3.021), (I-300)+(2.025)+(3.022), (I-300)+(2.025)+(3.023), (I-300)+(2.025)+(3.024), (I-300)+(2.025)+(3.025), (I-300)+(2.025)+(3.026), (I-300)+(2.025)+(3.027), (I-300)+(2.025)+(3.028), (I-300)+(2.025)+(3.029), (I-300)+(2.025)+(3.030), (I-300)+(2.025)+(3.031), (I-300)+(2.025)+(5.001), (I-300)+(2.025)+(5.002), (I-300)+(2.025)+(5.003), (I-300)+(2.025)+(5.004), (I-300)+(2.025)+(5.005), (I-300)+(2.025)+(5.006), (I-300)+(2.025)+(5.007), (I-300)+(2.025)+(5.008), (I-300)+(2.025)+(5.009), (I-300)+(2.025)+(5.010), (I-300)+(2.025)+(5.011), (I-300)+(2.025)+(5.012), (I-300)+(2.025)+(5.013), (I-300)+(2.025)+(5.014), (I-300)+(2.025)+(5.015), (I-300)+(2.025)+(5.016), (I-300)+(2.025)+(5.017), (I-300)+(2.025)+(5.018), (I-300)+(2.025)+(5.019), (I-300)+(2.025)+(5.020), (I-300)+(2.025)+(5.021), (I-300)+(2.025)+(5.022), (I-300)+(2.025)+(5.023), (I-300)+(2.025)+(6.001), (I-300)+(2.025)+(6.002), (I-300)+(2.025)+(6.003), (I-300)+(2.025)+(6.004), (I-300)+(2.025)+(7.001), (I-300)+(2.025)+(7.002), (I-300)+(2.025)+(7.003), (I-300)+(2.025)+(7.004), (I-300)+(2.025)+(7.005), (I-300)+(2.025)+(7.006), (I-300)+(2.025)+(9.001), (I-300)+(2.025)+(9.002), (I-300)+(2.025)+(9.003), (I-300)+(2.025)+(9.004), (I-300)+(2.025)+(9.005), (I-300)+(2.025)+(9.006), (I-300)+(2.025)+(9.007), (I-300)+(2.025)+(9.008), (I-300)+(2.025)+(9.009), (I-300)+(2.025)+(14.001), (I-300)+(2.025)+(14.002), (I-300)+(2.025)+(15.008), (I-300)+(2.025)+(15.011), (I-300)+(2.025)+(15.012), (I-300)+(2.025)+(15.016), (I-300)+(2.025)+(15.025), (I-300)+(2.025)+(15.027), (I-300)+(2.025)+(15.047), (I-300)+(2.025)+(15.063), (I-300)+(2.025)+(15.064), (I-300)+(2.025)+(16.001), (I-300)+(2.025)+(16.002), (I-300)+(2.025)+(16.003), (I-300)+(2.025)+(16.004), (I-300)+(2.025)+(16.005), (I-300)+(2.025)+(16.006), (I-300)+(2.025)+(16.007), (I-300)+(2.025)+(16.008), (I-300)+(2.025)+(17.001), (I-300)+(2.025)+(17.002), (I-300)+(2.025)+(17.003), (I-300)+(2.025)+(17.004), (I-300)+(2.025)+(17.005), (I-300)+(2.025)+(17.006), (I-300)+(2.025)+(17.007), (I-300)+(2.025)+(17.008), (I-300)+(2.025)+(17.009), (I-300)+(2.025)+(17.010), (I-300)+(2.025)+(17.011), (I-300)+(2.025)+(17.012), (I-300)+(2.025)+(18.001), (I-300)+(2.026)+(3.001), (I-300)+(2.026)+(3.002), (I-300)+(2.026)+(3.003), (I-300)+(2.026)+(3.004), (I-300)+(2.026)+(3.005), (I-300)+(2.026)+(3.006), (I-300)+(2.026)+(3.007), (I-300)+(2.026)+(3.008), (I-300)+(2.026)+(3.009), (I-300)+(2.026)+(3.010), (I-300)+(2.026)+(3.011), (I-300)+(2.026)+(3.012), (I-300)+(2.026)+(3.013), (I-300)+(2.026)+(3.014), (I-300)+(2.026)+(3.015), (I-300)+(2.026)+(3.016), (I-300)+(2.026)+(3.017), (I-300)+(2.026)+(3.018), (I-300)+(2.026)+(3.019), (I-300)+(2.026)+(3.020), (I-300)+(2.026)+(3.021), (I-300)+(2.026)+(3.022), (I-300)+(2.026)+(3.023), (I-300)+(2.026)+(3.024), (I-300)+(2.026)+(3.025), (I-300)+(2.026)+(3.026), (I-300)+(2.026)+(3.027), (I-300)+(2.026)+(3.028), (I-300)+(2.026)+(3.029), (I-300)+(2.026)+(3.030), (I-300)+(2.026)+(3.031), (I-300)+(2.026)+(5.001), (I-300)+(2.026)+(5.002), (I-300)+(2.026)+(5.003), (I-300)+(2.026)+(5.004), (I-300)+(2.026)+(5.005), (I-300)+(2.026)+(5.006), (I-300)+(2.026)+(5.007), (I-300)+(2.026)+(5.008), (I-300)+(2.026)+(5.009), (I-300)+(2.026)+(5.010), (I-300)+(2.026)+(5.011), (I-300)+(2.026)+(5.012), (I-300)+(2.026)+(5.013), (I-300)+(2.026)+(5.014), (I-300)+(2.026)+(5.015), (I-300)+(2.026)+(5.016), (I-300)+(2.026)+(5.017), (I-300)+(2.026)+(5.018), (I-300)+(2.026)+(5.019), (I-300)+(2.026)+(5.020), (I-300)+(2.026)+(5.021), (I-300)+(2.026)+(5.022), (I-300)+(2.026)+(5.023), (I-300)+(2.026)+(6.001), (I-300)+(2.026)+(6.002), (I-300)+(2.026)+(6.003), (I-300)+(2.026)+(6.004), (I-300)+(2.026)+(7.001), (I-300)+(2.026)+(7.002), (I-300)+(2.026)+(7.003), (I-300)+(2.026)+(7.004), (I-300)+(2.026)+(7.005), (I-300)+(2.026)+(7.006), (I-300)+(2.026)+(9.001), (I-300)+(2.026)+(9.002), (I-300)+(2.026)+(9.003), (I-300)+(2.026)+(9.004), (I-300)+(2.026)+(9.005), (I-300)+(2.026)+(9.006), (I-300)+(2.026)+(9.007), (I-300)+(2.026)+(9.008), (I-300)+(2.026)+(9.009), (I-300)+(2.026)+(14.001), (I-300)+(2.026)+(14.002), (I-300)+(2.026)+(15.008), (I-300)+(2.026)+(15.011), (I-300)+(2.026)+(15.012), (I-300)+(2.026)+(15.016), (I-300)+(2.026)+(15.025), (I-300)+(2.026)+(15.027), (I-300)+(2.026)+(15.047), (I-300)+(2.026)+(15.063), (I-300)+(2.026)+(15.064), (I-300)+(2.026)+(16.001), (I-300)+(2.026)+(16.002), (I-300)+(2.026)+(16.003), (I-300)+(2.026)+(16.004), (I-300)+(2.026)+(16.005), (I-300)+(2.026)+(16.006), (I-300)+(2.026)+(16.007), (I-300)+(2.026)+(16.008), (I-300)+(2.026)+(17.001), (I-300)+(2.026)+(17.002), (I-300)+(2.026)+(17.003), (I-300)+(2.026)+(17.004), (I-300)+(2.026)+(17.005), (I-300)+(2.026)+(17.006), (I-300)+(2.026)+(17.007), (I-300)+(2.026)+(17.008), (I-300)+(2.026)+(17.009), (I-300)+(2.026)+(17.010), (I-300)+(2.026)+(17.011), (I-300)+(2.026)+(17.012), (I-300)+(2.026)+(18.001), (I-300)+(2.027)+(3.001), (I-300)+(2.027)+(3.002), (I-300)+(2.027)+(3.003), (I-300)+(2.027)+(3.004), (I-300)+(2.027)+(3.005), (I-300)+(2.027)+(3.006), (I-300)+(2.027)+(3.007), (I-300)+(2.027)+(3.008), (I-300)+(2.027)+(3.009), (I-300)+(2.027)+(3.010), (I-300)+(2.027)+(3.011), (I-300)+(2.027)+(3.012), (I-300)+(2.027)+(3.013), (I-300)+(2.027)+(3.014), (I-300)+(2.027)+(3.015), (I-300)+(2.027)+(3.016), (I-300)+(2.027)+(3.017), (I-300)+(2.027)+(3.018), (I-300)+(2.027)+(3.019), (I-300)+(2.027)+(3.020), (I-300)+(2.027)+(3.021), (I-300)+(2.027)+(3.022), (I-300)+(2.027)+(3.023), (I-300)+(2.027)+(3.024), (I-300)+(2.027)+(3.025), (I-300)+(2.027)+(3.026), (I-300)+(2.027)+(3.027), (I-300)+(2.027)+(3.028), (I-300)+(2.027)+(3.029), (I-300)+(2.027)+(3.030), (I-300)+(2.027)+(3.031), (I-300)+(2.027)+(5.001), (I-300)+(2.027)+(5.002), (I-300)+(2.027)+(5.003), (I-300)+(2.027)+(5.004), (I-300)+(2.027)+(5.005), (I-300)+(2.027)+(5.006), (I-300)+(2.027)+(5.007), (I-300)+(2.027)+(5.008), (I-300)+(2.027)+(5.009), (I-300)+(2.027)+(5.010), (I-300)+(2.027)+(5.011), (I-300)+(2.027)+(5.012), (I-300)+(2.027)+(5.013), (I-300)+(2.027)+(5.014), (I-300)+(2.027)+(5.015), (I-300)+(2.027)+(5.016), (I-300)+(2.027)+(5.017), (I-300)+(2.027)+(5.018), (I-300)+(2.027)+(5.019), (I-300)+(2.027)+(5.020), (I-300)+(2.027)+(5.021), (I-300)+(2.027)+(5.022), (I-300)+(2.027)+(5.023), (I-300)+(2.027)+(6.001), (I-300)+(2.027)+(6.002), (I-300)+(2.027)+(6.003), (I-300)+(2.027)+(6.004), (I-300)+(2.027)+(7.001), (I-300)+(2.027)+(7.002), (I-300)+(2.027)+(7.003), (I-300)+(2.027)+(7.004), (I-300)+(2.027)+(7.005), (I-300)+(2.027)+(7.006), (I-300)+(2.027)+(9.001), (I-300)+(2.027)+(9.002), (I-300)+(2.027)+(9.003), (I-300)+(2.027)+(9.004), (I-300)+(2.027)+(9.005), (I-300)+(2.027)+(9.006), (I-300)+(2.027)+(9.007), (I-300)+(2.027)+(9.008), (I-300)+(2.027)+(9.009), (I-300)+(2.027)+(14.001), (I-300)+(2.027)+(14.002), (I-300)+(2.027)+(15.008), (I-300)+(2.027)+(15.011), (I-300)+(2.027)+(15.012), (I-300)+(2.027)+(15.016), (I-300)+(2.027)+(15.025), (I-300)+(2.027)+(15.027), (I-300)+(2.027)+(15.047), (I-300)+(2.027)+(15.063), (I-300)+(2.027)+(15.064), (I-300)+(2.027)+(16.001), (I-300)+(2.027)+(16.002), (I-300)+(2.027)+(16.003), (I-300)+(2.027)+(16.004), (I-300)+(2.027)+(16.005), (I-300)+(2.027)+(16.006), (I-300)+(2.027)+(16.007), (I-300)+(2.027)+(16.008), (I-300)+(2.027)+(17.001), (I-300)+(2.027)+(17.002), (I-300)+(2.027)+(17.003), (I-300)+(2.027)+(17.004), (I-300)+(2.027)+(17.005), (I-300)+(2.027)+(17.006), (I-300)+(2.027)+(17.007), (I-300)+(2.027)+(17.008), (I-300)+(2.027)+(17.009), (I-300)+(2.027)+(17.010), (I-300)+(2.027)+(17.011), (I-300)+(2.027)+(17.012), (I-300)+(2.027)+(18.001), (I-300)+(2.028)+(3.001), (I-300)+(2.028)+(3.002), (I-300)+(2.028)+(3.003), (I-300)+(2.028)+(3.004), (I-300)+(2.028)+(3.005), (I-300)+(2.028)+(3.006), (I-300)+(2.028)+(3.007), (I-300)+(2.028)+(3.008), (I-300)+(2.028)+(3.009), (I-300)+(2.028)+(3.010), (I-300)+(2.028)+(3.011), (I-300)+(2.028)+(3.012), (I-300)+(2.028)+(3.013), (I-300)+(2.028)+(3.014), (I-300)+(2.028)+(3.015), (I-300)+(2.028)+(3.016), (I-300)+(2.028)+(3.017), (I-300)+(2.028)+(3.018), (I-300)+(2.028)+(3.019), (I-300)+(2.028)+(3.020), (I-300)+(2.028)+(3.021), (I-300)+(2.028)+(3.022), (I-300)+(2.028)+(3.023), (I-300)+(2.028)+(3.024), (I-300)+(2.028)+(3.025), (I-300)+(2.028)+(3.026), (I-300)+(2.028)+(3.027), (I-300)+(2.028)+(3.028), (I-300)+(2.028)+(3.029), (I-300)+(2.028)+(3.030), (I-300)+(2.028)+(3.031), (I-300)+(2.028)+(5.001), (I-300)+(2.028)+(5.002), (I-300)+(2.028)+(5.003), (I-300)+(2.028)+(5.004), (I-300)+(2.028)+(5.005), (I-300)+(2.028)+(5.006), (I-300)+(2.028)+(5.007), (I-300)+(2.028)+(5.008), (I-300)+(2.028)+(5.009), (I-300)+(2.028)+(5.010), (I-300)+(2.028)+(5.011), (I-300)+(2.028)+(5.012), (I-300)+(2.028)+(5.013), (I-300)+(2.028)+(5.014), (I-300)+(2.028)+(5.015), (I-300)+(2.028)+(5.016), (I-300)+(2.028)+(5.017), (I-300)+(2.028)+(5.018), (I-300)+(2.028)+(5.019), (I-300)+(2.028)+(5.020), (I-300)+(2.028)+(5.021), (I-300)+(2.028)+(5.022), (I-300)+(2.028)+(5.023), (I-300)+(2.028)+(6.001), (I-300)+(2.028)+(6.002), (I-300)+(2.028)+(6.003), (I-300)+(2.028)+(6.004), (I-300)+(2.028)+(7.001), (I-300)+(2.028)+(7.002), (I-300)+(2.028)+(7.003), (I-300)+(2.028)+(7.004), (I-300)+(2.028)+(7.005), (I-300)+(2.028)+(7.006), (I-300)+(2.028)+(9.001), (I-300)+(2.028)+(9.002), (I-300)+(2.028)+(9.003), (I-300)+(2.028)+(9.004), (I-300)+(2.028)+(9.005), (I-300)+(2.028)+(9.006), (I-300)+(2.028)+(9.007), (I-300)+(2.028)+(9.008), (I-300)+(2.028)+(9.009), (I-300)+(2.028)+(14.001), (I-300)+(2.028)+(14.002), (I-300)+(2.028)+(15.008), (I-300)+(2.028)+(15.011), (I-300)+(2.028)+(15.012), (I-300)+(2.028)+(15.016), (I-300)+(2.028)+(15.025), (I-300)+(2.028)+(15.027), (I-300)+(2.028)+(15.047), (I-300)+(2.028)+(15.063), (I-300)+(2.028)+(15.064), (I-300)+(2.028)+(16.001), (I-300)+(2.028)+(16.002), (I-300)+(2.028)+(16.003), (I-300)+(2.028)+(16.004), (I-300)+(2.028)+(16.005), (I-300)+(2.028)+(16.006), (I-300)+(2.028)+(16.007), (I-300)+(2.028)+(16.008), (I-300)+(2.028)+(17.001), (I-300)+(2.028)+(17.002), (I-300)+(2.028)+(17.003), (I-300)+(2.028)+(17.004), (I-300)+(2.028)+(17.005), (I-300)+(2.028)+(17.006), (I-300)+(2.028)+(17.007), (I-300)+(2.028)+(17.008), (I-300)+(2.028)+(17.009), (I-300)+(2.028)+(17.010), (I-300)+(2.028)+(17.011), (I-300)+(2.028)+(17.012), (I-300)+(2.028)+(18.001), (I-300)+(2.029)+(3.001), (I-300)+(2.029)+(3.002), (I-300)+(2.029)+(3.003), (I-300)+(2.029)+(3.004), (I-300)+(2.029)+(3.005), (I-300)+(2.029)+(3.006), (I-300)+(2.029)+(3.007), (I-300)+(2.029)+(3.008), (I-300)+(2.029)+(3.009), (I-300)+(2.029)+(3.010), (I-300)+(2.029)+(3.011), (I-300)+(2.029)+(3.012), (I-300)+(2.029)+(3.013), (I-300)+(2.029)+(3.014), (I-300)+(2.029)+(3.015), (I-300)+(2.029)+(3.016), (I-300)+(2.029)+(3.017), (I-300)+(2.029)+(3.018), (I-300)+(2.029)+(3.019), (I-300)+(2.029)+(3.020), (I-300)+(2.029)+(3.021), (I-300)+(2.029)+(3.022), (I-300)+(2.029)+(3.023), (I-300)+(2.029)+(3.024), (I-300)+(2.029)+(3.025), (I-300)+(2.029)+(3.026), (I-300)+(2.029)+(3.027), (I-300)+(2.029)+(3.028), (I-300)+(2.029)+(3.029), (I-300)+(2.029)+(3.030), (I-300)+(2.029)+(3.031), (I-300)+(2.029)+(5.001), (I-300)+(2.029)+(5.002), (I-300)+(2.029)+(5.003), (I-300)+(2.029)+(5.004), (I-300)+(2.029)+(5.005), (I-300)+(2.029)+(5.006), (I-300)+(2.029)+(5.007), (I-300)+(2.029)+(5.008), (I-300)+(2.029)+(5.009), (I-300)+(2.029)+(5.010), (I-300)+(2.029)+(5.011), (I-300)+(2.029)+(5.012), (I-300)+(2.029)+(5.013), (I-300)+(2.029)+(5.014), (I-300)+(2.029)+(5.015), (I-300)+(2.029)+(5.016), (I-300)+(2.029)+(5.017), (I-300)+(2.029)+(5.018), (I-300)+(2.029)+(5.019), (I-300)+(2.029)+(5.020), (I-300)+(2.029)+(5.021), (I-300)+(2.029)+(5.022), (I-300)+(2.029)+(5.023), (I-300)+(2.029)+(6.001), (I-300)+(2.029)+(6.002), (I-300)+(2.029)+(6.003), (I-300)+(2.029)+(6.004), (I-300)+(2.029)+(7.001), (I-300)+(2.029)+(7.002), (I-300)+(2.029)+(7.003), (I-300)+(2.029)+(7.004), (I-300)+(2.029)+(7.005), (I-300)+(2.029)+(7.006), (I-300)+(2.029)+(9.001), (I-300)+(2.029)+(9.002), (I-300)+(2.029)+(9.003), (I-300)+(2.029)+(9.004), (I-300)+(2.029)+(9.005), (I-300)+(2.029)+(9.006), (I-300)+(2.029)+(9.007), (I-300)+(2.029)+(9.008), (I-300)+(2.029)+(9.009), (I-300)+(2.029)+(14.001), (I-300)+(2.029)+(14.002), (I-300)+(2.029)+(15.008), (I-300)+(2.029)+(15.011), (I-300)+(2.029)+(15.012), (I-300)+(2.029)+(15.016), (I-300)+(2.029)+(15.025), (I-300)+(2.029)+(15.027), (I-300)+(2.029)+(15.047), (I-300)+(2.029)+(15.063), (I-300)+(2.029)+(15.064), (I-300)+(2.029)+(16.001), (I-300)+(2.029)+(16.002), (I-300)+(2.029)+(16.003), (I-300)+(2.029)+(16.004), (I-300)+(2.029)+(16.005), (I-300)+(2.029)+(16.006), (I-300)+(2.029)+(16.007), (I-300)+(2.029)+(16.008), (I-300)+(2.029)+(17.001), (I-300)+(2.029)+(17.002), (I-300)+(2.029)+(17.003), (I-300)+(2.029)+(17.004), (I-300)+(2.029)+(17.005), (I-300)+(2.029)+(17.006), (I-300)+(2.029)+(17.007), (I-300)+(2.029)+(17.008), (I-300)+(2.029)+(17.009), (I-300)+(2.029)+(17.010), (I-300)+(2.029)+(17.011), (I-300)+(2.029)+(17.012), (I-300)+(2.029)+(18.001), (I-300)+(2.030)+(3.001), (I-300)+(2.030)+(3.002), (I-300)+(2.030)+(3.003), (I-300)+(2.030)+(3.004), (I-300)+(2.030)+(3.005), (I-300)+(2.030)+(3.006), (I-300)+(2.030)+(3.007), (I-300)+(2.030)+(3.008), (I-300)+(2.030)+(3.009), (I-300)+(2.030)+(3.010), (I-300)+(2.030)+(3.011), (I-300)+(2.030)+(3.012), (I-300)+(2.030)+(3.013), (I-300)+(2.030)+(3.014), (I-300)+(2.030)+(3.015), (I-300)+(2.030)+(3.016), (I-300)+(2.030)+(3.017), (I-300)+(2.030)+(3.018), (I-300)+(2.030)+(3.019), (I-300)+(2.030)+(3.020), (I-300)+(2.030)+(3.021), (I-300)+(2.030)+(3.022), (I-300)+(2.030)+(3.023), (I-300)+(2.030)+(3.024), (I-300)+(2.030)+(3.025), (I-300)+(2.030)+(3.026), (I-300)+(2.030)+(3.027), (I-300)+(2.030)+(3.028), (I-300)+(2.030)+(3.029), (I-300)+(2.030)+(3.030), (I-300)+(2.030)+(3.031), (I-300)+(2.030)+(5.001), (I-300)+(2.030)+(5.002), (I-300)+(2.030)+(5.003), (I-300)+(2.030)+(5.004), (I-300)+(2.030)+(5.005), (I-300)+(2.030)+(5.006), (I-300)+(2.030)+(5.007), (I-300)+(2.030)+(5.008), (I-300)+(2.030)+(5.009), (I-300)+(2.030)+(5.010), (I-300)+(2.030)+(5.011), (I-300)+(2.030)+(5.012), (I-300)+(2.030)+(5.013), (I-300)+(2.030)+(5.014), (I-300)+(2.030)+(5.015), (I-300)+(2.030)+(5.016), (I-300)+(2.030)+(5.017), (I-300)+(2.030)+(5.018), (I-300)+(2.030)+(5.019), (I-300)+(2.030)+(5.020), (I-300)+(2.030)+(5.021), (I-300)+(2.030)+(5.022), (I-300)+(2.030)+(5.023), (I-300)+(2.030)+(6.001), (I-300)+(2.030)+(6.002), (I-300)+(2.030)+(6.003), (I-300)+(2.030)+(6.004), (I-300)+(2.030)+(7.001), (I-300)+(2.030)+(7.002), (I-300)+(2.030)+(7.003), (I-300)+(2.030)+(7.004), (I-300)+(2.030)+(7.005), (I-300)+(2.030)+(7.006), (I-300)+(2.030)+(9.001), (I-300)+(2.030)+(9.002), (I-300)+(2.030)+(9.003), (I-300)+(2.030)+(9.004), (I-300)+(2.030)+(9.005), (I-300)+(2.030)+(9.006), (I-300)+(2.030)+(9.007), (I-300)+(2.030)+(9.008), (I-300)+(2.030)+(9.009), (I-300)+(2.030)+(14.001), (I-300)+(2.030)+(14.002), (I-300)+(2.030)+(15.008), (I-300)+(2.030)+(15.011), (I-300)+(2.030)+(15.012), (I-300)+(2.030)+(15.016), (I-300)+(2.030)+(15.025), (I-300)+(2.030)+(15.027), (I-300)+(2.030)+(15.047), (I-300)+(2.030)+(15.063), (I-300)+(2.030)+(15.064), (I-300)+(2.030)+(16.001), (I-300)+(2.030)+(16.002), (I-300)+(2.030)+(16.003), (I-300)+(2.030)+(16.004), (I-300)+(2.030)+(16.005), (I-300)+(2.030)+(16.006), (I-300)+(2.030)+(16.007), (I-300)+(2.030)+(16.008), (I-300)+(2.030)+(17.001), (I-300)+(2.030)+(17.002), (I-300)+(2.030)+(17.003), (I-300)+(2.030)+(17.004), (I-300)+(2.030)+(17.005), (I-300)+(2.030)+(17.006), (I-300)+(2.030)+(17.007), (I-300)+(2.030)+(17.008), (I-300)+(2.030)+(17.009), (I-300)+(2.030)+(17.010), (I-300)+(2.030)+(17.011), (I-300)+(2.030)+(17.012), (I-300)+(2.030)+(18.001), (I-300)+(2.031)+(3.001), (I-300)+(2.031)+(3.002), (I-300)+(2.031)+(3.003), (I-300)+(2.031)+(3.004), (I-300)+(2.031)+(3.005), (I-300)+(2.031)+(3.006), (I-300)+(2.031)+(3.007), (I-300)+(2.031)+(3.008), (I-300)+(2.031)+(3.009), (I-300)+(2.031)+(3.010), (I-300)+(2.031)+(3.011), (I-300)+(2.031)+(3.012), (I-300)+(2.031)+(3.013), (I-300)+(2.031)+(3.014), (I-300)+(2.031)+(3.015), (I-300)+(2.031)+(3.016), (I-300)+(2.031)+(3.017), (I-300)+(2.031)+(3.018), (I-300)+(2.031)+(3.019), (I-300)+(2.031)+(3.020), (I-300)+(2.031)+(3.021), (I-300)+(2.031)+(3.022), (I-300)+(2.031)+(3.023), (I-300)+(2.031)+(3.024), (I-300)+(2.031)+(3.025), (I-300)+(2.031)+(3.026), (I-300)+(2.031)+(3.027), (I-300)+(2.031)+(3.028), (I-300)+(2.031)+(3.029), (I-300)+(2.031)+(3.030), (I-300)+(2.031)+(3.031), (I-300)+(2.031)+(5.001), (I-300)+(2.031)+(5.002), (I-300)+(2.031)+(5.003), (I-300)+(2.031)+(5.004), (I-300)+(2.031)+(5.005), (I-300)+(2.031)+(5.006), (I-300)+(2.031)+(5.007), (I-300)+(2.031)+(5.008), (I-300)+(2.031)+(5.009), (I-300)+(2.031)+(5.010), (I-300)+(2.031)+(5.011), (I-300)+(2.031)+(5.012), (I-300)+(2.031)+(5.013), (I-300)+(2.031)+(5.014), (I-300)+(2.031)+(5.015), (I-300)+(2.031)+(5.016), (I-300)+(2.031)+(5.017), (I-300)+(2.031)+(5.018), (I-300)+(2.031)+(5.019), (I-300)+(2.031)+(5.020), (I-300)+(2.031)+(5.021), (I-300)+(2.031)+(5.022), (I-300)+(2.031)+(5.023), (I-300)+(2.031)+(6.001), (I-300)+(2.031)+(6.002), (I-300)+(2.031)+(6.003), (I-300)+(2.031)+(6.004), (I-300)+(2.031)+(7.001), (I-300)+(2.031)+(7.002), (I-300)+(2.031)+(7.003), (I-300)+(2.031)+(7.004), (I-300)+(2.031)+(7.005), (I-300)+(2.031)+(7.006), (I-300)+(2.031)+(9.001), (I-300)+(2.031)+(9.002), (I-300)+(2.031)+(9.003), (I-300)+(2.031)+(9.004), (I-300)+(2.031)+(9.005), (I-300)+(2.031)+(9.006), (I-300)+(2.031)+(9.007), (I-300)+(2.031)+(9.008), (I-300)+(2.031)+(9.009), (I-300)+(2.031)+(14.001), (I-300)+(2.031)+(14.002), (I-300)+(2.031)+(15.008), (I-300)+(2.031)+(15.011), (I-300)+(2.031)+(15.012), (I-300)+(2.031)+(15.016), (I-300)+(2.031)+(15.025), (I-300)+(2.031)+(15.027), (I-300)+(2.031)+(15.047), (I-300)+(2.031)+(15.063), (I-300)+(2.031)+(15.064), (I-300)+(2.031)+(16.001), (I-300)+(2.031)+(16.002), (I-300)+(2.031)+(16.003), (I-300)+(2.031)+(16.004), (I-300)+(2.031)+(16.005), (I-300)+(2.031)+(16.006), (I-300)+(2.031)+(16.007), (I-300)+(2.031)+(16.008), (I-300)+(2.031)+(17.001), (I-300)+(2.031)+(17.002), (I-300)+(2.031)+(17.003), (I-300)+(2.031)+(17.004), (I-300)+(2.031)+(17.005), (I-300)+(2.031)+(17.006), (I-300)+(2.031)+(17.007), (I-300)+(2.031)+(17.008), (I-300)+(2.031)+(17.009), (I-300)+(2.031)+(17.010), (I-300)+(2.031)+(17.011), (I-300)+(2.031)+(17.012), (I-300)+(2.031)+(18.001), (I-300)+(2.032)+(3.001), (I-300)+(2.032)+(3.002), (I-300)+(2.032)+(3.003), (I-300)+(2.032)+(3.004), (I-300)+(2.032)+(3.005), (I-300)+(2.032)+(3.006), (I-300)+(2.032)+(3.007), (I-300)+(2.032)+(3.008), (I-300)+(2.032)+(3.009), (I-300)+(2.032)+(3.010), (I-300)+(2.032)+(3.011), (I-300)+(2.032)+(3.012), (I-300)+(2.032)+(3.013), (I-300)+(2.032)+(3.014), (I-300)+(2.032)+(3.015), (I-300)+(2.032)+(3.016), (I-300)+(2.032)+(3.017), (I-300)+(2.032)+(3.018), (I-300)+(2.032)+(3.019), (I-300)+(2.032)+(3.020), (I-300)+(2.032)+(3.021), (I-300)+(2.032)+(3.022), (I-300)+(2.032)+(3.023), (I-300)+(2.032)+(3.024),
(I-300)+(2.032)+(3.025), (I-300)+(2.032)+(3.026),
(I-300)+(2.032)+(3.027), (I-300)+(2.032)+(3.028),
(I-300)+(2.032)+(3.029), (I-300)+(2.032)+(3.030),
(I-300)+(2.032)+(3.031), (I-300)+(2.032)+(5.001),
(I-300)+(2.032)+(5.002), (I-300)+(2.032)+(5.003),
(I-300)+(2.032)+(5.004), (I-300)+(2.032)+(5.005),
(I-300)+(2.032)+(5.006), (I-300)+(2.032)+(5.007),
(I-300)+(2.032)+(5.008), (I-300)+(2.032)+(5.009),
(I-300)+(2.032)+(5.010), (I-300)+(2.032)+(5.011),
(I-300)+(2.032)+(5.012), (I-300)+(2.032)+(5.013),
(I-300)+(2.032)+(5.014), (I-300)+(2.032)+(5.015),
(I-300)+(2.032)+(5.016), (I-300)+(2.032)+(5.017),
(I-300)+(2.032)+(5.018), (I-300)+(2.032)+(5.019),
(I-300)+(2.032)+(5.020), (I-300)+(2.032)+(5.021),
(I-300)+(2.032)+(5.022), (I-300)+(2.032)+(5.023),
(I-300)+(2.032)+(6.001), (I-300)+(2.032)+(6.002),
(I-300)+(2.032)+(6.003), (I-300)+(2.032)+(6.004),
(I-300)+(2.032)+(7.001), (I-300)+(2.032)+(7.002),
(I-300)+(2.032)+(7.003), (I-300)+(2.032)+(7.004),
(I-300)+(2.032)+(7.005), (I-300)+(2.032)+(7.006),
(I-300)+(2.032)+(9.001), (I-300)+(2.032)+(9.002),
(I-300)+(2.032)+(9.003), (I-300)+(2.032)+(9.004),
(I-300)+(2.032)+(9.005), (I-300)+(2.032)+(9.006),
(I-300)+(2.032)+(9.007), (I-300)+(2.032)+(9.008),
(I-300)+(2.032)+(9.009), (I-300)+(2.032)+(14.001),
(I-300)+(2.032)+(14.002), (I-300)+(2.032)+(15.008),
(I-300)+(2.032)+(15.011), (I-300)+(2.032)+(15.012),
(I-300)+(2.032)+(15.016), (I-300)+(2.032)+(15.025),
(I-300)+(2.032)+(15.027), (I-300)+(2.032)+(15.047),
(I-300)+(2.032)+(15.063), (I-300)+(2.032)+(15.064),
(I-300)+(2.032)+(16.001), (I-300)+(2.032)+(16.002),
(I-300)+(2.032)+(16.003), (I-300)+(2.032)+(16.004),
(I-300)+(2.032)+(16.005), (I-300)+(2.032)+(16.006),
(I-300)+(2.032)+(16.007), (I-300)+(2.032)+(16.008),
(I-300)+(2.032)+(17.001), (I-300)+(2.032)+(17.002),
(I-300)+(2.032)+(17.003), (I-300)+(2.032)+(17.004),
(I-300)+(2.032)+(17.005), (I-300)+(2.032)+(17.006),
(I-300)+(2.032)+(17.007), (I-300)+(2.032)+(17.008),
(I-300)+(2.032)+(17.009), (I-300)+(2.032)+(17.010),
(I-300)+(2.032)+(17.011), (I-300)+(2.032)+(17.012),
(I-300)+(2.032)+(18.001), (I-300)+(2.033)+(3.001), (I-300)+(2.033)+(3.002),
(I-300)+(2.033)+(3.003), (I-300)+(2.033)+(3.004),
(I-300)+(2.033)+(3.005), (I-300)+(2.033)+(3.006),
(I-300)+(2.033)+(3.007), (I-300)+(2.033)+(3.008),
(I-300)+(2.033)+(3.009), (I-300)+(2.033)+(3.010),
(I-300)+(2.033)+(3.011), (I-300)+(2.033)+(3.012),
(I-300)+(2.033)+(3.013), (I-300)+(2.033)+(3.014),
(I-300)+(2.033)+(3.015), (I-300)+(2.033)+(3.016),
(I-300)+(2.033)+(3.017), (I-300)+(2.033)+(3.018),
(I-300)+(2.033)+(3.019), (I-300)+(2.033)+(3.020),
(I-300)+(2.033)+(3.021), (I-300)+(2.033)+(3.022),
(I-300)+(2.033)+(3.023), (I-300)+(2.033)+(3.024),
(I-300)+(2.033)+(3.025), (I-300)+(2.033)+(3.026),
(I-300)+(2.033)+(3.027), (I-300)+(2.033)+(3.028),
(I-300)+(2.033)+(3.029), (I-300)+(2.033)+(3.030),
(I-300)+(2.033)+(3.031), (I-300)+(2.033)+(5.001),
(I-300)+(2.033)+(5.002), (I-300)+(2.033)+(5.003),
(I-300)+(2.033)+(5.004), (I-300)+(2.033)+(5.005),
(I-300)+(2.033)+(5.006), (I-300)+(2.033)+(5.007),
(I-300)+(2.033)+(5.008), (I-300)+(2.033)+(5.009),
(I-300)+(2.033)+(5.010), (I-300)+(2.033)+(5.011),
(I-300)+(2.033)+(5.012), (I-300)+(2.033)+(5.013),
(I-300)+(2.033)+(5.014), (I-300)+(2.033)+(5.015),
(I-300)+(2.033)+(5.016), (I-300)+(2.033)+(5.017),
(I-300)+(2.033)+(5.018), (I-300)+(2.033)+(5.019),
(I-300)+(2.033)+(5.020), (I-300)+(2.033)+(5.021),
(I-300)+(2.033)+(5.022), (I-300)+(2.033)+(5.023),
(I-300)+(2.033)+(6.001), (I-300)+(2.033)+(6.002),
(I-300)+(2.033)+(6.003), (I-300)+(2.033)+(6.004),
(I-300)+(2.033)+(7.001), (I-300)+(2.033)+(7.002),
(I-300)+(2.033)+(7.003), (I-300)+(2.033)+(7.004),
(I-300)+(2.033)+(7.005), (I-300)+(2.033)+(7.006),
(I-300)+(2.033)+(9.001), (I-300)+(2.033)+(9.002),
(I-300)+(2.033)+(9.003), (I-300)+(2.033)+(9.004),
(I-300)+(2.033)+(9.005), (I-300)+(2.033)+(9.006),
(I-300)+(2.033)+(9.007), (I-300)+(2.033)+(9.008),
(I-300)+(2.033)+(9.009), (I-300)+(2.033)+(14.001),
(I-300)+(2.033)+(14.002), (I-300)+(2.033)+(15.008),
(I-300)+(2.033)+(15.011), (I-300)+(2.033)+(15.012),
(I-300)+(2.033)+(15.016), (I-300)+(2.033)+(15.025),
(I-300)+(2.033)+(15.027), (I-300)+(2.033)+(15.047),
(I-300)+(2.033)+(15.063), (I-300)+(2.033)+(15.064),
(I-300)+(2.033)+(16.001), (I-300)+(2.033)+(16.002),
(I-300)+(2.033)+(16.003), (I-300)+(2.033)+(16.004),
(I-300)+(2.033)+(16.005), (I-300)+(2.033)+(16.006),
(I-300)+(2.033)+(16.007), (I-300)+(2.033)+(16.008),
(I-300)+(2.033)+(17.001), (I-300)+(2.033)+(17.002),
(I-300)+(2.033)+(17.003), (I-300)+(2.033)+(17.004),
(I-300)+(2.033)+(17.005), (I-300)+(2.033)+(17.006),
(I-300)+(2.033)+(17.007), (I-300)+(2.033)+(17.008),
(I-300)+(2.033)+(17.009), (I-300)+(2.033)+(17.010),
(I-300)+(2.033)+(17.011), (I-300)+(2.033)+(17.012),
(I-300)+(2.033)+(18.001), (I-300)+(2.034)+(3.001), (I-300)+(2.034)+(3.002),
(I-300)+(2.034)+(3.003), (I-300)+(2.034)+(3.004),
(I-300)+(2.034)+(3.005), (I-300)+(2.034)+(3.006),
(I-300)+(2.034)+(3.007), (I-300)+(2.034)+(3.008),
(I-300)+(2.034)+(3.009), (I-300)+(2.034)+(3.010),
(I-300)+(2.034)+(3.011), (I-300)+(2.034)+(3.012),
(I-300)+(2.034)+(3.013), (I-300)+(2.034)+(3.014),
(I-300)+(2.034)+(3.015), (I-300)+(2.034)+(3.016),
(I-300)+(2.034)+(3.017), (I-300)+(2.034)+(3.018),
(I-300)+(2.034)+(3.019), (I-300)+(2.034)+(3.020),
(I-300)+(2.034)+(3.021), (I-300)+(2.034)+(3.022),
(I-300)+(2.034)+(3.023), (I-300)+(2.034)+(3.024),
(I-300)+(2.034)+(3.025), (I-300)+(2.034)+(3.026),
(I-300)+(2.034)+(3.027), (I-300)+(2.034)+(3.028),
(I-300)+(2.034)+(3.029), (I-300)+(2.034)+(3.030),
(I-300)+(2.034)+(3.031), (I-300)+(2.034)+(5.001),
(I-300)+(2.034)+(5.002), (I-300)+(2.034)+(5.003),
(I-300)+(2.034)+(5.004), (I-300)+(2.034)+(5.005),
(I-300)+(2.034)+(5.006), (I-300)+(2.034)+(5.007),
(I-300)+(2.034)+(5.008), (I-300)+(2.034)+(5.009),
(I-300)+(2.034)+(5.010), (I-300)+(2.034)+(5.011),
(I-300)+(2.034)+(5.012), (I-300)+(2.034)+(5.013),
(I-300)+(2.034)+(5.014), (I-300)+(2.034)+(5.015),
(I-300)+(2.034)+(5.016), (I-300)+(2.034)+(5.017),
(I-300)+(2.034)+(5.018), (I-300)+(2.034)+(5.019),
(I-300)+(2.034)+(5.020), (I-300)+(2.034)+(5.021),
(I-300)+(2.034)+(5.022), (I-300)+(2.034)+(5.023),
(I-300)+(2.034)+(6.001), (I-300)+(2.034)+(6.002),
(I-300)+(2.034)+(6.003), (I-300)+(2.034)+(6.004),
(I-300)+(2.034)+(7.001), (I-300)+(2.034)+(7.002),
(I-300)+(2.034)+(7.003), (I-300)+(2.034)+(7.004),
(I-300)+(2.034)+(7.005), (I-300)+(2.034)+(7.006),
(I-300)+(2.034)+(9.001), (I-300)+(2.034)+(9.002),
(I-300)+(2.034)+(9.003), (I-300)+(2.034)+(9.004),
(I-300)+(2.034)+(9.005), (I-300)+(2.034)+(9.006),
(I-300)+(2.034)+(9.007), (I-300)+(2.034)+(9.008),
(I-300)+(2.034)+(9.009), (I-300)+(2.034)+(14.001),
(I-300)+(2.034)+(14.002), (I-300)+(2.034)+(15.008),
(I-300)+(2.034)+(15.011), (I-300)+(2.034)+(15.012), (I-300)+(2.034)+(15.016), (I-300)+(2.034)+(15.025), (I-300)+(2.034)+(15.027), (I-300)+(2.034)+(15.047), (I-300)+(2.034)+(15.063), (I-300)+(2.034)+(15.064), (I-300)+(2.034)+(16.001), (I-300)+(2.034)+(16.002), (I-300)+(2.034)+(16.003), (I-300)+(2.034)+(16.004), (I-300)+(2.034)+(16.005), (I-300)+(2.034)+(16.006), (I-300)+(2.034)+(16.007), (I-300)+(2.034)+(16.008), (I-300)+(2.034)+(17.001), (I-300)+(2.034)+(17.002), (I-300)+(2.034)+(17.003), (I-300)+(2.034)+(17.004), (I-300)+(2.034)+(17.005), (I-300)+(2.034)+(17.006), (I-300)+(2.034)+(17.007), (I-300)+(2.034)+(17.008), (I-300)+(2.034)+(17.009), (I-300)+(2.034)+(17.010), (I-300)+(2.034)+(17.011), (I-300)+(2.034)+(17.012), (I-300)+(2.034)+(18.001), (I-300)+(2.035)+(3.001), (I-300)+(2.035)+(3.002), (I-300)+(2.035)+(3.003), (I-300)+(2.035)+(3.004), (I-300)+(2.035)+(3.005), (I-300)+(2.035)+(3.006), (I-300)+(2.035)+(3.007), (I-300)+(2.035)+(3.008), (I-300)+(2.035)+(3.009), (I-300)+(2.035)+(3.010), (I-300)+(2.035)+(3.011), (I-300)+(2.035)+(3.012), (I-300)+(2.035)+(3.013), (I-300)+(2.035)+(3.014), (I-300)+(2.035)+(3.015), (I-300)+(2.035)+(3.016), (I-300)+(2.035)+(3.017), (I-300)+(2.035)+(3.018), (I-300)+(2.035)+(3.019), (I-300)+(2.035)+(3.020), (I-300)+(2.035)+(3.021), (I-300)+(2.035)+(3.022), (I-300)+(2.035)+(3.023), (I-300)+(2.035)+(3.024), (I-300)+(2.035)+(3.025), (I-300)+(2.035)+(3.026), (I-300)+(2.035)+(3.027), (I-300)+(2.035)+(3.028), (I-300)+(2.035)+(3.029), (I-300)+(2.035)+(3.030), (I-300)+(2.035)+(3.031), (I-300)+(2.035)+(5.001), (I-300)+(2.035)+(5.002), (I-300)+(2.035)+(5.003), (I-300)+(2.035)+(5.004), (I-300)+(2.035)+(5.005), (I-300)+(2.035)+(5.006), (I-300)+(2.035)+(5.007), (I-300)+(2.035)+(5.008), (I-300)+(2.035)+(5.009), (I-300)+(2.035)+(5.010), (I-300)+(2.035)+(5.011), (I-300)+(2.035)+(5.012), (I-300)+(2.035)+(5.013), (I-300)+(2.035)+(5.014), (I-300)+(2.035)+(5.015), (I-300)+(2.035)+(5.016), (I-300)+(2.035)+(5.017), (I-300)+(2.035)+(5.018), (I-300)+(2.035)+(5.019), (I-300)+(2.035)+(5.020), (I-300)+(2.035)+(5.021), (I-300)+(2.035)+(5.022), (I-300)+(2.035)+(5.023), (I-300)+(2.035)+(6.001), (I-300)+(2.035)+(6.002), (I-300)+(2.035)+(6.003), (I-300)+(2.035)+(6.004), (I-300)+(2.035)+(7.001), (I-300)+(2.035)+(7.002), (I-300)+(2.035)+(7.003), (I-300)+(2.035)+(7.004), (I-300)+(2.035)+(7.005), (I-300)+(2.035)+(7.006), (I-300)+(2.035)+(9.001), (I-300)+(2.035)+(9.002), (I-300)+(2.035)+(9.003), (I-300)+(2.035)+(9.004), (I-300)+(2.035)+(9.005), (I-300)+(2.035)+(9.006), (I-300)+(2.035)+(9.007), (I-300)+(2.035)+(9.008), (I-300)+(2.035)+(9.009), (I-300)+(2.035)+(14.001), (I-300)+(2.035)+(14.002), (I-300)+(2.035)+(15.008), (I-300)+(2.035)+(15.011), (I-300)+(2.035)+(15.012), (I-300)+(2.035)+(15.016), (I-300)+(2.035)+(15.025), (I-300)+(2.035)+(15.027), (I-300)+(2.035)+(15.047), (I-300)+(2.035)+(15.063), (I-300)+(2.035)+(15.064), (I-300)+(2.035)+(16.001), (I-300)+(2.035)+(16.002), (I-300)+(2.035)+(16.003), (I-300)+(2.035)+(16.004), (I-300)+(2.035)+(16.005), (I-300)+(2.035)+(16.006), (I-300)+(2.035)+(16.007), (I-300)+(2.035)+(16.008), (I-300)+(2.035)+(17.001), (I-300)+(2.035)+(17.002), (I-300)+(2.035)+(17.003), (I-300)+(2.035)+(17.004), (I-300)+(2.035)+(17.005), (I-300)+(2.035)+(17.006), (I-300)+(2.035)+(17.007), (I-300)+(2.035)+(17.008), (I-300)+(2.035)+(17.009), (I-300)+(2.035)+(17.010), (I-300)+(2.035)+(17.011), (I-300)+(2.035)+(17.012), (I-300)+(2.035)+(18.001), (I-300)+(2.036)+(3.001), (I-300)+(2.036)+(3.002), (I-300)+(2.036)+(3.003), (I-300)+(2.036)+(3.004), (I-300)+(2.036)+(3.005), (I-300)+(2.036)+(3.006), (I-300)+(2.036)+(3.007), (I-300)+(2.036)+(3.008), (I-300)+(2.036)+(3.009), (I-300)+(2.036)+(3.010), (I-300)+(2.036)+(3.011), (I-300)+(2.036)+(3.012), (I-300)+(2.036)+(3.013), (I-300)+(2.036)+(3.014), (I-300)+(2.036)+(3.015), (I-300)+(2.036)+(3.016), (I-300)+(2.036)+(3.017), (I-300)+(2.036)+(3.018), (I-300)+(2.036)+(3.019), (I-300)+(2.036)+(3.020), (I-300)+(2.036)+(3.021), (I-300)+(2.036)+(3.022), (I-300)+(2.036)+(3.023), (I-300)+(2.036)+(3.024), (I-300)+(2.036)+(3.025), (I-300)+(2.036)+(3.026), (I-300)+(2.036)+(3.027), (I-300)+(2.036)+(3.028), (I-300)+(2.036)+(3.029), (I-300)+(2.036)+(3.030), (I-300)+(2.036)+(3.031), (I-300)+(2.036)+(5.001), (I-300)+(2.036)+(5.002), (I-300)+(2.036)+(5.003), (I-300)+(2.036)+(5.004), (I-300)+(2.036)+(5.005), (I-300)+(2.036)+(5.006), (I-300)+(2.036)+(5.007), (I-300)+(2.036)+(5.008), (I-300)+(2.036)+(5.009), (I-300)+(2.036)+(5.010), (I-300)+(2.036)+(5.011), (I-300)+(2.036)+(5.012), (I-300)+(2.036)+(5.013), (I-300)+(2.036)+(5.014), (I-300)+(2.036)+(5.015), (I-300)+(2.036)+(5.016), (I-300)+(2.036)+(5.017), (I-300)+(2.036)+(5.018), (I-300)+(2.036)+(5.019), (I-300)+(2.036)+(5.020), (I-300)+(2.036)+(5.021), (I-300)+(2.036)+(5.022), (I-300)+(2.036)+(5.023), (I-300)+(2.036)+(6.001), (I-300)+(2.036)+(6.002), (I-300)+(2.036)+(6.003), (I-300)+(2.036)+(6.004), (I-300)+(2.036)+(7.001), (I-300)+(2.036)+(7.002), (I-300)+(2.036)+(7.003), (I-300)+(2.036)+(7.004), (I-300)+(2.036)+(7.005), (I-300)+(2.036)+(7.006), (I-300)+(2.036)+(9.001), (I-300)+(2.036)+(9.002), (I-300)+(2.036)+(9.003), (I-300)+(2.036)+(9.004), (I-300)+(2.036)+(9.005), (I-300)+(2.036)+(9.006), (I-300)+(2.036)+(9.007), (I-300)+(2.036)+(9.008), (I-300)+(2.036)+(9.009), (I-300)+(2.036)+(14.001), (I-300)+(2.036)+(14.002), (I-300)+(2.036)+(15.008), (I-300)+(2.036)+(15.011), (I-300)+(2.036)+(15.012), (I-300)+(2.036)+(15.016), (I-300)+(2.036)+(15.025), (I-300)+(2.036)+(15.027), (I-300)+(2.036)+(15.047), (I-300)+(2.036)+(15.063), (I-300)+(2.036)+(15.064), (I-300)+(2.036)+(16.001), (I-300)+(2.036)+(16.002), (I-300)+(2.036)+(16.003), (I-300)+(2.036)+(16.004), (I-300)+(2.036)+(16.005), (I-300)+(2.036)+(16.006), (I-300)+(2.036)+(16.007), (I-300)+(2.036)+(16.008), (I-300)+(2.036)+(17.001), (I-300)+(2.036)+(17.002), (I-300)+(2.036)+(17.003), (I-300)+(2.036)+(17.004), (I-300)+(2.036)+(17.005), (I-300)+(2.036)+(17.006), (I-300)+(2.036)+(17.007), (I-300)+(2.036)+(17.008), (I-300)+(2.036)+(17.009), (I-300)+(2.036)+(17.010), (I-300)+(2.036)+(17.011), (I-300)+(2.036)+(17.012), (I-300)+(2.036)+(18.001), (I-300)+(2.037)+(3.001), (I-300)+(2.037)+(3.002), (I-300)+(2.037)+(3.003), (I-300)+(2.037)+(3.004), (I-300)+(2.037)+(3.005), (I-300)+(2.037)+(3.006), (I-300)+(2.037)+(3.007), (I-300)+(2.037)+(3.008), (I-300)+(2.037)+(3.009), (I-300)+(2.037)+(3.010), (I-300)+(2.037)+(3.011), (I-300)+(2.037)+(3.012), (I-300)+(2.037)+(3.013), (I-300)+(2.037)+(3.014), (I-300)+(2.037)+(3.015), (I-300)+(2.037)+(3.016), (I-300)+(2.037)+(3.017), (I-300)+(2.037)+(3.018), (I-300)+(2.037)+(3.019), (I-300)+(2.037)+(3.020), (I-300)+(2.037)+(3.021), (I-300)+(2.037)+(3.022), (I-300)+(2.037)+(3.023), (I-300)+(2.037)+(3.024), (I-300)+(2.037)+(3.025), (I-300)+(2.037)+(3.026), (I-300)+(2.037)+(3.027), (I-300)+(2.037)+(3.028), (I-300)+(2.037)+(3.029), (I-300)+(2.037)+(3.030), (I-300)+(2.037)+(3.031), (I-300)+(2.037)+(5.001), (I-300)+(2.037)+(5.002), (I-300)+(2.037)+(5.003), (I-300)+(2.037)+(5.004), (I-300)+(2.037)+(5.005), (I-300)+(2.037)+(5.006), (I-300)+(2.037)+(5.007), (I-300)+(2.037)+(5.008), (I-300)+(2.037)+(5.009), (I-300)+(2.037)+(5.010), (I-300)+(2.037)+(5.011), (I-300)+(2.037)+(5.012), (I-300)+(2.037)+(5.013), (I-300)+(2.037)+(5.014), (I-300)+(2.037)+(5.015), (I-300)+(2.037)+(5.016), (I-300)+(2.037)+(5.017), (I-300)+(2.037)+(5.018), (I-300)+(2.037)+(5.019), (I-300)+(2.037)+(5.020), (I-300)+(2.037)+(5.021), (I-300)+(2.037)+(5.022), (I-300)+(2.037)+(5.023), (I-300)+(2.037)+(6.001), (I-300)+(2.037)+(6.002), (I-300)+(2.037)+(6.003), (I-300)+(2.037)+(6.004), (I-300)+(2.037)+(7.001), (I-300)+(2.037)+(7.002), (I-300)+(2.037)+(7.003), (I-300)+(2.037)+(7.004), (I-300)+(2.037)+(7.005), (I-300)+(2.037)+(7.006), (I-300)+(2.037)+(9.001), (I-300)+(2.037)+(9.002), (I-300)+(2.037)+(9.003), (I-300)+(2.037)+(9.004), (I-300)+(2.037)+(9.005), (I-300)+(2.037)+(9.006), (I-300)+(2.037)+(9.007), (I-300)+(2.037)+(9.008), (I-300)+(2.037)+(9.009), (I-300)+(2.037)+(14.001), (I-300)+(2.037)+(14.002), (I-300)+(2.037)+(15.008), (I-300)+(2.037)+(15.011), (I-300)+(2.037)+(15.012), (I-300)+(2.037)+(15.016), (I-300)+(2.037)+(15.025), (I-300)+(2.037)+(15.027), (I-300)+(2.037)+(15.047), (I-300)+(2.037)+(15.063), (I-300)+(2.037)+(15.064), (I-300)+(2.037)+(16.001), (I-300)+(2.037)+(16.002), (I-300)+(2.037)+(16.003), (I-300)+(2.037)+(16.004), (I-300)+(2.037)+(16.005), (I-300)+(2.037)+(16.006), (I-300)+(2.037)+(16.007), (I-300)+(2.037)+(16.008), (I-300)+(2.037)+(17.001), (I-300)+(2.037)+(17.002), (I-300)+(2.037)+(17.003), (I-300)+(2.037)+(17.004), (I-300)+(2.037)+(17.005), (I-300)+(2.037)+(17.006), (I-300)+(2.037)+(17.007), (I-300)+(2.037)+(17.008), (I-300)+(2.037)+(17.009), (I-300)+(2.037)+(17.010), (I-300)+(2.037)+(17.011), (I-300)+(2.037)+(17.012), (I-300)+(2.037)+(18.001), (I-300)+(2.038)+(3.001), (I-300)+(2.038)+(3.002), (I-300)+(2.038)+(3.003), (I-300)+(2.038)+(3.004), (I-300)+(2.038)+(3.005), (I-300)+(2.038)+(3.006), (I-300)+(2.038)+(3.007), (I-300)+(2.038)+(3.008), (I-300)+(2.038)+(3.009), (I-300)+(2.038)+(3.010), (I-300)+(2.038)+(3.011), (I-300)+(2.038)+(3.012), (I-300)+(2.038)+(3.013), (I-300)+(2.038)+(3.014), (I-300)+(2.038)+(3.015), (I-300)+(2.038)+(3.016), (I-300)+(2.038)+(3.017), (I-300)+(2.038)+(3.018), (I-300)+(2.038)+(3.019), (I-300)+(2.038)+(3.020), (I-300)+(2.038)+(3.021), (I-300)+(2.038)+(3.022), (I-300)+(2.038)+(3.023), (I-300)+(2.038)+(3.024), (I-300)+(2.038)+(3.025), (I-300)+(2.038)+(3.026), (I-300)+(2.038)+(3.027), (I-300)+(2.038)+(3.028), (I-300)+(2.038)+(3.029), (I-300)+(2.038)+(3.030), (I-300)+(2.038)+(3.031), (I-300)+(2.038)+(5.001), (I-300)+(2.038)+(5.002), (I-300)+(2.038)+(5.003), (I-300)+(2.038)+(5.004), (I-300)+(2.038)+(5.005), (I-300)+(2.038)+(5.006), (I-300)+(2.038)+(5.007), (I-300)+(2.038)+(5.008), (I-300)+(2.038)+(5.009), (I-300)+(2.038)+(5.010), (I-300)+(2.038)+(5.011), (I-300)+(2.038)+(5.012), (I-300)+(2.038)+(5.013), (I-300)+(2.038)+(5.014), (I-300)+(2.038)+(5.015), (I-300)+(2.038)+(5.016), (I-300)+(2.038)+(5.017), (I-300)+(2.038)+(5.018), (I-300)+(2.038)+(5.019), (I-300)+(2.038)+(5.020), (I-300)+(2.038)+(5.021), (I-300)+(2.038)+(5.022), (I-300)+(2.038)+(5.023), (I-300)+(2.038)+(6.001), (I-300)+(2.038)+(6.002), (I-300)+(2.038)+(6.003), (I-300)+(2.038)+(6.004), (I-300)+(2.038)+(7.001), (I-300)+(2.038)+(7.002), (I-300)+(2.038)+(7.003), (I-300)+(2.038)+(7.004), (I-300)+(2.038)+(7.005), (I-300)+(2.038)+(7.006), (I-300)+(2.038)+(9.001), (I-300)+(2.038)+(9.002), (I-300)+(2.038)+(9.003), (I-300)+(2.038)+(9.004), (I-300)+(2.038)+(9.005), (I-300)+(2.038)+(9.006), (I-300)+(2.038)+(9.007), (I-300)+(2.038)+(9.008), (I-300)+(2.038)+(9.009), (I-300)+(2.038)+(14.001), (I-300)+(2.038)+(14.002), (I-300)+(2.038)+(15.008), (I-300)+(2.038)+(15.011), (I-300)+(2.038)+(15.012), (I-300)+(2.038)+(15.016), (I-300)+(2.038)+(15.025), (I-300)+(2.038)+(15.027), (I-300)+(2.038)+(15.047), (I-300)+(2.038)+(15.063), (I-300)+(2.038)+(15.064), (I-300)+(2.038)+(16.001), (I-300)+(2.038)+(16.002), (I-300)+(2.038)+(16.003), (I-300)+(2.038)+(16.004), (I-300)+(2.038)+(16.005), (I-300)+(2.038)+(16.006), (I-300)+(2.038)+(16.007), (I-300)+(2.038)+(16.008), (I-300)+(2.038)+(17.001), (I-300)+(2.038)+(17.002), (I-300)+(2.038)+(17.003), (I-300)+(2.038)+(17.004), (I-300)+(2.038)+(17.005), (I-300)+(2.038)+(17.006), (I-300)+(2.038)+(17.007), (I-300)+(2.038)+(17.008), (I-300)+(2.038)+(17.009), (I-300)+(2.038)+(17.010), (I-300)+(2.038)+(17.011), (I-300)+(2.038)+(17.012), (I-300)+(2.038)+(18.001), (I-300)+(2.039)+(3.001), (I-300)+(2.039)+(3.002), (I-300)+(2.039)+(3.003), (I-300)+(2.039)+(3.004), (I-300)+(2.039)+(3.005), (I-300)+(2.039)+(3.006), (I-300)+(2.039)+(3.007), (I-300)+(2.039)+(3.008), (I-300)+(2.039)+(3.009), (I-300)+(2.039)+(3.010), (I-300)+(2.039)+(3.011), (I-300)+(2.039)+(3.012), (I-300)+(2.039)+(3.013), (I-300)+(2.039)+(3.014), (I-300)+(2.039)+(3.015), (I-300)+(2.039)+(3.016), (I-300)+(2.039)+(3.017), (I-300)+(2.039)+(3.018), (I-300)+(2.039)+(3.019), (I-300)+(2.039)+(3.020), (I-300)+(2.039)+(3.021), (I-300)+(2.039)+(3.022), (I-300)+(2.039)+(3.023), (I-300)+(2.039)+(3.024), (I-300)+(2.039)+(3.025), (I-300)+(2.039)+(3.026), (I-300)+(2.039)+(3.027), (I-300)+(2.039)+(3.028), (I-300)+(2.039)+(3.029), (I-300)+(2.039)+(3.030), (I-300)+(2.039)+(3.031), (I-300)+(2.039)+(5.001), (I-300)+(2.039)+(5.002), (I-300)+(2.039)+(5.003), (I-300)+(2.039)+(5.004), (I-300)+(2.039)+(5.005), (I-300)+(2.039)+(5.006), (I-300)+(2.039)+(5.007), (I-300)+(2.039)+(5.008), (I-300)+(2.039)+(5.009), (I-300)+(2.039)+(5.010), (I-300)+(2.039)+(5.011), (I-300)+(2.039)+(5.012), (I-300)+(2.039)+(5.013), (I-300)+(2.039)+(5.014), (I-300)+(2.039)+(5.015), (I-300)+(2.039)+(5.016), (I-300)+(2.039)+(5.017), (I-300)+(2.039)+(5.018), (I-300)+(2.039)+(5.019), (I-300)+(2.039)+(5.020), (I-300)+(2.039)+(5.021), (I-300)+(2.039)+(5.022), (I-300)+(2.039)+(5.023), (I-300)+(2.039)+(6.001), (I-300)+(2.039)+(6.002), (I-300)+(2.039)+(6.003), (I-300)+(2.039)+(6.004), (I-300)+(2.039)+(7.001), (I-300)+(2.039)+(7.002), (I-300)+(2.039)+(7.003), (I-300)+(2.039)+(7.004), (I-300)+(2.039)+(7.005), (I-300)+(2.039)+(7.006), (I-300)+(2.039)+(9.001), (I-300)+(2.039)+(9.002), (I-300)+(2.039)+(9.003), (I-300)+(2.039)+(9.004), (I-300)+(2.039)+(9.005), (I-300)+(2.039)+(9.006), (I-300)+(2.039)+(9.007), (I-300)+(2.039)+(9.008), (I-300)+(2.039)+(9.009), (I-300)+(2.039)+(14.001), (I-300)+(2.039)+(14.002), (I-300)+(2.039)+(15.008), (I-300)+(2.039)+(15.011), (I-300)+(2.039)+(15.012), (I-300)+(2.039)+(15.016), (I-300)+(2.039)+(15.025), (I-300)+(2.039)+(15.027), (I-300)+(2.039)+(15.047), (I-300)+(2.039)+(15.063), (I-300)+(2.039)+(15.064), (I-300)+(2.039)+(16.001), (I-300)+(2.039)+(16.002), (I-300)+(2.039)+(16.003), (I-300)+(2.039)+(16.004), (I-300)+(2.039)+(16.005), (I-300)+(2.039)+(16.006), (I-300)+(2.039)+(16.007), (I-300)+(2.039)+(16.008), (I-300)+(2.039)+(17.001), (I-300)+(2.039)+(17.002), (I-300)+(2.039)+(17.003), (I-300)+(2.039)+(17.004), (I-300)+(2.039)+(17.005), (I-300)+(2.039)+(17.006), (I-300)+(2.039)+(17.007), (I-300)+(2.039)+(17.008), (I-300)+(2.039)+(17.009), (I-300)+(2.039)+(17.010), (I-300)+(2.039)+(17.011), (I-300)+(2.039)+(17.012), (I-300)+(2.039)+(18.001), (I-300)+(2.040)+(3.001), (I-300)+(2.040)+(3.002), (I-300)+(2.040)+(3.003), (I-300)+(2.040)+(3.004), (I-300)+(2.040)+(3.005), (I-300)+(2.040)+(3.006), (I-300)+(2.040)+(3.007), (I-300)+(2.040)+(3.008), (I-300)+(2.040)+(3.009), (I-300)+(2.040)+(3.010), (I-300)+(2.040)+(3.011), (I-300)+(2.040)+(3.012), (I-300)+(2.040)+(3.013), (I-300)+(2.040)+(3.014), (I-300)+(2.040)+(3.015), (I-300)+(2.040)+(3.016), (I-300)+(2.040)+(3.017), (I-300)+(2.040)+(3.018), (I-300)+(2.040)+(3.019), (I-300)+(2.040)+(3.020), (I-300)+(2.040)+(3.021), (I-300)+(2.040)+(3.022), (I-300)+(2.040)+(3.023), (I-300)+(2.040)+(3.024), (I-300)+(2.040)+(3.025), (I-300)+(2.040)+(3.026), (I-300)+(2.040)+(3.027), (I-300)+(2.040)+(3.028), (I-300)+(2.040)+(3.029), (I-300)+(2.040)+(3.030), (I-300)+(2.040)+(3.031), (I-300)+(2.040)+(5.001), (I-300)+(2.040)+(5.002), (I-300)+(2.040)+(5.003), (I-300)+(2.040)+(5.004), (I-300)+(2.040)+(5.005), (I-300)+(2.040)+(5.006), (I-300)+(2.040)+(5.007), (I-300)+(2.040)+(5.008), (I-300)+(2.040)+(5.009), (I-300)+(2.040)+(5.010), (I-300)+(2.040)+(5.011), (I-300)+(2.040)+(5.012), (I-300)+(2.040)+(5.013), (I-300)+(2.040)+(5.014), (I-300)+(2.040)+(5.015), (I-300)+(2.040)+(5.016), (I-300)+(2.040)+(5.017), (I-300)+(2.040)+(5.018), (I-300)+(2.040)+(5.019), (I-300)+(2.040)+(5.020), (I-300)+(2.040)+(5.021), (I-300)+(2.040)+(5.022), (I-300)+(2.040)+(5.023), (I-300)+(2.040)+(6.001), (I-300)+(2.040)+(6.002), (I-300)+(2.040)+(6.003), (I-300)+(2.040)+(6.004), (I-300)+(2.040)+(7.001), (I-300)+(2.040)+(7.002), (I-300)+(2.040)+(7.003), (I-300)+(2.040)+(7.004), (I-300)+(2.040)+(7.005), (I-300)+(2.040)+(7.006), (I-300)+(2.040)+(9.001), (I-300)+(2.040)+(9.002), (I-300)+(2.040)+(9.003), (I-300)+(2.040)+(9.004), (I-300)+(2.040)+(9.005), (I-300)+(2.040)+(9.006), (I-300)+(2.040)+(9.007), (I-300)+(2.040)+(9.008), (I-300)+(2.040)+(9.009), (I-300)+(2.040)+(14.001), (I-300)+(2.040)+(14.002), (I-300)+(2.040)+(15.008), (I-300)+(2.040)+(15.011), (I-300)+(2.040)+(15.012), (I-300)+(2.040)+(15.016), (I-300)+(2.040)+(15.025), (I-300)+(2.040)+(15.027), (I-300)+(2.040)+(15.047), (I-300)+(2.040)+(15.063), (I-300)+(2.040)+(15.064), (I-300)+(2.040)+(16.001), (I-300)+(2.040)+(16.002), (I-300)+(2.040)+(16.003), (I-300)+(2.040)+(16.004), (I-300)+(2.040)+(16.005), (I-300)+(2.040)+(16.006), (I-300)+(2.040)+(16.007), (I-300)+(2.040)+(16.008), (I-300)+(2.040)+(17.001), (I-300)+(2.040)+(17.002), (I-300)+(2.040)+(17.003), (I-300)+(2.040)+(17.004), (I-300)+(2.040)+(17.005), (I-300)+(2.040)+(17.006), (I-300)+(2.040)+(17.007), (I-300)+(2.040)+(17.008), (I-300)+(2.040)+(17.009), (I-300)+(2.040)+(17.010), (I-300)+(2.040)+(17.011), (I-300)+(2.040)+(17.012), (I-300)+(2.040)+(18.001), (I-300)+(2.041)+(3.001), (I-300)+(2.041)+(3.002), (I-300)+(2.041)+(3.003), (I-300)+(2.041)+(3.004), (I-300)+(2.041)+(3.005), (I-300)+(2.041)+(3.006), (I-300)+(2.041)+(3.007), (I-300)+(2.041)+(3.008), (I-300)+(2.041)+(3.009), (I-300)+(2.041)+(3.010), (I-300)+(2.041)+(3.011), (I-300)+(2.041)+(3.012), (I-300)+(2.041)+(3.013), (I-300)+(2.041)+(3.014), (I-300)+(2.041)+(3.015), (I-300)+(2.041)+(3.016), (I-300)+(2.041)+(3.017), (I-300)+(2.041)+(3.018), (I-300)+(2.041)+(3.019), (I-300)+(2.041)+(3.020), (I-300)+(2.041)+(3.021), (I-300)+(2.041)+(3.022), (I-300)+(2.041)+(3.023), (I-300)+(2.041)+(3.024), (I-300)+(2.041)+(3.025), (I-300)+(2.041)+(3.026), (I-300)+(2.041)+(3.027), (I-300)+(2.041)+(3.028), (I-300)+(2.041)+(3.029), (I-300)+(2.041)+(3.030), (I-300)+(2.041)+(3.031), (I-300)+(2.041)+(5.001), (I-300)+(2.041)+(5.002), (I-300)+(2.041)+(5.003), (I-300)+(2.041)+(5.004), (I-300)+(2.041)+(5.005), (I-300)+(2.041)+(5.006), (I-300)+(2.041)+(5.007), (I-300)+(2.041)+(5.008), (I-300)+(2.041)+(5.009), (I-300)+(2.041)+(5.010), (I-300)+(2.041)+(5.011), (I-300)+(2.041)+(5.012), (I-300)+(2.041)+(5.013), (I-300)+(2.041)+(5.014), (I-300)+(2.041)+(5.015), (I-300)+(2.041)+(5.016), (I-300)+(2.041)+(5.017), (I-300)+(2.041)+(5.018), (I-300)+(2.041)+(5.019), (I-300)+(2.041)+(5.020), (I-300)+(2.041)+(5.021), (I-300)+(2.041)+(5.022), (I-300)+(2.041)+(5.023), (I-300)+(2.041)+(6.001), (I-300)+(2.041)+(6.002), (I-300)+(2.041)+(6.003), (I-300)+(2.041)+(6.004), (I-300)+(2.041)+(7.001), (I-300)+(2.041)+(7.002), (I-300)+(2.041)+(7.003), (I-300)+(2.041)+(7.004), (I-300)+(2.041)+(7.005), (I-300)+(2.041)+(7.006), (I-300)+(2.041)+(9.001), (I-300)+(2.041)+(9.002), (I-300)+(2.041)+(9.003), (I-300)+(2.041)+(9.004), (I-300)+(2.041)+(9.005), (I-300)+(2.041)+(9.006), (I-300)+(2.041)+(9.007), (I-300)+(2.041)+(9.008), (I-300)+(2.041)+(9.009), (I-300)+(2.041)+(14.001), (I-300)+(2.041)+(14.002), (I-300)+(2.041)+(15.008), (I-300)+(2.041)+(15.011), (I-300)+(2.041)+(15.012), (I-300)+(2.041)+(15.016), (I-300)+(2.041)+(15.025), (I-300)+(2.041)+(15.027), (I-300)+(2.041)+(15.047), (I-300)+(2.041)+(15.063), (I-300)+(2.041)+(15.064), (I-300)+(2.041)+(16.001), (I-300)+(2.041)+(16.002), (I-300)+(2.041)+(16.003), (I-300)+(2.041)+(16.004), (I-300)+(2.041)+(16.005), (I-300)+(2.041)+(16.006), (I-300)+(2.041)+(16.007), (I-300)+(2.041)+(16.008), (I-300)+(2.041)+(17.001), (I-300)+(2.041)+(17.002), (I-300)+(2.041)+(17.003), (I-300)+(2.041)+(17.004), (I-300)+(2.041)+(17.005), (I-300)+(2.041)+(17.006), (I-300)+(2.041)+(17.007), (I-300)+(2.041)+(17.008), (I-300)+(2.041)+(17.009), (I-300)+(2.041)+(17.010), (I-300)+(2.041)+(17.011), (I-300)+(2.041)+(17.012), (I-300)+(2.041)+(18.001), (I-300)+(2.042)+(3.001), (I-300)+(2.042)+(3.002), (I-300)+(2.042)+(3.003), (I-300)+(2.042)+(3.004), (I-300)+(2.042)+(3.005), (I-300)+(2.042)+(3.006), (I-300)+(2.042)+(3.007), (I-300)+(2.042)+(3.008), (I-300)+(2.042)+(3.009), (I-300)+(2.042)+(3.010), (I-300)+(2.042)+(3.011), (I-300)+(2.042)+(3.012), (I-300)+(2.042)+(3.013), (I-300)+(2.042)+(3.014), (I-300)+(2.042)+(3.015), (I-300)+(2.042)+(3.016), (I-300)+(2.042)+(3.017), (I-300)+(2.042)+(3.018), (I-300)+(2.042)+(3.019), (I-300)+(2.042)+(3.020), (I-300)+(2.042)+(3.021), (I-300)+(2.042)+(3.022), (I-300)+(2.042)+(3.023), (I-300)+(2.042)+(3.024), (I-300)+(2.042)+(3.025), (I-300)+(2.042)+(3.026), (I-300)+(2.042)+(3.027), (I-300)+(2.042)+(3.028), (I-300)+(2.042)+(3.029), (I-300)+(2.042)+(3.030), (I-300)+(2.042)+(3.031), (I-300)+(2.042)+(5.001), (I-300)+(2.042)+(5.002), (I-300)+(2.042)+(5.003), (I-300)+(2.042)+(5.004), (I-300)+(2.042)+(5.005), (I-300)+(2.042)+(5.006), (I-300)+(2.042)+(5.007), (I-300)+(2.042)+(5.008), (I-300)+(2.042)+(5.009), (I-300)+(2.042)+(5.010), (I-300)+(2.042)+(5.011), (I-300)+(2.042)+(5.012), (I-300)+(2.042)+(5.013), (I-300)+(2.042)+(5.014), (I-300)+(2.042)+(5.015), (I-300)+(2.042)+(5.016), (I-300)+(2.042)+(5.017), (I-300)+(2.042)+(5.018), (I-300)+(2.042)+(5.019), (I-300)+(2.042)+(5.020), (I-300)+(2.042)+(5.021), (I-300)+(2.042)+(5.022), (I-300)+(2.042)+(5.023), (I-300)+(2.042)+(6.001), (I-300)+(2.042)+(6.002), (I-300)+(2.042)+(6.003), (I-300)+(2.042)+(6.004), (I-300)+(2.042)+(7.001), (I-300)+(2.042)+(7.002), (I-300)+(2.042)+(7.003), (I-300)+(2.042)+(7.004), (I-300)+(2.042)+(7.005), (I-300)+(2.042)+(7.006), (I-300)+(2.042)+(9.001), (I-300)+(2.042)+(9.002), (I-300)+(2.042)+(9.003), (I-300)+(2.042)+(9.004), (I-300)+(2.042)+(9.005), (I-300)+(2.042)+(9.006), (I-300)+(2.042)+(9.007), (I-300)+(2.042)+(9.008), (I-300)+(2.042)+(9.009), (I-300)+(2.042)+(14.001), (I-300)+(2.042)+(14.002), (I-300)+(2.042)+(15.008), (I-300)+(2.042)+(15.011), (I-300)+(2.042)+(15.012), (I-300)+(2.042)+(15.016), (I-300)+(2.042)+(15.025), (I-300)+(2.042)+(15.027), (I-300)+(2.042)+(15.047), (I-300)+(2.042)+(15.063), (I-300)+(2.042)+(15.064), (I-300)+(2.042)+(16.001), (I-300)+(2.042)+(16.002), (I-300)+(2.042)+(16.003), (I-300)+(2.042)+(16.004), (I-300)+(2.042)+(16.005), (I-300)+(2.042)+(16.006), (I-300)+(2.042)+(16.007), (I-300)+(2.042)+(16.008), (I-300)+(2.042)+(17.001), (I-300)+(2.042)+(17.002), (I-300)+(2.042)+(17.003), (I-300)+(2.042)+(17.004), (I-300)+(2.042)+(17.005), (I-300)+(2.042)+(17.006), (I-300)+(2.042)+(17.007), (I-300)+(2.042)+(17.008), (I-300)+(2.042)+(17.009), (I-300)+(2.042)+(17.010), (I-300)+(2.042)+(17.011), (I-300)+(2.042)+(17.012), (I-300)+(2.042)+(18.001), (I-300)+(2.043)+(3.001), (I-300)+(2.043)+(3.002), (I-300)+(2.043)+(3.003), (I-300)+(2.043)+(3.004), (I-300)+(2.043)+(3.005), (I-300)+(2.043)+(3.006), (I-300)+(2.043)+(3.007), (I-300)+(2.043)+(3.008), (I-300)+(2.043)+(3.009), (I-300)+(2.043)+(3.010), (I-300)+(2.043)+(3.011), (I-300)+(2.043)+(3.012), (I-300)+(2.043)+(3.013), (I-300)+(2.043)+(3.014), (I-300)+(2.043)+(3.015), (I-300)+(2.043)+(3.016), (I-300)+(2.043)+(3.017), (I-300)+(2.043)+(3.018), (I-300)+(2.043)+(3.019), (I-300)+(2.043)+(3.020), (I-300)+(2.043)+(3.021), (I-300)+(2.043)+(3.022), (I-300)+(2.043)+(3.023), (I-300)+(2.043)+(3.024), (I-300)+(2.043)+(3.025), (I-300)+(2.043)+(3.026), (I-300)+(2.043)+(3.027), (I-300)+(2.043)+(3.028), (I-300)+(2.043)+(3.029), (I-300)+(2.043)+(3.030), (I-300)+(2.043)+(3.031), (I-300)+(2.043)+(5.001), (I-300)+(2.043)+(5.002), (I-300)+(2.043)+(5.003), (I-300)+(2.043)+(5.004), (I-300)+(2.043)+(5.005), (I-300)+(2.043)+(5.006), (I-300)+(2.043)+(5.007), (I-300)+(2.043)+(5.008), (I-300)+(2.043)+(5.009), (I-300)+(2.043)+(5.010), (I-300)+(2.043)+(5.011), (I-300)+(2.043)+(5.012), (I-300)+(2.043)+(5.013), (I-300)+(2.043)+(5.014), (I-300)+(2.043)+(5.015), (I-300)+(2.043)+(5.016), (I-300)+(2.043)+(5.017), (I-300)+(2.043)+(5.018), (I-300)+(2.043)+(5.019), (I-300)+(2.043)+(5.020), (I-300)+(2.043)+(5.021), (I-300)+(2.043)+(5.022), (I-300)+(2.043)+(5.023), (I-300)+(2.043)+(6.001), (I-300)+(2.043)+(6.002), (I-300)+(2.043)+(6.003), (I-300)+(2.043)+(6.004), (I-300)+(2.043)+(7.001), (I-300)+(2.043)+(7.002), (I-300)+(2.043)+(7.003), (I-300)+(2.043)+(7.004), (I-300)+(2.043)+(7.005), (I-300)+(2.043)+(7.006), (I-300)+(2.043)+(9.001), (I-300)+(2.043)+(9.002), (I-300)+(2.043)+(9.003), (I-300)+(2.043)+(9.004), (I-300)+(2.043)+(9.005), (I-300)+(2.043)+(9.006), (I-300)+(2.043)+(9.007), (I-300)+(2.043)+(9.008), (I-300)+(2.043)+(9.009), (I-300)+(2.043)+(14.001), (I-300)+(2.043)+(14.002), (I-300)+(2.043)+(15.008), (I-300)+(2.043)+(15.011), (I-300)+(2.043)+(15.012), (I-300)+(2.043)+(15.016), (I-300)+(2.043)+(15.025), (I-300)+(2.043)+(15.027), (I-300)+(2.043)+(15.047), (I-300)+(2.043)+(15.063), (I-300)+(2.043)+(15.064), (I-300)+(2.043)+(16.001), (I-300)+(2.043)+(16.002), (I-300)+(2.043)+(16.003), (I-300)+(2.043)+(16.004), (I-300)+(2.043)+(16.005), (I-300)+(2.043)+(16.006), (I-300)+(2.043)+(16.007), (I-300)+(2.043)+(16.008), (I-300)+(2.043)+(17.001), (I-300)+(2.043)+(17.002), (I-300)+(2.043)+(17.003), (I-300)+(2.043)+(17.004), (I-300)+(2.043)+(17.005), (I-300)+(2.043)+(17.006), (I-300)+(2.043)+(17.007), (I-300)+(2.043)+(17.008), (I-300)+(2.043)+(17.009), (I-300)+(2.043)+(17.010), (I-300)+(2.043)+(17.011), (I-300)+(2.043)+(17.012), (I-300)+(2.043)+(18.001), (I-300)+(2.044)+(3.001), (I-300)+(2.044)+(3.002), (I-300)+(2.044)+(3.003), (I-300)+(2.044)+(3.004), (I-300)+(2.044)+(3.005), (I-300)+(2.044)+(3.006), (I-300)+(2.044)+(3.007), (I-300)+(2.044)+(3.008), (I-300)+(2.044)+(3.009), (I-300)+(2.044)+(3.010), (I-300)+(2.044)+(3.011), (I-300)+(2.044)+(3.012), (I-300)+(2.044)+(3.013), (I-300)+(2.044)+(3.014), (I-300)+(2.044)+(3.015), (I-300)+(2.044)+(3.016), (I-300)+(2.044)+(3.017), (I-300)+(2.044)+(3.018), (I-300)+(2.044)+(3.019), (I-300)+(2.044)+(3.020), (I-300)+(2.044)+(3.021), (I-300)+(2.044)+(3.022), (I-300)+(2.044)+(3.023), (I-300)+(2.044)+(3.024), (I-300)+(2.044)+(3.025), (I-300)+(2.044)+(3.026), (I-300)+(2.044)+(3.027), (I-300)+(2.044)+(3.028), (I-300)+(2.044)+(3.029), (I-300)+(2.044)+(3.030), (I-300)+(2.044)+(3.031), (I-300)+(2.044)+(5.001), (I-300)+(2.044)+(5.002), (I-300)+(2.044)+(5.003), (I-300)+(2.044)+(5.004), (I-300)+(2.044)+(5.005), (I-300)+(2.044)+(5.006), (I-300)+(2.044)+(5.007), (I-300)+(2.044)+(5.008), (I-300)+(2.044)+(5.009), (I-300)+(2.044)+(5.010), (I-300)+(2.044)+(5.011), (I-300)+(2.044)+(5.012), (I-300)+(2.044)+(5.013), (I-300)+(2.044)+(5.014), (I-300)+(2.044)+(5.015), (I-300)+(2.044)+(5.016), (I-300)+(2.044)+(5.017), (I-300)+(2.044)+(5.018), (I-300)+(2.044)+(5.019), (I-300)+(2.044)+(5.020), (I-300)+(2.044)+(5.021), (I-300)+(2.044)+(5.022), (I-300)+(2.044)+(5.023), (I-300)+(2.044)+(6.001), (I-300)+(2.044)+(6.002), (I-300)+(2.044)+(6.003), (I-300)+(2.044)+(6.004), (I-300)+(2.044)+(7.001), (I-300)+(2.044)+(7.002), (I-300)+(2.044)+(7.003), (I-300)+(2.044)+(7.004), (I-300)+(2.044)+(7.005), (I-300)+(2.044)+(7.006), (I-300)+(2.044)+(9.001), (I-300)+(2.044)+(9.002), (I-300)+(2.044)+(9.003), (I-300)+(2.044)+(9.004), (I-300)+(2.044)+(9.005), (I-300)+(2.044)+(9.006), (I-300)+(2.044)+(9.007), (I-300)+(2.044)+(9.008), (I-300)+(2.044)+(9.009), (I-300)+(2.044)+(14.001), (I-300)+(2.044)+(14.002), (I-300)+(2.044)+(15.008), (I-300)+(2.044)+(15.011), (I-300)+(2.044)+(15.012), (I-300)+(2.044)+(15.016), (I-300)+(2.044)+(15.025), (I-300)+(2.044)+(15.027), (I-300)+(2.044)+(15.047), (I-300)+(2.044)+(15.063), (I-300)+(2.044)+(15.064), (I-300)+(2.044)+(16.001), (I-300)+(2.044)+(16.002), (I-300)+(2.044)+(16.003), (I-300)+(2.044)+(16.004), (I-300)+(2.044)+(16.005), (I-300)+(2.044)+(16.006), (I-300)+(2.044)+(16.007), (I-300)+(2.044)+(16.008), (I-300)+(2.044)+(17.001), (I-300)+(2.044)+(17.002), (I-300)+(2.044)+(17.003), (I-300)+(2.044)+(17.004), (I-300)+(2.044)+(17.005), (I-300)+(2.044)+(17.006), (I-300)+(2.044)+(17.007), (I-300)+(2.044)+(17.008), (I-300)+(2.044)+(17.009), (I-300)+(2.044)+(17.010), (I-300)+(2.044)+(17.011), (I-300)+(2.044)+(17.012), (I-300)+(2.044)+(18.001), (I-300)+(2.045)+(3.001), (I-300)+(2.045)+(3.002), (I-300)+(2.045)+(3.003), (I-300)+(2.045)+(3.004), (I-300)+(2.045)+(3.005), (I-300)+(2.045)+(3.006), (I-300)+(2.045)+(3.007), (I-300)+(2.045)+(3.008), (I-300)+(2.045)+(3.009), (I-300)+(2.045)+(3.010), (I-300)+(2.045)+(3.011), (I-300)+(2.045)+(3.012), (I-300)+(2.045)+(3.013), (I-300)+(2.045)+(3.014), (I-300)+(2.045)+(3.015), (I-300)+(2.045)+(3.016), (I-300)+(2.045)+(3.017), (I-300)+(2.045)+(3.018), (I-300)+(2.045)+(3.019), (I-300)+(2.045)+(3.020), (I-300)+(2.045)+(3.021), (I-300)+(2.045)+(3.022), (I-300)+(2.045)+(3.023), (I-300)+(2.045)+(3.024), (I-300)+(2.045)+(3.025), (I-300)+(2.045)+(3.026), (I-300)+(2.045)+(3.027), (I-300)+(2.045)+(3.028), (I-300)+(2.045)+(3.029), (I-300)+(2.045)+(3.030), (I-300)+(2.045)+(3.031), (I-300)+(2.045)+(5.001), (I-300)+(2.045)+(5.002), (I-300)+(2.045)+(5.003), (I-300)+(2.045)+(5.004), (I-300)+(2.045)+(5.005), (I-300)+(2.045)+(5.006), (I-300)+(2.045)+(5.007), (I-300)+(2.045)+(5.008), (I-300)+(2.045)+(5.009), (I-300)+(2.045)+(5.010), (I-300)+(2.045)+(5.011), (I-300)+(2.045)+(5.012), (I-300)+(2.045)+(5.013), (I-300)+(2.045)+(5.014), (I-300)+(2.045)+(5.015), (I-300)+(2.045)+(5.016), (I-300)+(2.045)+(5.017), (I-300)+(2.045)+(5.018), (I-300)+(2.045)+(5.019), (I-300)+(2.045)+(5.020), (I-300)+(2.045)+(5.021), (I-300)+(2.045)+(5.022), (I-300)+(2.045)+(5.023), (I-300)+(2.045)+(6.001), (I-300)+(2.045)+(6.002), (I-300)+(2.045)+(6.003), (I-300)+(2.045)+(6.004), (I-300)+(2.045)+(7.001), (I-300)+(2.045)+(7.002), (I-300)+(2.045)+(7.003), (I-300)+(2.045)+(7.004), (I-300)+(2.045)+(7.005), (I-300)+(2.045)+(7.006), (I-300)+(2.045)+(9.001), (I-300)+(2.045)+(9.002), (I-300)+(2.045)+(9.003), (I-300)+(2.045)+(9.004), (I-300)+(2.045)+(9.005), (I-300)+(2.045)+(9.006), (I-300)+(2.045)+(9.007), (I-300)+(2.045)+(9.008), (I-300)+(2.045)+(9.009), (I-300)+(2.045)+(14.001), (I-300)+(2.045)+(14.002), (I-300)+(2.045)+(15.008), (I-300)+(2.045)+(15.011), (I-300)+(2.045)+(15.012), (I-300)+(2.045)+(15.016), (I-300)+(2.045)+(15.025), (I-300)+(2.045)+(15.027), (I-300)+(2.045)+(15.047), (I-300)+(2.045)+(15.063), (I-300)+(2.045)+(15.064), (I-300)+(2.045)+(16.001), (I-300)+(2.045)+(16.002), (I-300)+(2.045)+(16.003), (I-300)+(2.045)+(16.004), (I-300)+(2.045)+(16.005), (I-300)+(2.045)+(16.006), (I-300)+(2.045)+(16.007), (I-300)+(2.045)+(16.008), (I-300)+(2.045)+(17.001), (I-300)+(2.045)+(17.002), (I-300)+(2.045)+(17.003), (I-300)+(2.045)+(17.004), (I-300)+(2.045)+(17.005), (I-300)+(2.045)+(17.006), (I-300)+(2.045)+(17.007), (I-300)+(2.045)+(17.008), (I-300)+(2.045)+(17.009), (I-300)+(2.045)+(17.010), (I-300)+(2.045)+(17.011), (I-300)+(2.045)+(17.012), (I-300)+(2.045)+(18.001), (I-300)+(2.046)+(3.001), (I-300)+(2.046)+(3.002), (I-300)+(2.046)+(3.003), (I-300)+(2.046)+(3.004), (I-300)+(2.046)+(3.005), (I-300)+(2.046)+(3.006), (I-300)+(2.046)+(3.007), (I-300)+(2.046)+(3.008), (I-300)+(2.046)+(3.009), (I-300)+(2.046)+(3.010), (I-300)+(2.046)+(3.011), (I-300)+(2.046)+(3.012), (I-300)+(2.046)+(3.013), (I-300)+(2.046)+(3.014), (I-300)+(2.046)+(3.015), (I-300)+(2.046)+(3.016), (I-300)+(2.046)+(3.017), (I-300)+(2.046)+(3.018), (I-300)+(2.046)+(3.019), (I-300)+(2.046)+(3.020), (I-300)+(2.046)+(3.021), (I-300)+(2.046)+(3.022), (I-300)+(2.046)+(3.023), (I-300)+(2.046)+(3.024), (I-300)+(2.046)+(3.025), (I-300)+(2.046)+(3.026), (I-300)+(2.046)+(3.027), (I-300)+(2.046)+(3.028), (I-300)+(2.046)+(3.029), (I-300)+(2.046)+(3.030), (I-300)+(2.046)+(3.031), (I-300)+(2.046)+(5.001), (I-300)+(2.046)+(5.002), (I-300)+(2.046)+(5.003), (I-300)+(2.046)+(5.004), (I-300)+(2.046)+(5.005), (I-300)+(2.046)+(5.006), (I-300)+(2.046)+(5.007), (I-300)+(2.046)+(5.008), (I-300)+(2.046)+(5.009), (I-300)+(2.046)+(5.010), (I-300)+(2.046)+(5.011), (I-300)+(2.046)+(5.012), (I-300)+(2.046)+(5.013), (I-300)+(2.046)+(5.014), (I-300)+(2.046)+(5.015), (I-300)+(2.046)+(5.016), (I-300)+(2.046)+(5.017), (I-300)+(2.046)+(5.018), (I-300)+(2.046)+(5.019), (I-300)+(2.046)+(5.020), (I-300)+(2.046)+(5.021), (I-300)+(2.046)+(5.022), (I-300)+(2.046)+(5.023), (I-300)+(2.046)+(6.001), (I-300)+(2.046)+(6.002), (I-300)+(2.046)+(6.003), (I-300)+(2.046)+(6.004), (I-300)+(2.046)+(7.001), (I-300)+(2.046)+(7.002), (I-300)+(2.046)+(7.003), (I-300)+(2.046)+(7.004), (I-300)+(2.046)+(7.005), (I-300)+(2.046)+(7.006), (I-300)+(2.046)+(9.001), (I-300)+(2.046)+(9.002), (I-300)+(2.046)+(9.003), (I-300)+(2.046)+(9.004), (I-300)+(2.046)+(9.005), (I-300)+(2.046)+(9.006), (I-300)+(2.046)+(9.007), (I-300)+(2.046)+(9.008), (I-300)+(2.046)+(9.009), (I-300)+(2.046)+(14.001), (I-300)+(2.046)+(14.002), (I-300)+(2.046)+(15.008), (I-300)+(2.046)+(15.011), (I-300)+(2.046)+(15.012), (I-300)+(2.046)+(15.016), (I-300)+(2.046)+(15.025), (I-300)+(2.046)+(15.027), (I-300)+(2.046)+(15.047), (I-300)+(2.046)+(15.063), (I-300)+(2.046)+(15.064), (I-300)+(2.046)+(16.001), (I-300)+(2.046)+(16.002), (I-300)+(2.046)+(16.003), (I-300)+(2.046)+(16.004), (I-300)+(2.046)+(16.005), (I-300)+(2.046)+(16.006), (I-300)+(2.046)+(16.007), (I-300)+(2.046)+(16.008), (I-300)+(2.046)+(17.001), (I-300)+(2.046)+(17.002), (I-300)+(2.046)+(17.003), (I-300)+(2.046)+(17.004), (I-300)+(2.046)+(17.005), (I-300)+(2.046)+(17.006), (I-300)+(2.046)+(17.007), (I-300)+(2.046)+(17.008), (I-300)+(2.046)+(17.009), (I-300)+(2.046)+(17.010), (I-300)+(2.046)+(17.011), (I-300)+(2.046)+(17.012), (I-300)+(2.046)+(18.001), (I-300)+(2.047)+(3.001), (I-300)+(2.047)+(3.002), (I-300)+(2.047)+(3.003), (I-300)+(2.047)+(3.004), (I-300)+(2.047)+(3.005), (I-300)+(2.047)+(3.006), (I-300)+(2.047)+(3.007), (I-300)+(2.047)+(3.008), (I-300)+(2.047)+(3.009), (I-300)+(2.047)+(3.010), (I-300)+(2.047)+(3.011), (I-300)+(2.047)+(3.012), (I-300)+(2.047)+(3.013), (I-300)+(2.047)+(3.014), (I-300)+(2.047)+(3.015), (I-300)+(2.047)+(3.016), (I-300)+(2.047)+(3.017), (I-300)+(2.047)+(3.018), (I-300)+(2.047)+(3.019), (I-300)+(2.047)+(3.020), (I-300)+(2.047)+(3.021), (I-300)+(2.047)+(3.022), (I-300)+(2.047)+(3.023), (I-300)+(2.047)+(3.024), (I-300)+(2.047)+(3.025), (I-300)+(2.047)+(3.026), (I-300)+(2.047)+(3.027), (I-300)+(2.047)+(3.028), (I-300)+(2.047)+(3.029), (I-300)+(2.047)+(3.030), (I-300)+(2.047)+(3.031), (I-300)+(2.047)+(5.001), (I-300)+(2.047)+(5.002), (I-300)+(2.047)+(5.003), (I-300)+(2.047)+(5.004), (I-300)+(2.047)+(5.005), (I-300)+(2.047)+(5.006), (I-300)+(2.047)+(5.007), (I-300)+(2.047)+(5.008), (I-300)+(2.047)+(5.009), (I-300)+(2.047)+(5.010), (I-300)+(2.047)+(5.011),
(I-300)+(2.047)+(5.012), (I-300)+(2.047)+(5.013),
(I-300)+(2.047)+(5.014), (I-300)+(2.047)+(5.015),
(I-300)+(2.047)+(5.016), (I-300)+(2.047)+(5.017),
(I-300)+(2.047)+(5.018), (I-300)+(2.047)+(5.019),
(I-300)+(2.047)+(5.020), (I-300)+(2.047)+(5.021),
(I-300)+(2.047)+(5.022), (I-300)+(2.047)+(5.023),
(I-300)+(2.047)+(6.001), (I-300)+(2.047)+(6.002),
(I-300)+(2.047)+(6.003), (I-300)+(2.047)+(6.004),
(I-300)+(2.047)+(7.001), (I-300)+(2.047)+(7.002),
(I-300)+(2.047)+(7.003), (I-300)+(2.047)+(7.004),
(I-300)+(2.047)+(7.005), (I-300)+(2.047)+(7.006),
(I-300)+(2.047)+(9.001), (I-300)+(2.047)+(9.002),
(I-300)+(2.047)+(9.003), (I-300)+(2.047)+(9.004),
(I-300)+(2.047)+(9.005), (I-300)+(2.047)+(9.006),
(I-300)+(2.047)+(9.007), (I-300)+(2.047)+(9.008),
(I-300)+(2.047)+(9.009), (I-300)+(2.047)+(14.001),
(I-300)+(2.047)+(14.002), (I-300)+(2.047)+(15.008),
(I-300)+(2.047)+(15.011), (I-300)+(2.047)+(15.012),
(I-300)+(2.047)+(15.016), (I-300)+(2.047)+(15.025),
(I-300)+(2.047)+(15.027), (I-300)+(2.047)+(15.047),
(I-300)+(2.047)+(15.063), (I-300)+(2.047)+(15.064),
(I-300)+(2.047)+(16.001), (I-300)+(2.047)+(16.002),
(I-300)+(2.047)+(16.003), (I-300)+(2.047)+(16.004),
(I-300)+(2.047)+(16.005), (I-300)+(2.047)+(16.006),
(I-300)+(2.047)+(16.007), (I-300)+(2.047)+(16.008),
(I-300)+(2.047)+(17.001), (I-300)+(2.047)+(17.002),
(I-300)+(2.047)+(17.003), (I-300)+(2.047)+(17.004),
(I-300)+(2.047)+(17.005), (I-300)+(2.047)+(17.006),
(I-300)+(2.047)+(17.007), (I-300)+(2.047)+(17.008),
(I-300)+(2.047)+(17.009), (I-300)+(2.047)+(17.010),
(I-300)+(2.047)+(17.011), (I-300)+(2.047)+(17.012),
(I-300)+(2.047)+(18.001), (I-300)+(2.048)+(3.001), (I-300)+(2.048)+(3.002),
(I-300)+(2.048)+(3.003), (I-300)+(2.048)+(3.004),
(I-300)+(2.048)+(3.005), (I-300)+(2.048)+(3.006),
(I-300)+(2.048)+(3.007), (I-300)+(2.048)+(3.008),
(I-300)+(2.048)+(3.009), (I-300)+(2.048)+(3.010),
(I-300)+(2.048)+(3.011), (I-300)+(2.048)+(3.012),
(I-300)+(2.048)+(3.013), (I-300)+(2.048)+(3.014),
(I-300)+(2.048)+(3.015), (I-300)+(2.048)+(3.016),
(I-300)+(2.048)+(3.017), (I-300)+(2.048)+(3.018),
(I-300)+(2.048)+(3.019), (I-300)+(2.048)+(3.020),
(I-300)+(2.048)+(3.021), (I-300)+(2.048)+(3.022),
(I-300)+(2.048)+(3.023), (I-300)+(2.048)+(3.024),
(I-300)+(2.048)+(3.025), (I-300)+(2.048)+(3.026),
(I-300)+(2.048)+(3.027), (I-300)+(2.048)+(3.028),
(I-300)+(2.048)+(3.029), (I-300)+(2.048)+(3.030),
(I-300)+(2.048)+(3.031), (I-300)+(2.048)+(5.001),
(I-300)+(2.048)+(5.002), (I-300)+(2.048)+(5.003),
(I-300)+(2.048)+(5.004), (I-300)+(2.048)+(5.005),
(I-300)+(2.048)+(5.006), (I-300)+(2.048)+(5.007),
(I-300)+(2.048)+(5.008), (I-300)+(2.048)+(5.009),
(I-300)+(2.048)+(5.010), (I-300)+(2.048)+(5.011),
(I-300)+(2.048)+(5.012), (I-300)+(2.048)+(5.013),
(I-300)+(2.048)+(5.014), (I-300)+(2.048)+(5.015),
(I-300)+(2.048)+(5.016), (I-300)+(2.048)+(5.017),
(I-300)+(2.048)+(5.018), (I-300)+(2.048)+(5.019),
(I-300)+(2.048)+(5.020), (I-300)+(2.048)+(5.021),
(I-300)+(2.048)+(5.022), (I-300)+(2.048)+(5.023),
(I-300)+(2.048)+(6.001), (I-300)+(2.048)+(6.002),
(I-300)+(2.048)+(6.003), (I-300)+(2.048)+(6.004),
(I-300)+(2.048)+(7.001), (I-300)+(2.048)+(7.002),
(I-300)+(2.048)+(7.003), (I-300)+(2.048)+(7.004),
(I-300)+(2.048)+(7.005), (I-300)+(2.048)+(7.006),
(I-300)+(2.048)+(9.001), (I-300)+(2.048)+(9.002),
(I-300)+(2.048)+(9.003), (I-300)+(2.048)+(9.004), (I-300)+(2.048)+(9.005), (I-300)+(2.048)+(9.006),
(I-300)+(2.048)+(9.007), (I-300)+(2.048)+(9.008),
(I-300)+(2.048)+(9.009), (I-300)+(2.048)+(14.001),
(I-300)+(2.048)+(14.002), (I-300)+(2.048)+(15.008),
(I-300)+(2.048)+(15.011), (I-300)+(2.048)+(15.012),
(I-300)+(2.048)+(15.016), (I-300)+(2.048)+(15.025),
(I-300)+(2.048)+(15.027), (I-300)+(2.048)+(15.047),
(I-300)+(2.048)+(15.063), (I-300)+(2.048)+(15.064),
(I-300)+(2.048)+(16.001), (I-300)+(2.048)+(16.002),
(I-300)+(2.048)+(16.003), (I-300)+(2.048)+(16.004),
(I-300)+(2.048)+(16.005), (I-300)+(2.048)+(16.006),
(I-300)+(2.048)+(16.007), (I-300)+(2.048)+(16.008),
(I-300)+(2.048)+(17.001), (I-300)+(2.048)+(17.002),
(I-300)+(2.048)+(17.003), (I-300)+(2.048)+(17.004),
(I-300)+(2.048)+(17.005), (I-300)+(2.048)+(17.006),
(I-300)+(2.048)+(17.007), (I-300)+(2.048)+(17.008),
(I-300)+(2.048)+(17.009), (I-300)+(2.048)+(17.010),
(I-300)+(2.048)+(17.011), (I-300)+(2.048)+(17.012),
(I-300)+(2.048)+(18.001), (I-300)+(2.049)+(3.001), (I-300)+(2.049)+(3.002),
(I-300)+(2.049)+(3.003), (I-300)+(2.049)+(3.004),
(I-300)+(2.049)+(3.005), (I-300)+(2.049)+(3.006),
(I-300)+(2.049)+(3.007), (I-300)+(2.049)+(3.008),
(I-300)+(2.049)+(3.009), (I-300)+(2.049)+(3.010),
(I-300)+(2.049)+(3.011), (I-300)+(2.049)+(3.012),
(I-300)+(2.049)+(3.013), (I-300)+(2.049)+(3.014),
(I-300)+(2.049)+(3.015), (I-300)+(2.049)+(3.016),
(I-300)+(2.049)+(3.017), (I-300)+(2.049)+(3.018),
(I-300)+(2.049)+(3.019), (I-300)+(2.049)+(3.020),
(I-300)+(2.049)+(3.021), (I-300)+(2.049)+(3.022),
(I-300)+(2.049)+(3.023), (I-300)+(2.049)+(3.024),
(I-300)+(2.049)+(3.025), (I-300)+(2.049)+(3.026),
(I-300)+(2.049)+(3.027), (I-300)+(2.049)+(3.028),
(I-300)+(2.049)+(3.029), (I-300)+(2.049)+(3.030),
(I-300)+(2.049)+(3.031), (I-300)+(2.049)+(5.001),
(I-300)+(2.049)+(5.002), (I-300)+(2.049)+(5.003),
(I-300)+(2.049)+(5.004), (I-300)+(2.049)+(5.005),
(I-300)+(2.049)+(5.006), (I-300)+(2.049)+(5.007),
(I-300)+(2.049)+(5.008), (I-300)+(2.049)+(5.009),
(I-300)+(2.049)+(5.010), (I-300)+(2.049)+(5.011),
(I-300)+(2.049)+(5.012), (I-300)+(2.049)+(5.013),
(I-300)+(2.049)+(5.014), (I-300)+(2.049)+(5.015),
(I-300)+(2.049)+(5.016), (I-300)+(2.049)+(5.017),
(I-300)+(2.049)+(5.018), (I-300)+(2.049)+(5.019),
(I-300)+(2.049)+(5.020), (I-300)+(2.049)+(5.021),
(I-300)+(2.049)+(5.022), (I-300)+(2.049)+(5.023),
(I-300)+(2.049)+(6.001), (I-300)+(2.049)+(6.002),
(I-300)+(2.049)+(6.003), (I-300)+(2.049)+(6.004),
(I-300)+(2.049)+(7.001), (I-300)+(2.049)+(7.002),
(I-300)+(2.049)+(7.003), (I-300)+(2.049)+(7.004),
(I-300)+(2.049)+(7.005), (I-300)+(2.049)+(7.006),
(I-300)+(2.049)+(9.001), (I-300)+(2.049)+(9.002),
(I-300)+(2.049)+(9.003), (I-300)+(2.049)+(9.004),
(I-300)+(2.049)+(9.005), (I-300)+(2.049)+(9.006),
(I-300)+(2.049)+(9.007), (I-300)+(2.049)+(9.008),
(I-300)+(2.049)+(9.009), (I-300)+(2.049)+(14.001),
(I-300)+(2.049)+(14.002), (I-300)+(2.049)+(15.008),
(I-300)+(2.049)+(15.011), (I-300)+(2.049)+(15.012),
(I-300)+(2.049)+(15.016), (I-300)+(2.049)+(15.025),
(I-300)+(2.049)+(15.027), (I-300)+(2.049)+(15.047),
(I-300)+(2.049)+(15.063), (I-300)+(2.049)+(15.064),
(I-300)+(2.049)+(16.001), (I-300)+(2.049)+(16.002),
(I-300)+(2.049)+(16.003), (I-300)+(2.049)+(16.004),
(I-300)+(2.049)+(16.005), (I-300)+(2.049)+(16.006),
(I-300)+(2.049)+(16.007), (I-300)+(2.049)+(16.008),
(I-300)+(2.049)+(17.001), (I-300)+(2.049)+(17.002),
(I-300)+(2.049)+(17.003), (I-300)+(2.049)+(17.004), (I-300)+(2.049)+(17.005), (I-300)+(2.049)+(17.006), (I-300)+(2.049)+(17.007), (I-300)+(2.049)+(17.008), (I-300)+(2.049)+(17.009), (I-300)+(2.049)+(17.010), (I-300)+(2.049)+(17.011), (I-300)+(2.049)+(17.012), (I-300)+(2.049)+(18.001), (I-300)+(2.050)+(3.001), (I-300)+(2.050)+(3.002), (I-300)+(2.050)+(3.003), (I-300)+(2.050)+(3.004), (I-300)+(2.050)+(3.005), (I-300)+(2.050)+(3.006), (I-300)+(2.050)+(3.007), (I-300)+(2.050)+(3.008), (I-300)+(2.050)+(3.009), (I-300)+(2.050)+(3.010), (I-300)+(2.050)+(3.011), (I-300)+(2.050)+(3.012), (I-300)+(2.050)+(3.013), (I-300)+(2.050)+(3.014), (I-300)+(2.050)+(3.015), (I-300)+(2.050)+(3.016), (I-300)+(2.050)+(3.017), (I-300)+(2.050)+(3.018), (I-300)+(2.050)+(3.019), (I-300)+(2.050)+(3.020), (I-300)+(2.050)+(3.021), (I-300)+(2.050)+(3.022), (I-300)+(2.050)+(3.023), (I-300)+(2.050)+(3.024), (I-300)+(2.050)+(3.025), (I-300)+(2.050)+(3.026), (I-300)+(2.050)+(3.027), (I-300)+(2.050)+(3.028), (I-300)+(2.050)+(3.029), (I-300)+(2.050)+(3.030), (I-300)+(2.050)+(3.031), (I-300)+(2.050)+(5.001), (I-300)+(2.050)+(5.002), (I-300)+(2.050)+(5.003), (I-300)+(2.050)+(5.004), (I-300)+(2.050)+(5.005), (I-300)+(2.050)+(5.006), (I-300)+(2.050)+(5.007), (I-300)+(2.050)+(5.008), (I-300)+(2.050)+(5.009), (I-300)+(2.050)+(5.010), (I-300)+(2.050)+(5.011), (I-300)+(2.050)+(5.012), (I-300)+(2.050)+(5.013), (I-300)+(2.050)+(5.014), (I-300)+(2.050)+(5.015), (I-300)+(2.050)+(5.016), (I-300)+(2.050)+(5.017), (I-300)+(2.050)+(5.018), (I-300)+(2.050)+(5.019), (I-300)+(2.050)+(5.020), (I-300)+(2.050)+(5.021), (I-300)+(2.050)+(5.022), (I-300)+(2.050)+(5.023), (I-300)+(2.050)+(6.001), (I-300)+(2.050)+(6.002), (I-300)+(2.050)+(6.003), (I-300)+(2.050)+(6.004), (I-300)+(2.050)+(7.001), (I-300)+(2.050)+(7.002), (I-300)+(2.050)+(7.003), (I-300)+(2.050)+(7.004), (I-300)+(2.050)+(7.005), (I-300)+(2.050)+(7.006), (I-300)+(2.050)+(9.001), (I-300)+(2.050)+(9.002), (I-300)+(2.050)+(9.003), (I-300)+(2.050)+(9.004), (I-300)+(2.050)+(9.005), (I-300)+(2.050)+(9.006), (I-300)+(2.050)+(9.007), (I-300)+(2.050)+(9.008), (I-300)+(2.050)+(9.009), (I-300)+(2.050)+(14.001), (I-300)+(2.050)+(14.002), (I-300)+(2.050)+(15.008), (I-300)+(2.050)+(15.011), (I-300)+(2.050)+(15.012), (I-300)+(2.050)+(15.016), (I-300)+(2.050)+(15.025), (I-300)+(2.050)+(15.027), (I-300)+(2.050)+(15.047), (I-300)+(2.050)+(15.063), (I-300)+(2.050)+(15.064), (I-300)+(2.050)+(16.001), (I-300)+(2.050)+(16.002), (I-300)+(2.050)+(16.003), (I-300)+(2.050)+(16.004), (I-300)+(2.050)+(16.005), (I-300)+(2.050)+(16.006), (I-300)+(2.050)+(16.007), (I-300)+(2.050)+(16.008), (I-300)+(2.050)+(17.001), (I-300)+(2.050)+(17.002), (I-300)+(2.050)+(17.003), (I-300)+(2.050)+(17.004), (I-300)+(2.050)+(17.005), (I-300)+(2.050)+(17.006), (I-300)+(2.050)+(17.007), (I-300)+(2.050)+(17.008), (I-300)+(2.050)+(17.009), (I-300)+(2.050)+(17.010), (I-300)+(2.050)+(17.011), (I-300)+(2.050)+(17.012), (I-300)+(2.050)+(18.001), (I-300)+(2.051)+(3.001), (I-300)+(2.051)+(3.002), (I-300)+(2.051)+(3.003), (I-300)+(2.051)+(3.004), (I-300)+(2.051)+(3.005), (I-300)+(2.051)+(3.006), (I-300)+(2.051)+(3.007), (I-300)+(2.051)+(3.008), (I-300)+(2.051)+(3.009), (I-300)+(2.051)+(3.010), (I-300)+(2.051)+(3.011), (I-300)+(2.051)+(3.012), (I-300)+(2.051)+(3.013), (I-300)+(2.051)+(3.014), (I-300)+(2.051)+(3.015), (I-300)+(2.051)+(3.016), (I-300)+(2.051)+(3.017), (I-300)+(2.051)+(3.018), (I-300)+(2.051)+(3.019), (I-300)+(2.051)+(3.020), (I-300)+(2.051)+(3.021), (I-300)+(2.051)+(3.022), (I-300)+(2.051)+(3.023), (I-300)+(2.051)+(3.024), (I-300)+(2.051)+(3.025), (I-300)+(2.051)+(3.026), (I-300)+(2.051)+(3.027), (I-300)+(2.051)+(3.028), (I-300)+(2.051)+(3.029), (I-300)+(2.051)+(3.030), (I-300)+(2.051)+(3.031), (I-300)+(2.051)+(5.001), (I-300)+(2.051)+(5.002), (I-300)+(2.051)+(5.003), (I-300)+(2.051)+(5.004), (I-300)+(2.051)+(5.005), (I-300)+(2.051)+(5.006), (I-300)+(2.051)+(5.007), (I-300)+(2.051)+(5.008), (I-300)+(2.051)+(5.009), (I-300)+(2.051)+(5.010), (I-300)+(2.051)+(5.011), (I-300)+(2.051)+(5.012), (I-300)+(2.051)+(5.013), (I-300)+(2.051)+(5.014), (I-300)+(2.051)+(5.015), (I-300)+(2.051)+(5.016), (I-300)+(2.051)+(5.017), (I-300)+(2.051)+(5.018), (I-300)+(2.051)+(5.019), (I-300)+(2.051)+(5.020), (I-300)+(2.051)+(5.021), (I-300)+(2.051)+(5.022), (I-300)+(2.051)+(5.023), (I-300)+(2.051)+(6.001), (I-300)+(2.051)+(6.002), (I-300)+(2.051)+(6.003), (I-300)+(2.051)+(6.004), (I-300)+(2.051)+(7.001), (I-300)+(2.051)+(7.002), (I-300)+(2.051)+(7.003), (I-300)+(2.051)+(7.004), (I-300)+(2.051)+(7.005), (I-300)+(2.051)+(7.006), (I-300)+(2.051)+(9.001), (I-300)+(2.051)+(9.002), (I-300)+(2.051)+(9.003), (I-300)+(2.051)+(9.004), (I-300)+(2.051)+(9.005), (I-300)+(2.051)+(9.006), (I-300)+(2.051)+(9.007), (I-300)+(2.051)+(9.008), (I-300)+(2.051)+(9.009), (I-300)+(2.051)+(14.001), (I-300)+(2.051)+(14.002), (I-300)+(2.051)+(15.008), (I-300)+(2.051)+(15.011), (I-300)+(2.051)+(15.012), (I-300)+(2.051)+(15.016), (I-300)+(2.051)+(15.025), (I-300)+(2.051)+(15.027), (I-300)+(2.051)+(15.047), (I-300)+(2.051)+(15.063), (I-300)+(2.051)+(15.064), (I-300)+(2.051)+(16.001), (I-300)+(2.051)+(16.002), (I-300)+(2.051)+(16.003), (I-300)+(2.051)+(16.004), (I-300)+(2.051)+(16.005), (I-300)+(2.051)+(16.006), (I-300)+(2.051)+(16.007), (I-300)+(2.051)+(16.008), (I-300)+(2.051)+(17.001), (I-300)+(2.051)+(17.002), (I-300)+(2.051)+(17.003), (I-300)+(2.051)+(17.004), (I-300)+(2.051)+(17.005), (I-300)+(2.051)+(17.006), (I-300)+(2.051)+(17.007), (I-300)+(2.051)+(17.008), (I-300)+(2.051)+(17.009), (I-300)+(2.051)+(17.010), (I-300)+(2.051)+(17.011), (I-300)+(2.051)+(17.012), (I-300)+(2.051)+(18.001), (I-300)+(2.052)+(3.001), (I-300)+(2.052)+(3.002), (I-300)+(2.052)+(3.003), (I-300)+(2.052)+(3.004), (I-300)+(2.052)+(3.005), (I-300)+(2.052)+(3.006), (I-300)+(2.052)+(3.007), (I-300)+(2.052)+(3.008), (I-300)+(2.052)+(3.009), (I-300)+(2.052)+(3.010), (I-300)+(2.052)+(3.011), (I-300)+(2.052)+(3.012), (I-300)+(2.052)+(3.013), (I-300)+(2.052)+(3.014), (I-300)+(2.052)+(3.015), (I-300)+(2.052)+(3.016), (I-300)+(2.052)+(3.017), (I-300)+(2.052)+(3.018), (I-300)+(2.052)+(3.019), (I-300)+(2.052)+(3.020), (I-300)+(2.052)+(3.021), (I-300)+(2.052)+(3.022), (I-300)+(2.052)+(3.023), (I-300)+(2.052)+(3.024), (I-300)+(2.052)+(3.025), (I-300)+(2.052)+(3.026), (I-300)+(2.052)+(3.027), (I-300)+(2.052)+(3.028), (I-300)+(2.052)+(3.029), (I-300)+(2.052)+(3.030), (I-300)+(2.052)+(3.031), (I-300)+(2.052)+(5.001), (I-300)+(2.052)+(5.002), (I-300)+(2.052)+(5.003), (I-300)+(2.052)+(5.004), (I-300)+(2.052)+(5.005), (I-300)+(2.052)+(5.006), (I-300)+(2.052)+(5.007), (I-300)+(2.052)+(5.008), (I-300)+(2.052)+(5.009), (I-300)+(2.052)+(5.010), (I-300)+(2.052)+(5.011), (I-300)+(2.052)+(5.012), (I-300)+(2.052)+(5.013), (I-300)+(2.052)+(5.014), (I-300)+(2.052)+(5.015), (I-300)+(2.052)+(5.016), (I-300)+(2.052)+(5.017), (I-300)+(2.052)+(5.018), (I-300)+(2.052)+(5.019), (I-300)+(2.052)+(5.020), (I-300)+(2.052)+(5.021), (I-300)+(2.052)+(5.022), (I-300)+(2.052)+(5.023), (I-300)+(2.052)+(6.001), (I-300)+(2.052)+(6.002), (I-300)+(2.052)+(6.003), (I-300)+(2.052)+(6.004), (I-300)+(2.052)+(7.001), (I-300)+(2.052)+(7.002), (I-300)+(2.052)+(7.003), (I-300)+(2.052)+(7.004), (I-300)+(2.052)+(7.005), (I-300)+(2.052)+(7.006), (I-300)+(2.052)+(9.001), (I-300)+(2.052)+(9.002), (I-300)+(2.052)+(9.003), (I-300)+(2.052)+(9.004), (I-300)+(2.052)+(9.005), (I-300)+(2.052)+(9.006), (I-300)+(2.052)+(9.007), (I-300)+(2.052)+(9.008), (I-300)+(2.052)+(9.009), (I-300)+(2.052)+(14.001), (I-300)+(2.052)+(14.002), (I-300)+(2.052)+(15.008), (I-300)+(2.052)+(15.011), (I-300)+(2.052)+(15.012), (I-300)+(2.052)+(15.016), (I-300)+(2.052)+(15.025), (I-300)+(2.052)+(15.027), (I-300)+(2.052)+(15.047), (I-300)+(2.052)+(15.063), (I-300)+(2.052)+(15.064), (I-300)+(2.052)+(16.001), (I-300)+(2.052)+(16.002), (I-300)+(2.052)+(16.003), (I-300)+(2.052)+(16.004), (I-300)+(2.052)+(16.005), (I-300)+(2.052)+(16.006), (I-300)+(2.052)+(16.007), (I-300)+(2.052)+(16.008), (I-300)+(2.052)+(17.001), (I-300)+(2.052)+(17.002), (I-300)+(2.052)+(17.003), (I-300)+(2.052)+(17.004), (I-300)+(2.052)+(17.005), (I-300)+(2.052)+(17.006), (I-300)+(2.052)+(17.007), (I-300)+(2.052)+(17.008), (I-300)+(2.052)+(17.009), (I-300)+(2.052)+(17.010), (I-300)+(2.052)+(17.011), (I-300)+(2.052)+(17.012), (I-300)+(2.052)+(18.001), (I-300)+(2.053)+(3.001), (I-300)+(2.053)+(3.002), (I-300)+(2.053)+(3.003), (I-300)+(2.053)+(3.004), (I-300)+(2.053)+(3.005), (I-300)+(2.053)+(3.006), (I-300)+(2.053)+(3.007), (I-300)+(2.053)+(3.008), (I-300)+(2.053)+(3.009), (I-300)+(2.053)+(3.010), (I-300)+(2.053)+(3.011), (I-300)+(2.053)+(3.012), (I-300)+(2.053)+(3.013), (I-300)+(2.053)+(3.014), (I-300)+(2.053)+(3.015), (I-300)+(2.053)+(3.016), (I-300)+(2.053)+(3.017), (I-300)+(2.053)+(3.018), (I-300)+(2.053)+(3.019), (I-300)+(2.053)+(3.020), (I-300)+(2.053)+(3.021), (I-300)+(2.053)+(3.022), (I-300)+(2.053)+(3.023), (I-300)+(2.053)+(3.024), (I-300)+(2.053)+(3.025), (I-300)+(2.053)+(3.026), (I-300)+(2.053)+(3.027), (I-300)+(2.053)+(3.028), (I-300)+(2.053)+(3.029), (I-300)+(2.053)+(3.030), (I-300)+(2.053)+(3.031), (I-300)+(2.053)+(5.001), (I-300)+(2.053)+(5.002), (I-300)+(2.053)+(5.003), (I-300)+(2.053)+(5.004), (I-300)+(2.053)+(5.005), (I-300)+(2.053)+(5.006), (I-300)+(2.053)+(5.007), (I-300)+(2.053)+(5.008), (I-300)+(2.053)+(5.009), (I-300)+(2.053)+(5.010), (I-300)+(2.053)+(5.011), (I-300)+(2.053)+(5.012), (I-300)+(2.053)+(5.013), (I-300)+(2.053)+(5.014), (I-300)+(2.053)+(5.015), (I-300)+(2.053)+(5.016), (I-300)+(2.053)+(5.017), (I-300)+(2.053)+(5.018), (I-300)+(2.053)+(5.019), (I-300)+(2.053)+(5.020), (I-300)+(2.053)+(5.021), (I-300)+(2.053)+(5.022), (I-300)+(2.053)+(5.023), (I-300)+(2.053)+(6.001), (I-300)+(2.053)+(6.002), (I-300)+(2.053)+(6.003), (I-300)+(2.053)+(6.004), (I-300)+(2.053)+(7.001), (I-300)+(2.053)+(7.002), (I-300)+(2.053)+(7.003), (I-300)+(2.053)+(7.004), (I-300)+(2.053)+(7.005), (I-300)+(2.053)+(7.006), (I-300)+(2.053)+(9.001), (I-300)+(2.053)+(9.002), (I-300)+(2.053)+(9.003), (I-300)+(2.053)+(9.004), (I-300)+(2.053)+(9.005), (I-300)+(2.053)+(9.006), (I-300)+(2.053)+(9.007), (I-300)+(2.053)+(9.008), (I-300)+(2.053)+(9.009), (I-300)+(2.053)+(14.001), (I-300)+(2.053)+(14.002), (I-300)+(2.053)+(15.008), (I-300)+(2.053)+(15.011), (I-300)+(2.053)+(15.012), (I-300)+(2.053)+(15.016), (I-300)+(2.053)+(15.025), (I-300)+(2.053)+(15.027), (I-300)+(2.053)+(15.047), (I-300)+(2.053)+(15.063), (I-300)+(2.053)+(15.064), (I-300)+(2.053)+(16.001), (I-300)+(2.053)+(16.002), (I-300)+(2.053)+(16.003), (I-300)+(2.053)+(16.004), (I-300)+(2.053)+(16.005), (I-300)+(2.053)+(16.006), (I-300)+(2.053)+(16.007), (I-300)+(2.053)+(16.008), (I-300)+(2.053)+(17.001), (I-300)+(2.053)+(17.002), (I-300)+(2.053)+(17.003), (I-300)+(2.053)+(17.004), (I-300)+(2.053)+(17.005), (I-300)+(2.053)+(17.006), (I-300)+(2.053)+(17.007), (I-300)+(2.053)+(17.008), (I-300)+(2.053)+(17.009), (I-300)+(2.053)+(17.010), (I-300)+(2.053)+(17.011), (I-300)+(2.053)+(17.012), (I-300)+(2.053)+(18.001), (I-300)+(2.054)+(3.001), (I-300)+(2.054)+(3.002), (I-300)+(2.054)+(3.003), (I-300)+(2.054)+(3.004), (I-300)+(2.054)+(3.005), (I-300)+(2.054)+(3.006), (I-300)+(2.054)+(3.007), (I-300)+(2.054)+(3.008), (I-300)+(2.054)+(3.009), (I-300)+(2.054)+(3.010), (I-300)+(2.054)+(3.011), (I-300)+(2.054)+(3.012), (I-300)+(2.054)+(3.013), (I-300)+(2.054)+(3.014), (I-300)+(2.054)+(3.015), (I-300)+(2.054)+(3.016), (I-300)+(2.054)+(3.017), (I-300)+(2.054)+(3.018), (I-300)+(2.054)+(3.019), (I-300)+(2.054)+(3.020), (I-300)+(2.054)+(3.021), (I-300)+(2.054)+(3.022), (I-300)+(2.054)+(3.023), (I-300)+(2.054)+(3.024), (I-300)+(2.054)+(3.025), (I-300)+(2.054)+(3.026), (I-300)+(2.054)+(3.027), (I-300)+(2.054)+(3.028), (I-300)+(2.054)+(3.029), (I-300)+(2.054)+(3.030), (I-300)+(2.054)+(3.031), (I-300)+(2.054)+(5.001), (I-300)+(2.054)+(5.002), (I-300)+(2.054)+(5.003), (I-300)+(2.054)+(5.004), (I-300)+(2.054)+(5.005), (I-300)+(2.054)+(5.006), (I-300)+(2.054)+(5.007), (I-300)+(2.054)+(5.008), (I-300)+(2.054)+(5.009), (I-300)+(2.054)+(5.010), (I-300)+(2.054)+(5.011), (I-300)+(2.054)+(5.012), (I-300)+(2.054)+(5.013), (I-300)+(2.054)+(5.014), (I-300)+(2.054)+(5.015), (I-300)+(2.054)+(5.016), (I-300)+(2.054)+(5.017), (I-300)+(2.054)+(5.018), (I-300)+(2.054)+(5.019), (I-300)+(2.054)+(5.020), (I-300)+(2.054)+(5.021), (I-300)+(2.054)+(5.022), (I-300)+(2.054)+(5.023), (I-300)+(2.054)+(6.001), (I-300)+(2.054)+(6.002), (I-300)+(2.054)+(6.003), (I-300)+(2.054)+(6.004), (I-300)+(2.054)+(7.001), (I-300)+(2.054)+(7.002), (I-300)+(2.054)+(7.003), (I-300)+(2.054)+(7.004), (I-300)+(2.054)+(7.005), (I-300)+(2.054)+(7.006), (I-300)+(2.054)+(9.001), (I-300)+(2.054)+(9.002), (I-300)+(2.054)+(9.003), (I-300)+(2.054)+(9.004), (I-300)+(2.054)+(9.005), (I-300)+(2.054)+(9.006), (I-300)+(2.054)+(9.007), (I-300)+(2.054)+(9.008), (I-300)+(2.054)+(9.009), (I-300)+(2.054)+(14.001), (I-300)+(2.054)+(14.002), (I-300)+(2.054)+(15.008), (I-300)+(2.054)+(15.011), (I-300)+(2.054)+(15.012), (I-300)+(2.054)+(15.016), (I-300)+(2.054)+(15.025), (I-300)+(2.054)+(15.027), (I-300)+(2.054)+(15.047), (I-300)+(2.054)+(15.063), (I-300)+(2.054)+(15.064), (I-300)+(2.054)+(16.001), (I-300)+(2.054)+(16.002), (I-300)+(2.054)+(16.003), (I-300)+(2.054)+(16.004), (I-300)+(2.054)+(16.005), (I-300)+(2.054)+(16.006), (I-300)+(2.054)+(16.007), (I-300)+(2.054)+(16.008), (I-300)+(2.054)+(17.001), (I-300)+(2.054)+(17.002), (I-300)+(2.054)+(17.003), (I-300)+(2.054)+(17.004), (I-300)+(2.054)+(17.005), (I-300)+(2.054)+(17.006), (I-300)+(2.054)+(17.007), (I-300)+(2.054)+(17.008), (I-300)+(2.054)+(17.009), (I-300)+(2.054)+(17.010), (I-300)+(2.054)+(17.011), (I-300)+(2.054)+(17.012), (I-300)+(2.054)+(18.001), (I-300)+(2.055)+(3.001), (I-300)+(2.055)+(3.002), (I-300)+(2.055)+(3.003), (I-300)+(2.055)+(3.004), (I-300)+(2.055)+(3.005), (I-300)+(2.055)+(3.006), (I-300)+(2.055)+(3.007), (I-300)+(2.055)+(3.008), (I-300)+(2.055)+(3.009), (I-300)+(2.055)+(3.010), (I-300)+(2.055)+(3.011), (I-300)+(2.055)+(3.012), (I-300)+(2.055)+(3.013), (I-300)+(2.055)+(3.014), (I-300)+(2.055)+(3.015), (I-300)+(2.055)+(3.016), (I-300)+(2.055)+(3.017), (I-300)+(2.055)+(3.018), (I-300)+(2.055)+(3.019), (I-300)+(2.055)+(3.020), (I-300)+(2.055)+(3.021), (I-300)+(2.055)+(3.022), (I-300)+(2.055)+(3.023), (I-300)+(2.055)+(3.024), (I-300)+(2.055)+(3.025), (I-300)+(2.055)+(3.026), (I-300)+(2.055)+(3.027), (I-300)+(2.055)+(3.028), (I-300)+(2.055)+(3.029), (I-300)+(2.055)+(3.030), (I-300)+(2.055)+(3.031), (I-300)+(2.055)+(5.001), (I-300)+(2.055)+(5.002), (I-300)+(2.055)+(5.003), (I-300)+(2.055)+(5.004), (I-300)+(2.055)+(5.005), (I-300)+(2.055)+(5.006), (I-300)+(2.055)+(5.007), (I-300)+(2.055)+(5.008), (I-300)+(2.055)+(5.009), (I-300)+(2.055)+(5.010), (I-300)+(2.055)+(5.011), (I-300)+(2.055)+(5.012), (I-300)+(2.055)+(5.013), (I-300)+(2.055)+(5.014), (I-300)+(2.055)+(5.015), (I-300)+(2.055)+(5.016), (I-300)+(2.055)+(5.017), (I-300)+(2.055)+(5.018), (I-300)+(2.055)+(5.019), (I-300)+(2.055)+(5.020), (I-300)+(2.055)+(5.021), (I-300)+(2.055)+(5.022), (I-300)+(2.055)+(5.023), (I-300)+(2.055)+(6.001), (I-300)+(2.055)+(6.002), (I-300)+(2.055)+(6.003), (I-300)+(2.055)+(6.004), (I-300)+(2.055)+(7.001), (I-300)+(2.055)+(7.002), (I-300)+(2.055)+(7.003), (I-300)+(2.055)+(7.004), (I-300)+(2.055)+(7.005), (I-300)+(2.055)+(7.006), (I-300)+(2.055)+(9.001), (I-300)+(2.055)+(9.002), (I-300)+(2.055)+(9.003), (I-300)+(2.055)+(9.004), (I-300)+(2.055)+(9.005), (I-300)+(2.055)+(9.006), (I-300)+(2.055)+(9.007), (I-300)+(2.055)+(9.008), (I-300)+(2.055)+(9.009), (I-300)+(2.055)+(14.001), (I-300)+(2.055)+(14.002), (I-300)+(2.055)+(15.008), (I-300)+(2.055)+(15.011), (I-300)+(2.055)+(15.012), (I-300)+(2.055)+(15.016), (I-300)+(2.055)+(15.025), (I-300)+(2.055)+(15.027), (I-300)+(2.055)+(15.047), (I-300)+(2.055)+(15.063), (I-300)+(2.055)+(15.064), (I-300)+(2.055)+(16.001), (I-300)+(2.055)+(16.002), (I-300)+(2.055)+(16.003), (I-300)+(2.055)+(16.004), (I-300)+(2.055)+(16.005), (I-300)+(2.055)+(16.006), (I-300)+(2.055)+(16.007), (I-300)+(2.055)+(16.008), (I-300)+(2.055)+(17.001), (I-300)+(2.055)+(17.002), (I-300)+(2.055)+(17.003), (I-300)+(2.055)+(17.004), (I-300)+(2.055)+(17.005), (I-300)+(2.055)+(17.006), (I-300)+(2.055)+(17.007), (I-300)+(2.055)+(17.008), (I-300)+(2.055)+(17.009), (I-300)+(2.055)+(17.010), (I-300)+(2.055)+(17.011), (I-300)+(2.055)+(17.012), (I-300)+(2.055)+(18.001), (I-300)+(2.056)+(3.001), (I-300)+(2.056)+(3.002), (I-300)+(2.056)+(3.003), (I-300)+(2.056)+(3.004), (I-300)+(2.056)+(3.005), (I-300)+(2.056)+(3.006), (I-300)+(2.056)+(3.007), (I-300)+(2.056)+(3.008), (I-300)+(2.056)+(3.009), (I-300)+(2.056)+(3.010), (I-300)+(2.056)+(3.011), (I-300)+(2.056)+(3.012), (I-300)+(2.056)+(3.013), (I-300)+(2.056)+(3.014), (I-300)+(2.056)+(3.015), (I-300)+(2.056)+(3.016), (I-300)+(2.056)+(3.017), (I-300)+(2.056)+(3.018), (I-300)+(2.056)+(3.019), (I-300)+(2.056)+(3.020), (I-300)+(2.056)+(3.021), (I-300)+(2.056)+(3.022), (I-300)+(2.056)+(3.023), (I-300)+(2.056)+(3.024), (I-300)+(2.056)+(3.025), (I-300)+(2.056)+(3.026), (I-300)+(2.056)+(3.027), (I-300)+(2.056)+(3.028), (I-300)+(2.056)+(3.029), (I-300)+(2.056)+(3.030), (I-300)+(2.056)+(3.031), (I-300)+(2.056)+(5.001), (I-300)+(2.056)+(5.002), (I-300)+(2.056)+(5.003), (I-300)+(2.056)+(5.004), (I-300)+(2.056)+(5.005), (I-300)+(2.056)+(5.006), (I-300)+(2.056)+(5.007), (I-300)+(2.056)+(5.008), (I-300)+(2.056)+(5.009), (I-300)+(2.056)+(5.010), (I-300)+(2.056)+(5.011), (I-300)+(2.056)+(5.012), (I-300)+(2.056)+(5.013), (I-300)+(2.056)+(5.014), (I-300)+(2.056)+(5.015), (I-300)+(2.056)+(5.016), (I-300)+(2.056)+(5.017), (I-300)+(2.056)+(5.018), (I-300)+(2.056)+(5.019), (I-300)+(2.056)+(5.020), (I-300)+(2.056)+(5.021), (I-300)+(2.056)+(5.022), (I-300)+(2.056)+(5.023), (I-300)+(2.056)+(6.001), (I-300)+(2.056)+(6.002), (I-300)+(2.056)+(6.003), (I-300)+(2.056)+(6.004), (I-300)+(2.056)+(7.001), (I-300)+(2.056)+(7.002), (I-300)+(2.056)+(7.003), (I-300)+(2.056)+(7.004), (I-300)+(2.056)+(7.005), (I-300)+(2.056)+(7.006), (I-300)+(2.056)+(9.001), (I-300)+(2.056)+(9.002), (I-300)+(2.056)+(9.003), (I-300)+(2.056)+(9.004), (I-300)+(2.056)+(9.005), (I-300)+(2.056)+(9.006), (I-300)+(2.056)+(9.007), (I-300)+(2.056)+(9.008), (I-300)+(2.056)+(9.009), (I-300)+(2.056)+(14.001), (I-300)+(2.056)+(14.002), (I-300)+(2.056)+(15.008), (I-300)+(2.056)+(15.011), (I-300)+(2.056)+(15.012), (I-300)+(2.056)+(15.016), (I-300)+(2.056)+(15.025), (I-300)+(2.056)+(15.027), (I-300)+(2.056)+(15.047), (I-300)+(2.056)+(15.063), (I-300)+(2.056)+(15.064), (I-300)+(2.056)+(16.001), (I-300)+(2.056)+(16.002), (I-300)+(2.056)+(16.003), (I-300)+(2.056)+(16.004), (I-300)+(2.056)+(16.005), (I-300)+(2.056)+(16.006), (I-300)+(2.056)+(16.007), (I-300)+(2.056)+(16.008), (I-300)+(2.056)+(17.001), (I-300)+(2.056)+(17.002), (I-300)+(2.056)+(17.003), (I-300)+(2.056)+(17.004), (I-300)+(2.056)+(17.005), (I-300)+(2.056)+(17.006), (I-300)+(2.056)+(17.007), (I-300)+(2.056)+(17.008), (I-300)+(2.056)+(17.009), (I-300)+(2.056)+(17.010), (I-300)+(2.056)+(17.011), (I-300)+(2.056)+(17.012), (I-300)+(2.056)+(18.001), (I-300)+(2.057)+(3.001), (I-300)+(2.057)+(3.002), (I-300)+(2.057)+(3.003), (I-300)+(2.057)+(3.004), (I-300)+(2.057)+(3.005), (I-300)+(2.057)+(3.006), (I-300)+(2.057)+(3.007), (I-300)+(2.057)+(3.008), (I-300)+(2.057)+(3.009), (I-300)+(2.057)+(3.010), (I-300)+(2.057)+(3.011), (I-300)+(2.057)+(3.012), (I-300)+(2.057)+(3.013), (I-300)+(2.057)+(3.014), (I-300)+(2.057)+(3.015), (I-300)+(2.057)+(3.016), (I-300)+(2.057)+(3.017), (I-300)+(2.057)+(3.018), (I-300)+(2.057)+(3.019), (I-300)+(2.057)+(3.020), (I-300)+(2.057)+(3.021), (I-300)+(2.057)+(3.022), (I-300)+(2.057)+(3.023), (I-300)+(2.057)+(3.024), (I-300)+(2.057)+(3.025), (I-300)+(2.057)+(3.026), (I-300)+(2.057)+(3.027), (I-300)+(2.057)+(3.028), (I-300)+(2.057)+(3.029), (I-300)+(2.057)+(3.030), (I-300)+(2.057)+(3.031), (I-300)+(2.057)+(5.001), (I-300)+(2.057)+(5.002), (I-300)+(2.057)+(5.003), (I-300)+(2.057)+(5.004), (I-300)+(2.057)+(5.005), (I-300)+(2.057)+(5.006), (I-300)+(2.057)+(5.007), (I-300)+(2.057)+(5.008), (I-300)+(2.057)+(5.009), (I-300)+(2.057)+(5.010), (I-300)+(2.057)+(5.011), (I-300)+(2.057)+(5.012), (I-300)+(2.057)+(5.013), (I-300)+(2.057)+(5.014), (I-300)+(2.057)+(5.015), (I-300)+(2.057)+(5.016), (I-300)+(2.057)+(5.017), (I-300)+(2.057)+(5.018), (I-300)+(2.057)+(5.019), (I-300)+(2.057)+(5.020), (I-300)+(2.057)+(5.021), (I-300)+(2.057)+(5.022), (I-300)+(2.057)+(5.023), (I-300)+(2.057)+(6.001), (I-300)+(2.057)+(6.002), (I-300)+(2.057)+(6.003), (I-300)+(2.057)+(6.004), (I-300)+(2.057)+(7.001), (I-300)+(2.057)+(7.002), (I-300)+(2.057)+(7.003), (I-300)+(2.057)+(7.004), (I-300)+(2.057)+(7.005), (I-300)+(2.057)+(7.006), (I-300)+(2.057)+(9.001), (I-300)+(2.057)+(9.002), (I-300)+(2.057)+(9.003), (I-300)+(2.057)+(9.004), (I-300)+(2.057)+(9.005), (I-300)+(2.057)+(9.006), (I-300)+(2.057)+(9.007), (I-300)+(2.057)+(9.008), (I-300)+(2.057)+(9.009), (I-300)+(2.057)+(14.001), (I-300)+(2.057)+(14.002), (I-300)+(2.057)+(15.008), (I-300)+(2.057)+(15.011), (I-300)+(2.057)+(15.012), (I-300)+(2.057)+(15.016), (I-300)+(2.057)+(15.025), (I-300)+(2.057)+(15.027), (I-300)+(2.057)+(15.047), (I-300)+(2.057)+(15.063), (I-300)+(2.057)+(15.064), (I-300)+(2.057)+(16.001), (I-300)+(2.057)+(16.002), (I-300)+(2.057)+(16.003), (I-300)+(2.057)+(16.004), (I-300)+(2.057)+(16.005), (I-300)+(2.057)+(16.006), (I-300)+(2.057)+(16.007), (I-300)+(2.057)+(16.008), (I-300)+(2.057)+(17.001), (I-300)+(2.057)+(17.002), (I-300)+(2.057)+(17.003), (I-300)+(2.057)+(17.004), (I-300)+(2.057)+(17.005), (I-300)+(2.057)+(17.006), (I-300)+(2.057)+(17.007), (I-300)+(2.057)+(17.008), (I-300)+(2.057)+(17.009), (I-300)+(2.057)+(17.010), (I-300)+(2.057)+(17.011), (I-300)+(2.057)+(17.012), (I-300)+(2.057)+(18.001), (I-300)+(2.058)+(3.001), (I-300)+(2.058)+(3.002), (I-300)+(2.058)+(3.003), (I-300)+(2.058)+(3.004), (I-300)+(2.058)+(3.005), (I-300)+(2.058)+(3.006), (I-300)+(2.058)+(3.007), (I-300)+(2.058)+(3.008), (I-300)+(2.058)+(3.009), (I-300)+(2.058)+(3.010), (I-300)+(2.058)+(3.011), (I-300)+(2.058)+(3.012), (I-300)+(2.058)+(3.013), (I-300)+(2.058)+(3.014), (I-300)+(2.058)+(3.015), (I-300)+(2.058)+(3.016), (I-300)+(2.058)+(3.017), (I-300)+(2.058)+(3.018), (I-300)+(2.058)+(3.019), (I-300)+(2.058)+(3.020), (I-300)+(2.058)+(3.021), (I-300)+(2.058)+(3.022), (I-300)+(2.058)+(3.023), (I-300)+(2.058)+(3.024), (I-300)+(2.058)+(3.025), (I-300)+(2.058)+(3.026), (I-300)+(2.058)+(3.027), (I-300)+(2.058)+(3.028), (I-300)+(2.058)+(3.029), (I-300)+(2.058)+(3.030), (I-300)+(2.058)+(3.031), (I-300)+(2.058)+(5.001), (I-300)+(2.058)+(5.002), (I-300)+(2.058)+(5.003), (I-300)+(2.058)+(5.004), (I-300)+(2.058)+(5.005), (I-300)+(2.058)+(5.006), (I-300)+(2.058)+(5.007), (I-300)+(2.058)+(5.008), (I-300)+(2.058)+(5.009), (I-300)+(2.058)+(5.010), (I-300)+(2.058)+(5.011), (I-300)+(2.058)+(5.012), (I-300)+(2.058)+(5.013), (I-300)+(2.058)+(5.014), (I-300)+(2.058)+(5.015), (I-300)+(2.058)+(5.016), (I-300)+(2.058)+(5.017), (I-300)+(2.058)+(5.018), (I-300)+(2.058)+(5.019), (I-300)+(2.058)+(5.020), (I-300)+(2.058)+(5.021), (I-300)+(2.058)+(5.022), (I-300)+(2.058)+(5.023), (I-300)+(2.058)+(6.001), (I-300)+(2.058)+(6.002), (I-300)+(2.058)+(6.003), (I-300)+(2.058)+(6.004), (I-300)+(2.058)+(7.001), (I-300)+(2.058)+(7.002), (I-300)+(2.058)+(7.003), (I-300)+(2.058)+(7.004), (I-300)+(2.058)+(7.005), (I-300)+(2.058)+(7.006), (I-300)+(2.058)+(9.001), (I-300)+(2.058)+(9.002), (I-300)+(2.058)+(9.003), (I-300)+(2.058)+(9.004), (I-300)+(2.058)+(9.005), (I-300)+(2.058)+(9.006), (I-300)+(2.058)+(9.007), (I-300)+(2.058)+(9.008), (I-300)+(2.058)+(9.009), (I-300)+(2.058)+(14.001), (I-300)+(2.058)+(14.002), (I-300)+(2.058)+(15.008), (I-300)+(2.058)+(15.011), (I-300)+(2.058)+(15.012), (I-300)+(2.058)+(15.016), (I-300)+(2.058)+(15.025), (I-300)+(2.058)+(15.027), (I-300)+(2.058)+(15.047), (I-300)+(2.058)+(15.063), (I-300)+(2.058)+(15.064), (I-300)+(2.058)+(16.001), (I-300)+(2.058)+(16.002), (I-300)+(2.058)+(16.003), (I-300)+(2.058)+(16.004), (I-300)+(2.058)+(16.005), (I-300)+(2.058)+(16.006), (I-300)+(2.058)+(16.007), (I-300)+(2.058)+(16.008), (I-300)+(2.058)+(17.001), (I-300)+(2.058)+(17.002), (I-300)+(2.058)+(17.003), (I-300)+(2.058)+(17.004), (I-300)+(2.058)+(17.005), (I-300)+(2.058)+(17.006), (I-300)+(2.058)+(17.007), (I-300)+(2.058)+(17.008), (I-300)+(2.058)+(17.009), (I-300)+(2.058)+(17.010), (I-300)+(2.058)+(17.011), (I-300)+(2.058)+(17.012), (I-300)+(2.058)+(18.001), (I-300)+(2.059)+(3.001), (I-300)+(2.059)+(3.002), (I-300)+(2.059)+(3.003), (I-300)+(2.059)+(3.004), (I-300)+(2.059)+(3.005), (I-300)+(2.059)+(3.006), (I-300)+(2.059)+(3.007), (I-300)+(2.059)+(3.008), (I-300)+(2.059)+(3.009), (I-300)+(2.059)+(3.010), (I-300)+(2.059)+(3.011), (I-300)+(2.059)+(3.012), (I-300)+(2.059)+(3.013), (I-300)+(2.059)+(3.014), (I-300)+(2.059)+(3.015), (I-300)+(2.059)+(3.016), (I-300)+(2.059)+(3.017), (I-300)+(2.059)+(3.018), (I-300)+(2.059)+(3.019), (I-300)+(2.059)+(3.020), (I-300)+(2.059)+(3.021), (I-300)+(2.059)+(3.022), (I-300)+(2.059)+(3.023), (I-300)+(2.059)+(3.024), (I-300)+(2.059)+(3.025), (I-300)+(2.059)+(3.026), (I-300)+(2.059)+(3.027), (I-300)+(2.059)+(3.028), (I-300)+(2.059)+(3.029), (I-300)+(2.059)+(3.030), (I-300)+(2.059)+(3.031), (I-300)+(2.059)+(5.001), (I-300)+(2.059)+(5.002), (I-300)+(2.059)+(5.003), (I-300)+(2.059)+(5.004), (I-300)+(2.059)+(5.005), (I-300)+(2.059)+(5.006), (I-300)+(2.059)+(5.007), (I-300)+(2.059)+(5.008), (I-300)+(2.059)+(5.009), (I-300)+(2.059)+(5.010), (I-300)+(2.059)+(5.011), (I-300)+(2.059)+(5.012), (I-300)+(2.059)+(5.013), (I-300)+(2.059)+(5.014), (I-300)+(2.059)+(5.015), (I-300)+(2.059)+(5.016), (I-300)+(2.059)+(5.017), (I-300)+(2.059)+(5.018), (I-300)+(2.059)+(5.019), (I-300)+(2.059)+(5.020), (I-300)+(2.059)+(5.021), (I-300)+(2.059)+(5.022), (I-300)+(2.059)+(5.023), (I-300)+(2.059)+(6.001), (I-300)+(2.059)+(6.002), (I-300)+(2.059)+(6.003), (I-300)+(2.059)+(6.004), (I-300)+(2.059)+(7.001), (I-300)+(2.059)+(7.002), (I-300)+(2.059)+(7.003), (I-300)+(2.059)+(7.004), (I-300)+(2.059)+(7.005), (I-300)+(2.059)+(7.006), (I-300)+(2.059)+(9.001), (I-300)+(2.059)+(9.002), (I-300)+(2.059)+(9.003), (I-300)+(2.059)+(9.004), (I-300)+(2.059)+(9.005), (I-300)+(2.059)+(9.006), (I-300)+(2.059)+(9.007), (I-300)+(2.059)+(9.008), (I-300)+(2.059)+(9.009), (I-300)+(2.059)+(14.001), (I-300)+(2.059)+(14.002), (I-300)+(2.059)+(15.008), (I-300)+(2.059)+(15.011), (I-300)+(2.059)+(15.012), (I-300)+(2.059)+(15.016), (I-300)+(2.059)+(15.025), (I-300)+(2.059)+(15.027), (I-300)+(2.059)+(15.047), (I-300)+(2.059)+(15.063), (I-300)+(2.059)+(15.064), (I-300)+(2.059)+(16.001), (I-300)+(2.059)+(16.002), (I-300)+(2.059)+(16.003), (I-300)+(2.059)+(16.004), (I-300)+(2.059)+(16.005), (I-300)+(2.059)+(16.006), (I-300)+(2.059)+(16.007), (I-300)+(2.059)+(16.008), (I-300)+(2.059)+(17.001), (I-300)+(2.059)+(17.002), (I-300)+(2.059)+(17.003), (I-300)+(2.059)+(17.004), (I-300)+(2.059)+(17.005), (I-300)+(2.059)+(17.006), (I-300)+(2.059)+(17.007), (I-300)+(2.059)+(17.008), (I-300)+(2.059)+(17.009), (I-300)+(2.059)+(17.010), (I-300)+(2.059)+(17.011), (I-300)+(2.059)+(17.012), (I-300)+(2.059)+(18.001), (I-300)+(3.001)+(3.025), (I-300)+(3.001)+(3.030), (I-300)+(3.001)+(3.031), (I-300)+(3.001)+(5.001), (I-300)+(3.001)+(5.002), (I-300)+(3.001)+(5.003), (I-300)+(3.001)+(5.004), (I-300)+(3.001)+(5.005), (I-300)+(3.001)+(5.006), (I-300)+(3.001)+(5.007), (I-300)+(3.001)+(5.008), (I-300)+(3.001)+(5.009), (I-300)+(3.001)+(5.010), (I-300)+(3.001)+(5.011), (I-300)+(3.001)+(5.012), (I-300)+(3.001)+(5.013), (I-300)+(3.001)+(5.014), (I-300)+(3.001)+(5.015), (I-300)+(3.001)+(5.016), (I-300)+(3.001)+(5.017), (I-300)+(3.001)+(5.018), (I-300)+(3.001)+(5.019), (I-300)+(3.001)+(5.020), (I-300)+(3.001)+(5.021), (I-300)+(3.001)+(5.022), (I-300)+(3.001)+(5.023), (I-300)+(3.001)+(6.001), (I-300)+(3.001)+(6.002), (I-300)+(3.001)+(6.003), (I-300)+(3.001)+(6.004), (I-300)+(3.001)+(7.001), (I-300)+(3.001)+(7.002), (I-300)+(3.001)+(7.003), (I-300)+(3.001)+(7.004), (I-300)+(3.001)+(7.005), (I-300)+(3.001)+(7.006), (I-300)+(3.001)+(9.001), (I-300)+(3.001)+(9.002), (I-300)+(3.001)+(9.003), (I-300)+(3.001)+(9.004), (I-300)+(3.001)+(9.005), (I-300)+(3.001)+(9.006), (I-300)+(3.001)+(9.007), (I-300)+(3.001)+(9.008), (I-300)+(3.001)+(9.009), (I-300)+(3.001)+(14.001), (I-300)+(3.001)+(14.002), (I-300)+(3.001)+(15.008), (I-300)+(3.001)+(15.011), (I-300)+(3.001)+(15.012), (I-300)+(3.001)+(15.016), (I-300)+(3.001)+(15.025), (I-300)+(3.001)+(15.027), (I-300)+(3.001)+(15.047), (I-300)+(3.001)+(15.063), (I-300)+(3.001)+(15.064), (I-300)+(3.001)+(16.001), (I-300)+(3.001)+(16.002), (I-300)+(3.001)+(16.003), (I-300)+(3.001)+(16.004), (I-300)+(3.001)+(16.005), (I-300)+(3.001)+(16.006), (I-300)+(3.001)+(16.007), (I-300)+(3.001)+(16.008), (I-300)+(3.001)+(17.001), (I-300)+(3.001)+(17.002), (I-300)+(3.001)+(17.003), (I-300)+(3.001)+(17.004), (I-300)+(3.001)+(17.005), (I-300)+(3.001)+(17.006), (I-300)+(3.001)+(17.007), (I-300)+(3.001)+(17.008), (I-300)+(3.001)+(17.009), (I-300)+(3.001)+(17.010), (I-300)+(3.001)+(17.011), (I-300)+(3.001)+(17.012), (I-300)+(3.001)+(18.001), (I-300)+(3.002)+(3.025), (I-300)+(3.002)+(3.030), (I-300)+(3.002)+(3.031), (I-300)+(3.002)+(5.001), (I-300)+(3.002)+(5.002), (I-300)+(3.002)+(5.003), (I-300)+(3.002)+(5.004), (I-300)+(3.002)+(5.005), (I-300)+(3.002)+(5.006), (I-300)+(3.002)+(5.007), (I-300)+(3.002)+(5.008), (I-300)+(3.002)+(5.009), (I-300)+(3.002)+(5.010), (I-300)+(3.002)+(5.011), (I-300)+(3.002)+(5.012), (I-300)+(3.002)+(5.013), (I-300)+(3.002)+(5.014), (I-300)+(3.002)+(5.015), (I-300)+(3.002)+(5.016), (I-300)+(3.002)+(5.017), (I-300)+(3.002)+(5.018), (I-300)+(3.002)+(5.019), (I-300)+(3.002)+(5.020), (I-300)+(3.002)+(5.021), (I-300)+(3.002)+(5.022), (I-300)+(3.002)+(5.023), (I-300)+(3.002)+(6.001), (I-300)+(3.002)+(6.002), (I-300)+(3.002)+(6.003), (I-300)+(3.002)+(6.004), (I-300)+(3.002)+(7.001), (I-300)+(3.002)+(7.002), (I-300)+(3.002)+(7.003), (I-300)+(3.002)+(7.004), (I-300)+(3.002)+(7.005), (I-300)+(3.002)+(7.006), (I-300)+(3.002)+(9.001), (I-300)+(3.002)+(9.002), (I-300)+(3.002)+(9.003), (I-300)+(3.002)+(9.004), (I-300)+(3.002)+(9.005), (I-300)+(3.002)+(9.006), (I-300)+(3.002)+(9.007), (I-300)+(3.002)+(9.008), (I-300)+(3.002)+(9.009), (I-300)+(3.002)+(14.001), (I-300)+(3.002)+(14.002), (I-300)+(3.002)+(15.008), (I-300)+(3.002)+(15.011), (I-300)+(3.002)+(15.012), (I-300)+(3.002)+(15.016), (I-300)+(3.002)+(15.025), (I-300)+(3.002)+(15.027), (I-300)+(3.002)+(15.047), (I-300)+(3.002)+(15.063), (I-300)+(3.002)+(15.064), (I-300)+(3.002)+(16.001), (I-300)+(3.002)+(16.002), (I-300)+(3.002)+(16.003), (I-300)+(3.002)+(16.004), (I-300)+(3.002)+(16.005), (I-300)+(3.002)+(16.006), (I-300)+(3.002)+(16.007), (I-300)+(3.002)+(16.008), (I-300)+(3.002)+(17.001), (I-300)+(3.002)+(17.002), (I-300)+(3.002)+(17.003), (I-300)+(3.002)+(17.004), (I-300)+(3.002)+(17.005), (I-300)+(3.002)+(17.006), (I-300)+(3.002)+(17.007), (I-300)+(3.002)+(17.008), (I-300)+(3.002)+(17.009), (I-300)+(3.002)+(17.010), (I-300)+(3.002)+(17.011), (I-300)+(3.002)+(17.012), (I-300)+(3.002)+(18.001), (I-300)+(3.003)+(3.025), (I-300)+(3.003)+(3.030), (I-300)+(3.003)+(3.031), (I-300)+(3.003)+(5.001), (I-300)+(3.003)+(5.002), (I-300)+(3.003)+(5.003), (I-300)+(3.003)+(5.004), (I-300)+(3.003)+(5.005), (I-300)+(3.003)+(5.006), (I-300)+(3.003)+(5.007), (I-300)+(3.003)+(5.008), (I-300)+(3.003)+(5.009), (I-300)+(3.003)+(5.010), (I-300)+(3.003)+(5.011), (I-300)+(3.003)+(5.012), (I-300)+(3.003)+(5.013), (I-300)+(3.003)+(5.014), (I-300)+(3.003)+(5.015), (I-300)+(3.003)+(5.016), (I-300)+(3.003)+(5.017), (I-300)+(3.003)+(5.018), (I-300)+(3.003)+(5.019), (I-300)+(3.003)+(5.020), (I-300)+(3.003)+(5.021), (I-300)+(3.003)+(5.022), (I-300)+(3.003)+(5.023), (I-300)+(3.003)+(6.001), (I-300)+(3.003)+(6.002), (I-300)+(3.003)+(6.003), (I-300)+(3.003)+(6.004), (I-300)+(3.003)+(7.001), (I-300)+(3.003)+(7.002), (I-300)+(3.003)+(7.003), (I-300)+(3.003)+(7.004), (I-300)+(3.003)+(7.005), (I-300)+(3.003)+(7.006), (I-300)+(3.003)+(9.001), (I-300)+(3.003)+(9.002), (I-300)+(3.003)+(9.003), (I-300)+(3.003)+(9.004), (I-300)+(3.003)+(9.005), (I-300)+(3.003)+(9.006), (I-300)+(3.003)+(9.007), (I-300)+(3.003)+(9.008), (I-300)+(3.003)+(9.009), (I-300)+(3.003)+(14.001), (I-300)+(3.003)+(14.002), (I-300)+(3.003)+(15.008), (I-300)+(3.003)+(15.011), (I-300)+(3.003)+(15.012), (I-300)+(3.003)+(15.016), (I-300)+(3.003)+(15.025), (I-300)+(3.003)+(15.027), (I-300)+(3.003)+(15.047), (I-300)+(3.003)+(15.063), (I-300)+(3.003)+(15.064), (I-300)+(3.003)+(16.001), (I-300)+(3.003)+(16.002), (I-300)+(3.003)+(16.003), (I-300)+(3.003)+(16.004), (I-300)+(3.003)+(16.005), (I-300)+(3.003)+(16.006), (I-300)+(3.003)+(16.007), (I-300)+(3.003)+(16.008), (I-300)+(3.003)+(17.001), (I-300)+(3.003)+(17.002), (I-300)+(3.003)+(17.003), (I-300)+(3.003)+(17.004), (I-300)+(3.003)+(17.005), (I-300)+(3.003)+(17.006), (I-300)+(3.003)+(17.007), (I-300)+(3.003)+(17.008), (I-300)+(3.003)+(17.009), (I-300)+(3.003)+(17.010), (I-300)+(3.003)+(17.011), (I-300)+(3.003)+(17.012), (I-300)+(3.003)+(18.001), (I-300)+(3.004)+(3.025), (I-300)+(3.004)+(3.030), (I-300)+(3.004)+(3.031), (I-300)+(3.004)+(5.001), (I-300)+(3.004)+(5.002), (I-300)+(3.004)+(5.003), (I-300)+(3.004)+(5.004), (I-300)+(3.004)+(5.005), (I-300)+(3.004)+(5.006), (I-300)+(3.004)+(5.007), (I-300)+(3.004)+(5.008), (I-300)+(3.004)+(5.009), (I-300)+(3.004)+(5.010), (I-300)+(3.004)+(5.011), (I-300)+(3.004)+(5.012), (I-300)+(3.004)+(5.013), (I-300)+(3.004)+(5.014), (I-300)+(3.004)+(5.015), (I-300)+(3.004)+(5.016), (I-300)+(3.004)+(5.017), (I-300)+(3.004)+(5.018), (I-300)+(3.004)+(5.019), (I-300)+(3.004)+(5.020), (I-300)+(3.004)+(5.021), (I-300)+(3.004)+(5.022), (I-300)+(3.004)+(5.023), (I-300)+(3.004)+(6.001), (I-300)+(3.004)+(6.002), (I-300)+(3.004)+(6.003), (I-300)+(3.004)+(6.004), (I-300)+(3.004)+(7.001), (I-300)+(3.004)+(7.002), (I-300)+(3.004)+(7.003), (I-300)+(3.004)+(7.004), (I-300)+(3.004)+(7.005), (I-300)+(3.004)+(7.006), (I-300)+(3.004)+(9.001), (I-300)+(3.004)+(9.002), (I-300)+(3.004)+(9.003), (I-300)+(3.004)+(9.004), (I-300)+(3.004)+(9.005), (I-300)+(3.004)+(9.006), (I-300)+(3.004)+(9.007), (I-300)+(3.004)+(9.008), (I-300)+(3.004)+(9.009), (I-300)+(3.004)+(14.001), (I-300)+(3.004)+(14.002), (I-300)+(3.004)+(15.008), (I-300)+(3.004)+(15.011), (I-300)+(3.004)+(15.012), (I-300)+(3.004)+(15.016), (I-300)+(3.004)+(15.025), (I-300)+(3.004)+(15.027), (I-300)+(3.004)+(15.047), (I-300)+(3.004)+(15.063), (I-300)+(3.004)+(15.064), (I-300)+(3.004)+(16.001), (I-300)+(3.004)+(16.002), (I-300)+(3.004)+(16.003), (I-300)+(3.004)+(16.004), (I-300)+(3.004)+(16.005), (I-300)+(3.004)+(16.006), (I-300)+(3.004)+(16.007), (I-300)+(3.004)+(16.008), (I-300)+(3.004)+(17.001), (I-300)+(3.004)+(17.002), (I-300)+(3.004)+(17.003), (I-300)+(3.004)+(17.004), (I-300)+(3.004)+(17.005), (I-300)+(3.004)+(17.006), (I-300)+(3.004)+(17.007), (I-300)+(3.004)+(17.008), (I-300)+(3.004)+(17.009), (I-300)+(3.004)+(17.010), (I-300)+(3.004)+(17.011), (I-300)+(3.004)+(17.012), (I-300)+(3.004)+(18.001), (I-300)+(3.005)+(3.025), (I-300)+(3.005)+(3.030), (I-300)+(3.005)+(3.031), (I-300)+(3.005)+(5.001), (I-300)+(3.005)+(5.002), (I-300)+(3.005)+(5.003), (I-300)+(3.005)+(5.004), (I-300)+(3.005)+(5.005), (I-300)+(3.005)+(5.006), (I-300)+(3.005)+(5.007), (I-300)+(3.005)+(5.008), (I-300)+(3.005)+(5.009), (I-300)+(3.005)+(5.010), (I-300)+(3.005)+(5.011), (I-300)+(3.005)+(5.012), (I-300)+(3.005)+(5.013), (I-300)+(3.005)+(5.014), (I-300)+(3.005)+(5.015), (I-300)+(3.005)+(5.016), (I-300)+(3.005)+(5.017), (I-300)+(3.005)+(5.018), (I-300)+(3.005)+(5.019), (I-300)+(3.005)+(5.020), (I-300)+(3.005)+(5.021), (I-300)+(3.005)+(5.022), (I-300)+(3.005)+(5.023), (I-300)+(3.005)+(6.001), (I-300)+(3.005)+(6.002), (I-300)+(3.005)+(6.003), (I-300)+(3.005)+(6.004), (I-300)+(3.005)+(7.001), (I-300)+(3.005)+(7.002), (I-300)+(3.005)+(7.003), (I-300)+(3.005)+(7.004), (I-300)+(3.005)+(7.005), (I-300)+(3.005)+(7.006), (I-300)+(3.005)+(9.001), (I-300)+(3.005)+(9.002), (I-300)+(3.005)+(9.003), (I-300)+(3.005)+(9.004), (I-300)+(3.005)+(9.005), (I-300)+(3.005)+(9.006), (I-300)+(3.005)+(9.007), (I-300)+(3.005)+(9.008), (I-300)+(3.005)+(9.009), (I-300)+(3.005)+(14.001), (I-300)+(3.005)+(14.002), (I-300)+(3.005)+(15.008), (I-300)+(3.005)+(15.011), (I-300)+(3.005)+(15.012), (I-300)+(3.005)+(15.016), (I-300)+(3.005)+(15.025), (I-300)+(3.005)+(15.027), (I-300)+(3.005)+(15.047), (I-300)+(3.005)+(15.063), (I-300)+(3.005)+(15.064), (I-300)+(3.005)+(16.001), (I-300)+(3.005)+(16.002), (I-300)+(3.005)+(16.003), (I-300)+(3.005)+(16.004), (I-300)+(3.005)+(16.005), (I-300)+(3.005)+(16.006), (I-300)+(3.005)+(16.007), (I-300)+(3.005)+(16.008), (I-300)+(3.005)+(17.001), (I-300)+(3.005)+(17.002), (I-300)+(3.005)+(17.003), (I-300)+(3.005)+(17.004), (I-300)+(3.005)+(17.005), (I-300)+(3.005)+(17.006), (I-300)+(3.005)+(17.007), (I-300)+(3.005)+(17.008), (I-300)+(3.005)+(17.009), (I-300)+(3.005)+(17.010), (I-300)+(3.005)+(17.011), (I-300)+(3.005)+(17.012), (I-300)+(3.005)+(18.001), (I-300)+(3.006)+(3.025), (I-300)+(3.006)+(3.030), (I-300)+(3.006)+(3.031), (I-300)+(3.006)+(5.001), (I-300)+(3.006)+(5.002), (I-300)+(3.006)+(5.003), (I-300)+(3.006)+(5.004), (I-300)+(3.006)+(5.005), (I-300)+(3.006)+(5.006), (I-300)+(3.006)+(5.007), (I-300)+(3.006)+(5.008), (I-300)+(3.006)+(5.009), (I-300)+(3.006)+(5.010), (I-300)+(3.006)+(5.011), (I-300)+(3.006)+(5.012), (I-300)+(3.006)+(5.013), (I-300)+(3.006)+(5.014), (I-300)+(3.006)+(5.015), (I-300)+(3.006)+(5.016), (I-300)+(3.006)+(5.017), (I-300)+(3.006)+(5.018), (I-300)+(3.006)+(5.019), (I-300)+(3.006)+(5.020), (I-300)+(3.006)+(5.021), (I-300)+(3.006)+(5.022), (I-300)+(3.006)+(5.023), (I-300)+(3.006)+(6.001), (I-300)+(3.006)+(6.002), (I-300)+(3.006)+(6.003), (I-300)+(3.006)+(6.004), (I-300)+(3.006)+(7.001), (I-300)+(3.006)+(7.002), (I-300)+(3.006)+(7.003), (I-300)+(3.006)+(7.004), (I-300)+(3.006)+(7.005), (I-300)+(3.006)+(7.006), (I-300)+(3.006)+(9.001), (I-300)+(3.006)+(9.002), (I-300)+(3.006)+(9.003), (I-300)+(3.006)+(9.004), (I-300)+(3.006)+(9.005), (I-300)+(3.006)+(9.006), (I-300)+(3.006)+(9.007), (I-300)+(3.006)+(9.008), (I-300)+(3.006)+(9.009), (I-300)+(3.006)+(14.001), (I-300)+(3.006)+(14.002), (I-300)+(3.006)+(15.008), (I-300)+(3.006)+(15.011), (I-300)+(3.006)+(15.012), (I-300)+(3.006)+(15.016), (I-300)+(3.006)+(15.025), (I-300)+(3.006)+(15.027), (I-300)+(3.006)+(15.047), (I-300)+(3.006)+(15.063), (I-300)+(3.006)+(15.064), (I-300)+(3.006)+(16.001), (I-300)+(3.006)+(16.002), (I-300)+(3.006)+(16.003), (I-300)+(3.006)+(16.004), (I-300)+(3.006)+(16.005), (I-300)+(3.006)+(16.006), (I-300)+(3.006)+(16.007), (I-300)+(3.006)+(16.008), (I-300)+(3.006)+(17.001), (I-300)+(3.006)+(17.002), (I-300)+(3.006)+(17.003), (I-300)+(3.006)+(17.004), (I-300)+(3.006)+(17.005), (I-300)+(3.006)+(17.006), (I-300)+(3.006)+(17.007), (I-300)+(3.006)+(17.008), (I-300)+(3.006)+(17.009), (I-300)+(3.006)+(17.010), (I-300)+(3.006)+(17.011), (I-300)+(3.006)+(17.012), (I-300)+(3.006)+(18.001), (I-300)+(3.007)+(3.025), (I-300)+(3.007)+(3.030), (I-300)+(3.007)+(3.031), (I-300)+(3.007)+(5.001), (I-300)+(3.007)+(5.002), (I-300)+(3.007)+(5.003), (I-300)+(3.007)+(5.004), (I-300)+(3.007)+(5.005), (I-300)+(3.007)+(5.006), (I-300)+(3.007)+(5.007), (I-300)+(3.007)+(5.008), (I-300)+(3.007)+(5.009), (I-300)+(3.007)+(5.010), (I-300)+(3.007)+(5.011), (I-300)+(3.007)+(5.012), (I-300)+(3.007)+(5.013), (I-300)+(3.007)+(5.014), (I-300)+(3.007)+(5.015), (I-300)+(3.007)+(5.016), (I-300)+(3.007)+(5.017), (I-300)+(3.007)+(5.018), (I-300)+(3.007)+(5.019), (I-300)+(3.007)+(5.020), (I-300)+(3.007)+(5.021), (I-300)+(3.007)+(5.022), (I-300)+(3.007)+(5.023), (I-300)+(3.007)+(6.001), (I-300)+(3.007)+(6.002), (I-300)+(3.007)+(6.003), (I-300)+(3.007)+(6.004), (I-300)+(3.007)+(7.001), (I-300)+(3.007)+(7.002), (I-300)+(3.007)+(7.003), (I-300)+(3.007)+(7.004), (I-300)+(3.007)+(7.005), (I-300)+(3.007)+(7.006), (I-300)+(3.007)+(9.001), (I-300)+(3.007)+(9.002), (I-300)+(3.007)+(9.003), (I-300)+(3.007)+(9.004), (I-300)+(3.007)+(9.005), (I-300)+(3.007)+(9.006), (I-300)+(3.007)+(9.007), (I-300)+(3.007)+(9.008), (I-300)+(3.007)+(9.009), (I-300)+(3.007)+(14.001), (I-300)+(3.007)+(14.002), (I-300)+(3.007)+(15.008), (I-300)+(3.007)+(15.011), (I-300)+(3.007)+(15.012), (I-300)+(3.007)+(15.016), (I-300)+(3.007)+(15.025), (I-300)+(3.007)+(15.027), (I-300)+(3.007)+(15.047), (I-300)+(3.007)+(15.063), (I-300)+(3.007)+(15.064), (I-300)+(3.007)+(16.001), (I-300)+(3.007)+(16.002), (I-300)+(3.007)+(16.003), (I-300)+(3.007)+(16.004), (I-300)+(3.007)+(16.005), (I-300)+(3.007)+(16.006), (I-300)+(3.007)+(16.007), (I-300)+(3.007)+(16.008), (I-300)+(3.007)+(17.001), (I-300)+(3.007)+(17.002), (I-300)+(3.007)+(17.003), (I-300)+(3.007)+(17.004), (I-300)+(3.007)+(17.005), (I-300)+(3.007)+(17.006), (I-300)+(3.007)+(17.007), (I-300)+(3.007)+(17.008), (I-300)+(3.007)+(17.009), (I-300)+(3.007)+(17.010), (I-300)+(3.007)+(17.011), (I-300)+(3.007)+(17.012), (I-300)+(3.007)+(18.001), (I-300)+(3.008)+(3.025), (I-300)+(3.008)+(3.030), (I-300)+(3.008)+(3.031), (I-300)+(3.008)+(5.001), (I-300)+(3.008)+(5.002), (I-300)+(3.008)+(5.003), (I-300)+(3.008)+(5.004), (I-300)+(3.008)+(5.005), (I-300)+(3.008)+(5.006), (I-300)+(3.008)+(5.007), (I-300)+(3.008)+(5.008), (I-300)+(3.008)+(5.009), (I-300)+(3.008)+(5.010), (I-300)+(3.008)+(5.011), (I-300)+(3.008)+(5.012), (I-300)+(3.008)+(5.013), (I-300)+(3.008)+(5.014), (I-300)+(3.008)+(5.015), (I-300)+(3.008)+(5.016), (I-300)+(3.008)+(5.017), (I-300)+(3.008)+(5.018), (I-300)+(3.008)+(5.019), (I-300)+(3.008)+(5.020), (I-300)+(3.008)+(5.021), (I-300)+(3.008)+(5.022), (I-300)+(3.008)+(5.023), (I-300)+(3.008)+(6.001), (I-300)+(3.008)+(6.002), (I-300)+(3.008)+(6.003), (I-300)+(3.008)+(6.004), (I-300)+(3.008)+(7.001), (I-300)+(3.008)+(7.002), (I-300)+(3.008)+(7.003), (I-300)+(3.008)+(7.004), (I-300)+(3.008)+(7.005), (I-300)+(3.008)+(7.006), (I-300)+(3.008)+(9.001), (I-300)+(3.008)+(9.002), (I-300)+(3.008)+(9.003), (I-300)+(3.008)+(9.004), (I-300)+(3.008)+(9.005), (I-300)+(3.008)+(9.006), (I-300)+(3.008)+(9.007), (I-300)+(3.008)+(9.008), (I-300)+(3.008)+(9.009), (I-300)+(3.008)+(14.001), (I-300)+(3.008)+(14.002), (I-300)+(3.008)+(15.008), (I-300)+(3.008)+(15.011), (I-300)+(3.008)+(15.012), (I-300)+(3.008)+(15.016), (I-300)+(3.008)+(15.025), (I-300)+(3.008)+(15.027), (I-300)+(3.008)+(15.047), (I-300)+(3.008)+(15.063), (I-300)+(3.008)+(15.064), (I-300)+(3.008)+(16.001), (I-300)+(3.008)+(16.002), (I-300)+(3.008)+(16.003), (I-300)+(3.008)+(16.004), (I-300)+(3.008)+(16.005), (I-300)+(3.008)+(16.006), (I-300)+(3.008)+(16.007), (I-300)+(3.008)+(16.008), (I-300)+(3.008)+(17.001), (I-300)+(3.008)+(17.002), (I-300)+(3.008)+(17.003), (I-300)+(3.008)+(17.004), (I-300)+(3.008)+(17.005), (I-300)+(3.008)+(17.006), (I-300)+(3.008)+(17.007), (I-300)+(3.008)+(17.008), (I-300)+(3.008)+(17.009), (I-300)+(3.008)+(17.010), (I-300)+(3.008)+(17.011), (I-300)+(3.008)+(17.012), (I-300)+(3.008)+(18.001), (I-300)+(3.009)+(3.025), (I-300)+(3.009)+(3.030), (I-300)+(3.009)+(3.031), (I-300)+(3.009)+(5.001), (I-300)+(3.009)+(5.002), (I-300)+(3.009)+(5.003), (I-300)+(3.009)+(5.004), (I-300)+(3.009)+(5.005), (I-300)+(3.009)+(5.006), (I-300)+(3.009)+(5.007), (I-300)+(3.009)+(5.008), (I-300)+(3.009)+(5.009), (I-300)+(3.009)+(5.010), (I-300)+(3.009)+(5.011), (I-300)+(3.009)+(5.012), (I-300)+(3.009)+(5.013), (I-300)+(3.009)+(5.014), (I-300)+(3.009)+(5.015), (I-300)+(3.009)+(5.016), (I-300)+(3.009)+(5.017), (I-300)+(3.009)+(5.018), (I-300)+(3.009)+(5.019), (I-300)+(3.009)+(5.020), (I-300)+(3.009)+(5.021), (I-300)+(3.009)+(5.022), (I-300)+(3.009)+(5.023), (I-300)+(3.009)+(6.001), (I-300)+(3.009)+(6.002), (I-300)+(3.009)+(6.003), (I-300)+(3.009)+(6.004), (I-300)+(3.009)+(7.001), (I-300)+(3.009)+(7.002), (I-300)+(3.009)+(7.003), (I-300)+(3.009)+(7.004), (I-300)+(3.009)+(7.005), (I-300)+(3.009)+(7.006), (I-300)+(3.009)+(9.001), (I-300)+(3.009)+(9.002), (I-300)+(3.009)+(9.003), (I-300)+(3.009)+(9.004), (I-300)+(3.009)+(9.005), (I-300)+(3.009)+(9.006), (I-300)+(3.009)+(9.007), (I-300)+(3.009)+(9.008), (I-300)+(3.009)+(9.009), (I-300)+(3.009)+(14.001), (I-300)+(3.009)+(14.002), (I-300)+(3.009)+(15.008), (I-300)+(3.009)+(15.011), (I-300)+(3.009)+(15.012), (I-300)+(3.009)+(15.016), (I-300)+(3.009)+(15.025), (I-300)+(3.009)+(15.027), (I-300)+(3.009)+(15.047), (I-300)+(3.009)+(15.063), (I-300)+(3.009)+(15.064), (I-300)+(3.009)+(16.001), (I-300)+(3.009)+(16.002), (I-300)+(3.009)+(16.003), (I-300)+(3.009)+(16.004), (I-300)+(3.009)+(16.005), (I-300)+(3.009)+(16.006), (I-300)+(3.009)+(16.007), (I-300)+(3.009)+(16.008), (I-300)+(3.009)+(17.001), (I-300)+(3.009)+(17.002), (I-300)+(3.009)+(17.003), (I-300)+(3.009)+(17.004), (I-300)+(3.009)+(17.005), (I-300)+(3.009)+(17.006), (I-300)+(3.009)+(17.007), (I-300)+(3.009)+(17.008), (I-300)+(3.009)+(17.009), (I-300)+(3.009)+(17.010), (I-300)+(3.009)+(17.011), (I-300)+(3.009)+(17.012), (I-300)+(3.009)+(18.001), (I-300)+(3.010)+(3.025), (I-300)+(3.010)+(3.030), (I-300)+(3.010)+(3.031), (I-300)+(3.010)+(5.001), (I-300)+(3.010)+(5.002), (I-300)+(3.010)+(5.003), (I-300)+(3.010)+(5.004), (I-300)+(3.010)+(5.005), (I-300)+(3.010)+(5.006), (I-300)+(3.010)+(5.007), (I-300)+(3.010)+(5.008), (I-300)+(3.010)+(5.009), (I-300)+(3.010)+(5.010), (I-300)+(3.010)+(5.011), (I-300)+(3.010)+(5.012), (I-300)+(3.010)+(5.013), (I-300)+(3.010)+(5.014), (I-300)+(3.010)+(5.015), (I-300)+(3.010)+(5.016), (I-300)+(3.010)+(5.017), (I-300)+(3.010)+(5.018), (I-300)+(3.010)+(5.019), (I-300)+(3.010)+(5.020), (I-300)+(3.010)+(5.021), (I-300)+(3.010)+(5.022), (I-300)+(3.010)+(5.023), (I-300)+(3.010)+(6.001), (I-300)+(3.010)+(6.002), (I-300)+(3.010)+(6.003), (I-300)+(3.010)+(6.004), (I-300)+(3.010)+(7.001), (I-300)+(3.010)+(7.002), (I-300)+(3.010)+(7.003), (I-300)+(3.010)+(7.004), (I-300)+(3.010)+(7.005), (I-300)+(3.010)+(7.006), (I-300)+(3.010)+(9.001), (I-300)+(3.010)+(9.002), (I-300)+(3.010)+(9.003), (I-300)+(3.010)+(9.004), (I-300)+(3.010)+(9.005), (I-300)+(3.010)+(9.006), (I-300)+(3.010)+(9.007), (I-300)+(3.010)+(9.008), (I-300)+(3.010)+(9.009), (I-300)+(3.010)+(14.001), (I-300)+(3.010)+(14.002), (I-300)+(3.010)+(15.008), (I-300)+(3.010)+(15.011), (I-300)+(3.010)+(15.012), (I-300)+(3.010)+(15.016), (I-300)+(3.010)+(15.025), (I-300)+(3.010)+(15.027), (I-300)+(3.010)+(15.047), (I-300)+(3.010)+(15.063), (I-300)+(3.010)+(15.064), (I-300)+(3.010)+(16.001), (I-300)+(3.010)+(16.002), (I-300)+(3.010)+(16.003), (I-300)+(3.010)+(16.004), (I-300)+(3.010)+(16.005), (I-300)+(3.010)+(16.006), (I-300)+(3.010)+(16.007), (I-300)+(3.010)+(16.008), (I-300)+(3.010)+(17.001), (I-300)+(3.010)+(17.002), (I-300)+(3.010)+(17.003), (I-300)+(3.010)+(17.004), (I-300)+(3.010)+(17.005), (I-300)+(3.010)+(17.006), (I-300)+(3.010)+(17.007), (I-300)+(3.010)+(17.008), (I-300)+(3.010)+(17.009), (I-300)+(3.010)+(17.010), (I-300)+(3.010)+(17.011), (I-300)+(3.010)+(17.012), (I-300)+(3.010)+(18.001), (I-300)+(3.011)+(3.025), (I-300)+(3.011)+(3.030), (I-300)+(3.011)+(3.031), (I-300)+(3.011)+(5.001), (I-300)+(3.011)+(5.002), (I-300)+(3.011)+(5.003), (I-300)+(3.011)+(5.004), (I-300)+(3.011)+(5.005), (I-300)+(3.011)+(5.006), (I-300)+(3.011)+(5.007), (I-300)+(3.011)+(5.008), (I-300)+(3.011)+(5.009), (I-300)+(3.011)+(5.010), (I-300)+(3.011)+(5.011), (I-300)+(3.011)+(5.012), (I-300)+(3.011)+(5.013), (I-300)+(3.011)+(5.014), (I-300)+(3.011)+(5.015), (I-300)+(3.011)+(5.016), (I-300)+(3.011)+(5.017), (I-300)+(3.011)+(5.018), (I-300)+(3.011)+(5.019), (I-300)+(3.011)+(5.020), (I-300)+(3.011)+(5.021), (I-300)+(3.011)+(5.022), (I-300)+(3.011)+(5.023), (I-300)+(3.011)+(6.001), (I-300)+(3.011)+(6.002), (I-300)+(3.011)+(6.003), (I-300)+(3.011)+(6.004), (I-300)+(3.011)+(7.001), (I-300)+(3.011)+(7.002), (I-300)+(3.011)+(7.003), (I-300)+(3.011)+(7.004), (I-300)+(3.011)+(7.005), (I-300)+(3.011)+(7.006), (I-300)+(3.011)+(9.001), (I-300)+(3.011)+(9.002), (I-300)+(3.011)+(9.003), (I-300)+(3.011)+(9.004), (I-300)+(3.011)+(9.005), (I-300)+(3.011)+(9.006), (I-300)+(3.011)+(9.007), (I-300)+(3.011)+(9.008), (I-300)+(3.011)+(9.009), (I-300)+(3.011)+(14.001), (I-300)+(3.011)+(14.002), (I-300)+(3.011)+(15.008), (I-300)+(3.011)+(15.011), (I-300)+(3.011)+(15.012), (I-300)+(3.011)+(15.016), (I-300)+(3.011)+(15.025), (I-300)+(3.011)+(15.027), (I-300)+(3.011)+(15.047), (I-300)+(3.011)+(15.063), (I-300)+(3.011)+(15.064), (I-300)+(3.011)+(16.001), (I-300)+(3.011)+(16.002), (I-300)+(3.011)+(16.003), (I-300)+(3.011)+(16.004), (I-300)+(3.011)+(16.005), (I-300)+(3.011)+(16.006), (I-300)+(3.011)+(16.007), (I-300)+(3.011)+(16.008), (I-300)+(3.011)+(17.001), (I-300)+(3.011)+(17.002), (I-300)+(3.011)+(17.003), (I-300)+(3.011)+(17.004), (I-300)+(3.011)+(17.005), (I-300)+(3.011)+(17.006), (I-300)+(3.011)+(17.007), (I-300)+(3.011)+(17.008), (I-300)+(3.011)+(17.009), (I-300)+(3.011)+(17.010), (I-300)+(3.011)+(17.011), (I-300)+(3.011)+(17.012), (I-300)+(3.011)+(18.001), (I-300)+(3.012)+(3.025), (I-300)+(3.012)+(3.030), (I-300)+(3.012)+(3.031), (I-300)+(3.012)+(5.001), (I-300)+(3.012)+(5.002), (I-300)+(3.012)+(5.003), (I-300)+(3.012)+(5.004), (I-300)+(3.012)+(5.005), (I-300)+(3.012)+(5.006), (I-300)+(3.012)+(5.007), (I-300)+(3.012)+(5.008), (I-300)+(3.012)+(5.009), (I-300)+(3.012)+(5.010), (I-300)+(3.012)+(5.011), (I-300)+(3.012)+(5.012), (I-300)+(3.012)+(5.013), (I-300)+(3.012)+(5.014), (I-300)+(3.012)+(5.015), (I-300)+(3.012)+(5.016), (I-300)+(3.012)+(5.017), (I-300)+(3.012)+(5.018), (I-300)+(3.012)+(5.019), (I-300)+(3.012)+(5.020), (I-300)+(3.012)+(5.021), (I-300)+(3.012)+(5.022), (I-300)+(3.012)+(5.023), (I-300)+(3.012)+(6.001), (I-300)+(3.012)+(6.002), (I-300)+(3.012)+(6.003), (I-300)+(3.012)+(6.004), (I-300)+(3.012)+(7.001), (I-300)+(3.012)+(7.002), (I-300)+(3.012)+(7.003), (I-300)+(3.012)+(7.004), (I-300)+(3.012)+(7.005), (I-300)+(3.012)+(7.006), (I-300)+(3.012)+(9.001), (I-300)+(3.012)+(9.002), (I-300)+(3.012)+(9.003), (I-300)+(3.012)+(9.004), (I-300)+(3.012)+(9.005), (I-300)+(3.012)+(9.006), (I-300)+(3.012)+(9.007), (I-300)+(3.012)+(9.008), (I-300)+(3.012)+(9.009), (I-300)+(3.012)+(14.001), (I-300)+(3.012)+(14.002), (I-300)+(3.012)+(15.008), (I-300)+(3.012)+(15.011), (I-300)+(3.012)+(15.012), (I-300)+(3.012)+(15.016), (I-300)+(3.012)+(15.025), (I-300)+(3.012)+(15.027), (I-300)+(3.012)+(15.047), (I-300)+(3.012)+(15.063), (I-300)+(3.012)+(15.064), (I-300)+(3.012)+(16.001), (I-300)+(3.012)+(16.002), (I-300)+(3.012)+(16.003), (I-300)+(3.012)+(16.004), (I-300)+(3.012)+(16.005), (I-300)+(3.012)+(16.006), (I-300)+(3.012)+(16.007), (I-300)+(3.012)+(16.008), (I-300)+(3.012)+(17.001), (I-300)+(3.012)+(17.002), (I-300)+(3.012)+(17.003), (I-300)+(3.012)+(17.004), (I-300)+(3.012)+(17.005), (I-300)+(3.012)+(17.006), (I-300)+(3.012)+(17.007), (I-300)+(3.012)+(17.008), (I-300)+(3.012)+(17.009), (I-300)+(3.012)+(17.010), (I-300)+(3.012)+(17.011), (I-300)+(3.012)+(17.012), (I-300)+(3.012)+(18.001), (I-300)+(3.013)+(3.025), (I-300)+(3.013)+(3.030), (I-300)+(3.013)+(3.031), (I-300)+(3.013)+(5.001), (I-300)+(3.013)+(5.002), (I-300)+(3.013)+(5.003), (I-300)+(3.013)+(5.004), (I-300)+(3.013)+(5.005), (I-300)+(3.013)+(5.006), (I-300)+(3.013)+(5.007), (I-300)+(3.013)+(5.008), (I-300)+(3.013)+(5.009), (I-300)+(3.013)+(5.010), (I-300)+(3.013)+(5.011), (I-300)+(3.013)+(5.012), (I-300)+(3.013)+(5.013), (I-300)+(3.013)+(5.014), (I-300)+(3.013)+(5.015), (I-300)+(3.013)+(5.016), (I-300)+(3.013)+(5.017), (I-300)+(3.013)+(5.018), (I-300)+(3.013)+(5.019), (I-300)+(3.013)+(5.020), (I-300)+(3.013)+(5.021), (I-300)+(3.013)+(5.022), (I-300)+(3.013)+(5.023), (I-300)+(3.013)+(6.001), (I-300)+(3.013)+(6.002), (I-300)+(3.013)+(6.003), (I-300)+(3.013)+(6.004), (I-300)+(3.013)+(7.001), (I-300)+(3.013)+(7.002), (I-300)+(3.013)+(7.003), (I-300)+(3.013)+(7.004), (I-300)+(3.013)+(7.005), (I-300)+(3.013)+(7.006), (I-300)+(3.013)+(9.001), (I-300)+(3.013)+(9.002), (I-300)+(3.013)+(9.003), (I-300)+(3.013)+(9.004), (I-300)+(3.013)+(9.005), (I-300)+(3.013)+(9.006), (I-300)+(3.013)+(9.007), (I-300)+(3.013)+(9.008), (I-300)+(3.013)+(9.009), (I-300)+(3.013)+(14.001), (I-300)+(3.013)+(14.002), (I-300)+(3.013)+(15.008), (I-300)+(3.013)+(15.011), (I-300)+(3.013)+(15.012), (I-300)+(3.013)+(15.016), (I-300)+(3.013)+(15.025), (I-300)+(3.013)+(15.027), (I-300)+(3.013)+(15.047), (I-300)+(3.013)+(15.063), (I-300)+(3.013)+(15.064), (I-300)+(3.013)+(16.001), (I-300)+(3.013)+(16.002), (I-300)+(3.013)+(16.003), (I-300)+(3.013)+(16.004), (I-300)+(3.013)+(16.005), (I-300)+(3.013)+(16.006), (I-300)+(3.013)+(16.007), (I-300)+(3.013)+(16.008), (I-300)+(3.013)+(17.001), (I-300)+(3.013)+(17.002), (I-300)+(3.013)+(17.003), (I-300)+(3.013)+(17.004), (I-300)+(3.013)+(17.005), (I-300)+(3.013)+(17.006), (I-300)+(3.013)+(17.007), (I-300)+(3.013)+(17.008), (I-300)+(3.013)+(17.009), (I-300)+(3.013)+(17.010), (I-300)+(3.013)+(17.011), (I-300)+(3.013)+(17.012), (I-300)+(3.013)+(18.001), (I-300)+(3.014)+(3.025), (I-300)+(3.014)+(3.030), (I-300)+(3.014)+(3.031), (I-300)+(3.014)+(5.001), (I-300)+(3.014)+(5.002), (I-300)+(3.014)+(5.003), (I-300)+(3.014)+(5.004), (I-300)+(3.014)+(5.005), (I-300)+(3.014)+(5.006), (I-300)+(3.014)+(5.007), (I-300)+(3.014)+(5.008), (I-300)+(3.014)+(5.009), (I-300)+(3.014)+(5.010), (I-300)+(3.014)+(5.011), (I-300)+(3.014)+(5.012), (I-300)+(3.014)+(5.013), (I-300)+(3.014)+(5.014), (I-300)+(3.014)+(5.015), (I-300)+(3.014)+(5.016), (I-300)+(3.014)+(5.017), (I-300)+(3.014)+(5.018), (I-300)+(3.014)+(5.019), (I-300)+(3.014)+(5.020), (I-300)+(3.014)+(5.021), (I-300)+(3.014)+(5.022), (I-300)+(3.014)+(5.023), (I-300)+(3.014)+(6.001), (I-300)+(3.014)+(6.002), (I-300)+(3.014)+(6.003), (I-300)+(3.014)+(6.004), (I-300)+(3.014)+(7.001), (I-300)+(3.014)+(7.002), (I-300)+(3.014)+(7.003), (I-300)+(3.014)+(7.004), (I-300)+(3.014)+(7.005), (I-300)+(3.014)+(7.006), (I-300)+(3.014)+(9.001), (I-300)+(3.014)+(9.002), (I-300)+(3.014)+(9.003), (I-300)+(3.014)+(9.004), (I-300)+(3.014)+(9.005), (I-300)+(3.014)+(9.006), (I-300)+(3.014)+(9.007), (I-300)+(3.014)+(9.008), (I-300)+(3.014)+(9.009), (I-300)+(3.014)+(14.001), (I-300)+(3.014)+(14.002), (I-300)+(3.014)+(15.008), (I-300)+(3.014)+(15.011), (I-300)+(3.014)+(15.012), (I-300)+(3.014)+(15.016), (I-300)+(3.014)+(15.025), (I-300)+(3.014)+(15.027), (I-300)+(3.014)+(15.047), (I-300)+(3.014)+(15.063), (I-300)+(3.014)+(15.064), (I-300)+(3.014)+(16.001), (I-300)+(3.014)+(16.002), (I-300)+(3.014)+(16.003), (I-300)+(3.014)+(16.004), (I-300)+(3.014)+(16.005), (I-300)+(3.014)+(16.006), (I-300)+(3.014)+(16.007), (I-300)+(3.014)+(16.008), (I-300)+(3.014)+(17.001), (I-300)+(3.014)+(17.002), (I-300)+(3.014)+(17.003), (I-300)+(3.014)+(17.004), (I-300)+(3.014)+(17.005), (I-300)+(3.014)+(17.006), (I-300)+(3.014)+(17.007), (I-300)+(3.014)+(17.008), (I-300)+(3.014)+(17.009), (I-300)+(3.014)+(17.010), (I-300)+(3.014)+(17.011), (I-300)+(3.014)+(17.012), (I-300)+(3.014)+(18.001), (I-300)+(3.015)+(3.025), (I-300)+(3.015)+(3.030), (I-300)+(3.015)+(3.031), (I-300)+(3.015)+(5.001), (I-300)+(3.015)+(5.002), (I-300)+(3.015)+(5.003), (I-300)+(3.015)+(5.004), (I-300)+(3.015)+(5.005), (I-300)+(3.015)+(5.006), (I-300)+(3.015)+(5.007), (I-300)+(3.015)+(5.008), (I-300)+(3.015)+(5.009), (I-300)+(3.015)+(5.010), (I-300)+(3.015)+(5.011), (I-300)+(3.015)+(5.012), (I-300)+(3.015)+(5.013), (I-300)+(3.015)+(5.014), (I-300)+(3.015)+(5.015), (I-300)+(3.015)+(5.016), (I-300)+(3.015)+(5.017), (I-300)+(3.015)+(5.018), (I-300)+(3.015)+(5.019), (I-300)+(3.015)+(5.020), (I-300)+(3.015)+(5.021), (I-300)+(3.015)+(5.022), (I-300)+(3.015)+(5.023), (I-300)+(3.015)+(6.001), (I-300)+(3.015)+(6.002), (I-300)+(3.015)+(6.003), (I-300)+(3.015)+(6.004), (I-300)+(3.015)+(7.001), (I-300)+(3.015)+(7.002), (I-300)+(3.015)+(7.003), (I-300)+(3.015)+(7.004), (I-300)+(3.015)+(7.005), (I-300)+(3.015)+(7.006), (I-300)+(3.015)+(9.001), (I-300)+(3.015)+(9.002), (I-300)+(3.015)+(9.003), (I-300)+(3.015)+(9.004), (I-300)+(3.015)+(9.005), (I-300)+(3.015)+(9.006), (I-300)+(3.015)+(9.007), (I-300)+(3.015)+(9.008), (I-300)+(3.015)+(9.009), (I-300)+(3.015)+(14.001), (I-300)+(3.015)+(14.002), (I-300)+(3.015)+(15.008), (I-300)+(3.015)+(15.011), (I-300)+(3.015)+(15.012), (I-300)+(3.015)+(15.016), (I-300)+(3.015)+(15.025), (I-300)+(3.015)+(15.027), (I-300)+(3.015)+(15.047), (I-300)+(3.015)+(15.063), (I-300)+(3.015)+(15.064), (I-300)+(3.015)+(16.001), (I-300)+(3.015)+(16.002), (I-300)+(3.015)+(16.003), (I-300)+(3.015)+(16.004), (I-300)+(3.015)+(16.005), (I-300)+(3.015)+(16.006), (I-300)+(3.015)+(16.007), (I-300)+(3.015)+(16.008), (I-300)+(3.015)+(17.001), (I-300)+(3.015)+(17.002), (I-300)+(3.015)+(17.003), (I-300)+(3.015)+(17.004), (I-300)+(3.015)+(17.005), (I-300)+(3.015)+(17.006), (I-300)+(3.015)+(17.007), (I-300)+(3.015)+(17.008), (I-300)+(3.015)+(17.009), (I-300)+(3.015)+(17.010), (I-300)+(3.015)+(17.011), (I-300)+(3.015)+(17.012), (I-300)+(3.015)+(18.001), (I-300)+(3.016)+(3.025), (I-300)+(3.016)+(3.030), (I-300)+(3.016)+(3.031), (I-300)+(3.016)+(5.001), (I-300)+(3.016)+(5.002), (I-300)+(3.016)+(5.003), (I-300)+(3.016)+(5.004), (I-300)+(3.016)+(5.005), (I-300)+(3.016)+(5.006), (I-300)+(3.016)+(5.007), (I-300)+(3.016)+(5.008), (I-300)+(3.016)+(5.009), (I-300)+(3.016)+(5.010), (I-300)+(3.016)+(5.011), (I-300)+(3.016)+(5.012), (I-300)+(3.016)+(5.013), (I-300)+(3.016)+(5.014), (I-300)+(3.016)+(5.015), (I-300)+(3.016)+(5.016), (I-300)+(3.016)+(5.017), (I-300)+(3.016)+(5.018), (I-300)+(3.016)+(5.019), (I-300)+(3.016)+(5.020), (I-300)+(3.016)+(5.021), (I-300)+(3.016)+(5.022), (I-300)+(3.016)+(5.023), (I-300)+(3.016)+(6.001), (I-300)+(3.016)+(6.002), (I-300)+(3.016)+(6.003), (I-300)+(3.016)+(6.004), (I-300)+(3.016)+(7.001), (I-300)+(3.016)+(7.002), (I-300)+(3.016)+(7.003), (I-300)+(3.016)+(7.004), (I-300)+(3.016)+(7.005), (I-300)+(3.016)+(7.006), (I-300)+(3.016)+(9.001), (I-300)+(3.016)+(9.002), (I-300)+(3.016)+(9.003), (I-300)+(3.016)+(9.004), (I-300)+(3.016)+(9.005), (I-300)+(3.016)+(9.006), (I-300)+(3.016)+(9.007), (I-300)+(3.016)+(9.008), (I-300)+(3.016)+(9.009), (I-300)+(3.016)+(14.001), (I-300)+(3.016)+(14.002), (I-300)+(3.016)+(15.008), (I-300)+(3.016)+(15.011), (I-300)+(3.016)+(15.012), (I-300)+(3.016)+(15.016), (I-300)+(3.016)+(15.025), (I-300)+(3.016)+(15.027), (I-300)+(3.016)+(15.047), (I-300)+(3.016)+(15.063), (I-300)+(3.016)+(15.064), (I-300)+(3.016)+(16.001), (I-300)+(3.016)+(16.002), (I-300)+(3.016)+(16.003), (I-300)+(3.016)+(16.004), (I-300)+(3.016)+(16.005), (I-300)+(3.016)+(16.006), (I-300)+(3.016)+(16.007), (I-300)+(3.016)+(16.008), (I-300)+(3.016)+(17.001), (I-300)+(3.016)+(17.002), (I-300)+(3.016)+(17.003), (I-300)+(3.016)+(17.004), (I-300)+(3.016)+(17.005), (I-300)+(3.016)+(17.006), (I-300)+(3.016)+(17.007), (I-300)+(3.016)+(17.008), (I-300)+(3.016)+(17.009), (I-300)+(3.016)+(17.010), (I-300)+(3.016)+(17.011), (I-300)+(3.016)+(17.012), (I-300)+(3.016)+(18.001), (I-300)+(3.017)+(3.025), (I-300)+(3.017)+(3.030), (I-300)+(3.017)+(3.031), (I-300)+(3.017)+(5.001), (I-300)+(3.017)+(5.002), (I-300)+(3.017)+(5.003), (I-300)+(3.017)+(5.004), (I-300)+(3.017)+(5.005), (I-300)+(3.017)+(5.006), (I-300)+(3.017)+(5.007), (I-300)+(3.017)+(5.008), (I-300)+(3.017)+(5.009), (I-300)+(3.017)+(5.010), (I-300)+(3.017)+(5.011), (I-300)+(3.017)+(5.012), (I-300)+(3.017)+(5.013), (I-300)+(3.017)+(5.014), (I-300)+(3.017)+(5.015), (I-300)+(3.017)+(5.016), (I-300)+(3.017)+(5.017), (I-300)+(3.017)+(5.018), (I-300)+(3.017)+(5.019), (I-300)+(3.017)+(5.020), (I-300)+(3.017)+(5.021), (I-300)+(3.017)+(5.022), (I-300)+(3.017)+(5.023), (I-300)+(3.017)+(6.001), (I-300)+(3.017)+(6.002), (I-300)+(3.017)+(6.003), (I-300)+(3.017)+(6.004), (I-300)+(3.017)+(7.001), (I-300)+(3.017)+(7.002), (I-300)+(3.017)+(7.003), (I-300)+(3.017)+(7.004), (I-300)+(3.017)+(7.005), (I-300)+(3.017)+(7.006), (I-300)+(3.017)+(9.001), (I-300)+(3.017)+(9.002), (I-300)+(3.017)+(9.003), (I-300)+(3.017)+(9.004), (I-300)+(3.017)+(9.005), (I-300)+(3.017)+(9.006), (I-300)+(3.017)+(9.007), (I-300)+(3.017)+(9.008), (I-300)+(3.017)+(9.009), (I-300)+(3.017)+(14.001), (I-300)+(3.017)+(14.002), (I-300)+(3.017)+(15.008), (I-300)+(3.017)+(15.011), (I-300)+(3.017)+(15.012), (I-300)+(3.017)+(15.016), (I-300)+(3.017)+(15.025), (I-300)+(3.017)+(15.027), (I-300)+(3.017)+(15.047), (I-300)+(3.017)+(15.063), (I-300)+(3.017)+(15.064), (I-300)+(3.017)+(16.001), (I-300)+(3.017)+(16.002), (I-300)+(3.017)+(16.003), (I-300)+(3.017)+(16.004), (I-300)+(3.017)+(16.005), (I-300)+(3.017)+(16.006), (I-300)+(3.017)+(16.007), (I-300)+(3.017)+(16.008), (I-300)+(3.017)+(17.001), (I-300)+(3.017)+(17.002), (I-300)+(3.017)+(17.003), (I-300)+(3.017)+(17.004), (I-300)+(3.017)+(17.005), (I-300)+(3.017)+(17.006), (I-300)+(3.017)+(17.007), (I-300)+(3.017)+(17.008), (I-300)+(3.017)+(17.009), (I-300)+(3.017)+(17.010), (I-300)+(3.017)+(17.011), (I-300)+(3.017)+(17.012), (I-300)+(3.017)+(18.001), (I-300)+(3.018)+(3.025), (I-300)+(3.018)+(3.030), (I-300)+(3.018)+(3.031), (I-300)+(3.018)+(5.001), (I-300)+(3.018)+(5.002), (I-300)+(3.018)+(5.003), (I-300)+(3.018)+(5.004), (I-300)+(3.018)+(5.005), (I-300)+(3.018)+(5.006), (I-300)+(3.018)+(5.007), (I-300)+(3.018)+(5.008), (I-300)+(3.018)+(5.009), (I-300)+(3.018)+(5.010), (I-300)+(3.018)+(5.011), (I-300)+(3.018)+(5.012), (I-300)+(3.018)+(5.013), (I-300)+(3.018)+(5.014), (I-300)+(3.018)+(5.015), (I-300)+(3.018)+(5.016), (I-300)+(3.018)+(5.017), (I-300)+(3.018)+(5.018), (I-300)+(3.018)+(5.019), (I-300)+(3.018)+(5.020), (I-300)+(3.018)+(5.021), (I-300)+(3.018)+(5.022), (I-300)+(3.018)+(5.023), (I-300)+(3.018)+(6.001), (I-300)+(3.018)+(6.002), (I-300)+(3.018)+(6.003), (I-300)+(3.018)+(6.004), (I-300)+(3.018)+(7.001), (I-300)+(3.018)+(7.002), (I-300)+(3.018)+(7.003), (I-300)+(3.018)+(7.004), (I-300)+(3.018)+(7.005), (I-300)+(3.018)+(7.006), (I-300)+(3.018)+(9.001), (I-300)+(3.018)+(9.002), (I-300)+(3.018)+(9.003), (I-300)+(3.018)+(9.004), (I-300)+(3.018)+(9.005), (I-300)+(3.018)+(9.006), (I-300)+(3.018)+(9.007), (I-300)+(3.018)+(9.008), (I-300)+(3.018)+(9.009), (I-300)+(3.018)+(14.001), (I-300)+(3.018)+(14.002), (I-300)+(3.018)+(15.008), (I-300)+(3.018)+(15.011), (I-300)+(3.018)+(15.012), (I-300)+(3.018)+(15.016), (I-300)+(3.018)+(15.025), (I-300)+(3.018)+(15.027), (I-300)+(3.018)+(15.047), (I-300)+(3.018)+(15.063), (I-300)+(3.018)+(15.064), (I-300)+(3.018)+(16.001), (I-300)+(3.018)+(16.002), (I-300)+(3.018)+(16.003), (I-300)+(3.018)+(16.004), (I-300)+(3.018)+(16.005), (I-300)+(3.018)+(16.006), (I-300)+(3.018)+(16.007), (I-300)+(3.018)+(16.008), (I-300)+(3.018)+(17.001), (I-300)+(3.018)+(17.002), (I-300)+(3.018)+(17.003), (I-300)+(3.018)+(17.004), (I-300)+(3.018)+(17.005), (I-300)+(3.018)+(17.006), (I-300)+(3.018)+(17.007), (I-300)+(3.018)+(17.008), (I-300)+(3.018)+(17.009), (I-300)+(3.018)+(17.010), (I-300)+(3.018)+(17.011), (I-300)+(3.018)+(17.012), (I-300)+(3.018)+(18.001), (I-300)+(3.019)+(3.025), (I-300)+(3.019)+(3.030), (I-300)+(3.019)+(3.031), (I-300)+(3.019)+(5.001), (I-300)+(3.019)+(5.002), (I-300)+(3.019)+(5.003), (I-300)+(3.019)+(5.004), (I-300)+(3.019)+(5.005), (I-300)+(3.019)+(5.006), (I-300)+(3.019)+(5.007), (I-300)+(3.019)+(5.008), (I-300)+(3.019)+(5.009), (I-300)+(3.019)+(5.010), (I-300)+(3.019)+(5.011), (I-300)+(3.019)+(5.012), (I-300)+(3.019)+(5.013), (I-300)+(3.019)+(5.014), (I-300)+(3.019)+(5.015), (I-300)+(3.019)+(5.016), (I-300)+(3.019)+(5.017), (I-300)+(3.019)+(5.018), (I-300)+(3.019)+(5.019), (I-300)+(3.019)+(5.020), (I-300)+(3.019)+(5.021), (I-300)+(3.019)+(5.022), (I-300)+(3.019)+(5.023), (I-300)+(3.019)+(6.001), (I-300)+(3.019)+(6.002), (I-300)+(3.019)+(6.003), (I-300)+(3.019)+(6.004), (I-300)+(3.019)+(7.001), (I-300)+(3.019)+(7.002), (I-300)+(3.019)+(7.003), (I-300)+(3.019)+(7.004), (I-300)+(3.019)+(7.005), (I-300)+(3.019)+(7.006), (I-300)+(3.019)+(9.001), (I-300)+(3.019)+(9.002), (I-300)+(3.019)+(9.003), (I-300)+(3.019)+(9.004), (I-300)+(3.019)+(9.005), (I-300)+(3.019)+(9.006), (I-300)+(3.019)+(9.007), (I-300)+(3.019)+(9.008), (I-300)+(3.019)+(9.009), (I-300)+(3.019)+(14.001), (I-300)+(3.019)+(14.002), (I-300)+(3.019)+(15.008), (I-300)+(3.019)+(15.011), (I-300)+(3.019)+(15.012), (I-300)+(3.019)+(15.016), (I-300)+(3.019)+(15.025), (I-300)+(3.019)+(15.027), (I-300)+(3.019)+(15.047), (I-300)+(3.019)+(15.063), (I-300)+(3.019)+(15.064), (I-300)+(3.019)+(16.001), (I-300)+(3.019)+(16.002), (I-300)+(3.019)+(16.003), (I-300)+(3.019)+(16.004), (I-300)+(3.019)+(16.005), (I-300)+(3.019)+(16.006), (I-300)+(3.019)+(16.007), (I-300)+(3.019)+(16.008), (I-300)+(3.019)+(17.001), (I-300)+(3.019)+(17.002), (I-300)+(3.019)+(17.003), (I-300)+(3.019)+(17.004), (I-300)+(3.019)+(17.005), (I-300)+(3.019)+(17.006), (I-300)+(3.019)+(17.007), (I-300)+(3.019)+(17.008), (I-300)+(3.019)+(17.009), (I-300)+(3.019)+(17.010), (I-300)+(3.019)+(17.011), (I-300)+(3.019)+(17.012), (I-300)+(3.019)+(18.001), (I-300)+(3.020)+(3.025), (I-300)+(3.020)+(3.030), (I-300)+(3.020)+(3.031), (I-300)+(3.020)+(5.001), (I-300)+(3.020)+(5.002), (I-300)+(3.020)+(5.003), (I-300)+(3.020)+(5.004), (I-300)+(3.020)+(5.005), (I-300)+(3.020)+(5.006), (I-300)+(3.020)+(5.007), (I-300)+(3.020)+(5.008), (I-300)+(3.020)+(5.009), (I-300)+(3.020)+(5.010), (I-300)+(3.020)+(5.011), (I-300)+(3.020)+(5.012), (I-300)+(3.020)+(5.013), (I-300)+(3.020)+(5.014), (I-300)+(3.020)+(5.015), (I-300)+(3.020)+(5.016), (I-300)+(3.020)+(5.017), (I-300)+(3.020)+(5.018), (I-300)+(3.020)+(5.019), (I-300)+(3.020)+(5.020), (I-300)+(3.020)+(5.021), (I-300)+(3.020)+(5.022), (I-300)+(3.020)+(5.023), (I-300)+(3.020)+(6.001), (I-300)+(3.020)+(6.002), (I-300)+(3.020)+(6.003), (I-300)+(3.020)+(6.004), (I-300)+(3.020)+(7.001), (I-300)+(3.020)+(7.002), (I-300)+(3.020)+(7.003), (I-300)+(3.020)+(7.004), (I-300)+(3.020)+(7.005), (I-300)+(3.020)+(7.006), (I-300)+(3.020)+(9.001), (I-300)+(3.020)+(9.002), (I-300)+(3.020)+(9.003), (I-300)+(3.020)+(9.004), (I-300)+(3.020)+(9.005), (I-300)+(3.020)+(9.006), (I-300)+(3.020)+(9.007), (I-300)+(3.020)+(9.008), (I-300)+(3.020)+(9.009), (I-300)+(3.020)+(14.001), (I-300)+(3.020)+(14.002), (I-300)+(3.020)+(15.008), (I-300)+(3.020)+(15.011), (I-300)+(3.020)+(15.012), (I-300)+(3.020)+(15.016), (I-300)+(3.020)+(15.025), (I-300)+(3.020)+(15.027), (I-300)+(3.020)+(15.047), (I-300)+(3.020)+(15.063), (I-300)+(3.020)+(15.064), (I-300)+(3.020)+(16.001), (I-300)+(3.020)+(16.002), (I-300)+(3.020)+(16.003), (I-300)+(3.020)+(16.004), (I-300)+(3.020)+(16.005), (I-300)+(3.020)+(16.006), (I-300)+(3.020)+(16.007), (I-300)+(3.020)+(16.008), (I-300)+(3.020)+(17.001), (I-300)+(3.020)+(17.002), (I-300)+(3.020)+(17.003), (I-300)+(3.020)+(17.004), (I-300)+(3.020)+(17.005), (I-300)+(3.020)+(17.006), (I-300)+(3.020)+(17.007), (I-300)+(3.020)+(17.008), (I-300)+(3.020)+(17.009), (I-300)+(3.020)+(17.010), (I-300)+(3.020)+(17.011), (I-300)+(3.020)+(17.012), (I-300)+(3.020)+(18.001), (I-300)+(3.021)+(3.025), (I-300)+(3.021)+(3.030), (I-300)+(3.021)+(3.031), (I-300)+(3.021)+(5.001), (I-300)+(3.021)+(5.002), (I-300)+(3.021)+(5.003), (I-300)+(3.021)+(5.004), (I-300)+(3.021)+(5.005), (I-300)+(3.021)+(5.006), (I-300)+(3.021)+(5.007), (I-300)+(3.021)+(5.008), (I-300)+(3.021)+(5.009), (I-300)+(3.021)+(5.010), (I-300)+(3.021)+(5.011), (I-300)+(3.021)+(5.012), (I-300)+(3.021)+(5.013), (I-300)+(3.021)+(5.014), (I-300)+(3.021)+(5.015), (I-300)+(3.021)+(5.016), (I-300)+(3.021)+(5.017), (I-300)+(3.021)+(5.018), (I-300)+(3.021)+(5.019), (I-300)+(3.021)+(5.020), (I-300)+(3.021)+(5.021), (I-300)+(3.021)+(5.022), (I-300)+(3.021)+(5.023), (I-300)+(3.021)+(6.001), (I-300)+(3.021)+(6.002), (I-300)+(3.021)+(6.003), (I-300)+(3.021)+(6.004), (I-300)+(3.021)+(7.001), (I-300)+(3.021)+(7.002), (I-300)+(3.021)+(7.003), (I-300)+(3.021)+(7.004), (I-300)+(3.021)+(7.005), (I-300)+(3.021)+(7.006), (I-300)+(3.021)+(9.001), (I-300)+(3.021)+(9.002), (I-300)+(3.021)+(9.003), (I-300)+(3.021)+(9.004), (I-300)+(3.021)+(9.005), (I-300)+(3.021)+(9.006), (I-300)+(3.021)+(9.007), (I-300)+(3.021)+(9.008), (I-300)+(3.021)+(9.009), (I-300)+(3.021)+(14.001), (I-300)+(3.021)+(14.002), (I-300)+(3.021)+(15.008), (I-300)+(3.021)+(15.011), (I-300)+(3.021)+(15.012), (I-300)+(3.021)+(15.016), (I-300)+(3.021)+(15.025), (I-300)+(3.021)+(15.027), (I-300)+(3.021)+(15.047), (I-300)+(3.021)+(15.063), (I-300)+(3.021)+(15.064), (I-300)+(3.021)+(16.001), (I-300)+(3.021)+(16.002), (I-300)+(3.021)+(16.003), (I-300)+(3.021)+(16.004), (I-300)+(3.021)+(16.005), (I-300)+(3.021)+(16.006), (I-300)+(3.021)+(16.007), (I-300)+(3.021)+(16.008), (I-300)+(3.021)+(17.001), (I-300)+(3.021)+(17.002), (I-300)+(3.021)+(17.003), (I-300)+(3.021)+(17.004), (I-300)+(3.021)+(17.005), (I-300)+(3.021)+(17.006), (I-300)+(3.021)+(17.007), (I-300)+(3.021)+(17.008), (I-300)+(3.021)+(17.009), (I-300)+(3.021)+(17.010), (I-300)+(3.021)+(17.011), (I-300)+(3.021)+(17.012), (I-300)+(3.021)+(18.001), (I-300)+(3.022)+(3.025), (I-300)+(3.022)+(3.030), (I-300)+(3.022)+(3.031), (I-300)+(3.022)+(5.001), (I-300)+(3.022)+(5.002), (I-300)+(3.022)+(5.003), (I-300)+(3.022)+(5.004), (I-300)+(3.022)+(5.005), (I-300)+(3.022)+(5.006), (I-300)+(3.022)+(5.007), (I-300)+(3.022)+(5.008), (I-300)+(3.022)+(5.009), (I-300)+(3.022)+(5.010), (I-300)+(3.022)+(5.011), (I-300)+(3.022)+(5.012), (I-300)+(3.022)+(5.013), (I-300)+(3.022)+(5.014), (I-300)+(3.022)+(5.015), (I-300)+(3.022)+(5.016), (I-300)+(3.022)+(5.017), (I-300)+(3.022)+(5.018), (I-300)+(3.022)+(5.019), (I-300)+(3.022)+(5.020), (I-300)+(3.022)+(5.021), (I-300)+(3.022)+(5.022), (I-300)+(3.022)+(5.023), (I-300)+(3.022)+(6.001), (I-300)+(3.022)+(6.002), (I-300)+(3.022)+(6.003), (I-300)+(3.022)+(6.004), (I-300)+(3.022)+(7.001), (I-300)+(3.022)+(7.002), (I-300)+(3.022)+(7.003), (I-300)+(3.022)+(7.004), (I-300)+(3.022)+(7.005), (I-300)+(3.022)+(7.006), (I-300)+(3.022)+(9.001), (I-300)+(3.022)+(9.002), (I-300)+(3.022)+(9.003), (I-300)+(3.022)+(9.004), (I-300)+(3.022)+(9.005), (I-300)+(3.022)+(9.006), (I-300)+(3.022)+(9.007), (I-300)+(3.022)+(9.008), (I-300)+(3.022)+(9.009), (I-300)+(3.022)+(14.001), (I-300)+(3.022)+(14.002), (I-300)+(3.022)+(15.008), (I-300)+(3.022)+(15.011), (I-300)+(3.022)+(15.012), (I-300)+(3.022)+(15.016), (I-300)+(3.022)+(15.025), (I-300)+(3.022)+(15.027), (I-300)+(3.022)+(15.047), (I-300)+(3.022)+(15.063), (I-300)+(3.022)+(15.064), (I-300)+(3.022)+(16.001), (I-300)+(3.022)+(16.002), (I-300)+(3.022)+(16.003), (I-300)+(3.022)+(16.004), (I-300)+(3.022)+(16.005), (I-300)+(3.022)+(16.006), (I-300)+(3.022)+(16.007), (I-300)+(3.022)+(16.008), (I-300)+(3.022)+(17.001), (I-300)+(3.022)+(17.002), (I-300)+(3.022)+(17.003), (I-300)+(3.022)+(17.004), (I-300)+(3.022)+(17.005), (I-300)+(3.022)+(17.006), (I-300)+(3.022)+(17.007), (I-300)+(3.022)+(17.008), (I-300)+(3.022)+(17.009), (I-300)+(3.022)+(17.010), (I-300)+(3.022)+(17.011), (I-300)+(3.022)+(17.012), (I-300)+(3.022)+(18.001), (I-300)+(3.023)+(3.025), (I-300)+(3.023)+(3.030), (I-300)+(3.023)+(3.031), (I-300)+(3.023)+(5.001), (I-300)+(3.023)+(5.002), (I-300)+(3.023)+(5.003), (I-300)+(3.023)+(5.004), (I-300)+(3.023)+(5.005), (I-300)+(3.023)+(5.006), (I-300)+(3.023)+(5.007), (I-300)+(3.023)+(5.008), (I-300)+(3.023)+(5.009), (I-300)+(3.023)+(5.010), (I-300)+(3.023)+(5.011), (I-300)+(3.023)+(5.012), (I-300)+(3.023)+(5.013), (I-300)+(3.023)+(5.014), (I-300)+(3.023)+(5.015), (I-300)+(3.023)+(5.016), (I-300)+(3.023)+(5.017), (I-300)+(3.023)+(5.018), (I-300)+(3.023)+(5.019), (I-300)+(3.023)+(5.020), (I-300)+(3.023)+(5.021), (I-300)+(3.023)+(5.022), (I-300)+(3.023)+(5.023), (I-300)+(3.023)+(6.001), (I-300)+(3.023)+(6.002), (I-300)+(3.023)+(6.003), (I-300)+(3.023)+(6.004), (I-300)+(3.023)+(7.001), (I-300)+(3.023)+(7.002), (I-300)+(3.023)+(7.003), (I-300)+(3.023)+(7.004), (I-300)+(3.023)+(7.005), (I-300)+(3.023)+(7.006), (I-300)+(3.023)+(9.001), (I-300)+(3.023)+(9.002), (I-300)+(3.023)+(9.003), (I-300)+(3.023)+(9.004), (I-300)+(3.023)+(9.005), (I-300)+(3.023)+(9.006), (I-300)+(3.023)+(9.007), (I-300)+(3.023)+(9.008), (I-300)+(3.023)+(9.009), (I-300)+(3.023)+(14.001), (I-300)+(3.023)+(14.002), (I-300)+(3.023)+(15.008), (I-300)+(3.023)+(15.011), (I-300)+(3.023)+(15.012), (I-300)+(3.023)+(15.016), (I-300)+(3.023)+(15.025), (I-300)+(3.023)+(15.027), (I-300)+(3.023)+(15.047), (I-300)+(3.023)+(15.063), (I-300)+(3.023)+(15.064), (I-300)+(3.023)+(16.001), (I-300)+(3.023)+(16.002), (I-300)+(3.023)+(16.003), (I-300)+(3.023)+(16.004), (I-300)+(3.023)+(16.005), (I-300)+(3.023)+(16.006), (I-300)+(3.023)+(16.007), (I-300)+(3.023)+(16.008), (I-300)+(3.023)+(17.001), (I-300)+(3.023)+(17.002), (I-300)+(3.023)+(17.003), (I-300)+(3.023)+(17.004), (I-300)+(3.023)+(17.005), (I-300)+(3.023)+(17.006), (I-300)+(3.023)+(17.007), (I-300)+(3.023)+(17.008), (I-300)+(3.023)+(17.009), (I-300)+(3.023)+(17.010), (I-300)+(3.023)+(17.011), (I-300)+(3.023)+(17.012), (I-300)+(3.023)+(18.001), (I-300)+(3.024)+(3.025), (I-300)+(3.024)+(3.030), (I-300)+(3.024)+(3.031), (I-300)+(3.024)+(5.001), (I-300)+(3.024)+(5.002), (I-300)+(3.024)+(5.003), (I-300)+(3.024)+(5.004), (I-300)+(3.024)+(5.005), (I-300)+(3.024)+(5.006), (I-300)+(3.024)+(5.007), (I-300)+(3.024)+(5.008), (I-300)+(3.024)+(5.009), (I-300)+(3.024)+(5.010), (I-300)+(3.024)+(5.011), (I-300)+(3.024)+(5.012), (I-300)+(3.024)+(5.013), (I-300)+(3.024)+(5.014), (I-300)+(3.024)+(5.015), (I-300)+(3.024)+(5.016), (I-300)+(3.024)+(5.017), (I-300)+(3.024)+(5.018), (I-300)+(3.024)+(5.019), (I-300)+(3.024)+(5.020), (I-300)+(3.024)+(5.021), (I-300)+(3.024)+(5.022), (I-300)+(3.024)+(5.023), (I-300)+(3.024)+(6.001), (I-300)+(3.024)+(6.002), (I-300)+(3.024)+(6.003), (I-300)+(3.024)+(6.004), (I-300)+(3.024)+(7.001), (I-300)+(3.024)+(7.002), (I-300)+(3.024)+(7.003), (I-300)+(3.024)+(7.004), (I-300)+(3.024)+(7.005), (I-300)+(3.024)+(7.006), (I-300)+(3.024)+(9.001), (I-300)+(3.024)+(9.002), (I-300)+(3.024)+(9.003), (I-300)+(3.024)+(9.004), (I-300)+(3.024)+(9.005), (I-300)+(3.024)+(9.006), (I-300)+(3.024)+(9.007), (I-300)+(3.024)+(9.008), (I-300)+(3.024)+(9.009), (I-300)+(3.024)+(14.001), (I-300)+(3.024)+(14.002), (I-300)+(3.024)+(15.008), (I-300)+(3.024)+(15.011), (I-300)+(3.024)+(15.012), (I-300)+(3.024)+(15.016), (I-300)+(3.024)+(15.025), (I-300)+(3.024)+(15.027), (I-300)+(3.024)+(15.047), (I-300)+(3.024)+(15.063), (I-300)+(3.024)+(15.064), (I-300)+(3.024)+(16.001), (I-300)+(3.024)+(16.002), (I-300)+(3.024)+(16.003), (I-300)+(3.024)+(16.004), (I-300)+(3.024)+(16.005), (I-300)+(3.024)+(16.006), (I-300)+(3.024)+(16.007), (I-300)+(3.024)+(16.008), (I-300)+(3.024)+(17.001), (I-300)+(3.024)+(17.002), (I-300)+(3.024)+(17.003), (I-300)+(3.024)+(17.004), (I-300)+(3.024)+(17.005), (I-300)+(3.024)+(17.006), (I-300)+(3.024)+(17.007), (I-300)+(3.024)+(17.008), (I-300)+(3.024)+(17.009), (I-300)+(3.024)+(17.010), (I-300)+(3.024)+(17.011), (I-300)+(3.024)+(17.012), (I-300)+(3.024)+(18.001), (I-300)+(3.025)+(3.030), (I-300)+(3.025)+(3.031), (I-300)+(3.025)+(5.001), (I-300)+(3.025)+(5.002), (I-300)+(3.025)+(5.003), (I-300)+(3.025)+(5.004), (I-300)+(3.025)+(5.005), (I-300)+(3.025)+(5.006), (I-300)+(3.025)+(5.007), (I-300)+(3.025)+(5.008), (I-300)+(3.025)+(5.009), (I-300)+(3.025)+(5.010), (I-300)+(3.025)+(5.011), (I-300)+(3.025)+(5.012), (I-300)+(3.025)+(5.013), (I-300)+(3.025)+(5.014), (I-300)+(3.025)+(5.015), (I-300)+(3.025)+(5.016), (I-300)+(3.025)+(5.017), (I-300)+(3.025)+(5.018), (I-300)+(3.025)+(5.019), (I-300)+(3.025)+(5.020), (I-300)+(3.025)+(5.021), (I-300)+(3.025)+(5.022), (I-300)+(3.025)+(5.023), (I-300)+(3.025)+(6.001), (I-300)+(3.025)+(6.002), (I-300)+(3.025)+(6.003), (I-300)+(3.025)+(6.004), (I-300)+(3.025)+(7.001), (I-300)+(3.025)+(7.002), (I-300)+(3.025)+(7.003), (I-300)+(3.025)+(7.004), (I-300)+(3.025)+(7.005), (I-300)+(3.025)+(7.006), (I-300)+(3.025)+(9.001), (I-300)+(3.025)+(9.002), (I-300)+(3.025)+(9.003), (I-300)+(3.025)+(9.004), (I-300)+(3.025)+(9.005), (I-300)+(3.025)+(9.006), (I-300)+(3.025)+(9.007), (I-300)+(3.025)+(9.008), (I-300)+(3.025)+(9.009), (I-300)+(3.025)+(14.001), (I-300)+(3.025)+(14.002), (I-300)+(3.025)+(15.008), (I-300)+(3.025)+(15.011), (I-300)+(3.025)+(15.012), (I-300)+(3.025)+(15.016), (I-300)+(3.025)+(15.025), (I-300)+(3.025)+(15.027), (I-300)+(3.025)+(15.047), (I-300)+(3.025)+(15.063), (I-300)+(3.025)+(15.064), (I-300)+(3.025)+(16.001), (I-300)+(3.025)+(16.002), (I-300)+(3.025)+(16.003), (I-300)+(3.025)+(16.004), (I-300)+(3.025)+(16.005), (I-300)+(3.025)+(16.006), (I-300)+(3.025)+(16.007), (I-300)+(3.025)+(16.008), (I-300)+(3.025)+(17.001), (I-300)+(3.025)+(17.002), (I-300)+(3.025)+(17.003), (I-300)+(3.025)+(17.004), (I-300)+(3.025)+(17.005), (I-300)+(3.025)+(17.006), (I-300)+(3.025)+(17.007), (I-300)+(3.025)+(17.008), (I-300)+(3.025)+(17.009), (I-300)+(3.025)+(17.010), (I-300)+(3.025)+(17.011), (I-300)+(3.025)+(17.012), (I-300)+(3.025)+(18.001), (I-300)+(3.026)+(3.025), (I-300)+(3.026)+(3.030), (I-300)+(3.026)+(3.031), (I-300)+(3.026)+(5.001), (I-300)+(3.026)+(5.002), (I-300)+(3.026)+(5.003), (I-300)+(3.026)+(5.004), (I-300)+(3.026)+(5.005), (I-300)+(3.026)+(5.006), (I-300)+(3.026)+(5.007), (I-300)+(3.026)+(5.008), (I-300)+(3.026)+(5.009), (I-300)+(3.026)+(5.010), (I-300)+(3.026)+(5.011), (I-300)+(3.026)+(5.012), (I-300)+(3.026)+(5.013), (I-300)+(3.026)+(5.014), (I-300)+(3.026)+(5.015), (I-300)+(3.026)+(5.016), (I-300)+(3.026)+(5.017), (I-300)+(3.026)+(5.018), (I-300)+(3.026)+(5.019), (I-300)+(3.026)+(5.020), (I-300)+(3.026)+(5.021), (I-300)+(3.026)+(5.022), (I-300)+(3.026)+(5.023), (I-300)+(3.026)+(6.001), (I-300)+(3.026)+(6.002), (I-300)+(3.026)+(6.003), (I-300)+(3.026)+(6.004), (I-300)+(3.026)+(7.001), (I-300)+(3.026)+(7.002), (I-300)+(3.026)+(7.003), (I-300)+(3.026)+(7.004), (I-300)+(3.026)+(7.005), (I-300)+(3.026)+(7.006), (I-300)+(3.026)+(9.001), (I-300)+(3.026)+(9.002), (I-300)+(3.026)+(9.003), (I-300)+(3.026)+(9.004), (I-300)+(3.026)+(9.005), (I-300)+(3.026)+(9.006), (I-300)+(3.026)+(9.007), (I-300)+(3.026)+(9.008), (I-300)+(3.026)+(9.009), (I-300)+(3.026)+(14.001), (I-300)+(3.026)+(14.002), (I-300)+(3.026)+(15.008), (I-300)+(3.026)+(15.011), (I-300)+(3.026)+(15.012), (I-300)+(3.026)+(15.016), (I-300)+(3.026)+(15.025), (I-300)+(3.026)+(15.027), (I-300)+(3.026)+(15.047), (I-300)+(3.026)+(15.063), (I-300)+(3.026)+(15.064), (I-300)+(3.026)+(16.001), (I-300)+(3.026)+(16.002), (I-300)+(3.026)+(16.003), (I-300)+(3.026)+(16.004), (I-300)+(3.026)+(16.005), (I-300)+(3.026)+(16.006), (I-300)+(3.026)+(16.007), (I-300)+(3.026)+(16.008), (I-300)+(3.026)+(17.001), (I-300)+(3.026)+(17.002), (I-300)+(3.026)+(17.003), (I-300)+(3.026)+(17.004), (I-300)+(3.026)+(17.005), (I-300)+(3.026)+(17.006), (I-300)+(3.026)+(17.007), (I-300)+(3.026)+(17.008), (I-300)+(3.026)+(17.009), (I-300)+(3.026)+(17.010), (I-300)+(3.026)+(17.011), (I-300)+(3.026)+(17.012), (I-300)+(3.026)+(18.001), (I-300)+(3.027)+(3.025), (I-300)+(3.027)+(3.030), (I-300)+(3.027)+(3.031), (I-300)+(3.027)+(5.001), (I-300)+(3.027)+(5.002), (I-300)+(3.027)+(5.003), (I-300)+(3.027)+(5.004), (I-300)+(3.027)+(5.005), (I-300)+(3.027)+(5.006), (I-300)+(3.027)+(5.007), (I-300)+(3.027)+(5.008), (I-300)+(3.027)+(5.009), (I-300)+(3.027)+(5.010), (I-300)+(3.027)+(5.011), (I-300)+(3.027)+(5.012), (I-300)+(3.027)+(5.013), (I-300)+(3.027)+(5.014), (I-300)+(3.027)+(5.015), (I-300)+(3.027)+(5.016), (I-300)+(3.027)+(5.017), (I-300)+(3.027)+(5.018), (I-300)+(3.027)+(5.019), (I-300)+(3.027)+(5.020), (I-300)+(3.027)+(5.021), (I-300)+(3.027)+(5.022), (I-300)+(3.027)+(5.023), (I-300)+(3.027)+(6.001), (I-300)+(3.027)+(6.002), (I-300)+(3.027)+(6.003), (I-300)+(3.027)+(6.004), (I-300)+(3.027)+(7.001), (I-300)+(3.027)+(7.002), (I-300)+(3.027)+(7.003), (I-300)+(3.027)+(7.004), (I-300)+(3.027)+(7.005), (I-300)+(3.027)+(7.006), (I-300)+(3.027)+(9.001), (I-300)+(3.027)+(9.002), (I-300)+(3.027)+(9.003), (I-300)+(3.027)+(9.004), (I-300)+(3.027)+(9.005), (I-300)+(3.027)+(9.006), (I-300)+(3.027)+(9.007), (I-300)+(3.027)+(9.008), (I-300)+(3.027)+(9.009), (I-300)+(3.027)+(14.001), (I-300)+(3.027)+(14.002), (I-300)+(3.027)+(15.008), (I-300)+(3.027)+(15.011), (I-300)+(3.027)+(15.012), (I-300)+(3.027)+(15.016), (I-300)+(3.027)+(15.025), (I-300)+(3.027)+(15.027), (I-300)+(3.027)+(15.047), (I-300)+(3.027)+(15.063), (I-300)+(3.027)+(15.064), (I-300)+(3.027)+(16.001), (I-300)+(3.027)+(16.002), (I-300)+(3.027)+(16.003), (I-300)+(3.027)+(16.004), (I-300)+(3.027)+(16.005), (I-300)+(3.027)+(16.006), (I-300)+(3.027)+(16.007), (I-300)+(3.027)+(16.008), (I-300)+(3.027)+(17.001), (I-300)+(3.027)+(17.002), (I-300)+(3.027)+(17.003), (I-300)+(3.027)+(17.004), (I-300)+(3.027)+(17.005), (I-300)+(3.027)+(17.006), (I-300)+(3.027)+(17.007), (I-300)+(3.027)+(17.008), (I-300)+(3.027)+(17.009), (I-300)+(3.027)+(17.010), (I-300)+(3.027)+(17.011), (I-300)+(3.027)+(17.012), (I-300)+(3.027)+(18.001), (I-300)+(3.028)+(3.025), (I-300)+(3.028)+(3.030), (I-300)+(3.028)+(3.031), (I-300)+(3.028)+(5.001), (I-300)+(3.028)+(5.002), (I-300)+(3.028)+(5.003), (I-300)+(3.028)+(5.004), (I-300)+(3.028)+(5.005), (I-300)+(3.028)+(5.006), (I-300)+(3.028)+(5.007), (I-300)+(3.028)+(5.008), (I-300)+(3.028)+(5.009), (I-300)+(3.028)+(5.010), (I-300)+(3.028)+(5.011), (I-300)+(3.028)+(5.012), (I-300)+(3.028)+(5.013), (I-300)+(3.028)+(5.014), (I-300)+(3.028)+(5.015), (I-300)+(3.028)+(5.016), (I-300)+(3.028)+(5.017), (I-300)+(3.028)+(5.018), (I-300)+(3.028)+(5.019), (I-300)+(3.028)+(5.020), (I-300)+(3.028)+(5.021), (I-300)+(3.028)+(5.022), (I-300)+(3.028)+(5.023), (I-300)+(3.028)+(6.001), (I-300)+(3.028)+(6.002), (I-300)+(3.028)+(6.003), (I-300)+(3.028)+(6.004), (I-300)+(3.028)+(7.001), (I-300)+(3.028)+(7.002), (I-300)+(3.028)+(7.003), (I-300)+(3.028)+(7.004), (I-300)+(3.028)+(7.005), (I-300)+(3.028)+(7.006), (I-300)+(3.028)+(9.001), (I-300)+(3.028)+(9.002), (I-300)+(3.028)+(9.003), (I-300)+(3.028)+(9.004), (I-300)+(3.028)+(9.005), (I-300)+(3.028)+(9.006), (I-300)+(3.028)+(9.007), (I-300)+(3.028)+(9.008), (I-300)+(3.028)+(9.009), (I-300)+(3.028)+(14.001), (I-300)+(3.028)+(14.002), (I-300)+(3.028)+(15.008), (I-300)+(3.028)+(15.011), (I-300)+(3.028)+(15.012), (I-300)+(3.028)+(15.016), (I-300)+(3.028)+(15.025), (I-300)+(3.028)+(15.027), (I-300)+(3.028)+(15.047), (I-300)+(3.028)+(15.063), (I-300)+(3.028)+(15.064), (I-300)+(3.028)+(16.001), (I-300)+(3.028)+(16.002), (I-300)+(3.028)+(16.003), (I-300)+(3.028)+(16.004), (I-300)+(3.028)+(16.005), (I-300)+(3.028)+(16.006), (I-300)+(3.028)+(16.007), (I-300)+(3.028)+(16.008), (I-300)+(3.028)+(17.001), (I-300)+(3.028)+(17.002), (I-300)+(3.028)+(17.003), (I-300)+(3.028)+(17.004), (I-300)+(3.028)+(17.005), (I-300)+(3.028)+(17.006), (I-300)+(3.028)+(17.007), (I-300)+(3.028)+(17.008), (I-300)+(3.028)+(17.009), (I-300)+(3.028)+(17.010), (I-300)+(3.028)+(17.011), (I-300)+(3.028)+(17.012), (I-300)+(3.028)+(18.001), (I-300)+(3.029)+(3.025), (I-300)+(3.029)+(3.030), (I-300)+(3.029)+(3.031), (I-300)+(3.029)+(5.001), (I-300)+(3.029)+(5.002), (I-300)+(3.029)+(5.003), (I-300)+(3.029)+(5.004), (I-300)+(3.029)+(5.005), (I-300)+(3.029)+(5.006), (I-300)+(3.029)+(5.007), (I-300)+(3.029)+(5.008), (I-300)+(3.029)+(5.009), (I-300)+(3.029)+(5.010), (I-300)+(3.029)+(5.011), (I-300)+(3.029)+(5.012), (I-300)+(3.029)+(5.013), (I-300)+(3.029)+(5.014), (I-300)+(3.029)+(5.015), (I-300)+(3.029)+(5.016), (I-300)+(3.029)+(5.017), (I-300)+(3.029)+(5.018), (I-300)+(3.029)+(5.019), (I-300)+(3.029)+(5.020), (I-300)+(3.029)+(5.021), (I-300)+(3.029)+(5.022), (I-300)+(3.029)+(5.023), (I-300)+(3.029)+(6.001), (I-300)+(3.029)+(6.002), (I-300)+(3.029)+(6.003), (I-300)+(3.029)+(6.004), (I-300)+(3.029)+(7.001), (I-300)+(3.029)+(7.002), (I-300)+(3.029)+(7.003), (I-300)+(3.029)+(7.004), (I-300)+(3.029)+(7.005), (I-300)+(3.029)+(7.006), (I-300)+(3.029)+(9.001), (I-300)+(3.029)+(9.002), (I-300)+(3.029)+(9.003), (I-300)+(3.029)+(9.004), (I-300)+(3.029)+(9.005), (I-300)+(3.029)+(9.006), (I-300)+(3.029)+(9.007), (I-300)+(3.029)+(9.008), (I-300)+(3.029)+(9.009), (I-300)+(3.029)+(14.001), (I-300)+(3.029)+(14.002), (I-300)+(3.029)+(15.008), (I-300)+(3.029)+(15.011), (I-300)+(3.029)+(15.012), (I-300)+(3.029)+(15.016), (I-300)+(3.029)+(15.025), (I-300)+(3.029)+(15.027), (I-300)+(3.029)+(15.047), (I-300)+(3.029)+(15.063), (I-300)+(3.029)+(15.064), (I-300)+(3.029)+(16.001), (I-300)+(3.029)+(16.002), (I-300)+(3.029)+(16.003), (I-300)+(3.029)+(16.004), (I-300)+(3.029)+(16.005), (I-300)+(3.029)+(16.006), (I-300)+(3.029)+(16.007), (I-300)+(3.029)+(16.008), (I-300)+(3.029)+(17.001), (I-300)+(3.029)+(17.002), (I-300)+(3.029)+(17.003), (I-300)+(3.029)+(17.004), (I-300)+(3.029)+(17.005), (I-300)+(3.029)+(17.006), (I-300)+(3.029)+(17.007), (I-300)+(3.029)+(17.008), (I-300)+(3.029)+(17.009), (I-300)+(3.029)+(17.010), (I-300)+(3.029)+(17.011), (I-300)+(3.029)+(17.012), (I-300)+(3.029)+(18.001), (I-300)+(3.030)+(3.025), (I-300)+(3.030)+(3.031), (I-300)+(3.030)+(5.001), (I-300)+(3.030)+(5.002), (I-300)+(3.030)+(5.003), (I-300)+(3.030)+(5.004), (I-300)+(3.030)+(5.005), (I-300)+(3.030)+(5.006), (I-300)+(3.030)+(5.007), (I-300)+(3.030)+(5.008), (I-300)+(3.030)+(5.009), (I-300)+(3.030)+(5.010), (I-300)+(3.030)+(5.011), (I-300)+(3.030)+(5.012), (I-300)+(3.030)+(5.013), (I-300)+(3.030)+(5.014), (I-300)+(3.030)+(5.015), (I-300)+(3.030)+(5.016), (I-300)+(3.030)+(5.017), (I-300)+(3.030)+(5.018), (I-300)+(3.030)+(5.019), (I-300)+(3.030)+(5.020), (I-300)+(3.030)+(5.021), (I-300)+(3.030)+(5.022), (I-300)+(3.030)+(5.023), (I-300)+(3.030)+(6.001), (I-300)+(3.030)+(6.002), (I-300)+(3.030)+(6.003), (I-300)+(3.030)+(6.004), (I-300)+(3.030)+(7.001), (I-300)+(3.030)+(7.002), (I-300)+(3.030)+(7.003), (I-300)+(3.030)+(7.004), (I-300)+(3.030)+(7.005), (I-300)+(3.030)+(7.006), (I-300)+(3.030)+(9.001), (I-300)+(3.030)+(9.002), (I-300)+(3.030)+(9.003), (I-300)+(3.030)+(9.004), (I-300)+(3.030)+(9.005), (I-300)+(3.030)+(9.006), (I-300)+(3.030)+(9.007), (I-300)+(3.030)+(9.008), (I-300)+(3.030)+(9.009), (I-300)+(3.030)+(14.001), (I-300)+(3.030)+(14.002), (I-300)+(3.030)+(15.008), (I-300)+(3.030)+(15.011), (I-300)+(3.030)+(15.012), (I-300)+(3.030)+(15.016), (I-300)+(3.030)+(15.025), (I-300)+(3.030)+(15.027), (I-300)+(3.030)+(15.047), (I-300)+(3.030)+(15.063), (I-300)+(3.030)+(15.064), (I-300)+(3.030)+(16.001), (I-300)+(3.030)+(16.002), (I-300)+(3.030)+(16.003), (I-300)+(3.030)+(16.004), (I-300)+(3.030)+(16.005), (I-300)+(3.030)+(16.006), (I-300)+(3.030)+(16.007), (I-300)+(3.030)+(16.008), (I-300)+(3.030)+(17.001), (I-300)+(3.030)+(17.002), (I-300)+(3.030)+(17.003), (I-300)+(3.030)+(17.004), (I-300)+(3.030)+(17.005), (I-300)+(3.030)+(17.006), (I-300)+(3.030)+(17.007), (I-300)+(3.030)+(17.008), (I-300)+(3.030)+(17.009), (I-300)+(3.030)+(17.010), (I-300)+(3.030)+(17.011), (I-300)+(3.030)+(17.012), (I-300)+(3.030)+(18.001), (I-300)+(3.031)+(3.025), (I-300)+(3.031)+(3.030), (I-300)+(3.031)+(5.001), (I-300)+(3.031)+(5.002), (I-300)+(3.031)+(5.003), (I-300)+(3.031)+(5.004), (I-300)+(3.031)+(5.005), (I-300)+(3.031)+(5.006), (I-300)+(3.031)+(5.007), (I-300)+(3.031)+(5.008), (I-300)+(3.031)+(5.009), (I-300)+(3.031)+(5.010), (I-300)+(3.031)+(5.011), (I-300)+(3.031)+(5.012), (I-300)+(3.031)+(5.013), (I-300)+(3.031)+(5.014), (I-300)+(3.031)+(5.015), (I-300)+(3.031)+(5.016), (I-300)+(3.031)+(5.017), (I-300)+(3.031)+(5.018), (I-300)+(3.031)+(5.019), (I-300)+(3.031)+(5.020), (I-300)+(3.031)+(5.021), (I-300)+(3.031)+(5.022), (I-300)+(3.031)+(5.023), (I-300)+(3.031)+(6.001), (I-300)+(3.031)+(6.002), (I-300)+(3.031)+(6.003), (I-300)+(3.031)+(6.004), (I-300)+(3.031)+(7.001), (I-300)+(3.031)+(7.002), (I-300)+(3.031)+(7.003), (I-300)+(3.031)+(7.004), (I-300)+(3.031)+(7.005), (I-300)+(3.031)+(7.006), (I-300)+(3.031)+(9.001), (I-300)+(3.031)+(9.002), (I-300)+(3.031)+(9.003), (I-300)+(3.031)+(9.004), (I-300)+(3.031)+(9.005), (I-300)+(3.031)+(9.006), (I-300)+(3.031)+(9.007), (I-300)+(3.031)+(9.008), (I-300)+(3.031)+(9.009), (I-300)+(3.031)+(14.001), (I-300)+(3.031)+(14.002), (I-300)+(3.031)+(15.008), (I-300)+(3.031)+(15.011), (I-300)+(3.031)+(15.012), (I-300)+(3.031)+(15.016), (I-300)+(3.031)+(15.025), (I-300)+(3.031)+(15.027), (I-300)+(3.031)+(15.047), (I-300)+(3.031)+(15.063), (I-300)+(3.031)+(15.064), (I-300)+(3.031)+(16.001), (I-300)+(3.031)+(16.002), (I-300)+(3.031)+(16.003), (I-300)+(3.031)+(16.004), (I-300)+(3.031)+(16.005), (I-300)+(3.031)+(16.006), (I-300)+(3.031)+(16.007), (I-300)+(3.031)+(16.008), (I-300)+(3.031)+(17.001), (I-300)+(3.031)+(17.002), (I-300)+(3.031)+(17.003), (I-300)+(3.031)+(17.004), (I-300)+(3.031)+(17.005), (I-300)+(3.031)+(17.006), (I-300)+(3.031)+(17.007), (I-300)+(3.031)+(17.008), (I-300)+(3.031)+(17.009), (I-300)+(3.031)+(17.010), (I-300)+(3.031)+(17.011), (I-300)+(3.031)+(17.012), (I-300)+(3.031)+(18.001), (I-300)+(5.001)+(9.001), (I-300)+(5.001)+(9.002), (I-300)+(5.001)+(9.003), (I-300)+(5.001)+(9.004), (I-300)+(5.001)+(9.005), (I-300)+(5.001)+(9.006), (I-300)+(5.001)+(9.007), (I-300)+(5.001)+(9.008), (I-300)+(5.001)+(9.009), (I-300)+(5.001)+(15.012), (I-300)+(5.001)+(15.016), (I-300)+(5.001)+(15.025), (I-300)+(5.001)+(15.027), (I-300)+(5.001)+(15.047), (I-300)+(5.001)+(15.063), (I-300)+(5.001)+(15.064), (I-300)+(5.002)+(9.001), (I-300)+(5.002)+(9.002), (I-300)+(5.002)+(9.003), (I-300)+(5.002)+(9.004), (I-300)+(5.002)+(9.005), (I-300)+(5.002)+(9.006), (I-300)+(5.002)+(9.007), (I-300)+(5.002)+(9.008), (I-300)+(5.002)+(9.009), (I-300)+(5.002)+(15.012), (I-300)+(5.002)+(15.016), (I-300)+(5.002)+(15.025), (I-300)+(5.002)+(15.027), (I-300)+(5.002)+(15.047), (I-300)+(5.002)+(15.063), (I-300)+(5.002)+(15.064), (I-300)+(5.003)+(9.001), (I-300)+(5.003)+(9.002), (I-300)+(5.003)+(9.003), (I-300)+(5.003)+(9.004), (I-300)+(5.003)+(9.005), (I-300)+(5.003)+(9.006), (I-300)+(5.003)+(9.007), (I-300)+(5.003)+(9.008), (I-300)+(5.003)+(9.009), (I-300)+(5.003)+(15.012), (I-300)+(5.003)+(15.016), (I-300)+(5.003)+(15.025), (I-300)+(5.003)+(15.027), (I-300)+(5.003)+(15.047), (I-300)+(5.003)+(15.063), (I-300)+(5.003)+(15.064), (I-300)+(5.004)+(9.001), (I-300)+(5.004)+(9.002), (I-300)+(5.004)+(9.003), (I-300)+(5.004)+(9.004), (I-300)+(5.004)+(9.005), (I-300)+(5.004)+(9.006), (I-300)+(5.004)+(9.007), (I-300)+(5.004)+(9.008), (I-300)+(5.004)+(9.009), (I-300)+(5.004)+(15.012), (I-300)+(5.004)+(15.016), (I-300)+(5.004)+(15.025), (I-300)+(5.004)+(15.027), (I-300)+(5.004)+(15.047), (I-300)+(5.004)+(15.063), (I-300)+(5.004)+(15.064), (I-300)+(5.005)+(9.001), (I-300)+(5.005)+(9.002), (I-300)+(5.005)+(9.003), (I-300)+(5.005)+(9.004), (I-300)+(5.005)+(9.005), (I-300)+(5.005)+(9.006), (I-300)+(5.005)+(9.007), (I-300)+(5.005)+(9.008), (I-300)+(5.005)+(9.009), (I-300)+(5.005)+(15.012), (I-300)+(5.005)+(15.016), (I-300)+(5.005)+(15.025), (I-300)+(5.005)+(15.027), (I-300)+(5.005)+(15.047), (I-300)+(5.005)+(15.063), (I-300)+(5.005)+(15.064), (I-300)+(5.006)+(9.001), (I-300)+(5.006)+(9.002), (I-300)+(5.006)+(9.003), (I-300)+(5.006)+(9.004), (I-300)+(5.006)+(9.005), (I-300)+(5.006)+(9.006), (I-300)+(5.006)+(9.007), (I-300)+(5.006)+(9.008), (I-300)+(5.006)+(9.009), (I-300)+(5.006)+(15.012), (I-300)+(5.006)+(15.016), (I-300)+(5.006)+(15.025), (I-300)+(5.006)+(15.027), (I-300)+(5.006)+(15.047), (I-300)+(5.006)+(15.063), (I-300)+(5.006)+(15.064), (I-300)+(5.007)+(9.001), (I-300)+(5.007)+(9.002), (I-300)+(5.007)+(9.003), (I-300)+(5.007)+(9.004), (I-300)+(5.007)+(9.005), (I-300)+(5.007)+(9.006), (I-300)+(5.007)+(9.007), (I-300)+(5.007)+(9.008), (I-300)+(5.007)+(9.009), (I-300)+(5.007)+(15.012), (I-300)+(5.007)+(15.016), (I-300)+(5.007)+(15.025), (I-300)+(5.007)+(15.027), (I-300)+(5.007)+(15.047), (I-300)+(5.007)+(15.063), (I-300)+(5.007)+(15.064), (I-300)+(5.008)+(9.001), (I-300)+(5.008)+(9.002), (I-300)+(5.008)+(9.003), (I-300)+(5.008)+(9.004), (I-300)+(5.008)+(9.005), (I-300)+(5.008)+(9.006), (I-300)+(5.008)+(9.007), (I-300)+(5.008)+(9.008), (I-300)+(5.008)+(9.009), (I-300)+(5.008)+(15.012), (I-300)+(5.008)+(15.016), (I-300)+(5.008)+(15.025), (I-300)+(5.008)+(15.027), (I-300)+(5.008)+(15.047), (I-300)+(5.008)+(15.063), (I-300)+(5.008)+(15.064), (I-300)+(5.009)+(9.001), (I-300)+(5.009)+(9.002), (I-300)+(5.009)+(9.003), (I-300)+(5.009)+(9.004), (I-300)+(5.009)+(9.005), (I-300)+(5.009)+(9.006), (I-300)+(5.009)+(9.007), (I-300)+(5.009)+(9.008), (I-300)+(5.009)+(9.009), (I-300)+(5.009)+(15.012), (I-300)+(5.009)+(15.016), (I-300)+(5.009)+(15.025), (I-300)+(5.009)+(15.027), (I-300)+(5.009)+(15.047), (I-300)+(5.009)+(15.063), (I-300)+(5.009)+(15.064), (I-300)+(5.010)+(9.001), (I-300)+(5.010)+(9.002), (I-300)+(5.010)+(9.003), (I-300)+(5.010)+(9.004), (I-300)+(5.010)+(9.005), (I-300)+(5.010)+(9.006), (I-300)+(5.010)+(9.007), (I-300)+(5.010)+(9.008), (I-300)+(5.010)+(9.009), (I-300)+(5.010)+(15.012), (I-300)+(5.010)+(15.016), (I-300)+(5.010)+(15.025), (I-300)+(5.010)+(15.027), (I-300)+(5.010)+(15.047), (I-300)+(5.010)+(15.063), (I-300)+(5.010)+(15.064), (I-300)+(5.011)+(9.001), (I-300)+(5.011)+(9.002), (I-300)+(5.011)+(9.003), (I-300)+(5.011)+(9.004), (I-300)+(5.011)+(9.005), (I-300)+(5.011)+(9.006), (I-300)+(5.011)+(9.007), (I-300)+(5.011)+(9.008), (I-300)+(5.011)+(9.009), (I-300)+(5.011)+(15.012), (I-300)+(5.011)+(15.016), (I-300)+(5.011)+(15.025), (I-300)+(5.011)+(15.027), (I-300)+(5.011)+(15.047), (I-300)+(5.011)+(15.063), (I-300)+(5.011)+(15.064), (I-300)+(5.012)+(9.001), (I-300)+(5.012)+(9.002), (I-300)+(5.012)+(9.003), (I-300)+(5.012)+(9.004), (I-300)+(5.012)+(9.005), (I-300)+(5.012)+(9.006), (I-300)+(5.012)+(9.007), (I-300)+(5.012)+(9.008), (I-300)+(5.012)+(9.009), (I-300)+(5.012)+(15.012), (I-300)+(5.012)+(15.016), (I-300)+(5.012)+(15.025), (I-300)+(5.012)+(15.027), (I-300)+(5.012)+(15.047), (I-300)+(5.012)+(15.063), (I-300)+(5.012)+(15.064), (I-300)+(5.013)+(9.001), (I-300)+(5.013)+(9.002), (I-300)+(5.013)+(9.003), (I-300)+(5.013)+(9.004), (I-300)+(5.013)+(9.005), (I-300)+(5.013)+(9.006), (I-300)+(5.013)+(9.007), (I-300)+(5.013)+(9.008), (I-300)+(5.013)+(9.009), (I-300)+(5.013)+(15.012), (I-300)+(5.013)+(15.016), (I-300)+(5.013)+(15.025), (I-300)+(5.013)+(15.027), (I-300)+(5.013)+(15.047), (I-300)+(5.013)+(15.063), (I-300)+(5.013)+(15.064), (I-300)+(5.014)+(9.001), (I-300)+(5.014)+(9.002), (I-300)+(5.014)+(9.003), (I-300)+(5.014)+(9.004), (I-300)+(5.014)+(9.005), (I-300)+(5.014)+(9.006), (I-300)+(5.014)+(9.007), (I-300)+(5.014)+(9.008), (I-300)+(5.014)+(9.009), (I-300)+(5.014)+(15.012), (I-300)+(5.014)+(15.016), (I-300)+(5.014)+(15.025), (I-300)+(5.014)+(15.027), (I-300)+(5.014)+(15.047), (I-300)+(5.014)+(15.063), (I-300)+(5.014)+(15.064), (I-300)+(5.015)+(9.001), (I-300)+(5.015)+(9.002), (I-300)+(5.015)+(9.003), (I-300)+(5.015)+(9.004), (I-300)+(5.015)+(9.005), (I-300)+(5.015)+(9.006), (I-300)+(5.015)+(9.007), (I-300)+(5.015)+(9.008), (I-300)+(5.015)+(9.009), (I-300)+(5.015)+(15.012), (I-300)+(5.015)+(15.016), (I-300)+(5.015)+(15.025), (I-300)+(5.015)+(15.027), (I-300)+(5.015)+(15.047), (I-300)+(5.015)+(15.063), (I-300)+(5.015)+(15.064), (I-300)+(5.016)+(9.001), (I-300)+(5.016)+(9.002), (I-300)+(5.016)+(9.003), (I-300)+(5.016)+(9.004), (I-300)+(5.016)+(9.005), (I-300)+(5.016)+(9.006), (I-300)+(5.016)+(9.007), (I-300)+(5.016)+(9.008), (I-300)+(5.016)+(9.009), (I-300)+(5.016)+(15.012), (I-300)+(5.016)+(15.016), (I-300)+(5.016)+(15.025), (I-300)+(5.016)+(15.027), (I-300)+(5.016)+(15.047), (I-300)+(5.016)+(15.063), (I-300)+(5.016)+(15.064), (I-300)+(5.017)+(9.001), (I-300)+(5.017)+(9.002), (I-300)+(5.017)+(9.003), (I-300)+(5.017)+(9.004), (I-300)+(5.017)+(9.005), (I-300)+(5.017)+(9.006), (I-300)+(5.017)+(9.007), (I-300)+(5.017)+(9.008), (I-300)+(5.017)+(9.009), (I-300)+(5.017)+(15.012), (I-300)+(5.017)+(15.016), (I-300)+(5.017)+(15.025), (I-300)+(5.017)+(15.027), (I-300)+(5.017)+(15.047), (I-300)+(5.017)+(15.063), (I-300)+(5.017)+(15.064), (I-300)+(5.018)+(9.001), (I-300)+(5.018)+(9.002), (I-300)+(5.018)+(9.003), (I-300)+(5.018)+(9.004), (I-300)+(5.018)+(9.005), (I-300)+(5.018)+(9.006), (I-300)+(5.018)+(9.007), (I-300)+(5.018)+(9.008), (I-300)+(5.018)+(9.009), (I-300)+(5.018)+(15.012), (I-300)+(5.018)+(15.016), (I-300)+(5.018)+(15.025), (I-300)+(5.018)+(15.027), (I-300)+(5.018)+(15.047), (I-300)+(5.018)+(15.063), (I-300)+(5.018)+(15.064), (I-300)+(5.019)+(9.001), (I-300)+(5.019)+(9.002), (I-300)+(5.019)+(9.003), (I-300)+(5.019)+(9.004), (I-300)+(5.019)+(9.005), (I-300)+(5.019)+(9.006), (I-300)+(5.019)+(9.007), (I-300)+(5.019)+(9.008), (I-300)+(5.019)+(9.009), (I-300)+(5.019)+(15.012), (I-300)+(5.019)+(15.016), (I-300)+(5.019)+(15.025), (I-300)+(5.019)+(15.027), (I-300)+(5.019)+(15.047), (I-300)+(5.019)+(15.063), (I-300)+(5.019)+(15.064), (I-300)+(5.020)+(9.001), (I-300)+(5.020)+(9.002), (I-300)+(5.020)+(9.003), (I-300)+(5.020)+(9.004), (I-300)+(5.020)+(9.005), (I-300)+(5.020)+(9.006), (I-300)+(5.020)+(9.007), (I-300)+(5.020)+(9.008), (I-300)+(5.020)+(9.009), (I-300)+(5.020)+(15.012), (I-300)+(5.020)+(15.016), (I-300)+(5.020)+(15.025), (I-300)+(5.020)+(15.027), (I-300)+(5.020)+(15.047), (I-300)+(5.020)+(15.063), (I-300)+(5.020)+(15.064), (I-300)+(5.021)+(9.001), (I-300)+(5.021)+(9.002), (I-300)+(5.021)+(9.003), (I-300)+(5.021)+(9.004), (I-300)+(5.021)+(9.005), (I-300)+(5.021)+(9.006), (I-300)+(5.021)+(9.007), (I-300)+(5.021)+(9.008), (I-300)+(5.021)+(9.009), (I-300)+(5.021)+(15.012), (I-300)+(5.021)+(15.016), (I-300)+(5.021)+(15.025), (I-300)+(5.021)+(15.027), (I-300)+(5.021)+(15.047), (I-300)+(5.021)+(15.063), (I-300)+(5.021)+(15.064), (I-300)+(5.022)+(9.001), (I-300)+(5.022)+(9.002), (I-300)+(5.022)+(9.003), (I-300)+(5.022)+(9.004), (I-300)+(5.022)+(9.005), (I-300)+(5.022)+(9.006), (I-300)+(5.022)+(9.007), (I-300)+(5.022)+(9.008), (I-300)+(5.022)+(9.009), (I-300)+(5.022)+(15.012), (I-300)+(5.022)+(15.016), (I-300)+(5.022)+(15.025), (I-300)+(5.022)+(15.027), (I-300)+(5.022)+(15.047), (I-300)+(5.022)+(15.063), (I-300)+(5.022)+(15.064), (I-300)+(5.023)+(9.001), (I-300)+(5.023)+(9.002), (I-300)+(5.023)+(9.003), (I-300)+(5.023)+(9.004), (I-300)+(5.023)+(9.005), (I-300)+(5.023)+(9.006), (I-300)+(5.023)+(9.007), (I-300)+(5.023)+(9.008), (I-300)+(5.023)+(9.009), (I-300)+(5.023)+(15.012), (I-300)+(5.023)+(15.016), (I-300)+(5.023)+(15.025), (I-300)+(5.023)+(15.027), (I-300)+(5.023)+(15.047), (I-300)+(5.023)+(15.063), (I-300)+(5.023)+(15.064).

If two compounds (B) are present in the combinations according to the invention, preferred compound combinations are also selected from the group (G4-C) consisting of the following mixtures:

(I-302)+(1.001)+(1.002), (I-302)+(1.001)+(1.003), (I-302)+(1.001)+(1.004), (I-302)+(1.001)+(1.005), (I-302)+(1.001)+(1.006), (I-302)+(1.001)+(1.007), (I-302)+(1.001)+(1.008), (I-302)+(1.001)+(1.009), (I-302)+(1.001)+(1.010), (I-302)+(1.001)+(1.011), (I-302)+(1.001)+(1.012), (I-302)+(1.001)+(1.013), (I-302)+(1.001)+(1.014), (I-302)+(1.001)+(1.015), (I-302)+(1.001)+(1.016), (I-302)+(1.001)+(1.017), (I-302)+(1.001)+(1.018), (I-302)+(1.001)+(1.019), (I-302)+(1.001)+(1.020), (I-302)+(1.001)+(1.021), (I-302)+(1.001)+(1.022), (I-302)+(1.001)+(1.023), (I-302)+(1.001)+(1.024), (I-302)+(1.001)+(1.025), (I-302)+(1.001)+(1.026), (I-302)+(1.001)+(1.027), (I-302)+(1.001)+(1.028), (I-302)+(1.001)+(1.029), (I-302)+(1.001)+(1.030), (I-302)+(1.001)+(1.031), (I-302)+(1.001)+(1.032), (I-302)+(1.001)+(1.033), (I-302)+(1.001)+(1.034), (I-302)+(1.001)+(1.035), (I-302)+(1.001)+(1.036), (I-302)+(1.001)+(1.037), (I-302)+(1.001)+(1.038), (I-302)+(1.001)+(1.039), (I-302)+(1.001)+(1.040), (I-302)+(1.001)+(1.041), (I-302)+(1.001)+(1.042), (I-302)+(1.001)+(1.043), (I-302)+(1.001)+(1.044), (I-302)+(1.001)+(1.045), (I-302)+(1.001)+(1.046), (I-302)+(1.001)+(1.047), (I-302)+(1.001)+(1.048), (I-302)+(1.001)+(1.049), (I-302)+(1.001)+(1.050), (I-302)+(1.001)+(1.051), (I-302)+(1.001)+(1.052), (I-302)+(1.001)+(1.053), (I-302)+(1.001)+(1.054), (I-302)+(1.001)+(1.055), (I-302)+(1.001)+(1.056), (I-302)+(1.001)+(1.057), (I-302)+(1.001)+(1.058), (I-302)+(1.001)+(1.059), (I-302)+(1.001)+(1.060), (I-302)+(1.001)+(1.061), (I-302)+(1.001)+(1.062), (I-302)+(1.001)+(1.063), (I-302)+(1.001)+(1.064), (I-302)+(1.001)+(1.065), (I-302)+(1.001)+(1.066), (I-302)+(1.001)+(1.067), (I-302)+(1.001)+(1.068), (I-302)+(1.001)+(1.069), (I-302)+(1.001)+(1.070), (I-302)+(1.001)+(1.071), (I-302)+(1.001)+(1.072), (I-302)+(1.001)+(1.073), (I-302)+(1.001)+(1.074), (I-302)+(1.001)+(1.075), (I-302)+(1.001)+(1.076), (I-302)+(1.001)+(1.077), (I-302)+(1.001)+(1.078), (I-302)+(1.001)+(1.079), (I-302)+(1.001)+(1.080), (I-302)+(1.001)+(1.081), (I-302)+(1.001)+(1.082), (I-302)+(1.001)+(1.083), (I-302)+(1.001)+(1.084), (I-302)+(1.001)+(1.085), (I-302)+(1.001)+(1.086), (I-302)+(1.001)+(1.087), (I-302)+(1.001)+(1.088), (I-302)+(1.001)+(1.089), (I-302)+(1.001)+(1.090), (I-302)+(1.001)+(1.091), (I-302)+(1.001)+(1.092), (I-302)+(1.001)+(2.001), (I-302)+(1.001)+(2.002), (I-302)+(1.001)+(2.003), (I-302)+(1.001)+(2.004), (I-302)+(1.001)+(2.005), (I-302)+(1.001)+(2.006), (I-302)+(1.001)+(2.007), (I-302)+(1.001)+(2.008), (I-302)+(1.001)+(2.009), (I-302)+(1.001)+(2.010), (I-302)+(1.001)+(2.011), (I-302)+(1.001)+(2.012), (I-302)+(1.001)+(2.013), (I-302)+(1.001)+(2.014), (I-302)+(1.001)+(2.015), (I-302)+(1.001)+(2.016), (I-302)+(1.001)+(2.017), (I-302)+(1.001)+(2.018), (I-302)+(1.001)+(2.019), (I-302)+(1.001)+(2.020), (I-302)+(1.001)+(2.021), (I-302)+(1.001)+(2.022), (I-302)+(1.001)+(2.023), (I-302)+(1.001)+(2.024), (I-302)+(1.001)+(2.025), (I-302)+(1.001)+(2.026), (I-302)+(1.001)+(2.027), (I-302)+(1.001)+(2.028), (I-302)+(1.001)+(2.029), (I-302)+(1.001)+(2.030), (I-302)+(1.001)+(2.031), (I-302)+(1.001)+(2.032), (I-302)+(1.001)+(2.033), (I-302)+(1.001)+(2.034), (I-302)+(1.001)+(2.035), (I-302)+(1.001)+(2.036), (I-302)+(1.001)+(2.037), (I-302)+(1.001)+(2.038), (I-302)+(1.001)+(2.039), (I-302)+(1.001)+(2.040), (I-302)+(1.001)+(2.041), (I-302)+(1.001)+(2.042), (I-302)+(1.001)+(2.043), (I-302)+(1.001)+(2.044), (I-302)+(1.001)+(2.045), (I-302)+(1.001)+(2.046), (I-302)+(1.001)+(2.047), (I-302)+(1.001)+(2.048), (I-302)+(1.001)+(2.049), (I-302)+(1.001)+(2.050), (I-302)+(1.001)+(2.051), (I-302)+(1.001)+(2.052), (I-302)+(1.001)+(2.053), (I-302)+(1.001)+(2.054), (I-302)+(1.001)+(2.055), (I-302)+(1.001)+(2.056), (I-302)+(1.001)+(2.057), (I-302)+(1.001)+(2.058), (I-302)+(1.001)+(2.059), (I-302)+(1.001)+(3.001), (I-302)+(1.001)+(3.002), (I-302)+(1.001)+(3.003), (I-302)+(1.001)+(3.004), (I-302)+(1.001)+(3.005), (I-302)+(1.001)+(3.006), (I-302)+(1.001)+(3.007), (I-302)+(1.001)+(3.008), (I-302)+(1.001)+(3.009), (I-302)+(1.001)+(3.010), (I-302)+(1.001)+(3.011), (I-302)+(1.001)+(3.012), (I-302)+(1.001)+(3.013), (I-302)+(1.001)+(3.014), (I-302)+(1.001)+(3.015), (I-302)+(1.001)+(3.016), (I-302)+(1.001)+(3.017), (I-302)+(1.001)+(3.018), (I-302)+(1.001)+(3.019), (I-302)+(1.001)+(3.020), (I-302)+(1.001)+(3.021), (I-302)+(1.001)+(3.022), (I-302)+(1.001)+(3.023), (I-302)+(1.001)+(3.024), (I-302)+(1.001)+(3.025), (I-302)+(1.001)+(3.026), (I-302)+(1.001)+(3.027), (I-302)+(1.001)+(3.028), (I-302)+(1.001)+(3.029), (I-302)+(1.001)+(3.030), (I-302)+(1.001)+(3.031), (I-302)+(1.001)+(5.001), (I-302)+(1.001)+(5.002), (I-302)+(1.001)+(5.003), (I-302)+(1.001)+(5.004), (I-302)+(1.001)+(5.005), (I-302)+(1.001)+(5.006), (I-302)+(1.001)+(5.007), (I-302)+(1.001)+(5.008), (I-302)+(1.001)+(5.009), (I-302)+(1.001)+(5.010), (I-302)+(1.001)+(5.011), (I-302)+(1.001)+(5.012), (I-302)+(1.001)+(5.013), (I-302)+(1.001)+(5.014), (I-302)+(1.001)+(5.015), (I-302)+(1.001)+(5.016), (I-302)+(1.001)+(5.017), (I-302)+(1.001)+(5.018), (I-302)+(1.001)+(5.019), (I-302)+(1.001)+(5.020), (I-302)+(1.001)+(5.021), (I-302)+(1.001)+(5.022), (I-302)+(1.001)+(5.023), (I-302)+(1.001)+(6.001), (I-302)+(1.001)+(6.002), (I-302)+(1.001)+(6.003), (I-302)+(1.001)+(6.004), (I-302)+(1.001)+(7.001), (I-302)+(1.001)+(7.002), (I-302)+(1.001)+(7.003), (I-302)+(1.001)+(7.004), (I-302)+(1.001)+(7.005), (I-302)+(1.001)+(7.006), (I-302)+(1.001)+(9.001), (I-302)+(1.001)+(9.002), (I-302)+(1.001)+(9.003), (I-302)+(1.001)+(9.004), (I-302)+(1.001)+(9.005), (I-302)+(1.001)+(9.006), (I-302)+(1.001)+(9.007), (I-302)+(1.001)+(9.008), (I-302)+(1.001)+(9.009), (I-302)+(1.001)+(14.001), (I-302)+(1.001)+(14.002), (I-302)+(1.001)+(15.008), (I-302)+(1.001)+(15.011), (I-302)+(1.001)+(15.012), (I-302)+(1.001)+(15.016), (I-302)+(1.001)+(15.025), (I-302)+(1.001)+(15.027), (I-302)+(1.001)+(15.047), (I-302)+(1.001)+(15.063), (I-302)+(1.001)+(15.064), (I-302)+(1.001)+(16.001), (I-302)+(1.001)+(16.002), (I-302)+(1.001)+(16.003), (I-302)+(1.001)+(16.004), (I-302)+(1.001)+(16.005), (I-302)+(1.001)+(16.006), (I-302)+(1.001)+(16.007), (I-302)+(1.001)+(16.008), (I-302)+(1.001)+(17.001), (I-302)+(1.001)+(17.002), (I-302)+(1.001)+(17.003), (I-302)+(1.001)+(17.004), (I-302)+(1.001)+(17.005), (I-302)+(1.001)+(17.006), (I-302)+(1.001)+(17.007), (I-302)+(1.001)+(17.008), (I-302)+(1.001)+(17.009), (I-302)+(1.001)+(17.010), (I-302)+(1.001)+(17.011), (I-302)+(1.001)+(17.012), (I-302)+(1.001)+(18.001), (I-302)+(1.002)+(1.003), (I-302)+(1.002)+(1.004), (I-302)+(1.002)+(1.005), (I-302)+(1.002)+(1.006), (I-302)+(1.002)+(1.007), (I-302)+(1.002)+(1.008), (I-302)+(1.002)+(1.009), (I-302)+(1.002)+(1.010), (I-302)+(1.002)+(1.011), (I-302)+(1.002)+(1.012), (I-302)+(1.002)+(1.013), (I-302)+(1.002)+(1.014), (I-302)+(1.002)+(1.015), (I-302)+(1.002)+(1.016), (I-302)+(1.002)+(1.017), (I-302)+(1.002)+(1.018), (I-302)+(1.002)+(1.019), (I-302)+(1.002)+(1.020), (I-302)+(1.002)+(1.021), (I-302)+(1.002)+(1.022), (I-302)+(1.002)+(1.023), (I-302)+(1.002)+(1.024), (I-302)+(1.002)+(1.025), (I-302)+(1.002)+(1.026), (I-302)+(1.002)+(1.027), (I-302)+(1.002)+(1.028), (I-302)+(1.002)+(1.029), (I-302)+(1.002)+(1.030), (I-302)+(1.002)+(1.031), (I-302)+(1.002)+(1.032), (I-302)+(1.002)+(1.033), (I-302)+(1.002)+(1.034), (I-302)+(1.002)+(1.035), (I-302)+(1.002)+(1.036), (I-302)+(1.002)+(1.037), (I-302)+(1.002)+(1.038), (I-302)+(1.002)+(1.039), (I-302)+(1.002)+(1.040), (I-302)+(1.002)+(1.041), (I-302)+(1.002)+(1.042), (I-302)+(1.002)+(1.043), (I-302)+(1.002)+(1.044), (I-302)+(1.002)+(1.045), (I-302)+(1.002)+(1.046), (I-302)+(1.002)+(1.047), (I-302)+(1.002)+(1.048), (I-302)+(1.002)+(1.049), (I-302)+(1.002)+(1.050), (I-302)+(1.002)+(1.051), (I-302)+(1.002)+(1.052), (I-302)+(1.002)+(1.053), (I-302)+(1.002)+(1.054), (I-302)+(1.002)+(1.055), (I-302)+(1.002)+(1.056), (I-302)+(1.002)+(1.057), (I-302)+(1.002)+(1.058), (I-302)+(1.002)+(1.059), (I-302)+(1.002)+(1.060), (I-302)+(1.002)+(1.061), (I-302)+(1.002)+(1.062), (I-302)+(1.002)+(1.063), (I-302)+(1.002)+(1.064), (I-302)+(1.002)+(1.065), (I-302)+(1.002)+(1.066), (I-302)+(1.002)+(1.067), (I-302)+(1.002)+(1.068), (I-302)+(1.002)+(1.069), (I-302)+(1.002)+(1.070), (I-302)+(1.002)+(1.071), (I-302)+(1.002)+(1.072), (I-302)+(1.002)+(1.073), (I-302)+(1.002)+(1.074), (I-302)+(1.002)+(1.075), (I-302)+(1.002)+(1.076), (I-302)+(1.002)+(1.077), (I-302)+(1.002)+(1.078), (I-302)+(1.002)+(1.079), (I-302)+(1.002)+(1.080), (I-302)+(1.002)+(1.081), (I-302)+(1.002)+(1.082), (I-302)+(1.002)+(1.083), (I-302)+(1.002)+(1.084), (I-302)+(1.002)+(1.085), (I-302)+(1.002)+(1.086), (I-302)+(1.002)+(1.087), (I-302)+(1.002)+(1.088), (I-302)+(1.002)+(1.089), (I-302)+(1.002)+(1.090), (I-302)+(1.002)+(1.091), (I-302)+(1.002)+(1.092), (I-302)+(1.002)+(2.001), (I-302)+(1.002)+(2.002), (I-302)+(1.002)+(2.003), (I-302)+(1.002)+(2.004), (I-302)+(1.002)+(2.005), (I-302)+(1.002)+(2.006), (I-302)+(1.002)+(2.007), (I-302)+(1.002)+(2.008), (I-302)+(1.002)+(2.009), (I-302)+(1.002)+(2.010), (I-302)+(1.002)+(2.011), (I-302)+(1.002)+(2.012), (I-302)+(1.002)+(2.013), (I-302)+(1.002)+(2.014), (I-302)+(1.002)+(2.015), (I-302)+(1.002)+(2.016), (I-302)+(1.002)+(2.017), (I-302)+(1.002)+(2.018), (I-302)+(1.002)+(2.019), (I-302)+(1.002)+(2.020), (I-302)+(1.002)+(2.021), (I-302)+(1.002)+(2.022), (I-302)+(1.002)+(2.023), (I-302)+(1.002)+(2.024), (I-302)+(1.002)+(2.025), (I-302)+(1.002)+(2.026), (I-302)+(1.002)+(2.027), (I-302)+(1.002)+(2.028), (I-302)+(1.002)+(2.029), (I-302)+(1.002)+(2.030), (I-302)+(1.002)+(2.031), (I-302)+(1.002)+(2.032), (I-302)+(1.002)+(2.033), (I-302)+(1.002)+(2.034), (I-302)+(1.002)+(2.035), (I-302)+(1.002)+(2.036), (I-302)+(1.002)+(2.037), (I-302)+(1.002)+(2.038), (I-302)+(1.002)+(2.039), (I-302)+(1.002)+(2.040), (I-302)+(1.002)+(2.041), (I-302)+(1.002)+(2.042), (I-302)+(1.002)+(2.043), (I-302)+(1.002)+(2.044), (I-302)+(1.002)+(2.045), (I-302)+(1.002)+(2.046), (I-302)+(1.002)+(2.047), (I-302)+(1.002)+(2.048), (I-302)+(1.002)+(2.049), (I-302)+(1.002)+(2.050), (I-302)+(1.002)+(2.051), (I-302)+(1.002)+(2.052), (I-302)+(1.002)+(2.053), (I-302)+(1.002)+(2.054), (I-302)+(1.002)+(2.055), (I-302)+(1.002)+(2.056), (I-302)+(1.002)+(2.057), (I-302)+(1.002)+(2.058), (I-302)+(1.002)+(2.059), (I-302)+(1.002)+(3.001), (I-302)+(1.002)+(3.002), (I-302)+(1.002)+(3.003), (I-302)+(1.002)+(3.004), (I-302)+(1.002)+(3.005), (I-302)+(1.002)+(3.006), (I-302)+(1.002)+(3.007), (I-302)+(1.002)+(3.008), (I-302)+(1.002)+(3.009), (I-302)+(1.002)+(3.010), (I-302)+(1.002)+(3.011), (I-302)+(1.002)+(3.012), (I-302)+(1.002)+(3.013), (I-302)+(1.002)+(3.014), (I-302)+(1.002)+(3.015), (I-302)+(1.002)+(3.016), (I-302)+(1.002)+(3.017), (I-302)+(1.002)+(3.018), (I-302)+(1.002)+(3.019), (I-302)+(1.002)+(3.020), (I-302)+(1.002)+(3.021), (I-302)+(1.002)+(3.022), (I-302)+(1.002)+(3.023), (I-302)+(1.002)+(3.024), (I-302)+(1.002)+(3.025), (I-302)+(1.002)+(3.026), (I-302)+(1.002)+(3.027), (I-302)+(1.002)+(3.028), (I-302)+(1.002)+(3.029), (I-302)+(1.002)+(3.030), (I-302)+(1.002)+(3.031), (I-302)+(1.002)+(5.001), (I-302)+(1.002)+(5.002), (I-302)+(1.002)+(5.003), (I-302)+(1.002)+(5.004), (I-302)+(1.002)+(5.005), (I-302)+(1.002)+(5.006), (I-302)+(1.002)+(5.007), (I-302)+(1.002)+(5.008), (I-302)+(1.002)+(5.009), (I-302)+(1.002)+(5.010), (I-302)+(1.002)+(5.011), (I-302)+(1.002)+(5.012), (I-302)+(1.002)+(5.013), (I-302)+(1.002)+(5.014), (I-302)+(1.002)+(5.015), (I-302)+(1.002)+(5.016), (I-302)+(1.002)+(5.017), (I-302)+(1.002)+(5.018), (I-302)+(1.002)+(5.019), (I-302)+(1.002)+(5.020), (I-302)+(1.002)+(5.021), (I-302)+(1.002)+(5.022), (I-302)+(1.002)+(5.023), (I-302)+(1.002)+(6.001), (I-302)+(1.002)+(6.002), (I-302)+(1.002)+(6.003), (I-302)+(1.002)+(6.004), (I-302)+(1.002)+(7.001), (I-302)+(1.002)+(7.002), (I-302)+(1.002)+(7.003), (I-302)+(1.002)+(7.004), (I-302)+(1.002)+(7.005), (I-302)+(1.002)+(7.006), (I-302)+(1.002)+(9.001), (I-302)+(1.002)+(9.002), (I-302)+(1.002)+(9.003), (I-302)+(1.002)+(9.004), (I-302)+(1.002)+(9.005), (I-302)+(1.002)+(9.006), (I-302)+(1.002)+(9.007), (I-302)+(1.002)+(9.008), (I-302)+(1.002)+(9.009), (I-302)+(1.002)+(14.001), (I-302)+(1.002)+(14.002), (I-302)+(1.002)+(15.008), (I-302)+(1.002)+(15.011), (I-302)+(1.002)+(15.012), (I-302)+(1.002)+(15.016), (I-302)+(1.002)+(15.025), (I-302)+(1.002)+(15.027), (I-302)+(1.002)+(15.047), (I-302)+(1.002)+(15.063), (I-302)+(1.002)+(15.064), (I-302)+(1.002)+(16.001), (I-302)+(1.002)+(16.002), (I-302)+(1.002)+(16.003), (I-302)+(1.002)+(16.004), (I-302)+(1.002)+(16.005), (I-302)+(1.002)+(16.006), (I-302)+(1.002)+(16.007), (I-302)+(1.002)+(16.008), (I-302)+(1.002)+(17.001), (I-302)+(1.002)+(17.002), (I-302)+(1.002)+(17.003), (I-302)+(1.002)+(17.004), (I-302)+(1.002)+(17.005), (I-302)+(1.002)+(17.006), (I-302)+(1.002)+(17.007), (I-302)+(1.002)+(17.008), (I-302)+(1.002)+(17.009), (I-302)+(1.002)+(17.010), (I-302)+(1.002)+(17.011), (I-302)+(1.002)+(17.012), (I-302)+(1.002)+(18.001), (I-302)+(1.003)+(1.004), (I-302)+(1.003)+(1.005), (I-302)+(1.003)+(1.006), (I-302)+(1.003)+(1.007), (I-302)+(1.003)+(1.008), (I-302)+(1.003)+(1.009), (I-302)+(1.003)+(1.010), (I-302)+(1.003)+(1.011), (I-302)+(1.003)+(1.012), (I-302)+(1.003)+(1.013), (I-302)+(1.003)+(1.014), (I-302)+(1.003)+(1.015), (I-302)+(1.003)+(1.016), (I-302)+(1.003)+(1.017), (I-302)+(1.003)+(1.018), (I-302)+(1.003)+(1.019), (I-302)+(1.003)+(1.020), (I-302)+(1.003)+(1.021), (I-302)+(1.003)+(1.022), (I-302)+(1.003)+(1.023), (I-302)+(1.003)+(1.024), (I-302)+(1.003)+(1.025), (I-302)+(1.003)+(1.026), (I-302)+(1.003)+(1.027), (I-302)+(1.003)+(1.028), (I-302)+(1.003)+(1.029), (I-302)+(1.003)+(1.030), (I-302)+(1.003)+(1.031), (I-302)+(1.003)+(1.032), (I-302)+(1.003)+(1.033), (I-302)+(1.003)+(1.034), (I-302)+(1.003)+(1.035), (I-302)+(1.003)+(1.036), (I-302)+(1.003)+(1.037), (I-302)+(1.003)+(1.038), (I-302)+(1.003)+(1.039), (I-302)+(1.003)+(1.040), (I-302)+(1.003)+(1.041), (I-302)+(1.003)+(1.042), (I-302)+(1.003)+(1.043), (I-302)+(1.003)+(1.044), (I-302)+(1.003)+(1.045), (I-302)+(1.003)+(1.046), (I-302)+(1.003)+(1.047), (I-302)+(1.003)+(1.048), (I-302)+(1.003)+(1.049), (I-302)+(1.003)+(1.050), (I-302)+(1.003)+(1.051), (I-302)+(1.003)+(1.052), (I-302)+(1.003)+(1.053), (I-302)+(1.003)+(1.054), (I-302)+(1.003)+(1.055), (I-302)+(1.003)+(1.056), (I-302)+(1.003)+(1.057), (I-302)+(1.003)+(1.058), (I-302)+(1.003)+(1.059), (I-302)+(1.003)+(1.060), (I-302)+(1.003)+(1.061), (I-302)+(1.003)+(1.062), (I-302)+(1.003)+(1.063), (I-302)+(1.003)+(1.064), (I-302)+(1.003)+(1.065), (I-302)+(1.003)+(1.066), (I-302)+(1.003)+(1.067), (I-302)+(1.003)+(1.068), (I-302)+(1.003)+(1.069), (I-302)+(1.003)+(1.070), (I-302)+(1.003)+(1.071), (I-302)+(1.003)+(1.072), (I-302)+(1.003)+(1.073), (I-302)+(1.003)+(1.074), (I-302)+(1.003)+(1.075), (I-302)+(1.003)+(1.076), (I-302)+(1.003)+(1.077), (I-302)+(1.003)+(1.078), (I-302)+(1.003)+(1.079), (I-302)+(1.003)+(1.080), (I-302)+(1.003)+(1.081), (I-302)+(1.003)+(1.082), (I-302)+(1.003)+(1.083), (I-302)+(1.003)+(1.084), (I-302)+(1.003)+(1.085), (I-302)+(1.003)+(1.086), (I-302)+(1.003)+(1.087), (I-302)+(1.003)+(1.088), (I-302)+(1.003)+(1.089), (I-302)+(1.003)+(1.090), (I-302)+(1.003)+(1.091), (I-302)+(1.003)+(1.092), (I-302)+(1.003)+(2.001), (I-302)+(1.003)+(2.002), (I-302)+(1.003)+(2.003), (I-302)+(1.003)+(2.004), (I-302)+(1.003)+(2.005), (I-302)+(1.003)+(2.006), (I-302)+(1.003)+(2.007), (I-302)+(1.003)+(2.008), (I-302)+(1.003)+(2.009), (I-302)+(1.003)+(2.010), (I-302)+(1.003)+(2.011), (I-302)+(1.003)+(2.012), (I-302)+(1.003)+(2.013), (I-302)+(1.003)+(2.014), (I-302)+(1.003)+(2.015), (I-302)+(1.003)+(2.016), (I-302)+(1.003)+(2.017), (I-302)+(1.003)+(2.018), (I-302)+(1.003)+(2.019), (I-302)+(1.003)+(2.020), (I-302)+(1.003)+(2.021), (I-302)+(1.003)+(2.022), (I-302)+(1.003)+(2.023), (I-302)+(1.003)+(2.024), (I-302)+(1.003)+(2.025), (I-302)+(1.003)+(2.026), (I-302)+(1.003)+(2.027), (I-302)+(1.003)+(2.028), (I-302)+(1.003)+(2.029), (I-302)+(1.003)+(2.030), (I-302)+(1.003)+(2.031), (I-302)+(1.003)+(2.032), (I-302)+(1.003)+(2.033), (I-302)+(1.003)+(2.034), (I-302)+(1.003)+(2.035), (I-302)+(1.003)+(2.036), (I-302)+(1.003)+(2.037), (I-302)+(1.003)+(2.038), (I-302)+(1.003)+(2.039), (I-302)+(1.003)+(2.040), (I-302)+(1.003)+(2.041), (I-302)+(1.003)+(2.042), (I-302)+(1.003)+(2.043), (I-302)+(1.003)+(2.044), (I-302)+(1.003)+(2.045), (I-302)+(1.003)+(2.046), (I-302)+(1.003)+(2.047), (I-302)+(1.003)+(2.048), (I-302)+(1.003)+(2.049), (I-302)+(1.003)+(2.050), (I-302)+(1.003)+(2.051), (I-302)+(1.003)+(2.052), (I-302)+(1.003)+(2.053), (I-302)+(1.003)+(2.054), (I-302)+(1.003)+(2.055), (I-302)+(1.003)+(2.056), (I-302)+(1.003)+(2.057), (I-302)+(1.003)+(2.058), (I-302)+(1.003)+(2.059), (I-302)+(1.003)+(3.001), (I-302)+(1.003)+(3.002), (I-302)+(1.003)+(3.003), (I-302)+(1.003)+(3.004), (I-302)+(1.003)+(3.005), (I-302)+(1.003)+(3.006), (I-302)+(1.003)+(3.007), (I-302)+(1.003)+(3.008), (I-302)+(1.003)+(3.009), (I-302)+(1.003)+(3.010), (I-302)+(1.003)+(3.011), (I-302)+(1.003)+(3.012), (I-302)+(1.003)+(3.013), (I-302)+(1.003)+(3.014), (I-302)+(1.003)+(3.015), (I-302)+(1.003)+(3.016), (I-302)+(1.003)+(3.017), (I-302)+(1.003)+(3.018), (I-302)+(1.003)+(3.019), (I-302)+(1.003)+(3.020), (I-302)+(1.003)+(3.021), (I-302)+(1.003)+(3.022), (I-302)+(1.003)+(3.023), (I-302)+(1.003)+(3.024), (I-302)+(1.003)+(3.025), (I-302)+(1.003)+(3.026), (I-302)+(1.003)+(3.027), (I-302)+(1.003)+(3.028), (I-302)+(1.003)+(3.029), (I-302)+(1.003)+(3.030), (I-302)+(1.003)+(3.031), (I-302)+(1.003)+(5.001), (I-302)+(1.003)+(5.002), (I-302)+(1.003)+(5.003), (I-302)+(1.003)+(5.004), (I-302)+(1.003)+(5.005), (I-302)+(1.003)+(5.006), (I-302)+(1.003)+(5.007), (I-302)+(1.003)+(5.008), (I-302)+(1.003)+(5.009), (I-302)+(1.003)+(5.010), (I-302)+(1.003)+(5.011), (I-302)+(1.003)+(5.012), (I-302)+(1.003)+(5.013), (I-302)+(1.003)+(5.014), (I-302)+(1.003)+(5.015), (I-302)+(1.003)+(5.016), (I-302)+(1.003)+(5.017), (I-302)+(1.003)+(5.018), (I-302)+(1.003)+(5.019), (I-302)+(1.003)+(5.020), (I-302)+(1.003)+(5.021), (I-302)+(1.003)+(5.022), (I-302)+(1.003)+(5.023), (I-302)+(1.003)+(6.001), (I-302)+(1.003)+(6.002), (I-302)+(1.003)+(6.003), (I-302)+(1.003)+(6.004), (I-302)+(1.003)+(7.001), (I-302)+(1.003)+(7.002), (I-302)+(1.003)+(7.003), (I-302)+(1.003)+(7.004), (I-302)+(1.003)+(7.005), (I-302)+(1.003)+(7.006), (I-302)+(1.003)+(9.001), (I-302)+(1.003)+(9.002), (I-302)+(1.003)+(9.003), (I-302)+(1.003)+(9.004), (I-302)+(1.003)+(9.005), (I-302)+(1.003)+(9.006), (I-302)+(1.003)+(9.007), (I-302)+(1.003)+(9.008), (I-302)+(1.003)+(9.009), (I-302)+(1.003)+(14.001), (I-302)+(1.003)+(14.002), (I-302)+(1.003)+(15.008), (I-302)+(1.003)+(15.011), (I-302)+(1.003)+(15.012), (I-302)+(1.003)+(15.016), (I-302)+(1.003)+(15.025), (I-302)+(1.003)+(15.027), (I-302)+(1.003)+(15.047), (I-302)+(1.003)+(15.063), (I-302)+(1.003)+(15.064), (I-302)+(1.003)+(16.001), (I-302)+(1.003)+(16.002), (I-302)+(1.003)+(16.003), (I-302)+(1.003)+(16.004), (I-302)+(1.003)+(16.005), (I-302)+(1.003)+(16.006), (I-302)+(1.003)+(16.007), (I-302)+(1.003)+(16.008), (I-302)+(1.003)+(17.001), (I-302)+(1.003)+(17.002), (I-302)+(1.003)+(17.003), (I-302)+(1.003)+(17.004), (I-302)+(1.003)+(17.005), (I-302)+(1.003)+(17.006), (I-302)+(1.003)+(17.007), (I-302)+(1.003)+(17.008), (I-302)+(1.003)+(17.009), (I-302)+(1.003)+(17.010), (I-302)+(1.003)+(17.011), (I-302)+(1.003)+(17.012), (I-302)+(1.003)+(18.001), (I-302)+(1.004)+(1.005), (I-302)+(1.004)+(1.006), (I-302)+(1.004)+(1.007), (I-302)+(1.004)+(1.008), (I-302)+(1.004)+(1.009), (I-302)+(1.004)+(1.010), (I-302)+(1.004)+(1.011), (I-302)+(1.004)+(1.012), (I-302)+(1.004)+(1.013), (I-302)+(1.004)+(1.014), (I-302)+(1.004)+(1.015), (I-302)+(1.004)+(1.016), (I-302)+(1.004)+(1.017), (I-302)+(1.004)+(1.018), (I-302)+(1.004)+(1.019), (I-302)+(1.004)+(1.020), (I-302)+(1.004)+(1.021), (I-302)+(1.004)+(1.022), (I-302)+(1.004)+(1.023), (I-302)+(1.004)+(1.024), (I-302)+(1.004)+(1.025), (I-302)+(1.004)+(1.026), (I-302)+(1.004)+(1.027), (I-302)+(1.004)+(1.028), (I-302)+(1.004)+(1.029), (I-302)+(1.004)+(1.030), (I-302)+(1.004)+(1.031), (I-302)+(1.004)+(1.032), (I-302)+(1.004)+(1.033), (I-302)+(1.004)+(1.034), (I-302)+(1.004)+(1.035), (I-302)+(1.004)+(1.036), (I-302)+(1.004)+(1.037), (I-302)+(1.004)+(1.038), (I-302)+(1.004)+(1.039), (I-302)+(1.004)+(1.040), (I-302)+(1.004)+(1.041), (I-302)+(1.004)+(1.042), (I-302)+(1.004)+(1.043), (I-302)+(1.004)+(1.044), (I-302)+(1.004)+(1.045), (I-302)+(1.004)+(1.046), (I-302)+(1.004)+(1.047), (I-302)+(1.004)+(1.048), (I-302)+(1.004)+(1.049), (I-302)+(1.004)+(1.050), (I-302)+(1.004)+(1.051), (I-302)+(1.004)+(1.052), (I-302)+(1.004)+(1.053), (I-302)+(1.004)+(1.054), (I-302)+(1.004)+(1.055), (I-302)+(1.004)+(1.056), (I-302)+(1.004)+(1.057), (I-302)+(1.004)+(1.058), (I-302)+(1.004)+(1.059), (I-302)+(1.004)+(1.060), (I-302)+(1.004)+(1.061), (I-302)+(1.004)+(1.062), (I-302)+(1.004)+(1.063), (I-302)+(1.004)+(1.064), (I-302)+(1.004)+(1.065), (I-302)+(1.004)+(1.066), (I-302)+(1.004)+(1.067), (I-302)+(1.004)+(1.068), (I-302)+(1.004)+(1.069), (I-302)+(1.004)+(1.070), (I-302)+(1.004)+(1.071), (I-302)+(1.004)+(1.072), (I-302)+(1.004)+(1.073), (I-302)+(1.004)+(1.074), (I-302)+(1.004)+(1.075), (I-302)+(1.004)+(1.076), (I-302)+(1.004)+(1.077), (I-302)+(1.004)+(1.078), (I-302)+(1.004)+(1.079), (I-302)+(1.004)+(1.080), (I-302)+(1.004)+(1.081), (I-302)+(1.004)+(1.082), (I-302)+(1.004)+(1.083), (I-302)+(1.004)+(1.084), (I-302)+(1.004)+(1.085), (I-302)+(1.004)+(1.086), (I-302)+(1.004)+(1.087), (I-302)+(1.004)+(1.088), (I-302)+(1.004)+(1.089), (I-302)+(1.004)+(1.090), (I-302)+(1.004)+(1.091), (I-302)+(1.004)+(1.092), (I-302)+(1.004)+(2.001), (I-302)+(1.004)+(2.002), (I-302)+(1.004)+(2.003), (I-302)+(1.004)+(2.004), (I-302)+(1.004)+(2.005), (I-302)+(1.004)+(2.006), (I-302)+(1.004)+(2.007), (I-302)+(1.004)+(2.008), (I-302)+(1.004)+(2.009), (I-302)+(1.004)+(2.010), (I-302)+(1.004)+(2.011), (I-302)+(1.004)+(2.012), (I-302)+(1.004)+(2.013), (I-302)+(1.004)+(2.014), (I-302)+(1.004)+(2.015), (I-302)+(1.004)+(2.016), (I-302)+(1.004)+(2.017), (I-302)+(1.004)+(2.018), (I-302)+(1.004)+(2.019), (I-302)+(1.004)+(2.020), (I-302)+(1.004)+(2.021), (I-302)+(1.004)+(2.022), (I-302)+(1.004)+(2.023), (I-302)+(1.004)+(2.024), (I-302)+(1.004)+(2.025), (I-302)+(1.004)+(2.026), (I-302)+(1.004)+(2.027), (I-302)+(1.004)+(2.028), (I-302)+(1.004)+(2.029), (I-302)+(1.004)+(2.030), (I-302)+(1.004)+(2.031), (I-302)+(1.004)+(2.032), (I-302)+(1.004)+(2.033), (I-302)+(1.004)+(2.034), (I-302)+(1.004)+(2.035), (I-302)+(1.004)+(2.036), (I-302)+(1.004)+(2.037), (I-302)+(1.004)+(2.038), (I-302)+(1.004)+(2.039), (I-302)+(1.004)+(2.040), (I-302)+(1.004)+(2.041), (I-302)+(1.004)+(2.042), (I-302)+(1.004)+(2.043), (I-302)+(1.004)+(2.044), (I-302)+(1.004)+(2.045), (I-302)+(1.004)+(2.046), (I-302)+(1.004)+(2.047), (I-302)+(1.004)+(2.048), (I-302)+(1.004)+(2.049), (I-302)+(1.004)+(2.050), (I-302)+(1.004)+(2.051), (I-302)+(1.004)+(2.052), (I-302)+(1.004)+(2.053), (I-302)+(1.004)+(2.054), (I-302)+(1.004)+(2.055), (I-302)+(1.004)+(2.056), (I-302)+(1.004)+(2.057), (I-302)+(1.004)+(2.058), (I-302)+(1.004)+(2.059), (I-302)+(1.004)+(3.001), (I-302)+(1.004)+(3.002), (I-302)+(1.004)+(3.003), (I-302)+(1.004)+(3.004), (I-302)+(1.004)+(3.005), (I-302)+(1.004)+(3.006), (I-302)+(1.004)+(3.007), (I-302)+(1.004)+(3.008), (I-302)+(1.004)+(3.009), (I-302)+(1.004)+(3.010), (I-302)+(1.004)+(3.011), (I-302)+(1.004)+(3.012), (I-302)+(1.004)+(3.013), (I-302)+(1.004)+(3.014), (I-302)+(1.004)+(3.015), (I-302)+(1.004)+(3.016), (I-302)+(1.004)+(3.017), (I-302)+(1.004)+(3.018), (I-302)+(1.004)+(3.019), (I-302)+(1.004)+(3.020), (I-302)+(1.004)+(3.021), (I-302)+(1.004)+(3.022), (I-302)+(1.004)+(3.023), (I-302)+(1.004)+(3.024), (I-302)+(1.004)+(3.025), (I-302)+(1.004)+(3.026), (I-302)+(1.004)+(3.027), (I-302)+(1.004)+(3.028), (I-302)+(1.004)+(3.029), (I-302)+(1.004)+(3.030), (I-302)+(1.004)+(3.031), (I-302)+(1.004)+(5.001), (I-302)+(1.004)+(5.002), (I-302)+(1.004)+(5.003), (I-302)+(1.004)+(5.004), (I-302)+(1.004)+(5.005), (I-302)+(1.004)+(5.006), (I-302)+(1.004)+(5.007), (I-302)+(1.004)+(5.008), (I-302)+(1.004)+(5.009), (I-302)+(1.004)+(5.010), (I-302)+(1.004)+(5.011), (I-302)+(1.004)+(5.012), (I-302)+(1.004)+(5.013), (I-302)+(1.004)+(5.014), (I-302)+(1.004)+(5.015), (I-302)+(1.004)+(5.016), (I-302)+(1.004)+(5.017), (I-302)+(1.004)+(5.018), (I-302)+(1.004)+(5.019), (I-302)+(1.004)+(5.020), (I-302)+(1.004)+(5.021), (I-302)+(1.004)+(5.022), (I-302)+(1.004)+(5.023), (I-302)+(1.004)+(6.001), (I-302)+(1.004)+(6.002), (I-302)+(1.004)+(6.003), (I-302)+(1.004)+(6.004), (I-302)+(1.004)+(7.001), (I-302)+(1.004)+(7.002), (I-302)+(1.004)+(7.003), (I-302)+(1.004)+(7.004), (I-302)+(1.004)+(7.005), (I-302)+(1.004)+(7.006), (I-302)+(1.004)+(9.001), (I-302)+(1.004)+(9.002), (I-302)+(1.004)+(9.003), (I-302)+(1.004)+(9.004), (I-302)+(1.004)+(9.005), (I-302)+(1.004)+(9.006), (I-302)+(1.004)+(9.007), (I-302)+(1.004)+(9.008), (I-302)+(1.004)+(9.009), (I-302)+(1.004)+(14.001), (I-302)+(1.004)+(14.002), (I-302)+(1.004)+(15.008), (I-302)+(1.004)+(15.011), (I-302)+(1.004)+(15.012), (I-302)+(1.004)+(15.016), (I-302)+(1.004)+(15.025), (I-302)+(1.004)+(15.027), (I-302)+(1.004)+(15.047), (I-302)+(1.004)+(15.063), (I-302)+(1.004)+(15.064), (I-302)+(1.004)+(16.001), (I-302)+(1.004)+(16.002), (I-302)+(1.004)+(16.003), (I-302)+(1.004)+(16.004), (I-302)+(1.004)+(16.005), (I-302)+(1.004)+(16.006), (I-302)+(1.004)+(16.007), (I-302)+(1.004)+(16.008), (I-302)+(1.004)+(17.001), (I-302)+(1.004)+(17.002), (I-302)+(1.004)+(17.003), (I-302)+(1.004)+(17.004), (I-302)+(1.004)+(17.005), (I-302)+(1.004)+(17.006), (I-302)+(1.004)+(17.007), (I-302)+(1.004)+(17.008), (I-302)+(1.004)+(17.009), (I-302)+(1.004)+(17.010), (I-302)+(1.004)+(17.011), (I-302)+(1.004)+(17.012), (I-302)+(1.004)+(18.001), (I-302)+(1.005)+(1.006), (I-302)+(1.005)+(1.007), (I-302)+(1.005)+(1.008), (I-302)+(1.005)+(1.009), (I-302)+(1.005)+(1.010), (I-302)+(1.005)+(1.011), (I-302)+(1.005)+(1.012), (I-302)+(1.005)+(1.013), (I-302)+(1.005)+(1.014), (I-302)+(1.005)+(1.015), (I-302)+(1.005)+(1.016), (I-302)+(1.005)+(1.017), (I-302)+(1.005)+(1.018), (I-302)+(1.005)+(1.019), (I-302)+(1.005)+(1.020), (I-302)+(1.005)+(1.021), (I-302)+(1.005)+(1.022), (I-302)+(1.005)+(1.023), (I-302)+(1.005)+(1.024), (I-302)+(1.005)+(1.025), (I-302)+(1.005)+(1.026), (I-302)+(1.005)+(1.027), (I-302)+(1.005)+(1.028), (I-302)+(1.005)+(1.029), (I-302)+(1.005)+(1.030), (I-302)+(1.005)+(1.031), (I-302)+(1.005)+(1.032), (I-302)+(1.005)+(1.033), (I-302)+(1.005)+(1.034), (I-302)+(1.005)+(1.035), (I-302)+(1.005)+(1.036), (I-302)+(1.005)+(1.037), (I-302)+(1.005)+(1.038), (I-302)+(1.005)+(1.039), (I-302)+(1.005)+(1.040), (I-302)+(1.005)+(1.041), (I-302)+(1.005)+(1.042), (I-302)+(1.005)+(1.043), (I-302)+(1.005)+(1.044), (I-302)+(1.005)+(1.045), (I-302)+(1.005)+(1.046), (I-302)+(1.005)+(1.047), (I-302)+(1.005)+(1.048), (I-302)+(1.005)+(1.049), (I-302)+(1.005)+(1.050), (I-302)+(1.005)+(1.051), (I-302)+(1.005)+(1.052), (I-302)+(1.005)+(1.053), (I-302)+(1.005)+(1.054), (I-302)+(1.005)+(1.055), (I-302)+(1.005)+(1.056), (I-302)+(1.005)+(1.057), (I-302)+(1.005)+(1.058), (I-302)+(1.005)+(1.059), (I-302)+(1.005)+(1.060), (I-302)+(1.005)+(1.061), (I-302)+(1.005)+(1.062), (I-302)+(1.005)+(1.063), (I-302)+(1.005)+(1.064), (I-302)+(1.005)+(1.065), (I-302)+(1.005)+(1.066), (I-302)+(1.005)+(1.067), (I-302)+(1.005)+(1.068), (I-302)+(1.005)+(1.069), (I-302)+(1.005)+(1.070), (I-302)+(1.005)+(1.071), (I-302)+(1.005)+(1.072), (I-302)+(1.005)+(1.073), (I-302)+(1.005)+(1.074), (I-302)+(1.005)+(1.075), (I-302)+(1.005)+(1.076), (I-302)+(1.005)+(1.077), (I-302)+(1.005)+(1.078), (I-302)+(1.005)+(1.079), (I-302)+(1.005)+(1.080), (I-302)+(1.005)+(1.081), (I-302)+(1.005)+(1.082), (I-302)+(1.005)+(1.083), (I-302)+(1.005)+(1.084), (I-302)+(1.005)+(1.085), (I-302)+(1.005)+(1.086), (I-302)+(1.005)+(1.087), (I-302)+(1.005)+(1.088), (I-302)+(1.005)+(1.089), (I-302)+(1.005)+(1.090), (I-302)+(1.005)+(1.091), (I-302)+(1.005)+(1.092), (I-302)+(1.005)+(2.001), (I-302)+(1.005)+(2.002), (I-302)+(1.005)+(2.003), (I-302)+(1.005)+(2.004), (I-302)+(1.005)+(2.005), (I-302)+(1.005)+(2.006), (I-302)+(1.005)+(2.007), (I-302)+(1.005)+(2.008), (I-302)+(1.005)+(2.009), (I-302)+(1.005)+(2.010), (I-302)+(1.005)+(2.011), (I-302)+(1.005)+(2.012), (I-302)+(1.005)+(2.013), (I-302)+(1.005)+(2.014), (I-302)+(1.005)+(2.015), (I-302)+(1.005)+(2.016), (I-302)+(1.005)+(2.017), (I-302)+(1.005)+(2.018), (I-302)+(1.005)+(2.019), (I-302)+(1.005)+(2.020), (I-302)+(1.005)+(2.021), (I-302)+(1.005)+(2.022), (I-302)+(1.005)+(2.023), (I-302)+(1.005)+(2.024), (I-302)+(1.005)+(2.025), (I-302)+(1.005)+(2.026), (I-302)+(1.005)+(2.027), (I-302)+(1.005)+(2.028), (I-302)+(1.005)+(2.029), (I-302)+(1.005)+(2.030), (I-302)+(1.005)+(2.031), (I-302)+(1.005)+(2.032), (I-302)+(1.005)+(2.033), (I-302)+(1.005)+(2.034), (I-302)+(1.005)+(2.035), (I-302)+(1.005)+(2.036), (I-302)+(1.005)+(2.037), (I-302)+(1.005)+(2.038), (I-302)+(1.005)+(2.039), (I-302)+(1.005)+(2.040), (I-302)+(1.005)+(2.041), (I-302)+(1.005)+(2.042), (I-302)+(1.005)+(2.043), (I-302)+(1.005)+(2.044), (I-302)+(1.005)+(2.045), (I-302)+(1.005)+(2.046), (I-302)+(1.005)+(2.047), (I-302)+(1.005)+(2.048), (I-302)+(1.005)+(2.049), (I-302)+(1.005)+(2.050), (I-302)+(1.005)+(2.051), (I-302)+(1.005)+(2.052), (I-302)+(1.005)+(2.053), (I-302)+(1.005)+(2.054), (I-302)+(1.005)+(2.055), (I-302)+(1.005)+(2.056), (I-302)+(1.005)+(2.057), (I-302)+(1.005)+(2.058), (I-302)+(1.005)+(2.059), (I-302)+(1.005)+(3.001), (I-302)+(1.005)+(3.002), (I-302)+(1.005)+(3.003), (I-302)+(1.005)+(3.004), (I-302)+(1.005)+(3.005), (I-302)+(1.005)+(3.006), (I-302)+(1.005)+(3.007), (I-302)+(1.005)+(3.008), (I-302)+(1.005)+(3.009), (I-302)+(1.005)+(3.010), (I-302)+(1.005)+(3.011), (I-302)+(1.005)+(3.012), (I-302)+(1.005)+(3.013), (I-302)+(1.005)+(3.014), (I-302)+(1.005)+(3.015), (I-302)+(1.005)+(3.016), (I-302)+(1.005)+(3.017), (I-302)+(1.005)+(3.018), (I-302)+(1.005)+(3.019), (I-302)+(1.005)+(3.020), (I-302)+(1.005)+(3.021), (I-302)+(1.005)+(3.022), (I-302)+(1.005)+(3.023), (I-302)+(1.005)+(3.024), (I-302)+(1.005)+(3.025), (I-302)+(1.005)+(3.026), (I-302)+(1.005)+(3.027), (I-302)+(1.005)+(3.028), (I-302)+(1.005)+(3.029), (I-302)+(1.005)+(3.030), (I-302)+(1.005)+(3.031), (I-302)+(1.005)+(5.001), (I-302)+(1.005)+(5.002), (I-302)+(1.005)+(5.003), (I-302)+(1.005)+(5.004), (I-302)+(1.005)+(5.005), (I-302)+(1.005)+(5.006), (I-302)+(1.005)+(5.007), (I-302)+(1.005)+(5.008), (I-302)+(1.005)+(5.009), (I-302)+(1.005)+(5.010), (I-302)+(1.005)+(5.011), (I-302)+(1.005)+(5.012), (I-302)+(1.005)+(5.013), (I-302)+(1.005)+(5.014), (I-302)+(1.005)+(5.015), (I-302)+(1.005)+(5.016), (I-302)+(1.005)+(5.017), (I-302)+(1.005)+(5.018), (I-302)+(1.005)+(5.019), (I-302)+(1.005)+(5.020), (I-302)+(1.005)+(5.021), (I-302)+(1.005)+(5.022), (I-302)+(1.005)+(5.023), (I-302)+(1.005)+(6.001), (I-302)+(1.005)+(6.002), (I-302)+(1.005)+(6.003), (I-302)+(1.005)+(6.004), (I-302)+(1.005)+(7.001), (I-302)+(1.005)+(7.002), (I-302)+(1.005)+(7.003), (I-302)+(1.005)+(7.004), (I-302)+(1.005)+(7.005), (I-302)+(1.005)+(7.006), (I-302)+(1.005)+(9.001), (I-302)+(1.005)+(9.002), (I-302)+(1.005)+(9.003), (I-302)+(1.005)+(9.004), (I-302)+(1.005)+(9.005), (I-302)+(1.005)+(9.006), (I-302)+(1.005)+(9.007), (I-302)+(1.005)+(9.008), (I-302)+(1.005)+(9.009), (I-302)+(1.005)+(14.001), (I-302)+(1.005)+(14.002), (I-302)+(1.005)+(15.008), (I-302)+(1.005)+(15.011), (I-302)+(1.005)+(15.012), (I-302)+(1.005)+(15.016), (I-302)+(1.005)+(15.025), (I-302)+(1.005)+(15.027), (I-302)+(1.005)+(15.047), (I-302)+(1.005)+(15.063), (I-302)+(1.005)+(15.064), (I-302)+(1.005)+(16.001), (I-302)+(1.005)+(16.002), (I-302)+(1.005)+(16.003), (I-302)+(1.005)+(16.004), (I-302)+(1.005)+(16.005), (I-302)+(1.005)+(16.006), (I-302)+(1.005)+(16.007), (I-302)+(1.005)+(16.008), (I-302)+(1.005)+(17.001), (I-302)+(1.005)+(17.002), (I-302)+(1.005)+(17.003), (I-302)+(1.005)+(17.004), (I-302)+(1.005)+(17.005), (I-302)+(1.005)+(17.006), (I-302)+(1.005)+(17.007), (I-302)+(1.005)+(17.008), (I-302)+(1.005)+(17.009), (I-302)+(1.005)+(17.010), (I-302)+(1.005)+(17.011), (I-302)+(1.005)+(17.012), (I-302)+(1.005)+(18.001), (I-302)+(1.006)+(1.007), (I-302)+(1.006)+(1.008), (I-302)+(1.006)+(1.009), (I-302)+(1.006)+(1.010), (I-302)+(1.006)+(1.011), (I-302)+(1.006)+(1.012), (I-302)+(1.006)+(1.013), (I-302)+(1.006)+(1.014), (I-302)+(1.006)+(1.015), (I-302)+(1.006)+(1.016), (I-302)+(1.006)+(1.017), (I-302)+(1.006)+(1.018), (I-302)+(1.006)+(1.019), (I-302)+(1.006)+(1.020), (I-302)+(1.006)+(1.021), (I-302)+(1.006)+(1.022), (I-302)+(1.006)+(1.023), (I-302)+(1.006)+(1.024), (I-302)+(1.006)+(1.025), (I-302)+(1.006)+(1.026), (I-302)+(1.006)+(1.027), (I-302)+(1.006)+(1.028), (I-302)+(1.006)+(1.029), (I-302)+(1.006)+(1.030), (I-302)+(1.006)+(1.031), (I-302)+(1.006)+(1.032), (I-302)+(1.006)+(1.033), (I-302)+(1.006)+(1.034), (I-302)+(1.006)+(1.035), (I-302)+(1.006)+(1.036), (I-302)+(1.006)+(1.037), (I-302)+(1.006)+(1.038), (I-302)+(1.006)+(1.039), (I-302)+(1.006)+(1.040), (I-302)+(1.006)+(1.041), (I-302)+(1.006)+(1.042), (I-302)+(1.006)+(1.043), (I-302)+(1.006)+(1.044), (I-302)+(1.006)+(1.045), (I-302)+(1.006)+(1.046), (I-302)+(1.006)+(1.047), (I-302)+(1.006)+(1.048), (I-302)+(1.006)+(1.049), (I-302)+(1.006)+(1.050), (I-302)+(1.006)+(1.051), (I-302)+(1.006)+(1.052), (I-302)+(1.006)+(1.053), (I-302)+(1.006)+(1.054), (I-302)+(1.006)+(1.055), (I-302)+(1.006)+(1.056), (I-302)+(1.006)+(1.057), (I-302)+(1.006)+(1.058), (I-302)+(1.006)+(1.059), (I-302)+(1.006)+(1.060), (I-302)+(1.006)+(1.061), (I-302)+(1.006)+(1.062), (I-302)+(1.006)+(1.063), (I-302)+(1.006)+(1.064), (I-302)+(1.006)+(1.065), (I-302)+(1.006)+(1.066), (I-302)+(1.006)+(1.067), (I-302)+(1.006)+(1.068), (I-302)+(1.006)+(1.069), (I-302)+(1.006)+(1.070), (I-302)+(1.006)+(1.071), (I-302)+(1.006)+(1.072), (I-302)+(1.006)+(1.073), (I-302)+(1.006)+(1.074), (I-302)+(1.006)+(1.075), (I-302)+(1.006)+(1.076), (I-302)+(1.006)+(1.077), (I-302)+(1.006)+(1.078), (I-302)+(1.006)+(1.079), (I-302)+(1.006)+(1.080), (I-302)+(1.006)+(1.081), (I-302)+(1.006)+(1.082), (I-302)+(1.006)+(1.083), (I-302)+(1.006)+(1.084), (I-302)+(1.006)+(1.085), (I-302)+(1.006)+(1.086), (I-302)+(1.006)+(1.087), (I-302)+(1.006)+(1.088), (I-302)+(1.006)+(1.089), (I-302)+(1.006)+(1.090), (I-302)+(1.006)+(1.091), (I-302)+(1.006)+(1.092), (I-302)+(1.006)+(2.001), (I-302)+(1.006)+(2.002), (I-302)+(1.006)+(2.003), (I-302)+(1.006)+(2.004), (I-302)+(1.006)+(2.005), (I-302)+(1.006)+(2.006), (I-302)+(1.006)+(2.007), (I-302)+(1.006)+(2.008), (I-302)+(1.006)+(2.009), (I-302)+(1.006)+(2.010), (I-302)+(1.006)+(2.011), (I-302)+(1.006)+(2.012), (I-302)+(1.006)+(2.013), (I-302)+(1.006)+(2.014), (I-302)+(1.006)+(2.015), (I-302)+(1.006)+(2.016), (I-302)+(1.006)+(2.017), (I-302)+(1.006)+(2.018), (I-302)+(1.006)+(2.019), (I-302)+(1.006)+(2.020), (I-302)+(1.006)+(2.021), (I-302)+(1.006)+(2.022), (I-302)+(1.006)+(2.023), (I-302)+(1.006)+(2.024), (I-302)+(1.006)+(2.025), (I-302)+(1.006)+(2.026), (I-302)+(1.006)+(2.027), (I-302)+(1.006)+(2.028), (I-302)+(1.006)+(2.029), (I-302)+(1.006)+(2.030), (I-302)+(1.006)+(2.031), (I-302)+(1.006)+(2.032), (I-302)+(1.006)+(2.033), (I-302)+(1.006)+(2.034), (I-302)+(1.006)+(2.035), (I-302)+(1.006)+(2.036), (I-302)+(1.006)+(2.037), (I-302)+(1.006)+(2.038), (I-302)+(1.006)+(2.039), (I-302)+(1.006)+(2.040), (I-302)+(1.006)+(2.041), (I-302)+(1.006)+(2.042), (I-302)+(1.006)+(2.043), (I-302)+(1.006)+(2.044), (I-302)+(1.006)+(2.045), (I-302)+(1.006)+(2.046), (I-302)+(1.006)+(2.047), (I-302)+(1.006)+(2.048), (I-302)+(1.006)+(2.049), (I-302)+(1.006)+(2.050), (I-302)+(1.006)+(2.051), (I-302)+(1.006)+(2.052), (I-302)+(1.006)+(2.053), (I-302)+(1.006)+(2.054), (I-302)+(1.006)+(2.055), (I-302)+(1.006)+(2.056), (I-302)+(1.006)+(2.057), (I-302)+(1.006)+(2.058), (I-302)+(1.006)+(2.059), (I-302)+(1.006)+(3.001), (I-302)+(1.006)+(3.002), (I-302)+(1.006)+(3.003), (I-302)+(1.006)+(3.004), (I-302)+(1.006)+(3.005), (I-302)+(1.006)+(3.006), (I-302)+(1.006)+(3.007), (I-302)+(1.006)+(3.008), (I-302)+(1.006)+(3.009), (I-302)+(1.006)+(3.010), (I-302)+(1.006)+(3.011), (I-302)+(1.006)+(3.012), (I-302)+(1.006)+(3.013), (I-302)+(1.006)+(3.014), (I-302)+(1.006)+(3.015), (I-302)+(1.006)+(3.016), (I-302)+(1.006)+(3.017), (I-302)+(1.006)+(3.018), (I-302)+(1.006)+(3.019), (I-302)+(1.006)+(3.020), (I-302)+(1.006)+(3.021), (I-302)+(1.006)+(3.022), (I-302)+(1.006)+(3.023), (I-302)+(1.006)+(3.024), (I-302)+(1.006)+(3.025), (I-302)+(1.006)+(3.026), (I-302)+(1.006)+(3.027), (I-302)+(1.006)+(3.028), (I-302)+(1.006)+(3.029), (I-302)+(1.006)+(3.030), (I-302)+(1.006)+(3.031), (I-302)+(1.006)+(5.001), (I-302)+(1.006)+(5.002), (I-302)+(1.006)+(5.003), (I-302)+(1.006)+(5.004), (I-302)+(1.006)+(5.005), (I-302)+(1.006)+(5.006), (I-302)+(1.006)+(5.007), (I-302)+(1.006)+(5.008), (I-302)+(1.006)+(5.009), (I-302)+(1.006)+(5.010), (I-302)+(1.006)+(5.011), (I-302)+(1.006)+(5.012), (I-302)+(1.006)+(5.013), (I-302)+(1.006)+(5.014), (I-302)+(1.006)+(5.015), (I-302)+(1.006)+(5.016), (I-302)+(1.006)+(5.017), (I-302)+(1.006)+(5.018), (I-302)+(1.006)+(5.019), (I-302)+(1.006)+(5.020), (I-302)+(1.006)+(5.021), (I-302)+(1.006)+(5.022), (I-302)+(1.006)+(5.023), (I-302)+(1.006)+(6.001), (I-302)+(1.006)+(6.002), (I-302)+(1.006)+(6.003), (I-302)+(1.006)+(6.004), (I-302)+(1.006)+(7.001), (I-302)+(1.006)+(7.002), (I-302)+(1.006)+(7.003), (I-302)+(1.006)+(7.004), (I-302)+(1.006)+(7.005), (I-302)+(1.006)+(7.006), (I-302)+(1.006)+(9.001), (I-302)+(1.006)+(9.002), (I-302)+(1.006)+(9.003), (I-302)+(1.006)+(9.004), (I-302)+(1.006)+(9.005), (I-302)+(1.006)+(9.006), (I-302)+(1.006)+(9.007), (I-302)+(1.006)+(9.008), (I-302)+(1.006)+(9.009), (I-302)+(1.006)+(14.001), (I-302)+(1.006)+(14.002), (I-302)+(1.006)+(15.008), (I-302)+(1.006)+(15.011), (I-302)+(1.006)+(15.012), (I-302)+(1.006)+(15.016), (I-302)+(1.006)+(15.025), (I-302)+(1.006)+(15.027), (I-302)+(1.006)+(15.047), (I-302)+(1.006)+(15.063), (I-302)+(1.006)+(15.064), (I-302)+(1.006)+(16.001), (I-302)+(1.006)+(16.002), (I-302)+(1.006)+(16.003), (I-302)+(1.006)+(16.004), (I-302)+(1.006)+(16.005), (I-302)+(1.006)+(16.006), (I-302)+(1.006)+(16.007), (I-302)+(1.006)+(16.008), (I-302)+(1.006)+(17.001), (I-302)+(1.006)+(17.002), (I-302)+(1.006)+(17.003), (I-302)+(1.006)+(17.004), (I-302)+(1.006)+(17.005), (I-302)+(1.006)+(17.006), (I-302)+(1.006)+(17.007), (I-302)+(1.006)+(17.008), (I-302)+(1.006)+(17.009), (I-302)+(1.006)+(17.010), (I-302)+(1.006)+(17.011), (I-302)+(1.006)+(17.012), (I-302)+(1.006)+(18.001), (I-302)+(1.007)+(1.008), (I-302)+(1.007)+(1.009), (I-302)+(1.007)+(1.010), (I-302)+(1.007)+(1.011), (I-302)+(1.007)+(1.012), (I-302)+(1.007)+(1.013), (I-302)+(1.007)+(1.014), (I-302)+(1.007)+(1.015), (I-302)+(1.007)+(1.016), (I-302)+(1.007)+(1.017), (I-302)+(1.007)+(1.018), (I-302)+(1.007)+(1.019), (I-302)+(1.007)+(1.020), (I-302)+(1.007)+(1.021), (I-302)+(1.007)+(1.022), (I-302)+(1.007)+(1.023), (I-302)+(1.007)+(1.024), (I-302)+(1.007)+(1.025), (I-302)+(1.007)+(1.026), (I-302)+(1.007)+(1.027), (I-302)+(1.007)+(1.028), (I-302)+(1.007)+(1.029), (I-302)+(1.007)+(1.030), (I-302)+(1.007)+(1.031), (I-302)+(1.007)+(1.032), (I-302)+(1.007)+(1.033), (I-302)+(1.007)+(1.034), (I-302)+(1.007)+(1.035), (I-302)+(1.007)+(1.036), (I-302)+(1.007)+(1.037), (I-302)+(1.007)+(1.038), (I-302)+(1.007)+(1.039), (I-302)+(1.007)+(1.040), (I-302)+(1.007)+(1.041), (I-302)+(1.007)+(1.042), (I-302)+(1.007)+(1.043), (I-302)+(1.007)+(1.044), (I-302)+(1.007)+(1.045), (I-302)+(1.007)+(1.046), (I-302)+(1.007)+(1.047), (I-302)+(1.007)+(1.048), (I-302)+(1.007)+(1.049), (I-302)+(1.007)+(1.050), (I-302)+(1.007)+(1.051), (I-302)+(1.007)+(1.052), (I-302)+(1.007)+(1.053), (I-302)+(1.007)+(1.054), (I-302)+(1.007)+(1.055), (I-302)+(1.007)+(1.056), (I-302)+(1.007)+(1.057), (I-302)+(1.007)+(1.058), (I-302)+(1.007)+(1.059), (I-302)+(1.007)+(1.060), (I-302)+(1.007)+(1.061), (I-302)+(1.007)+(1.062), (I-302)+(1.007)+(1.063), (I-302)+(1.007)+(1.064), (I-302)+(1.007)+(1.065), (I-302)+(1.007)+(1.066), (I-302)+(1.007)+(1.067), (I-302)+(1.007)+(1.068), (I-302)+(1.007)+(1.069), (I-302)+(1.007)+(1.070), (I-302)+(1.007)+(1.071), (I-302)+(1.007)+(1.072), (I-302)+(1.007)+(1.073), (I-302)+(1.007)+(1.074), (I-302)+(1.007)+(1.075), (I-302)+(1.007)+(1.076), (I-302)+(1.007)+(1.077), (I-302)+(1.007)+(1.078), (I-302)+(1.007)+(1.079), (I-302)+(1.007)+(1.080), (I-302)+(1.007)+(1.081), (I-302)+(1.007)+(1.082), (I-302)+(1.007)+(1.083), (I-302)+(1.007)+(1.084), (I-302)+(1.007)+(1.085), (I-302)+(1.007)+(1.086), (I-302)+(1.007)+(1.087), (I-302)+(1.007)+(1.088), (I-302)+(1.007)+(1.089), (I-302)+(1.007)+(1.090), (I-302)+(1.007)+(1.091), (I-302)+(1.007)+(1.092), (I-302)+(1.007)+(2.001), (I-302)+(1.007)+(2.002), (I-302)+(1.007)+(2.003), (I-302)+(1.007)+(2.004), (I-302)+(1.007)+(2.005), (I-302)+(1.007)+(2.006), (I-302)+(1.007)+(2.007), (I-302)+(1.007)+(2.008), (I-302)+(1.007)+(2.009), (I-302)+(1.007)+(2.010), (I-302)+(1.007)+(2.011), (I-302)+(1.007)+(2.012), (I-302)+(1.007)+(2.013), (I-302)+(1.007)+(2.014), (I-302)+(1.007)+(2.015), (I-302)+(1.007)+(2.016), (I-302)+(1.007)+(2.017), (I-302)+(1.007)+(2.018), (I-302)+(1.007)+(2.019), (I-302)+(1.007)+(2.020), (I-302)+(1.007)+(2.021), (I-302)+(1.007)+(2.022), (I-302)+(1.007)+(2.023), (I-302)+(1.007)+(2.024), (I-302)+(1.007)+(2.025), (I-302)+(1.007)+(2.026), (I-302)+(1.007)+(2.027), (I-302)+(1.007)+(2.028), (I-302)+(1.007)+(2.029), (I-302)+(1.007)+(2.030), (I-302)+(1.007)+(2.031), (I-302)+(1.007)+(2.032), (I-302)+(1.007)+(2.033), (I-302)+(1.007)+(2.034), (I-302)+(1.007)+(2.035), (I-302)+(1.007)+(2.036), (I-302)+(1.007)+(2.037), (I-302)+(1.007)+(2.038), (I-302)+(1.007)+(2.039), (I-302)+(1.007)+(2.040), (I-302)+(1.007)+(2.041), (I-302)+(1.007)+(2.042), (I-302)+(1.007)+(2.043), (I-302)+(1.007)+(2.044), (I-302)+(1.007)+(2.045), (I-302)+(1.007)+(2.046), (I-302)+(1.007)+(2.047), (I-302)+(1.007)+(2.048), (I-302)+(1.007)+(2.049), (I-302)+(1.007)+(2.050), (I-302)+(1.007)+(2.051), (I-302)+(1.007)+(2.052), (I-302)+(1.007)+(2.053), (I-302)+(1.007)+(2.054), (I-302)+(1.007)+(2.055), (I-302)+(1.007)+(2.056), (I-302)+(1.007)+(2.057), (I-302)+(1.007)+(2.058), (I-302)+(1.007)+(2.059), (I-302)+(1.007)+(3.001), (I-302)+(1.007)+(3.002), (I-302)+(1.007)+(3.003), (I-302)+(1.007)+(3.004), (I-302)+(1.007)+(3.005), (I-302)+(1.007)+(3.006), (I-302)+(1.007)+(3.007), (I-302)+(1.007)+(3.008), (I-302)+(1.007)+(3.009), (I-302)+(1.007)+(3.010), (I-302)+(1.007)+(3.011), (I-302)+(1.007)+(3.012), (I-302)+(1.007)+(3.013), (I-302)+(1.007)+(3.014), (I-302)+(1.007)+(3.015), (I-302)+(1.007)+(3.016), (I-302)+(1.007)+(3.017), (I-302)+(1.007)+(3.018), (I-302)+(1.007)+(3.019), (I-302)+(1.007)+(3.020), (I-302)+(1.007)+(3.021), (I-302)+(1.007)+(3.022), (I-302)+(1.007)+(3.023), (I-302)+(1.007)+(3.024), (I-302)+(1.007)+(3.025), (I-302)+(1.007)+(3.026), (I-302)+(1.007)+(3.027), (I-302)+(1.007)+(3.028), (I-302)+(1.007)+(3.029), (I-302)+(1.007)+(3.030), (I-302)+(1.007)+(3.031), (I-302)+(1.007)+(5.001), (I-302)+(1.007)+(5.002), (I-302)+(1.007)+(5.003), (I-302)+(1.007)+(5.004), (I-302)+(1.007)+(5.005), (I-302)+(1.007)+(5.006), (I-302)+(1.007)+(5.007), (I-302)+(1.007)+(5.008), (I-302)+(1.007)+(5.009), (I-302)+(1.007)+(5.010), (I-302)+(1.007)+(5.011), (I-302)+(1.007)+(5.012), (I-302)+(1.007)+(5.013), (I-302)+(1.007)+(5.014), (I-302)+(1.007)+(5.015), (I-302)+(1.007)+(5.016), (I-302)+(1.007)+(5.017), (I-302)+(1.007)+(5.018), (I-302)+(1.007)+(5.019), (I-302)+(1.007)+(5.020), (I-302)+(1.007)+(5.021), (I-302)+(1.007)+(5.022), (I-302)+(1.007)+(5.023), (I-302)+(1.007)+(6.001), (I-302)+(1.007)+(6.002), (I-302)+(1.007)+(6.003), (I-302)+(1.007)+(6.004), (I-302)+(1.007)+(7.001), (I-302)+(1.007)+(7.002), (I-302)+(1.007)+(7.003), (I-302)+(1.007)+(7.004), (I-302)+(1.007)+(7.005), (I-302)+(1.007)+(7.006), (I-302)+(1.007)+(9.001), (I-302)+(1.007)+(9.002), (I-302)+(1.007)+(9.003), (I-302)+(1.007)+(9.004), (I-302)+(1.007)+(9.005), (I-302)+(1.007)+(9.006), (I-302)+(1.007)+(9.007), (I-302)+(1.007)+(9.008), (I-302)+(1.007)+(9.009), (I-302)+(1.007)+(14.001), (I-302)+(1.007)+(14.002), (I-302)+(1.007)+(15.008), (I-302)+(1.007)+(15.011), (I-302)+(1.007)+(15.012), (I-302)+(1.007)+(15.016), (I-302)+(1.007)+(15.025), (I-302)+(1.007)+(15.027), (I-302)+(1.007)+(15.047), (I-302)+(1.007)+(15.063), (I-302)+(1.007)+(15.064), (I-302)+(1.007)+(16.001), (I-302)+(1.007)+(16.002), (I-302)+(1.007)+(16.003), (I-302)+(1.007)+(16.004), (I-302)+(1.007)+(16.005), (I-302)+(1.007)+(16.006), (I-302)+(1.007)+(16.007), (I-302)+(1.007)+(16.008), (I-302)+(1.007)+(17.001), (I-302)+(1.007)+(17.002), (I-302)+(1.007)+(17.003), (I-302)+(1.007)+(17.004), (I-302)+(1.007)+(17.005), (I-302)+(1.007)+(17.006), (I-302)+(1.007)+(17.007), (I-302)+(1.007)+(17.008), (I-302)+(1.007)+(17.009), (I-302)+(1.007)+(17.010), (I-302)+(1.007)+(17.011), (I-302)+(1.007)+(17.012), (I-302)+(1.007)+(18.001), (I-302)+(1.008)+(1.009), (I-302)+(1.008)+(1.010), (I-302)+(1.008)+(1.011), (I-302)+(1.008)+(1.012), (I-302)+(1.008)+(1.013), (I-302)+(1.008)+(1.014), (I-302)+(1.008)+(1.015), (I-302)+(1.008)+(1.016), (I-302)+(1.008)+(1.017), (I-302)+(1.008)+(1.018), (I-302)+(1.008)+(1.019), (I-302)+(1.008)+(1.020), (I-302)+(1.008)+(1.021), (I-302)+(1.008)+(1.022), (I-302)+(1.008)+(1.023), (I-302)+(1.008)+(1.024), (I-302)+(1.008)+(1.025), (I-302)+(1.008)+(1.026), (I-302)+(1.008)+(1.027), (I-302)+(1.008)+(1.028), (I-302)+(1.008)+(1.029), (I-302)+(1.008)+(1.030), (I-302)+(1.008)+(1.031), (I-302)+(1.008)+(1.032), (I-302)+(1.008)+(1.033), (I-302)+(1.008)+(1.034), (I-302)+(1.008)+(1.035), (I-302)+(1.008)+(1.036), (I-302)+(1.008)+(1.037), (I-302)+(1.008)+(1.038), (I-302)+(1.008)+(1.039), (I-302)+(1.008)+(1.040), (I-302)+(1.008)+(1.041), (I-302)+(1.008)+(1.042), (I-302)+(1.008)+(1.043), (I-302)+(1.008)+(1.044), (I-302)+(1.008)+(1.045), (I-302)+(1.008)+(1.046), (I-302)+(1.008)+(1.047), (I-302)+(1.008)+(1.048), (I-302)+(1.008)+(1.049), (I-302)+(1.008)+(1.050), (I-302)+(1.008)+(1.051), (I-302)+(1.008)+(1.052), (I-302)+(1.008)+(1.053), (I-302)+(1.008)+(1.054), (I-302)+(1.008)+(1.055), (I-302)+(1.008)+(1.056), (I-302)+(1.008)+(1.057), (I-302)+(1.008)+(1.058), (I-302)+(1.008)+(1.059), (I-302)+(1.008)+(1.060), (I-302)+(1.008)+(1.061), (I-302)+(1.008)+(1.062), (I-302)+(1.008)+(1.063), (I-302)+(1.008)+(1.064), (I-302)+(1.008)+(1.065), (I-302)+(1.008)+(1.066), (I-302)+(1.008)+(1.067), (I-302)+(1.008)+(1.068), (I-302)+(1.008)+(1.069), (I-302)+(1.008)+(1.070), (I-302)+(1.008)+(1.071), (I-302)+(1.008)+(1.072), (I-302)+(1.008)+(1.073), (I-302)+(1.008)+(1.074), (I-302)+(1.008)+(1.075), (I-302)+(1.008)+(1.076), (I-302)+(1.008)+(1.077), (I-302)+(1.008)+(1.078), (I-302)+(1.008)+(1.079), (I-302)+(1.008)+(1.080), (I-302)+(1.008)+(1.081), (I-302)+(1.008)+(1.082), (I-302)+(1.008)+(1.083), (I-302)+(1.008)+(1.084), (I-302)+(1.008)+(1.085), (I-302)+(1.008)+(1.086), (I-302)+(1.008)+(1.087), (I-302)+(1.008)+(1.088), (I-302)+(1.008)+(1.089), (I-302)+(1.008)+(1.090), (I-302)+(1.008)+(1.091), (I-302)+(1.008)+(1.092), (I-302)+(1.008)+(2.001), (I-302)+(1.008)+(2.002), (I-302)+(1.008)+(2.003), (I-302)+(1.008)+(2.004), (I-302)+(1.008)+(2.005), (I-302)+(1.008)+(2.006), (I-302)+(1.008)+(2.007), (I-302)+(1.008)+(2.008), (I-302)+(1.008)+(2.009), (I-302)+(1.008)+(2.010), (I-302)+(1.008)+(2.011), (I-302)+(1.008)+(2.012), (I-302)+(1.008)+(2.013), (I-302)+(1.008)+(2.014), (I-302)+(1.008)+(2.015), (I-302)+(1.008)+(2.016), (I-302)+(1.008)+(2.017), (I-302)+(1.008)+(2.018), (I-302)+(1.008)+(2.019), (I-302)+(1.008)+(2.020), (I-302)+(1.008)+(2.021), (I-302)+(1.008)+(2.022), (I-302)+(1.008)+(2.023), (I-302)+(1.008)+(2.024), (I-302)+(1.008)+(2.025), (I-302)+(1.008)+(2.026), (I-302)+(1.008)+(2.027), (I-302)+(1.008)+(2.028), (I-302)+(1.008)+(2.029), (I-302)+(1.008)+(2.030), (I-302)+(1.008)+(2.031), (I-302)+(1.008)+(2.032), (I-302)+(1.008)+(2.033), (I-302)+(1.008)+(2.034), (I-302)+(1.008)+(2.035), (I-302)+(1.008)+(2.036), (I-302)+(1.008)+(2.037), (I-302)+(1.008)+(2.038), (I-302)+(1.008)+(2.039), (I-302)+(1.008)+(2.040), (I-302)+(1.008)+(2.041), (I-302)+(1.008)+(2.042), (I-302)+(1.008)+(2.043), (I-302)+(1.008)+(2.044), (I-302)+(1.008)+(2.045), (I-302)+(1.008)+(2.046), (I-302)+(1.008)+(2.047), (I-302)+(1.008)+(2.048), (I-302)+(1.008)+(2.049), (I-302)+(1.008)+(2.050), (I-302)+(1.008)+(2.051), (I-302)+(1.008)+(2.052), (I-302)+(1.008)+(2.053), (I-302)+(1.008)+(2.054), (I-302)+(1.008)+(2.055), (I-302)+(1.008)+(2.056), (I-302)+(1.008)+(2.057), (I-302)+(1.008)+(2.058), (I-302)+(1.008)+(2.059), (I-302)+(1.008)+(3.001), (I-302)+(1.008)+(3.002), (I-302)+(1.008)+(3.003), (I-302)+(1.008)+(3.004), (I-302)+(1.008)+(3.005), (I-302)+(1.008)+(3.006), (I-302)+(1.008)+(3.007), (I-302)+(1.008)+(3.008), (I-302)+(1.008)+(3.009), (I-302)+(1.008)+(3.010), (I-302)+(1.008)+(3.011), (I-302)+(1.008)+(3.012), (I-302)+(1.008)+(3.013), (I-302)+(1.008)+(3.014), (I-302)+(1.008)+(3.015), (I-302)+(1.008)+(3.016), (I-302)+(1.008)+(3.017), (I-302)+(1.008)+(3.018), (I-302)+(1.008)+(3.019), (I-302)+(1.008)+(3.020), (I-302)+(1.008)+(3.021), (I-302)+(1.008)+(3.022), (I-302)+(1.008)+(3.023), (I-302)+(1.008)+(3.024), (I-302)+(1.008)+(3.025), (I-302)+(1.008)+(3.026), (I-302)+(1.008)+(3.027), (I-302)+(1.008)+(3.028), (I-302)+(1.008)+(3.029), (I-302)+(1.008)+(3.030), (I-302)+(1.008)+(3.031), (I-302)+(1.008)+(5.001), (I-302)+(1.008)+(5.002), (I-302)+(1.008)+(5.003), (I-302)+(1.008)+(5.004), (I-302)+(1.008)+(5.005), (I-302)+(1.008)+(5.006), (I-302)+(1.008)+(5.007), (I-302)+(1.008)+(5.008), (I-302)+(1.008)+(5.009), (I-302)+(1.008)+(5.010), (I-302)+(1.008)+(5.011), (I-302)+(1.008)+(5.012), (I-302)+(1.008)+(5.013), (I-302)+(1.008)+(5.014), (I-302)+(1.008)+(5.015), (I-302)+(1.008)+(5.016), (I-302)+(1.008)+(5.017), (I-302)+(1.008)+(5.018), (I-302)+(1.008)+(5.019), (I-302)+(1.008)+(5.020), (I-302)+(1.008)+(5.021), (I-302)+(1.008)+(5.022), (I-302)+(1.008)+(5.023), (I-302)+(1.008)+(6.001), (I-302)+(1.008)+(6.002), (I-302)+(1.008)+(6.003), (I-302)+(1.008)+(6.004), (I-302)+(1.008)+(7.001), (I-302)+(1.008)+(7.002), (I-302)+(1.008)+(7.003), (I-302)+(1.008)+(7.004), (I-302)+(1.008)+(7.005), (I-302)+(1.008)+(7.006), (I-302)+(1.008)+(9.001), (I-302)+(1.008)+(9.002), (I-302)+(1.008)+(9.003), (I-302)+(1.008)+(9.004), (I-302)+(1.008)+(9.005), (I-302)+(1.008)+(9.006), (I-302)+(1.008)+(9.007), (I-302)+(1.008)+(9.008), (I-302)+(1.008)+(9.009), (I-302)+(1.008)+(14.001), (I-302)+(1.008)+(14.002), (I-302)+(1.008)+(15.008), (I-302)+(1.008)+(15.011), (I-302)+(1.008)+(15.012), (I-302)+(1.008)+(15.016), (I-302)+(1.008)+(15.025), (I-302)+(1.008)+(15.027), (I-302)+(1.008)+(15.047), (I-302)+(1.008)+(15.063), (I-302)+(1.008)+(15.064), (I-302)+(1.008)+(16.001), (I-302)+(1.008)+(16.002), (I-302)+(1.008)+(16.003), (I-302)+(1.008)+(16.004), (I-302)+(1.008)+(16.005), (I-302)+(1.008)+(16.006), (I-302)+(1.008)+(16.007), (I-302)+(1.008)+(16.008), (I-302)+(1.008)+(17.001), (I-302)+(1.008)+(17.002), (I-302)+(1.008)+(17.003), (I-302)+(1.008)+(17.004), (I-302)+(1.008)+(17.005), (I-302)+(1.008)+(17.006), (I-302)+(1.008)+(17.007), (I-302)+(1.008)+(17.008), (I-302)+(1.008)+(17.009), (I-302)+(1.008)+(17.010), (I-302)+(1.008)+(17.011), (I-302)+(1.008)+(17.012), (I-302)+(1.008)+(18.001), (I-302)+(1.009)+(1.010), (I-302)+(1.009)+(1.011), (I-302)+(1.009)+(1.012), (I-302)+(1.009)+(1.013), (I-302)+(1.009)+(1.014), (I-302)+(1.009)+(1.015), (I-302)+(1.009)+(1.016), (I-302)+(1.009)+(1.017), (I-302)+(1.009)+(1.018), (I-302)+(1.009)+(1.019), (I-302)+(1.009)+(1.020), (I-302)+(1.009)+(1.021), (I-302)+(1.009)+(1.022), (I-302)+(1.009)+(1.023), (I-302)+(1.009)+(1.024), (I-302)+(1.009)+(1.025), (I-302)+(1.009)+(1.026), (I-302)+(1.009)+(1.027), (I-302)+(1.009)+(1.028), (I-302)+(1.009)+(1.029), (I-302)+(1.009)+(1.030), (I-302)+(1.009)+(1.031), (I-302)+(1.009)+(1.032), (I-302)+(1.009)+(1.033), (I-302)+(1.009)+(1.034), (I-302)+(1.009)+(1.035), (I-302)+(1.009)+(1.036), (I-302)+(1.009)+(1.037), (I-302)+(1.009)+(1.038), (I-302)+(1.009)+(1.039), (I-302)+(1.009)+(1.040), (I-302)+(1.009)+(1.041), (I-302)+(1.009)+(1.042), (I-302)+(1.009)+(1.043), (I-302)+(1.009)+(1.044), (I-302)+(1.009)+(1.045), (I-302)+(1.009)+(1.046), (I-302)+(1.009)+(1.047), (I-302)+(1.009)+(1.048), (I-302)+(1.009)+(1.049), (I-302)+(1.009)+(1.050), (I-302)+(1.009)+(1.051), (I-302)+(1.009)+(1.052), (I-302)+(1.009)+(1.053), (I-302)+(1.009)+(1.054), (I-302)+(1.009)+(1.055), (I-302)+(1.009)+(1.056), (I-302)+(1.009)+(1.057), (I-302)+(1.009)+(1.058), (I-302)+(1.009)+(1.059), (I-302)+(1.009)+(1.060), (I-302)+(1.009)+(1.061), (I-302)+(1.009)+(1.062), (I-302)+(1.009)+(1.063), (I-302)+(1.009)+(1.064), (I-302)+(1.009)+(1.065), (I-302)+(1.009)+(1.066), (I-302)+(1.009)+(1.067), (I-302)+(1.009)+(1.068), (I-302)+(1.009)+(1.069), (I-302)+(1.009)+(1.070), (I-302)+(1.009)+(1.071), (I-302)+(1.009)+(1.072), (I-302)+(1.009)+(1.073), (I-302)+(1.009)+(1.074), (I-302)+(1.009)+(1.075), (I-302)+(1.009)+(1.076), (I-302)+(1.009)+(1.077), (I-302)+(1.009)+(1.078), (I-302)+(1.009)+(1.079), (I-302)+(1.009)+(1.080), (I-302)+(1.009)+(1.081), (I-302)+(1.009)+(1.082), (I-302)+(1.009)+(1.083), (I-302)+(1.009)+(1.084), (I-302)+(1.009)+(1.085), (I-302)+(1.009)+(1.086), (I-302)+(1.009)+(1.087), (I-302)+(1.009)+(1.088), (I-302)+(1.009)+(1.089), (I-302)+(1.009)+(1.090), (I-302)+(1.009)+(1.091), (I-302)+(1.009)+(1.092), (I-302)+(1.009)+(2.001), (I-302)+(1.009)+(2.002), (I-302)+(1.009)+(2.003), (I-302)+(1.009)+(2.004), (I-302)+(1.009)+(2.005), (I-302)+(1.009)+(2.006), (I-302)+(1.009)+(2.007), (I-302)+(1.009)+(2.008), (I-302)+(1.009)+(2.009), (I-302)+(1.009)+(2.010), (I-302)+(1.009)+(2.011), (I-302)+(1.009)+(2.012), (I-302)+(1.009)+(2.013), (I-302)+(1.009)+(2.014), (I-302)+(1.009)+(2.015), (I-302)+(1.009)+(2.016), (I-302)+(1.009)+(2.017), (I-302)+(1.009)+(2.018), (I-302)+(1.009)+(2.019), (I-302)+(1.009)+(2.020), (I-302)+(1.009)+(2.021), (I-302)+(1.009)+(2.022), (I-302)+(1.009)+(2.023), (I-302)+(1.009)+(2.024), (I-302)+(1.009)+(2.025), (I-302)+(1.009)+(2.026), (I-302)+(1.009)+(2.027), (I-302)+(1.009)+(2.028), (I-302)+(1.009)+(2.029), (I-302)+(1.009)+(2.030), (I-302)+(1.009)+(2.031), (I-302)+(1.009)+(2.032), (I-302)+(1.009)+(2.033), (I-302)+(1.009)+(2.034), (I-302)+(1.009)+(2.035), (I-302)+(1.009)+(2.036), (I-302)+(1.009)+(2.037), (I-302)+(1.009)+(2.038), (I-302)+(1.009)+(2.039), (I-302)+(1.009)+(2.040), (I-302)+(1.009)+(2.041), (I-302)+(1.009)+(2.042), (I-302)+(1.009)+(2.043), (I-302)+(1.009)+(2.044), (I-302)+(1.009)+(2.045), (I-302)+(1.009)+(2.046), (I-302)+(1.009)+(2.047), (I-302)+(1.009)+(2.048), (I-302)+(1.009)+(2.049), (I-302)+(1.009)+(2.050), (I-302)+(1.009)+(2.051), (I-302)+(1.009)+(2.052), (I-302)+(1.009)+(2.053), (I-302)+(1.009)+(2.054), (I-302)+(1.009)+(2.055), (I-302)+(1.009)+(2.056), (I-302)+(1.009)+(2.057), (I-302)+(1.009)+(2.058), (I-302)+(1.009)+(2.059), (I-302)+(1.009)+(3.001), (I-302)+(1.009)+(3.002), (I-302)+(1.009)+(3.003), (I-302)+(1.009)+(3.004), (I-302)+(1.009)+(3.005), (I-302)+(1.009)+(3.006), (I-302)+(1.009)+(3.007), (I-302)+(1.009)+(3.008), (I-302)+(1.009)+(3.009), (I-302)+(1.009)+(3.010), (I-302)+(1.009)+(3.011), (I-302)+(1.009)+(3.012), (I-302)+(1.009)+(3.013), (I-302)+(1.009)+(3.014), (I-302)+(1.009)+(3.015), (I-302)+(1.009)+(3.016), (I-302)+(1.009)+(3.017), (I-302)+(1.009)+(3.018), (I-302)+(1.009)+(3.019), (I-302)+(1.009)+(3.020), (I-302)+(1.009)+(3.021), (I-302)+(1.009)+(3.022), (I-302)+(1.009)+(3.023), (I-302)+(1.009)+(3.024), (I-302)+(1.009)+(3.025), (I-302)+(1.009)+(3.026), (I-302)+(1.009)+(3.027), (I-302)+(1.009)+(3.028), (I-302)+(1.009)+(3.029), (I-302)+(1.009)+(3.030), (I-302)+(1.009)+(3.031), (I-302)+(1.009)+(5.001), (I-302)+(1.009)+(5.002), (I-302)+(1.009)+(5.003), (I-302)+(1.009)+(5.004), (I-302)+(1.009)+(5.005), (I-302)+(1.009)+(5.006), (I-302)+(1.009)+(5.007), (I-302)+(1.009)+(5.008), (I-302)+(1.009)+(5.009), (I-302)+(1.009)+(5.010), (I-302)+(1.009)+(5.011), (I-302)+(1.009)+(5.012), (I-302)+(1.009)+(5.013), (I-302)+(1.009)+(5.014), (I-302)+(1.009)+(5.015), (I-302)+(1.009)+(5.016), (I-302)+(1.009)+(5.017), (I-302)+(1.009)+(5.018), (I-302)+(1.009)+(5.019), (I-302)+(1.009)+(5.020), (I-302)+(1.009)+(5.021), (I-302)+(1.009)+(5.022), (I-302)+(1.009)+(5.023), (I-302)+(1.009)+(6.001), (I-302)+(1.009)+(6.002), (I-302)+(1.009)+(6.003), (I-302)+(1.009)+(6.004), (I-302)+(1.009)+(7.001), (I-302)+(1.009)+(7.002), (I-302)+(1.009)+(7.003), (I-302)+(1.009)+(7.004), (I-302)+(1.009)+(7.005), (I-302)+(1.009)+(7.006), (I-302)+(1.009)+(9.001), (I-302)+(1.009)+(9.002), (I-302)+(1.009)+(9.003), (I-302)+(1.009)+(9.004), (I-302)+(1.009)+(9.005), (I-302)+(1.009)+(9.006), (I-302)+(1.009)+(9.007), (I-302)+(1.009)+(9.008), (I-302)+(1.009)+(9.009), (I-302)+(1.009)+(14.001), (I-302)+(1.009)+(14.002), (I-302)+(1.009)+(15.008), (I-302)+(1.009)+(15.011), (I-302)+(1.009)+(15.012), (I-302)+(1.009)+(15.016), (I-302)+(1.009)+(15.025), (I-302)+(1.009)+(15.027), (I-302)+(1.009)+(15.047), (I-302)+(1.009)+(15.063), (I-302)+(1.009)+(15.064), (I-302)+(1.009)+(16.001), (I-302)+(1.009)+(16.002), (I-302)+(1.009)+(16.003), (I-302)+(1.009)+(16.004), (I-302)+(1.009)+(16.005), (I-302)+(1.009)+(16.006), (I-302)+(1.009)+(16.007), (I-302)+(1.009)+(16.008), (I-302)+(1.009)+(17.001), (I-302)+(1.009)+(17.002), (I-302)+(1.009)+(17.003), (I-302)+(1.009)+(17.004), (I-302)+(1.009)+(17.005), (I-302)+(1.009)+(17.006), (I-302)+(1.009)+(17.007), (I-302)+(1.009)+(17.008), (I-302)+(1.009)+(17.009), (I-302)+(1.009)+(17.010), (I-302)+(1.009)+(17.011), (I-302)+(1.009)+(17.012), (I-302)+(1.009)+(18.001), (I-302)+(1.010)+(1.011), (I-302)+(1.010)+(1.012), (I-302)+(1.010)+(1.013), (I-302)+(1.010)+(1.014), (I-302)+(1.010)+(1.015), (I-302)+(1.010)+(1.016), (I-302)+(1.010)+(1.017), (I-302)+(1.010)+(1.018), (I-302)+(1.010)+(1.019), (I-302)+(1.010)+(1.020), (I-302)+(1.010)+(1.021), (I-302)+(1.010)+(1.022), (I-302)+(1.010)+(1.023), (I-302)+(1.010)+(1.024), (I-302)+(1.010)+(1.025), (I-302)+(1.010)+(1.026), (I-302)+(1.010)+(1.027), (I-302)+(1.010)+(1.028), (I-302)+(1.010)+(1.029), (I-302)+(1.010)+(1.030), (I-302)+(1.010)+(1.031), (I-302)+(1.010)+(1.032), (I-302)+(1.010)+(1.033), (I-302)+(1.010)+(1.034), (I-302)+(1.010)+(1.035), (I-302)+(1.010)+(1.036), (I-302)+(1.010)+(1.037), (I-302)+(1.010)+(1.038), (I-302)+(1.010)+(1.039), (I-302)+(1.010)+(1.040), (I-302)+(1.010)+(1.041), (I-302)+(1.010)+(1.042), (I-302)+(1.010)+(1.043), (I-302)+(1.010)+(1.044), (I-302)+(1.010)+(1.045), (I-302)+(1.010)+(1.046), (I-302)+(1.010)+(1.047), (I-302)+(1.010)+(1.048), (I-302)+(1.010)+(1.049), (I-302)+(1.010)+(1.050), (I-302)+(1.010)+(1.051), (I-302)+(1.010)+(1.052), (I-302)+(1.010)+(1.053), (I-302)+(1.010)+(1.054), (I-302)+(1.010)+(1.055), (I-302)+(1.010)+(1.056), (I-302)+(1.010)+(1.057), (I-302)+(1.010)+(1.058), (I-302)+(1.010)+(1.059), (I-302)+(1.010)+(1.060), (I-302)+(1.010)+(1.061), (I-302)+(1.010)+(1.062), (I-302)+(1.010)+(1.063), (I-302)+(1.010)+(1.064), (I-302)+(1.010)+(1.065), (I-302)+(1.010)+(1.066), (I-302)+(1.010)+(1.067), (I-302)+(1.010)+(1.068), (I-302)+(1.010)+(1.069), (I-302)+(1.010)+(1.070), (I-302)+(1.010)+(1.071), (I-302)+(1.010)+(1.072), (I-302)+(1.010)+(1.073), (I-302)+(1.010)+(1.074), (I-302)+(1.010)+(1.075), (I-302)+(1.010)+(1.076), (I-302)+(1.010)+(1.077), (I-302)+(1.010)+(1.078), (I-302)+(1.010)+(1.079), (I-302)+(1.010)+(1.080), (I-302)+(1.010)+(1.081), (I-302)+(1.010)+(1.082), (I-302)+(1.010)+(1.083), (I-302)+(1.010)+(1.084), (I-302)+(1.010)+(1.085), (I-302)+(1.010)+(1.086), (I-302)+(1.010)+(1.087), (I-302)+(1.010)+(1.088), (I-302)+(1.010)+(1.089), (I-302)+(1.010)+(1.090), (I-302)+(1.010)+(1.091), (I-302)+(1.010)+(1.092), (I-302)+(1.010)+(2.001), (I-302)+(1.010)+(2.002), (I-302)+(1.010)+(2.003), (I-302)+(1.010)+(2.004), (I-302)+(1.010)+(2.005), (I-302)+(1.010)+(2.006), (I-302)+(1.010)+(2.007), (I-302)+(1.010)+(2.008), (I-302)+(1.010)+(2.009), (I-302)+(1.010)+(2.010), (I-302)+(1.010)+(2.011), (I-302)+(1.010)+(2.012), (I-302)+(1.010)+(2.013), (I-302)+(1.010)+(2.014), (I-302)+(1.010)+(2.015), (I-302)+(1.010)+(2.016), (I-302)+(1.010)+(2.017), (I-302)+(1.010)+(2.018), (I-302)+(1.010)+(2.019), (I-302)+(1.010)+(2.020), (I-302)+(1.010)+(2.021), (I-302)+(1.010)+(2.022), (I-302)+(1.010)+(2.023), (I-302)+(1.010)+(2.024), (I-302)+(1.010)+(2.025), (I-302)+(1.010)+(2.026), (I-302)+(1.010)+(2.027), (I-302)+(1.010)+(2.028), (I-302)+(1.010)+(2.029), (I-302)+(1.010)+(2.030), (I-302)+(1.010)+(2.031), (I-302)+(1.010)+(2.032), (I-302)+(1.010)+(2.033), (I-302)+(1.010)+(2.034), (I-302)+(1.010)+(2.035), (I-302)+(1.010)+(2.036), (I-302)+(1.010)+(2.037), (I-302)+(1.010)+(2.038), (I-302)+(1.010)+(2.039), (I-302)+(1.010)+(2.040), (I-302)+(1.010)+(2.041), (I-302)+(1.010)+(2.042), (I-302)+(1.010)+(2.043), (I-302)+(1.010)+(2.044), (I-302)+(1.010)+(2.045), (I-302)+(1.010)+(2.046), (I-302)+(1.010)+(2.047), (I-302)+(1.010)+(2.048), (I-302)+(1.010)+(2.049), (I-302)+(1.010)+(2.050), (I-302)+(1.010)+(2.051), (I-302)+(1.010)+(2.052), (I-302)+(1.010)+(2.053), (I-302)+(1.010)+(2.054), (I-302)+(1.010)+(2.055), (I-302)+(1.010)+(2.056), (I-302)+(1.010)+(2.057), (I-302)+(1.010)+(2.058), (I-302)+(1.010)+(2.059), (I-302)+(1.010)+(3.001), (I-302)+(1.010)+(3.002), (I-302)+(1.010)+(3.003), (I-302)+(1.010)+(3.004), (I-302)+(1.010)+(3.005), (I-302)+(1.010)+(3.006), (I-302)+(1.010)+(3.007), (I-302)+(1.010)+(3.008), (I-302)+(1.010)+(3.009), (I-302)+(1.010)+(3.010), (I-302)+(1.010)+(3.011), (I-302)+(1.010)+(3.012), (I-302)+(1.010)+(3.013), (I-302)+(1.010)+(3.014), (I-302)+(1.010)+(3.015), (I-302)+(1.010)+(3.016), (I-302)+(1.010)+(3.017), (I-302)+(1.010)+(3.018), (I-302)+(1.010)+(3.019), (I-302)+(1.010)+(3.020), (I-302)+(1.010)+(3.021), (I-302)+(1.010)+(3.022), (I-302)+(1.010)+(3.023), (I-302)+(1.010)+(3.024), (I-302)+(1.010)+(3.025), (I-302)+(1.010)+(3.026), (I-302)+(1.010)+(3.027), (I-302)+(1.010)+(3.028), (I-302)+(1.010)+(3.029), (I-302)+(1.010)+(3.030), (I-302)+(1.010)+(3.031), (I-302)+(1.010)+(5.001), (I-302)+(1.010)+(5.002), (I-302)+(1.010)+(5.003), (I-302)+(1.010)+(5.004), (I-302)+(1.010)+(5.005), (I-302)+(1.010)+(5.006), (I-302)+(1.010)+(5.007), (I-302)+(1.010)+(5.008), (I-302)+(1.010)+(5.009), (I-302)+(1.010)+(5.010), (I-302)+(1.010)+(5.011), (I-302)+(1.010)+(5.012), (I-302)+(1.010)+(5.013), (I-302)+(1.010)+(5.014), (I-302)+(1.010)+(5.015), (I-302)+(1.010)+(5.016), (I-302)+(1.010)+(5.017), (I-302)+(1.010)+(5.018), (I-302)+(1.010)+(5.019), (I-302)+(1.010)+(5.020), (I-302)+(1.010)+(5.021), (I-302)+(1.010)+(5.022), (I-302)+(1.010)+(5.023), (I-302)+(1.010)+(6.001), (I-302)+(1.010)+(6.002), (I-302)+(1.010)+(6.003), (I-302)+(1.010)+(6.004), (I-302)+(1.010)+(7.001), (I-302)+(1.010)+(7.002), (I-302)+(1.010)+(7.003), (I-302)+(1.010)+(7.004), (I-302)+(1.010)+(7.005), (I-302)+(1.010)+(7.006), (I-302)+(1.010)+(9.001), (I-302)+(1.010)+(9.002), (I-302)+(1.010)+(9.003), (I-302)+(1.010)+(9.004), (I-302)+(1.010)+(9.005), (I-302)+(1.010)+(9.006), (I-302)+(1.010)+(9.007), (I-302)+(1.010)+(9.008), (I-302)+(1.010)+(9.009), (I-302)+(1.010)+(14.001), (I-302)+(1.010)+(14.002), (I-302)+(1.010)+(15.008), (I-302)+(1.010)+(15.011), (I-302)+(1.010)+(15.012), (I-302)+(1.010)+(15.016), (I-302)+(1.010)+(15.025), (I-302)+(1.010)+(15.027), (I-302)+(1.010)+(15.047), (I-302)+(1.010)+(15.063), (I-302)+(1.010)+(15.064), (I-302)+(1.010)+(16.001), (I-302)+(1.010)+(16.002), (I-302)+(1.010)+(16.003), (I-302)+(1.010)+(16.004), (I-302)+(1.010)+(16.005), (I-302)+(1.010)+(16.006), (I-302)+(1.010)+(16.007), (I-302)+(1.010)+(16.008), (I-302)+(1.010)+(17.001), (I-302)+(1.010)+(17.002), (I-302)+(1.010)+(17.003), (I-302)+(1.010)+(17.004), (I-302)+(1.010)+(17.005), (I-302)+(1.010)+(17.006), (I-302)+(1.010)+(17.007), (I-302)+(1.010)+(17.008), (I-302)+(1.010)+(17.009), (I-302)+(1.010)+(17.010), (I-302)+(1.010)+(17.011), (I-302)+(1.010)+(17.012), (I-302)+(1.010)+(18.001), (I-302)+(1.011)+(1.012), (I-302)+(1.011)+(1.013), (I-302)+(1.011)+(1.014), (I-302)+(1.011)+(1.015), (I-302)+(1.011)+(1.016), (I-302)+(1.011)+(1.017), (I-302)+(1.011)+(1.018), (I-302)+(1.011)+(1.019), (I-302)+(1.011)+(1.020), (I-302)+(1.011)+(1.021), (I-302)+(1.011)+(1.022), (I-302)+(1.011)+(1.023), (I-302)+(1.011)+(1.024), (I-302)+(1.011)+(1.025), (I-302)+(1.011)+(1.026), (I-302)+(1.011)+(1.027), (I-302)+(1.011)+(1.028), (I-302)+(1.011)+(1.029), (I-302)+(1.011)+(1.030), (I-302)+(1.011)+(1.031), (I-302)+(1.011)+(1.032), (I-302)+(1.011)+(1.033), (I-302)+(1.011)+(1.034), (I-302)+(1.011)+(1.035), (I-302)+(1.011)+(1.036), (I-302)+(1.011)+(1.037), (I-302)+(1.011)+(1.038), (I-302)+(1.011)+(1.039), (I-302)+(1.011)+(1.040), (I-302)+(1.011)+(1.041), (I-302)+(1.011)+(1.042), (I-302)+(1.011)+(1.043), (I-302)+(1.011)+(1.044), (I-302)+(1.011)+(1.045), (I-302)+(1.011)+(1.046), (I-302)+(1.011)+(1.047), (I-302)+(1.011)+(1.048), (I-302)+(1.011)+(1.049), (I-302)+(1.011)+(1.050), (I-302)+(1.011)+(1.051), (I-302)+(1.011)+(1.052), (I-302)+(1.011)+(1.053), (I-302)+(1.011)+(1.054), (I-302)+(1.011)+(1.055), (I-302)+(1.011)+(1.056), (I-302)+(1.011)+(1.057), (I-302)+(1.011)+(1.058), (I-302)+(1.011)+(1.059), (I-302)+(1.011)+(1.060), (I-302)+(1.011)+(1.061), (I-302)+(1.011)+(1.062), (I-302)+(1.011)+(1.063), (I-302)+(1.011)+(1.064), (I-302)+(1.011)+(1.065), (I-302)+(1.011)+(1.066), (I-302)+(1.011)+(1.067), (I-302)+(1.011)+(1.068), (I-302)+(1.011)+(1.069),
(I-302)+(1.011)+(1.070), (I-302)+(1.011)+(1.071),
(I-302)+(1.011)+(1.072), (I-302)+(1.011)+(1.073),
(I-302)+(1.011)+(1.074), (I-302)+(1.011)+(1.075),
(I-302)+(1.011)+(1.076), (I-302)+(1.011)+(1.077),
(I-302)+(1.011)+(1.078), (I-302)+(1.011)+(1.079),
(I-302)+(1.011)+(1.080), (I-302)+(1.011)+(1.081),
(I-302)+(1.011)+(1.082), (I-302)+(1.011)+(1.083),
(I-302)+(1.011)+(1.084), (I-302)+(1.011)+(1.085),
(I-302)+(1.011)+(1.086), (I-302)+(1.011)+(1.087),
(I-302)+(1.011)+(1.088), (I-302)+(1.011)+(1.089),
(I-302)+(1.011)+(1.090), (I-302)+(1.011)+(1.091),
(I-302)+(1.011)+(1.092), (I-302)+(1.011)+(2.001),
(I-302)+(1.011)+(2.002), (I-302)+(1.011)+(2.003),
(I-302)+(1.011)+(2.004), (I-302)+(1.011)+(2.005),
(I-302)+(1.011)+(2.006), (I-302)+(1.011)+(2.007),
(I-302)+(1.011)+(2.008), (I-302)+(1.011)+(2.009),
(I-302)+(1.011)+(2.010), (I-302)+(1.011)+(2.011),
(I-302)+(1.011)+(2.012), (I-302)+(1.011)+(2.013),
(I-302)+(1.011)+(2.014), (I-302)+(1.011)+(2.015),
(I-302)+(1.011)+(2.016), (I-302)+(1.011)+(2.017),
(I-302)+(1.011)+(2.018), (I-302)+(1.011)+(2.019),
(I-302)+(1.011)+(2.020), (I-302)+(1.011)+(2.021),
(I-302)+(1.011)+(2.022), (I-302)+(1.011)+(2.023),
(I-302)+(1.011)+(2.024), (I-302)+(1.011)+(2.025),
(I-302)+(1.011)+(2.026), (I-302)+(1.011)+(2.027),
(I-302)+(1.011)+(2.028), (I-302)+(1.011)+(2.029),
(I-302)+(1.011)+(2.030), (I-302)+(1.011)+(2.031),
(I-302)+(1.011)+(2.032), (I-302)+(1.011)+(2.033),
(I-302)+(1.011)+(2.034), (I-302)+(1.011)+(2.035),
(I-302)+(1.011)+(2.036), (I-302)+(1.011)+(2.037),
(I-302)+(1.011)+(2.038), (I-302)+(1.011)+(2.039),
(I-302)+(1.011)+(2.040), (I-302)+(1.011)+(2.041),
(I-302)+(1.011)+(2.042), (I-302)+(1.011)+(2.043),
(I-302)+(1.011)+(2.044), (I-302)+(1.011)+(2.045),
(I-302)+(1.011)+(2.046), (I-302)+(1.011)+(2.047),
(I-302)+(1.011)+(2.048), (I-302)+(1.011)+(2.049),
(I-302)+(1.011)+(2.050), (I-302)+(1.011)+(2.051),
(I-302)+(1.011)+(2.052), (I-302)+(1.011)+(2.053),
(I-302)+(1.011)+(2.054), (I-302)+(1.011)+(2.055),
(I-302)+(1.011)+(2.056), (I-302)+(1.011)+(2.057),
(I-302)+(1.011)+(2.058), (I-302)+(1.011)+(2.059),
(I-302)+(1.011)+(3.001), (I-302)+(1.011)+(3.002),
(I-302)+(1.011)+(3.003), (I-302)+(1.011)+(3.004),
(I-302)+(1.011)+(3.005), (I-302)+(1.011)+(3.006),
(I-302)+(1.011)+(3.007), (I-302)+(1.011)+(3.008),
(I-302)+(1.011)+(3.009), (I-302)+(1.011)+(3.010),
(I-302)+(1.011)+(3.011), (I-302)+(1.011)+(3.012),
(I-302)+(1.011)+(3.013), (I-302)+(1.011)+(3.014),
(I-302)+(1.011)+(3.015), (I-302)+(1.011)+(3.016),
(I-302)+(1.011)+(3.017), (I-302)+(1.011)+(3.018),
(I-302)+(1.011)+(3.019), (I-302)+(1.011)+(3.020),
(I-302)+(1.011)+(3.021), (I-302)+(1.011)+(3.022),
(I-302)+(1.011)+(3.023), (I-302)+(1.011)+(3.024),
(I-302)+(1.011)+(3.025), (I-302)+(1.011)+(3.026),
(I-302)+(1.011)+(3.027), (I-302)+(1.011)+(3.028),
(I-302)+(1.011)+(3.029), (I-302)+(1.011)+(3.030),
(I-302)+(1.011)+(3.031), (I-302)+(1.011)+(5.001),
(I-302)+(1.011)+(5.002), (I-302)+(1.011)+(5.003),
(I-302)+(1.011)+(5.004), (I-302)+(1.011)+(5.005),
(I-302)+(1.011)+(5.006), (I-302)+(1.011)+(5.007),
(I-302)+(1.011)+(5.008), (I-302)+(1.011)+(5.009),
(I-302)+(1.011)+(5.010), (I-302)+(1.011)+(5.011),
(I-302)+(1.011)+(5.012), (I-302)+(1.011)+(5.013),
(I-302)+(1.011)+(5.014), (I-302)+(1.011)+(5.015),
(I-302)+(1.011)+(5.016), (I-302)+(1.011)+(5.017),
(I-302)+(1.011)+(5.018), (I-302)+(1.011)+(5.019),
(I-302)+(1.011)+(5.020), (I-302)+(1.011)+(5.021),
(I-302)+(1.011)+(5.022), (I-302)+(1.011)+(5.023),
(I-302)+(1.011)+(6.001), (I-302)+(1.011)+(6.002),
(I-302)+(1.011)+(6.003), (I-302)+(1.011)+(6.004),
(I-302)+(1.011)+(7.001), (I-302)+(1.011)+(7.002),
(I-302)+(1.011)+(7.003), (I-302)+(1.011)+(7.004),
(I-302)+(1.011)+(7.005), (I-302)+(1.011)+(7.006),
(I-302)+(1.011)+(9.001), (I-302)+(1.011)+(9.002),
(I-302)+(1.011)+(9.003), (I-302)+(1.011)+(9.004),
(I-302)+(1.011)+(9.005), (I-302)+(1.011)+(9.006),
(I-302)+(1.011)+(9.007), (I-302)+(1.011)+(9.008),
(I-302)+(1.011)+(9.009), (I-302)+(1.011)+(14.001),
(I-302)+(1.011)+(14.002), (I-302)+(1.011)+(15.008),
(I-302)+(1.011)+(15.011), (I-302)+(1.011)+(15.012),
(I-302)+(1.011)+(15.016), (I-302)+(1.011)+(15.025),
(I-302)+(1.011)+(15.027), (I-302)+(1.011)+(15.047),
(I-302)+(1.011)+(15.063), (I-302)+(1.011)+(15.064),
(I-302)+(1.011)+(16.001), (I-302)+(1.011)+(16.002),
(I-302)+(1.011)+(16.003), (I-302)+(1.011)+(16.004),
(I-302)+(1.011)+(16.005), (I-302)+(1.011)+(16.006),
(I-302)+(1.011)+(16.007), (I-302)+(1.011)+(16.008),
(I-302)+(1.011)+(17.001), (I-302)+(1.011)+(17.002),
(I-302)+(1.011)+(17.003), (I-302)+(1.011)+(17.004),
(I-302)+(1.011)+(17.005), (I-302)+(1.011)+(17.006),
(I-302)+(1.011)+(17.007), (I-302)+(1.011)+(17.008),
(I-302)+(1.011)+(17.009), (I-302)+(1.011)+(17.010),
(I-302)+(1.011)+(17.011), (I-302)+(1.011)+(17.012),
(I-302)+(1.011)+(18.001),
(I-302)+(1.012)+(1.013), (I-302)+(1.012)+(1.014),
(I-302)+(1.012)+(1.015), (I-302)+(1.012)+(1.016),
(I-302)+(1.012)+(1.017), (I-302)+(1.012)+(1.018),
(I-302)+(1.012)+(1.019), (I-302)+(1.012)+(1.020),
(I-302)+(1.012)+(1.021), (I-302)+(1.012)+(1.022),
(I-302)+(1.012)+(1.023), (I-302)+(1.012)+(1.024),
(I-302)+(1.012)+(1.025), (I-302)+(1.012)+(1.026),
(I-302)+(1.012)+(1.027), (I-302)+(1.012)+(1.028),
(I-302)+(1.012)+(1.029), (I-302)+(1.012)+(1.030),
(I-302)+(1.012)+(1.031), (I-302)+(1.012)+(1.032),
(I-302)+(1.012)+(1.033), (I-302)+(1.012)+(1.034),
(I-302)+(1.012)+(1.035), (I-302)+(1.012)+(1.036),
(I-302)+(1.012)+(1.037), (I-302)+(1.012)+(1.038),
(I-302)+(1.012)+(1.039), (I-302)+(1.012)+(1.040),
(I-302)+(1.012)+(1.041), (I-302)+(1.012)+(1.042),
(I-302)+(1.012)+(1.043), (I-302)+(1.012)+(1.044),
(I-302)+(1.012)+(1.045), (I-302)+(1.012)+(1.046),
(I-302)+(1.012)+(1.047), (I-302)+(1.012)+(1.048),
(I-302)+(1.012)+(1.049), (I-302)+(1.012)+(1.050),
(I-302)+(1.012)+(1.051), (I-302)+(1.012)+(1.052),
(I-302)+(1.012)+(1.053), (I-302)+(1.012)+(1.054),
(I-302)+(1.012)+(1.055), (I-302)+(1.012)+(1.056),
(I-302)+(1.012)+(1.057), (I-302)+(1.012)+(1.058),
(I-302)+(1.012)+(1.059), (I-302)+(1.012)+(1.060),
(I-302)+(1.012)+(1.061), (I-302)+(1.012)+(1.062),
(I-302)+(1.012)+(1.063), (I-302)+(1.012)+(1.064),
(I-302)+(1.012)+(1.065), (I-302)+(1.012)+(1.066),
(I-302)+(1.012)+(1.067), (I-302)+(1.012)+(1.068),
(I-302)+(1.012)+(1.069), (I-302)+(1.012)+(1.070),
(I-302)+(1.012)+(1.071), (I-302)+(1.012)+(1.072),
(I-302)+(1.012)+(1.073), (I-302)+(1.012)+(1.074),
(I-302)+(1.012)+(1.075), (I-302)+(1.012)+(1.076),
(I-302)+(1.012)+(1.077), (I-302)+(1.012)+(1.078),
(I-302)+(1.012)+(1.079), (I-302)+(1.012)+(1.080),
(I-302)+(1.012)+(1.081), (I-302)+(1.012)+(1.082),
(I-302)+(1.012)+(1.083), (I-302)+(1.012)+(1.084),
(I-302)+(1.012)+(1.085), (I-302)+(1.012)+(1.086),
(I-302)+(1.012)+(1.087), (I-302)+(1.012)+(1.088),
(I-302)+(1.012)+(1.089), (I-302)+(1.012)+(1.090), (I-302)+(1.012)+(1.091), (I-302)+(1.012)+(1.092), (I-302)+(1.012)+(2.001), (I-302)+(1.012)+(2.002), (I-302)+(1.012)+(2.003), (I-302)+(1.012)+(2.004), (I-302)+(1.012)+(2.005), (I-302)+(1.012)+(2.006), (I-302)+(1.012)+(2.007), (I-302)+(1.012)+(2.008), (I-302)+(1.012)+(2.009), (I-302)+(1.012)+(2.010), (I-302)+(1.012)+(2.011), (I-302)+(1.012)+(2.012), (I-302)+(1.012)+(2.013), (I-302)+(1.012)+(2.014), (I-302)+(1.012)+(2.015), (I-302)+(1.012)+(2.016), (I-302)+(1.012)+(2.017), (I-302)+(1.012)+(2.018), (I-302)+(1.012)+(2.019), (I-302)+(1.012)+(2.020), (I-302)+(1.012)+(2.021), (I-302)+(1.012)+(2.022), (I-302)+(1.012)+(2.023), (I-302)+(1.012)+(2.024), (I-302)+(1.012)+(2.025), (I-302)+(1.012)+(2.026), (I-302)+(1.012)+(2.027), (I-302)+(1.012)+(2.028), (I-302)+(1.012)+(2.029), (I-302)+(1.012)+(2.030), (I-302)+(1.012)+(2.031), (I-302)+(1.012)+(2.032), (I-302)+(1.012)+(2.033), (I-302)+(1.012)+(2.034), (I-302)+(1.012)+(2.035), (I-302)+(1.012)+(2.036), (I-302)+(1.012)+(2.037), (I-302)+(1.012)+(2.038), (I-302)+(1.012)+(2.039), (I-302)+(1.012)+(2.040), (I-302)+(1.012)+(2.041), (I-302)+(1.012)+(2.042), (I-302)+(1.012)+(2.043), (I-302)+(1.012)+(2.044), (I-302)+(1.012)+(2.045), (I-302)+(1.012)+(2.046), (I-302)+(1.012)+(2.047), (I-302)+(1.012)+(2.048), (I-302)+(1.012)+(2.049), (I-302)+(1.012)+(2.050), (I-302)+(1.012)+(2.051), (I-302)+(1.012)+(2.052), (I-302)+(1.012)+(2.053), (I-302)+(1.012)+(2.054), (I-302)+(1.012)+(2.055), (I-302)+(1.012)+(2.056), (I-302)+(1.012)+(2.057), (I-302)+(1.012)+(2.058), (I-302)+(1.012)+(2.059), (I-302)+(1.012)+(3.001), (I-302)+(1.012)+(3.002), (I-302)+(1.012)+(3.003), (I-302)+(1.012)+(3.004), (I-302)+(1.012)+(3.005), (I-302)+(1.012)+(3.006), (I-302)+(1.012)+(3.007), (I-302)+(1.012)+(3.008), (I-302)+(1.012)+(3.009), (I-302)+(1.012)+(3.010), (I-302)+(1.012)+(3.011), (I-302)+(1.012)+(3.012), (I-302)+(1.012)+(3.013), (I-302)+(1.012)+(3.014), (I-302)+(1.012)+(3.015), (I-302)+(1.012)+(3.016), (I-302)+(1.012)+(3.017), (I-302)+(1.012)+(3.018), (I-302)+(1.012)+(3.019), (I-302)+(1.012)+(3.020), (I-302)+(1.012)+(3.021), (I-302)+(1.012)+(3.022), (I-302)+(1.012)+(3.023), (I-302)+(1.012)+(3.024), (I-302)+(1.012)+(3.025), (I-302)+(1.012)+(3.026), (I-302)+(1.012)+(3.027), (I-302)+(1.012)+(3.028), (I-302)+(1.012)+(3.029), (I-302)+(1.012)+(3.030), (I-302)+(1.012)+(3.031), (I-302)+(1.012)+(5.001), (I-302)+(1.012)+(5.002), (I-302)+(1.012)+(5.003), (I-302)+(1.012)+(5.004), (I-302)+(1.012)+(5.005), (I-302)+(1.012)+(5.006), (I-302)+(1.012)+(5.007), (I-302)+(1.012)+(5.008), (I-302)+(1.012)+(5.009), (I-302)+(1.012)+(5.010), (I-302)+(1.012)+(5.011), (I-302)+(1.012)+(5.012), (I-302)+(1.012)+(5.013), (I-302)+(1.012)+(5.014), (I-302)+(1.012)+(5.015), (I-302)+(1.012)+(5.016), (I-302)+(1.012)+(5.017), (I-302)+(1.012)+(5.018), (I-302)+(1.012)+(5.019), (I-302)+(1.012)+(5.020), (I-302)+(1.012)+(5.021), (I-302)+(1.012)+(5.022), (I-302)+(1.012)+(5.023), (I-302)+(1.012)+(6.001), (I-302)+(1.012)+(6.002), (I-302)+(1.012)+(6.003), (I-302)+(1.012)+(6.004), (I-302)+(1.012)+(7.001), (I-302)+(1.012)+(7.002), (I-302)+(1.012)+(7.003), (I-302)+(1.012)+(7.004), (I-302)+(1.012)+(7.005), (I-302)+(1.012)+(7.006), (I-302)+(1.012)+(9.001), (I-302)+(1.012)+(9.002), (I-302)+(1.012)+(9.003), (I-302)+(1.012)+(9.004), (I-302)+(1.012)+(9.005), (I-302)+(1.012)+(9.006), (I-302)+(1.012)+(9.007), (I-302)+(1.012)+(9.008), (I-302)+(1.012)+(9.009), (I-302)+(1.012)+(14.001), (I-302)+(1.012)+(14.002), (I-302)+(1.012)+(15.008), (I-302)+(1.012)+(15.011), (I-302)+(1.012)+(15.012), (I-302)+(1.012)+(15.016), (I-302)+(1.012)+(15.025), (I-302)+(1.012)+(15.027), (I-302)+(1.012)+(15.047), (I-302)+(1.012)+(15.063), (I-302)+(1.012)+(15.064), (I-302)+(1.012)+(16.001), (I-302)+(1.012)+(16.002), (I-302)+(1.012)+(16.003), (I-302)+(1.012)+(16.004), (I-302)+(1.012)+(16.005), (I-302)+(1.012)+(16.006), (I-302)+(1.012)+(16.007), (I-302)+(1.012)+(16.008), (I-302)+(1.012)+(17.001), (I-302)+(1.012)+(17.002), (I-302)+(1.012)+(17.003), (I-302)+(1.012)+(17.004), (I-302)+(1.012)+(17.005), (I-302)+(1.012)+(17.006), (I-302)+(1.012)+(17.007), (I-302)+(1.012)+(17.008), (I-302)+(1.012)+(17.009), (I-302)+(1.012)+(17.010), (I-302)+(1.012)+(17.011), (I-302)+(1.012)+(17.012), (I-302)+(1.012)+(18.001), (I-302)+(1.013)+(1.014), (I-302)+(1.013)+(1.015), (I-302)+(1.013)+(1.016), (I-302)+(1.013)+(1.017), (I-302)+(1.013)+(1.018), (I-302)+(1.013)+(1.019), (I-302)+(1.013)+(1.020), (I-302)+(1.013)+(1.021), (I-302)+(1.013)+(1.022), (I-302)+(1.013)+(1.023), (I-302)+(1.013)+(1.024), (I-302)+(1.013)+(1.025), (I-302)+(1.013)+(1.026), (I-302)+(1.013)+(1.027), (I-302)+(1.013)+(1.028), (I-302)+(1.013)+(1.029), (I-302)+(1.013)+(1.030), (I-302)+(1.013)+(1.031), (I-302)+(1.013)+(1.032), (I-302)+(1.013)+(1.033), (I-302)+(1.013)+(1.034), (I-302)+(1.013)+(1.035), (I-302)+(1.013)+(1.036), (I-302)+(1.013)+(1.037), (I-302)+(1.013)+(1.038), (I-302)+(1.013)+(1.039), (I-302)+(1.013)+(1.040), (I-302)+(1.013)+(1.041), (I-302)+(1.013)+(1.042), (I-302)+(1.013)+(1.043), (I-302)+(1.013)+(1.044), (I-302)+(1.013)+(1.045), (I-302)+(1.013)+(1.046), (I-302)+(1.013)+(1.047), (I-302)+(1.013)+(1.048), (I-302)+(1.013)+(1.049), (I-302)+(1.013)+(1.050), (I-302)+(1.013)+(1.051), (I-302)+(1.013)+(1.052), (I-302)+(1.013)+(1.053), (I-302)+(1.013)+(1.054), (I-302)+(1.013)+(1.055), (I-302)+(1.013)+(1.056), (I-302)+(1.013)+(1.057), (I-302)+(1.013)+(1.058), (I-302)+(1.013)+(1.059), (I-302)+(1.013)+(1.060), (I-302)+(1.013)+(1.061), (I-302)+(1.013)+(1.062), (I-302)+(1.013)+(1.063), (I-302)+(1.013)+(1.064), (I-302)+(1.013)+(1.065), (I-302)+(1.013)+(1.066), (I-302)+(1.013)+(1.067), (I-302)+(1.013)+(1.068), (I-302)+(1.013)+(1.069), (I-302)+(1.013)+(1.070), (I-302)+(1.013)+(1.071), (I-302)+(1.013)+(1.072), (I-302)+(1.013)+(1.073), (I-302)+(1.013)+(1.074), (I-302)+(1.013)+(1.075), (I-302)+(1.013)+(1.076), (I-302)+(1.013)+(1.077), (I-302)+(1.013)+(1.078), (I-302)+(1.013)+(1.079), (I-302)+(1.013)+(1.080), (I-302)+(1.013)+(1.081), (I-302)+(1.013)+(1.082), (I-302)+(1.013)+(1.083), (I-302)+(1.013)+(1.084), (I-302)+(1.013)+(1.085), (I-302)+(1.013)+(1.086), (I-302)+(1.013)+(1.087), (I-302)+(1.013)+(1.088), (I-302)+(1.013)+(1.089), (I-302)+(1.013)+(1.090), (I-302)+(1.013)+(1.091), (I-302)+(1.013)+(1.092), (I-302)+(1.013)+(2.001), (I-302)+(1.013)+(2.002), (I-302)+(1.013)+(2.003), (I-302)+(1.013)+(2.004), (I-302)+(1.013)+(2.005), (I-302)+(1.013)+(2.006), (I-302)+(1.013)+(2.007), (I-302)+(1.013)+(2.008), (I-302)+(1.013)+(2.009), (I-302)+(1.013)+(2.010), (I-302)+(1.013)+(2.011), (I-302)+(1.013)+(2.012), (I-302)+(1.013)+(2.013), (I-302)+(1.013)+(2.014), (I-302)+(1.013)+(2.015), (I-302)+(1.013)+(2.016), (I-302)+(1.013)+(2.017), (I-302)+(1.013)+(2.018), (I-302)+(1.013)+(2.019), (I-302)+(1.013)+(2.020), (I-302)+(1.013)+(2.021), (I-302)+(1.013)+(2.022), (I-302)+(1.013)+(2.023), (I-302)+(1.013)+(2.024), (I-302)+(1.013)+(2.025), (I-302)+(1.013)+(2.026), (I-302)+(1.013)+(2.027), (I-302)+(1.013)+(2.028), (I-302)+(1.013)+(2.029), (I-302)+(1.013)+(2.030), (I-302)+(1.013)+(2.031), (I-302)+(1.013)+(2.032), (I-302)+(1.013)+(2.033), (I-302)+(1.013)+(2.034), (I-302)+(1.013)+(2.035), (I-302)+(1.013)+(2.036), (I-302)+(1.013)+(2.037), (I-302)+(1.013)+(2.038), (I-302)+(1.013)+(2.039), (I-302)+(1.013)+(2.040), (I-302)+(1.013)+(2.041), (I-302)+(1.013)+(2.042), (I-302)+(1.013)+(2.043), (I-302)+(1.013)+(2.044), (I-302)+(1.013)+(2.045), (I-302)+(1.013)+(2.046), (I-302)+(1.013)+(2.047), (I-302)+(1.013)+(2.048), (I-302)+(1.013)+(2.049), (I-302)+(1.013)+(2.050), (I-302)+(1.013)+(2.051), (I-302)+(1.013)+(2.052), (I-302)+(1.013)+(2.053), (I-302)+(1.013)+(2.054), (I-302)+(1.013)+(2.055), (I-302)+(1.013)+(2.056), (I-302)+(1.013)+(2.057), (I-302)+(1.013)+(2.058), (I-302)+(1.013)+(2.059), (I-302)+(1.013)+(3.001), (I-302)+(1.013)+(3.002), (I-302)+(1.013)+(3.003), (I-302)+(1.013)+(3.004), (I-302)+(1.013)+(3.005), (I-302)+(1.013)+(3.006), (I-302)+(1.013)+(3.007), (I-302)+(1.013)+(3.008), (I-302)+(1.013)+(3.009), (I-302)+(1.013)+(3.010), (I-302)+(1.013)+(3.011), (I-302)+(1.013)+(3.012), (I-302)+(1.013)+(3.013), (I-302)+(1.013)+(3.014), (I-302)+(1.013)+(3.015), (I-302)+(1.013)+(3.016), (I-302)+(1.013)+(3.017), (I-302)+(1.013)+(3.018), (I-302)+(1.013)+(3.019), (I-302)+(1.013)+(3.020), (I-302)+(1.013)+(3.021), (I-302)+(1.013)+(3.022), (I-302)+(1.013)+(3.023), (I-302)+(1.013)+(3.024), (I-302)+(1.013)+(3.025), (I-302)+(1.013)+(3.026), (I-302)+(1.013)+(3.027), (I-302)+(1.013)+(3.028), (I-302)+(1.013)+(3.029), (I-302)+(1.013)+(3.030), (I-302)+(1.013)+(3.031), (I-302)+(1.013)+(5.001), (I-302)+(1.013)+(5.002), (I-302)+(1.013)+(5.003), (I-302)+(1.013)+(5.004), (I-302)+(1.013)+(5.005), (I-302)+(1.013)+(5.006), (I-302)+(1.013)+(5.007), (I-302)+(1.013)+(5.008), (I-302)+(1.013)+(5.009), (I-302)+(1.013)+(5.010), (I-302)+(1.013)+(5.011), (I-302)+(1.013)+(5.012), (I-302)+(1.013)+(5.013), (I-302)+(1.013)+(5.014), (I-302)+(1.013)+(5.015), (I-302)+(1.013)+(5.016), (I-302)+(1.013)+(5.017), (I-302)+(1.013)+(5.018), (I-302)+(1.013)+(5.019), (I-302)+(1.013)+(5.020), (I-302)+(1.013)+(5.021), (I-302)+(1.013)+(5.022), (I-302)+(1.013)+(5.023), (I-302)+(1.013)+(6.001), (I-302)+(1.013)+(6.002), (I-302)+(1.013)+(6.003), (I-302)+(1.013)+(6.004), (I-302)+(1.013)+(7.001), (I-302)+(1.013)+(7.002), (I-302)+(1.013)+(7.003), (I-302)+(1.013)+(7.004), (I-302)+(1.013)+(7.005), (I-302)+(1.013)+(7.006), (I-302)+(1.013)+(9.001), (I-302)+(1.013)+(9.002), (I-302)+(1.013)+(9.003), (I-302)+(1.013)+(9.004), (I-302)+(1.013)+(9.005), (I-302)+(1.013)+(9.006), (I-302)+(1.013)+(9.007), (I-302)+(1.013)+(9.008), (I-302)+(1.013)+(9.009), (I-302)+(1.013)+(14.001), (I-302)+(1.013)+(14.002), (I-302)+(1.013)+(15.008), (I-302)+(1.013)+(15.011), (I-302)+(1.013)+(15.012), (I-302)+(1.013)+(15.016), (I-302)+(1.013)+(15.025), (I-302)+(1.013)+(15.027), (I-302)+(1.013)+(15.047), (I-302)+(1.013)+(15.063), (I-302)+(1.013)+(15.064), (I-302)+(1.013)+(16.001), (I-302)+(1.013)+(16.002), (I-302)+(1.013)+(16.003), (I-302)+(1.013)+(16.004), (I-302)+(1.013)+(16.005), (I-302)+(1.013)+(16.006), (I-302)+(1.013)+(16.007), (I-302)+(1.013)+(16.008), (I-302)+(1.013)+(17.001), (I-302)+(1.013)+(17.002), (I-302)+(1.013)+(17.003), (I-302)+(1.013)+(17.004), (I-302)+(1.013)+(17.005), (I-302)+(1.013)+(17.006), (I-302)+(1.013)+(17.007), (I-302)+(1.013)+(17.008), (I-302)+(1.013)+(17.009), (I-302)+(1.013)+(17.010), (I-302)+(1.013)+(17.011), (I-302)+(1.013)+(17.012), (I-302)+(1.013)+(18.001), (I-302)+(1.014)+(1.015), (I-302)+(1.014)+(1.016), (I-302)+(1.014)+(1.017), (I-302)+(1.014)+(1.018), (I-302)+(1.014)+(1.019), (I-302)+(1.014)+(1.020), (I-302)+(1.014)+(1.021), (I-302)+(1.014)+(1.022), (I-302)+(1.014)+(1.023), (I-302)+(1.014)+(1.024), (I-302)+(1.014)+(1.025), (I-302)+(1.014)+(1.026), (I-302)+(1.014)+(1.027), (I-302)+(1.014)+(1.028), (I-302)+(1.014)+(1.029), (I-302)+(1.014)+(1.030), (I-302)+(1.014)+(1.031), (I-302)+(1.014)+(1.032), (I-302)+(1.014)+(1.033), (I-302)+(1.014)+(1.034), (I-302)+(1.014)+(1.035), (I-302)+(1.014)+(1.036), (I-302)+(1.014)+(1.037), (I-302)+(1.014)+(1.038), (I-302)+(1.014)+(1.039), (I-302)+(1.014)+(1.040), (I-302)+(1.014)+(1.041), (I-302)+(1.014)+(1.042), (I-302)+(1.014)+(1.043), (I-302)+(1.014)+(1.044), (I-302)+(1.014)+(1.045), (I-302)+(1.014)+(1.046), (I-302)+(1.014)+(1.047), (I-302)+(1.014)+(1.048), (I-302)+(1.014)+(1.049), (I-302)+(1.014)+(1.050), (I-302)+(1.014)+(1.051), (I-302)+(1.014)+(1.052), (I-302)+(1.014)+(1.053), (I-302)+(1.014)+(1.054), (I-302)+(1.014)+(1.055), (I-302)+(1.014)+(1.056), (I-302)+(1.014)+(1.057), (I-302)+(1.014)+(1.058), (I-302)+(1.014)+(1.059), (I-302)+(1.014)+(1.060), (I-302)+(1.014)+(1.061), (I-302)+(1.014)+(1.062), (I-302)+(1.014)+(1.063), (I-302)+(1.014)+(1.064), (I-302)+(1.014)+(1.065), (I-302)+(1.014)+(1.066), (I-302)+(1.014)+(1.067), (I-302)+(1.014)+(1.068), (I-302)+(1.014)+(1.069), (I-302)+(1.014)+(1.070), (I-302)+(1.014)+(1.071), (I-302)+(1.014)+(1.072), (I-302)+(1.014)+(1.073), (I-302)+(1.014)+(1.074), (I-302)+(1.014)+(1.075), (I-302)+(1.014)+(1.076), (I-302)+(1.014)+(1.077), (I-302)+(1.014)+(1.078), (I-302)+(1.014)+(1.079), (I-302)+(1.014)+(1.080), (I-302)+(1.014)+(1.081), (I-302)+(1.014)+(1.082), (I-302)+(1.014)+(1.083), (I-302)+(1.014)+(1.084), (I-302)+(1.014)+(1.085), (I-302)+(1.014)+(1.086), (I-302)+(1.014)+(1.087), (I-302)+(1.014)+(1.088), (I-302)+(1.014)+(1.089), (I-302)+(1.014)+(1.090), (I-302)+(1.014)+(1.091), (I-302)+(1.014)+(1.092), (I-302)+(1.014)+(2.001), (I-302)+(1.014)+(2.002), (I-302)+(1.014)+(2.003), (I-302)+(1.014)+(2.004), (I-302)+(1.014)+(2.005), (I-302)+(1.014)+(2.006), (I-302)+(1.014)+(2.007), (I-302)+(1.014)+(2.008), (I-302)+(1.014)+(2.009), (I-302)+(1.014)+(2.010), (I-302)+(1.014)+(2.011), (I-302)+(1.014)+(2.012), (I-302)+(1.014)+(2.013), (I-302)+(1.014)+(2.014), (I-302)+(1.014)+(2.015), (I-302)+(1.014)+(2.016), (I-302)+(1.014)+(2.017), (I-302)+(1.014)+(2.018), (I-302)+(1.014)+(2.019), (I-302)+(1.014)+(2.020), (I-302)+(1.014)+(2.021), (I-302)+(1.014)+(2.022), (I-302)+(1.014)+(2.023), (I-302)+(1.014)+(2.024), (I-302)+(1.014)+(2.025), (I-302)+(1.014)+(2.026), (I-302)+(1.014)+(2.027), (I-302)+(1.014)+(2.028), (I-302)+(1.014)+(2.029), (I-302)+(1.014)+(2.030), (I-302)+(1.014)+(2.031), (I-302)+(1.014)+(2.032), (I-302)+(1.014)+(2.033), (I-302)+(1.014)+(2.034), (I-302)+(1.014)+(2.035), (I-302)+(1.014)+(2.036), (I-302)+(1.014)+(2.037), (I-302)+(1.014)+(2.038), (I-302)+(1.014)+(2.039), (I-302)+(1.014)+(2.040), (I-302)+(1.014)+(2.041), (I-302)+(1.014)+(2.042), (I-302)+(1.014)+(2.043), (I-302)+(1.014)+(2.044), (I-302)+(1.014)+(2.045), (I-302)+(1.014)+(2.046), (I-302)+(1.014)+(2.047), (I-302)+(1.014)+(2.048), (I-302)+(1.014)+(2.049), (I-302)+(1.014)+(2.050), (I-302)+(1.014)+(2.051), (I-302)+(1.014)+(2.052), (I-302)+(1.014)+(2.053), (I-302)+(1.014)+(2.054), (I-302)+(1.014)+(2.055), (I-302)+(1.014)+(2.056), (I-302)+(1.014)+(2.057), (I-302)+(1.014)+(2.058), (I-302)+(1.014)+(2.059), (I-302)+(1.014)+(3.001), (I-302)+(1.014)+(3.002), (I-302)+(1.014)+(3.003), (I-302)+(1.014)+(3.004), (I-302)+(1.014)+(3.005), (I-302)+(1.014)+(3.006), (I-302)+(1.014)+(3.007), (I-302)+(1.014)+(3.008), (I-302)+(1.014)+(3.009), (I-302)+(1.014)+(3.010), (I-302)+(1.014)+(3.011), (I-302)+(1.014)+(3.012), (I-302)+(1.014)+(3.013), (I-302)+(1.014)+(3.014), (I-302)+(1.014)+(3.015), (I-302)+(1.014)+(3.016), (I-302)+(1.014)+(3.017), (I-302)+(1.014)+(3.018), (I-302)+(1.014)+(3.019), (I-302)+(1.014)+(3.020), (I-302)+(1.014)+(3.021), (I-302)+(1.014)+(3.022), (I-302)+(1.014)+(3.023), (I-302)+(1.014)+(3.024), (I-302)+(1.014)+(3.025), (I-302)+(1.014)+(3.026), (I-302)+(1.014)+(3.027), (I-302)+(1.014)+(3.028), (I-302)+(1.014)+(3.029), (I-302)+(1.014)+(3.030), (I-302)+(1.014)+(3.031), (I-302)+(1.014)+(5.001), (I-302)+(1.014)+(5.002), (I-302)+(1.014)+(5.003), (I-302)+(1.014)+(5.004), (I-302)+(1.014)+(5.005), (I-302)+(1.014)+(5.006), (I-302)+(1.014)+(5.007), (I-302)+(1.014)+(5.008), (I-302)+(1.014)+(5.009), (I-302)+(1.014)+(5.010), (I-302)+(1.014)+(5.011), (I-302)+(1.014)+(5.012), (I-302)+(1.014)+(5.013), (I-302)+(1.014)+(5.014), (I-302)+(1.014)+(5.015), (I-302)+(1.014)+(5.016), (I-302)+(1.014)+(5.017), (I-302)+(1.014)+(5.018), (I-302)+(1.014)+(5.019), (I-302)+(1.014)+(5.020), (I-302)+(1.014)+(5.021), (I-302)+(1.014)+(5.022), (I-302)+(1.014)+(5.023), (I-302)+(1.014)+(6.001), (I-302)+(1.014)+(6.002), (I-302)+(1.014)+(6.003), (I-302)+(1.014)+(6.004), (I-302)+(1.014)+(7.001), (I-302)+(1.014)+(7.002), (I-302)+(1.014)+(7.003), (I-302)+(1.014)+(7.004), (I-302)+(1.014)+(7.005), (I-302)+(1.014)+(7.006), (I-302)+(1.014)+(9.001), (I-302)+(1.014)+(9.002), (I-302)+(1.014)+(9.003), (I-302)+(1.014)+(9.004), (I-302)+(1.014)+(9.005), (I-302)+(1.014)+(9.006), (I-302)+(1.014)+(9.007), (I-302)+(1.014)+(9.008), (I-302)+(1.014)+(9.009), (I-302)+(1.014)+(14.001), (I-302)+(1.014)+(14.002), (I-302)+(1.014)+(15.008), (I-302)+(1.014)+(15.011), (I-302)+(1.014)+(15.012), (I-302)+(1.014)+(15.016), (I-302)+(1.014)+(15.025), (I-302)+(1.014)+(15.027), (I-302)+(1.014)+(15.047), (I-302)+(1.014)+(15.063), (I-302)+(1.014)+(15.064), (I-302)+(1.014)+(16.001), (I-302)+(1.014)+(16.002), (I-302)+(1.014)+(16.003), (I-302)+(1.014)+(16.004), (I-302)+(1.014)+(16.005), (I-302)+(1.014)+(16.006), (I-302)+(1.014)+(16.007), (I-302)+(1.014)+(16.008), (I-302)+(1.014)+(17.001), (I-302)+(1.014)+(17.002), (I-302)+(1.014)+(17.003), (I-302)+(1.014)+(17.004), (I-302)+(1.014)+(17.005), (I-302)+(1.014)+(17.006), (I-302)+(1.014)+(17.007), (I-302)+(1.014)+(17.008), (I-302)+(1.014)+(17.009), (I-302)+(1.014)+(17.010), (I-302)+(1.014)+(17.011), (I-302)+(1.014)+(17.012), (I-302)+(1.014)+(18.001), (I-302)+(1.015)+(1.016), (I-302)+(1.015)+(1.017), (I-302)+(1.015)+(1.018), (I-302)+(1.015)+(1.019), (I-302)+(1.015)+(1.020), (I-302)+(1.015)+(1.021), (I-302)+(1.015)+(1.022), (I-302)+(1.015)+(1.023), (I-302)+(1.015)+(1.024), (I-302)+(1.015)+(1.025), (I-302)+(1.015)+(1.026), (I-302)+(1.015)+(1.027), (I-302)+(1.015)+(1.028), (I-302)+(1.015)+(1.029), (I-302)+(1.015)+(1.030), (I-302)+(1.015)+(1.031), (I-302)+(1.015)+(1.032), (I-302)+(1.015)+(1.033), (I-302)+(1.015)+(1.034), (I-302)+(1.015)+(1.035), (I-302)+(1.015)+(1.036), (I-302)+(1.015)+(1.037), (I-302)+(1.015)+(1.038), (I-302)+(1.015)+(1.039), (I-302)+(1.015)+(1.040), (I-302)+(1.015)+(1.041), (I-302)+(1.015)+(1.042), (I-302)+(1.015)+(1.043), (I-302)+(1.015)+(1.044), (I-302)+(1.015)+(1.045), (I-302)+(1.015)+(1.046), (I-302)+(1.015)+(1.047), (I-302)+(1.015)+(1.048), (I-302)+(1.015)+(1.049), (I-302)+(1.015)+(1.050), (I-302)+(1.015)+(1.051), (I-302)+(1.015)+(1.052), (I-302)+(1.015)+(1.053), (I-302)+(1.015)+(1.054), (I-302)+(1.015)+(1.055), (I-302)+(1.015)+(1.056), (I-302)+(1.015)+(1.057), (I-302)+(1.015)+(1.058), (I-302)+(1.015)+(1.059), (I-302)+(1.015)+(1.060), (I-302)+(1.015)+(1.061), (I-302)+(1.015)+(1.062), (I-302)+(1.015)+(1.063), (I-302)+(1.015)+(1.064), (I-302)+(1.015)+(1.065), (I-302)+(1.015)+(1.066), (I-302)+(1.015)+(1.067), (I-302)+(1.015)+(1.068), (I-302)+(1.015)+(1.069), (I-302)+(1.015)+(1.070), (I-302)+(1.015)+(1.071), (I-302)+(1.015)+(1.072), (I-302)+(1.015)+(1.073), (I-302)+(1.015)+(1.074), (I-302)+(1.015)+(1.075), (I-302)+(1.015)+(1.076), (I-302)+(1.015)+(1.077), (I-302)+(1.015)+(1.078), (I-302)+(1.015)+(1.079), (I-302)+(1.015)+(1.080), (I-302)+(1.015)+(1.081), (I-302)+(1.015)+(1.082), (I-302)+(1.015)+(1.083), (I-302)+(1.015)+(1.084), (I-302)+(1.015)+(1.085), (I-302)+(1.015)+(1.086), (I-302)+(1.015)+(1.087), (I-302)+(1.015)+(1.088), (I-302)+(1.015)+(1.089), (I-302)+(1.015)+(1.090), (I-302)+(1.015)+(1.091), (I-302)+(1.015)+(1.092), (I-302)+(1.015)+(2.001), (I-302)+(1.015)+(2.002), (I-302)+(1.015)+(2.003), (I-302)+(1.015)+(2.004), (I-302)+(1.015)+(2.005), (I-302)+(1.015)+(2.006), (I-302)+(1.015)+(2.007), (I-302)+(1.015)+(2.008), (I-302)+(1.015)+(2.009), (I-302)+(1.015)+(2.010), (I-302)+(1.015)+(2.011), (I-302)+(1.015)+(2.012), (I-302)+(1.015)+(2.013), (I-302)+(1.015)+(2.014), (I-302)+(1.015)+(2.015), (I-302)+(1.015)+(2.016), (I-302)+(1.015)+(2.017), (I-302)+(1.015)+(2.018), (I-302)+(1.015)+(2.019), (I-302)+(1.015)+(2.020), (I-302)+(1.015)+(2.021), (I-302)+(1.015)+(2.022), (I-302)+(1.015)+(2.023), (I-302)+(1.015)+(2.024), (I-302)+(1.015)+(2.025), (I-302)+(1.015)+(2.026), (I-302)+(1.015)+(2.027), (I-302)+(1.015)+(2.028), (I-302)+(1.015)+(2.029), (I-302)+(1.015)+(2.030), (I-302)+(1.015)+(2.031), (I-302)+(1.015)+(2.032), (I-302)+(1.015)+(2.033), (I-302)+(1.015)+(2.034), (I-302)+(1.015)+(2.035), (I-302)+(1.015)+(2.036), (I-302)+(1.015)+(2.037), (I-302)+(1.015)+(2.038), (I-302)+(1.015)+(2.039), (I-302)+(1.015)+(2.040), (I-302)+(1.015)+(2.041), (I-302)+(1.015)+(2.042), (I-302)+(1.015)+(2.043), (I-302)+(1.015)+(2.044), (I-302)+(1.015)+(2.045), (I-302)+(1.015)+(2.046), (I-302)+(1.015)+(2.047), (I-302)+(1.015)+(2.048), (I-302)+(1.015)+(2.049), (I-302)+(1.015)+(2.050), (I-302)+(1.015)+(2.051), (I-302)+(1.015)+(2.052), (I-302)+(1.015)+(2.053), (I-302)+(1.015)+(2.054), (I-302)+(1.015)+(2.055), (I-302)+(1.015)+(2.056), (I-302)+(1.015)+(2.057), (I-302)+(1.015)+(2.058), (I-302)+(1.015)+(2.059), (I-302)+(1.015)+(3.001), (I-302)+(1.015)+(3.002), (I-302)+(1.015)+(3.003), (I-302)+(1.015)+(3.004), (I-302)+(1.015)+(3.005), (I-302)+(1.015)+(3.006), (I-302)+(1.015)+(3.007), (I-302)+(1.015)+(3.008), (I-302)+(1.015)+(3.009), (I-302)+(1.015)+(3.010), (I-302)+(1.015)+(3.011), (I-302)+(1.015)+(3.012), (I-302)+(1.015)+(3.013), (I-302)+(1.015)+(3.014), (I-302)+(1.015)+(3.015), (I-302)+(1.015)+(3.016), (I-302)+(1.015)+(3.017), (I-302)+(1.015)+(3.018), (I-302)+(1.015)+(3.019), (I-302)+(1.015)+(3.020), (I-302)+(1.015)+(3.021), (I-302)+(1.015)+(3.022), (I-302)+(1.015)+(3.023), (I-302)+(1.015)+(3.024), (I-302)+(1.015)+(3.025), (I-302)+(1.015)+(3.026), (I-302)+(1.015)+(3.027), (I-302)+(1.015)+(3.028), (I-302)+(1.015)+(3.029), (I-302)+(1.015)+(3.030), (I-302)+(1.015)+(3.031), (I-302)+(1.015)+(5.001), (I-302)+(1.015)+(5.002), (I-302)+(1.015)+(5.003), (I-302)+(1.015)+(5.004), (I-302)+(1.015)+(5.005), (I-302)+(1.015)+(5.006), (I-302)+(1.015)+(5.007), (I-302)+(1.015)+(5.008), (I-302)+(1.015)+(5.009), (I-302)+(1.015)+(5.010), (I-302)+(1.015)+(5.011), (I-302)+(1.015)+(5.012), (I-302)+(1.015)+(5.013), (I-302)+(1.015)+(5.014), (I-302)+(1.015)+(5.015), (I-302)+(1.015)+(5.016), (I-302)+(1.015)+(5.017), (I-302)+(1.015)+(5.018), (I-302)+(1.015)+(5.019), (I-302)+(1.015)+(5.020), (I-302)+(1.015)+(5.021), (I-302)+(1.015)+(5.022), (I-302)+(1.015)+(5.023), (I-302)+(1.015)+(6.001), (I-302)+(1.015)+(6.002), (I-302)+(1.015)+(6.003), (I-302)+(1.015)+(6.004), (I-302)+(1.015)+(7.001), (I-302)+(1.015)+(7.002), (I-302)+(1.015)+(7.003), (I-302)+(1.015)+(7.004), (I-302)+(1.015)+(7.005), (I-302)+(1.015)+(7.006), (I-302)+(1.015)+(9.001), (I-302)+(1.015)+(9.002), (I-302)+(1.015)+(9.003), (I-302)+(1.015)+(9.004), (I-302)+(1.015)+(9.005), (I-302)+(1.015)+(9.006), (I-302)+(1.015)+(9.007), (I-302)+(1.015)+(9.008), (I-302)+(1.015)+(9.009), (I-302)+(1.015)+(14.001), (I-302)+(1.015)+(14.002), (I-302)+(1.015)+(15.008), (I-302)+(1.015)+(15.011), (I-302)+(1.015)+(15.012), (I-302)+(1.015)+(15.016), (I-302)+(1.015)+(15.025), (I-302)+(1.015)+(15.027), (I-302)+(1.015)+(15.047), (I-302)+(1.015)+(15.063), (I-302)+(1.015)+(15.064), (I-302)+(1.015)+(16.001), (I-302)+(1.015)+(16.002), (I-302)+(1.015)+(16.003), (I-302)+(1.015)+(16.004), (I-302)+(1.015)+(16.005), (I-302)+(1.015)+(16.006), (I-302)+(1.015)+(16.007), (I-302)+(1.015)+(16.008), (I-302)+(1.015)+(17.001), (I-302)+(1.015)+(17.002), (I-302)+(1.015)+(17.003), (I-302)+(1.015)+(17.004), (I-302)+(1.015)+(17.005), (I-302)+(1.015)+(17.006), (I-302)+(1.015)+(17.007), (I-302)+(1.015)+(17.008), (I-302)+(1.015)+(17.009), (I-302)+(1.015)+(17.010), (I-302)+(1.015)+(17.011), (I-302)+(1.015)+(17.012), (I-302)+(1.015)+(18.001), (I-302)+(1.016)+(1.017), (I-302)+(1.016)+(1.018), (I-302)+(1.016)+(1.019), (I-302)+(1.016)+(1.020), (I-302)+(1.016)+(1.021), (I-302)+(1.016)+(1.022), (I-302)+(1.016)+(1.023), (I-302)+(1.016)+(1.024), (I-302)+(1.016)+(1.025), (I-302)+(1.016)+(1.026), (I-302)+(1.016)+(1.027), (I-302)+(1.016)+(1.028), (I-302)+(1.016)+(1.029), (I-302)+(1.016)+(1.030), (I-302)+(1.016)+(1.031), (I-302)+(1.016)+(1.032), (I-302)+(1.016)+(1.033), (I-302)+(1.016)+(1.034), (I-302)+(1.016)+(1.035), (I-302)+(1.016)+(1.036), (I-302)+(1.016)+(1.037), (I-302)+(1.016)+(1.038), (I-302)+(1.016)+(1.039), (I-302)+(1.016)+(1.040), (I-302)+(1.016)+(1.041), (I-302)+(1.016)+(1.042), (I-302)+(1.016)+(1.043), (I-302)+(1.016)+(1.044), (I-302)+(1.016)+(1.045), (I-302)+(1.016)+(1.046), (I-302)+(1.016)+(1.047), (I-302)+(1.016)+(1.048), (I-302)+(1.016)+(1.049), (I-302)+(1.016)+(1.050), (I-302)+(1.016)+(1.051), (I-302)+(1.016)+(1.052), (I-302)+(1.016)+(1.053), (I-302)+(1.016)+(1.054), (I-302)+(1.016)+(1.055), (I-302)+(1.016)+(1.056), (I-302)+(1.016)+(1.057), (I-302)+(1.016)+(1.058), (I-302)+(1.016)+(1.059), (I-302)+(1.016)+(1.060), (I-302)+(1.016)+(1.061), (I-302)+(1.016)+(1.062), (I-302)+(1.016)+(1.063), (I-302)+(1.016)+(1.064), (I-302)+(1.016)+(1.065), (I-302)+(1.016)+(1.066), (I-302)+(1.016)+(1.067), (I-302)+(1.016)+(1.068), (I-302)+(1.016)+(1.069), (I-302)+(1.016)+(1.070), (I-302)+(1.016)+(1.071), (I-302)+(1.016)+(1.072), (I-302)+(1.016)+(1.073), (I-302)+(1.016)+(1.074), (I-302)+(1.016)+(1.075), (I-302)+(1.016)+(1.076), (I-302)+(1.016)+(1.077), (I-302)+(1.016)+(1.078), (I-302)+(1.016)+(1.079), (I-302)+(1.016)+(1.080), (I-302)+(1.016)+(1.081), (I-302)+(1.016)+(1.082), (I-302)+(1.016)+(1.083), (I-302)+(1.016)+(1.084), (I-302)+(1.016)+(1.085), (I-302)+(1.016)+(1.086), (I-302)+(1.016)+(1.087), (I-302)+(1.016)+(1.088), (I-302)+(1.016)+(1.089), (I-302)+(1.016)+(1.090), (I-302)+(1.016)+(1.091), (I-302)+(1.016)+(1.092), (I-302)+(1.016)+(2.001), (I-302)+(1.016)+(2.002), (I-302)+(1.016)+(2.003), (I-302)+(1.016)+(2.004), (I-302)+(1.016)+(2.005), (I-302)+(1.016)+(2.006), (I-302)+(1.016)+(2.007), (I-302)+(1.016)+(2.008), (I-302)+(1.016)+(2.009), (I-302)+(1.016)+(2.010), (I-302)+(1.016)+(2.011), (I-302)+(1.016)+(2.012), (I-302)+(1.016)+(2.013), (I-302)+(1.016)+(2.014), (I-302)+(1.016)+(2.015), (I-302)+(1.016)+(2.016), (I-302)+(1.016)+(2.017), (I-302)+(1.016)+(2.018), (I-302)+(1.016)+(2.019), (I-302)+(1.016)+(2.020), (I-302)+(1.016)+(2.021), (I-302)+(1.016)+(2.022), (I-302)+(1.016)+(2.023), (I-302)+(1.016)+(2.024), (I-302)+(1.016)+(2.025), (I-302)+(1.016)+(2.026), (I-302)+(1.016)+(2.027), (I-302)+(1.016)+(2.028), (I-302)+(1.016)+(2.029), (I-302)+(1.016)+(2.030), (I-302)+(1.016)+(2.031), (I-302)+(1.016)+(2.032), (I-302)+(1.016)+(2.033), (I-302)+(1.016)+(2.034), (I-302)+(1.016)+(2.035), (I-302)+(1.016)+(2.036), (I-302)+(1.016)+(2.037), (I-302)+(1.016)+(2.038), (I-302)+(1.016)+(2.039), (I-302)+(1.016)+(2.040), (I-302)+(1.016)+(2.041), (I-302)+(1.016)+(2.042), (I-302)+(1.016)+(2.043), (I-302)+(1.016)+(2.044), (I-302)+(1.016)+(2.045), (I-302)+(1.016)+(2.046), (I-302)+(1.016)+(2.047), (I-302)+(1.016)+(2.048), (I-302)+(1.016)+(2.049), (I-302)+(1.016)+(2.050), (I-302)+(1.016)+(2.051), (I-302)+(1.016)+(2.052), (I-302)+(1.016)+(2.053), (I-302)+(1.016)+(2.054), (I-302)+(1.016)+(2.055), (I-302)+(1.016)+(2.056), (I-302)+(1.016)+(2.057), (I-302)+(1.016)+(2.058), (I-302)+(1.016)+(2.059), (I-302)+(1.016)+(3.001), (I-302)+(1.016)+(3.002), (I-302)+(1.016)+(3.003), (I-302)+(1.016)+(3.004), (I-302)+(1.016)+(3.005), (I-302)+(1.016)+(3.006), (I-302)+(1.016)+(3.007), (I-302)+(1.016)+(3.008), (I-302)+(1.016)+(3.009), (I-302)+(1.016)+(3.010), (I-302)+(1.016)+(3.011), (I-302)+(1.016)+(3.012), (I-302)+(1.016)+(3.013), (I-302)+(1.016)+(3.014), (I-302)+(1.016)+(3.015), (I-302)+(1.016)+(3.016), (I-302)+(1.016)+(3.017), (I-302)+(1.016)+(3.018), (I-302)+(1.016)+(3.019), (I-302)+(1.016)+(3.020), (I-302)+(1.016)+(3.021), (I-302)+(1.016)+(3.022), (I-302)+(1.016)+(3.023), (I-302)+(1.016)+(3.024), (I-302)+(1.016)+(3.025), (I-302)+(1.016)+(3.026), (I-302)+(1.016)+(3.027), (I-302)+(1.016)+(3.028), (I-302)+(1.016)+(3.029), (I-302)+(1.016)+(3.030), (I-302)+(1.016)+(3.031), (I-302)+(1.016)+(5.001), (I-302)+(1.016)+(5.002), (I-302)+(1.016)+(5.003), (I-302)+(1.016)+(5.004), (I-302)+(1.016)+(5.005), (I-302)+(1.016)+(5.006), (I-302)+(1.016)+(5.007), (I-302)+(1.016)+(5.008), (I-302)+(1.016)+(5.009), (I-302)+(1.016)+(5.010), (I-302)+(1.016)+(5.011), (I-302)+(1.016)+(5.012), (I-302)+(1.016)+(5.013), (I-302)+(1.016)+(5.014), (I-302)+(1.016)+(5.015), (I-302)+(1.016)+(5.016), (I-302)+(1.016)+(5.017), (I-302)+(1.016)+(5.018), (I-302)+(1.016)+(5.019), (I-302)+(1.016)+(5.020), (I-302)+(1.016)+(5.021), (I-302)+(1.016)+(5.022), (I-302)+(1.016)+(5.023), (I-302)+(1.016)+(6.001), (I-302)+(1.016)+(6.002), (I-302)+(1.016)+(6.003), (I-302)+(1.016)+(6.004), (I-302)+(1.016)+(7.001), (I-302)+(1.016)+(7.002), (I-302)+(1.016)+(7.003), (I-302)+(1.016)+(7.004), (I-302)+(1.016)+(7.005), (I-302)+(1.016)+(7.006), (I-302)+(1.016)+(9.001), (I-302)+(1.016)+(9.002), (I-302)+(1.016)+(9.003), (I-302)+(1.016)+(9.004), (I-302)+(1.016)+(9.005), (I-302)+(1.016)+(9.006), (I-302)+(1.016)+(9.007), (I-302)+(1.016)+(9.008), (I-302)+(1.016)+(9.009), (I-302)+(1.016)+(14.001), (I-302)+(1.016)+(14.002), (I-302)+(1.016)+(15.008), (I-302)+(1.016)+(15.011), (I-302)+(1.016)+(15.012), (I-302)+(1.016)+(15.016), (I-302)+(1.016)+(15.025), (I-302)+(1.016)+(15.027), (I-302)+(1.016)+(15.047), (I-302)+(1.016)+(15.063), (I-302)+(1.016)+(15.064), (I-302)+(1.016)+(16.001), (I-302)+(1.016)+(16.002), (I-302)+(1.016)+(16.003), (I-302)+(1.016)+(16.004), (I-302)+(1.016)+(16.005), (I-302)+(1.016)+(16.006), (I-302)+(1.016)+(16.007), (I-302)+(1.016)+(16.008), (I-302)+(1.016)+(17.001), (I-302)+(1.016)+(17.002), (I-302)+(1.016)+(17.003), (I-302)+(1.016)+(17.004), (I-302)+(1.016)+(17.005), (I-302)+(1.016)+(17.006), (I-302)+(1.016)+(17.007), (I-302)+(1.016)+(17.008), (I-302)+(1.016)+(17.009), (I-302)+(1.016)+(17.010), (I-302)+(1.016)+(17.011), (I-302)+(1.016)+(17.012), (I-302)+(1.016)+(18.001), (I-302)+(1.017)+(1.018), (I-302)+(1.017)+(1.019), (I-302)+(1.017)+(1.020), (I-302)+(1.017)+(1.021), (I-302)+(1.017)+(1.022), (I-302)+(1.017)+(1.023), (I-302)+(1.017)+(1.024), (I-302)+(1.017)+(1.025), (I-302)+(1.017)+(1.026), (I-302)+(1.017)+(1.027), (I-302)+(1.017)+(1.028), (I-302)+(1.017)+(1.029), (I-302)+(1.017)+(1.030), (I-302)+(1.017)+(1.031), (I-302)+(1.017)+(1.032), (I-302)+(1.017)+(1.033), (I-302)+(1.017)+(1.034), (I-302)+(1.017)+(1.035), (I-302)+(1.017)+(1.036), (I-302)+(1.017)+(1.037), (I-302)+(1.017)+(1.038), (I-302)+(1.017)+(1.039), (I-302)+(1.017)+(1.040), (I-302)+(1.017)+(1.041), (I-302)+(1.017)+(1.042), (I-302)+(1.017)+(1.043), (I-302)+(1.017)+(1.044), (I-302)+(1.017)+(1.045), (I-302)+(1.017)+(1.046), (I-302)+(1.017)+(1.047), (I-302)+(1.017)+(1.048), (I-302)+(1.017)+(1.049), (I-302)+(1.017)+(1.050), (I-302)+(1.017)+(1.051), (I-302)+(1.017)+(1.052), (I-302)+(1.017)+(1.053), (I-302)+(1.017)+(1.054), (I-302)+(1.017)+(1.055), (I-302)+(1.017)+(1.056), (I-302)+(1.017)+(1.057), (I-302)+(1.017)+(1.058), (I-302)+(1.017)+(1.059), (I-302)+(1.017)+(1.060), (I-302)+(1.017)+(1.061), (I-302)+(1.017)+(1.062), (I-302)+(1.017)+(1.063), (I-302)+(1.017)+(1.064), (I-302)+(1.017)+(1.065), (I-302)+(1.017)+(1.066), (I-302)+(1.017)+(1.067), (I-302)+(1.017)+(1.068), (I-302)+(1.017)+(1.069), (I-302)+(1.017)+(1.070), (I-302)+(1.017)+(1.071), (I-302)+(1.017)+(1.072), (I-302)+(1.017)+(1.073), (I-302)+(1.017)+(1.074), (I-302)+(1.017)+(1.075), (I-302)+(1.017)+(1.076), (I-302)+(1.017)+(1.077), (I-302)+(1.017)+(1.078), (I-302)+(1.017)+(1.079), (I-302)+(1.017)+(1.080), (I-302)+(1.017)+(1.081), (I-302)+(1.017)+(1.082), (I-302)+(1.017)+(1.083), (I-302)+(1.017)+(1.084), (I-302)+(1.017)+(1.085), (I-302)+(1.017)+(1.086), (I-302)+(1.017)+(1.087), (I-302)+(1.017)+(1.088), (I-302)+(1.017)+(1.089), (I-302)+(1.017)+(1.090), (I-302)+(1.017)+(1.091), (I-302)+(1.017)+(1.092), (I-302)+(1.017)+(2.001), (I-302)+(1.017)+(2.002), (I-302)+(1.017)+(2.003), (I-302)+(1.017)+(2.004), (I-302)+(1.017)+(2.005), (I-302)+(1.017)+(2.006), (I-302)+(1.017)+(2.007), (I-302)+(1.017)+(2.008), (I-302)+(1.017)+(2.009), (I-302)+(1.017)+(2.010), (I-302)+(1.017)+(2.011), (I-302)+(1.017)+(2.012), (I-302)+(1.017)+(2.013), (I-302)+(1.017)+(2.014), (I-302)+(1.017)+(2.015), (I-302)+(1.017)+(2.016), (I-302)+(1.017)+(2.017), (I-302)+(1.017)+(2.018), (I-302)+(1.017)+(2.019), (I-302)+(1.017)+(2.020), (I-302)+(1.017)+(2.021), (I-302)+(1.017)+(2.022), (I-302)+(1.017)+(2.023), (I-302)+(1.017)+(2.024), (I-302)+(1.017)+(2.025), (I-302)+(1.017)+(2.026), (I-302)+(1.017)+(2.027), (I-302)+(1.017)+(2.028), (I-302)+(1.017)+(2.029), (I-302)+(1.017)+(2.030), (I-302)+(1.017)+(2.031), (I-302)+(1.017)+(2.032), (I-302)+(1.017)+(2.033), (I-302)+(1.017)+(2.034), (I-302)+(1.017)+(2.035), (I-302)+(1.017)+(2.036), (I-302)+(1.017)+(2.037), (I-302)+(1.017)+(2.038), (I-302)+(1.017)+(2.039), (I-302)+(1.017)+(2.040), (I-302)+(1.017)+(2.041), (I-302)+(1.017)+(2.042), (I-302)+(1.017)+(2.043), (I-302)+(1.017)+(2.044), (I-302)+(1.017)+(2.045), (I-302)+(1.017)+(2.046), (I-302)+(1.017)+(2.047), (I-302)+(1.017)+(2.048), (I-302)+(1.017)+(2.049), (I-302)+(1.017)+(2.050), (I-302)+(1.017)+(2.051), (I-302)+(1.017)+(2.052), (I-302)+(1.017)+(2.053), (I-302)+(1.017)+(2.054), (I-302)+(1.017)+(2.055), (I-302)+(1.017)+(2.056), (I-302)+(1.017)+(2.057), (I-302)+(1.017)+(2.058), (I-302)+(1.017)+(2.059), (I-302)+(1.017)+(3.001), (I-302)+(1.017)+(3.002), (I-302)+(1.017)+(3.003), (I-302)+(1.017)+(3.004), (I-302)+(1.017)+(3.005), (I-302)+(1.017)+(3.006), (I-302)+(1.017)+(3.007), (I-302)+(1.017)+(3.008), (I-302)+(1.017)+(3.009), (I-302)+(1.017)+(3.010), (I-302)+(1.017)+(3.011), (I-302)+(1.017)+(3.012), (I-302)+(1.017)+(3.013), (I-302)+(1.017)+(3.014), (I-302)+(1.017)+(3.015), (I-302)+(1.017)+(3.016), (I-302)+(1.017)+(3.017), (I-302)+(1.017)+(3.018), (I-302)+(1.017)+(3.019), (I-302)+(1.017)+(3.020), (I-302)+(1.017)+(3.021), (I-302)+(1.017)+(3.022), (I-302)+(1.017)+(3.023), (I-302)+(1.017)+(3.024), (I-302)+(1.017)+(3.025), (I-302)+(1.017)+(3.026), (I-302)+(1.017)+(3.027), (I-302)+(1.017)+(3.028), (I-302)+(1.017)+(3.029), (I-302)+(1.017)+(3.030), (I-302)+(1.017)+(3.031), (I-302)+(1.017)+(5.001), (I-302)+(1.017)+(5.002), (I-302)+(1.017)+(5.003), (I-302)+(1.017)+(5.004), (I-302)+(1.017)+(5.005), (I-302)+(1.017)+(5.006), (I-302)+(1.017)+(5.007), (I-302)+(1.017)+(5.008), (I-302)+(1.017)+(5.009), (I-302)+(1.017)+(5.010), (I-302)+(1.017)+(5.011), (I-302)+(1.017)+(5.012), (I-302)+(1.017)+(5.013), (I-302)+(1.017)+(5.014), (I-302)+(1.017)+(5.015), (I-302)+(1.017)+(5.016), (I-302)+(1.017)+(5.017), (I-302)+(1.017)+(5.018), (I-302)+(1.017)+(5.019), (I-302)+(1.017)+(5.020), (I-302)+(1.017)+(5.021), (I-302)+(1.017)+(5.022), (I-302)+(1.017)+(5.023), (I-302)+(1.017)+(6.001), (I-302)+(1.017)+(6.002), (I-302)+(1.017)+(6.003), (I-302)+(1.017)+(6.004), (I-302)+(1.017)+(7.001), (I-302)+(1.017)+(7.002), (I-302)+(1.017)+(7.003), (I-302)+(1.017)+(7.004), (I-302)+(1.017)+(7.005), (I-302)+(1.017)+(7.006), (I-302)+(1.017)+(9.001), (I-302)+(1.017)+(9.002), (I-302)+(1.017)+(9.003), (I-302)+(1.017)+(9.004), (I-302)+(1.017)+(9.005), (I-302)+(1.017)+(9.006), (I-302)+(1.017)+(9.007), (I-302)+(1.017)+(9.008), (I-302)+(1.017)+(9.009), (I-302)+(1.017)+(14.001), (I-302)+(1.017)+(14.002), (I-302)+(1.017)+(15.008), (I-302)+(1.017)+(15.011), (I-302)+(1.017)+(15.012), (I-302)+(1.017)+(15.016), (I-302)+(1.017)+(15.025), (I-302)+(1.017)+(15.027), (I-302)+(1.017)+(15.047), (I-302)+(1.017)+(15.063), (I-302)+(1.017)+(15.064), (I-302)+(1.017)+(16.001), (I-302)+(1.017)+(16.002), (I-302)+(1.017)+(16.003), (I-302)+(1.017)+(16.004), (I-302)+(1.017)+(16.005), (I-302)+(1.017)+(16.006), (I-302)+(1.017)+(16.007), (I-302)+(1.017)+(16.008), (I-302)+(1.017)+(17.001), (I-302)+(1.017)+(17.002), (I-302)+(1.017)+(17.003), (I-302)+(1.017)+(17.004), (I-302)+(1.017)+(17.005), (I-302)+(1.017)+(17.006), (I-302)+(1.017)+(17.007), (I-302)+(1.017)+(17.008), (I-302)+(1.017)+(17.009), (I-302)+(1.017)+(17.010), (I-302)+(1.017)+(17.011), (I-302)+(1.017)+(17.012), (I-302)+(1.017)+(18.001), (I-302)+(1.018)+(1.019), (I-302)+(1.018)+(1.020), (I-302)+(1.018)+(1.021), (I-302)+(1.018)+(1.022), (I-302)+(1.018)+(1.023), (I-302)+(1.018)+(1.024), (I-302)+(1.018)+(1.025), (I-302)+(1.018)+(1.026), (I-302)+(1.018)+(1.027), (I-302)+(1.018)+(1.028), (I-302)+(1.018)+(1.029), (I-302)+(1.018)+(1.030), (I-302)+(1.018)+(1.031), (I-302)+(1.018)+(1.032), (I-302)+(1.018)+(1.033), (I-302)+(1.018)+(1.034), (I-302)+(1.018)+(1.035), (I-302)+(1.018)+(1.036), (I-302)+(1.018)+(1.037), (I-302)+(1.018)+(1.038), (I-302)+(1.018)+(1.039), (I-302)+(1.018)+(1.040), (I-302)+(1.018)+(1.041), (I-302)+(1.018)+(1.042), (I-302)+(1.018)+(1.043), (I-302)+(1.018)+(1.044), (I-302)+(1.018)+(1.045), (I-302)+(1.018)+(1.046), (I-302)+(1.018)+(1.047), (I-302)+(1.018)+(1.048), (I-302)+(1.018)+(1.049), (I-302)+(1.018)+(1.050), (I-302)+(1.018)+(1.051), (I-302)+(1.018)+(1.052), (I-302)+(1.018)+(1.053), (I-302)+(1.018)+(1.054), (I-302)+(1.018)+(1.055), (I-302)+(1.018)+(1.056), (I-302)+(1.018)+(1.057), (I-302)+(1.018)+(1.058), (I-302)+(1.018)+(1.059), (I-302)+(1.018)+(1.060), (I-302)+(1.018)+(1.061), (I-302)+(1.018)+(1.062), (I-302)+(1.018)+(1.063), (I-302)+(1.018)+(1.064), (I-302)+(1.018)+(1.065), (I-302)+(1.018)+(1.066), (I-302)+(1.018)+(1.067), (I-302)+(1.018)+(1.068), (I-302)+(1.018)+(1.069), (I-302)+(1.018)+(1.070), (I-302)+(1.018)+(1.071), (I-302)+(1.018)+(1.072), (I-302)+(1.018)+(1.073), (I-302)+(1.018)+(1.074), (I-302)+(1.018)+(1.075), (I-302)+(1.018)+(1.076), (I-302)+(1.018)+(1.077), (I-302)+(1.018)+(1.078), (I-302)+(1.018)+(1.079), (I-302)+(1.018)+(1.080), (I-302)+(1.018)+(1.081), (I-302)+(1.018)+(1.082), (I-302)+(1.018)+(1.083), (I-302)+(1.018)+(1.084), (I-302)+(1.018)+(1.085), (I-302)+(1.018)+(1.086), (I-302)+(1.018)+(1.087), (I-302)+(1.018)+(1.088), (I-302)+(1.018)+(1.089), (I-302)+(1.018)+(1.090), (I-302)+(1.018)+(1.091), (I-302)+(1.018)+(1.092), (I-302)+(1.018)+(2.001), (I-302)+(1.018)+(2.002), (I-302)+(1.018)+(2.003), (I-302)+(1.018)+(2.004), (I-302)+(1.018)+(2.005), (I-302)+(1.018)+(2.006), (I-302)+(1.018)+(2.007), (I-302)+(1.018)+(2.008), (I-302)+(1.018)+(2.009), (I-302)+(1.018)+(2.010), (I-302)+(1.018)+(2.011), (I-302)+(1.018)+(2.012), (I-302)+(1.018)+(2.013), (I-302)+(1.018)+(2.014), (I-302)+(1.018)+(2.015), (I-302)+(1.018)+(2.016), (I-302)+(1.018)+(2.017), (I-302)+(1.018)+(2.018), (I-302)+(1.018)+(2.019), (I-302)+(1.018)+(2.020), (I-302)+(1.018)+(2.021), (I-302)+(1.018)+(2.022), (I-302)+(1.018)+(2.023), (I-302)+(1.018)+(2.024), (I-302)+(1.018)+(2.025), (I-302)+(1.018)+(2.026), (I-302)+(1.018)+(2.027), (I-302)+(1.018)+(2.028), (I-302)+(1.018)+(2.029), (I-302)+(1.018)+(2.030), (I-302)+(1.018)+(2.031), (I-302)+(1.018)+(2.032), (I-302)+(1.018)+(2.033), (I-302)+(1.018)+(2.034), (I-302)+(1.018)+(2.035), (I-302)+(1.018)+(2.036), (I-302)+(1.018)+(2.037), (I-302)+(1.018)+(2.038), (I-302)+(1.018)+(2.039), (I-302)+(1.018)+(2.040), (I-302)+(1.018)+(2.041), (I-302)+(1.018)+(2.042), (I-302)+(1.018)+(2.043), (I-302)+(1.018)+(2.044), (I-302)+(1.018)+(2.045), (I-302)+(1.018)+(2.046), (I-302)+(1.018)+(2.047), (I-302)+(1.018)+(2.048), (I-302)+(1.018)+(2.049), (I-302)+(1.018)+(2.050), (I-302)+(1.018)+(2.051), (I-302)+(1.018)+(2.052), (I-302)+(1.018)+(2.053), (I-302)+(1.018)+(2.054), (I-302)+(1.018)+(2.055), (I-302)+(1.018)+(2.056), (I-302)+(1.018)+(2.057), (I-302)+(1.018)+(2.058), (I-302)+(1.018)+(2.059), (I-302)+(1.018)+(3.001), (I-302)+(1.018)+(3.002), (I-302)+(1.018)+(3.003), (I-302)+(1.018)+(3.004), (I-302)+(1.018)+(3.005), (I-302)+(1.018)+(3.006), (I-302)+(1.018)+(3.007), (I-302)+(1.018)+(3.008), (I-302)+(1.018)+(3.009), (I-302)+(1.018)+(3.010), (I-302)+(1.018)+(3.011), (I-302)+(1.018)+(3.012), (I-302)+(1.018)+(3.013), (I-302)+(1.018)+(3.014), (I-302)+(1.018)+(3.015), (I-302)+(1.018)+(3.016), (I-302)+(1.018)+(3.017), (I-302)+(1.018)+(3.018), (I-302)+(1.018)+(3.019), (I-302)+(1.018)+(3.020), (I-302)+(1.018)+(3.021), (I-302)+(1.018)+(3.022), (I-302)+(1.018)+(3.023), (I-302)+(1.018)+(3.024), (I-302)+(1.018)+(3.025), (I-302)+(1.018)+(3.026), (I-302)+(1.018)+(3.027), (I-302)+(1.018)+(3.028), (I-302)+(1.018)+(3.029), (I-302)+(1.018)+(3.030), (I-302)+(1.018)+(3.031), (I-302)+(1.018)+(5.001), (I-302)+(1.018)+(5.002), (I-302)+(1.018)+(5.003), (I-302)+(1.018)+(5.004), (I-302)+(1.018)+(5.005), (I-302)+(1.018)+(5.006), (I-302)+(1.018)+(5.007), (I-302)+(1.018)+(5.008), (I-302)+(1.018)+(5.009), (I-302)+(1.018)+(5.010), (I-302)+(1.018)+(5.011), (I-302)+(1.018)+(5.012), (I-302)+(1.018)+(5.013), (I-302)+(1.018)+(5.014), (I-302)+(1.018)+(5.015), (I-302)+(1.018)+(5.016), (I-302)+(1.018)+(5.017), (I-302)+(1.018)+(5.018), (I-302)+(1.018)+(5.019), (I-302)+(1.018)+(5.020), (I-302)+(1.018)+(5.021), (I-302)+(1.018)+(5.022), (I-302)+(1.018)+(5.023), (I-302)+(1.018)+(6.001), (I-302)+(1.018)+(6.002), (I-302)+(1.018)+(6.003), (I-302)+(1.018)+(6.004), (I-302)+(1.018)+(7.001), (I-302)+(1.018)+(7.002), (I-302)+(1.018)+(7.003), (I-302)+(1.018)+(7.004), (I-302)+(1.018)+(7.005), (I-302)+(1.018)+(7.006), (I-302)+(1.018)+(9.001), (I-302)+(1.018)+(9.002), (I-302)+(1.018)+(9.003), (I-302)+(1.018)+(9.004), (I-302)+(1.018)+(9.005), (I-302)+(1.018)+(9.006), (I-302)+(1.018)+(9.007), (I-302)+(1.018)+(9.008), (I-302)+(1.018)+(9.009), (I-302)+(1.018)+(14.001), (I-302)+(1.018)+(14.002), (I-302)+(1.018)+(15.008), (I-302)+(1.018)+(15.011), (I-302)+(1.018)+(15.012), (I-302)+(1.018)+(15.016), (I-302)+(1.018)+(15.025), (I-302)+(1.018)+(15.027), (I-302)+(1.018)+(15.047), (I-302)+(1.018)+(15.063), (I-302)+(1.018)+(15.064), (I-302)+(1.018)+(16.001), (I-302)+(1.018)+(16.002), (I-302)+(1.018)+(16.003), (I-302)+(1.018)+(16.004), (I-302)+(1.018)+(16.005), (I-302)+(1.018)+(16.006), (I-302)+(1.018)+(16.007), (I-302)+(1.018)+(16.008), (I-302)+(1.018)+(17.001), (I-302)+(1.018)+(17.002), (I-302)+(1.018)+(17.003), (I-302)+(1.018)+(17.004), (I-302)+(1.018)+(17.005), (I-302)+(1.018)+(17.006), (I-302)+(1.018)+(17.007), (I-302)+(1.018)+(17.008), (I-302)+(1.018)+(17.009), (I-302)+(1.018)+(17.010), (I-302)+(1.018)+(17.011), (I-302)+(1.018)+(17.012), (I-302)+(1.018)+(18.001),
(I-302)+(1.019)+(1.020), (I-302)+(1.019)+(1.021), (I-302)+(1.019)+(1.022), (I-302)+(1.019)+(1.023), (I-302)+(1.019)+(1.024), (I-302)+(1.019)+(1.025), (I-302)+(1.019)+(1.026), (I-302)+(1.019)+(1.027), (I-302)+(1.019)+(1.028), (I-302)+(1.019)+(1.029), (I-302)+(1.019)+(1.030), (I-302)+(1.019)+(1.031), (I-302)+(1.019)+(1.032), (I-302)+(1.019)+(1.033), (I-302)+(1.019)+(1.034), (I-302)+(1.019)+(1.035), (I-302)+(1.019)+(1.036), (I-302)+(1.019)+(1.037), (I-302)+(1.019)+(1.038), (I-302)+(1.019)+(1.039), (I-302)+(1.019)+(1.040), (I-302)+(1.019)+(1.041), (I-302)+(1.019)+(1.042), (I-302)+(1.019)+(1.043), (I-302)+(1.019)+(1.044), (I-302)+(1.019)+(1.045), (I-302)+(1.019)+(1.046), (I-302)+(1.019)+(1.047), (I-302)+(1.019)+(1.048), (I-302)+(1.019)+(1.049), (I-302)+(1.019)+(1.050), (I-302)+(1.019)+(1.051), (I-302)+(1.019)+(1.052), (I-302)+(1.019)+(1.053), (I-302)+(1.019)+(1.054), (I-302)+(1.019)+(1.055), (I-302)+(1.019)+(1.056), (I-302)+(1.019)+(1.057), (I-302)+(1.019)+(1.058), (I-302)+(1.019)+(1.059), (I-302)+(1.019)+(1.060), (I-302)+(1.019)+(1.061), (I-302)+(1.019)+(1.062), (I-302)+(1.019)+(1.063), (I-302)+(1.019)+(1.064), (I-302)+(1.019)+(1.065), (I-302)+(1.019)+(1.066), (I-302)+(1.019)+(1.067), (I-302)+(1.019)+(1.068), (I-302)+(1.019)+(1.069), (I-302)+(1.019)+(1.070), (I-302)+(1.019)+(1.071), (I-302)+(1.019)+(1.072), (I-302)+(1.019)+(1.073), (I-302)+(1.019)+(1.074), (I-302)+(1.019)+(1.075), (I-302)+(1.019)+(1.076), (I-302)+(1.019)+(1.077), (I-302)+(1.019)+(1.078), (I-302)+(1.019)+(1.079), (I-302)+(1.019)+(1.080), (I-302)+(1.019)+(1.081), (I-302)+(1.019)+(1.082), (I-302)+(1.019)+(1.083), (I-302)+(1.019)+(1.084), (I-302)+(1.019)+(1.085), (I-302)+(1.019)+(1.086), (I-302)+(1.019)+(1.087), (I-302)+(1.019)+(1.088), (I-302)+(1.019)+(1.089), (I-302)+(1.019)+(1.090), (I-302)+(1.019)+(1.091), (I-302)+(1.019)+(1.092), (I-302)+(1.019)+(2.001), (I-302)+(1.019)+(2.002), (I-302)+(1.019)+(2.003), (I-302)+(1.019)+(2.004), (I-302)+(1.019)+(2.005), (I-302)+(1.019)+(2.006), (I-302)+(1.019)+(2.007), (I-302)+(1.019)+(2.008), (I-302)+(1.019)+(2.009), (I-302)+(1.019)+(2.010), (I-302)+(1.019)+(2.011), (I-302)+(1.019)+(2.012), (I-302)+(1.019)+(2.013), (I-302)+(1.019)+(2.014), (I-302)+(1.019)+(2.015), (I-302)+(1.019)+(2.016), (I-302)+(1.019)+(2.017), (I-302)+(1.019)+(2.018), (I-302)+(1.019)+(2.019), (I-302)+(1.019)+(2.020), (I-302)+(1.019)+(2.021), (I-302)+(1.019)+(2.022), (I-302)+(1.019)+(2.023), (I-302)+(1.019)+(2.024), (I-302)+(1.019)+(2.025), (I-302)+(1.019)+(2.026), (I-302)+(1.019)+(2.027), (I-302)+(1.019)+(2.028), (I-302)+(1.019)+(2.029), (I-302)+(1.019)+(2.030), (I-302)+(1.019)+(2.031), (I-302)+(1.019)+(2.032), (I-302)+(1.019)+(2.033), (I-302)+(1.019)+(2.034), (I-302)+(1.019)+(2.035), (I-302)+(1.019)+(2.036), (I-302)+(1.019)+(2.037), (I-302)+(1.019)+(2.038), (I-302)+(1.019)+(2.039), (I-302)+(1.019)+(2.040), (I-302)+(1.019)+(2.041), (I-302)+(1.019)+(2.042), (I-302)+(1.019)+(2.043), (I-302)+(1.019)+(2.044), (I-302)+(1.019)+(2.045), (I-302)+(1.019)+(2.046), (I-302)+(1.019)+(2.047), (I-302)+(1.019)+(2.048), (I-302)+(1.019)+(2.049), (I-302)+(1.019)+(2.050), (I-302)+(1.019)+(2.051), (I-302)+(1.019)+(2.052), (I-302)+(1.019)+(2.053), (I-302)+(1.019)+(2.054), (I-302)+(1.019)+(2.055), (I-302)+(1.019)+(2.056), (I-302)+(1.019)+(2.057), (I-302)+(1.019)+(2.058), (I-302)+(1.019)+(2.059), (I-302)+(1.019)+(3.001), (I-302)+(1.019)+(3.002), (I-302)+(1.019)+(3.003), (I-302)+(1.019)+(3.004), (I-302)+(1.019)+(3.005), (I-302)+(1.019)+(3.006), (I-302)+(1.019)+(3.007), (I-302)+(1.019)+(3.008), (I-302)+(1.019)+(3.009), (I-302)+(1.019)+(3.010), (I-302)+(1.019)+(3.011), (I-302)+(1.019)+(3.012), (I-302)+(1.019)+(3.013), (I-302)+(1.019)+(3.014), (I-302)+(1.019)+(3.015), (I-302)+(1.019)+(3.016), (I-302)+(1.019)+(3.017), (I-302)+(1.019)+(3.018), (I-302)+(1.019)+(3.019), (I-302)+(1.019)+(3.020), (I-302)+(1.019)+(3.021), (I-302)+(1.019)+(3.022), (I-302)+(1.019)+(3.023), (I-302)+(1.019)+(3.024), (I-302)+(1.019)+(3.025), (I-302)+(1.019)+(3.026), (I-302)+(1.019)+(3.027), (I-302)+(1.019)+(3.028), (I-302)+(1.019)+(3.029), (I-302)+(1.019)+(3.030), (I-302)+(1.019)+(3.031), (I-302)+(1.019)+(5.001), (I-302)+(1.019)+(5.002), (I-302)+(1.019)+(5.003), (I-302)+(1.019)+(5.004), (I-302)+(1.019)+(5.005), (I-302)+(1.019)+(5.006), (I-302)+(1.019)+(5.007), (I-302)+(1.019)+(5.008), (I-302)+(1.019)+(5.009), (I-302)+(1.019)+(5.010), (I-302)+(1.019)+(5.011), (I-302)+(1.019)+(5.012), (I-302)+(1.019)+(5.013), (I-302)+(1.019)+(5.014), (I-302)+(1.019)+(5.015), (I-302)+(1.019)+(5.016), (I-302)+(1.019)+(5.017), (I-302)+(1.019)+(5.018), (I-302)+(1.019)+(5.019), (I-302)+(1.019)+(5.020), (I-302)+(1.019)+(5.021), (I-302)+(1.019)+(5.022), (I-302)+(1.019)+(5.023), (I-302)+(1.019)+(6.001), (I-302)+(1.019)+(6.002), (I-302)+(1.019)+(6.003), (I-302)+(1.019)+(6.004), (I-302)+(1.019)+(7.001), (I-302)+(1.019)+(7.002), (I-302)+(1.019)+(7.003), (I-302)+(1.019)+(7.004), (I-302)+(1.019)+(7.005), (I-302)+(1.019)+(7.006), (I-302)+(1.019)+(9.001), (I-302)+(1.019)+(9.002), (I-302)+(1.019)+(9.003), (I-302)+(1.019)+(9.004), (I-302)+(1.019)+(9.005), (I-302)+(1.019)+(9.006), (I-302)+(1.019)+(9.007), (I-302)+(1.019)+(9.008), (I-302)+(1.019)+(9.009), (I-302)+(1.019)+(14.001), (I-302)+(1.019)+(14.002), (I-302)+(1.019)+(15.008), (I-302)+(1.019)+(15.011), (I-302)+(1.019)+(15.012), (I-302)+(1.019)+(15.016), (I-302)+(1.019)+(15.025), (I-302)+(1.019)+(15.027), (I-302)+(1.019)+(15.047), (I-302)+(1.019)+(15.063), (I-302)+(1.019)+(15.064), (I-302)+(1.019)+(16.001), (I-302)+(1.019)+(16.002), (I-302)+(1.019)+(16.003), (I-302)+(1.019)+(16.004), (I-302)+(1.019)+(16.005), (I-302)+(1.019)+(16.006), (I-302)+(1.019)+(16.007), (I-302)+(1.019)+(16.008), (I-302)+(1.019)+(17.001), (I-302)+(1.019)+(17.002), (I-302)+(1.019)+(17.003), (I-302)+(1.019)+(17.004), (I-302)+(1.019)+(17.005), (I-302)+(1.019)+(17.006), (I-302)+(1.019)+(17.007), (I-302)+(1.019)+(17.008), (I-302)+(1.019)+(17.009), (I-302)+(1.019)+(17.010), (I-302)+(1.019)+(17.011), (I-302)+(1.019)+(17.012), (I-302)+(1.019)+(18.001),
(I-302)+(1.020)+(1.021), (I-302)+(1.020)+(1.022), (I-302)+(1.020)+(1.023), (I-302)+(1.020)+(1.024), (I-302)+(1.020)+(1.025), (I-302)+(1.020)+(1.026), (I-302)+(1.020)+(1.027), (I-302)+(1.020)+(1.028), (I-302)+(1.020)+(1.029), (I-302)+(1.020)+(1.030), (I-302)+(1.020)+(1.031), (I-302)+(1.020)+(1.032), (I-302)+(1.020)+(1.033), (I-302)+(1.020)+(1.034), (I-302)+(1.020)+(1.035), (I-302)+(1.020)+(1.036), (I-302)+(1.020)+(1.037), (I-302)+(1.020)+(1.038), (I-302)+(1.020)+(1.039), (I-302)+(1.020)+(1.040), (I-302)+(1.020)+(1.041), (I-302)+(1.020)+(1.042), (I-302)+(1.020)+(1.043), (I-302)+(1.020)+(1.044), (I-302)+(1.020)+(1.045), (I-302)+(1.020)+(1.046), (I-302)+(1.020)+(1.047), (I-302)+(1.020)+(1.048), (I-302)+(1.020)+(1.049), (I-302)+(1.020)+(1.050), (I-302)+(1.020)+(1.051), (I-302)+(1.020)+(1.052), (I-302)+(1.020)+(1.053), (I-302)+(1.020)+(1.054), (I-302)+(1.020)+(1.055), (I-302)+(1.020)+(1.056), (I-302)+(1.020)+(1.057), (I-302)+(1.020)+(1.058), (I-302)+(1.020)+(1.059), (I-302)+(1.020)+(1.060), (I-302)+(1.020)+(1.061), (I-302)+(1.020)+(1.062), (I-302)+(1.020)+(1.063), (I-302)+(1.020)+(1.064), (I-302)+(1.020)+(1.065), (I-302)+(1.020)+(1.066), (I-302)+(1.020)+(1.067), (I-302)+(1.020)+(1.068), (I-302)+(1.020)+(1.069), (I-302)+(1.020)+(1.070), (I-302)+(1.020)+(1.071), (I-302)+(1.020)+(1.072), (I-302)+(1.020)+(1.073), (I-302)+(1.020)+(1.074), (I-302)+(1.020)+(1.075), (I-302)+(1.020)+(1.076), (I-302)+(1.020)+(1.077), (I-302)+(1.020)+(1.078), (I-302)+(1.020)+(1.079), (I-302)+(1.020)+(1.080), (I-302)+(1.020)+(1.081), (I-302)+(1.020)+(1.082), (I-302)+(1.020)+(1.083), (I-302)+(1.020)+(1.084), (I-302)+(1.020)+(1.085), (I-302)+(1.020)+(1.086), (I-302)+(1.020)+(1.087), (I-302)+(1.020)+(1.088), (I-302)+(1.020)+(1.089), (I-302)+(1.020)+(1.090), (I-302)+(1.020)+(1.091), (I-302)+(1.020)+(1.092), (I-302)+(1.020)+(2.001), (I-302)+(1.020)+(2.002), (I-302)+(1.020)+(2.003), (I-302)+(1.020)+(2.004), (I-302)+(1.020)+(2.005), (I-302)+(1.020)+(2.006), (I-302)+(1.020)+(2.007), (I-302)+(1.020)+(2.008), (I-302)+(1.020)+(2.009), (I-302)+(1.020)+(2.010), (I-302)+(1.020)+(2.011), (I-302)+(1.020)+(2.012), (I-302)+(1.020)+(2.013), (I-302)+(1.020)+(2.014), (I-302)+(1.020)+(2.015), (I-302)+(1.020)+(2.016), (I-302)+(1.020)+(2.017), (I-302)+(1.020)+(2.018), (I-302)+(1.020)+(2.019), (I-302)+(1.020)+(2.020), (I-302)+(1.020)+(2.021), (I-302)+(1.020)+(2.022), (I-302)+(1.020)+(2.023), (I-302)+(1.020)+(2.024), (I-302)+(1.020)+(2.025), (I-302)+(1.020)+(2.026), (I-302)+(1.020)+(2.027), (I-302)+(1.020)+(2.028), (I-302)+(1.020)+(2.029), (I-302)+(1.020)+(2.030), (I-302)+(1.020)+(2.031), (I-302)+(1.020)+(2.032), (I-302)+(1.020)+(2.033), (I-302)+(1.020)+(2.034), (I-302)+(1.020)+(2.035), (I-302)+(1.020)+(2.036), (I-302)+(1.020)+(2.037), (I-302)+(1.020)+(2.038), (I-302)+(1.020)+(2.039), (I-302)+(1.020)+(2.040), (I-302)+(1.020)+(2.041), (I-302)+(1.020)+(2.042), (I-302)+(1.020)+(2.043), (I-302)+(1.020)+(2.044), (I-302)+(1.020)+(2.045), (I-302)+(1.020)+(2.046), (I-302)+(1.020)+(2.047), (I-302)+(1.020)+(2.048), (I-302)+(1.020)+(2.049), (I-302)+(1.020)+(2.050), (I-302)+(1.020)+(2.051), (I-302)+(1.020)+(2.052), (I-302)+(1.020)+(2.053), (I-302)+(1.020)+(2.054), (I-302)+(1.020)+(2.055), (I-302)+(1.020)+(2.056), (I-302)+(1.020)+(2.057), (I-302)+(1.020)+(2.058), (I-302)+(1.020)+(2.059), (I-302)+(1.020)+(3.001), (I-302)+(1.020)+(3.002), (I-302)+(1.020)+(3.003), (I-302)+(1.020)+(3.004), (I-302)+(1.020)+(3.005), (I-302)+(1.020)+(3.006), (I-302)+(1.020)+(3.007), (I-302)+(1.020)+(3.008), (I-302)+(1.020)+(3.009), (I-302)+(1.020)+(3.010), (I-302)+(1.020)+(3.011), (I-302)+(1.020)+(3.012), (I-302)+(1.020)+(3.013), (I-302)+(1.020)+(3.014), (I-302)+(1.020)+(3.015), (I-302)+(1.020)+(3.016), (I-302)+(1.020)+(3.017), (I-302)+(1.020)+(3.018), (I-302)+(1.020)+(3.019), (I-302)+(1.020)+(3.020), (I-302)+(1.020)+(3.021), (I-302)+(1.020)+(3.022), (I-302)+(1.020)+(3.023), (I-302)+(1.020)+(3.024), (I-302)+(1.020)+(3.025), (I-302)+(1.020)+(3.026), (I-302)+(1.020)+(3.027), (I-302)+(1.020)+(3.028), (I-302)+(1.020)+(3.029), (I-302)+(1.020)+(3.030), (I-302)+(1.020)+(3.031), (I-302)+(1.020)+(5.001), (I-302)+(1.020)+(5.002), (I-302)+(1.020)+(5.003), (I-302)+(1.020)+(5.004), (I-302)+(1.020)+(5.005), (I-302)+(1.020)+(5.006), (I-302)+(1.020)+(5.007), (I-302)+(1.020)+(5.008), (I-302)+(1.020)+(5.009), (I-302)+(1.020)+(5.010), (I-302)+(1.020)+(5.011), (I-302)+(1.020)+(5.012), (I-302)+(1.020)+(5.013), (I-302)+(1.020)+(5.014), (I-302)+(1.020)+(5.015), (I-302)+(1.020)+(5.016), (I-302)+(1.020)+(5.017), (I-302)+(1.020)+(5.018), (I-302)+(1.020)+(5.019), (I-302)+(1.020)+(5.020), (I-302)+(1.020)+(5.021), (I-302)+(1.020)+(5.022), (I-302)+(1.020)+(5.023), (I-302)+(1.020)+(6.001), (I-302)+(1.020)+(6.002), (I-302)+(1.020)+(6.003), (I-302)+(1.020)+(6.004), (I-302)+(1.020)+(7.001), (I-302)+(1.020)+(7.002), (I-302)+(1.020)+(7.003), (I-302)+(1.020)+(7.004), (I-302)+(1.020)+(7.005), (I-302)+(1.020)+(7.006), (I-302)+(1.020)+(9.001), (I-302)+(1.020)+(9.002), (I-302)+(1.020)+(9.003), (I-302)+(1.020)+(9.004), (I-302)+(1.020)+(9.005), (I-302)+(1.020)+(9.006), (I-302)+(1.020)+(9.007), (I-302)+(1.020)+(9.008), (I-302)+(1.020)+(9.009), (I-302)+(1.020)+(14.001), (I-302)+(1.020)+(14.002), (I-302)+(1.020)+(15.008), (I-302)+(1.020)+(15.011), (I-302)+(1.020)+(15.012), (I-302)+(1.020)+(15.016), (I-302)+(1.020)+(15.025), (I-302)+(1.020)+(15.027), (I-302)+(1.020)+(15.047), (I-302)+(1.020)+(15.063), (I-302)+(1.020)+(15.064), (I-302)+(1.020)+(16.001), (I-302)+(1.020)+(16.002), (I-302)+(1.020)+(16.003), (I-302)+(1.020)+(16.004), (I-302)+(1.020)+(16.005), (I-302)+(1.020)+(16.006), (I-302)+(1.020)+(16.007), (I-302)+(1.020)+(16.008), (I-302)+(1.020)+(17.001), (I-302)+(1.020)+(17.002), (I-302)+(1.020)+(17.003), (I-302)+(1.020)+(17.004), (I-302)+(1.020)+(17.005), (I-302)+(1.020)+(17.006), (I-302)+(1.020)+(17.007), (I-302)+(1.020)+(17.008), (I-302)+(1.020)+(17.009), (I-302)+(1.020)+(17.010), (I-302)+(1.020)+(17.011), (I-302)+(1.020)+(17.012), (I-302)+(1.020)+(18.001), (I-302)+(1.021)+(1.022), (I-302)+(1.021)+(1.023), (I-302)+(1.021)+(1.024), (I-302)+(1.021)+(1.025), (I-302)+(1.021)+(1.026), (I-302)+(1.021)+(1.027), (I-302)+(1.021)+(1.028), (I-302)+(1.021)+(1.029), (I-302)+(1.021)+(1.030), (I-302)+(1.021)+(1.031), (I-302)+(1.021)+(1.032), (I-302)+(1.021)+(1.033), (I-302)+(1.021)+(1.034), (I-302)+(1.021)+(1.035), (I-302)+(1.021)+(1.036), (I-302)+(1.021)+(1.037), (I-302)+(1.021)+(1.038), (I-302)+(1.021)+(1.039), (I-302)+(1.021)+(1.040), (I-302)+(1.021)+(1.041), (I-302)+(1.021)+(1.042), (I-302)+(1.021)+(1.043), (I-302)+(1.021)+(1.044), (I-302)+(1.021)+(1.045), (I-302)+(1.021)+(1.046), (I-302)+(1.021)+(1.047), (I-302)+(1.021)+(1.048), (I-302)+(1.021)+(1.049), (I-302)+(1.021)+(1.050), (I-302)+(1.021)+(1.051), (I-302)+(1.021)+(1.052), (I-302)+(1.021)+(1.053), (I-302)+(1.021)+(1.054), (I-302)+(1.021)+(1.055), (I-302)+(1.021)+(1.056), (I-302)+(1.021)+(1.057), (I-302)+(1.021)+(1.058), (I-302)+(1.021)+(1.059), (I-302)+(1.021)+(1.060), (I-302)+(1.021)+(1.061), (I-302)+(1.021)+(1.062), (I-302)+(1.021)+(1.063), (I-302)+(1.021)+(1.064), (I-302)+(1.021)+(1.065), (I-302)+(1.021)+(1.066), (I-302)+(1.021)+(1.067), (I-302)+(1.021)+(1.068), (I-302)+(1.021)+(1.069), (I-302)+(1.021)+(1.070), (I-302)+(1.021)+(1.071), (I-302)+(1.021)+(1.072), (I-302)+(1.021)+(1.073), (I-302)+(1.021)+(1.074), (I-302)+(1.021)+(1.075), (I-302)+(1.021)+(1.076), (I-302)+(1.021)+(1.077), (I-302)+(1.021)+(1.078), (I-302)+(1.021)+(1.079), (I-302)+(1.021)+(1.080), (I-302)+(1.021)+(1.081), (I-302)+(1.021)+(1.082), (I-302)+(1.021)+(1.083), (I-302)+(1.021)+(1.084), (I-302)+(1.021)+(1.085), (I-302)+(1.021)+(1.086), (I-302)+(1.021)+(1.087), (I-302)+(1.021)+(1.088), (I-302)+(1.021)+(1.089), (I-302)+(1.021)+(1.090), (I-302)+(1.021)+(1.091), (I-302)+(1.021)+(1.092), (I-302)+(1.021)+(2.001), (I-302)+(1.021)+(2.002), (I-302)+(1.021)+(2.003), (I-302)+(1.021)+(2.004), (I-302)+(1.021)+(2.005), (I-302)+(1.021)+(2.006), (I-302)+(1.021)+(2.007), (I-302)+(1.021)+(2.008), (I-302)+(1.021)+(2.009), (I-302)+(1.021)+(2.010), (I-302)+(1.021)+(2.011), (I-302)+(1.021)+(2.012), (I-302)+(1.021)+(2.013), (I-302)+(1.021)+(2.014), (I-302)+(1.021)+(2.015), (I-302)+(1.021)+(2.016), (I-302)+(1.021)+(2.017), (I-302)+(1.021)+(2.018), (I-302)+(1.021)+(2.019), (I-302)+(1.021)+(2.020), (I-302)+(1.021)+(2.021), (I-302)+(1.021)+(2.022), (I-302)+(1.021)+(2.023), (I-302)+(1.021)+(2.024), (I-302)+(1.021)+(2.025), (I-302)+(1.021)+(2.026), (I-302)+(1.021)+(2.027), (I-302)+(1.021)+(2.028), (I-302)+(1.021)+(2.029), (I-302)+(1.021)+(2.030), (I-302)+(1.021)+(2.031), (I-302)+(1.021)+(2.032), (I-302)+(1.021)+(2.033), (I-302)+(1.021)+(2.034), (I-302)+(1.021)+(2.035), (I-302)+(1.021)+(2.036), (I-302)+(1.021)+(2.037), (I-302)+(1.021)+(2.038), (I-302)+(1.021)+(2.039), (I-302)+(1.021)+(2.040), (I-302)+(1.021)+(2.041), (I-302)+(1.021)+(2.042), (I-302)+(1.021)+(2.043), (I-302)+(1.021)+(2.044), (I-302)+(1.021)+(2.045), (I-302)+(1.021)+(2.046), (I-302)+(1.021)+(2.047), (I-302)+(1.021)+(2.048), (I-302)+(1.021)+(2.049), (I-302)+(1.021)+(2.050), (I-302)+(1.021)+(2.051), (I-302)+(1.021)+(2.052), (I-302)+(1.021)+(2.053), (I-302)+(1.021)+(2.054), (I-302)+(1.021)+(2.055), (I-302)+(1.021)+(2.056), (I-302)+(1.021)+(2.057), (I-302)+(1.021)+(2.058), (I-302)+(1.021)+(2.059), (I-302)+(1.021)+(3.001), (I-302)+(1.021)+(3.002), (I-302)+(1.021)+(3.003), (I-302)+(1.021)+(3.004), (I-302)+(1.021)+(3.005), (I-302)+(1.021)+(3.006), (I-302)+(1.021)+(3.007), (I-302)+(1.021)+(3.008), (I-302)+(1.021)+(3.009), (I-302)+(1.021)+(3.010), (I-302)+(1.021)+(3.011), (I-302)+(1.021)+(3.012), (I-302)+(1.021)+(3.013), (I-302)+(1.021)+(3.014), (I-302)+(1.021)+(3.015), (I-302)+(1.021)+(3.016), (I-302)+(1.021)+(3.017), (I-302)+(1.021)+(3.018), (I-302)+(1.021)+(3.019), (I-302)+(1.021)+(3.020), (I-302)+(1.021)+(3.021), (I-302)+(1.021)+(3.022), (I-302)+(1.021)+(3.023), (I-302)+(1.021)+(3.024), (I-302)+(1.021)+(3.025), (I-302)+(1.021)+(3.026), (I-302)+(1.021)+(3.027), (I-302)+(1.021)+(3.028), (I-302)+(1.021)+(3.029), (I-302)+(1.021)+(3.030), (I-302)+(1.021)+(3.031), (I-302)+(1.021)+(5.001), (I-302)+(1.021)+(5.002), (I-302)+(1.021)+(5.003), (I-302)+(1.021)+(5.004), (I-302)+(1.021)+(5.005), (I-302)+(1.021)+(5.006), (I-302)+(1.021)+(5.007), (I-302)+(1.021)+(5.008), (I-302)+(1.021)+(5.009), (I-302)+(1.021)+(5.010), (I-302)+(1.021)+(5.011), (I-302)+(1.021)+(5.012), (I-302)+(1.021)+(5.013), (I-302)+(1.021)+(5.014), (I-302)+(1.021)+(5.015), (I-302)+(1.021)+(5.016), (I-302)+(1.021)+(5.017), (I-302)+(1.021)+(5.018), (I-302)+(1.021)+(5.019), (I-302)+(1.021)+(5.020), (I-302)+(1.021)+(5.021), (I-302)+(1.021)+(5.022), (I-302)+(1.021)+(5.023), (I-302)+(1.021)+(6.001), (I-302)+(1.021)+(6.002), (I-302)+(1.021)+(6.003), (I-302)+(1.021)+(6.004), (I-302)+(1.021)+(7.001), (I-302)+(1.021)+(7.002), (I-302)+(1.021)+(7.003), (I-302)+(1.021)+(7.004), (I-302)+(1.021)+(7.005), (I-302)+(1.021)+(7.006), (I-302)+(1.021)+(9.001), (I-302)+(1.021)+(9.002), (I-302)+(1.021)+(9.003), (I-302)+(1.021)+(9.004), (I-302)+(1.021)+(9.005), (I-302)+(1.021)+(9.006), (I-302)+(1.021)+(9.007), (I-302)+(1.021)+(9.008), (I-302)+(1.021)+(9.009), (I-302)+(1.021)+(14.001), (I-302)+(1.021)+(14.002), (I-302)+(1.021)+(15.008), (I-302)+(1.021)+(15.011), (I-302)+(1.021)+(15.012), (I-302)+(1.021)+(15.016), (I-302)+(1.021)+(15.025), (I-302)+(1.021)+(15.027), (I-302)+(1.021)+(15.047), (I-302)+(1.021)+(15.063), (I-302)+(1.021)+(15.064), (I-302)+(1.021)+(16.001), (I-302)+(1.021)+(16.002), (I-302)+(1.021)+(16.003), (I-302)+(1.021)+(16.004), (I-302)+(1.021)+(16.005), (I-302)+(1.021)+(16.006), (I-302)+(1.021)+(16.007), (I-302)+(1.021)+(16.008), (I-302)+(1.021)+(17.001), (I-302)+(1.021)+(17.002), (I-302)+(1.021)+(17.003), (I-302)+(1.021)+(17.004), (I-302)+(1.021)+(17.005), (I-302)+(1.021)+(17.006), (I-302)+(1.021)+(17.007), (I-302)+(1.021)+(17.008), (I-302)+(1.021)+(17.009), (I-302)+(1.021)+(17.010), (I-302)+(1.021)+(17.011), (I-302)+(1.021)+(17.012), (I-302)+(1.021)+(18.001), (I-302)+(1.022)+(1.023), (I-302)+(1.022)+(1.024), (I-302)+(1.022)+(1.025), (I-302)+(1.022)+(1.026), (I-302)+(1.022)+(1.027), (I-302)+(1.022)+(1.028), (I-302)+(1.022)+(1.029), (I-302)+(1.022)+(1.030), (I-302)+(1.022)+(1.031), (I-302)+(1.022)+(1.032), (I-302)+(1.022)+(1.033), (I-302)+(1.022)+(1.034), (I-302)+(1.022)+(1.035), (I-302)+(1.022)+(1.036), (I-302)+(1.022)+(1.037), (I-302)+(1.022)+(1.038), (I-302)+(1.022)+(1.039), (I-302)+(1.022)+(1.040), (I-302)+(1.022)+(1.041), (I-302)+(1.022)+(1.042), (I-302)+(1.022)+(1.043), (I-302)+(1.022)+(1.044), (I-302)+(1.022)+(1.045), (I-302)+(1.022)+(1.046), (I-302)+(1.022)+(1.047), (I-302)+(1.022)+(1.048), (I-302)+(1.022)+(1.049), (I-302)+(1.022)+(1.050), (I-302)+(1.022)+(1.051), (I-302)+(1.022)+(1.052), (I-302)+(1.022)+(1.053), (I-302)+(1.022)+(1.054), (I-302)+(1.022)+(1.055), (I-302)+(1.022)+(1.056), (I-302)+(1.022)+(1.057), (I-302)+(1.022)+(1.058), (I-302)+(1.022)+(1.059), (I-302)+(1.022)+(1.060), (I-302)+(1.022)+(1.061), (I-302)+(1.022)+(1.062), (I-302)+(1.022)+(1.063), (I-302)+(1.022)+(1.064), (I-302)+(1.022)+(1.065), (I-302)+(1.022)+(1.066), (I-302)+(1.022)+(1.067), (I-302)+(1.022)+(1.068), (I-302)+(1.022)+(1.069), (I-302)+(1.022)+(1.070), (I-302)+(1.022)+(1.071), (I-302)+(1.022)+(1.072), (I-302)+(1.022)+(1.073), (I-302)+(1.022)+(1.074), (I-302)+(1.022)+(1.075), (I-302)+(1.022)+(1.076), (I-302)+(1.022)+(1.077), (I-302)+(1.022)+(1.078), (I-302)+(1.022)+(1.079), (I-302)+(1.022)+(1.080), (I-302)+(1.022)+(1.081), (I-302)+(1.022)+(1.082), (I-302)+(1.022)+(1.083), (I-302)+(1.022)+(1.084), (I-302)+(1.022)+(1.085), (I-302)+(1.022)+(1.086), (I-302)+(1.022)+(1.087), (I-302)+(1.022)+(1.088), (I-302)+(1.022)+(1.089), (I-302)+(1.022)+(1.090), (I-302)+(1.022)+(1.091), (I-302)+(1.022)+(1.092), (I-302)+(1.022)+(2.001), (I-302)+(1.022)+(2.002), (I-302)+(1.022)+(2.003), (I-302)+(1.022)+(2.004), (I-302)+(1.022)+(2.005), (I-302)+(1.022)+(2.006), (I-302)+(1.022)+(2.007), (I-302)+(1.022)+(2.008), (I-302)+(1.022)+(2.009), (I-302)+(1.022)+(2.010), (I-302)+(1.022)+(2.011), (I-302)+(1.022)+(2.012), (I-302)+(1.022)+(2.013), (I-302)+(1.022)+(2.014), (I-302)+(1.022)+(2.015), (I-302)+(1.022)+(2.016), (I-302)+(1.022)+(2.017), (I-302)+(1.022)+(2.018), (I-302)+(1.022)+(2.019), (I-302)+(1.022)+(2.020), (I-302)+(1.022)+(2.021), (I-302)+(1.022)+(2.022), (I-302)+(1.022)+(2.023), (I-302)+(1.022)+(2.024), (I-302)+(1.022)+(2.025), (I-302)+(1.022)+(2.026), (I-302)+(1.022)+(2.027), (I-302)+(1.022)+(2.028), (I-302)+(1.022)+(2.029), (I-302)+(1.022)+(2.030), (I-302)+(1.022)+(2.031), (I-302)+(1.022)+(2.032), (I-302)+(1.022)+(2.033), (I-302)+(1.022)+(2.034), (I-302)+(1.022)+(2.035), (I-302)+(1.022)+(2.036), (I-302)+(1.022)+(2.037), (I-302)+(1.022)+(2.038), (I-302)+(1.022)+(2.039), (I-302)+(1.022)+(2.040), (I-302)+(1.022)+(2.041), (I-302)+(1.022)+(2.042), (I-302)+(1.022)+(2.043), (I-302)+(1.022)+(2.044), (I-302)+(1.022)+(2.045), (I-302)+(1.022)+(2.046), (I-302)+(1.022)+(2.047), (I-302)+(1.022)+(2.048), (I-302)+(1.022)+(2.049), (I-302)+(1.022)+(2.050), (I-302)+(1.022)+(2.051), (I-302)+(1.022)+(2.052), (I-302)+(1.022)+(2.053), (I-302)+(1.022)+(2.054), (I-302)+(1.022)+(2.055), (I-302)+(1.022)+(2.056), (I-302)+(1.022)+(2.057), (I-302)+(1.022)+(2.058), (I-302)+(1.022)+(2.059), (I-302)+(1.022)+(3.001), (I-302)+(1.022)+(3.002), (I-302)+(1.022)+(3.003), (I-302)+(1.022)+(3.004), (I-302)+(1.022)+(3.005), (I-302)+(1.022)+(3.006), (I-302)+(1.022)+(3.007), (I-302)+(1.022)+(3.008), (I-302)+(1.022)+(3.009), (I-302)+(1.022)+(3.010), (I-302)+(1.022)+(3.011), (I-302)+(1.022)+(3.012), (I-302)+(1.022)+(3.013), (I-302)+(1.022)+(3.014), (I-302)+(1.022)+(3.015), (I-302)+(1.022)+(3.016), (I-302)+(1.022)+(3.017), (I-302)+(1.022)+(3.018), (I-302)+(1.022)+(3.019), (I-302)+(1.022)+(3.020), (I-302)+(1.022)+(3.021), (I-302)+(1.022)+(3.022), (I-302)+(1.022)+(3.023), (I-302)+(1.022)+(3.024), (I-302)+(1.022)+(3.025), (I-302)+(1.022)+(3.026), (I-302)+(1.022)+(3.027), (I-302)+(1.022)+(3.028), (I-302)+(1.022)+(3.029), (I-302)+(1.022)+(3.030), (I-302)+(1.022)+(3.031), (I-302)+(1.022)+(5.001), (I-302)+(1.022)+(5.002), (I-302)+(1.022)+(5.003), (I-302)+(1.022)+(5.004), (I-302)+(1.022)+(5.005), (I-302)+(1.022)+(5.006), (I-302)+(1.022)+(5.007), (I-302)+(1.022)+(5.008), (I-302)+(1.022)+(5.009), (I-302)+(1.022)+(5.010), (I-302)+(1.022)+(5.011), (I-302)+(1.022)+(5.012), (I-302)+(1.022)+(5.013), (I-302)+(1.022)+(5.014), (I-302)+(1.022)+(5.015), (I-302)+(1.022)+(5.016), (I-302)+(1.022)+(5.017), (I-302)+(1.022)+(5.018), (I-302)+(1.022)+(5.019), (I-302)+(1.022)+(5.020), (I-302)+(1.022)+(5.021), (I-302)+(1.022)+(5.022), (I-302)+(1.022)+(5.023), (I-302)+(1.022)+(6.001), (I-302)+(1.022)+(6.002), (I-302)+(1.022)+(6.003), (I-302)+(1.022)+(6.004), (I-302)+(1.022)+(7.001), (I-302)+(1.022)+(7.002), (I-302)+(1.022)+(7.003), (I-302)+(1.022)+(7.004), (I-302)+(1.022)+(7.005), (I-302)+(1.022)+(7.006), (I-302)+(1.022)+(9.001), (I-302)+(1.022)+(9.002), (I-302)+(1.022)+(9.003), (I-302)+(1.022)+(9.004), (I-302)+(1.022)+(9.005), (I-302)+(1.022)+(9.006), (I-302)+(1.022)+(9.007), (I-302)+(1.022)+(9.008), (I-302)+(1.022)+(9.009), (I-302)+(1.022)+(14.001), (I-302)+(1.022)+(14.002), (I-302)+(1.022)+(15.008), (I-302)+(1.022)+(15.011), (I-302)+(1.022)+(15.012), (I-302)+(1.022)+(15.016), (I-302)+(1.022)+(15.025), (I-302)+(1.022)+(15.027), (I-302)+(1.022)+(15.047), (I-302)+(1.022)+(15.063), (I-302)+(1.022)+(15.064), (I-302)+(1.022)+(16.001), (I-302)+(1.022)+(16.002), (I-302)+(1.022)+(16.003), (I-302)+(1.022)+(16.004), (I-302)+(1.022)+(16.005), (I-302)+(1.022)+(16.006), (I-302)+(1.022)+(16.007), (I-302)+(1.022)+(16.008), (I-302)+(1.022)+(17.001), (I-302)+(1.022)+(17.002), (I-302)+(1.022)+(17.003), (I-302)+(1.022)+(17.004), (I-302)+(1.022)+(17.005), (I-302)+(1.022)+(17.006), (I-302)+(1.022)+(17.007), (I-302)+(1.022)+(17.008), (I-302)+(1.022)+(17.009), (I-302)+(1.022)+(17.010), (I-302)+(1.022)+(17.011), (I-302)+(1.022)+(17.012), (I-302)+(1.022)+(18.001), (I-302)+(1.023)+(1.024), (I-302)+(1.023)+(1.025), (I-302)+(1.023)+(1.026), (I-302)+(1.023)+(1.027), (I-302)+(1.023)+(1.028), (I-302)+(1.023)+(1.029), (I-302)+(1.023)+(1.030), (I-302)+(1.023)+(1.031), (I-302)+(1.023)+(1.032), (I-302)+(1.023)+(1.033), (I-302)+(1.023)+(1.034), (I-302)+(1.023)+(1.035), (I-302)+(1.023)+(1.036), (I-302)+(1.023)+(1.037), (I-302)+(1.023)+(1.038), (I-302)+(1.023)+(1.039), (I-302)+(1.023)+(1.040), (I-302)+(1.023)+(1.041), (I-302)+(1.023)+(1.042), (I-302)+(1.023)+(1.043), (I-302)+(1.023)+(1.044), (I-302)+(1.023)+(1.045), (I-302)+(1.023)+(1.046), (I-302)+(1.023)+(1.047), (I-302)+(1.023)+(1.048), (I-302)+(1.023)+(1.049), (I-302)+(1.023)+(1.050), (I-302)+(1.023)+(1.051), (I-302)+(1.023)+(1.052), (I-302)+(1.023)+(1.053), (I-302)+(1.023)+(1.054), (I-302)+(1.023)+(1.055), (I-302)+(1.023)+(1.056), (I-302)+(1.023)+(1.057), (I-302)+(1.023)+(1.058), (I-302)+(1.023)+(1.059), (I-302)+(1.023)+(1.060), (I-302)+(1.023)+(1.061), (I-302)+(1.023)+(1.062), (I-302)+(1.023)+(1.063), (I-302)+(1.023)+(1.064), (I-302)+(1.023)+(1.065), (I-302)+(1.023)+(1.066), (I-302)+(1.023)+(1.067), (I-302)+(1.023)+(1.068), (I-302)+(1.023)+(1.069), (I-302)+(1.023)+(1.070), (I-302)+(1.023)+(1.071), (I-302)+(1.023)+(1.072), (I-302)+(1.023)+(1.073), (I-302)+(1.023)+(1.074), (I-302)+(1.023)+(1.075), (I-302)+(1.023)+(1.076), (I-302)+(1.023)+(1.077), (I-302)+(1.023)+(1.078), (I-302)+(1.023)+(1.079), (I-302)+(1.023)+(1.080), (I-302)+(1.023)+(1.081), (I-302)+(1.023)+(1.082), (I-302)+(1.023)+(1.083), (I-302)+(1.023)+(1.084), (I-302)+(1.023)+(1.085), (I-302)+(1.023)+(1.086), (I-302)+(1.023)+(1.087), (I-302)+(1.023)+(1.088), (I-302)+(1.023)+(1.089), (I-302)+(1.023)+(1.090), (I-302)+(1.023)+(1.091), (I-302)+(1.023)+(1.092), (I-302)+(1.023)+(2.001), (I-302)+(1.023)+(2.002), (I-302)+(1.023)+(2.003), (I-302)+(1.023)+(2.004), (I-302)+(1.023)+(2.005), (I-302)+(1.023)+(2.006), (I-302)+(1.023)+(2.007), (I-302)+(1.023)+(2.008), (I-302)+(1.023)+(2.009), (I-302)+(1.023)+(2.010), (I-302)+(1.023)+(2.011), (I-302)+(1.023)+(2.012), (I-302)+(1.023)+(2.013), (I-302)+(1.023)+(2.014), (I-302)+(1.023)+(2.015), (I-302)+(1.023)+(2.016), (I-302)+(1.023)+(2.017), (I-302)+(1.023)+(2.018), (I-302)+(1.023)+(2.019), (I-302)+(1.023)+(2.020), (I-302)+(1.023)+(2.021), (I-302)+(1.023)+(2.022), (I-302)+(1.023)+(2.023), (I-302)+(1.023)+(2.024), (I-302)+(1.023)+(2.025), (I-302)+(1.023)+(2.026), (I-302)+(1.023)+(2.027), (I-302)+(1.023)+(2.028), (I-302)+(1.023)+(2.029), (I-302)+(1.023)+(2.030), (I-302)+(1.023)+(2.031), (I-302)+(1.023)+(2.032), (I-302)+(1.023)+(2.033), (I-302)+(1.023)+(2.034), (I-302)+(1.023)+(2.035), (I-302)+(1.023)+(2.036), (I-302)+(1.023)+(2.037), (I-302)+(1.023)+(2.038), (I-302)+(1.023)+(2.039), (I-302)+(1.023)+(2.040), (I-302)+(1.023)+(2.041), (I-302)+(1.023)+(2.042), (I-302)+(1.023)+(2.043), (I-302)+(1.023)+(2.044), (I-302)+(1.023)+(2.045), (I-302)+(1.023)+(2.046), (I-302)+(1.023)+(2.047), (I-302)+(1.023)+(2.048), (I-302)+(1.023)+(2.049), (I-302)+(1.023)+(2.050), (I-302)+(1.023)+(2.051), (I-302)+(1.023)+(2.052), (I-302)+(1.023)+(2.053), (I-302)+(1.023)+(2.054), (I-302)+(1.023)+(2.055), (I-302)+(1.023)+(2.056), (I-302)+(1.023)+(2.057), (I-302)+(1.023)+(2.058), (I-302)+(1.023)+(2.059), (I-302)+(1.023)+(3.001), (I-302)+(1.023)+(3.002), (I-302)+(1.023)+(3.003), (I-302)+(1.023)+(3.004), (I-302)+(1.023)+(3.005), (I-302)+(1.023)+(3.006), (I-302)+(1.023)+(3.007), (I-302)+(1.023)+(3.008), (I-302)+(1.023)+(3.009), (I-302)+(1.023)+(3.010), (I-302)+(1.023)+(3.011), (I-302)+(1.023)+(3.012), (I-302)+(1.023)+(3.013), (I-302)+(1.023)+(3.014), (I-302)+(1.023)+(3.015), (I-302)+(1.023)+(3.016), (I-302)+(1.023)+(3.017), (I-302)+(1.023)+(3.018), (I-302)+(1.023)+(3.019), (I-302)+(1.023)+(3.020), (I-302)+(1.023)+(3.021), (I-302)+(1.023)+(3.022), (I-302)+(1.023)+(3.023), (I-302)+(1.023)+(3.024), (I-302)+(1.023)+(3.025), (I-302)+(1.023)+(3.026), (I-302)+(1.023)+(3.027), (I-302)+(1.023)+(3.028), (I-302)+(1.023)+(3.029), (I-302)+(1.023)+(3.030), (I-302)+(1.023)+(3.031), (I-302)+(1.023)+(5.001), (I-302)+(1.023)+(5.002), (I-302)+(1.023)+(5.003), (I-302)+(1.023)+(5.004), (I-302)+(1.023)+(5.005), (I-302)+(1.023)+(5.006), (I-302)+(1.023)+(5.007), (I-302)+(1.023)+(5.008), (I-302)+(1.023)+(5.009), (I-302)+(1.023)+(5.010), (I-302)+(1.023)+(5.011), (I-302)+(1.023)+(5.012), (I-302)+(1.023)+(5.013), (I-302)+(1.023)+(5.014), (I-302)+(1.023)+(5.015), (I-302)+(1.023)+(5.016), (I-302)+(1.023)+(5.017), (I-302)+(1.023)+(5.018), (I-302)+(1.023)+(5.019), (I-302)+(1.023)+(5.020), (I-302)+(1.023)+(5.021), (I-302)+(1.023)+(5.022), (I-302)+(1.023)+(5.023), (I-302)+(1.023)+(6.001), (I-302)+(1.023)+(6.002), (I-302)+(1.023)+(6.003), (I-302)+(1.023)+(6.004), (I-302)+(1.023)+(7.001), (I-302)+(1.023)+(7.002), (I-302)+(1.023)+(7.003), (I-302)+(1.023)+(7.004), (I-302)+(1.023)+(7.005), (I-302)+(1.023)+(7.006), (I-302)+(1.023)+(9.001), (I-302)+(1.023)+(9.002), (I-302)+(1.023)+(9.003), (I-302)+(1.023)+(9.004), (I-302)+(1.023)+(9.005), (I-302)+(1.023)+(9.006), (I-302)+(1.023)+(9.007), (I-302)+(1.023)+(9.008), (I-302)+(1.023)+(9.009), (I-302)+(1.023)+(14.001), (I-302)+(1.023)+(14.002), (I-302)+(1.023)+(15.008), (I-302)+(1.023)+(15.011), (I-302)+(1.023)+(15.012), (I-302)+(1.023)+(15.016), (I-302)+(1.023)+(15.025), (I-302)+(1.023)+(15.027), (I-302)+(1.023)+(15.047), (I-302)+(1.023)+(15.063), (I-302)+(1.023)+(15.064), (I-302)+(1.023)+(16.001), (I-302)+(1.023)+(16.002), (I-302)+(1.023)+(16.003), (I-302)+(1.023)+(16.004), (I-302)+(1.023)+(16.005), (I-302)+(1.023)+(16.006), (I-302)+(1.023)+(16.007), (I-302)+(1.023)+(16.008), (I-302)+(1.023)+(17.001), (I-302)+(1.023)+(17.002), (I-302)+(1.023)+(17.003), (I-302)+(1.023)+(17.004), (I-302)+(1.023)+(17.005), (I-302)+(1.023)+(17.006), (I-302)+(1.023)+(17.007), (I-302)+(1.023)+(17.008), (I-302)+(1.023)+(17.009), (I-302)+(1.023)+(17.010), (I-302)+(1.023)+(17.011), (I-302)+(1.023)+(17.012), (I-302)+(1.023)+(18.001), (I-302)+(1.024)+(1.025), (I-302)+(1.024)+(1.026), (I-302)+(1.024)+(1.027), (I-302)+(1.024)+(1.028), (I-302)+(1.024)+(1.029), (I-302)+(1.024)+(1.030), (I-302)+(1.024)+(1.031), (I-302)+(1.024)+(1.032), (I-302)+(1.024)+(1.033), (I-302)+(1.024)+(1.034), (I-302)+(1.024)+(1.035), (I-302)+(1.024)+(1.036), (I-302)+(1.024)+(1.037), (I-302)+(1.024)+(1.038), (I-302)+(1.024)+(1.039), (I-302)+(1.024)+(1.040), (I-302)+(1.024)+(1.041), (I-302)+(1.024)+(1.042), (I-302)+(1.024)+(1.043), (I-302)+(1.024)+(1.044), (I-302)+(1.024)+(1.045), (I-302)+(1.024)+(1.046), (I-302)+(1.024)+(1.047), (I-302)+(1.024)+(1.048), (I-302)+(1.024)+(1.049), (I-302)+(1.024)+(1.050), (I-302)+(1.024)+(1.051), (I-302)+(1.024)+(1.052), (I-302)+(1.024)+(1.053), (I-302)+(1.024)+(1.054), (I-302)+(1.024)+(1.055), (I-302)+(1.024)+(1.056), (I-302)+(1.024)+(1.057), (I-302)+(1.024)+(1.058), (I-302)+(1.024)+(1.059), (I-302)+(1.024)+(1.060), (I-302)+(1.024)+(1.061), (I-302)+(1.024)+(1.062), (I-302)+(1.024)+(1.063), (I-302)+(1.024)+(1.064), (I-302)+(1.024)+(1.065), (I-302)+(1.024)+(1.066), (I-302)+(1.024)+(1.067), (I-302)+(1.024)+(1.068), (I-302)+(1.024)+(1.069), (I-302)+(1.024)+(1.070), (I-302)+(1.024)+(1.071), (I-302)+(1.024)+(1.072), (I-302)+(1.024)+(1.073), (I-302)+(1.024)+(1.074), (I-302)+(1.024)+(1.075), (I-302)+(1.024)+(1.076), (I-302)+(1.024)+(1.077), (I-302)+(1.024)+(1.078), (I-302)+(1.024)+(1.079), (I-302)+(1.024)+(1.080), (I-302)+(1.024)+(1.081), (I-302)+(1.024)+(1.082), (I-302)+(1.024)+(1.083), (I-302)+(1.024)+(1.084), (I-302)+(1.024)+(1.085), (I-302)+(1.024)+(1.086), (I-302)+(1.024)+(1.087), (I-302)+(1.024)+(1.088), (I-302)+(1.024)+(1.089), (I-302)+(1.024)+(1.090), (I-302)+(1.024)+(1.091), (I-302)+(1.024)+(1.092), (I-302)+(1.024)+(2.001), (I-302)+(1.024)+(2.002), (I-302)+(1.024)+(2.003), (I-302)+(1.024)+(2.004), (I-302)+(1.024)+(2.005), (I-302)+(1.024)+(2.006), (I-302)+(1.024)+(2.007), (I-302)+(1.024)+(2.008), (I-302)+(1.024)+(2.009), (I-302)+(1.024)+(2.010), (I-302)+(1.024)+(2.011), (I-302)+(1.024)+(2.012), (I-302)+(1.024)+(2.013), (I-302)+(1.024)+(2.014), (I-302)+(1.024)+(2.015), (I-302)+(1.024)+(2.016), (I-302)+(1.024)+(2.017), (I-302)+(1.024)+(2.018), (I-302)+(1.024)+(2.019), (I-302)+(1.024)+(2.020), (I-302)+(1.024)+(2.021), (I-302)+(1.024)+(2.022), (I-302)+(1.024)+(2.023), (I-302)+(1.024)+(2.024), (I-302)+(1.024)+(2.025), (I-302)+(1.024)+(2.026), (I-302)+(1.024)+(2.027), (I-302)+(1.024)+(2.028), (I-302)+(1.024)+(2.029), (I-302)+(1.024)+(2.030), (I-302)+(1.024)+(2.031), (I-302)+(1.024)+(2.032), (I-302)+(1.024)+(2.033), (I-302)+(1.024)+(2.034), (I-302)+(1.024)+(2.035), (I-302)+(1.024)+(2.036), (I-302)+(1.024)+(2.037), (I-302)+(1.024)+(2.038), (I-302)+(1.024)+(2.039), (I-302)+(1.024)+(2.040), (I-302)+(1.024)+(2.041), (I-302)+(1.024)+(2.042), (I-302)+(1.024)+(2.043), (I-302)+(1.024)+(2.044), (I-302)+(1.024)+(2.045), (I-302)+(1.024)+(2.046), (I-302)+(1.024)+(2.047), (I-302)+(1.024)+(2.048), (I-302)+(1.024)+(2.049), (I-302)+(1.024)+(2.050), (I-302)+(1.024)+(2.051), (I-302)+(1.024)+(2.052), (I-302)+(1.024)+(2.053), (I-302)+(1.024)+(2.054), (I-302)+(1.024)+(2.055), (I-302)+(1.024)+(2.056), (I-302)+(1.024)+(2.057), (I-302)+(1.024)+(2.058), (I-302)+(1.024)+(2.059), (I-302)+(1.024)+(3.001), (I-302)+(1.024)+(3.002), (I-302)+(1.024)+(3.003), (I-302)+(1.024)+(3.004), (I-302)+(1.024)+(3.005), (I-302)+(1.024)+(3.006), (I-302)+(1.024)+(3.007), (I-302)+(1.024)+(3.008), (I-302)+(1.024)+(3.009), (I-302)+(1.024)+(3.010), (I-302)+(1.024)+(3.011), (I-302)+(1.024)+(3.012), (I-302)+(1.024)+(3.013), (I-302)+(1.024)+(3.014), (I-302)+(1.024)+(3.015), (I-302)+(1.024)+(3.016), (I-302)+(1.024)+(3.017), (I-302)+(1.024)+(3.018), (I-302)+(1.024)+(3.019), (I-302)+(1.024)+(3.020), (I-302)+(1.024)+(3.021), (I-302)+(1.024)+(3.022), (I-302)+(1.024)+(3.023), (I-302)+(1.024)+(3.024), (I-302)+(1.024)+(3.025), (I-302)+(1.024)+(3.026), (I-302)+(1.024)+(3.027), (I-302)+(1.024)+(3.028), (I-302)+(1.024)+(3.029), (I-302)+(1.024)+(3.030), (I-302)+(1.024)+(3.031), (I-302)+(1.024)+(5.001), (I-302)+(1.024)+(5.002), (I-302)+(1.024)+(5.003), (I-302)+(1.024)+(5.004), (I-302)+(1.024)+(5.005), (I-302)+(1.024)+(5.006), (I-302)+(1.024)+(5.007), (I-302)+(1.024)+(5.008), (I-302)+(1.024)+(5.009), (I-302)+(1.024)+(5.010), (I-302)+(1.024)+(5.011), (I-302)+(1.024)+(5.012), (I-302)+(1.024)+(5.013), (I-302)+(1.024)+(5.014), (I-302)+(1.024)+(5.015), (I-302)+(1.024)+(5.016), (I-302)+(1.024)+(5.017), (I-302)+(1.024)+(5.018), (I-302)+(1.024)+(5.019), (I-302)+(1.024)+(5.020), (I-302)+(1.024)+(5.021), (I-302)+(1.024)+(5.022), (I-302)+(1.024)+(5.023), (I-302)+(1.024)+(6.001), (I-302)+(1.024)+(6.002), (I-302)+(1.024)+(6.003), (I-302)+(1.024)+(6.004), (I-302)+(1.024)+(7.001), (I-302)+(1.024)+(7.002), (I-302)+(1.024)+(7.003), (I-302)+(1.024)+(7.004), (I-302)+(1.024)+(7.005), (I-302)+(1.024)+(7.006), (I-302)+(1.024)+(9.001), (I-302)+(1.024)+(9.002), (I-302)+(1.024)+(9.003), (I-302)+(1.024)+(9.004), (I-302)+(1.024)+(9.005), (I-302)+(1.024)+(9.006), (I-302)+(1.024)+(9.007), (I-302)+(1.024)+(9.008), (I-302)+(1.024)+(9.009), (I-302)+(1.024)+(14.001), (I-302)+(1.024)+(14.002), (I-302)+(1.024)+(15.008), (I-302)+(1.024)+(15.011), (I-302)+(1.024)+(15.012), (I-302)+(1.024)+(15.016), (I-302)+(1.024)+(15.025), (I-302)+(1.024)+(15.027), (I-302)+(1.024)+(15.047), (I-302)+(1.024)+(15.063), (I-302)+(1.024)+(15.064), (I-302)+(1.024)+(16.001), (I-302)+(1.024)+(16.002), (I-302)+(1.024)+(16.003), (I-302)+(1.024)+(16.004), (I-302)+(1.024)+(16.005), (I-302)+(1.024)+(16.006), (I-302)+(1.024)+(16.007), (I-302)+(1.024)+(16.008), (I-302)+(1.024)+(17.001), (I-302)+(1.024)+(17.002), (I-302)+(1.024)+(17.003), (I-302)+(1.024)+(17.004), (I-302)+(1.024)+(17.005), (I-302)+(1.024)+(17.006), (I-302)+(1.024)+(17.007), (I-302)+(1.024)+(17.008), (I-302)+(1.024)+(17.009), (I-302)+(1.024)+(17.010), (I-302)+(1.024)+(17.011), (I-302)+(1.024)+(17.012), (I-302)+(1.024)+(18.001), (I-302)+(1.025)+(1.026), (I-302)+(1.025)+(1.027), (I-302)+(1.025)+(1.028), (I-302)+(1.025)+(1.029), (I-302)+(1.025)+(1.030), (I-302)+(1.025)+(1.031), (I-302)+(1.025)+(1.032), (I-302)+(1.025)+(1.033), (I-302)+(1.025)+(1.034), (I-302)+(1.025)+(1.035), (I-302)+(1.025)+(1.036), (I-302)+(1.025)+(1.037), (I-302)+(1.025)+(1.038), (I-302)+(1.025)+(1.039), (I-302)+(1.025)+(1.040), (I-302)+(1.025)+(1.041), (I-302)+(1.025)+(1.042), (I-302)+(1.025)+(1.043), (I-302)+(1.025)+(1.044), (I-302)+(1.025)+(1.045), (I-302)+(1.025)+(1.046), (I-302)+(1.025)+(1.047), (I-302)+(1.025)+(1.048), (I-302)+(1.025)+(1.049), (I-302)+(1.025)+(1.050), (I-302)+(1.025)+(1.051), (I-302)+(1.025)+(1.052), (I-302)+(1.025)+(1.053), (I-302)+(1.025)+(1.054), (I-302)+(1.025)+(1.055), (I-302)+(1.025)+(1.056), (I-302)+(1.025)+(1.057), (I-302)+(1.025)+(1.058), (I-302)+(1.025)+(1.059), (I-302)+(1.025)+(1.060), (I-302)+(1.025)+(1.061), (I-302)+(1.025)+(1.062), (I-302)+(1.025)+(1.063), (I-302)+(1.025)+(1.064), (I-302)+(1.025)+(1.065), (I-302)+(1.025)+(1.066), (I-302)+(1.025)+(1.067), (I-302)+(1.025)+(1.068), (I-302)+(1.025)+(1.069), (I-302)+(1.025)+(1.070), (I-302)+(1.025)+(1.071), (I-302)+(1.025)+(1.072), (I-302)+(1.025)+(1.073), (I-302)+(1.025)+(1.074), (I-302)+(1.025)+(1.075), (I-302)+(1.025)+(1.076), (I-302)+(1.025)+(1.077), (I-302)+(1.025)+(1.078), (I-302)+(1.025)+(1.079), (I-302)+(1.025)+(1.080), (I-302)+(1.025)+(1.081), (I-302)+(1.025)+(1.082), (I-302)+(1.025)+(1.083), (I-302)+(1.025)+(1.084), (I-302)+(1.025)+(1.085), (I-302)+(1.025)+(1.086), (I-302)+(1.025)+(1.087), (I-302)+(1.025)+(1.088), (I-302)+(1.025)+(1.089), (I-302)+(1.025)+(1.090), (I-302)+(1.025)+(1.091), (I-302)+(1.025)+(1.092), (I-302)+(1.025)+(2.001), (I-302)+(1.025)+(2.002), (I-302)+(1.025)+(2.003), (I-302)+(1.025)+(2.004), (I-302)+(1.025)+(2.005), (I-302)+(1.025)+(2.006), (I-302)+(1.025)+(2.007), (I-302)+(1.025)+(2.008), (I-302)+(1.025)+(2.009), (I-302)+(1.025)+(2.010), (I-302)+(1.025)+(2.011), (I-302)+(1.025)+(2.012), (I-302)+(1.025)+(2.013), (I-302)+(1.025)+(2.014), (I-302)+(1.025)+(2.015), (I-302)+(1.025)+(2.016), (I-302)+(1.025)+(2.017), (I-302)+(1.025)+(2.018), (I-302)+(1.025)+(2.019), (I-302)+(1.025)+(2.020), (I-302)+(1.025)+(2.021), (I-302)+(1.025)+(2.022), (I-302)+(1.025)+(2.023), (I-302)+(1.025)+(2.024), (I-302)+(1.025)+(2.025), (I-302)+(1.025)+(2.026), (I-302)+(1.025)+(2.027), (I-302)+(1.025)+(2.028), (I-302)+(1.025)+(2.029), (I-302)+(1.025)+(2.030), (I-302)+(1.025)+(2.031), (I-302)+(1.025)+(2.032), (I-302)+(1.025)+(2.033), (I-302)+(1.025)+(2.034), (I-302)+(1.025)+(2.035), (I-302)+(1.025)+(2.036), (I-302)+(1.025)+(2.037), (I-302)+(1.025)+(2.038), (I-302)+(1.025)+(2.039), (I-302)+(1.025)+(2.040), (I-302)+(1.025)+(2.041), (I-302)+(1.025)+(2.042), (I-302)+(1.025)+(2.043), (I-302)+(1.025)+(2.044), (I-302)+(1.025)+(2.045), (I-302)+(1.025)+(2.046), (I-302)+(1.025)+(2.047), (I-302)+(1.025)+(2.048), (I-302)+(1.025)+(2.049), (I-302)+(1.025)+(2.050), (I-302)+(1.025)+(2.051), (I-302)+(1.025)+(2.052), (I-302)+(1.025)+(2.053), (I-302)+(1.025)+(2.054), (I-302)+(1.025)+(2.055), (I-302)+(1.025)+(2.056), (I-302)+(1.025)+(2.057), (I-302)+(1.025)+(2.058), (I-302)+(1.025)+(2.059), (I-302)+(1.025)+(3.001), (I-302)+(1.025)+(3.002), (I-302)+(1.025)+(3.003), (I-302)+(1.025)+(3.004), (I-302)+(1.025)+(3.005), (I-302)+(1.025)+(3.006), (I-302)+(1.025)+(3.007), (I-302)+(1.025)+(3.008), (I-302)+(1.025)+(3.009), (I-302)+(1.025)+(3.010), (I-302)+(1.025)+(3.011), (I-302)+(1.025)+(3.012), (I-302)+(1.025)+(3.013), (I-302)+(1.025)+(3.014), (I-302)+(1.025)+(3.015), (I-302)+(1.025)+(3.016), (I-302)+(1.025)+(3.017), (I-302)+(1.025)+(3.018), (I-302)+(1.025)+(3.019), (I-302)+(1.025)+(3.020), (I-302)+(1.025)+(3.021), (I-302)+(1.025)+(3.022), (I-302)+(1.025)+(3.023), (I-302)+(1.025)+(3.024), (I-302)+(1.025)+(3.025), (I-302)+(1.025)+(3.026), (I-302)+(1.025)+(3.027), (I-302)+(1.025)+(3.028), (I-302)+(1.025)+(3.029), (I-302)+(1.025)+(3.030), (I-302)+(1.025)+(3.031), (I-302)+(1.025)+(5.001), (I-302)+(1.025)+(5.002), (I-302)+(1.025)+(5.003), (I-302)+(1.025)+(5.004), (I-302)+(1.025)+(5.005), (I-302)+(1.025)+(5.006), (I-302)+(1.025)+(5.007), (I-302)+(1.025)+(5.008), (I-302)+(1.025)+(5.009), (I-302)+(1.025)+(5.010), (I-302)+(1.025)+(5.011), (I-302)+(1.025)+(5.012), (I-302)+(1.025)+(5.013), (I-302)+(1.025)+(5.014), (I-302)+(1.025)+(5.015), (I-302)+(1.025)+(5.016), (I-302)+(1.025)+(5.017), (I-302)+(1.025)+(5.018), (I-302)+(1.025)+(5.019), (I-302)+(1.025)+(5.020), (I-302)+(1.025)+(5.021), (I-302)+(1.025)+(5.022), (I-302)+(1.025)+(5.023), (I-302)+(1.025)+(6.001), (I-302)+(1.025)+(6.002), (I-302)+(1.025)+(6.003), (I-302)+(1.025)+(6.004), (I-302)+(1.025)+(7.001), (I-302)+(1.025)+(7.002), (I-302)+(1.025)+(7.003), (I-302)+(1.025)+(7.004), (I-302)+(1.025)+(7.005), (I-302)+(1.025)+(7.006), (I-302)+(1.025)+(9.001), (I-302)+(1.025)+(9.002), (I-302)+(1.025)+(9.003), (I-302)+(1.025)+(9.004), (I-302)+(1.025)+(9.005), (I-302)+(1.025)+(9.006), (I-302)+(1.025)+(9.007), (I-302)+(1.025)+(9.008), (I-302)+(1.025)+(9.009), (I-302)+(1.025)+(14.001), (I-302)+(1.025)+(14.002), (I-302)+(1.025)+(15.008), (I-302)+(1.025)+(15.011), (I-302)+(1.025)+(15.012), (I-302)+(1.025)+(15.016), (I-302)+(1.025)+(15.025), (I-302)+(1.025)+(15.027), (I-302)+(1.025)+(15.047), (I-302)+(1.025)+(15.063), (I-302)+(1.025)+(15.064), (I-302)+(1.025)+(16.001), (I-302)+(1.025)+(16.002), (I-302)+(1.025)+(16.003), (I-302)+(1.025)+(16.004), (I-302)+(1.025)+(16.005), (I-302)+(1.025)+(16.006), (I-302)+(1.025)+(16.007), (I-302)+(1.025)+(16.008), (I-302)+(1.025)+(17.001), (I-302)+(1.025)+(17.002), (I-302)+(1.025)+(17.003), (I-302)+(1.025)+(17.004), (I-302)+(1.025)+(17.005), (I-302)+(1.025)+(17.006), (I-302)+(1.025)+(17.007), (I-302)+(1.025)+(17.008), (I-302)+(1.025)+(17.009), (I-302)+(1.025)+(17.010), (I-302)+(1.025)+(17.011), (I-302)+(1.025)+(17.012), (I-302)+(1.025)+(18.001), (I-302)+(1.026)+(1.027), (I-302)+(1.026)+(1.028), (I-302)+(1.026)+(1.029), (I-302)+(1.026)+(1.030), (I-302)+(1.026)+(1.031), (I-302)+(1.026)+(1.032), (I-302)+(1.026)+(1.033), (I-302)+(1.026)+(1.034), (I-302)+(1.026)+(1.035), (I-302)+(1.026)+(1.036), (I-302)+(1.026)+(1.037), (I-302)+(1.026)+(1.038), (I-302)+(1.026)+(1.039), (I-302)+(1.026)+(1.040), (I-302)+(1.026)+(1.041), (I-302)+(1.026)+(1.042), (I-302)+(1.026)+(1.043), (I-302)+(1.026)+(1.044), (I-302)+(1.026)+(1.045), (I-302)+(1.026)+(1.046), (I-302)+(1.026)+(1.047), (I-302)+(1.026)+(1.048), (I-302)+(1.026)+(1.049), (I-302)+(1.026)+(1.050), (I-302)+(1.026)+(1.051), (I-302)+(1.026)+(1.052), (I-302)+(1.026)+(1.053), (I-302)+(1.026)+(1.054), (I-302)+(1.026)+(1.055), (I-302)+(1.026)+(1.056), (I-302)+(1.026)+(1.057), (I-302)+(1.026)+(1.058), (I-302)+(1.026)+(1.059), (I-302)+(1.026)+(1.060), (I-302)+(1.026)+(1.061), (I-302)+(1.026)+(1.062), (I-302)+(1.026)+(1.063), (I-302)+(1.026)+(1.064), (I-302)+(1.026)+(1.065), (I-302)+(1.026)+(1.066), (I-302)+(1.026)+(1.067), (I-302)+(1.026)+(1.068), (I-302)+(1.026)+(1.069), (I-302)+(1.026)+(1.070), (I-302)+(1.026)+(1.071), (I-302)+(1.026)+(1.072), (I-302)+(1.026)+(1.073), (I-302)+(1.026)+(1.074), (I-302)+(1.026)+(1.075), (I-302)+(1.026)+(1.076), (I-302)+(1.026)+(1.077), (I-302)+(1.026)+(1.078), (I-302)+(1.026)+(1.079), (I-302)+(1.026)+(1.080), (I-302)+(1.026)+(1.081), (I-302)+(1.026)+(1.082), (I-302)+(1.026)+(1.083), (I-302)+(1.026)+(1.084), (I-302)+(1.026)+(1.085), (I-302)+(1.026)+(1.086), (I-302)+(1.026)+(1.087), (I-302)+(1.026)+(1.088), (I-302)+(1.026)+(1.089), (I-302)+(1.026)+(1.090), (I-302)+(1.026)+(1.091), (I-302)+(1.026)+(1.092), (I-302)+(1.026)+(2.001), (I-302)+(1.026)+(2.002), (I-302)+(1.026)+(2.003), (I-302)+(1.026)+(2.004), (I-302)+(1.026)+(2.005), (I-302)+(1.026)+(2.006), (I-302)+(1.026)+(2.007), (I-302)+(1.026)+(2.008), (I-302)+(1.026)+(2.009), (I-302)+(1.026)+(2.010), (I-302)+(1.026)+(2.011), (I-302)+(1.026)+(2.012), (I-302)+(1.026)+(2.013), (I-302)+(1.026)+(2.014), (I-302)+(1.026)+(2.015), (I-302)+(1.026)+(2.016), (I-302)+(1.026)+(2.017), (I-302)+(1.026)+(2.018), (I-302)+(1.026)+(2.019), (I-302)+(1.026)+(2.020), (I-302)+(1.026)+(2.021), (I-302)+(1.026)+(2.022), (I-302)+(1.026)+(2.023), (I-302)+(1.026)+(2.024), (I-302)+(1.026)+(2.025), (I-302)+(1.026)+(2.026), (I-302)+(1.026)+(2.027), (I-302)+(1.026)+(2.028), (I-302)+(1.026)+(2.029), (I-302)+(1.026)+(2.030), (I-302)+(1.026)+(2.031), (I-302)+(1.026)+(2.032), (I-302)+(1.026)+(2.033), (I-302)+(1.026)+(2.034), (I-302)+(1.026)+(2.035), (I-302)+(1.026)+(2.036), (I-302)+(1.026)+(2.037), (I-302)+(1.026)+(2.038), (I-302)+(1.026)+(2.039), (I-302)+(1.026)+(2.040), (I-302)+(1.026)+(2.041), (I-302)+(1.026)+(2.042), (I-302)+(1.026)+(2.043), (I-302)+(1.026)+(2.044), (I-302)+(1.026)+(2.045), (I-302)+(1.026)+(2.046), (I-302)+(1.026)+(2.047), (I-302)+(1.026)+(2.048), (I-302)+(1.026)+(2.049), (I-302)+(1.026)+(2.050), (I-302)+(1.026)+(2.051), (I-302)+(1.026)+(2.052), (I-302)+(1.026)+(2.053), (I-302)+(1.026)+(2.054), (I-302)+(1.026)+(2.055), (I-302)+(1.026)+(2.056), (I-302)+(1.026)+(2.057), (I-302)+(1.026)+(2.058), (I-302)+(1.026)+(2.059), (I-302)+(1.026)+(3.001), (I-302)+(1.026)+(3.002), (I-302)+(1.026)+(3.003), (I-302)+(1.026)+(3.004), (I-302)+(1.026)+(3.005), (I-302)+(1.026)+(3.006), (I-302)+(1.026)+(3.007), (I-302)+(1.026)+(3.008), (I-302)+(1.026)+(3.009), (I-302)+(1.026)+(3.010), (I-302)+(1.026)+(3.011), (I-302)+(1.026)+(3.012), (I-302)+(1.026)+(3.013), (I-302)+(1.026)+(3.014), (I-302)+(1.026)+(3.015), (I-302)+(1.026)+(3.016), (I-302)+(1.026)+(3.017), (I-302)+(1.026)+(3.018), (I-302)+(1.026)+(3.019), (I-302)+(1.026)+(3.020), (I-302)+(1.026)+(3.021), (I-302)+(1.026)+(3.022), (I-302)+(1.026)+(3.023), (I-302)+(1.026)+(3.024), (I-302)+(1.026)+(3.025), (I-302)+(1.026)+(3.026), (I-302)+(1.026)+(3.027), (I-302)+(1.026)+(3.028), (I-302)+(1.026)+(3.029), (I-302)+(1.026)+(3.030), (I-302)+(1.026)+(3.031), (I-302)+(1.026)+(5.001), (I-302)+(1.026)+(5.002), (I-302)+(1.026)+(5.003), (I-302)+(1.026)+(5.004), (I-302)+(1.026)+(5.005), (I-302)+(1.026)+(5.006), (I-302)+(1.026)+(5.007), (I-302)+(1.026)+(5.008), (I-302)+(1.026)+(5.009), (I-302)+(1.026)+(5.010), (I-302)+(1.026)+(5.011), (I-302)+(1.026)+(5.012), (I-302)+(1.026)+(5.013), (I-302)+(1.026)+(5.014), (I-302)+(1.026)+(5.015), (I-302)+(1.026)+(5.016), (I-302)+(1.026)+(5.017), (I-302)+(1.026)+(5.018), (I-302)+(1.026)+(5.019), (I-302)+(1.026)+(5.020), (I-302)+(1.026)+(5.021), (I-302)+(1.026)+(5.022), (I-302)+(1.026)+(5.023), (I-302)+(1.026)+(6.001), (I-302)+(1.026)+(6.002), (I-302)+(1.026)+(6.003), (I-302)+(1.026)+(6.004), (I-302)+(1.026)+(7.001), (I-302)+(1.026)+(7.002), (I-302)+(1.026)+(7.003), (I-302)+(1.026)+(7.004), (I-302)+(1.026)+(7.005), (I-302)+(1.026)+(7.006), (I-302)+(1.026)+(9.001), (I-302)+(1.026)+(9.002), (I-302)+(1.026)+(9.003), (I-302)+(1.026)+(9.004), (I-302)+(1.026)+(9.005), (I-302)+(1.026)+(9.006), (I-302)+(1.026)+(9.007), (I-302)+(1.026)+(9.008), (I-302)+(1.026)+(9.009), (I-302)+(1.026)+(14.001), (I-302)+(1.026)+(14.002), (I-302)+(1.026)+(15.008), (I-302)+(1.026)+(15.011), (I-302)+(1.026)+(15.012), (I-302)+(1.026)+(15.016), (I-302)+(1.026)+(15.025), (I-302)+(1.026)+(15.027), (I-302)+(1.026)+(15.047), (I-302)+(1.026)+(15.063), (I-302)+(1.026)+(15.064), (I-302)+(1.026)+(16.001), (I-302)+(1.026)+(16.002), (I-302)+(1.026)+(16.003), (I-302)+(1.026)+(16.004), (I-302)+(1.026)+(16.005), (I-302)+(1.026)+(16.006), (I-302)+(1.026)+(16.007), (I-302)+(1.026)+(16.008), (I-302)+(1.026)+(17.001), (I-302)+(1.026)+(17.002), (I-302)+(1.026)+(17.003), (I-302)+(1.026)+(17.004), (I-302)+(1.026)+(17.005), (I-302)+(1.026)+(17.006), (I-302)+(1.026)+(17.007), (I-302)+(1.026)+(17.008), (I-302)+(1.026)+(17.009), (I-302)+(1.026)+(17.010), (I-302)+(1.026)+(17.011), (I-302)+(1.026)+(17.012), (I-302)+(1.026)+(18.001), (I-302)+(1.027)+(1.028), (I-302)+(1.027)+(1.029), (I-302)+(1.027)+(1.030), (I-302)+(1.027)+(1.031), (I-302)+(1.027)+(1.032), (I-302)+(1.027)+(1.033), (I-302)+(1.027)+(1.034), (I-302)+(1.027)+(1.035), (I-302)+(1.027)+(1.036), (I-302)+(1.027)+(1.037), (I-302)+(1.027)+(1.038), (I-302)+(1.027)+(1.039), (I-302)+(1.027)+(1.040), (I-302)+(1.027)+(1.041), (I-302)+(1.027)+(1.042), (I-302)+(1.027)+(1.043), (I-302)+(1.027)+(1.044), (I-302)+(1.027)+(1.045), (I-302)+(1.027)+(1.046), (I-302)+(1.027)+(1.047), (I-302)+(1.027)+(1.048), (I-302)+(1.027)+(1.049), (I-302)+(1.027)+(1.050), (I-302)+(1.027)+(1.051), (I-302)+(1.027)+(1.052), (I-302)+(1.027)+(1.053), (I-302)+(1.027)+(1.054), (I-302)+(1.027)+(1.055), (I-302)+(1.027)+(1.056), (I-302)+(1.027)+(1.057), (I-302)+(1.027)+(1.058), (I-302)+(1.027)+(1.059), (I-302)+(1.027)+(1.060), (I-302)+(1.027)+(1.061), (I-302)+(1.027)+(1.062), (I-302)+(1.027)+(1.063), (I-302)+(1.027)+(1.064), (I-302)+(1.027)+(1.065), (I-302)+(1.027)+(1.066), (I-302)+(1.027)+(1.067), (I-302)+(1.027)+(1.068), (I-302)+(1.027)+(1.069), (I-302)+(1.027)+(1.070), (I-302)+(1.027)+(1.071), (I-302)+(1.027)+(1.072), (I-302)+(1.027)+(1.073), (I-302)+(1.027)+(1.074), (I-302)+(1.027)+(1.075), (I-302)+(1.027)+(1.076), (I-302)+(1.027)+(1.077), (I-302)+(1.027)+(1.078), (I-302)+(1.027)+(1.079), (I-302)+(1.027)+(1.080), (I-302)+(1.027)+(1.081), (I-302)+(1.027)+(1.082), (I-302)+(1.027)+(1.083), (I-302)+(1.027)+(1.084), (I-302)+(1.027)+(1.085), (I-302)+(1.027)+(1.086), (I-302)+(1.027)+(1.087), (I-302)+(1.027)+(1.088), (I-302)+(1.027)+(1.089), (I-302)+(1.027)+(1.090), (I-302)+(1.027)+(1.091), (I-302)+(1.027)+(1.092), (I-302)+(1.027)+(2.001), (I-302)+(1.027)+(2.002), (I-302)+(1.027)+(2.003), (I-302)+(1.027)+(2.004), (I-302)+(1.027)+(2.005), (I-302)+(1.027)+(2.006), (I-302)+(1.027)+(2.007), (I-302)+(1.027)+(2.008), (I-302)+(1.027)+(2.009), (I-302)+(1.027)+(2.010), (I-302)+(1.027)+(2.011), (I-302)+(1.027)+(2.012), (I-302)+(1.027)+(2.013), (I-302)+(1.027)+(2.014), (I-302)+(1.027)+(2.015), (I-302)+(1.027)+(2.016), (I-302)+(1.027)+(2.017), (I-302)+(1.027)+(2.018), (I-302)+(1.027)+(2.019), (I-302)+(1.027)+(2.020), (I-302)+(1.027)+(2.021), (I-302)+(1.027)+(2.022), (I-302)+(1.027)+(2.023), (I-302)+(1.027)+(2.024), (I-302)+(1.027)+(2.025), (I-302)+(1.027)+(2.026), (I-302)+(1.027)+(2.027), (I-302)+(1.027)+(2.028), (I-302)+(1.027)+(2.029), (I-302)+(1.027)+(2.030), (I-302)+(1.027)+(2.031), (I-302)+(1.027)+(2.032), (I-302)+(1.027)+(2.033), (I-302)+(1.027)+(2.034), (I-302)+(1.027)+(2.035), (I-302)+(1.027)+(2.036), (I-302)+(1.027)+(2.037), (I-302)+(1.027)+(2.038), (I-302)+(1.027)+(2.039), (I-302)+(1.027)+(2.040), (I-302)+(1.027)+(2.041), (I-302)+(1.027)+(2.042), (I-302)+(1.027)+(2.043), (I-302)+(1.027)+(2.044), (I-302)+(1.027)+(2.045), (I-302)+(1.027)+(2.046), (I-302)+(1.027)+(2.047), (I-302)+(1.027)+(2.048), (I-302)+(1.027)+(2.049), (I-302)+(1.027)+(2.050), (I-302)+(1.027)+(2.051), (I-302)+(1.027)+(2.052), (I-302)+(1.027)+(2.053), (I-302)+(1.027)+(2.054), (I-302)+(1.027)+(2.055), (I-302)+(1.027)+(2.056), (I-302)+(1.027)+(2.057), (I-302)+(1.027)+(2.058), (I-302)+(1.027)+(2.059), (I-302)+(1.027)+(3.001), (I-302)+(1.027)+(3.002), (I-302)+(1.027)+(3.003), (I-302)+(1.027)+(3.004), (I-302)+(1.027)+(3.005), (I-302)+(1.027)+(3.006), (I-302)+(1.027)+(3.007), (I-302)+(1.027)+(3.008), (I-302)+(1.027)+(3.009), (I-302)+(1.027)+(3.010), (I-302)+(1.027)+(3.011), (I-302)+(1.027)+(3.012), (I-302)+(1.027)+(3.013), (I-302)+(1.027)+(3.014), (I-302)+(1.027)+(3.015), (I-302)+(1.027)+(3.016), (I-302)+(1.027)+(3.017), (I-302)+(1.027)+(3.018), (I-302)+(1.027)+(3.019), (I-302)+(1.027)+(3.020), (I-302)+(1.027)+(3.021), (I-302)+(1.027)+(3.022), (I-302)+(1.027)+(3.023), (I-302)+(1.027)+(3.024), (I-302)+(1.027)+(3.025), (I-302)+(1.027)+(3.026), (I-302)+(1.027)+(3.027), (I-302)+(1.027)+(3.028), (I-302)+(1.027)+(3.029), (I-302)+(1.027)+(3.030), (I-302)+(1.027)+(3.031), (I-302)+(1.027)+(5.001), (I-302)+(1.027)+(5.002), (I-302)+(1.027)+(5.003), (I-302)+(1.027)+(5.004), (I-302)+(1.027)+(5.005), (I-302)+(1.027)+(5.006), (I-302)+(1.027)+(5.007), (I-302)+(1.027)+(5.008), (I-302)+(1.027)+(5.009), (I-302)+(1.027)+(5.010), (I-302)+(1.027)+(5.011), (I-302)+(1.027)+(5.012), (I-302)+(1.027)+(5.013), (I-302)+(1.027)+(5.014), (I-302)+(1.027)+(5.015), (I-302)+(1.027)+(5.016), (I-302)+(1.027)+(5.017), (I-302)+(1.027)+(5.018), (I-302)+(1.027)+(5.019), (I-302)+(1.027)+(5.020), (I-302)+(1.027)+(5.021), (I-302)+(1.027)+(5.022), (I-302)+(1.027)+(5.023), (I-302)+(1.027)+(6.001), (I-302)+(1.027)+(6.002), (I-302)+(1.027)+(6.003), (I-302)+(1.027)+(6.004), (I-302)+(1.027)+(7.001), (I-302)+(1.027)+(7.002), (I-302)+(1.027)+(7.003), (I-302)+(1.027)+(7.004), (I-302)+(1.027)+(7.005), (I-302)+(1.027)+(7.006), (I-302)+(1.027)+(9.001), (I-302)+(1.027)+(9.002), (I-302)+(1.027)+(9.003), (I-302)+(1.027)+(9.004), (I-302)+(1.027)+(9.005), (I-302)+(1.027)+(9.006), (I-302)+(1.027)+(9.007), (I-302)+(1.027)+(9.008), (I-302)+(1.027)+(9.009), (I-302)+(1.027)+(14.001), (I-302)+(1.027)+(14.002), (I-302)+(1.027)+(15.008), (I-302)+(1.027)+(15.011), (I-302)+(1.027)+(15.012), (I-302)+(1.027)+(15.016), (I-302)+(1.027)+(15.025), (I-302)+(1.027)+(15.027), (I-302)+(1.027)+(15.047), (I-302)+(1.027)+(15.063), (I-302)+(1.027)+(15.064), (I-302)+(1.027)+(16.001), (I-302)+(1.027)+(16.002), (I-302)+(1.027)+(16.003), (I-302)+(1.027)+(16.004), (I-302)+(1.027)+(16.005), (I-302)+(1.027)+(16.006), (I-302)+(1.027)+(16.007), (I-302)+(1.027)+(16.008), (I-302)+(1.027)+(17.001), (I-302)+(1.027)+(17.002), (I-302)+(1.027)+(17.003), (I-302)+(1.027)+(17.004), (I-302)+(1.027)+(17.005), (I-302)+(1.027)+(17.006), (I-302)+(1.027)+(17.007), (I-302)+(1.027)+(17.008), (I-302)+(1.027)+(17.009), (I-302)+(1.027)+(17.010), (I-302)+(1.027)+(17.011), (I-302)+(1.027)+(17.012), (I-302)+(1.027)+(18.001), (I-302)+(1.028)+(1.029), (I-302)+(1.028)+(1.030), (I-302)+(1.028)+(1.031), (I-302)+(1.028)+(1.032), (I-302)+(1.028)+(1.033), (I-302)+(1.028)+(1.034), (I-302)+(1.028)+(1.035), (I-302)+(1.028)+(1.036), (I-302)+(1.028)+(1.037), (I-302)+(1.028)+(1.038), (I-302)+(1.028)+(1.039), (I-302)+(1.028)+(1.040), (I-302)+(1.028)+(1.041), (I-302)+(1.028)+(1.042), (I-302)+(1.028)+(1.043), (I-302)+(1.028)+(1.044), (I-302)+(1.028)+(1.045), (I-302)+(1.028)+(1.046), (I-302)+(1.028)+(1.047), (I-302)+(1.028)+(1.048), (I-302)+(1.028)+(1.049), (I-302)+(1.028)+(1.050), (I-302)+(1.028)+(1.051), (I-302)+(1.028)+(1.052), (I-302)+(1.028)+(1.053), (I-302)+(1.028)+(1.054), (I-302)+(1.028)+(1.055), (I-302)+(1.028)+(1.056), (I-302)+(1.028)+(1.057), (I-302)+(1.028)+(1.058), (I-302)+(1.028)+(1.059), (I-302)+(1.028)+(1.060), (I-302)+(1.028)+(1.061), (I-302)+(1.028)+(1.062), (I-302)+(1.028)+(1.063), (I-302)+(1.028)+(1.064), (I-302)+(1.028)+(1.065), (I-302)+(1.028)+(1.066), (I-302)+(1.028)+(1.067), (I-302)+(1.028)+(1.068), (I-302)+(1.028)+(1.069), (I-302)+(1.028)+(1.070), (I-302)+(1.028)+(1.071), (I-302)+(1.028)+(1.072), (I-302)+(1.028)+(1.073), (I-302)+(1.028)+(1.074), (I-302)+(1.028)+(1.075), (I-302)+(1.028)+(1.076), (I-302)+(1.028)+(1.077), (I-302)+(1.028)+(1.078), (I-302)+(1.028)+(1.079), (I-302)+(1.028)+(1.080), (I-302)+(1.028)+(1.081), (I-302)+(1.028)+(1.082), (I-302)+(1.028)+(1.083), (I-302)+(1.028)+(1.084), (I-302)+(1.028)+(1.085), (I-302)+(1.028)+(1.086), (I-302)+(1.028)+(1.087), (I-302)+(1.028)+(1.088), (I-302)+(1.028)+(1.089), (I-302)+(1.028)+(1.090), (I-302)+(1.028)+(1.091), (I-302)+(1.028)+(1.092), (I-302)+(1.028)+(2.001), (I-302)+(1.028)+(2.002), (I-302)+(1.028)+(2.003), (I-302)+(1.028)+(2.004), (I-302)+(1.028)+(2.005), (I-302)+(1.028)+(2.006), (I-302)+(1.028)+(2.007), (I-302)+(1.028)+(2.008), (I-302)+(1.028)+(2.009), (I-302)+(1.028)+(2.010), (I-302)+(1.028)+(2.011), (I-302)+(1.028)+(2.012), (I-302)+(1.028)+(2.013), (I-302)+(1.028)+(2.014), (I-302)+(1.028)+(2.015), (I-302)+(1.028)+(2.016), (I-302)+(1.028)+(2.017), (I-302)+(1.028)+(2.018), (I-302)+(1.028)+(2.019), (I-302)+(1.028)+(2.020), (I-302)+(1.028)+(2.021), (I-302)+(1.028)+(2.022), (I-302)+(1.028)+(2.023), (I-302)+(1.028)+(2.024), (I-302)+(1.028)+(2.025), (I-302)+(1.028)+(2.026), (I-302)+(1.028)+(2.027), (I-302)+(1.028)+(2.028), (I-302)+(1.028)+(2.029), (I-302)+(1.028)+(2.030), (I-302)+(1.028)+(2.031), (I-302)+(1.028)+(2.032), (I-302)+(1.028)+(2.033), (I-302)+(1.028)+(2.034), (I-302)+(1.028)+(2.035), (I-302)+(1.028)+(2.036), (I-302)+(1.028)+(2.037), (I-302)+(1.028)+(2.038), (I-302)+(1.028)+(2.039), (I-302)+(1.028)+(2.040), (I-302)+(1.028)+(2.041), (I-302)+(1.028)+(2.042), (I-302)+(1.028)+(2.043), (I-302)+(1.028)+(2.044), (I-302)+(1.028)+(2.045), (I-302)+(1.028)+(2.046), (I-302)+(1.028)+(2.047), (I-302)+(1.028)+(2.048), (I-302)+(1.028)+(2.049), (I-302)+(1.028)+(2.050), (I-302)+(1.028)+(2.051), (I-302)+(1.028)+(2.052), (I-302)+(1.028)+(2.053), (I-302)+(1.028)+(2.054), (I-302)+(1.028)+(2.055), (I-302)+(1.028)+(2.056), (I-302)+(1.028)+(2.057), (I-302)+(1.028)+(2.058), (I-302)+(1.028)+(2.059), (I-302)+(1.028)+(3.001), (I-302)+(1.028)+(3.002), (I-302)+(1.028)+(3.003), (I-302)+(1.028)+(3.004), (I-302)+(1.028)+(3.005), (I-302)+(1.028)+(3.006), (I-302)+(1.028)+(3.007), (I-302)+(1.028)+(3.008), (I-302)+(1.028)+(3.009), (I-302)+(1.028)+(3.010), (I-302)+(1.028)+(3.011), (I-302)+(1.028)+(3.012), (I-302)+(1.028)+(3.013), (I-302)+(1.028)+(3.014), (I-302)+(1.028)+(3.015), (I-302)+(1.028)+(3.016), (I-302)+(1.028)+(3.017), (I-302)+(1.028)+(3.018), (I-302)+(1.028)+(3.019), (I-302)+(1.028)+(3.020), (I-302)+(1.028)+(3.021), (I-302)+(1.028)+(3.022), (I-302)+(1.028)+(3.023), (I-302)+(1.028)+(3.024), (I-302)+(1.028)+(3.025), (I-302)+(1.028)+(3.026), (I-302)+(1.028)+(3.027), (I-302)+(1.028)+(3.028), (I-302)+(1.028)+(3.029), (I-302)+(1.028)+(3.030), (I-302)+(1.028)+(3.031), (I-302)+(1.028)+(5.001), (I-302)+(1.028)+(5.002), (I-302)+(1.028)+(5.003), (I-302)+(1.028)+(5.004), (I-302)+(1.028)+(5.005), (I-302)+(1.028)+(5.006), (I-302)+(1.028)+(5.007), (I-302)+(1.028)+(5.008), (I-302)+(1.028)+(5.009), (I-302)+(1.028)+(5.010), (I-302)+(1.028)+(5.011), (I-302)+(1.028)+(5.012), (I-302)+(1.028)+(5.013), (I-302)+(1.028)+(5.014), (I-302)+(1.028)+(5.015), (I-302)+(1.028)+(5.016), (I-302)+(1.028)+(5.017), (I-302)+(1.028)+(5.018), (I-302)+(1.028)+(5.019), (I-302)+(1.028)+(5.020), (I-302)+(1.028)+(5.021), (I-302)+(1.028)+(5.022), (I-302)+(1.028)+(5.023), (I-302)+(1.028)+(6.001), (I-302)+(1.028)+(6.002), (I-302)+(1.028)+(6.003), (I-302)+(1.028)+(6.004), (I-302)+(1.028)+(7.001), (I-302)+(1.028)+(7.002), (I-302)+(1.028)+(7.003), (I-302)+(1.028)+(7.004), (I-302)+(1.028)+(7.005), (I-302)+(1.028)+(7.006), (I-302)+(1.028)+(9.001), (I-302)+(1.028)+(9.002), (I-302)+(1.028)+(9.003), (I-302)+(1.028)+(9.004), (I-302)+(1.028)+(9.005), (I-302)+(1.028)+(9.006), (I-302)+(1.028)+(9.007), (I-302)+(1.028)+(9.008), (I-302)+(1.028)+(9.009), (I-302)+(1.028)+(14.001), (I-302)+(1.028)+(14.002), (I-302)+(1.028)+(15.008), (I-302)+(1.028)+(15.011), (I-302)+(1.028)+(15.012), (I-302)+(1.028)+(15.016), (I-302)+(1.028)+(15.025), (I-302)+(1.028)+(15.027), (I-302)+(1.028)+(15.047), (I-302)+(1.028)+(15.063), (I-302)+(1.028)+(15.064), (I-302)+(1.028)+(16.001), (I-302)+(1.028)+(16.002), (I-302)+(1.028)+(16.003), (I-302)+(1.028)+(16.004), (I-302)+(1.028)+(16.005), (I-302)+(1.028)+(16.006), (I-302)+(1.028)+(16.007), (I-302)+(1.028)+(16.008), (I-302)+(1.028)+(17.001), (I-302)+(1.028)+(17.002), (I-302)+(1.028)+(17.003), (I-302)+(1.028)+(17.004), (I-302)+(1.028)+(17.005), (I-302)+(1.028)+(17.006), (I-302)+(1.028)+(17.007), (I-302)+(1.028)+(17.008), (I-302)+(1.028)+(17.009), (I-302)+(1.028)+(17.010), (I-302)+(1.028)+(17.011), (I-302)+(1.028)+(17.012), (I-302)+(1.028)+(18.001), (I-302)+(1.029)+(1.030), (I-302)+(1.029)+(1.031), (I-302)+(1.029)+(1.032), (I-302)+(1.029)+(1.033), (I-302)+(1.029)+(1.034), (I-302)+(1.029)+(1.035), (I-302)+(1.029)+(1.036), (I-302)+(1.029)+(1.037), (I-302)+(1.029)+(1.038), (I-302)+(1.029)+(1.039), (I-302)+(1.029)+(1.040), (I-302)+(1.029)+(1.041), (I-302)+(1.029)+(1.042), (I-302)+(1.029)+(1.043), (I-302)+(1.029)+(1.044), (I-302)+(1.029)+(1.045), (I-302)+(1.029)+(1.046), (I-302)+(1.029)+(1.047), (I-302)+(1.029)+(1.048), (I-302)+(1.029)+(1.049), (I-302)+(1.029)+(1.050), (I-302)+(1.029)+(1.051), (I-302)+(1.029)+(1.052), (I-302)+(1.029)+(1.053), (I-302)+(1.029)+(1.054), (I-302)+(1.029)+(1.055), (I-302)+(1.029)+(1.056), (I-302)+(1.029)+(1.057), (I-302)+(1.029)+(1.058), (I-302)+(1.029)+(1.059), (I-302)+(1.029)+(1.060), (I-302)+(1.029)+(1.061), (I-302)+(1.029)+(1.062), (I-302)+(1.029)+(1.063), (I-302)+(1.029)+(1.064), (I-302)+(1.029)+(1.065), (I-302)+(1.029)+(1.066), (I-302)+(1.029)+(1.067), (I-302)+(1.029)+(1.068), (I-302)+(1.029)+(1.069), (I-302)+(1.029)+(1.070), (I-302)+(1.029)+(1.071), (I-302)+(1.029)+(1.072), (I-302)+(1.029)+(1.073), (I-302)+(1.029)+(1.074), (I-302)+(1.029)+(1.075), (I-302)+(1.029)+(1.076), (I-302)+(1.029)+(1.077), (I-302)+(1.029)+(1.078), (I-302)+(1.029)+(1.079), (I-302)+(1.029)+(1.080), (I-302)+(1.029)+(1.081), (I-302)+(1.029)+(1.082), (I-302)+(1.029)+(1.083), (I-302)+(1.029)+(1.084), (I-302)+(1.029)+(1.085), (I-302)+(1.029)+(1.086), (I-302)+(1.029)+(1.087), (I-302)+(1.029)+(1.088), (I-302)+(1.029)+(1.089), (I-302)+(1.029)+(1.090), (I-302)+(1.029)+(1.091), (I-302)+(1.029)+(1.092), (I-302)+(1.029)+(2.001), (I-302)+(1.029)+(2.002), (I-302)+(1.029)+(2.003), (I-302)+(1.029)+(2.004), (I-302)+(1.029)+(2.005), (I-302)+(1.029)+(2.006), (I-302)+(1.029)+(2.007), (I-302)+(1.029)+(2.008), (I-302)+(1.029)+(2.009), (I-302)+(1.029)+(2.010), (I-302)+(1.029)+(2.011), (I-302)+(1.029)+(2.012), (I-302)+(1.029)+(2.013), (I-302)+(1.029)+(2.014), (I-302)+(1.029)+(2.015), (I-302)+(1.029)+(2.016), (I-302)+(1.029)+(2.017), (I-302)+(1.029)+(2.018), (I-302)+(1.029)+(2.019), (I-302)+(1.029)+(2.020), (I-302)+(1.029)+(2.021), (I-302)+(1.029)+(2.022), (I-302)+(1.029)+(2.023), (I-302)+(1.029)+(2.024), (I-302)+(1.029)+(2.025), (I-302)+(1.029)+(2.026), (I-302)+(1.029)+(2.027), (I-302)+(1.029)+(2.028), (I-302)+(1.029)+(2.029), (I-302)+(1.029)+(2.030), (I-302)+(1.029)+(2.031), (I-302)+(1.029)+(2.032), (I-302)+(1.029)+(2.033), (I-302)+(1.029)+(2.034), (I-302)+(1.029)+(2.035), (I-302)+(1.029)+(2.036), (I-302)+(1.029)+(2.037), (I-302)+(1.029)+(2.038), (I-302)+(1.029)+(2.039), (I-302)+(1.029)+(2.040), (I-302)+(1.029)+(2.041), (I-302)+(1.029)+(2.042), (I-302)+(1.029)+(2.043), (I-302)+(1.029)+(2.044), (I-302)+(1.029)+(2.045), (I-302)+(1.029)+(2.046), (I-302)+(1.029)+(2.047), (I-302)+(1.029)+(2.048), (I-302)+(1.029)+(2.049), (I-302)+(1.029)+(2.050), (I-302)+(1.029)+(2.051), (I-302)+(1.029)+(2.052), (I-302)+(1.029)+(2.053), (I-302)+(1.029)+(2.054), (I-302)+(1.029)+(2.055), (I-302)+(1.029)+(2.056), (I-302)+(1.029)+(2.057), (I-302)+(1.029)+(2.058), (I-302)+(1.029)+(2.059), (I-302)+(1.029)+(3.001), (I-302)+(1.029)+(3.002), (I-302)+(1.029)+(3.003), (I-302)+(1.029)+(3.004), (I-302)+(1.029)+(3.005), (I-302)+(1.029)+(3.006), (I-302)+(1.029)+(3.007), (I-302)+(1.029)+(3.008), (I-302)+(1.029)+(3.009), (I-302)+(1.029)+(3.010), (I-302)+(1.029)+(3.011), (I-302)+(1.029)+(3.012), (I-302)+(1.029)+(3.013), (I-302)+(1.029)+(3.014), (I-302)+(1.029)+(3.015), (I-302)+(1.029)+(3.016), (I-302)+(1.029)+(3.017), (I-302)+(1.029)+(3.018), (I-302)+(1.029)+(3.019), (I-302)+(1.029)+(3.020), (I-302)+(1.029)+(3.021), (I-302)+(1.029)+(3.022), (I-302)+(1.029)+(3.023), (I-302)+(1.029)+(3.024), (I-302)+(1.029)+(3.025), (I-302)+(1.029)+(3.026), (I-302)+(1.029)+(3.027), (I-302)+(1.029)+(3.028), (I-302)+(1.029)+(3.029), (I-302)+(1.029)+(3.030), (I-302)+(1.029)+(3.031), (I-302)+(1.029)+(5.001), (I-302)+(1.029)+(5.002), (I-302)+(1.029)+(5.003), (I-302)+(1.029)+(5.004), (I-302)+(1.029)+(5.005), (I-302)+(1.029)+(5.006), (I-302)+(1.029)+(5.007), (I-302)+(1.029)+(5.008), (I-302)+(1.029)+(5.009), (I-302)+(1.029)+(5.010), (I-302)+(1.029)+(5.011), (I-302)+(1.029)+(5.012), (I-302)+(1.029)+(5.013), (I-302)+(1.029)+(5.014), (I-302)+(1.029)+(5.015), (I-302)+(1.029)+(5.016), (I-302)+(1.029)+(5.017), (I-302)+(1.029)+(5.018), (I-302)+(1.029)+(5.019), (I-302)+(1.029)+(5.020), (I-302)+(1.029)+(5.021), (I-302)+(1.029)+(5.022), (I-302)+(1.029)+(5.023), (I-302)+(1.029)+(6.001), (I-302)+(1.029)+(6.002), (I-302)+(1.029)+(6.003), (I-302)+(1.029)+(6.004), (I-302)+(1.029)+(7.001), (I-302)+(1.029)+(7.002), (I-302)+(1.029)+(7.003), (I-302)+(1.029)+(7.004), (I-302)+(1.029)+(7.005), (I-302)+(1.029)+(7.006), (I-302)+(1.029)+(9.001), (I-302)+(1.029)+(9.002), (I-302)+(1.029)+(9.003), (I-302)+(1.029)+(9.004), (I-302)+(1.029)+(9.005), (I-302)+(1.029)+(9.006), (I-302)+(1.029)+(9.007), (I-302)+(1.029)+(9.008), (I-302)+(1.029)+(9.009), (I-302)+(1.029)+(14.001), (I-302)+(1.029)+(14.002), (I-302)+(1.029)+(15.008), (I-302)+(1.029)+(15.011), (I-302)+(1.029)+(15.012), (I-302)+(1.029)+(15.016), (I-302)+(1.029)+(15.025), (I-302)+(1.029)+(15.027), (I-302)+(1.029)+(15.047), (I-302)+(1.029)+(15.063), (I-302)+(1.029)+(15.064), (I-302)+(1.029)+(16.001), (I-302)+(1.029)+(16.002), (I-302)+(1.029)+(16.003), (I-302)+(1.029)+(16.004), (I-302)+(1.029)+(16.005), (I-302)+(1.029)+(16.006), (I-302)+(1.029)+(16.007), (I-302)+(1.029)+(16.008), (I-302)+(1.029)+(17.001), (I-302)+(1.029)+(17.002), (I-302)+(1.029)+(17.003), (I-302)+(1.029)+(17.004), (I-302)+(1.029)+(17.005), (I-302)+(1.029)+(17.006), (I-302)+(1.029)+(17.007), (I-302)+(1.029)+(17.008), (I-302)+(1.029)+(17.009), (I-302)+(1.029)+(17.010), (I-302)+(1.029)+(17.011), (I-302)+(1.029)+(17.012), (I-302)+(1.029)+(18.001), (I-302)+(1.030)+(1.031), (I-302)+(1.030)+(1.032), (I-302)+(1.030)+(1.033), (I-302)+(1.030)+(1.034), (I-302)+(1.030)+(1.035), (I-302)+(1.030)+(1.036), (I-302)+(1.030)+(1.037), (I-302)+(1.030)+(1.038), (I-302)+(1.030)+(1.039), (I-302)+(1.030)+(1.040), (I-302)+(1.030)+(1.041), (I-302)+(1.030)+(1.042), (I-302)+(1.030)+(1.043), (I-302)+(1.030)+(1.044), (I-302)+(1.030)+(1.045), (I-302)+(1.030)+(1.046), (I-302)+(1.030)+(1.047), (I-302)+(1.030)+(1.048), (I-302)+(1.030)+(1.049), (I-302)+(1.030)+(1.050), (I-302)+(1.030)+(1.051), (I-302)+(1.030)+(1.052), (I-302)+(1.030)+(1.053), (I-302)+(1.030)+(1.054), (I-302)+(1.030)+(1.055), (I-302)+(1.030)+(1.056), (I-302)+(1.030)+(1.057), (I-302)+(1.030)+(1.058), (I-302)+(1.030)+(1.059), (I-302)+(1.030)+(1.060), (I-302)+(1.030)+(1.061), (I-302)+(1.030)+(1.062), (I-302)+(1.030)+(1.063), (I-302)+(1.030)+(1.064), (I-302)+(1.030)+(1.065), (I-302)+(1.030)+(1.066), (I-302)+(1.030)+(1.067), (I-302)+(1.030)+(1.068), (I-302)+(1.030)+(1.069), (I-302)+(1.030)+(1.070), (I-302)+(1.030)+(1.071), (I-302)+(1.030)+(1.072), (I-302)+(1.030)+(1.073), (I-302)+(1.030)+(1.074), (I-302)+(1.030)+(1.075), (I-302)+(1.030)+(1.076), (I-302)+(1.030)+(1.077), (I-302)+(1.030)+(1.078), (I-302)+(1.030)+(1.079), (I-302)+(1.030)+(1.080), (I-302)+(1.030)+(1.081), (I-302)+(1.030)+(1.082), (I-302)+(1.030)+(1.083), (I-302)+(1.030)+(1.084), (I-302)+(1.030)+(1.085), (I-302)+(1.030)+(1.086), (I-302)+(1.030)+(1.087), (I-302)+(1.030)+(1.088), (I-302)+(1.030)+(1.089), (I-302)+(1.030)+(1.090), (I-302)+(1.030)+(1.091), (I-302)+(1.030)+(1.092), (I-302)+(1.030)+(2.001), (I-302)+(1.030)+(2.002), (I-302)+(1.030)+(2.003), (I-302)+(1.030)+(2.004), (I-302)+(1.030)+(2.005), (I-302)+(1.030)+(2.006), (I-302)+(1.030)+(2.007), (I-302)+(1.030)+(2.008), (I-302)+(1.030)+(2.009), (I-302)+(1.030)+(2.010), (I-302)+(1.030)+(2.011), (I-302)+(1.030)+(2.012), (I-302)+(1.030)+(2.013), (I-302)+(1.030)+(2.014), (I-302)+(1.030)+(2.015), (I-302)+(1.030)+(2.016), (I-302)+(1.030)+(2.017), (I-302)+(1.030)+(2.018), (I-302)+(1.030)+(2.019), (I-302)+(1.030)+(2.020), (I-302)+(1.030)+(2.021), (I-302)+(1.030)+(2.022), (I-302)+(1.030)+(2.023), (I-302)+(1.030)+(2.024), (I-302)+(1.030)+(2.025), (I-302)+(1.030)+(2.026), (I-302)+(1.030)+(2.027), (I-302)+(1.030)+(2.028), (I-302)+(1.030)+(2.029), (I-302)+(1.030)+(2.030), (I-302)+(1.030)+(2.031), (I-302)+(1.030)+(2.032), (I-302)+(1.030)+(2.033), (I-302)+(1.030)+(2.034), (I-302)+(1.030)+(2.035), (I-302)+(1.030)+(2.036), (I-302)+(1.030)+(2.037), (I-302)+(1.030)+(2.038), (I-302)+(1.030)+(2.039), (I-302)+(1.030)+(2.040), (I-302)+(1.030)+(2.041), (I-302)+(1.030)+(2.042), (I-302)+(1.030)+(2.043), (I-302)+(1.030)+(2.044), (I-302)+(1.030)+(2.045), (I-302)+(1.030)+(2.046), (I-302)+(1.030)+(2.047), (I-302)+(1.030)+(2.048), (I-302)+(1.030)+(2.049), (I-302)+(1.030)+(2.050), (I-302)+(1.030)+(2.051), (I-302)+(1.030)+(2.052), (I-302)+(1.030)+(2.053), (I-302)+(1.030)+(2.054), (I-302)+(1.030)+(2.055), (I-302)+(1.030)+(2.056), (I-302)+(1.030)+(2.057), (I-302)+(1.030)+(2.058), (I-302)+(1.030)+(2.059), (I-302)+(1.030)+(3.001), (I-302)+(1.030)+(3.002), (I-302)+(1.030)+(3.003), (I-302)+(1.030)+(3.004), (I-302)+(1.030)+(3.005), (I-302)+(1.030)+(3.006), (I-302)+(1.030)+(3.007), (I-302)+(1.030)+(3.008), (I-302)+(1.030)+(3.009), (I-302)+(1.030)+(3.010), (I-302)+(1.030)+(3.011), (I-302)+(1.030)+(3.012), (I-302)+(1.030)+(3.013), (I-302)+(1.030)+(3.014), (I-302)+(1.030)+(3.015), (I-302)+(1.030)+(3.016), (I-302)+(1.030)+(3.017), (I-302)+(1.030)+(3.018), (I-302)+(1.030)+(3.019), (I-302)+(1.030)+(3.020), (I-302)+(1.030)+(3.021), (I-302)+(1.030)+(3.022), (I-302)+(1.030)+(3.023), (I-302)+(1.030)+(3.024), (I-302)+(1.030)+(3.025), (I-302)+(1.030)+(3.026), (I-302)+(1.030)+(3.027), (I-302)+(1.030)+(3.028), (I-302)+(1.030)+(3.029), (I-302)+(1.030)+(3.030), (I-302)+(1.030)+(3.031), (I-302)+(1.030)+(5.001), (I-302)+(1.030)+(5.002), (I-302)+(1.030)+(5.003), (I-302)+(1.030)+(5.004), (I-302)+(1.030)+(5.005), (I-302)+(1.030)+(5.006), (I-302)+(1.030)+(5.007), (I-302)+(1.030)+(5.008), (I-302)+(1.030)+(5.009), (I-302)+(1.030)+(5.010), (I-302)+(1.030)+(5.011), (I-302)+(1.030)+(5.012), (I-302)+(1.030)+(5.013), (I-302)+(1.030)+(5.014), (I-302)+(1.030)+(5.015), (I-302)+(1.030)+(5.016), (I-302)+(1.030)+(5.017), (I-302)+(1.030)+(5.018), (I-302)+(1.030)+(5.019), (I-302)+(1.030)+(5.020), (I-302)+(1.030)+(5.021), (I-302)+(1.030)+(5.022), (I-302)+(1.030)+(5.023), (I-302)+(1.030)+(6.001), (I-302)+(1.030)+(6.002), (I-302)+(1.030)+(6.003), (I-302)+(1.030)+(6.004), (I-302)+(1.030)+(7.001), (I-302)+(1.030)+(7.002), (I-302)+(1.030)+(7.003), (I-302)+(1.030)+(7.004), (I-302)+(1.030)+(7.005), (I-302)+(1.030)+(7.006), (I-302)+(1.030)+(9.001), (I-302)+(1.030)+(9.002), (I-302)+(1.030)+(9.003), (I-302)+(1.030)+(9.004), (I-302)+(1.030)+(9.005), (I-302)+(1.030)+(9.006), (I-302)+(1.030)+(9.007), (I-302)+(1.030)+(9.008), (I-302)+(1.030)+(9.009), (I-302)+(1.030)+(14.001), (I-302)+(1.030)+(14.002), (I-302)+(1.030)+(15.008), (I-302)+(1.030)+(15.011), (I-302)+(1.030)+(15.012), (I-302)+(1.030)+(15.016), (I-302)+(1.030)+(15.025), (I-302)+(1.030)+(15.027), (I-302)+(1.030)+(15.047), (I-302)+(1.030)+(15.063), (I-302)+(1.030)+(15.064), (I-302)+(1.030)+(16.001), (I-302)+(1.030)+(16.002), (I-302)+(1.030)+(16.003), (I-302)+(1.030)+(16.004), (I-302)+(1.030)+(16.005), (I-302)+(1.030)+(16.006), (I-302)+(1.030)+(16.007), (I-302)+(1.030)+(16.008), (I-302)+(1.030)+(17.001), (I-302)+(1.030)+(17.002), (I-302)+(1.030)+(17.003), (I-302)+(1.030)+(17.004), (I-302)+(1.030)+(17.005), (I-302)+(1.030)+(17.006), (I-302)+(1.030)+(17.007), (I-302)+(1.030)+(17.008), (I-302)+(1.030)+(17.009), (I-302)+(1.030)+(17.010), (I-302)+(1.030)+(17.011), (I-302)+(1.030)+(17.012), (I-302)+(1.030)+(18.001), (I-302)+(1.031)+(1.032), (I-302)+(1.031)+(1.033), (I-302)+(1.031)+(1.034), (I-302)+(1.031)+(1.035), (I-302)+(1.031)+(1.036), (I-302)+(1.031)+(1.037), (I-302)+(1.031)+(1.038), (I-302)+(1.031)+(1.039), (I-302)+(1.031)+(1.040), (I-302)+(1.031)+(1.041), (I-302)+(1.031)+(1.042), (I-302)+(1.031)+(1.043), (I-302)+(1.031)+(1.044), (I-302)+(1.031)+(1.045), (I-302)+(1.031)+(1.046), (I-302)+(1.031)+(1.047), (I-302)+(1.031)+(1.048), (I-302)+(1.031)+(1.049), (I-302)+(1.031)+(1.050), (I-302)+(1.031)+(1.051), (I-302)+(1.031)+(1.052), (I-302)+(1.031)+(1.053), (I-302)+(1.031)+(1.054), (I-302)+(1.031)+(1.055), (I-302)+(1.031)+(1.056), (I-302)+(1.031)+(1.057), (I-302)+(1.031)+(1.058), (I-302)+(1.031)+(1.059), (I-302)+(1.031)+(1.060), (I-302)+(1.031)+(1.061), (I-302)+(1.031)+(1.062), (I-302)+(1.031)+(1.063), (I-302)+(1.031)+(1.064), (I-302)+(1.031)+(1.065), (I-302)+(1.031)+(1.066), (I-302)+(1.031)+(1.067), (I-302)+(1.031)+(1.068), (I-302)+(1.031)+(1.069), (I-302)+(1.031)+(1.070), (I-302)+(1.031)+(1.071), (I-302)+(1.031)+(1.072), (I-302)+(1.031)+(1.073), (I-302)+(1.031)+(1.074), (I-302)+(1.031)+(1.075), (I-302)+(1.031)+(1.076), (I-302)+(1.031)+(1.077), (I-302)+(1.031)+(1.078), (I-302)+(1.031)+(1.079), (I-302)+(1.031)+(1.080), (I-302)+(1.031)+(1.081), (I-302)+(1.031)+(1.082), (I-302)+(1.031)+(1.083), (I-302)+(1.031)+(1.084), (I-302)+(1.031)+(1.085), (I-302)+(1.031)+(1.086), (I-302)+(1.031)+(1.087), (I-302)+(1.031)+(1.088), (I-302)+(1.031)+(1.089), (I-302)+(1.031)+(1.090), (I-302)+(1.031)+(1.091), (I-302)+(1.031)+(1.092), (I-302)+(1.031)+(2.001), (I-302)+(1.031)+(2.002), (I-302)+(1.031)+(2.003), (I-302)+(1.031)+(2.004), (I-302)+(1.031)+(2.005), (I-302)+(1.031)+(2.006), (I-302)+(1.031)+(2.007), (I-302)+(1.031)+(2.008), (I-302)+(1.031)+(2.009), (I-302)+(1.031)+(2.010), (I-302)+(1.031)+(2.011), (I-302)+(1.031)+(2.012), (I-302)+(1.031)+(2.013), (I-302)+(1.031)+(2.014), (I-302)+(1.031)+(2.015), (I-302)+(1.031)+(2.016), (I-302)+(1.031)+(2.017), (I-302)+(1.031)+(2.018), (I-302)+(1.031)+(2.019), (I-302)+(1.031)+(2.020), (I-302)+(1.031)+(2.021), (I-302)+(1.031)+(2.022), (I-302)+(1.031)+(2.023), (I-302)+(1.031)+(2.024), (I-302)+(1.031)+(2.025), (I-302)+(1.031)+(2.026), (I-302)+(1.031)+(2.027), (I-302)+(1.031)+(2.028), (I-302)+(1.031)+(2.029), (I-302)+(1.031)+(2.030), (I-302)+(1.031)+(2.031), (I-302)+(1.031)+(2.032), (I-302)+(1.031)+(2.033), (I-302)+(1.031)+(2.034), (I-302)+(1.031)+(2.035), (I-302)+(1.031)+(2.036), (I-302)+(1.031)+(2.037), (I-302)+(1.031)+(2.038), (I-302)+(1.031)+(2.039), (I-302)+(1.031)+(2.040), (I-302)+(1.031)+(2.041), (I-302)+(1.031)+(2.042), (I-302)+(1.031)+(2.043), (I-302)+(1.031)+(2.044), (I-302)+(1.031)+(2.045), (I-302)+(1.031)+(2.046), (I-302)+(1.031)+(2.047), (I-302)+(1.031)+(2.048), (I-302)+(1.031)+(2.049), (I-302)+(1.031)+(2.050), (I-302)+(1.031)+(2.051), (I-302)+(1.031)+(2.052), (I-302)+(1.031)+(2.053), (I-302)+(1.031)+(2.054), (I-302)+(1.031)+(2.055), (I-302)+(1.031)+(2.056), (I-302)+(1.031)+(2.057), (I-302)+(1.031)+(2.058), (I-302)+(1.031)+(2.059), (I-302)+(1.031)+(3.001), (I-302)+(1.031)+(3.002), (I-302)+(1.031)+(3.003), (I-302)+(1.031)+(3.004), (I-302)+(1.031)+(3.005), (I-302)+(1.031)+(3.006), (I-302)+(1.031)+(3.007), (I-302)+(1.031)+(3.008), (I-302)+(1.031)+(3.009), (I-302)+(1.031)+(3.010), (I-302)+(1.031)+(3.011), (I-302)+(1.031)+(3.012), (I-302)+(1.031)+(3.013), (I-302)+(1.031)+(3.014), (I-302)+(1.031)+(3.015), (I-302)+(1.031)+(3.016), (I-302)+(1.031)+(3.017), (I-302)+(1.031)+(3.018), (I-302)+(1.031)+(3.019), (I-302)+(1.031)+(3.020), (I-302)+(1.031)+(3.021), (I-302)+(1.031)+(3.022), (I-302)+(1.031)+(3.023), (I-302)+(1.031)+(3.024), (I-302)+(1.031)+(3.025), (I-302)+(1.031)+(3.026), (I-302)+(1.031)+(3.027), (I-302)+(1.031)+(3.028), (I-302)+(1.031)+(3.029), (I-302)+(1.031)+(3.030), (I-302)+(1.031)+(3.031), (I-302)+(1.031)+(5.001), (I-302)+(1.031)+(5.002), (I-302)+(1.031)+(5.003), (I-302)+(1.031)+(5.004), (I-302)+(1.031)+(5.005), (I-302)+(1.031)+(5.006), (I-302)+(1.031)+(5.007), (I-302)+(1.031)+(5.008), (I-302)+(1.031)+(5.009), (I-302)+(1.031)+(5.010), (I-302)+(1.031)+(5.011), (I-302)+(1.031)+(5.012), (I-302)+(1.031)+(5.013), (I-302)+(1.031)+(5.014), (I-302)+(1.031)+(5.015), (I-302)+(1.031)+(5.016), (I-302)+(1.031)+(5.017), (I-302)+(1.031)+(5.018), (I-302)+(1.031)+(5.019), (I-302)+(1.031)+(5.020), (I-302)+(1.031)+(5.021), (I-302)+(1.031)+(5.022), (I-302)+(1.031)+(5.023), (I-302)+(1.031)+(6.001), (I-302)+(1.031)+(6.002), (I-302)+(1.031)+(6.003), (I-302)+(1.031)+(6.004), (I-302)+(1.031)+(7.001), (I-302)+(1.031)+(7.002), (I-302)+(1.031)+(7.003), (I-302)+(1.031)+(7.004), (I-302)+(1.031)+(7.005), (I-302)+(1.031)+(7.006), (I-302)+(1.031)+(9.001), (I-302)+(1.031)+(9.002), (I-302)+(1.031)+(9.003), (I-302)+(1.031)+(9.004), (I-302)+(1.031)+(9.005), (I-302)+(1.031)+(9.006), (I-302)+(1.031)+(9.007), (I-302)+(1.031)+(9.008), (I-302)+(1.031)+(9.009), (I-302)+(1.031)+(14.001), (I-302)+(1.031)+(14.002), (I-302)+(1.031)+(15.008), (I-302)+(1.031)+(15.011), (I-302)+(1.031)+(15.012), (I-302)+(1.031)+(15.016), (I-302)+(1.031)+(15.025), (I-302)+(1.031)+(15.027), (I-302)+(1.031)+(15.047), (I-302)+(1.031)+(15.063), (I-302)+(1.031)+(15.064), (I-302)+(1.031)+(16.001), (I-302)+(1.031)+(16.002), (I-302)+(1.031)+(16.003), (I-302)+(1.031)+(16.004), (I-302)+(1.031)+(16.005), (I-302)+(1.031)+(16.006), (I-302)+(1.031)+(16.007), (I-302)+(1.031)+(16.008), (I-302)+(1.031)+(17.001), (I-302)+(1.031)+(17.002), (I-302)+(1.031)+(17.003), (I-302)+(1.031)+(17.004), (I-302)+(1.031)+(17.005), (I-302)+(1.031)+(17.006), (I-302)+(1.031)+(17.007), (I-302)+(1.031)+(17.008), (I-302)+(1.031)+(17.009), (I-302)+(1.031)+(17.010), (I-302)+(1.031)+(17.011), (I-302)+(1.031)+(17.012), (I-302)+(1.031)+(18.001), (I-302)+(1.032)+(1.033), (I-302)+(1.032)+(1.034), (I-302)+(1.032)+(1.035), (I-302)+(1.032)+(1.036), (I-302)+(1.032)+(1.037), (I-302)+(1.032)+(1.038), (I-302)+(1.032)+(1.039), (I-302)+(1.032)+(1.040), (I-302)+(1.032)+(1.041), (I-302)+(1.032)+(1.042), (I-302)+(1.032)+(1.043), (I-302)+(1.032)+(1.044), (I-302)+(1.032)+(1.045), (I-302)+(1.032)+(1.046), (I-302)+(1.032)+(1.047), (I-302)+(1.032)+(1.048), (I-302)+(1.032)+(1.049), (I-302)+(1.032)+(1.050), (I-302)+(1.032)+(1.051), (I-302)+(1.032)+(1.052), (I-302)+(1.032)+(1.053), (I-302)+(1.032)+(1.054), (I-302)+(1.032)+(1.055), (I-302)+(1.032)+(1.056), (I-302)+(1.032)+(1.057), (I-302)+(1.032)+(1.058), (I-302)+(1.032)+(1.059), (I-302)+(1.032)+(1.060), (I-302)+(1.032)+(1.061), (I-302)+(1.032)+(1.062), (I-302)+(1.032)+(1.063), (I-302)+(1.032)+(1.064), (I-302)+(1.032)+(1.065), (I-302)+(1.032)+(1.066), (I-302)+(1.032)+(1.067), (I-302)+(1.032)+(1.068), (I-302)+(1.032)+(1.069), (I-302)+(1.032)+(1.070), (I-302)+(1.032)+(1.071), (I-302)+(1.032)+(1.072), (I-302)+(1.032)+(1.073), (I-302)+(1.032)+(1.074), (I-302)+(1.032)+(1.075), (I-302)+(1.032)+(1.076), (I-302)+(1.032)+(1.077), (I-302)+(1.032)+(1.078), (I-302)+(1.032)+(1.079), (I-302)+(1.032)+(1.080), (I-302)+(1.032)+(1.081), (I-302)+(1.032)+(1.082), (I-302)+(1.032)+(1.083), (I-302)+(1.032)+(1.084), (I-302)+(1.032)+(1.085), (I-302)+(1.032)+(1.086), (I-302)+(1.032)+(1.087), (I-302)+(1.032)+(1.088), (I-302)+(1.032)+(1.089), (I-302)+(1.032)+(1.090), (I-302)+(1.032)+(1.091), (I-302)+(1.032)+(1.092), (I-302)+(1.032)+(2.001), (I-302)+(1.032)+(2.002), (I-302)+(1.032)+(2.003), (I-302)+(1.032)+(2.004), (I-302)+(1.032)+(2.005), (I-302)+(1.032)+(2.006), (I-302)+(1.032)+(2.007), (I-302)+(1.032)+(2.008), (I-302)+(1.032)+(2.009), (I-302)+(1.032)+(2.010), (I-302)+(1.032)+(2.011), (I-302)+(1.032)+(2.012), (I-302)+(1.032)+(2.013), (I-302)+(1.032)+(2.014), (I-302)+(1.032)+(2.015), (I-302)+(1.032)+(2.016), (I-302)+(1.032)+(2.017), (I-302)+(1.032)+(2.018), (I-302)+(1.032)+(2.019), (I-302)+(1.032)+(2.020), (I-302)+(1.032)+(2.021), (I-302)+(1.032)+(2.022), (I-302)+(1.032)+(2.023), (I-302)+(1.032)+(2.024), (I-302)+(1.032)+(2.025), (I-302)+(1.032)+(2.026), (I-302)+(1.032)+(2.027), (I-302)+(1.032)+(2.028), (I-302)+(1.032)+(2.029), (I-302)+(1.032)+(2.030), (I-302)+(1.032)+(2.031), (I-302)+(1.032)+(2.032), (I-302)+(1.032)+(2.033), (I-302)+(1.032)+(2.034), (I-302)+(1.032)+(2.035), (I-302)+(1.032)+(2.036), (I-302)+(1.032)+(2.037), (I-302)+(1.032)+(2.038), (I-302)+(1.032)+(2.039), (I-302)+(1.032)+(2.040), (I-302)+(1.032)+(2.041), (I-302)+(1.032)+(2.042), (I-302)+(1.032)+(2.043), (I-302)+(1.032)+(2.044), (I-302)+(1.032)+(2.045), (I-302)+(1.032)+(2.046), (I-302)+(1.032)+(2.047), (I-302)+(1.032)+(2.048), (I-302)+(1.032)+(2.049), (I-302)+(1.032)+(2.050), (I-302)+(1.032)+(2.051), (I-302)+(1.032)+(2.052), (I-302)+(1.032)+(2.053), (I-302)+(1.032)+(2.054), (I-302)+(1.032)+(2.055), (I-302)+(1.032)+(2.056), (I-302)+(1.032)+(2.057), (I-302)+(1.032)+(2.058), (I-302)+(1.032)+(2.059), (I-302)+(1.032)+(3.001), (I-302)+(1.032)+(3.002), (I-302)+(1.032)+(3.003), (I-302)+(1.032)+(3.004), (I-302)+(1.032)+(3.005), (I-302)+(1.032)+(3.006), (I-302)+(1.032)+(3.007), (I-302)+(1.032)+(3.008), (I-302)+(1.032)+(3.009), (I-302)+(1.032)+(3.010), (I-302)+(1.032)+(3.011), (I-302)+(1.032)+(3.012), (I-302)+(1.032)+(3.013), (I-302)+(1.032)+(3.014), (I-302)+(1.032)+(3.015), (I-302)+(1.032)+(3.016), (I-302)+(1.032)+(3.017), (I-302)+(1.032)+(3.018), (I-302)+(1.032)+(3.019), (I-302)+(1.032)+(3.020), (I-302)+(1.032)+(3.021), (I-302)+(1.032)+(3.022), (I-302)+(1.032)+(3.023), (I-302)+(1.032)+(3.024), (I-302)+(1.032)+(3.025), (I-302)+(1.032)+(3.026), (I-302)+(1.032)+(3.027), (I-302)+(1.032)+(3.028), (I-302)+(1.032)+(3.029), (I-302)+(1.032)+(3.030), (I-302)+(1.032)+(3.031), (I-302)+(1.032)+(5.001), (I-302)+(1.032)+(5.002), (I-302)+(1.032)+(5.003), (I-302)+(1.032)+(5.004), (I-302)+(1.032)+(5.005), (I-302)+(1.032)+(5.006), (I-302)+(1.032)+(5.007), (I-302)+(1.032)+(5.008), (I-302)+(1.032)+(5.009), (I-302)+(1.032)+(5.010), (I-302)+(1.032)+(5.011), (I-302)+(1.032)+(5.012), (I-302)+(1.032)+(5.013), (I-302)+(1.032)+(5.014), (I-302)+(1.032)+(5.015), (I-302)+(1.032)+(5.016), (I-302)+(1.032)+(5.017), (I-302)+(1.032)+(5.018), (I-302)+(1.032)+(5.019), (I-302)+(1.032)+(5.020), (I-302)+(1.032)+(5.021), (I-302)+(1.032)+(5.022), (I-302)+(1.032)+(5.023), (I-302)+(1.032)+(6.001), (I-302)+(1.032)+(6.002), (I-302)+(1.032)+(6.003), (I-302)+(1.032)+(6.004), (I-302)+(1.032)+(7.001), (I-302)+(1.032)+(7.002), (I-302)+(1.032)+(7.003), (I-302)+(1.032)+(7.004), (I-302)+(1.032)+(7.005), (I-302)+(1.032)+(7.006), (I-302)+(1.032)+(9.001), (I-302)+(1.032)+(9.002), (I-302)+(1.032)+(9.003), (I-302)+(1.032)+(9.004), (I-302)+(1.032)+(9.005), (I-302)+(1.032)+(9.006), (I-302)+(1.032)+(9.007), (I-302)+(1.032)+(9.008), (I-302)+(1.032)+(9.009), (I-302)+(1.032)+(14.001), (I-302)+(1.032)+(14.002), (I-302)+(1.032)+(15.008), (I-302)+(1.032)+(15.011), (I-302)+(1.032)+(15.012), (I-302)+(1.032)+(15.016), (I-302)+(1.032)+(15.025), (I-302)+(1.032)+(15.027), (I-302)+(1.032)+(15.047), (I-302)+(1.032)+(15.063), (I-302)+(1.032)+(15.064), (I-302)+(1.032)+(16.001), (I-302)+(1.032)+(16.002), (I-302)+(1.032)+(16.003), (I-302)+(1.032)+(16.004), (I-302)+(1.032)+(16.005), (I-302)+(1.032)+(16.006), (I-302)+(1.032)+(16.007), (I-302)+(1.032)+(16.008), (I-302)+(1.032)+(17.001), (I-302)+(1.032)+(17.002), (I-302)+(1.032)+(17.003), (I-302)+(1.032)+(17.004), (I-302)+(1.032)+(17.005), (I-302)+(1.032)+(17.006), (I-302)+(1.032)+(17.007), (I-302)+(1.032)+(17.008), (I-302)+(1.032)+(17.009), (I-302)+(1.032)+(17.010), (I-302)+(1.032)+(17.011), (I-302)+(1.032)+(17.012), (I-302)+(1.032)+(18.001), (I-302)+(1.033)+(1.034), (I-302)+(1.033)+(1.035), (I-302)+(1.033)+(1.036), (I-302)+(1.033)+(1.037), (I-302)+(1.033)+(1.038), (I-302)+(1.033)+(1.039), (I-302)+(1.033)+(1.040), (I-302)+(1.033)+(1.041), (I-302)+(1.033)+(1.042), (I-302)+(1.033)+(1.043), (I-302)+(1.033)+(1.044), (I-302)+(1.033)+(1.045), (I-302)+(1.033)+(1.046), (I-302)+(1.033)+(1.047), (I-302)+(1.033)+(1.048), (I-302)+(1.033)+(1.049), (I-302)+(1.033)+(1.050), (I-302)+(1.033)+(1.051), (I-302)+(1.033)+(1.052), (I-302)+(1.033)+(1.053), (I-302)+(1.033)+(1.054), (I-302)+(1.033)+(1.055), (I-302)+(1.033)+(1.056), (I-302)+(1.033)+(1.057), (I-302)+(1.033)+(1.058), (I-302)+(1.033)+(1.059), (I-302)+(1.033)+(1.060), (I-302)+(1.033)+(1.061), (I-302)+(1.033)+(1.062), (I-302)+(1.033)+(1.063), (I-302)+(1.033)+(1.064), (I-302)+(1.033)+(1.065), (I-302)+(1.033)+(1.066), (I-302)+(1.033)+(1.067), (I-302)+(1.033)+(1.068), (I-302)+(1.033)+(1.069), (I-302)+(1.033)+(1.070), (I-302)+(1.033)+(1.071), (I-302)+(1.033)+(1.072), (I-302)+(1.033)+(1.073), (I-302)+(1.033)+(1.074), (I-302)+(1.033)+(1.075), (I-302)+(1.033)+(1.076), (I-302)+(1.033)+(1.077), (I-302)+(1.033)+(1.078), (I-302)+(1.033)+(1.079), (I-302)+(1.033)+(1.080), (I-302)+(1.033)+(1.081), (I-302)+(1.033)+(1.082), (I-302)+(1.033)+(1.083), (I-302)+(1.033)+(1.084), (I-302)+(1.033)+(1.085), (I-302)+(1.033)+(1.086), (I-302)+(1.033)+(1.087), (I-302)+(1.033)+(1.088), (I-302)+(1.033)+(1.089), (I-302)+(1.033)+(1.090), (I-302)+(1.033)+(1.091), (I-302)+(1.033)+(1.092), (I-302)+(1.033)+(2.001), (I-302)+(1.033)+(2.002), (I-302)+(1.033)+(2.003), (I-302)+(1.033)+(2.004), (I-302)+(1.033)+(2.005), (I-302)+(1.033)+(2.006), (I-302)+(1.033)+(2.007), (I-302)+(1.033)+(2.008), (I-302)+(1.033)+(2.009), (I-302)+(1.033)+(2.010), (I-302)+(1.033)+(2.011), (I-302)+(1.033)+(2.012), (I-302)+(1.033)+(2.013), (I-302)+(1.033)+(2.014), (I-302)+(1.033)+(2.015), (I-302)+(1.033)+(2.016), (I-302)+(1.033)+(2.017), (I-302)+(1.033)+(2.018), (I-302)+(1.033)+(2.019), (I-302)+(1.033)+(2.020), (I-302)+(1.033)+(2.021), (I-302)+(1.033)+(2.022), (I-302)+(1.033)+(2.023), (I-302)+(1.033)+(2.024), (I-302)+(1.033)+(2.025), (I-302)+(1.033)+(2.026), (I-302)+(1.033)+(2.027), (I-302)+(1.033)+(2.028), (I-302)+(1.033)+(2.029), (I-302)+(1.033)+(2.030), (I-302)+(1.033)+(2.031), (I-302)+(1.033)+(2.032), (I-302)+(1.033)+(2.033), (I-302)+(1.033)+(2.034), (I-302)+(1.033)+(2.035), (I-302)+(1.033)+(2.036), (I-302)+(1.033)+(2.037), (I-302)+(1.033)+(2.038), (I-302)+(1.033)+(2.039), (I-302)+(1.033)+(2.040), (I-302)+(1.033)+(2.041), (I-302)+(1.033)+(2.042), (I-302)+(1.033)+(2.043), (I-302)+(1.033)+(2.044), (I-302)+(1.033)+(2.045), (I-302)+(1.033)+(2.046), (I-302)+(1.033)+(2.047), (I-302)+(1.033)+(2.048), (I-302)+(1.033)+(2.049), (I-302)+(1.033)+(2.050), (I-302)+(1.033)+(2.051), (I-302)+(1.033)+(2.052), (I-302)+(1.033)+(2.053), (I-302)+(1.033)+(2.054), (I-302)+(1.033)+(2.055), (I-302)+(1.033)+(2.056), (I-302)+(1.033)+(2.057), (I-302)+(1.033)+(2.058), (I-302)+(1.033)+(2.059), (I-302)+(1.033)+(3.001), (I-302)+(1.033)+(3.002), (I-302)+(1.033)+(3.003), (I-302)+(1.033)+(3.004), (I-302)+(1.033)+(3.005), (I-302)+(1.033)+(3.006), (I-302)+(1.033)+(3.007), (I-302)+(1.033)+(3.008), (I-302)+(1.033)+(3.009), (I-302)+(1.033)+(3.010), (I-302)+(1.033)+(3.011), (I-302)+(1.033)+(3.012), (I-302)+(1.033)+(3.013), (I-302)+(1.033)+(3.014), (I-302)+(1.033)+(3.015), (I-302)+(1.033)+(3.016), (I-302)+(1.033)+(3.017), (I-302)+(1.033)+(3.018), (I-302)+(1.033)+(3.019), (I-302)+(1.033)+(3.020), (I-302)+(1.033)+(3.021), (I-302)+(1.033)+(3.022), (I-302)+(1.033)+(3.023), (I-302)+(1.033)+(3.024), (I-302)+(1.033)+(3.025), (I-302)+(1.033)+(3.026), (I-302)+(1.033)+(3.027), (I-302)+(1.033)+(3.028), (I-302)+(1.033)+(3.029), (I-302)+(1.033)+(3.030), (I-302)+(1.033)+(3.031), (I-302)+(1.033)+(5.001), (I-302)+(1.033)+(5.002), (I-302)+(1.033)+(5.003), (I-302)+(1.033)+(5.004), (I-302)+(1.033)+(5.005), (I-302)+(1.033)+(5.006), (I-302)+(1.033)+(5.007), (I-302)+(1.033)+(5.008), (I-302)+(1.033)+(5.009), (I-302)+(1.033)+(5.010), (I-302)+(1.033)+(5.011), (I-302)+(1.033)+(5.012), (I-302)+(1.033)+(5.013), (I-302)+(1.033)+(5.014), (I-302)+(1.033)+(5.015), (I-302)+(1.033)+(5.016), (I-302)+(1.033)+(5.017), (I-302)+(1.033)+(5.018), (I-302)+(1.033)+(5.019), (I-302)+(1.033)+(5.020), (I-302)+(1.033)+(5.021), (I-302)+(1.033)+(5.022), (I-302)+(1.033)+(5.023), (I-302)+(1.033)+(6.001), (I-302)+(1.033)+(6.002), (I-302)+(1.033)+(6.003), (I-302)+(1.033)+(6.004), (I-302)+(1.033)+(7.001), (I-302)+(1.033)+(7.002), (I-302)+(1.033)+(7.003), (I-302)+(1.033)+(7.004), (I-302)+(1.033)+(7.005), (I-302)+(1.033)+(7.006), (I-302)+(1.033)+(9.001), (I-302)+(1.033)+(9.002), (I-302)+(1.033)+(9.003), (I-302)+(1.033)+(9.004), (I-302)+(1.033)+(9.005), (I-302)+(1.033)+(9.006), (I-302)+(1.033)+(9.007), (I-302)+(1.033)+(9.008), (I-302)+(1.033)+(9.009), (I-302)+(1.033)+(14.001), (I-302)+(1.033)+(14.002), (I-302)+(1.033)+(15.008), (I-302)+(1.033)+(15.011), (I-302)+(1.033)+(15.012), (I-302)+(1.033)+(15.016), (I-302)+(1.033)+(15.025), (I-302)+(1.033)+(15.027), (I-302)+(1.033)+(15.047), (I-302)+(1.033)+(15.063), (I-302)+(1.033)+(15.064), (I-302)+(1.033)+(16.001), (I-302)+(1.033)+(16.002), (I-302)+(1.033)+(16.003), (I-302)+(1.033)+(16.004), (I-302)+(1.033)+(16.005), (I-302)+(1.033)+(16.006), (I-302)+(1.033)+(16.007), (I-302)+(1.033)+(16.008), (I-302)+(1.033)+(17.001), (I-302)+(1.033)+(17.002), (I-302)+(1.033)+(17.003), (I-302)+(1.033)+(17.004), (I-302)+(1.033)+(17.005), (I-302)+(1.033)+(17.006), (I-302)+(1.033)+(17.007), (I-302)+(1.033)+(17.008), (I-302)+(1.033)+(17.009), (I-302)+(1.033)+(17.010), (I-302)+(1.033)+(17.011), (I-302)+(1.033)+(17.012), (I-302)+(1.033)+(18.001), (I-302)+(1.034)+(1.035), (I-302)+(1.034)+(1.036), (I-302)+(1.034)+(1.037), (I-302)+(1.034)+(1.038), (I-302)+(1.034)+(1.039), (I-302)+(1.034)+(1.040), (I-302)+(1.034)+(1.041), (I-302)+(1.034)+(1.042), (I-302)+(1.034)+(1.043), (I-302)+(1.034)+(1.044), (I-302)+(1.034)+(1.045), (I-302)+(1.034)+(1.046), (I-302)+(1.034)+(1.047), (I-302)+(1.034)+(1.048), (I-302)+(1.034)+(1.049), (I-302)+(1.034)+(1.050), (I-302)+(1.034)+(1.051), (I-302)+(1.034)+(1.052), (I-302)+(1.034)+(1.053), (I-302)+(1.034)+(1.054), (I-302)+(1.034)+(1.055), (I-302)+(1.034)+(1.056), (I-302)+(1.034)+(1.057), (I-302)+(1.034)+(1.058), (I-302)+(1.034)+(1.059), (I-302)+(1.034)+(1.060), (I-302)+(1.034)+(1.061), (I-302)+(1.034)+(1.062), (I-302)+(1.034)+(1.063), (I-302)+(1.034)+(1.064), (I-302)+(1.034)+(1.065), (I-302)+(1.034)+(1.066), (I-302)+(1.034)+(1.067), (I-302)+(1.034)+(1.068), (I-302)+(1.034)+(1.069), (I-302)+(1.034)+(1.070), (I-302)+(1.034)+(1.071), (I-302)+(1.034)+(1.072), (I-302)+(1.034)+(1.073), (I-302)+(1.034)+(1.074), (I-302)+(1.034)+(1.075), (I-302)+(1.034)+(1.076), (I-302)+(1.034)+(1.077), (I-302)+(1.034)+(1.078), (I-302)+(1.034)+(1.079), (I-302)+(1.034)+(1.080), (I-302)+(1.034)+(1.081), (I-302)+(1.034)+(1.082), (I-302)+(1.034)+(1.083), (I-302)+(1.034)+(1.084), (I-302)+(1.034)+(1.085), (I-302)+(1.034)+(1.086), (I-302)+(1.034)+(1.087), (I-302)+(1.034)+(1.088), (I-302)+(1.034)+(1.089), (I-302)+(1.034)+(1.090), (I-302)+(1.034)+(1.091), (I-302)+(1.034)+(1.092), (I-302)+(1.034)+(2.001), (I-302)+(1.034)+(2.002), (I-302)+(1.034)+(2.003), (I-302)+(1.034)+(2.004), (I-302)+(1.034)+(2.005), (I-302)+(1.034)+(2.006), (I-302)+(1.034)+(2.007), (I-302)+(1.034)+(2.008), (I-302)+(1.034)+(2.009), (I-302)+(1.034)+(2.010), (I-302)+(1.034)+(2.011), (I-302)+(1.034)+(2.012), (I-302)+(1.034)+(2.013), (I-302)+(1.034)+(2.014), (I-302)+(1.034)+(2.015), (I-302)+(1.034)+(2.016), (I-302)+(1.034)+(2.017), (I-302)+(1.034)+(2.018), (I-302)+(1.034)+(2.019), (I-302)+(1.034)+(2.020), (I-302)+(1.034)+(2.021), (I-302)+(1.034)+(2.022), (I-302)+(1.034)+(2.023), (I-302)+(1.034)+(2.024), (I-302)+(1.034)+(2.025), (I-302)+(1.034)+(2.026), (I-302)+(1.034)+(2.027), (I-302)+(1.034)+(2.028), (I-302)+(1.034)+(2.029), (I-302)+(1.034)+(2.030), (I-302)+(1.034)+(2.031), (I-302)+(1.034)+(2.032), (I-302)+(1.034)+(2.033), (I-302)+(1.034)+(2.034), (I-302)+(1.034)+(2.035), (I-302)+(1.034)+(2.036), (I-302)+(1.034)+(2.037), (I-302)+(1.034)+(2.038), (I-302)+(1.034)+(2.039), (I-302)+(1.034)+(2.040), (I-302)+(1.034)+(2.041), (I-302)+(1.034)+(2.042), (I-302)+(1.034)+(2.043), (I-302)+(1.034)+(2.044), (I-302)+(1.034)+(2.045), (I-302)+(1.034)+(2.046), (I-302)+(1.034)+(2.047), (I-302)+(1.034)+(2.048), (I-302)+(1.034)+(2.049), (I-302)+(1.034)+(2.050), (I-302)+(1.034)+(2.051), (I-302)+(1.034)+(2.052), (I-302)+(1.034)+(2.053), (I-302)+(1.034)+(2.054), (I-302)+(1.034)+(2.055), (I-302)+(1.034)+(2.056), (I-302)+(1.034)+(2.057), (I-302)+(1.034)+(2.058), (I-302)+(1.034)+(2.059), (I-302)+(1.034)+(3.001), (I-302)+(1.034)+(3.002), (I-302)+(1.034)+(3.003), (I-302)+(1.034)+(3.004), (I-302)+(1.034)+(3.005), (I-302)+(1.034)+(3.006), (I-302)+(1.034)+(3.007), (I-302)+(1.034)+(3.008), (I-302)+(1.034)+(3.009), (I-302)+(1.034)+(3.010), (I-302)+(1.034)+(3.011), (I-302)+(1.034)+(3.012), (I-302)+(1.034)+(3.013), (I-302)+(1.034)+(3.014), (I-302)+(1.034)+(3.015), (I-302)+(1.034)+(3.016), (I-302)+(1.034)+(3.017), (I-302)+(1.034)+(3.018), (I-302)+(1.034)+(3.019), (I-302)+(1.034)+(3.020), (I-302)+(1.034)+(3.021), (I-302)+(1.034)+(3.022), (I-302)+(1.034)+(3.023), (I-302)+(1.034)+(3.024), (I-302)+(1.034)+(3.025), (I-302)+(1.034)+(3.026), (I-302)+(1.034)+(3.027), (I-302)+(1.034)+(3.028), (I-302)+(1.034)+(3.029), (I-302)+(1.034)+(3.030), (I-302)+(1.034)+(3.031), (I-302)+(1.034)+(5.001), (I-302)+(1.034)+(5.002), (I-302)+(1.034)+(5.003), (I-302)+(1.034)+(5.004), (I-302)+(1.034)+(5.005), (I-302)+(1.034)+(5.006), (I-302)+(1.034)+(5.007), (I-302)+(1.034)+(5.008), (I-302)+(1.034)+(5.009), (I-302)+(1.034)+(5.010), (I-302)+(1.034)+(5.011), (I-302)+(1.034)+(5.012), (I-302)+(1.034)+(5.013), (I-302)+(1.034)+(5.014), (I-302)+(1.034)+(5.015), (I-302)+(1.034)+(5.016), (I-302)+(1.034)+(5.017), (I-302)+(1.034)+(5.018), (I-302)+(1.034)+(5.019), (I-302)+(1.034)+(5.020), (I-302)+(1.034)+(5.021), (I-302)+(1.034)+(5.022), (I-302)+(1.034)+(5.023), (I-302)+(1.034)+(6.001), (I-302)+(1.034)+(6.002), (I-302)+(1.034)+(6.003), (I-302)+(1.034)+(6.004), (I-302)+(1.034)+(7.001), (I-302)+(1.034)+(7.002), (I-302)+(1.034)+(7.003), (I-302)+(1.034)+(7.004), (I-302)+(1.034)+(7.005), (I-302)+(1.034)+(7.006), (I-302)+(1.034)+(9.001), (I-302)+(1.034)+(9.002), (I-302)+(1.034)+(9.003), (I-302)+(1.034)+(9.004), (I-302)+(1.034)+(9.005), (I-302)+(1.034)+(9.006), (I-302)+(1.034)+(9.007), (I-302)+(1.034)+(9.008), (I-302)+(1.034)+(9.009), (I-302)+(1.034)+(14.001), (I-302)+(1.034)+(14.002), (I-302)+(1.034)+(15.008), (I-302)+(1.034)+(15.011), (I-302)+(1.034)+(15.012), (I-302)+(1.034)+(15.016), (I-302)+(1.034)+(15.025), (I-302)+(1.034)+(15.027), (I-302)+(1.034)+(15.047), (I-302)+(1.034)+(15.063), (I-302)+(1.034)+(15.064), (I-302)+(1.034)+(16.001), (I-302)+(1.034)+(16.002), (I-302)+(1.034)+(16.003), (I-302)+(1.034)+(16.004), (I-302)+(1.034)+(16.005), (I-302)+(1.034)+(16.006), (I-302)+(1.034)+(16.007), (I-302)+(1.034)+(16.008), (I-302)+(1.034)+(17.001), (I-302)+(1.034)+(17.002), (I-302)+(1.034)+(17.003), (I-302)+(1.034)+(17.004), (I-302)+(1.034)+(17.005), (I-302)+(1.034)+(17.006), (I-302)+(1.034)+(17.007), (I-302)+(1.034)+(17.008), (I-302)+(1.034)+(17.009), (I-302)+(1.034)+(17.010), (I-302)+(1.034)+(17.011), (I-302)+(1.034)+(17.012), (I-302)+(1.034)+(18.001), (I-302)+(1.035)+(1.036), (I-302)+(1.035)+(1.037), (I-302)+(1.035)+(1.038), (I-302)+(1.035)+(1.039), (I-302)+(1.035)+(1.040), (I-302)+(1.035)+(1.041), (I-302)+(1.035)+(1.042), (I-302)+(1.035)+(1.043), (I-302)+(1.035)+(1.044), (I-302)+(1.035)+(1.045), (I-302)+(1.035)+(1.046), (I-302)+(1.035)+(1.047), (I-302)+(1.035)+(1.048), (I-302)+(1.035)+(1.049), (I-302)+(1.035)+(1.050), (I-302)+(1.035)+(1.051), (I-302)+(1.035)+(1.052), (I-302)+(1.035)+(1.053), (I-302)+(1.035)+(1.054), (I-302)+(1.035)+(1.055), (I-302)+(1.035)+(1.056), (I-302)+(1.035)+(1.057), (I-302)+(1.035)+(1.058), (I-302)+(1.035)+(1.059), (I-302)+(1.035)+(1.060), (I-302)+(1.035)+(1.061), (I-302)+(1.035)+(1.062), (I-302)+(1.035)+(1.063), (I-302)+(1.035)+(1.064), (I-302)+(1.035)+(1.065), (I-302)+(1.035)+(1.066), (I-302)+(1.035)+(1.067), (I-302)+(1.035)+(1.068), (I-302)+(1.035)+(1.069), (I-302)+(1.035)+(1.070), (I-302)+(1.035)+(1.071), (I-302)+(1.035)+(1.072), (I-302)+(1.035)+(1.073), (I-302)+(1.035)+(1.074), (I-302)+(1.035)+(1.075), (I-302)+(1.035)+(1.076), (I-302)+(1.035)+(1.077), (I-302)+(1.035)+(1.078), (I-302)+(1.035)+(1.079), (I-302)+(1.035)+(1.080), (I-302)+(1.035)+(1.081), (I-302)+(1.035)+(1.082), (I-302)+(1.035)+(1.083), (I-302)+(1.035)+(1.084), (I-302)+(1.035)+(1.085), (I-302)+(1.035)+(1.086), (I-302)+(1.035)+(1.087), (I-302)+(1.035)+(1.088), (I-302)+(1.035)+(1.089), (I-302)+(1.035)+(1.090), (I-302)+(1.035)+(1.091), (I-302)+(1.035)+(1.092), (I-302)+(1.035)+(2.001), (I-302)+(1.035)+(2.002), (I-302)+(1.035)+(2.003), (I-302)+(1.035)+(2.004), (I-302)+(1.035)+(2.005), (I-302)+(1.035)+(2.006), (I-302)+(1.035)+(2.007), (I-302)+(1.035)+(2.008), (I-302)+(1.035)+(2.009), (I-302)+(1.035)+(2.010), (I-302)+(1.035)+(2.011), (I-302)+(1.035)+(2.012), (I-302)+(1.035)+(2.013), (I-302)+(1.035)+(2.014), (I-302)+(1.035)+(2.015), (I-302)+(1.035)+(2.016), (I-302)+(1.035)+(2.017), (I-302)+(1.035)+(2.018), (I-302)+(1.035)+(2.019), (I-302)+(1.035)+(2.020), (I-302)+(1.035)+(2.021), (I-302)+(1.035)+(2.022), (I-302)+(1.035)+(2.023), (I-302)+(1.035)+(2.024), (I-302)+(1.035)+(2.025), (I-302)+(1.035)+(2.026), (I-302)+(1.035)+(2.027), (I-302)+(1.035)+(2.028), (I-302)+(1.035)+(2.029), (I-302)+(1.035)+(2.030), (I-302)+(1.035)+(2.031), (I-302)+(1.035)+(2.032), (I-302)+(1.035)+(2.033), (I-302)+(1.035)+(2.034), (I-302)+(1.035)+(2.035), (I-302)+(1.035)+(2.036), (I-302)+(1.035)+(2.037), (I-302)+(1.035)+(2.038), (I-302)+(1.035)+(2.039), (I-302)+(1.035)+(2.040), (I-302)+(1.035)+(2.041), (I-302)+(1.035)+(2.042), (I-302)+(1.035)+(2.043), (I-302)+(1.035)+(2.044), (I-302)+(1.035)+(2.045), (I-302)+(1.035)+(2.046), (I-302)+(1.035)+(2.047), (I-302)+(1.035)+(2.048), (I-302)+(1.035)+(2.049), (I-302)+(1.035)+(2.050), (I-302)+(1.035)+(2.051), (I-302)+(1.035)+(2.052), (I-302)+(1.035)+(2.053), (I-302)+(1.035)+(2.054), (I-302)+(1.035)+(2.055), (I-302)+(1.035)+(2.056), (I-302)+(1.035)+(2.057), (I-302)+(1.035)+(2.058), (I-302)+(1.035)+(2.059), (I-302)+(1.035)+(3.001), (I-302)+(1.035)+(3.002), (I-302)+(1.035)+(3.003), (I-302)+(1.035)+(3.004), (I-302)+(1.035)+(3.005), (I-302)+(1.035)+(3.006), (I-302)+(1.035)+(3.007), (I-302)+(1.035)+(3.008), (I-302)+(1.035)+(3.009), (I-302)+(1.035)+(3.010), (I-302)+(1.035)+(3.011), (I-302)+(1.035)+(3.012), (I-302)+(1.035)+(3.013), (I-302)+(1.035)+(3.014), (I-302)+(1.035)+(3.015), (I-302)+(1.035)+(3.016), (I-302)+(1.035)+(3.017), (I-302)+(1.035)+(3.018), (I-302)+(1.035)+(3.019), (I-302)+(1.035)+(3.020), (I-302)+(1.035)+(3.021), (I-302)+(1.035)+(3.022), (I-302)+(1.035)+(3.023), (I-302)+(1.035)+(3.024), (I-302)+(1.035)+(3.025), (I-302)+(1.035)+(3.026), (I-302)+(1.035)+(3.027), (I-302)+(1.035)+(3.028), (I-302)+(1.035)+(3.029), (I-302)+(1.035)+(3.030), (I-302)+(1.035)+(3.031), (I-302)+(1.035)+(5.001), (I-302)+(1.035)+(5.002), (I-302)+(1.035)+(5.003), (I-302)+(1.035)+(5.004), (I-302)+(1.035)+(5.005), (I-302)+(1.035)+(5.006), (I-302)+(1.035)+(5.007), (I-302)+(1.035)+(5.008), (I-302)+(1.035)+(5.009), (I-302)+(1.035)+(5.010), (I-302)+(1.035)+(5.011), (I-302)+(1.035)+(5.012), (I-302)+(1.035)+(5.013), (I-302)+(1.035)+(5.014), (I-302)+(1.035)+(5.015), (I-302)+(1.035)+(5.016), (I-302)+(1.035)+(5.017), (I-302)+(1.035)+(5.018), (I-302)+(1.035)+(5.019), (I-302)+(1.035)+(5.020), (I-302)+(1.035)+(5.021), (I-302)+(1.035)+(5.022), (I-302)+(1.035)+(5.023), (I-302)+(1.035)+(6.001), (I-302)+(1.035)+(6.002), (I-302)+(1.035)+(6.003), (I-302)+(1.035)+(6.004), (I-302)+(1.035)+(7.001), (I-302)+(1.035)+(7.002), (I-302)+(1.035)+(7.003), (I-302)+(1.035)+(7.004), (I-302)+(1.035)+(7.005), (I-302)+(1.035)+(7.006), (I-302)+(1.035)+(9.001), (I-302)+(1.035)+(9.002), (I-302)+(1.035)+(9.003), (I-302)+(1.035)+(9.004), (I-302)+(1.035)+(9.005), (I-302)+(1.035)+(9.006), (I-302)+(1.035)+(9.007), (I-302)+(1.035)+(9.008), (I-302)+(1.035)+(9.009), (I-302)+(1.035)+(14.001), (I-302)+(1.035)+(14.002), (I-302)+(1.035)+(15.008), (I-302)+(1.035)+(15.011), (I-302)+(1.035)+(15.012), (I-302)+(1.035)+(15.016), (I-302)+(1.035)+(15.025), (I-302)+(1.035)+(15.027), (I-302)+(1.035)+(15.047), (I-302)+(1.035)+(15.063), (I-302)+(1.035)+(15.064), (I-302)+(1.035)+(16.001), (I-302)+(1.035)+(16.002), (I-302)+(1.035)+(16.003), (I-302)+(1.035)+(16.004), (I-302)+(1.035)+(16.005), (I-302)+(1.035)+(16.006), (I-302)+(1.035)+(16.007), (I-302)+(1.035)+(16.008), (I-302)+(1.035)+(17.001), (I-302)+(1.035)+(17.002), (I-302)+(1.035)+(17.003), (I-302)+(1.035)+(17.004), (I-302)+(1.035)+(17.005), (I-302)+(1.035)+(17.006), (I-302)+(1.035)+(17.007), (I-302)+(1.035)+(17.008), (I-302)+(1.035)+(17.009), (I-302)+(1.035)+(17.010), (I-302)+(1.035)+(17.011), (I-302)+(1.035)+(17.012), (I-302)+(1.035)+(18.001), (I-302)+(1.036)+(1.037), (I-302)+(1.036)+(1.038), (I-302)+(1.036)+(1.039), (I-302)+(1.036)+(1.040), (I-302)+(1.036)+(1.041), (I-302)+(1.036)+(1.042), (I-302)+(1.036)+(1.043), (I-302)+(1.036)+(1.044), (I-302)+(1.036)+(1.045), (I-302)+(1.036)+(1.046), (I-302)+(1.036)+(1.047), (I-302)+(1.036)+(1.048), (I-302)+(1.036)+(1.049), (I-302)+(1.036)+(1.050), (I-302)+(1.036)+(1.051), (I-302)+(1.036)+(1.052), (I-302)+(1.036)+(1.053), (I-302)+(1.036)+(1.054), (I-302)+(1.036)+(1.055), (I-302)+(1.036)+(1.056), (I-302)+(1.036)+(1.057), (I-302)+(1.036)+(1.058), (I-302)+(1.036)+(1.059), (I-302)+(1.036)+(1.060), (I-302)+(1.036)+(1.061), (I-302)+(1.036)+(1.062), (I-302)+(1.036)+(1.063), (I-302)+(1.036)+(1.064), (I-302)+(1.036)+(1.065), (I-302)+(1.036)+(1.066), (I-302)+(1.036)+(1.067), (I-302)+(1.036)+(1.068), (I-302)+(1.036)+(1.069), (I-302)+(1.036)+(1.070), (I-302)+(1.036)+(1.071), (I-302)+(1.036)+(1.072), (I-302)+(1.036)+(1.073), (I-302)+(1.036)+(1.074), (I-302)+(1.036)+(1.075), (I-302)+(1.036)+(1.076), (I-302)+(1.036)+(1.077), (I-302)+(1.036)+(1.078), (I-302)+(1.036)+(1.079), (I-302)+(1.036)+(1.080), (I-302)+(1.036)+(1.081), (I-302)+(1.036)+(1.082), (I-302)+(1.036)+(1.083), (I-302)+(1.036)+(1.084), (I-302)+(1.036)+(1.085), (I-302)+(1.036)+(1.086), (I-302)+(1.036)+(1.087), (I-302)+(1.036)+(1.088), (I-302)+(1.036)+(1.089), (I-302)+(1.036)+(1.090), (I-302)+(1.036)+(1.091), (I-302)+(1.036)+(1.092), (I-302)+(1.036)+(2.001), (I-302)+(1.036)+(2.002), (I-302)+(1.036)+(2.003), (I-302)+(1.036)+(2.004), (I-302)+(1.036)+(2.005), (I-302)+(1.036)+(2.006), (I-302)+(1.036)+(2.007), (I-302)+(1.036)+(2.008), (I-302)+(1.036)+(2.009), (I-302)+(1.036)+(2.010), (I-302)+(1.036)+(2.011), (I-302)+(1.036)+(2.012), (I-302)+(1.036)+(2.013), (I-302)+(1.036)+(2.014), (I-302)+(1.036)+(2.015), (I-302)+(1.036)+(2.016), (I-302)+(1.036)+(2.017), (I-302)+(1.036)+(2.018), (I-302)+(1.036)+(2.019), (I-302)+(1.036)+(2.020), (I-302)+(1.036)+(2.021), (I-302)+(1.036)+(2.022), (I-302)+(1.036)+(2.023), (I-302)+(1.036)+(2.024), (I-302)+(1.036)+(2.025), (I-302)+(1.036)+(2.026), (I-302)+(1.036)+(2.027), (I-302)+(1.036)+(2.028), (I-302)+(1.036)+(2.029), (I-302)+(1.036)+(2.030), (I-302)+(1.036)+(2.031), (I-302)+(1.036)+(2.032), (I-302)+(1.036)+(2.033), (I-302)+(1.036)+(2.034), (I-302)+(1.036)+(2.035), (I-302)+(1.036)+(2.036), (I-302)+(1.036)+(2.037), (I-302)+(1.036)+(2.038), (I-302)+(1.036)+(2.039), (I-302)+(1.036)+(2.040), (I-302)+(1.036)+(2.041), (I-302)+(1.036)+(2.042), (I-302)+(1.036)+(2.043), (I-302)+(1.036)+(2.044), (I-302)+(1.036)+(2.045), (I-302)+(1.036)+(2.046), (I-302)+(1.036)+(2.047), (I-302)+(1.036)+(2.048), (I-302)+(1.036)+(2.049), (I-302)+(1.036)+(2.050), (I-302)+(1.036)+(2.051), (I-302)+(1.036)+(2.052), (I-302)+(1.036)+(2.053), (I-302)+(1.036)+(2.054), (I-302)+(1.036)+(2.055), (I-302)+(1.036)+(2.056), (I-302)+(1.036)+(2.057), (I-302)+(1.036)+(2.058), (I-302)+(1.036)+(2.059), (I-302)+(1.036)+(3.001), (I-302)+(1.036)+(3.002), (I-302)+(1.036)+(3.003), (I-302)+(1.036)+(3.004), (I-302)+(1.036)+(3.005), (I-302)+(1.036)+(3.006), (I-302)+(1.036)+(3.007), (I-302)+(1.036)+(3.008), (I-302)+(1.036)+(3.009), (I-302)+(1.036)+(3.010), (I-302)+(1.036)+(3.011), (I-302)+(1.036)+(3.012), (I-302)+(1.036)+(3.013), (I-302)+(1.036)+(3.014), (I-302)+(1.036)+(3.015), (I-302)+(1.036)+(3.016), (I-302)+(1.036)+(3.017), (I-302)+(1.036)+(3.018), (I-302)+(1.036)+(3.019), (I-302)+(1.036)+(3.020), (I-302)+(1.036)+(3.021), (I-302)+(1.036)+(3.022), (I-302)+(1.036)+(3.023), (I-302)+(1.036)+(3.024), (I-302)+(1.036)+(3.025), (I-302)+(1.036)+(3.026), (I-302)+(1.036)+(3.027), (I-302)+(1.036)+(3.028), (I-302)+(1.036)+(3.029), (I-302)+(1.036)+(3.030), (I-302)+(1.036)+(3.031), (I-302)+(1.036)+(5.001), (I-302)+(1.036)+(5.002), (I-302)+(1.036)+(5.003), (I-302)+(1.036)+(5.004), (I-302)+(1.036)+(5.005), (I-302)+(1.036)+(5.006), (I-302)+(1.036)+(5.007), (I-302)+(1.036)+(5.008), (I-302)+(1.036)+(5.009), (I-302)+(1.036)+(5.010), (I-302)+(1.036)+(5.011), (I-302)+(1.036)+(5.012), (I-302)+(1.036)+(5.013), (I-302)+(1.036)+(5.014), (I-302)+(1.036)+(5.015), (I-302)+(1.036)+(5.016), (I-302)+(1.036)+(5.017), (I-302)+(1.036)+(5.018), (I-302)+(1.036)+(5.019), (I-302)+(1.036)+(5.020), (I-302)+(1.036)+(5.021), (I-302)+(1.036)+(5.022), (I-302)+(1.036)+(5.023), (I-302)+(1.036)+(6.001), (I-302)+(1.036)+(6.002), (I-302)+(1.036)+(6.003), (I-302)+(1.036)+(6.004), (I-302)+(1.036)+(7.001), (I-302)+(1.036)+(7.002), (I-302)+(1.036)+(7.003), (I-302)+(1.036)+(7.004), (I-302)+(1.036)+(7.005), (I-302)+(1.036)+(7.006), (I-302)+(1.036)+(9.001), (I-302)+(1.036)+(9.002), (I-302)+(1.036)+(9.003), (I-302)+(1.036)+(9.004), (I-302)+(1.036)+(9.005), (I-302)+(1.036)+(9.006), (I-302)+(1.036)+(9.007), (I-302)+(1.036)+(9.008), (I-302)+(1.036)+(9.009), (I-302)+(1.036)+(14.001), (I-302)+(1.036)+(14.002), (I-302)+(1.036)+(15.008), (I-302)+(1.036)+(15.011), (I-302)+(1.036)+(15.012), (I-302)+(1.036)+(15.016), (I-302)+(1.036)+(15.025), (I-302)+(1.036)+(15.027), (I-302)+(1.036)+(15.047), (I-302)+(1.036)+(15.063), (I-302)+(1.036)+(15.064), (I-302)+(1.036)+(16.001), (I-302)+(1.036)+(16.002), (I-302)+(1.036)+(16.003), (I-302)+(1.036)+(16.004), (I-302)+(1.036)+(16.005), (I-302)+(1.036)+(16.006), (I-302)+(1.036)+(16.007), (I-302)+(1.036)+(16.008), (I-302)+(1.036)+(17.001), (I-302)+(1.036)+(17.002), (I-302)+(1.036)+(17.003), (I-302)+(1.036)+(17.004), (I-302)+(1.036)+(17.005), (I-302)+(1.036)+(17.006), (I-302)+(1.036)+(17.007), (I-302)+(1.036)+(17.008), (I-302)+(1.036)+(17.009), (I-302)+(1.036)+(17.010), (I-302)+(1.036)+(17.011), (I-302)+(1.036)+(17.012), (I-302)+(1.036)+(18.001), (I-302)+(1.037)+(1.038), (I-302)+(1.037)+(1.039), (I-302)+(1.037)+(1.040), (I-302)+(1.037)+(1.041), (I-302)+(1.037)+(1.042), (I-302)+(1.037)+(1.043), (I-302)+(1.037)+(1.044), (I-302)+(1.037)+(1.045), (I-302)+(1.037)+(1.046), (I-302)+(1.037)+(1.047), (I-302)+(1.037)+(1.048), (I-302)+(1.037)+(1.049), (I-302)+(1.037)+(1.050), (I-302)+(1.037)+(1.051), (I-302)+(1.037)+(1.052), (I-302)+(1.037)+(1.053), (I-302)+(1.037)+(1.054), (I-302)+(1.037)+(1.055), (I-302)+(1.037)+(1.056), (I-302)+(1.037)+(1.057), (I-302)+(1.037)+(1.058), (I-302)+(1.037)+(1.059), (I-302)+(1.037)+(1.060), (I-302)+(1.037)+(1.061), (I-302)+(1.037)+(1.062), (I-302)+(1.037)+(1.063), (I-302)+(1.037)+(1.064), (I-302)+(1.037)+(1.065), (I-302)+(1.037)+(1.066), (I-302)+(1.037)+(1.067), (I-302)+(1.037)+(1.068), (I-302)+(1.037)+(1.069), (I-302)+(1.037)+(1.070), (I-302)+(1.037)+(1.071), (I-302)+(1.037)+(1.072), (I-302)+(1.037)+(1.073), (I-302)+(1.037)+(1.074), (I-302)+(1.037)+(1.075), (I-302)+(1.037)+(1.076), (I-302)+(1.037)+(1.077), (I-302)+(1.037)+(1.078), (I-302)+(1.037)+(1.079), (I-302)+(1.037)+(1.080), (I-302)+(1.037)+(1.081), (I-302)+(1.037)+(1.082), (I-302)+(1.037)+(1.083), (I-302)+(1.037)+(1.084), (I-302)+(1.037)+(1.085), (I-302)+(1.037)+(1.086), (I-302)+(1.037)+(1.087), (I-302)+(1.037)+(1.088), (I-302)+(1.037)+(1.089), (I-302)+(1.037)+(1.090), (I-302)+(1.037)+(1.091), (I-302)+(1.037)+(1.092), (I-302)+(1.037)+(2.001), (I-302)+(1.037)+(2.002), (I-302)+(1.037)+(2.003), (I-302)+(1.037)+(2.004), (I-302)+(1.037)+(2.005), (I-302)+(1.037)+(2.006), (I-302)+(1.037)+(2.007), (I-302)+(1.037)+(2.008), (I-302)+(1.037)+(2.009), (I-302)+(1.037)+(2.010), (I-302)+(1.037)+(2.011), (I-302)+(1.037)+(2.012), (I-302)+(1.037)+(2.013), (I-302)+(1.037)+(2.014), (I-302)+(1.037)+(2.015), (I-302)+(1.037)+(2.016), (I-302)+(1.037)+(2.017), (I-302)+(1.037)+(2.018), (I-302)+(1.037)+(2.019), (I-302)+(1.037)+(2.020), (I-302)+(1.037)+(2.021), (I-302)+(1.037)+(2.022), (I-302)+(1.037)+(2.023), (I-302)+(1.037)+(2.024), (I-302)+(1.037)+(2.025), (I-302)+(1.037)+(2.026), (I-302)+(1.037)+(2.027), (I-302)+(1.037)+(2.028), (I-302)+(1.037)+(2.029), (I-302)+(1.037)+(2.030), (I-302)+(1.037)+(2.031), (I-302)+(1.037)+(2.032), (I-302)+(1.037)+(2.033), (I-302)+(1.037)+(2.034), (I-302)+(1.037)+(2.035), (I-302)+(1.037)+(2.036), (I-302)+(1.037)+(2.037), (I-302)+(1.037)+(2.038), (I-302)+(1.037)+(2.039), (I-302)+(1.037)+(2.040), (I-302)+(1.037)+(2.041), (I-302)+(1.037)+(2.042), (I-302)+(1.037)+(2.043), (I-302)+(1.037)+(2.044), (I-302)+(1.037)+(2.045), (I-302)+(1.037)+(2.046), (I-302)+(1.037)+(2.047), (I-302)+(1.037)+(2.048), (I-302)+(1.037)+(2.049), (I-302)+(1.037)+(2.050), (I-302)+(1.037)+(2.051), (I-302)+(1.037)+(2.052), (I-302)+(1.037)+(2.053), (I-302)+(1.037)+(2.054), (I-302)+(1.037)+(2.055), (I-302)+(1.037)+(2.056), (I-302)+(1.037)+(2.057), (I-302)+(1.037)+(2.058), (I-302)+(1.037)+(2.059), (I-302)+(1.037)+(3.001), (I-302)+(1.037)+(3.002), (I-302)+(1.037)+(3.003), (I-302)+(1.037)+(3.004), (I-302)+(1.037)+(3.005), (I-302)+(1.037)+(3.006), (I-302)+(1.037)+(3.007), (I-302)+(1.037)+(3.008), (I-302)+(1.037)+(3.009), (I-302)+(1.037)+(3.010), (I-302)+(1.037)+(3.011), (I-302)+(1.037)+(3.012), (I-302)+(1.037)+(3.013), (I-302)+(1.037)+(3.014), (I-302)+(1.037)+(3.015), (I-302)+(1.037)+(3.016), (I-302)+(1.037)+(3.017), (I-302)+(1.037)+(3.018), (I-302)+(1.037)+(3.019), (I-302)+(1.037)+(3.020), (I-302)+(1.037)+(3.021), (I-302)+(1.037)+(3.022), (I-302)+(1.037)+(3.023), (I-302)+(1.037)+(3.024), (I-302)+(1.037)+(3.025), (I-302)+(1.037)+(3.026), (I-302)+(1.037)+(3.027), (I-302)+(1.037)+(3.028), (I-302)+(1.037)+(3.029), (I-302)+(1.037)+(3.030), (I-302)+(1.037)+(3.031), (I-302)+(1.037)+(5.001), (I-302)+(1.037)+(5.002), (I-302)+(1.037)+(5.003), (I-302)+(1.037)+(5.004), (I-302)+(1.037)+(5.005), (I-302)+(1.037)+(5.006), (I-302)+(1.037)+(5.007), (I-302)+(1.037)+(5.008), (I-302)+(1.037)+(5.009), (I-302)+(1.037)+(5.010), (I-302)+(1.037)+(5.011), (I-302)+(1.037)+(5.012), (I-302)+(1.037)+(5.013), (I-302)+(1.037)+(5.014), (I-302)+(1.037)+(5.015), (I-302)+(1.037)+(5.016), (I-302)+(1.037)+(5.017), (I-302)+(1.037)+(5.018), (I-302)+(1.037)+(5.019), (I-302)+(1.037)+(5.020), (I-302)+(1.037)+(5.021), (I-302)+(1.037)+(5.022), (I-302)+(1.037)+(5.023), (I-302)+(1.037)+(6.001), (I-302)+(1.037)+(6.002), (I-302)+(1.037)+(6.003), (I-302)+(1.037)+(6.004), (I-302)+(1.037)+(7.001), (I-302)+(1.037)+(7.002), (I-302)+(1.037)+(7.003), (I-302)+(1.037)+(7.004), (I-302)+(1.037)+(7.005), (I-302)+(1.037)+(7.006), (I-302)+(1.037)+(9.001), (I-302)+(1.037)+(9.002), (I-302)+(1.037)+(9.003), (I-302)+(1.037)+(9.004), (I-302)+(1.037)+(9.005), (I-302)+(1.037)+(9.006), (I-302)+(1.037)+(9.007), (I-302)+(1.037)+(9.008), (I-302)+(1.037)+(9.009), (I-302)+(1.037)+(14.001), (I-302)+(1.037)+(14.002), (I-302)+(1.037)+(15.008), (I-302)+(1.037)+(15.011), (I-302)+(1.037)+(15.012), (I-302)+(1.037)+(15.016), (I-302)+(1.037)+(15.025), (I-302)+(1.037)+(15.027), (I-302)+(1.037)+(15.047), (I-302)+(1.037)+(15.063), (I-302)+(1.037)+(15.064), (I-302)+(1.037)+(16.001), (I-302)+(1.037)+(16.002), (I-302)+(1.037)+(16.003), (I-302)+(1.037)+(16.004), (I-302)+(1.037)+(16.005), (I-302)+(1.037)+(16.006), (I-302)+(1.037)+(16.007), (I-302)+(1.037)+(16.008), (I-302)+(1.037)+(17.001), (I-302)+(1.037)+(17.002), (I-302)+(1.037)+(17.003), (I-302)+(1.037)+(17.004), (I-302)+(1.037)+(17.005), (I-302)+(1.037)+(17.006), (I-302)+(1.037)+(17.007), (I-302)+(1.037)+(17.008), (I-302)+(1.037)+(17.009), (I-302)+(1.037)+(17.010), (I-302)+(1.037)+(17.011), (I-302)+(1.037)+(17.012), (I-302)+(1.037)+(18.001), (I-302)+(1.038)+(1.039), (I-302)+(1.038)+(1.040), (I-302)+(1.038)+(1.041), (I-302)+(1.038)+(1.042), (I-302)+(1.038)+(1.043), (I-302)+(1.038)+(1.044), (I-302)+(1.038)+(1.045), (I-302)+(1.038)+(1.046), (I-302)+(1.038)+(1.047), (I-302)+(1.038)+(1.048), (I-302)+(1.038)+(1.049), (I-302)+(1.038)+(1.050), (I-302)+(1.038)+(1.051), (I-302)+(1.038)+(1.052), (I-302)+(1.038)+(1.053), (I-302)+(1.038)+(1.054), (I-302)+(1.038)+(1.055), (I-302)+(1.038)+(1.056), (I-302)+(1.038)+(1.057), (I-302)+(1.038)+(1.058), (I-302)+(1.038)+(1.059), (I-302)+(1.038)+(1.060), (I-302)+(1.038)+(1.061), (I-302)+(1.038)+(1.062), (I-302)+(1.038)+(1.063), (I-302)+(1.038)+(1.064), (I-302)+(1.038)+(1.065), (I-302)+(1.038)+(1.066), (I-302)+(1.038)+(1.067), (I-302)+(1.038)+(1.068), (I-302)+(1.038)+(1.069), (I-302)+(1.038)+(1.070), (I-302)+(1.038)+(1.071), (I-302)+(1.038)+(1.072), (I-302)+(1.038)+(1.073), (I-302)+(1.038)+(1.074), (I-302)+(1.038)+(1.075), (I-302)+(1.038)+(1.076), (I-302)+(1.038)+(1.077), (I-302)+(1.038)+(1.078), (I-302)+(1.038)+(1.079), (I-302)+(1.038)+(1.080), (I-302)+(1.038)+(1.081), (I-302)+(1.038)+(1.082), (I-302)+(1.038)+(1.083), (I-302)+(1.038)+(1.084), (I-302)+(1.038)+(1.085), (I-302)+(1.038)+(1.086), (I-302)+(1.038)+(1.087), (I-302)+(1.038)+(1.088), (I-302)+(1.038)+(1.089), (I-302)+(1.038)+(1.090), (I-302)+(1.038)+(1.091), (I-302)+(1.038)+(1.092), (I-302)+(1.038)+(2.001), (I-302)+(1.038)+(2.002), (I-302)+(1.038)+(2.003), (I-302)+(1.038)+(2.004), (I-302)+(1.038)+(2.005), (I-302)+(1.038)+(2.006), (I-302)+(1.038)+(2.007), (I-302)+(1.038)+(2.008), (I-302)+(1.038)+(2.009), (I-302)+(1.038)+(2.010), (I-302)+(1.038)+(2.011), (I-302)+(1.038)+(2.012), (I-302)+(1.038)+(2.013), (I-302)+(1.038)+(2.014), (I-302)+(1.038)+(2.015), (I-302)+(1.038)+(2.016), (I-302)+(1.038)+(2.017), (I-302)+(1.038)+(2.018), (I-302)+(1.038)+(2.019), (I-302)+(1.038)+(2.020), (I-302)+(1.038)+(2.021), (I-302)+(1.038)+(2.022), (I-302)+(1.038)+(2.023), (I-302)+(1.038)+(2.024), (I-302)+(1.038)+(2.025), (I-302)+(1.038)+(2.026), (I-302)+(1.038)+(2.027), (I-302)+(1.038)+(2.028), (I-302)+(1.038)+(2.029), (I-302)+(1.038)+(2.030), (I-302)+(1.038)+(2.031), (I-302)+(1.038)+(2.032), (I-302)+(1.038)+(2.033), (I-302)+(1.038)+(2.034), (I-302)+(1.038)+(2.035), (I-302)+(1.038)+(2.036), (I-302)+(1.038)+(2.037), (I-302)+(1.038)+(2.038), (I-302)+(1.038)+(2.039), (I-302)+(1.038)+(2.040), (I-302)+(1.038)+(2.041), (I-302)+(1.038)+(2.042), (I-302)+(1.038)+(2.043), (I-302)+(1.038)+(2.044), (I-302)+(1.038)+(2.045), (I-302)+(1.038)+(2.046), (I-302)+(1.038)+(2.047), (I-302)+(1.038)+(2.048), (I-302)+(1.038)+(2.049), (I-302)+(1.038)+(2.050), (I-302)+(1.038)+(2.051), (I-302)+(1.038)+(2.052), (I-302)+(1.038)+(2.053), (I-302)+(1.038)+(2.054), (I-302)+(1.038)+(2.055), (I-302)+(1.038)+(2.056), (I-302)+(1.038)+(2.057), (I-302)+(1.038)+(2.058), (I-302)+(1.038)+(2.059), (I-302)+(1.038)+(3.001), (I-302)+(1.038)+(3.002), (I-302)+(1.038)+(3.003), (I-302)+(1.038)+(3.004), (I-302)+(1.038)+(3.005), (I-302)+(1.038)+(3.006), (I-302)+(1.038)+(3.007), (I-302)+(1.038)+(3.008), (I-302)+(1.038)+(3.009), (I-302)+(1.038)+(3.010), (I-302)+(1.038)+(3.011), (I-302)+(1.038)+(3.012), (I-302)+(1.038)+(3.013), (I-302)+(1.038)+(3.014), (I-302)+(1.038)+(3.015), (I-302)+(1.038)+(3.016), (I-302)+(1.038)+(3.017), (I-302)+(1.038)+(3.018), (I-302)+(1.038)+(3.019), (I-302)+(1.038)+(3.020), (I-302)+(1.038)+(3.021), (I-302)+(1.038)+(3.022), (I-302)+(1.038)+(3.023), (I-302)+(1.038)+(3.024), (I-302)+(1.038)+(3.025), (I-302)+(1.038)+(3.026), (I-302)+(1.038)+(3.027), (I-302)+(1.038)+(3.028), (I-302)+(1.038)+(3.029), (I-302)+(1.038)+(3.030), (I-302)+(1.038)+(3.031), (I-302)+(1.038)+(5.001), (I-302)+(1.038)+(5.002), (I-302)+(1.038)+(5.003), (I-302)+(1.038)+(5.004), (I-302)+(1.038)+(5.005), (I-302)+(1.038)+(5.006), (I-302)+(1.038)+(5.007), (I-302)+(1.038)+(5.008), (I-302)+(1.038)+(5.009), (I-302)+(1.038)+(5.010), (I-302)+(1.038)+(5.011), (I-302)+(1.038)+(5.012), (I-302)+(1.038)+(5.013), (I-302)+(1.038)+(5.014), (I-302)+(1.038)+(5.015), (I-302)+(1.038)+(5.016), (I-302)+(1.038)+(5.017), (I-302)+(1.038)+(5.018), (I-302)+(1.038)+(5.019), (I-302)+(1.038)+(5.020), (I-302)+(1.038)+(5.021), (I-302)+(1.038)+(5.022), (I-302)+(1.038)+(5.023), (I-302)+(1.038)+(6.001), (I-302)+(1.038)+(6.002), (I-302)+(1.038)+(6.003), (I-302)+(1.038)+(6.004), (I-302)+(1.038)+(7.001), (I-302)+(1.038)+(7.002), (I-302)+(1.038)+(7.003), (I-302)+(1.038)+(7.004), (I-302)+(1.038)+(7.005), (I-302)+(1.038)+(7.006), (I-302)+(1.038)+(9.001), (I-302)+(1.038)+(9.002), (I-302)+(1.038)+(9.003), (I-302)+(1.038)+(9.004), (I-302)+(1.038)+(9.005), (I-302)+(1.038)+(9.006), (I-302)+(1.038)+(9.007), (I-302)+(1.038)+(9.008), (I-302)+(1.038)+(9.009), (I-302)+(1.038)+(14.001), (I-302)+(1.038)+(14.002), (I-302)+(1.038)+(15.008), (I-302)+(1.038)+(15.011), (I-302)+(1.038)+(15.012), (I-302)+(1.038)+(15.016), (I-302)+(1.038)+(15.025), (I-302)+(1.038)+(15.027), (I-302)+(1.038)+(15.047), (I-302)+(1.038)+(15.063), (I-302)+(1.038)+(15.064), (I-302)+(1.038)+(16.001), (I-302)+(1.038)+(16.002), (I-302)+(1.038)+(16.003), (I-302)+(1.038)+(16.004), (I-302)+(1.038)+(16.005), (I-302)+(1.038)+(16.006), (I-302)+(1.038)+(16.007), (I-302)+(1.038)+(16.008), (I-302)+(1.038)+(17.001), (I-302)+(1.038)+(17.002), (I-302)+(1.038)+(17.003), (I-302)+(1.038)+(17.004), (I-302)+(1.038)+(17.005), (I-302)+(1.038)+(17.006), (I-302)+(1.038)+(17.007), (I-302)+(1.038)+(17.008), (I-302)+(1.038)+(17.009), (I-302)+(1.038)+(17.010), (I-302)+(1.038)+(17.011), (I-302)+(1.038)+(17.012), (I-302)+(1.038)+(18.001), (I-302)+(1.039)+(1.040), (I-302)+(1.039)+(1.041), (I-302)+(1.039)+(1.042), (I-302)+(1.039)+(1.043), (I-302)+(1.039)+(1.044), (I-302)+(1.039)+(1.045), (I-302)+(1.039)+(1.046), (I-302)+(1.039)+(1.047), (I-302)+(1.039)+(1.048), (I-302)+(1.039)+(1.049), (I-302)+(1.039)+(1.050), (I-302)+(1.039)+(1.051), (I-302)+(1.039)+(1.052), (I-302)+(1.039)+(1.053), (I-302)+(1.039)+(1.054), (I-302)+(1.039)+(1.055), (I-302)+(1.039)+(1.056), (I-302)+(1.039)+(1.057), (I-302)+(1.039)+(1.058), (I-302)+(1.039)+(1.059), (I-302)+(1.039)+(1.060), (I-302)+(1.039)+(1.061), (I-302)+(1.039)+(1.062), (I-302)+(1.039)+(1.063), (I-302)+(1.039)+(1.064), (I-302)+(1.039)+(1.065), (I-302)+(1.039)+(1.066), (I-302)+(1.039)+(1.067), (I-302)+(1.039)+(1.068), (I-302)+(1.039)+(1.069), (I-302)+(1.039)+(1.070), (I-302)+(1.039)+(1.071), (I-302)+(1.039)+(1.072), (I-302)+(1.039)+(1.073), (I-302)+(1.039)+(1.074), (I-302)+(1.039)+(1.075), (I-302)+(1.039)+(1.076), (I-302)+(1.039)+(1.077), (I-302)+(1.039)+(1.078), (I-302)+(1.039)+(1.079), (I-302)+(1.039)+(1.080), (I-302)+(1.039)+(1.081), (I-302)+(1.039)+(1.082), (I-302)+(1.039)+(1.083), (I-302)+(1.039)+(1.084), (I-302)+(1.039)+(1.085), (I-302)+(1.039)+(1.086), (I-302)+(1.039)+(1.087), (I-302)+(1.039)+(1.088), (I-302)+(1.039)+(1.089), (I-302)+(1.039)+(1.090), (I-302)+(1.039)+(1.091), (I-302)+(1.039)+(1.092), (I-302)+(1.039)+(2.001), (I-302)+(1.039)+(2.002), (I-302)+(1.039)+(2.003), (I-302)+(1.039)+(2.004), (I-302)+(1.039)+(2.005), (I-302)+(1.039)+(2.006), (I-302)+(1.039)+(2.007), (I-302)+(1.039)+(2.008), (I-302)+(1.039)+(2.009), (I-302)+(1.039)+(2.010), (I-302)+(1.039)+(2.011), (I-302)+(1.039)+(2.012), (I-302)+(1.039)+(2.013), (I-302)+(1.039)+(2.014), (I-302)+(1.039)+(2.015), (I-302)+(1.039)+(2.016), (I-302)+(1.039)+(2.017), (I-302)+(1.039)+(2.018), (I-302)+(1.039)+(2.019), (I-302)+(1.039)+(2.020), (I-302)+(1.039)+(2.021), (I-302)+(1.039)+(2.022), (I-302)+(1.039)+(2.023), (I-302)+(1.039)+(2.024), (I-302)+(1.039)+(2.025), (I-302)+(1.039)+(2.026), (I-302)+(1.039)+(2.027), (I-302)+(1.039)+(2.028), (I-302)+(1.039)+(2.029), (I-302)+(1.039)+(2.030), (I-302)+(1.039)+(2.031), (I-302)+(1.039)+(2.032), (I-302)+(1.039)+(2.033), (I-302)+(1.039)+(2.034), (I-302)+(1.039)+(2.035), (I-302)+(1.039)+(2.036), (I-302)+(1.039)+(2.037), (I-302)+(1.039)+(2.038), (I-302)+(1.039)+(2.039), (I-302)+(1.039)+(2.040), (I-302)+(1.039)+(2.041), (I-302)+(1.039)+(2.042), (I-302)+(1.039)+(2.043), (I-302)+(1.039)+(2.044), (I-302)+(1.039)+(2.045), (I-302)+(1.039)+(2.046), (I-302)+(1.039)+(2.047), (I-302)+(1.039)+(2.048), (I-302)+(1.039)+(2.049), (I-302)+(1.039)+(2.050), (I-302)+(1.039)+(2.051), (I-302)+(1.039)+(2.052), (I-302)+(1.039)+(2.053), (I-302)+(1.039)+(2.054), (I-302)+(1.039)+(2.055), (I-302)+(1.039)+(2.056), (I-302)+(1.039)+(2.057), (I-302)+(1.039)+(2.058), (I-302)+(1.039)+(2.059), (I-302)+(1.039)+(3.001), (I-302)+(1.039)+(3.002), (I-302)+(1.039)+(3.003), (I-302)+(1.039)+(3.004), (I-302)+(1.039)+(3.005), (I-302)+(1.039)+(3.006), (I-302)+(1.039)+(3.007), (I-302)+(1.039)+(3.008), (I-302)+(1.039)+(3.009), (I-302)+(1.039)+(3.010), (I-302)+(1.039)+(3.011), (I-302)+(1.039)+(3.012), (I-302)+(1.039)+(3.013), (I-302)+(1.039)+(3.014), (I-302)+(1.039)+(3.015), (I-302)+(1.039)+(3.016), (I-302)+(1.039)+(3.017), (I-302)+(1.039)+(3.018), (I-302)+(1.039)+(3.019), (I-302)+(1.039)+(3.020), (I-302)+(1.039)+(3.021), (I-302)+(1.039)+(3.022), (I-302)+(1.039)+(3.023), (I-302)+(1.039)+(3.024), (I-302)+(1.039)+(3.025), (I-302)+(1.039)+(3.026), (I-302)+(1.039)+(3.027), (I-302)+(1.039)+(3.028), (I-302)+(1.039)+(3.029), (I-302)+(1.039)+(3.030), (I-302)+(1.039)+(3.031), (I-302)+(1.039)+(5.001), (I-302)+(1.039)+(5.002), (I-302)+(1.039)+(5.003), (I-302)+(1.039)+(5.004), (I-302)+(1.039)+(5.005), (I-302)+(1.039)+(5.006), (I-302)+(1.039)+(5.007), (I-302)+(1.039)+(5.008), (I-302)+(1.039)+(5.009), (I-302)+(1.039)+(5.010), (I-302)+(1.039)+(5.011), (I-302)+(1.039)+(5.012), (I-302)+(1.039)+(5.013), (I-302)+(1.039)+(5.014), (I-302)+(1.039)+(5.015), (I-302)+(1.039)+(5.016), (I-302)+(1.039)+(5.017), (I-302)+(1.039)+(5.018), (I-302)+(1.039)+(5.019), (I-302)+(1.039)+(5.020), (I-302)+(1.039)+(5.021), (I-302)+(1.039)+(5.022), (I-302)+(1.039)+(5.023), (I-302)+(1.039)+(6.001), (I-302)+(1.039)+(6.002), (I-302)+(1.039)+(6.003), (I-302)+(1.039)+(6.004), (I-302)+(1.039)+(7.001), (I-302)+(1.039)+(7.002), (I-302)+(1.039)+(7.003), (I-302)+(1.039)+(7.004), (I-302)+(1.039)+(7.005), (I-302)+(1.039)+(7.006), (I-302)+(1.039)+(9.001), (I-302)+(1.039)+(9.002), (I-302)+(1.039)+(9.003), (I-302)+(1.039)+(9.004), (I-302)+(1.039)+(9.005), (I-302)+(1.039)+(9.006), (I-302)+(1.039)+(9.007), (I-302)+(1.039)+(9.008), (I-302)+(1.039)+(9.009), (I-302)+(1.039)+(14.001), (I-302)+(1.039)+(14.002), (I-302)+(1.039)+(15.008), (I-302)+(1.039)+(15.011), (I-302)+(1.039)+(15.012), (I-302)+(1.039)+(15.016), (I-302)+(1.039)+(15.025), (I-302)+(1.039)+(15.027), (I-302)+(1.039)+(15.047), (I-302)+(1.039)+(15.063), (I-302)+(1.039)+(15.064), (I-302)+(1.039)+(16.001), (I-302)+(1.039)+(16.002), (I-302)+(1.039)+(16.003), (I-302)+(1.039)+(16.004), (I-302)+(1.039)+(16.005), (I-302)+(1.039)+(16.006), (I-302)+(1.039)+(16.007), (I-302)+(1.039)+(16.008), (I-302)+(1.039)+(17.001), (I-302)+(1.039)+(17.002), (I-302)+(1.039)+(17.003), (I-302)+(1.039)+(17.004), (I-302)+(1.039)+(17.005), (I-302)+(1.039)+(17.006), (I-302)+(1.039)+(17.007), (I-302)+(1.039)+(17.008), (I-302)+(1.039)+(17.009), (I-302)+(1.039)+(17.010), (I-302)+(1.039)+(17.011), (I-302)+(1.039)+(17.012), (I-302)+(1.039)+(18.001), (I-302)+(1.040)+(1.041), (I-302)+(1.040)+(1.042), (I-302)+(1.040)+(1.043), (I-302)+(1.040)+(1.044), (I-302)+(1.040)+(1.045), (I-302)+(1.040)+(1.046), (I-302)+(1.040)+(1.047), (I-302)+(1.040)+(1.048), (I-302)+(1.040)+(1.049), (I-302)+(1.040)+(1.050), (I-302)+(1.040)+(1.051), (I-302)+(1.040)+(1.052), (I-302)+(1.040)+(1.053), (I-302)+(1.040)+(1.054), (I-302)+(1.040)+(1.055), (I-302)+(1.040)+(1.056), (I-302)+(1.040)+(1.057), (I-302)+(1.040)+(1.058), (I-302)+(1.040)+(1.059), (I-302)+(1.040)+(1.060), (I-302)+(1.040)+(1.061), (I-302)+(1.040)+(1.062), (I-302)+(1.040)+(1.063), (I-302)+(1.040)+(1.064), (I-302)+(1.040)+(1.065), (I-302)+(1.040)+(1.066), (I-302)+(1.040)+(1.067), (I-302)+(1.040)+(1.068), (I-302)+(1.040)+(1.069), (I-302)+(1.040)+(1.070), (I-302)+(1.040)+(1.071), (I-302)+(1.040)+(1.072), (I-302)+(1.040)+(1.073), (I-302)+(1.040)+(1.074), (I-302)+(1.040)+(1.075), (I-302)+(1.040)+(1.076), (I-302)+(1.040)+(1.077), (I-302)+(1.040)+(1.078), (I-302)+(1.040)+(1.079), (I-302)+(1.040)+(1.080), (I-302)+(1.040)+(1.081), (I-302)+(1.040)+(1.082), (I-302)+(1.040)+(1.083), (I-302)+(1.040)+(1.084), (I-302)+(1.040)+(1.085), (I-302)+(1.040)+(1.086), (I-302)+(1.040)+(1.087), (I-302)+(1.040)+(1.088), (I-302)+(1.040)+(1.089), (I-302)+(1.040)+(1.090), (I-302)+(1.040)+(1.091), (I-302)+(1.040)+(1.092), (I-302)+(1.040)+(2.001), (I-302)+(1.040)+(2.002), (I-302)+(1.040)+(2.003), (I-302)+(1.040)+(2.004), (I-302)+(1.040)+(2.005), (I-302)+(1.040)+(2.006), (I-302)+(1.040)+(2.007), (I-302)+(1.040)+(2.008), (I-302)+(1.040)+(2.009), (I-302)+(1.040)+(2.010), (I-302)+(1.040)+(2.011), (I-302)+(1.040)+(2.012), (I-302)+(1.040)+(2.013), (I-302)+(1.040)+(2.014), (I-302)+(1.040)+(2.015), (I-302)+(1.040)+(2.016), (I-302)+(1.040)+(2.017), (I-302)+(1.040)+(2.018), (I-302)+(1.040)+(2.019), (I-302)+(1.040)+(2.020), (I-302)+(1.040)+(2.021), (I-302)+(1.040)+(2.022), (I-302)+(1.040)+(2.023), (I-302)+(1.040)+(2.024), (I-302)+(1.040)+(2.025), (I-302)+(1.040)+(2.026), (I-302)+(1.040)+(2.027), (I-302)+(1.040)+(2.028), (I-302)+(1.040)+(2.029), (I-302)+(1.040)+(2.030), (I-302)+(1.040)+(2.031), (I-302)+(1.040)+(2.032), (I-302)+(1.040)+(2.033), (I-302)+(1.040)+(2.034), (I-302)+(1.040)+(2.035), (I-302)+(1.040)+(2.036), (I-302)+(1.040)+(2.037), (I-302)+(1.040)+(2.038), (I-302)+(1.040)+(2.039), (I-302)+(1.040)+(2.040), (I-302)+(1.040)+(2.041), (I-302)+(1.040)+(2.042), (I-302)+(1.040)+(2.043), (I-302)+(1.040)+(2.044), (I-302)+(1.040)+(2.045), (I-302)+(1.040)+(2.046), (I-302)+(1.040)+(2.047), (I-302)+(1.040)+(2.048), (I-302)+(1.040)+(2.049), (I-302)+(1.040)+(2.050), (I-302)+(1.040)+(2.051), (I-302)+(1.040)+(2.052), (I-302)+(1.040)+(2.053), (I-302)+(1.040)+(2.054), (I-302)+(1.040)+(2.055), (I-302)+(1.040)+(2.056), (I-302)+(1.040)+(2.057), (I-302)+(1.040)+(2.058), (I-302)+(1.040)+(2.059), (I-302)+(1.040)+(3.001), (I-302)+(1.040)+(3.002), (I-302)+(1.040)+(3.003), (I-302)+(1.040)+(3.004), (I-302)+(1.040)+(3.005), (I-302)+(1.040)+(3.006), (I-302)+(1.040)+(3.007), (I-302)+(1.040)+(3.008), (I-302)+(1.040)+(3.009), (I-302)+(1.040)+(3.010), (I-302)+(1.040)+(3.011), (I-302)+(1.040)+(3.012), (I-302)+(1.040)+(3.013), (I-302)+(1.040)+(3.014), (I-302)+(1.040)+(3.015), (I-302)+(1.040)+(3.016), (I-302)+(1.040)+(3.017), (I-302)+(1.040)+(3.018), (I-302)+(1.040)+(3.019), (I-302)+(1.040)+(3.020), (I-302)+(1.040)+(3.021), (I-302)+(1.040)+(3.022), (I-302)+(1.040)+(3.023), (I-302)+(1.040)+(3.024), (I-302)+(1.040)+(3.025), (I-302)+(1.040)+(3.026), (I-302)+(1.040)+(3.027), (I-302)+(1.040)+(3.028), (I-302)+(1.040)+(3.029), (I-302)+(1.040)+(3.030), (I-302)+(1.040)+(3.031), (I-302)+(1.040)+(5.001), (I-302)+(1.040)+(5.002), (I-302)+(1.040)+(5.003), (I-302)+(1.040)+(5.004), (I-302)+(1.040)+(5.005), (I-302)+(1.040)+(5.006), (I-302)+(1.040)+(5.007), (I-302)+(1.040)+(5.008), (I-302)+(1.040)+(5.009), (I-302)+(1.040)+(5.010), (I-302)+(1.040)+(5.011), (I-302)+(1.040)+(5.012), (I-302)+(1.040)+(5.013), (I-302)+(1.040)+(5.014), (I-302)+(1.040)+(5.015), (I-302)+(1.040)+(5.016), (I-302)+(1.040)+(5.017), (I-302)+(1.040)+(5.018), (I-302)+(1.040)+(5.019), (I-302)+(1.040)+(5.020), (I-302)+(1.040)+(5.021), (I-302)+(1.040)+(5.022), (I-302)+(1.040)+(5.023), (I-302)+(1.040)+(6.001), (I-302)+(1.040)+(6.002), (I-302)+(1.040)+(6.003), (I-302)+(1.040)+(6.004), (I-302)+(1.040)+(7.001), (I-302)+(1.040)+(7.002), (I-302)+(1.040)+(7.003), (I-302)+(1.040)+(7.004), (I-302)+(1.040)+(7.005), (I-302)+(1.040)+(7.006), (I-302)+(1.040)+(9.001), (I-302)+(1.040)+(9.002), (I-302)+(1.040)+(9.003), (I-302)+(1.040)+(9.004), (I-302)+(1.040)+(9.005), (I-302)+(1.040)+(9.006), (I-302)+(1.040)+(9.007), (I-302)+(1.040)+(9.008), (I-302)+(1.040)+(9.009), (I-302)+(1.040)+(14.001), (I-302)+(1.040)+(14.002), (I-302)+(1.040)+(15.008), (I-302)+(1.040)+(15.011), (I-302)+(1.040)+(15.012), (I-302)+(1.040)+(15.016), (I-302)+(1.040)+(15.025), (I-302)+(1.040)+(15.027), (I-302)+(1.040)+(15.047), (I-302)+(1.040)+(15.063), (I-302)+(1.040)+(15.064), (I-302)+(1.040)+(16.001), (I-302)+(1.040)+(16.002), (I-302)+(1.040)+(16.003), (I-302)+(1.040)+(16.004), (I-302)+(1.040)+(16.005), (I-302)+(1.040)+(16.006), (I-302)+(1.040)+(16.007), (I-302)+(1.040)+(16.008), (I-302)+(1.040)+(17.001), (I-302)+(1.040)+(17.002), (I-302)+(1.040)+(17.003), (I-302)+(1.040)+(17.004), (I-302)+(1.040)+(17.005), (I-302)+(1.040)+(17.006), (I-302)+(1.040)+(17.007), (I-302)+(1.040)+(17.008), (I-302)+(1.040)+(17.009), (I-302)+(1.040)+(17.010), (I-302)+(1.040)+(17.011), (I-302)+(1.040)+(17.012), (I-302)+(1.040)+(18.001), (I-302)+(1.041)+(1.042), (I-302)+(1.041)+(1.043), (I-302)+(1.041)+(1.044), (I-302)+(1.041)+(1.045), (I-302)+(1.041)+(1.046), (I-302)+(1.041)+(1.047), (I-302)+(1.041)+(1.048), (I-302)+(1.041)+(1.049), (I-302)+(1.041)+(1.050), (I-302)+(1.041)+(1.051), (I-302)+(1.041)+(1.052), (I-302)+(1.041)+(1.053), (I-302)+(1.041)+(1.054), (I-302)+(1.041)+(1.055), (I-302)+(1.041)+(1.056), (I-302)+(1.041)+(1.057), (I-302)+(1.041)+(1.058), (I-302)+(1.041)+(1.059), (I-302)+(1.041)+(1.060), (I-302)+(1.041)+(1.061), (I-302)+(1.041)+(1.062), (I-302)+(1.041)+(1.063), (I-302)+(1.041)+(1.064), (I-302)+(1.041)+(1.065), (I-302)+(1.041)+(1.066), (I-302)+(1.041)+(1.067), (I-302)+(1.041)+(1.068), (I-302)+(1.041)+(1.069), (I-302)+(1.041)+(1.070), (I-302)+(1.041)+(1.071), (I-302)+(1.041)+(1.072), (I-302)+(1.041)+(1.073), (I-302)+(1.041)+(1.074), (I-302)+(1.041)+(1.075), (I-302)+(1.041)+(1.076), (I-302)+(1.041)+(1.077), (I-302)+(1.041)+(1.078), (I-302)+(1.041)+(1.079), (I-302)+(1.041)+(1.080), (I-302)+(1.041)+(1.081), (I-302)+(1.041)+(1.082), (I-302)+(1.041)+(1.083), (I-302)+(1.041)+(1.084), (I-302)+(1.041)+(1.085), (I-302)+(1.041)+(1.086), (I-302)+(1.041)+(1.087), (I-302)+(1.041)+(1.088), (I-302)+(1.041)+(1.089), (I-302)+(1.041)+(1.090), (I-302)+(1.041)+(1.091), (I-302)+(1.041)+(1.092), (I-302)+(1.041)+(2.001), (I-302)+(1.041)+(2.002), (I-302)+(1.041)+(2.003), (I-302)+(1.041)+(2.004), (I-302)+(1.041)+(2.005), (I-302)+(1.041)+(2.006), (I-302)+(1.041)+(2.007), (I-302)+(1.041)+(2.008), (I-302)+(1.041)+(2.009), (I-302)+(1.041)+(2.010), (I-302)+(1.041)+(2.011), (I-302)+(1.041)+(2.012), (I-302)+(1.041)+(2.013), (I-302)+(1.041)+(2.014), (I-302)+(1.041)+(2.015), (I-302)+(1.041)+(2.016), (I-302)+(1.041)+(2.017), (I-302)+(1.041)+(2.018), (I-302)+(1.041)+(2.019), (I-302)+(1.041)+(2.020), (I-302)+(1.041)+(2.021), (I-302)+(1.041)+(2.022), (I-302)+(1.041)+(2.023), (I-302)+(1.041)+(2.024), (I-302)+(1.041)+(2.025), (I-302)+(1.041)+(2.026), (I-302)+(1.041)+(2.027), (I-302)+(1.041)+(2.028), (I-302)+(1.041)+(2.029), (I-302)+(1.041)+(2.030), (I-302)+(1.041)+(2.031), (I-302)+(1.041)+(2.032), (I-302)+(1.041)+(2.033), (I-302)+(1.041)+(2.034), (I-302)+(1.041)+(2.035), (I-302)+(1.041)+(2.036), (I-302)+(1.041)+(2.037), (I-302)+(1.041)+(2.038), (I-302)+(1.041)+(2.039), (I-302)+(1.041)+(2.040), (I-302)+(1.041)+(2.041), (I-302)+(1.041)+(2.042), (I-302)+(1.041)+(2.043), (I-302)+(1.041)+(2.044), (I-302)+(1.041)+(2.045), (I-302)+(1.041)+(2.046), (I-302)+(1.041)+(2.047), (I-302)+(1.041)+(2.048), (I-302)+(1.041)+(2.049), (I-302)+(1.041)+(2.050), (I-302)+(1.041)+(2.051), (I-302)+(1.041)+(2.052), (I-302)+(1.041)+(2.053), (I-302)+(1.041)+(2.054), (I-302)+(1.041)+(2.055), (I-302)+(1.041)+(2.056), (I-302)+(1.041)+(2.057), (I-302)+(1.041)+(2.058), (I-302)+(1.041)+(2.059), (I-302)+(1.041)+(3.001), (I-302)+(1.041)+(3.002), (I-302)+(1.041)+(3.003), (I-302)+(1.041)+(3.004), (I-302)+(1.041)+(3.005), (I-302)+(1.041)+(3.006), (I-302)+(1.041)+(3.007), (I-302)+(1.041)+(3.008), (I-302)+(1.041)+(3.009), (I-302)+(1.041)+(3.010), (I-302)+(1.041)+(3.011), (I-302)+(1.041)+(3.012), (I-302)+(1.041)+(3.013), (I-302)+(1.041)+(3.014), (I-302)+(1.041)+(3.015), (I-302)+(1.041)+(3.016), (I-302)+(1.041)+(3.017), (I-302)+(1.041)+(3.018), (I-302)+(1.041)+(3.019), (I-302)+(1.041)+(3.020), (I-302)+(1.041)+(3.021), (I-302)+(1.041)+(3.022), (I-302)+(1.041)+(3.023), (I-302)+(1.041)+(3.024), (I-302)+(1.041)+(3.025), (I-302)+(1.041)+(3.026), (I-302)+(1.041)+(3.027), (I-302)+(1.041)+(3.028), (I-302)+(1.041)+(3.029), (I-302)+(1.041)+(3.030), (I-302)+(1.041)+(3.031), (I-302)+(1.041)+(5.001), (I-302)+(1.041)+(5.002), (I-302)+(1.041)+(5.003), (I-302)+(1.041)+(5.004), (I-302)+(1.041)+(5.005), (I-302)+(1.041)+(5.006), (I-302)+(1.041)+(5.007), (I-302)+(1.041)+(5.008), (I-302)+(1.041)+(5.009), (I-302)+(1.041)+(5.010), (I-302)+(1.041)+(5.011), (I-302)+(1.041)+(5.012), (I-302)+(1.041)+(5.013), (I-302)+(1.041)+(5.014), (I-302)+(1.041)+(5.015), (I-302)+(1.041)+(5.016), (I-302)+(1.041)+(5.017), (I-302)+(1.041)+(5.018), (I-302)+(1.041)+(5.019), (I-302)+(1.041)+(5.020), (I-302)+(1.041)+(5.021), (I-302)+(1.041)+(5.022), (I-302)+(1.041)+(5.023), (I-302)+(1.041)+(6.001), (I-302)+(1.041)+(6.002), (I-302)+(1.041)+(6.003), (I-302)+(1.041)+(6.004), (I-302)+(1.041)+(7.001), (I-302)+(1.041)+(7.002), (I-302)+(1.041)+(7.003), (I-302)+(1.041)+(7.004), (I-302)+(1.041)+(7.005), (I-302)+(1.041)+(7.006), (I-302)+(1.041)+(9.001), (I-302)+(1.041)+(9.002), (I-302)+(1.041)+(9.003), (I-302)+(1.041)+(9.004), (I-302)+(1.041)+(9.005), (I-302)+(1.041)+(9.006), (I-302)+(1.041)+(9.007), (I-302)+(1.041)+(9.008), (I-302)+(1.041)+(9.009), (I-302)+(1.041)+(14.001), (I-302)+(1.041)+(14.002), (I-302)+(1.041)+(15.008), (I-302)+(1.041)+(15.011), (I-302)+(1.041)+(15.012), (I-302)+(1.041)+(15.016), (I-302)+(1.041)+(15.025), (I-302)+(1.041)+(15.027), (I-302)+(1.041)+(15.047), (I-302)+(1.041)+(15.063), (I-302)+(1.041)+(15.064), (I-302)+(1.041)+(16.001), (I-302)+(1.041)+(16.002), (I-302)+(1.041)+(16.003), (I-302)+(1.041)+(16.004), (I-302)+(1.041)+(16.005), (I-302)+(1.041)+(16.006), (I-302)+(1.041)+(16.007), (I-302)+(1.041)+(16.008), (I-302)+(1.041)+(17.001), (I-302)+(1.041)+(17.002), (I-302)+(1.041)+(17.003), (I-302)+(1.041)+(17.004), (I-302)+(1.041)+(17.005), (I-302)+(1.041)+(17.006), (I-302)+(1.041)+(17.007), (I-302)+(1.041)+(17.008), (I-302)+(1.041)+(17.009), (I-302)+(1.041)+(17.010), (I-302)+(1.041)+(17.011), (I-302)+(1.041)+(17.012), (I-302)+(1.041)+(18.001), (I-302)+(1.042)+(1.043), (I-302)+(1.042)+(1.044), (I-302)+(1.042)+(1.045), (I-302)+(1.042)+(1.046), (I-302)+(1.042)+(1.047), (I-302)+(1.042)+(1.048), (I-302)+(1.042)+(1.049), (I-302)+(1.042)+(1.050), (I-302)+(1.042)+(1.051), (I-302)+(1.042)+(1.052), (I-302)+(1.042)+(1.053), (I-302)+(1.042)+(1.054), (I-302)+(1.042)+(1.055), (I-302)+(1.042)+(1.056), (I-302)+(1.042)+(1.057), (I-302)+(1.042)+(1.058), (I-302)+(1.042)+(1.059), (I-302)+(1.042)+(1.060), (I-302)+(1.042)+(1.061), (I-302)+(1.042)+(1.062), (I-302)+(1.042)+(1.063), (I-302)+(1.042)+(1.064), (I-302)+(1.042)+(1.065), (I-302)+(1.042)+(1.066), (I-302)+(1.042)+(1.067), (I-302)+(1.042)+(1.068), (I-302)+(1.042)+(1.069), (I-302)+(1.042)+(1.070), (I-302)+(1.042)+(1.071), (I-302)+(1.042)+(1.072), (I-302)+(1.042)+(1.073), (I-302)+(1.042)+(1.074), (I-302)+(1.042)+(1.075), (I-302)+(1.042)+(1.076), (I-302)+(1.042)+(1.077), (I-302)+(1.042)+(1.078), (I-302)+(1.042)+(1.079), (I-302)+(1.042)+(1.080), (I-302)+(1.042)+(1.081), (I-302)+(1.042)+(1.082), (I-302)+(1.042)+(1.083), (I-302)+(1.042)+(1.084), (I-302)+(1.042)+(1.085), (I-302)+(1.042)+(1.086), (I-302)+(1.042)+(1.087), (I-302)+(1.042)+(1.088), (I-302)+(1.042)+(1.089), (I-302)+(1.042)+(1.090), (I-302)+(1.042)+(1.091), (I-302)+(1.042)+(1.092), (I-302)+(1.042)+(2.001), (I-302)+(1.042)+(2.002), (I-302)+(1.042)+(2.003), (I-302)+(1.042)+(2.004), (I-302)+(1.042)+(2.005), (I-302)+(1.042)+(2.006), (I-302)+(1.042)+(2.007), (I-302)+(1.042)+(2.008), (I-302)+(1.042)+(2.009), (I-302)+(1.042)+(2.010), (I-302)+(1.042)+(2.011), (I-302)+(1.042)+(2.012), (I-302)+(1.042)+(2.013), (I-302)+(1.042)+(2.014), (I-302)+(1.042)+(2.015), (I-302)+(1.042)+(2.016), (I-302)+(1.042)+(2.017), (I-302)+(1.042)+(2.018), (I-302)+(1.042)+(2.019), (I-302)+(1.042)+(2.020), (I-302)+(1.042)+(2.021), (I-302)+(1.042)+(2.022), (I-302)+(1.042)+(2.023), (I-302)+(1.042)+(2.024), (I-302)+(1.042)+(2.025), (I-302)+(1.042)+(2.026), (I-302)+(1.042)+(2.027), (I-302)+(1.042)+(2.028), (I-302)+(1.042)+(2.029), (I-302)+(1.042)+(2.030), (I-302)+(1.042)+(2.031), (I-302)+(1.042)+(2.032), (I-302)+(1.042)+(2.033), (I-302)+(1.042)+(2.034), (I-302)+(1.042)+(2.035), (I-302)+(1.042)+(2.036), (I-302)+(1.042)+(2.037), (I-302)+(1.042)+(2.038), (I-302)+(1.042)+(2.039), (I-302)+(1.042)+(2.040), (I-302)+(1.042)+(2.041), (I-302)+(1.042)+(2.042), (I-302)+(1.042)+(2.043), (I-302)+(1.042)+(2.044), (I-302)+(1.042)+(2.045), (I-302)+(1.042)+(2.046), (I-302)+(1.042)+(2.047), (I-302)+(1.042)+(2.048), (I-302)+(1.042)+(2.049), (I-302)+(1.042)+(2.050), (I-302)+(1.042)+(2.051), (I-302)+(1.042)+(2.052), (I-302)+(1.042)+(2.053), (I-302)+(1.042)+(2.054), (I-302)+(1.042)+(2.055), (I-302)+(1.042)+(2.056), (I-302)+(1.042)+(2.057), (I-302)+(1.042)+(2.058), (I-302)+(1.042)+(2.059), (I-302)+(1.042)+(3.001), (I-302)+(1.042)+(3.002), (I-302)+(1.042)+(3.003), (I-302)+(1.042)+(3.004), (I-302)+(1.042)+(3.005), (I-302)+(1.042)+(3.006), (I-302)+(1.042)+(3.007), (I-302)+(1.042)+(3.008), (I-302)+(1.042)+(3.009), (I-302)+(1.042)+(3.010), (I-302)+(1.042)+(3.011), (I-302)+(1.042)+(3.012), (I-302)+(1.042)+(3.013), (I-302)+(1.042)+(3.014), (I-302)+(1.042)+(3.015), (I-302)+(1.042)+(3.016), (I-302)+(1.042)+(3.017), (I-302)+(1.042)+(3.018), (I-302)+(1.042)+(3.019), (I-302)+(1.042)+(3.020), (I-302)+(1.042)+(3.021), (I-302)+(1.042)+(3.022), (I-302)+(1.042)+(3.023), (I-302)+(1.042)+(3.024), (I-302)+(1.042)+(3.025), (I-302)+(1.042)+(3.026), (I-302)+(1.042)+(3.027), (I-302)+(1.042)+(3.028), (I-302)+(1.042)+(3.029), (I-302)+(1.042)+(3.030), (I-302)+(1.042)+(3.031), (I-302)+(1.042)+(5.001), (I-302)+(1.042)+(5.002), (I-302)+(1.042)+(5.003), (I-302)+(1.042)+(5.004), (I-302)+(1.042)+(5.005), (I-302)+(1.042)+(5.006), (I-302)+(1.042)+(5.007), (I-302)+(1.042)+(5.008), (I-302)+(1.042)+(5.009), (I-302)+(1.042)+(5.010), (I-302)+(1.042)+(5.011), (I-302)+(1.042)+(5.012), (I-302)+(1.042)+(5.013), (I-302)+(1.042)+(5.014), (I-302)+(1.042)+(5.015), (I-302)+(1.042)+(5.016), (I-302)+(1.042)+(5.017), (I-302)+(1.042)+(5.018), (I-302)+(1.042)+(5.019), (I-302)+(1.042)+(5.020), (I-302)+(1.042)+(5.021), (I-302)+(1.042)+(5.022), (I-302)+(1.042)+(5.023), (I-302)+(1.042)+(6.001), (I-302)+(1.042)+(6.002), (I-302)+(1.042)+(6.003), (I-302)+(1.042)+(6.004), (I-302)+(1.042)+(7.001), (I-302)+(1.042)+(7.002), (I-302)+(1.042)+(7.003), (I-302)+(1.042)+(7.004), (I-302)+(1.042)+(7.005), (I-302)+(1.042)+(7.006), (I-302)+(1.042)+(9.001), (I-302)+(1.042)+(9.002), (I-302)+(1.042)+(9.003), (I-302)+(1.042)+(9.004), (I-302)+(1.042)+(9.005), (I-302)+(1.042)+(9.006), (I-302)+(1.042)+(9.007), (I-302)+(1.042)+(9.008), (I-302)+(1.042)+(9.009), (I-302)+(1.042)+(14.001), (I-302)+(1.042)+(14.002), (I-302)+(1.042)+(15.008), (I-302)+(1.042)+(15.011), (I-302)+(1.042)+(15.012), (I-302)+(1.042)+(15.016), (I-302)+(1.042)+(15.025), (I-302)+(1.042)+(15.027), (I-302)+(1.042)+(15.047), (I-302)+(1.042)+(15.063), (I-302)+(1.042)+(15.064), (I-302)+(1.042)+(16.001), (I-302)+(1.042)+(16.002), (I-302)+(1.042)+(16.003), (I-302)+(1.042)+(16.004), (I-302)+(1.042)+(16.005), (I-302)+(1.042)+(16.006), (I-302)+(1.042)+(16.007), (I-302)+(1.042)+(16.008), (I-302)+(1.042)+(17.001), (I-302)+(1.042)+(17.002), (I-302)+(1.042)+(17.003), (I-302)+(1.042)+(17.004), (I-302)+(1.042)+(17.005), (I-302)+(1.042)+(17.006), (I-302)+(1.042)+(17.007), (I-302)+(1.042)+(17.008), (I-302)+(1.042)+(17.009), (I-302)+(1.042)+(17.010), (I-302)+(1.042)+(17.011), (I-302)+(1.042)+(17.012), (I-302)+(1.042)+(18.001), (I-302)+(1.043)+(1.044), (I-302)+(1.043)+(1.045), (I-302)+(1.043)+(1.046), (I-302)+(1.043)+(1.047), (I-302)+(1.043)+(1.048), (I-302)+(1.043)+(1.049), (I-302)+(1.043)+(1.050), (I-302)+(1.043)+(1.051), (I-302)+(1.043)+(1.052), (I-302)+(1.043)+(1.053), (I-302)+(1.043)+(1.054), (I-302)+(1.043)+(1.055), (I-302)+(1.043)+(1.056), (I-302)+(1.043)+(1.057), (I-302)+(1.043)+(1.058), (I-302)+(1.043)+(1.059), (I-302)+(1.043)+(1.060), (I-302)+(1.043)+(1.061), (I-302)+(1.043)+(1.062), (I-302)+(1.043)+(1.063), (I-302)+(1.043)+(1.064), (I-302)+(1.043)+(1.065), (I-302)+(1.043)+(1.066), (I-302)+(1.043)+(1.067), (I-302)+(1.043)+(1.068), (I-302)+(1.043)+(1.069), (I-302)+(1.043)+(1.070), (I-302)+(1.043)+(1.071), (I-302)+(1.043)+(1.072), (I-302)+(1.043)+(1.073), (I-302)+(1.043)+(1.074), (I-302)+(1.043)+(1.075), (I-302)+(1.043)+(1.076), (I-302)+(1.043)+(1.077), (I-302)+(1.043)+(1.078), (I-302)+(1.043)+(1.079), (I-302)+(1.043)+(1.080), (I-302)+(1.043)+(1.081), (I-302)+(1.043)+(1.082), (I-302)+(1.043)+(1.083), (I-302)+(1.043)+(1.084), (I-302)+(1.043)+(1.085), (I-302)+(1.043)+(1.086), (I-302)+(1.043)+(1.087), (I-302)+(1.043)+(1.088), (I-302)+(1.043)+(1.089), (I-302)+(1.043)+(1.090), (I-302)+(1.043)+(1.091), (I-302)+(1.043)+(1.092), (I-302)+(1.043)+(2.001), (I-302)+(1.043)+(2.002), (I-302)+(1.043)+(2.003), (I-302)+(1.043)+(2.004), (I-302)+(1.043)+(2.005), (I-302)+(1.043)+(2.006), (I-302)+(1.043)+(2.007), (I-302)+(1.043)+(2.008), (I-302)+(1.043)+(2.009), (I-302)+(1.043)+(2.010), (I-302)+(1.043)+(2.011), (I-302)+(1.043)+(2.012), (I-302)+(1.043)+(2.013), (I-302)+(1.043)+(2.014), (I-302)+(1.043)+(2.015), (I-302)+(1.043)+(2.016), (I-302)+(1.043)+(2.017), (I-302)+(1.043)+(2.018), (I-302)+(1.043)+(2.019), (I-302)+(1.043)+(2.020), (I-302)+(1.043)+(2.021), (I-302)+(1.043)+(2.022), (I-302)+(1.043)+(2.023), (I-302)+(1.043)+(2.024), (I-302)+(1.043)+(2.025), (I-302)+(1.043)+(2.026), (I-302)+(1.043)+(2.027), (I-302)+(1.043)+(2.028), (I-302)+(1.043)+(2.029), (I-302)+(1.043)+(2.030), (I-302)+(1.043)+(2.031), (I-302)+(1.043)+(2.032), (I-302)+(1.043)+(2.033), (I-302)+(1.043)+(2.034), (I-302)+(1.043)+(2.035), (I-302)+(1.043)+(2.036), (I-302)+(1.043)+(2.037), (I-302)+(1.043)+(2.038), (I-302)+(1.043)+(2.039), (I-302)+(1.043)+(2.040), (I-302)+(1.043)+(2.041), (I-302)+(1.043)+(2.042), (I-302)+(1.043)+(2.043), (I-302)+(1.043)+(2.044), (I-302)+(1.043)+(2.045), (I-302)+(1.043)+(2.046), (I-302)+(1.043)+(2.047), (I-302)+(1.043)+(2.048), (I-302)+(1.043)+(2.049), (I-302)+(1.043)+(2.050), (I-302)+(1.043)+(2.051), (I-302)+(1.043)+(2.052), (I-302)+(1.043)+(2.053), (I-302)+(1.043)+(2.054), (I-302)+(1.043)+(2.055), (I-302)+(1.043)+(2.056), (I-302)+(1.043)+(2.057), (I-302)+(1.043)+(2.058), (I-302)+(1.043)+(2.059), (I-302)+(1.043)+(3.001), (I-302)+(1.043)+(3.002), (I-302)+(1.043)+(3.003), (I-302)+(1.043)+(3.004), (I-302)+(1.043)+(3.005), (I-302)+(1.043)+(3.006), (I-302)+(1.043)+(3.007), (I-302)+(1.043)+(3.008), (I-302)+(1.043)+(3.009), (I-302)+(1.043)+(3.010), (I-302)+(1.043)+(3.011), (I-302)+(1.043)+(3.012), (I-302)+(1.043)+(3.013), (I-302)+(1.043)+(3.014), (I-302)+(1.043)+(3.015), (I-302)+(1.043)+(3.016), (I-302)+(1.043)+(3.017), (I-302)+(1.043)+(3.018), (I-302)+(1.043)+(3.019), (I-302)+(1.043)+(3.020), (I-302)+(1.043)+(3.021), (I-302)+(1.043)+(3.022), (I-302)+(1.043)+(3.023), (I-302)+(1.043)+(3.024), (I-302)+(1.043)+(3.025), (I-302)+(1.043)+(3.026), (I-302)+(1.043)+(3.027), (I-302)+(1.043)+(3.028), (I-302)+(1.043)+(3.029), (I-302)+(1.043)+(3.030), (I-302)+(1.043)+(3.031), (I-302)+(1.043)+(5.001), (I-302)+(1.043)+(5.002), (I-302)+(1.043)+(5.003), (I-302)+(1.043)+(5.004), (I-302)+(1.043)+(5.005), (I-302)+(1.043)+(5.006), (I-302)+(1.043)+(5.007), (I-302)+(1.043)+(5.008), (I-302)+(1.043)+(5.009), (I-302)+(1.043)+(5.010), (I-302)+(1.043)+(5.011), (I-302)+(1.043)+(5.012), (I-302)+(1.043)+(5.013), (I-302)+(1.043)+(5.014), (I-302)+(1.043)+(5.015), (I-302)+(1.043)+(5.016), (I-302)+(1.043)+(5.017), (I-302)+(1.043)+(5.018), (I-302)+(1.043)+(5.019), (I-302)+(1.043)+(5.020), (I-302)+(1.043)+(5.021), (I-302)+(1.043)+(5.022), (I-302)+(1.043)+(5.023), (I-302)+(1.043)+(6.001), (I-302)+(1.043)+(6.002), (I-302)+(1.043)+(6.003), (I-302)+(1.043)+(6.004), (I-302)+(1.043)+(7.001), (I-302)+(1.043)+(7.002), (I-302)+(1.043)+(7.003), (I-302)+(1.043)+(7.004), (I-302)+(1.043)+(7.005), (I-302)+(1.043)+(7.006), (I-302)+(1.043)+(9.001), (I-302)+(1.043)+(9.002), (I-302)+(1.043)+(9.003), (I-302)+(1.043)+(9.004), (I-302)+(1.043)+(9.005), (I-302)+(1.043)+(9.006), (I-302)+(1.043)+(9.007), (I-302)+(1.043)+(9.008), (I-302)+(1.043)+(9.009), (I-302)+(1.043)+(14.001), (I-302)+(1.043)+(14.002), (I-302)+(1.043)+(15.008), (I-302)+(1.043)+(15.011), (I-302)+(1.043)+(15.012), (I-302)+(1.043)+(15.016), (I-302)+(1.043)+(15.025), (I-302)+(1.043)+(15.027), (I-302)+(1.043)+(15.047), (I-302)+(1.043)+(15.063), (I-302)+(1.043)+(15.064), (I-302)+(1.043)+(16.001), (I-302)+(1.043)+(16.002), (I-302)+(1.043)+(16.003), (I-302)+(1.043)+(16.004), (I-302)+(1.043)+(16.005), (I-302)+(1.043)+(16.006), (I-302)+(1.043)+(16.007), (I-302)+(1.043)+(16.008), (I-302)+(1.043)+(17.001), (I-302)+(1.043)+(17.002), (I-302)+(1.043)+(17.003), (I-302)+(1.043)+(17.004), (I-302)+(1.043)+(17.005), (I-302)+(1.043)+(17.006), (I-302)+(1.043)+(17.007), (I-302)+(1.043)+(17.008), (I-302)+(1.043)+(17.009), (I-302)+(1.043)+(17.010), (I-302)+(1.043)+(17.011), (I-302)+(1.043)+(17.012), (I-302)+(1.043)+(18.001), (I-302)+(1.044)+(1.045), (I-302)+(1.044)+(1.046), (I-302)+(1.044)+(1.047), (I-302)+(1.044)+(1.048), (I-302)+(1.044)+(1.049), (I-302)+(1.044)+(1.050), (I-302)+(1.044)+(1.051), (I-302)+(1.044)+(1.052), (I-302)+(1.044)+(1.053), (I-302)+(1.044)+(1.054), (I-302)+(1.044)+(1.055), (I-302)+(1.044)+(1.056), (I-302)+(1.044)+(1.057), (I-302)+(1.044)+(1.058), (I-302)+(1.044)+(1.059), (I-302)+(1.044)+(1.060), (I-302)+(1.044)+(1.061), (I-302)+(1.044)+(1.062), (I-302)+(1.044)+(1.063), (I-302)+(1.044)+(1.064), (I-302)+(1.044)+(1.065), (I-302)+(1.044)+(1.066), (I-302)+(1.044)+(1.067), (I-302)+(1.044)+(1.068), (I-302)+(1.044)+(1.069), (I-302)+(1.044)+(1.070), (I-302)+(1.044)+(1.071), (I-302)+(1.044)+(1.072), (I-302)+(1.044)+(1.073), (I-302)+(1.044)+(1.074), (I-302)+(1.044)+(1.075), (I-302)+(1.044)+(1.076), (I-302)+(1.044)+(1.077), (I-302)+(1.044)+(1.078), (I-302)+(1.044)+(1.079), (I-302)+(1.044)+(1.080), (I-302)+(1.044)+(1.081), (I-302)+(1.044)+(1.082), (I-302)+(1.044)+(1.083), (I-302)+(1.044)+(1.084), (I-302)+(1.044)+(1.085), (I-302)+(1.044)+(1.086), (I-302)+(1.044)+(1.087), (I-302)+(1.044)+(1.088), (I-302)+(1.044)+(1.089), (I-302)+(1.044)+(1.090), (I-302)+(1.044)+(1.091), (I-302)+(1.044)+(1.092), (I-302)+(1.044)+(2.001), (I-302)+(1.044)+(2.002), (I-302)+(1.044)+(2.003), (I-302)+(1.044)+(2.004), (I-302)+(1.044)+(2.005), (I-302)+(1.044)+(2.006), (I-302)+(1.044)+(2.007), (I-302)+(1.044)+(2.008), (I-302)+(1.044)+(2.009), (I-302)+(1.044)+(2.010), (I-302)+(1.044)+(2.011), (I-302)+(1.044)+(2.012), (I-302)+(1.044)+(2.013), (I-302)+(1.044)+(2.014), (I-302)+(1.044)+(2.015), (I-302)+(1.044)+(2.016), (I-302)+(1.044)+(2.017), (I-302)+(1.044)+(2.018), (I-302)+(1.044)+(2.019), (I-302)+(1.044)+(2.020), (I-302)+(1.044)+(2.021), (I-302)+(1.044)+(2.022), (I-302)+(1.044)+(2.023), (I-302)+(1.044)+(2.024), (I-302)+(1.044)+(2.025), (I-302)+(1.044)+(2.026), (I-302)+(1.044)+(2.027), (I-302)+(1.044)+(2.028), (I-302)+(1.044)+(2.029), (I-302)+(1.044)+(2.030), (I-302)+(1.044)+(2.031), (I-302)+(1.044)+(2.032), (I-302)+(1.044)+(2.033), (I-302)+(1.044)+(2.034), (I-302)+(1.044)+(2.035), (I-302)+(1.044)+(2.036), (I-302)+(1.044)+(2.037), (I-302)+(1.044)+(2.038), (I-302)+(1.044)+(2.039), (I-302)+(1.044)+(2.040), (I-302)+(1.044)+(2.041), (I-302)+(1.044)+(2.042), (I-302)+(1.044)+(2.043), (I-302)+(1.044)+(2.044), (I-302)+(1.044)+(2.045), (I-302)+(1.044)+(2.046), (I-302)+(1.044)+(2.047), (I-302)+(1.044)+(2.048), (I-302)+(1.044)+(2.049), (I-302)+(1.044)+(2.050), (I-302)+(1.044)+(2.051), (I-302)+(1.044)+(2.052), (I-302)+(1.044)+(2.053), (I-302)+(1.044)+(2.054), (I-302)+(1.044)+(2.055), (I-302)+(1.044)+(2.056), (I-302)+(1.044)+(2.057), (I-302)+(1.044)+(2.058), (I-302)+(1.044)+(2.059), (I-302)+(1.044)+(3.001), (I-302)+(1.044)+(3.002), (I-302)+(1.044)+(3.003), (I-302)+(1.044)+(3.004), (I-302)+(1.044)+(3.005), (I-302)+(1.044)+(3.006), (I-302)+(1.044)+(3.007), (I-302)+(1.044)+(3.008), (I-302)+(1.044)+(3.009), (I-302)+(1.044)+(3.010), (I-302)+(1.044)+(3.011), (I-302)+(1.044)+(3.012), (I-302)+(1.044)+(3.013), (I-302)+(1.044)+(3.014), (I-302)+(1.044)+(3.015), (I-302)+(1.044)+(3.016), (I-302)+(1.044)+(3.017), (I-302)+(1.044)+(3.018), (I-302)+(1.044)+(3.019), (I-302)+(1.044)+(3.020), (I-302)+(1.044)+(3.021), (I-302)+(1.044)+(3.022), (I-302)+(1.044)+(3.023), (I-302)+(1.044)+(3.024), (I-302)+(1.044)+(3.025), (I-302)+(1.044)+(3.026), (I-302)+(1.044)+(3.027), (I-302)+(1.044)+(3.028), (I-302)+(1.044)+(3.029), (I-302)+(1.044)+(3.030), (I-302)+(1.044)+(3.031), (I-302)+(1.044)+(5.001), (I-302)+(1.044)+(5.002), (I-302)+(1.044)+(5.003), (I-302)+(1.044)+(5.004), (I-302)+(1.044)+(5.005), (I-302)+(1.044)+(5.006), (I-302)+(1.044)+(5.007), (I-302)+(1.044)+(5.008), (I-302)+(1.044)+(5.009), (I-302)+(1.044)+(5.010), (I-302)+(1.044)+(5.011), (I-302)+(1.044)+(5.012), (I-302)+(1.044)+(5.013), (I-302)+(1.044)+(5.014), (I-302)+(1.044)+(5.015), (I-302)+(1.044)+(5.016), (I-302)+(1.044)+(5.017), (I-302)+(1.044)+(5.018), (I-302)+(1.044)+(5.019), (I-302)+(1.044)+(5.020), (I-302)+(1.044)+(5.021), (I-302)+(1.044)+(5.022), (I-302)+(1.044)+(5.023), (I-302)+(1.044)+(6.001), (I-302)+(1.044)+(6.002), (I-302)+(1.044)+(6.003), (I-302)+(1.044)+(6.004), (I-302)+(1.044)+(7.001), (I-302)+(1.044)+(7.002), (I-302)+(1.044)+(7.003), (I-302)+(1.044)+(7.004), (I-302)+(1.044)+(7.005), (I-302)+(1.044)+(7.006), (I-302)+(1.044)+(9.001), (I-302)+(1.044)+(9.002), (I-302)+(1.044)+(9.003), (I-302)+(1.044)+(9.004), (I-302)+(1.044)+(9.005), (I-302)+(1.044)+(9.006), (I-302)+(1.044)+(9.007), (I-302)+(1.044)+(9.008), (I-302)+(1.044)+(9.009), (I-302)+(1.044)+(14.001), (I-302)+(1.044)+(14.002), (I-302)+(1.044)+(15.008), (I-302)+(1.044)+(15.011), (I-302)+(1.044)+(15.012), (I-302)+(1.044)+(15.016), (I-302)+(1.044)+(15.025), (I-302)+(1.044)+(15.027), (I-302)+(1.044)+(15.047), (I-302)+(1.044)+(15.063), (I-302)+(1.044)+(15.064), (I-302)+(1.044)+(16.001), (I-302)+(1.044)+(16.002), (I-302)+(1.044)+(16.003), (I-302)+(1.044)+(16.004), (I-302)+(1.044)+(16.005), (I-302)+(1.044)+(16.006), (I-302)+(1.044)+(16.007), (I-302)+(1.044)+(16.008), (I-302)+(1.044)+(17.001), (I-302)+(1.044)+(17.002), (I-302)+(1.044)+(17.003), (I-302)+(1.044)+(17.004), (I-302)+(1.044)+(17.005), (I-302)+(1.044)+(17.006), (I-302)+(1.044)+(17.007), (I-302)+(1.044)+(17.008), (I-302)+(1.044)+(17.009), (I-302)+(1.044)+(17.010), (I-302)+(1.044)+(17.011), (I-302)+(1.044)+(17.012), (I-302)+(1.044)+(18.001), (I-302)+(1.045)+(1.046), (I-302)+(1.045)+(1.047), (I-302)+(1.045)+(1.048), (I-302)+(1.045)+(1.049), (I-302)+(1.045)+(1.050), (I-302)+(1.045)+(1.051), (I-302)+(1.045)+(1.052), (I-302)+(1.045)+(1.053), (I-302)+(1.045)+(1.054), (I-302)+(1.045)+(1.055), (I-302)+(1.045)+(1.056), (I-302)+(1.045)+(1.057), (I-302)+(1.045)+(1.058), (I-302)+(1.045)+(1.059), (I-302)+(1.045)+(1.060), (I-302)+(1.045)+(1.061), (I-302)+(1.045)+(1.062), (I-302)+(1.045)+(1.063), (I-302)+(1.045)+(1.064), (I-302)+(1.045)+(1.065), (I-302)+(1.045)+(1.066), (I-302)+(1.045)+(1.067), (I-302)+(1.045)+(1.068), (I-302)+(1.045)+(1.069), (I-302)+(1.045)+(1.070), (I-302)+(1.045)+(1.071), (I-302)+(1.045)+(1.072), (I-302)+(1.045)+(1.073), (I-302)+(1.045)+(1.074), (I-302)+(1.045)+(1.075), (I-302)+(1.045)+(1.076), (I-302)+(1.045)+(1.077), (I-302)+(1.045)+(1.078), (I-302)+(1.045)+(1.079), (I-302)+(1.045)+(1.080), (I-302)+(1.045)+(1.081), (I-302)+(1.045)+(1.082), (I-302)+(1.045)+(1.083), (I-302)+(1.045)+(1.084), (I-302)+(1.045)+(1.085), (I-302)+(1.045)+(1.086), (I-302)+(1.045)+(1.087), (I-302)+(1.045)+(1.088), (I-302)+(1.045)+(1.089), (I-302)+(1.045)+(1.090), (I-302)+(1.045)+(1.091), (I-302)+(1.045)+(1.092), (I-302)+(1.045)+(2.001), (I-302)+(1.045)+(2.002), (I-302)+(1.045)+(2.003), (I-302)+(1.045)+(2.004), (I-302)+(1.045)+(2.005), (I-302)+(1.045)+(2.006), (I-302)+(1.045)+(2.007), (I-302)+(1.045)+(2.008), (I-302)+(1.045)+(2.009), (I-302)+(1.045)+(2.010), (I-302)+(1.045)+(2.011), (I-302)+(1.045)+(2.012), (I-302)+(1.045)+(2.013), (I-302)+(1.045)+(2.014), (I-302)+(1.045)+(2.015), (I-302)+(1.045)+(2.016), (I-302)+(1.045)+(2.017), (I-302)+(1.045)+(2.018), (I-302)+(1.045)+(2.019), (I-302)+(1.045)+(2.020), (I-302)+(1.045)+(2.021), (I-302)+(1.045)+(2.022), (I-302)+(1.045)+(2.023), (I-302)+(1.045)+(2.024), (I-302)+(1.045)+(2.025), (I-302)+(1.045)+(2.026), (I-302)+(1.045)+(2.027), (I-302)+(1.045)+(2.028), (I-302)+(1.045)+(2.029), (I-302)+(1.045)+(2.030), (I-302)+(1.045)+(2.031), (I-302)+(1.045)+(2.032), (I-302)+(1.045)+(2.033), (I-302)+(1.045)+(2.034), (I-302)+(1.045)+(2.035), (I-302)+(1.045)+(2.036), (I-302)+(1.045)+(2.037), (I-302)+(1.045)+(2.038), (I-302)+(1.045)+(2.039), (I-302)+(1.045)+(2.040), (I-302)+(1.045)+(2.041), (I-302)+(1.045)+(2.042), (I-302)+(1.045)+(2.043), (I-302)+(1.045)+(2.044), (I-302)+(1.045)+(2.045), (I-302)+(1.045)+(2.046), (I-302)+(1.045)+(2.047), (I-302)+(1.045)+(2.048), (I-302)+(1.045)+(2.049), (I-302)+(1.045)+(2.050), (I-302)+(1.045)+(2.051), (I-302)+(1.045)+(2.052), (I-302)+(1.045)+(2.053), (I-302)+(1.045)+(2.054), (I-302)+(1.045)+(2.055), (I-302)+(1.045)+(2.056), (I-302)+(1.045)+(2.057), (I-302)+(1.045)+(2.058), (I-302)+(1.045)+(2.059), (I-302)+(1.045)+(3.001), (I-302)+(1.045)+(3.002), (I-302)+(1.045)+(3.003), (I-302)+(1.045)+(3.004), (I-302)+(1.045)+(3.005), (I-302)+(1.045)+(3.006), (I-302)+(1.045)+(3.007), (I-302)+(1.045)+(3.008), (I-302)+(1.045)+(3.009), (I-302)+(1.045)+(3.010), (I-302)+(1.045)+(3.011), (I-302)+(1.045)+(3.012), (I-302)+(1.045)+(3.013), (I-302)+(1.045)+(3.014), (I-302)+(1.045)+(3.015), (I-302)+(1.045)+(3.016), (I-302)+(1.045)+(3.017), (I-302)+(1.045)+(3.018), (I-302)+(1.045)+(3.019), (I-302)+(1.045)+(3.020), (I-302)+(1.045)+(3.021), (I-302)+(1.045)+(3.022), (I-302)+(1.045)+(3.023), (I-302)+(1.045)+(3.024), (I-302)+(1.045)+(3.025), (I-302)+(1.045)+(3.026), (I-302)+(1.045)+(3.027), (I-302)+(1.045)+(3.028), (I-302)+(1.045)+(3.029), (I-302)+(1.045)+(3.030), (I-302)+(1.045)+(3.031), (I-302)+(1.045)+(5.001), (I-302)+(1.045)+(5.002), (I-302)+(1.045)+(5.003), (I-302)+(1.045)+(5.004), (I-302)+(1.045)+(5.005), (I-302)+(1.045)+(5.006), (I-302)+(1.045)+(5.007), (I-302)+(1.045)+(5.008), (I-302)+(1.045)+(5.009), (I-302)+(1.045)+(5.010), (I-302)+(1.045)+(5.011), (I-302)+(1.045)+(5.012), (I-302)+(1.045)+(5.013), (I-302)+(1.045)+(5.014), (I-302)+(1.045)+(5.015), (I-302)+(1.045)+(5.016), (I-302)+(1.045)+(5.017), (I-302)+(1.045)+(5.018), (I-302)+(1.045)+(5.019), (I-302)+(1.045)+(5.020), (I-302)+(1.045)+(5.021), (I-302)+(1.045)+(5.022), (I-302)+(1.045)+(5.023), (I-302)+(1.045)+(6.001), (I-302)+(1.045)+(6.002), (I-302)+(1.045)+(6.003), (I-302)+(1.045)+(6.004), (I-302)+(1.045)+(7.001), (I-302)+(1.045)+(7.002), (I-302)+(1.045)+(7.003), (I-302)+(1.045)+(7.004), (I-302)+(1.045)+(7.005), (I-302)+(1.045)+(7.006), (I-302)+(1.045)+(9.001), (I-302)+(1.045)+(9.002), (I-302)+(1.045)+(9.003), (I-302)+(1.045)+(9.004), (I-302)+(1.045)+(9.005), (I-302)+(1.045)+(9.006), (I-302)+(1.045)+(9.007), (I-302)+(1.045)+(9.008), (I-302)+(1.045)+(9.009), (I-302)+(1.045)+(14.001), (I-302)+(1.045)+(14.002), (I-302)+(1.045)+(15.008), (I-302)+(1.045)+(15.011), (I-302)+(1.045)+(15.012), (I-302)+(1.045)+(15.016), (I-302)+(1.045)+(15.025), (I-302)+(1.045)+(15.027), (I-302)+(1.045)+(15.047), (I-302)+(1.045)+(15.063), (I-302)+(1.045)+(15.064), (I-302)+(1.045)+(16.001), (I-302)+(1.045)+(16.002), (I-302)+(1.045)+(16.003), (I-302)+(1.045)+(16.004), (I-302)+(1.045)+(16.005), (I-302)+(1.045)+(16.006), (I-302)+(1.045)+(16.007), (I-302)+(1.045)+(16.008), (I-302)+(1.045)+(17.001), (I-302)+(1.045)+(17.002), (I-302)+(1.045)+(17.003), (I-302)+(1.045)+(17.004), (I-302)+(1.045)+(17.005), (I-302)+(1.045)+(17.006), (I-302)+(1.045)+(17.007), (I-302)+(1.045)+(17.008), (I-302)+(1.045)+(17.009), (I-302)+(1.045)+(17.010), (I-302)+(1.045)+(17.011), (I-302)+(1.045)+(17.012), (I-302)+(1.045)+(18.001), (I-302)+(1.046)+(1.047), (I-302)+(1.046)+(1.048), (I-302)+(1.046)+(1.049), (I-302)+(1.046)+(1.050), (I-302)+(1.046)+(1.051), (I-302)+(1.046)+(1.052), (I-302)+(1.046)+(1.053), (I-302)+(1.046)+(1.054), (I-302)+(1.046)+(1.055), (I-302)+(1.046)+(1.056), (I-302)+(1.046)+(1.057), (I-302)+(1.046)+(1.058), (I-302)+(1.046)+(1.059), (I-302)+(1.046)+(1.060), (I-302)+(1.046)+(1.061), (I-302)+(1.046)+(1.062), (I-302)+(1.046)+(1.063), (I-302)+(1.046)+(1.064), (I-302)+(1.046)+(1.065), (I-302)+(1.046)+(1.066), (I-302)+(1.046)+(1.067), (I-302)+(1.046)+(1.068), (I-302)+(1.046)+(1.069), (I-302)+(1.046)+(1.070), (I-302)+(1.046)+(1.071), (I-302)+(1.046)+(1.072), (I-302)+(1.046)+(1.073), (I-302)+(1.046)+(1.074), (I-302)+(1.046)+(1.075), (I-302)+(1.046)+(1.076), (I-302)+(1.046)+(1.077), (I-302)+(1.046)+(1.078), (I-302)+(1.046)+(1.079), (I-302)+(1.046)+(1.080), (I-302)+(1.046)+(1.081), (I-302)+(1.046)+(1.082), (I-302)+(1.046)+(1.083), (I-302)+(1.046)+(1.084), (I-302)+(1.046)+(1.085), (I-302)+(1.046)+(1.086), (I-302)+(1.046)+(1.087), (I-302)+(1.046)+(1.088), (I-302)+(1.046)+(1.089), (I-302)+(1.046)+(1.090), (I-302)+(1.046)+(1.091), (I-302)+(1.046)+(1.092), (I-302)+(1.046)+(2.001), (I-302)+(1.046)+(2.002), (I-302)+(1.046)+(2.003), (I-302)+(1.046)+(2.004), (I-302)+(1.046)+(2.005), (I-302)+(1.046)+(2.006), (I-302)+(1.046)+(2.007), (I-302)+(1.046)+(2.008), (I-302)+(1.046)+(2.009), (I-302)+(1.046)+(2.010), (I-302)+(1.046)+(2.011), (I-302)+(1.046)+(2.012), (I-302)+(1.046)+(2.013), (I-302)+(1.046)+(2.014), (I-302)+(1.046)+(2.015), (I-302)+(1.046)+(2.016), (I-302)+(1.046)+(2.017), (I-302)+(1.046)+(2.018), (I-302)+(1.046)+(2.019), (I-302)+(1.046)+(2.020), (I-302)+(1.046)+(2.021), (I-302)+(1.046)+(2.022), (I-302)+(1.046)+(2.023), (I-302)+(1.046)+(2.024), (I-302)+(1.046)+(2.025), (I-302)+(1.046)+(2.026), (I-302)+(1.046)+(2.027), (I-302)+(1.046)+(2.028), (I-302)+(1.046)+(2.029), (I-302)+(1.046)+(2.030), (I-302)+(1.046)+(2.031), (I-302)+(1.046)+(2.032), (I-302)+(1.046)+(2.033), (I-302)+(1.046)+(2.034), (I-302)+(1.046)+(2.035), (I-302)+(1.046)+(2.036), (I-302)+(1.046)+(2.037), (I-302)+(1.046)+(2.038), (I-302)+(1.046)+(2.039), (I-302)+(1.046)+(2.040), (I-302)+(1.046)+(2.041), (I-302)+(1.046)+(2.042), (I-302)+(1.046)+(2.043), (I-302)+(1.046)+(2.044), (I-302)+(1.046)+(2.045), (I-302)+(1.046)+(2.046), (I-302)+(1.046)+(2.047), (I-302)+(1.046)+(2.048), (I-302)+(1.046)+(2.049), (I-302)+(1.046)+(2.050), (I-302)+(1.046)+(2.051), (I-302)+(1.046)+(2.052), (I-302)+(1.046)+(2.053), (I-302)+(1.046)+(2.054), (I-302)+(1.046)+(2.055), (I-302)+(1.046)+(2.056), (I-302)+(1.046)+(2.057), (I-302)+(1.046)+(2.058), (I-302)+(1.046)+(2.059), (I-302)+(1.046)+(3.001), (I-302)+(1.046)+(3.002), (I-302)+(1.046)+(3.003), (I-302)+(1.046)+(3.004), (I-302)+(1.046)+(3.005), (I-302)+(1.046)+(3.006), (I-302)+(1.046)+(3.007), (I-302)+(1.046)+(3.008), (I-302)+(1.046)+(3.009), (I-302)+(1.046)+(3.010), (I-302)+(1.046)+(3.011), (I-302)+(1.046)+(3.012), (I-302)+(1.046)+(3.013), (I-302)+(1.046)+(3.014), (I-302)+(1.046)+(3.015), (I-302)+(1.046)+(3.016), (I-302)+(1.046)+(3.017), (I-302)+(1.046)+(3.018), (I-302)+(1.046)+(3.019), (I-302)+(1.046)+(3.020), (I-302)+(1.046)+(3.021), (I-302)+(1.046)+(3.022), (I-302)+(1.046)+(3.023), (I-302)+(1.046)+(3.024), (I-302)+(1.046)+(3.025), (I-302)+(1.046)+(3.026), (I-302)+(1.046)+(3.027), (I-302)+(1.046)+(3.028), (I-302)+(1.046)+(3.029), (I-302)+(1.046)+(3.030), (I-302)+(1.046)+(3.031), (I-302)+(1.046)+(5.001), (I-302)+(1.046)+(5.002), (I-302)+(1.046)+(5.003), (I-302)+(1.046)+(5.004), (I-302)+(1.046)+(5.005), (I-302)+(1.046)+(5.006), (I-302)+(1.046)+(5.007), (I-302)+(1.046)+(5.008), (I-302)+(1.046)+(5.009), (I-302)+(1.046)+(5.010), (I-302)+(1.046)+(5.011), (I-302)+(1.046)+(5.012), (I-302)+(1.046)+(5.013), (I-302)+(1.046)+(5.014), (I-302)+(1.046)+(5.015), (I-302)+(1.046)+(5.016), (I-302)+(1.046)+(5.017), (I-302)+(1.046)+(5.018), (I-302)+(1.046)+(5.019), (I-302)+(1.046)+(5.020), (I-302)+(1.046)+(5.021), (I-302)+(1.046)+(5.022), (I-302)+(1.046)+(5.023), (I-302)+(1.046)+(6.001), (I-302)+(1.046)+(6.002), (I-302)+(1.046)+(6.003), (I-302)+(1.046)+(6.004), (I-302)+(1.046)+(7.001), (I-302)+(1.046)+(7.002), (I-302)+(1.046)+(7.003), (I-302)+(1.046)+(7.004), (I-302)+(1.046)+(7.005), (I-302)+(1.046)+(7.006), (I-302)+(1.046)+(9.001), (I-302)+(1.046)+(9.002), (I-302)+(1.046)+(9.003), (I-302)+(1.046)+(9.004), (I-302)+(1.046)+(9.005), (I-302)+(1.046)+(9.006), (I-302)+(1.046)+(9.007), (I-302)+(1.046)+(9.008), (I-302)+(1.046)+(9.009), (I-302)+(1.046)+(14.001), (I-302)+(1.046)+(14.002), (I-302)+(1.046)+(15.008), (I-302)+(1.046)+(15.011), (I-302)+(1.046)+(15.012), (I-302)+(1.046)+(15.016), (I-302)+(1.046)+(15.025), (I-302)+(1.046)+(15.027), (I-302)+(1.046)+(15.047), (I-302)+(1.046)+(15.063), (I-302)+(1.046)+(15.064), (I-302)+(1.046)+(16.001), (I-302)+(1.046)+(16.002), (I-302)+(1.046)+(16.003), (I-302)+(1.046)+(16.004), (I-302)+(1.046)+(16.005), (I-302)+(1.046)+(16.006), (I-302)+(1.046)+(16.007), (I-302)+(1.046)+(16.008), (I-302)+(1.046)+(17.001), (I-302)+(1.046)+(17.002), (I-302)+(1.046)+(17.003), (I-302)+(1.046)+(17.004), (I-302)+(1.046)+(17.005), (I-302)+(1.046)+(17.006), (I-302)+(1.046)+(17.007), (I-302)+(1.046)+(17.008), (I-302)+(1.046)+(17.009), (I-302)+(1.046)+(17.010), (I-302)+(1.046)+(17.011), (I-302)+(1.046)+(17.012), (I-302)+(1.046)+(18.001), (I-302)+(1.047)+(1.048), (I-302)+(1.047)+(1.049), (I-302)+(1.047)+(1.050), (I-302)+(1.047)+(1.051), (I-302)+(1.047)+(1.052), (I-302)+(1.047)+(1.053), (I-302)+(1.047)+(1.054), (I-302)+(1.047)+(1.055), (I-302)+(1.047)+(1.056), (I-302)+(1.047)+(1.057), (I-302)+(1.047)+(1.058), (I-302)+(1.047)+(1.059), (I-302)+(1.047)+(1.060), (I-302)+(1.047)+(1.061), (I-302)+(1.047)+(1.062), (I-302)+(1.047)+(1.063), (I-302)+(1.047)+(1.064), (I-302)+(1.047)+(1.065), (I-302)+(1.047)+(1.066), (I-302)+(1.047)+(1.067), (I-302)+(1.047)+(1.068), (I-302)+(1.047)+(1.069), (I-302)+(1.047)+(1.070), (I-302)+(1.047)+(1.071), (I-302)+(1.047)+(1.072), (I-302)+(1.047)+(1.073), (I-302)+(1.047)+(1.074), (I-302)+(1.047)+(1.075), (I-302)+(1.047)+(1.076), (I-302)+(1.047)+(1.077), (I-302)+(1.047)+(1.078), (I-302)+(1.047)+(1.079), (I-302)+(1.047)+(1.080), (I-302)+(1.047)+(1.081), (I-302)+(1.047)+(1.082), (I-302)+(1.047)+(1.083), (I-302)+(1.047)+(1.084), (I-302)+(1.047)+(1.085), (I-302)+(1.047)+(1.086), (I-302)+(1.047)+(1.087), (I-302)+(1.047)+(1.088), (I-302)+(1.047)+(1.089), (I-302)+(1.047)+(1.090), (I-302)+(1.047)+(1.091), (I-302)+(1.047)+(1.092), (I-302)+(1.047)+(2.001), (I-302)+(1.047)+(2.002), (I-302)+(1.047)+(2.003), (I-302)+(1.047)+(2.004), (I-302)+(1.047)+(2.005), (I-302)+(1.047)+(2.006), (I-302)+(1.047)+(2.007), (I-302)+(1.047)+(2.008), (I-302)+(1.047)+(2.009), (I-302)+(1.047)+(2.010), (I-302)+(1.047)+(2.011), (I-302)+(1.047)+(2.012), (I-302)+(1.047)+(2.013), (I-302)+(1.047)+(2.014), (I-302)+(1.047)+(2.015), (I-302)+(1.047)+(2.016), (I-302)+(1.047)+(2.017), (I-302)+(1.047)+(2.018), (I-302)+(1.047)+(2.019), (I-302)+(1.047)+(2.020), (I-302)+(1.047)+(2.021), (I-302)+(1.047)+(2.022), (I-302)+(1.047)+(2.023), (I-302)+(1.047)+(2.024), (I-302)+(1.047)+(2.025), (I-302)+(1.047)+(2.026), (I-302)+(1.047)+(2.027), (I-302)+(1.047)+(2.028), (I-302)+(1.047)+(2.029), (I-302)+(1.047)+(2.030), (I-302)+(1.047)+(2.031), (I-302)+(1.047)+(2.032), (I-302)+(1.047)+(2.033), (I-302)+(1.047)+(2.034), (I-302)+(1.047)+(2.035), (I-302)+(1.047)+(2.036), (I-302)+(1.047)+(2.037), (I-302)+(1.047)+(2.038), (I-302)+(1.047)+(2.039), (I-302)+(1.047)+(2.040), (I-302)+(1.047)+(2.041), (I-302)+(1.047)+(2.042), (I-302)+(1.047)+(2.043), (I-302)+(1.047)+(2.044), (I-302)+(1.047)+(2.045), (I-302)+(1.047)+(2.046), (I-302)+(1.047)+(2.047), (I-302)+(1.047)+(2.048), (I-302)+(1.047)+(2.049), (I-302)+(1.047)+(2.050), (I-302)+(1.047)+(2.051), (I-302)+(1.047)+(2.052), (I-302)+(1.047)+(2.053), (I-302)+(1.047)+(2.054), (I-302)+(1.047)+(2.055), (I-302)+(1.047)+(2.056), (I-302)+(1.047)+(2.057), (I-302)+(1.047)+(2.058), (I-302)+(1.047)+(2.059), (I-302)+(1.047)+(3.001), (I-302)+(1.047)+(3.002), (I-302)+(1.047)+(3.003), (I-302)+(1.047)+(3.004), (I-302)+(1.047)+(3.005), (I-302)+(1.047)+(3.006), (I-302)+(1.047)+(3.007), (I-302)+(1.047)+(3.008), (I-302)+(1.047)+(3.009), (I-302)+(1.047)+(3.010), (I-302)+(1.047)+(3.011), (I-302)+(1.047)+(3.012), (I-302)+(1.047)+(3.013), (I-302)+(1.047)+(3.014), (I-302)+(1.047)+(3.015), (I-302)+(1.047)+(3.016), (I-302)+(1.047)+(3.017), (I-302)+(1.047)+(3.018), (I-302)+(1.047)+(3.019), (I-302)+(1.047)+(3.020), (I-302)+(1.047)+(3.021), (I-302)+(1.047)+(3.022), (I-302)+(1.047)+(3.023), (I-302)+(1.047)+(3.024), (I-302)+(1.047)+(3.025), (I-302)+(1.047)+(3.026), (I-302)+(1.047)+(3.027), (I-302)+(1.047)+(3.028), (I-302)+(1.047)+(3.029), (I-302)+(1.047)+(3.030), (I-302)+(1.047)+(3.031), (I-302)+(1.047)+(5.001), (I-302)+(1.047)+(5.002), (I-302)+(1.047)+(5.003), (I-302)+(1.047)+(5.004), (I-302)+(1.047)+(5.005), (I-302)+(1.047)+(5.006), (I-302)+(1.047)+(5.007), (I-302)+(1.047)+(5.008), (I-302)+(1.047)+(5.009), (I-302)+(1.047)+(5.010), (I-302)+(1.047)+(5.011), (I-302)+(1.047)+(5.012), (I-302)+(1.047)+(5.013), (I-302)+(1.047)+(5.014), (I-302)+(1.047)+(5.015), (I-302)+(1.047)+(5.016), (I-302)+(1.047)+(5.017), (I-302)+(1.047)+(5.018), (I-302)+(1.047)+(5.019), (I-302)+(1.047)+(5.020), (I-302)+(1.047)+(5.021), (I-302)+(1.047)+(5.022), (I-302)+(1.047)+(5.023), (I-302)+(1.047)+(6.001), (I-302)+(1.047)+(6.002), (I-302)+(1.047)+(6.003), (I-302)+(1.047)+(6.004), (I-302)+(1.047)+(7.001), (I-302)+(1.047)+(7.002), (I-302)+(1.047)+(7.003), (I-302)+(1.047)+(7.004), (I-302)+(1.047)+(7.005), (I-302)+(1.047)+(7.006), (I-302)+(1.047)+(9.001), (I-302)+(1.047)+(9.002), (I-302)+(1.047)+(9.003), (I-302)+(1.047)+(9.004), (I-302)+(1.047)+(9.005), (I-302)+(1.047)+(9.006), (I-302)+(1.047)+(9.007), (I-302)+(1.047)+(9.008), (I-302)+(1.047)+(9.009), (I-302)+(1.047)+(14.001), (I-302)+(1.047)+(14.002), (I-302)+(1.047)+(15.008), (I-302)+(1.047)+(15.011), (I-302)+(1.047)+(15.012), (I-302)+(1.047)+(15.016), (I-302)+(1.047)+(15.025), (I-302)+(1.047)+(15.027), (I-302)+(1.047)+(15.047), (I-302)+(1.047)+(15.063), (I-302)+(1.047)+(15.064), (I-302)+(1.047)+(16.001), (I-302)+(1.047)+(16.002), (I-302)+(1.047)+(16.003), (I-302)+(1.047)+(16.004), (I-302)+(1.047)+(16.005), (I-302)+(1.047)+(16.006), (I-302)+(1.047)+(16.007), (I-302)+(1.047)+(16.008), (I-302)+(1.047)+(17.001), (I-302)+(1.047)+(17.002), (I-302)+(1.047)+(17.003), (I-302)+(1.047)+(17.004), (I-302)+(1.047)+(17.005), (I-302)+(1.047)+(17.006), (I-302)+(1.047)+(17.007), (I-302)+(1.047)+(17.008), (I-302)+(1.047)+(17.009), (I-302)+(1.047)+(17.010), (I-302)+(1.047)+(17.011), (I-302)+(1.047)+(17.012), (I-302)+(1.047)+(18.001), (I-302)+(1.048)+(1.049), (I-302)+(1.048)+(1.050), (I-302)+(1.048)+(1.051), (I-302)+(1.048)+(1.052), (I-302)+(1.048)+(1.053), (I-302)+(1.048)+(1.054), (I-302)+(1.048)+(1.055), (I-302)+(1.048)+(1.056), (I-302)+(1.048)+(1.057), (I-302)+(1.048)+(1.058), (I-302)+(1.048)+(1.059), (I-302)+(1.048)+(1.060), (I-302)+(1.048)+(1.061), (I-302)+(1.048)+(1.062), (I-302)+(1.048)+(1.063), (I-302)+(1.048)+(1.064), (I-302)+(1.048)+(1.065), (I-302)+(1.048)+(1.066), (I-302)+(1.048)+(1.067), (I-302)+(1.048)+(1.068), (I-302)+(1.048)+(1.069), (I-302)+(1.048)+(1.070), (I-302)+(1.048)+(1.071), (I-302)+(1.048)+(1.072), (I-302)+(1.048)+(1.073), (I-302)+(1.048)+(1.074), (I-302)+(1.048)+(1.075), (I-302)+(1.048)+(1.076), (I-302)+(1.048)+(1.077), (I-302)+(1.048)+(1.078), (I-302)+(1.048)+(1.079), (I-302)+(1.048)+(1.080), (I-302)+(1.048)+(1.081), (I-302)+(1.048)+(1.082), (I-302)+(1.048)+(1.083), (I-302)+(1.048)+(1.084), (I-302)+(1.048)+(1.085), (I-302)+(1.048)+(1.086), (I-302)+(1.048)+(1.087), (I-302)+(1.048)+(1.088), (I-302)+(1.048)+(1.089), (I-302)+(1.048)+(1.090), (I-302)+(1.048)+(1.091), (I-302)+(1.048)+(1.092), (I-302)+(1.048)+(2.001), (I-302)+(1.048)+(2.002), (I-302)+(1.048)+(2.003), (I-302)+(1.048)+(2.004), (I-302)+(1.048)+(2.005), (I-302)+(1.048)+(2.006), (I-302)+(1.048)+(2.007), (I-302)+(1.048)+(2.008), (I-302)+(1.048)+(2.009), (I-302)+(1.048)+(2.010), (I-302)+(1.048)+(2.011), (I-302)+(1.048)+(2.012), (I-302)+(1.048)+(2.013), (I-302)+(1.048)+(2.014), (I-302)+(1.048)+(2.015), (I-302)+(1.048)+(2.016), (I-302)+(1.048)+(2.017), (I-302)+(1.048)+(2.018), (I-302)+(1.048)+(2.019), (I-302)+(1.048)+(2.020), (I-302)+(1.048)+(2.021), (I-302)+(1.048)+(2.022), (I-302)+(1.048)+(2.023), (I-302)+(1.048)+(2.024), (I-302)+(1.048)+(2.025), (I-302)+(1.048)+(2.026), (I-302)+(1.048)+(2.027), (I-302)+(1.048)+(2.028), (I-302)+(1.048)+(2.029), (I-302)+(1.048)+(2.030), (I-302)+(1.048)+(2.031), (I-302)+(1.048)+(2.032), (I-302)+(1.048)+(2.033), (I-302)+(1.048)+(2.034), (I-302)+(1.048)+(2.035), (I-302)+(1.048)+(2.036), (I-302)+(1.048)+(2.037), (I-302)+(1.048)+(2.038), (I-302)+(1.048)+(2.039), (I-302)+(1.048)+(2.040), (I-302)+(1.048)+(2.041), (I-302)+(1.048)+(2.042), (I-302)+(1.048)+(2.043), (I-302)+(1.048)+(2.044), (I-302)+(1.048)+(2.045), (I-302)+(1.048)+(2.046), (I-302)+(1.048)+(2.047), (I-302)+(1.048)+(2.048), (I-302)+(1.048)+(2.049), (I-302)+(1.048)+(2.050), (I-302)+(1.048)+(2.051), (I-302)+(1.048)+(2.052), (I-302)+(1.048)+(2.053), (I-302)+(1.048)+(2.054), (I-302)+(1.048)+(2.055), (I-302)+(1.048)+(2.056), (I-302)+(1.048)+(2.057), (I-302)+(1.048)+(2.058), (I-302)+(1.048)+(2.059), (I-302)+(1.048)+(3.001), (I-302)+(1.048)+(3.002), (I-302)+(1.048)+(3.003), (I-302)+(1.048)+(3.004), (I-302)+(1.048)+(3.005), (I-302)+(1.048)+(3.006), (I-302)+(1.048)+(3.007), (I-302)+(1.048)+(3.008), (I-302)+(1.048)+(3.009), (I-302)+(1.048)+(3.010), (I-302)+(1.048)+(3.011), (I-302)+(1.048)+(3.012), (I-302)+(1.048)+(3.013), (I-302)+(1.048)+(3.014), (I-302)+(1.048)+(3.015), (I-302)+(1.048)+(3.016), (I-302)+(1.048)+(3.017), (I-302)+(1.048)+(3.018), (I-302)+(1.048)+(3.019), (I-302)+(1.048)+(3.020), (I-302)+(1.048)+(3.021), (I-302)+(1.048)+(3.022), (I-302)+(1.048)+(3.023), (I-302)+(1.048)+(3.024), (I-302)+(1.048)+(3.025), (I-302)+(1.048)+(3.026), (I-302)+(1.048)+(3.027), (I-302)+(1.048)+(3.028), (I-302)+(1.048)+(3.029), (I-302)+(1.048)+(3.030), (I-302)+(1.048)+(3.031), (I-302)+(1.048)+(5.001), (I-302)+(1.048)+(5.002), (I-302)+(1.048)+(5.003), (I-302)+(1.048)+(5.004), (I-302)+(1.048)+(5.005), (I-302)+(1.048)+(5.006), (I-302)+(1.048)+(5.007), (I-302)+(1.048)+(5.008), (I-302)+(1.048)+(5.009), (I-302)+(1.048)+(5.010), (I-302)+(1.048)+(5.011), (I-302)+(1.048)+(5.012), (I-302)+(1.048)+(5.013), (I-302)+(1.048)+(5.014), (I-302)+(1.048)+(5.015), (I-302)+(1.048)+(5.016), (I-302)+(1.048)+(5.017), (I-302)+(1.048)+(5.018), (I-302)+(1.048)+(5.019), (I-302)+(1.048)+(5.020), (I-302)+(1.048)+(5.021), (I-302)+(1.048)+(5.022), (I-302)+(1.048)+(5.023), (I-302)+(1.048)+(6.001), (I-302)+(1.048)+(6.002), (I-302)+(1.048)+(6.003), (I-302)+(1.048)+(6.004), (I-302)+(1.048)+(7.001), (I-302)+(1.048)+(7.002), (I-302)+(1.048)+(7.003), (I-302)+(1.048)+(7.004), (I-302)+(1.048)+(7.005), (I-302)+(1.048)+(7.006), (I-302)+(1.048)+(9.001), (I-302)+(1.048)+(9.002), (I-302)+(1.048)+(9.003), (I-302)+(1.048)+(9.004), (I-302)+(1.048)+(9.005), (I-302)+(1.048)+(9.006), (I-302)+(1.048)+(9.007), (I-302)+(1.048)+(9.008), (I-302)+(1.048)+(9.009), (I-302)+(1.048)+(14.001), (I-302)+(1.048)+(14.002), (I-302)+(1.048)+(15.008), (I-302)+(1.048)+(15.011), (I-302)+(1.048)+(15.012), (I-302)+(1.048)+(15.016), (I-302)+(1.048)+(15.025), (I-302)+(1.048)+(15.027), (I-302)+(1.048)+(15.047), (I-302)+(1.048)+(15.063), (I-302)+(1.048)+(15.064), (I-302)+(1.048)+(16.001), (I-302)+(1.048)+(16.002), (I-302)+(1.048)+(16.003), (I-302)+(1.048)+(16.004), (I-302)+(1.048)+(16.005), (I-302)+(1.048)+(16.006), (I-302)+(1.048)+(16.007), (I-302)+(1.048)+(16.008), (I-302)+(1.048)+(17.001), (I-302)+(1.048)+(17.002), (I-302)+(1.048)+(17.003), (I-302)+(1.048)+(17.004), (I-302)+(1.048)+(17.005), (I-302)+(1.048)+(17.006), (I-302)+(1.048)+(17.007), (I-302)+(1.048)+(17.008), (I-302)+(1.048)+(17.009), (I-302)+(1.048)+(17.010), (I-302)+(1.048)+(17.011), (I-302)+(1.048)+(17.012), (I-302)+(1.048)+(18.001), (I-302)+(1.049)+(1.050), (I-302)+(1.049)+(1.051), (I-302)+(1.049)+(1.052), (I-302)+(1.049)+(1.053), (I-302)+(1.049)+(1.054), (I-302)+(1.049)+(1.055), (I-302)+(1.049)+(1.056), (I-302)+(1.049)+(1.057), (I-302)+(1.049)+(1.058), (I-302)+(1.049)+(1.059), (I-302)+(1.049)+(1.060), (I-302)+(1.049)+(1.061), (I-302)+(1.049)+(1.062), (I-302)+(1.049)+(1.063), (I-302)+(1.049)+(1.064), (I-302)+(1.049)+(1.065), (I-302)+(1.049)+(1.066), (I-302)+(1.049)+(1.067), (I-302)+(1.049)+(1.068), (I-302)+(1.049)+(1.069), (I-302)+(1.049)+(1.070), (I-302)+(1.049)+(1.071), (I-302)+(1.049)+(1.072), (I-302)+(1.049)+(1.073), (I-302)+(1.049)+(1.074), (I-302)+(1.049)+(1.075), (I-302)+(1.049)+(1.076), (I-302)+(1.049)+(1.077), (I-302)+(1.049)+(1.078), (I-302)+(1.049)+(1.079), (I-302)+(1.049)+(1.080), (I-302)+(1.049)+(1.081), (I-302)+(1.049)+(1.082), (I-302)+(1.049)+(1.083), (I-302)+(1.049)+(1.084), (I-302)+(1.049)+(1.085), (I-302)+(1.049)+(1.086), (I-302)+(1.049)+(1.087), (I-302)+(1.049)+(1.088), (I-302)+(1.049)+(1.089), (I-302)+(1.049)+(1.090), (I-302)+(1.049)+(1.091), (I-302)+(1.049)+(1.092), (I-302)+(1.049)+(2.001), (I-302)+(1.049)+(2.002), (I-302)+(1.049)+(2.003), (I-302)+(1.049)+(2.004), (I-302)+(1.049)+(2.005), (I-302)+(1.049)+(2.006), (I-302)+(1.049)+(2.007), (I-302)+(1.049)+(2.008), (I-302)+(1.049)+(2.009), (I-302)+(1.049)+(2.010), (I-302)+(1.049)+(2.011), (I-302)+(1.049)+(2.012), (I-302)+(1.049)+(2.013), (I-302)+(1.049)+(2.014), (I-302)+(1.049)+(2.015), (I-302)+(1.049)+(2.016), (I-302)+(1.049)+(2.017), (I-302)+(1.049)+(2.018), (I-302)+(1.049)+(2.019), (I-302)+(1.049)+(2.020), (I-302)+(1.049)+(2.021), (I-302)+(1.049)+(2.022), (I-302)+(1.049)+(2.023), (I-302)+(1.049)+(2.024), (I-302)+(1.049)+(2.025), (I-302)+(1.049)+(2.026), (I-302)+(1.049)+(2.027), (I-302)+(1.049)+(2.028), (I-302)+(1.049)+(2.029), (I-302)+(1.049)+(2.030), (I-302)+(1.049)+(2.031), (I-302)+(1.049)+(2.032), (I-302)+(1.049)+(2.033), (I-302)+(1.049)+(2.034), (I-302)+(1.049)+(2.035), (I-302)+(1.049)+(2.036), (I-302)+(1.049)+(2.037), (I-302)+(1.049)+(2.038), (I-302)+(1.049)+(2.039), (I-302)+(1.049)+(2.040), (I-302)+(1.049)+(2.041), (I-302)+(1.049)+(2.042), (I-302)+(1.049)+(2.043), (I-302)+(1.049)+(2.044), (I-302)+(1.049)+(2.045), (I-302)+(1.049)+(2.046), (I-302)+(1.049)+(2.047), (I-302)+(1.049)+(2.048), (I-302)+(1.049)+(2.049), (I-302)+(1.049)+(2.050), (I-302)+(1.049)+(2.051), (I-302)+(1.049)+(2.052), (I-302)+(1.049)+(2.053), (I-302)+(1.049)+(2.054), (I-302)+(1.049)+(2.055), (I-302)+(1.049)+(2.056), (I-302)+(1.049)+(2.057), (I-302)+(1.049)+(2.058), (I-302)+(1.049)+(2.059), (I-302)+(1.049)+(3.001), (I-302)+(1.049)+(3.002), (I-302)+(1.049)+(3.003), (I-302)+(1.049)+(3.004), (I-302)+(1.049)+(3.005), (I-302)+(1.049)+(3.006), (I-302)+(1.049)+(3.007), (I-302)+(1.049)+(3.008), (I-302)+(1.049)+(3.009), (I-302)+(1.049)+(3.010), (I-302)+(1.049)+(3.011), (I-302)+(1.049)+(3.012), (I-302)+(1.049)+(3.013), (I-302)+(1.049)+(3.014), (I-302)+(1.049)+(3.015), (I-302)+(1.049)+(3.016), (I-302)+(1.049)+(3.017), (I-302)+(1.049)+(3.018), (I-302)+(1.049)+(3.019), (I-302)+(1.049)+(3.020), (I-302)+(1.049)+(3.021), (I-302)+(1.049)+(3.022), (I-302)+(1.049)+(3.023), (I-302)+(1.049)+(3.024), (I-302)+(1.049)+(3.025), (I-302)+(1.049)+(3.026), (I-302)+(1.049)+(3.027), (I-302)+(1.049)+(3.028), (I-302)+(1.049)+(3.029), (I-302)+(1.049)+(3.030), (I-302)+(1.049)+(3.031), (I-302)+(1.049)+(5.001), (I-302)+(1.049)+(5.002), (I-302)+(1.049)+(5.003), (I-302)+(1.049)+(5.004), (I-302)+(1.049)+(5.005), (I-302)+(1.049)+(5.006), (I-302)+(1.049)+(5.007), (I-302)+(1.049)+(5.008), (I-302)+(1.049)+(5.009), (I-302)+(1.049)+(5.010), (I-302)+(1.049)+(5.011), (I-302)+(1.049)+(5.012), (I-302)+(1.049)+(5.013), (I-302)+(1.049)+(5.014), (I-302)+(1.049)+(5.015), (I-302)+(1.049)+(5.016), (I-302)+(1.049)+(5.017), (I-302)+(1.049)+(5.018), (I-302)+(1.049)+(5.019), (I-302)+(1.049)+(5.020), (I-302)+(1.049)+(5.021), (I-302)+(1.049)+(5.022), (I-302)+(1.049)+(5.023), (I-302)+(1.049)+(6.001), (I-302)+(1.049)+(6.002), (I-302)+(1.049)+(6.003), (I-302)+(1.049)+(6.004), (I-302)+(1.049)+(7.001), (I-302)+(1.049)+(7.002), (I-302)+(1.049)+(7.003), (I-302)+(1.049)+(7.004), (I-302)+(1.049)+(7.005), (I-302)+(1.049)+(7.006), (I-302)+(1.049)+(9.001), (I-302)+(1.049)+(9.002), (I-302)+(1.049)+(9.003), (I-302)+(1.049)+(9.004), (I-302)+(1.049)+(9.005), (I-302)+(1.049)+(9.006), (I-302)+(1.049)+(9.007), (I-302)+(1.049)+(9.008), (I-302)+(1.049)+(9.009), (I-302)+(1.049)+(14.001), (I-302)+(1.049)+(14.002), (I-302)+(1.049)+(15.008), (I-302)+(1.049)+(15.011), (I-302)+(1.049)+(15.012), (I-302)+(1.049)+(15.016), (I-302)+(1.049)+(15.025), (I-302)+(1.049)+(15.027), (I-302)+(1.049)+(15.047), (I-302)+(1.049)+(15.063), (I-302)+(1.049)+(15.064), (I-302)+(1.049)+(16.001), (I-302)+(1.049)+(16.002), (I-302)+(1.049)+(16.003), (I-302)+(1.049)+(16.004), (I-302)+(1.049)+(16.005), (I-302)+(1.049)+(16.006), (I-302)+(1.049)+(16.007), (I-302)+(1.049)+(16.008), (I-302)+(1.049)+(17.001), (I-302)+(1.049)+(17.002), (I-302)+(1.049)+(17.003), (I-302)+(1.049)+(17.004), (I-302)+(1.049)+(17.005), (I-302)+(1.049)+(17.006), (I-302)+(1.049)+(17.007), (I-302)+(1.049)+(17.008), (I-302)+(1.049)+(17.009), (I-302)+(1.049)+(17.010), (I-302)+(1.049)+(17.011), (I-302)+(1.049)+(17.012), (I-302)+(1.049)+(18.001), (I-302)+(1.050)+(1.051), (I-302)+(1.050)+(1.052), (I-302)+(1.050)+(1.053), (I-302)+(1.050)+(1.054), (I-302)+(1.050)+(1.055), (I-302)+(1.050)+(1.056), (I-302)+(1.050)+(1.057), (I-302)+(1.050)+(1.058), (I-302)+(1.050)+(1.059), (I-302)+(1.050)+(1.060), (I-302)+(1.050)+(1.061), (I-302)+(1.050)+(1.062), (I-302)+(1.050)+(1.063), (I-302)+(1.050)+(1.064), (I-302)+(1.050)+(1.065), (I-302)+(1.050)+(1.066), (I-302)+(1.050)+(1.067), (I-302)+(1.050)+(1.068), (I-302)+(1.050)+(1.069), (I-302)+(1.050)+(1.070), (I-302)+(1.050)+(1.071), (I-302)+(1.050)+(1.072), (I-302)+(1.050)+(1.073), (I-302)+(1.050)+(1.074), (I-302)+(1.050)+(1.075), (I-302)+(1.050)+(1.076), (I-302)+(1.050)+(1.077), (I-302)+(1.050)+(1.078), (I-302)+(1.050)+(1.079), (I-302)+(1.050)+(1.080), (I-302)+(1.050)+(1.081), (I-302)+(1.050)+(1.082), (I-302)+(1.050)+(1.083), (I-302)+(1.050)+(1.084), (I-302)+(1.050)+(1.085), (I-302)+(1.050)+(1.086), (I-302)+(1.050)+(1.087), (I-302)+(1.050)+(1.088), (I-302)+(1.050)+(1.089), (I-302)+(1.050)+(1.090), (I-302)+(1.050)+(1.091), (I-302)+(1.050)+(1.092), (I-302)+(1.050)+(2.001), (I-302)+(1.050)+(2.002), (I-302)+(1.050)+(2.003), (I-302)+(1.050)+(2.004), (I-302)+(1.050)+(2.005), (I-302)+(1.050)+(2.006), (I-302)+(1.050)+(2.007), (I-302)+(1.050)+(2.008), (I-302)+(1.050)+(2.009), (I-302)+(1.050)+(2.010), (I-302)+(1.050)+(2.011), (I-302)+(1.050)+(2.012), (I-302)+(1.050)+(2.013), (I-302)+(1.050)+(2.014), (I-302)+(1.050)+(2.015), (I-302)+(1.050)+(2.016), (I-302)+(1.050)+(2.017), (I-302)+(1.050)+(2.018), (I-302)+(1.050)+(2.019), (I-302)+(1.050)+(2.020), (I-302)+(1.050)+(2.021), (I-302)+(1.050)+(2.022), (I-302)+(1.050)+(2.023), (I-302)+(1.050)+(2.024), (I-302)+(1.050)+(2.025), (I-302)+(1.050)+(2.026), (I-302)+(1.050)+(2.027), (I-302)+(1.050)+(2.028), (I-302)+(1.050)+(2.029), (I-302)+(1.050)+(2.030), (I-302)+(1.050)+(2.031), (I-302)+(1.050)+(2.032), (I-302)+(1.050)+(2.033), (I-302)+(1.050)+(2.034), (I-302)+(1.050)+(2.035), (I-302)+(1.050)+(2.036), (I-302)+(1.050)+(2.037), (I-302)+(1.050)+(2.038), (I-302)+(1.050)+(2.039), (I-302)+(1.050)+(2.040), (I-302)+(1.050)+(2.041), (I-302)+(1.050)+(2.042), (I-302)+(1.050)+(2.043), (I-302)+(1.050)+(2.044), (I-302)+(1.050)+(2.045), (I-302)+(1.050)+(2.046), (I-302)+(1.050)+(2.047), (I-302)+(1.050)+(2.048), (I-302)+(1.050)+(2.049), (I-302)+(1.050)+(2.050), (I-302)+(1.050)+(2.051), (I-302)+(1.050)+(2.052), (I-302)+(1.050)+(2.053), (I-302)+(1.050)+(2.054), (I-302)+(1.050)+(2.055), (I-302)+(1.050)+(2.056), (I-302)+(1.050)+(2.057), (I-302)+(1.050)+(2.058), (I-302)+(1.050)+(2.059), (I-302)+(1.050)+(3.001), (I-302)+(1.050)+(3.002), (I-302)+(1.050)+(3.003), (I-302)+(1.050)+(3.004), (I-302)+(1.050)+(3.005), (I-302)+(1.050)+(3.006), (I-302)+(1.050)+(3.007), (I-302)+(1.050)+(3.008), (I-302)+(1.050)+(3.009), (I-302)+(1.050)+(3.010), (I-302)+(1.050)+(3.011), (I-302)+(1.050)+(3.012), (I-302)+(1.050)+(3.013), (I-302)+(1.050)+(3.014), (I-302)+(1.050)+(3.015), (I-302)+(1.050)+(3.016), (I-302)+(1.050)+(3.017), (I-302)+(1.050)+(3.018), (I-302)+(1.050)+(3.019), (I-302)+(1.050)+(3.020), (I-302)+(1.050)+(3.021), (I-302)+(1.050)+(3.022), (I-302)+(1.050)+(3.023), (I-302)+(1.050)+(3.024), (I-302)+(1.050)+(3.025), (I-302)+(1.050)+(3.026), (I-302)+(1.050)+(3.027), (I-302)+(1.050)+(3.028), (I-302)+(1.050)+(3.029), (I-302)+(1.050)+(3.030), (I-302)+(1.050)+(3.031), (I-302)+(1.050)+(5.001), (I-302)+(1.050)+(5.002), (I-302)+(1.050)+(5.003), (I-302)+(1.050)+(5.004), (I-302)+(1.050)+(5.005), (I-302)+(1.050)+(5.006), (I-302)+(1.050)+(5.007), (I-302)+(1.050)+(5.008), (I-302)+(1.050)+(5.009), (I-302)+(1.050)+(5.010), (I-302)+(1.050)+(5.011), (I-302)+(1.050)+(5.012), (I-302)+(1.050)+(5.013), (I-302)+(1.050)+(5.014), (I-302)+(1.050)+(5.015), (I-302)+(1.050)+(5.016), (I-302)+(1.050)+(5.017), (I-302)+(1.050)+(5.018), (I-302)+(1.050)+(5.019), (I-302)+(1.050)+(5.020), (I-302)+(1.050)+(5.021), (I-302)+(1.050)+(5.022), (I-302)+(1.050)+(5.023), (I-302)+(1.050)+(6.001), (I-302)+(1.050)+(6.002), (I-302)+(1.050)+(6.003), (I-302)+(1.050)+(6.004), (I-302)+(1.050)+(7.001), (I-302)+(1.050)+(7.002), (I-302)+(1.050)+(7.003), (I-302)+(1.050)+(7.004), (I-302)+(1.050)+(7.005), (I-302)+(1.050)+(7.006), (I-302)+(1.050)+(9.001), (I-302)+(1.050)+(9.002), (I-302)+(1.050)+(9.003), (I-302)+(1.050)+(9.004), (I-302)+(1.050)+(9.005), (I-302)+(1.050)+(9.006), (I-302)+(1.050)+(9.007), (I-302)+(1.050)+(9.008), (I-302)+(1.050)+(9.009), (I-302)+(1.050)+(14.001), (I-302)+(1.050)+(14.002), (I-302)+(1.050)+(15.008), (I-302)+(1.050)+(15.011), (I-302)+(1.050)+(15.012), (I-302)+(1.050)+(15.016), (I-302)+(1.050)+(15.025), (I-302)+(1.050)+(15.027), (I-302)+(1.050)+(15.047), (I-302)+(1.050)+(15.063), (I-302)+(1.050)+(15.064), (I-302)+(1.050)+(16.001), (I-302)+(1.050)+(16.002), (I-302)+(1.050)+(16.003), (I-302)+(1.050)+(16.004), (I-302)+(1.050)+(16.005), (I-302)+(1.050)+(16.006), (I-302)+(1.050)+(16.007), (I-302)+(1.050)+(16.008), (I-302)+(1.050)+(17.001), (I-302)+(1.050)+(17.002), (I-302)+(1.050)+(17.003), (I-302)+(1.050)+(17.004), (I-302)+(1.050)+(17.005), (I-302)+(1.050)+(17.006), (I-302)+(1.050)+(17.007), (I-302)+(1.050)+(17.008), (I-302)+(1.050)+(17.009), (I-302)+(1.050)+(17.010), (I-302)+(1.050)+(17.011), (I-302)+(1.050)+(17.012), (I-302)+(1.050)+(18.001), (I-302)+(1.051)+(1.052), (I-302)+(1.051)+(1.053), (I-302)+(1.051)+(1.054), (I-302)+(1.051)+(1.055), (I-302)+(1.051)+(1.056), (I-302)+(1.051)+(1.057), (I-302)+(1.051)+(1.058), (I-302)+(1.051)+(1.059), (I-302)+(1.051)+(1.060), (I-302)+(1.051)+(1.061), (I-302)+(1.051)+(1.062), (I-302)+(1.051)+(1.063), (I-302)+(1.051)+(1.064), (I-302)+(1.051)+(1.065), (I-302)+(1.051)+(1.066), (I-302)+(1.051)+(1.067), (I-302)+(1.051)+(1.068), (I-302)+(1.051)+(1.069), (I-302)+(1.051)+(1.070), (I-302)+(1.051)+(1.071), (I-302)+(1.051)+(1.072), (I-302)+(1.051)+(1.073), (I-302)+(1.051)+(1.074), (I-302)+(1.051)+(1.075), (I-302)+(1.051)+(1.076), (I-302)+(1.051)+(1.077), (I-302)+(1.051)+(1.078), (I-302)+(1.051)+(1.079), (I-302)+(1.051)+(1.080), (I-302)+(1.051)+(1.081), (I-302)+(1.051)+(1.082), (I-302)+(1.051)+(1.083), (I-302)+(1.051)+(1.084), (I-302)+(1.051)+(1.085), (I-302)+(1.051)+(1.086), (I-302)+(1.051)+(1.087), (I-302)+(1.051)+(1.088), (I-302)+(1.051)+(1.089), (I-302)+(1.051)+(1.090), (I-302)+(1.051)+(1.091), (I-302)+(1.051)+(1.092), (I-302)+(1.051)+(2.001), (I-302)+(1.051)+(2.002), (I-302)+(1.051)+(2.003), (I-302)+(1.051)+(2.004), (I-302)+(1.051)+(2.005), (I-302)+(1.051)+(2.006), (I-302)+(1.051)+(2.007), (I-302)+(1.051)+(2.008), (I-302)+(1.051)+(2.009), (I-302)+(1.051)+(2.010), (I-302)+(1.051)+(2.011), (I-302)+(1.051)+(2.012), (I-302)+(1.051)+(2.013), (I-302)+(1.051)+(2.014), (I-302)+(1.051)+(2.015), (I-302)+(1.051)+(2.016), (I-302)+(1.051)+(2.017), (I-302)+(1.051)+(2.018), (I-302)+(1.051)+(2.019), (I-302)+(1.051)+(2.020), (I-302)+(1.051)+(2.021), (I-302)+(1.051)+(2.022), (I-302)+(1.051)+(2.023), (I-302)+(1.051)+(2.024), (I-302)+(1.051)+(2.025), (I-302)+(1.051)+(2.026), (I-302)+(1.051)+(2.027), (I-302)+(1.051)+(2.028), (I-302)+(1.051)+(2.029), (I-302)+(1.051)+(2.030), (I-302)+(1.051)+(2.031), (I-302)+(1.051)+(2.032), (I-302)+(1.051)+(2.033), (I-302)+(1.051)+(2.034), (I-302)+(1.051)+(2.035), (I-302)+(1.051)+(2.036), (I-302)+(1.051)+(2.037), (I-302)+(1.051)+(2.038), (I-302)+(1.051)+(2.039), (I-302)+(1.051)+(2.040), (I-302)+(1.051)+(2.041), (I-302)+(1.051)+(2.042), (I-302)+(1.051)+(2.043), (I-302)+(1.051)+(2.044), (I-302)+(1.051)+(2.045), (I-302)+(1.051)+(2.046), (I-302)+(1.051)+(2.047), (I-302)+(1.051)+(2.048), (I-302)+(1.051)+(2.049), (I-302)+(1.051)+(2.050), (I-302)+(1.051)+(2.051), (I-302)+(1.051)+(2.052), (I-302)+(1.051)+(2.053), (I-302)+(1.051)+(2.054), (I-302)+(1.051)+(2.055), (I-302)+(1.051)+(2.056), (I-302)+(1.051)+(2.057), (I-302)+(1.051)+(2.058), (I-302)+(1.051)+(2.059), (I-302)+(1.051)+(3.001), (I-302)+(1.051)+(3.002), (I-302)+(1.051)+(3.003), (I-302)+(1.051)+(3.004), (I-302)+(1.051)+(3.005), (I-302)+(1.051)+(3.006), (I-302)+(1.051)+(3.007), (I-302)+(1.051)+(3.008), (I-302)+(1.051)+(3.009), (I-302)+(1.051)+(3.010), (I-302)+(1.051)+(3.011), (I-302)+(1.051)+(3.012), (I-302)+(1.051)+(3.013), (I-302)+(1.051)+(3.014), (I-302)+(1.051)+(3.015), (I-302)+(1.051)+(3.016), (I-302)+(1.051)+(3.017), (I-302)+(1.051)+(3.018), (I-302)+(1.051)+(3.019), (I-302)+(1.051)+(3.020), (I-302)+(1.051)+(3.021), (I-302)+(1.051)+(3.022), (I-302)+(1.051)+(3.023), (I-302)+(1.051)+(3.024), (I-302)+(1.051)+(3.025), (I-302)+(1.051)+(3.026), (I-302)+(1.051)+(3.027), (I-302)+(1.051)+(3.028), (I-302)+(1.051)+(3.029), (I-302)+(1.051)+(3.030), (I-302)+(1.051)+(3.031), (I-302)+(1.051)+(5.001), (I-302)+(1.051)+(5.002), (I-302)+(1.051)+(5.003), (I-302)+(1.051)+(5.004), (I-302)+(1.051)+(5.005), (I-302)+(1.051)+(5.006), (I-302)+(1.051)+(5.007), (I-302)+(1.051)+(5.008), (I-302)+(1.051)+(5.009), (I-302)+(1.051)+(5.010), (I-302)+(1.051)+(5.011), (I-302)+(1.051)+(5.012), (I-302)+(1.051)+(5.013), (I-302)+(1.051)+(5.014), (I-302)+(1.051)+(5.015), (I-302)+(1.051)+(5.016), (I-302)+(1.051)+(5.017), (I-302)+(1.051)+(5.018), (I-302)+(1.051)+(5.019), (I-302)+(1.051)+(5.020), (I-302)+(1.051)+(5.021), (I-302)+(1.051)+(5.022), (I-302)+(1.051)+(5.023), (I-302)+(1.051)+(6.001), (I-302)+(1.051)+(6.002), (I-302)+(1.051)+(6.003), (I-302)+(1.051)+(6.004), (I-302)+(1.051)+(7.001), (I-302)+(1.051)+(7.002), (I-302)+(1.051)+(7.003), (I-302)+(1.051)+(7.004), (I-302)+(1.051)+(7.005), (I-302)+(1.051)+(7.006), (I-302)+(1.051)+(9.001), (I-302)+(1.051)+(9.002), (I-302)+(1.051)+(9.003), (I-302)+(1.051)+(9.004), (I-302)+(1.051)+(9.005), (I-302)+(1.051)+(9.006), (I-302)+(1.051)+(9.007), (I-302)+(1.051)+(9.008), (I-302)+(1.051)+(9.009), (I-302)+(1.051)+(14.001), (I-302)+(1.051)+(14.002), (I-302)+(1.051)+(15.008), (I-302)+(1.051)+(15.011), (I-302)+(1.051)+(15.012), (I-302)+(1.051)+(15.016), (I-302)+(1.051)+(15.025), (I-302)+(1.051)+(15.027), (I-302)+(1.051)+(15.047), (I-302)+(1.051)+(15.063), (I-302)+(1.051)+(15.064), (I-302)+(1.051)+(16.001), (I-302)+(1.051)+(16.002), (I-302)+(1.051)+(16.003), (I-302)+(1.051)+(16.004), (I-302)+(1.051)+(16.005), (I-302)+(1.051)+(16.006), (I-302)+(1.051)+(16.007), (I-302)+(1.051)+(16.008), (I-302)+(1.051)+(17.001), (I-302)+(1.051)+(17.002), (I-302)+(1.051)+(17.003), (I-302)+(1.051)+(17.004), (I-302)+(1.051)+(17.005), (I-302)+(1.051)+(17.006), (I-302)+(1.051)+(17.007), (I-302)+(1.051)+(17.008), (I-302)+(1.051)+(17.009), (I-302)+(1.051)+(17.010), (I-302)+(1.051)+(17.011), (I-302)+(1.051)+(17.012), (I-302)+(1.051)+(18.001), (I-302)+(1.052)+(1.053), (I-302)+(1.052)+(1.054), (I-302)+(1.052)+(1.055), (I-302)+(1.052)+(1.056), (I-302)+(1.052)+(1.057), (I-302)+(1.052)+(1.058), (I-302)+(1.052)+(1.059), (I-302)+(1.052)+(1.060), (I-302)+(1.052)+(1.061), (I-302)+(1.052)+(1.062), (I-302)+(1.052)+(1.063), (I-302)+(1.052)+(1.064), (I-302)+(1.052)+(1.065), (I-302)+(1.052)+(1.066), (I-302)+(1.052)+(1.067), (I-302)+(1.052)+(1.068), (I-302)+(1.052)+(1.069), (I-302)+(1.052)+(1.070), (I-302)+(1.052)+(1.071), (I-302)+(1.052)+(1.072), (I-302)+(1.052)+(1.073), (I-302)+(1.052)+(1.074), (I-302)+(1.052)+(1.075), (I-302)+(1.052)+(1.076), (I-302)+(1.052)+(1.077), (I-302)+(1.052)+(1.078), (I-302)+(1.052)+(1.079), (I-302)+(1.052)+(1.080), (I-302)+(1.052)+(1.081), (I-302)+(1.052)+(1.082), (I-302)+(1.052)+(1.083), (I-302)+(1.052)+(1.084), (I-302)+(1.052)+(1.085), (I-302)+(1.052)+(1.086), (I-302)+(1.052)+(1.087), (I-302)+(1.052)+(1.088), (I-302)+(1.052)+(1.089), (I-302)+(1.052)+(1.090), (I-302)+(1.052)+(1.091), (I-302)+(1.052)+(1.092), (I-302)+(1.052)+(2.001), (I-302)+(1.052)+(2.002), (I-302)+(1.052)+(2.003), (I-302)+(1.052)+(2.004), (I-302)+(1.052)+(2.005), (I-302)+(1.052)+(2.006), (I-302)+(1.052)+(2.007), (I-302)+(1.052)+(2.008), (I-302)+(1.052)+(2.009), (I-302)+(1.052)+(2.010), (I-302)+(1.052)+(2.011), (I-302)+(1.052)+(2.012), (I-302)+(1.052)+(2.013), (I-302)+(1.052)+(2.014), (I-302)+(1.052)+(2.015), (I-302)+(1.052)+(2.016), (I-302)+(1.052)+(2.017), (I-302)+(1.052)+(2.018), (I-302)+(1.052)+(2.019), (I-302)+(1.052)+(2.020), (I-302)+(1.052)+(2.021), (I-302)+(1.052)+(2.022), (I-302)+(1.052)+(2.023), (I-302)+(1.052)+(2.024), (I-302)+(1.052)+(2.025), (I-302)+(1.052)+(2.026), (I-302)+(1.052)+(2.027), (I-302)+(1.052)+(2.028), (I-302)+(1.052)+(2.029), (I-302)+(1.052)+(2.030), (I-302)+(1.052)+(2.031), (I-302)+(1.052)+(2.032), (I-302)+(1.052)+(2.033), (I-302)+(1.052)+(2.034), (I-302)+(1.052)+(2.035), (I-302)+(1.052)+(2.036), (I-302)+(1.052)+(2.037), (I-302)+(1.052)+(2.038), (I-302)+(1.052)+(2.039), (I-302)+(1.052)+(2.040), (I-302)+(1.052)+(2.041), (I-302)+(1.052)+(2.042), (I-302)+(1.052)+(2.043), (I-302)+(1.052)+(2.044), (I-302)+(1.052)+(2.045), (I-302)+(1.052)+(2.046), (I-302)+(1.052)+(2.047), (I-302)+(1.052)+(2.048), (I-302)+(1.052)+(2.049), (I-302)+(1.052)+(2.050), (I-302)+(1.052)+(2.051), (I-302)+(1.052)+(2.052), (I-302)+(1.052)+(2.053), (I-302)+(1.052)+(2.054), (I-302)+(1.052)+(2.055), (I-302)+(1.052)+(2.056), (I-302)+(1.052)+(2.057), (I-302)+(1.052)+(2.058), (I-302)+(1.052)+(2.059), (I-302)+(1.052)+(3.001), (I-302)+(1.052)+(3.002), (I-302)+(1.052)+(3.003), (I-302)+(1.052)+(3.004), (I-302)+(1.052)+(3.005), (I-302)+(1.052)+(3.006), (I-302)+(1.052)+(3.007), (I-302)+(1.052)+(3.008), (I-302)+(1.052)+(3.009), (I-302)+(1.052)+(3.010), (I-302)+(1.052)+(3.011), (I-302)+(1.052)+(3.012), (I-302)+(1.052)+(3.013), (I-302)+(1.052)+(3.014), (I-302)+(1.052)+(3.015), (I-302)+(1.052)+(3.016), (I-302)+(1.052)+(3.017), (I-302)+(1.052)+(3.018), (I-302)+(1.052)+(3.019), (I-302)+(1.052)+(3.020), (I-302)+(1.052)+(3.021), (I-302)+(1.052)+(3.022), (I-302)+(1.052)+(3.023), (I-302)+(1.052)+(3.024), (I-302)+(1.052)+(3.025), (I-302)+(1.052)+(3.026), (I-302)+(1.052)+(3.027), (I-302)+(1.052)+(3.028), (I-302)+(1.052)+(3.029), (I-302)+(1.052)+(3.030), (I-302)+(1.052)+(3.031), (I-302)+(1.052)+(5.001), (I-302)+(1.052)+(5.002), (I-302)+(1.052)+(5.003), (I-302)+(1.052)+(5.004), (I-302)+(1.052)+(5.005), (I-302)+(1.052)+(5.006), (I-302)+(1.052)+(5.007), (I-302)+(1.052)+(5.008), (I-302)+(1.052)+(5.009), (I-302)+(1.052)+(5.010), (I-302)+(1.052)+(5.011), (I-302)+(1.052)+(5.012), (I-302)+(1.052)+(5.013), (I-302)+(1.052)+(5.014), (I-302)+(1.052)+(5.015), (I-302)+(1.052)+(5.016), (I-302)+(1.052)+(5.017), (I-302)+(1.052)+(5.018), (I-302)+(1.052)+(5.019), (I-302)+(1.052)+(5.020), (I-302)+(1.052)+(5.021), (I-302)+(1.052)+(5.022), (I-302)+(1.052)+(5.023), (I-302)+(1.052)+(6.001), (I-302)+(1.052)+(6.002), (I-302)+(1.052)+(6.003), (I-302)+(1.052)+(6.004), (I-302)+(1.052)+(7.001), (I-302)+(1.052)+(7.002), (I-302)+(1.052)+(7.003), (I-302)+(1.052)+(7.004), (I-302)+(1.052)+(7.005), (I-302)+(1.052)+(7.006), (I-302)+(1.052)+(9.001), (I-302)+(1.052)+(9.002), (I-302)+(1.052)+(9.003), (I-302)+(1.052)+(9.004), (I-302)+(1.052)+(9.005), (I-302)+(1.052)+(9.006), (I-302)+(1.052)+(9.007), (I-302)+(1.052)+(9.008), (I-302)+(1.052)+(9.009), (I-302)+(1.052)+(14.001), (I-302)+(1.052)+(14.002), (I-302)+(1.052)+(15.008), (I-302)+(1.052)+(15.011), (I-302)+(1.052)+(15.012), (I-302)+(1.052)+(15.016), (I-302)+(1.052)+(15.025), (I-302)+(1.052)+(15.027), (I-302)+(1.052)+(15.047), (I-302)+(1.052)+(15.063), (I-302)+(1.052)+(15.064), (I-302)+(1.052)+(16.001), (I-302)+(1.052)+(16.002), (I-302)+(1.052)+(16.003), (I-302)+(1.052)+(16.004), (I-302)+(1.052)+(16.005), (I-302)+(1.052)+(16.006), (I-302)+(1.052)+(16.007), (I-302)+(1.052)+(16.008), (I-302)+(1.052)+(17.001), (I-302)+(1.052)+(17.002), (I-302)+(1.052)+(17.003), (I-302)+(1.052)+(17.004), (I-302)+(1.052)+(17.005), (I-302)+(1.052)+(17.006), (I-302)+(1.052)+(17.007), (I-302)+(1.052)+(17.008), (I-302)+(1.052)+(17.009), (I-302)+(1.052)+(17.010), (I-302)+(1.052)+(17.011), (I-302)+(1.052)+(17.012), (I-302)+(1.052)+(18.001), (I-302)+(1.053)+(1.054), (I-302)+(1.053)+(1.055), (I-302)+(1.053)+(1.056), (I-302)+(1.053)+(1.057), (I-302)+(1.053)+(1.058), (I-302)+(1.053)+(1.059), (I-302)+(1.053)+(1.060), (I-302)+(1.053)+(1.061), (I-302)+(1.053)+(1.062), (I-302)+(1.053)+(1.063), (I-302)+(1.053)+(1.064), (I-302)+(1.053)+(1.065), (I-302)+(1.053)+(1.066), (I-302)+(1.053)+(1.067), (I-302)+(1.053)+(1.068), (I-302)+(1.053)+(1.069), (I-302)+(1.053)+(1.070), (I-302)+(1.053)+(1.071), (I-302)+(1.053)+(1.072), (I-302)+(1.053)+(1.073), (I-302)+(1.053)+(1.074), (I-302)+(1.053)+(1.075), (I-302)+(1.053)+(1.076), (I-302)+(1.053)+(1.077), (I-302)+(1.053)+(1.078), (I-302)+(1.053)+(1.079), (I-302)+(1.053)+(1.080), (I-302)+(1.053)+(1.081), (I-302)+(1.053)+(1.082), (I-302)+(1.053)+(1.083), (I-302)+(1.053)+(1.084), (I-302)+(1.053)+(1.085), (I-302)+(1.053)+(1.086), (I-302)+(1.053)+(1.087), (I-302)+(1.053)+(1.088), (I-302)+(1.053)+(1.089), (I-302)+(1.053)+(1.090), (I-302)+(1.053)+(1.091), (I-302)+(1.053)+(1.092), (I-302)+(1.053)+(2.001), (I-302)+(1.053)+(2.002), (I-302)+(1.053)+(2.003), (I-302)+(1.053)+(2.004), (I-302)+(1.053)+(2.005), (I-302)+(1.053)+(2.006), (I-302)+(1.053)+(2.007), (I-302)+(1.053)+(2.008), (I-302)+(1.053)+(2.009), (I-302)+(1.053)+(2.010), (I-302)+(1.053)+(2.011), (I-302)+(1.053)+(2.012), (I-302)+(1.053)+(2.013), (I-302)+(1.053)+(2.014), (I-302)+(1.053)+(2.015), (I-302)+(1.053)+(2.016), (I-302)+(1.053)+(2.017), (I-302)+(1.053)+(2.018), (I-302)+(1.053)+(2.019), (I-302)+(1.053)+(2.020), (I-302)+(1.053)+(2.021), (I-302)+(1.053)+(2.022), (I-302)+(1.053)+(2.023), (I-302)+(1.053)+(2.024), (I-302)+(1.053)+(2.025), (I-302)+(1.053)+(2.026), (I-302)+(1.053)+(2.027), (I-302)+(1.053)+(2.028), (I-302)+(1.053)+(2.029), (I-302)+(1.053)+(2.030), (I-302)+(1.053)+(2.031), (I-302)+(1.053)+(2.032), (I-302)+(1.053)+(2.033), (I-302)+(1.053)+(2.034), (I-302)+(1.053)+(2.035), (I-302)+(1.053)+(2.036), (I-302)+(1.053)+(2.037), (I-302)+(1.053)+(2.038), (I-302)+(1.053)+(2.039), (I-302)+(1.053)+(2.040), (I-302)+(1.053)+(2.041), (I-302)+(1.053)+(2.042), (I-302)+(1.053)+(2.043), (I-302)+(1.053)+(2.044), (I-302)+(1.053)+(2.045), (I-302)+(1.053)+(2.046), (I-302)+(1.053)+(2.047), (I-302)+(1.053)+(2.048), (I-302)+(1.053)+(2.049), (I-302)+(1.053)+(2.050), (I-302)+(1.053)+(2.051), (I-302)+(1.053)+(2.052), (I-302)+(1.053)+(2.053), (I-302)+(1.053)+(2.054), (I-302)+(1.053)+(2.055), (I-302)+(1.053)+(2.056), (I-302)+(1.053)+(2.057), (I-302)+(1.053)+(2.058), (I-302)+(1.053)+(2.059), (I-302)+(1.053)+(3.001), (I-302)+(1.053)+(3.002), (I-302)+(1.053)+(3.003), (I-302)+(1.053)+(3.004), (I-302)+(1.053)+(3.005), (I-302)+(1.053)+(3.006), (I-302)+(1.053)+(3.007), (I-302)+(1.053)+(3.008), (I-302)+(1.053)+(3.009), (I-302)+(1.053)+(3.010), (I-302)+(1.053)+(3.011), (I-302)+(1.053)+(3.012), (I-302)+(1.053)+(3.013), (I-302)+(1.053)+(3.014), (I-302)+(1.053)+(3.015), (I-302)+(1.053)+(3.016), (I-302)+(1.053)+(3.017), (I-302)+(1.053)+(3.018), (I-302)+(1.053)+(3.019), (I-302)+(1.053)+(3.020), (I-302)+(1.053)+(3.021), (I-302)+(1.053)+(3.022), (I-302)+(1.053)+(3.023), (I-302)+(1.053)+(3.024), (I-302)+(1.053)+(3.025), (I-302)+(1.053)+(3.026), (I-302)+(1.053)+(3.027), (I-302)+(1.053)+(3.028), (I-302)+(1.053)+(3.029), (I-302)+(1.053)+(3.030), (I-302)+(1.053)+(3.031), (I-302)+(1.053)+(5.001), (I-302)+(1.053)+(5.002), (I-302)+(1.053)+(5.003), (I-302)+(1.053)+(5.004), (I-302)+(1.053)+(5.005), (I-302)+(1.053)+(5.006), (I-302)+(1.053)+(5.007), (I-302)+(1.053)+(5.008), (I-302)+(1.053)+(5.009), (I-302)+(1.053)+(5.010), (I-302)+(1.053)+(5.011), (I-302)+(1.053)+(5.012), (I-302)+(1.053)+(5.013), (I-302)+(1.053)+(5.014), (I-302)+(1.053)+(5.015), (I-302)+(1.053)+(5.016), (I-302)+(1.053)+(5.017), (I-302)+(1.053)+(5.018), (I-302)+(1.053)+(5.019), (I-302)+(1.053)+(5.020), (I-302)+(1.053)+(5.021), (I-302)+(1.053)+(5.022), (I-302)+(1.053)+(5.023), (I-302)+(1.053)+(6.001), (I-302)+(1.053)+(6.002), (I-302)+(1.053)+(6.003), (I-302)+(1.053)+(6.004), (I-302)+(1.053)+(7.001), (I-302)+(1.053)+(7.002), (I-302)+(1.053)+(7.003), (I-302)+(1.053)+(7.004), (I-302)+(1.053)+(7.005), (I-302)+(1.053)+(7.006), (I-302)+(1.053)+(9.001), (I-302)+(1.053)+(9.002), (I-302)+(1.053)+(9.003), (I-302)+(1.053)+(9.004), (I-302)+(1.053)+(9.005), (I-302)+(1.053)+(9.006), (I-302)+(1.053)+(9.007), (I-302)+(1.053)+(9.008), (I-302)+(1.053)+(9.009), (I-302)+(1.053)+(14.001), (I-302)+(1.053)+(14.002), (I-302)+(1.053)+(15.008), (I-302)+(1.053)+(15.011), (I-302)+(1.053)+(15.012), (I-302)+(1.053)+(15.016), (I-302)+(1.053)+(15.025), (I-302)+(1.053)+(15.027), (I-302)+(1.053)+(15.047), (I-302)+(1.053)+(15.063), (I-302)+(1.053)+(15.064), (I-302)+(1.053)+(16.001), (I-302)+(1.053)+(16.002), (I-302)+(1.053)+(16.003), (I-302)+(1.053)+(16.004), (I-302)+(1.053)+(16.005), (I-302)+(1.053)+(16.006), (I-302)+(1.053)+(16.007), (I-302)+(1.053)+(16.008), (I-302)+(1.053)+(17.001), (I-302)+(1.053)+(17.002), (I-302)+(1.053)+(17.003), (I-302)+(1.053)+(17.004), (I-302)+(1.053)+(17.005), (I-302)+(1.053)+(17.006), (I-302)+(1.053)+(17.007), (I-302)+(1.053)+(17.008), (I-302)+(1.053)+(17.009), (I-302)+(1.053)+(17.010), (I-302)+(1.053)+(17.011), (I-302)+(1.053)+(17.012), (I-302)+(1.053)+(18.001), (I-302)+(1.054)+(1.055), (I-302)+(1.054)+(1.056), (I-302)+(1.054)+(1.057), (I-302)+(1.054)+(1.058), (I-302)+(1.054)+(1.059), (I-302)+(1.054)+(1.060), (I-302)+(1.054)+(1.061), (I-302)+(1.054)+(1.062), (I-302)+(1.054)+(1.063), (I-302)+(1.054)+(1.064), (I-302)+(1.054)+(1.065), (I-302)+(1.054)+(1.066), (I-302)+(1.054)+(1.067), (I-302)+(1.054)+(1.068), (I-302)+(1.054)+(1.069), (I-302)+(1.054)+(1.070), (I-302)+(1.054)+(1.071), (I-302)+(1.054)+(1.072), (I-302)+(1.054)+(1.073), (I-302)+(1.054)+(1.074), (I-302)+(1.054)+(1.075), (I-302)+(1.054)+(1.076), (I-302)+(1.054)+(1.077), (I-302)+(1.054)+(1.078), (I-302)+(1.054)+(1.079), (I-302)+(1.054)+(1.080), (I-302)+(1.054)+(1.081), (I-302)+(1.054)+(1.082), (I-302)+(1.054)+(1.083), (I-302)+(1.054)+(1.084), (I-302)+(1.054)+(1.085), (I-302)+(1.054)+(1.086), (I-302)+(1.054)+(1.087), (I-302)+(1.054)+(1.088), (I-302)+(1.054)+(1.089), (I-302)+(1.054)+(1.090), (I-302)+(1.054)+(1.091), (I-302)+(1.054)+(1.092), (I-302)+(1.054)+(2.001), (I-302)+(1.054)+(2.002), (I-302)+(1.054)+(2.003), (I-302)+(1.054)+(2.004), (I-302)+(1.054)+(2.005), (I-302)+(1.054)+(2.006), (I-302)+(1.054)+(2.007), (I-302)+(1.054)+(2.008), (I-302)+(1.054)+(2.009), (I-302)+(1.054)+(2.010), (I-302)+(1.054)+(2.011), (I-302)+(1.054)+(2.012), (I-302)+(1.054)+(2.013), (I-302)+(1.054)+(2.014), (I-302)+(1.054)+(2.015), (I-302)+(1.054)+(2.016), (I-302)+(1.054)+(2.017), (I-302)+(1.054)+(2.018), (I-302)+(1.054)+(2.019), (I-302)+(1.054)+(2.020), (I-302)+(1.054)+(2.021), (I-302)+(1.054)+(2.022), (I-302)+(1.054)+(2.023), (I-302)+(1.054)+(2.024), (I-302)+(1.054)+(2.025), (I-302)+(1.054)+(2.026), (I-302)+(1.054)+(2.027), (I-302)+(1.054)+(2.028), (I-302)+(1.054)+(2.029), (I-302)+(1.054)+(2.030), (I-302)+(1.054)+(2.031), (I-302)+(1.054)+(2.032), (I-302)+(1.054)+(2.033), (I-302)+(1.054)+(2.034), (I-302)+(1.054)+(2.035), (I-302)+(1.054)+(2.036), (I-302)+(1.054)+(2.037), (I-302)+(1.054)+(2.038), (I-302)+(1.054)+(2.039), (I-302)+(1.054)+(2.040), (I-302)+(1.054)+(2.041), (I-302)+(1.054)+(2.042), (I-302)+(1.054)+(2.043), (I-302)+(1.054)+(2.044), (I-302)+(1.054)+(2.045), (I-302)+(1.054)+(2.046), (I-302)+(1.054)+(2.047), (I-302)+(1.054)+(2.048), (I-302)+(1.054)+(2.049), (I-302)+(1.054)+(2.050), (I-302)+(1.054)+(2.051), (I-302)+(1.054)+(2.052), (I-302)+(1.054)+(2.053), (I-302)+(1.054)+(2.054), (I-302)+(1.054)+(2.055), (I-302)+(1.054)+(2.056), (I-302)+(1.054)+(2.057), (I-302)+(1.054)+(2.058), (I-302)+(1.054)+(2.059), (I-302)+(1.054)+(3.001), (I-302)+(1.054)+(3.002), (I-302)+(1.054)+(3.003), (I-302)+(1.054)+(3.004), (I-302)+(1.054)+(3.005), (I-302)+(1.054)+(3.006), (I-302)+(1.054)+(3.007), (I-302)+(1.054)+(3.008), (I-302)+(1.054)+(3.009), (I-302)+(1.054)+(3.010), (I-302)+(1.054)+(3.011), (I-302)+(1.054)+(3.012), (I-302)+(1.054)+(3.013), (I-302)+(1.054)+(3.014), (I-302)+(1.054)+(3.015), (I-302)+(1.054)+(3.016), (I-302)+(1.054)+(3.017), (I-302)+(1.054)+(3.018), (I-302)+(1.054)+(3.019), (I-302)+(1.054)+(3.020), (I-302)+(1.054)+(3.021), (I-302)+(1.054)+(3.022), (I-302)+(1.054)+(3.023), (I-302)+(1.054)+(3.024), (I-302)+(1.054)+(3.025), (I-302)+(1.054)+(3.026), (I-302)+(1.054)+(3.027), (I-302)+(1.054)+(3.028), (I-302)+(1.054)+(3.029), (I-302)+(1.054)+(3.030), (I-302)+(1.054)+(3.031), (I-302)+(1.054)+(5.001), (I-302)+(1.054)+(5.002), (I-302)+(1.054)+(5.003), (I-302)+(1.054)+(5.004), (I-302)+(1.054)+(5.005), (I-302)+(1.054)+(5.006), (I-302)+(1.054)+(5.007), (I-302)+(1.054)+(5.008), (I-302)+(1.054)+(5.009), (I-302)+(1.054)+(5.010), (I-302)+(1.054)+(5.011), (I-302)+(1.054)+(5.012), (I-302)+(1.054)+(5.013), (I-302)+(1.054)+(5.014), (I-302)+(1.054)+(5.015), (I-302)+(1.054)+(5.016), (I-302)+(1.054)+(5.017), (I-302)+(1.054)+(5.018), (I-302)+(1.054)+(5.019), (I-302)+(1.054)+(5.020), (I-302)+(1.054)+(5.021), (I-302)+(1.054)+(5.022), (I-302)+(1.054)+(5.023), (I-302)+(1.054)+(6.001), (I-302)+(1.054)+(6.002), (I-302)+(1.054)+(6.003), (I-302)+(1.054)+(6.004), (I-302)+(1.054)+(7.001), (I-302)+(1.054)+(7.002), (I-302)+(1.054)+(7.003), (I-302)+(1.054)+(7.004), (I-302)+(1.054)+(7.005), (I-302)+(1.054)+(7.006), (I-302)+(1.054)+(9.001), (I-302)+(1.054)+(9.002), (I-302)+(1.054)+(9.003), (I-302)+(1.054)+(9.004), (I-302)+(1.054)+(9.005), (I-302)+(1.054)+(9.006), (I-302)+(1.054)+(9.007), (I-302)+(1.054)+(9.008), (I-302)+(1.054)+(9.009), (I-302)+(1.054)+(14.001), (I-302)+(1.054)+(14.002), (I-302)+(1.054)+(15.008), (I-302)+(1.054)+(15.011), (I-302)+(1.054)+(15.012), (I-302)+(1.054)+(15.016), (I-302)+(1.054)+(15.025), (I-302)+(1.054)+(15.027), (I-302)+(1.054)+(15.047), (I-302)+(1.054)+(15.063), (I-302)+(1.054)+(15.064), (I-302)+(1.054)+(16.001), (I-302)+(1.054)+(16.002), (I-302)+(1.054)+(16.003), (I-302)+(1.054)+(16.004), (I-302)+(1.054)+(16.005), (I-302)+(1.054)+(16.006), (I-302)+(1.054)+(16.007), (I-302)+(1.054)+(16.008), (I-302)+(1.054)+(17.001), (I-302)+(1.054)+(17.002), (I-302)+(1.054)+(17.003), (I-302)+(1.054)+(17.004), (I-302)+(1.054)+(17.005), (I-302)+(1.054)+(17.006), (I-302)+(1.054)+(17.007), (I-302)+(1.054)+(17.008), (I-302)+(1.054)+(17.009), (I-302)+(1.054)+(17.010), (I-302)+(1.054)+(17.011), (I-302)+(1.054)+(17.012), (I-302)+(1.054)+(18.001), (I-302)+(1.055)+(1.056), (I-302)+(1.055)+(1.057), (I-302)+(1.055)+(1.058), (I-302)+(1.055)+(1.059), (I-302)+(1.055)+(1.060), (I-302)+(1.055)+(1.061), (I-302)+(1.055)+(1.062), (I-302)+(1.055)+(1.063), (I-302)+(1.055)+(1.064), (I-302)+(1.055)+(1.065), (I-302)+(1.055)+(1.066), (I-302)+(1.055)+(1.067), (I-302)+(1.055)+(1.068), (I-302)+(1.055)+(1.069), (I-302)+(1.055)+(1.070), (I-302)+(1.055)+(1.071), (I-302)+(1.055)+(1.072), (I-302)+(1.055)+(1.073), (I-302)+(1.055)+(1.074), (I-302)+(1.055)+(1.075), (I-302)+(1.055)+(1.076), (I-302)+(1.055)+(1.077), (I-302)+(1.055)+(1.078), (I-302)+(1.055)+(1.079), (I-302)+(1.055)+(1.080), (I-302)+(1.055)+(1.081), (I-302)+(1.055)+(1.082), (I-302)+(1.055)+(1.083), (I-302)+(1.055)+(1.084), (I-302)+(1.055)+(1.085), (I-302)+(1.055)+(1.086), (I-302)+(1.055)+(1.087), (I-302)+(1.055)+(1.088), (I-302)+(1.055)+(1.089), (I-302)+(1.055)+(1.090), (I-302)+(1.055)+(1.091), (I-302)+(1.055)+(1.092), (I-302)+(1.055)+(2.001), (I-302)+(1.055)+(2.002), (I-302)+(1.055)+(2.003), (I-302)+(1.055)+(2.004), (I-302)+(1.055)+(2.005), (I-302)+(1.055)+(2.006), (I-302)+(1.055)+(2.007), (I-302)+(1.055)+(2.008), (I-302)+(1.055)+(2.009), (I-302)+(1.055)+(2.010), (I-302)+(1.055)+(2.011), (I-302)+(1.055)+(2.012), (I-302)+(1.055)+(2.013), (I-302)+(1.055)+(2.014), (I-302)+(1.055)+(2.015), (I-302)+(1.055)+(2.016), (I-302)+(1.055)+(2.017), (I-302)+(1.055)+(2.018), (I-302)+(1.055)+(2.019), (I-302)+(1.055)+(2.020), (I-302)+(1.055)+(2.021), (I-302)+(1.055)+(2.022), (I-302)+(1.055)+(2.023), (I-302)+(1.055)+(2.024), (I-302)+(1.055)+(2.025), (I-302)+(1.055)+(2.026), (I-302)+(1.055)+(2.027), (I-302)+(1.055)+(2.028), (I-302)+(1.055)+(2.029), (I-302)+(1.055)+(2.030), (I-302)+(1.055)+(2.031), (I-302)+(1.055)+(2.032), (I-302)+(1.055)+(2.033), (I-302)+(1.055)+(2.034), (I-302)+(1.055)+(2.035), (I-302)+(1.055)+(2.036), (I-302)+(1.055)+(2.037), (I-302)+(1.055)+(2.038), (I-302)+(1.055)+(2.039), (I-302)+(1.055)+(2.040), (I-302)+(1.055)+(2.041), (I-302)+(1.055)+(2.042), (I-302)+(1.055)+(2.043), (I-302)+(1.055)+(2.044), (I-302)+(1.055)+(2.045), (I-302)+(1.055)+(2.046), (I-302)+(1.055)+(2.047), (I-302)+(1.055)+(2.048), (I-302)+(1.055)+(2.049), (I-302)+(1.055)+(2.050), (I-302)+(1.055)+(2.051), (I-302)+(1.055)+(2.052), (I-302)+(1.055)+(2.053), (I-302)+(1.055)+(2.054), (I-302)+(1.055)+(2.055), (I-302)+(1.055)+(2.056), (I-302)+(1.055)+(2.057), (I-302)+(1.055)+(2.058), (I-302)+(1.055)+(2.059), (I-302)+(1.055)+(3.001), (I-302)+(1.055)+(3.002), (I-302)+(1.055)+(3.003), (I-302)+(1.055)+(3.004), (I-302)+(1.055)+(3.005), (I-302)+(1.055)+(3.006), (I-302)+(1.055)+(3.007), (I-302)+(1.055)+(3.008), (I-302)+(1.055)+(3.009), (I-302)+(1.055)+(3.010), (I-302)+(1.055)+(3.011), (I-302)+(1.055)+(3.012), (I-302)+(1.055)+(3.013), (I-302)+(1.055)+(3.014), (I-302)+(1.055)+(3.015), (I-302)+(1.055)+(3.016), (I-302)+(1.055)+(3.017), (I-302)+(1.055)+(3.018), (I-302)+(1.055)+(3.019), (I-302)+(1.055)+(3.020), (I-302)+(1.055)+(3.021), (I-302)+(1.055)+(3.022), (I-302)+(1.055)+(3.023), (I-302)+(1.055)+(3.024), (I-302)+(1.055)+(3.025), (I-302)+(1.055)+(3.026), (I-302)+(1.055)+(3.027), (I-302)+(1.055)+(3.028), (I-302)+(1.055)+(3.029), (I-302)+(1.055)+(3.030), (I-302)+(1.055)+(3.031), (I-302)+(1.055)+(5.001), (I-302)+(1.055)+(5.002), (I-302)+(1.055)+(5.003), (I-302)+(1.055)+(5.004), (I-302)+(1.055)+(5.005), (I-302)+(1.055)+(5.006), (I-302)+(1.055)+(5.007), (I-302)+(1.055)+(5.008), (I-302)+(1.055)+(5.009), (I-302)+(1.055)+(5.010), (I-302)+(1.055)+(5.011), (I-302)+(1.055)+(5.012), (I-302)+(1.055)+(5.013), (I-302)+(1.055)+(5.014), (I-302)+(1.055)+(5.015), (I-302)+(1.055)+(5.016), (I-302)+(1.055)+(5.017), (I-302)+(1.055)+(5.018), (I-302)+(1.055)+(5.019), (I-302)+(1.055)+(5.020), (I-302)+(1.055)+(5.021), (I-302)+(1.055)+(5.022), (I-302)+(1.055)+(5.023), (I-302)+(1.055)+(6.001), (I-302)+(1.055)+(6.002), (I-302)+(1.055)+(6.003), (I-302)+(1.055)+(6.004), (I-302)+(1.055)+(7.001), (I-302)+(1.055)+(7.002), (I-302)+(1.055)+(7.003), (I-302)+(1.055)+(7.004), (I-302)+(1.055)+(7.005), (I-302)+(1.055)+(7.006), (I-302)+(1.055)+(9.001), (I-302)+(1.055)+(9.002), (I-302)+(1.055)+(9.003), (I-302)+(1.055)+(9.004), (I-302)+(1.055)+(9.005), (I-302)+(1.055)+(9.006), (I-302)+(1.055)+(9.007), (I-302)+(1.055)+(9.008), (I-302)+(1.055)+(9.009), (I-302)+(1.055)+(14.001), (I-302)+(1.055)+(14.002), (I-302)+(1.055)+(15.008), (I-302)+(1.055)+(15.011), (I-302)+(1.055)+(15.012), (I-302)+(1.055)+(15.016), (I-302)+(1.055)+(15.025), (I-302)+(1.055)+(15.027), (I-302)+(1.055)+(15.047), (I-302)+(1.055)+(15.063), (I-302)+(1.055)+(15.064), (I-302)+(1.055)+(16.001), (I-302)+(1.055)+(16.002), (I-302)+(1.055)+(16.003), (I-302)+(1.055)+(16.004), (I-302)+(1.055)+(16.005), (I-302)+(1.055)+(16.006), (I-302)+(1.055)+(16.007), (I-302)+(1.055)+(16.008), (I-302)+(1.055)+(17.001), (I-302)+(1.055)+(17.002), (I-302)+(1.055)+(17.003), (I-302)+(1.055)+(17.004), (I-302)+(1.055)+(17.005), (I-302)+(1.055)+(17.006), (I-302)+(1.055)+(17.007), (I-302)+(1.055)+(17.008), (I-302)+(1.055)+(17.009), (I-302)+(1.055)+(17.010), (I-302)+(1.055)+(17.011), (I-302)+(1.055)+(17.012), (I-302)+(1.055)+(18.001), (I-302)+(1.056)+(1.057), (I-302)+(1.056)+(1.058), (I-302)+(1.056)+(1.059), (I-302)+(1.056)+(1.060), (I-302)+(1.056)+(1.061), (I-302)+(1.056)+(1.062), (I-302)+(1.056)+(1.063), (I-302)+(1.056)+(1.064), (I-302)+(1.056)+(1.065), (I-302)+(1.056)+(1.066), (I-302)+(1.056)+(1.067), (I-302)+(1.056)+(1.068), (I-302)+(1.056)+(1.069), (I-302)+(1.056)+(1.070), (I-302)+(1.056)+(1.071), (I-302)+(1.056)+(1.072), (I-302)+(1.056)+(1.073), (I-302)+(1.056)+(1.074), (I-302)+(1.056)+(1.075), (I-302)+(1.056)+(1.076), (I-302)+(1.056)+(1.077), (I-302)+(1.056)+(1.078), (I-302)+(1.056)+(1.079), (I-302)+(1.056)+(1.080), (I-302)+(1.056)+(1.081), (I-302)+(1.056)+(1.082), (I-302)+(1.056)+(1.083), (I-302)+(1.056)+(1.084), (I-302)+(1.056)+(1.085), (I-302)+(1.056)+(1.086), (I-302)+(1.056)+(1.087), (I-302)+(1.056)+(1.088), (I-302)+(1.056)+(1.089), (I-302)+(1.056)+(1.090), (I-302)+(1.056)+(1.091), (I-302)+(1.056)+(1.092), (I-302)+(1.056)+(2.001), (I-302)+(1.056)+(2.002), (I-302)+(1.056)+(2.003), (I-302)+(1.056)+(2.004), (I-302)+(1.056)+(2.005), (I-302)+(1.056)+(2.006), (I-302)+(1.056)+(2.007), (I-302)+(1.056)+(2.008), (I-302)+(1.056)+(2.009), (I-302)+(1.056)+(2.010), (I-302)+(1.056)+(2.011), (I-302)+(1.056)+(2.012), (I-302)+(1.056)+(2.013), (I-302)+(1.056)+(2.014), (I-302)+(1.056)+(2.015), (I-302)+(1.056)+(2.016), (I-302)+(1.056)+(2.017), (I-302)+(1.056)+(2.018), (I-302)+(1.056)+(2.019), (I-302)+(1.056)+(2.020), (I-302)+(1.056)+(2.021), (I-302)+(1.056)+(2.022), (I-302)+(1.056)+(2.023), (I-302)+(1.056)+(2.024), (I-302)+(1.056)+(2.025), (I-302)+(1.056)+(2.026), (I-302)+(1.056)+(2.027), (I-302)+(1.056)+(2.028), (I-302)+(1.056)+(2.029), (I-302)+(1.056)+(2.030), (I-302)+(1.056)+(2.031), (I-302)+(1.056)+(2.032), (I-302)+(1.056)+(2.033), (I-302)+(1.056)+(2.034), (I-302)+(1.056)+(2.035), (I-302)+(1.056)+(2.036), (I-302)+(1.056)+(2.037), (I-302)+(1.056)+(2.038), (I-302)+(1.056)+(2.039), (I-302)+(1.056)+(2.040), (I-302)+(1.056)+(2.041), (I-302)+(1.056)+(2.042), (I-302)+(1.056)+(2.043), (I-302)+(1.056)+(2.044), (I-302)+(1.056)+(2.045), (I-302)+(1.056)+(2.046), (I-302)+(1.056)+(2.047), (I-302)+(1.056)+(2.048), (I-302)+(1.056)+(2.049), (I-302)+(1.056)+(2.050), (I-302)+(1.056)+(2.051), (I-302)+(1.056)+(2.052), (I-302)+(1.056)+(2.053), (I-302)+(1.056)+(2.054), (I-302)+(1.056)+(2.055), (I-302)+(1.056)+(2.056), (I-302)+(1.056)+(2.057), (I-302)+(1.056)+(2.058), (I-302)+(1.056)+(2.059), (I-302)+(1.056)+(3.001), (I-302)+(1.056)+(3.002), (I-302)+(1.056)+(3.003), (I-302)+(1.056)+(3.004), (I-302)+(1.056)+(3.005), (I-302)+(1.056)+(3.006), (I-302)+(1.056)+(3.007), (I-302)+(1.056)+(3.008), (I-302)+(1.056)+(3.009), (I-302)+(1.056)+(3.010), (I-302)+(1.056)+(3.011), (I-302)+(1.056)+(3.012), (I-302)+(1.056)+(3.013), (I-302)+(1.056)+(3.014), (I-302)+(1.056)+(3.015), (I-302)+(1.056)+(3.016), (I-302)+(1.056)+(3.017), (I-302)+(1.056)+(3.018), (I-302)+(1.056)+(3.019), (I-302)+(1.056)+(3.020), (I-302)+(1.056)+(3.021), (I-302)+(1.056)+(3.022), (I-302)+(1.056)+(3.023), (I-302)+(1.056)+(3.024), (I-302)+(1.056)+(3.025), (I-302)+(1.056)+(3.026), (I-302)+(1.056)+(3.027), (I-302)+(1.056)+(3.028), (I-302)+(1.056)+(3.029), (I-302)+(1.056)+(3.030), (I-302)+(1.056)+(3.031), (I-302)+(1.056)+(5.001), (I-302)+(1.056)+(5.002), (I-302)+(1.056)+(5.003), (I-302)+(1.056)+(5.004), (I-302)+(1.056)+(5.005), (I-302)+(1.056)+(5.006), (I-302)+(1.056)+(5.007), (I-302)+(1.056)+(5.008), (I-302)+(1.056)+(5.009), (I-302)+(1.056)+(5.010), (I-302)+(1.056)+(5.011), (I-302)+(1.056)+(5.012), (I-302)+(1.056)+(5.013), (I-302)+(1.056)+(5.014), (I-302)+(1.056)+(5.015), (I-302)+(1.056)+(5.016), (I-302)+(1.056)+(5.017), (I-302)+(1.056)+(5.018), (I-302)+(1.056)+(5.019), (I-302)+(1.056)+(5.020), (I-302)+(1.056)+(5.021), (I-302)+(1.056)+(5.022), (I-302)+(1.056)+(5.023), (I-302)+(1.056)+(6.001), (I-302)+(1.056)+(6.002), (I-302)+(1.056)+(6.003), (I-302)+(1.056)+(6.004), (I-302)+(1.056)+(7.001), (I-302)+(1.056)+(7.002), (I-302)+(1.056)+(7.003), (I-302)+(1.056)+(7.004), (I-302)+(1.056)+(7.005), (I-302)+(1.056)+(7.006), (I-302)+(1.056)+(9.001), (I-302)+(1.056)+(9.002), (I-302)+(1.056)+(9.003), (I-302)+(1.056)+(9.004), (I-302)+(1.056)+(9.005), (I-302)+(1.056)+(9.006), (I-302)+(1.056)+(9.007), (I-302)+(1.056)+(9.008), (I-302)+(1.056)+(9.009), (I-302)+(1.056)+(14.001), (I-302)+(1.056)+(14.002), (I-302)+(1.056)+(15.008), (I-302)+(1.056)+(15.011), (I-302)+(1.056)+(15.012), (I-302)+(1.056)+(15.016), (I-302)+(1.056)+(15.025), (I-302)+(1.056)+(15.027), (I-302)+(1.056)+(15.047), (I-302)+(1.056)+(15.063), (I-302)+(1.056)+(15.064), (I-302)+(1.056)+(16.001), (I-302)+(1.056)+(16.002), (I-302)+(1.056)+(16.003), (I-302)+(1.056)+(16.004), (I-302)+(1.056)+(16.005), (I-302)+(1.056)+(16.006), (I-302)+(1.056)+(16.007), (I-302)+(1.056)+(16.008), (I-302)+(1.056)+(17.001), (I-302)+(1.056)+(17.002), (I-302)+(1.056)+(17.003), (I-302)+(1.056)+(17.004), (I-302)+(1.056)+(17.005), (I-302)+(1.056)+(17.006), (I-302)+(1.056)+(17.007), (I-302)+(1.056)+(17.008), (I-302)+(1.056)+(17.009), (I-302)+(1.056)+(17.010), (I-302)+(1.056)+(17.011), (I-302)+(1.056)+(17.012), (I-302)+(1.056)+(18.001), (I-302)+(1.057)+(1.058), (I-302)+(1.057)+(1.059), (I-302)+(1.057)+(1.060), (I-302)+(1.057)+(1.061), (I-302)+(1.057)+(1.062), (I-302)+(1.057)+(1.063), (I-302)+(1.057)+(1.064), (I-302)+(1.057)+(1.065), (I-302)+(1.057)+(1.066), (I-302)+(1.057)+(1.067), (I-302)+(1.057)+(1.068), (I-302)+(1.057)+(1.069), (I-302)+(1.057)+(1.070), (I-302)+(1.057)+(1.071), (I-302)+(1.057)+(1.072), (I-302)+(1.057)+(1.073), (I-302)+(1.057)+(1.074), (I-302)+(1.057)+(1.075), (I-302)+(1.057)+(1.076), (I-302)+(1.057)+(1.077), (I-302)+(1.057)+(1.078), (I-302)+(1.057)+(1.079), (I-302)+(1.057)+(1.080), (I-302)+(1.057)+(1.081), (I-302)+(1.057)+(1.082), (I-302)+(1.057)+(1.083), (I-302)+(1.057)+(1.084), (I-302)+(1.057)+(1.085), (I-302)+(1.057)+(1.086), (I-302)+(1.057)+(1.087), (I-302)+(1.057)+(1.088), (I-302)+(1.057)+(1.089), (I-302)+(1.057)+(1.090), (I-302)+(1.057)+(1.091), (I-302)+(1.057)+(1.092), (I-302)+(1.057)+(2.001), (I-302)+(1.057)+(2.002), (I-302)+(1.057)+(2.003), (I-302)+(1.057)+(2.004), (I-302)+(1.057)+(2.005), (I-302)+(1.057)+(2.006), (I-302)+(1.057)+(2.007), (I-302)+(1.057)+(2.008), (I-302)+(1.057)+(2.009), (I-302)+(1.057)+(2.010), (I-302)+(1.057)+(2.011), (I-302)+(1.057)+(2.012), (I-302)+(1.057)+(2.013), (I-302)+(1.057)+(2.014), (I-302)+(1.057)+(2.015), (I-302)+(1.057)+(2.016), (I-302)+(1.057)+(2.017), (I-302)+(1.057)+(2.018), (I-302)+(1.057)+(2.019), (I-302)+(1.057)+(2.020), (I-302)+(1.057)+(2.021), (I-302)+(1.057)+(2.022), (I-302)+(1.057)+(2.023), (I-302)+(1.057)+(2.024), (I-302)+(1.057)+(2.025), (I-302)+(1.057)+(2.026), (I-302)+(1.057)+(2.027), (I-302)+(1.057)+(2.028), (I-302)+(1.057)+(2.029), (I-302)+(1.057)+(2.030), (I-302)+(1.057)+(2.031), (I-302)+(1.057)+(2.032), (I-302)+(1.057)+(2.033), (I-302)+(1.057)+(2.034), (I-302)+(1.057)+(2.035), (I-302)+(1.057)+(2.036), (I-302)+(1.057)+(2.037), (I-302)+(1.057)+(2.038), (I-302)+(1.057)+(2.039), (I-302)+(1.057)+(2.040), (I-302)+(1.057)+(2.041), (I-302)+(1.057)+(2.042), (I-302)+(1.057)+(2.043), (I-302)+(1.057)+(2.044), (I-302)+(1.057)+(2.045), (I-302)+(1.057)+(2.046), (I-302)+(1.057)+(2.047), (I-302)+(1.057)+(2.048), (I-302)+(1.057)+(2.049), (I-302)+(1.057)+(2.050), (I-302)+(1.057)+(2.051), (I-302)+(1.057)+(2.052), (I-302)+(1.057)+(2.053), (I-302)+(1.057)+(2.054), (I-302)+(1.057)+(2.055), (I-302)+(1.057)+(2.056), (I-302)+(1.057)+(2.057), (I-302)+(1.057)+(2.058), (I-302)+(1.057)+(2.059), (I-302)+(1.057)+(3.001), (I-302)+(1.057)+(3.002), (I-302)+(1.057)+(3.003), (I-302)+(1.057)+(3.004), (I-302)+(1.057)+(3.005), (I-302)+(1.057)+(3.006), (I-302)+(1.057)+(3.007), (I-302)+(1.057)+(3.008), (I-302)+(1.057)+(3.009), (I-302)+(1.057)+(3.010), (I-302)+(1.057)+(3.011), (I-302)+(1.057)+(3.012), (I-302)+(1.057)+(3.013), (I-302)+(1.057)+(3.014), (I-302)+(1.057)+(3.015), (I-302)+(1.057)+(3.016), (I-302)+(1.057)+(3.017), (I-302)+(1.057)+(3.018), (I-302)+(1.057)+(3.019), (I-302)+(1.057)+(3.020), (I-302)+(1.057)+(3.021), (I-302)+(1.057)+(3.022), (I-302)+(1.057)+(3.023), (I-302)+(1.057)+(3.024), (I-302)+(1.057)+(3.025), (I-302)+(1.057)+(3.026), (I-302)+(1.057)+(3.027), (I-302)+(1.057)+(3.028), (I-302)+(1.057)+(3.029), (I-302)+(1.057)+(3.030), (I-302)+(1.057)+(3.031), (I-302)+(1.057)+(5.001), (I-302)+(1.057)+(5.002), (I-302)+(1.057)+(5.003), (I-302)+(1.057)+(5.004), (I-302)+(1.057)+(5.005), (I-302)+(1.057)+(5.006), (I-302)+(1.057)+(5.007), (I-302)+(1.057)+(5.008), (I-302)+(1.057)+(5.009), (I-302)+(1.057)+(5.010), (I-302)+(1.057)+(5.011), (I-302)+(1.057)+(5.012), (I-302)+(1.057)+(5.013), (I-302)+(1.057)+(5.014), (I-302)+(1.057)+(5.015), (I-302)+(1.057)+(5.016), (I-302)+(1.057)+(5.017), (I-302)+(1.057)+(5.018), (I-302)+(1.057)+(5.019), (I-302)+(1.057)+(5.020), (I-302)+(1.057)+(5.021), (I-302)+(1.057)+(5.022), (I-302)+(1.057)+(5.023), (I-302)+(1.057)+(6.001), (I-302)+(1.057)+(6.002), (I-302)+(1.057)+(6.003), (I-302)+(1.057)+(6.004), (I-302)+(1.057)+(7.001), (I-302)+(1.057)+(7.002), (I-302)+(1.057)+(7.003), (I-302)+(1.057)+(7.004), (I-302)+(1.057)+(7.005), (I-302)+(1.057)+(7.006), (I-302)+(1.057)+(9.001), (I-302)+(1.057)+(9.002), (I-302)+(1.057)+(9.003), (I-302)+(1.057)+(9.004), (I-302)+(1.057)+(9.005), (I-302)+(1.057)+(9.006), (I-302)+(1.057)+(9.007), (I-302)+(1.057)+(9.008), (I-302)+(1.057)+(9.009), (I-302)+(1.057)+(14.001), (I-302)+(1.057)+(14.002), (I-302)+(1.057)+(15.008), (I-302)+(1.057)+(15.011), (I-302)+(1.057)+(15.012), (I-302)+(1.057)+(15.016), (I-302)+(1.057)+(15.025), (I-302)+(1.057)+(15.027), (I-302)+(1.057)+(15.047), (I-302)+(1.057)+(15.063), (I-302)+(1.057)+(15.064), (I-302)+(1.057)+(16.001), (I-302)+(1.057)+(16.002), (I-302)+(1.057)+(16.003), (I-302)+(1.057)+(16.004), (I-302)+(1.057)+(16.005), (I-302)+(1.057)+(16.006), (I-302)+(1.057)+(16.007), (I-302)+(1.057)+(16.008), (I-302)+(1.057)+(17.001), (I-302)+(1.057)+(17.002), (I-302)+(1.057)+(17.003), (I-302)+(1.057)+(17.004), (I-302)+(1.057)+(17.005), (I-302)+(1.057)+(17.006), (I-302)+(1.057)+(17.007), (I-302)+(1.057)+(17.008), (I-302)+(1.057)+(17.009), (I-302)+(1.057)+(17.010), (I-302)+(1.057)+(17.011), (I-302)+(1.057)+(17.012), (I-302)+(1.057)+(18.001), (I-302)+(1.058)+(1.059), (I-302)+(1.058)+(1.060), (I-302)+(1.058)+(1.061), (I-302)+(1.058)+(1.062), (I-302)+(1.058)+(1.063), (I-302)+(1.058)+(1.064), (I-302)+(1.058)+(1.065), (I-302)+(1.058)+(1.066), (I-302)+(1.058)+(1.067), (I-302)+(1.058)+(1.068), (I-302)+(1.058)+(1.069), (I-302)+(1.058)+(1.070), (I-302)+(1.058)+(1.071), (I-302)+(1.058)+(1.072), (I-302)+(1.058)+(1.073), (I-302)+(1.058)+(1.074), (I-302)+(1.058)+(1.075), (I-302)+(1.058)+(1.076), (I-302)+(1.058)+(1.077), (I-302)+(1.058)+(1.078), (I-302)+(1.058)+(1.079), (I-302)+(1.058)+(1.080), (I-302)+(1.058)+(1.081), (I-302)+(1.058)+(1.082), (I-302)+(1.058)+(1.083), (I-302)+(1.058)+(1.084), (I-302)+(1.058)+(1.085), (I-302)+(1.058)+(1.086), (I-302)+(1.058)+(1.087), (I-302)+(1.058)+(1.088), (I-302)+(1.058)+(1.089), (I-302)+(1.058)+(1.090), (I-302)+(1.058)+(1.091), (I-302)+(1.058)+(1.092), (I-302)+(1.058)+(2.001), (I-302)+(1.058)+(2.002), (I-302)+(1.058)+(2.003), (I-302)+(1.058)+(2.004), (I-302)+(1.058)+(2.005), (I-302)+(1.058)+(2.006), (I-302)+(1.058)+(2.007), (I-302)+(1.058)+(2.008), (I-302)+(1.058)+(2.009), (I-302)+(1.058)+(2.010), (I-302)+(1.058)+(2.011), (I-302)+(1.058)+(2.012), (I-302)+(1.058)+(2.013), (I-302)+(1.058)+(2.014), (I-302)+(1.058)+(2.015), (I-302)+(1.058)+(2.016), (I-302)+(1.058)+(2.017), (I-302)+(1.058)+(2.018), (I-302)+(1.058)+(2.019), (I-302)+(1.058)+(2.020), (I-302)+(1.058)+(2.021), (I-302)+(1.058)+(2.022), (I-302)+(1.058)+(2.023), (I-302)+(1.058)+(2.024), (I-302)+(1.058)+(2.025), (I-302)+(1.058)+(2.026), (I-302)+(1.058)+(2.027), (I-302)+(1.058)+(2.028), (I-302)+(1.058)+(2.029), (I-302)+(1.058)+(2.030), (I-302)+(1.058)+(2.031), (I-302)+(1.058)+(2.032), (I-302)+(1.058)+(2.033), (I-302)+(1.058)+(2.034), (I-302)+(1.058)+(2.035), (I-302)+(1.058)+(2.036), (I-302)+(1.058)+(2.037), (I-302)+(1.058)+(2.038), (I-302)+(1.058)+(2.039), (I-302)+(1.058)+(2.040), (I-302)+(1.058)+(2.041), (I-302)+(1.058)+(2.042), (I-302)+(1.058)+(2.043), (I-302)+(1.058)+(2.044), (I-302)+(1.058)+(2.045), (I-302)+(1.058)+(2.046), (I-302)+(1.058)+(2.047), (I-302)+(1.058)+(2.048), (I-302)+(1.058)+(2.049), (I-302)+(1.058)+(2.050), (I-302)+(1.058)+(2.051), (I-302)+(1.058)+(2.052), (I-302)+(1.058)+(2.053), (I-302)+(1.058)+(2.054), (I-302)+(1.058)+(2.055), (I-302)+(1.058)+(2.056), (I-302)+(1.058)+(2.057), (I-302)+(1.058)+(2.058), (I-302)+(1.058)+(2.059), (I-302)+(1.058)+(3.001), (I-302)+(1.058)+(3.002), (I-302)+(1.058)+(3.003), (I-302)+(1.058)+(3.004), (I-302)+(1.058)+(3.005), (I-302)+(1.058)+(3.006), (I-302)+(1.058)+(3.007), (I-302)+(1.058)+(3.008), (I-302)+(1.058)+(3.009), (I-302)+(1.058)+(3.010), (I-302)+(1.058)+(3.011), (I-302)+(1.058)+(3.012), (I-302)+(1.058)+(3.013), (I-302)+(1.058)+(3.014), (I-302)+(1.058)+(3.015), (I-302)+(1.058)+(3.016), (I-302)+(1.058)+(3.017), (I-302)+(1.058)+(3.018), (I-302)+(1.058)+(3.019), (I-302)+(1.058)+(3.020), (I-302)+(1.058)+(3.021), (I-302)+(1.058)+(3.022), (I-302)+(1.058)+(3.023), (I-302)+(1.058)+(3.024), (I-302)+(1.058)+(3.025), (I-302)+(1.058)+(3.026), (I-302)+(1.058)+(3.027), (I-302)+(1.058)+(3.028), (I-302)+(1.058)+(3.029), (I-302)+(1.058)+(3.030), (I-302)+(1.058)+(3.031), (I-302)+(1.058)+(5.001), (I-302)+(1.058)+(5.002), (I-302)+(1.058)+(5.003), (I-302)+(1.058)+(5.004), (I-302)+(1.058)+(5.005), (I-302)+(1.058)+(5.006), (I-302)+(1.058)+(5.007), (I-302)+(1.058)+(5.008), (I-302)+(1.058)+(5.009), (I-302)+(1.058)+(5.010), (I-302)+(1.058)+(5.011), (I-302)+(1.058)+(5.012), (I-302)+(1.058)+(5.013), (I-302)+(1.058)+(5.014), (I-302)+(1.058)+(5.015), (I-302)+(1.058)+(5.016), (I-302)+(1.058)+(5.017), (I-302)+(1.058)+(5.018), (I-302)+(1.058)+(5.019), (I-302)+(1.058)+(5.020), (I-302)+(1.058)+(5.021), (I-302)+(1.058)+(5.022), (I-302)+(1.058)+(5.023), (I-302)+(1.058)+(6.001), (I-302)+(1.058)+(6.002), (I-302)+(1.058)+(6.003), (I-302)+(1.058)+(6.004), (I-302)+(1.058)+(7.001), (I-302)+(1.058)+(7.002), (I-302)+(1.058)+(7.003), (I-302)+(1.058)+(7.004), (I-302)+(1.058)+(7.005), (I-302)+(1.058)+(7.006), (I-302)+(1.058)+(9.001), (I-302)+(1.058)+(9.002), (I-302)+(1.058)+(9.003), (I-302)+(1.058)+(9.004), (I-302)+(1.058)+(9.005), (I-302)+(1.058)+(9.006), (I-302)+(1.058)+(9.007), (I-302)+(1.058)+(9.008), (I-302)+(1.058)+(9.009), (I-302)+(1.058)+(14.001), (I-302)+(1.058)+(14.002), (I-302)+(1.058)+(15.008), (I-302)+(1.058)+(15.011), (I-302)+(1.058)+(15.012), (I-302)+(1.058)+(15.016), (I-302)+(1.058)+(15.025), (I-302)+(1.058)+(15.027), (I-302)+(1.058)+(15.047), (I-302)+(1.058)+(15.063), (I-302)+(1.058)+(15.064), (I-302)+(1.058)+(16.001), (I-302)+(1.058)+(16.002), (I-302)+(1.058)+(16.003), (I-302)+(1.058)+(16.004), (I-302)+(1.058)+(16.005), (I-302)+(1.058)+(16.006), (I-302)+(1.058)+(16.007), (I-302)+(1.058)+(16.008), (I-302)+(1.058)+(17.001), (I-302)+(1.058)+(17.002), (I-302)+(1.058)+(17.003), (I-302)+(1.058)+(17.004), (I-302)+(1.058)+(17.005), (I-302)+(1.058)+(17.006), (I-302)+(1.058)+(17.007), (I-302)+(1.058)+(17.008), (I-302)+(1.058)+(17.009), (I-302)+(1.058)+(17.010), (I-302)+(1.058)+(17.011), (I-302)+(1.058)+(17.012), (I-302)+(1.058)+(18.001), (I-302)+(1.059)+(1.060), (I-302)+(1.059)+(1.061), (I-302)+(1.059)+(1.062), (I-302)+(1.059)+(1.063), (I-302)+(1.059)+(1.064), (I-302)+(1.059)+(1.065), (I-302)+(1.059)+(1.066), (I-302)+(1.059)+(1.067), (I-302)+(1.059)+(1.068), (I-302)+(1.059)+(1.069), (I-302)+(1.059)+(1.070), (I-302)+(1.059)+(1.071), (I-302)+(1.059)+(1.072), (I-302)+(1.059)+(1.073), (I-302)+(1.059)+(1.074), (I-302)+(1.059)+(1.075), (I-302)+(1.059)+(1.076), (I-302)+(1.059)+(1.077), (I-302)+(1.059)+(1.078), (I-302)+(1.059)+(1.079), (I-302)+(1.059)+(1.080), (I-302)+(1.059)+(1.081), (I-302)+(1.059)+(1.082), (I-302)+(1.059)+(1.083), (I-302)+(1.059)+(1.084), (I-302)+(1.059)+(1.085), (I-302)+(1.059)+(1.086), (I-302)+(1.059)+(1.087), (I-302)+(1.059)+(1.088), (I-302)+(1.059)+(1.089), (I-302)+(1.059)+(1.090), (I-302)+(1.059)+(1.091), (I-302)+(1.059)+(1.092), (I-302)+(1.059)+(2.001), (I-302)+(1.059)+(2.002), (I-302)+(1.059)+(2.003), (I-302)+(1.059)+(2.004), (I-302)+(1.059)+(2.005), (I-302)+(1.059)+(2.006), (I-302)+(1.059)+(2.007), (I-302)+(1.059)+(2.008), (I-302)+(1.059)+(2.009), (I-302)+(1.059)+(2.010), (I-302)+(1.059)+(2.011), (I-302)+(1.059)+(2.012), (I-302)+(1.059)+(2.013), (I-302)+(1.059)+(2.014), (I-302)+(1.059)+(2.015), (I-302)+(1.059)+(2.016), (I-302)+(1.059)+(2.017), (I-302)+(1.059)+(2.018), (I-302)+(1.059)+(2.019), (I-302)+(1.059)+(2.020), (I-302)+(1.059)+(2.021), (I-302)+(1.059)+(2.022), (I-302)+(1.059)+(2.023), (I-302)+(1.059)+(2.024), (I-302)+(1.059)+(2.025), (I-302)+(1.059)+(2.026), (I-302)+(1.059)+(2.027), (I-302)+(1.059)+(2.028), (I-302)+(1.059)+(2.029), (I-302)+(1.059)+(2.030), (I-302)+(1.059)+(2.031), (I-302)+(1.059)+(2.032), (I-302)+(1.059)+(2.033), (I-302)+(1.059)+(2.034), (I-302)+(1.059)+(2.035), (I-302)+(1.059)+(2.036), (I-302)+(1.059)+(2.037), (I-302)+(1.059)+(2.038), (I-302)+(1.059)+(2.039), (I-302)+(1.059)+(2.040), (I-302)+(1.059)+(2.041), (I-302)+(1.059)+(2.042), (I-302)+(1.059)+(2.043), (I-302)+(1.059)+(2.044), (I-302)+(1.059)+(2.045), (I-302)+(1.059)+(2.046), (I-302)+(1.059)+(2.047), (I-302)+(1.059)+(2.048), (I-302)+(1.059)+(2.049), (I-302)+(1.059)+(2.050), (I-302)+(1.059)+(2.051), (I-302)+(1.059)+(2.052), (I-302)+(1.059)+(2.053), (I-302)+(1.059)+(2.054), (I-302)+(1.059)+(2.055), (I-302)+(1.059)+(2.056), (I-302)+(1.059)+(2.057), (I-302)+(1.059)+(2.058), (I-302)+(1.059)+(2.059), (I-302)+(1.059)+(3.001), (I-302)+(1.059)+(3.002), (I-302)+(1.059)+(3.003), (I-302)+(1.059)+(3.004), (I-302)+(1.059)+(3.005), (I-302)+(1.059)+(3.006), (I-302)+(1.059)+(3.007), (I-302)+(1.059)+(3.008), (I-302)+(1.059)+(3.009), (I-302)+(1.059)+(3.010), (I-302)+(1.059)+(3.011), (I-302)+(1.059)+(3.012), (I-302)+(1.059)+(3.013), (I-302)+(1.059)+(3.014), (I-302)+(1.059)+(3.015), (I-302)+(1.059)+(3.016), (I-302)+(1.059)+(3.017), (I-302)+(1.059)+(3.018), (I-302)+(1.059)+(3.019), (I-302)+(1.059)+(3.020), (I-302)+(1.059)+(3.021), (I-302)+(1.059)+(3.022), (I-302)+(1.059)+(3.023), (I-302)+(1.059)+(3.024), (I-302)+(1.059)+(3.025), (I-302)+(1.059)+(3.026), (I-302)+(1.059)+(3.027), (I-302)+(1.059)+(3.028), (I-302)+(1.059)+(3.029), (I-302)+(1.059)+(3.030), (I-302)+(1.059)+(3.031), (I-302)+(1.059)+(5.001), (I-302)+(1.059)+(5.002), (I-302)+(1.059)+(5.003), (I-302)+(1.059)+(5.004), (I-302)+(1.059)+(5.005), (I-302)+(1.059)+(5.006), (I-302)+(1.059)+(5.007), (I-302)+(1.059)+(5.008), (I-302)+(1.059)+(5.009), (I-302)+(1.059)+(5.010), (I-302)+(1.059)+(5.011), (I-302)+(1.059)+(5.012), (I-302)+(1.059)+(5.013), (I-302)+(1.059)+(5.014), (I-302)+(1.059)+(5.015), (I-302)+(1.059)+(5.016), (I-302)+(1.059)+(5.017), (I-302)+(1.059)+(5.018), (I-302)+(1.059)+(5.019), (I-302)+(1.059)+(5.020), (I-302)+(1.059)+(5.021), (I-302)+(1.059)+(5.022), (I-302)+(1.059)+(5.023), (I-302)+(1.059)+(6.001), (I-302)+(1.059)+(6.002), (I-302)+(1.059)+(6.003), (I-302)+(1.059)+(6.004), (I-302)+(1.059)+(7.001), (I-302)+(1.059)+(7.002), (I-302)+(1.059)+(7.003), (I-302)+(1.059)+(7.004), (I-302)+(1.059)+(7.005), (I-302)+(1.059)+(7.006), (I-302)+(1.059)+(9.001), (I-302)+(1.059)+(9.002), (I-302)+(1.059)+(9.003), (I-302)+(1.059)+(9.004), (I-302)+(1.059)+(9.005), (I-302)+(1.059)+(9.006), (I-302)+(1.059)+(9.007), (I-302)+(1.059)+(9.008), (I-302)+(1.059)+(9.009), (I-302)+(1.059)+(14.001), (I-302)+(1.059)+(14.002), (I-302)+(1.059)+(15.008), (I-302)+(1.059)+(15.011), (I-302)+(1.059)+(15.012), (I-302)+(1.059)+(15.016), (I-302)+(1.059)+(15.025), (I-302)+(1.059)+(15.027), (I-302)+(1.059)+(15.047), (I-302)+(1.059)+(15.063), (I-302)+(1.059)+(15.064), (I-302)+(1.059)+(16.001), (I-302)+(1.059)+(16.002), (I-302)+(1.059)+(16.003), (I-302)+(1.059)+(16.004), (I-302)+(1.059)+(16.005), (I-302)+(1.059)+(16.006), (I-302)+(1.059)+(16.007), (I-302)+(1.059)+(16.008), (I-302)+(1.059)+(17.001), (I-302)+(1.059)+(17.002), (I-302)+(1.059)+(17.003), (I-302)+(1.059)+(17.004), (I-302)+(1.059)+(17.005), (I-302)+(1.059)+(17.006), (I-302)+(1.059)+(17.007), (I-302)+(1.059)+(17.008), (I-302)+(1.059)+(17.009), (I-302)+(1.059)+(17.010), (I-302)+(1.059)+(17.011), (I-302)+(1.059)+(17.012), (I-302)+(1.059)+(18.001), (I-302)+(1.060)+(1.061), (I-302)+(1.060)+(1.062), (I-302)+(1.060)+(1.063), (I-302)+(1.060)+(1.064), (I-302)+(1.060)+(1.065), (I-302)+(1.060)+(1.066), (I-302)+(1.060)+(1.067), (I-302)+(1.060)+(1.068), (I-302)+(1.060)+(1.069), (I-302)+(1.060)+(1.070), (I-302)+(1.060)+(1.071), (I-302)+(1.060)+(1.072), (I-302)+(1.060)+(1.073), (I-302)+(1.060)+(1.074), (I-302)+(1.060)+(1.075), (I-302)+(1.060)+(1.076), (I-302)+(1.060)+(1.077), (I-302)+(1.060)+(1.078), (I-302)+(1.060)+(1.079), (I-302)+(1.060)+(1.080), (I-302)+(1.060)+(1.081), (I-302)+(1.060)+(1.082), (I-302)+(1.060)+(1.083), (I-302)+(1.060)+(1.084), (I-302)+(1.060)+(1.085), (I-302)+(1.060)+(1.086), (I-302)+(1.060)+(1.087), (I-302)+(1.060)+(1.088), (I-302)+(1.060)+(1.089), (I-302)+(1.060)+(1.090), (I-302)+(1.060)+(1.091), (I-302)+(1.060)+(1.092), (I-302)+(1.060)+(2.001), (I-302)+(1.060)+(2.002), (I-302)+(1.060)+(2.003), (I-302)+(1.060)+(2.004), (I-302)+(1.060)+(2.005), (I-302)+(1.060)+(2.006), (I-302)+(1.060)+(2.007), (I-302)+(1.060)+(2.008), (I-302)+(1.060)+(2.009), (I-302)+(1.060)+(2.010), (I-302)+(1.060)+(2.011), (I-302)+(1.060)+(2.012), (I-302)+(1.060)+(2.013), (I-302)+(1.060)+(2.014), (I-302)+(1.060)+(2.015), (I-302)+(1.060)+(2.016), (I-302)+(1.060)+(2.017), (I-302)+(1.060)+(2.018), (I-302)+(1.060)+(2.019), (I-302)+(1.060)+(2.020), (I-302)+(1.060)+(2.021), (I-302)+(1.060)+(2.022), (I-302)+(1.060)+(2.023), (I-302)+(1.060)+(2.024), (I-302)+(1.060)+(2.025), (I-302)+(1.060)+(2.026), (I-302)+(1.060)+(2.027), (I-302)+(1.060)+(2.028), (I-302)+(1.060)+(2.029), (I-302)+(1.060)+(2.030), (I-302)+(1.060)+(2.031), (I-302)+(1.060)+(2.032), (I-302)+(1.060)+(2.033), (I-302)+(1.060)+(2.034), (I-302)+(1.060)+(2.035), (I-302)+(1.060)+(2.036), (I-302)+(1.060)+(2.037), (I-302)+(1.060)+(2.038), (I-302)+(1.060)+(2.039), (I-302)+(1.060)+(2.040), (I-302)+(1.060)+(2.041), (I-302)+(1.060)+(2.042), (I-302)+(1.060)+(2.043), (I-302)+(1.060)+(2.044), (I-302)+(1.060)+(2.045), (I-302)+(1.060)+(2.046), (I-302)+(1.060)+(2.047), (I-302)+(1.060)+(2.048), (I-302)+(1.060)+(2.049), (I-302)+(1.060)+(2.050), (I-302)+(1.060)+(2.051), (I-302)+(1.060)+(2.052), (I-302)+(1.060)+(2.053), (I-302)+(1.060)+(2.054), (I-302)+(1.060)+(2.055), (I-302)+(1.060)+(2.056), (I-302)+(1.060)+(2.057), (I-302)+(1.060)+(2.058), (I-302)+(1.060)+(2.059), (I-302)+(1.060)+(3.001), (I-302)+(1.060)+(3.002), (I-302)+(1.060)+(3.003), (I-302)+(1.060)+(3.004), (I-302)+(1.060)+(3.005), (I-302)+(1.060)+(3.006), (I-302)+(1.060)+(3.007), (I-302)+(1.060)+(3.008), (I-302)+(1.060)+(3.009), (I-302)+(1.060)+(3.010), (I-302)+(1.060)+(3.011), (I-302)+(1.060)+(3.012), (I-302)+(1.060)+(3.013), (I-302)+(1.060)+(3.014), (I-302)+(1.060)+(3.015), (I-302)+(1.060)+(3.016), (I-302)+(1.060)+(3.017), (I-302)+(1.060)+(3.018), (I-302)+(1.060)+(3.019), (I-302)+(1.060)+(3.020), (I-302)+(1.060)+(3.021), (I-302)+(1.060)+(3.022), (I-302)+(1.060)+(3.023), (I-302)+(1.060)+(3.024), (I-302)+(1.060)+(3.025), (I-302)+(1.060)+(3.026), (I-302)+(1.060)+(3.027), (I-302)+(1.060)+(3.028), (I-302)+(1.060)+(3.029), (I-302)+(1.060)+(3.030), (I-302)+(1.060)+(3.031), (I-302)+(1.060)+(5.001), (I-302)+(1.060)+(5.002), (I-302)+(1.060)+(5.003), (I-302)+(1.060)+(5.004), (I-302)+(1.060)+(5.005), (I-302)+(1.060)+(5.006), (I-302)+(1.060)+(5.007), (I-302)+(1.060)+(5.008), (I-302)+(1.060)+(5.009), (I-302)+(1.060)+(5.010), (I-302)+(1.060)+(5.011), (I-302)+(1.060)+(5.012), (I-302)+(1.060)+(5.013), (I-302)+(1.060)+(5.014), (I-302)+(1.060)+(5.015), (I-302)+(1.060)+(5.016), (I-302)+(1.060)+(5.017), (I-302)+(1.060)+(5.018), (I-302)+(1.060)+(5.019), (I-302)+(1.060)+(5.020), (I-302)+(1.060)+(5.021), (I-302)+(1.060)+(5.022), (I-302)+(1.060)+(5.023), (I-302)+(1.060)+(6.001), (I-302)+(1.060)+(6.002), (I-302)+(1.060)+(6.003), (I-302)+(1.060)+(6.004), (I-302)+(1.060)+(7.001), (I-302)+(1.060)+(7.002), (I-302)+(1.060)+(7.003), (I-302)+(1.060)+(7.004), (I-302)+(1.060)+(7.005), (I-302)+(1.060)+(7.006), (I-302)+(1.060)+(9.001), (I-302)+(1.060)+(9.002), (I-302)+(1.060)+(9.003), (I-302)+(1.060)+(9.004), (I-302)+(1.060)+(9.005), (I-302)+(1.060)+(9.006), (I-302)+(1.060)+(9.007), (I-302)+(1.060)+(9.008), (I-302)+(1.060)+(9.009), (I-302)+(1.060)+(14.001), (I-302)+(1.060)+(14.002), (I-302)+(1.060)+(15.008), (I-302)+(1.060)+(15.011), (I-302)+(1.060)+(15.012), (I-302)+(1.060)+(15.016), (I-302)+(1.060)+(15.025), (I-302)+(1.060)+(15.027), (I-302)+(1.060)+(15.047), (I-302)+(1.060)+(15.063), (I-302)+(1.060)+(15.064), (I-302)+(1.060)+(16.001), (I-302)+(1.060)+(16.002), (I-302)+(1.060)+(16.003), (I-302)+(1.060)+(16.004), (I-302)+(1.060)+(16.005), (I-302)+(1.060)+(16.006), (I-302)+(1.060)+(16.007), (I-302)+(1.060)+(16.008), (I-302)+(1.060)+(17.001), (I-302)+(1.060)+(17.002), (I-302)+(1.060)+(17.003), (I-302)+(1.060)+(17.004), (I-302)+(1.060)+(17.005), (I-302)+(1.060)+(17.006), (I-302)+(1.060)+(17.007), (I-302)+(1.060)+(17.008), (I-302)+(1.060)+(17.009), (I-302)+(1.060)+(17.010), (I-302)+(1.060)+(17.011), (I-302)+(1.060)+(17.012), (I-302)+(1.060)+(18.001),
(I-302)+(1.061)+(1.062), (I-302)+(1.061)+(1.063), (I-302)+(1.061)+(1.064), (I-302)+(1.061)+(1.065), (I-302)+(1.061)+(1.066), (I-302)+(1.061)+(1.067), (I-302)+(1.061)+(1.068), (I-302)+(1.061)+(1.069), (I-302)+(1.061)+(1.070), (I-302)+(1.061)+(1.071), (I-302)+(1.061)+(1.072), (I-302)+(1.061)+(1.073), (I-302)+(1.061)+(1.074), (I-302)+(1.061)+(1.075), (I-302)+(1.061)+(1.076), (I-302)+(1.061)+(1.077), (I-302)+(1.061)+(1.078), (I-302)+(1.061)+(1.079), (I-302)+(1.061)+(1.080), (I-302)+(1.061)+(1.081), (I-302)+(1.061)+(1.082), (I-302)+(1.061)+(1.083), (I-302)+(1.061)+(1.084), (I-302)+(1.061)+(1.085), (I-302)+(1.061)+(1.086), (I-302)+(1.061)+(1.087), (I-302)+(1.061)+(1.088), (I-302)+(1.061)+(1.089), (I-302)+(1.061)+(1.090), (I-302)+(1.061)+(1.091), (I-302)+(1.061)+(1.092), (I-302)+(1.061)+(2.001), (I-302)+(1.061)+(2.002), (I-302)+(1.061)+(2.003), (I-302)+(1.061)+(2.004), (I-302)+(1.061)+(2.005), (I-302)+(1.061)+(2.006), (I-302)+(1.061)+(2.007), (I-302)+(1.061)+(2.008), (I-302)+(1.061)+(2.009), (I-302)+(1.061)+(2.010), (I-302)+(1.061)+(2.011), (I-302)+(1.061)+(2.012), (I-302)+(1.061)+(2.013), (I-302)+(1.061)+(2.014), (I-302)+(1.061)+(2.015), (I-302)+(1.061)+(2.016), (I-302)+(1.061)+(2.017), (I-302)+(1.061)+(2.018), (I-302)+(1.061)+(2.019), (I-302)+(1.061)+(2.020), (I-302)+(1.061)+(2.021), (I-302)+(1.061)+(2.022), (I-302)+(1.061)+(2.023), (I-302)+(1.061)+(2.024), (I-302)+(1.061)+(2.025), (I-302)+(1.061)+(2.026), (I-302)+(1.061)+(2.027), (I-302)+(1.061)+(2.028), (I-302)+(1.061)+(2.029), (I-302)+(1.061)+(2.030), (I-302)+(1.061)+(2.031), (I-302)+(1.061)+(2.032), (I-302)+(1.061)+(2.033), (I-302)+(1.061)+(2.034), (I-302)+(1.061)+(2.035), (I-302)+(1.061)+(2.036), (I-302)+(1.061)+(2.037), (I-302)+(1.061)+(2.038), (I-302)+(1.061)+(2.039), (I-302)+(1.061)+(2.040), (I-302)+(1.061)+(2.041), (I-302)+(1.061)+(2.042), (I-302)+(1.061)+(2.043), (I-302)+(1.061)+(2.044), (I-302)+(1.061)+(2.045), (I-302)+(1.061)+(2.046), (I-302)+(1.061)+(2.047), (I-302)+(1.061)+(2.048), (I-302)+(1.061)+(2.049), (I-302)+(1.061)+(2.050), (I-302)+(1.061)+(2.051), (I-302)+(1.061)+(2.052), (I-302)+(1.061)+(2.053), (I-302)+(1.061)+(2.054), (I-302)+(1.061)+(2.055), (I-302)+(1.061)+(2.056), (I-302)+(1.061)+(2.057), (I-302)+(1.061)+(2.058), (I-302)+(1.061)+(2.059), (I-302)+(1.061)+(3.001), (I-302)+(1.061)+(3.002), (I-302)+(1.061)+(3.003), (I-302)+(1.061)+(3.004), (I-302)+(1.061)+(3.005), (I-302)+(1.061)+(3.006), (I-302)+(1.061)+(3.007), (I-302)+(1.061)+(3.008), (I-302)+(1.061)+(3.009), (I-302)+(1.061)+(3.010), (I-302)+(1.061)+(3.011), (I-302)+(1.061)+(3.012), (I-302)+(1.061)+(3.013), (I-302)+(1.061)+(3.014), (I-302)+(1.061)+(3.015), (I-302)+(1.061)+(3.016), (I-302)+(1.061)+(3.017), (I-302)+(1.061)+(3.018), (I-302)+(1.061)+(3.019), (I-302)+(1.061)+(3.020), (I-302)+(1.061)+(3.021), (I-302)+(1.061)+(3.022), (I-302)+(1.061)+(3.023), (I-302)+(1.061)+(3.024), (I-302)+(1.061)+(3.025), (I-302)+(1.061)+(3.026), (I-302)+(1.061)+(3.027), (I-302)+(1.061)+(3.028), (I-302)+(1.061)+(3.029), (I-302)+(1.061)+(3.030), (I-302)+(1.061)+(3.031), (I-302)+(1.061)+(5.001), (I-302)+(1.061)+(5.002), (I-302)+(1.061)+(5.003), (I-302)+(1.061)+(5.004), (I-302)+(1.061)+(5.005), (I-302)+(1.061)+(5.006), (I-302)+(1.061)+(5.007), (I-302)+(1.061)+(5.008), (I-302)+(1.061)+(5.009), (I-302)+(1.061)+(5.010), (I-302)+(1.061)+(5.011), (I-302)+(1.061)+(5.012), (I-302)+(1.061)+(5.013), (I-302)+(1.061)+(5.014), (I-302)+(1.061)+(5.015), (I-302)+(1.061)+(5.016), (I-302)+(1.061)+(5.017), (I-302)+(1.061)+(5.018), (I-302)+(1.061)+(5.019), (I-302)+(1.061)+(5.020), (I-302)+(1.061)+(5.021), (I-302)+(1.061)+(5.022), (I-302)+(1.061)+(5.023), (I-302)+(1.061)+(6.001), (I-302)+(1.061)+(6.002), (I-302)+(1.061)+(6.003), (I-302)+(1.061)+(6.004), (I-302)+(1.061)+(7.001), (I-302)+(1.061)+(7.002), (I-302)+(1.061)+(7.003), (I-302)+(1.061)+(7.004), (I-302)+(1.061)+(7.005), (I-302)+(1.061)+(7.006), (I-302)+(1.061)+(9.001), (I-302)+(1.061)+(9.002), (I-302)+(1.061)+(9.003), (I-302)+(1.061)+(9.004), (I-302)+(1.061)+(9.005), (I-302)+(1.061)+(9.006), (I-302)+(1.061)+(9.007), (I-302)+(1.061)+(9.008), (I-302)+(1.061)+(9.009), (I-302)+(1.061)+(14.001), (I-302)+(1.061)+(14.002), (I-302)+(1.061)+(15.008), (I-302)+(1.061)+(15.011), (I-302)+(1.061)+(15.012), (I-302)+(1.061)+(15.016), (I-302)+(1.061)+(15.025), (I-302)+(1.061)+(15.027), (I-302)+(1.061)+(15.047), (I-302)+(1.061)+(15.063), (I-302)+(1.061)+(15.064), (I-302)+(1.061)+(16.001), (I-302)+(1.061)+(16.002), (I-302)+(1.061)+(16.003), (I-302)+(1.061)+(16.004), (I-302)+(1.061)+(16.005), (I-302)+(1.061)+(16.006), (I-302)+(1.061)+(16.007), (I-302)+(1.061)+(16.008), (I-302)+(1.061)+(17.001), (I-302)+(1.061)+(17.002), (I-302)+(1.061)+(17.003), (I-302)+(1.061)+(17.004), (I-302)+(1.061)+(17.005), (I-302)+(1.061)+(17.006), (I-302)+(1.061)+(17.007), (I-302)+(1.061)+(17.008), (I-302)+(1.061)+(17.009), (I-302)+(1.061)+(17.010), (I-302)+(1.061)+(17.011), (I-302)+(1.061)+(17.012), (I-302)+(1.061)+(18.001),
(I-302)+(1.062)+(1.063), (I-302)+(1.062)+(1.064), (I-302)+(1.062)+(1.065), (I-302)+(1.062)+(1.066), (I-302)+(1.062)+(1.067), (I-302)+(1.062)+(1.068), (I-302)+(1.062)+(1.069), (I-302)+(1.062)+(1.070), (I-302)+(1.062)+(1.071), (I-302)+(1.062)+(1.072), (I-302)+(1.062)+(1.073), (I-302)+(1.062)+(1.074), (I-302)+(1.062)+(1.075), (I-302)+(1.062)+(1.076), (I-302)+(1.062)+(1.077), (I-302)+(1.062)+(1.078), (I-302)+(1.062)+(1.079), (I-302)+(1.062)+(1.080), (I-302)+(1.062)+(1.081), (I-302)+(1.062)+(1.082), (I-302)+(1.062)+(1.083), (I-302)+(1.062)+(1.084), (I-302)+(1.062)+(1.085), (I-302)+(1.062)+(1.086), (I-302)+(1.062)+(1.087), (I-302)+(1.062)+(1.088), (I-302)+(1.062)+(1.089), (I-302)+(1.062)+(1.090), (I-302)+(1.062)+(1.091), (I-302)+(1.062)+(1.092), (I-302)+(1.062)+(2.001), (I-302)+(1.062)+(2.002), (I-302)+(1.062)+(2.003), (I-302)+(1.062)+(2.004), (I-302)+(1.062)+(2.005), (I-302)+(1.062)+(2.006), (I-302)+(1.062)+(2.007), (I-302)+(1.062)+(2.008), (I-302)+(1.062)+(2.009), (I-302)+(1.062)+(2.010), (I-302)+(1.062)+(2.011), (I-302)+(1.062)+(2.012), (I-302)+(1.062)+(2.013), (I-302)+(1.062)+(2.014), (I-302)+(1.062)+(2.015), (I-302)+(1.062)+(2.016), (I-302)+(1.062)+(2.017), (I-302)+(1.062)+(2.018), (I-302)+(1.062)+(2.019), (I-302)+(1.062)+(2.020), (I-302)+(1.062)+(2.021), (I-302)+(1.062)+(2.022), (I-302)+(1.062)+(2.023), (I-302)+(1.062)+(2.024), (I-302)+(1.062)+(2.025), (I-302)+(1.062)+(2.026), (I-302)+(1.062)+(2.027), (I-302)+(1.062)+(2.028), (I-302)+(1.062)+(2.029), (I-302)+(1.062)+(2.030), (I-302)+(1.062)+(2.031), (I-302)+(1.062)+(2.032), (I-302)+(1.062)+(2.033), (I-302)+(1.062)+(2.034), (I-302)+(1.062)+(2.035), (I-302)+(1.062)+(2.036), (I-302)+(1.062)+(2.037), (I-302)+(1.062)+(2.038), (I-302)+(1.062)+(2.039), (I-302)+(1.062)+(2.040), (I-302)+(1.062)+(2.041), (I-302)+(1.062)+(2.042), (I-302)+(1.062)+(2.043), (I-302)+(1.062)+(2.044), (I-302)+(1.062)+(2.045), (I-302)+(1.062)+(2.046), (I-302)+(1.062)+(2.047), (I-302)+(1.062)+(2.048), (I-302)+(1.062)+(2.049), (I-302)+(1.062)+(2.050), (I-302)+(1.062)+(2.051), (I-302)+(1.062)+(2.052), (I-302)+(1.062)+(2.053), (I-302)+(1.062)+(2.054), (I-302)+(1.062)+(2.055), (I-302)+(1.062)+(2.056), (I-302)+(1.062)+(2.057), (I-302)+(1.062)+(2.058), (I-302)+(1.062)+(2.059), (I-302)+(1.062)+(3.001), (I-302)+(1.062)+(3.002), (I-302)+(1.062)+(3.003), (I-302)+(1.062)+(3.004), (I-302)+(1.062)+(3.005), (I-302)+(1.062)+(3.006), (I-302)+(1.062)+(3.007), (I-302)+(1.062)+(3.008), (I-302)+(1.062)+(3.009), (I-302)+(1.062)+(3.010), (I-302)+(1.062)+(3.011), (I-302)+(1.062)+(3.012), (I-302)+(1.062)+(3.013), (I-302)+(1.062)+(3.014), (I-302)+(1.062)+(3.015), (I-302)+(1.062)+(3.016), (I-302)+(1.062)+(3.017), (I-302)+(1.062)+(3.018), (I-302)+(1.062)+(3.019), (I-302)+(1.062)+(3.020), (I-302)+(1.062)+(3.021), (I-302)+(1.062)+(3.022), (I-302)+(1.062)+(3.023), (I-302)+(1.062)+(3.024), (I-302)+(1.062)+(3.025), (I-302)+(1.062)+(3.026), (I-302)+(1.062)+(3.027), (I-302)+(1.062)+(3.028), (I-302)+(1.062)+(3.029), (I-302)+(1.062)+(3.030), (I-302)+(1.062)+(3.031), (I-302)+(1.062)+(5.001), (I-302)+(1.062)+(5.002), (I-302)+(1.062)+(5.003), (I-302)+(1.062)+(5.004), (I-302)+(1.062)+(5.005), (I-302)+(1.062)+(5.006), (I-302)+(1.062)+(5.007), (I-302)+(1.062)+(5.008), (I-302)+(1.062)+(5.009), (I-302)+(1.062)+(5.010), (I-302)+(1.062)+(5.011), (I-302)+(1.062)+(5.012), (I-302)+(1.062)+(5.013), (I-302)+(1.062)+(5.014), (I-302)+(1.062)+(5.015), (I-302)+(1.062)+(5.016), (I-302)+(1.062)+(5.017), (I-302)+(1.062)+(5.018), (I-302)+(1.062)+(5.019), (I-302)+(1.062)+(5.020), (I-302)+(1.062)+(5.021), (I-302)+(1.062)+(5.022), (I-302)+(1.062)+(5.023), (I-302)+(1.062)+(6.001), (I-302)+(1.062)+(6.002), (I-302)+(1.062)+(6.003), (I-302)+(1.062)+(6.004), (I-302)+(1.062)+(7.001), (I-302)+(1.062)+(7.002), (I-302)+(1.062)+(7.003), (I-302)+(1.062)+(7.004), (I-302)+(1.062)+(7.005), (I-302)+(1.062)+(7.006), (I-302)+(1.062)+(9.001), (I-302)+(1.062)+(9.002), (I-302)+(1.062)+(9.003), (I-302)+(1.062)+(9.004), (I-302)+(1.062)+(9.005), (I-302)+(1.062)+(9.006), (I-302)+(1.062)+(9.007), (I-302)+(1.062)+(9.008), (I-302)+(1.062)+(9.009), (I-302)+(1.062)+(14.001), (I-302)+(1.062)+(14.002), (I-302)+(1.062)+(15.008), (I-302)+(1.062)+(15.011), (I-302)+(1.062)+(15.012), (I-302)+(1.062)+(15.016), (I-302)+(1.062)+(15.025), (I-302)+(1.062)+(15.027), (I-302)+(1.062)+(15.047), (I-302)+(1.062)+(15.063), (I-302)+(1.062)+(15.064), (I-302)+(1.062)+(16.001), (I-302)+(1.062)+(16.002), (I-302)+(1.062)+(16.003), (I-302)+(1.062)+(16.004), (I-302)+(1.062)+(16.005), (I-302)+(1.062)+(16.006), (I-302)+(1.062)+(16.007), (I-302)+(1.062)+(16.008), (I-302)+(1.062)+(17.001), (I-302)+(1.062)+(17.002), (I-302)+(1.062)+(17.003), (I-302)+(1.062)+(17.004), (I-302)+(1.062)+(17.005), (I-302)+(1.062)+(17.006), (I-302)+(1.062)+(17.007), (I-302)+(1.062)+(17.008), (I-302)+(1.062)+(17.009), (I-302)+(1.062)+(17.010), (I-302)+(1.062)+(17.011), (I-302)+(1.062)+(17.012), (I-302)+(1.062)+(18.001), (I-302)+(1.063)+(1.064), (I-302)+(1.063)+(1.065), (I-302)+(1.063)+(1.066), (I-302)+(1.063)+(1.067), (I-302)+(1.063)+(1.068), (I-302)+(1.063)+(1.069), (I-302)+(1.063)+(1.070), (I-302)+(1.063)+(1.071), (I-302)+(1.063)+(1.072), (I-302)+(1.063)+(1.073), (I-302)+(1.063)+(1.074), (I-302)+(1.063)+(1.075), (I-302)+(1.063)+(1.076), (I-302)+(1.063)+(1.077), (I-302)+(1.063)+(1.078), (I-302)+(1.063)+(1.079), (I-302)+(1.063)+(1.080), (I-302)+(1.063)+(1.081), (I-302)+(1.063)+(1.082), (I-302)+(1.063)+(1.083), (I-302)+(1.063)+(1.084), (I-302)+(1.063)+(1.085), (I-302)+(1.063)+(1.086), (I-302)+(1.063)+(1.087), (I-302)+(1.063)+(1.088), (I-302)+(1.063)+(1.089), (I-302)+(1.063)+(1.090), (I-302)+(1.063)+(1.091), (I-302)+(1.063)+(1.092), (I-302)+(1.063)+(2.001), (I-302)+(1.063)+(2.002), (I-302)+(1.063)+(2.003), (I-302)+(1.063)+(2.004), (I-302)+(1.063)+(2.005), (I-302)+(1.063)+(2.006), (I-302)+(1.063)+(2.007), (I-302)+(1.063)+(2.008), (I-302)+(1.063)+(2.009), (I-302)+(1.063)+(2.010), (I-302)+(1.063)+(2.011), (I-302)+(1.063)+(2.012), (I-302)+(1.063)+(2.013), (I-302)+(1.063)+(2.014), (I-302)+(1.063)+(2.015), (I-302)+(1.063)+(2.016), (I-302)+(1.063)+(2.017), (I-302)+(1.063)+(2.018), (I-302)+(1.063)+(2.019), (I-302)+(1.063)+(2.020), (I-302)+(1.063)+(2.021), (I-302)+(1.063)+(2.022), (I-302)+(1.063)+(2.023), (I-302)+(1.063)+(2.024), (I-302)+(1.063)+(2.025), (I-302)+(1.063)+(2.026), (I-302)+(1.063)+(2.027), (I-302)+(1.063)+(2.028), (I-302)+(1.063)+(2.029), (I-302)+(1.063)+(2.030), (I-302)+(1.063)+(2.031), (I-302)+(1.063)+(2.032), (I-302)+(1.063)+(2.033), (I-302)+(1.063)+(2.034), (I-302)+(1.063)+(2.035), (I-302)+(1.063)+(2.036), (I-302)+(1.063)+(2.037), (I-302)+(1.063)+(2.038), (I-302)+(1.063)+(2.039), (I-302)+(1.063)+(2.040), (I-302)+(1.063)+(2.041), (I-302)+(1.063)+(2.042), (I-302)+(1.063)+(2.043), (I-302)+(1.063)+(2.044), (I-302)+(1.063)+(2.045), (I-302)+(1.063)+(2.046), (I-302)+(1.063)+(2.047), (I-302)+(1.063)+(2.048), (I-302)+(1.063)+(2.049), (I-302)+(1.063)+(2.050), (I-302)+(1.063)+(2.051), (I-302)+(1.063)+(2.052), (I-302)+(1.063)+(2.053), (I-302)+(1.063)+(2.054), (I-302)+(1.063)+(2.055), (I-302)+(1.063)+(2.056), (I-302)+(1.063)+(2.057), (I-302)+(1.063)+(2.058), (I-302)+(1.063)+(2.059), (I-302)+(1.063)+(3.001), (I-302)+(1.063)+(3.002), (I-302)+(1.063)+(3.003), (I-302)+(1.063)+(3.004), (I-302)+(1.063)+(3.005), (I-302)+(1.063)+(3.006), (I-302)+(1.063)+(3.007), (I-302)+(1.063)+(3.008), (I-302)+(1.063)+(3.009), (I-302)+(1.063)+(3.010), (I-302)+(1.063)+(3.011), (I-302)+(1.063)+(3.012), (I-302)+(1.063)+(3.013), (I-302)+(1.063)+(3.014), (I-302)+(1.063)+(3.015), (I-302)+(1.063)+(3.016), (I-302)+(1.063)+(3.017), (I-302)+(1.063)+(3.018), (I-302)+(1.063)+(3.019), (I-302)+(1.063)+(3.020), (I-302)+(1.063)+(3.021), (I-302)+(1.063)+(3.022), (I-302)+(1.063)+(3.023), (I-302)+(1.063)+(3.024), (I-302)+(1.063)+(3.025), (I-302)+(1.063)+(3.026), (I-302)+(1.063)+(3.027), (I-302)+(1.063)+(3.028), (I-302)+(1.063)+(3.029), (I-302)+(1.063)+(3.030), (I-302)+(1.063)+(3.031), (I-302)+(1.063)+(5.001), (I-302)+(1.063)+(5.002), (I-302)+(1.063)+(5.003), (I-302)+(1.063)+(5.004), (I-302)+(1.063)+(5.005), (I-302)+(1.063)+(5.006), (I-302)+(1.063)+(5.007), (I-302)+(1.063)+(5.008), (I-302)+(1.063)+(5.009), (I-302)+(1.063)+(5.010), (I-302)+(1.063)+(5.011), (I-302)+(1.063)+(5.012), (I-302)+(1.063)+(5.013), (I-302)+(1.063)+(5.014), (I-302)+(1.063)+(5.015), (I-302)+(1.063)+(5.016), (I-302)+(1.063)+(5.017), (I-302)+(1.063)+(5.018), (I-302)+(1.063)+(5.019), (I-302)+(1.063)+(5.020), (I-302)+(1.063)+(5.021), (I-302)+(1.063)+(5.022), (I-302)+(1.063)+(5.023), (I-302)+(1.063)+(6.001), (I-302)+(1.063)+(6.002), (I-302)+(1.063)+(6.003), (I-302)+(1.063)+(6.004), (I-302)+(1.063)+(7.001), (I-302)+(1.063)+(7.002), (I-302)+(1.063)+(7.003), (I-302)+(1.063)+(7.004), (I-302)+(1.063)+(7.005), (I-302)+(1.063)+(7.006), (I-302)+(1.063)+(9.001), (I-302)+(1.063)+(9.002), (I-302)+(1.063)+(9.003), (I-302)+(1.063)+(9.004), (I-302)+(1.063)+(9.005), (I-302)+(1.063)+(9.006), (I-302)+(1.063)+(9.007), (I-302)+(1.063)+(9.008), (I-302)+(1.063)+(9.009), (I-302)+(1.063)+(14.001), (I-302)+(1.063)+(14.002), (I-302)+(1.063)+(15.008), (I-302)+(1.063)+(15.011), (I-302)+(1.063)+(15.012), (I-302)+(1.063)+(15.016), (I-302)+(1.063)+(15.025), (I-302)+(1.063)+(15.027), (I-302)+(1.063)+(15.047), (I-302)+(1.063)+(15.063), (I-302)+(1.063)+(15.064), (I-302)+(1.063)+(16.001), (I-302)+(1.063)+(16.002), (I-302)+(1.063)+(16.003), (I-302)+(1.063)+(16.004), (I-302)+(1.063)+(16.005), (I-302)+(1.063)+(16.006), (I-302)+(1.063)+(16.007), (I-302)+(1.063)+(16.008), (I-302)+(1.063)+(17.001), (I-302)+(1.063)+(17.002), (I-302)+(1.063)+(17.003), (I-302)+(1.063)+(17.004), (I-302)+(1.063)+(17.005), (I-302)+(1.063)+(17.006), (I-302)+(1.063)+(17.007), (I-302)+(1.063)+(17.008), (I-302)+(1.063)+(17.009), (I-302)+(1.063)+(17.010), (I-302)+(1.063)+(17.011), (I-302)+(1.063)+(17.012), (I-302)+(1.063)+(18.001), (I-302)+(1.064)+(1.065), (I-302)+(1.064)+(1.066), (I-302)+(1.064)+(1.067), (I-302)+(1.064)+(1.068), (I-302)+(1.064)+(1.069), (I-302)+(1.064)+(1.070), (I-302)+(1.064)+(1.071), (I-302)+(1.064)+(1.072), (I-302)+(1.064)+(1.073), (I-302)+(1.064)+(1.074), (I-302)+(1.064)+(1.075), (I-302)+(1.064)+(1.076), (I-302)+(1.064)+(1.077), (I-302)+(1.064)+(1.078), (I-302)+(1.064)+(1.079), (I-302)+(1.064)+(1.080), (I-302)+(1.064)+(1.081), (I-302)+(1.064)+(1.082), (I-302)+(1.064)+(1.083), (I-302)+(1.064)+(1.084), (I-302)+(1.064)+(1.085), (I-302)+(1.064)+(1.086), (I-302)+(1.064)+(1.087), (I-302)+(1.064)+(1.088), (I-302)+(1.064)+(1.089), (I-302)+(1.064)+(1.090), (I-302)+(1.064)+(1.091), (I-302)+(1.064)+(1.092), (I-302)+(1.064)+(2.001), (I-302)+(1.064)+(2.002), (I-302)+(1.064)+(2.003), (I-302)+(1.064)+(2.004), (I-302)+(1.064)+(2.005), (I-302)+(1.064)+(2.006), (I-302)+(1.064)+(2.007), (I-302)+(1.064)+(2.008), (I-302)+(1.064)+(2.009), (I-302)+(1.064)+(2.010), (I-302)+(1.064)+(2.011), (I-302)+(1.064)+(2.012), (I-302)+(1.064)+(2.013), (I-302)+(1.064)+(2.014), (I-302)+(1.064)+(2.015), (I-302)+(1.064)+(2.016), (I-302)+(1.064)+(2.017), (I-302)+(1.064)+(2.018), (I-302)+(1.064)+(2.019), (I-302)+(1.064)+(2.020), (I-302)+(1.064)+(2.021), (I-302)+(1.064)+(2.022), (I-302)+(1.064)+(2.023), (I-302)+(1.064)+(2.024), (I-302)+(1.064)+(2.025), (I-302)+(1.064)+(2.026), (I-302)+(1.064)+(2.027), (I-302)+(1.064)+(2.028), (I-302)+(1.064)+(2.029), (I-302)+(1.064)+(2.030), (I-302)+(1.064)+(2.031), (I-302)+(1.064)+(2.032), (I-302)+(1.064)+(2.033), (I-302)+(1.064)+(2.034), (I-302)+(1.064)+(2.035), (I-302)+(1.064)+(2.036), (I-302)+(1.064)+(2.037), (I-302)+(1.064)+(2.038), (I-302)+(1.064)+(2.039), (I-302)+(1.064)+(2.040), (I-302)+(1.064)+(2.041), (I-302)+(1.064)+(2.042), (I-302)+(1.064)+(2.043), (I-302)+(1.064)+(2.044), (I-302)+(1.064)+(2.045), (I-302)+(1.064)+(2.046), (I-302)+(1.064)+(2.047), (I-302)+(1.064)+(2.048), (I-302)+(1.064)+(2.049), (I-302)+(1.064)+(2.050), (I-302)+(1.064)+(2.051), (I-302)+(1.064)+(2.052), (I-302)+(1.064)+(2.053), (I-302)+(1.064)+(2.054), (I-302)+(1.064)+(2.055), (I-302)+(1.064)+(2.056), (I-302)+(1.064)+(2.057), (I-302)+(1.064)+(2.058), (I-302)+(1.064)+(2.059), (I-302)+(1.064)+(3.001), (I-302)+(1.064)+(3.002), (I-302)+(1.064)+(3.003), (I-302)+(1.064)+(3.004), (I-302)+(1.064)+(3.005), (I-302)+(1.064)+(3.006), (I-302)+(1.064)+(3.007), (I-302)+(1.064)+(3.008), (I-302)+(1.064)+(3.009), (I-302)+(1.064)+(3.010), (I-302)+(1.064)+(3.011), (I-302)+(1.064)+(3.012), (I-302)+(1.064)+(3.013), (I-302)+(1.064)+(3.014), (I-302)+(1.064)+(3.015), (I-302)+(1.064)+(3.016), (I-302)+(1.064)+(3.017), (I-302)+(1.064)+(3.018), (I-302)+(1.064)+(3.019), (I-302)+(1.064)+(3.020), (I-302)+(1.064)+(3.021), (I-302)+(1.064)+(3.022), (I-302)+(1.064)+(3.023), (I-302)+(1.064)+(3.024), (I-302)+(1.064)+(3.025), (I-302)+(1.064)+(3.026), (I-302)+(1.064)+(3.027), (I-302)+(1.064)+(3.028), (I-302)+(1.064)+(3.029), (I-302)+(1.064)+(3.030), (I-302)+(1.064)+(3.031), (I-302)+(1.064)+(5.001), (I-302)+(1.064)+(5.002), (I-302)+(1.064)+(5.003), (I-302)+(1.064)+(5.004), (I-302)+(1.064)+(5.005), (I-302)+(1.064)+(5.006), (I-302)+(1.064)+(5.007), (I-302)+(1.064)+(5.008), (I-302)+(1.064)+(5.009), (I-302)+(1.064)+(5.010), (I-302)+(1.064)+(5.011), (I-302)+(1.064)+(5.012), (I-302)+(1.064)+(5.013), (I-302)+(1.064)+(5.014), (I-302)+(1.064)+(5.015), (I-302)+(1.064)+(5.016), (I-302)+(1.064)+(5.017), (I-302)+(1.064)+(5.018), (I-302)+(1.064)+(5.019), (I-302)+(1.064)+(5.020), (I-302)+(1.064)+(5.021), (I-302)+(1.064)+(5.022), (I-302)+(1.064)+(5.023), (I-302)+(1.064)+(6.001), (I-302)+(1.064)+(6.002), (I-302)+(1.064)+(6.003), (I-302)+(1.064)+(6.004), (I-302)+(1.064)+(7.001), (I-302)+(1.064)+(7.002), (I-302)+(1.064)+(7.003), (I-302)+(1.064)+(7.004), (I-302)+(1.064)+(7.005), (I-302)+(1.064)+(7.006), (I-302)+(1.064)+(9.001), (I-302)+(1.064)+(9.002), (I-302)+(1.064)+(9.003), (I-302)+(1.064)+(9.004), (I-302)+(1.064)+(9.005), (I-302)+(1.064)+(9.006), (I-302)+(1.064)+(9.007), (I-302)+(1.064)+(9.008), (I-302)+(1.064)+(9.009), (I-302)+(1.064)+(14.001), (I-302)+(1.064)+(14.002), (I-302)+(1.064)+(15.008), (I-302)+(1.064)+(15.011), (I-302)+(1.064)+(15.012), (I-302)+(1.064)+(15.016), (I-302)+(1.064)+(15.025), (I-302)+(1.064)+(15.027), (I-302)+(1.064)+(15.047), (I-302)+(1.064)+(15.063), (I-302)+(1.064)+(15.064), (I-302)+(1.064)+(16.001), (I-302)+(1.064)+(16.002), (I-302)+(1.064)+(16.003), (I-302)+(1.064)+(16.004), (I-302)+(1.064)+(16.005), (I-302)+(1.064)+(16.006), (I-302)+(1.064)+(16.007), (I-302)+(1.064)+(16.008), (I-302)+(1.064)+(17.001), (I-302)+(1.064)+(17.002), (I-302)+(1.064)+(17.003), (I-302)+(1.064)+(17.004), (I-302)+(1.064)+(17.005), (I-302)+(1.064)+(17.006), (I-302)+(1.064)+(17.007), (I-302)+(1.064)+(17.008), (I-302)+(1.064)+(17.009), (I-302)+(1.064)+(17.010), (I-302)+(1.064)+(17.011), (I-302)+(1.064)+(17.012), (I-302)+(1.064)+(18.001), (I-302)+(1.065)+(1.066), (I-302)+(1.065)+(1.067), (I-302)+(1.065)+(1.068), (I-302)+(1.065)+(1.069), (I-302)+(1.065)+(1.070), (I-302)+(1.065)+(1.071), (I-302)+(1.065)+(1.072), (I-302)+(1.065)+(1.073), (I-302)+(1.065)+(1.074), (I-302)+(1.065)+(1.075), (I-302)+(1.065)+(1.076), (I-302)+(1.065)+(1.077), (I-302)+(1.065)+(1.078), (I-302)+(1.065)+(1.079), (I-302)+(1.065)+(1.080), (I-302)+(1.065)+(1.081), (I-302)+(1.065)+(1.082), (I-302)+(1.065)+(1.083), (I-302)+(1.065)+(1.084), (I-302)+(1.065)+(1.085), (I-302)+(1.065)+(1.086), (I-302)+(1.065)+(1.087), (I-302)+(1.065)+(1.088), (I-302)+(1.065)+(1.089),
(I-302)+(1.065)+(1.090), (I-302)+(1.065)+(1.091),
(I-302)+(1.065)+(1.092), (I-302)+(1.065)+(2.001),
(I-302)+(1.065)+(2.002), (I-302)+(1.065)+(2.003),
(I-302)+(1.065)+(2.004), (I-302)+(1.065)+(2.005),
(I-302)+(1.065)+(2.006), (I-302)+(1.065)+(2.007),
(I-302)+(1.065)+(2.008), (I-302)+(1.065)+(2.009),
(I-302)+(1.065)+(2.010), (I-302)+(1.065)+(2.011),
(I-302)+(1.065)+(2.012), (I-302)+(1.065)+(2.013),
(I-302)+(1.065)+(2.014), (I-302)+(1.065)+(2.015),
(I-302)+(1.065)+(2.016), (I-302)+(1.065)+(2.017),
(I-302)+(1.065)+(2.018), (I-302)+(1.065)+(2.019),
(I-302)+(1.065)+(2.020), (I-302)+(1.065)+(2.021),
(I-302)+(1.065)+(2.022), (I-302)+(1.065)+(2.023),
(I-302)+(1.065)+(2.024), (I-302)+(1.065)+(2.025),
(I-302)+(1.065)+(2.026), (I-302)+(1.065)+(2.027),
(I-302)+(1.065)+(2.028), (I-302)+(1.065)+(2.029),
(I-302)+(1.065)+(2.030), (I-302)+(1.065)+(2.031),
(I-302)+(1.065)+(2.032), (I-302)+(1.065)+(2.033),
(I-302)+(1.065)+(2.034), (I-302)+(1.065)+(2.035),
(I-302)+(1.065)+(2.036), (I-302)+(1.065)+(2.037),
(I-302)+(1.065)+(2.038), (I-302)+(1.065)+(2.039),
(I-302)+(1.065)+(2.040), (I-302)+(1.065)+(2.041),
(I-302)+(1.065)+(2.042), (I-302)+(1.065)+(2.043),
(I-302)+(1.065)+(2.044), (I-302)+(1.065)+(2.045),
(I-302)+(1.065)+(2.046), (I-302)+(1.065)+(2.047),
(I-302)+(1.065)+(2.048), (I-302)+(1.065)+(2.049),
(I-302)+(1.065)+(2.050), (I-302)+(1.065)+(2.051),
(I-302)+(1.065)+(2.052), (I-302)+(1.065)+(2.053),
(I-302)+(1.065)+(2.054), (I-302)+(1.065)+(2.055),
(I-302)+(1.065)+(2.056), (I-302)+(1.065)+(2.057),
(I-302)+(1.065)+(2.058), (I-302)+(1.065)+(2.059),
(I-302)+(1.065)+(3.001), (I-302)+(1.065)+(3.002),
(I-302)+(1.065)+(3.003), (I-302)+(1.065)+(3.004),
(I-302)+(1.065)+(3.005), (I-302)+(1.065)+(3.006),
(I-302)+(1.065)+(3.007), (I-302)+(1.065)+(3.008),
(I-302)+(1.065)+(3.009), (I-302)+(1.065)+(3.010),
(I-302)+(1.065)+(3.011), (I-302)+(1.065)+(3.012),
(I-302)+(1.065)+(3.013), (I-302)+(1.065)+(3.014),
(I-302)+(1.065)+(3.015), (I-302)+(1.065)+(3.016),
(I-302)+(1.065)+(3.017), (I-302)+(1.065)+(3.018),
(I-302)+(1.065)+(3.019), (I-302)+(1.065)+(3.020),
(I-302)+(1.065)+(3.021), (I-302)+(1.065)+(3.022),
(I-302)+(1.065)+(3.023), (I-302)+(1.065)+(3.024),
(I-302)+(1.065)+(3.025), (I-302)+(1.065)+(3.026),
(I-302)+(1.065)+(3.027), (I-302)+(1.065)+(3.028),
(I-302)+(1.065)+(3.029), (I-302)+(1.065)+(3.030),
(I-302)+(1.065)+(3.031), (I-302)+(1.065)+(5.001),
(I-302)+(1.065)+(5.002), (I-302)+(1.065)+(5.003),
(I-302)+(1.065)+(5.004), (I-302)+(1.065)+(5.005),
(I-302)+(1.065)+(5.006), (I-302)+(1.065)+(5.007),
(I-302)+(1.065)+(5.008), (I-302)+(1.065)+(5.009),
(I-302)+(1.065)+(5.010), (I-302)+(1.065)+(5.011),
(I-302)+(1.065)+(5.012), (I-302)+(1.065)+(5.013),
(I-302)+(1.065)+(5.014), (I-302)+(1.065)+(5.015),
(I-302)+(1.065)+(5.016), (I-302)+(1.065)+(5.017),
(I-302)+(1.065)+(5.018), (I-302)+(1.065)+(5.019),
(I-302)+(1.065)+(5.020), (I-302)+(1.065)+(5.021),
(I-302)+(1.065)+(5.022), (I-302)+(1.065)+(5.023),
(I-302)+(1.065)+(6.001), (I-302)+(1.065)+(6.002),
(I-302)+(1.065)+(6.003), (I-302)+(1.065)+(6.004),
(I-302)+(1.065)+(7.001), (I-302)+(1.065)+(7.002),
(I-302)+(1.065)+(7.003), (I-302)+(1.065)+(7.004),
(I-302)+(1.065)+(7.005), (I-302)+(1.065)+(7.006),
(I-302)+(1.065)+(9.001), (I-302)+(1.065)+(9.002),
(I-302)+(1.065)+(9.003), (I-302)+(1.065)+(9.004),
(I-302)+(1.065)+(9.005), (I-302)+(1.065)+(9.006),
(I-302)+(1.065)+(9.007), (I-302)+(1.065)+(9.008),
(I-302)+(1.065)+(9.009), (I-302)+(1.065)+(14.001),
(I-302)+(1.065)+(14.002), (I-302)+(1.065)+(15.008),
(I-302)+(1.065)+(15.011), (I-302)+(1.065)+(15.012),
(I-302)+(1.065)+(15.016), (I-302)+(1.065)+(15.025),
(I-302)+(1.065)+(15.027), (I-302)+(1.065)+(15.047),
(I-302)+(1.065)+(15.063), (I-302)+(1.065)+(15.064),
(I-302)+(1.065)+(16.001), (I-302)+(1.065)+(16.002),
(I-302)+(1.065)+(16.003), (I-302)+(1.065)+(16.004),
(I-302)+(1.065)+(16.005), (I-302)+(1.065)+(16.006),
(I-302)+(1.065)+(16.007), (I-302)+(1.065)+(16.008),
(I-302)+(1.065)+(17.001), (I-302)+(1.065)+(17.002),
(I-302)+(1.065)+(17.003), (I-302)+(1.065)+(17.004),
(I-302)+(1.065)+(17.005), (I-302)+(1.065)+(17.006),
(I-302)+(1.065)+(17.007), (I-302)+(1.065)+(17.008),
(I-302)+(1.065)+(17.009), (I-302)+(1.065)+(17.010),
(I-302)+(1.065)+(17.011), (I-302)+(1.065)+(17.012),
(I-302)+(1.065)+(18.001),
(I-302)+(1.066)+(1.067), (I-302)+(1.066)+(1.068),
(I-302)+(1.066)+(1.069), (I-302)+(1.066)+(1.070),
(I-302)+(1.066)+(1.071), (I-302)+(1.066)+(1.072),
(I-302)+(1.066)+(1.073), (I-302)+(1.066)+(1.074),
(I-302)+(1.066)+(1.075), (I-302)+(1.066)+(1.076),
(I-302)+(1.066)+(1.077), (I-302)+(1.066)+(1.078),
(I-302)+(1.066)+(1.079), (I-302)+(1.066)+(1.080),
(I-302)+(1.066)+(1.081), (I-302)+(1.066)+(1.082),
(I-302)+(1.066)+(1.083), (I-302)+(1.066)+(1.084),
(I-302)+(1.066)+(1.085), (I-302)+(1.066)+(1.086),
(I-302)+(1.066)+(1.087), (I-302)+(1.066)+(1.088),
(I-302)+(1.066)+(1.089), (I-302)+(1.066)+(1.090),
(I-302)+(1.066)+(1.091), (I-302)+(1.066)+(1.092),
(I-302)+(1.066)+(2.001), (I-302)+(1.066)+(2.002),
(I-302)+(1.066)+(2.003), (I-302)+(1.066)+(2.004),
(I-302)+(1.066)+(2.005), (I-302)+(1.066)+(2.006),
(I-302)+(1.066)+(2.007), (I-302)+(1.066)+(2.008),
(I-302)+(1.066)+(2.009), (I-302)+(1.066)+(2.010),
(I-302)+(1.066)+(2.011), (I-302)+(1.066)+(2.012),
(I-302)+(1.066)+(2.013), (I-302)+(1.066)+(2.014),
(I-302)+(1.066)+(2.015), (I-302)+(1.066)+(2.016),
(I-302)+(1.066)+(2.017), (I-302)+(1.066)+(2.018),
(I-302)+(1.066)+(2.019), (I-302)+(1.066)+(2.020),
(I-302)+(1.066)+(2.021), (I-302)+(1.066)+(2.022),
(I-302)+(1.066)+(2.023), (I-302)+(1.066)+(2.024),
(I-302)+(1.066)+(2.025), (I-302)+(1.066)+(2.026),
(I-302)+(1.066)+(2.027), (I-302)+(1.066)+(2.028),
(I-302)+(1.066)+(2.029), (I-302)+(1.066)+(2.030),
(I-302)+(1.066)+(2.031), (I-302)+(1.066)+(2.032),
(I-302)+(1.066)+(2.033), (I-302)+(1.066)+(2.034),
(I-302)+(1.066)+(2.035), (I-302)+(1.066)+(2.036),
(I-302)+(1.066)+(2.037), (I-302)+(1.066)+(2.038),
(I-302)+(1.066)+(2.039), (I-302)+(1.066)+(2.040),
(I-302)+(1.066)+(2.041), (I-302)+(1.066)+(2.042),
(I-302)+(1.066)+(2.043), (I-302)+(1.066)+(2.044),
(I-302)+(1.066)+(2.045), (I-302)+(1.066)+(2.046),
(I-302)+(1.066)+(2.047), (I-302)+(1.066)+(2.048),
(I-302)+(1.066)+(2.049), (I-302)+(1.066)+(2.050),
(I-302)+(1.066)+(2.051), (I-302)+(1.066)+(2.052),
(I-302)+(1.066)+(2.053), (I-302)+(1.066)+(2.054),
(I-302)+(1.066)+(2.055), (I-302)+(1.066)+(2.056),
(I-302)+(1.066)+(2.057), (I-302)+(1.066)+(2.058),
(I-302)+(1.066)+(2.059), (I-302)+(1.066)+(3.001),
(I-302)+(1.066)+(3.002), (I-302)+(1.066)+(3.003),
(I-302)+(1.066)+(3.004), (I-302)+(1.066)+(3.005),
(I-302)+(1.066)+(3.006), (I-302)+(1.066)+(3.007),
(I-302)+(1.066)+(3.008), (I-302)+(1.066)+(3.009),
(I-302)+(1.066)+(3.010), (I-302)+(1.066)+(3.011),
(I-302)+(1.066)+(3.012), (I-302)+(1.066)+(3.013), (I-302)+(1.066)+(3.014), (I-302)+(1.066)+(3.015), (I-302)+(1.066)+(3.016), (I-302)+(1.066)+(3.017), (I-302)+(1.066)+(3.018), (I-302)+(1.066)+(3.019), (I-302)+(1.066)+(3.020), (I-302)+(1.066)+(3.021), (I-302)+(1.066)+(3.022), (I-302)+(1.066)+(3.023), (I-302)+(1.066)+(3.024), (I-302)+(1.066)+(3.025), (I-302)+(1.066)+(3.026), (I-302)+(1.066)+(3.027), (I-302)+(1.066)+(3.028), (I-302)+(1.066)+(3.029), (I-302)+(1.066)+(3.030), (I-302)+(1.066)+(3.031), (I-302)+(1.066)+(5.001), (I-302)+(1.066)+(5.002), (I-302)+(1.066)+(5.003), (I-302)+(1.066)+(5.004), (I-302)+(1.066)+(5.005), (I-302)+(1.066)+(5.006), (I-302)+(1.066)+(5.007), (I-302)+(1.066)+(5.008), (I-302)+(1.066)+(5.009), (I-302)+(1.066)+(5.010), (I-302)+(1.066)+(5.011), (I-302)+(1.066)+(5.012), (I-302)+(1.066)+(5.013), (I-302)+(1.066)+(5.014), (I-302)+(1.066)+(5.015), (I-302)+(1.066)+(5.016), (I-302)+(1.066)+(5.017), (I-302)+(1.066)+(5.018), (I-302)+(1.066)+(5.019), (I-302)+(1.066)+(5.020), (I-302)+(1.066)+(5.021), (I-302)+(1.066)+(5.022), (I-302)+(1.066)+(5.023), (I-302)+(1.066)+(6.001), (I-302)+(1.066)+(6.002), (I-302)+(1.066)+(6.003), (I-302)+(1.066)+(6.004), (I-302)+(1.066)+(7.001), (I-302)+(1.066)+(7.002), (I-302)+(1.066)+(7.003), (I-302)+(1.066)+(7.004), (I-302)+(1.066)+(7.005), (I-302)+(1.066)+(7.006), (I-302)+(1.066)+(9.001), (I-302)+(1.066)+(9.002), (I-302)+(1.066)+(9.003), (I-302)+(1.066)+(9.004), (I-302)+(1.066)+(9.005), (I-302)+(1.066)+(9.006), (I-302)+(1.066)+(9.007), (I-302)+(1.066)+(9.008), (I-302)+(1.066)+(9.009), (I-302)+(1.066)+(14.001), (I-302)+(1.066)+(14.002), (I-302)+(1.066)+(15.008), (I-302)+(1.066)+(15.011), (I-302)+(1.066)+(15.012), (I-302)+(1.066)+(15.016), (I-302)+(1.066)+(15.025), (I-302)+(1.066)+(15.027), (I-302)+(1.066)+(15.047), (I-302)+(1.066)+(15.063), (I-302)+(1.066)+(15.064), (I-302)+(1.066)+(16.001), (I-302)+(1.066)+(16.002), (I-302)+(1.066)+(16.003), (I-302)+(1.066)+(16.004), (I-302)+(1.066)+(16.005), (I-302)+(1.066)+(16.006), (I-302)+(1.066)+(16.007), (I-302)+(1.066)+(16.008), (I-302)+(1.066)+(17.001), (I-302)+(1.066)+(17.002), (I-302)+(1.066)+(17.003), (I-302)+(1.066)+(17.004), (I-302)+(1.066)+(17.005), (I-302)+(1.066)+(17.006), (I-302)+(1.066)+(17.007), (I-302)+(1.066)+(17.008), (I-302)+(1.066)+(17.009), (I-302)+(1.066)+(17.010), (I-302)+(1.066)+(17.011), (I-302)+(1.066)+(17.012), (I-302)+(1.066)+(18.001), (I-302)+(1.067)+(1.068), (I-302)+(1.067)+(1.069), (I-302)+(1.067)+(1.070), (I-302)+(1.067)+(1.071), (I-302)+(1.067)+(1.072), (I-302)+(1.067)+(1.073), (I-302)+(1.067)+(1.074), (I-302)+(1.067)+(1.075), (I-302)+(1.067)+(1.076), (I-302)+(1.067)+(1.077), (I-302)+(1.067)+(1.078), (I-302)+(1.067)+(1.079), (I-302)+(1.067)+(1.080), (I-302)+(1.067)+(1.081), (I-302)+(1.067)+(1.082), (I-302)+(1.067)+(1.083), (I-302)+(1.067)+(1.084), (I-302)+(1.067)+(1.085), (I-302)+(1.067)+(1.086), (I-302)+(1.067)+(1.087), (I-302)+(1.067)+(1.088), (I-302)+(1.067)+(1.089), (I-302)+(1.067)+(1.090), (I-302)+(1.067)+(1.091), (I-302)+(1.067)+(1.092), (I-302)+(1.067)+(2.001), (I-302)+(1.067)+(2.002), (I-302)+(1.067)+(2.003), (I-302)+(1.067)+(2.004), (I-302)+(1.067)+(2.005), (I-302)+(1.067)+(2.006), (I-302)+(1.067)+(2.007), (I-302)+(1.067)+(2.008), (I-302)+(1.067)+(2.009), (I-302)+(1.067)+(2.010), (I-302)+(1.067)+(2.011), (I-302)+(1.067)+(2.012), (I-302)+(1.067)+(2.013), (I-302)+(1.067)+(2.014), (I-302)+(1.067)+(2.015), (I-302)+(1.067)+(2.016), (I-302)+(1.067)+(2.017), (I-302)+(1.067)+(2.018), (I-302)+(1.067)+(2.019), (I-302)+(1.067)+(2.020), (I-302)+(1.067)+(2.021), (I-302)+(1.067)+(2.022), (I-302)+(1.067)+(2.023), (I-302)+(1.067)+(2.024), (I-302)+(1.067)+(2.025), (I-302)+(1.067)+(2.026), (I-302)+(1.067)+(2.027), (I-302)+(1.067)+(2.028), (I-302)+(1.067)+(2.029), (I-302)+(1.067)+(2.030), (I-302)+(1.067)+(2.031), (I-302)+(1.067)+(2.032), (I-302)+(1.067)+(2.033), (I-302)+(1.067)+(2.034), (I-302)+(1.067)+(2.035), (I-302)+(1.067)+(2.036), (I-302)+(1.067)+(2.037), (I-302)+(1.067)+(2.038), (I-302)+(1.067)+(2.039), (I-302)+(1.067)+(2.040), (I-302)+(1.067)+(2.041), (I-302)+(1.067)+(2.042), (I-302)+(1.067)+(2.043), (I-302)+(1.067)+(2.044), (I-302)+(1.067)+(2.045), (I-302)+(1.067)+(2.046), (I-302)+(1.067)+(2.047), (I-302)+(1.067)+(2.048), (I-302)+(1.067)+(2.049), (I-302)+(1.067)+(2.050), (I-302)+(1.067)+(2.051), (I-302)+(1.067)+(2.052), (I-302)+(1.067)+(2.053), (I-302)+(1.067)+(2.054), (I-302)+(1.067)+(2.055), (I-302)+(1.067)+(2.056), (I-302)+(1.067)+(2.057), (I-302)+(1.067)+(2.058), (I-302)+(1.067)+(2.059), (I-302)+(1.067)+(3.001), (I-302)+(1.067)+(3.002), (I-302)+(1.067)+(3.003), (I-302)+(1.067)+(3.004), (I-302)+(1.067)+(3.005), (I-302)+(1.067)+(3.006), (I-302)+(1.067)+(3.007), (I-302)+(1.067)+(3.008), (I-302)+(1.067)+(3.009), (I-302)+(1.067)+(3.010), (I-302)+(1.067)+(3.011), (I-302)+(1.067)+(3.012), (I-302)+(1.067)+(3.013), (I-302)+(1.067)+(3.014), (I-302)+(1.067)+(3.015), (I-302)+(1.067)+(3.016), (I-302)+(1.067)+(3.017), (I-302)+(1.067)+(3.018), (I-302)+(1.067)+(3.019), (I-302)+(1.067)+(3.020), (I-302)+(1.067)+(3.021), (I-302)+(1.067)+(3.022), (I-302)+(1.067)+(3.023), (I-302)+(1.067)+(3.024), (I-302)+(1.067)+(3.025), (I-302)+(1.067)+(3.026), (I-302)+(1.067)+(3.027), (I-302)+(1.067)+(3.028), (I-302)+(1.067)+(3.029), (I-302)+(1.067)+(3.030), (I-302)+(1.067)+(3.031), (I-302)+(1.067)+(5.001), (I-302)+(1.067)+(5.002), (I-302)+(1.067)+(5.003), (I-302)+(1.067)+(5.004), (I-302)+(1.067)+(5.005), (I-302)+(1.067)+(5.006), (I-302)+(1.067)+(5.007), (I-302)+(1.067)+(5.008), (I-302)+(1.067)+(5.009), (I-302)+(1.067)+(5.010), (I-302)+(1.067)+(5.011), (I-302)+(1.067)+(5.012), (I-302)+(1.067)+(5.013), (I-302)+(1.067)+(5.014), (I-302)+(1.067)+(5.015), (I-302)+(1.067)+(5.016), (I-302)+(1.067)+(5.017), (I-302)+(1.067)+(5.018), (I-302)+(1.067)+(5.019), (I-302)+(1.067)+(5.020), (I-302)+(1.067)+(5.021), (I-302)+(1.067)+(5.022), (I-302)+(1.067)+(5.023), (I-302)+(1.067)+(6.001), (I-302)+(1.067)+(6.002), (I-302)+(1.067)+(6.003), (I-302)+(1.067)+(6.004), (I-302)+(1.067)+(7.001), (I-302)+(1.067)+(7.002), (I-302)+(1.067)+(7.003), (I-302)+(1.067)+(7.004), (I-302)+(1.067)+(7.005), (I-302)+(1.067)+(7.006), (I-302)+(1.067)+(9.001), (I-302)+(1.067)+(9.002), (I-302)+(1.067)+(9.003), (I-302)+(1.067)+(9.004), (I-302)+(1.067)+(9.005), (I-302)+(1.067)+(9.006), (I-302)+(1.067)+(9.007), (I-302)+(1.067)+(9.008), (I-302)+(1.067)+(9.009), (I-302)+(1.067)+(14.001), (I-302)+(1.067)+(14.002), (I-302)+(1.067)+(15.008), (I-302)+(1.067)+(15.011), (I-302)+(1.067)+(15.012), (I-302)+(1.067)+(15.016), (I-302)+(1.067)+(15.025), (I-302)+(1.067)+(15.027), (I-302)+(1.067)+(15.047), (I-302)+(1.067)+(15.063), (I-302)+(1.067)+(15.064), (I-302)+(1.067)+(16.001), (I-302)+(1.067)+(16.002), (I-302)+(1.067)+(16.003), (I-302)+(1.067)+(16.004), (I-302)+(1.067)+(16.005), (I-302)+(1.067)+(16.006), (I-302)+(1.067)+(16.007), (I-302)+(1.067)+(16.008), (I-302)+(1.067)+(17.001), (I-302)+(1.067)+(17.002), (I-302)+(1.067)+(17.003), (I-302)+(1.067)+(17.004), (I-302)+(1.067)+(17.005), (I-302)+(1.067)+(17.006), (I-302)+(1.067)+(17.007), (I-302)+(1.067)+(17.008), (I-302)+(1.067)+(17.009), (I-302)+(1.067)+(17.010), (I-302)+(1.067)+(17.011), (I-302)+(1.067)+(17.012), (I-302)+(1.067)+(18.001), (I-302)+(1.068)+(1.069), (I-302)+(1.068)+(1.070), (I-302)+(1.068)+(1.071), (I-302)+(1.068)+(1.072), (I-302)+(1.068)+(1.073), (I-302)+(1.068)+(1.074), (I-302)+(1.068)+(1.075), (I-302)+(1.068)+(1.076), (I-302)+(1.068)+(1.077), (I-302)+(1.068)+(1.078), (I-302)+(1.068)+(1.079), (I-302)+(1.068)+(1.080), (I-302)+(1.068)+(1.081), (I-302)+(1.068)+(1.082), (I-302)+(1.068)+(1.083), (I-302)+(1.068)+(1.084), (I-302)+(1.068)+(1.085), (I-302)+(1.068)+(1.086), (I-302)+(1.068)+(1.087), (I-302)+(1.068)+(1.088), (I-302)+(1.068)+(1.089), (I-302)+(1.068)+(1.090), (I-302)+(1.068)+(1.091), (I-302)+(1.068)+(1.092), (I-302)+(1.068)+(2.001), (I-302)+(1.068)+(2.002), (I-302)+(1.068)+(2.003), (I-302)+(1.068)+(2.004), (I-302)+(1.068)+(2.005), (I-302)+(1.068)+(2.006), (I-302)+(1.068)+(2.007), (I-302)+(1.068)+(2.008), (I-302)+(1.068)+(2.009), (I-302)+(1.068)+(2.010), (I-302)+(1.068)+(2.011), (I-302)+(1.068)+(2.012), (I-302)+(1.068)+(2.013), (I-302)+(1.068)+(2.014), (I-302)+(1.068)+(2.015), (I-302)+(1.068)+(2.016), (I-302)+(1.068)+(2.017), (I-302)+(1.068)+(2.018), (I-302)+(1.068)+(2.019), (I-302)+(1.068)+(2.020), (I-302)+(1.068)+(2.021), (I-302)+(1.068)+(2.022), (I-302)+(1.068)+(2.023), (I-302)+(1.068)+(2.024), (I-302)+(1.068)+(2.025), (I-302)+(1.068)+(2.026), (I-302)+(1.068)+(2.027), (I-302)+(1.068)+(2.028), (I-302)+(1.068)+(2.029), (I-302)+(1.068)+(2.030), (I-302)+(1.068)+(2.031), (I-302)+(1.068)+(2.032), (I-302)+(1.068)+(2.033), (I-302)+(1.068)+(2.034), (I-302)+(1.068)+(2.035), (I-302)+(1.068)+(2.036), (I-302)+(1.068)+(2.037), (I-302)+(1.068)+(2.038), (I-302)+(1.068)+(2.039), (I-302)+(1.068)+(2.040), (I-302)+(1.068)+(2.041), (I-302)+(1.068)+(2.042), (I-302)+(1.068)+(2.043), (I-302)+(1.068)+(2.044), (I-302)+(1.068)+(2.045), (I-302)+(1.068)+(2.046), (I-302)+(1.068)+(2.047), (I-302)+(1.068)+(2.048), (I-302)+(1.068)+(2.049), (I-302)+(1.068)+(2.050), (I-302)+(1.068)+(2.051), (I-302)+(1.068)+(2.052), (I-302)+(1.068)+(2.053), (I-302)+(1.068)+(2.054), (I-302)+(1.068)+(2.055), (I-302)+(1.068)+(2.056), (I-302)+(1.068)+(2.057), (I-302)+(1.068)+(2.058), (I-302)+(1.068)+(2.059), (I-302)+(1.068)+(3.001), (I-302)+(1.068)+(3.002), (I-302)+(1.068)+(3.003), (I-302)+(1.068)+(3.004), (I-302)+(1.068)+(3.005), (I-302)+(1.068)+(3.006), (I-302)+(1.068)+(3.007), (I-302)+(1.068)+(3.008), (I-302)+(1.068)+(3.009), (I-302)+(1.068)+(3.010), (I-302)+(1.068)+(3.011), (I-302)+(1.068)+(3.012), (I-302)+(1.068)+(3.013), (I-302)+(1.068)+(3.014), (I-302)+(1.068)+(3.015), (I-302)+(1.068)+(3.016), (I-302)+(1.068)+(3.017), (I-302)+(1.068)+(3.018), (I-302)+(1.068)+(3.019), (I-302)+(1.068)+(3.020), (I-302)+(1.068)+(3.021), (I-302)+(1.068)+(3.022), (I-302)+(1.068)+(3.023), (I-302)+(1.068)+(3.024), (I-302)+(1.068)+(3.025), (I-302)+(1.068)+(3.026), (I-302)+(1.068)+(3.027), (I-302)+(1.068)+(3.028), (I-302)+(1.068)+(3.029), (I-302)+(1.068)+(3.030), (I-302)+(1.068)+(3.031), (I-302)+(1.068)+(5.001), (I-302)+(1.068)+(5.002), (I-302)+(1.068)+(5.003), (I-302)+(1.068)+(5.004), (I-302)+(1.068)+(5.005), (I-302)+(1.068)+(5.006), (I-302)+(1.068)+(5.007), (I-302)+(1.068)+(5.008), (I-302)+(1.068)+(5.009), (I-302)+(1.068)+(5.010), (I-302)+(1.068)+(5.011), (I-302)+(1.068)+(5.012), (I-302)+(1.068)+(5.013), (I-302)+(1.068)+(5.014), (I-302)+(1.068)+(5.015), (I-302)+(1.068)+(5.016), (I-302)+(1.068)+(5.017), (I-302)+(1.068)+(5.018), (I-302)+(1.068)+(5.019), (I-302)+(1.068)+(5.020), (I-302)+(1.068)+(5.021), (I-302)+(1.068)+(5.022), (I-302)+(1.068)+(5.023), (I-302)+(1.068)+(6.001), (I-302)+(1.068)+(6.002), (I-302)+(1.068)+(6.003), (I-302)+(1.068)+(6.004), (I-302)+(1.068)+(7.001), (I-302)+(1.068)+(7.002), (I-302)+(1.068)+(7.003), (I-302)+(1.068)+(7.004), (I-302)+(1.068)+(7.005), (I-302)+(1.068)+(7.006), (I-302)+(1.068)+(9.001), (I-302)+(1.068)+(9.002), (I-302)+(1.068)+(9.003), (I-302)+(1.068)+(9.004), (I-302)+(1.068)+(9.005), (I-302)+(1.068)+(9.006), (I-302)+(1.068)+(9.007), (I-302)+(1.068)+(9.008), (I-302)+(1.068)+(9.009), (I-302)+(1.068)+(14.001), (I-302)+(1.068)+(14.002), (I-302)+(1.068)+(15.008), (I-302)+(1.068)+(15.011), (I-302)+(1.068)+(15.012), (I-302)+(1.068)+(15.016), (I-302)+(1.068)+(15.025), (I-302)+(1.068)+(15.027), (I-302)+(1.068)+(15.047), (I-302)+(1.068)+(15.063), (I-302)+(1.068)+(15.064), (I-302)+(1.068)+(16.001), (I-302)+(1.068)+(16.002), (I-302)+(1.068)+(16.003), (I-302)+(1.068)+(16.004), (I-302)+(1.068)+(16.005), (I-302)+(1.068)+(16.006), (I-302)+(1.068)+(16.007), (I-302)+(1.068)+(16.008), (I-302)+(1.068)+(17.001), (I-302)+(1.068)+(17.002), (I-302)+(1.068)+(17.003), (I-302)+(1.068)+(17.004), (I-302)+(1.068)+(17.005), (I-302)+(1.068)+(17.006), (I-302)+(1.068)+(17.007), (I-302)+(1.068)+(17.008), (I-302)+(1.068)+(17.009), (I-302)+(1.068)+(17.010), (I-302)+(1.068)+(17.011), (I-302)+(1.068)+(17.012), (I-302)+(1.068)+(18.001), (I-302)+(1.069)+(1.070), (I-302)+(1.069)+(1.071), (I-302)+(1.069)+(1.072), (I-302)+(1.069)+(1.073), (I-302)+(1.069)+(1.074), (I-302)+(1.069)+(1.075), (I-302)+(1.069)+(1.076), (I-302)+(1.069)+(1.077), (I-302)+(1.069)+(1.078), (I-302)+(1.069)+(1.079), (I-302)+(1.069)+(1.080), (I-302)+(1.069)+(1.081), (I-302)+(1.069)+(1.082), (I-302)+(1.069)+(1.083), (I-302)+(1.069)+(1.084), (I-302)+(1.069)+(1.085), (I-302)+(1.069)+(1.086), (I-302)+(1.069)+(1.087), (I-302)+(1.069)+(1.088), (I-302)+(1.069)+(1.089), (I-302)+(1.069)+(1.090), (I-302)+(1.069)+(1.091), (I-302)+(1.069)+(1.092), (I-302)+(1.069)+(2.001), (I-302)+(1.069)+(2.002), (I-302)+(1.069)+(2.003), (I-302)+(1.069)+(2.004), (I-302)+(1.069)+(2.005), (I-302)+(1.069)+(2.006), (I-302)+(1.069)+(2.007), (I-302)+(1.069)+(2.008), (I-302)+(1.069)+(2.009), (I-302)+(1.069)+(2.010), (I-302)+(1.069)+(2.011), (I-302)+(1.069)+(2.012), (I-302)+(1.069)+(2.013), (I-302)+(1.069)+(2.014), (I-302)+(1.069)+(2.015), (I-302)+(1.069)+(2.016), (I-302)+(1.069)+(2.017), (I-302)+(1.069)+(2.018), (I-302)+(1.069)+(2.019), (I-302)+(1.069)+(2.020), (I-302)+(1.069)+(2.021), (I-302)+(1.069)+(2.022), (I-302)+(1.069)+(2.023), (I-302)+(1.069)+(2.024), (I-302)+(1.069)+(2.025), (I-302)+(1.069)+(2.026), (I-302)+(1.069)+(2.027), (I-302)+(1.069)+(2.028), (I-302)+(1.069)+(2.029), (I-302)+(1.069)+(2.030), (I-302)+(1.069)+(2.031), (I-302)+(1.069)+(2.032), (I-302)+(1.069)+(2.033), (I-302)+(1.069)+(2.034), (I-302)+(1.069)+(2.035), (I-302)+(1.069)+(2.036), (I-302)+(1.069)+(2.037), (I-302)+(1.069)+(2.038), (I-302)+(1.069)+(2.039), (I-302)+(1.069)+(2.040), (I-302)+(1.069)+(2.041), (I-302)+(1.069)+(2.042), (I-302)+(1.069)+(2.043), (I-302)+(1.069)+(2.044), (I-302)+(1.069)+(2.045), (I-302)+(1.069)+(2.046), (I-302)+(1.069)+(2.047), (I-302)+(1.069)+(2.048), (I-302)+(1.069)+(2.049), (I-302)+(1.069)+(2.050), (I-302)+(1.069)+(2.051), (I-302)+(1.069)+(2.052), (I-302)+(1.069)+(2.053), (I-302)+(1.069)+(2.054), (I-302)+(1.069)+(2.055), (I-302)+(1.069)+(2.056), (I-302)+(1.069)+(2.057), (I-302)+(1.069)+(2.058), (I-302)+(1.069)+(2.059), (I-302)+(1.069)+(3.001), (I-302)+(1.069)+(3.002), (I-302)+(1.069)+(3.003), (I-302)+(1.069)+(3.004), (I-302)+(1.069)+(3.005), (I-302)+(1.069)+(3.006), (I-302)+(1.069)+(3.007), (I-302)+(1.069)+(3.008), (I-302)+(1.069)+(3.009), (I-302)+(1.069)+(3.010), (I-302)+(1.069)+(3.011), (I-302)+(1.069)+(3.012), (I-302)+(1.069)+(3.013), (I-302)+(1.069)+(3.014), (I-302)+(1.069)+(3.015), (I-302)+(1.069)+(3.016), (I-302)+(1.069)+(3.017), (I-302)+(1.069)+(3.018), (I-302)+(1.069)+(3.019), (I-302)+(1.069)+(3.020), (I-302)+(1.069)+(3.021), (I-302)+(1.069)+(3.022), (I-302)+(1.069)+(3.023), (I-302)+(1.069)+(3.024), (I-302)+(1.069)+(3.025), (I-302)+(1.069)+(3.026), (I-302)+(1.069)+(3.027), (I-302)+(1.069)+(3.028), (I-302)+(1.069)+(3.029), (I-302)+(1.069)+(3.030), (I-302)+(1.069)+(3.031), (I-302)+(1.069)+(5.001), (I-302)+(1.069)+(5.002), (I-302)+(1.069)+(5.003), (I-302)+(1.069)+(5.004), (I-302)+(1.069)+(5.005), (I-302)+(1.069)+(5.006), (I-302)+(1.069)+(5.007), (I-302)+(1.069)+(5.008), (I-302)+(1.069)+(5.009), (I-302)+(1.069)+(5.010), (I-302)+(1.069)+(5.011), (I-302)+(1.069)+(5.012), (I-302)+(1.069)+(5.013), (I-302)+(1.069)+(5.014), (I-302)+(1.069)+(5.015), (I-302)+(1.069)+(5.016), (I-302)+(1.069)+(5.017), (I-302)+(1.069)+(5.018), (I-302)+(1.069)+(5.019), (I-302)+(1.069)+(5.020), (I-302)+(1.069)+(5.021), (I-302)+(1.069)+(5.022), (I-302)+(1.069)+(5.023), (I-302)+(1.069)+(6.001), (I-302)+(1.069)+(6.002), (I-302)+(1.069)+(6.003), (I-302)+(1.069)+(6.004), (I-302)+(1.069)+(7.001), (I-302)+(1.069)+(7.002), (I-302)+(1.069)+(7.003), (I-302)+(1.069)+(7.004), (I-302)+(1.069)+(7.005), (I-302)+(1.069)+(7.006), (I-302)+(1.069)+(9.001), (I-302)+(1.069)+(9.002), (I-302)+(1.069)+(9.003), (I-302)+(1.069)+(9.004), (I-302)+(1.069)+(9.005), (I-302)+(1.069)+(9.006), (I-302)+(1.069)+(9.007), (I-302)+(1.069)+(9.008), (I-302)+(1.069)+(9.009), (I-302)+(1.069)+(14.001), (I-302)+(1.069)+(14.002), (I-302)+(1.069)+(15.008), (I-302)+(1.069)+(15.011), (I-302)+(1.069)+(15.012), (I-302)+(1.069)+(15.016), (I-302)+(1.069)+(15.025), (I-302)+(1.069)+(15.027), (I-302)+(1.069)+(15.047), (I-302)+(1.069)+(15.063), (I-302)+(1.069)+(15.064), (I-302)+(1.069)+(16.001), (I-302)+(1.069)+(16.002), (I-302)+(1.069)+(16.003), (I-302)+(1.069)+(16.004), (I-302)+(1.069)+(16.005), (I-302)+(1.069)+(16.006), (I-302)+(1.069)+(16.007), (I-302)+(1.069)+(16.008), (I-302)+(1.069)+(17.001), (I-302)+(1.069)+(17.002), (I-302)+(1.069)+(17.003), (I-302)+(1.069)+(17.004), (I-302)+(1.069)+(17.005), (I-302)+(1.069)+(17.006), (I-302)+(1.069)+(17.007), (I-302)+(1.069)+(17.008), (I-302)+(1.069)+(17.009), (I-302)+(1.069)+(17.010), (I-302)+(1.069)+(17.011), (I-302)+(1.069)+(17.012), (I-302)+(1.069)+(18.001), (I-302)+(1.070)+(1.071), (I-302)+(1.070)+(1.072), (I-302)+(1.070)+(1.073), (I-302)+(1.070)+(1.074), (I-302)+(1.070)+(1.075), (I-302)+(1.070)+(1.076), (I-302)+(1.070)+(1.077), (I-302)+(1.070)+(1.078), (I-302)+(1.070)+(1.079), (I-302)+(1.070)+(1.080), (I-302)+(1.070)+(1.081), (I-302)+(1.070)+(1.082), (I-302)+(1.070)+(1.083), (I-302)+(1.070)+(1.084), (I-302)+(1.070)+(1.085), (I-302)+(1.070)+(1.086), (I-302)+(1.070)+(1.087), (I-302)+(1.070)+(1.088), (I-302)+(1.070)+(1.089), (I-302)+(1.070)+(1.090), (I-302)+(1.070)+(1.091), (I-302)+(1.070)+(1.092), (I-302)+(1.070)+(2.001), (I-302)+(1.070)+(2.002), (I-302)+(1.070)+(2.003), (I-302)+(1.070)+(2.004), (I-302)+(1.070)+(2.005), (I-302)+(1.070)+(2.006), (I-302)+(1.070)+(2.007), (I-302)+(1.070)+(2.008), (I-302)+(1.070)+(2.009), (I-302)+(1.070)+(2.010), (I-302)+(1.070)+(2.011), (I-302)+(1.070)+(2.012), (I-302)+(1.070)+(2.013), (I-302)+(1.070)+(2.014), (I-302)+(1.070)+(2.015), (I-302)+(1.070)+(2.016), (I-302)+(1.070)+(2.017), (I-302)+(1.070)+(2.018), (I-302)+(1.070)+(2.019), (I-302)+(1.070)+(2.020), (I-302)+(1.070)+(2.021), (I-302)+(1.070)+(2.022), (I-302)+(1.070)+(2.023), (I-302)+(1.070)+(2.024), (I-302)+(1.070)+(2.025), (I-302)+(1.070)+(2.026), (I-302)+(1.070)+(2.027), (I-302)+(1.070)+(2.028), (I-302)+(1.070)+(2.029), (I-302)+(1.070)+(2.030), (I-302)+(1.070)+(2.031), (I-302)+(1.070)+(2.032), (I-302)+(1.070)+(2.033), (I-302)+(1.070)+(2.034), (I-302)+(1.070)+(2.035), (I-302)+(1.070)+(2.036), (I-302)+(1.070)+(2.037), (I-302)+(1.070)+(2.038), (I-302)+(1.070)+(2.039), (I-302)+(1.070)+(2.040), (I-302)+(1.070)+(2.041), (I-302)+(1.070)+(2.042), (I-302)+(1.070)+(2.043), (I-302)+(1.070)+(2.044), (I-302)+(1.070)+(2.045), (I-302)+(1.070)+(2.046), (I-302)+(1.070)+(2.047), (I-302)+(1.070)+(2.048), (I-302)+(1.070)+(2.049), (I-302)+(1.070)+(2.050), (I-302)+(1.070)+(2.051), (I-302)+(1.070)+(2.052), (I-302)+(1.070)+(2.053), (I-302)+(1.070)+(2.054), (I-302)+(1.070)+(2.055), (I-302)+(1.070)+(2.056), (I-302)+(1.070)+(2.057), (I-302)+(1.070)+(2.058), (I-302)+(1.070)+(2.059), (I-302)+(1.070)+(3.001), (I-302)+(1.070)+(3.002), (I-302)+(1.070)+(3.003), (I-302)+(1.070)+(3.004), (I-302)+(1.070)+(3.005), (I-302)+(1.070)+(3.006), (I-302)+(1.070)+(3.007), (I-302)+(1.070)+(3.008), (I-302)+(1.070)+(3.009), (I-302)+(1.070)+(3.010), (I-302)+(1.070)+(3.011), (I-302)+(1.070)+(3.012), (I-302)+(1.070)+(3.013), (I-302)+(1.070)+(3.014), (I-302)+(1.070)+(3.015), (I-302)+(1.070)+(3.016), (I-302)+(1.070)+(3.017), (I-302)+(1.070)+(3.018), (I-302)+(1.070)+(3.019), (I-302)+(1.070)+(3.020), (I-302)+(1.070)+(3.021), (I-302)+(1.070)+(3.022), (I-302)+(1.070)+(3.023), (I-302)+(1.070)+(3.024), (I-302)+(1.070)+(3.025), (I-302)+(1.070)+(3.026), (I-302)+(1.070)+(3.027), (I-302)+(1.070)+(3.028), (I-302)+(1.070)+(3.029), (I-302)+(1.070)+(3.030), (I-302)+(1.070)+(3.031), (I-302)+(1.070)+(5.001), (I-302)+(1.070)+(5.002), (I-302)+(1.070)+(5.003), (I-302)+(1.070)+(5.004), (I-302)+(1.070)+(5.005), (I-302)+(1.070)+(5.006), (I-302)+(1.070)+(5.007), (I-302)+(1.070)+(5.008), (I-302)+(1.070)+(5.009), (I-302)+(1.070)+(5.010), (I-302)+(1.070)+(5.011), (I-302)+(1.070)+(5.012), (I-302)+(1.070)+(5.013), (I-302)+(1.070)+(5.014), (I-302)+(1.070)+(5.015), (I-302)+(1.070)+(5.016), (I-302)+(1.070)+(5.017), (I-302)+(1.070)+(5.018), (I-302)+(1.070)+(5.019), (I-302)+(1.070)+(5.020), (I-302)+(1.070)+(5.021), (I-302)+(1.070)+(5.022), (I-302)+(1.070)+(5.023), (I-302)+(1.070)+(6.001), (I-302)+(1.070)+(6.002), (I-302)+(1.070)+(6.003), (I-302)+(1.070)+(6.004), (I-302)+(1.070)+(7.001), (I-302)+(1.070)+(7.002), (I-302)+(1.070)+(7.003), (I-302)+(1.070)+(7.004), (I-302)+(1.070)+(7.005), (I-302)+(1.070)+(7.006), (I-302)+(1.070)+(9.001), (I-302)+(1.070)+(9.002), (I-302)+(1.070)+(9.003), (I-302)+(1.070)+(9.004), (I-302)+(1.070)+(9.005), (I-302)+(1.070)+(9.006), (I-302)+(1.070)+(9.007), (I-302)+(1.070)+(9.008), (I-302)+(1.070)+(9.009), (I-302)+(1.070)+(14.001), (I-302)+(1.070)+(14.002), (I-302)+(1.070)+(15.008), (I-302)+(1.070)+(15.011), (I-302)+(1.070)+(15.012), (I-302)+(1.070)+(15.016), (I-302)+(1.070)+(15.025), (I-302)+(1.070)+(15.027), (I-302)+(1.070)+(15.047), (I-302)+(1.070)+(15.063), (I-302)+(1.070)+(15.064), (I-302)+(1.070)+(16.001), (I-302)+(1.070)+(16.002), (I-302)+(1.070)+(16.003), (I-302)+(1.070)+(16.004), (I-302)+(1.070)+(16.005), (I-302)+(1.070)+(16.006), (I-302)+(1.070)+(16.007), (I-302)+(1.070)+(16.008), (I-302)+(1.070)+(17.001), (I-302)+(1.070)+(17.002), (I-302)+(1.070)+(17.003), (I-302)+(1.070)+(17.004), (I-302)+(1.070)+(17.005), (I-302)+(1.070)+(17.006), (I-302)+(1.070)+(17.007), (I-302)+(1.070)+(17.008), (I-302)+(1.070)+(17.009), (I-302)+(1.070)+(17.010), (I-302)+(1.070)+(17.011), (I-302)+(1.070)+(17.012), (I-302)+(1.070)+(18.001), (I-302)+(1.071)+(1.072), (I-302)+(1.071)+(1.073), (I-302)+(1.071)+(1.074), (I-302)+(1.071)+(1.075), (I-302)+(1.071)+(1.076), (I-302)+(1.071)+(1.077), (I-302)+(1.071)+(1.078), (I-302)+(1.071)+(1.079), (I-302)+(1.071)+(1.080), (I-302)+(1.071)+(1.081), (I-302)+(1.071)+(1.082), (I-302)+(1.071)+(1.083), (I-302)+(1.071)+(1.084), (I-302)+(1.071)+(1.085), (I-302)+(1.071)+(1.086), (I-302)+(1.071)+(1.087), (I-302)+(1.071)+(1.088), (I-302)+(1.071)+(1.089), (I-302)+(1.071)+(1.090), (I-302)+(1.071)+(1.091), (I-302)+(1.071)+(1.092), (I-302)+(1.071)+(2.001), (I-302)+(1.071)+(2.002), (I-302)+(1.071)+(2.003), (I-302)+(1.071)+(2.004), (I-302)+(1.071)+(2.005), (I-302)+(1.071)+(2.006), (I-302)+(1.071)+(2.007), (I-302)+(1.071)+(2.008), (I-302)+(1.071)+(2.009), (I-302)+(1.071)+(2.010), (I-302)+(1.071)+(2.011), (I-302)+(1.071)+(2.012), (I-302)+(1.071)+(2.013), (I-302)+(1.071)+(2.014), (I-302)+(1.071)+(2.015), (I-302)+(1.071)+(2.016), (I-302)+(1.071)+(2.017), (I-302)+(1.071)+(2.018), (I-302)+(1.071)+(2.019), (I-302)+(1.071)+(2.020), (I-302)+(1.071)+(2.021), (I-302)+(1.071)+(2.022), (I-302)+(1.071)+(2.023), (I-302)+(1.071)+(2.024), (I-302)+(1.071)+(2.025), (I-302)+(1.071)+(2.026), (I-302)+(1.071)+(2.027), (I-302)+(1.071)+(2.028), (I-302)+(1.071)+(2.029), (I-302)+(1.071)+(2.030), (I-302)+(1.071)+(2.031), (I-302)+(1.071)+(2.032), (I-302)+(1.071)+(2.033), (I-302)+(1.071)+(2.034), (I-302)+(1.071)+(2.035), (I-302)+(1.071)+(2.036), (I-302)+(1.071)+(2.037), (I-302)+(1.071)+(2.038), (I-302)+(1.071)+(2.039), (I-302)+(1.071)+(2.040), (I-302)+(1.071)+(2.041), (I-302)+(1.071)+(2.042), (I-302)+(1.071)+(2.043), (I-302)+(1.071)+(2.044), (I-302)+(1.071)+(2.045), (I-302)+(1.071)+(2.046), (I-302)+(1.071)+(2.047), (I-302)+(1.071)+(2.048), (I-302)+(1.071)+(2.049), (I-302)+(1.071)+(2.050), (I-302)+(1.071)+(2.051), (I-302)+(1.071)+(2.052), (I-302)+(1.071)+(2.053), (I-302)+(1.071)+(2.054), (I-302)+(1.071)+(2.055), (I-302)+(1.071)+(2.056), (I-302)+(1.071)+(2.057), (I-302)+(1.071)+(2.058), (I-302)+(1.071)+(2.059), (I-302)+(1.071)+(3.001), (I-302)+(1.071)+(3.002), (I-302)+(1.071)+(3.003), (I-302)+(1.071)+(3.004), (I-302)+(1.071)+(3.005), (I-302)+(1.071)+(3.006), (I-302)+(1.071)+(3.007), (I-302)+(1.071)+(3.008), (I-302)+(1.071)+(3.009), (I-302)+(1.071)+(3.010), (I-302)+(1.071)+(3.011), (I-302)+(1.071)+(3.012), (I-302)+(1.071)+(3.013), (I-302)+(1.071)+(3.014), (I-302)+(1.071)+(3.015), (I-302)+(1.071)+(3.016), (I-302)+(1.071)+(3.017), (I-302)+(1.071)+(3.018), (I-302)+(1.071)+(3.019), (I-302)+(1.071)+(3.020), (I-302)+(1.071)+(3.021), (I-302)+(1.071)+(3.022), (I-302)+(1.071)+(3.023), (I-302)+(1.071)+(3.024), (I-302)+(1.071)+(3.025), (I-302)+(1.071)+(3.026), (I-302)+(1.071)+(3.027), (I-302)+(1.071)+(3.028), (I-302)+(1.071)+(3.029), (I-302)+(1.071)+(3.030), (I-302)+(1.071)+(3.031), (I-302)+(1.071)+(5.001), (I-302)+(1.071)+(5.002), (I-302)+(1.071)+(5.003), (I-302)+(1.071)+(5.004), (I-302)+(1.071)+(5.005), (I-302)+(1.071)+(5.006), (I-302)+(1.071)+(5.007), (I-302)+(1.071)+(5.008), (I-302)+(1.071)+(5.009), (I-302)+(1.071)+(5.010), (I-302)+(1.071)+(5.011), (I-302)+(1.071)+(5.012), (I-302)+(1.071)+(5.013), (I-302)+(1.071)+(5.014), (I-302)+(1.071)+(5.015), (I-302)+(1.071)+(5.016), (I-302)+(1.071)+(5.017), (I-302)+(1.071)+(5.018), (I-302)+(1.071)+(5.019), (I-302)+(1.071)+(5.020), (I-302)+(1.071)+(5.021), (I-302)+(1.071)+(5.022), (I-302)+(1.071)+(5.023), (I-302)+(1.071)+(6.001), (I-302)+(1.071)+(6.002), (I-302)+(1.071)+(6.003), (I-302)+(1.071)+(6.004), (I-302)+(1.071)+(7.001), (I-302)+(1.071)+(7.002), (I-302)+(1.071)+(7.003), (I-302)+(1.071)+(7.004), (I-302)+(1.071)+(7.005), (I-302)+(1.071)+(7.006), (I-302)+(1.071)+(9.001), (I-302)+(1.071)+(9.002), (I-302)+(1.071)+(9.003), (I-302)+(1.071)+(9.004), (I-302)+(1.071)+(9.005), (I-302)+(1.071)+(9.006), (I-302)+(1.071)+(9.007), (I-302)+(1.071)+(9.008), (I-302)+(1.071)+(9.009), (I-302)+(1.071)+(14.001), (I-302)+(1.071)+(14.002), (I-302)+(1.071)+(15.008), (I-302)+(1.071)+(15.011), (I-302)+(1.071)+(15.012), (I-302)+(1.071)+(15.016), (I-302)+(1.071)+(15.025), (I-302)+(1.071)+(15.027), (I-302)+(1.071)+(15.047), (I-302)+(1.071)+(15.063), (I-302)+(1.071)+(15.064), (I-302)+(1.071)+(16.001), (I-302)+(1.071)+(16.002), (I-302)+(1.071)+(16.003), (I-302)+(1.071)+(16.004), (I-302)+(1.071)+(16.005), (I-302)+(1.071)+(16.006), (I-302)+(1.071)+(16.007), (I-302)+(1.071)+(16.008), (I-302)+(1.071)+(17.001), (I-302)+(1.071)+(17.002), (I-302)+(1.071)+(17.003), (I-302)+(1.071)+(17.004), (I-302)+(1.071)+(17.005), (I-302)+(1.071)+(17.006), (I-302)+(1.071)+(17.007), (I-302)+(1.071)+(17.008), (I-302)+(1.071)+(17.009), (I-302)+(1.071)+(17.010), (I-302)+(1.071)+(17.011), (I-302)+(1.071)+(17.012), (I-302)+(1.071)+(18.001), (I-302)+(1.072)+(1.073), (I-302)+(1.072)+(1.074), (I-302)+(1.072)+(1.075), (I-302)+(1.072)+(1.076), (I-302)+(1.072)+(1.077), (I-302)+(1.072)+(1.078), (I-302)+(1.072)+(1.079), (I-302)+(1.072)+(1.080), (I-302)+(1.072)+(1.081), (I-302)+(1.072)+(1.082), (I-302)+(1.072)+(1.083), (I-302)+(1.072)+(1.084), (I-302)+(1.072)+(1.085), (I-302)+(1.072)+(1.086), (I-302)+(1.072)+(1.087), (I-302)+(1.072)+(1.088), (I-302)+(1.072)+(1.089), (I-302)+(1.072)+(1.090), (I-302)+(1.072)+(1.091), (I-302)+(1.072)+(1.092), (I-302)+(1.072)+(2.001), (I-302)+(1.072)+(2.002), (I-302)+(1.072)+(2.003), (I-302)+(1.072)+(2.004), (I-302)+(1.072)+(2.005), (I-302)+(1.072)+(2.006), (I-302)+(1.072)+(2.007), (I-302)+(1.072)+(2.008), (I-302)+(1.072)+(2.009), (I-302)+(1.072)+(2.010), (I-302)+(1.072)+(2.011), (I-302)+(1.072)+(2.012), (I-302)+(1.072)+(2.013), (I-302)+(1.072)+(2.014), (I-302)+(1.072)+(2.015), (I-302)+(1.072)+(2.016), (I-302)+(1.072)+(2.017), (I-302)+(1.072)+(2.018), (I-302)+(1.072)+(2.019), (I-302)+(1.072)+(2.020), (I-302)+(1.072)+(2.021), (I-302)+(1.072)+(2.022), (I-302)+(1.072)+(2.023), (I-302)+(1.072)+(2.024), (I-302)+(1.072)+(2.025), (I-302)+(1.072)+(2.026), (I-302)+(1.072)+(2.027), (I-302)+(1.072)+(2.028), (I-302)+(1.072)+(2.029), (I-302)+(1.072)+(2.030), (I-302)+(1.072)+(2.031), (I-302)+(1.072)+(2.032), (I-302)+(1.072)+(2.033), (I-302)+(1.072)+(2.034), (I-302)+(1.072)+(2.035), (I-302)+(1.072)+(2.036), (I-302)+(1.072)+(2.037), (I-302)+(1.072)+(2.038), (I-302)+(1.072)+(2.039), (I-302)+(1.072)+(2.040), (I-302)+(1.072)+(2.041), (I-302)+(1.072)+(2.042), (I-302)+(1.072)+(2.043), (I-302)+(1.072)+(2.044), (I-302)+(1.072)+(2.045), (I-302)+(1.072)+(2.046), (I-302)+(1.072)+(2.047), (I-302)+(1.072)+(2.048), (I-302)+(1.072)+(2.049), (I-302)+(1.072)+(2.050), (I-302)+(1.072)+(2.051), (I-302)+(1.072)+(2.052), (I-302)+(1.072)+(2.053), (I-302)+(1.072)+(2.054), (I-302)+(1.072)+(2.055), (I-302)+(1.072)+(2.056), (I-302)+(1.072)+(2.057), (I-302)+(1.072)+(2.058), (I-302)+(1.072)+(2.059), (I-302)+(1.072)+(3.001), (I-302)+(1.072)+(3.002), (I-302)+(1.072)+(3.003), (I-302)+(1.072)+(3.004), (I-302)+(1.072)+(3.005), (I-302)+(1.072)+(3.006), (I-302)+(1.072)+(3.007), (I-302)+(1.072)+(3.008), (I-302)+(1.072)+(3.009), (I-302)+(1.072)+(3.010), (I-302)+(1.072)+(3.011), (I-302)+(1.072)+(3.012), (I-302)+(1.072)+(3.013), (I-302)+(1.072)+(3.014), (I-302)+(1.072)+(3.015), (I-302)+(1.072)+(3.016), (I-302)+(1.072)+(3.017), (I-302)+(1.072)+(3.018), (I-302)+(1.072)+(3.019), (I-302)+(1.072)+(3.020), (I-302)+(1.072)+(3.021), (I-302)+(1.072)+(3.022), (I-302)+(1.072)+(3.023), (I-302)+(1.072)+(3.024), (I-302)+(1.072)+(3.025), (I-302)+(1.072)+(3.026), (I-302)+(1.072)+(3.027), (I-302)+(1.072)+(3.028), (I-302)+(1.072)+(3.029), (I-302)+(1.072)+(3.030), (I-302)+(1.072)+(3.031), (I-302)+(1.072)+(5.001), (I-302)+(1.072)+(5.002), (I-302)+(1.072)+(5.003), (I-302)+(1.072)+(5.004), (I-302)+(1.072)+(5.005), (I-302)+(1.072)+(5.006), (I-302)+(1.072)+(5.007), (I-302)+(1.072)+(5.008), (I-302)+(1.072)+(5.009), (I-302)+(1.072)+(5.010), (I-302)+(1.072)+(5.011), (I-302)+(1.072)+(5.012), (I-302)+(1.072)+(5.013), (I-302)+(1.072)+(5.014), (I-302)+(1.072)+(5.015), (I-302)+(1.072)+(5.016), (I-302)+(1.072)+(5.017), (I-302)+(1.072)+(5.018), (I-302)+(1.072)+(5.019), (I-302)+(1.072)+(5.020), (I-302)+(1.072)+(5.021), (I-302)+(1.072)+(5.022), (I-302)+(1.072)+(5.023), (I-302)+(1.072)+(6.001), (I-302)+(1.072)+(6.002), (I-302)+(1.072)+(6.003), (I-302)+(1.072)+(6.004), (I-302)+(1.072)+(7.001), (I-302)+(1.072)+(7.002), (I-302)+(1.072)+(7.003), (I-302)+(1.072)+(7.004), (I-302)+(1.072)+(7.005), (I-302)+(1.072)+(7.006), (I-302)+(1.072)+(9.001), (I-302)+(1.072)+(9.002), (I-302)+(1.072)+(9.003), (I-302)+(1.072)+(9.004), (I-302)+(1.072)+(9.005), (I-302)+(1.072)+(9.006), (I-302)+(1.072)+(9.007), (I-302)+(1.072)+(9.008), (I-302)+(1.072)+(9.009), (I-302)+(1.072)+(14.001), (I-302)+(1.072)+(14.002), (I-302)+(1.072)+(15.008), (I-302)+(1.072)+(15.011), (I-302)+(1.072)+(15.012), (I-302)+(1.072)+(15.016), (I-302)+(1.072)+(15.025), (I-302)+(1.072)+(15.027), (I-302)+(1.072)+(15.047), (I-302)+(1.072)+(15.063), (I-302)+(1.072)+(15.064), (I-302)+(1.072)+(16.001), (I-302)+(1.072)+(16.002), (I-302)+(1.072)+(16.003), (I-302)+(1.072)+(16.004), (I-302)+(1.072)+(16.005), (I-302)+(1.072)+(16.006), (I-302)+(1.072)+(16.007), (I-302)+(1.072)+(16.008), (I-302)+(1.072)+(17.001), (I-302)+(1.072)+(17.002), (I-302)+(1.072)+(17.003), (I-302)+(1.072)+(17.004), (I-302)+(1.072)+(17.005), (I-302)+(1.072)+(17.006), (I-302)+(1.072)+(17.007), (I-302)+(1.072)+(17.008), (I-302)+(1.072)+(17.009), (I-302)+(1.072)+(17.010), (I-302)+(1.072)+(17.011), (I-302)+(1.072)+(17.012), (I-302)+(1.072)+(18.001), (I-302)+(1.073)+(1.074), (I-302)+(1.073)+(1.075), (I-302)+(1.073)+(1.076), (I-302)+(1.073)+(1.077), (I-302)+(1.073)+(1.078), (I-302)+(1.073)+(1.079), (I-302)+(1.073)+(1.080), (I-302)+(1.073)+(1.081), (I-302)+(1.073)+(1.082), (I-302)+(1.073)+(1.083), (I-302)+(1.073)+(1.084), (I-302)+(1.073)+(1.085), (I-302)+(1.073)+(1.086), (I-302)+(1.073)+(1.087), (I-302)+(1.073)+(1.088), (I-302)+(1.073)+(1.089), (I-302)+(1.073)+(1.090), (I-302)+(1.073)+(1.091), (I-302)+(1.073)+(1.092), (I-302)+(1.073)+(2.001), (I-302)+(1.073)+(2.002), (I-302)+(1.073)+(2.003), (I-302)+(1.073)+(2.004), (I-302)+(1.073)+(2.005), (I-302)+(1.073)+(2.006), (I-302)+(1.073)+(2.007), (I-302)+(1.073)+(2.008), (I-302)+(1.073)+(2.009), (I-302)+(1.073)+(2.010), (I-302)+(1.073)+(2.011), (I-302)+(1.073)+(2.012), (I-302)+(1.073)+(2.013), (I-302)+(1.073)+(2.014), (I-302)+(1.073)+(2.015), (I-302)+(1.073)+(2.016), (I-302)+(1.073)+(2.017), (I-302)+(1.073)+(2.018), (I-302)+(1.073)+(2.019), (I-302)+(1.073)+(2.020), (I-302)+(1.073)+(2.021), (I-302)+(1.073)+(2.022), (I-302)+(1.073)+(2.023), (I-302)+(1.073)+(2.024), (I-302)+(1.073)+(2.025), (I-302)+(1.073)+(2.026), (I-302)+(1.073)+(2.027), (I-302)+(1.073)+(2.028), (I-302)+(1.073)+(2.029), (I-302)+(1.073)+(2.030), (I-302)+(1.073)+(2.031), (I-302)+(1.073)+(2.032), (I-302)+(1.073)+(2.033), (I-302)+(1.073)+(2.034), (I-302)+(1.073)+(2.035), (I-302)+(1.073)+(2.036), (I-302)+(1.073)+(2.037), (I-302)+(1.073)+(2.038), (I-302)+(1.073)+(2.039), (I-302)+(1.073)+(2.040), (I-302)+(1.073)+(2.041), (I-302)+(1.073)+(2.042), (I-302)+(1.073)+(2.043), (I-302)+(1.073)+(2.044), (I-302)+(1.073)+(2.045), (I-302)+(1.073)+(2.046), (I-302)+(1.073)+(2.047), (I-302)+(1.073)+(2.048), (I-302)+(1.073)+(2.049), (I-302)+(1.073)+(2.050), (I-302)+(1.073)+(2.051), (I-302)+(1.073)+(2.052), (I-302)+(1.073)+(2.053), (I-302)+(1.073)+(2.054), (I-302)+(1.073)+(2.055), (I-302)+(1.073)+(2.056), (I-302)+(1.073)+(2.057), (I-302)+(1.073)+(2.058), (I-302)+(1.073)+(2.059), (I-302)+(1.073)+(3.001), (I-302)+(1.073)+(3.002), (I-302)+(1.073)+(3.003), (I-302)+(1.073)+(3.004), (I-302)+(1.073)+(3.005), (I-302)+(1.073)+(3.006), (I-302)+(1.073)+(3.007), (I-302)+(1.073)+(3.008), (I-302)+(1.073)+(3.009), (I-302)+(1.073)+(3.010), (I-302)+(1.073)+(3.011), (I-302)+(1.073)+(3.012), (I-302)+(1.073)+(3.013), (I-302)+(1.073)+(3.014), (I-302)+(1.073)+(3.015), (I-302)+(1.073)+(3.016), (I-302)+(1.073)+(3.017), (I-302)+(1.073)+(3.018), (I-302)+(1.073)+(3.019), (I-302)+(1.073)+(3.020), (I-302)+(1.073)+(3.021), (I-302)+(1.073)+(3.022), (I-302)+(1.073)+(3.023), (I-302)+(1.073)+(3.024), (I-302)+(1.073)+(3.025), (I-302)+(1.073)+(3.026), (I-302)+(1.073)+(3.027), (I-302)+(1.073)+(3.028), (I-302)+(1.073)+(3.029), (I-302)+(1.073)+(3.030), (I-302)+(1.073)+(3.031), (I-302)+(1.073)+(5.001), (I-302)+(1.073)+(5.002), (I-302)+(1.073)+(5.003), (I-302)+(1.073)+(5.004), (I-302)+(1.073)+(5.005), (I-302)+(1.073)+(5.006), (I-302)+(1.073)+(5.007), (I-302)+(1.073)+(5.008), (I-302)+(1.073)+(5.009), (I-302)+(1.073)+(5.010), (I-302)+(1.073)+(5.011), (I-302)+(1.073)+(5.012), (I-302)+(1.073)+(5.013), (I-302)+(1.073)+(5.014), (I-302)+(1.073)+(5.015), (I-302)+(1.073)+(5.016), (I-302)+(1.073)+(5.017), (I-302)+(1.073)+(5.018), (I-302)+(1.073)+(5.019), (I-302)+(1.073)+(5.020), (I-302)+(1.073)+(5.021), (I-302)+(1.073)+(5.022), (I-302)+(1.073)+(5.023), (I-302)+(1.073)+(6.001), (I-302)+(1.073)+(6.002), (I-302)+(1.073)+(6.003), (I-302)+(1.073)+(6.004), (I-302)+(1.073)+(7.001), (I-302)+(1.073)+(7.002), (I-302)+(1.073)+(7.003), (I-302)+(1.073)+(7.004), (I-302)+(1.073)+(7.005), (I-302)+(1.073)+(7.006), (I-302)+(1.073)+(9.001), (I-302)+(1.073)+(9.002), (I-302)+(1.073)+(9.003), (I-302)+(1.073)+(9.004), (I-302)+(1.073)+(9.005), (I-302)+(1.073)+(9.006), (I-302)+(1.073)+(9.007), (I-302)+(1.073)+(9.008), (I-302)+(1.073)+(9.009), (I-302)+(1.073)+(14.001), (I-302)+(1.073)+(14.002), (I-302)+(1.073)+(15.008), (I-302)+(1.073)+(15.011), (I-302)+(1.073)+(15.012), (I-302)+(1.073)+(15.016), (I-302)+(1.073)+(15.025), (I-302)+(1.073)+(15.027), (I-302)+(1.073)+(15.047), (I-302)+(1.073)+(15.063), (I-302)+(1.073)+(15.064), (I-302)+(1.073)+(16.001), (I-302)+(1.073)+(16.002), (I-302)+(1.073)+(16.003), (I-302)+(1.073)+(16.004), (I-302)+(1.073)+(16.005), (I-302)+(1.073)+(16.006), (I-302)+(1.073)+(16.007), (I-302)+(1.073)+(16.008), (I-302)+(1.073)+(17.001), (I-302)+(1.073)+(17.002), (I-302)+(1.073)+(17.003), (I-302)+(1.073)+(17.004), (I-302)+(1.073)+(17.005), (I-302)+(1.073)+(17.006), (I-302)+(1.073)+(17.007), (I-302)+(1.073)+(17.008), (I-302)+(1.073)+(17.009), (I-302)+(1.073)+(17.010), (I-302)+(1.073)+(17.011), (I-302)+(1.073)+(17.012), (I-302)+(1.073)+(18.001), (I-302)+(1.074)+(1.075), (I-302)+(1.074)+(1.076), (I-302)+(1.074)+(1.077), (I-302)+(1.074)+(1.078), (I-302)+(1.074)+(1.079), (I-302)+(1.074)+(1.080), (I-302)+(1.074)+(1.081), (I-302)+(1.074)+(1.082), (I-302)+(1.074)+(1.083), (I-302)+(1.074)+(1.084), (I-302)+(1.074)+(1.085), (I-302)+(1.074)+(1.086), (I-302)+(1.074)+(1.087), (I-302)+(1.074)+(1.088), (I-302)+(1.074)+(1.089), (I-302)+(1.074)+(1.090), (I-302)+(1.074)+(1.091), (I-302)+(1.074)+(1.092), (I-302)+(1.074)+(2.001), (I-302)+(1.074)+(2.002), (I-302)+(1.074)+(2.003), (I-302)+(1.074)+(2.004), (I-302)+(1.074)+(2.005), (I-302)+(1.074)+(2.006), (I-302)+(1.074)+(2.007), (I-302)+(1.074)+(2.008), (I-302)+(1.074)+(2.009), (I-302)+(1.074)+(2.010), (I-302)+(1.074)+(2.011), (I-302)+(1.074)+(2.012), (I-302)+(1.074)+(2.013), (I-302)+(1.074)+(2.014), (I-302)+(1.074)+(2.015), (I-302)+(1.074)+(2.016), (I-302)+(1.074)+(2.017), (I-302)+(1.074)+(2.018), (I-302)+(1.074)+(2.019), (I-302)+(1.074)+(2.020), (I-302)+(1.074)+(2.021), (I-302)+(1.074)+(2.022), (I-302)+(1.074)+(2.023), (I-302)+(1.074)+(2.024), (I-302)+(1.074)+(2.025), (I-302)+(1.074)+(2.026), (I-302)+(1.074)+(2.027), (I-302)+(1.074)+(2.028), (I-302)+(1.074)+(2.029), (I-302)+(1.074)+(2.030), (I-302)+(1.074)+(2.031), (I-302)+(1.074)+(2.032), (I-302)+(1.074)+(2.033), (I-302)+(1.074)+(2.034), (I-302)+(1.074)+(2.035), (I-302)+(1.074)+(2.036), (I-302)+(1.074)+(2.037), (I-302)+(1.074)+(2.038), (I-302)+(1.074)+(2.039), (I-302)+(1.074)+(2.040), (I-302)+(1.074)+(2.041), (I-302)+(1.074)+(2.042), (I-302)+(1.074)+(2.043), (I-302)+(1.074)+(2.044), (I-302)+(1.074)+(2.045), (I-302)+(1.074)+(2.046), (I-302)+(1.074)+(2.047), (I-302)+(1.074)+(2.048), (I-302)+(1.074)+(2.049), (I-302)+(1.074)+(2.050), (I-302)+(1.074)+(2.051), (I-302)+(1.074)+(2.052), (I-302)+(1.074)+(2.053), (I-302)+(1.074)+(2.054), (I-302)+(1.074)+(2.055), (I-302)+(1.074)+(2.056), (I-302)+(1.074)+(2.057), (I-302)+(1.074)+(2.058), (I-302)+(1.074)+(2.059), (I-302)+(1.074)+(3.001), (I-302)+(1.074)+(3.002), (I-302)+(1.074)+(3.003), (I-302)+(1.074)+(3.004), (I-302)+(1.074)+(3.005), (I-302)+(1.074)+(3.006), (I-302)+(1.074)+(3.007), (I-302)+(1.074)+(3.008), (I-302)+(1.074)+(3.009), (I-302)+(1.074)+(3.010), (I-302)+(1.074)+(3.011), (I-302)+(1.074)+(3.012), (I-302)+(1.074)+(3.013), (I-302)+(1.074)+(3.014), (I-302)+(1.074)+(3.015), (I-302)+(1.074)+(3.016), (I-302)+(1.074)+(3.017), (I-302)+(1.074)+(3.018), (I-302)+(1.074)+(3.019), (I-302)+(1.074)+(3.020), (I-302)+(1.074)+(3.021), (I-302)+(1.074)+(3.022), (I-302)+(1.074)+(3.023), (I-302)+(1.074)+(3.024), (I-302)+(1.074)+(3.025), (I-302)+(1.074)+(3.026), (I-302)+(1.074)+(3.027), (I-302)+(1.074)+(3.028), (I-302)+(1.074)+(3.029), (I-302)+(1.074)+(3.030), (I-302)+(1.074)+(3.031), (I-302)+(1.074)+(5.001), (I-302)+(1.074)+(5.002), (I-302)+(1.074)+(5.003), (I-302)+(1.074)+(5.004), (I-302)+(1.074)+(5.005), (I-302)+(1.074)+(5.006), (I-302)+(1.074)+(5.007), (I-302)+(1.074)+(5.008), (I-302)+(1.074)+(5.009), (I-302)+(1.074)+(5.010), (I-302)+(1.074)+(5.011), (I-302)+(1.074)+(5.012), (I-302)+(1.074)+(5.013), (I-302)+(1.074)+(5.014), (I-302)+(1.074)+(5.015), (I-302)+(1.074)+(5.016), (I-302)+(1.074)+(5.017), (I-302)+(1.074)+(5.018), (I-302)+(1.074)+(5.019), (I-302)+(1.074)+(5.020), (I-302)+(1.074)+(5.021), (I-302)+(1.074)+(5.022), (I-302)+(1.074)+(5.023), (I-302)+(1.074)+(6.001), (I-302)+(1.074)+(6.002), (I-302)+(1.074)+(6.003), (I-302)+(1.074)+(6.004), (I-302)+(1.074)+(7.001), (I-302)+(1.074)+(7.002), (I-302)+(1.074)+(7.003), (I-302)+(1.074)+(7.004), (I-302)+(1.074)+(7.005), (I-302)+(1.074)+(7.006), (I-302)+(1.074)+(9.001), (I-302)+(1.074)+(9.002), (I-302)+(1.074)+(9.003), (I-302)+(1.074)+(9.004), (I-302)+(1.074)+(9.005), (I-302)+(1.074)+(9.006), (I-302)+(1.074)+(9.007), (I-302)+(1.074)+(9.008), (I-302)+(1.074)+(9.009), (I-302)+(1.074)+(14.001), (I-302)+(1.074)+(14.002), (I-302)+(1.074)+(15.008), (I-302)+(1.074)+(15.011), (I-302)+(1.074)+(15.012), (I-302)+(1.074)+(15.016), (I-302)+(1.074)+(15.025), (I-302)+(1.074)+(15.027), (I-302)+(1.074)+(15.047), (I-302)+(1.074)+(15.063), (I-302)+(1.074)+(15.064), (I-302)+(1.074)+(16.001), (I-302)+(1.074)+(16.002), (I-302)+(1.074)+(16.003), (I-302)+(1.074)+(16.004), (I-302)+(1.074)+(16.005), (I-302)+(1.074)+(16.006), (I-302)+(1.074)+(16.007), (I-302)+(1.074)+(16.008), (I-302)+(1.074)+(17.001), (I-302)+(1.074)+(17.002), (I-302)+(1.074)+(17.003), (I-302)+(1.074)+(17.004), (I-302)+(1.074)+(17.005), (I-302)+(1.074)+(17.006), (I-302)+(1.074)+(17.007), (I-302)+(1.074)+(17.008), (I-302)+(1.074)+(17.009), (I-302)+(1.074)+(17.010), (I-302)+(1.074)+(17.011), (I-302)+(1.074)+(17.012), (I-302)+(1.074)+(18.001), (I-302)+(1.075)+(1.076), (I-302)+(1.075)+(1.077), (I-302)+(1.075)+(1.078), (I-302)+(1.075)+(1.079), (I-302)+(1.075)+(1.080), (I-302)+(1.075)+(1.081), (I-302)+(1.075)+(1.082), (I-302)+(1.075)+(1.083), (I-302)+(1.075)+(1.084), (I-302)+(1.075)+(1.085), (I-302)+(1.075)+(1.086), (I-302)+(1.075)+(1.087), (I-302)+(1.075)+(1.088), (I-302)+(1.075)+(1.089), (I-302)+(1.075)+(1.090), (I-302)+(1.075)+(1.091), (I-302)+(1.075)+(1.092), (I-302)+(1.075)+(2.001), (I-302)+(1.075)+(2.002), (I-302)+(1.075)+(2.003), (I-302)+(1.075)+(2.004), (I-302)+(1.075)+(2.005), (I-302)+(1.075)+(2.006), (I-302)+(1.075)+(2.007), (I-302)+(1.075)+(2.008), (I-302)+(1.075)+(2.009), (I-302)+(1.075)+(2.010), (I-302)+(1.075)+(2.011), (I-302)+(1.075)+(2.012), (I-302)+(1.075)+(2.013), (I-302)+(1.075)+(2.014), (I-302)+(1.075)+(2.015), (I-302)+(1.075)+(2.016), (I-302)+(1.075)+(2.017), (I-302)+(1.075)+(2.018), (I-302)+(1.075)+(2.019), (I-302)+(1.075)+(2.020), (I-302)+(1.075)+(2.021), (I-302)+(1.075)+(2.022), (I-302)+(1.075)+(2.023), (I-302)+(1.075)+(2.024), (I-302)+(1.075)+(2.025), (I-302)+(1.075)+(2.026), (I-302)+(1.075)+(2.027), (I-302)+(1.075)+(2.028), (I-302)+(1.075)+(2.029), (I-302)+(1.075)+(2.030), (I-302)+(1.075)+(2.031), (I-302)+(1.075)+(2.032), (I-302)+(1.075)+(2.033), (I-302)+(1.075)+(2.034), (I-302)+(1.075)+(2.035), (I-302)+(1.075)+(2.036), (I-302)+(1.075)+(2.037), (I-302)+(1.075)+(2.038), (I-302)+(1.075)+(2.039), (I-302)+(1.075)+(2.040), (I-302)+(1.075)+(2.041), (I-302)+(1.075)+(2.042), (I-302)+(1.075)+(2.043), (I-302)+(1.075)+(2.044), (I-302)+(1.075)+(2.045), (I-302)+(1.075)+(2.046), (I-302)+(1.075)+(2.047), (I-302)+(1.075)+(2.048), (I-302)+(1.075)+(2.049), (I-302)+(1.075)+(2.050), (I-302)+(1.075)+(2.051), (I-302)+(1.075)+(2.052), (I-302)+(1.075)+(2.053), (I-302)+(1.075)+(2.054), (I-302)+(1.075)+(2.055), (I-302)+(1.075)+(2.056), (I-302)+(1.075)+(2.057), (I-302)+(1.075)+(2.058), (I-302)+(1.075)+(2.059), (I-302)+(1.075)+(3.001), (I-302)+(1.075)+(3.002), (I-302)+(1.075)+(3.003), (I-302)+(1.075)+(3.004), (I-302)+(1.075)+(3.005), (I-302)+(1.075)+(3.006), (I-302)+(1.075)+(3.007), (I-302)+(1.075)+(3.008), (I-302)+(1.075)+(3.009), (I-302)+(1.075)+(3.010), (I-302)+(1.075)+(3.011), (I-302)+(1.075)+(3.012), (I-302)+(1.075)+(3.013), (I-302)+(1.075)+(3.014), (I-302)+(1.075)+(3.015), (I-302)+(1.075)+(3.016), (I-302)+(1.075)+(3.017), (I-302)+(1.075)+(3.018), (I-302)+(1.075)+(3.019), (I-302)+(1.075)+(3.020), (I-302)+(1.075)+(3.021), (I-302)+(1.075)+(3.022), (I-302)+(1.075)+(3.023), (I-302)+(1.075)+(3.024), (I-302)+(1.075)+(3.025), (I-302)+(1.075)+(3.026), (I-302)+(1.075)+(3.027), (I-302)+(1.075)+(3.028), (I-302)+(1.075)+(3.029), (I-302)+(1.075)+(3.030), (I-302)+(1.075)+(3.031), (I-302)+(1.075)+(5.001), (I-302)+(1.075)+(5.002), (I-302)+(1.075)+(5.003), (I-302)+(1.075)+(5.004), (I-302)+(1.075)+(5.005), (I-302)+(1.075)+(5.006), (I-302)+(1.075)+(5.007), (I-302)+(1.075)+(5.008), (I-302)+(1.075)+(5.009), (I-302)+(1.075)+(5.010), (I-302)+(1.075)+(5.011), (I-302)+(1.075)+(5.012), (I-302)+(1.075)+(5.013), (I-302)+(1.075)+(5.014), (I-302)+(1.075)+(5.015), (I-302)+(1.075)+(5.016), (I-302)+(1.075)+(5.017), (I-302)+(1.075)+(5.018), (I-302)+(1.075)+(5.019), (I-302)+(1.075)+(5.020), (I-302)+(1.075)+(5.021), (I-302)+(1.075)+(5.022), (I-302)+(1.075)+(5.023), (I-302)+(1.075)+(6.001), (I-302)+(1.075)+(6.002), (I-302)+(1.075)+(6.003), (I-302)+(1.075)+(6.004), (I-302)+(1.075)+(7.001), (I-302)+(1.075)+(7.002), (I-302)+(1.075)+(7.003), (I-302)+(1.075)+(7.004), (I-302)+(1.075)+(7.005), (I-302)+(1.075)+(7.006), (I-302)+(1.075)+(9.001), (I-302)+(1.075)+(9.002), (I-302)+(1.075)+(9.003), (I-302)+(1.075)+(9.004), (I-302)+(1.075)+(9.005), (I-302)+(1.075)+(9.006), (I-302)+(1.075)+(9.007), (I-302)+(1.075)+(9.008), (I-302)+(1.075)+(9.009), (I-302)+(1.075)+(14.001), (I-302)+(1.075)+(14.002), (I-302)+(1.075)+(15.008), (I-302)+(1.075)+(15.011), (I-302)+(1.075)+(15.012), (I-302)+(1.075)+(15.016), (I-302)+(1.075)+(15.025), (I-302)+(1.075)+(15.027), (I-302)+(1.075)+(15.047), (I-302)+(1.075)+(15.063), (I-302)+(1.075)+(15.064), (I-302)+(1.075)+(16.001), (I-302)+(1.075)+(16.002), (I-302)+(1.075)+(16.003), (I-302)+(1.075)+(16.004), (I-302)+(1.075)+(16.005), (I-302)+(1.075)+(16.006), (I-302)+(1.075)+(16.007), (I-302)+(1.075)+(16.008), (I-302)+(1.075)+(17.001), (I-302)+(1.075)+(17.002), (I-302)+(1.075)+(17.003), (I-302)+(1.075)+(17.004), (I-302)+(1.075)+(17.005), (I-302)+(1.075)+(17.006), (I-302)+(1.075)+(17.007), (I-302)+(1.075)+(17.008), (I-302)+(1.075)+(17.009), (I-302)+(1.075)+(17.010), (I-302)+(1.075)+(17.011), (I-302)+(1.075)+(17.012), (I-302)+(1.075)+(18.001), (I-302)+(1.076)+(1.077), (I-302)+(1.076)+(1.078), (I-302)+(1.076)+(1.079), (I-302)+(1.076)+(1.080), (I-302)+(1.076)+(1.081), (I-302)+(1.076)+(1.082), (I-302)+(1.076)+(1.083), (I-302)+(1.076)+(1.084), (I-302)+(1.076)+(1.085), (I-302)+(1.076)+(1.086), (I-302)+(1.076)+(1.087), (I-302)+(1.076)+(1.088), (I-302)+(1.076)+(1.089), (I-302)+(1.076)+(1.090), (I-302)+(1.076)+(1.091), (I-302)+(1.076)+(1.092), (I-302)+(1.076)+(2.001), (I-302)+(1.076)+(2.002), (I-302)+(1.076)+(2.003), (I-302)+(1.076)+(2.004), (I-302)+(1.076)+(2.005), (I-302)+(1.076)+(2.006), (I-302)+(1.076)+(2.007), (I-302)+(1.076)+(2.008), (I-302)+(1.076)+(2.009), (I-302)+(1.076)+(2.010), (I-302)+(1.076)+(2.011), (I-302)+(1.076)+(2.012), (I-302)+(1.076)+(2.013), (I-302)+(1.076)+(2.014), (I-302)+(1.076)+(2.015), (I-302)+(1.076)+(2.016), (I-302)+(1.076)+(2.017), (I-302)+(1.076)+(2.018), (I-302)+(1.076)+(2.019), (I-302)+(1.076)+(2.020), (I-302)+(1.076)+(2.021), (I-302)+(1.076)+(2.022), (I-302)+(1.076)+(2.023), (I-302)+(1.076)+(2.024), (I-302)+(1.076)+(2.025), (I-302)+(1.076)+(2.026), (I-302)+(1.076)+(2.027), (I-302)+(1.076)+(2.028), (I-302)+(1.076)+(2.029), (I-302)+(1.076)+(2.030), (I-302)+(1.076)+(2.031), (I-302)+(1.076)+(2.032), (I-302)+(1.076)+(2.033), (I-302)+(1.076)+(2.034), (I-302)+(1.076)+(2.035), (I-302)+(1.076)+(2.036), (I-302)+(1.076)+(2.037), (I-302)+(1.076)+(2.038), (I-302)+(1.076)+(2.039), (I-302)+(1.076)+(2.040), (I-302)+(1.076)+(2.041), (I-302)+(1.076)+(2.042), (I-302)+(1.076)+(2.043), (I-302)+(1.076)+(2.044), (I-302)+(1.076)+(2.045), (I-302)+(1.076)+(2.046), (I-302)+(1.076)+(2.047), (I-302)+(1.076)+(2.048), (I-302)+(1.076)+(2.049), (I-302)+(1.076)+(2.050), (I-302)+(1.076)+(2.051), (I-302)+(1.076)+(2.052), (I-302)+(1.076)+(2.053), (I-302)+(1.076)+(2.054), (I-302)+(1.076)+(2.055), (I-302)+(1.076)+(2.056), (I-302)+(1.076)+(2.057), (I-302)+(1.076)+(2.058), (I-302)+(1.076)+(2.059), (I-302)+(1.076)+(3.001), (I-302)+(1.076)+(3.002), (I-302)+(1.076)+(3.003), (I-302)+(1.076)+(3.004), (I-302)+(1.076)+(3.005), (I-302)+(1.076)+(3.006), (I-302)+(1.076)+(3.007), (I-302)+(1.076)+(3.008), (I-302)+(1.076)+(3.009), (I-302)+(1.076)+(3.010), (I-302)+(1.076)+(3.011), (I-302)+(1.076)+(3.012), (I-302)+(1.076)+(3.013), (I-302)+(1.076)+(3.014), (I-302)+(1.076)+(3.015), (I-302)+(1.076)+(3.016), (I-302)+(1.076)+(3.017), (I-302)+(1.076)+(3.018), (I-302)+(1.076)+(3.019), (I-302)+(1.076)+(3.020), (I-302)+(1.076)+(3.021), (I-302)+(1.076)+(3.022), (I-302)+(1.076)+(3.023), (I-302)+(1.076)+(3.024), (I-302)+(1.076)+(3.025), (I-302)+(1.076)+(3.026), (I-302)+(1.076)+(3.027), (I-302)+(1.076)+(3.028), (I-302)+(1.076)+(3.029), (I-302)+(1.076)+(3.030), (I-302)+(1.076)+(3.031), (I-302)+(1.076)+(5.001), (I-302)+(1.076)+(5.002), (I-302)+(1.076)+(5.003), (I-302)+(1.076)+(5.004), (I-302)+(1.076)+(5.005), (I-302)+(1.076)+(5.006), (I-302)+(1.076)+(5.007), (I-302)+(1.076)+(5.008), (I-302)+(1.076)+(5.009), (I-302)+(1.076)+(5.010), (I-302)+(1.076)+(5.011), (I-302)+(1.076)+(5.012), (I-302)+(1.076)+(5.013), (I-302)+(1.076)+(5.014), (I-302)+(1.076)+(5.015), (I-302)+(1.076)+(5.016), (I-302)+(1.076)+(5.017), (I-302)+(1.076)+(5.018), (I-302)+(1.076)+(5.019), (I-302)+(1.076)+(5.020), (I-302)+(1.076)+(5.021), (I-302)+(1.076)+(5.022), (I-302)+(1.076)+(5.023), (I-302)+(1.076)+(6.001), (I-302)+(1.076)+(6.002), (I-302)+(1.076)+(6.003), (I-302)+(1.076)+(6.004), (I-302)+(1.076)+(7.001), (I-302)+(1.076)+(7.002), (I-302)+(1.076)+(7.003), (I-302)+(1.076)+(7.004), (I-302)+(1.076)+(7.005), (I-302)+(1.076)+(7.006), (I-302)+(1.076)+(9.001), (I-302)+(1.076)+(9.002), (I-302)+(1.076)+(9.003), (I-302)+(1.076)+(9.004), (I-302)+(1.076)+(9.005), (I-302)+(1.076)+(9.006), (I-302)+(1.076)+(9.007), (I-302)+(1.076)+(9.008), (I-302)+(1.076)+(9.009), (I-302)+(1.076)+(14.001), (I-302)+(1.076)+(14.002), (I-302)+(1.076)+(15.008), (I-302)+(1.076)+(15.011), (I-302)+(1.076)+(15.012), (I-302)+(1.076)+(15.016), (I-302)+(1.076)+(15.025), (I-302)+(1.076)+(15.027), (I-302)+(1.076)+(15.047), (I-302)+(1.076)+(15.063), (I-302)+(1.076)+(15.064), (I-302)+(1.076)+(16.001), (I-302)+(1.076)+(16.002), (I-302)+(1.076)+(16.003), (I-302)+(1.076)+(16.004), (I-302)+(1.076)+(16.005), (I-302)+(1.076)+(16.006), (I-302)+(1.076)+(16.007), (I-302)+(1.076)+(16.008), (I-302)+(1.076)+(17.001), (I-302)+(1.076)+(17.002), (I-302)+(1.076)+(17.003), (I-302)+(1.076)+(17.004), (I-302)+(1.076)+(17.005), (I-302)+(1.076)+(17.006), (I-302)+(1.076)+(17.007), (I-302)+(1.076)+(17.008), (I-302)+(1.076)+(17.009), (I-302)+(1.076)+(17.010), (I-302)+(1.076)+(17.011), (I-302)+(1.076)+(17.012), (I-302)+(1.076)+(18.001), (I-302)+(1.077)+(1.078), (I-302)+(1.077)+(1.079), (I-302)+(1.077)+(1.080), (I-302)+(1.077)+(1.081), (I-302)+(1.077)+(1.082), (I-302)+(1.077)+(1.083), (I-302)+(1.077)+(1.084), (I-302)+(1.077)+(1.085), (I-302)+(1.077)+(1.086), (I-302)+(1.077)+(1.087), (I-302)+(1.077)+(1.088), (I-302)+(1.077)+(1.089), (I-302)+(1.077)+(1.090), (I-302)+(1.077)+(1.091), (I-302)+(1.077)+(1.092), (I-302)+(1.077)+(2.001), (I-302)+(1.077)+(2.002), (I-302)+(1.077)+(2.003), (I-302)+(1.077)+(2.004), (I-302)+(1.077)+(2.005), (I-302)+(1.077)+(2.006), (I-302)+(1.077)+(2.007), (I-302)+(1.077)+(2.008), (I-302)+(1.077)+(2.009), (I-302)+(1.077)+(2.010), (I-302)+(1.077)+(2.011), (I-302)+(1.077)+(2.012), (I-302)+(1.077)+(2.013), (I-302)+(1.077)+(2.014), (I-302)+(1.077)+(2.015), (I-302)+(1.077)+(2.016), (I-302)+(1.077)+(2.017), (I-302)+(1.077)+(2.018), (I-302)+(1.077)+(2.019), (I-302)+(1.077)+(2.020), (I-302)+(1.077)+(2.021), (I-302)+(1.077)+(2.022), (I-302)+(1.077)+(2.023), (I-302)+(1.077)+(2.024), (I-302)+(1.077)+(2.025), (I-302)+(1.077)+(2.026), (I-302)+(1.077)+(2.027), (I-302)+(1.077)+(2.028), (I-302)+(1.077)+(2.029), (I-302)+(1.077)+(2.030), (I-302)+(1.077)+(2.031), (I-302)+(1.077)+(2.032), (I-302)+(1.077)+(2.033), (I-302)+(1.077)+(2.034), (I-302)+(1.077)+(2.035), (I-302)+(1.077)+(2.036), (I-302)+(1.077)+(2.037), (I-302)+(1.077)+(2.038), (I-302)+(1.077)+(2.039), (I-302)+(1.077)+(2.040), (I-302)+(1.077)+(2.041), (I-302)+(1.077)+(2.042), (I-302)+(1.077)+(2.043), (I-302)+(1.077)+(2.044), (I-302)+(1.077)+(2.045), (I-302)+(1.077)+(2.046), (I-302)+(1.077)+(2.047), (I-302)+(1.077)+(2.048), (I-302)+(1.077)+(2.049), (I-302)+(1.077)+(2.050), (I-302)+(1.077)+(2.051), (I-302)+(1.077)+(2.052), (I-302)+(1.077)+(2.053), (I-302)+(1.077)+(2.054), (I-302)+(1.077)+(2.055), (I-302)+(1.077)+(2.056), (I-302)+(1.077)+(2.057), (I-302)+(1.077)+(2.058), (I-302)+(1.077)+(2.059), (I-302)+(1.077)+(3.001), (I-302)+(1.077)+(3.002), (I-302)+(1.077)+(3.003), (I-302)+(1.077)+(3.004), (I-302)+(1.077)+(3.005), (I-302)+(1.077)+(3.006), (I-302)+(1.077)+(3.007), (I-302)+(1.077)+(3.008), (I-302)+(1.077)+(3.009), (I-302)+(1.077)+(3.010), (I-302)+(1.077)+(3.011), (I-302)+(1.077)+(3.012), (I-302)+(1.077)+(3.013), (I-302)+(1.077)+(3.014), (I-302)+(1.077)+(3.015), (I-302)+(1.077)+(3.016), (I-302)+(1.077)+(3.017), (I-302)+(1.077)+(3.018), (I-302)+(1.077)+(3.019), (I-302)+(1.077)+(3.020), (I-302)+(1.077)+(3.021), (I-302)+(1.077)+(3.022), (I-302)+(1.077)+(3.023), (I-302)+(1.077)+(3.024), (I-302)+(1.077)+(3.025), (I-302)+(1.077)+(3.026), (I-302)+(1.077)+(3.027), (I-302)+(1.077)+(3.028), (I-302)+(1.077)+(3.029), (I-302)+(1.077)+(3.030), (I-302)+(1.077)+(3.031), (I-302)+(1.077)+(5.001), (I-302)+(1.077)+(5.002), (I-302)+(1.077)+(5.003), (I-302)+(1.077)+(5.004), (I-302)+(1.077)+(5.005), (I-302)+(1.077)+(5.006), (I-302)+(1.077)+(5.007), (I-302)+(1.077)+(5.008), (I-302)+(1.077)+(5.009), (I-302)+(1.077)+(5.010), (I-302)+(1.077)+(5.011), (I-302)+(1.077)+(5.012), (I-302)+(1.077)+(5.013), (I-302)+(1.077)+(5.014), (I-302)+(1.077)+(5.015), (I-302)+(1.077)+(5.016), (I-302)+(1.077)+(5.017), (I-302)+(1.077)+(5.018), (I-302)+(1.077)+(5.019), (I-302)+(1.077)+(5.020), (I-302)+(1.077)+(5.021), (I-302)+(1.077)+(5.022), (I-302)+(1.077)+(5.023), (I-302)+(1.077)+(6.001), (I-302)+(1.077)+(6.002), (I-302)+(1.077)+(6.003), (I-302)+(1.077)+(6.004), (I-302)+(1.077)+(7.001), (I-302)+(1.077)+(7.002), (I-302)+(1.077)+(7.003), (I-302)+(1.077)+(7.004), (I-302)+(1.077)+(7.005), (I-302)+(1.077)+(7.006), (I-302)+(1.077)+(9.001), (I-302)+(1.077)+(9.002), (I-302)+(1.077)+(9.003), (I-302)+(1.077)+(9.004), (I-302)+(1.077)+(9.005), (I-302)+(1.077)+(9.006), (I-302)+(1.077)+(9.007), (I-302)+(1.077)+(9.008), (I-302)+(1.077)+(9.009), (I-302)+(1.077)+(14.001), (I-302)+(1.077)+(14.002), (I-302)+(1.077)+(15.008), (I-302)+(1.077)+(15.011), (I-302)+(1.077)+(15.012), (I-302)+(1.077)+(15.016), (I-302)+(1.077)+(15.025), (I-302)+(1.077)+(15.027), (I-302)+(1.077)+(15.047), (I-302)+(1.077)+(15.063), (I-302)+(1.077)+(15.064), (I-302)+(1.077)+(16.001), (I-302)+(1.077)+(16.002), (I-302)+(1.077)+(16.003), (I-302)+(1.077)+(16.004), (I-302)+(1.077)+(16.005), (I-302)+(1.077)+(16.006), (I-302)+(1.077)+(16.007), (I-302)+(1.077)+(16.008), (I-302)+(1.077)+(17.001), (I-302)+(1.077)+(17.002), (I-302)+(1.077)+(17.003), (I-302)+(1.077)+(17.004), (I-302)+(1.077)+(17.005), (I-302)+(1.077)+(17.006), (I-302)+(1.077)+(17.007), (I-302)+(1.077)+(17.008), (I-302)+(1.077)+(17.009), (I-302)+(1.077)+(17.010), (I-302)+(1.077)+(17.011), (I-302)+(1.077)+(17.012), (I-302)+(1.077)+(18.001), (I-302)+(1.078)+(1.079), (I-302)+(1.078)+(1.080), (I-302)+(1.078)+(1.081), (I-302)+(1.078)+(1.082), (I-302)+(1.078)+(1.083), (I-302)+(1.078)+(1.084), (I-302)+(1.078)+(1.085), (I-302)+(1.078)+(1.086), (I-302)+(1.078)+(1.087), (I-302)+(1.078)+(1.088), (I-302)+(1.078)+(1.089), (I-302)+(1.078)+(1.090), (I-302)+(1.078)+(1.091), (I-302)+(1.078)+(1.092), (I-302)+(1.078)+(2.001), (I-302)+(1.078)+(2.002), (I-302)+(1.078)+(2.003), (I-302)+(1.078)+(2.004), (I-302)+(1.078)+(2.005), (I-302)+(1.078)+(2.006), (I-302)+(1.078)+(2.007), (I-302)+(1.078)+(2.008), (I-302)+(1.078)+(2.009), (I-302)+(1.078)+(2.010), (I-302)+(1.078)+(2.011), (I-302)+(1.078)+(2.012), (I-302)+(1.078)+(2.013), (I-302)+(1.078)+(2.014), (I-302)+(1.078)+(2.015), (I-302)+(1.078)+(2.016), (I-302)+(1.078)+(2.017), (I-302)+(1.078)+(2.018), (I-302)+(1.078)+(2.019), (I-302)+(1.078)+(2.020), (I-302)+(1.078)+(2.021), (I-302)+(1.078)+(2.022), (I-302)+(1.078)+(2.023), (I-302)+(1.078)+(2.024), (I-302)+(1.078)+(2.025), (I-302)+(1.078)+(2.026), (I-302)+(1.078)+(2.027), (I-302)+(1.078)+(2.028), (I-302)+(1.078)+(2.029), (I-302)+(1.078)+(2.030), (I-302)+(1.078)+(2.031), (I-302)+(1.078)+(2.032), (I-302)+(1.078)+(2.033), (I-302)+(1.078)+(2.034), (I-302)+(1.078)+(2.035), (I-302)+(1.078)+(2.036), (I-302)+(1.078)+(2.037), (I-302)+(1.078)+(2.038), (I-302)+(1.078)+(2.039), (I-302)+(1.078)+(2.040), (I-302)+(1.078)+(2.041), (I-302)+(1.078)+(2.042), (I-302)+(1.078)+(2.043), (I-302)+(1.078)+(2.044), (I-302)+(1.078)+(2.045), (I-302)+(1.078)+(2.046), (I-302)+(1.078)+(2.047), (I-302)+(1.078)+(2.048), (I-302)+(1.078)+(2.049), (I-302)+(1.078)+(2.050), (I-302)+(1.078)+(2.051), (I-302)+(1.078)+(2.052), (I-302)+(1.078)+(2.053), (I-302)+(1.078)+(2.054), (I-302)+(1.078)+(2.055), (I-302)+(1.078)+(2.056), (I-302)+(1.078)+(2.057), (I-302)+(1.078)+(2.058), (I-302)+(1.078)+(2.059), (I-302)+(1.078)+(3.001), (I-302)+(1.078)+(3.002), (I-302)+(1.078)+(3.003), (I-302)+(1.078)+(3.004), (I-302)+(1.078)+(3.005), (I-302)+(1.078)+(3.006), (I-302)+(1.078)+(3.007), (I-302)+(1.078)+(3.008), (I-302)+(1.078)+(3.009), (I-302)+(1.078)+(3.010), (I-302)+(1.078)+(3.011), (I-302)+(1.078)+(3.012), (I-302)+(1.078)+(3.013), (I-302)+(1.078)+(3.014), (I-302)+(1.078)+(3.015), (I-302)+(1.078)+(3.016), (I-302)+(1.078)+(3.017), (I-302)+(1.078)+(3.018), (I-302)+(1.078)+(3.019), (I-302)+(1.078)+(3.020), (I-302)+(1.078)+(3.021), (I-302)+(1.078)+(3.022), (I-302)+(1.078)+(3.023), (I-302)+(1.078)+(3.024), (I-302)+(1.078)+(3.025), (I-302)+(1.078)+(3.026), (I-302)+(1.078)+(3.027), (I-302)+(1.078)+(3.028), (I-302)+(1.078)+(3.029), (I-302)+(1.078)+(3.030), (I-302)+(1.078)+(3.031), (I-302)+(1.078)+(5.001), (I-302)+(1.078)+(5.002), (I-302)+(1.078)+(5.003), (I-302)+(1.078)+(5.004), (I-302)+(1.078)+(5.005), (I-302)+(1.078)+(5.006), (I-302)+(1.078)+(5.007), (I-302)+(1.078)+(5.008), (I-302)+(1.078)+(5.009), (I-302)+(1.078)+(5.010), (I-302)+(1.078)+(5.011), (I-302)+(1.078)+(5.012), (I-302)+(1.078)+(5.013), (I-302)+(1.078)+(5.014), (I-302)+(1.078)+(5.015), (I-302)+(1.078)+(5.016), (I-302)+(1.078)+(5.017), (I-302)+(1.078)+(5.018), (I-302)+(1.078)+(5.019), (I-302)+(1.078)+(5.020), (I-302)+(1.078)+(5.021), (I-302)+(1.078)+(5.022), (I-302)+(1.078)+(5.023), (I-302)+(1.078)+(6.001), (I-302)+(1.078)+(6.002), (I-302)+(1.078)+(6.003), (I-302)+(1.078)+(6.004), (I-302)+(1.078)+(7.001), (I-302)+(1.078)+(7.002), (I-302)+(1.078)+(7.003), (I-302)+(1.078)+(7.004), (I-302)+(1.078)+(7.005), (I-302)+(1.078)+(7.006), (I-302)+(1.078)+(9.001), (I-302)+(1.078)+(9.002), (I-302)+(1.078)+(9.003), (I-302)+(1.078)+(9.004), (I-302)+(1.078)+(9.005), (I-302)+(1.078)+(9.006), (I-302)+(1.078)+(9.007), (I-302)+(1.078)+(9.008), (I-302)+(1.078)+(9.009), (I-302)+(1.078)+(14.001), (I-302)+(1.078)+(14.002), (I-302)+(1.078)+(15.008), (I-302)+(1.078)+(15.011), (I-302)+(1.078)+(15.012), (I-302)+(1.078)+(15.016), (I-302)+(1.078)+(15.025), (I-302)+(1.078)+(15.027), (I-302)+(1.078)+(15.047), (I-302)+(1.078)+(15.063), (I-302)+(1.078)+(15.064), (I-302)+(1.078)+(16.001), (I-302)+(1.078)+(16.002), (I-302)+(1.078)+(16.003), (I-302)+(1.078)+(16.004), (I-302)+(1.078)+(16.005), (I-302)+(1.078)+(16.006), (I-302)+(1.078)+(16.007), (I-302)+(1.078)+(16.008), (I-302)+(1.078)+(17.001), (I-302)+(1.078)+(17.002), (I-302)+(1.078)+(17.003), (I-302)+(1.078)+(17.004), (I-302)+(1.078)+(17.005), (I-302)+(1.078)+(17.006), (I-302)+(1.078)+(17.007), (I-302)+(1.078)+(17.008), (I-302)+(1.078)+(17.009), (I-302)+(1.078)+(17.010), (I-302)+(1.078)+(17.011), (I-302)+(1.078)+(17.012), (I-302)+(1.078)+(18.001), (I-302)+(1.079)+(1.080), (I-302)+(1.079)+(1.081), (I-302)+(1.079)+(1.082), (I-302)+(1.079)+(1.083), (I-302)+(1.079)+(1.084), (I-302)+(1.079)+(1.085), (I-302)+(1.079)+(1.086), (I-302)+(1.079)+(1.087), (I-302)+(1.079)+(1.088), (I-302)+(1.079)+(1.089), (I-302)+(1.079)+(1.090), (I-302)+(1.079)+(1.091), (I-302)+(1.079)+(1.092), (I-302)+(1.079)+(2.001), (I-302)+(1.079)+(2.002), (I-302)+(1.079)+(2.003), (I-302)+(1.079)+(2.004), (I-302)+(1.079)+(2.005), (I-302)+(1.079)+(2.006), (I-302)+(1.079)+(2.007), (I-302)+(1.079)+(2.008), (I-302)+(1.079)+(2.009), (I-302)+(1.079)+(2.010), (I-302)+(1.079)+(2.011), (I-302)+(1.079)+(2.012), (I-302)+(1.079)+(2.013), (I-302)+(1.079)+(2.014), (I-302)+(1.079)+(2.015), (I-302)+(1.079)+(2.016), (I-302)+(1.079)+(2.017), (I-302)+(1.079)+(2.018), (I-302)+(1.079)+(2.019), (I-302)+(1.079)+(2.020), (I-302)+(1.079)+(2.021), (I-302)+(1.079)+(2.022), (I-302)+(1.079)+(2.023), (I-302)+(1.079)+(2.024), (I-302)+(1.079)+(2.025), (I-302)+(1.079)+(2.026), (I-302)+(1.079)+(2.027), (I-302)+(1.079)+(2.028), (I-302)+(1.079)+(2.029), (I-302)+(1.079)+(2.030), (I-302)+(1.079)+(2.031), (I-302)+(1.079)+(2.032), (I-302)+(1.079)+(2.033), (I-302)+(1.079)+(2.034), (I-302)+(1.079)+(2.035), (I-302)+(1.079)+(2.036), (I-302)+(1.079)+(2.037), (I-302)+(1.079)+(2.038), (I-302)+(1.079)+(2.039), (I-302)+(1.079)+(2.040), (I-302)+(1.079)+(2.041), (I-302)+(1.079)+(2.042), (I-302)+(1.079)+(2.043), (I-302)+(1.079)+(2.044), (I-302)+(1.079)+(2.045), (I-302)+(1.079)+(2.046), (I-302)+(1.079)+(2.047), (I-302)+(1.079)+(2.048), (I-302)+(1.079)+(2.049), (I-302)+(1.079)+(2.050), (I-302)+(1.079)+(2.051), (I-302)+(1.079)+(2.052), (I-302)+(1.079)+(2.053), (I-302)+(1.079)+(2.054), (I-302)+(1.079)+(2.055), (I-302)+(1.079)+(2.056), (I-302)+(1.079)+(2.057), (I-302)+(1.079)+(2.058), (I-302)+(1.079)+(2.059), (I-302)+(1.079)+(3.001), (I-302)+(1.079)+(3.002), (I-302)+(1.079)+(3.003), (I-302)+(1.079)+(3.004), (I-302)+(1.079)+(3.005), (I-302)+(1.079)+(3.006), (I-302)+(1.079)+(3.007), (I-302)+(1.079)+(3.008), (I-302)+(1.079)+(3.009), (I-302)+(1.079)+(3.010), (I-302)+(1.079)+(3.011), (I-302)+(1.079)+(3.012), (I-302)+(1.079)+(3.013), (I-302)+(1.079)+(3.014), (I-302)+(1.079)+(3.015), (I-302)+(1.079)+(3.016), (I-302)+(1.079)+(3.017), (I-302)+(1.079)+(3.018), (I-302)+(1.079)+(3.019), (I-302)+(1.079)+(3.020), (I-302)+(1.079)+(3.021), (I-302)+(1.079)+(3.022), (I-302)+(1.079)+(3.023), (I-302)+(1.079)+(3.024), (I-302)+(1.079)+(3.025), (I-302)+(1.079)+(3.026), (I-302)+(1.079)+(3.027), (I-302)+(1.079)+(3.028), (I-302)+(1.079)+(3.029), (I-302)+(1.079)+(3.030), (I-302)+(1.079)+(3.031), (I-302)+(1.079)+(5.001), (I-302)+(1.079)+(5.002), (I-302)+(1.079)+(5.003), (I-302)+(1.079)+(5.004), (I-302)+(1.079)+(5.005), (I-302)+(1.079)+(5.006), (I-302)+(1.079)+(5.007), (I-302)+(1.079)+(5.008), (I-302)+(1.079)+(5.009), (I-302)+(1.079)+(5.010), (I-302)+(1.079)+(5.011), (I-302)+(1.079)+(5.012), (I-302)+(1.079)+(5.013), (I-302)+(1.079)+(5.014), (I-302)+(1.079)+(5.015), (I-302)+(1.079)+(5.016), (I-302)+(1.079)+(5.017), (I-302)+(1.079)+(5.018), (I-302)+(1.079)+(5.019), (I-302)+(1.079)+(5.020), (I-302)+(1.079)+(5.021), (I-302)+(1.079)+(5.022), (I-302)+(1.079)+(5.023), (I-302)+(1.079)+(6.001), (I-302)+(1.079)+(6.002), (I-302)+(1.079)+(6.003), (I-302)+(1.079)+(6.004), (I-302)+(1.079)+(7.001), (I-302)+(1.079)+(7.002), (I-302)+(1.079)+(7.003), (I-302)+(1.079)+(7.004), (I-302)+(1.079)+(7.005), (I-302)+(1.079)+(7.006), (I-302)+(1.079)+(9.001), (I-302)+(1.079)+(9.002), (I-302)+(1.079)+(9.003), (I-302)+(1.079)+(9.004), (I-302)+(1.079)+(9.005), (I-302)+(1.079)+(9.006), (I-302)+(1.079)+(9.007), (I-302)+(1.079)+(9.008), (I-302)+(1.079)+(9.009), (I-302)+(1.079)+(14.001), (I-302)+(1.079)+(14.002), (I-302)+(1.079)+(15.008), (I-302)+(1.079)+(15.011), (I-302)+(1.079)+(15.012), (I-302)+(1.079)+(15.016), (I-302)+(1.079)+(15.025), (I-302)+(1.079)+(15.027), (I-302)+(1.079)+(15.047), (I-302)+(1.079)+(15.063), (I-302)+(1.079)+(15.064), (I-302)+(1.079)+(16.001), (I-302)+(1.079)+(16.002), (I-302)+(1.079)+(16.003), (I-302)+(1.079)+(16.004), (I-302)+(1.079)+(16.005), (I-302)+(1.079)+(16.006), (I-302)+(1.079)+(16.007), (I-302)+(1.079)+(16.008), (I-302)+(1.079)+(17.001), (I-302)+(1.079)+(17.002), (I-302)+(1.079)+(17.003), (I-302)+(1.079)+(17.004), (I-302)+(1.079)+(17.005), (I-302)+(1.079)+(17.006), (I-302)+(1.079)+(17.007), (I-302)+(1.079)+(17.008), (I-302)+(1.079)+(17.009), (I-302)+(1.079)+(17.010), (I-302)+(1.079)+(17.011), (I-302)+(1.079)+(17.012), (I-302)+(1.079)+(18.001), (I-302)+(1.080)+(1.081), (I-302)+(1.080)+(1.082), (I-302)+(1.080)+(1.083), (I-302)+(1.080)+(1.084), (I-302)+(1.080)+(1.085), (I-302)+(1.080)+(1.086), (I-302)+(1.080)+(1.087), (I-302)+(1.080)+(1.088), (I-302)+(1.080)+(1.089), (I-302)+(1.080)+(1.090), (I-302)+(1.080)+(1.091), (I-302)+(1.080)+(1.092), (I-302)+(1.080)+(2.001), (I-302)+(1.080)+(2.002), (I-302)+(1.080)+(2.003), (I-302)+(1.080)+(2.004), (I-302)+(1.080)+(2.005), (I-302)+(1.080)+(2.006), (I-302)+(1.080)+(2.007), (I-302)+(1.080)+(2.008), (I-302)+(1.080)+(2.009), (I-302)+(1.080)+(2.010), (I-302)+(1.080)+(2.011), (I-302)+(1.080)+(2.012), (I-302)+(1.080)+(2.013), (I-302)+(1.080)+(2.014), (I-302)+(1.080)+(2.015), (I-302)+(1.080)+(2.016), (I-302)+(1.080)+(2.017), (I-302)+(1.080)+(2.018), (I-302)+(1.080)+(2.019), (I-302)+(1.080)+(2.020), (I-302)+(1.080)+(2.021), (I-302)+(1.080)+(2.022), (I-302)+(1.080)+(2.023), (I-302)+(1.080)+(2.024), (I-302)+(1.080)+(2.025), (I-302)+(1.080)+(2.026), (I-302)+(1.080)+(2.027), (I-302)+(1.080)+(2.028), (I-302)+(1.080)+(2.029), (I-302)+(1.080)+(2.030), (I-302)+(1.080)+(2.031), (I-302)+(1.080)+(2.032), (I-302)+(1.080)+(2.033), (I-302)+(1.080)+(2.034), (I-302)+(1.080)+(2.035), (I-302)+(1.080)+(2.036), (I-302)+(1.080)+(2.037), (I-302)+(1.080)+(2.038), (I-302)+(1.080)+(2.039), (I-302)+(1.080)+(2.040), (I-302)+(1.080)+(2.041), (I-302)+(1.080)+(2.042), (I-302)+(1.080)+(2.043), (I-302)+(1.080)+(2.044), (I-302)+(1.080)+(2.045), (I-302)+(1.080)+(2.046), (I-302)+(1.080)+(2.047), (I-302)+(1.080)+(2.048), (I-302)+(1.080)+(2.049), (I-302)+(1.080)+(2.050), (I-302)+(1.080)+(2.051), (I-302)+(1.080)+(2.052), (I-302)+(1.080)+(2.053), (I-302)+(1.080)+(2.054), (I-302)+(1.080)+(2.055), (I-302)+(1.080)+(2.056), (I-302)+(1.080)+(2.057), (I-302)+(1.080)+(2.058), (I-302)+(1.080)+(2.059), (I-302)+(1.080)+(3.001), (I-302)+(1.080)+(3.002), (I-302)+(1.080)+(3.003), (I-302)+(1.080)+(3.004), (I-302)+(1.080)+(3.005), (I-302)+(1.080)+(3.006), (I-302)+(1.080)+(3.007), (I-302)+(1.080)+(3.008), (I-302)+(1.080)+(3.009), (I-302)+(1.080)+(3.010), (I-302)+(1.080)+(3.011), (I-302)+(1.080)+(3.012), (I-302)+(1.080)+(3.013), (I-302)+(1.080)+(3.014), (I-302)+(1.080)+(3.015), (I-302)+(1.080)+(3.016), (I-302)+(1.080)+(3.017), (I-302)+(1.080)+(3.018), (I-302)+(1.080)+(3.019), (I-302)+(1.080)+(3.020), (I-302)+(1.080)+(3.021), (I-302)+(1.080)+(3.022), (I-302)+(1.080)+(3.023), (I-302)+(1.080)+(3.024), (I-302)+(1.080)+(3.025), (I-302)+(1.080)+(3.026), (I-302)+(1.080)+(3.027), (I-302)+(1.080)+(3.028), (I-302)+(1.080)+(3.029), (I-302)+(1.080)+(3.030), (I-302)+(1.080)+(3.031), (I-302)+(1.080)+(5.001), (I-302)+(1.080)+(5.002), (I-302)+(1.080)+(5.003), (I-302)+(1.080)+(5.004), (I-302)+(1.080)+(5.005), (I-302)+(1.080)+(5.006), (I-302)+(1.080)+(5.007), (I-302)+(1.080)+(5.008), (I-302)+(1.080)+(5.009), (I-302)+(1.080)+(5.010), (I-302)+(1.080)+(5.011), (I-302)+(1.080)+(5.012), (I-302)+(1.080)+(5.013), (I-302)+(1.080)+(5.014), (I-302)+(1.080)+(5.015), (I-302)+(1.080)+(5.016), (I-302)+(1.080)+(5.017), (I-302)+(1.080)+(5.018), (I-302)+(1.080)+(5.019), (I-302)+(1.080)+(5.020), (I-302)+(1.080)+(5.021), (I-302)+(1.080)+(5.022), (I-302)+(1.080)+(5.023), (I-302)+(1.080)+(6.001), (I-302)+(1.080)+(6.002), (I-302)+(1.080)+(6.003), (I-302)+(1.080)+(6.004), (I-302)+(1.080)+(7.001), (I-302)+(1.080)+(7.002), (I-302)+(1.080)+(7.003), (I-302)+(1.080)+(7.004), (I-302)+(1.080)+(7.005), (I-302)+(1.080)+(7.006), (I-302)+(1.080)+(9.001), (I-302)+(1.080)+(9.002), (I-302)+(1.080)+(9.003), (I-302)+(1.080)+(9.004), (I-302)+(1.080)+(9.005), (I-302)+(1.080)+(9.006), (I-302)+(1.080)+(9.007), (I-302)+(1.080)+(9.008), (I-302)+(1.080)+(9.009), (I-302)+(1.080)+(14.001), (I-302)+(1.080)+(14.002), (I-302)+(1.080)+(15.008), (I-302)+(1.080)+(15.011), (I-302)+(1.080)+(15.012), (I-302)+(1.080)+(15.016), (I-302)+(1.080)+(15.025), (I-302)+(1.080)+(15.027), (I-302)+(1.080)+(15.047), (I-302)+(1.080)+(15.063), (I-302)+(1.080)+(15.064), (I-302)+(1.080)+(16.001), (I-302)+(1.080)+(16.002), (I-302)+(1.080)+(16.003), (I-302)+(1.080)+(16.004), (I-302)+(1.080)+(16.005), (I-302)+(1.080)+(16.006), (I-302)+(1.080)+(16.007), (I-302)+(1.080)+(16.008), (I-302)+(1.080)+(17.001), (I-302)+(1.080)+(17.002), (I-302)+(1.080)+(17.003), (I-302)+(1.080)+(17.004), (I-302)+(1.080)+(17.005), (I-302)+(1.080)+(17.006), (I-302)+(1.080)+(17.007), (I-302)+(1.080)+(17.008), (I-302)+(1.080)+(17.009), (I-302)+(1.080)+(17.010), (I-302)+(1.080)+(17.011), (I-302)+(1.080)+(17.012), (I-302)+(1.080)+(18.001), (I-302)+(1.081)+(1.082), (I-302)+(1.081)+(1.083), (I-302)+(1.081)+(1.084), (I-302)+(1.081)+(1.085), (I-302)+(1.081)+(1.086), (I-302)+(1.081)+(1.087), (I-302)+(1.081)+(1.088), (I-302)+(1.081)+(1.089), (I-302)+(1.081)+(1.090), (I-302)+(1.081)+(1.091), (I-302)+(1.081)+(1.092), (I-302)+(1.081)+(2.001), (I-302)+(1.081)+(2.002), (I-302)+(1.081)+(2.003), (I-302)+(1.081)+(2.004), (I-302)+(1.081)+(2.005), (I-302)+(1.081)+(2.006), (I-302)+(1.081)+(2.007), (I-302)+(1.081)+(2.008), (I-302)+(1.081)+(2.009), (I-302)+(1.081)+(2.010), (I-302)+(1.081)+(2.011), (I-302)+(1.081)+(2.012), (I-302)+(1.081)+(2.013), (I-302)+(1.081)+(2.014), (I-302)+(1.081)+(2.015), (I-302)+(1.081)+(2.016), (I-302)+(1.081)+(2.017), (I-302)+(1.081)+(2.018), (I-302)+(1.081)+(2.019), (I-302)+(1.081)+(2.020), (I-302)+(1.081)+(2.021), (I-302)+(1.081)+(2.022), (I-302)+(1.081)+(2.023), (I-302)+(1.081)+(2.024), (I-302)+(1.081)+(2.025), (I-302)+(1.081)+(2.026), (I-302)+(1.081)+(2.027), (I-302)+(1.081)+(2.028), (I-302)+(1.081)+(2.029), (I-302)+(1.081)+(2.030), (I-302)+(1.081)+(2.031), (I-302)+(1.081)+(2.032), (I-302)+(1.081)+(2.033), (I-302)+(1.081)+(2.034), (I-302)+(1.081)+(2.035), (I-302)+(1.081)+(2.036), (I-302)+(1.081)+(2.037), (I-302)+(1.081)+(2.038), (I-302)+(1.081)+(2.039), (I-302)+(1.081)+(2.040), (I-302)+(1.081)+(2.041), (I-302)+(1.081)+(2.042), (I-302)+(1.081)+(2.043), (I-302)+(1.081)+(2.044), (I-302)+(1.081)+(2.045), (I-302)+(1.081)+(2.046), (I-302)+(1.081)+(2.047), (I-302)+(1.081)+(2.048), (I-302)+(1.081)+(2.049), (I-302)+(1.081)+(2.050), (I-302)+(1.081)+(2.051), (I-302)+(1.081)+(2.052), (I-302)+(1.081)+(2.053), (I-302)+(1.081)+(2.054), (I-302)+(1.081)+(2.055), (I-302)+(1.081)+(2.056), (I-302)+(1.081)+(2.057), (I-302)+(1.081)+(2.058), (I-302)+(1.081)+(2.059), (I-302)+(1.081)+(3.001), (I-302)+(1.081)+(3.002), (I-302)+(1.081)+(3.003), (I-302)+(1.081)+(3.004), (I-302)+(1.081)+(3.005), (I-302)+(1.081)+(3.006), (I-302)+(1.081)+(3.007), (I-302)+(1.081)+(3.008), (I-302)+(1.081)+(3.009), (I-302)+(1.081)+(3.010), (I-302)+(1.081)+(3.011), (I-302)+(1.081)+(3.012), (I-302)+(1.081)+(3.013), (I-302)+(1.081)+(3.014), (I-302)+(1.081)+(3.015), (I-302)+(1.081)+(3.016), (I-302)+(1.081)+(3.017), (I-302)+(1.081)+(3.018), (I-302)+(1.081)+(3.019), (I-302)+(1.081)+(3.020), (I-302)+(1.081)+(3.021), (I-302)+(1.081)+(3.022), (I-302)+(1.081)+(3.023), (I-302)+(1.081)+(3.024), (I-302)+(1.081)+(3.025), (I-302)+(1.081)+(3.026), (I-302)+(1.081)+(3.027), (I-302)+(1.081)+(3.028), (I-302)+(1.081)+(3.029), (I-302)+(1.081)+(3.030), (I-302)+(1.081)+(3.031), (I-302)+(1.081)+(5.001), (I-302)+(1.081)+(5.002), (I-302)+(1.081)+(5.003), (I-302)+(1.081)+(5.004), (I-302)+(1.081)+(5.005), (I-302)+(1.081)+(5.006), (I-302)+(1.081)+(5.007), (I-302)+(1.081)+(5.008), (I-302)+(1.081)+(5.009), (I-302)+(1.081)+(5.010), (I-302)+(1.081)+(5.011), (I-302)+(1.081)+(5.012), (I-302)+(1.081)+(5.013), (I-302)+(1.081)+(5.014), (I-302)+(1.081)+(5.015), (I-302)+(1.081)+(5.016), (I-302)+(1.081)+(5.017), (I-302)+(1.081)+(5.018), (I-302)+(1.081)+(5.019), (I-302)+(1.081)+(5.020), (I-302)+(1.081)+(5.021), (I-302)+(1.081)+(5.022), (I-302)+(1.081)+(5.023), (I-302)+(1.081)+(6.001), (I-302)+(1.081)+(6.002), (I-302)+(1.081)+(6.003), (I-302)+(1.081)+(6.004), (I-302)+(1.081)+(7.001), (I-302)+(1.081)+(7.002), (I-302)+(1.081)+(7.003), (I-302)+(1.081)+(7.004), (I-302)+(1.081)+(7.005), (I-302)+(1.081)+(7.006), (I-302)+(1.081)+(9.001), (I-302)+(1.081)+(9.002), (I-302)+(1.081)+(9.003), (I-302)+(1.081)+(9.004), (I-302)+(1.081)+(9.005), (I-302)+(1.081)+(9.006), (I-302)+(1.081)+(9.007), (I-302)+(1.081)+(9.008), (I-302)+(1.081)+(9.009), (I-302)+(1.081)+(14.001), (I-302)+(1.081)+(14.002), (I-302)+(1.081)+(15.008), (I-302)+(1.081)+(15.011), (I-302)+(1.081)+(15.012), (I-302)+(1.081)+(15.016), (I-302)+(1.081)+(15.025), (I-302)+(1.081)+(15.027), (I-302)+(1.081)+(15.047), (I-302)+(1.081)+(15.063), (I-302)+(1.081)+(15.064), (I-302)+(1.081)+(16.001), (I-302)+(1.081)+(16.002), (I-302)+(1.081)+(16.003), (I-302)+(1.081)+(16.004), (I-302)+(1.081)+(16.005), (I-302)+(1.081)+(16.006), (I-302)+(1.081)+(16.007), (I-302)+(1.081)+(16.008), (I-302)+(1.081)+(17.001), (I-302)+(1.081)+(17.002), (I-302)+(1.081)+(17.003), (I-302)+(1.081)+(17.004), (I-302)+(1.081)+(17.005), (I-302)+(1.081)+(17.006), (I-302)+(1.081)+(17.007), (I-302)+(1.081)+(17.008), (I-302)+(1.081)+(17.009), (I-302)+(1.081)+(17.010), (I-302)+(1.081)+(17.011), (I-302)+(1.081)+(17.012), (I-302)+(1.081)+(18.001), (I-302)+(1.082)+(1.083), (I-302)+(1.082)+(1.084), (I-302)+(1.082)+(1.085), (I-302)+(1.082)+(1.086), (I-302)+(1.082)+(1.087), (I-302)+(1.082)+(1.088), (I-302)+(1.082)+(1.089), (I-302)+(1.082)+(1.090), (I-302)+(1.082)+(1.091), (I-302)+(1.082)+(1.092), (I-302)+(1.082)+(2.001), (I-302)+(1.082)+(2.002), (I-302)+(1.082)+(2.003), (I-302)+(1.082)+(2.004), (I-302)+(1.082)+(2.005), (I-302)+(1.082)+(2.006), (I-302)+(1.082)+(2.007), (I-302)+(1.082)+(2.008), (I-302)+(1.082)+(2.009), (I-302)+(1.082)+(2.010), (I-302)+(1.082)+(2.011), (I-302)+(1.082)+(2.012), (I-302)+(1.082)+(2.013), (I-302)+(1.082)+(2.014), (I-302)+(1.082)+(2.015), (I-302)+(1.082)+(2.016), (I-302)+(1.082)+(2.017), (I-302)+(1.082)+(2.018), (I-302)+(1.082)+(2.019), (I-302)+(1.082)+(2.020), (I-302)+(1.082)+(2.021), (I-302)+(1.082)+(2.022), (I-302)+(1.082)+(2.023), (I-302)+(1.082)+(2.024), (I-302)+(1.082)+(2.025), (I-302)+(1.082)+(2.026), (I-302)+(1.082)+(2.027), (I-302)+(1.082)+(2.028), (I-302)+(1.082)+(2.029), (I-302)+(1.082)+(2.030), (I-302)+(1.082)+(2.031), (I-302)+(1.082)+(2.032), (I-302)+(1.082)+(2.033), (I-302)+(1.082)+(2.034), (I-302)+(1.082)+(2.035), (I-302)+(1.082)+(2.036), (I-302)+(1.082)+(2.037), (I-302)+(1.082)+(2.038), (I-302)+(1.082)+(2.039), (I-302)+(1.082)+(2.040), (I-302)+(1.082)+(2.041), (I-302)+(1.082)+(2.042), (I-302)+(1.082)+(2.043), (I-302)+(1.082)+(2.044), (I-302)+(1.082)+(2.045), (I-302)+(1.082)+(2.046), (I-302)+(1.082)+(2.047), (I-302)+(1.082)+(2.048), (I-302)+(1.082)+(2.049), (I-302)+(1.082)+(2.050), (I-302)+(1.082)+(2.051), (I-302)+(1.082)+(2.052), (I-302)+(1.082)+(2.053), (I-302)+(1.082)+(2.054), (I-302)+(1.082)+(2.055), (I-302)+(1.082)+(2.056), (I-302)+(1.082)+(2.057), (I-302)+(1.082)+(2.058), (I-302)+(1.082)+(2.059), (I-302)+(1.082)+(3.001), (I-302)+(1.082)+(3.002), (I-302)+(1.082)+(3.003), (I-302)+(1.082)+(3.004), (I-302)+(1.082)+(3.005), (I-302)+(1.082)+(3.006), (I-302)+(1.082)+(3.007), (I-302)+(1.082)+(3.008), (I-302)+(1.082)+(3.009), (I-302)+(1.082)+(3.010), (I-302)+(1.082)+(3.011), (I-302)+(1.082)+(3.012), (I-302)+(1.082)+(3.013), (I-302)+(1.082)+(3.014), (I-302)+(1.082)+(3.015), (I-302)+(1.082)+(3.016), (I-302)+(1.082)+(3.017), (I-302)+(1.082)+(3.018), (I-302)+(1.082)+(3.019), (I-302)+(1.082)+(3.020), (I-302)+(1.082)+(3.021), (I-302)+(1.082)+(3.022), (I-302)+(1.082)+(3.023), (I-302)+(1.082)+(3.024), (I-302)+(1.082)+(3.025), (I-302)+(1.082)+(3.026), (I-302)+(1.082)+(3.027), (I-302)+(1.082)+(3.028), (I-302)+(1.082)+(3.029), (I-302)+(1.082)+(3.030), (I-302)+(1.082)+(3.031), (I-302)+(1.082)+(5.001), (I-302)+(1.082)+(5.002), (I-302)+(1.082)+(5.003), (I-302)+(1.082)+(5.004), (I-302)+(1.082)+(5.005), (I-302)+(1.082)+(5.006), (I-302)+(1.082)+(5.007), (I-302)+(1.082)+(5.008), (I-302)+(1.082)+(5.009), (I-302)+(1.082)+(5.010), (I-302)+(1.082)+(5.011), (I-302)+(1.082)+(5.012), (I-302)+(1.082)+(5.013), (I-302)+(1.082)+(5.014), (I-302)+(1.082)+(5.015), (I-302)+(1.082)+(5.016), (I-302)+(1.082)+(5.017), (I-302)+(1.082)+(5.018), (I-302)+(1.082)+(5.019), (I-302)+(1.082)+(5.020), (I-302)+(1.082)+(5.021), (I-302)+(1.082)+(5.022), (I-302)+(1.082)+(5.023), (I-302)+(1.082)+(6.001), (I-302)+(1.082)+(6.002), (I-302)+(1.082)+(6.003), (I-302)+(1.082)+(6.004), (I-302)+(1.082)+(7.001), (I-302)+(1.082)+(7.002), (I-302)+(1.082)+(7.003), (I-302)+(1.082)+(7.004), (I-302)+(1.082)+(7.005), (I-302)+(1.082)+(7.006), (I-302)+(1.082)+(9.001), (I-302)+(1.082)+(9.002), (I-302)+(1.082)+(9.003), (I-302)+(1.082)+(9.004), (I-302)+(1.082)+(9.005), (I-302)+(1.082)+(9.006), (I-302)+(1.082)+(9.007), (I-302)+(1.082)+(9.008), (I-302)+(1.082)+(9.009), (I-302)+(1.082)+(14.001), (I-302)+(1.082)+(14.002), (I-302)+(1.082)+(15.008), (I-302)+(1.082)+(15.011), (I-302)+(1.082)+(15.012), (I-302)+(1.082)+(15.016), (I-302)+(1.082)+(15.025), (I-302)+(1.082)+(15.027), (I-302)+(1.082)+(15.047), (I-302)+(1.082)+(15.063), (I-302)+(1.082)+(15.064), (I-302)+(1.082)+(16.001), (I-302)+(1.082)+(16.002), (I-302)+(1.082)+(16.003), (I-302)+(1.082)+(16.004), (I-302)+(1.082)+(16.005), (I-302)+(1.082)+(16.006), (I-302)+(1.082)+(16.007), (I-302)+(1.082)+(16.008), (I-302)+(1.082)+(17.001), (I-302)+(1.082)+(17.002), (I-302)+(1.082)+(17.003), (I-302)+(1.082)+(17.004), (I-302)+(1.082)+(17.005), (I-302)+(1.082)+(17.006), (I-302)+(1.082)+(17.007), (I-302)+(1.082)+(17.008), (I-302)+(1.082)+(17.009), (I-302)+(1.082)+(17.010), (I-302)+(1.082)+(17.011), (I-302)+(1.082)+(17.012), (I-302)+(1.082)+(18.001), (I-302)+(1.083)+(1.084), (I-302)+(1.083)+(1.085), (I-302)+(1.083)+(1.086), (I-302)+(1.083)+(1.087), (I-302)+(1.083)+(1.088), (I-302)+(1.083)+(1.089), (I-302)+(1.083)+(1.090), (I-302)+(1.083)+(1.091), (I-302)+(1.083)+(1.092), (I-302)+(1.083)+(2.001), (I-302)+(1.083)+(2.002), (I-302)+(1.083)+(2.003), (I-302)+(1.083)+(2.004), (I-302)+(1.083)+(2.005), (I-302)+(1.083)+(2.006), (I-302)+(1.083)+(2.007), (I-302)+(1.083)+(2.008), (I-302)+(1.083)+(2.009), (I-302)+(1.083)+(2.010), (I-302)+(1.083)+(2.011), (I-302)+(1.083)+(2.012), (I-302)+(1.083)+(2.013), (I-302)+(1.083)+(2.014), (I-302)+(1.083)+(2.015), (I-302)+(1.083)+(2.016), (I-302)+(1.083)+(2.017), (I-302)+(1.083)+(2.018), (I-302)+(1.083)+(2.019), (I-302)+(1.083)+(2.020), (I-302)+(1.083)+(2.021), (I-302)+(1.083)+(2.022), (I-302)+(1.083)+(2.023), (I-302)+(1.083)+(2.024), (I-302)+(1.083)+(2.025), (I-302)+(1.083)+(2.026), (I-302)+(1.083)+(2.027), (I-302)+(1.083)+(2.028), (I-302)+(1.083)+(2.029), (I-302)+(1.083)+(2.030), (I-302)+(1.083)+(2.031), (I-302)+(1.083)+(2.032), (I-302)+(1.083)+(2.033), (I-302)+(1.083)+(2.034), (I-302)+(1.083)+(2.035), (I-302)+(1.083)+(2.036), (I-302)+(1.083)+(2.037), (I-302)+(1.083)+(2.038), (I-302)+(1.083)+(2.039), (I-302)+(1.083)+(2.040), (I-302)+(1.083)+(2.041), (I-302)+(1.083)+(2.042), (I-302)+(1.083)+(2.043), (I-302)+(1.083)+(2.044), (I-302)+(1.083)+(2.045), (I-302)+(1.083)+(2.046), (I-302)+(1.083)+(2.047), (I-302)+(1.083)+(2.048), (I-302)+(1.083)+(2.049), (I-302)+(1.083)+(2.050), (I-302)+(1.083)+(2.051), (I-302)+(1.083)+(2.052), (I-302)+(1.083)+(2.053), (I-302)+(1.083)+(2.054), (I-302)+(1.083)+(2.055), (I-302)+(1.083)+(2.056), (I-302)+(1.083)+(2.057), (I-302)+(1.083)+(2.058), (I-302)+(1.083)+(2.059), (I-302)+(1.083)+(3.001), (I-302)+(1.083)+(3.002), (I-302)+(1.083)+(3.003), (I-302)+(1.083)+(3.004), (I-302)+(1.083)+(3.005), (I-302)+(1.083)+(3.006), (I-302)+(1.083)+(3.007), (I-302)+(1.083)+(3.008), (I-302)+(1.083)+(3.009), (I-302)+(1.083)+(3.010), (I-302)+(1.083)+(3.011), (I-302)+(1.083)+(3.012), (I-302)+(1.083)+(3.013), (I-302)+(1.083)+(3.014), (I-302)+(1.083)+(3.015), (I-302)+(1.083)+(3.016), (I-302)+(1.083)+(3.017), (I-302)+(1.083)+(3.018), (I-302)+(1.083)+(3.019), (I-302)+(1.083)+(3.020), (I-302)+(1.083)+(3.021), (I-302)+(1.083)+(3.022), (I-302)+(1.083)+(3.023), (I-302)+(1.083)+(3.024), (I-302)+(1.083)+(3.025), (I-302)+(1.083)+(3.026), (I-302)+(1.083)+(3.027), (I-302)+(1.083)+(3.028), (I-302)+(1.083)+(3.029), (I-302)+(1.083)+(3.030), (I-302)+(1.083)+(3.031), (I-302)+(1.083)+(5.001), (I-302)+(1.083)+(5.002), (I-302)+(1.083)+(5.003), (I-302)+(1.083)+(5.004), (I-302)+(1.083)+(5.005), (I-302)+(1.083)+(5.006), (I-302)+(1.083)+(5.007), (I-302)+(1.083)+(5.008), (I-302)+(1.083)+(5.009), (I-302)+(1.083)+(5.010), (I-302)+(1.083)+(5.011), (I-302)+(1.083)+(5.012), (I-302)+(1.083)+(5.013), (I-302)+(1.083)+(5.014), (I-302)+(1.083)+(5.015), (I-302)+(1.083)+(5.016), (I-302)+(1.083)+(5.017), (I-302)+(1.083)+(5.018), (I-302)+(1.083)+(5.019), (I-302)+(1.083)+(5.020), (I-302)+(1.083)+(5.021), (I-302)+(1.083)+(5.022), (I-302)+(1.083)+(5.023), (I-302)+(1.083)+(6.001), (I-302)+(1.083)+(6.002), (I-302)+(1.083)+(6.003), (I-302)+(1.083)+(6.004), (I-302)+(1.083)+(7.001), (I-302)+(1.083)+(7.002), (I-302)+(1.083)+(7.003), (I-302)+(1.083)+(7.004), (I-302)+(1.083)+(7.005), (I-302)+(1.083)+(7.006), (I-302)+(1.083)+(9.001), (I-302)+(1.083)+(9.002), (I-302)+(1.083)+(9.003), (I-302)+(1.083)+(9.004), (I-302)+(1.083)+(9.005), (I-302)+(1.083)+(9.006), (I-302)+(1.083)+(9.007), (I-302)+(1.083)+(9.008), (I-302)+(1.083)+(9.009), (I-302)+(1.083)+(14.001), (I-302)+(1.083)+(14.002), (I-302)+(1.083)+(15.008), (I-302)+(1.083)+(15.011), (I-302)+(1.083)+(15.012), (I-302)+(1.083)+(15.016), (I-302)+(1.083)+(15.025), (I-302)+(1.083)+(15.027), (I-302)+(1.083)+(15.047), (I-302)+(1.083)+(15.063), (I-302)+(1.083)+(15.064), (I-302)+(1.083)+(16.001), (I-302)+(1.083)+(16.002), (I-302)+(1.083)+(16.003), (I-302)+(1.083)+(16.004), (I-302)+(1.083)+(16.005), (I-302)+(1.083)+(16.006), (I-302)+(1.083)+(16.007), (I-302)+(1.083)+(16.008), (I-302)+(1.083)+(17.001), (I-302)+(1.083)+(17.002), (I-302)+(1.083)+(17.003), (I-302)+(1.083)+(17.004), (I-302)+(1.083)+(17.005), (I-302)+(1.083)+(17.006), (I-302)+(1.083)+(17.007), (I-302)+(1.083)+(17.008), (I-302)+(1.083)+(17.009), (I-302)+(1.083)+(17.010), (I-302)+(1.083)+(17.011), (I-302)+(1.083)+(17.012), (I-302)+(1.083)+(18.001), (I-302)+(1.084)+(1.085), (I-302)+(1.084)+(1.086), (I-302)+(1.084)+(1.087), (I-302)+(1.084)+(1.088), (I-302)+(1.084)+(1.089), (I-302)+(1.084)+(1.090), (I-302)+(1.084)+(1.091), (I-302)+(1.084)+(1.092), (I-302)+(1.084)+(2.001), (I-302)+(1.084)+(2.002), (I-302)+(1.084)+(2.003), (I-302)+(1.084)+(2.004), (I-302)+(1.084)+(2.005), (I-302)+(1.084)+(2.006), (I-302)+(1.084)+(2.007), (I-302)+(1.084)+(2.008), (I-302)+(1.084)+(2.009), (I-302)+(1.084)+(2.010), (I-302)+(1.084)+(2.011), (I-302)+(1.084)+(2.012), (I-302)+(1.084)+(2.013), (I-302)+(1.084)+(2.014), (I-302)+(1.084)+(2.015), (I-302)+(1.084)+(2.016), (I-302)+(1.084)+(2.017), (I-302)+(1.084)+(2.018), (I-302)+(1.084)+(2.019), (I-302)+(1.084)+(2.020), (I-302)+(1.084)+(2.021), (I-302)+(1.084)+(2.022), (I-302)+(1.084)+(2.023), (I-302)+(1.084)+(2.024), (I-302)+(1.084)+(2.025), (I-302)+(1.084)+(2.026), (I-302)+(1.084)+(2.027), (I-302)+(1.084)+(2.028), (I-302)+(1.084)+(2.029), (I-302)+(1.084)+(2.030), (I-302)+(1.084)+(2.031), (I-302)+(1.084)+(2.032), (I-302)+(1.084)+(2.033), (I-302)+(1.084)+(2.034), (I-302)+(1.084)+(2.035), (I-302)+(1.084)+(2.036), (I-302)+(1.084)+(2.037), (I-302)+(1.084)+(2.038), (I-302)+(1.084)+(2.039), (I-302)+(1.084)+(2.040), (I-302)+(1.084)+(2.041), (I-302)+(1.084)+(2.042), (I-302)+(1.084)+(2.043), (I-302)+(1.084)+(2.044), (I-302)+(1.084)+(2.045), (I-302)+(1.084)+(2.046), (I-302)+(1.084)+(2.047), (I-302)+(1.084)+(2.048), (I-302)+(1.084)+(2.049), (I-302)+(1.084)+(2.050), (I-302)+(1.084)+(2.051), (I-302)+(1.084)+(2.052), (I-302)+(1.084)+(2.053), (I-302)+(1.084)+(2.054), (I-302)+(1.084)+(2.055), (I-302)+(1.084)+(2.056), (I-302)+(1.084)+(2.057), (I-302)+(1.084)+(2.058), (I-302)+(1.084)+(2.059), (I-302)+(1.084)+(3.001), (I-302)+(1.084)+(3.002), (I-302)+(1.084)+(3.003), (I-302)+(1.084)+(3.004), (I-302)+(1.084)+(3.005), (I-302)+(1.084)+(3.006), (I-302)+(1.084)+(3.007), (I-302)+(1.084)+(3.008), (I-302)+(1.084)+(3.009), (I-302)+(1.084)+(3.010), (I-302)+(1.084)+(3.011), (I-302)+(1.084)+(3.012), (I-302)+(1.084)+(3.013), (I-302)+(1.084)+(3.014), (I-302)+(1.084)+(3.015), (I-302)+(1.084)+(3.016), (I-302)+(1.084)+(3.017), (I-302)+(1.084)+(3.018), (I-302)+(1.084)+(3.019), (I-302)+(1.084)+(3.020), (I-302)+(1.084)+(3.021), (I-302)+(1.084)+(3.022), (I-302)+(1.084)+(3.023), (I-302)+(1.084)+(3.024), (I-302)+(1.084)+(3.025), (I-302)+(1.084)+(3.026), (I-302)+(1.084)+(3.027), (I-302)+(1.084)+(3.028), (I-302)+(1.084)+(3.029), (I-302)+(1.084)+(3.030), (I-302)+(1.084)+(3.031), (I-302)+(1.084)+(5.001), (I-302)+(1.084)+(5.002), (I-302)+(1.084)+(5.003), (I-302)+(1.084)+(5.004), (I-302)+(1.084)+(5.005), (I-302)+(1.084)+(5.006), (I-302)+(1.084)+(5.007), (I-302)+(1.084)+(5.008), (I-302)+(1.084)+(5.009), (I-302)+(1.084)+(5.010), (I-302)+(1.084)+(5.011), (I-302)+(1.084)+(5.012), (I-302)+(1.084)+(5.013), (I-302)+(1.084)+(5.014), (I-302)+(1.084)+(5.015), (I-302)+(1.084)+(5.016), (I-302)+(1.084)+(5.017), (I-302)+(1.084)+(5.018), (I-302)+(1.084)+(5.019), (I-302)+(1.084)+(5.020), (I-302)+(1.084)+(5.021), (I-302)+(1.084)+(5.022), (I-302)+(1.084)+(5.023), (I-302)+(1.084)+(6.001), (I-302)+(1.084)+(6.002), (I-302)+(1.084)+(6.003), (I-302)+(1.084)+(6.004), (I-302)+(1.084)+(7.001), (I-302)+(1.084)+(7.002), (I-302)+(1.084)+(7.003), (I-302)+(1.084)+(7.004), (I-302)+(1.084)+(7.005), (I-302)+(1.084)+(7.006), (I-302)+(1.084)+(9.001), (I-302)+(1.084)+(9.002), (I-302)+(1.084)+(9.003), (I-302)+(1.084)+(9.004), (I-302)+(1.084)+(9.005), (I-302)+(1.084)+(9.006), (I-302)+(1.084)+(9.007), (I-302)+(1.084)+(9.008), (I-302)+(1.084)+(9.009), (I-302)+(1.084)+(14.001), (I-302)+(1.084)+(14.002), (I-302)+(1.084)+(15.008), (I-302)+(1.084)+(15.011), (I-302)+(1.084)+(15.012), (I-302)+(1.084)+(15.016), (I-302)+(1.084)+(15.025), (I-302)+(1.084)+(15.027), (I-302)+(1.084)+(15.047), (I-302)+(1.084)+(15.063), (I-302)+(1.084)+(15.064), (I-302)+(1.084)+(16.001), (I-302)+(1.084)+(16.002), (I-302)+(1.084)+(16.003), (I-302)+(1.084)+(16.004), (I-302)+(1.084)+(16.005), (I-302)+(1.084)+(16.006), (I-302)+(1.084)+(16.007), (I-302)+(1.084)+(16.008), (I-302)+(1.084)+(17.001), (I-302)+(1.084)+(17.002), (I-302)+(1.084)+(17.003), (I-302)+(1.084)+(17.004), (I-302)+(1.084)+(17.005), (I-302)+(1.084)+(17.006), (I-302)+(1.084)+(17.007), (I-302)+(1.084)+(17.008), (I-302)+(1.084)+(17.009), (I-302)+(1.084)+(17.010), (I-302)+(1.084)+(17.011), (I-302)+(1.084)+(17.012), (I-302)+(1.084)+(18.001), (I-302)+(1.085)+(1.086), (I-302)+(1.085)+(1.087), (I-302)+(1.085)+(1.088), (I-302)+(1.085)+(1.089), (I-302)+(1.085)+(1.090), (I-302)+(1.085)+(1.091), (I-302)+(1.085)+(1.092), (I-302)+(1.085)+(2.001), (I-302)+(1.085)+(2.002), (I-302)+(1.085)+(2.003), (I-302)+(1.085)+(2.004), (I-302)+(1.085)+(2.005), (I-302)+(1.085)+(2.006), (I-302)+(1.085)+(2.007), (I-302)+(1.085)+(2.008), (I-302)+(1.085)+(2.009), (I-302)+(1.085)+(2.010), (I-302)+(1.085)+(2.011), (I-302)+(1.085)+(2.012), (I-302)+(1.085)+(2.013), (I-302)+(1.085)+(2.014), (I-302)+(1.085)+(2.015), (I-302)+(1.085)+(2.016), (I-302)+(1.085)+(2.017), (I-302)+(1.085)+(2.018), (I-302)+(1.085)+(2.019), (I-302)+(1.085)+(2.020), (I-302)+(1.085)+(2.021), (I-302)+(1.085)+(2.022), (I-302)+(1.085)+(2.023), (I-302)+(1.085)+(2.024), (I-302)+(1.085)+(2.025), (I-302)+(1.085)+(2.026), (I-302)+(1.085)+(2.027), (I-302)+(1.085)+(2.028), (I-302)+(1.085)+(2.029), (I-302)+(1.085)+(2.030), (I-302)+(1.085)+(2.031), (I-302)+(1.085)+(2.032), (I-302)+(1.085)+(2.033), (I-302)+(1.085)+(2.034), (I-302)+(1.085)+(2.035), (I-302)+(1.085)+(2.036), (I-302)+(1.085)+(2.037), (I-302)+(1.085)+(2.038), (I-302)+(1.085)+(2.039), (I-302)+(1.085)+(2.040), (I-302)+(1.085)+(2.041), (I-302)+(1.085)+(2.042), (I-302)+(1.085)+(2.043), (I-302)+(1.085)+(2.044), (I-302)+(1.085)+(2.045), (I-302)+(1.085)+(2.046), (I-302)+(1.085)+(2.047), (I-302)+(1.085)+(2.048), (I-302)+(1.085)+(2.049), (I-302)+(1.085)+(2.050), (I-302)+(1.085)+(2.051), (I-302)+(1.085)+(2.052), (I-302)+(1.085)+(2.053), (I-302)+(1.085)+(2.054), (I-302)+(1.085)+(2.055), (I-302)+(1.085)+(2.056), (I-302)+(1.085)+(2.057), (I-302)+(1.085)+(2.058), (I-302)+(1.085)+(2.059), (I-302)+(1.085)+(3.001), (I-302)+(1.085)+(3.002), (I-302)+(1.085)+(3.003), (I-302)+(1.085)+(3.004), (I-302)+(1.085)+(3.005), (I-302)+(1.085)+(3.006), (I-302)+(1.085)+(3.007), (I-302)+(1.085)+(3.008), (I-302)+(1.085)+(3.009), (I-302)+(1.085)+(3.010), (I-302)+(1.085)+(3.011), (I-302)+(1.085)+(3.012), (I-302)+(1.085)+(3.013), (I-302)+(1.085)+(3.014), (I-302)+(1.085)+(3.015), (I-302)+(1.085)+(3.016), (I-302)+(1.085)+(3.017), (I-302)+(1.085)+(3.018), (I-302)+(1.085)+(3.019), (I-302)+(1.085)+(3.020), (I-302)+(1.085)+(3.021), (I-302)+(1.085)+(3.022), (I-302)+(1.085)+(3.023), (I-302)+(1.085)+(3.024), (I-302)+(1.085)+(3.025), (I-302)+(1.085)+(3.026), (I-302)+(1.085)+(3.027), (I-302)+(1.085)+(3.028), (I-302)+(1.085)+(3.029), (I-302)+(1.085)+(3.030), (I-302)+(1.085)+(3.031), (I-302)+(1.085)+(5.001), (I-302)+(1.085)+(5.002), (I-302)+(1.085)+(5.003), (I-302)+(1.085)+(5.004), (I-302)+(1.085)+(5.005), (I-302)+(1.085)+(5.006), (I-302)+(1.085)+(5.007), (I-302)+(1.085)+(5.008), (I-302)+(1.085)+(5.009), (I-302)+(1.085)+(5.010), (I-302)+(1.085)+(5.011), (I-302)+(1.085)+(5.012), (I-302)+(1.085)+(5.013), (I-302)+(1.085)+(5.014), (I-302)+(1.085)+(5.015), (I-302)+(1.085)+(5.016), (I-302)+(1.085)+(5.017), (I-302)+(1.085)+(5.018), (I-302)+(1.085)+(5.019), (I-302)+(1.085)+(5.020), (I-302)+(1.085)+(5.021), (I-302)+(1.085)+(5.022), (I-302)+(1.085)+(5.023), (I-302)+(1.085)+(6.001), (I-302)+(1.085)+(6.002), (I-302)+(1.085)+(6.003), (I-302)+(1.085)+(6.004), (I-302)+(1.085)+(7.001), (I-302)+(1.085)+(7.002), (I-302)+(1.085)+(7.003), (I-302)+(1.085)+(7.004), (I-302)+(1.085)+(7.005), (I-302)+(1.085)+(7.006), (I-302)+(1.085)+(9.001), (I-302)+(1.085)+(9.002), (I-302)+(1.085)+(9.003), (I-302)+(1.085)+(9.004), (I-302)+(1.085)+(9.005), (I-302)+(1.085)+(9.006), (I-302)+(1.085)+(9.007), (I-302)+(1.085)+(9.008), (I-302)+(1.085)+(9.009), (I-302)+(1.085)+(14.001), (I-302)+(1.085)+(14.002), (I-302)+(1.085)+(15.008), (I-302)+(1.085)+(15.011), (I-302)+(1.085)+(15.012), (I-302)+(1.085)+(15.016), (I-302)+(1.085)+(15.025), (I-302)+(1.085)+(15.027), (I-302)+(1.085)+(15.047), (I-302)+(1.085)+(15.063), (I-302)+(1.085)+(15.064), (I-302)+(1.085)+(16.001), (I-302)+(1.085)+(16.002), (I-302)+(1.085)+(16.003), (I-302)+(1.085)+(16.004), (I-302)+(1.085)+(16.005), (I-302)+(1.085)+(16.006), (I-302)+(1.085)+(16.007), (I-302)+(1.085)+(16.008), (I-302)+(1.085)+(17.001), (I-302)+(1.085)+(17.002), (I-302)+(1.085)+(17.003), (I-302)+(1.085)+(17.004), (I-302)+(1.085)+(17.005), (I-302)+(1.085)+(17.006), (I-302)+(1.085)+(17.007), (I-302)+(1.085)+(17.008), (I-302)+(1.085)+(17.009), (I-302)+(1.085)+(17.010), (I-302)+(1.085)+(17.011), (I-302)+(1.085)+(17.012), (I-302)+(1.085)+(18.001), (I-302)+(1.086)+(1.087), (I-302)+(1.086)+(1.088), (I-302)+(1.086)+(1.089), (I-302)+(1.086)+(1.090), (I-302)+(1.086)+(1.091), (I-302)+(1.086)+(1.092), (I-302)+(1.086)+(2.001), (I-302)+(1.086)+(2.002), (I-302)+(1.086)+(2.003), (I-302)+(1.086)+(2.004), (I-302)+(1.086)+(2.005), (I-302)+(1.086)+(2.006), (I-302)+(1.086)+(2.007), (I-302)+(1.086)+(2.008), (I-302)+(1.086)+(2.009), (I-302)+(1.086)+(2.010), (I-302)+(1.086)+(2.011), (I-302)+(1.086)+(2.012), (I-302)+(1.086)+(2.013), (I-302)+(1.086)+(2.014), (I-302)+(1.086)+(2.015), (I-302)+(1.086)+(2.016), (I-302)+(1.086)+(2.017), (I-302)+(1.086)+(2.018), (I-302)+(1.086)+(2.019), (I-302)+(1.086)+(2.020), (I-302)+(1.086)+(2.021), (I-302)+(1.086)+(2.022), (I-302)+(1.086)+(2.023), (I-302)+(1.086)+(2.024), (I-302)+(1.086)+(2.025), (I-302)+(1.086)+(2.026), (I-302)+(1.086)+(2.027), (I-302)+(1.086)+(2.028), (I-302)+(1.086)+(2.029), (I-302)+(1.086)+(2.030), (I-302)+(1.086)+(2.031), (I-302)+(1.086)+(2.032), (I-302)+(1.086)+(2.033), (I-302)+(1.086)+(2.034), (I-302)+(1.086)+(2.035), (I-302)+(1.086)+(2.036), (I-302)+(1.086)+(2.037), (I-302)+(1.086)+(2.038), (I-302)+(1.086)+(2.039), (I-302)+(1.086)+(2.040), (I-302)+(1.086)+(2.041), (I-302)+(1.086)+(2.042), (I-302)+(1.086)+(2.043), (I-302)+(1.086)+(2.044), (I-302)+(1.086)+(2.045), (I-302)+(1.086)+(2.046), (I-302)+(1.086)+(2.047), (I-302)+(1.086)+(2.048), (I-302)+(1.086)+(2.049), (I-302)+(1.086)+(2.050), (I-302)+(1.086)+(2.051), (I-302)+(1.086)+(2.052), (I-302)+(1.086)+(2.053), (I-302)+(1.086)+(2.054), (I-302)+(1.086)+(2.055), (I-302)+(1.086)+(2.056), (I-302)+(1.086)+(2.057), (I-302)+(1.086)+(2.058), (I-302)+(1.086)+(2.059), (I-302)+(1.086)+(3.001), (I-302)+(1.086)+(3.002), (I-302)+(1.086)+(3.003), (I-302)+(1.086)+(3.004), (I-302)+(1.086)+(3.005), (I-302)+(1.086)+(3.006), (I-302)+(1.086)+(3.007), (I-302)+(1.086)+(3.008), (I-302)+(1.086)+(3.009), (I-302)+(1.086)+(3.010), (I-302)+(1.086)+(3.011), (I-302)+(1.086)+(3.012), (I-302)+(1.086)+(3.013), (I-302)+(1.086)+(3.014), (I-302)+(1.086)+(3.015), (I-302)+(1.086)+(3.016), (I-302)+(1.086)+(3.017), (I-302)+(1.086)+(3.018), (I-302)+(1.086)+(3.019), (I-302)+(1.086)+(3.020), (I-302)+(1.086)+(3.021), (I-302)+(1.086)+(3.022), (I-302)+(1.086)+(3.023), (I-302)+(1.086)+(3.024), (I-302)+(1.086)+(3.025), (I-302)+(1.086)+(3.026), (I-302)+(1.086)+(3.027), (I-302)+(1.086)+(3.028), (I-302)+(1.086)+(3.029), (I-302)+(1.086)+(3.030), (I-302)+(1.086)+(3.031), (I-302)+(1.086)+(5.001), (I-302)+(1.086)+(5.002), (I-302)+(1.086)+(5.003), (I-302)+(1.086)+(5.004), (I-302)+(1.086)+(5.005), (I-302)+(1.086)+(5.006), (I-302)+(1.086)+(5.007), (I-302)+(1.086)+(5.008), (I-302)+(1.086)+(5.009), (I-302)+(1.086)+(5.010), (I-302)+(1.086)+(5.011), (I-302)+(1.086)+(5.012), (I-302)+(1.086)+(5.013), (I-302)+(1.086)+(5.014), (I-302)+(1.086)+(5.015), (I-302)+(1.086)+(5.016), (I-302)+(1.086)+(5.017), (I-302)+(1.086)+(5.018), (I-302)+(1.086)+(5.019), (I-302)+(1.086)+(5.020), (I-302)+(1.086)+(5.021), (I-302)+(1.086)+(5.022), (I-302)+(1.086)+(5.023), (I-302)+(1.086)+(6.001), (I-302)+(1.086)+(6.002), (I-302)+(1.086)+(6.003), (I-302)+(1.086)+(6.004), (I-302)+(1.086)+(7.001), (I-302)+(1.086)+(7.002), (I-302)+(1.086)+(7.003), (I-302)+(1.086)+(7.004), (I-302)+(1.086)+(7.005), (I-302)+(1.086)+(7.006), (I-302)+(1.086)+(9.001), (I-302)+(1.086)+(9.002), (I-302)+(1.086)+(9.003), (I-302)+(1.086)+(9.004), (I-302)+(1.086)+(9.005), (I-302)+(1.086)+(9.006), (I-302)+(1.086)+(9.007), (I-302)+(1.086)+(9.008), (I-302)+(1.086)+(9.009), (I-302)+(1.086)+(14.001), (I-302)+(1.086)+(14.002), (I-302)+(1.086)+(15.008), (I-302)+(1.086)+(15.011), (I-302)+(1.086)+(15.012), (I-302)+(1.086)+(15.016), (I-302)+(1.086)+(15.025), (I-302)+(1.086)+(15.027), (I-302)+(1.086)+(15.047), (I-302)+(1.086)+(15.063), (I-302)+(1.086)+(15.064), (I-302)+(1.086)+(16.001), (I-302)+(1.086)+(16.002), (I-302)+(1.086)+(16.003), (I-302)+(1.086)+(16.004), (I-302)+(1.086)+(16.005), (I-302)+(1.086)+(16.006), (I-302)+(1.086)+(16.007), (I-302)+(1.086)+(16.008), (I-302)+(1.086)+(17.001), (I-302)+(1.086)+(17.002), (I-302)+(1.086)+(17.003), (I-302)+(1.086)+(17.004), (I-302)+(1.086)+(17.005), (I-302)+(1.086)+(17.006), (I-302)+(1.086)+(17.007), (I-302)+(1.086)+(17.008), (I-302)+(1.086)+(17.009), (I-302)+(1.086)+(17.010), (I-302)+(1.086)+(17.011), (I-302)+(1.086)+(17.012), (I-302)+(1.086)+(18.001), (I-302)+(1.087)+(1.088), (I-302)+(1.087)+(1.089), (I-302)+(1.087)+(1.090), (I-302)+(1.087)+(1.091), (I-302)+(1.087)+(1.092), (I-302)+(1.087)+(2.001), (I-302)+(1.087)+(2.002), (I-302)+(1.087)+(2.003), (I-302)+(1.087)+(2.004), (I-302)+(1.087)+(2.005), (I-302)+(1.087)+(2.006), (I-302)+(1.087)+(2.007), (I-302)+(1.087)+(2.008), (I-302)+(1.087)+(2.009), (I-302)+(1.087)+(2.010), (I-302)+(1.087)+(2.011), (I-302)+(1.087)+(2.012), (I-302)+(1.087)+(2.013), (I-302)+(1.087)+(2.014), (I-302)+(1.087)+(2.015), (I-302)+(1.087)+(2.016), (I-302)+(1.087)+(2.017), (I-302)+(1.087)+(2.018), (I-302)+(1.087)+(2.019), (I-302)+(1.087)+(2.020), (I-302)+(1.087)+(2.021), (I-302)+(1.087)+(2.022), (I-302)+(1.087)+(2.023), (I-302)+(1.087)+(2.024), (I-302)+(1.087)+(2.025), (I-302)+(1.087)+(2.026), (I-302)+(1.087)+(2.027), (I-302)+(1.087)+(2.028), (I-302)+(1.087)+(2.029), (I-302)+(1.087)+(2.030), (I-302)+(1.087)+(2.031), (I-302)+(1.087)+(2.032), (I-302)+(1.087)+(2.033), (I-302)+(1.087)+(2.034), (I-302)+(1.087)+(2.035), (I-302)+(1.087)+(2.036), (I-302)+(1.087)+(2.037), (I-302)+(1.087)+(2.038), (I-302)+(1.087)+(2.039), (I-302)+(1.087)+(2.040), (I-302)+(1.087)+(2.041), (I-302)+(1.087)+(2.042), (I-302)+(1.087)+(2.043), (I-302)+(1.087)+(2.044), (I-302)+(1.087)+(2.045), (I-302)+(1.087)+(2.046), (I-302)+(1.087)+(2.047), (I-302)+(1.087)+(2.048), (I-302)+(1.087)+(2.049), (I-302)+(1.087)+(2.050), (I-302)+(1.087)+(2.051), (I-302)+(1.087)+(2.052), (I-302)+(1.087)+(2.053), (I-302)+(1.087)+(2.054), (I-302)+(1.087)+(2.055), (I-302)+(1.087)+(2.056), (I-302)+(1.087)+(2.057), (I-302)+(1.087)+(2.058), (I-302)+(1.087)+(2.059), (I-302)+(1.087)+(3.001), (I-302)+(1.087)+(3.002), (I-302)+(1.087)+(3.003), (I-302)+(1.087)+(3.004), (I-302)+(1.087)+(3.005), (I-302)+(1.087)+(3.006), (I-302)+(1.087)+(3.007), (I-302)+(1.087)+(3.008), (I-302)+(1.087)+(3.009), (I-302)+(1.087)+(3.010), (I-302)+(1.087)+(3.011), (I-302)+(1.087)+(3.012), (I-302)+(1.087)+(3.013), (I-302)+(1.087)+(3.014), (I-302)+(1.087)+(3.015), (I-302)+(1.087)+(3.016), (I-302)+(1.087)+(3.017), (I-302)+(1.087)+(3.018), (I-302)+(1.087)+(3.019), (I-302)+(1.087)+(3.020), (I-302)+(1.087)+(3.021), (I-302)+(1.087)+(3.022), (I-302)+(1.087)+(3.023), (I-302)+(1.087)+(3.024), (I-302)+(1.087)+(3.025), (I-302)+(1.087)+(3.026), (I-302)+(1.087)+(3.027), (I-302)+(1.087)+(3.028), (I-302)+(1.087)+(3.029), (I-302)+(1.087)+(3.030), (I-302)+(1.087)+(3.031), (I-302)+(1.087)+(5.001), (I-302)+(1.087)+(5.002), (I-302)+(1.087)+(5.003), (I-302)+(1.087)+(5.004), (I-302)+(1.087)+(5.005), (I-302)+(1.087)+(5.006), (I-302)+(1.087)+(5.007), (I-302)+(1.087)+(5.008), (I-302)+(1.087)+(5.009), (I-302)+(1.087)+(5.010), (I-302)+(1.087)+(5.011), (I-302)+(1.087)+(5.012), (I-302)+(1.087)+(5.013), (I-302)+(1.087)+(5.014), (I-302)+(1.087)+(5.015), (I-302)+(1.087)+(5.016), (I-302)+(1.087)+(5.017), (I-302)+(1.087)+(5.018), (I-302)+(1.087)+(5.019), (I-302)+(1.087)+(5.020), (I-302)+(1.087)+(5.021), (I-302)+(1.087)+(5.022), (I-302)+(1.087)+(5.023), (I-302)+(1.087)+(6.001), (I-302)+(1.087)+(6.002), (I-302)+(1.087)+(6.003), (I-302)+(1.087)+(6.004), (I-302)+(1.087)+(7.001), (I-302)+(1.087)+(7.002), (I-302)+(1.087)+(7.003), (I-302)+(1.087)+(7.004), (I-302)+(1.087)+(7.005), (I-302)+(1.087)+(7.006), (I-302)+(1.087)+(9.001), (I-302)+(1.087)+(9.002), (I-302)+(1.087)+(9.003), (I-302)+(1.087)+(9.004), (I-302)+(1.087)+(9.005), (I-302)+(1.087)+(9.006), (I-302)+(1.087)+(9.007), (I-302)+(1.087)+(9.008), (I-302)+(1.087)+(9.009), (I-302)+(1.087)+(14.001), (I-302)+(1.087)+(14.002), (I-302)+(1.087)+(15.008), (I-302)+(1.087)+(15.011), (I-302)+(1.087)+(15.012), (I-302)+(1.087)+(15.016), (I-302)+(1.087)+(15.025), (I-302)+(1.087)+(15.027), (I-302)+(1.087)+(15.047), (I-302)+(1.087)+(15.063), (I-302)+(1.087)+(15.064), (I-302)+(1.087)+(16.001), (I-302)+(1.087)+(16.002), (I-302)+(1.087)+(16.003), (I-302)+(1.087)+(16.004), (I-302)+(1.087)+(16.005), (I-302)+(1.087)+(16.006), (I-302)+(1.087)+(16.007), (I-302)+(1.087)+(16.008), (I-302)+(1.087)+(17.001), (I-302)+(1.087)+(17.002), (I-302)+(1.087)+(17.003), (I-302)+(1.087)+(17.004), (I-302)+(1.087)+(17.005), (I-302)+(1.087)+(17.006), (I-302)+(1.087)+(17.007), (I-302)+(1.087)+(17.008), (I-302)+(1.087)+(17.009), (I-302)+(1.087)+(17.010), (I-302)+(1.087)+(17.011), (I-302)+(1.087)+(17.012), (I-302)+(1.087)+(18.001), (I-302)+(1.088)+(1.089), (I-302)+(1.088)+(1.090), (I-302)+(1.088)+(1.091), (I-302)+(1.088)+(1.092), (I-302)+(1.088)+(2.001), (I-302)+(1.088)+(2.002), (I-302)+(1.088)+(2.003), (I-302)+(1.088)+(2.004), (I-302)+(1.088)+(2.005), (I-302)+(1.088)+(2.006), (I-302)+(1.088)+(2.007), (I-302)+(1.088)+(2.008), (I-302)+(1.088)+(2.009), (I-302)+(1.088)+(2.010), (I-302)+(1.088)+(2.011), (I-302)+(1.088)+(2.012), (I-302)+(1.088)+(2.013), (I-302)+(1.088)+(2.014), (I-302)+(1.088)+(2.015), (I-302)+(1.088)+(2.016), (I-302)+(1.088)+(2.017), (I-302)+(1.088)+(2.018), (I-302)+(1.088)+(2.019), (I-302)+(1.088)+(2.020), (I-302)+(1.088)+(2.021), (I-302)+(1.088)+(2.022), (I-302)+(1.088)+(2.023), (I-302)+(1.088)+(2.024), (I-302)+(1.088)+(2.025), (I-302)+(1.088)+(2.026), (I-302)+(1.088)+(2.027), (I-302)+(1.088)+(2.028), (I-302)+(1.088)+(2.029), (I-302)+(1.088)+(2.030), (I-302)+(1.088)+(2.031), (I-302)+(1.088)+(2.032), (I-302)+(1.088)+(2.033), (I-302)+(1.088)+(2.034), (I-302)+(1.088)+(2.035), (I-302)+(1.088)+(2.036), (I-302)+(1.088)+(2.037), (I-302)+(1.088)+(2.038), (I-302)+(1.088)+(2.039), (I-302)+(1.088)+(2.040), (I-302)+(1.088)+(2.041), (I-302)+(1.088)+(2.042), (I-302)+(1.088)+(2.043), (I-302)+(1.088)+(2.044), (I-302)+(1.088)+(2.045), (I-302)+(1.088)+(2.046), (I-302)+(1.088)+(2.047), (I-302)+(1.088)+(2.048), (I-302)+(1.088)+(2.049), (I-302)+(1.088)+(2.050), (I-302)+(1.088)+(2.051), (I-302)+(1.088)+(2.052), (I-302)+(1.088)+(2.053), (I-302)+(1.088)+(2.054), (I-302)+(1.088)+(2.055), (I-302)+(1.088)+(2.056), (I-302)+(1.088)+(2.057), (I-302)+(1.088)+(2.058), (I-302)+(1.088)+(2.059), (I-302)+(1.088)+(3.001), (I-302)+(1.088)+(3.002), (I-302)+(1.088)+(3.003), (I-302)+(1.088)+(3.004), (I-302)+(1.088)+(3.005), (I-302)+(1.088)+(3.006), (I-302)+(1.088)+(3.007), (I-302)+(1.088)+(3.008), (I-302)+(1.088)+(3.009), (I-302)+(1.088)+(3.010), (I-302)+(1.088)+(3.011), (I-302)+(1.088)+(3.012), (I-302)+(1.088)+(3.013), (I-302)+(1.088)+(3.014), (I-302)+(1.088)+(3.015), (I-302)+(1.088)+(3.016), (I-302)+(1.088)+(3.017), (I-302)+(1.088)+(3.018), (I-302)+(1.088)+(3.019), (I-302)+(1.088)+(3.020), (I-302)+(1.088)+(3.021), (I-302)+(1.088)+(3.022), (I-302)+(1.088)+(3.023), (I-302)+(1.088)+(3.024), (I-302)+(1.088)+(3.025), (I-302)+(1.088)+(3.026), (I-302)+(1.088)+(3.027), (I-302)+(1.088)+(3.028), (I-302)+(1.088)+(3.029), (I-302)+(1.088)+(3.030), (I-302)+(1.088)+(3.031), (I-302)+(1.088)+(5.001), (I-302)+(1.088)+(5.002), (I-302)+(1.088)+(5.003), (I-302)+(1.088)+(5.004), (I-302)+(1.088)+(5.005), (I-302)+(1.088)+(5.006), (I-302)+(1.088)+(5.007), (I-302)+(1.088)+(5.008), (I-302)+(1.088)+(5.009), (I-302)+(1.088)+(5.010), (I-302)+(1.088)+(5.011), (I-302)+(1.088)+(5.012), (I-302)+(1.088)+(5.013), (I-302)+(1.088)+(5.014), (I-302)+(1.088)+(5.015), (I-302)+(1.088)+(5.016), (I-302)+(1.088)+(5.017), (I-302)+(1.088)+(5.018), (I-302)+(1.088)+(5.019), (I-302)+(1.088)+(5.020), (I-302)+(1.088)+(5.021), (I-302)+(1.088)+(5.022), (I-302)+(1.088)+(5.023), (I-302)+(1.088)+(6.001), (I-302)+(1.088)+(6.002), (I-302)+(1.088)+(6.003), (I-302)+(1.088)+(6.004), (I-302)+(1.088)+(7.001), (I-302)+(1.088)+(7.002), (I-302)+(1.088)+(7.003), (I-302)+(1.088)+(7.004), (I-302)+(1.088)+(7.005), (I-302)+(1.088)+(7.006), (I-302)+(1.088)+(9.001), (I-302)+(1.088)+(9.002), (I-302)+(1.088)+(9.003), (I-302)+(1.088)+(9.004), (I-302)+(1.088)+(9.005), (I-302)+(1.088)+(9.006), (I-302)+(1.088)+(9.007), (I-302)+(1.088)+(9.008), (I-302)+(1.088)+(9.009), (I-302)+(1.088)+(14.001), (I-302)+(1.088)+(14.002), (I-302)+(1.088)+(15.008), (I-302)+(1.088)+(15.011), (I-302)+(1.088)+(15.012), (I-302)+(1.088)+(15.016), (I-302)+(1.088)+(15.025), (I-302)+(1.088)+(15.027), (I-302)+(1.088)+(15.047), (I-302)+(1.088)+(15.063), (I-302)+(1.088)+(15.064), (I-302)+(1.088)+(16.001), (I-302)+(1.088)+(16.002), (I-302)+(1.088)+(16.003), (I-302)+(1.088)+(16.004), (I-302)+(1.088)+(16.005), (I-302)+(1.088)+(16.006), (I-302)+(1.088)+(16.007), (I-302)+(1.088)+(16.008), (I-302)+(1.088)+(17.001), (I-302)+(1.088)+(17.002), (I-302)+(1.088)+(17.003), (I-302)+(1.088)+(17.004), (I-302)+(1.088)+(17.005), (I-302)+(1.088)+(17.006), (I-302)+(1.088)+(17.007), (I-302)+(1.088)+(17.008), (I-302)+(1.088)+(17.009), (I-302)+(1.088)+(17.010), (I-302)+(1.088)+(17.011), (I-302)+(1.088)+(17.012), (I-302)+(1.088)+(18.001), (I-302)+(1.089)+(1.090), (I-302)+(1.089)+(1.091), (I-302)+(1.089)+(1.092), (I-302)+(1.089)+(2.001), (I-302)+(1.089)+(2.002), (I-302)+(1.089)+(2.003), (I-302)+(1.089)+(2.004), (I-302)+(1.089)+(2.005), (I-302)+(1.089)+(2.006), (I-302)+(1.089)+(2.007), (I-302)+(1.089)+(2.008), (I-302)+(1.089)+(2.009), (I-302)+(1.089)+(2.010), (I-302)+(1.089)+(2.011), (I-302)+(1.089)+(2.012), (I-302)+(1.089)+(2.013), (I-302)+(1.089)+(2.014), (I-302)+(1.089)+(2.015), (I-302)+(1.089)+(2.016), (I-302)+(1.089)+(2.017), (I-302)+(1.089)+(2.018), (I-302)+(1.089)+(2.019), (I-302)+(1.089)+(2.020), (I-302)+(1.089)+(2.021), (I-302)+(1.089)+(2.022), (I-302)+(1.089)+(2.023), (I-302)+(1.089)+(2.024), (I-302)+(1.089)+(2.025), (I-302)+(1.089)+(2.026), (I-302)+(1.089)+(2.027), (I-302)+(1.089)+(2.028), (I-302)+(1.089)+(2.029), (I-302)+(1.089)+(2.030), (I-302)+(1.089)+(2.031), (I-302)+(1.089)+(2.032), (I-302)+(1.089)+(2.033), (I-302)+(1.089)+(2.034), (I-302)+(1.089)+(2.035), (I-302)+(1.089)+(2.036), (I-302)+(1.089)+(2.037), (I-302)+(1.089)+(2.038), (I-302)+(1.089)+(2.039), (I-302)+(1.089)+(2.040), (I-302)+(1.089)+(2.041), (I-302)+(1.089)+(2.042), (I-302)+(1.089)+(2.043), (I-302)+(1.089)+(2.044), (I-302)+(1.089)+(2.045), (I-302)+(1.089)+(2.046), (I-302)+(1.089)+(2.047), (I-302)+(1.089)+(2.048), (I-302)+(1.089)+(2.049), (I-302)+(1.089)+(2.050), (I-302)+(1.089)+(2.051), (I-302)+(1.089)+(2.052), (I-302)+(1.089)+(2.053), (I-302)+(1.089)+(2.054), (I-302)+(1.089)+(2.055), (I-302)+(1.089)+(2.056), (I-302)+(1.089)+(2.057), (I-302)+(1.089)+(2.058), (I-302)+(1.089)+(2.059), (I-302)+(1.089)+(3.001), (I-302)+(1.089)+(3.002), (I-302)+(1.089)+(3.003), (I-302)+(1.089)+(3.004), (I-302)+(1.089)+(3.005), (I-302)+(1.089)+(3.006), (I-302)+(1.089)+(3.007), (I-302)+(1.089)+(3.008), (I-302)+(1.089)+(3.009), (I-302)+(1.089)+(3.010), (I-302)+(1.089)+(3.011), (I-302)+(1.089)+(3.012), (I-302)+(1.089)+(3.013), (I-302)+(1.089)+(3.014), (I-302)+(1.089)+(3.015), (I-302)+(1.089)+(3.016), (I-302)+(1.089)+(3.017), (I-302)+(1.089)+(3.018), (I-302)+(1.089)+(3.019), (I-302)+(1.089)+(3.020), (I-302)+(1.089)+(3.021), (I-302)+(1.089)+(3.022), (I-302)+(1.089)+(3.023), (I-302)+(1.089)+(3.024), (I-302)+(1.089)+(3.025), (I-302)+(1.089)+(3.026), (I-302)+(1.089)+(3.027), (I-302)+(1.089)+(3.028), (I-302)+(1.089)+(3.029), (I-302)+(1.089)+(3.030), (I-302)+(1.089)+(3.031), (I-302)+(1.089)+(5.001), (I-302)+(1.089)+(5.002), (I-302)+(1.089)+(5.003), (I-302)+(1.089)+(5.004), (I-302)+(1.089)+(5.005), (I-302)+(1.089)+(5.006), (I-302)+(1.089)+(5.007), (I-302)+(1.089)+(5.008), (I-302)+(1.089)+(5.009), (I-302)+(1.089)+(5.010), (I-302)+(1.089)+(5.011), (I-302)+(1.089)+(5.012), (I-302)+(1.089)+(5.013), (I-302)+(1.089)+(5.014), (I-302)+(1.089)+(5.015), (I-302)+(1.089)+(5.016), (I-302)+(1.089)+(5.017), (I-302)+(1.089)+(5.018), (I-302)+(1.089)+(5.019), (I-302)+(1.089)+(5.020), (I-302)+(1.089)+(5.021), (I-302)+(1.089)+(5.022), (I-302)+(1.089)+(5.023), (I-302)+(1.089)+(6.001), (I-302)+(1.089)+(6.002), (I-302)+(1.089)+(6.003), (I-302)+(1.089)+(6.004), (I-302)+(1.089)+(7.001), (I-302)+(1.089)+(7.002), (I-302)+(1.089)+(7.003), (I-302)+(1.089)+(7.004), (I-302)+(1.089)+(7.005), (I-302)+(1.089)+(7.006), (I-302)+(1.089)+(9.001), (I-302)+(1.089)+(9.002), (I-302)+(1.089)+(9.003), (I-302)+(1.089)+(9.004), (I-302)+(1.089)+(9.005), (I-302)+(1.089)+(9.006), (I-302)+(1.089)+(9.007), (I-302)+(1.089)+(9.008), (I-302)+(1.089)+(9.009), (I-302)+(1.089)+(14.001), (I-302)+(1.089)+(14.002), (I-302)+(1.089)+(15.008), (I-302)+(1.089)+(15.011), (I-302)+(1.089)+(15.012), (I-302)+(1.089)+(15.016), (I-302)+(1.089)+(15.025), (I-302)+(1.089)+(15.027), (I-302)+(1.089)+(15.047), (I-302)+(1.089)+(15.063), (I-302)+(1.089)+(15.064), (I-302)+(1.089)+(16.001), (I-302)+(1.089)+(16.002), (I-302)+(1.089)+(16.003), (I-302)+(1.089)+(16.004), (I-302)+(1.089)+(16.005), (I-302)+(1.089)+(16.006), (I-302)+(1.089)+(16.007), (I-302)+(1.089)+(16.008), (I-302)+(1.089)+(17.001), (I-302)+(1.089)+(17.002), (I-302)+(1.089)+(17.003), (I-302)+(1.089)+(17.004), (I-302)+(1.089)+(17.005), (I-302)+(1.089)+(17.006), (I-302)+(1.089)+(17.007), (I-302)+(1.089)+(17.008), (I-302)+(1.089)+(17.009), (I-302)+(1.089)+(17.010), (I-302)+(1.089)+(17.011), (I-302)+(1.089)+(17.012), (I-302)+(1.089)+(18.001), (I-302)+(1.090)+(1.091), (I-302)+(1.090)+(1.092), (I-302)+(1.090)+(2.001), (I-302)+(1.090)+(2.002), (I-302)+(1.090)+(2.003), (I-302)+(1.090)+(2.004), (I-302)+(1.090)+(2.005), (I-302)+(1.090)+(2.006), (I-302)+(1.090)+(2.007), (I-302)+(1.090)+(2.008), (I-302)+(1.090)+(2.009), (I-302)+(1.090)+(2.010), (I-302)+(1.090)+(2.011), (I-302)+(1.090)+(2.012), (I-302)+(1.090)+(2.013), (I-302)+(1.090)+(2.014), (I-302)+(1.090)+(2.015), (I-302)+(1.090)+(2.016), (I-302)+(1.090)+(2.017), (I-302)+(1.090)+(2.018), (I-302)+(1.090)+(2.019), (I-302)+(1.090)+(2.020), (I-302)+(1.090)+(2.021), (I-302)+(1.090)+(2.022), (I-302)+(1.090)+(2.023), (I-302)+(1.090)+(2.024), (I-302)+(1.090)+(2.025), (I-302)+(1.090)+(2.026), (I-302)+(1.090)+(2.027), (I-302)+(1.090)+(2.028), (I-302)+(1.090)+(2.029), (I-302)+(1.090)+(2.030), (I-302)+(1.090)+(2.031), (I-302)+(1.090)+(2.032), (I-302)+(1.090)+(2.033), (I-302)+(1.090)+(2.034), (I-302)+(1.090)+(2.035), (I-302)+(1.090)+(2.036), (I-302)+(1.090)+(2.037), (I-302)+(1.090)+(2.038), (I-302)+(1.090)+(2.039), (I-302)+(1.090)+(2.040), (I-302)+(1.090)+(2.041), (I-302)+(1.090)+(2.042), (I-302)+(1.090)+(2.043), (I-302)+(1.090)+(2.044), (I-302)+(1.090)+(2.045), (I-302)+(1.090)+(2.046), (I-302)+(1.090)+(2.047), (I-302)+(1.090)+(2.048), (I-302)+(1.090)+(2.049), (I-302)+(1.090)+(2.050), (I-302)+(1.090)+(2.051), (I-302)+(1.090)+(2.052), (I-302)+(1.090)+(2.053), (I-302)+(1.090)+(2.054), (I-302)+(1.090)+(2.055), (I-302)+(1.090)+(2.056), (I-302)+(1.090)+(2.057), (I-302)+(1.090)+(2.058), (I-302)+(1.090)+(2.059), (I-302)+(1.090)+(3.001), (I-302)+(1.090)+(3.002), (I-302)+(1.090)+(3.003), (I-302)+(1.090)+(3.004), (I-302)+(1.090)+(3.005), (I-302)+(1.090)+(3.006), (I-302)+(1.090)+(3.007), (I-302)+(1.090)+(3.008), (I-302)+(1.090)+(3.009), (I-302)+(1.090)+(3.010), (I-302)+(1.090)+(3.011), (I-302)+(1.090)+(3.012), (I-302)+(1.090)+(3.013), (I-302)+(1.090)+(3.014), (I-302)+(1.090)+(3.015), (I-302)+(1.090)+(3.016), (I-302)+(1.090)+(3.017), (I-302)+(1.090)+(3.018), (I-302)+(1.090)+(3.019), (I-302)+(1.090)+(3.020), (I-302)+(1.090)+(3.021), (I-302)+(1.090)+(3.022), (I-302)+(1.090)+(3.023), (I-302)+(1.090)+(3.024), (I-302)+(1.090)+(3.025), (I-302)+(1.090)+(3.026), (I-302)+(1.090)+(3.027), (I-302)+(1.090)+(3.028), (I-302)+(1.090)+(3.029), (I-302)+(1.090)+(3.030), (I-302)+(1.090)+(3.031), (I-302)+(1.090)+(5.001), (I-302)+(1.090)+(5.002), (I-302)+(1.090)+(5.003), (I-302)+(1.090)+(5.004), (I-302)+(1.090)+(5.005), (I-302)+(1.090)+(5.006), (I-302)+(1.090)+(5.007), (I-302)+(1.090)+(5.008), (I-302)+(1.090)+(5.009), (I-302)+(1.090)+(5.010), (I-302)+(1.090)+(5.011), (I-302)+(1.090)+(5.012), (I-302)+(1.090)+(5.013), (I-302)+(1.090)+(5.014), (I-302)+(1.090)+(5.015), (I-302)+(1.090)+(5.016), (I-302)+(1.090)+(5.017), (I-302)+(1.090)+(5.018), (I-302)+(1.090)+(5.019), (I-302)+(1.090)+(5.020), (I-302)+(1.090)+(5.021), (I-302)+(1.090)+(5.022), (I-302)+(1.090)+(5.023), (I-302)+(1.090)+(6.001), (I-302)+(1.090)+(6.002), (I-302)+(1.090)+(6.003), (I-302)+(1.090)+(6.004), (I-302)+(1.090)+(7.001), (I-302)+(1.090)+(7.002), (I-302)+(1.090)+(7.003), (I-302)+(1.090)+(7.004), (I-302)+(1.090)+(7.005), (I-302)+(1.090)+(7.006), (I-302)+(1.090)+(9.001), (I-302)+(1.090)+(9.002), (I-302)+(1.090)+(9.003), (I-302)+(1.090)+(9.004), (I-302)+(1.090)+(9.005), (I-302)+(1.090)+(9.006), (I-302)+(1.090)+(9.007), (I-302)+(1.090)+(9.008), (I-302)+(1.090)+(9.009), (I-302)+(1.090)+(14.001), (I-302)+(1.090)+(14.002), (I-302)+(1.090)+(15.008), (I-302)+(1.090)+(15.011), (I-302)+(1.090)+(15.012), (I-302)+(1.090)+(15.016), (I-302)+(1.090)+(15.025), (I-302)+(1.090)+(15.027), (I-302)+(1.090)+(15.047), (I-302)+(1.090)+(15.063), (I-302)+(1.090)+(15.064), (I-302)+(1.090)+(16.001), (I-302)+(1.090)+(16.002), (I-302)+(1.090)+(16.003), (I-302)+(1.090)+(16.004), (I-302)+(1.090)+(16.005), (I-302)+(1.090)+(16.006), (I-302)+(1.090)+(16.007), (I-302)+(1.090)+(16.008), (I-302)+(1.090)+(17.001), (I-302)+(1.090)+(17.002), (I-302)+(1.090)+(17.003), (I-302)+(1.090)+(17.004), (I-302)+(1.090)+(17.005), (I-302)+(1.090)+(17.006), (I-302)+(1.090)+(17.007), (I-302)+(1.090)+(17.008), (I-302)+(1.090)+(17.009), (I-302)+(1.090)+(17.010), (I-302)+(1.090)+(17.011), (I-302)+(1.090)+(17.012), (I-302)+(1.090)+(18.001), (I-302)+(1.091)+(1.092), (I-302)+(1.091)+(2.001), (I-302)+(1.091)+(2.002), (I-302)+(1.091)+(2.003), (I-302)+(1.091)+(2.004), (I-302)+(1.091)+(2.005), (I-302)+(1.091)+(2.006), (I-302)+(1.091)+(2.007), (I-302)+(1.091)+(2.008), (I-302)+(1.091)+(2.009), (I-302)+(1.091)+(2.010), (I-302)+(1.091)+(2.011), (I-302)+(1.091)+(2.012), (I-302)+(1.091)+(2.013), (I-302)+(1.091)+(2.014), (I-302)+(1.091)+(2.015), (I-302)+(1.091)+(2.016), (I-302)+(1.091)+(2.017), (I-302)+(1.091)+(2.018), (I-302)+(1.091)+(2.019), (I-302)+(1.091)+(2.020), (I-302)+(1.091)+(2.021), (I-302)+(1.091)+(2.022), (I-302)+(1.091)+(2.023), (I-302)+(1.091)+(2.024), (I-302)+(1.091)+(2.025), (I-302)+(1.091)+(2.026), (I-302)+(1.091)+(2.027), (I-302)+(1.091)+(2.028), (I-302)+(1.091)+(2.029), (I-302)+(1.091)+(2.030), (I-302)+(1.091)+(2.031), (I-302)+(1.091)+(2.032), (I-302)+(1.091)+(2.033), (I-302)+(1.091)+(2.034), (I-302)+(1.091)+(2.035), (I-302)+(1.091)+(2.036), (I-302)+(1.091)+(2.037), (I-302)+(1.091)+(2.038), (I-302)+(1.091)+(2.039), (I-302)+(1.091)+(2.040), (I-302)+(1.091)+(2.041), (I-302)+(1.091)+(2.042), (I-302)+(1.091)+(2.043), (I-302)+(1.091)+(2.044), (I-302)+(1.091)+(2.045), (I-302)+(1.091)+(2.046), (I-302)+(1.091)+(2.047), (I-302)+(1.091)+(2.048), (I-302)+(1.091)+(2.049), (I-302)+(1.091)+(2.050), (I-302)+(1.091)+(2.051), (I-302)+(1.091)+(2.052), (I-302)+(1.091)+(2.053), (I-302)+(1.091)+(2.054), (I-302)+(1.091)+(2.055), (I-302)+(1.091)+(2.056), (I-302)+(1.091)+(2.057), (I-302)+(1.091)+(2.058), (I-302)+(1.091)+(2.059), (I-302)+(1.091)+(3.001), (I-302)+(1.091)+(3.002), (I-302)+(1.091)+(3.003), (I-302)+(1.091)+(3.004), (I-302)+(1.091)+(3.005), (I-302)+(1.091)+(3.006), (I-302)+(1.091)+(3.007), (I-302)+(1.091)+(3.008), (I-302)+(1.091)+(3.009), (I-302)+(1.091)+(3.010), (I-302)+(1.091)+(3.011), (I-302)+(1.091)+(3.012), (I-302)+(1.091)+(3.013), (I-302)+(1.091)+(3.014), (I-302)+(1.091)+(3.015), (I-302)+(1.091)+(3.016), (I-302)+(1.091)+(3.017), (I-302)+(1.091)+(3.018), (I-302)+(1.091)+(3.019), (I-302)+(1.091)+(3.020), (I-302)+(1.091)+(3.021), (I-302)+(1.091)+(3.022), (I-302)+(1.091)+(3.023), (I-302)+(1.091)+(3.024), (I-302)+(1.091)+(3.025), (I-302)+(1.091)+(3.026), (I-302)+(1.091)+(3.027), (I-302)+(1.091)+(3.028), (I-302)+(1.091)+(3.029), (I-302)+(1.091)+(3.030), (I-302)+(1.091)+(3.031), (I-302)+(1.091)+(5.001), (I-302)+(1.091)+(5.002), (I-302)+(1.091)+(5.003), (I-302)+(1.091)+(5.004), (I-302)+(1.091)+(5.005), (I-302)+(1.091)+(5.006), (I-302)+(1.091)+(5.007), (I-302)+(1.091)+(5.008), (I-302)+(1.091)+(5.009), (I-302)+(1.091)+(5.010), (I-302)+(1.091)+(5.011), (I-302)+(1.091)+(5.012), (I-302)+(1.091)+(5.013), (I-302)+(1.091)+(5.014), (I-302)+(1.091)+(5.015), (I-302)+(1.091)+(5.016), (I-302)+(1.091)+(5.017), (I-302)+(1.091)+(5.018), (I-302)+(1.091)+(5.019), (I-302)+(1.091)+(5.020), (I-302)+(1.091)+(5.021), (I-302)+(1.091)+(5.022), (I-302)+(1.091)+(5.023), (I-302)+(1.091)+(6.001), (I-302)+(1.091)+(6.002), (I-302)+(1.091)+(6.003), (I-302)+(1.091)+(6.004), (I-302)+(1.091)+(7.001), (I-302)+(1.091)+(7.002), (I-302)+(1.091)+(7.003), (I-302)+(1.091)+(7.004), (I-302)+(1.091)+(7.005), (I-302)+(1.091)+(7.006), (I-302)+(1.091)+(9.001), (I-302)+(1.091)+(9.002), (I-302)+(1.091)+(9.003), (I-302)+(1.091)+(9.004), (I-302)+(1.091)+(9.005), (I-302)+(1.091)+(9.006), (I-302)+(1.091)+(9.007), (I-302)+(1.091)+(9.008), (I-302)+(1.091)+(9.009), (I-302)+(1.091)+(14.001), (I-302)+(1.091)+(14.002), (I-302)+(1.091)+(15.008), (I-302)+(1.091)+(15.011), (I-302)+(1.091)+(15.012), (I-302)+(1.091)+(15.016), (I-302)+(1.091)+(15.025), (I-302)+(1.091)+(15.027), (I-302)+(1.091)+(15.047), (I-302)+(1.091)+(15.063), (I-302)+(1.091)+(15.064), (I-302)+(1.091)+(16.001), (I-302)+(1.091)+(16.002), (I-302)+(1.091)+(16.003), (I-302)+(1.091)+(16.004), (I-302)+(1.091)+(16.005), (I-302)+(1.091)+(16.006), (I-302)+(1.091)+(16.007), (I-302)+(1.091)+(16.008), (I-302)+(1.091)+(17.001), (I-302)+(1.091)+(17.002), (I-302)+(1.091)+(17.003), (I-302)+(1.091)+(17.004), (I-302)+(1.091)+(17.005), (I-302)+(1.091)+(17.006), (I-302)+(1.091)+(17.007), (I-302)+(1.091)+(17.008), (I-302)+(1.091)+(17.009), (I-302)+(1.091)+(17.010), (I-302)+(1.091)+(17.011), (I-302)+(1.091)+(17.012), (I-302)+(1.091)+(18.001), (I-302)+(1.092)+(2.001), (I-302)+(1.092)+(2.002), (I-302)+(1.092)+(2.003), (I-302)+(1.092)+(2.004), (I-302)+(1.092)+(2.005), (I-302)+(1.092)+(2.006), (I-302)+(1.092)+(2.007), (I-302)+(1.092)+(2.008), (I-302)+(1.092)+(2.009), (I-302)+(1.092)+(2.010), (I-302)+(1.092)+(2.011), (I-302)+(1.092)+(2.012), (I-302)+(1.092)+(2.013), (I-302)+(1.092)+(2.014), (I-302)+(1.092)+(2.015), (I-302)+(1.092)+(2.016), (I-302)+(1.092)+(2.017), (I-302)+(1.092)+(2.018), (I-302)+(1.092)+(2.019), (I-302)+(1.092)+(2.020), (I-302)+(1.092)+(2.021), (I-302)+(1.092)+(2.022), (I-302)+(1.092)+(2.023), (I-302)+(1.092)+(2.024), (I-302)+(1.092)+(2.025), (I-302)+(1.092)+(2.026), (I-302)+(1.092)+(2.027), (I-302)+(1.092)+(2.028), (I-302)+(1.092)+(2.029), (I-302)+(1.092)+(2.030), (I-302)+(1.092)+(2.031), (I-302)+(1.092)+(2.032), (I-302)+(1.092)+(2.033), (I-302)+(1.092)+(2.034), (I-302)+(1.092)+(2.035), (I-302)+(1.092)+(2.036), (I-302)+(1.092)+(2.037), (I-302)+(1.092)+(2.038), (I-302)+(1.092)+(2.039), (I-302)+(1.092)+(2.040), (I-302)+(1.092)+(2.041), (I-302)+(1.092)+(2.042), (I-302)+(1.092)+(2.043), (I-302)+(1.092)+(2.044), (I-302)+(1.092)+(2.045), (I-302)+(1.092)+(2.046), (I-302)+(1.092)+(2.047), (I-302)+(1.092)+(2.048), (I-302)+(1.092)+(2.049), (I-302)+(1.092)+(2.050), (I-302)+(1.092)+(2.051), (I-302)+(1.092)+(2.052), (I-302)+(1.092)+(2.053), (I-302)+(1.092)+(2.054), (I-302)+(1.092)+(2.055), (I-302)+(1.092)+(2.056), (I-302)+(1.092)+(2.057), (I-302)+(1.092)+(2.058), (I-302)+(1.092)+(2.059), (I-302)+(1.092)+(3.001), (I-302)+(1.092)+(3.002), (I-302)+(1.092)+(3.003), (I-302)+(1.092)+(3.004), (I-302)+(1.092)+(3.005), (I-302)+(1.092)+(3.006), (I-302)+(1.092)+(3.007), (I-302)+(1.092)+(3.008), (I-302)+(1.092)+(3.009), (I-302)+(1.092)+(3.010), (I-302)+(1.092)+(3.011), (I-302)+(1.092)+(3.012), (I-302)+(1.092)+(3.013), (I-302)+(1.092)+(3.014), (I-302)+(1.092)+(3.015), (I-302)+(1.092)+(3.016), (I-302)+(1.092)+(3.017), (I-302)+(1.092)+(3.018), (I-302)+(1.092)+(3.019), (I-302)+(1.092)+(3.020), (I-302)+(1.092)+(3.021), (I-302)+(1.092)+(3.022), (I-302)+(1.092)+(3.023), (I-302)+(1.092)+(3.024), (I-302)+(1.092)+(3.025), (I-302)+(1.092)+(3.026), (I-302)+(1.092)+(3.027), (I-302)+(1.092)+(3.028), (I-302)+(1.092)+(3.029), (I-302)+(1.092)+(3.030), (I-302)+(1.092)+(3.031), (I-302)+(1.092)+(5.001), (I-302)+(1.092)+(5.002), (I-302)+(1.092)+(5.003), (I-302)+(1.092)+(5.004), (I-302)+(1.092)+(5.005), (I-302)+(1.092)+(5.006), (I-302)+(1.092)+(5.007), (I-302)+(1.092)+(5.008), (I-302)+(1.092)+(5.009), (I-302)+(1.092)+(5.010), (I-302)+(1.092)+(5.011), (I-302)+(1.092)+(5.012), (I-302)+(1.092)+(5.013), (I-302)+(1.092)+(5.014), (I-302)+(1.092)+(5.015), (I-302)+(1.092)+(5.016), (I-302)+(1.092)+(5.017), (I-302)+(1.092)+(5.018), (I-302)+(1.092)+(5.019), (I-302)+(1.092)+(5.020), (I-302)+(1.092)+(5.021), (I-302)+(1.092)+(5.022), (I-302)+(1.092)+(5.023), (I-302)+(1.092)+(6.001), (I-302)+(1.092)+(6.002), (I-302)+(1.092)+(6.003), (I-302)+(1.092)+(6.004), (I-302)+(1.092)+(7.001), (I-302)+(1.092)+(7.002), (I-302)+(1.092)+(7.003), (I-302)+(1.092)+(7.004), (I-302)+(1.092)+(7.005), (I-302)+(1.092)+(7.006), (I-302)+(1.092)+(9.001), (I-302)+(1.092)+(9.002), (I-302)+(1.092)+(9.003), (I-302)+(1.092)+(9.004), (I-302)+(1.092)+(9.005), (I-302)+(1.092)+(9.006), (I-302)+(1.092)+(9.007), (I-302)+(1.092)+(9.008), (I-302)+(1.092)+(9.009), (I-302)+(1.092)+(14.001), (I-302)+(1.092)+(14.002), (I-302)+(1.092)+(15.008), (I-302)+(1.092)+(15.011), (I-302)+(1.092)+(15.012), (I-302)+(1.092)+(15.016), (I-302)+(1.092)+(15.025), (I-302)+(1.092)+(15.027), (I-302)+(1.092)+(15.047), (I-302)+(1.092)+(15.063), (I-302)+(1.092)+(15.064), (I-302)+(1.092)+(16.001), (I-302)+(1.092)+(16.002), (I-302)+(1.092)+(16.003), (I-302)+(1.092)+(16.004), (I-302)+(1.092)+(16.005), (I-302)+(1.092)+(16.006), (I-302)+(1.092)+(16.007), (I-302)+(1.092)+(16.008), (I-302)+(1.092)+(17.001), (I-302)+(1.092)+(17.002), (I-302)+(1.092)+(17.003), (I-302)+(1.092)+(17.004), (I-302)+(1.092)+(17.005), (I-302)+(1.092)+(17.006), (I-302)+(1.092)+(17.007), (I-302)+(1.092)+(17.008), (I-302)+(1.092)+(17.009), (I-302)+(1.092)+(17.010), (I-302)+(1.092)+(17.011), (I-302)+(1.092)+(17.012), (I-302)+(1.092)+(18.001), (I-302)+(2.001)+(3.001), (I-302)+(2.001)+(3.002), (I-302)+(2.001)+(3.003), (I-302)+(2.001)+(3.004), (I-302)+(2.001)+(3.005), (I-302)+(2.001)+(3.006), (I-302)+(2.001)+(3.007), (I-302)+(2.001)+(3.008), (I-302)+(2.001)+(3.009), (I-302)+(2.001)+(3.010), (I-302)+(2.001)+(3.011), (I-302)+(2.001)+(3.012), (I-302)+(2.001)+(3.013), (I-302)+(2.001)+(3.014), (I-302)+(2.001)+(3.015), (I-302)+(2.001)+(3.016), (I-302)+(2.001)+(3.017), (I-302)+(2.001)+(3.018), (I-302)+(2.001)+(3.019), (I-302)+(2.001)+(3.020), (I-302)+(2.001)+(3.021), (I-302)+(2.001)+(3.022), (I-302)+(2.001)+(3.023), (I-302)+(2.001)+(3.024), (I-302)+(2.001)+(3.025), (I-302)+(2.001)+(3.026), (I-302)+(2.001)+(3.027), (I-302)+(2.001)+(3.028), (I-302)+(2.001)+(3.029), (I-302)+(2.001)+(3.030), (I-302)+(2.001)+(3.031), (I-302)+(2.001)+(5.001), (I-302)+(2.001)+(5.002), (I-302)+(2.001)+(5.003), (I-302)+(2.001)+(5.004), (I-302)+(2.001)+(5.005), (I-302)+(2.001)+(5.006), (I-302)+(2.001)+(5.007), (I-302)+(2.001)+(5.008), (I-302)+(2.001)+(5.009), (I-302)+(2.001)+(5.010), (I-302)+(2.001)+(5.011), (I-302)+(2.001)+(5.012), (I-302)+(2.001)+(5.013), (I-302)+(2.001)+(5.014), (I-302)+(2.001)+(5.015), (I-302)+(2.001)+(5.016), (I-302)+(2.001)+(5.017), (I-302)+(2.001)+(5.018), (I-302)+(2.001)+(5.019), (I-302)+(2.001)+(5.020), (I-302)+(2.001)+(5.021), (I-302)+(2.001)+(5.022), (I-302)+(2.001)+(5.023), (I-302)+(2.001)+(6.001), (I-302)+(2.001)+(6.002), (I-302)+(2.001)+(6.003), (I-302)+(2.001)+(6.004), (I-302)+(2.001)+(7.001), (I-302)+(2.001)+(7.002), (I-302)+(2.001)+(7.003), (I-302)+(2.001)+(7.004), (I-302)+(2.001)+(7.005), (I-302)+(2.001)+(7.006), (I-302)+(2.001)+(9.001), (I-302)+(2.001)+(9.002), (I-302)+(2.001)+(9.003), (I-302)+(2.001)+(9.004), (I-302)+(2.001)+(9.005), (I-302)+(2.001)+(9.006), (I-302)+(2.001)+(9.007), (I-302)+(2.001)+(9.008), (I-302)+(2.001)+(9.009), (I-302)+(2.001)+(14.001), (I-302)+(2.001)+(14.002), (I-302)+(2.001)+(15.008), (I-302)+(2.001)+(15.011), (I-302)+(2.001)+(15.012), (I-302)+(2.001)+(15.016), (I-302)+(2.001)+(15.025), (I-302)+(2.001)+(15.027), (I-302)+(2.001)+(15.047), (I-302)+(2.001)+(15.063), (I-302)+(2.001)+(15.064), (I-302)+(2.001)+(16.001), (I-302)+(2.001)+(16.002), (I-302)+(2.001)+(16.003), (I-302)+(2.001)+(16.004), (I-302)+(2.001)+(16.005), (I-302)+(2.001)+(16.006), (I-302)+(2.001)+(16.007), (I-302)+(2.001)+(16.008), (I-302)+(2.001)+(17.001), (I-302)+(2.001)+(17.002), (I-302)+(2.001)+(17.003), (I-302)+(2.001)+(17.004), (I-302)+(2.001)+(17.005), (I-302)+(2.001)+(17.006), (I-302)+(2.001)+(17.007), (I-302)+(2.001)+(17.008), (I-302)+(2.001)+(17.009), (I-302)+(2.001)+(17.010), (I-302)+(2.001)+(17.011), (I-302)+(2.001)+(17.012), (I-302)+(2.001)+(18.001), (I-302)+(2.002)+(3.001), (I-302)+(2.002)+(3.002), (I-302)+(2.002)+(3.003), (I-302)+(2.002)+(3.004), (I-302)+(2.002)+(3.005), (I-302)+(2.002)+(3.006), (I-302)+(2.002)+(3.007), (I-302)+(2.002)+(3.008), (I-302)+(2.002)+(3.009), (I-302)+(2.002)+(3.010), (I-302)+(2.002)+(3.011), (I-302)+(2.002)+(3.012), (I-302)+(2.002)+(3.013), (I-302)+(2.002)+(3.014), (I-302)+(2.002)+(3.015), (I-302)+(2.002)+(3.016), (I-302)+(2.002)+(3.017), (I-302)+(2.002)+(3.018), (I-302)+(2.002)+(3.019), (I-302)+(2.002)+(3.020), (I-302)+(2.002)+(3.021), (I-302)+(2.002)+(3.022), (I-302)+(2.002)+(3.023), (I-302)+(2.002)+(3.024), (I-302)+(2.002)+(3.025), (I-302)+(2.002)+(3.026), (I-302)+(2.002)+(3.027), (I-302)+(2.002)+(3.028), (I-302)+(2.002)+(3.029), (I-302)+(2.002)+(3.030), (I-302)+(2.002)+(3.031), (I-302)+(2.002)+(5.001), (I-302)+(2.002)+(5.002), (I-302)+(2.002)+(5.003), (I-302)+(2.002)+(5.004), (I-302)+(2.002)+(5.005), (I-302)+(2.002)+(5.006), (I-302)+(2.002)+(5.007), (I-302)+(2.002)+(5.008), (I-302)+(2.002)+(5.009), (I-302)+(2.002)+(5.010), (I-302)+(2.002)+(5.011), (I-302)+(2.002)+(5.012), (I-302)+(2.002)+(5.013), (I-302)+(2.002)+(5.014), (I-302)+(2.002)+(5.015), (I-302)+(2.002)+(5.016), (I-302)+(2.002)+(5.017), (I-302)+(2.002)+(5.018), (I-302)+(2.002)+(5.019), (I-302)+(2.002)+(5.020), (I-302)+(2.002)+(5.021), (I-302)+(2.002)+(5.022), (I-302)+(2.002)+(5.023), (I-302)+(2.002)+(6.001), (I-302)+(2.002)+(6.002), (I-302)+(2.002)+(6.003), (I-302)+(2.002)+(6.004), (I-302)+(2.002)+(7.001), (I-302)+(2.002)+(7.002), (I-302)+(2.002)+(7.003), (I-302)+(2.002)+(7.004), (I-302)+(2.002)+(7.005), (I-302)+(2.002)+(7.006), (I-302)+(2.002)+(9.001), (I-302)+(2.002)+(9.002), (I-302)+(2.002)+(9.003), (I-302)+(2.002)+(9.004), (I-302)+(2.002)+(9.005), (I-302)+(2.002)+(9.006), (I-302)+(2.002)+(9.007), (I-302)+(2.002)+(9.008), (I-302)+(2.002)+(9.009), (I-302)+(2.002)+(14.001), (I-302)+(2.002)+(14.002), (I-302)+(2.002)+(15.008), (I-302)+(2.002)+(15.011), (I-302)+(2.002)+(15.012), (I-302)+(2.002)+(15.016), (I-302)+(2.002)+(15.025), (I-302)+(2.002)+(15.027), (I-302)+(2.002)+(15.047), (I-302)+(2.002)+(15.063), (I-302)+(2.002)+(15.064), (I-302)+(2.002)+(16.001), (I-302)+(2.002)+(16.002), (I-302)+(2.002)+(16.003), (I-302)+(2.002)+(16.004), (I-302)+(2.002)+(16.005), (I-302)+(2.002)+(16.006), (I-302)+(2.002)+(16.007), (I-302)+(2.002)+(16.008), (I-302)+(2.002)+(17.001), (I-302)+(2.002)+(17.002), (I-302)+(2.002)+(17.003), (I-302)+(2.002)+(17.004), (I-302)+(2.002)+(17.005), (I-302)+(2.002)+(17.006), (I-302)+(2.002)+(17.007), (I-302)+(2.002)+(17.008), (I-302)+(2.002)+(17.009), (I-302)+(2.002)+(17.010), (I-302)+(2.002)+(17.011), (I-302)+(2.002)+(17.012), (I-302)+(2.002)+(18.001), (I-302)+(2.003)+(3.001), (I-302)+(2.003)+(3.002), (I-302)+(2.003)+(3.003), (I-302)+(2.003)+(3.004), (I-302)+(2.003)+(3.005), (I-302)+(2.003)+(3.006), (I-302)+(2.003)+(3.007), (I-302)+(2.003)+(3.008), (I-302)+(2.003)+(3.009), (I-302)+(2.003)+(3.010), (I-302)+(2.003)+(3.011), (I-302)+(2.003)+(3.012), (I-302)+(2.003)+(3.013), (I-302)+(2.003)+(3.014), (I-302)+(2.003)+(3.015), (I-302)+(2.003)+(3.016), (I-302)+(2.003)+(3.017), (I-302)+(2.003)+(3.018), (I-302)+(2.003)+(3.019), (I-302)+(2.003)+(3.020), (I-302)+(2.003)+(3.021), (I-302)+(2.003)+(3.022), (I-302)+(2.003)+(3.023), (I-302)+(2.003)+(3.024), (I-302)+(2.003)+(3.025), (I-302)+(2.003)+(3.026), (I-302)+(2.003)+(3.027), (I-302)+(2.003)+(3.028), (I-302)+(2.003)+(3.029), (I-302)+(2.003)+(3.030), (I-302)+(2.003)+(3.031), (I-302)+(2.003)+(5.001), (I-302)+(2.003)+(5.002), (I-302)+(2.003)+(5.003), (I-302)+(2.003)+(5.004), (I-302)+(2.003)+(5.005), (I-302)+(2.003)+(5.006), (I-302)+(2.003)+(5.007), (I-302)+(2.003)+(5.008), (I-302)+(2.003)+(5.009), (I-302)+(2.003)+(5.010), (I-302)+(2.003)+(5.011), (I-302)+(2.003)+(5.012), (I-302)+(2.003)+(5.013), (I-302)+(2.003)+(5.014), (I-302)+(2.003)+(5.015), (I-302)+(2.003)+(5.016), (I-302)+(2.003)+(5.017), (I-302)+(2.003)+(5.018), (I-302)+(2.003)+(5.019), (I-302)+(2.003)+(5.020), (I-302)+(2.003)+(5.021), (I-302)+(2.003)+(5.022), (I-302)+(2.003)+(5.023), (I-302)+(2.003)+(6.001), (I-302)+(2.003)+(6.002), (I-302)+(2.003)+(6.003), (I-302)+(2.003)+(6.004), (I-302)+(2.003)+(7.001), (I-302)+(2.003)+(7.002), (I-302)+(2.003)+(7.003), (I-302)+(2.003)+(7.004), (I-302)+(2.003)+(7.005), (I-302)+(2.003)+(7.006), (I-302)+(2.003)+(9.001), (I-302)+(2.003)+(9.002), (I-302)+(2.003)+(9.003), (I-302)+(2.003)+(9.004), (I-302)+(2.003)+(9.005), (I-302)+(2.003)+(9.006), (I-302)+(2.003)+(9.007), (I-302)+(2.003)+(9.008), (I-302)+(2.003)+(9.009), (I-302)+(2.003)+(14.001), (I-302)+(2.003)+(14.002), (I-302)+(2.003)+(15.008), (I-302)+(2.003)+(15.011), (I-302)+(2.003)+(15.012), (I-302)+(2.003)+(15.016), (I-302)+(2.003)+(15.025), (I-302)+(2.003)+(15.027), (I-302)+(2.003)+(15.047), (I-302)+(2.003)+(15.063), (I-302)+(2.003)+(15.064), (I-302)+(2.003)+(16.001), (I-302)+(2.003)+(16.002), (I-302)+(2.003)+(16.003), (I-302)+(2.003)+(16.004), (I-302)+(2.003)+(16.005), (I-302)+(2.003)+(16.006), (I-302)+(2.003)+(16.007), (I-302)+(2.003)+(16.008), (I-302)+(2.003)+(17.001), (I-302)+(2.003)+(17.002), (I-302)+(2.003)+(17.003), (I-302)+(2.003)+(17.004), (I-302)+(2.003)+(17.005), (I-302)+(2.003)+(17.006), (I-302)+(2.003)+(17.007), (I-302)+(2.003)+(17.008), (I-302)+(2.003)+(17.009), (I-302)+(2.003)+(17.010), (I-302)+(2.003)+(17.011), (I-302)+(2.003)+(17.012), (I-302)+(2.003)+(18.001), (I-302)+(2.004)+(3.001), (I-302)+(2.004)+(3.002), (I-302)+(2.004)+(3.003), (I-302)+(2.004)+(3.004), (I-302)+(2.004)+(3.005), (I-302)+(2.004)+(3.006), (I-302)+(2.004)+(3.007), (I-302)+(2.004)+(3.008), (I-302)+(2.004)+(3.009), (I-302)+(2.004)+(3.010), (I-302)+(2.004)+(3.011), (I-302)+(2.004)+(3.012), (I-302)+(2.004)+(3.013), (I-302)+(2.004)+(3.014), (I-302)+(2.004)+(3.015), (I-302)+(2.004)+(3.016), (I-302)+(2.004)+(3.017), (I-302)+(2.004)+(3.018), (I-302)+(2.004)+(3.019), (I-302)+(2.004)+(3.020), (I-302)+(2.004)+(3.021), (I-302)+(2.004)+(3.022), (I-302)+(2.004)+(3.023), (I-302)+(2.004)+(3.024), (I-302)+(2.004)+(3.025), (I-302)+(2.004)+(3.026), (I-302)+(2.004)+(3.027), (I-302)+(2.004)+(3.028), (I-302)+(2.004)+(3.029), (I-302)+(2.004)+(3.030), (I-302)+(2.004)+(3.031), (I-302)+(2.004)+(5.001), (I-302)+(2.004)+(5.002), (I-302)+(2.004)+(5.003), (I-302)+(2.004)+(5.004), (I-302)+(2.004)+(5.005), (I-302)+(2.004)+(5.006), (I-302)+(2.004)+(5.007), (I-302)+(2.004)+(5.008), (I-302)+(2.004)+(5.009), (I-302)+(2.004)+(5.010), (I-302)+(2.004)+(5.011), (I-302)+(2.004)+(5.012), (I-302)+(2.004)+(5.013), (I-302)+(2.004)+(5.014), (I-302)+(2.004)+(5.015), (I-302)+(2.004)+(5.016), (I-302)+(2.004)+(5.017), (I-302)+(2.004)+(5.018), (I-302)+(2.004)+(5.019), (I-302)+(2.004)+(5.020), (I-302)+(2.004)+(5.021), (I-302)+(2.004)+(5.022), (I-302)+(2.004)+(5.023), (I-302)+(2.004)+(6.001), (I-302)+(2.004)+(6.002), (I-302)+(2.004)+(6.003), (I-302)+(2.004)+(6.004), (I-302)+(2.004)+(7.001), (I-302)+(2.004)+(7.002), (I-302)+(2.004)+(7.003), (I-302)+(2.004)+(7.004), (I-302)+(2.004)+(7.005), (I-302)+(2.004)+(7.006), (I-302)+(2.004)+(9.001), (I-302)+(2.004)+(9.002), (I-302)+(2.004)+(9.003), (I-302)+(2.004)+(9.004), (I-302)+(2.004)+(9.005), (I-302)+(2.004)+(9.006), (I-302)+(2.004)+(9.007), (I-302)+(2.004)+(9.008), (I-302)+(2.004)+(9.009), (I-302)+(2.004)+(14.001), (I-302)+(2.004)+(14.002), (I-302)+(2.004)+(15.008), (I-302)+(2.004)+(15.011), (I-302)+(2.004)+(15.012), (I-302)+(2.004)+(15.016), (I-302)+(2.004)+(15.025), (I-302)+(2.004)+(15.027), (I-302)+(2.004)+(15.047), (I-302)+(2.004)+(15.063), (I-302)+(2.004)+(15.064), (I-302)+(2.004)+(16.001), (I-302)+(2.004)+(16.002), (I-302)+(2.004)+(16.003), (I-302)+(2.004)+(16.004), (I-302)+(2.004)+(16.005), (I-302)+(2.004)+(16.006), (I-302)+(2.004)+(16.007), (I-302)+(2.004)+(16.008), (I-302)+(2.004)+(17.001), (I-302)+(2.004)+(17.002), (I-302)+(2.004)+(17.003), (I-302)+(2.004)+(17.004), (I-302)+(2.004)+(17.005), (I-302)+(2.004)+(17.006), (I-302)+(2.004)+(17.007), (I-302)+(2.004)+(17.008), (I-302)+(2.004)+(17.009), (I-302)+(2.004)+(17.010), (I-302)+(2.004)+(17.011), (I-302)+(2.004)+(17.012), (I-302)+(2.004)+(18.001), (I-302)+(2.005)+(3.001), (I-302)+(2.005)+(3.002), (I-302)+(2.005)+(3.003), (I-302)+(2.005)+(3.004), (I-302)+(2.005)+(3.005), (I-302)+(2.005)+(3.006), (I-302)+(2.005)+(3.007), (I-302)+(2.005)+(3.008), (I-302)+(2.005)+(3.009), (I-302)+(2.005)+(3.010), (I-302)+(2.005)+(3.011), (I-302)+(2.005)+(3.012), (I-302)+(2.005)+(3.013), (I-302)+(2.005)+(3.014), (I-302)+(2.005)+(3.015), (I-302)+(2.005)+(3.016), (I-302)+(2.005)+(3.017), (I-302)+(2.005)+(3.018), (I-302)+(2.005)+(3.019), (I-302)+(2.005)+(3.020), (I-302)+(2.005)+(3.021), (I-302)+(2.005)+(3.022), (I-302)+(2.005)+(3.023), (I-302)+(2.005)+(3.024), (I-302)+(2.005)+(3.025), (I-302)+(2.005)+(3.026), (I-302)+(2.005)+(3.027), (I-302)+(2.005)+(3.028), (I-302)+(2.005)+(3.029), (I-302)+(2.005)+(3.030), (I-302)+(2.005)+(3.031), (I-302)+(2.005)+(5.001), (I-302)+(2.005)+(5.002), (I-302)+(2.005)+(5.003), (I-302)+(2.005)+(5.004), (I-302)+(2.005)+(5.005), (I-302)+(2.005)+(5.006), (I-302)+(2.005)+(5.007), (I-302)+(2.005)+(5.008), (I-302)+(2.005)+(5.009), (I-302)+(2.005)+(5.010), (I-302)+(2.005)+(5.011), (I-302)+(2.005)+(5.012), (I-302)+(2.005)+(5.013), (I-302)+(2.005)+(5.014), (I-302)+(2.005)+(5.015), (I-302)+(2.005)+(5.016), (I-302)+(2.005)+(5.017), (I-302)+(2.005)+(5.018), (I-302)+(2.005)+(5.019), (I-302)+(2.005)+(5.020), (I-302)+(2.005)+(5.021), (I-302)+(2.005)+(5.022), (I-302)+(2.005)+(5.023), (I-302)+(2.005)+(6.001), (I-302)+(2.005)+(6.002), (I-302)+(2.005)+(6.003), (I-302)+(2.005)+(6.004), (I-302)+(2.005)+(7.001), (I-302)+(2.005)+(7.002), (I-302)+(2.005)+(7.003), (I-302)+(2.005)+(7.004), (I-302)+(2.005)+(7.005), (I-302)+(2.005)+(7.006), (I-302)+(2.005)+(9.001), (I-302)+(2.005)+(9.002), (I-302)+(2.005)+(9.003), (I-302)+(2.005)+(9.004), (I-302)+(2.005)+(9.005), (I-302)+(2.005)+(9.006), (I-302)+(2.005)+(9.007), (I-302)+(2.005)+(9.008), (I-302)+(2.005)+(9.009), (I-302)+(2.005)+(14.001), (I-302)+(2.005)+(14.002), (I-302)+(2.005)+(15.008), (I-302)+(2.005)+(15.011), (I-302)+(2.005)+(15.012), (I-302)+(2.005)+(15.016), (I-302)+(2.005)+(15.025), (I-302)+(2.005)+(15.027), (I-302)+(2.005)+(15.047), (I-302)+(2.005)+(15.063), (I-302)+(2.005)+(15.064), (I-302)+(2.005)+(16.001), (I-302)+(2.005)+(16.002), (I-302)+(2.005)+(16.003), (I-302)+(2.005)+(16.004), (I-302)+(2.005)+(16.005), (I-302)+(2.005)+(16.006), (I-302)+(2.005)+(16.007), (I-302)+(2.005)+(16.008), (I-302)+(2.005)+(17.001), (I-302)+(2.005)+(17.002), (I-302)+(2.005)+(17.003), (I-302)+(2.005)+(17.004), (I-302)+(2.005)+(17.005), (I-302)+(2.005)+(17.006), (I-302)+(2.005)+(17.007), (I-302)+(2.005)+(17.008), (I-302)+(2.005)+(17.009), (I-302)+(2.005)+(17.010), (I-302)+(2.005)+(17.011), (I-302)+(2.005)+(17.012), (I-302)+(2.005)+(18.001), (I-302)+(2.006)+(3.001), (I-302)+(2.006)+(3.002), (I-302)+(2.006)+(3.003), (I-302)+(2.006)+(3.004), (I-302)+(2.006)+(3.005), (I-302)+(2.006)+(3.006), (I-302)+(2.006)+(3.007), (I-302)+(2.006)+(3.008), (I-302)+(2.006)+(3.009), (I-302)+(2.006)+(3.010), (I-302)+(2.006)+(3.011), (I-302)+(2.006)+(3.012), (I-302)+(2.006)+(3.013), (I-302)+(2.006)+(3.014), (I-302)+(2.006)+(3.015), (I-302)+(2.006)+(3.016), (I-302)+(2.006)+(3.017), (I-302)+(2.006)+(3.018), (I-302)+(2.006)+(3.019), (I-302)+(2.006)+(3.020), (I-302)+(2.006)+(3.021), (I-302)+(2.006)+(3.022), (I-302)+(2.006)+(3.023), (I-302)+(2.006)+(3.024), (I-302)+(2.006)+(3.025), (I-302)+(2.006)+(3.026), (I-302)+(2.006)+(3.027), (I-302)+(2.006)+(3.028), (I-302)+(2.006)+(3.029), (I-302)+(2.006)+(3.030), (I-302)+(2.006)+(3.031), (I-302)+(2.006)+(5.001), (I-302)+(2.006)+(5.002), (I-302)+(2.006)+(5.003), (I-302)+(2.006)+(5.004), (I-302)+(2.006)+(5.005), (I-302)+(2.006)+(5.006), (I-302)+(2.006)+(5.007), (I-302)+(2.006)+(5.008), (I-302)+(2.006)+(5.009), (I-302)+(2.006)+(5.010), (I-302)+(2.006)+(5.011), (I-302)+(2.006)+(5.012), (I-302)+(2.006)+(5.013), (I-302)+(2.006)+(5.014), (I-302)+(2.006)+(5.015), (I-302)+(2.006)+(5.016), (I-302)+(2.006)+(5.017), (I-302)+(2.006)+(5.018), (I-302)+(2.006)+(5.019), (I-302)+(2.006)+(5.020), (I-302)+(2.006)+(5.021), (I-302)+(2.006)+(5.022), (I-302)+(2.006)+(5.023), (I-302)+(2.006)+(6.001), (I-302)+(2.006)+(6.002), (I-302)+(2.006)+(6.003), (I-302)+(2.006)+(6.004), (I-302)+(2.006)+(7.001), (I-302)+(2.006)+(7.002), (I-302)+(2.006)+(7.003), (I-302)+(2.006)+(7.004), (I-302)+(2.006)+(7.005), (I-302)+(2.006)+(7.006), (I-302)+(2.006)+(9.001), (I-302)+(2.006)+(9.002), (I-302)+(2.006)+(9.003), (I-302)+(2.006)+(9.004), (I-302)+(2.006)+(9.005), (I-302)+(2.006)+(9.006), (I-302)+(2.006)+(9.007), (I-302)+(2.006)+(9.008), (I-302)+(2.006)+(9.009), (I-302)+(2.006)+(14.001), (I-302)+(2.006)+(14.002), (I-302)+(2.006)+(15.008), (I-302)+(2.006)+(15.011), (I-302)+(2.006)+(15.012), (I-302)+(2.006)+(15.016), (I-302)+(2.006)+(15.025), (I-302)+(2.006)+(15.027), (I-302)+(2.006)+(15.047), (I-302)+(2.006)+(15.063), (I-302)+(2.006)+(15.064), (I-302)+(2.006)+(16.001), (I-302)+(2.006)+(16.002), (I-302)+(2.006)+(16.003), (I-302)+(2.006)+(16.004), (I-302)+(2.006)+(16.005), (I-302)+(2.006)+(16.006), (I-302)+(2.006)+(16.007), (I-302)+(2.006)+(16.008), (I-302)+(2.006)+(17.001), (I-302)+(2.006)+(17.002), (I-302)+(2.006)+(17.003), (I-302)+(2.006)+(17.004), (I-302)+(2.006)+(17.005), (I-302)+(2.006)+(17.006), (I-302)+(2.006)+(17.007), (I-302)+(2.006)+(17.008), (I-302)+(2.006)+(17.009), (I-302)+(2.006)+(17.010), (I-302)+(2.006)+(17.011), (I-302)+(2.006)+(17.012), (I-302)+(2.006)+(18.001), (I-302)+(2.007)+(3.001), (I-302)+(2.007)+(3.002), (I-302)+(2.007)+(3.003), (I-302)+(2.007)+(3.004), (I-302)+(2.007)+(3.005), (I-302)+(2.007)+(3.006), (I-302)+(2.007)+(3.007), (I-302)+(2.007)+(3.008), (I-302)+(2.007)+(3.009), (I-302)+(2.007)+(3.010), (I-302)+(2.007)+(3.011), (I-302)+(2.007)+(3.012), (I-302)+(2.007)+(3.013), (I-302)+(2.007)+(3.014), (I-302)+(2.007)+(3.015), (I-302)+(2.007)+(3.016), (I-302)+(2.007)+(3.017), (I-302)+(2.007)+(3.018), (I-302)+(2.007)+(3.019), (I-302)+(2.007)+(3.020), (I-302)+(2.007)+(3.021), (I-302)+(2.007)+(3.022), (I-302)+(2.007)+(3.023), (I-302)+(2.007)+(3.024), (I-302)+(2.007)+(3.025), (I-302)+(2.007)+(3.026), (I-302)+(2.007)+(3.027), (I-302)+(2.007)+(3.028), (I-302)+(2.007)+(3.029), (I-302)+(2.007)+(3.030), (I-302)+(2.007)+(3.031), (I-302)+(2.007)+(5.001), (I-302)+(2.007)+(5.002), (I-302)+(2.007)+(5.003), (I-302)+(2.007)+(5.004), (I-302)+(2.007)+(5.005), (I-302)+(2.007)+(5.006), (I-302)+(2.007)+(5.007), (I-302)+(2.007)+(5.008), (I-302)+(2.007)+(5.009), (I-302)+(2.007)+(5.010), (I-302)+(2.007)+(5.011), (I-302)+(2.007)+(5.012), (I-302)+(2.007)+(5.013), (I-302)+(2.007)+(5.014), (I-302)+(2.007)+(5.015), (I-302)+(2.007)+(5.016), (I-302)+(2.007)+(5.017), (I-302)+(2.007)+(5.018), (I-302)+(2.007)+(5.019), (I-302)+(2.007)+(5.020), (I-302)+(2.007)+(5.021), (I-302)+(2.007)+(5.022), (I-302)+(2.007)+(5.023), (I-302)+(2.007)+(6.001), (I-302)+(2.007)+(6.002), (I-302)+(2.007)+(6.003), (I-302)+(2.007)+(6.004), (I-302)+(2.007)+(7.001), (I-302)+(2.007)+(7.002), (I-302)+(2.007)+(7.003), (I-302)+(2.007)+(7.004), (I-302)+(2.007)+(7.005), (I-302)+(2.007)+(7.006), (I-302)+(2.007)+(9.001), (I-302)+(2.007)+(9.002), (I-302)+(2.007)+(9.003), (I-302)+(2.007)+(9.004), (I-302)+(2.007)+(9.005), (I-302)+(2.007)+(9.006), (I-302)+(2.007)+(9.007), (I-302)+(2.007)+(9.008), (I-302)+(2.007)+(9.009), (I-302)+(2.007)+(14.001), (I-302)+(2.007)+(14.002), (I-302)+(2.007)+(15.008), (I-302)+(2.007)+(15.011), (I-302)+(2.007)+(15.012), (I-302)+(2.007)+(15.016), (I-302)+(2.007)+(15.025), (I-302)+(2.007)+(15.027), (I-302)+(2.007)+(15.047), (I-302)+(2.007)+(15.063), (I-302)+(2.007)+(15.064), (I-302)+(2.007)+(16.001), (I-302)+(2.007)+(16.002), (I-302)+(2.007)+(16.003), (I-302)+(2.007)+(16.004), (I-302)+(2.007)+(16.005), (I-302)+(2.007)+(16.006), (I-302)+(2.007)+(16.007), (I-302)+(2.007)+(16.008), (I-302)+(2.007)+(17.001), (I-302)+(2.007)+(17.002), (I-302)+(2.007)+(17.003), (I-302)+(2.007)+(17.004), (I-302)+(2.007)+(17.005), (I-302)+(2.007)+(17.006), (I-302)+(2.007)+(17.007), (I-302)+(2.007)+(17.008), (I-302)+(2.007)+(17.009), (I-302)+(2.007)+(17.010), (I-302)+(2.007)+(17.011), (I-302)+(2.007)+(17.012), (I-302)+(2.007)+(18.001), (I-302)+(2.008)+(3.001), (I-302)+(2.008)+(3.002), (I-302)+(2.008)+(3.003), (I-302)+(2.008)+(3.004), (I-302)+(2.008)+(3.005), (I-302)+(2.008)+(3.006), (I-302)+(2.008)+(3.007), (I-302)+(2.008)+(3.008), (I-302)+(2.008)+(3.009), (I-302)+(2.008)+(3.010), (I-302)+(2.008)+(3.011), (I-302)+(2.008)+(3.012), (I-302)+(2.008)+(3.013), (I-302)+(2.008)+(3.014), (I-302)+(2.008)+(3.015), (I-302)+(2.008)+(3.016), (I-302)+(2.008)+(3.017), (I-302)+(2.008)+(3.018), (I-302)+(2.008)+(3.019), (I-302)+(2.008)+(3.020), (I-302)+(2.008)+(3.021), (I-302)+(2.008)+(3.022), (I-302)+(2.008)+(3.023), (I-302)+(2.008)+(3.024), (I-302)+(2.008)+(3.025), (I-302)+(2.008)+(3.026), (I-302)+(2.008)+(3.027), (I-302)+(2.008)+(3.028), (I-302)+(2.008)+(3.029), (I-302)+(2.008)+(3.030), (I-302)+(2.008)+(3.031), (I-302)+(2.008)+(5.001), (I-302)+(2.008)+(5.002), (I-302)+(2.008)+(5.003), (I-302)+(2.008)+(5.004), (I-302)+(2.008)+(5.005), (I-302)+(2.008)+(5.006), (I-302)+(2.008)+(5.007), (I-302)+(2.008)+(5.008), (I-302)+(2.008)+(5.009), (I-302)+(2.008)+(5.010), (I-302)+(2.008)+(5.011), (I-302)+(2.008)+(5.012), (I-302)+(2.008)+(5.013), (I-302)+(2.008)+(5.014), (I-302)+(2.008)+(5.015), (I-302)+(2.008)+(5.016), (I-302)+(2.008)+(5.017), (I-302)+(2.008)+(5.018), (I-302)+(2.008)+(5.019), (I-302)+(2.008)+(5.020), (I-302)+(2.008)+(5.021), (I-302)+(2.008)+(5.022), (I-302)+(2.008)+(5.023), (I-302)+(2.008)+(6.001), (I-302)+(2.008)+(6.002), (I-302)+(2.008)+(6.003), (I-302)+(2.008)+(6.004), (I-302)+(2.008)+(7.001), (I-302)+(2.008)+(7.002), (I-302)+(2.008)+(7.003), (I-302)+(2.008)+(7.004), (I-302)+(2.008)+(7.005), (I-302)+(2.008)+(7.006), (I-302)+(2.008)+(9.001), (I-302)+(2.008)+(9.002), (I-302)+(2.008)+(9.003), (I-302)+(2.008)+(9.004), (I-302)+(2.008)+(9.005), (I-302)+(2.008)+(9.006), (I-302)+(2.008)+(9.007), (I-302)+(2.008)+(9.008), (I-302)+(2.008)+(9.009), (I-302)+(2.008)+(14.001), (I-302)+(2.008)+(14.002), (I-302)+(2.008)+(15.008), (I-302)+(2.008)+(15.011), (I-302)+(2.008)+(15.012), (I-302)+(2.008)+(15.016), (I-302)+(2.008)+(15.025), (I-302)+(2.008)+(15.027), (I-302)+(2.008)+(15.047), (I-302)+(2.008)+(15.063), (I-302)+(2.008)+(15.064), (I-302)+(2.008)+(16.001), (I-302)+(2.008)+(16.002), (I-302)+(2.008)+(16.003), (I-302)+(2.008)+(16.004), (I-302)+(2.008)+(16.005), (I-302)+(2.008)+(16.006), (I-302)+(2.008)+(16.007), (I-302)+(2.008)+(16.008), (I-302)+(2.008)+(17.001), (I-302)+(2.008)+(17.002), (I-302)+(2.008)+(17.003), (I-302)+(2.008)+(17.004), (I-302)+(2.008)+(17.005), (I-302)+(2.008)+(17.006), (I-302)+(2.008)+(17.007), (I-302)+(2.008)+(17.008), (I-302)+(2.008)+(17.009), (I-302)+(2.008)+(17.010), (I-302)+(2.008)+(17.011), (I-302)+(2.008)+(17.012), (I-302)+(2.008)+(18.001), (I-302)+(2.009)+(3.001), (I-302)+(2.009)+(3.002), (I-302)+(2.009)+(3.003), (I-302)+(2.009)+(3.004), (I-302)+(2.009)+(3.005), (I-302)+(2.009)+(3.006), (I-302)+(2.009)+(3.007), (I-302)+(2.009)+(3.008), (I-302)+(2.009)+(3.009), (I-302)+(2.009)+(3.010), (I-302)+(2.009)+(3.011), (I-302)+(2.009)+(3.012), (I-302)+(2.009)+(3.013), (I-302)+(2.009)+(3.014), (I-302)+(2.009)+(3.015), (I-302)+(2.009)+(3.016), (I-302)+(2.009)+(3.017), (I-302)+(2.009)+(3.018), (I-302)+(2.009)+(3.019), (I-302)+(2.009)+(3.020), (I-302)+(2.009)+(3.021), (I-302)+(2.009)+(3.022), (I-302)+(2.009)+(3.023), (I-302)+(2.009)+(3.024), (I-302)+(2.009)+(3.025), (I-302)+(2.009)+(3.026), (I-302)+(2.009)+(3.027), (I-302)+(2.009)+(3.028), (I-302)+(2.009)+(3.029), (I-302)+(2.009)+(3.030), (I-302)+(2.009)+(3.031), (I-302)+(2.009)+(5.001), (I-302)+(2.009)+(5.002), (I-302)+(2.009)+(5.003), (I-302)+(2.009)+(5.004), (I-302)+(2.009)+(5.005), (I-302)+(2.009)+(5.006), (I-302)+(2.009)+(5.007), (I-302)+(2.009)+(5.008), (I-302)+(2.009)+(5.009), (I-302)+(2.009)+(5.010), (I-302)+(2.009)+(5.011), (I-302)+(2.009)+(5.012), (I-302)+(2.009)+(5.013), (I-302)+(2.009)+(5.014), (I-302)+(2.009)+(5.015), (I-302)+(2.009)+(5.016), (I-302)+(2.009)+(5.017), (I-302)+(2.009)+(5.018), (I-302)+(2.009)+(5.019), (I-302)+(2.009)+(5.020), (I-302)+(2.009)+(5.021), (I-302)+(2.009)+(5.022), (I-302)+(2.009)+(5.023), (I-302)+(2.009)+(6.001), (I-302)+(2.009)+(6.002), (I-302)+(2.009)+(6.003), (I-302)+(2.009)+(6.004), (I-302)+(2.009)+(7.001), (I-302)+(2.009)+(7.002), (I-302)+(2.009)+(7.003), (I-302)+(2.009)+(7.004), (I-302)+(2.009)+(7.005), (I-302)+(2.009)+(7.006), (I-302)+(2.009)+(9.001), (I-302)+(2.009)+(9.002), (I-302)+(2.009)+(9.003), (I-302)+(2.009)+(9.004), (I-302)+(2.009)+(9.005), (I-302)+(2.009)+(9.006), (I-302)+(2.009)+(9.007), (I-302)+(2.009)+(9.008), (I-302)+(2.009)+(9.009), (I-302)+(2.009)+(14.001), (I-302)+(2.009)+(14.002), (I-302)+(2.009)+(15.008), (I-302)+(2.009)+(15.011), (I-302)+(2.009)+(15.012), (I-302)+(2.009)+(15.016), (I-302)+(2.009)+(15.025), (I-302)+(2.009)+(15.027), (I-302)+(2.009)+(15.047), (I-302)+(2.009)+(15.063), (I-302)+(2.009)+(15.064), (I-302)+(2.009)+(16.001), (I-302)+(2.009)+(16.002), (I-302)+(2.009)+(16.003), (I-302)+(2.009)+(16.004), (I-302)+(2.009)+(16.005), (I-302)+(2.009)+(16.006), (I-302)+(2.009)+(16.007), (I-302)+(2.009)+(16.008), (I-302)+(2.009)+(17.001), (I-302)+(2.009)+(17.002), (I-302)+(2.009)+(17.003), (I-302)+(2.009)+(17.004), (I-302)+(2.009)+(17.005), (I-302)+(2.009)+(17.006), (I-302)+(2.009)+(17.007), (I-302)+(2.009)+(17.008), (I-302)+(2.009)+(17.009), (I-302)+(2.009)+(17.010), (I-302)+(2.009)+(17.011), (I-302)+(2.009)+(17.012), (I-302)+(2.009)+(18.001), (I-302)+(2.010)+(3.001), (I-302)+(2.010)+(3.002), (I-302)+(2.010)+(3.003), (I-302)+(2.010)+(3.004), (I-302)+(2.010)+(3.005), (I-302)+(2.010)+(3.006), (I-302)+(2.010)+(3.007), (I-302)+(2.010)+(3.008), (I-302)+(2.010)+(3.009), (I-302)+(2.010)+(3.010), (I-302)+(2.010)+(3.011), (I-302)+(2.010)+(3.012), (I-302)+(2.010)+(3.013), (I-302)+(2.010)+(3.014), (I-302)+(2.010)+(3.015), (I-302)+(2.010)+(3.016), (I-302)+(2.010)+(3.017), (I-302)+(2.010)+(3.018), (I-302)+(2.010)+(3.019), (I-302)+(2.010)+(3.020), (I-302)+(2.010)+(3.021), (I-302)+(2.010)+(3.022), (I-302)+(2.010)+(3.023), (I-302)+(2.010)+(3.024), (I-302)+(2.010)+(3.025), (I-302)+(2.010)+(3.026), (I-302)+(2.010)+(3.027), (I-302)+(2.010)+(3.028), (I-302)+(2.010)+(3.029), (I-302)+(2.010)+(3.030), (I-302)+(2.010)+(3.031), (I-302)+(2.010)+(5.001), (I-302)+(2.010)+(5.002), (I-302)+(2.010)+(5.003), (I-302)+(2.010)+(5.004), (I-302)+(2.010)+(5.005), (I-302)+(2.010)+(5.006), (I-302)+(2.010)+(5.007), (I-302)+(2.010)+(5.008), (I-302)+(2.010)+(5.009), (I-302)+(2.010)+(5.010), (I-302)+(2.010)+(5.011), (I-302)+(2.010)+(5.012), (I-302)+(2.010)+(5.013), (I-302)+(2.010)+(5.014), (I-302)+(2.010)+(5.015), (I-302)+(2.010)+(5.016), (I-302)+(2.010)+(5.017), (I-302)+(2.010)+(5.018), (I-302)+(2.010)+(5.019), (I-302)+(2.010)+(5.020), (I-302)+(2.010)+(5.021), (I-302)+(2.010)+(5.022), (I-302)+(2.010)+(5.023), (I-302)+(2.010)+(6.001), (I-302)+(2.010)+(6.002), (I-302)+(2.010)+(6.003), (I-302)+(2.010)+(6.004), (I-302)+(2.010)+(7.001), (I-302)+(2.010)+(7.002), (I-302)+(2.010)+(7.003), (I-302)+(2.010)+(7.004), (I-302)+(2.010)+(7.005), (I-302)+(2.010)+(7.006), (I-302)+(2.010)+(9.001), (I-302)+(2.010)+(9.002), (I-302)+(2.010)+(9.003), (I-302)+(2.010)+(9.004), (I-302)+(2.010)+(9.005), (I-302)+(2.010)+(9.006), (I-302)+(2.010)+(9.007), (I-302)+(2.010)+(9.008), (I-302)+(2.010)+(9.009), (I-302)+(2.010)+(14.001), (I-302)+(2.010)+(14.002), (I-302)+(2.010)+(15.008), (I-302)+(2.010)+(15.011), (I-302)+(2.010)+(15.012), (I-302)+(2.010)+(15.016), (I-302)+(2.010)+(15.025), (I-302)+(2.010)+(15.027), (I-302)+(2.010)+(15.047), (I-302)+(2.010)+(15.063), (I-302)+(2.010)+(15.064), (I-302)+(2.010)+(16.001), (I-302)+(2.010)+(16.002), (I-302)+(2.010)+(16.003), (I-302)+(2.010)+(16.004), (I-302)+(2.010)+(16.005), (I-302)+(2.010)+(16.006), (I-302)+(2.010)+(16.007), (I-302)+(2.010)+(16.008), (I-302)+(2.010)+(17.001), (I-302)+(2.010)+(17.002), (I-302)+(2.010)+(17.003), (I-302)+(2.010)+(17.004), (I-302)+(2.010)+(17.005), (I-302)+(2.010)+(17.006), (I-302)+(2.010)+(17.007), (I-302)+(2.010)+(17.008), (I-302)+(2.010)+(17.009), (I-302)+(2.010)+(17.010), (I-302)+(2.010)+(17.011), (I-302)+(2.010)+(17.012), (I-302)+(2.010)+(18.001), (I-302)+(2.011)+(3.001), (I-302)+(2.011)+(3.002), (I-302)+(2.011)+(3.003), (I-302)+(2.011)+(3.004), (I-302)+(2.011)+(3.005), (I-302)+(2.011)+(3.006), (I-302)+(2.011)+(3.007), (I-302)+(2.011)+(3.008), (I-302)+(2.011)+(3.009), (I-302)+(2.011)+(3.010), (I-302)+(2.011)+(3.011), (I-302)+(2.011)+(3.012), (I-302)+(2.011)+(3.013), (I-302)+(2.011)+(3.014), (I-302)+(2.011)+(3.015), (I-302)+(2.011)+(3.016), (I-302)+(2.011)+(3.017), (I-302)+(2.011)+(3.018), (I-302)+(2.011)+(3.019), (I-302)+(2.011)+(3.020), (I-302)+(2.011)+(3.021), (I-302)+(2.011)+(3.022), (I-302)+(2.011)+(3.023), (I-302)+(2.011)+(3.024), (I-302)+(2.011)+(3.025), (I-302)+(2.011)+(3.026), (I-302)+(2.011)+(3.027), (I-302)+(2.011)+(3.028), (I-302)+(2.011)+(3.029), (I-302)+(2.011)+(3.030), (I-302)+(2.011)+(3.031), (I-302)+(2.011)+(5.001), (I-302)+(2.011)+(5.002), (I-302)+(2.011)+(5.003), (I-302)+(2.011)+(5.004), (I-302)+(2.011)+(5.005), (I-302)+(2.011)+(5.006), (I-302)+(2.011)+(5.007), (I-302)+(2.011)+(5.008), (I-302)+(2.011)+(5.009), (I-302)+(2.011)+(5.010), (I-302)+(2.011)+(5.011), (I-302)+(2.011)+(5.012), (I-302)+(2.011)+(5.013), (I-302)+(2.011)+(5.014), (I-302)+(2.011)+(5.015), (I-302)+(2.011)+(5.016), (I-302)+(2.011)+(5.017), (I-302)+(2.011)+(5.018), (I-302)+(2.011)+(5.019), (I-302)+(2.011)+(5.020), (I-302)+(2.011)+(5.021), (I-302)+(2.011)+(5.022), (I-302)+(2.011)+(5.023), (I-302)+(2.011)+(6.001), (I-302)+(2.011)+(6.002), (I-302)+(2.011)+(6.003), (I-302)+(2.011)+(6.004), (I-302)+(2.011)+(7.001), (I-302)+(2.011)+(7.002), (I-302)+(2.011)+(7.003), (I-302)+(2.011)+(7.004), (I-302)+(2.011)+(7.005), (I-302)+(2.011)+(7.006), (I-302)+(2.011)+(9.001), (I-302)+(2.011)+(9.002), (I-302)+(2.011)+(9.003), (I-302)+(2.011)+(9.004), (I-302)+(2.011)+(9.005), (I-302)+(2.011)+(9.006), (I-302)+(2.011)+(9.007), (I-302)+(2.011)+(9.008), (I-302)+(2.011)+(9.009), (I-302)+(2.011)+(14.001), (I-302)+(2.011)+(14.002), (I-302)+(2.011)+(15.008), (I-302)+(2.011)+(15.011), (I-302)+(2.011)+(15.012), (I-302)+(2.011)+(15.016), (I-302)+(2.011)+(15.025), (I-302)+(2.011)+(15.027), (I-302)+(2.011)+(15.047), (I-302)+(2.011)+(15.063), (I-302)+(2.011)+(15.064), (I-302)+(2.011)+(16.001), (I-302)+(2.011)+(16.002), (I-302)+(2.011)+(16.003), (I-302)+(2.011)+(16.004), (I-302)+(2.011)+(16.005), (I-302)+(2.011)+(16.006), (I-302)+(2.011)+(16.007), (I-302)+(2.011)+(16.008), (I-302)+(2.011)+(17.001), (I-302)+(2.011)+(17.002), (I-302)+(2.011)+(17.003), (I-302)+(2.011)+(17.004), (I-302)+(2.011)+(17.005), (I-302)+(2.011)+(17.006), (I-302)+(2.011)+(17.007), (I-302)+(2.011)+(17.008), (I-302)+(2.011)+(17.009), (I-302)+(2.011)+(17.010), (I-302)+(2.011)+(17.011), (I-302)+(2.011)+(17.012), (I-302)+(2.011)+(18.001), (I-302)+(2.012)+(3.001), (I-302)+(2.012)+(3.002), (I-302)+(2.012)+(3.003), (I-302)+(2.012)+(3.004), (I-302)+(2.012)+(3.005), (I-302)+(2.012)+(3.006), (I-302)+(2.012)+(3.007), (I-302)+(2.012)+(3.008), (I-302)+(2.012)+(3.009), (I-302)+(2.012)+(3.010), (I-302)+(2.012)+(3.011), (I-302)+(2.012)+(3.012), (I-302)+(2.012)+(3.013), (I-302)+(2.012)+(3.014), (I-302)+(2.012)+(3.015), (I-302)+(2.012)+(3.016), (I-302)+(2.012)+(3.017), (I-302)+(2.012)+(3.018), (I-302)+(2.012)+(3.019), (I-302)+(2.012)+(3.020), (I-302)+(2.012)+(3.021), (I-302)+(2.012)+(3.022), (I-302)+(2.012)+(3.023), (I-302)+(2.012)+(3.024), (I-302)+(2.012)+(3.025), (I-302)+(2.012)+(3.026), (I-302)+(2.012)+(3.027), (I-302)+(2.012)+(3.028), (I-302)+(2.012)+(3.029), (I-302)+(2.012)+(3.030), (I-302)+(2.012)+(3.031), (I-302)+(2.012)+(5.001), (I-302)+(2.012)+(5.002), (I-302)+(2.012)+(5.003), (I-302)+(2.012)+(5.004), (I-302)+(2.012)+(5.005), (I-302)+(2.012)+(5.006), (I-302)+(2.012)+(5.007), (I-302)+(2.012)+(5.008), (I-302)+(2.012)+(5.009), (I-302)+(2.012)+(5.010), (I-302)+(2.012)+(5.011), (I-302)+(2.012)+(5.012), (I-302)+(2.012)+(5.013), (I-302)+(2.012)+(5.014), (I-302)+(2.012)+(5.015), (I-302)+(2.012)+(5.016), (I-302)+(2.012)+(5.017), (I-302)+(2.012)+(5.018), (I-302)+(2.012)+(5.019), (I-302)+(2.012)+(5.020), (I-302)+(2.012)+(5.021), (I-302)+(2.012)+(5.022), (I-302)+(2.012)+(5.023), (I-302)+(2.012)+(6.001), (I-302)+(2.012)+(6.002), (I-302)+(2.012)+(6.003), (I-302)+(2.012)+(6.004), (I-302)+(2.012)+(7.001), (I-302)+(2.012)+(7.002), (I-302)+(2.012)+(7.003), (I-302)+(2.012)+(7.004), (I-302)+(2.012)+(7.005), (I-302)+(2.012)+(7.006), (I-302)+(2.012)+(9.001), (I-302)+(2.012)+(9.002), (I-302)+(2.012)+(9.003), (I-302)+(2.012)+(9.004), (I-302)+(2.012)+(9.005), (I-302)+(2.012)+(9.006), (I-302)+(2.012)+(9.007), (I-302)+(2.012)+(9.008), (I-302)+(2.012)+(9.009), (I-302)+(2.012)+(14.001), (I-302)+(2.012)+(14.002), (I-302)+(2.012)+(15.008), (I-302)+(2.012)+(15.011), (I-302)+(2.012)+(15.012), (I-302)+(2.012)+(15.016), (I-302)+(2.012)+(15.025), (I-302)+(2.012)+(15.027), (I-302)+(2.012)+(15.047), (I-302)+(2.012)+(15.063), (I-302)+(2.012)+(15.064), (I-302)+(2.012)+(16.001), (I-302)+(2.012)+(16.002), (I-302)+(2.012)+(16.003), (I-302)+(2.012)+(16.004), (I-302)+(2.012)+(16.005), (I-302)+(2.012)+(16.006), (I-302)+(2.012)+(16.007), (I-302)+(2.012)+(16.008), (I-302)+(2.012)+(17.001), (I-302)+(2.012)+(17.002), (I-302)+(2.012)+(17.003), (I-302)+(2.012)+(17.004), (I-302)+(2.012)+(17.005), (I-302)+(2.012)+(17.006), (I-302)+(2.012)+(17.007), (I-302)+(2.012)+(17.008), (I-302)+(2.012)+(17.009), (I-302)+(2.012)+(17.010), (I-302)+(2.012)+(17.011), (I-302)+(2.012)+(17.012), (I-302)+(2.012)+(18.001), (I-302)+(2.013)+(3.001), (I-302)+(2.013)+(3.002), (I-302)+(2.013)+(3.003), (I-302)+(2.013)+(3.004), (I-302)+(2.013)+(3.005), (I-302)+(2.013)+(3.006), (I-302)+(2.013)+(3.007), (I-302)+(2.013)+(3.008), (I-302)+(2.013)+(3.009), (I-302)+(2.013)+(3.010), (I-302)+(2.013)+(3.011), (I-302)+(2.013)+(3.012), (I-302)+(2.013)+(3.013), (I-302)+(2.013)+(3.014), (I-302)+(2.013)+(3.015), (I-302)+(2.013)+(3.016), (I-302)+(2.013)+(3.017), (I-302)+(2.013)+(3.018), (I-302)+(2.013)+(3.019), (I-302)+(2.013)+(3.020), (I-302)+(2.013)+(3.021), (I-302)+(2.013)+(3.022), (I-302)+(2.013)+(3.023), (I-302)+(2.013)+(3.024), (I-302)+(2.013)+(3.025), (I-302)+(2.013)+(3.026), (I-302)+(2.013)+(3.027), (I-302)+(2.013)+(3.028), (I-302)+(2.013)+(3.029), (I-302)+(2.013)+(3.030), (I-302)+(2.013)+(3.031), (I-302)+(2.013)+(5.001), (I-302)+(2.013)+(5.002), (I-302)+(2.013)+(5.003), (I-302)+(2.013)+(5.004), (I-302)+(2.013)+(5.005), (I-302)+(2.013)+(5.006), (I-302)+(2.013)+(5.007), (I-302)+(2.013)+(5.008), (I-302)+(2.013)+(5.009), (I-302)+(2.013)+(5.010), (I-302)+(2.013)+(5.011), (I-302)+(2.013)+(5.012), (I-302)+(2.013)+(5.013), (I-302)+(2.013)+(5.014), (I-302)+(2.013)+(5.015), (I-302)+(2.013)+(5.016), (I-302)+(2.013)+(5.017), (I-302)+(2.013)+(5.018), (I-302)+(2.013)+(5.019), (I-302)+(2.013)+(5.020), (I-302)+(2.013)+(5.021), (I-302)+(2.013)+(5.022), (I-302)+(2.013)+(5.023), (I-302)+(2.013)+(6.001), (I-302)+(2.013)+(6.002), (I-302)+(2.013)+(6.003), (I-302)+(2.013)+(6.004), (I-302)+(2.013)+(7.001), (I-302)+(2.013)+(7.002), (I-302)+(2.013)+(7.003), (I-302)+(2.013)+(7.004), (I-302)+(2.013)+(7.005), (I-302)+(2.013)+(7.006), (I-302)+(2.013)+(9.001), (I-302)+(2.013)+(9.002), (I-302)+(2.013)+(9.003), (I-302)+(2.013)+(9.004), (I-302)+(2.013)+(9.005), (I-302)+(2.013)+(9.006), (I-302)+(2.013)+(9.007), (I-302)+(2.013)+(9.008), (I-302)+(2.013)+(9.009), (I-302)+(2.013)+(14.001), (I-302)+(2.013)+(14.002), (I-302)+(2.013)+(15.008), (I-302)+(2.013)+(15.011), (I-302)+(2.013)+(15.012), (I-302)+(2.013)+(15.016), (I-302)+(2.013)+(15.025), (I-302)+(2.013)+(15.027), (I-302)+(2.013)+(15.047), (I-302)+(2.013)+(15.063), (I-302)+(2.013)+(15.064), (I-302)+(2.013)+(16.001), (I-302)+(2.013)+(16.002), (I-302)+(2.013)+(16.003), (I-302)+(2.013)+(16.004), (I-302)+(2.013)+(16.005), (I-302)+(2.013)+(16.006), (I-302)+(2.013)+(16.007), (I-302)+(2.013)+(16.008), (I-302)+(2.013)+(17.001), (I-302)+(2.013)+(17.002), (I-302)+(2.013)+(17.003), (I-302)+(2.013)+(17.004), (I-302)+(2.013)+(17.005), (I-302)+(2.013)+(17.006), (I-302)+(2.013)+(17.007), (I-302)+(2.013)+(17.008), (I-302)+(2.013)+(17.009), (I-302)+(2.013)+(17.010), (I-302)+(2.013)+(17.011), (I-302)+(2.013)+(17.012), (I-302)+(2.013)+(18.001), (I-302)+(2.014)+(3.001), (I-302)+(2.014)+(3.002), (I-302)+(2.014)+(3.003), (I-302)+(2.014)+(3.004), (I-302)+(2.014)+(3.005), (I-302)+(2.014)+(3.006), (I-302)+(2.014)+(3.007), (I-302)+(2.014)+(3.008), (I-302)+(2.014)+(3.009), (I-302)+(2.014)+(3.010), (I-302)+(2.014)+(3.011), (I-302)+(2.014)+(3.012), (I-302)+(2.014)+(3.013), (I-302)+(2.014)+(3.014), (I-302)+(2.014)+(3.015), (I-302)+(2.014)+(3.016), (I-302)+(2.014)+(3.017), (I-302)+(2.014)+(3.018), (I-302)+(2.014)+(3.019), (I-302)+(2.014)+(3.020), (I-302)+(2.014)+(3.021), (I-302)+(2.014)+(3.022), (I-302)+(2.014)+(3.023), (I-302)+(2.014)+(3.024), (I-302)+(2.014)+(3.025), (I-302)+(2.014)+(3.026), (I-302)+(2.014)+(3.027), (I-302)+(2.014)+(3.028), (I-302)+(2.014)+(3.029), (I-302)+(2.014)+(3.030), (I-302)+(2.014)+(3.031), (I-302)+(2.014)+(5.001), (I-302)+(2.014)+(5.002), (I-302)+(2.014)+(5.003), (I-302)+(2.014)+(5.004), (I-302)+(2.014)+(5.005), (I-302)+(2.014)+(5.006), (I-302)+(2.014)+(5.007), (I-302)+(2.014)+(5.008), (I-302)+(2.014)+(5.009), (I-302)+(2.014)+(5.010), (I-302)+(2.014)+(5.011), (I-302)+(2.014)+(5.012), (I-302)+(2.014)+(5.013), (I-302)+(2.014)+(5.014), (I-302)+(2.014)+(5.015), (I-302)+(2.014)+(5.016), (I-302)+(2.014)+(5.017), (I-302)+(2.014)+(5.018), (I-302)+(2.014)+(5.019), (I-302)+(2.014)+(5.020), (I-302)+(2.014)+(5.021), (I-302)+(2.014)+(5.022), (I-302)+(2.014)+(5.023), (I-302)+(2.014)+(6.001), (I-302)+(2.014)+(6.002), (I-302)+(2.014)+(6.003), (I-302)+(2.014)+(6.004), (I-302)+(2.014)+(7.001), (I-302)+(2.014)+(7.002), (I-302)+(2.014)+(7.003), (I-302)+(2.014)+(7.004), (I-302)+(2.014)+(7.005), (I-302)+(2.014)+(7.006), (I-302)+(2.014)+(9.001), (I-302)+(2.014)+(9.002), (I-302)+(2.014)+(9.003), (I-302)+(2.014)+(9.004), (I-302)+(2.014)+(9.005), (I-302)+(2.014)+(9.006), (I-302)+(2.014)+(9.007), (I-302)+(2.014)+(9.008), (I-302)+(2.014)+(9.009), (I-302)+(2.014)+(14.001), (I-302)+(2.014)+(14.002), (I-302)+(2.014)+(15.008), (I-302)+(2.014)+(15.011), (I-302)+(2.014)+(15.012), (I-302)+(2.014)+(15.016), (I-302)+(2.014)+(15.025), (I-302)+(2.014)+(15.027), (I-302)+(2.014)+(15.047), (I-302)+(2.014)+(15.063), (I-302)+(2.014)+(15.064), (I-302)+(2.014)+(16.001), (I-302)+(2.014)+(16.002), (I-302)+(2.014)+(16.003), (I-302)+(2.014)+(16.004), (I-302)+(2.014)+(16.005), (I-302)+(2.014)+(16.006), (I-302)+(2.014)+(16.007), (I-302)+(2.014)+(16.008), (I-302)+(2.014)+(17.001), (I-302)+(2.014)+(17.002), (I-302)+(2.014)+(17.003), (I-302)+(2.014)+(17.004), (I-302)+(2.014)+(17.005), (I-302)+(2.014)+(17.006), (I-302)+(2.014)+(17.007), (I-302)+(2.014)+(17.008), (I-302)+(2.014)+(17.009), (I-302)+(2.014)+(17.010), (I-302)+(2.014)+(17.011), (I-302)+(2.014)+(17.012), (I-302)+(2.014)+(18.001), (I-302)+(2.015)+(3.001), (I-302)+(2.015)+(3.002), (I-302)+(2.015)+(3.003), (I-302)+(2.015)+(3.004), (I-302)+(2.015)+(3.005), (I-302)+(2.015)+(3.006), (I-302)+(2.015)+(3.007), (I-302)+(2.015)+(3.008), (I-302)+(2.015)+(3.009), (I-302)+(2.015)+(3.010), (I-302)+(2.015)+(3.011), (I-302)+(2.015)+(3.012), (I-302)+(2.015)+(3.013), (I-302)+(2.015)+(3.014), (I-302)+(2.015)+(3.015), (I-302)+(2.015)+(3.016), (I-302)+(2.015)+(3.017), (I-302)+(2.015)+(3.018), (I-302)+(2.015)+(3.019), (I-302)+(2.015)+(3.020), (I-302)+(2.015)+(3.021), (I-302)+(2.015)+(3.022), (I-302)+(2.015)+(3.023), (I-302)+(2.015)+(3.024), (I-302)+(2.015)+(3.025), (I-302)+(2.015)+(3.026), (I-302)+(2.015)+(3.027), (I-302)+(2.015)+(3.028), (I-302)+(2.015)+(3.029), (I-302)+(2.015)+(3.030), (I-302)+(2.015)+(3.031), (I-302)+(2.015)+(5.001), (I-302)+(2.015)+(5.002), (I-302)+(2.015)+(5.003), (I-302)+(2.015)+(5.004), (I-302)+(2.015)+(5.005), (I-302)+(2.015)+(5.006), (I-302)+(2.015)+(5.007), (I-302)+(2.015)+(5.008), (I-302)+(2.015)+(5.009), (I-302)+(2.015)+(5.010), (I-302)+(2.015)+(5.011), (I-302)+(2.015)+(5.012), (I-302)+(2.015)+(5.013), (I-302)+(2.015)+(5.014), (I-302)+(2.015)+(5.015), (I-302)+(2.015)+(5.016), (I-302)+(2.015)+(5.017), (I-302)+(2.015)+(5.018), (I-302)+(2.015)+(5.019), (I-302)+(2.015)+(5.020), (I-302)+(2.015)+(5.021), (I-302)+(2.015)+(5.022), (I-302)+(2.015)+(5.023), (I-302)+(2.015)+(6.001), (I-302)+(2.015)+(6.002), (I-302)+(2.015)+(6.003), (I-302)+(2.015)+(6.004), (I-302)+(2.015)+(7.001), (I-302)+(2.015)+(7.002), (I-302)+(2.015)+(7.003), (I-302)+(2.015)+(7.004), (I-302)+(2.015)+(7.005), (I-302)+(2.015)+(7.006), (I-302)+(2.015)+(9.001), (I-302)+(2.015)+(9.002), (I-302)+(2.015)+(9.003), (I-302)+(2.015)+(9.004), (I-302)+(2.015)+(9.005), (I-302)+(2.015)+(9.006), (I-302)+(2.015)+(9.007), (I-302)+(2.015)+(9.008), (I-302)+(2.015)+(9.009), (I-302)+(2.015)+(14.001), (I-302)+(2.015)+(14.002), (I-302)+(2.015)+(15.008), (I-302)+(2.015)+(15.011), (I-302)+(2.015)+(15.012), (I-302)+(2.015)+(15.016), (I-302)+(2.015)+(15.025), (I-302)+(2.015)+(15.027), (I-302)+(2.015)+(15.047), (I-302)+(2.015)+(15.063), (I-302)+(2.015)+(15.064), (I-302)+(2.015)+(16.001), (I-302)+(2.015)+(16.002), (I-302)+(2.015)+(16.003), (I-302)+(2.015)+(16.004), (I-302)+(2.015)+(16.005), (I-302)+(2.015)+(16.006), (I-302)+(2.015)+(16.007), (I-302)+(2.015)+(16.008), (I-302)+(2.015)+(17.001), (I-302)+(2.015)+(17.002), (I-302)+(2.015)+(17.003), (I-302)+(2.015)+(17.004), (I-302)+(2.015)+(17.005), (I-302)+(2.015)+(17.006), (I-302)+(2.015)+(17.007), (I-302)+(2.015)+(17.008), (I-302)+(2.015)+(17.009), (I-302)+(2.015)+(17.010), (I-302)+(2.015)+(17.011), (I-302)+(2.015)+(17.012), (I-302)+(2.015)+(18.001), (I-302)+(2.016)+(3.001), (I-302)+(2.016)+(3.002), (I-302)+(2.016)+(3.003), (I-302)+(2.016)+(3.004), (I-302)+(2.016)+(3.005), (I-302)+(2.016)+(3.006), (I-302)+(2.016)+(3.007), (I-302)+(2.016)+(3.008), (I-302)+(2.016)+(3.009), (I-302)+(2.016)+(3.010), (I-302)+(2.016)+(3.011), (I-302)+(2.016)+(3.012), (I-302)+(2.016)+(3.013), (I-302)+(2.016)+(3.014), (I-302)+(2.016)+(3.015), (I-302)+(2.016)+(3.016), (I-302)+(2.016)+(3.017), (I-302)+(2.016)+(3.018), (I-302)+(2.016)+(3.019), (I-302)+(2.016)+(3.020), (I-302)+(2.016)+(3.021), (I-302)+(2.016)+(3.022), (I-302)+(2.016)+(3.023), (I-302)+(2.016)+(3.024), (I-302)+(2.016)+(3.025), (I-302)+(2.016)+(3.026), (I-302)+(2.016)+(3.027), (I-302)+(2.016)+(3.028), (I-302)+(2.016)+(3.029), (I-302)+(2.016)+(3.030), (I-302)+(2.016)+(3.031), (I-302)+(2.016)+(5.001), (I-302)+(2.016)+(5.002), (I-302)+(2.016)+(5.003), (I-302)+(2.016)+(5.004), (I-302)+(2.016)+(5.005), (I-302)+(2.016)+(5.006), (I-302)+(2.016)+(5.007), (I-302)+(2.016)+(5.008), (I-302)+(2.016)+(5.009), (I-302)+(2.016)+(5.010), (I-302)+(2.016)+(5.011), (I-302)+(2.016)+(5.012), (I-302)+(2.016)+(5.013), (I-302)+(2.016)+(5.014), (I-302)+(2.016)+(5.015), (I-302)+(2.016)+(5.016), (I-302)+(2.016)+(5.017), (I-302)+(2.016)+(5.018), (I-302)+(2.016)+(5.019), (I-302)+(2.016)+(5.020), (I-302)+(2.016)+(5.021), (I-302)+(2.016)+(5.022), (I-302)+(2.016)+(5.023), (I-302)+(2.016)+(6.001), (I-302)+(2.016)+(6.002), (I-302)+(2.016)+(6.003), (I-302)+(2.016)+(6.004), (I-302)+(2.016)+(7.001), (I-302)+(2.016)+(7.002), (I-302)+(2.016)+(7.003), (I-302)+(2.016)+(7.004), (I-302)+(2.016)+(7.005), (I-302)+(2.016)+(7.006), (I-302)+(2.016)+(9.001), (I-302)+(2.016)+(9.002), (I-302)+(2.016)+(9.003), (I-302)+(2.016)+(9.004), (I-302)+(2.016)+(9.005), (I-302)+(2.016)+(9.006), (I-302)+(2.016)+(9.007), (I-302)+(2.016)+(9.008), (I-302)+(2.016)+(9.009), (I-302)+(2.016)+(14.001), (I-302)+(2.016)+(14.002), (I-302)+(2.016)+(15.008), (I-302)+(2.016)+(15.011), (I-302)+(2.016)+(15.012), (I-302)+(2.016)+(15.016), (I-302)+(2.016)+(15.025), (I-302)+(2.016)+(15.027), (I-302)+(2.016)+(15.047), (I-302)+(2.016)+(15.063), (I-302)+(2.016)+(15.064), (I-302)+(2.016)+(16.001), (I-302)+(2.016)+(16.002), (I-302)+(2.016)+(16.003), (I-302)+(2.016)+(16.004), (I-302)+(2.016)+(16.005), (I-302)+(2.016)+(16.006), (I-302)+(2.016)+(16.007), (I-302)+(2.016)+(16.008), (I-302)+(2.016)+(17.001), (I-302)+(2.016)+(17.002), (I-302)+(2.016)+(17.003), (I-302)+(2.016)+(17.004), (I-302)+(2.016)+(17.005), (I-302)+(2.016)+(17.006), (I-302)+(2.016)+(17.007), (I-302)+(2.016)+(17.008), (I-302)+(2.016)+(17.009), (I-302)+(2.016)+(17.010), (I-302)+(2.016)+(17.011), (I-302)+(2.016)+(17.012), (I-302)+(2.016)+(18.001), (I-302)+(2.017)+(3.001), (I-302)+(2.017)+(3.002), (I-302)+(2.017)+(3.003), (I-302)+(2.017)+(3.004), (I-302)+(2.017)+(3.005), (I-302)+(2.017)+(3.006), (I-302)+(2.017)+(3.007), (I-302)+(2.017)+(3.008), (I-302)+(2.017)+(3.009), (I-302)+(2.017)+(3.010), (I-302)+(2.017)+(3.011), (I-302)+(2.017)+(3.012), (I-302)+(2.017)+(3.013), (I-302)+(2.017)+(3.014), (I-302)+(2.017)+(3.015), (I-302)+(2.017)+(3.016), (I-302)+(2.017)+(3.017), (I-302)+(2.017)+(3.018), (I-302)+(2.017)+(3.019), (I-302)+(2.017)+(3.020), (I-302)+(2.017)+(3.021), (I-302)+(2.017)+(3.022), (I-302)+(2.017)+(3.023), (I-302)+(2.017)+(3.024), (I-302)+(2.017)+(3.025), (I-302)+(2.017)+(3.026), (I-302)+(2.017)+(3.027), (I-302)+(2.017)+(3.028), (I-302)+(2.017)+(3.029), (I-302)+(2.017)+(3.030), (I-302)+(2.017)+(3.031), (I-302)+(2.017)+(5.001), (I-302)+(2.017)+(5.002), (I-302)+(2.017)+(5.003), (I-302)+(2.017)+(5.004), (I-302)+(2.017)+(5.005), (I-302)+(2.017)+(5.006), (I-302)+(2.017)+(5.007), (I-302)+(2.017)+(5.008), (I-302)+(2.017)+(5.009), (I-302)+(2.017)+(5.010), (I-302)+(2.017)+(5.011), (I-302)+(2.017)+(5.012), (I-302)+(2.017)+(5.013), (I-302)+(2.017)+(5.014), (I-302)+(2.017)+(5.015), (I-302)+(2.017)+(5.016), (I-302)+(2.017)+(5.017), (I-302)+(2.017)+(5.018), (I-302)+(2.017)+(5.019), (I-302)+(2.017)+(5.020), (I-302)+(2.017)+(5.021), (I-302)+(2.017)+(5.022), (I-302)+(2.017)+(5.023), (I-302)+(2.017)+(6.001), (I-302)+(2.017)+(6.002), (I-302)+(2.017)+(6.003), (I-302)+(2.017)+(6.004), (I-302)+(2.017)+(7.001), (I-302)+(2.017)+(7.002), (I-302)+(2.017)+(7.003), (I-302)+(2.017)+(7.004), (I-302)+(2.017)+(7.005), (I-302)+(2.017)+(7.006), (I-302)+(2.017)+(9.001), (I-302)+(2.017)+(9.002), (I-302)+(2.017)+(9.003), (I-302)+(2.017)+(9.004), (I-302)+(2.017)+(9.005), (I-302)+(2.017)+(9.006), (I-302)+(2.017)+(9.007), (I-302)+(2.017)+(9.008), (I-302)+(2.017)+(9.009), (I-302)+(2.017)+(14.001), (I-302)+(2.017)+(14.002), (I-302)+(2.017)+(15.008), (I-302)+(2.017)+(15.011), (I-302)+(2.017)+(15.012), (I-302)+(2.017)+(15.016), (I-302)+(2.017)+(15.025), (I-302)+(2.017)+(15.027), (I-302)+(2.017)+(15.047), (I-302)+(2.017)+(15.063), (I-302)+(2.017)+(15.064), (I-302)+(2.017)+(16.001), (I-302)+(2.017)+(16.002), (I-302)+(2.017)+(16.003), (I-302)+(2.017)+(16.004), (I-302)+(2.017)+(16.005), (I-302)+(2.017)+(16.006), (I-302)+(2.017)+(16.007), (I-302)+(2.017)+(16.008), (I-302)+(2.017)+(17.001), (I-302)+(2.017)+(17.002), (I-302)+(2.017)+(17.003), (I-302)+(2.017)+(17.004), (I-302)+(2.017)+(17.005), (I-302)+(2.017)+(17.006), (I-302)+(2.017)+(17.007), (I-302)+(2.017)+(17.008), (I-302)+(2.017)+(17.009), (I-302)+(2.017)+(17.010), (I-302)+(2.017)+(17.011), (I-302)+(2.017)+(17.012), (I-302)+(2.017)+(18.001), (I-302)+(2.018)+(3.001), (I-302)+(2.018)+(3.002), (I-302)+(2.018)+(3.003), (I-302)+(2.018)+(3.004), (I-302)+(2.018)+(3.005), (I-302)+(2.018)+(3.006), (I-302)+(2.018)+(3.007), (I-302)+(2.018)+(3.008), (I-302)+(2.018)+(3.009), (I-302)+(2.018)+(3.010), (I-302)+(2.018)+(3.011), (I-302)+(2.018)+(3.012), (I-302)+(2.018)+(3.013), (I-302)+(2.018)+(3.014), (I-302)+(2.018)+(3.015), (I-302)+(2.018)+(3.016), (I-302)+(2.018)+(3.017), (I-302)+(2.018)+(3.018), (I-302)+(2.018)+(3.019), (I-302)+(2.018)+(3.020), (I-302)+(2.018)+(3.021), (I-302)+(2.018)+(3.022), (I-302)+(2.018)+(3.023), (I-302)+(2.018)+(3.024), (I-302)+(2.018)+(3.025), (I-302)+(2.018)+(3.026), (I-302)+(2.018)+(3.027), (I-302)+(2.018)+(3.028), (I-302)+(2.018)+(3.029), (I-302)+(2.018)+(3.030), (I-302)+(2.018)+(3.031), (I-302)+(2.018)+(5.001), (I-302)+(2.018)+(5.002), (I-302)+(2.018)+(5.003), (I-302)+(2.018)+(5.004), (I-302)+(2.018)+(5.005), (I-302)+(2.018)+(5.006), (I-302)+(2.018)+(5.007), (I-302)+(2.018)+(5.008), (I-302)+(2.018)+(5.009), (I-302)+(2.018)+(5.010), (I-302)+(2.018)+(5.011), (I-302)+(2.018)+(5.012), (I-302)+(2.018)+(5.013), (I-302)+(2.018)+(5.014), (I-302)+(2.018)+(5.015), (I-302)+(2.018)+(5.016), (I-302)+(2.018)+(5.017), (I-302)+(2.018)+(5.018), (I-302)+(2.018)+(5.019), (I-302)+(2.018)+(5.020), (I-302)+(2.018)+(5.021), (I-302)+(2.018)+(5.022), (I-302)+(2.018)+(5.023), (I-302)+(2.018)+(6.001), (I-302)+(2.018)+(6.002), (I-302)+(2.018)+(6.003), (I-302)+(2.018)+(6.004), (I-302)+(2.018)+(7.001), (I-302)+(2.018)+(7.002), (I-302)+(2.018)+(7.003), (I-302)+(2.018)+(7.004), (I-302)+(2.018)+(7.005), (I-302)+(2.018)+(7.006), (I-302)+(2.018)+(9.001), (I-302)+(2.018)+(9.002), (I-302)+(2.018)+(9.003), (I-302)+(2.018)+(9.004), (I-302)+(2.018)+(9.005), (I-302)+(2.018)+(9.006), (I-302)+(2.018)+(9.007), (I-302)+(2.018)+(9.008), (I-302)+(2.018)+(9.009), (I-302)+(2.018)+(14.001), (I-302)+(2.018)+(14.002), (I-302)+(2.018)+(15.008), (I-302)+(2.018)+(15.011), (I-302)+(2.018)+(15.012), (I-302)+(2.018)+(15.016), (I-302)+(2.018)+(15.025), (I-302)+(2.018)+(15.027), (I-302)+(2.018)+(15.047), (I-302)+(2.018)+(15.063), (I-302)+(2.018)+(15.064), (I-302)+(2.018)+(16.001), (I-302)+(2.018)+(16.002), (I-302)+(2.018)+(16.003), (I-302)+(2.018)+(16.004), (I-302)+(2.018)+(16.005), (I-302)+(2.018)+(16.006), (I-302)+(2.018)+(16.007), (I-302)+(2.018)+(16.008), (I-302)+(2.018)+(17.001), (I-302)+(2.018)+(17.002), (I-302)+(2.018)+(17.003), (I-302)+(2.018)+(17.004), (I-302)+(2.018)+(17.005), (I-302)+(2.018)+(17.006), (I-302)+(2.018)+(17.007), (I-302)+(2.018)+(17.008), (I-302)+(2.018)+(17.009), (I-302)+(2.018)+(17.010), (I-302)+(2.018)+(17.011), (I-302)+(2.018)+(17.012), (I-302)+(2.018)+(18.001), (I-302)+(2.019)+(3.001), (I-302)+(2.019)+(3.002), (I-302)+(2.019)+(3.003), (I-302)+(2.019)+(3.004), (I-302)+(2.019)+(3.005), (I-302)+(2.019)+(3.006), (I-302)+(2.019)+(3.007), (I-302)+(2.019)+(3.008), (I-302)+(2.019)+(3.009), (I-302)+(2.019)+(3.010), (I-302)+(2.019)+(3.011), (I-302)+(2.019)+(3.012), (I-302)+(2.019)+(3.013), (I-302)+(2.019)+(3.014), (I-302)+(2.019)+(3.015), (I-302)+(2.019)+(3.016), (I-302)+(2.019)+(3.017), (I-302)+(2.019)+(3.018), (I-302)+(2.019)+(3.019), (I-302)+(2.019)+(3.020), (I-302)+(2.019)+(3.021), (I-302)+(2.019)+(3.022), (I-302)+(2.019)+(3.023), (I-302)+(2.019)+(3.024), (I-302)+(2.019)+(3.025), (I-302)+(2.019)+(3.026), (I-302)+(2.019)+(3.027), (I-302)+(2.019)+(3.028), (I-302)+(2.019)+(3.029), (I-302)+(2.019)+(3.030), (I-302)+(2.019)+(3.031), (I-302)+(2.019)+(5.001), (I-302)+(2.019)+(5.002), (I-302)+(2.019)+(5.003), (I-302)+(2.019)+(5.004), (I-302)+(2.019)+(5.005), (I-302)+(2.019)+(5.006), (I-302)+(2.019)+(5.007), (I-302)+(2.019)+(5.008), (I-302)+(2.019)+(5.009), (I-302)+(2.019)+(5.010), (I-302)+(2.019)+(5.011), (I-302)+(2.019)+(5.012), (I-302)+(2.019)+(5.013), (I-302)+(2.019)+(5.014), (I-302)+(2.019)+(5.015), (I-302)+(2.019)+(5.016), (I-302)+(2.019)+(5.017), (I-302)+(2.019)+(5.018), (I-302)+(2.019)+(5.019), (I-302)+(2.019)+(5.020), (I-302)+(2.019)+(5.021), (I-302)+(2.019)+(5.022), (I-302)+(2.019)+(5.023), (I-302)+(2.019)+(6.001), (I-302)+(2.019)+(6.002), (I-302)+(2.019)+(6.003), (I-302)+(2.019)+(6.004), (I-302)+(2.019)+(7.001), (I-302)+(2.019)+(7.002), (I-302)+(2.019)+(7.003), (I-302)+(2.019)+(7.004), (I-302)+(2.019)+(7.005), (I-302)+(2.019)+(7.006), (I-302)+(2.019)+(9.001), (I-302)+(2.019)+(9.002), (I-302)+(2.019)+(9.003), (I-302)+(2.019)+(9.004), (I-302)+(2.019)+(9.005), (I-302)+(2.019)+(9.006), (I-302)+(2.019)+(9.007), (I-302)+(2.019)+(9.008), (I-302)+(2.019)+(9.009), (I-302)+(2.019)+(14.001), (I-302)+(2.019)+(14.002), (I-302)+(2.019)+(15.008), (I-302)+(2.019)+(15.011), (I-302)+(2.019)+(15.012), (I-302)+(2.019)+(15.016), (I-302)+(2.019)+(15.025), (I-302)+(2.019)+(15.027), (I-302)+(2.019)+(15.047), (I-302)+(2.019)+(15.063), (I-302)+(2.019)+(15.064), (I-302)+(2.019)+(16.001), (I-302)+(2.019)+(16.002), (I-302)+(2.019)+(16.003), (I-302)+(2.019)+(16.004), (I-302)+(2.019)+(16.005), (I-302)+(2.019)+(16.006), (I-302)+(2.019)+(16.007), (I-302)+(2.019)+(16.008), (I-302)+(2.019)+(17.001), (I-302)+(2.019)+(17.002), (I-302)+(2.019)+(17.003), (I-302)+(2.019)+(17.004), (I-302)+(2.019)+(17.005), (I-302)+(2.019)+(17.006), (I-302)+(2.019)+(17.007), (I-302)+(2.019)+(17.008), (I-302)+(2.019)+(17.009), (I-302)+(2.019)+(17.010), (I-302)+(2.019)+(17.011), (I-302)+(2.019)+(17.012), (I-302)+(2.019)+(18.001), (I-302)+(2.020)+(3.001), (I-302)+(2.020)+(3.002), (I-302)+(2.020)+(3.003), (I-302)+(2.020)+(3.004), (I-302)+(2.020)+(3.005), (I-302)+(2.020)+(3.006), (I-302)+(2.020)+(3.007), (I-302)+(2.020)+(3.008), (I-302)+(2.020)+(3.009), (I-302)+(2.020)+(3.010), (I-302)+(2.020)+(3.011), (I-302)+(2.020)+(3.012), (I-302)+(2.020)+(3.013), (I-302)+(2.020)+(3.014), (I-302)+(2.020)+(3.015), (I-302)+(2.020)+(3.016), (I-302)+(2.020)+(3.017), (I-302)+(2.020)+(3.018), (I-302)+(2.020)+(3.019), (I-302)+(2.020)+(3.020), (I-302)+(2.020)+(3.021), (I-302)+(2.020)+(3.022), (I-302)+(2.020)+(3.023), (I-302)+(2.020)+(3.024), (I-302)+(2.020)+(3.025), (I-302)+(2.020)+(3.026), (I-302)+(2.020)+(3.027), (I-302)+(2.020)+(3.028), (I-302)+(2.020)+(3.029), (I-302)+(2.020)+(3.030), (I-302)+(2.020)+(3.031), (I-302)+(2.020)+(5.001), (I-302)+(2.020)+(5.002), (I-302)+(2.020)+(5.003), (I-302)+(2.020)+(5.004), (I-302)+(2.020)+(5.005), (I-302)+(2.020)+(5.006), (I-302)+(2.020)+(5.007), (I-302)+(2.020)+(5.008), (I-302)+(2.020)+(5.009), (I-302)+(2.020)+(5.010), (I-302)+(2.020)+(5.011), (I-302)+(2.020)+(5.012), (I-302)+(2.020)+(5.013), (I-302)+(2.020)+(5.014), (I-302)+(2.020)+(5.015), (I-302)+(2.020)+(5.016), (I-302)+(2.020)+(5.017), (I-302)+(2.020)+(5.018), (I-302)+(2.020)+(5.019), (I-302)+(2.020)+(5.020), (I-302)+(2.020)+(5.021), (I-302)+(2.020)+(5.022), (I-302)+(2.020)+(5.023), (I-302)+(2.020)+(6.001), (I-302)+(2.020)+(6.002), (I-302)+(2.020)+(6.003), (I-302)+(2.020)+(6.004), (I-302)+(2.020)+(7.001), (I-302)+(2.020)+(7.002), (I-302)+(2.020)+(7.003), (I-302)+(2.020)+(7.004), (I-302)+(2.020)+(7.005), (I-302)+(2.020)+(7.006), (I-302)+(2.020)+(9.001), (I-302)+(2.020)+(9.002), (I-302)+(2.020)+(9.003), (I-302)+(2.020)+(9.004), (I-302)+(2.020)+(9.005), (I-302)+(2.020)+(9.006), (I-302)+(2.020)+(9.007), (I-302)+(2.020)+(9.008), (I-302)+(2.020)+(9.009), (I-302)+(2.020)+(14.001), (I-302)+(2.020)+(14.002), (I-302)+(2.020)+(15.008), (I-302)+(2.020)+(15.011), (I-302)+(2.020)+(15.012), (I-302)+(2.020)+(15.016), (I-302)+(2.020)+(15.025), (I-302)+(2.020)+(15.027), (I-302)+(2.020)+(15.047), (I-302)+(2.020)+(15.063), (I-302)+(2.020)+(15.064), (I-302)+(2.020)+(16.001), (I-302)+(2.020)+(16.002), (I-302)+(2.020)+(16.003), (I-302)+(2.020)+(16.004), (I-302)+(2.020)+(16.005), (I-302)+(2.020)+(16.006), (I-302)+(2.020)+(16.007), (I-302)+(2.020)+(16.008), (I-302)+(2.020)+(17.001), (I-302)+(2.020)+(17.002), (I-302)+(2.020)+(17.003), (I-302)+(2.020)+(17.004), (I-302)+(2.020)+(17.005), (I-302)+(2.020)+(17.006), (I-302)+(2.020)+(17.007), (I-302)+(2.020)+(17.008), (I-302)+(2.020)+(17.009), (I-302)+(2.020)+(17.010), (I-302)+(2.020)+(17.011), (I-302)+(2.020)+(17.012), (I-302)+(2.020)+(18.001), (I-302)+(2.021)+(3.001), (I-302)+(2.021)+(3.002), (I-302)+(2.021)+(3.003), (I-302)+(2.021)+(3.004), (I-302)+(2.021)+(3.005), (I-302)+(2.021)+(3.006), (I-302)+(2.021)+(3.007), (I-302)+(2.021)+(3.008), (I-302)+(2.021)+(3.009), (I-302)+(2.021)+(3.010), (I-302)+(2.021)+(3.011), (I-302)+(2.021)+(3.012), (I-302)+(2.021)+(3.013), (I-302)+(2.021)+(3.014), (I-302)+(2.021)+(3.015), (I-302)+(2.021)+(3.016), (I-302)+(2.021)+(3.017), (I-302)+(2.021)+(3.018), (I-302)+(2.021)+(3.019), (I-302)+(2.021)+(3.020), (I-302)+(2.021)+(3.021), (I-302)+(2.021)+(3.022), (I-302)+(2.021)+(3.023), (I-302)+(2.021)+(3.024), (I-302)+(2.021)+(3.025), (I-302)+(2.021)+(3.026), (I-302)+(2.021)+(3.027), (I-302)+(2.021)+(3.028), (I-302)+(2.021)+(3.029), (I-302)+(2.021)+(3.030), (I-302)+(2.021)+(3.031), (I-302)+(2.021)+(5.001), (I-302)+(2.021)+(5.002), (I-302)+(2.021)+(5.003), (I-302)+(2.021)+(5.004), (I-302)+(2.021)+(5.005), (I-302)+(2.021)+(5.006), (I-302)+(2.021)+(5.007), (I-302)+(2.021)+(5.008), (I-302)+(2.021)+(5.009), (I-302)+(2.021)+(5.010), (I-302)+(2.021)+(5.011), (I-302)+(2.021)+(5.012), (I-302)+(2.021)+(5.013), (I-302)+(2.021)+(5.014), (I-302)+(2.021)+(5.015), (I-302)+(2.021)+(5.016), (I-302)+(2.021)+(5.017), (I-302)+(2.021)+(5.018), (I-302)+(2.021)+(5.019), (I-302)+(2.021)+(5.020), (I-302)+(2.021)+(5.021), (I-302)+(2.021)+(5.022), (I-302)+(2.021)+(5.023), (I-302)+(2.021)+(6.001), (I-302)+(2.021)+(6.002), (I-302)+(2.021)+(6.003), (I-302)+(2.021)+(6.004), (I-302)+(2.021)+(7.001), (I-302)+(2.021)+(7.002), (I-302)+(2.021)+(7.003), (I-302)+(2.021)+(7.004), (I-302)+(2.021)+(7.005), (I-302)+(2.021)+(7.006), (I-302)+(2.021)+(9.001), (I-302)+(2.021)+(9.002), (I-302)+(2.021)+(9.003), (I-302)+(2.021)+(9.004), (I-302)+(2.021)+(9.005), (I-302)+(2.021)+(9.006), (I-302)+(2.021)+(9.007), (I-302)+(2.021)+(9.008), (I-302)+(2.021)+(9.009), (I-302)+(2.021)+(14.001), (I-302)+(2.021)+(14.002), (I-302)+(2.021)+(15.008), (I-302)+(2.021)+(15.011), (I-302)+(2.021)+(15.012), (I-302)+(2.021)+(15.016), (I-302)+(2.021)+(15.025), (I-302)+(2.021)+(15.027), (I-302)+(2.021)+(15.047), (I-302)+(2.021)+(15.063), (I-302)+(2.021)+(15.064), (I-302)+(2.021)+(16.001), (I-302)+(2.021)+(16.002), (I-302)+(2.021)+(16.003), (I-302)+(2.021)+(16.004), (I-302)+(2.021)+(16.005), (I-302)+(2.021)+(16.006), (I-302)+(2.021)+(16.007), (I-302)+(2.021)+(16.008), (I-302)+(2.021)+(17.001), (I-302)+(2.021)+(17.002), (I-302)+(2.021)+(17.003), (I-302)+(2.021)+(17.004), (I-302)+(2.021)+(17.005), (I-302)+(2.021)+(17.006), (I-302)+(2.021)+(17.007), (I-302)+(2.021)+(17.008), (I-302)+(2.021)+(17.009), (I-302)+(2.021)+(17.010), (I-302)+(2.021)+(17.011), (I-302)+(2.021)+(17.012), (I-302)+(2.021)+(18.001), (I-302)+(2.022)+(3.001), (I-302)+(2.022)+(3.002), (I-302)+(2.022)+(3.003), (I-302)+(2.022)+(3.004), (I-302)+(2.022)+(3.005), (I-302)+(2.022)+(3.006), (I-302)+(2.022)+(3.007), (I-302)+(2.022)+(3.008), (I-302)+(2.022)+(3.009), (I-302)+(2.022)+(3.010), (I-302)+(2.022)+(3.011), (I-302)+(2.022)+(3.012), (I-302)+(2.022)+(3.013), (I-302)+(2.022)+(3.014), (I-302)+(2.022)+(3.015), (I-302)+(2.022)+(3.016), (I-302)+(2.022)+(3.017), (I-302)+(2.022)+(3.018), (I-302)+(2.022)+(3.019), (I-302)+(2.022)+(3.020), (I-302)+(2.022)+(3.021), (I-302)+(2.022)+(3.022), (I-302)+(2.022)+(3.023), (I-302)+(2.022)+(3.024), (I-302)+(2.022)+(3.025), (I-302)+(2.022)+(3.026), (I-302)+(2.022)+(3.027), (I-302)+(2.022)+(3.028), (I-302)+(2.022)+(3.029), (I-302)+(2.022)+(3.030), (I-302)+(2.022)+(3.031), (I-302)+(2.022)+(5.001), (I-302)+(2.022)+(5.002), (I-302)+(2.022)+(5.003), (I-302)+(2.022)+(5.004), (I-302)+(2.022)+(5.005), (I-302)+(2.022)+(5.006), (I-302)+(2.022)+(5.007), (I-302)+(2.022)+(5.008), (I-302)+(2.022)+(5.009), (I-302)+(2.022)+(5.010), (I-302)+(2.022)+(5.011), (I-302)+(2.022)+(5.012), (I-302)+(2.022)+(5.013), (I-302)+(2.022)+(5.014), (I-302)+(2.022)+(5.015), (I-302)+(2.022)+(5.016), (I-302)+(2.022)+(5.017), (I-302)+(2.022)+(5.018), (I-302)+(2.022)+(5.019), (I-302)+(2.022)+(5.020), (I-302)+(2.022)+(5.021), (I-302)+(2.022)+(5.022), (I-302)+(2.022)+(5.023), (I-302)+(2.022)+(6.001), (I-302)+(2.022)+(6.002), (I-302)+(2.022)+(6.003), (I-302)+(2.022)+(6.004), (I-302)+(2.022)+(7.001), (I-302)+(2.022)+(7.002), (I-302)+(2.022)+(7.003), (I-302)+(2.022)+(7.004), (I-302)+(2.022)+(7.005), (I-302)+(2.022)+(7.006), (I-302)+(2.022)+(9.001), (I-302)+(2.022)+(9.002), (I-302)+(2.022)+(9.003), (I-302)+(2.022)+(9.004), (I-302)+(2.022)+(9.005), (I-302)+(2.022)+(9.006), (I-302)+(2.022)+(9.007), (I-302)+(2.022)+(9.008), (I-302)+(2.022)+(9.009), (I-302)+(2.022)+(14.001), (I-302)+(2.022)+(14.002), (I-302)+(2.022)+(15.008), (I-302)+(2.022)+(15.011), (I-302)+(2.022)+(15.012), (I-302)+(2.022)+(15.016), (I-302)+(2.022)+(15.025), (I-302)+(2.022)+(15.027), (I-302)+(2.022)+(15.047), (I-302)+(2.022)+(15.063), (I-302)+(2.022)+(15.064), (I-302)+(2.022)+(16.001), (I-302)+(2.022)+(16.002), (I-302)+(2.022)+(16.003), (I-302)+(2.022)+(16.004), (I-302)+(2.022)+(16.005), (I-302)+(2.022)+(16.006), (I-302)+(2.022)+(16.007), (I-302)+(2.022)+(16.008), (I-302)+(2.022)+(17.001), (I-302)+(2.022)+(17.002), (I-302)+(2.022)+(17.003), (I-302)+(2.022)+(17.004), (I-302)+(2.022)+(17.005), (I-302)+(2.022)+(17.006), (I-302)+(2.022)+(17.007), (I-302)+(2.022)+(17.008), (I-302)+(2.022)+(17.009), (I-302)+(2.022)+(17.010), (I-302)+(2.022)+(17.011), (I-302)+(2.022)+(17.012), (I-302)+(2.022)+(18.001), (I-302)+(2.023)+(3.001), (I-302)+(2.023)+(3.002), (I-302)+(2.023)+(3.003), (I-302)+(2.023)+(3.004), (I-302)+(2.023)+(3.005), (I-302)+(2.023)+(3.006), (I-302)+(2.023)+(3.007), (I-302)+(2.023)+(3.008), (I-302)+(2.023)+(3.009), (I-302)+(2.023)+(3.010), (I-302)+(2.023)+(3.011), (I-302)+(2.023)+(3.012), (I-302)+(2.023)+(3.013), (I-302)+(2.023)+(3.014), (I-302)+(2.023)+(3.015), (I-302)+(2.023)+(3.016), (I-302)+(2.023)+(3.017), (I-302)+(2.023)+(3.018), (I-302)+(2.023)+(3.019), (I-302)+(2.023)+(3.020), (I-302)+(2.023)+(3.021), (I-302)+(2.023)+(3.022), (I-302)+(2.023)+(3.023), (I-302)+(2.023)+(3.024), (I-302)+(2.023)+(3.025), (I-302)+(2.023)+(3.026), (I-302)+(2.023)+(3.027), (I-302)+(2.023)+(3.028), (I-302)+(2.023)+(3.029), (I-302)+(2.023)+(3.030), (I-302)+(2.023)+(3.031), (I-302)+(2.023)+(5.001), (I-302)+(2.023)+(5.002), (I-302)+(2.023)+(5.003), (I-302)+(2.023)+(5.004), (I-302)+(2.023)+(5.005), (I-302)+(2.023)+(5.006), (I-302)+(2.023)+(5.007), (I-302)+(2.023)+(5.008), (I-302)+(2.023)+(5.009), (I-302)+(2.023)+(5.010), (I-302)+(2.023)+(5.011), (I-302)+(2.023)+(5.012), (I-302)+(2.023)+(5.013), (I-302)+(2.023)+(5.014), (I-302)+(2.023)+(5.015), (I-302)+(2.023)+(5.016), (I-302)+(2.023)+(5.017), (I-302)+(2.023)+(5.018), (I-302)+(2.023)+(5.019), (I-302)+(2.023)+(5.020), (I-302)+(2.023)+(5.021), (I-302)+(2.023)+(5.022), (I-302)+(2.023)+(5.023), (I-302)+(2.023)+(6.001), (I-302)+(2.023)+(6.002), (I-302)+(2.023)+(6.003), (I-302)+(2.023)+(6.004), (I-302)+(2.023)+(7.001), (I-302)+(2.023)+(7.002), (I-302)+(2.023)+(7.003), (I-302)+(2.023)+(7.004), (I-302)+(2.023)+(7.005), (I-302)+(2.023)+(7.006), (I-302)+(2.023)+(9.001), (I-302)+(2.023)+(9.002), (I-302)+(2.023)+(9.003), (I-302)+(2.023)+(9.004), (I-302)+(2.023)+(9.005), (I-302)+(2.023)+(9.006), (I-302)+(2.023)+(9.007), (I-302)+(2.023)+(9.008), (I-302)+(2.023)+(9.009), (I-302)+(2.023)+(14.001), (I-302)+(2.023)+(14.002), (I-302)+(2.023)+(15.008), (I-302)+(2.023)+(15.011), (I-302)+(2.023)+(15.012), (I-302)+(2.023)+(15.016), (I-302)+(2.023)+(15.025), (I-302)+(2.023)+(15.027), (I-302)+(2.023)+(15.047), (I-302)+(2.023)+(15.063), (I-302)+(2.023)+(15.064), (I-302)+(2.023)+(16.001), (I-302)+(2.023)+(16.002), (I-302)+(2.023)+(16.003), (I-302)+(2.023)+(16.004), (I-302)+(2.023)+(16.005), (I-302)+(2.023)+(16.006), (I-302)+(2.023)+(16.007), (I-302)+(2.023)+(16.008), (I-302)+(2.023)+(17.001), (I-302)+(2.023)+(17.002), (I-302)+(2.023)+(17.003), (I-302)+(2.023)+(17.004), (I-302)+(2.023)+(17.005), (I-302)+(2.023)+(17.006), (I-302)+(2.023)+(17.007), (I-302)+(2.023)+(17.008), (I-302)+(2.023)+(17.009), (I-302)+(2.023)+(17.010), (I-302)+(2.023)+(17.011), (I-302)+(2.023)+(17.012), (I-302)+(2.023)+(18.001), (I-302)+(2.024)+(3.001), (I-302)+(2.024)+(3.002), (I-302)+(2.024)+(3.003), (I-302)+(2.024)+(3.004), (I-302)+(2.024)+(3.005), (I-302)+(2.024)+(3.006), (I-302)+(2.024)+(3.007), (I-302)+(2.024)+(3.008), (I-302)+(2.024)+(3.009), (I-302)+(2.024)+(3.010), (I-302)+(2.024)+(3.011), (I-302)+(2.024)+(3.012), (I-302)+(2.024)+(3.013), (I-302)+(2.024)+(3.014), (I-302)+(2.024)+(3.015), (I-302)+(2.024)+(3.016), (I-302)+(2.024)+(3.017), (I-302)+(2.024)+(3.018), (I-302)+(2.024)+(3.019), (I-302)+(2.024)+(3.020), (I-302)+(2.024)+(3.021), (I-302)+(2.024)+(3.022), (I-302)+(2.024)+(3.023), (I-302)+(2.024)+(3.024), (I-302)+(2.024)+(3.025), (I-302)+(2.024)+(3.026), (I-302)+(2.024)+(3.027), (I-302)+(2.024)+(3.028), (I-302)+(2.024)+(3.029), (I-302)+(2.024)+(3.030), (I-302)+(2.024)+(3.031), (I-302)+(2.024)+(5.001), (I-302)+(2.024)+(5.002), (I-302)+(2.024)+(5.003), (I-302)+(2.024)+(5.004), (I-302)+(2.024)+(5.005), (I-302)+(2.024)+(5.006), (I-302)+(2.024)+(5.007), (I-302)+(2.024)+(5.008), (I-302)+(2.024)+(5.009), (I-302)+(2.024)+(5.010), (I-302)+(2.024)+(5.011), (I-302)+(2.024)+(5.012), (I-302)+(2.024)+(5.013), (I-302)+(2.024)+(5.014), (I-302)+(2.024)+(5.015), (I-302)+(2.024)+(5.016), (I-302)+(2.024)+(5.017), (I-302)+(2.024)+(5.018), (I-302)+(2.024)+(5.019), (I-302)+(2.024)+(5.020), (I-302)+(2.024)+(5.021), (I-302)+(2.024)+(5.022), (I-302)+(2.024)+(5.023), (I-302)+(2.024)+(6.001), (I-302)+(2.024)+(6.002), (I-302)+(2.024)+(6.003), (I-302)+(2.024)+(6.004), (I-302)+(2.024)+(7.001), (I-302)+(2.024)+(7.002), (I-302)+(2.024)+(7.003), (I-302)+(2.024)+(7.004), (I-302)+(2.024)+(7.005), (I-302)+(2.024)+(7.006), (I-302)+(2.024)+(9.001), (I-302)+(2.024)+(9.002), (I-302)+(2.024)+(9.003), (I-302)+(2.024)+(9.004), (I-302)+(2.024)+(9.005), (I-302)+(2.024)+(9.006), (I-302)+(2.024)+(9.007), (I-302)+(2.024)+(9.008), (I-302)+(2.024)+(9.009), (I-302)+(2.024)+(14.001), (I-302)+(2.024)+(14.002), (I-302)+(2.024)+(15.008), (I-302)+(2.024)+(15.011), (I-302)+(2.024)+(15.012), (I-302)+(2.024)+(15.016), (I-302)+(2.024)+(15.025), (I-302)+(2.024)+(15.027), (I-302)+(2.024)+(15.047), (I-302)+(2.024)+(15.063), (I-302)+(2.024)+(15.064), (I-302)+(2.024)+(16.001), (I-302)+(2.024)+(16.002), (I-302)+(2.024)+(16.003), (I-302)+(2.024)+(16.004), (I-302)+(2.024)+(16.005), (I-302)+(2.024)+(16.006), (I-302)+(2.024)+(16.007), (I-302)+(2.024)+(16.008), (I-302)+(2.024)+(17.001), (I-302)+(2.024)+(17.002), (I-302)+(2.024)+(17.003), (I-302)+(2.024)+(17.004), (I-302)+(2.024)+(17.005), (I-302)+(2.024)+(17.006), (I-302)+(2.024)+(17.007), (I-302)+(2.024)+(17.008), (I-302)+(2.024)+(17.009), (I-302)+(2.024)+(17.010), (I-302)+(2.024)+(17.011), (I-302)+(2.024)+(17.012), (I-302)+(2.024)+(18.001), (I-302)+(2.025)+(3.001), (I-302)+(2.025)+(3.002), (I-302)+(2.025)+(3.003), (I-302)+(2.025)+(3.004), (I-302)+(2.025)+(3.005), (I-302)+(2.025)+(3.006), (I-302)+(2.025)+(3.007), (I-302)+(2.025)+(3.008), (I-302)+(2.025)+(3.009), (I-302)+(2.025)+(3.010), (I-302)+(2.025)+(3.011), (I-302)+(2.025)+(3.012), (I-302)+(2.025)+(3.013), (I-302)+(2.025)+(3.014), (I-302)+(2.025)+(3.015), (I-302)+(2.025)+(3.016), (I-302)+(2.025)+(3.017), (I-302)+(2.025)+(3.018), (I-302)+(2.025)+(3.019), (I-302)+(2.025)+(3.020), (I-302)+(2.025)+(3.021), (I-302)+(2.025)+(3.022), (I-302)+(2.025)+(3.023), (I-302)+(2.025)+(3.024), (I-302)+(2.025)+(3.025), (I-302)+(2.025)+(3.026), (I-302)+(2.025)+(3.027), (I-302)+(2.025)+(3.028), (I-302)+(2.025)+(3.029), (I-302)+(2.025)+(3.030), (I-302)+(2.025)+(3.031), (I-302)+(2.025)+(5.001), (I-302)+(2.025)+(5.002), (I-302)+(2.025)+(5.003), (I-302)+(2.025)+(5.004), (I-302)+(2.025)+(5.005), (I-302)+(2.025)+(5.006), (I-302)+(2.025)+(5.007), (I-302)+(2.025)+(5.008), (I-302)+(2.025)+(5.009), (I-302)+(2.025)+(5.010), (I-302)+(2.025)+(5.011), (I-302)+(2.025)+(5.012), (I-302)+(2.025)+(5.013), (I-302)+(2.025)+(5.014), (I-302)+(2.025)+(5.015), (I-302)+(2.025)+(5.016), (I-302)+(2.025)+(5.017), (I-302)+(2.025)+(5.018), (I-302)+(2.025)+(5.019), (I-302)+(2.025)+(5.020), (I-302)+(2.025)+(5.021), (I-302)+(2.025)+(5.022), (I-302)+(2.025)+(5.023), (I-302)+(2.025)+(6.001), (I-302)+(2.025)+(6.002), (I-302)+(2.025)+(6.003), (I-302)+(2.025)+(6.004), (I-302)+(2.025)+(7.001), (I-302)+(2.025)+(7.002), (I-302)+(2.025)+(7.003), (I-302)+(2.025)+(7.004), (I-302)+(2.025)+(7.005), (I-302)+(2.025)+(7.006), (I-302)+(2.025)+(9.001), (I-302)+(2.025)+(9.002), (I-302)+(2.025)+(9.003), (I-302)+(2.025)+(9.004), (I-302)+(2.025)+(9.005), (I-302)+(2.025)+(9.006), (I-302)+(2.025)+(9.007), (I-302)+(2.025)+(9.008), (I-302)+(2.025)+(9.009), (I-302)+(2.025)+(14.001), (I-302)+(2.025)+(14.002), (I-302)+(2.025)+(15.008), (I-302)+(2.025)+(15.011), (I-302)+(2.025)+(15.012), (I-302)+(2.025)+(15.016), (I-302)+(2.025)+(15.025), (I-302)+(2.025)+(15.027), (I-302)+(2.025)+(15.047), (I-302)+(2.025)+(15.063), (I-302)+(2.025)+(15.064), (I-302)+(2.025)+(16.001), (I-302)+(2.025)+(16.002), (I-302)+(2.025)+(16.003), (I-302)+(2.025)+(16.004), (I-302)+(2.025)+(16.005), (I-302)+(2.025)+(16.006), (I-302)+(2.025)+(16.007), (I-302)+(2.025)+(16.008), (I-302)+(2.025)+(17.001), (I-302)+(2.025)+(17.002), (I-302)+(2.025)+(17.003), (I-302)+(2.025)+(17.004), (I-302)+(2.025)+(17.005), (I-302)+(2.025)+(17.006), (I-302)+(2.025)+(17.007), (I-302)+(2.025)+(17.008), (I-302)+(2.025)+(17.009), (I-302)+(2.025)+(17.010), (I-302)+(2.025)+(17.011), (I-302)+(2.025)+(17.012), (I-302)+(2.025)+(18.001), (I-302)+(2.026)+(3.001), (I-302)+(2.026)+(3.002), (I-302)+(2.026)+(3.003), (I-302)+(2.026)+(3.004), (I-302)+(2.026)+(3.005), (I-302)+(2.026)+(3.006), (I-302)+(2.026)+(3.007), (I-302)+(2.026)+(3.008), (I-302)+(2.026)+(3.009), (I-302)+(2.026)+(3.010), (I-302)+(2.026)+(3.011), (I-302)+(2.026)+(3.012), (I-302)+(2.026)+(3.013), (I-302)+(2.026)+(3.014), (I-302)+(2.026)+(3.015), (I-302)+(2.026)+(3.016), (I-302)+(2.026)+(3.017), (I-302)+(2.026)+(3.018), (I-302)+(2.026)+(3.019), (I-302)+(2.026)+(3.020), (I-302)+(2.026)+(3.021), (I-302)+(2.026)+(3.022), (I-302)+(2.026)+(3.023), (I-302)+(2.026)+(3.024), (I-302)+(2.026)+(3.025), (I-302)+(2.026)+(3.026), (I-302)+(2.026)+(3.027), (I-302)+(2.026)+(3.028), (I-302)+(2.026)+(3.029), (I-302)+(2.026)+(3.030), (I-302)+(2.026)+(3.031), (I-302)+(2.026)+(5.001), (I-302)+(2.026)+(5.002), (I-302)+(2.026)+(5.003), (I-302)+(2.026)+(5.004), (I-302)+(2.026)+(5.005), (I-302)+(2.026)+(5.006), (I-302)+(2.026)+(5.007), (I-302)+(2.026)+(5.008), (I-302)+(2.026)+(5.009), (I-302)+(2.026)+(5.010), (I-302)+(2.026)+(5.011), (I-302)+(2.026)+(5.012), (I-302)+(2.026)+(5.013), (I-302)+(2.026)+(5.014), (I-302)+(2.026)+(5.015), (I-302)+(2.026)+(5.016), (I-302)+(2.026)+(5.017), (I-302)+(2.026)+(5.018), (I-302)+(2.026)+(5.019), (I-302)+(2.026)+(5.020), (I-302)+(2.026)+(5.021), (I-302)+(2.026)+(5.022), (I-302)+(2.026)+(5.023), (I-302)+(2.026)+(6.001), (I-302)+(2.026)+(6.002), (I-302)+(2.026)+(6.003), (I-302)+(2.026)+(6.004), (I-302)+(2.026)+(7.001), (I-302)+(2.026)+(7.002), (I-302)+(2.026)+(7.003), (I-302)+(2.026)+(7.004), (I-302)+(2.026)+(7.005), (I-302)+(2.026)+(7.006), (I-302)+(2.026)+(9.001), (I-302)+(2.026)+(9.002), (I-302)+(2.026)+(9.003), (I-302)+(2.026)+(9.004), (I-302)+(2.026)+(9.005), (I-302)+(2.026)+(9.006), (I-302)+(2.026)+(9.007), (I-302)+(2.026)+(9.008), (I-302)+(2.026)+(9.009), (I-302)+(2.026)+(14.001), (I-302)+(2.026)+(14.002), (I-302)+(2.026)+(15.008), (I-302)+(2.026)+(15.011), (I-302)+(2.026)+(15.012), (I-302)+(2.026)+(15.016), (I-302)+(2.026)+(15.025), (I-302)+(2.026)+(15.027), (I-302)+(2.026)+(15.047), (I-302)+(2.026)+(15.063), (I-302)+(2.026)+(15.064), (I-302)+(2.026)+(16.001), (I-302)+(2.026)+(16.002), (I-302)+(2.026)+(16.003), (I-302)+(2.026)+(16.004), (I-302)+(2.026)+(16.005), (I-302)+(2.026)+(16.006), (I-302)+(2.026)+(16.007), (I-302)+(2.026)+(16.008), (I-302)+(2.026)+(17.001), (I-302)+(2.026)+(17.002), (I-302)+(2.026)+(17.003), (I-302)+(2.026)+(17.004), (I-302)+(2.026)+(17.005), (I-302)+(2.026)+(17.006), (I-302)+(2.026)+(17.007), (I-302)+(2.026)+(17.008), (I-302)+(2.026)+(17.009), (I-302)+(2.026)+(17.010), (I-302)+(2.026)+(17.011), (I-302)+(2.026)+(17.012), (I-302)+(2.026)+(18.001), (I-302)+(2.027)+(3.001), (I-302)+(2.027)+(3.002), (I-302)+(2.027)+(3.003), (I-302)+(2.027)+(3.004), (I-302)+(2.027)+(3.005), (I-302)+(2.027)+(3.006), (I-302)+(2.027)+(3.007), (I-302)+(2.027)+(3.008), (I-302)+(2.027)+(3.009), (I-302)+(2.027)+(3.010), (I-302)+(2.027)+(3.011), (I-302)+(2.027)+(3.012), (I-302)+(2.027)+(3.013), (I-302)+(2.027)+(3.014), (I-302)+(2.027)+(3.015), (I-302)+(2.027)+(3.016), (I-302)+(2.027)+(3.017), (I-302)+(2.027)+(3.018), (I-302)+(2.027)+(3.019), (I-302)+(2.027)+(3.020), (I-302)+(2.027)+(3.021), (I-302)+(2.027)+(3.022), (I-302)+(2.027)+(3.023), (I-302)+(2.027)+(3.024), (I-302)+(2.027)+(3.025), (I-302)+(2.027)+(3.026), (I-302)+(2.027)+(3.027), (I-302)+(2.027)+(3.028), (I-302)+(2.027)+(3.029), (I-302)+(2.027)+(3.030), (I-302)+(2.027)+(3.031), (I-302)+(2.027)+(5.001), (I-302)+(2.027)+(5.002), (I-302)+(2.027)+(5.003), (I-302)+(2.027)+(5.004), (I-302)+(2.027)+(5.005), (I-302)+(2.027)+(5.006), (I-302)+(2.027)+(5.007), (I-302)+(2.027)+(5.008), (I-302)+(2.027)+(5.009), (I-302)+(2.027)+(5.010), (I-302)+(2.027)+(5.011), (I-302)+(2.027)+(5.012), (I-302)+(2.027)+(5.013), (I-302)+(2.027)+(5.014), (I-302)+(2.027)+(5.015), (I-302)+(2.027)+(5.016), (I-302)+(2.027)+(5.017), (I-302)+(2.027)+(5.018), (I-302)+(2.027)+(5.019), (I-302)+(2.027)+(5.020), (I-302)+(2.027)+(5.021), (I-302)+(2.027)+(5.022), (I-302)+(2.027)+(5.023), (I-302)+(2.027)+(6.001), (I-302)+(2.027)+(6.002), (I-302)+(2.027)+(6.003), (I-302)+(2.027)+(6.004), (I-302)+(2.027)+(7.001), (I-302)+(2.027)+(7.002), (I-302)+(2.027)+(7.003), (I-302)+(2.027)+(7.004), (I-302)+(2.027)+(7.005), (I-302)+(2.027)+(7.006), (I-302)+(2.027)+(9.001), (I-302)+(2.027)+(9.002), (I-302)+(2.027)+(9.003), (I-302)+(2.027)+(9.004), (I-302)+(2.027)+(9.005), (I-302)+(2.027)+(9.006), (I-302)+(2.027)+(9.007), (I-302)+(2.027)+(9.008), (I-302)+(2.027)+(9.009), (I-302)+(2.027)+(14.001), (I-302)+(2.027)+(14.002), (I-302)+(2.027)+(15.008), (I-302)+(2.027)+(15.011), (I-302)+(2.027)+(15.012), (I-302)+(2.027)+(15.016), (I-302)+(2.027)+(15.025), (I-302)+(2.027)+(15.027), (I-302)+(2.027)+(15.047), (I-302)+(2.027)+(15.063), (I-302)+(2.027)+(15.064), (I-302)+(2.027)+(16.001), (I-302)+(2.027)+(16.002), (I-302)+(2.027)+(16.003), (I-302)+(2.027)+(16.004), (I-302)+(2.027)+(16.005), (I-302)+(2.027)+(16.006), (I-302)+(2.027)+(16.007), (I-302)+(2.027)+(16.008), (I-302)+(2.027)+(17.001), (I-302)+(2.027)+(17.002), (I-302)+(2.027)+(17.003), (I-302)+(2.027)+(17.004), (I-302)+(2.027)+(17.005), (I-302)+(2.027)+(17.006), (I-302)+(2.027)+(17.007), (I-302)+(2.027)+(17.008), (I-302)+(2.027)+(17.009), (I-302)+(2.027)+(17.010), (I-302)+(2.027)+(17.011), (I-302)+(2.027)+(17.012), (I-302)+(2.027)+(18.001), (I-302)+(2.028)+(3.001), (I-302)+(2.028)+(3.002), (I-302)+(2.028)+(3.003), (I-302)+(2.028)+(3.004), (I-302)+(2.028)+(3.005), (I-302)+(2.028)+(3.006), (I-302)+(2.028)+(3.007), (I-302)+(2.028)+(3.008), (I-302)+(2.028)+(3.009), (I-302)+(2.028)+(3.010), (I-302)+(2.028)+(3.011), (I-302)+(2.028)+(3.012), (I-302)+(2.028)+(3.013), (I-302)+(2.028)+(3.014), (I-302)+(2.028)+(3.015), (I-302)+(2.028)+(3.016), (I-302)+(2.028)+(3.017), (I-302)+(2.028)+(3.018), (I-302)+(2.028)+(3.019), (I-302)+(2.028)+(3.020), (I-302)+(2.028)+(3.021), (I-302)+(2.028)+(3.022), (I-302)+(2.028)+(3.023), (I-302)+(2.028)+(3.024), (I-302)+(2.028)+(3.025), (I-302)+(2.028)+(3.026), (I-302)+(2.028)+(3.027), (I-302)+(2.028)+(3.028), (I-302)+(2.028)+(3.029), (I-302)+(2.028)+(3.030), (I-302)+(2.028)+(3.031), (I-302)+(2.028)+(5.001), (I-302)+(2.028)+(5.002), (I-302)+(2.028)+(5.003), (I-302)+(2.028)+(5.004), (I-302)+(2.028)+(5.005), (I-302)+(2.028)+(5.006), (I-302)+(2.028)+(5.007), (I-302)+(2.028)+(5.008), (I-302)+(2.028)+(5.009), (I-302)+(2.028)+(5.010), (I-302)+(2.028)+(5.011), (I-302)+(2.028)+(5.012), (I-302)+(2.028)+(5.013), (I-302)+(2.028)+(5.014), (I-302)+(2.028)+(5.015), (I-302)+(2.028)+(5.016), (I-302)+(2.028)+(5.017), (I-302)+(2.028)+(5.018), (I-302)+(2.028)+(5.019), (I-302)+(2.028)+(5.020), (I-302)+(2.028)+(5.021), (I-302)+(2.028)+(5.022), (I-302)+(2.028)+(5.023), (I-302)+(2.028)+(6.001), (I-302)+(2.028)+(6.002), (I-302)+(2.028)+(6.003), (I-302)+(2.028)+(6.004), (I-302)+(2.028)+(7.001), (I-302)+(2.028)+(7.002), (I-302)+(2.028)+(7.003), (I-302)+(2.028)+(7.004), (I-302)+(2.028)+(7.005), (I-302)+(2.028)+(7.006), (I-302)+(2.028)+(9.001), (I-302)+(2.028)+(9.002), (I-302)+(2.028)+(9.003), (I-302)+(2.028)+(9.004), (I-302)+(2.028)+(9.005), (I-302)+(2.028)+(9.006), (I-302)+(2.028)+(9.007), (I-302)+(2.028)+(9.008), (I-302)+(2.028)+(9.009), (I-302)+(2.028)+(14.001), (I-302)+(2.028)+(14.002), (I-302)+(2.028)+(15.008), (I-302)+(2.028)+(15.011), (I-302)+(2.028)+(15.012), (I-302)+(2.028)+(15.016), (I-302)+(2.028)+(15.025), (I-302)+(2.028)+(15.027), (I-302)+(2.028)+(15.047), (I-302)+(2.028)+(15.063), (I-302)+(2.028)+(15.064), (I-302)+(2.028)+(16.001), (I-302)+(2.028)+(16.002), (I-302)+(2.028)+(16.003), (I-302)+(2.028)+(16.004), (I-302)+(2.028)+(16.005), (I-302)+(2.028)+(16.006), (I-302)+(2.028)+(16.007), (I-302)+(2.028)+(16.008), (I-302)+(2.028)+(17.001), (I-302)+(2.028)+(17.002), (I-302)+(2.028)+(17.003), (I-302)+(2.028)+(17.004), (I-302)+(2.028)+(17.005), (I-302)+(2.028)+(17.006), (I-302)+(2.028)+(17.007), (I-302)+(2.028)+(17.008), (I-302)+(2.028)+(17.009), (I-302)+(2.028)+(17.010), (I-302)+(2.028)+(17.011), (I-302)+(2.028)+(17.012), (I-302)+(2.028)+(18.001), (I-302)+(2.029)+(3.001), (I-302)+(2.029)+(3.002), (I-302)+(2.029)+(3.003), (I-302)+(2.029)+(3.004), (I-302)+(2.029)+(3.005), (I-302)+(2.029)+(3.006), (I-302)+(2.029)+(3.007), (I-302)+(2.029)+(3.008), (I-302)+(2.029)+(3.009), (I-302)+(2.029)+(3.010), (I-302)+(2.029)+(3.011), (I-302)+(2.029)+(3.012), (I-302)+(2.029)+(3.013), (I-302)+(2.029)+(3.014), (I-302)+(2.029)+(3.015), (I-302)+(2.029)+(3.016), (I-302)+(2.029)+(3.017), (I-302)+(2.029)+(3.018), (I-302)+(2.029)+(3.019), (I-302)+(2.029)+(3.020), (I-302)+(2.029)+(3.021), (I-302)+(2.029)+(3.022), (I-302)+(2.029)+(3.023), (I-302)+(2.029)+(3.024), (I-302)+(2.029)+(3.025), (I-302)+(2.029)+(3.026), (I-302)+(2.029)+(3.027), (I-302)+(2.029)+(3.028), (I-302)+(2.029)+(3.029), (I-302)+(2.029)+(3.030), (I-302)+(2.029)+(3.031), (I-302)+(2.029)+(5.001), (I-302)+(2.029)+(5.002), (I-302)+(2.029)+(5.003), (I-302)+(2.029)+(5.004), (I-302)+(2.029)+(5.005), (I-302)+(2.029)+(5.006), (I-302)+(2.029)+(5.007), (I-302)+(2.029)+(5.008), (I-302)+(2.029)+(5.009), (I-302)+(2.029)+(5.010), (I-302)+(2.029)+(5.011), (I-302)+(2.029)+(5.012), (I-302)+(2.029)+(5.013), (I-302)+(2.029)+(5.014), (I-302)+(2.029)+(5.015), (I-302)+(2.029)+(5.016), (I-302)+(2.029)+(5.017), (I-302)+(2.029)+(5.018), (I-302)+(2.029)+(5.019), (I-302)+(2.029)+(5.020), (I-302)+(2.029)+(5.021), (I-302)+(2.029)+(5.022), (I-302)+(2.029)+(5.023), (I-302)+(2.029)+(6.001), (I-302)+(2.029)+(6.002), (I-302)+(2.029)+(6.003), (I-302)+(2.029)+(6.004), (I-302)+(2.029)+(7.001), (I-302)+(2.029)+(7.002), (I-302)+(2.029)+(7.003), (I-302)+(2.029)+(7.004), (I-302)+(2.029)+(7.005), (I-302)+(2.029)+(7.006), (I-302)+(2.029)+(9.001), (I-302)+(2.029)+(9.002), (I-302)+(2.029)+(9.003), (I-302)+(2.029)+(9.004), (I-302)+(2.029)+(9.005), (I-302)+(2.029)+(9.006), (I-302)+(2.029)+(9.007), (I-302)+(2.029)+(9.008), (I-302)+(2.029)+(9.009), (I-302)+(2.029)+(14.001), (I-302)+(2.029)+(14.002), (I-302)+(2.029)+(15.008), (I-302)+(2.029)+(15.011), (I-302)+(2.029)+(15.012), (I-302)+(2.029)+(15.016), (I-302)+(2.029)+(15.025), (I-302)+(2.029)+(15.027), (I-302)+(2.029)+(15.047), (I-302)+(2.029)+(15.063), (I-302)+(2.029)+(15.064), (I-302)+(2.029)+(16.001), (I-302)+(2.029)+(16.002), (I-302)+(2.029)+(16.003), (I-302)+(2.029)+(16.004), (I-302)+(2.029)+(16.005), (I-302)+(2.029)+(16.006), (I-302)+(2.029)+(16.007), (I-302)+(2.029)+(16.008), (I-302)+(2.029)+(17.001), (I-302)+(2.029)+(17.002), (I-302)+(2.029)+(17.003), (I-302)+(2.029)+(17.004), (I-302)+(2.029)+(17.005), (I-302)+(2.029)+(17.006), (I-302)+(2.029)+(17.007), (I-302)+(2.029)+(17.008), (I-302)+(2.029)+(17.009), (I-302)+(2.029)+(17.010), (I-302)+(2.029)+(17.011), (I-302)+(2.029)+(17.012), (I-302)+(2.029)+(18.001), (I-302)+(2.030)+(3.001), (I-302)+(2.030)+(3.002), (I-302)+(2.030)+(3.003), (I-302)+(2.030)+(3.004), (I-302)+(2.030)+(3.005), (I-302)+(2.030)+(3.006), (I-302)+(2.030)+(3.007), (I-302)+(2.030)+(3.008), (I-302)+(2.030)+(3.009), (I-302)+(2.030)+(3.010), (I-302)+(2.030)+(3.011), (I-302)+(2.030)+(3.012), (I-302)+(2.030)+(3.013), (I-302)+(2.030)+(3.014), (I-302)+(2.030)+(3.015), (I-302)+(2.030)+(3.016), (I-302)+(2.030)+(3.017), (I-302)+(2.030)+(3.018), (I-302)+(2.030)+(3.019), (I-302)+(2.030)+(3.020), (I-302)+(2.030)+(3.021), (I-302)+(2.030)+(3.022), (I-302)+(2.030)+(3.023), (I-302)+(2.030)+(3.024), (I-302)+(2.030)+(3.025), (I-302)+(2.030)+(3.026), (I-302)+(2.030)+(3.027), (I-302)+(2.030)+(3.028), (I-302)+(2.030)+(3.029), (I-302)+(2.030)+(3.030), (I-302)+(2.030)+(3.031), (I-302)+(2.030)+(5.001), (I-302)+(2.030)+(5.002), (I-302)+(2.030)+(5.003), (I-302)+(2.030)+(5.004), (I-302)+(2.030)+(5.005), (I-302)+(2.030)+(5.006), (I-302)+(2.030)+(5.007), (I-302)+(2.030)+(5.008), (I-302)+(2.030)+(5.009), (I-302)+(2.030)+(5.010), (I-302)+(2.030)+(5.011), (I-302)+(2.030)+(5.012), (I-302)+(2.030)+(5.013), (I-302)+(2.030)+(5.014), (I-302)+(2.030)+(5.015), (I-302)+(2.030)+(5.016), (I-302)+(2.030)+(5.017), (I-302)+(2.030)+(5.018), (I-302)+(2.030)+(5.019), (I-302)+(2.030)+(5.020), (I-302)+(2.030)+(5.021), (I-302)+(2.030)+(5.022), (I-302)+(2.030)+(5.023), (I-302)+(2.030)+(6.001), (I-302)+(2.030)+(6.002), (I-302)+(2.030)+(6.003), (I-302)+(2.030)+(6.004), (I-302)+(2.030)+(7.001), (I-302)+(2.030)+(7.002), (I-302)+(2.030)+(7.003), (I-302)+(2.030)+(7.004), (I-302)+(2.030)+(7.005), (I-302)+(2.030)+(7.006), (I-302)+(2.030)+(9.001), (I-302)+(2.030)+(9.002), (I-302)+(2.030)+(9.003), (I-302)+(2.030)+(9.004), (I-302)+(2.030)+(9.005), (I-302)+(2.030)+(9.006), (I-302)+(2.030)+(9.007), (I-302)+(2.030)+(9.008), (I-302)+(2.030)+(9.009), (I-302)+(2.030)+(14.001), (I-302)+(2.030)+(14.002), (I-302)+(2.030)+(15.008), (I-302)+(2.030)+(15.011), (I-302)+(2.030)+(15.012), (I-302)+(2.030)+(15.016), (I-302)+(2.030)+(15.025), (I-302)+(2.030)+(15.027), (I-302)+(2.030)+(15.047), (I-302)+(2.030)+(15.063), (I-302)+(2.030)+(15.064), (I-302)+(2.030)+(16.001), (I-302)+(2.030)+(16.002), (I-302)+(2.030)+(16.003), (I-302)+(2.030)+(16.004), (I-302)+(2.030)+(16.005), (I-302)+(2.030)+(16.006), (I-302)+(2.030)+(16.007), (I-302)+(2.030)+(16.008), (I-302)+(2.030)+(17.001), (I-302)+(2.030)+(17.002), (I-302)+(2.030)+(17.003), (I-302)+(2.030)+(17.004), (I-302)+(2.030)+(17.005), (I-302)+(2.030)+(17.006), (I-302)+(2.030)+(17.007), (I-302)+(2.030)+(17.008), (I-302)+(2.030)+(17.009), (I-302)+(2.030)+(17.010), (I-302)+(2.030)+(17.011), (I-302)+(2.030)+(17.012), (I-302)+(2.030)+(18.001), (I-302)+(2.031)+(3.001), (I-302)+(2.031)+(3.002), (I-302)+(2.031)+(3.003), (I-302)+(2.031)+(3.004), (I-302)+(2.031)+(3.005), (I-302)+(2.031)+(3.006), (I-302)+(2.031)+(3.007), (I-302)+(2.031)+(3.008), (I-302)+(2.031)+(3.009), (I-302)+(2.031)+(3.010), (I-302)+(2.031)+(3.011), (I-302)+(2.031)+(3.012), (I-302)+(2.031)+(3.013), (I-302)+(2.031)+(3.014), (I-302)+(2.031)+(3.015), (I-302)+(2.031)+(3.016), (I-302)+(2.031)+(3.017), (I-302)+(2.031)+(3.018), (I-302)+(2.031)+(3.019), (I-302)+(2.031)+(3.020), (I-302)+(2.031)+(3.021), (I-302)+(2.031)+(3.022), (I-302)+(2.031)+(3.023), (I-302)+(2.031)+(3.024), (I-302)+(2.031)+(3.025), (I-302)+(2.031)+(3.026), (I-302)+(2.031)+(3.027), (I-302)+(2.031)+(3.028), (I-302)+(2.031)+(3.029), (I-302)+(2.031)+(3.030), (I-302)+(2.031)+(3.031), (I-302)+(2.031)+(5.001), (I-302)+(2.031)+(5.002), (I-302)+(2.031)+(5.003), (I-302)+(2.031)+(5.004), (I-302)+(2.031)+(5.005), (I-302)+(2.031)+(5.006), (I-302)+(2.031)+(5.007), (I-302)+(2.031)+(5.008), (I-302)+(2.031)+(5.009), (I-302)+(2.031)+(5.010), (I-302)+(2.031)+(5.011), (I-302)+(2.031)+(5.012), (I-302)+(2.031)+(5.013), (I-302)+(2.031)+(5.014), (I-302)+(2.031)+(5.015), (I-302)+(2.031)+(5.016), (I-302)+(2.031)+(5.017), (I-302)+(2.031)+(5.018), (I-302)+(2.031)+(5.019), (I-302)+(2.031)+(5.020), (I-302)+(2.031)+(5.021), (I-302)+(2.031)+(5.022), (I-302)+(2.031)+(5.023), (I-302)+(2.031)+(6.001), (I-302)+(2.031)+(6.002), (I-302)+(2.031)+(6.003), (I-302)+(2.031)+(6.004), (I-302)+(2.031)+(7.001), (I-302)+(2.031)+(7.002), (I-302)+(2.031)+(7.003), (I-302)+(2.031)+(7.004), (I-302)+(2.031)+(7.005), (I-302)+(2.031)+(7.006), (I-302)+(2.031)+(9.001), (I-302)+(2.031)+(9.002), (I-302)+(2.031)+(9.003), (I-302)+(2.031)+(9.004), (I-302)+(2.031)+(9.005), (I-302)+(2.031)+(9.006), (I-302)+(2.031)+(9.007), (I-302)+(2.031)+(9.008), (I-302)+(2.031)+(9.009), (I-302)+(2.031)+(14.001), (I-302)+(2.031)+(14.002), (I-302)+(2.031)+(15.008), (I-302)+(2.031)+(15.011), (I-302)+(2.031)+(15.012), (I-302)+(2.031)+(15.016), (I-302)+(2.031)+(15.025), (I-302)+(2.031)+(15.027), (I-302)+(2.031)+(15.047), (I-302)+(2.031)+(15.063), (I-302)+(2.031)+(15.064), (I-302)+(2.031)+(16.001), (I-302)+(2.031)+(16.002), (I-302)+(2.031)+(16.003), (I-302)+(2.031)+(16.004), (I-302)+(2.031)+(16.005), (I-302)+(2.031)+(16.006), (I-302)+(2.031)+(16.007), (I-302)+(2.031)+(16.008), (I-302)+(2.031)+(17.001), (I-302)+(2.031)+(17.002), (I-302)+(2.031)+(17.003), (I-302)+(2.031)+(17.004), (I-302)+(2.031)+(17.005), (I-302)+(2.031)+(17.006), (I-302)+(2.031)+(17.007), (I-302)+(2.031)+(17.008), (I-302)+(2.031)+(17.009), (I-302)+(2.031)+(17.010), (I-302)+(2.031)+(17.011), (I-302)+(2.031)+(17.012), (I-302)+(2.031)+(18.001), (I-302)+(2.032)+(3.001), (I-302)+(2.032)+(3.002), (I-302)+(2.032)+(3.003), (I-302)+(2.032)+(3.004), (I-302)+(2.032)+(3.005), (I-302)+(2.032)+(3.006), (I-302)+(2.032)+(3.007), (I-302)+(2.032)+(3.008), (I-302)+(2.032)+(3.009), (I-302)+(2.032)+(3.010), (I-302)+(2.032)+(3.011), (I-302)+(2.032)+(3.012), (I-302)+(2.032)+(3.013), (I-302)+(2.032)+(3.014), (I-302)+(2.032)+(3.015), (I-302)+(2.032)+(3.016), (I-302)+(2.032)+(3.017), (I-302)+(2.032)+(3.018), (I-302)+(2.032)+(3.019), (I-302)+(2.032)+(3.020), (I-302)+(2.032)+(3.021), (I-302)+(2.032)+(3.022), (I-302)+(2.032)+(3.023), (I-302)+(2.032)+(3.024), (I-302)+(2.032)+(3.025), (I-302)+(2.032)+(3.026), (I-302)+(2.032)+(3.027), (I-302)+(2.032)+(3.028), (I-302)+(2.032)+(3.029), (I-302)+(2.032)+(3.030), (I-302)+(2.032)+(3.031), (I-302)+(2.032)+(5.001), (I-302)+(2.032)+(5.002), (I-302)+(2.032)+(5.003), (I-302)+(2.032)+(5.004), (I-302)+(2.032)+(5.005), (I-302)+(2.032)+(5.006), (I-302)+(2.032)+(5.007), (I-302)+(2.032)+(5.008), (I-302)+(2.032)+(5.009), (I-302)+(2.032)+(5.010), (I-302)+(2.032)+(5.011), (I-302)+(2.032)+(5.012), (I-302)+(2.032)+(5.013), (I-302)+(2.032)+(5.014), (I-302)+(2.032)+(5.015), (I-302)+(2.032)+(5.016), (I-302)+(2.032)+(5.017), (I-302)+(2.032)+(5.018), (I-302)+(2.032)+(5.019), (I-302)+(2.032)+(5.020), (I-302)+(2.032)+(5.021), (I-302)+(2.032)+(5.022), (I-302)+(2.032)+(5.023), (I-302)+(2.032)+(6.001), (I-302)+(2.032)+(6.002), (I-302)+(2.032)+(6.003), (I-302)+(2.032)+(6.004), (I-302)+(2.032)+(7.001), (I-302)+(2.032)+(7.002), (I-302)+(2.032)+(7.003), (I-302)+(2.032)+(7.004), (I-302)+(2.032)+(7.005), (I-302)+(2.032)+(7.006), (I-302)+(2.032)+(9.001), (I-302)+(2.032)+(9.002), (I-302)+(2.032)+(9.003), (I-302)+(2.032)+(9.004), (I-302)+(2.032)+(9.005), (I-302)+(2.032)+(9.006), (I-302)+(2.032)+(9.007), (I-302)+(2.032)+(9.008), (I-302)+(2.032)+(9.009), (I-302)+(2.032)+(14.001), (I-302)+(2.032)+(14.002), (I-302)+(2.032)+(15.008), (I-302)+(2.032)+(15.011), (I-302)+(2.032)+(15.012), (I-302)+(2.032)+(15.016), (I-302)+(2.032)+(15.025), (I-302)+(2.032)+(15.027), (I-302)+(2.032)+(15.047), (I-302)+(2.032)+(15.063), (I-302)+(2.032)+(15.064), (I-302)+(2.032)+(16.001), (I-302)+(2.032)+(16.002), (I-302)+(2.032)+(16.003), (I-302)+(2.032)+(16.004), (I-302)+(2.032)+(16.005), (I-302)+(2.032)+(16.006), (I-302)+(2.032)+(16.007), (I-302)+(2.032)+(16.008), (I-302)+(2.032)+(17.001), (I-302)+(2.032)+(17.002), (I-302)+(2.032)+(17.003), (I-302)+(2.032)+(17.004), (I-302)+(2.032)+(17.005), (I-302)+(2.032)+(17.006), (I-302)+(2.032)+(17.007), (I-302)+(2.032)+(17.008), (I-302)+(2.032)+(17.009), (I-302)+(2.032)+(17.010), (I-302)+(2.032)+(17.011), (I-302)+(2.032)+(17.012), (I-302)+(2.032)+(18.001), (I-302)+(2.033)+(3.001), (I-302)+(2.033)+(3.002), (I-302)+(2.033)+(3.003), (I-302)+(2.033)+(3.004), (I-302)+(2.033)+(3.005), (I-302)+(2.033)+(3.006), (I-302)+(2.033)+(3.007), (I-302)+(2.033)+(3.008), (I-302)+(2.033)+(3.009), (I-302)+(2.033)+(3.010), (I-302)+(2.033)+(3.011), (I-302)+(2.033)+(3.012), (I-302)+(2.033)+(3.013), (I-302)+(2.033)+(3.014), (I-302)+(2.033)+(3.015), (I-302)+(2.033)+(3.016), (I-302)+(2.033)+(3.017), (I-302)+(2.033)+(3.018), (I-302)+(2.033)+(3.019), (I-302)+(2.033)+(3.020), (I-302)+(2.033)+(3.021), (I-302)+(2.033)+(3.022), (I-302)+(2.033)+(3.023), (I-302)+(2.033)+(3.024), (I-302)+(2.033)+(3.025), (I-302)+(2.033)+(3.026), (I-302)+(2.033)+(3.027), (I-302)+(2.033)+(3.028), (I-302)+(2.033)+(3.029), (I-302)+(2.033)+(3.030), (I-302)+(2.033)+(3.031), (I-302)+(2.033)+(5.001), (I-302)+(2.033)+(5.002), (I-302)+(2.033)+(5.003), (I-302)+(2.033)+(5.004), (I-302)+(2.033)+(5.005), (I-302)+(2.033)+(5.006), (I-302)+(2.033)+(5.007), (I-302)+(2.033)+(5.008), (I-302)+(2.033)+(5.009), (I-302)+(2.033)+(5.010), (I-302)+(2.033)+(5.011), (I-302)+(2.033)+(5.012), (I-302)+(2.033)+(5.013), (I-302)+(2.033)+(5.014), (I-302)+(2.033)+(5.015), (I-302)+(2.033)+(5.016), (I-302)+(2.033)+(5.017), (I-302)+(2.033)+(5.018), (I-302)+(2.033)+(5.019), (I-302)+(2.033)+(5.020), (I-302)+(2.033)+(5.021), (I-302)+(2.033)+(5.022), (I-302)+(2.033)+(5.023), (I-302)+(2.033)+(6.001), (I-302)+(2.033)+(6.002), (I-302)+(2.033)+(6.003), (I-302)+(2.033)+(6.004), (I-302)+(2.033)+(7.001), (I-302)+(2.033)+(7.002), (I-302)+(2.033)+(7.003), (I-302)+(2.033)+(7.004), (I-302)+(2.033)+(7.005), (I-302)+(2.033)+(7.006), (I-302)+(2.033)+(9.001), (I-302)+(2.033)+(9.002), (I-302)+(2.033)+(9.003), (I-302)+(2.033)+(9.004), (I-302)+(2.033)+(9.005), (I-302)+(2.033)+(9.006), (I-302)+(2.033)+(9.007), (I-302)+(2.033)+(9.008), (I-302)+(2.033)+(9.009), (I-302)+(2.033)+(14.001), (I-302)+(2.033)+(14.002), (I-302)+(2.033)+(15.008), (I-302)+(2.033)+(15.011), (I-302)+(2.033)+(15.012), (I-302)+(2.033)+(15.016), (I-302)+(2.033)+(15.025), (I-302)+(2.033)+(15.027), (I-302)+(2.033)+(15.047), (I-302)+(2.033)+(15.063), (I-302)+(2.033)+(15.064), (I-302)+(2.033)+(16.001), (I-302)+(2.033)+(16.002), (I-302)+(2.033)+(16.003), (I-302)+(2.033)+(16.004), (I-302)+(2.033)+(16.005), (I-302)+(2.033)+(16.006), (I-302)+(2.033)+(16.007), (I-302)+(2.033)+(16.008), (I-302)+(2.033)+(17.001), (I-302)+(2.033)+(17.002), (I-302)+(2.033)+(17.003), (I-302)+(2.033)+(17.004), (I-302)+(2.033)+(17.005), (I-302)+(2.033)+(17.006), (I-302)+(2.033)+(17.007), (I-302)+(2.033)+(17.008), (I-302)+(2.033)+(17.009), (I-302)+(2.033)+(17.010), (I-302)+(2.033)+(17.011), (I-302)+(2.033)+(17.012), (I-302)+(2.033)+(18.001), (I-302)+(2.034)+(3.001), (I-302)+(2.034)+(3.002), (I-302)+(2.034)+(3.003), (I-302)+(2.034)+(3.004), (I-302)+(2.034)+(3.005), (I-302)+(2.034)+(3.006), (I-302)+(2.034)+(3.007), (I-302)+(2.034)+(3.008), (I-302)+(2.034)+(3.009), (I-302)+(2.034)+(3.010), (I-302)+(2.034)+(3.011), (I-302)+(2.034)+(3.012), (I-302)+(2.034)+(3.013), (I-302)+(2.034)+(3.014), (I-302)+(2.034)+(3.015), (I-302)+(2.034)+(3.016), (I-302)+(2.034)+(3.017), (I-302)+(2.034)+(3.018), (I-302)+(2.034)+(3.019), (I-302)+(2.034)+(3.020), (I-302)+(2.034)+(3.021), (I-302)+(2.034)+(3.022), (I-302)+(2.034)+(3.023), (I-302)+(2.034)+(3.024), (I-302)+(2.034)+(3.025), (I-302)+(2.034)+(3.026), (I-302)+(2.034)+(3.027), (I-302)+(2.034)+(3.028), (I-302)+(2.034)+(3.029), (I-302)+(2.034)+(3.030), (I-302)+(2.034)+(3.031), (I-302)+(2.034)+(5.001), (I-302)+(2.034)+(5.002), (I-302)+(2.034)+(5.003), (I-302)+(2.034)+(5.004), (I-302)+(2.034)+(5.005), (I-302)+(2.034)+(5.006), (I-302)+(2.034)+(5.007), (I-302)+(2.034)+(5.008), (I-302)+(2.034)+(5.009), (I-302)+(2.034)+(5.010), (I-302)+(2.034)+(5.011), (I-302)+(2.034)+(5.012), (I-302)+(2.034)+(5.013), (I-302)+(2.034)+(5.014), (I-302)+(2.034)+(5.015), (I-302)+(2.034)+(5.016), (I-302)+(2.034)+(5.017), (I-302)+(2.034)+(5.018), (I-302)+(2.034)+(5.019), (I-302)+(2.034)+(5.020), (I-302)+(2.034)+(5.021), (I-302)+(2.034)+(5.022), (I-302)+(2.034)+(5.023), (I-302)+(2.034)+(6.001), (I-302)+(2.034)+(6.002), (I-302)+(2.034)+(6.003), (I-302)+(2.034)+(6.004), (I-302)+(2.034)+(7.001), (I-302)+(2.034)+(7.002), (I-302)+(2.034)+(7.003), (I-302)+(2.034)+(7.004), (I-302)+(2.034)+(7.005), (I-302)+(2.034)+(7.006), (I-302)+(2.034)+(9.001), (I-302)+(2.034)+(9.002), (I-302)+(2.034)+(9.003), (I-302)+(2.034)+(9.004), (I-302)+(2.034)+(9.005), (I-302)+(2.034)+(9.006), (I-302)+(2.034)+(9.007), (I-302)+(2.034)+(9.008), (I-302)+(2.034)+(9.009), (I-302)+(2.034)+(14.001), (I-302)+(2.034)+(14.002), (I-302)+(2.034)+(15.008), (I-302)+(2.034)+(15.011), (I-302)+(2.034)+(15.012), (I-302)+(2.034)+(15.016), (I-302)+(2.034)+(15.025), (I-302)+(2.034)+(15.027), (I-302)+(2.034)+(15.047), (I-302)+(2.034)+(15.063), (I-302)+(2.034)+(15.064), (I-302)+(2.034)+(16.001), (I-302)+(2.034)+(16.002), (I-302)+(2.034)+(16.003), (I-302)+(2.034)+(16.004), (I-302)+(2.034)+(16.005), (I-302)+(2.034)+(16.006), (I-302)+(2.034)+(16.007), (I-302)+(2.034)+(16.008), (I-302)+(2.034)+(17.001), (I-302)+(2.034)+(17.002), (I-302)+(2.034)+(17.003), (I-302)+(2.034)+(17.004), (I-302)+(2.034)+(17.005), (I-302)+(2.034)+(17.006), (I-302)+(2.034)+(17.007), (I-302)+(2.034)+(17.008), (I-302)+(2.034)+(17.009), (I-302)+(2.034)+(17.010), (I-302)+(2.034)+(17.011), (I-302)+(2.034)+(17.012), (I-302)+(2.034)+(18.001), (I-302)+(2.035)+(3.001), (I-302)+(2.035)+(3.002), (I-302)+(2.035)+(3.003), (I-302)+(2.035)+(3.004), (I-302)+(2.035)+(3.005), (I-302)+(2.035)+(3.006), (I-302)+(2.035)+(3.007), (I-302)+(2.035)+(3.008), (I-302)+(2.035)+(3.009), (I-302)+(2.035)+(3.010), (I-302)+(2.035)+(3.011), (I-302)+(2.035)+(3.012), (I-302)+(2.035)+(3.013), (I-302)+(2.035)+(3.014), (I-302)+(2.035)+(3.015), (I-302)+(2.035)+(3.016), (I-302)+(2.035)+(3.017), (I-302)+(2.035)+(3.018), (I-302)+(2.035)+(3.019), (I-302)+(2.035)+(3.020), (I-302)+(2.035)+(3.021), (I-302)+(2.035)+(3.022), (I-302)+(2.035)+(3.023), (I-302)+(2.035)+(3.024), (I-302)+(2.035)+(3.025), (I-302)+(2.035)+(3.026), (I-302)+(2.035)+(3.027), (I-302)+(2.035)+(3.028), (I-302)+(2.035)+(3.029), (I-302)+(2.035)+(3.030), (I-302)+(2.035)+(3.031), (I-302)+(2.035)+(5.001), (I-302)+(2.035)+(5.002), (I-302)+(2.035)+(5.003), (I-302)+(2.035)+(5.004), (I-302)+(2.035)+(5.005), (I-302)+(2.035)+(5.006), (I-302)+(2.035)+(5.007), (I-302)+(2.035)+(5.008), (I-302)+(2.035)+(5.009), (I-302)+(2.035)+(5.010), (I-302)+(2.035)+(5.011), (I-302)+(2.035)+(5.012), (I-302)+(2.035)+(5.013), (I-302)+(2.035)+(5.014), (I-302)+(2.035)+(5.015), (I-302)+(2.035)+(5.016), (I-302)+(2.035)+(5.017), (I-302)+(2.035)+(5.018), (I-302)+(2.035)+(5.019), (I-302)+(2.035)+(5.020), (I-302)+(2.035)+(5.021), (I-302)+(2.035)+(5.022), (I-302)+(2.035)+(5.023), (I-302)+(2.035)+(6.001), (I-302)+(2.035)+(6.002), (I-302)+(2.035)+(6.003), (I-302)+(2.035)+(6.004), (I-302)+(2.035)+(7.001), (I-302)+(2.035)+(7.002), (I-302)+(2.035)+(7.003), (I-302)+(2.035)+(7.004), (I-302)+(2.035)+(7.005), (I-302)+(2.035)+(7.006), (I-302)+(2.035)+(9.001), (I-302)+(2.035)+(9.002), (I-302)+(2.035)+(9.003), (I-302)+(2.035)+(9.004), (I-302)+(2.035)+(9.005), (I-302)+(2.035)+(9.006), (I-302)+(2.035)+(9.007), (I-302)+(2.035)+(9.008), (I-302)+(2.035)+(9.009), (I-302)+(2.035)+(14.001), (I-302)+(2.035)+(14.002), (I-302)+(2.035)+(15.008), (I-302)+(2.035)+(15.011), (I-302)+(2.035)+(15.012), (I-302)+(2.035)+(15.016), (I-302)+(2.035)+(15.025), (I-302)+(2.035)+(15.027), (I-302)+(2.035)+(15.047), (I-302)+(2.035)+(15.063), (I-302)+(2.035)+(15.064), (I-302)+(2.035)+(16.001), (I-302)+(2.035)+(16.002), (I-302)+(2.035)+(16.003), (I-302)+(2.035)+(16.004), (I-302)+(2.035)+(16.005), (I-302)+(2.035)+(16.006), (I-302)+(2.035)+(16.007), (I-302)+(2.035)+(16.008), (I-302)+(2.035)+(17.001), (I-302)+(2.035)+(17.002), (I-302)+(2.035)+(17.003), (I-302)+(2.035)+(17.004), (I-302)+(2.035)+(17.005), (I-302)+(2.035)+(17.006), (I-302)+(2.035)+(17.007), (I-302)+(2.035)+(17.008), (I-302)+(2.035)+(17.009), (I-302)+(2.035)+(17.010), (I-302)+(2.035)+(17.011), (I-302)+(2.035)+(17.012), (I-302)+(2.035)+(18.001), (I-302)+(2.036)+(3.001), (I-302)+(2.036)+(3.002), (I-302)+(2.036)+(3.003), (I-302)+(2.036)+(3.004), (I-302)+(2.036)+(3.005), (I-302)+(2.036)+(3.006), (I-302)+(2.036)+(3.007), (I-302)+(2.036)+(3.008), (I-302)+(2.036)+(3.009), (I-302)+(2.036)+(3.010), (I-302)+(2.036)+(3.011), (I-302)+(2.036)+(3.012), (I-302)+(2.036)+(3.013), (I-302)+(2.036)+(3.014), (I-302)+(2.036)+(3.015), (I-302)+(2.036)+(3.016), (I-302)+(2.036)+(3.017), (I-302)+(2.036)+(3.018), (I-302)+(2.036)+(3.019), (I-302)+(2.036)+(3.020), (I-302)+(2.036)+(3.021), (I-302)+(2.036)+(3.022), (I-302)+(2.036)+(3.023), (I-302)+(2.036)+(3.024), (I-302)+(2.036)+(3.025), (I-302)+(2.036)+(3.026), (I-302)+(2.036)+(3.027), (I-302)+(2.036)+(3.028), (I-302)+(2.036)+(3.029), (I-302)+(2.036)+(3.030), (I-302)+(2.036)+(3.031), (I-302)+(2.036)+(5.001), (I-302)+(2.036)+(5.002), (I-302)+(2.036)+(5.003), (I-302)+(2.036)+(5.004), (I-302)+(2.036)+(5.005), (I-302)+(2.036)+(5.006), (I-302)+(2.036)+(5.007), (I-302)+(2.036)+(5.008), (I-302)+(2.036)+(5.009), (I-302)+(2.036)+(5.010), (I-302)+(2.036)+(5.011), (I-302)+(2.036)+(5.012), (I-302)+(2.036)+(5.013), (I-302)+(2.036)+(5.014), (I-302)+(2.036)+(5.015), (I-302)+(2.036)+(5.016), (I-302)+(2.036)+(5.017), (I-302)+(2.036)+(5.018), (I-302)+(2.036)+(5.019), (I-302)+(2.036)+(5.020), (I-302)+(2.036)+(5.021), (I-302)+(2.036)+(5.022), (I-302)+(2.036)+(5.023), (I-302)+(2.036)+(6.001), (I-302)+(2.036)+(6.002), (I-302)+(2.036)+(6.003), (I-302)+(2.036)+(6.004), (I-302)+(2.036)+(7.001), (I-302)+(2.036)+(7.002), (I-302)+(2.036)+(7.003), (I-302)+(2.036)+(7.004), (I-302)+(2.036)+(7.005), (I-302)+(2.036)+(7.006), (I-302)+(2.036)+(9.001), (I-302)+(2.036)+(9.002), (I-302)+(2.036)+(9.003), (I-302)+(2.036)+(9.004), (I-302)+(2.036)+(9.005), (I-302)+(2.036)+(9.006), (I-302)+(2.036)+(9.007), (I-302)+(2.036)+(9.008), (I-302)+(2.036)+(9.009), (I-302)+(2.036)+(14.001), (I-302)+(2.036)+(14.002), (I-302)+(2.036)+(15.008), (I-302)+(2.036)+(15.011), (I-302)+(2.036)+(15.012), (I-302)+(2.036)+(15.016), (I-302)+(2.036)+(15.025), (I-302)+(2.036)+(15.027), (I-302)+(2.036)+(15.047), (I-302)+(2.036)+(15.063), (I-302)+(2.036)+(15.064), (I-302)+(2.036)+(16.001), (I-302)+(2.036)+(16.002), (I-302)+(2.036)+(16.003), (I-302)+(2.036)+(16.004), (I-302)+(2.036)+(16.005), (I-302)+(2.036)+(16.006), (I-302)+(2.036)+(16.007), (I-302)+(2.036)+(16.008), (I-302)+(2.036)+(17.001), (I-302)+(2.036)+(17.002), (I-302)+(2.036)+(17.003), (I-302)+(2.036)+(17.004), (I-302)+(2.036)+(17.005), (I-302)+(2.036)+(17.006), (I-302)+(2.036)+(17.007), (I-302)+(2.036)+(17.008), (I-302)+(2.036)+(17.009), (I-302)+(2.036)+(17.010), (I-302)+(2.036)+(17.011), (I-302)+(2.036)+(17.012), (I-302)+(2.036)+(18.001), (I-302)+(2.037)+(3.001), (I-302)+(2.037)+(3.002), (I-302)+(2.037)+(3.003), (I-302)+(2.037)+(3.004), (I-302)+(2.037)+(3.005), (I-302)+(2.037)+(3.006), (I-302)+(2.037)+(3.007), (I-302)+(2.037)+(3.008), (I-302)+(2.037)+(3.009), (I-302)+(2.037)+(3.010), (I-302)+(2.037)+(3.011), (I-302)+(2.037)+(3.012), (I-302)+(2.037)+(3.013), (I-302)+(2.037)+(3.014), (I-302)+(2.037)+(3.015), (I-302)+(2.037)+(3.016), (I-302)+(2.037)+(3.017), (I-302)+(2.037)+(3.018), (I-302)+(2.037)+(3.019), (I-302)+(2.037)+(3.020), (I-302)+(2.037)+(3.021), (I-302)+(2.037)+(3.022), (I-302)+(2.037)+(3.023), (I-302)+(2.037)+(3.024), (I-302)+(2.037)+(3.025), (I-302)+(2.037)+(3.026), (I-302)+(2.037)+(3.027), (I-302)+(2.037)+(3.028), (I-302)+(2.037)+(3.029), (I-302)+(2.037)+(3.030), (I-302)+(2.037)+(3.031), (I-302)+(2.037)+(5.001), (I-302)+(2.037)+(5.002), (I-302)+(2.037)+(5.003), (I-302)+(2.037)+(5.004), (I-302)+(2.037)+(5.005), (I-302)+(2.037)+(5.006), (I-302)+(2.037)+(5.007), (I-302)+(2.037)+(5.008), (I-302)+(2.037)+(5.009), (I-302)+(2.037)+(5.010), (I-302)+(2.037)+(5.011), (I-302)+(2.037)+(5.012), (I-302)+(2.037)+(5.013), (I-302)+(2.037)+(5.014), (I-302)+(2.037)+(5.015), (I-302)+(2.037)+(5.016), (I-302)+(2.037)+(5.017), (I-302)+(2.037)+(5.018), (I-302)+(2.037)+(5.019), (I-302)+(2.037)+(5.020), (I-302)+(2.037)+(5.021), (I-302)+(2.037)+(5.022), (I-302)+(2.037)+(5.023), (I-302)+(2.037)+(6.001), (I-302)+(2.037)+(6.002), (I-302)+(2.037)+(6.003), (I-302)+(2.037)+(6.004), (I-302)+(2.037)+(7.001), (I-302)+(2.037)+(7.002), (I-302)+(2.037)+(7.003), (I-302)+(2.037)+(7.004), (I-302)+(2.037)+(7.005), (I-302)+(2.037)+(7.006), (I-302)+(2.037)+(9.001), (I-302)+(2.037)+(9.002), (I-302)+(2.037)+(9.003), (I-302)+(2.037)+(9.004), (I-302)+(2.037)+(9.005), (I-302)+(2.037)+(9.006), (I-302)+(2.037)+(9.007), (I-302)+(2.037)+(9.008), (I-302)+(2.037)+(9.009), (I-302)+(2.037)+(14.001), (I-302)+(2.037)+(14.002), (I-302)+(2.037)+(15.008), (I-302)+(2.037)+(15.011), (I-302)+(2.037)+(15.012), (I-302)+(2.037)+(15.016), (I-302)+(2.037)+(15.025), (I-302)+(2.037)+(15.027), (I-302)+(2.037)+(15.047), (I-302)+(2.037)+(15.063), (I-302)+(2.037)+(15.064), (I-302)+(2.037)+(16.001), (I-302)+(2.037)+(16.002), (I-302)+(2.037)+(16.003), (I-302)+(2.037)+(16.004), (I-302)+(2.037)+(16.005), (I-302)+(2.037)+(16.006), (I-302)+(2.037)+(16.007), (I-302)+(2.037)+(16.008), (I-302)+(2.037)+(17.001), (I-302)+(2.037)+(17.002), (I-302)+(2.037)+(17.003), (I-302)+(2.037)+(17.004), (I-302)+(2.037)+(17.005), (I-302)+(2.037)+(17.006), (I-302)+(2.037)+(17.007), (I-302)+(2.037)+(17.008), (I-302)+(2.037)+(17.009), (I-302)+(2.037)+(17.010), (I-302)+(2.037)+(17.011), (I-302)+(2.037)+(17.012), (I-302)+(2.037)+(18.001), (I-302)+(2.038)+(3.001), (I-302)+(2.038)+(3.002), (I-302)+(2.038)+(3.003), (I-302)+(2.038)+(3.004), (I-302)+(2.038)+(3.005), (I-302)+(2.038)+(3.006), (I-302)+(2.038)+(3.007), (I-302)+(2.038)+(3.008), (I-302)+(2.038)+(3.009), (I-302)+(2.038)+(3.010), (I-302)+(2.038)+(3.011), (I-302)+(2.038)+(3.012), (I-302)+(2.038)+(3.013), (I-302)+(2.038)+(3.014), (I-302)+(2.038)+(3.015), (I-302)+(2.038)+(3.016), (I-302)+(2.038)+(3.017), (I-302)+(2.038)+(3.018), (I-302)+(2.038)+(3.019), (I-302)+(2.038)+(3.020), (I-302)+(2.038)+(3.021), (I-302)+(2.038)+(3.022), (I-302)+(2.038)+(3.023), (I-302)+(2.038)+(3.024), (I-302)+(2.038)+(3.025), (I-302)+(2.038)+(3.026), (I-302)+(2.038)+(3.027), (I-302)+(2.038)+(3.028), (I-302)+(2.038)+(3.029), (I-302)+(2.038)+(3.030), (I-302)+(2.038)+(3.031), (I-302)+(2.038)+(5.001), (I-302)+(2.038)+(5.002), (I-302)+(2.038)+(5.003), (I-302)+(2.038)+(5.004), (I-302)+(2.038)+(5.005), (I-302)+(2.038)+(5.006), (I-302)+(2.038)+(5.007), (I-302)+(2.038)+(5.008), (I-302)+(2.038)+(5.009), (I-302)+(2.038)+(5.010), (I-302)+(2.038)+(5.011), (I-302)+(2.038)+(5.012), (I-302)+(2.038)+(5.013), (I-302)+(2.038)+(5.014), (I-302)+(2.038)+(5.015), (I-302)+(2.038)+(5.016), (I-302)+(2.038)+(5.017), (I-302)+(2.038)+(5.018), (I-302)+(2.038)+(5.019), (I-302)+(2.038)+(5.020), (I-302)+(2.038)+(5.021), (I-302)+(2.038)+(5.022), (I-302)+(2.038)+(5.023), (I-302)+(2.038)+(6.001), (I-302)+(2.038)+(6.002), (I-302)+(2.038)+(6.003), (I-302)+(2.038)+(6.004), (I-302)+(2.038)+(7.001), (I-302)+(2.038)+(7.002), (I-302)+(2.038)+(7.003), (I-302)+(2.038)+(7.004), (I-302)+(2.038)+(7.005), (I-302)+(2.038)+(7.006), (I-302)+(2.038)+(9.001), (I-302)+(2.038)+(9.002), (I-302)+(2.038)+(9.003), (I-302)+(2.038)+(9.004), (I-302)+(2.038)+(9.005), (I-302)+(2.038)+(9.006), (I-302)+(2.038)+(9.007), (I-302)+(2.038)+(9.008), (I-302)+(2.038)+(9.009), (I-302)+(2.038)+(14.001), (I-302)+(2.038)+(14.002), (I-302)+(2.038)+(15.008), (I-302)+(2.038)+(15.011), (I-302)+(2.038)+(15.012), (I-302)+(2.038)+(15.016), (I-302)+(2.038)+(15.025), (I-302)+(2.038)+(15.027), (I-302)+(2.038)+(15.047), (I-302)+(2.038)+(15.063), (I-302)+(2.038)+(15.064), (I-302)+(2.038)+(16.001), (I-302)+(2.038)+(16.002), (I-302)+(2.038)+(16.003), (I-302)+(2.038)+(16.004), (I-302)+(2.038)+(16.005), (I-302)+(2.038)+(16.006), (I-302)+(2.038)+(16.007), (I-302)+(2.038)+(16.008), (I-302)+(2.038)+(17.001), (I-302)+(2.038)+(17.002), (I-302)+(2.038)+(17.003), (I-302)+(2.038)+(17.004), (I-302)+(2.038)+(17.005), (I-302)+(2.038)+(17.006), (I-302)+(2.038)+(17.007), (I-302)+(2.038)+(17.008), (I-302)+(2.038)+(17.009), (I-302)+(2.038)+(17.010), (I-302)+(2.038)+(17.011), (I-302)+(2.038)+(17.012), (I-302)+(2.038)+(18.001), (I-302)+(2.039)+(3.001), (I-302)+(2.039)+(3.002), (I-302)+(2.039)+(3.003), (I-302)+(2.039)+(3.004), (I-302)+(2.039)+(3.005), (I-302)+(2.039)+(3.006), (I-302)+(2.039)+(3.007), (I-302)+(2.039)+(3.008), (I-302)+(2.039)+(3.009), (I-302)+(2.039)+(3.010), (I-302)+(2.039)+(3.011), (I-302)+(2.039)+(3.012), (I-302)+(2.039)+(3.013), (I-302)+(2.039)+(3.014), (I-302)+(2.039)+(3.015), (I-302)+(2.039)+(3.016), (I-302)+(2.039)+(3.017), (I-302)+(2.039)+(3.018), (I-302)+(2.039)+(3.019), (I-302)+(2.039)+(3.020), (I-302)+(2.039)+(3.021), (I-302)+(2.039)+(3.022), (I-302)+(2.039)+(3.023), (I-302)+(2.039)+(3.024), (I-302)+(2.039)+(3.025), (I-302)+(2.039)+(3.026), (I-302)+(2.039)+(3.027), (I-302)+(2.039)+(3.028), (I-302)+(2.039)+(3.029), (I-302)+(2.039)+(3.030), (I-302)+(2.039)+(3.031), (I-302)+(2.039)+(5.001), (I-302)+(2.039)+(5.002), (I-302)+(2.039)+(5.003), (I-302)+(2.039)+(5.004), (I-302)+(2.039)+(5.005), (I-302)+(2.039)+(5.006), (I-302)+(2.039)+(5.007), (I-302)+(2.039)+(5.008), (I-302)+(2.039)+(5.009), (I-302)+(2.039)+(5.010), (I-302)+(2.039)+(5.011), (I-302)+(2.039)+(5.012), (I-302)+(2.039)+(5.013), (I-302)+(2.039)+(5.014), (I-302)+(2.039)+(5.015), (I-302)+(2.039)+(5.016), (I-302)+(2.039)+(5.017), (I-302)+(2.039)+(5.018), (I-302)+(2.039)+(5.019), (I-302)+(2.039)+(5.020), (I-302)+(2.039)+(5.021), (I-302)+(2.039)+(5.022), (I-302)+(2.039)+(5.023), (I-302)+(2.039)+(6.001), (I-302)+(2.039)+(6.002), (I-302)+(2.039)+(6.003), (I-302)+(2.039)+(6.004), (I-302)+(2.039)+(7.001), (I-302)+(2.039)+(7.002), (I-302)+(2.039)+(7.003), (I-302)+(2.039)+(7.004), (I-302)+(2.039)+(7.005), (I-302)+(2.039)+(7.006), (I-302)+(2.039)+(9.001), (I-302)+(2.039)+(9.002), (I-302)+(2.039)+(9.003), (I-302)+(2.039)+(9.004), (I-302)+(2.039)+(9.005), (I-302)+(2.039)+(9.006), (I-302)+(2.039)+(9.007), (I-302)+(2.039)+(9.008), (I-302)+(2.039)+(9.009), (I-302)+(2.039)+(14.001), (I-302)+(2.039)+(14.002), (I-302)+(2.039)+(15.008), (I-302)+(2.039)+(15.011), (I-302)+(2.039)+(15.012), (I-302)+(2.039)+(15.016), (I-302)+(2.039)+(15.025), (I-302)+(2.039)+(15.027), (I-302)+(2.039)+(15.047), (I-302)+(2.039)+(15.063), (I-302)+(2.039)+(15.064), (I-302)+(2.039)+(16.001), (I-302)+(2.039)+(16.002), (I-302)+(2.039)+(16.003), (I-302)+(2.039)+(16.004), (I-302)+(2.039)+(16.005), (I-302)+(2.039)+(16.006), (I-302)+(2.039)+(16.007), (I-302)+(2.039)+(16.008), (I-302)+(2.039)+(17.001), (I-302)+(2.039)+(17.002), (I-302)+(2.039)+(17.003), (I-302)+(2.039)+(17.004), (I-302)+(2.039)+(17.005), (I-302)+(2.039)+(17.006), (I-302)+(2.039)+(17.007), (I-302)+(2.039)+(17.008), (I-302)+(2.039)+(17.009), (I-302)+(2.039)+(17.010), (I-302)+(2.039)+(17.011), (I-302)+(2.039)+(17.012), (I-302)+(2.039)+(18.001), (I-302)+(2.040)+(3.001), (I-302)+(2.040)+(3.002), (I-302)+(2.040)+(3.003), (I-302)+(2.040)+(3.004), (I-302)+(2.040)+(3.005), (I-302)+(2.040)+(3.006), (I-302)+(2.040)+(3.007), (I-302)+(2.040)+(3.008), (I-302)+(2.040)+(3.009), (I-302)+(2.040)+(3.010), (I-302)+(2.040)+(3.011), (I-302)+(2.040)+(3.012), (I-302)+(2.040)+(3.013), (I-302)+(2.040)+(3.014), (I-302)+(2.040)+(3.015), (I-302)+(2.040)+(3.016), (I-302)+(2.040)+(3.017), (I-302)+(2.040)+(3.018), (I-302)+(2.040)+(3.019), (I-302)+(2.040)+(3.020), (I-302)+(2.040)+(3.021), (I-302)+(2.040)+(3.022), (I-302)+(2.040)+(3.023), (I-302)+(2.040)+(3.024), (I-302)+(2.040)+(3.025), (I-302)+(2.040)+(3.026), (I-302)+(2.040)+(3.027), (I-302)+(2.040)+(3.028), (I-302)+(2.040)+(3.029), (I-302)+(2.040)+(3.030), (I-302)+(2.040)+(3.031), (I-302)+(2.040)+(5.001), (I-302)+(2.040)+(5.002), (I-302)+(2.040)+(5.003), (I-302)+(2.040)+(5.004), (I-302)+(2.040)+(5.005), (I-302)+(2.040)+(5.006), (I-302)+(2.040)+(5.007), (I-302)+(2.040)+(5.008), (I-302)+(2.040)+(5.009), (I-302)+(2.040)+(5.010), (I-302)+(2.040)+(5.011), (I-302)+(2.040)+(5.012), (I-302)+(2.040)+(5.013), (I-302)+(2.040)+(5.014), (I-302)+(2.040)+(5.015), (I-302)+(2.040)+(5.016), (I-302)+(2.040)+(5.017), (I-302)+(2.040)+(5.018), (I-302)+(2.040)+(5.019), (I-302)+(2.040)+(5.020), (I-302)+(2.040)+(5.021), (I-302)+(2.040)+(5.022), (I-302)+(2.040)+(5.023), (I-302)+(2.040)+(6.001), (I-302)+(2.040)+(6.002), (I-302)+(2.040)+(6.003), (I-302)+(2.040)+(6.004), (I-302)+(2.040)+(7.001), (I-302)+(2.040)+(7.002), (I-302)+(2.040)+(7.003), (I-302)+(2.040)+(7.004), (I-302)+(2.040)+(7.005), (I-302)+(2.040)+(7.006), (I-302)+(2.040)+(9.001), (I-302)+(2.040)+(9.002), (I-302)+(2.040)+(9.003), (I-302)+(2.040)+(9.004), (I-302)+(2.040)+(9.005), (I-302)+(2.040)+(9.006), (I-302)+(2.040)+(9.007), (I-302)+(2.040)+(9.008), (I-302)+(2.040)+(9.009), (I-302)+(2.040)+(14.001), (I-302)+(2.040)+(14.002), (I-302)+(2.040)+(15.008), (I-302)+(2.040)+(15.011), (I-302)+(2.040)+(15.012), (I-302)+(2.040)+(15.016), (I-302)+(2.040)+(15.025), (I-302)+(2.040)+(15.027), (I-302)+(2.040)+(15.047), (I-302)+(2.040)+(15.063), (I-302)+(2.040)+(15.064), (I-302)+(2.040)+(16.001), (I-302)+(2.040)+(16.002), (I-302)+(2.040)+(16.003), (I-302)+(2.040)+(16.004), (I-302)+(2.040)+(16.005), (I-302)+(2.040)+(16.006), (I-302)+(2.040)+(16.007), (I-302)+(2.040)+(16.008), (I-302)+(2.040)+(17.001), (I-302)+(2.040)+(17.002), (I-302)+(2.040)+(17.003), (I-302)+(2.040)+(17.004), (I-302)+(2.040)+(17.005), (I-302)+(2.040)+(17.006), (I-302)+(2.040)+(17.007), (I-302)+(2.040)+(17.008), (I-302)+(2.040)+(17.009), (I-302)+(2.040)+(17.010), (I-302)+(2.040)+(17.011), (I-302)+(2.040)+(17.012), (I-302)+(2.040)+(18.001), (I-302)+(2.041)+(3.001), (I-302)+(2.041)+(3.002), (I-302)+(2.041)+(3.003), (I-302)+(2.041)+(3.004), (I-302)+(2.041)+(3.005), (I-302)+(2.041)+(3.006), (I-302)+(2.041)+(3.007), (I-302)+(2.041)+(3.008), (I-302)+(2.041)+(3.009), (I-302)+(2.041)+(3.010), (I-302)+(2.041)+(3.011), (I-302)+(2.041)+(3.012), (I-302)+(2.041)+(3.013), (I-302)+(2.041)+(3.014), (I-302)+(2.041)+(3.015), (I-302)+(2.041)+(3.016), (I-302)+(2.041)+(3.017), (I-302)+(2.041)+(3.018), (I-302)+(2.041)+(3.019), (I-302)+(2.041)+(3.020), (I-302)+(2.041)+(3.021), (I-302)+(2.041)+(3.022), (I-302)+(2.041)+(3.023), (I-302)+(2.041)+(3.024), (I-302)+(2.041)+(3.025), (I-302)+(2.041)+(3.026), (I-302)+(2.041)+(3.027), (I-302)+(2.041)+(3.028), (I-302)+(2.041)+(3.029), (I-302)+(2.041)+(3.030), (I-302)+(2.041)+(3.031), (I-302)+(2.041)+(5.001), (I-302)+(2.041)+(5.002), (I-302)+(2.041)+(5.003), (I-302)+(2.041)+(5.004), (I-302)+(2.041)+(5.005), (I-302)+(2.041)+(5.006), (I-302)+(2.041)+(5.007), (I-302)+(2.041)+(5.008), (I-302)+(2.041)+(5.009), (I-302)+(2.041)+(5.010), (I-302)+(2.041)+(5.011), (I-302)+(2.041)+(5.012), (I-302)+(2.041)+(5.013), (I-302)+(2.041)+(5.014), (I-302)+(2.041)+(5.015), (I-302)+(2.041)+(5.016), (I-302)+(2.041)+(5.017), (I-302)+(2.041)+(5.018), (I-302)+(2.041)+(5.019), (I-302)+(2.041)+(5.020), (I-302)+(2.041)+(5.021), (I-302)+(2.041)+(5.022), (I-302)+(2.041)+(5.023), (I-302)+(2.041)+(6.001), (I-302)+(2.041)+(6.002), (I-302)+(2.041)+(6.003), (I-302)+(2.041)+(6.004), (I-302)+(2.041)+(7.001), (I-302)+(2.041)+(7.002), (I-302)+(2.041)+(7.003), (I-302)+(2.041)+(7.004), (I-302)+(2.041)+(7.005), (I-302)+(2.041)+(7.006), (I-302)+(2.041)+(9.001), (I-302)+(2.041)+(9.002), (I-302)+(2.041)+(9.003), (I-302)+(2.041)+(9.004), (I-302)+(2.041)+(9.005), (I-302)+(2.041)+(9.006), (I-302)+(2.041)+(9.007), (I-302)+(2.041)+(9.008), (I-302)+(2.041)+(9.009), (I-302)+(2.041)+(14.001), (I-302)+(2.041)+(14.002), (I-302)+(2.041)+(15.008), (I-302)+(2.041)+(15.011), (I-302)+(2.041)+(15.012), (I-302)+(2.041)+(15.016), (I-302)+(2.041)+(15.025), (I-302)+(2.041)+(15.027), (I-302)+(2.041)+(15.047), (I-302)+(2.041)+(15.063), (I-302)+(2.041)+(15.064), (I-302)+(2.041)+(16.001), (I-302)+(2.041)+(16.002), (I-302)+(2.041)+(16.003), (I-302)+(2.041)+(16.004), (I-302)+(2.041)+(16.005), (I-302)+(2.041)+(16.006), (I-302)+(2.041)+(16.007), (I-302)+(2.041)+(16.008), (I-302)+(2.041)+(17.001), (I-302)+(2.041)+(17.002), (I-302)+(2.041)+(17.003), (I-302)+(2.041)+(17.004), (I-302)+(2.041)+(17.005), (I-302)+(2.041)+(17.006), (I-302)+(2.041)+(17.007), (I-302)+(2.041)+(17.008), (I-302)+(2.041)+(17.009), (I-302)+(2.041)+(17.010), (I-302)+(2.041)+(17.011), (I-302)+(2.041)+(17.012), (I-302)+(2.041)+(18.001), (I-302)+(2.042)+(3.001), (I-302)+(2.042)+(3.002), (I-302)+(2.042)+(3.003), (I-302)+(2.042)+(3.004), (I-302)+(2.042)+(3.005), (I-302)+(2.042)+(3.006), (I-302)+(2.042)+(3.007), (I-302)+(2.042)+(3.008), (I-302)+(2.042)+(3.009), (I-302)+(2.042)+(3.010), (I-302)+(2.042)+(3.011), (I-302)+(2.042)+(3.012), (I-302)+(2.042)+(3.013), (I-302)+(2.042)+(3.014), (I-302)+(2.042)+(3.015), (I-302)+(2.042)+(3.016), (I-302)+(2.042)+(3.017), (I-302)+(2.042)+(3.018), (I-302)+(2.042)+(3.019), (I-302)+(2.042)+(3.020), (I-302)+(2.042)+(3.021), (I-302)+(2.042)+(3.022), (I-302)+(2.042)+(3.023), (I-302)+(2.042)+(3.024), (I-302)+(2.042)+(3.025), (I-302)+(2.042)+(3.026), (I-302)+(2.042)+(3.027), (I-302)+(2.042)+(3.028), (I-302)+(2.042)+(3.029), (I-302)+(2.042)+(3.030), (I-302)+(2.042)+(3.031), (I-302)+(2.042)+(5.001), (I-302)+(2.042)+(5.002), (I-302)+(2.042)+(5.003), (I-302)+(2.042)+(5.004), (I-302)+(2.042)+(5.005), (I-302)+(2.042)+(5.006), (I-302)+(2.042)+(5.007), (I-302)+(2.042)+(5.008), (I-302)+(2.042)+(5.009), (I-302)+(2.042)+(5.010), (I-302)+(2.042)+(5.011), (I-302)+(2.042)+(5.012), (I-302)+(2.042)+(5.013), (I-302)+(2.042)+(5.014), (I-302)+(2.042)+(5.015), (I-302)+(2.042)+(5.016), (I-302)+(2.042)+(5.017), (I-302)+(2.042)+(5.018), (I-302)+(2.042)+(5.019), (I-302)+(2.042)+(5.020), (I-302)+(2.042)+(5.021), (I-302)+(2.042)+(5.022), (I-302)+(2.042)+(5.023), (I-302)+(2.042)+(6.001), (I-302)+(2.042)+(6.002), (I-302)+(2.042)+(6.003), (I-302)+(2.042)+(6.004), (I-302)+(2.042)+(7.001), (I-302)+(2.042)+(7.002), (I-302)+(2.042)+(7.003), (I-302)+(2.042)+(7.004), (I-302)+(2.042)+(7.005), (I-302)+(2.042)+(7.006), (I-302)+(2.042)+(9.001), (I-302)+(2.042)+(9.002), (I-302)+(2.042)+(9.003), (I-302)+(2.042)+(9.004), (I-302)+(2.042)+(9.005), (I-302)+(2.042)+(9.006),
(I-302)+(2.042)+(9.007), (I-302)+(2.042)+(9.008),
(I-302)+(2.042)+(9.009), (I-302)+(2.042)+(14.001),
(I-302)+(2.042)+(14.002), (I-302)+(2.042)+(15.008),
(I-302)+(2.042)+(15.011), (I-302)+(2.042)+(15.012),
(I-302)+(2.042)+(15.016), (I-302)+(2.042)+(15.025),
(I-302)+(2.042)+(15.027), (I-302)+(2.042)+(15.047),
(I-302)+(2.042)+(15.063), (I-302)+(2.042)+(15.064),
(I-302)+(2.042)+(16.001), (I-302)+(2.042)+(16.002),
(I-302)+(2.042)+(16.003), (I-302)+(2.042)+(16.004),
(I-302)+(2.042)+(16.005), (I-302)+(2.042)+(16.006),
(I-302)+(2.042)+(16.007), (I-302)+(2.042)+(16.008),
(I-302)+(2.042)+(17.001), (I-302)+(2.042)+(17.002),
(I-302)+(2.042)+(17.003), (I-302)+(2.042)+(17.004),
(I-302)+(2.042)+(17.005), (I-302)+(2.042)+(17.006),
(I-302)+(2.042)+(17.007), (I-302)+(2.042)+(17.008),
(I-302)+(2.042)+(17.009), (I-302)+(2.042)+(17.010),
(I-302)+(2.042)+(17.011), (I-302)+(2.042)+(17.012),
(I-302)+(2.042)+(18.001),
(I-302)+(2.043)+(3.001), (I-302)+(2.043)+(3.002),
(I-302)+(2.043)+(3.003), (I-302)+(2.043)+(3.004),
(I-302)+(2.043)+(3.005), (I-302)+(2.043)+(3.006),
(I-302)+(2.043)+(3.007), (I-302)+(2.043)+(3.008),
(I-302)+(2.043)+(3.009), (I-302)+(2.043)+(3.010),
(I-302)+(2.043)+(3.011), (I-302)+(2.043)+(3.012),
(I-302)+(2.043)+(3.013), (I-302)+(2.043)+(3.014),
(I-302)+(2.043)+(3.015), (I-302)+(2.043)+(3.016),
(I-302)+(2.043)+(3.017), (I-302)+(2.043)+(3.018),
(I-302)+(2.043)+(3.019), (I-302)+(2.043)+(3.020),
(I-302)+(2.043)+(3.021), (I-302)+(2.043)+(3.022),
(I-302)+(2.043)+(3.023), (I-302)+(2.043)+(3.024),
(I-302)+(2.043)+(3.025), (I-302)+(2.043)+(3.026),
(I-302)+(2.043)+(3.027), (I-302)+(2.043)+(3.028),
(I-302)+(2.043)+(3.029), (I-302)+(2.043)+(3.030),
(I-302)+(2.043)+(3.031), (I-302)+(2.043)+(5.001),
(I-302)+(2.043)+(5.002), (I-302)+(2.043)+(5.003),
(I-302)+(2.043)+(5.004), (I-302)+(2.043)+(5.005),
(I-302)+(2.043)+(5.006), (I-302)+(2.043)+(5.007),
(I-302)+(2.043)+(5.008), (I-302)+(2.043)+(5.009),
(I-302)+(2.043)+(5.010), (I-302)+(2.043)+(5.011),
(I-302)+(2.043)+(5.012), (I-302)+(2.043)+(5.013),
(I-302)+(2.043)+(5.014), (I-302)+(2.043)+(5.015),
(I-302)+(2.043)+(5.016), (I-302)+(2.043)+(5.017),
(I-302)+(2.043)+(5.018), (I-302)+(2.043)+(5.019),
(I-302)+(2.043)+(5.020), (I-302)+(2.043)+(5.021),
(I-302)+(2.043)+(5.022), (I-302)+(2.043)+(5.023),
(I-302)+(2.043)+(6.001), (I-302)+(2.043)+(6.002),
(I-302)+(2.043)+(6.003), (I-302)+(2.043)+(6.004),
(I-302)+(2.043)+(7.001), (I-302)+(2.043)+(7.002),
(I-302)+(2.043)+(7.003), (I-302)+(2.043)+(7.004),
(I-302)+(2.043)+(7.005), (I-302)+(2.043)+(7.006),
(I-302)+(2.043)+(9.001), (I-302)+(2.043)+(9.002),
(I-302)+(2.043)+(9.003), (I-302)+(2.043)+(9.004),
(I-302)+(2.043)+(9.005), (I-302)+(2.043)+(9.006),
(I-302)+(2.043)+(9.007), (I-302)+(2.043)+(9.008),
(I-302)+(2.043)+(9.009), (I-302)+(2.043)+(14.001),
(I-302)+(2.043)+(14.002), (I-302)+(2.043)+(15.008),
(I-302)+(2.043)+(15.011), (I-302)+(2.043)+(15.012),
(I-302)+(2.043)+(15.016), (I-302)+(2.043)+(15.025),
(I-302)+(2.043)+(15.027), (I-302)+(2.043)+(15.047),
(I-302)+(2.043)+(15.063), (I-302)+(2.043)+(15.064),
(I-302)+(2.043)+(16.001), (I-302)+(2.043)+(16.002),
(I-302)+(2.043)+(16.003), (I-302)+(2.043)+(16.004),
(I-302)+(2.043)+(16.005), (I-302)+(2.043)+(16.006),
(I-302)+(2.043)+(16.007), (I-302)+(2.043)+(16.008),
(I-302)+(2.043)+(17.001), (I-302)+(2.043)+(17.002),
(I-302)+(2.043)+(17.003), (I-302)+(2.043)+(17.004),
(I-302)+(2.043)+(17.005), (I-302)+(2.043)+(17.006),
(I-302)+(2.043)+(17.007), (I-302)+(2.043)+(17.008),
(I-302)+(2.043)+(17.009), (I-302)+(2.043)+(17.010),
(I-302)+(2.043)+(17.011), (I-302)+(2.043)+(17.012),
(I-302)+(2.043)+(18.001),
(I-302)+(2.044)+(3.001), (I-302)+(2.044)+(3.002),
(I-302)+(2.044)+(3.003), (I-302)+(2.044)+(3.004),
(I-302)+(2.044)+(3.005), (I-302)+(2.044)+(3.006),
(I-302)+(2.044)+(3.007), (I-302)+(2.044)+(3.008),
(I-302)+(2.044)+(3.009), (I-302)+(2.044)+(3.010),
(I-302)+(2.044)+(3.011), (I-302)+(2.044)+(3.012),
(I-302)+(2.044)+(3.013), (I-302)+(2.044)+(3.014),
(I-302)+(2.044)+(3.015), (I-302)+(2.044)+(3.016),
(I-302)+(2.044)+(3.017), (I-302)+(2.044)+(3.018),
(I-302)+(2.044)+(3.019), (I-302)+(2.044)+(3.020),
(I-302)+(2.044)+(3.021), (I-302)+(2.044)+(3.022),
(I-302)+(2.044)+(3.023), (I-302)+(2.044)+(3.024),
(I-302)+(2.044)+(3.025), (I-302)+(2.044)+(3.026),
(I-302)+(2.044)+(3.027), (I-302)+(2.044)+(3.028),
(I-302)+(2.044)+(3.029), (I-302)+(2.044)+(3.030),
(I-302)+(2.044)+(3.031), (I-302)+(2.044)+(5.001),
(I-302)+(2.044)+(5.002), (I-302)+(2.044)+(5.003),
(I-302)+(2.044)+(5.004), (I-302)+(2.044)+(5.005),
(I-302)+(2.044)+(5.006), (I-302)+(2.044)+(5.007),
(I-302)+(2.044)+(5.008), (I-302)+(2.044)+(5.009),
(I-302)+(2.044)+(5.010), (I-302)+(2.044)+(5.011),
(I-302)+(2.044)+(5.012), (I-302)+(2.044)+(5.013),
(I-302)+(2.044)+(5.014), (I-302)+(2.044)+(5.015),
(I-302)+(2.044)+(5.016), (I-302)+(2.044)+(5.017),
(I-302)+(2.044)+(5.018), (I-302)+(2.044)+(5.019),
(I-302)+(2.044)+(5.020), (I-302)+(2.044)+(5.021),
(I-302)+(2.044)+(5.022), (I-302)+(2.044)+(5.023),
(I-302)+(2.044)+(6.001), (I-302)+(2.044)+(6.002),
(I-302)+(2.044)+(6.003), (I-302)+(2.044)+(6.004),
(I-302)+(2.044)+(7.001), (I-302)+(2.044)+(7.002),
(I-302)+(2.044)+(7.003), (I-302)+(2.044)+(7.004),
(I-302)+(2.044)+(7.005), (I-302)+(2.044)+(7.006),
(I-302)+(2.044)+(9.001), (I-302)+(2.044)+(9.002),
(I-302)+(2.044)+(9.003), (I-302)+(2.044)+(9.004),
(I-302)+(2.044)+(9.005), (I-302)+(2.044)+(9.006),
(I-302)+(2.044)+(9.007), (I-302)+(2.044)+(9.008),
(I-302)+(2.044)+(9.009), (I-302)+(2.044)+(14.001),
(I-302)+(2.044)+(14.002), (I-302)+(2.044)+(15.008),
(I-302)+(2.044)+(15.011), (I-302)+(2.044)+(15.012),
(I-302)+(2.044)+(15.016), (I-302)+(2.044)+(15.025),
(I-302)+(2.044)+(15.027), (I-302)+(2.044)+(15.047),
(I-302)+(2.044)+(15.063), (I-302)+(2.044)+(15.064),
(I-302)+(2.044)+(16.001), (I-302)+(2.044)+(16.002),
(I-302)+(2.044)+(16.003), (I-302)+(2.044)+(16.004),
(I-302)+(2.044)+(16.005), (I-302)+(2.044)+(16.006),
(I-302)+(2.044)+(16.007), (I-302)+(2.044)+(16.008),
(I-302)+(2.044)+(17.001), (I-302)+(2.044)+(17.002),
(I-302)+(2.044)+(17.003), (I-302)+(2.044)+(17.004),
(I-302)+(2.044)+(17.005), (I-302)+(2.044)+(17.006),
(I-302)+(2.044)+(17.007), (I-302)+(2.044)+(17.008),
(I-302)+(2.044)+(17.009), (I-302)+(2.044)+(17.010),
(I-302)+(2.044)+(17.011), (I-302)+(2.044)+(17.012),
(I-302)+(2.044)+(18.001),
(I-302)+(2.045)+(3.001), (I-302)+(2.045)+(3.002),
(I-302)+(2.045)+(3.003), (I-302)+(2.045)+(3.004),
(I-302)+(2.045)+(3.005), (I-302)+(2.045)+(3.006),
(I-302)+(2.045)+(3.007), (I-302)+(2.045)+(3.008),
(I-302)+(2.045)+(3.009), (I-302)+(2.045)+(3.010),
(I-302)+(2.045)+(3.011), (I-302)+(2.045)+(3.012),
(I-302)+(2.045)+(3.013), (I-302)+(2.045)+(3.014),
(I-302)+(2.045)+(3.015), (I-302)+(2.045)+(3.016),
(I-302)+(2.045)+(3.017), (I-302)+(2.045)+(3.018), (I-302)+(2.045)+(3.019), (I-302)+(2.045)+(3.020), (I-302)+(2.045)+(3.021), (I-302)+(2.045)+(3.022), (I-302)+(2.045)+(3.023), (I-302)+(2.045)+(3.024), (I-302)+(2.045)+(3.025), (I-302)+(2.045)+(3.026), (I-302)+(2.045)+(3.027), (I-302)+(2.045)+(3.028), (I-302)+(2.045)+(3.029), (I-302)+(2.045)+(3.030), (I-302)+(2.045)+(3.031), (I-302)+(2.045)+(5.001), (I-302)+(2.045)+(5.002), (I-302)+(2.045)+(5.003), (I-302)+(2.045)+(5.004), (I-302)+(2.045)+(5.005), (I-302)+(2.045)+(5.006), (I-302)+(2.045)+(5.007), (I-302)+(2.045)+(5.008), (I-302)+(2.045)+(5.009), (I-302)+(2.045)+(5.010), (I-302)+(2.045)+(5.011), (I-302)+(2.045)+(5.012), (I-302)+(2.045)+(5.013), (I-302)+(2.045)+(5.014), (I-302)+(2.045)+(5.015), (I-302)+(2.045)+(5.016), (I-302)+(2.045)+(5.017), (I-302)+(2.045)+(5.018), (I-302)+(2.045)+(5.019), (I-302)+(2.045)+(5.020), (I-302)+(2.045)+(5.021), (I-302)+(2.045)+(5.022), (I-302)+(2.045)+(5.023), (I-302)+(2.045)+(6.001), (I-302)+(2.045)+(6.002), (I-302)+(2.045)+(6.003), (I-302)+(2.045)+(6.004), (I-302)+(2.045)+(7.001), (I-302)+(2.045)+(7.002), (I-302)+(2.045)+(7.003), (I-302)+(2.045)+(7.004), (I-302)+(2.045)+(7.005), (I-302)+(2.045)+(7.006), (I-302)+(2.045)+(9.001), (I-302)+(2.045)+(9.002), (I-302)+(2.045)+(9.003), (I-302)+(2.045)+(9.004), (I-302)+(2.045)+(9.005), (I-302)+(2.045)+(9.006), (I-302)+(2.045)+(9.007), (I-302)+(2.045)+(9.008), (I-302)+(2.045)+(9.009), (I-302)+(2.045)+(14.001), (I-302)+(2.045)+(14.002), (I-302)+(2.045)+(15.008), (I-302)+(2.045)+(15.011), (I-302)+(2.045)+(15.012), (I-302)+(2.045)+(15.016), (I-302)+(2.045)+(15.025), (I-302)+(2.045)+(15.027), (I-302)+(2.045)+(15.047), (I-302)+(2.045)+(15.063), (I-302)+(2.045)+(15.064), (I-302)+(2.045)+(16.001), (I-302)+(2.045)+(16.002), (I-302)+(2.045)+(16.003), (I-302)+(2.045)+(16.004), (I-302)+(2.045)+(16.005), (I-302)+(2.045)+(16.006), (I-302)+(2.045)+(16.007), (I-302)+(2.045)+(16.008), (I-302)+(2.045)+(17.001), (I-302)+(2.045)+(17.002), (I-302)+(2.045)+(17.003), (I-302)+(2.045)+(17.004), (I-302)+(2.045)+(17.005), (I-302)+(2.045)+(17.006), (I-302)+(2.045)+(17.007), (I-302)+(2.045)+(17.008), (I-302)+(2.045)+(17.009), (I-302)+(2.045)+(17.010), (I-302)+(2.045)+(17.011), (I-302)+(2.045)+(17.012), (I-302)+(2.045)+(18.001), (I-302)+(2.046)+(3.001), (I-302)+(2.046)+(3.002), (I-302)+(2.046)+(3.003), (I-302)+(2.046)+(3.004), (I-302)+(2.046)+(3.005), (I-302)+(2.046)+(3.006), (I-302)+(2.046)+(3.007), (I-302)+(2.046)+(3.008), (I-302)+(2.046)+(3.009), (I-302)+(2.046)+(3.010), (I-302)+(2.046)+(3.011), (I-302)+(2.046)+(3.012), (I-302)+(2.046)+(3.013), (I-302)+(2.046)+(3.014), (I-302)+(2.046)+(3.015), (I-302)+(2.046)+(3.016), (I-302)+(2.046)+(3.017), (I-302)+(2.046)+(3.018), (I-302)+(2.046)+(3.019), (I-302)+(2.046)+(3.020), (I-302)+(2.046)+(3.021), (I-302)+(2.046)+(3.022), (I-302)+(2.046)+(3.023), (I-302)+(2.046)+(3.024), (I-302)+(2.046)+(3.025), (I-302)+(2.046)+(3.026), (I-302)+(2.046)+(3.027), (I-302)+(2.046)+(3.028), (I-302)+(2.046)+(3.029), (I-302)+(2.046)+(3.030), (I-302)+(2.046)+(3.031), (I-302)+(2.046)+(5.001), (I-302)+(2.046)+(5.002), (I-302)+(2.046)+(5.003), (I-302)+(2.046)+(5.004), (I-302)+(2.046)+(5.005), (I-302)+(2.046)+(5.006), (I-302)+(2.046)+(5.007), (I-302)+(2.046)+(5.008), (I-302)+(2.046)+(5.009), (I-302)+(2.046)+(5.010), (I-302)+(2.046)+(5.011), (I-302)+(2.046)+(5.012), (I-302)+(2.046)+(5.013), (I-302)+(2.046)+(5.014), (I-302)+(2.046)+(5.015), (I-302)+(2.046)+(5.016), (I-302)+(2.046)+(5.017), (I-302)+(2.046)+(5.018), (I-302)+(2.046)+(5.019), (I-302)+(2.046)+(5.020), (I-302)+(2.046)+(5.021), (I-302)+(2.046)+(5.022), (I-302)+(2.046)+(5.023), (I-302)+(2.046)+(6.001), (I-302)+(2.046)+(6.002), (I-302)+(2.046)+(6.003), (I-302)+(2.046)+(6.004), (I-302)+(2.046)+(7.001), (I-302)+(2.046)+(7.002), (I-302)+(2.046)+(7.003), (I-302)+(2.046)+(7.004), (I-302)+(2.046)+(7.005), (I-302)+(2.046)+(7.006), (I-302)+(2.046)+(9.001), (I-302)+(2.046)+(9.002), (I-302)+(2.046)+(9.003), (I-302)+(2.046)+(9.004), (I-302)+(2.046)+(9.005), (I-302)+(2.046)+(9.006), (I-302)+(2.046)+(9.007), (I-302)+(2.046)+(9.008), (I-302)+(2.046)+(9.009), (I-302)+(2.046)+(14.001), (I-302)+(2.046)+(14.002), (I-302)+(2.046)+(15.008), (I-302)+(2.046)+(15.011), (I-302)+(2.046)+(15.012), (I-302)+(2.046)+(15.016), (I-302)+(2.046)+(15.025), (I-302)+(2.046)+(15.027), (I-302)+(2.046)+(15.047), (I-302)+(2.046)+(15.063), (I-302)+(2.046)+(15.064), (I-302)+(2.046)+(16.001), (I-302)+(2.046)+(16.002), (I-302)+(2.046)+(16.003), (I-302)+(2.046)+(16.004), (I-302)+(2.046)+(16.005), (I-302)+(2.046)+(16.006), (I-302)+(2.046)+(16.007), (I-302)+(2.046)+(16.008), (I-302)+(2.046)+(17.001), (I-302)+(2.046)+(17.002), (I-302)+(2.046)+(17.003), (I-302)+(2.046)+(17.004), (I-302)+(2.046)+(17.005), (I-302)+(2.046)+(17.006), (I-302)+(2.046)+(17.007), (I-302)+(2.046)+(17.008), (I-302)+(2.046)+(17.009), (I-302)+(2.046)+(17.010), (I-302)+(2.046)+(17.011), (I-302)+(2.046)+(17.012), (I-302)+(2.046)+(18.001), (I-302)+(2.047)+(3.001), (I-302)+(2.047)+(3.002), (I-302)+(2.047)+(3.003), (I-302)+(2.047)+(3.004), (I-302)+(2.047)+(3.005), (I-302)+(2.047)+(3.006), (I-302)+(2.047)+(3.007), (I-302)+(2.047)+(3.008), (I-302)+(2.047)+(3.009), (I-302)+(2.047)+(3.010), (I-302)+(2.047)+(3.011), (I-302)+(2.047)+(3.012), (I-302)+(2.047)+(3.013), (I-302)+(2.047)+(3.014), (I-302)+(2.047)+(3.015), (I-302)+(2.047)+(3.016), (I-302)+(2.047)+(3.017), (I-302)+(2.047)+(3.018), (I-302)+(2.047)+(3.019), (I-302)+(2.047)+(3.020), (I-302)+(2.047)+(3.021), (I-302)+(2.047)+(3.022), (I-302)+(2.047)+(3.023), (I-302)+(2.047)+(3.024), (I-302)+(2.047)+(3.025), (I-302)+(2.047)+(3.026), (I-302)+(2.047)+(3.027), (I-302)+(2.047)+(3.028), (I-302)+(2.047)+(3.029), (I-302)+(2.047)+(3.030), (I-302)+(2.047)+(3.031), (I-302)+(2.047)+(5.001), (I-302)+(2.047)+(5.002), (I-302)+(2.047)+(5.003), (I-302)+(2.047)+(5.004), (I-302)+(2.047)+(5.005), (I-302)+(2.047)+(5.006), (I-302)+(2.047)+(5.007), (I-302)+(2.047)+(5.008), (I-302)+(2.047)+(5.009), (I-302)+(2.047)+(5.010), (I-302)+(2.047)+(5.011), (I-302)+(2.047)+(5.012), (I-302)+(2.047)+(5.013), (I-302)+(2.047)+(5.014), (I-302)+(2.047)+(5.015), (I-302)+(2.047)+(5.016), (I-302)+(2.047)+(5.017), (I-302)+(2.047)+(5.018), (I-302)+(2.047)+(5.019), (I-302)+(2.047)+(5.020), (I-302)+(2.047)+(5.021), (I-302)+(2.047)+(5.022), (I-302)+(2.047)+(5.023), (I-302)+(2.047)+(6.001), (I-302)+(2.047)+(6.002), (I-302)+(2.047)+(6.003), (I-302)+(2.047)+(6.004), (I-302)+(2.047)+(7.001), (I-302)+(2.047)+(7.002), (I-302)+(2.047)+(7.003), (I-302)+(2.047)+(7.004), (I-302)+(2.047)+(7.005), (I-302)+(2.047)+(7.006), (I-302)+(2.047)+(9.001), (I-302)+(2.047)+(9.002), (I-302)+(2.047)+(9.003), (I-302)+(2.047)+(9.004), (I-302)+(2.047)+(9.005), (I-302)+(2.047)+(9.006), (I-302)+(2.047)+(9.007), (I-302)+(2.047)+(9.008), (I-302)+(2.047)+(9.009), (I-302)+(2.047)+(14.001), (I-302)+(2.047)+(14.002), (I-302)+(2.047)+(15.008), (I-302)+(2.047)+(15.011), (I-302)+(2.047)+(15.012), (I-302)+(2.047)+(15.016), (I-302)+(2.047)+(15.025), (I-302)+(2.047)+(15.027), (I-302)+(2.047)+(15.047), (I-302)+(2.047)+(15.063), (I-302)+(2.047)+(15.064), (I-302)+(2.047)+(16.001), (I-302)+(2.047)+(16.002), (I-302)+(2.047)+(16.003), (I-302)+(2.047)+(16.004), (I-302)+(2.047)+(16.005), (I-302)+(2.047)+(16.006), (I-302)+(2.047)+(16.007), (I-302)+(2.047)+(16.008), (I-302)+(2.047)+(17.001), (I-302)+(2.047)+(17.002), (I-302)+(2.047)+(17.003), (I-302)+(2.047)+(17.004), (I-302)+(2.047)+(17.005), (I-302)+(2.047)+(17.006), (I-302)+(2.047)+(17.007), (I-302)+(2.047)+(17.008), (I-302)+(2.047)+(17.009), (I-302)+(2.047)+(17.010), (I-302)+(2.047)+(17.011), (I-302)+(2.047)+(17.012), (I-302)+(2.047)+(18.001), (I-302)+(2.048)+(3.001), (I-302)+(2.048)+(3.002), (I-302)+(2.048)+(3.003), (I-302)+(2.048)+(3.004), (I-302)+(2.048)+(3.005), (I-302)+(2.048)+(3.006), (I-302)+(2.048)+(3.007), (I-302)+(2.048)+(3.008), (I-302)+(2.048)+(3.009), (I-302)+(2.048)+(3.010), (I-302)+(2.048)+(3.011), (I-302)+(2.048)+(3.012), (I-302)+(2.048)+(3.013), (I-302)+(2.048)+(3.014), (I-302)+(2.048)+(3.015), (I-302)+(2.048)+(3.016), (I-302)+(2.048)+(3.017), (I-302)+(2.048)+(3.018), (I-302)+(2.048)+(3.019), (I-302)+(2.048)+(3.020), (I-302)+(2.048)+(3.021), (I-302)+(2.048)+(3.022), (I-302)+(2.048)+(3.023), (I-302)+(2.048)+(3.024), (I-302)+(2.048)+(3.025), (I-302)+(2.048)+(3.026), (I-302)+(2.048)+(3.027), (I-302)+(2.048)+(3.028), (I-302)+(2.048)+(3.029), (I-302)+(2.048)+(3.030), (I-302)+(2.048)+(3.031), (I-302)+(2.048)+(5.001), (I-302)+(2.048)+(5.002), (I-302)+(2.048)+(5.003), (I-302)+(2.048)+(5.004), (I-302)+(2.048)+(5.005), (I-302)+(2.048)+(5.006), (I-302)+(2.048)+(5.007), (I-302)+(2.048)+(5.008), (I-302)+(2.048)+(5.009), (I-302)+(2.048)+(5.010), (I-302)+(2.048)+(5.011), (I-302)+(2.048)+(5.012), (I-302)+(2.048)+(5.013), (I-302)+(2.048)+(5.014), (I-302)+(2.048)+(5.015), (I-302)+(2.048)+(5.016), (I-302)+(2.048)+(5.017), (I-302)+(2.048)+(5.018), (I-302)+(2.048)+(5.019), (I-302)+(2.048)+(5.020), (I-302)+(2.048)+(5.021), (I-302)+(2.048)+(5.022), (I-302)+(2.048)+(5.023), (I-302)+(2.048)+(6.001), (I-302)+(2.048)+(6.002), (I-302)+(2.048)+(6.003), (I-302)+(2.048)+(6.004), (I-302)+(2.048)+(7.001), (I-302)+(2.048)+(7.002), (I-302)+(2.048)+(7.003), (I-302)+(2.048)+(7.004), (I-302)+(2.048)+(7.005), (I-302)+(2.048)+(7.006), (I-302)+(2.048)+(9.001), (I-302)+(2.048)+(9.002), (I-302)+(2.048)+(9.003), (I-302)+(2.048)+(9.004), (I-302)+(2.048)+(9.005), (I-302)+(2.048)+(9.006), (I-302)+(2.048)+(9.007), (I-302)+(2.048)+(9.008), (I-302)+(2.048)+(9.009), (I-302)+(2.048)+(14.001), (I-302)+(2.048)+(14.002), (I-302)+(2.048)+(15.008), (I-302)+(2.048)+(15.011), (I-302)+(2.048)+(15.012), (I-302)+(2.048)+(15.016), (I-302)+(2.048)+(15.025), (I-302)+(2.048)+(15.027), (I-302)+(2.048)+(15.047), (I-302)+(2.048)+(15.063), (I-302)+(2.048)+(15.064), (I-302)+(2.048)+(16.001), (I-302)+(2.048)+(16.002), (I-302)+(2.048)+(16.003), (I-302)+(2.048)+(16.004), (I-302)+(2.048)+(16.005), (I-302)+(2.048)+(16.006), (I-302)+(2.048)+(16.007), (I-302)+(2.048)+(16.008), (I-302)+(2.048)+(17.001), (I-302)+(2.048)+(17.002), (I-302)+(2.048)+(17.003), (I-302)+(2.048)+(17.004), (I-302)+(2.048)+(17.005), (I-302)+(2.048)+(17.006), (I-302)+(2.048)+(17.007), (I-302)+(2.048)+(17.008), (I-302)+(2.048)+(17.009), (I-302)+(2.048)+(17.010), (I-302)+(2.048)+(17.011), (I-302)+(2.048)+(17.012), (I-302)+(2.048)+(18.001), (I-302)+(2.049)+(3.001), (I-302)+(2.049)+(3.002), (I-302)+(2.049)+(3.003), (I-302)+(2.049)+(3.004), (I-302)+(2.049)+(3.005), (I-302)+(2.049)+(3.006), (I-302)+(2.049)+(3.007), (I-302)+(2.049)+(3.008), (I-302)+(2.049)+(3.009), (I-302)+(2.049)+(3.010), (I-302)+(2.049)+(3.011), (I-302)+(2.049)+(3.012), (I-302)+(2.049)+(3.013), (I-302)+(2.049)+(3.014), (I-302)+(2.049)+(3.015), (I-302)+(2.049)+(3.016), (I-302)+(2.049)+(3.017), (I-302)+(2.049)+(3.018), (I-302)+(2.049)+(3.019), (I-302)+(2.049)+(3.020), (I-302)+(2.049)+(3.021), (I-302)+(2.049)+(3.022), (I-302)+(2.049)+(3.023), (I-302)+(2.049)+(3.024), (I-302)+(2.049)+(3.025), (I-302)+(2.049)+(3.026), (I-302)+(2.049)+(3.027), (I-302)+(2.049)+(3.028), (I-302)+(2.049)+(3.029), (I-302)+(2.049)+(3.030), (I-302)+(2.049)+(3.031), (I-302)+(2.049)+(5.001), (I-302)+(2.049)+(5.002), (I-302)+(2.049)+(5.003), (I-302)+(2.049)+(5.004), (I-302)+(2.049)+(5.005), (I-302)+(2.049)+(5.006), (I-302)+(2.049)+(5.007), (I-302)+(2.049)+(5.008), (I-302)+(2.049)+(5.009), (I-302)+(2.049)+(5.010), (I-302)+(2.049)+(5.011), (I-302)+(2.049)+(5.012), (I-302)+(2.049)+(5.013), (I-302)+(2.049)+(5.014), (I-302)+(2.049)+(5.015), (I-302)+(2.049)+(5.016), (I-302)+(2.049)+(5.017), (I-302)+(2.049)+(5.018), (I-302)+(2.049)+(5.019), (I-302)+(2.049)+(5.020), (I-302)+(2.049)+(5.021), (I-302)+(2.049)+(5.022), (I-302)+(2.049)+(5.023), (I-302)+(2.049)+(6.001), (I-302)+(2.049)+(6.002), (I-302)+(2.049)+(6.003), (I-302)+(2.049)+(6.004), (I-302)+(2.049)+(7.001), (I-302)+(2.049)+(7.002), (I-302)+(2.049)+(7.003), (I-302)+(2.049)+(7.004), (I-302)+(2.049)+(7.005), (I-302)+(2.049)+(7.006), (I-302)+(2.049)+(9.001), (I-302)+(2.049)+(9.002), (I-302)+(2.049)+(9.003), (I-302)+(2.049)+(9.004), (I-302)+(2.049)+(9.005), (I-302)+(2.049)+(9.006), (I-302)+(2.049)+(9.007), (I-302)+(2.049)+(9.008), (I-302)+(2.049)+(9.009), (I-302)+(2.049)+(14.001), (I-302)+(2.049)+(14.002), (I-302)+(2.049)+(15.008), (I-302)+(2.049)+(15.011), (I-302)+(2.049)+(15.012), (I-302)+(2.049)+(15.016), (I-302)+(2.049)+(15.025), (I-302)+(2.049)+(15.027), (I-302)+(2.049)+(15.047), (I-302)+(2.049)+(15.063), (I-302)+(2.049)+(15.064), (I-302)+(2.049)+(16.001), (I-302)+(2.049)+(16.002), (I-302)+(2.049)+(16.003), (I-302)+(2.049)+(16.004), (I-302)+(2.049)+(16.005), (I-302)+(2.049)+(16.006), (I-302)+(2.049)+(16.007), (I-302)+(2.049)+(16.008), (I-302)+(2.049)+(17.001), (I-302)+(2.049)+(17.002), (I-302)+(2.049)+(17.003), (I-302)+(2.049)+(17.004), (I-302)+(2.049)+(17.005), (I-302)+(2.049)+(17.006), (I-302)+(2.049)+(17.007), (I-302)+(2.049)+(17.008), (I-302)+(2.049)+(17.009), (I-302)+(2.049)+(17.010), (I-302)+(2.049)+(17.011), (I-302)+(2.049)+(17.012), (I-302)+(2.049)+(18.001), (I-302)+(2.050)+(3.001), (I-302)+(2.050)+(3.002), (I-302)+(2.050)+(3.003), (I-302)+(2.050)+(3.004), (I-302)+(2.050)+(3.005), (I-302)+(2.050)+(3.006), (I-302)+(2.050)+(3.007), (I-302)+(2.050)+(3.008), (I-302)+(2.050)+(3.009), (I-302)+(2.050)+(3.010), (I-302)+(2.050)+(3.011), (I-302)+(2.050)+(3.012), (I-302)+(2.050)+(3.013), (I-302)+(2.050)+(3.014), (I-302)+(2.050)+(3.015), (I-302)+(2.050)+(3.016), (I-302)+(2.050)+(3.017), (I-302)+(2.050)+(3.018), (I-302)+(2.050)+(3.019), (I-302)+(2.050)+(3.020), (I-302)+(2.050)+(3.021), (I-302)+(2.050)+(3.022), (I-302)+(2.050)+(3.023), (I-302)+(2.050)+(3.024), (I-302)+(2.050)+(3.025), (I-302)+(2.050)+(3.026), (I-302)+(2.050)+(3.027), (I-302)+(2.050)+(3.028), (I-302)+(2.050)+(3.029), (I-302)+(2.050)+(3.030), (I-302)+(2.050)+(3.031), (I-302)+(2.050)+(5.001), (I-302)+(2.050)+(5.002), (I-302)+(2.050)+(5.003), (I-302)+(2.050)+(5.004), (I-302)+(2.050)+(5.005), (I-302)+(2.050)+(5.006), (I-302)+(2.050)+(5.007), (I-302)+(2.050)+(5.008), (I-302)+(2.050)+(5.009), (I-302)+(2.050)+(5.010), (I-302)+(2.050)+(5.011), (I-302)+(2.050)+(5.012), (I-302)+(2.050)+(5.013), (I-302)+(2.050)+(5.014), (I-302)+(2.050)+(5.015), (I-302)+(2.050)+(5.016), (I-302)+(2.050)+(5.017), (I-302)+(2.050)+(5.018), (I-302)+(2.050)+(5.019), (I-302)+(2.050)+(5.020), (I-302)+(2.050)+(5.021), (I-302)+(2.050)+(5.022), (I-302)+(2.050)+(5.023), (I-302)+(2.050)+(6.001), (I-302)+(2.050)+(6.002), (I-302)+(2.050)+(6.003), (I-302)+(2.050)+(6.004), (I-302)+(2.050)+(7.001), (I-302)+(2.050)+(7.002), (I-302)+(2.050)+(7.003), (I-302)+(2.050)+(7.004), (I-302)+(2.050)+(7.005), (I-302)+(2.050)+(7.006), (I-302)+(2.050)+(9.001), (I-302)+(2.050)+(9.002), (I-302)+(2.050)+(9.003), (I-302)+(2.050)+(9.004), (I-302)+(2.050)+(9.005), (I-302)+(2.050)+(9.006), (I-302)+(2.050)+(9.007), (I-302)+(2.050)+(9.008), (I-302)+(2.050)+(9.009), (I-302)+(2.050)+(14.001), (I-302)+(2.050)+(14.002), (I-302)+(2.050)+(15.008), (I-302)+(2.050)+(15.011), (I-302)+(2.050)+(15.012), (I-302)+(2.050)+(15.016), (I-302)+(2.050)+(15.025), (I-302)+(2.050)+(15.027), (I-302)+(2.050)+(15.047), (I-302)+(2.050)+(15.063), (I-302)+(2.050)+(15.064), (I-302)+(2.050)+(16.001), (I-302)+(2.050)+(16.002), (I-302)+(2.050)+(16.003), (I-302)+(2.050)+(16.004), (I-302)+(2.050)+(16.005), (I-302)+(2.050)+(16.006), (I-302)+(2.050)+(16.007), (I-302)+(2.050)+(16.008), (I-302)+(2.050)+(17.001), (I-302)+(2.050)+(17.002), (I-302)+(2.050)+(17.003), (I-302)+(2.050)+(17.004), (I-302)+(2.050)+(17.005), (I-302)+(2.050)+(17.006), (I-302)+(2.050)+(17.007), (I-302)+(2.050)+(17.008), (I-302)+(2.050)+(17.009), (I-302)+(2.050)+(17.010), (I-302)+(2.050)+(17.011), (I-302)+(2.050)+(17.012), (I-302)+(2.050)+(18.001), (I-302)+(2.051)+(3.001), (I-302)+(2.051)+(3.002), (I-302)+(2.051)+(3.003), (I-302)+(2.051)+(3.004), (I-302)+(2.051)+(3.005), (I-302)+(2.051)+(3.006), (I-302)+(2.051)+(3.007), (I-302)+(2.051)+(3.008), (I-302)+(2.051)+(3.009), (I-302)+(2.051)+(3.010), (I-302)+(2.051)+(3.011), (I-302)+(2.051)+(3.012), (I-302)+(2.051)+(3.013), (I-302)+(2.051)+(3.014), (I-302)+(2.051)+(3.015), (I-302)+(2.051)+(3.016), (I-302)+(2.051)+(3.017), (I-302)+(2.051)+(3.018), (I-302)+(2.051)+(3.019), (I-302)+(2.051)+(3.020), (I-302)+(2.051)+(3.021), (I-302)+(2.051)+(3.022), (I-302)+(2.051)+(3.023), (I-302)+(2.051)+(3.024), (I-302)+(2.051)+(3.025), (I-302)+(2.051)+(3.026), (I-302)+(2.051)+(3.027), (I-302)+(2.051)+(3.028), (I-302)+(2.051)+(3.029), (I-302)+(2.051)+(3.030), (I-302)+(2.051)+(3.031), (I-302)+(2.051)+(5.001), (I-302)+(2.051)+(5.002), (I-302)+(2.051)+(5.003), (I-302)+(2.051)+(5.004), (I-302)+(2.051)+(5.005), (I-302)+(2.051)+(5.006), (I-302)+(2.051)+(5.007), (I-302)+(2.051)+(5.008), (I-302)+(2.051)+(5.009), (I-302)+(2.051)+(5.010), (I-302)+(2.051)+(5.011), (I-302)+(2.051)+(5.012), (I-302)+(2.051)+(5.013), (I-302)+(2.051)+(5.014), (I-302)+(2.051)+(5.015), (I-302)+(2.051)+(5.016), (I-302)+(2.051)+(5.017), (I-302)+(2.051)+(5.018), (I-302)+(2.051)+(5.019), (I-302)+(2.051)+(5.020), (I-302)+(2.051)+(5.021), (I-302)+(2.051)+(5.022), (I-302)+(2.051)+(5.023), (I-302)+(2.051)+(6.001), (I-302)+(2.051)+(6.002), (I-302)+(2.051)+(6.003), (I-302)+(2.051)+(6.004), (I-302)+(2.051)+(7.001), (I-302)+(2.051)+(7.002), (I-302)+(2.051)+(7.003), (I-302)+(2.051)+(7.004), (I-302)+(2.051)+(7.005), (I-302)+(2.051)+(7.006), (I-302)+(2.051)+(9.001), (I-302)+(2.051)+(9.002), (I-302)+(2.051)+(9.003), (I-302)+(2.051)+(9.004), (I-302)+(2.051)+(9.005), (I-302)+(2.051)+(9.006), (I-302)+(2.051)+(9.007), (I-302)+(2.051)+(9.008), (I-302)+(2.051)+(9.009), (I-302)+(2.051)+(14.001), (I-302)+(2.051)+(14.002), (I-302)+(2.051)+(15.008), (I-302)+(2.051)+(15.011), (I-302)+(2.051)+(15.012), (I-302)+(2.051)+(15.016), (I-302)+(2.051)+(15.025), (I-302)+(2.051)+(15.027), (I-302)+(2.051)+(15.047), (I-302)+(2.051)+(15.063), (I-302)+(2.051)+(15.064), (I-302)+(2.051)+(16.001), (I-302)+(2.051)+(16.002), (I-302)+(2.051)+(16.003), (I-302)+(2.051)+(16.004), (I-302)+(2.051)+(16.005), (I-302)+(2.051)+(16.006), (I-302)+(2.051)+(16.007), (I-302)+(2.051)+(16.008), (I-302)+(2.051)+(17.001), (I-302)+(2.051)+(17.002), (I-302)+(2.051)+(17.003), (I-302)+(2.051)+(17.004), (I-302)+(2.051)+(17.005), (I-302)+(2.051)+(17.006), (I-302)+(2.051)+(17.007), (I-302)+(2.051)+(17.008), (I-302)+(2.051)+(17.009), (I-302)+(2.051)+(17.010), (I-302)+(2.051)+(17.011), (I-302)+(2.051)+(17.012), (I-302)+(2.051)+(18.001), (I-302)+(2.052)+(3.001), (I-302)+(2.052)+(3.002), (I-302)+(2.052)+(3.003), (I-302)+(2.052)+(3.004), (I-302)+(2.052)+(3.005), (I-302)+(2.052)+(3.006), (I-302)+(2.052)+(3.007), (I-302)+(2.052)+(3.008), (I-302)+(2.052)+(3.009), (I-302)+(2.052)+(3.010), (I-302)+(2.052)+(3.011), (I-302)+(2.052)+(3.012), (I-302)+(2.052)+(3.013), (I-302)+(2.052)+(3.014), (I-302)+(2.052)+(3.015), (I-302)+(2.052)+(3.016), (I-302)+(2.052)+(3.017), (I-302)+(2.052)+(3.018), (I-302)+(2.052)+(3.019), (I-302)+(2.052)+(3.020), (I-302)+(2.052)+(3.021), (I-302)+(2.052)+(3.022), (I-302)+(2.052)+(3.023), (I-302)+(2.052)+(3.024), (I-302)+(2.052)+(3.025), (I-302)+(2.052)+(3.026), (I-302)+(2.052)+(3.027), (I-302)+(2.052)+(3.028), (I-302)+(2.052)+(3.029), (I-302)+(2.052)+(3.030), (I-302)+(2.052)+(3.031), (I-302)+(2.052)+(5.001), (I-302)+(2.052)+(5.002), (I-302)+(2.052)+(5.003), (I-302)+(2.052)+(5.004), (I-302)+(2.052)+(5.005), (I-302)+(2.052)+(5.006), (I-302)+(2.052)+(5.007), (I-302)+(2.052)+(5.008), (I-302)+(2.052)+(5.009), (I-302)+(2.052)+(5.010), (I-302)+(2.052)+(5.011), (I-302)+(2.052)+(5.012), (I-302)+(2.052)+(5.013), (I-302)+(2.052)+(5.014), (I-302)+(2.052)+(5.015), (I-302)+(2.052)+(5.016), (I-302)+(2.052)+(5.017), (I-302)+(2.052)+(5.018), (I-302)+(2.052)+(5.019), (I-302)+(2.052)+(5.020), (I-302)+(2.052)+(5.021), (I-302)+(2.052)+(5.022), (I-302)+(2.052)+(5.023), (I-302)+(2.052)+(6.001), (I-302)+(2.052)+(6.002), (I-302)+(2.052)+(6.003), (I-302)+(2.052)+(6.004), (I-302)+(2.052)+(7.001), (I-302)+(2.052)+(7.002), (I-302)+(2.052)+(7.003), (I-302)+(2.052)+(7.004), (I-302)+(2.052)+(7.005), (I-302)+(2.052)+(7.006), (I-302)+(2.052)+(9.001), (I-302)+(2.052)+(9.002), (I-302)+(2.052)+(9.003), (I-302)+(2.052)+(9.004), (I-302)+(2.052)+(9.005), (I-302)+(2.052)+(9.006), (I-302)+(2.052)+(9.007), (I-302)+(2.052)+(9.008), (I-302)+(2.052)+(9.009), (I-302)+(2.052)+(14.001), (I-302)+(2.052)+(14.002), (I-302)+(2.052)+(15.008), (I-302)+(2.052)+(15.011), (I-302)+(2.052)+(15.012), (I-302)+(2.052)+(15.016), (I-302)+(2.052)+(15.025), (I-302)+(2.052)+(15.027), (I-302)+(2.052)+(15.047), (I-302)+(2.052)+(15.063), (I-302)+(2.052)+(15.064), (I-302)+(2.052)+(16.001), (I-302)+(2.052)+(16.002), (I-302)+(2.052)+(16.003), (I-302)+(2.052)+(16.004), (I-302)+(2.052)+(16.005), (I-302)+(2.052)+(16.006), (I-302)+(2.052)+(16.007), (I-302)+(2.052)+(16.008), (I-302)+(2.052)+(17.001), (I-302)+(2.052)+(17.002), (I-302)+(2.052)+(17.003), (I-302)+(2.052)+(17.004), (I-302)+(2.052)+(17.005), (I-302)+(2.052)+(17.006), (I-302)+(2.052)+(17.007), (I-302)+(2.052)+(17.008), (I-302)+(2.052)+(17.009), (I-302)+(2.052)+(17.010), (I-302)+(2.052)+(17.011), (I-302)+(2.052)+(17.012), (I-302)+(2.052)+(18.001), (I-302)+(2.053)+(3.001), (I-302)+(2.053)+(3.002), (I-302)+(2.053)+(3.003), (I-302)+(2.053)+(3.004), (I-302)+(2.053)+(3.005), (I-302)+(2.053)+(3.006), (I-302)+(2.053)+(3.007), (I-302)+(2.053)+(3.008), (I-302)+(2.053)+(3.009), (I-302)+(2.053)+(3.010), (I-302)+(2.053)+(3.011), (I-302)+(2.053)+(3.012), (I-302)+(2.053)+(3.013), (I-302)+(2.053)+(3.014), (I-302)+(2.053)+(3.015), (I-302)+(2.053)+(3.016), (I-302)+(2.053)+(3.017), (I-302)+(2.053)+(3.018), (I-302)+(2.053)+(3.019), (I-302)+(2.053)+(3.020), (I-302)+(2.053)+(3.021), (I-302)+(2.053)+(3.022), (I-302)+(2.053)+(3.023), (I-302)+(2.053)+(3.024), (I-302)+(2.053)+(3.025), (I-302)+(2.053)+(3.026), (I-302)+(2.053)+(3.027), (I-302)+(2.053)+(3.028), (I-302)+(2.053)+(3.029), (I-302)+(2.053)+(3.030), (I-302)+(2.053)+(3.031), (I-302)+(2.053)+(5.001), (I-302)+(2.053)+(5.002), (I-302)+(2.053)+(5.003), (I-302)+(2.053)+(5.004), (I-302)+(2.053)+(5.005), (I-302)+(2.053)+(5.006), (I-302)+(2.053)+(5.007), (I-302)+(2.053)+(5.008), (I-302)+(2.053)+(5.009), (I-302)+(2.053)+(5.010), (I-302)+(2.053)+(5.011), (I-302)+(2.053)+(5.012), (I-302)+(2.053)+(5.013), (I-302)+(2.053)+(5.014), (I-302)+(2.053)+(5.015), (I-302)+(2.053)+(5.016), (I-302)+(2.053)+(5.017), (I-302)+(2.053)+(5.018), (I-302)+(2.053)+(5.019), (I-302)+(2.053)+(5.020), (I-302)+(2.053)+(5.021), (I-302)+(2.053)+(5.022), (I-302)+(2.053)+(5.023), (I-302)+(2.053)+(6.001), (I-302)+(2.053)+(6.002), (I-302)+(2.053)+(6.003), (I-302)+(2.053)+(6.004), (I-302)+(2.053)+(7.001), (I-302)+(2.053)+(7.002), (I-302)+(2.053)+(7.003), (I-302)+(2.053)+(7.004), (I-302)+(2.053)+(7.005), (I-302)+(2.053)+(7.006), (I-302)+(2.053)+(9.001), (I-302)+(2.053)+(9.002), (I-302)+(2.053)+(9.003), (I-302)+(2.053)+(9.004), (I-302)+(2.053)+(9.005), (I-302)+(2.053)+(9.006), (I-302)+(2.053)+(9.007), (I-302)+(2.053)+(9.008), (I-302)+(2.053)+(9.009), (I-302)+(2.053)+(14.001), (I-302)+(2.053)+(14.002), (I-302)+(2.053)+(15.008), (I-302)+(2.053)+(15.011), (I-302)+(2.053)+(15.012), (I-302)+(2.053)+(15.016), (I-302)+(2.053)+(15.025), (I-302)+(2.053)+(15.027), (I-302)+(2.053)+(15.047), (I-302)+(2.053)+(15.063), (I-302)+(2.053)+(15.064), (I-302)+(2.053)+(16.001), (I-302)+(2.053)+(16.002), (I-302)+(2.053)+(16.003), (I-302)+(2.053)+(16.004), (I-302)+(2.053)+(16.005), (I-302)+(2.053)+(16.006), (I-302)+(2.053)+(16.007), (I-302)+(2.053)+(16.008), (I-302)+(2.053)+(17.001), (I-302)+(2.053)+(17.002), (I-302)+(2.053)+(17.003), (I-302)+(2.053)+(17.004), (I-302)+(2.053)+(17.005), (I-302)+(2.053)+(17.006), (I-302)+(2.053)+(17.007), (I-302)+(2.053)+(17.008), (I-302)+(2.053)+(17.009), (I-302)+(2.053)+(17.010), (I-302)+(2.053)+(17.011), (I-302)+(2.053)+(17.012), (I-302)+(2.053)+(18.001), (I-302)+(2.054)+(3.001), (I-302)+(2.054)+(3.002), (I-302)+(2.054)+(3.003), (I-302)+(2.054)+(3.004), (I-302)+(2.054)+(3.005), (I-302)+(2.054)+(3.006), (I-302)+(2.054)+(3.007), (I-302)+(2.054)+(3.008), (I-302)+(2.054)+(3.009), (I-302)+(2.054)+(3.010), (I-302)+(2.054)+(3.011), (I-302)+(2.054)+(3.012), (I-302)+(2.054)+(3.013), (I-302)+(2.054)+(3.014), (I-302)+(2.054)+(3.015), (I-302)+(2.054)+(3.016), (I-302)+(2.054)+(3.017), (I-302)+(2.054)+(3.018), (I-302)+(2.054)+(3.019), (I-302)+(2.054)+(3.020), (I-302)+(2.054)+(3.021), (I-302)+(2.054)+(3.022), (I-302)+(2.054)+(3.023), (I-302)+(2.054)+(3.024), (I-302)+(2.054)+(3.025), (I-302)+(2.054)+(3.026), (I-302)+(2.054)+(3.027), (I-302)+(2.054)+(3.028), (I-302)+(2.054)+(3.029), (I-302)+(2.054)+(3.030), (I-302)+(2.054)+(3.031), (I-302)+(2.054)+(5.001), (I-302)+(2.054)+(5.002), (I-302)+(2.054)+(5.003), (I-302)+(2.054)+(5.004), (I-302)+(2.054)+(5.005), (I-302)+(2.054)+(5.006), (I-302)+(2.054)+(5.007), (I-302)+(2.054)+(5.008), (I-302)+(2.054)+(5.009), (I-302)+(2.054)+(5.010), (I-302)+(2.054)+(5.011), (I-302)+(2.054)+(5.012), (I-302)+(2.054)+(5.013), (I-302)+(2.054)+(5.014), (I-302)+(2.054)+(5.015), (I-302)+(2.054)+(5.016), (I-302)+(2.054)+(5.017), (I-302)+(2.054)+(5.018), (I-302)+(2.054)+(5.019), (I-302)+(2.054)+(5.020), (I-302)+(2.054)+(5.021), (I-302)+(2.054)+(5.022), (I-302)+(2.054)+(5.023), (I-302)+(2.054)+(6.001), (I-302)+(2.054)+(6.002), (I-302)+(2.054)+(6.003), (I-302)+(2.054)+(6.004), (I-302)+(2.054)+(7.001), (I-302)+(2.054)+(7.002), (I-302)+(2.054)+(7.003), (I-302)+(2.054)+(7.004), (I-302)+(2.054)+(7.005), (I-302)+(2.054)+(7.006), (I-302)+(2.054)+(9.001), (I-302)+(2.054)+(9.002), (I-302)+(2.054)+(9.003), (I-302)+(2.054)+(9.004), (I-302)+(2.054)+(9.005), (I-302)+(2.054)+(9.006), (I-302)+(2.054)+(9.007), (I-302)+(2.054)+(9.008), (I-302)+(2.054)+(9.009), (I-302)+(2.054)+(14.001), (I-302)+(2.054)+(14.002), (I-302)+(2.054)+(15.008), (I-302)+(2.054)+(15.011), (I-302)+(2.054)+(15.012), (I-302)+(2.054)+(15.016), (I-302)+(2.054)+(15.025), (I-302)+(2.054)+(15.027), (I-302)+(2.054)+(15.047), (I-302)+(2.054)+(15.063), (I-302)+(2.054)+(15.064), (I-302)+(2.054)+(16.001), (I-302)+(2.054)+(16.002), (I-302)+(2.054)+(16.003), (I-302)+(2.054)+(16.004), (I-302)+(2.054)+(16.005), (I-302)+(2.054)+(16.006), (I-302)+(2.054)+(16.007), (I-302)+(2.054)+(16.008), (I-302)+(2.054)+(17.001), (I-302)+(2.054)+(17.002), (I-302)+(2.054)+(17.003), (I-302)+(2.054)+(17.004), (I-302)+(2.054)+(17.005), (I-302)+(2.054)+(17.006), (I-302)+(2.054)+(17.007), (I-302)+(2.054)+(17.008), (I-302)+(2.054)+(17.009), (I-302)+(2.054)+(17.010), (I-302)+(2.054)+(17.011), (I-302)+(2.054)+(17.012), (I-302)+(2.054)+(18.001), (I-302)+(2.055)+(3.001), (I-302)+(2.055)+(3.002), (I-302)+(2.055)+(3.003), (I-302)+(2.055)+(3.004), (I-302)+(2.055)+(3.005), (I-302)+(2.055)+(3.006), (I-302)+(2.055)+(3.007), (I-302)+(2.055)+(3.008), (I-302)+(2.055)+(3.009), (I-302)+(2.055)+(3.010), (I-302)+(2.055)+(3.011), (I-302)+(2.055)+(3.012), (I-302)+(2.055)+(3.013), (I-302)+(2.055)+(3.014), (I-302)+(2.055)+(3.015), (I-302)+(2.055)+(3.016), (I-302)+(2.055)+(3.017), (I-302)+(2.055)+(3.018), (I-302)+(2.055)+(3.019), (I-302)+(2.055)+(3.020), (I-302)+(2.055)+(3.021), (I-302)+(2.055)+(3.022), (I-302)+(2.055)+(3.023), (I-302)+(2.055)+(3.024), (I-302)+(2.055)+(3.025), (I-302)+(2.055)+(3.026), (I-302)+(2.055)+(3.027), (I-302)+(2.055)+(3.028), (I-302)+(2.055)+(3.029), (I-302)+(2.055)+(3.030), (I-302)+(2.055)+(3.031), (I-302)+(2.055)+(5.001), (I-302)+(2.055)+(5.002), (I-302)+(2.055)+(5.003), (I-302)+(2.055)+(5.004), (I-302)+(2.055)+(5.005), (I-302)+(2.055)+(5.006), (I-302)+(2.055)+(5.007), (I-302)+(2.055)+(5.008), (I-302)+(2.055)+(5.009), (I-302)+(2.055)+(5.010), (I-302)+(2.055)+(5.011), (I-302)+(2.055)+(5.012), (I-302)+(2.055)+(5.013), (I-302)+(2.055)+(5.014), (I-302)+(2.055)+(5.015), (I-302)+(2.055)+(5.016), (I-302)+(2.055)+(5.017), (I-302)+(2.055)+(5.018), (I-302)+(2.055)+(5.019), (I-302)+(2.055)+(5.020), (I-302)+(2.055)+(5.021), (I-302)+(2.055)+(5.022), (I-302)+(2.055)+(5.023), (I-302)+(2.055)+(6.001), (I-302)+(2.055)+(6.002), (I-302)+(2.055)+(6.003), (I-302)+(2.055)+(6.004), (I-302)+(2.055)+(7.001), (I-302)+(2.055)+(7.002), (I-302)+(2.055)+(7.003), (I-302)+(2.055)+(7.004), (I-302)+(2.055)+(7.005), (I-302)+(2.055)+(7.006), (I-302)+(2.055)+(9.001), (I-302)+(2.055)+(9.002), (I-302)+(2.055)+(9.003), (I-302)+(2.055)+(9.004), (I-302)+(2.055)+(9.005), (I-302)+(2.055)+(9.006), (I-302)+(2.055)+(9.007), (I-302)+(2.055)+(9.008), (I-302)+(2.055)+(9.009), (I-302)+(2.055)+(14.001), (I-302)+(2.055)+(14.002), (I-302)+(2.055)+(15.008), (I-302)+(2.055)+(15.011), (I-302)+(2.055)+(15.012), (I-302)+(2.055)+(15.016), (I-302)+(2.055)+(15.025), (I-302)+(2.055)+(15.027), (I-302)+(2.055)+(15.047), (I-302)+(2.055)+(15.063), (I-302)+(2.055)+(15.064), (I-302)+(2.055)+(16.001), (I-302)+(2.055)+(16.002), (I-302)+(2.055)+(16.003), (I-302)+(2.055)+(16.004), (I-302)+(2.055)+(16.005), (I-302)+(2.055)+(16.006), (I-302)+(2.055)+(16.007), (I-302)+(2.055)+(16.008), (I-302)+(2.055)+(17.001), (I-302)+(2.055)+(17.002), (I-302)+(2.055)+(17.003), (I-302)+(2.055)+(17.004), (I-302)+(2.055)+(17.005), (I-302)+(2.055)+(17.006), (I-302)+(2.055)+(17.007), (I-302)+(2.055)+(17.008), (I-302)+(2.055)+(17.009), (I-302)+(2.055)+(17.010), (I-302)+(2.055)+(17.011), (I-302)+(2.055)+(17.012), (I-302)+(2.055)+(18.001), (I-302)+(2.056)+(3.001), (I-302)+(2.056)+(3.002), (I-302)+(2.056)+(3.003), (I-302)+(2.056)+(3.004), (I-302)+(2.056)+(3.005), (I-302)+(2.056)+(3.006), (I-302)+(2.056)+(3.007), (I-302)+(2.056)+(3.008), (I-302)+(2.056)+(3.009), (I-302)+(2.056)+(3.010), (I-302)+(2.056)+(3.011), (I-302)+(2.056)+(3.012), (I-302)+(2.056)+(3.013), (I-302)+(2.056)+(3.014), (I-302)+(2.056)+(3.015), (I-302)+(2.056)+(3.016), (I-302)+(2.056)+(3.017), (I-302)+(2.056)+(3.018), (I-302)+(2.056)+(3.019), (I-302)+(2.056)+(3.020), (I-302)+(2.056)+(3.021), (I-302)+(2.056)+(3.022), (I-302)+(2.056)+(3.023), (I-302)+(2.056)+(3.024), (I-302)+(2.056)+(3.025), (I-302)+(2.056)+(3.026), (I-302)+(2.056)+(3.027), (I-302)+(2.056)+(3.028), (I-302)+(2.056)+(3.029), (I-302)+(2.056)+(3.030), (I-302)+(2.056)+(3.031), (I-302)+(2.056)+(5.001), (I-302)+(2.056)+(5.002), (I-302)+(2.056)+(5.003), (I-302)+(2.056)+(5.004), (I-302)+(2.056)+(5.005), (I-302)+(2.056)+(5.006), (I-302)+(2.056)+(5.007), (I-302)+(2.056)+(5.008), (I-302)+(2.056)+(5.009), (I-302)+(2.056)+(5.010), (I-302)+(2.056)+(5.011), (I-302)+(2.056)+(5.012), (I-302)+(2.056)+(5.013), (I-302)+(2.056)+(5.014), (I-302)+(2.056)+(5.015), (I-302)+(2.056)+(5.016), (I-302)+(2.056)+(5.017), (I-302)+(2.056)+(5.018), (I-302)+(2.056)+(5.019), (I-302)+(2.056)+(5.020), (I-302)+(2.056)+(5.021), (I-302)+(2.056)+(5.022), (I-302)+(2.056)+(5.023), (I-302)+(2.056)+(6.001), (I-302)+(2.056)+(6.002), (I-302)+(2.056)+(6.003), (I-302)+(2.056)+(6.004), (I-302)+(2.056)+(7.001), (I-302)+(2.056)+(7.002), (I-302)+(2.056)+(7.003), (I-302)+(2.056)+(7.004), (I-302)+(2.056)+(7.005), (I-302)+(2.056)+(7.006), (I-302)+(2.056)+(9.001), (I-302)+(2.056)+(9.002), (I-302)+(2.056)+(9.003), (I-302)+(2.056)+(9.004), (I-302)+(2.056)+(9.005), (I-302)+(2.056)+(9.006), (I-302)+(2.056)+(9.007), (I-302)+(2.056)+(9.008), (I-302)+(2.056)+(9.009), (I-302)+(2.056)+(14.001), (I-302)+(2.056)+(14.002), (I-302)+(2.056)+(15.008), (I-302)+(2.056)+(15.011), (I-302)+(2.056)+(15.012), (I-302)+(2.056)+(15.016), (I-302)+(2.056)+(15.025), (I-302)+(2.056)+(15.027), (I-302)+(2.056)+(15.047), (I-302)+(2.056)+(15.063), (I-302)+(2.056)+(15.064), (I-302)+(2.056)+(16.001), (I-302)+(2.056)+(16.002), (I-302)+(2.056)+(16.003), (I-302)+(2.056)+(16.004), (I-302)+(2.056)+(16.005), (I-302)+(2.056)+(16.006), (I-302)+(2.056)+(16.007), (I-302)+(2.056)+(16.008), (I-302)+(2.056)+(17.001), (I-302)+(2.056)+(17.002), (I-302)+(2.056)+(17.003), (I-302)+(2.056)+(17.004), (I-302)+(2.056)+(17.005), (I-302)+(2.056)+(17.006), (I-302)+(2.056)+(17.007), (I-302)+(2.056)+(17.008), (I-302)+(2.056)+(17.009), (I-302)+(2.056)+(17.010), (I-302)+(2.056)+(17.011), (I-302)+(2.056)+(17.012), (I-302)+(2.056)+(18.001), (I-302)+(2.057)+(3.001), (I-302)+(2.057)+(3.002), (I-302)+(2.057)+(3.003), (I-302)+(2.057)+(3.004), (I-302)+(2.057)+(3.005), (I-302)+(2.057)+(3.006), (I-302)+(2.057)+(3.007), (I-302)+(2.057)+(3.008), (I-302)+(2.057)+(3.009), (I-302)+(2.057)+(3.010), (I-302)+(2.057)+(3.011), (I-302)+(2.057)+(3.012), (I-302)+(2.057)+(3.013), (I-302)+(2.057)+(3.014), (I-302)+(2.057)+(3.015), (I-302)+(2.057)+(3.016), (I-302)+(2.057)+(3.017), (I-302)+(2.057)+(3.018), (I-302)+(2.057)+(3.019), (I-302)+(2.057)+(3.020), (I-302)+(2.057)+(3.021), (I-302)+(2.057)+(3.022), (I-302)+(2.057)+(3.023), (I-302)+(2.057)+(3.024), (I-302)+(2.057)+(3.025), (I-302)+(2.057)+(3.026), (I-302)+(2.057)+(3.027), (I-302)+(2.057)+(3.028), (I-302)+(2.057)+(3.029), (I-302)+(2.057)+(3.030), (I-302)+(2.057)+(3.031), (I-302)+(2.057)+(5.001), (I-302)+(2.057)+(5.002), (I-302)+(2.057)+(5.003), (I-302)+(2.057)+(5.004), (I-302)+(2.057)+(5.005), (I-302)+(2.057)+(5.006), (I-302)+(2.057)+(5.007), (I-302)+(2.057)+(5.008), (I-302)+(2.057)+(5.009), (I-302)+(2.057)+(5.010), (I-302)+(2.057)+(5.011), (I-302)+(2.057)+(5.012), (I-302)+(2.057)+(5.013), (I-302)+(2.057)+(5.014), (I-302)+(2.057)+(5.015), (I-302)+(2.057)+(5.016), (I-302)+(2.057)+(5.017), (I-302)+(2.057)+(5.018), (I-302)+(2.057)+(5.019), (I-302)+(2.057)+(5.020), (I-302)+(2.057)+(5.021), (I-302)+(2.057)+(5.022), (I-302)+(2.057)+(5.023), (I-302)+(2.057)+(6.001), (I-302)+(2.057)+(6.002), (I-302)+(2.057)+(6.003), (I-302)+(2.057)+(6.004), (I-302)+(2.057)+(7.001), (I-302)+(2.057)+(7.002), (I-302)+(2.057)+(7.003), (I-302)+(2.057)+(7.004), (I-302)+(2.057)+(7.005), (I-302)+(2.057)+(7.006), (I-302)+(2.057)+(9.001), (I-302)+(2.057)+(9.002), (I-302)+(2.057)+(9.003), (I-302)+(2.057)+(9.004), (I-302)+(2.057)+(9.005), (I-302)+(2.057)+(9.006), (I-302)+(2.057)+(9.007), (I-302)+(2.057)+(9.008), (I-302)+(2.057)+(9.009), (I-302)+(2.057)+(14.001), (I-302)+(2.057)+(14.002), (I-302)+(2.057)+(15.008), (I-302)+(2.057)+(15.011), (I-302)+(2.057)+(15.012), (I-302)+(2.057)+(15.016), (I-302)+(2.057)+(15.025), (I-302)+(2.057)+(15.027), (I-302)+(2.057)+(15.047), (I-302)+(2.057)+(15.063), (I-302)+(2.057)+(15.064), (I-302)+(2.057)+(16.001), (I-302)+(2.057)+(16.002), (I-302)+(2.057)+(16.003), (I-302)+(2.057)+(16.004), (I-302)+(2.057)+(16.005), (I-302)+(2.057)+(16.006), (I-302)+(2.057)+(16.007), (I-302)+(2.057)+(16.008), (I-302)+(2.057)+(17.001), (I-302)+(2.057)+(17.002), (I-302)+(2.057)+(17.003), (I-302)+(2.057)+(17.004), (I-302)+(2.057)+(17.005), (I-302)+(2.057)+(17.006), (I-302)+(2.057)+(17.007), (I-302)+(2.057)+(17.008), (I-302)+(2.057)+(17.009), (I-302)+(2.057)+(17.010), (I-302)+(2.057)+(17.011), (I-302)+(2.057)+(17.012), (I-302)+(2.057)+(18.001), (I-302)+(2.058)+(3.001), (I-302)+(2.058)+(3.002), (I-302)+(2.058)+(3.003), (I-302)+(2.058)+(3.004), (I-302)+(2.058)+(3.005), (I-302)+(2.058)+(3.006), (I-302)+(2.058)+(3.007), (I-302)+(2.058)+(3.008), (I-302)+(2.058)+(3.009), (I-302)+(2.058)+(3.010), (I-302)+(2.058)+(3.011), (I-302)+(2.058)+(3.012), (I-302)+(2.058)+(3.013), (I-302)+(2.058)+(3.014), (I-302)+(2.058)+(3.015), (I-302)+(2.058)+(3.016), (I-302)+(2.058)+(3.017), (I-302)+(2.058)+(3.018), (I-302)+(2.058)+(3.019), (I-302)+(2.058)+(3.020), (I-302)+(2.058)+(3.021), (I-302)+(2.058)+(3.022), (I-302)+(2.058)+(3.023), (I-302)+(2.058)+(3.024), (I-302)+(2.058)+(3.025), (I-302)+(2.058)+(3.026), (I-302)+(2.058)+(3.027), (I-302)+(2.058)+(3.028), (I-302)+(2.058)+(3.029), (I-302)+(2.058)+(3.030), (I-302)+(2.058)+(3.031), (I-302)+(2.058)+(5.001), (I-302)+(2.058)+(5.002), (I-302)+(2.058)+(5.003), (I-302)+(2.058)+(5.004), (I-302)+(2.058)+(5.005), (I-302)+(2.058)+(5.006), (I-302)+(2.058)+(5.007), (I-302)+(2.058)+(5.008), (I-302)+(2.058)+(5.009), (I-302)+(2.058)+(5.010), (I-302)+(2.058)+(5.011), (I-302)+(2.058)+(5.012), (I-302)+(2.058)+(5.013), (I-302)+(2.058)+(5.014), (I-302)+(2.058)+(5.015), (I-302)+(2.058)+(5.016), (I-302)+(2.058)+(5.017), (I-302)+(2.058)+(5.018), (I-302)+(2.058)+(5.019), (I-302)+(2.058)+(5.020), (I-302)+(2.058)+(5.021), (I-302)+(2.058)+(5.022), (I-302)+(2.058)+(5.023), (I-302)+(2.058)+(6.001), (I-302)+(2.058)+(6.002), (I-302)+(2.058)+(6.003), (I-302)+(2.058)+(6.004), (I-302)+(2.058)+(7.001), (I-302)+(2.058)+(7.002), (I-302)+(2.058)+(7.003), (I-302)+(2.058)+(7.004), (I-302)+(2.058)+(7.005), (I-302)+(2.058)+(7.006), (I-302)+(2.058)+(9.001), (I-302)+(2.058)+(9.002), (I-302)+(2.058)+(9.003), (I-302)+(2.058)+(9.004), (I-302)+(2.058)+(9.005), (I-302)+(2.058)+(9.006), (I-302)+(2.058)+(9.007), (I-302)+(2.058)+(9.008), (I-302)+(2.058)+(9.009), (I-302)+(2.058)+(14.001), (I-302)+(2.058)+(14.002), (I-302)+(2.058)+(15.008), (I-302)+(2.058)+(15.011), (I-302)+(2.058)+(15.012), (I-302)+(2.058)+(15.016), (I-302)+(2.058)+(15.025), (I-302)+(2.058)+(15.027), (I-302)+(2.058)+(15.047), (I-302)+(2.058)+(15.063), (I-302)+(2.058)+(15.064), (I-302)+(2.058)+(16.001), (I-302)+(2.058)+(16.002), (I-302)+(2.058)+(16.003), (I-302)+(2.058)+(16.004), (I-302)+(2.058)+(16.005), (I-302)+(2.058)+(16.006), (I-302)+(2.058)+(16.007), (I-302)+(2.058)+(16.008), (I-302)+(2.058)+(17.001), (I-302)+(2.058)+(17.002), (I-302)+(2.058)+(17.003), (I-302)+(2.058)+(17.004), (I-302)+(2.058)+(17.005), (I-302)+(2.058)+(17.006), (I-302)+(2.058)+(17.007), (I-302)+(2.058)+(17.008), (I-302)+(2.058)+(17.009), (I-302)+(2.058)+(17.010), (I-302)+(2.058)+(17.011), (I-302)+(2.058)+(17.012), (I-302)+(2.058)+(18.001), (I-302)+(2.059)+(3.001), (I-302)+(2.059)+(3.002), (I-302)+(2.059)+(3.003), (I-302)+(2.059)+(3.004), (I-302)+(2.059)+(3.005), (I-302)+(2.059)+(3.006), (I-302)+(2.059)+(3.007), (I-302)+(2.059)+(3.008), (I-302)+(2.059)+(3.009), (I-302)+(2.059)+(3.010), (I-302)+(2.059)+(3.011), (I-302)+(2.059)+(3.012), (I-302)+(2.059)+(3.013), (I-302)+(2.059)+(3.014), (I-302)+(2.059)+(3.015), (I-302)+(2.059)+(3.016), (I-302)+(2.059)+(3.017), (I-302)+(2.059)+(3.018), (I-302)+(2.059)+(3.019), (I-302)+(2.059)+(3.020), (I-302)+(2.059)+(3.021), (I-302)+(2.059)+(3.022), (I-302)+(2.059)+(3.023), (I-302)+(2.059)+(3.024), (I-302)+(2.059)+(3.025), (I-302)+(2.059)+(3.026), (I-302)+(2.059)+(3.027), (I-302)+(2.059)+(3.028), (I-302)+(2.059)+(3.029), (I-302)+(2.059)+(3.030), (I-302)+(2.059)+(3.031), (I-302)+(2.059)+(5.001), (I-302)+(2.059)+(5.002), (I-302)+(2.059)+(5.003), (I-302)+(2.059)+(5.004), (I-302)+(2.059)+(5.005), (I-302)+(2.059)+(5.006), (I-302)+(2.059)+(5.007), (I-302)+(2.059)+(5.008), (I-302)+(2.059)+(5.009), (I-302)+(2.059)+(5.010), (I-302)+(2.059)+(5.011), (I-302)+(2.059)+(5.012), (I-302)+(2.059)+(5.013), (I-302)+(2.059)+(5.014), (I-302)+(2.059)+(5.015), (I-302)+(2.059)+(5.016), (I-302)+(2.059)+(5.017), (I-302)+(2.059)+(5.018), (I-302)+(2.059)+(5.019), (I-302)+(2.059)+(5.020), (I-302)+(2.059)+(5.021), (I-302)+(2.059)+(5.022), (I-302)+(2.059)+(5.023), (I-302)+(2.059)+(6.001), (I-302)+(2.059)+(6.002), (I-302)+(2.059)+(6.003), (I-302)+(2.059)+(6.004), (I-302)+(2.059)+(7.001), (I-302)+(2.059)+(7.002), (I-302)+(2.059)+(7.003), (I-302)+(2.059)+(7.004), (I-302)+(2.059)+(7.005), (I-302)+(2.059)+(7.006), (I-302)+(2.059)+(9.001), (I-302)+(2.059)+(9.002), (I-302)+(2.059)+(9.003), (I-302)+(2.059)+(9.004), (I-302)+(2.059)+(9.005), (I-302)+(2.059)+(9.006), (I-302)+(2.059)+(9.007), (I-302)+(2.059)+(9.008), (I-302)+(2.059)+(9.009), (I-302)+(2.059)+(14.001), (I-302)+(2.059)+(14.002), (I-302)+(2.059)+(15.008), (I-302)+(2.059)+(15.011), (I-302)+(2.059)+(15.012), (I-302)+(2.059)+(15.016), (I-302)+(2.059)+(15.025), (I-302)+(2.059)+(15.027), (I-302)+(2.059)+(15.047), (I-302)+(2.059)+(15.063), (I-302)+(2.059)+(15.064), (I-302)+(2.059)+(16.001), (I-302)+(2.059)+(16.002), (I-302)+(2.059)+(16.003), (I-302)+(2.059)+(16.004), (I-302)+(2.059)+(16.005), (I-302)+(2.059)+(16.006), (I-302)+(2.059)+(16.007), (I-302)+(2.059)+(16.008), (I-302)+(2.059)+(17.001), (I-302)+(2.059)+(17.002), (I-302)+(2.059)+(17.003), (I-302)+(2.059)+(17.004), (I-302)+(2.059)+(17.005), (I-302)+(2.059)+(17.006), (I-302)+(2.059)+(17.007), (I-302)+(2.059)+(17.008), (I-302)+(2.059)+(17.009), (I-302)+(2.059)+(17.010), (I-302)+(2.059)+(17.011), (I-302)+(2.059)+(17.012), (I-302)+(2.059)+(18.001), (I-302)+(3.001)+(3.025), (I-302)+(3.001)+(3.030), (I-302)+(3.001)+(3.031), (I-302)+(3.001)+(5.001), (I-302)+(3.001)+(5.002), (I-302)+(3.001)+(5.003), (I-302)+(3.001)+(5.004), (I-302)+(3.001)+(5.005), (I-302)+(3.001)+(5.006), (I-302)+(3.001)+(5.007), (I-302)+(3.001)+(5.008), (I-302)+(3.001)+(5.009), (I-302)+(3.001)+(5.010), (I-302)+(3.001)+(5.011), (I-302)+(3.001)+(5.012), (I-302)+(3.001)+(5.013), (I-302)+(3.001)+(5.014), (I-302)+(3.001)+(5.015), (I-302)+(3.001)+(5.016), (I-302)+(3.001)+(5.017), (I-302)+(3.001)+(5.018), (I-302)+(3.001)+(5.019), (I-302)+(3.001)+(5.020), (I-302)+(3.001)+(5.021), (I-302)+(3.001)+(5.022), (I-302)+(3.001)+(5.023), (I-302)+(3.001)+(6.001), (I-302)+(3.001)+(6.002), (I-302)+(3.001)+(6.003), (I-302)+(3.001)+(6.004), (I-302)+(3.001)+(7.001), (I-302)+(3.001)+(7.002), (I-302)+(3.001)+(7.003), (I-302)+(3.001)+(7.004), (I-302)+(3.001)+(7.005), (I-302)+(3.001)+(7.006), (I-302)+(3.001)+(9.001), (I-302)+(3.001)+(9.002), (I-302)+(3.001)+(9.003), (I-302)+(3.001)+(9.004), (I-302)+(3.001)+(9.005), (I-302)+(3.001)+(9.006), (I-302)+(3.001)+(9.007), (I-302)+(3.001)+(9.008), (I-302)+(3.001)+(9.009), (I-302)+(3.001)+(14.001), (I-302)+(3.001)+(14.002), (I-302)+(3.001)+(15.008), (I-302)+(3.001)+(15.011), (I-302)+(3.001)+(15.012), (I-302)+(3.001)+(15.016), (I-302)+(3.001)+(15.025), (I-302)+(3.001)+(15.027), (I-302)+(3.001)+(15.047), (I-302)+(3.001)+(15.063), (I-302)+(3.001)+(15.064), (I-302)+(3.001)+(16.001), (I-302)+(3.001)+(16.002), (I-302)+(3.001)+(16.003), (I-302)+(3.001)+(16.004), (I-302)+(3.001)+(16.005), (I-302)+(3.001)+(16.006), (I-302)+(3.001)+(16.007), (I-302)+(3.001)+(16.008), (I-302)+(3.001)+(17.001), (I-302)+(3.001)+(17.002), (I-302)+(3.001)+(17.003), (I-302)+(3.001)+(17.004), (I-302)+(3.001)+(17.005), (I-302)+(3.001)+(17.006), (I-302)+(3.001)+(17.007), (I-302)+(3.001)+(17.008), (I-302)+(3.001)+(17.009), (I-302)+(3.001)+(17.010), (I-302)+(3.001)+(17.011), (I-302)+(3.001)+(17.012), (I-302)+(3.001)+(18.001), (I-302)+(3.002)+(3.025), (I-302)+(3.002)+(3.030), (I-302)+(3.002)+(3.031), (I-302)+(3.002)+(5.001), (I-302)+(3.002)+(5.002), (I-302)+(3.002)+(5.003), (I-302)+(3.002)+(5.004), (I-302)+(3.002)+(5.005), (I-302)+(3.002)+(5.006), (I-302)+(3.002)+(5.007), (I-302)+(3.002)+(5.008), (I-302)+(3.002)+(5.009), (I-302)+(3.002)+(5.010), (I-302)+(3.002)+(5.011), (I-302)+(3.002)+(5.012), (I-302)+(3.002)+(5.013), (I-302)+(3.002)+(5.014), (I-302)+(3.002)+(5.015), (I-302)+(3.002)+(5.016), (I-302)+(3.002)+(5.017), (I-302)+(3.002)+(5.018), (I-302)+(3.002)+(5.019), (I-302)+(3.002)+(5.020), (I-302)+(3.002)+(5.021), (I-302)+(3.002)+(5.022), (I-302)+(3.002)+(5.023), (I-302)+(3.002)+(6.001), (I-302)+(3.002)+(6.002), (I-302)+(3.002)+(6.003), (I-302)+(3.002)+(6.004), (I-302)+(3.002)+(7.001), (I-302)+(3.002)+(7.002), (I-302)+(3.002)+(7.003), (I-302)+(3.002)+(7.004), (I-302)+(3.002)+(7.005), (I-302)+(3.002)+(7.006), (I-302)+(3.002)+(9.001), (I-302)+(3.002)+(9.002), (I-302)+(3.002)+(9.003), (I-302)+(3.002)+(9.004), (I-302)+(3.002)+(9.005), (I-302)+(3.002)+(9.006), (I-302)+(3.002)+(9.007), (I-302)+(3.002)+(9.008), (I-302)+(3.002)+(9.009), (I-302)+(3.002)+(14.001), (I-302)+(3.002)+(14.002), (I-302)+(3.002)+(15.008), (I-302)+(3.002)+(15.011), (I-302)+(3.002)+(15.012), (I-302)+(3.002)+(15.016), (I-302)+(3.002)+(15.025), (I-302)+(3.002)+(15.027), (I-302)+(3.002)+(15.047), (I-302)+(3.002)+(15.063), (I-302)+(3.002)+(15.064), (I-302)+(3.002)+(16.001), (I-302)+(3.002)+(16.002), (I-302)+(3.002)+(16.003), (I-302)+(3.002)+(16.004), (I-302)+(3.002)+(16.005), (I-302)+(3.002)+(16.006), (I-302)+(3.002)+(16.007), (I-302)+(3.002)+(16.008), (I-302)+(3.002)+(17.001), (I-302)+(3.002)+(17.002), (I-302)+(3.002)+(17.003), (I-302)+(3.002)+(17.004), (I-302)+(3.002)+(17.005), (I-302)+(3.002)+(17.006), (I-302)+(3.002)+(17.007), (I-302)+(3.002)+(17.008), (I-302)+(3.002)+(17.009), (I-302)+(3.002)+(17.010), (I-302)+(3.002)+(17.011), (I-302)+(3.002)+(17.012), (I-302)+(3.002)+(18.001), (I-302)+(3.003)+(3.025), (I-302)+(3.003)+(3.030), (I-302)+(3.003)+(3.031), (I-302)+(3.003)+(5.001), (I-302)+(3.003)+(5.002), (I-302)+(3.003)+(5.003), (I-302)+(3.003)+(5.004), (I-302)+(3.003)+(5.005), (I-302)+(3.003)+(5.006), (I-302)+(3.003)+(5.007), (I-302)+(3.003)+(5.008), (I-302)+(3.003)+(5.009), (I-302)+(3.003)+(5.010), (I-302)+(3.003)+(5.011), (I-302)+(3.003)+(5.012), (I-302)+(3.003)+(5.013), (I-302)+(3.003)+(5.014), (I-302)+(3.003)+(5.015), (I-302)+(3.003)+(5.016), (I-302)+(3.003)+(5.017), (I-302)+(3.003)+(5.018), (I-302)+(3.003)+(5.019), (I-302)+(3.003)+(5.020), (I-302)+(3.003)+(5.021), (I-302)+(3.003)+(5.022), (I-302)+(3.003)+(5.023), (I-302)+(3.003)+(6.001), (I-302)+(3.003)+(6.002), (I-302)+(3.003)+(6.003), (I-302)+(3.003)+(6.004), (I-302)+(3.003)+(7.001), (I-302)+(3.003)+(7.002), (I-302)+(3.003)+(7.003), (I-302)+(3.003)+(7.004), (I-302)+(3.003)+(7.005), (I-302)+(3.003)+(7.006), (I-302)+(3.003)+(9.001), (I-302)+(3.003)+(9.002), (I-302)+(3.003)+(9.003), (I-302)+(3.003)+(9.004), (I-302)+(3.003)+(9.005), (I-302)+(3.003)+(9.006), (I-302)+(3.003)+(9.007), (I-302)+(3.003)+(9.008), (I-302)+(3.003)+(9.009), (I-302)+(3.003)+(14.001), (I-302)+(3.003)+(14.002), (I-302)+(3.003)+(15.008), (I-302)+(3.003)+(15.011), (I-302)+(3.003)+(15.012), (I-302)+(3.003)+(15.016), (I-302)+(3.003)+(15.025), (I-302)+(3.003)+(15.027), (I-302)+(3.003)+(15.047), (I-302)+(3.003)+(15.063), (I-302)+(3.003)+(15.064), (I-302)+(3.003)+(16.001), (I-302)+(3.003)+(16.002), (I-302)+(3.003)+(16.003), (I-302)+(3.003)+(16.004), (I-302)+(3.003)+(16.005), (I-302)+(3.003)+(16.006), (I-302)+(3.003)+(16.007), (I-302)+(3.003)+(16.008), (I-302)+(3.003)+(17.001), (I-302)+(3.003)+(17.002), (I-302)+(3.003)+(17.003), (I-302)+(3.003)+(17.004), (I-302)+(3.003)+(17.005), (I-302)+(3.003)+(17.006), (I-302)+(3.003)+(17.007), (I-302)+(3.003)+(17.008), (I-302)+(3.003)+(17.009), (I-302)+(3.003)+(17.010), (I-302)+(3.003)+(17.011), (I-302)+(3.003)+(17.012), (I-302)+(3.003)+(18.001), (I-302)+(3.004)+(3.025), (I-302)+(3.004)+(3.030), (I-302)+(3.004)+(3.031), (I-302)+(3.004)+(5.001), (I-302)+(3.004)+(5.002), (I-302)+(3.004)+(5.003), (I-302)+(3.004)+(5.004), (I-302)+(3.004)+(5.005), (I-302)+(3.004)+(5.006), (I-302)+(3.004)+(5.007), (I-302)+(3.004)+(5.008), (I-302)+(3.004)+(5.009), (I-302)+(3.004)+(5.010), (I-302)+(3.004)+(5.011), (I-302)+(3.004)+(5.012), (I-302)+(3.004)+(5.013), (I-302)+(3.004)+(5.014), (I-302)+(3.004)+(5.015), (I-302)+(3.004)+(5.016), (I-302)+(3.004)+(5.017), (I-302)+(3.004)+(5.018), (I-302)+(3.004)+(5.019), (I-302)+(3.004)+(5.020), (I-302)+(3.004)+(5.021), (I-302)+(3.004)+(5.022), (I-302)+(3.004)+(5.023), (I-302)+(3.004)+(6.001), (I-302)+(3.004)+(6.002), (I-302)+(3.004)+(6.003), (I-302)+(3.004)+(6.004), (I-302)+(3.004)+(7.001), (I-302)+(3.004)+(7.002), (I-302)+(3.004)+(7.003), (I-302)+(3.004)+(7.004), (I-302)+(3.004)+(7.005), (I-302)+(3.004)+(7.006), (I-302)+(3.004)+(9.001), (I-302)+(3.004)+(9.002), (I-302)+(3.004)+(9.003), (I-302)+(3.004)+(9.004), (I-302)+(3.004)+(9.005), (I-302)+(3.004)+(9.006), (I-302)+(3.004)+(9.007), (I-302)+(3.004)+(9.008), (I-302)+(3.004)+(9.009), (I-302)+(3.004)+(14.001), (I-302)+(3.004)+(14.002), (I-302)+(3.004)+(15.008), (I-302)+(3.004)+(15.011), (I-302)+(3.004)+(15.012), (I-302)+(3.004)+(15.016), (I-302)+(3.004)+(15.025), (I-302)+(3.004)+(15.027), (I-302)+(3.004)+(15.047), (I-302)+(3.004)+(15.063), (I-302)+(3.004)+(15.064), (I-302)+(3.004)+(16.001), (I-302)+(3.004)+(16.002), (I-302)+(3.004)+(16.003), (I-302)+(3.004)+(16.004), (I-302)+(3.004)+(16.005), (I-302)+(3.004)+(16.006), (I-302)+(3.004)+(16.007), (I-302)+(3.004)+(16.008), (I-302)+(3.004)+(17.001), (I-302)+(3.004)+(17.002), (I-302)+(3.004)+(17.003), (I-302)+(3.004)+(17.004), (I-302)+(3.004)+(17.005), (I-302)+(3.004)+(17.006), (I-302)+(3.004)+(17.007), (I-302)+(3.004)+(17.008), (I-302)+(3.004)+(17.009), (I-302)+(3.004)+(17.010), (I-302)+(3.004)+(17.011), (I-302)+(3.004)+(17.012), (I-302)+(3.004)+(18.001), (I-302)+(3.005)+(3.025), (I-302)+(3.005)+(3.030), (I-302)+(3.005)+(3.031), (I-302)+(3.005)+(5.001), (I-302)+(3.005)+(5.002), (I-302)+(3.005)+(5.003), (I-302)+(3.005)+(5.004), (I-302)+(3.005)+(5.005), (I-302)+(3.005)+(5.006), (I-302)+(3.005)+(5.007), (I-302)+(3.005)+(5.008), (I-302)+(3.005)+(5.009), (I-302)+(3.005)+(5.010), (I-302)+(3.005)+(5.011), (I-302)+(3.005)+(5.012), (I-302)+(3.005)+(5.013), (I-302)+(3.005)+(5.014), (I-302)+(3.005)+(5.015), (I-302)+(3.005)+(5.016), (I-302)+(3.005)+(5.017), (I-302)+(3.005)+(5.018), (I-302)+(3.005)+(5.019), (I-302)+(3.005)+(5.020), (I-302)+(3.005)+(5.021), (I-302)+(3.005)+(5.022), (I-302)+(3.005)+(5.023), (I-302)+(3.005)+(6.001), (I-302)+(3.005)+(6.002), (I-302)+(3.005)+(6.003), (I-302)+(3.005)+(6.004), (I-302)+(3.005)+(7.001), (I-302)+(3.005)+(7.002), (I-302)+(3.005)+(7.003), (I-302)+(3.005)+(7.004), (I-302)+(3.005)+(7.005), (I-302)+(3.005)+(7.006), (I-302)+(3.005)+(9.001), (I-302)+(3.005)+(9.002), (I-302)+(3.005)+(9.003), (I-302)+(3.005)+(9.004), (I-302)+(3.005)+(9.005), (I-302)+(3.005)+(9.006), (I-302)+(3.005)+(9.007), (I-302)+(3.005)+(9.008), (I-302)+(3.005)+(9.009), (I-302)+(3.005)+(14.001), (I-302)+(3.005)+(14.002), (I-302)+(3.005)+(15.008), (I-302)+(3.005)+(15.011), (I-302)+(3.005)+(15.012), (I-302)+(3.005)+(15.016), (I-302)+(3.005)+(15.025), (I-302)+(3.005)+(15.027), (I-302)+(3.005)+(15.047), (I-302)+(3.005)+(15.063), (I-302)+(3.005)+(15.064), (I-302)+(3.005)+(16.001), (I-302)+(3.005)+(16.002), (I-302)+(3.005)+(16.003), (I-302)+(3.005)+(16.004), (I-302)+(3.005)+(16.005), (I-302)+(3.005)+(16.006), (I-302)+(3.005)+(16.007), (I-302)+(3.005)+(16.008), (I-302)+(3.005)+(17.001), (I-302)+(3.005)+(17.002), (I-302)+(3.005)+(17.003), (I-302)+(3.005)+(17.004), (I-302)+(3.005)+(17.005), (I-302)+(3.005)+(17.006), (I-302)+(3.005)+(17.007), (I-302)+(3.005)+(17.008), (I-302)+(3.005)+(17.009), (I-302)+(3.005)+(17.010), (I-302)+(3.005)+(17.011), (I-302)+(3.005)+(17.012), (I-302)+(3.005)+(18.001), (I-302)+(3.006)+(3.025), (I-302)+(3.006)+(3.030), (I-302)+(3.006)+(3.031), (I-302)+(3.006)+(5.001), (I-302)+(3.006)+(5.002), (I-302)+(3.006)+(5.003), (I-302)+(3.006)+(5.004), (I-302)+(3.006)+(5.005), (I-302)+(3.006)+(5.006), (I-302)+(3.006)+(5.007), (I-302)+(3.006)+(5.008), (I-302)+(3.006)+(5.009), (I-302)+(3.006)+(5.010), (I-302)+(3.006)+(5.011), (I-302)+(3.006)+(5.012), (I-302)+(3.006)+(5.013), (I-302)+(3.006)+(5.014), (I-302)+(3.006)+(5.015), (I-302)+(3.006)+(5.016), (I-302)+(3.006)+(5.017), (I-302)+(3.006)+(5.018), (I-302)+(3.006)+(5.019), (I-302)+(3.006)+(5.020), (I-302)+(3.006)+(5.021), (I-302)+(3.006)+(5.022), (I-302)+(3.006)+(5.023), (I-302)+(3.006)+(6.001), (I-302)+(3.006)+(6.002), (I-302)+(3.006)+(6.003), (I-302)+(3.006)+(6.004), (I-302)+(3.006)+(7.001), (I-302)+(3.006)+(7.002), (I-302)+(3.006)+(7.003), (I-302)+(3.006)+(7.004), (I-302)+(3.006)+(7.005), (I-302)+(3.006)+(7.006), (I-302)+(3.006)+(9.001), (I-302)+(3.006)+(9.002), (I-302)+(3.006)+(9.003), (I-302)+(3.006)+(9.004), (I-302)+(3.006)+(9.005), (I-302)+(3.006)+(9.006), (I-302)+(3.006)+(9.007), (I-302)+(3.006)+(9.008), (I-302)+(3.006)+(9.009), (I-302)+(3.006)+(14.001), (I-302)+(3.006)+(14.002), (I-302)+(3.006)+(15.008), (I-302)+(3.006)+(15.011), (I-302)+(3.006)+(15.012), (I-302)+(3.006)+(15.016), (I-302)+(3.006)+(15.025), (I-302)+(3.006)+(15.027), (I-302)+(3.006)+(15.047), (I-302)+(3.006)+(15.063), (I-302)+(3.006)+(15.064), (I-302)+(3.006)+(16.001), (I-302)+(3.006)+(16.002), (I-302)+(3.006)+(16.003), (I-302)+(3.006)+(16.004), (I-302)+(3.006)+(16.005), (I-302)+(3.006)+(16.006), (I-302)+(3.006)+(16.007), (I-302)+(3.006)+(16.008), (I-302)+(3.006)+(17.001), (I-302)+(3.006)+(17.002), (I-302)+(3.006)+(17.003), (I-302)+(3.006)+(17.004), (I-302)+(3.006)+(17.005), (I-302)+(3.006)+(17.006), (I-302)+(3.006)+(17.007), (I-302)+(3.006)+(17.008), (I-302)+(3.006)+(17.009), (I-302)+(3.006)+(17.010), (I-302)+(3.006)+(17.011), (I-302)+(3.006)+(17.012), (I-302)+(3.006)+(18.001), (I-302)+(3.007)+(3.025), (I-302)+(3.007)+(3.030), (I-302)+(3.007)+(3.031), (I-302)+(3.007)+(5.001), (I-302)+(3.007)+(5.002), (I-302)+(3.007)+(5.003), (I-302)+(3.007)+(5.004), (I-302)+(3.007)+(5.005), (I-302)+(3.007)+(5.006), (I-302)+(3.007)+(5.007), (I-302)+(3.007)+(5.008), (I-302)+(3.007)+(5.009), (I-302)+(3.007)+(5.010), (I-302)+(3.007)+(5.011), (I-302)+(3.007)+(5.012), (I-302)+(3.007)+(5.013), (I-302)+(3.007)+(5.014), (I-302)+(3.007)+(5.015), (I-302)+(3.007)+(5.016), (I-302)+(3.007)+(5.017), (I-302)+(3.007)+(5.018), (I-302)+(3.007)+(5.019), (I-302)+(3.007)+(5.020), (I-302)+(3.007)+(5.021), (I-302)+(3.007)+(5.022), (I-302)+(3.007)+(5.023), (I-302)+(3.007)+(6.001), (I-302)+(3.007)+(6.002), (I-302)+(3.007)+(6.003), (I-302)+(3.007)+(6.004), (I-302)+(3.007)+(7.001), (I-302)+(3.007)+(7.002), (I-302)+(3.007)+(7.003), (I-302)+(3.007)+(7.004), (I-302)+(3.007)+(7.005), (I-302)+(3.007)+(7.006), (I-302)+(3.007)+(9.001), (I-302)+(3.007)+(9.002), (I-302)+(3.007)+(9.003), (I-302)+(3.007)+(9.004), (I-302)+(3.007)+(9.005), (I-302)+(3.007)+(9.006), (I-302)+(3.007)+(9.007), (I-302)+(3.007)+(9.008), (I-302)+(3.007)+(9.009), (I-302)+(3.007)+(14.001), (I-302)+(3.007)+(14.002), (I-302)+(3.007)+(15.008), (I-302)+(3.007)+(15.011), (I-302)+(3.007)+(15.012), (I-302)+(3.007)+(15.016), (I-302)+(3.007)+(15.025), (I-302)+(3.007)+(15.027), (I-302)+(3.007)+(15.047), (I-302)+(3.007)+(15.063), (I-302)+(3.007)+(15.064), (I-302)+(3.007)+(16.001), (I-302)+(3.007)+(16.002), (I-302)+(3.007)+(16.003), (I-302)+(3.007)+(16.004), (I-302)+(3.007)+(16.005), (I-302)+(3.007)+(16.006), (I-302)+(3.007)+(16.007), (I-302)+(3.007)+(16.008), (I-302)+(3.007)+(17.001), (I-302)+(3.007)+(17.002), (I-302)+(3.007)+(17.003), (I-302)+(3.007)+(17.004), (I-302)+(3.007)+(17.005), (I-302)+(3.007)+(17.006), (I-302)+(3.007)+(17.007), (I-302)+(3.007)+(17.008), (I-302)+(3.007)+(17.009), (I-302)+(3.007)+(17.010), (I-302)+(3.007)+(17.011), (I-302)+(3.007)+(17.012), (I-302)+(3.007)+(18.001), (I-302)+(3.008)+(3.025), (I-302)+(3.008)+(3.030), (I-302)+(3.008)+(3.031), (I-302)+(3.008)+(5.001), (I-302)+(3.008)+(5.002), (I-302)+(3.008)+(5.003), (I-302)+(3.008)+(5.004), (I-302)+(3.008)+(5.005), (I-302)+(3.008)+(5.006), (I-302)+(3.008)+(5.007), (I-302)+(3.008)+(5.008), (I-302)+(3.008)+(5.009), (I-302)+(3.008)+(5.010), (I-302)+(3.008)+(5.011), (I-302)+(3.008)+(5.012), (I-302)+(3.008)+(5.013), (I-302)+(3.008)+(5.014), (I-302)+(3.008)+(5.015), (I-302)+(3.008)+(5.016), (I-302)+(3.008)+(5.017), (I-302)+(3.008)+(5.018), (I-302)+(3.008)+(5.019), (I-302)+(3.008)+(5.020), (I-302)+(3.008)+(5.021), (I-302)+(3.008)+(5.022), (I-302)+(3.008)+(5.023), (I-302)+(3.008)+(6.001), (I-302)+(3.008)+(6.002), (I-302)+(3.008)+(6.003), (I-302)+(3.008)+(6.004), (I-302)+(3.008)+(7.001), (I-302)+(3.008)+(7.002), (I-302)+(3.008)+(7.003), (I-302)+(3.008)+(7.004), (I-302)+(3.008)+(7.005), (I-302)+(3.008)+(7.006), (I-302)+(3.008)+(9.001), (I-302)+(3.008)+(9.002), (I-302)+(3.008)+(9.003), (I-302)+(3.008)+(9.004), (I-302)+(3.008)+(9.005), (I-302)+(3.008)+(9.006), (I-302)+(3.008)+(9.007), (I-302)+(3.008)+(9.008), (I-302)+(3.008)+(9.009), (I-302)+(3.008)+(14.001), (I-302)+(3.008)+(14.002), (I-302)+(3.008)+(15.008), (I-302)+(3.008)+(15.011), (I-302)+(3.008)+(15.012), (I-302)+(3.008)+(15.016), (I-302)+(3.008)+(15.025), (I-302)+(3.008)+(15.027), (I-302)+(3.008)+(15.047), (I-302)+(3.008)+(15.063), (I-302)+(3.008)+(15.064), (I-302)+(3.008)+(16.001), (I-302)+(3.008)+(16.002), (I-302)+(3.008)+(16.003), (I-302)+(3.008)+(16.004), (I-302)+(3.008)+(16.005), (I-302)+(3.008)+(16.006), (I-302)+(3.008)+(16.007), (I-302)+(3.008)+(16.008), (I-302)+(3.008)+(17.001), (I-302)+(3.008)+(17.002), (I-302)+(3.008)+(17.003), (I-302)+(3.008)+(17.004), (I-302)+(3.008)+(17.005), (I-302)+(3.008)+(17.006), (I-302)+(3.008)+(17.007), (I-302)+(3.008)+(17.008), (I-302)+(3.008)+(17.009), (I-302)+(3.008)+(17.010), (I-302)+(3.008)+(17.011), (I-302)+(3.008)+(17.012), (I-302)+(3.008)+(18.001), (I-302)+(3.009)+(3.025), (I-302)+(3.009)+(3.030), (I-302)+(3.009)+(3.031), (I-302)+(3.009)+(5.001), (I-302)+(3.009)+(5.002), (I-302)+(3.009)+(5.003), (I-302)+(3.009)+(5.004), (I-302)+(3.009)+(5.005), (I-302)+(3.009)+(5.006), (I-302)+(3.009)+(5.007), (I-302)+(3.009)+(5.008), (I-302)+(3.009)+(5.009), (I-302)+(3.009)+(5.010), (I-302)+(3.009)+(5.011), (I-302)+(3.009)+(5.012), (I-302)+(3.009)+(5.013), (I-302)+(3.009)+(5.014), (I-302)+(3.009)+(5.015), (I-302)+(3.009)+(5.016), (I-302)+(3.009)+(5.017), (I-302)+(3.009)+(5.018), (I-302)+(3.009)+(5.019), (I-302)+(3.009)+(5.020), (I-302)+(3.009)+(5.021), (I-302)+(3.009)+(5.022), (I-302)+(3.009)+(5.023), (I-302)+(3.009)+(6.001), (I-302)+(3.009)+(6.002), (I-302)+(3.009)+(6.003), (I-302)+(3.009)+(6.004), (I-302)+(3.009)+(7.001), (I-302)+(3.009)+(7.002), (I-302)+(3.009)+(7.003), (I-302)+(3.009)+(7.004), (I-302)+(3.009)+(7.005), (I-302)+(3.009)+(7.006), (I-302)+(3.009)+(9.001), (I-302)+(3.009)+(9.002), (I-302)+(3.009)+(9.003), (I-302)+(3.009)+(9.004), (I-302)+(3.009)+(9.005), (I-302)+(3.009)+(9.006), (I-302)+(3.009)+(9.007), (I-302)+(3.009)+(9.008), (I-302)+(3.009)+(9.009), (I-302)+(3.009)+(14.001), (I-302)+(3.009)+(14.002), (I-302)+(3.009)+(15.008), (I-302)+(3.009)+(15.011), (I-302)+(3.009)+(15.012), (I-302)+(3.009)+(15.016), (I-302)+(3.009)+(15.025), (I-302)+(3.009)+(15.027), (I-302)+(3.009)+(15.047), (I-302)+(3.009)+(15.063), (I-302)+(3.009)+(15.064), (I-302)+(3.009)+(16.001), (I-302)+(3.009)+(16.002), (I-302)+(3.009)+(16.003), (I-302)+(3.009)+(16.004), (I-302)+(3.009)+(16.005), (I-302)+(3.009)+(16.006), (I-302)+(3.009)+(16.007), (I-302)+(3.009)+(16.008), (I-302)+(3.009)+(17.001), (I-302)+(3.009)+(17.002), (I-302)+(3.009)+(17.003), (I-302)+(3.009)+(17.004), (I-302)+(3.009)+(17.005), (I-302)+(3.009)+(17.006), (I-302)+(3.009)+(17.007), (I-302)+(3.009)+(17.008), (I-302)+(3.009)+(17.009), (I-302)+(3.009)+(17.010), (I-302)+(3.009)+(17.011), (I-302)+(3.009)+(17.012), (I-302)+(3.009)+(18.001), (I-302)+(3.010)+(3.025), (I-302)+(3.010)+(3.030), (I-302)+(3.010)+(3.031), (I-302)+(3.010)+(5.001), (I-302)+(3.010)+(5.002), (I-302)+(3.010)+(5.003), (I-302)+(3.010)+(5.004), (I-302)+(3.010)+(5.005), (I-302)+(3.010)+(5.006), (I-302)+(3.010)+(5.007), (I-302)+(3.010)+(5.008), (I-302)+(3.010)+(5.009), (I-302)+(3.010)+(5.010), (I-302)+(3.010)+(5.011), (I-302)+(3.010)+(5.012), (I-302)+(3.010)+(5.013), (I-302)+(3.010)+(5.014), (I-302)+(3.010)+(5.015), (I-302)+(3.010)+(5.016), (I-302)+(3.010)+(5.017), (I-302)+(3.010)+(5.018), (I-302)+(3.010)+(5.019), (I-302)+(3.010)+(5.020), (I-302)+(3.010)+(5.021), (I-302)+(3.010)+(5.022), (I-302)+(3.010)+(5.023), (I-302)+(3.010)+(6.001), (I-302)+(3.010)+(6.002), (I-302)+(3.010)+(6.003), (I-302)+(3.010)+(6.004), (I-302)+(3.010)+(7.001), (I-302)+(3.010)+(7.002), (I-302)+(3.010)+(7.003), (I-302)+(3.010)+(7.004), (I-302)+(3.010)+(7.005), (I-302)+(3.010)+(7.006), (I-302)+(3.010)+(9.001), (I-302)+(3.010)+(9.002), (I-302)+(3.010)+(9.003), (I-302)+(3.010)+(9.004), (I-302)+(3.010)+(9.005), (I-302)+(3.010)+(9.006), (I-302)+(3.010)+(9.007), (I-302)+(3.010)+(9.008), (I-302)+(3.010)+(9.009), (I-302)+(3.010)+(14.001), (I-302)+(3.010)+(14.002), (I-302)+(3.010)+(15.008), (I-302)+(3.010)+(15.011), (I-302)+(3.010)+(15.012), (I-302)+(3.010)+(15.016), (I-302)+(3.010)+(15.025), (I-302)+(3.010)+(15.027), (I-302)+(3.010)+(15.047), (I-302)+(3.010)+(15.063), (I-302)+(3.010)+(15.064), (I-302)+(3.010)+(16.001), (I-302)+(3.010)+(16.002), (I-302)+(3.010)+(16.003), (I-302)+(3.010)+(16.004), (I-302)+(3.010)+(16.005), (I-302)+(3.010)+(16.006), (I-302)+(3.010)+(16.007), (I-302)+(3.010)+(16.008), (I-302)+(3.010)+(17.001), (I-302)+(3.010)+(17.002), (I-302)+(3.010)+(17.003), (I-302)+(3.010)+(17.004), (I-302)+(3.010)+(17.005), (I-302)+(3.010)+(17.006), (I-302)+(3.010)+(17.007), (I-302)+(3.010)+(17.008), (I-302)+(3.010)+(17.009), (I-302)+(3.010)+(17.010), (I-302)+(3.010)+(17.011), (I-302)+(3.010)+(17.012), (I-302)+(3.010)+(18.001), (I-302)+(3.011)+(3.025), (I-302)+(3.011)+(3.030), (I-302)+(3.011)+(3.031), (I-302)+(3.011)+(5.001), (I-302)+(3.011)+(5.002), (I-302)+(3.011)+(5.003), (I-302)+(3.011)+(5.004), (I-302)+(3.011)+(5.005), (I-302)+(3.011)+(5.006), (I-302)+(3.011)+(5.007), (I-302)+(3.011)+(5.008), (I-302)+(3.011)+(5.009), (I-302)+(3.011)+(5.010), (I-302)+(3.011)+(5.011), (I-302)+(3.011)+(5.012), (I-302)+(3.011)+(5.013), (I-302)+(3.011)+(5.014), (I-302)+(3.011)+(5.015), (I-302)+(3.011)+(5.016), (I-302)+(3.011)+(5.017), (I-302)+(3.011)+(5.018), (I-302)+(3.011)+(5.019), (I-302)+(3.011)+(5.020), (I-302)+(3.011)+(5.021), (I-302)+(3.011)+(5.022), (I-302)+(3.011)+(5.023), (I-302)+(3.011)+(6.001), (I-302)+(3.011)+(6.002), (I-302)+(3.011)+(6.003), (I-302)+(3.011)+(6.004), (I-302)+(3.011)+(7.001), (I-302)+(3.011)+(7.002), (I-302)+(3.011)+(7.003), (I-302)+(3.011)+(7.004), (I-302)+(3.011)+(7.005), (I-302)+(3.011)+(7.006), (I-302)+(3.011)+(9.001), (I-302)+(3.011)+(9.002), (I-302)+(3.011)+(9.003), (I-302)+(3.011)+(9.004), (I-302)+(3.011)+(9.005), (I-302)+(3.011)+(9.006), (I-302)+(3.011)+(9.007), (I-302)+(3.011)+(9.008), (I-302)+(3.011)+(9.009), (I-302)+(3.011)+(14.001), (I-302)+(3.011)+(14.002), (I-302)+(3.011)+(15.008), (I-302)+(3.011)+(15.011), (I-302)+(3.011)+(15.012), (I-302)+(3.011)+(15.016), (I-302)+(3.011)+(15.025), (I-302)+(3.011)+(15.027), (I-302)+(3.011)+(15.047), (I-302)+(3.011)+(15.063), (I-302)+(3.011)+(15.064), (I-302)+(3.011)+(16.001), (I-302)+(3.011)+(16.002), (I-302)+(3.011)+(16.003), (I-302)+(3.011)+(16.004), (I-302)+(3.011)+(16.005), (I-302)+(3.011)+(16.006), (I-302)+(3.011)+(16.007), (I-302)+(3.011)+(16.008), (I-302)+(3.011)+(17.001), (I-302)+(3.011)+(17.002), (I-302)+(3.011)+(17.003), (I-302)+(3.011)+(17.004), (I-302)+(3.011)+(17.005), (I-302)+(3.011)+(17.006), (I-302)+(3.011)+(17.007), (I-302)+(3.011)+(17.008), (I-302)+(3.011)+(17.009), (I-302)+(3.011)+(17.010), (I-302)+(3.011)+(17.011), (I-302)+(3.011)+(17.012), (I-302)+(3.011)+(18.001), (I-302)+(3.012)+(3.025), (I-302)+(3.012)+(3.030), (I-302)+(3.012)+(3.031), (I-302)+(3.012)+(5.001), (I-302)+(3.012)+(5.002), (I-302)+(3.012)+(5.003), (I-302)+(3.012)+(5.004), (I-302)+(3.012)+(5.005), (I-302)+(3.012)+(5.006), (I-302)+(3.012)+(5.007), (I-302)+(3.012)+(5.008), (I-302)+(3.012)+(5.009), (I-302)+(3.012)+(5.010), (I-302)+(3.012)+(5.011), (I-302)+(3.012)+(5.012), (I-302)+(3.012)+(5.013), (I-302)+(3.012)+(5.014), (I-302)+(3.012)+(5.015), (I-302)+(3.012)+(5.016), (I-302)+(3.012)+(5.017), (I-302)+(3.012)+(5.018), (I-302)+(3.012)+(5.019), (I-302)+(3.012)+(5.020), (I-302)+(3.012)+(5.021), (I-302)+(3.012)+(5.022), (I-302)+(3.012)+(5.023), (I-302)+(3.012)+(6.001), (I-302)+(3.012)+(6.002), (I-302)+(3.012)+(6.003), (I-302)+(3.012)+(6.004), (I-302)+(3.012)+(7.001), (I-302)+(3.012)+(7.002), (I-302)+(3.012)+(7.003), (I-302)+(3.012)+(7.004), (I-302)+(3.012)+(7.005), (I-302)+(3.012)+(7.006), (I-302)+(3.012)+(9.001), (I-302)+(3.012)+(9.002), (I-302)+(3.012)+(9.003), (I-302)+(3.012)+(9.004), (I-302)+(3.012)+(9.005), (I-302)+(3.012)+(9.006), (I-302)+(3.012)+(9.007), (I-302)+(3.012)+(9.008), (I-302)+(3.012)+(9.009), (I-302)+(3.012)+(14.001), (I-302)+(3.012)+(14.002), (I-302)+(3.012)+(15.008), (I-302)+(3.012)+(15.011), (I-302)+(3.012)+(15.012), (I-302)+(3.012)+(15.016), (I-302)+(3.012)+(15.025), (I-302)+(3.012)+(15.027), (I-302)+(3.012)+(15.047), (I-302)+(3.012)+(15.063), (I-302)+(3.012)+(15.064), (I-302)+(3.012)+(16.001), (I-302)+(3.012)+(16.002), (I-302)+(3.012)+(16.003), (I-302)+(3.012)+(16.004), (I-302)+(3.012)+(16.005), (I-302)+(3.012)+(16.006), (I-302)+(3.012)+(16.007), (I-302)+(3.012)+(16.008), (I-302)+(3.012)+(17.001), (I-302)+(3.012)+(17.002), (I-302)+(3.012)+(17.003), (I-302)+(3.012)+(17.004), (I-302)+(3.012)+(17.005), (I-302)+(3.012)+(17.006), (I-302)+(3.012)+(17.007), (I-302)+(3.012)+(17.008), (I-302)+(3.012)+(17.009), (I-302)+(3.012)+(17.010), (I-302)+(3.012)+(17.011), (I-302)+(3.012)+(17.012), (I-302)+(3.012)+(18.001), (I-302)+(3.013)+(3.025), (I-302)+(3.013)+(3.030), (I-302)+(3.013)+(3.031), (I-302)+(3.013)+(5.001), (I-302)+(3.013)+(5.002), (I-302)+(3.013)+(5.003), (I-302)+(3.013)+(5.004), (I-302)+(3.013)+(5.005), (I-302)+(3.013)+(5.006), (I-302)+(3.013)+(5.007), (I-302)+(3.013)+(5.008), (I-302)+(3.013)+(5.009), (I-302)+(3.013)+(5.010), (I-302)+(3.013)+(5.011), (I-302)+(3.013)+(5.012), (I-302)+(3.013)+(5.013), (I-302)+(3.013)+(5.014), (I-302)+(3.013)+(5.015), (I-302)+(3.013)+(5.016), (I-302)+(3.013)+(5.017), (I-302)+(3.013)+(5.018), (I-302)+(3.013)+(5.019), (I-302)+(3.013)+(5.020), (I-302)+(3.013)+(5.021), (I-302)+(3.013)+(5.022), (I-302)+(3.013)+(5.023), (I-302)+(3.013)+(6.001), (I-302)+(3.013)+(6.002), (I-302)+(3.013)+(6.003), (I-302)+(3.013)+(6.004), (I-302)+(3.013)+(7.001), (I-302)+(3.013)+(7.002), (I-302)+(3.013)+(7.003), (I-302)+(3.013)+(7.004), (I-302)+(3.013)+(7.005), (I-302)+(3.013)+(7.006), (I-302)+(3.013)+(9.001), (I-302)+(3.013)+(9.002), (I-302)+(3.013)+(9.003), (I-302)+(3.013)+(9.004), (I-302)+(3.013)+(9.005), (I-302)+(3.013)+(9.006), (I-302)+(3.013)+(9.007), (I-302)+(3.013)+(9.008), (I-302)+(3.013)+(9.009), (I-302)+(3.013)+(14.001), (I-302)+(3.013)+(14.002), (I-302)+(3.013)+(15.008), (I-302)+(3.013)+(15.011), (I-302)+(3.013)+(15.012), (I-302)+(3.013)+(15.016), (I-302)+(3.013)+(15.025), (I-302)+(3.013)+(15.027), (I-302)+(3.013)+(15.047), (I-302)+(3.013)+(15.063), (I-302)+(3.013)+(15.064), (I-302)+(3.013)+(16.001), (I-302)+(3.013)+(16.002), (I-302)+(3.013)+(16.003), (I-302)+(3.013)+(16.004), (I-302)+(3.013)+(16.005), (I-302)+(3.013)+(16.006), (I-302)+(3.013)+(16.007), (I-302)+(3.013)+(16.008), (I-302)+(3.013)+(17.001), (I-302)+(3.013)+(17.002), (I-302)+(3.013)+(17.003), (I-302)+(3.013)+(17.004), (I-302)+(3.013)+(17.005), (I-302)+(3.013)+(17.006), (I-302)+(3.013)+(17.007), (I-302)+(3.013)+(17.008), (I-302)+(3.013)+(17.009), (I-302)+(3.013)+(17.010), (I-302)+(3.013)+(17.011), (I-302)+(3.013)+(17.012), (I-302)+(3.013)+(18.001), (I-302)+(3.014)+(3.025), (I-302)+(3.014)+(3.030), (I-302)+(3.014)+(3.031), (I-302)+(3.014)+(5.001), (I-302)+(3.014)+(5.002), (I-302)+(3.014)+(5.003), (I-302)+(3.014)+(5.004), (I-302)+(3.014)+(5.005), (I-302)+(3.014)+(5.006), (I-302)+(3.014)+(5.007), (I-302)+(3.014)+(5.008), (I-302)+(3.014)+(5.009), (I-302)+(3.014)+(5.010), (I-302)+(3.014)+(5.011), (I-302)+(3.014)+(5.012), (I-302)+(3.014)+(5.013), (I-302)+(3.014)+(5.014), (I-302)+(3.014)+(5.015), (I-302)+(3.014)+(5.016), (I-302)+(3.014)+(5.017), (I-302)+(3.014)+(5.018), (I-302)+(3.014)+(5.019), (I-302)+(3.014)+(5.020), (I-302)+(3.014)+(5.021), (I-302)+(3.014)+(5.022), (I-302)+(3.014)+(5.023), (I-302)+(3.014)+(6.001), (I-302)+(3.014)+(6.002), (I-302)+(3.014)+(6.003), (I-302)+(3.014)+(6.004), (I-302)+(3.014)+(7.001), (I-302)+(3.014)+(7.002), (I-302)+(3.014)+(7.003), (I-302)+(3.014)+(7.004), (I-302)+(3.014)+(7.005), (I-302)+(3.014)+(7.006), (I-302)+(3.014)+(9.001), (I-302)+(3.014)+(9.002), (I-302)+(3.014)+(9.003), (I-302)+(3.014)+(9.004), (I-302)+(3.014)+(9.005), (I-302)+(3.014)+(9.006), (I-302)+(3.014)+(9.007), (I-302)+(3.014)+(9.008), (I-302)+(3.014)+(9.009), (I-302)+(3.014)+(14.001), (I-302)+(3.014)+(14.002), (I-302)+(3.014)+(15.008), (I-302)+(3.014)+(15.011), (I-302)+(3.014)+(15.012), (I-302)+(3.014)+(15.016), (I-302)+(3.014)+(15.025), (I-302)+(3.014)+(15.027), (I-302)+(3.014)+(15.047), (I-302)+(3.014)+(15.063), (I-302)+(3.014)+(15.064), (I-302)+(3.014)+(16.001), (I-302)+(3.014)+(16.002), (I-302)+(3.014)+(16.003), (I-302)+(3.014)+(16.004), (I-302)+(3.014)+(16.005), (I-302)+(3.014)+(16.006), (I-302)+(3.014)+(16.007), (I-302)+(3.014)+(16.008), (I-302)+(3.014)+(17.001), (I-302)+(3.014)+(17.002), (I-302)+(3.014)+(17.003), (I-302)+(3.014)+(17.004), (I-302)+(3.014)+(17.005), (I-302)+(3.014)+(17.006), (I-302)+(3.014)+(17.007), (I-302)+(3.014)+(17.008), (I-302)+(3.014)+(17.009), (I-302)+(3.014)+(17.010), (I-302)+(3.014)+(17.011), (I-302)+(3.014)+(17.012), (I-302)+(3.014)+(18.001), (I-302)+(3.015)+(3.025), (I-302)+(3.015)+(3.030), (I-302)+(3.015)+(3.031), (I-302)+(3.015)+(5.001), (I-302)+(3.015)+(5.002), (I-302)+(3.015)+(5.003), (I-302)+(3.015)+(5.004), (I-302)+(3.015)+(5.005), (I-302)+(3.015)+(5.006), (I-302)+(3.015)+(5.007), (I-302)+(3.015)+(5.008), (I-302)+(3.015)+(5.009), (I-302)+(3.015)+(5.010), (I-302)+(3.015)+(5.011), (I-302)+(3.015)+(5.012), (I-302)+(3.015)+(5.013), (I-302)+(3.015)+(5.014), (I-302)+(3.015)+(5.015), (I-302)+(3.015)+(5.016), (I-302)+(3.015)+(5.017), (I-302)+(3.015)+(5.018), (I-302)+(3.015)+(5.019), (I-302)+(3.015)+(5.020), (I-302)+(3.015)+(5.021), (I-302)+(3.015)+(5.022), (I-302)+(3.015)+(5.023), (I-302)+(3.015)+(6.001), (I-302)+(3.015)+(6.002), (I-302)+(3.015)+(6.003), (I-302)+(3.015)+(6.004), (I-302)+(3.015)+(7.001), (I-302)+(3.015)+(7.002), (I-302)+(3.015)+(7.003), (I-302)+(3.015)+(7.004), (I-302)+(3.015)+(7.005), (I-302)+(3.015)+(7.006), (I-302)+(3.015)+(9.001), (I-302)+(3.015)+(9.002), (I-302)+(3.015)+(9.003), (I-302)+(3.015)+(9.004), (I-302)+(3.015)+(9.005), (I-302)+(3.015)+(9.006), (I-302)+(3.015)+(9.007), (I-302)+(3.015)+(9.008), (I-302)+(3.015)+(9.009), (I-302)+(3.015)+(14.001), (I-302)+(3.015)+(14.002), (I-302)+(3.015)+(15.008), (I-302)+(3.015)+(15.011), (I-302)+(3.015)+(15.012), (I-302)+(3.015)+(15.016), (I-302)+(3.015)+(15.025), (I-302)+(3.015)+(15.027), (I-302)+(3.015)+(15.047), (I-302)+(3.015)+(15.063), (I-302)+(3.015)+(15.064), (I-302)+(3.015)+(16.001), (I-302)+(3.015)+(16.002), (I-302)+(3.015)+(16.003), (I-302)+(3.015)+(16.004), (I-302)+(3.015)+(16.005), (I-302)+(3.015)+(16.006), (I-302)+(3.015)+(16.007), (I-302)+(3.015)+(16.008), (I-302)+(3.015)+(17.001), (I-302)+(3.015)+(17.002), (I-302)+(3.015)+(17.003), (I-302)+(3.015)+(17.004), (I-302)+(3.015)+(17.005), (I-302)+(3.015)+(17.006), (I-302)+(3.015)+(17.007), (I-302)+(3.015)+(17.008), (I-302)+(3.015)+(17.009), (I-302)+(3.015)+(17.010), (I-302)+(3.015)+(17.011), (I-302)+(3.015)+(17.012), (I-302)+(3.015)+(18.001), (I-302)+(3.016)+(3.025), (I-302)+(3.016)+(3.030), (I-302)+(3.016)+(3.031), (I-302)+(3.016)+(5.001), (I-302)+(3.016)+(5.002), (I-302)+(3.016)+(5.003), (I-302)+(3.016)+(5.004), (I-302)+(3.016)+(5.005), (I-302)+(3.016)+(5.006), (I-302)+(3.016)+(5.007), (I-302)+(3.016)+(5.008), (I-302)+(3.016)+(5.009), (I-302)+(3.016)+(5.010), (I-302)+(3.016)+(5.011), (I-302)+(3.016)+(5.012), (I-302)+(3.016)+(5.013), (I-302)+(3.016)+(5.014), (I-302)+(3.016)+(5.015), (I-302)+(3.016)+(5.016), (I-302)+(3.016)+(5.017), (I-302)+(3.016)+(5.018), (I-302)+(3.016)+(5.019), (I-302)+(3.016)+(5.020), (I-302)+(3.016)+(5.021), (I-302)+(3.016)+(5.022), (I-302)+(3.016)+(5.023), (I-302)+(3.016)+(6.001), (I-302)+(3.016)+(6.002), (I-302)+(3.016)+(6.003), (I-302)+(3.016)+(6.004), (I-302)+(3.016)+(7.001), (I-302)+(3.016)+(7.002), (I-302)+(3.016)+(7.003), (I-302)+(3.016)+(7.004), (I-302)+(3.016)+(7.005), (I-302)+(3.016)+(7.006), (I-302)+(3.016)+(9.001), (I-302)+(3.016)+(9.002), (I-302)+(3.016)+(9.003), (I-302)+(3.016)+(9.004), (I-302)+(3.016)+(9.005), (I-302)+(3.016)+(9.006), (I-302)+(3.016)+(9.007), (I-302)+(3.016)+(9.008), (I-302)+(3.016)+(9.009), (I-302)+(3.016)+(14.001), (I-302)+(3.016)+(14.002), (I-302)+(3.016)+(15.008), (I-302)+(3.016)+(15.011), (I-302)+(3.016)+(15.012), (I-302)+(3.016)+(15.016), (I-302)+(3.016)+(15.025), (I-302)+(3.016)+(15.027), (I-302)+(3.016)+(15.047), (I-302)+(3.016)+(15.063), (I-302)+(3.016)+(15.064), (I-302)+(3.016)+(16.001), (I-302)+(3.016)+(16.002), (I-302)+(3.016)+(16.003), (I-302)+(3.016)+(16.004), (I-302)+(3.016)+(16.005), (I-302)+(3.016)+(16.006), (I-302)+(3.016)+(16.007), (I-302)+(3.016)+(16.008), (I-302)+(3.016)+(17.001), (I-302)+(3.016)+(17.002), (I-302)+(3.016)+(17.003), (I-302)+(3.016)+(17.004), (I-302)+(3.016)+(17.005), (I-302)+(3.016)+(17.006), (I-302)+(3.016)+(17.007), (I-302)+(3.016)+(17.008), (I-302)+(3.016)+(17.009), (I-302)+(3.016)+(17.010), (I-302)+(3.016)+(17.011), (I-302)+(3.016)+(17.012), (I-302)+(3.016)+(18.001), (I-302)+(3.017)+(3.025), (I-302)+(3.017)+(3.030), (I-302)+(3.017)+(3.031), (I-302)+(3.017)+(5.001), (I-302)+(3.017)+(5.002), (I-302)+(3.017)+(5.003), (I-302)+(3.017)+(5.004), (I-302)+(3.017)+(5.005), (I-302)+(3.017)+(5.006), (I-302)+(3.017)+(5.007), (I-302)+(3.017)+(5.008), (I-302)+(3.017)+(5.009), (I-302)+(3.017)+(5.010), (I-302)+(3.017)+(5.011), (I-302)+(3.017)+(5.012), (I-302)+(3.017)+(5.013), (I-302)+(3.017)+(5.014), (I-302)+(3.017)+(5.015), (I-302)+(3.017)+(5.016), (I-302)+(3.017)+(5.017), (I-302)+(3.017)+(5.018), (I-302)+(3.017)+(5.019), (I-302)+(3.017)+(5.020), (I-302)+(3.017)+(5.021), (I-302)+(3.017)+(5.022), (I-302)+(3.017)+(5.023), (I-302)+(3.017)+(6.001), (I-302)+(3.017)+(6.002), (I-302)+(3.017)+(6.003), (I-302)+(3.017)+(6.004), (I-302)+(3.017)+(7.001), (I-302)+(3.017)+(7.002), (I-302)+(3.017)+(7.003), (I-302)+(3.017)+(7.004), (I-302)+(3.017)+(7.005), (I-302)+(3.017)+(7.006), (I-302)+(3.017)+(9.001), (I-302)+(3.017)+(9.002), (I-302)+(3.017)+(9.003), (I-302)+(3.017)+(9.004), (I-302)+(3.017)+(9.005), (I-302)+(3.017)+(9.006), (I-302)+(3.017)+(9.007), (I-302)+(3.017)+(9.008), (I-302)+(3.017)+(9.009), (I-302)+(3.017)+(14.001), (I-302)+(3.017)+(14.002), (I-302)+(3.017)+(15.008), (I-302)+(3.017)+(15.011), (I-302)+(3.017)+(15.012), (I-302)+(3.017)+(15.016), (I-302)+(3.017)+(15.025), (I-302)+(3.017)+(15.027), (I-302)+(3.017)+(15.047), (I-302)+(3.017)+(15.063), (I-302)+(3.017)+(15.064), (I-302)+(3.017)+(16.001), (I-302)+(3.017)+(16.002), (I-302)+(3.017)+(16.003), (I-302)+(3.017)+(16.004), (I-302)+(3.017)+(16.005), (I-302)+(3.017)+(16.006), (I-302)+(3.017)+(16.007), (I-302)+(3.017)+(16.008), (I-302)+(3.017)+(17.001), (I-302)+(3.017)+(17.002), (I-302)+(3.017)+(17.003), (I-302)+(3.017)+(17.004), (I-302)+(3.017)+(17.005), (I-302)+(3.017)+(17.006), (I-302)+(3.017)+(17.007), (I-302)+(3.017)+(17.008), (I-302)+(3.017)+(17.009), (I-302)+(3.017)+(17.010), (I-302)+(3.017)+(17.011), (I-302)+(3.017)+(17.012), (I-302)+(3.017)+(18.001), (I-302)+(3.018)+(3.025), (I-302)+(3.018)+(3.030), (I-302)+(3.018)+(3.031), (I-302)+(3.018)+(5.001), (I-302)+(3.018)+(5.002), (I-302)+(3.018)+(5.003), (I-302)+(3.018)+(5.004), (I-302)+(3.018)+(5.005), (I-302)+(3.018)+(5.006), (I-302)+(3.018)+(5.007), (I-302)+(3.018)+(5.008), (I-302)+(3.018)+(5.009), (I-302)+(3.018)+(5.010), (I-302)+(3.018)+(5.011), (I-302)+(3.018)+(5.012), (I-302)+(3.018)+(5.013), (I-302)+(3.018)+(5.014), (I-302)+(3.018)+(5.015), (I-302)+(3.018)+(5.016), (I-302)+(3.018)+(5.017), (I-302)+(3.018)+(5.018), (I-302)+(3.018)+(5.019), (I-302)+(3.018)+(5.020), (I-302)+(3.018)+(5.021), (I-302)+(3.018)+(5.022), (I-302)+(3.018)+(5.023), (I-302)+(3.018)+(6.001), (I-302)+(3.018)+(6.002), (I-302)+(3.018)+(6.003), (I-302)+(3.018)+(6.004), (I-302)+(3.018)+(7.001), (I-302)+(3.018)+(7.002), (I-302)+(3.018)+(7.003), (I-302)+(3.018)+(7.004), (I-302)+(3.018)+(7.005), (I-302)+(3.018)+(7.006), (I-302)+(3.018)+(9.001), (I-302)+(3.018)+(9.002), (I-302)+(3.018)+(9.003), (I-302)+(3.018)+(9.004), (I-302)+(3.018)+(9.005), (I-302)+(3.018)+(9.006), (I-302)+(3.018)+(9.007), (I-302)+(3.018)+(9.008), (I-302)+(3.018)+(9.009), (I-302)+(3.018)+(14.001), (I-302)+(3.018)+(14.002), (I-302)+(3.018)+(15.008), (I-302)+(3.018)+(15.011), (I-302)+(3.018)+(15.012), (I-302)+(3.018)+(15.016), (I-302)+(3.018)+(15.025), (I-302)+(3.018)+(15.027), (I-302)+(3.018)+(15.047), (I-302)+(3.018)+(15.063), (I-302)+(3.018)+(15.064), (I-302)+(3.018)+(16.001), (I-302)+(3.018)+(16.002), (I-302)+(3.018)+(16.003), (I-302)+(3.018)+(16.004), (I-302)+(3.018)+(16.005), (I-302)+(3.018)+(16.006), (I-302)+(3.018)+(16.007), (I-302)+(3.018)+(16.008), (I-302)+(3.018)+(17.001), (I-302)+(3.018)+(17.002), (I-302)+(3.018)+(17.003), (I-302)+(3.018)+(17.004), (I-302)+(3.018)+(17.005), (I-302)+(3.018)+(17.006), (I-302)+(3.018)+(17.007), (I-302)+(3.018)+(17.008), (I-302)+(3.018)+(17.009), (I-302)+(3.018)+(17.010), (I-302)+(3.018)+(17.011), (I-302)+(3.018)+(17.012), (I-302)+(3.018)+(18.001), (I-302)+(3.019)+(3.025), (I-302)+(3.019)+(3.030), (I-302)+(3.019)+(3.031), (I-302)+(3.019)+(5.001), (I-302)+(3.019)+(5.002), (I-302)+(3.019)+(5.003), (I-302)+(3.019)+(5.004), (I-302)+(3.019)+(5.005), (I-302)+(3.019)+(5.006), (I-302)+(3.019)+(5.007), (I-302)+(3.019)+(5.008), (I-302)+(3.019)+(5.009), (I-302)+(3.019)+(5.010), (I-302)+(3.019)+(5.011), (I-302)+(3.019)+(5.012), (I-302)+(3.019)+(5.013), (I-302)+(3.019)+(5.014), (I-302)+(3.019)+(5.015), (I-302)+(3.019)+(5.016), (I-302)+(3.019)+(5.017), (I-302)+(3.019)+(5.018), (I-302)+(3.019)+(5.019), (I-302)+(3.019)+(5.020), (I-302)+(3.019)+(5.021), (I-302)+(3.019)+(5.022), (I-302)+(3.019)+(5.023), (I-302)+(3.019)+(6.001), (I-302)+(3.019)+(6.002), (I-302)+(3.019)+(6.003), (I-302)+(3.019)+(6.004), (I-302)+(3.019)+(7.001), (I-302)+(3.019)+(7.002), (I-302)+(3.019)+(7.003), (I-302)+(3.019)+(7.004), (I-302)+(3.019)+(7.005), (I-302)+(3.019)+(7.006), (I-302)+(3.019)+(9.001), (I-302)+(3.019)+(9.002), (I-302)+(3.019)+(9.003), (I-302)+(3.019)+(9.004), (I-302)+(3.019)+(9.005), (I-302)+(3.019)+(9.006), (I-302)+(3.019)+(9.007), (I-302)+(3.019)+(9.008), (I-302)+(3.019)+(9.009), (I-302)+(3.019)+(14.001), (I-302)+(3.019)+(14.002), (I-302)+(3.019)+(15.008), (I-302)+(3.019)+(15.011), (I-302)+(3.019)+(15.012), (I-302)+(3.019)+(15.016), (I-302)+(3.019)+(15.025), (I-302)+(3.019)+(15.027), (I-302)+(3.019)+(15.047), (I-302)+(3.019)+(15.063), (I-302)+(3.019)+(15.064), (I-302)+(3.019)+(16.001), (I-302)+(3.019)+(16.002), (I-302)+(3.019)+(16.003), (I-302)+(3.019)+(16.004), (I-302)+(3.019)+(16.005), (I-302)+(3.019)+(16.006), (I-302)+(3.019)+(16.007), (I-302)+(3.019)+(16.008), (I-302)+(3.019)+(17.001), (I-302)+(3.019)+(17.002), (I-302)+(3.019)+(17.003), (I-302)+(3.019)+(17.004), (I-302)+(3.019)+(17.005), (I-302)+(3.019)+(17.006), (I-302)+(3.019)+(17.007), (I-302)+(3.019)+(17.008), (I-302)+(3.019)+(17.009), (I-302)+(3.019)+(17.010), (I-302)+(3.019)+(17.011), (I-302)+(3.019)+(17.012), (I-302)+(3.019)+(18.001), (I-302)+(3.020)+(3.025), (I-302)+(3.020)+(3.030), (I-302)+(3.020)+(3.031), (I-302)+(3.020)+(5.001), (I-302)+(3.020)+(5.002), (I-302)+(3.020)+(5.003), (I-302)+(3.020)+(5.004), (I-302)+(3.020)+(5.005), (I-302)+(3.020)+(5.006), (I-302)+(3.020)+(5.007), (I-302)+(3.020)+(5.008), (I-302)+(3.020)+(5.009), (I-302)+(3.020)+(5.010), (I-302)+(3.020)+(5.011), (I-302)+(3.020)+(5.012), (I-302)+(3.020)+(5.013), (I-302)+(3.020)+(5.014), (I-302)+(3.020)+(5.015), (I-302)+(3.020)+(5.016), (I-302)+(3.020)+(5.017), (I-302)+(3.020)+(5.018), (I-302)+(3.020)+(5.019), (I-302)+(3.020)+(5.020), (I-302)+(3.020)+(5.021), (I-302)+(3.020)+(5.022), (I-302)+(3.020)+(5.023), (I-302)+(3.020)+(6.001), (I-302)+(3.020)+(6.002), (I-302)+(3.020)+(6.003), (I-302)+(3.020)+(6.004), (I-302)+(3.020)+(7.001), (I-302)+(3.020)+(7.002), (I-302)+(3.020)+(7.003), (I-302)+(3.020)+(7.004), (I-302)+(3.020)+(7.005), (I-302)+(3.020)+(7.006), (I-302)+(3.020)+(9.001), (I-302)+(3.020)+(9.002), (I-302)+(3.020)+(9.003), (I-302)+(3.020)+(9.004), (I-302)+(3.020)+(9.005), (I-302)+(3.020)+(9.006), (I-302)+(3.020)+(9.007), (I-302)+(3.020)+(9.008), (I-302)+(3.020)+(9.009), (I-302)+(3.020)+(14.001), (I-302)+(3.020)+(14.002), (I-302)+(3.020)+(15.008), (I-302)+(3.020)+(15.011), (I-302)+(3.020)+(15.012), (I-302)+(3.020)+(15.016), (I-302)+(3.020)+(15.025), (I-302)+(3.020)+(15.027), (I-302)+(3.020)+(15.047), (I-302)+(3.020)+(15.063), (I-302)+(3.020)+(15.064), (I-302)+(3.020)+(16.001), (I-302)+(3.020)+(16.002), (I-302)+(3.020)+(16.003), (I-302)+(3.020)+(16.004), (I-302)+(3.020)+(16.005), (I-302)+(3.020)+(16.006), (I-302)+(3.020)+(16.007), (I-302)+(3.020)+(16.008), (I-302)+(3.020)+(17.001), (I-302)+(3.020)+(17.002), (I-302)+(3.020)+(17.003), (I-302)+(3.020)+(17.004), (I-302)+(3.020)+(17.005), (I-302)+(3.020)+(17.006), (I-302)+(3.020)+(17.007), (I-302)+(3.020)+(17.008), (I-302)+(3.020)+(17.009), (I-302)+(3.020)+(17.010), (I-302)+(3.020)+(17.011), (I-302)+(3.020)+(17.012), (I-302)+(3.020)+(18.001), (I-302)+(3.021)+(3.025), (I-302)+(3.021)+(3.030), (I-302)+(3.021)+(3.031), (I-302)+(3.021)+(5.001), (I-302)+(3.021)+(5.002), (I-302)+(3.021)+(5.003), (I-302)+(3.021)+(5.004), (I-302)+(3.021)+(5.005), (I-302)+(3.021)+(5.006), (I-302)+(3.021)+(5.007), (I-302)+(3.021)+(5.008), (I-302)+(3.021)+(5.009), (I-302)+(3.021)+(5.010), (I-302)+(3.021)+(5.011), (I-302)+(3.021)+(5.012), (I-302)+(3.021)+(5.013), (I-302)+(3.021)+(5.014), (I-302)+(3.021)+(5.015), (I-302)+(3.021)+(5.016), (I-302)+(3.021)+(5.017), (I-302)+(3.021)+(5.018), (I-302)+(3.021)+(5.019), (I-302)+(3.021)+(5.020), (I-302)+(3.021)+(5.021), (I-302)+(3.021)+(5.022), (I-302)+(3.021)+(5.023), (I-302)+(3.021)+(6.001), (I-302)+(3.021)+(6.002), (I-302)+(3.021)+(6.003), (I-302)+(3.021)+(6.004), (I-302)+(3.021)+(7.001), (I-302)+(3.021)+(7.002), (I-302)+(3.021)+(7.003), (I-302)+(3.021)+(7.004), (I-302)+(3.021)+(7.005), (I-302)+(3.021)+(7.006), (I-302)+(3.021)+(9.001), (I-302)+(3.021)+(9.002), (I-302)+(3.021)+(9.003), (I-302)+(3.021)+(9.004), (I-302)+(3.021)+(9.005), (I-302)+(3.021)+(9.006), (I-302)+(3.021)+(9.007), (I-302)+(3.021)+(9.008), (I-302)+(3.021)+(9.009), (I-302)+(3.021)+(14.001), (I-302)+(3.021)+(14.002), (I-302)+(3.021)+(15.008), (I-302)+(3.021)+(15.011), (I-302)+(3.021)+(15.012), (I-302)+(3.021)+(15.016), (I-302)+(3.021)+(15.025), (I-302)+(3.021)+(15.027), (I-302)+(3.021)+(15.047), (I-302)+(3.021)+(15.063), (I-302)+(3.021)+(15.064), (I-302)+(3.021)+(16.001), (I-302)+(3.021)+(16.002), (I-302)+(3.021)+(16.003), (I-302)+(3.021)+(16.004), (I-302)+(3.021)+(16.005), (I-302)+(3.021)+(16.006), (I-302)+(3.021)+(16.007), (I-302)+(3.021)+(16.008), (I-302)+(3.021)+(17.001), (I-302)+(3.021)+(17.002), (I-302)+(3.021)+(17.003), (I-302)+(3.021)+(17.004), (I-302)+(3.021)+(17.005), (I-302)+(3.021)+(17.006), (I-302)+(3.021)+(17.007), (I-302)+(3.021)+(17.008), (I-302)+(3.021)+(17.009), (I-302)+(3.021)+(17.010), (I-302)+(3.021)+(17.011), (I-302)+(3.021)+(17.012), (I-302)+(3.021)+(18.001), (I-302)+(3.022)+(3.025), (I-302)+(3.022)+(3.030), (I-302)+(3.022)+(3.031), (I-302)+(3.022)+(5.001), (I-302)+(3.022)+(5.002), (I-302)+(3.022)+(5.003), (I-302)+(3.022)+(5.004), (I-302)+(3.022)+(5.005), (I-302)+(3.022)+(5.006), (I-302)+(3.022)+(5.007), (I-302)+(3.022)+(5.008), (I-302)+(3.022)+(5.009), (I-302)+(3.022)+(5.010), (I-302)+(3.022)+(5.011), (I-302)+(3.022)+(5.012), (I-302)+(3.022)+(5.013), (I-302)+(3.022)+(5.014), (I-302)+(3.022)+(5.015), (I-302)+(3.022)+(5.016), (I-302)+(3.022)+(5.017), (I-302)+(3.022)+(5.018), (I-302)+(3.022)+(5.019), (I-302)+(3.022)+(5.020), (I-302)+(3.022)+(5.021), (I-302)+(3.022)+(5.022), (I-302)+(3.022)+(5.023), (I-302)+(3.022)+(6.001), (I-302)+(3.022)+(6.002), (I-302)+(3.022)+(6.003), (I-302)+(3.022)+(6.004), (I-302)+(3.022)+(7.001), (I-302)+(3.022)+(7.002), (I-302)+(3.022)+(7.003), (I-302)+(3.022)+(7.004), (I-302)+(3.022)+(7.005), (I-302)+(3.022)+(7.006), (I-302)+(3.022)+(9.001), (I-302)+(3.022)+(9.002), (I-302)+(3.022)+(9.003), (I-302)+(3.022)+(9.004), (I-302)+(3.022)+(9.005), (I-302)+(3.022)+(9.006), (I-302)+(3.022)+(9.007), (I-302)+(3.022)+(9.008), (I-302)+(3.022)+(9.009), (I-302)+(3.022)+(14.001), (I-302)+(3.022)+(14.002), (I-302)+(3.022)+(15.008), (I-302)+(3.022)+(15.011), (I-302)+(3.022)+(15.012), (I-302)+(3.022)+(15.016), (I-302)+(3.022)+(15.025), (I-302)+(3.022)+(15.027), (I-302)+(3.022)+(15.047), (I-302)+(3.022)+(15.063), (I-302)+(3.022)+(15.064), (I-302)+(3.022)+(16.001), (I-302)+(3.022)+(16.002), (I-302)+(3.022)+(16.003), (I-302)+(3.022)+(16.004), (I-302)+(3.022)+(16.005), (I-302)+(3.022)+(16.006), (I-302)+(3.022)+(16.007), (I-302)+(3.022)+(16.008), (I-302)+(3.022)+(17.001), (I-302)+(3.022)+(17.002), (I-302)+(3.022)+(17.003), (I-302)+(3.022)+(17.004), (I-302)+(3.022)+(17.005), (I-302)+(3.022)+(17.006), (I-302)+(3.022)+(17.007), (I-302)+(3.022)+(17.008), (I-302)+(3.022)+(17.009), (I-302)+(3.022)+(17.010), (I-302)+(3.022)+(17.011), (I-302)+(3.022)+(17.012), (I-302)+(3.022)+(18.001), (I-302)+(3.023)+(3.025), (I-302)+(3.023)+(3.030), (I-302)+(3.023)+(3.031), (I-302)+(3.023)+(5.001), (I-302)+(3.023)+(5.002), (I-302)+(3.023)+(5.003), (I-302)+(3.023)+(5.004), (I-302)+(3.023)+(5.005), (I-302)+(3.023)+(5.006), (I-302)+(3.023)+(5.007), (I-302)+(3.023)+(5.008), (I-302)+(3.023)+(5.009), (I-302)+(3.023)+(5.010), (I-302)+(3.023)+(5.011), (I-302)+(3.023)+(5.012), (I-302)+(3.023)+(5.013), (I-302)+(3.023)+(5.014), (I-302)+(3.023)+(5.015), (I-302)+(3.023)+(5.016), (I-302)+(3.023)+(5.017), (I-302)+(3.023)+(5.018), (I-302)+(3.023)+(5.019), (I-302)+(3.023)+(5.020), (I-302)+(3.023)+(5.021), (I-302)+(3.023)+(5.022), (I-302)+(3.023)+(5.023), (I-302)+(3.023)+(6.001), (I-302)+(3.023)+(6.002), (I-302)+(3.023)+(6.003), (I-302)+(3.023)+(6.004), (I-302)+(3.023)+(7.001), (I-302)+(3.023)+(7.002), (I-302)+(3.023)+(7.003), (I-302)+(3.023)+(7.004), (I-302)+(3.023)+(7.005), (I-302)+(3.023)+(7.006), (I-302)+(3.023)+(9.001), (I-302)+(3.023)+(9.002), (I-302)+(3.023)+(9.003), (I-302)+(3.023)+(9.004), (I-302)+(3.023)+(9.005), (I-302)+(3.023)+(9.006), (I-302)+(3.023)+(9.007), (I-302)+(3.023)+(9.008), (I-302)+(3.023)+(9.009), (I-302)+(3.023)+(14.001), (I-302)+(3.023)+(14.002), (I-302)+(3.023)+(15.008), (I-302)+(3.023)+(15.011), (I-302)+(3.023)+(15.012), (I-302)+(3.023)+(15.016), (I-302)+(3.023)+(15.025), (I-302)+(3.023)+(15.027), (I-302)+(3.023)+(15.047), (I-302)+(3.023)+(15.063), (I-302)+(3.023)+(15.064), (I-302)+(3.023)+(16.001), (I-302)+(3.023)+(16.002), (I-302)+(3.023)+(16.003), (I-302)+(3.023)+(16.004), (I-302)+(3.023)+(16.005), (I-302)+(3.023)+(16.006), (I-302)+(3.023)+(16.007), (I-302)+(3.023)+(16.008), (I-302)+(3.023)+(17.001), (I-302)+(3.023)+(17.002), (I-302)+(3.023)+(17.003), (I-302)+(3.023)+(17.004), (I-302)+(3.023)+(17.005), (I-302)+(3.023)+(17.006), (I-302)+(3.023)+(17.007), (I-302)+(3.023)+(17.008), (I-302)+(3.023)+(17.009), (I-302)+(3.023)+(17.010), (I-302)+(3.023)+(17.011), (I-302)+(3.023)+(17.012), (I-302)+(3.023)+(18.001), (I-302)+(3.024)+(3.025), (I-302)+(3.024)+(3.030), (I-302)+(3.024)+(3.031), (I-302)+(3.024)+(5.001), (I-302)+(3.024)+(5.002), (I-302)+(3.024)+(5.003), (I-302)+(3.024)+(5.004), (I-302)+(3.024)+(5.005), (I-302)+(3.024)+(5.006), (I-302)+(3.024)+(5.007), (I-302)+(3.024)+(5.008), (I-302)+(3.024)+(5.009), (I-302)+(3.024)+(5.010), (I-302)+(3.024)+(5.011), (I-302)+(3.024)+(5.012), (I-302)+(3.024)+(5.013), (I-302)+(3.024)+(5.014), (I-302)+(3.024)+(5.015), (I-302)+(3.024)+(5.016), (I-302)+(3.024)+(5.017), (I-302)+(3.024)+(5.018), (I-302)+(3.024)+(5.019), (I-302)+(3.024)+(5.020), (I-302)+(3.024)+(5.021), (I-302)+(3.024)+(5.022), (I-302)+(3.024)+(5.023), (I-302)+(3.024)+(6.001), (I-302)+(3.024)+(6.002), (I-302)+(3.024)+(6.003), (I-302)+(3.024)+(6.004), (I-302)+(3.024)+(7.001), (I-302)+(3.024)+(7.002), (I-302)+(3.024)+(7.003), (I-302)+(3.024)+(7.004), (I-302)+(3.024)+(7.005), (I-302)+(3.024)+(7.006), (I-302)+(3.024)+(9.001), (I-302)+(3.024)+(9.002), (I-302)+(3.024)+(9.003), (I-302)+(3.024)+(9.004), (I-302)+(3.024)+(9.005), (I-302)+(3.024)+(9.006), (I-302)+(3.024)+(9.007), (I-302)+(3.024)+(9.008), (I-302)+(3.024)+(9.009), (I-302)+(3.024)+(14.001), (I-302)+(3.024)+(14.002), (I-302)+(3.024)+(15.008), (I-302)+(3.024)+(15.011), (I-302)+(3.024)+(15.012), (I-302)+(3.024)+(15.016), (I-302)+(3.024)+(15.025), (I-302)+(3.024)+(15.027), (I-302)+(3.024)+(15.047), (I-302)+(3.024)+(15.063), (I-302)+(3.024)+(15.064), (I-302)+(3.024)+(16.001), (I-302)+(3.024)+(16.002), (I-302)+(3.024)+(16.003), (I-302)+(3.024)+(16.004), (I-302)+(3.024)+(16.005), (I-302)+(3.024)+(16.006), (I-302)+(3.024)+(16.007), (I-302)+(3.024)+(16.008), (I-302)+(3.024)+(17.001), (I-302)+(3.024)+(17.002), (I-302)+(3.024)+(17.003), (I-302)+(3.024)+(17.004), (I-302)+(3.024)+(17.005), (I-302)+(3.024)+(17.006), (I-302)+(3.024)+(17.007), (I-302)+(3.024)+(17.008), (I-302)+(3.024)+(17.009), (I-302)+(3.024)+(17.010), (I-302)+(3.024)+(17.011), (I-302)+(3.024)+(17.012), (I-302)+(3.024)+(18.001), (I-302)+(3.025)+(3.030), (I-302)+(3.025)+(3.031), (I-302)+(3.025)+(5.001), (I-302)+(3.025)+(5.002), (I-302)+(3.025)+(5.003), (I-302)+(3.025)+(5.004), (I-302)+(3.025)+(5.005), (I-302)+(3.025)+(5.006), (I-302)+(3.025)+(5.007), (I-302)+(3.025)+(5.008), (I-302)+(3.025)+(5.009), (I-302)+(3.025)+(5.010), (I-302)+(3.025)+(5.011), (I-302)+(3.025)+(5.012), (I-302)+(3.025)+(5.013), (I-302)+(3.025)+(5.014), (I-302)+(3.025)+(5.015), (I-302)+(3.025)+(5.016), (I-302)+(3.025)+(5.017), (I-302)+(3.025)+(5.018), (I-302)+(3.025)+(5.019), (I-302)+(3.025)+(5.020), (I-302)+(3.025)+(5.021), (I-302)+(3.025)+(5.022), (I-302)+(3.025)+(5.023), (I-302)+(3.025)+(6.001), (I-302)+(3.025)+(6.002), (I-302)+(3.025)+(6.003), (I-302)+(3.025)+(6.004), (I-302)+(3.025)+(7.001), (I-302)+(3.025)+(7.002), (I-302)+(3.025)+(7.003), (I-302)+(3.025)+(7.004), (I-302)+(3.025)+(7.005), (I-302)+(3.025)+(7.006), (I-302)+(3.025)+(9.001), (I-302)+(3.025)+(9.002), (I-302)+(3.025)+(9.003), (I-302)+(3.025)+(9.004), (I-302)+(3.025)+(9.005), (I-302)+(3.025)+(9.006), (I-302)+(3.025)+(9.007), (I-302)+(3.025)+(9.008), (I-302)+(3.025)+(9.009), (I-302)+(3.025)+(14.001), (I-302)+(3.025)+(14.002), (I-302)+(3.025)+(15.008), (I-302)+(3.025)+(15.011), (I-302)+(3.025)+(15.012), (I-302)+(3.025)+(15.016), (I-302)+(3.025)+(15.025), (I-302)+(3.025)+(15.027), (I-302)+(3.025)+(15.047), (I-302)+(3.025)+(15.063), (I-302)+(3.025)+(15.064), (I-302)+(3.025)+(16.001), (I-302)+(3.025)+(16.002), (I-302)+(3.025)+(16.003), (I-302)+(3.025)+(16.004), (I-302)+(3.025)+(16.005), (I-302)+(3.025)+(16.006), (I-302)+(3.025)+(16.007), (I-302)+(3.025)+(16.008), (I-302)+(3.025)+(17.001), (I-302)+(3.025)+(17.002), (I-302)+(3.025)+(17.003), (I-302)+(3.025)+(17.004), (I-302)+(3.025)+(17.005), (I-302)+(3.025)+(17.006), (I-302)+(3.025)+(17.007), (I-302)+(3.025)+(17.008), (I-302)+(3.025)+(17.009), (I-302)+(3.025)+(17.010), (I-302)+(3.025)+(17.011), (I-302)+(3.025)+(17.012), (I-302)+(3.025)+(18.001), (I-302)+(3.026)+(3.025), (I-302)+(3.026)+(3.030), (I-302)+(3.026)+(3.031), (I-302)+(3.026)+(5.001), (I-302)+(3.026)+(5.002), (I-302)+(3.026)+(5.003), (I-302)+(3.026)+(5.004), (I-302)+(3.026)+(5.005), (I-302)+(3.026)+(5.006), (I-302)+(3.026)+(5.007), (I-302)+(3.026)+(5.008), (I-302)+(3.026)+(5.009), (I-302)+(3.026)+(5.010), (I-302)+(3.026)+(5.011), (I-302)+(3.026)+(5.012), (I-302)+(3.026)+(5.013), (I-302)+(3.026)+(5.014), (I-302)+(3.026)+(5.015), (I-302)+(3.026)+(5.016), (I-302)+(3.026)+(5.017), (I-302)+(3.026)+(5.018), (I-302)+(3.026)+(5.019), (I-302)+(3.026)+(5.020), (I-302)+(3.026)+(5.021), (I-302)+(3.026)+(5.022), (I-302)+(3.026)+(5.023), (I-302)+(3.026)+(6.001), (I-302)+(3.026)+(6.002), (I-302)+(3.026)+(6.003), (I-302)+(3.026)+(6.004), (I-302)+(3.026)+(7.001), (I-302)+(3.026)+(7.002), (I-302)+(3.026)+(7.003), (I-302)+(3.026)+(7.004), (I-302)+(3.026)+(7.005), (I-302)+(3.026)+(7.006), (I-302)+(3.026)+(9.001), (I-302)+(3.026)+(9.002), (I-302)+(3.026)+(9.003), (I-302)+(3.026)+(9.004), (I-302)+(3.026)+(9.005), (I-302)+(3.026)+(9.006), (I-302)+(3.026)+(9.007), (I-302)+(3.026)+(9.008), (I-302)+(3.026)+(9.009), (I-302)+(3.026)+(14.001), (I-302)+(3.026)+(14.002), (I-302)+(3.026)+(15.008), (I-302)+(3.026)+(15.011), (I-302)+(3.026)+(15.012), (I-302)+(3.026)+(15.016), (I-302)+(3.026)+(15.025), (I-302)+(3.026)+(15.027), (I-302)+(3.026)+(15.047), (I-302)+(3.026)+(15.063), (I-302)+(3.026)+(15.064), (I-302)+(3.026)+(16.001), (I-302)+(3.026)+(16.002), (I-302)+(3.026)+(16.003), (I-302)+(3.026)+(16.004), (I-302)+(3.026)+(16.005), (I-302)+(3.026)+(16.006), (I-302)+(3.026)+(16.007), (I-302)+(3.026)+(16.008), (I-302)+(3.026)+(17.001), (I-302)+(3.026)+(17.002), (I-302)+(3.026)+(17.003), (I-302)+(3.026)+(17.004), (I-302)+(3.026)+(17.005), (I-302)+(3.026)+(17.006), (I-302)+(3.026)+(17.007), (I-302)+(3.026)+(17.008), (I-302)+(3.026)+(17.009), (I-302)+(3.026)+(17.010), (I-302)+(3.026)+(17.011), (I-302)+(3.026)+(17.012), (I-302)+(3.026)+(18.001), (I-302)+(3.027)+(3.025), (I-302)+(3.027)+(3.030), (I-302)+(3.027)+(3.031), (I-302)+(3.027)+(5.001), (I-302)+(3.027)+(5.002), (I-302)+(3.027)+(5.003), (I-302)+(3.027)+(5.004), (I-302)+(3.027)+(5.005), (I-302)+(3.027)+(5.006), (I-302)+(3.027)+(5.007), (I-302)+(3.027)+(5.008), (I-302)+(3.027)+(5.009), (I-302)+(3.027)+(5.010), (I-302)+(3.027)+(5.011), (I-302)+(3.027)+(5.012), (I-302)+(3.027)+(5.013), (I-302)+(3.027)+(5.014), (I-302)+(3.027)+(5.015), (I-302)+(3.027)+(5.016), (I-302)+(3.027)+(5.017), (I-302)+(3.027)+(5.018), (I-302)+(3.027)+(5.019), (I-302)+(3.027)+(5.020), (I-302)+(3.027)+(5.021), (I-302)+(3.027)+(5.022), (I-302)+(3.027)+(5.023), (I-302)+(3.027)+(6.001), (I-302)+(3.027)+(6.002), (I-302)+(3.027)+(6.003), (I-302)+(3.027)+(6.004), (I-302)+(3.027)+(7.001), (I-302)+(3.027)+(7.002), (I-302)+(3.027)+(7.003), (I-302)+(3.027)+(7.004), (I-302)+(3.027)+(7.005), (I-302)+(3.027)+(7.006), (I-302)+(3.027)+(9.001), (I-302)+(3.027)+(9.002), (I-302)+(3.027)+(9.003), (I-302)+(3.027)+(9.004), (I-302)+(3.027)+(9.005), (I-302)+(3.027)+(9.006), (I-302)+(3.027)+(9.007), (I-302)+(3.027)+(9.008), (I-302)+(3.027)+(9.009), (I-302)+(3.027)+(14.001), (I-302)+(3.027)+(14.002), (I-302)+(3.027)+(15.008), (I-302)+(3.027)+(15.011), (I-302)+(3.027)+(15.012), (I-302)+(3.027)+(15.016), (I-302)+(3.027)+(15.025), (I-302)+(3.027)+(15.027), (I-302)+(3.027)+(15.047), (I-302)+(3.027)+(15.063), (I-302)+(3.027)+(15.064), (I-302)+(3.027)+(16.001), (I-302)+(3.027)+(16.002), (I-302)+(3.027)+(16.003), (I-302)+(3.027)+(16.004), (I-302)+(3.027)+(16.005), (I-302)+(3.027)+(16.006), (I-302)+(3.027)+(16.007), (I-302)+(3.027)+(16.008), (I-302)+(3.027)+(17.001), (I-302)+(3.027)+(17.002), (I-302)+(3.027)+(17.003), (I-302)+(3.027)+(17.004), (I-302)+(3.027)+(17.005), (I-302)+(3.027)+(17.006), (I-302)+(3.027)+(17.007), (I-302)+(3.027)+(17.008), (I-302)+(3.027)+(17.009), (I-302)+(3.027)+(17.010), (I-302)+(3.027)+(17.011), (I-302)+(3.027)+(17.012), (I-302)+(3.027)+(18.001), (I-302)+(3.028)+(3.025), (I-302)+(3.028)+(3.030), (I-302)+(3.028)+(3.031), (I-302)+(3.028)+(5.001), (I-302)+(3.028)+(5.002), (I-302)+(3.028)+(5.003), (I-302)+(3.028)+(5.004), (I-302)+(3.028)+(5.005), (I-302)+(3.028)+(5.006), (I-302)+(3.028)+(5.007), (I-302)+(3.028)+(5.008), (I-302)+(3.028)+(5.009), (I-302)+(3.028)+(5.010), (I-302)+(3.028)+(5.011), (I-302)+(3.028)+(5.012), (I-302)+(3.028)+(5.013), (I-302)+(3.028)+(5.014), (I-302)+(3.028)+(5.015), (I-302)+(3.028)+(5.016), (I-302)+(3.028)+(5.017), (I-302)+(3.028)+(5.018), (I-302)+(3.028)+(5.019), (I-302)+(3.028)+(5.020), (I-302)+(3.028)+(5.021), (I-302)+(3.028)+(5.022), (I-302)+(3.028)+(5.023), (I-302)+(3.028)+(6.001), (I-302)+(3.028)+(6.002), (I-302)+(3.028)+(6.003), (I-302)+(3.028)+(6.004), (I-302)+(3.028)+(7.001), (I-302)+(3.028)+(7.002), (I-302)+(3.028)+(7.003), (I-302)+(3.028)+(7.004), (I-302)+(3.028)+(7.005), (I-302)+(3.028)+(7.006), (I-302)+(3.028)+(9.001), (I-302)+(3.028)+(9.002), (I-302)+(3.028)+(9.003), (I-302)+(3.028)+(9.004), (I-302)+(3.028)+(9.005), (I-302)+(3.028)+(9.006), (I-302)+(3.028)+(9.007), (I-302)+(3.028)+(9.008), (I-302)+(3.028)+(9.009), (I-302)+(3.028)+(14.001), (I-302)+(3.028)+(14.002), (I-302)+(3.028)+(15.008), (I-302)+(3.028)+(15.011), (I-302)+(3.028)+(15.012), (I-302)+(3.028)+(15.016), (I-302)+(3.028)+(15.025), (I-302)+(3.028)+(15.027), (I-302)+(3.028)+(15.047), (I-302)+(3.028)+(15.063), (I-302)+(3.028)+(15.064), (I-302)+(3.028)+(16.001), (I-302)+(3.028)+(16.002), (I-302)+(3.028)+(16.003), (I-302)+(3.028)+(16.004), (I-302)+(3.028)+(16.005), (I-302)+(3.028)+(16.006), (I-302)+(3.028)+(16.007), (I-302)+(3.028)+(16.008), (I-302)+(3.028)+(17.001), (I-302)+(3.028)+(17.002), (I-302)+(3.028)+(17.003), (I-302)+(3.028)+(17.004), (I-302)+(3.028)+(17.005), (I-302)+(3.028)+(17.006), (I-302)+(3.028)+(17.007), (I-302)+(3.028)+(17.008), (I-302)+(3.028)+(17.009), (I-302)+(3.028)+(17.010), (I-302)+(3.028)+(17.011), (I-302)+(3.028)+(17.012), (I-302)+(3.028)+(18.001), (I-302)+(3.029)+(3.025), (I-302)+(3.029)+(3.030), (I-302)+(3.029)+(3.031), (I-302)+(3.029)+(5.001), (I-302)+(3.029)+(5.002), (I-302)+(3.029)+(5.003), (I-302)+(3.029)+(5.004), (I-302)+(3.029)+(5.005), (I-302)+(3.029)+(5.006), (I-302)+(3.029)+(5.007), (I-302)+(3.029)+(5.008), (I-302)+(3.029)+(5.009), (I-302)+(3.029)+(5.010), (I-302)+(3.029)+(5.011), (I-302)+(3.029)+(5.012), (I-302)+(3.029)+(5.013), (I-302)+(3.029)+(5.014), (I-302)+(3.029)+(5.015), (I-302)+(3.029)+(5.016), (I-302)+(3.029)+(5.017), (I-302)+(3.029)+(5.018), (I-302)+(3.029)+(5.019), (I-302)+(3.029)+(5.020), (I-302)+(3.029)+(5.021), (I-302)+(3.029)+(5.022), (I-302)+(3.029)+(5.023), (I-302)+(3.029)+(6.001), (I-302)+(3.029)+(6.002), (I-302)+(3.029)+(6.003), (I-302)+(3.029)+(6.004), (I-302)+(3.029)+(7.001), (I-302)+(3.029)+(7.002), (I-302)+(3.029)+(7.003), (I-302)+(3.029)+(7.004), (I-302)+(3.029)+(7.005), (I-302)+(3.029)+(7.006), (I-302)+(3.029)+(9.001), (I-302)+(3.029)+(9.002), (I-302)+(3.029)+(9.003), (I-302)+(3.029)+(9.004), (I-302)+(3.029)+(9.005), (I-302)+(3.029)+(9.006), (I-302)+(3.029)+(9.007), (I-302)+(3.029)+(9.008), (I-302)+(3.029)+(9.009), (I-302)+(3.029)+(14.001), (I-302)+(3.029)+(14.002), (I-302)+(3.029)+(15.008), (I-302)+(3.029)+(15.011), (I-302)+(3.029)+(15.012), (I-302)+(3.029)+(15.016), (I-302)+(3.029)+(15.025), (I-302)+(3.029)+(15.027), (I-302)+(3.029)+(15.047), (I-302)+(3.029)+(15.063), (I-302)+(3.029)+(15.064), (I-302)+(3.029)+(16.001), (I-302)+(3.029)+(16.002), (I-302)+(3.029)+(16.003), (I-302)+(3.029)+(16.004), (I-302)+(3.029)+(16.005), (I-302)+(3.029)+(16.006), (I-302)+(3.029)+(16.007), (I-302)+(3.029)+(16.008), (I-302)+(3.029)+(17.001), (I-302)+(3.029)+(17.002), (I-302)+(3.029)+(17.003), (I-302)+(3.029)+(17.004), (I-302)+(3.029)+(17.005), (I-302)+(3.029)+(17.006), (I-302)+(3.029)+(17.007), (I-302)+(3.029)+(17.008), (I-302)+(3.029)+(17.009), (I-302)+(3.029)+(17.010), (I-302)+(3.029)+(17.011), (I-302)+(3.029)+(17.012), (I-302)+(3.029)+(18.001), (I-302)+(3.030)+(3.025), (I-302)+(3.030)+(3.031), (I-302)+(3.030)+(5.001), (I-302)+(3.030)+(5.002), (I-302)+(3.030)+(5.003), (I-302)+(3.030)+(5.004), (I-302)+(3.030)+(5.005), (I-302)+(3.030)+(5.006), (I-302)+(3.030)+(5.007), (I-302)+(3.030)+(5.008), (I-302)+(3.030)+(5.009), (I-302)+(3.030)+(5.010), (I-302)+(3.030)+(5.011), (I-302)+(3.030)+(5.012), (I-302)+(3.030)+(5.013), (I-302)+(3.030)+(5.014), (I-302)+(3.030)+(5.015), (I-302)+(3.030)+(5.016), (I-302)+(3.030)+(5.017), (I-302)+(3.030)+(5.018), (I-302)+(3.030)+(5.019), (I-302)+(3.030)+(5.020), (I-302)+(3.030)+(5.021), (I-302)+(3.030)+(5.022), (I-302)+(3.030)+(5.023), (I-302)+(3.030)+(6.001), (I-302)+(3.030)+(6.002), (I-302)+(3.030)+(6.003), (I-302)+(3.030)+(6.004), (I-302)+(3.030)+(7.001), (I-302)+(3.030)+(7.002), (I-302)+(3.030)+(7.003), (I-302)+(3.030)+(7.004), (I-302)+(3.030)+(7.005), (I-302)+(3.030)+(7.006), (I-302)+(3.030)+(9.001), (I-302)+(3.030)+(9.002), (I-302)+(3.030)+(9.003), (I-302)+(3.030)+(9.004), (I-302)+(3.030)+(9.005), (I-302)+(3.030)+(9.006), (I-302)+(3.030)+(9.007), (I-302)+(3.030)+(9.008), (I-302)+(3.030)+(9.009), (I-302)+(3.030)+(14.001), (I-302)+(3.030)+(14.002), (I-302)+(3.030)+(15.008), (I-302)+(3.030)+(15.011), (I-302)+(3.030)+(15.012), (I-302)+(3.030)+(15.016), (I-302)+(3.030)+(15.025), (I-302)+(3.030)+(15.027), (I-302)+(3.030)+(15.047), (I-302)+(3.030)+(15.063), (I-302)+(3.030)+(15.064), (I-302)+(3.030)+(16.001), (I-302)+(3.030)+(16.002), (I-302)+(3.030)+(16.003), (I-302)+(3.030)+(16.004), (I-302)+(3.030)+(16.005), (I-302)+(3.030)+(16.006), (I-302)+(3.030)+(16.007), (I-302)+(3.030)+(16.008), (I-302)+(3.030)+(17.001), (I-302)+(3.030)+(17.002), (I-302)+(3.030)+(17.003), (I-302)+(3.030)+(17.004), (I-302)+(3.030)+(17.005), (I-302)+(3.030)+(17.006), (I-302)+(3.030)+(17.007), (I-302)+(3.030)+(17.008), (I-302)+(3.030)+(17.009), (I-302)+(3.030)+(17.010), (I-302)+(3.030)+(17.011), (I-302)+(3.030)+(17.012), (I-302)+(3.030)+(18.001), (I-302)+(3.031)+(3.025), (I-302)+(3.031)+(3.030), (I-302)+(3.031)+(5.001), (I-302)+(3.031)+(5.002), (I-302)+(3.031)+(5.003), (I-302)+(3.031)+(5.004), (I-302)+(3.031)+(5.005), (I-302)+(3.031)+(5.006), (I-302)+(3.031)+(5.007), (I-302)+(3.031)+(5.008), (I-302)+(3.031)+(5.009), (I-302)+(3.031)+(5.010), (I-302)+(3.031)+(5.011), (I-302)+(3.031)+(5.012), (I-302)+(3.031)+(5.013), (I-302)+(3.031)+(5.014), (I-302)+(3.031)+(5.015), (I-302)+(3.031)+(5.016), (I-302)+(3.031)+(5.017), (I-302)+(3.031)+(5.018), (I-302)+(3.031)+(5.019), (I-302)+(3.031)+(5.020), (I-302)+(3.031)+(5.021), (I-302)+(3.031)+(5.022), (I-302)+(3.031)+(5.023), (I-302)+(3.031)+(6.001), (I-302)+(3.031)+(6.002), (I-302)+(3.031)+(6.003), (I-302)+(3.031)+(6.004), (I-302)+(3.031)+(7.001), (I-302)+(3.031)+(7.002), (I-302)+(3.031)+(7.003), (I-302)+(3.031)+(7.004), (I-302)+(3.031)+(7.005), (I-302)+(3.031)+(7.006), (I-302)+(3.031)+(9.001), (I-302)+(3.031)+(9.002), (I-302)+(3.031)+(9.003), (I-302)+(3.031)+(9.004), (I-302)+(3.031)+(9.005), (I-302)+(3.031)+(9.006), (I-302)+(3.031)+(9.007), (I-302)+(3.031)+(9.008), (I-302)+(3.031)+(9.009), (I-302)+(3.031)+(14.001), (I-302)+(3.031)+(14.002), (I-302)+(3.031)+(15.008), (I-302)+(3.031)+(15.011), (I-302)+(3.031)+(15.012), (I-302)+(3.031)+(15.016), (I-302)+(3.031)+(15.025), (I-302)+(3.031)+(15.027), (I-302)+(3.031)+(15.047), (I-302)+(3.031)+(15.063), (I-302)+(3.031)+(15.064), (I-302)+(3.031)+(16.001), (I-302)+(3.031)+(16.002), (I-302)+(3.031)+(16.003), (I-302)+(3.031)+(16.004), (I-302)+(3.031)+(16.005), (I-302)+(3.031)+(16.006), (I-302)+(3.031)+(16.007), (I-302)+(3.031)+(16.008), (I-302)+(3.031)+(17.001), (I-302)+(3.031)+(17.002), (I-302)+(3.031)+(17.003), (I-302)+(3.031)+(17.004), (I-302)+(3.031)+(17.005), (I-302)+(3.031)+(17.006), (I-302)+(3.031)+(17.007), (I-302)+(3.031)+(17.008), (I-302)+(3.031)+(17.009), (I-302)+(3.031)+(17.010), (I-302)+(3.031)+(17.011), (I-302)+(3.031)+(17.012), (I-302)+(3.031)+(18.001), (I-302)+(5.001)+(9.001), (I-302)+(5.001)+(9.002), (I-302)+(5.001)+(9.003), (I-302)+(5.001)+(9.004), (I-302)+(5.001)+(9.005), (I-302)+(5.001)+(9.006), (I-302)+(5.001)+(9.007), (I-302)+(5.001)+(9.008), (I-302)+(5.001)+(9.009), (I-302)+(5.001)+(15.012), (I-302)+(5.001)+(15.016), (I-302)+(5.001)+(15.025), (I-302)+(5.001)+(15.027), (I-302)+(5.001)+(15.047), (I-302)+(5.001)+(15.063), (I-302)+(5.001)+(15.064), (I-302)+(5.002)+(9.001), (I-302)+(5.002)+(9.002), (I-302)+(5.002)+(9.003), (I-302)+(5.002)+(9.004), (I-302)+(5.002)+(9.005), (I-302)+(5.002)+(9.006), (I-302)+(5.002)+(9.007), (I-302)+(5.002)+(9.008), (I-302)+(5.002)+(9.009), (I-302)+(5.002)+(15.012), (I-302)+(5.002)+(15.016), (I-302)+(5.002)+(15.025), (I-302)+(5.002)+(15.027), (I-302)+(5.002)+(15.047), (I-302)+(5.002)+(15.063), (I-302)+(5.002)+(15.064), (I-302)+(5.003)+(9.001), (I-302)+(5.003)+(9.002), (I-302)+(5.003)+(9.003), (I-302)+(5.003)+(9.004), (I-302)+(5.003)+(9.005), (I-302)+(5.003)+(9.006), (I-302)+(5.003)+(9.007), (I-302)+(5.003)+(9.008), (I-302)+(5.003)+(9.009), (I-302)+(5.003)+(15.012), (I-302)+(5.003)+(15.016), (I-302)+(5.003)+(15.025), (I-302)+(5.003)+(15.027), (I-302)+(5.003)+(15.047), (I-302)+(5.003)+(15.063), (I-302)+(5.003)+(15.064), (I-302)+(5.004)+(9.001), (I-302)+(5.004)+(9.002), (I-302)+(5.004)+(9.003), (I-302)+(5.004)+(9.004), (I-302)+(5.004)+(9.005), (I-302)+(5.004)+(9.006), (I-302)+(5.004)+(9.007), (I-302)+(5.004)+(9.008), (I-302)+(5.004)+(9.009), (I-302)+(5.004)+(15.012), (I-302)+(5.004)+(15.016), (I-302)+(5.004)+(15.025), (I-302)+(5.004)+(15.027), (I-302)+(5.004)+(15.047), (I-302)+(5.004)+(15.063), (I-302)+(5.004)+(15.064), (I-302)+(5.005)+(9.001), (I-302)+(5.005)+(9.002), (I-302)+(5.005)+(9.003), (I-302)+(5.005)+(9.004), (I-302)+(5.005)+(9.005), (I-302)+(5.005)+(9.006), (I-302)+(5.005)+(9.007), (I-302)+(5.005)+(9.008), (I-302)+(5.005)+(9.009), (I-302)+(5.005)+(15.012), (I-302)+(5.005)+(15.016), (I-302)+(5.005)+(15.025), (I-302)+(5.005)+(15.027), (I-302)+(5.005)+(15.047), (I-302)+(5.005)+(15.063), (I-302)+(5.005)+(15.064), (I-302)+(5.006)+(9.001), (I-302)+(5.006)+(9.002), (I-302)+(5.006)+(9.003), (I-302)+(5.006)+(9.004), (I-302)+(5.006)+(9.005), (I-302)+(5.006)+(9.006), (I-302)+(5.006)+(9.007), (I-302)+(5.006)+(9.008), (I-302)+(5.006)+(9.009), (I-302)+(5.006)+(15.012), (I-302)+(5.006)+(15.016), (I-302)+(5.006)+(15.025), (I-302)+(5.006)+(15.027), (I-302)+(5.006)+(15.047), (I-302)+(5.006)+(15.063), (I-302)+(5.006)+(15.064), (I-302)+(5.007)+(9.001), (I-302)+(5.007)+(9.002), (I-302)+(5.007)+(9.003), (I-302)+(5.007)+(9.004), (I-302)+(5.007)+(9.005), (I-302)+(5.007)+(9.006), (I-302)+(5.007)+(9.007), (I-302)+(5.007)+(9.008), (I-302)+(5.007)+(9.009), (I-302)+(5.007)+(15.012), (I-302)+(5.007)+(15.016), (I-302)+(5.007)+(15.025), (I-302)+(5.007)+(15.027), (I-302)+(5.007)+(15.047), (I-302)+(5.007)+(15.063), (I-302)+(5.007)+(15.064), (I-302)+(5.008)+(9.001), (I-302)+(5.008)+(9.002), (I-302)+(5.008)+(9.003), (I-302)+(5.008)+(9.004), (I-302)+(5.008)+(9.005), (I-302)+(5.008)+(9.006), (I-302)+(5.008)+(9.007), (I-302)+(5.008)+(9.008), (I-302)+(5.008)+(9.009), (I-302)+(5.008)+(15.012), (I-302)+(5.008)+(15.016), (I-302)+(5.008)+(15.025), (I-302)+(5.008)+(15.027), (I-302)+(5.008)+(15.047), (I-302)+(5.008)+(15.063), (I-302)+(5.008)+(15.064), (I-302)+(5.009)+(9.001), (I-302)+(5.009)+(9.002), (I-302)+(5.009)+(9.003), (I-302)+(5.009)+(9.004), (I-302)+(5.009)+(9.005), (I-302)+(5.009)+(9.006), (I-302)+(5.009)+(9.007), (I-302)+(5.009)+(9.008), (I-302)+(5.009)+(9.009), (I-302)+(5.009)+(15.012), (I-302)+(5.009)+(15.016), (I-302)+(5.009)+(15.025), (I-302)+(5.009)+(15.027), (I-302)+(5.009)+(15.047), (I-302)+(5.009)+(15.063), (I-302)+(5.009)+(15.064), (I-302)+(5.010)+(9.001), (I-302)+(5.010)+(9.002), (I-302)+(5.010)+(9.003), (I-302)+(5.010)+(9.004), (I-302)+(5.010)+(9.005), (I-302)+(5.010)+(9.006), (I-302)+(5.010)+(9.007), (I-302)+(5.010)+(9.008), (I-302)+(5.010)+(9.009), (I-302)+(5.010)+(15.012), (I-302)+(5.010)+(15.016), (I-302)+(5.010)+(15.025), (I-302)+(5.010)+(15.027), (I-302)+(5.010)+(15.047), (I-302)+(5.010)+(15.063), (I-302)+(5.010)+(15.064), (I-302)+(5.011)+(9.001), (I-302)+(5.011)+(9.002), (I-302)+(5.011)+(9.003), (I-302)+(5.011)+(9.004), (I-302)+(5.011)+(9.005), (I-302)+(5.011)+(9.006), (I-302)+(5.011)+(9.007), (I-302)+(5.011)+(9.008), (I-302)+(5.011)+(9.009), (I-302)+(5.011)+(15.012), (I-302)+(5.011)+(15.016), (I-302)+(5.011)+(15.025), (I-302)+(5.011)+(15.027), (I-302)+(5.011)+(15.047), (I-302)+(5.011)+(15.063), (I-302)+(5.011)+(15.064), (I-302)+(5.012)+(9.001), (I-302)+(5.012)+(9.002), (I-302)+(5.012)+(9.003), (I-302)+(5.012)+(9.004), (I-302)+(5.012)+(9.005), (I-302)+(5.012)+(9.006), (I-302)+(5.012)+(9.007), (I-302)+(5.012)+(9.008), (I-302)+(5.012)+(9.009), (I-302)+(5.012)+(15.012), (I-302)+(5.012)+(15.016), (I-302)+(5.012)+(15.025), (I-302)+(5.012)+(15.027), (I-302)+(5.012)+(15.047), (I-302)+(5.012)+(15.063), (I-302)+(5.012)+(15.064), (I-302)+(5.013)+(9.001), (I-302)+(5.013)+(9.002), (I-302)+(5.013)+(9.003), (I-302)+(5.013)+(9.004), (I-302)+(5.013)+(9.005), (I-302)+(5.013)+(9.006), (I-302)+(5.013)+(9.007), (I-302)+(5.013)+(9.008), (I-302)+(5.013)+(9.009), (I-302)+(5.013)+(15.012), (I-302)+(5.013)+(15.016), (I-302)+(5.013)+(15.025), (I-302)+(5.013)+(15.027), (I-302)+(5.013)+(15.047), (I-302)+(5.013)+(15.063), (I-302)+(5.013)+(15.064), (I-302)+(5.014)+(9.001), (I-302)+(5.014)+(9.002), (I-302)+(5.014)+(9.003), (I-302)+(5.014)+(9.004), (I-302)+(5.014)+(9.005), (I-302)+(5.014)+(9.006), (I-302)+(5.014)+(9.007), (I-302)+(5.014)+(9.008), (I-302)+(5.014)+(9.009), (I-302)+(5.014)+(15.012), (I-302)+(5.014)+(15.016), (I-302)+(5.014)+(15.025), (I-302)+(5.014)+(15.027), (I-302)+(5.014)+(15.047), (I-302)+(5.014)+(15.063), (I-302)+(5.014)+(15.064), (I-302)+(5.015)+(9.001), (I-302)+(5.015)+(9.002), (I-302)+(5.015)+(9.003), (I-302)+(5.015)+(9.004), (I-302)+(5.015)+(9.005), (I-302)+(5.015)+(9.006), (I-302)+(5.015)+(9.007), (I-302)+(5.015)+(9.008), (I-302)+(5.015)+(9.009), (I-302)+(5.015)+(15.012), (I-302)+(5.015)+(15.016), (I-302)+(5.015)+(15.025), (I-302)+(5.015)+(15.027), (I-302)+(5.015)+(15.047), (I-302)+(5.015)+(15.063), (I-302)+(5.015)+(15.064), (I-302)+(5.016)+(9.001), (I-302)+(5.016)+(9.002), (I-302)+(5.016)+(9.003), (I-302)+(5.016)+(9.004), (I-302)+(5.016)+(9.005), (I-302)+(5.016)+(9.006), (I-302)+(5.016)+(9.007), (I-302)+(5.016)+(9.008), (I-302)+(5.016)+(9.009), (I-302)+(5.016)+(15.012), (I-302)+(5.016)+(15.016), (I-302)+(5.016)+(15.025), (I-302)+(5.016)+(15.027), (I-302)+(5.016)+(15.047), (I-302)+(5.016)+(15.063), (I-302)+(5.016)+(15.064), (I-302)+(5.017)+(9.001), (I-302)+(5.017)+(9.002), (I-302)+(5.017)+(9.003), (I-302)+(5.017)+(9.004), (I-302)+(5.017)+(9.005), (I-302)+(5.017)+(9.006), (I-302)+(5.017)+(9.007), (I-302)+(5.017)+(9.008), (I-302)+(5.017)+(9.009), (I-302)+(5.017)+(15.012), (I-302)+(5.017)+(15.016), (I-302)+(5.017)+(15.025), (I-302)+(5.017)+(15.027), (I-302)+(5.017)+(15.047), (I-302)+(5.017)+(15.063), (I-302)+(5.017)+(15.064), (I-302)+(5.018)+(9.001), (I-302)+(5.018)+(9.002), (I-302)+(5.018)+(9.003), (I-302)+(5.018)+(9.004), (I-302)+(5.018)+(9.005), (I-302)+(5.018)+(9.006), (I-302)+(5.018)+(9.007), (I-302)+(5.018)+(9.008), (I-302)+(5.018)+(9.009), (I-302)+(5.018)+(15.012), (I-302)+(5.018)+(15.016), (I-302)+(5.018)+(15.025), (I-302)+(5.018)+(15.027), (I-302)+(5.018)+(15.047), (I-302)+(5.018)+(15.063), (I-302)+(5.018)+(15.064), (I-302)+(5.019)+(9.001), (I-302)+(5.019)+(9.002), (I-302)+(5.019)+(9.003), (I-302)+(5.019)+(9.004), (I-302)+(5.019)+(9.005), (I-302)+(5.019)+(9.006), (I-302)+(5.019)+(9.007), (I-302)+(5.019)+(9.008), (I-302)+(5.019)+(9.009), (I-302)+(5.019)+(15.012), (I-302)+(5.019)+(15.016), (I-302)+(5.019)+(15.025), (I-302)+(5.019)+(15.027), (I-302)+(5.019)+(15.047), (I-302)+(5.019)+(15.063), (I-302)+(5.019)+(15.064), (I-302)+(5.020)+(9.001), (I-302)+(5.020)+(9.002), (I-302)+(5.020)+(9.003), (I-302)+(5.020)+(9.004), (I-302)+(5.020)+(9.005), (I-302)+(5.020)+(9.006), (I-302)+(5.020)+(9.007), (I-302)+(5.020)+(9.008), (I-302)+(5.020)+(9.009), (I-302)+(5.020)+(15.012), (I-302)+(5.020)+(15.016), (I-302)+(5.020)+(15.025), (I-302)+(5.020)+(15.027), (I-302)+(5.020)+(15.047), (I-302)+(5.020)+(15.063), (I-302)+(5.020)+(15.064), (I-302)+(5.021)+(9.001), (I-302)+(5.021)+(9.002), (I-302)+(5.021)+(9.003), (I-302)+(5.021)+(9.004), (I-302)+(5.021)+(9.005), (I-302)+(5.021)+(9.006), (I-302)+(5.021)+(9.007), (I-302)+(5.021)+(9.008), (I-302)+(5.021)+(9.009), (I-302)+(5.021)+(15.012), (I-302)+(5.021)+(15.016), (I-302)+(5.021)+(15.025), (I-302)+(5.021)+(15.027), (I-302)+(5.021)+(15.047), (I-302)+(5.021)+(15.063), (I-302)+(5.021)+(15.064), (I-302)+(5.022)+(9.001), (I-302)+(5.022)+(9.002), (I-302)+(5.022)+(9.003), (I-302)+(5.022)+(9.004), (I-302)+(5.022)+(9.005), (I-302)+(5.022)+(9.006), (I-302)+(5.022)+(9.007), (I-302)+(5.022)+(9.008), (I-302)+(5.022)+(9.009), (I-302)+(5.022)+(15.012), (I-302)+(5.022)+(15.016), (I-302)+(5.022)+(15.025), (I-302)+(5.022)+(15.027), (I-302)+(5.022)+(15.047), (I-302)+(5.022)+(15.063), (I-302)+(5.022)+(15.064), (I-302)+(5.023)+(9.001), (I-302)+(5.023)+(9.002), (I-302)+(5.023)+(9.003), (I-302)+(5.023)+(9.004), (I-302)+(5.023)+(9.005), (I-302)+(5.023)+(9.006), (I-302)+(5.023)+(9.007), (I-302)+(5.023)+(9.008), (I-302)+(5.023)+(9.009), (I-302)+(5.023)+(15.012), (I-302)+(5.023)+(15.016), (I-302)+(5.023)+(15.025), (I-302)+(5.023)+(15.027), (I-302)+(5.023)+(15.047), (I-302)+(5.023)+(15.063), (I-302)+(5.023)+(15.064).

If Two Compounds (B) are Present in the Combinations According to the Invention, More Preferred Compound Combinations are Selected from the Group (G1-C1) Consisting of the Following Mixtures:

(I-052)+(1.001)+(1.002), (I-052)+(1.001)+(1.003), (I-052)+(1.001)+(1.004), (I-052)+(1.001)+(1.005), (I-052)+(1.001)+(1.006), (I-052)+(1.001)+(1.007), (I-052)+(1.001)+(1.010), (I-052)+(1.001)+(1.011), (I-052)+(1.001)+(1.012), (I-052)+(1.001)+(1.013), (I-052)+(1.001)+(1.017), (I-052)+(1.001)+(1.018), (I-052)+(1.001)+(1.020), (I-052)+(1.001)+(1.021), (I-052)+(1.001)+(1.026), (I-052)+(1.001)+(1.027), (I-052)+(1.001)+(1.055), (I-052)+(1.001)+(1.059), (I-052)+(1.001)+(1.092), (I-052)+(1.001)+(2.001), (I-052)+(1.001)+(2.002), (I-052)+(1.001)+(2.003), (I-052)+(1.001)+(2.005), (I-052)+(1.001)+(2.007), (I-052)+(1.001)+(2.009), (I-052)+(1.001)+(2.010), (I-052)+(1.001)+(2.011), (I-052)+(1.001)+(2.012), (I-052)+(1.001)+(2.013), (I-052)+(1.001)+(2.014), (I-052)+(1.001)+(2.015), (I-052)+(1.001)+(2.016), (I-052)+(1.001)+(2.017), (I-052)+(1.001)+(2.018), (I-052)+(1.001)+(2.019), (I-052)+(1.001)+(2.021), (I-052)+(1.001)+(2.028), (I-052)+(1.001)+(2.030), (I-052)+(1.001)+(2.038), (I-052)+(1.001)+(3.003), (I-052)+(1.001)+(3.007), (I-052)+(1.001)+(3.012), (I-052)+(1.001)+(3.013), (I-052)+(1.001)+(3.016), (I-052)+(1.001)+(3.017), (I-052)+(1.001)+(3.020), (I-052)+(1.001)+(3.025), (I-052)+(1.001)+(3.026), (I-052)+(1.001)+(3.030), (I-052)+(1.001)+(3.031), (I-052)+(1.001)+(5.003), (I-052)+(1.001)+(5.004), (I-052)+(1.001)+(5.005), (I-052)+(1.001)+(5.008), (I-052)+(1.001)+(5.009), (I-052)+(1.001)+(5.011), (I-052)+(1.001)+(5.012), (I-052)+(1.001)+(5.013), (I-052)+(1.001)+(5.015), (I-052)+(1.001)+(5.018), (I-052)+(1.001)+(5.019), (I-052)+(1.001)+(6.002), (I-052)+(1.001)+(7.001), (I-052)+(1.001)+(7.005), (I-052)+(1.001)+(9.002), (I-052)+(1.001)+(9.004), (I-052)+(1.001)+(14.001), (I-052)+(1.001)+(14.002), (I-052)+(1.001)+(15.008), (I-052)+(1.001)+(15.011), (I-052)+(1.001)+(15.012), (I-052)+(1.001)+(15.016), (I-052)+(1.001)+(15.025), (I-052)+(1.001)+(15.027), (I-052)+(1.001)+(15.047), (I-052)+(1.001)+(15.063), (I-052)+(1.001)+(15.064), (I-052)+(1.001)+(16.001), (I-052)+(1.001)+(16.005), (I-052)+(1.001)+(17.001), (I-052)+(1.001)+(17.002), (I-052)+(1.001)+(17.003), (I-052)+(1.001)+(17.008), (I-052)+(1.001)+(18.001), (I-052)+(1.002)+(1.001), (I-052)+(1.002)+(1.003), (I-052)+(1.002)+(1.004), (I-052)+(1.002)+(1.005), (I-052)+(1.002)+(1.006), (I-052)+(1.002)+(1.007), (I-052)+(1.002)+(1.010), (I-052)+(1.002)+(1.011), (I-052)+(1.002)+(1.012), (I-052)+(1.002)+(1.013), (I-052)+(1.002)+(1.017), (I-052)+(1.002)+(1.018), (I-052)+(1.002)+(1.020), (I-052)+(1.002)+(1.021), (I-052)+(1.002)+(1.026), (I-052)+(1.002)+(1.027), (I-052)+(1.002)+(1.055), (I-052)+(1.002)+(1.059), (I-052)+(1.002)+(1.092), (I-052)+(1.002)+(2.001), (I-052)+(1.002)+(2.002), (I-052)+(1.002)+(2.003), (I-052)+(1.002)+(2.005), (I-052)+(1.002)+(2.007), (I-052)+(1.002)+(2.009), (I-052)+(1.002)+(2.010), (I-052)+(1.002)+(2.011), (I-052)+(1.002)+(2.012), (I-052)+(1.002)+(2.013), (I-052)+(1.002)+(2.014), (I-052)+(1.002)+(2.015), (I-052)+(1.002)+(2.016), (I-052)+(1.002)+(2.017), (I-052)+(1.002)+(2.018), (I-052)+(1.002)+(2.019), (I-052)+(1.002)+(2.021), (I-052)+(1.002)+(2.028), (I-052)+(1.002)+(2.030), (I-052)+(1.002)+(2.038), (I-052)+(1.002)+(3.003), (I-052)+(1.002)+(3.007), (I-052)+(1.002)+(3.012), (I-052)+(1.002)+(3.013), (I-052)+(1.002)+(3.016), (I-052)+(1.002)+(3.017), (I-052)+(1.002)+(3.020), (I-052)+(1.002)+(3.025), (I-052)+(1.002)+(3.026), (I-052)+(1.002)+(3.030), (I-052)+(1.002)+(3.031), (I-052)+(1.002)+(5.003), (I-052)+(1.002)+(5.004), (I-052)+(1.002)+(5.005), (I-052)+(1.002)+(5.008), (I-052)+(1.002)+(5.009), (I-052)+(1.002)+(5.011), (I-052)+(1.002)+(5.012), (I-052)+(1.002)+(5.013), (I-052)+(1.002)+(5.015), (I-052)+(1.002)+(5.018), (I-052)+(1.002)+(5.019), (I-052)+(1.002)+(6.002), (I-052)+(1.002)+(7.001), (I-052)+(1.002)+(7.005), (I-052)+(1.002)+(9.002), (I-052)+(1.002)+(9.004), (I-052)+(1.002)+(14.001), (I-052)+(1.002)+(14.002), (I-052)+(1.002)+(15.008), (I-052)+(1.002)+(15.011), (I-052)+(1.002)+(15.012), (I-052)+(1.002)+(15.016), (I-052)+(1.002)+(15.025), (I-052)+(1.002)+(15.027), (I-052)+(1.002)+(15.047), (I-052)+(1.002)+(15.063), (I-052)+(1.002)+(15.064), (I-052)+(1.002)+(16.001), (I-052)+(1.002)+(16.005), (I-052)+(1.002)+(17.001), (I-052)+(1.002)+(17.002), (I-052)+(1.002)+(17.003), (I-052)+(1.002)+(17.008), (I-052)+(1.002)+(18.001), (I-052)+(1.003)+(1.001), (I-052)+(1.003)+(1.002), (I-052)+(1.003)+(1.004), (I-052)+(1.003)+(1.005), (I-052)+(1.003)+(1.006), (I-052)+(1.003)+(1.007), (I-052)+(1.003)+(1.010), (I-052)+(1.003)+(1.011), (I-052)+(1.003)+(1.012), (I-052)+(1.003)+(1.013), (I-052)+(1.003)+(1.017), (I-052)+(1.003)+(1.018), (I-052)+(1.003)+(1.020), (I-052)+(1.003)+(1.021), (I-052)+(1.003)+(1.026), (I-052)+(1.003)+(1.027), (I-052)+(1.003)+(1.055), (I-052)+(1.003)+(1.059), (I-052)+(1.003)+(1.092), (I-052)+(1.003)+(2.001), (I-052)+(1.003)+(2.002), (I-052)+(1.003)+(2.003), (I-052)+(1.003)+(2.005), (I-052)+(1.003)+(2.007), (I-052)+(1.003)+(2.009), (I-052)+(1.003)+(2.010), (I-052)+(1.003)+(2.011), (I-052)+(1.003)+(2.012), (I-052)+(1.003)+(2.013), (I-052)+(1.003)+(2.014), (I-052)+(1.003)+(2.015), (I-052)+(1.003)+(2.016), (I-052)+(1.003)+(2.017), (I-052)+(1.003)+(2.018), (1-052)+(1.003)+(2.019), (I-052)+(1.003)+(2.021), (I-052)+(1.003)+(2.028), (I-052)+(1.003)+(2.030), (I-052)+(1.003)+(2.038), (I-052)+(1.003)+(3.003), (I-052)+(1.003)+(3.007), (I-052)+(1.003)+(3.012), (I-052)+(1.003)+(3.013), (I-052)+(1.003)+(3.016), (I-052)+(1.003)+(3.017), (I-052)+(1.003)+(3.020), (I-052)+(1.003)+(3.025), (I-052)+(1.003)+(3.026), (I-052)+(1.003)+(3.030), (I-052)+(1.003)+(3.031), (I-052)+(1.003)+(5.003), (I-052)+(1.003)+(5.004), (I-052)+(1.003)+(5.005), (I-052)+(1.003)+(5.008), (I-052)+(1.003)+(5.009), (I-052)+(1.003)+(5.011), (I-052)+(1.003)+(5.012), (I-052)+(1.003)+(5.013), (I-052)+(1.003)+(5.015), (I-052)+(1.003)+(5.018), (I-052)+(1.003)+(5.019), (I-052)+(1.003)+(6.002), (I-052)+(1.003)+(7.001), (I-052)+(1.003)+(7.005), (I-052)+(1.003)+(9.002), (I-052)+(1.003)+(9.004), (I-052)+(1.003)+(14.001), (I-052)+(1.003)+(14.002), (I-052)+(1.003)+(15.008), (I-052)+(1.003)+(15.011), (I-052)+(1.003)+(15.012), (I-052)+(1.003)+(15.016), (I-052)+(1.003)+(15.025), (I-052)+(1.003)+(15.027), (I-052)+(1.003)+(15.047), (I-052)+(1.003)+(15.063), (I-052)+(1.003)+(15.064), (I-052)+(1.003)+(16.001), (I-052)+(1.003)+(16.005), (I-052)+(1.003)+(17.001), (I-052)+(1.003)+(17.002), (I-052)+(1.003)+(17.003), (I-052)+(1.003)+(17.008), (I-052)+(1.003)+(18.001), (I-052)+(1.004)+(1.001), (I-052)+(1.004)+(1.002), (I-052)+(1.004)+(1.003), (I-052)+(1.004)+(1.005), (I-052)+(1.004)+(1.006), (I-052)+(1.004)+(1.007), (I-052)+(1.004)+(1.010), (I-052)+(1.004)+(1.011), (I-052)+(1.004)+(1.012), (I-052)+(1.004)+(1.013), (I-052)+(1.004)+(1.017), (I-052)+(1.004)+(1.018), (I-052)+(1.004)+(1.020), (I-052)+(1.004)+(1.021), (I-052)+(1.004)+(1.026), (I-052)+(1.004)+(1.027), (I-052)+(1.004)+(1.055), (I-052)+(1.004)+(1.059), (I-052)+(1.004)+(1.092), (I-052)+(1.004)+(2.001), (I-052)+(1.004)+(2.002), (I-052)+(1.004)+(2.003), (I-052)+(1.004)+(2.005), (I-052)+(1.004)+(2.007), (I-052)+(1.004)+(2.009), (I-052)+(1.004)+(2.010), (I-052)+(1.004)+(2.011), (I-052)+(1.004)+(2.012), (I-052)+(1.004)+(2.013), (I-052)+(1.004)+(2.014), (I-052)+(1.004)+(2.015), (I-052)+(1.004)+(2.016), (I-052)+(1.004)+(2.017), (I-052)+(1.004)+(2.018), (I-052)+(1.004)+(2.019), (I-052)+(1.004)+(2.021), (I-052)+(1.004)+(2.028), (I-052)+(1.004)+(2.030), (I-052)+(1.004)+(2.038), (I-052)+(1.004)+(3.003), (I-052)+(1.004)+(3.007), (I-052)+(1.004)+(3.012), (I-052)+(1.004)+(3.013), (I-052)+(1.004)+(3.016), (I-052)+(1.004)+(3.017), (I-052)+(1.004)+(3.020), (I-052)+(1.004)+(3.025), (I-052)+(1.004)+(3.026), (I-052)+(1.004)+(3.030), (I-052)+(1.004)+(3.031), (I-052)+(1.004)+(5.003), (I-052)+(1.004)+(5.004), (I-052)+(1.004)+(5.005), (I-052)+(1.004)+(5.008), (I-052)+(1.004)+(5.009), (I-052)+(1.004)+(5.011), (I-052)+(1.004)+(5.012), (I-052)+(1.004)+(5.013), (I-052)+(1.004)+(5.015), (I-052)+(1.004)+(5.018), (I-052)+(1.004)+(5.019), (I-052)+(1.004)+(6.002), (I-052)+(1.004)+(7.001), (I-052)+(1.004)+(7.005), (I-052)+(1.004)+(9.002), (I-052)+(1.004)+(9.004), (I-052)+(1.004)+(14.001), (I-052)+(1.004)+(14.002), (I-052)+(1.004)+(15.008), (I-052)+(1.004)+(15.011), (I-052)+(1.004)+(15.012), (I-052)+(1.004)+(15.016), (I-052)+(1.004)+(15.025), (I-052)+(1.004)+(15.027), (I-052)+(1.004)+(15.047), (I-052)+(1.004)+(15.063), (I-052)+(1.004)+(15.064), (I-052)+(1.004)+(16.001), (I-052)+(1.004)+(16.005), (I-052)+(1.004)+(17.001), (I-052)+(1.004)+(17.002), (I-052)+(1.004)+(17.003), (I-052)+(1.004)+(17.008), (I-052)+(1.004)+(18.001), (I-052)+(1.005)+(1.001), (I-052)+(1.005)+(1.002), (I-052)+(1.005)+(1.003), (I-052)+(1.005)+(1.004), (I-052)+(1.005)+(1.006), (I-052)+(1.005)+(1.007), (I-052)+(1.005)+(1.010), (I-052)+(1.005)+(1.011), (I-052)+(1.005)+(1.012), (I-052)+(1.005)+(1.013), (I-052)+(1.005)+(1.017), (I-052)+(1.005)+(1.018), (I-052)+(1.005)+(1.020), (I-052)+(1.005)+(1.021), (I-052)+(1.005)+(1.026), (I-052)+(1.005)+(1.027), (I-052)+(1.005)+(1.055), (I-052)+(1.005)+(1.059), (I-052)+(1.005)+(1.092), (I-052)+(1.005)+(2.001), (I-052)+(1.005)+(2.002), (I-052)+(1.005)+(2.003), (I-052)+(1.005)+(2.005), (I-052)+(1.005)+(2.007), (I-052)+(1.005)+(2.009), (I-052)+(1.005)+(2.010), (I-052)+(1.005)+(2.011), (I-052)+(1.005)+(2.012), (I-052)+(1.005)+(2.013), (I-052)+(1.005)+(2.014), (I-052)+(1.005)+(2.015), (I-052)+(1.005)+(2.016), (I-052)+(1.005)+(2.017), (I-052)+(1.005)+(2.018), (I-052)+(1.005)+(2.019), (I-052)+(1.005)+(2.021), (I-052)+(1.005)+(2.028), (I-052)+(1.005)+(2.030), (I-052)+(1.005)+(2.038), (I-052)+(1.005)+(3.003), (I-052)+(1.005)+(3.007), (I-052)+(1.005)+(3.012), (I-052)+(1.005)+(3.013), (I-052)+(1.005)+(3.016), (I-052)+(1.005)+(3.017), (I-052)+(1.005)+(3.020), (I-052)+(1.005)+(3.025), (I-052)+(1.005)+(3.026), (I-052)+(1.005)+(3.030), (I-052)+(1.005)+(3.031), (I-052)+(1.005)+(5.003), (I-052)+(1.005)+(5.004), (I-052)+(1.005)+(5.005), (I-052)+(1.005)+(5.008), (I-052)+(1.005)+(5.009), (I-052)+(1.005)+(5.011), (I-052)+(1.005)+(5.012), (I-052)+(1.005)+(5.013), (I-052)+(1.005)+(5.015), (I-052)+(1.005)+(5.018), (I-052)+(1.005)+(5.019), (I-052)+(1.005)+(6.002), (I-052)+(1.005)+(7.001), (I-052)+(1.005)+(7.005), (I-052)+(1.005)+(9.002), (I-052)+(1.005)+(9.004), (I-052)+(1.005)+(14.001), (I-052)+(1.005)+(14.002), (I-052)+(1.005)+(15.008), (I-052)+(1.005)+(15.011), (I-052)+(1.005)+(15.012), (I-052)+(1.005)+(15.016), (I-052)+(1.005)+(15.025), (I-052)+(1.005)+(15.027), (I-052)+(1.005)+(15.047), (I-052)+(1.005)+(15.063), (I-052)+(1.005)+(15.064), (I-052)+(1.005)+(16.001), (I-052)+(1.005)+(16.005), (I-052)+(1.005)+(17.001), (I-052)+(1.005)+(17.002), (I-052)+(1.005)+(17.003), (I-052)+(1.005)+(17.008), (I-052)+(1.005)+(18.001), (I-052)+(1.006)+(1.001), (I-052)+(1.006)+(1.002), (I-052)+(1.006)+(1.003), (I-052)+(1.006)+(1.004), (I-052)+(1.006)+(1.005), (I-052)+(1.006)+(1.007), (I-052)+(1.006)+(1.010), (I-052)+(1.006)+(1.011), (I-052)+(1.006)+(1.012), (I-052)+(1.006)+(1.013), (I-052)+(1.006)+(1.017), (I-052)+(1.006)+(1.018), (I-052)+(1.006)+(1.020), (I-052)+(1.006)+(1.021), (I-052)+(1.006)+(1.026), (I-052)+(1.006)+(1.027), (I-052)+(1.006)+(1.055), (I-052)+(1.006)+(1.059), (I-052)+(1.006)+(1.092), (I-052)+(1.006)+(2.001), (I-052)+(1.006)+(2.002), (I-052)+(1.006)+(2.003), (I-052)+(1.006)+(2.005), (I-052)+(1.006)+(2.007), (I-052)+(1.006)+(2.009), (I-052)+(1.006)+(2.010), (I-052)+(1.006)+(2.011), (I-052)+(1.006)+(2.012), (I-052)+(1.006)+(2.013), (I-052)+(1.006)+(2.014), (I-052)+(1.006)+(2.015), (I-052)+(1.006)+(2.016), (I-052)+(1.006)+(2.017), (I-052)+(1.006)+(2.018), (I-052)+(1.006)+(2.019), (I-052)+(1.006)+(2.021), (I-052)+(1.006)+(2.028), (I-052)+(1.006)+(2.030), (I-052)+(1.006)+(2.038), (I-052)+(1.006)+(3.003), (I-052)+(1.006)+(3.007), (I-052)+(1.006)+(3.012), (I-052)+(1.006)+(3.013), (I-052)+(1.006)+(3.016), (I-052)+(1.006)+(3.017), (I-052)+(1.006)+(3.020), (I-052)+(1.006)+(3.025), (I-052)+(1.006)+(3.026), (I-052)+(1.006)+(3.030), (I-052)+(1.006)+(3.031), (I-052)+(1.006)+(5.003), (I-052)+(1.006)+(5.004), (I-052)+(1.006)+(5.005), (1-052)+(1.006)+(5.008), (I-052)+(1.006)+(5.009), (I-052)+(1.006)+(5.011), (I-052)+(1.006)+(5.012), (I-052)+(1.006)+(5.013), (I-052)+(1.006)+(5.015), (I-052)+(1.006)+(5.018), (I-052)+(1.006)+(5.019), (I-052)+(1.006)+(6.002), (I-052)+(1.006)+(7.001), (I-052)+(1.006)+(7.005), (I-052)+(1.006)+(9.002), (I-052)+(1.006)+(9.004), (I-052)+(1.006)+(14.001), (I-052)+(1.006)+(14.002), (I-052)+(1.006)+(15.008), (I-052)+(1.006)+(15.011), (I-052)+(1.006)+(15.012), (I-052)+(1.006)+(15.016), (I-052)+(1.006)+(15.025), (I-052)+(1.006)+(15.027), (I-052)+(1.006)+(15.047), (I-052)+(1.006)+(15.063), (I-052)+(1.006)+(15.064), (I-052)+(1.006)+(16.001), (I-052)+(1.006)+(16.005), (I-052)+(1.006)+(17.001), (I-052)+(1.006)+(17.002), (I-052)+(1.006)+(17.003), (I-052)+(1.006)+(17.008), (I-052)+(1.006)+(18.001), (I-052)+(1.007)+(1.001), (I-052)+(1.007)+(1.002), (I-052)+(1.007)+(1.003), (I-052)+(1.007)+(1.004), (I-052)+(1.007)+(1.005), (I-052)+(1.007)+(1.006), (I-052)+(1.007)+(1.010), (I-052)+(1.007)+(1.011), (I-052)+(1.007)+(1.012), (I-052)+(1.007)+(1.013), (I-052)+(1.007)+(1.017), (I-052)+(1.007)+(1.018), (I-052)+(1.007)+(1.020), (I-052)+(1.007)+(1.021), (I-052)+(1.007)+(1.026), (I-052)+(1.007)+(1.027), (I-052)+(1.007)+(1.055), (I-052)+(1.007)+(1.059), (I-052)+(1.007)+(1.092), (I-052)+(1.007)+(2.001), (I-052)+(1.007)+(2.002), (I-052)+(1.007)+(2.003), (I-052)+(1.007)+(2.005), (I-052)+(1.007)+(2.007), (I-052)+(1.007)+(2.009), (I-052)+(1.007)+(2.010), (I-052)+(1.007)+(2.011), (I-052)+(1.007)+(2.012), (I-052)+(1.007)+(2.013), (I-052)+(1.007)+(2.014), (I-052)+(1.007)+(2.015), (I-052)+(1.007)+(2.016), (I-052)+(1.007)+(2.017), (I-052)+(1.007)+(2.018), (I-052)+(1.007)+(2.019), (I-052)+(1.007)+(2.021), (I-052)+(1.007)+(2.028), (I-052)+(1.007)+(2.030), (I-052)+(1.007)+(2.038), (I-052)+(1.007)+(3.003), (I-052)+(1.007)+(3.007), (I-052)+(1.007)+(3.012), (I-052)+(1.007)+(3.013), (I-052)+(1.007)+(3.016), (I-052)+(1.007)+(3.017), (I-052)+(1.007)+(3.020), (I-052)+(1.007)+(3.025), (I-052)+(1.007)+(3.026), (I-052)+(1.007)+(3.030), (I-052)+(1.007)+(3.031), (I-052)+(1.007)+(5.003), (I-052)+(1.007)+(5.004), (I-052)+(1.007)+(5.005), (I-052)+(1.007)+(5.008), (I-052)+(1.007)+(5.009), (I-052)+(1.007)+(5.011), (I-052)+(1.007)+(5.012), (I-052)+(1.007)+(5.013), (I-052)+(1.007)+(5.015), (I-052)+(1.007)+(5.018), (I-052)+(1.007)+(5.019), (I-052)+(1.007)+(6.002), (I-052)+(1.007)+(7.001), (I-052)+(1.007)+(7.005), (I-052)+(1.007)+(9.002), (I-052)+(1.007)+(9.004), (I-052)+(1.007)+(14.001), (I-052)+(1.007)+(14.002), (I-052)+(1.007)+(15.008), (I-052)+(1.007)+(15.011), (I-052)+(1.007)+(15.012), (I-052)+(1.007)+(15.016), (I-052)+(1.007)+(15.025), (I-052)+(1.007)+(15.027), (I-052)+(1.007)+(15.047), (I-052)+(1.007)+(15.063), (I-052)+(1.007)+(15.064), (I-052)+(1.007)+(16.001), (I-052)+(1.007)+(16.005), (I-052)+(1.007)+(17.001), (I-052)+(1.007)+(17.002), (I-052)+(1.007)+(17.003), (I-052)+(1.007)+(17.008), (I-052)+(1.007)+(18.001), (I-052)+(1.010)+(1.001), (I-052)+(1.010)+(1.002), (I-052)+(1.010)+(1.003), (I-052)+(1.010)+(1.004), (I-052)+(1.010)+(1.005), (I-052)+(1.010)+(1.006), (I-052)+(1.010)+(1.007), (I-052)+(1.010)+(1.011), (I-052)+(1.010)+(1.012), (I-052)+(1.010)+(1.013), (I-052)+(1.010)+(1.017), (I-052)+(1.010)+(1.018), (I-052)+(1.010)+(1.020), (I-052)+(1.010)+(1.021), (I-052)+(1.010)+(1.026), (I-052)+(1.010)+(1.027), (I-052)+(1.010)+(1.055), (I-052)+(1.010)+(1.059), (I-052)+(1.010)+(1.092), (I-052)+(1.010)+(2.001), (I-052)+(1.010)+(2.002), (I-052)+(1.010)+(2.003), (I-052)+(1.010)+(2.005), (I-052)+(1.010)+(2.007), (I-052)+(1.010)+(2.009), (I-052)+(1.010)+(2.010), (I-052)+(1.010)+(2.011), (I-052)+(1.010)+(2.012), (I-052)+(1.010)+(2.013), (I-052)+(1.010)+(2.014), (I-052)+(1.010)+(2.015), (I-052)+(1.010)+(2.016), (I-052)+(1.010)+(2.017), (I-052)+(1.010)+(2.018), (I-052)+(1.010)+(2.019), (I-052)+(1.010)+(2.021), (I-052)+(1.010)+(2.028), (I-052)+(1.010)+(2.030), (I-052)+(1.010)+(2.038), (I-052)+(1.010)+(3.003), (I-052)+(1.010)+(3.007), (I-052)+(1.010)+(3.012), (I-052)+(1.010)+(3.013), (I-052)+(1.010)+(3.016), (I-052)+(1.010)+(3.017), (I-052)+(1.010)+(3.020), (I-052)+(1.010)+(3.025), (I-052)+(1.010)+(3.026), (I-052)+(1.010)+(3.030), (I-052)+(1.010)+(3.031), (I-052)+(1.010)+(5.003), (I-052)+(1.010)+(5.004), (I-052)+(1.010)+(5.005), (I-052)+(1.010)+(5.008), (I-052)+(1.010)+(5.009), (I-052)+(1.010)+(5.011), (I-052)+(1.010)+(5.012), (I-052)+(1.010)+(5.013), (I-052)+(1.010)+(5.015), (I-052)+(1.010)+(5.018), (I-052)+(1.010)+(5.019), (I-052)+(1.010)+(6.002), (I-052)+(1.010)+(7.001), (I-052)+(1.010)+(7.005), (I-052)+(1.010)+(9.002), (I-052)+(1.010)+(9.004), (I-052)+(1.010)+(14.001), (I-052)+(1.010)+(14.002), (I-052)+(1.010)+(15.008), (I-052)+(1.010)+(15.011), (I-052)+(1.010)+(15.012), (I-052)+(1.010)+(15.016), (I-052)+(1.010)+(15.025), (I-052)+(1.010)+(15.027), (I-052)+(1.010)+(15.047), (I-052)+(1.010)+(15.063), (I-052)+(1.010)+(15.064), (I-052)+(1.010)+(16.001), (I-052)+(1.010)+(16.005), (I-052)+(1.010)+(17.001), (I-052)+(1.010)+(17.002), (I-052)+(1.010)+(17.003), (I-052)+(1.010)+(17.008), (I-052)+(1.010)+(18.001), (I-052)+(1.011)+(1.001), (I-052)+(1.011)+(1.002), (I-052)+(1.011)+(1.003), (I-052)+(1.011)+(1.004), (I-052)+(1.011)+(1.005), (I-052)+(1.011)+(1.006), (I-052)+(1.011)+(1.007), (I-052)+(1.011)+(1.010), (I-052)+(1.011)+(1.012), (I-052)+(1.011)+(1.013), (I-052)+(1.011)+(1.017), (I-052)+(1.011)+(1.018), (I-052)+(1.011)+(1.020), (I-052)+(1.011)+(1.021), (I-052)+(1.011)+(1.026), (I-052)+(1.011)+(1.027), (I-052)+(1.011)+(1.055), (I-052)+(1.011)+(1.059), (I-052)+(1.011)+(1.092), (I-052)+(1.011)+(2.001), (I-052)+(1.011)+(2.002), (I-052)+(1.011)+(2.003), (I-052)+(1.011)+(2.005), (I-052)+(1.011)+(2.007), (I-052)+(1.011)+(2.009), (I-052)+(1.011)+(2.010), (I-052)+(1.011)+(2.011), (I-052)+(1.011)+(2.012), (I-052)+(1.011)+(2.013), (I-052)+(1.011)+(2.014), (I-052)+(1.011)+(2.015), (I-052)+(1.011)+(2.016), (I-052)+(1.011)+(2.017), (I-052)+(1.011)+(2.018), (I-052)+(1.011)+(2.019), (I-052)+(1.011)+(2.021), (I-052)+(1.011)+(2.028), (I-052)+(1.011)+(2.030), (I-052)+(1.011)+(2.038), (I-052)+(1.011)+(3.003), (I-052)+(1.011)+(3.007), (I-052)+(1.011)+(3.012), (I-052)+(1.011)+(3.013), (I-052)+(1.011)+(3.016), (I-052)+(1.011)+(3.017), (I-052)+(1.011)+(3.020), (I-052)+(1.011)+(3.025), (I-052)+(1.011)+(3.026), (I-052)+(1.011)+(3.030), (I-052)+(1.011)+(3.031), (I-052)+(1.011)+(5.003), (I-052)+(1.011)+(5.004), (I-052)+(1.011)+(5.005), (I-052)+(1.011)+(5.008), (I-052)+(1.011)+(5.009), (I-052)+(1.011)+(5.011), (I-052)+(1.011)+(5.012), (I-052)+(1.011)+(5.013), (I-052)+(1.011)+(5.015), (I-052)+(1.011)+(5.018), (I-052)+(1.011)+(5.019), (I-052)+(1.011)+(6.002), (I-052)+(1.011)+(7.001), (I-052)+(1.011)+(7.005), (I-052)+(1.011)+(9.002), (I-052)+(1.011)+(9.004), (I-052)+(1.011)+(14.001), (I-052)+(1.011)+(14.002), (I-052)+(1.011)+(15.008), (I-052)+(1.011)+(15.011), (I-052)+(1.011)+(15.012), (I-052)+(1.011)+(15.016), (I-052)+(1.011)+(15.025), (I-052)+(1.011)+(15.027), (I-052)+(1.011)+(15.047), (I-052)+(1.011)+(15.063), (I-052)+(1.011)+(15.064), (I-052)+(1.011)+(16.001), (I-052)+(1.011)+(16.005), (I-052)+(1.011)+(17.001), (I-052)+(1.011)+(17.002), (I-052)+(1.011)+(17.003), (I-052)+(1.011)+(17.008), (I-052)+(1.011)+(18.001), (I-052)+(1.012)+(1.001), (I-052)+(1.012)+(1.002), (I-052)+(1.012)+(1.003), (I-052)+(1.012)+(1.004), (I-052)+(1.012)+(1.005), (I-052)+(1.012)+(1.006), (I-052)+(1.012)+(1.007), (I-052)+(1.012)+(1.010), (I-052)+(1.012)+(1.011), (I-052)+(1.012)+(1.013), (I-052)+(1.012)+(1.017), (I-052)+(1.012)+(1.018), (I-052)+(1.012)+(1.020), (I-052)+(1.012)+(1.021), (I-052)+(1.012)+(1.026), (I-052)+(1.012)+(1.027), (I-052)+(1.012)+(1.055), (I-052)+(1.012)+(1.059), (I-052)+(1.012)+(1.092), (I-052)+(1.012)+(2.001), (I-052)+(1.012)+(2.002), (I-052)+(1.012)+(2.003), (I-052)+(1.012)+(2.005), (I-052)+(1.012)+(2.007), (I-052)+(1.012)+(2.009), (I-052)+(1.012)+(2.010), (I-052)+(1.012)+(2.011), (I-052)+(1.012)+(2.012), (I-052)+(1.012)+(2.013), (I-052)+(1.012)+(2.014), (I-052)+(1.012)+(2.015), (I-052)+(1.012)+(2.016), (I-052)+(1.012)+(2.017), (I-052)+(1.012)+(2.018), (I-052)+(1.012)+(2.019), (I-052)+(1.012)+(2.021), (I-052)+(1.012)+(2.028), (I-052)+(1.012)+(2.030), (I-052)+(1.012)+(2.038), (I-052)+(1.012)+(3.003), (I-052)+(1.012)+(3.007), (I-052)+(1.012)+(3.012), (I-052)+(1.012)+(3.013), (I-052)+(1.012)+(3.016), (I-052)+(1.012)+(3.017), (I-052)+(1.012)+(3.020), (I-052)+(1.012)+(3.025), (I-052)+(1.012)+(3.026), (I-052)+(1.012)+(3.030), (I-052)+(1.012)+(3.031), (I-052)+(1.012)+(5.003), (I-052)+(1.012)+(5.004), (I-052)+(1.012)+(5.005), (I-052)+(1.012)+(5.008), (I-052)+(1.012)+(5.009), (I-052)+(1.012)+(5.011), (I-052)+(1.012)+(5.012), (I-052)+(1.012)+(5.013), (I-052)+(1.012)+(5.015), (I-052)+(1.012)+(5.018), (I-052)+(1.012)+(5.019), (I-052)+(1.012)+(6.002), (I-052)+(1.012)+(7.001), (I-052)+(1.012)+(7.005), (I-052)+(1.012)+(9.002), (I-052)+(1.012)+(9.004), (I-052)+(1.012)+(14.001), (I-052)+(1.012)+(14.002), (I-052)+(1.012)+(15.008), (I-052)+(1.012)+(15.011), (I-052)+(1.012)+(15.012), (I-052)+(1.012)+(15.016), (I-052)+(1.012)+(15.025), (I-052)+(1.012)+(15.027), (I-052)+(1.012)+(15.047), (I-052)+(1.012)+(15.063), (I-052)+(1.012)+(15.064), (I-052)+(1.012)+(16.001), (I-052)+(1.012)+(16.005), (I-052)+(1.012)+(17.001), (I-052)+(1.012)+(17.002), (I-052)+(1.012)+(17.003), (I-052)+(1.012)+(17.008), (I-052)+(1.012)+(18.001), (I-052)+(1.013)+(1.001), (I-052)+(1.013)+(1.002), (I-052)+(1.013)+(1.003), (I-052)+(1.013)+(1.004), (I-052)+(1.013)+(1.005), (I-052)+(1.013)+(1.006), (I-052)+(1.013)+(1.007), (I-052)+(1.013)+(1.010), (I-052)+(1.013)+(1.011), (I-052)+(1.013)+(1.012), (I-052)+(1.013)+(1.017), (I-052)+(1.013)+(1.018), (I-052)+(1.013)+(1.020), (I-052)+(1.013)+(1.021), (I-052)+(1.013)+(1.026), (I-052)+(1.013)+(1.027), (I-052)+(1.013)+(1.055), (I-052)+(1.013)+(1.059), (I-052)+(1.013)+(1.092), (I-052)+(1.013)+(2.001), (I-052)+(1.013)+(2.002), (I-052)+(1.013)+(2.003), (I-052)+(1.013)+(2.005), (I-052)+(1.013)+(2.007), (I-052)+(1.013)+(2.009), (I-052)+(1.013)+(2.010), (I-052)+(1.013)+(2.011), (I-052)+(1.013)+(2.012), (I-052)+(1.013)+(2.013), (I-052)+(1.013)+(2.014), (I-052)+(1.013)+(2.015), (I-052)+(1.013)+(2.016), (I-052)+(1.013)+(2.017), (I-052)+(1.013)+(2.018), (I-052)+(1.013)+(2.019), (I-052)+(1.013)+(2.021), (I-052)+(1.013)+(2.028), (I-052)+(1.013)+(2.030), (I-052)+(1.013)+(2.038), (I-052)+(1.013)+(3.003), (I-052)+(1.013)+(3.007), (I-052)+(1.013)+(3.012), (I-052)+(1.013)+(3.013), (I-052)+(1.013)+(3.016), (I-052)+(1.013)+(3.017), (I-052)+(1.013)+(3.020), (I-052)+(1.013)+(3.025), (I-052)+(1.013)+(3.026), (I-052)+(1.013)+(3.030), (I-052)+(1.013)+(3.031), (I-052)+(1.013)+(5.003), (I-052)+(1.013)+(5.004), (I-052)+(1.013)+(5.005), (I-052)+(1.013)+(5.008), (I-052)+(1.013)+(5.009), (I-052)+(1.013)+(5.011), (I-052)+(1.013)+(5.012), (I-052)+(1.013)+(5.013), (I-052)+(1.013)+(5.015), (I-052)+(1.013)+(5.018), (I-052)+(1.013)+(5.019), (I-052)+(1.013)+(6.002), (I-052)+(1.013)+(7.001), (I-052)+(1.013)+(7.005), (I-052)+(1.013)+(9.002), (I-052)+(1.013)+(9.004), (I-052)+(1.013)+(14.001), (I-052)+(1.013)+(14.002), (I-052)+(1.013)+(15.008), (I-052)+(1.013)+(15.011), (I-052)+(1.013)+(15.012), (I-052)+(1.013)+(15.016), (I-052)+(1.013)+(15.025), (I-052)+(1.013)+(15.027), (I-052)+(1.013)+(15.047), (I-052)+(1.013)+(15.063), (I-052)+(1.013)+(15.064), (I-052)+(1.013)+(16.001), (I-052)+(1.013)+(16.005), (I-052)+(1.013)+(17.001), (I-052)+(1.013)+(17.002), (I-052)+(1.013)+(17.003), (I-052)+(1.013)+(17.008), (I-052)+(1.013)+(18.001), (I-052)+(1.017)+(1.001), (I-052)+(1.017)+(1.002), (I-052)+(1.017)+(1.003), (I-052)+(1.017)+(1.004), (I-052)+(1.017)+(1.005), (I-052)+(1.017)+(1.006), (I-052)+(1.017)+(1.007), (I-052)+(1.017)+(1.010), (I-052)+(1.017)+(1.011), (I-052)+(1.017)+(1.012), (I-052)+(1.017)+(1.013), (I-052)+(1.017)+(1.018), (I-052)+(1.017)+(1.020), (I-052)+(1.017)+(1.021), (I-052)+(1.017)+(1.026), (I-052)+(1.017)+(1.027), (I-052)+(1.017)+(1.055), (I-052)+(1.017)+(1.059), (I-052)+(1.017)+(1.092), (I-052)+(1.017)+(2.001), (I-052)+(1.017)+(2.002), (I-052)+(1.017)+(2.003), (I-052)+(1.017)+(2.005), (I-052)+(1.017)+(2.007), (I-052)+(1.017)+(2.009), (I-052)+(1.017)+(2.010), (I-052)+(1.017)+(2.011), (I-052)+(1.017)+(2.012), (I-052)+(1.017)+(2.013), (I-052)+(1.017)+(2.014), (I-052)+(1.017)+(2.015), (I-052)+(1.017)+(2.016), (I-052)+(1.017)+(2.017), (I-052)+(1.017)+(2.018), (I-052)+(1.017)+(2.019), (I-052)+(1.017)+(2.021), (I-052)+(1.017)+(2.028), (I-052)+(1.017)+(2.030), (I-052)+(1.017)+(2.038), (I-052)+(1.017)+(3.003), (I-052)+(1.017)+(3.007), (I-052)+(1.017)+(3.012), (I-052)+(1.017)+(3.013), (I-052)+(1.017)+(3.016), (I-052)+(1.017)+(3.017), (I-052)+(1.017)+(3.020), (I-052)+(1.017)+(3.025), (I-052)+(1.017)+(3.026), (I-052)+(1.017)+(3.030), (I-052)+(1.017)+(3.031), (I-052)+(1.017)+(5.003), (I-052)+(1.017)+(5.004), (I-052)+(1.017)+(5.005), (I-052)+(1.017)+(5.008), (I-052)+(1.017)+(5.009), (I-052)+(1.017)+(5.011), (I-052)+(1.017)+(5.012), (I-052)+(1.017)+(5.013), (I-052)+(1.017)+(5.015), (I-052)+(1.017)+(5.018), (I-052)+(1.017)+(5.019), (I-052)+(1.017)+(6.002), (I-052)+(1.017)+(7.001), (I-052)+(1.017)+(7.005), (I-052)+(1.017)+(9.002), (I-052)+(1.017)+(9.004), (I-052)+(1.017)+(14.001), (I-052)+(1.017)+(14.002), (I-052)+(1.017)+(15.008), (I-052)+(1.017)+(15.011), (I-052)+(1.017)+(15.012), (I-052)+(1.017)+(15.016), (I-052)+(1.017)+(15.025), (I-052)+(1.017)+(15.027), (I-052)+(1.017)+(15.047), (I-052)+(1.017)+(15.063), (I-052)+(1.017)+(15.064), (I-052)+(1.017)+(16.001), (I-052)+(1.017)+(16.005), (I-052)+(1.017)+(17.001), (I-052)+(1.017)+(17.002), (I-052)+(1.017)+(17.003), (I-052)+(1.017)+(17.008), (I-052)+(1.017)+(18.001), (I-052)+(1.018)+(1.001), (I-052)+(1.018)+(1.002), (I-052)+(1.018)+(1.003), (I-052)+(1.018)+(1.004), (I-052)+(1.018)+(1.005), (I-052)+(1.018)+(1.006), (I-052)+(1.018)+(1.007), (I-052)+(1.018)+(1.010), (I-052)+(1.018)+(1.011), (I-052)+(1.018)+(1.012), (I-052)+(1.018)+(1.013), (I-052)+(1.018)+(1.017), (I-052)+(1.018)+(1.020), (I-052)+(1.018)+(1.021), (I-052)+(1.018)+(1.026), (I-052)+(1.018)+(1.027), (I-052)+(1.018)+(1.055), (I-052)+(1.018)+(1.059), (I-052)+(1.018)+(1.092), (I-052)+(1.018)+(2.001), (I-052)+(1.018)+(2.002), (I-052)+(1.018)+(2.003), (I-052)+(1.018)+(2.005), (I-052)+(1.018)+(2.007), (I-052)+(1.018)+(2.009), (I-052)+(1.018)+(2.010), (I-052)+(1.018)+(2.011), (I-052)+(1.018)+(2.012), (I-052)+(1.018)+(2.013), (I-052)+(1.018)+(2.014), (I-052)+(1.018)+(2.015), (I-052)+(1.018)+(2.016), (I-052)+(1.018)+(2.017), (I-052)+(1.018)+(2.018), (I-052)+(1.018)+(2.019), (I-052)+(1.018)+(2.021), (I-052)+(1.018)+(2.028), (I-052)+(1.018)+(2.030), (I-052)+(1.018)+(2.038), (I-052)+(1.018)+(3.003), (I-052)+(1.018)+(3.007), (I-052)+(1.018)+(3.012), (I-052)+(1.018)+(3.013), (I-052)+(1.018)+(3.016), (I-052)+(1.018)+(3.017), (I-052)+(1.018)+(3.020), (I-052)+(1.018)+(3.025), (I-052)+(1.018)+(3.026), (I-052)+(1.018)+(3.030), (I-052)+(1.018)+(3.031), (I-052)+(1.018)+(5.003), (I-052)+(1.018)+(5.004), (I-052)+(1.018)+(5.005), (I-052)+(1.018)+(5.008), (I-052)+(1.018)+(5.009), (I-052)+(1.018)+(5.011), (I-052)+(1.018)+(5.012), (I-052)+(1.018)+(5.013), (I-052)+(1.018)+(5.015), (I-052)+(1.018)+(5.018), (I-052)+(1.018)+(5.019), (I-052)+(1.018)+(6.002), (I-052)+(1.018)+(7.001), (I-052)+(1.018)+(7.005), (I-052)+(1.018)+(9.002), (I-052)+(1.018)+(9.004), (I-052)+(1.018)+(14.001), (I-052)+(1.018)+(14.002), (I-052)+(1.018)+(15.008), (I-052)+(1.018)+(15.011), (I-052)+(1.018)+(15.012), (I-052)+(1.018)+(15.016), (I-052)+(1.018)+(15.025), (I-052)+(1.018)+(15.027), (I-052)+(1.018)+(15.047), (I-052)+(1.018)+(15.063), (I-052)+(1.018)+(15.064), (I-052)+(1.018)+(16.001), (I-052)+(1.018)+(16.005), (I-052)+(1.018)+(17.001), (I-052)+(1.018)+(17.002), (I-052)+(1.018)+(17.003), (I-052)+(1.018)+(17.008), (I-052)+(1.018)+(18.001), (I-052)+(1.020)+(1.001), (I-052)+(1.020)+(1.002), (I-052)+(1.020)+(1.003), (I-052)+(1.020)+(1.004), (I-052)+(1.020)+(1.005), (I-052)+(1.020)+(1.006), (I-052)+(1.020)+(1.007), (I-052)+(1.020)+(1.010), (I-052)+(1.020)+(1.011), (I-052)+(1.020)+(1.012), (I-052)+(1.020)+(1.013), (I-052)+(1.020)+(1.017), (I-052)+(1.020)+(1.018), (I-052)+(1.020)+(1.021), (I-052)+(1.020)+(1.026), (I-052)+(1.020)+(1.027), (I-052)+(1.020)+(1.055), (I-052)+(1.020)+(1.059), (I-052)+(1.020)+(1.092), (I-052)+(1.020)+(2.001), (I-052)+(1.020)+(2.002), (I-052)+(1.020)+(2.003), (I-052)+(1.020)+(2.005), (I-052)+(1.020)+(2.007), (I-052)+(1.020)+(2.009), (I-052)+(1.020)+(2.010), (I-052)+(1.020)+(2.011), (I-052)+(1.020)+(2.012), (I-052)+(1.020)+(2.013), (I-052)+(1.020)+(2.014), (I-052)+(1.020)+(2.015), (I-052)+(1.020)+(2.016), (I-052)+(1.020)+(2.017), (I-052)+(1.020)+(2.018), (I-052)+(1.020)+(2.019), (I-052)+(1.020)+(2.021), (I-052)+(1.020)+(2.028), (I-052)+(1.020)+(2.030), (I-052)+(1.020)+(2.038), (I-052)+(1.020)+(3.003), (I-052)+(1.020)+(3.007), (I-052)+(1.020)+(3.012), (I-052)+(1.020)+(3.013), (I-052)+(1.020)+(3.016), (I-052)+(1.020)+(3.017), (I-052)+(1.020)+(3.020), (I-052)+(1.020)+(3.025), (I-052)+(1.020)+(3.026), (I-052)+(1.020)+(3.030), (I-052)+(1.020)+(3.031), (I-052)+(1.020)+(5.003), (I-052)+(1.020)+(5.004), (I-052)+(1.020)+(5.005), (I-052)+(1.020)+(5.008), (I-052)+(1.020)+(5.009), (I-052)+(1.020)+(5.011), (I-052)+(1.020)+(5.012), (I-052)+(1.020)+(5.013), (I-052)+(1.020)+(5.015), (I-052)+(1.020)+(5.018), (I-052)+(1.020)+(5.019), (I-052)+(1.020)+(6.002), (I-052)+(1.020)+(7.001), (I-052)+(1.020)+(7.005), (I-052)+(1.020)+(9.002), (I-052)+(1.020)+(9.004), (I-052)+(1.020)+(14.001), (I-052)+(1.020)+(14.002), (I-052)+(1.020)+(15.008), (I-052)+(1.020)+(15.011), (I-052)+(1.020)+(15.012), (I-052)+(1.020)+(15.016), (I-052)+(1.020)+(15.025), (I-052)+(1.020)+(15.027), (I-052)+(1.020)+(15.047), (I-052)+(1.020)+(15.063), (I-052)+(1.020)+(15.064), (I-052)+(1.020)+(16.001), (I-052)+(1.020)+(16.005), (I-052)+(1.020)+(17.001), (I-052)+(1.020)+(17.002), (I-052)+(1.020)+(17.003), (I-052)+(1.020)+(17.008), (I-052)+(1.020)+(18.001), (I-052)+(1.021)+(1.001), (I-052)+(1.021)+(1.002), (I-052)+(1.021)+(1.003), (I-052)+(1.021)+(1.004), (I-052)+(1.021)+(1.005), (I-052)+(1.021)+(1.006), (I-052)+(1.021)+(1.007), (I-052)+(1.021)+(1.010), (I-052)+(1.021)+(1.011), (I-052)+(1.021)+(1.012), (I-052)+(1.021)+(1.013), (I-052)+(1.021)+(1.017), (I-052)+(1.021)+(1.018), (I-052)+(1.021)+(1.020), (I-052)+(1.021)+(1.026), (I-052)+(1.021)+(1.027), (I-052)+(1.021)+(1.055), (I-052)+(1.021)+(1.059), (I-052)+(1.021)+(1.092), (I-052)+(1.021)+(2.001), (I-052)+(1.021)+(2.002), (I-052)+(1.021)+(2.003), (I-052)+(1.021)+(2.005), (I-052)+(1.021)+(2.007), (I-052)+(1.021)+(2.009), (I-052)+(1.021)+(2.010), (I-052)+(1.021)+(2.011), (I-052)+(1.021)+(2.012), (I-052)+(1.021)+(2.013), (I-052)+(1.021)+(2.014), (I-052)+(1.021)+(2.015), (I-052)+(1.021)+(2.016), (I-052)+(1.021)+(2.017), (I-052)+(1.021)+(2.018), (I-052)+(1.021)+(2.019), (I-052)+(1.021)+(2.021), (I-052)+(1.021)+(2.028), (I-052)+(1.021)+(2.030), (I-052)+(1.021)+(2.038), (I-052)+(1.021)+(3.003), (I-052)+(1.021)+(3.007), (I-052)+(1.021)+(3.012), (I-052)+(1.021)+(3.013), (I-052)+(1.021)+(3.016), (I-052)+(1.021)+(3.017), (I-052)+(1.021)+(3.020), (I-052)+(1.021)+(3.025), (I-052)+(1.021)+(3.026), (I-052)+(1.021)+(3.030), (I-052)+(1.021)+(3.031), (I-052)+(1.021)+(5.003), (I-052)+(1.021)+(5.004), (I-052)+(1.021)+(5.005), (I-052)+(1.021)+(5.008), (I-052)+(1.021)+(5.009), (I-052)+(1.021)+(5.011), (I-052)+(1.021)+(5.012), (I-052)+(1.021)+(5.013), (I-052)+(1.021)+(5.015), (I-052)+(1.021)+(5.018), (I-052)+(1.021)+(5.019), (I-052)+(1.021)+(6.002), (I-052)+(1.021)+(7.001), (I-052)+(1.021)+(7.005), (I-052)+(1.021)+(9.002), (I-052)+(1.021)+(9.004), (I-052)+(1.021)+(14.001), (I-052)+(1.021)+(14.002), (I-052)+(1.021)+(15.008), (I-052)+(1.021)+(15.011), (I-052)+(1.021)+(15.012), (I-052)+(1.021)+(15.016), (I-052)+(1.021)+(15.025), (I-052)+(1.021)+(15.027), (I-052)+(1.021)+(15.047), (I-052)+(1.021)+(15.063), (I-052)+(1.021)+(15.064), (I-052)+(1.021)+(16.001), (I-052)+(1.021)+(16.005), (I-052)+(1.021)+(17.001), (I-052)+(1.021)+(17.002), (I-052)+(1.021)+(17.003), (I-052)+(1.021)+(17.008), (I-052)+(1.021)+(18.001), (I-052)+(1.026)+(1.001), (I-052)+(1.026)+(1.002), (I-052)+(1.026)+(1.003), (I-052)+(1.026)+(1.004), (I-052)+(1.026)+(1.005), (I-052)+(1.026)+(1.006), (I-052)+(1.026)+(1.007), (I-052)+(1.026)+(1.010), (I-052)+(1.026)+(1.011), (I-052)+(1.026)+(1.012), (I-052)+(1.026)+(1.013), (I-052)+(1.026)+(1.017), (I-052)+(1.026)+(1.018), (I-052)+(1.026)+(1.020), (I-052)+(1.026)+(1.021), (I-052)+(1.026)+(1.027), (I-052)+(1.026)+(1.055), (I-052)+(1.026)+(1.059), (I-052)+(1.026)+(1.092), (I-052)+(1.026)+(2.001), (I-052)+(1.026)+(2.002), (I-052)+(1.026)+(2.003), (I-052)+(1.026)+(2.005), (I-052)+(1.026)+(2.007), (I-052)+(1.026)+(2.009), (I-052)+(1.026)+(2.010), (I-052)+(1.026)+(2.011), (I-052)+(1.026)+(2.012), (I-052)+(1.026)+(2.013), (I-052)+(1.026)+(2.014), (I-052)+(1.026)+(2.015), (I-052)+(1.026)+(2.016), (I-052)+(1.026)+(2.017), (I-052)+(1.026)+(2.018), (I-052)+(1.026)+(2.019), (I-052)+(1.026)+(2.021), (I-052)+(1.026)+(2.028), (I-052)+(1.026)+(2.030), (I-052)+(1.026)+(2.038), (I-052)+(1.026)+(3.003), (I-052)+(1.026)+(3.007), (I-052)+(1.026)+(3.012), (I-052)+(1.026)+(3.013), (I-052)+(1.026)+(3.016), (I-052)+(1.026)+(3.017), (I-052)+(1.026)+(3.020), (I-052)+(1.026)+(3.025), (I-052)+(1.026)+(3.026), (I-052)+(1.026)+(3.030), (I-052)+(1.026)+(3.031), (I-052)+(1.026)+(5.003), (I-052)+(1.026)+(5.004), (I-052)+(1.026)+(5.005), (I-052)+(1.026)+(5.008), (I-052)+(1.026)+(5.009), (I-052)+(1.026)+(5.011), (I-052)+(1.026)+(5.012), (I-052)+(1.026)+(5.013), (I-052)+(1.026)+(5.015), (I-052)+(1.026)+(5.018), (I-052)+(1.026)+(5.019), (I-052)+(1.026)+(6.002), (I-052)+(1.026)+(7.001), (I-052)+(1.026)+(7.005), (I-052)+(1.026)+(9.002), (I-052)+(1.026)+(9.004), (I-052)+(1.026)+(14.001), (I-052)+(1.026)+(14.002), (I-052)+(1.026)+(15.008), (I-052)+(1.026)+(15.011), (I-052)+(1.026)+(15.012), (I-052)+(1.026)+(15.016), (I-052)+(1.026)+(15.025), (I-052)+(1.026)+(15.027), (I-052)+(1.026)+(15.047), (I-052)+(1.026)+(15.063), (I-052)+(1.026)+(15.064), (I-052)+(1.026)+(16.001), (I-052)+(1.026)+(16.005), (I-052)+(1.026)+(17.001), (I-052)+(1.026)+(17.002), (I-052)+(1.026)+(17.003), (I-052)+(1.026)+(17.008), (I-052)+(1.026)+(18.001), (I-052)+(1.027)+(1.001), (I-052)+(1.027)+(1.002), (I-052)+(1.027)+(1.003), (I-052)+(1.027)+(1.004), (I-052)+(1.027)+(1.005), (I-052)+(1.027)+(1.006), (I-052)+(1.027)+(1.007), (I-052)+(1.027)+(1.010), (I-052)+(1.027)+(1.011), (I-052)+(1.027)+(1.012), (I-052)+(1.027)+(1.013), (I-052)+(1.027)+(1.017), (I-052)+(1.027)+(1.018), (I-052)+(1.027)+(1.020), (I-052)+(1.027)+(1.021), (I-052)+(1.027)+(1.026), (I-052)+(1.027)+(1.055), (I-052)+(1.027)+(1.059), (I-052)+(1.027)+(1.092), (I-052)+(1.027)+(2.001), (I-052)+(1.027)+(2.002), (I-052)+(1.027)+(2.003), (I-052)+(1.027)+(2.005), (I-052)+(1.027)+(2.007), (I-052)+(1.027)+(2.009), (I-052)+(1.027)+(2.010), (I-052)+(1.027)+(2.011), (I-052)+(1.027)+(2.012), (I-052)+(1.027)+(2.013), (I-052)+(1.027)+(2.014), (I-052)+(1.027)+(2.015), (I-052)+(1.027)+(2.016), (I-052)+(1.027)+(2.017), (I-052)+(1.027)+(2.018), (I-052)+(1.027)+(2.019), (I-052)+(1.027)+(2.021), (I-052)+(1.027)+(2.028), (I-052)+(1.027)+(2.030), (I-052)+(1.027)+(2.038), (I-052)+(1.027)+(3.003), (I-052)+(1.027)+(3.007), (I-052)+(1.027)+(3.012), (I-052)+(1.027)+(3.013), (I-052)+(1.027)+(3.016), (I-052)+(1.027)+(3.017), (I-052)+(1.027)+(3.020), (I-052)+(1.027)+(3.025), (I-052)+(1.027)+(3.026), (I-052)+(1.027)+(3.030), (I-052)+(1.027)+(3.031), (I-052)+(1.027)+(5.003), (I-052)+(1.027)+(5.004), (I-052)+(1.027)+(5.005), (I-052)+(1.027)+(5.008), (I-052)+(1.027)+(5.009), (I-052)+(1.027)+(5.011), (I-052)+(1.027)+(5.012), (I-052)+(1.027)+(5.013), (I-052)+(1.027)+(5.015), (I-052)+(1.027)+(5.018), (I-052)+(1.027)+(5.019), (I-052)+(1.027)+(6.002), (I-052)+(1.027)+(7.001), (I-052)+(1.027)+(7.005), (I-052)+(1.027)+(9.002), (I-052)+(1.027)+(9.004), (I-052)+(1.027)+(14.001), (I-052)+(1.027)+(14.002), (I-052)+(1.027)+(15.008), (I-052)+(1.027)+(15.011), (I-052)+(1.027)+(15.012), (I-052)+(1.027)+(15.016), (I-052)+(1.027)+(15.025), (I-052)+(1.027)+(15.027), (I-052)+(1.027)+(15.047), (I-052)+(1.027)+(15.063), (I-052)+(1.027)+(15.064), (I-052)+(1.027)+(16.001), (I-052)+(1.027)+(16.005), (I-052)+(1.027)+(17.001), (I-052)+(1.027)+(17.002), (I-052)+(1.027)+(17.003), (I-052)+(1.027)+(17.008), (I-052)+(1.027)+(18.001), (I-052)+(1.055)+(1.001), (I-052)+(1.055)+(1.002), (I-052)+(1.055)+(1.003), (I-052)+(1.055)+(1.004), (I-052)+(1.055)+(1.005), (I-052)+(1.055)+(1.006), (I-052)+(1.055)+(1.007), (I-052)+(1.055)+(1.010), (I-052)+(1.055)+(1.011), (I-052)+(1.055)+(1.012), (I-052)+(1.055)+(1.013), (I-052)+(1.055)+(1.017), (I-052)+(1.055)+(1.018), (I-052)+(1.055)+(1.020), (I-052)+(1.055)+(1.021), (I-052)+(1.055)+(1.026), (I-052)+(1.055)+(1.027), (I-052)+(1.055)+(1.059), (I-052)+(1.055)+(1.092), (I-052)+(1.055)+(2.001), (I-052)+(1.055)+(2.002), (I-052)+(1.055)+(2.003), (I-052)+(1.055)+(2.005), (I-052)+(1.055)+(2.007), (I-052)+(1.055)+(2.009), (I-052)+(1.055)+(2.010), (I-052)+(1.055)+(2.011), (I-052)+(1.055)+(2.012), (I-052)+(1.055)+(2.013), (I-052)+(1.055)+(2.014), (I-052)+(1.055)+(2.015), (I-052)+(1.055)+(2.016), (I-052)+(1.055)+(2.017), (I-052)+(1.055)+(2.018), (I-052)+(1.055)+(2.019), (I-052)+(1.055)+(2.021), (I-052)+(1.055)+(2.028), (I-052)+(1.055)+(2.030), (I-052)+(1.055)+(2.038), (I-052)+(1.055)+(3.003), (I-052)+(1.055)+(3.007), (I-052)+(1.055)+(3.012), (I-052)+(1.055)+(3.013), (I-052)+(1.055)+(3.016), (I-052)+(1.055)+(3.017), (I-052)+(1.055)+(3.020), (I-052)+(1.055)+(3.025), (I-052)+(1.055)+(3.026), (I-052)+(1.055)+(3.030), (I-052)+(1.055)+(3.031), (I-052)+(1.055)+(5.003), (I-052)+(1.055)+(5.004), (I-052)+(1.055)+(5.005), (I-052)+(1.055)+(5.008), (I-052)+(1.055)+(5.009), (I-052)+(1.055)+(5.011), (I-052)+(1.055)+(5.012), (I-052)+(1.055)+(5.013), (I-052)+(1.055)+(5.015), (I-052)+(1.055)+(5.018), (I-052)+(1.055)+(5.019), (I-052)+(1.055)+(6.002), (I-052)+(1.055)+(7.001), (I-052)+(1.055)+(7.005), (I-052)+(1.055)+(9.002), (I-052)+(1.055)+(9.004), (I-052)+(1.055)+(14.001), (I-052)+(1.055)+(14.002), (I-052)+(1.055)+(15.008), (I-052)+(1.055)+(15.011), (I-052)+(1.055)+(15.012), (I-052)+(1.055)+(15.016), (I-052)+(1.055)+(15.025), (I-052)+(1.055)+(15.027), (I-052)+(1.055)+(15.047), (I-052)+(1.055)+(15.063), (I-052)+(1.055)+(15.064), (I-052)+(1.055)+(16.001), (I-052)+(1.055)+(16.005), (I-052)+(1.055)+(17.001), (I-052)+(1.055)+(17.002), (I-052)+(1.055)+(17.003), (I-052)+(1.055)+(17.008), (I-052)+(1.055)+(18.001), (I-052)+(1.059)+(1.001), (I-052)+(1.059)+(1.002), (I-052)+(1.059)+(1.003), (I-052)+(1.059)+(1.004), (I-052)+(1.059)+(1.005), (I-052)+(1.059)+(1.006), (I-052)+(1.059)+(1.007), (I-052)+(1.059)+(1.010), (I-052)+(1.059)+(1.011), (I-052)+(1.059)+(1.012), (I-052)+(1.059)+(1.013), (I-052)+(1.059)+(1.017), (I-052)+(1.059)+(1.018), (I-052)+(1.059)+(1.020), (I-052)+(1.059)+(1.021), (I-052)+(1.059)+(1.026), (I-052)+(1.059)+(1.027), (I-052)+(1.059)+(1.055), (I-052)+(1.059)+(1.092), (I-052)+(1.059)+(2.001), (I-052)+(1.059)+(2.002), (I-052)+(1.059)+(2.003), (I-052)+(1.059)+(2.005), (I-052)+(1.059)+(2.007), (I-052)+(1.059)+(2.009), (I-052)+(1.059)+(2.010), (I-052)+(1.059)+(2.011), (I-052)+(1.059)+(2.012), (I-052)+(1.059)+(2.013), (I-052)+(1.059)+(2.014), (I-052)+(1.059)+(2.015), (I-052)+(1.059)+(2.016), (I-052)+(1.059)+(2.017), (I-052)+(1.059)+(2.018), (I-052)+(1.059)+(2.019), (I-052)+(1.059)+(2.021), (I-052)+(1.059)+(2.028), (I-052)+(1.059)+(2.030), (I-052)+(1.059)+(2.038), (I-052)+(1.059)+(3.003), (I-052)+(1.059)+(3.007), (I-052)+(1.059)+(3.012), (I-052)+(1.059)+(3.013), (I-052)+(1.059)+(3.016), (I-052)+(1.059)+(3.017), (I-052)+(1.059)+(3.020), (I-052)+(1.059)+(3.025), (I-052)+(1.059)+(3.026), (I-052)+(1.059)+(3.030), (I-052)+(1.059)+(3.031), (I-052)+(1.059)+(5.003), (I-052)+(1.059)+(5.004), (I-052)+(1.059)+(5.005), (I-052)+(1.059)+(5.008), (I-052)+(1.059)+(5.009), (I-052)+(1.059)+(5.011), (I-052)+(1.059)+(5.012), (I-052)+(1.059)+(5.013), (I-052)+(1.059)+(5.015), (I-052)+(1.059)+(5.018), (I-052)+(1.059)+(5.019), (I-052)+(1.059)+(6.002), (I-052)+(1.059)+(7.001), (I-052)+(1.059)+(7.005), (I-052)+(1.059)+(9.002), (I-052)+(1.059)+(9.004), (I-052)+(1.059)+(14.001), (I-052)+(1.059)+(14.002), (I-052)+(1.059)+(15.008), (I-052)+(1.059)+(15.011), (I-052)+(1.059)+(15.012), (I-052)+(1.059)+(15.016), (I-052)+(1.059)+(15.025), (I-052)+(1.059)+(15.027), (I-052)+(1.059)+(15.047), (I-052)+(1.059)+(15.063), (I-052)+(1.059)+(15.064), (I-052)+(1.059)+(16.001), (I-052)+(1.059)+(16.005), (I-052)+(1.059)+(17.001), (I-052)+(1.059)+(17.002), (I-052)+(1.059)+(17.003), (I-052)+(1.059)+(17.008), (I-052)+(1.059)+(18.001), (I-052)+(1.092)+(1.001), (I-052)+(1.092)+(1.002), (I-052)+(1.092)+(1.003), (I-052)+(1.092)+(1.004), (I-052)+(1.092)+(1.005), (I-052)+(1.092)+(1.006), (I-052)+(1.092)+(1.007), (I-052)+(1.092)+(1.010), (I-052)+(1.092)+(1.011), (I-052)+(1.092)+(1.012), (I-052)+(1.092)+(1.013), (I-052)+(1.092)+(1.017), (I-052)+(1.092)+(1.018), (I-052)+(1.092)+(1.020), (I-052)+(1.092)+(1.021), (I-052)+(1.092)+(1.026), (I-052)+(1.092)+(1.027), (I-052)+(1.092)+(1.055), (I-052)+(1.092)+(1.059), (I-052)+(1.092)+(2.001), (I-052)+(1.092)+(2.002), (I-052)+(1.092)+(2.003), (I-052)+(1.092)+(2.005), (I-052)+(1.092)+(2.007), (I-052)+(1.092)+(2.009), (I-052)+(1.092)+(2.010), (I-052)+(1.092)+(2.011), (I-052)+(1.092)+(2.012), (I-052)+(1.092)+(2.013), (I-052)+(1.092)+(2.014), (I-052)+(1.092)+(2.015), (I-052)+(1.092)+(2.016), (I-052)+(1.092)+(2.017), (I-052)+(1.092)+(2.018), (I-052)+(1.092)+(2.019), (I-052)+(1.092)+(2.021), (I-052)+(1.092)+(2.028), (I-052)+(1.092)+(2.030), (I-052)+(1.092)+(2.038), (I-052)+(1.092)+(3.003), (I-052)+(1.092)+(3.007), (I-052)+(1.092)+(3.012), (I-052)+(1.092)+(3.013), (I-052)+(1.092)+(3.016), (I-052)+(1.092)+(3.017), (I-052)+(1.092)+(3.020), (I-052)+(1.092)+(3.025), (I-052)+(1.092)+(3.026), (I-052)+(1.092)+(3.030), (I-052)+(1.092)+(3.031), (I-052)+(1.092)+(5.003), (I-052)+(1.092)+(5.004), (I-052)+(1.092)+(5.005), (I-052)+(1.092)+(5.008), (I-052)+(1.092)+(5.009), (I-052)+(1.092)+(5.011), (I-052)+(1.092)+(5.012), (I-052)+(1.092)+(5.013), (I-052)+(1.092)+(5.015), (I-052)+(1.092)+(5.018), (I-052)+(1.092)+(5.019), (I-052)+(1.092)+(6.002), (I-052)+(1.092)+(7.001), (I-052)+(1.092)+(7.005), (I-052)+(1.092)+(9.002), (I-052)+(1.092)+(9.004), (I-052)+(1.092)+(14.001), (I-052)+(1.092)+(14.002), (I-052)+(1.092)+(15.008), (I-052)+(1.092)+(15.011), (I-052)+(1.092)+(15.012), (I-052)+(1.092)+(15.016), (I-052)+(1.092)+(15.025), (I-052)+(1.092)+(15.027), (I-052)+(1.092)+(15.047), (I-052)+(1.092)+(15.063), (I-052)+(1.092)+(15.064), (I-052)+(1.092)+(16.001), (I-052)+(1.092)+(16.005), (I-052)+(1.092)+(17.001), (I-052)+(1.092)+(17.002), (I-052)+(1.092)+(17.003), (I-052)+(1.092)+(17.008), (I-052)+(1.092)+(18.001), (I-052)+(2.001)+(3.003), (I-052)+(2.001)+(3.007), (I-052)+(2.001)+(3.012), (I-052)+(2.001)+(3.013), (I-052)+(2.001)+(3.016), (I-052)+(2.001)+(3.017), (I-052)+(2.001)+(3.020), (I-052)+(2.001)+(3.025), (I-052)+(2.001)+(3.026), (I-052)+(2.001)+(3.030), (I-052)+(2.001)+(3.031), (I-052)+(2.001)+(5.003), (I-052)+(2.001)+(5.004), (I-052)+(2.001)+(5.005), (I-052)+(2.001)+(5.008), (I-052)+(2.001)+(5.009), (I-052)+(2.001)+(5.011), (I-052)+(2.001)+(5.012), (I-052)+(2.001)+(5.013), (I-052)+(2.001)+(5.015), (I-052)+(2.001)+(5.018), (I-052)+(2.001)+(5.019), (I-052)+(2.001)+(6.002), (I-052)+(2.001)+(7.001), (I-052)+(2.001)+(7.005), (I-052)+(2.001)+(9.002), (I-052)+(2.001)+(9.004), (I-052)+(2.001)+(14.001), (I-052)+(2.001)+(14.002), (I-052)+(2.001)+(15.008), (I-052)+(2.001)+(15.011), (I-052)+(2.001)+(15.012), (I-052)+(2.001)+(15.016), (I-052)+(2.001)+(15.025), (I-052)+(2.001)+(15.027), (I-052)+(2.001)+(15.047), (I-052)+(2.001)+(15.063), (I-052)+(2.001)+(15.064), (I-052)+(2.001)+(16.001), (I-052)+(2.001)+(16.005), (I-052)+(2.001)+(17.001), (I-052)+(2.001)+(17.002), (I-052)+(2.001)+(17.003), (I-052)+(2.001)+(17.008), (I-052)+(2.001)+(18.001), (I-052)+(2.002)+(3.003), (I-052)+(2.002)+(3.007), (I-052)+(2.002)+(3.012), (I-052)+(2.002)+(3.013), (I-052)+(2.002)+(3.016), (I-052)+(2.002)+(3.017), (I-052)+(2.002)+(3.020), (I-052)+(2.002)+(3.025), (I-052)+(2.002)+(3.026), (I-052)+(2.002)+(3.030), (I-052)+(2.002)+(3.031), (I-052)+(2.002)+(5.003), (I-052)+(2.002)+(5.004), (I-052)+(2.002)+(5.005), (I-052)+(2.002)+(5.008), (I-052)+(2.002)+(5.009), (I-052)+(2.002)+(5.011), (I-052)+(2.002)+(5.012), (I-052)+(2.002)+(5.013), (I-052)+(2.002)+(5.015), (I-052)+(2.002)+(5.018), (I-052)+(2.002)+(5.019), (I-052)+(2.002)+(6.002), (I-052)+(2.002)+(7.001), (I-052)+(2.002)+(7.005), (I-052)+(2.002)+(9.002), (I-052)+(2.002)+(9.004), (I-052)+(2.002)+(14.001), (I-052)+(2.002)+(14.002), (I-052)+(2.002)+(15.008), (I-052)+(2.002)+(15.011), (I-052)+(2.002)+(15.012), (I-052)+(2.002)+(15.016), (I-052)+(2.002)+(15.025), (I-052)+(2.002)+(15.027), (I-052)+(2.002)+(15.047), (I-052)+(2.002)+(15.063), (I-052)+(2.002)+(15.064), (I-052)+(2.002)+(16.001), (I-052)+(2.002)+(16.005), (I-052)+(2.002)+(17.001), (I-052)+(2.002)+(17.002), (I-052)+(2.002)+(17.003), (I-052)+(2.002)+(17.008), (I-052)+(2.002)+(18.001), (I-052)+(2.003)+(3.003), (I-052)+(2.003)+(3.007), (I-052)+(2.003)+(3.012), (I-052)+(2.003)+(3.013), (I-052)+(2.003)+(3.016), (I-052)+(2.003)+(3.017), (I-052)+(2.003)+(3.020), (I-052)+(2.003)+(3.025), (I-052)+(2.003)+(3.026), (I-052)+(2.003)+(3.030), (I-052)+(2.003)+(3.031), (I-052)+(2.003)+(5.003), (I-052)+(2.003)+(5.004), (I-052)+(2.003)+(5.005), (I-052)+(2.003)+(5.008), (I-052)+(2.003)+(5.009), (I-052)+(2.003)+(5.011), (I-052)+(2.003)+(5.012), (I-052)+(2.003)+(5.013), (I-052)+(2.003)+(5.015), (I-052)+(2.003)+(5.018), (I-052)+(2.003)+(5.019), (I-052)+(2.003)+(6.002), (I-052)+(2.003)+(7.001), (I-052)+(2.003)+(7.005), (I-052)+(2.003)+(9.002), (I-052)+(2.003)+(9.004), (I-052)+(2.003)+(14.001), (I-052)+(2.003)+(14.002), (I-052)+(2.003)+(15.008), (I-052)+(2.003)+(15.011), (I-052)+(2.003)+(15.012), (I-052)+(2.003)+(15.016), (I-052)+(2.003)+(15.025), (I-052)+(2.003)+(15.027), (I-052)+(2.003)+(15.047), (I-052)+(2.003)+(15.063), (I-052)+(2.003)+(15.064), (I-052)+(2.003)+(16.001), (I-052)+(2.003)+(16.005), (I-052)+(2.003)+(17.001), (I-052)+(2.003)+(17.002), (I-052)+(2.003)+(17.003), (I-052)+(2.003)+(17.008), (I-052)+(2.003)+(18.001), (I-052)+(2.005)+(3.003), (I-052)+(2.005)+(3.007), (I-052)+(2.005)+(3.012), (I-052)+(2.005)+(3.013), (I-052)+(2.005)+(3.016), (I-052)+(2.005)+(3.017), (I-052)+(2.005)+(3.020), (I-052)+(2.005)+(3.025), (I-052)+(2.005)+(3.026), (I-052)+(2.005)+(3.030), (I-052)+(2.005)+(3.031), (I-052)+(2.005)+(5.003), (I-052)+(2.005)+(5.004), (I-052)+(2.005)+(5.005), (I-052)+(2.005)+(5.008), (I-052)+(2.005)+(5.009), (I-052)+(2.005)+(5.011), (I-052)+(2.005)+(5.012), (I-052)+(2.005)+(5.013), (I-052)+(2.005)+(5.015), (I-052)+(2.005)+(5.018), (I-052)+(2.005)+(5.019), (I-052)+(2.005)+(6.002), (I-052)+(2.005)+(7.001), (I-052)+(2.005)+(7.005), (I-052)+(2.005)+(9.002), (I-052)+(2.005)+(9.004), (I-052)+(2.005)+(14.001), (I-052)+(2.005)+(14.002), (I-052)+(2.005)+(15.008), (I-052)+(2.005)+(15.011), (I-052)+(2.005)+(15.012), (I-052)+(2.005)+(15.016), (I-052)+(2.005)+(15.025), (I-052)+(2.005)+(15.027), (I-052)+(2.005)+(15.047), (I-052)+(2.005)+(15.063), (I-052)+(2.005)+(15.064), (I-052)+(2.005)+(16.001), (I-052)+(2.005)+(16.005), (I-052)+(2.005)+(17.001), (I-052)+(2.005)+(17.002), (I-052)+(2.005)+(17.003), (I-052)+(2.005)+(17.008), (I-052)+(2.005)+(18.001), (I-052)+(2.007)+(3.003), (I-052)+(2.007)+(3.007), (I-052)+(2.007)+(3.012), (I-052)+(2.007)+(3.013), (I-052)+(2.007)+(3.016), (I-052)+(2.007)+(3.017), (I-052)+(2.007)+(3.020), (I-052)+(2.007)+(3.025), (I-052)+(2.007)+(3.026), (I-052)+(2.007)+(3.030), (I-052)+(2.007)+(3.031), (I-052)+(2.007)+(5.003), (I-052)+(2.007)+(5.004), (I-052)+(2.007)+(5.005), (I-052)+(2.007)+(5.008), (I-052)+(2.007)+(5.009), (I-052)+(2.007)+(5.011), (I-052)+(2.007)+(5.012), (I-052)+(2.007)+(5.013), (I-052)+(2.007)+(5.015), (I-052)+(2.007)+(5.018), (I-052)+(2.007)+(5.019), (I-052)+(2.007)+(6.002), (I-052)+(2.007)+(7.001), (I-052)+(2.007)+(7.005), (I-052)+(2.007)+(9.002), (I-052)+(2.007)+(9.004), (I-052)+(2.007)+(14.001), (I-052)+(2.007)+(14.002), (I-052)+(2.007)+(15.008), (I-052)+(2.007)+(15.011), (I-052)+(2.007)+(15.012), (I-052)+(2.007)+(15.016), (I-052)+(2.007)+(15.025), (I-052)+(2.007)+(15.027), (I-052)+(2.007)+(15.047), (I-052)+(2.007)+(15.063), (I-052)+(2.007)+(15.064), (I-052)+(2.007)+(16.001), (I-052)+(2.007)+(16.005), (I-052)+(2.007)+(17.001), (I-052)+(2.007)+(17.002), (I-052)+(2.007)+(17.003), (I-052)+(2.007)+(17.008), (I-052)+(2.007)+(18.001), (I-052)+(2.009)+(3.003), (I-052)+(2.009)+(3.007), (I-052)+(2.009)+(3.012), (I-052)+(2.009)+(3.013), (I-052)+(2.009)+(3.016), (I-052)+(2.009)+(3.017), (I-052)+(2.009)+(3.020), (I-052)+(2.009)+(3.025), (I-052)+(2.009)+(3.026), (I-052)+(2.009)+(3.030), (I-052)+(2.009)+(3.031), (I-052)+(2.009)+(5.003), (I-052)+(2.009)+(5.004), (I-052)+(2.009)+(5.005), (I-052)+(2.009)+(5.008), (I-052)+(2.009)+(5.009), (I-052)+(2.009)+(5.011), (I-052)+(2.009)+(5.012), (I-052)+(2.009)+(5.013), (I-052)+(2.009)+(5.015), (I-052)+(2.009)+(5.018), (I-052)+(2.009)+(5.019), (I-052)+(2.009)+(6.002), (I-052)+(2.009)+(7.001), (I-052)+(2.009)+(7.005), (I-052)+(2.009)+(9.002), (I-052)+(2.009)+(9.004), (I-052)+(2.009)+(14.001), (I-052)+(2.009)+(14.002), (I-052)+(2.009)+(15.008), (I-052)+(2.009)+(15.011), (I-052)+(2.009)+(15.012), (I-052)+(2.009)+(15.016), (I-052)+(2.009)+(15.025), (I-052)+(2.009)+(15.027), (I-052)+(2.009)+(15.047), (I-052)+(2.009)+(15.063), (I-052)+(2.009)+(15.064), (I-052)+(2.009)+(16.001), (I-052)+(2.009)+(16.005), (I-052)+(2.009)+(17.001), (I-052)+(2.009)+(17.002), (I-052)+(2.009)+(17.003), (I-052)+(2.009)+(17.008), (I-052)+(2.009)+(18.001), (I-052)+(2.010)+(3.003), (I-052)+(2.010)+(3.007), (I-052)+(2.010)+(3.012), (I-052)+(2.010)+(3.013), (I-052)+(2.010)+(3.016), (I-052)+(2.010)+(3.017), (I-052)+(2.010)+(3.020), (I-052)+(2.010)+(3.025), (I-052)+(2.010)+(3.026), (I-052)+(2.010)+(3.030), (I-052)+(2.010)+(3.031), (I-052)+(2.010)+(5.003), (I-052)+(2.010)+(5.004), (I-052)+(2.010)+(5.005), (I-052)+(2.010)+(5.008), (I-052)+(2.010)+(5.009), (I-052)+(2.010)+(5.011), (I-052)+(2.010)+(5.012), (I-052)+(2.010)+(5.013), (I-052)+(2.010)+(5.015), (I-052)+(2.010)+(5.018), (I-052)+(2.010)+(5.019), (I-052)+(2.010)+(6.002), (I-052)+(2.010)+(7.001), (I-052)+(2.010)+(7.005), (I-052)+(2.010)+(9.002), (I-052)+(2.010)+(9.004), (I-052)+(2.010)+(14.001), (I-052)+(2.010)+(14.002), (I-052)+(2.010)+(15.008), (I-052)+(2.010)+(15.011), (I-052)+(2.010)+(15.012), (I-052)+(2.010)+(15.016), (I-052)+(2.010)+(15.025), (I-052)+(2.010)+(15.027), (I-052)+(2.010)+(15.047), (I-052)+(2.010)+(15.063), (I-052)+(2.010)+(15.064), (I-052)+(2.010)+(16.001), (I-052)+(2.010)+(16.005), (I-052)+(2.010)+(17.001), (I-052)+(2.010)+(17.002), (I-052)+(2.010)+(17.003), (I-052)+(2.010)+(17.008), (I-052)+(2.010)+(18.001), (I-052)+(2.011)+(3.003), (I-052)+(2.011)+(3.007), (I-052)+(2.011)+(3.012), (I-052)+(2.011)+(3.013), (I-052)+(2.011)+(3.016), (I-052)+(2.011)+(3.017), (I-052)+(2.011)+(3.020), (I-052)+(2.011)+(3.025), (I-052)+(2.011)+(3.026), (I-052)+(2.011)+(3.030), (I-052)+(2.011)+(3.031), (I-052)+(2.011)+(5.003), (I-052)+(2.011)+(5.004), (I-052)+(2.011)+(5.005), (I-052)+(2.011)+(5.008), (I-052)+(2.011)+(5.009), (I-052)+(2.011)+(5.011), (I-052)+(2.011)+(5.012), (I-052)+(2.011)+(5.013), (I-052)+(2.011)+(5.015), (I-052)+(2.011)+(5.018), (I-052)+(2.011)+(5.019), (I-052)+(2.011)+(6.002), (I-052)+(2.011)+(7.001), (I-052)+(2.011)+(7.005), (I-052)+(2.011)+(9.002), (I-052)+(2.011)+(9.004), (I-052)+(2.011)+(14.001), (I-052)+(2.011)+(14.002), (I-052)+(2.011)+(15.008), (I-052)+(2.011)+(15.011), (I-052)+(2.011)+(15.012), (I-052)+(2.011)+(15.016), (I-052)+(2.011)+(15.025), (I-052)+(2.011)+(15.027), (I-052)+(2.011)+(15.047), (I-052)+(2.011)+(15.063), (I-052)+(2.011)+(15.064), (I-052)+(2.011)+(16.001), (I-052)+(2.011)+(16.005), (I-052)+(2.011)+(17.001), (I-052)+(2.011)+(17.002), (I-052)+(2.011)+(17.003), (I-052)+(2.011)+(17.008), (I-052)+(2.011)+(18.001), (I-052)+(2.012)+(3.003), (I-052)+(2.012)+(3.007), (I-052)+(2.012)+(3.012), (I-052)+(2.012)+(3.013), (I-052)+(2.012)+(3.016), (I-052)+(2.012)+(3.017), (I-052)+(2.012)+(3.020), (I-052)+(2.012)+(3.025), (I-052)+(2.012)+(3.026), (I-052)+(2.012)+(3.030), (I-052)+(2.012)+(3.031), (I-052)+(2.012)+(5.003), (I-052)+(2.012)+(5.004), (I-052)+(2.012)+(5.005), (I-052)+(2.012)+(5.008), (I-052)+(2.012)+(5.009), (I-052)+(2.012)+(5.011), (I-052)+(2.012)+(5.012), (I-052)+(2.012)+(5.013), (I-052)+(2.012)+(5.015), (I-052)+(2.012)+(5.018), (I-052)+(2.012)+(5.019), (I-052)+(2.012)+(6.002), (I-052)+(2.012)+(7.001), (I-052)+(2.012)+(7.005), (I-052)+(2.012)+(9.002), (I-052)+(2.012)+(9.004), (I-052)+(2.012)+(14.001), (I-052)+(2.012)+(14.002), (I-052)+(2.012)+(15.008), (I-052)+(2.012)+(15.011), (I-052)+(2.012)+(15.012), (I-052)+(2.012)+(15.016), (I-052)+(2.012)+(15.025), (I-052)+(2.012)+(15.027), (I-052)+(2.012)+(15.047), (I-052)+(2.012)+(15.063), (I-052)+(2.012)+(15.064), (I-052)+(2.012)+(16.001), (I-052)+(2.012)+(16.005), (I-052)+(2.012)+(17.001), (I-052)+(2.012)+(17.002), (I-052)+(2.012)+(17.003), (I-052)+(2.012)+(17.008), (I-052)+(2.012)+(18.001), (I-052)+(2.013)+(3.003), (I-052)+(2.013)+(3.007), (I-052)+(2.013)+(3.012), (I-052)+(2.013)+(3.013), (I-052)+(2.013)+(3.016), (I-052)+(2.013)+(3.017), (I-052)+(2.013)+(3.020), (I-052)+(2.013)+(3.025), (I-052)+(2.013)+(3.026), (I-052)+(2.013)+(3.030), (I-052)+(2.013)+(3.031), (I-052)+(2.013)+(5.003), (I-052)+(2.013)+(5.004), (I-052)+(2.013)+(5.005), (I-052)+(2.013)+(5.008), (I-052)+(2.013)+(5.009), (I-052)+(2.013)+(5.011), (I-052)+(2.013)+(5.012), (I-052)+(2.013)+(5.013), (I-052)+(2.013)+(5.015), (I-052)+(2.013)+(5.018), (I-052)+(2.013)+(5.019), (I-052)+(2.013)+(6.002), (I-052)+(2.013)+(7.001), (I-052)+(2.013)+(7.005), (I-052)+(2.013)+(9.002), (I-052)+(2.013)+(9.004), (I-052)+(2.013)+(14.001), (I-052)+(2.013)+(14.002), (I-052)+(2.013)+(15.008), (I-052)+(2.013)+(15.011), (I-052)+(2.013)+(15.012), (I-052)+(2.013)+(15.016), (I-052)+(2.013)+(15.025), (I-052)+(2.013)+(15.027), (I-052)+(2.013)+(15.047), (I-052)+(2.013)+(15.063), (I-052)+(2.013)+(15.064), (I-052)+(2.013)+(16.001), (I-052)+(2.013)+(16.005), (I-052)+(2.013)+(17.001), (I-052)+(2.013)+(17.002), (I-052)+(2.013)+(17.003), (I-052)+(2.013)+(17.008), (I-052)+(2.013)+(18.001), (I-052)+(2.014)+(3.003), (I-052)+(2.014)+(3.007), (I-052)+(2.014)+(3.012), (I-052)+(2.014)+(3.013), (I-052)+(2.014)+(3.016), (I-052)+(2.014)+(3.017), (I-052)+(2.014)+(3.020), (I-052)+(2.014)+(3.025), (I-052)+(2.014)+(3.026), (I-052)+(2.014)+(3.030), (I-052)+(2.014)+(3.031), (I-052)+(2.014)+(5.003), (I-052)+(2.014)+(5.004), (I-052)+(2.014)+(5.005), (I-052)+(2.014)+(5.008), (I-052)+(2.014)+(5.009), (I-052)+(2.014)+(5.011), (I-052)+(2.014)+(5.012), (I-052)+(2.014)+(5.013), (I-052)+(2.014)+(5.015), (I-052)+(2.014)+(5.018), (I-052)+(2.014)+(5.019), (I-052)+(2.014)+(6.002), (I-052)+(2.014)+(7.001), (I-052)+(2.014)+(7.005), (I-052)+(2.014)+(9.002), (I-052)+(2.014)+(9.004), (I-052)+(2.014)+(14.001), (I-052)+(2.014)+(14.002), (I-052)+(2.014)+(15.008), (I-052)+(2.014)+(15.011), (I-052)+(2.014)+(15.012), (I-052)+(2.014)+(15.016), (I-052)+(2.014)+(15.025), (I-052)+(2.014)+(15.027), (I-052)+(2.014)+(15.047), (I-052)+(2.014)+(15.063), (I-052)+(2.014)+(15.064), (I-052)+(2.014)+(16.001), (I-052)+(2.014)+(16.005), (I-052)+(2.014)+(17.001), (I-052)+(2.014)+(17.002), (I-052)+(2.014)+(17.003), (I-052)+(2.014)+(17.008), (I-052)+(2.014)+(18.001), (I-052)+(2.015)+(3.003), (I-052)+(2.015)+(3.007), (I-052)+(2.015)+(3.012), (I-052)+(2.015)+(3.013), (I-052)+(2.015)+(3.016), (I-052)+(2.015)+(3.017), (I-052)+(2.015)+(3.020), (I-052)+(2.015)+(3.025), (I-052)+(2.015)+(3.026), (I-052)+(2.015)+(3.030), (I-052)+(2.015)+(3.031), (I-052)+(2.015)+(5.003), (I-052)+(2.015)+(5.004), (I-052)+(2.015)+(5.005), (I-052)+(2.015)+(5.008), (I-052)+(2.015)+(5.009), (I-052)+(2.015)+(5.011), (I-052)+(2.015)+(5.012), (I-052)+(2.015)+(5.013), (I-052)+(2.015)+(5.015), (I-052)+(2.015)+(5.018), (I-052)+(2.015)+(5.019), (I-052)+(2.015)+(6.002), (I-052)+(2.015)+(7.001), (I-052)+(2.015)+(7.005), (I-052)+(2.015)+(9.002), (I-052)+(2.015)+(9.004), (I-052)+(2.015)+(14.001), (I-052)+(2.015)+(14.002), (I-052)+(2.015)+(15.008), (I-052)+(2.015)+(15.011), (I-052)+(2.015)+(15.012), (I-052)+(2.015)+(15.016), (I-052)+(2.015)+(15.025), (I-052)+(2.015)+(15.027), (I-052)+(2.015)+(15.047), (I-052)+(2.015)+(15.063), (I-052)+(2.015)+(15.064), (I-052)+(2.015)+(16.001), (I-052)+(2.015)+(16.005), (I-052)+(2.015)+(17.001), (I-052)+(2.015)+(17.002), (I-052)+(2.015)+(17.003), (I-052)+(2.015)+(17.008), (I-052)+(2.015)+(18.001), (I-052)+(2.016)+(3.003), (I-052)+(2.016)+(3.007), (I-052)+(2.016)+(3.012), (I-052)+(2.016)+(3.013), (I-052)+(2.016)+(3.016), (I-052)+(2.016)+(3.017), (I-052)+(2.016)+(3.020), (I-052)+(2.016)+(3.025), (I-052)+(2.016)+(3.026), (I-052)+(2.016)+(3.030), (I-052)+(2.016)+(3.031), (I-052)+(2.016)+(5.003), (I-052)+(2.016)+(5.004), (I-052)+(2.016)+(5.005), (I-052)+(2.016)+(5.008), (I-052)+(2.016)+(5.009), (I-052)+(2.016)+(5.011), (I-052)+(2.016)+(5.012), (I-052)+(2.016)+(5.013), (I-052)+(2.016)+(5.015), (I-052)+(2.016)+(5.018), (I-052)+(2.016)+(5.019), (I-052)+(2.016)+(6.002), (I-052)+(2.016)+(7.001), (I-052)+(2.016)+(7.005), (I-052)+(2.016)+(9.002), (I-052)+(2.016)+(9.004), (I-052)+(2.016)+(14.001), (I-052)+(2.016)+(14.002), (I-052)+(2.016)+(15.008), (I-052)+(2.016)+(15.011), (I-052)+(2.016)+(15.012), (I-052)+(2.016)+(15.016), (I-052)+(2.016)+(15.025), (I-052)+(2.016)+(15.027), (I-052)+(2.016)+(15.047), (I-052)+(2.016)+(15.063), (I-052)+(2.016)+(15.064), (I-052)+(2.016)+(16.001), (I-052)+(2.016)+(16.005), (I-052)+(2.016)+(17.001), (I-052)+(2.016)+(17.002), (I-052)+(2.016)+(17.003), (I-052)+(2.016)+(17.008), (I-052)+(2.016)+(18.001), (I-052)+(2.017)+(3.003), (I-052)+(2.017)+(3.007), (I-052)+(2.017)+(3.012), (I-052)+(2.017)+(3.013), (I-052)+(2.017)+(3.016), (I-052)+(2.017)+(3.017), (I-052)+(2.017)+(3.020), (I-052)+(2.017)+(3.025), (I-052)+(2.017)+(3.026), (I-052)+(2.017)+(3.030), (I-052)+(2.017)+(3.031), (I-052)+(2.017)+(5.003), (I-052)+(2.017)+(5.004), (I-052)+(2.017)+(5.005), (I-052)+(2.017)+(5.008), (I-052)+(2.017)+(5.009), (I-052)+(2.017)+(5.011), (I-052)+(2.017)+(5.012), (I-052)+(2.017)+(5.013), (I-052)+(2.017)+(5.015), (I-052)+(2.017)+(5.018), (I-052)+(2.017)+(5.019), (I-052)+(2.017)+(6.002), (I-052)+(2.017)+(7.001), (I-052)+(2.017)+(7.005), (I-052)+(2.017)+(9.002), (I-052)+(2.017)+(9.004), (I-052)+(2.017)+(14.001), (I-052)+(2.017)+(14.002), (I-052)+(2.017)+(15.008), (I-052)+(2.017)+(15.011), (I-052)+(2.017)+(15.012), (I-052)+(2.017)+(15.016), (I-052)+(2.017)+(15.025), (I-052)+(2.017)+(15.027), (I-052)+(2.017)+(15.047), (I-052)+(2.017)+(15.063), (I-052)+(2.017)+(15.064), (I-052)+(2.017)+(16.001), (I-052)+(2.017)+(16.005), (I-052)+(2.017)+(17.001), (I-052)+(2.017)+(17.002), (I-052)+(2.017)+(17.003), (I-052)+(2.017)+(17.008), (I-052)+(2.017)+(18.001), (I-052)+(2.018)+(3.003), (I-052)+(2.018)+(3.007), (I-052)+(2.018)+(3.012), (I-052)+(2.018)+(3.013), (I-052)+(2.018)+(3.016), (I-052)+(2.018)+(3.017), (I-052)+(2.018)+(3.020), (I-052)+(2.018)+(3.025), (I-052)+(2.018)+(3.026), (I-052)+(2.018)+(3.030), (I-052)+(2.018)+(3.031), (I-052)+(2.018)+(5.003), (I-052)+(2.018)+(5.004), (I-052)+(2.018)+(5.005), (I-052)+(2.018)+(5.008), (I-052)+(2.018)+(5.009), (I-052)+(2.018)+(5.011), (I-052)+(2.018)+(5.012), (I-052)+(2.018)+(5.013), (I-052)+(2.018)+(5.015), (I-052)+(2.018)+(5.018), (I-052)+(2.018)+(5.019), (I-052)+(2.018)+(6.002), (I-052)+(2.018)+(7.001), (I-052)+(2.018)+(7.005), (I-052)+(2.018)+(9.002), (I-052)+(2.018)+(9.004), (I-052)+(2.018)+(14.001), (I-052)+(2.018)+(14.002), (I-052)+(2.018)+(15.008), (I-052)+(2.018)+(15.011), (I-052)+(2.018)+(15.012), (I-052)+(2.018)+(15.016), (I-052)+(2.018)+(15.025), (I-052)+(2.018)+(15.027), (I-052)+(2.018)+(15.047), (I-052)+(2.018)+(15.063), (I-052)+(2.018)+(15.064), (I-052)+(2.018)+(16.001), (I-052)+(2.018)+(16.005), (I-052)+(2.018)+(17.001), (I-052)+(2.018)+(17.002), (I-052)+(2.018)+(17.003), (I-052)+(2.018)+(17.008), (I-052)+(2.018)+(18.001), (I-052)+(2.019)+(3.003), (I-052)+(2.019)+(3.007), (I-052)+(2.019)+(3.012), (I-052)+(2.019)+(3.013), (I-052)+(2.019)+(3.016), (I-052)+(2.019)+(3.017), (I-052)+(2.019)+(3.020), (I-052)+(2.019)+(3.025), (I-052)+(2.019)+(3.026), (I-052)+(2.019)+(3.030), (I-052)+(2.019)+(3.031), (I-052)+(2.019)+(5.003), (I-052)+(2.019)+(5.004), (I-052)+(2.019)+(5.005), (I-052)+(2.019)+(5.008), (I-052)+(2.019)+(5.009), (I-052)+(2.019)+(5.011), (I-052)+(2.019)+(5.012), (I-052)+(2.019)+(5.013), (I-052)+(2.019)+(5.015), (I-052)+(2.019)+(5.018), (I-052)+(2.019)+(5.019), (I-052)+(2.019)+(6.002), (I-052)+(2.019)+(7.001), (I-052)+(2.019)+(7.005), (I-052)+(2.019)+(9.002), (I-052)+(2.019)+(9.004), (I-052)+(2.019)+(14.001), (I-052)+(2.019)+(14.002), (I-052)+(2.019)+(15.008), (I-052)+(2.019)+(15.011), (I-052)+(2.019)+(15.012), (I-052)+(2.019)+(15.016), (I-052)+(2.019)+(15.025), (I-052)+(2.019)+(15.027), (I-052)+(2.019)+(15.047), (I-052)+(2.019)+(15.063), (I-052)+(2.019)+(15.064), (I-052)+(2.019)+(16.001), (I-052)+(2.019)+(16.005), (I-052)+(2.019)+(17.001), (I-052)+(2.019)+(17.002), (I-052)+(2.019)+(17.003), (I-052)+(2.019)+(17.008), (I-052)+(2.019)+(18.001), (I-052)+(2.021)+(3.003), (I-052)+(2.021)+(3.007), (I-052)+(2.021)+(3.012), (I-052)+(2.021)+(3.013), (I-052)+(2.021)+(3.016), (I-052)+(2.021)+(3.017), (I-052)+(2.021)+(3.020), (I-052)+(2.021)+(3.025), (I-052)+(2.021)+(3.026), (I-052)+(2.021)+(3.030), (I-052)+(2.021)+(3.031), (I-052)+(2.021)+(5.003), (I-052)+(2.021)+(5.004), (I-052)+(2.021)+(5.005), (I-052)+(2.021)+(5.008), (I-052)+(2.021)+(5.009), (I-052)+(2.021)+(5.011), (I-052)+(2.021)+(5.012), (I-052)+(2.021)+(5.013), (I-052)+(2.021)+(5.015), (I-052)+(2.021)+(5.018), (I-052)+(2.021)+(5.019), (I-052)+(2.021)+(6.002), (I-052)+(2.021)+(7.001), (I-052)+(2.021)+(7.005), (I-052)+(2.021)+(9.002), (I-052)+(2.021)+(9.004), (I-052)+(2.021)+(14.001), (I-052)+(2.021)+(14.002), (I-052)+(2.021)+(15.008), (I-052)+(2.021)+(15.011), (I-052)+(2.021)+(15.012), (I-052)+(2.021)+(15.016), (I-052)+(2.021)+(15.025), (I-052)+(2.021)+(15.027), (I-052)+(2.021)+(15.047), (I-052)+(2.021)+(15.063), (I-052)+(2.021)+(15.064), (I-052)+(2.021)+(16.001), (I-052)+(2.021)+(16.005), (I-052)+(2.021)+(17.001), (I-052)+(2.021)+(17.002), (I-052)+(2.021)+(17.003), (I-052)+(2.021)+(17.008), (I-052)+(2.021)+(18.001), (I-052)+(2.028)+(3.003), (I-052)+(2.028)+(3.007), (I-052)+(2.028)+(3.012), (I-052)+(2.028)+(3.013), (I-052)+(2.028)+(3.016), (I-052)+(2.028)+(3.017), (I-052)+(2.028)+(3.020), (I-052)+(2.028)+(3.025), (I-052)+(2.028)+(3.026), (I-052)+(2.028)+(3.030), (I-052)+(2.028)+(3.031), (I-052)+(2.028)+(5.003), (I-052)+(2.028)+(5.004), (I-052)+(2.028)+(5.005), (I-052)+(2.028)+(5.008), (I-052)+(2.028)+(5.009), (I-052)+(2.028)+(5.011), (I-052)+(2.028)+(5.012), (I-052)+(2.028)+(5.013), (I-052)+(2.028)+(5.015), (I-052)+(2.028)+(5.018), (I-052)+(2.028)+(5.019), (I-052)+(2.028)+(6.002), (I-052)+(2.028)+(7.001), (I-052)+(2.028)+(7.005), (I-052)+(2.028)+(9.002), (I-052)+(2.028)+(9.004), (I-052)+(2.028)+(14.001), (I-052)+(2.028)+(14.002), (I-052)+(2.028)+(15.008), (I-052)+(2.028)+(15.011), (I-052)+(2.028)+(15.012), (I-052)+(2.028)+(15.016), (I-052)+(2.028)+(15.025), (I-052)+(2.028)+(15.027), (I-052)+(2.028)+(15.047), (I-052)+(2.028)+(15.063), (I-052)+(2.028)+(15.064), (I-052)+(2.028)+(16.001), (I-052)+(2.028)+(16.005), (I-052)+(2.028)+(17.001), (I-052)+(2.028)+(17.002), (I-052)+(2.028)+(17.003), (I-052)+(2.028)+(17.008), (I-052)+(2.028)+(18.001), (I-052)+(2.030)+(3.003), (I-052)+(2.030)+(3.007), (I-052)+(2.030)+(3.012), (I-052)+(2.030)+(3.013), (I-052)+(2.030)+(3.016), (I-052)+(2.030)+(3.017), (I-052)+(2.030)+(3.020), (I-052)+(2.030)+(3.025), (I-052)+(2.030)+(3.026), (I-052)+(2.030)+(3.030), (I-052)+(2.030)+(3.031), (I-052)+(2.030)+(5.003), (I-052)+(2.030)+(5.004), (I-052)+(2.030)+(5.005), (I-052)+(2.030)+(5.008), (I-052)+(2.030)+(5.009), (I-052)+(2.030)+(5.011), (I-052)+(2.030)+(5.012), (I-052)+(2.030)+(5.013), (I-052)+(2.030)+(5.015), (I-052)+(2.030)+(5.018), (I-052)+(2.030)+(5.019), (I-052)+(2.030)+(6.002), (I-052)+(2.030)+(7.001), (I-052)+(2.030)+(7.005), (I-052)+(2.030)+(9.002), (I-052)+(2.030)+(9.004), (I-052)+(2.030)+(14.001), (I-052)+(2.030)+(14.002), (I-052)+(2.030)+(15.008), (I-052)+(2.030)+(15.011), (I-052)+(2.030)+(15.012), (I-052)+(2.030)+(15.016), (I-052)+(2.030)+(15.025), (I-052)+(2.030)+(15.027), (I-052)+(2.030)+(15.047), (I-052)+(2.030)+(15.063), (I-052)+(2.030)+(15.064), (I-052)+(2.030)+(16.001), (I-052)+(2.030)+(16.005), (I-052)+(2.030)+(17.001), (I-052)+(2.030)+(17.002), (I-052)+(2.030)+(17.003), (I-052)+(2.030)+(17.008), (I-052)+(2.030)+(18.001), (I-052)+(2.038)+(3.003), (I-052)+(2.038)+(3.007), (I-052)+(2.038)+(3.012), (I-052)+(2.038)+(3.013), (I-052)+(2.038)+(3.016), (I-052)+(2.038)+(3.017), (I-052)+(2.038)+(3.020), (I-052)+(2.038)+(3.025), (I-052)+(2.038)+(3.026), (I-052)+(2.038)+(3.030), (I-052)+(2.038)+(3.031), (I-052)+(2.038)+(5.003), (I-052)+(2.038)+(5.004), (I-052)+(2.038)+(5.005), (I-052)+(2.038)+(5.008), (I-052)+(2.038)+(5.009), (I-052)+(2.038)+(5.011), (I-052)+(2.038)+(5.012), (I-052)+(2.038)+(5.013), (I-052)+(2.038)+(5.015), (I-052)+(2.038)+(5.018), (I-052)+(2.038)+(5.019), (I-052)+(2.038)+(6.002), (I-052)+(2.038)+(7.001), (I-052)+(2.038)+(7.005), (I-052)+(2.038)+(9.002), (I-052)+(2.038)+(9.004), (I-052)+(2.038)+(14.001), (I-052)+(2.038)+(14.002), (I-052)+(2.038)+(15.008), (I-052)+(2.038)+(15.011), (I-052)+(2.038)+(15.012), (I-052)+(2.038)+(15.016), (I-052)+(2.038)+(15.025), (I-052)+(2.038)+(15.027), (I-052)+(2.038)+(15.047), (I-052)+(2.038)+(15.063), (I-052)+(2.038)+(15.064), (I-052)+(2.038)+(16.001), (I-052)+(2.038)+(16.005), (I-052)+(2.038)+(17.001), (I-052)+(2.038)+(17.002), (I-052)+(2.038)+(17.003), (I-052)+(2.038)+(17.008), (I-052)+(2.038)+(18.001).

(I-052)+(3.003)+(3.025), (I-052)+(3.003)+(3.030), (I-052)+(3.003)+(3.031), (I-052)+(3.003)+(5.003), (I-052)+(3.003)+(5.004), (I-052)+(3.003)+(5.005), (I-052)+(3.003)+(5.008), (I-052)+(3.003)+(5.009), (I-052)+(3.003)+(5.011), (I-052)+(3.003)+(5.012), (I-052)+(3.003)+(5.013), (I-052)+(3.003)+(5.015), (I-052)+(3.003)+(5.018), (I-052)+(3.003)+(5.019), (I-052)+(3.003)+(6.002), (I-052)+(3.003)+(7.001), (I-052)+(3.003)+(7.005), (I-052)+(3.003)+(9.002), (I-052)+(3.003)+(9.004), (I-052)+(3.003)+(14.001), (I-052)+(3.003)+(14.002), (I-052)+(3.003)+(15.008), (I-052)+(3.003)+(15.011), (I-052)+(3.003)+(15.012), (I-052)+(3.003)+(15.016), (I-052)+(3.003)+(15.025), (I-052)+(3.003)+(15.027), (I-052)+(3.003)+(15.047), (I-052)+(3.003)+(15.063), (I-052)+(3.003)+(15.064), (I-052)+(3.003)+(16.001), (I-052)+(3.003)+(16.005), (I-052)+(3.003)+(17.001), (I-052)+(3.003)+(17.002), (I-052)+(3.003)+(17.003), (I-052)+(3.003)+(17.008), (I-052)+(3.003)+(18.001), (I-052)+(3.007)+(3.025), (I-052)+(3.007)+(3.030), (I-052)+(3.007)+(3.031), (I-052)+(3.007)+(5.003), (I-052)+(3.007)+(5.004), (I-052)+(3.007)+(5.005), (I-052)+(3.007)+(5.008), (I-052)+(3.007)+(5.009), (I-052)+(3.007)+(5.011), (I-052)+(3.007)+(5.012), (I-052)+(3.007)+(5.013), (I-052)+(3.007)+(5.015), (I-052)+(3.007)+(5.018), (I-052)+(3.007)+(5.019), (I-052)+(3.007)+(6.002), (I-052)+(3.007)+(7.001), (I-052)+(3.007)+(7.005), (I-052)+(3.007)+(9.002), (I-052)+(3.007)+(9.004), (I-052)+(3.007)+(14.001), (I-052)+(3.007)+(14.002), (I-052)+(3.007)+(15.008), (I-052)+(3.007)+(15.011), (I-052)+(3.007)+(15.012), (I-052)+(3.007)+(15.016), (I-052)+(3.007)+(15.025), (I-052)+(3.007)+(15.027), (I-052)+(3.007)+(15.047), (I-052)+(3.007)+(15.063), (I-052)+(3.007)+(15.064), (I-052)+(3.007)+(16.001), (I-052)+(3.007)+(16.005), (I-052)+(3.007)+(17.001), (I-052)+(3.007)+(17.002), (I-052)+(3.007)+(17.003), (I-052)+(3.007)+(17.008), (I-052)+(3.007)+(18.001), (I-052)+(3.012)+(3.025), (I-052)+(3.012)+(3.030), (I-052)+(3.012)+(3.031), (I-052)+(3.012)+(5.003), (I-052)+(3.012)+(5.004), (I-052)+(3.012)+(5.005), (I-052)+(3.012)+(5.008), (I-052)+(3.012)+(5.009), (I-052)+(3.012)+(5.011), (I-052)+(3.012)+(5.012), (I-052)+(3.012)+(5.013), (I-052)+(3.012)+(5.015), (I-052)+(3.012)+(5.018), (I-052)+(3.012)+(5.019), (I-052)+(3.012)+(6.002), (I-052)+(3.012)+(7.001), (I-052)+(3.012)+(7.005), (I-052)+(3.012)+(9.002), (I-052)+(3.012)+(9.004), (I-052)+(3.012)+(14.001), (I-052)+(3.012)+(14.002), (I-052)+(3.012)+(15.008), (I-052)+(3.012)+(15.011), (I-052)+(3.012)+(15.012), (I-052)+(3.012)+(15.016), (I-052)+(3.012)+(15.025), (I-052)+(3.012)+(15.027), (I-052)+(3.012)+(15.047), (I-052)+(3.012)+(15.063), (I-052)+(3.012)+(15.064), (I-052)+(3.012)+(16.001), (I-052)+(3.012)+(16.005), (I-052)+(3.012)+(17.001), (I-052)+(3.012)+(17.002), (I-052)+(3.012)+(17.003), (I-052)+(3.012)+(17.008), (I-052)+(3.012)+(18.001), (I-052)+(3.013)+(3.025), (I-052)+(3.013)+(3.030), (I-052)+(3.013)+(3.031), (I-052)+(3.013)+(5.003), (I-052)+(3.013)+(5.004), (I-052)+(3.013)+(5.005), (I-052)+(3.013)+(5.008), (I-052)+(3.013)+(5.009), (I-052)+(3.013)+(5.011), (I-052)+(3.013)+(5.012), (I-052)+(3.013)+(5.013), (I-052)+(3.013)+(5.015), (I-052)+(3.013)+(5.018), (I-052)+(3.013)+(5.019), (I-052)+(3.013)+(6.002), (I-052)+(3.013)+(7.001), (I-052)+(3.013)+(7.005), (I-052)+(3.013)+(9.002), (I-052)+(3.013)+(9.004), (I-052)+(3.013)+(14.001), (I-052)+(3.013)+(14.002), (I-052)+(3.013)+(15.008), (I-052)+(3.013)+(15.011), (I-052)+(3.013)+(15.012), (I-052)+(3.013)+(15.016), (I-052)+(3.013)+(15.025), (I-052)+(3.013)+(15.027), (I-052)+(3.013)+(15.047), (I-052)+(3.013)+(15.063), (I-052)+(3.013)+(15.064), (I-052)+(3.013)+(16.001), (I-052)+(3.013)+(16.005), (I-052)+(3.013)+(17.001), (I-052)+(3.013)+(17.002), (I-052)+(3.013)+(17.003), (I-052)+(3.013)+(17.008), (I-052)+(3.013)+(18.001), (I-052)+(3.016)+(3.025), (I-052)+(3.016)+(3.030), (I-052)+(3.016)+(3.031), (I-052)+(3.016)+(5.003), (I-052)+(3.016)+(5.004), (I-052)+(3.016)+(5.005), (I-052)+(3.016)+(5.008), (I-052)+(3.016)+(5.009), (I-052)+(3.016)+(5.011), (I-052)+(3.016)+(5.012), (I-052)+(3.016)+(5.013), (I-052)+(3.016)+(5.015), (I-052)+(3.016)+(5.018), (I-052)+(3.016)+(5.019), (I-052)+(3.016)+(6.002), (I-052)+(3.016)+(7.001), (I-052)+(3.016)+(7.005), (I-052)+(3.016)+(9.002), (I-052)+(3.016)+(9.004), (I-052)+(3.016)+(14.001), (I-052)+(3.016)+(14.002), (I-052)+(3.016)+(15.008), (I-052)+(3.016)+(15.011), (I-052)+(3.016)+(15.012), (I-052)+(3.016)+(15.016), (I-052)+(3.016)+(15.025), (I-052)+(3.016)+(15.027), (I-052)+(3.016)+(15.047), (I-052)+(3.016)+(15.063), (I-052)+(3.016)+(15.064), (I-052)+(3.016)+(16.001), (I-052)+(3.016)+(16.005), (I-052)+(3.016)+(17.001), (I-052)+(3.016)+(17.002), (I-052)+(3.016)+(17.003), (I-052)+(3.016)+(17.008), (I-052)+(3.016)+(18.001), (I-052)+(3.017)+(3.025), (I-052)+(3.017)+(3.030), (I-052)+(3.017)+(3.031), (I-052)+(3.017)+(5.003), (I-052)+(3.017)+(5.004), (I-052)+(3.017)+(5.005), (I-052)+(3.017)+(5.008), (I-052)+(3.017)+(5.009), (I-052)+(3.017)+(5.011), (I-052)+(3.017)+(5.012), (I-052)+(3.017)+(5.013), (I-052)+(3.017)+(5.015), (I-052)+(3.017)+(5.018), (I-052)+(3.017)+(5.019), (I-052)+(3.017)+(6.002), (I-052)+(3.017)+(7.001), (I-052)+(3.017)+(7.005), (I-052)+(3.017)+(9.002), (I-052)+(3.017)+(9.004), (I-052)+(3.017)+(14.001), (I-052)+(3.017)+(14.002), (I-052)+(3.017)+(15.008), (I-052)+(3.017)+(15.011), (I-052)+(3.017)+(15.012), (I-052)+(3.017)+(15.016), (I-052)+(3.017)+(15.025), (I-052)+(3.017)+(15.027), (I-052)+(3.017)+(15.047), (I-052)+(3.017)+(15.063), (I-052)+(3.017)+(15.064), (I-052)+(3.017)+(16.001), (I-052)+(3.017)+(16.005), (I-052)+(3.017)+(17.001), (I-052)+(3.017)+(17.002), (I-052)+(3.017)+(17.003), (I-052)+(3.017)+(17.008), (I-052)+(3.017)+(18.001), (I-052)+(3.020)+(3.025), (I-052)+(3.020)+(3.030), (I-052)+(3.020)+(3.031), (I-052)+(3.020)+(5.003), (I-052)+(3.020)+(5.004), (I-052)+(3.020)+(5.005), (I-052)+(3.020)+(5.008), (I-052)+(3.020)+(5.009), (I-052)+(3.020)+(5.011), (I-052)+(3.020)+(5.012), (I-052)+(3.020)+(5.013), (I-052)+(3.020)+(5.015), (I-052)+(3.020)+(5.018), (I-052)+(3.020)+(5.019), (I-052)+(3.020)+(6.002), (I-052)+(3.020)+(7.001), (I-052)+(3.020)+(7.005), (I-052)+(3.020)+(9.002), (I-052)+(3.020)+(9.004), (I-052)+(3.020)+(14.001), (I-052)+(3.020)+(14.002), (I-052)+(3.020)+(15.008), (I-052)+(3.020)+(15.011), (I-052)+(3.020)+(15.012), (I-052)+(3.020)+(15.016), (I-052)+(3.020)+(15.025), (I-052)+(3.020)+(15.027), (I-052)+(3.020)+(15.047), (I-052)+(3.020)+(15.063), (I-052)+(3.020)+(15.064), (I-052)+(3.020)+(16.001), (I-052)+(3.020)+(16.005), (I-052)+(3.020)+(17.001), (I-052)+(3.020)+(17.002), (I-052)+(3.020)+(17.003), (I-052)+(3.020)+(17.008), (I-052)+(3.020)+(18.001), (I-052)+(3.025)+(3.030), (I-052)+(3.025)+(3.031), (I-052)+(3.025)+(5.003), (I-052)+(3.025)+(5.004), (I-052)+(3.025)+(5.005), (I-052)+(3.025)+(5.008), (I-052)+(3.025)+(5.009), (I-052)+(3.025)+(5.011), (I-052)+(3.025)+(5.012), (I-052)+(3.025)+(5.013), (I-052)+(3.025)+(5.015), (I-052)+(3.025)+(5.018), (I-052)+(3.025)+(5.019), (I-052)+(3.025)+(6.002), (I-052)+(3.025)+(7.001), (I-052)+(3.025)+(7.005), (I-052)+(3.025)+(9.002), (I-052)+(3.025)+(9.004), (I-052)+(3.025)+(14.001), (I-052)+(3.025)+(14.002), (I-052)+(3.025)+(15.008), (I-052)+(3.025)+(15.011), (I-052)+(3.025)+(15.012), (I-052)+(3.025)+(15.016), (I-052)+(3.025)+(15.025), (I-052)+(3.025)+(15.027), (I-052)+(3.025)+(15.047), (I-052)+(3.025)+(15.063), (I-052)+(3.025)+(15.064), (I-052)+(3.025)+(16.001), (I-052)+(3.025)+(16.005), (I-052)+(3.025)+(17.001), (I-052)+(3.025)+(17.002), (I-052)+(3.025)+(17.003), (I-052)+(3.025)+(17.008), (I-052)+(3.025)+(18.001), (I-052)+(3.026)+(3.025), (I-052)+(3.026)+(3.030), (I-052)+(3.026)+(3.031), (I-052)+(3.026)+(5.003), (I-052)+(3.026)+(5.004), (I-052)+(3.026)+(5.005), (I-052)+(3.026)+(5.008), (I-052)+(3.026)+(5.009), (I-052)+(3.026)+(5.011), (I-052)+(3.026)+(5.012), (I-052)+(3.026)+(5.013), (I-052)+(3.026)+(5.015), (I-052)+(3.026)+(5.018), (I-052)+(3.026)+(5.019), (I-052)+(3.026)+(6.002), (I-052)+(3.026)+(7.001), (I-052)+(3.026)+(7.005), (I-052)+(3.026)+(9.002), (I-052)+(3.026)+(9.004), (I-052)+(3.026)+(14.001), (I-052)+(3.026)+(14.002), (I-052)+(3.026)+(15.008), (I-052)+(3.026)+(15.011), (I-052)+(3.026)+(15.012), (I-052)+(3.026)+(15.016), (I-052)+(3.026)+(15.025), (I-052)+(3.026)+(15.027), (I-052)+(3.026)+(15.047), (I-052)+(3.026)+(15.063), (I-052)+(3.026)+(15.064), (I-052)+(3.026)+(16.001), (I-052)+(3.026)+(16.005), (I-052)+(3.026)+(17.001), (I-052)+(3.026)+(17.002), (I-052)+(3.026)+(17.003), (I-052)+(3.026)+(17.008), (I-052)+(3.026)+(18.001), (I-052)+(3.030)+(3.025), (I-052)+(3.030)+(3.031), (I-052)+(3.030)+(5.003), (I-052)+(3.030)+(5.004), (I-052)+(3.030)+(5.005), (I-052)+(3.030)+(5.008), (I-052)+(3.030)+(5.009), (I-052)+(3.030)+(5.011), (I-052)+(3.030)+(5.012), (I-052)+(3.030)+(5.013), (I-052)+(3.030)+(5.015), (I-052)+(3.030)+(5.018), (I-052)+(3.030)+(5.019), (I-052)+(3.030)+(6.002), (I-052)+(3.030)+(7.001), (I-052)+(3.030)+(7.005), (I-052)+(3.030)+(9.002), (I-052)+(3.030)+(9.004), (I-052)+(3.030)+(14.001), (I-052)+(3.030)+(14.002), (I-052)+(3.030)+(15.008), (I-052)+(3.030)+(15.011), (I-052)+(3.030)+(15.012), (I-052)+(3.030)+(15.016), (I-052)+(3.030)+(15.025), (I-052)+(3.030)+(15.027), (I-052)+(3.030)+(15.047), (I-052)+(3.030)+(15.063), (I-052)+(3.030)+(15.064), (I-052)+(3.030)+(16.001), (I-052)+(3.030)+(16.005), (I-052)+(3.030)+(17.001), (I-052)+(3.030)+(17.002), (I-052)+(3.030)+(17.003), (I-052)+(3.030)+(17.008), (I-052)+(3.030)+(18.001), (I-052)+(3.031)+(3.025), (I-052)+(3.031)+(3.030), (I-052)+(3.031)+(5.003), (I-052)+(3.031)+(5.004), (I-052)+(3.031)+(5.005), (I-052)+(3.031)+(5.008), (I-052)+(3.031)+(5.009), (I-052)+(3.031)+(5.011), (I-052)+(3.031)+(5.012), (I-052)+(3.031)+(5.013), (I-052)+(3.031)+(5.015), (I-052)+(3.031)+(5.018), (I-052)+(3.031)+(5.019), (I-052)+(3.031)+(6.002), (I-052)+(3.031)+(7.001), (I-052)+(3.031)+(7.005), (I-052)+(3.031)+(9.002), (I-052)+(3.031)+(9.004), (I-052)+(3.031)+(14.001), (I-052)+(3.031)+(14.002), (I-052)+(3.031)+(15.008), (I-052)+(3.031)+(15.011), (I-052)+(3.031)+(15.012), (I-052)+(3.031)+(15.016), (I-052)+(3.031)+(15.025), (I-052)+(3.031)+(15.027), (I-052)+(3.031)+(15.047), (I-052)+(3.031)+(15.063), (I-052)+(3.031)+(15.064), (I-052)+(3.031)+(16.001), (I-052)+(3.031)+(16.005), (I-052)+(3.031)+(17.001), (I-052)+(3.031)+(17.002), (I-052)+(3.031)+(17.003), (I-052)+(3.031)+(17.008), (I-052)+(3.031)+(18.001), (I-052)+(5.003)+(9.002), (I-052)+(5.003)+(15.012), (I-052)+(5.003)+(15.016), (I-052)+(5.003)+(15.025), (I-052)+(5.003)+(15.027), (I-052)+(5.003)+(15.047), (I-052)+(5.003)+(15.063), (I-052)+(5.003)+(15.064), (I-052)+(5.004)+(9.002), (I-052)+(5.004)+(15.012), (I-052)+(5.004)+(15.016), (I-052)+(5.004)+(15.025), (I-052)+(5.004)+(15.027), (I-052)+(5.004)+(15.047), (I-052)+(5.004)+(15.063), (I-052)+(5.004)+(15.064), (I-052)+(5.005)+(9.002), (I-052)+(5.005)+(15.012), (I-052)+(5.005)+(15.016), (I-052)+(5.005)+(15.025), (I-052)+(5.005)+(15.027), (I-052)+(5.005)+(15.047), (I-052)+(5.005)+(15.063), (I-052)+(5.005)+(15.064), (I-052)+(5.008)+(9.002), (I-052)+(5.008)+(15.012), (I-052)+(5.008)+(15.016), (I-052)+(5.008)+(15.025), (I-052)+(5.008)+(15.027), (I-052)+(5.008)+(15.047), (I-052)+(5.008)+(15.063), (I-052)+(5.008)+(15.064), (I-052)+(5.009)+(9.002), (I-052)+(5.009)+(15.012), (I-052)+(5.009)+(15.016), (I-052)+(5.009)+(15.025), (I-052)+(5.009)+(15.027), (I-052)+(5.009)+(15.047), (I-052)+(5.009)+(15.063), (I-052)+(5.009)+(15.064), (I-052)+(5.011)+(9.002), (I-052)+(5.011)+(15.012), (I-052)+(5.011)+(15.016), (I-052)+(5.011)+(15.025), (I-052)+(5.011)+(15.027), (I-052)+(5.011)+(15.047), (I-052)+(5.011)+(15.063), (I-052)+(5.011)+(15.064), (I-052)+(5.012)+(9.002), (I-052)+(5.012)+(15.012), (I-052)+(5.012)+(15.016), (I-052)+(5.012)+(15.025), (I-052)+(5.012)+(15.027), (I-052)+(5.012)+(15.047), (I-052)+(5.012)+(15.063), (I-052)+(5.012)+(15.064), (I-052)+(5.013)+(9.002), (I-052)+(5.013)+(15.012), (I-052)+(5.013)+(15.016), (I-052)+(5.013)+(15.025), (I-052)+(5.013)+(15.027), (I-052)+(5.013)+(15.047), (I-052)+(5.013)+(15.063), (I-052)+(5.013)+(15.064), (I-052)+(5.015)+(9.002), (I-052)+(5.015)+(15.012), (I-052)+(5.015)+(15.016), (I-052)+(5.015)+(15.025), (I-052)+(5.015)+(15.027), (I-052)+(5.015)+(15.047), (I-052)+(5.015)+(15.063), (I-052)+(5.015)+(15.064), (I-052)+(5.018)+(9.002), (I-052)+(5.018)+(15.012), (I-052)+(5.018)+(15.016), (I-052)+(5.018)+(15.025), (I-052)+(5.018)+(15.027), (I-052)+(5.018)+(15.047), (I-052)+(5.018)+(15.063), (I-052)+(5.018)+(15.064), (I-052)+(5.019)+(9.002), (I-052)+(5.019)+(15.012), (I-052)+(5.019)+(15.016), (I-052)+(5.019)+(15.025), (I-052)+(5.019)+(15.027), (I-052)+(5.019)+(15.047), (I-052)+(5.019)+(15.063), (I-052)+(5.019)+(15.064).

If two compounds (B) are present in the combinations according to the invention, more preferred compound combinations are selected from the group (G3-C1) consisting of the following mixtures:

(I-300)+(1.001)+(1.002), (I-300)+(1.001)+(1.003), (I-300)+(1.001)+(1.004), (I-300)+(1.001)+(1.005), (I-300)+(1.001)+(1.006), (I-300)+(1.001)+(1.007), (I-300)+(1.001)+(1.010), (I-300)+(1.001)+(1.011), (I-300)+(1.001)+(1.012), (I-300)+(1.001)+(1.013), (I-300)+(1.001)+(1.017), (I-300)+(1.001)+(1.018), (I-300)+(1.001)+(1.020), (I-300)+(1.001)+(1.021), (I-300)+(1.001)+(1.026), (I-300)+(1.001)+(1.027), (I-300)+(1.001)+(1.055), (I-300)+(1.001)+(1.059), (I-300)+(1.001)+(1.092), (I-300)+(1.001)+(2.001), (I-300)+(1.001)+(2.002), (I-300)+(1.001)+(2.003), (I-300)+(1.001)+(2.005), (I-300)+(1.001)+(2.007), (I-300)+(1.001)+(2.009), (I-300)+(1.001)+(2.010), (I-300)+(1.001)+(2.011), (I-300)+(1.001)+(2.012), (I-300)+(1.001)+(2.013), (I-300)+(1.001)+(2.014), (I-300)+(1.001)+(2.015), (I-300)+(1.001)+(2.016), (I-300)+(1.001)+(2.017), (I-300)+(1.001)+(2.018), (I-300)+(1.001)+(2.019), (I-300)+(1.001)+(2.021), (I-300)+(1.001)+(2.028), (I-300)+(1.001)+(2.030), (I-300)+(1.001)+(2.038), (I-300)+(1.001)+(3.003), (I-300)+(1.001)+(3.007), (I-300)+(1.001)+(3.012), (I-300)+(1.001)+(3.013), (I-300)+(1.001)+(3.016), (I-300)+(1.001)+(3.017), (I-300)+(1.001)+(3.020), (I-300)+(1.001)+(3.025), (I-300)+(1.001)+(3.026), (I-300)+(1.001)+(3.030), (I-300)+(1.001)+(3.031), (I-300)+(1.001)+(5.003), (I-300)+(1.001)+(5.004), (I-300)+(1.001)+(5.005), (I-300)+(1.001)+(5.008), (I-300)+(1.001)+(5.009), (I-300)+(1.001)+(5.011), (I-300)+(1.001)+(5.012), (I-300)+(1.001)+(5.013), (I-300)+(1.001)+(5.015), (I-300)+(1.001)+(5.018), (I-300)+(1.001)+(5.019), (I-300)+(1.001)+(6.002), (I-300)+(1.001)+(7.001), (I-300)+(1.001)+(7.005), (I-300)+(1.001)+(9.002), (I-300)+(1.001)+(9.004), (I-300)+(1.001)+(14.001), (I-300)+(1.001)+(14.002), (I-300)+(1.001)+(15.008), (I-300)+(1.001)+(15.011), (I-300)+(1.001)+(15.012), (I-300)+(1.001)+(15.016), (I-300)+(1.001)+(15.025), (I-300)+(1.001)+(15.027), (I-300)+(1.001)+(15.047), (I-300)+(1.001)+(15.063), (I-300)+(1.001)+(15.064), (I-300)+(1.001)+(16.001), (I-300)+(1.001)+(16.005), (I-300)+(1.001)+(17.001), (I-300)+(1.001)+(17.002), (I-300)+(1.001)+(17.003), (I-300)+(1.001)+(17.008), (I-300)+(1.001)+(18.001),
(I-300)+(1.002)+(1.001), (I-300)+(1.002)+(1.003), (I-300)+(1.002)+(1.004), (I-300)+(1.002)+(1.005), (I-300)+(1.002)+(1.006), (I-300)+(1.002)+(1.007), (I-300)+(1.002)+(1.010), (I-300)+(1.002)+(1.011), (I-300)+(1.002)+(1.012), (I-300)+(1.002)+(1.013), (I-300)+(1.002)+(1.017), (I-300)+(1.002)+(1.018), (I-300)+(1.002)+(1.020), (I-300)+(1.002)+(1.021), (I-300)+(1.002)+(1.026), (I-300)+(1.002)+(1.027), (I-300)+(1.002)+(1.055), (I-300)+(1.002)+(1.059), (I-300)+(1.002)+(1.092), (I-300)+(1.002)+(2.001), (I-300)+(1.002)+(2.002), (I-300)+(1.002)+(2.003), (I-300)+(1.002)+(2.005), (I-300)+(1.002)+(2.007), (I-300)+(1.002)+(2.009), (I-300)+(1.002)+(2.010), (I-300)+(1.002)+(2.011), (I-300)+(1.002)+(2.012), (I-300)+(1.002)+(2.013), (I-300)+(1.002)+(2.014), (I-300)+(1.002)+(2.015), (I-300)+(1.002)+(2.016), (I-300)+(1.002)+(2.017), (I-300)+(1.002)+(2.018), (I-300)+(1.002)+(2.019), (I-300)+(1.002)+(2.021), (I-300)+(1.002)+(2.028), (I-300)+(1.002)+(2.030), (I-300)+(1.002)+(2.038), (I-300)+(1.002)+(3.003), (I-300)+(1.002)+(3.007), (I-300)+(1.002)+(3.012), (I-300)+(1.002)+(3.013), (I-300)+(1.002)+(3.016), (I-300)+(1.002)+(3.017), (I-300)+(1.002)+(3.020), (I-300)+(1.002)+(3.025), (I-300)+(1.002)+(3.026), (I-300)+(1.002)+(3.030), (I-300)+(1.002)+(3.031), (I-300)+(1.002)+(5.003), (I-300)+(1.002)+(5.004), (I-300)+(1.002)+(5.005), (I-300)+(1.002)+(5.008), (I-300)+(1.002)+(5.009), (I-300)+(1.002)+(5.011), (I-300)+(1.002)+(5.012), (I-300)+(1.002)+(5.013), (I-300)+(1.002)+(5.015), (I-300)+(1.002)+(5.018), (I-300)+(1.002)+(5.019), (I-300)+(1.002)+(6.002), (I-300)+(1.002)+(7.001), (I-300)+(1.002)+(7.005), (I-300)+(1.002)+(9.002), (I-300)+(1.002)+(9.004), (I-300)+(1.002)+(14.001), (I-300)+(1.002)+(14.002), (I-300)+(1.002)+(15.008), (I-300)+(1.002)+(15.011), (I-300)+(1.002)+(15.012), (I-300)+(1.002)+(15.016), (I-300)+(1.002)+(15.025), (I-300)+(1.002)+(15.027), (I-300)+(1.002)+(15.047), (I-300)+(1.002)+(15.063), (I-300)+(1.002)+(15.064), (I-300)+(1.002)+(16.001), (I-300)+(1.002)+(16.005), (I-300)+(1.002)+(17.001), (I-300)+(1.002)+(17.002), (I-300)+(1.002)+(17.003), (I-300)+(1.002)+(17.008), (I-300)+(1.002)+(18.001),
(I-300)+(1.003)+(1.001), (I-300)+(1.003)+(1.002), (I-300)+(1.003)+(1.004), (I-300)+(1.003)+(1.005), (I-300)+(1.003)+(1.006), (I-300)+(1.003)+(1.007), (I-300)+(1.003)+(1.010), (I-300)+(1.003)+(1.011), (I-300)+(1.003)+(1.012), (I-300)+(1.003)+(1.013), (I-300)+(1.003)+(1.017), (I-300)+(1.003)+(1.018), (I-300)+(1.003)+(1.020), (I-300)+(1.003)+(1.021), (I-300)+(1.003)+(1.026), (I-300)+(1.003)+(1.027), (I-300)+(1.003)+(1.055), (I-300)+(1.003)+(1.059), (I-300)+(1.003)+(1.092), (I-300)+(1.003)+(2.001), (I-300)+(1.003)+(2.002), (I-300)+(1.003)+(2.003), (I-300)+(1.003)+(2.005), (I-300)+(1.003)+(2.007), (I-300)+(1.003)+(2.009), (I-300)+(1.003)+(2.010), (I-300)+(1.003)+(2.011), (I-300)+(1.003)+(2.012), (I-300)+(1.003)+(2.013), (I-300)+(1.003)+(2.014), (I-300)+(1.003)+(2.015), (I-300)+(1.003)+(2.016), (I-300)+(1.003)+(2.017), (I-300)+(1.003)+(2.018), (I-300)+(1.003)+(2.019), (I-300)+(1.003)+(2.021), (I-300)+(1.003)+(2.028), (I-300)+(1.003)+(2.030), (I-300)+(1.003)+(2.038), (I-300)+(1.003)+(3.003), (I-300)+(1.003)+(3.007), (I-300)+(1.003)+(3.012), (I-300)+(1.003)+(3.013), (I-300)+(1.003)+(3.016), (I-300)+(1.003)+(3.017), (I-300)+(1.003)+(3.020), (I-300)+(1.003)+(3.025), (I-300)+(1.003)+(3.026), (I-300)+(1.003)+(3.030), (I-300)+(1.003)+(3.031), (I-300)+(1.003)+(5.003), (I-300)+(1.003)+(5.004), (I-300)+(1.003)+(5.005), (I-300)+(1.003)+(5.008), (I-300)+(1.003)+(5.009), (I-300)+(1.003)+(5.011), (I-300)+(1.003)+(5.012), (I-300)+(1.003)+(5.013), (I-300)+(1.003)+(5.015), (I-300)+(1.003)+(5.018), (I-300)+(1.003)+(5.019), (I-300)+(1.003)+(6.002), (I-300)+(1.003)+(7.001), (I-300)+(1.003)+(7.005), (I-300)+(1.003)+(9.002), (I-300)+(1.003)+(9.004), (I-300)+(1.003)+(14.001), (I-300)+(1.003)+(14.002), (I-300)+(1.003)+(15.008), (I-300)+(1.003)+(15.011), (I-300)+(1.003)+(15.012), (I-300)+(1.003)+(15.016), (I-300)+(1.003)+(15.025), (I-300)+(1.003)+(15.027), (I-300)+(1.003)+(15.047), (I-300)+(1.003)+(15.063), (I-300)+(1.003)+(15.064), (I-300)+(1.003)+(16.001), (I-300)+(1.003)+(16.005), (I-300)+(1.003)+(17.001), (I-300)+(1.003)+(17.002), (I-300)+(1.003)+(17.003), (I-300)+(1.003)+(17.008), (I-300)+(1.003)+(18.001),
(I-300)+(1.004)+(1.001), (I-300)+(1.004)+(1.002), (I-300)+(1.004)+(1.003), (I-300)+(1.004)+(1.005), (I-300)+(1.004)+(1.006), (I-300)+(1.004)+(1.007), (I-300)+(1.004)+(1.010), (I-300)+(1.004)+(1.011), (I-300)+(1.004)+(1.012), (I-300)+(1.004)+(1.013), (I-300)+(1.004)+(1.017), (I-300)+(1.004)+(1.018), (I-300)+(1.004)+(1.020), (I-300)+(1.004)+(1.021), (I-300)+(1.004)+(1.026), (I-300)+(1.004)+(1.027), (I-300)+(1.004)+(1.055), (I-300)+(1.004)+(1.059), (I-300)+(1.004)+(1.092), (I-300)+(1.004)+(2.001), (I-300)+(1.004)+(2.002), (I-300)+(1.004)+(2.003), (I-300)+(1.004)+(2.005), (I-300)+(1.004)+(2.007), (I-300)+(1.004)+(2.009), (I-300)+(1.004)+(2.010), (I-300)+(1.004)+(2.011), (I-300)+(1.004)+(2.012), (I-300)+(1.004)+(2.013), (I-300)+(1.004)+(2.014), (I-300)+(1.004)+(2.015), (I-300)+(1.004)+(2.016), (I-300)+(1.004)+(2.017), (I-300)+(1.004)+(2.018), (I-300)+(1.004)+(2.019), (I-300)+(1.004)+(2.021), (I-300)+(1.004)+(2.028), (I-300)+(1.004)+(2.030), (I-300)+(1.004)+(2.038), (I-300)+(1.004)+(3.003), (I-300)+(1.004)+(3.007), (I-300)+(1.004)+(3.012), (I-300)+(1.004)+(3.013), (I-300)+(1.004)+(3.016), (I-300)+(1.004)+(3.017), (I-300)+(1.004)+(3.020), (I-300)+(1.004)+(3.025), (I-300)+(1.004)+(3.026), (I-300)+(1.004)+(3.030), (I-300)+(1.004)+(3.031), (I-300)+(1.004)+(5.003), (I-300)+(1.004)+(5.004), (I-300)+(1.004)+(5.005), (I-300)+(1.004)+(5.008), (I-300)+(1.004)+(5.009), (I-300)+(1.004)+(5.011), (I-300)+(1.004)+(5.012), (I-300)+(1.004)+(5.013), (I-300)+(1.004)+(5.015), (I-300)+(1.004)+(5.018), (I-300)+(1.004)+(5.019), (I-300)+(1.004)+(6.002), (I-300)+(1.004)+(7.001), (I-300)+(1.004)+(7.005), (I-300)+(1.004)+(9.002), (I-300)+(1.004)+(9.004), (I-300)+(1.004)+(14.001), (I-300)+(1.004)+(14.002), (I-300)+(1.004)+(15.008), (I-300)+(1.004)+(15.011), (I-300)+(1.004)+(15.012), (I-300)+(1.004)+(15.016), (I-300)+(1.004)+(15.025), (I-300)+(1.004)+(15.027), (I-300)+(1.004)+(15.047), (I-300)+(1.004)+(15.063), (I-300)+(1.004)+(15.064), (I-300)+(1.004)+(16.001), (I-300)+(1.004)+(16.005), (I-300)+(1.004)+(17.001), (I-300)+(1.004)+(17.002), (I-300)+(1.004)+(17.003), (I-300)+(1.004)+(17.008), (I-300)+(1.004)+(18.001), (I-300)+(1.005)+(1.001), (I-300)+(1.005)+(1.002), (I-300)+(1.005)+(1.003), (I-300)+(1.005)+(1.004), (I-300)+(1.005)+(1.006), (I-300)+(1.005)+(1.007), (I-300)+(1.005)+(1.010), (I-300)+(1.005)+(1.011), (I-300)+(1.005)+(1.012), (I-300)+(1.005)+(1.013), (I-300)+(1.005)+(1.017), (I-300)+(1.005)+(1.018), (I-300)+(1.005)+(1.020), (I-300)+(1.005)+(1.021), (I-300)+(1.005)+(1.026), (I-300)+(1.005)+(1.027), (I-300)+(1.005)+(1.055), (I-300)+(1.005)+(1.059), (I-300)+(1.005)+(1.092), (I-300)+(1.005)+(2.001), (I-300)+(1.005)+(2.002), (I-300)+(1.005)+(2.003), (I-300)+(1.005)+(2.005), (I-300)+(1.005)+(2.007), (I-300)+(1.005)+(2.009), (I-300)+(1.005)+(2.010), (I-300)+(1.005)+(2.011), (I-300)+(1.005)+(2.012), (I-300)+(1.005)+(2.013), (I-300)+(1.005)+(2.014), (I-300)+(1.005)+(2.015), (I-300)+(1.005)+(2.016), (I-300)+(1.005)+(2.017), (I-300)+(1.005)+(2.018), (I-300)+(1.005)+(2.019), (I-300)+(1.005)+(2.021), (I-300)+(1.005)+(2.028), (I-300)+(1.005)+(2.030), (I-300)+(1.005)+(2.038), (I-300)+(1.005)+(3.003), (I-300)+(1.005)+(3.007), (I-300)+(1.005)+(3.012), (I-300)+(1.005)+(3.013), (I-300)+(1.005)+(3.016), (I-300)+(1.005)+(3.017), (I-300)+(1.005)+(3.020), (I-300)+(1.005)+(3.025), (I-300)+(1.005)+(3.026), (I-300)+(1.005)+(3.030), (I-300)+(1.005)+(3.031), (I-300)+(1.005)+(5.003), (I-300)+(1.005)+(5.004), (I-300)+(1.005)+(5.005), (I-300)+(1.005)+(5.008), (I-300)+(1.005)+(5.009), (I-300)+(1.005)+(5.011), (I-300)+(1.005)+(5.012), (I-300)+(1.005)+(5.013), (I-300)+(1.005)+(5.015), (I-300)+(1.005)+(5.018), (I-300)+(1.005)+(5.019), (I-300)+(1.005)+(6.002), (I-300)+(1.005)+(7.001), (I-300)+(1.005)+(7.005), (I-300)+(1.005)+(9.002), (I-300)+(1.005)+(9.004), (I-300)+(1.005)+(14.001), (I-300)+(1.005)+(14.002), (I-300)+(1.005)+(15.008), (I-300)+(1.005)+(15.011), (I-300)+(1.005)+(15.012), (I-300)+(1.005)+(15.016), (I-300)+(1.005)+(15.025), (I-300)+(1.005)+(15.027), (I-300)+(1.005)+(15.047), (I-300)+(1.005)+(15.063), (I-300)+(1.005)+(15.064), (I-300)+(1.005)+(16.001), (I-300)+(1.005)+(16.005), (I-300)+(1.005)+(17.001), (I-300)+(1.005)+(17.002), (I-300)+(1.005)+(17.003), (I-300)+(1.005)+(17.008), (I-300)+(1.005)+(18.001), (I-300)+(1.006)+(1.001), (I-300)+(1.006)+(1.002), (I-300)+(1.006)+(1.003), (I-300)+(1.006)+(1.004), (I-300)+(1.006)+(1.005), (I-300)+(1.006)+(1.007), (I-300)+(1.006)+(1.010), (I-300)+(1.006)+(1.011), (I-300)+(1.006)+(1.012), (I-300)+(1.006)+(1.013), (I-300)+(1.006)+(1.017), (I-300)+(1.006)+(1.018), (I-300)+(1.006)+(1.020), (I-300)+(1.006)+(1.021), (I-300)+(1.006)+(1.026), (I-300)+(1.006)+(1.027), (I-300)+(1.006)+(1.055), (I-300)+(1.006)+(1.059), (I-300)+(1.006)+(1.092), (I-300)+(1.006)+(2.001), (I-300)+(1.006)+(2.002), (I-300)+(1.006)+(2.003), (I-300)+(1.006)+(2.005), (I-300)+(1.006)+(2.007), (I-300)+(1.006)+(2.009), (I-300)+(1.006)+(2.010), (I-300)+(1.006)+(2.011), (I-300)+(1.006)+(2.012), (I-300)+(1.006)+(2.013), (I-300)+(1.006)+(2.014), (I-300)+(1.006)+(2.015), (I-300)+(1.006)+(2.016), (I-300)+(1.006)+(2.017), (I-300)+(1.006)+(2.018), (I-300)+(1.006)+(2.019), (I-300)+(1.006)+(2.021), (I-300)+(1.006)+(2.028), (I-300)+(1.006)+(2.030), (I-300)+(1.006)+(2.038), (I-300)+(1.006)+(3.003), (I-300)+(1.006)+(3.007), (I-300)+(1.006)+(3.012), (I-300)+(1.006)+(3.013), (I-300)+(1.006)+(3.016), (I-300)+(1.006)+(3.017), (I-300)+(1.006)+(3.020), (I-300)+(1.006)+(3.025), (I-300)+(1.006)+(3.026), (I-300)+(1.006)+(3.030), (I-300)+(1.006)+(3.031), (I-300)+(1.006)+(5.003), (I-300)+(1.006)+(5.004), (I-300)+(1.006)+(5.005), (I-300)+(1.006)+(5.008), (I-300)+(1.006)+(5.009), (I-300)+(1.006)+(5.011), (I-300)+(1.006)+(5.012), (I-300)+(1.006)+(5.013), (I-300)+(1.006)+(5.015), (I-300)+(1.006)+(5.018), (I-300)+(1.006)+(5.019), (I-300)+(1.006)+(6.002), (I-300)+(1.006)+(7.001), (I-300)+(1.006)+(7.005), (I-300)+(1.006)+(9.002), (I-300)+(1.006)+(9.004), (I-300)+(1.006)+(14.001), (I-300)+(1.006)+(14.002), (I-300)+(1.006)+(15.008), (I-300)+(1.006)+(15.011), (I-300)+(1.006)+(15.012), (I-300)+(1.006)+(15.016), (I-300)+(1.006)+(15.025), (I-300)+(1.006)+(15.027), (I-300)+(1.006)+(15.047), (I-300)+(1.006)+(15.063), (I-300)+(1.006)+(15.064), (I-300)+(1.006)+(16.001), (I-300)+(1.006)+(16.005), (I-300)+(1.006)+(17.001), (I-300)+(1.006)+(17.002), (I-300)+(1.006)+(17.003), (I-300)+(1.006)+(17.008), (I-300)+(1.006)+(18.001), (I-300)+(1.007)+(1.001), (I-300)+(1.007)+(1.002), (I-300)+(1.007)+(1.003), (I-300)+(1.007)+(1.004), (I-300)+(1.007)+(1.005), (I-300)+(1.007)+(1.006), (I-300)+(1.007)+(1.010), (I-300)+(1.007)+(1.011), (I-300)+(1.007)+(1.012), (I-300)+(1.007)+(1.013), (I-300)+(1.007)+(1.017), (I-300)+(1.007)+(1.018), (I-300)+(1.007)+(1.020), (I-300)+(1.007)+(1.021), (I-300)+(1.007)+(1.026), (I-300)+(1.007)+(1.027), (I-300)+(1.007)+(1.055), (I-300)+(1.007)+(1.059), (I-300)+(1.007)+(1.092), (I-300)+(1.007)+(2.001), (I-300)+(1.007)+(2.002), (I-300)+(1.007)+(2.003), (I-300)+(1.007)+(2.005), (I-300)+(1.007)+(2.007), (I-300)+(1.007)+(2.009), (I-300)+(1.007)+(2.010), (I-300)+(1.007)+(2.011), (I-300)+(1.007)+(2.012), (I-300)+(1.007)+(2.013), (I-300)+(1.007)+(2.014), (I-300)+(1.007)+(2.015), (I-300)+(1.007)+(2.016), (I-300)+(1.007)+(2.017), (I-300)+(1.007)+(2.018), (I-300)+(1.007)+(2.019), (I-300)+(1.007)+(2.021), (I-300)+(1.007)+(2.028), (I-300)+(1.007)+(2.030), (I-300)+(1.007)+(2.038), (I-300)+(1.007)+(3.003), (I-300)+(1.007)+(3.007), (I-300)+(1.007)+(3.012), (I-300)+(1.007)+(3.013), (I-300)+(1.007)+(3.016), (I-300)+(1.007)+(3.017), (I-300)+(1.007)+(3.020), (I-300)+(1.007)+(3.025), (I-300)+(1.007)+(3.026), (I-300)+(1.007)+(3.030), (I-300)+(1.007)+(3.031), (I-300)+(1.007)+(5.003), (I-300)+(1.007)+(5.004), (I-300)+(1.007)+(5.005), (I-300)+(1.007)+(5.008), (I-300)+(1.007)+(5.009), (I-300)+(1.007)+(5.011), (I-300)+(1.007)+(5.012), (I-300)+(1.007)+(5.013), (I-300)+(1.007)+(5.015), (I-300)+(1.007)+(5.018), (I-300)+(1.007)+(5.019), (I-300)+(1.007)+(6.002), (I-300)+(1.007)+(7.001), (I-300)+(1.007)+(7.005), (I-300)+(1.007)+(9.002), (I-300)+(1.007)+(9.004), (I-300)+(1.007)+(14.001), (I-300)+(1.007)+(14.002), (I-300)+(1.007)+(15.008), (I-300)+(1.007)+(15.011), (I-300)+(1.007)+(15.012), (I-300)+(1.007)+(15.016), (I-300)+(1.007)+(15.025), (I-300)+(1.007)+(15.027), (I-300)+(1.007)+(15.047), (I-300)+(1.007)+(15.063), (I-300)+(1.007)+(15.064), (I-300)+(1.007)+(16.001), (I-300)+(1.007)+(16.005), (I-300)+(1.007)+(17.001), (I-300)+(1.007)+(17.002), (I-300)+(1.007)+(17.003), (I-300)+(1.007)+(17.008), (I-300)+(1.007)+(18.001), (I-300)+(1.010)+(1.001), (I-300)+(1.010)+(1.002), (I-300)+(1.010)+(1.003), (I-300)+(1.010)+(1.004), (I-300)+(1.010)+(1.005), (I-300)+(1.010)+(1.006), (I-300)+(1.010)+(1.007), (I-300)+(1.010)+(1.011), (I-300)+(1.010)+(1.012), (I-300)+(1.010)+(1.013), (I-300)+(1.010)+(1.017), (I-300)+(1.010)+(1.018), (I-300)+(1.010)+(1.020), (I-300)+(1.010)+(1.021), (I-300)+(1.010)+(1.026), (I-300)+(1.010)+(1.027), (I-300)+(1.010)+(1.055), (I-300)+(1.010)+(1.059), (I-300)+(1.010)+(1.092), (I-300)+(1.010)+(2.001), (I-300)+(1.010)+(2.002), (I-300)+(1.010)+(2.003), (I-300)+(1.010)+(2.005), (I-300)+(1.010)+(2.007), (I-300)+(1.010)+(2.009), (I-300)+(1.010)+(2.010), (I-300)+(1.010)+(2.011), (I-300)+(1.010)+(2.012), (I-300)+(1.010)+(2.013), (I-300)+(1.010)+(2.014), (I-300)+(1.010)+(2.015), (I-300)+(1.010)+(2.016), (I-300)+(1.010)+(2.017), (I-300)+(1.010)+(2.018), (I-300)+(1.010)+(2.019), (I-300)+(1.010)+(2.021), (I-300)+(1.010)+(2.028), (I-300)+(1.010)+(2.030), (I-300)+(1.010)+(2.038), (I-300)+(1.010)+(3.003), (I-300)+(1.010)+(3.007), (I-300)+(1.010)+(3.012), (I-300)+(1.010)+(3.013), (I-300)+(1.010)+(3.016), (I-300)+(1.010)+(3.017), (I-300)+(1.010)+(3.020), (I-300)+(1.010)+(3.025), (I-300)+(1.010)+(3.026), (I-300)+(1.010)+(3.030), (I-300)+(1.010)+(3.031), (I-300)+(1.010)+(5.003), (I-300)+(1.010)+(5.004), (I-300)+(1.010)+(5.005), (I-300)+(1.010)+(5.008), (I-300)+(1.010)+(5.009), (I-300)+(1.010)+(5.011), (I-300)+(1.010)+(5.012), (I-300)+(1.010)+(5.013), (I-300)+(1.010)+(5.015), (I-300)+(1.010)+(5.018), (I-300)+(1.010)+(5.019), (I-300)+(1.010)+(6.002), (I-300)+(1.010)+(7.001), (I-300)+(1.010)+(7.005), (I-300)+(1.010)+(9.002), (I-300)+(1.010)+(9.004), (I-300)+(1.010)+(14.001), (I-300)+(1.010)+(14.002), (I-300)+(1.010)+(15.008), (I-300)+(1.010)+(15.011), (I-300)+(1.010)+(15.012), (I-300)+(1.010)+(15.016), (I-300)+(1.010)+(15.025), (I-300)+(1.010)+(15.027), (I-300)+(1.010)+(15.047), (I-300)+(1.010)+(15.063), (I-300)+(1.010)+(15.064), (I-300)+(1.010)+(16.001), (I-300)+(1.010)+(16.005), (I-300)+(1.010)+(17.001), (I-300)+(1.010)+(17.002), (I-300)+(1.010)+(17.003), (I-300)+(1.010)+(17.008), (I-300)+(1.010)+(18.001), (I-300)+(1.011)+(1.001), (I-300)+(1.011)+(1.002), (I-300)+(1.011)+(1.003), (I-300)+(1.011)+(1.004), (I-300)+(1.011)+(1.005), (I-300)+(1.011)+(1.006), (I-300)+(1.011)+(1.007), (I-300)+(1.011)+(1.010), (I-300)+(1.011)+(1.012), (I-300)+(1.011)+(1.013), (I-300)+(1.011)+(1.017), (I-300)+(1.011)+(1.018), (I-300)+(1.011)+(1.020), (I-300)+(1.011)+(1.021), (I-300)+(1.011)+(1.026), (I-300)+(1.011)+(1.027), (I-300)+(1.011)+(1.055), (I-300)+(1.011)+(1.059), (I-300)+(1.011)+(1.092), (I-300)+(1.011)+(2.001), (I-300)+(1.011)+(2.002), (I-300)+(1.011)+(2.003), (I-300)+(1.011)+(2.005), (I-300)+(1.011)+(2.007), (I-300)+(1.011)+(2.009), (I-300)+(1.011)+(2.010), (I-300)+(1.011)+(2.011), (I-300)+(1.011)+(2.012), (I-300)+(1.011)+(2.013), (I-300)+(1.011)+(2.014), (I-300)+(1.011)+(2.015), (I-300)+(1.011)+(2.016), (I-300)+(1.011)+(2.017), (I-300)+(1.011)+(2.018), (I-300)+(1.011)+(2.019), (I-300)+(1.011)+(2.021), (I-300)+(1.011)+(2.028), (I-300)+(1.011)+(2.030), (I-300)+(1.011)+(2.038), (I-300)+(1.011)+(3.003), (I-300)+(1.011)+(3.007), (I-300)+(1.011)+(3.012), (I-300)+(1.011)+(3.013), (I-300)+(1.011)+(3.016), (I-300)+(1.011)+(3.017), (I-300)+(1.011)+(3.020), (I-300)+(1.011)+(3.025), (I-300)+(1.011)+(3.026), (I-300)+(1.011)+(3.030), (I-300)+(1.011)+(3.031), (I-300)+(1.011)+(5.003), (I-300)+(1.011)+(5.004), (I-300)+(1.011)+(5.005), (I-300)+(1.011)+(5.008), (I-300)+(1.011)+(5.009), (I-300)+(1.011)+(5.011), (I-300)+(1.011)+(5.012), (I-300)+(1.011)+(5.013), (I-300)+(1.011)+(5.015), (I-300)+(1.011)+(5.018), (I-300)+(1.011)+(5.019), (I-300)+(1.011)+(6.002), (I-300)+(1.011)+(7.001), (I-300)+(1.011)+(7.005), (I-300)+(1.011)+(9.002), (I-300)+(1.011)+(9.004), (I-300)+(1.011)+(14.001), (I-300)+(1.011)+(14.002), (I-300)+(1.011)+(15.008), (I-300)+(1.011)+(15.011), (I-300)+(1.011)+(15.012), (I-300)+(1.011)+(15.016), (I-300)+(1.011)+(15.025), (I-300)+(1.011)+(15.027), (I-300)+(1.011)+(15.047), (I-300)+(1.011)+(15.063), (I-300)+(1.011)+(15.064), (I-300)+(1.011)+(16.001), (I-300)+(1.011)+(16.005), (I-300)+(1.011)+(17.001), (I-300)+(1.011)+(17.002), (I-300)+(1.011)+(17.003), (I-300)+(1.011)+(17.008), (I-300)+(1.011)+(18.001), (I-300)+(1.012)+(1.001), (I-300)+(1.012)+(1.002), (I-300)+(1.012)+(1.003), (I-300)+(1.012)+(1.004), (I-300)+(1.012)+(1.005), (I-300)+(1.012)+(1.006), (I-300)+(1.012)+(1.007), (I-300)+(1.012)+(1.010), (I-300)+(1.012)+(1.011), (I-300)+(1.012)+(1.013), (I-300)+(1.012)+(1.017), (I-300)+(1.012)+(1.018), (I-300)+(1.012)+(1.020), (I-300)+(1.012)+(1.021), (I-300)+(1.012)+(1.026), (I-300)+(1.012)+(1.027), (I-300)+(1.012)+(1.055), (I-300)+(1.012)+(1.059), (I-300)+(1.012)+(1.092), (I-300)+(1.012)+(2.001), (I-300)+(1.012)+(2.002), (I-300)+(1.012)+(2.003), (I-300)+(1.012)+(2.005), (I-300)+(1.012)+(2.007), (I-300)+(1.012)+(2.009), (I-300)+(1.012)+(2.010), (I-300)+(1.012)+(2.011), (I-300)+(1.012)+(2.012), (I-300)+(1.012)+(2.013), (I-300)+(1.012)+(2.014), (I-300)+(1.012)+(2.015), (I-300)+(1.012)+(2.016), (I-300)+(1.012)+(2.017), (I-300)+(1.012)+(2.018), (I-300)+(1.012)+(2.019), (I-300)+(1.012)+(2.021), (I-300)+(1.012)+(2.028), (I-300)+(1.012)+(2.030), (I-300)+(1.012)+(2.038), (I-300)+(1.012)+(3.003), (I-300)+(1.012)+(3.007), (I-300)+(1.012)+(3.012), (I-300)+(1.012)+(3.013), (I-300)+(1.012)+(3.016), (I-300)+(1.012)+(3.017), (I-300)+(1.012)+(3.020), (I-300)+(1.012)+(3.025), (I-300)+(1.012)+(3.026), (I-300)+(1.012)+(3.030), (I-300)+(1.012)+(3.031), (I-300)+(1.012)+(5.003), (I-300)+(1.012)+(5.004), (I-300)+(1.012)+(5.005), (I-300)+(1.012)+(5.008), (I-300)+(1.012)+(5.009), (I-300)+(1.012)+(5.011), (I-300)+(1.012)+(5.012), (I-300)+(1.012)+(5.013), (I-300)+(1.012)+(5.015), (I-300)+(1.012)+(5.018), (I-300)+(1.012)+(5.019), (I-300)+(1.012)+(6.002), (I-300)+(1.012)+(7.001), (I-300)+(1.012)+(7.005), (I-300)+(1.012)+(9.002), (I-300)+(1.012)+(9.004), (I-300)+(1.012)+(14.001), (I-300)+(1.012)+(14.002), (I-300)+(1.012)+(15.008), (I-300)+(1.012)+(15.011), (I-300)+(1.012)+(15.012), (I-300)+(1.012)+(15.016), (I-300)+(1.012)+(15.025), (I-300)+(1.012)+(15.027), (I-300)+(1.012)+(15.047), (I-300)+(1.012)+(15.063), (I-300)+(1.012)+(15.064), (I-300)+(1.012)+(16.001), (I-300)+(1.012)+(16.005), (I-300)+(1.012)+(17.001), (I-300)+(1.012)+(17.002), (I-300)+(1.012)+(17.003), (I-300)+(1.012)+(17.008), (I-300)+(1.012)+(18.001), (I-300)+(1.013)+(1.001), (I-300)+(1.013)+(1.002), (I-300)+(1.013)+(1.003), (I-300)+(1.013)+(1.004), (I-300)+(1.013)+(1.005), (I-300)+(1.013)+(1.006), (I-300)+(1.013)+(1.007), (I-300)+(1.013)+(1.010), (I-300)+(1.013)+(1.011), (I-300)+(1.013)+(1.012), (I-300)+(1.013)+(1.017), (I-300)+(1.013)+(1.018), (I-300)+(1.013)+(1.020), (I-300)+(1.013)+(1.021), (I-300)+(1.013)+(1.026), (I-300)+(1.013)+(1.027), (I-300)+(1.013)+(1.055), (I-300)+(1.013)+(1.059), (I-300)+(1.013)+(1.092), (I-300)+(1.013)+(2.001), (I-300)+(1.013)+(2.002), (I-300)+(1.013)+(2.003), (I-300)+(1.013)+(2.005), (I-300)+(1.013)+(2.007), (I-300)+(1.013)+(2.009), (I-300)+(1.013)+(2.010), (I-300)+(1.013)+(2.011), (I-300)+(1.013)+(2.012), (I-300)+(1.013)+(2.013), (I-300)+(1.013)+(2.014), (I-300)+(1.013)+(2.015), (I-300)+(1.013)+(2.016), (I-300)+(1.013)+(2.017), (I-300)+(1.013)+(2.018), (I-300)+(1.013)+(2.019), (I-300)+(1.013)+(2.021), (I-300)+(1.013)+(2.028), (I-300)+(1.013)+(2.030), (I-300)+(1.013)+(2.038), (I-300)+(1.013)+(3.003), (I-300)+(1.013)+(3.007), (I-300)+(1.013)+(3.012), (I-300)+(1.013)+(3.013), (I-300)+(1.013)+(3.016), (I-300)+(1.013)+(3.017), (I-300)+(1.013)+(3.020), (I-300)+(1.013)+(3.025), (I-300)+(1.013)+(3.026), (I-300)+(1.013)+(3.030), (I-300)+(1.013)+(3.031), (I-300)+(1.013)+(5.003), (I-300)+(1.013)+(5.004), (I-300)+(1.013)+(5.005), (I-300)+(1.013)+(5.008), (I-300)+(1.013)+(5.009), (I-300)+(1.013)+(5.011), (I-300)+(1.013)+(5.012), (I-300)+(1.013)+(5.013), (I-300)+(1.013)+(5.015), (I-300)+(1.013)+(5.018), (I-300)+(1.013)+(5.019), (I-300)+(1.013)+(6.002), (I-300)+(1.013)+(7.001), (I-300)+(1.013)+(7.005), (I-300)+(1.013)+(9.002), (I-300)+(1.013)+(9.004), (I-300)+(1.013)+(14.001), (I-300)+(1.013)+(14.002), (I-300)+(1.013)+(15.008), (I-300)+(1.013)+(15.011), (I-300)+(1.013)+(15.012), (I-300)+(1.013)+(15.016), (I-300)+(1.013)+(15.025), (I-300)+(1.013)+(15.027), (I-300)+(1.013)+(15.047), (I-300)+(1.013)+(15.063), (I-300)+(1.013)+(15.064), (I-300)+(1.013)+(16.001), (I-300)+(1.013)+(16.005), (I-300)+(1.013)+(17.001), (I-300)+(1.013)+(17.002), (I-300)+(1.013)+(17.003), (I-300)+(1.013)+(17.008), (I-300)+(1.013)+(18.001), (I-300)+(1.017)+(1.001), (I-300)+(1.017)+(1.002), (I-300)+(1.017)+(1.003), (I-300)+(1.017)+(1.004), (I-300)+(1.017)+(1.005), (I-300)+(1.017)+(1.006), (I-300)+(1.017)+(1.007), (I-300)+(1.017)+(1.010), (I-300)+(1.017)+(1.011), (I-300)+(1.017)+(1.012), (I-300)+(1.017)+(1.013), (I-300)+(1.017)+(1.018), (I-300)+(1.017)+(1.020), (I-300)+(1.017)+(1.021), (I-300)+(1.017)+(1.026), (I-300)+(1.017)+(1.027), (I-300)+(1.017)+(1.055), (I-300)+(1.017)+(1.059), (I-300)+(1.017)+(1.092), (I-300)+(1.017)+(2.001), (I-300)+(1.017)+(2.002), (I-300)+(1.017)+(2.003), (I-300)+(1.017)+(2.005), (I-300)+(1.017)+(2.007), (I-300)+(1.017)+(2.009), (I-300)+(1.017)+(2.010), (I-300)+(1.017)+(2.011), (I-300)+(1.017)+(2.012), (I-300)+(1.017)+(2.013), (I-300)+(1.017)+(2.014), (I-300)+(1.017)+(2.015), (I-300)+(1.017)+(2.016), (I-300)+(1.017)+(2.017), (I-300)+(1.017)+(2.018), (I-300)+(1.017)+(2.019), (I-300)+(1.017)+(2.021), (I-300)+(1.017)+(2.028), (I-300)+(1.017)+(2.030), (I-300)+(1.017)+(2.038), (I-300)+(1.017)+(3.003), (I-300)+(1.017)+(3.007), (I-300)+(1.017)+(3.012), (I-300)+(1.017)+(3.013), (I-300)+(1.017)+(3.016), (I-300)+(1.017)+(3.017), (I-300)+(1.017)+(3.020), (I-300)+(1.017)+(3.025), (I-300)+(1.017)+(3.026), (I-300)+(1.017)+(3.030), (I-300)+(1.017)+(3.031), (I-300)+(1.017)+(5.003), (I-300)+(1.017)+(5.004), (I-300)+(1.017)+(5.005), (I-300)+(1.017)+(5.008), (I-300)+(1.017)+(5.009), (I-300)+(1.017)+(5.011), (I-300)+(1.017)+(5.012), (I-300)+(1.017)+(5.013), (I-300)+(1.017)+(5.015), (I-300)+(1.017)+(5.018), (I-300)+(1.017)+(5.019), (I-300)+(1.017)+(6.002), (I-300)+(1.017)+(7.001), (I-300)+(1.017)+(7.005), (I-300)+(1.017)+(9.002), (I-300)+(1.017)+(9.004), (I-300)+(1.017)+(14.001), (I-300)+(1.017)+(14.002), (I-300)+(1.017)+(15.008), (I-300)+(1.017)+(15.011), (I-300)+(1.017)+(15.012), (I-300)+(1.017)+(15.016), (I-300)+(1.017)+(15.025), (I-300)+(1.017)+(15.027), (I-300)+(1.017)+(15.047), (I-300)+(1.017)+(15.063), (I-300)+(1.017)+(15.064), (I-300)+(1.017)+(16.001), (I-300)+(1.017)+(16.005), (I-300)+(1.017)+(17.001), (I-300)+(1.017)+(17.002), (I-300)+(1.017)+(17.003), (I-300)+(1.017)+(17.008), (I-300)+(1.017)+(18.001), (I-300)+(1.018)+(1.001), (I-300)+(1.018)+(1.002), (I-300)+(1.018)+(1.003), (I-300)+(1.018)+(1.004), (I-300)+(1.018)+(1.005), (I-300)+(1.018)+(1.006), (I-300)+(1.018)+(1.007), (I-300)+(1.018)+(1.010), (I-300)+(1.018)+(1.011), (I-300)+(1.018)+(1.012), (I-300)+(1.018)+(1.013), (I-300)+(1.018)+(1.017), (I-300)+(1.018)+(1.020), (I-300)+(1.018)+(1.021), (I-300)+(1.018)+(1.026), (I-300)+(1.018)+(1.027), (I-300)+(1.018)+(1.055), (I-300)+(1.018)+(1.059), (I-300)+(1.018)+(1.092), (I-300)+(1.018)+(2.001), (I-300)+(1.018)+(2.002), (I-300)+(1.018)+(2.003), (I-300)+(1.018)+(2.005), (I-300)+(1.018)+(2.007), (I-300)+(1.018)+(2.009), (I-300)+(1.018)+(2.010), (I-300)+(1.018)+(2.011), (I-300)+(1.018)+(2.012), (I-300)+(1.018)+(2.013), (I-300)+(1.018)+(2.014), (I-300)+(1.018)+(2.015), (I-300)+(1.018)+(2.016), (I-300)+(1.018)+(2.017), (I-300)+(1.018)+(2.018), (I-300)+(1.018)+(2.019), (I-300)+(1.018)+(2.021), (I-300)+(1.018)+(2.028), (I-300)+(1.018)+(2.030), (I-300)+(1.018)+(2.038), (I-300)+(1.018)+(3.003), (I-300)+(1.018)+(3.007), (I-300)+(1.018)+(3.012), (I-300)+(1.018)+(3.013), (I-300)+(1.018)+(3.016), (I-300)+(1.018)+(3.017), (I-300)+(1.018)+(3.020), (I-300)+(1.018)+(3.025), (I-300)+(1.018)+(3.026), (I-300)+(1.018)+(3.030), (I-300)+(1.018)+(3.031), (I-300)+(1.018)+(5.003), (I-300)+(1.018)+(5.004), (I-300)+(1.018)+(5.005), (I-300)+(1.018)+(5.008), (I-300)+(1.018)+(5.009), (I-300)+(1.018)+(5.011), (I-300)+(1.018)+(5.012), (I-300)+(1.018)+(5.013), (I-300)+(1.018)+(5.015), (I-300)+(1.018)+(5.018), (I-300)+(1.018)+(5.019), (I-300)+(1.018)+(6.002), (I-300)+(1.018)+(7.001), (I-300)+(1.018)+(7.005), (I-300)+(1.018)+(9.002), (I-300)+(1.018)+(9.004), (I-300)+(1.018)+(14.001), (I-300)+(1.018)+(14.002), (I-300)+(1.018)+(15.008), (I-300)+(1.018)+(15.011), (I-300)+(1.018)+(15.012), (I-300)+(1.018)+(15.016), (I-300)+(1.018)+(15.025), (I-300)+(1.018)+(15.027), (I-300)+(1.018)+(15.047), (I-300)+(1.018)+(15.063), (I-300)+(1.018)+(15.064), (I-300)+(1.018)+(16.001), (I-300)+(1.018)+(16.005), (I-300)+(1.018)+(17.001), (I-300)+(1.018)+(17.002), (I-300)+(1.018)+(17.003), (I-300)+(1.018)+(17.008), (I-300)+(1.018)+(18.001),
(I-300)+(1.020)+(1.001), (I-300)+(1.020)+(1.002), (I-300)+(1.020)+(1.003), (I-300)+(1.020)+(1.004), (I-300)+(1.020)+(1.005), (I-300)+(1.020)+(1.006), (I-300)+(1.020)+(1.007), (I-300)+(1.020)+(1.010), (I-300)+(1.020)+(1.011), (I-300)+(1.020)+(1.012), (I-300)+(1.020)+(1.013), (I-300)+(1.020)+(1.017), (I-300)+(1.020)+(1.018), (I-300)+(1.020)+(1.021), (I-300)+(1.020)+(1.026), (I-300)+(1.020)+(1.027), (I-300)+(1.020)+(1.055), (I-300)+(1.020)+(1.059), (I-300)+(1.020)+(1.092), (I-300)+(1.020)+(2.001), (I-300)+(1.020)+(2.002), (I-300)+(1.020)+(2.003), (I-300)+(1.020)+(2.005), (I-300)+(1.020)+(2.007), (I-300)+(1.020)+(2.009), (I-300)+(1.020)+(2.010), (I-300)+(1.020)+(2.011), (I-300)+(1.020)+(2.012), (I-300)+(1.020)+(2.013), (I-300)+(1.020)+(2.014), (I-300)+(1.020)+(2.015), (I-300)+(1.020)+(2.016), (I-300)+(1.020)+(2.017), (I-300)+(1.020)+(2.018), (I-300)+(1.020)+(2.019), (I-300)+(1.020)+(2.021), (I-300)+(1.020)+(2.028), (I-300)+(1.020)+(2.030), (I-300)+(1.020)+(2.038), (I-300)+(1.020)+(3.003), (I-300)+(1.020)+(3.007), (I-300)+(1.020)+(3.012), (I-300)+(1.020)+(3.013), (I-300)+(1.020)+(3.016), (I-300)+(1.020)+(3.017), (I-300)+(1.020)+(3.020), (I-300)+(1.020)+(3.025), (I-300)+(1.020)+(3.026), (I-300)+(1.020)+(3.030), (I-300)+(1.020)+(3.031), (I-300)+(1.020)+(5.003), (I-300)+(1.020)+(5.004), (I-300)+(1.020)+(5.005), (I-300)+(1.020)+(5.008), (I-300)+(1.020)+(5.009), (I-300)+(1.020)+(5.011), (I-300)+(1.020)+(5.012), (I-300)+(1.020)+(5.013), (I-300)+(1.020)+(5.015), (I-300)+(1.020)+(5.018), (I-300)+(1.020)+(5.019), (I-300)+(1.020)+(6.002), (I-300)+(1.020)+(7.001), (I-300)+(1.020)+(7.005), (I-300)+(1.020)+(9.002), (I-300)+(1.020)+(9.004), (I-300)+(1.020)+(14.001), (I-300)+(1.020)+(14.002), (I-300)+(1.020)+(15.008), (I-300)+(1.020)+(15.011), (I-300)+(1.020)+(15.012), (I-300)+(1.020)+(15.016), (I-300)+(1.020)+(15.025), (I-300)+(1.020)+(15.027), (I-300)+(1.020)+(15.047), (I-300)+(1.020)+(15.063), (I-300)+(1.020)+(15.064), (I-300)+(1.020)+(16.001), (I-300)+(1.020)+(16.005), (I-300)+(1.020)+(17.001), (I-300)+(1.020)+(17.002), (I-300)+(1.020)+(17.003), (I-300)+(1.020)+(17.008), (I-300)+(1.020)+(18.001),
(I-300)+(1.021)+(1.001), (I-300)+(1.021)+(1.002), (I-300)+(1.021)+(1.003), (I-300)+(1.021)+(1.004), (I-300)+(1.021)+(1.005), (I-300)+(1.021)+(1.006), (I-300)+(1.021)+(1.007), (I-300)+(1.021)+(1.010), (I-300)+(1.021)+(1.011), (I-300)+(1.021)+(1.012), (I-300)+(1.021)+(1.013), (I-300)+(1.021)+(1.017), (I-300)+(1.021)+(1.018), (I-300)+(1.021)+(1.020), (I-300)+(1.021)+(1.026), (I-300)+(1.021)+(1.027), (I-300)+(1.021)+(1.055), (I-300)+(1.021)+(1.059), (I-300)+(1.021)+(1.092), (I-300)+(1.021)+(2.001), (I-300)+(1.021)+(2.002), (I-300)+(1.021)+(2.003), (I-300)+(1.021)+(2.005), (I-300)+(1.021)+(2.007), (I-300)+(1.021)+(2.009), (I-300)+(1.021)+(2.010), (I-300)+(1.021)+(2.011), (I-300)+(1.021)+(2.012), (I-300)+(1.021)+(2.013), (I-300)+(1.021)+(2.014), (I-300)+(1.021)+(2.015), (I-300)+(1.021)+(2.016), (I-300)+(1.021)+(2.017), (I-300)+(1.021)+(2.018), (I-300)+(1.021)+(2.019), (I-300)+(1.021)+(2.021), (I-300)+(1.021)+(2.028), (I-300)+(1.021)+(2.030), (I-300)+(1.021)+(2.038), (I-300)+(1.021)+(3.003), (I-300)+(1.021)+(3.007), (I-300)+(1.021)+(3.012), (I-300)+(1.021)+(3.013), (I-300)+(1.021)+(3.016), (I-300)+(1.021)+(3.017), (I-300)+(1.021)+(3.020), (I-300)+(1.021)+(3.025), (I-300)+(1.021)+(3.026), (I-300)+(1.021)+(3.030), (I-300)+(1.021)+(3.031), (I-300)+(1.021)+(5.003), (I-300)+(1.021)+(5.004), (I-300)+(1.021)+(5.005), (I-300)+(1.021)+(5.008), (I-300)+(1.021)+(5.009), (I-300)+(1.021)+(5.011), (I-300)+(1.021)+(5.012), (I-300)+(1.021)+(5.013), (I-300)+(1.021)+(5.015), (I-300)+(1.021)+(5.018), (I-300)+(1.021)+(5.019), (I-300)+(1.021)+(6.002), (I-300)+(1.021)+(7.001), (I-300)+(1.021)+(7.005), (I-300)+(1.021)+(9.002), (I-300)+(1.021)+(9.004), (I-300)+(1.021)+(14.001), (I-300)+(1.021)+(14.002), (I-300)+(1.021)+(15.008), (I-300)+(1.021)+(15.011), (I-300)+(1.021)+(15.012), (I-300)+(1.021)+(15.016), (I-300)+(1.021)+(15.025), (I-300)+(1.021)+(15.027), (I-300)+(1.021)+(15.047), (I-300)+(1.021)+(15.063), (I-300)+(1.021)+(15.064), (I-300)+(1.021)+(16.001), (I-300)+(1.021)+(16.005), (I-300)+(1.021)+(17.001), (I-300)+(1.021)+(17.002), (I-300)+(1.021)+(17.003), (I-300)+(1.021)+(17.008), (I-300)+(1.021)+(18.001),
(I-300)+(1.026)+(1.001), (I-300)+(1.026)+(1.002), (I-300)+(1.026)+(1.003), (I-300)+(1.026)+(1.004), (I-300)+(1.026)+(1.005), (I-300)+(1.026)+(1.006), (I-300)+(1.026)+(1.007), (I-300)+(1.026)+(1.010), (I-300)+(1.026)+(1.011), (I-300)+(1.026)+(1.012), (I-300)+(1.026)+(1.013), (I-300)+(1.026)+(1.017), (I-300)+(1.026)+(1.018), (I-300)+(1.026)+(1.020), (I-300)+(1.026)+(1.021), (I-300)+(1.026)+(1.027), (I-300)+(1.026)+(1.055), (I-300)+(1.026)+(1.059), (I-300)+(1.026)+(1.092), (I-300)+(1.026)+(2.001), (I-300)+(1.026)+(2.002), (I-300)+(1.026)+(2.003), (I-300)+(1.026)+(2.005), (I-300)+(1.026)+(2.007), (I-300)+(1.026)+(2.009), (I-300)+(1.026)+(2.010), (I-300)+(1.026)+(2.011), (I-300)+(1.026)+(2.012), (I-300)+(1.026)+(2.013), (I-300)+(1.026)+(2.014), (I-300)+(1.026)+(2.015), (I-300)+(1.026)+(2.016), (I-300)+(1.026)+(2.017), (I-300)+(1.026)+(2.018), (I-300)+(1.026)+(2.019), (I-300)+(1.026)+(2.021), (I-300)+(1.026)+(2.028), (I-300)+(1.026)+(2.030), (I-300)+(1.026)+(2.038), (I-300)+(1.026)+(3.003), (I-300)+(1.026)+(3.007), (I-300)+(1.026)+(3.012), (I-300)+(1.026)+(3.013), (I-300)+(1.026)+(3.016), (I-300)+(1.026)+(3.017), (I-300)+(1.026)+(3.020), (I-300)+(1.026)+(3.025), (I-300)+(1.026)+(3.026), (I-300)+(1.026)+(3.030), (I-300)+(1.026)+(3.031), (I-300)+(1.026)+(5.003), (I-300)+(1.026)+(5.004), (I-300)+(1.026)+(5.005), (I-300)+(1.026)+(5.008), (I-300)+(1.026)+(5.009), (I-300)+(1.026)+(5.011), (I-300)+(1.026)+(5.012), (I-300)+(1.026)+(5.013), (I-300)+(1.026)+(5.015), (I-300)+(1.026)+(5.018), (I-300)+(1.026)+(5.019), (I-300)+(1.026)+(6.002), (I-300)+(1.026)+(7.001), (I-300)+(1.026)+(7.005), (I-300)+(1.026)+(9.002), (I-300)+(1.026)+(9.004), (I-300)+(1.026)+(14.001), (I-300)+(1.026)+(14.002), (I-300)+(1.026)+(15.008), (I-300)+(1.026)+(15.011), (I-300)+(1.026)+(15.012), (I-300)+(1.026)+(15.016), (I-300)+(1.026)+(15.025), (I-300)+(1.026)+(15.027), (I-300)+(1.026)+(15.047), (I-300)+(1.026)+(15.063), (I-300)+(1.026)+(15.064), (I-300)+(1.026)+(16.001), (I-300)+(1.026)+(16.005), (I-300)+(1.026)+(17.001), (I-300)+(1.026)+(17.002), (I-300)+(1.026)+(17.003), (I-300)+(1.026)+(17.008), (I-300)+(1.026)+(18.001),
(I-300)+(1.027)+(1.001), (I-300)+(1.027)+(1.002), (I-300)+(1.027)+(1.003), (I-300)+(1.027)+(1.004), (I-300)+(1.027)+(1.005), (I-300)+(1.027)+(1.006), (I-300)+(1.027)+(1.007), (I-300)+(1.027)+(1.010), (I-300)+(1.027)+(1.011), (I-300)+(1.027)+(1.012), (I-300)+(1.027)+(1.013), (I-300)+(1.027)+(1.017), (I-300)+(1.027)+(1.018), (I-300)+(1.027)+(1.020), (I-300)+(1.027)+(1.021), (I-300)+(1.027)+(1.026), (I-300)+(1.027)+(1.055), (I-300)+(1.027)+(1.059), (I-300)+(1.027)+(1.092), (I-300)+(1.027)+(2.001), (I-300)+(1.027)+(2.002), (I-300)+(1.027)+(2.003), (I-300)+(1.027)+(2.005), (I-300)+(1.027)+(2.007), (I-300)+(1.027)+(2.009), (I-300)+(1.027)+(2.010), (I-300)+(1.027)+(2.011), (I-300)+(1.027)+(2.012), (I-300)+(1.027)+(2.013), (I-300)+(1.027)+(2.014), (I-300)+(1.027)+(2.015), (I-300)+(1.027)+(2.016), (I-300)+(1.027)+(2.017), (I-300)+(1.027)+(2.018), (I-300)+(1.027)+(2.019), (I-300)+(1.027)+(2.021), (I-300)+(1.027)+(2.028), (I-300)+(1.027)+(2.030), (I-300)+(1.027)+(2.038), (I-300)+(1.027)+(3.003), (I-300)+(1.027)+(3.007), (I-300)+(1.027)+(3.012), (I-300)+(1.027)+(3.013), (I-300)+(1.027)+(3.016), (I-300)+(1.027)+(3.017), (I-300)+(1.027)+(3.020), (I-300)+(1.027)+(3.025), (I-300)+(1.027)+(3.026), (I-300)+(1.027)+(3.030), (I-300)+(1.027)+(3.031), (I-300)+(1.027)+(5.003), (I-300)+(1.027)+(5.004), (I-300)+(1.027)+(5.005), (I-300)+(1.027)+(5.008), (I-300)+(1.027)+(5.009), (I-300)+(1.027)+(5.011), (I-300)+(1.027)+(5.012), (I-300)+(1.027)+(5.013), (I-300)+(1.027)+(5.015), (I-300)+(1.027)+(5.018), (I-300)+(1.027)+(5.019), (I-300)+(1.027)+(6.002), (I-300)+(1.027)+(7.001), (I-300)+(1.027)+(7.005), (I-300)+(1.027)+(9.002), (I-300)+(1.027)+(9.004), (I-300)+(1.027)+(14.001), (I-300)+(1.027)+(14.002), (I-300)+(1.027)+(15.008), (I-300)+(1.027)+(15.011), (I-300)+(1.027)+(15.012), (I-300)+(1.027)+(15.016), (I-300)+(1.027)+(15.025), (I-300)+(1.027)+(15.027), (I-300)+(1.027)+(15.047), (I-300)+(1.027)+(15.063), (I-300)+(1.027)+(15.064), (I-300)+(1.027)+(16.001), (I-300)+(1.027)+(16.005), (I-300)+(1.027)+(17.001), (I-300)+(1.027)+(17.002), (I-300)+(1.027)+(17.003), (I-300)+(1.027)+(17.008), (I-300)+(1.027)+(18.001), (I-300)+(1.055)+(1.001), (I-300)+(1.055)+(1.002), (I-300)+(1.055)+(1.003), (I-300)+(1.055)+(1.004), (I-300)+(1.055)+(1.005), (I-300)+(1.055)+(1.006), (I-300)+(1.055)+(1.007), (I-300)+(1.055)+(1.010), (I-300)+(1.055)+(1.011), (I-300)+(1.055)+(1.012), (I-300)+(1.055)+(1.013), (I-300)+(1.055)+(1.017), (I-300)+(1.055)+(1.018), (I-300)+(1.055)+(1.020), (I-300)+(1.055)+(1.021), (I-300)+(1.055)+(1.026), (I-300)+(1.055)+(1.027), (I-300)+(1.055)+(1.059), (I-300)+(1.055)+(1.092), (I-300)+(1.055)+(2.001), (I-300)+(1.055)+(2.002), (I-300)+(1.055)+(2.003), (I-300)+(1.055)+(2.005), (I-300)+(1.055)+(2.007), (I-300)+(1.055)+(2.009), (I-300)+(1.055)+(2.010), (I-300)+(1.055)+(2.011), (I-300)+(1.055)+(2.012), (I-300)+(1.055)+(2.013), (I-300)+(1.055)+(2.014), (I-300)+(1.055)+(2.015), (I-300)+(1.055)+(2.016), (I-300)+(1.055)+(2.017), (I-300)+(1.055)+(2.018), (I-300)+(1.055)+(2.019), (I-300)+(1.055)+(2.021), (I-300)+(1.055)+(2.028), (I-300)+(1.055)+(2.030), (I-300)+(1.055)+(2.038), (I-300)+(1.055)+(3.003), (I-300)+(1.055)+(3.007), (I-300)+(1.055)+(3.012), (I-300)+(1.055)+(3.013), (I-300)+(1.055)+(3.016), (I-300)+(1.055)+(3.017), (I-300)+(1.055)+(3.020), (I-300)+(1.055)+(3.025), (I-300)+(1.055)+(3.026), (I-300)+(1.055)+(3.030), (I-300)+(1.055)+(3.031), (I-300)+(1.055)+(5.003), (I-300)+(1.055)+(5.004), (I-300)+(1.055)+(5.005), (I-300)+(1.055)+(5.008), (I-300)+(1.055)+(5.009), (I-300)+(1.055)+(5.011), (I-300)+(1.055)+(5.012), (I-300)+(1.055)+(5.013), (I-300)+(1.055)+(5.015), (I-300)+(1.055)+(5.018), (I-300)+(1.055)+(5.019), (I-300)+(1.055)+(6.002), (I-300)+(1.055)+(7.001), (I-300)+(1.055)+(7.005), (I-300)+(1.055)+(9.002), (I-300)+(1.055)+(9.004), (I-300)+(1.055)+(14.001), (I-300)+(1.055)+(14.002), (I-300)+(1.055)+(15.008), (I-300)+(1.055)+(15.011), (I-300)+(1.055)+(15.012), (I-300)+(1.055)+(15.016), (I-300)+(1.055)+(15.025), (I-300)+(1.055)+(15.027), (I-300)+(1.055)+(15.047), (I-300)+(1.055)+(15.063), (I-300)+(1.055)+(15.064), (I-300)+(1.055)+(16.001), (I-300)+(1.055)+(16.005), (I-300)+(1.055)+(17.001), (I-300)+(1.055)+(17.002), (I-300)+(1.055)+(17.003), (I-300)+(1.055)+(17.008), (I-300)+(1.055)+(18.001), (I-300)+(1.059)+(1.001), (I-300)+(1.059)+(1.002), (I-300)+(1.059)+(1.003), (I-300)+(1.059)+(1.004), (I-300)+(1.059)+(1.005), (I-300)+(1.059)+(1.006), (I-300)+(1.059)+(1.007), (I-300)+(1.059)+(1.010), (I-300)+(1.059)+(1.011), (I-300)+(1.059)+(1.012), (I-300)+(1.059)+(1.013), (I-300)+(1.059)+(1.017), (I-300)+(1.059)+(1.018), (I-300)+(1.059)+(1.020), (I-300)+(1.059)+(1.021), (I-300)+(1.059)+(1.026), (I-300)+(1.059)+(1.027), (I-300)+(1.059)+(1.055), (I-300)+(1.059)+(1.092), (I-300)+(1.059)+(2.001), (I-300)+(1.059)+(2.002), (I-300)+(1.059)+(2.003), (I-300)+(1.059)+(2.005), (I-300)+(1.059)+(2.007), (I-300)+(1.059)+(2.009), (I-300)+(1.059)+(2.010), (I-300)+(1.059)+(2.011), (I-300)+(1.059)+(2.012), (I-300)+(1.059)+(2.013), (I-300)+(1.059)+(2.014), (I-300)+(1.059)+(2.015), (I-300)+(1.059)+(2.016), (I-300)+(1.059)+(2.017), (I-300)+(1.059)+(2.018), (I-300)+(1.059)+(2.019), (I-300)+(1.059)+(2.021), (I-300)+(1.059)+(2.028), (I-300)+(1.059)+(2.030), (I-300)+(1.059)+(2.038), (I-300)+(1.059)+(3.003), (I-300)+(1.059)+(3.007), (I-300)+(1.059)+(3.012), (I-300)+(1.059)+(3.013), (I-300)+(1.059)+(3.016), (I-300)+(1.059)+(3.017), (I-300)+(1.059)+(3.020), (I-300)+(1.059)+(3.025), (I-300)+(1.059)+(3.026), (I-300)+(1.059)+(3.030), (I-300)+(1.059)+(3.031), (I-300)+(1.059)+(5.003), (I-300)+(1.059)+(5.004), (I-300)+(1.059)+(5.005), (I-300)+(1.059)+(5.008), (I-300)+(1.059)+(5.009), (I-300)+(1.059)+(5.011), (I-300)+(1.059)+(5.012), (I-300)+(1.059)+(5.013), (I-300)+(1.059)+(5.015), (I-300)+(1.059)+(5.018), (I-300)+(1.059)+(5.019), (I-300)+(1.059)+(6.002), (I-300)+(1.059)+(7.001), (I-300)+(1.059)+(7.005), (I-300)+(1.059)+(9.002), (I-300)+(1.059)+(9.004), (I-300)+(1.059)+(14.001), (I-300)+(1.059)+(14.002), (I-300)+(1.059)+(15.008), (I-300)+(1.059)+(15.011), (I-300)+(1.059)+(15.012), (I-300)+(1.059)+(15.016), (I-300)+(1.059)+(15.025), (I-300)+(1.059)+(15.027), (I-300)+(1.059)+(15.047), (I-300)+(1.059)+(15.063), (I-300)+(1.059)+(15.064), (I-300)+(1.059)+(16.001), (I-300)+(1.059)+(16.005), (I-300)+(1.059)+(17.001), (I-300)+(1.059)+(17.002), (I-300)+(1.059)+(17.003), (I-300)+(1.059)+(17.008), (I-300)+(1.059)+(18.001), (I-300)+(1.092)+(1.001), (I-300)+(1.092)+(1.002), (I-300)+(1.092)+(1.003), (I-300)+(1.092)+(1.004), (I-300)+(1.092)+(1.005), (I-300)+(1.092)+(1.006), (I-300)+(1.092)+(1.007), (I-300)+(1.092)+(1.010), (I-300)+(1.092)+(1.011), (I-300)+(1.092)+(1.012), (I-300)+(1.092)+(1.013), (I-300)+(1.092)+(1.017), (I-300)+(1.092)+(1.018), (I-300)+(1.092)+(1.020), (I-300)+(1.092)+(1.021), (I-300)+(1.092)+(1.026), (I-300)+(1.092)+(1.027), (I-300)+(1.092)+(1.055), (I-300)+(1.092)+(1.059), (I-300)+(1.092)+(2.001), (I-300)+(1.092)+(2.002), (I-300)+(1.092)+(2.003), (I-300)+(1.092)+(2.005), (I-300)+(1.092)+(2.007), (I-300)+(1.092)+(2.009), (I-300)+(1.092)+(2.010), (I-300)+(1.092)+(2.011), (I-300)+(1.092)+(2.012), (I-300)+(1.092)+(2.013), (I-300)+(1.092)+(2.014), (I-300)+(1.092)+(2.015), (I-300)+(1.092)+(2.016), (I-300)+(1.092)+(2.017), (I-300)+(1.092)+(2.018), (I-300)+(1.092)+(2.019), (I-300)+(1.092)+(2.021), (I-300)+(1.092)+(2.028), (I-300)+(1.092)+(2.030), (I-300)+(1.092)+(2.038), (I-300)+(1.092)+(3.003), (I-300)+(1.092)+(3.007), (I-300)+(1.092)+(3.012), (I-300)+(1.092)+(3.013), (I-300)+(1.092)+(3.016), (I-300)+(1.092)+(3.017), (I-300)+(1.092)+(3.020), (I-300)+(1.092)+(3.025), (I-300)+(1.092)+(3.026), (I-300)+(1.092)+(3.030), (I-300)+(1.092)+(3.031), (I-300)+(1.092)+(5.003), (I-300)+(1.092)+(5.004), (I-300)+(1.092)+(5.005), (I-300)+(1.092)+(5.008), (I-300)+(1.092)+(5.009), (I-300)+(1.092)+(5.011), (I-300)+(1.092)+(5.012), (I-300)+(1.092)+(5.013), (I-300)+(1.092)+(5.015), (I-300)+(1.092)+(5.018), (I-300)+(1.092)+(5.019), (I-300)+(1.092)+(6.002), (I-300)+(1.092)+(7.001), (I-300)+(1.092)+(7.005), (I-300)+(1.092)+(9.002), (I-300)+(1.092)+(9.004), (I-300)+(1.092)+(14.001), (I-300)+(1.092)+(14.002), (I-300)+(1.092)+(15.008), (I-300)+(1.092)+(15.011), (I-300)+(1.092)+(15.012), (I-300)+(1.092)+(15.016), (I-300)+(1.092)+(15.025), (I-300)+(1.092)+(15.027), (I-300)+(1.092)+(15.047), (I-300)+(1.092)+(15.063), (I-300)+(1.092)+(15.064), (I-300)+(1.092)+(16.001), (I-300)+(1.092)+(16.005), (I-300)+(1.092)+(17.001), (I-300)+(1.092)+(17.002), (I-300)+(1.092)+(17.003), (I-300)+(1.092)+(17.008), (I-300)+(1.092)+(18.001), (I-300)+(2.001)+(3.003), (I-300)+(2.001)+(3.007), (I-300)+(2.001)+(3.012), (I-300)+(2.001)+(3.013), (I-300)+(2.001)+(3.016), (I-300)+(2.001)+(3.017), (I-300)+(2.001)+(3.020), (I-300)+(2.001)+(3.025), (I-300)+(2.001)+(3.026), (I-300)+(2.001)+(3.030), (I-300)+(2.001)+(3.031), (I-300)+(2.001)+(5.003), (I-300)+(2.001)+(5.004), (I-300)+(2.001)+(5.005), (I-300)+(2.001)+(5.008), (I-300)+(2.001)+(5.009), (I-300)+(2.001)+(5.011), (I-300)+(2.001)+(5.012), (I-300)+(2.001)+(5.013), (I-300)+(2.001)+(5.015), (I-300)+(2.001)+(5.018), (I-300)+(2.001)+(5.019), (I-300)+(2.001)+(6.002), (I-300)+(2.001)+(7.001), (I-300)+(2.001)+(7.005), (I-300)+(2.001)+(9.002), (I-300)+(2.001)+(9.004), (I-300)+(2.001)+(14.001), (I-300)+(2.001)+(14.002), (I-300)+(2.001)+(15.008), (I-300)+(2.001)+(15.011), (I-300)+(2.001)+(15.012), (I-300)+(2.001)+(15.016), (I-300)+(2.001)+(15.025), (I-300)+(2.001)+(15.027), (I-300)+(2.001)+(15.047), (I-300)+(2.001)+(15.063), (I-300)+(2.001)+(15.064), (I-300)+(2.001)+(16.001), (I-300)+(2.001)+(16.005), (I-300)+(2.001)+(17.001), (I-300)+(2.001)+(17.002), (I-300)+(2.001)+(17.003), (I-300)+(2.001)+(17.008), (I-300)+(2.001)+(18.001), (I-300)+(2.002)+(3.003), (I-300)+(2.002)+(3.007), (I-300)+(2.002)+(3.012), (I-300)+(2.002)+(3.013), (I-300)+(2.002)+(3.016), (I-300)+(2.002)+(3.017), (I-300)+(2.002)+(3.020), (I-300)+(2.002)+(3.025), (I-300)+(2.002)+(3.026), (I-300)+(2.002)+(3.030), (I-300)+(2.002)+(3.031), (I-300)+(2.002)+(5.003), (I-300)+(2.002)+(5.004), (I-300)+(2.002)+(5.005), (I-300)+(2.002)+(5.008), (I-300)+(2.002)+(5.009), (I-300)+(2.002)+(5.011), (I-300)+(2.002)+(5.012), (I-300)+(2.002)+(5.013), (I-300)+(2.002)+(5.015), (I-300)+(2.002)+(5.018), (I-300)+(2.002)+(5.019), (I-300)+(2.002)+(6.002), (I-300)+(2.002)+(7.001), (I-300)+(2.002)+(7.005), (I-300)+(2.002)+(9.002), (I-300)+(2.002)+(9.004), (I-300)+(2.002)+(14.001), (I-300)+(2.002)+(14.002), (I-300)+(2.002)+(15.008), (I-300)+(2.002)+(15.011), (I-300)+(2.002)+(15.012), (I-300)+(2.002)+(15.016), (I-300)+(2.002)+(15.025), (I-300)+(2.002)+(15.027), (I-300)+(2.002)+(15.047), (I-300)+(2.002)+(15.063), (I-300)+(2.002)+(15.064), (I-300)+(2.002)+(16.001), (I-300)+(2.002)+(16.005), (I-300)+(2.002)+(17.001), (I-300)+(2.002)+(17.002), (I-300)+(2.002)+(17.003), (I-300)+(2.002)+(17.008), (I-300)+(2.002)+(18.001), (I-300)+(2.003)+(3.003), (I-300)+(2.003)+(3.007), (I-300)+(2.003)+(3.012), (I-300)+(2.003)+(3.013), (I-300)+(2.003)+(3.016), (I-300)+(2.003)+(3.017), (I-300)+(2.003)+(3.020), (I-300)+(2.003)+(3.025), (I-300)+(2.003)+(3.026), (I-300)+(2.003)+(3.030), (I-300)+(2.003)+(3.031), (I-300)+(2.003)+(5.003), (I-300)+(2.003)+(5.004), (I-300)+(2.003)+(5.005), (I-300)+(2.003)+(5.008), (I-300)+(2.003)+(5.009), (I-300)+(2.003)+(5.011), (I-300)+(2.003)+(5.012), (I-300)+(2.003)+(5.013), (I-300)+(2.003)+(5.015), (I-300)+(2.003)+(5.018), (I-300)+(2.003)+(5.019), (I-300)+(2.003)+(6.002), (I-300)+(2.003)+(7.001), (I-300)+(2.003)+(7.005), (I-300)+(2.003)+(9.002), (I-300)+(2.003)+(9.004), (I-300)+(2.003)+(14.001), (I-300)+(2.003)+(14.002), (I-300)+(2.003)+(15.008), (I-300)+(2.003)+(15.011), (I-300)+(2.003)+(15.012), (I-300)+(2.003)+(15.016), (I-300)+(2.003)+(15.025), (I-300)+(2.003)+(15.027), (I-300)+(2.003)+(15.047), (I-300)+(2.003)+(15.063), (I-300)+(2.003)+(15.064), (I-300)+(2.003)+(16.001), (I-300)+(2.003)+(16.005), (I-300)+(2.003)+(17.001), (I-300)+(2.003)+(17.002), (I-300)+(2.003)+(17.003), (I-300)+(2.003)+(17.008), (I-300)+(2.003)+(18.001), (I-300)+(2.005)+(3.003), (I-300)+(2.005)+(3.007), (I-300)+(2.005)+(3.012), (I-300)+(2.005)+(3.013), (I-300)+(2.005)+(3.016), (I-300)+(2.005)+(3.017), (I-300)+(2.005)+(3.020), (I-300)+(2.005)+(3.025), (I-300)+(2.005)+(3.026), (I-300)+(2.005)+(3.030), (I-300)+(2.005)+(3.031), (I-300)+(2.005)+(5.003), (I-300)+(2.005)+(5.004), (I-300)+(2.005)+(5.005), (I-300)+(2.005)+(5.008), (I-300)+(2.005)+(5.009), (I-300)+(2.005)+(5.011), (I-300)+(2.005)+(5.012), (I-300)+(2.005)+(5.013), (I-300)+(2.005)+(5.015), (I-300)+(2.005)+(5.018), (I-300)+(2.005)+(5.019), (I-300)+(2.005)+(6.002), (I-300)+(2.005)+(7.001), (I-300)+(2.005)+(7.005), (I-300)+(2.005)+(9.002), (I-300)+(2.005)+(9.004), (I-300)+(2.005)+(14.001), (I-300)+(2.005)+(14.002), (I-300)+(2.005)+(15.008), (I-300)+(2.005)+(15.011), (I-300)+(2.005)+(15.012), (I-300)+(2.005)+(15.016), (I-300)+(2.005)+(15.025), (I-300)+(2.005)+(15.027), (I-300)+(2.005)+(15.047), (I-300)+(2.005)+(15.063), (I-300)+(2.005)+(15.064), (I-300)+(2.005)+(16.001), (I-300)+(2.005)+(16.005), (I-300)+(2.005)+(17.001), (I-300)+(2.005)+(17.002), (I-300)+(2.005)+(17.003), (I-300)+(2.005)+(17.008), (I-300)+(2.005)+(18.001), (I-300)+(2.007)+(3.003), (I-300)+(2.007)+(3.007), (I-300)+(2.007)+(3.012), (I-300)+(2.007)+(3.013), (I-300)+(2.007)+(3.016), (I-300)+(2.007)+(3.017), (I-300)+(2.007)+(3.020), (I-300)+(2.007)+(3.025), (I-300)+(2.007)+(3.026), (I-300)+(2.007)+(3.030), (I-300)+(2.007)+(3.031), (I-300)+(2.007)+(5.003), (I-300)+(2.007)+(5.004), (I-300)+(2.007)+(5.005), (I-300)+(2.007)+(5.008), (I-300)+(2.007)+(5.009), (I-300)+(2.007)+(5.011), (I-300)+(2.007)+(5.012), (I-300)+(2.007)+(5.013), (I-300)+(2.007)+(5.015), (I-300)+(2.007)+(5.018), (I-300)+(2.007)+(5.019), (I-300)+(2.007)+(6.002), (I-300)+(2.007)+(7.001), (I-300)+(2.007)+(7.005), (I-300)+(2.007)+(9.002), (I-300)+(2.007)+(9.004), (I-300)+(2.007)+(14.001), (I-300)+(2.007)+(14.002), (I-300)+(2.007)+(15.008), (I-300)+(2.007)+(15.011), (I-300)+(2.007)+(15.012), (I-300)+(2.007)+(15.016), (I-300)+(2.007)+(15.025), (I-300)+(2.007)+(15.027), (I-300)+(2.007)+(15.047), (I-300)+(2.007)+(15.063), (I-300)+(2.007)+(15.064), (I-300)+(2.007)+(16.001), (I-300)+(2.007)+(16.005), (I-300)+(2.007)+(17.001), (I-300)+(2.007)+(17.002), (I-300)+(2.007)+(17.003), (I-300)+(2.007)+(17.008), (I-300)+(2.007)+(18.001), (I-300)+(2.009)+(3.003), (I-300)+(2.009)+(3.007), (I-300)+(2.009)+(3.012), (I-300)+(2.009)+(3.013), (I-300)+(2.009)+(3.016), (I-300)+(2.009)+(3.017), (I-300)+(2.009)+(3.020), (I-300)+(2.009)+(3.025), (I-300)+(2.009)+(3.026), (I-300)+(2.009)+(3.030), (I-300)+(2.009)+(3.031), (I-300)+(2.009)+(5.003), (I-300)+(2.009)+(5.004), (I-300)+(2.009)+(5.005), (I-300)+(2.009)+(5.008), (I-300)+(2.009)+(5.009), (I-300)+(2.009)+(5.011), (I-300)+(2.009)+(5.012), (I-300)+(2.009)+(5.013), (I-300)+(2.009)+(5.015), (I-300)+(2.009)+(5.018), (I-300)+(2.009)+(5.019), (I-300)+(2.009)+(6.002), (I-300)+(2.009)+(7.001), (I-300)+(2.009)+(7.005), (I-300)+(2.009)+(9.002), (I-300)+(2.009)+(9.004), (I-300)+(2.009)+(14.001), (I-300)+(2.009)+(14.002), (I-300)+(2.009)+(15.008), (I-300)+(2.009)+(15.011), (I-300)+(2.009)+(15.012), (I-300)+(2.009)+(15.016), (I-300)+(2.009)+(15.025), (I-300)+(2.009)+(15.027), (I-300)+(2.009)+(15.047), (I-300)+(2.009)+(15.063), (I-300)+(2.009)+(15.064), (I-300)+(2.009)+(16.001), (I-300)+(2.009)+(16.005), (I-300)+(2.009)+(17.001), (I-300)+(2.009)+(17.002), (I-300)+(2.009)+(17.003), (I-300)+(2.009)+(17.008), (I-300)+(2.009)+(18.001), (I-300)+(2.010)+(3.003), (I-300)+(2.010)+(3.007), (I-300)+(2.010)+(3.012), (I-300)+(2.010)+(3.013), (I-300)+(2.010)+(3.016), (I-300)+(2.010)+(3.017), (I-300)+(2.010)+(3.020), (I-300)+(2.010)+(3.025), (I-300)+(2.010)+(3.026), (I-300)+(2.010)+(3.030), (I-300)+(2.010)+(3.031), (I-300)+(2.010)+(5.003), (I-300)+(2.010)+(5.004), (I-300)+(2.010)+(5.005), (I-300)+(2.010)+(5.008), (I-300)+(2.010)+(5.009), (I-300)+(2.010)+(5.011), (I-300)+(2.010)+(5.012), (I-300)+(2.010)+(5.013), (I-300)+(2.010)+(5.015), (I-300)+(2.010)+(5.018), (I-300)+(2.010)+(5.019), (I-300)+(2.010)+(6.002), (I-300)+(2.010)+(7.001), (I-300)+(2.010)+(7.005), (I-300)+(2.010)+(9.002), (I-300)+(2.010)+(9.004), (I-300)+(2.010)+(14.001), (I-300)+(2.010)+(14.002), (I-300)+(2.010)+(15.008), (I-300)+(2.010)+(15.011), (I-300)+(2.010)+(15.012), (I-300)+(2.010)+(15.016), (I-300)+(2.010)+(15.025), (I-300)+(2.010)+(15.027), (I-300)+(2.010)+(15.047), (I-300)+(2.010)+(15.063), (I-300)+(2.010)+(15.064), (I-300)+(2.010)+(16.001), (I-300)+(2.010)+(16.005), (I-300)+(2.010)+(17.001), (I-300)+(2.010)+(17.002), (I-300)+(2.010)+(17.003), (I-300)+(2.010)+(17.008), (I-300)+(2.010)+(18.001), (I-300)+(2.011)+(3.003), (I-300)+(2.011)+(3.007), (I-300)+(2.011)+(3.012), (I-300)+(2.011)+(3.013), (I-300)+(2.011)+(3.016), (I-300)+(2.011)+(3.017), (I-300)+(2.011)+(3.020), (I-300)+(2.011)+(3.025), (I-300)+(2.011)+(3.026), (I-300)+(2.011)+(3.030), (I-300)+(2.011)+(3.031), (I-300)+(2.011)+(5.003), (I-300)+(2.011)+(5.004), (I-300)+(2.011)+(5.005), (I-300)+(2.011)+(5.008), (I-300)+(2.011)+(5.009), (I-300)+(2.011)+(5.011), (I-300)+(2.011)+(5.012), (I-300)+(2.011)+(5.013), (I-300)+(2.011)+(5.015), (I-300)+(2.011)+(5.018), (I-300)+(2.011)+(5.019), (I-300)+(2.011)+(6.002), (I-300)+(2.011)+(7.001), (I-300)+(2.011)+(7.005), (I-300)+(2.011)+(9.002), (I-300)+(2.011)+(9.004), (I-300)+(2.011)+(14.001), (I-300)+(2.011)+(14.002), (I-300)+(2.011)+(15.008), (I-300)+(2.011)+(15.011), (I-300)+(2.011)+(15.012), (I-300)+(2.011)+(15.016), (I-300)+(2.011)+(15.025), (I-300)+(2.011)+(15.027), (I-300)+(2.011)+(15.047), (I-300)+(2.011)+(15.063), (I-300)+(2.011)+(15.064), (I-300)+(2.011)+(16.001), (I-300)+(2.011)+(16.005), (I-300)+(2.011)+(17.001), (I-300)+(2.011)+(17.002), (I-300)+(2.011)+(17.003), (I-300)+(2.011)+(17.008), (I-300)+(2.011)+(18.001), (I-300)+(2.012)+(3.003), (I-300)+(2.012)+(3.007), (I-300)+(2.012)+(3.012), (I-300)+(2.012)+(3.013), (I-300)+(2.012)+(3.016), (I-300)+(2.012)+(3.017), (I-300)+(2.012)+(3.020), (I-300)+(2.012)+(3.025), (I-300)+(2.012)+(3.026), (I-300)+(2.012)+(3.030), (I-300)+(2.012)+(3.031), (I-300)+(2.012)+(5.003), (I-300)+(2.012)+(5.004), (I-300)+(2.012)+(5.005), (I-300)+(2.012)+(5.008), (I-300)+(2.012)+(5.009), (I-300)+(2.012)+(5.011), (I-300)+(2.012)+(5.012), (I-300)+(2.012)+(5.013), (I-300)+(2.012)+(5.015), (I-300)+(2.012)+(5.018), (I-300)+(2.012)+(5.019), (I-300)+(2.012)+(6.002), (I-300)+(2.012)+(7.001), (I-300)+(2.012)+(7.005), (I-300)+(2.012)+(9.002), (I-300)+(2.012)+(9.004), (I-300)+(2.012)+(14.001), (I-300)+(2.012)+(14.002), (I-300)+(2.012)+(15.008), (I-300)+(2.012)+(15.011), (I-300)+(2.012)+(15.012), (I-300)+(2.012)+(15.016), (I-300)+(2.012)+(15.025), (I-300)+(2.012)+(15.027), (I-300)+(2.012)+(15.047), (I-300)+(2.012)+(15.063), (I-300)+(2.012)+(15.064), (I-300)+(2.012)+(16.001), (I-300)+(2.012)+(16.005), (I-300)+(2.012)+(17.001), (I-300)+(2.012)+(17.002), (I-300)+(2.012)+(17.003), (I-300)+(2.012)+(17.008), (I-300)+(2.012)+(18.001), (I-300)+(2.013)+(3.003), (I-300)+(2.013)+(3.007), (I-300)+(2.013)+(3.012), (I-300)+(2.013)+(3.013), (I-300)+(2.013)+(3.016), (I-300)+(2.013)+(3.017), (I-300)+(2.013)+(3.020), (I-300)+(2.013)+(3.025), (I-300)+(2.013)+(3.026), (I-300)+(2.013)+(3.030), (I-300)+(2.013)+(3.031), (I-300)+(2.013)+(5.003), (I-300)+(2.013)+(5.004), (I-300)+(2.013)+(5.005), (I-300)+(2.013)+(5.008), (I-300)+(2.013)+(5.009), (I-300)+(2.013)+(5.011), (I-300)+(2.013)+(5.012), (I-300)+(2.013)+(5.013), (I-300)+(2.013)+(5.015), (I-300)+(2.013)+(5.018), (I-300)+(2.013)+(5.019), (I-300)+(2.013)+(6.002), (I-300)+(2.013)+(7.001), (I-300)+(2.013)+(7.005), (I-300)+(2.013)+(9.002), (I-300)+(2.013)+(9.004), (I-300)+(2.013)+(14.001), (I-300)+(2.013)+(14.002), (I-300)+(2.013)+(15.008), (I-300)+(2.013)+(15.011), (I-300)+(2.013)+(15.012), (I-300)+(2.013)+(15.016), (I-300)+(2.013)+(15.025), (I-300)+(2.013)+(15.027), (I-300)+(2.013)+(15.047), (I-300)+(2.013)+(15.063), (I-300)+(2.013)+(15.064), (I-300)+(2.013)+(16.001), (I-300)+(2.013)+(16.005), (I-300)+(2.013)+(17.001), (I-300)+(2.013)+(17.002), (I-300)+(2.013)+(17.003), (I-300)+(2.013)+(17.008), (I-300)+(2.013)+(18.001), (I-300)+(2.014)+(3.003), (I-300)+(2.014)+(3.007), (I-300)+(2.014)+(3.012), (I-300)+(2.014)+(3.013), (I-300)+(2.014)+(3.016), (I-300)+(2.014)+(3.017), (I-300)+(2.014)+(3.020), (I-300)+(2.014)+(3.025), (I-300)+(2.014)+(3.026), (I-300)+(2.014)+(3.030), (I-300)+(2.014)+(3.031), (I-300)+(2.014)+(5.003), (I-300)+(2.014)+(5.004), (I-300)+(2.014)+(5.005), (I-300)+(2.014)+(5.008), (I-300)+(2.014)+(5.009), (I-300)+(2.014)+(5.011), (I-300)+(2.014)+(5.012), (I-300)+(2.014)+(5.013), (I-300)+(2.014)+(5.015), (I-300)+(2.014)+(5.018), (I-300)+(2.014)+(5.019), (I-300)+(2.014)+(6.002), (I-300)+(2.014)+(7.001), (I-300)+(2.014)+(7.005), (I-300)+(2.014)+(9.002), (I-300)+(2.014)+(9.004), (I-300)+(2.014)+(14.001), (I-300)+(2.014)+(14.002), (I-300)+(2.014)+(15.008), (I-300)+(2.014)+(15.011), (I-300)+(2.014)+(15.012), (I-300)+(2.014)+(15.016), (I-300)+(2.014)+(15.025), (I-300)+(2.014)+(15.027), (I-300)+(2.014)+(15.047), (I-300)+(2.014)+(15.063), (I-300)+(2.014)+(15.064), (I-300)+(2.014)+(16.001), (I-300)+(2.014)+(16.005), (I-300)+(2.014)+(17.001), (I-300)+(2.014)+(17.002), (I-300)+(2.014)+(17.003), (I-300)+(2.014)+(17.008), (I-300)+(2.014)+(18.001), (I-300)+(2.015)+(3.003), (I-300)+(2.015)+(3.007), (I-300)+(2.015)+(3.012), (I-300)+(2.015)+(3.013), (I-300)+(2.015)+(3.016), (I-300)+(2.015)+(3.017), (I-300)+(2.015)+(3.020), (I-300)+(2.015)+(3.025), (I-300)+(2.015)+(3.026), (I-300)+(2.015)+(3.030), (I-300)+(2.015)+(3.031), (I-300)+(2.015)+(5.003), (I-300)+(2.015)+(5.004), (I-300)+(2.015)+(5.005), (I-300)+(2.015)+(5.008), (I-300)+(2.015)+(5.009), (I-300)+(2.015)+(5.011), (I-300)+(2.015)+(5.012), (I-300)+(2.015)+(5.013), (I-300)+(2.015)+(5.015), (I-300)+(2.015)+(5.018), (I-300)+(2.015)+(5.019), (I-300)+(2.015)+(6.002), (I-300)+(2.015)+(7.001), (I-300)+(2.015)+(7.005), (I-300)+(2.015)+(9.002), (I-300)+(2.015)+(9.004), (I-300)+(2.015)+(14.001), (I-300)+(2.015)+(14.002), (I-300)+(2.015)+(15.008), (I-300)+(2.015)+(15.011), (I-300)+(2.015)+(15.012), (I-300)+(2.015)+(15.016), (I-300)+(2.015)+(15.025), (I-300)+(2.015)+(15.027), (I-300)+(2.015)+(15.047), (I-300)+(2.015)+(15.063), (I-300)+(2.015)+(15.064), (I-300)+(2.015)+(16.001), (I-300)+(2.015)+(16.005), (I-300)+(2.015)+(17.001), (I-300)+(2.015)+(17.002), (I-300)+(2.015)+(17.003), (I-300)+(2.015)+(17.008), (I-300)+(2.015)+(18.001), (I-300)+(2.016)+(3.003), (I-300)+(2.016)+(3.007), (I-300)+(2.016)+(3.012), (I-300)+(2.016)+(3.013), (I-300)+(2.016)+(3.016), (I-300)+(2.016)+(3.017), (I-300)+(2.016)+(3.020), (I-300)+(2.016)+(3.025), (I-300)+(2.016)+(3.026), (I-300)+(2.016)+(3.030), (I-300)+(2.016)+(3.031), (I-300)+(2.016)+(5.003), (I-300)+(2.016)+(5.004), (I-300)+(2.016)+(5.005), (I-300)+(2.016)+(5.008), (I-300)+(2.016)+(5.009), (I-300)+(2.016)+(5.011), (I-300)+(2.016)+(5.012), (I-300)+(2.016)+(5.013), (I-300)+(2.016)+(5.015), (I-300)+(2.016)+(5.018), (I-300)+(2.016)+(5.019), (I-300)+(2.016)+(6.002), (I-300)+(2.016)+(7.001), (I-300)+(2.016)+(7.005), (I-300)+(2.016)+(9.002), (I-300)+(2.016)+(9.004), (I-300)+(2.016)+(14.001), (I-300)+(2.016)+(14.002), (I-300)+(2.016)+(15.008), (I-300)+(2.016)+(15.011), (I-300)+(2.016)+(15.012), (I-300)+(2.016)+(15.016), (I-300)+(2.016)+(15.025), (I-300)+(2.016)+(15.027), (I-300)+(2.016)+(15.047), (I-300)+(2.016)+(15.063), (I-300)+(2.016)+(15.064), (I-300)+(2.016)+(16.001), (I-300)+(2.016)+(16.005), (I-300)+(2.016)+(17.001), (I-300)+(2.016)+(17.002), (I-300)+(2.016)+(17.003), (I-300)+(2.016)+(17.008), (I-300)+(2.016)+(18.001), (I-300)+(2.017)+(3.003), (I-300)+(2.017)+(3.007), (I-300)+(2.017)+(3.012), (I-300)+(2.017)+(3.013), (I-300)+(2.017)+(3.016), (I-300)+(2.017)+(3.017), (I-300)+(2.017)+(3.020), (I-300)+(2.017)+(3.025), (I-300)+(2.017)+(3.026), (I-300)+(2.017)+(3.030), (I-300)+(2.017)+(3.031), (I-300)+(2.017)+(5.003), (I-300)+(2.017)+(5.004), (I-300)+(2.017)+(5.005), (I-300)+(2.017)+(5.008), (I-300)+(2.017)+(5.009), (I-300)+(2.017)+(5.011), (I-300)+(2.017)+(5.012), (I-300)+(2.017)+(5.013), (I-300)+(2.017)+(5.015), (I-300)+(2.017)+(5.018), (I-300)+(2.017)+(5.019), (I-300)+(2.017)+(6.002), (I-300)+(2.017)+(7.001), (I-300)+(2.017)+(7.005), (I-300)+(2.017)+(9.002), (I-300)+(2.017)+(9.004), (I-300)+(2.017)+(14.001), (I-300)+(2.017)+(14.002), (I-300)+(2.017)+(15.008), (I-300)+(2.017)+(15.011), (I-300)+(2.017)+(15.012), (I-300)+(2.017)+(15.016), (I-300)+(2.017)+(15.025), (I-300)+(2.017)+(15.027), (I-300)+(2.017)+(15.047), (I-300)+(2.017)+(15.063), (I-300)+(2.017)+(15.064), (I-300)+(2.017)+(16.001), (I-300)+(2.017)+(16.005), (I-300)+(2.017)+(17.001), (I-300)+(2.017)+(17.002), (I-300)+(2.017)+(17.003), (I-300)+(2.017)+(17.008), (I-300)+(2.017)+(18.001), (I-300)+(2.018)+(3.003), (I-300)+(2.018)+(3.007), (I-300)+(2.018)+(3.012), (I-300)+(2.018)+(3.013), (I-300)+(2.018)+(3.016), (I-300)+(2.018)+(3.017), (I-300)+(2.018)+(3.020), (I-300)+(2.018)+(3.025), (I-300)+(2.018)+(3.026), (I-300)+(2.018)+(3.030), (I-300)+(2.018)+(3.031), (I-300)+(2.018)+(5.003), (I-300)+(2.018)+(5.004), (I-300)+(2.018)+(5.005), (I-300)+(2.018)+(5.008), (I-300)+(2.018)+(5.009), (I-300)+(2.018)+(5.011), (I-300)+(2.018)+(5.012), (I-300)+(2.018)+(5.013), (I-300)+(2.018)+(5.015), (I-300)+(2.018)+(5.018), (I-300)+(2.018)+(5.019), (I-300)+(2.018)+(6.002), (I-300)+(2.018)+(7.001), (I-300)+(2.018)+(7.005), (I-300)+(2.018)+(9.002), (I-300)+(2.018)+(9.004), (I-300)+(2.018)+(14.001), (I-300)+(2.018)+(14.002), (I-300)+(2.018)+(15.008), (I-300)+(2.018)+(15.011), (I-300)+(2.018)+(15.012), (I-300)+(2.018)+(15.016), (I-300)+(2.018)+(15.025), (I-300)+(2.018)+(15.027), (I-300)+(2.018)+(15.047), (I-300)+(2.018)+(15.063), (I-300)+(2.018)+(15.064), (I-300)+(2.018)+(16.001), (I-300)+(2.018)+(16.005), (I-300)+(2.018)+(17.001), (I-300)+(2.018)+(17.002), (I-300)+(2.018)+(17.003), (I-300)+(2.018)+(17.008), (I-300)+(2.018)+(18.001), (I-300)+(2.019)+(3.003), (I-300)+(2.019)+(3.007), (I-300)+(2.019)+(3.012), (I-300)+(2.019)+(3.013), (I-300)+(2.019)+(3.016), (I-300)+(2.019)+(3.017), (I-300)+(2.019)+(3.020), (I-300)+(2.019)+(3.025), (I-300)+(2.019)+(3.026), (I-300)+(2.019)+(3.030), (I-300)+(2.019)+(3.031), (I-300)+(2.019)+(5.003), (I-300)+(2.019)+(5.004), (I-300)+(2.019)+(5.005), (I-300)+(2.019)+(5.008), (I-300)+(2.019)+(5.009), (I-300)+(2.019)+(5.011), (I-300)+(2.019)+(5.012), (I-300)+(2.019)+(5.013), (I-300)+(2.019)+(5.015), (I-300)+(2.019)+(5.018), (I-300)+(2.019)+(5.019), (I-300)+(2.019)+(6.002), (I-300)+(2.019)+(7.001), (I-300)+(2.019)+(7.005), (I-300)+(2.019)+(9.002), (I-300)+(2.019)+(9.004), (I-300)+(2.019)+(14.001), (I-300)+(2.019)+(14.002), (I-300)+(2.019)+(15.008), (I-300)+(2.019)+(15.011), (I-300)+(2.019)+(15.012), (I-300)+(2.019)+(15.016), (I-300)+(2.019)+(15.025), (I-300)+(2.019)+(15.027), (I-300)+(2.019)+(15.047), (I-300)+(2.019)+(15.063), (I-300)+(2.019)+(15.064), (I-300)+(2.019)+(16.001), (I-300)+(2.019)+(16.005), (I-300)+(2.019)+(17.001), (I-300)+(2.019)+(17.002), (I-300)+(2.019)+(17.003), (I-300)+(2.019)+(17.008), (I-300)+(2.019)+(18.001), (I-300)+(2.021)+(3.003), (I-300)+(2.021)+(3.007), (I-300)+(2.021)+(3.012), (I-300)+(2.021)+(3.013), (I-300)+(2.021)+(3.016), (I-300)+(2.021)+(3.017), (I-300)+(2.021)+(3.020), (I-300)+(2.021)+(3.025), (I-300)+(2.021)+(3.026), (I-300)+(2.021)+(3.030), (I-300)+(2.021)+(3.031), (I-300)+(2.021)+(5.003), (I-300)+(2.021)+(5.004), (I-300)+(2.021)+(5.005), (I-300)+(2.021)+(5.008), (I-300)+(2.021)+(5.009), (I-300)+(2.021)+(5.011), (I-300)+(2.021)+(5.012), (I-300)+(2.021)+(5.013), (I-300)+(2.021)+(5.015), (I-300)+(2.021)+(5.018), (I-300)+(2.021)+(5.019), (I-300)+(2.021)+(6.002), (I-300)+(2.021)+(7.001), (I-300)+(2.021)+(7.005), (I-300)+(2.021)+(9.002), (I-300)+(2.021)+(9.004), (I-300)+(2.021)+(14.001), (I-300)+(2.021)+(14.002), (I-300)+(2.021)+(15.008), (I-300)+(2.021)+(15.011), (I-300)+(2.021)+(15.012), (I-300)+(2.021)+(15.016), (I-300)+(2.021)+(15.025), (I-300)+(2.021)+(15.027), (I-300)+(2.021)+(15.047), (I-300)+(2.021)+(15.063), (I-300)+(2.021)+(15.064), (I-300)+(2.021)+(16.001), (I-300)+(2.021)+(16.005), (I-300)+(2.021)+(17.001), (I-300)+(2.021)+(17.002), (I-300)+(2.021)+(17.003), (I-300)+(2.021)+(17.008), (I-300)+(2.021)+(18.001), (I-300)+(2.028)+(3.003), (I-300)+(2.028)+(3.007), (I-300)+(2.028)+(3.012), (I-300)+(2.028)+(3.013), (I-300)+(2.028)+(3.016), (I-300)+(2.028)+(3.017), (I-300)+(2.028)+(3.020), (I-300)+(2.028)+(3.025), (I-300)+(2.028)+(3.026), (I-300)+(2.028)+(3.030), (I-300)+(2.028)+(3.031), (I-300)+(2.028)+(5.003), (I-300)+(2.028)+(5.004), (I-300)+(2.028)+(5.005), (I-300)+(2.028)+(5.008), (I-300)+(2.028)+(5.009), (I-300)+(2.028)+(5.011), (I-300)+(2.028)+(5.012), (I-300)+(2.028)+(5.013), (I-300)+(2.028)+(5.015), (I-300)+(2.028)+(5.018), (I-300)+(2.028)+(5.019), (I-300)+(2.028)+(6.002), (I-300)+(2.028)+(7.001), (I-300)+(2.028)+(7.005), (I-300)+(2.028)+(9.002), (I-300)+(2.028)+(9.004), (I-300)+(2.028)+(14.001), (I-300)+(2.028)+(14.002), (I-300)+(2.028)+(15.008), (I-300)+(2.028)+(15.011), (I-300)+(2.028)+(15.012), (I-300)+(2.028)+(15.016), (I-300)+(2.028)+(15.025), (I-300)+(2.028)+(15.027), (I-300)+(2.028)+(15.047), (I-300)+(2.028)+(15.063), (I-300)+(2.028)+(15.064), (I-300)+(2.028)+(16.001), (I-300)+(2.028)+(16.005), (I-300)+(2.028)+(17.001), (I-300)+(2.028)+(17.002), (I-300)+(2.028)+(17.003), (I-300)+(2.028)+(17.008), (I-300)+(2.028)+(18.001), (I-300)+(2.030)+(3.003), (I-300)+(2.030)+(3.007), (I-300)+(2.030)+(3.012), (I-300)+(2.030)+(3.013), (I-300)+(2.030)+(3.016), (I-300)+(2.030)+(3.017), (I-300)+(2.030)+(3.020), (I-300)+(2.030)+(3.025), (I-300)+(2.030)+(3.026), (I-300)+(2.030)+(3.030), (I-300)+(2.030)+(3.031), (I-300)+(2.030)+(5.003), (I-300)+(2.030)+(5.004), (I-300)+(2.030)+(5.005), (I-300)+(2.030)+(5.008), (I-300)+(2.030)+(5.009), (I-300)+(2.030)+(5.011), (I-300)+(2.030)+(5.012), (I-300)+(2.030)+(5.013), (I-300)+(2.030)+(5.015), (I-300)+(2.030)+(5.018), (I-300)+(2.030)+(5.019), (I-300)+(2.030)+(6.002), (I-300)+(2.030)+(7.001), (I-300)+(2.030)+(7.005), (I-300)+(2.030)+(9.002), (I-300)+(2.030)+(9.004), (I-300)+(2.030)+(14.001), (I-300)+(2.030)+(14.002), (I-300)+(2.030)+(15.008), (I-300)+(2.030)+(15.011), (I-300)+(2.030)+(15.012), (I-300)+(2.030)+(15.016), (I-300)+(2.030)+(15.025), (I-300)+(2.030)+(15.027), (I-300)+(2.030)+(15.047), (I-300)+(2.030)+(15.063), (I-300)+(2.030)+(15.064), (I-300)+(2.030)+(16.001), (I-300)+(2.030)+(16.005), (I-300)+(2.030)+(17.001), (I-300)+(2.030)+(17.002), (I-300)+(2.030)+(17.003), (I-300)+(2.030)+(17.008), (I-300)+(2.030)+(18.001), (I-300)+(2.038)+(3.003), (I-300)+(2.038)+(3.007), (I-300)+(2.038)+(3.012), (I-300)+(2.038)+(3.013), (I-300)+(2.038)+(3.016), (I-300)+(2.038)+(3.017), (I-300)+(2.038)+(3.020), (I-300)+(2.038)+(3.025), (I-300)+(2.038)+(3.026), (I-300)+(2.038)+(3.030), (I-300)+(2.038)+(3.031), (I-300)+(2.038)+(5.003), (I-300)+(2.038)+(5.004), (I-300)+(2.038)+(5.005), (I-300)+(2.038)+(5.008), (I-300)+(2.038)+(5.009), (I-300)+(2.038)+(5.011), (I-300)+(2.038)+(5.012), (I-300)+(2.038)+(5.013), (I-300)+(2.038)+(5.015), (I-300)+(2.038)+(5.018), (I-300)+(2.038)+(5.019), (I-300)+(2.038)+(6.002), (I-300)+(2.038)+(7.001), (I-300)+(2.038)+(7.005), (I-300)+(2.038)+(9.002), (I-300)+(2.038)+(9.004), (I-300)+(2.038)+(14.001), (I-300)+(2.038)+(14.002), (I-300)+(2.038)+(15.008), (I-300)+(2.038)+(15.011), (I-300)+(2.038)+(15.012), (I-300)+(2.038)+(15.016), (I-300)+(2.038)+(15.025), (I-300)+(2.038)+(15.027), (I-300)+(2.038)+(15.047), (I-300)+(2.038)+(15.063), (I-300)+(2.038)+(15.064), (I-300)+(2.038)+(16.001), (I-300)+(2.038)+(16.005), (I-300)+(2.038)+(17.001), (I-300)+(2.038)+(17.002), (I-300)+(2.038)+(17.003), (I-300)+(2.038)+(17.008), (I-300)+(2.038)+(18.001).

(I-300)+(3.003)+(3.025), (I-300)+(3.003)+(3.030), (I-300)+(3.003)+(3.031), (I-300)+(3.003)+(5.003), (I-300)+(3.003)+(5.004), (I-300)+(3.003)+(5.005), (I-300)+(3.003)+(5.008), (I-300)+(3.003)+(5.009), (I-300)+(3.003)+(5.011), (I-300)+(3.003)+(5.012), (I-300)+(3.003)+(5.013), (I-300)+(3.003)+(5.015), (I-300)+(3.003)+(5.018), (I-300)+(3.003)+(5.019), (I-300)+(3.003)+(6.002), (I-300)+(3.003)+(7.001), (I-300)+(3.003)+(7.005), (I-300)+(3.003)+(9.002), (I-300)+(3.003)+(9.004), (I-300)+(3.003)+(14.001), (I-300)+(3.003)+(14.002), (I-300)+(3.003)+(15.008), (I-300)+(3.003)+(15.011), (I-300)+(3.003)+(15.012), (I-300)+(3.003)+(15.016), (I-300)+(3.003)+(15.025), (I-300)+(3.003)+(15.027), (I-300)+(3.003)+(15.047), (I-300)+(3.003)+(15.063), (I-300)+(3.003)+(15.064), (I-300)+(3.003)+(16.001), (I-300)+(3.003)+(16.005), (I-300)+(3.003)+(17.001), (I-300)+(3.003)+(17.002), (I-300)+(3.003)+(17.003), (I-300)+(3.003)+(17.008), (I-300)+(3.003)+(18.001), (I-300)+(3.007)+(3.025), (I-300)+(3.007)+(3.030), (I-300)+(3.007)+(3.031), (I-300)+(3.007)+(5.003), (I-300)+(3.007)+(5.004), (I-300)+(3.007)+(5.005), (I-300)+(3.007)+(5.008), (I-300)+(3.007)+(5.009), (I-300)+(3.007)+(5.011), (I-300)+(3.007)+(5.012), (I-300)+(3.007)+(5.013), (I-300)+(3.007)+(5.015), (I-300)+(3.007)+(5.018), (I-300)+(3.007)+(5.019), (I-300)+(3.007)+(6.002), (I-300)+(3.007)+(7.001), (I-300)+(3.007)+(7.005), (I-300)+(3.007)+(9.002), (I-300)+(3.007)+(9.004), (I-300)+(3.007)+(14.001), (I-300)+(3.007)+(14.002), (I-300)+(3.007)+(15.008), (I-300)+(3.007)+(15.011), (I-300)+(3.007)+(15.012), (I-300)+(3.007)+(15.016), (I-300)+(3.007)+(15.025), (I-300)+(3.007)+(15.027), (I-300)+(3.007)+(15.047), (I-300)+(3.007)+(15.063), (I-300)+(3.007)+(15.064), (I-300)+(3.007)+(16.001), (I-300)+(3.007)+(16.005), (I-300)+(3.007)+(17.001), (I-300)+(3.007)+(17.002), (I-300)+(3.007)+(17.003), (I-300)+(3.007)+(17.008), (I-300)+(3.007)+(18.001), (I-300)+(3.012)+(3.025), (I-300)+(3.012)+(3.030), (I-300)+(3.012)+(3.031), (I-300)+(3.012)+(5.003), (I-300)+(3.012)+(5.004), (I-300)+(3.012)+(5.005), (I-300)+(3.012)+(5.008), (I-300)+(3.012)+(5.009), (I-300)+(3.012)+(5.011), (I-300)+(3.012)+(5.012), (I-300)+(3.012)+(5.013), (I-300)+(3.012)+(5.015), (I-300)+(3.012)+(5.018), (I-300)+(3.012)+(5.019), (I-300)+(3.012)+(6.002), (I-300)+(3.012)+(7.001), (I-300)+(3.012)+(7.005), (I-300)+(3.012)+(9.002), (I-300)+(3.012)+(9.004), (I-300)+(3.012)+(14.001), (I-300)+(3.012)+(14.002), (I-300)+(3.012)+(15.008), (I-300)+(3.012)+(15.011), (I-300)+(3.012)+(15.012), (I-300)+(3.012)+(15.016), (I-300)+(3.012)+(15.025), (I-300)+(3.012)+(15.027), (I-300)+(3.012)+(15.047), (I-300)+(3.012)+(15.063), (I-300)+(3.012)+(15.064), (I-300)+(3.012)+(16.001), (I-300)+(3.012)+(16.005), (I-300)+(3.012)+(17.001), (I-300)+(3.012)+(17.002), (I-300)+(3.012)+(17.003), (I-300)+(3.012)+(17.008), (I-300)+(3.012)+(18.001), (I-300)+(3.013)+(3.025), (I-300)+(3.013)+(3.030), (I-300)+(3.013)+(3.031), (I-300)+(3.013)+(5.003), (I-300)+(3.013)+(5.004), (I-300)+(3.013)+(5.005), (I-300)+(3.013)+(5.008), (I-300)+(3.013)+(5.009), (I-300)+(3.013)+(5.011), (I-300)+(3.013)+(5.012), (I-300)+(3.013)+(5.013), (I-300)+(3.013)+(5.015), (I-300)+(3.013)+(5.018), (I-300)+(3.013)+(5.019), (I-300)+(3.013)+(6.002), (I-300)+(3.013)+(7.001), (I-300)+(3.013)+(7.005), (I-300)+(3.013)+(9.002), (I-300)+(3.013)+(9.004), (I-300)+(3.013)+(14.001), (I-300)+(3.013)+(14.002), (I-300)+(3.013)+(15.008), (I-300)+(3.013)+(15.011), (I-300)+(3.013)+(15.012), (I-300)+(3.013)+(15.016), (I-300)+(3.013)+(15.025), (I-300)+(3.013)+(15.027), (I-300)+(3.013)+(15.047), (I-300)+(3.013)+(15.063), (I-300)+(3.013)+(15.064), (I-300)+(3.013)+(16.001), (I-300)+(3.013)+(16.005), (I-300)+(3.013)+(17.001), (I-300)+(3.013)+(17.002), (I-300)+(3.013)+(17.003), (I-300)+(3.013)+(17.008), (I-300)+(3.013)+(18.001), (I-300)+(3.016)+(3.025), (I-300)+(3.016)+(3.030), (I-300)+(3.016)+(3.031), (I-300)+(3.016)+(5.003), (I-300)+(3.016)+(5.004), (I-300)+(3.016)+(5.005), (I-300)+(3.016)+(5.008), (I-300)+(3.016)+(5.009), (I-300)+(3.016)+(5.011), (I-300)+(3.016)+(5.012), (I-300)+(3.016)+(5.013), (I-300)+(3.016)+(5.015), (I-300)+(3.016)+(5.018), (I-300)+(3.016)+(5.019), (I-300)+(3.016)+(6.002), (I-300)+(3.016)+(7.001), (I-300)+(3.016)+(7.005), (I-300)+(3.016)+(9.002), (I-300)+(3.016)+(9.004), (I-300)+(3.016)+(14.001), (I-300)+(3.016)+(14.002), (I-300)+(3.016)+(15.008), (I-300)+(3.016)+(15.011), (I-300)+(3.016)+(15.012), (I-300)+(3.016)+(15.016), (I-300)+(3.016)+(15.025), (I-300)+(3.016)+(15.027), (I-300)+(3.016)+(15.047), (I-300)+(3.016)+(15.063), (I-300)+(3.016)+(15.064), (I-300)+(3.016)+(16.001), (I-300)+(3.016)+(16.005), (I-300)+(3.016)+(17.001), (I-300)+(3.016)+(17.002), (I-300)+(3.016)+(17.003), (I-300)+(3.016)+(17.008), (I-300)+(3.016)+(18.001), (I-300)+(3.017)+(3.025), (I-300)+(3.017)+(3.030), (I-300)+(3.017)+(3.031), (I-300)+(3.017)+(5.003), (I-300)+(3.017)+(5.004), (I-300)+(3.017)+(5.005), (I-300)+(3.017)+(5.008), (I-300)+(3.017)+(5.009), (I-300)+(3.017)+(5.011), (I-300)+(3.017)+(5.012), (I-300)+(3.017)+(5.013), (I-300)+(3.017)+(5.015), (I-300)+(3.017)+(5.018), (I-300)+(3.017)+(5.019), (I-300)+(3.017)+(6.002), (I-300)+(3.017)+(7.001), (I-300)+(3.017)+(7.005), (I-300)+(3.017)+(9.002), (I-300)+(3.017)+(9.004), (I-300)+(3.017)+(14.001), (I-300)+(3.017)+(14.002), (I-300)+(3.017)+(15.008), (I-300)+(3.017)+(15.011), (I-300)+(3.017)+(15.012), (I-300)+(3.017)+(15.016), (I-300)+(3.017)+(15.025), (I-300)+(3.017)+(15.027), (I-300)+(3.017)+(15.047), (I-300)+(3.017)+(15.063), (I-300)+(3.017)+(15.064), (I-300)+(3.017)+(16.001), (I-300)+(3.017)+(16.005), (I-300)+(3.017)+(17.001), (I-300)+(3.017)+(17.002), (I-300)+(3.017)+(17.003), (I-300)+(3.017)+(17.008), (I-300)+(3.017)+(18.001), (I-300)+(3.020)+(3.025), (I-300)+(3.020)+(3.030), (I-300)+(3.020)+(3.031), (I-300)+(3.020)+(5.003), (I-300)+(3.020)+(5.004), (I-300)+(3.020)+(5.005), (I-300)+(3.020)+(5.008), (I-300)+(3.020)+(5.009), (I-300)+(3.020)+(5.011), (I-300)+(3.020)+(5.012), (I-300)+(3.020)+(5.013), (I-300)+(3.020)+(5.015), (I-300)+(3.020)+(5.018), (I-300)+(3.020)+(5.019), (I-300)+(3.020)+(6.002), (I-300)+(3.020)+(7.001), (I-300)+(3.020)+(7.005), (I-300)+(3.020)+(9.002), (I-300)+(3.020)+(9.004), (I-300)+(3.020)+(14.001), (I-300)+(3.020)+(14.002), (I-300)+(3.020)+(15.008), (I-300)+(3.020)+(15.011), (I-300)+(3.020)+(15.012), (I-300)+(3.020)+(15.016), (I-300)+(3.020)+(15.025), (I-300)+(3.020)+(15.027), (I-300)+(3.020)+(15.047), (I-300)+(3.020)+(15.063), (I-300)+(3.020)+(15.064), (I-300)+(3.020)+(16.001), (I-300)+(3.020)+(16.005), (I-300)+(3.020)+(17.001), (I-300)+(3.020)+(17.002), (I-300)+(3.020)+(17.003), (I-300)+(3.020)+(17.008), (I-300)+(3.020)+(18.001), (I-300)+(3.025)+(3.030), (I-300)+(3.025)+(3.031), (I-300)+(3.025)+(5.003), (I-300)+(3.025)+(5.004), (I-300)+(3.025)+(5.005), (I-300)+(3.025)+(5.008), (I-300)+(3.025)+(5.009), (I-300)+(3.025)+(5.011), (I-300)+(3.025)+(5.012), (I-300)+(3.025)+(5.013), (I-300)+(3.025)+(5.015), (I-300)+(3.025)+(5.018), (I-300)+(3.025)+(5.019), (I-300)+(3.025)+(6.002), (I-300)+(3.025)+(7.001), (I-300)+(3.025)+(7.005), (I-300)+(3.025)+(9.002), (I-300)+(3.025)+(9.004), (I-300)+(3.025)+(14.001), (I-300)+(3.025)+(14.002), (I-300)+(3.025)+(15.008), (I-300)+(3.025)+(15.011), (I-300)+(3.025)+(15.012), (I-300)+(3.025)+(15.016), (I-300)+(3.025)+(15.025), (I-300)+(3.025)+(15.027), (I-300)+(3.025)+(15.047), (I-300)+(3.025)+(15.063), (I-300)+(3.025)+(15.064), (I-300)+(3.025)+(16.001), (I-300)+(3.025)+(16.005), (I-300)+(3.025)+(17.001), (I-300)+(3.025)+(17.002), (I-300)+(3.025)+(17.003), (I-300)+(3.025)+(17.008), (I-300)+(3.025)+(18.001), (I-300)+(3.026)+(3.025), (I-300)+(3.026)+(3.030), (I-300)+(3.026)+(3.031), (I-300)+(3.026)+(5.003), (I-300)+(3.026)+(5.004), (I-300)+(3.026)+(5.005), (I-300)+(3.026)+(5.008), (I-300)+(3.026)+(5.009), (I-300)+(3.026)+(5.011), (I-300)+(3.026)+(5.012), (I-300)+(3.026)+(5.013), (I-300)+(3.026)+(5.015), (I-300)+(3.026)+(5.018), (I-300)+(3.026)+(5.019), (I-300)+(3.026)+(6.002), (I-300)+(3.026)+(7.001), (I-300)+(3.026)+(7.005), (I-300)+(3.026)+(9.002), (I-300)+(3.026)+(9.004), (I-300)+(3.026)+(14.001), (I-300)+(3.026)+(14.002), (I-300)+(3.026)+(15.008), (I-300)+(3.026)+(15.011), (I-300)+(3.026)+(15.012), (I-300)+(3.026)+(15.016), (I-300)+(3.026)+(15.025), (I-300)+(3.026)+(15.027), (I-300)+(3.026)+(15.047), (I-300)+(3.026)+(15.063), (I-300)+(3.026)+(15.064), (I-300)+(3.026)+(16.001), (I-300)+(3.026)+(16.005), (I-300)+(3.026)+(17.001), (I-300)+(3.026)+(17.002), (I-300)+(3.026)+(17.003), (I-300)+(3.026)+(17.008), (I-300)+(3.026)+(18.001), (I-300)+(3.030)+(3.025), (I-300)+(3.030)+(3.031), (I-300)+(3.030)+(5.003), (I-300)+(3.030)+(5.004), (I-300)+(3.030)+(5.005), (I-300)+(3.030)+(5.008), (I-300)+(3.030)+(5.009), (I-300)+(3.030)+(5.011), (I-300)+(3.030)+(5.012), (I-300)+(3.030)+(5.013), (I-300)+(3.030)+(5.015), (I-300)+(3.030)+(5.018), (I-300)+(3.030)+(5.019), (I-300)+(3.030)+(6.002), (I-300)+(3.030)+(7.001), (I-300)+(3.030)+(7.005), (I-300)+(3.030)+(9.002), (I-300)+(3.030)+(9.004), (I-300)+(3.030)+(14.001), (I-300)+(3.030)+(14.002), (I-300)+(3.030)+(15.008), (I-300)+(3.030)+(15.011), (I-300)+(3.030)+(15.012), (I-300)+(3.030)+(15.016), (I-300)+(3.030)+(15.025), (I-300)+(3.030)+(15.027), (I-300)+(3.030)+(15.047), (I-300)+(3.030)+(15.063), (I-300)+(3.030)+(15.064), (I-300)+(3.030)+(16.001), (I-300)+(3.030)+(16.005), (I-300)+(3.030)+(17.001), (I-300)+(3.030)+(17.002), (I-300)+(3.030)+(17.003), (I-300)+(3.030)+(17.008), (I-300)+(3.030)+(18.001), (I-300)+(3.031)+(3.025), (I-300)+(3.031)+(3.030), (I-300)+(3.031)+(5.003), (I-300)+(3.031)+(5.004), (I-300)+(3.031)+(5.005), (I-300)+(3.031)+(5.008), (I-300)+(3.031)+(5.009), (I-300)+(3.031)+(5.011), (I-300)+(3.031)+(5.012), (I-300)+(3.031)+(5.013), (I-300)+(3.031)+(5.015), (I-300)+(3.031)+(5.018), (I-300)+(3.031)+(5.019), (I-300)+(3.031)+(6.002), (I-300)+(3.031)+(7.001), (I-300)+(3.031)+(7.005), (I-300)+(3.031)+(9.002), (I-300)+(3.031)+(9.004), (I-300)+(3.031)+(14.001), (I-300)+(3.031)+(14.002), (I-300)+(3.031)+(15.008), (I-300)+(3.031)+(15.011), (I-300)+(3.031)+(15.012), (I-300)+(3.031)+(15.016), (I-300)+(3.031)+(15.025), (I-300)+(3.031)+(15.027), (I-300)+(3.031)+(15.047), (I-300)+(3.031)+(15.063), (I-300)+(3.031)+(15.064), (I-300)+(3.031)+(16.001), (I-300)+(3.031)+(16.005), (I-300)+(3.031)+(17.001), (I-300)+(3.031)+(17.002), (I-300)+(3.031)+(17.003), (I-300)+(3.031)+(17.008), (I-300)+(3.031)+(18.001), (I-300)+(5.003)+(9.002), (I-300)+(5.003)+(15.012), (I-300)+(5.003)+(15.016), (I-300)+(5.003)+(15.025), (I-300)+(5.003)+(15.027), (I-300)+(5.003)+(15.047), (I-300)+(5.003)+(15.063), (I-300)+(5.003)+(15.064), (I-300)+(5.004)+(9.002), (I-300)+(5.004)+(15.012), (I-300)+(5.004)+(15.016), (I-300)+(5.004)+(15.025), (I-300)+(5.004)+(15.027), (I-300)+(5.004)+(15.047), (I-300)+(5.004)+(15.063), (I-300)+(5.004)+(15.064), (I-300)+(5.005)+(9.002), (I-300)+(5.005)+(15.012), (I-300)+(5.005)+(15.016), (I-300)+(5.005)+(15.025), (I-300)+(5.005)+(15.027), (I-300)+(5.005)+(15.047), (I-300)+(5.005)+(15.063), (I-300)+(5.005)+(15.064), (I-300)+(5.008)+(9.002), (I-300)+(5.008)+(15.012), (I-300)+(5.008)+(15.016), (I-300)+(5.008)+(15.025), (I-300)+(5.008)+(15.027), (I-300)+(5.008)+(15.047), (I-300)+(5.008)+(15.063), (I-300)+(5.008)+(15.064), (I-300)+(5.009)+(9.002), (I-300)+(5.009)+(15.012), (I-300)+(5.009)+(15.016), (I-300)+(5.009)+(15.025), (I-300)+(5.009)+(15.027), (I-300)+(5.009)+(15.047), (I-300)+(5.009)+(15.063), (I-300)+(5.009)+(15.064), (I-300)+(5.011)+(9.002), (I-300)+(5.011)+(15.012), (I-300)+(5.011)+(15.016), (I-300)+(5.011)+(15.025), (I-300)+(5.011)+(15.027), (I-300)+(5.011)+(15.047), (I-300)+(5.011)+(15.063), (I-300)+(5.011)+(15.064), (I-300)+(5.012)+(9.002), (I-300)+(5.012)+(15.012), (I-300)+(5.012)+(15.016), (I-300)+(5.012)+(15.025), (I-300)+(5.012)+(15.027), (I-300)+(5.012)+(15.047), (I-300)+(5.012)+(15.063), (I-300)+(5.012)+(15.064), (I-300)+(5.013)+(9.002), (I-300)+(5.013)+(15.012), (I-300)+(5.013)+(15.016), (I-300)+(5.013)+(15.025), (I-300)+(5.013)+(15.027), (I-300)+(5.013)+(15.047), (I-300)+(5.013)+(15.063), (I-300)+(5.013)+(15.064), (I-300)+(5.015)+(9.002), (I-300)+(5.015)+(15.012), (I-300)+(5.015)+(15.016), (I-300)+(5.015)+(15.025), (I-300)+(5.015)+(15.027), (I-300)+(5.015)+(15.047), (I-300)+(5.015)+(15.063), (I-300)+(5.015)+(15.064), (I-300)+(5.018)+(9.002), (I-300)+(5.018)+(15.012), (I-300)+(5.018)+(15.016), (I-300)+(5.018)+(15.025), (I-300)+(5.018)+(15.027), (I-300)+(5.018)+(15.047), (I-300)+(5.018)+(15.063), (I-300)+(5.018)+(15.064), (I-300)+(5.019)+(9.002), (I-300)+(5.019)+(15.012), (I-300)+(5.019)+(15.016), (I-300)+(5.019)+(15.025), (I-300)+(5.019)+(15.027), (I-300)+(5.019)+(15.047), (I-300)+(5.019)+(15.063), (I-300)+(5.019)+(15.064).

If two compounds (B) are present in the combinations according to the invention, more preferred compound combinations are selected from the group (G4-C1) consisting of the following mixtures:

(I-302)+(1.001)+(1.002), (I-302)+(1.001)+(1.003), (I-302)+(1.001)+(1.004), (I-302)+(1.001)+(1.005), (I-302)+(1.001)+(1.006), (I-302)+(1.001)+(1.007), (I-302)+(1.001)+(1.010), (I-302)+(1.001)+(1.011), (I-302)+(1.001)+(1.012), (I-302)+(1.001)+(1.013), (I-302)+(1.001)+(1.017), (I-302)+(1.001)+(1.018), (I-302)+(1.001)+(1.020), (I-302)+(1.001)+(1.021), (I-302)+(1.001)+(1.026), (I-302)+(1.001)+(1.027), (I-302)+(1.001)+(1.055), (I-302)+(1.001)+(1.059), (I-302)+(1.001)+(1.092), (I-302)+(1.001)+(2.001), (I-302)+(1.001)+(2.002), (I-302)+(1.001)+(2.003), (I-302)+(1.001)+(2.005), (I-302)+(1.001)+(2.007), (I-302)+(1.001)+(2.009), (I-302)+(1.001)+(2.010), (I-302)+(1.001)+(2.011), (I-302)+(1.001)+(2.012), (I-302)+(1.001)+(2.013), (I-302)+(1.001)+(2.014), (I-302)+(1.001)+(2.015), (I-302)+(1.001)+(2.016), (I-302)+(1.001)+(2.017), (I-302)+(1.001)+(2.018), (I-302)+(1.001)+(2.019), (I-302)+(1.001)+(2.021), (I-302)+(1.001)+(2.028), (I-302)+(1.001)+(2.030), (I-302)+(1.001)+(2.038), (I-302)+(1.001)+(3.003), (I-302)+(1.001)+(3.007), (I-302)+(1.001)+(3.012), (I-302)+(1.001)+(3.013), (I-302)+(1.001)+(3.016), (I-302)+(1.001)+(3.017), (I-302)+(1.001)+(3.020), (I-302)+(1.001)+(3.025), (I-302)+(1.001)+(3.026), (I-302)+(1.001)+(3.030), (I-302)+(1.001)+(3.031), (I-302)+(1.001)+(5.003), (I-302)+(1.001)+(5.004), (I-302)+(1.001)+(5.005), (I-302)+(1.001)+(5.008), (I-302)+(1.001)+(5.009), (I-302)+(1.001)+(5.011), (I-302)+(1.001)+(5.012), (I-302)+(1.001)+(5.013), (I-302)+(1.001)+(5.015), (I-302)+(1.001)+(5.018), (I-302)+(1.001)+(5.019), (I-302)+(1.001)+(6.002), (I-302)+(1.001)+(7.001), (I-302)+(1.001)+(7.005), (I-302)+(1.001)+(9.002), (I-302)+(1.001)+(9.004), (I-302)+(1.001)+(14.001), (I-302)+(1.001)+(14.002), (I-302)+(1.001)+(15.008), (I-302)+(1.001)+(15.011), (I-302)+(1.001)+(15.012), (I-302)+(1.001)+(15.016), (I-302)+(1.001)+(15.025), (I-302)+(1.001)+(15.027), (I-302)+(1.001)+(15.047), (I-302)+(1.001)+(15.063), (I-302)+(1.001)+(15.064), (I-302)+(1.001)+(16.001), (I-302)+(1.001)+(16.005), (I-302)+(1.001)+(17.001), (I-302)+(1.001)+(17.002), (I-302)+(1.001)+(17.003), (I-302)+(1.001)+(17.008), (I-302)+(1.001)+(18.001), (I-302)+(1.002)+(1.001), (I-302)+(1.002)+(1.003), (I-302)+(1.002)+(1.004), (I-302)+(1.002)+(1.005), (I-302)+(1.002)+(1.006), (I-302)+(1.002)+(1.007), (I-302)+(1.002)+(1.010), (I-302)+(1.002)+(1.011), (I-302)+(1.002)+(1.012), (I-302)+(1.002)+(1.013), (I-302)+(1.002)+(1.017), (I-302)+(1.002)+(1.018), (I-302)+(1.002)+(1.020), (I-302)+(1.002)+(1.021), (I-302)+(1.002)+(1.026), (I-302)+(1.002)+(1.027), (I-302)+(1.002)+(1.055), (I-302)+(1.002)+(1.059), (I-302)+(1.002)+(1.092), (I-302)+(1.002)+(2.001), (I-302)+(1.002)+(2.002), (I-302)+(1.002)+(2.003), (I-302)+(1.002)+(2.005), (I-302)+(1.002)+(2.007), (I-302)+(1.002)+(2.009), (I-302)+(1.002)+(2.010), (I-302)+(1.002)+(2.011), (I-302)+(1.002)+(2.012), (I-302)+(1.002)+(2.013), (I-302)+(1.002)+(2.014), (I-302)+(1.002)+(2.015), (I-302)+(1.002)+(2.016), (I-302)+(1.002)+(2.017), (I-302)+(1.002)+(2.018), (I-302)+(1.002)+(2.019), (I-302)+(1.002)+(2.021), (I-302)+(1.002)+(2.028), (I-302)+(1.002)+(2.030), (I-302)+(1.002)+(2.038), (I-302)+(1.002)+(3.003), (I-302)+(1.002)+(3.007), (I-302)+(1.002)+(3.012), (I-302)+(1.002)+(3.013), (I-302)+(1.002)+(3.016), (I-302)+(1.002)+(3.017), (I-302)+(1.002)+(3.020), (I-302)+(1.002)+(3.025), (I-302)+(1.002)+(3.026), (I-302)+(1.002)+(3.030), (I-302)+(1.002)+(3.031), (I-302)+(1.002)+(5.003), (I-302)+(1.002)+(5.004), (I-302)+(1.002)+(5.005), (I-302)+(1.002)+(5.008), (I-302)+(1.002)+(5.009), (I-302)+(1.002)+(5.011), (I-302)+(1.002)+(5.012), (I-302)+(1.002)+(5.013), (I-302)+(1.002)+(5.015), (I-302)+(1.002)+(5.018), (I-302)+(1.002)+(5.019), (I-302)+(1.002)+(6.002), (I-302)+(1.002)+(7.001), (I-302)+(1.002)+(7.005), (I-302)+(1.002)+(9.002), (I-302)+(1.002)+(9.004), (I-302)+(1.002)+(14.001), (I-302)+(1.002)+(14.002), (I-302)+(1.002)+(15.008), (I-302)+(1.002)+(15.011), (I-302)+(1.002)+(15.012), (I-302)+(1.002)+(15.016), (I-302)+(1.002)+(15.025), (I-302)+(1.002)+(15.027), (I-302)+(1.002)+(15.047), (I-302)+(1.002)+(15.063), (I-302)+(1.002)+(15.064), (I-302)+(1.002)+(16.001), (I-302)+(1.002)+(16.005), (I-302)+(1.002)+(17.001), (I-302)+(1.002)+(17.002), (I-302)+(1.002)+(17.003), (I-302)+(1.002)+(17.008), (I-302)+(1.002)+(18.001), (I-302)+(1.003)+(1.001), (I-302)+(1.003)+(1.002), (I-302)+(1.003)+(1.004), (I-302)+(1.003)+(1.005), (I-302)+(1.003)+(1.006), (I-302)+(1.003)+(1.007), (I-302)+(1.003)+(1.010), (I-302)+(1.003)+(1.011), (I-302)+(1.003)+(1.012), (I-302)+(1.003)+(1.013), (I-302)+(1.003)+(1.017), (I-302)+(1.003)+(1.018), (I-302)+(1.003)+(1.020), (I-302)+(1.003)+(1.021), (I-302)+(1.003)+(1.026), (I-302)+(1.003)+(1.027), (I-302)+(1.003)+(1.055), (I-302)+(1.003)+(1.059), (I-302)+(1.003)+(1.092), (I-302)+(1.003)+(2.001), (I-302)+(1.003)+(2.002), (I-302)+(1.003)+(2.003), (I-302)+(1.003)+(2.005), (I-302)+(1.003)+(2.007), (I-302)+(1.003)+(2.009), (I-302)+(1.003)+(2.010), (I-302)+(1.003)+(2.011), (I-302)+(1.003)+(2.012), (I-302)+(1.003)+(2.013), (I-302)+(1.003)+(2.014), (I-302)+(1.003)+(2.015), (I-302)+(1.003)+(2.016), (I-302)+(1.003)+(2.017), (I-302)+(1.003)+(2.018), (I-302)+(1.003)+(2.019), (I-302)+(1.003)+(2.021), (I-302)+(1.003)+(2.028), (I-302)+(1.003)+(2.030), (I-302)+(1.003)+(2.038), (I-302)+(1.003)+(3.003), (I-302)+(1.003)+(3.007), (I-302)+(1.003)+(3.012), (I-302)+(1.003)+(3.013), (I-302)+(1.003)+(3.016), (I-302)+(1.003)+(3.017), (I-302)+(1.003)+(3.020), (I-302)+(1.003)+(3.025), (I-302)+(1.003)+(3.026), (I-302)+(1.003)+(3.030), (I-302)+(1.003)+(3.031), (I-302)+(1.003)+(5.003), (I-302)+(1.003)+(5.004), (I-302)+(1.003)+(5.005), (I-302)+(1.003)+(5.008), (I-302)+(1.003)+(5.009), (I-302)+(1.003)+(5.011), (I-302)+(1.003)+(5.012), (I-302)+(1.003)+(5.013), (I-302)+(1.003)+(5.015), (I-302)+(1.003)+(5.018), (I-302)+(1.003)+(5.019), (I-302)+(1.003)+(6.002), (I-302)+(1.003)+(7.001), (I-302)+(1.003)+(7.005), (I-302)+(1.003)+(9.002), (I-302)+(1.003)+(9.004), (I-302)+(1.003)+(14.001), (I-302)+(1.003)+(14.002), (I-302)+(1.003)+(15.008), (I-302)+(1.003)+(15.011), (I-302)+(1.003)+(15.012), (I-302)+(1.003)+(15.016), (I-302)+(1.003)+(15.025), (I-302)+(1.003)+(15.027), (I-302)+(1.003)+(15.047), (I-302)+(1.003)+(15.063), (I-302)+(1.003)+(15.064), (I-302)+(1.003)+(16.001), (I-302)+(1.003)+(16.005), (I-302)+(1.003)+(17.001), (I-302)+(1.003)+(17.002), (I-302)+(1.003)+(17.003), (I-302)+(1.003)+(17.008), (I-302)+(1.003)+(18.001), (I-302)+(1.004)+(1.001), (I-302)+(1.004)+(1.002), (I-302)+(1.004)+(1.003), (I-302)+(1.004)+(1.005), (I-302)+(1.004)+(1.006), (I-302)+(1.004)+(1.007), (I-302)+(1.004)+(1.010), (I-302)+(1.004)+(1.011), (I-302)+(1.004)+(1.012), (I-302)+(1.004)+(1.013), (I-302)+(1.004)+(1.017), (I-302)+(1.004)+(1.018), (I-302)+(1.004)+(1.020), (I-302)+(1.004)+(1.021), (I-302)+(1.004)+(1.026), (I-302)+(1.004)+(1.027), (I-302)+(1.004)+(1.055), (I-302)+(1.004)+(1.059), (I-302)+(1.004)+(1.092), (I-302)+(1.004)+(2.001), (I-302)+(1.004)+(2.002), (I-302)+(1.004)+(2.003), (I-302)+(1.004)+(2.005), (I-302)+(1.004)+(2.007), (I-302)+(1.004)+(2.009), (I-302)+(1.004)+(2.010), (I-302)+(1.004)+(2.011), (I-302)+(1.004)+(2.012), (I-302)+(1.004)+(2.013), (I-302)+(1.004)+(2.014), (I-302)+(1.004)+(2.015), (I-302)+(1.004)+(2.016), (I-302)+(1.004)+(2.017), (I-302)+(1.004)+(2.018), (I-302)+(1.004)+(2.019), (I-302)+(1.004)+(2.021), (I-302)+(1.004)+(2.028), (I-302)+(1.004)+(2.030), (I-302)+(1.004)+(2.038), (I-302)+(1.004)+(3.003), (I-302)+(1.004)+(3.007), (I-302)+(1.004)+(3.012), (I-302)+(1.004)+(3.013), (I-302)+(1.004)+(3.016), (I-302)+(1.004)+(3.017), (I-302)+(1.004)+(3.020), (I-302)+(1.004)+(3.025), (I-302)+(1.004)+(3.026), (I-302)+(1.004)+(3.030), (I-302)+(1.004)+(3.031), (I-302)+(1.004)+(5.003), (I-302)+(1.004)+(5.004), (I-302)+(1.004)+(5.005), (I-302)+(1.004)+(5.008), (I-302)+(1.004)+(5.009), (I-302)+(1.004)+(5.011), (I-302)+(1.004)+(5.012), (I-302)+(1.004)+(5.013), (I-302)+(1.004)+(5.015), (I-302)+(1.004)+(5.018), (I-302)+(1.004)+(5.019), (I-302)+(1.004)+(6.002), (I-302)+(1.004)+(7.001), (I-302)+(1.004)+(7.005), (I-302)+(1.004)+(9.002), (I-302)+(1.004)+(9.004), (I-302)+(1.004)+(14.001), (I-302)+(1.004)+(14.002), (I-302)+(1.004)+(15.008), (I-302)+(1.004)+(15.011), (I-302)+(1.004)+(15.012), (I-302)+(1.004)+(15.016), (I-302)+(1.004)+(15.025), (I-302)+(1.004)+(15.027), (I-302)+(1.004)+(15.047), (I-302)+(1.004)+(15.063), (I-302)+(1.004)+(15.064), (I-302)+(1.004)+(16.001), (I-302)+(1.004)+(16.005), (I-302)+(1.004)+(17.001), (I-302)+(1.004)+(17.002), (I-302)+(1.004)+(17.003), (I-302)+(1.004)+(17.008), (I-302)+(1.004)+(18.001), (I-302)+(1.005)+(1.001), (I-302)+(1.005)+(1.002), (I-302)+(1.005)+(1.003), (I-302)+(1.005)+(1.004), (I-302)+(1.005)+(1.006), (I-302)+(1.005)+(1.007), (I-302)+(1.005)+(1.010), (I-302)+(1.005)+(1.011), (I-302)+(1.005)+(1.012), (I-302)+(1.005)+(1.013), (I-302)+(1.005)+(1.017), (I-302)+(1.005)+(1.018), (I-302)+(1.005)+(1.020), (I-302)+(1.005)+(1.021), (I-302)+(1.005)+(1.026), (I-302)+(1.005)+(1.027), (I-302)+(1.005)+(1.055), (I-302)+(1.005)+(1.059), (I-302)+(1.005)+(1.092), (I-302)+(1.005)+(2.001), (I-302)+(1.005)+(2.002), (I-302)+(1.005)+(2.003), (I-302)+(1.005)+(2.005), (I-302)+(1.005)+(2.007), (I-302)+(1.005)+(2.009), (I-302)+(1.005)+(2.010), (I-302)+(1.005)+(2.011), (I-302)+(1.005)+(2.012), (I-302)+(1.005)+(2.013), (I-302)+(1.005)+(2.014), (I-302)+(1.005)+(2.015), (I-302)+(1.005)+(2.016), (I-302)+(1.005)+(2.017), (I-302)+(1.005)+(2.018), (I-302)+(1.005)+(2.019), (I-302)+(1.005)+(2.021), (I-302)+(1.005)+(2.028), (I-302)+(1.005)+(2.030), (I-302)+(1.005)+(2.038), (I-302)+(1.005)+(3.003), (I-302)+(1.005)+(3.007), (I-302)+(1.005)+(3.012), (I-302)+(1.005)+(3.013), (I-302)+(1.005)+(3.016), (I-302)+(1.005)+(3.017), (I-302)+(1.005)+(3.020), (I-302)+(1.005)+(3.025), (I-302)+(1.005)+(3.026), (I-302)+(1.005)+(3.030), (I-302)+(1.005)+(3.031), (I-302)+(1.005)+(5.003), (I-302)+(1.005)+(5.004), (I-302)+(1.005)+(5.005), (I-302)+(1.005)+(5.008), (I-302)+(1.005)+(5.009), (I-302)+(1.005)+(5.011), (I-302)+(1.005)+(5.012), (I-302)+(1.005)+(5.013), (I-302)+(1.005)+(5.015), (I-302)+(1.005)+(5.018), (I-302)+(1.005)+(5.019), (I-302)+(1.005)+(6.002), (I-302)+(1.005)+(7.001), (I-302)+(1.005)+(7.005), (I-302)+(1.005)+(9.002), (I-302)+(1.005)+(9.004), (I-302)+(1.005)+(14.001), (I-302)+(1.005)+(14.002), (I-302)+(1.005)+(15.008), (I-302)+(1.005)+(15.011), (I-302)+(1.005)+(15.012), (I-302)+(1.005)+(15.016), (I-302)+(1.005)+(15.025), (I-302)+(1.005)+(15.027), (I-302)+(1.005)+(15.047), (I-302)+(1.005)+(15.063), (I-302)+(1.005)+(15.064), (I-302)+(1.005)+(16.001), (I-302)+(1.005)+(16.005), (I-302)+(1.005)+(17.001), (I-302)+(1.005)+(17.002), (I-302)+(1.005)+(17.003), (I-302)+(1.005)+(17.008), (I-302)+(1.005)+(18.001), (I-302)+(1.006)+(1.001), (I-302)+(1.006)+(1.002), (I-302)+(1.006)+(1.003), (I-302)+(1.006)+(1.004), (I-302)+(1.006)+(1.005), (I-302)+(1.006)+(1.007), (I-302)+(1.006)+(1.010), (I-302)+(1.006)+(1.011), (I-302)+(1.006)+(1.012), (I-302)+(1.006)+(1.013), (I-302)+(1.006)+(1.017), (I-302)+(1.006)+(1.018), (I-302)+(1.006)+(1.020), (I-302)+(1.006)+(1.021), (I-302)+(1.006)+(1.026), (I-302)+(1.006)+(1.027), (I-302)+(1.006)+(1.055), (I-302)+(1.006)+(1.059), (I-302)+(1.006)+(1.092), (I-302)+(1.006)+(2.001), (I-302)+(1.006)+(2.002), (I-302)+(1.006)+(2.003), (I-302)+(1.006)+(2.005), (I-302)+(1.006)+(2.007), (I-302)+(1.006)+(2.009), (I-302)+(1.006)+(2.010), (I-302)+(1.006)+(2.011), (I-302)+(1.006)+(2.012), (I-302)+(1.006)+(2.013), (I-302)+(1.006)+(2.014), (I-302)+(1.006)+(2.015), (I-302)+(1.006)+(2.016), (I-302)+(1.006)+(2.017), (I-302)+(1.006)+(2.018), (I-302)+(1.006)+(2.019), (I-302)+(1.006)+(2.021), (I-302)+(1.006)+(2.028), (I-302)+(1.006)+(2.030), (I-302)+(1.006)+(2.038), (I-302)+(1.006)+(3.003), (I-302)+(1.006)+(3.007), (I-302)+(1.006)+(3.012), (I-302)+(1.006)+(3.013), (I-302)+(1.006)+(3.016), (I-302)+(1.006)+(3.017), (I-302)+(1.006)+(3.020), (I-302)+(1.006)+(3.025), (I-302)+(1.006)+(3.026), (I-302)+(1.006)+(3.030), (I-302)+(1.006)+(3.031), (I-302)+(1.006)+(5.003), (I-302)+(1.006)+(5.004), (I-302)+(1.006)+(5.005), (I-302)+(1.006)+(5.008), (I-302)+(1.006)+(5.009), (I-302)+(1.006)+(5.011), (I-302)+(1.006)+(5.012), (I-302)+(1.006)+(5.013), (I-302)+(1.006)+(5.015), (I-302)+(1.006)+(5.018), (I-302)+(1.006)+(5.019), (I-302)+(1.006)+(6.002), (I-302)+(1.006)+(7.001), (I-302)+(1.006)+(7.005), (I-302)+(1.006)+(9.002), (I-302)+(1.006)+(9.004), (I-302)+(1.006)+(14.001), (I-302)+(1.006)+(14.002), (I-302)+(1.006)+(15.008), (I-302)+(1.006)+(15.011), (I-302)+(1.006)+(15.012), (I-302)+(1.006)+(15.016), (I-302)+(1.006)+(15.025), (I-302)+(1.006)+(15.027), (I-302)+(1.006)+(15.047), (I-302)+(1.006)+(15.063), (I-302)+(1.006)+(15.064), (I-302)+(1.006)+(16.001), (I-302)+(1.006)+(16.005), (I-302)+(1.006)+(17.001), (I-302)+(1.006)+(17.002), (I-302)+(1.006)+(17.003), (I-302)+(1.006)+(17.008), (I-302)+(1.006)+(18.001), (I-302)+(1.007)+(1.001), (I-302)+(1.007)+(1.002), (I-302)+(1.007)+(1.003), (I-302)+(1.007)+(1.004), (I-302)+(1.007)+(1.005), (I-302)+(1.007)+(1.006), (I-302)+(1.007)+(1.010), (I-302)+(1.007)+(1.011), (I-302)+(1.007)+(1.012), (I-302)+(1.007)+(1.013), (I-302)+(1.007)+(1.017), (I-302)+(1.007)+(1.018), (I-302)+(1.007)+(1.020), (I-302)+(1.007)+(1.021), (I-302)+(1.007)+(1.026), (I-302)+(1.007)+(1.027), (I-302)+(1.007)+(1.055), (I-302)+(1.007)+(1.059), (I-302)+(1.007)+(1.092), (I-302)+(1.007)+(2.001), (I-302)+(1.007)+(2.002), (I-302)+(1.007)+(2.003), (I-302)+(1.007)+(2.005), (I-302)+(1.007)+(2.007), (I-302)+(1.007)+(2.009), (I-302)+(1.007)+(2.010), (I-302)+(1.007)+(2.011), (I-302)+(1.007)+(2.012), (I-302)+(1.007)+(2.013), (I-302)+(1.007)+(2.014), (I-302)+(1.007)+(2.015), (I-302)+(1.007)+(2.016), (I-302)+(1.007)+(2.017), (I-302)+(1.007)+(2.018), (I-302)+(1.007)+(2.019), (I-302)+(1.007)+(2.021), (I-302)+(1.007)+(2.028), (I-302)+(1.007)+(2.030), (I-302)+(1.007)+(2.038), (I-302)+(1.007)+(3.003), (I-302)+(1.007)+(3.007), (I-302)+(1.007)+(3.012), (I-302)+(1.007)+(3.013), (I-302)+(1.007)+(3.016), (I-302)+(1.007)+(3.017), (I-302)+(1.007)+(3.020), (I-302)+(1.007)+(3.025), (I-302)+(1.007)+(3.026), (I-302)+(1.007)+(3.030), (I-302)+(1.007)+(3.031), (I-302)+(1.007)+(5.003), (I-302)+(1.007)+(5.004), (I-302)+(1.007)+(5.005), (I-302)+(1.007)+(5.008), (I-302)+(1.007)+(5.009), (I-302)+(1.007)+(5.011), (I-302)+(1.007)+(5.012), (I-302)+(1.007)+(5.013), (I-302)+(1.007)+(5.015), (I-302)+(1.007)+(5.018), (I-302)+(1.007)+(5.019), (I-302)+(1.007)+(6.002), (I-302)+(1.007)+(7.001), (I-302)+(1.007)+(7.005), (I-302)+(1.007)+(9.002), (I-302)+(1.007)+(9.004), (I-302)+(1.007)+(14.001), (I-302)+(1.007)+(14.002), (I-302)+(1.007)+(15.008), (I-302)+(1.007)+(15.011), (I-302)+(1.007)+(15.012), (I-302)+(1.007)+(15.016), (I-302)+(1.007)+(15.025), (I-302)+(1.007)+(15.027), (I-302)+(1.007)+(15.047), (I-302)+(1.007)+(15.063), (I-302)+(1.007)+(15.064), (I-302)+(1.007)+(16.001), (I-302)+(1.007)+(16.005), (I-302)+(1.007)+(17.001), (I-302)+(1.007)+(17.002), (I-302)+(1.007)+(17.003), (I-302)+(1.007)+(17.008), (I-302)+(1.007)+(18.001), (I-302)+(1.010)+(1.001), (I-302)+(1.010)+(1.002), (I-302)+(1.010)+(1.003), (I-302)+(1.010)+(1.004), (I-302)+(1.010)+(1.005), (I-302)+(1.010)+(1.006), (I-302)+(1.010)+(1.007), (I-302)+(1.010)+(1.011), (I-302)+(1.010)+(1.012), (I-302)+(1.010)+(1.013), (I-302)+(1.010)+(1.017), (I-302)+(1.010)+(1.018), (I-302)+(1.010)+(1.020), (I-302)+(1.010)+(1.021), (I-302)+(1.010)+(1.026), (I-302)+(1.010)+(1.027), (I-302)+(1.010)+(1.055), (I-302)+(1.010)+(1.059), (I-302)+(1.010)+(1.092), (I-302)+(1.010)+(2.001), (I-302)+(1.010)+(2.002), (I-302)+(1.010)+(2.003), (I-302)+(1.010)+(2.005), (I-302)+(1.010)+(2.007), (I-302)+(1.010)+(2.009), (I-302)+(1.010)+(2.010), (I-302)+(1.010)+(2.011), (I-302)+(1.010)+(2.012), (I-302)+(1.010)+(2.013), (I-302)+(1.010)+(2.014), (I-302)+(1.010)+(2.015), (I-302)+(1.010)+(2.016), (I-302)+(1.010)+(2.017), (I-302)+(1.010)+(2.018), (I-302)+(1.010)+(2.019), (I-302)+(1.010)+(2.021), (I-302)+(1.010)+(2.028), (I-302)+(1.010)+(2.030), (I-302)+(1.010)+(2.038), (I-302)+(1.010)+(3.003), (I-302)+(1.010)+(3.007), (I-302)+(1.010)+(3.012), (I-302)+(1.010)+(3.013), (I-302)+(1.010)+(3.016), (I-302)+(1.010)+(3.017), (I-302)+(1.010)+(3.020), (I-302)+(1.010)+(3.025), (I-302)+(1.010)+(3.026), (I-302)+(1.010)+(3.030), (I-302)+(1.010)+(3.031), (I-302)+(1.010)+(5.003), (I-302)+(1.010)+(5.004), (I-302)+(1.010)+(5.005), (I-302)+(1.010)+(5.008), (I-302)+(1.010)+(5.009), (I-302)+(1.010)+(5.011), (I-302)+(1.010)+(5.012), (I-302)+(1.010)+(5.013), (I-302)+(1.010)+(5.015), (I-302)+(1.010)+(5.018), (I-302)+(1.010)+(5.019), (I-302)+(1.010)+(6.002), (I-302)+(1.010)+(7.001), (I-302)+(1.010)+(7.005), (I-302)+(1.010)+(9.002), (I-302)+(1.010)+(9.004), (I-302)+(1.010)+(14.001), (I-302)+(1.010)+(14.002), (I-302)+(1.010)+(15.008), (I-302)+(1.010)+(15.011), (I-302)+(1.010)+(15.012), (I-302)+(1.010)+(15.016), (I-302)+(1.010)+(15.025), (I-302)+(1.010)+(15.027), (I-302)+(1.010)+(15.047), (I-302)+(1.010)+(15.063), (I-302)+(1.010)+(15.064), (I-302)+(1.010)+(16.001), (I-302)+(1.010)+(16.005), (I-302)+(1.010)+(17.001), (I-302)+(1.010)+(17.002), (I-302)+(1.010)+(17.003), (I-302)+(1.010)+(17.008), (I-302)+(1.010)+(18.001), (I-302)+(1.011)+(1.001), (I-302)+(1.011)+(1.002), (I-302)+(1.011)+(1.003), (I-302)+(1.011)+(1.004), (I-302)+(1.011)+(1.005), (I-302)+(1.011)+(1.006), (I-302)+(1.011)+(1.007), (I-302)+(1.011)+(1.010), (I-302)+(1.011)+(1.012), (I-302)+(1.011)+(1.013), (I-302)+(1.011)+(1.017), (I-302)+(1.011)+(1.018), (I-302)+(1.011)+(1.020), (I-302)+(1.011)+(1.021), (I-302)+(1.011)+(1.026), (I-302)+(1.011)+(1.027), (I-302)+(1.011)+(1.055), (I-302)+(1.011)+(1.059), (I-302)+(1.011)+(1.092), (I-302)+(1.011)+(2.001), (I-302)+(1.011)+(2.002), (I-302)+(1.011)+(2.003), (I-302)+(1.011)+(2.005), (I-302)+(1.011)+(2.007), (I-302)+(1.011)+(2.009), (I-302)+(1.011)+(2.010), (I-302)+(1.011)+(2.011), (I-302)+(1.011)+(2.012), (I-302)+(1.011)+(2.013), (I-302)+(1.011)+(2.014), (I-302)+(1.011)+(2.015), (I-302)+(1.011)+(2.016), (I-302)+(1.011)+(2.017), (I-302)+(1.011)+(2.018), (I-302)+(1.011)+(2.019), (I-302)+(1.011)+(2.021), (I-302)+(1.011)+(2.028), (I-302)+(1.011)+(2.030), (I-302)+(1.011)+(2.038), (I-302)+(1.011)+(3.003), (I-302)+(1.011)+(3.007), (I-302)+(1.011)+(3.012), (I-302)+(1.011)+(3.013), (I-302)+(1.011)+(3.016), (I-302)+(1.011)+(3.017), (I-302)+(1.011)+(3.020), (I-302)+(1.011)+(3.025), (I-302)+(1.011)+(3.026), (I-302)+(1.011)+(3.030), (I-302)+(1.011)+(3.031), (I-302)+(1.011)+(5.003), (I-302)+(1.011)+(5.004), (I-302)+(1.011)+(5.005), (I-302)+(1.011)+(5.008), (I-302)+(1.011)+(5.009), (I-302)+(1.011)+(5.011), (I-302)+(1.011)+(5.012), (I-302)+(1.011)+(5.013), (I-302)+(1.011)+(5.015), (I-302)+(1.011)+(5.018), (I-302)+(1.011)+(5.019), (I-302)+(1.011)+(6.002), (I-302)+(1.011)+(7.001), (I-302)+(1.011)+(7.005), (I-302)+(1.011)+(9.002), (I-302)+(1.011)+(9.004), (I-302)+(1.011)+(14.001), (I-302)+(1.011)+(14.002), (I-302)+(1.011)+(15.008), (I-302)+(1.011)+(15.011), (I-302)+(1.011)+(15.012), (I-302)+(1.011)+(15.016), (I-302)+(1.011)+(15.025), (I-302)+(1.011)+(15.027), (I-302)+(1.011)+(15.047), (I-302)+(1.011)+(15.063), (I-302)+(1.011)+(15.064), (I-302)+(1.011)+(16.001), (I-302)+(1.011)+(16.005), (I-302)+(1.011)+(17.001), (I-302)+(1.011)+(17.002), (I-302)+(1.011)+(17.003), (I-302)+(1.011)+(17.008), (I-302)+(1.011)+(18.001), (I-302)+(1.012)+(1.001), (I-302)+(1.012)+(1.002), (I-302)+(1.012)+(1.003), (I-302)+(1.012)+(1.004), (I-302)+(1.012)+(1.005), (I-302)+(1.012)+(1.006), (I-302)+(1.012)+(1.007), (I-302)+(1.012)+(1.010), (I-302)+(1.012)+(1.011), (I-302)+(1.012)+(1.013), (I-302)+(1.012)+(1.017), (I-302)+(1.012)+(1.018), (I-302)+(1.012)+(1.020), (I-302)+(1.012)+(1.021), (I-302)+(1.012)+(1.026), (I-302)+(1.012)+(1.027), (I-302)+(1.012)+(1.055), (I-302)+(1.012)+(1.059), (I-302)+(1.012)+(1.092), (I-302)+(1.012)+(2.001), (I-302)+(1.012)+(2.002), (I-302)+(1.012)+(2.003), (I-302)+(1.012)+(2.005), (I-302)+(1.012)+(2.007), (I-302)+(1.012)+(2.009), (I-302)+(1.012)+(2.010), (I-302)+(1.012)+(2.011), (I-302)+(1.012)+(2.012), (I-302)+(1.012)+(2.013), (I-302)+(1.012)+(2.014), (I-302)+(1.012)+(2.015), (I-302)+(1.012)+(2.016), (I-302)+(1.012)+(2.017), (I-302)+(1.012)+(2.018), (I-302)+(1.012)+(2.019), (I-302)+(1.012)+(2.021), (I-302)+(1.012)+(2.028), (I-302)+(1.012)+(2.030), (I-302)+(1.012)+(2.038), (I-302)+(1.012)+(3.003), (I-302)+(1.012)+(3.007), (I-302)+(1.012)+(3.012), (I-302)+(1.012)+(3.013), (I-302)+(1.012)+(3.016), (I-302)+(1.012)+(3.017), (I-302)+(1.012)+(3.020), (I-302)+(1.012)+(3.025), (I-302)+(1.012)+(3.026), (I-302)+(1.012)+(3.030), (I-302)+(1.012)+(3.031), (I-302)+(1.012)+(5.003), (I-302)+(1.012)+(5.004), (I-302)+(1.012)+(5.005), (I-302)+(1.012)+(5.008), (I-302)+(1.012)+(5.009), (I-302)+(1.012)+(5.011), (I-302)+(1.012)+(5.012), (I-302)+(1.012)+(5.013), (I-302)+(1.012)+(5.015), (I-302)+(1.012)+(5.018), (I-302)+(1.012)+(5.019), (I-302)+(1.012)+(6.002), (I-302)+(1.012)+(7.001), (I-302)+(1.012)+(7.005), (I-302)+(1.012)+(9.002), (I-302)+(1.012)+(9.004), (I-302)+(1.012)+(14.001), (I-302)+(1.012)+(14.002), (I-302)+(1.012)+(15.008), (I-302)+(1.012)+(15.011), (I-302)+(1.012)+(15.012), (I-302)+(1.012)+(15.016), (I-302)+(1.012)+(15.025), (I-302)+(1.012)+(15.027), (I-302)+(1.012)+(15.047), (I-302)+(1.012)+(15.063), (I-302)+(1.012)+(15.064), (I-302)+(1.012)+(16.001), (I-302)+(1.012)+(16.005), (I-302)+(1.012)+(17.001), (I-302)+(1.012)+(17.002), (I-302)+(1.012)+(17.003), (I-302)+(1.012)+(17.008), (I-302)+(1.012)+(18.001), (I-302)+(1.013)+(1.001), (I-302)+(1.013)+(1.002), (I-302)+(1.013)+(1.003), (I-302)+(1.013)+(1.004), (I-302)+(1.013)+(1.005), (I-302)+(1.013)+(1.006), (I-302)+(1.013)+(1.007), (I-302)+(1.013)+(1.010), (I-302)+(1.013)+(1.011), (I-302)+(1.013)+(1.012), (I-302)+(1.013)+(1.017), (I-302)+(1.013)+(1.018), (I-302)+(1.013)+(1.020), (I-302)+(1.013)+(1.021), (I-302)+(1.013)+(1.026), (I-302)+(1.013)+(1.027), (I-302)+(1.013)+(1.055), (I-302)+(1.013)+(1.059), (I-302)+(1.013)+(1.092), (I-302)+(1.013)+(2.001), (I-302)+(1.013)+(2.002), (I-302)+(1.013)+(2.003), (I-302)+(1.013)+(2.005), (I-302)+(1.013)+(2.007), (I-302)+(1.013)+(2.009), (I-302)+(1.013)+(2.010), (I-302)+(1.013)+(2.011), (I-302)+(1.013)+(2.012), (I-302)+(1.013)+(2.013), (I-302)+(1.013)+(2.014), (I-302)+(1.013)+(2.015), (I-302)+(1.013)+(2.016), (I-302)+(1.013)+(2.017), (I-302)+(1.013)+(2.018), (I-302)+(1.013)+(2.019), (I-302)+(1.013)+(2.021), (I-302)+(1.013)+(2.028), (I-302)+(1.013)+(2.030), (I-302)+(1.013)+(2.038), (I-302)+(1.013)+(3.003), (I-302)+(1.013)+(3.007), (I-302)+(1.013)+(3.012), (I-302)+(1.013)+(3.013), (I-302)+(1.013)+(3.016), (I-302)+(1.013)+(3.017), (I-302)+(1.013)+(3.020), (I-302)+(1.013)+(3.025), (I-302)+(1.013)+(3.026), (I-302)+(1.013)+(3.030), (I-302)+(1.013)+(3.031), (I-302)+(1.013)+(5.003), (I-302)+(1.013)+(5.004), (I-302)+(1.013)+(5.005), (I-302)+(1.013)+(5.008), (I-302)+(1.013)+(5.009), (I-302)+(1.013)+(5.011), (I-302)+(1.013)+(5.012), (I-302)+(1.013)+(5.013), (I-302)+(1.013)+(5.015), (I-302)+(1.013)+(5.018), (I-302)+(1.013)+(5.019), (I-302)+(1.013)+(6.002), (I-302)+(1.013)+(7.001), (I-302)+(1.013)+(7.005), (I-302)+(1.013)+(9.002), (I-302)+(1.013)+(9.004), (I-302)+(1.013)+(14.001), (I-302)+(1.013)+(14.002), (I-302)+(1.013)+(15.008), (I-302)+(1.013)+(15.011), (I-302)+(1.013)+(15.012), (I-302)+(1.013)+(15.016), (I-302)+(1.013)+(15.025), (I-302)+(1.013)+(15.027), (I-302)+(1.013)+(15.047), (I-302)+(1.013)+(15.063), (I-302)+(1.013)+(15.064), (I-302)+(1.013)+(16.001), (I-302)+(1.013)+(16.005), (I-302)+(1.013)+(17.001), (I-302)+(1.013)+(17.002), (I-302)+(1.013)+(17.003), (I-302)+(1.013)+(17.008), (I-302)+(1.013)+(18.001), (I-302)+(1.017)+(1.001), (I-302)+(1.017)+(1.002), (I-302)+(1.017)+(1.003), (I-302)+(1.017)+(1.004), (I-302)+(1.017)+(1.005), (I-302)+(1.017)+(1.006), (I-302)+(1.017)+(1.007), (I-302)+(1.017)+(1.010), (I-302)+(1.017)+(1.011), (I-302)+(1.017)+(1.012), (I-302)+(1.017)+(1.013), (I-302)+(1.017)+(1.018), (I-302)+(1.017)+(1.020), (I-302)+(1.017)+(1.021), (I-302)+(1.017)+(1.026), (I-302)+(1.017)+(1.027), (I-302)+(1.017)+(1.055), (I-302)+(1.017)+(1.059), (I-302)+(1.017)+(1.092), (I-302)+(1.017)+(2.001), (I-302)+(1.017)+(2.002), (I-302)+(1.017)+(2.003), (I-302)+(1.017)+(2.005), (I-302)+(1.017)+(2.007), (I-302)+(1.017)+(2.009), (I-302)+(1.017)+(2.010), (I-302)+(1.017)+(2.011), (I-302)+(1.017)+(2.012), (I-302)+(1.017)+(2.013), (I-302)+(1.017)+(2.014), (I-302)+(1.017)+(2.015), (I-302)+(1.017)+(2.016), (I-302)+(1.017)+(2.017), (I-302)+(1.017)+(2.018), (I-302)+(1.017)+(2.019), (I-302)+(1.017)+(2.021), (I-302)+(1.017)+(2.028), (I-302)+(1.017)+(2.030), (I-302)+(1.017)+(2.038), (I-302)+(1.017)+(3.003), (I-302)+(1.017)+(3.007), (I-302)+(1.017)+(3.012), (I-302)+(1.017)+(3.013), (I-302)+(1.017)+(3.016), (I-302)+(1.017)+(3.017), (I-302)+(1.017)+(3.020), (I-302)+(1.017)+(3.025), (I-302)+(1.017)+(3.026), (I-302)+(1.017)+(3.030), (I-302)+(1.017)+(3.031), (I-302)+(1.017)+(5.003), (I-302)+(1.017)+(5.004), (I-302)+(1.017)+(5.005), (I-302)+(1.017)+(5.008), (I-302)+(1.017)+(5.009), (I-302)+(1.017)+(5.011), (I-302)+(1.017)+(5.012), (I-302)+(1.017)+(5.013), (I-302)+(1.017)+(5.015), (I-302)+(1.017)+(5.018), (I-302)+(1.017)+(5.019), (I-302)+(1.017)+(6.002), (I-302)+(1.017)+(7.001), (I-302)+(1.017)+(7.005), (I-302)+(1.017)+(9.002), (I-302)+(1.017)+(9.004), (I-302)+(1.017)+(14.001), (I-302)+(1.017)+(14.002), (I-302)+(1.017)+(15.008), (I-302)+(1.017)+(15.011), (I-302)+(1.017)+(15.012), (I-302)+(1.017)+(15.016), (I-302)+(1.017)+(15.025), (I-302)+(1.017)+(15.027), (I-302)+(1.017)+(15.047), (I-302)+(1.017)+(15.063), (I-302)+(1.017)+(15.064), (I-302)+(1.017)+(16.001), (I-302)+(1.017)+(16.005), (I-302)+(1.017)+(17.001), (I-302)+(1.017)+(17.002), (I-302)+(1.017)+(17.003), (I-302)+(1.017)+(17.008), (I-302)+(1.017)+(18.001), (I-302)+(1.018)+(1.001), (I-302)+(1.018)+(1.002), (I-302)+(1.018)+(1.003), (I-302)+(1.018)+(1.004), (I-302)+(1.018)+(1.005), (I-302)+(1.018)+(1.006), (I-302)+(1.018)+(1.007), (I-302)+(1.018)+(1.010), (I-302)+(1.018)+(1.011), (I-302)+(1.018)+(1.012), (I-302)+(1.018)+(1.013), (I-302)+(1.018)+(1.017), (I-302)+(1.018)+(1.020), (I-302)+(1.018)+(1.021), (I-302)+(1.018)+(1.026), (I-302)+(1.018)+(1.027), (I-302)+(1.018)+(1.055), (I-302)+(1.018)+(1.059), (I-302)+(1.018)+(1.092), (I-302)+(1.018)+(2.001), (I-302)+(1.018)+(2.002), (I-302)+(1.018)+(2.003), (I-302)+(1.018)+(2.005), (I-302)+(1.018)+(2.007), (I-302)+(1.018)+(2.009), (I-302)+(1.018)+(2.010), (I-302)+(1.018)+(2.011), (I-302)+(1.018)+(2.012), (I-302)+(1.018)+(2.013), (I-302)+(1.018)+(2.014), (I-302)+(1.018)+(2.015), (I-302)+(1.018)+(2.016), (I-302)+(1.018)+(2.017), (I-302)+(1.018)+(2.018), (I-302)+(1.018)+(2.019), (I-302)+(1.018)+(2.021), (I-302)+(1.018)+(2.028), (I-302)+(1.018)+(2.030), (I-302)+(1.018)+(2.038), (I-302)+(1.018)+(3.003), (I-302)+(1.018)+(3.007), (I-302)+(1.018)+(3.012), (I-302)+(1.018)+(3.013), (I-302)+(1.018)+(3.016), (I-302)+(1.018)+(3.017), (I-302)+(1.018)+(3.020), (I-302)+(1.018)+(3.025), (I-302)+(1.018)+(3.026), (I-302)+(1.018)+(3.030), (I-302)+(1.018)+(3.031), (I-302)+(1.018)+(5.003), (I-302)+(1.018)+(5.004), (I-302)+(1.018)+(5.005), (I-302)+(1.018)+(5.008), (I-302)+(1.018)+(5.009), (I-302)+(1.018)+(5.011), (I-302)+(1.018)+(5.012), (I-302)+(1.018)+(5.013), (I-302)+(1.018)+(5.015), (I-302)+(1.018)+(5.018), (I-302)+(1.018)+(5.019), (I-302)+(1.018)+(6.002), (I-302)+(1.018)+(7.001), (I-302)+(1.018)+(7.005), (I-302)+(1.018)+(9.002), (I-302)+(1.018)+(9.004), (I-302)+(1.018)+(14.001), (I-302)+(1.018)+(14.002), (I-302)+(1.018)+(15.008), (I-302)+(1.018)+(15.011), (I-302)+(1.018)+(15.012), (I-302)+(1.018)+(15.016), (I-302)+(1.018)+(15.025), (I-302)+(1.018)+(15.027), (I-302)+(1.018)+(15.047), (I-302)+(1.018)+(15.063), (I-302)+(1.018)+(15.064), (I-302)+(1.018)+(16.001), (I-302)+(1.018)+(16.005), (I-302)+(1.018)+(17.001), (I-302)+(1.018)+(17.002), (I-302)+(1.018)+(17.003), (I-302)+(1.018)+(17.008), (I-302)+(1.018)+(18.001), (I-302)+(1.020)+(1.001), (I-302)+(1.020)+(1.002), (I-302)+(1.020)+(1.003), (I-302)+(1.020)+(1.004), (I-302)+(1.020)+(1.005), (I-302)+(1.020)+(1.006), (I-302)+(1.020)+(1.007), (I-302)+(1.020)+(1.010), (I-302)+(1.020)+(1.011), (I-302)+(1.020)+(1.012), (I-302)+(1.020)+(1.013), (I-302)+(1.020)+(1.017), (I-302)+(1.020)+(1.018), (I-302)+(1.020)+(1.021), (I-302)+(1.020)+(1.026), (I-302)+(1.020)+(1.027), (I-302)+(1.020)+(1.055), (I-302)+(1.020)+(1.059), (I-302)+(1.020)+(1.092), (I-302)+(1.020)+(2.001), (I-302)+(1.020)+(2.002), (I-302)+(1.020)+(2.003), (I-302)+(1.020)+(2.005), (I-302)+(1.020)+(2.007), (I-302)+(1.020)+(2.009), (I-302)+(1.020)+(2.010), (I-302)+(1.020)+(2.011), (I-302)+(1.020)+(2.012), (I-302)+(1.020)+(2.013), (I-302)+(1.020)+(2.014), (I-302)+(1.020)+(2.015), (I-302)+(1.020)+(2.016), (I-302)+(1.020)+(2.017), (I-302)+(1.020)+(2.018), (I-302)+(1.020)+(2.019), (I-302)+(1.020)+(2.021), (I-302)+(1.020)+(2.028), (I-302)+(1.020)+(2.030), (I-302)+(1.020)+(2.038), (I-302)+(1.020)+(3.003), (I-302)+(1.020)+(3.007), (I-302)+(1.020)+(3.012), (I-302)+(1.020)+(3.013), (I-302)+(1.020)+(3.016), (I-302)+(1.020)+(3.017), (I-302)+(1.020)+(3.020), (I-302)+(1.020)+(3.025), (I-302)+(1.020)+(3.026), (I-302)+(1.020)+(3.030), (I-302)+(1.020)+(3.031), (I-302)+(1.020)+(5.003), (I-302)+(1.020)+(5.004), (I-302)+(1.020)+(5.005), (I-302)+(1.020)+(5.008), (I-302)+(1.020)+(5.009), (I-302)+(1.020)+(5.011), (I-302)+(1.020)+(5.012), (I-302)+(1.020)+(5.013), (I-302)+(1.020)+(5.015), (I-302)+(1.020)+(5.018), (I-302)+(1.020)+(5.019), (I-302)+(1.020)+(6.002), (I-302)+(1.020)+(7.001), (I-302)+(1.020)+(7.005), (I-302)+(1.020)+(9.002), (I-302)+(1.020)+(9.004), (I-302)+(1.020)+(14.001), (I-302)+(1.020)+(14.002), (I-302)+(1.020)+(15.008), (I-302)+(1.020)+(15.011), (I-302)+(1.020)+(15.012), (I-302)+(1.020)+(15.016), (I-302)+(1.020)+(15.025), (I-302)+(1.020)+(15.027), (I-302)+(1.020)+(15.047), (I-302)+(1.020)+(15.063), (I-302)+(1.020)+(15.064), (I-302)+(1.020)+(16.001), (I-302)+(1.020)+(16.005), (I-302)+(1.020)+(17.001), (I-302)+(1.020)+(17.002), (I-302)+(1.020)+(17.003), (I-302)+(1.020)+(17.008), (I-302)+(1.020)+(18.001), (I-302)+(1.021)+(1.001), (I-302)+(1.021)+(1.002), (I-302)+(1.021)+(1.003), (I-302)+(1.021)+(1.004), (I-302)+(1.021)+(1.005), (I-302)+(1.021)+(1.006), (I-302)+(1.021)+(1.007), (I-302)+(1.021)+(1.010), (I-302)+(1.021)+(1.011), (I-302)+(1.021)+(1.012), (I-302)+(1.021)+(1.013), (I-302)+(1.021)+(1.017), (I-302)+(1.021)+(1.018), (I-302)+(1.021)+(1.020), (I-302)+(1.021)+(1.026), (I-302)+(1.021)+(1.027), (I-302)+(1.021)+(1.055), (I-302)+(1.021)+(1.059), (I-302)+(1.021)+(1.092), (I-302)+(1.021)+(2.001), (I-302)+(1.021)+(2.002), (I-302)+(1.021)+(2.003), (I-302)+(1.021)+(2.005), (I-302)+(1.021)+(2.007), (I-302)+(1.021)+(2.009), (I-302)+(1.021)+(2.010), (I-302)+(1.021)+(2.011), (I-302)+(1.021)+(2.012), (I-302)+(1.021)+(2.013), (I-302)+(1.021)+(2.014), (I-302)+(1.021)+(2.015), (I-302)+(1.021)+(2.016), (I-302)+(1.021)+(2.017), (I-302)+(1.021)+(2.018), (I-302)+(1.021)+(2.019), (I-302)+(1.021)+(2.021), (I-302)+(1.021)+(2.028), (I-302)+(1.021)+(2.030), (I-302)+(1.021)+(2.038), (I-302)+(1.021)+(3.003), (I-302)+(1.021)+(3.007), (I-302)+(1.021)+(3.012), (I-302)+(1.021)+(3.013), (I-302)+(1.021)+(3.016), (I-302)+(1.021)+(3.017), (I-302)+(1.021)+(3.020), (I-302)+(1.021)+(3.025), (I-302)+(1.021)+(3.026), (I-302)+(1.021)+(3.030), (I-302)+(1.021)+(3.031), (I-302)+(1.021)+(5.003), (I-302)+(1.021)+(5.004), (I-302)+(1.021)+(5.005), (I-302)+(1.021)+(5.008), (I-302)+(1.021)+(5.009), (I-302)+(1.021)+(5.011), (I-302)+(1.021)+(5.012), (I-302)+(1.021)+(5.013), (I-302)+(1.021)+(5.015), (I-302)+(1.021)+(5.018), (I-302)+(1.021)+(5.019), (I-302)+(1.021)+(6.002), (I-302)+(1.021)+(7.001), (I-302)+(1.021)+(7.005), (I-302)+(1.021)+(9.002), (I-302)+(1.021)+(9.004), (I-302)+(1.021)+(14.001), (I-302)+(1.021)+(14.002), (I-302)+(1.021)+(15.008), (I-302)+(1.021)+(15.011), (I-302)+(1.021)+(15.012), (I-302)+(1.021)+(15.016), (I-302)+(1.021)+(15.025), (I-302)+(1.021)+(15.027), (I-302)+(1.021)+(15.047), (I-302)+(1.021)+(15.063), (I-302)+(1.021)+(15.064), (I-302)+(1.021)+(16.001), (I-302)+(1.021)+(16.005), (I-302)+(1.021)+(17.001), (I-302)+(1.021)+(17.002), (I-302)+(1.021)+(17.003), (I-302)+(1.021)+(17.008), (I-302)+(1.021)+(18.001), (I-302)+(1.026)+(1.001), (I-302)+(1.026)+(1.002), (I-302)+(1.026)+(1.003), (I-302)+(1.026)+(1.004), (I-302)+(1.026)+(1.005), (I-302)+(1.026)+(1.006), (I-302)+(1.026)+(1.007), (I-302)+(1.026)+(1.010), (I-302)+(1.026)+(1.011), (I-302)+(1.026)+(1.012), (I-302)+(1.026)+(1.013), (I-302)+(1.026)+(1.017), (I-302)+(1.026)+(1.018), (I-302)+(1.026)+(1.020), (I-302)+(1.026)+(1.021), (I-302)+(1.026)+(1.027), (I-302)+(1.026)+(1.055), (I-302)+(1.026)+(1.059), (I-302)+(1.026)+(1.092), (I-302)+(1.026)+(2.001), (I-302)+(1.026)+(2.002), (I-302)+(1.026)+(2.003), (I-302)+(1.026)+(2.005), (I-302)+(1.026)+(2.007), (I-302)+(1.026)+(2.009), (I-302)+(1.026)+(2.010), (I-302)+(1.026)+(2.011), (I-302)+(1.026)+(2.012), (I-302)+(1.026)+(2.013), (I-302)+(1.026)+(2.014), (I-302)+(1.026)+(2.015), (I-302)+(1.026)+(2.016), (I-302)+(1.026)+(2.017), (I-302)+(1.026)+(2.018), (I-302)+(1.026)+(2.019), (I-302)+(1.026)+(2.021), (I-302)+(1.026)+(2.028), (I-302)+(1.026)+(2.030), (I-302)+(1.026)+(2.038), (I-302)+(1.026)+(3.003), (I-302)+(1.026)+(3.007), (I-302)+(1.026)+(3.012), (I-302)+(1.026)+(3.013), (I-302)+(1.026)+(3.016), (I-302)+(1.026)+(3.017), (I-302)+(1.026)+(3.020), (I-302)+(1.026)+(3.025), (I-302)+(1.026)+(3.026), (I-302)+(1.026)+(3.030), (I-302)+(1.026)+(3.031), (I-302)+(1.026)+(5.003), (I-302)+(1.026)+(5.004), (I-302)+(1.026)+(5.005), (I-302)+(1.026)+(5.008), (I-302)+(1.026)+(5.009), (I-302)+(1.026)+(5.011), (I-302)+(1.026)+(5.012), (I-302)+(1.026)+(5.013), (I-302)+(1.026)+(5.015), (I-302)+(1.026)+(5.018), (I-302)+(1.026)+(5.019), (I-302)+(1.026)+(6.002), (I-302)+(1.026)+(7.001), (I-302)+(1.026)+(7.005), (I-302)+(1.026)+(9.002), (I-302)+(1.026)+(9.004), (I-302)+(1.026)+(14.001), (I-302)+(1.026)+(14.002), (I-302)+(1.026)+(15.008), (I-302)+(1.026)+(15.011), (I-302)+(1.026)+(15.012), (I-302)+(1.026)+(15.016), (I-302)+(1.026)+(15.025), (I-302)+(1.026)+(15.027), (I-302)+(1.026)+(15.047), (I-302)+(1.026)+(15.063), (I-302)+(1.026)+(15.064), (I-302)+(1.026)+(16.001), (I-302)+(1.026)+(16.005), (I-302)+(1.026)+(17.001), (I-302)+(1.026)+(17.002), (I-302)+(1.026)+(17.003), (I-302)+(1.026)+(17.008), (I-302)+(1.026)+(18.001), (I-302)+(1.027)+(1.001), (I-302)+(1.027)+(1.002), (I-302)+(1.027)+(1.003), (I-302)+(1.027)+(1.004), (I-302)+(1.027)+(1.005), (I-302)+(1.027)+(1.006), (I-302)+(1.027)+(1.007), (I-302)+(1.027)+(1.010), (I-302)+(1.027)+(1.011), (I-302)+(1.027)+(1.012), (I-302)+(1.027)+(1.013), (I-302)+(1.027)+(1.017), (I-302)+(1.027)+(1.018), (I-302)+(1.027)+(1.020), (I-302)+(1.027)+(1.021), (I-302)+(1.027)+(1.026), (I-302)+(1.027)+(1.055), (I-302)+(1.027)+(1.059), (I-302)+(1.027)+(1.092), (I-302)+(1.027)+(2.001), (I-302)+(1.027)+(2.002), (I-302)+(1.027)+(2.003), (I-302)+(1.027)+(2.005), (I-302)+(1.027)+(2.007), (I-302)+(1.027)+(2.009), (I-302)+(1.027)+(2.010), (I-302)+(1.027)+(2.011), (I-302)+(1.027)+(2.012), (I-302)+(1.027)+(2.013), (I-302)+(1.027)+(2.014), (I-302)+(1.027)+(2.015), (I-302)+(1.027)+(2.016), (I-302)+(1.027)+(2.017), (I-302)+(1.027)+(2.018), (I-302)+(1.027)+(2.019), (I-302)+(1.027)+(2.021), (I-302)+(1.027)+(2.028), (I-302)+(1.027)+(2.030), (I-302)+(1.027)+(2.038), (I-302)+(1.027)+(3.003), (I-302)+(1.027)+(3.007), (I-302)+(1.027)+(3.012), (I-302)+(1.027)+(3.013), (I-302)+(1.027)+(3.016), (I-302)+(1.027)+(3.017), (I-302)+(1.027)+(3.020), (I-302)+(1.027)+(3.025), (I-302)+(1.027)+(3.026), (I-302)+(1.027)+(3.030), (I-302)+(1.027)+(3.031), (I-302)+(1.027)+(5.003), (I-302)+(1.027)+(5.004), (I-302)+(1.027)+(5.005), (I-302)+(1.027)+(5.008), (I-302)+(1.027)+(5.009), (I-302)+(1.027)+(5.011), (I-302)+(1.027)+(5.012), (I-302)+(1.027)+(5.013), (I-302)+(1.027)+(5.015), (I-302)+(1.027)+(5.018), (I-302)+(1.027)+(5.019), (I-302)+(1.027)+(6.002), (I-302)+(1.027)+(7.001), (I-302)+(1.027)+(7.005), (I-302)+(1.027)+(9.002), (I-302)+(1.027)+(9.004), (I-302)+(1.027)+(14.001), (I-302)+(1.027)+(14.002), (I-302)+(1.027)+(15.008), (I-302)+(1.027)+(15.011), (I-302)+(1.027)+(15.012), (I-302)+(1.027)+(15.016), (I-302)+(1.027)+(15.025), (I-302)+(1.027)+(15.027), (I-302)+(1.027)+(15.047), (I-302)+(1.027)+(15.063), (I-302)+(1.027)+(15.064), (I-302)+(1.027)+(16.001), (I-302)+(1.027)+(16.005), (I-302)+(1.027)+(17.001), (I-302)+(1.027)+(17.002), (I-302)+(1.027)+(17.003), (I-302)+(1.027)+(17.008), (I-302)+(1.027)+(18.001), (I-302)+(1.055)+(1.001), (I-302)+(1.055)+(1.002), (I-302)+(1.055)+(1.003), (I-302)+(1.055)+(1.004), (I-302)+(1.055)+(1.005), (I-302)+(1.055)+(1.006), (I-302)+(1.055)+(1.007), (I-302)+(1.055)+(1.010), (I-302)+(1.055)+(1.011), (I-302)+(1.055)+(1.012), (I-302)+(1.055)+(1.013), (I-302)+(1.055)+(1.017), (I-302)+(1.055)+(1.018), (I-302)+(1.055)+(1.020), (I-302)+(1.055)+(1.021), (I-302)+(1.055)+(1.026), (I-302)+(1.055)+(1.027), (I-302)+(1.055)+(1.059), (I-302)+(1.055)+(1.092), (I-302)+(1.055)+(2.001), (I-302)+(1.055)+(2.002), (I-302)+(1.055)+(2.003), (I-302)+(1.055)+(2.005), (I-302)+(1.055)+(2.007), (I-302)+(1.055)+(2.009), (I-302)+(1.055)+(2.010), (I-302)+(1.055)+(2.011), (I-302)+(1.055)+(2.012), (I-302)+(1.055)+(2.013), (I-302)+(1.055)+(2.014), (I-302)+(1.055)+(2.015), (I-302)+(1.055)+(2.016), (I-302)+(1.055)+(2.017), (I-302)+(1.055)+(2.018), (I-302)+(1.055)+(2.019), (I-302)+(1.055)+(2.021), (I-302)+(1.055)+(2.028), (I-302)+(1.055)+(2.030), (I-302)+(1.055)+(2.038), (I-302)+(1.055)+(3.003), (I-302)+(1.055)+(3.007), (I-302)+(1.055)+(3.012), (I-302)+(1.055)+(3.013), (I-302)+(1.055)+(3.016), (I-302)+(1.055)+(3.017), (I-302)+(1.055)+(3.020), (I-302)+(1.055)+(3.025), (I-302)+(1.055)+(3.026), (I-302)+(1.055)+(3.030), (I-302)+(1.055)+(3.031), (I-302)+(1.055)+(5.003), (I-302)+(1.055)+(5.004), (I-302)+(1.055)+(5.005), (I-302)+(1.055)+(5.008), (I-302)+(1.055)+(5.009), (I-302)+(1.055)+(5.011), (I-302)+(1.055)+(5.012), (I-302)+(1.055)+(5.013), (I-302)+(1.055)+(5.015), (I-302)+(1.055)+(5.018), (I-302)+(1.055)+(5.019), (I-302)+(1.055)+(6.002), (I-302)+(1.055)+(7.001), (I-302)+(1.055)+(7.005), (I-302)+(1.055)+(9.002), (I-302)+(1.055)+(9.004), (I-302)+(1.055)+(14.001), (I-302)+(1.055)+(14.002), (I-302)+(1.055)+(15.008), (I-302)+(1.055)+(15.011), (I-302)+(1.055)+(15.012), (I-302)+(1.055)+(15.016), (I-302)+(1.055)+(15.025), (I-302)+(1.055)+(15.027), (I-302)+(1.055)+(15.047), (I-302)+(1.055)+(15.063), (I-302)+(1.055)+(15.064), (I-302)+(1.055)+(16.001), (I-302)+(1.055)+(16.005), (I-302)+(1.055)+(17.001), (I-302)+(1.055)+(17.002), (I-302)+(1.055)+(17.003), (I-302)+(1.055)+(17.008), (I-302)+(1.055)+(18.001), (I-302)+(1.059)+(1.001), (I-302)+(1.059)+(1.002), (I-302)+(1.059)+(1.003), (I-302)+(1.059)+(1.004), (I-302)+(1.059)+(1.005), (I-302)+(1.059)+(1.006), (I-302)+(1.059)+(1.007), (I-302)+(1.059)+(1.010), (I-302)+(1.059)+(1.011), (I-302)+(1.059)+(1.012), (I-302)+(1.059)+(1.013), (I-302)+(1.059)+(1.017), (I-302)+(1.059)+(1.018), (I-302)+(1.059)+(1.020), (I-302)+(1.059)+(1.021), (I-302)+(1.059)+(1.026), (I-302)+(1.059)+(1.027), (I-302)+(1.059)+(1.055), (I-302)+(1.059)+(1.092), (I-302)+(1.059)+(2.001), (I-302)+(1.059)+(2.002), (I-302)+(1.059)+(2.003), (I-302)+(1.059)+(2.005), (I-302)+(1.059)+(2.007), (I-302)+(1.059)+(2.009), (I-302)+(1.059)+(2.010), (I-302)+(1.059)+(2.011), (I-302)+(1.059)+(2.012), (I-302)+(1.059)+(2.013), (I-302)+(1.059)+(2.014), (I-302)+(1.059)+(2.015), (I-302)+(1.059)+(2.016), (I-302)+(1.059)+(2.017), (I-302)+(1.059)+(2.018), (I-302)+(1.059)+(2.019), (I-302)+(1.059)+(2.021), (I-302)+(1.059)+(2.028), (I-302)+(1.059)+(2.030), (I-302)+(1.059)+(2.038), (I-302)+(1.059)+(3.003), (I-302)+(1.059)+(3.007), (I-302)+(1.059)+(3.012), (I-302)+(1.059)+(3.013), (I-302)+(1.059)+(3.016), (I-302)+(1.059)+(3.017), (I-302)+(1.059)+(3.020), (I-302)+(1.059)+(3.025), (I-302)+(1.059)+(3.026), (I-302)+(1.059)+(3.030), (I-302)+(1.059)+(3.031), (I-302)+(1.059)+(5.003), (I-302)+(1.059)+(5.004), (I-302)+(1.059)+(5.005), (I-302)+(1.059)+(5.008), (I-302)+(1.059)+(5.009), (I-302)+(1.059)+(5.011), (I-302)+(1.059)+(5.012), (I-302)+(1.059)+(5.013), (I-302)+(1.059)+(5.015), (I-302)+(1.059)+(5.018), (I-302)+(1.059)+(5.019), (I-302)+(1.059)+(6.002), (I-302)+(1.059)+(7.001), (I-302)+(1.059)+(7.005), (I-302)+(1.059)+(9.002), (I-302)+(1.059)+(9.004), (I-302)+(1.059)+(14.001), (I-302)+(1.059)+(14.002), (I-302)+(1.059)+(15.008), (I-302)+(1.059)+(15.011), (I-302)+(1.059)+(15.012), (I-302)+(1.059)+(15.016), (I-302)+(1.059)+(15.025), (I-302)+(1.059)+(15.027), (I-302)+(1.059)+(15.047), (I-302)+(1.059)+(15.063), (I-302)+(1.059)+(15.064), (I-302)+(1.059)+(16.001), (I-302)+(1.059)+(16.005), (I-302)+(1.059)+(17.001), (I-302)+(1.059)+(17.002), (I-302)+(1.059)+(17.003), (I-302)+(1.059)+(17.008), (I-302)+(1.059)+(18.001), (I-302)+(1.092)+(1.001), (I-302)+(1.092)+(1.002), (I-302)+(1.092)+(1.003), (I-302)+(1.092)+(1.004), (I-302)+(1.092)+(1.005), (I-302)+(1.092)+(1.006), (I-302)+(1.092)+(1.007), (I-302)+(1.092)+(1.010), (I-302)+(1.092)+(1.011), (I-302)+(1.092)+(1.012), (I-302)+(1.092)+(1.013), (I-302)+(1.092)+(1.017), (I-302)+(1.092)+(1.018), (I-302)+(1.092)+(1.020), (I-302)+(1.092)+(1.021), (I-302)+(1.092)+(1.026), (I-302)+(1.092)+(1.027), (I-302)+(1.092)+(1.055), (I-302)+(1.092)+(1.059), (I-302)+(1.092)+(2.001), (I-302)+(1.092)+(2.002), (I-302)+(1.092)+(2.003), (I-302)+(1.092)+(2.005), (I-302)+(1.092)+(2.007), (I-302)+(1.092)+(2.009), (I-302)+(1.092)+(2.010), (I-302)+(1.092)+(2.011), (I-302)+(1.092)+(2.012), (I-302)+(1.092)+(2.013), (I-302)+(1.092)+(2.014), (I-302)+(1.092)+(2.015), (I-302)+(1.092)+(2.016), (I-302)+(1.092)+(2.017), (I-302)+(1.092)+(2.018), (I-302)+(1.092)+(2.019), (I-302)+(1.092)+(2.021), (I-302)+(1.092)+(2.028), (I-302)+(1.092)+(2.030), (I-302)+(1.092)+(2.038), (I-302)+(1.092)+(3.003), (I-302)+(1.092)+(3.007), (I-302)+(1.092)+(3.012), (I-302)+(1.092)+(3.013), (I-302)+(1.092)+(3.016), (I-302)+(1.092)+(3.017), (I-302)+(1.092)+(3.020), (I-302)+(1.092)+(3.025), (I-302)+(1.092)+(3.026), (I-302)+(1.092)+(3.030), (I-302)+(1.092)+(3.031), (I-302)+(1.092)+(5.003), (I-302)+(1.092)+(5.004), (I-302)+(1.092)+(5.005), (I-302)+(1.092)+(5.008), (I-302)+(1.092)+(5.009), (I-302)+(1.092)+(5.011), (I-302)+(1.092)+(5.012), (I-302)+(1.092)+(5.013), (I-302)+(1.092)+(5.015), (I-302)+(1.092)+(5.018), (I-302)+(1.092)+(5.019), (I-302)+(1.092)+(6.002), (I-302)+(1.092)+(7.001), (I-302)+(1.092)+(7.005), (I-302)+(1.092)+(9.002), (I-302)+(1.092)+(9.004), (I-302)+(1.092)+(14.001), (I-302)+(1.092)+(14.002), (I-302)+(1.092)+(15.008), (I-302)+(1.092)+(15.011), (I-302)+(1.092)+(15.012), (I-302)+(1.092)+(15.016), (I-302)+(1.092)+(15.025), (I-302)+(1.092)+(15.027), (I-302)+(1.092)+(15.047), (I-302)+(1.092)+(15.063), (I-302)+(1.092)+(15.064), (I-302)+(1.092)+(16.001), (I-302)+(1.092)+(16.005), (I-302)+(1.092)+(17.001), (I-302)+(1.092)+(17.002), (I-302)+(1.092)+(17.003), (I-302)+(1.092)+(17.008), (I-302)+(1.092)+(18.001), (I-302)+(2.001)+(3.003), (I-302)+(2.001)+(3.007), (I-302)+(2.001)+(3.012), (I-302)+(2.001)+(3.013), (I-302)+(2.001)+(3.016), (I-302)+(2.001)+(3.017), (I-302)+(2.001)+(3.020), (I-302)+(2.001)+(3.025), (I-302)+(2.001)+(3.026), (I-302)+(2.001)+(3.030), (I-302)+(2.001)+(3.031), (I-302)+(2.001)+(5.003), (I-302)+(2.001)+(5.004), (I-302)+(2.001)+(5.005), (I-302)+(2.001)+(5.008), (I-302)+(2.001)+(5.009), (I-302)+(2.001)+(5.011), (I-302)+(2.001)+(5.012), (I-302)+(2.001)+(5.013), (I-302)+(2.001)+(5.015), (I-302)+(2.001)+(5.018), (I-302)+(2.001)+(5.019), (I-302)+(2.001)+(6.002), (I-302)+(2.001)+(7.001), (I-302)+(2.001)+(7.005), (I-302)+(2.001)+(9.002), (I-302)+(2.001)+(9.004), (I-302)+(2.001)+(14.001), (I-302)+(2.001)+(14.002), (I-302)+(2.001)+(15.008), (I-302)+(2.001)+(15.011), (I-302)+(2.001)+(15.012), (I-302)+(2.001)+(15.016), (I-302)+(2.001)+(15.025), (I-302)+(2.001)+(15.027), (I-302)+(2.001)+(15.047), (I-302)+(2.001)+(15.063), (I-302)+(2.001)+(15.064), (I-302)+(2.001)+(16.001), (I-302)+(2.001)+(16.005), (I-302)+(2.001)+(17.001), (I-302)+(2.001)+(17.002), (I-302)+(2.001)+(17.003), (I-302)+(2.001)+(17.008), (I-302)+(2.001)+(18.001), (I-302)+(2.002)+(3.003), (I-302)+(2.002)+(3.007), (I-302)+(2.002)+(3.012), (I-302)+(2.002)+(3.013), (I-302)+(2.002)+(3.016), (I-302)+(2.002)+(3.017), (I-302)+(2.002)+(3.020), (I-302)+(2.002)+(3.025), (I-302)+(2.002)+(3.026), (I-302)+(2.002)+(3.030), (I-302)+(2.002)+(3.031), (I-302)+(2.002)+(5.003), (I-302)+(2.002)+(5.004), (I-302)+(2.002)+(5.005), (I-302)+(2.002)+(5.008), (I-302)+(2.002)+(5.009), (I-302)+(2.002)+(5.011), (I-302)+(2.002)+(5.012), (I-302)+(2.002)+(5.013), (I-302)+(2.002)+(5.015), (I-302)+(2.002)+(5.018), (I-302)+(2.002)+(5.019), (I-302)+(2.002)+(6.002), (I-302)+(2.002)+(7.001), (I-302)+(2.002)+(7.005), (I-302)+(2.002)+(9.002), (I-302)+(2.002)+(9.004), (I-302)+(2.002)+(14.001), (I-302)+(2.002)+(14.002), (I-302)+(2.002)+(15.008), (I-302)+(2.002)+(15.011), (I-302)+(2.002)+(15.012), (I-302)+(2.002)+(15.016), (I-302)+(2.002)+(15.025), (I-302)+(2.002)+(15.027), (I-302)+(2.002)+(15.047), (I-302)+(2.002)+(15.063), (I-302)+(2.002)+(15.064), (I-302)+(2.002)+(16.001), (I-302)+(2.002)+(16.005), (I-302)+(2.002)+(17.001), (I-302)+(2.002)+(17.002), (I-302)+(2.002)+(17.003), (I-302)+(2.002)+(17.008), (I-302)+(2.002)+(18.001), (I-302)+(2.003)+(3.003), (I-302)+(2.003)+(3.007), (I-302)+(2.003)+(3.012), (I-302)+(2.003)+(3.013), (I-302)+(2.003)+(3.016), (I-302)+(2.003)+(3.017), (I-302)+(2.003)+(3.020), (I-302)+(2.003)+(3.025), (I-302)+(2.003)+(3.026), (I-302)+(2.003)+(3.030), (I-302)+(2.003)+(3.031), (I-302)+(2.003)+(5.003), (I-302)+(2.003)+(5.004), (I-302)+(2.003)+(5.005), (I-302)+(2.003)+(5.008), (I-302)+(2.003)+(5.009), (I-302)+(2.003)+(5.011), (I-302)+(2.003)+(5.012), (I-302)+(2.003)+(5.013), (I-302)+(2.003)+(5.015), (I-302)+(2.003)+(5.018), (I-302)+(2.003)+(5.019), (I-302)+(2.003)+(6.002), (I-302)+(2.003)+(7.001), (I-302)+(2.003)+(7.005), (I-302)+(2.003)+(9.002), (I-302)+(2.003)+(9.004), (I-302)+(2.003)+(14.001), (I-302)+(2.003)+(14.002), (I-302)+(2.003)+(15.008), (I-302)+(2.003)+(15.011), (I-302)+(2.003)+(15.012), (I-302)+(2.003)+(15.016), (I-302)+(2.003)+(15.025), (I-302)+(2.003)+(15.027), (I-302)+(2.003)+(15.047), (I-302)+(2.003)+(15.063), (I-302)+(2.003)+(15.064), (I-302)+(2.003)+(16.001), (I-302)+(2.003)+(16.005), (I-302)+(2.003)+(17.001), (I-302)+(2.003)+(17.002), (I-302)+(2.003)+(17.003), (I-302)+(2.003)+(17.008), (I-302)+(2.003)+(18.001), (I-302)+(2.005)+(3.003), (I-302)+(2.005)+(3.007), (I-302)+(2.005)+(3.012), (I-302)+(2.005)+(3.013), (I-302)+(2.005)+(3.016), (I-302)+(2.005)+(3.017), (I-302)+(2.005)+(3.020), (I-302)+(2.005)+(3.025), (I-302)+(2.005)+(3.026), (I-302)+(2.005)+(3.030), (I-302)+(2.005)+(3.031), (I-302)+(2.005)+(5.003), (I-302)+(2.005)+(5.004), (I-302)+(2.005)+(5.005), (I-302)+(2.005)+(5.008), (I-302)+(2.005)+(5.009), (I-302)+(2.005)+(5.011), (I-302)+(2.005)+(5.012), (I-302)+(2.005)+(5.013), (I-302)+(2.005)+(5.015), (I-302)+(2.005)+(5.018), (I-302)+(2.005)+(5.019), (I-302)+(2.005)+(6.002), (I-302)+(2.005)+(7.001), (I-302)+(2.005)+(7.005), (I-302)+(2.005)+(9.002), (I-302)+(2.005)+(9.004), (I-302)+(2.005)+(14.001), (I-302)+(2.005)+(14.002), (I-302)+(2.005)+(15.008), (I-302)+(2.005)+(15.011), (I-302)+(2.005)+(15.012), (I-302)+(2.005)+(15.016), (I-302)+(2.005)+(15.025), (I-302)+(2.005)+(15.027), (I-302)+(2.005)+(15.047), (I-302)+(2.005)+(15.063), (I-302)+(2.005)+(15.064), (I-302)+(2.005)+(16.001), (I-302)+(2.005)+(16.005), (I-302)+(2.005)+(17.001), (I-302)+(2.005)+(17.002), (I-302)+(2.005)+(17.003), (I-302)+(2.005)+(17.008), (I-302)+(2.005)+(18.001), (I-302)+(2.007)+(3.003), (I-302)+(2.007)+(3.007), (I-302)+(2.007)+(3.012), (I-302)+(2.007)+(3.013), (I-302)+(2.007)+(3.016), (I-302)+(2.007)+(3.017), (I-302)+(2.007)+(3.020), (I-302)+(2.007)+(3.025), (I-302)+(2.007)+(3.026), (I-302)+(2.007)+(3.030), (I-302)+(2.007)+(3.031), (I-302)+(2.007)+(5.003), (I-302)+(2.007)+(5.004), (I-302)+(2.007)+(5.005), (I-302)+(2.007)+(5.008), (I-302)+(2.007)+(5.009), (I-302)+(2.007)+(5.011), (I-302)+(2.007)+(5.012), (I-302)+(2.007)+(5.013), (I-302)+(2.007)+(5.015), (I-302)+(2.007)+(5.018), (I-302)+(2.007)+(5.019), (I-302)+(2.007)+(6.002), (I-302)+(2.007)+(7.001), (I-302)+(2.007)+(7.005), (I-302)+(2.007)+(9.002), (I-302)+(2.007)+(9.004), (I-302)+(2.007)+(14.001), (I-302)+(2.007)+(14.002), (I-302)+(2.007)+(15.008), (I-302)+(2.007)+(15.011), (I-302)+(2.007)+(15.012), (I-302)+(2.007)+(15.016), (I-302)+(2.007)+(15.025), (I-302)+(2.007)+(15.027), (I-302)+(2.007)+(15.047), (I-302)+(2.007)+(15.063), (I-302)+(2.007)+(15.064), (I-302)+(2.007)+(16.001), (I-302)+(2.007)+(16.005), (I-302)+(2.007)+(17.001), (I-302)+(2.007)+(17.002), (I-302)+(2.007)+(17.003), (I-302)+(2.007)+(17.008), (I-302)+(2.007)+(18.001), (I-302)+(2.009)+(3.003), (I-302)+(2.009)+(3.007), (I-302)+(2.009)+(3.012), (I-302)+(2.009)+(3.013), (I-302)+(2.009)+(3.016), (I-302)+(2.009)+(3.017), (I-302)+(2.009)+(3.020), (I-302)+(2.009)+(3.025), (I-302)+(2.009)+(3.026), (I-302)+(2.009)+(3.030), (I-302)+(2.009)+(3.031), (I-302)+(2.009)+(5.003), (I-302)+(2.009)+(5.004), (I-302)+(2.009)+(5.005), (I-302)+(2.009)+(5.008), (I-302)+(2.009)+(5.009), (I-302)+(2.009)+(5.011), (I-302)+(2.009)+(5.012), (I-302)+(2.009)+(5.013), (I-302)+(2.009)+(5.015), (I-302)+(2.009)+(5.018), (I-302)+(2.009)+(5.019), (I-302)+(2.009)+(6.002), (I-302)+(2.009)+(7.001), (I-302)+(2.009)+(7.005), (I-302)+(2.009)+(9.002), (I-302)+(2.009)+(9.004), (I-302)+(2.009)+(14.001), (I-302)+(2.009)+(14.002), (I-302)+(2.009)+(15.008), (I-302)+(2.009)+(15.011), (I-302)+(2.009)+(15.012), (I-302)+(2.009)+(15.016), (I-302)+(2.009)+(15.025), (I-302)+(2.009)+(15.027), (I-302)+(2.009)+(15.047), (I-302)+(2.009)+(15.063), (I-302)+(2.009)+(15.064), (I-302)+(2.009)+(16.001), (I-302)+(2.009)+(16.005), (I-302)+(2.009)+(17.001), (I-302)+(2.009)+(17.002), (I-302)+(2.009)+(17.003), (I-302)+(2.009)+(17.008), (I-302)+(2.009)+(18.001), (I-302)+(2.010)+(3.003), (I-302)+(2.010)+(3.007), (I-302)+(2.010)+(3.012), (I-302)+(2.010)+(3.013), (I-302)+(2.010)+(3.016), (I-302)+(2.010)+(3.017), (I-302)+(2.010)+(3.020), (I-302)+(2.010)+(3.025), (I-302)+(2.010)+(3.026), (I-302)+(2.010)+(3.030), (I-302)+(2.010)+(3.031), (I-302)+(2.010)+(5.003), (I-302)+(2.010)+(5.004), (I-302)+(2.010)+(5.005), (I-302)+(2.010)+(5.008), (I-302)+(2.010)+(5.009), (I-302)+(2.010)+(5.011), (I-302)+(2.010)+(5.012), (I-302)+(2.010)+(5.013), (I-302)+(2.010)+(5.015), (I-302)+(2.010)+(5.018), (I-302)+(2.010)+(5.019), (I-302)+(2.010)+(6.002), (I-302)+(2.010)+(7.001), (I-302)+(2.010)+(7.005), (I-302)+(2.010)+(9.002), (I-302)+(2.010)+(9.004), (I-302)+(2.010)+(14.001), (I-302)+(2.010)+(14.002), (I-302)+(2.010)+(15.008), (I-302)+(2.010)+(15.011), (I-302)+(2.010)+(15.012), (I-302)+(2.010)+(15.016), (I-302)+(2.010)+(15.025), (I-302)+(2.010)+(15.027), (I-302)+(2.010)+(15.047), (I-302)+(2.010)+(15.063), (I-302)+(2.010)+(15.064), (I-302)+(2.010)+(16.001), (I-302)+(2.010)+(16.005), (I-302)+(2.010)+(17.001), (I-302)+(2.010)+(17.002), (I-302)+(2.010)+(17.003), (I-302)+(2.010)+(17.008), (I-302)+(2.010)+(18.001), (I-302)+(2.011)+(3.003), (I-302)+(2.011)+(3.007), (I-302)+(2.011)+(3.012), (I-302)+(2.011)+(3.013), (I-302)+(2.011)+(3.016), (I-302)+(2.011)+(3.017), (I-302)+(2.011)+(3.020), (I-302)+(2.011)+(3.025), (I-302)+(2.011)+(3.026), (I-302)+(2.011)+(3.030), (I-302)+(2.011)+(3.031), (I-302)+(2.011)+(5.003), (I-302)+(2.011)+(5.004), (I-302)+(2.011)+(5.005), (I-302)+(2.011)+(5.008), (I-302)+(2.011)+(5.009), (I-302)+(2.011)+(5.011), (I-302)+(2.011)+(5.012), (I-302)+(2.011)+(5.013), (I-302)+(2.011)+(5.015), (I-302)+(2.011)+(5.018), (I-302)+(2.011)+(5.019), (I-302)+(2.011)+(6.002), (I-302)+(2.011)+(7.001), (I-302)+(2.011)+(7.005), (I-302)+(2.011)+(9.002), (I-302)+(2.011)+(9.004), (I-302)+(2.011)+(14.001), (I-302)+(2.011)+(14.002), (I-302)+(2.011)+(15.008), (I-302)+(2.011)+(15.011), (I-302)+(2.011)+(15.012), (I-302)+(2.011)+(15.016), (I-302)+(2.011)+(15.025), (I-302)+(2.011)+(15.027), (I-302)+(2.011)+(15.047), (I-302)+(2.011)+(15.063), (I-302)+(2.011)+(15.064), (I-302)+(2.011)+(16.001), (I-302)+(2.011)+(16.005), (I-302)+(2.011)+(17.001), (I-302)+(2.011)+(17.002), (I-302)+(2.011)+(17.003), (I-302)+(2.011)+(17.008), (I-302)+(2.011)+(18.001), (I-302)+(2.012)+(3.003), (I-302)+(2.012)+(3.007), (I-302)+(2.012)+(3.012), (I-302)+(2.012)+(3.013), (I-302)+(2.012)+(3.016), (I-302)+(2.012)+(3.017), (I-302)+(2.012)+(3.020), (I-302)+(2.012)+(3.025), (I-302)+(2.012)+(3.026), (I-302)+(2.012)+(3.030), (I-302)+(2.012)+(3.031), (I-302)+(2.012)+(5.003), (I-302)+(2.012)+(5.004), (I-302)+(2.012)+(5.005), (I-302)+(2.012)+(5.008), (I-302)+(2.012)+(5.009), (I-302)+(2.012)+(5.011), (I-302)+(2.012)+(5.012), (I-302)+(2.012)+(5.013), (I-302)+(2.012)+(5.015), (I-302)+(2.012)+(5.018), (I-302)+(2.012)+(5.019), (I-302)+(2.012)+(6.002), (I-302)+(2.012)+(7.001), (I-302)+(2.012)+(7.005), (I-302)+(2.012)+(9.002), (I-302)+(2.012)+(9.004), (I-302)+(2.012)+(14.001), (I-302)+(2.012)+(14.002), (I-302)+(2.012)+(15.008), (I-302)+(2.012)+(15.011), (I-302)+(2.012)+(15.012), (I-302)+(2.012)+(15.016), (I-302)+(2.012)+(15.025), (I-302)+(2.012)+(15.027), (I-302)+(2.012)+(15.047), (I-302)+(2.012)+(15.063), (I-302)+(2.012)+(15.064), (I-302)+(2.012)+(16.001), (I-302)+(2.012)+(16.005), (I-302)+(2.012)+(17.001), (I-302)+(2.012)+(17.002), (I-302)+(2.012)+(17.003), (I-302)+(2.012)+(17.008), (I-302)+(2.012)+(18.001), (I-302)+(2.013)+(3.003), (I-302)+(2.013)+(3.007), (I-302)+(2.013)+(3.012), (I-302)+(2.013)+(3.013), (I-302)+(2.013)+(3.016), (I-302)+(2.013)+(3.017), (I-302)+(2.013)+(3.020), (I-302)+(2.013)+(3.025), (I-302)+(2.013)+(3.026), (I-302)+(2.013)+(3.030), (I-302)+(2.013)+(3.031), (I-302)+(2.013)+(5.003), (I-302)+(2.013)+(5.004), (I-302)+(2.013)+(5.005), (I-302)+(2.013)+(5.008), (I-302)+(2.013)+(5.009), (I-302)+(2.013)+(5.011), (I-302)+(2.013)+(5.012), (I-302)+(2.013)+(5.013), (I-302)+(2.013)+(5.015), (I-302)+(2.013)+(5.018), (I-302)+(2.013)+(5.019), (I-302)+(2.013)+(6.002), (I-302)+(2.013)+(7.001), (I-302)+(2.013)+(7.005), (I-302)+(2.013)+(9.002), (I-302)+(2.013)+(9.004), (I-302)+(2.013)+(14.001), (I-302)+(2.013)+(14.002), (I-302)+(2.013)+(15.008), (I-302)+(2.013)+(15.011), (I-302)+(2.013)+(15.012), (I-302)+(2.013)+(15.016), (I-302)+(2.013)+(15.025), (I-302)+(2.013)+(15.027), (I-302)+(2.013)+(15.047), (I-302)+(2.013)+(15.063), (I-302)+(2.013)+(15.064), (I-302)+(2.013)+(16.001), (I-302)+(2.013)+(16.005), (I-302)+(2.013)+(17.001), (I-302)+(2.013)+(17.002), (I-302)+(2.013)+(17.003), (I-302)+(2.013)+(17.008), (I-302)+(2.013)+(18.001), (I-302)+(2.014)+(3.003), (I-302)+(2.014)+(3.007), (I-302)+(2.014)+(3.012), (I-302)+(2.014)+(3.013), (I-302)+(2.014)+(3.016), (I-302)+(2.014)+(3.017), (I-302)+(2.014)+(3.020), (I-302)+(2.014)+(3.025), (I-302)+(2.014)+(3.026), (I-302)+(2.014)+(3.030), (I-302)+(2.014)+(3.031), (I-302)+(2.014)+(5.003), (I-302)+(2.014)+(5.004), (I-302)+(2.014)+(5.005), (I-302)+(2.014)+(5.008), (I-302)+(2.014)+(5.009), (I-302)+(2.014)+(5.011), (I-302)+(2.014)+(5.012), (I-302)+(2.014)+(5.013), (I-302)+(2.014)+(5.015), (I-302)+(2.014)+(5.018), (I-302)+(2.014)+(5.019), (I-302)+(2.014)+(6.002), (I-302)+(2.014)+(7.001), (I-302)+(2.014)+(7.005), (I-302)+(2.014)+(9.002), (I-302)+(2.014)+(9.004), (I-302)+(2.014)+(14.001), (I-302)+(2.014)+(14.002), (I-302)+(2.014)+(15.008), (I-302)+(2.014)+(15.011), (I-302)+(2.014)+(15.012), (I-302)+(2.014)+(15.016), (I-302)+(2.014)+(15.025), (I-302)+(2.014)+(15.027), (I-302)+(2.014)+(15.047), (I-302)+(2.014)+(15.063), (I-302)+(2.014)+(15.064), (I-302)+(2.014)+(16.001), (I-302)+(2.014)+(16.005), (I-302)+(2.014)+(17.001), (I-302)+(2.014)+(17.002), (I-302)+(2.014)+(17.003), (I-302)+(2.014)+(17.008), (I-302)+(2.014)+(18.001), (I-302)+(2.015)+(3.003), (I-302)+(2.015)+(3.007), (I-302)+(2.015)+(3.012), (I-302)+(2.015)+(3.013), (I-302)+(2.015)+(3.016), (I-302)+(2.015)+(3.017), (I-302)+(2.015)+(3.020), (I-302)+(2.015)+(3.025), (I-302)+(2.015)+(3.026), (I-302)+(2.015)+(3.030), (I-302)+(2.015)+(3.031), (I-302)+(2.015)+(5.003), (I-302)+(2.015)+(5.004), (I-302)+(2.015)+(5.005), (I-302)+(2.015)+(5.008), (I-302)+(2.015)+(5.009), (I-302)+(2.015)+(5.011), (I-302)+(2.015)+(5.012), (I-302)+(2.015)+(5.013), (I-302)+(2.015)+(5.015), (I-302)+(2.015)+(5.018), (I-302)+(2.015)+(5.019), (I-302)+(2.015)+(6.002), (I-302)+(2.015)+(7.001), (I-302)+(2.015)+(7.005), (I-302)+(2.015)+(9.002), (I-302)+(2.015)+(9.004), (I-302)+(2.015)+(14.001), (I-302)+(2.015)+(14.002), (I-302)+(2.015)+(15.008), (I-302)+(2.015)+(15.011), (I-302)+(2.015)+(15.012), (I-302)+(2.015)+(15.016), (I-302)+(2.015)+(15.025), (I-302)+(2.015)+(15.027), (I-302)+(2.015)+(15.047), (I-302)+(2.015)+(15.063), (I-302)+(2.015)+(15.064), (I-302)+(2.015)+(16.001), (I-302)+(2.015)+(16.005), (I-302)+(2.015)+(17.001), (I-302)+(2.015)+(17.002), (I-302)+(2.015)+(17.003), (I-302)+(2.015)+(17.008), (I-302)+(2.015)+(18.001), (I-302)+(2.016)+(3.003), (I-302)+(2.016)+(3.007), (I-302)+(2.016)+(3.012), (I-302)+(2.016)+(3.013), (I-302)+(2.016)+(3.016), (I-302)+(2.016)+(3.017), (I-302)+(2.016)+(3.020), (I-302)+(2.016)+(3.025), (I-302)+(2.016)+(3.026), (I-302)+(2.016)+(3.030), (I-302)+(2.016)+(3.031), (I-302)+(2.016)+(5.003), (I-302)+(2.016)+(5.004), (I-302)+(2.016)+(5.005), (I-302)+(2.016)+(5.008), (I-302)+(2.016)+(5.009), (I-302)+(2.016)+(5.011), (I-302)+(2.016)+(5.012), (I-302)+(2.016)+(5.013), (I-302)+(2.016)+(5.015), (I-302)+(2.016)+(5.018), (I-302)+(2.016)+(5.019), (I-302)+(2.016)+(6.002), (I-302)+(2.016)+(7.001), (I-302)+(2.016)+(7.005), (I-302)+(2.016)+(9.002), (I-302)+(2.016)+(9.004), (I-302)+(2.016)+(14.001), (I-302)+(2.016)+(14.002), (I-302)+(2.016)+(15.008), (I-302)+(2.016)+(15.011), (I-302)+(2.016)+(15.012), (I-302)+(2.016)+(15.016), (I-302)+(2.016)+(15.025), (I-302)+(2.016)+(15.027), (I-302)+(2.016)+(15.047), (I-302)+(2.016)+(15.063), (I-302)+(2.016)+(15.064), (I-302)+(2.016)+(16.001), (I-302)+(2.016)+(16.005), (I-302)+(2.016)+(17.001), (I-302)+(2.016)+(17.002), (I-302)+(2.016)+(17.003), (I-302)+(2.016)+(17.008), (I-302)+(2.016)+(18.001), (I-302)+(2.017)+(3.003), (I-302)+(2.017)+(3.007), (I-302)+(2.017)+(3.012), (I-302)+(2.017)+(3.013), (I-302)+(2.017)+(3.016), (I-302)+(2.017)+(3.017), (I-302)+(2.017)+(3.020), (I-302)+(2.017)+(3.025), (I-302)+(2.017)+(3.026), (I-302)+(2.017)+(3.030), (I-302)+(2.017)+(3.031), (I-302)+(2.017)+(5.003), (I-302)+(2.017)+(5.004), (I-302)+(2.017)+(5.005), (I-302)+(2.017)+(5.008), (I-302)+(2.017)+(5.009), (I-302)+(2.017)+(5.011), (I-302)+(2.017)+(5.012), (I-302)+(2.017)+(5.013), (I-302)+(2.017)+(5.015), (I-302)+(2.017)+(5.018), (I-302)+(2.017)+(5.019), (I-302)+(2.017)+(6.002), (I-302)+(2.017)+(7.001), (I-302)+(2.017)+(7.005), (I-302)+(2.017)+(9.002), (I-302)+(2.017)+(9.004), (I-302)+(2.017)+(14.001), (I-302)+(2.017)+(14.002), (I-302)+(2.017)+(15.008), (I-302)+(2.017)+(15.011), (I-302)+(2.017)+(15.012), (I-302)+(2.017)+(15.016), (I-302)+(2.017)+(15.025), (I-302)+(2.017)+(15.027), (I-302)+(2.017)+(15.047), (I-302)+(2.017)+(15.063), (I-302)+(2.017)+(15.064), (I-302)+(2.017)+(16.001), (I-302)+(2.017)+(16.005), (I-302)+(2.017)+(17.001), (I-302)+(2.017)+(17.002), (I-302)+(2.017)+(17.003), (I-302)+(2.017)+(17.008), (I-302)+(2.017)+(18.001), (I-302)+(2.018)+(3.003), (I-302)+(2.018)+(3.007), (I-302)+(2.018)+(3.012), (I-302)+(2.018)+(3.013), (I-302)+(2.018)+(3.016), (I-302)+(2.018)+(3.017), (I-302)+(2.018)+(3.020), (I-302)+(2.018)+(3.025), (I-302)+(2.018)+(3.026), (I-302)+(2.018)+(3.030), (I-302)+(2.018)+(3.031), (I-302)+(2.018)+(5.003), (I-302)+(2.018)+(5.004), (I-302)+(2.018)+(5.005), (I-302)+(2.018)+(5.008), (I-302)+(2.018)+(5.009), (I-302)+(2.018)+(5.011), (I-302)+(2.018)+(5.012), (I-302)+(2.018)+(5.013), (I-302)+(2.018)+(5.015), (I-302)+(2.018)+(5.018), (I-302)+(2.018)+(5.019), (I-302)+(2.018)+(6.002), (I-302)+(2.018)+(7.001), (I-302)+(2.018)+(7.005), (I-302)+(2.018)+(9.002), (I-302)+(2.018)+(9.004), (I-302)+(2.018)+(14.001), (I-302)+(2.018)+(14.002), (I-302)+(2.018)+(15.008), (I-302)+(2.018)+(15.011), (I-302)+(2.018)+(15.012), (I-302)+(2.018)+(15.016), (I-302)+(2.018)+(15.025), (I-302)+(2.018)+(15.027), (I-302)+(2.018)+(15.047), (I-302)+(2.018)+(15.063), (I-302)+(2.018)+(15.064), (I-302)+(2.018)+(16.001), (I-302)+(2.018)+(16.005), (I-302)+(2.018)+(17.001), (I-302)+(2.018)+(17.002), (I-302)+(2.018)+(17.003), (I-302)+(2.018)+(17.008), (I-302)+(2.018)+(18.001), (I-302)+(2.019)+(3.003), (I-302)+(2.019)+(3.007), (I-302)+(2.019)+(3.012), (I-302)+(2.019)+(3.013), (I-302)+(2.019)+(3.016), (I-302)+(2.019)+(3.017), (I-302)+(2.019)+(3.020), (I-302)+(2.019)+(3.025), (I-302)+(2.019)+(3.026), (I-302)+(2.019)+(3.030), (I-302)+(2.019)+(3.031), (I-302)+(2.019)+(5.003), (I-302)+(2.019)+(5.004), (I-302)+(2.019)+(5.005), (I-302)+(2.019)+(5.008), (I-302)+(2.019)+(5.009), (I-302)+(2.019)+(5.011), (I-302)+(2.019)+(5.012), (I-302)+(2.019)+(5.013), (I-302)+(2.019)+(5.015), (I-302)+(2.019)+(5.018), (I-302)+(2.019)+(5.019), (I-302)+(2.019)+(6.002), (I-302)+(2.019)+(7.001), (I-302)+(2.019)+(7.005), (I-302)+(2.019)+(9.002), (I-302)+(2.019)+(9.004), (I-302)+(2.019)+(14.001), (I-302)+(2.019)+(14.002), (I-302)+(2.019)+(15.008), (I-302)+(2.019)+(15.011), (I-302)+(2.019)+(15.012), (I-302)+(2.019)+(15.016), (I-302)+(2.019)+(15.025), (I-302)+(2.019)+(15.027), (I-302)+(2.019)+(15.047), (I-302)+(2.019)+(15.063), (I-302)+(2.019)+(15.064), (I-302)+(2.019)+(16.001), (I-302)+(2.019)+(16.005), (I-302)+(2.019)+(17.001), (I-302)+(2.019)+(17.002), (I-302)+(2.019)+(17.003), (I-302)+(2.019)+(17.008), (I-302)+(2.019)+(18.001), (I-302)+(2.021)+(3.003), (I-302)+(2.021)+(3.007), (I-302)+(2.021)+(3.012), (I-302)+(2.021)+(3.013), (I-302)+(2.021)+(3.016), (I-302)+(2.021)+(3.017), (I-302)+(2.021)+(3.020), (I-302)+(2.021)+(3.025), (I-302)+(2.021)+(3.026), (I-302)+(2.021)+(3.030), (I-302)+(2.021)+(3.031), (I-302)+(2.021)+(5.003), (I-302)+(2.021)+(5.004), (I-302)+(2.021)+(5.005), (I-302)+(2.021)+(5.008), (I-302)+(2.021)+(5.009), (I-302)+(2.021)+(5.011), (I-302)+(2.021)+(5.012), (I-302)+(2.021)+(5.013), (I-302)+(2.021)+(5.015), (I-302)+(2.021)+(5.018), (I-302)+(2.021)+(5.019), (I-302)+(2.021)+(6.002), (I-302)+(2.021)+(7.001), (I-302)+(2.021)+(7.005), (I-302)+(2.021)+(9.002), (I-302)+(2.021)+(9.004), (I-302)+(2.021)+(14.001), (I-302)+(2.021)+(14.002), (I-302)+(2.021)+(15.008), (I-302)+(2.021)+(15.011), (I-302)+(2.021)+(15.012), (I-302)+(2.021)+(15.016), (I-302)+(2.021)+(15.025), (I-302)+(2.021)+(15.027), (I-302)+(2.021)+(15.047), (I-302)+(2.021)+(15.063), (I-302)+(2.021)+(15.064), (I-302)+(2.021)+(16.001), (I-302)+(2.021)+(16.005), (I-302)+(2.021)+(17.001), (I-302)+(2.021)+(17.002), (I-302)+(2.021)+(17.003), (I-302)+(2.021)+(17.008), (I-302)+(2.021)+(18.001), (I-302)+(2.028)+(3.003), (I-302)+(2.028)+(3.007), (I-302)+(2.028)+(3.012), (I-302)+(2.028)+(3.013), (I-302)+(2.028)+(3.016), (I-302)+(2.028)+(3.017), (I-302)+(2.028)+(3.020), (I-302)+(2.028)+(3.025), (I-302)+(2.028)+(3.026), (I-302)+(2.028)+(3.030), (I-302)+(2.028)+(3.031), (I-302)+(2.028)+(5.003), (I-302)+(2.028)+(5.004), (I-302)+(2.028)+(5.005), (I-302)+(2.028)+(5.008), (I-302)+(2.028)+(5.009), (I-302)+(2.028)+(5.011), (I-302)+(2.028)+(5.012), (I-302)+(2.028)+(5.013), (I-302)+(2.028)+(5.015), (I-302)+(2.028)+(5.018), (I-302)+(2.028)+(5.019), (I-302)+(2.028)+(6.002), (I-302)+(2.028)+(7.001), (I-302)+(2.028)+(7.005), (I-302)+(2.028)+(9.002), (I-302)+(2.028)+(9.004), (I-302)+(2.028)+(14.001), (I-302)+(2.028)+(14.002), (I-302)+(2.028)+(15.008), (I-302)+(2.028)+(15.011), (I-302)+(2.028)+(15.012), (I-302)+(2.028)+(15.016), (I-302)+(2.028)+(15.025), (I-302)+(2.028)+(15.027), (I-302)+(2.028)+(15.047), (I-302)+(2.028)+(15.063), (I-302)+(2.028)+(15.064), (I-302)+(2.028)+(16.001), (I-302)+(2.028)+(16.005), (I-302)+(2.028)+(17.001), (I-302)+(2.028)+(17.002), (I-302)+(2.028)+(17.003), (I-302)+(2.028)+(17.008), (I-302)+(2.028)+(18.001), (I-302)+(2.030)+(3.003), (I-302)+(2.030)+(3.007), (I-302)+(2.030)+(3.012), (I-302)+(2.030)+(3.013), (I-302)+(2.030)+(3.016), (I-302)+(2.030)+(3.017), (I-302)+(2.030)+(3.020), (I-302)+(2.030)+(3.025), (I-302)+(2.030)+(3.026), (I-302)+(2.030)+(3.030), (I-302)+(2.030)+(3.031), (I-302)+(2.030)+(5.003), (I-302)+(2.030)+(5.004), (I-302)+(2.030)+(5.005), (I-302)+(2.030)+(5.008), (I-302)+(2.030)+(5.009), (I-302)+(2.030)+(5.011), (I-302)+(2.030)+(5.012), (I-302)+(2.030)+(5.013), (I-302)+(2.030)+(5.015), (I-302)+(2.030)+(5.018), (I-302)+(2.030)+(5.019), (I-302)+(2.030)+(6.002), (I-302)+(2.030)+(7.001), (I-302)+(2.030)+(7.005), (I-302)+(2.030)+(9.002), (I-302)+(2.030)+(9.004), (I-302)+(2.030)+(14.001), (I-302)+(2.030)+(14.002), (I-302)+(2.030)+(15.008), (I-302)+(2.030)+(15.011), (I-302)+(2.030)+(15.012), (I-302)+(2.030)+(15.016), (I-302)+(2.030)+(15.025), (I-302)+(2.030)+(15.027), (I-302)+(2.030)+(15.047), (I-302)+(2.030)+(15.063), (I-302)+(2.030)+(15.064), (I-302)+(2.030)+(16.001), (I-302)+(2.030)+(16.005), (I-302)+(2.030)+(17.001), (I-302)+(2.030)+(17.002), (I-302)+(2.030)+(17.003), (I-302)+(2.030)+(17.008), (I-302)+(2.030)+(18.001), (I-302)+(2.038)+(3.003), (I-302)+(2.038)+(3.007), (I-302)+(2.038)+(3.012), (I-302)+(2.038)+(3.013), (I-302)+(2.038)+(3.016), (I-302)+(2.038)+(3.017), (I-302)+(2.038)+(3.020), (I-302)+(2.038)+(3.025), (I-302)+(2.038)+(3.026), (I-302)+(2.038)+(3.030), (I-302)+(2.038)+(3.031), (I-302)+(2.038)+(5.003), (I-302)+(2.038)+(5.004), (I-302)+(2.038)+(5.005), (I-302)+(2.038)+(5.008), (I-302)+(2.038)+(5.009), (I-302)+(2.038)+(5.011), (I-302)+(2.038)+(5.012), (I-302)+(2.038)+(5.013), (I-302)+(2.038)+(5.015), (I-302)+(2.038)+(5.018), (I-302)+(2.038)+(5.019), (I-302)+(2.038)+(6.002), (I-302)+(2.038)+(7.001), (I-302)+(2.038)+(7.005), (I-302)+(2.038)+(9.002), (I-302)+(2.038)+(9.004), (I-302)+(2.038)+(14.001), (I-302)+(2.038)+(14.002), (I-302)+(2.038)+(15.008), (I-302)+(2.038)+(15.011), (I-302)+(2.038)+(15.012), (I-302)+(2.038)+(15.016), (I-302)+(2.038)+(15.025), (I-302)+(2.038)+(15.027), (I-302)+(2.038)+(15.047), (I-302)+(2.038)+(15.063), (I-302)+(2.038)+(15.064), (I-302)+(2.038)+(16.001), (I-302)+(2.038)+(16.005), (I-302)+(2.038)+(17.001), (I-302)+(2.038)+(17.002), (I-302)+(2.038)+(17.003), (I-302)+(2.038)+(17.008), (I-302)+(2.038)+(18.001), (I-302)+(3.003)+(3.025), (I-302)+(3.003)+(3.030), (I-302)+(3.003)+(3.031), (I-302)+(3.003)+(5.003), (I-302)+(3.003)+(5.004), (I-302)+(3.003)+(5.005), (I-302)+(3.003)+(5.008), (I-302)+(3.003)+(5.009), (I-302)+(3.003)+(5.011), (I-302)+(3.003)+(5.012), (I-302)+(3.003)+(5.013), (I-302)+(3.003)+(5.015), (I-302)+(3.003)+(5.018), (I-302)+(3.003)+(5.019), (I-302)+(3.003)+(6.002), (I-302)+(3.003)+(7.001), (I-302)+(3.003)+(7.005), (I-302)+(3.003)+(9.002), (I-302)+(3.003)+(9.004), (I-302)+(3.003)+(14.001), (I-302)+(3.003)+(14.002), (I-302)+(3.003)+(15.008), (I-302)+(3.003)+(15.011), (I-302)+(3.003)+(15.012), (I-302)+(3.003)+(15.016), (I-302)+(3.003)+(15.025), (I-302)+(3.003)+(15.027), (I-302)+(3.003)+(15.047), (I-302)+(3.003)+(15.063), (I-302)+(3.003)+(15.064), (I-302)+(3.003)+(16.001), (I-302)+(3.003)+(16.005), (I-302)+(3.003)+(17.001), (I-302)+(3.003)+(17.002), (I-302)+(3.003)+(17.003), (I-302)+(3.003)+(17.008), (I-302)+(3.003)+(18.001), (I-302)+(3.007)+(3.025), (I-302)+(3.007)+(3.030), (I-302)+(3.007)+(3.031), (I-302)+(3.007)+(5.003), (I-302)+(3.007)+(5.004), (I-302)+(3.007)+(5.005), (I-302)+(3.007)+(5.008), (I-302)+(3.007)+(5.009), (I-302)+(3.007)+(5.011), (I-302)+(3.007)+(5.012), (I-302)+(3.007)+(5.013), (I-302)+(3.007)+(5.015), (I-302)+(3.007)+(5.018), (I-302)+(3.007)+(5.019), (I-302)+(3.007)+(6.002), (I-302)+(3.007)+(7.001), (I-302)+(3.007)+(7.005), (I-302)+(3.007)+(9.002), (I-302)+(3.007)+(9.004), (I-302)+(3.007)+(14.001), (I-302)+(3.007)+(14.002), (I-302)+(3.007)+(15.008), (I-302)+(3.007)+(15.011), (I-302)+(3.007)+(15.012), (I-302)+(3.007)+(15.016), (I-302)+(3.007)+(15.025), (I-302)+(3.007)+(15.027), (I-302)+(3.007)+(15.047), (I-302)+(3.007)+(15.063), (I-302)+(3.007)+(15.064), (I-302)+(3.007)+(16.001), (I-302)+(3.007)+(16.005), (I-302)+(3.007)+(17.001), (I-302)+(3.007)+(17.002), (I-302)+(3.007)+(17.003), (I-302)+(3.007)+(17.008), (I-302)+(3.007)+(18.001), (I-302)+(3.012)+(3.025), (I-302)+(3.012)+(3.030), (I-302)+(3.012)+(3.031), (I-302)+(3.012)+(5.003), (I-302)+(3.012)+(5.004), (I-302)+(3.012)+(5.005), (I-302)+(3.012)+(5.008), (I-302)+(3.012)+(5.009), (I-302)+(3.012)+(5.011), (I-302)+(3.012)+(5.012), (I-302)+(3.012)+(5.013), (I-302)+(3.012)+(5.015), (I-302)+(3.012)+(5.018), (I-302)+(3.012)+(5.019), (I-302)+(3.012)+(6.002), (I-302)+(3.012)+(7.001), (I-302)+(3.012)+(7.005), (I-302)+(3.012)+(9.002), (I-302)+(3.012)+(9.004), (I-302)+(3.012)+(14.001), (I-302)+(3.012)+(14.002), (I-302)+(3.012)+(15.008), (I-302)+(3.012)+(15.011), (I-302)+(3.012)+(15.012), (I-302)+(3.012)+(15.016), (I-302)+(3.012)+(15.025), (I-302)+(3.012)+(15.027), (I-302)+(3.012)+(15.047), (I-302)+(3.012)+(15.063), (I-302)+(3.012)+(15.064), (I-302)+(3.012)+(16.001), (I-302)+(3.012)+(16.005), (I-302)+(3.012)+(17.001), (I-302)+(3.012)+(17.002), (I-302)+(3.012)+(17.003), (I-302)+(3.012)+(17.008), (I-302)+(3.012)+(18.001), (I-302)+(3.013)+(3.025), (I-302)+(3.013)+(3.030), (I-302)+(3.013)+(3.031), (I-302)+(3.013)+(5.003), (I-302)+(3.013)+(5.004), (I-302)+(3.013)+(5.005), (I-302)+(3.013)+(5.008), (I-302)+(3.013)+(5.009), (I-302)+(3.013)+(5.011), (I-302)+(3.013)+(5.012), (I-302)+(3.013)+(5.013), (I-302)+(3.013)+(5.015), (I-302)+(3.013)+(5.018), (I-302)+(3.013)+(5.019), (I-302)+(3.013)+(6.002), (I-302)+(3.013)+(7.001), (I-302)+(3.013)+(7.005), (I-302)+(3.013)+(9.002), (I-302)+(3.013)+(9.004), (I-302)+(3.013)+(14.001), (I-302)+(3.013)+(14.002), (I-302)+(3.013)+(15.008), (I-302)+(3.013)+(15.011), (I-302)+(3.013)+(15.012), (I-302)+(3.013)+(15.016), (I-302)+(3.013)+(15.025), (I-302)+(3.013)+(15.027), (I-302)+(3.013)+(15.047), (I-302)+(3.013)+(15.063), (I-302)+(3.013)+(15.064), (I-302)+(3.013)+(16.001), (I-302)+(3.013)+(16.005), (I-302)+(3.013)+(17.001), (I-302)+(3.013)+(17.002), (I-302)+(3.013)+(17.003), (I-302)+(3.013)+(17.008), (I-302)+(3.013)+(18.001), (I-302)+(3.016)+(3.025), (I-302)+(3.016)+(3.030), (I-302)+(3.016)+(3.031), (I-302)+(3.016)+(5.003), (I-302)+(3.016)+(5.004), (I-302)+(3.016)+(5.005), (I-302)+(3.016)+(5.008), (I-302)+(3.016)+(5.009), (I-302)+(3.016)+(5.011), (I-302)+(3.016)+(5.012), (I-302)+(3.016)+(5.013), (I-302)+(3.016)+(5.015), (I-302)+(3.016)+(5.018), (I-302)+(3.016)+(5.019), (I-302)+(3.016)+(6.002), (I-302)+(3.016)+(7.001), (I-302)+(3.016)+(7.005), (I-302)+(3.016)+(9.002), (I-302)+(3.016)+(9.004), (I-302)+(3.016)+(14.001), (I-302)+(3.016)+(14.002), (I-302)+(3.016)+(15.008), (I-302)+(3.016)+(15.011), (I-302)+(3.016)+(15.012), (I-302)+(3.016)+(15.016), (I-302)+(3.016)+(15.025), (I-302)+(3.016)+(15.027), (I-302)+(3.016)+(15.047), (I-302)+(3.016)+(15.063), (I-302)+(3.016)+(15.064), (I-302)+(3.016)+(16.001), (I-302)+(3.016)+(16.005), (I-302)+(3.016)+(17.001), (I-302)+(3.016)+(17.002), (I-302)+(3.016)+(17.003), (I-302)+(3.016)+(17.008), (I-302)+(3.016)+(18.001), (I-302)+(3.017)+(3.025), (I-302)+(3.017)+(3.030), (I-302)+(3.017)+(3.031), (I-302)+(3.017)+(5.003), (I-302)+(3.017)+(5.004), (I-302)+(3.017)+(5.005), (I-302)+(3.017)+(5.008), (I-302)+(3.017)+(5.009), (I-302)+(3.017)+(5.011), (I-302)+(3.017)+(5.012), (I-302)+(3.017)+(5.013), (I-302)+(3.017)+(5.015), (I-302)+(3.017)+(5.018), (I-302)+(3.017)+(5.019), (I-302)+(3.017)+(6.002), (I-302)+(3.017)+(7.001), (I-302)+(3.017)+(7.005), (I-302)+(3.017)+(9.002), (I-302)+(3.017)+(9.004), (I-302)+(3.017)+(14.001), (I-302)+(3.017)+(14.002), (I-302)+(3.017)+(15.008), (I-302)+(3.017)+(15.011), (I-302)+(3.017)+(15.012), (I-302)+(3.017)+(15.016), (I-302)+(3.017)+(15.025), (I-302)+(3.017)+(15.027), (I-302)+(3.017)+(15.047), (I-302)+(3.017)+(15.063), (I-302)+(3.017)+(15.064), (I-302)+(3.017)+(16.001), (I-302)+(3.017)+(16.005), (I-302)+(3.017)+(17.001), (I-302)+(3.017)+(17.002), (I-302)+(3.017)+(17.003), (I-302)+(3.017)+(17.008), (I-302)+(3.017)+(18.001), (I-302)+(3.020)+(3.025), (I-302)+(3.020)+(3.030), (I-302)+(3.020)+(3.031), (I-302)+(3.020)+(5.003), (I-302)+(3.020)+(5.004), (I-302)+(3.020)+(5.005), (I-302)+(3.020)+(5.008), (I-302)+(3.020)+(5.009), (I-302)+(3.020)+(5.011), (I-302)+(3.020)+(5.012), (I-302)+(3.020)+(5.013), (I-302)+(3.020)+(5.015), (I-302)+(3.020)+(5.018), (I-302)+(3.020)+(5.019), (I-302)+(3.020)+(6.002), (I-302)+(3.020)+(7.001), (I-302)+(3.020)+(7.005), (I-302)+(3.020)+(9.002), (I-302)+(3.020)+(9.004), (I-302)+(3.020)+(14.001), (I-302)+(3.020)+(14.002), (I-302)+(3.020)+(15.008), (I-302)+(3.020)+(15.011), (I-302)+(3.020)+(15.012), (I-302)+(3.020)+(15.016), (I-302)+(3.020)+(15.025), (I-302)+(3.020)+(15.027), (I-302)+(3.020)+(15.047), (I-302)+(3.020)+(15.063), (I-302)+(3.020)+(15.064), (I-302)+(3.020)+(16.001), (I-302)+(3.020)+(16.005), (I-302)+(3.020)+(17.001), (I-302)+(3.020)+(17.002), (I-302)+(3.020)+(17.003), (I-302)+(3.020)+(17.008), (I-302)+(3.020)+(18.001), (I-302)+(3.025)+(3.030), (I-302)+(3.025)+(3.031), (I-302)+(3.025)+(5.003), (I-302)+(3.025)+(5.004), (I-302)+(3.025)+(5.005), (I-302)+(3.025)+(5.008), (I-302)+(3.025)+(5.009), (I-302)+(3.025)+(5.011), (I-302)+(3.025)+(5.012), (I-302)+(3.025)+(5.013), (I-302)+(3.025)+(5.015), (I-302)+(3.025)+(5.018), (I-302)+(3.025)+(5.019), (I-302)+(3.025)+(6.002), (I-302)+(3.025)+(7.001), (I-302)+(3.025)+(7.005), (I-302)+(3.025)+(9.002), (I-302)+(3.025)+(9.004), (I-302)+(3.025)+(14.001), (I-302)+(3.025)+(14.002), (I-302)+(3.025)+(15.008), (I-302)+(3.025)+(15.011), (I-302)+(3.025)+(15.012), (I-302)+(3.025)+(15.016), (I-302)+(3.025)+(15.025), (I-302)+(3.025)+(15.027), (I-302)+(3.025)+(15.047), (I-302)+(3.025)+(15.063), (I-302)+(3.025)+(15.064), (I-302)+(3.025)+(16.001), (I-302)+(3.025)+(16.005), (I-302)+(3.025)+(17.001), (I-302)+(3.025)+(17.002), (I-302)+(3.025)+(17.003), (I-302)+(3.025)+(17.008), (I-302)+(3.025)+(18.001), (I-302)+(3.026)+(3.025), (I-302)+(3.026)+(3.030), (I-302)+(3.026)+(3.031), (I-302)+(3.026)+(5.003), (I-302)+(3.026)+(5.004), (I-302)+(3.026)+(5.005), (I-302)+(3.026)+(5.008), (I-302)+(3.026)+(5.009), (I-302)+(3.026)+(5.011), (I-302)+(3.026)+(5.012), (I-302)+(3.026)+(5.013), (I-302)+(3.026)+(5.015), (I-302)+(3.026)+(5.018), (I-302)+(3.026)+(5.019), (I-302)+(3.026)+(6.002), (I-302)+(3.026)+(7.001), (I-302)+(3.026)+(7.005), (I-302)+(3.026)+(9.002), (I-302)+(3.026)+(9.004), (I-302)+(3.026)+(14.001), (I-302)+(3.026)+(14.002), (I-302)+(3.026)+(15.008), (I-302)+(3.026)+(15.011), (I-302)+(3.026)+(15.012), (I-302)+(3.026)+(15.016), (I-302)+(3.026)+(15.025), (I-302)+(3.026)+(15.027), (I-302)+(3.026)+(15.047), (I-302)+(3.026)+(15.063), (I-302)+(3.026)+(15.064), (I-302)+(3.026)+(16.001), (I-302)+(3.026)+(16.005), (I-302)+(3.026)+(17.001), (I-302)+(3.026)+(17.002), (I-302)+(3.026)+(17.003), (I-302)+(3.026)+(17.008), (I-302)+(3.026)+(18.001), (I-302)+(3.030)+(3.025), (I-302)+(3.030)+(3.031), (I-302)+(3.030)+(5.003), (I-302)+(3.030)+(5.004), (I-302)+(3.030)+(5.005), (I-302)+(3.030)+(5.008), (I-302)+(3.030)+(5.009), (I-302)+(3.030)+(5.011), (I-302)+(3.030)+(5.012), (I-302)+(3.030)+(5.013), (I-302)+(3.030)+(5.015), (I-302)+(3.030)+(5.018), (I-302)+(3.030)+(5.019), (I-302)+(3.030)+(6.002), (I-302)+(3.030)+(7.001), (I-302)+(3.030)+(7.005), (I-302)+(3.030)+(9.002), (I-302)+(3.030)+(9.004), (I-302)+(3.030)+(14.001), (I-302)+(3.030)+(14.002), (I-302)+(3.030)+(15.008), (I-302)+(3.030)+(15.011), (I-302)+(3.030)+(15.012), (I-302)+(3.030)+(15.016), (I-302)+(3.030)+(15.025), (I-302)+(3.030)+(15.027), (I-302)+(3.030)+(15.047), (I-302)+(3.030)+(15.063), (I-302)+(3.030)+(15.064), (I-302)+(3.030)+(16.001), (I-302)+(3.030)+(16.005), (I-302)+(3.030)+(17.001), (I-302)+(3.030)+(17.002), (I-302)+(3.030)+(17.003), (I-302)+(3.030)+(17.008), (I-302)+(3.030)+(18.001), (I-302)+(3.031)+(3.025), (I-302)+(3.031)+(3.030), (I-302)+(3.031)+(5.003), (I-302)+(3.031)+(5.004), (I-302)+(3.031)+(5.005), (I-302)+(3.031)+(5.008), (I-302)+(3.031)+(5.009), (I-302)+(3.031)+(5.011), (I-302)+(3.031)+(5.012), (I-302)+(3.031)+(5.013), (I-302)+(3.031)+(5.015), (I-302)+(3.031)+(5.018), (I-302)+(3.031)+(5.019), (I-302)+(3.031)+(6.002), (I-302)+(3.031)+(7.001), (I-302)+(3.031)+(7.005), (I-302)+(3.031)+(9.002), (I-302)+(3.031)+(9.004), (I-302)+(3.031)+(14.001), (I-302)+(3.031)+(14.002), (I-302)+(3.031)+(15.008), (I-302)+(3.031)+(15.011), (I-302)+(3.031)+(15.012), (I-302)+(3.031)+(15.016), (I-302)+(3.031)+(15.025), (I-302)+(3.031)+(15.027), (I-302)+(3.031)+(15.047), (I-302)+(3.031)+(15.063), (I-302)+(3.031)+(15.064), (I-302)+(3.031)+(16.001), (I-302)+(3.031)+(16.005), (I-302)+(3.031)+(17.001), (I-302)+(3.031)+(17.002), (I-302)+(3.031)+(17.003), (I-302)+(3.031)+(17.008), (I-302)+(3.031)+(18.001), (I-302)+(5.003)+(9.002), (I-302)+(5.003)+(15.012), (I-302)+(5.003)+(15.016), (I-302)+(5.003)+(15.025), (I-302)+(5.003)+(15.027), (I-302)+(5.003)+(15.047), (I-302)+(5.003)+(15.063), (I-302)+(5.003)+(15.064), (I-302)+(5.004)+(9.002), (I-302)+(5.004)+(15.012), (I-302)+(5.004)+(15.016), (I-302)+(5.004)+(15.025), (I-302)+(5.004)+(15.027), (I-302)+(5.004)+(15.047), (I-302)+(5.004)+(15.063), (I-302)+(5.004)+(15.064), (I-302)+(5.005)+(9.002), (I-302)+(5.005)+(15.012), (I-302)+(5.005)+(15.016), (I-302)+(5.005)+(15.025), (I-302)+(5.005)+(15.027), (I-302)+(5.005)+(15.047), (I-302)+(5.005)+(15.063), (I-302)+(5.005)+(15.064), (I-302)+(5.008)+(9.002), (I-302)+(5.008)+(15.012), (I-302)+(5.008)+(15.016), (I-302)+(5.008)+(15.025), (I-302)+(5.008)+(15.027), (I-302)+(5.008)+(15.047), (I-302)+(5.008)+(15.063), (I-302)+(5.008)+(15.064), (I-302)+(5.009)+(9.002), (I-302)+(5.009)+(15.012), (I-302)+(5.009)+(15.016), (I-302)+(5.009)+(15.025), (I-302)+(5.009)+(15.027), (I-302)+(5.009)+(15.047), (I-302)+(5.009)+(15.063), (I-302)+(5.009)+(15.064), (I-302)+(5.011)+(9.002), (I-302)+(5.011)+(15.012), (I-302)+(5.011)+(15.016), (I-302)+(5.011)+(15.025), (I-302)+(5.011)+(15.027), (I-302)+(5.011)+(15.047), (I-302)+(5.011)+(15.063), (I-302)+(5.011)+(15.064), (I-302)+(5.012)+(9.002), (I-302)+(5.012)+(15.012), (I-302)+(5.012)+(15.016), (I-302)+(5.012)+(15.025), (I-302)+(5.012)+(15.027), (I-302)+(5.012)+(15.047), (I-302)+(5.012)+(15.063), (I-302)+(5.012)+(15.064), (I-302)+(5.013)+(9.002), (I-302)+(5.013)+(15.012), (I-302)+(5.013)+(15.016), (I-302)+(5.013)+(15.025), (I-302)+(5.013)+(15.027), (I-302)+(5.013)+(15.047), (I-302)+(5.013)+(15.063), (I-302)+(5.013)+(15.064), (I-302)+(5.015)+(9.002), (I-302)+(5.015)+(15.012), (I-302)+(5.015)+(15.016), (I-302)+(5.015)+(15.025), (I-302)+(5.015)+(15.027), (I-302)+(5.015)+(15.047), (I-302)+(5.015)+(15.063), (I-302)+(5.015)+(15.064), (I-302)+(5.018)+(9.002), (I-302)+(5.018)+(15.012), (I-302)+(5.018)+(15.016), (I-302)+(5.018)+(15.025), (I-302)+(5.018)+(15.027), (I-302)+(5.018)+(15.047), (I-302)+(5.018)+(15.063), (I-302)+(5.018)+(15.064), (I-302)+(5.019)+(9.002), (I-302)+(5.019)+(15.012), (I-302)+(5.019)+(15.016), (I-302)+(5.019)+(15.025), (I-302)+(5.019)+(15.027), (I-302)+(5.019)+(15.047), (I-302)+(5.019)+(15.063), (I-302)+(5.019)+(15.064).

If two compounds (B) are present in the combinations according to the invention, preferred compound combinations are also selected from the group (G6-C) consisting of the following mixtures:

(I-339)+(1.001)+(1.002), (I-339)+(1.001)+(1.003), (I-339)+(1.001)+(1.004), (I-339)+(1.001)+(1.005), (I-339)+(1.001)+(1.006), (I-339)+(1.001)+(1.007), (I-339)+(1.001)+(1.008), (I-339)+(1.001)+(1.009), (I-339)+(1.001)+(1.010), (I-339)+(1.001)+(1.011), (I-339)+(1.001)+(1.012), (I-339)+(1.001)+(1.013), (I-339)+(1.001)+(1.014), (I-339)+(1.001)+(1.015), (I-339)+(1.001)+(1.016), (I-339)+(1.001)+(1.017), (I-339)+(1.001)+(1.018), (I-339)+(1.001)+(1.019), (I-339)+(1.001)+(1.020), (I-339)+(1.001)+(1.021), (I-339)+(1.001)+(1.022), (I-339)+(1.001)+(1.023), (I-339)+(1.001)+(1.024), (I-339)+(1.001)+(1.025), (I-339)+(1.001)+(1.026), (I-339)+(1.001)+(1.027), (I-339)+(1.001)+(1.028), (I-339)+(1.001)+(1.029), (I-339)+(1.001)+(1.030), (I-339)+(1.001)+(1.031), (I-339)+(1.001)+(1.032), (I-339)+(1.001)+(1.033), (I-339)+(1.001)+(1.034), (I-339)+(1.001)+(1.035), (I-339)+(1.001)+(1.036), (I-339)+(1.001)+(1.037), (I-339)+(1.001)+(1.038), (I-339)+(1.001)+(1.039), (I-339)+(1.001)+(1.040), (I-339)+(1.001)+(1.041), (I-339)+(1.001)+(1.042), (I-339)+(1.001)+(1.043), (I-339)+(1.001)+(1.044), (I-339)+(1.001)+(1.045), (I-339)+(1.001)+(1.046), (I-339)+(1.001)+(1.047), (I-339)+(1.001)+(1.048), (I-339)+(1.001)+(1.049), (I-339)+(1.001)+(1.050), (I-339)+(1.001)+(1.051), (I-339)+(1.001)+(1.052), (I-339)+(1.001)+(1.053), (I-339)+(1.001)+(1.054), (I-339)+(1.001)+(1.055), (I-339)+(1.001)+(1.056), (I-339)+(1.001)+(1.057), (I-339)+(1.001)+(1.058), (I-339)+(1.001)+(1.059), (I-339)+(1.001)+(1.060), (I-339)+(1.001)+(1.061), (I-339)+(1.001)+(1.062), (I-339)+(1.001)+(1.063), (I-339)+(1.001)+(1.064), (I-339)+(1.001)+(1.065), (I-339)+(1.001)+(1.066), (I-339)+(1.001)+(1.067), (I-339)+(1.001)+(1.068), (I-339)+(1.001)+(1.069), (I-339)+(1.001)+(1.070), (I-339)+(1.001)+(1.071), (I-339)+(1.001)+(1.072), (I-339)+(1.001)+(1.073), (I-339)+(1.001)+(1.074), (I-339)+(1.001)+(1.075), (I-339)+(1.001)+(1.076), (I-339)+(1.001)+(1.077), (I-339)+(1.001)+(1.078), (I-339)+(1.001)+(1.079), (I-339)+(1.001)+(1.080), (I-339)+(1.001)+(1.081), (I-339)+(1.001)+(1.082), (I-339)+(1.001)+(1.083), (I-339)+(1.001)+(1.084), (I-339)+(1.001)+(1.085), (I-339)+(1.001)+(1.086), (I-339)+(1.001)+(1.087), (I-339)+(1.001)+(1.088), (I-339)+(1.001)+(1.089), (I-339)+(1.001)+(1.090), (I-339)+(1.001)+(1.091), (I-339)+(1.001)+(1.092), (I-339)+(1.001)+(2.001), (I-339)+(1.001)+(2.002), (I-339)+(1.001)+(2.003), (I-339)+(1.001)+(2.004), (I-339)+(1.001)+(2.005), (I-339)+(1.001)+(2.006), (I-339)+(1.001)+(2.007), (I-339)+(1.001)+(2.008), (I-339)+(1.001)+(2.009), (I-339)+(1.001)+(2.010), (I-339)+(1.001)+(2.011), (I-339)+(1.001)+(2.012), (I-339)+(1.001)+(2.013), (I-339)+(1.001)+(2.014), (I-339)+(1.001)+(2.015), (I-339)+(1.001)+(2.016), (I-339)+(1.001)+(2.017), (I-339)+(1.001)+(2.018), (I-339)+(1.001)+(2.019), (I-339)+(1.001)+(2.020), (I-339)+(1.001)+(2.021), (I-339)+(1.001)+(2.022), (I-339)+(1.001)+(2.023), (I-339)+(1.001)+(2.024), (I-339)+(1.001)+(2.025), (I-339)+(1.001)+(2.026), (I-339)+(1.001)+(2.027), (I-339)+(1.001)+(2.028), (I-339)+(1.001)+(2.029), (I-339)+(1.001)+(2.030), (I-339)+(1.001)+(2.031), (I-339)+(1.001)+(2.032), (I-339)+(1.001)+(2.033), (I-339)+(1.001)+(2.034), (I-339)+(1.001)+(2.035), (I-339)+(1.001)+(2.036), (I-339)+(1.001)+(2.037), (I-339)+(1.001)+(2.038), (I-339)+(1.001)+(2.039), (I-339)+(1.001)+(2.040), (I-339)+(1.001)+(2.041), (I-339)+(1.001)+(2.042), (I-339)+(1.001)+(2.043), (I-339)+(1.001)+(2.044), (I-339)+(1.001)+(2.045), (I-339)+(1.001)+(2.046), (I-339)+(1.001)+(2.047), (I-339)+(1.001)+(2.048), (I-339)+(1.001)+(2.049), (I-339)+(1.001)+(2.050), (I-339)+(1.001)+(2.051), (I-339)+(1.001)+(2.052), (I-339)+(1.001)+(2.053), (I-339)+(1.001)+(2.054), (I-339)+(1.001)+(2.055), (I-339)+(1.001)+(2.056), (I-339)+(1.001)+(2.057), (I-339)+(1.001)+(2.058), (I-339)+(1.001)+(2.059), (I-339)+(1.001)+(3.001), (I-339)+(1.001)+(3.002), (I-339)+(1.001)+(3.003), (I-339)+(1.001)+(3.004), (I-339)+(1.001)+(3.005), (I-339)+(1.001)+(3.006), (I-339)+(1.001)+(3.007), (I-339)+(1.001)+(3.008), (I-339)+(1.001)+(3.009), (I-339)+(1.001)+(3.010), (I-339)+(1.001)+(3.011), (I-339)+(1.001)+(3.012), (I-339)+(1.001)+(3.013), (I-339)+(1.001)+(3.014), (I-339)+(1.001)+(3.015), (I-339)+(1.001)+(3.016), (I-339)+(1.001)+(3.017), (I-339)+(1.001)+(3.018), (I-339)+(1.001)+(3.019), (I-339)+(1.001)+(3.020), (I-339)+(1.001)+(3.021), (I-339)+(1.001)+(3.022), (I-339)+(1.001)+(3.023), (I-339)+(1.001)+(3.024), (I-339)+(1.001)+(3.025), (I-339)+(1.001)+(3.026), (I-339)+(1.001)+(3.027), (I-339)+(1.001)+(3.028), (I-339)+(1.001)+(3.029), (I-339)+(1.001)+(3.030), (I-339)+(1.001)+(3.031), (I-339)+(1.001)+(5.001), (I-339)+(1.001)+(5.002), (I-339)+(1.001)+(5.003), (I-339)+(1.001)+(5.004), (I-339)+(1.001)+(5.005), (I-339)+(1.001)+(5.006), (I-339)+(1.001)+(5.007), (I-339)+(1.001)+(5.008), (I-339)+(1.001)+(5.009), (I-339)+(1.001)+(5.010), (I-339)+(1.001)+(5.011), (I-339)+(1.001)+(5.012), (I-339)+(1.001)+(5.013), (I-339)+(1.001)+(5.014), (I-339)+(1.001)+(5.015), (I-339)+(1.001)+(5.016), (I-339)+(1.001)+(5.017), (I-339)+(1.001)+(5.018), (I-339)+(1.001)+(5.019), (I-339)+(1.001)+(5.020), (I-339)+(1.001)+(5.021), (I-339)+(1.001)+(5.022), (I-339)+(1.001)+(5.023), (I-339)+(1.001)+(6.001), (I-339)+(1.001)+(6.002), (I-339)+(1.001)+(6.003), (I-339)+(1.001)+(6.004), (I-339)+(1.001)+(7.001), (I-339)+(1.001)+(7.002), (I-339)+(1.001)+(7.003), (I-339)+(1.001)+(7.004), (I-339)+(1.001)+(7.005), (I-339)+(1.001)+(7.006), (I-339)+(1.001)+(9.001), (I-339)+(1.001)+(9.002), (I-339)+(1.001)+(9.003), (I-339)+(1.001)+(9.004), (I-339)+(1.001)+(9.005), (I-339)+(1.001)+(9.006), (I-339)+(1.001)+(9.007), (I-339)+(1.001)+(9.008), (I-339)+(1.001)+(9.009), (I-339)+(1.001)+(14.001), (I-339)+(1.001)+(14.002), (I-339)+(1.001)+(15.008), (I-339)+(1.001)+(15.011), (I-339)+(1.001)+(15.012), (I-339)+(1.001)+(15.016), (I-339)+(1.001)+(15.025), (I-339)+(1.001)+(15.027), (I-339)+(1.001)+(15.047), (I-339)+(1.001)+(15.063), (I-339)+(1.001)+(15.064), (I-339)+(1.001)+(16.001), (I-339)+(1.001)+(16.002), (I-339)+(1.001)+(16.003), (I-339)+(1.001)+(16.004), (I-339)+(1.001)+(16.005), (I-339)+(1.001)+(16.006), (I-339)+(1.001)+(16.007), (I-339)+(1.001)+(16.008), (I-339)+(1.001)+(17.001), (I-339)+(1.001)+(17.002), (I-339)+(1.001)+(17.003), (I-339)+(1.001)+(17.004), (I-339)+(1.001)+(17.005), (I-339)+(1.001)+(17.006), (I-339)+(1.001)+(17.007), (I-339)+(1.001)+(17.008), (I-339)+(1.001)+(17.009), (I-339)+(1.001)+(17.010), (I-339)+(1.001)+(17.011), (I-339)+(1.001)+(17.012), (I-339)+(1.001)+(18.001), (I-339)+(1.002)+(1.003), (I-339)+(1.002)+(1.004), (I-339)+(1.002)+(1.005), (I-339)+(1.002)+(1.006), (I-339)+(1.002)+(1.007), (I-339)+(1.002)+(1.008), (I-339)+(1.002)+(1.009), (I-339)+(1.002)+(1.010), (I-339)+(1.002)+(1.011), (I-339)+(1.002)+(1.012), (I-339)+(1.002)+(1.013), (I-339)+(1.002)+(1.014), (I-339)+(1.002)+(1.015), (I-339)+(1.002)+(1.016), (I-339)+(1.002)+(1.017), (I-339)+(1.002)+(1.018), (I-339)+(1.002)+(1.019), (I-339)+(1.002)+(1.020), (I-339)+(1.002)+(1.021), (I-339)+(1.002)+(1.022), (I-339)+(1.002)+(1.023), (I-339)+(1.002)+(1.024), (I-339)+(1.002)+(1.025), (I-339)+(1.002)+(1.026), (I-339)+(1.002)+(1.027), (I-339)+(1.002)+(1.028), (I-339)+(1.002)+(1.029), (I-339)+(1.002)+(1.030), (I-339)+(1.002)+(1.031), (I-339)+(1.002)+(1.032), (I-339)+(1.002)+(1.033), (I-339)+(1.002)+(1.034), (I-339)+(1.002)+(1.035), (I-339)+(1.002)+(1.036), (I-339)+(1.002)+(1.037), (I-339)+(1.002)+(1.038), (I-339)+(1.002)+(1.039), (I-339)+(1.002)+(1.040), (I-339)+(1.002)+(1.041), (I-339)+(1.002)+(1.042), (I-339)+(1.002)+(1.043), (I-339)+(1.002)+(1.044), (I-339)+(1.002)+(1.045), (I-339)+(1.002)+(1.046), (I-339)+(1.002)+(1.047), (I-339)+(1.002)+(1.048), (I-339)+(1.002)+(1.049), (I-339)+(1.002)+(1.050), (I-339)+(1.002)+(1.051), (I-339)+(1.002)+(1.052), (I-339)+(1.002)+(1.053), (I-339)+(1.002)+(1.054), (I-339)+(1.002)+(1.055), (I-339)+(1.002)+(1.056), (I-339)+(1.002)+(1.057), (I-339)+(1.002)+(1.058), (I-339)+(1.002)+(1.059), (I-339)+(1.002)+(1.060), (I-339)+(1.002)+(1.061), (I-339)+(1.002)+(1.062), (I-339)+(1.002)+(1.063), (I-339)+(1.002)+(1.064), (I-339)+(1.002)+(1.065), (I-339)+(1.002)+(1.066), (I-339)+(1.002)+(1.067), (I-339)+(1.002)+(1.068), (I-339)+(1.002)+(1.069), (I-339)+(1.002)+(1.070), (I-339)+(1.002)+(1.071), (I-339)+(1.002)+(1.072), (I-339)+(1.002)+(1.073), (I-339)+(1.002)+(1.074), (I-339)+(1.002)+(1.075), (I-339)+(1.002)+(1.076), (I-339)+(1.002)+(1.077), (I-339)+(1.002)+(1.078), (I-339)+(1.002)+(1.079), (I-339)+(1.002)+(1.080), (I-339)+(1.002)+(1.081), (I-339)+(1.002)+(1.082), (I-339)+(1.002)+(1.083), (I-339)+(1.002)+(1.084), (I-339)+(1.002)+(1.085), (I-339)+(1.002)+(1.086), (I-339)+(1.002)+(1.087), (I-339)+(1.002)+(1.088), (I-339)+(1.002)+(1.089), (I-339)+(1.002)+(1.090), (I-339)+(1.002)+(1.091), (I-339)+(1.002)+(1.092), (I-339)+(1.002)+(2.001), (I-339)+(1.002)+(2.002), (I-339)+(1.002)+(2.003), (I-339)+(1.002)+(2.004), (I-339)+(1.002)+(2.005), (I-339)+(1.002)+(2.006), (I-339)+(1.002)+(2.007), (I-339)+(1.002)+(2.008), (I-339)+(1.002)+(2.009), (I-339)+(1.002)+(2.010), (I-339)+(1.002)+(2.011), (I-339)+(1.002)+(2.012), (I-339)+(1.002)+(2.013), (I-339)+(1.002)+(2.014), (I-339)+(1.002)+(2.015), (I-339)+(1.002)+(2.016), (I-339)+(1.002)+(2.017), (I-339)+(1.002)+(2.018), (I-339)+(1.002)+(2.019), (I-339)+(1.002)+(2.020), (I-339)+(1.002)+(2.021), (I-339)+(1.002)+(2.022), (I-339)+(1.002)+(2.023), (I-339)+(1.002)+(2.024), (I-339)+(1.002)+(2.025), (I-339)+(1.002)+(2.026), (I-339)+(1.002)+(2.027), (I-339)+(1.002)+(2.028), (I-339)+(1.002)+(2.029), (I-339)+(1.002)+(2.030), (I-339)+(1.002)+(2.031), (I-339)+(1.002)+(2.032), (I-339)+(1.002)+(2.033), (I-339)+(1.002)+(2.034), (I-339)+(1.002)+(2.035), (I-339)+(1.002)+(2.036), (I-339)+(1.002)+(2.037), (I-339)+(1.002)+(2.038), (I-339)+(1.002)+(2.039), (I-339)+(1.002)+(2.040), (I-339)+(1.002)+(2.041), (I-339)+(1.002)+(2.042), (I-339)+(1.002)+(2.043), (I-339)+(1.002)+(2.044), (I-339)+(1.002)+(2.045), (I-339)+(1.002)+(2.046), (I-339)+(1.002)+(2.047), (I-339)+(1.002)+(2.048), (I-339)+(1.002)+(2.049), (I-339)+(1.002)+(2.050), (I-339)+(1.002)+(2.051), (I-339)+(1.002)+(2.052), (I-339)+(1.002)+(2.053), (I-339)+(1.002)+(2.054), (I-339)+(1.002)+(2.055), (I-339)+(1.002)+(2.056), (I-339)+(1.002)+(2.057), (I-339)+(1.002)+(2.058), (I-339)+(1.002)+(2.059), (I-339)+(1.002)+(3.001), (I-339)+(1.002)+(3.002), (I-339)+(1.002)+(3.003), (I-339)+(1.002)+(3.004), (I-339)+(1.002)+(3.005), (I-339)+(1.002)+(3.006), (I-339)+(1.002)+(3.007), (I-339)+(1.002)+(3.008), (I-339)+(1.002)+(3.009), (I-339)+(1.002)+(3.010), (I-339)+(1.002)+(3.011), (I-339)+(1.002)+(3.012), (I-339)+(1.002)+(3.013), (I-339)+(1.002)+(3.014), (I-339)+(1.002)+(3.015), (I-339)+(1.002)+(3.016), (I-339)+(1.002)+(3.017), (I-339)+(1.002)+(3.018), (I-339)+(1.002)+(3.019), (I-339)+(1.002)+(3.020), (I-339)+(1.002)+(3.021), (I-339)+(1.002)+(3.022), (I-339)+(1.002)+(3.023), (I-339)+(1.002)+(3.024), (I-339)+(1.002)+(3.025), (I-339)+(1.002)+(3.026), (I-339)+(1.002)+(3.027), (I-339)+(1.002)+(3.028), (I-339)+(1.002)+(3.029), (I-339)+(1.002)+(3.030), (I-339)+(1.002)+(3.031), (I-339)+(1.002)+(5.001), (I-339)+(1.002)+(5.002), (I-339)+(1.002)+(5.003), (I-339)+(1.002)+(5.004), (I-339)+(1.002)+(5.005), (I-339)+(1.002)+(5.006), (I-339)+(1.002)+(5.007), (I-339)+(1.002)+(5.008), (I-339)+(1.002)+(5.009), (I-339)+(1.002)+(5.010), (I-339)+(1.002)+(5.011), (I-339)+(1.002)+(5.012), (I-339)+(1.002)+(5.013), (I-339)+(1.002)+(5.014), (I-339)+(1.002)+(5.015), (I-339)+(1.002)+(5.016), (I-339)+(1.002)+(5.017), (I-339)+(1.002)+(5.018), (I-339)+(1.002)+(5.019), (I-339)+(1.002)+(5.020), (I-339)+(1.002)+(5.021), (I-339)+(1.002)+(5.022), (I-339)+(1.002)+(5.023), (I-339)+(1.002)+(6.001), (I-339)+(1.002)+(6.002), (I-339)+(1.002)+(6.003), (I-339)+(1.002)+(6.004), (I-339)+(1.002)+(7.001), (I-339)+(1.002)+(7.002), (I-339)+(1.002)+(7.003), (I-339)+(1.002)+(7.004), (I-339)+(1.002)+(7.005), (I-339)+(1.002)+(7.006), (I-339)+(1.002)+(9.001), (I-339)+(1.002)+(9.002), (I-339)+(1.002)+(9.003), (I-339)+(1.002)+(9.004), (I-339)+(1.002)+(9.005), (I-339)+(1.002)+(9.006), (I-339)+(1.002)+(9.007), (I-339)+(1.002)+(9.008), (I-339)+(1.002)+(9.009), (I-339)+(1.002)+(14.001), (I-339)+(1.002)+(14.002), (I-339)+(1.002)+(15.008), (I-339)+(1.002)+(15.011), (I-339)+(1.002)+(15.012), (I-339)+(1.002)+(15.016), (I-339)+(1.002)+(15.025), (I-339)+(1.002)+(15.027), (I-339)+(1.002)+(15.047), (I-339)+(1.002)+(15.063), (I-339)+(1.002)+(15.064), (I-339)+(1.002)+(16.001), (I-339)+(1.002)+(16.002), (I-339)+(1.002)+(16.003), (I-339)+(1.002)+(16.004), (I-339)+(1.002)+(16.005), (I-339)+(1.002)+(16.006), (I-339)+(1.002)+(16.007), (I-339)+(1.002)+(16.008), (I-339)+(1.002)+(17.001), (I-339)+(1.002)+(17.002), (I-339)+(1.002)+(17.003), (I-339)+(1.002)+(17.004), (I-339)+(1.002)+(17.005), (I-339)+(1.002)+(17.006), (I-339)+(1.002)+(17.007), (I-339)+(1.002)+(17.008), (I-339)+(1.002)+(17.009), (I-339)+(1.002)+(17.010), (I-339)+(1.002)+(17.011), (I-339)+(1.002)+(17.012), (I-339)+(1.002)+(18.001), (I-339)+(1.003)+(1.004), (I-339)+(1.003)+(1.005), (I-339)+(1.003)+(1.006), (I-339)+(1.003)+(1.007), (I-339)+(1.003)+(1.008), (I-339)+(1.003)+(1.009), (I-339)+(1.003)+(1.010), (I-339)+(1.003)+(1.011), (I-339)+(1.003)+(1.012), (I-339)+(1.003)+(1.013), (I-339)+(1.003)+(1.014), (I-339)+(1.003)+(1.015), (I-339)+(1.003)+(1.016), (I-339)+(1.003)+(1.017), (I-339)+(1.003)+(1.018), (I-339)+(1.003)+(1.019), (I-339)+(1.003)+(1.020), (I-339)+(1.003)+(1.021), (I-339)+(1.003)+(1.022), (I-339)+(1.003)+(1.023), (I-339)+(1.003)+(1.024), (I-339)+(1.003)+(1.025), (I-339)+(1.003)+(1.026), (I-339)+(1.003)+(1.027), (I-339)+(1.003)+(1.028), (I-339)+(1.003)+(1.029), (I-339)+(1.003)+(1.030), (I-339)+(1.003)+(1.031), (I-339)+(1.003)+(1.032), (I-339)+(1.003)+(1.033), (I-339)+(1.003)+(1.034), (I-339)+(1.003)+(1.035), (I-339)+(1.003)+(1.036), (I-339)+(1.003)+(1.037), (I-339)+(1.003)+(1.038), (I-339)+(1.003)+(1.039), (I-339)+(1.003)+(1.040), (I-339)+(1.003)+(1.041), (I-339)+(1.003)+(1.042), (I-339)+(1.003)+(1.043), (I-339)+(1.003)+(1.044), (I-339)+(1.003)+(1.045), (I-339)+(1.003)+(1.046), (I-339)+(1.003)+(1.047), (I-339)+(1.003)+(1.048), (I-339)+(1.003)+(1.049), (I-339)+(1.003)+(1.050), (I-339)+(1.003)+(1.051), (I-339)+(1.003)+(1.052), (I-339)+(1.003)+(1.053), (I-339)+(1.003)+(1.054), (I-339)+(1.003)+(1.055), (I-339)+(1.003)+(1.056), (I-339)+(1.003)+(1.057), (I-339)+(1.003)+(1.058), (I-339)+(1.003)+(1.059), (I-339)+(1.003)+(1.060), (I-339)+(1.003)+(1.061), (I-339)+(1.003)+(1.062), (I-339)+(1.003)+(1.063), (I-339)+(1.003)+(1.064), (I-339)+(1.003)+(1.065), (I-339)+(1.003)+(1.066), (I-339)+(1.003)+(1.067), (I-339)+(1.003)+(1.068), (I-339)+(1.003)+(1.069), (I-339)+(1.003)+(1.070), (I-339)+(1.003)+(1.071), (I-339)+(1.003)+(1.072), (I-339)+(1.003)+(1.073), (I-339)+(1.003)+(1.074), (I-339)+(1.003)+(1.075), (I-339)+(1.003)+(1.076), (I-339)+(1.003)+(1.077), (I-339)+(1.003)+(1.078), (I-339)+(1.003)+(1.079), (I-339)+(1.003)+(1.080), (I-339)+(1.003)+(1.081), (I-339)+(1.003)+(1.082), (I-339)+(1.003)+(1.083), (I-339)+(1.003)+(1.084), (I-339)+(1.003)+(1.085), (I-339)+(1.003)+(1.086), (I-339)+(1.003)+(1.087), (I-339)+(1.003)+(1.088), (I-339)+(1.003)+(1.089), (I-339)+(1.003)+(1.090), (I-339)+(1.003)+(1.091), (I-339)+(1.003)+(1.092), (I-339)+(1.003)+(2.001), (I-339)+(1.003)+(2.002), (I-339)+(1.003)+(2.003), (I-339)+(1.003)+(2.004), (I-339)+(1.003)+(2.005), (I-339)+(1.003)+(2.006), (I-339)+(1.003)+(2.007), (I-339)+(1.003)+(2.008), (I-339)+(1.003)+(2.009), (I-339)+(1.003)+(2.010), (I-339)+(1.003)+(2.011), (I-339)+(1.003)+(2.012), (I-339)+(1.003)+(2.013), (I-339)+(1.003)+(2.014), (I-339)+(1.003)+(2.015), (I-339)+(1.003)+(2.016), (I-339)+(1.003)+(2.017), (I-339)+(1.003)+(2.018), (I-339)+(1.003)+(2.019), (I-339)+(1.003)+(2.020), (I-339)+(1.003)+(2.021), (I-339)+(1.003)+(2.022), (I-339)+(1.003)+(2.023), (I-339)+(1.003)+(2.024), (I-339)+(1.003)+(2.025), (I-339)+(1.003)+(2.026), (I-339)+(1.003)+(2.027), (I-339)+(1.003)+(2.028), (I-339)+(1.003)+(2.029), (I-339)+(1.003)+(2.030), (I-339)+(1.003)+(2.031), (I-339)+(1.003)+(2.032), (I-339)+(1.003)+(2.033), (I-339)+(1.003)+(2.034), (I-339)+(1.003)+(2.035), (I-339)+(1.003)+(2.036), (I-339)+(1.003)+(2.037), (I-339)+(1.003)+(2.038), (I-339)+(1.003)+(2.039), (I-339)+(1.003)+(2.040), (I-339)+(1.003)+(2.041), (I-339)+(1.003)+(2.042), (I-339)+(1.003)+(2.043), (I-339)+(1.003)+(2.044), (I-339)+(1.003)+(2.045), (I-339)+(1.003)+(2.046), (I-339)+(1.003)+(2.047), (I-339)+(1.003)+(2.048), (I-339)+(1.003)+(2.049), (I-339)+(1.003)+(2.050), (I-339)+(1.003)+(2.051), (I-339)+(1.003)+(2.052), (I-339)+(1.003)+(2.053), (I-339)+(1.003)+(2.054), (I-339)+(1.003)+(2.055), (I-339)+(1.003)+(2.056), (I-339)+(1.003)+(2.057), (I-339)+(1.003)+(2.058), (I-339)+(1.003)+(2.059), (I-339)+(1.003)+(3.001), (I-339)+(1.003)+(3.002), (I-339)+(1.003)+(3.003), (I-339)+(1.003)+(3.004), (I-339)+(1.003)+(3.005), (I-339)+(1.003)+(3.006), (I-339)+(1.003)+(3.007), (I-339)+(1.003)+(3.008), (I-339)+(1.003)+(3.009), (I-339)+(1.003)+(3.010), (I-339)+(1.003)+(3.011), (I-339)+(1.003)+(3.012), (I-339)+(1.003)+(3.013), (I-339)+(1.003)+(3.014), (I-339)+(1.003)+(3.015), (I-339)+(1.003)+(3.016), (I-339)+(1.003)+(3.017), (I-339)+(1.003)+(3.018), (I-339)+(1.003)+(3.019), (I-339)+(1.003)+(3.020), (I-339)+(1.003)+(3.021), (I-339)+(1.003)+(3.022), (I-339)+(1.003)+(3.023), (I-339)+(1.003)+(3.024), (I-339)+(1.003)+(3.025), (I-339)+(1.003)+(3.026), (I-339)+(1.003)+(3.027), (I-339)+(1.003)+(3.028), (I-339)+(1.003)+(3.029), (I-339)+(1.003)+(3.030), (I-339)+(1.003)+(3.031), (I-339)+(1.003)+(5.001), (I-339)+(1.003)+(5.002), (I-339)+(1.003)+(5.003), (I-339)+(1.003)+(5.004), (I-339)+(1.003)+(5.005), (I-339)+(1.003)+(5.006), (I-339)+(1.003)+(5.007), (I-339)+(1.003)+(5.008), (I-339)+(1.003)+(5.009), (I-339)+(1.003)+(5.010), (I-339)+(1.003)+(5.011), (I-339)+(1.003)+(5.012), (I-339)+(1.003)+(5.013), (I-339)+(1.003)+(5.014), (I-339)+(1.003)+(5.015), (I-339)+(1.003)+(5.016), (I-339)+(1.003)+(5.017), (I-339)+(1.003)+(5.018), (I-339)+(1.003)+(5.019), (I-339)+(1.003)+(5.020), (I-339)+(1.003)+(5.021), (I-339)+(1.003)+(5.022), (I-339)+(1.003)+(5.023), (I-339)+(1.003)+(6.001), (I-339)+(1.003)+(6.002), (I-339)+(1.003)+(6.003), (I-339)+(1.003)+(6.004), (I-339)+(1.003)+(7.001), (I-339)+(1.003)+(7.002), (I-339)+(1.003)+(7.003), (I-339)+(1.003)+(7.004), (I-339)+(1.003)+(7.005), (I-339)+(1.003)+(7.006), (I-339)+(1.003)+(9.001), (I-339)+(1.003)+(9.002), (I-339)+(1.003)+(9.003), (I-339)+(1.003)+(9.004), (I-339)+(1.003)+(9.005), (I-339)+(1.003)+(9.006), (I-339)+(1.003)+(9.007), (I-339)+(1.003)+(9.008), (I-339)+(1.003)+(9.009), (I-339)+(1.003)+(14.001), (I-339)+(1.003)+(14.002), (I-339)+(1.003)+(15.008), (I-339)+(1.003)+(15.011), (I-339)+(1.003)+(15.012), (I-339)+(1.003)+(15.016), (I-339)+(1.003)+(15.025), (I-339)+(1.003)+(15.027), (I-339)+(1.003)+(15.047), (I-339)+(1.003)+(15.063), (I-339)+(1.003)+(15.064), (I-339)+(1.003)+(16.001), (I-339)+(1.003)+(16.002), (I-339)+(1.003)+(16.003), (I-339)+(1.003)+(16.004), (I-339)+(1.003)+(16.005), (I-339)+(1.003)+(16.006), (I-339)+(1.003)+(16.007), (I-339)+(1.003)+(16.008), (I-339)+(1.003)+(17.001), (I-339)+(1.003)+(17.002), (I-339)+(1.003)+(17.003), (I-339)+(1.003)+(17.004), (I-339)+(1.003)+(17.005), (I-339)+(1.003)+(17.006), (I-339)+(1.003)+(17.007), (I-339)+(1.003)+(17.008), (I-339)+(1.003)+(17.009), (I-339)+(1.003)+(17.010), (I-339)+(1.003)+(17.011), (I-339)+(1.003)+(17.012), (I-339)+(1.003)+(18.001),
(I-339)+(1.004)+(1.005), (I-339)+(1.004)+(1.006), (I-339)+(1.004)+(1.007), (I-339)+(1.004)+(1.008), (I-339)+(1.004)+(1.009), (I-339)+(1.004)+(1.010), (I-339)+(1.004)+(1.011), (I-339)+(1.004)+(1.012), (I-339)+(1.004)+(1.013), (I-339)+(1.004)+(1.014), (I-339)+(1.004)+(1.015), (I-339)+(1.004)+(1.016), (I-339)+(1.004)+(1.017), (I-339)+(1.004)+(1.018), (I-339)+(1.004)+(1.019), (I-339)+(1.004)+(1.020), (I-339)+(1.004)+(1.021), (I-339)+(1.004)+(1.022), (I-339)+(1.004)+(1.023), (I-339)+(1.004)+(1.024), (I-339)+(1.004)+(1.025), (I-339)+(1.004)+(1.026), (I-339)+(1.004)+(1.027), (I-339)+(1.004)+(1.028), (I-339)+(1.004)+(1.029), (I-339)+(1.004)+(1.030), (I-339)+(1.004)+(1.031), (I-339)+(1.004)+(1.032), (I-339)+(1.004)+(1.033), (I-339)+(1.004)+(1.034), (I-339)+(1.004)+(1.035), (I-339)+(1.004)+(1.036), (I-339)+(1.004)+(1.037), (I-339)+(1.004)+(1.038), (I-339)+(1.004)+(1.039), (I-339)+(1.004)+(1.040), (I-339)+(1.004)+(1.041), (I-339)+(1.004)+(1.042), (I-339)+(1.004)+(1.043), (I-339)+(1.004)+(1.044), (I-339)+(1.004)+(1.045), (I-339)+(1.004)+(1.046), (I-339)+(1.004)+(1.047), (I-339)+(1.004)+(1.048), (I-339)+(1.004)+(1.049), (I-339)+(1.004)+(1.050), (I-339)+(1.004)+(1.051), (I-339)+(1.004)+(1.052), (I-339)+(1.004)+(1.053), (I-339)+(1.004)+(1.054), (I-339)+(1.004)+(1.055), (I-339)+(1.004)+(1.056), (I-339)+(1.004)+(1.057), (I-339)+(1.004)+(1.058), (I-339)+(1.004)+(1.059), (I-339)+(1.004)+(1.060), (I-339)+(1.004)+(1.061), (I-339)+(1.004)+(1.062), (I-339)+(1.004)+(1.063), (I-339)+(1.004)+(1.064), (I-339)+(1.004)+(1.065), (I-339)+(1.004)+(1.066), (I-339)+(1.004)+(1.067), (I-339)+(1.004)+(1.068), (I-339)+(1.004)+(1.069), (I-339)+(1.004)+(1.070), (I-339)+(1.004)+(1.071), (I-339)+(1.004)+(1.072), (I-339)+(1.004)+(1.073), (I-339)+(1.004)+(1.074), (I-339)+(1.004)+(1.075), (I-339)+(1.004)+(1.076), (I-339)+(1.004)+(1.077), (I-339)+(1.004)+(1.078), (I-339)+(1.004)+(1.079), (I-339)+(1.004)+(1.080), (I-339)+(1.004)+(1.081), (I-339)+(1.004)+(1.082), (I-339)+(1.004)+(1.083), (I-339)+(1.004)+(1.084), (I-339)+(1.004)+(1.085), (I-339)+(1.004)+(1.086), (I-339)+(1.004)+(1.087), (I-339)+(1.004)+(1.088), (I-339)+(1.004)+(1.089), (I-339)+(1.004)+(1.090), (I-339)+(1.004)+(1.091), (I-339)+(1.004)+(1.092), (I-339)+(1.004)+(2.001), (I-339)+(1.004)+(2.002), (I-339)+(1.004)+(2.003), (I-339)+(1.004)+(2.004), (I-339)+(1.004)+(2.005), (I-339)+(1.004)+(2.006), (I-339)+(1.004)+(2.007), (I-339)+(1.004)+(2.008), (I-339)+(1.004)+(2.009), (I-339)+(1.004)+(2.010), (I-339)+(1.004)+(2.011), (I-339)+(1.004)+(2.012), (I-339)+(1.004)+(2.013), (I-339)+(1.004)+(2.014), (I-339)+(1.004)+(2.015), (I-339)+(1.004)+(2.016), (I-339)+(1.004)+(2.017), (I-339)+(1.004)+(2.018), (I-339)+(1.004)+(2.019), (I-339)+(1.004)+(2.020), (I-339)+(1.004)+(2.021), (I-339)+(1.004)+(2.022), (I-339)+(1.004)+(2.023), (I-339)+(1.004)+(2.024), (I-339)+(1.004)+(2.025), (I-339)+(1.004)+(2.026), (I-339)+(1.004)+(2.027), (I-339)+(1.004)+(2.028), (I-339)+(1.004)+(2.029), (I-339)+(1.004)+(2.030), (I-339)+(1.004)+(2.031), (I-339)+(1.004)+(2.032), (I-339)+(1.004)+(2.033), (I-339)+(1.004)+(2.034), (I-339)+(1.004)+(2.035), (I-339)+(1.004)+(2.036), (I-339)+(1.004)+(2.037), (I-339)+(1.004)+(2.038), (I-339)+(1.004)+(2.039), (I-339)+(1.004)+(2.040), (I-339)+(1.004)+(2.041), (I-339)+(1.004)+(2.042), (I-339)+(1.004)+(2.043), (I-339)+(1.004)+(2.044), (I-339)+(1.004)+(2.045), (I-339)+(1.004)+(2.046), (I-339)+(1.004)+(2.047), (I-339)+(1.004)+(2.048), (I-339)+(1.004)+(2.049), (I-339)+(1.004)+(2.050), (I-339)+(1.004)+(2.051), (I-339)+(1.004)+(2.052), (I-339)+(1.004)+(2.053), (I-339)+(1.004)+(2.054), (I-339)+(1.004)+(2.055), (I-339)+(1.004)+(2.056), (I-339)+(1.004)+(2.057), (I-339)+(1.004)+(2.058), (I-339)+(1.004)+(2.059), (I-339)+(1.004)+(3.001), (I-339)+(1.004)+(3.002), (I-339)+(1.004)+(3.003), (I-339)+(1.004)+(3.004), (I-339)+(1.004)+(3.005), (I-339)+(1.004)+(3.006), (I-339)+(1.004)+(3.007), (I-339)+(1.004)+(3.008), (I-339)+(1.004)+(3.009), (I-339)+(1.004)+(3.010), (I-339)+(1.004)+(3.011), (I-339)+(1.004)+(3.012), (I-339)+(1.004)+(3.013), (I-339)+(1.004)+(3.014), (I-339)+(1.004)+(3.015), (I-339)+(1.004)+(3.016), (I-339)+(1.004)+(3.017), (I-339)+(1.004)+(3.018), (I-339)+(1.004)+(3.019), (I-339)+(1.004)+(3.020), (I-339)+(1.004)+(3.021), (I-339)+(1.004)+(3.022), (I-339)+(1.004)+(3.023), (I-339)+(1.004)+(3.024), (I-339)+(1.004)+(3.025), (I-339)+(1.004)+(3.026), (I-339)+(1.004)+(3.027), (I-339)+(1.004)+(3.028), (I-339)+(1.004)+(3.029), (I-339)+(1.004)+(3.030), (I-339)+(1.004)+(3.031), (I-339)+(1.004)+(5.001), (I-339)+(1.004)+(5.002), (I-339)+(1.004)+(5.003), (I-339)+(1.004)+(5.004), (I-339)+(1.004)+(5.005), (I-339)+(1.004)+(5.006), (I-339)+(1.004)+(5.007), (I-339)+(1.004)+(5.008), (I-339)+(1.004)+(5.009), (I-339)+(1.004)+(5.010), (I-339)+(1.004)+(5.011), (I-339)+(1.004)+(5.012), (I-339)+(1.004)+(5.013), (I-339)+(1.004)+(5.014), (I-339)+(1.004)+(5.015), (I-339)+(1.004)+(5.016), (I-339)+(1.004)+(5.017), (I-339)+(1.004)+(5.018), (I-339)+(1.004)+(5.019), (I-339)+(1.004)+(5.020), (I-339)+(1.004)+(5.021), (I-339)+(1.004)+(5.022), (I-339)+(1.004)+(5.023), (I-339)+(1.004)+(6.001), (I-339)+(1.004)+(6.002), (I-339)+(1.004)+(6.003), (I-339)+(1.004)+(6.004), (I-339)+(1.004)+(7.001), (I-339)+(1.004)+(7.002), (I-339)+(1.004)+(7.003), (I-339)+(1.004)+(7.004), (I-339)+(1.004)+(7.005), (I-339)+(1.004)+(7.006), (I-339)+(1.004)+(9.001), (I-339)+(1.004)+(9.002), (I-339)+(1.004)+(9.003), (I-339)+(1.004)+(9.004), (I-339)+(1.004)+(9.005), (I-339)+(1.004)+(9.006), (I-339)+(1.004)+(9.007), (I-339)+(1.004)+(9.008), (I-339)+(1.004)+(9.009), (I-339)+(1.004)+(14.001), (I-339)+(1.004)+(14.002), (I-339)+(1.004)+(15.008), (I-339)+(1.004)+(15.011), (I-339)+(1.004)+(15.012), (I-339)+(1.004)+(15.016), (I-339)+(1.004)+(15.025), (I-339)+(1.004)+(15.027), (I-339)+(1.004)+(15.047), (I-339)+(1.004)+(15.063), (I-339)+(1.004)+(15.064), (I-339)+(1.004)+(16.001), (I-339)+(1.004)+(16.002), (I-339)+(1.004)+(16.003), (I-339)+(1.004)+(16.004), (I-339)+(1.004)+(16.005), (I-339)+(1.004)+(16.006), (I-339)+(1.004)+(16.007), (I-339)+(1.004)+(16.008), (I-339)+(1.004)+(17.001), (I-339)+(1.004)+(17.002), (I-339)+(1.004)+(17.003), (I-339)+(1.004)+(17.004), (I-339)+(1.004)+(17.005), (I-339)+(1.004)+(17.006), (I-339)+(1.004)+(17.007), (I-339)+(1.004)+(17.008), (I-339)+(1.004)+(17.009), (I-339)+(1.004)+(17.010), (I-339)+(1.004)+(17.011), (I-339)+(1.004)+(17.012), (I-339)+(1.004)+(18.001),
(I-339)+(1.005)+(1.006), (I-339)+(1.005)+(1.007), (I-339)+(1.005)+(1.008), (I-339)+(1.005)+(1.009), (I-339)+(1.005)+(1.010), (I-339)+(1.005)+(1.011), (I-339)+(1.005)+(1.012), (I-339)+(1.005)+(1.013), (I-339)+(1.005)+(1.014), (I-339)+(1.005)+(1.015), (I-339)+(1.005)+(1.016), (I-339)+(1.005)+(1.017), (I-339)+(1.005)+(1.018), (I-339)+(1.005)+(1.019), (I-339)+(1.005)+(1.020), (I-339)+(1.005)+(1.021), (I-339)+(1.005)+(1.022), (I-339)+(1.005)+(1.023), (I-339)+(1.005)+(1.024), (I-339)+(1.005)+(1.025), (I-339)+(1.005)+(1.026), (I-339)+(1.005)+(1.027), (I-339)+(1.005)+(1.028), (I-339)+(1.005)+(1.029), (I-339)+(1.005)+(1.030), (I-339)+(1.005)+(1.031), (I-339)+(1.005)+(1.032), (I-339)+(1.005)+(1.033), (I-339)+(1.005)+(1.034), (I-339)+(1.005)+(1.035), (I-339)+(1.005)+(1.036), (I-339)+(1.005)+(1.037), (I-339)+(1.005)+(1.038), (I-339)+(1.005)+(1.039), (I-339)+(1.005)+(1.040), (I-339)+(1.005)+(1.041), (I-339)+(1.005)+(1.042), (I-339)+(1.005)+(1.043), (I-339)+(1.005)+(1.044), (I-339)+(1.005)+(1.045), (I-339)+(1.005)+(1.046), (I-339)+(1.005)+(1.047), (I-339)+(1.005)+(1.048), (I-339)+(1.005)+(1.049), (I-339)+(1.005)+(1.050), (I-339)+(1.005)+(1.051), (I-339)+(1.005)+(1.052), (I-339)+(1.005)+(1.053), (I-339)+(1.005)+(1.054), (I-339)+(1.005)+(1.055), (I-339)+(1.005)+(1.056), (I-339)+(1.005)+(1.057), (I-339)+(1.005)+(1.058), (I-339)+(1.005)+(1.059), (I-339)+(1.005)+(1.060), (I-339)+(1.005)+(1.061), (I-339)+(1.005)+(1.062), (I-339)+(1.005)+(1.063), (I-339)+(1.005)+(1.064), (I-339)+(1.005)+(1.065), (I-339)+(1.005)+(1.066), (I-339)+(1.005)+(1.067), (I-339)+(1.005)+(1.068), (I-339)+(1.005)+(1.069), (I-339)+(1.005)+(1.070), (I-339)+(1.005)+(1.071), (I-339)+(1.005)+(1.072), (I-339)+(1.005)+(1.073), (I-339)+(1.005)+(1.074), (I-339)+(1.005)+(1.075), (I-339)+(1.005)+(1.076), (I-339)+(1.005)+(1.077), (I-339)+(1.005)+(1.078), (I-339)+(1.005)+(1.079), (I-339)+(1.005)+(1.080), (I-339)+(1.005)+(1.081), (I-339)+(1.005)+(1.082), (I-339)+(1.005)+(1.083), (I-339)+(1.005)+(1.084), (I-339)+(1.005)+(1.085), (I-339)+(1.005)+(1.086), (I-339)+(1.005)+(1.087), (I-339)+(1.005)+(1.088), (I-339)+(1.005)+(1.089), (I-339)+(1.005)+(1.090), (I-339)+(1.005)+(1.091), (I-339)+(1.005)+(1.092), (I-339)+(1.005)+(2.001), (I-339)+(1.005)+(2.002), (I-339)+(1.005)+(2.003), (I-339)+(1.005)+(2.004), (I-339)+(1.005)+(2.005), (I-339)+(1.005)+(2.006), (I-339)+(1.005)+(2.007), (I-339)+(1.005)+(2.008), (I-339)+(1.005)+(2.009), (I-339)+(1.005)+(2.010), (I-339)+(1.005)+(2.011), (I-339)+(1.005)+(2.012), (I-339)+(1.005)+(2.013), (I-339)+(1.005)+(2.014), (I-339)+(1.005)+(2.015), (I-339)+(1.005)+(2.016), (I-339)+(1.005)+(2.017), (I-339)+(1.005)+(2.018), (I-339)+(1.005)+(2.019), (I-339)+(1.005)+(2.020), (I-339)+(1.005)+(2.021), (I-339)+(1.005)+(2.022), (I-339)+(1.005)+(2.023), (I-339)+(1.005)+(2.024), (I-339)+(1.005)+(2.025), (I-339)+(1.005)+(2.026), (I-339)+(1.005)+(2.027), (I-339)+(1.005)+(2.028), (I-339)+(1.005)+(2.029), (I-339)+(1.005)+(2.030), (I-339)+(1.005)+(2.031), (I-339)+(1.005)+(2.032), (I-339)+(1.005)+(2.033), (I-339)+(1.005)+(2.034), (I-339)+(1.005)+(2.035), (I-339)+(1.005)+(2.036), (I-339)+(1.005)+(2.037), (I-339)+(1.005)+(2.038), (I-339)+(1.005)+(2.039), (I-339)+(1.005)+(2.040), (I-339)+(1.005)+(2.041), (I-339)+(1.005)+(2.042), (I-339)+(1.005)+(2.043), (I-339)+(1.005)+(2.044), (I-339)+(1.005)+(2.045), (I-339)+(1.005)+(2.046), (I-339)+(1.005)+(2.047), (I-339)+(1.005)+(2.048), (I-339)+(1.005)+(2.049), (I-339)+(1.005)+(2.050), (I-339)+(1.005)+(2.051), (I-339)+(1.005)+(2.052), (I-339)+(1.005)+(2.053), (I-339)+(1.005)+(2.054), (I-339)+(1.005)+(2.055), (I-339)+(1.005)+(2.056), (I-339)+(1.005)+(2.057), (I-339)+(1.005)+(2.058), (I-339)+(1.005)+(2.059), (I-339)+(1.005)+(3.001), (I-339)+(1.005)+(3.002), (I-339)+(1.005)+(3.003), (I-339)+(1.005)+(3.004), (I-339)+(1.005)+(3.005), (I-339)+(1.005)+(3.006), (I-339)+(1.005)+(3.007), (I-339)+(1.005)+(3.008), (I-339)+(1.005)+(3.009), (I-339)+(1.005)+(3.010), (I-339)+(1.005)+(3.011), (I-339)+(1.005)+(3.012), (I-339)+(1.005)+(3.013), (I-339)+(1.005)+(3.014), (I-339)+(1.005)+(3.015), (I-339)+(1.005)+(3.016), (I-339)+(1.005)+(3.017), (I-339)+(1.005)+(3.018), (I-339)+(1.005)+(3.019), (I-339)+(1.005)+(3.020), (I-339)+(1.005)+(3.021), (I-339)+(1.005)+(3.022), (I-339)+(1.005)+(3.023), (I-339)+(1.005)+(3.024), (I-339)+(1.005)+(3.025), (I-339)+(1.005)+(3.026), (I-339)+(1.005)+(3.027), (I-339)+(1.005)+(3.028), (I-339)+(1.005)+(3.029), (I-339)+(1.005)+(3.030), (I-339)+(1.005)+(3.031), (I-339)+(1.005)+(5.001), (I-339)+(1.005)+(5.002), (I-339)+(1.005)+(5.003), (I-339)+(1.005)+(5.004), (I-339)+(1.005)+(5.005), (I-339)+(1.005)+(5.006), (I-339)+(1.005)+(5.007), (I-339)+(1.005)+(5.008), (I-339)+(1.005)+(5.009), (I-339)+(1.005)+(5.010), (I-339)+(1.005)+(5.011), (I-339)+(1.005)+(5.012), (I-339)+(1.005)+(5.013), (I-339)+(1.005)+(5.014), (I-339)+(1.005)+(5.015), (I-339)+(1.005)+(5.016), (I-339)+(1.005)+(5.017), (I-339)+(1.005)+(5.018), (I-339)+(1.005)+(5.019), (I-339)+(1.005)+(5.020), (I-339)+(1.005)+(5.021), (I-339)+(1.005)+(5.022), (I-339)+(1.005)+(5.023), (I-339)+(1.005)+(6.001), (I-339)+(1.005)+(6.002), (I-339)+(1.005)+(6.003), (I-339)+(1.005)+(6.004), (I-339)+(1.005)+(7.001), (I-339)+(1.005)+(7.002), (I-339)+(1.005)+(7.003), (I-339)+(1.005)+(7.004), (I-339)+(1.005)+(7.005), (I-339)+(1.005)+(7.006), (I-339)+(1.005)+(9.001), (I-339)+(1.005)+(9.002), (I-339)+(1.005)+(9.003), (I-339)+(1.005)+(9.004), (I-339)+(1.005)+(9.005), (I-339)+(1.005)+(9.006), (I-339)+(1.005)+(9.007), (I-339)+(1.005)+(9.008), (I-339)+(1.005)+(9.009), (I-339)+(1.005)+(14.001), (I-339)+(1.005)+(14.002), (I-339)+(1.005)+(15.008), (I-339)+(1.005)+(15.011), (I-339)+(1.005)+(15.012), (I-339)+(1.005)+(15.016), (I-339)+(1.005)+(15.025), (I-339)+(1.005)+(15.027), (I-339)+(1.005)+(15.047), (I-339)+(1.005)+(15.063), (I-339)+(1.005)+(15.064), (I-339)+(1.005)+(16.001), (I-339)+(1.005)+(16.002), (I-339)+(1.005)+(16.003), (I-339)+(1.005)+(16.004), (I-339)+(1.005)+(16.005), (I-339)+(1.005)+(16.006), (I-339)+(1.005)+(16.007), (I-339)+(1.005)+(16.008), (I-339)+(1.005)+(17.001), (I-339)+(1.005)+(17.002), (I-339)+(1.005)+(17.003), (I-339)+(1.005)+(17.004), (I-339)+(1.005)+(17.005), (I-339)+(1.005)+(17.006), (I-339)+(1.005)+(17.007), (I-339)+(1.005)+(17.008), (I-339)+(1.005)+(17.009), (I-339)+(1.005)+(17.010), (I-339)+(1.005)+(17.011), (I-339)+(1.005)+(17.012), (I-339)+(1.005)+(18.001), (I-339)+(1.006)+(1.007), (I-339)+(1.006)+(1.008), (I-339)+(1.006)+(1.009), (I-339)+(1.006)+(1.010), (I-339)+(1.006)+(1.011), (I-339)+(1.006)+(1.012), (I-339)+(1.006)+(1.013), (I-339)+(1.006)+(1.014), (I-339)+(1.006)+(1.015), (I-339)+(1.006)+(1.016), (I-339)+(1.006)+(1.017), (I-339)+(1.006)+(1.018), (I-339)+(1.006)+(1.019), (I-339)+(1.006)+(1.020), (I-339)+(1.006)+(1.021), (I-339)+(1.006)+(1.022), (I-339)+(1.006)+(1.023), (I-339)+(1.006)+(1.024), (I-339)+(1.006)+(1.025), (I-339)+(1.006)+(1.026), (I-339)+(1.006)+(1.027), (I-339)+(1.006)+(1.028), (I-339)+(1.006)+(1.029), (I-339)+(1.006)+(1.030), (I-339)+(1.006)+(1.031), (I-339)+(1.006)+(1.032), (I-339)+(1.006)+(1.033), (I-339)+(1.006)+(1.034), (I-339)+(1.006)+(1.035), (I-339)+(1.006)+(1.036), (I-339)+(1.006)+(1.037), (I-339)+(1.006)+(1.038), (I-339)+(1.006)+(1.039), (I-339)+(1.006)+(1.040), (I-339)+(1.006)+(1.041), (I-339)+(1.006)+(1.042), (I-339)+(1.006)+(1.043), (I-339)+(1.006)+(1.044), (I-339)+(1.006)+(1.045), (I-339)+(1.006)+(1.046), (I-339)+(1.006)+(1.047), (I-339)+(1.006)+(1.048), (I-339)+(1.006)+(1.049), (I-339)+(1.006)+(1.050), (I-339)+(1.006)+(1.051), (I-339)+(1.006)+(1.052), (I-339)+(1.006)+(1.053), (I-339)+(1.006)+(1.054), (I-339)+(1.006)+(1.055), (I-339)+(1.006)+(1.056), (I-339)+(1.006)+(1.057), (I-339)+(1.006)+(1.058), (I-339)+(1.006)+(1.059), (I-339)+(1.006)+(1.060), (I-339)+(1.006)+(1.061), (I-339)+(1.006)+(1.062), (I-339)+(1.006)+(1.063), (I-339)+(1.006)+(1.064), (I-339)+(1.006)+(1.065), (I-339)+(1.006)+(1.066), (I-339)+(1.006)+(1.067), (I-339)+(1.006)+(1.068), (I-339)+(1.006)+(1.069), (I-339)+(1.006)+(1.070), (I-339)+(1.006)+(1.071), (I-339)+(1.006)+(1.072), (I-339)+(1.006)+(1.073), (I-339)+(1.006)+(1.074), (I-339)+(1.006)+(1.075), (I-339)+(1.006)+(1.076), (I-339)+(1.006)+(1.077), (I-339)+(1.006)+(1.078), (I-339)+(1.006)+(1.079), (I-339)+(1.006)+(1.080), (I-339)+(1.006)+(1.081), (I-339)+(1.006)+(1.082), (I-339)+(1.006)+(1.083), (I-339)+(1.006)+(1.084), (I-339)+(1.006)+(1.085), (I-339)+(1.006)+(1.086), (I-339)+(1.006)+(1.087), (I-339)+(1.006)+(1.088), (I-339)+(1.006)+(1.089), (I-339)+(1.006)+(1.090), (I-339)+(1.006)+(1.091), (I-339)+(1.006)+(1.092), (I-339)+(1.006)+(2.001), (I-339)+(1.006)+(2.002), (I-339)+(1.006)+(2.003), (I-339)+(1.006)+(2.004), (I-339)+(1.006)+(2.005), (I-339)+(1.006)+(2.006), (I-339)+(1.006)+(2.007), (I-339)+(1.006)+(2.008), (I-339)+(1.006)+(2.009), (I-339)+(1.006)+(2.010), (I-339)+(1.006)+(2.011), (I-339)+(1.006)+(2.012), (I-339)+(1.006)+(2.013), (I-339)+(1.006)+(2.014), (I-339)+(1.006)+(2.015), (I-339)+(1.006)+(2.016), (I-339)+(1.006)+(2.017), (I-339)+(1.006)+(2.018), (I-339)+(1.006)+(2.019), (I-339)+(1.006)+(2.020), (I-339)+(1.006)+(2.021), (I-339)+(1.006)+(2.022), (I-339)+(1.006)+(2.023), (I-339)+(1.006)+(2.024), (I-339)+(1.006)+(2.025), (I-339)+(1.006)+(2.026), (I-339)+(1.006)+(2.027), (I-339)+(1.006)+(2.028), (I-339)+(1.006)+(2.029), (I-339)+(1.006)+(2.030), (I-339)+(1.006)+(2.031), (I-339)+(1.006)+(2.032), (I-339)+(1.006)+(2.033), (I-339)+(1.006)+(2.034), (I-339)+(1.006)+(2.035), (I-339)+(1.006)+(2.036), (I-339)+(1.006)+(2.037), (I-339)+(1.006)+(2.038), (I-339)+(1.006)+(2.039), (I-339)+(1.006)+(2.040), (I-339)+(1.006)+(2.041), (I-339)+(1.006)+(2.042), (I-339)+(1.006)+(2.043), (I-339)+(1.006)+(2.044), (I-339)+(1.006)+(2.045), (I-339)+(1.006)+(2.046), (I-339)+(1.006)+(2.047), (I-339)+(1.006)+(2.048), (I-339)+(1.006)+(2.049), (I-339)+(1.006)+(2.050), (I-339)+(1.006)+(2.051), (I-339)+(1.006)+(2.052), (I-339)+(1.006)+(2.053), (I-339)+(1.006)+(2.054), (I-339)+(1.006)+(2.055), (I-339)+(1.006)+(2.056), (I-339)+(1.006)+(2.057), (I-339)+(1.006)+(2.058), (I-339)+(1.006)+(2.059), (I-339)+(1.006)+(3.001), (I-339)+(1.006)+(3.002), (I-339)+(1.006)+(3.003), (I-339)+(1.006)+(3.004), (I-339)+(1.006)+(3.005), (I-339)+(1.006)+(3.006), (I-339)+(1.006)+(3.007), (I-339)+(1.006)+(3.008), (I-339)+(1.006)+(3.009), (I-339)+(1.006)+(3.010), (I-339)+(1.006)+(3.011), (I-339)+(1.006)+(3.012), (I-339)+(1.006)+(3.013), (I-339)+(1.006)+(3.014), (I-339)+(1.006)+(3.015), (I-339)+(1.006)+(3.016), (I-339)+(1.006)+(3.017), (I-339)+(1.006)+(3.018), (I-339)+(1.006)+(3.019), (I-339)+(1.006)+(3.020), (I-339)+(1.006)+(3.021), (I-339)+(1.006)+(3.022), (I-339)+(1.006)+(3.023), (I-339)+(1.006)+(3.024), (I-339)+(1.006)+(3.025), (I-339)+(1.006)+(3.026), (I-339)+(1.006)+(3.027), (I-339)+(1.006)+(3.028), (I-339)+(1.006)+(3.029), (I-339)+(1.006)+(3.030), (I-339)+(1.006)+(3.031), (I-339)+(1.006)+(5.001), (I-339)+(1.006)+(5.002), (I-339)+(1.006)+(5.003), (I-339)+(1.006)+(5.004), (I-339)+(1.006)+(5.005), (I-339)+(1.006)+(5.006), (I-339)+(1.006)+(5.007), (I-339)+(1.006)+(5.008), (I-339)+(1.006)+(5.009), (I-339)+(1.006)+(5.010), (I-339)+(1.006)+(5.011), (I-339)+(1.006)+(5.012), (I-339)+(1.006)+(5.013), (I-339)+(1.006)+(5.014), (I-339)+(1.006)+(5.015), (I-339)+(1.006)+(5.016), (I-339)+(1.006)+(5.017), (I-339)+(1.006)+(5.018), (I-339)+(1.006)+(5.019), (I-339)+(1.006)+(5.020), (I-339)+(1.006)+(5.021), (I-339)+(1.006)+(5.022), (I-339)+(1.006)+(5.023), (I-339)+(1.006)+(6.001), (I-339)+(1.006)+(6.002), (I-339)+(1.006)+(6.003), (I-339)+(1.006)+(6.004), (I-339)+(1.006)+(7.001), (I-339)+(1.006)+(7.002), (I-339)+(1.006)+(7.003), (I-339)+(1.006)+(7.004), (I-339)+(1.006)+(7.005), (I-339)+(1.006)+(7.006), (I-339)+(1.006)+(9.001), (I-339)+(1.006)+(9.002), (I-339)+(1.006)+(9.003), (I-339)+(1.006)+(9.004), (I-339)+(1.006)+(9.005), (I-339)+(1.006)+(9.006), (I-339)+(1.006)+(9.007), (I-339)+(1.006)+(9.008), (I-339)+(1.006)+(9.009), (I-339)+(1.006)+(14.001), (I-339)+(1.006)+(14.002), (I-339)+(1.006)+(15.008), (I-339)+(1.006)+(15.011), (I-339)+(1.006)+(15.012), (I-339)+(1.006)+(15.016), (I-339)+(1.006)+(15.025), (I-339)+(1.006)+(15.027), (I-339)+(1.006)+(15.047), (I-339)+(1.006)+(15.063), (I-339)+(1.006)+(15.064), (I-339)+(1.006)+(16.001), (I-339)+(1.006)+(16.002), (I-339)+(1.006)+(16.003), (I-339)+(1.006)+(16.004), (I-339)+(1.006)+(16.005), (I-339)+(1.006)+(16.006), (I-339)+(1.006)+(16.007), (I-339)+(1.006)+(16.008), (I-339)+(1.006)+(17.001), (I-339)+(1.006)+(17.002), (I-339)+(1.006)+(17.003), (I-339)+(1.006)+(17.004), (I-339)+(1.006)+(17.005), (I-339)+(1.006)+(17.006), (I-339)+(1.006)+(17.007), (I-339)+(1.006)+(17.008), (I-339)+(1.006)+(17.009), (I-339)+(1.006)+(17.010), (I-339)+(1.006)+(17.011), (I-339)+(1.006)+(17.012), (I-339)+(1.006)+(18.001), (I-339)+(1.007)+(1.008), (I-339)+(1.007)+(1.009), (I-339)+(1.007)+(1.010), (I-339)+(1.007)+(1.011), (I-339)+(1.007)+(1.012), (I-339)+(1.007)+(1.013), (I-339)+(1.007)+(1.014), (I-339)+(1.007)+(1.015), (I-339)+(1.007)+(1.016), (I-339)+(1.007)+(1.017), (I-339)+(1.007)+(1.018), (I-339)+(1.007)+(1.019), (I-339)+(1.007)+(1.020), (I-339)+(1.007)+(1.021), (I-339)+(1.007)+(1.022), (I-339)+(1.007)+(1.023), (I-339)+(1.007)+(1.024), (I-339)+(1.007)+(1.025), (I-339)+(1.007)+(1.026), (I-339)+(1.007)+(1.027), (I-339)+(1.007)+(1.028), (I-339)+(1.007)+(1.029), (I-339)+(1.007)+(1.030), (I-339)+(1.007)+(1.031), (I-339)+(1.007)+(1.032), (I-339)+(1.007)+(1.033), (I-339)+(1.007)+(1.034), (I-339)+(1.007)+(1.035), (I-339)+(1.007)+(1.036), (I-339)+(1.007)+(1.037), (I-339)+(1.007)+(1.038), (I-339)+(1.007)+(1.039), (I-339)+(1.007)+(1.040), (I-339)+(1.007)+(1.041), (I-339)+(1.007)+(1.042), (I-339)+(1.007)+(1.043), (I-339)+(1.007)+(1.044), (I-339)+(1.007)+(1.045), (I-339)+(1.007)+(1.046), (I-339)+(1.007)+(1.047), (I-339)+(1.007)+(1.048), (I-339)+(1.007)+(1.049), (I-339)+(1.007)+(1.050), (I-339)+(1.007)+(1.051), (I-339)+(1.007)+(1.052), (I-339)+(1.007)+(1.053), (I-339)+(1.007)+(1.054), (I-339)+(1.007)+(1.055), (I-339)+(1.007)+(1.056), (I-339)+(1.007)+(1.057), (I-339)+(1.007)+(1.058), (I-339)+(1.007)+(1.059), (I-339)+(1.007)+(1.060), (I-339)+(1.007)+(1.061), (I-339)+(1.007)+(1.062), (I-339)+(1.007)+(1.063), (I-339)+(1.007)+(1.064), (I-339)+(1.007)+(1.065), (I-339)+(1.007)+(1.066), (I-339)+(1.007)+(1.067), (I-339)+(1.007)+(1.068), (I-339)+(1.007)+(1.069), (I-339)+(1.007)+(1.070), (I-339)+(1.007)+(1.071), (I-339)+(1.007)+(1.072), (I-339)+(1.007)+(1.073), (I-339)+(1.007)+(1.074), (I-339)+(1.007)+(1.075), (I-339)+(1.007)+(1.076), (I-339)+(1.007)+(1.077), (I-339)+(1.007)+(1.078), (I-339)+(1.007)+(1.079), (I-339)+(1.007)+(1.080), (I-339)+(1.007)+(1.081), (I-339)+(1.007)+(1.082), (I-339)+(1.007)+(1.083), (I-339)+(1.007)+(1.084), (I-339)+(1.007)+(1.085), (I-339)+(1.007)+(1.086), (I-339)+(1.007)+(1.087), (I-339)+(1.007)+(1.088), (I-339)+(1.007)+(1.089), (I-339)+(1.007)+(1.090), (I-339)+(1.007)+(1.091), (I-339)+(1.007)+(1.092), (I-339)+(1.007)+(2.001), (I-339)+(1.007)+(2.002), (I-339)+(1.007)+(2.003), (I-339)+(1.007)+(2.004), (I-339)+(1.007)+(2.005), (I-339)+(1.007)+(2.006), (I-339)+(1.007)+(2.007), (I-339)+(1.007)+(2.008), (I-339)+(1.007)+(2.009), (I-339)+(1.007)+(2.010), (I-339)+(1.007)+(2.011), (I-339)+(1.007)+(2.012), (I-339)+(1.007)+(2.013), (I-339)+(1.007)+(2.014), (I-339)+(1.007)+(2.015), (I-339)+(1.007)+(2.016), (I-339)+(1.007)+(2.017), (I-339)+(1.007)+(2.018), (I-339)+(1.007)+(2.019), (I-339)+(1.007)+(2.020), (I-339)+(1.007)+(2.021), (I-339)+(1.007)+(2.022), (I-339)+(1.007)+(2.023), (I-339)+(1.007)+(2.024), (I-339)+(1.007)+(2.025), (I-339)+(1.007)+(2.026), (I-339)+(1.007)+(2.027), (I-339)+(1.007)+(2.028), (I-339)+(1.007)+(2.029), (I-339)+(1.007)+(2.030), (I-339)+(1.007)+(2.031), (I-339)+(1.007)+(2.032), (I-339)+(1.007)+(2.033), (I-339)+(1.007)+(2.034), (I-339)+(1.007)+(2.035), (I-339)+(1.007)+(2.036), (I-339)+(1.007)+(2.037), (I-339)+(1.007)+(2.038), (I-339)+(1.007)+(2.039), (I-339)+(1.007)+(2.040), (I-339)+(1.007)+(2.041), (I-339)+(1.007)+(2.042), (I-339)+(1.007)+(2.043), (I-339)+(1.007)+(2.044), (I-339)+(1.007)+(2.045), (I-339)+(1.007)+(2.046), (I-339)+(1.007)+(2.047), (I-339)+(1.007)+(2.048), (I-339)+(1.007)+(2.049), (I-339)+(1.007)+(2.050), (I-339)+(1.007)+(2.051), (I-339)+(1.007)+(2.052), (I-339)+(1.007)+(2.053), (I-339)+(1.007)+(2.054), (I-339)+(1.007)+(2.055), (I-339)+(1.007)+(2.056), (I-339)+(1.007)+(2.057), (I-339)+(1.007)+(2.058), (I-339)+(1.007)+(2.059), (I-339)+(1.007)+(3.001), (I-339)+(1.007)+(3.002), (I-339)+(1.007)+(3.003), (I-339)+(1.007)+(3.004), (I-339)+(1.007)+(3.005), (I-339)+(1.007)+(3.006), (I-339)+(1.007)+(3.007), (I-339)+(1.007)+(3.008), (I-339)+(1.007)+(3.009), (I-339)+(1.007)+(3.010), (I-339)+(1.007)+(3.011), (I-339)+(1.007)+(3.012), (I-339)+(1.007)+(3.013), (I-339)+(1.007)+(3.014), (I-339)+(1.007)+(3.015), (I-339)+(1.007)+(3.016), (I-339)+(1.007)+(3.017), (I-339)+(1.007)+(3.018), (I-339)+(1.007)+(3.019), (I-339)+(1.007)+(3.020), (I-339)+(1.007)+(3.021), (I-339)+(1.007)+(3.022), (I-339)+(1.007)+(3.023), (I-339)+(1.007)+(3.024), (I-339)+(1.007)+(3.025), (I-339)+(1.007)+(3.026), (I-339)+(1.007)+(3.027), (I-339)+(1.007)+(3.028), (I-339)+(1.007)+(3.029), (I-339)+(1.007)+(3.030), (I-339)+(1.007)+(3.031), (I-339)+(1.007)+(5.001), (I-339)+(1.007)+(5.002), (I-339)+(1.007)+(5.003), (I-339)+(1.007)+(5.004), (I-339)+(1.007)+(5.005), (I-339)+(1.007)+(5.006), (I-339)+(1.007)+(5.007), (I-339)+(1.007)+(5.008), (I-339)+(1.007)+(5.009), (I-339)+(1.007)+(5.010), (I-339)+(1.007)+(5.011), (I-339)+(1.007)+(5.012), (I-339)+(1.007)+(5.013), (I-339)+(1.007)+(5.014), (I-339)+(1.007)+(5.015), (I-339)+(1.007)+(5.016), (I-339)+(1.007)+(5.017), (I-339)+(1.007)+(5.018), (I-339)+(1.007)+(5.019), (I-339)+(1.007)+(5.020), (I-339)+(1.007)+(5.021), (I-339)+(1.007)+(5.022), (I-339)+(1.007)+(5.023), (I-339)+(1.007)+(6.001), (I-339)+(1.007)+(6.002), (I-339)+(1.007)+(6.003), (I-339)+(1.007)+(6.004), (I-339)+(1.007)+(7.001), (I-339)+(1.007)+(7.002), (I-339)+(1.007)+(7.003), (I-339)+(1.007)+(7.004), (I-339)+(1.007)+(7.005), (I-339)+(1.007)+(7.006), (I-339)+(1.007)+(9.001), (I-339)+(1.007)+(9.002), (I-339)+(1.007)+(9.003), (I-339)+(1.007)+(9.004), (I-339)+(1.007)+(9.005), (I-339)+(1.007)+(9.006), (I-339)+(1.007)+(9.007), (I-339)+(1.007)+(9.008), (I-339)+(1.007)+(9.009), (I-339)+(1.007)+(14.001), (I-339)+(1.007)+(14.002), (I-339)+(1.007)+(15.008), (I-339)+(1.007)+(15.011), (I-339)+(1.007)+(15.012), (I-339)+(1.007)+(15.016), (I-339)+(1.007)+(15.025), (I-339)+(1.007)+(15.027), (I-339)+(1.007)+(15.047), (I-339)+(1.007)+(15.063), (I-339)+(1.007)+(15.064), (I-339)+(1.007)+(16.001), (I-339)+(1.007)+(16.002), (I-339)+(1.007)+(16.003), (I-339)+(1.007)+(16.004), (I-339)+(1.007)+(16.005), (I-339)+(1.007)+(16.006), (I-339)+(1.007)+(16.007), (I-339)+(1.007)+(16.008), (I-339)+(1.007)+(17.001), (I-339)+(1.007)+(17.002), (I-339)+(1.007)+(17.003), (I-339)+(1.007)+(17.004), (I-339)+(1.007)+(17.005), (I-339)+(1.007)+(17.006), (I-339)+(1.007)+(17.007), (I-339)+(1.007)+(17.008), (I-339)+(1.007)+(17.009), (I-339)+(1.007)+(17.010), (I-339)+(1.007)+(17.011), (I-339)+(1.007)+(17.012), (I-339)+(1.007)+(18.001), (I-339)+(1.008)+(1.009), (I-339)+(1.008)+(1.010), (I-339)+(1.008)+(1.011), (I-339)+(1.008)+(1.012), (I-339)+(1.008)+(1.013), (I-339)+(1.008)+(1.014), (I-339)+(1.008)+(1.015), (I-339)+(1.008)+(1.016), (I-339)+(1.008)+(1.017), (I-339)+(1.008)+(1.018), (I-339)+(1.008)+(1.019), (I-339)+(1.008)+(1.020), (I-339)+(1.008)+(1.021), (I-339)+(1.008)+(1.022), (I-339)+(1.008)+(1.023), (I-339)+(1.008)+(1.024), (I-339)+(1.008)+(1.025), (I-339)+(1.008)+(1.026), (I-339)+(1.008)+(1.027), (I-339)+(1.008)+(1.028), (I-339)+(1.008)+(1.029), (I-339)+(1.008)+(1.030), (I-339)+(1.008)+(1.031), (I-339)+(1.008)+(1.032), (I-339)+(1.008)+(1.033), (I-339)+(1.008)+(1.034), (I-339)+(1.008)+(1.035), (I-339)+(1.008)+(1.036), (I-339)+(1.008)+(1.037), (I-339)+(1.008)+(1.038), (I-339)+(1.008)+(1.039), (I-339)+(1.008)+(1.040), (I-339)+(1.008)+(1.041), (I-339)+(1.008)+(1.042), (I-339)+(1.008)+(1.043), (I-339)+(1.008)+(1.044), (I-339)+(1.008)+(1.045), (I-339)+(1.008)+(1.046), (I-339)+(1.008)+(1.047), (I-339)+(1.008)+(1.048), (I-339)+(1.008)+(1.049), (I-339)+(1.008)+(1.050), (I-339)+(1.008)+(1.051), (I-339)+(1.008)+(1.052), (I-339)+(1.008)+(1.053), (I-339)+(1.008)+(1.054), (I-339)+(1.008)+(1.055), (I-339)+(1.008)+(1.056), (I-339)+(1.008)+(1.057), (I-339)+(1.008)+(1.058), (I-339)+(1.008)+(1.059), (I-339)+(1.008)+(1.060), (I-339)+(1.008)+(1.061), (I-339)+(1.008)+(1.062), (I-339)+(1.008)+(1.063), (I-339)+(1.008)+(1.064), (I-339)+(1.008)+(1.065), (I-339)+(1.008)+(1.066), (I-339)+(1.008)+(1.067), (I-339)+(1.008)+(1.068), (I-339)+(1.008)+(1.069), (I-339)+(1.008)+(1.070), (I-339)+(1.008)+(1.071), (I-339)+(1.008)+(1.072), (I-339)+(1.008)+(1.073), (I-339)+(1.008)+(1.074), (I-339)+(1.008)+(1.075), (I-339)+(1.008)+(1.076), (I-339)+(1.008)+(1.077), (I-339)+(1.008)+(1.078), (I-339)+(1.008)+(1.079), (I-339)+(1.008)+(1.080), (I-339)+(1.008)+(1.081), (I-339)+(1.008)+(1.082), (I-339)+(1.008)+(1.083), (I-339)+(1.008)+(1.084), (I-339)+(1.008)+(1.085), (I-339)+(1.008)+(1.086), (I-339)+(1.008)+(1.087), (I-339)+(1.008)+(1.088), (I-339)+(1.008)+(1.089), (I-339)+(1.008)+(1.090), (I-339)+(1.008)+(1.091), (I-339)+(1.008)+(1.092), (I-339)+(1.008)+(2.001), (I-339)+(1.008)+(2.002), (I-339)+(1.008)+(2.003), (I-339)+(1.008)+(2.004), (I-339)+(1.008)+(2.005), (I-339)+(1.008)+(2.006), (I-339)+(1.008)+(2.007), (I-339)+(1.008)+(2.008), (I-339)+(1.008)+(2.009), (I-339)+(1.008)+(2.010), (I-339)+(1.008)+(2.011), (I-339)+(1.008)+(2.012), (I-339)+(1.008)+(2.013), (I-339)+(1.008)+(2.014), (I-339)+(1.008)+(2.015), (I-339)+(1.008)+(2.016), (I-339)+(1.008)+(2.017), (I-339)+(1.008)+(2.018), (I-339)+(1.008)+(2.019), (I-339)+(1.008)+(2.020), (I-339)+(1.008)+(2.021), (I-339)+(1.008)+(2.022), (I-339)+(1.008)+(2.023), (I-339)+(1.008)+(2.024), (I-339)+(1.008)+(2.025), (I-339)+(1.008)+(2.026), (I-339)+(1.008)+(2.027), (I-339)+(1.008)+(2.028), (I-339)+(1.008)+(2.029), (I-339)+(1.008)+(2.030), (I-339)+(1.008)+(2.031), (I-339)+(1.008)+(2.032), (I-339)+(1.008)+(2.033), (I-339)+(1.008)+(2.034), (I-339)+(1.008)+(2.035), (I-339)+(1.008)+(2.036), (I-339)+(1.008)+(2.037), (I-339)+(1.008)+(2.038), (I-339)+(1.008)+(2.039), (I-339)+(1.008)+(2.040), (I-339)+(1.008)+(2.041), (I-339)+(1.008)+(2.042), (I-339)+(1.008)+(2.043), (I-339)+(1.008)+(2.044), (I-339)+(1.008)+(2.045), (I-339)+(1.008)+(2.046), (I-339)+(1.008)+(2.047), (I-339)+(1.008)+(2.048), (I-339)+(1.008)+(2.049), (I-339)+(1.008)+(2.050), (I-339)+(1.008)+(2.051), (I-339)+(1.008)+(2.052), (I-339)+(1.008)+(2.053), (I-339)+(1.008)+(2.054), (I-339)+(1.008)+(2.055), (I-339)+(1.008)+(2.056), (I-339)+(1.008)+(2.057), (I-339)+(1.008)+(2.058), (I-339)+(1.008)+(2.059), (I-339)+(1.008)+(3.001), (I-339)+(1.008)+(3.002), (I-339)+(1.008)+(3.003), (I-339)+(1.008)+(3.004), (I-339)+(1.008)+(3.005), (I-339)+(1.008)+(3.006), (I-339)+(1.008)+(3.007), (I-339)+(1.008)+(3.008), (I-339)+(1.008)+(3.009), (I-339)+(1.008)+(3.010), (I-339)+(1.008)+(3.011), (I-339)+(1.008)+(3.012), (I-339)+(1.008)+(3.013), (I-339)+(1.008)+(3.014), (I-339)+(1.008)+(3.015), (I-339)+(1.008)+(3.016), (I-339)+(1.008)+(3.017), (I-339)+(1.008)+(3.018), (I-339)+(1.008)+(3.019), (I-339)+(1.008)+(3.020), (I-339)+(1.008)+(3.021), (I-339)+(1.008)+(3.022), (I-339)+(1.008)+(3.023), (I-339)+(1.008)+(3.024), (I-339)+(1.008)+(3.025), (I-339)+(1.008)+(3.026), (I-339)+(1.008)+(3.027), (I-339)+(1.008)+(3.028), (I-339)+(1.008)+(3.029), (I-339)+(1.008)+(3.030), (I-339)+(1.008)+(3.031), (I-339)+(1.008)+(5.001), (I-339)+(1.008)+(5.002), (I-339)+(1.008)+(5.003), (I-339)+(1.008)+(5.004), (I-339)+(1.008)+(5.005), (I-339)+(1.008)+(5.006), (I-339)+(1.008)+(5.007), (I-339)+(1.008)+(5.008), (I-339)+(1.008)+(5.009), (I-339)+(1.008)+(5.010), (I-339)+(1.008)+(5.011), (I-339)+(1.008)+(5.012), (I-339)+(1.008)+(5.013), (I-339)+(1.008)+(5.014), (I-339)+(1.008)+(5.015), (I-339)+(1.008)+(5.016), (I-339)+(1.008)+(5.017), (I-339)+(1.008)+(5.018), (I-339)+(1.008)+(5.019), (I-339)+(1.008)+(5.020), (I-339)+(1.008)+(5.021), (I-339)+(1.008)+(5.022), (I-339)+(1.008)+(5.023), (I-339)+(1.008)+(6.001), (I-339)+(1.008)+(6.002), (I-339)+(1.008)+(6.003), (I-339)+(1.008)+(6.004), (I-339)+(1.008)+(7.001), (I-339)+(1.008)+(7.002), (I-339)+(1.008)+(7.003), (I-339)+(1.008)+(7.004), (I-339)+(1.008)+(7.005), (I-339)+(1.008)+(7.006), (I-339)+(1.008)+(9.001), (I-339)+(1.008)+(9.002), (I-339)+(1.008)+(9.003), (I-339)+(1.008)+(9.004), (I-339)+(1.008)+(9.005), (I-339)+(1.008)+(9.006), (I-339)+(1.008)+(9.007), (I-339)+(1.008)+(9.008), (I-339)+(1.008)+(9.009), (I-339)+(1.008)+(14.001), (I-339)+(1.008)+(14.002), (I-339)+(1.008)+(15.008), (I-339)+(1.008)+(15.011), (I-339)+(1.008)+(15.012), (I-339)+(1.008)+(15.016), (I-339)+(1.008)+(15.025), (I-339)+(1.008)+(15.027), (I-339)+(1.008)+(15.047), (I-339)+(1.008)+(15.063), (I-339)+(1.008)+(15.064), (I-339)+(1.008)+(16.001), (I-339)+(1.008)+(16.002), (I-339)+(1.008)+(16.003), (I-339)+(1.008)+(16.004), (I-339)+(1.008)+(16.005), (I-339)+(1.008)+(16.006), (I-339)+(1.008)+(16.007), (I-339)+(1.008)+(16.008), (I-339)+(1.008)+(17.001), (I-339)+(1.008)+(17.002), (I-339)+(1.008)+(17.003), (I-339)+(1.008)+(17.004), (I-339)+(1.008)+(17.005), (I-339)+(1.008)+(17.006), (I-339)+(1.008)+(17.007), (I-339)+(1.008)+(17.008), (I-339)+(1.008)+(17.009), (I-339)+(1.008)+(17.010), (I-339)+(1.008)+(17.011), (I-339)+(1.008)+(17.012), (I-339)+(1.008)+(18.001), (I-339)+(1.009)+(1.010), (I-339)+(1.009)+(1.011), (I-339)+(1.009)+(1.012), (I-339)+(1.009)+(1.013), (I-339)+(1.009)+(1.014), (I-339)+(1.009)+(1.015), (I-339)+(1.009)+(1.016), (I-339)+(1.009)+(1.017), (I-339)+(1.009)+(1.018), (I-339)+(1.009)+(1.019), (I-339)+(1.009)+(1.020), (I-339)+(1.009)+(1.021), (I-339)+(1.009)+(1.022), (I-339)+(1.009)+(1.023), (I-339)+(1.009)+(1.024), (I-339)+(1.009)+(1.025), (I-339)+(1.009)+(1.026), (I-339)+(1.009)+(1.027), (I-339)+(1.009)+(1.028), (I-339)+(1.009)+(1.029), (I-339)+(1.009)+(1.030), (I-339)+(1.009)+(1.031), (I-339)+(1.009)+(1.032), (I-339)+(1.009)+(1.033), (I-339)+(1.009)+(1.034), (I-339)+(1.009)+(1.035), (I-339)+(1.009)+(1.036), (I-339)+(1.009)+(1.037), (I-339)+(1.009)+(1.038), (I-339)+(1.009)+(1.039), (I-339)+(1.009)+(1.040), (I-339)+(1.009)+(1.041), (I-339)+(1.009)+(1.042), (I-339)+(1.009)+(1.043), (I-339)+(1.009)+(1.044), (I-339)+(1.009)+(1.045), (I-339)+(1.009)+(1.046), (I-339)+(1.009)+(1.047), (I-339)+(1.009)+(1.048), (I-339)+(1.009)+(1.049), (I-339)+(1.009)+(1.050), (I-339)+(1.009)+(1.051), (I-339)+(1.009)+(1.052), (I-339)+(1.009)+(1.053), (I-339)+(1.009)+(1.054), (I-339)+(1.009)+(1.055), (I-339)+(1.009)+(1.056), (I-339)+(1.009)+(1.057), (I-339)+(1.009)+(1.058), (I-339)+(1.009)+(1.059), (I-339)+(1.009)+(1.060), (I-339)+(1.009)+(1.061), (I-339)+(1.009)+(1.062), (I-339)+(1.009)+(1.063), (I-339)+(1.009)+(1.064), (I-339)+(1.009)+(1.065), (I-339)+(1.009)+(1.066), (I-339)+(1.009)+(1.067), (I-339)+(1.009)+(1.068), (I-339)+(1.009)+(1.069), (I-339)+(1.009)+(1.070), (I-339)+(1.009)+(1.071), (I-339)+(1.009)+(1.072), (I-339)+(1.009)+(1.073), (I-339)+(1.009)+(1.074), (I-339)+(1.009)+(1.075), (I-339)+(1.009)+(1.076), (I-339)+(1.009)+(1.077), (I-339)+(1.009)+(1.078), (I-339)+(1.009)+(1.079), (I-339)+(1.009)+(1.080), (I-339)+(1.009)+(1.081), (I-339)+(1.009)+(1.082), (I-339)+(1.009)+(1.083), (I-339)+(1.009)+(1.084), (I-339)+(1.009)+(1.085), (I-339)+(1.009)+(1.086), (I-339)+(1.009)+(1.087), (I-339)+(1.009)+(1.088), (I-339)+(1.009)+(1.089), (I-339)+(1.009)+(1.090), (I-339)+(1.009)+(1.091), (I-339)+(1.009)+(1.092), (I-339)+(1.009)+(2.001), (I-339)+(1.009)+(2.002), (I-339)+(1.009)+(2.003), (I-339)+(1.009)+(2.004), (I-339)+(1.009)+(2.005), (I-339)+(1.009)+(2.006), (I-339)+(1.009)+(2.007), (I-339)+(1.009)+(2.008), (I-339)+(1.009)+(2.009), (I-339)+(1.009)+(2.010), (I-339)+(1.009)+(2.011), (I-339)+(1.009)+(2.012), (I-339)+(1.009)+(2.013), (I-339)+(1.009)+(2.014), (I-339)+(1.009)+(2.015), (I-339)+(1.009)+(2.016), (I-339)+(1.009)+(2.017), (I-339)+(1.009)+(2.018), (I-339)+(1.009)+(2.019), (I-339)+(1.009)+(2.020), (I-339)+(1.009)+(2.021), (I-339)+(1.009)+(2.022), (I-339)+(1.009)+(2.023), (I-339)+(1.009)+(2.024), (I-339)+(1.009)+(2.025), (I-339)+(1.009)+(2.026), (I-339)+(1.009)+(2.027), (I-339)+(1.009)+(2.028), (I-339)+(1.009)+(2.029), (I-339)+(1.009)+(2.030), (I-339)+(1.009)+(2.031), (I-339)+(1.009)+(2.032), (I-339)+(1.009)+(2.033), (I-339)+(1.009)+(2.034), (I-339)+(1.009)+(2.035), (I-339)+(1.009)+(2.036), (I-339)+(1.009)+(2.037), (I-339)+(1.009)+(2.038), (I-339)+(1.009)+(2.039), (I-339)+(1.009)+(2.040), (I-339)+(1.009)+(2.041), (I-339)+(1.009)+(2.042), (I-339)+(1.009)+(2.043), (I-339)+(1.009)+(2.044), (I-339)+(1.009)+(2.045), (I-339)+(1.009)+(2.046), (I-339)+(1.009)+(2.047), (I-339)+(1.009)+(2.048), (I-339)+(1.009)+(2.049), (I-339)+(1.009)+(2.050), (I-339)+(1.009)+(2.051), (I-339)+(1.009)+(2.052), (I-339)+(1.009)+(2.053), (I-339)+(1.009)+(2.054), (I-339)+(1.009)+(2.055), (I-339)+(1.009)+(2.056), (I-339)+(1.009)+(2.057), (I-339)+(1.009)+(2.058), (I-339)+(1.009)+(2.059), (I-339)+(1.009)+(3.001), (I-339)+(1.009)+(3.002), (I-339)+(1.009)+(3.003), (I-339)+(1.009)+(3.004), (I-339)+(1.009)+(3.005), (I-339)+(1.009)+(3.006), (I-339)+(1.009)+(3.007), (I-339)+(1.009)+(3.008), (I-339)+(1.009)+(3.009), (I-339)+(1.009)+(3.010), (I-339)+(1.009)+(3.011), (I-339)+(1.009)+(3.012), (I-339)+(1.009)+(3.013), (I-339)+(1.009)+(3.014), (I-339)+(1.009)+(3.015), (I-339)+(1.009)+(3.016), (I-339)+(1.009)+(3.017), (I-339)+(1.009)+(3.018), (I-339)+(1.009)+(3.019), (I-339)+(1.009)+(3.020), (I-339)+(1.009)+(3.021), (I-339)+(1.009)+(3.022), (I-339)+(1.009)+(3.023), (I-339)+(1.009)+(3.024), (I-339)+(1.009)+(3.025), (I-339)+(1.009)+(3.026), (I-339)+(1.009)+(3.027), (I-339)+(1.009)+(3.028), (I-339)+(1.009)+(3.029), (I-339)+(1.009)+(3.030), (I-339)+(1.009)+(3.031), (I-339)+(1.009)+(5.001), (I-339)+(1.009)+(5.002), (I-339)+(1.009)+(5.003), (I-339)+(1.009)+(5.004), (I-339)+(1.009)+(5.005), (I-339)+(1.009)+(5.006), (I-339)+(1.009)+(5.007), (I-339)+(1.009)+(5.008), (I-339)+(1.009)+(5.009), (I-339)+(1.009)+(5.010), (I-339)+(1.009)+(5.011), (I-339)+(1.009)+(5.012), (I-339)+(1.009)+(5.013), (I-339)+(1.009)+(5.014), (I-339)+(1.009)+(5.015), (I-339)+(1.009)+(5.016), (I-339)+(1.009)+(5.017), (I-339)+(1.009)+(5.018), (I-339)+(1.009)+(5.019), (I-339)+(1.009)+(5.020), (I-339)+(1.009)+(5.021), (I-339)+(1.009)+(5.022), (I-339)+(1.009)+(5.023), (I-339)+(1.009)+(6.001), (I-339)+(1.009)+(6.002), (I-339)+(1.009)+(6.003), (I-339)+(1.009)+(6.004), (I-339)+(1.009)+(7.001), (I-339)+(1.009)+(7.002), (I-339)+(1.009)+(7.003), (I-339)+(1.009)+(7.004), (I-339)+(1.009)+(7.005), (I-339)+(1.009)+(7.006), (I-339)+(1.009)+(9.001), (I-339)+(1.009)+(9.002), (I-339)+(1.009)+(9.003), (I-339)+(1.009)+(9.004), (I-339)+(1.009)+(9.005), (I-339)+(1.009)+(9.006), (I-339)+(1.009)+(9.007), (I-339)+(1.009)+(9.008), (I-339)+(1.009)+(9.009), (I-339)+(1.009)+(14.001), (I-339)+(1.009)+(14.002), (I-339)+(1.009)+(15.008), (I-339)+(1.009)+(15.011), (I-339)+(1.009)+(15.012), (I-339)+(1.009)+(15.016), (I-339)+(1.009)+(15.025), (I-339)+(1.009)+(15.027), (I-339)+(1.009)+(15.047), (I-339)+(1.009)+(15.063), (I-339)+(1.009)+(15.064), (I-339)+(1.009)+(16.001), (I-339)+(1.009)+(16.002), (I-339)+(1.009)+(16.003), (I-339)+(1.009)+(16.004), (I-339)+(1.009)+(16.005), (I-339)+(1.009)+(16.006), (I-339)+(1.009)+(16.007), (I-339)+(1.009)+(16.008), (I-339)+(1.009)+(17.001), (I-339)+(1.009)+(17.002), (I-339)+(1.009)+(17.003), (I-339)+(1.009)+(17.004), (I-339)+(1.009)+(17.005), (I-339)+(1.009)+(17.006), (I-339)+(1.009)+(17.007), (I-339)+(1.009)+(17.008), (I-339)+(1.009)+(17.009), (I-339)+(1.009)+(17.010), (I-339)+(1.009)+(17.011), (I-339)+(1.009)+(17.012), (I-339)+(1.009)+(18.001), (I-339)+(1.010)+(1.011), (I-339)+(1.010)+(1.012), (I-339)+(1.010)+(1.013), (I-339)+(1.010)+(1.014), (I-339)+(1.010)+(1.015), (I-339)+(1.010)+(1.016), (I-339)+(1.010)+(1.017), (I-339)+(1.010)+(1.018), (I-339)+(1.010)+(1.019), (I-339)+(1.010)+(1.020), (I-339)+(1.010)+(1.021), (I-339)+(1.010)+(1.022), (I-339)+(1.010)+(1.023), (I-339)+(1.010)+(1.024), (I-339)+(1.010)+(1.025), (I-339)+(1.010)+(1.026), (I-339)+(1.010)+(1.027), (I-339)+(1.010)+(1.028), (I-339)+(1.010)+(1.029), (I-339)+(1.010)+(1.030), (I-339)+(1.010)+(1.031), (I-339)+(1.010)+(1.032), (I-339)+(1.010)+(1.033), (I-339)+(1.010)+(1.034), (I-339)+(1.010)+(1.035), (I-339)+(1.010)+(1.036), (I-339)+(1.010)+(1.037), (I-339)+(1.010)+(1.038), (I-339)+(1.010)+(1.039), (I-339)+(1.010)+(1.040), (I-339)+(1.010)+(1.041), (I-339)+(1.010)+(1.042), (I-339)+(1.010)+(1.043), (I-339)+(1.010)+(1.044), (I-339)+(1.010)+(1.045), (I-339)+(1.010)+(1.046), (I-339)+(1.010)+(1.047), (I-339)+(1.010)+(1.048), (I-339)+(1.010)+(1.049), (I-339)+(1.010)+(1.050), (I-339)+(1.010)+(1.051), (I-339)+(1.010)+(1.052), (I-339)+(1.010)+(1.053), (I-339)+(1.010)+(1.054), (I-339)+(1.010)+(1.055), (I-339)+(1.010)+(1.056), (I-339)+(1.010)+(1.057), (I-339)+(1.010)+(1.058), (I-339)+(1.010)+(1.059), (I-339)+(1.010)+(1.060), (I-339)+(1.010)+(1.061), (I-339)+(1.010)+(1.062), (I-339)+(1.010)+(1.063), (I-339)+(1.010)+(1.064), (I-339)+(1.010)+(1.065), (I-339)+(1.010)+(1.066), (I-339)+(1.010)+(1.067), (I-339)+(1.010)+(1.068), (I-339)+(1.010)+(1.069), (I-339)+(1.010)+(1.070), (I-339)+(1.010)+(1.071), (I-339)+(1.010)+(1.072), (I-339)+(1.010)+(1.073), (I-339)+(1.010)+(1.074), (I-339)+(1.010)+(1.075), (I-339)+(1.010)+(1.076), (I-339)+(1.010)+(1.077), (I-339)+(1.010)+(1.078), (I-339)+(1.010)+(1.079), (I-339)+(1.010)+(1.080), (I-339)+(1.010)+(1.081), (I-339)+(1.010)+(1.082), (I-339)+(1.010)+(1.083), (I-339)+(1.010)+(1.084), (I-339)+(1.010)+(1.085), (I-339)+(1.010)+(1.086), (I-339)+(1.010)+(1.087), (I-339)+(1.010)+(1.088), (I-339)+(1.010)+(1.089), (I-339)+(1.010)+(1.090), (I-339)+(1.010)+(1.091), (I-339)+(1.010)+(1.092), (I-339)+(1.010)+(2.001), (I-339)+(1.010)+(2.002), (I-339)+(1.010)+(2.003), (I-339)+(1.010)+(2.004), (I-339)+(1.010)+(2.005), (I-339)+(1.010)+(2.006), (I-339)+(1.010)+(2.007), (I-339)+(1.010)+(2.008), (I-339)+(1.010)+(2.009), (I-339)+(1.010)+(2.010), (I-339)+(1.010)+(2.011), (I-339)+(1.010)+(2.012), (I-339)+(1.010)+(2.013), (I-339)+(1.010)+(2.014), (I-339)+(1.010)+(2.015), (I-339)+(1.010)+(2.016), (I-339)+(1.010)+(2.017), (I-339)+(1.010)+(2.018), (I-339)+(1.010)+(2.019), (I-339)+(1.010)+(2.020), (I-339)+(1.010)+(2.021), (I-339)+(1.010)+(2.022), (I-339)+(1.010)+(2.023), (I-339)+(1.010)+(2.024), (I-339)+(1.010)+(2.025), (I-339)+(1.010)+(2.026), (I-339)+(1.010)+(2.027), (I-339)+(1.010)+(2.028), (I-339)+(1.010)+(2.029), (I-339)+(1.010)+(2.030), (I-339)+(1.010)+(2.031), (I-339)+(1.010)+(2.032), (I-339)+(1.010)+(2.033), (I-339)+(1.010)+(2.034), (I-339)+(1.010)+(2.035), (I-339)+(1.010)+(2.036), (I-339)+(1.010)+(2.037), (I-339)+(1.010)+(2.038), (I-339)+(1.010)+(2.039), (I-339)+(1.010)+(2.040), (I-339)+(1.010)+(2.041), (I-339)+(1.010)+(2.042), (I-339)+(1.010)+(2.043), (I-339)+(1.010)+(2.044), (I-339)+(1.010)+(2.045), (I-339)+(1.010)+(2.046), (I-339)+(1.010)+(2.047), (I-339)+(1.010)+(2.048), (I-339)+(1.010)+(2.049), (I-339)+(1.010)+(2.050), (I-339)+(1.010)+(2.051), (I-339)+(1.010)+(2.052), (I-339)+(1.010)+(2.053), (I-339)+(1.010)+(2.054), (I-339)+(1.010)+(2.055), (I-339)+(1.010)+(2.056), (I-339)+(1.010)+(2.057), (I-339)+(1.010)+(2.058), (I-339)+(1.010)+(2.059), (I-339)+(1.010)+(3.001), (I-339)+(1.010)+(3.002), (I-339)+(1.010)+(3.003), (I-339)+(1.010)+(3.004), (I-339)+(1.010)+(3.005), (I-339)+(1.010)+(3.006), (I-339)+(1.010)+(3.007), (I-339)+(1.010)+(3.008), (I-339)+(1.010)+(3.009), (I-339)+(1.010)+(3.010), (I-339)+(1.010)+(3.011), (I-339)+(1.010)+(3.012), (I-339)+(1.010)+(3.013), (I-339)+(1.010)+(3.014), (I-339)+(1.010)+(3.015), (I-339)+(1.010)+(3.016), (I-339)+(1.010)+(3.017), (I-339)+(1.010)+(3.018), (I-339)+(1.010)+(3.019), (I-339)+(1.010)+(3.020), (I-339)+(1.010)+(3.021), (I-339)+(1.010)+(3.022), (I-339)+(1.010)+(3.023), (I-339)+(1.010)+(3.024), (I-339)+(1.010)+(3.025), (I-339)+(1.010)+(3.026), (I-339)+(1.010)+(3.027), (I-339)+(1.010)+(3.028), (I-339)+(1.010)+(3.029), (I-339)+(1.010)+(3.030), (I-339)+(1.010)+(3.031), (I-339)+(1.010)+(5.001), (I-339)+(1.010)+(5.002), (I-339)+(1.010)+(5.003), (I-339)+(1.010)+(5.004), (I-339)+(1.010)+(5.005), (I-339)+(1.010)+(5.006), (I-339)+(1.010)+(5.007), (I-339)+(1.010)+(5.008), (I-339)+(1.010)+(5.009), (I-339)+(1.010)+(5.010), (I-339)+(1.010)+(5.011), (I-339)+(1.010)+(5.012), (I-339)+(1.010)+(5.013), (I-339)+(1.010)+(5.014), (I-339)+(1.010)+(5.015), (I-339)+(1.010)+(5.016), (I-339)+(1.010)+(5.017), (I-339)+(1.010)+(5.018), (I-339)+(1.010)+(5.019), (I-339)+(1.010)+(5.020), (I-339)+(1.010)+(5.021), (I-339)+(1.010)+(5.022), (I-339)+(1.010)+(5.023), (I-339)+(1.010)+(6.001), (I-339)+(1.010)+(6.002), (I-339)+(1.010)+(6.003), (I-339)+(1.010)+(6.004), (I-339)+(1.010)+(7.001), (I-339)+(1.010)+(7.002), (I-339)+(1.010)+(7.003), (I-339)+(1.010)+(7.004), (I-339)+(1.010)+(7.005), (I-339)+(1.010)+(7.006), (I-339)+(1.010)+(9.001), (I-339)+(1.010)+(9.002), (I-339)+(1.010)+(9.003), (I-339)+(1.010)+(9.004), (I-339)+(1.010)+(9.005), (I-339)+(1.010)+(9.006), (I-339)+(1.010)+(9.007), (I-339)+(1.010)+(9.008), (I-339)+(1.010)+(9.009), (I-339)+(1.010)+(14.001), (I-339)+(1.010)+(14.002), (I-339)+(1.010)+(15.008), (I-339)+(1.010)+(15.011), (I-339)+(1.010)+(15.012), (I-339)+(1.010)+(15.016), (I-339)+(1.010)+(15.025), (I-339)+(1.010)+(15.027), (I-339)+(1.010)+(15.047), (I-339)+(1.010)+(15.063), (I-339)+(1.010)+(15.064), (I-339)+(1.010)+(16.001), (I-339)+(1.010)+(16.002), (I-339)+(1.010)+(16.003), (I-339)+(1.010)+(16.004), (I-339)+(1.010)+(16.005), (I-339)+(1.010)+(16.006), (I-339)+(1.010)+(16.007), (I-339)+(1.010)+(16.008), (I-339)+(1.010)+(17.001), (I-339)+(1.010)+(17.002), (I-339)+(1.010)+(17.003), (I-339)+(1.010)+(17.004), (I-339)+(1.010)+(17.005), (I-339)+(1.010)+(17.006), (I-339)+(1.010)+(17.007), (I-339)+(1.010)+(17.008), (I-339)+(1.010)+(17.009), (I-339)+(1.010)+(17.010), (I-339)+(1.010)+(17.011), (I-339)+(1.010)+(17.012), (I-339)+(1.010)+(18.001), (I-339)+(1.011)+(1.012), (I-339)+(1.011)+(1.013), (I-339)+(1.011)+(1.014), (I-339)+(1.011)+(1.015), (I-339)+(1.011)+(1.016), (I-339)+(1.011)+(1.017), (I-339)+(1.011)+(1.018), (I-339)+(1.011)+(1.019), (I-339)+(1.011)+(1.020), (I-339)+(1.011)+(1.021), (I-339)+(1.011)+(1.022), (I-339)+(1.011)+(1.023), (I-339)+(1.011)+(1.024), (I-339)+(1.011)+(1.025), (I-339)+(1.011)+(1.026), (I-339)+(1.011)+(1.027), (I-339)+(1.011)+(1.028), (I-339)+(1.011)+(1.029), (I-339)+(1.011)+(1.030), (I-339)+(1.011)+(1.031), (I-339)+(1.011)+(1.032), (I-339)+(1.011)+(1.033), (I-339)+(1.011)+(1.034), (I-339)+(1.011)+(1.035), (I-339)+(1.011)+(1.036), (I-339)+(1.011)+(1.037), (I-339)+(1.011)+(1.038), (I-339)+(1.011)+(1.039), (I-339)+(1.011)+(1.040), (I-339)+(1.011)+(1.041), (I-339)+(1.011)+(1.042), (I-339)+(1.011)+(1.043), (I-339)+(1.011)+(1.044), (I-339)+(1.011)+(1.045), (I-339)+(1.011)+(1.046), (I-339)+(1.011)+(1.047), (I-339)+(1.011)+(1.048), (I-339)+(1.011)+(1.049), (I-339)+(1.011)+(1.050), (I-339)+(1.011)+(1.051), (I-339)+(1.011)+(1.052), (I-339)+(1.011)+(1.053), (I-339)+(1.011)+(1.054), (I-339)+(1.011)+(1.055), (I-339)+(1.011)+(1.056), (I-339)+(1.011)+(1.057), (I-339)+(1.011)+(1.058), (I-339)+(1.011)+(1.059), (I-339)+(1.011)+(1.060), (I-339)+(1.011)+(1.061), (I-339)+(1.011)+(1.062), (I-339)+(1.011)+(1.063), (I-339)+(1.011)+(1.064), (I-339)+(1.011)+(1.065), (I-339)+(1.011)+(1.066), (I-339)+(1.011)+(1.067), (I-339)+(1.011)+(1.068), (I-339)+(1.011)+(1.069), (I-339)+(1.011)+(1.070), (I-339)+(1.011)+(1.071), (I-339)+(1.011)+(1.072), (I-339)+(1.011)+(1.073), (I-339)+(1.011)+(1.074), (I-339)+(1.011)+(1.075), (I-339)+(1.011)+(1.076), (I-339)+(1.011)+(1.077), (I-339)+(1.011)+(1.078), (I-339)+(1.011)+(1.079), (I-339)+(1.011)+(1.080), (I-339)+(1.011)+(1.081), (I-339)+(1.011)+(1.082), (I-339)+(1.011)+(1.083), (I-339)+(1.011)+(1.084), (I-339)+(1.011)+(1.085), (I-339)+(1.011)+(1.086), (I-339)+(1.011)+(1.087), (I-339)+(1.011)+(1.088), (I-339)+(1.011)+(1.089), (I-339)+(1.011)+(1.090), (I-339)+(1.011)+(1.091), (I-339)+(1.011)+(1.092), (I-339)+(1.011)+(2.001), (I-339)+(1.011)+(2.002), (I-339)+(1.011)+(2.003), (I-339)+(1.011)+(2.004), (I-339)+(1.011)+(2.005), (I-339)+(1.011)+(2.006), (I-339)+(1.011)+(2.007), (I-339)+(1.011)+(2.008), (I-339)+(1.011)+(2.009), (I-339)+(1.011)+(2.010), (I-339)+(1.011)+(2.011), (I-339)+(1.011)+(2.012), (I-339)+(1.011)+(2.013), (I-339)+(1.011)+(2.014), (I-339)+(1.011)+(2.015), (I-339)+(1.011)+(2.016), (I-339)+(1.011)+(2.017), (I-339)+(1.011)+(2.018), (I-339)+(1.011)+(2.019), (I-339)+(1.011)+(2.020), (I-339)+(1.011)+(2.021), (I-339)+(1.011)+(2.022), (I-339)+(1.011)+(2.023), (I-339)+(1.011)+(2.024), (I-339)+(1.011)+(2.025), (I-339)+(1.011)+(2.026), (I-339)+(1.011)+(2.027), (I-339)+(1.011)+(2.028), (I-339)+(1.011)+(2.029), (I-339)+(1.011)+(2.030), (I-339)+(1.011)+(2.031), (I-339)+(1.011)+(2.032), (I-339)+(1.011)+(2.033), (I-339)+(1.011)+(2.034), (I-339)+(1.011)+(2.035), (I-339)+(1.011)+(2.036), (I-339)+(1.011)+(2.037), (I-339)+(1.011)+(2.038), (I-339)+(1.011)+(2.039), (I-339)+(1.011)+(2.040), (I-339)+(1.011)+(2.041), (I-339)+(1.011)+(2.042), (I-339)+(1.011)+(2.043), (I-339)+(1.011)+(2.044), (I-339)+(1.011)+(2.045), (I-339)+(1.011)+(2.046), (I-339)+(1.011)+(2.047), (I-339)+(1.011)+(2.048), (I-339)+(1.011)+(2.049), (I-339)+(1.011)+(2.050), (I-339)+(1.011)+(2.051), (I-339)+(1.011)+(2.052), (I-339)+(1.011)+(2.053), (I-339)+(1.011)+(2.054), (I-339)+(1.011)+(2.055), (I-339)+(1.011)+(2.056), (I-339)+(1.011)+(2.057), (I-339)+(1.011)+(2.058), (I-339)+(1.011)+(2.059), (I-339)+(1.011)+(3.001), (I-339)+(1.011)+(3.002), (I-339)+(1.011)+(3.003), (I-339)+(1.011)+(3.004), (I-339)+(1.011)+(3.005), (I-339)+(1.011)+(3.006), (I-339)+(1.011)+(3.007), (I-339)+(1.011)+(3.008), (I-339)+(1.011)+(3.009), (I-339)+(1.011)+(3.010), (I-339)+(1.011)+(3.011), (I-339)+(1.011)+(3.012), (I-339)+(1.011)+(3.013), (I-339)+(1.011)+(3.014), (I-339)+(1.011)+(3.015), (I-339)+(1.011)+(3.016), (I-339)+(1.011)+(3.017), (I-339)+(1.011)+(3.018), (I-339)+(1.011)+(3.019), (I-339)+(1.011)+(3.020), (I-339)+(1.011)+(3.021), (I-339)+(1.011)+(3.022), (I-339)+(1.011)+(3.023), (I-339)+(1.011)+(3.024), (I-339)+(1.011)+(3.025), (I-339)+(1.011)+(3.026), (I-339)+(1.011)+(3.027), (I-339)+(1.011)+(3.028), (I-339)+(1.011)+(3.029), (I-339)+(1.011)+(3.030), (I-339)+(1.011)+(3.031), (I-339)+(1.011)+(5.001), (I-339)+(1.011)+(5.002), (I-339)+(1.011)+(5.003), (I-339)+(1.011)+(5.004), (I-339)+(1.011)+(5.005), (I-339)+(1.011)+(5.006), (I-339)+(1.011)+(5.007), (I-339)+(1.011)+(5.008), (I-339)+(1.011)+(5.009), (I-339)+(1.011)+(5.010), (I-339)+(1.011)+(5.011), (I-339)+(1.011)+(5.012), (I-339)+(1.011)+(5.013), (I-339)+(1.011)+(5.014), (I-339)+(1.011)+(5.015), (I-339)+(1.011)+(5.016), (I-339)+(1.011)+(5.017), (I-339)+(1.011)+(5.018), (I-339)+(1.011)+(5.019), (I-339)+(1.011)+(5.020), (I-339)+(1.011)+(5.021), (I-339)+(1.011)+(5.022), (I-339)+(1.011)+(5.023), (I-339)+(1.011)+(6.001), (I-339)+(1.011)+(6.002), (I-339)+(1.011)+(6.003), (I-339)+(1.011)+(6.004), (I-339)+(1.011)+(7.001), (I-339)+(1.011)+(7.002), (I-339)+(1.011)+(7.003), (I-339)+(1.011)+(7.004), (I-339)+(1.011)+(7.005), (I-339)+(1.011)+(7.006), (I-339)+(1.011)+(9.001), (I-339)+(1.011)+(9.002), (I-339)+(1.011)+(9.003), (I-339)+(1.011)+(9.004), (I-339)+(1.011)+(9.005), (I-339)+(1.011)+(9.006), (I-339)+(1.011)+(9.007), (I-339)+(1.011)+(9.008), (I-339)+(1.011)+(9.009), (I-339)+(1.011)+(14.001), (I-339)+(1.011)+(14.002), (I-339)+(1.011)+(15.008), (I-339)+(1.011)+(15.011), (I-339)+(1.011)+(15.012), (I-339)+(1.011)+(15.016), (I-339)+(1.011)+(15.025), (I-339)+(1.011)+(15.027), (I-339)+(1.011)+(15.047), (I-339)+(1.011)+(15.063), (I-339)+(1.011)+(15.064), (I-339)+(1.011)+(16.001), (I-339)+(1.011)+(16.002), (I-339)+(1.011)+(16.003), (I-339)+(1.011)+(16.004), (I-339)+(1.011)+(16.005), (I-339)+(1.011)+(16.006), (I-339)+(1.011)+(16.007), (I-339)+(1.011)+(16.008), (I-339)+(1.011)+(17.001), (I-339)+(1.011)+(17.002), (I-339)+(1.011)+(17.003), (I-339)+(1.011)+(17.004), (I-339)+(1.011)+(17.005), (I-339)+(1.011)+(17.006), (I-339)+(1.011)+(17.007), (I-339)+(1.011)+(17.008), (I-339)+(1.011)+(17.009), (I-339)+(1.011)+(17.010), (I-339)+(1.011)+(17.011), (I-339)+(1.011)+(17.012), (I-339)+(1.011)+(18.001), (I-339)+(1.012)+(1.013), (I-339)+(1.012)+(1.014), (I-339)+(1.012)+(1.015), (I-339)+(1.012)+(1.016), (I-339)+(1.012)+(1.017), (I-339)+(1.012)+(1.018), (I-339)+(1.012)+(1.019), (I-339)+(1.012)+(1.020), (I-339)+(1.012)+(1.021), (I-339)+(1.012)+(1.022), (I-339)+(1.012)+(1.023), (I-339)+(1.012)+(1.024), (I-339)+(1.012)+(1.025), (I-339)+(1.012)+(1.026), (I-339)+(1.012)+(1.027), (I-339)+(1.012)+(1.028), (I-339)+(1.012)+(1.029), (I-339)+(1.012)+(1.030), (I-339)+(1.012)+(1.031), (I-339)+(1.012)+(1.032), (I-339)+(1.012)+(1.033), (I-339)+(1.012)+(1.034), (I-339)+(1.012)+(1.035), (I-339)+(1.012)+(1.036), (I-339)+(1.012)+(1.037), (I-339)+(1.012)+(1.038), (I-339)+(1.012)+(1.039), (I-339)+(1.012)+(1.040), (I-339)+(1.012)+(1.041), (I-339)+(1.012)+(1.042), (I-339)+(1.012)+(1.043), (I-339)+(1.012)+(1.044), (I-339)+(1.012)+(1.045), (I-339)+(1.012)+(1.046), (I-339)+(1.012)+(1.047), (I-339)+(1.012)+(1.048), (I-339)+(1.012)+(1.049), (I-339)+(1.012)+(1.050), (I-339)+(1.012)+(1.051), (I-339)+(1.012)+(1.052), (I-339)+(1.012)+(1.053), (I-339)+(1.012)+(1.054), (I-339)+(1.012)+(1.055), (I-339)+(1.012)+(1.056), (I-339)+(1.012)+(1.057), (I-339)+(1.012)+(1.058), (I-339)+(1.012)+(1.059), (I-339)+(1.012)+(1.060), (I-339)+(1.012)+(1.061), (I-339)+(1.012)+(1.062), (I-339)+(1.012)+(1.063), (I-339)+(1.012)+(1.064), (I-339)+(1.012)+(1.065), (I-339)+(1.012)+(1.066), (I-339)+(1.012)+(1.067), (I-339)+(1.012)+(1.068), (I-339)+(1.012)+(1.069), (I-339)+(1.012)+(1.070), (I-339)+(1.012)+(1.071), (I-339)+(1.012)+(1.072), (I-339)+(1.012)+(1.073), (I-339)+(1.012)+(1.074), (I-339)+(1.012)+(1.075), (I-339)+(1.012)+(1.076), (I-339)+(1.012)+(1.077), (I-339)+(1.012)+(1.078), (I-339)+(1.012)+(1.079), (I-339)+(1.012)+(1.080), (I-339)+(1.012)+(1.081), (I-339)+(1.012)+(1.082), (I-339)+(1.012)+(1.083), (I-339)+(1.012)+(1.084), (I-339)+(1.012)+(1.085), (I-339)+(1.012)+(1.086), (I-339)+(1.012)+(1.087), (I-339)+(1.012)+(1.088), (I-339)+(1.012)+(1.089), (I-339)+(1.012)+(1.090), (I-339)+(1.012)+(1.091), (I-339)+(1.012)+(1.092), (I-339)+(1.012)+(2.001), (I-339)+(1.012)+(2.002), (I-339)+(1.012)+(2.003), (I-339)+(1.012)+(2.004), (I-339)+(1.012)+(2.005), (I-339)+(1.012)+(2.006), (I-339)+(1.012)+(2.007), (I-339)+(1.012)+(2.008), (I-339)+(1.012)+(2.009), (I-339)+(1.012)+(2.010), (I-339)+(1.012)+(2.011), (I-339)+(1.012)+(2.012), (I-339)+(1.012)+(2.013), (I-339)+(1.012)+(2.014), (I-339)+(1.012)+(2.015), (I-339)+(1.012)+(2.016), (I-339)+(1.012)+(2.017), (I-339)+(1.012)+(2.018), (I-339)+(1.012)+(2.019), (I-339)+(1.012)+(2.020), (I-339)+(1.012)+(2.021), (I-339)+(1.012)+(2.022), (I-339)+(1.012)+(2.023), (I-339)+(1.012)+(2.024), (I-339)+(1.012)+(2.025), (I-339)+(1.012)+(2.026), (I-339)+(1.012)+(2.027), (I-339)+(1.012)+(2.028), (I-339)+(1.012)+(2.029), (I-339)+(1.012)+(2.030), (I-339)+(1.012)+(2.031), (I-339)+(1.012)+(2.032), (I-339)+(1.012)+(2.033), (I-339)+(1.012)+(2.034), (I-339)+(1.012)+(2.035), (I-339)+(1.012)+(2.036), (I-339)+(1.012)+(2.037), (I-339)+(1.012)+(2.038), (I-339)+(1.012)+(2.039), (I-339)+(1.012)+(2.040), (I-339)+(1.012)+(2.041), (I-339)+(1.012)+(2.042), (I-339)+(1.012)+(2.043), (I-339)+(1.012)+(2.044), (I-339)+(1.012)+(2.045), (I-339)+(1.012)+(2.046), (I-339)+(1.012)+(2.047), (I-339)+(1.012)+(2.048), (I-339)+(1.012)+(2.049), (I-339)+(1.012)+(2.050), (I-339)+(1.012)+(2.051), (I-339)+(1.012)+(2.052), (I-339)+(1.012)+(2.053), (I-339)+(1.012)+(2.054), (I-339)+(1.012)+(2.055), (I-339)+(1.012)+(2.056), (I-339)+(1.012)+(2.057), (I-339)+(1.012)+(2.058), (I-339)+(1.012)+(2.059), (I-339)+(1.012)+(3.001), (I-339)+(1.012)+(3.002), (I-339)+(1.012)+(3.003), (I-339)+(1.012)+(3.004), (I-339)+(1.012)+(3.005), (I-339)+(1.012)+(3.006), (I-339)+(1.012)+(3.007), (I-339)+(1.012)+(3.008), (I-339)+(1.012)+(3.009), (I-339)+(1.012)+(3.010), (I-339)+(1.012)+(3.011), (I-339)+(1.012)+(3.012), (I-339)+(1.012)+(3.013), (I-339)+(1.012)+(3.014), (I-339)+(1.012)+(3.015), (I-339)+(1.012)+(3.016), (I-339)+(1.012)+(3.017), (I-339)+(1.012)+(3.018), (I-339)+(1.012)+(3.019), (I-339)+(1.012)+(3.020), (I-339)+(1.012)+(3.021), (I-339)+(1.012)+(3.022), (I-339)+(1.012)+(3.023), (I-339)+(1.012)+(3.024), (I-339)+(1.012)+(3.025), (I-339)+(1.012)+(3.026), (I-339)+(1.012)+(3.027), (I-339)+(1.012)+(3.028), (I-339)+(1.012)+(3.029), (I-339)+(1.012)+(3.030), (I-339)+(1.012)+(3.031), (I-339)+(1.012)+(5.001), (I-339)+(1.012)+(5.002), (I-339)+(1.012)+(5.003), (I-339)+(1.012)+(5.004), (I-339)+(1.012)+(5.005), (I-339)+(1.012)+(5.006), (I-339)+(1.012)+(5.007), (I-339)+(1.012)+(5.008), (I-339)+(1.012)+(5.009), (I-339)+(1.012)+(5.010), (I-339)+(1.012)+(5.011), (I-339)+(1.012)+(5.012), (I-339)+(1.012)+(5.013), (I-339)+(1.012)+(5.014), (I-339)+(1.012)+(5.015), (I-339)+(1.012)+(5.016), (I-339)+(1.012)+(5.017), (I-339)+(1.012)+(5.018), (I-339)+(1.012)+(5.019), (I-339)+(1.012)+(5.020), (I-339)+(1.012)+(5.021), (I-339)+(1.012)+(5.022), (I-339)+(1.012)+(5.023), (I-339)+(1.012)+(6.001), (I-339)+(1.012)+(6.002), (I-339)+(1.012)+(6.003), (I-339)+(1.012)+(6.004), (I-339)+(1.012)+(7.001), (I-339)+(1.012)+(7.002), (I-339)+(1.012)+(7.003), (I-339)+(1.012)+(7.004), (I-339)+(1.012)+(7.005), (I-339)+(1.012)+(7.006), (I-339)+(1.012)+(9.001), (I-339)+(1.012)+(9.002), (I-339)+(1.012)+(9.003), (I-339)+(1.012)+(9.004), (I-339)+(1.012)+(9.005), (I-339)+(1.012)+(9.006), (I-339)+(1.012)+(9.007), (I-339)+(1.012)+(9.008), (I-339)+(1.012)+(9.009), (I-339)+(1.012)+(14.001), (I-339)+(1.012)+(14.002), (I-339)+(1.012)+(15.008), (I-339)+(1.012)+(15.011), (I-339)+(1.012)+(15.012), (I-339)+(1.012)+(15.016), (I-339)+(1.012)+(15.025), (I-339)+(1.012)+(15.027), (I-339)+(1.012)+(15.047), (I-339)+(1.012)+(15.063), (I-339)+(1.012)+(15.064), (I-339)+(1.012)+(16.001), (I-339)+(1.012)+(16.002), (I-339)+(1.012)+(16.003), (I-339)+(1.012)+(16.004), (I-339)+(1.012)+(16.005), (I-339)+(1.012)+(16.006), (I-339)+(1.012)+(16.007), (I-339)+(1.012)+(16.008), (I-339)+(1.012)+(17.001), (I-339)+(1.012)+(17.002), (I-339)+(1.012)+(17.003), (I-339)+(1.012)+(17.004), (I-339)+(1.012)+(17.005), (I-339)+(1.012)+(17.006), (I-339)+(1.012)+(17.007), (I-339)+(1.012)+(17.008), (I-339)+(1.012)+(17.009), (I-339)+(1.012)+(17.010), (I-339)+(1.012)+(17.011), (I-339)+(1.012)+(17.012), (I-339)+(1.012)+(18.001), (I-339)+(1.013)+(1.014), (I-339)+(1.013)+(1.015), (I-339)+(1.013)+(1.016), (I-339)+(1.013)+(1.017), (I-339)+(1.013)+(1.018), (I-339)+(1.013)+(1.019), (I-339)+(1.013)+(1.020), (I-339)+(1.013)+(1.021), (I-339)+(1.013)+(1.022), (I-339)+(1.013)+(1.023), (I-339)+(1.013)+(1.024), (I-339)+(1.013)+(1.025), (I-339)+(1.013)+(1.026), (I-339)+(1.013)+(1.027), (I-339)+(1.013)+(1.028), (I-339)+(1.013)+(1.029), (I-339)+(1.013)+(1.030), (I-339)+(1.013)+(1.031), (I-339)+(1.013)+(1.032), (I-339)+(1.013)+(1.033), (I-339)+(1.013)+(1.034), (I-339)+(1.013)+(1.035), (I-339)+(1.013)+(1.036), (I-339)+(1.013)+(1.037), (I-339)+(1.013)+(1.038), (I-339)+(1.013)+(1.039), (I-339)+(1.013)+(1.040), (I-339)+(1.013)+(1.041), (I-339)+(1.013)+(1.042), (I-339)+(1.013)+(1.043), (I-339)+(1.013)+(1.044), (I-339)+(1.013)+(1.045), (I-339)+(1.013)+(1.046), (I-339)+(1.013)+(1.047), (I-339)+(1.013)+(1.048), (I-339)+(1.013)+(1.049), (I-339)+(1.013)+(1.050), (I-339)+(1.013)+(1.051), (I-339)+(1.013)+(1.052), (I-339)+(1.013)+(1.053), (I-339)+(1.013)+(1.054), (I-339)+(1.013)+(1.055), (I-339)+(1.013)+(1.056), (I-339)+(1.013)+(1.057), (I-339)+(1.013)+(1.058), (I-339)+(1.013)+(1.059), (I-339)+(1.013)+(1.060), (I-339)+(1.013)+(1.061), (I-339)+(1.013)+(1.062), (I-339)+(1.013)+(1.063), (I-339)+(1.013)+(1.064), (I-339)+(1.013)+(1.065), (I-339)+(1.013)+(1.066), (I-339)+(1.013)+(1.067), (I-339)+(1.013)+(1.068), (I-339)+(1.013)+(1.069), (I-339)+(1.013)+(1.070), (I-339)+(1.013)+(1.071), (I-339)+(1.013)+(1.072), (I-339)+(1.013)+(1.073), (I-339)+(1.013)+(1.074), (I-339)+(1.013)+(1.075), (I-339)+(1.013)+(1.076), (I-339)+(1.013)+(1.077), (I-339)+(1.013)+(1.078), (I-339)+(1.013)+(1.079), (I-339)+(1.013)+(1.080), (I-339)+(1.013)+(1.081), (I-339)+(1.013)+(1.082), (I-339)+(1.013)+(1.083), (I-339)+(1.013)+(1.084), (I-339)+(1.013)+(1.085), (I-339)+(1.013)+(1.086), (I-339)+(1.013)+(1.087), (I-339)+(1.013)+(1.088), (I-339)+(1.013)+(1.089), (I-339)+(1.013)+(1.090), (I-339)+(1.013)+(1.091), (I-339)+(1.013)+(1.092), (I-339)+(1.013)+(2.001), (I-339)+(1.013)+(2.002), (I-339)+(1.013)+(2.003), (I-339)+(1.013)+(2.004), (I-339)+(1.013)+(2.005), (I-339)+(1.013)+(2.006), (I-339)+(1.013)+(2.007), (I-339)+(1.013)+(2.008), (I-339)+(1.013)+(2.009), (I-339)+(1.013)+(2.010), (I-339)+(1.013)+(2.011), (I-339)+(1.013)+(2.012), (I-339)+(1.013)+(2.013), (I-339)+(1.013)+(2.014), (I-339)+(1.013)+(2.015), (I-339)+(1.013)+(2.016), (I-339)+(1.013)+(2.017), (I-339)+(1.013)+(2.018), (I-339)+(1.013)+(2.019), (I-339)+(1.013)+(2.020), (I-339)+(1.013)+(2.021), (I-339)+(1.013)+(2.022), (I-339)+(1.013)+(2.023), (I-339)+(1.013)+(2.024), (I-339)+(1.013)+(2.025), (I-339)+(1.013)+(2.026), (I-339)+(1.013)+(2.027), (I-339)+(1.013)+(2.028), (I-339)+(1.013)+(2.029), (I-339)+(1.013)+(2.030), (I-339)+(1.013)+(2.031), (I-339)+(1.013)+(2.032), (I-339)+(1.013)+(2.033), (I-339)+(1.013)+(2.034), (I-339)+(1.013)+(2.035), (I-339)+(1.013)+(2.036), (I-339)+(1.013)+(2.037), (I-339)+(1.013)+(2.038), (I-339)+(1.013)+(2.039), (I-339)+(1.013)+(2.040), (I-339)+(1.013)+(2.041), (I-339)+(1.013)+(2.042), (I-339)+(1.013)+(2.043), (I-339)+(1.013)+(2.044), (I-339)+(1.013)+(2.045), (I-339)+(1.013)+(2.046), (I-339)+(1.013)+(2.047), (I-339)+(1.013)+(2.048), (I-339)+(1.013)+(2.049), (I-339)+(1.013)+(2.050), (I-339)+(1.013)+(2.051), (I-339)+(1.013)+(2.052), (I-339)+(1.013)+(2.053), (I-339)+(1.013)+(2.054), (I-339)+(1.013)+(2.055), (I-339)+(1.013)+(2.056), (I-339)+(1.013)+(2.057), (I-339)+(1.013)+(2.058), (I-339)+(1.013)+(2.059), (I-339)+(1.013)+(3.001), (I-339)+(1.013)+(3.002), (I-339)+(1.013)+(3.003), (I-339)+(1.013)+(3.004), (I-339)+(1.013)+(3.005), (I-339)+(1.013)+(3.006), (I-339)+(1.013)+(3.007), (I-339)+(1.013)+(3.008), (I-339)+(1.013)+(3.009), (I-339)+(1.013)+(3.010), (I-339)+(1.013)+(3.011), (I-339)+(1.013)+(3.012), (I-339)+(1.013)+(3.013), (I-339)+(1.013)+(3.014), (I-339)+(1.013)+(3.015), (I-339)+(1.013)+(3.016), (I-339)+(1.013)+(3.017), (I-339)+(1.013)+(3.018), (I-339)+(1.013)+(3.019), (I-339)+(1.013)+(3.020), (I-339)+(1.013)+(3.021), (I-339)+(1.013)+(3.022), (I-339)+(1.013)+(3.023), (I-339)+(1.013)+(3.024), (I-339)+(1.013)+(3.025), (I-339)+(1.013)+(3.026), (I-339)+(1.013)+(3.027), (I-339)+(1.013)+(3.028), (I-339)+(1.013)+(3.029), (I-339)+(1.013)+(3.030), (I-339)+(1.013)+(3.031), (I-339)+(1.013)+(5.001), (I-339)+(1.013)+(5.002), (I-339)+(1.013)+(5.003), (I-339)+(1.013)+(5.004), (I-339)+(1.013)+(5.005), (I-339)+(1.013)+(5.006), (I-339)+(1.013)+(5.007), (I-339)+(1.013)+(5.008), (I-339)+(1.013)+(5.009), (I-339)+(1.013)+(5.010), (I-339)+(1.013)+(5.011), (I-339)+(1.013)+(5.012), (I-339)+(1.013)+(5.013), (I-339)+(1.013)+(5.014), (I-339)+(1.013)+(5.015), (I-339)+(1.013)+(5.016), (I-339)+(1.013)+(5.017), (I-339)+(1.013)+(5.018), (I-339)+(1.013)+(5.019), (I-339)+(1.013)+(5.020), (I-339)+(1.013)+(5.021), (I-339)+(1.013)+(5.022), (I-339)+(1.013)+(5.023), (I-339)+(1.013)+(6.001), (I-339)+(1.013)+(6.002), (I-339)+(1.013)+(6.003), (I-339)+(1.013)+(6.004), (I-339)+(1.013)+(7.001), (I-339)+(1.013)+(7.002), (I-339)+(1.013)+(7.003), (I-339)+(1.013)+(7.004), (I-339)+(1.013)+(7.005), (I-339)+(1.013)+(7.006), (I-339)+(1.013)+(9.001), (I-339)+(1.013)+(9.002), (I-339)+(1.013)+(9.003), (I-339)+(1.013)+(9.004), (I-339)+(1.013)+(9.005), (I-339)+(1.013)+(9.006), (I-339)+(1.013)+(9.007), (I-339)+(1.013)+(9.008), (I-339)+(1.013)+(9.009), (I-339)+(1.013)+(14.001), (I-339)+(1.013)+(14.002), (I-339)+(1.013)+(15.008), (I-339)+(1.013)+(15.011), (I-339)+(1.013)+(15.012), (I-339)+(1.013)+(15.016), (I-339)+(1.013)+(15.025), (I-339)+(1.013)+(15.027), (I-339)+(1.013)+(15.047), (I-339)+(1.013)+(15.063), (I-339)+(1.013)+(15.064), (I-339)+(1.013)+(16.001), (I-339)+(1.013)+(16.002), (I-339)+(1.013)+(16.003), (I-339)+(1.013)+(16.004), (I-339)+(1.013)+(16.005), (I-339)+(1.013)+(16.006), (I-339)+(1.013)+(16.007), (I-339)+(1.013)+(16.008), (I-339)+(1.013)+(17.001), (I-339)+(1.013)+(17.002), (I-339)+(1.013)+(17.003), (I-339)+(1.013)+(17.004), (I-339)+(1.013)+(17.005), (I-339)+(1.013)+(17.006), (I-339)+(1.013)+(17.007), (I-339)+(1.013)+(17.008), (I-339)+(1.013)+(17.009), (I-339)+(1.013)+(17.010), (I-339)+(1.013)+(17.011), (I-339)+(1.013)+(17.012), (I-339)+(1.013)+(18.001), (I-339)+(1.014)+(1.015), (I-339)+(1.014)+(1.016), (I-339)+(1.014)+(1.017), (I-339)+(1.014)+(1.018), (I-339)+(1.014)+(1.019), (I-339)+(1.014)+(1.020), (I-339)+(1.014)+(1.021), (I-339)+(1.014)+(1.022), (I-339)+(1.014)+(1.023), (I-339)+(1.014)+(1.024), (I-339)+(1.014)+(1.025), (I-339)+(1.014)+(1.026), (I-339)+(1.014)+(1.027), (I-339)+(1.014)+(1.028), (I-339)+(1.014)+(1.029), (I-339)+(1.014)+(1.030), (I-339)+(1.014)+(1.031), (I-339)+(1.014)+(1.032), (I-339)+(1.014)+(1.033), (I-339)+(1.014)+(1.034), (I-339)+(1.014)+(1.035), (I-339)+(1.014)+(1.036), (I-339)+(1.014)+(1.037), (I-339)+(1.014)+(1.038), (I-339)+(1.014)+(1.039), (I-339)+(1.014)+(1.040), (I-339)+(1.014)+(1.041), (I-339)+(1.014)+(1.042), (I-339)+(1.014)+(1.043), (I-339)+(1.014)+(1.044), (I-339)+(1.014)+(1.045), (I-339)+(1.014)+(1.046), (I-339)+(1.014)+(1.047), (I-339)+(1.014)+(1.048), (I-339)+(1.014)+(1.049), (I-339)+(1.014)+(1.050), (I-339)+(1.014)+(1.051), (I-339)+(1.014)+(1.052), (I-339)+(1.014)+(1.053), (I-339)+(1.014)+(1.054), (I-339)+(1.014)+(1.055), (I-339)+(1.014)+(1.056), (I-339)+(1.014)+(1.057), (I-339)+(1.014)+(1.058), (I-339)+(1.014)+(1.059), (I-339)+(1.014)+(1.060), (I-339)+(1.014)+(1.061), (I-339)+(1.014)+(1.062), (I-339)+(1.014)+(1.063), (I-339)+(1.014)+(1.064), (I-339)+(1.014)+(1.065), (I-339)+(1.014)+(1.066), (I-339)+(1.014)+(1.067), (I-339)+(1.014)+(1.068), (I-339)+(1.014)+(1.069), (I-339)+(1.014)+(1.070), (I-339)+(1.014)+(1.071), (I-339)+(1.014)+(1.072), (I-339)+(1.014)+(1.073), (I-339)+(1.014)+(1.074), (I-339)+(1.014)+(1.075), (I-339)+(1.014)+(1.076), (I-339)+(1.014)+(1.077), (I-339)+(1.014)+(1.078), (I-339)+(1.014)+(1.079), (I-339)+(1.014)+(1.080), (I-339)+(1.014)+(1.081), (I-339)+(1.014)+(1.082), (I-339)+(1.014)+(1.083), (I-339)+(1.014)+(1.084), (I-339)+(1.014)+(1.085), (I-339)+(1.014)+(1.086), (I-339)+(1.014)+(1.087), (I-339)+(1.014)+(1.088), (I-339)+(1.014)+(1.089), (I-339)+(1.014)+(1.090), (I-339)+(1.014)+(1.091), (I-339)+(1.014)+(1.092), (I-339)+(1.014)+(2.001), (I-339)+(1.014)+(2.002), (I-339)+(1.014)+(2.003), (I-339)+(1.014)+(2.004), (I-339)+(1.014)+(2.005), (I-339)+(1.014)+(2.006), (I-339)+(1.014)+(2.007), (I-339)+(1.014)+(2.008), (I-339)+(1.014)+(2.009), (I-339)+(1.014)+(2.010), (I-339)+(1.014)+(2.011), (I-339)+(1.014)+(2.012), (I-339)+(1.014)+(2.013), (I-339)+(1.014)+(2.014), (I-339)+(1.014)+(2.015), (I-339)+(1.014)+(2.016), (I-339)+(1.014)+(2.017), (I-339)+(1.014)+(2.018), (I-339)+(1.014)+(2.019), (I-339)+(1.014)+(2.020), (I-339)+(1.014)+(2.021), (I-339)+(1.014)+(2.022), (I-339)+(1.014)+(2.023), (I-339)+(1.014)+(2.024), (I-339)+(1.014)+(2.025), (I-339)+(1.014)+(2.026), (I-339)+(1.014)+(2.027), (I-339)+(1.014)+(2.028), (I-339)+(1.014)+(2.029), (I-339)+(1.014)+(2.030), (I-339)+(1.014)+(2.031), (I-339)+(1.014)+(2.032), (I-339)+(1.014)+(2.033), (I-339)+(1.014)+(2.034), (I-339)+(1.014)+(2.035), (I-339)+(1.014)+(2.036), (I-339)+(1.014)+(2.037), (I-339)+(1.014)+(2.038), (I-339)+(1.014)+(2.039), (I-339)+(1.014)+(2.040), (I-339)+(1.014)+(2.041), (I-339)+(1.014)+(2.042), (I-339)+(1.014)+(2.043), (I-339)+(1.014)+(2.044), (I-339)+(1.014)+(2.045), (I-339)+(1.014)+(2.046), (I-339)+(1.014)+(2.047), (I-339)+(1.014)+(2.048), (I-339)+(1.014)+(2.049), (I-339)+(1.014)+(2.050), (I-339)+(1.014)+(2.051), (I-339)+(1.014)+(2.052), (I-339)+(1.014)+(2.053), (I-339)+(1.014)+(2.054), (I-339)+(1.014)+(2.055), (I-339)+(1.014)+(2.056), (I-339)+(1.014)+(2.057), (I-339)+(1.014)+(2.058), (I-339)+(1.014)+(2.059), (I-339)+(1.014)+(3.001), (I-339)+(1.014)+(3.002), (I-339)+(1.014)+(3.003), (I-339)+(1.014)+(3.004), (I-339)+(1.014)+(3.005), (I-339)+(1.014)+(3.006), (I-339)+(1.014)+(3.007), (I-339)+(1.014)+(3.008), (I-339)+(1.014)+(3.009), (I-339)+(1.014)+(3.010), (I-339)+(1.014)+(3.011), (I-339)+(1.014)+(3.012), (I-339)+(1.014)+(3.013), (I-339)+(1.014)+(3.014), (I-339)+(1.014)+(3.015), (I-339)+(1.014)+(3.016), (I-339)+(1.014)+(3.017), (I-339)+(1.014)+(3.018), (I-339)+(1.014)+(3.019), (I-339)+(1.014)+(3.020), (I-339)+(1.014)+(3.021), (I-339)+(1.014)+(3.022), (I-339)+(1.014)+(3.023), (I-339)+(1.014)+(3.024), (I-339)+(1.014)+(3.025), (I-339)+(1.014)+(3.026), (I-339)+(1.014)+(3.027), (I-339)+(1.014)+(3.028), (I-339)+(1.014)+(3.029), (I-339)+(1.014)+(3.030), (I-339)+(1.014)+(3.031), (I-339)+(1.014)+(5.001), (I-339)+(1.014)+(5.002), (I-339)+(1.014)+(5.003), (I-339)+(1.014)+(5.004), (I-339)+(1.014)+(5.005), (I-339)+(1.014)+(5.006), (I-339)+(1.014)+(5.007), (I-339)+(1.014)+(5.008), (I-339)+(1.014)+(5.009), (I-339)+(1.014)+(5.010), (I-339)+(1.014)+(5.011), (I-339)+(1.014)+(5.012), (I-339)+(1.014)+(5.013), (I-339)+(1.014)+(5.014), (I-339)+(1.014)+(5.015), (I-339)+(1.014)+(5.016), (I-339)+(1.014)+(5.017), (I-339)+(1.014)+(5.018), (I-339)+(1.014)+(5.019), (I-339)+(1.014)+(5.020), (I-339)+(1.014)+(5.021), (I-339)+(1.014)+(5.022), (I-339)+(1.014)+(5.023), (I-339)+(1.014)+(6.001), (I-339)+(1.014)+(6.002), (I-339)+(1.014)+(6.003), (I-339)+(1.014)+(6.004), (I-339)+(1.014)+(7.001), (I-339)+(1.014)+(7.002), (I-339)+(1.014)+(7.003), (I-339)+(1.014)+(7.004), (I-339)+(1.014)+(7.005), (I-339)+(1.014)+(7.006), (I-339)+(1.014)+(9.001), (I-339)+(1.014)+(9.002), (I-339)+(1.014)+(9.003), (I-339)+(1.014)+(9.004), (I-339)+(1.014)+(9.005), (I-339)+(1.014)+(9.006), (I-339)+(1.014)+(9.007), (I-339)+(1.014)+(9.008), (I-339)+(1.014)+(9.009), (I-339)+(1.014)+(14.001), (I-339)+(1.014)+(14.002), (I-339)+(1.014)+(15.008), (I-339)+(1.014)+(15.011), (I-339)+(1.014)+(15.012), (I-339)+(1.014)+(15.016), (I-339)+(1.014)+(15.025), (I-339)+(1.014)+(15.027), (I-339)+(1.014)+(15.047), (I-339)+(1.014)+(15.063), (I-339)+(1.014)+(15.064), (I-339)+(1.014)+(16.001), (I-339)+(1.014)+(16.002), (I-339)+(1.014)+(16.003), (I-339)+(1.014)+(16.004), (I-339)+(1.014)+(16.005), (I-339)+(1.014)+(16.006), (I-339)+(1.014)+(16.007), (I-339)+(1.014)+(16.008), (I-339)+(1.014)+(17.001), (I-339)+(1.014)+(17.002), (I-339)+(1.014)+(17.003), (I-339)+(1.014)+(17.004), (I-339)+(1.014)+(17.005), (I-339)+(1.014)+(17.006), (I-339)+(1.014)+(17.007), (I-339)+(1.014)+(17.008), (I-339)+(1.014)+(17.009), (I-339)+(1.014)+(17.010), (I-339)+(1.014)+(17.011), (I-339)+(1.014)+(17.012), (I-339)+(1.014)+(18.001), (I-339)+(1.015)+(1.016), (I-339)+(1.015)+(1.017), (I-339)+(1.015)+(1.018), (I-339)+(1.015)+(1.019), (I-339)+(1.015)+(1.020), (I-339)+(1.015)+(1.021), (I-339)+(1.015)+(1.022), (I-339)+(1.015)+(1.023), (I-339)+(1.015)+(1.024), (I-339)+(1.015)+(1.025), (I-339)+(1.015)+(1.026), (I-339)+(1.015)+(1.027), (I-339)+(1.015)+(1.028), (I-339)+(1.015)+(1.029), (I-339)+(1.015)+(1.030), (I-339)+(1.015)+(1.031), (I-339)+(1.015)+(1.032), (I-339)+(1.015)+(1.033), (I-339)+(1.015)+(1.034), (I-339)+(1.015)+(1.035), (I-339)+(1.015)+(1.036), (I-339)+(1.015)+(1.037), (I-339)+(1.015)+(1.038), (I-339)+(1.015)+(1.039), (I-339)+(1.015)+(1.040), (I-339)+(1.015)+(1.041), (I-339)+(1.015)+(1.042), (I-339)+(1.015)+(1.043), (I-339)+(1.015)+(1.044), (I-339)+(1.015)+(1.045), (I-339)+(1.015)+(1.046), (I-339)+(1.015)+(1.047), (I-339)+(1.015)+(1.048), (I-339)+(1.015)+(1.049), (I-339)+(1.015)+(1.050), (I-339)+(1.015)+(1.051), (I-339)+(1.015)+(1.052), (I-339)+(1.015)+(1.053), (I-339)+(1.015)+(1.054), (I-339)+(1.015)+(1.055), (I-339)+(1.015)+(1.056), (I-339)+(1.015)+(1.057), (I-339)+(1.015)+(1.058), (I-339)+(1.015)+(1.059), (I-339)+(1.015)+(1.060), (I-339)+(1.015)+(1.061), (I-339)+(1.015)+(1.062), (I-339)+(1.015)+(1.063), (I-339)+(1.015)+(1.064), (I-339)+(1.015)+(1.065), (I-339)+(1.015)+(1.066), (I-339)+(1.015)+(1.067), (I-339)+(1.015)+(1.068), (I-339)+(1.015)+(1.069), (I-339)+(1.015)+(1.070), (I-339)+(1.015)+(1.071), (I-339)+(1.015)+(1.072), (I-339)+(1.015)+(1.073), (I-339)+(1.015)+(1.074), (I-339)+(1.015)+(1.075), (I-339)+(1.015)+(1.076), (I-339)+(1.015)+(1.077), (I-339)+(1.015)+(1.078), (I-339)+(1.015)+(1.079), (I-339)+(1.015)+(1.080), (I-339)+(1.015)+(1.081), (I-339)+(1.015)+(1.082), (I-339)+(1.015)+(1.083), (I-339)+(1.015)+(1.084), (I-339)+(1.015)+(1.085), (I-339)+(1.015)+(1.086), (I-339)+(1.015)+(1.087), (I-339)+(1.015)+(1.088), (I-339)+(1.015)+(1.089), (I-339)+(1.015)+(1.090), (I-339)+(1.015)+(1.091), (I-339)+(1.015)+(1.092), (I-339)+(1.015)+(2.001), (I-339)+(1.015)+(2.002), (I-339)+(1.015)+(2.003), (I-339)+(1.015)+(2.004), (I-339)+(1.015)+(2.005), (I-339)+(1.015)+(2.006), (I-339)+(1.015)+(2.007), (I-339)+(1.015)+(2.008), (I-339)+(1.015)+(2.009), (I-339)+(1.015)+(2.010), (I-339)+(1.015)+(2.011), (I-339)+(1.015)+(2.012), (I-339)+(1.015)+(2.013), (I-339)+(1.015)+(2.014), (I-339)+(1.015)+(2.015), (I-339)+(1.015)+(2.016), (I-339)+(1.015)+(2.017), (I-339)+(1.015)+(2.018), (I-339)+(1.015)+(2.019), (I-339)+(1.015)+(2.020), (I-339)+(1.015)+(2.021), (I-339)+(1.015)+(2.022), (I-339)+(1.015)+(2.023), (I-339)+(1.015)+(2.024), (I-339)+(1.015)+(2.025), (I-339)+(1.015)+(2.026), (I-339)+(1.015)+(2.027), (I-339)+(1.015)+(2.028), (I-339)+(1.015)+(2.029), (I-339)+(1.015)+(2.030), (I-339)+(1.015)+(2.031), (I-339)+(1.015)+(2.032), (I-339)+(1.015)+(2.033), (I-339)+(1.015)+(2.034), (I-339)+(1.015)+(2.035), (I-339)+(1.015)+(2.036), (I-339)+(1.015)+(2.037), (I-339)+(1.015)+(2.038), (I-339)+(1.015)+(2.039), (I-339)+(1.015)+(2.040), (I-339)+(1.015)+(2.041), (I-339)+(1.015)+(2.042), (I-339)+(1.015)+(2.043), (I-339)+(1.015)+(2.044), (I-339)+(1.015)+(2.045), (I-339)+(1.015)+(2.046), (I-339)+(1.015)+(2.047), (I-339)+(1.015)+(2.048), (I-339)+(1.015)+(2.049), (I-339)+(1.015)+(2.050), (I-339)+(1.015)+(2.051), (I-339)+(1.015)+(2.052), (I-339)+(1.015)+(2.053), (I-339)+(1.015)+(2.054), (I-339)+(1.015)+(2.055), (I-339)+(1.015)+(2.056), (I-339)+(1.015)+(2.057), (I-339)+(1.015)+(2.058), (I-339)+(1.015)+(2.059), (I-339)+(1.015)+(3.001), (I-339)+(1.015)+(3.002), (I-339)+(1.015)+(3.003), (I-339)+(1.015)+(3.004), (I-339)+(1.015)+(3.005), (I-339)+(1.015)+(3.006), (I-339)+(1.015)+(3.007), (I-339)+(1.015)+(3.008), (I-339)+(1.015)+(3.009), (I-339)+(1.015)+(3.010), (I-339)+(1.015)+(3.011), (I-339)+(1.015)+(3.012), (I-339)+(1.015)+(3.013), (I-339)+(1.015)+(3.014), (I-339)+(1.015)+(3.015), (I-339)+(1.015)+(3.016), (I-339)+(1.015)+(3.017), (I-339)+(1.015)+(3.018), (I-339)+(1.015)+(3.019), (I-339)+(1.015)+(3.020), (I-339)+(1.015)+(3.021), (I-339)+(1.015)+(3.022), (I-339)+(1.015)+(3.023), (I-339)+(1.015)+(3.024), (I-339)+(1.015)+(3.025), (I-339)+(1.015)+(3.026), (I-339)+(1.015)+(3.027), (I-339)+(1.015)+(3.028), (I-339)+(1.015)+(3.029), (I-339)+(1.015)+(3.030), (I-339)+(1.015)+(3.031), (I-339)+(1.015)+(5.001), (I-339)+(1.015)+(5.002), (I-339)+(1.015)+(5.003), (I-339)+(1.015)+(5.004), (I-339)+(1.015)+(5.005), (I-339)+(1.015)+(5.006), (I-339)+(1.015)+(5.007), (I-339)+(1.015)+(5.008), (I-339)+(1.015)+(5.009), (I-339)+(1.015)+(5.010), (I-339)+(1.015)+(5.011), (I-339)+(1.015)+(5.012), (I-339)+(1.015)+(5.013), (I-339)+(1.015)+(5.014), (I-339)+(1.015)+(5.015), (I-339)+(1.015)+(5.016), (I-339)+(1.015)+(5.017), (I-339)+(1.015)+(5.018), (I-339)+(1.015)+(5.019), (I-339)+(1.015)+(5.020), (I-339)+(1.015)+(5.021), (I-339)+(1.015)+(5.022), (I-339)+(1.015)+(5.023), (I-339)+(1.015)+(6.001), (I-339)+(1.015)+(6.002), (I-339)+(1.015)+(6.003), (I-339)+(1.015)+(6.004), (I-339)+(1.015)+(7.001), (I-339)+(1.015)+(7.002), (I-339)+(1.015)+(7.003), (I-339)+(1.015)+(7.004), (I-339)+(1.015)+(7.005), (I-339)+(1.015)+(7.006), (I-339)+(1.015)+(9.001), (I-339)+(1.015)+(9.002), (I-339)+(1.015)+(9.003), (I-339)+(1.015)+(9.004), (I-339)+(1.015)+(9.005), (I-339)+(1.015)+(9.006), (I-339)+(1.015)+(9.007), (I-339)+(1.015)+(9.008), (I-339)+(1.015)+(9.009), (I-339)+(1.015)+(14.001), (I-339)+(1.015)+(14.002), (I-339)+(1.015)+(15.008), (I-339)+(1.015)+(15.011), (I-339)+(1.015)+(15.012), (I-339)+(1.015)+(15.016), (I-339)+(1.015)+(15.025), (I-339)+(1.015)+(15.027), (I-339)+(1.015)+(15.047), (I-339)+(1.015)+(15.063), (I-339)+(1.015)+(15.064), (I-339)+(1.015)+(16.001), (I-339)+(1.015)+(16.002), (I-339)+(1.015)+(16.003), (I-339)+(1.015)+(16.004), (I-339)+(1.015)+(16.005), (I-339)+(1.015)+(16.006), (I-339)+(1.015)+(16.007), (I-339)+(1.015)+(16.008), (I-339)+(1.015)+(17.001), (I-339)+(1.015)+(17.002), (I-339)+(1.015)+(17.003), (I-339)+(1.015)+(17.004), (I-339)+(1.015)+(17.005), (I-339)+(1.015)+(17.006), (I-339)+(1.015)+(17.007), (I-339)+(1.015)+(17.008), (I-339)+(1.015)+(17.009), (I-339)+(1.015)+(17.010), (I-339)+(1.015)+(17.011), (I-339)+(1.015)+(17.012), (I-339)+(1.015)+(18.001), (I-339)+(1.016)+(1.017), (I-339)+(1.016)+(1.018), (I-339)+(1.016)+(1.019), (I-339)+(1.016)+(1.020), (I-339)+(1.016)+(1.021), (I-339)+(1.016)+(1.022), (I-339)+(1.016)+(1.023), (I-339)+(1.016)+(1.024), (I-339)+(1.016)+(1.025), (I-339)+(1.016)+(1.026), (I-339)+(1.016)+(1.027), (I-339)+(1.016)+(1.028), (I-339)+(1.016)+(1.029), (I-339)+(1.016)+(1.030), (I-339)+(1.016)+(1.031), (I-339)+(1.016)+(1.032), (I-339)+(1.016)+(1.033), (I-339)+(1.016)+(1.034), (I-339)+(1.016)+(1.035), (I-339)+(1.016)+(1.036), (I-339)+(1.016)+(1.037), (I-339)+(1.016)+(1.038), (I-339)+(1.016)+(1.039), (I-339)+(1.016)+(1.040), (I-339)+(1.016)+(1.041), (I-339)+(1.016)+(1.042), (I-339)+(1.016)+(1.043), (I-339)+(1.016)+(1.044), (I-339)+(1.016)+(1.045), (I-339)+(1.016)+(1.046), (I-339)+(1.016)+(1.047), (I-339)+(1.016)+(1.048), (I-339)+(1.016)+(1.049), (I-339)+(1.016)+(1.050), (I-339)+(1.016)+(1.051), (I-339)+(1.016)+(1.052), (I-339)+(1.016)+(1.053), (I-339)+(1.016)+(1.054), (I-339)+(1.016)+(1.055), (I-339)+(1.016)+(1.056), (I-339)+(1.016)+(1.057), (I-339)+(1.016)+(1.058), (I-339)+(1.016)+(1.059), (I-339)+(1.016)+(1.060), (I-339)+(1.016)+(1.061), (I-339)+(1.016)+(1.062), (I-339)+(1.016)+(1.063), (I-339)+(1.016)+(1.064), (I-339)+(1.016)+(1.065), (I-339)+(1.016)+(1.066), (I-339)+(1.016)+(1.067), (I-339)+(1.016)+(1.068), (I-339)+(1.016)+(1.069), (I-339)+(1.016)+(1.070), (I-339)+(1.016)+(1.071), (I-339)+(1.016)+(1.072), (I-339)+(1.016)+(1.073), (I-339)+(1.016)+(1.074), (I-339)+(1.016)+(1.075), (I-339)+(1.016)+(1.076), (I-339)+(1.016)+(1.077), (I-339)+(1.016)+(1.078), (I-339)+(1.016)+(1.079), (I-339)+(1.016)+(1.080), (I-339)+(1.016)+(1.081), (I-339)+(1.016)+(1.082), (I-339)+(1.016)+(1.083), (I-339)+(1.016)+(1.084), (I-339)+(1.016)+(1.085), (I-339)+(1.016)+(1.086), (I-339)+(1.016)+(1.087), (I-339)+(1.016)+(1.088), (I-339)+(1.016)+(1.089), (I-339)+(1.016)+(1.090), (I-339)+(1.016)+(1.091), (I-339)+(1.016)+(1.092), (I-339)+(1.016)+(2.001), (I-339)+(1.016)+(2.002), (I-339)+(1.016)+(2.003), (I-339)+(1.016)+(2.004), (I-339)+(1.016)+(2.005), (I-339)+(1.016)+(2.006), (I-339)+(1.016)+(2.007), (I-339)+(1.016)+(2.008), (I-339)+(1.016)+(2.009), (I-339)+(1.016)+(2.010), (I-339)+(1.016)+(2.011), (I-339)+(1.016)+(2.012), (I-339)+(1.016)+(2.013), (I-339)+(1.016)+(2.014), (I-339)+(1.016)+(2.015), (I-339)+(1.016)+(2.016), (I-339)+(1.016)+(2.017), (I-339)+(1.016)+(2.018), (I-339)+(1.016)+(2.019), (I-339)+(1.016)+(2.020), (I-339)+(1.016)+(2.021), (I-339)+(1.016)+(2.022), (I-339)+(1.016)+(2.023), (I-339)+(1.016)+(2.024), (I-339)+(1.016)+(2.025), (I-339)+(1.016)+(2.026), (I-339)+(1.016)+(2.027), (I-339)+(1.016)+(2.028), (I-339)+(1.016)+(2.029), (I-339)+(1.016)+(2.030), (I-339)+(1.016)+(2.031), (I-339)+(1.016)+(2.032), (I-339)+(1.016)+(2.033), (I-339)+(1.016)+(2.034), (I-339)+(1.016)+(2.035), (I-339)+(1.016)+(2.036), (I-339)+(1.016)+(2.037), (I-339)+(1.016)+(2.038), (I-339)+(1.016)+(2.039), (I-339)+(1.016)+(2.040), (I-339)+(1.016)+(2.041), (I-339)+(1.016)+(2.042), (I-339)+(1.016)+(2.043), (I-339)+(1.016)+(2.044), (I-339)+(1.016)+(2.045), (I-339)+(1.016)+(2.046), (I-339)+(1.016)+(2.047), (I-339)+(1.016)+(2.048), (I-339)+(1.016)+(2.049), (I-339)+(1.016)+(2.050), (I-339)+(1.016)+(2.051), (I-339)+(1.016)+(2.052), (I-339)+(1.016)+(2.053), (I-339)+(1.016)+(2.054), (I-339)+(1.016)+(2.055), (I-339)+(1.016)+(2.056), (I-339)+(1.016)+(2.057), (I-339)+(1.016)+(2.058), (I-339)+(1.016)+(2.059), (I-339)+(1.016)+(3.001), (I-339)+(1.016)+(3.002), (I-339)+(1.016)+(3.003), (I-339)+(1.016)+(3.004), (I-339)+(1.016)+(3.005), (I-339)+(1.016)+(3.006), (I-339)+(1.016)+(3.007), (I-339)+(1.016)+(3.008), (I-339)+(1.016)+(3.009), (I-339)+(1.016)+(3.010), (I-339)+(1.016)+(3.011), (I-339)+(1.016)+(3.012), (I-339)+(1.016)+(3.013), (I-339)+(1.016)+(3.014), (I-339)+(1.016)+(3.015), (I-339)+(1.016)+(3.016), (I-339)+(1.016)+(3.017), (I-339)+(1.016)+(3.018), (I-339)+(1.016)+(3.019), (I-339)+(1.016)+(3.020), (I-339)+(1.016)+(3.021), (I-339)+(1.016)+(3.022), (I-339)+(1.016)+(3.023), (I-339)+(1.016)+(3.024), (I-339)+(1.016)+(3.025), (I-339)+(1.016)+(3.026), (I-339)+(1.016)+(3.027), (I-339)+(1.016)+(3.028), (I-339)+(1.016)+(3.029), (I-339)+(1.016)+(3.030), (I-339)+(1.016)+(3.031), (I-339)+(1.016)+(5.001), (I-339)+(1.016)+(5.002), (I-339)+(1.016)+(5.003), (I-339)+(1.016)+(5.004), (I-339)+(1.016)+(5.005), (I-339)+(1.016)+(5.006), (I-339)+(1.016)+(5.007), (I-339)+(1.016)+(5.008), (I-339)+(1.016)+(5.009), (I-339)+(1.016)+(5.010), (I-339)+(1.016)+(5.011), (I-339)+(1.016)+(5.012), (I-339)+(1.016)+(5.013), (I-339)+(1.016)+(5.014), (I-339)+(1.016)+(5.015), (I-339)+(1.016)+(5.016), (I-339)+(1.016)+(5.017), (I-339)+(1.016)+(5.018), (I-339)+(1.016)+(5.019), (I-339)+(1.016)+(5.020), (I-339)+(1.016)+(5.021), (I-339)+(1.016)+(5.022), (I-339)+(1.016)+(5.023), (I-339)+(1.016)+(6.001), (I-339)+(1.016)+(6.002), (I-339)+(1.016)+(6.003), (I-339)+(1.016)+(6.004), (I-339)+(1.016)+(7.001), (I-339)+(1.016)+(7.002), (I-339)+(1.016)+(7.003), (I-339)+(1.016)+(7.004), (I-339)+(1.016)+(7.005), (I-339)+(1.016)+(7.006), (I-339)+(1.016)+(9.001), (I-339)+(1.016)+(9.002), (I-339)+(1.016)+(9.003), (I-339)+(1.016)+(9.004), (I-339)+(1.016)+(9.005), (I-339)+(1.016)+(9.006), (I-339)+(1.016)+(9.007), (I-339)+(1.016)+(9.008), (I-339)+(1.016)+(9.009), (I-339)+(1.016)+(14.001), (I-339)+(1.016)+(14.002), (I-339)+(1.016)+(15.008), (I-339)+(1.016)+(15.011), (I-339)+(1.016)+(15.012), (I-339)+(1.016)+(15.016), (I-339)+(1.016)+(15.025), (I-339)+(1.016)+(15.027), (I-339)+(1.016)+(15.047), (I-339)+(1.016)+(15.063), (I-339)+(1.016)+(15.064), (I-339)+(1.016)+(16.001), (I-339)+(1.016)+(16.002), (I-339)+(1.016)+(16.003), (I-339)+(1.016)+(16.004), (I-339)+(1.016)+(16.005), (I-339)+(1.016)+(16.006), (I-339)+(1.016)+(16.007), (I-339)+(1.016)+(16.008), (I-339)+(1.016)+(17.001), (I-339)+(1.016)+(17.002), (I-339)+(1.016)+(17.003), (I-339)+(1.016)+(17.004), (I-339)+(1.016)+(17.005), (I-339)+(1.016)+(17.006), (I-339)+(1.016)+(17.007), (I-339)+(1.016)+(17.008), (I-339)+(1.016)+(17.009), (I-339)+(1.016)+(17.010), (I-339)+(1.016)+(17.011), (I-339)+(1.016)+(17.012), (I-339)+(1.016)+(18.001), (I-339)+(1.017)+(1.018), (I-339)+(1.017)+(1.019), (I-339)+(1.017)+(1.020), (I-339)+(1.017)+(1.021), (I-339)+(1.017)+(1.022), (I-339)+(1.017)+(1.023), (I-339)+(1.017)+(1.024), (I-339)+(1.017)+(1.025), (I-339)+(1.017)+(1.026), (I-339)+(1.017)+(1.027), (I-339)+(1.017)+(1.028), (I-339)+(1.017)+(1.029), (I-339)+(1.017)+(1.030), (I-339)+(1.017)+(1.031), (I-339)+(1.017)+(1.032), (I-339)+(1.017)+(1.033), (I-339)+(1.017)+(1.034), (I-339)+(1.017)+(1.035), (I-339)+(1.017)+(1.036), (I-339)+(1.017)+(1.037), (I-339)+(1.017)+(1.038), (I-339)+(1.017)+(1.039), (I-339)+(1.017)+(1.040), (I-339)+(1.017)+(1.041), (I-339)+(1.017)+(1.042), (I-339)+(1.017)+(1.043), (I-339)+(1.017)+(1.044), (I-339)+(1.017)+(1.045), (I-339)+(1.017)+(1.046), (I-339)+(1.017)+(1.047), (I-339)+(1.017)+(1.048), (I-339)+(1.017)+(1.049), (I-339)+(1.017)+(1.050), (I-339)+(1.017)+(1.051), (I-339)+(1.017)+(1.052), (I-339)+(1.017)+(1.053), (I-339)+(1.017)+(1.054), (I-339)+(1.017)+(1.055), (I-339)+(1.017)+(1.056), (I-339)+(1.017)+(1.057), (I-339)+(1.017)+(1.058), (I-339)+(1.017)+(1.059), (I-339)+(1.017)+(1.060), (I-339)+(1.017)+(1.061), (I-339)+(1.017)+(1.062), (I-339)+(1.017)+(1.063), (I-339)+(1.017)+(1.064), (I-339)+(1.017)+(1.065), (I-339)+(1.017)+(1.066), (I-339)+(1.017)+(1.067), (I-339)+(1.017)+(1.068), (I-339)+(1.017)+(1.069), (I-339)+(1.017)+(1.070), (I-339)+(1.017)+(1.071), (I-339)+(1.017)+(1.072), (I-339)+(1.017)+(1.073), (I-339)+(1.017)+(1.074), (I-339)+(1.017)+(1.075), (I-339)+(1.017)+(1.076), (I-339)+(1.017)+(1.077), (I-339)+(1.017)+(1.078), (I-339)+(1.017)+(1.079), (I-339)+(1.017)+(1.080), (I-339)+(1.017)+(1.081), (I-339)+(1.017)+(1.082), (I-339)+(1.017)+(1.083), (I-339)+(1.017)+(1.084), (I-339)+(1.017)+(1.085), (I-339)+(1.017)+(1.086), (I-339)+(1.017)+(1.087), (I-339)+(1.017)+(1.088), (I-339)+(1.017)+(1.089), (I-339)+(1.017)+(1.090), (I-339)+(1.017)+(1.091), (I-339)+(1.017)+(1.092), (I-339)+(1.017)+(2.001), (I-339)+(1.017)+(2.002), (I-339)+(1.017)+(2.003), (I-339)+(1.017)+(2.004), (I-339)+(1.017)+(2.005), (I-339)+(1.017)+(2.006), (I-339)+(1.017)+(2.007), (I-339)+(1.017)+(2.008), (I-339)+(1.017)+(2.009), (I-339)+(1.017)+(2.010), (I-339)+(1.017)+(2.011), (I-339)+(1.017)+(2.012), (I-339)+(1.017)+(2.013), (I-339)+(1.017)+(2.014), (I-339)+(1.017)+(2.015), (I-339)+(1.017)+(2.016), (I-339)+(1.017)+(2.017), (I-339)+(1.017)+(2.018), (I-339)+(1.017)+(2.019), (I-339)+(1.017)+(2.020), (I-339)+(1.017)+(2.021), (I-339)+(1.017)+(2.022), (I-339)+(1.017)+(2.023), (I-339)+(1.017)+(2.024), (I-339)+(1.017)+(2.025), (I-339)+(1.017)+(2.026), (I-339)+(1.017)+(2.027), (I-339)+(1.017)+(2.028), (I-339)+(1.017)+(2.029), (I-339)+(1.017)+(2.030), (I-339)+(1.017)+(2.031), (I-339)+(1.017)+(2.032), (I-339)+(1.017)+(2.033), (I-339)+(1.017)+(2.034), (I-339)+(1.017)+(2.035), (I-339)+(1.017)+(2.036), (I-339)+(1.017)+(2.037), (I-339)+(1.017)+(2.038), (I-339)+(1.017)+(2.039), (I-339)+(1.017)+(2.040), (I-339)+(1.017)+(2.041), (I-339)+(1.017)+(2.042), (I-339)+(1.017)+(2.043), (I-339)+(1.017)+(2.044), (I-339)+(1.017)+(2.045), (I-339)+(1.017)+(2.046), (I-339)+(1.017)+(2.047), (I-339)+(1.017)+(2.048), (I-339)+(1.017)+(2.049), (I-339)+(1.017)+(2.050), (I-339)+(1.017)+(2.051), (I-339)+(1.017)+(2.052), (I-339)+(1.017)+(2.053), (I-339)+(1.017)+(2.054), (I-339)+(1.017)+(2.055), (I-339)+(1.017)+(2.056), (I-339)+(1.017)+(2.057), (I-339)+(1.017)+(2.058), (I-339)+(1.017)+(2.059), (I-339)+(1.017)+(3.001), (I-339)+(1.017)+(3.002), (I-339)+(1.017)+(3.003), (I-339)+(1.017)+(3.004), (I-339)+(1.017)+(3.005), (I-339)+(1.017)+(3.006), (I-339)+(1.017)+(3.007), (I-339)+(1.017)+(3.008), (I-339)+(1.017)+(3.009), (I-339)+(1.017)+(3.010), (I-339)+(1.017)+(3.011), (I-339)+(1.017)+(3.012), (I-339)+(1.017)+(3.013), (I-339)+(1.017)+(3.014), (I-339)+(1.017)+(3.015), (I-339)+(1.017)+(3.016), (I-339)+(1.017)+(3.017), (I-339)+(1.017)+(3.018), (I-339)+(1.017)+(3.019), (I-339)+(1.017)+(3.020), (I-339)+(1.017)+(3.021), (I-339)+(1.017)+(3.022), (I-339)+(1.017)+(3.023), (I-339)+(1.017)+(3.024), (I-339)+(1.017)+(3.025), (I-339)+(1.017)+(3.026), (I-339)+(1.017)+(3.027), (I-339)+(1.017)+(3.028), (I-339)+(1.017)+(3.029), (I-339)+(1.017)+(3.030), (I-339)+(1.017)+(3.031), (I-339)+(1.017)+(5.001), (I-339)+(1.017)+(5.002), (I-339)+(1.017)+(5.003), (I-339)+(1.017)+(5.004), (I-339)+(1.017)+(5.005), (I-339)+(1.017)+(5.006), (I-339)+(1.017)+(5.007), (I-339)+(1.017)+(5.008), (I-339)+(1.017)+(5.009), (I-339)+(1.017)+(5.010), (I-339)+(1.017)+(5.011), (I-339)+(1.017)+(5.012), (I-339)+(1.017)+(5.013), (I-339)+(1.017)+(5.014), (I-339)+(1.017)+(5.015), (I-339)+(1.017)+(5.016), (I-339)+(1.017)+(5.017), (I-339)+(1.017)+(5.018), (I-339)+(1.017)+(5.019), (I-339)+(1.017)+(5.020), (I-339)+(1.017)+(5.021), (I-339)+(1.017)+(5.022), (I-339)+(1.017)+(5.023), (I-339)+(1.017)+(6.001), (I-339)+(1.017)+(6.002), (I-339)+(1.017)+(6.003), (I-339)+(1.017)+(6.004), (I-339)+(1.017)+(7.001), (I-339)+(1.017)+(7.002), (I-339)+(1.017)+(7.003), (I-339)+(1.017)+(7.004), (I-339)+(1.017)+(7.005), (I-339)+(1.017)+(7.006), (I-339)+(1.017)+(9.001), (I-339)+(1.017)+(9.002), (I-339)+(1.017)+(9.003), (I-339)+(1.017)+(9.004), (I-339)+(1.017)+(9.005), (I-339)+(1.017)+(9.006), (I-339)+(1.017)+(9.007), (I-339)+(1.017)+(9.008), (I-339)+(1.017)+(9.009), (I-339)+(1.017)+(14.001), (I-339)+(1.017)+(14.002), (I-339)+(1.017)+(15.008), (I-339)+(1.017)+(15.011), (I-339)+(1.017)+(15.012), (I-339)+(1.017)+(15.016), (I-339)+(1.017)+(15.025), (I-339)+(1.017)+(15.027), (I-339)+(1.017)+(15.047), (I-339)+(1.017)+(15.063), (I-339)+(1.017)+(15.064), (I-339)+(1.017)+(16.001), (I-339)+(1.017)+(16.002), (I-339)+(1.017)+(16.003), (I-339)+(1.017)+(16.004), (I-339)+(1.017)+(16.005), (I-339)+(1.017)+(16.006), (I-339)+(1.017)+(16.007), (I-339)+(1.017)+(16.008), (I-339)+(1.017)+(17.001), (I-339)+(1.017)+(17.002), (I-339)+(1.017)+(17.003), (I-339)+(1.017)+(17.004), (I-339)+(1.017)+(17.005), (I-339)+(1.017)+(17.006), (I-339)+(1.017)+(17.007), (I-339)+(1.017)+(17.008), (I-339)+(1.017)+(17.009), (I-339)+(1.017)+(17.010), (I-339)+(1.017)+(17.011), (I-339)+(1.017)+(17.012), (I-339)+(1.017)+(18.001), (I-339)+(1.018)+(1.019), (I-339)+(1.018)+(1.020), (I-339)+(1.018)+(1.021), (I-339)+(1.018)+(1.022), (I-339)+(1.018)+(1.023), (I-339)+(1.018)+(1.024), (I-339)+(1.018)+(1.025), (I-339)+(1.018)+(1.026), (I-339)+(1.018)+(1.027), (I-339)+(1.018)+(1.028), (I-339)+(1.018)+(1.029), (I-339)+(1.018)+(1.030), (I-339)+(1.018)+(1.031), (I-339)+(1.018)+(1.032), (I-339)+(1.018)+(1.033), (I-339)+(1.018)+(1.034), (I-339)+(1.018)+(1.035), (I-339)+(1.018)+(1.036), (I-339)+(1.018)+(1.037), (I-339)+(1.018)+(1.038), (I-339)+(1.018)+(1.039), (I-339)+(1.018)+(1.040), (I-339)+(1.018)+(1.041), (I-339)+(1.018)+(1.042), (I-339)+(1.018)+(1.043), (I-339)+(1.018)+(1.044), (I-339)+(1.018)+(1.045), (I-339)+(1.018)+(1.046), (I-339)+(1.018)+(1.047), (I-339)+(1.018)+(1.048), (I-339)+(1.018)+(1.049), (I-339)+(1.018)+(1.050), (I-339)+(1.018)+(1.051), (I-339)+(1.018)+(1.052), (I-339)+(1.018)+(1.053), (I-339)+(1.018)+(1.054), (I-339)+(1.018)+(1.055), (I-339)+(1.018)+(1.056), (I-339)+(1.018)+(1.057), (I-339)+(1.018)+(1.058), (I-339)+(1.018)+(1.059), (I-339)+(1.018)+(1.060), (I-339)+(1.018)+(1.061), (I-339)+(1.018)+(1.062), (I-339)+(1.018)+(1.063), (I-339)+(1.018)+(1.064), (I-339)+(1.018)+(1.065), (I-339)+(1.018)+(1.066), (I-339)+(1.018)+(1.067), (I-339)+(1.018)+(1.068), (I-339)+(1.018)+(1.069), (I-339)+(1.018)+(1.070), (I-339)+(1.018)+(1.071), (I-339)+(1.018)+(1.072), (I-339)+(1.018)+(1.073), (I-339)+(1.018)+(1.074), (I-339)+(1.018)+(1.075), (I-339)+(1.018)+(1.076), (I-339)+(1.018)+(1.077), (I-339)+(1.018)+(1.078), (I-339)+(1.018)+(1.079), (I-339)+(1.018)+(1.080), (I-339)+(1.018)+(1.081), (I-339)+(1.018)+(1.082), (I-339)+(1.018)+(1.083), (I-339)+(1.018)+(1.084), (I-339)+(1.018)+(1.085), (I-339)+(1.018)+(1.086), (I-339)+(1.018)+(1.087), (I-339)+(1.018)+(1.088), (I-339)+(1.018)+(1.089), (I-339)+(1.018)+(1.090), (I-339)+(1.018)+(1.091), (I-339)+(1.018)+(1.092), (I-339)+(1.018)+(2.001), (I-339)+(1.018)+(2.002), (I-339)+(1.018)+(2.003), (I-339)+(1.018)+(2.004), (I-339)+(1.018)+(2.005), (I-339)+(1.018)+(2.006), (I-339)+(1.018)+(2.007), (I-339)+(1.018)+(2.008), (I-339)+(1.018)+(2.009), (I-339)+(1.018)+(2.010), (I-339)+(1.018)+(2.011), (I-339)+(1.018)+(2.012), (I-339)+(1.018)+(2.013), (I-339)+(1.018)+(2.014), (I-339)+(1.018)+(2.015), (I-339)+(1.018)+(2.016), (I-339)+(1.018)+(2.017), (I-339)+(1.018)+(2.018), (I-339)+(1.018)+(2.019), (I-339)+(1.018)+(2.020), (I-339)+(1.018)+(2.021), (I-339)+(1.018)+(2.022), (I-339)+(1.018)+(2.023), (I-339)+(1.018)+(2.024), (I-339)+(1.018)+(2.025), (I-339)+(1.018)+(2.026), (I-339)+(1.018)+(2.027), (I-339)+(1.018)+(2.028), (I-339)+(1.018)+(2.029), (I-339)+(1.018)+(2.030), (I-339)+(1.018)+(2.031), (I-339)+(1.018)+(2.032), (I-339)+(1.018)+(2.033), (I-339)+(1.018)+(2.034), (I-339)+(1.018)+(2.035), (I-339)+(1.018)+(2.036), (I-339)+(1.018)+(2.037), (I-339)+(1.018)+(2.038), (I-339)+(1.018)+(2.039), (I-339)+(1.018)+(2.040), (I-339)+(1.018)+(2.041), (I-339)+(1.018)+(2.042), (I-339)+(1.018)+(2.043), (I-339)+(1.018)+(2.044), (I-339)+(1.018)+(2.045), (I-339)+(1.018)+(2.046), (I-339)+(1.018)+(2.047), (I-339)+(1.018)+(2.048), (I-339)+(1.018)+(2.049), (I-339)+(1.018)+(2.050), (I-339)+(1.018)+(2.051), (I-339)+(1.018)+(2.052), (I-339)+(1.018)+(2.053), (I-339)+(1.018)+(2.054), (I-339)+(1.018)+(2.055), (I-339)+(1.018)+(2.056), (I-339)+(1.018)+(2.057), (I-339)+(1.018)+(2.058), (I-339)+(1.018)+(2.059), (I-339)+(1.018)+(3.001), (I-339)+(1.018)+(3.002), (I-339)+(1.018)+(3.003), (I-339)+(1.018)+(3.004), (I-339)+(1.018)+(3.005), (I-339)+(1.018)+(3.006), (I-339)+(1.018)+(3.007), (I-339)+(1.018)+(3.008), (I-339)+(1.018)+(3.009), (I-339)+(1.018)+(3.010), (I-339)+(1.018)+(3.011), (I-339)+(1.018)+(3.012), (I-339)+(1.018)+(3.013), (I-339)+(1.018)+(3.014), (I-339)+(1.018)+(3.015), (I-339)+(1.018)+(3.016), (I-339)+(1.018)+(3.017), (I-339)+(1.018)+(3.018), (I-339)+(1.018)+(3.019), (I-339)+(1.018)+(3.020), (I-339)+(1.018)+(3.021), (I-339)+(1.018)+(3.022), (I-339)+(1.018)+(3.023), (I-339)+(1.018)+(3.024), (I-339)+(1.018)+(3.025), (I-339)+(1.018)+(3.026), (I-339)+(1.018)+(3.027), (I-339)+(1.018)+(3.028), (I-339)+(1.018)+(3.029), (I-339)+(1.018)+(3.030), (I-339)+(1.018)+(3.031), (I-339)+(1.018)+(5.001), (I-339)+(1.018)+(5.002), (I-339)+(1.018)+(5.003), (I-339)+(1.018)+(5.004), (I-339)+(1.018)+(5.005), (I-339)+(1.018)+(5.006), (I-339)+(1.018)+(5.007), (I-339)+(1.018)+(5.008), (I-339)+(1.018)+(5.009), (I-339)+(1.018)+(5.010), (I-339)+(1.018)+(5.011), (I-339)+(1.018)+(5.012), (I-339)+(1.018)+(5.013), (I-339)+(1.018)+(5.014), (I-339)+(1.018)+(5.015), (I-339)+(1.018)+(5.016), (I-339)+(1.018)+(5.017), (I-339)+(1.018)+(5.018), (I-339)+(1.018)+(5.019), (I-339)+(1.018)+(5.020), (I-339)+(1.018)+(5.021), (I-339)+(1.018)+(5.022), (I-339)+(1.018)+(5.023), (I-339)+(1.018)+(6.001), (I-339)+(1.018)+(6.002), (I-339)+(1.018)+(6.003), (I-339)+(1.018)+(6.004), (I-339)+(1.018)+(7.001), (I-339)+(1.018)+(7.002), (I-339)+(1.018)+(7.003), (I-339)+(1.018)+(7.004), (I-339)+(1.018)+(7.005), (I-339)+(1.018)+(7.006), (I-339)+(1.018)+(9.001), (I-339)+(1.018)+(9.002), (I-339)+(1.018)+(9.003), (I-339)+(1.018)+(9.004), (I-339)+(1.018)+(9.005), (I-339)+(1.018)+(9.006), (I-339)+(1.018)+(9.007), (I-339)+(1.018)+(9.008), (I-339)+(1.018)+(9.009), (I-339)+(1.018)+(14.001), (I-339)+(1.018)+(14.002), (I-339)+(1.018)+(15.008), (I-339)+(1.018)+(15.011), (I-339)+(1.018)+(15.012), (I-339)+(1.018)+(15.016), (I-339)+(1.018)+(15.025), (I-339)+(1.018)+(15.027), (I-339)+(1.018)+(15.047), (I-339)+(1.018)+(15.063), (I-339)+(1.018)+(15.064), (I-339)+(1.018)+(16.001), (I-339)+(1.018)+(16.002), (I-339)+(1.018)+(16.003), (I-339)+(1.018)+(16.004), (I-339)+(1.018)+(16.005), (I-339)+(1.018)+(16.006), (I-339)+(1.018)+(16.007), (I-339)+(1.018)+(16.008), (I-339)+(1.018)+(17.001), (I-339)+(1.018)+(17.002), (I-339)+(1.018)+(17.003), (I-339)+(1.018)+(17.004), (I-339)+(1.018)+(17.005), (I-339)+(1.018)+(17.006), (I-339)+(1.018)+(17.007), (I-339)+(1.018)+(17.008), (I-339)+(1.018)+(17.009), (I-339)+(1.018)+(17.010), (I-339)+(1.018)+(17.011), (I-339)+(1.018)+(17.012), (I-339)+(1.018)+(18.001), (I-339)+(1.019)+(1.020), (I-339)+(1.019)+(1.021), (I-339)+(1.019)+(1.022), (I-339)+(1.019)+(1.023), (I-339)+(1.019)+(1.024), (I-339)+(1.019)+(1.025), (I-339)+(1.019)+(1.026), (I-339)+(1.019)+(1.027), (I-339)+(1.019)+(1.028), (I-339)+(1.019)+(1.029), (I-339)+(1.019)+(1.030), (I-339)+(1.019)+(1.031), (I-339)+(1.019)+(1.032), (I-339)+(1.019)+(1.033), (I-339)+(1.019)+(1.034), (I-339)+(1.019)+(1.035), (I-339)+(1.019)+(1.036), (I-339)+(1.019)+(1.037), (I-339)+(1.019)+(1.038), (I-339)+(1.019)+(1.039), (I-339)+(1.019)+(1.040), (I-339)+(1.019)+(1.041), (I-339)+(1.019)+(1.042), (I-339)+(1.019)+(1.043), (I-339)+(1.019)+(1.044), (I-339)+(1.019)+(1.045), (I-339)+(1.019)+(1.046), (I-339)+(1.019)+(1.047), (I-339)+(1.019)+(1.048), (I-339)+(1.019)+(1.049), (I-339)+(1.019)+(1.050), (I-339)+(1.019)+(1.051), (I-339)+(1.019)+(1.052), (I-339)+(1.019)+(1.053), (I-339)+(1.019)+(1.054), (I-339)+(1.019)+(1.055), (I-339)+(1.019)+(1.056), (I-339)+(1.019)+(1.057), (I-339)+(1.019)+(1.058), (I-339)+(1.019)+(1.059), (I-339)+(1.019)+(1.060), (I-339)+(1.019)+(1.061), (I-339)+(1.019)+(1.062), (I-339)+(1.019)+(1.063), (I-339)+(1.019)+(1.064), (I-339)+(1.019)+(1.065), (I-339)+(1.019)+(1.066), (I-339)+(1.019)+(1.067), (I-339)+(1.019)+(1.068), (I-339)+(1.019)+(1.069), (I-339)+(1.019)+(1.070), (I-339)+(1.019)+(1.071), (I-339)+(1.019)+(1.072), (I-339)+(1.019)+(1.073), (I-339)+(1.019)+(1.074), (I-339)+(1.019)+(1.075), (I-339)+(1.019)+(1.076), (I-339)+(1.019)+(1.077), (I-339)+(1.019)+(1.078), (I-339)+(1.019)+(1.079), (I-339)+(1.019)+(1.080), (I-339)+(1.019)+(1.081), (I-339)+(1.019)+(1.082), (I-339)+(1.019)+(1.083), (I-339)+(1.019)+(1.084), (I-339)+(1.019)+(1.085), (I-339)+(1.019)+(1.086), (I-339)+(1.019)+(1.087), (I-339)+(1.019)+(1.088), (I-339)+(1.019)+(1.089), (I-339)+(1.019)+(1.090), (I-339)+(1.019)+(1.091), (I-339)+(1.019)+(1.092), (I-339)+(1.019)+(2.001), (I-339)+(1.019)+(2.002), (I-339)+(1.019)+(2.003), (I-339)+(1.019)+(2.004), (I-339)+(1.019)+(2.005), (I-339)+(1.019)+(2.006), (I-339)+(1.019)+(2.007), (I-339)+(1.019)+(2.008), (I-339)+(1.019)+(2.009), (I-339)+(1.019)+(2.010), (I-339)+(1.019)+(2.011), (I-339)+(1.019)+(2.012), (I-339)+(1.019)+(2.013), (I-339)+(1.019)+(2.014), (I-339)+(1.019)+(2.015), (I-339)+(1.019)+(2.016), (I-339)+(1.019)+(2.017), (I-339)+(1.019)+(2.018), (I-339)+(1.019)+(2.019), (I-339)+(1.019)+(2.020), (I-339)+(1.019)+(2.021), (I-339)+(1.019)+(2.022), (I-339)+(1.019)+(2.023), (I-339)+(1.019)+(2.024), (I-339)+(1.019)+(2.025), (I-339)+(1.019)+(2.026), (I-339)+(1.019)+(2.027), (I-339)+(1.019)+(2.028), (I-339)+(1.019)+(2.029), (I-339)+(1.019)+(2.030), (I-339)+(1.019)+(2.031), (I-339)+(1.019)+(2.032), (I-339)+(1.019)+(2.033), (I-339)+(1.019)+(2.034), (I-339)+(1.019)+(2.035), (I-339)+(1.019)+(2.036), (I-339)+(1.019)+(2.037), (I-339)+(1.019)+(2.038), (I-339)+(1.019)+(2.039), (I-339)+(1.019)+(2.040), (I-339)+(1.019)+(2.041), (I-339)+(1.019)+(2.042), (I-339)+(1.019)+(2.043), (I-339)+(1.019)+(2.044), (I-339)+(1.019)+(2.045), (I-339)+(1.019)+(2.046), (I-339)+(1.019)+(2.047), (I-339)+(1.019)+(2.048), (I-339)+(1.019)+(2.049), (I-339)+(1.019)+(2.050), (I-339)+(1.019)+(2.051), (I-339)+(1.019)+(2.052), (I-339)+(1.019)+(2.053), (I-339)+(1.019)+(2.054), (I-339)+(1.019)+(2.055), (I-339)+(1.019)+(2.056), (I-339)+(1.019)+(2.057), (I-339)+(1.019)+(2.058), (I-339)+(1.019)+(2.059), (I-339)+(1.019)+(3.001), (I-339)+(1.019)+(3.002), (I-339)+(1.019)+(3.003), (I-339)+(1.019)+(3.004), (I-339)+(1.019)+(3.005), (I-339)+(1.019)+(3.006), (I-339)+(1.019)+(3.007), (I-339)+(1.019)+(3.008), (I-339)+(1.019)+(3.009), (I-339)+(1.019)+(3.010), (I-339)+(1.019)+(3.011), (I-339)+(1.019)+(3.012), (I-339)+(1.019)+(3.013), (I-339)+(1.019)+(3.014), (I-339)+(1.019)+(3.015), (I-339)+(1.019)+(3.016), (I-339)+(1.019)+(3.017), (I-339)+(1.019)+(3.018), (I-339)+(1.019)+(3.019), (I-339)+(1.019)+(3.020), (I-339)+(1.019)+(3.021), (I-339)+(1.019)+(3.022), (I-339)+(1.019)+(3.023), (I-339)+(1.019)+(3.024), (I-339)+(1.019)+(3.025), (I-339)+(1.019)+(3.026), (I-339)+(1.019)+(3.027), (I-339)+(1.019)+(3.028), (I-339)+(1.019)+(3.029), (I-339)+(1.019)+(3.030), (I-339)+(1.019)+(3.031), (I-339)+(1.019)+(5.001), (I-339)+(1.019)+(5.002), (I-339)+(1.019)+(5.003), (I-339)+(1.019)+(5.004), (I-339)+(1.019)+(5.005), (I-339)+(1.019)+(5.006), (I-339)+(1.019)+(5.007), (I-339)+(1.019)+(5.008), (I-339)+(1.019)+(5.009), (I-339)+(1.019)+(5.010), (I-339)+(1.019)+(5.011), (I-339)+(1.019)+(5.012), (I-339)+(1.019)+(5.013), (I-339)+(1.019)+(5.014), (I-339)+(1.019)+(5.015), (I-339)+(1.019)+(5.016), (I-339)+(1.019)+(5.017), (I-339)+(1.019)+(5.018), (I-339)+(1.019)+(5.019), (I-339)+(1.019)+(5.020), (I-339)+(1.019)+(5.021), (I-339)+(1.019)+(5.022), (I-339)+(1.019)+(5.023), (I-339)+(1.019)+(6.001), (I-339)+(1.019)+(6.002), (I-339)+(1.019)+(6.003), (I-339)+(1.019)+(6.004), (I-339)+(1.019)+(7.001), (I-339)+(1.019)+(7.002), (I-339)+(1.019)+(7.003), (I-339)+(1.019)+(7.004), (I-339)+(1.019)+(7.005), (I-339)+(1.019)+(7.006), (I-339)+(1.019)+(9.001), (I-339)+(1.019)+(9.002), (I-339)+(1.019)+(9.003), (I-339)+(1.019)+(9.004), (I-339)+(1.019)+(9.005), (I-339)+(1.019)+(9.006), (I-339)+(1.019)+(9.007), (I-339)+(1.019)+(9.008), (I-339)+(1.019)+(9.009), (I-339)+(1.019)+(14.001), (I-339)+(1.019)+(14.002), (I-339)+(1.019)+(15.008), (I-339)+(1.019)+(15.011), (I-339)+(1.019)+(15.012), (I-339)+(1.019)+(15.016), (I-339)+(1.019)+(15.025), (I-339)+(1.019)+(15.027), (I-339)+(1.019)+(15.047), (I-339)+(1.019)+(15.063), (I-339)+(1.019)+(15.064), (I-339)+(1.019)+(16.001), (I-339)+(1.019)+(16.002), (I-339)+(1.019)+(16.003), (I-339)+(1.019)+(16.004), (I-339)+(1.019)+(16.005), (I-339)+(1.019)+(16.006), (I-339)+(1.019)+(16.007), (I-339)+(1.019)+(16.008), (I-339)+(1.019)+(17.001), (I-339)+(1.019)+(17.002), (I-339)+(1.019)+(17.003), (I-339)+(1.019)+(17.004), (I-339)+(1.019)+(17.005), (I-339)+(1.019)+(17.006), (I-339)+(1.019)+(17.007), (I-339)+(1.019)+(17.008), (I-339)+(1.019)+(17.009), (I-339)+(1.019)+(17.010), (I-339)+(1.019)+(17.011), (I-339)+(1.019)+(17.012), (I-339)+(1.019)+(18.001), (I-339)+(1.020)+(1.021), (I-339)+(1.020)+(1.022), (I-339)+(1.020)+(1.023), (I-339)+(1.020)+(1.024), (I-339)+(1.020)+(1.025), (I-339)+(1.020)+(1.026), (I-339)+(1.020)+(1.027), (I-339)+(1.020)+(1.028), (I-339)+(1.020)+(1.029), (I-339)+(1.020)+(1.030), (I-339)+(1.020)+(1.031), (I-339)+(1.020)+(1.032), (I-339)+(1.020)+(1.033), (I-339)+(1.020)+(1.034), (I-339)+(1.020)+(1.035), (I-339)+(1.020)+(1.036), (I-339)+(1.020)+(1.037), (I-339)+(1.020)+(1.038), (I-339)+(1.020)+(1.039), (I-339)+(1.020)+(1.040), (I-339)+(1.020)+(1.041), (I-339)+(1.020)+(1.042), (I-339)+(1.020)+(1.043), (I-339)+(1.020)+(1.044), (I-339)+(1.020)+(1.045), (I-339)+(1.020)+(1.046), (I-339)+(1.020)+(1.047), (I-339)+(1.020)+(1.048), (I-339)+(1.020)+(1.049), (I-339)+(1.020)+(1.050), (I-339)+(1.020)+(1.051), (I-339)+(1.020)+(1.052), (I-339)+(1.020)+(1.053), (I-339)+(1.020)+(1.054), (I-339)+(1.020)+(1.055), (I-339)+(1.020)+(1.056), (I-339)+(1.020)+(1.057), (I-339)+(1.020)+(1.058), (I-339)+(1.020)+(1.059), (I-339)+(1.020)+(1.060), (I-339)+(1.020)+(1.061), (I-339)+(1.020)+(1.062), (I-339)+(1.020)+(1.063), (I-339)+(1.020)+(1.064), (I-339)+(1.020)+(1.065), (I-339)+(1.020)+(1.066), (I-339)+(1.020)+(1.067), (I-339)+(1.020)+(1.068), (I-339)+(1.020)+(1.069), (I-339)+(1.020)+(1.070), (I-339)+(1.020)+(1.071), (I-339)+(1.020)+(1.072), (I-339)+(1.020)+(1.073), (I-339)+(1.020)+(1.074), (I-339)+(1.020)+(1.075), (I-339)+(1.020)+(1.076), (I-339)+(1.020)+(1.077), (I-339)+(1.020)+(1.078), (I-339)+(1.020)+(1.079), (I-339)+(1.020)+(1.080), (I-339)+(1.020)+(1.081), (I-339)+(1.020)+(1.082), (I-339)+(1.020)+(1.083), (I-339)+(1.020)+(1.084), (I-339)+(1.020)+(1.085), (I-339)+(1.020)+(1.086), (I-339)+(1.020)+(1.087), (I-339)+(1.020)+(1.088), (I-339)+(1.020)+(1.089), (I-339)+(1.020)+(1.090), (I-339)+(1.020)+(1.091), (I-339)+(1.020)+(1.092), (I-339)+(1.020)+(2.001), (I-339)+(1.020)+(2.002), (I-339)+(1.020)+(2.003), (I-339)+(1.020)+(2.004), (I-339)+(1.020)+(2.005), (I-339)+(1.020)+(2.006), (I-339)+(1.020)+(2.007), (I-339)+(1.020)+(2.008), (I-339)+(1.020)+(2.009), (I-339)+(1.020)+(2.010), (I-339)+(1.020)+(2.011), (I-339)+(1.020)+(2.012), (I-339)+(1.020)+(2.013), (I-339)+(1.020)+(2.014), (I-339)+(1.020)+(2.015), (I-339)+(1.020)+(2.016), (I-339)+(1.020)+(2.017), (I-339)+(1.020)+(2.018), (I-339)+(1.020)+(2.019), (I-339)+(1.020)+(2.020), (I-339)+(1.020)+(2.021), (I-339)+(1.020)+(2.022), (I-339)+(1.020)+(2.023), (I-339)+(1.020)+(2.024), (I-339)+(1.020)+(2.025), (I-339)+(1.020)+(2.026), (I-339)+(1.020)+(2.027), (I-339)+(1.020)+(2.028), (I-339)+(1.020)+(2.029), (I-339)+(1.020)+(2.030), (I-339)+(1.020)+(2.031), (I-339)+(1.020)+(2.032), (I-339)+(1.020)+(2.033), (I-339)+(1.020)+(2.034), (I-339)+(1.020)+(2.035), (I-339)+(1.020)+(2.036), (I-339)+(1.020)+(2.037), (I-339)+(1.020)+(2.038), (I-339)+(1.020)+(2.039), (I-339)+(1.020)+(2.040), (I-339)+(1.020)+(2.041), (I-339)+(1.020)+(2.042), (I-339)+(1.020)+(2.043), (I-339)+(1.020)+(2.044), (I-339)+(1.020)+(2.045), (I-339)+(1.020)+(2.046), (I-339)+(1.020)+(2.047), (I-339)+(1.020)+(2.048), (I-339)+(1.020)+(2.049), (I-339)+(1.020)+(2.050), (I-339)+(1.020)+(2.051), (I-339)+(1.020)+(2.052), (I-339)+(1.020)+(2.053), (I-339)+(1.020)+(2.054), (I-339)+(1.020)+(2.055), (I-339)+(1.020)+(2.056), (I-339)+(1.020)+(2.057), (I-339)+(1.020)+(2.058), (I-339)+(1.020)+(2.059), (I-339)+(1.020)+(3.001), (I-339)+(1.020)+(3.002), (I-339)+(1.020)+(3.003), (I-339)+(1.020)+(3.004), (I-339)+(1.020)+(3.005), (I-339)+(1.020)+(3.006), (I-339)+(1.020)+(3.007), (I-339)+(1.020)+(3.008), (I-339)+(1.020)+(3.009), (I-339)+(1.020)+(3.010), (I-339)+(1.020)+(3.011), (I-339)+(1.020)+(3.012), (I-339)+(1.020)+(3.013), (I-339)+(1.020)+(3.014), (I-339)+(1.020)+(3.015), (I-339)+(1.020)+(3.016), (I-339)+(1.020)+(3.017), (I-339)+(1.020)+(3.018), (I-339)+(1.020)+(3.019), (I-339)+(1.020)+(3.020), (I-339)+(1.020)+(3.021), (I-339)+(1.020)+(3.022), (I-339)+(1.020)+(3.023), (I-339)+(1.020)+(3.024), (I-339)+(1.020)+(3.025), (I-339)+(1.020)+(3.026), (I-339)+(1.020)+(3.027), (I-339)+(1.020)+(3.028), (I-339)+(1.020)+(3.029), (I-339)+(1.020)+(3.030), (I-339)+(1.020)+(3.031), (I-339)+(1.020)+(5.001), (I-339)+(1.020)+(5.002), (I-339)+(1.020)+(5.003), (I-339)+(1.020)+(5.004), (I-339)+(1.020)+(5.005), (I-339)+(1.020)+(5.006), (I-339)+(1.020)+(5.007), (I-339)+(1.020)+(5.008), (I-339)+(1.020)+(5.009), (I-339)+(1.020)+(5.010), (I-339)+(1.020)+(5.011), (I-339)+(1.020)+(5.012), (I-339)+(1.020)+(5.013), (I-339)+(1.020)+(5.014), (I-339)+(1.020)+(5.015), (I-339)+(1.020)+(5.016), (I-339)+(1.020)+(5.017), (I-339)+(1.020)+(5.018), (I-339)+(1.020)+(5.019), (I-339)+(1.020)+(5.020), (I-339)+(1.020)+(5.021), (I-339)+(1.020)+(5.022), (I-339)+(1.020)+(5.023), (I-339)+(1.020)+(6.001), (I-339)+(1.020)+(6.002), (I-339)+(1.020)+(6.003), (I-339)+(1.020)+(6.004), (I-339)+(1.020)+(7.001), (I-339)+(1.020)+(7.002), (I-339)+(1.020)+(7.003), (I-339)+(1.020)+(7.004), (I-339)+(1.020)+(7.005), (I-339)+(1.020)+(7.006), (I-339)+(1.020)+(9.001), (I-339)+(1.020)+(9.002), (I-339)+(1.020)+(9.003), (I-339)+(1.020)+(9.004), (I-339)+(1.020)+(9.005), (I-339)+(1.020)+(9.006), (I-339)+(1.020)+(9.007), (I-339)+(1.020)+(9.008), (I-339)+(1.020)+(9.009), (I-339)+(1.020)+(14.001), (I-339)+(1.020)+(14.002), (I-339)+(1.020)+(15.008), (I-339)+(1.020)+(15.011), (I-339)+(1.020)+(15.012), (I-339)+(1.020)+(15.016), (I-339)+(1.020)+(15.025), (I-339)+(1.020)+(15.027), (I-339)+(1.020)+(15.047), (I-339)+(1.020)+(15.063), (I-339)+(1.020)+(15.064), (I-339)+(1.020)+(16.001), (I-339)+(1.020)+(16.002), (I-339)+(1.020)+(16.003), (I-339)+(1.020)+(16.004), (I-339)+(1.020)+(16.005), (I-339)+(1.020)+(16.006), (I-339)+(1.020)+(16.007), (I-339)+(1.020)+(16.008), (I-339)+(1.020)+(17.001), (I-339)+(1.020)+(17.002), (I-339)+(1.020)+(17.003), (I-339)+(1.020)+(17.004), (I-339)+(1.020)+(17.005), (I-339)+(1.020)+(17.006), (I-339)+(1.020)+(17.007), (I-339)+(1.020)+(17.008), (I-339)+(1.020)+(17.009), (I-339)+(1.020)+(17.010), (I-339)+(1.020)+(17.011), (I-339)+(1.020)+(17.012), (I-339)+(1.020)+(18.001), (I-339)+(1.021)+(1.022), (I-339)+(1.021)+(1.023), (I-339)+(1.021)+(1.024), (I-339)+(1.021)+(1.025), (I-339)+(1.021)+(1.026), (I-339)+(1.021)+(1.027), (I-339)+(1.021)+(1.028), (I-339)+(1.021)+(1.029), (I-339)+(1.021)+(1.030), (I-339)+(1.021)+(1.031), (I-339)+(1.021)+(1.032), (I-339)+(1.021)+(1.033), (I-339)+(1.021)+(1.034), (I-339)+(1.021)+(1.035), (I-339)+(1.021)+(1.036), (I-339)+(1.021)+(1.037), (I-339)+(1.021)+(1.038), (I-339)+(1.021)+(1.039), (I-339)+(1.021)+(1.040), (I-339)+(1.021)+(1.041), (I-339)+(1.021)+(1.042), (I-339)+(1.021)+(1.043), (I-339)+(1.021)+(1.044), (I-339)+(1.021)+(1.045), (I-339)+(1.021)+(1.046), (I-339)+(1.021)+(1.047), (I-339)+(1.021)+(1.048), (I-339)+(1.021)+(1.049), (I-339)+(1.021)+(1.050), (I-339)+(1.021)+(1.051), (I-339)+(1.021)+(1.052), (I-339)+(1.021)+(1.053), (I-339)+(1.021)+(1.054), (I-339)+(1.021)+(1.055), (I-339)+(1.021)+(1.056), (I-339)+(1.021)+(1.057), (I-339)+(1.021)+(1.058), (I-339)+(1.021)+(1.059), (I-339)+(1.021)+(1.060), (I-339)+(1.021)+(1.061), (I-339)+(1.021)+(1.062), (I-339)+(1.021)+(1.063), (I-339)+(1.021)+(1.064), (I-339)+(1.021)+(1.065), (I-339)+(1.021)+(1.066), (I-339)+(1.021)+(1.067), (I-339)+(1.021)+(1.068), (I-339)+(1.021)+(1.069), (I-339)+(1.021)+(1.070), (I-339)+(1.021)+(1.071), (I-339)+(1.021)+(1.072), (I-339)+(1.021)+(1.073), (I-339)+(1.021)+(1.074), (I-339)+(1.021)+(1.075), (I-339)+(1.021)+(1.076), (I-339)+(1.021)+(1.077), (I-339)+(1.021)+(1.078), (I-339)+(1.021)+(1.079), (I-339)+(1.021)+(1.080), (I-339)+(1.021)+(1.081), (I-339)+(1.021)+(1.082), (I-339)+(1.021)+(1.083), (I-339)+(1.021)+(1.084), (I-339)+(1.021)+(1.085), (I-339)+(1.021)+(1.086), (I-339)+(1.021)+(1.087), (I-339)+(1.021)+(1.088), (I-339)+(1.021)+(1.089), (I-339)+(1.021)+(1.090), (I-339)+(1.021)+(1.091), (I-339)+(1.021)+(1.092), (I-339)+(1.021)+(2.001), (I-339)+(1.021)+(2.002), (I-339)+(1.021)+(2.003), (I-339)+(1.021)+(2.004), (I-339)+(1.021)+(2.005), (I-339)+(1.021)+(2.006), (I-339)+(1.021)+(2.007), (I-339)+(1.021)+(2.008), (I-339)+(1.021)+(2.009), (I-339)+(1.021)+(2.010), (I-339)+(1.021)+(2.011), (I-339)+(1.021)+(2.012), (I-339)+(1.021)+(2.013), (I-339)+(1.021)+(2.014), (I-339)+(1.021)+(2.015), (I-339)+(1.021)+(2.016), (I-339)+(1.021)+(2.017), (I-339)+(1.021)+(2.018), (I-339)+(1.021)+(2.019), (I-339)+(1.021)+(2.020), (I-339)+(1.021)+(2.021), (I-339)+(1.021)+(2.022), (I-339)+(1.021)+(2.023), (I-339)+(1.021)+(2.024), (I-339)+(1.021)+(2.025), (I-339)+(1.021)+(2.026), (I-339)+(1.021)+(2.027), (I-339)+(1.021)+(2.028), (I-339)+(1.021)+(2.029), (I-339)+(1.021)+(2.030), (I-339)+(1.021)+(2.031), (I-339)+(1.021)+(2.032), (I-339)+(1.021)+(2.033), (I-339)+(1.021)+(2.034), (I-339)+(1.021)+(2.035), (I-339)+(1.021)+(2.036), (I-339)+(1.021)+(2.037), (I-339)+(1.021)+(2.038), (I-339)+(1.021)+(2.039), (I-339)+(1.021)+(2.040), (I-339)+(1.021)+(2.041), (I-339)+(1.021)+(2.042), (I-339)+(1.021)+(2.043), (I-339)+(1.021)+(2.044), (I-339)+(1.021)+(2.045), (I-339)+(1.021)+(2.046), (I-339)+(1.021)+(2.047), (I-339)+(1.021)+(2.048), (I-339)+(1.021)+(2.049), (I-339)+(1.021)+(2.050), (I-339)+(1.021)+(2.051), (I-339)+(1.021)+(2.052), (I-339)+(1.021)+(2.053), (I-339)+(1.021)+(2.054), (I-339)+(1.021)+(2.055), (I-339)+(1.021)+(2.056), (I-339)+(1.021)+(2.057), (I-339)+(1.021)+(2.058), (I-339)+(1.021)+(2.059), (I-339)+(1.021)+(3.001), (I-339)+(1.021)+(3.002), (I-339)+(1.021)+(3.003), (I-339)+(1.021)+(3.004), (I-339)+(1.021)+(3.005), (I-339)+(1.021)+(3.006), (I-339)+(1.021)+(3.007), (I-339)+(1.021)+(3.008), (I-339)+(1.021)+(3.009), (I-339)+(1.021)+(3.010), (I-339)+(1.021)+(3.011), (I-339)+(1.021)+(3.012), (I-339)+(1.021)+(3.013), (I-339)+(1.021)+(3.014), (I-339)+(1.021)+(3.015), (I-339)+(1.021)+(3.016), (I-339)+(1.021)+(3.017), (I-339)+(1.021)+(3.018), (I-339)+(1.021)+(3.019), (I-339)+(1.021)+(3.020), (I-339)+(1.021)+(3.021), (I-339)+(1.021)+(3.022), (I-339)+(1.021)+(3.023), (I-339)+(1.021)+(3.024), (I-339)+(1.021)+(3.025), (I-339)+(1.021)+(3.026), (I-339)+(1.021)+(3.027), (I-339)+(1.021)+(3.028), (I-339)+(1.021)+(3.029), (I-339)+(1.021)+(3.030), (I-339)+(1.021)+(3.031), (I-339)+(1.021)+(5.001), (I-339)+(1.021)+(5.002), (I-339)+(1.021)+(5.003), (I-339)+(1.021)+(5.004), (I-339)+(1.021)+(5.005), (I-339)+(1.021)+(5.006), (I-339)+(1.021)+(5.007), (I-339)+(1.021)+(5.008), (I-339)+(1.021)+(5.009), (I-339)+(1.021)+(5.010), (I-339)+(1.021)+(5.011), (I-339)+(1.021)+(5.012), (I-339)+(1.021)+(5.013), (I-339)+(1.021)+(5.014), (I-339)+(1.021)+(5.015), (I-339)+(1.021)+(5.016), (I-339)+(1.021)+(5.017), (I-339)+(1.021)+(5.018), (I-339)+(1.021)+(5.019), (I-339)+(1.021)+(5.020), (I-339)+(1.021)+(5.021), (I-339)+(1.021)+(5.022), (I-339)+(1.021)+(5.023), (I-339)+(1.021)+(6.001), (I-339)+(1.021)+(6.002), (I-339)+(1.021)+(6.003), (I-339)+(1.021)+(6.004), (I-339)+(1.021)+(7.001), (I-339)+(1.021)+(7.002), (I-339)+(1.021)+(7.003), (I-339)+(1.021)+(7.004), (I-339)+(1.021)+(7.005), (I-339)+(1.021)+(7.006), (I-339)+(1.021)+(9.001), (I-339)+(1.021)+(9.002), (I-339)+(1.021)+(9.003), (I-339)+(1.021)+(9.004), (I-339)+(1.021)+(9.005), (I-339)+(1.021)+(9.006), (I-339)+(1.021)+(9.007), (I-339)+(1.021)+(9.008), (I-339)+(1.021)+(9.009), (I-339)+(1.021)+(14.001), (I-339)+(1.021)+(14.002), (I-339)+(1.021)+(15.008), (I-339)+(1.021)+(15.011), (I-339)+(1.021)+(15.012), (I-339)+(1.021)+(15.016), (I-339)+(1.021)+(15.025), (I-339)+(1.021)+(15.027), (I-339)+(1.021)+(15.047), (I-339)+(1.021)+(15.063), (I-339)+(1.021)+(15.064), (I-339)+(1.021)+(16.001), (I-339)+(1.021)+(16.002), (I-339)+(1.021)+(16.003), (I-339)+(1.021)+(16.004), (I-339)+(1.021)+(16.005), (I-339)+(1.021)+(16.006), (I-339)+(1.021)+(16.007), (I-339)+(1.021)+(16.008), (I-339)+(1.021)+(17.001), (I-339)+(1.021)+(17.002), (I-339)+(1.021)+(17.003), (I-339)+(1.021)+(17.004), (I-339)+(1.021)+(17.005), (I-339)+(1.021)+(17.006), (I-339)+(1.021)+(17.007), (I-339)+(1.021)+(17.008), (I-339)+(1.021)+(17.009), (I-339)+(1.021)+(17.010), (I-339)+(1.021)+(17.011), (I-339)+(1.021)+(17.012), (I-339)+(1.021)+(18.001), (I-339)+(1.022)+(1.023), (I-339)+(1.022)+(1.024), (I-339)+(1.022)+(1.025), (I-339)+(1.022)+(1.026), (I-339)+(1.022)+(1.027), (I-339)+(1.022)+(1.028), (I-339)+(1.022)+(1.029), (I-339)+(1.022)+(1.030), (I-339)+(1.022)+(1.031), (I-339)+(1.022)+(1.032), (I-339)+(1.022)+(1.033), (I-339)+(1.022)+(1.034), (I-339)+(1.022)+(1.035), (I-339)+(1.022)+(1.036), (I-339)+(1.022)+(1.037), (I-339)+(1.022)+(1.038), (I-339)+(1.022)+(1.039), (I-339)+(1.022)+(1.040), (I-339)+(1.022)+(1.041), (I-339)+(1.022)+(1.042), (I-339)+(1.022)+(1.043), (I-339)+(1.022)+(1.044), (I-339)+(1.022)+(1.045), (I-339)+(1.022)+(1.046), (I-339)+(1.022)+(1.047), (I-339)+(1.022)+(1.048), (I-339)+(1.022)+(1.049), (I-339)+(1.022)+(1.050), (I-339)+(1.022)+(1.051), (I-339)+(1.022)+(1.052), (I-339)+(1.022)+(1.053), (I-339)+(1.022)+(1.054), (I-339)+(1.022)+(1.055), (I-339)+(1.022)+(1.056), (I-339)+(1.022)+(1.057), (I-339)+(1.022)+(1.058), (I-339)+(1.022)+(1.059), (I-339)+(1.022)+(1.060), (I-339)+(1.022)+(1.061), (I-339)+(1.022)+(1.062), (I-339)+(1.022)+(1.063), (I-339)+(1.022)+(1.064), (I-339)+(1.022)+(1.065), (I-339)+(1.022)+(1.066), (I-339)+(1.022)+(1.067), (I-339)+(1.022)+(1.068), (I-339)+(1.022)+(1.069), (I-339)+(1.022)+(1.070), (I-339)+(1.022)+(1.071), (I-339)+(1.022)+(1.072), (I-339)+(1.022)+(1.073), (I-339)+(1.022)+(1.074), (I-339)+(1.022)+(1.075), (I-339)+(1.022)+(1.076), (I-339)+(1.022)+(1.077), (I-339)+(1.022)+(1.078), (I-339)+(1.022)+(1.079), (I-339)+(1.022)+(1.080), (I-339)+(1.022)+(1.081), (I-339)+(1.022)+(1.082), (I-339)+(1.022)+(1.083), (I-339)+(1.022)+(1.084), (I-339)+(1.022)+(1.085), (I-339)+(1.022)+(1.086), (I-339)+(1.022)+(1.087), (I-339)+(1.022)+(1.088), (I-339)+(1.022)+(1.089), (I-339)+(1.022)+(1.090), (I-339)+(1.022)+(1.091), (I-339)+(1.022)+(1.092), (I-339)+(1.022)+(2.001), (I-339)+(1.022)+(2.002), (I-339)+(1.022)+(2.003), (I-339)+(1.022)+(2.004), (I-339)+(1.022)+(2.005), (I-339)+(1.022)+(2.006), (I-339)+(1.022)+(2.007), (I-339)+(1.022)+(2.008), (I-339)+(1.022)+(2.009), (I-339)+(1.022)+(2.010), (I-339)+(1.022)+(2.011), (I-339)+(1.022)+(2.012), (I-339)+(1.022)+(2.013), (I-339)+(1.022)+(2.014), (I-339)+(1.022)+(2.015), (I-339)+(1.022)+(2.016), (I-339)+(1.022)+(2.017), (I-339)+(1.022)+(2.018), (I-339)+(1.022)+(2.019), (I-339)+(1.022)+(2.020), (I-339)+(1.022)+(2.021), (I-339)+(1.022)+(2.022), (I-339)+(1.022)+(2.023), (I-339)+(1.022)+(2.024), (I-339)+(1.022)+(2.025), (I-339)+(1.022)+(2.026), (I-339)+(1.022)+(2.027), (I-339)+(1.022)+(2.028), (I-339)+(1.022)+(2.029), (I-339)+(1.022)+(2.030), (I-339)+(1.022)+(2.031), (I-339)+(1.022)+(2.032), (I-339)+(1.022)+(2.033), (I-339)+(1.022)+(2.034), (I-339)+(1.022)+(2.035), (I-339)+(1.022)+(2.036), (I-339)+(1.022)+(2.037), (I-339)+(1.022)+(2.038), (I-339)+(1.022)+(2.039), (I-339)+(1.022)+(2.040), (I-339)+(1.022)+(2.041), (I-339)+(1.022)+(2.042), (I-339)+(1.022)+(2.043), (I-339)+(1.022)+(2.044), (I-339)+(1.022)+(2.045), (I-339)+(1.022)+(2.046), (I-339)+(1.022)+(2.047), (I-339)+(1.022)+(2.048), (I-339)+(1.022)+(2.049), (I-339)+(1.022)+(2.050), (I-339)+(1.022)+(2.051), (I-339)+(1.022)+(2.052), (I-339)+(1.022)+(2.053), (I-339)+(1.022)+(2.054), (I-339)+(1.022)+(2.055), (I-339)+(1.022)+(2.056), (I-339)+(1.022)+(2.057), (I-339)+(1.022)+(2.058), (I-339)+(1.022)+(2.059), (I-339)+(1.022)+(3.001), (I-339)+(1.022)+(3.002), (I-339)+(1.022)+(3.003), (I-339)+(1.022)+(3.004), (I-339)+(1.022)+(3.005), (I-339)+(1.022)+(3.006), (I-339)+(1.022)+(3.007), (I-339)+(1.022)+(3.008), (I-339)+(1.022)+(3.009), (I-339)+(1.022)+(3.010), (I-339)+(1.022)+(3.011), (I-339)+(1.022)+(3.012), (I-339)+(1.022)+(3.013), (I-339)+(1.022)+(3.014), (I-339)+(1.022)+(3.015), (I-339)+(1.022)+(3.016), (I-339)+(1.022)+(3.017), (I-339)+(1.022)+(3.018), (I-339)+(1.022)+(3.019), (I-339)+(1.022)+(3.020), (I-339)+(1.022)+(3.021), (I-339)+(1.022)+(3.022), (I-339)+(1.022)+(3.023), (I-339)+(1.022)+(3.024), (I-339)+(1.022)+(3.025), (I-339)+(1.022)+(3.026), (I-339)+(1.022)+(3.027), (I-339)+(1.022)+(3.028), (I-339)+(1.022)+(3.029), (I-339)+(1.022)+(3.030), (I-339)+(1.022)+(3.031), (I-339)+(1.022)+(5.001), (I-339)+(1.022)+(5.002), (I-339)+(1.022)+(5.003), (I-339)+(1.022)+(5.004), (I-339)+(1.022)+(5.005), (I-339)+(1.022)+(5.006), (I-339)+(1.022)+(5.007), (I-339)+(1.022)+(5.008), (I-339)+(1.022)+(5.009), (I-339)+(1.022)+(5.010), (I-339)+(1.022)+(5.011), (I-339)+(1.022)+(5.012), (I-339)+(1.022)+(5.013), (I-339)+(1.022)+(5.014), (I-339)+(1.022)+(5.015), (I-339)+(1.022)+(5.016), (I-339)+(1.022)+(5.017), (I-339)+(1.022)+(5.018), (I-339)+(1.022)+(5.019), (I-339)+(1.022)+(5.020), (I-339)+(1.022)+(5.021), (I-339)+(1.022)+(5.022), (I-339)+(1.022)+(5.023), (I-339)+(1.022)+(6.001), (I-339)+(1.022)+(6.002), (I-339)+(1.022)+(6.003), (I-339)+(1.022)+(6.004), (I-339)+(1.022)+(7.001), (I-339)+(1.022)+(7.002), (I-339)+(1.022)+(7.003), (I-339)+(1.022)+(7.004), (I-339)+(1.022)+(7.005), (I-339)+(1.022)+(7.006), (I-339)+(1.022)+(9.001), (I-339)+(1.022)+(9.002), (I-339)+(1.022)+(9.003), (I-339)+(1.022)+(9.004), (I-339)+(1.022)+(9.005), (I-339)+(1.022)+(9.006), (I-339)+(1.022)+(9.007), (I-339)+(1.022)+(9.008), (I-339)+(1.022)+(9.009), (I-339)+(1.022)+(14.001), (I-339)+(1.022)+(14.002), (I-339)+(1.022)+(15.008), (I-339)+(1.022)+(15.011), (I-339)+(1.022)+(15.012), (I-339)+(1.022)+(15.016), (I-339)+(1.022)+(15.025), (I-339)+(1.022)+(15.027), (I-339)+(1.022)+(15.047), (I-339)+(1.022)+(15.063), (I-339)+(1.022)+(15.064), (I-339)+(1.022)+(16.001), (I-339)+(1.022)+(16.002), (I-339)+(1.022)+(16.003), (I-339)+(1.022)+(16.004), (I-339)+(1.022)+(16.005), (I-339)+(1.022)+(16.006), (I-339)+(1.022)+(16.007), (I-339)+(1.022)+(16.008), (I-339)+(1.022)+(17.001), (I-339)+(1.022)+(17.002), (I-339)+(1.022)+(17.003), (I-339)+(1.022)+(17.004), (I-339)+(1.022)+(17.005), (I-339)+(1.022)+(17.006), (I-339)+(1.022)+(17.007), (I-339)+(1.022)+(17.008), (I-339)+(1.022)+(17.009), (I-339)+(1.022)+(17.010), (I-339)+(1.022)+(17.011), (I-339)+(1.022)+(17.012), (I-339)+(1.022)+(18.001), (I-339)+(1.023)+(1.024), (I-339)+(1.023)+(1.025), (I-339)+(1.023)+(1.026), (I-339)+(1.023)+(1.027), (I-339)+(1.023)+(1.028), (I-339)+(1.023)+(1.029), (I-339)+(1.023)+(1.030), (I-339)+(1.023)+(1.031), (I-339)+(1.023)+(1.032), (I-339)+(1.023)+(1.033), (I-339)+(1.023)+(1.034), (I-339)+(1.023)+(1.035), (I-339)+(1.023)+(1.036), (I-339)+(1.023)+(1.037), (I-339)+(1.023)+(1.038), (I-339)+(1.023)+(1.039), (I-339)+(1.023)+(1.040), (I-339)+(1.023)+(1.041), (I-339)+(1.023)+(1.042), (I-339)+(1.023)+(1.043), (I-339)+(1.023)+(1.044), (I-339)+(1.023)+(1.045), (I-339)+(1.023)+(1.046), (I-339)+(1.023)+(1.047), (I-339)+(1.023)+(1.048), (I-339)+(1.023)+(1.049), (I-339)+(1.023)+(1.050), (I-339)+(1.023)+(1.051), (I-339)+(1.023)+(1.052), (I-339)+(1.023)+(1.053), (I-339)+(1.023)+(1.054), (I-339)+(1.023)+(1.055), (I-339)+(1.023)+(1.056), (I-339)+(1.023)+(1.057), (I-339)+(1.023)+(1.058), (I-339)+(1.023)+(1.059), (I-339)+(1.023)+(1.060), (I-339)+(1.023)+(1.061), (I-339)+(1.023)+(1.062), (I-339)+(1.023)+(1.063), (I-339)+(1.023)+(1.064), (I-339)+(1.023)+(1.065), (I-339)+(1.023)+(1.066), (I-339)+(1.023)+(1.067), (I-339)+(1.023)+(1.068), (I-339)+(1.023)+(1.069), (I-339)+(1.023)+(1.070), (I-339)+(1.023)+(1.071), (I-339)+(1.023)+(1.072), (I-339)+(1.023)+(1.073), (I-339)+(1.023)+(1.074), (I-339)+(1.023)+(1.075), (I-339)+(1.023)+(1.076), (I-339)+(1.023)+(1.077), (I-339)+(1.023)+(1.078), (I-339)+(1.023)+(1.079), (I-339)+(1.023)+(1.080), (I-339)+(1.023)+(1.081), (I-339)+(1.023)+(1.082), (I-339)+(1.023)+(1.083), (I-339)+(1.023)+(1.084), (I-339)+(1.023)+(1.085), (I-339)+(1.023)+(1.086), (I-339)+(1.023)+(1.087), (I-339)+(1.023)+(1.088), (I-339)+(1.023)+(1.089), (I-339)+(1.023)+(1.090), (I-339)+(1.023)+(1.091), (I-339)+(1.023)+(1.092), (I-339)+(1.023)+(2.001), (I-339)+(1.023)+(2.002), (I-339)+(1.023)+(2.003), (I-339)+(1.023)+(2.004), (I-339)+(1.023)+(2.005), (I-339)+(1.023)+(2.006), (I-339)+(1.023)+(2.007), (I-339)+(1.023)+(2.008), (I-339)+(1.023)+(2.009), (I-339)+(1.023)+(2.010), (I-339)+(1.023)+(2.011), (I-339)+(1.023)+(2.012), (I-339)+(1.023)+(2.013), (I-339)+(1.023)+(2.014), (I-339)+(1.023)+(2.015), (I-339)+(1.023)+(2.016), (I-339)+(1.023)+(2.017), (I-339)+(1.023)+(2.018), (I-339)+(1.023)+(2.019), (I-339)+(1.023)+(2.020), (I-339)+(1.023)+(2.021), (I-339)+(1.023)+(2.022), (I-339)+(1.023)+(2.023), (I-339)+(1.023)+(2.024), (I-339)+(1.023)+(2.025), (I-339)+(1.023)+(2.026), (I-339)+(1.023)+(2.027), (I-339)+(1.023)+(2.028), (I-339)+(1.023)+(2.029), (I-339)+(1.023)+(2.030), (I-339)+(1.023)+(2.031), (I-339)+(1.023)+(2.032), (I-339)+(1.023)+(2.033), (I-339)+(1.023)+(2.034), (I-339)+(1.023)+(2.035), (I-339)+(1.023)+(2.036), (I-339)+(1.023)+(2.037), (I-339)+(1.023)+(2.038), (I-339)+(1.023)+(2.039), (I-339)+(1.023)+(2.040), (I-339)+(1.023)+(2.041), (I-339)+(1.023)+(2.042), (I-339)+(1.023)+(2.043), (I-339)+(1.023)+(2.044), (I-339)+(1.023)+(2.045), (I-339)+(1.023)+(2.046), (I-339)+(1.023)+(2.047), (I-339)+(1.023)+(2.048), (I-339)+(1.023)+(2.049), (I-339)+(1.023)+(2.050), (I-339)+(1.023)+(2.051), (I-339)+(1.023)+(2.052), (I-339)+(1.023)+(2.053), (I-339)+(1.023)+(2.054), (I-339)+(1.023)+(2.055), (I-339)+(1.023)+(2.056), (I-339)+(1.023)+(2.057), (I-339)+(1.023)+(2.058), (I-339)+(1.023)+(2.059), (I-339)+(1.023)+(3.001), (I-339)+(1.023)+(3.002), (I-339)+(1.023)+(3.003), (I-339)+(1.023)+(3.004), (I-339)+(1.023)+(3.005), (I-339)+(1.023)+(3.006), (I-339)+(1.023)+(3.007), (I-339)+(1.023)+(3.008), (I-339)+(1.023)+(3.009), (I-339)+(1.023)+(3.010), (I-339)+(1.023)+(3.011), (I-339)+(1.023)+(3.012), (I-339)+(1.023)+(3.013), (I-339)+(1.023)+(3.014), (I-339)+(1.023)+(3.015), (I-339)+(1.023)+(3.016), (I-339)+(1.023)+(3.017), (I-339)+(1.023)+(3.018), (I-339)+(1.023)+(3.019), (I-339)+(1.023)+(3.020), (I-339)+(1.023)+(3.021), (I-339)+(1.023)+(3.022), (I-339)+(1.023)+(3.023), (I-339)+(1.023)+(3.024), (I-339)+(1.023)+(3.025), (I-339)+(1.023)+(3.026), (I-339)+(1.023)+(3.027), (I-339)+(1.023)+(3.028), (I-339)+(1.023)+(3.029), (I-339)+(1.023)+(3.030), (I-339)+(1.023)+(3.031), (I-339)+(1.023)+(5.001), (I-339)+(1.023)+(5.002), (I-339)+(1.023)+(5.003), (I-339)+(1.023)+(5.004), (I-339)+(1.023)+(5.005), (I-339)+(1.023)+(5.006), (I-339)+(1.023)+(5.007), (I-339)+(1.023)+(5.008), (I-339)+(1.023)+(5.009), (I-339)+(1.023)+(5.010), (I-339)+(1.023)+(5.011), (I-339)+(1.023)+(5.012), (I-339)+(1.023)+(5.013), (I-339)+(1.023)+(5.014), (I-339)+(1.023)+(5.015), (I-339)+(1.023)+(5.016), (I-339)+(1.023)+(5.017), (I-339)+(1.023)+(5.018), (I-339)+(1.023)+(5.019), (I-339)+(1.023)+(5.020), (I-339)+(1.023)+(5.021), (I-339)+(1.023)+(5.022), (I-339)+(1.023)+(5.023), (I-339)+(1.023)+(6.001), (I-339)+(1.023)+(6.002), (I-339)+(1.023)+(6.003), (I-339)+(1.023)+(6.004), (I-339)+(1.023)+(7.001), (I-339)+(1.023)+(7.002), (I-339)+(1.023)+(7.003), (I-339)+(1.023)+(7.004), (I-339)+(1.023)+(7.005), (I-339)+(1.023)+(7.006), (I-339)+(1.023)+(9.001), (I-339)+(1.023)+(9.002), (I-339)+(1.023)+(9.003), (I-339)+(1.023)+(9.004), (I-339)+(1.023)+(9.005), (I-339)+(1.023)+(9.006), (I-339)+(1.023)+(9.007), (I-339)+(1.023)+(9.008), (I-339)+(1.023)+(9.009), (I-339)+(1.023)+(14.001), (I-339)+(1.023)+(14.002), (I-339)+(1.023)+(15.008), (I-339)+(1.023)+(15.011), (I-339)+(1.023)+(15.012), (I-339)+(1.023)+(15.016), (I-339)+(1.023)+(15.025), (I-339)+(1.023)+(15.027), (I-339)+(1.023)+(15.047), (I-339)+(1.023)+(15.063), (I-339)+(1.023)+(15.064), (I-339)+(1.023)+(16.001), (I-339)+(1.023)+(16.002), (I-339)+(1.023)+(16.003), (I-339)+(1.023)+(16.004), (I-339)+(1.023)+(16.005), (I-339)+(1.023)+(16.006), (I-339)+(1.023)+(16.007), (I-339)+(1.023)+(16.008), (I-339)+(1.023)+(17.001), (I-339)+(1.023)+(17.002), (I-339)+(1.023)+(17.003), (I-339)+(1.023)+(17.004), (I-339)+(1.023)+(17.005), (I-339)+(1.023)+(17.006), (I-339)+(1.023)+(17.007), (I-339)+(1.023)+(17.008), (I-339)+(1.023)+(17.009), (I-339)+(1.023)+(17.010), (I-339)+(1.023)+(17.011), (I-339)+(1.023)+(17.012), (I-339)+(1.023)+(18.001), (I-339)+(1.024)+(1.025), (I-339)+(1.024)+(1.026), (I-339)+(1.024)+(1.027), (I-339)+(1.024)+(1.028), (I-339)+(1.024)+(1.029), (I-339)+(1.024)+(1.030), (I-339)+(1.024)+(1.031), (I-339)+(1.024)+(1.032), (I-339)+(1.024)+(1.033), (I-339)+(1.024)+(1.034), (I-339)+(1.024)+(1.035), (I-339)+(1.024)+(1.036), (I-339)+(1.024)+(1.037), (I-339)+(1.024)+(1.038), (I-339)+(1.024)+(1.039), (I-339)+(1.024)+(1.040), (I-339)+(1.024)+(1.041), (I-339)+(1.024)+(1.042), (I-339)+(1.024)+(1.043), (I-339)+(1.024)+(1.044), (I-339)+(1.024)+(1.045), (I-339)+(1.024)+(1.046), (I-339)+(1.024)+(1.047), (I-339)+(1.024)+(1.048), (I-339)+(1.024)+(1.049), (I-339)+(1.024)+(1.050), (I-339)+(1.024)+(1.051), (I-339)+(1.024)+(1.052), (I-339)+(1.024)+(1.053), (I-339)+(1.024)+(1.054), (I-339)+(1.024)+(1.055), (I-339)+(1.024)+(1.056), (I-339)+(1.024)+(1.057), (I-339)+(1.024)+(1.058), (I-339)+(1.024)+(1.059), (I-339)+(1.024)+(1.060), (I-339)+(1.024)+(1.061), (I-339)+(1.024)+(1.062), (I-339)+(1.024)+(1.063), (I-339)+(1.024)+(1.064), (I-339)+(1.024)+(1.065), (I-339)+(1.024)+(1.066), (I-339)+(1.024)+(1.067), (I-339)+(1.024)+(1.068), (I-339)+(1.024)+(1.069), (I-339)+(1.024)+(1.070), (I-339)+(1.024)+(1.071), (I-339)+(1.024)+(1.072), (I-339)+(1.024)+(1.073), (I-339)+(1.024)+(1.074), (I-339)+(1.024)+(1.075), (I-339)+(1.024)+(1.076), (I-339)+(1.024)+(1.077), (I-339)+(1.024)+(1.078), (I-339)+(1.024)+(1.079), (I-339)+(1.024)+(1.080), (I-339)+(1.024)+(1.081), (I-339)+(1.024)+(1.082), (I-339)+(1.024)+(1.083), (I-339)+(1.024)+(1.084), (I-339)+(1.024)+(1.085), (I-339)+(1.024)+(1.086), (I-339)+(1.024)+(1.087), (I-339)+(1.024)+(1.088), (I-339)+(1.024)+(1.089), (I-339)+(1.024)+(1.090), (I-339)+(1.024)+(1.091), (I-339)+(1.024)+(1.092), (I-339)+(1.024)+(2.001), (I-339)+(1.024)+(2.002), (I-339)+(1.024)+(2.003), (I-339)+(1.024)+(2.004), (I-339)+(1.024)+(2.005), (I-339)+(1.024)+(2.006), (I-339)+(1.024)+(2.007), (I-339)+(1.024)+(2.008), (I-339)+(1.024)+(2.009), (I-339)+(1.024)+(2.010), (I-339)+(1.024)+(2.011), (I-339)+(1.024)+(2.012), (I-339)+(1.024)+(2.013), (I-339)+(1.024)+(2.014), (I-339)+(1.024)+(2.015), (I-339)+(1.024)+(2.016), (I-339)+(1.024)+(2.017), (I-339)+(1.024)+(2.018), (I-339)+(1.024)+(2.019), (I-339)+(1.024)+(2.020), (I-339)+(1.024)+(2.021), (I-339)+(1.024)+(2.022), (I-339)+(1.024)+(2.023), (I-339)+(1.024)+(2.024), (I-339)+(1.024)+(2.025), (I-339)+(1.024)+(2.026), (I-339)+(1.024)+(2.027), (I-339)+(1.024)+(2.028), (I-339)+(1.024)+(2.029), (I-339)+(1.024)+(2.030), (I-339)+(1.024)+(2.031), (I-339)+(1.024)+(2.032), (I-339)+(1.024)+(2.033), (I-339)+(1.024)+(2.034), (I-339)+(1.024)+(2.035), (I-339)+(1.024)+(2.036), (I-339)+(1.024)+(2.037), (I-339)+(1.024)+(2.038), (I-339)+(1.024)+(2.039), (I-339)+(1.024)+(2.040), (I-339)+(1.024)+(2.041), (I-339)+(1.024)+(2.042), (I-339)+(1.024)+(2.043), (I-339)+(1.024)+(2.044), (I-339)+(1.024)+(2.045), (I-339)+(1.024)+(2.046), (I-339)+(1.024)+(2.047), (I-339)+(1.024)+(2.048), (I-339)+(1.024)+(2.049), (I-339)+(1.024)+(2.050), (I-339)+(1.024)+(2.051), (I-339)+(1.024)+(2.052), (I-339)+(1.024)+(2.053), (I-339)+(1.024)+(2.054), (I-339)+(1.024)+(2.055), (I-339)+(1.024)+(2.056), (I-339)+(1.024)+(2.057), (I-339)+(1.024)+(2.058), (I-339)+(1.024)+(2.059), (I-339)+(1.024)+(3.001), (I-339)+(1.024)+(3.002), (I-339)+(1.024)+(3.003), (I-339)+(1.024)+(3.004), (I-339)+(1.024)+(3.005), (I-339)+(1.024)+(3.006), (I-339)+(1.024)+(3.007), (I-339)+(1.024)+(3.008), (I-339)+(1.024)+(3.009), (I-339)+(1.024)+(3.010), (I-339)+(1.024)+(3.011), (I-339)+(1.024)+(3.012), (I-339)+(1.024)+(3.013), (I-339)+(1.024)+(3.014), (I-339)+(1.024)+(3.015), (I-339)+(1.024)+(3.016), (I-339)+(1.024)+(3.017), (I-339)+(1.024)+(3.018), (I-339)+(1.024)+(3.019), (I-339)+(1.024)+(3.020), (I-339)+(1.024)+(3.021), (I-339)+(1.024)+(3.022), (I-339)+(1.024)+(3.023), (I-339)+(1.024)+(3.024), (I-339)+(1.024)+(3.025), (I-339)+(1.024)+(3.026), (I-339)+(1.024)+(3.027), (I-339)+(1.024)+(3.028), (I-339)+(1.024)+(3.029), (I-339)+(1.024)+(3.030), (I-339)+(1.024)+(3.031), (I-339)+(1.024)+(5.001), (I-339)+(1.024)+(5.002), (I-339)+(1.024)+(5.003), (I-339)+(1.024)+(5.004), (I-339)+(1.024)+(5.005), (I-339)+(1.024)+(5.006), (I-339)+(1.024)+(5.007), (I-339)+(1.024)+(5.008), (I-339)+(1.024)+(5.009), (I-339)+(1.024)+(5.010), (I-339)+(1.024)+(5.011), (I-339)+(1.024)+(5.012), (I-339)+(1.024)+(5.013), (I-339)+(1.024)+(5.014), (I-339)+(1.024)+(5.015), (I-339)+(1.024)+(5.016), (I-339)+(1.024)+(5.017), (I-339)+(1.024)+(5.018), (I-339)+(1.024)+(5.019), (I-339)+(1.024)+(5.020), (I-339)+(1.024)+(5.021), (I-339)+(1.024)+(5.022), (I-339)+(1.024)+(5.023), (I-339)+(1.024)+(6.001), (I-339)+(1.024)+(6.002), (I-339)+(1.024)+(6.003), (I-339)+(1.024)+(6.004), (I-339)+(1.024)+(7.001), (I-339)+(1.024)+(7.002), (I-339)+(1.024)+(7.003), (I-339)+(1.024)+(7.004), (I-339)+(1.024)+(7.005), (I-339)+(1.024)+(7.006), (I-339)+(1.024)+(9.001), (I-339)+(1.024)+(9.002), (I-339)+(1.024)+(9.003), (I-339)+(1.024)+(9.004), (I-339)+(1.024)+(9.005), (I-339)+(1.024)+(9.006), (I-339)+(1.024)+(9.007), (I-339)+(1.024)+(9.008), (I-339)+(1.024)+(9.009), (I-339)+(1.024)+(14.001), (I-339)+(1.024)+(14.002), (I-339)+(1.024)+(15.008), (I-339)+(1.024)+(15.011), (I-339)+(1.024)+(15.012), (I-339)+(1.024)+(15.016), (I-339)+(1.024)+(15.025), (I-339)+(1.024)+(15.027), (I-339)+(1.024)+(15.047), (I-339)+(1.024)+(15.063), (I-339)+(1.024)+(15.064), (I-339)+(1.024)+(16.001), (I-339)+(1.024)+(16.002), (I-339)+(1.024)+(16.003), (I-339)+(1.024)+(16.004), (I-339)+(1.024)+(16.005), (I-339)+(1.024)+(16.006), (I-339)+(1.024)+(16.007), (I-339)+(1.024)+(16.008), (I-339)+(1.024)+(17.001), (I-339)+(1.024)+(17.002), (I-339)+(1.024)+(17.003), (I-339)+(1.024)+(17.004), (I-339)+(1.024)+(17.005), (I-339)+(1.024)+(17.006), (I-339)+(1.024)+(17.007), (I-339)+(1.024)+(17.008), (I-339)+(1.024)+(17.009), (I-339)+(1.024)+(17.010), (I-339)+(1.024)+(17.011), (I-339)+(1.024)+(17.012), (I-339)+(1.024)+(18.001), (I-339)+(1.025)+(1.026), (I-339)+(1.025)+(1.027), (I-339)+(1.025)+(1.028), (I-339)+(1.025)+(1.029), (I-339)+(1.025)+(1.030), (I-339)+(1.025)+(1.031), (I-339)+(1.025)+(1.032), (I-339)+(1.025)+(1.033), (I-339)+(1.025)+(1.034), (I-339)+(1.025)+(1.035), (I-339)+(1.025)+(1.036), (I-339)+(1.025)+(1.037), (I-339)+(1.025)+(1.038), (I-339)+(1.025)+(1.039), (I-339)+(1.025)+(1.040), (I-339)+(1.025)+(1.041), (I-339)+(1.025)+(1.042), (I-339)+(1.025)+(1.043), (I-339)+(1.025)+(1.044), (I-339)+(1.025)+(1.045), (I-339)+(1.025)+(1.046), (I-339)+(1.025)+(1.047), (I-339)+(1.025)+(1.048), (I-339)+(1.025)+(1.049), (I-339)+(1.025)+(1.050), (I-339)+(1.025)+(1.051), (I-339)+(1.025)+(1.052), (I-339)+(1.025)+(1.053), (I-339)+(1.025)+(1.054), (I-339)+(1.025)+(1.055), (I-339)+(1.025)+(1.056), (I-339)+(1.025)+(1.057), (I-339)+(1.025)+(1.058), (I-339)+(1.025)+(1.059), (I-339)+(1.025)+(1.060), (I-339)+(1.025)+(1.061), (I-339)+(1.025)+(1.062), (I-339)+(1.025)+(1.063), (I-339)+(1.025)+(1.064), (I-339)+(1.025)+(1.065), (I-339)+(1.025)+(1.066), (I-339)+(1.025)+(1.067), (I-339)+(1.025)+(1.068), (I-339)+(1.025)+(1.069), (I-339)+(1.025)+(1.070), (I-339)+(1.025)+(1.071), (I-339)+(1.025)+(1.072), (I-339)+(1.025)+(1.073), (I-339)+(1.025)+(1.074), (I-339)+(1.025)+(1.075), (I-339)+(1.025)+(1.076), (I-339)+(1.025)+(1.077), (I-339)+(1.025)+(1.078), (I-339)+(1.025)+(1.079), (I-339)+(1.025)+(1.080), (I-339)+(1.025)+(1.081), (I-339)+(1.025)+(1.082), (I-339)+(1.025)+(1.083), (I-339)+(1.025)+(1.084), (I-339)+(1.025)+(1.085), (I-339)+(1.025)+(1.086), (I-339)+(1.025)+(1.087), (I-339)+(1.025)+(1.088), (I-339)+(1.025)+(1.089), (I-339)+(1.025)+(1.090), (I-339)+(1.025)+(1.091), (I-339)+(1.025)+(1.092), (I-339)+(1.025)+(2.001), (I-339)+(1.025)+(2.002), (I-339)+(1.025)+(2.003), (I-339)+(1.025)+(2.004), (I-339)+(1.025)+(2.005), (I-339)+(1.025)+(2.006), (I-339)+(1.025)+(2.007), (I-339)+(1.025)+(2.008), (I-339)+(1.025)+(2.009), (I-339)+(1.025)+(2.010), (I-339)+(1.025)+(2.011), (I-339)+(1.025)+(2.012), (I-339)+(1.025)+(2.013), (I-339)+(1.025)+(2.014), (I-339)+(1.025)+(2.015), (I-339)+(1.025)+(2.016), (I-339)+(1.025)+(2.017), (I-339)+(1.025)+(2.018), (I-339)+(1.025)+(2.019), (I-339)+(1.025)+(2.020), (I-339)+(1.025)+(2.021), (I-339)+(1.025)+(2.022), (I-339)+(1.025)+(2.023), (I-339)+(1.025)+(2.024), (I-339)+(1.025)+(2.025), (I-339)+(1.025)+(2.026), (I-339)+(1.025)+(2.027), (I-339)+(1.025)+(2.028), (I-339)+(1.025)+(2.029), (I-339)+(1.025)+(2.030), (I-339)+(1.025)+(2.031), (I-339)+(1.025)+(2.032), (I-339)+(1.025)+(2.033), (I-339)+(1.025)+(2.034), (I-339)+(1.025)+(2.035), (I-339)+(1.025)+(2.036), (I-339)+(1.025)+(2.037), (I-339)+(1.025)+(2.038), (I-339)+(1.025)+(2.039), (I-339)+(1.025)+(2.040), (I-339)+(1.025)+(2.041), (I-339)+(1.025)+(2.042), (I-339)+(1.025)+(2.043), (I-339)+(1.025)+(2.044), (I-339)+(1.025)+(2.045), (I-339)+(1.025)+(2.046), (I-339)+(1.025)+(2.047), (I-339)+(1.025)+(2.048), (I-339)+(1.025)+(2.049), (I-339)+(1.025)+(2.050), (I-339)+(1.025)+(2.051), (I-339)+(1.025)+(2.052), (I-339)+(1.025)+(2.053), (I-339)+(1.025)+(2.054), (I-339)+(1.025)+(2.055), (I-339)+(1.025)+(2.056), (I-339)+(1.025)+(2.057), (I-339)+(1.025)+(2.058), (I-339)+(1.025)+(2.059), (I-339)+(1.025)+(3.001), (I-339)+(1.025)+(3.002), (I-339)+(1.025)+(3.003), (I-339)+(1.025)+(3.004), (I-339)+(1.025)+(3.005), (I-339)+(1.025)+(3.006), (I-339)+(1.025)+(3.007), (I-339)+(1.025)+(3.008), (I-339)+(1.025)+(3.009), (I-339)+(1.025)+(3.010), (I-339)+(1.025)+(3.011), (I-339)+(1.025)+(3.012), (I-339)+(1.025)+(3.013), (I-339)+(1.025)+(3.014), (I-339)+(1.025)+(3.015), (I-339)+(1.025)+(3.016), (I-339)+(1.025)+(3.017), (I-339)+(1.025)+(3.018), (I-339)+(1.025)+(3.019), (I-339)+(1.025)+(3.020), (I-339)+(1.025)+(3.021), (I-339)+(1.025)+(3.022), (I-339)+(1.025)+(3.023), (I-339)+(1.025)+(3.024), (I-339)+(1.025)+(3.025), (I-339)+(1.025)+(3.026), (I-339)+(1.025)+(3.027), (I-339)+(1.025)+(3.028), (I-339)+(1.025)+(3.029), (I-339)+(1.025)+(3.030), (I-339)+(1.025)+(3.031), (I-339)+(1.025)+(5.001), (I-339)+(1.025)+(5.002), (I-339)+(1.025)+(5.003), (I-339)+(1.025)+(5.004), (I-339)+(1.025)+(5.005), (I-339)+(1.025)+(5.006), (I-339)+(1.025)+(5.007), (I-339)+(1.025)+(5.008), (I-339)+(1.025)+(5.009), (I-339)+(1.025)+(5.010), (I-339)+(1.025)+(5.011), (I-339)+(1.025)+(5.012), (I-339)+(1.025)+(5.013), (I-339)+(1.025)+(5.014), (I-339)+(1.025)+(5.015), (I-339)+(1.025)+(5.016), (I-339)+(1.025)+(5.017), (I-339)+(1.025)+(5.018), (I-339)+(1.025)+(5.019), (I-339)+(1.025)+(5.020), (I-339)+(1.025)+(5.021), (I-339)+(1.025)+(5.022), (I-339)+(1.025)+(5.023), (I-339)+(1.025)+(6.001), (I-339)+(1.025)+(6.002), (I-339)+(1.025)+(6.003), (I-339)+(1.025)+(6.004), (I-339)+(1.025)+(7.001), (I-339)+(1.025)+(7.002), (I-339)+(1.025)+(7.003), (I-339)+(1.025)+(7.004), (I-339)+(1.025)+(7.005), (I-339)+(1.025)+(7.006), (I-339)+(1.025)+(9.001), (I-339)+(1.025)+(9.002), (I-339)+(1.025)+(9.003), (I-339)+(1.025)+(9.004), (I-339)+(1.025)+(9.005), (I-339)+(1.025)+(9.006), (I-339)+(1.025)+(9.007), (I-339)+(1.025)+(9.008), (I-339)+(1.025)+(9.009), (I-339)+(1.025)+(14.001), (I-339)+(1.025)+(14.002), (I-339)+(1.025)+(15.008), (I-339)+(1.025)+(15.011), (I-339)+(1.025)+(15.012), (I-339)+(1.025)+(15.016), (I-339)+(1.025)+(15.025), (I-339)+(1.025)+(15.027), (I-339)+(1.025)+(15.047), (I-339)+(1.025)+(15.063), (I-339)+(1.025)+(15.064), (I-339)+(1.025)+(16.001), (I-339)+(1.025)+(16.002), (I-339)+(1.025)+(16.003), (I-339)+(1.025)+(16.004), (I-339)+(1.025)+(16.005), (I-339)+(1.025)+(16.006), (I-339)+(1.025)+(16.007), (I-339)+(1.025)+(16.008), (I-339)+(1.025)+(17.001), (I-339)+(1.025)+(17.002), (I-339)+(1.025)+(17.003), (I-339)+(1.025)+(17.004), (I-339)+(1.025)+(17.005), (I-339)+(1.025)+(17.006), (I-339)+(1.025)+(17.007), (I-339)+(1.025)+(17.008), (I-339)+(1.025)+(17.009), (I-339)+(1.025)+(17.010), (I-339)+(1.025)+(17.011), (I-339)+(1.025)+(17.012), (I-339)+(1.025)+(18.001), (I-339)+(1.026)+(1.027), (I-339)+(1.026)+(1.028), (I-339)+(1.026)+(1.029), (I-339)+(1.026)+(1.030), (I-339)+(1.026)+(1.031), (I-339)+(1.026)+(1.032), (I-339)+(1.026)+(1.033), (I-339)+(1.026)+(1.034), (I-339)+(1.026)+(1.035), (I-339)+(1.026)+(1.036), (I-339)+(1.026)+(1.037), (I-339)+(1.026)+(1.038), (I-339)+(1.026)+(1.039), (I-339)+(1.026)+(1.040), (I-339)+(1.026)+(1.041), (I-339)+(1.026)+(1.042), (I-339)+(1.026)+(1.043), (I-339)+(1.026)+(1.044), (I-339)+(1.026)+(1.045), (I-339)+(1.026)+(1.046), (I-339)+(1.026)+(1.047), (I-339)+(1.026)+(1.048), (I-339)+(1.026)+(1.049), (I-339)+(1.026)+(1.050), (I-339)+(1.026)+(1.051), (I-339)+(1.026)+(1.052), (I-339)+(1.026)+(1.053), (I-339)+(1.026)+(1.054), (I-339)+(1.026)+(1.055), (I-339)+(1.026)+(1.056), (I-339)+(1.026)+(1.057), (I-339)+(1.026)+(1.058), (I-339)+(1.026)+(1.059), (I-339)+(1.026)+(1.060), (I-339)+(1.026)+(1.061), (I-339)+(1.026)+(1.062), (I-339)+(1.026)+(1.063), (I-339)+(1.026)+(1.064), (I-339)+(1.026)+(1.065), (I-339)+(1.026)+(1.066), (I-339)+(1.026)+(1.067), (I-339)+(1.026)+(1.068), (I-339)+(1.026)+(1.069), (I-339)+(1.026)+(1.070), (I-339)+(1.026)+(1.071), (I-339)+(1.026)+(1.072), (I-339)+(1.026)+(1.073), (I-339)+(1.026)+(1.074), (I-339)+(1.026)+(1.075), (I-339)+(1.026)+(1.076), (I-339)+(1.026)+(1.077), (I-339)+(1.026)+(1.078), (I-339)+(1.026)+(1.079), (I-339)+(1.026)+(1.080), (I-339)+(1.026)+(1.081), (I-339)+(1.026)+(1.082), (I-339)+(1.026)+(1.083), (I-339)+(1.026)+(1.084), (I-339)+(1.026)+(1.085), (I-339)+(1.026)+(1.086), (I-339)+(1.026)+(1.087), (I-339)+(1.026)+(1.088), (I-339)+(1.026)+(1.089), (I-339)+(1.026)+(1.090), (I-339)+(1.026)+(1.091), (I-339)+(1.026)+(1.092), (I-339)+(1.026)+(2.001), (I-339)+(1.026)+(2.002), (I-339)+(1.026)+(2.003), (I-339)+(1.026)+(2.004), (I-339)+(1.026)+(2.005), (I-339)+(1.026)+(2.006), (I-339)+(1.026)+(2.007), (I-339)+(1.026)+(2.008), (I-339)+(1.026)+(2.009), (I-339)+(1.026)+(2.010), (I-339)+(1.026)+(2.011), (I-339)+(1.026)+(2.012), (I-339)+(1.026)+(2.013), (I-339)+(1.026)+(2.014), (I-339)+(1.026)+(2.015), (I-339)+(1.026)+(2.016), (I-339)+(1.026)+(2.017), (I-339)+(1.026)+(2.018), (I-339)+(1.026)+(2.019), (I-339)+(1.026)+(2.020), (I-339)+(1.026)+(2.021), (I-339)+(1.026)+(2.022), (I-339)+(1.026)+(2.023), (I-339)+(1.026)+(2.024), (I-339)+(1.026)+(2.025), (I-339)+(1.026)+(2.026), (I-339)+(1.026)+(2.027), (I-339)+(1.026)+(2.028), (I-339)+(1.026)+(2.029), (I-339)+(1.026)+(2.030), (I-339)+(1.026)+(2.031), (I-339)+(1.026)+(2.032), (I-339)+(1.026)+(2.033), (I-339)+(1.026)+(2.034), (I-339)+(1.026)+(2.035), (I-339)+(1.026)+(2.036), (I-339)+(1.026)+(2.037), (I-339)+(1.026)+(2.038), (I-339)+(1.026)+(2.039), (I-339)+(1.026)+(2.040), (I-339)+(1.026)+(2.041), (I-339)+(1.026)+(2.042), (I-339)+(1.026)+(2.043), (I-339)+(1.026)+(2.044), (I-339)+(1.026)+(2.045), (I-339)+(1.026)+(2.046), (I-339)+(1.026)+(2.047), (I-339)+(1.026)+(2.048), (I-339)+(1.026)+(2.049), (I-339)+(1.026)+(2.050), (I-339)+(1.026)+(2.051), (I-339)+(1.026)+(2.052), (I-339)+(1.026)+(2.053), (I-339)+(1.026)+(2.054), (I-339)+(1.026)+(2.055), (I-339)+(1.026)+(2.056), (I-339)+(1.026)+(2.057), (I-339)+(1.026)+(2.058), (I-339)+(1.026)+(2.059), (I-339)+(1.026)+(3.001), (I-339)+(1.026)+(3.002), (I-339)+(1.026)+(3.003), (I-339)+(1.026)+(3.004), (I-339)+(1.026)+(3.005), (I-339)+(1.026)+(3.006), (I-339)+(1.026)+(3.007), (I-339)+(1.026)+(3.008), (I-339)+(1.026)+(3.009), (I-339)+(1.026)+(3.010), (I-339)+(1.026)+(3.011), (I-339)+(1.026)+(3.012), (I-339)+(1.026)+(3.013), (I-339)+(1.026)+(3.014), (I-339)+(1.026)+(3.015), (I-339)+(1.026)+(3.016), (I-339)+(1.026)+(3.017), (I-339)+(1.026)+(3.018), (I-339)+(1.026)+(3.019), (I-339)+(1.026)+(3.020), (I-339)+(1.026)+(3.021), (I-339)+(1.026)+(3.022), (I-339)+(1.026)+(3.023), (I-339)+(1.026)+(3.024), (I-339)+(1.026)+(3.025), (I-339)+(1.026)+(3.026), (I-339)+(1.026)+(3.027), (I-339)+(1.026)+(3.028), (I-339)+(1.026)+(3.029), (I-339)+(1.026)+(3.030), (I-339)+(1.026)+(3.031), (I-339)+(1.026)+(5.001), (I-339)+(1.026)+(5.002), (I-339)+(1.026)+(5.003), (I-339)+(1.026)+(5.004), (I-339)+(1.026)+(5.005), (I-339)+(1.026)+(5.006), (I-339)+(1.026)+(5.007), (I-339)+(1.026)+(5.008), (I-339)+(1.026)+(5.009), (I-339)+(1.026)+(5.010), (I-339)+(1.026)+(5.011), (I-339)+(1.026)+(5.012), (I-339)+(1.026)+(5.013), (I-339)+(1.026)+(5.014), (I-339)+(1.026)+(5.015), (I-339)+(1.026)+(5.016), (I-339)+(1.026)+(5.017), (I-339)+(1.026)+(5.018), (I-339)+(1.026)+(5.019), (I-339)+(1.026)+(5.020), (I-339)+(1.026)+(5.021), (I-339)+(1.026)+(5.022), (I-339)+(1.026)+(5.023), (I-339)+(1.026)+(6.001), (I-339)+(1.026)+(6.002), (I-339)+(1.026)+(6.003), (I-339)+(1.026)+(6.004), (I-339)+(1.026)+(7.001), (I-339)+(1.026)+(7.002), (I-339)+(1.026)+(7.003), (I-339)+(1.026)+(7.004), (I-339)+(1.026)+(7.005), (I-339)+(1.026)+(7.006), (I-339)+(1.026)+(9.001), (I-339)+(1.026)+(9.002), (I-339)+(1.026)+(9.003), (I-339)+(1.026)+(9.004), (I-339)+(1.026)+(9.005), (I-339)+(1.026)+(9.006), (I-339)+(1.026)+(9.007), (I-339)+(1.026)+(9.008), (I-339)+(1.026)+(9.009), (I-339)+(1.026)+(14.001), (I-339)+(1.026)+(14.002), (I-339)+(1.026)+(15.008), (I-339)+(1.026)+(15.011), (I-339)+(1.026)+(15.012), (I-339)+(1.026)+(15.016), (I-339)+(1.026)+(15.025), (I-339)+(1.026)+(15.027), (I-339)+(1.026)+(15.047), (I-339)+(1.026)+(15.063), (I-339)+(1.026)+(15.064), (I-339)+(1.026)+(16.001), (I-339)+(1.026)+(16.002), (I-339)+(1.026)+(16.003), (I-339)+(1.026)+(16.004), (I-339)+(1.026)+(16.005), (I-339)+(1.026)+(16.006), (I-339)+(1.026)+(16.007), (I-339)+(1.026)+(16.008), (I-339)+(1.026)+(17.001), (I-339)+(1.026)+(17.002), (I-339)+(1.026)+(17.003), (I-339)+(1.026)+(17.004), (I-339)+(1.026)+(17.005), (I-339)+(1.026)+(17.006), (I-339)+(1.026)+(17.007), (I-339)+(1.026)+(17.008), (I-339)+(1.026)+(17.009), (I-339)+(1.026)+(17.010), (I-339)+(1.026)+(17.011), (I-339)+(1.026)+(17.012), (I-339)+(1.026)+(18.001), (I-339)+(1.027)+(1.028), (I-339)+(1.027)+(1.029), (I-339)+(1.027)+(1.030), (I-339)+(1.027)+(1.031), (I-339)+(1.027)+(1.032), (I-339)+(1.027)+(1.033), (I-339)+(1.027)+(1.034), (I-339)+(1.027)+(1.035), (I-339)+(1.027)+(1.036), (I-339)+(1.027)+(1.037), (I-339)+(1.027)+(1.038), (I-339)+(1.027)+(1.039), (I-339)+(1.027)+(1.040), (I-339)+(1.027)+(1.041), (I-339)+(1.027)+(1.042), (I-339)+(1.027)+(1.043), (I-339)+(1.027)+(1.044), (I-339)+(1.027)+(1.045), (I-339)+(1.027)+(1.046), (I-339)+(1.027)+(1.047), (I-339)+(1.027)+(1.048), (I-339)+(1.027)+(1.049), (I-339)+(1.027)+(1.050), (I-339)+(1.027)+(1.051), (I-339)+(1.027)+(1.052), (I-339)+(1.027)+(1.053), (I-339)+(1.027)+(1.054), (I-339)+(1.027)+(1.055), (I-339)+(1.027)+(1.056), (I-339)+(1.027)+(1.057), (I-339)+(1.027)+(1.058), (I-339)+(1.027)+(1.059), (I-339)+(1.027)+(1.060), (I-339)+(1.027)+(1.061), (I-339)+(1.027)+(1.062), (I-339)+(1.027)+(1.063), (I-339)+(1.027)+(1.064), (I-339)+(1.027)+(1.065), (I-339)+(1.027)+(1.066), (I-339)+(1.027)+(1.067), (I-339)+(1.027)+(1.068), (I-339)+(1.027)+(1.069), (I-339)+(1.027)+(1.070), (I-339)+(1.027)+(1.071), (I-339)+(1.027)+(1.072), (I-339)+(1.027)+(1.073), (I-339)+(1.027)+(1.074), (I-339)+(1.027)+(1.075), (I-339)+(1.027)+(1.076), (I-339)+(1.027)+(1.077), (I-339)+(1.027)+(1.078), (I-339)+(1.027)+(1.079), (I-339)+(1.027)+(1.080), (I-339)+(1.027)+(1.081), (I-339)+(1.027)+(1.082), (I-339)+(1.027)+(1.083), (I-339)+(1.027)+(1.084), (I-339)+(1.027)+(1.085), (I-339)+(1.027)+(1.086), (I-339)+(1.027)+(1.087), (I-339)+(1.027)+(1.088), (I-339)+(1.027)+(1.089), (I-339)+(1.027)+(1.090), (I-339)+(1.027)+(1.091), (I-339)+(1.027)+(1.092), (I-339)+(1.027)+(2.001), (I-339)+(1.027)+(2.002), (I-339)+(1.027)+(2.003), (I-339)+(1.027)+(2.004), (I-339)+(1.027)+(2.005), (I-339)+(1.027)+(2.006), (I-339)+(1.027)+(2.007), (I-339)+(1.027)+(2.008), (I-339)+(1.027)+(2.009), (I-339)+(1.027)+(2.010), (I-339)+(1.027)+(2.011), (I-339)+(1.027)+(2.012), (I-339)+(1.027)+(2.013), (I-339)+(1.027)+(2.014), (I-339)+(1.027)+(2.015), (I-339)+(1.027)+(2.016), (I-339)+(1.027)+(2.017), (I-339)+(1.027)+(2.018), (I-339)+(1.027)+(2.019), (I-339)+(1.027)+(2.020), (I-339)+(1.027)+(2.021), (I-339)+(1.027)+(2.022), (I-339)+(1.027)+(2.023), (I-339)+(1.027)+(2.024), (I-339)+(1.027)+(2.025), (I-339)+(1.027)+(2.026), (I-339)+(1.027)+(2.027), (I-339)+(1.027)+(2.028), (I-339)+(1.027)+(2.029), (I-339)+(1.027)+(2.030), (I-339)+(1.027)+(2.031), (I-339)+(1.027)+(2.032), (I-339)+(1.027)+(2.033), (I-339)+(1.027)+(2.034), (I-339)+(1.027)+(2.035), (I-339)+(1.027)+(2.036), (I-339)+(1.027)+(2.037), (I-339)+(1.027)+(2.038), (I-339)+(1.027)+(2.039), (I-339)+(1.027)+(2.040), (I-339)+(1.027)+(2.041), (I-339)+(1.027)+(2.042), (I-339)+(1.027)+(2.043), (I-339)+(1.027)+(2.044), (I-339)+(1.027)+(2.045), (I-339)+(1.027)+(2.046), (I-339)+(1.027)+(2.047), (I-339)+(1.027)+(2.048), (I-339)+(1.027)+(2.049), (I-339)+(1.027)+(2.050), (I-339)+(1.027)+(2.051), (I-339)+(1.027)+(2.052), (I-339)+(1.027)+(2.053), (I-339)+(1.027)+(2.054), (I-339)+(1.027)+(2.055), (I-339)+(1.027)+(2.056), (I-339)+(1.027)+(2.057), (I-339)+(1.027)+(2.058), (I-339)+(1.027)+(2.059), (I-339)+(1.027)+(3.001), (I-339)+(1.027)+(3.002), (I-339)+(1.027)+(3.003), (I-339)+(1.027)+(3.004), (I-339)+(1.027)+(3.005), (I-339)+(1.027)+(3.006), (I-339)+(1.027)+(3.007), (I-339)+(1.027)+(3.008), (I-339)+(1.027)+(3.009), (I-339)+(1.027)+(3.010), (I-339)+(1.027)+(3.011), (I-339)+(1.027)+(3.012), (I-339)+(1.027)+(3.013), (I-339)+(1.027)+(3.014), (I-339)+(1.027)+(3.015), (I-339)+(1.027)+(3.016), (I-339)+(1.027)+(3.017), (I-339)+(1.027)+(3.018), (I-339)+(1.027)+(3.019), (I-339)+(1.027)+(3.020), (I-339)+(1.027)+(3.021), (I-339)+(1.027)+(3.022), (I-339)+(1.027)+(3.023), (I-339)+(1.027)+(3.024), (I-339)+(1.027)+(3.025), (I-339)+(1.027)+(3.026), (I-339)+(1.027)+(3.027), (I-339)+(1.027)+(3.028), (I-339)+(1.027)+(3.029), (I-339)+(1.027)+(3.030), (I-339)+(1.027)+(3.031), (I-339)+(1.027)+(5.001), (I-339)+(1.027)+(5.002), (I-339)+(1.027)+(5.003), (I-339)+(1.027)+(5.004), (I-339)+(1.027)+(5.005), (I-339)+(1.027)+(5.006), (I-339)+(1.027)+(5.007), (I-339)+(1.027)+(5.008), (I-339)+(1.027)+(5.009), (I-339)+(1.027)+(5.010), (I-339)+(1.027)+(5.011), (I-339)+(1.027)+(5.012), (I-339)+(1.027)+(5.013), (I-339)+(1.027)+(5.014), (I-339)+(1.027)+(5.015), (I-339)+(1.027)+(5.016), (I-339)+(1.027)+(5.017), (I-339)+(1.027)+(5.018), (I-339)+(1.027)+(5.019), (I-339)+(1.027)+(5.020), (I-339)+(1.027)+(5.021), (I-339)+(1.027)+(5.022), (I-339)+(1.027)+(5.023), (I-339)+(1.027)+(6.001), (I-339)+(1.027)+(6.002), (I-339)+(1.027)+(6.003), (I-339)+(1.027)+(6.004), (I-339)+(1.027)+(7.001), (I-339)+(1.027)+(7.002), (I-339)+(1.027)+(7.003), (I-339)+(1.027)+(7.004), (I-339)+(1.027)+(7.005), (I-339)+(1.027)+(7.006), (I-339)+(1.027)+(9.001), (I-339)+(1.027)+(9.002), (I-339)+(1.027)+(9.003), (I-339)+(1.027)+(9.004), (I-339)+(1.027)+(9.005), (I-339)+(1.027)+(9.006), (I-339)+(1.027)+(9.007), (I-339)+(1.027)+(9.008), (I-339)+(1.027)+(9.009), (I-339)+(1.027)+(14.001), (I-339)+(1.027)+(14.002), (I-339)+(1.027)+(15.008), (I-339)+(1.027)+(15.011), (I-339)+(1.027)+(15.012), (I-339)+(1.027)+(15.016), (I-339)+(1.027)+(15.025), (I-339)+(1.027)+(15.027), (I-339)+(1.027)+(15.047), (I-339)+(1.027)+(15.063), (I-339)+(1.027)+(15.064), (I-339)+(1.027)+(16.001), (I-339)+(1.027)+(16.002), (I-339)+(1.027)+(16.003), (I-339)+(1.027)+(16.004), (I-339)+(1.027)+(16.005), (I-339)+(1.027)+(16.006), (I-339)+(1.027)+(16.007), (I-339)+(1.027)+(16.008), (I-339)+(1.027)+(17.001), (I-339)+(1.027)+(17.002), (I-339)+(1.027)+(17.003), (I-339)+(1.027)+(17.004), (I-339)+(1.027)+(17.005), (I-339)+(1.027)+(17.006), (I-339)+(1.027)+(17.007), (I-339)+(1.027)+(17.008), (I-339)+(1.027)+(17.009), (I-339)+(1.027)+(17.010), (I-339)+(1.027)+(17.011), (I-339)+(1.027)+(17.012), (I-339)+(1.027)+(18.001), (I-339)+(1.028)+(1.029), (I-339)+(1.028)+(1.030), (I-339)+(1.028)+(1.031), (I-339)+(1.028)+(1.032), (I-339)+(1.028)+(1.033), (I-339)+(1.028)+(1.034), (I-339)+(1.028)+(1.035), (I-339)+(1.028)+(1.036), (I-339)+(1.028)+(1.037), (I-339)+(1.028)+(1.038), (I-339)+(1.028)+(1.039), (I-339)+(1.028)+(1.040), (I-339)+(1.028)+(1.041), (I-339)+(1.028)+(1.042), (I-339)+(1.028)+(1.043), (I-339)+(1.028)+(1.044), (I-339)+(1.028)+(1.045), (I-339)+(1.028)+(1.046), (I-339)+(1.028)+(1.047), (I-339)+(1.028)+(1.048), (I-339)+(1.028)+(1.049), (I-339)+(1.028)+(1.050), (I-339)+(1.028)+(1.051), (I-339)+(1.028)+(1.052), (I-339)+(1.028)+(1.053), (I-339)+(1.028)+(1.054), (I-339)+(1.028)+(1.055), (I-339)+(1.028)+(1.056), (I-339)+(1.028)+(1.057), (I-339)+(1.028)+(1.058), (I-339)+(1.028)+(1.059), (I-339)+(1.028)+(1.060), (I-339)+(1.028)+(1.061), (I-339)+(1.028)+(1.062), (I-339)+(1.028)+(1.063), (I-339)+(1.028)+(1.064), (I-339)+(1.028)+(1.065), (I-339)+(1.028)+(1.066), (I-339)+(1.028)+(1.067), (I-339)+(1.028)+(1.068), (I-339)+(1.028)+(1.069), (I-339)+(1.028)+(1.070), (I-339)+(1.028)+(1.071), (I-339)+(1.028)+(1.072), (I-339)+(1.028)+(1.073), (I-339)+(1.028)+(1.074), (I-339)+(1.028)+(1.075), (I-339)+(1.028)+(1.076), (I-339)+(1.028)+(1.077), (I-339)+(1.028)+(1.078), (I-339)+(1.028)+(1.079), (I-339)+(1.028)+(1.080), (I-339)+(1.028)+(1.081), (I-339)+(1.028)+(1.082), (I-339)+(1.028)+(1.083), (I-339)+(1.028)+(1.084), (I-339)+(1.028)+(1.085), (I-339)+(1.028)+(1.086), (I-339)+(1.028)+(1.087), (I-339)+(1.028)+(1.088), (I-339)+(1.028)+(1.089), (I-339)+(1.028)+(1.090), (I-339)+(1.028)+(1.091), (I-339)+(1.028)+(1.092), (I-339)+(1.028)+(2.001), (I-339)+(1.028)+(2.002), (I-339)+(1.028)+(2.003), (I-339)+(1.028)+(2.004), (I-339)+(1.028)+(2.005), (I-339)+(1.028)+(2.006), (I-339)+(1.028)+(2.007), (I-339)+(1.028)+(2.008), (I-339)+(1.028)+(2.009), (I-339)+(1.028)+(2.010), (I-339)+(1.028)+(2.011), (I-339)+(1.028)+(2.012), (I-339)+(1.028)+(2.013), (I-339)+(1.028)+(2.014), (I-339)+(1.028)+(2.015), (I-339)+(1.028)+(2.016), (I-339)+(1.028)+(2.017), (I-339)+(1.028)+(2.018), (I-339)+(1.028)+(2.019), (I-339)+(1.028)+(2.020), (I-339)+(1.028)+(2.021), (I-339)+(1.028)+(2.022), (I-339)+(1.028)+(2.023), (I-339)+(1.028)+(2.024), (I-339)+(1.028)+(2.025), (I-339)+(1.028)+(2.026), (I-339)+(1.028)+(2.027), (I-339)+(1.028)+(2.028), (I-339)+(1.028)+(2.029), (I-339)+(1.028)+(2.030), (I-339)+(1.028)+(2.031), (I-339)+(1.028)+(2.032), (I-339)+(1.028)+(2.033), (I-339)+(1.028)+(2.034), (I-339)+(1.028)+(2.035), (I-339)+(1.028)+(2.036), (I-339)+(1.028)+(2.037), (I-339)+(1.028)+(2.038), (I-339)+(1.028)+(2.039), (I-339)+(1.028)+(2.040), (I-339)+(1.028)+(2.041), (I-339)+(1.028)+(2.042), (I-339)+(1.028)+(2.043), (I-339)+(1.028)+(2.044),
(I-339)+(1.028)+(2.045), (I-339)+(1.028)+(2.046),
(I-339)+(1.028)+(2.047), (I-339)+(1.028)+(2.048),
(I-339)+(1.028)+(2.049), (I-339)+(1.028)+(2.050),
(I-339)+(1.028)+(2.051), (I-339)+(1.028)+(2.052),
(I-339)+(1.028)+(2.053), (I-339)+(1.028)+(2.054),
(I-339)+(1.028)+(2.055), (I-339)+(1.028)+(2.056),
(I-339)+(1.028)+(2.057), (I-339)+(1.028)+(2.058),
(I-339)+(1.028)+(2.059), (I-339)+(1.028)+(3.001),
(I-339)+(1.028)+(3.002), (I-339)+(1.028)+(3.003),
(I-339)+(1.028)+(3.004), (I-339)+(1.028)+(3.005),
(I-339)+(1.028)+(3.006), (I-339)+(1.028)+(3.007),
(I-339)+(1.028)+(3.008), (I-339)+(1.028)+(3.009),
(I-339)+(1.028)+(3.010), (I-339)+(1.028)+(3.011),
(I-339)+(1.028)+(3.012), (I-339)+(1.028)+(3.013),
(I-339)+(1.028)+(3.014), (I-339)+(1.028)+(3.015),
(I-339)+(1.028)+(3.016), (I-339)+(1.028)+(3.017),
(I-339)+(1.028)+(3.018), (I-339)+(1.028)+(3.019),
(I-339)+(1.028)+(3.020), (I-339)+(1.028)+(3.021),
(I-339)+(1.028)+(3.022), (I-339)+(1.028)+(3.023),
(I-339)+(1.028)+(3.024), (I-339)+(1.028)+(3.025),
(I-339)+(1.028)+(3.026), (I-339)+(1.028)+(3.027),
(I-339)+(1.028)+(3.028), (I-339)+(1.028)+(3.029),
(I-339)+(1.028)+(3.030), (I-339)+(1.028)+(3.031),
(I-339)+(1.028)+(5.001), (I-339)+(1.028)+(5.002),
(I-339)+(1.028)+(5.003), (I-339)+(1.028)+(5.004),
(I-339)+(1.028)+(5.005), (I-339)+(1.028)+(5.006),
(I-339)+(1.028)+(5.007), (I-339)+(1.028)+(5.008),
(I-339)+(1.028)+(5.009), (I-339)+(1.028)+(5.010),
(I-339)+(1.028)+(5.011), (I-339)+(1.028)+(5.012),
(I-339)+(1.028)+(5.013), (I-339)+(1.028)+(5.014),
(I-339)+(1.028)+(5.015), (I-339)+(1.028)+(5.016),
(I-339)+(1.028)+(5.017), (I-339)+(1.028)+(5.018),
(I-339)+(1.028)+(5.019), (I-339)+(1.028)+(5.020),
(I-339)+(1.028)+(5.021), (I-339)+(1.028)+(5.022),
(I-339)+(1.028)+(5.023), (I-339)+(1.028)+(6.001),
(I-339)+(1.028)+(6.002), (I-339)+(1.028)+(6.003),
(I-339)+(1.028)+(6.004), (I-339)+(1.028)+(7.001),
(I-339)+(1.028)+(7.002), (I-339)+(1.028)+(7.003),
(I-339)+(1.028)+(7.004), (I-339)+(1.028)+(7.005),
(I-339)+(1.028)+(7.006), (I-339)+(1.028)+(9.001),
(I-339)+(1.028)+(9.002), (I-339)+(1.028)+(9.003),
(I-339)+(1.028)+(9.004), (I-339)+(1.028)+(9.005),
(I-339)+(1.028)+(9.006), (I-339)+(1.028)+(9.007),
(I-339)+(1.028)+(9.008), (I-339)+(1.028)+(9.009),
(I-339)+(1.028)+(14.001), (I-339)+(1.028)+(14.002),
(I-339)+(1.028)+(15.008), (I-339)+(1.028)+(15.011),
(I-339)+(1.028)+(15.012), (I-339)+(1.028)+(15.016),
(I-339)+(1.028)+(15.025), (I-339)+(1.028)+(15.027),
(I-339)+(1.028)+(15.047), (I-339)+(1.028)+(15.063),
(I-339)+(1.028)+(15.064), (I-339)+(1.028)+(16.001),
(I-339)+(1.028)+(16.002), (I-339)+(1.028)+(16.003),
(I-339)+(1.028)+(16.004), (I-339)+(1.028)+(16.005),
(I-339)+(1.028)+(16.006), (I-339)+(1.028)+(16.007),
(I-339)+(1.028)+(16.008), (I-339)+(1.028)+(17.001),
(I-339)+(1.028)+(17.002), (I-339)+(1.028)+(17.003),
(I-339)+(1.028)+(17.004), (I-339)+(1.028)+(17.005),
(I-339)+(1.028)+(17.006), (I-339)+(1.028)+(17.007),
(I-339)+(1.028)+(17.008), (I-339)+(1.028)+(17.009),
(I-339)+(1.028)+(17.010), (I-339)+(1.028)+(17.011),
(I-339)+(1.028)+(17.012), (I-339)+(1.028)+(18.001),
(I-339)+(1.029)+(1.030), (I-339)+(1.029)+(1.031),
(I-339)+(1.029)+(1.032), (I-339)+(1.029)+(1.033),
(I-339)+(1.029)+(1.034), (I-339)+(1.029)+(1.035),
(I-339)+(1.029)+(1.036), (I-339)+(1.029)+(1.037),
(I-339)+(1.029)+(1.038), (I-339)+(1.029)+(1.039),
(I-339)+(1.029)+(1.040), (I-339)+(1.029)+(1.041),
(I-339)+(1.029)+(1.042), (I-339)+(1.029)+(1.043),
(I-339)+(1.029)+(1.044), (I-339)+(1.029)+(1.045),
(I-339)+(1.029)+(1.046), (I-339)+(1.029)+(1.047),
(I-339)+(1.029)+(1.048), (I-339)+(1.029)+(1.049),
(I-339)+(1.029)+(1.050), (I-339)+(1.029)+(1.051),
(I-339)+(1.029)+(1.052), (I-339)+(1.029)+(1.053),
(I-339)+(1.029)+(1.054), (I-339)+(1.029)+(1.055),
(I-339)+(1.029)+(1.056), (I-339)+(1.029)+(1.057),
(I-339)+(1.029)+(1.058), (I-339)+(1.029)+(1.059),
(I-339)+(1.029)+(1.060), (I-339)+(1.029)+(1.061),
(I-339)+(1.029)+(1.062), (I-339)+(1.029)+(1.063),
(I-339)+(1.029)+(1.064), (I-339)+(1.029)+(1.065),
(I-339)+(1.029)+(1.066), (I-339)+(1.029)+(1.067),
(I-339)+(1.029)+(1.068), (I-339)+(1.029)+(1.069),
(I-339)+(1.029)+(1.070), (I-339)+(1.029)+(1.071),
(I-339)+(1.029)+(1.072), (I-339)+(1.029)+(1.073),
(I-339)+(1.029)+(1.074), (I-339)+(1.029)+(1.075),
(I-339)+(1.029)+(1.076), (I-339)+(1.029)+(1.077),
(I-339)+(1.029)+(1.078), (I-339)+(1.029)+(1.079),
(I-339)+(1.029)+(1.080), (I-339)+(1.029)+(1.081),
(I-339)+(1.029)+(1.082), (I-339)+(1.029)+(1.083),
(I-339)+(1.029)+(1.084), (I-339)+(1.029)+(1.085),
(I-339)+(1.029)+(1.086), (I-339)+(1.029)+(1.087),
(I-339)+(1.029)+(1.088), (I-339)+(1.029)+(1.089),
(I-339)+(1.029)+(1.090), (I-339)+(1.029)+(1.091),
(I-339)+(1.029)+(1.092), (I-339)+(1.029)+(2.001),
(I-339)+(1.029)+(2.002), (I-339)+(1.029)+(2.003),
(I-339)+(1.029)+(2.004), (I-339)+(1.029)+(2.005),
(I-339)+(1.029)+(2.006), (I-339)+(1.029)+(2.007),
(I-339)+(1.029)+(2.008), (I-339)+(1.029)+(2.009),
(I-339)+(1.029)+(2.010), (I-339)+(1.029)+(2.011),
(I-339)+(1.029)+(2.012), (I-339)+(1.029)+(2.013),
(I-339)+(1.029)+(2.014), (I-339)+(1.029)+(2.015),
(I-339)+(1.029)+(2.016), (I-339)+(1.029)+(2.017),
(I-339)+(1.029)+(2.018), (I-339)+(1.029)+(2.019),
(I-339)+(1.029)+(2.020), (I-339)+(1.029)+(2.021),
(I-339)+(1.029)+(2.022), (I-339)+(1.029)+(2.023),
(I-339)+(1.029)+(2.024), (I-339)+(1.029)+(2.025),
(I-339)+(1.029)+(2.026), (I-339)+(1.029)+(2.027),
(I-339)+(1.029)+(2.028), (I-339)+(1.029)+(2.029),
(I-339)+(1.029)+(2.030), (I-339)+(1.029)+(2.031),
(I-339)+(1.029)+(2.032), (I-339)+(1.029)+(2.033),
(I-339)+(1.029)+(2.034), (I-339)+(1.029)+(2.035),
(I-339)+(1.029)+(2.036), (I-339)+(1.029)+(2.037),
(I-339)+(1.029)+(2.038), (I-339)+(1.029)+(2.039),
(I-339)+(1.029)+(2.040), (I-339)+(1.029)+(2.041),
(I-339)+(1.029)+(2.042), (I-339)+(1.029)+(2.043),
(I-339)+(1.029)+(2.044), (I-339)+(1.029)+(2.045),
(I-339)+(1.029)+(2.046), (I-339)+(1.029)+(2.047),
(I-339)+(1.029)+(2.048), (I-339)+(1.029)+(2.049),
(I-339)+(1.029)+(2.050), (I-339)+(1.029)+(2.051),
(I-339)+(1.029)+(2.052), (I-339)+(1.029)+(2.053),
(I-339)+(1.029)+(2.054), (I-339)+(1.029)+(2.055),
(I-339)+(1.029)+(2.056), (I-339)+(1.029)+(2.057),
(I-339)+(1.029)+(2.058), (I-339)+(1.029)+(2.059),
(I-339)+(1.029)+(3.001), (I-339)+(1.029)+(3.002),
(I-339)+(1.029)+(3.003), (I-339)+(1.029)+(3.004),
(I-339)+(1.029)+(3.005), (I-339)+(1.029)+(3.006),
(I-339)+(1.029)+(3.007), (I-339)+(1.029)+(3.008),
(I-339)+(1.029)+(3.009), (I-339)+(1.029)+(3.010),
(I-339)+(1.029)+(3.011), (I-339)+(1.029)+(3.012),
(I-339)+(1.029)+(3.013), (I-339)+(1.029)+(3.014),
(I-339)+(1.029)+(3.015), (I-339)+(1.029)+(3.016),
(I-339)+(1.029)+(3.017), (I-339)+(1.029)+(3.018),
(I-339)+(1.029)+(3.019), (I-339)+(1.029)+(3.020),
(I-339)+(1.029)+(3.021), (I-339)+(1.029)+(3.022),
(I-339)+(1.029)+(3.023), (I-339)+(1.029)+(3.024), (I-339)+(1.029)+(3.025), (I-339)+(1.029)+(3.026), (I-339)+(1.029)+(3.027), (I-339)+(1.029)+(3.028), (I-339)+(1.029)+(3.029), (I-339)+(1.029)+(3.030), (I-339)+(1.029)+(3.031), (I-339)+(1.029)+(5.001), (I-339)+(1.029)+(5.002), (I-339)+(1.029)+(5.003), (I-339)+(1.029)+(5.004), (I-339)+(1.029)+(5.005), (I-339)+(1.029)+(5.006), (I-339)+(1.029)+(5.007), (I-339)+(1.029)+(5.008), (I-339)+(1.029)+(5.009), (I-339)+(1.029)+(5.010), (I-339)+(1.029)+(5.011), (I-339)+(1.029)+(5.012), (I-339)+(1.029)+(5.013), (I-339)+(1.029)+(5.014), (I-339)+(1.029)+(5.015), (I-339)+(1.029)+(5.016), (I-339)+(1.029)+(5.017), (I-339)+(1.029)+(5.018), (I-339)+(1.029)+(5.019), (I-339)+(1.029)+(5.020), (I-339)+(1.029)+(5.021), (I-339)+(1.029)+(5.022), (I-339)+(1.029)+(5.023), (I-339)+(1.029)+(6.001), (I-339)+(1.029)+(6.002), (I-339)+(1.029)+(6.003), (I-339)+(1.029)+(6.004), (I-339)+(1.029)+(7.001), (I-339)+(1.029)+(7.002), (I-339)+(1.029)+(7.003), (I-339)+(1.029)+(7.004), (I-339)+(1.029)+(7.005), (I-339)+(1.029)+(7.006), (I-339)+(1.029)+(9.001), (I-339)+(1.029)+(9.002), (I-339)+(1.029)+(9.003), (I-339)+(1.029)+(9.004), (I-339)+(1.029)+(9.005), (I-339)+(1.029)+(9.006), (I-339)+(1.029)+(9.007), (I-339)+(1.029)+(9.008), (I-339)+(1.029)+(9.009), (I-339)+(1.029)+(14.001), (I-339)+(1.029)+(14.002), (I-339)+(1.029)+(15.008), (I-339)+(1.029)+(15.011), (I-339)+(1.029)+(15.012), (I-339)+(1.029)+(15.016), (I-339)+(1.029)+(15.025), (I-339)+(1.029)+(15.027), (I-339)+(1.029)+(15.047), (I-339)+(1.029)+(15.063), (I-339)+(1.029)+(15.064), (I-339)+(1.029)+(16.001), (I-339)+(1.029)+(16.002), (I-339)+(1.029)+(16.003), (I-339)+(1.029)+(16.004), (I-339)+(1.029)+(16.005), (I-339)+(1.029)+(16.006), (I-339)+(1.029)+(16.007), (I-339)+(1.029)+(16.008), (I-339)+(1.029)+(17.001), (I-339)+(1.029)+(17.002), (I-339)+(1.029)+(17.003), (I-339)+(1.029)+(17.004), (I-339)+(1.029)+(17.005), (I-339)+(1.029)+(17.006), (I-339)+(1.029)+(17.007), (I-339)+(1.029)+(17.008), (I-339)+(1.029)+(17.009), (I-339)+(1.029)+(17.010), (I-339)+(1.029)+(17.011), (I-339)+(1.029)+(17.012), (I-339)+(1.029)+(18.001), (I-339)+(1.030)+(1.031), (I-339)+(1.030)+(1.032), (I-339)+(1.030)+(1.033), (I-339)+(1.030)+(1.034), (I-339)+(1.030)+(1.035), (I-339)+(1.030)+(1.036), (I-339)+(1.030)+(1.037), (I-339)+(1.030)+(1.038), (I-339)+(1.030)+(1.039), (I-339)+(1.030)+(1.040), (I-339)+(1.030)+(1.041), (I-339)+(1.030)+(1.042), (I-339)+(1.030)+(1.043), (I-339)+(1.030)+(1.044), (I-339)+(1.030)+(1.045), (I-339)+(1.030)+(1.046), (I-339)+(1.030)+(1.047), (I-339)+(1.030)+(1.048), (I-339)+(1.030)+(1.049), (I-339)+(1.030)+(1.050), (I-339)+(1.030)+(1.051), (I-339)+(1.030)+(1.052), (I-339)+(1.030)+(1.053), (I-339)+(1.030)+(1.054), (I-339)+(1.030)+(1.055), (I-339)+(1.030)+(1.056), (I-339)+(1.030)+(1.057), (I-339)+(1.030)+(1.058), (I-339)+(1.030)+(1.059), (I-339)+(1.030)+(1.060), (I-339)+(1.030)+(1.061), (I-339)+(1.030)+(1.062), (I-339)+(1.030)+(1.063), (I-339)+(1.030)+(1.064), (I-339)+(1.030)+(1.065), (I-339)+(1.030)+(1.066), (I-339)+(1.030)+(1.067), (I-339)+(1.030)+(1.068), (I-339)+(1.030)+(1.069), (I-339)+(1.030)+(1.070), (I-339)+(1.030)+(1.071), (I-339)+(1.030)+(1.072), (I-339)+(1.030)+(1.073), (I-339)+(1.030)+(1.074), (I-339)+(1.030)+(1.075), (I-339)+(1.030)+(1.076), (I-339)+(1.030)+(1.077), (I-339)+(1.030)+(1.078), (I-339)+(1.030)+(1.079), (I-339)+(1.030)+(1.080), (I-339)+(1.030)+(1.081), (I-339)+(1.030)+(1.082), (I-339)+(1.030)+(1.083), (I-339)+(1.030)+(1.084), (I-339)+(1.030)+(1.085), (I-339)+(1.030)+(1.086), (I-339)+(1.030)+(1.087), (I-339)+(1.030)+(1.088), (I-339)+(1.030)+(1.089), (I-339)+(1.030)+(1.090), (I-339)+(1.030)+(1.091), (I-339)+(1.030)+(1.092), (I-339)+(1.030)+(2.001), (I-339)+(1.030)+(2.002), (I-339)+(1.030)+(2.003), (I-339)+(1.030)+(2.004), (I-339)+(1.030)+(2.005), (I-339)+(1.030)+(2.006), (I-339)+(1.030)+(2.007), (I-339)+(1.030)+(2.008), (I-339)+(1.030)+(2.009), (I-339)+(1.030)+(2.010), (I-339)+(1.030)+(2.011), (I-339)+(1.030)+(2.012), (I-339)+(1.030)+(2.013), (I-339)+(1.030)+(2.014), (I-339)+(1.030)+(2.015), (I-339)+(1.030)+(2.016), (I-339)+(1.030)+(2.017), (I-339)+(1.030)+(2.018), (I-339)+(1.030)+(2.019), (I-339)+(1.030)+(2.020), (I-339)+(1.030)+(2.021), (I-339)+(1.030)+(2.022), (I-339)+(1.030)+(2.023), (I-339)+(1.030)+(2.024), (I-339)+(1.030)+(2.025), (I-339)+(1.030)+(2.026), (I-339)+(1.030)+(2.027), (I-339)+(1.030)+(2.028), (I-339)+(1.030)+(2.029), (I-339)+(1.030)+(2.030), (I-339)+(1.030)+(2.031), (I-339)+(1.030)+(2.032), (I-339)+(1.030)+(2.033), (I-339)+(1.030)+(2.034), (I-339)+(1.030)+(2.035), (I-339)+(1.030)+(2.036), (I-339)+(1.030)+(2.037), (I-339)+(1.030)+(2.038), (I-339)+(1.030)+(2.039), (I-339)+(1.030)+(2.040), (I-339)+(1.030)+(2.041), (I-339)+(1.030)+(2.042), (I-339)+(1.030)+(2.043), (I-339)+(1.030)+(2.044), (I-339)+(1.030)+(2.045), (I-339)+(1.030)+(2.046), (I-339)+(1.030)+(2.047), (I-339)+(1.030)+(2.048), (I-339)+(1.030)+(2.049), (I-339)+(1.030)+(2.050), (I-339)+(1.030)+(2.051), (I-339)+(1.030)+(2.052), (I-339)+(1.030)+(2.053), (I-339)+(1.030)+(2.054), (I-339)+(1.030)+(2.055), (I-339)+(1.030)+(2.056), (I-339)+(1.030)+(2.057), (I-339)+(1.030)+(2.058), (I-339)+(1.030)+(2.059), (I-339)+(1.030)+(3.001), (I-339)+(1.030)+(3.002), (I-339)+(1.030)+(3.003), (I-339)+(1.030)+(3.004), (I-339)+(1.030)+(3.005), (I-339)+(1.030)+(3.006), (I-339)+(1.030)+(3.007), (I-339)+(1.030)+(3.008), (I-339)+(1.030)+(3.009), (I-339)+(1.030)+(3.010), (I-339)+(1.030)+(3.011), (I-339)+(1.030)+(3.012), (I-339)+(1.030)+(3.013), (I-339)+(1.030)+(3.014), (I-339)+(1.030)+(3.015), (I-339)+(1.030)+(3.016), (I-339)+(1.030)+(3.017), (I-339)+(1.030)+(3.018), (I-339)+(1.030)+(3.019), (I-339)+(1.030)+(3.020), (I-339)+(1.030)+(3.021), (I-339)+(1.030)+(3.022), (I-339)+(1.030)+(3.023), (I-339)+(1.030)+(3.024), (I-339)+(1.030)+(3.025), (I-339)+(1.030)+(3.026), (I-339)+(1.030)+(3.027), (I-339)+(1.030)+(3.028), (I-339)+(1.030)+(3.029), (I-339)+(1.030)+(3.030), (I-339)+(1.030)+(3.031), (I-339)+(1.030)+(5.001), (I-339)+(1.030)+(5.002), (I-339)+(1.030)+(5.003), (I-339)+(1.030)+(5.004), (I-339)+(1.030)+(5.005), (I-339)+(1.030)+(5.006), (I-339)+(1.030)+(5.007), (I-339)+(1.030)+(5.008), (I-339)+(1.030)+(5.009), (I-339)+(1.030)+(5.010), (I-339)+(1.030)+(5.011), (I-339)+(1.030)+(5.012), (I-339)+(1.030)+(5.013), (I-339)+(1.030)+(5.014), (I-339)+(1.030)+(5.015), (I-339)+(1.030)+(5.016), (I-339)+(1.030)+(5.017), (I-339)+(1.030)+(5.018), (I-339)+(1.030)+(5.019), (I-339)+(1.030)+(5.020), (I-339)+(1.030)+(5.021), (I-339)+(1.030)+(5.022), (I-339)+(1.030)+(5.023), (I-339)+(1.030)+(6.001), (I-339)+(1.030)+(6.002), (I-339)+(1.030)+(6.003), (I-339)+(1.030)+(6.004), (I-339)+(1.030)+(7.001), (I-339)+(1.030)+(7.002), (I-339)+(1.030)+(7.003), (I-339)+(1.030)+(7.004), (I-339)+(1.030)+(7.005), (I-339)+(1.030)+(7.006), (I-339)+(1.030)+(9.001), (I-339)+(1.030)+(9.002), (I-339)+(1.030)+(9.003), (I-339)+(1.030)+(9.004), (I-339)+(1.030)+(9.005), (I-339)+(1.030)+(9.006), (I-339)+(1.030)+(9.007), (I-339)+(1.030)+(9.008), (I-339)+(1.030)+(9.009), (I-339)+(1.030)+(14.001), (I-339)+(1.030)+(14.002), (I-339)+(1.030)+(15.008), (I-339)+(1.030)+(15.011), (I-339)+(1.030)+(15.012), (I-339)+(1.030)+(15.016), (I-339)+(1.030)+(15.025), (I-339)+(1.030)+(15.027), (I-339)+(1.030)+(15.047), (I-339)+(1.030)+(15.063), (I-339)+(1.030)+(15.064), (I-339)+(1.030)+(16.001), (I-339)+(1.030)+(16.002), (I-339)+(1.030)+(16.003), (I-339)+(1.030)+(16.004), (I-339)+(1.030)+(16.005), (I-339)+(1.030)+(16.006), (I-339)+(1.030)+(16.007), (I-339)+(1.030)+(16.008), (I-339)+(1.030)+(17.001), (I-339)+(1.030)+(17.002), (I-339)+(1.030)+(17.003), (I-339)+(1.030)+(17.004), (I-339)+(1.030)+(17.005), (I-339)+(1.030)+(17.006), (I-339)+(1.030)+(17.007), (I-339)+(1.030)+(17.008), (I-339)+(1.030)+(17.009), (I-339)+(1.030)+(17.010), (I-339)+(1.030)+(17.011), (I-339)+(1.030)+(17.012), (I-339)+(1.030)+(18.001), (I-339)+(1.031)+(1.032), (I-339)+(1.031)+(1.033), (I-339)+(1.031)+(1.034), (I-339)+(1.031)+(1.035), (I-339)+(1.031)+(1.036), (I-339)+(1.031)+(1.037), (I-339)+(1.031)+(1.038), (I-339)+(1.031)+(1.039), (I-339)+(1.031)+(1.040), (I-339)+(1.031)+(1.041), (I-339)+(1.031)+(1.042), (I-339)+(1.031)+(1.043), (I-339)+(1.031)+(1.044), (I-339)+(1.031)+(1.045), (I-339)+(1.031)+(1.046), (I-339)+(1.031)+(1.047), (I-339)+(1.031)+(1.048), (I-339)+(1.031)+(1.049), (I-339)+(1.031)+(1.050), (I-339)+(1.031)+(1.051), (I-339)+(1.031)+(1.052), (I-339)+(1.031)+(1.053), (I-339)+(1.031)+(1.054), (I-339)+(1.031)+(1.055), (I-339)+(1.031)+(1.056), (I-339)+(1.031)+(1.057), (I-339)+(1.031)+(1.058), (I-339)+(1.031)+(1.059), (I-339)+(1.031)+(1.060), (I-339)+(1.031)+(1.061), (I-339)+(1.031)+(1.062), (I-339)+(1.031)+(1.063), (I-339)+(1.031)+(1.064), (I-339)+(1.031)+(1.065), (I-339)+(1.031)+(1.066), (I-339)+(1.031)+(1.067), (I-339)+(1.031)+(1.068), (I-339)+(1.031)+(1.069), (I-339)+(1.031)+(1.070), (I-339)+(1.031)+(1.071), (I-339)+(1.031)+(1.072), (I-339)+(1.031)+(1.073), (I-339)+(1.031)+(1.074), (I-339)+(1.031)+(1.075), (I-339)+(1.031)+(1.076), (I-339)+(1.031)+(1.077), (I-339)+(1.031)+(1.078), (I-339)+(1.031)+(1.079), (I-339)+(1.031)+(1.080), (I-339)+(1.031)+(1.081), (I-339)+(1.031)+(1.082), (I-339)+(1.031)+(1.083), (I-339)+(1.031)+(1.084), (I-339)+(1.031)+(1.085), (I-339)+(1.031)+(1.086), (I-339)+(1.031)+(1.087), (I-339)+(1.031)+(1.088), (I-339)+(1.031)+(1.089), (I-339)+(1.031)+(1.090), (I-339)+(1.031)+(1.091), (I-339)+(1.031)+(1.092), (I-339)+(1.031)+(2.001), (I-339)+(1.031)+(2.002), (I-339)+(1.031)+(2.003), (I-339)+(1.031)+(2.004), (I-339)+(1.031)+(2.005), (I-339)+(1.031)+(2.006), (I-339)+(1.031)+(2.007), (I-339)+(1.031)+(2.008), (I-339)+(1.031)+(2.009), (I-339)+(1.031)+(2.010), (I-339)+(1.031)+(2.011), (I-339)+(1.031)+(2.012), (I-339)+(1.031)+(2.013), (I-339)+(1.031)+(2.014), (I-339)+(1.031)+(2.015), (I-339)+(1.031)+(2.016), (I-339)+(1.031)+(2.017), (I-339)+(1.031)+(2.018), (I-339)+(1.031)+(2.019), (I-339)+(1.031)+(2.020), (I-339)+(1.031)+(2.021), (I-339)+(1.031)+(2.022), (I-339)+(1.031)+(2.023), (I-339)+(1.031)+(2.024), (I-339)+(1.031)+(2.025), (I-339)+(1.031)+(2.026), (I-339)+(1.031)+(2.027), (I-339)+(1.031)+(2.028), (I-339)+(1.031)+(2.029), (I-339)+(1.031)+(2.030), (I-339)+(1.031)+(2.031), (I-339)+(1.031)+(2.032), (I-339)+(1.031)+(2.033), (I-339)+(1.031)+(2.034), (I-339)+(1.031)+(2.035), (I-339)+(1.031)+(2.036), (I-339)+(1.031)+(2.037), (I-339)+(1.031)+(2.038), (I-339)+(1.031)+(2.039), (I-339)+(1.031)+(2.040), (I-339)+(1.031)+(2.041), (I-339)+(1.031)+(2.042), (I-339)+(1.031)+(2.043), (I-339)+(1.031)+(2.044), (I-339)+(1.031)+(2.045), (I-339)+(1.031)+(2.046), (I-339)+(1.031)+(2.047), (I-339)+(1.031)+(2.048), (I-339)+(1.031)+(2.049), (I-339)+(1.031)+(2.050), (I-339)+(1.031)+(2.051), (I-339)+(1.031)+(2.052), (I-339)+(1.031)+(2.053), (I-339)+(1.031)+(2.054), (I-339)+(1.031)+(2.055), (I-339)+(1.031)+(2.056), (I-339)+(1.031)+(2.057), (I-339)+(1.031)+(2.058), (I-339)+(1.031)+(2.059), (I-339)+(1.031)+(3.001), (I-339)+(1.031)+(3.002), (I-339)+(1.031)+(3.003), (I-339)+(1.031)+(3.004), (I-339)+(1.031)+(3.005), (I-339)+(1.031)+(3.006), (I-339)+(1.031)+(3.007), (I-339)+(1.031)+(3.008), (I-339)+(1.031)+(3.009), (I-339)+(1.031)+(3.010), (I-339)+(1.031)+(3.011), (I-339)+(1.031)+(3.012), (I-339)+(1.031)+(3.013), (I-339)+(1.031)+(3.014), (I-339)+(1.031)+(3.015), (I-339)+(1.031)+(3.016), (I-339)+(1.031)+(3.017), (I-339)+(1.031)+(3.018), (I-339)+(1.031)+(3.019), (I-339)+(1.031)+(3.020), (I-339)+(1.031)+(3.021), (I-339)+(1.031)+(3.022), (I-339)+(1.031)+(3.023), (I-339)+(1.031)+(3.024), (I-339)+(1.031)+(3.025), (I-339)+(1.031)+(3.026), (I-339)+(1.031)+(3.027), (I-339)+(1.031)+(3.028), (I-339)+(1.031)+(3.029), (I-339)+(1.031)+(3.030), (I-339)+(1.031)+(3.031), (I-339)+(1.031)+(5.001), (I-339)+(1.031)+(5.002), (I-339)+(1.031)+(5.003), (I-339)+(1.031)+(5.004), (I-339)+(1.031)+(5.005), (I-339)+(1.031)+(5.006), (I-339)+(1.031)+(5.007), (I-339)+(1.031)+(5.008), (I-339)+(1.031)+(5.009), (I-339)+(1.031)+(5.010), (I-339)+(1.031)+(5.011), (I-339)+(1.031)+(5.012), (I-339)+(1.031)+(5.013), (I-339)+(1.031)+(5.014), (I-339)+(1.031)+(5.015), (I-339)+(1.031)+(5.016), (I-339)+(1.031)+(5.017), (I-339)+(1.031)+(5.018), (I-339)+(1.031)+(5.019), (I-339)+(1.031)+(5.020), (I-339)+(1.031)+(5.021), (I-339)+(1.031)+(5.022), (I-339)+(1.031)+(5.023), (I-339)+(1.031)+(6.001), (I-339)+(1.031)+(6.002), (I-339)+(1.031)+(6.003), (I-339)+(1.031)+(6.004), (I-339)+(1.031)+(7.001), (I-339)+(1.031)+(7.002), (I-339)+(1.031)+(7.003), (I-339)+(1.031)+(7.004), (I-339)+(1.031)+(7.005), (I-339)+(1.031)+(7.006), (I-339)+(1.031)+(9.001), (I-339)+(1.031)+(9.002), (I-339)+(1.031)+(9.003), (I-339)+(1.031)+(9.004), (I-339)+(1.031)+(9.005), (I-339)+(1.031)+(9.006), (I-339)+(1.031)+(9.007), (I-339)+(1.031)+(9.008), (I-339)+(1.031)+(9.009), (I-339)+(1.031)+(14.001), (I-339)+(1.031)+(14.002), (I-339)+(1.031)+(15.008), (I-339)+(1.031)+(15.011), (I-339)+(1.031)+(15.012), (I-339)+(1.031)+(15.016), (I-339)+(1.031)+(15.025), (I-339)+(1.031)+(15.027), (I-339)+(1.031)+(15.047), (I-339)+(1.031)+(15.063), (I-339)+(1.031)+(15.064), (I-339)+(1.031)+(16.001), (I-339)+(1.031)+(16.002), (I-339)+(1.031)+(16.003), (I-339)+(1.031)+(16.004), (I-339)+(1.031)+(16.005), (I-339)+(1.031)+(16.006), (I-339)+(1.031)+(16.007), (I-339)+(1.031)+(16.008), (I-339)+(1.031)+(17.001), (I-339)+(1.031)+(17.002), (I-339)+(1.031)+(17.003), (I-339)+(1.031)+(17.004), (I-339)+(1.031)+(17.005), (I-339)+(1.031)+(17.006), (I-339)+(1.031)+(17.007), (I-339)+(1.031)+(17.008), (I-339)+(1.031)+(17.009), (I-339)+(1.031)+(17.010), (I-339)+(1.031)+(17.011), (I-339)+(1.031)+(17.012), (I-339)+(1.031)+(18.001), (I-339)+(1.032)+(1.033), (I-339)+(1.032)+(1.034), (I-339)+(1.032)+(1.035), (I-339)+(1.032)+(1.036), (I-339)+(1.032)+(1.037), (I-339)+(1.032)+(1.038), (I-339)+(1.032)+(1.039), (I-339)+(1.032)+(1.040), (I-339)+(1.032)+(1.041), (I-339)+(1.032)+(1.042), (I-339)+(1.032)+(1.043), (I-339)+(1.032)+(1.044), (I-339)+(1.032)+(1.045), (I-339)+(1.032)+(1.046), (I-339)+(1.032)+(1.047), (I-339)+(1.032)+(1.048), (I-339)+(1.032)+(1.049), (I-339)+(1.032)+(1.050), (I-339)+(1.032)+(1.051), (I-339)+(1.032)+(1.052), (I-339)+(1.032)+(1.053), (I-339)+(1.032)+(1.054), (I-339)+(1.032)+(1.055), (I-339)+(1.032)+(1.056), (I-339)+(1.032)+(1.057), (I-339)+(1.032)+(1.058), (I-339)+(1.032)+(1.059), (I-339)+(1.032)+(1.060), (I-339)+(1.032)+(1.061), (I-339)+(1.032)+(1.062), (I-339)+(1.032)+(1.063), (I-339)+(1.032)+(1.064), (I-339)+(1.032)+(1.065), (I-339)+(1.032)+(1.066), (I-339)+(1.032)+(1.067), (I-339)+(1.032)+(1.068), (I-339)+(1.032)+(1.069), (I-339)+(1.032)+(1.070), (I-339)+(1.032)+(1.071), (I-339)+(1.032)+(1.072), (I-339)+(1.032)+(1.073), (I-339)+(1.032)+(1.074), (I-339)+(1.032)+(1.075), (I-339)+(1.032)+(1.076), (I-339)+(1.032)+(1.077), (I-339)+(1.032)+(1.078), (I-339)+(1.032)+(1.079), (I-339)+(1.032)+(1.080), (I-339)+(1.032)+(1.081), (I-339)+(1.032)+(1.082), (I-339)+(1.032)+(1.083), (I-339)+(1.032)+(1.084), (I-339)+(1.032)+(1.085), (I-339)+(1.032)+(1.086), (I-339)+(1.032)+(1.087), (I-339)+(1.032)+(1.088), (I-339)+(1.032)+(1.089), (I-339)+(1.032)+(1.090), (I-339)+(1.032)+(1.091), (I-339)+(1.032)+(1.092), (I-339)+(1.032)+(2.001), (I-339)+(1.032)+(2.002), (I-339)+(1.032)+(2.003), (I-339)+(1.032)+(2.004), (I-339)+(1.032)+(2.005), (I-339)+(1.032)+(2.006), (I-339)+(1.032)+(2.007), (I-339)+(1.032)+(2.008), (I-339)+(1.032)+(2.009), (I-339)+(1.032)+(2.010), (I-339)+(1.032)+(2.011), (I-339)+(1.032)+(2.012), (I-339)+(1.032)+(2.013), (I-339)+(1.032)+(2.014), (I-339)+(1.032)+(2.015), (I-339)+(1.032)+(2.016), (I-339)+(1.032)+(2.017), (I-339)+(1.032)+(2.018), (I-339)+(1.032)+(2.019), (I-339)+(1.032)+(2.020), (I-339)+(1.032)+(2.021), (I-339)+(1.032)+(2.022), (I-339)+(1.032)+(2.023), (I-339)+(1.032)+(2.024), (I-339)+(1.032)+(2.025), (I-339)+(1.032)+(2.026), (I-339)+(1.032)+(2.027), (I-339)+(1.032)+(2.028), (I-339)+(1.032)+(2.029), (I-339)+(1.032)+(2.030), (I-339)+(1.032)+(2.031), (I-339)+(1.032)+(2.032), (I-339)+(1.032)+(2.033), (I-339)+(1.032)+(2.034), (I-339)+(1.032)+(2.035), (I-339)+(1.032)+(2.036), (I-339)+(1.032)+(2.037), (I-339)+(1.032)+(2.038), (I-339)+(1.032)+(2.039), (I-339)+(1.032)+(2.040), (I-339)+(1.032)+(2.041), (I-339)+(1.032)+(2.042), (I-339)+(1.032)+(2.043), (I-339)+(1.032)+(2.044), (I-339)+(1.032)+(2.045), (I-339)+(1.032)+(2.046), (I-339)+(1.032)+(2.047), (I-339)+(1.032)+(2.048), (I-339)+(1.032)+(2.049), (I-339)+(1.032)+(2.050), (I-339)+(1.032)+(2.051), (I-339)+(1.032)+(2.052), (I-339)+(1.032)+(2.053), (I-339)+(1.032)+(2.054), (I-339)+(1.032)+(2.055), (I-339)+(1.032)+(2.056), (I-339)+(1.032)+(2.057), (I-339)+(1.032)+(2.058), (I-339)+(1.032)+(2.059), (I-339)+(1.032)+(3.001), (I-339)+(1.032)+(3.002), (I-339)+(1.032)+(3.003), (I-339)+(1.032)+(3.004), (I-339)+(1.032)+(3.005), (I-339)+(1.032)+(3.006), (I-339)+(1.032)+(3.007), (I-339)+(1.032)+(3.008), (I-339)+(1.032)+(3.009), (I-339)+(1.032)+(3.010), (I-339)+(1.032)+(3.011), (I-339)+(1.032)+(3.012), (I-339)+(1.032)+(3.013), (I-339)+(1.032)+(3.014), (I-339)+(1.032)+(3.015), (I-339)+(1.032)+(3.016), (I-339)+(1.032)+(3.017), (I-339)+(1.032)+(3.018), (I-339)+(1.032)+(3.019), (I-339)+(1.032)+(3.020), (I-339)+(1.032)+(3.021), (I-339)+(1.032)+(3.022), (I-339)+(1.032)+(3.023), (I-339)+(1.032)+(3.024), (I-339)+(1.032)+(3.025), (I-339)+(1.032)+(3.026), (I-339)+(1.032)+(3.027), (I-339)+(1.032)+(3.028), (I-339)+(1.032)+(3.029), (I-339)+(1.032)+(3.030), (I-339)+(1.032)+(3.031), (I-339)+(1.032)+(5.001), (I-339)+(1.032)+(5.002), (I-339)+(1.032)+(5.003), (I-339)+(1.032)+(5.004), (I-339)+(1.032)+(5.005), (I-339)+(1.032)+(5.006), (I-339)+(1.032)+(5.007), (I-339)+(1.032)+(5.008), (I-339)+(1.032)+(5.009), (I-339)+(1.032)+(5.010), (I-339)+(1.032)+(5.011), (I-339)+(1.032)+(5.012), (I-339)+(1.032)+(5.013), (I-339)+(1.032)+(5.014), (I-339)+(1.032)+(5.015), (I-339)+(1.032)+(5.016), (I-339)+(1.032)+(5.017), (I-339)+(1.032)+(5.018), (I-339)+(1.032)+(5.019), (I-339)+(1.032)+(5.020), (I-339)+(1.032)+(5.021), (I-339)+(1.032)+(5.022), (I-339)+(1.032)+(5.023), (I-339)+(1.032)+(6.001), (I-339)+(1.032)+(6.002), (I-339)+(1.032)+(6.003), (I-339)+(1.032)+(6.004), (I-339)+(1.032)+(7.001), (I-339)+(1.032)+(7.002), (I-339)+(1.032)+(7.003), (I-339)+(1.032)+(7.004), (I-339)+(1.032)+(7.005), (I-339)+(1.032)+(7.006), (I-339)+(1.032)+(9.001), (I-339)+(1.032)+(9.002), (I-339)+(1.032)+(9.003), (I-339)+(1.032)+(9.004), (I-339)+(1.032)+(9.005), (I-339)+(1.032)+(9.006), (I-339)+(1.032)+(9.007), (I-339)+(1.032)+(9.008), (I-339)+(1.032)+(9.009), (I-339)+(1.032)+(14.001), (I-339)+(1.032)+(14.002), (I-339)+(1.032)+(15.008), (I-339)+(1.032)+(15.011), (I-339)+(1.032)+(15.012), (I-339)+(1.032)+(15.016), (I-339)+(1.032)+(15.025), (I-339)+(1.032)+(15.027), (I-339)+(1.032)+(15.047), (I-339)+(1.032)+(15.063), (I-339)+(1.032)+(15.064), (I-339)+(1.032)+(16.001), (I-339)+(1.032)+(16.002), (I-339)+(1.032)+(16.003), (I-339)+(1.032)+(16.004), (I-339)+(1.032)+(16.005), (I-339)+(1.032)+(16.006), (I-339)+(1.032)+(16.007), (I-339)+(1.032)+(16.008), (I-339)+(1.032)+(17.001), (I-339)+(1.032)+(17.002), (I-339)+(1.032)+(17.003), (I-339)+(1.032)+(17.004), (I-339)+(1.032)+(17.005), (I-339)+(1.032)+(17.006), (I-339)+(1.032)+(17.007), (I-339)+(1.032)+(17.008), (I-339)+(1.032)+(17.009), (I-339)+(1.032)+(17.010), (I-339)+(1.032)+(17.011), (I-339)+(1.032)+(17.012), (I-339)+(1.032)+(18.001), (I-339)+(1.033)+(1.034), (I-339)+(1.033)+(1.035), (I-339)+(1.033)+(1.036), (I-339)+(1.033)+(1.037), (I-339)+(1.033)+(1.038), (I-339)+(1.033)+(1.039), (I-339)+(1.033)+(1.040), (I-339)+(1.033)+(1.041), (I-339)+(1.033)+(1.042), (I-339)+(1.033)+(1.043), (I-339)+(1.033)+(1.044), (I-339)+(1.033)+(1.045), (I-339)+(1.033)+(1.046), (I-339)+(1.033)+(1.047), (I-339)+(1.033)+(1.048), (I-339)+(1.033)+(1.049), (I-339)+(1.033)+(1.050), (I-339)+(1.033)+(1.051), (I-339)+(1.033)+(1.052), (I-339)+(1.033)+(1.053), (I-339)+(1.033)+(1.054), (I-339)+(1.033)+(1.055), (I-339)+(1.033)+(1.056), (I-339)+(1.033)+(1.057), (I-339)+(1.033)+(1.058), (I-339)+(1.033)+(1.059), (I-339)+(1.033)+(1.060), (I-339)+(1.033)+(1.061), (I-339)+(1.033)+(1.062), (I-339)+(1.033)+(1.063), (I-339)+(1.033)+(1.064), (I-339)+(1.033)+(1.065), (I-339)+(1.033)+(1.066), (I-339)+(1.033)+(1.067), (I-339)+(1.033)+(1.068), (I-339)+(1.033)+(1.069), (I-339)+(1.033)+(1.070), (I-339)+(1.033)+(1.071), (I-339)+(1.033)+(1.072), (I-339)+(1.033)+(1.073), (I-339)+(1.033)+(1.074), (I-339)+(1.033)+(1.075), (I-339)+(1.033)+(1.076), (I-339)+(1.033)+(1.077), (I-339)+(1.033)+(1.078), (I-339)+(1.033)+(1.079), (I-339)+(1.033)+(1.080), (I-339)+(1.033)+(1.081), (I-339)+(1.033)+(1.082), (I-339)+(1.033)+(1.083), (I-339)+(1.033)+(1.084), (I-339)+(1.033)+(1.085), (I-339)+(1.033)+(1.086), (I-339)+(1.033)+(1.087), (I-339)+(1.033)+(1.088), (I-339)+(1.033)+(1.089), (I-339)+(1.033)+(1.090), (I-339)+(1.033)+(1.091), (I-339)+(1.033)+(1.092), (I-339)+(1.033)+(2.001), (I-339)+(1.033)+(2.002), (I-339)+(1.033)+(2.003), (I-339)+(1.033)+(2.004), (I-339)+(1.033)+(2.005), (I-339)+(1.033)+(2.006), (I-339)+(1.033)+(2.007), (I-339)+(1.033)+(2.008), (I-339)+(1.033)+(2.009), (I-339)+(1.033)+(2.010), (I-339)+(1.033)+(2.011), (I-339)+(1.033)+(2.012), (I-339)+(1.033)+(2.013), (I-339)+(1.033)+(2.014), (I-339)+(1.033)+(2.015), (I-339)+(1.033)+(2.016), (I-339)+(1.033)+(2.017), (I-339)+(1.033)+(2.018), (I-339)+(1.033)+(2.019), (I-339)+(1.033)+(2.020), (I-339)+(1.033)+(2.021), (I-339)+(1.033)+(2.022), (I-339)+(1.033)+(2.023), (I-339)+(1.033)+(2.024), (I-339)+(1.033)+(2.025), (I-339)+(1.033)+(2.026), (I-339)+(1.033)+(2.027), (I-339)+(1.033)+(2.028), (I-339)+(1.033)+(2.029), (I-339)+(1.033)+(2.030), (I-339)+(1.033)+(2.031), (I-339)+(1.033)+(2.032), (I-339)+(1.033)+(2.033), (I-339)+(1.033)+(2.034), (I-339)+(1.033)+(2.035), (I-339)+(1.033)+(2.036), (I-339)+(1.033)+(2.037), (I-339)+(1.033)+(2.038), (I-339)+(1.033)+(2.039), (I-339)+(1.033)+(2.040), (I-339)+(1.033)+(2.041), (I-339)+(1.033)+(2.042), (I-339)+(1.033)+(2.043), (I-339)+(1.033)+(2.044), (I-339)+(1.033)+(2.045), (I-339)+(1.033)+(2.046), (I-339)+(1.033)+(2.047), (I-339)+(1.033)+(2.048), (I-339)+(1.033)+(2.049), (I-339)+(1.033)+(2.050), (I-339)+(1.033)+(2.051), (I-339)+(1.033)+(2.052), (I-339)+(1.033)+(2.053), (I-339)+(1.033)+(2.054), (I-339)+(1.033)+(2.055), (I-339)+(1.033)+(2.056), (I-339)+(1.033)+(2.057), (I-339)+(1.033)+(2.058), (I-339)+(1.033)+(2.059), (I-339)+(1.033)+(3.001), (I-339)+(1.033)+(3.002), (I-339)+(1.033)+(3.003), (I-339)+(1.033)+(3.004), (I-339)+(1.033)+(3.005), (I-339)+(1.033)+(3.006), (I-339)+(1.033)+(3.007), (I-339)+(1.033)+(3.008), (I-339)+(1.033)+(3.009), (I-339)+(1.033)+(3.010), (I-339)+(1.033)+(3.011), (I-339)+(1.033)+(3.012), (I-339)+(1.033)+(3.013), (I-339)+(1.033)+(3.014), (I-339)+(1.033)+(3.015), (I-339)+(1.033)+(3.016), (I-339)+(1.033)+(3.017), (I-339)+(1.033)+(3.018), (I-339)+(1.033)+(3.019), (I-339)+(1.033)+(3.020), (I-339)+(1.033)+(3.021), (I-339)+(1.033)+(3.022), (I-339)+(1.033)+(3.023), (I-339)+(1.033)+(3.024), (I-339)+(1.033)+(3.025), (I-339)+(1.033)+(3.026), (I-339)+(1.033)+(3.027), (I-339)+(1.033)+(3.028), (I-339)+(1.033)+(3.029), (I-339)+(1.033)+(3.030), (I-339)+(1.033)+(3.031), (I-339)+(1.033)+(5.001), (I-339)+(1.033)+(5.002), (I-339)+(1.033)+(5.003), (I-339)+(1.033)+(5.004), (I-339)+(1.033)+(5.005), (I-339)+(1.033)+(5.006), (I-339)+(1.033)+(5.007), (I-339)+(1.033)+(5.008), (I-339)+(1.033)+(5.009), (I-339)+(1.033)+(5.010), (I-339)+(1.033)+(5.011), (I-339)+(1.033)+(5.012), (I-339)+(1.033)+(5.013), (I-339)+(1.033)+(5.014), (I-339)+(1.033)+(5.015), (I-339)+(1.033)+(5.016), (I-339)+(1.033)+(5.017), (I-339)+(1.033)+(5.018), (I-339)+(1.033)+(5.019), (I-339)+(1.033)+(5.020), (I-339)+(1.033)+(5.021), (I-339)+(1.033)+(5.022), (I-339)+(1.033)+(5.023), (I-339)+(1.033)+(6.001), (I-339)+(1.033)+(6.002), (I-339)+(1.033)+(6.003), (I-339)+(1.033)+(6.004), (I-339)+(1.033)+(7.001), (I-339)+(1.033)+(7.002), (I-339)+(1.033)+(7.003), (I-339)+(1.033)+(7.004), (I-339)+(1.033)+(7.005), (I-339)+(1.033)+(7.006), (I-339)+(1.033)+(9.001), (I-339)+(1.033)+(9.002), (I-339)+(1.033)+(9.003), (I-339)+(1.033)+(9.004), (I-339)+(1.033)+(9.005), (I-339)+(1.033)+(9.006), (I-339)+(1.033)+(9.007), (I-339)+(1.033)+(9.008), (I-339)+(1.033)+(9.009), (I-339)+(1.033)+(14.001), (I-339)+(1.033)+(14.002), (I-339)+(1.033)+(15.008), (I-339)+(1.033)+(15.011), (I-339)+(1.033)+(15.012), (I-339)+(1.033)+(15.016), (I-339)+(1.033)+(15.025), (I-339)+(1.033)+(15.027), (I-339)+(1.033)+(15.047), (I-339)+(1.033)+(15.063), (I-339)+(1.033)+(15.064), (I-339)+(1.033)+(16.001), (I-339)+(1.033)+(16.002), (I-339)+(1.033)+(16.003), (I-339)+(1.033)+(16.004), (I-339)+(1.033)+(16.005), (I-339)+(1.033)+(16.006), (I-339)+(1.033)+(16.007), (I-339)+(1.033)+(16.008), (I-339)+(1.033)+(17.001), (I-339)+(1.033)+(17.002), (I-339)+(1.033)+(17.003), (I-339)+(1.033)+(17.004), (I-339)+(1.033)+(17.005), (I-339)+(1.033)+(17.006), (I-339)+(1.033)+(17.007), (I-339)+(1.033)+(17.008), (I-339)+(1.033)+(17.009), (I-339)+(1.033)+(17.010), (I-339)+(1.033)+(17.011), (I-339)+(1.033)+(17.012), (I-339)+(1.033)+(18.001), (I-339)+(1.034)+(1.035), (I-339)+(1.034)+(1.036), (I-339)+(1.034)+(1.037), (I-339)+(1.034)+(1.038), (I-339)+(1.034)+(1.039), (I-339)+(1.034)+(1.040), (I-339)+(1.034)+(1.041), (I-339)+(1.034)+(1.042), (I-339)+(1.034)+(1.043), (I-339)+(1.034)+(1.044), (I-339)+(1.034)+(1.045), (I-339)+(1.034)+(1.046), (I-339)+(1.034)+(1.047), (I-339)+(1.034)+(1.048), (I-339)+(1.034)+(1.049), (I-339)+(1.034)+(1.050), (I-339)+(1.034)+(1.051), (I-339)+(1.034)+(1.052), (I-339)+(1.034)+(1.053), (I-339)+(1.034)+(1.054), (I-339)+(1.034)+(1.055), (I-339)+(1.034)+(1.056), (I-339)+(1.034)+(1.057), (I-339)+(1.034)+(1.058), (I-339)+(1.034)+(1.059), (I-339)+(1.034)+(1.060), (I-339)+(1.034)+(1.061), (I-339)+(1.034)+(1.062), (I-339)+(1.034)+(1.063), (I-339)+(1.034)+(1.064), (I-339)+(1.034)+(1.065), (I-339)+(1.034)+(1.066), (I-339)+(1.034)+(1.067), (I-339)+(1.034)+(1.068), (I-339)+(1.034)+(1.069), (I-339)+(1.034)+(1.070), (I-339)+(1.034)+(1.071), (I-339)+(1.034)+(1.072), (I-339)+(1.034)+(1.073), (I-339)+(1.034)+(1.074), (I-339)+(1.034)+(1.075), (I-339)+(1.034)+(1.076), (I-339)+(1.034)+(1.077), (I-339)+(1.034)+(1.078), (I-339)+(1.034)+(1.079), (I-339)+(1.034)+(1.080), (I-339)+(1.034)+(1.081), (I-339)+(1.034)+(1.082), (I-339)+(1.034)+(1.083), (I-339)+(1.034)+(1.084), (I-339)+(1.034)+(1.085), (I-339)+(1.034)+(1.086), (I-339)+(1.034)+(1.087), (I-339)+(1.034)+(1.088), (I-339)+(1.034)+(1.089), (I-339)+(1.034)+(1.090), (I-339)+(1.034)+(1.091), (I-339)+(1.034)+(1.092), (I-339)+(1.034)+(2.001), (I-339)+(1.034)+(2.002), (I-339)+(1.034)+(2.003), (I-339)+(1.034)+(2.004), (I-339)+(1.034)+(2.005), (I-339)+(1.034)+(2.006), (I-339)+(1.034)+(2.007), (I-339)+(1.034)+(2.008), (I-339)+(1.034)+(2.009), (I-339)+(1.034)+(2.010), (I-339)+(1.034)+(2.011), (I-339)+(1.034)+(2.012), (I-339)+(1.034)+(2.013), (I-339)+(1.034)+(2.014), (I-339)+(1.034)+(2.015), (I-339)+(1.034)+(2.016), (I-339)+(1.034)+(2.017), (I-339)+(1.034)+(2.018), (I-339)+(1.034)+(2.019), (I-339)+(1.034)+(2.020), (I-339)+(1.034)+(2.021), (I-339)+(1.034)+(2.022), (I-339)+(1.034)+(2.023), (I-339)+(1.034)+(2.024), (I-339)+(1.034)+(2.025), (I-339)+(1.034)+(2.026), (I-339)+(1.034)+(2.027), (I-339)+(1.034)+(2.028), (I-339)+(1.034)+(2.029), (I-339)+(1.034)+(2.030), (I-339)+(1.034)+(2.031), (I-339)+(1.034)+(2.032), (I-339)+(1.034)+(2.033), (I-339)+(1.034)+(2.034), (I-339)+(1.034)+(2.035), (I-339)+(1.034)+(2.036), (I-339)+(1.034)+(2.037), (I-339)+(1.034)+(2.038), (I-339)+(1.034)+(2.039), (I-339)+(1.034)+(2.040), (I-339)+(1.034)+(2.041), (I-339)+(1.034)+(2.042), (I-339)+(1.034)+(2.043), (I-339)+(1.034)+(2.044), (I-339)+(1.034)+(2.045), (I-339)+(1.034)+(2.046), (I-339)+(1.034)+(2.047), (I-339)+(1.034)+(2.048), (I-339)+(1.034)+(2.049), (I-339)+(1.034)+(2.050), (I-339)+(1.034)+(2.051), (I-339)+(1.034)+(2.052), (I-339)+(1.034)+(2.053), (I-339)+(1.034)+(2.054), (I-339)+(1.034)+(2.055), (I-339)+(1.034)+(2.056), (I-339)+(1.034)+(2.057), (I-339)+(1.034)+(2.058), (I-339)+(1.034)+(2.059), (I-339)+(1.034)+(3.001), (I-339)+(1.034)+(3.002), (I-339)+(1.034)+(3.003), (I-339)+(1.034)+(3.004), (I-339)+(1.034)+(3.005), (I-339)+(1.034)+(3.006), (I-339)+(1.034)+(3.007), (I-339)+(1.034)+(3.008), (I-339)+(1.034)+(3.009), (I-339)+(1.034)+(3.010), (I-339)+(1.034)+(3.011), (I-339)+(1.034)+(3.012), (I-339)+(1.034)+(3.013), (I-339)+(1.034)+(3.014), (I-339)+(1.034)+(3.015), (I-339)+(1.034)+(3.016), (I-339)+(1.034)+(3.017), (I-339)+(1.034)+(3.018), (I-339)+(1.034)+(3.019), (I-339)+(1.034)+(3.020), (I-339)+(1.034)+(3.021), (I-339)+(1.034)+(3.022), (I-339)+(1.034)+(3.023), (I-339)+(1.034)+(3.024), (I-339)+(1.034)+(3.025), (I-339)+(1.034)+(3.026), (I-339)+(1.034)+(3.027), (I-339)+(1.034)+(3.028), (I-339)+(1.034)+(3.029), (I-339)+(1.034)+(3.030), (I-339)+(1.034)+(3.031), (I-339)+(1.034)+(5.001), (I-339)+(1.034)+(5.002), (I-339)+(1.034)+(5.003), (I-339)+(1.034)+(5.004), (I-339)+(1.034)+(5.005), (I-339)+(1.034)+(5.006), (I-339)+(1.034)+(5.007), (I-339)+(1.034)+(5.008), (I-339)+(1.034)+(5.009), (I-339)+(1.034)+(5.010), (I-339)+(1.034)+(5.011), (I-339)+(1.034)+(5.012), (I-339)+(1.034)+(5.013), (I-339)+(1.034)+(5.014), (I-339)+(1.034)+(5.015), (I-339)+(1.034)+(5.016), (I-339)+(1.034)+(5.017), (I-339)+(1.034)+(5.018), (I-339)+(1.034)+(5.019), (I-339)+(1.034)+(5.020), (I-339)+(1.034)+(5.021), (I-339)+(1.034)+(5.022), (I-339)+(1.034)+(5.023), (I-339)+(1.034)+(6.001), (I-339)+(1.034)+(6.002), (I-339)+(1.034)+(6.003), (I-339)+(1.034)+(6.004), (I-339)+(1.034)+(7.001), (I-339)+(1.034)+(7.002), (I-339)+(1.034)+(7.003), (I-339)+(1.034)+(7.004), (I-339)+(1.034)+(7.005), (I-339)+(1.034)+(7.006), (I-339)+(1.034)+(9.001), (I-339)+(1.034)+(9.002), (I-339)+(1.034)+(9.003), (I-339)+(1.034)+(9.004), (I-339)+(1.034)+(9.005), (I-339)+(1.034)+(9.006), (I-339)+(1.034)+(9.007), (I-339)+(1.034)+(9.008), (I-339)+(1.034)+(9.009), (I-339)+(1.034)+(14.001), (I-339)+(1.034)+(14.002), (I-339)+(1.034)+(15.008), (I-339)+(1.034)+(15.011), (I-339)+(1.034)+(15.012), (I-339)+(1.034)+(15.016), (I-339)+(1.034)+(15.025), (I-339)+(1.034)+(15.027), (I-339)+(1.034)+(15.047), (I-339)+(1.034)+(15.063), (I-339)+(1.034)+(15.064), (I-339)+(1.034)+(16.001), (I-339)+(1.034)+(16.002), (I-339)+(1.034)+(16.003), (I-339)+(1.034)+(16.004), (I-339)+(1.034)+(16.005), (I-339)+(1.034)+(16.006), (I-339)+(1.034)+(16.007), (I-339)+(1.034)+(16.008), (I-339)+(1.034)+(17.001), (I-339)+(1.034)+(17.002), (I-339)+(1.034)+(17.003), (I-339)+(1.034)+(17.004), (I-339)+(1.034)+(17.005), (I-339)+(1.034)+(17.006), (I-339)+(1.034)+(17.007), (I-339)+(1.034)+(17.008), (I-339)+(1.034)+(17.009), (I-339)+(1.034)+(17.010), (I-339)+(1.034)+(17.011), (I-339)+(1.034)+(17.012), (I-339)+(1.034)+(18.001), (I-339)+(1.035)+(1.036), (I-339)+(1.035)+(1.037), (I-339)+(1.035)+(1.038), (I-339)+(1.035)+(1.039), (I-339)+(1.035)+(1.040), (I-339)+(1.035)+(1.041), (I-339)+(1.035)+(1.042), (I-339)+(1.035)+(1.043), (I-339)+(1.035)+(1.044), (I-339)+(1.035)+(1.045), (I-339)+(1.035)+(1.046), (I-339)+(1.035)+(1.047), (I-339)+(1.035)+(1.048), (I-339)+(1.035)+(1.049), (I-339)+(1.035)+(1.050), (I-339)+(1.035)+(1.051), (I-339)+(1.035)+(1.052), (I-339)+(1.035)+(1.053), (I-339)+(1.035)+(1.054), (I-339)+(1.035)+(1.055), (I-339)+(1.035)+(1.056), (I-339)+(1.035)+(1.057), (I-339)+(1.035)+(1.058), (I-339)+(1.035)+(1.059), (I-339)+(1.035)+(1.060), (I-339)+(1.035)+(1.061), (I-339)+(1.035)+(1.062), (I-339)+(1.035)+(1.063), (I-339)+(1.035)+(1.064), (I-339)+(1.035)+(1.065), (I-339)+(1.035)+(1.066), (I-339)+(1.035)+(1.067), (I-339)+(1.035)+(1.068), (I-339)+(1.035)+(1.069), (I-339)+(1.035)+(1.070), (I-339)+(1.035)+(1.071), (I-339)+(1.035)+(1.072), (I-339)+(1.035)+(1.073), (I-339)+(1.035)+(1.074), (I-339)+(1.035)+(1.075), (I-339)+(1.035)+(1.076), (I-339)+(1.035)+(1.077), (I-339)+(1.035)+(1.078), (I-339)+(1.035)+(1.079), (I-339)+(1.035)+(1.080), (I-339)+(1.035)+(1.081), (I-339)+(1.035)+(1.082), (I-339)+(1.035)+(1.083), (I-339)+(1.035)+(1.084), (I-339)+(1.035)+(1.085), (I-339)+(1.035)+(1.086), (I-339)+(1.035)+(1.087), (I-339)+(1.035)+(1.088), (I-339)+(1.035)+(1.089), (I-339)+(1.035)+(1.090), (I-339)+(1.035)+(1.091), (I-339)+(1.035)+(1.092), (I-339)+(1.035)+(2.001), (I-339)+(1.035)+(2.002), (I-339)+(1.035)+(2.003), (I-339)+(1.035)+(2.004), (I-339)+(1.035)+(2.005), (I-339)+(1.035)+(2.006), (I-339)+(1.035)+(2.007), (I-339)+(1.035)+(2.008), (I-339)+(1.035)+(2.009), (I-339)+(1.035)+(2.010), (I-339)+(1.035)+(2.011), (I-339)+(1.035)+(2.012), (I-339)+(1.035)+(2.013), (I-339)+(1.035)+(2.014), (I-339)+(1.035)+(2.015), (I-339)+(1.035)+(2.016), (I-339)+(1.035)+(2.017), (I-339)+(1.035)+(2.018), (I-339)+(1.035)+(2.019), (I-339)+(1.035)+(2.020), (I-339)+(1.035)+(2.021), (I-339)+(1.035)+(2.022), (I-339)+(1.035)+(2.023), (I-339)+(1.035)+(2.024), (I-339)+(1.035)+(2.025), (I-339)+(1.035)+(2.026), (I-339)+(1.035)+(2.027), (I-339)+(1.035)+(2.028), (I-339)+(1.035)+(2.029), (I-339)+(1.035)+(2.030), (I-339)+(1.035)+(2.031), (I-339)+(1.035)+(2.032), (I-339)+(1.035)+(2.033), (I-339)+(1.035)+(2.034), (I-339)+(1.035)+(2.035), (I-339)+(1.035)+(2.036), (I-339)+(1.035)+(2.037), (I-339)+(1.035)+(2.038), (I-339)+(1.035)+(2.039), (I-339)+(1.035)+(2.040), (I-339)+(1.035)+(2.041), (I-339)+(1.035)+(2.042), (I-339)+(1.035)+(2.043), (I-339)+(1.035)+(2.044), (I-339)+(1.035)+(2.045), (I-339)+(1.035)+(2.046), (I-339)+(1.035)+(2.047), (I-339)+(1.035)+(2.048), (I-339)+(1.035)+(2.049), (I-339)+(1.035)+(2.050), (I-339)+(1.035)+(2.051), (I-339)+(1.035)+(2.052), (I-339)+(1.035)+(2.053), (I-339)+(1.035)+(2.054), (I-339)+(1.035)+(2.055), (I-339)+(1.035)+(2.056), (I-339)+(1.035)+(2.057), (I-339)+(1.035)+(2.058), (I-339)+(1.035)+(2.059), (I-339)+(1.035)+(3.001), (I-339)+(1.035)+(3.002), (I-339)+(1.035)+(3.003), (I-339)+(1.035)+(3.004), (I-339)+(1.035)+(3.005), (I-339)+(1.035)+(3.006), (I-339)+(1.035)+(3.007), (I-339)+(1.035)+(3.008), (I-339)+(1.035)+(3.009), (I-339)+(1.035)+(3.010), (I-339)+(1.035)+(3.011), (I-339)+(1.035)+(3.012), (I-339)+(1.035)+(3.013), (I-339)+(1.035)+(3.014), (I-339)+(1.035)+(3.015), (I-339)+(1.035)+(3.016), (I-339)+(1.035)+(3.017), (I-339)+(1.035)+(3.018), (I-339)+(1.035)+(3.019), (I-339)+(1.035)+(3.020), (I-339)+(1.035)+(3.021), (I-339)+(1.035)+(3.022), (I-339)+(1.035)+(3.023), (I-339)+(1.035)+(3.024), (I-339)+(1.035)+(3.025), (I-339)+(1.035)+(3.026), (I-339)+(1.035)+(3.027), (I-339)+(1.035)+(3.028), (I-339)+(1.035)+(3.029), (I-339)+(1.035)+(3.030), (I-339)+(1.035)+(3.031), (I-339)+(1.035)+(5.001), (I-339)+(1.035)+(5.002), (I-339)+(1.035)+(5.003), (I-339)+(1.035)+(5.004), (I-339)+(1.035)+(5.005), (I-339)+(1.035)+(5.006), (I-339)+(1.035)+(5.007), (I-339)+(1.035)+(5.008), (I-339)+(1.035)+(5.009), (I-339)+(1.035)+(5.010), (I-339)+(1.035)+(5.011), (I-339)+(1.035)+(5.012), (I-339)+(1.035)+(5.013), (I-339)+(1.035)+(5.014), (I-339)+(1.035)+(5.015), (I-339)+(1.035)+(5.016), (I-339)+(1.035)+(5.017), (I-339)+(1.035)+(5.018), (I-339)+(1.035)+(5.019), (I-339)+(1.035)+(5.020), (I-339)+(1.035)+(5.021), (I-339)+(1.035)+(5.022), (I-339)+(1.035)+(5.023), (I-339)+(1.035)+(6.001), (I-339)+(1.035)+(6.002), (I-339)+(1.035)+(6.003), (I-339)+(1.035)+(6.004), (I-339)+(1.035)+(7.001), (I-339)+(1.035)+(7.002), (I-339)+(1.035)+(7.003), (I-339)+(1.035)+(7.004), (I-339)+(1.035)+(7.005), (I-339)+(1.035)+(7.006), (I-339)+(1.035)+(9.001), (I-339)+(1.035)+(9.002), (I-339)+(1.035)+(9.003), (I-339)+(1.035)+(9.004), (I-339)+(1.035)+(9.005), (I-339)+(1.035)+(9.006), (I-339)+(1.035)+(9.007), (I-339)+(1.035)+(9.008), (I-339)+(1.035)+(9.009), (I-339)+(1.035)+(14.001), (I-339)+(1.035)+(14.002), (I-339)+(1.035)+(15.008), (I-339)+(1.035)+(15.011), (I-339)+(1.035)+(15.012), (I-339)+(1.035)+(15.016), (I-339)+(1.035)+(15.025), (I-339)+(1.035)+(15.027), (I-339)+(1.035)+(15.047), (I-339)+(1.035)+(15.063), (I-339)+(1.035)+(15.064), (I-339)+(1.035)+(16.001), (I-339)+(1.035)+(16.002), (I-339)+(1.035)+(16.003), (I-339)+(1.035)+(16.004), (I-339)+(1.035)+(16.005), (I-339)+(1.035)+(16.006), (I-339)+(1.035)+(16.007), (I-339)+(1.035)+(16.008), (I-339)+(1.035)+(17.001), (I-339)+(1.035)+(17.002), (I-339)+(1.035)+(17.003), (I-339)+(1.035)+(17.004), (I-339)+(1.035)+(17.005), (I-339)+(1.035)+(17.006), (I-339)+(1.035)+(17.007), (I-339)+(1.035)+(17.008), (I-339)+(1.035)+(17.009), (I-339)+(1.035)+(17.010), (I-339)+(1.035)+(17.011), (I-339)+(1.035)+(17.012), (I-339)+(1.035)+(18.001), (I-339)+(1.036)+(1.037), (I-339)+(1.036)+(1.038), (I-339)+(1.036)+(1.039), (I-339)+(1.036)+(1.040), (I-339)+(1.036)+(1.041), (I-339)+(1.036)+(1.042), (I-339)+(1.036)+(1.043), (I-339)+(1.036)+(1.044), (I-339)+(1.036)+(1.045), (I-339)+(1.036)+(1.046), (I-339)+(1.036)+(1.047), (I-339)+(1.036)+(1.048), (I-339)+(1.036)+(1.049), (I-339)+(1.036)+(1.050), (I-339)+(1.036)+(1.051), (I-339)+(1.036)+(1.052), (I-339)+(1.036)+(1.053), (I-339)+(1.036)+(1.054), (I-339)+(1.036)+(1.055), (I-339)+(1.036)+(1.056), (I-339)+(1.036)+(1.057), (I-339)+(1.036)+(1.058), (I-339)+(1.036)+(1.059), (I-339)+(1.036)+(1.060), (I-339)+(1.036)+(1.061), (I-339)+(1.036)+(1.062), (I-339)+(1.036)+(1.063), (I-339)+(1.036)+(1.064), (I-339)+(1.036)+(1.065), (I-339)+(1.036)+(1.066), (I-339)+(1.036)+(1.067), (I-339)+(1.036)+(1.068), (I-339)+(1.036)+(1.069), (I-339)+(1.036)+(1.070), (I-339)+(1.036)+(1.071), (I-339)+(1.036)+(1.072), (I-339)+(1.036)+(1.073), (I-339)+(1.036)+(1.074), (I-339)+(1.036)+(1.075), (I-339)+(1.036)+(1.076), (I-339)+(1.036)+(1.077), (I-339)+(1.036)+(1.078), (I-339)+(1.036)+(1.079), (I-339)+(1.036)+(1.080), (I-339)+(1.036)+(1.081), (I-339)+(1.036)+(1.082), (I-339)+(1.036)+(1.083), (I-339)+(1.036)+(1.084), (I-339)+(1.036)+(1.085), (I-339)+(1.036)+(1.086), (I-339)+(1.036)+(1.087), (I-339)+(1.036)+(1.088), (I-339)+(1.036)+(1.089), (I-339)+(1.036)+(1.090), (I-339)+(1.036)+(1.091), (I-339)+(1.036)+(1.092), (I-339)+(1.036)+(2.001), (I-339)+(1.036)+(2.002), (I-339)+(1.036)+(2.003), (I-339)+(1.036)+(2.004), (I-339)+(1.036)+(2.005), (I-339)+(1.036)+(2.006), (I-339)+(1.036)+(2.007), (I-339)+(1.036)+(2.008), (I-339)+(1.036)+(2.009), (I-339)+(1.036)+(2.010), (I-339)+(1.036)+(2.011), (I-339)+(1.036)+(2.012), (I-339)+(1.036)+(2.013), (I-339)+(1.036)+(2.014), (I-339)+(1.036)+(2.015), (I-339)+(1.036)+(2.016), (I-339)+(1.036)+(2.017), (I-339)+(1.036)+(2.018), (I-339)+(1.036)+(2.019), (I-339)+(1.036)+(2.020), (I-339)+(1.036)+(2.021), (I-339)+(1.036)+(2.022), (I-339)+(1.036)+(2.023), (I-339)+(1.036)+(2.024), (I-339)+(1.036)+(2.025), (I-339)+(1.036)+(2.026), (I-339)+(1.036)+(2.027), (I-339)+(1.036)+(2.028), (I-339)+(1.036)+(2.029), (I-339)+(1.036)+(2.030), (I-339)+(1.036)+(2.031), (I-339)+(1.036)+(2.032), (I-339)+(1.036)+(2.033), (I-339)+(1.036)+(2.034), (I-339)+(1.036)+(2.035), (I-339)+(1.036)+(2.036), (I-339)+(1.036)+(2.037), (I-339)+(1.036)+(2.038), (I-339)+(1.036)+(2.039), (I-339)+(1.036)+(2.040), (I-339)+(1.036)+(2.041), (I-339)+(1.036)+(2.042), (I-339)+(1.036)+(2.043), (I-339)+(1.036)+(2.044), (I-339)+(1.036)+(2.045), (I-339)+(1.036)+(2.046), (I-339)+(1.036)+(2.047), (I-339)+(1.036)+(2.048), (I-339)+(1.036)+(2.049), (I-339)+(1.036)+(2.050), (I-339)+(1.036)+(2.051), (I-339)+(1.036)+(2.052), (I-339)+(1.036)+(2.053), (I-339)+(1.036)+(2.054), (I-339)+(1.036)+(2.055), (I-339)+(1.036)+(2.056), (I-339)+(1.036)+(2.057), (I-339)+(1.036)+(2.058), (I-339)+(1.036)+(2.059), (I-339)+(1.036)+(3.001), (I-339)+(1.036)+(3.002), (I-339)+(1.036)+(3.003), (I-339)+(1.036)+(3.004), (I-339)+(1.036)+(3.005), (I-339)+(1.036)+(3.006), (I-339)+(1.036)+(3.007), (I-339)+(1.036)+(3.008), (I-339)+(1.036)+(3.009), (I-339)+(1.036)+(3.010), (I-339)+(1.036)+(3.011), (I-339)+(1.036)+(3.012), (I-339)+(1.036)+(3.013), (I-339)+(1.036)+(3.014), (I-339)+(1.036)+(3.015), (I-339)+(1.036)+(3.016), (I-339)+(1.036)+(3.017), (I-339)+(1.036)+(3.018), (I-339)+(1.036)+(3.019), (I-339)+(1.036)+(3.020), (I-339)+(1.036)+(3.021), (I-339)+(1.036)+(3.022), (I-339)+(1.036)+(3.023), (I-339)+(1.036)+(3.024), (I-339)+(1.036)+(3.025), (I-339)+(1.036)+(3.026), (I-339)+(1.036)+(3.027), (I-339)+(1.036)+(3.028), (I-339)+(1.036)+(3.029), (I-339)+(1.036)+(3.030), (I-339)+(1.036)+(3.031), (I-339)+(1.036)+(5.001), (I-339)+(1.036)+(5.002), (I-339)+(1.036)+(5.003), (I-339)+(1.036)+(5.004), (I-339)+(1.036)+(5.005), (I-339)+(1.036)+(5.006), (I-339)+(1.036)+(5.007), (I-339)+(1.036)+(5.008), (I-339)+(1.036)+(5.009), (I-339)+(1.036)+(5.010), (I-339)+(1.036)+(5.011), (I-339)+(1.036)+(5.012), (I-339)+(1.036)+(5.013), (I-339)+(1.036)+(5.014), (I-339)+(1.036)+(5.015), (I-339)+(1.036)+(5.016), (I-339)+(1.036)+(5.017), (I-339)+(1.036)+(5.018), (I-339)+(1.036)+(5.019), (I-339)+(1.036)+(5.020), (I-339)+(1.036)+(5.021), (I-339)+(1.036)+(5.022), (I-339)+(1.036)+(5.023), (I-339)+(1.036)+(6.001), (I-339)+(1.036)+(6.002), (I-339)+(1.036)+(6.003), (I-339)+(1.036)+(6.004), (I-339)+(1.036)+(7.001), (I-339)+(1.036)+(7.002), (I-339)+(1.036)+(7.003), (I-339)+(1.036)+(7.004), (I-339)+(1.036)+(7.005), (I-339)+(1.036)+(7.006), (I-339)+(1.036)+(9.001), (I-339)+(1.036)+(9.002), (I-339)+(1.036)+(9.003), (I-339)+(1.036)+(9.004), (I-339)+(1.036)+(9.005), (I-339)+(1.036)+(9.006), (I-339)+(1.036)+(9.007), (I-339)+(1.036)+(9.008), (I-339)+(1.036)+(9.009), (I-339)+(1.036)+(14.001), (I-339)+(1.036)+(14.002), (I-339)+(1.036)+(15.008), (I-339)+(1.036)+(15.011), (I-339)+(1.036)+(15.012), (I-339)+(1.036)+(15.016), (I-339)+(1.036)+(15.025), (I-339)+(1.036)+(15.027), (I-339)+(1.036)+(15.047), (I-339)+(1.036)+(15.063), (I-339)+(1.036)+(15.064), (I-339)+(1.036)+(16.001), (I-339)+(1.036)+(16.002), (I-339)+(1.036)+(16.003), (I-339)+(1.036)+(16.004), (I-339)+(1.036)+(16.005), (I-339)+(1.036)+(16.006), (I-339)+(1.036)+(16.007), (I-339)+(1.036)+(16.008), (I-339)+(1.036)+(17.001), (I-339)+(1.036)+(17.002), (I-339)+(1.036)+(17.003), (I-339)+(1.036)+(17.004), (I-339)+(1.036)+(17.005), (I-339)+(1.036)+(17.006), (I-339)+(1.036)+(17.007), (I-339)+(1.036)+(17.008), (I-339)+(1.036)+(17.009), (I-339)+(1.036)+(17.010), (I-339)+(1.036)+(17.011), (I-339)+(1.036)+(17.012), (I-339)+(1.036)+(18.001), (I-339)+(1.037)+(1.038), (I-339)+(1.037)+(1.039), (I-339)+(1.037)+(1.040), (I-339)+(1.037)+(1.041), (I-339)+(1.037)+(1.042), (I-339)+(1.037)+(1.043), (I-339)+(1.037)+(1.044), (I-339)+(1.037)+(1.045), (I-339)+(1.037)+(1.046), (I-339)+(1.037)+(1.047), (I-339)+(1.037)+(1.048), (I-339)+(1.037)+(1.049), (I-339)+(1.037)+(1.050), (I-339)+(1.037)+(1.051), (I-339)+(1.037)+(1.052), (I-339)+(1.037)+(1.053), (I-339)+(1.037)+(1.054), (I-339)+(1.037)+(1.055), (I-339)+(1.037)+(1.056), (I-339)+(1.037)+(1.057), (I-339)+(1.037)+(1.058), (I-339)+(1.037)+(1.059), (I-339)+(1.037)+(1.060), (I-339)+(1.037)+(1.061), (I-339)+(1.037)+(1.062), (I-339)+(1.037)+(1.063), (I-339)+(1.037)+(1.064), (I-339)+(1.037)+(1.065), (I-339)+(1.037)+(1.066), (I-339)+(1.037)+(1.067), (I-339)+(1.037)+(1.068), (I-339)+(1.037)+(1.069), (I-339)+(1.037)+(1.070), (I-339)+(1.037)+(1.071), (I-339)+(1.037)+(1.072), (I-339)+(1.037)+(1.073), (I-339)+(1.037)+(1.074), (I-339)+(1.037)+(1.075), (I-339)+(1.037)+(1.076), (I-339)+(1.037)+(1.077), (I-339)+(1.037)+(1.078), (I-339)+(1.037)+(1.079), (I-339)+(1.037)+(1.080), (I-339)+(1.037)+(1.081), (I-339)+(1.037)+(1.082), (I-339)+(1.037)+(1.083), (I-339)+(1.037)+(1.084), (I-339)+(1.037)+(1.085), (I-339)+(1.037)+(1.086), (I-339)+(1.037)+(1.087), (I-339)+(1.037)+(1.088), (I-339)+(1.037)+(1.089), (I-339)+(1.037)+(1.090), (I-339)+(1.037)+(1.091), (I-339)+(1.037)+(1.092), (I-339)+(1.037)+(2.001), (I-339)+(1.037)+(2.002), (I-339)+(1.037)+(2.003), (I-339)+(1.037)+(2.004), (I-339)+(1.037)+(2.005), (I-339)+(1.037)+(2.006), (I-339)+(1.037)+(2.007), (I-339)+(1.037)+(2.008), (I-339)+(1.037)+(2.009), (I-339)+(1.037)+(2.010), (I-339)+(1.037)+(2.011), (I-339)+(1.037)+(2.012), (I-339)+(1.037)+(2.013), (I-339)+(1.037)+(2.014), (I-339)+(1.037)+(2.015), (I-339)+(1.037)+(2.016), (I-339)+(1.037)+(2.017), (I-339)+(1.037)+(2.018), (I-339)+(1.037)+(2.019), (I-339)+(1.037)+(2.020), (I-339)+(1.037)+(2.021), (I-339)+(1.037)+(2.022), (I-339)+(1.037)+(2.023), (I-339)+(1.037)+(2.024), (I-339)+(1.037)+(2.025), (I-339)+(1.037)+(2.026), (I-339)+(1.037)+(2.027), (I-339)+(1.037)+(2.028), (I-339)+(1.037)+(2.029), (I-339)+(1.037)+(2.030), (I-339)+(1.037)+(2.031), (I-339)+(1.037)+(2.032), (I-339)+(1.037)+(2.033), (I-339)+(1.037)+(2.034), (I-339)+(1.037)+(2.035), (I-339)+(1.037)+(2.036), (I-339)+(1.037)+(2.037), (I-339)+(1.037)+(2.038), (I-339)+(1.037)+(2.039), (I-339)+(1.037)+(2.040), (I-339)+(1.037)+(2.041), (I-339)+(1.037)+(2.042), (I-339)+(1.037)+(2.043), (I-339)+(1.037)+(2.044), (I-339)+(1.037)+(2.045), (I-339)+(1.037)+(2.046), (I-339)+(1.037)+(2.047), (I-339)+(1.037)+(2.048), (I-339)+(1.037)+(2.049), (I-339)+(1.037)+(2.050), (I-339)+(1.037)+(2.051), (I-339)+(1.037)+(2.052), (I-339)+(1.037)+(2.053), (I-339)+(1.037)+(2.054), (I-339)+(1.037)+(2.055), (I-339)+(1.037)+(2.056), (I-339)+(1.037)+(2.057), (I-339)+(1.037)+(2.058), (I-339)+(1.037)+(2.059), (I-339)+(1.037)+(3.001), (I-339)+(1.037)+(3.002), (I-339)+(1.037)+(3.003), (I-339)+(1.037)+(3.004), (I-339)+(1.037)+(3.005), (I-339)+(1.037)+(3.006), (I-339)+(1.037)+(3.007), (I-339)+(1.037)+(3.008), (I-339)+(1.037)+(3.009), (I-339)+(1.037)+(3.010), (I-339)+(1.037)+(3.011), (I-339)+(1.037)+(3.012), (I-339)+(1.037)+(3.013), (I-339)+(1.037)+(3.014), (I-339)+(1.037)+(3.015), (I-339)+(1.037)+(3.016), (I-339)+(1.037)+(3.017), (I-339)+(1.037)+(3.018), (I-339)+(1.037)+(3.019), (I-339)+(1.037)+(3.020), (I-339)+(1.037)+(3.021), (I-339)+(1.037)+(3.022), (I-339)+(1.037)+(3.023), (I-339)+(1.037)+(3.024), (I-339)+(1.037)+(3.025), (I-339)+(1.037)+(3.026), (I-339)+(1.037)+(3.027), (I-339)+(1.037)+(3.028), (I-339)+(1.037)+(3.029), (I-339)+(1.037)+(3.030), (I-339)+(1.037)+(3.031), (I-339)+(1.037)+(5.001), (I-339)+(1.037)+(5.002), (I-339)+(1.037)+(5.003), (I-339)+(1.037)+(5.004), (I-339)+(1.037)+(5.005), (I-339)+(1.037)+(5.006), (I-339)+(1.037)+(5.007), (I-339)+(1.037)+(5.008), (I-339)+(1.037)+(5.009), (I-339)+(1.037)+(5.010), (I-339)+(1.037)+(5.011), (I-339)+(1.037)+(5.012), (I-339)+(1.037)+(5.013), (I-339)+(1.037)+(5.014), (I-339)+(1.037)+(5.015), (I-339)+(1.037)+(5.016), (I-339)+(1.037)+(5.017), (I-339)+(1.037)+(5.018), (I-339)+(1.037)+(5.019), (I-339)+(1.037)+(5.020), (I-339)+(1.037)+(5.021), (I-339)+(1.037)+(5.022), (I-339)+(1.037)+(5.023), (I-339)+(1.037)+(6.001), (I-339)+(1.037)+(6.002), (I-339)+(1.037)+(6.003), (I-339)+(1.037)+(6.004), (I-339)+(1.037)+(7.001), (I-339)+(1.037)+(7.002), (I-339)+(1.037)+(7.003), (I-339)+(1.037)+(7.004), (I-339)+(1.037)+(7.005), (I-339)+(1.037)+(7.006), (I-339)+(1.037)+(9.001), (I-339)+(1.037)+(9.002), (I-339)+(1.037)+(9.003), (I-339)+(1.037)+(9.004), (I-339)+(1.037)+(9.005), (I-339)+(1.037)+(9.006), (I-339)+(1.037)+(9.007), (I-339)+(1.037)+(9.008), (I-339)+(1.037)+(9.009), (I-339)+(1.037)+(14.001), (I-339)+(1.037)+(14.002), (I-339)+(1.037)+(15.008), (I-339)+(1.037)+(15.011), (I-339)+(1.037)+(15.012), (I-339)+(1.037)+(15.016), (I-339)+(1.037)+(15.025), (I-339)+(1.037)+(15.027), (I-339)+(1.037)+(15.047), (I-339)+(1.037)+(15.063), (I-339)+(1.037)+(15.064), (I-339)+(1.037)+(16.001), (I-339)+(1.037)+(16.002), (I-339)+(1.037)+(16.003), (I-339)+(1.037)+(16.004), (I-339)+(1.037)+(16.005), (I-339)+(1.037)+(16.006), (I-339)+(1.037)+(16.007), (I-339)+(1.037)+(16.008), (I-339)+(1.037)+(17.001), (I-339)+(1.037)+(17.002), (I-339)+(1.037)+(17.003), (I-339)+(1.037)+(17.004), (I-339)+(1.037)+(17.005), (I-339)+(1.037)+(17.006), (I-339)+(1.037)+(17.007), (I-339)+(1.037)+(17.008), (I-339)+(1.037)+(17.009), (I-339)+(1.037)+(17.010), (I-339)+(1.037)+(17.011), (I-339)+(1.037)+(17.012), (I-339)+(1.037)+(18.001), (I-339)+(1.038)+(1.039), (I-339)+(1.038)+(1.040), (I-339)+(1.038)+(1.041), (I-339)+(1.038)+(1.042), (I-339)+(1.038)+(1.043), (I-339)+(1.038)+(1.044), (I-339)+(1.038)+(1.045), (I-339)+(1.038)+(1.046), (I-339)+(1.038)+(1.047), (I-339)+(1.038)+(1.048), (I-339)+(1.038)+(1.049), (I-339)+(1.038)+(1.050), (I-339)+(1.038)+(1.051), (I-339)+(1.038)+(1.052), (I-339)+(1.038)+(1.053), (I-339)+(1.038)+(1.054), (I-339)+(1.038)+(1.055), (I-339)+(1.038)+(1.056), (I-339)+(1.038)+(1.057), (I-339)+(1.038)+(1.058), (I-339)+(1.038)+(1.059), (I-339)+(1.038)+(1.060), (I-339)+(1.038)+(1.061), (I-339)+(1.038)+(1.062), (I-339)+(1.038)+(1.063), (I-339)+(1.038)+(1.064), (I-339)+(1.038)+(1.065), (I-339)+(1.038)+(1.066), (I-339)+(1.038)+(1.067), (I-339)+(1.038)+(1.068), (I-339)+(1.038)+(1.069), (I-339)+(1.038)+(1.070), (I-339)+(1.038)+(1.071), (I-339)+(1.038)+(1.072), (I-339)+(1.038)+(1.073), (I-339)+(1.038)+(1.074), (I-339)+(1.038)+(1.075), (I-339)+(1.038)+(1.076), (I-339)+(1.038)+(1.077), (I-339)+(1.038)+(1.078), (I-339)+(1.038)+(1.079), (I-339)+(1.038)+(1.080), (I-339)+(1.038)+(1.081), (I-339)+(1.038)+(1.082), (I-339)+(1.038)+(1.083), (I-339)+(1.038)+(1.084), (I-339)+(1.038)+(1.085), (I-339)+(1.038)+(1.086), (I-339)+(1.038)+(1.087), (I-339)+(1.038)+(1.088), (I-339)+(1.038)+(1.089), (I-339)+(1.038)+(1.090), (I-339)+(1.038)+(1.091), (I-339)+(1.038)+(1.092), (I-339)+(1.038)+(2.001), (I-339)+(1.038)+(2.002), (I-339)+(1.038)+(2.003), (I-339)+(1.038)+(2.004), (I-339)+(1.038)+(2.005), (I-339)+(1.038)+(2.006), (I-339)+(1.038)+(2.007), (I-339)+(1.038)+(2.008), (I-339)+(1.038)+(2.009), (I-339)+(1.038)+(2.010), (I-339)+(1.038)+(2.011), (I-339)+(1.038)+(2.012), (I-339)+(1.038)+(2.013), (I-339)+(1.038)+(2.014), (I-339)+(1.038)+(2.015), (I-339)+(1.038)+(2.016), (I-339)+(1.038)+(2.017), (I-339)+(1.038)+(2.018), (I-339)+(1.038)+(2.019), (I-339)+(1.038)+(2.020), (I-339)+(1.038)+(2.021), (I-339)+(1.038)+(2.022), (I-339)+(1.038)+(2.023), (I-339)+(1.038)+(2.024), (I-339)+(1.038)+(2.025), (I-339)+(1.038)+(2.026), (I-339)+(1.038)+(2.027), (I-339)+(1.038)+(2.028), (I-339)+(1.038)+(2.029), (I-339)+(1.038)+(2.030), (I-339)+(1.038)+(2.031), (I-339)+(1.038)+(2.032), (I-339)+(1.038)+(2.033), (I-339)+(1.038)+(2.034), (I-339)+(1.038)+(2.035), (I-339)+(1.038)+(2.036), (I-339)+(1.038)+(2.037), (I-339)+(1.038)+(2.038), (I-339)+(1.038)+(2.039), (I-339)+(1.038)+(2.040), (I-339)+(1.038)+(2.041), (I-339)+(1.038)+(2.042), (I-339)+(1.038)+(2.043), (I-339)+(1.038)+(2.044), (I-339)+(1.038)+(2.045), (I-339)+(1.038)+(2.046), (I-339)+(1.038)+(2.047), (I-339)+(1.038)+(2.048), (I-339)+(1.038)+(2.049), (I-339)+(1.038)+(2.050), (I-339)+(1.038)+(2.051), (I-339)+(1.038)+(2.052), (I-339)+(1.038)+(2.053), (I-339)+(1.038)+(2.054), (I-339)+(1.038)+(2.055), (I-339)+(1.038)+(2.056), (I-339)+(1.038)+(2.057), (I-339)+(1.038)+(2.058), (I-339)+(1.038)+(2.059), (I-339)+(1.038)+(3.001), (I-339)+(1.038)+(3.002), (I-339)+(1.038)+(3.003), (I-339)+(1.038)+(3.004), (I-339)+(1.038)+(3.005), (I-339)+(1.038)+(3.006), (I-339)+(1.038)+(3.007), (I-339)+(1.038)+(3.008), (I-339)+(1.038)+(3.009), (I-339)+(1.038)+(3.010), (I-339)+(1.038)+(3.011), (I-339)+(1.038)+(3.012), (I-339)+(1.038)+(3.013), (I-339)+(1.038)+(3.014), (I-339)+(1.038)+(3.015), (I-339)+(1.038)+(3.016), (I-339)+(1.038)+(3.017), (I-339)+(1.038)+(3.018), (I-339)+(1.038)+(3.019), (I-339)+(1.038)+(3.020), (I-339)+(1.038)+(3.021), (I-339)+(1.038)+(3.022), (I-339)+(1.038)+(3.023), (I-339)+(1.038)+(3.024), (I-339)+(1.038)+(3.025), (I-339)+(1.038)+(3.026), (I-339)+(1.038)+(3.027), (I-339)+(1.038)+(3.028), (I-339)+(1.038)+(3.029), (I-339)+(1.038)+(3.030), (I-339)+(1.038)+(3.031), (I-339)+(1.038)+(5.001), (I-339)+(1.038)+(5.002), (I-339)+(1.038)+(5.003), (I-339)+(1.038)+(5.004), (I-339)+(1.038)+(5.005), (I-339)+(1.038)+(5.006), (I-339)+(1.038)+(5.007), (I-339)+(1.038)+(5.008), (I-339)+(1.038)+(5.009), (I-339)+(1.038)+(5.010), (I-339)+(1.038)+(5.011), (I-339)+(1.038)+(5.012), (I-339)+(1.038)+(5.013), (I-339)+(1.038)+(5.014), (I-339)+(1.038)+(5.015), (I-339)+(1.038)+(5.016), (I-339)+(1.038)+(5.017), (I-339)+(1.038)+(5.018), (I-339)+(1.038)+(5.019), (I-339)+(1.038)+(5.020), (I-339)+(1.038)+(5.021), (I-339)+(1.038)+(5.022), (I-339)+(1.038)+(5.023), (I-339)+(1.038)+(6.001), (I-339)+(1.038)+(6.002), (I-339)+(1.038)+(6.003), (I-339)+(1.038)+(6.004), (I-339)+(1.038)+(7.001), (I-339)+(1.038)+(7.002), (I-339)+(1.038)+(7.003), (I-339)+(1.038)+(7.004), (I-339)+(1.038)+(7.005), (I-339)+(1.038)+(7.006), (I-339)+(1.038)+(9.001), (I-339)+(1.038)+(9.002), (I-339)+(1.038)+(9.003), (I-339)+(1.038)+(9.004), (I-339)+(1.038)+(9.005), (I-339)+(1.038)+(9.006), (I-339)+(1.038)+(9.007), (I-339)+(1.038)+(9.008), (I-339)+(1.038)+(9.009), (I-339)+(1.038)+(14.001), (I-339)+(1.038)+(14.002), (I-339)+(1.038)+(15.008), (I-339)+(1.038)+(15.011), (I-339)+(1.038)+(15.012), (I-339)+(1.038)+(15.016), (I-339)+(1.038)+(15.025), (I-339)+(1.038)+(15.027), (I-339)+(1.038)+(15.047), (I-339)+(1.038)+(15.063), (I-339)+(1.038)+(15.064), (I-339)+(1.038)+(16.001), (I-339)+(1.038)+(16.002), (I-339)+(1.038)+(16.003), (I-339)+(1.038)+(16.004), (I-339)+(1.038)+(16.005), (I-339)+(1.038)+(16.006), (I-339)+(1.038)+(16.007), (I-339)+(1.038)+(16.008), (I-339)+(1.038)+(17.001), (I-339)+(1.038)+(17.002), (I-339)+(1.038)+(17.003), (I-339)+(1.038)+(17.004), (I-339)+(1.038)+(17.005), (I-339)+(1.038)+(17.006), (I-339)+(1.038)+(17.007), (I-339)+(1.038)+(17.008), (I-339)+(1.038)+(17.009), (I-339)+(1.038)+(17.010), (I-339)+(1.038)+(17.011), (I-339)+(1.038)+(17.012), (I-339)+(1.038)+(18.001), (I-339)+(1.039)+(1.040), (I-339)+(1.039)+(1.041), (I-339)+(1.039)+(1.042), (I-339)+(1.039)+(1.043), (I-339)+(1.039)+(1.044), (I-339)+(1.039)+(1.045), (I-339)+(1.039)+(1.046), (I-339)+(1.039)+(1.047), (I-339)+(1.039)+(1.048), (I-339)+(1.039)+(1.049), (I-339)+(1.039)+(1.050), (I-339)+(1.039)+(1.051), (I-339)+(1.039)+(1.052), (I-339)+(1.039)+(1.053), (I-339)+(1.039)+(1.054), (I-339)+(1.039)+(1.055), (I-339)+(1.039)+(1.056), (I-339)+(1.039)+(1.057), (I-339)+(1.039)+(1.058), (I-339)+(1.039)+(1.059), (I-339)+(1.039)+(1.060), (I-339)+(1.039)+(1.061), (I-339)+(1.039)+(1.062), (I-339)+(1.039)+(1.063), (I-339)+(1.039)+(1.064), (I-339)+(1.039)+(1.065), (I-339)+(1.039)+(1.066), (I-339)+(1.039)+(1.067), (I-339)+(1.039)+(1.068), (I-339)+(1.039)+(1.069), (I-339)+(1.039)+(1.070), (I-339)+(1.039)+(1.071), (I-339)+(1.039)+(1.072), (I-339)+(1.039)+(1.073), (I-339)+(1.039)+(1.074), (I-339)+(1.039)+(1.075), (I-339)+(1.039)+(1.076), (I-339)+(1.039)+(1.077), (I-339)+(1.039)+(1.078), (I-339)+(1.039)+(1.079), (I-339)+(1.039)+(1.080), (I-339)+(1.039)+(1.081), (I-339)+(1.039)+(1.082), (I-339)+(1.039)+(1.083), (I-339)+(1.039)+(1.084), (I-339)+(1.039)+(1.085), (I-339)+(1.039)+(1.086), (I-339)+(1.039)+(1.087), (I-339)+(1.039)+(1.088), (I-339)+(1.039)+(1.089), (I-339)+(1.039)+(1.090), (I-339)+(1.039)+(1.091), (I-339)+(1.039)+(1.092), (I-339)+(1.039)+(2.001), (I-339)+(1.039)+(2.002), (I-339)+(1.039)+(2.003), (I-339)+(1.039)+(2.004), (I-339)+(1.039)+(2.005), (I-339)+(1.039)+(2.006), (I-339)+(1.039)+(2.007), (I-339)+(1.039)+(2.008), (I-339)+(1.039)+(2.009), (I-339)+(1.039)+(2.010), (I-339)+(1.039)+(2.011), (I-339)+(1.039)+(2.012), (I-339)+(1.039)+(2.013), (I-339)+(1.039)+(2.014), (I-339)+(1.039)+(2.015), (I-339)+(1.039)+(2.016), (I-339)+(1.039)+(2.017), (I-339)+(1.039)+(2.018), (I-339)+(1.039)+(2.019), (I-339)+(1.039)+(2.020), (I-339)+(1.039)+(2.021), (I-339)+(1.039)+(2.022), (I-339)+(1.039)+(2.023), (I-339)+(1.039)+(2.024), (I-339)+(1.039)+(2.025), (I-339)+(1.039)+(2.026), (I-339)+(1.039)+(2.027), (I-339)+(1.039)+(2.028), (I-339)+(1.039)+(2.029), (I-339)+(1.039)+(2.030), (I-339)+(1.039)+(2.031), (I-339)+(1.039)+(2.032), (I-339)+(1.039)+(2.033), (I-339)+(1.039)+(2.034), (I-339)+(1.039)+(2.035), (I-339)+(1.039)+(2.036), (I-339)+(1.039)+(2.037), (I-339)+(1.039)+(2.038), (I-339)+(1.039)+(2.039), (I-339)+(1.039)+(2.040), (I-339)+(1.039)+(2.041), (I-339)+(1.039)+(2.042), (I-339)+(1.039)+(2.043), (I-339)+(1.039)+(2.044), (I-339)+(1.039)+(2.045), (I-339)+(1.039)+(2.046), (I-339)+(1.039)+(2.047), (I-339)+(1.039)+(2.048), (I-339)+(1.039)+(2.049), (I-339)+(1.039)+(2.050), (I-339)+(1.039)+(2.051), (I-339)+(1.039)+(2.052), (I-339)+(1.039)+(2.053), (I-339)+(1.039)+(2.054), (I-339)+(1.039)+(2.055), (I-339)+(1.039)+(2.056), (I-339)+(1.039)+(2.057), (I-339)+(1.039)+(2.058), (I-339)+(1.039)+(2.059), (I-339)+(1.039)+(3.001), (I-339)+(1.039)+(3.002), (I-339)+(1.039)+(3.003), (I-339)+(1.039)+(3.004), (I-339)+(1.039)+(3.005), (I-339)+(1.039)+(3.006), (I-339)+(1.039)+(3.007), (I-339)+(1.039)+(3.008), (I-339)+(1.039)+(3.009), (I-339)+(1.039)+(3.010), (I-339)+(1.039)+(3.011), (I-339)+(1.039)+(3.012), (I-339)+(1.039)+(3.013), (I-339)+(1.039)+(3.014), (I-339)+(1.039)+(3.015), (I-339)+(1.039)+(3.016), (I-339)+(1.039)+(3.017), (I-339)+(1.039)+(3.018), (I-339)+(1.039)+(3.019), (I-339)+(1.039)+(3.020), (I-339)+(1.039)+(3.021), (I-339)+(1.039)+(3.022), (I-339)+(1.039)+(3.023), (I-339)+(1.039)+(3.024), (I-339)+(1.039)+(3.025), (I-339)+(1.039)+(3.026), (I-339)+(1.039)+(3.027), (I-339)+(1.039)+(3.028), (I-339)+(1.039)+(3.029), (I-339)+(1.039)+(3.030), (I-339)+(1.039)+(3.031), (I-339)+(1.039)+(5.001), (I-339)+(1.039)+(5.002), (I-339)+(1.039)+(5.003), (I-339)+(1.039)+(5.004), (I-339)+(1.039)+(5.005), (I-339)+(1.039)+(5.006), (I-339)+(1.039)+(5.007), (I-339)+(1.039)+(5.008), (I-339)+(1.039)+(5.009), (I-339)+(1.039)+(5.010), (I-339)+(1.039)+(5.011), (I-339)+(1.039)+(5.012), (I-339)+(1.039)+(5.013), (I-339)+(1.039)+(5.014), (I-339)+(1.039)+(5.015), (I-339)+(1.039)+(5.016), (I-339)+(1.039)+(5.017), (I-339)+(1.039)+(5.018), (I-339)+(1.039)+(5.019), (I-339)+(1.039)+(5.020), (I-339)+(1.039)+(5.021), (I-339)+(1.039)+(5.022), (I-339)+(1.039)+(5.023), (I-339)+(1.039)+(6.001), (I-339)+(1.039)+(6.002), (I-339)+(1.039)+(6.003), (I-339)+(1.039)+(6.004), (I-339)+(1.039)+(7.001), (I-339)+(1.039)+(7.002), (I-339)+(1.039)+(7.003), (I-339)+(1.039)+(7.004), (I-339)+(1.039)+(7.005), (I-339)+(1.039)+(7.006), (I-339)+(1.039)+(9.001), (I-339)+(1.039)+(9.002), (I-339)+(1.039)+(9.003), (I-339)+(1.039)+(9.004), (I-339)+(1.039)+(9.005), (I-339)+(1.039)+(9.006), (I-339)+(1.039)+(9.007), (I-339)+(1.039)+(9.008), (I-339)+(1.039)+(9.009), (I-339)+(1.039)+(14.001), (I-339)+(1.039)+(14.002), (I-339)+(1.039)+(15.008), (I-339)+(1.039)+(15.011), (I-339)+(1.039)+(15.012), (I-339)+(1.039)+(15.016), (I-339)+(1.039)+(15.025), (I-339)+(1.039)+(15.027), (I-339)+(1.039)+(15.047), (I-339)+(1.039)+(15.063), (I-339)+(1.039)+(15.064), (I-339)+(1.039)+(16.001), (I-339)+(1.039)+(16.002), (I-339)+(1.039)+(16.003), (I-339)+(1.039)+(16.004), (I-339)+(1.039)+(16.005), (I-339)+(1.039)+(16.006), (I-339)+(1.039)+(16.007), (I-339)+(1.039)+(16.008), (I-339)+(1.039)+(17.001), (I-339)+(1.039)+(17.002), (I-339)+(1.039)+(17.003), (I-339)+(1.039)+(17.004), (I-339)+(1.039)+(17.005), (I-339)+(1.039)+(17.006), (I-339)+(1.039)+(17.007), (I-339)+(1.039)+(17.008), (I-339)+(1.039)+(17.009), (I-339)+(1.039)+(17.010), (I-339)+(1.039)+(17.011), (I-339)+(1.039)+(17.012), (I-339)+(1.039)+(18.001), (I-339)+(1.040)+(1.041), (I-339)+(1.040)+(1.042), (I-339)+(1.040)+(1.043), (I-339)+(1.040)+(1.044), (I-339)+(1.040)+(1.045), (I-339)+(1.040)+(1.046), (I-339)+(1.040)+(1.047), (I-339)+(1.040)+(1.048), (I-339)+(1.040)+(1.049), (I-339)+(1.040)+(1.050), (I-339)+(1.040)+(1.051), (I-339)+(1.040)+(1.052), (I-339)+(1.040)+(1.053), (I-339)+(1.040)+(1.054), (I-339)+(1.040)+(1.055), (I-339)+(1.040)+(1.056), (I-339)+(1.040)+(1.057), (I-339)+(1.040)+(1.058), (I-339)+(1.040)+(1.059), (I-339)+(1.040)+(1.060), (I-339)+(1.040)+(1.061), (I-339)+(1.040)+(1.062), (I-339)+(1.040)+(1.063), (I-339)+(1.040)+(1.064), (I-339)+(1.040)+(1.065), (I-339)+(1.040)+(1.066), (I-339)+(1.040)+(1.067), (I-339)+(1.040)+(1.068), (I-339)+(1.040)+(1.069), (I-339)+(1.040)+(1.070), (I-339)+(1.040)+(1.071), (I-339)+(1.040)+(1.072), (I-339)+(1.040)+(1.073), (I-339)+(1.040)+(1.074), (I-339)+(1.040)+(1.075), (I-339)+(1.040)+(1.076), (I-339)+(1.040)+(1.077), (I-339)+(1.040)+(1.078), (I-339)+(1.040)+(1.079), (I-339)+(1.040)+(1.080), (I-339)+(1.040)+(1.081), (I-339)+(1.040)+(1.082), (I-339)+(1.040)+(1.083), (I-339)+(1.040)+(1.084), (I-339)+(1.040)+(1.085), (I-339)+(1.040)+(1.086), (I-339)+(1.040)+(1.087), (I-339)+(1.040)+(1.088), (I-339)+(1.040)+(1.089), (I-339)+(1.040)+(1.090), (I-339)+(1.040)+(1.091), (I-339)+(1.040)+(1.092), (I-339)+(1.040)+(2.001), (I-339)+(1.040)+(2.002), (I-339)+(1.040)+(2.003), (I-339)+(1.040)+(2.004), (I-339)+(1.040)+(2.005), (I-339)+(1.040)+(2.006), (I-339)+(1.040)+(2.007), (I-339)+(1.040)+(2.008), (I-339)+(1.040)+(2.009), (I-339)+(1.040)+(2.010), (I-339)+(1.040)+(2.011), (I-339)+(1.040)+(2.012), (I-339)+(1.040)+(2.013), (I-339)+(1.040)+(2.014), (I-339)+(1.040)+(2.015), (I-339)+(1.040)+(2.016), (I-339)+(1.040)+(2.017), (I-339)+(1.040)+(2.018), (I-339)+(1.040)+(2.019), (I-339)+(1.040)+(2.020), (I-339)+(1.040)+(2.021), (I-339)+(1.040)+(2.022), (I-339)+(1.040)+(2.023), (I-339)+(1.040)+(2.024), (I-339)+(1.040)+(2.025), (I-339)+(1.040)+(2.026), (I-339)+(1.040)+(2.027), (I-339)+(1.040)+(2.028), (I-339)+(1.040)+(2.029), (I-339)+(1.040)+(2.030), (I-339)+(1.040)+(2.031), (I-339)+(1.040)+(2.032), (I-339)+(1.040)+(2.033), (I-339)+(1.040)+(2.034), (I-339)+(1.040)+(2.035), (I-339)+(1.040)+(2.036), (I-339)+(1.040)+(2.037), (I-339)+(1.040)+(2.038), (I-339)+(1.040)+(2.039), (I-339)+(1.040)+(2.040), (I-339)+(1.040)+(2.041), (I-339)+(1.040)+(2.042), (I-339)+(1.040)+(2.043), (I-339)+(1.040)+(2.044), (I-339)+(1.040)+(2.045), (I-339)+(1.040)+(2.046), (I-339)+(1.040)+(2.047), (I-339)+(1.040)+(2.048), (I-339)+(1.040)+(2.049), (I-339)+(1.040)+(2.050), (I-339)+(1.040)+(2.051), (I-339)+(1.040)+(2.052), (I-339)+(1.040)+(2.053), (I-339)+(1.040)+(2.054), (I-339)+(1.040)+(2.055), (I-339)+(1.040)+(2.056), (I-339)+(1.040)+(2.057), (I-339)+(1.040)+(2.058), (I-339)+(1.040)+(2.059), (I-339)+(1.040)+(3.001), (I-339)+(1.040)+(3.002), (I-339)+(1.040)+(3.003), (I-339)+(1.040)+(3.004), (I-339)+(1.040)+(3.005), (I-339)+(1.040)+(3.006), (I-339)+(1.040)+(3.007), (I-339)+(1.040)+(3.008), (I-339)+(1.040)+(3.009), (I-339)+(1.040)+(3.010), (I-339)+(1.040)+(3.011), (I-339)+(1.040)+(3.012), (I-339)+(1.040)+(3.013), (I-339)+(1.040)+(3.014), (I-339)+(1.040)+(3.015), (I-339)+(1.040)+(3.016), (I-339)+(1.040)+(3.017), (I-339)+(1.040)+(3.018), (I-339)+(1.040)+(3.019), (I-339)+(1.040)+(3.020), (I-339)+(1.040)+(3.021), (I-339)+(1.040)+(3.022), (I-339)+(1.040)+(3.023), (I-339)+(1.040)+(3.024), (I-339)+(1.040)+(3.025), (I-339)+(1.040)+(3.026), (I-339)+(1.040)+(3.027), (I-339)+(1.040)+(3.028), (I-339)+(1.040)+(3.029), (I-339)+(1.040)+(3.030), (I-339)+(1.040)+(3.031), (I-339)+(1.040)+(5.001), (I-339)+(1.040)+(5.002), (I-339)+(1.040)+(5.003), (I-339)+(1.040)+(5.004), (I-339)+(1.040)+(5.005), (I-339)+(1.040)+(5.006), (I-339)+(1.040)+(5.007), (I-339)+(1.040)+(5.008), (I-339)+(1.040)+(5.009), (I-339)+(1.040)+(5.010), (I-339)+(1.040)+(5.011), (I-339)+(1.040)+(5.012), (I-339)+(1.040)+(5.013), (I-339)+(1.040)+(5.014), (I-339)+(1.040)+(5.015), (I-339)+(1.040)+(5.016), (I-339)+(1.040)+(5.017), (I-339)+(1.040)+(5.018), (I-339)+(1.040)+(5.019), (I-339)+(1.040)+(5.020), (I-339)+(1.040)+(5.021), (I-339)+(1.040)+(5.022), (I-339)+(1.040)+(5.023), (I-339)+(1.040)+(6.001), (I-339)+(1.040)+(6.002), (I-339)+(1.040)+(6.003), (I-339)+(1.040)+(6.004), (I-339)+(1.040)+(7.001), (I-339)+(1.040)+(7.002), (I-339)+(1.040)+(7.003), (I-339)+(1.040)+(7.004), (I-339)+(1.040)+(7.005), (I-339)+(1.040)+(7.006), (I-339)+(1.040)+(9.001), (I-339)+(1.040)+(9.002), (I-339)+(1.040)+(9.003), (I-339)+(1.040)+(9.004), (I-339)+(1.040)+(9.005), (I-339)+(1.040)+(9.006), (I-339)+(1.040)+(9.007), (I-339)+(1.040)+(9.008), (I-339)+(1.040)+(9.009), (I-339)+(1.040)+(14.001), (I-339)+(1.040)+(14.002), (I-339)+(1.040)+(15.008), (I-339)+(1.040)+(15.011), (I-339)+(1.040)+(15.012), (I-339)+(1.040)+(15.016), (I-339)+(1.040)+(15.025), (I-339)+(1.040)+(15.027), (I-339)+(1.040)+(15.047), (I-339)+(1.040)+(15.063), (I-339)+(1.040)+(15.064), (I-339)+(1.040)+(16.001), (I-339)+(1.040)+(16.002), (I-339)+(1.040)+(16.003), (I-339)+(1.040)+(16.004), (I-339)+(1.040)+(16.005), (I-339)+(1.040)+(16.006), (I-339)+(1.040)+(16.007), (I-339)+(1.040)+(16.008), (I-339)+(1.040)+(17.001), (I-339)+(1.040)+(17.002), (I-339)+(1.040)+(17.003), (I-339)+(1.040)+(17.004), (I-339)+(1.040)+(17.005), (I-339)+(1.040)+(17.006), (I-339)+(1.040)+(17.007), (I-339)+(1.040)+(17.008), (I-339)+(1.040)+(17.009), (I-339)+(1.040)+(17.010), (I-339)+(1.040)+(17.011), (I-339)+(1.040)+(17.012), (I-339)+(1.040)+(18.001), (I-339)+(1.041)+(1.042), (I-339)+(1.041)+(1.043), (I-339)+(1.041)+(1.044), (I-339)+(1.041)+(1.045), (I-339)+(1.041)+(1.046), (I-339)+(1.041)+(1.047), (I-339)+(1.041)+(1.048), (I-339)+(1.041)+(1.049), (I-339)+(1.041)+(1.050), (I-339)+(1.041)+(1.051), (I-339)+(1.041)+(1.052), (I-339)+(1.041)+(1.053), (I-339)+(1.041)+(1.054), (I-339)+(1.041)+(1.055), (I-339)+(1.041)+(1.056), (I-339)+(1.041)+(1.057), (I-339)+(1.041)+(1.058), (I-339)+(1.041)+(1.059), (I-339)+(1.041)+(1.060), (I-339)+(1.041)+(1.061), (I-339)+(1.041)+(1.062), (I-339)+(1.041)+(1.063), (I-339)+(1.041)+(1.064), (I-339)+(1.041)+(1.065), (I-339)+(1.041)+(1.066), (I-339)+(1.041)+(1.067), (I-339)+(1.041)+(1.068), (I-339)+(1.041)+(1.069), (I-339)+(1.041)+(1.070), (I-339)+(1.041)+(1.071), (I-339)+(1.041)+(1.072), (I-339)+(1.041)+(1.073), (I-339)+(1.041)+(1.074), (I-339)+(1.041)+(1.075), (I-339)+(1.041)+(1.076), (I-339)+(1.041)+(1.077), (I-339)+(1.041)+(1.078), (I-339)+(1.041)+(1.079), (I-339)+(1.041)+(1.080), (I-339)+(1.041)+(1.081), (I-339)+(1.041)+(1.082), (I-339)+(1.041)+(1.083), (I-339)+(1.041)+(1.084), (I-339)+(1.041)+(1.085), (I-339)+(1.041)+(1.086), (I-339)+(1.041)+(1.087), (I-339)+(1.041)+(1.088), (I-339)+(1.041)+(1.089), (I-339)+(1.041)+(1.090), (I-339)+(1.041)+(1.091), (I-339)+(1.041)+(1.092), (I-339)+(1.041)+(2.001), (I-339)+(1.041)+(2.002), (I-339)+(1.041)+(2.003), (I-339)+(1.041)+(2.004), (I-339)+(1.041)+(2.005), (I-339)+(1.041)+(2.006), (I-339)+(1.041)+(2.007), (I-339)+(1.041)+(2.008), (I-339)+(1.041)+(2.009), (I-339)+(1.041)+(2.010), (I-339)+(1.041)+(2.011), (I-339)+(1.041)+(2.012), (I-339)+(1.041)+(2.013), (I-339)+(1.041)+(2.014), (I-339)+(1.041)+(2.015), (I-339)+(1.041)+(2.016), (I-339)+(1.041)+(2.017), (I-339)+(1.041)+(2.018), (I-339)+(1.041)+(2.019), (I-339)+(1.041)+(2.020), (I-339)+(1.041)+(2.021), (I-339)+(1.041)+(2.022), (I-339)+(1.041)+(2.023), (I-339)+(1.041)+(2.024), (I-339)+(1.041)+(2.025), (I-339)+(1.041)+(2.026), (I-339)+(1.041)+(2.027), (I-339)+(1.041)+(2.028), (I-339)+(1.041)+(2.029), (I-339)+(1.041)+(2.030), (I-339)+(1.041)+(2.031), (I-339)+(1.041)+(2.032), (I-339)+(1.041)+(2.033), (I-339)+(1.041)+(2.034), (I-339)+(1.041)+(2.035), (I-339)+(1.041)+(2.036), (I-339)+(1.041)+(2.037), (I-339)+(1.041)+(2.038), (I-339)+(1.041)+(2.039), (I-339)+(1.041)+(2.040), (I-339)+(1.041)+(2.041), (I-339)+(1.041)+(2.042), (I-339)+(1.041)+(2.043), (I-339)+(1.041)+(2.044), (I-339)+(1.041)+(2.045), (I-339)+(1.041)+(2.046), (I-339)+(1.041)+(2.047), (I-339)+(1.041)+(2.048), (I-339)+(1.041)+(2.049), (I-339)+(1.041)+(2.050), (I-339)+(1.041)+(2.051), (I-339)+(1.041)+(2.052), (I-339)+(1.041)+(2.053), (I-339)+(1.041)+(2.054), (I-339)+(1.041)+(2.055), (I-339)+(1.041)+(2.056), (I-339)+(1.041)+(2.057), (I-339)+(1.041)+(2.058), (I-339)+(1.041)+(2.059), (I-339)+(1.041)+(3.001), (I-339)+(1.041)+(3.002), (I-339)+(1.041)+(3.003), (I-339)+(1.041)+(3.004), (I-339)+(1.041)+(3.005), (I-339)+(1.041)+(3.006), (I-339)+(1.041)+(3.007), (I-339)+(1.041)+(3.008), (I-339)+(1.041)+(3.009), (I-339)+(1.041)+(3.010), (I-339)+(1.041)+(3.011), (I-339)+(1.041)+(3.012), (I-339)+(1.041)+(3.013), (I-339)+(1.041)+(3.014), (I-339)+(1.041)+(3.015), (I-339)+(1.041)+(3.016), (I-339)+(1.041)+(3.017), (I-339)+(1.041)+(3.018), (I-339)+(1.041)+(3.019), (I-339)+(1.041)+(3.020), (I-339)+(1.041)+(3.021), (I-339)+(1.041)+(3.022), (I-339)+(1.041)+(3.023), (I-339)+(1.041)+(3.024), (I-339)+(1.041)+(3.025), (I-339)+(1.041)+(3.026), (I-339)+(1.041)+(3.027), (I-339)+(1.041)+(3.028), (I-339)+(1.041)+(3.029), (I-339)+(1.041)+(3.030), (I-339)+(1.041)+(3.031), (I-339)+(1.041)+(5.001), (I-339)+(1.041)+(5.002), (I-339)+(1.041)+(5.003), (I-339)+(1.041)+(5.004), (I-339)+(1.041)+(5.005), (I-339)+(1.041)+(5.006), (I-339)+(1.041)+(5.007), (I-339)+(1.041)+(5.008), (I-339)+(1.041)+(5.009), (I-339)+(1.041)+(5.010), (I-339)+(1.041)+(5.011), (I-339)+(1.041)+(5.012), (I-339)+(1.041)+(5.013), (I-339)+(1.041)+(5.014), (I-339)+(1.041)+(5.015), (I-339)+(1.041)+(5.016), (I-339)+(1.041)+(5.017), (I-339)+(1.041)+(5.018), (I-339)+(1.041)+(5.019), (I-339)+(1.041)+(5.020), (I-339)+(1.041)+(5.021), (I-339)+(1.041)+(5.022), (I-339)+(1.041)+(5.023), (I-339)+(1.041)+(6.001), (I-339)+(1.041)+(6.002), (I-339)+(1.041)+(6.003), (I-339)+(1.041)+(6.004), (I-339)+(1.041)+(7.001), (I-339)+(1.041)+(7.002), (I-339)+(1.041)+(7.003), (I-339)+(1.041)+(7.004), (I-339)+(1.041)+(7.005), (I-339)+(1.041)+(7.006), (I-339)+(1.041)+(9.001), (I-339)+(1.041)+(9.002), (I-339)+(1.041)+(9.003), (I-339)+(1.041)+(9.004), (I-339)+(1.041)+(9.005), (I-339)+(1.041)+(9.006), (I-339)+(1.041)+(9.007), (I-339)+(1.041)+(9.008), (I-339)+(1.041)+(9.009), (I-339)+(1.041)+(14.001), (I-339)+(1.041)+(14.002), (I-339)+(1.041)+(15.008), (I-339)+(1.041)+(15.011), (I-339)+(1.041)+(15.012), (I-339)+(1.041)+(15.016), (I-339)+(1.041)+(15.025), (I-339)+(1.041)+(15.027), (I-339)+(1.041)+(15.047), (I-339)+(1.041)+(15.063), (I-339)+(1.041)+(15.064), (I-339)+(1.041)+(16.001), (I-339)+(1.041)+(16.002), (I-339)+(1.041)+(16.003), (I-339)+(1.041)+(16.004), (I-339)+(1.041)+(16.005), (I-339)+(1.041)+(16.006), (I-339)+(1.041)+(16.007), (I-339)+(1.041)+(16.008), (I-339)+(1.041)+(17.001), (I-339)+(1.041)+(17.002), (I-339)+(1.041)+(17.003), (I-339)+(1.041)+(17.004), (I-339)+(1.041)+(17.005), (I-339)+(1.041)+(17.006), (I-339)+(1.041)+(17.007), (I-339)+(1.041)+(17.008), (I-339)+(1.041)+(17.009), (I-339)+(1.041)+(17.010), (I-339)+(1.041)+(17.011), (I-339)+(1.041)+(17.012), (I-339)+(1.041)+(18.001), (I-339)+(1.042)+(1.043), (I-339)+(1.042)+(1.044), (I-339)+(1.042)+(1.045), (I-339)+(1.042)+(1.046), (I-339)+(1.042)+(1.047), (I-339)+(1.042)+(1.048), (I-339)+(1.042)+(1.049), (I-339)+(1.042)+(1.050), (I-339)+(1.042)+(1.051), (I-339)+(1.042)+(1.052), (I-339)+(1.042)+(1.053), (I-339)+(1.042)+(1.054), (I-339)+(1.042)+(1.055), (I-339)+(1.042)+(1.056), (I-339)+(1.042)+(1.057), (I-339)+(1.042)+(1.058), (I-339)+(1.042)+(1.059), (I-339)+(1.042)+(1.060), (I-339)+(1.042)+(1.061), (I-339)+(1.042)+(1.062), (I-339)+(1.042)+(1.063), (I-339)+(1.042)+(1.064), (I-339)+(1.042)+(1.065), (I-339)+(1.042)+(1.066), (I-339)+(1.042)+(1.067), (I-339)+(1.042)+(1.068), (I-339)+(1.042)+(1.069), (I-339)+(1.042)+(1.070), (I-339)+(1.042)+(1.071), (I-339)+(1.042)+(1.072), (I-339)+(1.042)+(1.073), (I-339)+(1.042)+(1.074), (I-339)+(1.042)+(1.075), (I-339)+(1.042)+(1.076), (I-339)+(1.042)+(1.077), (I-339)+(1.042)+(1.078), (I-339)+(1.042)+(1.079), (I-339)+(1.042)+(1.080), (I-339)+(1.042)+(1.081), (I-339)+(1.042)+(1.082), (I-339)+(1.042)+(1.083), (I-339)+(1.042)+(1.084), (I-339)+(1.042)+(1.085), (I-339)+(1.042)+(1.086), (I-339)+(1.042)+(1.087), (I-339)+(1.042)+(1.088), (I-339)+(1.042)+(1.089), (I-339)+(1.042)+(1.090), (I-339)+(1.042)+(1.091), (I-339)+(1.042)+(1.092), (I-339)+(1.042)+(2.001), (I-339)+(1.042)+(2.002), (I-339)+(1.042)+(2.003), (I-339)+(1.042)+(2.004), (I-339)+(1.042)+(2.005), (I-339)+(1.042)+(2.006), (I-339)+(1.042)+(2.007), (I-339)+(1.042)+(2.008), (I-339)+(1.042)+(2.009), (I-339)+(1.042)+(2.010), (I-339)+(1.042)+(2.011), (I-339)+(1.042)+(2.012), (I-339)+(1.042)+(2.013), (I-339)+(1.042)+(2.014), (I-339)+(1.042)+(2.015), (I-339)+(1.042)+(2.016), (I-339)+(1.042)+(2.017), (I-339)+(1.042)+(2.018), (I-339)+(1.042)+(2.019), (I-339)+(1.042)+(2.020), (I-339)+(1.042)+(2.021), (I-339)+(1.042)+(2.022), (I-339)+(1.042)+(2.023), (I-339)+(1.042)+(2.024), (I-339)+(1.042)+(2.025), (I-339)+(1.042)+(2.026), (I-339)+(1.042)+(2.027), (I-339)+(1.042)+(2.028), (I-339)+(1.042)+(2.029), (I-339)+(1.042)+(2.030), (I-339)+(1.042)+(2.031), (I-339)+(1.042)+(2.032), (I-339)+(1.042)+(2.033), (I-339)+(1.042)+(2.034), (I-339)+(1.042)+(2.035), (I-339)+(1.042)+(2.036), (I-339)+(1.042)+(2.037), (I-339)+(1.042)+(2.038), (I-339)+(1.042)+(2.039), (I-339)+(1.042)+(2.040), (I-339)+(1.042)+(2.041), (I-339)+(1.042)+(2.042), (I-339)+(1.042)+(2.043), (I-339)+(1.042)+(2.044), (I-339)+(1.042)+(2.045), (I-339)+(1.042)+(2.046), (I-339)+(1.042)+(2.047), (I-339)+(1.042)+(2.048), (I-339)+(1.042)+(2.049), (I-339)+(1.042)+(2.050), (I-339)+(1.042)+(2.051), (I-339)+(1.042)+(2.052), (I-339)+(1.042)+(2.053), (I-339)+(1.042)+(2.054), (I-339)+(1.042)+(2.055), (I-339)+(1.042)+(2.056), (I-339)+(1.042)+(2.057), (I-339)+(1.042)+(2.058), (I-339)+(1.042)+(2.059), (I-339)+(1.042)+(3.001), (I-339)+(1.042)+(3.002), (I-339)+(1.042)+(3.003), (I-339)+(1.042)+(3.004), (I-339)+(1.042)+(3.005), (I-339)+(1.042)+(3.006), (I-339)+(1.042)+(3.007), (I-339)+(1.042)+(3.008), (I-339)+(1.042)+(3.009), (I-339)+(1.042)+(3.010), (I-339)+(1.042)+(3.011), (I-339)+(1.042)+(3.012), (I-339)+(1.042)+(3.013), (I-339)+(1.042)+(3.014), (I-339)+(1.042)+(3.015), (I-339)+(1.042)+(3.016), (I-339)+(1.042)+(3.017), (I-339)+(1.042)+(3.018), (I-339)+(1.042)+(3.019), (I-339)+(1.042)+(3.020), (I-339)+(1.042)+(3.021), (I-339)+(1.042)+(3.022), (I-339)+(1.042)+(3.023), (I-339)+(1.042)+(3.024), (I-339)+(1.042)+(3.025), (I-339)+(1.042)+(3.026), (I-339)+(1.042)+(3.027), (I-339)+(1.042)+(3.028), (I-339)+(1.042)+(3.029), (I-339)+(1.042)+(3.030), (I-339)+(1.042)+(3.031), (I-339)+(1.042)+(5.001), (I-339)+(1.042)+(5.002), (I-339)+(1.042)+(5.003), (I-339)+(1.042)+(5.004), (I-339)+(1.042)+(5.005), (I-339)+(1.042)+(5.006), (I-339)+(1.042)+(5.007), (I-339)+(1.042)+(5.008), (I-339)+(1.042)+(5.009), (I-339)+(1.042)+(5.010), (I-339)+(1.042)+(5.011), (I-339)+(1.042)+(5.012), (I-339)+(1.042)+(5.013), (I-339)+(1.042)+(5.014), (I-339)+(1.042)+(5.015), (I-339)+(1.042)+(5.016), (I-339)+(1.042)+(5.017), (I-339)+(1.042)+(5.018), (I-339)+(1.042)+(5.019), (I-339)+(1.042)+(5.020), (I-339)+(1.042)+(5.021), (I-339)+(1.042)+(5.022), (I-339)+(1.042)+(5.023), (I-339)+(1.042)+(6.001), (I-339)+(1.042)+(6.002), (I-339)+(1.042)+(6.003), (I-339)+(1.042)+(6.004), (I-339)+(1.042)+(7.001), (I-339)+(1.042)+(7.002), (I-339)+(1.042)+(7.003), (I-339)+(1.042)+(7.004), (I-339)+(1.042)+(7.005), (I-339)+(1.042)+(7.006), (I-339)+(1.042)+(9.001), (I-339)+(1.042)+(9.002), (I-339)+(1.042)+(9.003), (I-339)+(1.042)+(9.004), (I-339)+(1.042)+(9.005), (I-339)+(1.042)+(9.006), (I-339)+(1.042)+(9.007), (I-339)+(1.042)+(9.008), (I-339)+(1.042)+(9.009), (I-339)+(1.042)+(14.001), (I-339)+(1.042)+(14.002), (I-339)+(1.042)+(15.008), (I-339)+(1.042)+(15.011), (I-339)+(1.042)+(15.012), (I-339)+(1.042)+(15.016), (I-339)+(1.042)+(15.025), (I-339)+(1.042)+(15.027), (I-339)+(1.042)+(15.047), (I-339)+(1.042)+(15.063), (I-339)+(1.042)+(15.064), (I-339)+(1.042)+(16.001), (I-339)+(1.042)+(16.002), (I-339)+(1.042)+(16.003), (I-339)+(1.042)+(16.004), (I-339)+(1.042)+(16.005), (I-339)+(1.042)+(16.006), (I-339)+(1.042)+(16.007), (I-339)+(1.042)+(16.008), (I-339)+(1.042)+(17.001), (I-339)+(1.042)+(17.002), (I-339)+(1.042)+(17.003), (I-339)+(1.042)+(17.004), (I-339)+(1.042)+(17.005), (I-339)+(1.042)+(17.006), (I-339)+(1.042)+(17.007), (I-339)+(1.042)+(17.008), (I-339)+(1.042)+(17.009), (I-339)+(1.042)+(17.010), (I-339)+(1.042)+(17.011), (I-339)+(1.042)+(17.012), (I-339)+(1.042)+(18.001), (I-339)+(1.043)+(1.044), (I-339)+(1.043)+(1.045), (I-339)+(1.043)+(1.046), (I-339)+(1.043)+(1.047), (I-339)+(1.043)+(1.048), (I-339)+(1.043)+(1.049), (I-339)+(1.043)+(1.050), (I-339)+(1.043)+(1.051), (I-339)+(1.043)+(1.052), (I-339)+(1.043)+(1.053), (I-339)+(1.043)+(1.054), (I-339)+(1.043)+(1.055), (I-339)+(1.043)+(1.056), (I-339)+(1.043)+(1.057), (I-339)+(1.043)+(1.058), (I-339)+(1.043)+(1.059), (I-339)+(1.043)+(1.060), (I-339)+(1.043)+(1.061), (I-339)+(1.043)+(1.062), (I-339)+(1.043)+(1.063), (I-339)+(1.043)+(1.064), (I-339)+(1.043)+(1.065), (I-339)+(1.043)+(1.066), (I-339)+(1.043)+(1.067), (I-339)+(1.043)+(1.068), (I-339)+(1.043)+(1.069), (I-339)+(1.043)+(1.070), (I-339)+(1.043)+(1.071), (I-339)+(1.043)+(1.072), (I-339)+(1.043)+(1.073), (I-339)+(1.043)+(1.074), (I-339)+(1.043)+(1.075), (I-339)+(1.043)+(1.076), (I-339)+(1.043)+(1.077), (I-339)+(1.043)+(1.078), (I-339)+(1.043)+(1.079), (I-339)+(1.043)+(1.080), (I-339)+(1.043)+(1.081), (I-339)+(1.043)+(1.082), (I-339)+(1.043)+(1.083), (I-339)+(1.043)+(1.084), (I-339)+(1.043)+(1.085), (I-339)+(1.043)+(1.086), (I-339)+(1.043)+(1.087), (I-339)+(1.043)+(1.088), (I-339)+(1.043)+(1.089), (I-339)+(1.043)+(1.090), (I-339)+(1.043)+(1.091), (I-339)+(1.043)+(1.092), (I-339)+(1.043)+(2.001), (I-339)+(1.043)+(2.002), (I-339)+(1.043)+(2.003), (I-339)+(1.043)+(2.004), (I-339)+(1.043)+(2.005), (I-339)+(1.043)+(2.006), (I-339)+(1.043)+(2.007), (I-339)+(1.043)+(2.008), (I-339)+(1.043)+(2.009), (I-339)+(1.043)+(2.010), (I-339)+(1.043)+(2.011), (I-339)+(1.043)+(2.012), (I-339)+(1.043)+(2.013), (I-339)+(1.043)+(2.014), (I-339)+(1.043)+(2.015), (I-339)+(1.043)+(2.016), (I-339)+(1.043)+(2.017), (I-339)+(1.043)+(2.018), (I-339)+(1.043)+(2.019), (I-339)+(1.043)+(2.020), (I-339)+(1.043)+(2.021), (I-339)+(1.043)+(2.022), (I-339)+(1.043)+(2.023), (I-339)+(1.043)+(2.024), (I-339)+(1.043)+(2.025), (I-339)+(1.043)+(2.026), (I-339)+(1.043)+(2.027), (I-339)+(1.043)+(2.028), (I-339)+(1.043)+(2.029), (I-339)+(1.043)+(2.030), (I-339)+(1.043)+(2.031), (I-339)+(1.043)+(2.032), (I-339)+(1.043)+(2.033), (I-339)+(1.043)+(2.034), (I-339)+(1.043)+(2.035), (I-339)+(1.043)+(2.036), (I-339)+(1.043)+(2.037), (I-339)+(1.043)+(2.038), (I-339)+(1.043)+(2.039), (I-339)+(1.043)+(2.040), (I-339)+(1.043)+(2.041), (I-339)+(1.043)+(2.042), (I-339)+(1.043)+(2.043), (I-339)+(1.043)+(2.044), (I-339)+(1.043)+(2.045), (I-339)+(1.043)+(2.046), (I-339)+(1.043)+(2.047), (I-339)+(1.043)+(2.048), (I-339)+(1.043)+(2.049), (I-339)+(1.043)+(2.050), (I-339)+(1.043)+(2.051), (I-339)+(1.043)+(2.052), (I-339)+(1.043)+(2.053), (I-339)+(1.043)+(2.054), (I-339)+(1.043)+(2.055), (I-339)+(1.043)+(2.056), (I-339)+(1.043)+(2.057), (I-339)+(1.043)+(2.058), (I-339)+(1.043)+(2.059), (I-339)+(1.043)+(3.001), (I-339)+(1.043)+(3.002), (I-339)+(1.043)+(3.003), (I-339)+(1.043)+(3.004), (I-339)+(1.043)+(3.005), (I-339)+(1.043)+(3.006), (I-339)+(1.043)+(3.007), (I-339)+(1.043)+(3.008), (I-339)+(1.043)+(3.009), (I-339)+(1.043)+(3.010), (I-339)+(1.043)+(3.011), (I-339)+(1.043)+(3.012), (I-339)+(1.043)+(3.013), (I-339)+(1.043)+(3.014), (I-339)+(1.043)+(3.015), (I-339)+(1.043)+(3.016), (I-339)+(1.043)+(3.017), (I-339)+(1.043)+(3.018), (I-339)+(1.043)+(3.019), (I-339)+(1.043)+(3.020), (I-339)+(1.043)+(3.021), (I-339)+(1.043)+(3.022), (I-339)+(1.043)+(3.023), (I-339)+(1.043)+(3.024), (I-339)+(1.043)+(3.025), (I-339)+(1.043)+(3.026), (I-339)+(1.043)+(3.027), (I-339)+(1.043)+(3.028), (I-339)+(1.043)+(3.029), (I-339)+(1.043)+(3.030), (I-339)+(1.043)+(3.031), (I-339)+(1.043)+(5.001), (I-339)+(1.043)+(5.002), (I-339)+(1.043)+(5.003), (I-339)+(1.043)+(5.004), (I-339)+(1.043)+(5.005), (I-339)+(1.043)+(5.006), (I-339)+(1.043)+(5.007), (I-339)+(1.043)+(5.008), (I-339)+(1.043)+(5.009), (I-339)+(1.043)+(5.010), (I-339)+(1.043)+(5.011), (I-339)+(1.043)+(5.012), (I-339)+(1.043)+(5.013), (I-339)+(1.043)+(5.014), (I-339)+(1.043)+(5.015), (I-339)+(1.043)+(5.016), (I-339)+(1.043)+(5.017), (I-339)+(1.043)+(5.018), (I-339)+(1.043)+(5.019), (I-339)+(1.043)+(5.020), (I-339)+(1.043)+(5.021), (I-339)+(1.043)+(5.022), (I-339)+(1.043)+(5.023), (I-339)+(1.043)+(6.001), (I-339)+(1.043)+(6.002), (I-339)+(1.043)+(6.003), (I-339)+(1.043)+(6.004), (I-339)+(1.043)+(7.001), (I-339)+(1.043)+(7.002), (I-339)+(1.043)+(7.003), (I-339)+(1.043)+(7.004), (I-339)+(1.043)+(7.005), (I-339)+(1.043)+(7.006), (I-339)+(1.043)+(9.001), (I-339)+(1.043)+(9.002), (I-339)+(1.043)+(9.003), (I-339)+(1.043)+(9.004), (I-339)+(1.043)+(9.005), (I-339)+(1.043)+(9.006), (I-339)+(1.043)+(9.007), (I-339)+(1.043)+(9.008), (I-339)+(1.043)+(9.009), (I-339)+(1.043)+(14.001), (I-339)+(1.043)+(14.002), (I-339)+(1.043)+(15.008), (I-339)+(1.043)+(15.011), (I-339)+(1.043)+(15.012), (I-339)+(1.043)+(15.016), (I-339)+(1.043)+(15.025), (I-339)+(1.043)+(15.027), (I-339)+(1.043)+(15.047), (I-339)+(1.043)+(15.063), (I-339)+(1.043)+(15.064), (I-339)+(1.043)+(16.001), (I-339)+(1.043)+(16.002), (I-339)+(1.043)+(16.003), (I-339)+(1.043)+(16.004), (I-339)+(1.043)+(16.005), (I-339)+(1.043)+(16.006), (I-339)+(1.043)+(16.007), (I-339)+(1.043)+(16.008), (I-339)+(1.043)+(17.001), (I-339)+(1.043)+(17.002), (I-339)+(1.043)+(17.003), (I-339)+(1.043)+(17.004), (I-339)+(1.043)+(17.005), (I-339)+(1.043)+(17.006), (I-339)+(1.043)+(17.007), (I-339)+(1.043)+(17.008), (I-339)+(1.043)+(17.009), (I-339)+(1.043)+(17.010), (I-339)+(1.043)+(17.011), (I-339)+(1.043)+(17.012), (I-339)+(1.043)+(18.001), (I-339)+(1.044)+(1.045), (I-339)+(1.044)+(1.046), (I-339)+(1.044)+(1.047), (I-339)+(1.044)+(1.048), (I-339)+(1.044)+(1.049), (I-339)+(1.044)+(1.050), (I-339)+(1.044)+(1.051), (I-339)+(1.044)+(1.052), (I-339)+(1.044)+(1.053), (I-339)+(1.044)+(1.054), (I-339)+(1.044)+(1.055), (I-339)+(1.044)+(1.056), (I-339)+(1.044)+(1.057), (I-339)+(1.044)+(1.058), (I-339)+(1.044)+(1.059), (I-339)+(1.044)+(1.060), (I-339)+(1.044)+(1.061), (I-339)+(1.044)+(1.062), (I-339)+(1.044)+(1.063), (I-339)+(1.044)+(1.064), (I-339)+(1.044)+(1.065), (I-339)+(1.044)+(1.066), (I-339)+(1.044)+(1.067), (I-339)+(1.044)+(1.068), (I-339)+(1.044)+(1.069), (I-339)+(1.044)+(1.070), (I-339)+(1.044)+(1.071), (I-339)+(1.044)+(1.072), (I-339)+(1.044)+(1.073), (I-339)+(1.044)+(1.074), (I-339)+(1.044)+(1.075), (I-339)+(1.044)+(1.076), (I-339)+(1.044)+(1.077), (I-339)+(1.044)+(1.078), (I-339)+(1.044)+(1.079), (I-339)+(1.044)+(1.080), (I-339)+(1.044)+(1.081), (I-339)+(1.044)+(1.082), (I-339)+(1.044)+(1.083), (I-339)+(1.044)+(1.084), (I-339)+(1.044)+(1.085), (I-339)+(1.044)+(1.086), (I-339)+(1.044)+(1.087), (I-339)+(1.044)+(1.088), (I-339)+(1.044)+(1.089), (I-339)+(1.044)+(1.090), (I-339)+(1.044)+(1.091), (I-339)+(1.044)+(1.092), (I-339)+(1.044)+(2.001), (I-339)+(1.044)+(2.002), (I-339)+(1.044)+(2.003), (I-339)+(1.044)+(2.004), (I-339)+(1.044)+(2.005), (I-339)+(1.044)+(2.006), (I-339)+(1.044)+(2.007), (I-339)+(1.044)+(2.008), (I-339)+(1.044)+(2.009), (I-339)+(1.044)+(2.010), (I-339)+(1.044)+(2.011), (I-339)+(1.044)+(2.012), (I-339)+(1.044)+(2.013), (I-339)+(1.044)+(2.014), (I-339)+(1.044)+(2.015), (I-339)+(1.044)+(2.016), (I-339)+(1.044)+(2.017), (I-339)+(1.044)+(2.018), (I-339)+(1.044)+(2.019), (I-339)+(1.044)+(2.020), (I-339)+(1.044)+(2.021), (I-339)+(1.044)+(2.022), (I-339)+(1.044)+(2.023), (I-339)+(1.044)+(2.024), (I-339)+(1.044)+(2.025), (I-339)+(1.044)+(2.026), (I-339)+(1.044)+(2.027), (I-339)+(1.044)+(2.028), (I-339)+(1.044)+(2.029), (I-339)+(1.044)+(2.030), (I-339)+(1.044)+(2.031), (I-339)+(1.044)+(2.032), (I-339)+(1.044)+(2.033), (I-339)+(1.044)+(2.034), (I-339)+(1.044)+(2.035), (I-339)+(1.044)+(2.036), (I-339)+(1.044)+(2.037), (I-339)+(1.044)+(2.038), (I-339)+(1.044)+(2.039), (I-339)+(1.044)+(2.040), (I-339)+(1.044)+(2.041), (I-339)+(1.044)+(2.042), (I-339)+(1.044)+(2.043), (I-339)+(1.044)+(2.044), (I-339)+(1.044)+(2.045), (I-339)+(1.044)+(2.046), (I-339)+(1.044)+(2.047), (I-339)+(1.044)+(2.048), (I-339)+(1.044)+(2.049), (I-339)+(1.044)+(2.050), (I-339)+(1.044)+(2.051), (I-339)+(1.044)+(2.052), (I-339)+(1.044)+(2.053), (I-339)+(1.044)+(2.054), (I-339)+(1.044)+(2.055), (I-339)+(1.044)+(2.056), (I-339)+(1.044)+(2.057), (I-339)+(1.044)+(2.058), (I-339)+(1.044)+(2.059), (I-339)+(1.044)+(3.001), (I-339)+(1.044)+(3.002), (I-339)+(1.044)+(3.003), (I-339)+(1.044)+(3.004), (I-339)+(1.044)+(3.005), (I-339)+(1.044)+(3.006), (I-339)+(1.044)+(3.007), (I-339)+(1.044)+(3.008), (I-339)+(1.044)+(3.009), (I-339)+(1.044)+(3.010), (I-339)+(1.044)+(3.011), (I-339)+(1.044)+(3.012), (I-339)+(1.044)+(3.013), (I-339)+(1.044)+(3.014), (I-339)+(1.044)+(3.015), (I-339)+(1.044)+(3.016), (I-339)+(1.044)+(3.017), (I-339)+(1.044)+(3.018), (I-339)+(1.044)+(3.019), (I-339)+(1.044)+(3.020), (I-339)+(1.044)+(3.021), (I-339)+(1.044)+(3.022), (I-339)+(1.044)+(3.023), (I-339)+(1.044)+(3.024), (I-339)+(1.044)+(3.025), (I-339)+(1.044)+(3.026), (I-339)+(1.044)+(3.027), (I-339)+(1.044)+(3.028), (I-339)+(1.044)+(3.029), (I-339)+(1.044)+(3.030), (I-339)+(1.044)+(3.031), (I-339)+(1.044)+(5.001), (I-339)+(1.044)+(5.002), (I-339)+(1.044)+(5.003), (I-339)+(1.044)+(5.004), (I-339)+(1.044)+(5.005), (I-339)+(1.044)+(5.006), (I-339)+(1.044)+(5.007), (I-339)+(1.044)+(5.008), (I-339)+(1.044)+(5.009), (I-339)+(1.044)+(5.010), (I-339)+(1.044)+(5.011), (I-339)+(1.044)+(5.012), (I-339)+(1.044)+(5.013), (I-339)+(1.044)+(5.014), (I-339)+(1.044)+(5.015), (I-339)+(1.044)+(5.016), (I-339)+(1.044)+(5.017), (I-339)+(1.044)+(5.018), (I-339)+(1.044)+(5.019), (I-339)+(1.044)+(5.020), (I-339)+(1.044)+(5.021), (I-339)+(1.044)+(5.022), (I-339)+(1.044)+(5.023), (I-339)+(1.044)+(6.001), (I-339)+(1.044)+(6.002), (I-339)+(1.044)+(6.003), (I-339)+(1.044)+(6.004), (I-339)+(1.044)+(7.001), (I-339)+(1.044)+(7.002), (I-339)+(1.044)+(7.003), (I-339)+(1.044)+(7.004), (I-339)+(1.044)+(7.005), (I-339)+(1.044)+(7.006), (I-339)+(1.044)+(9.001), (I-339)+(1.044)+(9.002), (I-339)+(1.044)+(9.003), (I-339)+(1.044)+(9.004), (I-339)+(1.044)+(9.005), (I-339)+(1.044)+(9.006), (I-339)+(1.044)+(9.007), (I-339)+(1.044)+(9.008), (I-339)+(1.044)+(9.009), (I-339)+(1.044)+(14.001), (I-339)+(1.044)+(14.002), (I-339)+(1.044)+(15.008), (I-339)+(1.044)+(15.011), (I-339)+(1.044)+(15.012), (I-339)+(1.044)+(15.016), (I-339)+(1.044)+(15.025), (I-339)+(1.044)+(15.027), (I-339)+(1.044)+(15.047), (I-339)+(1.044)+(15.063), (I-339)+(1.044)+(15.064), (I-339)+(1.044)+(16.001), (I-339)+(1.044)+(16.002), (I-339)+(1.044)+(16.003), (I-339)+(1.044)+(16.004), (I-339)+(1.044)+(16.005), (I-339)+(1.044)+(16.006), (I-339)+(1.044)+(16.007), (I-339)+(1.044)+(16.008), (I-339)+(1.044)+(17.001), (I-339)+(1.044)+(17.002), (I-339)+(1.044)+(17.003), (I-339)+(1.044)+(17.004), (I-339)+(1.044)+(17.005), (I-339)+(1.044)+(17.006), (I-339)+(1.044)+(17.007), (I-339)+(1.044)+(17.008), (I-339)+(1.044)+(17.009), (I-339)+(1.044)+(17.010), (I-339)+(1.044)+(17.011), (I-339)+(1.044)+(17.012), (I-339)+(1.044)+(18.001), (I-339)+(1.045)+(1.046), (I-339)+(1.045)+(1.047), (I-339)+(1.045)+(1.048), (I-339)+(1.045)+(1.049), (I-339)+(1.045)+(1.050), (I-339)+(1.045)+(1.051), (I-339)+(1.045)+(1.052), (I-339)+(1.045)+(1.053), (I-339)+(1.045)+(1.054), (I-339)+(1.045)+(1.055), (I-339)+(1.045)+(1.056), (I-339)+(1.045)+(1.057), (I-339)+(1.045)+(1.058), (I-339)+(1.045)+(1.059), (I-339)+(1.045)+(1.060), (I-339)+(1.045)+(1.061), (I-339)+(1.045)+(1.062), (I-339)+(1.045)+(1.063), (I-339)+(1.045)+(1.064), (I-339)+(1.045)+(1.065), (I-339)+(1.045)+(1.066), (I-339)+(1.045)+(1.067), (I-339)+(1.045)+(1.068), (I-339)+(1.045)+(1.069), (I-339)+(1.045)+(1.070), (I-339)+(1.045)+(1.071), (I-339)+(1.045)+(1.072), (I-339)+(1.045)+(1.073), (I-339)+(1.045)+(1.074), (I-339)+(1.045)+(1.075), (I-339)+(1.045)+(1.076), (I-339)+(1.045)+(1.077), (I-339)+(1.045)+(1.078), (I-339)+(1.045)+(1.079), (I-339)+(1.045)+(1.080), (I-339)+(1.045)+(1.081), (I-339)+(1.045)+(1.082), (I-339)+(1.045)+(1.083), (I-339)+(1.045)+(1.084), (I-339)+(1.045)+(1.085), (I-339)+(1.045)+(1.086), (I-339)+(1.045)+(1.087), (I-339)+(1.045)+(1.088), (I-339)+(1.045)+(1.089), (I-339)+(1.045)+(1.090), (I-339)+(1.045)+(1.091), (I-339)+(1.045)+(1.092), (I-339)+(1.045)+(2.001), (I-339)+(1.045)+(2.002), (I-339)+(1.045)+(2.003), (I-339)+(1.045)+(2.004), (I-339)+(1.045)+(2.005), (I-339)+(1.045)+(2.006), (I-339)+(1.045)+(2.007), (I-339)+(1.045)+(2.008), (I-339)+(1.045)+(2.009), (I-339)+(1.045)+(2.010), (I-339)+(1.045)+(2.011), (I-339)+(1.045)+(2.012), (I-339)+(1.045)+(2.013), (I-339)+(1.045)+(2.014), (I-339)+(1.045)+(2.015), (I-339)+(1.045)+(2.016), (I-339)+(1.045)+(2.017), (I-339)+(1.045)+(2.018), (I-339)+(1.045)+(2.019), (I-339)+(1.045)+(2.020), (I-339)+(1.045)+(2.021), (I-339)+(1.045)+(2.022), (I-339)+(1.045)+(2.023), (I-339)+(1.045)+(2.024), (I-339)+(1.045)+(2.025), (I-339)+(1.045)+(2.026), (I-339)+(1.045)+(2.027), (I-339)+(1.045)+(2.028), (I-339)+(1.045)+(2.029), (I-339)+(1.045)+(2.030), (I-339)+(1.045)+(2.031), (I-339)+(1.045)+(2.032), (I-339)+(1.045)+(2.033), (I-339)+(1.045)+(2.034), (I-339)+(1.045)+(2.035), (I-339)+(1.045)+(2.036), (I-339)+(1.045)+(2.037), (I-339)+(1.045)+(2.038), (I-339)+(1.045)+(2.039), (I-339)+(1.045)+(2.040), (I-339)+(1.045)+(2.041), (I-339)+(1.045)+(2.042), (I-339)+(1.045)+(2.043), (I-339)+(1.045)+(2.044), (I-339)+(1.045)+(2.045), (I-339)+(1.045)+(2.046), (I-339)+(1.045)+(2.047), (I-339)+(1.045)+(2.048), (I-339)+(1.045)+(2.049), (I-339)+(1.045)+(2.050), (I-339)+(1.045)+(2.051), (I-339)+(1.045)+(2.052), (I-339)+(1.045)+(2.053), (I-339)+(1.045)+(2.054), (I-339)+(1.045)+(2.055), (I-339)+(1.045)+(2.056), (I-339)+(1.045)+(2.057), (I-339)+(1.045)+(2.058), (I-339)+(1.045)+(2.059), (I-339)+(1.045)+(3.001), (I-339)+(1.045)+(3.002), (I-339)+(1.045)+(3.003), (I-339)+(1.045)+(3.004), (I-339)+(1.045)+(3.005), (I-339)+(1.045)+(3.006), (I-339)+(1.045)+(3.007), (I-339)+(1.045)+(3.008), (I-339)+(1.045)+(3.009), (I-339)+(1.045)+(3.010), (I-339)+(1.045)+(3.011), (I-339)+(1.045)+(3.012), (I-339)+(1.045)+(3.013), (I-339)+(1.045)+(3.014), (I-339)+(1.045)+(3.015), (I-339)+(1.045)+(3.016), (I-339)+(1.045)+(3.017), (I-339)+(1.045)+(3.018), (I-339)+(1.045)+(3.019), (I-339)+(1.045)+(3.020), (I-339)+(1.045)+(3.021), (I-339)+(1.045)+(3.022), (I-339)+(1.045)+(3.023), (I-339)+(1.045)+(3.024), (I-339)+(1.045)+(3.025), (I-339)+(1.045)+(3.026), (I-339)+(1.045)+(3.027), (I-339)+(1.045)+(3.028), (I-339)+(1.045)+(3.029), (I-339)+(1.045)+(3.030), (I-339)+(1.045)+(3.031), (I-339)+(1.045)+(5.001), (I-339)+(1.045)+(5.002), (I-339)+(1.045)+(5.003), (I-339)+(1.045)+(5.004), (I-339)+(1.045)+(5.005), (I-339)+(1.045)+(5.006), (I-339)+(1.045)+(5.007), (I-339)+(1.045)+(5.008), (I-339)+(1.045)+(5.009), (I-339)+(1.045)+(5.010), (I-339)+(1.045)+(5.011), (I-339)+(1.045)+(5.012), (I-339)+(1.045)+(5.013), (I-339)+(1.045)+(5.014), (I-339)+(1.045)+(5.015), (I-339)+(1.045)+(5.016), (I-339)+(1.045)+(5.017), (I-339)+(1.045)+(5.018), (I-339)+(1.045)+(5.019), (I-339)+(1.045)+(5.020), (I-339)+(1.045)+(5.021), (I-339)+(1.045)+(5.022), (I-339)+(1.045)+(5.023), (I-339)+(1.045)+(6.001), (I-339)+(1.045)+(6.002), (I-339)+(1.045)+(6.003), (I-339)+(1.045)+(6.004), (I-339)+(1.045)+(7.001), (I-339)+(1.045)+(7.002), (I-339)+(1.045)+(7.003), (I-339)+(1.045)+(7.004), (I-339)+(1.045)+(7.005), (I-339)+(1.045)+(7.006), (I-339)+(1.045)+(9.001), (I-339)+(1.045)+(9.002), (I-339)+(1.045)+(9.003), (I-339)+(1.045)+(9.004), (I-339)+(1.045)+(9.005), (I-339)+(1.045)+(9.006), (I-339)+(1.045)+(9.007), (I-339)+(1.045)+(9.008), (I-339)+(1.045)+(9.009), (I-339)+(1.045)+(14.001), (I-339)+(1.045)+(14.002), (I-339)+(1.045)+(15.008), (I-339)+(1.045)+(15.011), (I-339)+(1.045)+(15.012), (I-339)+(1.045)+(15.016), (I-339)+(1.045)+(15.025), (I-339)+(1.045)+(15.027), (I-339)+(1.045)+(15.047), (I-339)+(1.045)+(15.063), (I-339)+(1.045)+(15.064), (I-339)+(1.045)+(16.001), (I-339)+(1.045)+(16.002), (I-339)+(1.045)+(16.003), (I-339)+(1.045)+(16.004), (I-339)+(1.045)+(16.005), (I-339)+(1.045)+(16.006), (I-339)+(1.045)+(16.007), (I-339)+(1.045)+(16.008), (I-339)+(1.045)+(17.001), (I-339)+(1.045)+(17.002), (I-339)+(1.045)+(17.003), (I-339)+(1.045)+(17.004), (I-339)+(1.045)+(17.005), (I-339)+(1.045)+(17.006), (I-339)+(1.045)+(17.007), (I-339)+(1.045)+(17.008), (I-339)+(1.045)+(17.009), (I-339)+(1.045)+(17.010), (I-339)+(1.045)+(17.011), (I-339)+(1.045)+(17.012), (I-339)+(1.045)+(18.001), (I-339)+(1.046)+(1.047), (I-339)+(1.046)+(1.048), (I-339)+(1.046)+(1.049), (I-339)+(1.046)+(1.050), (I-339)+(1.046)+(1.051), (I-339)+(1.046)+(1.052), (I-339)+(1.046)+(1.053), (I-339)+(1.046)+(1.054), (I-339)+(1.046)+(1.055), (I-339)+(1.046)+(1.056), (I-339)+(1.046)+(1.057), (I-339)+(1.046)+(1.058), (I-339)+(1.046)+(1.059), (I-339)+(1.046)+(1.060), (I-339)+(1.046)+(1.061), (I-339)+(1.046)+(1.062), (I-339)+(1.046)+(1.063), (I-339)+(1.046)+(1.064), (I-339)+(1.046)+(1.065), (I-339)+(1.046)+(1.066), (I-339)+(1.046)+(1.067), (I-339)+(1.046)+(1.068), (I-339)+(1.046)+(1.069), (I-339)+(1.046)+(1.070), (I-339)+(1.046)+(1.071), (I-339)+(1.046)+(1.072), (I-339)+(1.046)+(1.073), (I-339)+(1.046)+(1.074), (I-339)+(1.046)+(1.075), (I-339)+(1.046)+(1.076), (I-339)+(1.046)+(1.077), (I-339)+(1.046)+(1.078), (I-339)+(1.046)+(1.079), (I-339)+(1.046)+(1.080), (I-339)+(1.046)+(1.081), (I-339)+(1.046)+(1.082), (I-339)+(1.046)+(1.083), (I-339)+(1.046)+(1.084), (I-339)+(1.046)+(1.085), (I-339)+(1.046)+(1.086), (I-339)+(1.046)+(1.087), (I-339)+(1.046)+(1.088), (I-339)+(1.046)+(1.089), (I-339)+(1.046)+(1.090), (I-339)+(1.046)+(1.091), (I-339)+(1.046)+(1.092), (I-339)+(1.046)+(2.001), (I-339)+(1.046)+(2.002), (I-339)+(1.046)+(2.003), (I-339)+(1.046)+(2.004), (I-339)+(1.046)+(2.005), (I-339)+(1.046)+(2.006), (I-339)+(1.046)+(2.007), (I-339)+(1.046)+(2.008), (I-339)+(1.046)+(2.009), (I-339)+(1.046)+(2.010), (I-339)+(1.046)+(2.011), (I-339)+(1.046)+(2.012), (I-339)+(1.046)+(2.013), (I-339)+(1.046)+(2.014), (I-339)+(1.046)+(2.015), (I-339)+(1.046)+(2.016), (I-339)+(1.046)+(2.017), (I-339)+(1.046)+(2.018), (I-339)+(1.046)+(2.019), (I-339)+(1.046)+(2.020), (I-339)+(1.046)+(2.021), (I-339)+(1.046)+(2.022), (I-339)+(1.046)+(2.023), (I-339)+(1.046)+(2.024), (I-339)+(1.046)+(2.025), (I-339)+(1.046)+(2.026), (I-339)+(1.046)+(2.027), (I-339)+(1.046)+(2.028), (I-339)+(1.046)+(2.029), (I-339)+(1.046)+(2.030), (I-339)+(1.046)+(2.031), (I-339)+(1.046)+(2.032), (I-339)+(1.046)+(2.033), (I-339)+(1.046)+(2.034), (I-339)+(1.046)+(2.035), (I-339)+(1.046)+(2.036), (I-339)+(1.046)+(2.037), (I-339)+(1.046)+(2.038), (I-339)+(1.046)+(2.039), (I-339)+(1.046)+(2.040), (I-339)+(1.046)+(2.041), (I-339)+(1.046)+(2.042), (I-339)+(1.046)+(2.043), (I-339)+(1.046)+(2.044), (I-339)+(1.046)+(2.045), (I-339)+(1.046)+(2.046), (I-339)+(1.046)+(2.047), (I-339)+(1.046)+(2.048), (I-339)+(1.046)+(2.049), (I-339)+(1.046)+(2.050), (I-339)+(1.046)+(2.051), (I-339)+(1.046)+(2.052), (I-339)+(1.046)+(2.053), (I-339)+(1.046)+(2.054), (I-339)+(1.046)+(2.055), (I-339)+(1.046)+(2.056), (I-339)+(1.046)+(2.057), (I-339)+(1.046)+(2.058), (I-339)+(1.046)+(2.059), (I-339)+(1.046)+(3.001), (I-339)+(1.046)+(3.002), (I-339)+(1.046)+(3.003), (I-339)+(1.046)+(3.004), (I-339)+(1.046)+(3.005), (I-339)+(1.046)+(3.006), (I-339)+(1.046)+(3.007), (I-339)+(1.046)+(3.008), (I-339)+(1.046)+(3.009), (I-339)+(1.046)+(3.010), (I-339)+(1.046)+(3.011), (I-339)+(1.046)+(3.012), (I-339)+(1.046)+(3.013), (I-339)+(1.046)+(3.014), (I-339)+(1.046)+(3.015), (I-339)+(1.046)+(3.016), (I-339)+(1.046)+(3.017), (I-339)+(1.046)+(3.018), (I-339)+(1.046)+(3.019), (I-339)+(1.046)+(3.020), (I-339)+(1.046)+(3.021), (I-339)+(1.046)+(3.022), (I-339)+(1.046)+(3.023), (I-339)+(1.046)+(3.024), (I-339)+(1.046)+(3.025), (I-339)+(1.046)+(3.026), (I-339)+(1.046)+(3.027), (I-339)+(1.046)+(3.028), (I-339)+(1.046)+(3.029), (I-339)+(1.046)+(3.030), (I-339)+(1.046)+(3.031), (I-339)+(1.046)+(5.001), (I-339)+(1.046)+(5.002), (I-339)+(1.046)+(5.003), (I-339)+(1.046)+(5.004), (I-339)+(1.046)+(5.005), (I-339)+(1.046)+(5.006), (I-339)+(1.046)+(5.007), (I-339)+(1.046)+(5.008), (I-339)+(1.046)+(5.009), (I-339)+(1.046)+(5.010), (I-339)+(1.046)+(5.011), (I-339)+(1.046)+(5.012), (I-339)+(1.046)+(5.013), (I-339)+(1.046)+(5.014), (I-339)+(1.046)+(5.015), (I-339)+(1.046)+(5.016), (I-339)+(1.046)+(5.017), (I-339)+(1.046)+(5.018), (I-339)+(1.046)+(5.019), (I-339)+(1.046)+(5.020), (I-339)+(1.046)+(5.021), (I-339)+(1.046)+(5.022), (I-339)+(1.046)+(5.023), (I-339)+(1.046)+(6.001), (I-339)+(1.046)+(6.002), (I-339)+(1.046)+(6.003), (I-339)+(1.046)+(6.004), (I-339)+(1.046)+(7.001), (I-339)+(1.046)+(7.002), (I-339)+(1.046)+(7.003), (I-339)+(1.046)+(7.004), (I-339)+(1.046)+(7.005), (I-339)+(1.046)+(7.006), (I-339)+(1.046)+(9.001), (I-339)+(1.046)+(9.002), (I-339)+(1.046)+(9.003), (I-339)+(1.046)+(9.004), (I-339)+(1.046)+(9.005), (I-339)+(1.046)+(9.006), (I-339)+(1.046)+(9.007), (I-339)+(1.046)+(9.008), (I-339)+(1.046)+(9.009), (I-339)+(1.046)+(14.001), (I-339)+(1.046)+(14.002), (I-339)+(1.046)+(15.008), (I-339)+(1.046)+(15.011), (I-339)+(1.046)+(15.012), (I-339)+(1.046)+(15.016), (I-339)+(1.046)+(15.025), (I-339)+(1.046)+(15.027), (I-339)+(1.046)+(15.047), (I-339)+(1.046)+(15.063), (I-339)+(1.046)+(15.064), (I-339)+(1.046)+(16.001), (I-339)+(1.046)+(16.002), (I-339)+(1.046)+(16.003), (I-339)+(1.046)+(16.004), (I-339)+(1.046)+(16.005), (I-339)+(1.046)+(16.006), (I-339)+(1.046)+(16.007), (I-339)+(1.046)+(16.008), (I-339)+(1.046)+(17.001), (I-339)+(1.046)+(17.002), (I-339)+(1.046)+(17.003), (I-339)+(1.046)+(17.004), (I-339)+(1.046)+(17.005), (I-339)+(1.046)+(17.006), (I-339)+(1.046)+(17.007), (I-339)+(1.046)+(17.008), (I-339)+(1.046)+(17.009), (I-339)+(1.046)+(17.010), (I-339)+(1.046)+(17.011), (I-339)+(1.046)+(17.012), (I-339)+(1.046)+(18.001), (I-339)+(1.047)+(1.048), (I-339)+(1.047)+(1.049), (I-339)+(1.047)+(1.050), (I-339)+(1.047)+(1.051), (I-339)+(1.047)+(1.052), (I-339)+(1.047)+(1.053), (I-339)+(1.047)+(1.054), (I-339)+(1.047)+(1.055), (I-339)+(1.047)+(1.056), (I-339)+(1.047)+(1.057), (I-339)+(1.047)+(1.058), (I-339)+(1.047)+(1.059), (I-339)+(1.047)+(1.060), (I-339)+(1.047)+(1.061), (I-339)+(1.047)+(1.062), (I-339)+(1.047)+(1.063), (I-339)+(1.047)+(1.064), (I-339)+(1.047)+(1.065), (I-339)+(1.047)+(1.066), (I-339)+(1.047)+(1.067), (I-339)+(1.047)+(1.068), (I-339)+(1.047)+(1.069), (I-339)+(1.047)+(1.070), (I-339)+(1.047)+(1.071), (I-339)+(1.047)+(1.072), (I-339)+(1.047)+(1.073), (I-339)+(1.047)+(1.074), (I-339)+(1.047)+(1.075), (I-339)+(1.047)+(1.076), (I-339)+(1.047)+(1.077), (I-339)+(1.047)+(1.078), (I-339)+(1.047)+(1.079), (I-339)+(1.047)+(1.080), (I-339)+(1.047)+(1.081), (I-339)+(1.047)+(1.082), (I-339)+(1.047)+(1.083), (I-339)+(1.047)+(1.084), (I-339)+(1.047)+(1.085), (I-339)+(1.047)+(1.086), (I-339)+(1.047)+(1.087), (I-339)+(1.047)+(1.088), (I-339)+(1.047)+(1.089), (I-339)+(1.047)+(1.090), (I-339)+(1.047)+(1.091), (I-339)+(1.047)+(1.092), (I-339)+(1.047)+(2.001), (I-339)+(1.047)+(2.002), (I-339)+(1.047)+(2.003), (I-339)+(1.047)+(2.004), (I-339)+(1.047)+(2.005), (I-339)+(1.047)+(2.006), (I-339)+(1.047)+(2.007), (I-339)+(1.047)+(2.008), (I-339)+(1.047)+(2.009), (I-339)+(1.047)+(2.010), (I-339)+(1.047)+(2.011), (I-339)+(1.047)+(2.012), (I-339)+(1.047)+(2.013), (I-339)+(1.047)+(2.014), (I-339)+(1.047)+(2.015), (I-339)+(1.047)+(2.016), (I-339)+(1.047)+(2.017), (I-339)+(1.047)+(2.018), (I-339)+(1.047)+(2.019), (I-339)+(1.047)+(2.020), (I-339)+(1.047)+(2.021), (I-339)+(1.047)+(2.022), (I-339)+(1.047)+(2.023), (I-339)+(1.047)+(2.024), (I-339)+(1.047)+(2.025), (I-339)+(1.047)+(2.026), (I-339)+(1.047)+(2.027), (I-339)+(1.047)+(2.028), (I-339)+(1.047)+(2.029), (I-339)+(1.047)+(2.030), (I-339)+(1.047)+(2.031), (I-339)+(1.047)+(2.032), (I-339)+(1.047)+(2.033), (I-339)+(1.047)+(2.034), (I-339)+(1.047)+(2.035), (I-339)+(1.047)+(2.036), (I-339)+(1.047)+(2.037), (I-339)+(1.047)+(2.038), (I-339)+(1.047)+(2.039), (I-339)+(1.047)+(2.040), (I-339)+(1.047)+(2.041), (I-339)+(1.047)+(2.042), (I-339)+(1.047)+(2.043), (I-339)+(1.047)+(2.044), (I-339)+(1.047)+(2.045), (I-339)+(1.047)+(2.046), (I-339)+(1.047)+(2.047), (I-339)+(1.047)+(2.048), (I-339)+(1.047)+(2.049), (I-339)+(1.047)+(2.050), (I-339)+(1.047)+(2.051), (I-339)+(1.047)+(2.052), (I-339)+(1.047)+(2.053), (I-339)+(1.047)+(2.054), (I-339)+(1.047)+(2.055), (I-339)+(1.047)+(2.056), (I-339)+(1.047)+(2.057), (I-339)+(1.047)+(2.058), (I-339)+(1.047)+(2.059), (I-339)+(1.047)+(3.001), (I-339)+(1.047)+(3.002), (I-339)+(1.047)+(3.003), (I-339)+(1.047)+(3.004), (I-339)+(1.047)+(3.005), (I-339)+(1.047)+(3.006), (I-339)+(1.047)+(3.007), (I-339)+(1.047)+(3.008), (I-339)+(1.047)+(3.009), (I-339)+(1.047)+(3.010), (I-339)+(1.047)+(3.011), (I-339)+(1.047)+(3.012), (I-339)+(1.047)+(3.013), (I-339)+(1.047)+(3.014), (I-339)+(1.047)+(3.015), (I-339)+(1.047)+(3.016), (I-339)+(1.047)+(3.017), (I-339)+(1.047)+(3.018), (I-339)+(1.047)+(3.019), (I-339)+(1.047)+(3.020), (I-339)+(1.047)+(3.021), (I-339)+(1.047)+(3.022), (I-339)+(1.047)+(3.023), (I-339)+(1.047)+(3.024), (I-339)+(1.047)+(3.025), (I-339)+(1.047)+(3.026), (I-339)+(1.047)+(3.027), (I-339)+(1.047)+(3.028), (I-339)+(1.047)+(3.029), (I-339)+(1.047)+(3.030), (I-339)+(1.047)+(3.031), (I-339)+(1.047)+(5.001), (I-339)+(1.047)+(5.002), (I-339)+(1.047)+(5.003), (I-339)+(1.047)+(5.004), (I-339)+(1.047)+(5.005), (I-339)+(1.047)+(5.006), (I-339)+(1.047)+(5.007), (I-339)+(1.047)+(5.008), (I-339)+(1.047)+(5.009), (I-339)+(1.047)+(5.010), (I-339)+(1.047)+(5.011), (I-339)+(1.047)+(5.012), (I-339)+(1.047)+(5.013), (I-339)+(1.047)+(5.014), (I-339)+(1.047)+(5.015), (I-339)+(1.047)+(5.016), (I-339)+(1.047)+(5.017), (I-339)+(1.047)+(5.018), (I-339)+(1.047)+(5.019), (I-339)+(1.047)+(5.020), (I-339)+(1.047)+(5.021), (I-339)+(1.047)+(5.022), (I-339)+(1.047)+(5.023), (I-339)+(1.047)+(6.001), (I-339)+(1.047)+(6.002), (I-339)+(1.047)+(6.003), (I-339)+(1.047)+(6.004), (I-339)+(1.047)+(7.001), (I-339)+(1.047)+(7.002), (I-339)+(1.047)+(7.003), (I-339)+(1.047)+(7.004), (I-339)+(1.047)+(7.005), (I-339)+(1.047)+(7.006), (I-339)+(1.047)+(9.001), (I-339)+(1.047)+(9.002), (I-339)+(1.047)+(9.003), (I-339)+(1.047)+(9.004), (I-339)+(1.047)+(9.005), (I-339)+(1.047)+(9.006), (I-339)+(1.047)+(9.007), (I-339)+(1.047)+(9.008), (I-339)+(1.047)+(9.009), (I-339)+(1.047)+(14.001), (I-339)+(1.047)+(14.002), (I-339)+(1.047)+(15.008), (I-339)+(1.047)+(15.011), (I-339)+(1.047)+(15.012), (I-339)+(1.047)+(15.016), (I-339)+(1.047)+(15.025), (I-339)+(1.047)+(15.027), (I-339)+(1.047)+(15.047), (I-339)+(1.047)+(15.063), (I-339)+(1.047)+(15.064), (I-339)+(1.047)+(16.001), (I-339)+(1.047)+(16.002), (I-339)+(1.047)+(16.003), (I-339)+(1.047)+(16.004), (I-339)+(1.047)+(16.005), (I-339)+(1.047)+(16.006), (I-339)+(1.047)+(16.007), (I-339)+(1.047)+(16.008), (I-339)+(1.047)+(17.001), (I-339)+(1.047)+(17.002), (I-339)+(1.047)+(17.003), (I-339)+(1.047)+(17.004), (I-339)+(1.047)+(17.005), (I-339)+(1.047)+(17.006), (I-339)+(1.047)+(17.007), (I-339)+(1.047)+(17.008), (I-339)+(1.047)+(17.009), (I-339)+(1.047)+(17.010), (I-339)+(1.047)+(17.011), (I-339)+(1.047)+(17.012), (I-339)+(1.047)+(18.001), (I-339)+(1.048)+(1.049), (I-339)+(1.048)+(1.050), (I-339)+(1.048)+(1.051), (I-339)+(1.048)+(1.052), (I-339)+(1.048)+(1.053), (I-339)+(1.048)+(1.054), (I-339)+(1.048)+(1.055), (I-339)+(1.048)+(1.056), (I-339)+(1.048)+(1.057), (I-339)+(1.048)+(1.058), (I-339)+(1.048)+(1.059), (I-339)+(1.048)+(1.060), (I-339)+(1.048)+(1.061), (I-339)+(1.048)+(1.062), (I-339)+(1.048)+(1.063), (I-339)+(1.048)+(1.064), (I-339)+(1.048)+(1.065), (I-339)+(1.048)+(1.066), (I-339)+(1.048)+(1.067), (I-339)+(1.048)+(1.068), (I-339)+(1.048)+(1.069), (I-339)+(1.048)+(1.070), (I-339)+(1.048)+(1.071), (I-339)+(1.048)+(1.072), (I-339)+(1.048)+(1.073), (I-339)+(1.048)+(1.074), (I-339)+(1.048)+(1.075), (I-339)+(1.048)+(1.076), (I-339)+(1.048)+(1.077), (I-339)+(1.048)+(1.078), (I-339)+(1.048)+(1.079), (I-339)+(1.048)+(1.080), (I-339)+(1.048)+(1.081), (I-339)+(1.048)+(1.082), (I-339)+(1.048)+(1.083), (I-339)+(1.048)+(1.084), (I-339)+(1.048)+(1.085), (I-339)+(1.048)+(1.086), (I-339)+(1.048)+(1.087), (I-339)+(1.048)+(1.088), (I-339)+(1.048)+(1.089), (I-339)+(1.048)+(1.090), (I-339)+(1.048)+(1.091), (I-339)+(1.048)+(1.092), (I-339)+(1.048)+(2.001), (I-339)+(1.048)+(2.002), (I-339)+(1.048)+(2.003), (I-339)+(1.048)+(2.004), (I-339)+(1.048)+(2.005), (I-339)+(1.048)+(2.006), (I-339)+(1.048)+(2.007), (I-339)+(1.048)+(2.008), (I-339)+(1.048)+(2.009), (I-339)+(1.048)+(2.010), (I-339)+(1.048)+(2.011), (I-339)+(1.048)+(2.012), (I-339)+(1.048)+(2.013), (I-339)+(1.048)+(2.014), (I-339)+(1.048)+(2.015), (I-339)+(1.048)+(2.016), (I-339)+(1.048)+(2.017), (I-339)+(1.048)+(2.018), (I-339)+(1.048)+(2.019), (I-339)+(1.048)+(2.020), (I-339)+(1.048)+(2.021), (I-339)+(1.048)+(2.022), (I-339)+(1.048)+(2.023), (I-339)+(1.048)+(2.024), (I-339)+(1.048)+(2.025), (I-339)+(1.048)+(2.026), (I-339)+(1.048)+(2.027), (I-339)+(1.048)+(2.028), (I-339)+(1.048)+(2.029), (I-339)+(1.048)+(2.030), (I-339)+(1.048)+(2.031), (I-339)+(1.048)+(2.032), (I-339)+(1.048)+(2.033), (I-339)+(1.048)+(2.034), (I-339)+(1.048)+(2.035), (I-339)+(1.048)+(2.036), (I-339)+(1.048)+(2.037), (I-339)+(1.048)+(2.038), (I-339)+(1.048)+(2.039), (I-339)+(1.048)+(2.040), (I-339)+(1.048)+(2.041), (I-339)+(1.048)+(2.042), (I-339)+(1.048)+(2.043), (I-339)+(1.048)+(2.044), (I-339)+(1.048)+(2.045), (I-339)+(1.048)+(2.046), (I-339)+(1.048)+(2.047), (I-339)+(1.048)+(2.048), (I-339)+(1.048)+(2.049), (I-339)+(1.048)+(2.050), (I-339)+(1.048)+(2.051), (I-339)+(1.048)+(2.052), (I-339)+(1.048)+(2.053), (I-339)+(1.048)+(2.054), (I-339)+(1.048)+(2.055), (I-339)+(1.048)+(2.056), (I-339)+(1.048)+(2.057), (I-339)+(1.048)+(2.058), (I-339)+(1.048)+(2.059), (I-339)+(1.048)+(3.001), (I-339)+(1.048)+(3.002), (I-339)+(1.048)+(3.003), (I-339)+(1.048)+(3.004), (I-339)+(1.048)+(3.005), (I-339)+(1.048)+(3.006), (I-339)+(1.048)+(3.007), (I-339)+(1.048)+(3.008), (I-339)+(1.048)+(3.009), (I-339)+(1.048)+(3.010), (I-339)+(1.048)+(3.011), (I-339)+(1.048)+(3.012), (I-339)+(1.048)+(3.013), (I-339)+(1.048)+(3.014), (I-339)+(1.048)+(3.015), (I-339)+(1.048)+(3.016), (I-339)+(1.048)+(3.017), (I-339)+(1.048)+(3.018), (I-339)+(1.048)+(3.019), (I-339)+(1.048)+(3.020), (I-339)+(1.048)+(3.021), (I-339)+(1.048)+(3.022), (I-339)+(1.048)+(3.023), (I-339)+(1.048)+(3.024), (I-339)+(1.048)+(3.025), (I-339)+(1.048)+(3.026), (I-339)+(1.048)+(3.027), (I-339)+(1.048)+(3.028), (I-339)+(1.048)+(3.029), (I-339)+(1.048)+(3.030), (I-339)+(1.048)+(3.031), (I-339)+(1.048)+(5.001), (I-339)+(1.048)+(5.002), (I-339)+(1.048)+(5.003), (I-339)+(1.048)+(5.004), (I-339)+(1.048)+(5.005), (I-339)+(1.048)+(5.006), (I-339)+(1.048)+(5.007), (I-339)+(1.048)+(5.008), (I-339)+(1.048)+(5.009), (I-339)+(1.048)+(5.010), (I-339)+(1.048)+(5.011), (I-339)+(1.048)+(5.012), (I-339)+(1.048)+(5.013), (I-339)+(1.048)+(5.014), (I-339)+(1.048)+(5.015), (I-339)+(1.048)+(5.016), (I-339)+(1.048)+(5.017), (I-339)+(1.048)+(5.018), (I-339)+(1.048)+(5.019), (I-339)+(1.048)+(5.020), (I-339)+(1.048)+(5.021), (I-339)+(1.048)+(5.022), (I-339)+(1.048)+(5.023), (I-339)+(1.048)+(6.001), (I-339)+(1.048)+(6.002), (I-339)+(1.048)+(6.003), (I-339)+(1.048)+(6.004), (I-339)+(1.048)+(7.001), (I-339)+(1.048)+(7.002), (I-339)+(1.048)+(7.003), (I-339)+(1.048)+(7.004), (I-339)+(1.048)+(7.005), (I-339)+(1.048)+(7.006), (I-339)+(1.048)+(9.001), (I-339)+(1.048)+(9.002), (I-339)+(1.048)+(9.003), (I-339)+(1.048)+(9.004), (I-339)+(1.048)+(9.005), (I-339)+(1.048)+(9.006), (I-339)+(1.048)+(9.007), (I-339)+(1.048)+(9.008), (I-339)+(1.048)+(9.009), (I-339)+(1.048)+(14.001), (I-339)+(1.048)+(14.002), (I-339)+(1.048)+(15.008), (I-339)+(1.048)+(15.011), (I-339)+(1.048)+(15.012), (I-339)+(1.048)+(15.016), (I-339)+(1.048)+(15.025), (I-339)+(1.048)+(15.027), (I-339)+(1.048)+(15.047), (I-339)+(1.048)+(15.063), (I-339)+(1.048)+(15.064), (I-339)+(1.048)+(16.001), (I-339)+(1.048)+(16.002), (I-339)+(1.048)+(16.003), (I-339)+(1.048)+(16.004), (I-339)+(1.048)+(16.005), (I-339)+(1.048)+(16.006), (I-339)+(1.048)+(16.007), (I-339)+(1.048)+(16.008), (I-339)+(1.048)+(17.001), (I-339)+(1.048)+(17.002), (I-339)+(1.048)+(17.003), (I-339)+(1.048)+(17.004), (I-339)+(1.048)+(17.005), (I-339)+(1.048)+(17.006), (I-339)+(1.048)+(17.007), (I-339)+(1.048)+(17.008), (I-339)+(1.048)+(17.009), (I-339)+(1.048)+(17.010), (I-339)+(1.048)+(17.011), (I-339)+(1.048)+(17.012), (I-339)+(1.048)+(18.001), (I-339)+(1.049)+(1.050), (I-339)+(1.049)+(1.051), (I-339)+(1.049)+(1.052), (I-339)+(1.049)+(1.053), (I-339)+(1.049)+(1.054), (I-339)+(1.049)+(1.055), (I-339)+(1.049)+(1.056), (I-339)+(1.049)+(1.057), (I-339)+(1.049)+(1.058), (I-339)+(1.049)+(1.059), (I-339)+(1.049)+(1.060), (I-339)+(1.049)+(1.061), (I-339)+(1.049)+(1.062), (I-339)+(1.049)+(1.063), (I-339)+(1.049)+(1.064), (I-339)+(1.049)+(1.065), (I-339)+(1.049)+(1.066), (I-339)+(1.049)+(1.067), (I-339)+(1.049)+(1.068), (I-339)+(1.049)+(1.069), (I-339)+(1.049)+(1.070), (I-339)+(1.049)+(1.071), (I-339)+(1.049)+(1.072), (I-339)+(1.049)+(1.073), (I-339)+(1.049)+(1.074), (I-339)+(1.049)+(1.075), (I-339)+(1.049)+(1.076), (I-339)+(1.049)+(1.077), (I-339)+(1.049)+(1.078), (I-339)+(1.049)+(1.079), (I-339)+(1.049)+(1.080), (I-339)+(1.049)+(1.081), (I-339)+(1.049)+(1.082), (I-339)+(1.049)+(1.083), (I-339)+(1.049)+(1.084), (I-339)+(1.049)+(1.085), (I-339)+(1.049)+(1.086), (I-339)+(1.049)+(1.087), (I-339)+(1.049)+(1.088), (I-339)+(1.049)+(1.089), (I-339)+(1.049)+(1.090), (I-339)+(1.049)+(1.091), (I-339)+(1.049)+(1.092), (I-339)+(1.049)+(2.001), (I-339)+(1.049)+(2.002), (I-339)+(1.049)+(2.003), (I-339)+(1.049)+(2.004), (I-339)+(1.049)+(2.005), (I-339)+(1.049)+(2.006), (I-339)+(1.049)+(2.007), (I-339)+(1.049)+(2.008), (I-339)+(1.049)+(2.009), (I-339)+(1.049)+(2.010), (I-339)+(1.049)+(2.011), (I-339)+(1.049)+(2.012), (I-339)+(1.049)+(2.013), (I-339)+(1.049)+(2.014), (I-339)+(1.049)+(2.015), (I-339)+(1.049)+(2.016), (I-339)+(1.049)+(2.017), (I-339)+(1.049)+(2.018), (I-339)+(1.049)+(2.019), (I-339)+(1.049)+(2.020), (I-339)+(1.049)+(2.021), (I-339)+(1.049)+(2.022), (I-339)+(1.049)+(2.023), (I-339)+(1.049)+(2.024), (I-339)+(1.049)+(2.025), (I-339)+(1.049)+(2.026), (I-339)+(1.049)+(2.027), (I-339)+(1.049)+(2.028), (I-339)+(1.049)+(2.029), (I-339)+(1.049)+(2.030), (I-339)+(1.049)+(2.031), (I-339)+(1.049)+(2.032), (I-339)+(1.049)+(2.033), (I-339)+(1.049)+(2.034), (I-339)+(1.049)+(2.035), (I-339)+(1.049)+(2.036), (I-339)+(1.049)+(2.037), (I-339)+(1.049)+(2.038), (I-339)+(1.049)+(2.039), (I-339)+(1.049)+(2.040), (I-339)+(1.049)+(2.041), (I-339)+(1.049)+(2.042), (I-339)+(1.049)+(2.043), (I-339)+(1.049)+(2.044), (I-339)+(1.049)+(2.045), (I-339)+(1.049)+(2.046), (I-339)+(1.049)+(2.047), (I-339)+(1.049)+(2.048), (I-339)+(1.049)+(2.049), (I-339)+(1.049)+(2.050), (I-339)+(1.049)+(2.051), (I-339)+(1.049)+(2.052), (I-339)+(1.049)+(2.053), (I-339)+(1.049)+(2.054), (I-339)+(1.049)+(2.055), (I-339)+(1.049)+(2.056), (I-339)+(1.049)+(2.057), (I-339)+(1.049)+(2.058), (I-339)+(1.049)+(2.059), (I-339)+(1.049)+(3.001), (I-339)+(1.049)+(3.002), (I-339)+(1.049)+(3.003), (I-339)+(1.049)+(3.004), (I-339)+(1.049)+(3.005), (I-339)+(1.049)+(3.006), (I-339)+(1.049)+(3.007), (I-339)+(1.049)+(3.008), (I-339)+(1.049)+(3.009), (I-339)+(1.049)+(3.010), (I-339)+(1.049)+(3.011), (I-339)+(1.049)+(3.012), (I-339)+(1.049)+(3.013), (I-339)+(1.049)+(3.014), (I-339)+(1.049)+(3.015), (I-339)+(1.049)+(3.016), (I-339)+(1.049)+(3.017), (I-339)+(1.049)+(3.018), (I-339)+(1.049)+(3.019), (I-339)+(1.049)+(3.020), (I-339)+(1.049)+(3.021), (I-339)+(1.049)+(3.022), (I-339)+(1.049)+(3.023), (I-339)+(1.049)+(3.024), (I-339)+(1.049)+(3.025), (I-339)+(1.049)+(3.026), (I-339)+(1.049)+(3.027), (I-339)+(1.049)+(3.028), (I-339)+(1.049)+(3.029), (I-339)+(1.049)+(3.030), (I-339)+(1.049)+(3.031), (I-339)+(1.049)+(5.001), (I-339)+(1.049)+(5.002), (I-339)+(1.049)+(5.003), (I-339)+(1.049)+(5.004), (I-339)+(1.049)+(5.005), (I-339)+(1.049)+(5.006), (I-339)+(1.049)+(5.007), (I-339)+(1.049)+(5.008), (I-339)+(1.049)+(5.009), (I-339)+(1.049)+(5.010), (I-339)+(1.049)+(5.011), (I-339)+(1.049)+(5.012), (I-339)+(1.049)+(5.013), (I-339)+(1.049)+(5.014), (I-339)+(1.049)+(5.015), (I-339)+(1.049)+(5.016), (I-339)+(1.049)+(5.017), (I-339)+(1.049)+(5.018), (I-339)+(1.049)+(5.019), (I-339)+(1.049)+(5.020), (I-339)+(1.049)+(5.021), (I-339)+(1.049)+(5.022), (I-339)+(1.049)+(5.023), (I-339)+(1.049)+(6.001), (I-339)+(1.049)+(6.002), (I-339)+(1.049)+(6.003), (I-339)+(1.049)+(6.004), (I-339)+(1.049)+(7.001), (I-339)+(1.049)+(7.002), (I-339)+(1.049)+(7.003), (I-339)+(1.049)+(7.004), (I-339)+(1.049)+(7.005), (I-339)+(1.049)+(7.006), (I-339)+(1.049)+(9.001), (I-339)+(1.049)+(9.002), (I-339)+(1.049)+(9.003), (I-339)+(1.049)+(9.004), (I-339)+(1.049)+(9.005), (I-339)+(1.049)+(9.006), (I-339)+(1.049)+(9.007), (I-339)+(1.049)+(9.008), (I-339)+(1.049)+(9.009), (I-339)+(1.049)+(14.001), (I-339)+(1.049)+(14.002), (I-339)+(1.049)+(15.008), (I-339)+(1.049)+(15.011), (I-339)+(1.049)+(15.012), (I-339)+(1.049)+(15.016), (I-339)+(1.049)+(15.025), (I-339)+(1.049)+(15.027), (I-339)+(1.049)+(15.047), (I-339)+(1.049)+(15.063), (I-339)+(1.049)+(15.064), (I-339)+(1.049)+(16.001), (I-339)+(1.049)+(16.002), (I-339)+(1.049)+(16.003), (I-339)+(1.049)+(16.004), (I-339)+(1.049)+(16.005), (I-339)+(1.049)+(16.006), (I-339)+(1.049)+(16.007), (I-339)+(1.049)+(16.008), (I-339)+(1.049)+(17.001), (I-339)+(1.049)+(17.002), (I-339)+(1.049)+(17.003), (I-339)+(1.049)+(17.004), (I-339)+(1.049)+(17.005), (I-339)+(1.049)+(17.006), (I-339)+(1.049)+(17.007), (I-339)+(1.049)+(17.008), (I-339)+(1.049)+(17.009), (I-339)+(1.049)+(17.010), (I-339)+(1.049)+(17.011), (I-339)+(1.049)+(17.012), (I-339)+(1.049)+(18.001), (I-339)+(1.050)+(1.051), (I-339)+(1.050)+(1.052), (I-339)+(1.050)+(1.053), (I-339)+(1.050)+(1.054), (I-339)+(1.050)+(1.055), (I-339)+(1.050)+(1.056), (I-339)+(1.050)+(1.057), (I-339)+(1.050)+(1.058), (I-339)+(1.050)+(1.059), (I-339)+(1.050)+(1.060), (I-339)+(1.050)+(1.061), (I-339)+(1.050)+(1.062), (I-339)+(1.050)+(1.063), (I-339)+(1.050)+(1.064), (I-339)+(1.050)+(1.065), (I-339)+(1.050)+(1.066), (I-339)+(1.050)+(1.067), (I-339)+(1.050)+(1.068), (I-339)+(1.050)+(1.069), (I-339)+(1.050)+(1.070), (I-339)+(1.050)+(1.071), (I-339)+(1.050)+(1.072), (I-339)+(1.050)+(1.073), (I-339)+(1.050)+(1.074), (I-339)+(1.050)+(1.075), (I-339)+(1.050)+(1.076), (I-339)+(1.050)+(1.077), (I-339)+(1.050)+(1.078), (I-339)+(1.050)+(1.079), (I-339)+(1.050)+(1.080), (I-339)+(1.050)+(1.081), (I-339)+(1.050)+(1.082), (I-339)+(1.050)+(1.083), (I-339)+(1.050)+(1.084), (I-339)+(1.050)+(1.085), (I-339)+(1.050)+(1.086), (I-339)+(1.050)+(1.087), (I-339)+(1.050)+(1.088), (I-339)+(1.050)+(1.089), (I-339)+(1.050)+(1.090), (I-339)+(1.050)+(1.091), (I-339)+(1.050)+(1.092), (I-339)+(1.050)+(2.001), (I-339)+(1.050)+(2.002), (I-339)+(1.050)+(2.003), (I-339)+(1.050)+(2.004), (I-339)+(1.050)+(2.005), (I-339)+(1.050)+(2.006), (I-339)+(1.050)+(2.007), (I-339)+(1.050)+(2.008), (I-339)+(1.050)+(2.009), (I-339)+(1.050)+(2.010), (I-339)+(1.050)+(2.011), (I-339)+(1.050)+(2.012), (I-339)+(1.050)+(2.013), (I-339)+(1.050)+(2.014), (I-339)+(1.050)+(2.015), (I-339)+(1.050)+(2.016), (I-339)+(1.050)+(2.017), (I-339)+(1.050)+(2.018), (I-339)+(1.050)+(2.019), (I-339)+(1.050)+(2.020), (I-339)+(1.050)+(2.021), (I-339)+(1.050)+(2.022), (I-339)+(1.050)+(2.023), (I-339)+(1.050)+(2.024), (I-339)+(1.050)+(2.025), (I-339)+(1.050)+(2.026), (I-339)+(1.050)+(2.027), (I-339)+(1.050)+(2.028), (I-339)+(1.050)+(2.029), (I-339)+(1.050)+(2.030), (I-339)+(1.050)+(2.031), (I-339)+(1.050)+(2.032), (I-339)+(1.050)+(2.033), (I-339)+(1.050)+(2.034), (I-339)+(1.050)+(2.035), (I-339)+(1.050)+(2.036), (I-339)+(1.050)+(2.037), (I-339)+(1.050)+(2.038), (I-339)+(1.050)+(2.039), (I-339)+(1.050)+(2.040), (I-339)+(1.050)+(2.041), (I-339)+(1.050)+(2.042), (I-339)+(1.050)+(2.043), (I-339)+(1.050)+(2.044), (I-339)+(1.050)+(2.045), (I-339)+(1.050)+(2.046), (I-339)+(1.050)+(2.047), (I-339)+(1.050)+(2.048), (I-339)+(1.050)+(2.049), (I-339)+(1.050)+(2.050), (I-339)+(1.050)+(2.051), (I-339)+(1.050)+(2.052), (I-339)+(1.050)+(2.053), (I-339)+(1.050)+(2.054), (I-339)+(1.050)+(2.055), (I-339)+(1.050)+(2.056), (I-339)+(1.050)+(2.057), (I-339)+(1.050)+(2.058), (I-339)+(1.050)+(2.059), (I-339)+(1.050)+(3.001), (I-339)+(1.050)+(3.002), (I-339)+(1.050)+(3.003), (I-339)+(1.050)+(3.004), (I-339)+(1.050)+(3.005), (I-339)+(1.050)+(3.006), (I-339)+(1.050)+(3.007), (I-339)+(1.050)+(3.008), (I-339)+(1.050)+(3.009), (I-339)+(1.050)+(3.010), (I-339)+(1.050)+(3.011), (I-339)+(1.050)+(3.012), (I-339)+(1.050)+(3.013), (I-339)+(1.050)+(3.014), (I-339)+(1.050)+(3.015), (I-339)+(1.050)+(3.016), (I-339)+(1.050)+(3.017), (I-339)+(1.050)+(3.018), (I-339)+(1.050)+(3.019), (I-339)+(1.050)+(3.020), (I-339)+(1.050)+(3.021), (I-339)+(1.050)+(3.022), (I-339)+(1.050)+(3.023), (I-339)+(1.050)+(3.024), (I-339)+(1.050)+(3.025), (I-339)+(1.050)+(3.026), (I-339)+(1.050)+(3.027), (I-339)+(1.050)+(3.028), (I-339)+(1.050)+(3.029), (I-339)+(1.050)+(3.030), (I-339)+(1.050)+(3.031), (I-339)+(1.050)+(5.001), (I-339)+(1.050)+(5.002), (I-339)+(1.050)+(5.003), (I-339)+(1.050)+(5.004), (I-339)+(1.050)+(5.005), (I-339)+(1.050)+(5.006), (I-339)+(1.050)+(5.007), (I-339)+(1.050)+(5.008), (I-339)+(1.050)+(5.009), (I-339)+(1.050)+(5.010), (I-339)+(1.050)+(5.011), (I-339)+(1.050)+(5.012), (I-339)+(1.050)+(5.013), (I-339)+(1.050)+(5.014), (I-339)+(1.050)+(5.015), (I-339)+(1.050)+(5.016), (I-339)+(1.050)+(5.017), (I-339)+(1.050)+(5.018), (I-339)+(1.050)+(5.019), (I-339)+(1.050)+(5.020), (I-339)+(1.050)+(5.021), (I-339)+(1.050)+(5.022), (I-339)+(1.050)+(5.023), (I-339)+(1.050)+(6.001), (I-339)+(1.050)+(6.002), (I-339)+(1.050)+(6.003), (I-339)+(1.050)+(6.004), (I-339)+(1.050)+(7.001), (I-339)+(1.050)+(7.002), (I-339)+(1.050)+(7.003), (I-339)+(1.050)+(7.004), (I-339)+(1.050)+(7.005), (I-339)+(1.050)+(7.006), (I-339)+(1.050)+(9.001), (I-339)+(1.050)+(9.002), (I-339)+(1.050)+(9.003), (I-339)+(1.050)+(9.004), (I-339)+(1.050)+(9.005), (I-339)+(1.050)+(9.006), (I-339)+(1.050)+(9.007), (I-339)+(1.050)+(9.008), (I-339)+(1.050)+(9.009), (I-339)+(1.050)+(14.001), (I-339)+(1.050)+(14.002), (I-339)+(1.050)+(15.008), (I-339)+(1.050)+(15.011), (I-339)+(1.050)+(15.012), (I-339)+(1.050)+(15.016), (I-339)+(1.050)+(15.025), (I-339)+(1.050)+(15.027), (I-339)+(1.050)+(15.047), (I-339)+(1.050)+(15.063), (I-339)+(1.050)+(15.064), (I-339)+(1.050)+(16.001), (I-339)+(1.050)+(16.002), (I-339)+(1.050)+(16.003), (I-339)+(1.050)+(16.004), (I-339)+(1.050)+(16.005), (I-339)+(1.050)+(16.006), (I-339)+(1.050)+(16.007), (I-339)+(1.050)+(16.008), (I-339)+(1.050)+(17.001), (I-339)+(1.050)+(17.002), (I-339)+(1.050)+(17.003), (I-339)+(1.050)+(17.004), (I-339)+(1.050)+(17.005), (I-339)+(1.050)+(17.006), (I-339)+(1.050)+(17.007), (I-339)+(1.050)+(17.008), (I-339)+(1.050)+(17.009), (I-339)+(1.050)+(17.010), (I-339)+(1.050)+(17.011), (I-339)+(1.050)+(17.012), (I-339)+(1.050)+(18.001), (I-339)+(1.051)+(1.052), (I-339)+(1.051)+(1.053), (I-339)+(1.051)+(1.054), (I-339)+(1.051)+(1.055), (I-339)+(1.051)+(1.056), (I-339)+(1.051)+(1.057), (I-339)+(1.051)+(1.058), (I-339)+(1.051)+(1.059), (I-339)+(1.051)+(1.060), (I-339)+(1.051)+(1.061), (I-339)+(1.051)+(1.062), (I-339)+(1.051)+(1.063), (I-339)+(1.051)+(1.064), (I-339)+(1.051)+(1.065), (I-339)+(1.051)+(1.066), (I-339)+(1.051)+(1.067), (I-339)+(1.051)+(1.068), (I-339)+(1.051)+(1.069), (I-339)+(1.051)+(1.070), (I-339)+(1.051)+(1.071), (I-339)+(1.051)+(1.072), (I-339)+(1.051)+(1.073), (I-339)+(1.051)+(1.074), (I-339)+(1.051)+(1.075), (I-339)+(1.051)+(1.076), (I-339)+(1.051)+(1.077), (I-339)+(1.051)+(1.078), (I-339)+(1.051)+(1.079), (I-339)+(1.051)+(1.080), (I-339)+(1.051)+(1.081), (I-339)+(1.051)+(1.082), (I-339)+(1.051)+(1.083), (I-339)+(1.051)+(1.084), (I-339)+(1.051)+(1.085), (I-339)+(1.051)+(1.086), (I-339)+(1.051)+(1.087), (I-339)+(1.051)+(1.088), (I-339)+(1.051)+(1.089), (I-339)+(1.051)+(1.090), (I-339)+(1.051)+(1.091), (I-339)+(1.051)+(1.092), (I-339)+(1.051)+(2.001), (I-339)+(1.051)+(2.002), (I-339)+(1.051)+(2.003), (I-339)+(1.051)+(2.004), (I-339)+(1.051)+(2.005), (I-339)+(1.051)+(2.006), (I-339)+(1.051)+(2.007), (I-339)+(1.051)+(2.008), (I-339)+(1.051)+(2.009), (I-339)+(1.051)+(2.010), (I-339)+(1.051)+(2.011), (I-339)+(1.051)+(2.012), (I-339)+(1.051)+(2.013), (I-339)+(1.051)+(2.014), (I-339)+(1.051)+(2.015), (I-339)+(1.051)+(2.016), (I-339)+(1.051)+(2.017), (I-339)+(1.051)+(2.018), (I-339)+(1.051)+(2.019), (I-339)+(1.051)+(2.020), (I-339)+(1.051)+(2.021), (I-339)+(1.051)+(2.022), (I-339)+(1.051)+(2.023), (I-339)+(1.051)+(2.024), (I-339)+(1.051)+(2.025), (I-339)+(1.051)+(2.026), (I-339)+(1.051)+(2.027), (I-339)+(1.051)+(2.028), (I-339)+(1.051)+(2.029), (I-339)+(1.051)+(2.030), (I-339)+(1.051)+(2.031), (I-339)+(1.051)+(2.032), (I-339)+(1.051)+(2.033), (I-339)+(1.051)+(2.034), (I-339)+(1.051)+(2.035), (I-339)+(1.051)+(2.036), (I-339)+(1.051)+(2.037), (I-339)+(1.051)+(2.038), (I-339)+(1.051)+(2.039), (I-339)+(1.051)+(2.040), (I-339)+(1.051)+(2.041), (I-339)+(1.051)+(2.042), (I-339)+(1.051)+(2.043), (I-339)+(1.051)+(2.044), (I-339)+(1.051)+(2.045), (I-339)+(1.051)+(2.046), (I-339)+(1.051)+(2.047), (I-339)+(1.051)+(2.048), (I-339)+(1.051)+(2.049), (I-339)+(1.051)+(2.050), (I-339)+(1.051)+(2.051), (I-339)+(1.051)+(2.052), (I-339)+(1.051)+(2.053), (I-339)+(1.051)+(2.054), (I-339)+(1.051)+(2.055), (I-339)+(1.051)+(2.056), (I-339)+(1.051)+(2.057), (I-339)+(1.051)+(2.058), (I-339)+(1.051)+(2.059), (I-339)+(1.051)+(3.001), (I-339)+(1.051)+(3.002), (I-339)+(1.051)+(3.003), (I-339)+(1.051)+(3.004), (I-339)+(1.051)+(3.005), (I-339)+(1.051)+(3.006), (I-339)+(1.051)+(3.007), (I-339)+(1.051)+(3.008), (I-339)+(1.051)+(3.009), (I-339)+(1.051)+(3.010), (I-339)+(1.051)+(3.011), (I-339)+(1.051)+(3.012), (I-339)+(1.051)+(3.013), (I-339)+(1.051)+(3.014), (I-339)+(1.051)+(3.015), (I-339)+(1.051)+(3.016), (I-339)+(1.051)+(3.017), (I-339)+(1.051)+(3.018), (I-339)+(1.051)+(3.019), (I-339)+(1.051)+(3.020), (I-339)+(1.051)+(3.021), (I-339)+(1.051)+(3.022), (I-339)+(1.051)+(3.023), (I-339)+(1.051)+(3.024), (I-339)+(1.051)+(3.025), (I-339)+(1.051)+(3.026), (I-339)+(1.051)+(3.027), (I-339)+(1.051)+(3.028), (I-339)+(1.051)+(3.029), (I-339)+(1.051)+(3.030), (I-339)+(1.051)+(3.031), (I-339)+(1.051)+(5.001), (I-339)+(1.051)+(5.002), (I-339)+(1.051)+(5.003), (I-339)+(1.051)+(5.004), (I-339)+(1.051)+(5.005), (I-339)+(1.051)+(5.006), (I-339)+(1.051)+(5.007), (I-339)+(1.051)+(5.008), (I-339)+(1.051)+(5.009), (I-339)+(1.051)+(5.010), (I-339)+(1.051)+(5.011), (I-339)+(1.051)+(5.012), (I-339)+(1.051)+(5.013), (I-339)+(1.051)+(5.014), (I-339)+(1.051)+(5.015), (I-339)+(1.051)+(5.016), (I-339)+(1.051)+(5.017), (I-339)+(1.051)+(5.018), (I-339)+(1.051)+(5.019), (I-339)+(1.051)+(5.020), (I-339)+(1.051)+(5.021), (I-339)+(1.051)+(5.022), (I-339)+(1.051)+(5.023), (I-339)+(1.051)+(6.001), (I-339)+(1.051)+(6.002), (I-339)+(1.051)+(6.003), (I-339)+(1.051)+(6.004), (I-339)+(1.051)+(7.001), (I-339)+(1.051)+(7.002), (I-339)+(1.051)+(7.003), (I-339)+(1.051)+(7.004), (I-339)+(1.051)+(7.005), (I-339)+(1.051)+(7.006), (I-339)+(1.051)+(9.001), (I-339)+(1.051)+(9.002), (I-339)+(1.051)+(9.003), (I-339)+(1.051)+(9.004), (I-339)+(1.051)+(9.005), (I-339)+(1.051)+(9.006), (I-339)+(1.051)+(9.007), (I-339)+(1.051)+(9.008), (I-339)+(1.051)+(9.009), (I-339)+(1.051)+(14.001), (I-339)+(1.051)+(14.002), (I-339)+(1.051)+(15.008), (I-339)+(1.051)+(15.011), (I-339)+(1.051)+(15.012), (I-339)+(1.051)+(15.016), (I-339)+(1.051)+(15.025), (I-339)+(1.051)+(15.027), (I-339)+(1.051)+(15.047), (I-339)+(1.051)+(15.063), (I-339)+(1.051)+(15.064), (I-339)+(1.051)+(16.001), (I-339)+(1.051)+(16.002), (I-339)+(1.051)+(16.003), (I-339)+(1.051)+(16.004), (I-339)+(1.051)+(16.005), (I-339)+(1.051)+(16.006), (I-339)+(1.051)+(16.007), (I-339)+(1.051)+(16.008), (I-339)+(1.051)+(17.001), (I-339)+(1.051)+(17.002), (I-339)+(1.051)+(17.003), (I-339)+(1.051)+(17.004), (I-339)+(1.051)+(17.005), (I-339)+(1.051)+(17.006), (I-339)+(1.051)+(17.007), (I-339)+(1.051)+(17.008), (I-339)+(1.051)+(17.009), (I-339)+(1.051)+(17.010), (I-339)+(1.051)+(17.011), (I-339)+(1.051)+(17.012), (I-339)+(1.051)+(18.001), (I-339)+(1.052)+(1.053), (I-339)+(1.052)+(1.054), (I-339)+(1.052)+(1.055), (I-339)+(1.052)+(1.056), (I-339)+(1.052)+(1.057), (I-339)+(1.052)+(1.058), (I-339)+(1.052)+(1.059), (I-339)+(1.052)+(1.060), (I-339)+(1.052)+(1.061), (I-339)+(1.052)+(1.062), (I-339)+(1.052)+(1.063), (I-339)+(1.052)+(1.064), (I-339)+(1.052)+(1.065), (I-339)+(1.052)+(1.066), (I-339)+(1.052)+(1.067), (I-339)+(1.052)+(1.068), (I-339)+(1.052)+(1.069), (I-339)+(1.052)+(1.070), (I-339)+(1.052)+(1.071), (I-339)+(1.052)+(1.072), (I-339)+(1.052)+(1.073), (I-339)+(1.052)+(1.074), (I-339)+(1.052)+(1.075), (I-339)+(1.052)+(1.076), (I-339)+(1.052)+(1.077), (I-339)+(1.052)+(1.078), (I-339)+(1.052)+(1.079), (I-339)+(1.052)+(1.080), (I-339)+(1.052)+(1.081), (I-339)+(1.052)+(1.082), (I-339)+(1.052)+(1.083), (I-339)+(1.052)+(1.084), (I-339)+(1.052)+(1.085), (I-339)+(1.052)+(1.086), (I-339)+(1.052)+(1.087), (I-339)+(1.052)+(1.088), (I-339)+(1.052)+(1.089), (I-339)+(1.052)+(1.090), (I-339)+(1.052)+(1.091), (I-339)+(1.052)+(1.092), (I-339)+(1.052)+(2.001), (I-339)+(1.052)+(2.002), (I-339)+(1.052)+(2.003), (I-339)+(1.052)+(2.004), (I-339)+(1.052)+(2.005), (I-339)+(1.052)+(2.006), (I-339)+(1.052)+(2.007), (I-339)+(1.052)+(2.008), (I-339)+(1.052)+(2.009), (I-339)+(1.052)+(2.010), (I-339)+(1.052)+(2.011), (I-339)+(1.052)+(2.012), (I-339)+(1.052)+(2.013), (I-339)+(1.052)+(2.014), (I-339)+(1.052)+(2.015), (I-339)+(1.052)+(2.016), (I-339)+(1.052)+(2.017), (I-339)+(1.052)+(2.018), (I-339)+(1.052)+(2.019), (I-339)+(1.052)+(2.020), (I-339)+(1.052)+(2.021), (I-339)+(1.052)+(2.022), (I-339)+(1.052)+(2.023), (I-339)+(1.052)+(2.024), (I-339)+(1.052)+(2.025), (I-339)+(1.052)+(2.026), (I-339)+(1.052)+(2.027), (I-339)+(1.052)+(2.028), (I-339)+(1.052)+(2.029), (I-339)+(1.052)+(2.030), (I-339)+(1.052)+(2.031), (I-339)+(1.052)+(2.032), (I-339)+(1.052)+(2.033), (I-339)+(1.052)+(2.034), (I-339)+(1.052)+(2.035), (I-339)+(1.052)+(2.036), (I-339)+(1.052)+(2.037), (I-339)+(1.052)+(2.038), (I-339)+(1.052)+(2.039), (I-339)+(1.052)+(2.040), (I-339)+(1.052)+(2.041), (I-339)+(1.052)+(2.042), (I-339)+(1.052)+(2.043), (I-339)+(1.052)+(2.044), (I-339)+(1.052)+(2.045), (I-339)+(1.052)+(2.046), (I-339)+(1.052)+(2.047), (I-339)+(1.052)+(2.048), (I-339)+(1.052)+(2.049), (I-339)+(1.052)+(2.050), (I-339)+(1.052)+(2.051), (I-339)+(1.052)+(2.052), (I-339)+(1.052)+(2.053), (I-339)+(1.052)+(2.054), (I-339)+(1.052)+(2.055), (I-339)+(1.052)+(2.056), (I-339)+(1.052)+(2.057), (I-339)+(1.052)+(2.058), (I-339)+(1.052)+(2.059), (I-339)+(1.052)+(3.001), (I-339)+(1.052)+(3.002), (I-339)+(1.052)+(3.003), (I-339)+(1.052)+(3.004), (I-339)+(1.052)+(3.005), (I-339)+(1.052)+(3.006), (I-339)+(1.052)+(3.007), (I-339)+(1.052)+(3.008), (I-339)+(1.052)+(3.009), (I-339)+(1.052)+(3.010), (I-339)+(1.052)+(3.011), (I-339)+(1.052)+(3.012), (I-339)+(1.052)+(3.013), (I-339)+(1.052)+(3.014), (I-339)+(1.052)+(3.015), (I-339)+(1.052)+(3.016), (I-339)+(1.052)+(3.017), (I-339)+(1.052)+(3.018), (I-339)+(1.052)+(3.019), (I-339)+(1.052)+(3.020), (I-339)+(1.052)+(3.021), (I-339)+(1.052)+(3.022), (I-339)+(1.052)+(3.023), (I-339)+(1.052)+(3.024), (I-339)+(1.052)+(3.025), (I-339)+(1.052)+(3.026), (I-339)+(1.052)+(3.027), (I-339)+(1.052)+(3.028), (I-339)+(1.052)+(3.029), (I-339)+(1.052)+(3.030), (I-339)+(1.052)+(3.031), (I-339)+(1.052)+(5.001), (I-339)+(1.052)+(5.002), (I-339)+(1.052)+(5.003), (I-339)+(1.052)+(5.004), (I-339)+(1.052)+(5.005), (I-339)+(1.052)+(5.006), (I-339)+(1.052)+(5.007), (I-339)+(1.052)+(5.008), (I-339)+(1.052)+(5.009), (I-339)+(1.052)+(5.010), (I-339)+(1.052)+(5.011), (I-339)+(1.052)+(5.012), (I-339)+(1.052)+(5.013), (I-339)+(1.052)+(5.014), (I-339)+(1.052)+(5.015), (I-339)+(1.052)+(5.016), (I-339)+(1.052)+(5.017), (I-339)+(1.052)+(5.018), (I-339)+(1.052)+(5.019), (I-339)+(1.052)+(5.020), (I-339)+(1.052)+(5.021), (I-339)+(1.052)+(5.022), (I-339)+(1.052)+(5.023), (I-339)+(1.052)+(6.001), (I-339)+(1.052)+(6.002), (I-339)+(1.052)+(6.003), (I-339)+(1.052)+(6.004), (I-339)+(1.052)+(7.001), (I-339)+(1.052)+(7.002), (I-339)+(1.052)+(7.003), (I-339)+(1.052)+(7.004), (I-339)+(1.052)+(7.005), (I-339)+(1.052)+(7.006), (I-339)+(1.052)+(9.001), (I-339)+(1.052)+(9.002), (I-339)+(1.052)+(9.003), (I-339)+(1.052)+(9.004), (I-339)+(1.052)+(9.005), (I-339)+(1.052)+(9.006), (I-339)+(1.052)+(9.007), (I-339)+(1.052)+(9.008), (I-339)+(1.052)+(9.009), (I-339)+(1.052)+(14.001), (I-339)+(1.052)+(14.002), (I-339)+(1.052)+(15.008), (I-339)+(1.052)+(15.011), (I-339)+(1.052)+(15.012), (I-339)+(1.052)+(15.016), (I-339)+(1.052)+(15.025), (I-339)+(1.052)+(15.027), (I-339)+(1.052)+(15.047), (I-339)+(1.052)+(15.063), (I-339)+(1.052)+(15.064), (I-339)+(1.052)+(16.001), (I-339)+(1.052)+(16.002), (I-339)+(1.052)+(16.003), (I-339)+(1.052)+(16.004), (I-339)+(1.052)+(16.005), (I-339)+(1.052)+(16.006), (I-339)+(1.052)+(16.007), (I-339)+(1.052)+(16.008), (I-339)+(1.052)+(17.001), (I-339)+(1.052)+(17.002), (I-339)+(1.052)+(17.003), (I-339)+(1.052)+(17.004), (I-339)+(1.052)+(17.005), (I-339)+(1.052)+(17.006), (I-339)+(1.052)+(17.007), (I-339)+(1.052)+(17.008), (I-339)+(1.052)+(17.009), (I-339)+(1.052)+(17.010), (I-339)+(1.052)+(17.011), (I-339)+(1.052)+(17.012), (I-339)+(1.052)+(18.001), (I-339)+(1.053)+(1.054), (I-339)+(1.053)+(1.055), (I-339)+(1.053)+(1.056), (I-339)+(1.053)+(1.057), (I-339)+(1.053)+(1.058), (I-339)+(1.053)+(1.059), (I-339)+(1.053)+(1.060), (I-339)+(1.053)+(1.061), (I-339)+(1.053)+(1.062), (I-339)+(1.053)+(1.063), (I-339)+(1.053)+(1.064), (I-339)+(1.053)+(1.065), (I-339)+(1.053)+(1.066), (I-339)+(1.053)+(1.067), (I-339)+(1.053)+(1.068), (I-339)+(1.053)+(1.069), (I-339)+(1.053)+(1.070), (I-339)+(1.053)+(1.071), (I-339)+(1.053)+(1.072), (I-339)+(1.053)+(1.073), (I-339)+(1.053)+(1.074), (I-339)+(1.053)+(1.075), (I-339)+(1.053)+(1.076), (I-339)+(1.053)+(1.077), (I-339)+(1.053)+(1.078), (I-339)+(1.053)+(1.079), (I-339)+(1.053)+(1.080), (I-339)+(1.053)+(1.081), (I-339)+(1.053)+(1.082), (I-339)+(1.053)+(1.083), (I-339)+(1.053)+(1.084), (I-339)+(1.053)+(1.085), (I-339)+(1.053)+(1.086), (I-339)+(1.053)+(1.087), (I-339)+(1.053)+(1.088), (I-339)+(1.053)+(1.089), (I-339)+(1.053)+(1.090), (I-339)+(1.053)+(1.091), (I-339)+(1.053)+(1.092), (I-339)+(1.053)+(2.001), (I-339)+(1.053)+(2.002), (I-339)+(1.053)+(2.003), (I-339)+(1.053)+(2.004), (I-339)+(1.053)+(2.005), (I-339)+(1.053)+(2.006), (I-339)+(1.053)+(2.007), (I-339)+(1.053)+(2.008), (I-339)+(1.053)+(2.009), (I-339)+(1.053)+(2.010), (I-339)+(1.053)+(2.011), (I-339)+(1.053)+(2.012), (I-339)+(1.053)+(2.013), (I-339)+(1.053)+(2.014), (I-339)+(1.053)+(2.015), (I-339)+(1.053)+(2.016), (I-339)+(1.053)+(2.017), (I-339)+(1.053)+(2.018), (I-339)+(1.053)+(2.019), (I-339)+(1.053)+(2.020), (I-339)+(1.053)+(2.021), (I-339)+(1.053)+(2.022), (I-339)+(1.053)+(2.023), (I-339)+(1.053)+(2.024), (I-339)+(1.053)+(2.025), (I-339)+(1.053)+(2.026), (I-339)+(1.053)+(2.027), (I-339)+(1.053)+(2.028), (I-339)+(1.053)+(2.029), (I-339)+(1.053)+(2.030), (I-339)+(1.053)+(2.031), (I-339)+(1.053)+(2.032), (I-339)+(1.053)+(2.033), (I-339)+(1.053)+(2.034), (I-339)+(1.053)+(2.035), (I-339)+(1.053)+(2.036), (I-339)+(1.053)+(2.037), (I-339)+(1.053)+(2.038), (I-339)+(1.053)+(2.039), (I-339)+(1.053)+(2.040), (I-339)+(1.053)+(2.041), (I-339)+(1.053)+(2.042), (I-339)+(1.053)+(2.043), (I-339)+(1.053)+(2.044), (I-339)+(1.053)+(2.045), (I-339)+(1.053)+(2.046), (I-339)+(1.053)+(2.047), (I-339)+(1.053)+(2.048), (I-339)+(1.053)+(2.049), (I-339)+(1.053)+(2.050), (I-339)+(1.053)+(2.051), (I-339)+(1.053)+(2.052), (I-339)+(1.053)+(2.053), (I-339)+(1.053)+(2.054), (I-339)+(1.053)+(2.055), (I-339)+(1.053)+(2.056), (I-339)+(1.053)+(2.057), (I-339)+(1.053)+(2.058), (I-339)+(1.053)+(2.059), (I-339)+(1.053)+(3.001), (I-339)+(1.053)+(3.002), (I-339)+(1.053)+(3.003), (I-339)+(1.053)+(3.004), (I-339)+(1.053)+(3.005), (I-339)+(1.053)+(3.006), (I-339)+(1.053)+(3.007), (I-339)+(1.053)+(3.008), (I-339)+(1.053)+(3.009), (I-339)+(1.053)+(3.010), (I-339)+(1.053)+(3.011), (I-339)+(1.053)+(3.012), (I-339)+(1.053)+(3.013), (I-339)+(1.053)+(3.014), (I-339)+(1.053)+(3.015), (I-339)+(1.053)+(3.016), (I-339)+(1.053)+(3.017), (I-339)+(1.053)+(3.018), (I-339)+(1.053)+(3.019), (I-339)+(1.053)+(3.020), (I-339)+(1.053)+(3.021), (I-339)+(1.053)+(3.022), (I-339)+(1.053)+(3.023), (I-339)+(1.053)+(3.024), (I-339)+(1.053)+(3.025), (I-339)+(1.053)+(3.026), (I-339)+(1.053)+(3.027), (I-339)+(1.053)+(3.028), (I-339)+(1.053)+(3.029), (I-339)+(1.053)+(3.030), (I-339)+(1.053)+(3.031), (I-339)+(1.053)+(5.001), (I-339)+(1.053)+(5.002), (I-339)+(1.053)+(5.003), (I-339)+(1.053)+(5.004), (I-339)+(1.053)+(5.005), (I-339)+(1.053)+(5.006), (I-339)+(1.053)+(5.007), (I-339)+(1.053)+(5.008), (I-339)+(1.053)+(5.009), (I-339)+(1.053)+(5.010), (I-339)+(1.053)+(5.011), (I-339)+(1.053)+(5.012), (I-339)+(1.053)+(5.013), (I-339)+(1.053)+(5.014), (I-339)+(1.053)+(5.015), (I-339)+(1.053)+(5.016), (I-339)+(1.053)+(5.017), (I-339)+(1.053)+(5.018), (I-339)+(1.053)+(5.019), (I-339)+(1.053)+(5.020), (I-339)+(1.053)+(5.021), (I-339)+(1.053)+(5.022), (I-339)+(1.053)+(5.023), (I-339)+(1.053)+(6.001), (I-339)+(1.053)+(6.002), (I-339)+(1.053)+(6.003), (I-339)+(1.053)+(6.004), (I-339)+(1.053)+(7.001), (I-339)+(1.053)+(7.002), (I-339)+(1.053)+(7.003), (I-339)+(1.053)+(7.004), (I-339)+(1.053)+(7.005), (I-339)+(1.053)+(7.006), (I-339)+(1.053)+(9.001), (I-339)+(1.053)+(9.002), (I-339)+(1.053)+(9.003), (I-339)+(1.053)+(9.004), (I-339)+(1.053)+(9.005), (I-339)+(1.053)+(9.006), (I-339)+(1.053)+(9.007), (I-339)+(1.053)+(9.008), (I-339)+(1.053)+(9.009), (I-339)+(1.053)+(14.001), (I-339)+(1.053)+(14.002), (I-339)+(1.053)+(15.008), (I-339)+(1.053)+(15.011), (I-339)+(1.053)+(15.012), (I-339)+(1.053)+(15.016), (I-339)+(1.053)+(15.025), (I-339)+(1.053)+(15.027), (I-339)+(1.053)+(15.047), (I-339)+(1.053)+(15.063), (I-339)+(1.053)+(15.064), (I-339)+(1.053)+(16.001), (I-339)+(1.053)+(16.002), (I-339)+(1.053)+(16.003), (I-339)+(1.053)+(16.004), (I-339)+(1.053)+(16.005), (I-339)+(1.053)+(16.006), (I-339)+(1.053)+(16.007), (I-339)+(1.053)+(16.008), (I-339)+(1.053)+(17.001), (I-339)+(1.053)+(17.002), (I-339)+(1.053)+(17.003), (I-339)+(1.053)+(17.004), (I-339)+(1.053)+(17.005), (I-339)+(1.053)+(17.006), (I-339)+(1.053)+(17.007), (I-339)+(1.053)+(17.008), (I-339)+(1.053)+(17.009), (I-339)+(1.053)+(17.010), (I-339)+(1.053)+(17.011), (I-339)+(1.053)+(17.012), (I-339)+(1.053)+(18.001), (I-339)+(1.054)+(1.055), (I-339)+(1.054)+(1.056), (I-339)+(1.054)+(1.057), (I-339)+(1.054)+(1.058), (I-339)+(1.054)+(1.059), (I-339)+(1.054)+(1.060), (I-339)+(1.054)+(1.061), (I-339)+(1.054)+(1.062), (I-339)+(1.054)+(1.063), (I-339)+(1.054)+(1.064), (I-339)+(1.054)+(1.065), (I-339)+(1.054)+(1.066), (I-339)+(1.054)+(1.067), (I-339)+(1.054)+(1.068), (I-339)+(1.054)+(1.069), (I-339)+(1.054)+(1.070), (I-339)+(1.054)+(1.071), (I-339)+(1.054)+(1.072), (I-339)+(1.054)+(1.073), (I-339)+(1.054)+(1.074), (I-339)+(1.054)+(1.075), (I-339)+(1.054)+(1.076), (I-339)+(1.054)+(1.077), (I-339)+(1.054)+(1.078), (I-339)+(1.054)+(1.079), (I-339)+(1.054)+(1.080), (I-339)+(1.054)+(1.081), (I-339)+(1.054)+(1.082), (I-339)+(1.054)+(1.083), (I-339)+(1.054)+(1.084), (I-339)+(1.054)+(1.085), (I-339)+(1.054)+(1.086), (I-339)+(1.054)+(1.087), (I-339)+(1.054)+(1.088), (I-339)+(1.054)+(1.089), (I-339)+(1.054)+(1.090), (I-339)+(1.054)+(1.091), (I-339)+(1.054)+(1.092), (I-339)+(1.054)+(2.001), (I-339)+(1.054)+(2.002), (I-339)+(1.054)+(2.003), (I-339)+(1.054)+(2.004), (I-339)+(1.054)+(2.005), (I-339)+(1.054)+(2.006), (I-339)+(1.054)+(2.007), (I-339)+(1.054)+(2.008), (I-339)+(1.054)+(2.009), (I-339)+(1.054)+(2.010), (I-339)+(1.054)+(2.011), (I-339)+(1.054)+(2.012), (I-339)+(1.054)+(2.013), (I-339)+(1.054)+(2.014), (I-339)+(1.054)+(2.015), (I-339)+(1.054)+(2.016), (I-339)+(1.054)+(2.017), (I-339)+(1.054)+(2.018), (I-339)+(1.054)+(2.019), (I-339)+(1.054)+(2.020), (I-339)+(1.054)+(2.021), (I-339)+(1.054)+(2.022), (I-339)+(1.054)+(2.023), (I-339)+(1.054)+(2.024), (I-339)+(1.054)+(2.025), (I-339)+(1.054)+(2.026), (I-339)+(1.054)+(2.027), (I-339)+(1.054)+(2.028), (I-339)+(1.054)+(2.029), (I-339)+(1.054)+(2.030), (I-339)+(1.054)+(2.031), (I-339)+(1.054)+(2.032), (I-339)+(1.054)+(2.033), (I-339)+(1.054)+(2.034), (I-339)+(1.054)+(2.035), (I-339)+(1.054)+(2.036), (I-339)+(1.054)+(2.037), (I-339)+(1.054)+(2.038), (I-339)+(1.054)+(2.039), (I-339)+(1.054)+(2.040), (I-339)+(1.054)+(2.041), (I-339)+(1.054)+(2.042), (I-339)+(1.054)+(2.043), (I-339)+(1.054)+(2.044), (I-339)+(1.054)+(2.045), (I-339)+(1.054)+(2.046), (I-339)+(1.054)+(2.047), (I-339)+(1.054)+(2.048), (I-339)+(1.054)+(2.049), (I-339)+(1.054)+(2.050), (I-339)+(1.054)+(2.051), (I-339)+(1.054)+(2.052), (I-339)+(1.054)+(2.053), (I-339)+(1.054)+(2.054), (I-339)+(1.054)+(2.055), (I-339)+(1.054)+(2.056), (I-339)+(1.054)+(2.057), (I-339)+(1.054)+(2.058), (I-339)+(1.054)+(2.059), (I-339)+(1.054)+(3.001), (I-339)+(1.054)+(3.002), (I-339)+(1.054)+(3.003), (I-339)+(1.054)+(3.004), (I-339)+(1.054)+(3.005), (I-339)+(1.054)+(3.006), (I-339)+(1.054)+(3.007), (I-339)+(1.054)+(3.008), (I-339)+(1.054)+(3.009), (I-339)+(1.054)+(3.010), (I-339)+(1.054)+(3.011), (I-339)+(1.054)+(3.012), (I-339)+(1.054)+(3.013), (I-339)+(1.054)+(3.014), (I-339)+(1.054)+(3.015), (I-339)+(1.054)+(3.016), (I-339)+(1.054)+(3.017), (I-339)+(1.054)+(3.018), (I-339)+(1.054)+(3.019), (I-339)+(1.054)+(3.020), (I-339)+(1.054)+(3.021), (I-339)+(1.054)+(3.022), (I-339)+(1.054)+(3.023), (I-339)+(1.054)+(3.024), (I-339)+(1.054)+(3.025), (I-339)+(1.054)+(3.026), (I-339)+(1.054)+(3.027), (I-339)+(1.054)+(3.028), (I-339)+(1.054)+(3.029), (I-339)+(1.054)+(3.030), (I-339)+(1.054)+(3.031), (I-339)+(1.054)+(5.001), (I-339)+(1.054)+(5.002), (I-339)+(1.054)+(5.003), (I-339)+(1.054)+(5.004), (I-339)+(1.054)+(5.005), (I-339)+(1.054)+(5.006), (I-339)+(1.054)+(5.007), (I-339)+(1.054)+(5.008), (I-339)+(1.054)+(5.009), (I-339)+(1.054)+(5.010), (I-339)+(1.054)+(5.011), (I-339)+(1.054)+(5.012), (I-339)+(1.054)+(5.013), (I-339)+(1.054)+(5.014), (I-339)+(1.054)+(5.015), (I-339)+(1.054)+(5.016), (I-339)+(1.054)+(5.017), (I-339)+(1.054)+(5.018), (I-339)+(1.054)+(5.019), (I-339)+(1.054)+(5.020), (I-339)+(1.054)+(5.021), (I-339)+(1.054)+(5.022), (I-339)+(1.054)+(5.023), (I-339)+(1.054)+(6.001), (I-339)+(1.054)+(6.002), (I-339)+(1.054)+(6.003), (I-339)+(1.054)+(6.004), (I-339)+(1.054)+(7.001), (I-339)+(1.054)+(7.002), (I-339)+(1.054)+(7.003), (I-339)+(1.054)+(7.004), (I-339)+(1.054)+(7.005), (I-339)+(1.054)+(7.006), (I-339)+(1.054)+(9.001), (I-339)+(1.054)+(9.002), (I-339)+(1.054)+(9.003), (I-339)+(1.054)+(9.004), (I-339)+(1.054)+(9.005), (I-339)+(1.054)+(9.006), (I-339)+(1.054)+(9.007), (I-339)+(1.054)+(9.008), (I-339)+(1.054)+(9.009), (I-339)+(1.054)+(14.001), (I-339)+(1.054)+(14.002), (I-339)+(1.054)+(15.008), (I-339)+(1.054)+(15.011), (I-339)+(1.054)+(15.012), (I-339)+(1.054)+(15.016), (I-339)+(1.054)+(15.025), (I-339)+(1.054)+(15.027), (I-339)+(1.054)+(15.047), (I-339)+(1.054)+(15.063), (I-339)+(1.054)+(15.064), (I-339)+(1.054)+(16.001), (I-339)+(1.054)+(16.002), (I-339)+(1.054)+(16.003), (I-339)+(1.054)+(16.004), (I-339)+(1.054)+(16.005), (I-339)+(1.054)+(16.006), (I-339)+(1.054)+(16.007), (I-339)+(1.054)+(16.008), (I-339)+(1.054)+(17.001), (I-339)+(1.054)+(17.002), (I-339)+(1.054)+(17.003), (I-339)+(1.054)+(17.004), (I-339)+(1.054)+(17.005), (I-339)+(1.054)+(17.006), (I-339)+(1.054)+(17.007), (I-339)+(1.054)+(17.008), (I-339)+(1.054)+(17.009), (I-339)+(1.054)+(17.010), (I-339)+(1.054)+(17.011), (I-339)+(1.054)+(17.012), (I-339)+(1.054)+(18.001), (I-339)+(1.055)+(1.056), (I-339)+(1.055)+(1.057), (I-339)+(1.055)+(1.058), (I-339)+(1.055)+(1.059), (I-339)+(1.055)+(1.060), (I-339)+(1.055)+(1.061), (I-339)+(1.055)+(1.062), (I-339)+(1.055)+(1.063), (I-339)+(1.055)+(1.064), (I-339)+(1.055)+(1.065), (I-339)+(1.055)+(1.066), (I-339)+(1.055)+(1.067), (I-339)+(1.055)+(1.068), (I-339)+(1.055)+(1.069), (I-339)+(1.055)+(1.070), (I-339)+(1.055)+(1.071), (I-339)+(1.055)+(1.072), (I-339)+(1.055)+(1.073), (I-339)+(1.055)+(1.074), (I-339)+(1.055)+(1.075), (I-339)+(1.055)+(1.076), (I-339)+(1.055)+(1.077), (I-339)+(1.055)+(1.078), (I-339)+(1.055)+(1.079), (I-339)+(1.055)+(1.080), (I-339)+(1.055)+(1.081), (I-339)+(1.055)+(1.082), (I-339)+(1.055)+(1.083), (I-339)+(1.055)+(1.084), (I-339)+(1.055)+(1.085), (I-339)+(1.055)+(1.086), (I-339)+(1.055)+(1.087), (I-339)+(1.055)+(1.088), (I-339)+(1.055)+(1.089), (I-339)+(1.055)+(1.090), (I-339)+(1.055)+(1.091), (I-339)+(1.055)+(1.092), (I-339)+(1.055)+(2.001), (I-339)+(1.055)+(2.002), (I-339)+(1.055)+(2.003), (I-339)+(1.055)+(2.004), (I-339)+(1.055)+(2.005), (I-339)+(1.055)+(2.006), (I-339)+(1.055)+(2.007), (I-339)+(1.055)+(2.008), (I-339)+(1.055)+(2.009), (I-339)+(1.055)+(2.010), (I-339)+(1.055)+(2.011), (I-339)+(1.055)+(2.012), (I-339)+(1.055)+(2.013), (I-339)+(1.055)+(2.014), (I-339)+(1.055)+(2.015), (I-339)+(1.055)+(2.016), (I-339)+(1.055)+(2.017), (I-339)+(1.055)+(2.018), (I-339)+(1.055)+(2.019), (I-339)+(1.055)+(2.020), (I-339)+(1.055)+(2.021), (I-339)+(1.055)+(2.022), (I-339)+(1.055)+(2.023), (I-339)+(1.055)+(2.024), (I-339)+(1.055)+(2.025), (I-339)+(1.055)+(2.026), (I-339)+(1.055)+(2.027), (I-339)+(1.055)+(2.028), (I-339)+(1.055)+(2.029), (I-339)+(1.055)+(2.030), (I-339)+(1.055)+(2.031), (I-339)+(1.055)+(2.032), (I-339)+(1.055)+(2.033), (I-339)+(1.055)+(2.034), (I-339)+(1.055)+(2.035), (I-339)+(1.055)+(2.036), (I-339)+(1.055)+(2.037), (I-339)+(1.055)+(2.038), (I-339)+(1.055)+(2.039), (I-339)+(1.055)+(2.040), (I-339)+(1.055)+(2.041), (I-339)+(1.055)+(2.042), (I-339)+(1.055)+(2.043), (I-339)+(1.055)+(2.044), (I-339)+(1.055)+(2.045), (I-339)+(1.055)+(2.046), (I-339)+(1.055)+(2.047), (I-339)+(1.055)+(2.048), (I-339)+(1.055)+(2.049), (I-339)+(1.055)+(2.050), (I-339)+(1.055)+(2.051), (I-339)+(1.055)+(2.052), (I-339)+(1.055)+(2.053), (I-339)+(1.055)+(2.054), (I-339)+(1.055)+(2.055), (I-339)+(1.055)+(2.056), (I-339)+(1.055)+(2.057), (I-339)+(1.055)+(2.058), (I-339)+(1.055)+(2.059), (I-339)+(1.055)+(3.001), (I-339)+(1.055)+(3.002), (I-339)+(1.055)+(3.003), (I-339)+(1.055)+(3.004), (I-339)+(1.055)+(3.005), (I-339)+(1.055)+(3.006), (I-339)+(1.055)+(3.007), (I-339)+(1.055)+(3.008), (I-339)+(1.055)+(3.009), (I-339)+(1.055)+(3.010), (I-339)+(1.055)+(3.011), (I-339)+(1.055)+(3.012), (I-339)+(1.055)+(3.013), (I-339)+(1.055)+(3.014), (I-339)+(1.055)+(3.015), (I-339)+(1.055)+(3.016), (I-339)+(1.055)+(3.017), (I-339)+(1.055)+(3.018), (I-339)+(1.055)+(3.019), (I-339)+(1.055)+(3.020), (I-339)+(1.055)+(3.021), (I-339)+(1.055)+(3.022), (I-339)+(1.055)+(3.023), (I-339)+(1.055)+(3.024), (I-339)+(1.055)+(3.025), (I-339)+(1.055)+(3.026), (I-339)+(1.055)+(3.027), (I-339)+(1.055)+(3.028), (I-339)+(1.055)+(3.029), (I-339)+(1.055)+(3.030), (I-339)+(1.055)+(3.031), (I-339)+(1.055)+(5.001), (I-339)+(1.055)+(5.002), (I-339)+(1.055)+(5.003), (I-339)+(1.055)+(5.004), (I-339)+(1.055)+(5.005), (I-339)+(1.055)+(5.006), (I-339)+(1.055)+(5.007), (I-339)+(1.055)+(5.008), (I-339)+(1.055)+(5.009), (I-339)+(1.055)+(5.010), (I-339)+(1.055)+(5.011), (I-339)+(1.055)+(5.012), (I-339)+(1.055)+(5.013), (I-339)+(1.055)+(5.014), (I-339)+(1.055)+(5.015), (I-339)+(1.055)+(5.016), (I-339)+(1.055)+(5.017), (I-339)+(1.055)+(5.018), (I-339)+(1.055)+(5.019), (I-339)+(1.055)+(5.020), (I-339)+(1.055)+(5.021), (I-339)+(1.055)+(5.022), (I-339)+(1.055)+(5.023), (I-339)+(1.055)+(6.001), (I-339)+(1.055)+(6.002), (I-339)+(1.055)+(6.003), (I-339)+(1.055)+(6.004), (I-339)+(1.055)+(7.001), (I-339)+(1.055)+(7.002), (I-339)+(1.055)+(7.003), (I-339)+(1.055)+(7.004), (I-339)+(1.055)+(7.005), (I-339)+(1.055)+(7.006), (I-339)+(1.055)+(9.001), (I-339)+(1.055)+(9.002), (I-339)+(1.055)+(9.003), (I-339)+(1.055)+(9.004), (I-339)+(1.055)+(9.005), (I-339)+(1.055)+(9.006), (I-339)+(1.055)+(9.007), (I-339)+(1.055)+(9.008), (I-339)+(1.055)+(9.009), (I-339)+(1.055)+(14.001), (I-339)+(1.055)+(14.002), (I-339)+(1.055)+(15.008), (I-339)+(1.055)+(15.011), (I-339)+(1.055)+(15.012), (I-339)+(1.055)+(15.016), (I-339)+(1.055)+(15.025), (I-339)+(1.055)+(15.027), (I-339)+(1.055)+(15.047), (I-339)+(1.055)+(15.063), (I-339)+(1.055)+(15.064), (I-339)+(1.055)+(16.001), (I-339)+(1.055)+(16.002), (I-339)+(1.055)+(16.003), (I-339)+(1.055)+(16.004), (I-339)+(1.055)+(16.005), (I-339)+(1.055)+(16.006), (I-339)+(1.055)+(16.007), (I-339)+(1.055)+(16.008), (I-339)+(1.055)+(17.001), (I-339)+(1.055)+(17.002), (I-339)+(1.055)+(17.003), (I-339)+(1.055)+(17.004), (I-339)+(1.055)+(17.005), (I-339)+(1.055)+(17.006), (I-339)+(1.055)+(17.007), (I-339)+(1.055)+(17.008), (I-339)+(1.055)+(17.009), (I-339)+(1.055)+(17.010), (I-339)+(1.055)+(17.011), (I-339)+(1.055)+(17.012), (I-339)+(1.055)+(18.001), (I-339)+(1.056)+(1.057), (I-339)+(1.056)+(1.058), (I-339)+(1.056)+(1.059), (I-339)+(1.056)+(1.060), (I-339)+(1.056)+(1.061), (I-339)+(1.056)+(1.062), (I-339)+(1.056)+(1.063), (I-339)+(1.056)+(1.064), (I-339)+(1.056)+(1.065), (I-339)+(1.056)+(1.066), (I-339)+(1.056)+(1.067), (I-339)+(1.056)+(1.068), (I-339)+(1.056)+(1.069), (I-339)+(1.056)+(1.070), (I-339)+(1.056)+(1.071), (I-339)+(1.056)+(1.072), (I-339)+(1.056)+(1.073), (I-339)+(1.056)+(1.074), (I-339)+(1.056)+(1.075), (I-339)+(1.056)+(1.076), (I-339)+(1.056)+(1.077), (I-339)+(1.056)+(1.078), (I-339)+(1.056)+(1.079), (I-339)+(1.056)+(1.080), (I-339)+(1.056)+(1.081), (I-339)+(1.056)+(1.082), (I-339)+(1.056)+(1.083), (I-339)+(1.056)+(1.084), (I-339)+(1.056)+(1.085), (I-339)+(1.056)+(1.086), (I-339)+(1.056)+(1.087), (I-339)+(1.056)+(1.088), (I-339)+(1.056)+(1.089), (I-339)+(1.056)+(1.090), (I-339)+(1.056)+(1.091), (I-339)+(1.056)+(1.092), (I-339)+(1.056)+(2.001), (I-339)+(1.056)+(2.002), (I-339)+(1.056)+(2.003), (I-339)+(1.056)+(2.004), (I-339)+(1.056)+(2.005), (I-339)+(1.056)+(2.006), (I-339)+(1.056)+(2.007), (I-339)+(1.056)+(2.008), (I-339)+(1.056)+(2.009), (I-339)+(1.056)+(2.010), (I-339)+(1.056)+(2.011), (I-339)+(1.056)+(2.012), (I-339)+(1.056)+(2.013), (I-339)+(1.056)+(2.014), (I-339)+(1.056)+(2.015), (I-339)+(1.056)+(2.016), (I-339)+(1.056)+(2.017), (I-339)+(1.056)+(2.018), (I-339)+(1.056)+(2.019), (I-339)+(1.056)+(2.020), (I-339)+(1.056)+(2.021), (I-339)+(1.056)+(2.022), (I-339)+(1.056)+(2.023), (I-339)+(1.056)+(2.024), (I-339)+(1.056)+(2.025), (I-339)+(1.056)+(2.026), (I-339)+(1.056)+(2.027), (I-339)+(1.056)+(2.028), (I-339)+(1.056)+(2.029), (I-339)+(1.056)+(2.030), (I-339)+(1.056)+(2.031), (I-339)+(1.056)+(2.032), (I-339)+(1.056)+(2.033), (I-339)+(1.056)+(2.034), (I-339)+(1.056)+(2.035), (I-339)+(1.056)+(2.036), (I-339)+(1.056)+(2.037), (I-339)+(1.056)+(2.038), (I-339)+(1.056)+(2.039), (I-339)+(1.056)+(2.040), (I-339)+(1.056)+(2.041), (I-339)+(1.056)+(2.042), (I-339)+(1.056)+(2.043), (I-339)+(1.056)+(2.044), (I-339)+(1.056)+(2.045), (I-339)+(1.056)+(2.046), (I-339)+(1.056)+(2.047), (I-339)+(1.056)+(2.048), (I-339)+(1.056)+(2.049), (I-339)+(1.056)+(2.050), (I-339)+(1.056)+(2.051), (I-339)+(1.056)+(2.052), (I-339)+(1.056)+(2.053), (I-339)+(1.056)+(2.054), (I-339)+(1.056)+(2.055), (I-339)+(1.056)+(2.056), (I-339)+(1.056)+(2.057), (I-339)+(1.056)+(2.058), (I-339)+(1.056)+(2.059), (I-339)+(1.056)+(3.001), (I-339)+(1.056)+(3.002), (I-339)+(1.056)+(3.003), (I-339)+(1.056)+(3.004), (I-339)+(1.056)+(3.005), (I-339)+(1.056)+(3.006), (I-339)+(1.056)+(3.007), (I-339)+(1.056)+(3.008), (I-339)+(1.056)+(3.009), (I-339)+(1.056)+(3.010), (I-339)+(1.056)+(3.011), (I-339)+(1.056)+(3.012), (I-339)+(1.056)+(3.013), (I-339)+(1.056)+(3.014), (I-339)+(1.056)+(3.015), (I-339)+(1.056)+(3.016), (I-339)+(1.056)+(3.017), (I-339)+(1.056)+(3.018), (I-339)+(1.056)+(3.019), (I-339)+(1.056)+(3.020), (I-339)+(1.056)+(3.021), (I-339)+(1.056)+(3.022), (I-339)+(1.056)+(3.023), (I-339)+(1.056)+(3.024), (I-339)+(1.056)+(3.025), (I-339)+(1.056)+(3.026), (I-339)+(1.056)+(3.027), (I-339)+(1.056)+(3.028), (I-339)+(1.056)+(3.029), (I-339)+(1.056)+(3.030), (I-339)+(1.056)+(3.031), (I-339)+(1.056)+(5.001), (I-339)+(1.056)+(5.002), (I-339)+(1.056)+(5.003), (I-339)+(1.056)+(5.004), (I-339)+(1.056)+(5.005), (I-339)+(1.056)+(5.006), (I-339)+(1.056)+(5.007), (I-339)+(1.056)+(5.008), (I-339)+(1.056)+(5.009), (I-339)+(1.056)+(5.010), (I-339)+(1.056)+(5.011), (I-339)+(1.056)+(5.012), (I-339)+(1.056)+(5.013), (I-339)+(1.056)+(5.014), (I-339)+(1.056)+(5.015), (I-339)+(1.056)+(5.016), (I-339)+(1.056)+(5.017), (I-339)+(1.056)+(5.018), (I-339)+(1.056)+(5.019), (I-339)+(1.056)+(5.020), (I-339)+(1.056)+(5.021), (I-339)+(1.056)+(5.022), (I-339)+(1.056)+(5.023), (I-339)+(1.056)+(6.001), (I-339)+(1.056)+(6.002), (I-339)+(1.056)+(6.003), (I-339)+(1.056)+(6.004), (I-339)+(1.056)+(7.001), (I-339)+(1.056)+(7.002), (I-339)+(1.056)+(7.003), (I-339)+(1.056)+(7.004), (I-339)+(1.056)+(7.005), (I-339)+(1.056)+(7.006), (I-339)+(1.056)+(9.001), (I-339)+(1.056)+(9.002), (I-339)+(1.056)+(9.003), (I-339)+(1.056)+(9.004), (I-339)+(1.056)+(9.005), (I-339)+(1.056)+(9.006), (I-339)+(1.056)+(9.007), (I-339)+(1.056)+(9.008), (I-339)+(1.056)+(9.009), (I-339)+(1.056)+(14.001), (I-339)+(1.056)+(14.002), (I-339)+(1.056)+(15.008), (I-339)+(1.056)+(15.011), (I-339)+(1.056)+(15.012), (I-339)+(1.056)+(15.016), (I-339)+(1.056)+(15.025), (I-339)+(1.056)+(15.027), (I-339)+(1.056)+(15.047), (I-339)+(1.056)+(15.063), (I-339)+(1.056)+(15.064), (I-339)+(1.056)+(16.001), (I-339)+(1.056)+(16.002), (I-339)+(1.056)+(16.003), (I-339)+(1.056)+(16.004), (I-339)+(1.056)+(16.005), (I-339)+(1.056)+(16.006), (I-339)+(1.056)+(16.007), (I-339)+(1.056)+(16.008), (I-339)+(1.056)+(17.001), (I-339)+(1.056)+(17.002), (I-339)+(1.056)+(17.003), (I-339)+(1.056)+(17.004), (I-339)+(1.056)+(17.005), (I-339)+(1.056)+(17.006), (I-339)+(1.056)+(17.007), (I-339)+(1.056)+(17.008), (I-339)+(1.056)+(17.009), (I-339)+(1.056)+(17.010), (I-339)+(1.056)+(17.011), (I-339)+(1.056)+(17.012), (I-339)+(1.056)+(18.001), (I-339)+(1.057)+(1.058), (I-339)+(1.057)+(1.059), (I-339)+(1.057)+(1.060), (I-339)+(1.057)+(1.061), (I-339)+(1.057)+(1.062), (I-339)+(1.057)+(1.063), (I-339)+(1.057)+(1.064), (I-339)+(1.057)+(1.065), (I-339)+(1.057)+(1.066), (I-339)+(1.057)+(1.067), (I-339)+(1.057)+(1.068), (I-339)+(1.057)+(1.069), (I-339)+(1.057)+(1.070), (I-339)+(1.057)+(1.071), (I-339)+(1.057)+(1.072), (I-339)+(1.057)+(1.073), (I-339)+(1.057)+(1.074), (I-339)+(1.057)+(1.075), (I-339)+(1.057)+(1.076), (I-339)+(1.057)+(1.077), (I-339)+(1.057)+(1.078), (I-339)+(1.057)+(1.079), (I-339)+(1.057)+(1.080), (I-339)+(1.057)+(1.081), (I-339)+(1.057)+(1.082), (I-339)+(1.057)+(1.083), (I-339)+(1.057)+(1.084), (I-339)+(1.057)+(1.085), (I-339)+(1.057)+(1.086), (I-339)+(1.057)+(1.087), (I-339)+(1.057)+(1.088), (I-339)+(1.057)+(1.089), (I-339)+(1.057)+(1.090), (I-339)+(1.057)+(1.091), (I-339)+(1.057)+(1.092), (I-339)+(1.057)+(2.001), (I-339)+(1.057)+(2.002), (I-339)+(1.057)+(2.003), (I-339)+(1.057)+(2.004), (I-339)+(1.057)+(2.005), (I-339)+(1.057)+(2.006), (I-339)+(1.057)+(2.007), (I-339)+(1.057)+(2.008), (I-339)+(1.057)+(2.009), (I-339)+(1.057)+(2.010), (I-339)+(1.057)+(2.011), (I-339)+(1.057)+(2.012), (I-339)+(1.057)+(2.013), (I-339)+(1.057)+(2.014), (I-339)+(1.057)+(2.015), (I-339)+(1.057)+(2.016), (I-339)+(1.057)+(2.017), (I-339)+(1.057)+(2.018), (I-339)+(1.057)+(2.019), (I-339)+(1.057)+(2.020), (I-339)+(1.057)+(2.021), (I-339)+(1.057)+(2.022), (I-339)+(1.057)+(2.023), (I-339)+(1.057)+(2.024), (I-339)+(1.057)+(2.025), (I-339)+(1.057)+(2.026), (I-339)+(1.057)+(2.027), (I-339)+(1.057)+(2.028), (I-339)+(1.057)+(2.029), (I-339)+(1.057)+(2.030), (I-339)+(1.057)+(2.031), (I-339)+(1.057)+(2.032), (I-339)+(1.057)+(2.033), (I-339)+(1.057)+(2.034), (I-339)+(1.057)+(2.035), (I-339)+(1.057)+(2.036), (I-339)+(1.057)+(2.037), (I-339)+(1.057)+(2.038), (I-339)+(1.057)+(2.039), (I-339)+(1.057)+(2.040), (I-339)+(1.057)+(2.041), (I-339)+(1.057)+(2.042), (I-339)+(1.057)+(2.043), (I-339)+(1.057)+(2.044), (I-339)+(1.057)+(2.045), (I-339)+(1.057)+(2.046), (I-339)+(1.057)+(2.047), (I-339)+(1.057)+(2.048), (I-339)+(1.057)+(2.049), (I-339)+(1.057)+(2.050), (I-339)+(1.057)+(2.051), (I-339)+(1.057)+(2.052), (I-339)+(1.057)+(2.053), (I-339)+(1.057)+(2.054), (I-339)+(1.057)+(2.055), (I-339)+(1.057)+(2.056), (I-339)+(1.057)+(2.057), (I-339)+(1.057)+(2.058), (I-339)+(1.057)+(2.059), (I-339)+(1.057)+(3.001), (I-339)+(1.057)+(3.002), (I-339)+(1.057)+(3.003), (I-339)+(1.057)+(3.004), (I-339)+(1.057)+(3.005), (I-339)+(1.057)+(3.006), (I-339)+(1.057)+(3.007), (I-339)+(1.057)+(3.008), (I-339)+(1.057)+(3.009), (I-339)+(1.057)+(3.010), (I-339)+(1.057)+(3.011), (I-339)+(1.057)+(3.012), (I-339)+(1.057)+(3.013), (I-339)+(1.057)+(3.014), (I-339)+(1.057)+(3.015), (I-339)+(1.057)+(3.016), (I-339)+(1.057)+(3.017), (I-339)+(1.057)+(3.018), (I-339)+(1.057)+(3.019), (I-339)+(1.057)+(3.020), (I-339)+(1.057)+(3.021), (I-339)+(1.057)+(3.022), (I-339)+(1.057)+(3.023), (I-339)+(1.057)+(3.024), (I-339)+(1.057)+(3.025), (I-339)+(1.057)+(3.026), (I-339)+(1.057)+(3.027), (I-339)+(1.057)+(3.028), (I-339)+(1.057)+(3.029), (I-339)+(1.057)+(3.030), (I-339)+(1.057)+(3.031), (I-339)+(1.057)+(5.001), (I-339)+(1.057)+(5.002), (I-339)+(1.057)+(5.003), (I-339)+(1.057)+(5.004), (I-339)+(1.057)+(5.005), (I-339)+(1.057)+(5.006), (I-339)+(1.057)+(5.007), (I-339)+(1.057)+(5.008), (I-339)+(1.057)+(5.009), (I-339)+(1.057)+(5.010), (I-339)+(1.057)+(5.011), (I-339)+(1.057)+(5.012), (I-339)+(1.057)+(5.013), (I-339)+(1.057)+(5.014), (I-339)+(1.057)+(5.015), (I-339)+(1.057)+(5.016), (I-339)+(1.057)+(5.017), (I-339)+(1.057)+(5.018), (I-339)+(1.057)+(5.019), (I-339)+(1.057)+(5.020), (I-339)+(1.057)+(5.021), (I-339)+(1.057)+(5.022), (I-339)+(1.057)+(5.023), (I-339)+(1.057)+(6.001), (I-339)+(1.057)+(6.002), (I-339)+(1.057)+(6.003), (I-339)+(1.057)+(6.004), (I-339)+(1.057)+(7.001), (I-339)+(1.057)+(7.002), (I-339)+(1.057)+(7.003), (I-339)+(1.057)+(7.004), (I-339)+(1.057)+(7.005), (I-339)+(1.057)+(7.006), (I-339)+(1.057)+(9.001), (I-339)+(1.057)+(9.002), (I-339)+(1.057)+(9.003), (I-339)+(1.057)+(9.004), (I-339)+(1.057)+(9.005), (I-339)+(1.057)+(9.006), (I-339)+(1.057)+(9.007), (I-339)+(1.057)+(9.008), (I-339)+(1.057)+(9.009), (I-339)+(1.057)+(14.001), (I-339)+(1.057)+(14.002), (I-339)+(1.057)+(15.008), (I-339)+(1.057)+(15.011), (I-339)+(1.057)+(15.012), (I-339)+(1.057)+(15.016), (I-339)+(1.057)+(15.025), (I-339)+(1.057)+(15.027), (I-339)+(1.057)+(15.047), (I-339)+(1.057)+(15.063), (I-339)+(1.057)+(15.064), (I-339)+(1.057)+(16.001), (I-339)+(1.057)+(16.002), (I-339)+(1.057)+(16.003), (I-339)+(1.057)+(16.004), (I-339)+(1.057)+(16.005), (I-339)+(1.057)+(16.006), (I-339)+(1.057)+(16.007), (I-339)+(1.057)+(16.008), (I-339)+(1.057)+(17.001), (I-339)+(1.057)+(17.002), (I-339)+(1.057)+(17.003), (I-339)+(1.057)+(17.004), (I-339)+(1.057)+(17.005), (I-339)+(1.057)+(17.006), (I-339)+(1.057)+(17.007), (I-339)+(1.057)+(17.008), (I-339)+(1.057)+(17.009), (I-339)+(1.057)+(17.010), (I-339)+(1.057)+(17.011), (I-339)+(1.057)+(17.012), (I-339)+(1.057)+(18.001), (I-339)+(1.058)+(1.059), (I-339)+(1.058)+(1.060), (I-339)+(1.058)+(1.061), (I-339)+(1.058)+(1.062), (I-339)+(1.058)+(1.063), (I-339)+(1.058)+(1.064), (I-339)+(1.058)+(1.065), (I-339)+(1.058)+(1.066), (I-339)+(1.058)+(1.067), (I-339)+(1.058)+(1.068), (I-339)+(1.058)+(1.069), (I-339)+(1.058)+(1.070), (I-339)+(1.058)+(1.071), (I-339)+(1.058)+(1.072), (I-339)+(1.058)+(1.073), (I-339)+(1.058)+(1.074), (I-339)+(1.058)+(1.075), (I-339)+(1.058)+(1.076), (I-339)+(1.058)+(1.077), (I-339)+(1.058)+(1.078), (I-339)+(1.058)+(1.079), (I-339)+(1.058)+(1.080), (I-339)+(1.058)+(1.081), (I-339)+(1.058)+(1.082), (I-339)+(1.058)+(1.083), (I-339)+(1.058)+(1.084), (I-339)+(1.058)+(1.085), (I-339)+(1.058)+(1.086), (I-339)+(1.058)+(1.087), (I-339)+(1.058)+(1.088), (I-339)+(1.058)+(1.089), (I-339)+(1.058)+(1.090), (I-339)+(1.058)+(1.091), (I-339)+(1.058)+(1.092), (I-339)+(1.058)+(2.001), (I-339)+(1.058)+(2.002), (I-339)+(1.058)+(2.003), (I-339)+(1.058)+(2.004), (I-339)+(1.058)+(2.005), (I-339)+(1.058)+(2.006), (I-339)+(1.058)+(2.007), (I-339)+(1.058)+(2.008), (I-339)+(1.058)+(2.009), (I-339)+(1.058)+(2.010), (I-339)+(1.058)+(2.011), (I-339)+(1.058)+(2.012), (I-339)+(1.058)+(2.013), (I-339)+(1.058)+(2.014), (I-339)+(1.058)+(2.015), (I-339)+(1.058)+(2.016), (I-339)+(1.058)+(2.017), (I-339)+(1.058)+(2.018), (I-339)+(1.058)+(2.019), (I-339)+(1.058)+(2.020), (I-339)+(1.058)+(2.021), (I-339)+(1.058)+(2.022), (I-339)+(1.058)+(2.023), (I-339)+(1.058)+(2.024), (I-339)+(1.058)+(2.025), (I-339)+(1.058)+(2.026), (I-339)+(1.058)+(2.027), (I-339)+(1.058)+(2.028), (I-339)+(1.058)+(2.029), (I-339)+(1.058)+(2.030), (I-339)+(1.058)+(2.031), (I-339)+(1.058)+(2.032), (I-339)+(1.058)+(2.033), (I-339)+(1.058)+(2.034), (I-339)+(1.058)+(2.035), (I-339)+(1.058)+(2.036), (I-339)+(1.058)+(2.037), (I-339)+(1.058)+(2.038), (I-339)+(1.058)+(2.039), (I-339)+(1.058)+(2.040), (I-339)+(1.058)+(2.041), (I-339)+(1.058)+(2.042), (I-339)+(1.058)+(2.043), (I-339)+(1.058)+(2.044), (I-339)+(1.058)+(2.045), (I-339)+(1.058)+(2.046), (I-339)+(1.058)+(2.047), (I-339)+(1.058)+(2.048), (I-339)+(1.058)+(2.049), (I-339)+(1.058)+(2.050), (I-339)+(1.058)+(2.051), (I-339)+(1.058)+(2.052), (I-339)+(1.058)+(2.053), (I-339)+(1.058)+(2.054), (I-339)+(1.058)+(2.055), (I-339)+(1.058)+(2.056), (I-339)+(1.058)+(2.057), (I-339)+(1.058)+(2.058), (I-339)+(1.058)+(2.059), (I-339)+(1.058)+(3.001), (I-339)+(1.058)+(3.002), (I-339)+(1.058)+(3.003), (I-339)+(1.058)+(3.004), (I-339)+(1.058)+(3.005), (I-339)+(1.058)+(3.006), (I-339)+(1.058)+(3.007), (I-339)+(1.058)+(3.008), (I-339)+(1.058)+(3.009), (I-339)+(1.058)+(3.010), (I-339)+(1.058)+(3.011), (I-339)+(1.058)+(3.012), (I-339)+(1.058)+(3.013), (I-339)+(1.058)+(3.014), (I-339)+(1.058)+(3.015), (I-339)+(1.058)+(3.016), (I-339)+(1.058)+(3.017), (I-339)+(1.058)+(3.018), (I-339)+(1.058)+(3.019), (I-339)+(1.058)+(3.020), (I-339)+(1.058)+(3.021), (I-339)+(1.058)+(3.022), (I-339)+(1.058)+(3.023), (I-339)+(1.058)+(3.024), (I-339)+(1.058)+(3.025), (I-339)+(1.058)+(3.026), (I-339)+(1.058)+(3.027), (I-339)+(1.058)+(3.028), (I-339)+(1.058)+(3.029), (I-339)+(1.058)+(3.030), (I-339)+(1.058)+(3.031), (I-339)+(1.058)+(5.001), (I-339)+(1.058)+(5.002), (I-339)+(1.058)+(5.003), (I-339)+(1.058)+(5.004), (I-339)+(1.058)+(5.005), (I-339)+(1.058)+(5.006), (I-339)+(1.058)+(5.007), (I-339)+(1.058)+(5.008), (I-339)+(1.058)+(5.009), (I-339)+(1.058)+(5.010), (I-339)+(1.058)+(5.011), (I-339)+(1.058)+(5.012), (I-339)+(1.058)+(5.013), (I-339)+(1.058)+(5.014), (I-339)+(1.058)+(5.015), (I-339)+(1.058)+(5.016), (I-339)+(1.058)+(5.017), (I-339)+(1.058)+(5.018), (I-339)+(1.058)+(5.019), (I-339)+(1.058)+(5.020), (I-339)+(1.058)+(5.021), (I-339)+(1.058)+(5.022), (I-339)+(1.058)+(5.023), (I-339)+(1.058)+(6.001), (I-339)+(1.058)+(6.002), (I-339)+(1.058)+(6.003), (I-339)+(1.058)+(6.004), (I-339)+(1.058)+(7.001), (I-339)+(1.058)+(7.002), (I-339)+(1.058)+(7.003), (I-339)+(1.058)+(7.004), (I-339)+(1.058)+(7.005), (I-339)+(1.058)+(7.006), (I-339)+(1.058)+(9.001), (I-339)+(1.058)+(9.002), (I-339)+(1.058)+(9.003), (I-339)+(1.058)+(9.004), (I-339)+(1.058)+(9.005), (I-339)+(1.058)+(9.006), (I-339)+(1.058)+(9.007), (I-339)+(1.058)+(9.008), (I-339)+(1.058)+(9.009), (I-339)+(1.058)+(14.001), (I-339)+(1.058)+(14.002), (I-339)+(1.058)+(15.008), (I-339)+(1.058)+(15.011), (I-339)+(1.058)+(15.012), (I-339)+(1.058)+(15.016), (I-339)+(1.058)+(15.025), (I-339)+(1.058)+(15.027), (I-339)+(1.058)+(15.047), (I-339)+(1.058)+(15.063), (I-339)+(1.058)+(15.064), (I-339)+(1.058)+(16.001), (I-339)+(1.058)+(16.002), (I-339)+(1.058)+(16.003), (I-339)+(1.058)+(16.004), (I-339)+(1.058)+(16.005), (I-339)+(1.058)+(16.006), (I-339)+(1.058)+(16.007), (I-339)+(1.058)+(16.008), (I-339)+(1.058)+(17.001), (I-339)+(1.058)+(17.002), (I-339)+(1.058)+(17.003), (I-339)+(1.058)+(17.004), (I-339)+(1.058)+(17.005), (I-339)+(1.058)+(17.006), (I-339)+(1.058)+(17.007), (I-339)+(1.058)+(17.008), (I-339)+(1.058)+(17.009), (I-339)+(1.058)+(17.010), (I-339)+(1.058)+(17.011), (I-339)+(1.058)+(17.012), (I-339)+(1.058)+(18.001),
(I-339)+(1.059)+(1.060), (I-339)+(1.059)+(1.061), (I-339)+(1.059)+(1.062), (I-339)+(1.059)+(1.063), (I-339)+(1.059)+(1.064), (I-339)+(1.059)+(1.065), (I-339)+(1.059)+(1.066), (I-339)+(1.059)+(1.067), (I-339)+(1.059)+(1.068), (I-339)+(1.059)+(1.069), (I-339)+(1.059)+(1.070), (I-339)+(1.059)+(1.071), (I-339)+(1.059)+(1.072), (I-339)+(1.059)+(1.073), (I-339)+(1.059)+(1.074), (I-339)+(1.059)+(1.075), (I-339)+(1.059)+(1.076), (I-339)+(1.059)+(1.077), (I-339)+(1.059)+(1.078), (I-339)+(1.059)+(1.079), (I-339)+(1.059)+(1.080), (I-339)+(1.059)+(1.081), (I-339)+(1.059)+(1.082), (I-339)+(1.059)+(1.083), (I-339)+(1.059)+(1.084), (I-339)+(1.059)+(1.085), (I-339)+(1.059)+(1.086), (I-339)+(1.059)+(1.087), (I-339)+(1.059)+(1.088), (I-339)+(1.059)+(1.089), (I-339)+(1.059)+(1.090), (I-339)+(1.059)+(1.091), (I-339)+(1.059)+(1.092), (I-339)+(1.059)+(2.001), (I-339)+(1.059)+(2.002), (I-339)+(1.059)+(2.003), (I-339)+(1.059)+(2.004), (I-339)+(1.059)+(2.005), (I-339)+(1.059)+(2.006), (I-339)+(1.059)+(2.007), (I-339)+(1.059)+(2.008), (I-339)+(1.059)+(2.009), (I-339)+(1.059)+(2.010), (I-339)+(1.059)+(2.011), (I-339)+(1.059)+(2.012), (I-339)+(1.059)+(2.013), (I-339)+(1.059)+(2.014), (I-339)+(1.059)+(2.015), (I-339)+(1.059)+(2.016), (I-339)+(1.059)+(2.017), (I-339)+(1.059)+(2.018), (I-339)+(1.059)+(2.019), (I-339)+(1.059)+(2.020), (I-339)+(1.059)+(2.021), (I-339)+(1.059)+(2.022), (I-339)+(1.059)+(2.023), (I-339)+(1.059)+(2.024), (I-339)+(1.059)+(2.025), (I-339)+(1.059)+(2.026), (I-339)+(1.059)+(2.027), (I-339)+(1.059)+(2.028), (I-339)+(1.059)+(2.029), (I-339)+(1.059)+(2.030), (I-339)+(1.059)+(2.031), (I-339)+(1.059)+(2.032), (I-339)+(1.059)+(2.033), (I-339)+(1.059)+(2.034), (I-339)+(1.059)+(2.035), (I-339)+(1.059)+(2.036), (I-339)+(1.059)+(2.037), (I-339)+(1.059)+(2.038), (I-339)+(1.059)+(2.039), (I-339)+(1.059)+(2.040), (I-339)+(1.059)+(2.041), (I-339)+(1.059)+(2.042), (I-339)+(1.059)+(2.043), (I-339)+(1.059)+(2.044), (I-339)+(1.059)+(2.045), (I-339)+(1.059)+(2.046), (I-339)+(1.059)+(2.047), (I-339)+(1.059)+(2.048), (I-339)+(1.059)+(2.049), (I-339)+(1.059)+(2.050), (I-339)+(1.059)+(2.051), (I-339)+(1.059)+(2.052), (I-339)+(1.059)+(2.053), (I-339)+(1.059)+(2.054), (I-339)+(1.059)+(2.055), (I-339)+(1.059)+(2.056), (I-339)+(1.059)+(2.057), (I-339)+(1.059)+(2.058), (I-339)+(1.059)+(2.059), (I-339)+(1.059)+(3.001), (I-339)+(1.059)+(3.002), (I-339)+(1.059)+(3.003), (I-339)+(1.059)+(3.004), (I-339)+(1.059)+(3.005), (I-339)+(1.059)+(3.006), (I-339)+(1.059)+(3.007), (I-339)+(1.059)+(3.008), (I-339)+(1.059)+(3.009), (I-339)+(1.059)+(3.010), (I-339)+(1.059)+(3.011), (I-339)+(1.059)+(3.012), (I-339)+(1.059)+(3.013), (I-339)+(1.059)+(3.014), (I-339)+(1.059)+(3.015), (I-339)+(1.059)+(3.016), (I-339)+(1.059)+(3.017), (I-339)+(1.059)+(3.018), (I-339)+(1.059)+(3.019), (I-339)+(1.059)+(3.020), (I-339)+(1.059)+(3.021), (I-339)+(1.059)+(3.022), (I-339)+(1.059)+(3.023), (I-339)+(1.059)+(3.024), (I-339)+(1.059)+(3.025), (I-339)+(1.059)+(3.026), (I-339)+(1.059)+(3.027), (I-339)+(1.059)+(3.028), (I-339)+(1.059)+(3.029), (I-339)+(1.059)+(3.030), (I-339)+(1.059)+(3.031), (I-339)+(1.059)+(5.001), (I-339)+(1.059)+(5.002), (I-339)+(1.059)+(5.003), (I-339)+(1.059)+(5.004), (I-339)+(1.059)+(5.005), (I-339)+(1.059)+(5.006), (I-339)+(1.059)+(5.007), (I-339)+(1.059)+(5.008), (I-339)+(1.059)+(5.009), (I-339)+(1.059)+(5.010), (I-339)+(1.059)+(5.011), (I-339)+(1.059)+(5.012), (I-339)+(1.059)+(5.013), (I-339)+(1.059)+(5.014), (I-339)+(1.059)+(5.015), (I-339)+(1.059)+(5.016), (I-339)+(1.059)+(5.017), (I-339)+(1.059)+(5.018), (I-339)+(1.059)+(5.019), (I-339)+(1.059)+(5.020), (I-339)+(1.059)+(5.021), (I-339)+(1.059)+(5.022), (I-339)+(1.059)+(5.023), (I-339)+(1.059)+(6.001), (I-339)+(1.059)+(6.002), (I-339)+(1.059)+(6.003), (I-339)+(1.059)+(6.004), (I-339)+(1.059)+(7.001), (I-339)+(1.059)+(7.002), (I-339)+(1.059)+(7.003), (I-339)+(1.059)+(7.004), (I-339)+(1.059)+(7.005), (I-339)+(1.059)+(7.006), (I-339)+(1.059)+(9.001), (I-339)+(1.059)+(9.002), (I-339)+(1.059)+(9.003), (I-339)+(1.059)+(9.004), (I-339)+(1.059)+(9.005), (I-339)+(1.059)+(9.006), (I-339)+(1.059)+(9.007), (I-339)+(1.059)+(9.008), (I-339)+(1.059)+(9.009), (I-339)+(1.059)+(14.001), (I-339)+(1.059)+(14.002), (I-339)+(1.059)+(15.008), (I-339)+(1.059)+(15.011), (I-339)+(1.059)+(15.012), (I-339)+(1.059)+(15.016), (I-339)+(1.059)+(15.025), (I-339)+(1.059)+(15.027), (I-339)+(1.059)+(15.047), (I-339)+(1.059)+(15.063), (I-339)+(1.059)+(15.064), (I-339)+(1.059)+(16.001), (I-339)+(1.059)+(16.002), (I-339)+(1.059)+(16.003), (I-339)+(1.059)+(16.004), (I-339)+(1.059)+(16.005), (I-339)+(1.059)+(16.006), (I-339)+(1.059)+(16.007), (I-339)+(1.059)+(16.008), (I-339)+(1.059)+(17.001), (I-339)+(1.059)+(17.002), (I-339)+(1.059)+(17.003), (I-339)+(1.059)+(17.004), (I-339)+(1.059)+(17.005), (I-339)+(1.059)+(17.006), (I-339)+(1.059)+(17.007), (I-339)+(1.059)+(17.008), (I-339)+(1.059)+(17.009), (I-339)+(1.059)+(17.010), (I-339)+(1.059)+(17.011), (I-339)+(1.059)+(17.012), (I-339)+(1.059)+(18.001), (I-339)+(1.060)+(1.061), (I-339)+(1.060)+(1.062), (I-339)+(1.060)+(1.063), (I-339)+(1.060)+(1.064), (I-339)+(1.060)+(1.065), (I-339)+(1.060)+(1.066), (I-339)+(1.060)+(1.067), (I-339)+(1.060)+(1.068), (I-339)+(1.060)+(1.069), (I-339)+(1.060)+(1.070), (I-339)+(1.060)+(1.071), (I-339)+(1.060)+(1.072), (I-339)+(1.060)+(1.073), (I-339)+(1.060)+(1.074), (I-339)+(1.060)+(1.075), (I-339)+(1.060)+(1.076), (I-339)+(1.060)+(1.077), (I-339)+(1.060)+(1.078), (I-339)+(1.060)+(1.079), (I-339)+(1.060)+(1.080), (I-339)+(1.060)+(1.081), (I-339)+(1.060)+(1.082), (I-339)+(1.060)+(1.083), (I-339)+(1.060)+(1.084), (I-339)+(1.060)+(1.085), (I-339)+(1.060)+(1.086), (I-339)+(1.060)+(1.087), (I-339)+(1.060)+(1.088), (I-339)+(1.060)+(1.089), (I-339)+(1.060)+(1.090), (I-339)+(1.060)+(1.091), (I-339)+(1.060)+(1.092), (I-339)+(1.060)+(2.001), (I-339)+(1.060)+(2.002), (I-339)+(1.060)+(2.003), (I-339)+(1.060)+(2.004), (I-339)+(1.060)+(2.005), (I-339)+(1.060)+(2.006), (I-339)+(1.060)+(2.007), (I-339)+(1.060)+(2.008), (I-339)+(1.060)+(2.009), (I-339)+(1.060)+(2.010), (I-339)+(1.060)+(2.011), (I-339)+(1.060)+(2.012), (I-339)+(1.060)+(2.013), (I-339)+(1.060)+(2.014), (I-339)+(1.060)+(2.015), (I-339)+(1.060)+(2.016), (I-339)+(1.060)+(2.017), (I-339)+(1.060)+(2.018), (I-339)+(1.060)+(2.019), (I-339)+(1.060)+(2.020), (I-339)+(1.060)+(2.021), (I-339)+(1.060)+(2.022), (I-339)+(1.060)+(2.023), (I-339)+(1.060)+(2.024), (I-339)+(1.060)+(2.025), (I-339)+(1.060)+(2.026), (I-339)+(1.060)+(2.027), (I-339)+(1.060)+(2.028), (I-339)+(1.060)+(2.029), (I-339)+(1.060)+(2.030), (I-339)+(1.060)+(2.031), (I-339)+(1.060)+(2.032), (I-339)+(1.060)+(2.033), (I-339)+(1.060)+(2.034), (I-339)+(1.060)+(2.035), (I-339)+(1.060)+(2.036), (I-339)+(1.060)+(2.037), (I-339)+(1.060)+(2.038), (I-339)+(1.060)+(2.039), (I-339)+(1.060)+(2.040), (I-339)+(1.060)+(2.041), (I-339)+(1.060)+(2.042), (I-339)+(1.060)+(2.043), (I-339)+(1.060)+(2.044), (I-339)+(1.060)+(2.045), (I-339)+(1.060)+(2.046), (I-339)+(1.060)+(2.047), (I-339)+(1.060)+(2.048), (I-339)+(1.060)+(2.049), (I-339)+(1.060)+(2.050), (I-339)+(1.060)+(2.051), (I-339)+(1.060)+(2.052), (I-339)+(1.060)+(2.053), (I-339)+(1.060)+(2.054), (I-339)+(1.060)+(2.055), (I-339)+(1.060)+(2.056), (I-339)+(1.060)+(2.057), (I-339)+(1.060)+(2.058), (I-339)+(1.060)+(2.059), (I-339)+(1.060)+(3.001), (I-339)+(1.060)+(3.002), (I-339)+(1.060)+(3.003), (I-339)+(1.060)+(3.004), (I-339)+(1.060)+(3.005), (I-339)+(1.060)+(3.006), (I-339)+(1.060)+(3.007), (I-339)+(1.060)+(3.008), (I-339)+(1.060)+(3.009), (I-339)+(1.060)+(3.010), (I-339)+(1.060)+(3.011), (I-339)+(1.060)+(3.012), (I-339)+(1.060)+(3.013), (I-339)+(1.060)+(3.014), (I-339)+(1.060)+(3.015), (I-339)+(1.060)+(3.016), (I-339)+(1.060)+(3.017), (I-339)+(1.060)+(3.018), (I-339)+(1.060)+(3.019), (I-339)+(1.060)+(3.020), (I-339)+(1.060)+(3.021), (I-339)+(1.060)+(3.022), (I-339)+(1.060)+(3.023), (I-339)+(1.060)+(3.024), (I-339)+(1.060)+(3.025), (I-339)+(1.060)+(3.026), (I-339)+(1.060)+(3.027), (I-339)+(1.060)+(3.028), (I-339)+(1.060)+(3.029), (I-339)+(1.060)+(3.030), (I-339)+(1.060)+(3.031), (I-339)+(1.060)+(5.001), (I-339)+(1.060)+(5.002), (I-339)+(1.060)+(5.003), (I-339)+(1.060)+(5.004), (I-339)+(1.060)+(5.005), (I-339)+(1.060)+(5.006), (I-339)+(1.060)+(5.007), (I-339)+(1.060)+(5.008), (I-339)+(1.060)+(5.009), (I-339)+(1.060)+(5.010), (I-339)+(1.060)+(5.011), (I-339)+(1.060)+(5.012), (I-339)+(1.060)+(5.013), (I-339)+(1.060)+(5.014), (I-339)+(1.060)+(5.015), (I-339)+(1.060)+(5.016), (I-339)+(1.060)+(5.017), (I-339)+(1.060)+(5.018), (I-339)+(1.060)+(5.019), (I-339)+(1.060)+(5.020), (I-339)+(1.060)+(5.021), (I-339)+(1.060)+(5.022), (I-339)+(1.060)+(5.023), (I-339)+(1.060)+(6.001), (I-339)+(1.060)+(6.002), (I-339)+(1.060)+(6.003), (I-339)+(1.060)+(6.004), (I-339)+(1.060)+(7.001), (I-339)+(1.060)+(7.002), (I-339)+(1.060)+(7.003), (I-339)+(1.060)+(7.004), (I-339)+(1.060)+(7.005), (I-339)+(1.060)+(7.006), (I-339)+(1.060)+(9.001), (I-339)+(1.060)+(9.002), (I-339)+(1.060)+(9.003), (I-339)+(1.060)+(9.004), (I-339)+(1.060)+(9.005), (I-339)+(1.060)+(9.006), (I-339)+(1.060)+(9.007), (I-339)+(1.060)+(9.008), (I-339)+(1.060)+(9.009), (I-339)+(1.060)+(14.001), (I-339)+(1.060)+(14.002), (I-339)+(1.060)+(15.008), (I-339)+(1.060)+(15.011), (I-339)+(1.060)+(15.012), (I-339)+(1.060)+(15.016), (I-339)+(1.060)+(15.025), (I-339)+(1.060)+(15.027), (I-339)+(1.060)+(15.047), (I-339)+(1.060)+(15.063), (I-339)+(1.060)+(15.064), (I-339)+(1.060)+(16.001), (I-339)+(1.060)+(16.002), (I-339)+(1.060)+(16.003), (I-339)+(1.060)+(16.004), (I-339)+(1.060)+(16.005), (I-339)+(1.060)+(16.006), (I-339)+(1.060)+(16.007), (I-339)+(1.060)+(16.008), (I-339)+(1.060)+(17.001), (I-339)+(1.060)+(17.002), (I-339)+(1.060)+(17.003), (I-339)+(1.060)+(17.004), (I-339)+(1.060)+(17.005), (I-339)+(1.060)+(17.006), (I-339)+(1.060)+(17.007), (I-339)+(1.060)+(17.008), (I-339)+(1.060)+(17.009), (I-339)+(1.060)+(17.010), (I-339)+(1.060)+(17.011), (I-339)+(1.060)+(17.012), (I-339)+(1.060)+(18.001), (I-339)+(1.061)+(1.062), (I-339)+(1.061)+(1.063), (I-339)+(1.061)+(1.064), (I-339)+(1.061)+(1.065), (I-339)+(1.061)+(1.066), (I-339)+(1.061)+(1.067), (I-339)+(1.061)+(1.068), (I-339)+(1.061)+(1.069), (I-339)+(1.061)+(1.070), (I-339)+(1.061)+(1.071), (I-339)+(1.061)+(1.072), (I-339)+(1.061)+(1.073), (I-339)+(1.061)+(1.074), (I-339)+(1.061)+(1.075), (I-339)+(1.061)+(1.076), (I-339)+(1.061)+(1.077), (I-339)+(1.061)+(1.078), (I-339)+(1.061)+(1.079), (I-339)+(1.061)+(1.080), (I-339)+(1.061)+(1.081), (I-339)+(1.061)+(1.082), (I-339)+(1.061)+(1.083), (I-339)+(1.061)+(1.084), (I-339)+(1.061)+(1.085), (I-339)+(1.061)+(1.086), (I-339)+(1.061)+(1.087), (I-339)+(1.061)+(1.088), (I-339)+(1.061)+(1.089), (I-339)+(1.061)+(1.090), (I-339)+(1.061)+(1.091), (I-339)+(1.061)+(1.092), (I-339)+(1.061)+(2.001), (I-339)+(1.061)+(2.002), (I-339)+(1.061)+(2.003), (I-339)+(1.061)+(2.004), (I-339)+(1.061)+(2.005), (I-339)+(1.061)+(2.006), (I-339)+(1.061)+(2.007), (I-339)+(1.061)+(2.008), (I-339)+(1.061)+(2.009), (I-339)+(1.061)+(2.010), (I-339)+(1.061)+(2.011), (I-339)+(1.061)+(2.012), (I-339)+(1.061)+(2.013), (I-339)+(1.061)+(2.014), (I-339)+(1.061)+(2.015), (I-339)+(1.061)+(2.016), (I-339)+(1.061)+(2.017), (I-339)+(1.061)+(2.018), (I-339)+(1.061)+(2.019), (I-339)+(1.061)+(2.020), (I-339)+(1.061)+(2.021), (I-339)+(1.061)+(2.022), (I-339)+(1.061)+(2.023), (I-339)+(1.061)+(2.024), (I-339)+(1.061)+(2.025), (I-339)+(1.061)+(2.026), (I-339)+(1.061)+(2.027), (I-339)+(1.061)+(2.028), (I-339)+(1.061)+(2.029), (I-339)+(1.061)+(2.030), (I-339)+(1.061)+(2.031), (I-339)+(1.061)+(2.032), (I-339)+(1.061)+(2.033), (I-339)+(1.061)+(2.034), (I-339)+(1.061)+(2.035), (I-339)+(1.061)+(2.036), (I-339)+(1.061)+(2.037), (I-339)+(1.061)+(2.038), (I-339)+(1.061)+(2.039), (I-339)+(1.061)+(2.040), (I-339)+(1.061)+(2.041), (I-339)+(1.061)+(2.042), (I-339)+(1.061)+(2.043), (I-339)+(1.061)+(2.044), (I-339)+(1.061)+(2.045), (I-339)+(1.061)+(2.046), (I-339)+(1.061)+(2.047), (I-339)+(1.061)+(2.048), (I-339)+(1.061)+(2.049), (I-339)+(1.061)+(2.050), (I-339)+(1.061)+(2.051), (I-339)+(1.061)+(2.052), (I-339)+(1.061)+(2.053), (I-339)+(1.061)+(2.054), (I-339)+(1.061)+(2.055), (I-339)+(1.061)+(2.056), (I-339)+(1.061)+(2.057), (I-339)+(1.061)+(2.058), (I-339)+(1.061)+(2.059), (I-339)+(1.061)+(3.001), (I-339)+(1.061)+(3.002), (I-339)+(1.061)+(3.003), (I-339)+(1.061)+(3.004), (I-339)+(1.061)+(3.005), (I-339)+(1.061)+(3.006), (I-339)+(1.061)+(3.007), (I-339)+(1.061)+(3.008), (I-339)+(1.061)+(3.009), (I-339)+(1.061)+(3.010), (I-339)+(1.061)+(3.011), (I-339)+(1.061)+(3.012), (I-339)+(1.061)+(3.013), (I-339)+(1.061)+(3.014), (I-339)+(1.061)+(3.015), (I-339)+(1.061)+(3.016), (I-339)+(1.061)+(3.017), (I-339)+(1.061)+(3.018), (I-339)+(1.061)+(3.019), (I-339)+(1.061)+(3.020), (I-339)+(1.061)+(3.021), (I-339)+(1.061)+(3.022), (I-339)+(1.061)+(3.023), (I-339)+(1.061)+(3.024), (I-339)+(1.061)+(3.025), (I-339)+(1.061)+(3.026), (I-339)+(1.061)+(3.027), (I-339)+(1.061)+(3.028), (I-339)+(1.061)+(3.029), (I-339)+(1.061)+(3.030), (I-339)+(1.061)+(3.031), (I-339)+(1.061)+(5.001), (I-339)+(1.061)+(5.002), (I-339)+(1.061)+(5.003), (I-339)+(1.061)+(5.004), (I-339)+(1.061)+(5.005), (I-339)+(1.061)+(5.006), (I-339)+(1.061)+(5.007), (I-339)+(1.061)+(5.008), (I-339)+(1.061)+(5.009), (I-339)+(1.061)+(5.010), (I-339)+(1.061)+(5.011), (I-339)+(1.061)+(5.012), (I-339)+(1.061)+(5.013), (I-339)+(1.061)+(5.014), (I-339)+(1.061)+(5.015), (I-339)+(1.061)+(5.016), (I-339)+(1.061)+(5.017), (I-339)+(1.061)+(5.018), (I-339)+(1.061)+(5.019), (I-339)+(1.061)+(5.020), (I-339)+(1.061)+(5.021), (I-339)+(1.061)+(5.022), (I-339)+(1.061)+(5.023), (I-339)+(1.061)+(6.001), (I-339)+(1.061)+(6.002), (I-339)+(1.061)+(6.003), (I-339)+(1.061)+(6.004), (I-339)+(1.061)+(7.001), (I-339)+(1.061)+(7.002), (I-339)+(1.061)+(7.003), (I-339)+(1.061)+(7.004), (I-339)+(1.061)+(7.005), (I-339)+(1.061)+(7.006), (I-339)+(1.061)+(9.001), (I-339)+(1.061)+(9.002), (I-339)+(1.061)+(9.003), (I-339)+(1.061)+(9.004), (I-339)+(1.061)+(9.005), (I-339)+(1.061)+(9.006), (I-339)+(1.061)+(9.007), (I-339)+(1.061)+(9.008), (I-339)+(1.061)+(9.009), (I-339)+(1.061)+(14.001), (I-339)+(1.061)+(14.002), (I-339)+(1.061)+(15.008), (I-339)+(1.061)+(15.011), (I-339)+(1.061)+(15.012), (I-339)+(1.061)+(15.016), (I-339)+(1.061)+(15.025), (I-339)+(1.061)+(15.027), (I-339)+(1.061)+(15.047), (I-339)+(1.061)+(15.063), (I-339)+(1.061)+(15.064), (I-339)+(1.061)+(16.001), (I-339)+(1.061)+(16.002), (I-339)+(1.061)+(16.003), (I-339)+(1.061)+(16.004), (I-339)+(1.061)+(16.005), (I-339)+(1.061)+(16.006), (I-339)+(1.061)+(16.007), (I-339)+(1.061)+(16.008), (I-339)+(1.061)+(17.001), (I-339)+(1.061)+(17.002), (I-339)+(1.061)+(17.003), (I-339)+(1.061)+(17.004), (I-339)+(1.061)+(17.005), (I-339)+(1.061)+(17.006), (I-339)+(1.061)+(17.007), (I-339)+(1.061)+(17.008), (I-339)+(1.061)+(17.009), (I-339)+(1.061)+(17.010), (I-339)+(1.061)+(17.011), (I-339)+(1.061)+(17.012), (I-339)+(1.061)+(18.001), (I-339)+(1.062)+(1.063), (I-339)+(1.062)+(1.064), (I-339)+(1.062)+(1.065), (I-339)+(1.062)+(1.066), (I-339)+(1.062)+(1.067), (I-339)+(1.062)+(1.068), (I-339)+(1.062)+(1.069), (I-339)+(1.062)+(1.070), (I-339)+(1.062)+(1.071), (I-339)+(1.062)+(1.072), (I-339)+(1.062)+(1.073), (I-339)+(1.062)+(1.074), (I-339)+(1.062)+(1.075), (I-339)+(1.062)+(1.076), (I-339)+(1.062)+(1.077), (I-339)+(1.062)+(1.078), (I-339)+(1.062)+(1.079), (I-339)+(1.062)+(1.080), (I-339)+(1.062)+(1.081), (I-339)+(1.062)+(1.082), (I-339)+(1.062)+(1.083), (I-339)+(1.062)+(1.084), (I-339)+(1.062)+(1.085), (I-339)+(1.062)+(1.086), (I-339)+(1.062)+(1.087), (I-339)+(1.062)+(1.088), (I-339)+(1.062)+(1.089), (I-339)+(1.062)+(1.090), (I-339)+(1.062)+(1.091), (I-339)+(1.062)+(1.092), (I-339)+(1.062)+(2.001), (I-339)+(1.062)+(2.002), (I-339)+(1.062)+(2.003), (I-339)+(1.062)+(2.004), (I-339)+(1.062)+(2.005), (I-339)+(1.062)+(2.006), (I-339)+(1.062)+(2.007), (I-339)+(1.062)+(2.008), (I-339)+(1.062)+(2.009), (I-339)+(1.062)+(2.010), (I-339)+(1.062)+(2.011), (I-339)+(1.062)+(2.012), (I-339)+(1.062)+(2.013), (I-339)+(1.062)+(2.014), (I-339)+(1.062)+(2.015), (I-339)+(1.062)+(2.016), (I-339)+(1.062)+(2.017), (I-339)+(1.062)+(2.018), (I-339)+(1.062)+(2.019), (I-339)+(1.062)+(2.020), (I-339)+(1.062)+(2.021), (I-339)+(1.062)+(2.022), (I-339)+(1.062)+(2.023), (I-339)+(1.062)+(2.024), (I-339)+(1.062)+(2.025), (I-339)+(1.062)+(2.026), (I-339)+(1.062)+(2.027), (I-339)+(1.062)+(2.028), (I-339)+(1.062)+(2.029), (I-339)+(1.062)+(2.030), (I-339)+(1.062)+(2.031), (I-339)+(1.062)+(2.032), (I-339)+(1.062)+(2.033), (I-339)+(1.062)+(2.034), (I-339)+(1.062)+(2.035), (I-339)+(1.062)+(2.036), (I-339)+(1.062)+(2.037), (I-339)+(1.062)+(2.038), (I-339)+(1.062)+(2.039), (I-339)+(1.062)+(2.040), (I-339)+(1.062)+(2.041), (I-339)+(1.062)+(2.042), (I-339)+(1.062)+(2.043), (I-339)+(1.062)+(2.044), (I-339)+(1.062)+(2.045), (I-339)+(1.062)+(2.046), (I-339)+(1.062)+(2.047), (I-339)+(1.062)+(2.048), (I-339)+(1.062)+(2.049), (I-339)+(1.062)+(2.050), (I-339)+(1.062)+(2.051), (I-339)+(1.062)+(2.052), (I-339)+(1.062)+(2.053), (I-339)+(1.062)+(2.054), (I-339)+(1.062)+(2.055), (I-339)+(1.062)+(2.056), (I-339)+(1.062)+(2.057), (I-339)+(1.062)+(2.058), (I-339)+(1.062)+(2.059), (I-339)+(1.062)+(3.001), (I-339)+(1.062)+(3.002), (I-339)+(1.062)+(3.003), (I-339)+(1.062)+(3.004), (I-339)+(1.062)+(3.005), (I-339)+(1.062)+(3.006), (I-339)+(1.062)+(3.007), (I-339)+(1.062)+(3.008), (I-339)+(1.062)+(3.009), (I-339)+(1.062)+(3.010), (I-339)+(1.062)+(3.011), (I-339)+(1.062)+(3.012), (I-339)+(1.062)+(3.013), (I-339)+(1.062)+(3.014), (I-339)+(1.062)+(3.015), (I-339)+(1.062)+(3.016), (I-339)+(1.062)+(3.017), (I-339)+(1.062)+(3.018), (I-339)+(1.062)+(3.019), (I-339)+(1.062)+(3.020), (I-339)+(1.062)+(3.021), (I-339)+(1.062)+(3.022), (I-339)+(1.062)+(3.023), (I-339)+(1.062)+(3.024), (I-339)+(1.062)+(3.025), (I-339)+(1.062)+(3.026), (I-339)+(1.062)+(3.027), (I-339)+(1.062)+(3.028), (I-339)+(1.062)+(3.029), (I-339)+(1.062)+(3.030), (I-339)+(1.062)+(3.031), (I-339)+(1.062)+(5.001), (I-339)+(1.062)+(5.002), (I-339)+(1.062)+(5.003), (I-339)+(1.062)+(5.004), (I-339)+(1.062)+(5.005), (I-339)+(1.062)+(5.006), (I-339)+(1.062)+(5.007), (I-339)+(1.062)+(5.008), (I-339)+(1.062)+(5.009), (I-339)+(1.062)+(5.010), (I-339)+(1.062)+(5.011), (I-339)+(1.062)+(5.012), (I-339)+(1.062)+(5.013), (I-339)+(1.062)+(5.014), (I-339)+(1.062)+(5.015), (I-339)+(1.062)+(5.016), (I-339)+(1.062)+(5.017), (I-339)+(1.062)+(5.018), (I-339)+(1.062)+(5.019), (I-339)+(1.062)+(5.020), (I-339)+(1.062)+(5.021), (I-339)+(1.062)+(5.022), (I-339)+(1.062)+(5.023), (I-339)+(1.062)+(6.001), (I-339)+(1.062)+(6.002), (I-339)+(1.062)+(6.003), (I-339)+(1.062)+(6.004), (I-339)+(1.062)+(7.001), (I-339)+(1.062)+(7.002), (I-339)+(1.062)+(7.003), (I-339)+(1.062)+(7.004), (I-339)+(1.062)+(7.005), (I-339)+(1.062)+(7.006), (I-339)+(1.062)+(9.001), (I-339)+(1.062)+(9.002), (I-339)+(1.062)+(9.003), (I-339)+(1.062)+(9.004), (I-339)+(1.062)+(9.005), (I-339)+(1.062)+(9.006), (I-339)+(1.062)+(9.007), (I-339)+(1.062)+(9.008), (I-339)+(1.062)+(9.009), (I-339)+(1.062)+(14.001), (I-339)+(1.062)+(14.002), (I-339)+(1.062)+(15.008), (I-339)+(1.062)+(15.011), (I-339)+(1.062)+(15.012), (I-339)+(1.062)+(15.016), (I-339)+(1.062)+(15.025), (I-339)+(1.062)+(15.027), (I-339)+(1.062)+(15.047), (I-339)+(1.062)+(15.063), (I-339)+(1.062)+(15.064), (I-339)+(1.062)+(16.001), (I-339)+(1.062)+(16.002), (I-339)+(1.062)+(16.003), (I-339)+(1.062)+(16.004), (I-339)+(1.062)+(16.005), (I-339)+(1.062)+(16.006), (I-339)+(1.062)+(16.007), (I-339)+(1.062)+(16.008), (I-339)+(1.062)+(17.001), (I-339)+(1.062)+(17.002), (I-339)+(1.062)+(17.003), (I-339)+(1.062)+(17.004), (I-339)+(1.062)+(17.005), (I-339)+(1.062)+(17.006), (I-339)+(1.062)+(17.007), (I-339)+(1.062)+(17.008), (I-339)+(1.062)+(17.009), (I-339)+(1.062)+(17.010), (I-339)+(1.062)+(17.011), (I-339)+(1.062)+(17.012), (I-339)+(1.062)+(18.001), (I-339)+(1.063)+(1.064), (I-339)+(1.063)+(1.065), (I-339)+(1.063)+(1.066), (I-339)+(1.063)+(1.067), (I-339)+(1.063)+(1.068), (I-339)+(1.063)+(1.069), (I-339)+(1.063)+(1.070), (I-339)+(1.063)+(1.071), (I-339)+(1.063)+(1.072), (I-339)+(1.063)+(1.073), (I-339)+(1.063)+(1.074), (I-339)+(1.063)+(1.075), (I-339)+(1.063)+(1.076), (I-339)+(1.063)+(1.077), (I-339)+(1.063)+(1.078), (I-339)+(1.063)+(1.079), (I-339)+(1.063)+(1.080), (I-339)+(1.063)+(1.081), (I-339)+(1.063)+(1.082), (I-339)+(1.063)+(1.083), (I-339)+(1.063)+(1.084), (I-339)+(1.063)+(1.085), (I-339)+(1.063)+(1.086), (I-339)+(1.063)+(1.087), (I-339)+(1.063)+(1.088), (I-339)+(1.063)+(1.089), (I-339)+(1.063)+(1.090), (I-339)+(1.063)+(1.091), (I-339)+(1.063)+(1.092), (I-339)+(1.063)+(2.001), (I-339)+(1.063)+(2.002), (I-339)+(1.063)+(2.003), (I-339)+(1.063)+(2.004), (I-339)+(1.063)+(2.005), (I-339)+(1.063)+(2.006), (I-339)+(1.063)+(2.007), (I-339)+(1.063)+(2.008), (I-339)+(1.063)+(2.009), (I-339)+(1.063)+(2.010), (I-339)+(1.063)+(2.011), (I-339)+(1.063)+(2.012), (I-339)+(1.063)+(2.013), (I-339)+(1.063)+(2.014), (I-339)+(1.063)+(2.015), (I-339)+(1.063)+(2.016), (I-339)+(1.063)+(2.017), (I-339)+(1.063)+(2.018), (I-339)+(1.063)+(2.019), (I-339)+(1.063)+(2.020), (I-339)+(1.063)+(2.021), (I-339)+(1.063)+(2.022), (I-339)+(1.063)+(2.023), (I-339)+(1.063)+(2.024), (I-339)+(1.063)+(2.025), (I-339)+(1.063)+(2.026), (I-339)+(1.063)+(2.027), (I-339)+(1.063)+(2.028), (I-339)+(1.063)+(2.029), (I-339)+(1.063)+(2.030), (I-339)+(1.063)+(2.031), (I-339)+(1.063)+(2.032), (I-339)+(1.063)+(2.033), (I-339)+(1.063)+(2.034), (I-339)+(1.063)+(2.035), (I-339)+(1.063)+(2.036), (I-339)+(1.063)+(2.037), (I-339)+(1.063)+(2.038), (I-339)+(1.063)+(2.039), (I-339)+(1.063)+(2.040), (I-339)+(1.063)+(2.041), (I-339)+(1.063)+(2.042), (I-339)+(1.063)+(2.043), (I-339)+(1.063)+(2.044), (I-339)+(1.063)+(2.045), (I-339)+(1.063)+(2.046), (I-339)+(1.063)+(2.047), (I-339)+(1.063)+(2.048), (I-339)+(1.063)+(2.049), (I-339)+(1.063)+(2.050), (I-339)+(1.063)+(2.051), (I-339)+(1.063)+(2.052), (I-339)+(1.063)+(2.053), (I-339)+(1.063)+(2.054), (I-339)+(1.063)+(2.055), (I-339)+(1.063)+(2.056), (I-339)+(1.063)+(2.057), (I-339)+(1.063)+(2.058), (I-339)+(1.063)+(2.059), (I-339)+(1.063)+(3.001), (I-339)+(1.063)+(3.002), (I-339)+(1.063)+(3.003), (I-339)+(1.063)+(3.004), (I-339)+(1.063)+(3.005), (I-339)+(1.063)+(3.006), (I-339)+(1.063)+(3.007), (I-339)+(1.063)+(3.008), (I-339)+(1.063)+(3.009), (I-339)+(1.063)+(3.010), (I-339)+(1.063)+(3.011), (I-339)+(1.063)+(3.012), (I-339)+(1.063)+(3.013), (I-339)+(1.063)+(3.014), (I-339)+(1.063)+(3.015), (I-339)+(1.063)+(3.016), (I-339)+(1.063)+(3.017), (I-339)+(1.063)+(3.018), (I-339)+(1.063)+(3.019), (I-339)+(1.063)+(3.020), (I-339)+(1.063)+(3.021), (I-339)+(1.063)+(3.022), (I-339)+(1.063)+(3.023), (I-339)+(1.063)+(3.024), (I-339)+(1.063)+(3.025), (I-339)+(1.063)+(3.026), (I-339)+(1.063)+(3.027), (I-339)+(1.063)+(3.028), (I-339)+(1.063)+(3.029), (I-339)+(1.063)+(3.030), (I-339)+(1.063)+(3.031), (I-339)+(1.063)+(5.001), (I-339)+(1.063)+(5.002), (I-339)+(1.063)+(5.003), (I-339)+(1.063)+(5.004), (I-339)+(1.063)+(5.005), (I-339)+(1.063)+(5.006), (I-339)+(1.063)+(5.007), (I-339)+(1.063)+(5.008), (I-339)+(1.063)+(5.009), (I-339)+(1.063)+(5.010), (I-339)+(1.063)+(5.011), (I-339)+(1.063)+(5.012), (I-339)+(1.063)+(5.013), (I-339)+(1.063)+(5.014), (I-339)+(1.063)+(5.015), (I-339)+(1.063)+(5.016), (I-339)+(1.063)+(5.017), (I-339)+(1.063)+(5.018), (I-339)+(1.063)+(5.019), (I-339)+(1.063)+(5.020), (I-339)+(1.063)+(5.021), (I-339)+(1.063)+(5.022), (I-339)+(1.063)+(5.023), (I-339)+(1.063)+(6.001), (I-339)+(1.063)+(6.002), (I-339)+(1.063)+(6.003), (I-339)+(1.063)+(6.004), (I-339)+(1.063)+(7.001), (I-339)+(1.063)+(7.002), (I-339)+(1.063)+(7.003), (I-339)+(1.063)+(7.004), (I-339)+(1.063)+(7.005), (I-339)+(1.063)+(7.006), (I-339)+(1.063)+(9.001), (I-339)+(1.063)+(9.002), (I-339)+(1.063)+(9.003), (I-339)+(1.063)+(9.004), (I-339)+(1.063)+(9.005), (I-339)+(1.063)+(9.006), (I-339)+(1.063)+(9.007), (I-339)+(1.063)+(9.008), (I-339)+(1.063)+(9.009), (I-339)+(1.063)+(14.001), (I-339)+(1.063)+(14.002), (I-339)+(1.063)+(15.008), (I-339)+(1.063)+(15.011), (I-339)+(1.063)+(15.012), (I-339)+(1.063)+(15.016), (I-339)+(1.063)+(15.025), (I-339)+(1.063)+(15.027), (I-339)+(1.063)+(15.047), (I-339)+(1.063)+(15.063), (I-339)+(1.063)+(15.064), (I-339)+(1.063)+(16.001), (I-339)+(1.063)+(16.002), (I-339)+(1.063)+(16.003), (I-339)+(1.063)+(16.004), (I-339)+(1.063)+(16.005), (I-339)+(1.063)+(16.006), (I-339)+(1.063)+(16.007), (I-339)+(1.063)+(16.008), (I-339)+(1.063)+(17.001), (I-339)+(1.063)+(17.002), (I-339)+(1.063)+(17.003), (I-339)+(1.063)+(17.004), (I-339)+(1.063)+(17.005), (I-339)+(1.063)+(17.006), (I-339)+(1.063)+(17.007), (I-339)+(1.063)+(17.008), (I-339)+(1.063)+(17.009), (I-339)+(1.063)+(17.010), (I-339)+(1.063)+(17.011), (I-339)+(1.063)+(17.012), (I-339)+(1.063)+(18.001), (I-339)+(1.064)+(1.065), (I-339)+(1.064)+(1.066), (I-339)+(1.064)+(1.067), (I-339)+(1.064)+(1.068), (I-339)+(1.064)+(1.069), (I-339)+(1.064)+(1.070), (I-339)+(1.064)+(1.071), (I-339)+(1.064)+(1.072), (I-339)+(1.064)+(1.073), (I-339)+(1.064)+(1.074), (I-339)+(1.064)+(1.075), (I-339)+(1.064)+(1.076), (I-339)+(1.064)+(1.077), (I-339)+(1.064)+(1.078), (I-339)+(1.064)+(1.079), (I-339)+(1.064)+(1.080), (I-339)+(1.064)+(1.081), (I-339)+(1.064)+(1.082), (I-339)+(1.064)+(1.083), (I-339)+(1.064)+(1.084), (I-339)+(1.064)+(1.085), (I-339)+(1.064)+(1.086), (I-339)+(1.064)+(1.087), (I-339)+(1.064)+(1.088), (I-339)+(1.064)+(1.089), (I-339)+(1.064)+(1.090), (I-339)+(1.064)+(1.091), (I-339)+(1.064)+(1.092), (I-339)+(1.064)+(2.001), (I-339)+(1.064)+(2.002), (I-339)+(1.064)+(2.003), (I-339)+(1.064)+(2.004), (I-339)+(1.064)+(2.005), (I-339)+(1.064)+(2.006), (I-339)+(1.064)+(2.007), (I-339)+(1.064)+(2.008), (I-339)+(1.064)+(2.009), (I-339)+(1.064)+(2.010), (I-339)+(1.064)+(2.011), (I-339)+(1.064)+(2.012), (I-339)+(1.064)+(2.013), (I-339)+(1.064)+(2.014), (I-339)+(1.064)+(2.015), (I-339)+(1.064)+(2.016), (I-339)+(1.064)+(2.017), (I-339)+(1.064)+(2.018), (I-339)+(1.064)+(2.019), (I-339)+(1.064)+(2.020), (I-339)+(1.064)+(2.021), (I-339)+(1.064)+(2.022), (I-339)+(1.064)+(2.023), (I-339)+(1.064)+(2.024), (I-339)+(1.064)+(2.025), (I-339)+(1.064)+(2.026), (I-339)+(1.064)+(2.027), (I-339)+(1.064)+(2.028), (I-339)+(1.064)+(2.029), (I-339)+(1.064)+(2.030), (I-339)+(1.064)+(2.031), (I-339)+(1.064)+(2.032), (I-339)+(1.064)+(2.033), (I-339)+(1.064)+(2.034), (I-339)+(1.064)+(2.035), (I-339)+(1.064)+(2.036), (I-339)+(1.064)+(2.037), (I-339)+(1.064)+(2.038), (I-339)+(1.064)+(2.039), (I-339)+(1.064)+(2.040), (I-339)+(1.064)+(2.041), (I-339)+(1.064)+(2.042), (I-339)+(1.064)+(2.043), (I-339)+(1.064)+(2.044), (I-339)+(1.064)+(2.045), (I-339)+(1.064)+(2.046), (I-339)+(1.064)+(2.047), (I-339)+(1.064)+(2.048), (I-339)+(1.064)+(2.049), (I-339)+(1.064)+(2.050), (I-339)+(1.064)+(2.051), (I-339)+(1.064)+(2.052), (I-339)+(1.064)+(2.053), (I-339)+(1.064)+(2.054), (I-339)+(1.064)+(2.055), (I-339)+(1.064)+(2.056), (I-339)+(1.064)+(2.057), (I-339)+(1.064)+(2.058), (I-339)+(1.064)+(2.059), (I-339)+(1.064)+(3.001), (I-339)+(1.064)+(3.002), (I-339)+(1.064)+(3.003), (I-339)+(1.064)+(3.004), (I-339)+(1.064)+(3.005), (I-339)+(1.064)+(3.006), (I-339)+(1.064)+(3.007), (I-339)+(1.064)+(3.008), (I-339)+(1.064)+(3.009), (I-339)+(1.064)+(3.010), (I-339)+(1.064)+(3.011), (I-339)+(1.064)+(3.012), (I-339)+(1.064)+(3.013), (I-339)+(1.064)+(3.014), (I-339)+(1.064)+(3.015), (I-339)+(1.064)+(3.016), (I-339)+(1.064)+(3.017), (I-339)+(1.064)+(3.018), (I-339)+(1.064)+(3.019), (I-339)+(1.064)+(3.020), (I-339)+(1.064)+(3.021), (I-339)+(1.064)+(3.022), (I-339)+(1.064)+(3.023), (I-339)+(1.064)+(3.024), (I-339)+(1.064)+(3.025), (I-339)+(1.064)+(3.026), (I-339)+(1.064)+(3.027), (I-339)+(1.064)+(3.028), (I-339)+(1.064)+(3.029), (I-339)+(1.064)+(3.030), (I-339)+(1.064)+(3.031), (I-339)+(1.064)+(5.001), (I-339)+(1.064)+(5.002), (I-339)+(1.064)+(5.003), (I-339)+(1.064)+(5.004), (I-339)+(1.064)+(5.005), (I-339)+(1.064)+(5.006), (I-339)+(1.064)+(5.007), (I-339)+(1.064)+(5.008), (I-339)+(1.064)+(5.009), (I-339)+(1.064)+(5.010), (I-339)+(1.064)+(5.011), (I-339)+(1.064)+(5.012), (I-339)+(1.064)+(5.013), (I-339)+(1.064)+(5.014), (I-339)+(1.064)+(5.015), (I-339)+(1.064)+(5.016), (I-339)+(1.064)+(5.017), (I-339)+(1.064)+(5.018), (I-339)+(1.064)+(5.019), (I-339)+(1.064)+(5.020), (I-339)+(1.064)+(5.021), (I-339)+(1.064)+(5.022), (I-339)+(1.064)+(5.023), (I-339)+(1.064)+(6.001), (I-339)+(1.064)+(6.002), (I-339)+(1.064)+(6.003), (I-339)+(1.064)+(6.004), (I-339)+(1.064)+(7.001), (I-339)+(1.064)+(7.002), (I-339)+(1.064)+(7.003), (I-339)+(1.064)+(7.004), (I-339)+(1.064)+(7.005), (I-339)+(1.064)+(7.006), (I-339)+(1.064)+(9.001), (I-339)+(1.064)+(9.002), (I-339)+(1.064)+(9.003), (I-339)+(1.064)+(9.004), (I-339)+(1.064)+(9.005), (I-339)+(1.064)+(9.006), (I-339)+(1.064)+(9.007), (I-339)+(1.064)+(9.008), (I-339)+(1.064)+(9.009), (I-339)+(1.064)+(14.001), (I-339)+(1.064)+(14.002), (I-339)+(1.064)+(15.008), (I-339)+(1.064)+(15.011), (I-339)+(1.064)+(15.012), (I-339)+(1.064)+(15.016), (I-339)+(1.064)+(15.025), (I-339)+(1.064)+(15.027), (I-339)+(1.064)+(15.047), (I-339)+(1.064)+(15.063), (I-339)+(1.064)+(15.064), (I-339)+(1.064)+(16.001), (I-339)+(1.064)+(16.002), (I-339)+(1.064)+(16.003), (I-339)+(1.064)+(16.004), (I-339)+(1.064)+(16.005), (I-339)+(1.064)+(16.006), (I-339)+(1.064)+(16.007), (I-339)+(1.064)+(16.008), (I-339)+(1.064)+(17.001), (I-339)+(1.064)+(17.002), (I-339)+(1.064)+(17.003), (I-339)+(1.064)+(17.004), (I-339)+(1.064)+(17.005), (I-339)+(1.064)+(17.006), (I-339)+(1.064)+(17.007), (I-339)+(1.064)+(17.008), (I-339)+(1.064)+(17.009), (I-339)+(1.064)+(17.010), (I-339)+(1.064)+(17.011), (I-339)+(1.064)+(17.012), (I-339)+(1.064)+(18.001), (I-339)+(1.065)+(1.066), (I-339)+(1.065)+(1.067), (I-339)+(1.065)+(1.068), (I-339)+(1.065)+(1.069), (I-339)+(1.065)+(1.070), (I-339)+(1.065)+(1.071), (I-339)+(1.065)+(1.072), (I-339)+(1.065)+(1.073), (I-339)+(1.065)+(1.074), (I-339)+(1.065)+(1.075), (I-339)+(1.065)+(1.076), (I-339)+(1.065)+(1.077), (I-339)+(1.065)+(1.078), (I-339)+(1.065)+(1.079), (I-339)+(1.065)+(1.080), (I-339)+(1.065)+(1.081), (I-339)+(1.065)+(1.082), (I-339)+(1.065)+(1.083), (I-339)+(1.065)+(1.084), (I-339)+(1.065)+(1.085), (I-339)+(1.065)+(1.086), (I-339)+(1.065)+(1.087), (I-339)+(1.065)+(1.088), (I-339)+(1.065)+(1.089), (I-339)+(1.065)+(1.090), (I-339)+(1.065)+(1.091), (I-339)+(1.065)+(1.092), (I-339)+(1.065)+(2.001), (I-339)+(1.065)+(2.002), (I-339)+(1.065)+(2.003), (I-339)+(1.065)+(2.004), (I-339)+(1.065)+(2.005), (I-339)+(1.065)+(2.006), (I-339)+(1.065)+(2.007), (I-339)+(1.065)+(2.008), (I-339)+(1.065)+(2.009), (I-339)+(1.065)+(2.010), (I-339)+(1.065)+(2.011), (I-339)+(1.065)+(2.012), (I-339)+(1.065)+(2.013), (I-339)+(1.065)+(2.014), (I-339)+(1.065)+(2.015), (I-339)+(1.065)+(2.016), (I-339)+(1.065)+(2.017), (I-339)+(1.065)+(2.018), (I-339)+(1.065)+(2.019), (I-339)+(1.065)+(2.020), (I-339)+(1.065)+(2.021), (I-339)+(1.065)+(2.022), (I-339)+(1.065)+(2.023), (I-339)+(1.065)+(2.024), (I-339)+(1.065)+(2.025), (I-339)+(1.065)+(2.026), (I-339)+(1.065)+(2.027), (I-339)+(1.065)+(2.028), (I-339)+(1.065)+(2.029), (I-339)+(1.065)+(2.030), (I-339)+(1.065)+(2.031), (I-339)+(1.065)+(2.032), (I-339)+(1.065)+(2.033), (I-339)+(1.065)+(2.034), (I-339)+(1.065)+(2.035), (I-339)+(1.065)+(2.036), (I-339)+(1.065)+(2.037), (I-339)+(1.065)+(2.038), (I-339)+(1.065)+(2.039), (I-339)+(1.065)+(2.040), (I-339)+(1.065)+(2.041), (I-339)+(1.065)+(2.042), (I-339)+(1.065)+(2.043), (I-339)+(1.065)+(2.044), (I-339)+(1.065)+(2.045), (I-339)+(1.065)+(2.046), (I-339)+(1.065)+(2.047), (I-339)+(1.065)+(2.048), (I-339)+(1.065)+(2.049), (I-339)+(1.065)+(2.050), (I-339)+(1.065)+(2.051), (I-339)+(1.065)+(2.052), (I-339)+(1.065)+(2.053), (I-339)+(1.065)+(2.054), (I-339)+(1.065)+(2.055), (I-339)+(1.065)+(2.056), (I-339)+(1.065)+(2.057), (I-339)+(1.065)+(2.058), (I-339)+(1.065)+(2.059), (I-339)+(1.065)+(3.001), (I-339)+(1.065)+(3.002), (I-339)+(1.065)+(3.003), (I-339)+(1.065)+(3.004), (I-339)+(1.065)+(3.005), (I-339)+(1.065)+(3.006), (I-339)+(1.065)+(3.007), (I-339)+(1.065)+(3.008), (I-339)+(1.065)+(3.009), (I-339)+(1.065)+(3.010), (I-339)+(1.065)+(3.011), (I-339)+(1.065)+(3.012), (I-339)+(1.065)+(3.013), (I-339)+(1.065)+(3.014), (I-339)+(1.065)+(3.015), (I-339)+(1.065)+(3.016), (I-339)+(1.065)+(3.017), (I-339)+(1.065)+(3.018), (I-339)+(1.065)+(3.019), (I-339)+(1.065)+(3.020), (I-339)+(1.065)+(3.021), (I-339)+(1.065)+(3.022), (I-339)+(1.065)+(3.023), (I-339)+(1.065)+(3.024), (I-339)+(1.065)+(3.025), (I-339)+(1.065)+(3.026), (I-339)+(1.065)+(3.027), (I-339)+(1.065)+(3.028), (I-339)+(1.065)+(3.029), (I-339)+(1.065)+(3.030), (I-339)+(1.065)+(3.031), (I-339)+(1.065)+(5.001), (I-339)+(1.065)+(5.002), (I-339)+(1.065)+(5.003), (I-339)+(1.065)+(5.004), (I-339)+(1.065)+(5.005), (I-339)+(1.065)+(5.006), (I-339)+(1.065)+(5.007), (I-339)+(1.065)+(5.008), (I-339)+(1.065)+(5.009), (I-339)+(1.065)+(5.010), (I-339)+(1.065)+(5.011), (I-339)+(1.065)+(5.012), (I-339)+(1.065)+(5.013), (I-339)+(1.065)+(5.014), (I-339)+(1.065)+(5.015), (I-339)+(1.065)+(5.016), (I-339)+(1.065)+(5.017), (I-339)+(1.065)+(5.018), (I-339)+(1.065)+(5.019), (I-339)+(1.065)+(5.020), (I-339)+(1.065)+(5.021), (I-339)+(1.065)+(5.022), (I-339)+(1.065)+(5.023), (I-339)+(1.065)+(6.001), (I-339)+(1.065)+(6.002), (I-339)+(1.065)+(6.003), (I-339)+(1.065)+(6.004), (I-339)+(1.065)+(7.001), (I-339)+(1.065)+(7.002), (I-339)+(1.065)+(7.003), (I-339)+(1.065)+(7.004), (I-339)+(1.065)+(7.005), (I-339)+(1.065)+(7.006), (I-339)+(1.065)+(9.001), (I-339)+(1.065)+(9.002), (I-339)+(1.065)+(9.003), (I-339)+(1.065)+(9.004), (I-339)+(1.065)+(9.005), (I-339)+(1.065)+(9.006), (I-339)+(1.065)+(9.007), (I-339)+(1.065)+(9.008), (I-339)+(1.065)+(9.009), (I-339)+(1.065)+(14.001), (I-339)+(1.065)+(14.002), (I-339)+(1.065)+(15.008), (I-339)+(1.065)+(15.011), (I-339)+(1.065)+(15.012), (I-339)+(1.065)+(15.016), (I-339)+(1.065)+(15.025), (I-339)+(1.065)+(15.027), (I-339)+(1.065)+(15.047), (I-339)+(1.065)+(15.063), (I-339)+(1.065)+(15.064), (I-339)+(1.065)+(16.001), (I-339)+(1.065)+(16.002), (I-339)+(1.065)+(16.003), (I-339)+(1.065)+(16.004), (I-339)+(1.065)+(16.005), (I-339)+(1.065)+(16.006), (I-339)+(1.065)+(16.007), (I-339)+(1.065)+(16.008), (I-339)+(1.065)+(17.001), (I-339)+(1.065)+(17.002), (I-339)+(1.065)+(17.003), (I-339)+(1.065)+(17.004), (I-339)+(1.065)+(17.005), (I-339)+(1.065)+(17.006), (I-339)+(1.065)+(17.007), (I-339)+(1.065)+(17.008), (I-339)+(1.065)+(17.009), (I-339)+(1.065)+(17.010), (I-339)+(1.065)+(17.011), (I-339)+(1.065)+(17.012), (I-339)+(1.065)+(18.001), (I-339)+(1.066)+(1.067), (I-339)+(1.066)+(1.068), (I-339)+(1.066)+(1.069), (I-339)+(1.066)+(1.070), (I-339)+(1.066)+(1.071), (I-339)+(1.066)+(1.072), (I-339)+(1.066)+(1.073), (I-339)+(1.066)+(1.074), (I-339)+(1.066)+(1.075), (I-339)+(1.066)+(1.076), (I-339)+(1.066)+(1.077), (I-339)+(1.066)+(1.078), (I-339)+(1.066)+(1.079), (I-339)+(1.066)+(1.080), (I-339)+(1.066)+(1.081), (I-339)+(1.066)+(1.082), (I-339)+(1.066)+(1.083), (I-339)+(1.066)+(1.084), (I-339)+(1.066)+(1.085), (I-339)+(1.066)+(1.086), (I-339)+(1.066)+(1.087), (I-339)+(1.066)+(1.088), (I-339)+(1.066)+(1.089), (I-339)+(1.066)+(1.090), (I-339)+(1.066)+(1.091), (I-339)+(1.066)+(1.092), (I-339)+(1.066)+(2.001), (I-339)+(1.066)+(2.002), (I-339)+(1.066)+(2.003), (I-339)+(1.066)+(2.004), (I-339)+(1.066)+(2.005), (I-339)+(1.066)+(2.006), (I-339)+(1.066)+(2.007), (I-339)+(1.066)+(2.008), (I-339)+(1.066)+(2.009), (I-339)+(1.066)+(2.010), (I-339)+(1.066)+(2.011), (I-339)+(1.066)+(2.012), (I-339)+(1.066)+(2.013), (I-339)+(1.066)+(2.014), (I-339)+(1.066)+(2.015), (I-339)+(1.066)+(2.016), (I-339)+(1.066)+(2.017), (I-339)+(1.066)+(2.018), (I-339)+(1.066)+(2.019), (I-339)+(1.066)+(2.020), (I-339)+(1.066)+(2.021), (I-339)+(1.066)+(2.022), (I-339)+(1.066)+(2.023), (I-339)+(1.066)+(2.024), (I-339)+(1.066)+(2.025), (I-339)+(1.066)+(2.026), (I-339)+(1.066)+(2.027), (I-339)+(1.066)+(2.028), (I-339)+(1.066)+(2.029), (I-339)+(1.066)+(2.030), (I-339)+(1.066)+(2.031), (I-339)+(1.066)+(2.032), (I-339)+(1.066)+(2.033), (I-339)+(1.066)+(2.034), (I-339)+(1.066)+(2.035), (I-339)+(1.066)+(2.036), (I-339)+(1.066)+(2.037), (I-339)+(1.066)+(2.038), (I-339)+(1.066)+(2.039), (I-339)+(1.066)+(2.040), (I-339)+(1.066)+(2.041), (I-339)+(1.066)+(2.042), (I-339)+(1.066)+(2.043), (I-339)+(1.066)+(2.044), (I-339)+(1.066)+(2.045), (I-339)+(1.066)+(2.046), (I-339)+(1.066)+(2.047), (I-339)+(1.066)+(2.048), (I-339)+(1.066)+(2.049), (I-339)+(1.066)+(2.050), (I-339)+(1.066)+(2.051), (I-339)+(1.066)+(2.052), (I-339)+(1.066)+(2.053), (I-339)+(1.066)+(2.054), (I-339)+(1.066)+(2.055), (I-339)+(1.066)+(2.056), (I-339)+(1.066)+(2.057), (I-339)+(1.066)+(2.058), (I-339)+(1.066)+(2.059), (I-339)+(1.066)+(3.001), (I-339)+(1.066)+(3.002), (I-339)+(1.066)+(3.003), (I-339)+(1.066)+(3.004), (I-339)+(1.066)+(3.005), (I-339)+(1.066)+(3.006), (I-339)+(1.066)+(3.007), (I-339)+(1.066)+(3.008), (I-339)+(1.066)+(3.009), (I-339)+(1.066)+(3.010), (I-339)+(1.066)+(3.011), (I-339)+(1.066)+(3.012), (I-339)+(1.066)+(3.013), (I-339)+(1.066)+(3.014), (I-339)+(1.066)+(3.015), (I-339)+(1.066)+(3.016), (I-339)+(1.066)+(3.017), (I-339)+(1.066)+(3.018), (I-339)+(1.066)+(3.019), (I-339)+(1.066)+(3.020), (I-339)+(1.066)+(3.021), (I-339)+(1.066)+(3.022), (I-339)+(1.066)+(3.023), (I-339)+(1.066)+(3.024), (I-339)+(1.066)+(3.025), (I-339)+(1.066)+(3.026), (I-339)+(1.066)+(3.027), (I-339)+(1.066)+(3.028), (I-339)+(1.066)+(3.029), (I-339)+(1.066)+(3.030), (I-339)+(1.066)+(3.031), (I-339)+(1.066)+(5.001), (I-339)+(1.066)+(5.002), (I-339)+(1.066)+(5.003), (I-339)+(1.066)+(5.004), (I-339)+(1.066)+(5.005), (I-339)+(1.066)+(5.006), (I-339)+(1.066)+(5.007), (I-339)+(1.066)+(5.008), (I-339)+(1.066)+(5.009), (I-339)+(1.066)+(5.010), (I-339)+(1.066)+(5.011), (I-339)+(1.066)+(5.012), (I-339)+(1.066)+(5.013), (I-339)+(1.066)+(5.014), (I-339)+(1.066)+(5.015), (I-339)+(1.066)+(5.016), (I-339)+(1.066)+(5.017), (I-339)+(1.066)+(5.018), (I-339)+(1.066)+(5.019), (I-339)+(1.066)+(5.020), (I-339)+(1.066)+(5.021), (I-339)+(1.066)+(5.022), (I-339)+(1.066)+(5.023), (I-339)+(1.066)+(6.001), (I-339)+(1.066)+(6.002), (I-339)+(1.066)+(6.003), (I-339)+(1.066)+(6.004), (I-339)+(1.066)+(7.001), (I-339)+(1.066)+(7.002), (I-339)+(1.066)+(7.003), (I-339)+(1.066)+(7.004), (I-339)+(1.066)+(7.005), (I-339)+(1.066)+(7.006), (I-339)+(1.066)+(9.001), (I-339)+(1.066)+(9.002), (I-339)+(1.066)+(9.003), (I-339)+(1.066)+(9.004), (I-339)+(1.066)+(9.005), (I-339)+(1.066)+(9.006), (I-339)+(1.066)+(9.007), (I-339)+(1.066)+(9.008), (I-339)+(1.066)+(9.009), (I-339)+(1.066)+(14.001), (I-339)+(1.066)+(14.002), (I-339)+(1.066)+(15.008), (I-339)+(1.066)+(15.011), (I-339)+(1.066)+(15.012), (I-339)+(1.066)+(15.016), (I-339)+(1.066)+(15.025), (I-339)+(1.066)+(15.027), (I-339)+(1.066)+(15.047), (I-339)+(1.066)+(15.063), (I-339)+(1.066)+(15.064), (I-339)+(1.066)+(16.001), (I-339)+(1.066)+(16.002), (I-339)+(1.066)+(16.003), (I-339)+(1.066)+(16.004), (I-339)+(1.066)+(16.005), (I-339)+(1.066)+(16.006), (I-339)+(1.066)+(16.007), (I-339)+(1.066)+(16.008), (I-339)+(1.066)+(17.001), (I-339)+(1.066)+(17.002), (I-339)+(1.066)+(17.003), (I-339)+(1.066)+(17.004), (I-339)+(1.066)+(17.005), (I-339)+(1.066)+(17.006), (I-339)+(1.066)+(17.007), (I-339)+(1.066)+(17.008), (I-339)+(1.066)+(17.009), (I-339)+(1.066)+(17.010), (I-339)+(1.066)+(17.011), (I-339)+(1.066)+(17.012), (I-339)+(1.066)+(18.001), (I-339)+(1.067)+(1.068), (I-339)+(1.067)+(1.069), (I-339)+(1.067)+(1.070), (I-339)+(1.067)+(1.071), (I-339)+(1.067)+(1.072), (I-339)+(1.067)+(1.073), (I-339)+(1.067)+(1.074), (I-339)+(1.067)+(1.075), (I-339)+(1.067)+(1.076), (I-339)+(1.067)+(1.077), (I-339)+(1.067)+(1.078), (I-339)+(1.067)+(1.079), (I-339)+(1.067)+(1.080), (I-339)+(1.067)+(1.081), (I-339)+(1.067)+(1.082), (I-339)+(1.067)+(1.083), (I-339)+(1.067)+(1.084), (I-339)+(1.067)+(1.085), (I-339)+(1.067)+(1.086), (I-339)+(1.067)+(1.087), (I-339)+(1.067)+(1.088), (I-339)+(1.067)+(1.089), (I-339)+(1.067)+(1.090), (I-339)+(1.067)+(1.091), (I-339)+(1.067)+(1.092), (I-339)+(1.067)+(2.001), (I-339)+(1.067)+(2.002), (I-339)+(1.067)+(2.003), (I-339)+(1.067)+(2.004), (I-339)+(1.067)+(2.005), (I-339)+(1.067)+(2.006), (I-339)+(1.067)+(2.007), (I-339)+(1.067)+(2.008), (I-339)+(1.067)+(2.009), (I-339)+(1.067)+(2.010), (I-339)+(1.067)+(2.011), (I-339)+(1.067)+(2.012), (I-339)+(1.067)+(2.013), (I-339)+(1.067)+(2.014), (I-339)+(1.067)+(2.015), (I-339)+(1.067)+(2.016), (I-339)+(1.067)+(2.017), (I-339)+(1.067)+(2.018), (I-339)+(1.067)+(2.019), (I-339)+(1.067)+(2.020), (I-339)+(1.067)+(2.021), (I-339)+(1.067)+(2.022), (I-339)+(1.067)+(2.023), (I-339)+(1.067)+(2.024), (I-339)+(1.067)+(2.025), (I-339)+(1.067)+(2.026), (I-339)+(1.067)+(2.027), (I-339)+(1.067)+(2.028), (I-339)+(1.067)+(2.029), (I-339)+(1.067)+(2.030), (I-339)+(1.067)+(2.031), (I-339)+(1.067)+(2.032), (I-339)+(1.067)+(2.033), (I-339)+(1.067)+(2.034), (I-339)+(1.067)+(2.035), (I-339)+(1.067)+(2.036), (I-339)+(1.067)+(2.037), (I-339)+(1.067)+(2.038), (I-339)+(1.067)+(2.039), (I-339)+(1.067)+(2.040), (I-339)+(1.067)+(2.041), (I-339)+(1.067)+(2.042), (I-339)+(1.067)+(2.043), (I-339)+(1.067)+(2.044), (I-339)+(1.067)+(2.045), (I-339)+(1.067)+(2.046), (I-339)+(1.067)+(2.047), (I-339)+(1.067)+(2.048), (I-339)+(1.067)+(2.049), (I-339)+(1.067)+(2.050), (I-339)+(1.067)+(2.051), (I-339)+(1.067)+(2.052), (I-339)+(1.067)+(2.053), (I-339)+(1.067)+(2.054), (I-339)+(1.067)+(2.055), (I-339)+(1.067)+(2.056), (I-339)+(1.067)+(2.057), (I-339)+(1.067)+(2.058), (I-339)+(1.067)+(2.059), (I-339)+(1.067)+(3.001), (I-339)+(1.067)+(3.002), (I-339)+(1.067)+(3.003), (I-339)+(1.067)+(3.004), (I-339)+(1.067)+(3.005), (I-339)+(1.067)+(3.006), (I-339)+(1.067)+(3.007), (I-339)+(1.067)+(3.008), (I-339)+(1.067)+(3.009), (I-339)+(1.067)+(3.010), (I-339)+(1.067)+(3.011), (I-339)+(1.067)+(3.012), (I-339)+(1.067)+(3.013), (I-339)+(1.067)+(3.014), (I-339)+(1.067)+(3.015), (I-339)+(1.067)+(3.016), (I-339)+(1.067)+(3.017), (I-339)+(1.067)+(3.018), (I-339)+(1.067)+(3.019), (I-339)+(1.067)+(3.020), (I-339)+(1.067)+(3.021), (I-339)+(1.067)+(3.022), (I-339)+(1.067)+(3.023), (I-339)+(1.067)+(3.024), (I-339)+(1.067)+(3.025), (I-339)+(1.067)+(3.026), (I-339)+(1.067)+(3.027), (I-339)+(1.067)+(3.028), (I-339)+(1.067)+(3.029), (I-339)+(1.067)+(3.030), (I-339)+(1.067)+(3.031), (I-339)+(1.067)+(5.001), (I-339)+(1.067)+(5.002), (I-339)+(1.067)+(5.003), (I-339)+(1.067)+(5.004), (I-339)+(1.067)+(5.005), (I-339)+(1.067)+(5.006), (I-339)+(1.067)+(5.007), (I-339)+(1.067)+(5.008), (I-339)+(1.067)+(5.009), (I-339)+(1.067)+(5.010), (I-339)+(1.067)+(5.011), (I-339)+(1.067)+(5.012), (I-339)+(1.067)+(5.013), (I-339)+(1.067)+(5.014), (I-339)+(1.067)+(5.015), (I-339)+(1.067)+(5.016), (I-339)+(1.067)+(5.017), (I-339)+(1.067)+(5.018), (I-339)+(1.067)+(5.019), (I-339)+(1.067)+(5.020), (I-339)+(1.067)+(5.021), (I-339)+(1.067)+(5.022), (I-339)+(1.067)+(5.023), (I-339)+(1.067)+(6.001), (I-339)+(1.067)+(6.002), (I-339)+(1.067)+(6.003), (I-339)+(1.067)+(6.004), (I-339)+(1.067)+(7.001), (I-339)+(1.067)+(7.002), (I-339)+(1.067)+(7.003), (I-339)+(1.067)+(7.004), (I-339)+(1.067)+(7.005), (I-339)+(1.067)+(7.006), (I-339)+(1.067)+(9.001), (I-339)+(1.067)+(9.002), (I-339)+(1.067)+(9.003), (I-339)+(1.067)+(9.004), (I-339)+(1.067)+(9.005), (I-339)+(1.067)+(9.006), (I-339)+(1.067)+(9.007), (I-339)+(1.067)+(9.008), (I-339)+(1.067)+(9.009), (I-339)+(1.067)+(14.001), (I-339)+(1.067)+(14.002), (I-339)+(1.067)+(15.008), (I-339)+(1.067)+(15.011), (I-339)+(1.067)+(15.012), (I-339)+(1.067)+(15.016), (I-339)+(1.067)+(15.025), (I-339)+(1.067)+(15.027), (I-339)+(1.067)+(15.047), (I-339)+(1.067)+(15.063), (I-339)+(1.067)+(15.064), (I-339)+(1.067)+(16.001), (I-339)+(1.067)+(16.002), (I-339)+(1.067)+(16.003), (I-339)+(1.067)+(16.004), (I-339)+(1.067)+(16.005), (I-339)+(1.067)+(16.006), (I-339)+(1.067)+(16.007), (I-339)+(1.067)+(16.008), (I-339)+(1.067)+(17.001), (I-339)+(1.067)+(17.002), (I-339)+(1.067)+(17.003), (I-339)+(1.067)+(17.004), (I-339)+(1.067)+(17.005), (I-339)+(1.067)+(17.006), (I-339)+(1.067)+(17.007), (I-339)+(1.067)+(17.008), (I-339)+(1.067)+(17.009), (I-339)+(1.067)+(17.010), (I-339)+(1.067)+(17.011), (I-339)+(1.067)+(17.012), (I-339)+(1.067)+(18.001), (I-339)+(1.068)+(1.069), (I-339)+(1.068)+(1.070), (I-339)+(1.068)+(1.071), (I-339)+(1.068)+(1.072), (I-339)+(1.068)+(1.073), (I-339)+(1.068)+(1.074), (I-339)+(1.068)+(1.075), (I-339)+(1.068)+(1.076), (I-339)+(1.068)+(1.077), (I-339)+(1.068)+(1.078), (I-339)+(1.068)+(1.079), (I-339)+(1.068)+(1.080), (I-339)+(1.068)+(1.081), (I-339)+(1.068)+(1.082), (I-339)+(1.068)+(1.083), (I-339)+(1.068)+(1.084), (I-339)+(1.068)+(1.085), (I-339)+(1.068)+(1.086), (I-339)+(1.068)+(1.087), (I-339)+(1.068)+(1.088), (I-339)+(1.068)+(1.089), (I-339)+(1.068)+(1.090), (I-339)+(1.068)+(1.091), (I-339)+(1.068)+(1.092), (I-339)+(1.068)+(2.001), (I-339)+(1.068)+(2.002), (I-339)+(1.068)+(2.003), (I-339)+(1.068)+(2.004), (I-339)+(1.068)+(2.005), (I-339)+(1.068)+(2.006), (I-339)+(1.068)+(2.007), (I-339)+(1.068)+(2.008), (I-339)+(1.068)+(2.009), (I-339)+(1.068)+(2.010), (I-339)+(1.068)+(2.011), (I-339)+(1.068)+(2.012), (I-339)+(1.068)+(2.013), (I-339)+(1.068)+(2.014), (I-339)+(1.068)+(2.015), (I-339)+(1.068)+(2.016), (I-339)+(1.068)+(2.017), (I-339)+(1.068)+(2.018), (I-339)+(1.068)+(2.019), (I-339)+(1.068)+(2.020), (I-339)+(1.068)+(2.021), (I-339)+(1.068)+(2.022), (I-339)+(1.068)+(2.023), (I-339)+(1.068)+(2.024), (I-339)+(1.068)+(2.025), (I-339)+(1.068)+(2.026), (I-339)+(1.068)+(2.027), (I-339)+(1.068)+(2.028), (I-339)+(1.068)+(2.029), (I-339)+(1.068)+(2.030), (I-339)+(1.068)+(2.031), (I-339)+(1.068)+(2.032), (I-339)+(1.068)+(2.033), (I-339)+(1.068)+(2.034), (I-339)+(1.068)+(2.035), (I-339)+(1.068)+(2.036), (I-339)+(1.068)+(2.037), (I-339)+(1.068)+(2.038), (I-339)+(1.068)+(2.039), (I-339)+(1.068)+(2.040), (I-339)+(1.068)+(2.041), (I-339)+(1.068)+(2.042), (I-339)+(1.068)+(2.043), (I-339)+(1.068)+(2.044), (I-339)+(1.068)+(2.045), (I-339)+(1.068)+(2.046), (I-339)+(1.068)+(2.047), (I-339)+(1.068)+(2.048), (I-339)+(1.068)+(2.049), (I-339)+(1.068)+(2.050), (I-339)+(1.068)+(2.051), (I-339)+(1.068)+(2.052), (I-339)+(1.068)+(2.053), (I-339)+(1.068)+(2.054), (I-339)+(1.068)+(2.055), (I-339)+(1.068)+(2.056), (I-339)+(1.068)+(2.057), (I-339)+(1.068)+(2.058), (I-339)+(1.068)+(2.059), (I-339)+(1.068)+(3.001), (I-339)+(1.068)+(3.002), (I-339)+(1.068)+(3.003), (I-339)+(1.068)+(3.004), (I-339)+(1.068)+(3.005), (I-339)+(1.068)+(3.006), (I-339)+(1.068)+(3.007), (I-339)+(1.068)+(3.008), (I-339)+(1.068)+(3.009), (I-339)+(1.068)+(3.010), (I-339)+(1.068)+(3.011), (I-339)+(1.068)+(3.012), (I-339)+(1.068)+(3.013), (I-339)+(1.068)+(3.014), (I-339)+(1.068)+(3.015), (I-339)+(1.068)+(3.016), (I-339)+(1.068)+(3.017), (I-339)+(1.068)+(3.018), (I-339)+(1.068)+(3.019), (I-339)+(1.068)+(3.020), (I-339)+(1.068)+(3.021), (I-339)+(1.068)+(3.022), (I-339)+(1.068)+(3.023), (I-339)+(1.068)+(3.024), (I-339)+(1.068)+(3.025), (I-339)+(1.068)+(3.026), (I-339)+(1.068)+(3.027), (I-339)+(1.068)+(3.028), (I-339)+(1.068)+(3.029), (I-339)+(1.068)+(3.030), (I-339)+(1.068)+(3.031), (I-339)+(1.068)+(5.001), (I-339)+(1.068)+(5.002), (I-339)+(1.068)+(5.003), (I-339)+(1.068)+(5.004), (I-339)+(1.068)+(5.005), (I-339)+(1.068)+(5.006), (I-339)+(1.068)+(5.007), (I-339)+(1.068)+(5.008), (I-339)+(1.068)+(5.009), (I-339)+(1.068)+(5.010), (I-339)+(1.068)+(5.011), (I-339)+(1.068)+(5.012), (I-339)+(1.068)+(5.013), (I-339)+(1.068)+(5.014), (I-339)+(1.068)+(5.015), (I-339)+(1.068)+(5.016), (I-339)+(1.068)+(5.017), (I-339)+(1.068)+(5.018), (I-339)+(1.068)+(5.019), (I-339)+(1.068)+(5.020), (I-339)+(1.068)+(5.021), (I-339)+(1.068)+(5.022), (I-339)+(1.068)+(5.023), (I-339)+(1.068)+(6.001), (I-339)+(1.068)+(6.002), (I-339)+(1.068)+(6.003), (I-339)+(1.068)+(6.004), (I-339)+(1.068)+(7.001), (I-339)+(1.068)+(7.002), (I-339)+(1.068)+(7.003), (I-339)+(1.068)+(7.004), (I-339)+(1.068)+(7.005), (I-339)+(1.068)+(7.006), (I-339)+(1.068)+(9.001), (I-339)+(1.068)+(9.002), (I-339)+(1.068)+(9.003), (I-339)+(1.068)+(9.004), (I-339)+(1.068)+(9.005), (I-339)+(1.068)+(9.006), (I-339)+(1.068)+(9.007), (I-339)+(1.068)+(9.008), (I-339)+(1.068)+(9.009), (I-339)+(1.068)+(14.001), (I-339)+(1.068)+(14.002), (I-339)+(1.068)+(15.008), (I-339)+(1.068)+(15.011), (I-339)+(1.068)+(15.012), (I-339)+(1.068)+(15.016), (I-339)+(1.068)+(15.025), (I-339)+(1.068)+(15.027), (I-339)+(1.068)+(15.047), (I-339)+(1.068)+(15.063), (I-339)+(1.068)+(15.064), (I-339)+(1.068)+(16.001), (I-339)+(1.068)+(16.002), (I-339)+(1.068)+(16.003), (I-339)+(1.068)+(16.004), (I-339)+(1.068)+(16.005), (I-339)+(1.068)+(16.006), (I-339)+(1.068)+(16.007), (I-339)+(1.068)+(16.008), (I-339)+(1.068)+(17.001), (I-339)+(1.068)+(17.002), (I-339)+(1.068)+(17.003), (I-339)+(1.068)+(17.004), (I-339)+(1.068)+(17.005), (I-339)+(1.068)+(17.006), (I-339)+(1.068)+(17.007), (I-339)+(1.068)+(17.008), (I-339)+(1.068)+(17.009), (I-339)+(1.068)+(17.010), (I-339)+(1.068)+(17.011), (I-339)+(1.068)+(17.012), (I-339)+(1.068)+(18.001), (I-339)+(1.069)+(1.070), (I-339)+(1.069)+(1.071), (I-339)+(1.069)+(1.072), (I-339)+(1.069)+(1.073), (I-339)+(1.069)+(1.074), (I-339)+(1.069)+(1.075), (I-339)+(1.069)+(1.076), (I-339)+(1.069)+(1.077), (I-339)+(1.069)+(1.078), (I-339)+(1.069)+(1.079), (I-339)+(1.069)+(1.080), (I-339)+(1.069)+(1.081), (I-339)+(1.069)+(1.082), (I-339)+(1.069)+(1.083), (I-339)+(1.069)+(1.084), (I-339)+(1.069)+(1.085), (I-339)+(1.069)+(1.086), (I-339)+(1.069)+(1.087), (I-339)+(1.069)+(1.088), (I-339)+(1.069)+(1.089), (I-339)+(1.069)+(1.090), (I-339)+(1.069)+(1.091), (I-339)+(1.069)+(1.092), (I-339)+(1.069)+(2.001), (I-339)+(1.069)+(2.002), (I-339)+(1.069)+(2.003), (I-339)+(1.069)+(2.004), (I-339)+(1.069)+(2.005), (I-339)+(1.069)+(2.006), (I-339)+(1.069)+(2.007), (I-339)+(1.069)+(2.008), (I-339)+(1.069)+(2.009), (I-339)+(1.069)+(2.010), (I-339)+(1.069)+(2.011), (I-339)+(1.069)+(2.012), (I-339)+(1.069)+(2.013), (I-339)+(1.069)+(2.014), (I-339)+(1.069)+(2.015), (I-339)+(1.069)+(2.016), (I-339)+(1.069)+(2.017), (I-339)+(1.069)+(2.018), (I-339)+(1.069)+(2.019), (I-339)+(1.069)+(2.020), (I-339)+(1.069)+(2.021), (I-339)+(1.069)+(2.022), (I-339)+(1.069)+(2.023), (I-339)+(1.069)+(2.024), (I-339)+(1.069)+(2.025), (I-339)+(1.069)+(2.026), (I-339)+(1.069)+(2.027), (I-339)+(1.069)+(2.028), (I-339)+(1.069)+(2.029), (I-339)+(1.069)+(2.030), (I-339)+(1.069)+(2.031), (I-339)+(1.069)+(2.032), (I-339)+(1.069)+(2.033), (I-339)+(1.069)+(2.034), (I-339)+(1.069)+(2.035), (I-339)+(1.069)+(2.036), (I-339)+(1.069)+(2.037), (I-339)+(1.069)+(2.038), (I-339)+(1.069)+(2.039), (I-339)+(1.069)+(2.040), (I-339)+(1.069)+(2.041), (I-339)+(1.069)+(2.042), (I-339)+(1.069)+(2.043), (I-339)+(1.069)+(2.044), (I-339)+(1.069)+(2.045), (I-339)+(1.069)+(2.046), (I-339)+(1.069)+(2.047), (I-339)+(1.069)+(2.048), (I-339)+(1.069)+(2.049), (I-339)+(1.069)+(2.050), (I-339)+(1.069)+(2.051), (I-339)+(1.069)+(2.052), (I-339)+(1.069)+(2.053), (I-339)+(1.069)+(2.054), (I-339)+(1.069)+(2.055), (I-339)+(1.069)+(2.056), (I-339)+(1.069)+(2.057), (I-339)+(1.069)+(2.058), (I-339)+(1.069)+(2.059), (I-339)+(1.069)+(3.001), (I-339)+(1.069)+(3.002), (I-339)+(1.069)+(3.003), (I-339)+(1.069)+(3.004), (I-339)+(1.069)+(3.005), (I-339)+(1.069)+(3.006), (I-339)+(1.069)+(3.007), (I-339)+(1.069)+(3.008), (I-339)+(1.069)+(3.009), (I-339)+(1.069)+(3.010), (I-339)+(1.069)+(3.011), (I-339)+(1.069)+(3.012), (I-339)+(1.069)+(3.013), (I-339)+(1.069)+(3.014), (I-339)+(1.069)+(3.015), (I-339)+(1.069)+(3.016), (I-339)+(1.069)+(3.017), (I-339)+(1.069)+(3.018), (I-339)+(1.069)+(3.019), (I-339)+(1.069)+(3.020), (I-339)+(1.069)+(3.021), (I-339)+(1.069)+(3.022), (I-339)+(1.069)+(3.023), (I-339)+(1.069)+(3.024), (I-339)+(1.069)+(3.025), (I-339)+(1.069)+(3.026), (I-339)+(1.069)+(3.027), (I-339)+(1.069)+(3.028), (I-339)+(1.069)+(3.029), (I-339)+(1.069)+(3.030), (I-339)+(1.069)+(3.031), (I-339)+(1.069)+(5.001), (I-339)+(1.069)+(5.002), (I-339)+(1.069)+(5.003), (I-339)+(1.069)+(5.004), (I-339)+(1.069)+(5.005), (I-339)+(1.069)+(5.006), (I-339)+(1.069)+(5.007), (I-339)+(1.069)+(5.008), (I-339)+(1.069)+(5.009), (I-339)+(1.069)+(5.010), (I-339)+(1.069)+(5.011), (I-339)+(1.069)+(5.012), (I-339)+(1.069)+(5.013), (I-339)+(1.069)+(5.014), (I-339)+(1.069)+(5.015), (I-339)+(1.069)+(5.016), (I-339)+(1.069)+(5.017), (I-339)+(1.069)+(5.018), (I-339)+(1.069)+(5.019), (I-339)+(1.069)+(5.020), (I-339)+(1.069)+(5.021), (I-339)+(1.069)+(5.022), (I-339)+(1.069)+(5.023), (I-339)+(1.069)+(6.001), (I-339)+(1.069)+(6.002), (I-339)+(1.069)+(6.003), (I-339)+(1.069)+(6.004), (I-339)+(1.069)+(7.001), (I-339)+(1.069)+(7.002), (I-339)+(1.069)+(7.003), (I-339)+(1.069)+(7.004), (I-339)+(1.069)+(7.005), (I-339)+(1.069)+(7.006), (I-339)+(1.069)+(9.001), (I-339)+(1.069)+(9.002), (I-339)+(1.069)+(9.003), (I-339)+(1.069)+(9.004), (I-339)+(1.069)+(9.005), (I-339)+(1.069)+(9.006), (I-339)+(1.069)+(9.007), (I-339)+(1.069)+(9.008), (I-339)+(1.069)+(9.009), (I-339)+(1.069)+(14.001), (I-339)+(1.069)+(14.002), (I-339)+(1.069)+(15.008), (I-339)+(1.069)+(15.011), (I-339)+(1.069)+(15.012), (I-339)+(1.069)+(15.016), (I-339)+(1.069)+(15.025), (I-339)+(1.069)+(15.027), (I-339)+(1.069)+(15.047), (I-339)+(1.069)+(15.063), (I-339)+(1.069)+(15.064), (I-339)+(1.069)+(16.001), (I-339)+(1.069)+(16.002), (I-339)+(1.069)+(16.003), (I-339)+(1.069)+(16.004), (I-339)+(1.069)+(16.005), (I-339)+(1.069)+(16.006), (I-339)+(1.069)+(16.007), (I-339)+(1.069)+(16.008), (I-339)+(1.069)+(17.001), (I-339)+(1.069)+(17.002), (I-339)+(1.069)+(17.003), (I-339)+(1.069)+(17.004), (I-339)+(1.069)+(17.005), (I-339)+(1.069)+(17.006), (I-339)+(1.069)+(17.007), (I-339)+(1.069)+(17.008), (I-339)+(1.069)+(17.009), (I-339)+(1.069)+(17.010), (I-339)+(1.069)+(17.011), (I-339)+(1.069)+(17.012), (I-339)+(1.069)+(18.001), (I-339)+(1.070)+(1.071), (I-339)+(1.070)+(1.072), (I-339)+(1.070)+(1.073), (I-339)+(1.070)+(1.074), (I-339)+(1.070)+(1.075), (I-339)+(1.070)+(1.076), (I-339)+(1.070)+(1.077), (I-339)+(1.070)+(1.078), (I-339)+(1.070)+(1.079), (I-339)+(1.070)+(1.080), (I-339)+(1.070)+(1.081), (I-339)+(1.070)+(1.082), (I-339)+(1.070)+(1.083), (I-339)+(1.070)+(1.084), (I-339)+(1.070)+(1.085), (I-339)+(1.070)+(1.086), (I-339)+(1.070)+(1.087), (I-339)+(1.070)+(1.088), (I-339)+(1.070)+(1.089), (I-339)+(1.070)+(1.090), (I-339)+(1.070)+(1.091), (I-339)+(1.070)+(1.092), (I-339)+(1.070)+(2.001), (I-339)+(1.070)+(2.002), (I-339)+(1.070)+(2.003), (I-339)+(1.070)+(2.004), (I-339)+(1.070)+(2.005), (I-339)+(1.070)+(2.006), (I-339)+(1.070)+(2.007), (I-339)+(1.070)+(2.008), (I-339)+(1.070)+(2.009), (I-339)+(1.070)+(2.010), (I-339)+(1.070)+(2.011), (I-339)+(1.070)+(2.012), (I-339)+(1.070)+(2.013), (I-339)+(1.070)+(2.014), (I-339)+(1.070)+(2.015), (I-339)+(1.070)+(2.016), (I-339)+(1.070)+(2.017), (I-339)+(1.070)+(2.018), (I-339)+(1.070)+(2.019), (I-339)+(1.070)+(2.020), (I-339)+(1.070)+(2.021), (I-339)+(1.070)+(2.022), (I-339)+(1.070)+(2.023), (I-339)+(1.070)+(2.024), (I-339)+(1.070)+(2.025), (I-339)+(1.070)+(2.026), (I-339)+(1.070)+(2.027), (I-339)+(1.070)+(2.028), (I-339)+(1.070)+(2.029), (I-339)+(1.070)+(2.030), (I-339)+(1.070)+(2.031), (I-339)+(1.070)+(2.032), (I-339)+(1.070)+(2.033), (I-339)+(1.070)+(2.034), (I-339)+(1.070)+(2.035), (I-339)+(1.070)+(2.036), (I-339)+(1.070)+(2.037), (I-339)+(1.070)+(2.038), (I-339)+(1.070)+(2.039), (I-339)+(1.070)+(2.040), (I-339)+(1.070)+(2.041), (I-339)+(1.070)+(2.042), (I-339)+(1.070)+(2.043), (I-339)+(1.070)+(2.044), (I-339)+(1.070)+(2.045), (I-339)+(1.070)+(2.046), (I-339)+(1.070)+(2.047), (I-339)+(1.070)+(2.048), (I-339)+(1.070)+(2.049), (I-339)+(1.070)+(2.050), (I-339)+(1.070)+(2.051), (I-339)+(1.070)+(2.052), (I-339)+(1.070)+(2.053), (I-339)+(1.070)+(2.054), (I-339)+(1.070)+(2.055), (I-339)+(1.070)+(2.056), (I-339)+(1.070)+(2.057), (I-339)+(1.070)+(2.058), (I-339)+(1.070)+(2.059), (I-339)+(1.070)+(3.001), (I-339)+(1.070)+(3.002), (I-339)+(1.070)+(3.003), (I-339)+(1.070)+(3.004), (I-339)+(1.070)+(3.005), (I-339)+(1.070)+(3.006), (I-339)+(1.070)+(3.007), (I-339)+(1.070)+(3.008), (I-339)+(1.070)+(3.009), (I-339)+(1.070)+(3.010), (I-339)+(1.070)+(3.011), (I-339)+(1.070)+(3.012), (I-339)+(1.070)+(3.013), (I-339)+(1.070)+(3.014), (I-339)+(1.070)+(3.015), (I-339)+(1.070)+(3.016), (I-339)+(1.070)+(3.017), (I-339)+(1.070)+(3.018), (I-339)+(1.070)+(3.019), (I-339)+(1.070)+(3.020), (I-339)+(1.070)+(3.021), (I-339)+(1.070)+(3.022), (I-339)+(1.070)+(3.023), (I-339)+(1.070)+(3.024), (I-339)+(1.070)+(3.025), (I-339)+(1.070)+(3.026), (I-339)+(1.070)+(3.027), (I-339)+(1.070)+(3.028), (I-339)+(1.070)+(3.029), (I-339)+(1.070)+(3.030), (I-339)+(1.070)+(3.031), (I-339)+(1.070)+(5.001), (I-339)+(1.070)+(5.002), (I-339)+(1.070)+(5.003), (I-339)+(1.070)+(5.004), (I-339)+(1.070)+(5.005), (I-339)+(1.070)+(5.006), (I-339)+(1.070)+(5.007), (I-339)+(1.070)+(5.008), (I-339)+(1.070)+(5.009), (I-339)+(1.070)+(5.010), (I-339)+(1.070)+(5.011), (I-339)+(1.070)+(5.012), (I-339)+(1.070)+(5.013), (I-339)+(1.070)+(5.014), (I-339)+(1.070)+(5.015), (I-339)+(1.070)+(5.016), (I-339)+(1.070)+(5.017), (I-339)+(1.070)+(5.018), (I-339)+(1.070)+(5.019), (I-339)+(1.070)+(5.020), (I-339)+(1.070)+(5.021), (I-339)+(1.070)+(5.022), (I-339)+(1.070)+(5.023), (I-339)+(1.070)+(6.001), (I-339)+(1.070)+(6.002), (I-339)+(1.070)+(6.003), (I-339)+(1.070)+(6.004), (I-339)+(1.070)+(7.001), (I-339)+(1.070)+(7.002), (I-339)+(1.070)+(7.003), (I-339)+(1.070)+(7.004), (I-339)+(1.070)+(7.005), (I-339)+(1.070)+(7.006), (I-339)+(1.070)+(9.001), (I-339)+(1.070)+(9.002), (I-339)+(1.070)+(9.003), (I-339)+(1.070)+(9.004), (I-339)+(1.070)+(9.005), (I-339)+(1.070)+(9.006), (I-339)+(1.070)+(9.007), (I-339)+(1.070)+(9.008), (I-339)+(1.070)+(9.009), (I-339)+(1.070)+(14.001), (I-339)+(1.070)+(14.002), (I-339)+(1.070)+(15.008), (I-339)+(1.070)+(15.011), (I-339)+(1.070)+(15.012), (I-339)+(1.070)+(15.016), (I-339)+(1.070)+(15.025), (I-339)+(1.070)+(15.027), (I-339)+(1.070)+(15.047), (I-339)+(1.070)+(15.063), (I-339)+(1.070)+(15.064), (I-339)+(1.070)+(16.001), (I-339)+(1.070)+(16.002), (I-339)+(1.070)+(16.003), (I-339)+(1.070)+(16.004), (I-339)+(1.070)+(16.005), (I-339)+(1.070)+(16.006), (I-339)+(1.070)+(16.007), (I-339)+(1.070)+(16.008), (I-339)+(1.070)+(17.001), (I-339)+(1.070)+(17.002), (I-339)+(1.070)+(17.003), (I-339)+(1.070)+(17.004), (I-339)+(1.070)+(17.005), (I-339)+(1.070)+(17.006), (I-339)+(1.070)+(17.007), (I-339)+(1.070)+(17.008), (I-339)+(1.070)+(17.009), (I-339)+(1.070)+(17.010), (I-339)+(1.070)+(17.011), (I-339)+(1.070)+(17.012), (I-339)+(1.070)+(18.001), (I-339)+(1.071)+(1.072), (I-339)+(1.071)+(1.073), (I-339)+(1.071)+(1.074), (I-339)+(1.071)+(1.075), (I-339)+(1.071)+(1.076), (I-339)+(1.071)+(1.077), (I-339)+(1.071)+(1.078), (I-339)+(1.071)+(1.079), (I-339)+(1.071)+(1.080), (I-339)+(1.071)+(1.081), (I-339)+(1.071)+(1.082), (I-339)+(1.071)+(1.083), (I-339)+(1.071)+(1.084), (I-339)+(1.071)+(1.085), (I-339)+(1.071)+(1.086), (I-339)+(1.071)+(1.087), (I-339)+(1.071)+(1.088), (I-339)+(1.071)+(1.089), (I-339)+(1.071)+(1.090), (I-339)+(1.071)+(1.091), (I-339)+(1.071)+(1.092), (I-339)+(1.071)+(2.001), (I-339)+(1.071)+(2.002), (I-339)+(1.071)+(2.003), (I-339)+(1.071)+(2.004), (I-339)+(1.071)+(2.005), (I-339)+(1.071)+(2.006), (I-339)+(1.071)+(2.007), (I-339)+(1.071)+(2.008), (I-339)+(1.071)+(2.009), (I-339)+(1.071)+(2.010), (I-339)+(1.071)+(2.011), (I-339)+(1.071)+(2.012), (I-339)+(1.071)+(2.013), (I-339)+(1.071)+(2.014), (I-339)+(1.071)+(2.015), (I-339)+(1.071)+(2.016), (I-339)+(1.071)+(2.017), (I-339)+(1.071)+(2.018), (I-339)+(1.071)+(2.019), (I-339)+(1.071)+(2.020), (I-339)+(1.071)+(2.021), (I-339)+(1.071)+(2.022), (I-339)+(1.071)+(2.023), (I-339)+(1.071)+(2.024), (I-339)+(1.071)+(2.025), (I-339)+(1.071)+(2.026), (I-339)+(1.071)+(2.027), (I-339)+(1.071)+(2.028), (I-339)+(1.071)+(2.029), (I-339)+(1.071)+(2.030), (I-339)+(1.071)+(2.031), (I-339)+(1.071)+(2.032), (I-339)+(1.071)+(2.033), (I-339)+(1.071)+(2.034), (I-339)+(1.071)+(2.035), (I-339)+(1.071)+(2.036), (I-339)+(1.071)+(2.037), (I-339)+(1.071)+(2.038), (I-339)+(1.071)+(2.039), (I-339)+(1.071)+(2.040), (I-339)+(1.071)+(2.041), (I-339)+(1.071)+(2.042), (I-339)+(1.071)+(2.043), (I-339)+(1.071)+(2.044), (I-339)+(1.071)+(2.045), (I-339)+(1.071)+(2.046), (I-339)+(1.071)+(2.047), (I-339)+(1.071)+(2.048), (I-339)+(1.071)+(2.049), (I-339)+(1.071)+(2.050), (I-339)+(1.071)+(2.051), (I-339)+(1.071)+(2.052), (I-339)+(1.071)+(2.053), (I-339)+(1.071)+(2.054), (I-339)+(1.071)+(2.055), (I-339)+(1.071)+(2.056), (I-339)+(1.071)+(2.057), (I-339)+(1.071)+(2.058), (I-339)+(1.071)+(2.059), (I-339)+(1.071)+(3.001), (I-339)+(1.071)+(3.002), (I-339)+(1.071)+(3.003), (I-339)+(1.071)+(3.004), (I-339)+(1.071)+(3.005), (I-339)+(1.071)+(3.006), (I-339)+(1.071)+(3.007), (I-339)+(1.071)+(3.008), (I-339)+(1.071)+(3.009), (I-339)+(1.071)+(3.010), (I-339)+(1.071)+(3.011), (I-339)+(1.071)+(3.012), (I-339)+(1.071)+(3.013), (I-339)+(1.071)+(3.014), (I-339)+(1.071)+(3.015), (I-339)+(1.071)+(3.016), (I-339)+(1.071)+(3.017), (I-339)+(1.071)+(3.018), (I-339)+(1.071)+(3.019), (I-339)+(1.071)+(3.020), (I-339)+(1.071)+(3.021), (I-339)+(1.071)+(3.022), (I-339)+(1.071)+(3.023), (I-339)+(1.071)+(3.024), (I-339)+(1.071)+(3.025), (I-339)+(1.071)+(3.026), (I-339)+(1.071)+(3.027), (I-339)+(1.071)+(3.028), (I-339)+(1.071)+(3.029), (I-339)+(1.071)+(3.030), (I-339)+(1.071)+(3.031), (I-339)+(1.071)+(5.001), (I-339)+(1.071)+(5.002), (I-339)+(1.071)+(5.003), (I-339)+(1.071)+(5.004), (I-339)+(1.071)+(5.005), (I-339)+(1.071)+(5.006), (I-339)+(1.071)+(5.007), (I-339)+(1.071)+(5.008), (I-339)+(1.071)+(5.009), (I-339)+(1.071)+(5.010), (I-339)+(1.071)+(5.011), (I-339)+(1.071)+(5.012), (I-339)+(1.071)+(5.013), (I-339)+(1.071)+(5.014), (I-339)+(1.071)+(5.015), (I-339)+(1.071)+(5.016), (I-339)+(1.071)+(5.017), (I-339)+(1.071)+(5.018), (I-339)+(1.071)+(5.019), (I-339)+(1.071)+(5.020), (I-339)+(1.071)+(5.021), (I-339)+(1.071)+(5.022), (I-339)+(1.071)+(5.023), (I-339)+(1.071)+(6.001), (I-339)+(1.071)+(6.002), (I-339)+(1.071)+(6.003), (I-339)+(1.071)+(6.004), (I-339)+(1.071)+(7.001), (I-339)+(1.071)+(7.002), (I-339)+(1.071)+(7.003), (I-339)+(1.071)+(7.004), (I-339)+(1.071)+(7.005), (I-339)+(1.071)+(7.006), (I-339)+(1.071)+(9.001), (I-339)+(1.071)+(9.002), (I-339)+(1.071)+(9.003), (I-339)+(1.071)+(9.004), (I-339)+(1.071)+(9.005), (I-339)+(1.071)+(9.006), (I-339)+(1.071)+(9.007), (I-339)+(1.071)+(9.008), (I-339)+(1.071)+(9.009), (I-339)+(1.071)+(14.001), (I-339)+(1.071)+(14.002), (I-339)+(1.071)+(15.008), (I-339)+(1.071)+(15.011), (I-339)+(1.071)+(15.012), (I-339)+(1.071)+(15.016), (I-339)+(1.071)+(15.025), (I-339)+(1.071)+(15.027), (I-339)+(1.071)+(15.047), (I-339)+(1.071)+(15.063), (I-339)+(1.071)+(15.064), (I-339)+(1.071)+(16.001), (I-339)+(1.071)+(16.002), (I-339)+(1.071)+(16.003), (I-339)+(1.071)+(16.004), (I-339)+(1.071)+(16.005), (I-339)+(1.071)+(16.006), (I-339)+(1.071)+(16.007), (I-339)+(1.071)+(16.008), (I-339)+(1.071)+(17.001), (I-339)+(1.071)+(17.002), (I-339)+(1.071)+(17.003), (I-339)+(1.071)+(17.004), (I-339)+(1.071)+(17.005), (I-339)+(1.071)+(17.006), (I-339)+(1.071)+(17.007), (I-339)+(1.071)+(17.008), (I-339)+(1.071)+(17.009), (I-339)+(1.071)+(17.010), (I-339)+(1.071)+(17.011), (I-339)+(1.071)+(17.012), (I-339)+(1.071)+(18.001), (I-339)+(1.072)+(1.073), (I-339)+(1.072)+(1.074), (I-339)+(1.072)+(1.075), (I-339)+(1.072)+(1.076), (I-339)+(1.072)+(1.077), (I-339)+(1.072)+(1.078), (I-339)+(1.072)+(1.079), (I-339)+(1.072)+(1.080), (I-339)+(1.072)+(1.081), (I-339)+(1.072)+(1.082), (I-339)+(1.072)+(1.083), (I-339)+(1.072)+(1.084), (I-339)+(1.072)+(1.085), (I-339)+(1.072)+(1.086), (I-339)+(1.072)+(1.087), (I-339)+(1.072)+(1.088), (I-339)+(1.072)+(1.089), (I-339)+(1.072)+(1.090), (I-339)+(1.072)+(1.091), (I-339)+(1.072)+(1.092), (I-339)+(1.072)+(2.001), (I-339)+(1.072)+(2.002), (I-339)+(1.072)+(2.003), (I-339)+(1.072)+(2.004), (I-339)+(1.072)+(2.005), (I-339)+(1.072)+(2.006), (I-339)+(1.072)+(2.007), (I-339)+(1.072)+(2.008), (I-339)+(1.072)+(2.009), (I-339)+(1.072)+(2.010), (I-339)+(1.072)+(2.011), (I-339)+(1.072)+(2.012), (I-339)+(1.072)+(2.013), (I-339)+(1.072)+(2.014), (I-339)+(1.072)+(2.015), (I-339)+(1.072)+(2.016), (I-339)+(1.072)+(2.017), (I-339)+(1.072)+(2.018), (I-339)+(1.072)+(2.019), (I-339)+(1.072)+(2.020), (I-339)+(1.072)+(2.021), (I-339)+(1.072)+(2.022), (I-339)+(1.072)+(2.023), (I-339)+(1.072)+(2.024), (I-339)+(1.072)+(2.025), (I-339)+(1.072)+(2.026), (I-339)+(1.072)+(2.027), (I-339)+(1.072)+(2.028), (I-339)+(1.072)+(2.029), (I-339)+(1.072)+(2.030), (I-339)+(1.072)+(2.031), (I-339)+(1.072)+(2.032), (I-339)+(1.072)+(2.033), (I-339)+(1.072)+(2.034), (I-339)+(1.072)+(2.035), (I-339)+(1.072)+(2.036), (I-339)+(1.072)+(2.037), (I-339)+(1.072)+(2.038), (I-339)+(1.072)+(2.039), (I-339)+(1.072)+(2.040), (I-339)+(1.072)+(2.041), (I-339)+(1.072)+(2.042), (I-339)+(1.072)+(2.043), (I-339)+(1.072)+(2.044), (I-339)+(1.072)+(2.045), (I-339)+(1.072)+(2.046), (I-339)+(1.072)+(2.047), (I-339)+(1.072)+(2.048), (I-339)+(1.072)+(2.049), (I-339)+(1.072)+(2.050), (I-339)+(1.072)+(2.051), (I-339)+(1.072)+(2.052), (I-339)+(1.072)+(2.053), (I-339)+(1.072)+(2.054), (I-339)+(1.072)+(2.055), (I-339)+(1.072)+(2.056), (I-339)+(1.072)+(2.057), (I-339)+(1.072)+(2.058), (I-339)+(1.072)+(2.059), (I-339)+(1.072)+(3.001), (I-339)+(1.072)+(3.002), (I-339)+(1.072)+(3.003), (I-339)+(1.072)+(3.004), (I-339)+(1.072)+(3.005), (I-339)+(1.072)+(3.006), (I-339)+(1.072)+(3.007), (I-339)+(1.072)+(3.008), (I-339)+(1.072)+(3.009), (I-339)+(1.072)+(3.010), (I-339)+(1.072)+(3.011), (I-339)+(1.072)+(3.012), (I-339)+(1.072)+(3.013), (I-339)+(1.072)+(3.014), (I-339)+(1.072)+(3.015), (I-339)+(1.072)+(3.016), (I-339)+(1.072)+(3.017), (I-339)+(1.072)+(3.018), (I-339)+(1.072)+(3.019), (I-339)+(1.072)+(3.020), (I-339)+(1.072)+(3.021), (I-339)+(1.072)+(3.022), (I-339)+(1.072)+(3.023), (I-339)+(1.072)+(3.024), (I-339)+(1.072)+(3.025), (I-339)+(1.072)+(3.026), (I-339)+(1.072)+(3.027), (I-339)+(1.072)+(3.028), (I-339)+(1.072)+(3.029), (I-339)+(1.072)+(3.030), (I-339)+(1.072)+(3.031), (I-339)+(1.072)+(5.001), (I-339)+(1.072)+(5.002), (I-339)+(1.072)+(5.003), (I-339)+(1.072)+(5.004), (I-339)+(1.072)+(5.005), (I-339)+(1.072)+(5.006), (I-339)+(1.072)+(5.007), (I-339)+(1.072)+(5.008), (I-339)+(1.072)+(5.009), (I-339)+(1.072)+(5.010), (I-339)+(1.072)+(5.011), (I-339)+(1.072)+(5.012), (I-339)+(1.072)+(5.013), (I-339)+(1.072)+(5.014), (I-339)+(1.072)+(5.015), (I-339)+(1.072)+(5.016), (I-339)+(1.072)+(5.017), (I-339)+(1.072)+(5.018), (I-339)+(1.072)+(5.019), (I-339)+(1.072)+(5.020), (I-339)+(1.072)+(5.021), (I-339)+(1.072)+(5.022), (I-339)+(1.072)+(5.023), (I-339)+(1.072)+(6.001), (I-339)+(1.072)+(6.002), (I-339)+(1.072)+(6.003), (I-339)+(1.072)+(6.004), (I-339)+(1.072)+(7.001), (I-339)+(1.072)+(7.002), (I-339)+(1.072)+(7.003), (I-339)+(1.072)+(7.004), (I-339)+(1.072)+(7.005), (I-339)+(1.072)+(7.006), (I-339)+(1.072)+(9.001), (I-339)+(1.072)+(9.002), (I-339)+(1.072)+(9.003), (I-339)+(1.072)+(9.004), (I-339)+(1.072)+(9.005), (I-339)+(1.072)+(9.006), (I-339)+(1.072)+(9.007), (I-339)+(1.072)+(9.008), (I-339)+(1.072)+(9.009), (I-339)+(1.072)+(14.001), (I-339)+(1.072)+(14.002), (I-339)+(1.072)+(15.008), (I-339)+(1.072)+(15.011), (I-339)+(1.072)+(15.012), (I-339)+(1.072)+(15.016), (I-339)+(1.072)+(15.025), (I-339)+(1.072)+(15.027), (I-339)+(1.072)+(15.047), (I-339)+(1.072)+(15.063), (I-339)+(1.072)+(15.064), (I-339)+(1.072)+(16.001), (I-339)+(1.072)+(16.002), (I-339)+(1.072)+(16.003), (I-339)+(1.072)+(16.004), (I-339)+(1.072)+(16.005), (I-339)+(1.072)+(16.006), (I-339)+(1.072)+(16.007), (I-339)+(1.072)+(16.008), (I-339)+(1.072)+(17.001), (I-339)+(1.072)+(17.002), (I-339)+(1.072)+(17.003), (I-339)+(1.072)+(17.004), (I-339)+(1.072)+(17.005), (I-339)+(1.072)+(17.006), (I-339)+(1.072)+(17.007), (I-339)+(1.072)+(17.008), (I-339)+(1.072)+(17.009), (I-339)+(1.072)+(17.010), (I-339)+(1.072)+(17.011), (I-339)+(1.072)+(17.012), (I-339)+(1.072)+(18.001), (I-339)+(1.073)+(1.074), (I-339)+(1.073)+(1.075), (I-339)+(1.073)+(1.076), (I-339)+(1.073)+(1.077), (I-339)+(1.073)+(1.078), (I-339)+(1.073)+(1.079), (I-339)+(1.073)+(1.080), (I-339)+(1.073)+(1.081), (I-339)+(1.073)+(1.082), (I-339)+(1.073)+(1.083), (I-339)+(1.073)+(1.084), (I-339)+(1.073)+(1.085), (I-339)+(1.073)+(1.086), (I-339)+(1.073)+(1.087), (I-339)+(1.073)+(1.088), (I-339)+(1.073)+(1.089), (I-339)+(1.073)+(1.090), (I-339)+(1.073)+(1.091), (I-339)+(1.073)+(1.092), (I-339)+(1.073)+(2.001), (I-339)+(1.073)+(2.002), (I-339)+(1.073)+(2.003), (I-339)+(1.073)+(2.004), (I-339)+(1.073)+(2.005), (I-339)+(1.073)+(2.006), (I-339)+(1.073)+(2.007), (I-339)+(1.073)+(2.008), (I-339)+(1.073)+(2.009), (I-339)+(1.073)+(2.010), (I-339)+(1.073)+(2.011), (I-339)+(1.073)+(2.012), (I-339)+(1.073)+(2.013), (I-339)+(1.073)+(2.014), (I-339)+(1.073)+(2.015), (I-339)+(1.073)+(2.016), (I-339)+(1.073)+(2.017), (I-339)+(1.073)+(2.018), (I-339)+(1.073)+(2.019), (I-339)+(1.073)+(2.020), (I-339)+(1.073)+(2.021), (I-339)+(1.073)+(2.022), (I-339)+(1.073)+(2.023), (I-339)+(1.073)+(2.024), (I-339)+(1.073)+(2.025), (I-339)+(1.073)+(2.026), (I-339)+(1.073)+(2.027), (I-339)+(1.073)+(2.028), (I-339)+(1.073)+(2.029), (I-339)+(1.073)+(2.030), (I-339)+(1.073)+(2.031), (I-339)+(1.073)+(2.032), (I-339)+(1.073)+(2.033), (I-339)+(1.073)+(2.034), (I-339)+(1.073)+(2.035), (I-339)+(1.073)+(2.036), (I-339)+(1.073)+(2.037), (I-339)+(1.073)+(2.038), (I-339)+(1.073)+(2.039), (I-339)+(1.073)+(2.040), (I-339)+(1.073)+(2.041), (I-339)+(1.073)+(2.042), (I-339)+(1.073)+(2.043), (I-339)+(1.073)+(2.044), (I-339)+(1.073)+(2.045), (I-339)+(1.073)+(2.046), (I-339)+(1.073)+(2.047), (I-339)+(1.073)+(2.048), (I-339)+(1.073)+(2.049), (I-339)+(1.073)+(2.050), (I-339)+(1.073)+(2.051), (I-339)+(1.073)+(2.052), (I-339)+(1.073)+(2.053), (I-339)+(1.073)+(2.054), (I-339)+(1.073)+(2.055), (I-339)+(1.073)+(2.056), (I-339)+(1.073)+(2.057), (I-339)+(1.073)+(2.058), (I-339)+(1.073)+(2.059), (I-339)+(1.073)+(3.001), (I-339)+(1.073)+(3.002), (I-339)+(1.073)+(3.003), (I-339)+(1.073)+(3.004), (I-339)+(1.073)+(3.005), (I-339)+(1.073)+(3.006), (I-339)+(1.073)+(3.007), (I-339)+(1.073)+(3.008), (I-339)+(1.073)+(3.009), (I-339)+(1.073)+(3.010), (I-339)+(1.073)+(3.011), (I-339)+(1.073)+(3.012), (I-339)+(1.073)+(3.013), (I-339)+(1.073)+(3.014), (I-339)+(1.073)+(3.015), (I-339)+(1.073)+(3.016), (I-339)+(1.073)+(3.017), (I-339)+(1.073)+(3.018), (I-339)+(1.073)+(3.019), (I-339)+(1.073)+(3.020), (I-339)+(1.073)+(3.021), (I-339)+(1.073)+(3.022), (I-339)+(1.073)+(3.023), (I-339)+(1.073)+(3.024), (I-339)+(1.073)+(3.025), (I-339)+(1.073)+(3.026), (I-339)+(1.073)+(3.027), (I-339)+(1.073)+(3.028), (I-339)+(1.073)+(3.029), (I-339)+(1.073)+(3.030), (I-339)+(1.073)+(3.031), (I-339)+(1.073)+(5.001), (I-339)+(1.073)+(5.002), (I-339)+(1.073)+(5.003), (I-339)+(1.073)+(5.004), (I-339)+(1.073)+(5.005), (I-339)+(1.073)+(5.006), (I-339)+(1.073)+(5.007), (I-339)+(1.073)+(5.008), (I-339)+(1.073)+(5.009), (I-339)+(1.073)+(5.010), (I-339)+(1.073)+(5.011), (I-339)+(1.073)+(5.012), (I-339)+(1.073)+(5.013), (I-339)+(1.073)+(5.014), (I-339)+(1.073)+(5.015), (I-339)+(1.073)+(5.016), (I-339)+(1.073)+(5.017), (I-339)+(1.073)+(5.018), (I-339)+(1.073)+(5.019), (I-339)+(1.073)+(5.020), (I-339)+(1.073)+(5.021), (I-339)+(1.073)+(5.022), (I-339)+(1.073)+(5.023), (I-339)+(1.073)+(6.001), (I-339)+(1.073)+(6.002), (I-339)+(1.073)+(6.003), (I-339)+(1.073)+(6.004), (I-339)+(1.073)+(7.001), (I-339)+(1.073)+(7.002), (I-339)+(1.073)+(7.003), (I-339)+(1.073)+(7.004), (I-339)+(1.073)+(7.005), (I-339)+(1.073)+(7.006), (I-339)+(1.073)+(9.001), (I-339)+(1.073)+(9.002), (I-339)+(1.073)+(9.003), (I-339)+(1.073)+(9.004), (I-339)+(1.073)+(9.005), (I-339)+(1.073)+(9.006), (I-339)+(1.073)+(9.007), (I-339)+(1.073)+(9.008), (I-339)+(1.073)+(9.009), (I-339)+(1.073)+(14.001), (I-339)+(1.073)+(14.002), (I-339)+(1.073)+(15.008), (I-339)+(1.073)+(15.011), (I-339)+(1.073)+(15.012), (I-339)+(1.073)+(15.016), (I-339)+(1.073)+(15.025), (I-339)+(1.073)+(15.027), (I-339)+(1.073)+(15.047), (I-339)+(1.073)+(15.063), (I-339)+(1.073)+(15.064), (I-339)+(1.073)+(16.001), (I-339)+(1.073)+(16.002), (I-339)+(1.073)+(16.003), (I-339)+(1.073)+(16.004), (I-339)+(1.073)+(16.005), (I-339)+(1.073)+(16.006), (I-339)+(1.073)+(16.007), (I-339)+(1.073)+(16.008), (I-339)+(1.073)+(17.001), (I-339)+(1.073)+(17.002), (I-339)+(1.073)+(17.003), (I-339)+(1.073)+(17.004), (I-339)+(1.073)+(17.005), (I-339)+(1.073)+(17.006), (I-339)+(1.073)+(17.007), (I-339)+(1.073)+(17.008), (I-339)+(1.073)+(17.009), (I-339)+(1.073)+(17.010), (I-339)+(1.073)+(17.011), (I-339)+(1.073)+(17.012), (I-339)+(1.073)+(18.001), (I-339)+(1.074)+(1.075), (I-339)+(1.074)+(1.076), (I-339)+(1.074)+(1.077), (I-339)+(1.074)+(1.078), (I-339)+(1.074)+(1.079), (I-339)+(1.074)+(1.080), (I-339)+(1.074)+(1.081), (I-339)+(1.074)+(1.082), (I-339)+(1.074)+(1.083), (I-339)+(1.074)+(1.084), (I-339)+(1.074)+(1.085), (I-339)+(1.074)+(1.086), (I-339)+(1.074)+(1.087), (I-339)+(1.074)+(1.088), (I-339)+(1.074)+(1.089), (I-339)+(1.074)+(1.090), (I-339)+(1.074)+(1.091), (I-339)+(1.074)+(1.092), (I-339)+(1.074)+(2.001), (I-339)+(1.074)+(2.002), (I-339)+(1.074)+(2.003), (I-339)+(1.074)+(2.004), (I-339)+(1.074)+(2.005), (I-339)+(1.074)+(2.006), (I-339)+(1.074)+(2.007), (I-339)+(1.074)+(2.008), (I-339)+(1.074)+(2.009), (I-339)+(1.074)+(2.010), (I-339)+(1.074)+(2.011), (I-339)+(1.074)+(2.012), (I-339)+(1.074)+(2.013), (I-339)+(1.074)+(2.014), (I-339)+(1.074)+(2.015), (I-339)+(1.074)+(2.016), (I-339)+(1.074)+(2.017), (I-339)+(1.074)+(2.018), (I-339)+(1.074)+(2.019), (I-339)+(1.074)+(2.020), (I-339)+(1.074)+(2.021), (I-339)+(1.074)+(2.022), (I-339)+(1.074)+(2.023), (I-339)+(1.074)+(2.024), (I-339)+(1.074)+(2.025), (I-339)+(1.074)+(2.026), (I-339)+(1.074)+(2.027), (I-339)+(1.074)+(2.028), (I-339)+(1.074)+(2.029), (I-339)+(1.074)+(2.030), (I-339)+(1.074)+(2.031), (I-339)+(1.074)+(2.032), (I-339)+(1.074)+(2.033), (I-339)+(1.074)+(2.034), (I-339)+(1.074)+(2.035), (I-339)+(1.074)+(2.036), (I-339)+(1.074)+(2.037), (I-339)+(1.074)+(2.038), (I-339)+(1.074)+(2.039), (I-339)+(1.074)+(2.040), (I-339)+(1.074)+(2.041), (I-339)+(1.074)+(2.042), (I-339)+(1.074)+(2.043), (I-339)+(1.074)+(2.044), (I-339)+(1.074)+(2.045), (I-339)+(1.074)+(2.046), (I-339)+(1.074)+(2.047), (I-339)+(1.074)+(2.048), (I-339)+(1.074)+(2.049), (I-339)+(1.074)+(2.050), (I-339)+(1.074)+(2.051), (I-339)+(1.074)+(2.052), (I-339)+(1.074)+(2.053), (I-339)+(1.074)+(2.054), (I-339)+(1.074)+(2.055), (I-339)+(1.074)+(2.056), (I-339)+(1.074)+(2.057), (I-339)+(1.074)+(2.058), (I-339)+(1.074)+(2.059), (I-339)+(1.074)+(3.001), (I-339)+(1.074)+(3.002), (I-339)+(1.074)+(3.003), (I-339)+(1.074)+(3.004), (I-339)+(1.074)+(3.005), (I-339)+(1.074)+(3.006), (I-339)+(1.074)+(3.007), (I-339)+(1.074)+(3.008), (I-339)+(1.074)+(3.009), (I-339)+(1.074)+(3.010), (I-339)+(1.074)+(3.011), (I-339)+(1.074)+(3.012), (I-339)+(1.074)+(3.013), (I-339)+(1.074)+(3.014), (I-339)+(1.074)+(3.015), (I-339)+(1.074)+(3.016), (I-339)+(1.074)+(3.017), (I-339)+(1.074)+(3.018), (I-339)+(1.074)+(3.019), (I-339)+(1.074)+(3.020), (I-339)+(1.074)+(3.021), (I-339)+(1.074)+(3.022), (I-339)+(1.074)+(3.023), (I-339)+(1.074)+(3.024), (I-339)+(1.074)+(3.025), (I-339)+(1.074)+(3.026), (I-339)+(1.074)+(3.027), (I-339)+(1.074)+(3.028), (I-339)+(1.074)+(3.029), (I-339)+(1.074)+(3.030), (I-339)+(1.074)+(3.031), (I-339)+(1.074)+(5.001), (I-339)+(1.074)+(5.002), (I-339)+(1.074)+(5.003), (I-339)+(1.074)+(5.004), (I-339)+(1.074)+(5.005), (I-339)+(1.074)+(5.006), (I-339)+(1.074)+(5.007), (I-339)+(1.074)+(5.008), (I-339)+(1.074)+(5.009), (I-339)+(1.074)+(5.010), (I-339)+(1.074)+(5.011), (I-339)+(1.074)+(5.012), (I-339)+(1.074)+(5.013), (I-339)+(1.074)+(5.014), (I-339)+(1.074)+(5.015), (I-339)+(1.074)+(5.016), (I-339)+(1.074)+(5.017), (I-339)+(1.074)+(5.018), (I-339)+(1.074)+(5.019), (I-339)+(1.074)+(5.020), (I-339)+(1.074)+(5.021), (I-339)+(1.074)+(5.022), (I-339)+(1.074)+(5.023), (I-339)+(1.074)+(6.001), (I-339)+(1.074)+(6.002), (I-339)+(1.074)+(6.003), (I-339)+(1.074)+(6.004), (I-339)+(1.074)+(7.001), (I-339)+(1.074)+(7.002), (I-339)+(1.074)+(7.003), (I-339)+(1.074)+(7.004), (I-339)+(1.074)+(7.005), (I-339)+(1.074)+(7.006), (I-339)+(1.074)+(9.001), (I-339)+(1.074)+(9.002), (I-339)+(1.074)+(9.003), (I-339)+(1.074)+(9.004), (I-339)+(1.074)+(9.005), (I-339)+(1.074)+(9.006), (I-339)+(1.074)+(9.007), (I-339)+(1.074)+(9.008), (I-339)+(1.074)+(9.009), (I-339)+(1.074)+(14.001), (I-339)+(1.074)+(14.002), (I-339)+(1.074)+(15.008), (I-339)+(1.074)+(15.011), (I-339)+(1.074)+(15.012), (I-339)+(1.074)+(15.016), (I-339)+(1.074)+(15.025), (I-339)+(1.074)+(15.027), (I-339)+(1.074)+(15.047), (I-339)+(1.074)+(15.063), (I-339)+(1.074)+(15.064), (I-339)+(1.074)+(16.001), (I-339)+(1.074)+(16.002), (I-339)+(1.074)+(16.003), (I-339)+(1.074)+(16.004), (I-339)+(1.074)+(16.005), (I-339)+(1.074)+(16.006), (I-339)+(1.074)+(16.007), (I-339)+(1.074)+(16.008), (I-339)+(1.074)+(17.001), (I-339)+(1.074)+(17.002), (I-339)+(1.074)+(17.003), (I-339)+(1.074)+(17.004), (I-339)+(1.074)+(17.005), (I-339)+(1.074)+(17.006), (I-339)+(1.074)+(17.007), (I-339)+(1.074)+(17.008), (I-339)+(1.074)+(17.009), (I-339)+(1.074)+(17.010), (I-339)+(1.074)+(17.011), (I-339)+(1.074)+(17.012), (I-339)+(1.074)+(18.001), (I-339)+(1.075)+(1.076), (I-339)+(1.075)+(1.077), (I-339)+(1.075)+(1.078), (I-339)+(1.075)+(1.079), (I-339)+(1.075)+(1.080), (I-339)+(1.075)+(1.081), (I-339)+(1.075)+(1.082), (I-339)+(1.075)+(1.083), (I-339)+(1.075)+(1.084), (I-339)+(1.075)+(1.085), (I-339)+(1.075)+(1.086), (I-339)+(1.075)+(1.087), (I-339)+(1.075)+(1.088), (I-339)+(1.075)+(1.089), (I-339)+(1.075)+(1.090), (I-339)+(1.075)+(1.091), (I-339)+(1.075)+(1.092), (I-339)+(1.075)+(2.001), (I-339)+(1.075)+(2.002), (I-339)+(1.075)+(2.003), (I-339)+(1.075)+(2.004), (I-339)+(1.075)+(2.005), (I-339)+(1.075)+(2.006), (I-339)+(1.075)+(2.007), (I-339)+(1.075)+(2.008), (I-339)+(1.075)+(2.009), (I-339)+(1.075)+(2.010), (I-339)+(1.075)+(2.011), (I-339)+(1.075)+(2.012), (I-339)+(1.075)+(2.013), (I-339)+(1.075)+(2.014), (I-339)+(1.075)+(2.015), (I-339)+(1.075)+(2.016), (I-339)+(1.075)+(2.017), (I-339)+(1.075)+(2.018), (I-339)+(1.075)+(2.019), (I-339)+(1.075)+(2.020), (I-339)+(1.075)+(2.021), (I-339)+(1.075)+(2.022), (I-339)+(1.075)+(2.023), (I-339)+(1.075)+(2.024), (I-339)+(1.075)+(2.025), (I-339)+(1.075)+(2.026), (I-339)+(1.075)+(2.027), (I-339)+(1.075)+(2.028), (I-339)+(1.075)+(2.029), (I-339)+(1.075)+(2.030), (I-339)+(1.075)+(2.031), (I-339)+(1.075)+(2.032), (I-339)+(1.075)+(2.033), (I-339)+(1.075)+(2.034), (I-339)+(1.075)+(2.035), (I-339)+(1.075)+(2.036), (I-339)+(1.075)+(2.037), (I-339)+(1.075)+(2.038), (I-339)+(1.075)+(2.039), (I-339)+(1.075)+(2.040), (I-339)+(1.075)+(2.041), (I-339)+(1.075)+(2.042), (I-339)+(1.075)+(2.043), (I-339)+(1.075)+(2.044), (I-339)+(1.075)+(2.045), (I-339)+(1.075)+(2.046), (I-339)+(1.075)+(2.047), (I-339)+(1.075)+(2.048), (I-339)+(1.075)+(2.049), (I-339)+(1.075)+(2.050), (I-339)+(1.075)+(2.051), (I-339)+(1.075)+(2.052), (I-339)+(1.075)+(2.053), (I-339)+(1.075)+(2.054), (I-339)+(1.075)+(2.055), (I-339)+(1.075)+(2.056), (I-339)+(1.075)+(2.057), (I-339)+(1.075)+(2.058), (I-339)+(1.075)+(2.059), (I-339)+(1.075)+(3.001), (I-339)+(1.075)+(3.002), (I-339)+(1.075)+(3.003), (I-339)+(1.075)+(3.004), (I-339)+(1.075)+(3.005), (I-339)+(1.075)+(3.006), (I-339)+(1.075)+(3.007), (I-339)+(1.075)+(3.008), (I-339)+(1.075)+(3.009), (I-339)+(1.075)+(3.010), (I-339)+(1.075)+(3.011), (I-339)+(1.075)+(3.012), (I-339)+(1.075)+(3.013), (I-339)+(1.075)+(3.014), (I-339)+(1.075)+(3.015), (I-339)+(1.075)+(3.016), (I-339)+(1.075)+(3.017), (I-339)+(1.075)+(3.018), (I-339)+(1.075)+(3.019), (I-339)+(1.075)+(3.020), (I-339)+(1.075)+(3.021), (I-339)+(1.075)+(3.022), (I-339)+(1.075)+(3.023), (I-339)+(1.075)+(3.024), (I-339)+(1.075)+(3.025), (I-339)+(1.075)+(3.026), (I-339)+(1.075)+(3.027), (I-339)+(1.075)+(3.028), (I-339)+(1.075)+(3.029), (I-339)+(1.075)+(3.030), (I-339)+(1.075)+(3.031), (I-339)+(1.075)+(5.001), (I-339)+(1.075)+(5.002), (I-339)+(1.075)+(5.003), (I-339)+(1.075)+(5.004), (I-339)+(1.075)+(5.005), (I-339)+(1.075)+(5.006), (I-339)+(1.075)+(5.007), (I-339)+(1.075)+(5.008), (I-339)+(1.075)+(5.009), (I-339)+(1.075)+(5.010), (I-339)+(1.075)+(5.011), (I-339)+(1.075)+(5.012), (I-339)+(1.075)+(5.013), (I-339)+(1.075)+(5.014), (I-339)+(1.075)+(5.015), (I-339)+(1.075)+(5.016), (I-339)+(1.075)+(5.017), (I-339)+(1.075)+(5.018), (I-339)+(1.075)+(5.019), (I-339)+(1.075)+(5.020), (I-339)+(1.075)+(5.021), (I-339)+(1.075)+(5.022), (I-339)+(1.075)+(5.023), (I-339)+(1.075)+(6.001), (I-339)+(1.075)+(6.002), (I-339)+(1.075)+(6.003), (I-339)+(1.075)+(6.004), (I-339)+(1.075)+(7.001), (I-339)+(1.075)+(7.002), (I-339)+(1.075)+(7.003), (I-339)+(1.075)+(7.004), (I-339)+(1.075)+(7.005), (I-339)+(1.075)+(7.006), (I-339)+(1.075)+(9.001), (I-339)+(1.075)+(9.002), (I-339)+(1.075)+(9.003), (I-339)+(1.075)+(9.004), (I-339)+(1.075)+(9.005), (I-339)+(1.075)+(9.006), (I-339)+(1.075)+(9.007), (I-339)+(1.075)+(9.008), (I-339)+(1.075)+(9.009), (I-339)+(1.075)+(14.001), (I-339)+(1.075)+(14.002), (I-339)+(1.075)+(15.008), (I-339)+(1.075)+(15.011), (I-339)+(1.075)+(15.012), (I-339)+(1.075)+(15.016), (I-339)+(1.075)+(15.025), (I-339)+(1.075)+(15.027), (I-339)+(1.075)+(15.047), (I-339)+(1.075)+(15.063), (I-339)+(1.075)+(15.064), (I-339)+(1.075)+(16.001), (I-339)+(1.075)+(16.002), (I-339)+(1.075)+(16.003), (I-339)+(1.075)+(16.004), (I-339)+(1.075)+(16.005), (I-339)+(1.075)+(16.006), (I-339)+(1.075)+(16.007), (I-339)+(1.075)+(16.008), (I-339)+(1.075)+(17.001), (I-339)+(1.075)+(17.002), (I-339)+(1.075)+(17.003), (I-339)+(1.075)+(17.004), (I-339)+(1.075)+(17.005), (I-339)+(1.075)+(17.006), (I-339)+(1.075)+(17.007), (I-339)+(1.075)+(17.008), (I-339)+(1.075)+(17.009), (I-339)+(1.075)+(17.010), (I-339)+(1.075)+(17.011), (I-339)+(1.075)+(17.012), (I-339)+(1.075)+(18.001), (I-339)+(1.076)+(1.077), (I-339)+(1.076)+(1.078), (I-339)+(1.076)+(1.079), (I-339)+(1.076)+(1.080), (I-339)+(1.076)+(1.081), (I-339)+(1.076)+(1.082), (I-339)+(1.076)+(1.083), (I-339)+(1.076)+(1.084), (I-339)+(1.076)+(1.085), (I-339)+(1.076)+(1.086), (I-339)+(1.076)+(1.087), (I-339)+(1.076)+(1.088), (I-339)+(1.076)+(1.089), (I-339)+(1.076)+(1.090), (I-339)+(1.076)+(1.091), (I-339)+(1.076)+(1.092), (I-339)+(1.076)+(2.001), (I-339)+(1.076)+(2.002), (I-339)+(1.076)+(2.003), (I-339)+(1.076)+(2.004), (I-339)+(1.076)+(2.005), (I-339)+(1.076)+(2.006), (I-339)+(1.076)+(2.007), (I-339)+(1.076)+(2.008), (I-339)+(1.076)+(2.009), (I-339)+(1.076)+(2.010), (I-339)+(1.076)+(2.011), (I-339)+(1.076)+(2.012), (I-339)+(1.076)+(2.013), (I-339)+(1.076)+(2.014), (I-339)+(1.076)+(2.015), (I-339)+(1.076)+(2.016), (I-339)+(1.076)+(2.017), (I-339)+(1.076)+(2.018), (I-339)+(1.076)+(2.019), (I-339)+(1.076)+(2.020), (I-339)+(1.076)+(2.021), (I-339)+(1.076)+(2.022), (I-339)+(1.076)+(2.023), (I-339)+(1.076)+(2.024), (I-339)+(1.076)+(2.025), (I-339)+(1.076)+(2.026), (I-339)+(1.076)+(2.027), (I-339)+(1.076)+(2.028), (I-339)+(1.076)+(2.029), (I-339)+(1.076)+(2.030), (I-339)+(1.076)+(2.031), (I-339)+(1.076)+(2.032), (I-339)+(1.076)+(2.033), (I-339)+(1.076)+(2.034), (I-339)+(1.076)+(2.035), (I-339)+(1.076)+(2.036), (I-339)+(1.076)+(2.037), (I-339)+(1.076)+(2.038), (I-339)+(1.076)+(2.039), (I-339)+(1.076)+(2.040), (I-339)+(1.076)+(2.041), (I-339)+(1.076)+(2.042), (I-339)+(1.076)+(2.043), (I-339)+(1.076)+(2.044), (I-339)+(1.076)+(2.045), (I-339)+(1.076)+(2.046), (I-339)+(1.076)+(2.047), (I-339)+(1.076)+(2.048), (I-339)+(1.076)+(2.049), (I-339)+(1.076)+(2.050), (I-339)+(1.076)+(2.051), (I-339)+(1.076)+(2.052), (I-339)+(1.076)+(2.053), (I-339)+(1.076)+(2.054), (I-339)+(1.076)+(2.055), (I-339)+(1.076)+(2.056), (I-339)+(1.076)+(2.057), (I-339)+(1.076)+(2.058), (I-339)+(1.076)+(2.059), (I-339)+(1.076)+(3.001), (I-339)+(1.076)+(3.002), (I-339)+(1.076)+(3.003), (I-339)+(1.076)+(3.004), (I-339)+(1.076)+(3.005), (I-339)+(1.076)+(3.006), (I-339)+(1.076)+(3.007), (I-339)+(1.076)+(3.008), (I-339)+(1.076)+(3.009), (I-339)+(1.076)+(3.010), (I-339)+(1.076)+(3.011), (I-339)+(1.076)+(3.012), (I-339)+(1.076)+(3.013), (I-339)+(1.076)+(3.014), (I-339)+(1.076)+(3.015), (I-339)+(1.076)+(3.016), (I-339)+(1.076)+(3.017), (I-339)+(1.076)+(3.018), (I-339)+(1.076)+(3.019), (I-339)+(1.076)+(3.020), (I-339)+(1.076)+(3.021), (I-339)+(1.076)+(3.022), (I-339)+(1.076)+(3.023), (I-339)+(1.076)+(3.024), (I-339)+(1.076)+(3.025), (I-339)+(1.076)+(3.026), (I-339)+(1.076)+(3.027), (I-339)+(1.076)+(3.028), (I-339)+(1.076)+(3.029), (I-339)+(1.076)+(3.030), (I-339)+(1.076)+(3.031), (I-339)+(1.076)+(5.001), (I-339)+(1.076)+(5.002), (I-339)+(1.076)+(5.003), (I-339)+(1.076)+(5.004), (I-339)+(1.076)+(5.005), (I-339)+(1.076)+(5.006), (I-339)+(1.076)+(5.007), (I-339)+(1.076)+(5.008), (I-339)+(1.076)+(5.009), (I-339)+(1.076)+(5.010), (I-339)+(1.076)+(5.011), (I-339)+(1.076)+(5.012), (I-339)+(1.076)+(5.013), (I-339)+(1.076)+(5.014), (I-339)+(1.076)+(5.015), (I-339)+(1.076)+(5.016), (I-339)+(1.076)+(5.017), (I-339)+(1.076)+(5.018), (I-339)+(1.076)+(5.019), (I-339)+(1.076)+(5.020), (I-339)+(1.076)+(5.021), (I-339)+(1.076)+(5.022), (I-339)+(1.076)+(5.023), (I-339)+(1.076)+(6.001), (I-339)+(1.076)+(6.002), (I-339)+(1.076)+(6.003), (I-339)+(1.076)+(6.004), (I-339)+(1.076)+(7.001), (I-339)+(1.076)+(7.002), (I-339)+(1.076)+(7.003), (I-339)+(1.076)+(7.004), (I-339)+(1.076)+(7.005), (I-339)+(1.076)+(7.006), (I-339)+(1.076)+(9.001), (I-339)+(1.076)+(9.002), (I-339)+(1.076)+(9.003), (I-339)+(1.076)+(9.004), (I-339)+(1.076)+(9.005), (I-339)+(1.076)+(9.006), (I-339)+(1.076)+(9.007), (I-339)+(1.076)+(9.008), (I-339)+(1.076)+(9.009), (I-339)+(1.076)+(14.001), (I-339)+(1.076)+(14.002), (I-339)+(1.076)+(15.008), (I-339)+(1.076)+(15.011), (I-339)+(1.076)+(15.012), (I-339)+(1.076)+(15.016), (I-339)+(1.076)+(15.025), (I-339)+(1.076)+(15.027), (I-339)+(1.076)+(15.047), (I-339)+(1.076)+(15.063), (I-339)+(1.076)+(15.064), (I-339)+(1.076)+(16.001), (I-339)+(1.076)+(16.002), (I-339)+(1.076)+(16.003), (I-339)+(1.076)+(16.004), (I-339)+(1.076)+(16.005), (I-339)+(1.076)+(16.006), (I-339)+(1.076)+(16.007), (I-339)+(1.076)+(16.008), (I-339)+(1.076)+(17.001), (I-339)+(1.076)+(17.002), (I-339)+(1.076)+(17.003), (I-339)+(1.076)+(17.004), (I-339)+(1.076)+(17.005), (I-339)+(1.076)+(17.006), (I-339)+(1.076)+(17.007), (I-339)+(1.076)+(17.008), (I-339)+(1.076)+(17.009), (I-339)+(1.076)+(17.010), (I-339)+(1.076)+(17.011), (I-339)+(1.076)+(17.012), (I-339)+(1.076)+(18.001), (I-339)+(1.077)+(1.078), (I-339)+(1.077)+(1.079), (I-339)+(1.077)+(1.080), (I-339)+(1.077)+(1.081), (I-339)+(1.077)+(1.082), (I-339)+(1.077)+(1.083), (I-339)+(1.077)+(1.084), (I-339)+(1.077)+(1.085), (I-339)+(1.077)+(1.086), (I-339)+(1.077)+(1.087), (I-339)+(1.077)+(1.088), (I-339)+(1.077)+(1.089), (I-339)+(1.077)+(1.090), (I-339)+(1.077)+(1.091), (I-339)+(1.077)+(1.092), (I-339)+(1.077)+(2.001), (I-339)+(1.077)+(2.002), (I-339)+(1.077)+(2.003), (I-339)+(1.077)+(2.004), (I-339)+(1.077)+(2.005), (I-339)+(1.077)+(2.006), (I-339)+(1.077)+(2.007), (I-339)+(1.077)+(2.008), (I-339)+(1.077)+(2.009), (I-339)+(1.077)+(2.010), (I-339)+(1.077)+(2.011), (I-339)+(1.077)+(2.012), (I-339)+(1.077)+(2.013), (I-339)+(1.077)+(2.014), (I-339)+(1.077)+(2.015), (I-339)+(1.077)+(2.016), (I-339)+(1.077)+(2.017), (I-339)+(1.077)+(2.018), (I-339)+(1.077)+(2.019), (I-339)+(1.077)+(2.020), (I-339)+(1.077)+(2.021), (I-339)+(1.077)+(2.022), (I-339)+(1.077)+(2.023), (I-339)+(1.077)+(2.024), (I-339)+(1.077)+(2.025), (I-339)+(1.077)+(2.026), (I-339)+(1.077)+(2.027), (I-339)+(1.077)+(2.028), (I-339)+(1.077)+(2.029), (I-339)+(1.077)+(2.030), (I-339)+(1.077)+(2.031), (I-339)+(1.077)+(2.032), (I-339)+(1.077)+(2.033), (I-339)+(1.077)+(2.034), (I-339)+(1.077)+(2.035), (I-339)+(1.077)+(2.036), (I-339)+(1.077)+(2.037), (I-339)+(1.077)+(2.038), (I-339)+(1.077)+(2.039), (I-339)+(1.077)+(2.040), (I-339)+(1.077)+(2.041), (I-339)+(1.077)+(2.042), (I-339)+(1.077)+(2.043), (I-339)+(1.077)+(2.044), (I-339)+(1.077)+(2.045), (I-339)+(1.077)+(2.046), (I-339)+(1.077)+(2.047), (I-339)+(1.077)+(2.048), (I-339)+(1.077)+(2.049), (I-339)+(1.077)+(2.050), (I-339)+(1.077)+(2.051), (I-339)+(1.077)+(2.052), (I-339)+(1.077)+(2.053), (I-339)+(1.077)+(2.054), (I-339)+(1.077)+(2.055), (I-339)+(1.077)+(2.056), (I-339)+(1.077)+(2.057), (I-339)+(1.077)+(2.058), (I-339)+(1.077)+(2.059), (I-339)+(1.077)+(3.001), (I-339)+(1.077)+(3.002), (I-339)+(1.077)+(3.003), (I-339)+(1.077)+(3.004), (I-339)+(1.077)+(3.005), (I-339)+(1.077)+(3.006), (I-339)+(1.077)+(3.007), (I-339)+(1.077)+(3.008), (I-339)+(1.077)+(3.009), (I-339)+(1.077)+(3.010), (I-339)+(1.077)+(3.011), (I-339)+(1.077)+(3.012), (I-339)+(1.077)+(3.013), (I-339)+(1.077)+(3.014), (I-339)+(1.077)+(3.015), (I-339)+(1.077)+(3.016), (I-339)+(1.077)+(3.017), (I-339)+(1.077)+(3.018), (I-339)+(1.077)+(3.019), (I-339)+(1.077)+(3.020), (I-339)+(1.077)+(3.021), (I-339)+(1.077)+(3.022), (I-339)+(1.077)+(3.023), (I-339)+(1.077)+(3.024), (I-339)+(1.077)+(3.025), (I-339)+(1.077)+(3.026), (I-339)+(1.077)+(3.027), (I-339)+(1.077)+(3.028), (I-339)+(1.077)+(3.029), (I-339)+(1.077)+(3.030), (I-339)+(1.077)+(3.031), (I-339)+(1.077)+(5.001), (I-339)+(1.077)+(5.002), (I-339)+(1.077)+(5.003), (I-339)+(1.077)+(5.004), (I-339)+(1.077)+(5.005), (I-339)+(1.077)+(5.006), (I-339)+(1.077)+(5.007), (I-339)+(1.077)+(5.008), (I-339)+(1.077)+(5.009), (I-339)+(1.077)+(5.010), (I-339)+(1.077)+(5.011), (I-339)+(1.077)+(5.012), (I-339)+(1.077)+(5.013), (I-339)+(1.077)+(5.014), (I-339)+(1.077)+(5.015), (I-339)+(1.077)+(5.016), (I-339)+(1.077)+(5.017), (I-339)+(1.077)+(5.018), (I-339)+(1.077)+(5.019), (I-339)+(1.077)+(5.020), (I-339)+(1.077)+(5.021), (I-339)+(1.077)+(5.022), (I-339)+(1.077)+(5.023), (I-339)+(1.077)+(6.001), (I-339)+(1.077)+(6.002), (I-339)+(1.077)+(6.003), (I-339)+(1.077)+(6.004), (I-339)+(1.077)+(7.001), (I-339)+(1.077)+(7.002), (I-339)+(1.077)+(7.003), (I-339)+(1.077)+(7.004), (I-339)+(1.077)+(7.005), (I-339)+(1.077)+(7.006), (I-339)+(1.077)+(9.001), (I-339)+(1.077)+(9.002), (I-339)+(1.077)+(9.003), (I-339)+(1.077)+(9.004), (I-339)+(1.077)+(9.005), (I-339)+(1.077)+(9.006), (I-339)+(1.077)+(9.007), (I-339)+(1.077)+(9.008), (I-339)+(1.077)+(9.009), (I-339)+(1.077)+(14.001), (I-339)+(1.077)+(14.002), (I-339)+(1.077)+(15.008), (I-339)+(1.077)+(15.011), (I-339)+(1.077)+(15.012), (I-339)+(1.077)+(15.016), (I-339)+(1.077)+(15.025), (I-339)+(1.077)+(15.027), (I-339)+(1.077)+(15.047), (I-339)+(1.077)+(15.063), (I-339)+(1.077)+(15.064), (I-339)+(1.077)+(16.001), (I-339)+(1.077)+(16.002), (I-339)+(1.077)+(16.003), (I-339)+(1.077)+(16.004), (I-339)+(1.077)+(16.005), (I-339)+(1.077)+(16.006), (I-339)+(1.077)+(16.007), (I-339)+(1.077)+(16.008), (I-339)+(1.077)+(17.001), (I-339)+(1.077)+(17.002), (I-339)+(1.077)+(17.003), (I-339)+(1.077)+(17.004), (I-339)+(1.077)+(17.005), (I-339)+(1.077)+(17.006), (I-339)+(1.077)+(17.007), (I-339)+(1.077)+(17.008), (I-339)+(1.077)+(17.009), (I-339)+(1.077)+(17.010), (I-339)+(1.077)+(17.011), (I-339)+(1.077)+(17.012), (I-339)+(1.077)+(18.001), (I-339)+(1.078)+(1.079), (I-339)+(1.078)+(1.080), (I-339)+(1.078)+(1.081), (I-339)+(1.078)+(1.082), (I-339)+(1.078)+(1.083), (I-339)+(1.078)+(1.084), (I-339)+(1.078)+(1.085), (I-339)+(1.078)+(1.086), (I-339)+(1.078)+(1.087), (I-339)+(1.078)+(1.088), (I-339)+(1.078)+(1.089), (I-339)+(1.078)+(1.090), (I-339)+(1.078)+(1.091), (I-339)+(1.078)+(1.092), (I-339)+(1.078)+(2.001), (I-339)+(1.078)+(2.002), (I-339)+(1.078)+(2.003), (I-339)+(1.078)+(2.004), (I-339)+(1.078)+(2.005), (I-339)+(1.078)+(2.006), (I-339)+(1.078)+(2.007), (I-339)+(1.078)+(2.008), (I-339)+(1.078)+(2.009), (I-339)+(1.078)+(2.010), (I-339)+(1.078)+(2.011), (I-339)+(1.078)+(2.012), (I-339)+(1.078)+(2.013), (I-339)+(1.078)+(2.014), (I-339)+(1.078)+(2.015), (I-339)+(1.078)+(2.016), (I-339)+(1.078)+(2.017), (I-339)+(1.078)+(2.018), (I-339)+(1.078)+(2.019), (I-339)+(1.078)+(2.020), (I-339)+(1.078)+(2.021), (I-339)+(1.078)+(2.022), (I-339)+(1.078)+(2.023), (I-339)+(1.078)+(2.024), (I-339)+(1.078)+(2.025), (I-339)+(1.078)+(2.026), (I-339)+(1.078)+(2.027), (I-339)+(1.078)+(2.028), (I-339)+(1.078)+(2.029), (I-339)+(1.078)+(2.030), (I-339)+(1.078)+(2.031), (I-339)+(1.078)+(2.032), (I-339)+(1.078)+(2.033), (I-339)+(1.078)+(2.034), (I-339)+(1.078)+(2.035), (I-339)+(1.078)+(2.036), (I-339)+(1.078)+(2.037), (I-339)+(1.078)+(2.038), (I-339)+(1.078)+(2.039), (I-339)+(1.078)+(2.040), (I-339)+(1.078)+(2.041), (I-339)+(1.078)+(2.042), (I-339)+(1.078)+(2.043), (I-339)+(1.078)+(2.044), (I-339)+(1.078)+(2.045), (I-339)+(1.078)+(2.046), (I-339)+(1.078)+(2.047), (I-339)+(1.078)+(2.048), (I-339)+(1.078)+(2.049), (I-339)+(1.078)+(2.050), (I-339)+(1.078)+(2.051), (I-339)+(1.078)+(2.052), (I-339)+(1.078)+(2.053), (I-339)+(1.078)+(2.054), (I-339)+(1.078)+(2.055), (I-339)+(1.078)+(2.056), (I-339)+(1.078)+(2.057), (I-339)+(1.078)+(2.058), (I-339)+(1.078)+(2.059), (I-339)+(1.078)+(3.001), (I-339)+(1.078)+(3.002), (I-339)+(1.078)+(3.003), (I-339)+(1.078)+(3.004), (I-339)+(1.078)+(3.005), (I-339)+(1.078)+(3.006), (I-339)+(1.078)+(3.007), (I-339)+(1.078)+(3.008), (I-339)+(1.078)+(3.009), (I-339)+(1.078)+(3.010), (I-339)+(1.078)+(3.011), (I-339)+(1.078)+(3.012), (I-339)+(1.078)+(3.013), (I-339)+(1.078)+(3.014), (I-339)+(1.078)+(3.015), (I-339)+(1.078)+(3.016), (I-339)+(1.078)+(3.017), (I-339)+(1.078)+(3.018), (I-339)+(1.078)+(3.019), (I-339)+(1.078)+(3.020), (I-339)+(1.078)+(3.021), (I-339)+(1.078)+(3.022), (I-339)+(1.078)+(3.023), (I-339)+(1.078)+(3.024), (I-339)+(1.078)+(3.025), (I-339)+(1.078)+(3.026), (I-339)+(1.078)+(3.027), (I-339)+(1.078)+(3.028), (I-339)+(1.078)+(3.029), (I-339)+(1.078)+(3.030), (I-339)+(1.078)+(3.031), (I-339)+(1.078)+(5.001), (I-339)+(1.078)+(5.002), (I-339)+(1.078)+(5.003), (I-339)+(1.078)+(5.004), (I-339)+(1.078)+(5.005), (I-339)+(1.078)+(5.006), (I-339)+(1.078)+(5.007), (I-339)+(1.078)+(5.008), (I-339)+(1.078)+(5.009), (I-339)+(1.078)+(5.010), (I-339)+(1.078)+(5.011), (I-339)+(1.078)+(5.012), (I-339)+(1.078)+(5.013), (I-339)+(1.078)+(5.014), (I-339)+(1.078)+(5.015), (I-339)+(1.078)+(5.016), (I-339)+(1.078)+(5.017), (I-339)+(1.078)+(5.018), (I-339)+(1.078)+(5.019), (I-339)+(1.078)+(5.020), (I-339)+(1.078)+(5.021), (I-339)+(1.078)+(5.022), (I-339)+(1.078)+(5.023), (I-339)+(1.078)+(6.001), (I-339)+(1.078)+(6.002), (I-339)+(1.078)+(6.003), (I-339)+(1.078)+(6.004), (I-339)+(1.078)+(7.001), (I-339)+(1.078)+(7.002), (I-339)+(1.078)+(7.003), (I-339)+(1.078)+(7.004), (I-339)+(1.078)+(7.005), (I-339)+(1.078)+(7.006), (I-339)+(1.078)+(9.001), (I-339)+(1.078)+(9.002), (I-339)+(1.078)+(9.003), (I-339)+(1.078)+(9.004), (I-339)+(1.078)+(9.005), (I-339)+(1.078)+(9.006), (I-339)+(1.078)+(9.007), (I-339)+(1.078)+(9.008), (I-339)+(1.078)+(9.009), (I-339)+(1.078)+(14.001), (I-339)+(1.078)+(14.002), (I-339)+(1.078)+(15.008), (I-339)+(1.078)+(15.011), (I-339)+(1.078)+(15.012), (I-339)+(1.078)+(15.016), (I-339)+(1.078)+(15.025), (I-339)+(1.078)+(15.027), (I-339)+(1.078)+(15.047), (I-339)+(1.078)+(15.063), (I-339)+(1.078)+(15.064), (I-339)+(1.078)+(16.001), (I-339)+(1.078)+(16.002), (I-339)+(1.078)+(16.003), (I-339)+(1.078)+(16.004), (I-339)+(1.078)+(16.005), (I-339)+(1.078)+(16.006), (I-339)+(1.078)+(16.007), (I-339)+(1.078)+(16.008), (I-339)+(1.078)+(17.001), (I-339)+(1.078)+(17.002), (I-339)+(1.078)+(17.003), (I-339)+(1.078)+(17.004), (I-339)+(1.078)+(17.005), (I-339)+(1.078)+(17.006), (I-339)+(1.078)+(17.007), (I-339)+(1.078)+(17.008), (I-339)+(1.078)+(17.009), (I-339)+(1.078)+(17.010), (I-339)+(1.078)+(17.011), (I-339)+(1.078)+(17.012), (I-339)+(1.078)+(18.001), (I-339)+(1.079)+(1.080), (I-339)+(1.079)+(1.081), (I-339)+(1.079)+(1.082), (I-339)+(1.079)+(1.083), (I-339)+(1.079)+(1.084), (I-339)+(1.079)+(1.085), (I-339)+(1.079)+(1.086), (I-339)+(1.079)+(1.087), (I-339)+(1.079)+(1.088), (I-339)+(1.079)+(1.089), (I-339)+(1.079)+(1.090), (I-339)+(1.079)+(1.091), (I-339)+(1.079)+(1.092), (I-339)+(1.079)+(2.001), (I-339)+(1.079)+(2.002), (I-339)+(1.079)+(2.003), (I-339)+(1.079)+(2.004), (I-339)+(1.079)+(2.005), (I-339)+(1.079)+(2.006), (I-339)+(1.079)+(2.007), (I-339)+(1.079)+(2.008), (I-339)+(1.079)+(2.009), (I-339)+(1.079)+(2.010), (I-339)+(1.079)+(2.011), (I-339)+(1.079)+(2.012), (I-339)+(1.079)+(2.013), (I-339)+(1.079)+(2.014), (I-339)+(1.079)+(2.015), (I-339)+(1.079)+(2.016), (I-339)+(1.079)+(2.017), (I-339)+(1.079)+(2.018), (I-339)+(1.079)+(2.019), (I-339)+(1.079)+(2.020), (I-339)+(1.079)+(2.021), (I-339)+(1.079)+(2.022), (I-339)+(1.079)+(2.023), (I-339)+(1.079)+(2.024), (I-339)+(1.079)+(2.025), (I-339)+(1.079)+(2.026), (I-339)+(1.079)+(2.027), (I-339)+(1.079)+(2.028), (I-339)+(1.079)+(2.029), (I-339)+(1.079)+(2.030), (I-339)+(1.079)+(2.031), (I-339)+(1.079)+(2.032), (I-339)+(1.079)+(2.033), (I-339)+(1.079)+(2.034), (I-339)+(1.079)+(2.035), (I-339)+(1.079)+(2.036), (I-339)+(1.079)+(2.037), (I-339)+(1.079)+(2.038), (I-339)+(1.079)+(2.039), (I-339)+(1.079)+(2.040), (I-339)+(1.079)+(2.041), (I-339)+(1.079)+(2.042), (I-339)+(1.079)+(2.043), (I-339)+(1.079)+(2.044), (I-339)+(1.079)+(2.045), (I-339)+(1.079)+(2.046), (I-339)+(1.079)+(2.047), (I-339)+(1.079)+(2.048), (I-339)+(1.079)+(2.049), (I-339)+(1.079)+(2.050), (I-339)+(1.079)+(2.051), (I-339)+(1.079)+(2.052), (I-339)+(1.079)+(2.053), (I-339)+(1.079)+(2.054), (I-339)+(1.079)+(2.055), (I-339)+(1.079)+(2.056), (I-339)+(1.079)+(2.057), (I-339)+(1.079)+(2.058), (I-339)+(1.079)+(2.059), (I-339)+(1.079)+(3.001), (I-339)+(1.079)+(3.002), (I-339)+(1.079)+(3.003), (I-339)+(1.079)+(3.004), (I-339)+(1.079)+(3.005), (I-339)+(1.079)+(3.006), (I-339)+(1.079)+(3.007), (I-339)+(1.079)+(3.008), (I-339)+(1.079)+(3.009), (I-339)+(1.079)+(3.010), (I-339)+(1.079)+(3.011), (I-339)+(1.079)+(3.012), (I-339)+(1.079)+(3.013), (I-339)+(1.079)+(3.014), (I-339)+(1.079)+(3.015), (I-339)+(1.079)+(3.016), (I-339)+(1.079)+(3.017), (I-339)+(1.079)+(3.018), (I-339)+(1.079)+(3.019), (I-339)+(1.079)+(3.020), (I-339)+(1.079)+(3.021), (I-339)+(1.079)+(3.022), (I-339)+(1.079)+(3.023), (I-339)+(1.079)+(3.024), (I-339)+(1.079)+(3.025), (I-339)+(1.079)+(3.026), (I-339)+(1.079)+(3.027), (I-339)+(1.079)+(3.028), (I-339)+(1.079)+(3.029), (I-339)+(1.079)+(3.030), (I-339)+(1.079)+(3.031), (I-339)+(1.079)+(5.001), (I-339)+(1.079)+(5.002), (I-339)+(1.079)+(5.003), (I-339)+(1.079)+(5.004), (I-339)+(1.079)+(5.005), (I-339)+(1.079)+(5.006), (I-339)+(1.079)+(5.007), (I-339)+(1.079)+(5.008), (I-339)+(1.079)+(5.009), (I-339)+(1.079)+(5.010), (I-339)+(1.079)+(5.011), (I-339)+(1.079)+(5.012), (I-339)+(1.079)+(5.013), (I-339)+(1.079)+(5.014), (I-339)+(1.079)+(5.015), (I-339)+(1.079)+(5.016), (I-339)+(1.079)+(5.017), (I-339)+(1.079)+(5.018), (I-339)+(1.079)+(5.019), (I-339)+(1.079)+(5.020), (I-339)+(1.079)+(5.021), (I-339)+(1.079)+(5.022), (I-339)+(1.079)+(5.023), (I-339)+(1.079)+(6.001), (I-339)+(1.079)+(6.002), (I-339)+(1.079)+(6.003), (I-339)+(1.079)+(6.004), (I-339)+(1.079)+(7.001), (I-339)+(1.079)+(7.002), (I-339)+(1.079)+(7.003), (I-339)+(1.079)+(7.004), (I-339)+(1.079)+(7.005), (I-339)+(1.079)+(7.006), (I-339)+(1.079)+(9.001), (I-339)+(1.079)+(9.002), (I-339)+(1.079)+(9.003), (I-339)+(1.079)+(9.004), (I-339)+(1.079)+(9.005), (I-339)+(1.079)+(9.006), (I-339)+(1.079)+(9.007), (I-339)+(1.079)+(9.008), (I-339)+(1.079)+(9.009), (I-339)+(1.079)+(14.001), (I-339)+(1.079)+(14.002), (I-339)+(1.079)+(15.008), (I-339)+(1.079)+(15.011), (I-339)+(1.079)+(15.012), (I-339)+(1.079)+(15.016), (I-339)+(1.079)+(15.025), (I-339)+(1.079)+(15.027), (I-339)+(1.079)+(15.047), (I-339)+(1.079)+(15.063), (I-339)+(1.079)+(15.064), (I-339)+(1.079)+(16.001), (I-339)+(1.079)+(16.002), (I-339)+(1.079)+(16.003), (I-339)+(1.079)+(16.004), (I-339)+(1.079)+(16.005), (I-339)+(1.079)+(16.006), (I-339)+(1.079)+(16.007), (I-339)+(1.079)+(16.008), (I-339)+(1.079)+(17.001), (I-339)+(1.079)+(17.002), (I-339)+(1.079)+(17.003), (I-339)+(1.079)+(17.004), (I-339)+(1.079)+(17.005), (I-339)+(1.079)+(17.006), (I-339)+(1.079)+(17.007), (I-339)+(1.079)+(17.008), (I-339)+(1.079)+(17.009), (I-339)+(1.079)+(17.010), (I-339)+(1.079)+(17.011), (I-339)+(1.079)+(17.012), (I-339)+(1.079)+(18.001), (I-339)+(1.080)+(1.081), (I-339)+(1.080)+(1.082), (I-339)+(1.080)+(1.083), (I-339)+(1.080)+(1.084), (I-339)+(1.080)+(1.085), (I-339)+(1.080)+(1.086), (I-339)+(1.080)+(1.087), (I-339)+(1.080)+(1.088), (I-339)+(1.080)+(1.089), (I-339)+(1.080)+(1.090), (I-339)+(1.080)+(1.091), (I-339)+(1.080)+(1.092), (I-339)+(1.080)+(2.001), (I-339)+(1.080)+(2.002), (I-339)+(1.080)+(2.003), (I-339)+(1.080)+(2.004), (I-339)+(1.080)+(2.005), (I-339)+(1.080)+(2.006), (I-339)+(1.080)+(2.007), (I-339)+(1.080)+(2.008), (I-339)+(1.080)+(2.009), (I-339)+(1.080)+(2.010), (I-339)+(1.080)+(2.011), (I-339)+(1.080)+(2.012), (I-339)+(1.080)+(2.013), (I-339)+(1.080)+(2.014), (I-339)+(1.080)+(2.015), (I-339)+(1.080)+(2.016), (I-339)+(1.080)+(2.017), (I-339)+(1.080)+(2.018), (I-339)+(1.080)+(2.019), (I-339)+(1.080)+(2.020), (I-339)+(1.080)+(2.021), (I-339)+(1.080)+(2.022), (I-339)+(1.080)+(2.023), (I-339)+(1.080)+(2.024), (I-339)+(1.080)+(2.025), (I-339)+(1.080)+(2.026), (I-339)+(1.080)+(2.027), (I-339)+(1.080)+(2.028), (I-339)+(1.080)+(2.029), (I-339)+(1.080)+(2.030), (I-339)+(1.080)+(2.031), (I-339)+(1.080)+(2.032), (I-339)+(1.080)+(2.033), (I-339)+(1.080)+(2.034), (I-339)+(1.080)+(2.035), (I-339)+(1.080)+(2.036), (I-339)+(1.080)+(2.037), (I-339)+(1.080)+(2.038), (I-339)+(1.080)+(2.039), (I-339)+(1.080)+(2.040), (I-339)+(1.080)+(2.041), (I-339)+(1.080)+(2.042), (I-339)+(1.080)+(2.043), (I-339)+(1.080)+(2.044), (I-339)+(1.080)+(2.045), (I-339)+(1.080)+(2.046), (I-339)+(1.080)+(2.047), (I-339)+(1.080)+(2.048), (I-339)+(1.080)+(2.049), (I-339)+(1.080)+(2.050), (I-339)+(1.080)+(2.051), (I-339)+(1.080)+(2.052), (I-339)+(1.080)+(2.053), (I-339)+(1.080)+(2.054), (I-339)+(1.080)+(2.055), (I-339)+(1.080)+(2.056), (I-339)+(1.080)+(2.057), (I-339)+(1.080)+(2.058), (I-339)+(1.080)+(2.059), (I-339)+(1.080)+(3.001), (I-339)+(1.080)+(3.002), (I-339)+(1.080)+(3.003), (I-339)+(1.080)+(3.004), (I-339)+(1.080)+(3.005), (I-339)+(1.080)+(3.006), (I-339)+(1.080)+(3.007), (I-339)+(1.080)+(3.008), (I-339)+(1.080)+(3.009), (I-339)+(1.080)+(3.010), (I-339)+(1.080)+(3.011), (I-339)+(1.080)+(3.012), (I-339)+(1.080)+(3.013), (I-339)+(1.080)+(3.014), (I-339)+(1.080)+(3.015), (I-339)+(1.080)+(3.016), (I-339)+(1.080)+(3.017), (I-339)+(1.080)+(3.018), (I-339)+(1.080)+(3.019), (I-339)+(1.080)+(3.020), (I-339)+(1.080)+(3.021), (I-339)+(1.080)+(3.022), (I-339)+(1.080)+(3.023), (I-339)+(1.080)+(3.024), (I-339)+(1.080)+(3.025), (I-339)+(1.080)+(3.026), (I-339)+(1.080)+(3.027), (I-339)+(1.080)+(3.028), (I-339)+(1.080)+(3.029), (I-339)+(1.080)+(3.030), (I-339)+(1.080)+(3.031), (I-339)+(1.080)+(5.001), (I-339)+(1.080)+(5.002), (I-339)+(1.080)+(5.003), (I-339)+(1.080)+(5.004), (I-339)+(1.080)+(5.005), (I-339)+(1.080)+(5.006), (I-339)+(1.080)+(5.007), (I-339)+(1.080)+(5.008), (I-339)+(1.080)+(5.009), (I-339)+(1.080)+(5.010), (I-339)+(1.080)+(5.011), (I-339)+(1.080)+(5.012), (I-339)+(1.080)+(5.013), (I-339)+(1.080)+(5.014), (I-339)+(1.080)+(5.015), (I-339)+(1.080)+(5.016), (I-339)+(1.080)+(5.017), (I-339)+(1.080)+(5.018), (I-339)+(1.080)+(5.019), (I-339)+(1.080)+(5.020), (I-339)+(1.080)+(5.021), (I-339)+(1.080)+(5.022), (I-339)+(1.080)+(5.023), (I-339)+(1.080)+(6.001), (I-339)+(1.080)+(6.002), (I-339)+(1.080)+(6.003), (I-339)+(1.080)+(6.004), (I-339)+(1.080)+(7.001), (I-339)+(1.080)+(7.002), (I-339)+(1.080)+(7.003), (I-339)+(1.080)+(7.004), (I-339)+(1.080)+(7.005), (I-339)+(1.080)+(7.006), (I-339)+(1.080)+(9.001), (I-339)+(1.080)+(9.002), (I-339)+(1.080)+(9.003), (I-339)+(1.080)+(9.004), (I-339)+(1.080)+(9.005), (I-339)+(1.080)+(9.006), (I-339)+(1.080)+(9.007), (I-339)+(1.080)+(9.008), (I-339)+(1.080)+(9.009), (I-339)+(1.080)+(14.001), (I-339)+(1.080)+(14.002), (I-339)+(1.080)+(15.008), (I-339)+(1.080)+(15.011), (I-339)+(1.080)+(15.012), (I-339)+(1.080)+(15.016), (I-339)+(1.080)+(15.025), (I-339)+(1.080)+(15.027), (I-339)+(1.080)+(15.047), (I-339)+(1.080)+(15.063), (I-339)+(1.080)+(15.064), (I-339)+(1.080)+(16.001), (I-339)+(1.080)+(16.002), (I-339)+(1.080)+(16.003), (I-339)+(1.080)+(16.004), (I-339)+(1.080)+(16.005), (I-339)+(1.080)+(16.006), (I-339)+(1.080)+(16.007), (I-339)+(1.080)+(16.008), (I-339)+(1.080)+(17.001), (I-339)+(1.080)+(17.002), (I-339)+(1.080)+(17.003), (I-339)+(1.080)+(17.004), (I-339)+(1.080)+(17.005), (I-339)+(1.080)+(17.006), (I-339)+(1.080)+(17.007), (I-339)+(1.080)+(17.008), (I-339)+(1.080)+(17.009), (I-339)+(1.080)+(17.010), (I-339)+(1.080)+(17.011), (I-339)+(1.080)+(17.012), (I-339)+(1.080)+(18.001), (I-339)+(1.081)+(1.082), (I-339)+(1.081)+(1.083), (I-339)+(1.081)+(1.084), (I-339)+(1.081)+(1.085), (I-339)+(1.081)+(1.086), (I-339)+(1.081)+(1.087), (I-339)+(1.081)+(1.088), (I-339)+(1.081)+(1.089), (I-339)+(1.081)+(1.090), (I-339)+(1.081)+(1.091), (I-339)+(1.081)+(1.092), (I-339)+(1.081)+(2.001), (I-339)+(1.081)+(2.002), (I-339)+(1.081)+(2.003), (I-339)+(1.081)+(2.004), (I-339)+(1.081)+(2.005), (I-339)+(1.081)+(2.006), (I-339)+(1.081)+(2.007), (I-339)+(1.081)+(2.008), (I-339)+(1.081)+(2.009), (I-339)+(1.081)+(2.010), (I-339)+(1.081)+(2.011), (I-339)+(1.081)+(2.012), (I-339)+(1.081)+(2.013), (I-339)+(1.081)+(2.014), (I-339)+(1.081)+(2.015), (I-339)+(1.081)+(2.016), (I-339)+(1.081)+(2.017), (I-339)+(1.081)+(2.018), (I-339)+(1.081)+(2.019), (I-339)+(1.081)+(2.020), (I-339)+(1.081)+(2.021), (I-339)+(1.081)+(2.022), (I-339)+(1.081)+(2.023), (I-339)+(1.081)+(2.024), (I-339)+(1.081)+(2.025), (I-339)+(1.081)+(2.026), (I-339)+(1.081)+(2.027), (I-339)+(1.081)+(2.028), (I-339)+(1.081)+(2.029), (I-339)+(1.081)+(2.030), (I-339)+(1.081)+(2.031), (I-339)+(1.081)+(2.032), (I-339)+(1.081)+(2.033), (I-339)+(1.081)+(2.034), (I-339)+(1.081)+(2.035), (I-339)+(1.081)+(2.036), (I-339)+(1.081)+(2.037), (I-339)+(1.081)+(2.038), (I-339)+(1.081)+(2.039), (I-339)+(1.081)+(2.040), (I-339)+(1.081)+(2.041), (I-339)+(1.081)+(2.042), (I-339)+(1.081)+(2.043), (I-339)+(1.081)+(2.044), (I-339)+(1.081)+(2.045), (I-339)+(1.081)+(2.046), (I-339)+(1.081)+(2.047), (I-339)+(1.081)+(2.048), (I-339)+(1.081)+(2.049), (I-339)+(1.081)+(2.050), (I-339)+(1.081)+(2.051), (I-339)+(1.081)+(2.052), (I-339)+(1.081)+(2.053), (I-339)+(1.081)+(2.054), (I-339)+(1.081)+(2.055), (I-339)+(1.081)+(2.056), (I-339)+(1.081)+(2.057), (I-339)+(1.081)+(2.058), (I-339)+(1.081)+(2.059), (I-339)+(1.081)+(3.001), (I-339)+(1.081)+(3.002), (I-339)+(1.081)+(3.003), (I-339)+(1.081)+(3.004), (I-339)+(1.081)+(3.005), (I-339)+(1.081)+(3.006), (I-339)+(1.081)+(3.007), (I-339)+(1.081)+(3.008), (I-339)+(1.081)+(3.009), (I-339)+(1.081)+(3.010), (I-339)+(1.081)+(3.011), (I-339)+(1.081)+(3.012), (I-339)+(1.081)+(3.013), (I-339)+(1.081)+(3.014), (I-339)+(1.081)+(3.015), (I-339)+(1.081)+(3.016), (I-339)+(1.081)+(3.017), (I-339)+(1.081)+(3.018), (I-339)+(1.081)+(3.019), (I-339)+(1.081)+(3.020), (I-339)+(1.081)+(3.021), (I-339)+(1.081)+(3.022), (I-339)+(1.081)+(3.023), (I-339)+(1.081)+(3.024), (I-339)+(1.081)+(3.025), (I-339)+(1.081)+(3.026), (I-339)+(1.081)+(3.027), (I-339)+(1.081)+(3.028), (I-339)+(1.081)+(3.029), (I-339)+(1.081)+(3.030), (I-339)+(1.081)+(3.031), (I-339)+(1.081)+(5.001), (I-339)+(1.081)+(5.002), (I-339)+(1.081)+(5.003), (I-339)+(1.081)+(5.004), (I-339)+(1.081)+(5.005), (I-339)+(1.081)+(5.006), (I-339)+(1.081)+(5.007), (I-339)+(1.081)+(5.008), (I-339)+(1.081)+(5.009), (I-339)+(1.081)+(5.010), (I-339)+(1.081)+(5.011), (I-339)+(1.081)+(5.012), (I-339)+(1.081)+(5.013), (I-339)+(1.081)+(5.014), (I-339)+(1.081)+(5.015), (I-339)+(1.081)+(5.016), (I-339)+(1.081)+(5.017), (I-339)+(1.081)+(5.018), (I-339)+(1.081)+(5.019), (I-339)+(1.081)+(5.020), (I-339)+(1.081)+(5.021), (I-339)+(1.081)+(5.022), (I-339)+(1.081)+(5.023), (I-339)+(1.081)+(6.001), (I-339)+(1.081)+(6.002), (I-339)+(1.081)+(6.003), (I-339)+(1.081)+(6.004), (I-339)+(1.081)+(7.001), (I-339)+(1.081)+(7.002), (I-339)+(1.081)+(7.003), (I-339)+(1.081)+(7.004), (I-339)+(1.081)+(7.005), (I-339)+(1.081)+(7.006), (I-339)+(1.081)+(9.001), (I-339)+(1.081)+(9.002), (I-339)+(1.081)+(9.003), (I-339)+(1.081)+(9.004), (I-339)+(1.081)+(9.005), (I-339)+(1.081)+(9.006), (I-339)+(1.081)+(9.007), (I-339)+(1.081)+(9.008), (I-339)+(1.081)+(9.009), (I-339)+(1.081)+(14.001), (I-339)+(1.081)+(14.002), (I-339)+(1.081)+(15.008), (I-339)+(1.081)+(15.011), (I-339)+(1.081)+(15.012), (I-339)+(1.081)+(15.016), (I-339)+(1.081)+(15.025), (I-339)+(1.081)+(15.027), (I-339)+(1.081)+(15.047), (I-339)+(1.081)+(15.063), (I-339)+(1.081)+(15.064), (I-339)+(1.081)+(16.001), (I-339)+(1.081)+(16.002), (I-339)+(1.081)+(16.003), (I-339)+(1.081)+(16.004), (I-339)+(1.081)+(16.005), (I-339)+(1.081)+(16.006), (I-339)+(1.081)+(16.007), (I-339)+(1.081)+(16.008), (I-339)+(1.081)+(17.001), (I-339)+(1.081)+(17.002), (I-339)+(1.081)+(17.003), (I-339)+(1.081)+(17.004), (I-339)+(1.081)+(17.005), (I-339)+(1.081)+(17.006), (I-339)+(1.081)+(17.007), (I-339)+(1.081)+(17.008), (I-339)+(1.081)+(17.009), (I-339)+(1.081)+(17.010), (I-339)+(1.081)+(17.011), (I-339)+(1.081)+(17.012), (I-339)+(1.081)+(18.001), (I-339)+(1.082)+(1.083), (I-339)+(1.082)+(1.084), (I-339)+(1.082)+(1.085), (I-339)+(1.082)+(1.086), (I-339)+(1.082)+(1.087), (I-339)+(1.082)+(1.088), (I-339)+(1.082)+(1.089), (I-339)+(1.082)+(1.090), (I-339)+(1.082)+(1.091), (I-339)+(1.082)+(1.092), (I-339)+(1.082)+(2.001), (I-339)+(1.082)+(2.002), (I-339)+(1.082)+(2.003), (I-339)+(1.082)+(2.004), (I-339)+(1.082)+(2.005), (I-339)+(1.082)+(2.006), (I-339)+(1.082)+(2.007), (I-339)+(1.082)+(2.008), (I-339)+(1.082)+(2.009), (I-339)+(1.082)+(2.010), (I-339)+(1.082)+(2.011), (I-339)+(1.082)+(2.012), (I-339)+(1.082)+(2.013), (I-339)+(1.082)+(2.014), (I-339)+(1.082)+(2.015), (I-339)+(1.082)+(2.016), (I-339)+(1.082)+(2.017), (I-339)+(1.082)+(2.018), (I-339)+(1.082)+(2.019), (I-339)+(1.082)+(2.020), (I-339)+(1.082)+(2.021), (I-339)+(1.082)+(2.022), (I-339)+(1.082)+(2.023), (I-339)+(1.082)+(2.024), (I-339)+(1.082)+(2.025), (I-339)+(1.082)+(2.026), (I-339)+(1.082)+(2.027), (I-339)+(1.082)+(2.028), (I-339)+(1.082)+(2.029), (I-339)+(1.082)+(2.030), (I-339)+(1.082)+(2.031), (I-339)+(1.082)+(2.032), (I-339)+(1.082)+(2.033), (I-339)+(1.082)+(2.034), (I-339)+(1.082)+(2.035), (I-339)+(1.082)+(2.036), (I-339)+(1.082)+(2.037), (I-339)+(1.082)+(2.038), (I-339)+(1.082)+(2.039), (I-339)+(1.082)+(2.040), (I-339)+(1.082)+(2.041), (I-339)+(1.082)+(2.042), (I-339)+(1.082)+(2.043), (I-339)+(1.082)+(2.044), (I-339)+(1.082)+(2.045), (I-339)+(1.082)+(2.046), (I-339)+(1.082)+(2.047), (I-339)+(1.082)+(2.048), (I-339)+(1.082)+(2.049), (I-339)+(1.082)+(2.050), (I-339)+(1.082)+(2.051), (I-339)+(1.082)+(2.052), (I-339)+(1.082)+(2.053), (I-339)+(1.082)+(2.054), (I-339)+(1.082)+(2.055), (I-339)+(1.082)+(2.056), (I-339)+(1.082)+(2.057), (I-339)+(1.082)+(2.058), (I-339)+(1.082)+(2.059), (I-339)+(1.082)+(3.001), (I-339)+(1.082)+(3.002), (I-339)+(1.082)+(3.003), (I-339)+(1.082)+(3.004), (I-339)+(1.082)+(3.005), (I-339)+(1.082)+(3.006), (I-339)+(1.082)+(3.007), (I-339)+(1.082)+(3.008), (I-339)+(1.082)+(3.009), (I-339)+(1.082)+(3.010), (I-339)+(1.082)+(3.011), (I-339)+(1.082)+(3.012), (I-339)+(1.082)+(3.013), (I-339)+(1.082)+(3.014), (I-339)+(1.082)+(3.015), (I-339)+(1.082)+(3.016), (I-339)+(1.082)+(3.017), (I-339)+(1.082)+(3.018), (I-339)+(1.082)+(3.019), (I-339)+(1.082)+(3.020), (I-339)+(1.082)+(3.021), (I-339)+(1.082)+(3.022), (I-339)+(1.082)+(3.023), (I-339)+(1.082)+(3.024), (I-339)+(1.082)+(3.025), (I-339)+(1.082)+(3.026), (I-339)+(1.082)+(3.027), (I-339)+(1.082)+(3.028), (I-339)+(1.082)+(3.029), (I-339)+(1.082)+(3.030), (I-339)+(1.082)+(3.031), (I-339)+(1.082)+(5.001), (I-339)+(1.082)+(5.002), (I-339)+(1.082)+(5.003), (I-339)+(1.082)+(5.004), (I-339)+(1.082)+(5.005), (I-339)+(1.082)+(5.006), (I-339)+(1.082)+(5.007), (I-339)+(1.082)+(5.008), (I-339)+(1.082)+(5.009), (I-339)+(1.082)+(5.010), (I-339)+(1.082)+(5.011), (I-339)+(1.082)+(5.012), (I-339)+(1.082)+(5.013), (I-339)+(1.082)+(5.014), (I-339)+(1.082)+(5.015), (I-339)+(1.082)+(5.016), (I-339)+(1.082)+(5.017), (I-339)+(1.082)+(5.018), (I-339)+(1.082)+(5.019), (I-339)+(1.082)+(5.020), (I-339)+(1.082)+(5.021), (I-339)+(1.082)+(5.022), (I-339)+(1.082)+(5.023), (I-339)+(1.082)+(6.001), (I-339)+(1.082)+(6.002), (I-339)+(1.082)+(6.003), (I-339)+(1.082)+(6.004), (I-339)+(1.082)+(7.001), (I-339)+(1.082)+(7.002), (I-339)+(1.082)+(7.003), (I-339)+(1.082)+(7.004), (I-339)+(1.082)+(7.005), (I-339)+(1.082)+(7.006), (I-339)+(1.082)+(9.001), (I-339)+(1.082)+(9.002), (I-339)+(1.082)+(9.003), (I-339)+(1.082)+(9.004), (I-339)+(1.082)+(9.005), (I-339)+(1.082)+(9.006), (I-339)+(1.082)+(9.007), (I-339)+(1.082)+(9.008), (I-339)+(1.082)+(9.009), (I-339)+(1.082)+(14.001), (I-339)+(1.082)+(14.002), (I-339)+(1.082)+(15.008), (I-339)+(1.082)+(15.011), (I-339)+(1.082)+(15.012), (I-339)+(1.082)+(15.016), (I-339)+(1.082)+(15.025), (I-339)+(1.082)+(15.027), (I-339)+(1.082)+(15.047), (I-339)+(1.082)+(15.063), (I-339)+(1.082)+(15.064), (I-339)+(1.082)+(16.001), (I-339)+(1.082)+(16.002), (I-339)+(1.082)+(16.003), (I-339)+(1.082)+(16.004), (I-339)+(1.082)+(16.005), (I-339)+(1.082)+(16.006), (I-339)+(1.082)+(16.007), (I-339)+(1.082)+(16.008), (I-339)+(1.082)+(17.001), (I-339)+(1.082)+(17.002), (I-339)+(1.082)+(17.003), (I-339)+(1.082)+(17.004), (I-339)+(1.082)+(17.005), (I-339)+(1.082)+(17.006), (I-339)+(1.082)+(17.007), (I-339)+(1.082)+(17.008), (I-339)+(1.082)+(17.009), (I-339)+(1.082)+(17.010), (I-339)+(1.082)+(17.011), (I-339)+(1.082)+(17.012), (I-339)+(1.082)+(18.001), (I-339)+(1.083)+(1.084), (I-339)+(1.083)+(1.085), (I-339)+(1.083)+(1.086), (I-339)+(1.083)+(1.087), (I-339)+(1.083)+(1.088), (I-339)+(1.083)+(1.089), (I-339)+(1.083)+(1.090), (I-339)+(1.083)+(1.091), (I-339)+(1.083)+(1.092), (I-339)+(1.083)+(2.001), (I-339)+(1.083)+(2.002), (I-339)+(1.083)+(2.003), (I-339)+(1.083)+(2.004), (I-339)+(1.083)+(2.005), (I-339)+(1.083)+(2.006), (I-339)+(1.083)+(2.007), (I-339)+(1.083)+(2.008), (I-339)+(1.083)+(2.009), (I-339)+(1.083)+(2.010), (I-339)+(1.083)+(2.011), (I-339)+(1.083)+(2.012), (I-339)+(1.083)+(2.013), (I-339)+(1.083)+(2.014), (I-339)+(1.083)+(2.015), (I-339)+(1.083)+(2.016), (I-339)+(1.083)+(2.017), (I-339)+(1.083)+(2.018), (I-339)+(1.083)+(2.019), (I-339)+(1.083)+(2.020), (I-339)+(1.083)+(2.021), (I-339)+(1.083)+(2.022), (I-339)+(1.083)+(2.023), (I-339)+(1.083)+(2.024), (I-339)+(1.083)+(2.025), (I-339)+(1.083)+(2.026), (I-339)+(1.083)+(2.027), (I-339)+(1.083)+(2.028), (I-339)+(1.083)+(2.029), (I-339)+(1.083)+(2.030), (I-339)+(1.083)+(2.031), (I-339)+(1.083)+(2.032), (I-339)+(1.083)+(2.033), (I-339)+(1.083)+(2.034), (I-339)+(1.083)+(2.035), (I-339)+(1.083)+(2.036), (I-339)+(1.083)+(2.037), (I-339)+(1.083)+(2.038), (I-339)+(1.083)+(2.039), (I-339)+(1.083)+(2.040), (I-339)+(1.083)+(2.041), (I-339)+(1.083)+(2.042), (I-339)+(1.083)+(2.043), (I-339)+(1.083)+(2.044), (I-339)+(1.083)+(2.045), (I-339)+(1.083)+(2.046), (I-339)+(1.083)+(2.047), (I-339)+(1.083)+(2.048), (I-339)+(1.083)+(2.049), (I-339)+(1.083)+(2.050), (I-339)+(1.083)+(2.051), (I-339)+(1.083)+(2.052), (I-339)+(1.083)+(2.053), (I-339)+(1.083)+(2.054), (I-339)+(1.083)+(2.055), (I-339)+(1.083)+(2.056), (I-339)+(1.083)+(2.057), (I-339)+(1.083)+(2.058), (I-339)+(1.083)+(2.059), (I-339)+(1.083)+(3.001), (I-339)+(1.083)+(3.002), (I-339)+(1.083)+(3.003), (I-339)+(1.083)+(3.004), (I-339)+(1.083)+(3.005), (I-339)+(1.083)+(3.006), (I-339)+(1.083)+(3.007), (I-339)+(1.083)+(3.008), (I-339)+(1.083)+(3.009), (I-339)+(1.083)+(3.010), (I-339)+(1.083)+(3.011), (I-339)+(1.083)+(3.012), (I-339)+(1.083)+(3.013), (I-339)+(1.083)+(3.014), (I-339)+(1.083)+(3.015), (I-339)+(1.083)+(3.016), (I-339)+(1.083)+(3.017), (I-339)+(1.083)+(3.018), (I-339)+(1.083)+(3.019), (I-339)+(1.083)+(3.020), (I-339)+(1.083)+(3.021), (I-339)+(1.083)+(3.022), (I-339)+(1.083)+(3.023), (I-339)+(1.083)+(3.024), (I-339)+(1.083)+(3.025), (I-339)+(1.083)+(3.026), (I-339)+(1.083)+(3.027), (I-339)+(1.083)+(3.028), (I-339)+(1.083)+(3.029), (I-339)+(1.083)+(3.030), (I-339)+(1.083)+(3.031), (I-339)+(1.083)+(5.001), (I-339)+(1.083)+(5.002), (I-339)+(1.083)+(5.003), (I-339)+(1.083)+(5.004), (I-339)+(1.083)+(5.005), (I-339)+(1.083)+(5.006), (I-339)+(1.083)+(5.007), (I-339)+(1.083)+(5.008), (I-339)+(1.083)+(5.009), (I-339)+(1.083)+(5.010), (I-339)+(1.083)+(5.011), (I-339)+(1.083)+(5.012), (I-339)+(1.083)+(5.013), (I-339)+(1.083)+(5.014), (I-339)+(1.083)+(5.015), (I-339)+(1.083)+(5.016), (I-339)+(1.083)+(5.017), (I-339)+(1.083)+(5.018), (I-339)+(1.083)+(5.019), (I-339)+(1.083)+(5.020), (I-339)+(1.083)+(5.021), (I-339)+(1.083)+(5.022), (I-339)+(1.083)+(5.023), (I-339)+(1.083)+(6.001), (I-339)+(1.083)+(6.002), (I-339)+(1.083)+(6.003), (I-339)+(1.083)+(6.004), (I-339)+(1.083)+(7.001), (I-339)+(1.083)+(7.002), (I-339)+(1.083)+(7.003), (I-339)+(1.083)+(7.004), (I-339)+(1.083)+(7.005), (I-339)+(1.083)+(7.006), (I-339)+(1.083)+(9.001), (I-339)+(1.083)+(9.002), (I-339)+(1.083)+(9.003), (I-339)+(1.083)+(9.004), (I-339)+(1.083)+(9.005), (I-339)+(1.083)+(9.006), (I-339)+(1.083)+(9.007), (I-339)+(1.083)+(9.008), (I-339)+(1.083)+(9.009), (I-339)+(1.083)+(14.001), (I-339)+(1.083)+(14.002), (I-339)+(1.083)+(15.008), (I-339)+(1.083)+(15.011), (I-339)+(1.083)+(15.012), (I-339)+(1.083)+(15.016), (I-339)+(1.083)+(15.025), (I-339)+(1.083)+(15.027), (I-339)+(1.083)+(15.047), (I-339)+(1.083)+(15.063), (I-339)+(1.083)+(15.064), (I-339)+(1.083)+(16.001), (I-339)+(1.083)+(16.002), (I-339)+(1.083)+(16.003), (I-339)+(1.083)+(16.004), (I-339)+(1.083)+(16.005), (I-339)+(1.083)+(16.006), (I-339)+(1.083)+(16.007), (I-339)+(1.083)+(16.008), (I-339)+(1.083)+(17.001), (I-339)+(1.083)+(17.002), (I-339)+(1.083)+(17.003), (I-339)+(1.083)+(17.004), (I-339)+(1.083)+(17.005), (I-339)+(1.083)+(17.006), (I-339)+(1.083)+(17.007), (I-339)+(1.083)+(17.008), (I-339)+(1.083)+(17.009), (I-339)+(1.083)+(17.010), (I-339)+(1.083)+(17.011), (I-339)+(1.083)+(17.012), (I-339)+(1.083)+(18.001), (I-339)+(1.084)+(1.085), (I-339)+(1.084)+(1.086), (I-339)+(1.084)+(1.087), (I-339)+(1.084)+(1.088), (I-339)+(1.084)+(1.089), (I-339)+(1.084)+(1.090), (I-339)+(1.084)+(1.091), (I-339)+(1.084)+(1.092), (I-339)+(1.084)+(2.001), (I-339)+(1.084)+(2.002), (I-339)+(1.084)+(2.003), (I-339)+(1.084)+(2.004), (I-339)+(1.084)+(2.005), (I-339)+(1.084)+(2.006), (I-339)+(1.084)+(2.007), (I-339)+(1.084)+(2.008), (I-339)+(1.084)+(2.009), (I-339)+(1.084)+(2.010), (I-339)+(1.084)+(2.011), (I-339)+(1.084)+(2.012), (I-339)+(1.084)+(2.013), (I-339)+(1.084)+(2.014), (I-339)+(1.084)+(2.015), (I-339)+(1.084)+(2.016), (I-339)+(1.084)+(2.017), (I-339)+(1.084)+(2.018), (I-339)+(1.084)+(2.019), (I-339)+(1.084)+(2.020), (I-339)+(1.084)+(2.021), (I-339)+(1.084)+(2.022), (I-339)+(1.084)+(2.023), (I-339)+(1.084)+(2.024), (I-339)+(1.084)+(2.025), (I-339)+(1.084)+(2.026), (I-339)+(1.084)+(2.027), (I-339)+(1.084)+(2.028), (I-339)+(1.084)+(2.029), (I-339)+(1.084)+(2.030), (I-339)+(1.084)+(2.031), (I-339)+(1.084)+(2.032), (I-339)+(1.084)+(2.033), (I-339)+(1.084)+(2.034), (I-339)+(1.084)+(2.035), (I-339)+(1.084)+(2.036), (I-339)+(1.084)+(2.037), (I-339)+(1.084)+(2.038), (I-339)+(1.084)+(2.039), (I-339)+(1.084)+(2.040), (I-339)+(1.084)+(2.041), (I-339)+(1.084)+(2.042), (I-339)+(1.084)+(2.043), (I-339)+(1.084)+(2.044), (I-339)+(1.084)+(2.045), (I-339)+(1.084)+(2.046), (I-339)+(1.084)+(2.047), (I-339)+(1.084)+(2.048), (I-339)+(1.084)+(2.049), (I-339)+(1.084)+(2.050), (I-339)+(1.084)+(2.051), (I-339)+(1.084)+(2.052), (I-339)+(1.084)+(2.053), (I-339)+(1.084)+(2.054), (I-339)+(1.084)+(2.055), (I-339)+(1.084)+(2.056), (I-339)+(1.084)+(2.057), (I-339)+(1.084)+(2.058), (I-339)+(1.084)+(2.059), (I-339)+(1.084)+(3.001), (I-339)+(1.084)+(3.002), (I-339)+(1.084)+(3.003), (I-339)+(1.084)+(3.004), (I-339)+(1.084)+(3.005), (I-339)+(1.084)+(3.006), (I-339)+(1.084)+(3.007), (I-339)+(1.084)+(3.008), (I-339)+(1.084)+(3.009), (I-339)+(1.084)+(3.010), (I-339)+(1.084)+(3.011), (I-339)+(1.084)+(3.012), (I-339)+(1.084)+(3.013), (I-339)+(1.084)+(3.014), (I-339)+(1.084)+(3.015), (I-339)+(1.084)+(3.016), (I-339)+(1.084)+(3.017), (I-339)+(1.084)+(3.018), (I-339)+(1.084)+(3.019), (I-339)+(1.084)+(3.020), (I-339)+(1.084)+(3.021), (I-339)+(1.084)+(3.022), (I-339)+(1.084)+(3.023), (I-339)+(1.084)+(3.024), (I-339)+(1.084)+(3.025), (I-339)+(1.084)+(3.026), (I-339)+(1.084)+(3.027), (I-339)+(1.084)+(3.028), (I-339)+(1.084)+(3.029), (I-339)+(1.084)+(3.030), (I-339)+(1.084)+(3.031), (I-339)+(1.084)+(5.001), (I-339)+(1.084)+(5.002), (I-339)+(1.084)+(5.003), (I-339)+(1.084)+(5.004), (I-339)+(1.084)+(5.005), (I-339)+(1.084)+(5.006), (I-339)+(1.084)+(5.007), (I-339)+(1.084)+(5.008), (I-339)+(1.084)+(5.009), (I-339)+(1.084)+(5.010), (I-339)+(1.084)+(5.011), (I-339)+(1.084)+(5.012), (I-339)+(1.084)+(5.013), (I-339)+(1.084)+(5.014), (I-339)+(1.084)+(5.015), (I-339)+(1.084)+(5.016), (I-339)+(1.084)+(5.017), (I-339)+(1.084)+(5.018), (I-339)+(1.084)+(5.019), (I-339)+(1.084)+(5.020), (I-339)+(1.084)+(5.021), (I-339)+(1.084)+(5.022), (I-339)+(1.084)+(5.023), (I-339)+(1.084)+(6.001), (I-339)+(1.084)+(6.002), (I-339)+(1.084)+(6.003), (I-339)+(1.084)+(6.004), (I-339)+(1.084)+(7.001), (I-339)+(1.084)+(7.002), (I-339)+(1.084)+(7.003), (I-339)+(1.084)+(7.004), (I-339)+(1.084)+(7.005), (I-339)+(1.084)+(7.006), (I-339)+(1.084)+(9.001), (I-339)+(1.084)+(9.002), (I-339)+(1.084)+(9.003), (I-339)+(1.084)+(9.004), (I-339)+(1.084)+(9.005), (I-339)+(1.084)+(9.006), (I-339)+(1.084)+(9.007), (I-339)+(1.084)+(9.008), (I-339)+(1.084)+(9.009), (I-339)+(1.084)+(14.001), (I-339)+(1.084)+(14.002), (I-339)+(1.084)+(15.008), (I-339)+(1.084)+(15.011), (I-339)+(1.084)+(15.012), (I-339)+(1.084)+(15.016), (I-339)+(1.084)+(15.025), (I-339)+(1.084)+(15.027), (I-339)+(1.084)+(15.047), (I-339)+(1.084)+(15.063), (I-339)+(1.084)+(15.064), (I-339)+(1.084)+(16.001), (I-339)+(1.084)+(16.002), (I-339)+(1.084)+(16.003), (I-339)+(1.084)+(16.004), (I-339)+(1.084)+(16.005), (I-339)+(1.084)+(16.006), (I-339)+(1.084)+(16.007), (I-339)+(1.084)+(16.008), (I-339)+(1.084)+(17.001), (I-339)+(1.084)+(17.002), (I-339)+(1.084)+(17.003), (I-339)+(1.084)+(17.004), (I-339)+(1.084)+(17.005), (I-339)+(1.084)+(17.006), (I-339)+(1.084)+(17.007), (I-339)+(1.084)+(17.008), (I-339)+(1.084)+(17.009), (I-339)+(1.084)+(17.010), (I-339)+(1.084)+(17.011), (I-339)+(1.084)+(17.012), (I-339)+(1.084)+(18.001), (I-339)+(1.085)+(1.086), (I-339)+(1.085)+(1.087), (I-339)+(1.085)+(1.088), (I-339)+(1.085)+(1.089), (I-339)+(1.085)+(1.090), (I-339)+(1.085)+(1.091), (I-339)+(1.085)+(1.092), (I-339)+(1.085)+(2.001), (I-339)+(1.085)+(2.002), (I-339)+(1.085)+(2.003), (I-339)+(1.085)+(2.004), (I-339)+(1.085)+(2.005), (I-339)+(1.085)+(2.006), (I-339)+(1.085)+(2.007), (I-339)+(1.085)+(2.008), (I-339)+(1.085)+(2.009), (I-339)+(1.085)+(2.010), (I-339)+(1.085)+(2.011), (I-339)+(1.085)+(2.012), (I-339)+(1.085)+(2.013), (I-339)+(1.085)+(2.014), (I-339)+(1.085)+(2.015), (I-339)+(1.085)+(2.016), (I-339)+(1.085)+(2.017), (I-339)+(1.085)+(2.018), (I-339)+(1.085)+(2.019), (I-339)+(1.085)+(2.020), (I-339)+(1.085)+(2.021), (I-339)+(1.085)+(2.022), (I-339)+(1.085)+(2.023), (I-339)+(1.085)+(2.024), (I-339)+(1.085)+(2.025), (I-339)+(1.085)+(2.026), (I-339)+(1.085)+(2.027), (I-339)+(1.085)+(2.028), (I-339)+(1.085)+(2.029), (I-339)+(1.085)+(2.030), (I-339)+(1.085)+(2.031), (I-339)+(1.085)+(2.032), (I-339)+(1.085)+(2.033), (I-339)+(1.085)+(2.034), (I-339)+(1.085)+(2.035), (I-339)+(1.085)+(2.036), (I-339)+(1.085)+(2.037), (I-339)+(1.085)+(2.038), (I-339)+(1.085)+(2.039), (I-339)+(1.085)+(2.040), (I-339)+(1.085)+(2.041), (I-339)+(1.085)+(2.042), (I-339)+(1.085)+(2.043), (I-339)+(1.085)+(2.044), (I-339)+(1.085)+(2.045), (I-339)+(1.085)+(2.046), (I-339)+(1.085)+(2.047), (I-339)+(1.085)+(2.048), (I-339)+(1.085)+(2.049), (I-339)+(1.085)+(2.050), (I-339)+(1.085)+(2.051), (I-339)+(1.085)+(2.052), (I-339)+(1.085)+(2.053), (I-339)+(1.085)+(2.054), (I-339)+(1.085)+(2.055), (I-339)+(1.085)+(2.056), (I-339)+(1.085)+(2.057), (I-339)+(1.085)+(2.058), (I-339)+(1.085)+(2.059), (I-339)+(1.085)+(3.001), (I-339)+(1.085)+(3.002), (I-339)+(1.085)+(3.003), (I-339)+(1.085)+(3.004), (I-339)+(1.085)+(3.005), (I-339)+(1.085)+(3.006), (I-339)+(1.085)+(3.007), (I-339)+(1.085)+(3.008), (I-339)+(1.085)+(3.009), (I-339)+(1.085)+(3.010), (I-339)+(1.085)+(3.011), (I-339)+(1.085)+(3.012), (I-339)+(1.085)+(3.013), (I-339)+(1.085)+(3.014), (I-339)+(1.085)+(3.015), (I-339)+(1.085)+(3.016), (I-339)+(1.085)+(3.017), (I-339)+(1.085)+(3.018), (I-339)+(1.085)+(3.019), (I-339)+(1.085)+(3.020), (I-339)+(1.085)+(3.021), (I-339)+(1.085)+(3.022), (I-339)+(1.085)+(3.023), (I-339)+(1.085)+(3.024), (I-339)+(1.085)+(3.025), (I-339)+(1.085)+(3.026), (I-339)+(1.085)+(3.027), (I-339)+(1.085)+(3.028), (I-339)+(1.085)+(3.029), (I-339)+(1.085)+(3.030), (I-339)+(1.085)+(3.031), (I-339)+(1.085)+(5.001), (I-339)+(1.085)+(5.002), (I-339)+(1.085)+(5.003), (I-339)+(1.085)+(5.004), (I-339)+(1.085)+(5.005), (I-339)+(1.085)+(5.006), (I-339)+(1.085)+(5.007), (I-339)+(1.085)+(5.008), (I-339)+(1.085)+(5.009), (I-339)+(1.085)+(5.010), (I-339)+(1.085)+(5.011), (I-339)+(1.085)+(5.012), (I-339)+(1.085)+(5.013), (I-339)+(1.085)+(5.014), (I-339)+(1.085)+(5.015), (I-339)+(1.085)+(5.016), (I-339)+(1.085)+(5.017), (I-339)+(1.085)+(5.018), (I-339)+(1.085)+(5.019), (I-339)+(1.085)+(5.020), (I-339)+(1.085)+(5.021), (I-339)+(1.085)+(5.022), (I-339)+(1.085)+(5.023), (I-339)+(1.085)+(6.001), (I-339)+(1.085)+(6.002), (I-339)+(1.085)+(6.003), (I-339)+(1.085)+(6.004), (I-339)+(1.085)+(7.001), (I-339)+(1.085)+(7.002), (I-339)+(1.085)+(7.003), (I-339)+(1.085)+(7.004), (I-339)+(1.085)+(7.005), (I-339)+(1.085)+(7.006), (I-339)+(1.085)+(9.001), (I-339)+(1.085)+(9.002), (I-339)+(1.085)+(9.003), (I-339)+(1.085)+(9.004), (I-339)+(1.085)+(9.005), (I-339)+(1.085)+(9.006), (I-339)+(1.085)+(9.007), (I-339)+(1.085)+(9.008), (I-339)+(1.085)+(9.009), (I-339)+(1.085)+(14.001), (I-339)+(1.085)+(14.002), (I-339)+(1.085)+(15.008), (I-339)+(1.085)+(15.011), (I-339)+(1.085)+(15.012), (I-339)+(1.085)+(15.016), (I-339)+(1.085)+(15.025), (I-339)+(1.085)+(15.027), (I-339)+(1.085)+(15.047), (I-339)+(1.085)+(15.063), (I-339)+(1.085)+(15.064), (I-339)+(1.085)+(16.001), (I-339)+(1.085)+(16.002), (I-339)+(1.085)+(16.003), (I-339)+(1.085)+(16.004), (I-339)+(1.085)+(16.005), (I-339)+(1.085)+(16.006), (I-339)+(1.085)+(16.007), (I-339)+(1.085)+(16.008), (I-339)+(1.085)+(17.001), (I-339)+(1.085)+(17.002), (I-339)+(1.085)+(17.003), (I-339)+(1.085)+(17.004), (I-339)+(1.085)+(17.005), (I-339)+(1.085)+(17.006), (I-339)+(1.085)+(17.007), (I-339)+(1.085)+(17.008), (I-339)+(1.085)+(17.009), (I-339)+(1.085)+(17.010), (I-339)+(1.085)+(17.011), (I-339)+(1.085)+(17.012), (I-339)+(1.085)+(18.001), (I-339)+(1.086)+(1.087), (I-339)+(1.086)+(1.088), (I-339)+(1.086)+(1.089), (I-339)+(1.086)+(1.090), (I-339)+(1.086)+(1.091), (I-339)+(1.086)+(1.092), (I-339)+(1.086)+(2.001), (I-339)+(1.086)+(2.002), (I-339)+(1.086)+(2.003), (I-339)+(1.086)+(2.004), (I-339)+(1.086)+(2.005), (I-339)+(1.086)+(2.006), (I-339)+(1.086)+(2.007), (I-339)+(1.086)+(2.008), (I-339)+(1.086)+(2.009), (I-339)+(1.086)+(2.010), (I-339)+(1.086)+(2.011), (I-339)+(1.086)+(2.012), (I-339)+(1.086)+(2.013), (I-339)+(1.086)+(2.014), (I-339)+(1.086)+(2.015), (I-339)+(1.086)+(2.016), (I-339)+(1.086)+(2.017), (I-339)+(1.086)+(2.018), (I-339)+(1.086)+(2.019), (I-339)+(1.086)+(2.020), (I-339)+(1.086)+(2.021), (I-339)+(1.086)+(2.022), (I-339)+(1.086)+(2.023), (I-339)+(1.086)+(2.024), (I-339)+(1.086)+(2.025), (I-339)+(1.086)+(2.026), (I-339)+(1.086)+(2.027), (I-339)+(1.086)+(2.028), (I-339)+(1.086)+(2.029), (I-339)+(1.086)+(2.030), (I-339)+(1.086)+(2.031), (I-339)+(1.086)+(2.032), (I-339)+(1.086)+(2.033), (I-339)+(1.086)+(2.034), (I-339)+(1.086)+(2.035), (I-339)+(1.086)+(2.036), (I-339)+(1.086)+(2.037), (I-339)+(1.086)+(2.038), (I-339)+(1.086)+(2.039), (I-339)+(1.086)+(2.040), (I-339)+(1.086)+(2.041), (I-339)+(1.086)+(2.042), (I-339)+(1.086)+(2.043), (I-339)+(1.086)+(2.044), (I-339)+(1.086)+(2.045), (I-339)+(1.086)+(2.046), (I-339)+(1.086)+(2.047), (I-339)+(1.086)+(2.048), (I-339)+(1.086)+(2.049), (I-339)+(1.086)+(2.050), (I-339)+(1.086)+(2.051), (I-339)+(1.086)+(2.052), (I-339)+(1.086)+(2.053), (I-339)+(1.086)+(2.054), (I-339)+(1.086)+(2.055), (I-339)+(1.086)+(2.056), (I-339)+(1.086)+(2.057), (I-339)+(1.086)+(2.058), (I-339)+(1.086)+(2.059), (I-339)+(1.086)+(3.001), (I-339)+(1.086)+(3.002), (I-339)+(1.086)+(3.003), (I-339)+(1.086)+(3.004), (I-339)+(1.086)+(3.005), (I-339)+(1.086)+(3.006), (I-339)+(1.086)+(3.007), (I-339)+(1.086)+(3.008), (I-339)+(1.086)+(3.009), (I-339)+(1.086)+(3.010), (I-339)+(1.086)+(3.011), (I-339)+(1.086)+(3.012), (I-339)+(1.086)+(3.013), (I-339)+(1.086)+(3.014), (I-339)+(1.086)+(3.015), (I-339)+(1.086)+(3.016), (I-339)+(1.086)+(3.017), (I-339)+(1.086)+(3.018), (I-339)+(1.086)+(3.019), (I-339)+(1.086)+(3.020), (I-339)+(1.086)+(3.021), (I-339)+(1.086)+(3.022), (I-339)+(1.086)+(3.023), (I-339)+(1.086)+(3.024), (I-339)+(1.086)+(3.025), (I-339)+(1.086)+(3.026), (I-339)+(1.086)+(3.027), (I-339)+(1.086)+(3.028), (I-339)+(1.086)+(3.029), (I-339)+(1.086)+(3.030), (I-339)+(1.086)+(3.031), (I-339)+(1.086)+(5.001), (I-339)+(1.086)+(5.002), (I-339)+(1.086)+(5.003), (I-339)+(1.086)+(5.004), (I-339)+(1.086)+(5.005), (I-339)+(1.086)+(5.006), (I-339)+(1.086)+(5.007), (I-339)+(1.086)+(5.008), (I-339)+(1.086)+(5.009), (I-339)+(1.086)+(5.010), (I-339)+(1.086)+(5.011), (I-339)+(1.086)+(5.012), (I-339)+(1.086)+(5.013), (I-339)+(1.086)+(5.014), (I-339)+(1.086)+(5.015), (I-339)+(1.086)+(5.016), (I-339)+(1.086)+(5.017), (I-339)+(1.086)+(5.018), (I-339)+(1.086)+(5.019), (I-339)+(1.086)+(5.020), (I-339)+(1.086)+(5.021), (I-339)+(1.086)+(5.022), (I-339)+(1.086)+(5.023), (I-339)+(1.086)+(6.001), (I-339)+(1.086)+(6.002), (I-339)+(1.086)+(6.003), (I-339)+(1.086)+(6.004), (I-339)+(1.086)+(7.001), (I-339)+(1.086)+(7.002), (I-339)+(1.086)+(7.003), (I-339)+(1.086)+(7.004), (I-339)+(1.086)+(7.005), (I-339)+(1.086)+(7.006), (I-339)+(1.086)+(9.001), (I-339)+(1.086)+(9.002), (I-339)+(1.086)+(9.003), (I-339)+(1.086)+(9.004), (I-339)+(1.086)+(9.005), (I-339)+(1.086)+(9.006), (I-339)+(1.086)+(9.007), (I-339)+(1.086)+(9.008), (I-339)+(1.086)+(9.009), (I-339)+(1.086)+(14.001), (I-339)+(1.086)+(14.002), (I-339)+(1.086)+(15.008), (I-339)+(1.086)+(15.011), (I-339)+(1.086)+(15.012), (I-339)+(1.086)+(15.016), (I-339)+(1.086)+(15.025), (I-339)+(1.086)+(15.027), (I-339)+(1.086)+(15.047), (I-339)+(1.086)+(15.063), (I-339)+(1.086)+(15.064), (I-339)+(1.086)+(16.001), (I-339)+(1.086)+(16.002), (I-339)+(1.086)+(16.003), (I-339)+(1.086)+(16.004), (I-339)+(1.086)+(16.005), (I-339)+(1.086)+(16.006), (I-339)+(1.086)+(16.007), (I-339)+(1.086)+(16.008), (I-339)+(1.086)+(17.001), (I-339)+(1.086)+(17.002), (I-339)+(1.086)+(17.003), (I-339)+(1.086)+(17.004), (I-339)+(1.086)+(17.005), (I-339)+(1.086)+(17.006), (I-339)+(1.086)+(17.007), (I-339)+(1.086)+(17.008), (I-339)+(1.086)+(17.009), (I-339)+(1.086)+(17.010), (I-339)+(1.086)+(17.011), (I-339)+(1.086)+(17.012), (I-339)+(1.086)+(18.001), (I-339)+(1.087)+(1.088), (I-339)+(1.087)+(1.089), (I-339)+(1.087)+(1.090), (I-339)+(1.087)+(1.091), (I-339)+(1.087)+(1.092), (I-339)+(1.087)+(2.001), (I-339)+(1.087)+(2.002), (I-339)+(1.087)+(2.003), (I-339)+(1.087)+(2.004), (I-339)+(1.087)+(2.005), (I-339)+(1.087)+(2.006), (I-339)+(1.087)+(2.007), (I-339)+(1.087)+(2.008), (I-339)+(1.087)+(2.009), (I-339)+(1.087)+(2.010), (I-339)+(1.087)+(2.011), (I-339)+(1.087)+(2.012), (I-339)+(1.087)+(2.013), (I-339)+(1.087)+(2.014), (I-339)+(1.087)+(2.015), (I-339)+(1.087)+(2.016), (I-339)+(1.087)+(2.017), (I-339)+(1.087)+(2.018), (I-339)+(1.087)+(2.019), (I-339)+(1.087)+(2.020), (I-339)+(1.087)+(2.021), (I-339)+(1.087)+(2.022), (I-339)+(1.087)+(2.023), (I-339)+(1.087)+(2.024), (I-339)+(1.087)+(2.025), (I-339)+(1.087)+(2.026), (I-339)+(1.087)+(2.027), (I-339)+(1.087)+(2.028), (I-339)+(1.087)+(2.029), (I-339)+(1.087)+(2.030), (I-339)+(1.087)+(2.031), (I-339)+(1.087)+(2.032), (I-339)+(1.087)+(2.033), (I-339)+(1.087)+(2.034), (I-339)+(1.087)+(2.035), (I-339)+(1.087)+(2.036), (I-339)+(1.087)+(2.037), (I-339)+(1.087)+(2.038), (I-339)+(1.087)+(2.039), (I-339)+(1.087)+(2.040), (I-339)+(1.087)+(2.041), (I-339)+(1.087)+(2.042), (I-339)+(1.087)+(2.043), (I-339)+(1.087)+(2.044), (I-339)+(1.087)+(2.045), (I-339)+(1.087)+(2.046), (I-339)+(1.087)+(2.047), (I-339)+(1.087)+(2.048), (I-339)+(1.087)+(2.049), (I-339)+(1.087)+(2.050), (I-339)+(1.087)+(2.051), (I-339)+(1.087)+(2.052), (I-339)+(1.087)+(2.053), (I-339)+(1.087)+(2.054), (I-339)+(1.087)+(2.055), (I-339)+(1.087)+(2.056), (I-339)+(1.087)+(2.057), (I-339)+(1.087)+(2.058), (I-339)+(1.087)+(2.059), (I-339)+(1.087)+(3.001), (I-339)+(1.087)+(3.002), (I-339)+(1.087)+(3.003), (I-339)+(1.087)+(3.004), (I-339)+(1.087)+(3.005), (I-339)+(1.087)+(3.006), (I-339)+(1.087)+(3.007), (I-339)+(1.087)+(3.008), (I-339)+(1.087)+(3.009), (I-339)+(1.087)+(3.010), (I-339)+(1.087)+(3.011), (I-339)+(1.087)+(3.012), (I-339)+(1.087)+(3.013), (I-339)+(1.087)+(3.014), (I-339)+(1.087)+(3.015), (I-339)+(1.087)+(3.016), (I-339)+(1.087)+(3.017), (I-339)+(1.087)+(3.018), (I-339)+(1.087)+(3.019), (I-339)+(1.087)+(3.020), (I-339)+(1.087)+(3.021), (I-339)+(1.087)+(3.022), (I-339)+(1.087)+(3.023), (I-339)+(1.087)+(3.024), (I-339)+(1.087)+(3.025), (I-339)+(1.087)+(3.026), (I-339)+(1.087)+(3.027), (I-339)+(1.087)+(3.028), (I-339)+(1.087)+(3.029), (I-339)+(1.087)+(3.030), (I-339)+(1.087)+(3.031), (I-339)+(1.087)+(5.001), (I-339)+(1.087)+(5.002), (I-339)+(1.087)+(5.003), (I-339)+(1.087)+(5.004), (I-339)+(1.087)+(5.005), (I-339)+(1.087)+(5.006), (I-339)+(1.087)+(5.007), (I-339)+(1.087)+(5.008), (I-339)+(1.087)+(5.009), (I-339)+(1.087)+(5.010), (I-339)+(1.087)+(5.011), (I-339)+(1.087)+(5.012), (I-339)+(1.087)+(5.013), (I-339)+(1.087)+(5.014), (I-339)+(1.087)+(5.015), (I-339)+(1.087)+(5.016), (I-339)+(1.087)+(5.017), (I-339)+(1.087)+(5.018), (I-339)+(1.087)+(5.019), (I-339)+(1.087)+(5.020), (I-339)+(1.087)+(5.021), (I-339)+(1.087)+(5.022), (I-339)+(1.087)+(5.023), (I-339)+(1.087)+(6.001), (I-339)+(1.087)+(6.002), (I-339)+(1.087)+(6.003), (I-339)+(1.087)+(6.004), (I-339)+(1.087)+(7.001), (I-339)+(1.087)+(7.002), (I-339)+(1.087)+(7.003), (I-339)+(1.087)+(7.004), (I-339)+(1.087)+(7.005), (I-339)+(1.087)+(7.006), (I-339)+(1.087)+(9.001), (I-339)+(1.087)+(9.002), (I-339)+(1.087)+(9.003), (I-339)+(1.087)+(9.004), (I-339)+(1.087)+(9.005), (I-339)+(1.087)+(9.006), (I-339)+(1.087)+(9.007), (I-339)+(1.087)+(9.008), (I-339)+(1.087)+(9.009), (I-339)+(1.087)+(14.001), (I-339)+(1.087)+(14.002), (I-339)+(1.087)+(15.008), (I-339)+(1.087)+(15.011), (I-339)+(1.087)+(15.012), (I-339)+(1.087)+(15.016), (I-339)+(1.087)+(15.025), (I-339)+(1.087)+(15.027), (I-339)+(1.087)+(15.047), (I-339)+(1.087)+(15.063), (I-339)+(1.087)+(15.064), (I-339)+(1.087)+(16.001), (I-339)+(1.087)+(16.002), (I-339)+(1.087)+(16.003), (I-339)+(1.087)+(16.004), (I-339)+(1.087)+(16.005), (I-339)+(1.087)+(16.006), (I-339)+(1.087)+(16.007), (I-339)+(1.087)+(16.008), (I-339)+(1.087)+(17.001), (I-339)+(1.087)+(17.002), (I-339)+(1.087)+(17.003), (I-339)+(1.087)+(17.004), (I-339)+(1.087)+(17.005), (I-339)+(1.087)+(17.006), (I-339)+(1.087)+(17.007), (I-339)+(1.087)+(17.008), (I-339)+(1.087)+(17.009), (I-339)+(1.087)+(17.010), (I-339)+(1.087)+(17.011), (I-339)+(1.087)+(17.012), (I-339)+(1.087)+(18.001), (I-339)+(1.088)+(1.089), (I-339)+(1.088)+(1.090), (I-339)+(1.088)+(1.091), (I-339)+(1.088)+(1.092), (I-339)+(1.088)+(2.001), (I-339)+(1.088)+(2.002), (I-339)+(1.088)+(2.003), (I-339)+(1.088)+(2.004), (I-339)+(1.088)+(2.005), (I-339)+(1.088)+(2.006), (I-339)+(1.088)+(2.007), (I-339)+(1.088)+(2.008), (I-339)+(1.088)+(2.009), (I-339)+(1.088)+(2.010), (I-339)+(1.088)+(2.011), (I-339)+(1.088)+(2.012), (I-339)+(1.088)+(2.013), (I-339)+(1.088)+(2.014), (I-339)+(1.088)+(2.015), (I-339)+(1.088)+(2.016), (I-339)+(1.088)+(2.017), (I-339)+(1.088)+(2.018), (I-339)+(1.088)+(2.019), (I-339)+(1.088)+(2.020), (I-339)+(1.088)+(2.021), (I-339)+(1.088)+(2.022), (I-339)+(1.088)+(2.023), (I-339)+(1.088)+(2.024), (I-339)+(1.088)+(2.025), (I-339)+(1.088)+(2.026), (I-339)+(1.088)+(2.027), (I-339)+(1.088)+(2.028), (I-339)+(1.088)+(2.029), (I-339)+(1.088)+(2.030), (I-339)+(1.088)+(2.031), (I-339)+(1.088)+(2.032), (I-339)+(1.088)+(2.033), (I-339)+(1.088)+(2.034), (I-339)+(1.088)+(2.035), (I-339)+(1.088)+(2.036), (I-339)+(1.088)+(2.037), (I-339)+(1.088)+(2.038), (I-339)+(1.088)+(2.039), (I-339)+(1.088)+(2.040), (I-339)+(1.088)+(2.041), (I-339)+(1.088)+(2.042), (I-339)+(1.088)+(2.043), (I-339)+(1.088)+(2.044), (I-339)+(1.088)+(2.045), (I-339)+(1.088)+(2.046), (I-339)+(1.088)+(2.047), (I-339)+(1.088)+(2.048), (I-339)+(1.088)+(2.049), (I-339)+(1.088)+(2.050), (I-339)+(1.088)+(2.051), (I-339)+(1.088)+(2.052), (I-339)+(1.088)+(2.053), (I-339)+(1.088)+(2.054), (I-339)+(1.088)+(2.055), (I-339)+(1.088)+(2.056), (I-339)+(1.088)+(2.057), (I-339)+(1.088)+(2.058), (I-339)+(1.088)+(2.059), (I-339)+(1.088)+(3.001), (I-339)+(1.088)+(3.002), (I-339)+(1.088)+(3.003), (I-339)+(1.088)+(3.004), (I-339)+(1.088)+(3.005), (I-339)+(1.088)+(3.006), (I-339)+(1.088)+(3.007), (I-339)+(1.088)+(3.008), (I-339)+(1.088)+(3.009), (I-339)+(1.088)+(3.010), (I-339)+(1.088)+(3.011), (I-339)+(1.088)+(3.012), (I-339)+(1.088)+(3.013), (I-339)+(1.088)+(3.014), (I-339)+(1.088)+(3.015), (I-339)+(1.088)+(3.016), (I-339)+(1.088)+(3.017), (I-339)+(1.088)+(3.018), (I-339)+(1.088)+(3.019), (I-339)+(1.088)+(3.020), (I-339)+(1.088)+(3.021), (I-339)+(1.088)+(3.022), (I-339)+(1.088)+(3.023), (I-339)+(1.088)+(3.024), (I-339)+(1.088)+(3.025), (I-339)+(1.088)+(3.026), (I-339)+(1.088)+(3.027), (I-339)+(1.088)+(3.028), (I-339)+(1.088)+(3.029), (I-339)+(1.088)+(3.030), (I-339)+(1.088)+(3.031), (I-339)+(1.088)+(5.001), (I-339)+(1.088)+(5.002), (I-339)+(1.088)+(5.003), (I-339)+(1.088)+(5.004), (I-339)+(1.088)+(5.005), (I-339)+(1.088)+(5.006), (I-339)+(1.088)+(5.007), (I-339)+(1.088)+(5.008), (I-339)+(1.088)+(5.009), (I-339)+(1.088)+(5.010), (I-339)+(1.088)+(5.011), (I-339)+(1.088)+(5.012), (I-339)+(1.088)+(5.013), (I-339)+(1.088)+(5.014), (I-339)+(1.088)+(5.015), (I-339)+(1.088)+(5.016), (I-339)+(1.088)+(5.017), (I-339)+(1.088)+(5.018), (I-339)+(1.088)+(5.019), (I-339)+(1.088)+(5.020), (I-339)+(1.088)+(5.021), (I-339)+(1.088)+(5.022), (I-339)+(1.088)+(5.023), (I-339)+(1.088)+(6.001), (I-339)+(1.088)+(6.002), (I-339)+(1.088)+(6.003), (I-339)+(1.088)+(6.004), (I-339)+(1.088)+(7.001), (I-339)+(1.088)+(7.002), (I-339)+(1.088)+(7.003), (I-339)+(1.088)+(7.004), (I-339)+(1.088)+(7.005), (I-339)+(1.088)+(7.006), (I-339)+(1.088)+(9.001), (I-339)+(1.088)+(9.002), (I-339)+(1.088)+(9.003), (I-339)+(1.088)+(9.004), (I-339)+(1.088)+(9.005), (I-339)+(1.088)+(9.006), (I-339)+(1.088)+(9.007), (I-339)+(1.088)+(9.008), (I-339)+(1.088)+(9.009), (I-339)+(1.088)+(14.001), (I-339)+(1.088)+(14.002), (I-339)+(1.088)+(15.008), (I-339)+(1.088)+(15.011), (I-339)+(1.088)+(15.012), (I-339)+(1.088)+(15.016), (I-339)+(1.088)+(15.025), (I-339)+(1.088)+(15.027), (I-339)+(1.088)+(15.047), (I-339)+(1.088)+(15.063), (I-339)+(1.088)+(15.064), (I-339)+(1.088)+(16.001), (I-339)+(1.088)+(16.002), (I-339)+(1.088)+(16.003), (I-339)+(1.088)+(16.004), (I-339)+(1.088)+(16.005), (I-339)+(1.088)+(16.006), (I-339)+(1.088)+(16.007), (I-339)+(1.088)+(16.008), (I-339)+(1.088)+(17.001), (I-339)+(1.088)+(17.002), (I-339)+(1.088)+(17.003), (I-339)+(1.088)+(17.004), (I-339)+(1.088)+(17.005), (I-339)+(1.088)+(17.006), (I-339)+(1.088)+(17.007), (I-339)+(1.088)+(17.008), (I-339)+(1.088)+(17.009), (I-339)+(1.088)+(17.010), (I-339)+(1.088)+(17.011), (I-339)+(1.088)+(17.012), (I-339)+(1.088)+(18.001), (I-339)+(1.089)+(1.090), (I-339)+(1.089)+(1.091), (I-339)+(1.089)+(1.092), (I-339)+(1.089)+(2.001), (I-339)+(1.089)+(2.002), (I-339)+(1.089)+(2.003), (I-339)+(1.089)+(2.004), (I-339)+(1.089)+(2.005), (I-339)+(1.089)+(2.006), (I-339)+(1.089)+(2.007), (I-339)+(1.089)+(2.008), (I-339)+(1.089)+(2.009), (I-339)+(1.089)+(2.010), (I-339)+(1.089)+(2.011), (I-339)+(1.089)+(2.012), (I-339)+(1.089)+(2.013), (I-339)+(1.089)+(2.014), (I-339)+(1.089)+(2.015), (I-339)+(1.089)+(2.016), (I-339)+(1.089)+(2.017), (I-339)+(1.089)+(2.018), (I-339)+(1.089)+(2.019), (I-339)+(1.089)+(2.020), (I-339)+(1.089)+(2.021), (I-339)+(1.089)+(2.022), (I-339)+(1.089)+(2.023), (I-339)+(1.089)+(2.024), (I-339)+(1.089)+(2.025), (I-339)+(1.089)+(2.026), (I-339)+(1.089)+(2.027), (I-339)+(1.089)+(2.028), (I-339)+(1.089)+(2.029), (I-339)+(1.089)+(2.030), (I-339)+(1.089)+(2.031), (I-339)+(1.089)+(2.032), (I-339)+(1.089)+(2.033), (I-339)+(1.089)+(2.034), (I-339)+(1.089)+(2.035), (I-339)+(1.089)+(2.036), (I-339)+(1.089)+(2.037), (I-339)+(1.089)+(2.038), (I-339)+(1.089)+(2.039), (I-339)+(1.089)+(2.040), (I-339)+(1.089)+(2.041), (I-339)+(1.089)+(2.042), (I-339)+(1.089)+(2.043), (I-339)+(1.089)+(2.044), (I-339)+(1.089)+(2.045), (I-339)+(1.089)+(2.046), (I-339)+(1.089)+(2.047), (I-339)+(1.089)+(2.048), (I-339)+(1.089)+(2.049), (I-339)+(1.089)+(2.050), (I-339)+(1.089)+(2.051), (I-339)+(1.089)+(2.052), (I-339)+(1.089)+(2.053), (I-339)+(1.089)+(2.054), (I-339)+(1.089)+(2.055), (I-339)+(1.089)+(2.056), (I-339)+(1.089)+(2.057), (I-339)+(1.089)+(2.058), (I-339)+(1.089)+(2.059), (I-339)+(1.089)+(3.001), (I-339)+(1.089)+(3.002), (I-339)+(1.089)+(3.003), (I-339)+(1.089)+(3.004), (I-339)+(1.089)+(3.005), (I-339)+(1.089)+(3.006), (I-339)+(1.089)+(3.007), (I-339)+(1.089)+(3.008), (I-339)+(1.089)+(3.009), (I-339)+(1.089)+(3.010), (I-339)+(1.089)+(3.011), (I-339)+(1.089)+(3.012), (I-339)+(1.089)+(3.013), (I-339)+(1.089)+(3.014), (I-339)+(1.089)+(3.015), (I-339)+(1.089)+(3.016), (I-339)+(1.089)+(3.017), (I-339)+(1.089)+(3.018), (I-339)+(1.089)+(3.019), (I-339)+(1.089)+(3.020), (I-339)+(1.089)+(3.021), (I-339)+(1.089)+(3.022), (I-339)+(1.089)+(3.023), (I-339)+(1.089)+(3.024), (I-339)+(1.089)+(3.025), (I-339)+(1.089)+(3.026), (I-339)+(1.089)+(3.027), (I-339)+(1.089)+(3.028), (I-339)+(1.089)+(3.029), (I-339)+(1.089)+(3.030), (I-339)+(1.089)+(3.031), (I-339)+(1.089)+(5.001), (I-339)+(1.089)+(5.002), (I-339)+(1.089)+(5.003), (I-339)+(1.089)+(5.004), (I-339)+(1.089)+(5.005), (I-339)+(1.089)+(5.006), (I-339)+(1.089)+(5.007), (I-339)+(1.089)+(5.008), (I-339)+(1.089)+(5.009), (I-339)+(1.089)+(5.010), (I-339)+(1.089)+(5.011), (I-339)+(1.089)+(5.012), (I-339)+(1.089)+(5.013), (I-339)+(1.089)+(5.014), (I-339)+(1.089)+(5.015), (I-339)+(1.089)+(5.016), (I-339)+(1.089)+(5.017), (I-339)+(1.089)+(5.018), (I-339)+(1.089)+(5.019), (I-339)+(1.089)+(5.020), (I-339)+(1.089)+(5.021), (I-339)+(1.089)+(5.022), (I-339)+(1.089)+(5.023), (I-339)+(1.089)+(6.001), (I-339)+(1.089)+(6.002), (I-339)+(1.089)+(6.003), (I-339)+(1.089)+(6.004), (I-339)+(1.089)+(7.001), (I-339)+(1.089)+(7.002), (I-339)+(1.089)+(7.003), (I-339)+(1.089)+(7.004), (I-339)+(1.089)+(7.005), (I-339)+(1.089)+(7.006), (I-339)+(1.089)+(9.001), (I-339)+(1.089)+(9.002), (I-339)+(1.089)+(9.003), (I-339)+(1.089)+(9.004), (I-339)+(1.089)+(9.005), (I-339)+(1.089)+(9.006), (I-339)+(1.089)+(9.007), (I-339)+(1.089)+(9.008), (I-339)+(1.089)+(9.009), (I-339)+(1.089)+(14.001), (I-339)+(1.089)+(14.002), (I-339)+(1.089)+(15.008), (I-339)+(1.089)+(15.011), (I-339)+(1.089)+(15.012), (I-339)+(1.089)+(15.016), (I-339)+(1.089)+(15.025), (I-339)+(1.089)+(15.027), (I-339)+(1.089)+(15.047), (I-339)+(1.089)+(15.063), (I-339)+(1.089)+(15.064), (I-339)+(1.089)+(16.001), (I-339)+(1.089)+(16.002), (I-339)+(1.089)+(16.003), (I-339)+(1.089)+(16.004), (I-339)+(1.089)+(16.005), (I-339)+(1.089)+(16.006), (I-339)+(1.089)+(16.007), (I-339)+(1.089)+(16.008), (I-339)+(1.089)+(17.001), (I-339)+(1.089)+(17.002), (I-339)+(1.089)+(17.003), (I-339)+(1.089)+(17.004), (I-339)+(1.089)+(17.005), (I-339)+(1.089)+(17.006), (I-339)+(1.089)+(17.007), (I-339)+(1.089)+(17.008), (I-339)+(1.089)+(17.009), (I-339)+(1.089)+(17.010), (I-339)+(1.089)+(17.011), (I-339)+(1.089)+(17.012), (I-339)+(1.089)+(18.001), (I-339)+(1.090)+(1.091), (I-339)+(1.090)+(1.092), (I-339)+(1.090)+(2.001), (I-339)+(1.090)+(2.002), (I-339)+(1.090)+(2.003), (I-339)+(1.090)+(2.004), (I-339)+(1.090)+(2.005), (I-339)+(1.090)+(2.006), (I-339)+(1.090)+(2.007), (I-339)+(1.090)+(2.008), (I-339)+(1.090)+(2.009), (I-339)+(1.090)+(2.010), (I-339)+(1.090)+(2.011), (I-339)+(1.090)+(2.012), (I-339)+(1.090)+(2.013), (I-339)+(1.090)+(2.014), (I-339)+(1.090)+(2.015), (I-339)+(1.090)+(2.016), (I-339)+(1.090)+(2.017), (I-339)+(1.090)+(2.018), (I-339)+(1.090)+(2.019), (I-339)+(1.090)+(2.020), (I-339)+(1.090)+(2.021), (I-339)+(1.090)+(2.022), (I-339)+(1.090)+(2.023), (I-339)+(1.090)+(2.024), (I-339)+(1.090)+(2.025), (I-339)+(1.090)+(2.026), (I-339)+(1.090)+(2.027), (I-339)+(1.090)+(2.028), (I-339)+(1.090)+(2.029), (I-339)+(1.090)+(2.030), (I-339)+(1.090)+(2.031), (I-339)+(1.090)+(2.032), (I-339)+(1.090)+(2.033), (I-339)+(1.090)+(2.034), (I-339)+(1.090)+(2.035), (I-339)+(1.090)+(2.036), (I-339)+(1.090)+(2.037), (I-339)+(1.090)+(2.038), (I-339)+(1.090)+(2.039), (I-339)+(1.090)+(2.040), (I-339)+(1.090)+(2.041), (I-339)+(1.090)+(2.042), (I-339)+(1.090)+(2.043), (I-339)+(1.090)+(2.044), (I-339)+(1.090)+(2.045), (I-339)+(1.090)+(2.046), (I-339)+(1.090)+(2.047), (I-339)+(1.090)+(2.048), (I-339)+(1.090)+(2.049), (I-339)+(1.090)+(2.050), (I-339)+(1.090)+(2.051), (I-339)+(1.090)+(2.052), (I-339)+(1.090)+(2.053), (I-339)+(1.090)+(2.054), (I-339)+(1.090)+(2.055), (I-339)+(1.090)+(2.056), (I-339)+(1.090)+(2.057), (I-339)+(1.090)+(2.058), (I-339)+(1.090)+(2.059), (I-339)+(1.090)+(3.001), (I-339)+(1.090)+(3.002), (I-339)+(1.090)+(3.003), (I-339)+(1.090)+(3.004), (I-339)+(1.090)+(3.005), (I-339)+(1.090)+(3.006), (I-339)+(1.090)+(3.007), (I-339)+(1.090)+(3.008), (I-339)+(1.090)+(3.009), (I-339)+(1.090)+(3.010), (I-339)+(1.090)+(3.011), (I-339)+(1.090)+(3.012), (I-339)+(1.090)+(3.013), (I-339)+(1.090)+(3.014), (I-339)+(1.090)+(3.015), (I-339)+(1.090)+(3.016), (I-339)+(1.090)+(3.017), (I-339)+(1.090)+(3.018), (I-339)+(1.090)+(3.019), (I-339)+(1.090)+(3.020), (I-339)+(1.090)+(3.021), (I-339)+(1.090)+(3.022), (I-339)+(1.090)+(3.023), (I-339)+(1.090)+(3.024), (I-339)+(1.090)+(3.025), (I-339)+(1.090)+(3.026), (I-339)+(1.090)+(3.027), (I-339)+(1.090)+(3.028), (I-339)+(1.090)+(3.029), (I-339)+(1.090)+(3.030), (I-339)+(1.090)+(3.031), (I-339)+(1.090)+(5.001), (I-339)+(1.090)+(5.002), (I-339)+(1.090)+(5.003), (I-339)+(1.090)+(5.004), (I-339)+(1.090)+(5.005), (I-339)+(1.090)+(5.006), (I-339)+(1.090)+(5.007), (I-339)+(1.090)+(5.008), (I-339)+(1.090)+(5.009), (I-339)+(1.090)+(5.010), (I-339)+(1.090)+(5.011), (I-339)+(1.090)+(5.012), (I-339)+(1.090)+(5.013), (I-339)+(1.090)+(5.014), (I-339)+(1.090)+(5.015), (I-339)+(1.090)+(5.016), (I-339)+(1.090)+(5.017), (I-339)+(1.090)+(5.018), (I-339)+(1.090)+(5.019), (I-339)+(1.090)+(5.020), (I-339)+(1.090)+(5.021), (I-339)+(1.090)+(5.022), (I-339)+(1.090)+(5.023), (I-339)+(1.090)+(6.001), (I-339)+(1.090)+(6.002), (I-339)+(1.090)+(6.003), (I-339)+(1.090)+(6.004), (I-339)+(1.090)+(7.001), (I-339)+(1.090)+(7.002), (I-339)+(1.090)+(7.003), (I-339)+(1.090)+(7.004), (I-339)+(1.090)+(7.005), (I-339)+(1.090)+(7.006), (I-339)+(1.090)+(9.001), (I-339)+(1.090)+(9.002), (I-339)+(1.090)+(9.003), (I-339)+(1.090)+(9.004), (I-339)+(1.090)+(9.005), (I-339)+(1.090)+(9.006), (I-339)+(1.090)+(9.007), (I-339)+(1.090)+(9.008), (I-339)+(1.090)+(9.009), (I-339)+(1.090)+(14.001), (I-339)+(1.090)+(14.002), (I-339)+(1.090)+(15.008), (I-339)+(1.090)+(15.011), (I-339)+(1.090)+(15.012), (I-339)+(1.090)+(15.016), (I-339)+(1.090)+(15.025), (I-339)+(1.090)+(15.027), (I-339)+(1.090)+(15.047), (I-339)+(1.090)+(15.063), (I-339)+(1.090)+(15.064), (I-339)+(1.090)+(16.001), (I-339)+(1.090)+(16.002), (I-339)+(1.090)+(16.003), (I-339)+(1.090)+(16.004), (I-339)+(1.090)+(16.005), (I-339)+(1.090)+(16.006), (I-339)+(1.090)+(16.007), (I-339)+(1.090)+(16.008), (I-339)+(1.090)+(17.001), (I-339)+(1.090)+(17.002), (I-339)+(1.090)+(17.003), (I-339)+(1.090)+(17.004), (I-339)+(1.090)+(17.005), (I-339)+(1.090)+(17.006), (I-339)+(1.090)+(17.007), (I-339)+(1.090)+(17.008), (I-339)+(1.090)+(17.009), (I-339)+(1.090)+(17.010), (I-339)+(1.090)+(17.011), (I-339)+(1.090)+(17.012), (I-339)+(1.090)+(18.001), (I-339)+(1.091)+(1.092), (I-339)+(1.091)+(2.001), (I-339)+(1.091)+(2.002), (I-339)+(1.091)+(2.003), (I-339)+(1.091)+(2.004), (I-339)+(1.091)+(2.005), (I-339)+(1.091)+(2.006), (I-339)+(1.091)+(2.007), (I-339)+(1.091)+(2.008), (I-339)+(1.091)+(2.009), (I-339)+(1.091)+(2.010), (I-339)+(1.091)+(2.011), (I-339)+(1.091)+(2.012), (I-339)+(1.091)+(2.013), (I-339)+(1.091)+(2.014), (I-339)+(1.091)+(2.015), (I-339)+(1.091)+(2.016), (I-339)+(1.091)+(2.017), (I-339)+(1.091)+(2.018), (I-339)+(1.091)+(2.019), (I-339)+(1.091)+(2.020), (I-339)+(1.091)+(2.021), (I-339)+(1.091)+(2.022), (I-339)+(1.091)+(2.023), (I-339)+(1.091)+(2.024), (I-339)+(1.091)+(2.025), (I-339)+(1.091)+(2.026), (I-339)+(1.091)+(2.027), (I-339)+(1.091)+(2.028), (I-339)+(1.091)+(2.029), (I-339)+(1.091)+(2.030), (I-339)+(1.091)+(2.031), (I-339)+(1.091)+(2.032), (I-339)+(1.091)+(2.033), (I-339)+(1.091)+(2.034), (I-339)+(1.091)+(2.035), (I-339)+(1.091)+(2.036), (I-339)+(1.091)+(2.037), (I-339)+(1.091)+(2.038), (I-339)+(1.091)+(2.039), (I-339)+(1.091)+(2.040), (I-339)+(1.091)+(2.041), (I-339)+(1.091)+(2.042), (I-339)+(1.091)+(2.043), (I-339)+(1.091)+(2.044), (I-339)+(1.091)+(2.045), (I-339)+(1.091)+(2.046), (I-339)+(1.091)+(2.047), (I-339)+(1.091)+(2.048), (I-339)+(1.091)+(2.049), (I-339)+(1.091)+(2.050), (I-339)+(1.091)+(2.051), (I-339)+(1.091)+(2.052), (I-339)+(1.091)+(2.053), (I-339)+(1.091)+(2.054), (I-339)+(1.091)+(2.055), (I-339)+(1.091)+(2.056), (I-339)+(1.091)+(2.057), (I-339)+(1.091)+(2.058), (I-339)+(1.091)+(2.059), (I-339)+(1.091)+(3.001), (I-339)+(1.091)+(3.002), (I-339)+(1.091)+(3.003), (I-339)+(1.091)+(3.004), (I-339)+(1.091)+(3.005), (I-339)+(1.091)+(3.006), (I-339)+(1.091)+(3.007), (I-339)+(1.091)+(3.008), (I-339)+(1.091)+(3.009), (I-339)+(1.091)+(3.010), (I-339)+(1.091)+(3.011), (I-339)+(1.091)+(3.012), (I-339)+(1.091)+(3.013), (I-339)+(1.091)+(3.014), (I-339)+(1.091)+(3.015), (I-339)+(1.091)+(3.016), (I-339)+(1.091)+(3.017), (I-339)+(1.091)+(3.018), (I-339)+(1.091)+(3.019), (I-339)+(1.091)+(3.020), (I-339)+(1.091)+(3.021), (I-339)+(1.091)+(3.022), (I-339)+(1.091)+(3.023), (I-339)+(1.091)+(3.024), (I-339)+(1.091)+(3.025), (I-339)+(1.091)+(3.026), (I-339)+(1.091)+(3.027), (I-339)+(1.091)+(3.028), (I-339)+(1.091)+(3.029), (I-339)+(1.091)+(3.030), (I-339)+(1.091)+(3.031), (I-339)+(1.091)+(5.001), (I-339)+(1.091)+(5.002), (I-339)+(1.091)+(5.003), (I-339)+(1.091)+(5.004), (I-339)+(1.091)+(5.005), (I-339)+(1.091)+(5.006), (I-339)+(1.091)+(5.007), (I-339)+(1.091)+(5.008), (I-339)+(1.091)+(5.009), (I-339)+(1.091)+(5.010), (I-339)+(1.091)+(5.011), (I-339)+(1.091)+(5.012), (I-339)+(1.091)+(5.013), (I-339)+(1.091)+(5.014), (I-339)+(1.091)+(5.015), (I-339)+(1.091)+(5.016), (I-339)+(1.091)+(5.017), (I-339)+(1.091)+(5.018), (I-339)+(1.091)+(5.019), (I-339)+(1.091)+(5.020), (I-339)+(1.091)+(5.021), (I-339)+(1.091)+(5.022), (I-339)+(1.091)+(5.023), (I-339)+(1.091)+(6.001), (I-339)+(1.091)+(6.002), (I-339)+(1.091)+(6.003), (I-339)+(1.091)+(6.004), (I-339)+(1.091)+(7.001), (I-339)+(1.091)+(7.002), (I-339)+(1.091)+(7.003), (I-339)+(1.091)+(7.004), (I-339)+(1.091)+(7.005), (I-339)+(1.091)+(7.006), (I-339)+(1.091)+(9.001), (I-339)+(1.091)+(9.002), (I-339)+(1.091)+(9.003), (I-339)+(1.091)+(9.004), (I-339)+(1.091)+(9.005), (I-339)+(1.091)+(9.006), (I-339)+(1.091)+(9.007), (I-339)+(1.091)+(9.008), (I-339)+(1.091)+(9.009), (I-339)+(1.091)+(14.001), (I-339)+(1.091)+(14.002), (I-339)+(1.091)+(15.008), (I-339)+(1.091)+(15.011), (I-339)+(1.091)+(15.012), (I-339)+(1.091)+(15.016), (I-339)+(1.091)+(15.025), (I-339)+(1.091)+(15.027), (I-339)+(1.091)+(15.047), (I-339)+(1.091)+(15.063), (I-339)+(1.091)+(15.064), (I-339)+(1.091)+(16.001), (I-339)+(1.091)+(16.002), (I-339)+(1.091)+(16.003), (I-339)+(1.091)+(16.004), (I-339)+(1.091)+(16.005), (I-339)+(1.091)+(16.006), (I-339)+(1.091)+(16.007), (I-339)+(1.091)+(16.008), (I-339)+(1.091)+(17.001), (I-339)+(1.091)+(17.002), (I-339)+(1.091)+(17.003), (I-339)+(1.091)+(17.004), (I-339)+(1.091)+(17.005), (I-339)+(1.091)+(17.006), (I-339)+(1.091)+(17.007), (I-339)+(1.091)+(17.008), (I-339)+(1.091)+(17.009), (I-339)+(1.091)+(17.010), (I-339)+(1.091)+(17.011), (I-339)+(1.091)+(17.012), (I-339)+(1.091)+(18.001), (I-339)+(1.092)+(2.001), (I-339)+(1.092)+(2.002), (I-339)+(1.092)+(2.003), (I-339)+(1.092)+(2.004), (I-339)+(1.092)+(2.005), (I-339)+(1.092)+(2.006), (I-339)+(1.092)+(2.007), (I-339)+(1.092)+(2.008), (I-339)+(1.092)+(2.009), (I-339)+(1.092)+(2.010), (I-339)+(1.092)+(2.011), (I-339)+(1.092)+(2.012), (I-339)+(1.092)+(2.013), (I-339)+(1.092)+(2.014), (I-339)+(1.092)+(2.015), (I-339)+(1.092)+(2.016), (I-339)+(1.092)+(2.017), (I-339)+(1.092)+(2.018), (I-339)+(1.092)+(2.019), (I-339)+(1.092)+(2.020), (I-339)+(1.092)+(2.021), (I-339)+(1.092)+(2.022), (I-339)+(1.092)+(2.023), (I-339)+(1.092)+(2.024), (I-339)+(1.092)+(2.025), (I-339)+(1.092)+(2.026), (I-339)+(1.092)+(2.027), (I-339)+(1.092)+(2.028), (I-339)+(1.092)+(2.029), (I-339)+(1.092)+(2.030), (I-339)+(1.092)+(2.031), (I-339)+(1.092)+(2.032), (I-339)+(1.092)+(2.033), (I-339)+(1.092)+(2.034), (I-339)+(1.092)+(2.035), (I-339)+(1.092)+(2.036), (I-339)+(1.092)+(2.037), (I-339)+(1.092)+(2.038), (I-339)+(1.092)+(2.039), (I-339)+(1.092)+(2.040), (I-339)+(1.092)+(2.041), (I-339)+(1.092)+(2.042), (I-339)+(1.092)+(2.043), (I-339)+(1.092)+(2.044), (I-339)+(1.092)+(2.045), (I-339)+(1.092)+(2.046), (I-339)+(1.092)+(2.047), (I-339)+(1.092)+(2.048), (I-339)+(1.092)+(2.049), (I-339)+(1.092)+(2.050), (I-339)+(1.092)+(2.051), (I-339)+(1.092)+(2.052), (I-339)+(1.092)+(2.053), (I-339)+(1.092)+(2.054), (I-339)+(1.092)+(2.055), (I-339)+(1.092)+(2.056), (I-339)+(1.092)+(2.057), (I-339)+(1.092)+(2.058), (I-339)+(1.092)+(2.059), (I-339)+(1.092)+(3.001), (I-339)+(1.092)+(3.002), (I-339)+(1.092)+(3.003), (I-339)+(1.092)+(3.004), (I-339)+(1.092)+(3.005), (I-339)+(1.092)+(3.006), (I-339)+(1.092)+(3.007), (I-339)+(1.092)+(3.008), (I-339)+(1.092)+(3.009), (I-339)+(1.092)+(3.010), (I-339)+(1.092)+(3.011), (I-339)+(1.092)+(3.012), (I-339)+(1.092)+(3.013), (I-339)+(1.092)+(3.014), (I-339)+(1.092)+(3.015), (I-339)+(1.092)+(3.016), (I-339)+(1.092)+(3.017), (I-339)+(1.092)+(3.018), (I-339)+(1.092)+(3.019), (I-339)+(1.092)+(3.020), (I-339)+(1.092)+(3.021), (I-339)+(1.092)+(3.022), (I-339)+(1.092)+(3.023), (I-339)+(1.092)+(3.024), (I-339)+(1.092)+(3.025), (I-339)+(1.092)+(3.026), (I-339)+(1.092)+(3.027), (I-339)+(1.092)+(3.028), (I-339)+(1.092)+(3.029), (I-339)+(1.092)+(3.030), (I-339)+(1.092)+(3.031), (I-339)+(1.092)+(5.001), (I-339)+(1.092)+(5.002), (I-339)+(1.092)+(5.003), (I-339)+(1.092)+(5.004), (I-339)+(1.092)+(5.005), (I-339)+(1.092)+(5.006), (I-339)+(1.092)+(5.007), (I-339)+(1.092)+(5.008), (I-339)+(1.092)+(5.009), (I-339)+(1.092)+(5.010), (I-339)+(1.092)+(5.011), (I-339)+(1.092)+(5.012), (I-339)+(1.092)+(5.013), (I-339)+(1.092)+(5.014), (I-339)+(1.092)+(5.015), (I-339)+(1.092)+(5.016), (I-339)+(1.092)+(5.017), (I-339)+(1.092)+(5.018), (I-339)+(1.092)+(5.019), (I-339)+(1.092)+(5.020), (I-339)+(1.092)+(5.021), (I-339)+(1.092)+(5.022), (I-339)+(1.092)+(5.023), (I-339)+(1.092)+(6.001), (I-339)+(1.092)+(6.002), (I-339)+(1.092)+(6.003), (I-339)+(1.092)+(6.004), (I-339)+(1.092)+(7.001), (I-339)+(1.092)+(7.002), (I-339)+(1.092)+(7.003), (I-339)+(1.092)+(7.004), (I-339)+(1.092)+(7.005), (I-339)+(1.092)+(7.006), (I-339)+(1.092)+(9.001), (I-339)+(1.092)+(9.002), (I-339)+(1.092)+(9.003), (I-339)+(1.092)+(9.004), (I-339)+(1.092)+(9.005), (I-339)+(1.092)+(9.006), (I-339)+(1.092)+(9.007), (I-339)+(1.092)+(9.008), (I-339)+(1.092)+(9.009), (I-339)+(1.092)+(14.001), (I-339)+(1.092)+(14.002), (I-339)+(1.092)+(15.008), (I-339)+(1.092)+(15.011), (I-339)+(1.092)+(15.012), (I-339)+(1.092)+(15.016), (I-339)+(1.092)+(15.025), (I-339)+(1.092)+(15.027), (I-339)+(1.092)+(15.047), (I-339)+(1.092)+(15.063), (I-339)+(1.092)+(15.064), (I-339)+(1.092)+(16.001), (I-339)+(1.092)+(16.002), (I-339)+(1.092)+(16.003), (I-339)+(1.092)+(16.004), (I-339)+(1.092)+(16.005), (I-339)+(1.092)+(16.006), (I-339)+(1.092)+(16.007), (I-339)+(1.092)+(16.008), (I-339)+(1.092)+(17.001), (I-339)+(1.092)+(17.002), (I-339)+(1.092)+(17.003), (I-339)+(1.092)+(17.004), (I-339)+(1.092)+(17.005), (I-339)+(1.092)+(17.006), (I-339)+(1.092)+(17.007), (I-339)+(1.092)+(17.008), (I-339)+(1.092)+(17.009), (I-339)+(1.092)+(17.010), (I-339)+(1.092)+(17.011), (I-339)+(1.092)+(17.012), (I-339)+(1.092)+(18.001), (I-339)+(2.001)+(3.001), (I-339)+(2.001)+(3.002), (I-339)+(2.001)+(3.003), (I-339)+(2.001)+(3.004), (I-339)+(2.001)+(3.005), (I-339)+(2.001)+(3.006), (I-339)+(2.001)+(3.007), (I-339)+(2.001)+(3.008), (I-339)+(2.001)+(3.009), (I-339)+(2.001)+(3.010), (I-339)+(2.001)+(3.011), (I-339)+(2.001)+(3.012), (I-339)+(2.001)+(3.013), (I-339)+(2.001)+(3.014), (I-339)+(2.001)+(3.015), (I-339)+(2.001)+(3.016), (I-339)+(2.001)+(3.017), (I-339)+(2.001)+(3.018), (I-339)+(2.001)+(3.019), (I-339)+(2.001)+(3.020), (I-339)+(2.001)+(3.021), (I-339)+(2.001)+(3.022), (I-339)+(2.001)+(3.023), (I-339)+(2.001)+(3.024), (I-339)+(2.001)+(3.025), (I-339)+(2.001)+(3.026), (I-339)+(2.001)+(3.027), (I-339)+(2.001)+(3.028), (I-339)+(2.001)+(3.029), (I-339)+(2.001)+(3.030), (I-339)+(2.001)+(3.031), (I-339)+(2.001)+(5.001), (I-339)+(2.001)+(5.002), (I-339)+(2.001)+(5.003), (I-339)+(2.001)+(5.004), (I-339)+(2.001)+(5.005), (I-339)+(2.001)+(5.006), (I-339)+(2.001)+(5.007), (I-339)+(2.001)+(5.008), (I-339)+(2.001)+(5.009), (I-339)+(2.001)+(5.010), (I-339)+(2.001)+(5.011), (I-339)+(2.001)+(5.012), (I-339)+(2.001)+(5.013), (I-339)+(2.001)+(5.014), (I-339)+(2.001)+(5.015), (I-339)+(2.001)+(5.016), (I-339)+(2.001)+(5.017), (I-339)+(2.001)+(5.018), (I-339)+(2.001)+(5.019), (I-339)+(2.001)+(5.020), (I-339)+(2.001)+(5.021), (I-339)+(2.001)+(5.022), (I-339)+(2.001)+(5.023), (I-339)+(2.001)+(6.001), (I-339)+(2.001)+(6.002), (I-339)+(2.001)+(6.003), (I-339)+(2.001)+(6.004), (I-339)+(2.001)+(7.001), (I-339)+(2.001)+(7.002), (I-339)+(2.001)+(7.003), (I-339)+(2.001)+(7.004), (I-339)+(2.001)+(7.005), (I-339)+(2.001)+(7.006), (I-339)+(2.001)+(9.001), (I-339)+(2.001)+(9.002), (I-339)+(2.001)+(9.003), (I-339)+(2.001)+(9.004), (I-339)+(2.001)+(9.005), (I-339)+(2.001)+(9.006), (I-339)+(2.001)+(9.007), (I-339)+(2.001)+(9.008), (I-339)+(2.001)+(9.009), (I-339)+(2.001)+(14.001), (I-339)+(2.001)+(14.002), (I-339)+(2.001)+(15.008), (I-339)+(2.001)+(15.011), (I-339)+(2.001)+(15.012), (I-339)+(2.001)+(15.016), (I-339)+(2.001)+(15.025), (I-339)+(2.001)+(15.027), (I-339)+(2.001)+(15.047), (I-339)+(2.001)+(15.063), (I-339)+(2.001)+(15.064), (I-339)+(2.001)+(16.001), (I-339)+(2.001)+(16.002), (I-339)+(2.001)+(16.003), (I-339)+(2.001)+(16.004), (I-339)+(2.001)+(16.005), (I-339)+(2.001)+(16.006), (I-339)+(2.001)+(16.007), (I-339)+(2.001)+(16.008), (I-339)+(2.001)+(17.001), (I-339)+(2.001)+(17.002), (I-339)+(2.001)+(17.003), (I-339)+(2.001)+(17.004), (I-339)+(2.001)+(17.005), (I-339)+(2.001)+(17.006), (I-339)+(2.001)+(17.007), (I-339)+(2.001)+(17.008), (I-339)+(2.001)+(17.009), (I-339)+(2.001)+(17.010), (I-339)+(2.001)+(17.011), (I-339)+(2.001)+(17.012), (I-339)+(2.001)+(18.001), (I-339)+(2.002)+(3.001), (I-339)+(2.002)+(3.002), (I-339)+(2.002)+(3.003), (I-339)+(2.002)+(3.004), (I-339)+(2.002)+(3.005), (I-339)+(2.002)+(3.006), (I-339)+(2.002)+(3.007), (I-339)+(2.002)+(3.008), (I-339)+(2.002)+(3.009), (I-339)+(2.002)+(3.010), (I-339)+(2.002)+(3.011), (I-339)+(2.002)+(3.012), (I-339)+(2.002)+(3.013), (I-339)+(2.002)+(3.014), (I-339)+(2.002)+(3.015), (I-339)+(2.002)+(3.016), (I-339)+(2.002)+(3.017), (I-339)+(2.002)+(3.018), (I-339)+(2.002)+(3.019), (I-339)+(2.002)+(3.020), (I-339)+(2.002)+(3.021), (I-339)+(2.002)+(3.022), (I-339)+(2.002)+(3.023), (I-339)+(2.002)+(3.024), (I-339)+(2.002)+(3.025), (I-339)+(2.002)+(3.026), (I-339)+(2.002)+(3.027), (I-339)+(2.002)+(3.028), (I-339)+(2.002)+(3.029), (I-339)+(2.002)+(3.030), (I-339)+(2.002)+(3.031), (I-339)+(2.002)+(5.001), (I-339)+(2.002)+(5.002), (I-339)+(2.002)+(5.003), (I-339)+(2.002)+(5.004), (I-339)+(2.002)+(5.005), (I-339)+(2.002)+(5.006), (I-339)+(2.002)+(5.007), (I-339)+(2.002)+(5.008), (I-339)+(2.002)+(5.009), (I-339)+(2.002)+(5.010), (I-339)+(2.002)+(5.011), (I-339)+(2.002)+(5.012), (I-339)+(2.002)+(5.013), (I-339)+(2.002)+(5.014), (I-339)+(2.002)+(5.015), (I-339)+(2.002)+(5.016), (I-339)+(2.002)+(5.017), (I-339)+(2.002)+(5.018), (I-339)+(2.002)+(5.019), (I-339)+(2.002)+(5.020), (I-339)+(2.002)+(5.021), (I-339)+(2.002)+(5.022), (I-339)+(2.002)+(5.023), (I-339)+(2.002)+(6.001), (I-339)+(2.002)+(6.002), (I-339)+(2.002)+(6.003), (I-339)+(2.002)+(6.004), (I-339)+(2.002)+(7.001), (I-339)+(2.002)+(7.002), (I-339)+(2.002)+(7.003), (I-339)+(2.002)+(7.004), (I-339)+(2.002)+(7.005), (I-339)+(2.002)+(7.006), (I-339)+(2.002)+(9.001), (I-339)+(2.002)+(9.002), (I-339)+(2.002)+(9.003), (I-339)+(2.002)+(9.004), (I-339)+(2.002)+(9.005), (I-339)+(2.002)+(9.006), (I-339)+(2.002)+(9.007), (I-339)+(2.002)+(9.008), (I-339)+(2.002)+(9.009), (I-339)+(2.002)+(14.001), (I-339)+(2.002)+(14.002), (I-339)+(2.002)+(15.008), (I-339)+(2.002)+(15.011), (I-339)+(2.002)+(15.012), (I-339)+(2.002)+(15.016), (I-339)+(2.002)+(15.025), (I-339)+(2.002)+(15.027), (I-339)+(2.002)+(15.047), (I-339)+(2.002)+(15.063), (I-339)+(2.002)+(15.064), (I-339)+(2.002)+(16.001), (I-339)+(2.002)+(16.002), (I-339)+(2.002)+(16.003), (I-339)+(2.002)+(16.004), (I-339)+(2.002)+(16.005), (I-339)+(2.002)+(16.006), (I-339)+(2.002)+(16.007), (I-339)+(2.002)+(16.008), (I-339)+(2.002)+(17.001), (I-339)+(2.002)+(17.002), (I-339)+(2.002)+(17.003), (I-339)+(2.002)+(17.004), (I-339)+(2.002)+(17.005), (I-339)+(2.002)+(17.006), (I-339)+(2.002)+(17.007), (I-339)+(2.002)+(17.008), (I-339)+(2.002)+(17.009), (I-339)+(2.002)+(17.010), (I-339)+(2.002)+(17.011), (I-339)+(2.002)+(17.012), (I-339)+(2.002)+(18.001), (I-339)+(2.003)+(3.001), (I-339)+(2.003)+(3.002), (I-339)+(2.003)+(3.003), (I-339)+(2.003)+(3.004), (I-339)+(2.003)+(3.005), (I-339)+(2.003)+(3.006), (I-339)+(2.003)+(3.007), (I-339)+(2.003)+(3.008), (I-339)+(2.003)+(3.009), (I-339)+(2.003)+(3.010), (I-339)+(2.003)+(3.011), (I-339)+(2.003)+(3.012), (I-339)+(2.003)+(3.013), (I-339)+(2.003)+(3.014), (I-339)+(2.003)+(3.015), (I-339)+(2.003)+(3.016), (I-339)+(2.003)+(3.017), (I-339)+(2.003)+(3.018), (I-339)+(2.003)+(3.019), (I-339)+(2.003)+(3.020), (I-339)+(2.003)+(3.021), (I-339)+(2.003)+(3.022), (I-339)+(2.003)+(3.023), (I-339)+(2.003)+(3.024), (I-339)+(2.003)+(3.025), (I-339)+(2.003)+(3.026), (I-339)+(2.003)+(3.027), (I-339)+(2.003)+(3.028), (I-339)+(2.003)+(3.029), (I-339)+(2.003)+(3.030), (I-339)+(2.003)+(3.031), (I-339)+(2.003)+(5.001), (I-339)+(2.003)+(5.002), (I-339)+(2.003)+(5.003), (I-339)+(2.003)+(5.004), (I-339)+(2.003)+(5.005), (I-339)+(2.003)+(5.006), (I-339)+(2.003)+(5.007), (I-339)+(2.003)+(5.008), (I-339)+(2.003)+(5.009), (I-339)+(2.003)+(5.010), (I-339)+(2.003)+(5.011), (I-339)+(2.003)+(5.012), (I-339)+(2.003)+(5.013), (I-339)+(2.003)+(5.014), (I-339)+(2.003)+(5.015), (I-339)+(2.003)+(5.016), (I-339)+(2.003)+(5.017), (I-339)+(2.003)+(5.018), (I-339)+(2.003)+(5.019), (I-339)+(2.003)+(5.020), (I-339)+(2.003)+(5.021), (I-339)+(2.003)+(5.022), (I-339)+(2.003)+(5.023), (I-339)+(2.003)+(6.001), (I-339)+(2.003)+(6.002), (I-339)+(2.003)+(6.003), (I-339)+(2.003)+(6.004), (I-339)+(2.003)+(7.001), (I-339)+(2.003)+(7.002), (I-339)+(2.003)+(7.003), (I-339)+(2.003)+(7.004), (I-339)+(2.003)+(7.005), (I-339)+(2.003)+(7.006), (I-339)+(2.003)+(9.001), (I-339)+(2.003)+(9.002), (I-339)+(2.003)+(9.003), (I-339)+(2.003)+(9.004), (I-339)+(2.003)+(9.005), (I-339)+(2.003)+(9.006), (I-339)+(2.003)+(9.007), (I-339)+(2.003)+(9.008), (I-339)+(2.003)+(9.009), (I-339)+(2.003)+(14.001), (I-339)+(2.003)+(14.002), (I-339)+(2.003)+(15.008), (I-339)+(2.003)+(15.011), (I-339)+(2.003)+(15.012), (I-339)+(2.003)+(15.016), (I-339)+(2.003)+(15.025), (I-339)+(2.003)+(15.027), (I-339)+(2.003)+(15.047), (I-339)+(2.003)+(15.063), (I-339)+(2.003)+(15.064), (I-339)+(2.003)+(16.001), (I-339)+(2.003)+(16.002), (I-339)+(2.003)+(16.003), (I-339)+(2.003)+(16.004), (I-339)+(2.003)+(16.005), (I-339)+(2.003)+(16.006), (I-339)+(2.003)+(16.007), (I-339)+(2.003)+(16.008), (I-339)+(2.003)+(17.001), (I-339)+(2.003)+(17.002), (I-339)+(2.003)+(17.003), (I-339)+(2.003)+(17.004), (I-339)+(2.003)+(17.005), (I-339)+(2.003)+(17.006), (I-339)+(2.003)+(17.007), (I-339)+(2.003)+(17.008), (I-339)+(2.003)+(17.009), (I-339)+(2.003)+(17.010), (I-339)+(2.003)+(17.011), (I-339)+(2.003)+(17.012), (I-339)+(2.003)+(18.001), (I-339)+(2.004)+(3.001), (I-339)+(2.004)+(3.002), (I-339)+(2.004)+(3.003), (I-339)+(2.004)+(3.004), (I-339)+(2.004)+(3.005), (I-339)+(2.004)+(3.006), (I-339)+(2.004)+(3.007), (I-339)+(2.004)+(3.008), (I-339)+(2.004)+(3.009), (I-339)+(2.004)+(3.010), (I-339)+(2.004)+(3.011), (I-339)+(2.004)+(3.012), (I-339)+(2.004)+(3.013), (I-339)+(2.004)+(3.014), (I-339)+(2.004)+(3.015), (I-339)+(2.004)+(3.016), (I-339)+(2.004)+(3.017), (I-339)+(2.004)+(3.018), (I-339)+(2.004)+(3.019), (I-339)+(2.004)+(3.020), (I-339)+(2.004)+(3.021), (I-339)+(2.004)+(3.022), (I-339)+(2.004)+(3.023), (I-339)+(2.004)+(3.024), (I-339)+(2.004)+(3.025), (I-339)+(2.004)+(3.026), (I-339)+(2.004)+(3.027), (I-339)+(2.004)+(3.028), (I-339)+(2.004)+(3.029), (I-339)+(2.004)+(3.030), (I-339)+(2.004)+(3.031), (I-339)+(2.004)+(5.001), (I-339)+(2.004)+(5.002), (I-339)+(2.004)+(5.003), (I-339)+(2.004)+(5.004), (I-339)+(2.004)+(5.005), (I-339)+(2.004)+(5.006), (I-339)+(2.004)+(5.007), (I-339)+(2.004)+(5.008), (I-339)+(2.004)+(5.009), (I-339)+(2.004)+(5.010), (I-339)+(2.004)+(5.011), (I-339)+(2.004)+(5.012), (I-339)+(2.004)+(5.013), (I-339)+(2.004)+(5.014), (I-339)+(2.004)+(5.015), (I-339)+(2.004)+(5.016), (I-339)+(2.004)+(5.017), (I-339)+(2.004)+(5.018), (I-339)+(2.004)+(5.019), (I-339)+(2.004)+(5.020), (I-339)+(2.004)+(5.021), (I-339)+(2.004)+(5.022), (I-339)+(2.004)+(5.023), (I-339)+(2.004)+(6.001), (I-339)+(2.004)+(6.002), (I-339)+(2.004)+(6.003), (I-339)+(2.004)+(6.004), (I-339)+(2.004)+(7.001), (I-339)+(2.004)+(7.002), (I-339)+(2.004)+(7.003), (I-339)+(2.004)+(7.004), (I-339)+(2.004)+(7.005), (I-339)+(2.004)+(7.006), (I-339)+(2.004)+(9.001), (I-339)+(2.004)+(9.002), (I-339)+(2.004)+(9.003), (I-339)+(2.004)+(9.004), (I-339)+(2.004)+(9.005), (I-339)+(2.004)+(9.006), (I-339)+(2.004)+(9.007), (I-339)+(2.004)+(9.008), (I-339)+(2.004)+(9.009), (I-339)+(2.004)+(14.001), (I-339)+(2.004)+(14.002), (I-339)+(2.004)+(15.008), (I-339)+(2.004)+(15.011), (I-339)+(2.004)+(15.012), (I-339)+(2.004)+(15.016), (I-339)+(2.004)+(15.025), (I-339)+(2.004)+(15.027), (I-339)+(2.004)+(15.047), (I-339)+(2.004)+(15.063), (I-339)+(2.004)+(15.064), (I-339)+(2.004)+(16.001), (I-339)+(2.004)+(16.002), (I-339)+(2.004)+(16.003), (I-339)+(2.004)+(16.004), (I-339)+(2.004)+(16.005), (I-339)+(2.004)+(16.006), (I-339)+(2.004)+(16.007), (I-339)+(2.004)+(16.008), (I-339)+(2.004)+(17.001), (I-339)+(2.004)+(17.002), (I-339)+(2.004)+(17.003), (I-339)+(2.004)+(17.004), (I-339)+(2.004)+(17.005), (I-339)+(2.004)+(17.006), (I-339)+(2.004)+(17.007), (I-339)+(2.004)+(17.008), (I-339)+(2.004)+(17.009), (I-339)+(2.004)+(17.010), (I-339)+(2.004)+(17.011), (I-339)+(2.004)+(17.012), (I-339)+(2.004)+(18.001), (I-339)+(2.005)+(3.001), (I-339)+(2.005)+(3.002), (I-339)+(2.005)+(3.003), (I-339)+(2.005)+(3.004), (I-339)+(2.005)+(3.005), (I-339)+(2.005)+(3.006), (I-339)+(2.005)+(3.007), (I-339)+(2.005)+(3.008), (I-339)+(2.005)+(3.009), (I-339)+(2.005)+(3.010), (I-339)+(2.005)+(3.011), (I-339)+(2.005)+(3.012), (I-339)+(2.005)+(3.013), (I-339)+(2.005)+(3.014), (I-339)+(2.005)+(3.015), (I-339)+(2.005)+(3.016), (I-339)+(2.005)+(3.017), (I-339)+(2.005)+(3.018), (I-339)+(2.005)+(3.019), (I-339)+(2.005)+(3.020), (I-339)+(2.005)+(3.021), (I-339)+(2.005)+(3.022), (I-339)+(2.005)+(3.023), (I-339)+(2.005)+(3.024), (I-339)+(2.005)+(3.025), (I-339)+(2.005)+(3.026), (I-339)+(2.005)+(3.027), (I-339)+(2.005)+(3.028), (I-339)+(2.005)+(3.029), (I-339)+(2.005)+(3.030), (I-339)+(2.005)+(3.031), (I-339)+(2.005)+(5.001), (I-339)+(2.005)+(5.002), (I-339)+(2.005)+(5.003), (I-339)+(2.005)+(5.004), (I-339)+(2.005)+(5.005), (I-339)+(2.005)+(5.006), (I-339)+(2.005)+(5.007), (I-339)+(2.005)+(5.008), (I-339)+(2.005)+(5.009), (I-339)+(2.005)+(5.010), (I-339)+(2.005)+(5.011), (I-339)+(2.005)+(5.012), (I-339)+(2.005)+(5.013), (I-339)+(2.005)+(5.014), (I-339)+(2.005)+(5.015), (I-339)+(2.005)+(5.016), (I-339)+(2.005)+(5.017), (I-339)+(2.005)+(5.018), (I-339)+(2.005)+(5.019), (I-339)+(2.005)+(5.020), (I-339)+(2.005)+(5.021), (I-339)+(2.005)+(5.022), (I-339)+(2.005)+(5.023), (I-339)+(2.005)+(6.001), (I-339)+(2.005)+(6.002), (I-339)+(2.005)+(6.003), (I-339)+(2.005)+(6.004), (I-339)+(2.005)+(7.001), (I-339)+(2.005)+(7.002), (I-339)+(2.005)+(7.003), (I-339)+(2.005)+(7.004), (I-339)+(2.005)+(7.005), (I-339)+(2.005)+(7.006), (I-339)+(2.005)+(9.001), (I-339)+(2.005)+(9.002), (I-339)+(2.005)+(9.003), (I-339)+(2.005)+(9.004), (I-339)+(2.005)+(9.005), (I-339)+(2.005)+(9.006), (I-339)+(2.005)+(9.007), (I-339)+(2.005)+(9.008), (I-339)+(2.005)+(9.009), (I-339)+(2.005)+(14.001), (I-339)+(2.005)+(14.002), (I-339)+(2.005)+(15.008), (I-339)+(2.005)+(15.011), (I-339)+(2.005)+(15.012), (I-339)+(2.005)+(15.016), (I-339)+(2.005)+(15.025), (I-339)+(2.005)+(15.027), (I-339)+(2.005)+(15.047), (I-339)+(2.005)+(15.063), (I-339)+(2.005)+(15.064), (I-339)+(2.005)+(16.001), (I-339)+(2.005)+(16.002), (I-339)+(2.005)+(16.003), (I-339)+(2.005)+(16.004), (I-339)+(2.005)+(16.005), (I-339)+(2.005)+(16.006), (I-339)+(2.005)+(16.007), (I-339)+(2.005)+(16.008), (I-339)+(2.005)+(17.001), (I-339)+(2.005)+(17.002), (I-339)+(2.005)+(17.003), (I-339)+(2.005)+(17.004), (I-339)+(2.005)+(17.005), (I-339)+(2.005)+(17.006), (I-339)+(2.005)+(17.007), (I-339)+(2.005)+(17.008), (I-339)+(2.005)+(17.009), (I-339)+(2.005)+(17.010), (I-339)+(2.005)+(17.011), (I-339)+(2.005)+(17.012), (I-339)+(2.005)+(18.001), (I-339)+(2.006)+(3.001), (I-339)+(2.006)+(3.002), (I-339)+(2.006)+(3.003), (I-339)+(2.006)+(3.004), (I-339)+(2.006)+(3.005), (I-339)+(2.006)+(3.006), (I-339)+(2.006)+(3.007), (I-339)+(2.006)+(3.008), (I-339)+(2.006)+(3.009), (I-339)+(2.006)+(3.010), (I-339)+(2.006)+(3.011), (I-339)+(2.006)+(3.012), (I-339)+(2.006)+(3.013), (I-339)+(2.006)+(3.014), (I-339)+(2.006)+(3.015), (I-339)+(2.006)+(3.016), (I-339)+(2.006)+(3.017), (I-339)+(2.006)+(3.018), (I-339)+(2.006)+(3.019), (I-339)+(2.006)+(3.020), (I-339)+(2.006)+(3.021), (I-339)+(2.006)+(3.022), (I-339)+(2.006)+(3.023), (I-339)+(2.006)+(3.024), (I-339)+(2.006)+(3.025), (I-339)+(2.006)+(3.026), (I-339)+(2.006)+(3.027), (I-339)+(2.006)+(3.028), (I-339)+(2.006)+(3.029), (I-339)+(2.006)+(3.030), (I-339)+(2.006)+(3.031), (I-339)+(2.006)+(5.001), (I-339)+(2.006)+(5.002), (I-339)+(2.006)+(5.003), (I-339)+(2.006)+(5.004), (I-339)+(2.006)+(5.005), (I-339)+(2.006)+(5.006), (I-339)+(2.006)+(5.007), (I-339)+(2.006)+(5.008), (I-339)+(2.006)+(5.009), (I-339)+(2.006)+(5.010), (I-339)+(2.006)+(5.011), (I-339)+(2.006)+(5.012), (I-339)+(2.006)+(5.013), (I-339)+(2.006)+(5.014), (I-339)+(2.006)+(5.015), (I-339)+(2.006)+(5.016), (I-339)+(2.006)+(5.017), (I-339)+(2.006)+(5.018), (I-339)+(2.006)+(5.019), (I-339)+(2.006)+(5.020), (I-339)+(2.006)+(5.021), (I-339)+(2.006)+(5.022), (I-339)+(2.006)+(5.023), (I-339)+(2.006)+(6.001), (I-339)+(2.006)+(6.002), (I-339)+(2.006)+(6.003), (I-339)+(2.006)+(6.004), (I-339)+(2.006)+(7.001), (I-339)+(2.006)+(7.002), (I-339)+(2.006)+(7.003), (I-339)+(2.006)+(7.004), (I-339)+(2.006)+(7.005), (I-339)+(2.006)+(7.006), (I-339)+(2.006)+(9.001), (I-339)+(2.006)+(9.002), (I-339)+(2.006)+(9.003), (I-339)+(2.006)+(9.004), (I-339)+(2.006)+(9.005), (I-339)+(2.006)+(9.006), (I-339)+(2.006)+(9.007), (I-339)+(2.006)+(9.008), (I-339)+(2.006)+(9.009), (I-339)+(2.006)+(14.001), (I-339)+(2.006)+(14.002), (I-339)+(2.006)+(15.008), (I-339)+(2.006)+(15.011), (I-339)+(2.006)+(15.012), (I-339)+(2.006)+(15.016), (I-339)+(2.006)+(15.025), (I-339)+(2.006)+(15.027), (I-339)+(2.006)+(15.047), (I-339)+(2.006)+(15.063), (I-339)+(2.006)+(15.064), (I-339)+(2.006)+(16.001), (I-339)+(2.006)+(16.002), (I-339)+(2.006)+(16.003), (I-339)+(2.006)+(16.004), (I-339)+(2.006)+(16.005), (I-339)+(2.006)+(16.006), (I-339)+(2.006)+(16.007), (I-339)+(2.006)+(16.008), (I-339)+(2.006)+(17.001), (I-339)+(2.006)+(17.002), (I-339)+(2.006)+(17.003), (I-339)+(2.006)+(17.004), (I-339)+(2.006)+(17.005), (I-339)+(2.006)+(17.006), (I-339)+(2.006)+(17.007), (I-339)+(2.006)+(17.008), (I-339)+(2.006)+(17.009), (I-339)+(2.006)+(17.010), (I-339)+(2.006)+(17.011), (I-339)+(2.006)+(17.012), (I-339)+(2.006)+(18.001), (I-339)+(2.007)+(3.001), (I-339)+(2.007)+(3.002), (I-339)+(2.007)+(3.003), (I-339)+(2.007)+(3.004), (I-339)+(2.007)+(3.005), (I-339)+(2.007)+(3.006), (I-339)+(2.007)+(3.007), (I-339)+(2.007)+(3.008), (I-339)+(2.007)+(3.009), (I-339)+(2.007)+(3.010), (I-339)+(2.007)+(3.011), (I-339)+(2.007)+(3.012), (I-339)+(2.007)+(3.013), (I-339)+(2.007)+(3.014), (I-339)+(2.007)+(3.015), (I-339)+(2.007)+(3.016), (I-339)+(2.007)+(3.017), (I-339)+(2.007)+(3.018), (I-339)+(2.007)+(3.019), (I-339)+(2.007)+(3.020), (I-339)+(2.007)+(3.021), (I-339)+(2.007)+(3.022), (I-339)+(2.007)+(3.023), (I-339)+(2.007)+(3.024), (I-339)+(2.007)+(3.025), (I-339)+(2.007)+(3.026), (I-339)+(2.007)+(3.027), (I-339)+(2.007)+(3.028), (I-339)+(2.007)+(3.029), (I-339)+(2.007)+(3.030), (I-339)+(2.007)+(3.031), (I-339)+(2.007)+(5.001), (I-339)+(2.007)+(5.002), (I-339)+(2.007)+(5.003), (I-339)+(2.007)+(5.004), (I-339)+(2.007)+(5.005), (I-339)+(2.007)+(5.006), (I-339)+(2.007)+(5.007), (I-339)+(2.007)+(5.008), (I-339)+(2.007)+(5.009), (I-339)+(2.007)+(5.010), (I-339)+(2.007)+(5.011), (I-339)+(2.007)+(5.012), (I-339)+(2.007)+(5.013), (I-339)+(2.007)+(5.014), (I-339)+(2.007)+(5.015), (I-339)+(2.007)+(5.016), (I-339)+(2.007)+(5.017), (I-339)+(2.007)+(5.018), (I-339)+(2.007)+(5.019), (I-339)+(2.007)+(5.020), (I-339)+(2.007)+(5.021), (I-339)+(2.007)+(5.022), (I-339)+(2.007)+(5.023), (I-339)+(2.007)+(6.001), (I-339)+(2.007)+(6.002), (I-339)+(2.007)+(6.003), (I-339)+(2.007)+(6.004), (I-339)+(2.007)+(7.001), (I-339)+(2.007)+(7.002), (I-339)+(2.007)+(7.003), (I-339)+(2.007)+(7.004), (I-339)+(2.007)+(7.005), (I-339)+(2.007)+(7.006), (I-339)+(2.007)+(9.001), (I-339)+(2.007)+(9.002), (I-339)+(2.007)+(9.003), (I-339)+(2.007)+(9.004), (I-339)+(2.007)+(9.005), (I-339)+(2.007)+(9.006), (I-339)+(2.007)+(9.007), (I-339)+(2.007)+(9.008), (I-339)+(2.007)+(9.009), (I-339)+(2.007)+(14.001), (I-339)+(2.007)+(14.002), (I-339)+(2.007)+(15.008), (I-339)+(2.007)+(15.011), (I-339)+(2.007)+(15.012), (I-339)+(2.007)+(15.016), (I-339)+(2.007)+(15.025), (I-339)+(2.007)+(15.027), (I-339)+(2.007)+(15.047), (I-339)+(2.007)+(15.063), (I-339)+(2.007)+(15.064), (I-339)+(2.007)+(16.001), (I-339)+(2.007)+(16.002), (I-339)+(2.007)+(16.003), (I-339)+(2.007)+(16.004), (I-339)+(2.007)+(16.005), (I-339)+(2.007)+(16.006), (I-339)+(2.007)+(16.007), (I-339)+(2.007)+(16.008), (I-339)+(2.007)+(17.001), (I-339)+(2.007)+(17.002), (I-339)+(2.007)+(17.003), (I-339)+(2.007)+(17.004), (I-339)+(2.007)+(17.005), (I-339)+(2.007)+(17.006), (I-339)+(2.007)+(17.007), (I-339)+(2.007)+(17.008), (I-339)+(2.007)+(17.009), (I-339)+(2.007)+(17.010), (I-339)+(2.007)+(17.011), (I-339)+(2.007)+(17.012), (I-339)+(2.007)+(18.001), (I-339)+(2.008)+(3.001), (I-339)+(2.008)+(3.002), (I-339)+(2.008)+(3.003), (I-339)+(2.008)+(3.004), (I-339)+(2.008)+(3.005), (I-339)+(2.008)+(3.006), (I-339)+(2.008)+(3.007), (I-339)+(2.008)+(3.008), (I-339)+(2.008)+(3.009), (I-339)+(2.008)+(3.010), (I-339)+(2.008)+(3.011), (I-339)+(2.008)+(3.012), (I-339)+(2.008)+(3.013), (I-339)+(2.008)+(3.014), (I-339)+(2.008)+(3.015), (I-339)+(2.008)+(3.016), (I-339)+(2.008)+(3.017), (I-339)+(2.008)+(3.018), (I-339)+(2.008)+(3.019), (I-339)+(2.008)+(3.020), (I-339)+(2.008)+(3.021), (I-339)+(2.008)+(3.022), (I-339)+(2.008)+(3.023), (I-339)+(2.008)+(3.024), (I-339)+(2.008)+(3.025), (I-339)+(2.008)+(3.026), (I-339)+(2.008)+(3.027), (I-339)+(2.008)+(3.028), (I-339)+(2.008)+(3.029), (I-339)+(2.008)+(3.030), (I-339)+(2.008)+(3.031), (I-339)+(2.008)+(5.001), (I-339)+(2.008)+(5.002), (I-339)+(2.008)+(5.003), (I-339)+(2.008)+(5.004), (I-339)+(2.008)+(5.005), (I-339)+(2.008)+(5.006), (I-339)+(2.008)+(5.007), (I-339)+(2.008)+(5.008), (I-339)+(2.008)+(5.009), (I-339)+(2.008)+(5.010), (I-339)+(2.008)+(5.011), (I-339)+(2.008)+(5.012), (I-339)+(2.008)+(5.013), (I-339)+(2.008)+(5.014), (I-339)+(2.008)+(5.015), (I-339)+(2.008)+(5.016), (I-339)+(2.008)+(5.017), (I-339)+(2.008)+(5.018), (I-339)+(2.008)+(5.019), (I-339)+(2.008)+(5.020), (I-339)+(2.008)+(5.021), (I-339)+(2.008)+(5.022), (I-339)+(2.008)+(5.023), (I-339)+(2.008)+(6.001), (I-339)+(2.008)+(6.002), (I-339)+(2.008)+(6.003), (I-339)+(2.008)+(6.004), (I-339)+(2.008)+(7.001), (I-339)+(2.008)+(7.002), (I-339)+(2.008)+(7.003), (I-339)+(2.008)+(7.004), (I-339)+(2.008)+(7.005), (I-339)+(2.008)+(7.006), (I-339)+(2.008)+(9.001), (I-339)+(2.008)+(9.002), (I-339)+(2.008)+(9.003), (I-339)+(2.008)+(9.004), (I-339)+(2.008)+(9.005), (I-339)+(2.008)+(9.006), (I-339)+(2.008)+(9.007), (I-339)+(2.008)+(9.008), (I-339)+(2.008)+(9.009), (I-339)+(2.008)+(14.001), (I-339)+(2.008)+(14.002), (I-339)+(2.008)+(15.008), (I-339)+(2.008)+(15.011), (I-339)+(2.008)+(15.012), (I-339)+(2.008)+(15.016), (I-339)+(2.008)+(15.025), (I-339)+(2.008)+(15.027), (I-339)+(2.008)+(15.047), (I-339)+(2.008)+(15.063), (I-339)+(2.008)+(15.064), (I-339)+(2.008)+(16.001), (I-339)+(2.008)+(16.002), (I-339)+(2.008)+(16.003), (I-339)+(2.008)+(16.004), (I-339)+(2.008)+(16.005), (I-339)+(2.008)+(16.006), (I-339)+(2.008)+(16.007), (I-339)+(2.008)+(16.008), (I-339)+(2.008)+(17.001), (I-339)+(2.008)+(17.002), (I-339)+(2.008)+(17.003), (I-339)+(2.008)+(17.004), (I-339)+(2.008)+(17.005), (I-339)+(2.008)+(17.006), (I-339)+(2.008)+(17.007), (I-339)+(2.008)+(17.008), (I-339)+(2.008)+(17.009), (I-339)+(2.008)+(17.010), (I-339)+(2.008)+(17.011), (I-339)+(2.008)+(17.012), (I-339)+(2.008)+(18.001), (I-339)+(2.009)+(3.001), (I-339)+(2.009)+(3.002), (I-339)+(2.009)+(3.003), (I-339)+(2.009)+(3.004), (I-339)+(2.009)+(3.005), (I-339)+(2.009)+(3.006), (I-339)+(2.009)+(3.007), (I-339)+(2.009)+(3.008), (I-339)+(2.009)+(3.009), (I-339)+(2.009)+(3.010), (I-339)+(2.009)+(3.011), (I-339)+(2.009)+(3.012), (I-339)+(2.009)+(3.013), (I-339)+(2.009)+(3.014), (I-339)+(2.009)+(3.015), (I-339)+(2.009)+(3.016), (I-339)+(2.009)+(3.017), (I-339)+(2.009)+(3.018), (I-339)+(2.009)+(3.019), (I-339)+(2.009)+(3.020), (I-339)+(2.009)+(3.021), (I-339)+(2.009)+(3.022), (I-339)+(2.009)+(3.023), (I-339)+(2.009)+(3.024), (I-339)+(2.009)+(3.025), (I-339)+(2.009)+(3.026), (I-339)+(2.009)+(3.027), (I-339)+(2.009)+(3.028), (I-339)+(2.009)+(3.029), (I-339)+(2.009)+(3.030), (I-339)+(2.009)+(3.031), (I-339)+(2.009)+(5.001), (I-339)+(2.009)+(5.002), (I-339)+(2.009)+(5.003), (I-339)+(2.009)+(5.004), (I-339)+(2.009)+(5.005), (I-339)+(2.009)+(5.006), (I-339)+(2.009)+(5.007), (I-339)+(2.009)+(5.008), (I-339)+(2.009)+(5.009), (I-339)+(2.009)+(5.010), (I-339)+(2.009)+(5.011), (I-339)+(2.009)+(5.012), (I-339)+(2.009)+(5.013), (I-339)+(2.009)+(5.014), (I-339)+(2.009)+(5.015), (I-339)+(2.009)+(5.016), (I-339)+(2.009)+(5.017), (I-339)+(2.009)+(5.018), (I-339)+(2.009)+(5.019), (I-339)+(2.009)+(5.020), (I-339)+(2.009)+(5.021), (I-339)+(2.009)+(5.022), (I-339)+(2.009)+(5.023), (I-339)+(2.009)+(6.001), (I-339)+(2.009)+(6.002), (I-339)+(2.009)+(6.003), (I-339)+(2.009)+(6.004), (I-339)+(2.009)+(7.001), (I-339)+(2.009)+(7.002), (I-339)+(2.009)+(7.003), (I-339)+(2.009)+(7.004), (I-339)+(2.009)+(7.005), (I-339)+(2.009)+(7.006), (I-339)+(2.009)+(9.001), (I-339)+(2.009)+(9.002), (I-339)+(2.009)+(9.003), (I-339)+(2.009)+(9.004), (I-339)+(2.009)+(9.005), (I-339)+(2.009)+(9.006), (I-339)+(2.009)+(9.007), (I-339)+(2.009)+(9.008), (I-339)+(2.009)+(9.009), (I-339)+(2.009)+(14.001), (I-339)+(2.009)+(14.002), (I-339)+(2.009)+(15.008), (I-339)+(2.009)+(15.011), (I-339)+(2.009)+(15.012), (I-339)+(2.009)+(15.016), (I-339)+(2.009)+(15.025), (I-339)+(2.009)+(15.027), (I-339)+(2.009)+(15.047), (I-339)+(2.009)+(15.063), (I-339)+(2.009)+(15.064), (I-339)+(2.009)+(16.001), (I-339)+(2.009)+(16.002), (I-339)+(2.009)+(16.003), (I-339)+(2.009)+(16.004), (I-339)+(2.009)+(16.005), (I-339)+(2.009)+(16.006), (I-339)+(2.009)+(16.007), (I-339)+(2.009)+(16.008), (I-339)+(2.009)+(17.001), (I-339)+(2.009)+(17.002), (I-339)+(2.009)+(17.003), (I-339)+(2.009)+(17.004), (I-339)+(2.009)+(17.005), (I-339)+(2.009)+(17.006), (I-339)+(2.009)+(17.007), (I-339)+(2.009)+(17.008), (I-339)+(2.009)+(17.009), (I-339)+(2.009)+(17.010), (I-339)+(2.009)+(17.011), (I-339)+(2.009)+(17.012), (I-339)+(2.009)+(18.001), (I-339)+(2.010)+(3.001), (I-339)+(2.010)+(3.002), (I-339)+(2.010)+(3.003), (I-339)+(2.010)+(3.004), (I-339)+(2.010)+(3.005), (I-339)+(2.010)+(3.006), (I-339)+(2.010)+(3.007), (I-339)+(2.010)+(3.008), (I-339)+(2.010)+(3.009), (I-339)+(2.010)+(3.010), (I-339)+(2.010)+(3.011), (I-339)+(2.010)+(3.012), (I-339)+(2.010)+(3.013), (I-339)+(2.010)+(3.014), (I-339)+(2.010)+(3.015), (I-339)+(2.010)+(3.016), (I-339)+(2.010)+(3.017), (I-339)+(2.010)+(3.018), (I-339)+(2.010)+(3.019), (I-339)+(2.010)+(3.020), (I-339)+(2.010)+(3.021), (I-339)+(2.010)+(3.022), (I-339)+(2.010)+(3.023), (I-339)+(2.010)+(3.024), (I-339)+(2.010)+(3.025), (I-339)+(2.010)+(3.026), (I-339)+(2.010)+(3.027), (I-339)+(2.010)+(3.028), (I-339)+(2.010)+(3.029), (I-339)+(2.010)+(3.030), (I-339)+(2.010)+(3.031), (I-339)+(2.010)+(5.001), (I-339)+(2.010)+(5.002), (I-339)+(2.010)+(5.003), (I-339)+(2.010)+(5.004), (I-339)+(2.010)+(5.005), (I-339)+(2.010)+(5.006), (I-339)+(2.010)+(5.007), (I-339)+(2.010)+(5.008), (I-339)+(2.010)+(5.009), (I-339)+(2.010)+(5.010), (I-339)+(2.010)+(5.011), (I-339)+(2.010)+(5.012), (I-339)+(2.010)+(5.013), (I-339)+(2.010)+(5.014), (I-339)+(2.010)+(5.015), (I-339)+(2.010)+(5.016), (I-339)+(2.010)+(5.017), (I-339)+(2.010)+(5.018), (I-339)+(2.010)+(5.019), (I-339)+(2.010)+(5.020), (I-339)+(2.010)+(5.021), (I-339)+(2.010)+(5.022), (I-339)+(2.010)+(5.023), (I-339)+(2.010)+(6.001), (I-339)+(2.010)+(6.002), (I-339)+(2.010)+(6.003), (I-339)+(2.010)+(6.004), (I-339)+(2.010)+(7.001), (I-339)+(2.010)+(7.002), (I-339)+(2.010)+(7.003), (I-339)+(2.010)+(7.004), (I-339)+(2.010)+(7.005), (I-339)+(2.010)+(7.006), (I-339)+(2.010)+(9.001), (I-339)+(2.010)+(9.002), (I-339)+(2.010)+(9.003), (I-339)+(2.010)+(9.004), (I-339)+(2.010)+(9.005), (I-339)+(2.010)+(9.006), (I-339)+(2.010)+(9.007), (I-339)+(2.010)+(9.008), (I-339)+(2.010)+(9.009), (I-339)+(2.010)+(14.001), (I-339)+(2.010)+(14.002), (I-339)+(2.010)+(15.008), (I-339)+(2.010)+(15.011), (I-339)+(2.010)+(15.012), (I-339)+(2.010)+(15.016), (I-339)+(2.010)+(15.025), (I-339)+(2.010)+(15.027), (I-339)+(2.010)+(15.047), (I-339)+(2.010)+(15.063), (I-339)+(2.010)+(15.064), (I-339)+(2.010)+(16.001), (I-339)+(2.010)+(16.002), (I-339)+(2.010)+(16.003), (I-339)+(2.010)+(16.004), (I-339)+(2.010)+(16.005), (I-339)+(2.010)+(16.006), (I-339)+(2.010)+(16.007), (I-339)+(2.010)+(16.008), (I-339)+(2.010)+(17.001), (I-339)+(2.010)+(17.002), (I-339)+(2.010)+(17.003), (I-339)+(2.010)+(17.004), (I-339)+(2.010)+(17.005), (I-339)+(2.010)+(17.006), (I-339)+(2.010)+(17.007), (I-339)+(2.010)+(17.008), (I-339)+(2.010)+(17.009), (I-339)+(2.010)+(17.010), (I-339)+(2.010)+(17.011), (I-339)+(2.010)+(17.012), (I-339)+(2.010)+(18.001), (I-339)+(2.011)+(3.001), (I-339)+(2.011)+(3.002), (I-339)+(2.011)+(3.003), (I-339)+(2.011)+(3.004), (I-339)+(2.011)+(3.005), (I-339)+(2.011)+(3.006), (I-339)+(2.011)+(3.007), (I-339)+(2.011)+(3.008), (I-339)+(2.011)+(3.009), (I-339)+(2.011)+(3.010), (I-339)+(2.011)+(3.011), (I-339)+(2.011)+(3.012), (I-339)+(2.011)+(3.013), (I-339)+(2.011)+(3.014), (I-339)+(2.011)+(3.015), (I-339)+(2.011)+(3.016), (I-339)+(2.011)+(3.017), (I-339)+(2.011)+(3.018), (I-339)+(2.011)+(3.019), (I-339)+(2.011)+(3.020), (I-339)+(2.011)+(3.021), (I-339)+(2.011)+(3.022), (I-339)+(2.011)+(3.023), (I-339)+(2.011)+(3.024), (I-339)+(2.011)+(3.025), (I-339)+(2.011)+(3.026), (I-339)+(2.011)+(3.027), (I-339)+(2.011)+(3.028), (I-339)+(2.011)+(3.029), (I-339)+(2.011)+(3.030), (I-339)+(2.011)+(3.031), (I-339)+(2.011)+(5.001), (I-339)+(2.011)+(5.002), (I-339)+(2.011)+(5.003), (I-339)+(2.011)+(5.004), (I-339)+(2.011)+(5.005), (I-339)+(2.011)+(5.006), (I-339)+(2.011)+(5.007), (I-339)+(2.011)+(5.008), (I-339)+(2.011)+(5.009), (I-339)+(2.011)+(5.010), (I-339)+(2.011)+(5.011), (I-339)+(2.011)+(5.012), (I-339)+(2.011)+(5.013), (I-339)+(2.011)+(5.014), (I-339)+(2.011)+(5.015), (I-339)+(2.011)+(5.016), (I-339)+(2.011)+(5.017), (I-339)+(2.011)+(5.018), (I-339)+(2.011)+(5.019), (I-339)+(2.011)+(5.020), (I-339)+(2.011)+(5.021), (I-339)+(2.011)+(5.022), (I-339)+(2.011)+(5.023), (I-339)+(2.011)+(6.001), (I-339)+(2.011)+(6.002), (I-339)+(2.011)+(6.003), (I-339)+(2.011)+(6.004), (I-339)+(2.011)+(7.001), (I-339)+(2.011)+(7.002), (I-339)+(2.011)+(7.003), (I-339)+(2.011)+(7.004), (I-339)+(2.011)+(7.005), (I-339)+(2.011)+(7.006), (I-339)+(2.011)+(9.001), (I-339)+(2.011)+(9.002), (I-339)+(2.011)+(9.003), (I-339)+(2.011)+(9.004), (I-339)+(2.011)+(9.005), (I-339)+(2.011)+(9.006), (I-339)+(2.011)+(9.007), (I-339)+(2.011)+(9.008), (I-339)+(2.011)+(9.009), (I-339)+(2.011)+(14.001), (I-339)+(2.011)+(14.002), (I-339)+(2.011)+(15.008), (I-339)+(2.011)+(15.011), (I-339)+(2.011)+(15.012), (I-339)+(2.011)+(15.016), (I-339)+(2.011)+(15.025), (I-339)+(2.011)+(15.027), (I-339)+(2.011)+(15.047), (I-339)+(2.011)+(15.063), (I-339)+(2.011)+(15.064), (I-339)+(2.011)+(16.001), (I-339)+(2.011)+(16.002), (I-339)+(2.011)+(16.003), (I-339)+(2.011)+(16.004), (I-339)+(2.011)+(16.005), (I-339)+(2.011)+(16.006), (I-339)+(2.011)+(16.007), (I-339)+(2.011)+(16.008), (I-339)+(2.011)+(17.001), (I-339)+(2.011)+(17.002), (I-339)+(2.011)+(17.003), (I-339)+(2.011)+(17.004), (I-339)+(2.011)+(17.005), (I-339)+(2.011)+(17.006), (I-339)+(2.011)+(17.007), (I-339)+(2.011)+(17.008), (I-339)+(2.011)+(17.009), (I-339)+(2.011)+(17.010), (I-339)+(2.011)+(17.011), (I-339)+(2.011)+(17.012), (I-339)+(2.011)+(18.001), (I-339)+(2.012)+(3.001), (I-339)+(2.012)+(3.002), (I-339)+(2.012)+(3.003), (I-339)+(2.012)+(3.004), (I-339)+(2.012)+(3.005), (I-339)+(2.012)+(3.006), (I-339)+(2.012)+(3.007), (I-339)+(2.012)+(3.008), (I-339)+(2.012)+(3.009), (I-339)+(2.012)+(3.010), (I-339)+(2.012)+(3.011), (I-339)+(2.012)+(3.012), (I-339)+(2.012)+(3.013), (I-339)+(2.012)+(3.014), (I-339)+(2.012)+(3.015), (I-339)+(2.012)+(3.016), (I-339)+(2.012)+(3.017), (I-339)+(2.012)+(3.018), (I-339)+(2.012)+(3.019), (I-339)+(2.012)+(3.020), (I-339)+(2.012)+(3.021), (I-339)+(2.012)+(3.022), (I-339)+(2.012)+(3.023), (I-339)+(2.012)+(3.024), (I-339)+(2.012)+(3.025), (I-339)+(2.012)+(3.026), (I-339)+(2.012)+(3.027), (I-339)+(2.012)+(3.028), (I-339)+(2.012)+(3.029), (I-339)+(2.012)+(3.030), (I-339)+(2.012)+(3.031), (I-339)+(2.012)+(5.001), (I-339)+(2.012)+(5.002), (I-339)+(2.012)+(5.003), (I-339)+(2.012)+(5.004), (I-339)+(2.012)+(5.005), (I-339)+(2.012)+(5.006), (I-339)+(2.012)+(5.007), (I-339)+(2.012)+(5.008), (I-339)+(2.012)+(5.009), (I-339)+(2.012)+(5.010), (I-339)+(2.012)+(5.011), (I-339)+(2.012)+(5.012), (I-339)+(2.012)+(5.013), (I-339)+(2.012)+(5.014), (I-339)+(2.012)+(5.015), (I-339)+(2.012)+(5.016), (I-339)+(2.012)+(5.017), (I-339)+(2.012)+(5.018), (I-339)+(2.012)+(5.019), (I-339)+(2.012)+(5.020), (I-339)+(2.012)+(5.021), (I-339)+(2.012)+(5.022), (I-339)+(2.012)+(5.023), (I-339)+(2.012)+(6.001), (I-339)+(2.012)+(6.002), (I-339)+(2.012)+(6.003), (I-339)+(2.012)+(6.004), (I-339)+(2.012)+(7.001), (I-339)+(2.012)+(7.002), (I-339)+(2.012)+(7.003), (I-339)+(2.012)+(7.004), (I-339)+(2.012)+(7.005), (I-339)+(2.012)+(7.006), (I-339)+(2.012)+(9.001), (I-339)+(2.012)+(9.002), (I-339)+(2.012)+(9.003), (I-339)+(2.012)+(9.004), (I-339)+(2.012)+(9.005), (I-339)+(2.012)+(9.006), (I-339)+(2.012)+(9.007), (I-339)+(2.012)+(9.008), (I-339)+(2.012)+(9.009), (I-339)+(2.012)+(14.001), (I-339)+(2.012)+(14.002), (I-339)+(2.012)+(15.008), (I-339)+(2.012)+(15.011), (I-339)+(2.012)+(15.012), (I-339)+(2.012)+(15.016), (I-339)+(2.012)+(15.025), (I-339)+(2.012)+(15.027), (I-339)+(2.012)+(15.047), (I-339)+(2.012)+(15.063), (I-339)+(2.012)+(15.064), (I-339)+(2.012)+(16.001), (I-339)+(2.012)+(16.002), (I-339)+(2.012)+(16.003), (I-339)+(2.012)+(16.004), (I-339)+(2.012)+(16.005), (I-339)+(2.012)+(16.006), (I-339)+(2.012)+(16.007), (I-339)+(2.012)+(16.008), (I-339)+(2.012)+(17.001), (I-339)+(2.012)+(17.002), (I-339)+(2.012)+(17.003), (I-339)+(2.012)+(17.004), (I-339)+(2.012)+(17.005), (I-339)+(2.012)+(17.006), (I-339)+(2.012)+(17.007), (I-339)+(2.012)+(17.008), (I-339)+(2.012)+(17.009), (I-339)+(2.012)+(17.010), (I-339)+(2.012)+(17.011), (I-339)+(2.012)+(17.012), (I-339)+(2.012)+(18.001), (I-339)+(2.013)+(3.001), (I-339)+(2.013)+(3.002), (I-339)+(2.013)+(3.003), (I-339)+(2.013)+(3.004), (I-339)+(2.013)+(3.005), (I-339)+(2.013)+(3.006), (I-339)+(2.013)+(3.007), (I-339)+(2.013)+(3.008), (I-339)+(2.013)+(3.009), (I-339)+(2.013)+(3.010), (I-339)+(2.013)+(3.011), (I-339)+(2.013)+(3.012), (I-339)+(2.013)+(3.013), (I-339)+(2.013)+(3.014), (I-339)+(2.013)+(3.015), (I-339)+(2.013)+(3.016), (I-339)+(2.013)+(3.017), (I-339)+(2.013)+(3.018), (I-339)+(2.013)+(3.019), (I-339)+(2.013)+(3.020), (I-339)+(2.013)+(3.021), (I-339)+(2.013)+(3.022), (I-339)+(2.013)+(3.023), (I-339)+(2.013)+(3.024), (I-339)+(2.013)+(3.025), (I-339)+(2.013)+(3.026), (I-339)+(2.013)+(3.027), (I-339)+(2.013)+(3.028), (I-339)+(2.013)+(3.029), (I-339)+(2.013)+(3.030), (I-339)+(2.013)+(3.031), (I-339)+(2.013)+(5.001), (I-339)+(2.013)+(5.002), (I-339)+(2.013)+(5.003), (I-339)+(2.013)+(5.004), (I-339)+(2.013)+(5.005), (I-339)+(2.013)+(5.006), (I-339)+(2.013)+(5.007), (I-339)+(2.013)+(5.008), (I-339)+(2.013)+(5.009), (I-339)+(2.013)+(5.010), (I-339)+(2.013)+(5.011), (I-339)+(2.013)+(5.012), (I-339)+(2.013)+(5.013), (I-339)+(2.013)+(5.014), (I-339)+(2.013)+(5.015), (I-339)+(2.013)+(5.016), (I-339)+(2.013)+(5.017), (I-339)+(2.013)+(5.018), (I-339)+(2.013)+(5.019), (I-339)+(2.013)+(5.020), (I-339)+(2.013)+(5.021), (I-339)+(2.013)+(5.022), (I-339)+(2.013)+(5.023), (I-339)+(2.013)+(6.001), (I-339)+(2.013)+(6.002), (I-339)+(2.013)+(6.003), (I-339)+(2.013)+(6.004), (I-339)+(2.013)+(7.001), (I-339)+(2.013)+(7.002), (I-339)+(2.013)+(7.003), (I-339)+(2.013)+(7.004), (I-339)+(2.013)+(7.005), (I-339)+(2.013)+(7.006), (I-339)+(2.013)+(9.001), (I-339)+(2.013)+(9.002), (I-339)+(2.013)+(9.003), (I-339)+(2.013)+(9.004), (I-339)+(2.013)+(9.005), (I-339)+(2.013)+(9.006), (I-339)+(2.013)+(9.007), (I-339)+(2.013)+(9.008), (I-339)+(2.013)+(9.009), (I-339)+(2.013)+(14.001), (I-339)+(2.013)+(14.002), (I-339)+(2.013)+(15.008), (I-339)+(2.013)+(15.011), (I-339)+(2.013)+(15.012), (I-339)+(2.013)+(15.016), (I-339)+(2.013)+(15.025), (I-339)+(2.013)+(15.027), (I-339)+(2.013)+(15.047), (I-339)+(2.013)+(15.063), (I-339)+(2.013)+(15.064), (I-339)+(2.013)+(16.001), (I-339)+(2.013)+(16.002), (I-339)+(2.013)+(16.003), (I-339)+(2.013)+(16.004), (I-339)+(2.013)+(16.005), (I-339)+(2.013)+(16.006), (I-339)+(2.013)+(16.007), (I-339)+(2.013)+(16.008), (I-339)+(2.013)+(17.001), (I-339)+(2.013)+(17.002), (I-339)+(2.013)+(17.003), (I-339)+(2.013)+(17.004), (I-339)+(2.013)+(17.005), (I-339)+(2.013)+(17.006), (I-339)+(2.013)+(17.007), (I-339)+(2.013)+(17.008), (I-339)+(2.013)+(17.009), (I-339)+(2.013)+(17.010), (I-339)+(2.013)+(17.011), (I-339)+(2.013)+(17.012), (I-339)+(2.013)+(18.001), (I-339)+(2.014)+(3.001), (I-339)+(2.014)+(3.002), (I-339)+(2.014)+(3.003), (I-339)+(2.014)+(3.004), (I-339)+(2.014)+(3.005), (I-339)+(2.014)+(3.006), (I-339)+(2.014)+(3.007), (I-339)+(2.014)+(3.008), (I-339)+(2.014)+(3.009), (I-339)+(2.014)+(3.010), (I-339)+(2.014)+(3.011), (I-339)+(2.014)+(3.012), (I-339)+(2.014)+(3.013), (I-339)+(2.014)+(3.014), (I-339)+(2.014)+(3.015), (I-339)+(2.014)+(3.016), (I-339)+(2.014)+(3.017), (I-339)+(2.014)+(3.018), (I-339)+(2.014)+(3.019), (I-339)+(2.014)+(3.020), (I-339)+(2.014)+(3.021), (I-339)+(2.014)+(3.022), (I-339)+(2.014)+(3.023), (I-339)+(2.014)+(3.024), (I-339)+(2.014)+(3.025), (I-339)+(2.014)+(3.026), (I-339)+(2.014)+(3.027), (I-339)+(2.014)+(3.028), (I-339)+(2.014)+(3.029), (I-339)+(2.014)+(3.030), (I-339)+(2.014)+(3.031), (I-339)+(2.014)+(5.001), (I-339)+(2.014)+(5.002), (I-339)+(2.014)+(5.003), (I-339)+(2.014)+(5.004), (I-339)+(2.014)+(5.005), (I-339)+(2.014)+(5.006), (I-339)+(2.014)+(5.007), (I-339)+(2.014)+(5.008), (I-339)+(2.014)+(5.009), (I-339)+(2.014)+(5.010), (I-339)+(2.014)+(5.011), (I-339)+(2.014)+(5.012), (I-339)+(2.014)+(5.013), (I-339)+(2.014)+(5.014), (I-339)+(2.014)+(5.015), (I-339)+(2.014)+(5.016), (I-339)+(2.014)+(5.017), (I-339)+(2.014)+(5.018), (I-339)+(2.014)+(5.019), (I-339)+(2.014)+(5.020), (I-339)+(2.014)+(5.021), (I-339)+(2.014)+(5.022), (I-339)+(2.014)+(5.023), (I-339)+(2.014)+(6.001), (I-339)+(2.014)+(6.002), (I-339)+(2.014)+(6.003), (I-339)+(2.014)+(6.004), (I-339)+(2.014)+(7.001), (I-339)+(2.014)+(7.002), (I-339)+(2.014)+(7.003), (I-339)+(2.014)+(7.004), (I-339)+(2.014)+(7.005), (I-339)+(2.014)+(7.006), (I-339)+(2.014)+(9.001), (I-339)+(2.014)+(9.002), (I-339)+(2.014)+(9.003), (I-339)+(2.014)+(9.004), (I-339)+(2.014)+(9.005), (I-339)+(2.014)+(9.006), (I-339)+(2.014)+(9.007), (I-339)+(2.014)+(9.008), (I-339)+(2.014)+(9.009), (I-339)+(2.014)+(14.001), (I-339)+(2.014)+(14.002), (I-339)+(2.014)+(15.008), (I-339)+(2.014)+(15.011), (I-339)+(2.014)+(15.012), (I-339)+(2.014)+(15.016), (I-339)+(2.014)+(15.025), (I-339)+(2.014)+(15.027), (I-339)+(2.014)+(15.047), (I-339)+(2.014)+(15.063), (I-339)+(2.014)+(15.064), (I-339)+(2.014)+(16.001), (I-339)+(2.014)+(16.002), (I-339)+(2.014)+(16.003), (I-339)+(2.014)+(16.004), (I-339)+(2.014)+(16.005), (I-339)+(2.014)+(16.006), (I-339)+(2.014)+(16.007), (I-339)+(2.014)+(16.008), (I-339)+(2.014)+(17.001), (I-339)+(2.014)+(17.002), (I-339)+(2.014)+(17.003), (I-339)+(2.014)+(17.004), (I-339)+(2.014)+(17.005), (I-339)+(2.014)+(17.006), (I-339)+(2.014)+(17.007), (I-339)+(2.014)+(17.008), (I-339)+(2.014)+(17.009), (I-339)+(2.014)+(17.010), (I-339)+(2.014)+(17.011), (I-339)+(2.014)+(17.012), (I-339)+(2.014)+(18.001), (I-339)+(2.015)+(3.001), (I-339)+(2.015)+(3.002), (I-339)+(2.015)+(3.003), (I-339)+(2.015)+(3.004), (I-339)+(2.015)+(3.005), (I-339)+(2.015)+(3.006), (I-339)+(2.015)+(3.007), (I-339)+(2.015)+(3.008), (I-339)+(2.015)+(3.009), (I-339)+(2.015)+(3.010), (I-339)+(2.015)+(3.011), (I-339)+(2.015)+(3.012), (I-339)+(2.015)+(3.013), (I-339)+(2.015)+(3.014), (I-339)+(2.015)+(3.015), (I-339)+(2.015)+(3.016), (I-339)+(2.015)+(3.017), (I-339)+(2.015)+(3.018), (I-339)+(2.015)+(3.019), (I-339)+(2.015)+(3.020), (I-339)+(2.015)+(3.021), (I-339)+(2.015)+(3.022), (I-339)+(2.015)+(3.023), (I-339)+(2.015)+(3.024), (I-339)+(2.015)+(3.025), (I-339)+(2.015)+(3.026), (I-339)+(2.015)+(3.027), (I-339)+(2.015)+(3.028), (I-339)+(2.015)+(3.029), (I-339)+(2.015)+(3.030), (I-339)+(2.015)+(3.031), (I-339)+(2.015)+(5.001), (I-339)+(2.015)+(5.002), (I-339)+(2.015)+(5.003), (I-339)+(2.015)+(5.004), (I-339)+(2.015)+(5.005), (I-339)+(2.015)+(5.006), (I-339)+(2.015)+(5.007), (I-339)+(2.015)+(5.008), (I-339)+(2.015)+(5.009), (I-339)+(2.015)+(5.010), (I-339)+(2.015)+(5.011), (I-339)+(2.015)+(5.012), (I-339)+(2.015)+(5.013), (I-339)+(2.015)+(5.014), (I-339)+(2.015)+(5.015), (I-339)+(2.015)+(5.016), (I-339)+(2.015)+(5.017), (I-339)+(2.015)+(5.018), (I-339)+(2.015)+(5.019), (I-339)+(2.015)+(5.020), (I-339)+(2.015)+(5.021), (I-339)+(2.015)+(5.022), (I-339)+(2.015)+(5.023), (I-339)+(2.015)+(6.001), (I-339)+(2.015)+(6.002), (I-339)+(2.015)+(6.003), (I-339)+(2.015)+(6.004), (I-339)+(2.015)+(7.001), (I-339)+(2.015)+(7.002), (I-339)+(2.015)+(7.003), (I-339)+(2.015)+(7.004), (I-339)+(2.015)+(7.005), (I-339)+(2.015)+(7.006), (I-339)+(2.015)+(9.001), (I-339)+(2.015)+(9.002), (I-339)+(2.015)+(9.003), (I-339)+(2.015)+(9.004), (I-339)+(2.015)+(9.005), (I-339)+(2.015)+(9.006), (I-339)+(2.015)+(9.007), (I-339)+(2.015)+(9.008), (I-339)+(2.015)+(9.009), (I-339)+(2.015)+(14.001), (I-339)+(2.015)+(14.002), (I-339)+(2.015)+(15.008), (I-339)+(2.015)+(15.011), (I-339)+(2.015)+(15.012), (I-339)+(2.015)+(15.016), (I-339)+(2.015)+(15.025), (I-339)+(2.015)+(15.027), (I-339)+(2.015)+(15.047), (I-339)+(2.015)+(15.063), (I-339)+(2.015)+(15.064), (I-339)+(2.015)+(16.001), (I-339)+(2.015)+(16.002), (I-339)+(2.015)+(16.003), (I-339)+(2.015)+(16.004), (I-339)+(2.015)+(16.005), (I-339)+(2.015)+(16.006), (I-339)+(2.015)+(16.007), (I-339)+(2.015)+(16.008), (I-339)+(2.015)+(17.001), (I-339)+(2.015)+(17.002), (I-339)+(2.015)+(17.003), (I-339)+(2.015)+(17.004), (I-339)+(2.015)+(17.005), (I-339)+(2.015)+(17.006), (I-339)+(2.015)+(17.007), (I-339)+(2.015)+(17.008), (I-339)+(2.015)+(17.009), (I-339)+(2.015)+(17.010), (I-339)+(2.015)+(17.011), (I-339)+(2.015)+(17.012), (I-339)+(2.015)+(18.001), (I-339)+(2.016)+(3.001), (I-339)+(2.016)+(3.002), (I-339)+(2.016)+(3.003), (I-339)+(2.016)+(3.004), (I-339)+(2.016)+(3.005), (I-339)+(2.016)+(3.006), (I-339)+(2.016)+(3.007), (I-339)+(2.016)+(3.008), (I-339)+(2.016)+(3.009), (I-339)+(2.016)+(3.010), (I-339)+(2.016)+(3.011), (I-339)+(2.016)+(3.012), (I-339)+(2.016)+(3.013), (I-339)+(2.016)+(3.014), (I-339)+(2.016)+(3.015), (I-339)+(2.016)+(3.016), (I-339)+(2.016)+(3.017), (I-339)+(2.016)+(3.018), (I-339)+(2.016)+(3.019), (I-339)+(2.016)+(3.020), (I-339)+(2.016)+(3.021), (I-339)+(2.016)+(3.022), (I-339)+(2.016)+(3.023), (I-339)+(2.016)+(3.024), (I-339)+(2.016)+(3.025), (I-339)+(2.016)+(3.026), (I-339)+(2.016)+(3.027), (I-339)+(2.016)+(3.028), (I-339)+(2.016)+(3.029), (I-339)+(2.016)+(3.030), (I-339)+(2.016)+(3.031), (I-339)+(2.016)+(5.001), (I-339)+(2.016)+(5.002), (I-339)+(2.016)+(5.003), (I-339)+(2.016)+(5.004), (I-339)+(2.016)+(5.005), (I-339)+(2.016)+(5.006), (I-339)+(2.016)+(5.007), (I-339)+(2.016)+(5.008), (I-339)+(2.016)+(5.009), (I-339)+(2.016)+(5.010), (I-339)+(2.016)+(5.011), (I-339)+(2.016)+(5.012), (I-339)+(2.016)+(5.013), (I-339)+(2.016)+(5.014), (I-339)+(2.016)+(5.015), (I-339)+(2.016)+(5.016), (I-339)+(2.016)+(5.017), (I-339)+(2.016)+(5.018), (I-339)+(2.016)+(5.019), (I-339)+(2.016)+(5.020), (I-339)+(2.016)+(5.021), (I-339)+(2.016)+(5.022), (I-339)+(2.016)+(5.023), (I-339)+(2.016)+(6.001), (I-339)+(2.016)+(6.002), (I-339)+(2.016)+(6.003), (I-339)+(2.016)+(6.004), (I-339)+(2.016)+(7.001), (I-339)+(2.016)+(7.002), (I-339)+(2.016)+(7.003), (I-339)+(2.016)+(7.004), (I-339)+(2.016)+(7.005), (I-339)+(2.016)+(7.006), (I-339)+(2.016)+(9.001), (I-339)+(2.016)+(9.002), (I-339)+(2.016)+(9.003), (I-339)+(2.016)+(9.004), (I-339)+(2.016)+(9.005), (I-339)+(2.016)+(9.006), (I-339)+(2.016)+(9.007), (I-339)+(2.016)+(9.008), (I-339)+(2.016)+(9.009), (I-339)+(2.016)+(14.001), (I-339)+(2.016)+(14.002), (I-339)+(2.016)+(15.008), (I-339)+(2.016)+(15.011), (I-339)+(2.016)+(15.012), (I-339)+(2.016)+(15.016), (I-339)+(2.016)+(15.025), (I-339)+(2.016)+(15.027), (I-339)+(2.016)+(15.047), (I-339)+(2.016)+(15.063), (I-339)+(2.016)+(15.064), (I-339)+(2.016)+(16.001), (I-339)+(2.016)+(16.002), (I-339)+(2.016)+(16.003), (I-339)+(2.016)+(16.004), (I-339)+(2.016)+(16.005), (I-339)+(2.016)+(16.006), (I-339)+(2.016)+(16.007), (I-339)+(2.016)+(16.008), (I-339)+(2.016)+(17.001), (I-339)+(2.016)+(17.002), (I-339)+(2.016)+(17.003), (I-339)+(2.016)+(17.004), (I-339)+(2.016)+(17.005), (I-339)+(2.016)+(17.006), (I-339)+(2.016)+(17.007), (I-339)+(2.016)+(17.008), (I-339)+(2.016)+(17.009), (I-339)+(2.016)+(17.010), (I-339)+(2.016)+(17.011), (I-339)+(2.016)+(17.012), (I-339)+(2.016)+(18.001), (I-339)+(2.017)+(3.001), (I-339)+(2.017)+(3.002), (I-339)+(2.017)+(3.003), (I-339)+(2.017)+(3.004), (I-339)+(2.017)+(3.005), (I-339)+(2.017)+(3.006), (I-339)+(2.017)+(3.007), (I-339)+(2.017)+(3.008), (I-339)+(2.017)+(3.009), (I-339)+(2.017)+(3.010), (I-339)+(2.017)+(3.011), (I-339)+(2.017)+(3.012), (I-339)+(2.017)+(3.013), (I-339)+(2.017)+(3.014), (I-339)+(2.017)+(3.015), (I-339)+(2.017)+(3.016), (I-339)+(2.017)+(3.017), (I-339)+(2.017)+(3.018), (I-339)+(2.017)+(3.019), (I-339)+(2.017)+(3.020), (I-339)+(2.017)+(3.021), (I-339)+(2.017)+(3.022), (I-339)+(2.017)+(3.023), (I-339)+(2.017)+(3.024), (I-339)+(2.017)+(3.025), (I-339)+(2.017)+(3.026), (I-339)+(2.017)+(3.027), (I-339)+(2.017)+(3.028), (I-339)+(2.017)+(3.029), (I-339)+(2.017)+(3.030), (I-339)+(2.017)+(3.031), (I-339)+(2.017)+(5.001), (I-339)+(2.017)+(5.002), (I-339)+(2.017)+(5.003), (I-339)+(2.017)+(5.004), (I-339)+(2.017)+(5.005), (I-339)+(2.017)+(5.006), (I-339)+(2.017)+(5.007), (I-339)+(2.017)+(5.008), (I-339)+(2.017)+(5.009), (I-339)+(2.017)+(5.010), (I-339)+(2.017)+(5.011), (I-339)+(2.017)+(5.012), (I-339)+(2.017)+(5.013), (I-339)+(2.017)+(5.014), (I-339)+(2.017)+(5.015), (I-339)+(2.017)+(5.016), (I-339)+(2.017)+(5.017), (I-339)+(2.017)+(5.018), (I-339)+(2.017)+(5.019), (I-339)+(2.017)+(5.020), (I-339)+(2.017)+(5.021), (I-339)+(2.017)+(5.022), (I-339)+(2.017)+(5.023), (I-339)+(2.017)+(6.001), (I-339)+(2.017)+(6.002), (I-339)+(2.017)+(6.003), (I-339)+(2.017)+(6.004), (I-339)+(2.017)+(7.001), (I-339)+(2.017)+(7.002), (I-339)+(2.017)+(7.003), (I-339)+(2.017)+(7.004), (I-339)+(2.017)+(7.005), (I-339)+(2.017)+(7.006), (I-339)+(2.017)+(9.001), (I-339)+(2.017)+(9.002), (I-339)+(2.017)+(9.003), (I-339)+(2.017)+(9.004), (I-339)+(2.017)+(9.005), (I-339)+(2.017)+(9.006), (I-339)+(2.017)+(9.007), (I-339)+(2.017)+(9.008), (I-339)+(2.017)+(9.009), (I-339)+(2.017)+(14.001), (I-339)+(2.017)+(14.002), (I-339)+(2.017)+(15.008), (I-339)+(2.017)+(15.011), (I-339)+(2.017)+(15.012), (I-339)+(2.017)+(15.016), (I-339)+(2.017)+(15.025), (I-339)+(2.017)+(15.027), (I-339)+(2.017)+(15.047), (I-339)+(2.017)+(15.063), (I-339)+(2.017)+(15.064), (I-339)+(2.017)+(16.001), (I-339)+(2.017)+(16.002), (I-339)+(2.017)+(16.003), (I-339)+(2.017)+(16.004), (I-339)+(2.017)+(16.005), (I-339)+(2.017)+(16.006), (I-339)+(2.017)+(16.007), (I-339)+(2.017)+(16.008), (I-339)+(2.017)+(17.001), (I-339)+(2.017)+(17.002), (I-339)+(2.017)+(17.003), (I-339)+(2.017)+(17.004), (I-339)+(2.017)+(17.005), (I-339)+(2.017)+(17.006), (I-339)+(2.017)+(17.007), (I-339)+(2.017)+(17.008), (I-339)+(2.017)+(17.009), (I-339)+(2.017)+(17.010), (I-339)+(2.017)+(17.011), (I-339)+(2.017)+(17.012), (I-339)+(2.017)+(18.001), (I-339)+(2.018)+(3.001), (I-339)+(2.018)+(3.002), (I-339)+(2.018)+(3.003), (I-339)+(2.018)+(3.004), (I-339)+(2.018)+(3.005), (I-339)+(2.018)+(3.006), (I-339)+(2.018)+(3.007), (I-339)+(2.018)+(3.008), (I-339)+(2.018)+(3.009), (I-339)+(2.018)+(3.010), (I-339)+(2.018)+(3.011), (I-339)+(2.018)+(3.012), (I-339)+(2.018)+(3.013), (I-339)+(2.018)+(3.014), (I-339)+(2.018)+(3.015), (I-339)+(2.018)+(3.016), (I-339)+(2.018)+(3.017), (I-339)+(2.018)+(3.018), (I-339)+(2.018)+(3.019), (I-339)+(2.018)+(3.020), (I-339)+(2.018)+(3.021), (I-339)+(2.018)+(3.022), (I-339)+(2.018)+(3.023), (I-339)+(2.018)+(3.024), (I-339)+(2.018)+(3.025), (I-339)+(2.018)+(3.026), (I-339)+(2.018)+(3.027), (I-339)+(2.018)+(3.028), (I-339)+(2.018)+(3.029), (I-339)+(2.018)+(3.030), (I-339)+(2.018)+(3.031), (I-339)+(2.018)+(5.001), (I-339)+(2.018)+(5.002), (I-339)+(2.018)+(5.003), (I-339)+(2.018)+(5.004), (I-339)+(2.018)+(5.005), (I-339)+(2.018)+(5.006), (I-339)+(2.018)+(5.007), (I-339)+(2.018)+(5.008), (I-339)+(2.018)+(5.009), (I-339)+(2.018)+(5.010), (I-339)+(2.018)+(5.011), (I-339)+(2.018)+(5.012), (I-339)+(2.018)+(5.013), (I-339)+(2.018)+(5.014), (I-339)+(2.018)+(5.015), (I-339)+(2.018)+(5.016), (I-339)+(2.018)+(5.017), (I-339)+(2.018)+(5.018), (I-339)+(2.018)+(5.019), (I-339)+(2.018)+(5.020), (I-339)+(2.018)+(5.021), (I-339)+(2.018)+(5.022), (I-339)+(2.018)+(5.023), (I-339)+(2.018)+(6.001), (I-339)+(2.018)+(6.002), (I-339)+(2.018)+(6.003), (I-339)+(2.018)+(6.004), (I-339)+(2.018)+(7.001), (I-339)+(2.018)+(7.002), (I-339)+(2.018)+(7.003), (I-339)+(2.018)+(7.004), (I-339)+(2.018)+(7.005), (I-339)+(2.018)+(7.006), (I-339)+(2.018)+(9.001), (I-339)+(2.018)+(9.002), (I-339)+(2.018)+(9.003), (I-339)+(2.018)+(9.004), (I-339)+(2.018)+(9.005), (I-339)+(2.018)+(9.006), (I-339)+(2.018)+(9.007), (I-339)+(2.018)+(9.008), (I-339)+(2.018)+(9.009), (I-339)+(2.018)+(14.001), (I-339)+(2.018)+(14.002), (I-339)+(2.018)+(15.008), (I-339)+(2.018)+(15.011), (I-339)+(2.018)+(15.012), (I-339)+(2.018)+(15.016), (I-339)+(2.018)+(15.025), (I-339)+(2.018)+(15.027), (I-339)+(2.018)+(15.047), (I-339)+(2.018)+(15.063), (I-339)+(2.018)+(15.064), (I-339)+(2.018)+(16.001), (I-339)+(2.018)+(16.002), (I-339)+(2.018)+(16.003), (I-339)+(2.018)+(16.004), (I-339)+(2.018)+(16.005), (I-339)+(2.018)+(16.006), (I-339)+(2.018)+(16.007), (I-339)+(2.018)+(16.008), (I-339)+(2.018)+(17.001), (I-339)+(2.018)+(17.002), (I-339)+(2.018)+(17.003), (I-339)+(2.018)+(17.004), (I-339)+(2.018)+(17.005), (I-339)+(2.018)+(17.006), (I-339)+(2.018)+(17.007), (I-339)+(2.018)+(17.008), (I-339)+(2.018)+(17.009), (I-339)+(2.018)+(17.010), (I-339)+(2.018)+(17.011), (I-339)+(2.018)+(17.012), (I-339)+(2.018)+(18.001), (I-339)+(2.019)+(3.001), (I-339)+(2.019)+(3.002), (I-339)+(2.019)+(3.003), (I-339)+(2.019)+(3.004), (I-339)+(2.019)+(3.005), (I-339)+(2.019)+(3.006), (I-339)+(2.019)+(3.007), (I-339)+(2.019)+(3.008), (I-339)+(2.019)+(3.009), (I-339)+(2.019)+(3.010), (I-339)+(2.019)+(3.011), (I-339)+(2.019)+(3.012), (I-339)+(2.019)+(3.013), (I-339)+(2.019)+(3.014), (I-339)+(2.019)+(3.015), (I-339)+(2.019)+(3.016), (I-339)+(2.019)+(3.017), (I-339)+(2.019)+(3.018), (I-339)+(2.019)+(3.019), (I-339)+(2.019)+(3.020), (I-339)+(2.019)+(3.021), (I-339)+(2.019)+(3.022), (I-339)+(2.019)+(3.023), (I-339)+(2.019)+(3.024), (I-339)+(2.019)+(3.025), (I-339)+(2.019)+(3.026), (I-339)+(2.019)+(3.027), (I-339)+(2.019)+(3.028), (I-339)+(2.019)+(3.029), (I-339)+(2.019)+(3.030), (I-339)+(2.019)+(3.031), (I-339)+(2.019)+(5.001), (I-339)+(2.019)+(5.002), (I-339)+(2.019)+(5.003), (I-339)+(2.019)+(5.004), (I-339)+(2.019)+(5.005), (I-339)+(2.019)+(5.006), (I-339)+(2.019)+(5.007), (I-339)+(2.019)+(5.008), (I-339)+(2.019)+(5.009), (I-339)+(2.019)+(5.010), (I-339)+(2.019)+(5.011), (I-339)+(2.019)+(5.012), (I-339)+(2.019)+(5.013), (I-339)+(2.019)+(5.014), (I-339)+(2.019)+(5.015), (I-339)+(2.019)+(5.016), (I-339)+(2.019)+(5.017), (I-339)+(2.019)+(5.018), (I-339)+(2.019)+(5.019), (I-339)+(2.019)+(5.020), (I-339)+(2.019)+(5.021), (I-339)+(2.019)+(5.022), (I-339)+(2.019)+(5.023), (I-339)+(2.019)+(6.001), (I-339)+(2.019)+(6.002), (I-339)+(2.019)+(6.003), (I-339)+(2.019)+(6.004), (I-339)+(2.019)+(7.001), (I-339)+(2.019)+(7.002), (I-339)+(2.019)+(7.003), (I-339)+(2.019)+(7.004), (I-339)+(2.019)+(7.005), (I-339)+(2.019)+(7.006), (I-339)+(2.019)+(9.001), (I-339)+(2.019)+(9.002), (I-339)+(2.019)+(9.003), (I-339)+(2.019)+(9.004), (I-339)+(2.019)+(9.005), (I-339)+(2.019)+(9.006), (I-339)+(2.019)+(9.007), (I-339)+(2.019)+(9.008), (I-339)+(2.019)+(9.009), (I-339)+(2.019)+(14.001), (I-339)+(2.019)+(14.002), (I-339)+(2.019)+(15.008), (I-339)+(2.019)+(15.011), (I-339)+(2.019)+(15.012), (I-339)+(2.019)+(15.016), (I-339)+(2.019)+(15.025), (I-339)+(2.019)+(15.027), (I-339)+(2.019)+(15.047), (I-339)+(2.019)+(15.063), (I-339)+(2.019)+(15.064), (I-339)+(2.019)+(16.001), (I-339)+(2.019)+(16.002), (I-339)+(2.019)+(16.003), (I-339)+(2.019)+(16.004), (I-339)+(2.019)+(16.005), (I-339)+(2.019)+(16.006), (I-339)+(2.019)+(16.007), (I-339)+(2.019)+(16.008), (I-339)+(2.019)+(17.001), (I-339)+(2.019)+(17.002), (I-339)+(2.019)+(17.003), (I-339)+(2.019)+(17.004), (I-339)+(2.019)+(17.005), (I-339)+(2.019)+(17.006), (I-339)+(2.019)+(17.007), (I-339)+(2.019)+(17.008), (I-339)+(2.019)+(17.009), (I-339)+(2.019)+(17.010), (I-339)+(2.019)+(17.011), (I-339)+(2.019)+(17.012), (I-339)+(2.019)+(18.001), (I-339)+(2.020)+(3.001), (I-339)+(2.020)+(3.002), (I-339)+(2.020)+(3.003), (I-339)+(2.020)+(3.004), (I-339)+(2.020)+(3.005), (I-339)+(2.020)+(3.006), (I-339)+(2.020)+(3.007), (I-339)+(2.020)+(3.008), (I-339)+(2.020)+(3.009), (I-339)+(2.020)+(3.010), (I-339)+(2.020)+(3.011), (I-339)+(2.020)+(3.012), (I-339)+(2.020)+(3.013), (I-339)+(2.020)+(3.014), (I-339)+(2.020)+(3.015), (I-339)+(2.020)+(3.016), (I-339)+(2.020)+(3.017), (I-339)+(2.020)+(3.018), (I-339)+(2.020)+(3.019), (I-339)+(2.020)+(3.020), (I-339)+(2.020)+(3.021), (I-339)+(2.020)+(3.022), (I-339)+(2.020)+(3.023), (I-339)+(2.020)+(3.024), (I-339)+(2.020)+(3.025), (I-339)+(2.020)+(3.026), (I-339)+(2.020)+(3.027), (I-339)+(2.020)+(3.028), (I-339)+(2.020)+(3.029), (I-339)+(2.020)+(3.030), (I-339)+(2.020)+(3.031), (I-339)+(2.020)+(5.001), (I-339)+(2.020)+(5.002), (I-339)+(2.020)+(5.003), (I-339)+(2.020)+(5.004), (I-339)+(2.020)+(5.005), (I-339)+(2.020)+(5.006), (I-339)+(2.020)+(5.007), (I-339)+(2.020)+(5.008), (I-339)+(2.020)+(5.009), (I-339)+(2.020)+(5.010), (I-339)+(2.020)+(5.011), (I-339)+(2.020)+(5.012), (I-339)+(2.020)+(5.013), (I-339)+(2.020)+(5.014), (I-339)+(2.020)+(5.015), (I-339)+(2.020)+(5.016), (I-339)+(2.020)+(5.017), (I-339)+(2.020)+(5.018), (I-339)+(2.020)+(5.019), (I-339)+(2.020)+(5.020), (I-339)+(2.020)+(5.021), (I-339)+(2.020)+(5.022), (I-339)+(2.020)+(5.023), (I-339)+(2.020)+(6.001), (I-339)+(2.020)+(6.002), (I-339)+(2.020)+(6.003), (I-339)+(2.020)+(6.004), (I-339)+(2.020)+(7.001), (I-339)+(2.020)+(7.002), (I-339)+(2.020)+(7.003), (I-339)+(2.020)+(7.004), (I-339)+(2.020)+(7.005), (I-339)+(2.020)+(7.006), (I-339)+(2.020)+(9.001), (I-339)+(2.020)+(9.002), (I-339)+(2.020)+(9.003), (I-339)+(2.020)+(9.004), (I-339)+(2.020)+(9.005), (I-339)+(2.020)+(9.006), (I-339)+(2.020)+(9.007), (I-339)+(2.020)+(9.008), (I-339)+(2.020)+(9.009), (I-339)+(2.020)+(14.001), (I-339)+(2.020)+(14.002), (I-339)+(2.020)+(15.008), (I-339)+(2.020)+(15.011), (I-339)+(2.020)+(15.012), (I-339)+(2.020)+(15.016), (I-339)+(2.020)+(15.025), (I-339)+(2.020)+(15.027), (I-339)+(2.020)+(15.047), (I-339)+(2.020)+(15.063), (I-339)+(2.020)+(15.064), (I-339)+(2.020)+(16.001), (I-339)+(2.020)+(16.002), (I-339)+(2.020)+(16.003), (I-339)+(2.020)+(16.004), (I-339)+(2.020)+(16.005), (I-339)+(2.020)+(16.006), (I-339)+(2.020)+(16.007), (I-339)+(2.020)+(16.008), (I-339)+(2.020)+(17.001), (I-339)+(2.020)+(17.002), (I-339)+(2.020)+(17.003), (I-339)+(2.020)+(17.004), (I-339)+(2.020)+(17.005), (I-339)+(2.020)+(17.006), (I-339)+(2.020)+(17.007), (I-339)+(2.020)+(17.008), (I-339)+(2.020)+(17.009), (I-339)+(2.020)+(17.010), (I-339)+(2.020)+(17.011), (I-339)+(2.020)+(17.012), (I-339)+(2.020)+(18.001), (I-339)+(2.021)+(3.001), (I-339)+(2.021)+(3.002), (I-339)+(2.021)+(3.003), (I-339)+(2.021)+(3.004), (I-339)+(2.021)+(3.005), (I-339)+(2.021)+(3.006), (I-339)+(2.021)+(3.007), (I-339)+(2.021)+(3.008), (I-339)+(2.021)+(3.009), (I-339)+(2.021)+(3.010), (I-339)+(2.021)+(3.011), (I-339)+(2.021)+(3.012), (I-339)+(2.021)+(3.013), (I-339)+(2.021)+(3.014), (I-339)+(2.021)+(3.015), (I-339)+(2.021)+(3.016), (I-339)+(2.021)+(3.017), (I-339)+(2.021)+(3.018), (I-339)+(2.021)+(3.019), (I-339)+(2.021)+(3.020), (I-339)+(2.021)+(3.021), (I-339)+(2.021)+(3.022), (I-339)+(2.021)+(3.023), (I-339)+(2.021)+(3.024), (I-339)+(2.021)+(3.025), (I-339)+(2.021)+(3.026), (I-339)+(2.021)+(3.027), (I-339)+(2.021)+(3.028), (I-339)+(2.021)+(3.029), (I-339)+(2.021)+(3.030), (I-339)+(2.021)+(3.031), (I-339)+(2.021)+(5.001), (I-339)+(2.021)+(5.002), (I-339)+(2.021)+(5.003), (I-339)+(2.021)+(5.004), (I-339)+(2.021)+(5.005), (I-339)+(2.021)+(5.006), (I-339)+(2.021)+(5.007), (I-339)+(2.021)+(5.008), (I-339)+(2.021)+(5.009), (I-339)+(2.021)+(5.010), (I-339)+(2.021)+(5.011), (I-339)+(2.021)+(5.012), (I-339)+(2.021)+(5.013), (I-339)+(2.021)+(5.014), (I-339)+(2.021)+(5.015), (I-339)+(2.021)+(5.016), (I-339)+(2.021)+(5.017), (I-339)+(2.021)+(5.018), (I-339)+(2.021)+(5.019), (I-339)+(2.021)+(5.020), (I-339)+(2.021)+(5.021), (I-339)+(2.021)+(5.022), (I-339)+(2.021)+(5.023), (I-339)+(2.021)+(6.001), (I-339)+(2.021)+(6.002), (I-339)+(2.021)+(6.003), (I-339)+(2.021)+(6.004), (I-339)+(2.021)+(7.001), (I-339)+(2.021)+(7.002), (I-339)+(2.021)+(7.003), (I-339)+(2.021)+(7.004), (I-339)+(2.021)+(7.005), (I-339)+(2.021)+(7.006), (I-339)+(2.021)+(9.001), (I-339)+(2.021)+(9.002), (I-339)+(2.021)+(9.003), (I-339)+(2.021)+(9.004), (I-339)+(2.021)+(9.005), (I-339)+(2.021)+(9.006), (I-339)+(2.021)+(9.007), (I-339)+(2.021)+(9.008), (I-339)+(2.021)+(9.009), (I-339)+(2.021)+(14.001), (I-339)+(2.021)+(14.002), (I-339)+(2.021)+(15.008), (I-339)+(2.021)+(15.011), (I-339)+(2.021)+(15.012), (I-339)+(2.021)+(15.016), (I-339)+(2.021)+(15.025), (I-339)+(2.021)+(15.027), (I-339)+(2.021)+(15.047), (I-339)+(2.021)+(15.063), (I-339)+(2.021)+(15.064), (I-339)+(2.021)+(16.001), (I-339)+(2.021)+(16.002), (I-339)+(2.021)+(16.003), (I-339)+(2.021)+(16.004), (I-339)+(2.021)+(16.005), (I-339)+(2.021)+(16.006), (I-339)+(2.021)+(16.007), (I-339)+(2.021)+(16.008), (I-339)+(2.021)+(17.001), (I-339)+(2.021)+(17.002), (I-339)+(2.021)+(17.003), (I-339)+(2.021)+(17.004), (I-339)+(2.021)+(17.005), (I-339)+(2.021)+(17.006), (I-339)+(2.021)+(17.007), (I-339)+(2.021)+(17.008), (I-339)+(2.021)+(17.009), (I-339)+(2.021)+(17.010), (I-339)+(2.021)+(17.011), (I-339)+(2.021)+(17.012), (I-339)+(2.021)+(18.001), (I-339)+(2.022)+(3.001), (I-339)+(2.022)+(3.002), (I-339)+(2.022)+(3.003), (I-339)+(2.022)+(3.004), (I-339)+(2.022)+(3.005), (I-339)+(2.022)+(3.006), (I-339)+(2.022)+(3.007), (I-339)+(2.022)+(3.008), (I-339)+(2.022)+(3.009), (I-339)+(2.022)+(3.010), (I-339)+(2.022)+(3.011), (I-339)+(2.022)+(3.012), (I-339)+(2.022)+(3.013), (I-339)+(2.022)+(3.014), (I-339)+(2.022)+(3.015), (I-339)+(2.022)+(3.016), (I-339)+(2.022)+(3.017), (I-339)+(2.022)+(3.018), (I-339)+(2.022)+(3.019), (I-339)+(2.022)+(3.020), (I-339)+(2.022)+(3.021), (I-339)+(2.022)+(3.022), (I-339)+(2.022)+(3.023), (I-339)+(2.022)+(3.024), (I-339)+(2.022)+(3.025), (I-339)+(2.022)+(3.026), (I-339)+(2.022)+(3.027), (I-339)+(2.022)+(3.028), (I-339)+(2.022)+(3.029), (I-339)+(2.022)+(3.030), (I-339)+(2.022)+(3.031), (I-339)+(2.022)+(5.001), (I-339)+(2.022)+(5.002), (I-339)+(2.022)+(5.003), (I-339)+(2.022)+(5.004), (I-339)+(2.022)+(5.005), (I-339)+(2.022)+(5.006), (I-339)+(2.022)+(5.007), (I-339)+(2.022)+(5.008), (I-339)+(2.022)+(5.009), (I-339)+(2.022)+(5.010), (I-339)+(2.022)+(5.011), (I-339)+(2.022)+(5.012), (I-339)+(2.022)+(5.013), (I-339)+(2.022)+(5.014), (I-339)+(2.022)+(5.015), (I-339)+(2.022)+(5.016), (I-339)+(2.022)+(5.017), (I-339)+(2.022)+(5.018), (I-339)+(2.022)+(5.019), (I-339)+(2.022)+(5.020), (I-339)+(2.022)+(5.021), (I-339)+(2.022)+(5.022), (I-339)+(2.022)+(5.023), (I-339)+(2.022)+(6.001), (I-339)+(2.022)+(6.002), (I-339)+(2.022)+(6.003), (I-339)+(2.022)+(6.004), (I-339)+(2.022)+(7.001), (I-339)+(2.022)+(7.002), (I-339)+(2.022)+(7.003), (I-339)+(2.022)+(7.004), (I-339)+(2.022)+(7.005), (I-339)+(2.022)+(7.006), (I-339)+(2.022)+(9.001), (I-339)+(2.022)+(9.002), (I-339)+(2.022)+(9.003), (I-339)+(2.022)+(9.004), (I-339)+(2.022)+(9.005), (I-339)+(2.022)+(9.006), (I-339)+(2.022)+(9.007), (I-339)+(2.022)+(9.008), (I-339)+(2.022)+(9.009), (I-339)+(2.022)+(14.001), (I-339)+(2.022)+(14.002), (I-339)+(2.022)+(15.008), (I-339)+(2.022)+(15.011), (I-339)+(2.022)+(15.012), (I-339)+(2.022)+(15.016), (I-339)+(2.022)+(15.025), (I-339)+(2.022)+(15.027), (I-339)+(2.022)+(15.047), (I-339)+(2.022)+(15.063), (I-339)+(2.022)+(15.064), (I-339)+(2.022)+(16.001), (I-339)+(2.022)+(16.002), (I-339)+(2.022)+(16.003), (I-339)+(2.022)+(16.004), (I-339)+(2.022)+(16.005), (I-339)+(2.022)+(16.006), (I-339)+(2.022)+(16.007), (I-339)+(2.022)+(16.008), (I-339)+(2.022)+(17.001), (I-339)+(2.022)+(17.002), (I-339)+(2.022)+(17.003), (I-339)+(2.022)+(17.004), (I-339)+(2.022)+(17.005), (I-339)+(2.022)+(17.006), (I-339)+(2.022)+(17.007), (I-339)+(2.022)+(17.008), (I-339)+(2.022)+(17.009), (I-339)+(2.022)+(17.010), (I-339)+(2.022)+(17.011), (I-339)+(2.022)+(17.012), (I-339)+(2.022)+(18.001), (I-339)+(2.023)+(3.001), (I-339)+(2.023)+(3.002), (I-339)+(2.023)+(3.003), (I-339)+(2.023)+(3.004), (I-339)+(2.023)+(3.005), (I-339)+(2.023)+(3.006), (I-339)+(2.023)+(3.007), (I-339)+(2.023)+(3.008), (I-339)+(2.023)+(3.009), (I-339)+(2.023)+(3.010), (I-339)+(2.023)+(3.011), (I-339)+(2.023)+(3.012), (I-339)+(2.023)+(3.013), (I-339)+(2.023)+(3.014), (I-339)+(2.023)+(3.015), (I-339)+(2.023)+(3.016), (I-339)+(2.023)+(3.017), (I-339)+(2.023)+(3.018), (I-339)+(2.023)+(3.019), (I-339)+(2.023)+(3.020), (I-339)+(2.023)+(3.021), (I-339)+(2.023)+(3.022), (I-339)+(2.023)+(3.023), (I-339)+(2.023)+(3.024), (I-339)+(2.023)+(3.025), (I-339)+(2.023)+(3.026), (I-339)+(2.023)+(3.027), (I-339)+(2.023)+(3.028), (I-339)+(2.023)+(3.029), (I-339)+(2.023)+(3.030), (I-339)+(2.023)+(3.031), (I-339)+(2.023)+(5.001), (I-339)+(2.023)+(5.002), (I-339)+(2.023)+(5.003), (I-339)+(2.023)+(5.004), (I-339)+(2.023)+(5.005), (I-339)+(2.023)+(5.006), (I-339)+(2.023)+(5.007), (I-339)+(2.023)+(5.008), (I-339)+(2.023)+(5.009), (I-339)+(2.023)+(5.010), (I-339)+(2.023)+(5.011), (I-339)+(2.023)+(5.012), (I-339)+(2.023)+(5.013), (I-339)+(2.023)+(5.014), (I-339)+(2.023)+(5.015), (I-339)+(2.023)+(5.016), (I-339)+(2.023)+(5.017), (I-339)+(2.023)+(5.018), (I-339)+(2.023)+(5.019), (I-339)+(2.023)+(5.020), (I-339)+(2.023)+(5.021), (I-339)+(2.023)+(5.022), (I-339)+(2.023)+(5.023), (I-339)+(2.023)+(6.001), (I-339)+(2.023)+(6.002), (I-339)+(2.023)+(6.003), (I-339)+(2.023)+(6.004), (I-339)+(2.023)+(7.001), (I-339)+(2.023)+(7.002), (I-339)+(2.023)+(7.003), (I-339)+(2.023)+(7.004), (I-339)+(2.023)+(7.005), (I-339)+(2.023)+(7.006), (I-339)+(2.023)+(9.001), (I-339)+(2.023)+(9.002), (I-339)+(2.023)+(9.003), (I-339)+(2.023)+(9.004), (I-339)+(2.023)+(9.005), (I-339)+(2.023)+(9.006), (I-339)+(2.023)+(9.007), (I-339)+(2.023)+(9.008), (I-339)+(2.023)+(9.009), (I-339)+(2.023)+(14.001), (I-339)+(2.023)+(14.002), (I-339)+(2.023)+(15.008), (I-339)+(2.023)+(15.011), (I-339)+(2.023)+(15.012), (I-339)+(2.023)+(15.016), (I-339)+(2.023)+(15.025), (I-339)+(2.023)+(15.027), (I-339)+(2.023)+(15.047), (I-339)+(2.023)+(15.063), (I-339)+(2.023)+(15.064), (I-339)+(2.023)+(16.001), (I-339)+(2.023)+(16.002), (I-339)+(2.023)+(16.003), (I-339)+(2.023)+(16.004), (I-339)+(2.023)+(16.005), (I-339)+(2.023)+(16.006), (I-339)+(2.023)+(16.007), (I-339)+(2.023)+(16.008), (I-339)+(2.023)+(17.001), (I-339)+(2.023)+(17.002), (I-339)+(2.023)+(17.003), (I-339)+(2.023)+(17.004), (I-339)+(2.023)+(17.005), (I-339)+(2.023)+(17.006), (I-339)+(2.023)+(17.007), (I-339)+(2.023)+(17.008), (I-339)+(2.023)+(17.009), (I-339)+(2.023)+(17.010), (I-339)+(2.023)+(17.011), (I-339)+(2.023)+(17.012), (I-339)+(2.023)+(18.001), (I-339)+(2.024)+(3.001), (I-339)+(2.024)+(3.002), (I-339)+(2.024)+(3.003), (I-339)+(2.024)+(3.004), (I-339)+(2.024)+(3.005), (I-339)+(2.024)+(3.006), (I-339)+(2.024)+(3.007), (I-339)+(2.024)+(3.008), (I-339)+(2.024)+(3.009), (I-339)+(2.024)+(3.010), (I-339)+(2.024)+(3.011), (I-339)+(2.024)+(3.012), (I-339)+(2.024)+(3.013), (I-339)+(2.024)+(3.014), (I-339)+(2.024)+(3.015), (I-339)+(2.024)+(3.016), (I-339)+(2.024)+(3.017), (I-339)+(2.024)+(3.018), (I-339)+(2.024)+(3.019), (I-339)+(2.024)+(3.020), (I-339)+(2.024)+(3.021), (I-339)+(2.024)+(3.022), (I-339)+(2.024)+(3.023), (I-339)+(2.024)+(3.024), (I-339)+(2.024)+(3.025), (I-339)+(2.024)+(3.026), (I-339)+(2.024)+(3.027), (I-339)+(2.024)+(3.028), (I-339)+(2.024)+(3.029), (I-339)+(2.024)+(3.030), (I-339)+(2.024)+(3.031), (I-339)+(2.024)+(5.001), (I-339)+(2.024)+(5.002), (I-339)+(2.024)+(5.003), (I-339)+(2.024)+(5.004), (I-339)+(2.024)+(5.005), (I-339)+(2.024)+(5.006), (I-339)+(2.024)+(5.007), (I-339)+(2.024)+(5.008), (I-339)+(2.024)+(5.009), (I-339)+(2.024)+(5.010), (I-339)+(2.024)+(5.011), (I-339)+(2.024)+(5.012), (I-339)+(2.024)+(5.013), (I-339)+(2.024)+(5.014), (I-339)+(2.024)+(5.015), (I-339)+(2.024)+(5.016), (I-339)+(2.024)+(5.017), (I-339)+(2.024)+(5.018), (I-339)+(2.024)+(5.019), (I-339)+(2.024)+(5.020), (I-339)+(2.024)+(5.021), (I-339)+(2.024)+(5.022), (I-339)+(2.024)+(5.023), (I-339)+(2.024)+(6.001), (I-339)+(2.024)+(6.002), (I-339)+(2.024)+(6.003), (I-339)+(2.024)+(6.004), (I-339)+(2.024)+(7.001), (I-339)+(2.024)+(7.002), (I-339)+(2.024)+(7.003), (I-339)+(2.024)+(7.004), (I-339)+(2.024)+(7.005), (I-339)+(2.024)+(7.006), (I-339)+(2.024)+(9.001), (I-339)+(2.024)+(9.002), (I-339)+(2.024)+(9.003), (I-339)+(2.024)+(9.004), (I-339)+(2.024)+(9.005), (I-339)+(2.024)+(9.006), (I-339)+(2.024)+(9.007), (I-339)+(2.024)+(9.008), (I-339)+(2.024)+(9.009), (I-339)+(2.024)+(14.001), (I-339)+(2.024)+(14.002), (I-339)+(2.024)+(15.008), (I-339)+(2.024)+(15.011), (I-339)+(2.024)+(15.012), (I-339)+(2.024)+(15.016), (I-339)+(2.024)+(15.025), (I-339)+(2.024)+(15.027), (I-339)+(2.024)+(15.047), (I-339)+(2.024)+(15.063), (I-339)+(2.024)+(15.064), (I-339)+(2.024)+(16.001), (I-339)+(2.024)+(16.002), (I-339)+(2.024)+(16.003), (I-339)+(2.024)+(16.004), (I-339)+(2.024)+(16.005), (I-339)+(2.024)+(16.006), (I-339)+(2.024)+(16.007), (I-339)+(2.024)+(16.008), (I-339)+(2.024)+(17.001), (I-339)+(2.024)+(17.002), (I-339)+(2.024)+(17.003), (I-339)+(2.024)+(17.004), (I-339)+(2.024)+(17.005), (I-339)+(2.024)+(17.006), (I-339)+(2.024)+(17.007), (I-339)+(2.024)+(17.008), (I-339)+(2.024)+(17.009), (I-339)+(2.024)+(17.010), (I-339)+(2.024)+(17.011), (I-339)+(2.024)+(17.012), (I-339)+(2.024)+(18.001), (I-339)+(2.025)+(3.001), (I-339)+(2.025)+(3.002), (I-339)+(2.025)+(3.003), (I-339)+(2.025)+(3.004), (I-339)+(2.025)+(3.005), (I-339)+(2.025)+(3.006), (I-339)+(2.025)+(3.007), (I-339)+(2.025)+(3.008), (I-339)+(2.025)+(3.009), (I-339)+(2.025)+(3.010), (I-339)+(2.025)+(3.011), (I-339)+(2.025)+(3.012), (I-339)+(2.025)+(3.013), (I-339)+(2.025)+(3.014), (I-339)+(2.025)+(3.015), (I-339)+(2.025)+(3.016), (I-339)+(2.025)+(3.017), (I-339)+(2.025)+(3.018), (I-339)+(2.025)+(3.019), (I-339)+(2.025)+(3.020), (I-339)+(2.025)+(3.021), (I-339)+(2.025)+(3.022), (I-339)+(2.025)+(3.023), (I-339)+(2.025)+(3.024), (I-339)+(2.025)+(3.025), (I-339)+(2.025)+(3.026), (I-339)+(2.025)+(3.027), (I-339)+(2.025)+(3.028), (I-339)+(2.025)+(3.029), (I-339)+(2.025)+(3.030), (I-339)+(2.025)+(3.031), (I-339)+(2.025)+(5.001), (I-339)+(2.025)+(5.002), (I-339)+(2.025)+(5.003), (I-339)+(2.025)+(5.004), (I-339)+(2.025)+(5.005), (I-339)+(2.025)+(5.006), (I-339)+(2.025)+(5.007), (I-339)+(2.025)+(5.008), (I-339)+(2.025)+(5.009), (I-339)+(2.025)+(5.010), (I-339)+(2.025)+(5.011), (I-339)+(2.025)+(5.012), (I-339)+(2.025)+(5.013), (I-339)+(2.025)+(5.014), (I-339)+(2.025)+(5.015), (I-339)+(2.025)+(5.016), (I-339)+(2.025)+(5.017), (I-339)+(2.025)+(5.018), (I-339)+(2.025)+(5.019), (I-339)+(2.025)+(5.020), (I-339)+(2.025)+(5.021), (I-339)+(2.025)+(5.022), (I-339)+(2.025)+(5.023), (I-339)+(2.025)+(6.001), (I-339)+(2.025)+(6.002), (I-339)+(2.025)+(6.003), (I-339)+(2.025)+(6.004), (I-339)+(2.025)+(7.001), (I-339)+(2.025)+(7.002), (I-339)+(2.025)+(7.003), (I-339)+(2.025)+(7.004), (I-339)+(2.025)+(7.005), (I-339)+(2.025)+(7.006), (I-339)+(2.025)+(9.001), (I-339)+(2.025)+(9.002), (I-339)+(2.025)+(9.003), (I-339)+(2.025)+(9.004), (I-339)+(2.025)+(9.005), (I-339)+(2.025)+(9.006), (I-339)+(2.025)+(9.007), (I-339)+(2.025)+(9.008), (I-339)+(2.025)+(9.009), (I-339)+(2.025)+(14.001), (I-339)+(2.025)+(14.002), (I-339)+(2.025)+(15.008), (I-339)+(2.025)+(15.011), (I-339)+(2.025)+(15.012), (I-339)+(2.025)+(15.016), (I-339)+(2.025)+(15.025), (I-339)+(2.025)+(15.027), (I-339)+(2.025)+(15.047), (I-339)+(2.025)+(15.063), (I-339)+(2.025)+(15.064), (I-339)+(2.025)+(16.001), (I-339)+(2.025)+(16.002), (I-339)+(2.025)+(16.003), (I-339)+(2.025)+(16.004), (I-339)+(2.025)+(16.005), (I-339)+(2.025)+(16.006), (I-339)+(2.025)+(16.007), (I-339)+(2.025)+(16.008), (I-339)+(2.025)+(17.001), (I-339)+(2.025)+(17.002), (I-339)+(2.025)+(17.003), (I-339)+(2.025)+(17.004), (I-339)+(2.025)+(17.005), (I-339)+(2.025)+(17.006), (I-339)+(2.025)+(17.007), (I-339)+(2.025)+(17.008), (I-339)+(2.025)+(17.009), (I-339)+(2.025)+(17.010), (I-339)+(2.025)+(17.011), (I-339)+(2.025)+(17.012), (I-339)+(2.025)+(18.001), (I-339)+(2.026)+(3.001), (I-339)+(2.026)+(3.002), (I-339)+(2.026)+(3.003), (I-339)+(2.026)+(3.004), (I-339)+(2.026)+(3.005), (I-339)+(2.026)+(3.006), (I-339)+(2.026)+(3.007), (I-339)+(2.026)+(3.008), (I-339)+(2.026)+(3.009), (I-339)+(2.026)+(3.010), (I-339)+(2.026)+(3.011), (I-339)+(2.026)+(3.012), (I-339)+(2.026)+(3.013), (I-339)+(2.026)+(3.014), (I-339)+(2.026)+(3.015), (I-339)+(2.026)+(3.016), (I-339)+(2.026)+(3.017), (I-339)+(2.026)+(3.018), (I-339)+(2.026)+(3.019), (I-339)+(2.026)+(3.020), (I-339)+(2.026)+(3.021), (I-339)+(2.026)+(3.022), (I-339)+(2.026)+(3.023), (I-339)+(2.026)+(3.024), (I-339)+(2.026)+(3.025), (I-339)+(2.026)+(3.026), (I-339)+(2.026)+(3.027), (I-339)+(2.026)+(3.028), (I-339)+(2.026)+(3.029), (I-339)+(2.026)+(3.030), (I-339)+(2.026)+(3.031), (I-339)+(2.026)+(5.001), (I-339)+(2.026)+(5.002), (I-339)+(2.026)+(5.003), (I-339)+(2.026)+(5.004), (I-339)+(2.026)+(5.005), (I-339)+(2.026)+(5.006), (I-339)+(2.026)+(5.007), (I-339)+(2.026)+(5.008), (I-339)+(2.026)+(5.009), (I-339)+(2.026)+(5.010), (I-339)+(2.026)+(5.011), (I-339)+(2.026)+(5.012), (I-339)+(2.026)+(5.013), (I-339)+(2.026)+(5.014), (I-339)+(2.026)+(5.015), (I-339)+(2.026)+(5.016), (I-339)+(2.026)+(5.017), (I-339)+(2.026)+(5.018), (I-339)+(2.026)+(5.019), (I-339)+(2.026)+(5.020), (I-339)+(2.026)+(5.021), (I-339)+(2.026)+(5.022), (I-339)+(2.026)+(5.023), (I-339)+(2.026)+(6.001), (I-339)+(2.026)+(6.002), (I-339)+(2.026)+(6.003), (I-339)+(2.026)+(6.004), (I-339)+(2.026)+(7.001), (I-339)+(2.026)+(7.002), (I-339)+(2.026)+(7.003), (I-339)+(2.026)+(7.004), (I-339)+(2.026)+(7.005), (I-339)+(2.026)+(7.006), (I-339)+(2.026)+(9.001), (I-339)+(2.026)+(9.002), (I-339)+(2.026)+(9.003), (I-339)+(2.026)+(9.004), (I-339)+(2.026)+(9.005), (I-339)+(2.026)+(9.006), (I-339)+(2.026)+(9.007), (I-339)+(2.026)+(9.008), (I-339)+(2.026)+(9.009), (I-339)+(2.026)+(14.001), (I-339)+(2.026)+(14.002), (I-339)+(2.026)+(15.008), (I-339)+(2.026)+(15.011), (I-339)+(2.026)+(15.012), (I-339)+(2.026)+(15.016), (I-339)+(2.026)+(15.025), (I-339)+(2.026)+(15.027), (I-339)+(2.026)+(15.047), (I-339)+(2.026)+(15.063), (I-339)+(2.026)+(15.064), (I-339)+(2.026)+(16.001), (I-339)+(2.026)+(16.002), (I-339)+(2.026)+(16.003), (I-339)+(2.026)+(16.004), (I-339)+(2.026)+(16.005), (I-339)+(2.026)+(16.006), (I-339)+(2.026)+(16.007), (I-339)+(2.026)+(16.008), (I-339)+(2.026)+(17.001), (I-339)+(2.026)+(17.002), (I-339)+(2.026)+(17.003), (I-339)+(2.026)+(17.004), (I-339)+(2.026)+(17.005), (I-339)+(2.026)+(17.006), (I-339)+(2.026)+(17.007), (I-339)+(2.026)+(17.008), (I-339)+(2.026)+(17.009), (I-339)+(2.026)+(17.010), (I-339)+(2.026)+(17.011), (I-339)+(2.026)+(17.012), (I-339)+(2.026)+(18.001), (I-339)+(2.027)+(3.001), (I-339)+(2.027)+(3.002), (I-339)+(2.027)+(3.003), (I-339)+(2.027)+(3.004), (I-339)+(2.027)+(3.005), (I-339)+(2.027)+(3.006), (I-339)+(2.027)+(3.007), (I-339)+(2.027)+(3.008), (I-339)+(2.027)+(3.009), (I-339)+(2.027)+(3.010), (I-339)+(2.027)+(3.011), (I-339)+(2.027)+(3.012), (I-339)+(2.027)+(3.013), (I-339)+(2.027)+(3.014), (I-339)+(2.027)+(3.015), (I-339)+(2.027)+(3.016), (I-339)+(2.027)+(3.017), (I-339)+(2.027)+(3.018), (I-339)+(2.027)+(3.019), (I-339)+(2.027)+(3.020), (I-339)+(2.027)+(3.021), (I-339)+(2.027)+(3.022), (I-339)+(2.027)+(3.023), (I-339)+(2.027)+(3.024), (I-339)+(2.027)+(3.025), (I-339)+(2.027)+(3.026), (I-339)+(2.027)+(3.027), (I-339)+(2.027)+(3.028), (I-339)+(2.027)+(3.029), (I-339)+(2.027)+(3.030), (I-339)+(2.027)+(3.031), (I-339)+(2.027)+(5.001), (I-339)+(2.027)+(5.002), (I-339)+(2.027)+(5.003), (I-339)+(2.027)+(5.004), (I-339)+(2.027)+(5.005), (I-339)+(2.027)+(5.006), (I-339)+(2.027)+(5.007), (I-339)+(2.027)+(5.008), (I-339)+(2.027)+(5.009), (I-339)+(2.027)+(5.010), (I-339)+(2.027)+(5.011), (I-339)+(2.027)+(5.012), (I-339)+(2.027)+(5.013), (I-339)+(2.027)+(5.014), (I-339)+(2.027)+(5.015), (I-339)+(2.027)+(5.016), (I-339)+(2.027)+(5.017), (I-339)+(2.027)+(5.018), (I-339)+(2.027)+(5.019), (I-339)+(2.027)+(5.020), (I-339)+(2.027)+(5.021), (I-339)+(2.027)+(5.022), (I-339)+(2.027)+(5.023), (I-339)+(2.027)+(6.001), (I-339)+(2.027)+(6.002), (I-339)+(2.027)+(6.003), (I-339)+(2.027)+(6.004), (I-339)+(2.027)+(7.001), (I-339)+(2.027)+(7.002), (I-339)+(2.027)+(7.003), (I-339)+(2.027)+(7.004), (I-339)+(2.027)+(7.005), (I-339)+(2.027)+(7.006), (I-339)+(2.027)+(9.001), (I-339)+(2.027)+(9.002), (I-339)+(2.027)+(9.003), (I-339)+(2.027)+(9.004), (I-339)+(2.027)+(9.005), (I-339)+(2.027)+(9.006), (I-339)+(2.027)+(9.007), (I-339)+(2.027)+(9.008), (I-339)+(2.027)+(9.009), (I-339)+(2.027)+(14.001), (I-339)+(2.027)+(14.002), (I-339)+(2.027)+(15.008), (I-339)+(2.027)+(15.011), (I-339)+(2.027)+(15.012), (I-339)+(2.027)+(15.016), (I-339)+(2.027)+(15.025), (I-339)+(2.027)+(15.027), (I-339)+(2.027)+(15.047), (I-339)+(2.027)+(15.063), (I-339)+(2.027)+(15.064), (I-339)+(2.027)+(16.001), (I-339)+(2.027)+(16.002), (I-339)+(2.027)+(16.003), (I-339)+(2.027)+(16.004), (I-339)+(2.027)+(16.005), (I-339)+(2.027)+(16.006), (I-339)+(2.027)+(16.007), (I-339)+(2.027)+(16.008), (I-339)+(2.027)+(17.001), (I-339)+(2.027)+(17.002), (I-339)+(2.027)+(17.003), (I-339)+(2.027)+(17.004), (I-339)+(2.027)+(17.005), (I-339)+(2.027)+(17.006), (I-339)+(2.027)+(17.007), (I-339)+(2.027)+(17.008), (I-339)+(2.027)+(17.009), (I-339)+(2.027)+(17.010), (I-339)+(2.027)+(17.011), (I-339)+(2.027)+(17.012), (I-339)+(2.027)+(18.001), (I-339)+(2.028)+(3.001), (I-339)+(2.028)+(3.002), (I-339)+(2.028)+(3.003), (I-339)+(2.028)+(3.004), (I-339)+(2.028)+(3.005), (I-339)+(2.028)+(3.006), (I-339)+(2.028)+(3.007), (I-339)+(2.028)+(3.008), (I-339)+(2.028)+(3.009), (I-339)+(2.028)+(3.010), (I-339)+(2.028)+(3.011), (I-339)+(2.028)+(3.012), (I-339)+(2.028)+(3.013), (I-339)+(2.028)+(3.014), (I-339)+(2.028)+(3.015), (I-339)+(2.028)+(3.016), (I-339)+(2.028)+(3.017), (I-339)+(2.028)+(3.018), (I-339)+(2.028)+(3.019), (I-339)+(2.028)+(3.020), (I-339)+(2.028)+(3.021), (I-339)+(2.028)+(3.022), (I-339)+(2.028)+(3.023), (I-339)+(2.028)+(3.024), (I-339)+(2.028)+(3.025), (I-339)+(2.028)+(3.026), (I-339)+(2.028)+(3.027), (I-339)+(2.028)+(3.028), (I-339)+(2.028)+(3.029), (I-339)+(2.028)+(3.030), (I-339)+(2.028)+(3.031), (I-339)+(2.028)+(5.001), (I-339)+(2.028)+(5.002), (I-339)+(2.028)+(5.003), (I-339)+(2.028)+(5.004), (I-339)+(2.028)+(5.005), (I-339)+(2.028)+(5.006), (I-339)+(2.028)+(5.007), (I-339)+(2.028)+(5.008), (I-339)+(2.028)+(5.009), (I-339)+(2.028)+(5.010), (I-339)+(2.028)+(5.011), (I-339)+(2.028)+(5.012), (I-339)+(2.028)+(5.013), (I-339)+(2.028)+(5.014), (I-339)+(2.028)+(5.015), (I-339)+(2.028)+(5.016), (I-339)+(2.028)+(5.017), (I-339)+(2.028)+(5.018), (I-339)+(2.028)+(5.019), (I-339)+(2.028)+(5.020), (I-339)+(2.028)+(5.021), (I-339)+(2.028)+(5.022), (I-339)+(2.028)+(5.023), (I-339)+(2.028)+(6.001), (I-339)+(2.028)+(6.002), (I-339)+(2.028)+(6.003), (I-339)+(2.028)+(6.004), (I-339)+(2.028)+(7.001), (I-339)+(2.028)+(7.002), (I-339)+(2.028)+(7.003), (I-339)+(2.028)+(7.004), (I-339)+(2.028)+(7.005), (I-339)+(2.028)+(7.006), (I-339)+(2.028)+(9.001), (I-339)+(2.028)+(9.002), (I-339)+(2.028)+(9.003), (I-339)+(2.028)+(9.004), (I-339)+(2.028)+(9.005), (I-339)+(2.028)+(9.006), (I-339)+(2.028)+(9.007), (I-339)+(2.028)+(9.008), (I-339)+(2.028)+(9.009), (I-339)+(2.028)+(14.001), (I-339)+(2.028)+(14.002), (I-339)+(2.028)+(15.008), (I-339)+(2.028)+(15.011), (I-339)+(2.028)+(15.012), (I-339)+(2.028)+(15.016), (I-339)+(2.028)+(15.025), (I-339)+(2.028)+(15.027), (I-339)+(2.028)+(15.047), (I-339)+(2.028)+(15.063), (I-339)+(2.028)+(15.064), (I-339)+(2.028)+(16.001), (I-339)+(2.028)+(16.002), (I-339)+(2.028)+(16.003), (I-339)+(2.028)+(16.004), (I-339)+(2.028)+(16.005), (I-339)+(2.028)+(16.006), (I-339)+(2.028)+(16.007), (I-339)+(2.028)+(16.008), (I-339)+(2.028)+(17.001), (I-339)+(2.028)+(17.002), (I-339)+(2.028)+(17.003), (I-339)+(2.028)+(17.004), (I-339)+(2.028)+(17.005), (I-339)+(2.028)+(17.006), (I-339)+(2.028)+(17.007), (I-339)+(2.028)+(17.008), (I-339)+(2.028)+(17.009), (I-339)+(2.028)+(17.010), (I-339)+(2.028)+(17.011), (I-339)+(2.028)+(17.012), (I-339)+(2.028)+(18.001), (I-339)+(2.029)+(3.001), (I-339)+(2.029)+(3.002), (I-339)+(2.029)+(3.003), (I-339)+(2.029)+(3.004), (I-339)+(2.029)+(3.005), (I-339)+(2.029)+(3.006), (I-339)+(2.029)+(3.007), (I-339)+(2.029)+(3.008), (I-339)+(2.029)+(3.009), (I-339)+(2.029)+(3.010), (I-339)+(2.029)+(3.011), (I-339)+(2.029)+(3.012), (I-339)+(2.029)+(3.013), (I-339)+(2.029)+(3.014), (I-339)+(2.029)+(3.015), (I-339)+(2.029)+(3.016), (I-339)+(2.029)+(3.017), (I-339)+(2.029)+(3.018), (I-339)+(2.029)+(3.019), (I-339)+(2.029)+(3.020), (I-339)+(2.029)+(3.021), (I-339)+(2.029)+(3.022), (I-339)+(2.029)+(3.023), (I-339)+(2.029)+(3.024), (I-339)+(2.029)+(3.025), (I-339)+(2.029)+(3.026), (I-339)+(2.029)+(3.027), (I-339)+(2.029)+(3.028), (I-339)+(2.029)+(3.029), (I-339)+(2.029)+(3.030), (I-339)+(2.029)+(3.031), (I-339)+(2.029)+(5.001), (I-339)+(2.029)+(5.002), (I-339)+(2.029)+(5.003), (I-339)+(2.029)+(5.004), (I-339)+(2.029)+(5.005), (I-339)+(2.029)+(5.006), (I-339)+(2.029)+(5.007), (I-339)+(2.029)+(5.008), (I-339)+(2.029)+(5.009), (I-339)+(2.029)+(5.010), (I-339)+(2.029)+(5.011), (I-339)+(2.029)+(5.012), (I-339)+(2.029)+(5.013), (I-339)+(2.029)+(5.014), (I-339)+(2.029)+(5.015), (I-339)+(2.029)+(5.016), (I-339)+(2.029)+(5.017), (I-339)+(2.029)+(5.018), (I-339)+(2.029)+(5.019), (I-339)+(2.029)+(5.020), (I-339)+(2.029)+(5.021), (I-339)+(2.029)+(5.022), (I-339)+(2.029)+(5.023), (I-339)+(2.029)+(6.001), (I-339)+(2.029)+(6.002), (I-339)+(2.029)+(6.003), (I-339)+(2.029)+(6.004), (I-339)+(2.029)+(7.001), (I-339)+(2.029)+(7.002), (I-339)+(2.029)+(7.003), (I-339)+(2.029)+(7.004), (I-339)+(2.029)+(7.005), (I-339)+(2.029)+(7.006), (I-339)+(2.029)+(9.001), (I-339)+(2.029)+(9.002), (I-339)+(2.029)+(9.003), (I-339)+(2.029)+(9.004), (I-339)+(2.029)+(9.005), (I-339)+(2.029)+(9.006), (I-339)+(2.029)+(9.007), (I-339)+(2.029)+(9.008), (I-339)+(2.029)+(9.009), (I-339)+(2.029)+(14.001), (I-339)+(2.029)+(14.002), (I-339)+(2.029)+(15.008), (I-339)+(2.029)+(15.011), (I-339)+(2.029)+(15.012), (I-339)+(2.029)+(15.016), (I-339)+(2.029)+(15.025), (I-339)+(2.029)+(15.027), (I-339)+(2.029)+(15.047), (I-339)+(2.029)+(15.063), (I-339)+(2.029)+(15.064), (I-339)+(2.029)+(16.001), (I-339)+(2.029)+(16.002), (I-339)+(2.029)+(16.003), (I-339)+(2.029)+(16.004), (I-339)+(2.029)+(16.005), (I-339)+(2.029)+(16.006), (I-339)+(2.029)+(16.007), (I-339)+(2.029)+(16.008), (I-339)+(2.029)+(17.001), (I-339)+(2.029)+(17.002), (I-339)+(2.029)+(17.003), (I-339)+(2.029)+(17.004), (I-339)+(2.029)+(17.005), (I-339)+(2.029)+(17.006), (I-339)+(2.029)+(17.007), (I-339)+(2.029)+(17.008), (I-339)+(2.029)+(17.009), (I-339)+(2.029)+(17.010), (I-339)+(2.029)+(17.011), (I-339)+(2.029)+(17.012), (I-339)+(2.029)+(18.001), (I-339)+(2.030)+(3.001), (I-339)+(2.030)+(3.002), (I-339)+(2.030)+(3.003), (I-339)+(2.030)+(3.004), (I-339)+(2.030)+(3.005), (I-339)+(2.030)+(3.006), (I-339)+(2.030)+(3.007), (I-339)+(2.030)+(3.008), (I-339)+(2.030)+(3.009), (I-339)+(2.030)+(3.010), (I-339)+(2.030)+(3.011), (I-339)+(2.030)+(3.012), (I-339)+(2.030)+(3.013), (I-339)+(2.030)+(3.014), (I-339)+(2.030)+(3.015), (I-339)+(2.030)+(3.016), (I-339)+(2.030)+(3.017), (I-339)+(2.030)+(3.018), (I-339)+(2.030)+(3.019), (I-339)+(2.030)+(3.020), (I-339)+(2.030)+(3.021), (I-339)+(2.030)+(3.022), (I-339)+(2.030)+(3.023), (I-339)+(2.030)+(3.024), (I-339)+(2.030)+(3.025), (I-339)+(2.030)+(3.026), (I-339)+(2.030)+(3.027), (I-339)+(2.030)+(3.028), (I-339)+(2.030)+(3.029), (I-339)+(2.030)+(3.030), (I-339)+(2.030)+(3.031), (I-339)+(2.030)+(5.001), (I-339)+(2.030)+(5.002), (I-339)+(2.030)+(5.003), (I-339)+(2.030)+(5.004), (I-339)+(2.030)+(5.005), (I-339)+(2.030)+(5.006), (I-339)+(2.030)+(5.007), (I-339)+(2.030)+(5.008), (I-339)+(2.030)+(5.009), (I-339)+(2.030)+(5.010), (I-339)+(2.030)+(5.011), (I-339)+(2.030)+(5.012), (I-339)+(2.030)+(5.013), (I-339)+(2.030)+(5.014), (I-339)+(2.030)+(5.015), (I-339)+(2.030)+(5.016), (I-339)+(2.030)+(5.017), (I-339)+(2.030)+(5.018), (I-339)+(2.030)+(5.019), (I-339)+(2.030)+(5.020), (I-339)+(2.030)+(5.021), (I-339)+(2.030)+(5.022), (I-339)+(2.030)+(5.023), (I-339)+(2.030)+(6.001), (I-339)+(2.030)+(6.002), (I-339)+(2.030)+(6.003), (I-339)+(2.030)+(6.004), (I-339)+(2.030)+(7.001), (I-339)+(2.030)+(7.002), (I-339)+(2.030)+(7.003), (I-339)+(2.030)+(7.004), (I-339)+(2.030)+(7.005), (I-339)+(2.030)+(7.006), (I-339)+(2.030)+(9.001), (I-339)+(2.030)+(9.002), (I-339)+(2.030)+(9.003), (I-339)+(2.030)+(9.004), (I-339)+(2.030)+(9.005), (I-339)+(2.030)+(9.006), (I-339)+(2.030)+(9.007), (I-339)+(2.030)+(9.008), (I-339)+(2.030)+(9.009), (I-339)+(2.030)+(14.001), (I-339)+(2.030)+(14.002), (I-339)+(2.030)+(15.008), (I-339)+(2.030)+(15.011), (I-339)+(2.030)+(15.012), (I-339)+(2.030)+(15.016), (I-339)+(2.030)+(15.025), (I-339)+(2.030)+(15.027), (I-339)+(2.030)+(15.047), (I-339)+(2.030)+(15.063), (I-339)+(2.030)+(15.064), (I-339)+(2.030)+(16.001), (I-339)+(2.030)+(16.002), (I-339)+(2.030)+(16.003), (I-339)+(2.030)+(16.004), (I-339)+(2.030)+(16.005), (I-339)+(2.030)+(16.006), (I-339)+(2.030)+(16.007), (I-339)+(2.030)+(16.008), (I-339)+(2.030)+(17.001), (I-339)+(2.030)+(17.002), (I-339)+(2.030)+(17.003), (I-339)+(2.030)+(17.004), (I-339)+(2.030)+(17.005), (I-339)+(2.030)+(17.006), (I-339)+(2.030)+(17.007), (I-339)+(2.030)+(17.008), (I-339)+(2.030)+(17.009), (I-339)+(2.030)+(17.010), (I-339)+(2.030)+(17.011), (I-339)+(2.030)+(17.012), (I-339)+(2.030)+(18.001), (I-339)+(2.031)+(3.001), (I-339)+(2.031)+(3.002), (I-339)+(2.031)+(3.003), (I-339)+(2.031)+(3.004), (I-339)+(2.031)+(3.005), (I-339)+(2.031)+(3.006), (I-339)+(2.031)+(3.007), (I-339)+(2.031)+(3.008), (I-339)+(2.031)+(3.009), (I-339)+(2.031)+(3.010), (I-339)+(2.031)+(3.011), (I-339)+(2.031)+(3.012), (I-339)+(2.031)+(3.013), (I-339)+(2.031)+(3.014), (I-339)+(2.031)+(3.015), (I-339)+(2.031)+(3.016), (I-339)+(2.031)+(3.017), (I-339)+(2.031)+(3.018), (I-339)+(2.031)+(3.019), (I-339)+(2.031)+(3.020), (I-339)+(2.031)+(3.021), (I-339)+(2.031)+(3.022), (I-339)+(2.031)+(3.023), (I-339)+(2.031)+(3.024), (I-339)+(2.031)+(3.025), (I-339)+(2.031)+(3.026), (I-339)+(2.031)+(3.027), (I-339)+(2.031)+(3.028), (I-339)+(2.031)+(3.029), (I-339)+(2.031)+(3.030), (I-339)+(2.031)+(3.031), (I-339)+(2.031)+(5.001), (I-339)+(2.031)+(5.002), (I-339)+(2.031)+(5.003), (I-339)+(2.031)+(5.004), (I-339)+(2.031)+(5.005), (I-339)+(2.031)+(5.006), (I-339)+(2.031)+(5.007), (I-339)+(2.031)+(5.008), (I-339)+(2.031)+(5.009), (I-339)+(2.031)+(5.010), (I-339)+(2.031)+(5.011), (I-339)+(2.031)+(5.012), (I-339)+(2.031)+(5.013), (I-339)+(2.031)+(5.014), (I-339)+(2.031)+(5.015), (I-339)+(2.031)+(5.016), (I-339)+(2.031)+(5.017), (I-339)+(2.031)+(5.018), (I-339)+(2.031)+(5.019), (I-339)+(2.031)+(5.020), (I-339)+(2.031)+(5.021), (I-339)+(2.031)+(5.022), (I-339)+(2.031)+(5.023), (I-339)+(2.031)+(6.001), (I-339)+(2.031)+(6.002), (I-339)+(2.031)+(6.003), (I-339)+(2.031)+(6.004), (I-339)+(2.031)+(7.001), (I-339)+(2.031)+(7.002), (I-339)+(2.031)+(7.003), (I-339)+(2.031)+(7.004), (I-339)+(2.031)+(7.005), (I-339)+(2.031)+(7.006), (I-339)+(2.031)+(9.001), (I-339)+(2.031)+(9.002), (I-339)+(2.031)+(9.003), (I-339)+(2.031)+(9.004), (I-339)+(2.031)+(9.005), (I-339)+(2.031)+(9.006), (I-339)+(2.031)+(9.007), (I-339)+(2.031)+(9.008), (I-339)+(2.031)+(9.009), (I-339)+(2.031)+(14.001), (I-339)+(2.031)+(14.002), (I-339)+(2.031)+(15.008), (I-339)+(2.031)+(15.011), (I-339)+(2.031)+(15.012), (I-339)+(2.031)+(15.016), (I-339)+(2.031)+(15.025), (I-339)+(2.031)+(15.027), (I-339)+(2.031)+(15.047), (I-339)+(2.031)+(15.063), (I-339)+(2.031)+(15.064), (I-339)+(2.031)+(16.001), (I-339)+(2.031)+(16.002), (I-339)+(2.031)+(16.003), (I-339)+(2.031)+(16.004), (I-339)+(2.031)+(16.005), (I-339)+(2.031)+(16.006), (I-339)+(2.031)+(16.007), (I-339)+(2.031)+(16.008), (I-339)+(2.031)+(17.001), (I-339)+(2.031)+(17.002), (I-339)+(2.031)+(17.003), (I-339)+(2.031)+(17.004), (I-339)+(2.031)+(17.005), (I-339)+(2.031)+(17.006), (I-339)+(2.031)+(17.007), (I-339)+(2.031)+(17.008), (I-339)+(2.031)+(17.009), (I-339)+(2.031)+(17.010), (I-339)+(2.031)+(17.011), (I-339)+(2.031)+(17.012), (I-339)+(2.031)+(18.001), (I-339)+(2.032)+(3.001), (I-339)+(2.032)+(3.002), (I-339)+(2.032)+(3.003), (I-339)+(2.032)+(3.004), (I-339)+(2.032)+(3.005), (I-339)+(2.032)+(3.006), (I-339)+(2.032)+(3.007), (I-339)+(2.032)+(3.008), (I-339)+(2.032)+(3.009), (I-339)+(2.032)+(3.010), (I-339)+(2.032)+(3.011), (I-339)+(2.032)+(3.012), (I-339)+(2.032)+(3.013), (I-339)+(2.032)+(3.014), (I-339)+(2.032)+(3.015), (I-339)+(2.032)+(3.016), (I-339)+(2.032)+(3.017), (I-339)+(2.032)+(3.018), (I-339)+(2.032)+(3.019), (I-339)+(2.032)+(3.020), (I-339)+(2.032)+(3.021), (I-339)+(2.032)+(3.022), (I-339)+(2.032)+(3.023), (I-339)+(2.032)+(3.024), (I-339)+(2.032)+(3.025), (I-339)+(2.032)+(3.026), (I-339)+(2.032)+(3.027), (I-339)+(2.032)+(3.028), (I-339)+(2.032)+(3.029), (I-339)+(2.032)+(3.030), (I-339)+(2.032)+(3.031), (I-339)+(2.032)+(5.001), (I-339)+(2.032)+(5.002), (I-339)+(2.032)+(5.003), (I-339)+(2.032)+(5.004), (I-339)+(2.032)+(5.005), (I-339)+(2.032)+(5.006), (I-339)+(2.032)+(5.007), (I-339)+(2.032)+(5.008), (I-339)+(2.032)+(5.009), (I-339)+(2.032)+(5.010), (I-339)+(2.032)+(5.011), (I-339)+(2.032)+(5.012), (I-339)+(2.032)+(5.013), (I-339)+(2.032)+(5.014), (I-339)+(2.032)+(5.015), (I-339)+(2.032)+(5.016), (I-339)+(2.032)+(5.017), (I-339)+(2.032)+(5.018), (I-339)+(2.032)+(5.019), (I-339)+(2.032)+(5.020), (I-339)+(2.032)+(5.021), (I-339)+(2.032)+(5.022), (I-339)+(2.032)+(5.023), (I-339)+(2.032)+(6.001), (I-339)+(2.032)+(6.002), (I-339)+(2.032)+(6.003), (I-339)+(2.032)+(6.004), (I-339)+(2.032)+(7.001), (I-339)+(2.032)+(7.002), (I-339)+(2.032)+(7.003), (I-339)+(2.032)+(7.004), (I-339)+(2.032)+(7.005), (I-339)+(2.032)+(7.006), (I-339)+(2.032)+(9.001), (I-339)+(2.032)+(9.002), (I-339)+(2.032)+(9.003), (I-339)+(2.032)+(9.004), (I-339)+(2.032)+(9.005), (I-339)+(2.032)+(9.006), (I-339)+(2.032)+(9.007), (I-339)+(2.032)+(9.008), (I-339)+(2.032)+(9.009), (I-339)+(2.032)+(14.001), (I-339)+(2.032)+(14.002), (I-339)+(2.032)+(15.008), (I-339)+(2.032)+(15.011), (I-339)+(2.032)+(15.012), (I-339)+(2.032)+(15.016), (I-339)+(2.032)+(15.025), (I-339)+(2.032)+(15.027), (I-339)+(2.032)+(15.047), (I-339)+(2.032)+(15.063), (I-339)+(2.032)+(15.064), (I-339)+(2.032)+(16.001), (I-339)+(2.032)+(16.002), (I-339)+(2.032)+(16.003), (I-339)+(2.032)+(16.004), (I-339)+(2.032)+(16.005), (I-339)+(2.032)+(16.006), (I-339)+(2.032)+(16.007), (I-339)+(2.032)+(16.008), (I-339)+(2.032)+(17.001), (I-339)+(2.032)+(17.002), (I-339)+(2.032)+(17.003), (I-339)+(2.032)+(17.004), (I-339)+(2.032)+(17.005), (I-339)+(2.032)+(17.006), (I-339)+(2.032)+(17.007), (I-339)+(2.032)+(17.008), (I-339)+(2.032)+(17.009), (I-339)+(2.032)+(17.010), (I-339)+(2.032)+(17.011), (I-339)+(2.032)+(17.012), (I-339)+(2.032)+(18.001), (I-339)+(2.033)+(3.001), (I-339)+(2.033)+(3.002), (I-339)+(2.033)+(3.003), (I-339)+(2.033)+(3.004), (I-339)+(2.033)+(3.005), (I-339)+(2.033)+(3.006), (I-339)+(2.033)+(3.007), (I-339)+(2.033)+(3.008), (I-339)+(2.033)+(3.009), (I-339)+(2.033)+(3.010), (I-339)+(2.033)+(3.011), (I-339)+(2.033)+(3.012), (I-339)+(2.033)+(3.013), (I-339)+(2.033)+(3.014), (I-339)+(2.033)+(3.015), (I-339)+(2.033)+(3.016), (I-339)+(2.033)+(3.017), (I-339)+(2.033)+(3.018), (I-339)+(2.033)+(3.019), (I-339)+(2.033)+(3.020), (I-339)+(2.033)+(3.021), (I-339)+(2.033)+(3.022), (I-339)+(2.033)+(3.023), (I-339)+(2.033)+(3.024), (I-339)+(2.033)+(3.025), (I-339)+(2.033)+(3.026), (I-339)+(2.033)+(3.027), (I-339)+(2.033)+(3.028), (I-339)+(2.033)+(3.029), (I-339)+(2.033)+(3.030), (I-339)+(2.033)+(3.031), (I-339)+(2.033)+(5.001), (I-339)+(2.033)+(5.002), (I-339)+(2.033)+(5.003), (I-339)+(2.033)+(5.004), (I-339)+(2.033)+(5.005), (I-339)+(2.033)+(5.006), (I-339)+(2.033)+(5.007), (I-339)+(2.033)+(5.008), (I-339)+(2.033)+(5.009), (I-339)+(2.033)+(5.010), (I-339)+(2.033)+(5.011), (I-339)+(2.033)+(5.012), (I-339)+(2.033)+(5.013), (I-339)+(2.033)+(5.014), (I-339)+(2.033)+(5.015), (I-339)+(2.033)+(5.016), (I-339)+(2.033)+(5.017), (I-339)+(2.033)+(5.018), (I-339)+(2.033)+(5.019), (I-339)+(2.033)+(5.020), (I-339)+(2.033)+(5.021), (I-339)+(2.033)+(5.022), (I-339)+(2.033)+(5.023), (I-339)+(2.033)+(6.001), (I-339)+(2.033)+(6.002), (I-339)+(2.033)+(6.003), (I-339)+(2.033)+(6.004), (I-339)+(2.033)+(7.001), (I-339)+(2.033)+(7.002), (I-339)+(2.033)+(7.003), (I-339)+(2.033)+(7.004), (I-339)+(2.033)+(7.005), (I-339)+(2.033)+(7.006), (I-339)+(2.033)+(9.001), (I-339)+(2.033)+(9.002), (I-339)+(2.033)+(9.003), (I-339)+(2.033)+(9.004), (I-339)+(2.033)+(9.005), (I-339)+(2.033)+(9.006), (I-339)+(2.033)+(9.007), (I-339)+(2.033)+(9.008), (I-339)+(2.033)+(9.009), (I-339)+(2.033)+(14.001), (I-339)+(2.033)+(14.002), (I-339)+(2.033)+(15.008), (I-339)+(2.033)+(15.011), (I-339)+(2.033)+(15.012), (I-339)+(2.033)+(15.016), (I-339)+(2.033)+(15.025), (I-339)+(2.033)+(15.027), (I-339)+(2.033)+(15.047), (I-339)+(2.033)+(15.063), (I-339)+(2.033)+(15.064), (I-339)+(2.033)+(16.001), (I-339)+(2.033)+(16.002), (I-339)+(2.033)+(16.003), (I-339)+(2.033)+(16.004), (I-339)+(2.033)+(16.005), (I-339)+(2.033)+(16.006), (I-339)+(2.033)+(16.007), (I-339)+(2.033)+(16.008), (I-339)+(2.033)+(17.001), (I-339)+(2.033)+(17.002), (I-339)+(2.033)+(17.003), (I-339)+(2.033)+(17.004), (I-339)+(2.033)+(17.005), (I-339)+(2.033)+(17.006), (I-339)+(2.033)+(17.007), (I-339)+(2.033)+(17.008), (I-339)+(2.033)+(17.009), (I-339)+(2.033)+(17.010), (I-339)+(2.033)+(17.011), (I-339)+(2.033)+(17.012), (I-339)+(2.033)+(18.001), (I-339)+(2.034)+(3.001), (I-339)+(2.034)+(3.002), (I-339)+(2.034)+(3.003), (I-339)+(2.034)+(3.004), (I-339)+(2.034)+(3.005), (I-339)+(2.034)+(3.006), (I-339)+(2.034)+(3.007), (I-339)+(2.034)+(3.008), (I-339)+(2.034)+(3.009), (I-339)+(2.034)+(3.010), (I-339)+(2.034)+(3.011), (I-339)+(2.034)+(3.012), (I-339)+(2.034)+(3.013), (I-339)+(2.034)+(3.014), (I-339)+(2.034)+(3.015), (I-339)+(2.034)+(3.016), (I-339)+(2.034)+(3.017), (I-339)+(2.034)+(3.018), (I-339)+(2.034)+(3.019), (I-339)+(2.034)+(3.020), (I-339)+(2.034)+(3.021), (I-339)+(2.034)+(3.022), (I-339)+(2.034)+(3.023), (I-339)+(2.034)+(3.024), (I-339)+(2.034)+(3.025), (I-339)+(2.034)+(3.026), (I-339)+(2.034)+(3.027), (I-339)+(2.034)+(3.028), (I-339)+(2.034)+(3.029), (I-339)+(2.034)+(3.030), (I-339)+(2.034)+(3.031), (I-339)+(2.034)+(5.001), (I-339)+(2.034)+(5.002), (I-339)+(2.034)+(5.003), (I-339)+(2.034)+(5.004), (I-339)+(2.034)+(5.005), (I-339)+(2.034)+(5.006), (I-339)+(2.034)+(5.007), (I-339)+(2.034)+(5.008), (I-339)+(2.034)+(5.009), (I-339)+(2.034)+(5.010), (I-339)+(2.034)+(5.011), (I-339)+(2.034)+(5.012), (I-339)+(2.034)+(5.013), (I-339)+(2.034)+(5.014), (I-339)+(2.034)+(5.015), (I-339)+(2.034)+(5.016), (I-339)+(2.034)+(5.017), (I-339)+(2.034)+(5.018), (I-339)+(2.034)+(5.019), (I-339)+(2.034)+(5.020), (I-339)+(2.034)+(5.021), (I-339)+(2.034)+(5.022), (I-339)+(2.034)+(5.023), (I-339)+(2.034)+(6.001), (I-339)+(2.034)+(6.002), (I-339)+(2.034)+(6.003), (I-339)+(2.034)+(6.004), (I-339)+(2.034)+(7.001), (I-339)+(2.034)+(7.002), (I-339)+(2.034)+(7.003), (I-339)+(2.034)+(7.004), (I-339)+(2.034)+(7.005), (I-339)+(2.034)+(7.006), (I-339)+(2.034)+(9.001), (I-339)+(2.034)+(9.002), (I-339)+(2.034)+(9.003), (I-339)+(2.034)+(9.004), (I-339)+(2.034)+(9.005), (I-339)+(2.034)+(9.006), (I-339)+(2.034)+(9.007), (I-339)+(2.034)+(9.008), (I-339)+(2.034)+(9.009), (I-339)+(2.034)+(14.001), (I-339)+(2.034)+(14.002), (I-339)+(2.034)+(15.008), (I-339)+(2.034)+(15.011), (I-339)+(2.034)+(15.012), (I-339)+(2.034)+(15.016), (I-339)+(2.034)+(15.025), (I-339)+(2.034)+(15.027), (I-339)+(2.034)+(15.047), (I-339)+(2.034)+(15.063), (I-339)+(2.034)+(15.064), (I-339)+(2.034)+(16.001), (I-339)+(2.034)+(16.002), (I-339)+(2.034)+(16.003), (I-339)+(2.034)+(16.004), (I-339)+(2.034)+(16.005), (I-339)+(2.034)+(16.006), (I-339)+(2.034)+(16.007), (I-339)+(2.034)+(16.008), (I-339)+(2.034)+(17.001), (I-339)+(2.034)+(17.002), (I-339)+(2.034)+(17.003), (I-339)+(2.034)+(17.004), (I-339)+(2.034)+(17.005), (I-339)+(2.034)+(17.006), (I-339)+(2.034)+(17.007), (I-339)+(2.034)+(17.008), (I-339)+(2.034)+(17.009), (I-339)+(2.034)+(17.010), (I-339)+(2.034)+(17.011), (I-339)+(2.034)+(17.012), (I-339)+(2.034)+(18.001), (I-339)+(2.035)+(3.001), (I-339)+(2.035)+(3.002), (I-339)+(2.035)+(3.003), (I-339)+(2.035)+(3.004), (I-339)+(2.035)+(3.005), (I-339)+(2.035)+(3.006), (I-339)+(2.035)+(3.007), (I-339)+(2.035)+(3.008), (I-339)+(2.035)+(3.009), (I-339)+(2.035)+(3.010), (I-339)+(2.035)+(3.011), (I-339)+(2.035)+(3.012), (I-339)+(2.035)+(3.013), (I-339)+(2.035)+(3.014), (I-339)+(2.035)+(3.015), (I-339)+(2.035)+(3.016), (I-339)+(2.035)+(3.017), (I-339)+(2.035)+(3.018), (I-339)+(2.035)+(3.019), (I-339)+(2.035)+(3.020), (I-339)+(2.035)+(3.021), (I-339)+(2.035)+(3.022), (I-339)+(2.035)+(3.023), (I-339)+(2.035)+(3.024), (I-339)+(2.035)+(3.025), (I-339)+(2.035)+(3.026), (I-339)+(2.035)+(3.027), (I-339)+(2.035)+(3.028), (I-339)+(2.035)+(3.029), (I-339)+(2.035)+(3.030), (I-339)+(2.035)+(3.031), (I-339)+(2.035)+(5.001), (I-339)+(2.035)+(5.002), (I-339)+(2.035)+(5.003), (I-339)+(2.035)+(5.004), (I-339)+(2.035)+(5.005), (I-339)+(2.035)+(5.006), (I-339)+(2.035)+(5.007), (I-339)+(2.035)+(5.008), (I-339)+(2.035)+(5.009), (I-339)+(2.035)+(5.010), (I-339)+(2.035)+(5.011), (I-339)+(2.035)+(5.012), (I-339)+(2.035)+(5.013), (I-339)+(2.035)+(5.014), (I-339)+(2.035)+(5.015), (I-339)+(2.035)+(5.016), (I-339)+(2.035)+(5.017), (I-339)+(2.035)+(5.018), (I-339)+(2.035)+(5.019), (I-339)+(2.035)+(5.020), (I-339)+(2.035)+(5.021), (I-339)+(2.035)+(5.022), (I-339)+(2.035)+(5.023), (I-339)+(2.035)+(6.001), (I-339)+(2.035)+(6.002), (I-339)+(2.035)+(6.003), (I-339)+(2.035)+(6.004), (I-339)+(2.035)+(7.001), (I-339)+(2.035)+(7.002), (I-339)+(2.035)+(7.003), (I-339)+(2.035)+(7.004), (I-339)+(2.035)+(7.005), (I-339)+(2.035)+(7.006), (I-339)+(2.035)+(9.001), (I-339)+(2.035)+(9.002), (I-339)+(2.035)+(9.003), (I-339)+(2.035)+(9.004), (I-339)+(2.035)+(9.005), (I-339)+(2.035)+(9.006), (I-339)+(2.035)+(9.007), (I-339)+(2.035)+(9.008), (I-339)+(2.035)+(9.009), (I-339)+(2.035)+(14.001), (I-339)+(2.035)+(14.002), (I-339)+(2.035)+(15.008), (I-339)+(2.035)+(15.011), (I-339)+(2.035)+(15.012), (I-339)+(2.035)+(15.016), (I-339)+(2.035)+(15.025), (I-339)+(2.035)+(15.027), (I-339)+(2.035)+(15.047), (I-339)+(2.035)+(15.063), (I-339)+(2.035)+(15.064), (I-339)+(2.035)+(16.001), (I-339)+(2.035)+(16.002), (I-339)+(2.035)+(16.003), (I-339)+(2.035)+(16.004), (I-339)+(2.035)+(16.005), (I-339)+(2.035)+(16.006), (I-339)+(2.035)+(16.007), (I-339)+(2.035)+(16.008), (I-339)+(2.035)+(17.001), (I-339)+(2.035)+(17.002), (I-339)+(2.035)+(17.003), (I-339)+(2.035)+(17.004), (I-339)+(2.035)+(17.005), (I-339)+(2.035)+(17.006), (I-339)+(2.035)+(17.007), (I-339)+(2.035)+(17.008), (I-339)+(2.035)+(17.009), (I-339)+(2.035)+(17.010), (I-339)+(2.035)+(17.011), (I-339)+(2.035)+(17.012), (I-339)+(2.035)+(18.001), (I-339)+(2.036)+(3.001), (I-339)+(2.036)+(3.002), (I-339)+(2.036)+(3.003), (I-339)+(2.036)+(3.004), (I-339)+(2.036)+(3.005), (I-339)+(2.036)+(3.006), (I-339)+(2.036)+(3.007), (I-339)+(2.036)+(3.008), (I-339)+(2.036)+(3.009), (I-339)+(2.036)+(3.010), (I-339)+(2.036)+(3.011), (I-339)+(2.036)+(3.012), (I-339)+(2.036)+(3.013), (I-339)+(2.036)+(3.014), (I-339)+(2.036)+(3.015), (I-339)+(2.036)+(3.016), (I-339)+(2.036)+(3.017), (I-339)+(2.036)+(3.018), (I-339)+(2.036)+(3.019), (I-339)+(2.036)+(3.020), (I-339)+(2.036)+(3.021), (I-339)+(2.036)+(3.022), (I-339)+(2.036)+(3.023), (I-339)+(2.036)+(3.024), (I-339)+(2.036)+(3.025), (I-339)+(2.036)+(3.026), (I-339)+(2.036)+(3.027), (I-339)+(2.036)+(3.028), (I-339)+(2.036)+(3.029), (I-339)+(2.036)+(3.030), (I-339)+(2.036)+(3.031), (I-339)+(2.036)+(5.001), (I-339)+(2.036)+(5.002), (I-339)+(2.036)+(5.003), (I-339)+(2.036)+(5.004), (I-339)+(2.036)+(5.005), (I-339)+(2.036)+(5.006), (I-339)+(2.036)+(5.007), (I-339)+(2.036)+(5.008), (I-339)+(2.036)+(5.009), (I-339)+(2.036)+(5.010), (I-339)+(2.036)+(5.011), (I-339)+(2.036)+(5.012), (I-339)+(2.036)+(5.013), (I-339)+(2.036)+(5.014), (I-339)+(2.036)+(5.015), (I-339)+(2.036)+(5.016), (I-339)+(2.036)+(5.017), (I-339)+(2.036)+(5.018), (I-339)+(2.036)+(5.019), (I-339)+(2.036)+(5.020), (I-339)+(2.036)+(5.021), (I-339)+(2.036)+(5.022), (I-339)+(2.036)+(5.023), (I-339)+(2.036)+(6.001), (I-339)+(2.036)+(6.002), (I-339)+(2.036)+(6.003), (I-339)+(2.036)+(6.004), (I-339)+(2.036)+(7.001), (I-339)+(2.036)+(7.002), (I-339)+(2.036)+(7.003), (I-339)+(2.036)+(7.004), (I-339)+(2.036)+(7.005), (I-339)+(2.036)+(7.006), (I-339)+(2.036)+(9.001), (I-339)+(2.036)+(9.002), (I-339)+(2.036)+(9.003), (I-339)+(2.036)+(9.004), (I-339)+(2.036)+(9.005), (I-339)+(2.036)+(9.006), (I-339)+(2.036)+(9.007), (I-339)+(2.036)+(9.008), (I-339)+(2.036)+(9.009), (I-339)+(2.036)+(14.001), (I-339)+(2.036)+(14.002), (I-339)+(2.036)+(15.008), (I-339)+(2.036)+(15.011), (I-339)+(2.036)+(15.012), (I-339)+(2.036)+(15.016), (I-339)+(2.036)+(15.025), (I-339)+(2.036)+(15.027), (I-339)+(2.036)+(15.047), (I-339)+(2.036)+(15.063), (I-339)+(2.036)+(15.064), (I-339)+(2.036)+(16.001), (I-339)+(2.036)+(16.002), (I-339)+(2.036)+(16.003), (I-339)+(2.036)+(16.004), (I-339)+(2.036)+(16.005), (I-339)+(2.036)+(16.006), (I-339)+(2.036)+(16.007), (I-339)+(2.036)+(16.008), (I-339)+(2.036)+(17.001), (I-339)+(2.036)+(17.002), (I-339)+(2.036)+(17.003), (I-339)+(2.036)+(17.004), (I-339)+(2.036)+(17.005), (I-339)+(2.036)+(17.006), (I-339)+(2.036)+(17.007), (I-339)+(2.036)+(17.008), (I-339)+(2.036)+(17.009), (I-339)+(2.036)+(17.010), (I-339)+(2.036)+(17.011), (I-339)+(2.036)+(17.012), (I-339)+(2.036)+(18.001), (I-339)+(2.037)+(3.001), (I-339)+(2.037)+(3.002), (I-339)+(2.037)+(3.003), (I-339)+(2.037)+(3.004), (I-339)+(2.037)+(3.005), (I-339)+(2.037)+(3.006), (I-339)+(2.037)+(3.007), (I-339)+(2.037)+(3.008), (I-339)+(2.037)+(3.009), (I-339)+(2.037)+(3.010), (I-339)+(2.037)+(3.011), (I-339)+(2.037)+(3.012), (I-339)+(2.037)+(3.013), (I-339)+(2.037)+(3.014), (I-339)+(2.037)+(3.015), (I-339)+(2.037)+(3.016), (I-339)+(2.037)+(3.017), (I-339)+(2.037)+(3.018), (I-339)+(2.037)+(3.019), (I-339)+(2.037)+(3.020), (I-339)+(2.037)+(3.021), (I-339)+(2.037)+(3.022), (I-339)+(2.037)+(3.023), (I-339)+(2.037)+(3.024), (I-339)+(2.037)+(3.025), (I-339)+(2.037)+(3.026), (I-339)+(2.037)+(3.027), (I-339)+(2.037)+(3.028), (I-339)+(2.037)+(3.029), (I-339)+(2.037)+(3.030), (I-339)+(2.037)+(3.031), (I-339)+(2.037)+(5.001), (I-339)+(2.037)+(5.002), (I-339)+(2.037)+(5.003), (I-339)+(2.037)+(5.004), (I-339)+(2.037)+(5.005), (I-339)+(2.037)+(5.006), (I-339)+(2.037)+(5.007), (I-339)+(2.037)+(5.008), (I-339)+(2.037)+(5.009), (I-339)+(2.037)+(5.010), (I-339)+(2.037)+(5.011), (I-339)+(2.037)+(5.012), (I-339)+(2.037)+(5.013), (I-339)+(2.037)+(5.014), (I-339)+(2.037)+(5.015), (I-339)+(2.037)+(5.016), (I-339)+(2.037)+(5.017), (I-339)+(2.037)+(5.018), (I-339)+(2.037)+(5.019), (I-339)+(2.037)+(5.020), (I-339)+(2.037)+(5.021), (I-339)+(2.037)+(5.022), (I-339)+(2.037)+(5.023), (I-339)+(2.037)+(6.001), (I-339)+(2.037)+(6.002), (I-339)+(2.037)+(6.003), (I-339)+(2.037)+(6.004), (I-339)+(2.037)+(7.001), (I-339)+(2.037)+(7.002), (I-339)+(2.037)+(7.003), (I-339)+(2.037)+(7.004), (I-339)+(2.037)+(7.005), (I-339)+(2.037)+(7.006), (I-339)+(2.037)+(9.001), (I-339)+(2.037)+(9.002), (I-339)+(2.037)+(9.003), (I-339)+(2.037)+(9.004), (I-339)+(2.037)+(9.005), (I-339)+(2.037)+(9.006), (I-339)+(2.037)+(9.007), (I-339)+(2.037)+(9.008), (I-339)+(2.037)+(9.009), (I-339)+(2.037)+(14.001), (I-339)+(2.037)+(14.002), (I-339)+(2.037)+(15.008), (I-339)+(2.037)+(15.011), (I-339)+(2.037)+(15.012), (I-339)+(2.037)+(15.016), (I-339)+(2.037)+(15.025), (I-339)+(2.037)+(15.027), (I-339)+(2.037)+(15.047), (I-339)+(2.037)+(15.063), (I-339)+(2.037)+(15.064), (I-339)+(2.037)+(16.001), (I-339)+(2.037)+(16.002), (I-339)+(2.037)+(16.003), (I-339)+(2.037)+(16.004), (I-339)+(2.037)+(16.005), (I-339)+(2.037)+(16.006), (I-339)+(2.037)+(16.007), (I-339)+(2.037)+(16.008), (I-339)+(2.037)+(17.001), (I-339)+(2.037)+(17.002), (I-339)+(2.037)+(17.003), (I-339)+(2.037)+(17.004), (I-339)+(2.037)+(17.005), (I-339)+(2.037)+(17.006), (I-339)+(2.037)+(17.007), (I-339)+(2.037)+(17.008), (I-339)+(2.037)+(17.009), (I-339)+(2.037)+(17.010), (I-339)+(2.037)+(17.011), (I-339)+(2.037)+(17.012), (I-339)+(2.037)+(18.001), (I-339)+(2.038)+(3.001), (I-339)+(2.038)+(3.002), (I-339)+(2.038)+(3.003), (I-339)+(2.038)+(3.004), (I-339)+(2.038)+(3.005), (I-339)+(2.038)+(3.006), (I-339)+(2.038)+(3.007), (I-339)+(2.038)+(3.008), (I-339)+(2.038)+(3.009), (I-339)+(2.038)+(3.010), (I-339)+(2.038)+(3.011), (I-339)+(2.038)+(3.012), (I-339)+(2.038)+(3.013), (I-339)+(2.038)+(3.014), (I-339)+(2.038)+(3.015), (I-339)+(2.038)+(3.016), (I-339)+(2.038)+(3.017), (I-339)+(2.038)+(3.018), (I-339)+(2.038)+(3.019), (I-339)+(2.038)+(3.020), (I-339)+(2.038)+(3.021), (I-339)+(2.038)+(3.022), (I-339)+(2.038)+(3.023), (I-339)+(2.038)+(3.024), (I-339)+(2.038)+(3.025), (I-339)+(2.038)+(3.026), (I-339)+(2.038)+(3.027), (I-339)+(2.038)+(3.028), (I-339)+(2.038)+(3.029), (I-339)+(2.038)+(3.030), (I-339)+(2.038)+(3.031), (I-339)+(2.038)+(5.001), (I-339)+(2.038)+(5.002), (I-339)+(2.038)+(5.003), (I-339)+(2.038)+(5.004), (I-339)+(2.038)+(5.005), (I-339)+(2.038)+(5.006), (I-339)+(2.038)+(5.007), (I-339)+(2.038)+(5.008), (I-339)+(2.038)+(5.009), (I-339)+(2.038)+(5.010), (I-339)+(2.038)+(5.011), (I-339)+(2.038)+(5.012), (I-339)+(2.038)+(5.013), (I-339)+(2.038)+(5.014), (I-339)+(2.038)+(5.015), (I-339)+(2.038)+(5.016), (I-339)+(2.038)+(5.017), (I-339)+(2.038)+(5.018), (I-339)+(2.038)+(5.019), (I-339)+(2.038)+(5.020), (I-339)+(2.038)+(5.021), (I-339)+(2.038)+(5.022), (I-339)+(2.038)+(5.023), (I-339)+(2.038)+(6.001), (I-339)+(2.038)+(6.002), (I-339)+(2.038)+(6.003), (I-339)+(2.038)+(6.004), (I-339)+(2.038)+(7.001), (I-339)+(2.038)+(7.002), (I-339)+(2.038)+(7.003), (I-339)+(2.038)+(7.004), (I-339)+(2.038)+(7.005), (I-339)+(2.038)+(7.006), (I-339)+(2.038)+(9.001), (I-339)+(2.038)+(9.002), (I-339)+(2.038)+(9.003), (I-339)+(2.038)+(9.004), (I-339)+(2.038)+(9.005), (I-339)+(2.038)+(9.006), (I-339)+(2.038)+(9.007), (I-339)+(2.038)+(9.008), (I-339)+(2.038)+(9.009), (I-339)+(2.038)+(14.001), (I-339)+(2.038)+(14.002), (I-339)+(2.038)+(15.008), (I-339)+(2.038)+(15.011), (I-339)+(2.038)+(15.012), (I-339)+(2.038)+(15.016), (I-339)+(2.038)+(15.025), (I-339)+(2.038)+(15.027), (I-339)+(2.038)+(15.047), (I-339)+(2.038)+(15.063), (I-339)+(2.038)+(15.064), (I-339)+(2.038)+(16.001), (I-339)+(2.038)+(16.002), (I-339)+(2.038)+(16.003), (I-339)+(2.038)+(16.004), (I-339)+(2.038)+(16.005), (I-339)+(2.038)+(16.006), (I-339)+(2.038)+(16.007), (I-339)+(2.038)+(16.008), (I-339)+(2.038)+(17.001), (I-339)+(2.038)+(17.002), (I-339)+(2.038)+(17.003), (I-339)+(2.038)+(17.004), (I-339)+(2.038)+(17.005), (I-339)+(2.038)+(17.006), (I-339)+(2.038)+(17.007), (I-339)+(2.038)+(17.008), (I-339)+(2.038)+(17.009), (I-339)+(2.038)+(17.010), (I-339)+(2.038)+(17.011), (I-339)+(2.038)+(17.012), (I-339)+(2.038)+(18.001), (I-339)+(2.039)+(3.001), (I-339)+(2.039)+(3.002), (I-339)+(2.039)+(3.003), (I-339)+(2.039)+(3.004), (I-339)+(2.039)+(3.005), (I-339)+(2.039)+(3.006), (I-339)+(2.039)+(3.007), (I-339)+(2.039)+(3.008), (I-339)+(2.039)+(3.009), (I-339)+(2.039)+(3.010), (I-339)+(2.039)+(3.011), (I-339)+(2.039)+(3.012), (I-339)+(2.039)+(3.013), (I-339)+(2.039)+(3.014), (I-339)+(2.039)+(3.015), (I-339)+(2.039)+(3.016), (I-339)+(2.039)+(3.017), (I-339)+(2.039)+(3.018), (I-339)+(2.039)+(3.019), (I-339)+(2.039)+(3.020), (I-339)+(2.039)+(3.021), (I-339)+(2.039)+(3.022), (I-339)+(2.039)+(3.023), (I-339)+(2.039)+(3.024), (I-339)+(2.039)+(3.025), (I-339)+(2.039)+(3.026), (I-339)+(2.039)+(3.027), (I-339)+(2.039)+(3.028), (I-339)+(2.039)+(3.029), (I-339)+(2.039)+(3.030), (I-339)+(2.039)+(3.031), (I-339)+(2.039)+(5.001), (I-339)+(2.039)+(5.002), (I-339)+(2.039)+(5.003), (I-339)+(2.039)+(5.004), (I-339)+(2.039)+(5.005), (I-339)+(2.039)+(5.006), (I-339)+(2.039)+(5.007), (I-339)+(2.039)+(5.008), (I-339)+(2.039)+(5.009), (I-339)+(2.039)+(5.010), (I-339)+(2.039)+(5.011), (I-339)+(2.039)+(5.012), (I-339)+(2.039)+(5.013), (I-339)+(2.039)+(5.014), (I-339)+(2.039)+(5.015), (I-339)+(2.039)+(5.016), (I-339)+(2.039)+(5.017), (I-339)+(2.039)+(5.018), (I-339)+(2.039)+(5.019), (I-339)+(2.039)+(5.020), (I-339)+(2.039)+(5.021), (I-339)+(2.039)+(5.022), (I-339)+(2.039)+(5.023), (I-339)+(2.039)+(6.001), (I-339)+(2.039)+(6.002), (I-339)+(2.039)+(6.003), (I-339)+(2.039)+(6.004), (I-339)+(2.039)+(7.001), (I-339)+(2.039)+(7.002), (I-339)+(2.039)+(7.003), (I-339)+(2.039)+(7.004), (I-339)+(2.039)+(7.005), (I-339)+(2.039)+(7.006), (I-339)+(2.039)+(9.001), (I-339)+(2.039)+(9.002), (I-339)+(2.039)+(9.003), (I-339)+(2.039)+(9.004), (I-339)+(2.039)+(9.005), (I-339)+(2.039)+(9.006), (I-339)+(2.039)+(9.007), (I-339)+(2.039)+(9.008), (I-339)+(2.039)+(9.009), (I-339)+(2.039)+(14.001), (I-339)+(2.039)+(14.002), (I-339)+(2.039)+(15.008), (I-339)+(2.039)+(15.011), (I-339)+(2.039)+(15.012), (I-339)+(2.039)+(15.016), (I-339)+(2.039)+(15.025), (I-339)+(2.039)+(15.027), (I-339)+(2.039)+(15.047), (I-339)+(2.039)+(15.063), (I-339)+(2.039)+(15.064), (I-339)+(2.039)+(16.001), (I-339)+(2.039)+(16.002), (I-339)+(2.039)+(16.003), (I-339)+(2.039)+(16.004), (I-339)+(2.039)+(16.005), (I-339)+(2.039)+(16.006), (I-339)+(2.039)+(16.007), (I-339)+(2.039)+(16.008), (I-339)+(2.039)+(17.001), (I-339)+(2.039)+(17.002), (I-339)+(2.039)+(17.003), (I-339)+(2.039)+(17.004), (I-339)+(2.039)+(17.005), (I-339)+(2.039)+(17.006), (I-339)+(2.039)+(17.007), (I-339)+(2.039)+(17.008), (I-339)+(2.039)+(17.009), (I-339)+(2.039)+(17.010), (I-339)+(2.039)+(17.011), (I-339)+(2.039)+(17.012), (I-339)+(2.039)+(18.001), (I-339)+(2.040)+(3.001), (I-339)+(2.040)+(3.002), (I-339)+(2.040)+(3.003), (I-339)+(2.040)+(3.004), (I-339)+(2.040)+(3.005), (I-339)+(2.040)+(3.006), (I-339)+(2.040)+(3.007), (I-339)+(2.040)+(3.008), (I-339)+(2.040)+(3.009), (I-339)+(2.040)+(3.010), (I-339)+(2.040)+(3.011), (I-339)+(2.040)+(3.012), (I-339)+(2.040)+(3.013), (I-339)+(2.040)+(3.014), (I-339)+(2.040)+(3.015), (I-339)+(2.040)+(3.016), (I-339)+(2.040)+(3.017), (I-339)+(2.040)+(3.018), (I-339)+(2.040)+(3.019), (I-339)+(2.040)+(3.020), (I-339)+(2.040)+(3.021), (I-339)+(2.040)+(3.022), (I-339)+(2.040)+(3.023), (I-339)+(2.040)+(3.024), (I-339)+(2.040)+(3.025), (I-339)+(2.040)+(3.026), (I-339)+(2.040)+(3.027), (I-339)+(2.040)+(3.028), (I-339)+(2.040)+(3.029), (I-339)+(2.040)+(3.030), (I-339)+(2.040)+(3.031), (I-339)+(2.040)+(5.001), (I-339)+(2.040)+(5.002), (I-339)+(2.040)+(5.003), (I-339)+(2.040)+(5.004), (I-339)+(2.040)+(5.005), (I-339)+(2.040)+(5.006), (I-339)+(2.040)+(5.007), (I-339)+(2.040)+(5.008), (I-339)+(2.040)+(5.009), (I-339)+(2.040)+(5.010), (I-339)+(2.040)+(5.011), (I-339)+(2.040)+(5.012), (I-339)+(2.040)+(5.013), (I-339)+(2.040)+(5.014), (I-339)+(2.040)+(5.015), (I-339)+(2.040)+(5.016), (I-339)+(2.040)+(5.017), (I-339)+(2.040)+(5.018), (I-339)+(2.040)+(5.019), (I-339)+(2.040)+(5.020), (I-339)+(2.040)+(5.021), (I-339)+(2.040)+(5.022), (I-339)+(2.040)+(5.023), (I-339)+(2.040)+(6.001), (I-339)+(2.040)+(6.002), (I-339)+(2.040)+(6.003), (I-339)+(2.040)+(6.004), (I-339)+(2.040)+(7.001), (I-339)+(2.040)+(7.002), (I-339)+(2.040)+(7.003), (I-339)+(2.040)+(7.004), (I-339)+(2.040)+(7.005), (I-339)+(2.040)+(7.006), (I-339)+(2.040)+(9.001), (I-339)+(2.040)+(9.002), (I-339)+(2.040)+(9.003), (I-339)+(2.040)+(9.004), (I-339)+(2.040)+(9.005), (I-339)+(2.040)+(9.006), (I-339)+(2.040)+(9.007), (I-339)+(2.040)+(9.008), (I-339)+(2.040)+(9.009), (I-339)+(2.040)+(14.001), (I-339)+(2.040)+(14.002), (I-339)+(2.040)+(15.008), (I-339)+(2.040)+(15.011), (I-339)+(2.040)+(15.012), (I-339)+(2.040)+(15.016), (I-339)+(2.040)+(15.025), (I-339)+(2.040)+(15.027), (I-339)+(2.040)+(15.047), (I-339)+(2.040)+(15.063), (I-339)+(2.040)+(15.064), (I-339)+(2.040)+(16.001), (I-339)+(2.040)+(16.002), (I-339)+(2.040)+(16.003), (I-339)+(2.040)+(16.004), (I-339)+(2.040)+(16.005), (I-339)+(2.040)+(16.006), (I-339)+(2.040)+(16.007), (I-339)+(2.040)+(16.008), (I-339)+(2.040)+(17.001), (I-339)+(2.040)+(17.002), (I-339)+(2.040)+(17.003), (I-339)+(2.040)+(17.004), (I-339)+(2.040)+(17.005), (I-339)+(2.040)+(17.006), (I-339)+(2.040)+(17.007), (I-339)+(2.040)+(17.008), (I-339)+(2.040)+(17.009), (I-339)+(2.040)+(17.010), (I-339)+(2.040)+(17.011), (I-339)+(2.040)+(17.012), (I-339)+(2.040)+(18.001), (I-339)+(2.041)+(3.001), (I-339)+(2.041)+(3.002), (I-339)+(2.041)+(3.003), (I-339)+(2.041)+(3.004), (I-339)+(2.041)+(3.005), (I-339)+(2.041)+(3.006), (I-339)+(2.041)+(3.007), (I-339)+(2.041)+(3.008), (I-339)+(2.041)+(3.009), (I-339)+(2.041)+(3.010), (I-339)+(2.041)+(3.011), (I-339)+(2.041)+(3.012), (I-339)+(2.041)+(3.013), (I-339)+(2.041)+(3.014), (I-339)+(2.041)+(3.015), (I-339)+(2.041)+(3.016), (I-339)+(2.041)+(3.017), (I-339)+(2.041)+(3.018), (I-339)+(2.041)+(3.019), (I-339)+(2.041)+(3.020), (I-339)+(2.041)+(3.021), (I-339)+(2.041)+(3.022), (I-339)+(2.041)+(3.023), (I-339)+(2.041)+(3.024), (I-339)+(2.041)+(3.025), (I-339)+(2.041)+(3.026), (I-339)+(2.041)+(3.027), (I-339)+(2.041)+(3.028), (I-339)+(2.041)+(3.029), (I-339)+(2.041)+(3.030), (I-339)+(2.041)+(3.031), (I-339)+(2.041)+(5.001), (I-339)+(2.041)+(5.002), (I-339)+(2.041)+(5.003), (I-339)+(2.041)+(5.004), (I-339)+(2.041)+(5.005), (I-339)+(2.041)+(5.006), (I-339)+(2.041)+(5.007), (I-339)+(2.041)+(5.008), (I-339)+(2.041)+(5.009), (I-339)+(2.041)+(5.010), (I-339)+(2.041)+(5.011), (I-339)+(2.041)+(5.012), (I-339)+(2.041)+(5.013), (I-339)+(2.041)+(5.014), (I-339)+(2.041)+(5.015), (I-339)+(2.041)+(5.016), (I-339)+(2.041)+(5.017), (I-339)+(2.041)+(5.018), (I-339)+(2.041)+(5.019), (I-339)+(2.041)+(5.020), (I-339)+(2.041)+(5.021), (I-339)+(2.041)+(5.022), (I-339)+(2.041)+(5.023), (I-339)+(2.041)+(6.001), (I-339)+(2.041)+(6.002), (I-339)+(2.041)+(6.003), (I-339)+(2.041)+(6.004), (I-339)+(2.041)+(7.001), (I-339)+(2.041)+(7.002), (I-339)+(2.041)+(7.003), (I-339)+(2.041)+(7.004), (I-339)+(2.041)+(7.005), (I-339)+(2.041)+(7.006), (I-339)+(2.041)+(9.001), (I-339)+(2.041)+(9.002), (I-339)+(2.041)+(9.003), (I-339)+(2.041)+(9.004), (I-339)+(2.041)+(9.005), (I-339)+(2.041)+(9.006), (I-339)+(2.041)+(9.007), (I-339)+(2.041)+(9.008), (I-339)+(2.041)+(9.009), (I-339)+(2.041)+(14.001), (I-339)+(2.041)+(14.002), (I-339)+(2.041)+(15.008), (I-339)+(2.041)+(15.011), (I-339)+(2.041)+(15.012), (I-339)+(2.041)+(15.016), (I-339)+(2.041)+(15.025), (I-339)+(2.041)+(15.027), (I-339)+(2.041)+(15.047), (I-339)+(2.041)+(15.063), (I-339)+(2.041)+(15.064), (I-339)+(2.041)+(16.001), (I-339)+(2.041)+(16.002), (I-339)+(2.041)+(16.003), (I-339)+(2.041)+(16.004), (I-339)+(2.041)+(16.005), (I-339)+(2.041)+(16.006), (I-339)+(2.041)+(16.007), (I-339)+(2.041)+(16.008), (I-339)+(2.041)+(17.001), (I-339)+(2.041)+(17.002), (I-339)+(2.041)+(17.003), (I-339)+(2.041)+(17.004), (I-339)+(2.041)+(17.005), (I-339)+(2.041)+(17.006), (I-339)+(2.041)+(17.007), (I-339)+(2.041)+(17.008), (I-339)+(2.041)+(17.009), (I-339)+(2.041)+(17.010), (I-339)+(2.041)+(17.011), (I-339)+(2.041)+(17.012), (I-339)+(2.041)+(18.001), (I-339)+(2.042)+(3.001), (I-339)+(2.042)+(3.002), (I-339)+(2.042)+(3.003), (I-339)+(2.042)+(3.004), (I-339)+(2.042)+(3.005), (I-339)+(2.042)+(3.006), (I-339)+(2.042)+(3.007), (I-339)+(2.042)+(3.008), (I-339)+(2.042)+(3.009), (I-339)+(2.042)+(3.010), (I-339)+(2.042)+(3.011), (I-339)+(2.042)+(3.012), (I-339)+(2.042)+(3.013), (I-339)+(2.042)+(3.014), (I-339)+(2.042)+(3.015), (I-339)+(2.042)+(3.016), (I-339)+(2.042)+(3.017), (I-339)+(2.042)+(3.018), (I-339)+(2.042)+(3.019), (I-339)+(2.042)+(3.020), (I-339)+(2.042)+(3.021), (I-339)+(2.042)+(3.022), (I-339)+(2.042)+(3.023), (I-339)+(2.042)+(3.024), (I-339)+(2.042)+(3.025), (I-339)+(2.042)+(3.026), (I-339)+(2.042)+(3.027), (I-339)+(2.042)+(3.028), (I-339)+(2.042)+(3.029), (I-339)+(2.042)+(3.030), (I-339)+(2.042)+(3.031), (I-339)+(2.042)+(5.001), (I-339)+(2.042)+(5.002), (I-339)+(2.042)+(5.003), (I-339)+(2.042)+(5.004), (I-339)+(2.042)+(5.005), (I-339)+(2.042)+(5.006), (I-339)+(2.042)+(5.007), (I-339)+(2.042)+(5.008), (I-339)+(2.042)+(5.009), (I-339)+(2.042)+(5.010), (I-339)+(2.042)+(5.011), (I-339)+(2.042)+(5.012), (I-339)+(2.042)+(5.013), (I-339)+(2.042)+(5.014), (I-339)+(2.042)+(5.015), (I-339)+(2.042)+(5.016), (I-339)+(2.042)+(5.017), (I-339)+(2.042)+(5.018), (I-339)+(2.042)+(5.019), (I-339)+(2.042)+(5.020), (I-339)+(2.042)+(5.021), (I-339)+(2.042)+(5.022), (I-339)+(2.042)+(5.023), (I-339)+(2.042)+(6.001), (I-339)+(2.042)+(6.002), (I-339)+(2.042)+(6.003), (I-339)+(2.042)+(6.004), (I-339)+(2.042)+(7.001), (I-339)+(2.042)+(7.002), (I-339)+(2.042)+(7.003), (I-339)+(2.042)+(7.004), (I-339)+(2.042)+(7.005), (I-339)+(2.042)+(7.006), (I-339)+(2.042)+(9.001), (I-339)+(2.042)+(9.002), (I-339)+(2.042)+(9.003), (I-339)+(2.042)+(9.004), (I-339)+(2.042)+(9.005), (I-339)+(2.042)+(9.006), (I-339)+(2.042)+(9.007), (I-339)+(2.042)+(9.008), (I-339)+(2.042)+(9.009), (I-339)+(2.042)+(14.001), (I-339)+(2.042)+(14.002), (I-339)+(2.042)+(15.008), (I-339)+(2.042)+(15.011), (I-339)+(2.042)+(15.012), (I-339)+(2.042)+(15.016), (I-339)+(2.042)+(15.025), (I-339)+(2.042)+(15.027), (I-339)+(2.042)+(15.047), (I-339)+(2.042)+(15.063), (I-339)+(2.042)+(15.064), (I-339)+(2.042)+(16.001), (I-339)+(2.042)+(16.002), (I-339)+(2.042)+(16.003), (I-339)+(2.042)+(16.004), (I-339)+(2.042)+(16.005), (I-339)+(2.042)+(16.006), (I-339)+(2.042)+(16.007), (I-339)+(2.042)+(16.008), (I-339)+(2.042)+(17.001), (I-339)+(2.042)+(17.002), (I-339)+(2.042)+(17.003), (I-339)+(2.042)+(17.004), (I-339)+(2.042)+(17.005), (I-339)+(2.042)+(17.006), (I-339)+(2.042)+(17.007), (I-339)+(2.042)+(17.008), (I-339)+(2.042)+(17.009), (I-339)+(2.042)+(17.010), (I-339)+(2.042)+(17.011), (I-339)+(2.042)+(17.012), (I-339)+(2.042)+(18.001), (I-339)+(2.043)+(3.001), (I-339)+(2.043)+(3.002), (I-339)+(2.043)+(3.003), (I-339)+(2.043)+(3.004), (I-339)+(2.043)+(3.005), (I-339)+(2.043)+(3.006), (I-339)+(2.043)+(3.007), (I-339)+(2.043)+(3.008), (I-339)+(2.043)+(3.009), (I-339)+(2.043)+(3.010), (I-339)+(2.043)+(3.011), (I-339)+(2.043)+(3.012), (I-339)+(2.043)+(3.013), (I-339)+(2.043)+(3.014), (I-339)+(2.043)+(3.015), (I-339)+(2.043)+(3.016), (I-339)+(2.043)+(3.017), (I-339)+(2.043)+(3.018), (I-339)+(2.043)+(3.019), (I-339)+(2.043)+(3.020), (I-339)+(2.043)+(3.021), (I-339)+(2.043)+(3.022), (I-339)+(2.043)+(3.023), (I-339)+(2.043)+(3.024), (I-339)+(2.043)+(3.025), (I-339)+(2.043)+(3.026), (I-339)+(2.043)+(3.027), (I-339)+(2.043)+(3.028), (I-339)+(2.043)+(3.029), (I-339)+(2.043)+(3.030), (I-339)+(2.043)+(3.031), (I-339)+(2.043)+(5.001), (I-339)+(2.043)+(5.002), (I-339)+(2.043)+(5.003), (I-339)+(2.043)+(5.004), (I-339)+(2.043)+(5.005), (I-339)+(2.043)+(5.006), (I-339)+(2.043)+(5.007), (I-339)+(2.043)+(5.008), (I-339)+(2.043)+(5.009), (I-339)+(2.043)+(5.010), (I-339)+(2.043)+(5.011), (I-339)+(2.043)+(5.012), (I-339)+(2.043)+(5.013), (I-339)+(2.043)+(5.014), (I-339)+(2.043)+(5.015), (I-339)+(2.043)+(5.016), (I-339)+(2.043)+(5.017), (I-339)+(2.043)+(5.018), (I-339)+(2.043)+(5.019), (I-339)+(2.043)+(5.020), (I-339)+(2.043)+(5.021), (I-339)+(2.043)+(5.022), (I-339)+(2.043)+(5.023), (I-339)+(2.043)+(6.001), (I-339)+(2.043)+(6.002), (I-339)+(2.043)+(6.003), (I-339)+(2.043)+(6.004), (I-339)+(2.043)+(7.001), (I-339)+(2.043)+(7.002), (I-339)+(2.043)+(7.003), (I-339)+(2.043)+(7.004), (I-339)+(2.043)+(7.005), (I-339)+(2.043)+(7.006), (I-339)+(2.043)+(9.001), (I-339)+(2.043)+(9.002), (I-339)+(2.043)+(9.003), (I-339)+(2.043)+(9.004), (I-339)+(2.043)+(9.005), (I-339)+(2.043)+(9.006), (I-339)+(2.043)+(9.007), (I-339)+(2.043)+(9.008), (I-339)+(2.043)+(9.009), (I-339)+(2.043)+(14.001), (I-339)+(2.043)+(14.002), (I-339)+(2.043)+(15.008), (I-339)+(2.043)+(15.011), (I-339)+(2.043)+(15.012), (I-339)+(2.043)+(15.016), (I-339)+(2.043)+(15.025), (I-339)+(2.043)+(15.027), (I-339)+(2.043)+(15.047), (I-339)+(2.043)+(15.063), (I-339)+(2.043)+(15.064), (I-339)+(2.043)+(16.001), (I-339)+(2.043)+(16.002), (I-339)+(2.043)+(16.003), (I-339)+(2.043)+(16.004), (I-339)+(2.043)+(16.005), (I-339)+(2.043)+(16.006), (I-339)+(2.043)+(16.007), (I-339)+(2.043)+(16.008), (I-339)+(2.043)+(17.001), (I-339)+(2.043)+(17.002), (I-339)+(2.043)+(17.003), (I-339)+(2.043)+(17.004), (I-339)+(2.043)+(17.005), (I-339)+(2.043)+(17.006), (I-339)+(2.043)+(17.007), (I-339)+(2.043)+(17.008), (I-339)+(2.043)+(17.009), (I-339)+(2.043)+(17.010), (I-339)+(2.043)+(17.011), (I-339)+(2.043)+(17.012), (I-339)+(2.043)+(18.001), (I-339)+(2.044)+(3.001), (I-339)+(2.044)+(3.002), (I-339)+(2.044)+(3.003), (I-339)+(2.044)+(3.004), (I-339)+(2.044)+(3.005), (I-339)+(2.044)+(3.006), (I-339)+(2.044)+(3.007), (I-339)+(2.044)+(3.008), (I-339)+(2.044)+(3.009), (I-339)+(2.044)+(3.010), (I-339)+(2.044)+(3.011), (I-339)+(2.044)+(3.012), (I-339)+(2.044)+(3.013), (I-339)+(2.044)+(3.014), (I-339)+(2.044)+(3.015), (I-339)+(2.044)+(3.016), (I-339)+(2.044)+(3.017), (I-339)+(2.044)+(3.018), (I-339)+(2.044)+(3.019), (I-339)+(2.044)+(3.020), (I-339)+(2.044)+(3.021), (I-339)+(2.044)+(3.022), (I-339)+(2.044)+(3.023), (I-339)+(2.044)+(3.024), (I-339)+(2.044)+(3.025), (I-339)+(2.044)+(3.026), (I-339)+(2.044)+(3.027), (I-339)+(2.044)+(3.028), (I-339)+(2.044)+(3.029), (I-339)+(2.044)+(3.030), (I-339)+(2.044)+(3.031), (I-339)+(2.044)+(5.001), (I-339)+(2.044)+(5.002), (I-339)+(2.044)+(5.003), (I-339)+(2.044)+(5.004), (I-339)+(2.044)+(5.005), (I-339)+(2.044)+(5.006), (I-339)+(2.044)+(5.007), (I-339)+(2.044)+(5.008), (I-339)+(2.044)+(5.009), (I-339)+(2.044)+(5.010), (I-339)+(2.044)+(5.011), (I-339)+(2.044)+(5.012), (I-339)+(2.044)+(5.013), (I-339)+(2.044)+(5.014), (I-339)+(2.044)+(5.015), (I-339)+(2.044)+(5.016), (I-339)+(2.044)+(5.017), (I-339)+(2.044)+(5.018), (I-339)+(2.044)+(5.019), (I-339)+(2.044)+(5.020), (I-339)+(2.044)+(5.021), (I-339)+(2.044)+(5.022), (I-339)+(2.044)+(5.023), (I-339)+(2.044)+(6.001), (I-339)+(2.044)+(6.002), (I-339)+(2.044)+(6.003), (I-339)+(2.044)+(6.004), (I-339)+(2.044)+(7.001), (I-339)+(2.044)+(7.002), (I-339)+(2.044)+(7.003), (I-339)+(2.044)+(7.004), (I-339)+(2.044)+(7.005), (I-339)+(2.044)+(7.006), (I-339)+(2.044)+(9.001), (I-339)+(2.044)+(9.002), (I-339)+(2.044)+(9.003), (I-339)+(2.044)+(9.004), (I-339)+(2.044)+(9.005), (I-339)+(2.044)+(9.006), (I-339)+(2.044)+(9.007), (I-339)+(2.044)+(9.008), (I-339)+(2.044)+(9.009), (I-339)+(2.044)+(14.001), (I-339)+(2.044)+(14.002), (I-339)+(2.044)+(15.008), (I-339)+(2.044)+(15.011), (I-339)+(2.044)+(15.012), (I-339)+(2.044)+(15.016), (I-339)+(2.044)+(15.025), (I-339)+(2.044)+(15.027), (I-339)+(2.044)+(15.047), (I-339)+(2.044)+(15.063), (I-339)+(2.044)+(15.064), (I-339)+(2.044)+(16.001), (I-339)+(2.044)+(16.002), (I-339)+(2.044)+(16.003), (I-339)+(2.044)+(16.004), (I-339)+(2.044)+(16.005), (I-339)+(2.044)+(16.006), (I-339)+(2.044)+(16.007), (I-339)+(2.044)+(16.008), (I-339)+(2.044)+(17.001), (I-339)+(2.044)+(17.002), (I-339)+(2.044)+(17.003), (I-339)+(2.044)+(17.004), (I-339)+(2.044)+(17.005), (I-339)+(2.044)+(17.006), (I-339)+(2.044)+(17.007), (I-339)+(2.044)+(17.008), (I-339)+(2.044)+(17.009), (I-339)+(2.044)+(17.010), (I-339)+(2.044)+(17.011), (I-339)+(2.044)+(17.012), (I-339)+(2.044)+(18.001), (I-339)+(2.045)+(3.001), (I-339)+(2.045)+(3.002), (I-339)+(2.045)+(3.003), (I-339)+(2.045)+(3.004), (I-339)+(2.045)+(3.005), (I-339)+(2.045)+(3.006), (I-339)+(2.045)+(3.007), (I-339)+(2.045)+(3.008), (I-339)+(2.045)+(3.009), (I-339)+(2.045)+(3.010), (I-339)+(2.045)+(3.011), (I-339)+(2.045)+(3.012), (I-339)+(2.045)+(3.013), (I-339)+(2.045)+(3.014), (I-339)+(2.045)+(3.015), (I-339)+(2.045)+(3.016), (I-339)+(2.045)+(3.017), (I-339)+(2.045)+(3.018), (I-339)+(2.045)+(3.019), (I-339)+(2.045)+(3.020), (I-339)+(2.045)+(3.021), (I-339)+(2.045)+(3.022), (I-339)+(2.045)+(3.023), (I-339)+(2.045)+(3.024), (I-339)+(2.045)+(3.025), (I-339)+(2.045)+(3.026), (I-339)+(2.045)+(3.027), (I-339)+(2.045)+(3.028), (I-339)+(2.045)+(3.029), (I-339)+(2.045)+(3.030), (I-339)+(2.045)+(3.031), (I-339)+(2.045)+(5.001), (I-339)+(2.045)+(5.002), (I-339)+(2.045)+(5.003), (I-339)+(2.045)+(5.004), (I-339)+(2.045)+(5.005), (I-339)+(2.045)+(5.006), (I-339)+(2.045)+(5.007), (I-339)+(2.045)+(5.008), (I-339)+(2.045)+(5.009), (I-339)+(2.045)+(5.010), (I-339)+(2.045)+(5.011), (I-339)+(2.045)+(5.012), (I-339)+(2.045)+(5.013), (I-339)+(2.045)+(5.014), (I-339)+(2.045)+(5.015), (I-339)+(2.045)+(5.016), (I-339)+(2.045)+(5.017), (I-339)+(2.045)+(5.018), (I-339)+(2.045)+(5.019), (I-339)+(2.045)+(5.020), (I-339)+(2.045)+(5.021), (I-339)+(2.045)+(5.022), (I-339)+(2.045)+(5.023), (I-339)+(2.045)+(6.001), (I-339)+(2.045)+(6.002), (I-339)+(2.045)+(6.003), (I-339)+(2.045)+(6.004), (I-339)+(2.045)+(7.001), (I-339)+(2.045)+(7.002), (I-339)+(2.045)+(7.003), (I-339)+(2.045)+(7.004), (I-339)+(2.045)+(7.005), (I-339)+(2.045)+(7.006), (I-339)+(2.045)+(9.001), (I-339)+(2.045)+(9.002), (I-339)+(2.045)+(9.003), (I-339)+(2.045)+(9.004), (I-339)+(2.045)+(9.005), (I-339)+(2.045)+(9.006), (I-339)+(2.045)+(9.007), (I-339)+(2.045)+(9.008), (I-339)+(2.045)+(9.009), (I-339)+(2.045)+(14.001), (I-339)+(2.045)+(14.002), (I-339)+(2.045)+(15.008), (I-339)+(2.045)+(15.011), (I-339)+(2.045)+(15.012), (I-339)+(2.045)+(15.016), (I-339)+(2.045)+(15.025), (I-339)+(2.045)+(15.027), (I-339)+(2.045)+(15.047), (I-339)+(2.045)+(15.063), (I-339)+(2.045)+(15.064), (I-339)+(2.045)+(16.001), (I-339)+(2.045)+(16.002), (I-339)+(2.045)+(16.003), (I-339)+(2.045)+(16.004), (I-339)+(2.045)+(16.005), (I-339)+(2.045)+(16.006), (I-339)+(2.045)+(16.007), (I-339)+(2.045)+(16.008), (I-339)+(2.045)+(17.001), (I-339)+(2.045)+(17.002), (I-339)+(2.045)+(17.003), (I-339)+(2.045)+(17.004), (I-339)+(2.045)+(17.005), (I-339)+(2.045)+(17.006), (I-339)+(2.045)+(17.007), (I-339)+(2.045)+(17.008), (I-339)+(2.045)+(17.009), (I-339)+(2.045)+(17.010), (I-339)+(2.045)+(17.011), (I-339)+(2.045)+(17.012), (I-339)+(2.045)+(18.001), (I-339)+(2.046)+(3.001), (I-339)+(2.046)+(3.002), (I-339)+(2.046)+(3.003), (I-339)+(2.046)+(3.004), (I-339)+(2.046)+(3.005), (I-339)+(2.046)+(3.006), (I-339)+(2.046)+(3.007), (I-339)+(2.046)+(3.008), (I-339)+(2.046)+(3.009), (I-339)+(2.046)+(3.010), (I-339)+(2.046)+(3.011), (I-339)+(2.046)+(3.012), (I-339)+(2.046)+(3.013), (I-339)+(2.046)+(3.014), (I-339)+(2.046)+(3.015), (I-339)+(2.046)+(3.016), (I-339)+(2.046)+(3.017), (I-339)+(2.046)+(3.018), (I-339)+(2.046)+(3.019), (I-339)+(2.046)+(3.020), (I-339)+(2.046)+(3.021), (I-339)+(2.046)+(3.022), (I-339)+(2.046)+(3.023), (I-339)+(2.046)+(3.024), (I-339)+(2.046)+(3.025), (I-339)+(2.046)+(3.026), (I-339)+(2.046)+(3.027), (I-339)+(2.046)+(3.028), (I-339)+(2.046)+(3.029), (I-339)+(2.046)+(3.030), (I-339)+(2.046)+(3.031), (I-339)+(2.046)+(5.001), (I-339)+(2.046)+(5.002), (I-339)+(2.046)+(5.003), (I-339)+(2.046)+(5.004), (I-339)+(2.046)+(5.005), (I-339)+(2.046)+(5.006), (I-339)+(2.046)+(5.007), (I-339)+(2.046)+(5.008), (I-339)+(2.046)+(5.009), (I-339)+(2.046)+(5.010), (I-339)+(2.046)+(5.011), (I-339)+(2.046)+(5.012), (I-339)+(2.046)+(5.013), (I-339)+(2.046)+(5.014), (I-339)+(2.046)+(5.015), (I-339)+(2.046)+(5.016), (I-339)+(2.046)+(5.017), (I-339)+(2.046)+(5.018), (I-339)+(2.046)+(5.019), (I-339)+(2.046)+(5.020), (I-339)+(2.046)+(5.021), (I-339)+(2.046)+(5.022), (I-339)+(2.046)+(5.023), (I-339)+(2.046)+(6.001), (I-339)+(2.046)+(6.002), (I-339)+(2.046)+(6.003), (I-339)+(2.046)+(6.004), (I-339)+(2.046)+(7.001), (I-339)+(2.046)+(7.002), (I-339)+(2.046)+(7.003), (I-339)+(2.046)+(7.004), (I-339)+(2.046)+(7.005), (I-339)+(2.046)+(7.006), (I-339)+(2.046)+(9.001), (I-339)+(2.046)+(9.002), (I-339)+(2.046)+(9.003), (I-339)+(2.046)+(9.004), (I-339)+(2.046)+(9.005), (I-339)+(2.046)+(9.006), (I-339)+(2.046)+(9.007), (I-339)+(2.046)+(9.008), (I-339)+(2.046)+(9.009), (I-339)+(2.046)+(14.001), (I-339)+(2.046)+(14.002), (I-339)+(2.046)+(15.008), (I-339)+(2.046)+(15.011), (I-339)+(2.046)+(15.012), (I-339)+(2.046)+(15.016), (I-339)+(2.046)+(15.025), (I-339)+(2.046)+(15.027), (I-339)+(2.046)+(15.047), (I-339)+(2.046)+(15.063), (I-339)+(2.046)+(15.064), (I-339)+(2.046)+(16.001), (I-339)+(2.046)+(16.002), (I-339)+(2.046)+(16.003), (I-339)+(2.046)+(16.004), (I-339)+(2.046)+(16.005), (I-339)+(2.046)+(16.006), (I-339)+(2.046)+(16.007), (I-339)+(2.046)+(16.008), (I-339)+(2.046)+(17.001), (I-339)+(2.046)+(17.002), (I-339)+(2.046)+(17.003), (I-339)+(2.046)+(17.004), (I-339)+(2.046)+(17.005), (I-339)+(2.046)+(17.006), (I-339)+(2.046)+(17.007), (I-339)+(2.046)+(17.008), (I-339)+(2.046)+(17.009), (I-339)+(2.046)+(17.010), (I-339)+(2.046)+(17.011), (I-339)+(2.046)+(17.012), (I-339)+(2.046)+(18.001), (I-339)+(2.047)+(3.001), (I-339)+(2.047)+(3.002), (I-339)+(2.047)+(3.003), (I-339)+(2.047)+(3.004), (I-339)+(2.047)+(3.005), (I-339)+(2.047)+(3.006), (I-339)+(2.047)+(3.007), (I-339)+(2.047)+(3.008), (I-339)+(2.047)+(3.009), (I-339)+(2.047)+(3.010), (I-339)+(2.047)+(3.011), (I-339)+(2.047)+(3.012), (I-339)+(2.047)+(3.013), (I-339)+(2.047)+(3.014), (I-339)+(2.047)+(3.015), (I-339)+(2.047)+(3.016), (I-339)+(2.047)+(3.017), (I-339)+(2.047)+(3.018), (I-339)+(2.047)+(3.019), (I-339)+(2.047)+(3.020), (I-339)+(2.047)+(3.021), (I-339)+(2.047)+(3.022), (I-339)+(2.047)+(3.023), (I-339)+(2.047)+(3.024), (I-339)+(2.047)+(3.025), (I-339)+(2.047)+(3.026), (I-339)+(2.047)+(3.027), (I-339)+(2.047)+(3.028), (I-339)+(2.047)+(3.029), (I-339)+(2.047)+(3.030), (I-339)+(2.047)+(3.031), (I-339)+(2.047)+(5.001), (I-339)+(2.047)+(5.002), (I-339)+(2.047)+(5.003), (I-339)+(2.047)+(5.004), (I-339)+(2.047)+(5.005), (I-339)+(2.047)+(5.006), (I-339)+(2.047)+(5.007), (I-339)+(2.047)+(5.008), (I-339)+(2.047)+(5.009), (I-339)+(2.047)+(5.010), (I-339)+(2.047)+(5.011), (I-339)+(2.047)+(5.012), (I-339)+(2.047)+(5.013), (I-339)+(2.047)+(5.014), (I-339)+(2.047)+(5.015), (I-339)+(2.047)+(5.016), (I-339)+(2.047)+(5.017), (I-339)+(2.047)+(5.018), (I-339)+(2.047)+(5.019), (I-339)+(2.047)+(5.020), (I-339)+(2.047)+(5.021), (I-339)+(2.047)+(5.022), (I-339)+(2.047)+(5.023), (I-339)+(2.047)+(6.001), (I-339)+(2.047)+(6.002), (I-339)+(2.047)+(6.003), (I-339)+(2.047)+(6.004), (I-339)+(2.047)+(7.001), (I-339)+(2.047)+(7.002), (I-339)+(2.047)+(7.003), (I-339)+(2.047)+(7.004), (I-339)+(2.047)+(7.005), (I-339)+(2.047)+(7.006), (I-339)+(2.047)+(9.001), (I-339)+(2.047)+(9.002), (I-339)+(2.047)+(9.003), (I-339)+(2.047)+(9.004), (I-339)+(2.047)+(9.005), (I-339)+(2.047)+(9.006), (I-339)+(2.047)+(9.007), (I-339)+(2.047)+(9.008), (I-339)+(2.047)+(9.009), (I-339)+(2.047)+(14.001), (I-339)+(2.047)+(14.002), (I-339)+(2.047)+(15.008), (I-339)+(2.047)+(15.011), (I-339)+(2.047)+(15.012), (I-339)+(2.047)+(15.016), (I-339)+(2.047)+(15.025), (I-339)+(2.047)+(15.027), (I-339)+(2.047)+(15.047), (I-339)+(2.047)+(15.063), (I-339)+(2.047)+(15.064), (I-339)+(2.047)+(16.001), (I-339)+(2.047)+(16.002), (I-339)+(2.047)+(16.003), (I-339)+(2.047)+(16.004), (I-339)+(2.047)+(16.005), (I-339)+(2.047)+(16.006), (I-339)+(2.047)+(16.007), (I-339)+(2.047)+(16.008), (I-339)+(2.047)+(17.001), (I-339)+(2.047)+(17.002), (I-339)+(2.047)+(17.003), (I-339)+(2.047)+(17.004), (I-339)+(2.047)+(17.005), (I-339)+(2.047)+(17.006), (I-339)+(2.047)+(17.007), (I-339)+(2.047)+(17.008), (I-339)+(2.047)+(17.009), (I-339)+(2.047)+(17.010), (I-339)+(2.047)+(17.011), (I-339)+(2.047)+(17.012), (I-339)+(2.047)+(18.001), (I-339)+(2.048)+(3.001), (I-339)+(2.048)+(3.002), (I-339)+(2.048)+(3.003), (I-339)+(2.048)+(3.004), (I-339)+(2.048)+(3.005), (I-339)+(2.048)+(3.006), (I-339)+(2.048)+(3.007), (I-339)+(2.048)+(3.008), (I-339)+(2.048)+(3.009), (I-339)+(2.048)+(3.010), (I-339)+(2.048)+(3.011), (I-339)+(2.048)+(3.012), (I-339)+(2.048)+(3.013), (I-339)+(2.048)+(3.014), (I-339)+(2.048)+(3.015), (I-339)+(2.048)+(3.016), (I-339)+(2.048)+(3.017), (I-339)+(2.048)+(3.018), (I-339)+(2.048)+(3.019), (I-339)+(2.048)+(3.020), (I-339)+(2.048)+(3.021), (I-339)+(2.048)+(3.022), (I-339)+(2.048)+(3.023), (I-339)+(2.048)+(3.024), (I-339)+(2.048)+(3.025), (I-339)+(2.048)+(3.026), (I-339)+(2.048)+(3.027), (I-339)+(2.048)+(3.028), (I-339)+(2.048)+(3.029), (I-339)+(2.048)+(3.030), (I-339)+(2.048)+(3.031), (I-339)+(2.048)+(5.001), (I-339)+(2.048)+(5.002), (I-339)+(2.048)+(5.003), (I-339)+(2.048)+(5.004), (I-339)+(2.048)+(5.005), (I-339)+(2.048)+(5.006), (I-339)+(2.048)+(5.007), (I-339)+(2.048)+(5.008), (I-339)+(2.048)+(5.009), (I-339)+(2.048)+(5.010), (I-339)+(2.048)+(5.011), (I-339)+(2.048)+(5.012), (I-339)+(2.048)+(5.013), (I-339)+(2.048)+(5.014), (I-339)+(2.048)+(5.015), (I-339)+(2.048)+(5.016), (I-339)+(2.048)+(5.017), (I-339)+(2.048)+(5.018), (I-339)+(2.048)+(5.019), (I-339)+(2.048)+(5.020), (I-339)+(2.048)+(5.021), (I-339)+(2.048)+(5.022), (I-339)+(2.048)+(5.023), (I-339)+(2.048)+(6.001), (I-339)+(2.048)+(6.002), (I-339)+(2.048)+(6.003), (I-339)+(2.048)+(6.004), (I-339)+(2.048)+(7.001), (I-339)+(2.048)+(7.002), (I-339)+(2.048)+(7.003), (I-339)+(2.048)+(7.004), (I-339)+(2.048)+(7.005), (I-339)+(2.048)+(7.006), (I-339)+(2.048)+(9.001), (I-339)+(2.048)+(9.002), (I-339)+(2.048)+(9.003), (I-339)+(2.048)+(9.004), (I-339)+(2.048)+(9.005), (I-339)+(2.048)+(9.006), (I-339)+(2.048)+(9.007), (I-339)+(2.048)+(9.008), (I-339)+(2.048)+(9.009), (I-339)+(2.048)+(14.001), (I-339)+(2.048)+(14.002), (I-339)+(2.048)+(15.008), (I-339)+(2.048)+(15.011), (I-339)+(2.048)+(15.012), (I-339)+(2.048)+(15.016), (I-339)+(2.048)+(15.025), (I-339)+(2.048)+(15.027), (I-339)+(2.048)+(15.047), (I-339)+(2.048)+(15.063), (I-339)+(2.048)+(15.064), (I-339)+(2.048)+(16.001), (I-339)+(2.048)+(16.002), (I-339)+(2.048)+(16.003), (I-339)+(2.048)+(16.004), (I-339)+(2.048)+(16.005), (I-339)+(2.048)+(16.006), (I-339)+(2.048)+(16.007), (I-339)+(2.048)+(16.008), (I-339)+(2.048)+(17.001), (I-339)+(2.048)+(17.002), (I-339)+(2.048)+(17.003), (I-339)+(2.048)+(17.004), (I-339)+(2.048)+(17.005), (I-339)+(2.048)+(17.006), (I-339)+(2.048)+(17.007), (I-339)+(2.048)+(17.008), (I-339)+(2.048)+(17.009), (I-339)+(2.048)+(17.010), (I-339)+(2.048)+(17.011), (I-339)+(2.048)+(17.012), (I-339)+(2.048)+(18.001), (I-339)+(2.049)+(3.001), (I-339)+(2.049)+(3.002), (I-339)+(2.049)+(3.003), (I-339)+(2.049)+(3.004), (I-339)+(2.049)+(3.005), (I-339)+(2.049)+(3.006), (I-339)+(2.049)+(3.007), (I-339)+(2.049)+(3.008), (I-339)+(2.049)+(3.009), (I-339)+(2.049)+(3.010), (I-339)+(2.049)+(3.011), (I-339)+(2.049)+(3.012), (I-339)+(2.049)+(3.013), (I-339)+(2.049)+(3.014), (I-339)+(2.049)+(3.015), (I-339)+(2.049)+(3.016), (I-339)+(2.049)+(3.017), (I-339)+(2.049)+(3.018), (I-339)+(2.049)+(3.019), (I-339)+(2.049)+(3.020), (I-339)+(2.049)+(3.021), (I-339)+(2.049)+(3.022), (I-339)+(2.049)+(3.023), (I-339)+(2.049)+(3.024), (I-339)+(2.049)+(3.025), (I-339)+(2.049)+(3.026), (I-339)+(2.049)+(3.027), (I-339)+(2.049)+(3.028), (I-339)+(2.049)+(3.029), (I-339)+(2.049)+(3.030), (I-339)+(2.049)+(3.031), (I-339)+(2.049)+(5.001), (I-339)+(2.049)+(5.002), (I-339)+(2.049)+(5.003), (I-339)+(2.049)+(5.004), (I-339)+(2.049)+(5.005), (I-339)+(2.049)+(5.006), (I-339)+(2.049)+(5.007), (I-339)+(2.049)+(5.008), (I-339)+(2.049)+(5.009), (I-339)+(2.049)+(5.010), (I-339)+(2.049)+(5.011), (I-339)+(2.049)+(5.012), (I-339)+(2.049)+(5.013), (I-339)+(2.049)+(5.014), (I-339)+(2.049)+(5.015), (I-339)+(2.049)+(5.016), (I-339)+(2.049)+(5.017), (I-339)+(2.049)+(5.018), (I-339)+(2.049)+(5.019), (I-339)+(2.049)+(5.020), (I-339)+(2.049)+(5.021), (I-339)+(2.049)+(5.022), (I-339)+(2.049)+(5.023), (I-339)+(2.049)+(6.001), (I-339)+(2.049)+(6.002), (I-339)+(2.049)+(6.003), (I-339)+(2.049)+(6.004), (I-339)+(2.049)+(7.001), (I-339)+(2.049)+(7.002), (I-339)+(2.049)+(7.003), (I-339)+(2.049)+(7.004), (I-339)+(2.049)+(7.005), (I-339)+(2.049)+(7.006), (I-339)+(2.049)+(9.001), (I-339)+(2.049)+(9.002), (I-339)+(2.049)+(9.003), (I-339)+(2.049)+(9.004), (I-339)+(2.049)+(9.005), (I-339)+(2.049)+(9.006), (I-339)+(2.049)+(9.007), (I-339)+(2.049)+(9.008), (I-339)+(2.049)+(9.009), (I-339)+(2.049)+(14.001), (I-339)+(2.049)+(14.002), (I-339)+(2.049)+(15.008), (I-339)+(2.049)+(15.011), (I-339)+(2.049)+(15.012), (I-339)+(2.049)+(15.016), (I-339)+(2.049)+(15.025), (I-339)+(2.049)+(15.027), (I-339)+(2.049)+(15.047), (I-339)+(2.049)+(15.063), (I-339)+(2.049)+(15.064), (I-339)+(2.049)+(16.001), (I-339)+(2.049)+(16.002), (I-339)+(2.049)+(16.003), (I-339)+(2.049)+(16.004), (I-339)+(2.049)+(16.005), (I-339)+(2.049)+(16.006), (I-339)+(2.049)+(16.007), (I-339)+(2.049)+(16.008), (I-339)+(2.049)+(17.001), (I-339)+(2.049)+(17.002), (I-339)+(2.049)+(17.003), (I-339)+(2.049)+(17.004), (I-339)+(2.049)+(17.005), (I-339)+(2.049)+(17.006), (I-339)+(2.049)+(17.007), (I-339)+(2.049)+(17.008), (I-339)+(2.049)+(17.009), (I-339)+(2.049)+(17.010), (I-339)+(2.049)+(17.011), (I-339)+(2.049)+(17.012), (I-339)+(2.049)+(18.001), (I-339)+(2.050)+(3.001), (I-339)+(2.050)+(3.002), (I-339)+(2.050)+(3.003), (I-339)+(2.050)+(3.004), (I-339)+(2.050)+(3.005), (I-339)+(2.050)+(3.006), (I-339)+(2.050)+(3.007), (I-339)+(2.050)+(3.008), (I-339)+(2.050)+(3.009), (I-339)+(2.050)+(3.010), (I-339)+(2.050)+(3.011), (I-339)+(2.050)+(3.012), (I-339)+(2.050)+(3.013), (I-339)+(2.050)+(3.014), (I-339)+(2.050)+(3.015), (I-339)+(2.050)+(3.016), (I-339)+(2.050)+(3.017), (I-339)+(2.050)+(3.018), (I-339)+(2.050)+(3.019), (I-339)+(2.050)+(3.020), (I-339)+(2.050)+(3.021), (I-339)+(2.050)+(3.022), (I-339)+(2.050)+(3.023), (I-339)+(2.050)+(3.024), (I-339)+(2.050)+(3.025), (I-339)+(2.050)+(3.026), (I-339)+(2.050)+(3.027), (I-339)+(2.050)+(3.028), (I-339)+(2.050)+(3.029), (I-339)+(2.050)+(3.030), (I-339)+(2.050)+(3.031), (I-339)+(2.050)+(5.001), (I-339)+(2.050)+(5.002), (I-339)+(2.050)+(5.003), (I-339)+(2.050)+(5.004), (I-339)+(2.050)+(5.005), (I-339)+(2.050)+(5.006), (I-339)+(2.050)+(5.007), (I-339)+(2.050)+(5.008), (I-339)+(2.050)+(5.009), (I-339)+(2.050)+(5.010), (I-339)+(2.050)+(5.011), (I-339)+(2.050)+(5.012), (I-339)+(2.050)+(5.013), (I-339)+(2.050)+(5.014), (I-339)+(2.050)+(5.015), (I-339)+(2.050)+(5.016), (I-339)+(2.050)+(5.017), (I-339)+(2.050)+(5.018), (I-339)+(2.050)+(5.019), (I-339)+(2.050)+(5.020), (I-339)+(2.050)+(5.021), (I-339)+(2.050)+(5.022), (I-339)+(2.050)+(5.023), (I-339)+(2.050)+(6.001), (I-339)+(2.050)+(6.002), (I-339)+(2.050)+(6.003), (I-339)+(2.050)+(6.004), (I-339)+(2.050)+(7.001), (I-339)+(2.050)+(7.002), (I-339)+(2.050)+(7.003), (I-339)+(2.050)+(7.004), (I-339)+(2.050)+(7.005), (I-339)+(2.050)+(7.006), (I-339)+(2.050)+(9.001), (I-339)+(2.050)+(9.002), (I-339)+(2.050)+(9.003), (I-339)+(2.050)+(9.004), (I-339)+(2.050)+(9.005), (I-339)+(2.050)+(9.006), (I-339)+(2.050)+(9.007), (I-339)+(2.050)+(9.008), (I-339)+(2.050)+(9.009), (I-339)+(2.050)+(14.001), (I-339)+(2.050)+(14.002), (I-339)+(2.050)+(15.008), (I-339)+(2.050)+(15.011), (I-339)+(2.050)+(15.012), (I-339)+(2.050)+(15.016), (I-339)+(2.050)+(15.025), (I-339)+(2.050)+(15.027), (I-339)+(2.050)+(15.047), (I-339)+(2.050)+(15.063), (I-339)+(2.050)+(15.064), (I-339)+(2.050)+(16.001), (I-339)+(2.050)+(16.002), (I-339)+(2.050)+(16.003), (I-339)+(2.050)+(16.004), (I-339)+(2.050)+(16.005), (I-339)+(2.050)+(16.006), (I-339)+(2.050)+(16.007), (I-339)+(2.050)+(16.008), (I-339)+(2.050)+(17.001), (I-339)+(2.050)+(17.002), (I-339)+(2.050)+(17.003), (I-339)+(2.050)+(17.004), (I-339)+(2.050)+(17.005), (I-339)+(2.050)+(17.006), (I-339)+(2.050)+(17.007), (I-339)+(2.050)+(17.008), (I-339)+(2.050)+(17.009), (I-339)+(2.050)+(17.010), (I-339)+(2.050)+(17.011), (I-339)+(2.050)+(17.012), (I-339)+(2.050)+(18.001), (I-339)+(2.051)+(3.001), (I-339)+(2.051)+(3.002), (I-339)+(2.051)+(3.003), (I-339)+(2.051)+(3.004), (I-339)+(2.051)+(3.005), (I-339)+(2.051)+(3.006), (I-339)+(2.051)+(3.007), (I-339)+(2.051)+(3.008), (I-339)+(2.051)+(3.009), (I-339)+(2.051)+(3.010), (I-339)+(2.051)+(3.011), (I-339)+(2.051)+(3.012), (I-339)+(2.051)+(3.013), (I-339)+(2.051)+(3.014), (I-339)+(2.051)+(3.015), (I-339)+(2.051)+(3.016), (I-339)+(2.051)+(3.017), (I-339)+(2.051)+(3.018), (I-339)+(2.051)+(3.019), (I-339)+(2.051)+(3.020), (I-339)+(2.051)+(3.021), (I-339)+(2.051)+(3.022), (I-339)+(2.051)+(3.023), (I-339)+(2.051)+(3.024), (I-339)+(2.051)+(3.025), (I-339)+(2.051)+(3.026), (I-339)+(2.051)+(3.027), (I-339)+(2.051)+(3.028), (I-339)+(2.051)+(3.029), (I-339)+(2.051)+(3.030), (I-339)+(2.051)+(3.031), (I-339)+(2.051)+(5.001), (I-339)+(2.051)+(5.002), (I-339)+(2.051)+(5.003), (I-339)+(2.051)+(5.004), (I-339)+(2.051)+(5.005), (I-339)+(2.051)+(5.006), (I-339)+(2.051)+(5.007), (I-339)+(2.051)+(5.008), (I-339)+(2.051)+(5.009), (I-339)+(2.051)+(5.010), (I-339)+(2.051)+(5.011), (I-339)+(2.051)+(5.012), (I-339)+(2.051)+(5.013), (I-339)+(2.051)+(5.014), (I-339)+(2.051)+(5.015), (I-339)+(2.051)+(5.016), (I-339)+(2.051)+(5.017), (I-339)+(2.051)+(5.018), (I-339)+(2.051)+(5.019), (I-339)+(2.051)+(5.020), (I-339)+(2.051)+(5.021), (I-339)+(2.051)+(5.022), (I-339)+(2.051)+(5.023), (I-339)+(2.051)+(6.001), (I-339)+(2.051)+(6.002), (I-339)+(2.051)+(6.003), (I-339)+(2.051)+(6.004), (I-339)+(2.051)+(7.001), (I-339)+(2.051)+(7.002), (I-339)+(2.051)+(7.003), (I-339)+(2.051)+(7.004), (I-339)+(2.051)+(7.005), (I-339)+(2.051)+(7.006), (I-339)+(2.051)+(9.001), (I-339)+(2.051)+(9.002), (I-339)+(2.051)+(9.003), (I-339)+(2.051)+(9.004), (I-339)+(2.051)+(9.005), (I-339)+(2.051)+(9.006), (I-339)+(2.051)+(9.007), (I-339)+(2.051)+(9.008), (I-339)+(2.051)+(9.009), (I-339)+(2.051)+(14.001), (I-339)+(2.051)+(14.002), (I-339)+(2.051)+(15.008), (I-339)+(2.051)+(15.011), (I-339)+(2.051)+(15.012), (I-339)+(2.051)+(15.016), (I-339)+(2.051)+(15.025), (I-339)+(2.051)+(15.027), (I-339)+(2.051)+(15.047), (I-339)+(2.051)+(15.063), (I-339)+(2.051)+(15.064), (I-339)+(2.051)+(16.001), (I-339)+(2.051)+(16.002), (I-339)+(2.051)+(16.003), (I-339)+(2.051)+(16.004), (I-339)+(2.051)+(16.005), (I-339)+(2.051)+(16.006), (I-339)+(2.051)+(16.007), (I-339)+(2.051)+(16.008), (I-339)+(2.051)+(17.001), (I-339)+(2.051)+(17.002), (I-339)+(2.051)+(17.003), (I-339)+(2.051)+(17.004), (I-339)+(2.051)+(17.005), (I-339)+(2.051)+(17.006), (I-339)+(2.051)+(17.007), (I-339)+(2.051)+(17.008), (I-339)+(2.051)+(17.009), (I-339)+(2.051)+(17.010), (I-339)+(2.051)+(17.011), (I-339)+(2.051)+(17.012), (I-339)+(2.051)+(18.001), (I-339)+(2.052)+(3.001), (I-339)+(2.052)+(3.002), (I-339)+(2.052)+(3.003), (I-339)+(2.052)+(3.004), (I-339)+(2.052)+(3.005), (I-339)+(2.052)+(3.006), (I-339)+(2.052)+(3.007), (I-339)+(2.052)+(3.008), (I-339)+(2.052)+(3.009), (I-339)+(2.052)+(3.010), (I-339)+(2.052)+(3.011), (I-339)+(2.052)+(3.012), (I-339)+(2.052)+(3.013), (I-339)+(2.052)+(3.014), (I-339)+(2.052)+(3.015), (I-339)+(2.052)+(3.016), (I-339)+(2.052)+(3.017), (I-339)+(2.052)+(3.018), (I-339)+(2.052)+(3.019), (I-339)+(2.052)+(3.020), (I-339)+(2.052)+(3.021), (I-339)+(2.052)+(3.022), (I-339)+(2.052)+(3.023), (I-339)+(2.052)+(3.024), (I-339)+(2.052)+(3.025), (I-339)+(2.052)+(3.026), (I-339)+(2.052)+(3.027), (I-339)+(2.052)+(3.028), (I-339)+(2.052)+(3.029), (I-339)+(2.052)+(3.030), (I-339)+(2.052)+(3.031), (I-339)+(2.052)+(5.001), (I-339)+(2.052)+(5.002), (I-339)+(2.052)+(5.003), (I-339)+(2.052)+(5.004), (I-339)+(2.052)+(5.005), (I-339)+(2.052)+(5.006), (I-339)+(2.052)+(5.007), (I-339)+(2.052)+(5.008), (I-339)+(2.052)+(5.009), (I-339)+(2.052)+(5.010), (I-339)+(2.052)+(5.011), (I-339)+(2.052)+(5.012), (I-339)+(2.052)+(5.013), (I-339)+(2.052)+(5.014), (I-339)+(2.052)+(5.015), (I-339)+(2.052)+(5.016), (I-339)+(2.052)+(5.017), (I-339)+(2.052)+(5.018), (I-339)+(2.052)+(5.019), (I-339)+(2.052)+(5.020), (I-339)+(2.052)+(5.021), (I-339)+(2.052)+(5.022), (I-339)+(2.052)+(5.023), (I-339)+(2.052)+(6.001), (I-339)+(2.052)+(6.002), (I-339)+(2.052)+(6.003), (I-339)+(2.052)+(6.004), (I-339)+(2.052)+(7.001), (I-339)+(2.052)+(7.002), (I-339)+(2.052)+(7.003), (I-339)+(2.052)+(7.004), (I-339)+(2.052)+(7.005), (I-339)+(2.052)+(7.006), (I-339)+(2.052)+(9.001), (I-339)+(2.052)+(9.002), (I-339)+(2.052)+(9.003), (I-339)+(2.052)+(9.004), (I-339)+(2.052)+(9.005), (I-339)+(2.052)+(9.006), (I-339)+(2.052)+(9.007), (I-339)+(2.052)+(9.008), (I-339)+(2.052)+(9.009), (I-339)+(2.052)+(14.001), (I-339)+(2.052)+(14.002), (I-339)+(2.052)+(15.008), (I-339)+(2.052)+(15.011), (I-339)+(2.052)+(15.012), (I-339)+(2.052)+(15.016), (I-339)+(2.052)+(15.025), (I-339)+(2.052)+(15.027), (I-339)+(2.052)+(15.047), (I-339)+(2.052)+(15.063), (I-339)+(2.052)+(15.064), (I-339)+(2.052)+(16.001), (I-339)+(2.052)+(16.002), (I-339)+(2.052)+(16.003), (I-339)+(2.052)+(16.004), (I-339)+(2.052)+(16.005), (I-339)+(2.052)+(16.006), (I-339)+(2.052)+(16.007), (I-339)+(2.052)+(16.008), (I-339)+(2.052)+(17.001), (I-339)+(2.052)+(17.002), (I-339)+(2.052)+(17.003), (I-339)+(2.052)+(17.004), (I-339)+(2.052)+(17.005), (I-339)+(2.052)+(17.006), (I-339)+(2.052)+(17.007), (I-339)+(2.052)+(17.008), (I-339)+(2.052)+(17.009), (I-339)+(2.052)+(17.010), (I-339)+(2.052)+(17.011), (I-339)+(2.052)+(17.012), (I-339)+(2.052)+(18.001), (I-339)+(2.053)+(3.001), (I-339)+(2.053)+(3.002), (I-339)+(2.053)+(3.003), (I-339)+(2.053)+(3.004), (I-339)+(2.053)+(3.005), (I-339)+(2.053)+(3.006), (I-339)+(2.053)+(3.007), (I-339)+(2.053)+(3.008), (I-339)+(2.053)+(3.009), (I-339)+(2.053)+(3.010), (I-339)+(2.053)+(3.011), (I-339)+(2.053)+(3.012), (I-339)+(2.053)+(3.013), (I-339)+(2.053)+(3.014), (I-339)+(2.053)+(3.015), (I-339)+(2.053)+(3.016), (I-339)+(2.053)+(3.017), (I-339)+(2.053)+(3.018), (I-339)+(2.053)+(3.019), (I-339)+(2.053)+(3.020), (I-339)+(2.053)+(3.021), (I-339)+(2.053)+(3.022), (I-339)+(2.053)+(3.023), (I-339)+(2.053)+(3.024), (I-339)+(2.053)+(3.025), (I-339)+(2.053)+(3.026), (I-339)+(2.053)+(3.027), (I-339)+(2.053)+(3.028), (I-339)+(2.053)+(3.029), (I-339)+(2.053)+(3.030), (I-339)+(2.053)+(3.031), (I-339)+(2.053)+(5.001), (I-339)+(2.053)+(5.002), (I-339)+(2.053)+(5.003), (I-339)+(2.053)+(5.004), (I-339)+(2.053)+(5.005), (I-339)+(2.053)+(5.006), (I-339)+(2.053)+(5.007), (I-339)+(2.053)+(5.008), (I-339)+(2.053)+(5.009), (I-339)+(2.053)+(5.010), (I-339)+(2.053)+(5.011), (I-339)+(2.053)+(5.012), (I-339)+(2.053)+(5.013), (I-339)+(2.053)+(5.014), (I-339)+(2.053)+(5.015), (I-339)+(2.053)+(5.016), (I-339)+(2.053)+(5.017), (I-339)+(2.053)+(5.018), (I-339)+(2.053)+(5.019), (I-339)+(2.053)+(5.020), (I-339)+(2.053)+(5.021), (I-339)+(2.053)+(5.022), (I-339)+(2.053)+(5.023), (I-339)+(2.053)+(6.001), (I-339)+(2.053)+(6.002), (I-339)+(2.053)+(6.003), (I-339)+(2.053)+(6.004), (I-339)+(2.053)+(7.001), (I-339)+(2.053)+(7.002), (I-339)+(2.053)+(7.003), (I-339)+(2.053)+(7.004), (I-339)+(2.053)+(7.005), (I-339)+(2.053)+(7.006), (I-339)+(2.053)+(9.001), (I-339)+(2.053)+(9.002), (I-339)+(2.053)+(9.003), (I-339)+(2.053)+(9.004), (I-339)+(2.053)+(9.005), (I-339)+(2.053)+(9.006), (I-339)+(2.053)+(9.007), (I-339)+(2.053)+(9.008), (I-339)+(2.053)+(9.009), (I-339)+(2.053)+(14.001), (I-339)+(2.053)+(14.002), (I-339)+(2.053)+(15.008), (I-339)+(2.053)+(15.011), (I-339)+(2.053)+(15.012), (I-339)+(2.053)+(15.016), (I-339)+(2.053)+(15.025), (I-339)+(2.053)+(15.027), (I-339)+(2.053)+(15.047), (I-339)+(2.053)+(15.063), (I-339)+(2.053)+(15.064), (I-339)+(2.053)+(16.001), (I-339)+(2.053)+(16.002), (I-339)+(2.053)+(16.003), (I-339)+(2.053)+(16.004), (I-339)+(2.053)+(16.005), (I-339)+(2.053)+(16.006), (I-339)+(2.053)+(16.007), (I-339)+(2.053)+(16.008), (I-339)+(2.053)+(17.001), (I-339)+(2.053)+(17.002), (I-339)+(2.053)+(17.003), (I-339)+(2.053)+(17.004), (I-339)+(2.053)+(17.005), (I-339)+(2.053)+(17.006), (I-339)+(2.053)+(17.007), (I-339)+(2.053)+(17.008), (I-339)+(2.053)+(17.009), (I-339)+(2.053)+(17.010), (I-339)+(2.053)+(17.011), (I-339)+(2.053)+(17.012), (I-339)+(2.053)+(18.001), (I-339)+(2.054)+(3.001), (I-339)+(2.054)+(3.002), (I-339)+(2.054)+(3.003), (I-339)+(2.054)+(3.004), (I-339)+(2.054)+(3.005), (I-339)+(2.054)+(3.006), (I-339)+(2.054)+(3.007), (I-339)+(2.054)+(3.008), (I-339)+(2.054)+(3.009), (I-339)+(2.054)+(3.010), (I-339)+(2.054)+(3.011), (I-339)+(2.054)+(3.012), (I-339)+(2.054)+(3.013), (I-339)+(2.054)+(3.014), (I-339)+(2.054)+(3.015), (I-339)+(2.054)+(3.016), (I-339)+(2.054)+(3.017), (I-339)+(2.054)+(3.018), (I-339)+(2.054)+(3.019), (I-339)+(2.054)+(3.020), (I-339)+(2.054)+(3.021), (I-339)+(2.054)+(3.022), (I-339)+(2.054)+(3.023), (I-339)+(2.054)+(3.024), (I-339)+(2.054)+(3.025), (I-339)+(2.054)+(3.026), (I-339)+(2.054)+(3.027), (I-339)+(2.054)+(3.028), (I-339)+(2.054)+(3.029), (I-339)+(2.054)+(3.030), (I-339)+(2.054)+(3.031), (I-339)+(2.054)+(5.001), (I-339)+(2.054)+(5.002), (I-339)+(2.054)+(5.003), (I-339)+(2.054)+(5.004), (I-339)+(2.054)+(5.005), (I-339)+(2.054)+(5.006), (I-339)+(2.054)+(5.007), (I-339)+(2.054)+(5.008), (I-339)+(2.054)+(5.009), (I-339)+(2.054)+(5.010), (I-339)+(2.054)+(5.011), (I-339)+(2.054)+(5.012), (I-339)+(2.054)+(5.013), (I-339)+(2.054)+(5.014), (I-339)+(2.054)+(5.015), (I-339)+(2.054)+(5.016), (I-339)+(2.054)+(5.017), (I-339)+(2.054)+(5.018), (I-339)+(2.054)+(5.019), (I-339)+(2.054)+(5.020), (I-339)+(2.054)+(5.021), (I-339)+(2.054)+(5.022), (I-339)+(2.054)+(5.023), (I-339)+(2.054)+(6.001), (I-339)+(2.054)+(6.002), (I-339)+(2.054)+(6.003), (I-339)+(2.054)+(6.004), (I-339)+(2.054)+(7.001), (I-339)+(2.054)+(7.002), (I-339)+(2.054)+(7.003), (I-339)+(2.054)+(7.004), (I-339)+(2.054)+(7.005), (I-339)+(2.054)+(7.006), (I-339)+(2.054)+(9.001), (I-339)+(2.054)+(9.002), (I-339)+(2.054)+(9.003), (I-339)+(2.054)+(9.004), (I-339)+(2.054)+(9.005), (I-339)+(2.054)+(9.006), (I-339)+(2.054)+(9.007), (I-339)+(2.054)+(9.008), (I-339)+(2.054)+(9.009), (I-339)+(2.054)+(14.001), (I-339)+(2.054)+(14.002), (I-339)+(2.054)+(15.008), (I-339)+(2.054)+(15.011), (I-339)+(2.054)+(15.012), (I-339)+(2.054)+(15.016), (I-339)+(2.054)+(15.025), (I-339)+(2.054)+(15.027), (I-339)+(2.054)+(15.047), (I-339)+(2.054)+(15.063), (I-339)+(2.054)+(15.064), (I-339)+(2.054)+(16.001), (I-339)+(2.054)+(16.002), (I-339)+(2.054)+(16.003), (I-339)+(2.054)+(16.004), (I-339)+(2.054)+(16.005), (I-339)+(2.054)+(16.006), (I-339)+(2.054)+(16.007), (I-339)+(2.054)+(16.008), (I-339)+(2.054)+(17.001), (I-339)+(2.054)+(17.002), (I-339)+(2.054)+(17.003), (I-339)+(2.054)+(17.004), (I-339)+(2.054)+(17.005), (I-339)+(2.054)+(17.006), (I-339)+(2.054)+(17.007), (I-339)+(2.054)+(17.008), (I-339)+(2.054)+(17.009), (I-339)+(2.054)+(17.010), (I-339)+(2.054)+(17.011), (I-339)+(2.054)+(17.012), (I-339)+(2.054)+(18.001), (I-339)+(2.055)+(3.001), (I-339)+(2.055)+(3.002), (I-339)+(2.055)+(3.003), (I-339)+(2.055)+(3.004), (I-339)+(2.055)+(3.005), (I-339)+(2.055)+(3.006), (I-339)+(2.055)+(3.007), (I-339)+(2.055)+(3.008), (I-339)+(2.055)+(3.009), (I-339)+(2.055)+(3.010), (I-339)+(2.055)+(3.011), (I-339)+(2.055)+(3.012), (I-339)+(2.055)+(3.013), (I-339)+(2.055)+(3.014), (I-339)+(2.055)+(3.015), (I-339)+(2.055)+(3.016), (I-339)+(2.055)+(3.017), (I-339)+(2.055)+(3.018), (I-339)+(2.055)+(3.019), (I-339)+(2.055)+(3.020), (I-339)+(2.055)+(3.021), (I-339)+(2.055)+(3.022), (I-339)+(2.055)+(3.023), (I-339)+(2.055)+(3.024), (I-339)+(2.055)+(3.025), (I-339)+(2.055)+(3.026), (I-339)+(2.055)+(3.027), (I-339)+(2.055)+(3.028), (I-339)+(2.055)+(3.029), (I-339)+(2.055)+(3.030), (I-339)+(2.055)+(3.031), (I-339)+(2.055)+(5.001), (I-339)+(2.055)+(5.002), (I-339)+(2.055)+(5.003), (I-339)+(2.055)+(5.004), (I-339)+(2.055)+(5.005), (I-339)+(2.055)+(5.006), (I-339)+(2.055)+(5.007), (I-339)+(2.055)+(5.008), (I-339)+(2.055)+(5.009), (I-339)+(2.055)+(5.010), (I-339)+(2.055)+(5.011), (I-339)+(2.055)+(5.012), (I-339)+(2.055)+(5.013), (I-339)+(2.055)+(5.014), (I-339)+(2.055)+(5.015), (I-339)+(2.055)+(5.016), (I-339)+(2.055)+(5.017), (I-339)+(2.055)+(5.018), (I-339)+(2.055)+(5.019), (I-339)+(2.055)+(5.020), (I-339)+(2.055)+(5.021), (I-339)+(2.055)+(5.022), (I-339)+(2.055)+(5.023), (I-339)+(2.055)+(6.001), (I-339)+(2.055)+(6.002), (I-339)+(2.055)+(6.003), (I-339)+(2.055)+(6.004), (I-339)+(2.055)+(7.001), (I-339)+(2.055)+(7.002), (I-339)+(2.055)+(7.003), (I-339)+(2.055)+(7.004), (I-339)+(2.055)+(7.005), (I-339)+(2.055)+(7.006), (I-339)+(2.055)+(9.001), (I-339)+(2.055)+(9.002), (I-339)+(2.055)+(9.003), (I-339)+(2.055)+(9.004), (I-339)+(2.055)+(9.005), (I-339)+(2.055)+(9.006), (I-339)+(2.055)+(9.007), (I-339)+(2.055)+(9.008), (I-339)+(2.055)+(9.009), (I-339)+(2.055)+(14.001), (I-339)+(2.055)+(14.002), (I-339)+(2.055)+(15.008), (I-339)+(2.055)+(15.011), (I-339)+(2.055)+(15.012), (I-339)+(2.055)+(15.016), (I-339)+(2.055)+(15.025), (I-339)+(2.055)+(15.027), (I-339)+(2.055)+(15.047), (I-339)+(2.055)+(15.063), (I-339)+(2.055)+(15.064), (I-339)+(2.055)+(16.001), (I-339)+(2.055)+(16.002), (I-339)+(2.055)+(16.003), (I-339)+(2.055)+(16.004), (I-339)+(2.055)+(16.005), (I-339)+(2.055)+(16.006), (I-339)+(2.055)+(16.007), (I-339)+(2.055)+(16.008), (I-339)+(2.055)+(17.001), (I-339)+(2.055)+(17.002), (I-339)+(2.055)+(17.003), (I-339)+(2.055)+(17.004), (I-339)+(2.055)+(17.005), (I-339)+(2.055)+(17.006), (I-339)+(2.055)+(17.007), (I-339)+(2.055)+(17.008), (I-339)+(2.055)+(17.009), (I-339)+(2.055)+(17.010), (I-339)+(2.055)+(17.011), (I-339)+(2.055)+(17.012), (I-339)+(2.055)+(18.001), (I-339)+(2.056)+(3.001), (I-339)+(2.056)+(3.002), (I-339)+(2.056)+(3.003), (I-339)+(2.056)+(3.004), (I-339)+(2.056)+(3.005), (I-339)+(2.056)+(3.006), (I-339)+(2.056)+(3.007), (I-339)+(2.056)+(3.008), (I-339)+(2.056)+(3.009), (I-339)+(2.056)+(3.010), (I-339)+(2.056)+(3.011), (I-339)+(2.056)+(3.012), (I-339)+(2.056)+(3.013), (I-339)+(2.056)+(3.014), (I-339)+(2.056)+(3.015), (I-339)+(2.056)+(3.016), (I-339)+(2.056)+(3.017), (I-339)+(2.056)+(3.018), (I-339)+(2.056)+(3.019), (I-339)+(2.056)+(3.020), (I-339)+(2.056)+(3.021), (I-339)+(2.056)+(3.022), (I-339)+(2.056)+(3.023), (I-339)+(2.056)+(3.024), (I-339)+(2.056)+(3.025), (I-339)+(2.056)+(3.026), (I-339)+(2.056)+(3.027), (I-339)+(2.056)+(3.028), (I-339)+(2.056)+(3.029), (I-339)+(2.056)+(3.030), (I-339)+(2.056)+(3.031), (I-339)+(2.056)+(5.001), (I-339)+(2.056)+(5.002), (I-339)+(2.056)+(5.003), (I-339)+(2.056)+(5.004), (I-339)+(2.056)+(5.005), (I-339)+(2.056)+(5.006), (I-339)+(2.056)+(5.007), (I-339)+(2.056)+(5.008), (I-339)+(2.056)+(5.009), (I-339)+(2.056)+(5.010), (I-339)+(2.056)+(5.011), (I-339)+(2.056)+(5.012), (I-339)+(2.056)+(5.013), (I-339)+(2.056)+(5.014), (I-339)+(2.056)+(5.015), (I-339)+(2.056)+(5.016), (I-339)+(2.056)+(5.017), (I-339)+(2.056)+(5.018), (I-339)+(2.056)+(5.019), (I-339)+(2.056)+(5.020), (I-339)+(2.056)+(5.021), (I-339)+(2.056)+(5.022), (I-339)+(2.056)+(5.023), (I-339)+(2.056)+(6.001), (I-339)+(2.056)+(6.002), (I-339)+(2.056)+(6.003), (I-339)+(2.056)+(6.004), (I-339)+(2.056)+(7.001), (I-339)+(2.056)+(7.002), (I-339)+(2.056)+(7.003), (I-339)+(2.056)+(7.004), (I-339)+(2.056)+(7.005), (I-339)+(2.056)+(7.006), (I-339)+(2.056)+(9.001), (I-339)+(2.056)+(9.002), (I-339)+(2.056)+(9.003), (I-339)+(2.056)+(9.004), (I-339)+(2.056)+(9.005), (I-339)+(2.056)+(9.006), (I-339)+(2.056)+(9.007), (I-339)+(2.056)+(9.008), (I-339)+(2.056)+(9.009), (I-339)+(2.056)+(14.001), (I-339)+(2.056)+(14.002), (I-339)+(2.056)+(15.008), (I-339)+(2.056)+(15.011), (I-339)+(2.056)+(15.012), (I-339)+(2.056)+(15.016), (I-339)+(2.056)+(15.025), (I-339)+(2.056)+(15.027), (I-339)+(2.056)+(15.047), (I-339)+(2.056)+(15.063), (I-339)+(2.056)+(15.064), (I-339)+(2.056)+(16.001), (I-339)+(2.056)+(16.002), (I-339)+(2.056)+(16.003), (I-339)+(2.056)+(16.004), (I-339)+(2.056)+(16.005), (I-339)+(2.056)+(16.006), (I-339)+(2.056)+(16.007), (I-339)+(2.056)+(16.008), (I-339)+(2.056)+(17.001), (I-339)+(2.056)+(17.002), (I-339)+(2.056)+(17.003), (I-339)+(2.056)+(17.004), (I-339)+(2.056)+(17.005), (I-339)+(2.056)+(17.006), (I-339)+(2.056)+(17.007), (I-339)+(2.056)+(17.008), (I-339)+(2.056)+(17.009), (I-339)+(2.056)+(17.010), (I-339)+(2.056)+(17.011), (I-339)+(2.056)+(17.012), (I-339)+(2.056)+(18.001), (I-339)+(2.057)+(3.001), (I-339)+(2.057)+(3.002), (I-339)+(2.057)+(3.003), (I-339)+(2.057)+(3.004), (I-339)+(2.057)+(3.005), (I-339)+(2.057)+(3.006), (I-339)+(2.057)+(3.007), (I-339)+(2.057)+(3.008), (I-339)+(2.057)+(3.009), (I-339)+(2.057)+(3.010), (I-339)+(2.057)+(3.011), (I-339)+(2.057)+(3.012), (I-339)+(2.057)+(3.013), (I-339)+(2.057)+(3.014), (I-339)+(2.057)+(3.015), (I-339)+(2.057)+(3.016), (I-339)+(2.057)+(3.017), (I-339)+(2.057)+(3.018), (I-339)+(2.057)+(3.019), (I-339)+(2.057)+(3.020), (I-339)+(2.057)+(3.021), (I-339)+(2.057)+(3.022), (I-339)+(2.057)+(3.023), (I-339)+(2.057)+(3.024), (I-339)+(2.057)+(3.025), (I-339)+(2.057)+(3.026), (I-339)+(2.057)+(3.027), (I-339)+(2.057)+(3.028), (I-339)+(2.057)+(3.029), (I-339)+(2.057)+(3.030), (I-339)+(2.057)+(3.031), (I-339)+(2.057)+(5.001), (I-339)+(2.057)+(5.002), (I-339)+(2.057)+(5.003), (I-339)+(2.057)+(5.004), (I-339)+(2.057)+(5.005), (I-339)+(2.057)+(5.006), (I-339)+(2.057)+(5.007), (I-339)+(2.057)+(5.008), (I-339)+(2.057)+(5.009), (I-339)+(2.057)+(5.010), (I-339)+(2.057)+(5.011), (I-339)+(2.057)+(5.012), (I-339)+(2.057)+(5.013), (I-339)+(2.057)+(5.014), (I-339)+(2.057)+(5.015), (I-339)+(2.057)+(5.016), (I-339)+(2.057)+(5.017), (I-339)+(2.057)+(5.018), (I-339)+(2.057)+(5.019), (I-339)+(2.057)+(5.020), (I-339)+(2.057)+(5.021), (I-339)+(2.057)+(5.022), (I-339)+(2.057)+(5.023), (I-339)+(2.057)+(6.001), (I-339)+(2.057)+(6.002), (I-339)+(2.057)+(6.003), (I-339)+(2.057)+(6.004), (I-339)+(2.057)+(7.001), (I-339)+(2.057)+(7.002), (I-339)+(2.057)+(7.003), (I-339)+(2.057)+(7.004), (I-339)+(2.057)+(7.005), (I-339)+(2.057)+(7.006), (I-339)+(2.057)+(9.001), (I-339)+(2.057)+(9.002), (I-339)+(2.057)+(9.003), (I-339)+(2.057)+(9.004), (I-339)+(2.057)+(9.005), (I-339)+(2.057)+(9.006), (I-339)+(2.057)+(9.007), (I-339)+(2.057)+(9.008), (I-339)+(2.057)+(9.009), (I-339)+(2.057)+(14.001), (I-339)+(2.057)+(14.002), (I-339)+(2.057)+(15.008), (I-339)+(2.057)+(15.011), (I-339)+(2.057)+(15.012), (I-339)+(2.057)+(15.016), (I-339)+(2.057)+(15.025), (I-339)+(2.057)+(15.027), (I-339)+(2.057)+(15.047), (I-339)+(2.057)+(15.063), (I-339)+(2.057)+(15.064), (I-339)+(2.057)+(16.001), (I-339)+(2.057)+(16.002), (I-339)+(2.057)+(16.003), (I-339)+(2.057)+(16.004), (I-339)+(2.057)+(16.005), (I-339)+(2.057)+(16.006), (I-339)+(2.057)+(16.007), (I-339)+(2.057)+(16.008), (I-339)+(2.057)+(17.001), (I-339)+(2.057)+(17.002), (I-339)+(2.057)+(17.003), (I-339)+(2.057)+(17.004), (I-339)+(2.057)+(17.005), (I-339)+(2.057)+(17.006), (I-339)+(2.057)+(17.007), (I-339)+(2.057)+(17.008), (I-339)+(2.057)+(17.009), (I-339)+(2.057)+(17.010), (I-339)+(2.057)+(17.011), (I-339)+(2.057)+(17.012), (I-339)+(2.057)+(18.001), (I-339)+(2.058)+(3.001), (I-339)+(2.058)+(3.002), (I-339)+(2.058)+(3.003), (I-339)+(2.058)+(3.004), (I-339)+(2.058)+(3.005), (I-339)+(2.058)+(3.006), (I-339)+(2.058)+(3.007), (I-339)+(2.058)+(3.008), (I-339)+(2.058)+(3.009), (I-339)+(2.058)+(3.010), (I-339)+(2.058)+(3.011), (I-339)+(2.058)+(3.012), (I-339)+(2.058)+(3.013), (I-339)+(2.058)+(3.014), (I-339)+(2.058)+(3.015), (I-339)+(2.058)+(3.016), (I-339)+(2.058)+(3.017), (I-339)+(2.058)+(3.018), (I-339)+(2.058)+(3.019), (I-339)+(2.058)+(3.020), (I-339)+(2.058)+(3.021), (I-339)+(2.058)+(3.022), (I-339)+(2.058)+(3.023), (I-339)+(2.058)+(3.024), (I-339)+(2.058)+(3.025), (I-339)+(2.058)+(3.026), (I-339)+(2.058)+(3.027), (I-339)+(2.058)+(3.028), (I-339)+(2.058)+(3.029), (I-339)+(2.058)+(3.030), (I-339)+(2.058)+(3.031), (I-339)+(2.058)+(5.001), (I-339)+(2.058)+(5.002), (I-339)+(2.058)+(5.003), (I-339)+(2.058)+(5.004), (I-339)+(2.058)+(5.005), (I-339)+(2.058)+(5.006), (I-339)+(2.058)+(5.007), (I-339)+(2.058)+(5.008), (I-339)+(2.058)+(5.009), (I-339)+(2.058)+(5.010), (I-339)+(2.058)+(5.011), (I-339)+(2.058)+(5.012), (I-339)+(2.058)+(5.013), (I-339)+(2.058)+(5.014), (I-339)+(2.058)+(5.015), (I-339)+(2.058)+(5.016), (I-339)+(2.058)+(5.017), (I-339)+(2.058)+(5.018), (I-339)+(2.058)+(5.019), (I-339)+(2.058)+(5.020), (I-339)+(2.058)+(5.021), (I-339)+(2.058)+(5.022), (I-339)+(2.058)+(5.023), (I-339)+(2.058)+(6.001), (I-339)+(2.058)+(6.002), (I-339)+(2.058)+(6.003), (I-339)+(2.058)+(6.004), (I-339)+(2.058)+(7.001), (I-339)+(2.058)+(7.002), (I-339)+(2.058)+(7.003), (I-339)+(2.058)+(7.004), (I-339)+(2.058)+(7.005), (I-339)+(2.058)+(7.006), (I-339)+(2.058)+(9.001), (I-339)+(2.058)+(9.002), (I-339)+(2.058)+(9.003), (I-339)+(2.058)+(9.004), (I-339)+(2.058)+(9.005), (I-339)+(2.058)+(9.006), (I-339)+(2.058)+(9.007), (I-339)+(2.058)+(9.008), (I-339)+(2.058)+(9.009), (I-339)+(2.058)+(14.001), (I-339)+(2.058)+(14.002), (I-339)+(2.058)+(15.008), (I-339)+(2.058)+(15.011), (I-339)+(2.058)+(15.012), (I-339)+(2.058)+(15.016), (I-339)+(2.058)+(15.025), (I-339)+(2.058)+(15.027), (I-339)+(2.058)+(15.047), (I-339)+(2.058)+(15.063), (I-339)+(2.058)+(15.064), (I-339)+(2.058)+(16.001), (I-339)+(2.058)+(16.002), (I-339)+(2.058)+(16.003), (I-339)+(2.058)+(16.004), (I-339)+(2.058)+(16.005), (I-339)+(2.058)+(16.006), (I-339)+(2.058)+(16.007), (I-339)+(2.058)+(16.008), (I-339)+(2.058)+(17.001), (I-339)+(2.058)+(17.002), (I-339)+(2.058)+(17.003), (I-339)+(2.058)+(17.004), (I-339)+(2.058)+(17.005), (I-339)+(2.058)+(17.006), (I-339)+(2.058)+(17.007), (I-339)+(2.058)+(17.008), (I-339)+(2.058)+(17.009), (I-339)+(2.058)+(17.010), (I-339)+(2.058)+(17.011), (I-339)+(2.058)+(17.012), (I-339)+(2.058)+(18.001), (I-339)+(2.059)+(3.001), (I-339)+(2.059)+(3.002), (I-339)+(2.059)+(3.003), (I-339)+(2.059)+(3.004), (I-339)+(2.059)+(3.005), (I-339)+(2.059)+(3.006), (I-339)+(2.059)+(3.007), (I-339)+(2.059)+(3.008), (I-339)+(2.059)+(3.009), (I-339)+(2.059)+(3.010), (I-339)+(2.059)+(3.011), (I-339)+(2.059)+(3.012), (I-339)+(2.059)+(3.013), (I-339)+(2.059)+(3.014), (I-339)+(2.059)+(3.015), (I-339)+(2.059)+(3.016), (I-339)+(2.059)+(3.017), (I-339)+(2.059)+(3.018), (I-339)+(2.059)+(3.019), (I-339)+(2.059)+(3.020), (I-339)+(2.059)+(3.021), (I-339)+(2.059)+(3.022), (I-339)+(2.059)+(3.023), (I-339)+(2.059)+(3.024), (I-339)+(2.059)+(3.025), (I-339)+(2.059)+(3.026), (I-339)+(2.059)+(3.027), (I-339)+(2.059)+(3.028), (I-339)+(2.059)+(3.029), (I-339)+(2.059)+(3.030), (I-339)+(2.059)+(3.031), (I-339)+(2.059)+(5.001), (I-339)+(2.059)+(5.002), (I-339)+(2.059)+(5.003), (I-339)+(2.059)+(5.004), (I-339)+(2.059)+(5.005), (I-339)+(2.059)+(5.006), (I-339)+(2.059)+(5.007), (I-339)+(2.059)+(5.008), (I-339)+(2.059)+(5.009), (I-339)+(2.059)+(5.010), (I-339)+(2.059)+(5.011), (I-339)+(2.059)+(5.012), (I-339)+(2.059)+(5.013), (I-339)+(2.059)+(5.014), (I-339)+(2.059)+(5.015), (I-339)+(2.059)+(5.016), (I-339)+(2.059)+(5.017), (I-339)+(2.059)+(5.018), (I-339)+(2.059)+(5.019), (I-339)+(2.059)+(5.020), (I-339)+(2.059)+(5.021), (I-339)+(2.059)+(5.022), (I-339)+(2.059)+(5.023), (I-339)+(2.059)+(6.001), (I-339)+(2.059)+(6.002), (I-339)+(2.059)+(6.003), (I-339)+(2.059)+(6.004), (I-339)+(2.059)+(7.001), (I-339)+(2.059)+(7.002), (I-339)+(2.059)+(7.003), (I-339)+(2.059)+(7.004), (I-339)+(2.059)+(7.005), (I-339)+(2.059)+(7.006), (I-339)+(2.059)+(9.001), (I-339)+(2.059)+(9.002), (I-339)+(2.059)+(9.003), (I-339)+(2.059)+(9.004), (I-339)+(2.059)+(9.005), (I-339)+(2.059)+(9.006), (I-339)+(2.059)+(9.007), (I-339)+(2.059)+(9.008), (I-339)+(2.059)+(9.009), (I-339)+(2.059)+(14.001), (I-339)+(2.059)+(14.002), (I-339)+(2.059)+(15.008), (I-339)+(2.059)+(15.011), (I-339)+(2.059)+(15.012), (I-339)+(2.059)+(15.016), (I-339)+(2.059)+(15.025), (I-339)+(2.059)+(15.027), (I-339)+(2.059)+(15.047), (I-339)+(2.059)+(15.063), (I-339)+(2.059)+(15.064), (I-339)+(2.059)+(16.001), (I-339)+(2.059)+(16.002), (I-339)+(2.059)+(16.003), (I-339)+(2.059)+(16.004), (I-339)+(2.059)+(16.005), (I-339)+(2.059)+(16.006), (I-339)+(2.059)+(16.007), (I-339)+(2.059)+(16.008), (I-339)+(2.059)+(17.001), (I-339)+(2.059)+(17.002), (I-339)+(2.059)+(17.003), (I-339)+(2.059)+(17.004), (I-339)+(2.059)+(17.005), (I-339)+(2.059)+(17.006), (I-339)+(2.059)+(17.007), (I-339)+(2.059)+(17.008), (I-339)+(2.059)+(17.009), (I-339)+(2.059)+(17.010), (I-339)+(2.059)+(17.011), (I-339)+(2.059)+(17.012), (I-339)+(2.059)+(18.001), (I-339)+(3.001)+(3.025), (I-339)+(3.001)+(3.030), (I-339)+(3.001)+(3.031), (I-339)+(3.001)+(5.001), (I-339)+(3.001)+(5.002), (I-339)+(3.001)+(5.003), (I-339)+(3.001)+(5.004), (I-339)+(3.001)+(5.005), (I-339)+(3.001)+(5.006), (I-339)+(3.001)+(5.007), (I-339)+(3.001)+(5.008), (I-339)+(3.001)+(5.009), (I-339)+(3.001)+(5.010), (I-339)+(3.001)+(5.011), (I-339)+(3.001)+(5.012), (I-339)+(3.001)+(5.013), (I-339)+(3.001)+(5.014), (I-339)+(3.001)+(5.015), (I-339)+(3.001)+(5.016), (I-339)+(3.001)+(5.017), (I-339)+(3.001)+(5.018), (I-339)+(3.001)+(5.019), (I-339)+(3.001)+(5.020), (I-339)+(3.001)+(5.021), (I-339)+(3.001)+(5.022), (I-339)+(3.001)+(5.023), (I-339)+(3.001)+(6.001), (I-339)+(3.001)+(6.002), (I-339)+(3.001)+(6.003), (I-339)+(3.001)+(6.004), (I-339)+(3.001)+(7.001), (I-339)+(3.001)+(7.002), (I-339)+(3.001)+(7.003), (I-339)+(3.001)+(7.004), (I-339)+(3.001)+(7.005), (I-339)+(3.001)+(7.006), (I-339)+(3.001)+(9.001), (I-339)+(3.001)+(9.002), (I-339)+(3.001)+(9.003), (I-339)+(3.001)+(9.004), (I-339)+(3.001)+(9.005), (I-339)+(3.001)+(9.006), (I-339)+(3.001)+(9.007), (I-339)+(3.001)+(9.008), (I-339)+(3.001)+(9.009), (I-339)+(3.001)+(14.001), (I-339)+(3.001)+(14.002), (I-339)+(3.001)+(15.008), (I-339)+(3.001)+(15.011), (I-339)+(3.001)+(15.012), (I-339)+(3.001)+(15.016), (I-339)+(3.001)+(15.025), (I-339)+(3.001)+(15.027), (I-339)+(3.001)+(15.047), (I-339)+(3.001)+(15.063), (I-339)+(3.001)+(15.064), (I-339)+(3.001)+(16.001), (I-339)+(3.001)+(16.002), (I-339)+(3.001)+(16.003), (I-339)+(3.001)+(16.004), (I-339)+(3.001)+(16.005), (I-339)+(3.001)+(16.006), (I-339)+(3.001)+(16.007), (I-339)+(3.001)+(16.008), (I-339)+(3.001)+(17.001), (I-339)+(3.001)+(17.002), (I-339)+(3.001)+(17.003), (I-339)+(3.001)+(17.004), (I-339)+(3.001)+(17.005), (I-339)+(3.001)+(17.006), (I-339)+(3.001)+(17.007), (I-339)+(3.001)+(17.008), (I-339)+(3.001)+(17.009), (I-339)+(3.001)+(17.010), (I-339)+(3.001)+(17.011), (I-339)+(3.001)+(17.012), (I-339)+(3.001)+(18.001), (I-339)+(3.002)+(3.025), (I-339)+(3.002)+(3.030), (I-339)+(3.002)+(3.031), (I-339)+(3.002)+(5.001), (I-339)+(3.002)+(5.002), (I-339)+(3.002)+(5.003), (I-339)+(3.002)+(5.004), (I-339)+(3.002)+(5.005), (I-339)+(3.002)+(5.006), (I-339)+(3.002)+(5.007), (I-339)+(3.002)+(5.008), (I-339)+(3.002)+(5.009), (I-339)+(3.002)+(5.010), (I-339)+(3.002)+(5.011), (I-339)+(3.002)+(5.012), (I-339)+(3.002)+(5.013), (I-339)+(3.002)+(5.014), (I-339)+(3.002)+(5.015), (I-339)+(3.002)+(5.016), (I-339)+(3.002)+(5.017), (I-339)+(3.002)+(5.018), (I-339)+(3.002)+(5.019), (I-339)+(3.002)+(5.020), (I-339)+(3.002)+(5.021), (I-339)+(3.002)+(5.022), (I-339)+(3.002)+(5.023), (I-339)+(3.002)+(6.001), (I-339)+(3.002)+(6.002), (I-339)+(3.002)+(6.003), (I-339)+(3.002)+(6.004), (I-339)+(3.002)+(7.001), (I-339)+(3.002)+(7.002), (I-339)+(3.002)+(7.003), (I-339)+(3.002)+(7.004), (I-339)+(3.002)+(7.005), (I-339)+(3.002)+(7.006), (I-339)+(3.002)+(9.001), (I-339)+(3.002)+(9.002), (I-339)+(3.002)+(9.003), (I-339)+(3.002)+(9.004), (I-339)+(3.002)+(9.005), (I-339)+(3.002)+(9.006), (I-339)+(3.002)+(9.007), (I-339)+(3.002)+(9.008), (I-339)+(3.002)+(9.009), (I-339)+(3.002)+(14.001), (I-339)+(3.002)+(14.002), (I-339)+(3.002)+(15.008), (I-339)+(3.002)+(15.011), (I-339)+(3.002)+(15.012), (I-339)+(3.002)+(15.016), (I-339)+(3.002)+(15.025), (I-339)+(3.002)+(15.027), (I-339)+(3.002)+(15.047), (I-339)+(3.002)+(15.063), (I-339)+(3.002)+(15.064), (I-339)+(3.002)+(16.001), (I-339)+(3.002)+(16.002), (I-339)+(3.002)+(16.003), (I-339)+(3.002)+(16.004), (I-339)+(3.002)+(16.005), (I-339)+(3.002)+(16.006), (I-339)+(3.002)+(16.007), (I-339)+(3.002)+(16.008), (I-339)+(3.002)+(17.001), (I-339)+(3.002)+(17.002), (I-339)+(3.002)+(17.003), (I-339)+(3.002)+(17.004), (I-339)+(3.002)+(17.005), (I-339)+(3.002)+(17.006), (I-339)+(3.002)+(17.007), (I-339)+(3.002)+(17.008), (I-339)+(3.002)+(17.009), (I-339)+(3.002)+(17.010), (I-339)+(3.002)+(17.011), (I-339)+(3.002)+(17.012), (I-339)+(3.002)+(18.001), (I-339)+(3.003)+(3.025), (I-339)+(3.003)+(3.030), (I-339)+(3.003)+(3.031), (I-339)+(3.003)+(5.001), (I-339)+(3.003)+(5.002), (I-339)+(3.003)+(5.003), (I-339)+(3.003)+(5.004), (I-339)+(3.003)+(5.005), (I-339)+(3.003)+(5.006), (I-339)+(3.003)+(5.007), (I-339)+(3.003)+(5.008), (I-339)+(3.003)+(5.009), (I-339)+(3.003)+(5.010), (I-339)+(3.003)+(5.011), (I-339)+(3.003)+(5.012), (I-339)+(3.003)+(5.013), (I-339)+(3.003)+(5.014), (I-339)+(3.003)+(5.015), (I-339)+(3.003)+(5.016), (I-339)+(3.003)+(5.017), (I-339)+(3.003)+(5.018), (I-339)+(3.003)+(5.019), (I-339)+(3.003)+(5.020), (I-339)+(3.003)+(5.021), (I-339)+(3.003)+(5.022), (I-339)+(3.003)+(5.023), (I-339)+(3.003)+(6.001), (I-339)+(3.003)+(6.002), (I-339)+(3.003)+(6.003), (I-339)+(3.003)+(6.004), (I-339)+(3.003)+(7.001), (I-339)+(3.003)+(7.002), (I-339)+(3.003)+(7.003), (I-339)+(3.003)+(7.004), (I-339)+(3.003)+(7.005), (I-339)+(3.003)+(7.006), (I-339)+(3.003)+(9.001), (I-339)+(3.003)+(9.002), (I-339)+(3.003)+(9.003), (I-339)+(3.003)+(9.004), (I-339)+(3.003)+(9.005), (I-339)+(3.003)+(9.006), (I-339)+(3.003)+(9.007), (I-339)+(3.003)+(9.008), (I-339)+(3.003)+(9.009), (I-339)+(3.003)+(14.001), (I-339)+(3.003)+(14.002), (I-339)+(3.003)+(15.008), (I-339)+(3.003)+(15.011), (I-339)+(3.003)+(15.012), (I-339)+(3.003)+(15.016), (I-339)+(3.003)+(15.025), (I-339)+(3.003)+(15.027), (I-339)+(3.003)+(15.047), (I-339)+(3.003)+(15.063), (I-339)+(3.003)+(15.064), (I-339)+(3.003)+(16.001), (I-339)+(3.003)+(16.002), (I-339)+(3.003)+(16.003), (I-339)+(3.003)+(16.004), (I-339)+(3.003)+(16.005), (I-339)+(3.003)+(16.006), (I-339)+(3.003)+(16.007), (I-339)+(3.003)+(16.008), (I-339)+(3.003)+(17.001), (I-339)+(3.003)+(17.002), (I-339)+(3.003)+(17.003), (I-339)+(3.003)+(17.004), (I-339)+(3.003)+(17.005), (I-339)+(3.003)+(17.006), (I-339)+(3.003)+(17.007), (I-339)+(3.003)+(17.008), (I-339)+(3.003)+(17.009), (I-339)+(3.003)+(17.010), (I-339)+(3.003)+(17.011), (I-339)+(3.003)+(17.012), (I-339)+(3.003)+(18.001), (I-339)+(3.004)+(3.025), (I-339)+(3.004)+(3.030), (I-339)+(3.004)+(3.031), (I-339)+(3.004)+(5.001), (I-339)+(3.004)+(5.002), (I-339)+(3.004)+(5.003), (I-339)+(3.004)+(5.004), (I-339)+(3.004)+(5.005), (I-339)+(3.004)+(5.006), (I-339)+(3.004)+(5.007), (I-339)+(3.004)+(5.008), (I-339)+(3.004)+(5.009), (I-339)+(3.004)+(5.010), (I-339)+(3.004)+(5.011), (I-339)+(3.004)+(5.012), (I-339)+(3.004)+(5.013), (I-339)+(3.004)+(5.014), (I-339)+(3.004)+(5.015), (I-339)+(3.004)+(5.016), (I-339)+(3.004)+(5.017), (I-339)+(3.004)+(5.018), (I-339)+(3.004)+(5.019), (I-339)+(3.004)+(5.020), (I-339)+(3.004)+(5.021), (I-339)+(3.004)+(5.022), (I-339)+(3.004)+(5.023), (I-339)+(3.004)+(6.001), (I-339)+(3.004)+(6.002), (I-339)+(3.004)+(6.003), (I-339)+(3.004)+(6.004), (I-339)+(3.004)+(7.001), (I-339)+(3.004)+(7.002), (I-339)+(3.004)+(7.003), (I-339)+(3.004)+(7.004), (I-339)+(3.004)+(7.005), (I-339)+(3.004)+(7.006), (I-339)+(3.004)+(9.001), (I-339)+(3.004)+(9.002), (I-339)+(3.004)+(9.003), (I-339)+(3.004)+(9.004), (I-339)+(3.004)+(9.005), (I-339)+(3.004)+(9.006), (I-339)+(3.004)+(9.007), (I-339)+(3.004)+(9.008), (I-339)+(3.004)+(9.009), (I-339)+(3.004)+(14.001), (I-339)+(3.004)+(14.002), (I-339)+(3.004)+(15.008), (I-339)+(3.004)+(15.011), (I-339)+(3.004)+(15.012), (I-339)+(3.004)+(15.016), (I-339)+(3.004)+(15.025), (I-339)+(3.004)+(15.027), (I-339)+(3.004)+(15.047), (I-339)+(3.004)+(15.063), (I-339)+(3.004)+(15.064), (I-339)+(3.004)+(16.001), (I-339)+(3.004)+(16.002), (I-339)+(3.004)+(16.003), (I-339)+(3.004)+(16.004), (I-339)+(3.004)+(16.005), (I-339)+(3.004)+(16.006), (I-339)+(3.004)+(16.007), (I-339)+(3.004)+(16.008), (I-339)+(3.004)+(17.001), (I-339)+(3.004)+(17.002), (I-339)+(3.004)+(17.003), (I-339)+(3.004)+(17.004), (I-339)+(3.004)+(17.005), (I-339)+(3.004)+(17.006), (I-339)+(3.004)+(17.007), (I-339)+(3.004)+(17.008), (I-339)+(3.004)+(17.009), (I-339)+(3.004)+(17.010), (I-339)+(3.004)+(17.011), (I-339)+(3.004)+(17.012), (I-339)+(3.004)+(18.001), (I-339)+(3.005)+(3.025), (I-339)+(3.005)+(3.030), (I-339)+(3.005)+(3.031), (I-339)+(3.005)+(5.001), (I-339)+(3.005)+(5.002), (I-339)+(3.005)+(5.003), (I-339)+(3.005)+(5.004), (I-339)+(3.005)+(5.005), (I-339)+(3.005)+(5.006), (I-339)+(3.005)+(5.007), (I-339)+(3.005)+(5.008), (I-339)+(3.005)+(5.009), (I-339)+(3.005)+(5.010), (I-339)+(3.005)+(5.011), (I-339)+(3.005)+(5.012), (I-339)+(3.005)+(5.013), (I-339)+(3.005)+(5.014), (I-339)+(3.005)+(5.015), (I-339)+(3.005)+(5.016), (I-339)+(3.005)+(5.017), (I-339)+(3.005)+(5.018), (I-339)+(3.005)+(5.019), (I-339)+(3.005)+(5.020), (I-339)+(3.005)+(5.021), (I-339)+(3.005)+(5.022), (I-339)+(3.005)+(5.023), (I-339)+(3.005)+(6.001), (I-339)+(3.005)+(6.002), (I-339)+(3.005)+(6.003), (I-339)+(3.005)+(6.004), (I-339)+(3.005)+(7.001), (I-339)+(3.005)+(7.002), (I-339)+(3.005)+(7.003), (I-339)+(3.005)+(7.004), (I-339)+(3.005)+(7.005), (I-339)+(3.005)+(7.006), (I-339)+(3.005)+(9.001), (I-339)+(3.005)+(9.002), (I-339)+(3.005)+(9.003), (I-339)+(3.005)+(9.004), (I-339)+(3.005)+(9.005), (I-339)+(3.005)+(9.006), (I-339)+(3.005)+(9.007), (I-339)+(3.005)+(9.008), (I-339)+(3.005)+(9.009), (I-339)+(3.005)+(14.001), (I-339)+(3.005)+(14.002), (I-339)+(3.005)+(15.008), (I-339)+(3.005)+(15.011), (I-339)+(3.005)+(15.012), (I-339)+(3.005)+(15.016), (I-339)+(3.005)+(15.025), (I-339)+(3.005)+(15.027), (I-339)+(3.005)+(15.047), (I-339)+(3.005)+(15.063), (I-339)+(3.005)+(15.064), (I-339)+(3.005)+(16.001), (I-339)+(3.005)+(16.002), (I-339)+(3.005)+(16.003), (I-339)+(3.005)+(16.004), (I-339)+(3.005)+(16.005), (I-339)+(3.005)+(16.006), (I-339)+(3.005)+(16.007), (I-339)+(3.005)+(16.008), (I-339)+(3.005)+(17.001), (I-339)+(3.005)+(17.002), (I-339)+(3.005)+(17.003), (I-339)+(3.005)+(17.004), (I-339)+(3.005)+(17.005), (I-339)+(3.005)+(17.006), (I-339)+(3.005)+(17.007), (I-339)+(3.005)+(17.008), (I-339)+(3.005)+(17.009), (I-339)+(3.005)+(17.010), (I-339)+(3.005)+(17.011), (I-339)+(3.005)+(17.012), (I-339)+(3.005)+(18.001), (I-339)+(3.006)+(3.025), (I-339)+(3.006)+(3.030), (I-339)+(3.006)+(3.031), (I-339)+(3.006)+(5.001), (I-339)+(3.006)+(5.002), (I-339)+(3.006)+(5.003), (I-339)+(3.006)+(5.004), (I-339)+(3.006)+(5.005), (I-339)+(3.006)+(5.006), (I-339)+(3.006)+(5.007), (I-339)+(3.006)+(5.008), (I-339)+(3.006)+(5.009), (I-339)+(3.006)+(5.010), (I-339)+(3.006)+(5.011), (I-339)+(3.006)+(5.012), (I-339)+(3.006)+(5.013), (I-339)+(3.006)+(5.014), (I-339)+(3.006)+(5.015), (I-339)+(3.006)+(5.016), (I-339)+(3.006)+(5.017), (I-339)+(3.006)+(5.018), (I-339)+(3.006)+(5.019), (I-339)+(3.006)+(5.020), (I-339)+(3.006)+(5.021), (I-339)+(3.006)+(5.022), (I-339)+(3.006)+(5.023), (I-339)+(3.006)+(6.001), (I-339)+(3.006)+(6.002), (I-339)+(3.006)+(6.003), (I-339)+(3.006)+(6.004), (I-339)+(3.006)+(7.001), (I-339)+(3.006)+(7.002), (I-339)+(3.006)+(7.003), (I-339)+(3.006)+(7.004), (I-339)+(3.006)+(7.005), (I-339)+(3.006)+(7.006), (I-339)+(3.006)+(9.001), (I-339)+(3.006)+(9.002), (I-339)+(3.006)+(9.003), (I-339)+(3.006)+(9.004), (I-339)+(3.006)+(9.005), (I-339)+(3.006)+(9.006), (I-339)+(3.006)+(9.007), (I-339)+(3.006)+(9.008), (I-339)+(3.006)+(9.009), (I-339)+(3.006)+(14.001), (I-339)+(3.006)+(14.002), (I-339)+(3.006)+(15.008), (I-339)+(3.006)+(15.011), (I-339)+(3.006)+(15.012), (I-339)+(3.006)+(15.016), (I-339)+(3.006)+(15.025), (I-339)+(3.006)+(15.027), (I-339)+(3.006)+(15.047), (I-339)+(3.006)+(15.063), (I-339)+(3.006)+(15.064), (I-339)+(3.006)+(16.001), (I-339)+(3.006)+(16.002), (I-339)+(3.006)+(16.003), (I-339)+(3.006)+(16.004), (I-339)+(3.006)+(16.005), (I-339)+(3.006)+(16.006), (I-339)+(3.006)+(16.007), (I-339)+(3.006)+(16.008), (I-339)+(3.006)+(17.001), (I-339)+(3.006)+(17.002), (I-339)+(3.006)+(17.003), (I-339)+(3.006)+(17.004), (I-339)+(3.006)+(17.005), (I-339)+(3.006)+(17.006), (I-339)+(3.006)+(17.007), (I-339)+(3.006)+(17.008), (I-339)+(3.006)+(17.009), (I-339)+(3.006)+(17.010), (I-339)+(3.006)+(17.011), (I-339)+(3.006)+(17.012), (I-339)+(3.006)+(18.001), (I-339)+(3.007)+(3.025), (I-339)+(3.007)+(3.030), (I-339)+(3.007)+(3.031), (I-339)+(3.007)+(5.001), (I-339)+(3.007)+(5.002), (I-339)+(3.007)+(5.003), (I-339)+(3.007)+(5.004), (I-339)+(3.007)+(5.005), (I-339)+(3.007)+(5.006), (I-339)+(3.007)+(5.007), (I-339)+(3.007)+(5.008), (I-339)+(3.007)+(5.009), (I-339)+(3.007)+(5.010), (I-339)+(3.007)+(5.011), (I-339)+(3.007)+(5.012), (I-339)+(3.007)+(5.013), (I-339)+(3.007)+(5.014), (I-339)+(3.007)+(5.015), (I-339)+(3.007)+(5.016), (I-339)+(3.007)+(5.017), (I-339)+(3.007)+(5.018), (I-339)+(3.007)+(5.019), (I-339)+(3.007)+(5.020), (I-339)+(3.007)+(5.021), (I-339)+(3.007)+(5.022), (I-339)+(3.007)+(5.023), (I-339)+(3.007)+(6.001), (I-339)+(3.007)+(6.002), (I-339)+(3.007)+(6.003), (I-339)+(3.007)+(6.004), (I-339)+(3.007)+(7.001), (I-339)+(3.007)+(7.002), (I-339)+(3.007)+(7.003), (I-339)+(3.007)+(7.004), (I-339)+(3.007)+(7.005), (I-339)+(3.007)+(7.006), (I-339)+(3.007)+(9.001), (I-339)+(3.007)+(9.002), (I-339)+(3.007)+(9.003), (I-339)+(3.007)+(9.004), (I-339)+(3.007)+(9.005), (I-339)+(3.007)+(9.006), (I-339)+(3.007)+(9.007), (I-339)+(3.007)+(9.008), (I-339)+(3.007)+(9.009), (I-339)+(3.007)+(14.001), (I-339)+(3.007)+(14.002), (I-339)+(3.007)+(15.008), (I-339)+(3.007)+(15.011), (I-339)+(3.007)+(15.012), (I-339)+(3.007)+(15.016), (I-339)+(3.007)+(15.025), (I-339)+(3.007)+(15.027), (I-339)+(3.007)+(15.047), (I-339)+(3.007)+(15.063), (I-339)+(3.007)+(15.064), (I-339)+(3.007)+(16.001), (I-339)+(3.007)+(16.002), (I-339)+(3.007)+(16.003), (I-339)+(3.007)+(16.004), (I-339)+(3.007)+(16.005), (I-339)+(3.007)+(16.006), (I-339)+(3.007)+(16.007), (I-339)+(3.007)+(16.008), (I-339)+(3.007)+(17.001), (I-339)+(3.007)+(17.002), (I-339)+(3.007)+(17.003), (I-339)+(3.007)+(17.004), (I-339)+(3.007)+(17.005), (I-339)+(3.007)+(17.006), (I-339)+(3.007)+(17.007), (I-339)+(3.007)+(17.008), (I-339)+(3.007)+(17.009), (I-339)+(3.007)+(17.010), (I-339)+(3.007)+(17.011), (I-339)+(3.007)+(17.012), (I-339)+(3.007)+(18.001), (I-339)+(3.008)+(3.025), (I-339)+(3.008)+(3.030), (I-339)+(3.008)+(3.031), (I-339)+(3.008)+(5.001), (I-339)+(3.008)+(5.002), (I-339)+(3.008)+(5.003), (I-339)+(3.008)+(5.004), (I-339)+(3.008)+(5.005), (I-339)+(3.008)+(5.006), (I-339)+(3.008)+(5.007), (I-339)+(3.008)+(5.008), (I-339)+(3.008)+(5.009), (I-339)+(3.008)+(5.010), (I-339)+(3.008)+(5.011), (I-339)+(3.008)+(5.012), (I-339)+(3.008)+(5.013), (I-339)+(3.008)+(5.014), (I-339)+(3.008)+(5.015), (I-339)+(3.008)+(5.016), (I-339)+(3.008)+(5.017), (I-339)+(3.008)+(5.018), (I-339)+(3.008)+(5.019), (I-339)+(3.008)+(5.020), (I-339)+(3.008)+(5.021), (I-339)+(3.008)+(5.022), (I-339)+(3.008)+(5.023), (I-339)+(3.008)+(6.001), (I-339)+(3.008)+(6.002), (I-339)+(3.008)+(6.003), (I-339)+(3.008)+(6.004), (I-339)+(3.008)+(7.001), (I-339)+(3.008)+(7.002), (I-339)+(3.008)+(7.003), (I-339)+(3.008)+(7.004), (I-339)+(3.008)+(7.005), (I-339)+(3.008)+(7.006), (I-339)+(3.008)+(9.001), (I-339)+(3.008)+(9.002), (I-339)+(3.008)+(9.003), (I-339)+(3.008)+(9.004), (I-339)+(3.008)+(9.005), (I-339)+(3.008)+(9.006), (I-339)+(3.008)+(9.007), (I-339)+(3.008)+(9.008), (I-339)+(3.008)+(9.009), (I-339)+(3.008)+(14.001), (I-339)+(3.008)+(14.002), (I-339)+(3.008)+(15.008), (I-339)+(3.008)+(15.011), (I-339)+(3.008)+(15.012), (I-339)+(3.008)+(15.016), (I-339)+(3.008)+(15.025), (I-339)+(3.008)+(15.027), (I-339)+(3.008)+(15.047), (I-339)+(3.008)+(15.063), (I-339)+(3.008)+(15.064), (I-339)+(3.008)+(16.001), (I-339)+(3.008)+(16.002), (I-339)+(3.008)+(16.003), (I-339)+(3.008)+(16.004), (I-339)+(3.008)+(16.005), (I-339)+(3.008)+(16.006), (I-339)+(3.008)+(16.007), (I-339)+(3.008)+(16.008), (I-339)+(3.008)+(17.001), (I-339)+(3.008)+(17.002), (I-339)+(3.008)+(17.003), (I-339)+(3.008)+(17.004), (I-339)+(3.008)+(17.005), (I-339)+(3.008)+(17.006), (I-339)+(3.008)+(17.007), (I-339)+(3.008)+(17.008), (I-339)+(3.008)+(17.009), (I-339)+(3.008)+(17.010), (I-339)+(3.008)+(17.011), (I-339)+(3.008)+(17.012), (I-339)+(3.008)+(18.001), (I-339)+(3.009)+(3.025), (I-339)+(3.009)+(3.030), (I-339)+(3.009)+(3.031), (I-339)+(3.009)+(5.001), (I-339)+(3.009)+(5.002), (I-339)+(3.009)+(5.003), (I-339)+(3.009)+(5.004), (I-339)+(3.009)+(5.005), (I-339)+(3.009)+(5.006), (I-339)+(3.009)+(5.007), (I-339)+(3.009)+(5.008), (I-339)+(3.009)+(5.009), (I-339)+(3.009)+(5.010), (I-339)+(3.009)+(5.011), (I-339)+(3.009)+(5.012), (I-339)+(3.009)+(5.013), (I-339)+(3.009)+(5.014), (I-339)+(3.009)+(5.015), (I-339)+(3.009)+(5.016), (I-339)+(3.009)+(5.017), (I-339)+(3.009)+(5.018), (I-339)+(3.009)+(5.019), (I-339)+(3.009)+(5.020), (I-339)+(3.009)+(5.021), (I-339)+(3.009)+(5.022), (I-339)+(3.009)+(5.023), (I-339)+(3.009)+(6.001), (I-339)+(3.009)+(6.002), (I-339)+(3.009)+(6.003), (I-339)+(3.009)+(6.004), (I-339)+(3.009)+(7.001), (I-339)+(3.009)+(7.002), (I-339)+(3.009)+(7.003), (I-339)+(3.009)+(7.004), (I-339)+(3.009)+(7.005), (I-339)+(3.009)+(7.006), (I-339)+(3.009)+(9.001), (I-339)+(3.009)+(9.002), (I-339)+(3.009)+(9.003), (I-339)+(3.009)+(9.004), (I-339)+(3.009)+(9.005), (I-339)+(3.009)+(9.006), (I-339)+(3.009)+(9.007), (I-339)+(3.009)+(9.008), (I-339)+(3.009)+(9.009), (I-339)+(3.009)+(14.001), (I-339)+(3.009)+(14.002), (I-339)+(3.009)+(15.008), (I-339)+(3.009)+(15.011), (I-339)+(3.009)+(15.012), (I-339)+(3.009)+(15.016), (I-339)+(3.009)+(15.025), (I-339)+(3.009)+(15.027), (I-339)+(3.009)+(15.047), (I-339)+(3.009)+(15.063), (I-339)+(3.009)+(15.064), (I-339)+(3.009)+(16.001), (I-339)+(3.009)+(16.002), (I-339)+(3.009)+(16.003), (I-339)+(3.009)+(16.004), (I-339)+(3.009)+(16.005), (I-339)+(3.009)+(16.006), (I-339)+(3.009)+(16.007), (I-339)+(3.009)+(16.008), (I-339)+(3.009)+(17.001), (I-339)+(3.009)+(17.002), (I-339)+(3.009)+(17.003), (I-339)+(3.009)+(17.004), (I-339)+(3.009)+(17.005), (I-339)+(3.009)+(17.006), (I-339)+(3.009)+(17.007), (I-339)+(3.009)+(17.008), (I-339)+(3.009)+(17.009), (I-339)+(3.009)+(17.010), (I-339)+(3.009)+(17.011), (I-339)+(3.009)+(17.012), (I-339)+(3.009)+(18.001), (I-339)+(3.010)+(3.025), (I-339)+(3.010)+(3.030), (I-339)+(3.010)+(3.031), (I-339)+(3.010)+(5.001), (I-339)+(3.010)+(5.002), (I-339)+(3.010)+(5.003), (I-339)+(3.010)+(5.004), (I-339)+(3.010)+(5.005), (I-339)+(3.010)+(5.006), (I-339)+(3.010)+(5.007), (I-339)+(3.010)+(5.008), (I-339)+(3.010)+(5.009), (I-339)+(3.010)+(5.010), (I-339)+(3.010)+(5.011), (I-339)+(3.010)+(5.012), (I-339)+(3.010)+(5.013), (I-339)+(3.010)+(5.014), (I-339)+(3.010)+(5.015), (I-339)+(3.010)+(5.016), (I-339)+(3.010)+(5.017), (I-339)+(3.010)+(5.018), (I-339)+(3.010)+(5.019), (I-339)+(3.010)+(5.020), (I-339)+(3.010)+(5.021), (I-339)+(3.010)+(5.022), (I-339)+(3.010)+(5.023), (I-339)+(3.010)+(6.001), (I-339)+(3.010)+(6.002), (I-339)+(3.010)+(6.003), (I-339)+(3.010)+(6.004), (I-339)+(3.010)+(7.001), (I-339)+(3.010)+(7.002), (I-339)+(3.010)+(7.003), (I-339)+(3.010)+(7.004), (I-339)+(3.010)+(7.005), (I-339)+(3.010)+(7.006), (I-339)+(3.010)+(9.001), (I-339)+(3.010)+(9.002), (I-339)+(3.010)+(9.003), (I-339)+(3.010)+(9.004), (I-339)+(3.010)+(9.005), (I-339)+(3.010)+(9.006), (I-339)+(3.010)+(9.007), (I-339)+(3.010)+(9.008), (I-339)+(3.010)+(9.009), (I-339)+(3.010)+(14.001), (I-339)+(3.010)+(14.002), (I-339)+(3.010)+(15.008), (I-339)+(3.010)+(15.011), (I-339)+(3.010)+(15.012), (I-339)+(3.010)+(15.016), (I-339)+(3.010)+(15.025), (I-339)+(3.010)+(15.027), (I-339)+(3.010)+(15.047), (I-339)+(3.010)+(15.063), (I-339)+(3.010)+(15.064), (I-339)+(3.010)+(16.001), (I-339)+(3.010)+(16.002), (I-339)+(3.010)+(16.003), (I-339)+(3.010)+(16.004), (I-339)+(3.010)+(16.005), (I-339)+(3.010)+(16.006), (I-339)+(3.010)+(16.007), (I-339)+(3.010)+(16.008), (I-339)+(3.010)+(17.001), (I-339)+(3.010)+(17.002), (I-339)+(3.010)+(17.003), (I-339)+(3.010)+(17.004), (I-339)+(3.010)+(17.005), (I-339)+(3.010)+(17.006), (I-339)+(3.010)+(17.007), (I-339)+(3.010)+(17.008), (I-339)+(3.010)+(17.009), (I-339)+(3.010)+(17.010), (I-339)+(3.010)+(17.011), (I-339)+(3.010)+(17.012), (I-339)+(3.010)+(18.001), (I-339)+(3.011)+(3.025), (I-339)+(3.011)+(3.030), (I-339)+(3.011)+(3.031), (I-339)+(3.011)+(5.001), (I-339)+(3.011)+(5.002), (I-339)+(3.011)+(5.003), (I-339)+(3.011)+(5.004), (I-339)+(3.011)+(5.005), (I-339)+(3.011)+(5.006), (I-339)+(3.011)+(5.007), (I-339)+(3.011)+(5.008), (I-339)+(3.011)+(5.009), (I-339)+(3.011)+(5.010), (I-339)+(3.011)+(5.011), (I-339)+(3.011)+(5.012), (I-339)+(3.011)+(5.013), (I-339)+(3.011)+(5.014), (I-339)+(3.011)+(5.015), (I-339)+(3.011)+(5.016), (I-339)+(3.011)+(5.017), (I-339)+(3.011)+(5.018), (I-339)+(3.011)+(5.019), (I-339)+(3.011)+(5.020), (I-339)+(3.011)+(5.021), (I-339)+(3.011)+(5.022), (I-339)+(3.011)+(5.023), (I-339)+(3.011)+(6.001), (I-339)+(3.011)+(6.002), (I-339)+(3.011)+(6.003), (I-339)+(3.011)+(6.004), (I-339)+(3.011)+(7.001), (I-339)+(3.011)+(7.002), (I-339)+(3.011)+(7.003), (I-339)+(3.011)+(7.004), (I-339)+(3.011)+(7.005), (I-339)+(3.011)+(7.006), (I-339)+(3.011)+(9.001), (I-339)+(3.011)+(9.002), (I-339)+(3.011)+(9.003), (I-339)+(3.011)+(9.004), (I-339)+(3.011)+(9.005), (I-339)+(3.011)+(9.006), (I-339)+(3.011)+(9.007), (I-339)+(3.011)+(9.008), (I-339)+(3.011)+(9.009), (I-339)+(3.011)+(14.001), (I-339)+(3.011)+(14.002), (I-339)+(3.011)+(15.008), (I-339)+(3.011)+(15.011), (I-339)+(3.011)+(15.012), (I-339)+(3.011)+(15.016), (I-339)+(3.011)+(15.025), (I-339)+(3.011)+(15.027), (I-339)+(3.011)+(15.047), (I-339)+(3.011)+(15.063), (I-339)+(3.011)+(15.064), (I-339)+(3.011)+(16.001), (I-339)+(3.011)+(16.002), (I-339)+(3.011)+(16.003), (I-339)+(3.011)+(16.004), (I-339)+(3.011)+(16.005), (I-339)+(3.011)+(16.006), (I-339)+(3.011)+(16.007), (I-339)+(3.011)+(16.008), (I-339)+(3.011)+(17.001), (I-339)+(3.011)+(17.002), (I-339)+(3.011)+(17.003), (I-339)+(3.011)+(17.004), (I-339)+(3.011)+(17.005), (I-339)+(3.011)+(17.006), (I-339)+(3.011)+(17.007), (I-339)+(3.011)+(17.008), (I-339)+(3.011)+(17.009), (I-339)+(3.011)+(17.010), (I-339)+(3.011)+(17.011), (I-339)+(3.011)+(17.012), (I-339)+(3.011)+(18.001), (I-339)+(3.012)+(3.025), (I-339)+(3.012)+(3.030), (I-339)+(3.012)+(3.031), (I-339)+(3.012)+(5.001), (I-339)+(3.012)+(5.002), (I-339)+(3.012)+(5.003), (I-339)+(3.012)+(5.004), (I-339)+(3.012)+(5.005), (I-339)+(3.012)+(5.006), (I-339)+(3.012)+(5.007), (I-339)+(3.012)+(5.008), (I-339)+(3.012)+(5.009), (I-339)+(3.012)+(5.010), (I-339)+(3.012)+(5.011), (I-339)+(3.012)+(5.012), (I-339)+(3.012)+(5.013), (I-339)+(3.012)+(5.014), (I-339)+(3.012)+(5.015), (I-339)+(3.012)+(5.016), (I-339)+(3.012)+(5.017), (I-339)+(3.012)+(5.018), (I-339)+(3.012)+(5.019), (I-339)+(3.012)+(5.020), (I-339)+(3.012)+(5.021), (I-339)+(3.012)+(5.022), (I-339)+(3.012)+(5.023), (I-339)+(3.012)+(6.001), (I-339)+(3.012)+(6.002), (I-339)+(3.012)+(6.003), (I-339)+(3.012)+(6.004), (I-339)+(3.012)+(7.001), (I-339)+(3.012)+(7.002), (I-339)+(3.012)+(7.003), (I-339)+(3.012)+(7.004), (I-339)+(3.012)+(7.005), (I-339)+(3.012)+(7.006), (I-339)+(3.012)+(9.001), (I-339)+(3.012)+(9.002), (I-339)+(3.012)+(9.003), (I-339)+(3.012)+(9.004), (I-339)+(3.012)+(9.005), (I-339)+(3.012)+(9.006), (I-339)+(3.012)+(9.007), (I-339)+(3.012)+(9.008), (I-339)+(3.012)+(9.009), (I-339)+(3.012)+(14.001), (I-339)+(3.012)+(14.002), (I-339)+(3.012)+(15.008), (I-339)+(3.012)+(15.011), (I-339)+(3.012)+(15.012), (I-339)+(3.012)+(15.016), (I-339)+(3.012)+(15.025), (I-339)+(3.012)+(15.027), (I-339)+(3.012)+(15.047), (I-339)+(3.012)+(15.063), (I-339)+(3.012)+(15.064), (I-339)+(3.012)+(16.001), (I-339)+(3.012)+(16.002), (I-339)+(3.012)+(16.003), (I-339)+(3.012)+(16.004), (I-339)+(3.012)+(16.005), (I-339)+(3.012)+(16.006), (I-339)+(3.012)+(16.007), (I-339)+(3.012)+(16.008), (I-339)+(3.012)+(17.001), (I-339)+(3.012)+(17.002), (I-339)+(3.012)+(17.003), (I-339)+(3.012)+(17.004), (I-339)+(3.012)+(17.005), (I-339)+(3.012)+(17.006), (I-339)+(3.012)+(17.007), (I-339)+(3.012)+(17.008), (I-339)+(3.012)+(17.009), (I-339)+(3.012)+(17.010), (I-339)+(3.012)+(17.011), (I-339)+(3.012)+(17.012), (I-339)+(3.012)+(18.001), (I-339)+(3.013)+(3.025), (I-339)+(3.013)+(3.030), (I-339)+(3.013)+(3.031), (I-339)+(3.013)+(5.001), (I-339)+(3.013)+(5.002), (I-339)+(3.013)+(5.003), (I-339)+(3.013)+(5.004), (I-339)+(3.013)+(5.005), (I-339)+(3.013)+(5.006), (I-339)+(3.013)+(5.007), (I-339)+(3.013)+(5.008), (I-339)+(3.013)+(5.009), (I-339)+(3.013)+(5.010), (I-339)+(3.013)+(5.011), (I-339)+(3.013)+(5.012), (I-339)+(3.013)+(5.013), (I-339)+(3.013)+(5.014), (I-339)+(3.013)+(5.015), (I-339)+(3.013)+(5.016), (I-339)+(3.013)+(5.017), (I-339)+(3.013)+(5.018), (I-339)+(3.013)+(5.019), (I-339)+(3.013)+(5.020), (I-339)+(3.013)+(5.021), (I-339)+(3.013)+(5.022), (I-339)+(3.013)+(5.023), (I-339)+(3.013)+(6.001), (I-339)+(3.013)+(6.002), (I-339)+(3.013)+(6.003), (I-339)+(3.013)+(6.004), (I-339)+(3.013)+(7.001), (I-339)+(3.013)+(7.002), (I-339)+(3.013)+(7.003), (I-339)+(3.013)+(7.004), (I-339)+(3.013)+(7.005), (I-339)+(3.013)+(7.006), (I-339)+(3.013)+(9.001), (I-339)+(3.013)+(9.002), (I-339)+(3.013)+(9.003), (I-339)+(3.013)+(9.004), (I-339)+(3.013)+(9.005), (I-339)+(3.013)+(9.006), (I-339)+(3.013)+(9.007), (I-339)+(3.013)+(9.008), (I-339)+(3.013)+(9.009), (I-339)+(3.013)+(14.001), (I-339)+(3.013)+(14.002), (I-339)+(3.013)+(15.008), (I-339)+(3.013)+(15.011), (I-339)+(3.013)+(15.012), (I-339)+(3.013)+(15.016), (I-339)+(3.013)+(15.025), (I-339)+(3.013)+(15.027), (I-339)+(3.013)+(15.047), (I-339)+(3.013)+(15.063), (I-339)+(3.013)+(15.064), (I-339)+(3.013)+(16.001), (I-339)+(3.013)+(16.002), (I-339)+(3.013)+(16.003), (I-339)+(3.013)+(16.004), (I-339)+(3.013)+(16.005), (I-339)+(3.013)+(16.006), (I-339)+(3.013)+(16.007), (I-339)+(3.013)+(16.008), (I-339)+(3.013)+(17.001), (I-339)+(3.013)+(17.002), (I-339)+(3.013)+(17.003), (I-339)+(3.013)+(17.004), (I-339)+(3.013)+(17.005), (I-339)+(3.013)+(17.006), (I-339)+(3.013)+(17.007), (I-339)+(3.013)+(17.008), (I-339)+(3.013)+(17.009), (I-339)+(3.013)+(17.010), (I-339)+(3.013)+(17.011), (I-339)+(3.013)+(17.012), (I-339)+(3.013)+(18.001), (I-339)+(3.014)+(3.025), (I-339)+(3.014)+(3.030), (I-339)+(3.014)+(3.031), (I-339)+(3.014)+(5.001), (I-339)+(3.014)+(5.002), (I-339)+(3.014)+(5.003), (I-339)+(3.014)+(5.004), (I-339)+(3.014)+(5.005), (I-339)+(3.014)+(5.006), (I-339)+(3.014)+(5.007), (I-339)+(3.014)+(5.008), (I-339)+(3.014)+(5.009), (I-339)+(3.014)+(5.010), (I-339)+(3.014)+(5.011), (I-339)+(3.014)+(5.012), (I-339)+(3.014)+(5.013), (I-339)+(3.014)+(5.014), (I-339)+(3.014)+(5.015), (I-339)+(3.014)+(5.016), (I-339)+(3.014)+(5.017), (I-339)+(3.014)+(5.018), (I-339)+(3.014)+(5.019), (I-339)+(3.014)+(5.020), (I-339)+(3.014)+(5.021), (I-339)+(3.014)+(5.022), (I-339)+(3.014)+(5.023), (I-339)+(3.014)+(6.001), (I-339)+(3.014)+(6.002), (I-339)+(3.014)+(6.003), (I-339)+(3.014)+(6.004), (I-339)+(3.014)+(7.001), (I-339)+(3.014)+(7.002), (I-339)+(3.014)+(7.003), (I-339)+(3.014)+(7.004), (I-339)+(3.014)+(7.005), (I-339)+(3.014)+(7.006), (I-339)+(3.014)+(9.001), (I-339)+(3.014)+(9.002), (I-339)+(3.014)+(9.003), (I-339)+(3.014)+(9.004), (I-339)+(3.014)+(9.005), (I-339)+(3.014)+(9.006), (I-339)+(3.014)+(9.007), (I-339)+(3.014)+(9.008), (I-339)+(3.014)+(9.009), (I-339)+(3.014)+(14.001), (I-339)+(3.014)+(14.002), (I-339)+(3.014)+(15.008), (I-339)+(3.014)+(15.011), (I-339)+(3.014)+(15.012), (I-339)+(3.014)+(15.016), (I-339)+(3.014)+(15.025), (I-339)+(3.014)+(15.027), (I-339)+(3.014)+(15.047), (I-339)+(3.014)+(15.063), (I-339)+(3.014)+(15.064), (I-339)+(3.014)+(16.001), (I-339)+(3.014)+(16.002), (I-339)+(3.014)+(16.003), (I-339)+(3.014)+(16.004), (I-339)+(3.014)+(16.005), (I-339)+(3.014)+(16.006), (I-339)+(3.014)+(16.007), (I-339)+(3.014)+(16.008), (I-339)+(3.014)+(17.001), (I-339)+(3.014)+(17.002), (I-339)+(3.014)+(17.003), (I-339)+(3.014)+(17.004), (I-339)+(3.014)+(17.005), (I-339)+(3.014)+(17.006), (I-339)+(3.014)+(17.007), (I-339)+(3.014)+(17.008), (I-339)+(3.014)+(17.009), (I-339)+(3.014)+(17.010), (I-339)+(3.014)+(17.011), (I-339)+(3.014)+(17.012), (I-339)+(3.014)+(18.001), (I-339)+(3.015)+(3.025), (I-339)+(3.015)+(3.030), (I-339)+(3.015)+(3.031), (I-339)+(3.015)+(5.001), (I-339)+(3.015)+(5.002), (I-339)+(3.015)+(5.003), (I-339)+(3.015)+(5.004), (I-339)+(3.015)+(5.005), (I-339)+(3.015)+(5.006), (I-339)+(3.015)+(5.007), (I-339)+(3.015)+(5.008), (I-339)+(3.015)+(5.009), (I-339)+(3.015)+(5.010), (I-339)+(3.015)+(5.011), (I-339)+(3.015)+(5.012), (I-339)+(3.015)+(5.013), (I-339)+(3.015)+(5.014), (I-339)+(3.015)+(5.015), (I-339)+(3.015)+(5.016), (I-339)+(3.015)+(5.017), (I-339)+(3.015)+(5.018), (I-339)+(3.015)+(5.019), (I-339)+(3.015)+(5.020), (I-339)+(3.015)+(5.021), (I-339)+(3.015)+(5.022), (I-339)+(3.015)+(5.023), (I-339)+(3.015)+(6.001), (I-339)+(3.015)+(6.002), (I-339)+(3.015)+(6.003), (I-339)+(3.015)+(6.004), (I-339)+(3.015)+(7.001), (I-339)+(3.015)+(7.002), (I-339)+(3.015)+(7.003), (I-339)+(3.015)+(7.004), (I-339)+(3.015)+(7.005), (I-339)+(3.015)+(7.006), (I-339)+(3.015)+(9.001), (I-339)+(3.015)+(9.002), (I-339)+(3.015)+(9.003), (I-339)+(3.015)+(9.004), (I-339)+(3.015)+(9.005), (I-339)+(3.015)+(9.006), (I-339)+(3.015)+(9.007), (I-339)+(3.015)+(9.008), (I-339)+(3.015)+(9.009), (I-339)+(3.015)+(14.001), (I-339)+(3.015)+(14.002), (I-339)+(3.015)+(15.008), (I-339)+(3.015)+(15.011), (I-339)+(3.015)+(15.012), (I-339)+(3.015)+(15.016), (I-339)+(3.015)+(15.025), (I-339)+(3.015)+(15.027), (I-339)+(3.015)+(15.047), (I-339)+(3.015)+(15.063), (I-339)+(3.015)+(15.064), (I-339)+(3.015)+(16.001), (I-339)+(3.015)+(16.002), (I-339)+(3.015)+(16.003), (I-339)+(3.015)+(16.004), (I-339)+(3.015)+(16.005), (I-339)+(3.015)+(16.006), (I-339)+(3.015)+(16.007), (I-339)+(3.015)+(16.008), (I-339)+(3.015)+(17.001), (I-339)+(3.015)+(17.002), (I-339)+(3.015)+(17.003), (I-339)+(3.015)+(17.004), (I-339)+(3.015)+(17.005), (I-339)+(3.015)+(17.006), (I-339)+(3.015)+(17.007), (I-339)+(3.015)+(17.008), (I-339)+(3.015)+(17.009), (I-339)+(3.015)+(17.010), (I-339)+(3.015)+(17.011), (I-339)+(3.015)+(17.012), (I-339)+(3.015)+(18.001), (I-339)+(3.016)+(3.025), (I-339)+(3.016)+(3.030), (I-339)+(3.016)+(3.031), (I-339)+(3.016)+(5.001), (I-339)+(3.016)+(5.002), (I-339)+(3.016)+(5.003), (I-339)+(3.016)+(5.004), (I-339)+(3.016)+(5.005), (I-339)+(3.016)+(5.006), (I-339)+(3.016)+(5.007), (I-339)+(3.016)+(5.008), (I-339)+(3.016)+(5.009), (I-339)+(3.016)+(5.010), (I-339)+(3.016)+(5.011), (I-339)+(3.016)+(5.012), (I-339)+(3.016)+(5.013), (I-339)+(3.016)+(5.014), (I-339)+(3.016)+(5.015), (I-339)+(3.016)+(5.016), (I-339)+(3.016)+(5.017), (I-339)+(3.016)+(5.018), (I-339)+(3.016)+(5.019), (I-339)+(3.016)+(5.020), (I-339)+(3.016)+(5.021), (I-339)+(3.016)+(5.022), (I-339)+(3.016)+(5.023), (I-339)+(3.016)+(6.001), (I-339)+(3.016)+(6.002), (I-339)+(3.016)+(6.003), (I-339)+(3.016)+(6.004), (I-339)+(3.016)+(7.001), (I-339)+(3.016)+(7.002), (I-339)+(3.016)+(7.003), (I-339)+(3.016)+(7.004), (I-339)+(3.016)+(7.005), (I-339)+(3.016)+(7.006), (I-339)+(3.016)+(9.001), (I-339)+(3.016)+(9.002), (I-339)+(3.016)+(9.003), (I-339)+(3.016)+(9.004), (I-339)+(3.016)+(9.005), (I-339)+(3.016)+(9.006), (I-339)+(3.016)+(9.007), (I-339)+(3.016)+(9.008), (I-339)+(3.016)+(9.009), (I-339)+(3.016)+(14.001), (I-339)+(3.016)+(14.002), (I-339)+(3.016)+(15.008), (I-339)+(3.016)+(15.011), (I-339)+(3.016)+(15.012), (I-339)+(3.016)+(15.016), (I-339)+(3.016)+(15.025), (I-339)+(3.016)+(15.027), (I-339)+(3.016)+(15.047), (I-339)+(3.016)+(15.063), (I-339)+(3.016)+(15.064), (I-339)+(3.016)+(16.001), (I-339)+(3.016)+(16.002), (I-339)+(3.016)+(16.003), (I-339)+(3.016)+(16.004), (I-339)+(3.016)+(16.005), (I-339)+(3.016)+(16.006), (I-339)+(3.016)+(16.007), (I-339)+(3.016)+(16.008), (I-339)+(3.016)+(17.001), (I-339)+(3.016)+(17.002), (I-339)+(3.016)+(17.003), (I-339)+(3.016)+(17.004), (I-339)+(3.016)+(17.005), (I-339)+(3.016)+(17.006), (I-339)+(3.016)+(17.007), (I-339)+(3.016)+(17.008), (I-339)+(3.016)+(17.009), (I-339)+(3.016)+(17.010), (I-339)+(3.016)+(17.011), (I-339)+(3.016)+(17.012), (I-339)+(3.016)+(18.001), (I-339)+(3.017)+(3.025), (I-339)+(3.017)+(3.030), (I-339)+(3.017)+(3.031), (I-339)+(3.017)+(5.001), (I-339)+(3.017)+(5.002), (I-339)+(3.017)+(5.003), (I-339)+(3.017)+(5.004), (I-339)+(3.017)+(5.005), (I-339)+(3.017)+(5.006), (I-339)+(3.017)+(5.007), (I-339)+(3.017)+(5.008), (I-339)+(3.017)+(5.009), (I-339)+(3.017)+(5.010), (I-339)+(3.017)+(5.011), (I-339)+(3.017)+(5.012), (I-339)+(3.017)+(5.013), (I-339)+(3.017)+(5.014), (I-339)+(3.017)+(5.015), (I-339)+(3.017)+(5.016), (I-339)+(3.017)+(5.017), (I-339)+(3.017)+(5.018), (I-339)+(3.017)+(5.019), (I-339)+(3.017)+(5.020), (I-339)+(3.017)+(5.021), (I-339)+(3.017)+(5.022), (I-339)+(3.017)+(5.023), (I-339)+(3.017)+(6.001), (I-339)+(3.017)+(6.002), (I-339)+(3.017)+(6.003), (I-339)+(3.017)+(6.004), (I-339)+(3.017)+(7.001), (I-339)+(3.017)+(7.002), (I-339)+(3.017)+(7.003), (I-339)+(3.017)+(7.004), (I-339)+(3.017)+(7.005), (I-339)+(3.017)+(7.006), (I-339)+(3.017)+(9.001), (I-339)+(3.017)+(9.002), (I-339)+(3.017)+(9.003), (I-339)+(3.017)+(9.004), (I-339)+(3.017)+(9.005), (I-339)+(3.017)+(9.006), (I-339)+(3.017)+(9.007), (I-339)+(3.017)+(9.008), (I-339)+(3.017)+(9.009), (I-339)+(3.017)+(14.001), (I-339)+(3.017)+(14.002), (I-339)+(3.017)+(15.008), (I-339)+(3.017)+(15.011), (I-339)+(3.017)+(15.012), (I-339)+(3.017)+(15.016), (I-339)+(3.017)+(15.025), (I-339)+(3.017)+(15.027), (I-339)+(3.017)+(15.047), (I-339)+(3.017)+(15.063), (I-339)+(3.017)+(15.064), (I-339)+(3.017)+(16.001), (I-339)+(3.017)+(16.002), (I-339)+(3.017)+(16.003), (I-339)+(3.017)+(16.004), (I-339)+(3.017)+(16.005), (I-339)+(3.017)+(16.006), (I-339)+(3.017)+(16.007), (I-339)+(3.017)+(16.008), (I-339)+(3.017)+(17.001), (I-339)+(3.017)+(17.002), (I-339)+(3.017)+(17.003), (I-339)+(3.017)+(17.004), (I-339)+(3.017)+(17.005), (I-339)+(3.017)+(17.006), (I-339)+(3.017)+(17.007), (I-339)+(3.017)+(17.008), (I-339)+(3.017)+(17.009), (I-339)+(3.017)+(17.010), (I-339)+(3.017)+(17.011), (I-339)+(3.017)+(17.012), (I-339)+(3.017)+(18.001), (I-339)+(3.018)+(3.025), (I-339)+(3.018)+(3.030), (I-339)+(3.018)+(3.031), (I-339)+(3.018)+(5.001), (I-339)+(3.018)+(5.002), (I-339)+(3.018)+(5.003), (I-339)+(3.018)+(5.004), (I-339)+(3.018)+(5.005), (I-339)+(3.018)+(5.006), (I-339)+(3.018)+(5.007), (I-339)+(3.018)+(5.008), (I-339)+(3.018)+(5.009), (I-339)+(3.018)+(5.010), (I-339)+(3.018)+(5.011), (I-339)+(3.018)+(5.012), (I-339)+(3.018)+(5.013), (I-339)+(3.018)+(5.014), (I-339)+(3.018)+(5.015), (I-339)+(3.018)+(5.016), (I-339)+(3.018)+(5.017), (I-339)+(3.018)+(5.018), (I-339)+(3.018)+(5.019), (I-339)+(3.018)+(5.020), (I-339)+(3.018)+(5.021), (I-339)+(3.018)+(5.022), (I-339)+(3.018)+(5.023), (I-339)+(3.018)+(6.001), (I-339)+(3.018)+(6.002), (I-339)+(3.018)+(6.003), (I-339)+(3.018)+(6.004), (I-339)+(3.018)+(7.001), (I-339)+(3.018)+(7.002), (I-339)+(3.018)+(7.003), (I-339)+(3.018)+(7.004), (I-339)+(3.018)+(7.005), (I-339)+(3.018)+(7.006), (I-339)+(3.018)+(9.001), (I-339)+(3.018)+(9.002), (I-339)+(3.018)+(9.003), (I-339)+(3.018)+(9.004), (I-339)+(3.018)+(9.005), (I-339)+(3.018)+(9.006), (I-339)+(3.018)+(9.007), (I-339)+(3.018)+(9.008), (I-339)+(3.018)+(9.009), (I-339)+(3.018)+(14.001), (I-339)+(3.018)+(14.002), (I-339)+(3.018)+(15.008), (I-339)+(3.018)+(15.011), (I-339)+(3.018)+(15.012), (I-339)+(3.018)+(15.016), (I-339)+(3.018)+(15.025), (I-339)+(3.018)+(15.027), (I-339)+(3.018)+(15.047), (I-339)+(3.018)+(15.063), (I-339)+(3.018)+(15.064), (I-339)+(3.018)+(16.001), (I-339)+(3.018)+(16.002), (I-339)+(3.018)+(16.003), (I-339)+(3.018)+(16.004), (I-339)+(3.018)+(16.005), (I-339)+(3.018)+(16.006), (I-339)+(3.018)+(16.007), (I-339)+(3.018)+(16.008), (I-339)+(3.018)+(17.001), (I-339)+(3.018)+(17.002), (I-339)+(3.018)+(17.003), (I-339)+(3.018)+(17.004), (I-339)+(3.018)+(17.005), (I-339)+(3.018)+(17.006), (I-339)+(3.018)+(17.007), (I-339)+(3.018)+(17.008), (I-339)+(3.018)+(17.009), (I-339)+(3.018)+(17.010), (I-339)+(3.018)+(17.011), (I-339)+(3.018)+(17.012), (I-339)+(3.018)+(18.001), (I-339)+(3.019)+(3.025), (I-339)+(3.019)+(3.030), (I-339)+(3.019)+(3.031), (I-339)+(3.019)+(5.001), (I-339)+(3.019)+(5.002), (I-339)+(3.019)+(5.003), (I-339)+(3.019)+(5.004), (I-339)+(3.019)+(5.005), (I-339)+(3.019)+(5.006), (I-339)+(3.019)+(5.007), (I-339)+(3.019)+(5.008), (I-339)+(3.019)+(5.009), (I-339)+(3.019)+(5.010), (I-339)+(3.019)+(5.011), (I-339)+(3.019)+(5.012), (I-339)+(3.019)+(5.013), (I-339)+(3.019)+(5.014), (I-339)+(3.019)+(5.015), (I-339)+(3.019)+(5.016), (I-339)+(3.019)+(5.017), (I-339)+(3.019)+(5.018), (I-339)+(3.019)+(5.019), (I-339)+(3.019)+(5.020), (I-339)+(3.019)+(5.021), (I-339)+(3.019)+(5.022), (I-339)+(3.019)+(5.023), (I-339)+(3.019)+(6.001), (I-339)+(3.019)+(6.002), (I-339)+(3.019)+(6.003), (I-339)+(3.019)+(6.004), (I-339)+(3.019)+(7.001), (I-339)+(3.019)+(7.002), (I-339)+(3.019)+(7.003), (I-339)+(3.019)+(7.004), (I-339)+(3.019)+(7.005), (I-339)+(3.019)+(7.006), (I-339)+(3.019)+(9.001), (I-339)+(3.019)+(9.002), (I-339)+(3.019)+(9.003), (I-339)+(3.019)+(9.004), (I-339)+(3.019)+(9.005), (I-339)+(3.019)+(9.006), (I-339)+(3.019)+(9.007), (I-339)+(3.019)+(9.008), (I-339)+(3.019)+(9.009), (I-339)+(3.019)+(14.001), (I-339)+(3.019)+(14.002), (I-339)+(3.019)+(15.008), (I-339)+(3.019)+(15.011), (I-339)+(3.019)+(15.012), (I-339)+(3.019)+(15.016), (I-339)+(3.019)+(15.025), (I-339)+(3.019)+(15.027), (I-339)+(3.019)+(15.047), (I-339)+(3.019)+(15.063), (I-339)+(3.019)+(15.064), (I-339)+(3.019)+(16.001), (I-339)+(3.019)+(16.002), (I-339)+(3.019)+(16.003), (I-339)+(3.019)+(16.004), (I-339)+(3.019)+(16.005), (I-339)+(3.019)+(16.006), (I-339)+(3.019)+(16.007), (I-339)+(3.019)+(16.008), (I-339)+(3.019)+(17.001), (I-339)+(3.019)+(17.002), (I-339)+(3.019)+(17.003), (I-339)+(3.019)+(17.004), (I-339)+(3.019)+(17.005), (I-339)+(3.019)+(17.006), (I-339)+(3.019)+(17.007), (I-339)+(3.019)+(17.008), (I-339)+(3.019)+(17.009), (I-339)+(3.019)+(17.010), (I-339)+(3.019)+(17.011), (I-339)+(3.019)+(17.012), (I-339)+(3.019)+(18.001), (I-339)+(3.020)+(3.025), (I-339)+(3.020)+(3.030), (I-339)+(3.020)+(3.031), (I-339)+(3.020)+(5.001), (I-339)+(3.020)+(5.002), (I-339)+(3.020)+(5.003), (I-339)+(3.020)+(5.004), (I-339)+(3.020)+(5.005), (I-339)+(3.020)+(5.006), (I-339)+(3.020)+(5.007), (I-339)+(3.020)+(5.008), (I-339)+(3.020)+(5.009), (I-339)+(3.020)+(5.010), (I-339)+(3.020)+(5.011), (I-339)+(3.020)+(5.012), (I-339)+(3.020)+(5.013), (I-339)+(3.020)+(5.014), (I-339)+(3.020)+(5.015), (I-339)+(3.020)+(5.016), (I-339)+(3.020)+(5.017), (I-339)+(3.020)+(5.018), (I-339)+(3.020)+(5.019), (I-339)+(3.020)+(5.020), (I-339)+(3.020)+(5.021), (I-339)+(3.020)+(5.022), (I-339)+(3.020)+(5.023), (I-339)+(3.020)+(6.001), (I-339)+(3.020)+(6.002), (I-339)+(3.020)+(6.003), (I-339)+(3.020)+(6.004), (I-339)+(3.020)+(7.001), (I-339)+(3.020)+(7.002), (I-339)+(3.020)+(7.003), (I-339)+(3.020)+(7.004), (I-339)+(3.020)+(7.005), (I-339)+(3.020)+(7.006), (I-339)+(3.020)+(9.001), (I-339)+(3.020)+(9.002), (I-339)+(3.020)+(9.003), (I-339)+(3.020)+(9.004), (I-339)+(3.020)+(9.005), (I-339)+(3.020)+(9.006), (I-339)+(3.020)+(9.007), (I-339)+(3.020)+(9.008), (I-339)+(3.020)+(9.009), (I-339)+(3.020)+(14.001), (I-339)+(3.020)+(14.002), (I-339)+(3.020)+(15.008), (I-339)+(3.020)+(15.011), (I-339)+(3.020)+(15.012), (I-339)+(3.020)+(15.016), (I-339)+(3.020)+(15.025), (I-339)+(3.020)+(15.027), (I-339)+(3.020)+(15.047), (I-339)+(3.020)+(15.063), (I-339)+(3.020)+(15.064), (I-339)+(3.020)+(16.001), (I-339)+(3.020)+(16.002), (I-339)+(3.020)+(16.003), (I-339)+(3.020)+(16.004), (I-339)+(3.020)+(16.005), (I-339)+(3.020)+(16.006), (I-339)+(3.020)+(16.007), (I-339)+(3.020)+(16.008), (I-339)+(3.020)+(17.001), (I-339)+(3.020)+(17.002), (I-339)+(3.020)+(17.003), (I-339)+(3.020)+(17.004), (I-339)+(3.020)+(17.005), (I-339)+(3.020)+(17.006), (I-339)+(3.020)+(17.007), (I-339)+(3.020)+(17.008), (I-339)+(3.020)+(17.009), (I-339)+(3.020)+(17.010), (I-339)+(3.020)+(17.011), (I-339)+(3.020)+(17.012), (I-339)+(3.020)+(18.001), (I-339)+(3.021)+(3.025), (I-339)+(3.021)+(3.030), (I-339)+(3.021)+(3.031), (I-339)+(3.021)+(5.001), (I-339)+(3.021)+(5.002), (I-339)+(3.021)+(5.003), (I-339)+(3.021)+(5.004), (I-339)+(3.021)+(5.005), (I-339)+(3.021)+(5.006), (I-339)+(3.021)+(5.007), (I-339)+(3.021)+(5.008), (I-339)+(3.021)+(5.009), (I-339)+(3.021)+(5.010), (I-339)+(3.021)+(5.011), (I-339)+(3.021)+(5.012), (I-339)+(3.021)+(5.013), (I-339)+(3.021)+(5.014), (I-339)+(3.021)+(5.015), (I-339)+(3.021)+(5.016), (I-339)+(3.021)+(5.017), (I-339)+(3.021)+(5.018), (I-339)+(3.021)+(5.019), (I-339)+(3.021)+(5.020), (I-339)+(3.021)+(5.021), (I-339)+(3.021)+(5.022), (I-339)+(3.021)+(5.023), (I-339)+(3.021)+(6.001), (I-339)+(3.021)+(6.002), (I-339)+(3.021)+(6.003), (I-339)+(3.021)+(6.004), (I-339)+(3.021)+(7.001), (I-339)+(3.021)+(7.002), (I-339)+(3.021)+(7.003), (I-339)+(3.021)+(7.004), (I-339)+(3.021)+(7.005), (I-339)+(3.021)+(7.006), (I-339)+(3.021)+(9.001), (I-339)+(3.021)+(9.002), (I-339)+(3.021)+(9.003), (I-339)+(3.021)+(9.004), (I-339)+(3.021)+(9.005), (I-339)+(3.021)+(9.006), (I-339)+(3.021)+(9.007), (I-339)+(3.021)+(9.008), (I-339)+(3.021)+(9.009), (I-339)+(3.021)+(14.001), (I-339)+(3.021)+(14.002), (I-339)+(3.021)+(15.008), (I-339)+(3.021)+(15.011), (I-339)+(3.021)+(15.012), (I-339)+(3.021)+(15.016), (I-339)+(3.021)+(15.025), (I-339)+(3.021)+(15.027), (I-339)+(3.021)+(15.047), (I-339)+(3.021)+(15.063), (I-339)+(3.021)+(15.064), (I-339)+(3.021)+(16.001), (I-339)+(3.021)+(16.002), (I-339)+(3.021)+(16.003), (I-339)+(3.021)+(16.004), (I-339)+(3.021)+(16.005), (I-339)+(3.021)+(16.006), (I-339)+(3.021)+(16.007), (I-339)+(3.021)+(16.008), (I-339)+(3.021)+(17.001), (I-339)+(3.021)+(17.002), (I-339)+(3.021)+(17.003), (I-339)+(3.021)+(17.004), (I-339)+(3.021)+(17.005), (I-339)+(3.021)+(17.006), (I-339)+(3.021)+(17.007), (I-339)+(3.021)+(17.008), (I-339)+(3.021)+(17.009), (I-339)+(3.021)+(17.010), (I-339)+(3.021)+(17.011), (I-339)+(3.021)+(17.012), (I-339)+(3.021)+(18.001), (I-339)+(3.022)+(3.025), (I-339)+(3.022)+(3.030), (I-339)+(3.022)+(3.031), (I-339)+(3.022)+(5.001), (I-339)+(3.022)+(5.002), (I-339)+(3.022)+(5.003), (I-339)+(3.022)+(5.004), (I-339)+(3.022)+(5.005), (I-339)+(3.022)+(5.006), (I-339)+(3.022)+(5.007), (I-339)+(3.022)+(5.008), (I-339)+(3.022)+(5.009), (I-339)+(3.022)+(5.010), (I-339)+(3.022)+(5.011), (I-339)+(3.022)+(5.012), (I-339)+(3.022)+(5.013), (I-339)+(3.022)+(5.014), (I-339)+(3.022)+(5.015), (I-339)+(3.022)+(5.016), (I-339)+(3.022)+(5.017), (I-339)+(3.022)+(5.018), (I-339)+(3.022)+(5.019), (I-339)+(3.022)+(5.020), (I-339)+(3.022)+(5.021), (I-339)+(3.022)+(5.022), (I-339)+(3.022)+(5.023), (I-339)+(3.022)+(6.001), (I-339)+(3.022)+(6.002), (I-339)+(3.022)+(6.003), (I-339)+(3.022)+(6.004), (I-339)+(3.022)+(7.001), (I-339)+(3.022)+(7.002), (I-339)+(3.022)+(7.003), (I-339)+(3.022)+(7.004), (I-339)+(3.022)+(7.005), (I-339)+(3.022)+(7.006), (I-339)+(3.022)+(9.001), (I-339)+(3.022)+(9.002), (I-339)+(3.022)+(9.003), (I-339)+(3.022)+(9.004), (I-339)+(3.022)+(9.005), (I-339)+(3.022)+(9.006), (I-339)+(3.022)+(9.007), (I-339)+(3.022)+(9.008), (I-339)+(3.022)+(9.009), (I-339)+(3.022)+(14.001), (I-339)+(3.022)+(14.002), (I-339)+(3.022)+(15.008), (I-339)+(3.022)+(15.011), (I-339)+(3.022)+(15.012), (I-339)+(3.022)+(15.016), (I-339)+(3.022)+(15.025), (I-339)+(3.022)+(15.027), (I-339)+(3.022)+(15.047), (I-339)+(3.022)+(15.063), (I-339)+(3.022)+(15.064), (I-339)+(3.022)+(16.001), (I-339)+(3.022)+(16.002), (I-339)+(3.022)+(16.003), (I-339)+(3.022)+(16.004), (I-339)+(3.022)+(16.005), (I-339)+(3.022)+(16.006), (I-339)+(3.022)+(16.007), (I-339)+(3.022)+(16.008), (I-339)+(3.022)+(17.001), (I-339)+(3.022)+(17.002), (I-339)+(3.022)+(17.003), (I-339)+(3.022)+(17.004), (I-339)+(3.022)+(17.005), (I-339)+(3.022)+(17.006), (I-339)+(3.022)+(17.007), (I-339)+(3.022)+(17.008), (I-339)+(3.022)+(17.009), (I-339)+(3.022)+(17.010), (I-339)+(3.022)+(17.011), (I-339)+(3.022)+(17.012), (I-339)+(3.022)+(18.001), (I-339)+(3.023)+(3.025), (I-339)+(3.023)+(3.030), (I-339)+(3.023)+(3.031), (I-339)+(3.023)+(5.001), (I-339)+(3.023)+(5.002), (I-339)+(3.023)+(5.003), (I-339)+(3.023)+(5.004), (I-339)+(3.023)+(5.005), (I-339)+(3.023)+(5.006), (I-339)+(3.023)+(5.007), (I-339)+(3.023)+(5.008), (I-339)+(3.023)+(5.009), (I-339)+(3.023)+(5.010), (I-339)+(3.023)+(5.011), (I-339)+(3.023)+(5.012), (I-339)+(3.023)+(5.013), (I-339)+(3.023)+(5.014), (I-339)+(3.023)+(5.015), (I-339)+(3.023)+(5.016), (I-339)+(3.023)+(5.017), (I-339)+(3.023)+(5.018), (I-339)+(3.023)+(5.019), (I-339)+(3.023)+(5.020), (I-339)+(3.023)+(5.021), (I-339)+(3.023)+(5.022), (I-339)+(3.023)+(5.023), (I-339)+(3.023)+(6.001), (I-339)+(3.023)+(6.002), (I-339)+(3.023)+(6.003), (I-339)+(3.023)+(6.004), (I-339)+(3.023)+(7.001), (I-339)+(3.023)+(7.002), (I-339)+(3.023)+(7.003), (I-339)+(3.023)+(7.004), (I-339)+(3.023)+(7.005), (I-339)+(3.023)+(7.006), (I-339)+(3.023)+(9.001), (I-339)+(3.023)+(9.002), (I-339)+(3.023)+(9.003), (I-339)+(3.023)+(9.004), (I-339)+(3.023)+(9.005), (I-339)+(3.023)+(9.006), (I-339)+(3.023)+(9.007), (I-339)+(3.023)+(9.008), (I-339)+(3.023)+(9.009), (I-339)+(3.023)+(14.001), (I-339)+(3.023)+(14.002), (I-339)+(3.023)+(15.008), (I-339)+(3.023)+(15.011), (I-339)+(3.023)+(15.012), (I-339)+(3.023)+(15.016), (I-339)+(3.023)+(15.025), (I-339)+(3.023)+(15.027), (I-339)+(3.023)+(15.047), (I-339)+(3.023)+(15.063), (I-339)+(3.023)+(15.064), (I-339)+(3.023)+(16.001), (I-339)+(3.023)+(16.002), (I-339)+(3.023)+(16.003), (I-339)+(3.023)+(16.004), (I-339)+(3.023)+(16.005), (I-339)+(3.023)+(16.006), (I-339)+(3.023)+(16.007), (I-339)+(3.023)+(16.008), (I-339)+(3.023)+(17.001), (I-339)+(3.023)+(17.002), (I-339)+(3.023)+(17.003), (I-339)+(3.023)+(17.004), (I-339)+(3.023)+(17.005), (I-339)+(3.023)+(17.006), (I-339)+(3.023)+(17.007), (I-339)+(3.023)+(17.008), (I-339)+(3.023)+(17.009), (I-339)+(3.023)+(17.010), (I-339)+(3.023)+(17.011), (I-339)+(3.023)+(17.012), (I-339)+(3.023)+(18.001), (I-339)+(3.024)+(3.025), (I-339)+(3.024)+(3.030), (I-339)+(3.024)+(3.031), (I-339)+(3.024)+(5.001), (I-339)+(3.024)+(5.002), (I-339)+(3.024)+(5.003), (I-339)+(3.024)+(5.004), (I-339)+(3.024)+(5.005), (I-339)+(3.024)+(5.006), (I-339)+(3.024)+(5.007), (I-339)+(3.024)+(5.008), (I-339)+(3.024)+(5.009), (I-339)+(3.024)+(5.010), (I-339)+(3.024)+(5.011), (I-339)+(3.024)+(5.012), (I-339)+(3.024)+(5.013), (I-339)+(3.024)+(5.014), (I-339)+(3.024)+(5.015), (I-339)+(3.024)+(5.016), (I-339)+(3.024)+(5.017), (I-339)+(3.024)+(5.018), (I-339)+(3.024)+(5.019), (I-339)+(3.024)+(5.020), (I-339)+(3.024)+(5.021), (I-339)+(3.024)+(5.022), (I-339)+(3.024)+(5.023), (I-339)+(3.024)+(6.001), (I-339)+(3.024)+(6.002), (I-339)+(3.024)+(6.003), (I-339)+(3.024)+(6.004), (I-339)+(3.024)+(7.001), (I-339)+(3.024)+(7.002), (I-339)+(3.024)+(7.003), (I-339)+(3.024)+(7.004), (I-339)+(3.024)+(7.005), (I-339)+(3.024)+(7.006), (I-339)+(3.024)+(9.001), (I-339)+(3.024)+(9.002), (I-339)+(3.024)+(9.003), (I-339)+(3.024)+(9.004), (I-339)+(3.024)+(9.005), (I-339)+(3.024)+(9.006), (I-339)+(3.024)+(9.007), (I-339)+(3.024)+(9.008), (I-339)+(3.024)+(9.009), (I-339)+(3.024)+(14.001), (I-339)+(3.024)+(14.002), (I-339)+(3.024)+(15.008), (I-339)+(3.024)+(15.011), (I-339)+(3.024)+(15.012), (I-339)+(3.024)+(15.016), (I-339)+(3.024)+(15.025), (I-339)+(3.024)+(15.027), (I-339)+(3.024)+(15.047), (I-339)+(3.024)+(15.063), (I-339)+(3.024)+(15.064), (I-339)+(3.024)+(16.001), (I-339)+(3.024)+(16.002), (I-339)+(3.024)+(16.003), (I-339)+(3.024)+(16.004), (I-339)+(3.024)+(16.005), (I-339)+(3.024)+(16.006), (I-339)+(3.024)+(16.007), (I-339)+(3.024)+(16.008), (I-339)+(3.024)+(17.001), (I-339)+(3.024)+(17.002), (I-339)+(3.024)+(17.003), (I-339)+(3.024)+(17.004), (I-339)+(3.024)+(17.005), (I-339)+(3.024)+(17.006), (I-339)+(3.024)+(17.007), (I-339)+(3.024)+(17.008), (I-339)+(3.024)+(17.009), (I-339)+(3.024)+(17.010), (I-339)+(3.024)+(17.011), (I-339)+(3.024)+(17.012), (I-339)+(3.024)+(18.001), (I-339)+(3.025)+(3.030), (I-339)+(3.025)+(3.031), (I-339)+(3.025)+(5.001), (I-339)+(3.025)+(5.002), (I-339)+(3.025)+(5.003), (I-339)+(3.025)+(5.004), (I-339)+(3.025)+(5.005), (I-339)+(3.025)+(5.006), (I-339)+(3.025)+(5.007), (I-339)+(3.025)+(5.008), (I-339)+(3.025)+(5.009), (I-339)+(3.025)+(5.010), (I-339)+(3.025)+(5.011), (I-339)+(3.025)+(5.012), (I-339)+(3.025)+(5.013), (I-339)+(3.025)+(5.014), (I-339)+(3.025)+(5.015), (I-339)+(3.025)+(5.016), (I-339)+(3.025)+(5.017), (I-339)+(3.025)+(5.018), (I-339)+(3.025)+(5.019), (I-339)+(3.025)+(5.020), (I-339)+(3.025)+(5.021), (I-339)+(3.025)+(5.022), (I-339)+(3.025)+(5.023), (I-339)+(3.025)+(6.001), (I-339)+(3.025)+(6.002), (I-339)+(3.025)+(6.003), (I-339)+(3.025)+(6.004), (I-339)+(3.025)+(7.001), (I-339)+(3.025)+(7.002), (I-339)+(3.025)+(7.003), (I-339)+(3.025)+(7.004), (I-339)+(3.025)+(7.005), (I-339)+(3.025)+(7.006), (I-339)+(3.025)+(9.001), (I-339)+(3.025)+(9.002), (I-339)+(3.025)+(9.003), (I-339)+(3.025)+(9.004), (I-339)+(3.025)+(9.005), (I-339)+(3.025)+(9.006), (I-339)+(3.025)+(9.007), (I-339)+(3.025)+(9.008), (I-339)+(3.025)+(9.009), (I-339)+(3.025)+(14.001), (I-339)+(3.025)+(14.002), (I-339)+(3.025)+(15.008), (I-339)+(3.025)+(15.011), (I-339)+(3.025)+(15.012), (I-339)+(3.025)+(15.016), (I-339)+(3.025)+(15.025), (I-339)+(3.025)+(15.027), (I-339)+(3.025)+(15.047), (I-339)+(3.025)+(15.063), (I-339)+(3.025)+(15.064), (I-339)+(3.025)+(16.001), (I-339)+(3.025)+(16.002), (I-339)+(3.025)+(16.003), (I-339)+(3.025)+(16.004), (I-339)+(3.025)+(16.005), (I-339)+(3.025)+(16.006), (I-339)+(3.025)+(16.007), (I-339)+(3.025)+(16.008), (I-339)+(3.025)+(17.001), (I-339)+(3.025)+(17.002), (I-339)+(3.025)+(17.003), (I-339)+(3.025)+(17.004), (I-339)+(3.025)+(17.005), (I-339)+(3.025)+(17.006), (I-339)+(3.025)+(17.007), (I-339)+(3.025)+(17.008), (I-339)+(3.025)+(17.009), (I-339)+(3.025)+(17.010), (I-339)+(3.025)+(17.011), (I-339)+(3.025)+(17.012), (I-339)+(3.025)+(18.001), (I-339)+(3.026)+(3.025), (I-339)+(3.026)+(3.030), (I-339)+(3.026)+(3.031), (I-339)+(3.026)+(5.001), (I-339)+(3.026)+(5.002), (I-339)+(3.026)+(5.003), (I-339)+(3.026)+(5.004), (I-339)+(3.026)+(5.005), (I-339)+(3.026)+(5.006), (I-339)+(3.026)+(5.007), (I-339)+(3.026)+(5.008), (I-339)+(3.026)+(5.009), (I-339)+(3.026)+(5.010), (I-339)+(3.026)+(5.011), (I-339)+(3.026)+(5.012), (I-339)+(3.026)+(5.013), (I-339)+(3.026)+(5.014), (I-339)+(3.026)+(5.015), (I-339)+(3.026)+(5.016), (I-339)+(3.026)+(5.017), (I-339)+(3.026)+(5.018), (I-339)+(3.026)+(5.019), (I-339)+(3.026)+(5.020), (I-339)+(3.026)+(5.021), (I-339)+(3.026)+(5.022), (I-339)+(3.026)+(5.023), (I-339)+(3.026)+(6.001), (I-339)+(3.026)+(6.002), (I-339)+(3.026)+(6.003), (I-339)+(3.026)+(6.004), (I-339)+(3.026)+(7.001), (I-339)+(3.026)+(7.002), (I-339)+(3.026)+(7.003), (I-339)+(3.026)+(7.004), (I-339)+(3.026)+(7.005), (I-339)+(3.026)+(7.006), (I-339)+(3.026)+(9.001), (I-339)+(3.026)+(9.002), (I-339)+(3.026)+(9.003), (I-339)+(3.026)+(9.004), (I-339)+(3.026)+(9.005), (I-339)+(3.026)+(9.006), (I-339)+(3.026)+(9.007), (I-339)+(3.026)+(9.008), (I-339)+(3.026)+(9.009), (I-339)+(3.026)+(14.001), (I-339)+(3.026)+(14.002), (I-339)+(3.026)+(15.008), (I-339)+(3.026)+(15.011), (I-339)+(3.026)+(15.012), (I-339)+(3.026)+(15.016), (I-339)+(3.026)+(15.025), (I-339)+(3.026)+(15.027), (I-339)+(3.026)+(15.047), (I-339)+(3.026)+(15.063), (I-339)+(3.026)+(15.064), (I-339)+(3.026)+(16.001), (I-339)+(3.026)+(16.002), (I-339)+(3.026)+(16.003), (I-339)+(3.026)+(16.004), (I-339)+(3.026)+(16.005), (I-339)+(3.026)+(16.006), (I-339)+(3.026)+(16.007), (I-339)+(3.026)+(16.008), (I-339)+(3.026)+(17.001), (I-339)+(3.026)+(17.002), (I-339)+(3.026)+(17.003), (I-339)+(3.026)+(17.004), (I-339)+(3.026)+(17.005), (I-339)+(3.026)+(17.006), (I-339)+(3.026)+(17.007), (I-339)+(3.026)+(17.008), (I-339)+(3.026)+(17.009), (I-339)+(3.026)+(17.010), (I-339)+(3.026)+(17.011), (I-339)+(3.026)+(17.012), (I-339)+(3.026)+(18.001), (I-339)+(3.027)+(3.025), (I-339)+(3.027)+(3.030), (I-339)+(3.027)+(3.031), (I-339)+(3.027)+(5.001), (I-339)+(3.027)+(5.002), (I-339)+(3.027)+(5.003), (I-339)+(3.027)+(5.004), (I-339)+(3.027)+(5.005), (I-339)+(3.027)+(5.006), (I-339)+(3.027)+(5.007), (I-339)+(3.027)+(5.008), (I-339)+(3.027)+(5.009), (I-339)+(3.027)+(5.010), (I-339)+(3.027)+(5.011), (I-339)+(3.027)+(5.012), (I-339)+(3.027)+(5.013), (I-339)+(3.027)+(5.014), (I-339)+(3.027)+(5.015), (I-339)+(3.027)+(5.016), (I-339)+(3.027)+(5.017), (I-339)+(3.027)+(5.018), (I-339)+(3.027)+(5.019), (I-339)+(3.027)+(5.020), (I-339)+(3.027)+(5.021), (I-339)+(3.027)+(5.022), (I-339)+(3.027)+(5.023), (I-339)+(3.027)+(6.001), (I-339)+(3.027)+(6.002), (I-339)+(3.027)+(6.003), (I-339)+(3.027)+(6.004), (I-339)+(3.027)+(7.001), (I-339)+(3.027)+(7.002), (I-339)+(3.027)+(7.003), (I-339)+(3.027)+(7.004), (I-339)+(3.027)+(7.005), (I-339)+(3.027)+(7.006), (I-339)+(3.027)+(9.001), (I-339)+(3.027)+(9.002), (I-339)+(3.027)+(9.003), (I-339)+(3.027)+(9.004), (I-339)+(3.027)+(9.005), (I-339)+(3.027)+(9.006), (I-339)+(3.027)+(9.007), (I-339)+(3.027)+(9.008), (I-339)+(3.027)+(9.009), (I-339)+(3.027)+(14.001), (I-339)+(3.027)+(14.002), (I-339)+(3.027)+(15.008), (I-339)+(3.027)+(15.011), (I-339)+(3.027)+(15.012), (I-339)+(3.027)+(15.016), (I-339)+(3.027)+(15.025), (I-339)+(3.027)+(15.027), (I-339)+(3.027)+(15.047), (I-339)+(3.027)+(15.063), (I-339)+(3.027)+(15.064), (I-339)+(3.027)+(16.001), (I-339)+(3.027)+(16.002), (I-339)+(3.027)+(16.003), (I-339)+(3.027)+(16.004), (I-339)+(3.027)+(16.005), (I-339)+(3.027)+(16.006), (I-339)+(3.027)+(16.007), (I-339)+(3.027)+(16.008), (I-339)+(3.027)+(17.001), (I-339)+(3.027)+(17.002), (I-339)+(3.027)+(17.003), (I-339)+(3.027)+(17.004), (I-339)+(3.027)+(17.005), (I-339)+(3.027)+(17.006), (I-339)+(3.027)+(17.007), (I-339)+(3.027)+(17.008), (I-339)+(3.027)+(17.009), (I-339)+(3.027)+(17.010), (I-339)+(3.027)+(17.011), (I-339)+(3.027)+(17.012), (I-339)+(3.027)+(18.001), (I-339)+(3.028)+(3.025), (I-339)+(3.028)+(3.030), (I-339)+(3.028)+(3.031), (I-339)+(3.028)+(5.001), (I-339)+(3.028)+(5.002), (I-339)+(3.028)+(5.003), (I-339)+(3.028)+(5.004), (I-339)+(3.028)+(5.005), (I-339)+(3.028)+(5.006), (I-339)+(3.028)+(5.007), (I-339)+(3.028)+(5.008), (I-339)+(3.028)+(5.009), (I-339)+(3.028)+(5.010), (I-339)+(3.028)+(5.011), (I-339)+(3.028)+(5.012), (I-339)+(3.028)+(5.013), (I-339)+(3.028)+(5.014), (I-339)+(3.028)+(5.015), (I-339)+(3.028)+(5.016), (I-339)+(3.028)+(5.017), (I-339)+(3.028)+(5.018), (I-339)+(3.028)+(5.019), (I-339)+(3.028)+(5.020), (I-339)+(3.028)+(5.021), (I-339)+(3.028)+(5.022), (I-339)+(3.028)+(5.023), (I-339)+(3.028)+(6.001), (I-339)+(3.028)+(6.002), (I-339)+(3.028)+(6.003), (I-339)+(3.028)+(6.004), (I-339)+(3.028)+(7.001), (I-339)+(3.028)+(7.002), (I-339)+(3.028)+(7.003), (I-339)+(3.028)+(7.004), (I-339)+(3.028)+(7.005), (I-339)+(3.028)+(7.006), (I-339)+(3.028)+(9.001), (I-339)+(3.028)+(9.002), (I-339)+(3.028)+(9.003), (I-339)+(3.028)+(9.004), (I-339)+(3.028)+(9.005), (I-339)+(3.028)+(9.006), (I-339)+(3.028)+(9.007), (I-339)+(3.028)+(9.008), (I-339)+(3.028)+(9.009), (I-339)+(3.028)+(14.001), (I-339)+(3.028)+(14.002), (I-339)+(3.028)+(15.008), (I-339)+(3.028)+(15.011), (I-339)+(3.028)+(15.012), (I-339)+(3.028)+(15.016), (I-339)+(3.028)+(15.025), (I-339)+(3.028)+(15.027), (I-339)+(3.028)+(15.047), (I-339)+(3.028)+(15.063), (I-339)+(3.028)+(15.064), (I-339)+(3.028)+(16.001), (I-339)+(3.028)+(16.002), (I-339)+(3.028)+(16.003), (I-339)+(3.028)+(16.004), (I-339)+(3.028)+(16.005), (I-339)+(3.028)+(16.006), (I-339)+(3.028)+(16.007), (I-339)+(3.028)+(16.008), (I-339)+(3.028)+(17.001), (I-339)+(3.028)+(17.002), (I-339)+(3.028)+(17.003), (I-339)+(3.028)+(17.004), (I-339)+(3.028)+(17.005), (I-339)+(3.028)+(17.006), (I-339)+(3.028)+(17.007), (I-339)+(3.028)+(17.008), (I-339)+(3.028)+(17.009), (I-339)+(3.028)+(17.010), (I-339)+(3.028)+(17.011), (I-339)+(3.028)+(17.012), (I-339)+(3.028)+(18.001), (I-339)+(3.029)+(3.025), (I-339)+(3.029)+(3.030), (I-339)+(3.029)+(3.031), (I-339)+(3.029)+(5.001), (I-339)+(3.029)+(5.002), (I-339)+(3.029)+(5.003), (I-339)+(3.029)+(5.004), (I-339)+(3.029)+(5.005), (I-339)+(3.029)+(5.006), (I-339)+(3.029)+(5.007), (I-339)+(3.029)+(5.008), (I-339)+(3.029)+(5.009), (I-339)+(3.029)+(5.010), (I-339)+(3.029)+(5.011), (I-339)+(3.029)+(5.012), (I-339)+(3.029)+(5.013), (I-339)+(3.029)+(5.014), (I-339)+(3.029)+(5.015), (I-339)+(3.029)+(5.016), (I-339)+(3.029)+(5.017), (I-339)+(3.029)+(5.018), (I-339)+(3.029)+(5.019), (I-339)+(3.029)+(5.020), (I-339)+(3.029)+(5.021), (I-339)+(3.029)+(5.022), (I-339)+(3.029)+(5.023), (I-339)+(3.029)+(6.001), (I-339)+(3.029)+(6.002), (I-339)+(3.029)+(6.003), (I-339)+(3.029)+(6.004), (I-339)+(3.029)+(7.001), (I-339)+(3.029)+(7.002), (I-339)+(3.029)+(7.003), (I-339)+(3.029)+(7.004), (I-339)+(3.029)+(7.005), (I-339)+(3.029)+(7.006), (I-339)+(3.029)+(9.001), (I-339)+(3.029)+(9.002), (I-339)+(3.029)+(9.003), (I-339)+(3.029)+(9.004), (I-339)+(3.029)+(9.005), (I-339)+(3.029)+(9.006), (I-339)+(3.029)+(9.007), (I-339)+(3.029)+(9.008), (I-339)+(3.029)+(9.009), (I-339)+(3.029)+(14.001), (I-339)+(3.029)+(14.002), (I-339)+(3.029)+(15.008), (I-339)+(3.029)+(15.011), (I-339)+(3.029)+(15.012), (I-339)+(3.029)+(15.016), (I-339)+(3.029)+(15.025), (I-339)+(3.029)+(15.027), (I-339)+(3.029)+(15.047), (I-339)+(3.029)+(15.063), (I-339)+(3.029)+(15.064), (I-339)+(3.029)+(16.001), (I-339)+(3.029)+(16.002), (I-339)+(3.029)+(16.003), (I-339)+(3.029)+(16.004), (I-339)+(3.029)+(16.005), (I-339)+(3.029)+(16.006), (I-339)+(3.029)+(16.007), (I-339)+(3.029)+(16.008), (I-339)+(3.029)+(17.001), (I-339)+(3.029)+(17.002), (I-339)+(3.029)+(17.003), (I-339)+(3.029)+(17.004), (I-339)+(3.029)+(17.005), (I-339)+(3.029)+(17.006), (I-339)+(3.029)+(17.007), (I-339)+(3.029)+(17.008), (I-339)+(3.029)+(17.009), (I-339)+(3.029)+(17.010), (I-339)+(3.029)+(17.011), (I-339)+(3.029)+(17.012), (I-339)+(3.029)+(18.001), (I-339)+(3.030)+(3.025), (I-339)+(3.030)+(3.031), (I-339)+(3.030)+(5.001), (I-339)+(3.030)+(5.002), (I-339)+(3.030)+(5.003), (I-339)+(3.030)+(5.004), (I-339)+(3.030)+(5.005), (I-339)+(3.030)+(5.006), (I-339)+(3.030)+(5.007), (I-339)+(3.030)+(5.008), (I-339)+(3.030)+(5.009), (I-339)+(3.030)+(5.010), (I-339)+(3.030)+(5.011), (I-339)+(3.030)+(5.012), (I-339)+(3.030)+(5.013), (I-339)+(3.030)+(5.014), (I-339)+(3.030)+(5.015), (I-339)+(3.030)+(5.016), (I-339)+(3.030)+(5.017), (I-339)+(3.030)+(5.018), (I-339)+(3.030)+(5.019), (I-339)+(3.030)+(5.020), (I-339)+(3.030)+(5.021), (I-339)+(3.030)+(5.022), (I-339)+(3.030)+(5.023), (I-339)+(3.030)+(6.001), (I-339)+(3.030)+(6.002), (I-339)+(3.030)+(6.003), (I-339)+(3.030)+(6.004), (I-339)+(3.030)+(7.001), (I-339)+(3.030)+(7.002), (I-339)+(3.030)+(7.003), (I-339)+(3.030)+(7.004), (I-339)+(3.030)+(7.005), (I-339)+(3.030)+(7.006), (I-339)+(3.030)+(9.001), (I-339)+(3.030)+(9.002), (I-339)+(3.030)+(9.003), (I-339)+(3.030)+(9.004), (I-339)+(3.030)+(9.005), (I-339)+(3.030)+(9.006), (I-339)+(3.030)+(9.007), (I-339)+(3.030)+(9.008), (I-339)+(3.030)+(9.009), (I-339)+(3.030)+(14.001), (I-339)+(3.030)+(14.002), (I-339)+(3.030)+(15.008), (I-339)+(3.030)+(15.011), (I-339)+(3.030)+(15.012), (I-339)+(3.030)+(15.016), (I-339)+(3.030)+(15.025), (I-339)+(3.030)+(15.027), (I-339)+(3.030)+(15.047), (I-339)+(3.030)+(15.063), (I-339)+(3.030)+(15.064), (I-339)+(3.030)+(16.001), (I-339)+(3.030)+(16.002), (I-339)+(3.030)+(16.003), (I-339)+(3.030)+(16.004), (I-339)+(3.030)+(16.005), (I-339)+(3.030)+(16.006), (I-339)+(3.030)+(16.007), (I-339)+(3.030)+(16.008), (I-339)+(3.030)+(17.001), (I-339)+(3.030)+(17.002), (I-339)+(3.030)+(17.003), (I-339)+(3.030)+(17.004), (I-339)+(3.030)+(17.005), (I-339)+(3.030)+(17.006), (I-339)+(3.030)+(17.007), (I-339)+(3.030)+(17.008), (I-339)+(3.030)+(17.009), (I-339)+(3.030)+(17.010), (I-339)+(3.030)+(17.011), (I-339)+(3.030)+(17.012), (I-339)+(3.030)+(18.001), (I-339)+(3.031)+(3.025), (I-339)+(3.031)+(3.030), (I-339)+(3.031)+(5.001), (I-339)+(3.031)+(5.002), (I-339)+(3.031)+(5.003), (I-339)+(3.031)+(5.004), (I-339)+(3.031)+(5.005), (I-339)+(3.031)+(5.006), (I-339)+(3.031)+(5.007), (I-339)+(3.031)+(5.008), (I-339)+(3.031)+(5.009), (I-339)+(3.031)+(5.010), (I-339)+(3.031)+(5.011), (I-339)+(3.031)+(5.012), (I-339)+(3.031)+(5.013), (I-339)+(3.031)+(5.014), (I-339)+(3.031)+(5.015), (I-339)+(3.031)+(5.016), (I-339)+(3.031)+(5.017), (I-339)+(3.031)+(5.018), (I-339)+(3.031)+(5.019), (I-339)+(3.031)+(5.020), (I-339)+(3.031)+(5.021), (I-339)+(3.031)+(5.022), (I-339)+(3.031)+(5.023), (I-339)+(3.031)+(6.001), (I-339)+(3.031)+(6.002), (I-339)+(3.031)+(6.003), (I-339)+(3.031)+(6.004), (I-339)+(3.031)+(7.001), (I-339)+(3.031)+(7.002), (I-339)+(3.031)+(7.003), (I-339)+(3.031)+(7.004), (I-339)+(3.031)+(7.005), (I-339)+(3.031)+(7.006), (I-339)+(3.031)+(9.001), (I-339)+(3.031)+(9.002), (I-339)+(3.031)+(9.003), (I-339)+(3.031)+(9.004), (I-339)+(3.031)+(9.005), (I-339)+(3.031)+(9.006), (I-339)+(3.031)+(9.007), (I-339)+(3.031)+(9.008), (I-339)+(3.031)+(9.009), (I-339)+(3.031)+(14.001), (I-339)+(3.031)+(14.002), (I-339)+(3.031)+(15.008), (I-339)+(3.031)+(15.011), (I-339)+(3.031)+(15.012), (I-339)+(3.031)+(15.016), (I-339)+(3.031)+(15.025), (I-339)+(3.031)+(15.027), (I-339)+(3.031)+(15.047), (I-339)+(3.031)+(15.063), (I-339)+(3.031)+(15.064), (I-339)+(3.031)+(16.001), (I-339)+(3.031)+(16.002), (I-339)+(3.031)+(16.003), (I-339)+(3.031)+(16.004), (I-339)+(3.031)+(16.005), (I-339)+(3.031)+(16.006), (I-339)+(3.031)+(16.007), (I-339)+(3.031)+(16.008), (I-339)+(3.031)+(17.001), (I-339)+(3.031)+(17.002), (I-339)+(3.031)+(17.003), (I-339)+(3.031)+(17.004), (I-339)+(3.031)+(17.005), (I-339)+(3.031)+(17.006), (I-339)+(3.031)+(17.007), (I-339)+(3.031)+(17.008), (I-339)+(3.031)+(17.009), (I-339)+(3.031)+(17.010), (I-339)+(3.031)+(17.011), (I-339)+(3.031)+(17.012), (I-339)+(3.031)+(18.001), (I-339)+(5.001)+(9.001), (I-339)+(5.001)+(9.002), (I-339)+(5.001)+(9.003), (I-339)+(5.001)+(9.004), (I-339)+(5.001)+(9.005), (I-339)+(5.001)+(9.006), (I-339)+(5.001)+(9.007), (I-339)+(5.001)+(9.008), (I-339)+(5.001)+(9.009), (I-339)+(5.001)+(15.012), (I-339)+(5.001)+(15.016), (I-339)+(5.001)+(15.025), (I-339)+(5.001)+(15.027), (I-339)+(5.001)+(15.047), (I-339)+(5.001)+(15.063), (I-339)+(5.001)+(15.064), (I-339)+(5.002)+(9.001), (I-339)+(5.002)+(9.002), (I-339)+(5.002)+(9.003), (I-339)+(5.002)+(9.004), (I-339)+(5.002)+(9.005), (I-339)+(5.002)+(9.006), (I-339)+(5.002)+(9.007), (I-339)+(5.002)+(9.008), (I-339)+(5.002)+(9.009), (I-339)+(5.002)+(15.012), (I-339)+(5.002)+(15.016), (I-339)+(5.002)+(15.025), (I-339)+(5.002)+(15.027), (I-339)+(5.002)+(15.047), (I-339)+(5.002)+(15.063), (I-339)+(5.002)+(15.064), (I-339)+(5.003)+(9.001), (I-339)+(5.003)+(9.002), (I-339)+(5.003)+(9.003), (I-339)+(5.003)+(9.004), (I-339)+(5.003)+(9.005), (I-339)+(5.003)+(9.006), (I-339)+(5.003)+(9.007), (I-339)+(5.003)+(9.008), (I-339)+(5.003)+(9.009), (I-339)+(5.003)+(15.012), (I-339)+(5.003)+(15.016), (I-339)+(5.003)+(15.025), (I-339)+(5.003)+(15.027), (I-339)+(5.003)+(15.047), (I-339)+(5.003)+(15.063), (I-339)+(5.003)+(15.064), (I-339)+(5.004)+(9.001), (I-339)+(5.004)+(9.002), (I-339)+(5.004)+(9.003), (I-339)+(5.004)+(9.004), (I-339)+(5.004)+(9.005), (I-339)+(5.004)+(9.006), (I-339)+(5.004)+(9.007), (I-339)+(5.004)+(9.008), (I-339)+(5.004)+(9.009), (I-339)+(5.004)+(15.012), (I-339)+(5.004)+(15.016), (I-339)+(5.004)+(15.025), (I-339)+(5.004)+(15.027), (I-339)+(5.004)+(15.047), (I-339)+(5.004)+(15.063), (I-339)+(5.004)+(15.064), (I-339)+(5.005)+(9.001), (I-339)+(5.005)+(9.002), (I-339)+(5.005)+(9.003), (I-339)+(5.005)+(9.004), (I-339)+(5.005)+(9.005), (I-339)+(5.005)+(9.006), (I-339)+(5.005)+(9.007), (I-339)+(5.005)+(9.008), (I-339)+(5.005)+(9.009), (I-339)+(5.005)+(15.012), (I-339)+(5.005)+(15.016), (I-339)+(5.005)+(15.025), (I-339)+(5.005)+(15.027), (I-339)+(5.005)+(15.047), (I-339)+(5.005)+(15.063), (I-339)+(5.005)+(15.064), (I-339)+(5.006)+(9.001), (I-339)+(5.006)+(9.002), (I-339)+(5.006)+(9.003), (I-339)+(5.006)+(9.004), (I-339)+(5.006)+(9.005), (I-339)+(5.006)+(9.006), (I-339)+(5.006)+(9.007), (I-339)+(5.006)+(9.008), (I-339)+(5.006)+(9.009), (I-339)+(5.006)+(15.012), (I-339)+(5.006)+(15.016), (I-339)+(5.006)+(15.025), (I-339)+(5.006)+(15.027), (I-339)+(5.006)+(15.047), (I-339)+(5.006)+(15.063), (I-339)+(5.006)+(15.064), (I-339)+(5.007)+(9.001), (I-339)+(5.007)+(9.002), (I-339)+(5.007)+(9.003), (I-339)+(5.007)+(9.004), (I-339)+(5.007)+(9.005), (I-339)+(5.007)+(9.006), (I-339)+(5.007)+(9.007), (I-339)+(5.007)+(9.008), (I-339)+(5.007)+(9.009), (I-339)+(5.007)+(15.012), (I-339)+(5.007)+(15.016), (I-339)+(5.007)+(15.025), (I-339)+(5.007)+(15.027), (I-339)+(5.007)+(15.047), (I-339)+(5.007)+(15.063), (I-339)+(5.007)+(15.064), (I-339)+(5.008)+(9.001), (I-339)+(5.008)+(9.002), (I-339)+(5.008)+(9.003), (I-339)+(5.008)+(9.004), (I-339)+(5.008)+(9.005), (I-339)+(5.008)+(9.006), (I-339)+(5.008)+(9.007), (I-339)+(5.008)+(9.008), (I-339)+(5.008)+(9.009), (I-339)+(5.008)+(15.012), (I-339)+(5.008)+(15.016), (I-339)+(5.008)+(15.025), (I-339)+(5.008)+(15.027), (I-339)+(5.008)+(15.047), (I-339)+(5.008)+(15.063), (I-339)+(5.008)+(15.064), (I-339)+(5.009)+(9.001), (I-339)+(5.009)+(9.002), (I-339)+(5.009)+(9.003), (I-339)+(5.009)+(9.004), (I-339)+(5.009)+(9.005), (I-339)+(5.009)+(9.006), (I-339)+(5.009)+(9.007), (I-339)+(5.009)+(9.008), (I-339)+(5.009)+(9.009), (I-339)+(5.009)+(15.012), (I-339)+(5.009)+(15.016), (I-339)+(5.009)+(15.025), (I-339)+(5.009)+(15.027), (I-339)+(5.009)+(15.047), (I-339)+(5.009)+(15.063), (I-339)+(5.009)+(15.064), (I-339)+(5.010)+(9.001), (I-339)+(5.010)+(9.002), (I-339)+(5.010)+(9.003), (I-339)+(5.010)+(9.004), (I-339)+(5.010)+(9.005), (I-339)+(5.010)+(9.006), (I-339)+(5.010)+(9.007), (I-339)+(5.010)+(9.008), (I-339)+(5.010)+(9.009), (I-339)+(5.010)+(15.012), (I-339)+(5.010)+(15.016), (I-339)+(5.010)+(15.025), (I-339)+(5.010)+(15.027), (I-339)+(5.010)+(15.047), (I-339)+(5.010)+(15.063), (I-339)+(5.010)+(15.064), (I-339)+(5.011)+(9.001), (I-339)+(5.011)+(9.002), (I-339)+(5.011)+(9.003), (I-339)+(5.011)+(9.004), (I-339)+(5.011)+(9.005), (I-339)+(5.011)+(9.006), (I-339)+(5.011)+(9.007), (I-339)+(5.011)+(9.008), (I-339)+(5.011)+(9.009), (I-339)+(5.011)+(15.012), (I-339)+(5.011)+(15.016), (I-339)+(5.011)+(15.025), (I-339)+(5.011)+(15.027), (I-339)+(5.011)+(15.047), (I-339)+(5.011)+(15.063), (I-339)+(5.011)+(15.064), (I-339)+(5.012)+(9.001), (I-339)+(5.012)+(9.002), (I-339)+(5.012)+(9.003), (I-339)+(5.012)+(9.004), (I-339)+(5.012)+(9.005), (I-339)+(5.012)+(9.006), (I-339)+(5.012)+(9.007), (I-339)+(5.012)+(9.008), (I-339)+(5.012)+(9.009), (I-339)+(5.012)+(15.012), (I-339)+(5.012)+(15.016), (I-339)+(5.012)+(15.025), (I-339)+(5.012)+(15.027), (I-339)+(5.012)+(15.047), (I-339)+(5.012)+(15.063), (I-339)+(5.012)+(15.064), (I-339)+(5.013)+(9.001), (I-339)+(5.013)+(9.002), (I-339)+(5.013)+(9.003), (I-339)+(5.013)+(9.004), (I-339)+(5.013)+(9.005), (I-339)+(5.013)+(9.006), (I-339)+(5.013)+(9.007), (I-339)+(5.013)+(9.008), (I-339)+(5.013)+(9.009), (I-339)+(5.013)+(15.012), (I-339)+(5.013)+(15.016), (I-339)+(5.013)+(15.025), (I-339)+(5.013)+(15.027), (I-339)+(5.013)+(15.047), (I-339)+(5.013)+(15.063), (I-339)+(5.013)+(15.064), (I-339)+(5.014)+(9.001), (I-339)+(5.014)+(9.002), (I-339)+(5.014)+(9.003), (I-339)+(5.014)+(9.004), (I-339)+(5.014)+(9.005), (I-339)+(5.014)+(9.006), (I-339)+(5.014)+(9.007), (I-339)+(5.014)+(9.008), (I-339)+(5.014)+(9.009), (I-339)+(5.014)+(15.012), (I-339)+(5.014)+(15.016), (I-339)+(5.014)+(15.025), (I-339)+(5.014)+(15.027), (I-339)+(5.014)+(15.047), (I-339)+(5.014)+(15.063), (I-339)+(5.014)+(15.064), (I-339)+(5.015)+(9.001), (I-339)+(5.015)+(9.002), (I-339)+(5.015)+(9.003), (I-339)+(5.015)+(9.004), (I-339)+(5.015)+(9.005), (I-339)+(5.015)+(9.006), (I-339)+(5.015)+(9.007), (I-339)+(5.015)+(9.008), (I-339)+(5.015)+(9.009), (I-339)+(5.015)+(15.012), (I-339)+(5.015)+(15.016), (I-339)+(5.015)+(15.025), (I-339)+(5.015)+(15.027), (I-339)+(5.015)+(15.047), (I-339)+(5.015)+(15.063), (I-339)+(5.015)+(15.064), (I-339)+(5.016)+(9.001), (I-339)+(5.016)+(9.002), (I-339)+(5.016)+(9.003), (I-339)+(5.016)+(9.004), (I-339)+(5.016)+(9.005), (I-339)+(5.016)+(9.006), (I-339)+(5.016)+(9.007), (I-339)+(5.016)+(9.008), (I-339)+(5.016)+(9.009), (I-339)+(5.016)+(15.012), (I-339)+(5.016)+(15.016), (I-339)+(5.016)+(15.025), (I-339)+(5.016)+(15.027), (I-339)+(5.016)+(15.047), (I-339)+(5.016)+(15.063), (I-339)+(5.016)+(15.064), (I-339)+(5.017)+(9.001), (I-339)+(5.017)+(9.002), (I-339)+(5.017)+(9.003), (I-339)+(5.017)+(9.004), (I-339)+(5.017)+(9.005), (I-339)+(5.017)+(9.006), (I-339)+(5.017)+(9.007), (I-339)+(5.017)+(9.008), (I-339)+(5.017)+(9.009), (I-339)+(5.017)+(15.012), (I-339)+(5.017)+(15.016), (I-339)+(5.017)+(15.025), (I-339)+(5.017)+(15.027), (I-339)+(5.017)+(15.047), (I-339)+(5.017)+(15.063), (I-339)+(5.017)+(15.064), (I-339)+(5.018)+(9.001), (I-339)+(5.018)+(9.002), (I-339)+(5.018)+(9.003), (I-339)+(5.018)+(9.004), (I-339)+(5.018)+(9.005), (I-339)+(5.018)+(9.006), (I-339)+(5.018)+(9.007), (I-339)+(5.018)+(9.008), (I-339)+(5.018)+(9.009), (I-339)+(5.018)+(15.012), (I-339)+(5.018)+(15.016), (I-339)+(5.018)+(15.025), (I-339)+(5.018)+(15.027), (I-339)+(5.018)+(15.047), (I-339)+(5.018)+(15.063), (I-339)+(5.018)+(15.064), (I-339)+(5.019)+(9.001), (I-339)+(5.019)+(9.002), (I-339)+(5.019)+(9.003), (I-339)+(5.019)+(9.004), (I-339)+(5.019)+(9.005), (I-339)+(5.019)+(9.006), (I-339)+(5.019)+(9.007), (I-339)+(5.019)+(9.008), (I-339)+(5.019)+(9.009), (I-339)+(5.019)+(15.012), (I-339)+(5.019)+(15.016), (I-339)+(5.019)+(15.025), (I-339)+(5.019)+(15.027), (I-339)+(5.019)+(15.047), (I-339)+(5.019)+(15.063), (I-339)+(5.019)+(15.064), (I-339)+(5.020)+(9.001), (I-339)+(5.020)+(9.002), (I-339)+(5.020)+(9.003), (I-339)+(5.020)+(9.004), (I-339)+(5.020)+(9.005), (I-339)+(5.020)+(9.006), (I-339)+(5.020)+(9.007), (I-339)+(5.020)+(9.008), (I-339)+(5.020)+(9.009), (I-339)+(5.020)+(15.012), (I-339)+(5.020)+(15.016), (I-339)+(5.020)+(15.025), (I-339)+(5.020)+(15.027), (I-339)+(5.020)+(15.047), (I-339)+(5.020)+(15.063), (I-339)+(5.020)+(15.064), (I-339)+(5.021)+(9.001), (I-339)+(5.021)+(9.002), (I-339)+(5.021)+(9.003), (I-339)+(5.021)+(9.004), (I-339)+(5.021)+(9.005), (I-339)+(5.021)+(9.006), (I-339)+(5.021)+(9.007), (I-339)+(5.021)+(9.008), (I-339)+(5.021)+(9.009), (I-339)+(5.021)+(15.012), (I-339)+(5.021)+(15.016), (I-339)+(5.021)+(15.025), (I-339)+(5.021)+(15.027), (I-339)+(5.021)+(15.047), (I-339)+(5.021)+(15.063), (I-339)+(5.021)+(15.064), (I-339)+(5.022)+(9.001), (I-339)+(5.022)+(9.002), (I-339)+(5.022)+(9.003), (I-339)+(5.022)+(9.004), (I-339)+(5.022)+(9.005), (I-339)+(5.022)+(9.006), (I-339)+(5.022)+(9.007), (I-339)+(5.022)+(9.008), (I-339)+(5.022)+(9.009), (I-339)+(5.022)+(15.012), (I-339)+(5.022)+(15.016), (I-339)+(5.022)+(15.025), (I-339)+(5.022)+(15.027), (I-339)+(5.022)+(15.047), (I-339)+(5.022)+(15.063), (I-339)+(5.022)+(15.064), (I-339)+(5.023)+(9.001), (I-339)+(5.023)+(9.002), (I-339)+(5.023)+(9.003), (I-339)+(5.023)+(9.004), (I-339)+(5.023)+(9.005), (I-339)+(5.023)+(9.006), (I-339)+(5.023)+(9.007), (I-339)+(5.023)+(9.008), (I-339)+(5.023)+(9.009), (I-339)+(5.023)+(15.012), (I-339)+(5.023)+(15.016), (I-339)+(5.023)+(15.025), (I-339)+(5.023)+(15.027), (I-339)+(5.023)+(15.047), (I-339)+(5.023)+(15.063), (I-339)+(5.023)+(15.064).

If two compounds (B) are present in the combinations according to the invention, preferred compound combinations are selected from the group (G7-C) consisting of the following mixtures:

(I-338)+(1.001)+(1.002), (I-338)+(1.001)+(1.003), (I-338)+(1.001)+(1.004), (I-338)+(1.001)+(1.005), (I-338)+(1.001)+(1.006), (I-338)+(1.001)+(1.007), (I-338)+(1.001)+(1.008), (I-338)+(1.001)+(1.009), (I-338)+(1.001)+(1.010), (I-338)+(1.001)+(1.011), (I-338)+(1.001)+(1.012), (I-338)+(1.001)+(1.013), (I-338)+(1.001)+(1.014), (I-338)+(1.001)+(1.015), (I-338)+(1.001)+(1.016), (I-338)+(1.001)+(1.017), (I-338)+(1.001)+(1.018), (I-338)+(1.001)+(1.019), (I-338)+(1.001)+(1.020), (I-338)+(1.001)+(1.021), (I-338)+(1.001)+(1.022), (I-338)+(1.001)+(1.023), (I-338)+(1.001)+(1.024), (I-338)+(1.001)+(1.025), (I-338)+(1.001)+(1.026), (I-338)+(1.001)+(1.027), (I-338)+(1.001)+(1.028), (I-338)+(1.001)+(1.029), (I-338)+(1.001)+(1.030), (I-338)+(1.001)+(1.031), (I-338)+(1.001)+(1.032), (I-338)+(1.001)+(1.033), (I-338)+(1.001)+(1.034), (I-338)+(1.001)+(1.035), (I-338)+(1.001)+(1.036), (I-338)+(1.001)+(1.037), (I-338)+(1.001)+(1.038), (I-338)+(1.001)+(1.039), (I-338)+(1.001)+(1.040), (I-338)+(1.001)+(1.041), (I-338)+(1.001)+(1.042), (I-338)+(1.001)+(1.043), (I-338)+(1.001)+(1.044), (I-338)+(1.001)+(1.045), (I-338)+(1.001)+(1.046), (I-338)+(1.001)+(1.047), (I-338)+(1.001)+(1.048), (I-338)+(1.001)+(1.049), (I-338)+(1.001)+(1.050), (I-338)+(1.001)+(1.051), (I-338)+(1.001)+(1.052), (I-338)+(1.001)+(1.053), (I-338)+(1.001)+(1.054), (I-338)+(1.001)+(1.055), (I-338)+(1.001)+(1.056), (I-338)+(1.001)+(1.057), (I-338)+(1.001)+(1.058), (I-338)+(1.001)+(1.059), (I-338)+(1.001)+(1.060), (I-338)+(1.001)+(1.061), (I-338)+(1.001)+(1.062), (I-338)+(1.001)+(1.063), (I-338)+(1.001)+(1.064), (I-338)+(1.001)+(1.065), (I-338)+(1.001)+(1.066), (I-338)+(1.001)+(1.067), (I-338)+(1.001)+(1.068), (I-338)+(1.001)+(1.069), (I-338)+(1.001)+(1.070), (I-338)+(1.001)+(1.071), (I-338)+(1.001)+(1.072), (I-338)+(1.001)+(1.073), (I-338)+(1.001)+(1.074), (I-338)+(1.001)+(1.075), (I-338)+(1.001)+(1.076), (I-338)+(1.001)+(1.077), (I-338)+(1.001)+(1.078), (I-338)+(1.001)+(1.079), (I-338)+(1.001)+(1.080), (I-338)+(1.001)+(1.081), (I-338)+(1.001)+(1.082), (I-338)+(1.001)+(1.083), (I-338)+(1.001)+(1.084), (I-338)+(1.001)+(1.085), (I-338)+(1.001)+(1.086), (I-338)+(1.001)+(1.087), (I-338)+(1.001)+(1.088), (I-338)+(1.001)+(1.089), (I-338)+(1.001)+(1.090), (I-338)+(1.001)+(1.091), (I-338)+(1.001)+(1.092), (I-338)+(1.001)+(2.001), (I-338)+(1.001)+(2.002), (I-338)+(1.001)+(2.003), (I-338)+(1.001)+(2.004), (I-338)+(1.001)+(2.005), (I-338)+(1.001)+(2.006), (I-338)+(1.001)+(2.007), (I-338)+(1.001)+(2.008), (I-338)+(1.001)+(2.009), (I-338)+(1.001)+(2.010), (I-338)+(1.001)+(2.011), (I-338)+(1.001)+(2.012), (I-338)+(1.001)+(2.013), (I-338)+(1.001)+(2.014), (I-338)+(1.001)+(2.015), (I-338)+(1.001)+(2.016), (I-338)+(1.001)+(2.017), (I-338)+(1.001)+(2.018), (I-338)+(1.001)+(2.019), (I-338)+(1.001)+(2.020), (I-338)+(1.001)+(2.021), (I-338)+(1.001)+(2.022), (I-338)+(1.001)+(2.023), (I-338)+(1.001)+(2.024), (I-338)+(1.001)+(2.025), (I-338)+(1.001)+(2.026), (I-338)+(1.001)+(2.027), (I-338)+(1.001)+(2.028), (I-338)+(1.001)+(2.029), (I-338)+(1.001)+(2.030), (I-338)+(1.001)+(2.031), (I-338)+(1.001)+(2.032), (I-338)+(1.001)+(2.033), (I-338)+(1.001)+(2.034), (I-338)+(1.001)+(2.035), (I-338)+(1.001)+(2.036), (I-338)+(1.001)+(2.037), (I-338)+(1.001)+(2.038), (I-338)+(1.001)+(2.039), (I-338)+(1.001)+(2.040), (I-338)+(1.001)+(2.041), (I-338)+(1.001)+(2.042), (I-338)+(1.001)+(2.043), (I-338)+(1.001)+(2.044), (I-338)+(1.001)+(2.045), (I-338)+(1.001)+(2.046), (I-338)+(1.001)+(2.047), (I-338)+(1.001)+(2.048), (I-338)+(1.001)+(2.049), (I-338)+(1.001)+(2.050), (I-338)+(1.001)+(2.051), (I-338)+(1.001)+(2.052), (I-338)+(1.001)+(2.053), (I-338)+(1.001)+(2.054), (I-338)+(1.001)+(2.055), (I-338)+(1.001)+(2.056), (I-338)+(1.001)+(2.057), (I-338)+(1.001)+(2.058), (I-338)+(1.001)+(2.059), (I-338)+(1.001)+(3.001), (I-338)+(1.001)+(3.002), (I-338)+(1.001)+(3.003), (I-338)+(1.001)+(3.004), (I-338)+(1.001)+(3.005), (I-338)+(1.001)+(3.006), (I-338)+(1.001)+(3.007), (I-338)+(1.001)+(3.008), (I-338)+(1.001)+(3.009), (I-338)+(1.001)+(3.010), (I-338)+(1.001)+(3.011), (I-338)+(1.001)+(3.012), (I-338)+(1.001)+(3.013), (I-338)+(1.001)+(3.014), (I-338)+(1.001)+(3.015), (I-338)+(1.001)+(3.016), (I-338)+(1.001)+(3.017), (I-338)+(1.001)+(3.018), (I-338)+(1.001)+(3.019), (I-338)+(1.001)+(3.020), (I-338)+(1.001)+(3.021), (I-338)+(1.001)+(3.022), (I-338)+(1.001)+(3.023), (I-338)+(1.001)+(3.024), (I-338)+(1.001)+(3.025), (I-338)+(1.001)+(3.026), (I-338)+(1.001)+(3.027), (I-338)+(1.001)+(3.028), (I-338)+(1.001)+(3.029), (I-338)+(1.001)+(3.030), (I-338)+(1.001)+(3.031), (I-338)+(1.001)+(5.001), (I-338)+(1.001)+(5.002), (I-338)+(1.001)+(5.003), (I-338)+(1.001)+(5.004), (I-338)+(1.001)+(5.005), (I-338)+(1.001)+(5.006), (I-338)+(1.001)+(5.007), (I-338)+(1.001)+(5.008), (I-338)+(1.001)+(5.009), (I-338)+(1.001)+(5.010), (I-338)+(1.001)+(5.011), (I-338)+(1.001)+(5.012), (I-338)+(1.001)+(5.013), (I-338)+(1.001)+(5.014), (I-338)+(1.001)+(5.015), (I-338)+(1.001)+(5.016), (I-338)+(1.001)+(5.017), (I-338)+(1.001)+(5.018), (I-338)+(1.001)+(5.019), (I-338)+(1.001)+(5.020), (I-338)+(1.001)+(5.021), (I-338)+(1.001)+(5.022), (I-338)+(1.001)+(5.023), (I-338)+(1.001)+(6.001), (I-338)+(1.001)+(6.002), (I-338)+(1.001)+(6.003), (I-338)+(1.001)+(6.004), (I-338)+(1.001)+(7.001), (I-338)+(1.001)+(7.002), (I-338)+(1.001)+(7.003), (I-338)+(1.001)+(7.004), (I-338)+(1.001)+(7.005), (I-338)+(1.001)+(7.006), (I-338)+(1.001)+(9.001), (I-338)+(1.001)+(9.002), (I-338)+(1.001)+(9.003), (I-338)+(1.001)+(9.004), (I-338)+(1.001)+(9.005), (I-338)+(1.001)+(9.006), (I-338)+(1.001)+(9.007), (I-338)+(1.001)+(9.008), (I-338)+(1.001)+(9.009), (I-338)+(1.001)+(14.001), (I-338)+(1.001)+(14.002), (I-338)+(1.001)+(15.008), (I-338)+(1.001)+(15.011), (I-338)+(1.001)+(15.012), (I-338)+(1.001)+(15.016), (I-338)+(1.001)+(15.025), (I-338)+(1.001)+(15.027), (I-338)+(1.001)+(15.047), (I-338)+(1.001)+(15.063), (I-338)+(1.001)+(15.064), (I-338)+(1.001)+(16.001), (I-338)+(1.001)+(16.002), (I-338)+(1.001)+(16.003), (I-338)+(1.001)+(16.004), (I-338)+(1.001)+(16.005), (I-338)+(1.001)+(16.006), (I-338)+(1.001)+(16.007), (I-338)+(1.001)+(16.008), (I-338)+(1.001)+(17.001), (I-338)+(1.001)+(17.002), (I-338)+(1.001)+(17.003), (I-338)+(1.001)+(17.004), (I-338)+(1.001)+(17.005), (I-338)+(1.001)+(17.006), (I-338)+(1.001)+(17.007), (I-338)+(1.001)+(17.008), (I-338)+(1.001)+(17.009), (I-338)+(1.001)+(17.010), (I-338)+(1.001)+(17.011), (I-338)+(1.001)+(17.012), (I-338)+(1.001)+(18.001), (I-338)+(1.002)+(1.003), (I-338)+(1.002)+(1.004), (I-338)+(1.002)+(1.005), (I-338)+(1.002)+(1.006), (I-338)+(1.002)+(1.007), (I-338)+(1.002)+(1.008), (I-338)+(1.002)+(1.009), (I-338)+(1.002)+(1.010), (I-338)+(1.002)+(1.011), (I-338)+(1.002)+(1.012), (I-338)+(1.002)+(1.013), (I-338)+(1.002)+(1.014), (I-338)+(1.002)+(1.015), (I-338)+(1.002)+(1.016), (I-338)+(1.002)+(1.017), (I-338)+(1.002)+(1.018), (I-338)+(1.002)+(1.019), (I-338)+(1.002)+(1.020), (I-338)+(1.002)+(1.021), (I-338)+(1.002)+(1.022), (I-338)+(1.002)+(1.023), (I-338)+(1.002)+(1.024), (I-338)+(1.002)+(1.025), (I-338)+(1.002)+(1.026), (I-338)+(1.002)+(1.027), (I-338)+(1.002)+(1.028), (I-338)+(1.002)+(1.029), (I-338)+(1.002)+(1.030), (I-338)+(1.002)+(1.031), (I-338)+(1.002)+(1.032), (I-338)+(1.002)+(1.033), (I-338)+(1.002)+(1.034), (I-338)+(1.002)+(1.035), (I-338)+(1.002)+(1.036), (I-338)+(1.002)+(1.037), (I-338)+(1.002)+(1.038), (I-338)+(1.002)+(1.039), (I-338)+(1.002)+(1.040), (I-338)+(1.002)+(1.041), (I-338)+(1.002)+(1.042), (I-338)+(1.002)+(1.043), (I-338)+(1.002)+(1.044), (I-338)+(1.002)+(1.045), (I-338)+(1.002)+(1.046), (I-338)+(1.002)+(1.047), (I-338)+(1.002)+(1.048), (I-338)+(1.002)+(1.049), (I-338)+(1.002)+(1.050), (I-338)+(1.002)+(1.051), (I-338)+(1.002)+(1.052), (I-338)+(1.002)+(1.053), (I-338)+(1.002)+(1.054), (I-338)+(1.002)+(1.055), (I-338)+(1.002)+(1.056), (I-338)+(1.002)+(1.057), (I-338)+(1.002)+(1.058), (I-338)+(1.002)+(1.059), (I-338)+(1.002)+(1.060), (I-338)+(1.002)+(1.061), (I-338)+(1.002)+(1.062), (I-338)+(1.002)+(1.063), (I-338)+(1.002)+(1.064), (I-338)+(1.002)+(1.065), (I-338)+(1.002)+(1.066), (I-338)+(1.002)+(1.067), (I-338)+(1.002)+(1.068), (I-338)+(1.002)+(1.069), (I-338)+(1.002)+(1.070), (I-338)+(1.002)+(1.071), (I-338)+(1.002)+(1.072), (I-338)+(1.002)+(1.073), (I-338)+(1.002)+(1.074), (I-338)+(1.002)+(1.075), (I-338)+(1.002)+(1.076), (I-338)+(1.002)+(1.077), (I-338)+(1.002)+(1.078), (I-338)+(1.002)+(1.079), (I-338)+(1.002)+(1.080), (I-338)+(1.002)+(1.081), (I-338)+(1.002)+(1.082), (I-338)+(1.002)+(1.083), (I-338)+(1.002)+(1.084), (I-338)+(1.002)+(1.085), (I-338)+(1.002)+(1.086), (I-338)+(1.002)+(1.087), (I-338)+(1.002)+(1.088), (I-338)+(1.002)+(1.089), (I-338)+(1.002)+(1.090), (I-338)+(1.002)+(1.091), (I-338)+(1.002)+(1.092), (I-338)+(1.002)+(2.001), (I-338)+(1.002)+(2.002), (I-338)+(1.002)+(2.003), (I-338)+(1.002)+(2.004), (I-338)+(1.002)+(2.005), (I-338)+(1.002)+(2.006), (I-338)+(1.002)+(2.007), (I-338)+(1.002)+(2.008), (I-338)+(1.002)+(2.009), (I-338)+(1.002)+(2.010), (I-338)+(1.002)+(2.011), (I-338)+(1.002)+(2.012), (I-338)+(1.002)+(2.013), (I-338)+(1.002)+(2.014), (I-338)+(1.002)+(2.015), (I-338)+(1.002)+(2.016), (I-338)+(1.002)+(2.017), (I-338)+(1.002)+(2.018), (I-338)+(1.002)+(2.019), (I-338)+(1.002)+(2.020), (I-338)+(1.002)+(2.021), (I-338)+(1.002)+(2.022), (I-338)+(1.002)+(2.023), (I-338)+(1.002)+(2.024), (I-338)+(1.002)+(2.025), (I-338)+(1.002)+(2.026), (I-338)+(1.002)+(2.027), (I-338)+(1.002)+(2.028), (I-338)+(1.002)+(2.029), (I-338)+(1.002)+(2.030), (I-338)+(1.002)+(2.031), (I-338)+(1.002)+(2.032), (I-338)+(1.002)+(2.033), (I-338)+(1.002)+(2.034), (I-338)+(1.002)+(2.035), (I-338)+(1.002)+(2.036), (I-338)+(1.002)+(2.037), (I-338)+(1.002)+(2.038), (I-338)+(1.002)+(2.039), (I-338)+(1.002)+(2.040), (I-338)+(1.002)+(2.041), (I-338)+(1.002)+(2.042), (I-338)+(1.002)+(2.043), (I-338)+(1.002)+(2.044), (I-338)+(1.002)+(2.045), (I-338)+(1.002)+(2.046), (I-338)+(1.002)+(2.047), (I-338)+(1.002)+(2.048), (I-338)+(1.002)+(2.049), (I-338)+(1.002)+(2.050), (I-338)+(1.002)+(2.051), (I-338)+(1.002)+(2.052), (I-338)+(1.002)+(2.053), (I-338)+(1.002)+(2.054), (I-338)+(1.002)+(2.055), (I-338)+(1.002)+(2.056), (I-338)+(1.002)+(2.057), (I-338)+(1.002)+(2.058), (I-338)+(1.002)+(2.059), (I-338)+(1.002)+(3.001), (I-338)+(1.002)+(3.002), (I-338)+(1.002)+(3.003), (I-338)+(1.002)+(3.004), (I-338)+(1.002)+(3.005), (I-338)+(1.002)+(3.006), (I-338)+(1.002)+(3.007), (I-338)+(1.002)+(3.008), (I-338)+(1.002)+(3.009), (I-338)+(1.002)+(3.010), (I-338)+(1.002)+(3.011), (I-338)+(1.002)+(3.012), (I-338)+(1.002)+(3.013), (I-338)+(1.002)+(3.014), (I-338)+(1.002)+(3.015), (I-338)+(1.002)+(3.016), (I-338)+(1.002)+(3.017), (I-338)+(1.002)+(3.018), (I-338)+(1.002)+(3.019), (I-338)+(1.002)+(3.020), (I-338)+(1.002)+(3.021), (I-338)+(1.002)+(3.022), (I-338)+(1.002)+(3.023), (I-338)+(1.002)+(3.024), (I-338)+(1.002)+(3.025), (I-338)+(1.002)+(3.026), (I-338)+(1.002)+(3.027), (I-338)+(1.002)+(3.028), (I-338)+(1.002)+(3.029), (I-338)+(1.002)+(3.030), (I-338)+(1.002)+(3.031), (I-338)+(1.002)+(5.001), (I-338)+(1.002)+(5.002), (I-338)+(1.002)+(5.003), (I-338)+(1.002)+(5.004), (I-338)+(1.002)+(5.005), (I-338)+(1.002)+(5.006), (I-338)+(1.002)+(5.007), (I-338)+(1.002)+(5.008), (I-338)+(1.002)+(5.009), (I-338)+(1.002)+(5.010), (I-338)+(1.002)+(5.011), (I-338)+(1.002)+(5.012), (I-338)+(1.002)+(5.013), (I-338)+(1.002)+(5.014), (I-338)+(1.002)+(5.015), (I-338)+(1.002)+(5.016), (I-338)+(1.002)+(5.017), (I-338)+(1.002)+(5.018), (I-338)+(1.002)+(5.019), (I-338)+(1.002)+(5.020), (I-338)+(1.002)+(5.021), (I-338)+(1.002)+(5.022), (I-338)+(1.002)+(5.023), (I-338)+(1.002)+(6.001), (I-338)+(1.002)+(6.002), (I-338)+(1.002)+(6.003), (I-338)+(1.002)+(6.004), (I-338)+(1.002)+(7.001), (I-338)+(1.002)+(7.002), (I-338)+(1.002)+(7.003), (I-338)+(1.002)+(7.004), (I-338)+(1.002)+(7.005), (I-338)+(1.002)+(7.006), (I-338)+(1.002)+(9.001), (I-338)+(1.002)+(9.002), (I-338)+(1.002)+(9.003), (I-338)+(1.002)+(9.004), (I-338)+(1.002)+(9.005), (I-338)+(1.002)+(9.006), (I-338)+(1.002)+(9.007), (I-338)+(1.002)+(9.008), (I-338)+(1.002)+(9.009), (I-338)+(1.002)+(14.001), (I-338)+(1.002)+(14.002), (I-338)+(1.002)+(15.008), (I-338)+(1.002)+(15.011), (I-338)+(1.002)+(15.012), (I-338)+(1.002)+(15.016), (I-338)+(1.002)+(15.025), (I-338)+(1.002)+(15.027), (I-338)+(1.002)+(15.047), (I-338)+(1.002)+(15.063), (I-338)+(1.002)+(15.064), (I-338)+(1.002)+(16.001), (I-338)+(1.002)+(16.002), (I-338)+(1.002)+(16.003), (I-338)+(1.002)+(16.004), (I-338)+(1.002)+(16.005), (I-338)+(1.002)+(16.006), (I-338)+(1.002)+(16.007), (I-338)+(1.002)+(16.008), (I-338)+(1.002)+(17.001), (I-338)+(1.002)+(17.002), (I-338)+(1.002)+(17.003), (I-338)+(1.002)+(17.004), (I-338)+(1.002)+(17.005), (I-338)+(1.002)+(17.006), (I-338)+(1.002)+(17.007), (I-338)+(1.002)+(17.008), (I-338)+(1.002)+(17.009), (I-338)+(1.002)+(17.010), (I-338)+(1.002)+(17.011), (I-338)+(1.002)+(17.012), (I-338)+(1.002)+(18.001), (I-338)+(1.003)+(1.004), (I-338)+(1.003)+(1.005), (I-338)+(1.003)+(1.006), (I-338)+(1.003)+(1.007), (I-338)+(1.003)+(1.008), (I-338)+(1.003)+(1.009), (I-338)+(1.003)+(1.010), (I-338)+(1.003)+(1.011), (I-338)+(1.003)+(1.012), (I-338)+(1.003)+(1.013), (I-338)+(1.003)+(1.014), (I-338)+(1.003)+(1.015), (I-338)+(1.003)+(1.016), (I-338)+(1.003)+(1.017), (I-338)+(1.003)+(1.018), (I-338)+(1.003)+(1.019), (I-338)+(1.003)+(1.020), (I-338)+(1.003)+(1.021), (I-338)+(1.003)+(1.022), (I-338)+(1.003)+(1.023), (I-338)+(1.003)+(1.024), (I-338)+(1.003)+(1.025), (I-338)+(1.003)+(1.026), (I-338)+(1.003)+(1.027), (I-338)+(1.003)+(1.028), (I-338)+(1.003)+(1.029), (I-338)+(1.003)+(1.030), (I-338)+(1.003)+(1.031), (I-338)+(1.003)+(1.032), (I-338)+(1.003)+(1.033), (I-338)+(1.003)+(1.034), (I-338)+(1.003)+(1.035), (I-338)+(1.003)+(1.036), (I-338)+(1.003)+(1.037), (I-338)+(1.003)+(1.038), (I-338)+(1.003)+(1.039), (I-338)+(1.003)+(1.040), (I-338)+(1.003)+(1.041), (I-338)+(1.003)+(1.042), (I-338)+(1.003)+(1.043), (I-338)+(1.003)+(1.044), (I-338)+(1.003)+(1.045), (I-338)+(1.003)+(1.046), (I-338)+(1.003)+(1.047), (I-338)+(1.003)+(1.048), (I-338)+(1.003)+(1.049), (I-338)+(1.003)+(1.050), (I-338)+(1.003)+(1.051), (I-338)+(1.003)+(1.052), (I-338)+(1.003)+(1.053), (I-338)+(1.003)+(1.054), (I-338)+(1.003)+(1.055), (I-338)+(1.003)+(1.056), (I-338)+(1.003)+(1.057), (I-338)+(1.003)+(1.058), (I-338)+(1.003)+(1.059), (I-338)+(1.003)+(1.060), (I-338)+(1.003)+(1.061), (I-338)+(1.003)+(1.062), (I-338)+(1.003)+(1.063), (I-338)+(1.003)+(1.064), (I-338)+(1.003)+(1.065), (I-338)+(1.003)+(1.066), (I-338)+(1.003)+(1.067), (I-338)+(1.003)+(1.068), (I-338)+(1.003)+(1.069), (I-338)+(1.003)+(1.070), (I-338)+(1.003)+(1.071), (I-338)+(1.003)+(1.072), (I-338)+(1.003)+(1.073), (I-338)+(1.003)+(1.074), (I-338)+(1.003)+(1.075), (I-338)+(1.003)+(1.076), (I-338)+(1.003)+(1.077), (I-338)+(1.003)+(1.078), (I-338)+(1.003)+(1.079), (I-338)+(1.003)+(1.080), (I-338)+(1.003)+(1.081), (I-338)+(1.003)+(1.082), (I-338)+(1.003)+(1.083), (I-338)+(1.003)+(1.084), (I-338)+(1.003)+(1.085), (I-338)+(1.003)+(1.086), (I-338)+(1.003)+(1.087), (I-338)+(1.003)+(1.088), (I-338)+(1.003)+(1.089), (I-338)+(1.003)+(1.090), (I-338)+(1.003)+(1.091), (I-338)+(1.003)+(1.092), (I-338)+(1.003)+(2.001), (I-338)+(1.003)+(2.002), (I-338)+(1.003)+(2.003), (I-338)+(1.003)+(2.004), (I-338)+(1.003)+(2.005), (I-338)+(1.003)+(2.006), (I-338)+(1.003)+(2.007), (I-338)+(1.003)+(2.008), (I-338)+(1.003)+(2.009), (I-338)+(1.003)+(2.010), (I-338)+(1.003)+(2.011), (I-338)+(1.003)+(2.012), (I-338)+(1.003)+(2.013), (I-338)+(1.003)+(2.014), (I-338)+(1.003)+(2.015), (I-338)+(1.003)+(2.016), (I-338)+(1.003)+(2.017), (I-338)+(1.003)+(2.018), (I-338)+(1.003)+(2.019), (I-338)+(1.003)+(2.020), (I-338)+(1.003)+(2.021), (I-338)+(1.003)+(2.022), (I-338)+(1.003)+(2.023), (I-338)+(1.003)+(2.024), (I-338)+(1.003)+(2.025), (I-338)+(1.003)+(2.026), (I-338)+(1.003)+(2.027), (I-338)+(1.003)+(2.028), (I-338)+(1.003)+(2.029), (I-338)+(1.003)+(2.030), (I-338)+(1.003)+(2.031), (I-338)+(1.003)+(2.032), (I-338)+(1.003)+(2.033), (I-338)+(1.003)+(2.034), (I-338)+(1.003)+(2.035), (I-338)+(1.003)+(2.036), (I-338)+(1.003)+(2.037), (I-338)+(1.003)+(2.038), (I-338)+(1.003)+(2.039), (I-338)+(1.003)+(2.040), (I-338)+(1.003)+(2.041), (I-338)+(1.003)+(2.042), (I-338)+(1.003)+(2.043), (I-338)+(1.003)+(2.044), (I-338)+(1.003)+(2.045), (I-338)+(1.003)+(2.046), (I-338)+(1.003)+(2.047), (I-338)+(1.003)+(2.048), (I-338)+(1.003)+(2.049), (I-338)+(1.003)+(2.050), (I-338)+(1.003)+(2.051), (I-338)+(1.003)+(2.052), (I-338)+(1.003)+(2.053), (I-338)+(1.003)+(2.054), (I-338)+(1.003)+(2.055), (I-338)+(1.003)+(2.056), (I-338)+(1.003)+(2.057), (I-338)+(1.003)+(2.058), (I-338)+(1.003)+(2.059), (I-338)+(1.003)+(3.001), (I-338)+(1.003)+(3.002), (I-338)+(1.003)+(3.003), (I-338)+(1.003)+(3.004), (I-338)+(1.003)+(3.005), (I-338)+(1.003)+(3.006), (I-338)+(1.003)+(3.007), (I-338)+(1.003)+(3.008), (I-338)+(1.003)+(3.009), (I-338)+(1.003)+(3.010), (I-338)+(1.003)+(3.011), (I-338)+(1.003)+(3.012), (I-338)+(1.003)+(3.013), (I-338)+(1.003)+(3.014), (I-338)+(1.003)+(3.015), (I-338)+(1.003)+(3.016), (I-338)+(1.003)+(3.017), (I-338)+(1.003)+(3.018), (I-338)+(1.003)+(3.019), (I-338)+(1.003)+(3.020), (I-338)+(1.003)+(3.021), (I-338)+(1.003)+(3.022), (I-338)+(1.003)+(3.023), (I-338)+(1.003)+(3.024), (I-338)+(1.003)+(3.025), (I-338)+(1.003)+(3.026), (I-338)+(1.003)+(3.027), (I-338)+(1.003)+(3.028), (I-338)+(1.003)+(3.029), (I-338)+(1.003)+(3.030), (I-338)+(1.003)+(3.031), (I-338)+(1.003)+(5.001), (I-338)+(1.003)+(5.002), (I-338)+(1.003)+(5.003), (I-338)+(1.003)+(5.004), (I-338)+(1.003)+(5.005), (I-338)+(1.003)+(5.006), (I-338)+(1.003)+(5.007), (I-338)+(1.003)+(5.008), (I-338)+(1.003)+(5.009), (I-338)+(1.003)+(5.010), (I-338)+(1.003)+(5.011), (I-338)+(1.003)+(5.012), (I-338)+(1.003)+(5.013), (I-338)+(1.003)+(5.014), (I-338)+(1.003)+(5.015), (I-338)+(1.003)+(5.016), (I-338)+(1.003)+(5.017), (I-338)+(1.003)+(5.018), (I-338)+(1.003)+(5.019), (I-338)+(1.003)+(5.020), (I-338)+(1.003)+(5.021), (I-338)+(1.003)+(5.022), (I-338)+(1.003)+(5.023), (I-338)+(1.003)+(6.001), (I-338)+(1.003)+(6.002), (I-338)+(1.003)+(6.003), (I-338)+(1.003)+(6.004), (I-338)+(1.003)+(7.001), (I-338)+(1.003)+(7.002), (I-338)+(1.003)+(7.003), (I-338)+(1.003)+(7.004), (I-338)+(1.003)+(7.005), (I-338)+(1.003)+(7.006), (I-338)+(1.003)+(9.001), (I-338)+(1.003)+(9.002), (I-338)+(1.003)+(9.003), (I-338)+(1.003)+(9.004), (I-338)+(1.003)+(9.005), (I-338)+(1.003)+(9.006), (I-338)+(1.003)+(9.007), (I-338)+(1.003)+(9.008), (I-338)+(1.003)+(9.009), (I-338)+(1.003)+(14.001), (I-338)+(1.003)+(14.002), (I-338)+(1.003)+(15.008), (I-338)+(1.003)+(15.011), (I-338)+(1.003)+(15.012), (I-338)+(1.003)+(15.016), (I-338)+(1.003)+(15.025), (I-338)+(1.003)+(15.027), (I-338)+(1.003)+(15.047), (I-338)+(1.003)+(15.063), (I-338)+(1.003)+(15.064), (I-338)+(1.003)+(16.001), (I-338)+(1.003)+(16.002), (I-338)+(1.003)+(16.003), (I-338)+(1.003)+(16.004), (I-338)+(1.003)+(16.005), (I-338)+(1.003)+(16.006), (I-338)+(1.003)+(16.007), (I-338)+(1.003)+(16.008), (I-338)+(1.003)+(17.001), (I-338)+(1.003)+(17.002), (I-338)+(1.003)+(17.003), (I-338)+(1.003)+(17.004), (I-338)+(1.003)+(17.005), (I-338)+(1.003)+(17.006), (I-338)+(1.003)+(17.007), (I-338)+(1.003)+(17.008), (I-338)+(1.003)+(17.009), (I-338)+(1.003)+(17.010), (I-338)+(1.003)+(17.011), (I-338)+(1.003)+(17.012), (I-338)+(1.003)+(18.001), (I-338)+(1.004)+(1.005), (I-338)+(1.004)+(1.006), (I-338)+(1.004)+(1.007), (I-338)+(1.004)+(1.008), (I-338)+(1.004)+(1.009), (I-338)+(1.004)+(1.010), (I-338)+(1.004)+(1.011), (I-338)+(1.004)+(1.012), (I-338)+(1.004)+(1.013), (I-338)+(1.004)+(1.014), (I-338)+(1.004)+(1.015), (I-338)+(1.004)+(1.016), (I-338)+(1.004)+(1.017), (I-338)+(1.004)+(1.018), (I-338)+(1.004)+(1.019), (I-338)+(1.004)+(1.020), (I-338)+(1.004)+(1.021), (I-338)+(1.004)+(1.022), (I-338)+(1.004)+(1.023), (I-338)+(1.004)+(1.024), (I-338)+(1.004)+(1.025), (I-338)+(1.004)+(1.026), (I-338)+(1.004)+(1.027), (I-338)+(1.004)+(1.028), (I-338)+(1.004)+(1.029), (I-338)+(1.004)+(1.030), (I-338)+(1.004)+(1.031), (I-338)+(1.004)+(1.032), (I-338)+(1.004)+(1.033), (I-338)+(1.004)+(1.034), (I-338)+(1.004)+(1.035), (I-338)+(1.004)+(1.036), (I-338)+(1.004)+(1.037), (I-338)+(1.004)+(1.038), (I-338)+(1.004)+(1.039), (I-338)+(1.004)+(1.040), (I-338)+(1.004)+(1.041), (I-338)+(1.004)+(1.042), (I-338)+(1.004)+(1.043), (I-338)+(1.004)+(1.044), (I-338)+(1.004)+(1.045), (I-338)+(1.004)+(1.046), (I-338)+(1.004)+(1.047), (I-338)+(1.004)+(1.048), (I-338)+(1.004)+(1.049), (I-338)+(1.004)+(1.050), (I-338)+(1.004)+(1.051), (I-338)+(1.004)+(1.052), (I-338)+(1.004)+(1.053), (I-338)+(1.004)+(1.054), (I-338)+(1.004)+(1.055), (I-338)+(1.004)+(1.056), (I-338)+(1.004)+(1.057), (I-338)+(1.004)+(1.058), (I-338)+(1.004)+(1.059), (I-338)+(1.004)+(1.060), (I-338)+(1.004)+(1.061), (I-338)+(1.004)+(1.062), (I-338)+(1.004)+(1.063), (I-338)+(1.004)+(1.064), (I-338)+(1.004)+(1.065), (I-338)+(1.004)+(1.066), (I-338)+(1.004)+(1.067), (I-338)+(1.004)+(1.068), (I-338)+(1.004)+(1.069), (I-338)+(1.004)+(1.070), (I-338)+(1.004)+(1.071), (I-338)+(1.004)+(1.072), (I-338)+(1.004)+(1.073), (I-338)+(1.004)+(1.074), (I-338)+(1.004)+(1.075), (I-338)+(1.004)+(1.076), (I-338)+(1.004)+(1.077), (I-338)+(1.004)+(1.078), (I-338)+(1.004)+(1.079), (I-338)+(1.004)+(1.080), (I-338)+(1.004)+(1.081), (I-338)+(1.004)+(1.082), (I-338)+(1.004)+(1.083), (I-338)+(1.004)+(1.084), (I-338)+(1.004)+(1.085), (I-338)+(1.004)+(1.086), (I-338)+(1.004)+(1.087), (I-338)+(1.004)+(1.088), (I-338)+(1.004)+(1.089), (I-338)+(1.004)+(1.090), (I-338)+(1.004)+(1.091), (I-338)+(1.004)+(1.092), (I-338)+(1.004)+(2.001), (I-338)+(1.004)+(2.002), (I-338)+(1.004)+(2.003), (I-338)+(1.004)+(2.004), (I-338)+(1.004)+(2.005), (I-338)+(1.004)+(2.006), (I-338)+(1.004)+(2.007), (I-338)+(1.004)+(2.008), (I-338)+(1.004)+(2.009), (I-338)+(1.004)+(2.010), (I-338)+(1.004)+(2.011), (I-338)+(1.004)+(2.012), (I-338)+(1.004)+(2.013), (I-338)+(1.004)+(2.014), (I-338)+(1.004)+(2.015), (I-338)+(1.004)+(2.016), (I-338)+(1.004)+(2.017), (I-338)+(1.004)+(2.018), (I-338)+(1.004)+(2.019), (I-338)+(1.004)+(2.020), (I-338)+(1.004)+(2.021), (I-338)+(1.004)+(2.022), (I-338)+(1.004)+(2.023), (I-338)+(1.004)+(2.024), (I-338)+(1.004)+(2.025), (I-338)+(1.004)+(2.026), (I-338)+(1.004)+(2.027), (I-338)+(1.004)+(2.028), (I-338)+(1.004)+(2.029), (I-338)+(1.004)+(2.030), (I-338)+(1.004)+(2.031), (I-338)+(1.004)+(2.032), (I-338)+(1.004)+(2.033), (I-338)+(1.004)+(2.034), (I-338)+(1.004)+(2.035), (I-338)+(1.004)+(2.036), (I-338)+(1.004)+(2.037), (I-338)+(1.004)+(2.038), (I-338)+(1.004)+(2.039), (I-338)+(1.004)+(2.040), (I-338)+(1.004)+(2.041), (I-338)+(1.004)+(2.042), (I-338)+(1.004)+(2.043), (I-338)+(1.004)+(2.044), (I-338)+(1.004)+(2.045), (I-338)+(1.004)+(2.046), (I-338)+(1.004)+(2.047), (I-338)+(1.004)+(2.048), (I-338)+(1.004)+(2.049), (I-338)+(1.004)+(2.050), (I-338)+(1.004)+(2.051), (I-338)+(1.004)+(2.052), (I-338)+(1.004)+(2.053), (I-338)+(1.004)+(2.054), (I-338)+(1.004)+(2.055), (I-338)+(1.004)+(2.056), (I-338)+(1.004)+(2.057), (I-338)+(1.004)+(2.058), (I-338)+(1.004)+(2.059), (I-338)+(1.004)+(3.001), (I-338)+(1.004)+(3.002), (I-338)+(1.004)+(3.003), (I-338)+(1.004)+(3.004), (I-338)+(1.004)+(3.005), (I-338)+(1.004)+(3.006), (I-338)+(1.004)+(3.007), (I-338)+(1.004)+(3.008), (I-338)+(1.004)+(3.009), (I-338)+(1.004)+(3.010), (I-338)+(1.004)+(3.011), (I-338)+(1.004)+(3.012), (I-338)+(1.004)+(3.013), (I-338)+(1.004)+(3.014), (I-338)+(1.004)+(3.015), (I-338)+(1.004)+(3.016), (I-338)+(1.004)+(3.017), (I-338)+(1.004)+(3.018), (I-338)+(1.004)+(3.019), (I-338)+(1.004)+(3.020), (I-338)+(1.004)+(3.021), (I-338)+(1.004)+(3.022), (I-338)+(1.004)+(3.023), (I-338)+(1.004)+(3.024), (I-338)+(1.004)+(3.025), (I-338)+(1.004)+(3.026), (I-338)+(1.004)+(3.027), (I-338)+(1.004)+(3.028), (I-338)+(1.004)+(3.029), (I-338)+(1.004)+(3.030), (I-338)+(1.004)+(3.031), (I-338)+(1.004)+(5.001), (I-338)+(1.004)+(5.002), (I-338)+(1.004)+(5.003), (I-338)+(1.004)+(5.004), (I-338)+(1.004)+(5.005), (I-338)+(1.004)+(5.006), (I-338)+(1.004)+(5.007), (I-338)+(1.004)+(5.008), (I-338)+(1.004)+(5.009), (I-338)+(1.004)+(5.010), (I-338)+(1.004)+(5.011), (I-338)+(1.004)+(5.012), (I-338)+(1.004)+(5.013), (I-338)+(1.004)+(5.014), (I-338)+(1.004)+(5.015), (I-338)+(1.004)+(5.016), (I-338)+(1.004)+(5.017), (I-338)+(1.004)+(5.018), (I-338)+(1.004)+(5.019), (I-338)+(1.004)+(5.020), (I-338)+(1.004)+(5.021), (I-338)+(1.004)+(5.022), (I-338)+(1.004)+(5.023), (I-338)+(1.004)+(6.001), (I-338)+(1.004)+(6.002), (I-338)+(1.004)+(6.003), (I-338)+(1.004)+(6.004), (I-338)+(1.004)+(7.001), (I-338)+(1.004)+(7.002), (I-338)+(1.004)+(7.003), (I-338)+(1.004)+(7.004), (I-338)+(1.004)+(7.005), (I-338)+(1.004)+(7.006), (I-338)+(1.004)+(9.001), (I-338)+(1.004)+(9.002), (I-338)+(1.004)+(9.003), (I-338)+(1.004)+(9.004), (I-338)+(1.004)+(9.005), (I-338)+(1.004)+(9.006), (I-338)+(1.004)+(9.007), (I-338)+(1.004)+(9.008), (I-338)+(1.004)+(9.009), (I-338)+(1.004)+(14.001), (I-338)+(1.004)+(14.002), (I-338)+(1.004)+(15.008), (I-338)+(1.004)+(15.011), (I-338)+(1.004)+(15.012), (I-338)+(1.004)+(15.016), (I-338)+(1.004)+(15.025), (I-338)+(1.004)+(15.027), (I-338)+(1.004)+(15.047), (I-338)+(1.004)+(15.063), (I-338)+(1.004)+(15.064), (I-338)+(1.004)+(16.001), (I-338)+(1.004)+(16.002), (I-338)+(1.004)+(16.003), (I-338)+(1.004)+(16.004), (I-338)+(1.004)+(16.005), (I-338)+(1.004)+(16.006), (I-338)+(1.004)+(16.007), (I-338)+(1.004)+(16.008), (I-338)+(1.004)+(17.001), (I-338)+(1.004)+(17.002), (I-338)+(1.004)+(17.003), (I-338)+(1.004)+(17.004), (I-338)+(1.004)+(17.005), (I-338)+(1.004)+(17.006), (I-338)+(1.004)+(17.007), (I-338)+(1.004)+(17.008), (I-338)+(1.004)+(17.009), (I-338)+(1.004)+(17.010), (I-338)+(1.004)+(17.011), (I-338)+(1.004)+(17.012), (I-338)+(1.004)+(18.001), (I-338)+(1.005)+(1.006), (I-338)+(1.005)+(1.007), (I-338)+(1.005)+(1.008), (I-338)+(1.005)+(1.009), (I-338)+(1.005)+(1.010), (I-338)+(1.005)+(1.011), (I-338)+(1.005)+(1.012), (I-338)+(1.005)+(1.013), (I-338)+(1.005)+(1.014), (I-338)+(1.005)+(1.015), (I-338)+(1.005)+(1.016), (I-338)+(1.005)+(1.017), (I-338)+(1.005)+(1.018), (I-338)+(1.005)+(1.019), (I-338)+(1.005)+(1.020), (I-338)+(1.005)+(1.021), (I-338)+(1.005)+(1.022), (I-338)+(1.005)+(1.023), (I-338)+(1.005)+(1.024), (I-338)+(1.005)+(1.025), (I-338)+(1.005)+(1.026), (I-338)+(1.005)+(1.027), (I-338)+(1.005)+(1.028), (I-338)+(1.005)+(1.029), (I-338)+(1.005)+(1.030), (I-338)+(1.005)+(1.031), (I-338)+(1.005)+(1.032), (I-338)+(1.005)+(1.033), (I-338)+(1.005)+(1.034), (I-338)+(1.005)+(1.035), (I-338)+(1.005)+(1.036), (I-338)+(1.005)+(1.037), (I-338)+(1.005)+(1.038), (I-338)+(1.005)+(1.039), (I-338)+(1.005)+(1.040), (I-338)+(1.005)+(1.041), (I-338)+(1.005)+(1.042), (I-338)+(1.005)+(1.043), (I-338)+(1.005)+(1.044), (I-338)+(1.005)+(1.045), (I-338)+(1.005)+(1.046), (I-338)+(1.005)+(1.047), (I-338)+(1.005)+(1.048), (I-338)+(1.005)+(1.049), (I-338)+(1.005)+(1.050), (I-338)+(1.005)+(1.051), (I-338)+(1.005)+(1.052), (I-338)+(1.005)+(1.053), (I-338)+(1.005)+(1.054), (I-338)+(1.005)+(1.055), (I-338)+(1.005)+(1.056), (I-338)+(1.005)+(1.057), (I-338)+(1.005)+(1.058), (I-338)+(1.005)+(1.059), (I-338)+(1.005)+(1.060), (I-338)+(1.005)+(1.061), (I-338)+(1.005)+(1.062), (I-338)+(1.005)+(1.063), (I-338)+(1.005)+(1.064), (I-338)+(1.005)+(1.065), (I-338)+(1.005)+(1.066), (I-338)+(1.005)+(1.067), (I-338)+(1.005)+(1.068), (I-338)+(1.005)+(1.069), (I-338)+(1.005)+(1.070), (I-338)+(1.005)+(1.071), (I-338)+(1.005)+(1.072), (I-338)+(1.005)+(1.073), (I-338)+(1.005)+(1.074), (I-338)+(1.005)+(1.075), (I-338)+(1.005)+(1.076), (I-338)+(1.005)+(1.077), (I-338)+(1.005)+(1.078), (I-338)+(1.005)+(1.079), (I-338)+(1.005)+(1.080), (I-338)+(1.005)+(1.081), (I-338)+(1.005)+(1.082), (I-338)+(1.005)+(1.083), (I-338)+(1.005)+(1.084), (I-338)+(1.005)+(1.085), (I-338)+(1.005)+(1.086), (I-338)+(1.005)+(1.087), (I-338)+(1.005)+(1.088), (I-338)+(1.005)+(1.089), (I-338)+(1.005)+(1.090), (I-338)+(1.005)+(1.091), (I-338)+(1.005)+(1.092), (I-338)+(1.005)+(2.001), (I-338)+(1.005)+(2.002), (I-338)+(1.005)+(2.003), (I-338)+(1.005)+(2.004), (I-338)+(1.005)+(2.005), (I-338)+(1.005)+(2.006), (I-338)+(1.005)+(2.007), (I-338)+(1.005)+(2.008), (I-338)+(1.005)+(2.009), (I-338)+(1.005)+(2.010), (I-338)+(1.005)+(2.011), (I-338)+(1.005)+(2.012), (I-338)+(1.005)+(2.013), (I-338)+(1.005)+(2.014), (I-338)+(1.005)+(2.015), (I-338)+(1.005)+(2.016), (I-338)+(1.005)+(2.017), (I-338)+(1.005)+(2.018), (I-338)+(1.005)+(2.019), (I-338)+(1.005)+(2.020), (I-338)+(1.005)+(2.021), (I-338)+(1.005)+(2.022), (I-338)+(1.005)+(2.023), (I-338)+(1.005)+(2.024), (I-338)+(1.005)+(2.025), (I-338)+(1.005)+(2.026), (I-338)+(1.005)+(2.027), (I-338)+(1.005)+(2.028), (I-338)+(1.005)+(2.029), (I-338)+(1.005)+(2.030), (I-338)+(1.005)+(2.031), (I-338)+(1.005)+(2.032), (I-338)+(1.005)+(2.033), (I-338)+(1.005)+(2.034), (I-338)+(1.005)+(2.035), (I-338)+(1.005)+(2.036), (I-338)+(1.005)+(2.037), (I-338)+(1.005)+(2.038), (I-338)+(1.005)+(2.039), (I-338)+(1.005)+(2.040), (I-338)+(1.005)+(2.041), (I-338)+(1.005)+(2.042), (I-338)+(1.005)+(2.043), (I-338)+(1.005)+(2.044), (I-338)+(1.005)+(2.045), (I-338)+(1.005)+(2.046), (I-338)+(1.005)+(2.047), (I-338)+(1.005)+(2.048), (I-338)+(1.005)+(2.049), (I-338)+(1.005)+(2.050), (I-338)+(1.005)+(2.051), (I-338)+(1.005)+(2.052), (I-338)+(1.005)+(2.053), (I-338)+(1.005)+(2.054), (I-338)+(1.005)+(2.055), (I-338)+(1.005)+(2.056), (I-338)+(1.005)+(2.057), (I-338)+(1.005)+(2.058), (I-338)+(1.005)+(2.059), (I-338)+(1.005)+(3.001), (I-338)+(1.005)+(3.002), (I-338)+(1.005)+(3.003), (I-338)+(1.005)+(3.004), (I-338)+(1.005)+(3.005), (I-338)+(1.005)+(3.006), (I-338)+(1.005)+(3.007), (I-338)+(1.005)+(3.008), (I-338)+(1.005)+(3.009), (I-338)+(1.005)+(3.010), (I-338)+(1.005)+(3.011), (I-338)+(1.005)+(3.012), (I-338)+(1.005)+(3.013), (I-338)+(1.005)+(3.014), (I-338)+(1.005)+(3.015), (I-338)+(1.005)+(3.016), (I-338)+(1.005)+(3.017), (I-338)+(1.005)+(3.018), (I-338)+(1.005)+(3.019), (I-338)+(1.005)+(3.020), (I-338)+(1.005)+(3.021), (I-338)+(1.005)+(3.022), (I-338)+(1.005)+(3.023), (I-338)+(1.005)+(3.024), (I-338)+(1.005)+(3.025), (I-338)+(1.005)+(3.026), (I-338)+(1.005)+(3.027), (I-338)+(1.005)+(3.028), (I-338)+(1.005)+(3.029), (I-338)+(1.005)+(3.030), (I-338)+(1.005)+(3.031), (I-338)+(1.005)+(5.001), (I-338)+(1.005)+(5.002), (I-338)+(1.005)+(5.003), (I-338)+(1.005)+(5.004), (I-338)+(1.005)+(5.005), (I-338)+(1.005)+(5.006), (I-338)+(1.005)+(5.007), (I-338)+(1.005)+(5.008), (I-338)+(1.005)+(5.009), (I-338)+(1.005)+(5.010), (I-338)+(1.005)+(5.011), (I-338)+(1.005)+(5.012), (I-338)+(1.005)+(5.013), (I-338)+(1.005)+(5.014), (I-338)+(1.005)+(5.015), (I-338)+(1.005)+(5.016), (I-338)+(1.005)+(5.017), (I-338)+(1.005)+(5.018), (I-338)+(1.005)+(5.019), (I-338)+(1.005)+(5.020), (I-338)+(1.005)+(5.021), (I-338)+(1.005)+(5.022), (I-338)+(1.005)+(5.023), (I-338)+(1.005)+(6.001), (I-338)+(1.005)+(6.002), (I-338)+(1.005)+(6.003), (I-338)+(1.005)+(6.004), (I-338)+(1.005)+(7.001), (I-338)+(1.005)+(7.002), (I-338)+(1.005)+(7.003), (I-338)+(1.005)+(7.004), (I-338)+(1.005)+(7.005), (I-338)+(1.005)+(7.006), (I-338)+(1.005)+(9.001), (I-338)+(1.005)+(9.002), (I-338)+(1.005)+(9.003), (I-338)+(1.005)+(9.004), (I-338)+(1.005)+(9.005), (I-338)+(1.005)+(9.006), (I-338)+(1.005)+(9.007), (I-338)+(1.005)+(9.008), (I-338)+(1.005)+(9.009), (I-338)+(1.005)+(14.001), (I-338)+(1.005)+(14.002), (I-338)+(1.005)+(15.008), (I-338)+(1.005)+(15.011), (I-338)+(1.005)+(15.012), (I-338)+(1.005)+(15.016), (I-338)+(1.005)+(15.025), (I-338)+(1.005)+(15.027), (I-338)+(1.005)+(15.047), (I-338)+(1.005)+(15.063), (I-338)+(1.005)+(15.064), (I-338)+(1.005)+(16.001), (I-338)+(1.005)+(16.002), (I-338)+(1.005)+(16.003), (I-338)+(1.005)+(16.004), (I-338)+(1.005)+(16.005), (I-338)+(1.005)+(16.006), (I-338)+(1.005)+(16.007), (I-338)+(1.005)+(16.008), (I-338)+(1.005)+(17.001), (I-338)+(1.005)+(17.002), (I-338)+(1.005)+(17.003), (I-338)+(1.005)+(17.004), (I-338)+(1.005)+(17.005), (I-338)+(1.005)+(17.006), (I-338)+(1.005)+(17.007), (I-338)+(1.005)+(17.008), (I-338)+(1.005)+(17.009), (I-338)+(1.005)+(17.010), (I-338)+(1.005)+(17.011), (I-338)+(1.005)+(17.012), (I-338)+(1.005)+(18.001), (I-338)+(1.006)+(1.007), (I-338)+(1.006)+(1.008), (I-338)+(1.006)+(1.009), (I-338)+(1.006)+(1.010), (I-338)+(1.006)+(1.011), (I-338)+(1.006)+(1.012), (I-338)+(1.006)+(1.013), (I-338)+(1.006)+(1.014), (I-338)+(1.006)+(1.015), (I-338)+(1.006)+(1.016), (I-338)+(1.006)+(1.017), (I-338)+(1.006)+(1.018), (I-338)+(1.006)+(1.019), (I-338)+(1.006)+(1.020), (I-338)+(1.006)+(1.021), (I-338)+(1.006)+(1.022), (I-338)+(1.006)+(1.023), (I-338)+(1.006)+(1.024), (I-338)+(1.006)+(1.025), (I-338)+(1.006)+(1.026), (I-338)+(1.006)+(1.027), (I-338)+(1.006)+(1.028), (I-338)+(1.006)+(1.029), (I-338)+(1.006)+(1.030), (I-338)+(1.006)+(1.031), (I-338)+(1.006)+(1.032), (I-338)+(1.006)+(1.033), (I-338)+(1.006)+(1.034), (I-338)+(1.006)+(1.035), (I-338)+(1.006)+(1.036), (I-338)+(1.006)+(1.037), (I-338)+(1.006)+(1.038), (I-338)+(1.006)+(1.039), (I-338)+(1.006)+(1.040), (I-338)+(1.006)+(1.041), (I-338)+(1.006)+(1.042), (I-338)+(1.006)+(1.043), (I-338)+(1.006)+(1.044), (I-338)+(1.006)+(1.045), (I-338)+(1.006)+(1.046), (I-338)+(1.006)+(1.047), (I-338)+(1.006)+(1.048), (I-338)+(1.006)+(1.049), (I-338)+(1.006)+(1.050), (I-338)+(1.006)+(1.051), (I-338)+(1.006)+(1.052), (I-338)+(1.006)+(1.053), (I-338)+(1.006)+(1.054), (I-338)+(1.006)+(1.055), (I-338)+(1.006)+(1.056), (I-338)+(1.006)+(1.057), (I-338)+(1.006)+(1.058), (I-338)+(1.006)+(1.059), (I-338)+(1.006)+(1.060), (I-338)+(1.006)+(1.061), (I-338)+(1.006)+(1.062), (I-338)+(1.006)+(1.063), (I-338)+(1.006)+(1.064), (I-338)+(1.006)+(1.065), (I-338)+(1.006)+(1.066), (I-338)+(1.006)+(1.067), (I-338)+(1.006)+(1.068), (I-338)+(1.006)+(1.069), (I-338)+(1.006)+(1.070), (I-338)+(1.006)+(1.071), (I-338)+(1.006)+(1.072), (I-338)+(1.006)+(1.073), (I-338)+(1.006)+(1.074), (I-338)+(1.006)+(1.075), (I-338)+(1.006)+(1.076), (I-338)+(1.006)+(1.077), (I-338)+(1.006)+(1.078), (I-338)+(1.006)+(1.079), (I-338)+(1.006)+(1.080), (I-338)+(1.006)+(1.081), (I-338)+(1.006)+(1.082), (I-338)+(1.006)+(1.083), (I-338)+(1.006)+(1.084), (I-338)+(1.006)+(1.085), (I-338)+(1.006)+(1.086), (I-338)+(1.006)+(1.087), (I-338)+(1.006)+(1.088), (I-338)+(1.006)+(1.089), (I-338)+(1.006)+(1.090), (I-338)+(1.006)+(1.091), (I-338)+(1.006)+(1.092), (I-338)+(1.006)+(2.001), (I-338)+(1.006)+(2.002), (I-338)+(1.006)+(2.003), (I-338)+(1.006)+(2.004), (I-338)+(1.006)+(2.005), (I-338)+(1.006)+(2.006), (I-338)+(1.006)+(2.007), (I-338)+(1.006)+(2.008), (I-338)+(1.006)+(2.009), (I-338)+(1.006)+(2.010), (I-338)+(1.006)+(2.011), (I-338)+(1.006)+(2.012), (I-338)+(1.006)+(2.013), (I-338)+(1.006)+(2.014), (I-338)+(1.006)+(2.015), (I-338)+(1.006)+(2.016), (I-338)+(1.006)+(2.017), (I-338)+(1.006)+(2.018), (I-338)+(1.006)+(2.019), (I-338)+(1.006)+(2.020), (I-338)+(1.006)+(2.021), (I-338)+(1.006)+(2.022), (I-338)+(1.006)+(2.023), (I-338)+(1.006)+(2.024), (I-338)+(1.006)+(2.025), (I-338)+(1.006)+(2.026), (I-338)+(1.006)+(2.027), (I-338)+(1.006)+(2.028), (I-338)+(1.006)+(2.029), (I-338)+(1.006)+(2.030), (I-338)+(1.006)+(2.031), (I-338)+(1.006)+(2.032), (I-338)+(1.006)+(2.033), (I-338)+(1.006)+(2.034), (I-338)+(1.006)+(2.035), (I-338)+(1.006)+(2.036), (I-338)+(1.006)+(2.037), (I-338)+(1.006)+(2.038), (I-338)+(1.006)+(2.039), (I-338)+(1.006)+(2.040), (I-338)+(1.006)+(2.041), (I-338)+(1.006)+(2.042), (I-338)+(1.006)+(2.043), (I-338)+(1.006)+(2.044), (I-338)+(1.006)+(2.045), (I-338)+(1.006)+(2.046), (I-338)+(1.006)+(2.047), (I-338)+(1.006)+(2.048), (I-338)+(1.006)+(2.049), (I-338)+(1.006)+(2.050), (I-338)+(1.006)+(2.051), (I-338)+(1.006)+(2.052), (I-338)+(1.006)+(2.053), (I-338)+(1.006)+(2.054), (I-338)+(1.006)+(2.055), (I-338)+(1.006)+(2.056), (I-338)+(1.006)+(2.057), (I-338)+(1.006)+(2.058), (I-338)+(1.006)+(2.059), (I-338)+(1.006)+(3.001), (I-338)+(1.006)+(3.002), (I-338)+(1.006)+(3.003), (I-338)+(1.006)+(3.004), (I-338)+(1.006)+(3.005), (I-338)+(1.006)+(3.006), (I-338)+(1.006)+(3.007), (I-338)+(1.006)+(3.008), (I-338)+(1.006)+(3.009), (I-338)+(1.006)+(3.010), (I-338)+(1.006)+(3.011), (I-338)+(1.006)+(3.012), (I-338)+(1.006)+(3.013), (I-338)+(1.006)+(3.014), (I-338)+(1.006)+(3.015), (I-338)+(1.006)+(3.016), (I-338)+(1.006)+(3.017), (I-338)+(1.006)+(3.018), (I-338)+(1.006)+(3.019), (I-338)+(1.006)+(3.020), (I-338)+(1.006)+(3.021), (I-338)+(1.006)+(3.022), (I-338)+(1.006)+(3.023), (I-338)+(1.006)+(3.024), (I-338)+(1.006)+(3.025), (I-338)+(1.006)+(3.026), (I-338)+(1.006)+(3.027), (I-338)+(1.006)+(3.028), (I-338)+(1.006)+(3.029), (I-338)+(1.006)+(3.030), (I-338)+(1.006)+(3.031), (I-338)+(1.006)+(5.001), (I-338)+(1.006)+(5.002), (I-338)+(1.006)+(5.003), (I-338)+(1.006)+(5.004), (I-338)+(1.006)+(5.005), (I-338)+(1.006)+(5.006), (I-338)+(1.006)+(5.007), (I-338)+(1.006)+(5.008), (I-338)+(1.006)+(5.009), (I-338)+(1.006)+(5.010), (I-338)+(1.006)+(5.011), (I-338)+(1.006)+(5.012), (I-338)+(1.006)+(5.013), (I-338)+(1.006)+(5.014), (I-338)+(1.006)+(5.015), (I-338)+(1.006)+(5.016), (I-338)+(1.006)+(5.017), (I-338)+(1.006)+(5.018), (I-338)+(1.006)+(5.019), (I-338)+(1.006)+(5.020), (I-338)+(1.006)+(5.021), (I-338)+(1.006)+(5.022), (I-338)+(1.006)+(5.023), (I-338)+(1.006)+(6.001), (I-338)+(1.006)+(6.002), (I-338)+(1.006)+(6.003), (I-338)+(1.006)+(6.004), (I-338)+(1.006)+(7.001), (I-338)+(1.006)+(7.002), (I-338)+(1.006)+(7.003), (I-338)+(1.006)+(7.004), (I-338)+(1.006)+(7.005), (I-338)+(1.006)+(7.006), (I-338)+(1.006)+(9.001), (I-338)+(1.006)+(9.002), (I-338)+(1.006)+(9.003), (I-338)+(1.006)+(9.004), (I-338)+(1.006)+(9.005), (I-338)+(1.006)+(9.006), (I-338)+(1.006)+(9.007), (I-338)+(1.006)+(9.008), (I-338)+(1.006)+(9.009), (I-338)+(1.006)+(14.001), (I-338)+(1.006)+(14.002), (I-338)+(1.006)+(15.008), (I-338)+(1.006)+(15.011), (I-338)+(1.006)+(15.012), (I-338)+(1.006)+(15.016), (I-338)+(1.006)+(15.025), (I-338)+(1.006)+(15.027), (I-338)+(1.006)+(15.047), (I-338)+(1.006)+(15.063), (I-338)+(1.006)+(15.064), (I-338)+(1.006)+(16.001), (I-338)+(1.006)+(16.002), (I-338)+(1.006)+(16.003), (I-338)+(1.006)+(16.004), (I-338)+(1.006)+(16.005), (I-338)+(1.006)+(16.006), (I-338)+(1.006)+(16.007), (I-338)+(1.006)+(16.008), (I-338)+(1.006)+(17.001), (I-338)+(1.006)+(17.002), (I-338)+(1.006)+(17.003), (I-338)+(1.006)+(17.004), (I-338)+(1.006)+(17.005), (I-338)+(1.006)+(17.006), (I-338)+(1.006)+(17.007), (I-338)+(1.006)+(17.008), (I-338)+(1.006)+(17.009), (I-338)+(1.006)+(17.010), (I-338)+(1.006)+(17.011), (I-338)+(1.006)+(17.012), (I-338)+(1.006)+(18.001), (I-338)+(1.007)+(1.008), (I-338)+(1.007)+(1.009), (I-338)+(1.007)+(1.010), (I-338)+(1.007)+(1.011), (I-338)+(1.007)+(1.012), (I-338)+(1.007)+(1.013), (I-338)+(1.007)+(1.014), (I-338)+(1.007)+(1.015), (I-338)+(1.007)+(1.016), (I-338)+(1.007)+(1.017), (I-338)+(1.007)+(1.018), (I-338)+(1.007)+(1.019), (I-338)+(1.007)+(1.020), (I-338)+(1.007)+(1.021), (I-338)+(1.007)+(1.022), (I-338)+(1.007)+(1.023), (I-338)+(1.007)+(1.024), (I-338)+(1.007)+(1.025), (I-338)+(1.007)+(1.026), (I-338)+(1.007)+(1.027), (I-338)+(1.007)+(1.028), (I-338)+(1.007)+(1.029), (I-338)+(1.007)+(1.030), (I-338)+(1.007)+(1.031), (I-338)+(1.007)+(1.032), (I-338)+(1.007)+(1.033), (I-338)+(1.007)+(1.034), (I-338)+(1.007)+(1.035), (I-338)+(1.007)+(1.036), (I-338)+(1.007)+(1.037), (I-338)+(1.007)+(1.038), (I-338)+(1.007)+(1.039), (I-338)+(1.007)+(1.040), (I-338)+(1.007)+(1.041), (I-338)+(1.007)+(1.042), (I-338)+(1.007)+(1.043), (I-338)+(1.007)+(1.044), (I-338)+(1.007)+(1.045), (I-338)+(1.007)+(1.046), (I-338)+(1.007)+(1.047), (I-338)+(1.007)+(1.048), (I-338)+(1.007)+(1.049), (I-338)+(1.007)+(1.050), (I-338)+(1.007)+(1.051), (I-338)+(1.007)+(1.052), (I-338)+(1.007)+(1.053), (I-338)+(1.007)+(1.054), (I-338)+(1.007)+(1.055), (I-338)+(1.007)+(1.056), (I-338)+(1.007)+(1.057), (I-338)+(1.007)+(1.058), (I-338)+(1.007)+(1.059), (I-338)+(1.007)+(1.060), (I-338)+(1.007)+(1.061), (I-338)+(1.007)+(1.062), (I-338)+(1.007)+(1.063), (I-338)+(1.007)+(1.064), (I-338)+(1.007)+(1.065), (I-338)+(1.007)+(1.066), (I-338)+(1.007)+(1.067), (I-338)+(1.007)+(1.068), (I-338)+(1.007)+(1.069), (I-338)+(1.007)+(1.070), (I-338)+(1.007)+(1.071), (I-338)+(1.007)+(1.072), (I-338)+(1.007)+(1.073), (I-338)+(1.007)+(1.074), (I-338)+(1.007)+(1.075), (I-338)+(1.007)+(1.076), (I-338)+(1.007)+(1.077), (I-338)+(1.007)+(1.078), (I-338)+(1.007)+(1.079), (I-338)+(1.007)+(1.080), (I-338)+(1.007)+(1.081), (I-338)+(1.007)+(1.082), (I-338)+(1.007)+(1.083), (I-338)+(1.007)+(1.084), (I-338)+(1.007)+(1.085), (I-338)+(1.007)+(1.086), (I-338)+(1.007)+(1.087), (I-338)+(1.007)+(1.088), (I-338)+(1.007)+(1.089), (I-338)+(1.007)+(1.090), (I-338)+(1.007)+(1.091), (I-338)+(1.007)+(1.092), (I-338)+(1.007)+(2.001), (I-338)+(1.007)+(2.002), (I-338)+(1.007)+(2.003), (I-338)+(1.007)+(2.004), (I-338)+(1.007)+(2.005), (I-338)+(1.007)+(2.006), (I-338)+(1.007)+(2.007), (I-338)+(1.007)+(2.008), (I-338)+(1.007)+(2.009), (I-338)+(1.007)+(2.010), (I-338)+(1.007)+(2.011), (I-338)+(1.007)+(2.012), (I-338)+(1.007)+(2.013), (I-338)+(1.007)+(2.014), (I-338)+(1.007)+(2.015), (I-338)+(1.007)+(2.016), (I-338)+(1.007)+(2.017), (I-338)+(1.007)+(2.018), (I-338)+(1.007)+(2.019), (I-338)+(1.007)+(2.020), (I-338)+(1.007)+(2.021), (I-338)+(1.007)+(2.022), (I-338)+(1.007)+(2.023), (I-338)+(1.007)+(2.024), (I-338)+(1.007)+(2.025), (I-338)+(1.007)+(2.026), (I-338)+(1.007)+(2.027), (I-338)+(1.007)+(2.028), (I-338)+(1.007)+(2.029), (I-338)+(1.007)+(2.030), (I-338)+(1.007)+(2.031), (I-338)+(1.007)+(2.032), (I-338)+(1.007)+(2.033), (I-338)+(1.007)+(2.034), (I-338)+(1.007)+(2.035), (I-338)+(1.007)+(2.036), (I-338)+(1.007)+(2.037), (I-338)+(1.007)+(2.038), (I-338)+(1.007)+(2.039), (I-338)+(1.007)+(2.040), (I-338)+(1.007)+(2.041), (I-338)+(1.007)+(2.042), (I-338)+(1.007)+(2.043), (I-338)+(1.007)+(2.044), (I-338)+(1.007)+(2.045), (I-338)+(1.007)+(2.046), (I-338)+(1.007)+(2.047), (I-338)+(1.007)+(2.048), (I-338)+(1.007)+(2.049), (I-338)+(1.007)+(2.050), (I-338)+(1.007)+(2.051), (I-338)+(1.007)+(2.052), (I-338)+(1.007)+(2.053), (I-338)+(1.007)+(2.054), (I-338)+(1.007)+(2.055), (I-338)+(1.007)+(2.056), (I-338)+(1.007)+(2.057), (I-338)+(1.007)+(2.058), (I-338)+(1.007)+(2.059), (I-338)+(1.007)+(3.001), (I-338)+(1.007)+(3.002), (I-338)+(1.007)+(3.003), (I-338)+(1.007)+(3.004), (I-338)+(1.007)+(3.005), (I-338)+(1.007)+(3.006), (I-338)+(1.007)+(3.007), (I-338)+(1.007)+(3.008), (I-338)+(1.007)+(3.009), (I-338)+(1.007)+(3.010), (I-338)+(1.007)+(3.011), (I-338)+(1.007)+(3.012), (I-338)+(1.007)+(3.013), (I-338)+(1.007)+(3.014), (I-338)+(1.007)+(3.015), (I-338)+(1.007)+(3.016), (I-338)+(1.007)+(3.017), (I-338)+(1.007)+(3.018), (I-338)+(1.007)+(3.019), (I-338)+(1.007)+(3.020), (I-338)+(1.007)+(3.021), (I-338)+(1.007)+(3.022), (I-338)+(1.007)+(3.023), (I-338)+(1.007)+(3.024), (I-338)+(1.007)+(3.025), (I-338)+(1.007)+(3.026), (I-338)+(1.007)+(3.027), (I-338)+(1.007)+(3.028), (I-338)+(1.007)+(3.029), (I-338)+(1.007)+(3.030), (I-338)+(1.007)+(3.031), (I-338)+(1.007)+(5.001), (I-338)+(1.007)+(5.002), (I-338)+(1.007)+(5.003), (I-338)+(1.007)+(5.004), (I-338)+(1.007)+(5.005), (I-338)+(1.007)+(5.006), (I-338)+(1.007)+(5.007), (I-338)+(1.007)+(5.008), (I-338)+(1.007)+(5.009), (I-338)+(1.007)+(5.010), (I-338)+(1.007)+(5.011), (I-338)+(1.007)+(5.012), (I-338)+(1.007)+(5.013), (I-338)+(1.007)+(5.014), (I-338)+(1.007)+(5.015), (I-338)+(1.007)+(5.016), (I-338)+(1.007)+(5.017), (I-338)+(1.007)+(5.018), (I-338)+(1.007)+(5.019), (I-338)+(1.007)+(5.020), (I-338)+(1.007)+(5.021), (I-338)+(1.007)+(5.022), (I-338)+(1.007)+(5.023), (I-338)+(1.007)+(6.001), (I-338)+(1.007)+(6.002), (I-338)+(1.007)+(6.003), (I-338)+(1.007)+(6.004), (I-338)+(1.007)+(7.001), (I-338)+(1.007)+(7.002), (I-338)+(1.007)+(7.003), (I-338)+(1.007)+(7.004), (I-338)+(1.007)+(7.005), (I-338)+(1.007)+(7.006), (I-338)+(1.007)+(9.001), (I-338)+(1.007)+(9.002), (I-338)+(1.007)+(9.003), (I-338)+(1.007)+(9.004), (I-338)+(1.007)+(9.005), (I-338)+(1.007)+(9.006), (I-338)+(1.007)+(9.007), (I-338)+(1.007)+(9.008), (I-338)+(1.007)+(9.009), (I-338)+(1.007)+(14.001), (I-338)+(1.007)+(14.002), (I-338)+(1.007)+(15.008), (I-338)+(1.007)+(15.011), (I-338)+(1.007)+(15.012), (I-338)+(1.007)+(15.016), (I-338)+(1.007)+(15.025), (I-338)+(1.007)+(15.027), (I-338)+(1.007)+(15.047), (I-338)+(1.007)+(15.063), (I-338)+(1.007)+(15.064), (I-338)+(1.007)+(16.001), (I-338)+(1.007)+(16.002), (I-338)+(1.007)+(16.003), (I-338)+(1.007)+(16.004), (I-338)+(1.007)+(16.005), (I-338)+(1.007)+(16.006), (I-338)+(1.007)+(16.007), (I-338)+(1.007)+(16.008), (I-338)+(1.007)+(17.001), (I-338)+(1.007)+(17.002), (I-338)+(1.007)+(17.003), (I-338)+(1.007)+(17.004), (I-338)+(1.007)+(17.005), (I-338)+(1.007)+(17.006), (I-338)+(1.007)+(17.007), (I-338)+(1.007)+(17.008), (I-338)+(1.007)+(17.009), (I-338)+(1.007)+(17.010), (I-338)+(1.007)+(17.011), (I-338)+(1.007)+(17.012), (I-338)+(1.007)+(18.001), (I-338)+(1.008)+(1.009), (I-338)+(1.008)+(1.010), (I-338)+(1.008)+(1.011), (I-338)+(1.008)+(1.012), (I-338)+(1.008)+(1.013), (I-338)+(1.008)+(1.014), (I-338)+(1.008)+(1.015), (I-338)+(1.008)+(1.016), (I-338)+(1.008)+(1.017), (I-338)+(1.008)+(1.018), (I-338)+(1.008)+(1.019), (I-338)+(1.008)+(1.020), (I-338)+(1.008)+(1.021), (I-338)+(1.008)+(1.022), (I-338)+(1.008)+(1.023), (I-338)+(1.008)+(1.024), (I-338)+(1.008)+(1.025), (I-338)+(1.008)+(1.026), (I-338)+(1.008)+(1.027), (I-338)+(1.008)+(1.028), (I-338)+(1.008)+(1.029), (I-338)+(1.008)+(1.030), (I-338)+(1.008)+(1.031), (I-338)+(1.008)+(1.032), (I-338)+(1.008)+(1.033), (I-338)+(1.008)+(1.034), (I-338)+(1.008)+(1.035), (I-338)+(1.008)+(1.036), (I-338)+(1.008)+(1.037), (I-338)+(1.008)+(1.038), (I-338)+(1.008)+(1.039), (I-338)+(1.008)+(1.040), (I-338)+(1.008)+(1.041), (I-338)+(1.008)+(1.042), (I-338)+(1.008)+(1.043), (I-338)+(1.008)+(1.044), (I-338)+(1.008)+(1.045), (I-338)+(1.008)+(1.046), (I-338)+(1.008)+(1.047), (I-338)+(1.008)+(1.048), (I-338)+(1.008)+(1.049), (I-338)+(1.008)+(1.050), (I-338)+(1.008)+(1.051), (I-338)+(1.008)+(1.052), (I-338)+(1.008)+(1.053), (I-338)+(1.008)+(1.054), (I-338)+(1.008)+(1.055), (I-338)+(1.008)+(1.056), (I-338)+(1.008)+(1.057), (I-338)+(1.008)+(1.058), (I-338)+(1.008)+(1.059), (I-338)+(1.008)+(1.060), (I-338)+(1.008)+(1.061), (I-338)+(1.008)+(1.062), (I-338)+(1.008)+(1.063), (I-338)+(1.008)+(1.064), (I-338)+(1.008)+(1.065), (I-338)+(1.008)+(1.066), (I-338)+(1.008)+(1.067), (I-338)+(1.008)+(1.068), (I-338)+(1.008)+(1.069), (I-338)+(1.008)+(1.070), (I-338)+(1.008)+(1.071), (I-338)+(1.008)+(1.072), (I-338)+(1.008)+(1.073), (I-338)+(1.008)+(1.074), (I-338)+(1.008)+(1.075), (I-338)+(1.008)+(1.076), (I-338)+(1.008)+(1.077), (I-338)+(1.008)+(1.078), (I-338)+(1.008)+(1.079), (I-338)+(1.008)+(1.080), (I-338)+(1.008)+(1.081), (I-338)+(1.008)+(1.082), (I-338)+(1.008)+(1.083), (I-338)+(1.008)+(1.084), (I-338)+(1.008)+(1.085), (I-338)+(1.008)+(1.086), (I-338)+(1.008)+(1.087), (I-338)+(1.008)+(1.088), (I-338)+(1.008)+(1.089), (I-338)+(1.008)+(1.090), (I-338)+(1.008)+(1.091), (I-338)+(1.008)+(1.092), (I-338)+(1.008)+(2.001), (I-338)+(1.008)+(2.002), (I-338)+(1.008)+(2.003), (I-338)+(1.008)+(2.004), (I-338)+(1.008)+(2.005), (I-338)+(1.008)+(2.006), (I-338)+(1.008)+(2.007), (I-338)+(1.008)+(2.008), (I-338)+(1.008)+(2.009), (I-338)+(1.008)+(2.010), (I-338)+(1.008)+(2.011), (I-338)+(1.008)+(2.012), (I-338)+(1.008)+(2.013), (I-338)+(1.008)+(2.014), (I-338)+(1.008)+(2.015), (I-338)+(1.008)+(2.016), (I-338)+(1.008)+(2.017), (I-338)+(1.008)+(2.018), (I-338)+(1.008)+(2.019), (I-338)+(1.008)+(2.020), (I-338)+(1.008)+(2.021), (I-338)+(1.008)+(2.022), (I-338)+(1.008)+(2.023), (I-338)+(1.008)+(2.024), (I-338)+(1.008)+(2.025), (I-338)+(1.008)+(2.026), (I-338)+(1.008)+(2.027), (I-338)+(1.008)+(2.028), (I-338)+(1.008)+(2.029), (I-338)+(1.008)+(2.030), (I-338)+(1.008)+(2.031), (I-338)+(1.008)+(2.032), (I-338)+(1.008)+(2.033), (I-338)+(1.008)+(2.034), (I-338)+(1.008)+(2.035), (I-338)+(1.008)+(2.036), (I-338)+(1.008)+(2.037), (I-338)+(1.008)+(2.038), (I-338)+(1.008)+(2.039), (I-338)+(1.008)+(2.040), (I-338)+(1.008)+(2.041), (I-338)+(1.008)+(2.042), (I-338)+(1.008)+(2.043), (I-338)+(1.008)+(2.044), (I-338)+(1.008)+(2.045), (I-338)+(1.008)+(2.046), (I-338)+(1.008)+(2.047), (I-338)+(1.008)+(2.048), (I-338)+(1.008)+(2.049), (I-338)+(1.008)+(2.050), (I-338)+(1.008)+(2.051), (I-338)+(1.008)+(2.052), (I-338)+(1.008)+(2.053), (I-338)+(1.008)+(2.054), (I-338)+(1.008)+(2.055), (I-338)+(1.008)+(2.056), (I-338)+(1.008)+(2.057), (I-338)+(1.008)+(2.058), (I-338)+(1.008)+(2.059), (I-338)+(1.008)+(3.001), (I-338)+(1.008)+(3.002), (I-338)+(1.008)+(3.003), (I-338)+(1.008)+(3.004), (I-338)+(1.008)+(3.005), (I-338)+(1.008)+(3.006), (I-338)+(1.008)+(3.007), (I-338)+(1.008)+(3.008), (I-338)+(1.008)+(3.009), (I-338)+(1.008)+(3.010), (I-338)+(1.008)+(3.011), (I-338)+(1.008)+(3.012), (I-338)+(1.008)+(3.013), (I-338)+(1.008)+(3.014), (I-338)+(1.008)+(3.015), (I-338)+(1.008)+(3.016), (I-338)+(1.008)+(3.017), (I-338)+(1.008)+(3.018), (I-338)+(1.008)+(3.019), (I-338)+(1.008)+(3.020), (I-338)+(1.008)+(3.021), (I-338)+(1.008)+(3.022), (I-338)+(1.008)+(3.023), (I-338)+(1.008)+(3.024), (I-338)+(1.008)+(3.025), (I-338)+(1.008)+(3.026), (I-338)+(1.008)+(3.027), (I-338)+(1.008)+(3.028), (I-338)+(1.008)+(3.029), (I-338)+(1.008)+(3.030), (I-338)+(1.008)+(3.031), (I-338)+(1.008)+(5.001), (I-338)+(1.008)+(5.002), (I-338)+(1.008)+(5.003), (I-338)+(1.008)+(5.004), (I-338)+(1.008)+(5.005), (I-338)+(1.008)+(5.006), (I-338)+(1.008)+(5.007), (I-338)+(1.008)+(5.008), (I-338)+(1.008)+(5.009), (I-338)+(1.008)+(5.010), (I-338)+(1.008)+(5.011), (I-338)+(1.008)+(5.012), (I-338)+(1.008)+(5.013), (I-338)+(1.008)+(5.014), (I-338)+(1.008)+(5.015), (I-338)+(1.008)+(5.016), (I-338)+(1.008)+(5.017), (I-338)+(1.008)+(5.018), (I-338)+(1.008)+(5.019), (I-338)+(1.008)+(5.020), (I-338)+(1.008)+(5.021), (I-338)+(1.008)+(5.022), (I-338)+(1.008)+(5.023), (I-338)+(1.008)+(6.001), (I-338)+(1.008)+(6.002), (I-338)+(1.008)+(6.003), (I-338)+(1.008)+(6.004), (I-338)+(1.008)+(7.001), (I-338)+(1.008)+(7.002), (I-338)+(1.008)+(7.003), (I-338)+(1.008)+(7.004), (I-338)+(1.008)+(7.005), (I-338)+(1.008)+(7.006), (I-338)+(1.008)+(9.001), (I-338)+(1.008)+(9.002), (I-338)+(1.008)+(9.003), (I-338)+(1.008)+(9.004), (I-338)+(1.008)+(9.005), (I-338)+(1.008)+(9.006), (I-338)+(1.008)+(9.007), (I-338)+(1.008)+(9.008), (I-338)+(1.008)+(9.009), (I-338)+(1.008)+(14.001), (I-338)+(1.008)+(14.002), (I-338)+(1.008)+(15.008), (I-338)+(1.008)+(15.011), (I-338)+(1.008)+(15.012), (I-338)+(1.008)+(15.016), (I-338)+(1.008)+(15.025), (I-338)+(1.008)+(15.027), (I-338)+(1.008)+(15.047), (I-338)+(1.008)+(15.063), (I-338)+(1.008)+(15.064), (I-338)+(1.008)+(16.001), (I-338)+(1.008)+(16.002), (I-338)+(1.008)+(16.003), (I-338)+(1.008)+(16.004), (I-338)+(1.008)+(16.005), (I-338)+(1.008)+(16.006), (I-338)+(1.008)+(16.007), (I-338)+(1.008)+(16.008), (I-338)+(1.008)+(17.001), (I-338)+(1.008)+(17.002), (I-338)+(1.008)+(17.003), (I-338)+(1.008)+(17.004), (I-338)+(1.008)+(17.005), (I-338)+(1.008)+(17.006), (I-338)+(1.008)+(17.007), (I-338)+(1.008)+(17.008), (I-338)+(1.008)+(17.009), (I-338)+(1.008)+(17.010), (I-338)+(1.008)+(17.011), (I-338)+(1.008)+(17.012), (I-338)+(1.008)+(18.001), (I-338)+(1.009)+(1.010), (I-338)+(1.009)+(1.011), (I-338)+(1.009)+(1.012), (I-338)+(1.009)+(1.013), (I-338)+(1.009)+(1.014), (I-338)+(1.009)+(1.015), (I-338)+(1.009)+(1.016), (I-338)+(1.009)+(1.017), (I-338)+(1.009)+(1.018), (I-338)+(1.009)+(1.019), (I-338)+(1.009)+(1.020), (I-338)+(1.009)+(1.021), (I-338)+(1.009)+(1.022), (I-338)+(1.009)+(1.023), (I-338)+(1.009)+(1.024), (I-338)+(1.009)+(1.025), (I-338)+(1.009)+(1.026), (I-338)+(1.009)+(1.027), (I-338)+(1.009)+(1.028), (I-338)+(1.009)+(1.029), (I-338)+(1.009)+(1.030), (I-338)+(1.009)+(1.031), (I-338)+(1.009)+(1.032), (I-338)+(1.009)+(1.033), (I-338)+(1.009)+(1.034), (I-338)+(1.009)+(1.035), (I-338)+(1.009)+(1.036), (I-338)+(1.009)+(1.037), (I-338)+(1.009)+(1.038), (I-338)+(1.009)+(1.039), (I-338)+(1.009)+(1.040), (I-338)+(1.009)+(1.041), (I-338)+(1.009)+(1.042), (I-338)+(1.009)+(1.043), (I-338)+(1.009)+(1.044), (I-338)+(1.009)+(1.045), (I-338)+(1.009)+(1.046), (I-338)+(1.009)+(1.047), (I-338)+(1.009)+(1.048), (I-338)+(1.009)+(1.049), (I-338)+(1.009)+(1.050), (I-338)+(1.009)+(1.051), (I-338)+(1.009)+(1.052), (I-338)+(1.009)+(1.053), (I-338)+(1.009)+(1.054), (I-338)+(1.009)+(1.055), (I-338)+(1.009)+(1.056), (I-338)+(1.009)+(1.057), (I-338)+(1.009)+(1.058), (I-338)+(1.009)+(1.059), (I-338)+(1.009)+(1.060), (I-338)+(1.009)+(1.061), (I-338)+(1.009)+(1.062), (I-338)+(1.009)+(1.063), (I-338)+(1.009)+(1.064), (I-338)+(1.009)+(1.065), (I-338)+(1.009)+(1.066), (I-338)+(1.009)+(1.067), (I-338)+(1.009)+(1.068), (I-338)+(1.009)+(1.069), (I-338)+(1.009)+(1.070), (I-338)+(1.009)+(1.071), (I-338)+(1.009)+(1.072), (I-338)+(1.009)+(1.073), (I-338)+(1.009)+(1.074), (I-338)+(1.009)+(1.075), (I-338)+(1.009)+(1.076), (I-338)+(1.009)+(1.077), (I-338)+(1.009)+(1.078), (I-338)+(1.009)+(1.079), (I-338)+(1.009)+(1.080), (I-338)+(1.009)+(1.081), (I-338)+(1.009)+(1.082), (I-338)+(1.009)+(1.083), (I-338)+(1.009)+(1.084), (I-338)+(1.009)+(1.085), (I-338)+(1.009)+(1.086), (I-338)+(1.009)+(1.087), (I-338)+(1.009)+(1.088), (I-338)+(1.009)+(1.089), (I-338)+(1.009)+(1.090), (I-338)+(1.009)+(1.091), (I-338)+(1.009)+(1.092), (I-338)+(1.009)+(2.001), (I-338)+(1.009)+(2.002), (I-338)+(1.009)+(2.003), (I-338)+(1.009)+(2.004), (I-338)+(1.009)+(2.005), (I-338)+(1.009)+(2.006), (I-338)+(1.009)+(2.007), (I-338)+(1.009)+(2.008), (I-338)+(1.009)+(2.009), (I-338)+(1.009)+(2.010), (I-338)+(1.009)+(2.011), (I-338)+(1.009)+(2.012), (I-338)+(1.009)+(2.013), (I-338)+(1.009)+(2.014), (I-338)+(1.009)+(2.015), (I-338)+(1.009)+(2.016), (I-338)+(1.009)+(2.017), (I-338)+(1.009)+(2.018), (I-338)+(1.009)+(2.019), (I-338)+(1.009)+(2.020), (I-338)+(1.009)+(2.021), (I-338)+(1.009)+(2.022), (I-338)+(1.009)+(2.023), (I-338)+(1.009)+(2.024), (I-338)+(1.009)+(2.025), (I-338)+(1.009)+(2.026), (I-338)+(1.009)+(2.027), (I-338)+(1.009)+(2.028), (I-338)+(1.009)+(2.029), (I-338)+(1.009)+(2.030), (I-338)+(1.009)+(2.031), (I-338)+(1.009)+(2.032), (I-338)+(1.009)+(2.033), (I-338)+(1.009)+(2.034), (I-338)+(1.009)+(2.035), (I-338)+(1.009)+(2.036), (I-338)+(1.009)+(2.037), (I-338)+(1.009)+(2.038), (I-338)+(1.009)+(2.039), (I-338)+(1.009)+(2.040), (I-338)+(1.009)+(2.041), (I-338)+(1.009)+(2.042), (I-338)+(1.009)+(2.043), (I-338)+(1.009)+(2.044), (I-338)+(1.009)+(2.045), (I-338)+(1.009)+(2.046), (I-338)+(1.009)+(2.047), (I-338)+(1.009)+(2.048), (I-338)+(1.009)+(2.049), (I-338)+(1.009)+(2.050), (I-338)+(1.009)+(2.051), (I-338)+(1.009)+(2.052), (I-338)+(1.009)+(2.053), (I-338)+(1.009)+(2.054), (I-338)+(1.009)+(2.055), (I-338)+(1.009)+(2.056), (I-338)+(1.009)+(2.057), (I-338)+(1.009)+(2.058), (I-338)+(1.009)+(2.059), (I-338)+(1.009)+(3.001), (I-338)+(1.009)+(3.002), (I-338)+(1.009)+(3.003), (I-338)+(1.009)+(3.004), (I-338)+(1.009)+(3.005), (I-338)+(1.009)+(3.006), (I-338)+(1.009)+(3.007), (I-338)+(1.009)+(3.008), (I-338)+(1.009)+(3.009), (I-338)+(1.009)+(3.010), (I-338)+(1.009)+(3.011), (I-338)+(1.009)+(3.012), (I-338)+(1.009)+(3.013), (I-338)+(1.009)+(3.014), (I-338)+(1.009)+(3.015), (I-338)+(1.009)+(3.016), (I-338)+(1.009)+(3.017), (I-338)+(1.009)+(3.018), (I-338)+(1.009)+(3.019), (I-338)+(1.009)+(3.020), (I-338)+(1.009)+(3.021), (I-338)+(1.009)+(3.022), (I-338)+(1.009)+(3.023), (I-338)+(1.009)+(3.024), (I-338)+(1.009)+(3.025), (I-338)+(1.009)+(3.026), (I-338)+(1.009)+(3.027), (I-338)+(1.009)+(3.028), (I-338)+(1.009)+(3.029), (I-338)+(1.009)+(3.030), (I-338)+(1.009)+(3.031), (I-338)+(1.009)+(5.001), (I-338)+(1.009)+(5.002), (I-338)+(1.009)+(5.003), (I-338)+(1.009)+(5.004), (I-338)+(1.009)+(5.005), (I-338)+(1.009)+(5.006), (I-338)+(1.009)+(5.007), (I-338)+(1.009)+(5.008), (I-338)+(1.009)+(5.009), (I-338)+(1.009)+(5.010), (I-338)+(1.009)+(5.011), (I-338)+(1.009)+(5.012), (I-338)+(1.009)+(5.013), (I-338)+(1.009)+(5.014), (I-338)+(1.009)+(5.015), (I-338)+(1.009)+(5.016), (I-338)+(1.009)+(5.017), (I-338)+(1.009)+(5.018), (I-338)+(1.009)+(5.019), (I-338)+(1.009)+(5.020), (I-338)+(1.009)+(5.021), (I-338)+(1.009)+(5.022), (I-338)+(1.009)+(5.023), (I-338)+(1.009)+(6.001), (I-338)+(1.009)+(6.002), (I-338)+(1.009)+(6.003), (I-338)+(1.009)+(6.004), (I-338)+(1.009)+(7.001), (I-338)+(1.009)+(7.002), (I-338)+(1.009)+(7.003), (I-338)+(1.009)+(7.004), (I-338)+(1.009)+(7.005), (I-338)+(1.009)+(7.006), (I-338)+(1.009)+(9.001), (I-338)+(1.009)+(9.002), (I-338)+(1.009)+(9.003), (I-338)+(1.009)+(9.004), (I-338)+(1.009)+(9.005), (I-338)+(1.009)+(9.006), (I-338)+(1.009)+(9.007), (I-338)+(1.009)+(9.008), (I-338)+(1.009)+(9.009), (I-338)+(1.009)+(14.001), (I-338)+(1.009)+(14.002), (I-338)+(1.009)+(15.008), (I-338)+(1.009)+(15.011), (I-338)+(1.009)+(15.012), (I-338)+(1.009)+(15.016), (I-338)+(1.009)+(15.025), (I-338)+(1.009)+(15.027), (I-338)+(1.009)+(15.047), (I-338)+(1.009)+(15.063), (I-338)+(1.009)+(15.064), (I-338)+(1.009)+(16.001), (I-338)+(1.009)+(16.002), (I-338)+(1.009)+(16.003), (I-338)+(1.009)+(16.004), (I-338)+(1.009)+(16.005), (I-338)+(1.009)+(16.006), (I-338)+(1.009)+(16.007), (I-338)+(1.009)+(16.008), (I-338)+(1.009)+(17.001), (I-338)+(1.009)+(17.002), (I-338)+(1.009)+(17.003), (I-338)+(1.009)+(17.004), (I-338)+(1.009)+(17.005), (I-338)+(1.009)+(17.006), (I-338)+(1.009)+(17.007), (I-338)+(1.009)+(17.008), (I-338)+(1.009)+(17.009), (I-338)+(1.009)+(17.010), (I-338)+(1.009)+(17.011), (I-338)+(1.009)+(17.012), (I-338)+(1.009)+(18.001), (I-338)+(1.010)+(1.011), (I-338)+(1.010)+(1.012), (I-338)+(1.010)+(1.013), (I-338)+(1.010)+(1.014), (I-338)+(1.010)+(1.015), (I-338)+(1.010)+(1.016), (I-338)+(1.010)+(1.017), (I-338)+(1.010)+(1.018), (I-338)+(1.010)+(1.019), (I-338)+(1.010)+(1.020), (I-338)+(1.010)+(1.021), (I-338)+(1.010)+(1.022), (I-338)+(1.010)+(1.023), (I-338)+(1.010)+(1.024), (I-338)+(1.010)+(1.025), (I-338)+(1.010)+(1.026), (I-338)+(1.010)+(1.027), (I-338)+(1.010)+(1.028), (I-338)+(1.010)+(1.029), (I-338)+(1.010)+(1.030), (I-338)+(1.010)+(1.031), (I-338)+(1.010)+(1.032), (I-338)+(1.010)+(1.033), (I-338)+(1.010)+(1.034), (I-338)+(1.010)+(1.035), (I-338)+(1.010)+(1.036), (I-338)+(1.010)+(1.037), (I-338)+(1.010)+(1.038), (I-338)+(1.010)+(1.039), (I-338)+(1.010)+(1.040), (I-338)+(1.010)+(1.041), (I-338)+(1.010)+(1.042), (I-338)+(1.010)+(1.043), (I-338)+(1.010)+(1.044), (I-338)+(1.010)+(1.045), (I-338)+(1.010)+(1.046), (I-338)+(1.010)+(1.047), (I-338)+(1.010)+(1.048), (I-338)+(1.010)+(1.049), (I-338)+(1.010)+(1.050), (I-338)+(1.010)+(1.051), (I-338)+(1.010)+(1.052), (I-338)+(1.010)+(1.053), (I-338)+(1.010)+(1.054), (I-338)+(1.010)+(1.055), (I-338)+(1.010)+(1.056), (I-338)+(1.010)+(1.057), (I-338)+(1.010)+(1.058), (I-338)+(1.010)+(1.059), (I-338)+(1.010)+(1.060), (I-338)+(1.010)+(1.061), (I-338)+(1.010)+(1.062), (I-338)+(1.010)+(1.063), (I-338)+(1.010)+(1.064), (I-338)+(1.010)+(1.065), (I-338)+(1.010)+(1.066), (I-338)+(1.010)+(1.067), (I-338)+(1.010)+(1.068), (I-338)+(1.010)+(1.069), (I-338)+(1.010)+(1.070), (I-338)+(1.010)+(1.071), (I-338)+(1.010)+(1.072), (I-338)+(1.010)+(1.073), (I-338)+(1.010)+(1.074), (I-338)+(1.010)+(1.075), (I-338)+(1.010)+(1.076), (I-338)+(1.010)+(1.077), (I-338)+(1.010)+(1.078), (I-338)+(1.010)+(1.079), (I-338)+(1.010)+(1.080), (I-338)+(1.010)+(1.081), (I-338)+(1.010)+(1.082), (I-338)+(1.010)+(1.083), (I-338)+(1.010)+(1.084), (I-338)+(1.010)+(1.085), (I-338)+(1.010)+(1.086), (I-338)+(1.010)+(1.087), (I-338)+(1.010)+(1.088), (I-338)+(1.010)+(1.089), (I-338)+(1.010)+(1.090), (I-338)+(1.010)+(1.091), (I-338)+(1.010)+(1.092), (I-338)+(1.010)+(2.001), (I-338)+(1.010)+(2.002), (I-338)+(1.010)+(2.003), (I-338)+(1.010)+(2.004), (I-338)+(1.010)+(2.005), (I-338)+(1.010)+(2.006), (I-338)+(1.010)+(2.007), (I-338)+(1.010)+(2.008), (I-338)+(1.010)+(2.009), (I-338)+(1.010)+(2.010), (I-338)+(1.010)+(2.011), (I-338)+(1.010)+(2.012), (I-338)+(1.010)+(2.013), (I-338)+(1.010)+(2.014), (I-338)+(1.010)+(2.015), (I-338)+(1.010)+(2.016), (I-338)+(1.010)+(2.017), (I-338)+(1.010)+(2.018), (I-338)+(1.010)+(2.019), (I-338)+(1.010)+(2.020), (I-338)+(1.010)+(2.021), (I-338)+(1.010)+(2.022), (I-338)+(1.010)+(2.023), (I-338)+(1.010)+(2.024), (I-338)+(1.010)+(2.025), (I-338)+(1.010)+(2.026), (I-338)+(1.010)+(2.027), (I-338)+(1.010)+(2.028), (I-338)+(1.010)+(2.029), (I-338)+(1.010)+(2.030), (I-338)+(1.010)+(2.031), (I-338)+(1.010)+(2.032), (I-338)+(1.010)+(2.033), (I-338)+(1.010)+(2.034), (I-338)+(1.010)+(2.035), (I-338)+(1.010)+(2.036), (I-338)+(1.010)+(2.037), (I-338)+(1.010)+(2.038), (I-338)+(1.010)+(2.039), (I-338)+(1.010)+(2.040), (I-338)+(1.010)+(2.041), (I-338)+(1.010)+(2.042), (I-338)+(1.010)+(2.043), (I-338)+(1.010)+(2.044), (I-338)+(1.010)+(2.045), (I-338)+(1.010)+(2.046), (I-338)+(1.010)+(2.047), (I-338)+(1.010)+(2.048), (I-338)+(1.010)+(2.049), (I-338)+(1.010)+(2.050), (I-338)+(1.010)+(2.051), (I-338)+(1.010)+(2.052), (I-338)+(1.010)+(2.053), (I-338)+(1.010)+(2.054), (I-338)+(1.010)+(2.055), (I-338)+(1.010)+(2.056), (I-338)+(1.010)+(2.057), (I-338)+(1.010)+(2.058), (I-338)+(1.010)+(2.059), (I-338)+(1.010)+(3.001), (I-338)+(1.010)+(3.002), (I-338)+(1.010)+(3.003), (I-338)+(1.010)+(3.004), (I-338)+(1.010)+(3.005), (I-338)+(1.010)+(3.006), (I-338)+(1.010)+(3.007), (I-338)+(1.010)+(3.008), (I-338)+(1.010)+(3.009), (I-338)+(1.010)+(3.010), (I-338)+(1.010)+(3.011), (I-338)+(1.010)+(3.012), (I-338)+(1.010)+(3.013), (I-338)+(1.010)+(3.014), (I-338)+(1.010)+(3.015), (I-338)+(1.010)+(3.016), (I-338)+(1.010)+(3.017), (I-338)+(1.010)+(3.018), (I-338)+(1.010)+(3.019), (I-338)+(1.010)+(3.020), (I-338)+(1.010)+(3.021), (I-338)+(1.010)+(3.022), (I-338)+(1.010)+(3.023), (I-338)+(1.010)+(3.024), (I-338)+(1.010)+(3.025), (I-338)+(1.010)+(3.026), (I-338)+(1.010)+(3.027), (I-338)+(1.010)+(3.028), (I-338)+(1.010)+(3.029), (I-338)+(1.010)+(3.030), (I-338)+(1.010)+(3.031), (I-338)+(1.010)+(5.001), (I-338)+(1.010)+(5.002), (I-338)+(1.010)+(5.003), (I-338)+(1.010)+(5.004), (I-338)+(1.010)+(5.005), (I-338)+(1.010)+(5.006), (I-338)+(1.010)+(5.007), (I-338)+(1.010)+(5.008), (I-338)+(1.010)+(5.009), (I-338)+(1.010)+(5.010), (I-338)+(1.010)+(5.011), (I-338)+(1.010)+(5.012), (I-338)+(1.010)+(5.013), (I-338)+(1.010)+(5.014), (I-338)+(1.010)+(5.015), (I-338)+(1.010)+(5.016), (I-338)+(1.010)+(5.017), (I-338)+(1.010)+(5.018), (I-338)+(1.010)+(5.019), (I-338)+(1.010)+(5.020), (I-338)+(1.010)+(5.021), (I-338)+(1.010)+(5.022), (I-338)+(1.010)+(5.023), (I-338)+(1.010)+(6.001), (I-338)+(1.010)+(6.002), (I-338)+(1.010)+(6.003), (I-338)+(1.010)+(6.004), (I-338)+(1.010)+(7.001), (I-338)+(1.010)+(7.002), (I-338)+(1.010)+(7.003), (I-338)+(1.010)+(7.004), (I-338)+(1.010)+(7.005), (I-338)+(1.010)+(7.006), (I-338)+(1.010)+(9.001), (I-338)+(1.010)+(9.002), (I-338)+(1.010)+(9.003), (I-338)+(1.010)+(9.004), (I-338)+(1.010)+(9.005), (I-338)+(1.010)+(9.006), (I-338)+(1.010)+(9.007), (I-338)+(1.010)+(9.008), (I-338)+(1.010)+(9.009), (I-338)+(1.010)+(14.001), (I-338)+(1.010)+(14.002), (I-338)+(1.010)+(15.008), (I-338)+(1.010)+(15.011), (I-338)+(1.010)+(15.012), (I-338)+(1.010)+(15.016), (I-338)+(1.010)+(15.025), (I-338)+(1.010)+(15.027), (I-338)+(1.010)+(15.047), (I-338)+(1.010)+(15.063), (I-338)+(1.010)+(15.064), (I-338)+(1.010)+(16.001), (I-338)+(1.010)+(16.002), (I-338)+(1.010)+(16.003), (I-338)+(1.010)+(16.004), (I-338)+(1.010)+(16.005), (I-338)+(1.010)+(16.006), (I-338)+(1.010)+(16.007), (I-338)+(1.010)+(16.008), (I-338)+(1.010)+(17.001), (I-338)+(1.010)+(17.002), (I-338)+(1.010)+(17.003), (I-338)+(1.010)+(17.004), (I-338)+(1.010)+(17.005), (I-338)+(1.010)+(17.006), (I-338)+(1.010)+(17.007), (I-338)+(1.010)+(17.008), (I-338)+(1.010)+(17.009), (I-338)+(1.010)+(17.010), (I-338)+(1.010)+(17.011), (I-338)+(1.010)+(17.012), (I-338)+(1.010)+(18.001), (I-338)+(1.011)+(1.012), (I-338)+(1.011)+(1.013), (I-338)+(1.011)+(1.014), (I-338)+(1.011)+(1.015), (I-338)+(1.011)+(1.016), (I-338)+(1.011)+(1.017), (I-338)+(1.011)+(1.018), (I-338)+(1.011)+(1.019), (I-338)+(1.011)+(1.020), (I-338)+(1.011)+(1.021), (I-338)+(1.011)+(1.022), (I-338)+(1.011)+(1.023), (I-338)+(1.011)+(1.024), (I-338)+(1.011)+(1.025), (I-338)+(1.011)+(1.026), (I-338)+(1.011)+(1.027), (I-338)+(1.011)+(1.028), (I-338)+(1.011)+(1.029), (I-338)+(1.011)+(1.030), (I-338)+(1.011)+(1.031), (I-338)+(1.011)+(1.032), (I-338)+(1.011)+(1.033), (I-338)+(1.011)+(1.034), (I-338)+(1.011)+(1.035), (I-338)+(1.011)+(1.036), (I-338)+(1.011)+(1.037), (I-338)+(1.011)+(1.038), (I-338)+(1.011)+(1.039), (I-338)+(1.011)+(1.040), (I-338)+(1.011)+(1.041), (I-338)+(1.011)+(1.042), (I-338)+(1.011)+(1.043), (I-338)+(1.011)+(1.044), (I-338)+(1.011)+(1.045), (I-338)+(1.011)+(1.046), (I-338)+(1.011)+(1.047), (I-338)+(1.011)+(1.048), (I-338)+(1.011)+(1.049), (I-338)+(1.011)+(1.050), (I-338)+(1.011)+(1.051), (I-338)+(1.011)+(1.052), (I-338)+(1.011)+(1.053), (I-338)+(1.011)+(1.054), (I-338)+(1.011)+(1.055), (I-338)+(1.011)+(1.056), (I-338)+(1.011)+(1.057), (I-338)+(1.011)+(1.058), (I-338)+(1.011)+(1.059), (I-338)+(1.011)+(1.060), (I-338)+(1.011)+(1.061), (I-338)+(1.011)+(1.062), (I-338)+(1.011)+(1.063), (I-338)+(1.011)+(1.064), (I-338)+(1.011)+(1.065), (I-338)+(1.011)+(1.066), (I-338)+(1.011)+(1.067), (I-338)+(1.011)+(1.068), (I-338)+(1.011)+(1.069), (I-338)+(1.011)+(1.070), (I-338)+(1.011)+(1.071), (I-338)+(1.011)+(1.072), (I-338)+(1.011)+(1.073), (I-338)+(1.011)+(1.074), (I-338)+(1.011)+(1.075), (I-338)+(1.011)+(1.076), (I-338)+(1.011)+(1.077), (I-338)+(1.011)+(1.078), (I-338)+(1.011)+(1.079), (I-338)+(1.011)+(1.080), (I-338)+(1.011)+(1.081), (I-338)+(1.011)+(1.082), (I-338)+(1.011)+(1.083), (I-338)+(1.011)+(1.084), (I-338)+(1.011)+(1.085), (I-338)+(1.011)+(1.086), (I-338)+(1.011)+(1.087), (I-338)+(1.011)+(1.088), (I-338)+(1.011)+(1.089), (I-338)+(1.011)+(1.090), (I-338)+(1.011)+(1.091), (I-338)+(1.011)+(1.092), (I-338)+(1.011)+(2.001), (I-338)+(1.011)+(2.002), (I-338)+(1.011)+(2.003), (I-338)+(1.011)+(2.004), (I-338)+(1.011)+(2.005), (I-338)+(1.011)+(2.006), (I-338)+(1.011)+(2.007), (I-338)+(1.011)+(2.008), (I-338)+(1.011)+(2.009), (I-338)+(1.011)+(2.010), (I-338)+(1.011)+(2.011), (I-338)+(1.011)+(2.012), (I-338)+(1.011)+(2.013), (I-338)+(1.011)+(2.014), (I-338)+(1.011)+(2.015), (I-338)+(1.011)+(2.016), (I-338)+(1.011)+(2.017), (I-338)+(1.011)+(2.018), (I-338)+(1.011)+(2.019), (I-338)+(1.011)+(2.020), (I-338)+(1.011)+(2.021), (I-338)+(1.011)+(2.022), (I-338)+(1.011)+(2.023), (I-338)+(1.011)+(2.024), (I-338)+(1.011)+(2.025), (I-338)+(1.011)+(2.026), (I-338)+(1.011)+(2.027), (I-338)+(1.011)+(2.028), (I-338)+(1.011)+(2.029), (I-338)+(1.011)+(2.030), (I-338)+(1.011)+(2.031), (I-338)+(1.011)+(2.032), (I-338)+(1.011)+(2.033), (I-338)+(1.011)+(2.034), (I-338)+(1.011)+(2.035), (I-338)+(1.011)+(2.036), (I-338)+(1.011)+(2.037), (I-338)+(1.011)+(2.038), (I-338)+(1.011)+(2.039), (I-338)+(1.011)+(2.040), (I-338)+(1.011)+(2.041), (I-338)+(1.011)+(2.042), (I-338)+(1.011)+(2.043), (I-338)+(1.011)+(2.044), (I-338)+(1.011)+(2.045), (I-338)+(1.011)+(2.046), (I-338)+(1.011)+(2.047), (I-338)+(1.011)+(2.048), (I-338)+(1.011)+(2.049), (I-338)+(1.011)+(2.050), (I-338)+(1.011)+(2.051), (I-338)+(1.011)+(2.052), (I-338)+(1.011)+(2.053), (I-338)+(1.011)+(2.054), (I-338)+(1.011)+(2.055), (I-338)+(1.011)+(2.056), (I-338)+(1.011)+(2.057), (I-338)+(1.011)+(2.058), (I-338)+(1.011)+(2.059), (I-338)+(1.011)+(3.001), (I-338)+(1.011)+(3.002), (I-338)+(1.011)+(3.003), (I-338)+(1.011)+(3.004), (I-338)+(1.011)+(3.005), (I-338)+(1.011)+(3.006), (I-338)+(1.011)+(3.007), (I-338)+(1.011)+(3.008), (I-338)+(1.011)+(3.009), (I-338)+(1.011)+(3.010), (I-338)+(1.011)+(3.011), (I-338)+(1.011)+(3.012), (I-338)+(1.011)+(3.013), (I-338)+(1.011)+(3.014), (I-338)+(1.011)+(3.015), (I-338)+(1.011)+(3.016), (I-338)+(1.011)+(3.017), (I-338)+(1.011)+(3.018), (I-338)+(1.011)+(3.019), (I-338)+(1.011)+(3.020), (I-338)+(1.011)+(3.021), (I-338)+(1.011)+(3.022), (I-338)+(1.011)+(3.023), (I-338)+(1.011)+(3.024), (I-338)+(1.011)+(3.025), (I-338)+(1.011)+(3.026), (I-338)+(1.011)+(3.027), (I-338)+(1.011)+(3.028), (I-338)+(1.011)+(3.029), (I-338)+(1.011)+(3.030), (I-338)+(1.011)+(3.031), (I-338)+(1.011)+(5.001), (I-338)+(1.011)+(5.002), (I-338)+(1.011)+(5.003), (I-338)+(1.011)+(5.004), (I-338)+(1.011)+(5.005), (I-338)+(1.011)+(5.006), (I-338)+(1.011)+(5.007), (I-338)+(1.011)+(5.008), (I-338)+(1.011)+(5.009), (I-338)+(1.011)+(5.010), (I-338)+(1.011)+(5.011), (I-338)+(1.011)+(5.012), (I-338)+(1.011)+(5.013), (I-338)+(1.011)+(5.014), (I-338)+(1.011)+(5.015), (I-338)+(1.011)+(5.016), (I-338)+(1.011)+(5.017), (I-338)+(1.011)+(5.018), (I-338)+(1.011)+(5.019), (I-338)+(1.011)+(5.020), (I-338)+(1.011)+(5.021), (I-338)+(1.011)+(5.022), (I-338)+(1.011)+(5.023), (I-338)+(1.011)+(6.001), (I-338)+(1.011)+(6.002), (I-338)+(1.011)+(6.003), (I-338)+(1.011)+(6.004), (I-338)+(1.011)+(7.001), (I-338)+(1.011)+(7.002), (I-338)+(1.011)+(7.003), (I-338)+(1.011)+(7.004), (I-338)+(1.011)+(7.005), (I-338)+(1.011)+(7.006), (I-338)+(1.011)+(9.001), (I-338)+(1.011)+(9.002), (I-338)+(1.011)+(9.003), (I-338)+(1.011)+(9.004), (I-338)+(1.011)+(9.005), (I-338)+(1.011)+(9.006), (I-338)+(1.011)+(9.007), (I-338)+(1.011)+(9.008), (I-338)+(1.011)+(9.009), (I-338)+(1.011)+(14.001), (I-338)+(1.011)+(14.002), (I-338)+(1.011)+(15.008), (I-338)+(1.011)+(15.011), (I-338)+(1.011)+(15.012), (I-338)+(1.011)+(15.016), (I-338)+(1.011)+(15.025), (I-338)+(1.011)+(15.027), (I-338)+(1.011)+(15.047), (I-338)+(1.011)+(15.063), (I-338)+(1.011)+(15.064), (I-338)+(1.011)+(16.001), (I-338)+(1.011)+(16.002), (I-338)+(1.011)+(16.003), (I-338)+(1.011)+(16.004), (I-338)+(1.011)+(16.005), (I-338)+(1.011)+(16.006), (I-338)+(1.011)+(16.007), (I-338)+(1.011)+(16.008), (I-338)+(1.011)+(17.001), (I-338)+(1.011)+(17.002), (I-338)+(1.011)+(17.003), (I-338)+(1.011)+(17.004), (I-338)+(1.011)+(17.005), (I-338)+(1.011)+(17.006), (I-338)+(1.011)+(17.007), (I-338)+(1.011)+(17.008), (I-338)+(1.011)+(17.009), (I-338)+(1.011)+(17.010), (I-338)+(1.011)+(17.011), (I-338)+(1.011)+(17.012), (I-338)+(1.011)+(18.001), (I-338)+(1.012)+(1.013), (I-338)+(1.012)+(1.014), (I-338)+(1.012)+(1.015), (I-338)+(1.012)+(1.016), (I-338)+(1.012)+(1.017), (I-338)+(1.012)+(1.018), (I-338)+(1.012)+(1.019), (I-338)+(1.012)+(1.020), (I-338)+(1.012)+(1.021), (I-338)+(1.012)+(1.022), (I-338)+(1.012)+(1.023), (I-338)+(1.012)+(1.024), (I-338)+(1.012)+(1.025), (I-338)+(1.012)+(1.026), (I-338)+(1.012)+(1.027), (I-338)+(1.012)+(1.028), (I-338)+(1.012)+(1.029), (I-338)+(1.012)+(1.030), (I-338)+(1.012)+(1.031), (I-338)+(1.012)+(1.032), (I-338)+(1.012)+(1.033), (I-338)+(1.012)+(1.034), (I-338)+(1.012)+(1.035), (I-338)+(1.012)+(1.036), (I-338)+(1.012)+(1.037), (I-338)+(1.012)+(1.038), (I-338)+(1.012)+(1.039), (I-338)+(1.012)+(1.040), (I-338)+(1.012)+(1.041), (I-338)+(1.012)+(1.042), (I-338)+(1.012)+(1.043), (I-338)+(1.012)+(1.044), (I-338)+(1.012)+(1.045), (I-338)+(1.012)+(1.046), (I-338)+(1.012)+(1.047), (I-338)+(1.012)+(1.048), (I-338)+(1.012)+(1.049), (I-338)+(1.012)+(1.050), (I-338)+(1.012)+(1.051), (I-338)+(1.012)+(1.052), (I-338)+(1.012)+(1.053), (I-338)+(1.012)+(1.054), (I-338)+(1.012)+(1.055), (I-338)+(1.012)+(1.056), (I-338)+(1.012)+(1.057), (I-338)+(1.012)+(1.058), (I-338)+(1.012)+(1.059), (I-338)+(1.012)+(1.060), (I-338)+(1.012)+(1.061), (I-338)+(1.012)+(1.062), (I-338)+(1.012)+(1.063), (I-338)+(1.012)+(1.064), (I-338)+(1.012)+(1.065), (I-338)+(1.012)+(1.066), (I-338)+(1.012)+(1.067), (I-338)+(1.012)+(1.068), (I-338)+(1.012)+(1.069), (I-338)+(1.012)+(1.070), (I-338)+(1.012)+(1.071), (I-338)+(1.012)+(1.072), (I-338)+(1.012)+(1.073), (I-338)+(1.012)+(1.074), (I-338)+(1.012)+(1.075), (I-338)+(1.012)+(1.076), (I-338)+(1.012)+(1.077), (I-338)+(1.012)+(1.078), (I-338)+(1.012)+(1.079), (I-338)+(1.012)+(1.080), (I-338)+(1.012)+(1.081), (I-338)+(1.012)+(1.082), (I-338)+(1.012)+(1.083), (I-338)+(1.012)+(1.084), (I-338)+(1.012)+(1.085), (I-338)+(1.012)+(1.086), (I-338)+(1.012)+(1.087), (I-338)+(1.012)+(1.088), (I-338)+(1.012)+(1.089), (I-338)+(1.012)+(1.090), (I-338)+(1.012)+(1.091), (I-338)+(1.012)+(1.092), (I-338)+(1.012)+(2.001), (I-338)+(1.012)+(2.002), (I-338)+(1.012)+(2.003), (I-338)+(1.012)+(2.004), (I-338)+(1.012)+(2.005), (I-338)+(1.012)+(2.006), (I-338)+(1.012)+(2.007), (I-338)+(1.012)+(2.008), (I-338)+(1.012)+(2.009), (I-338)+(1.012)+(2.010), (I-338)+(1.012)+(2.011), (I-338)+(1.012)+(2.012), (I-338)+(1.012)+(2.013), (I-338)+(1.012)+(2.014), (I-338)+(1.012)+(2.015), (I-338)+(1.012)+(2.016), (I-338)+(1.012)+(2.017), (I-338)+(1.012)+(2.018), (I-338)+(1.012)+(2.019), (I-338)+(1.012)+(2.020), (I-338)+(1.012)+(2.021), (I-338)+(1.012)+(2.022), (I-338)+(1.012)+(2.023), (I-338)+(1.012)+(2.024), (I-338)+(1.012)+(2.025), (I-338)+(1.012)+(2.026), (I-338)+(1.012)+(2.027), (I-338)+(1.012)+(2.028), (I-338)+(1.012)+(2.029), (I-338)+(1.012)+(2.030), (I-338)+(1.012)+(2.031), (I-338)+(1.012)+(2.032), (I-338)+(1.012)+(2.033), (I-338)+(1.012)+(2.034), (I-338)+(1.012)+(2.035), (I-338)+(1.012)+(2.036), (I-338)+(1.012)+(2.037), (I-338)+(1.012)+(2.038), (I-338)+(1.012)+(2.039), (I-338)+(1.012)+(2.040), (I-338)+(1.012)+(2.041), (I-338)+(1.012)+(2.042), (I-338)+(1.012)+(2.043), (I-338)+(1.012)+(2.044), (I-338)+(1.012)+(2.045), (I-338)+(1.012)+(2.046), (I-338)+(1.012)+(2.047), (I-338)+(1.012)+(2.048), (I-338)+(1.012)+(2.049), (I-338)+(1.012)+(2.050), (I-338)+(1.012)+(2.051), (I-338)+(1.012)+(2.052), (I-338)+(1.012)+(2.053), (I-338)+(1.012)+(2.054), (I-338)+(1.012)+(2.055), (I-338)+(1.012)+(2.056), (I-338)+(1.012)+(2.057), (I-338)+(1.012)+(2.058), (I-338)+(1.012)+(2.059), (I-338)+(1.012)+(3.001), (I-338)+(1.012)+(3.002), (I-338)+(1.012)+(3.003), (I-338)+(1.012)+(3.004), (I-338)+(1.012)+(3.005), (I-338)+(1.012)+(3.006), (I-338)+(1.012)+(3.007), (I-338)+(1.012)+(3.008), (I-338)+(1.012)+(3.009), (I-338)+(1.012)+(3.010), (I-338)+(1.012)+(3.011), (I-338)+(1.012)+(3.012), (I-338)+(1.012)+(3.013), (I-338)+(1.012)+(3.014), (I-338)+(1.012)+(3.015), (I-338)+(1.012)+(3.016), (I-338)+(1.012)+(3.017), (I-338)+(1.012)+(3.018), (I-338)+(1.012)+(3.019), (I-338)+(1.012)+(3.020), (I-338)+(1.012)+(3.021), (I-338)+(1.012)+(3.022), (I-338)+(1.012)+(3.023), (I-338)+(1.012)+(3.024), (I-338)+(1.012)+(3.025), (I-338)+(1.012)+(3.026), (I-338)+(1.012)+(3.027), (I-338)+(1.012)+(3.028), (I-338)+(1.012)+(3.029), (I-338)+(1.012)+(3.030), (I-338)+(1.012)+(3.031), (I-338)+(1.012)+(5.001), (I-338)+(1.012)+(5.002), (I-338)+(1.012)+(5.003), (I-338)+(1.012)+(5.004), (I-338)+(1.012)+(5.005), (I-338)+(1.012)+(5.006), (I-338)+(1.012)+(5.007), (I-338)+(1.012)+(5.008), (I-338)+(1.012)+(5.009), (I-338)+(1.012)+(5.010), (I-338)+(1.012)+(5.011), (I-338)+(1.012)+(5.012), (I-338)+(1.012)+(5.013), (I-338)+(1.012)+(5.014), (I-338)+(1.012)+(5.015), (I-338)+(1.012)+(5.016), (I-338)+(1.012)+(5.017), (I-338)+(1.012)+(5.018), (I-338)+(1.012)+(5.019), (I-338)+(1.012)+(5.020), (I-338)+(1.012)+(5.021), (I-338)+(1.012)+(5.022), (I-338)+(1.012)+(5.023), (I-338)+(1.012)+(6.001), (I-338)+(1.012)+(6.002), (I-338)+(1.012)+(6.003), (I-338)+(1.012)+(6.004), (I-338)+(1.012)+(7.001), (I-338)+(1.012)+(7.002), (I-338)+(1.012)+(7.003), (I-338)+(1.012)+(7.004), (I-338)+(1.012)+(7.005), (I-338)+(1.012)+(7.006), (I-338)+(1.012)+(9.001), (I-338)+(1.012)+(9.002), (I-338)+(1.012)+(9.003), (I-338)+(1.012)+(9.004), (I-338)+(1.012)+(9.005), (I-338)+(1.012)+(9.006), (I-338)+(1.012)+(9.007), (I-338)+(1.012)+(9.008), (I-338)+(1.012)+(9.009), (I-338)+(1.012)+(14.001), (I-338)+(1.012)+(14.002), (I-338)+(1.012)+(15.008), (I-338)+(1.012)+(15.011), (I-338)+(1.012)+(15.012), (I-338)+(1.012)+(15.016), (I-338)+(1.012)+(15.025), (I-338)+(1.012)+(15.027), (I-338)+(1.012)+(15.047), (I-338)+(1.012)+(15.063), (I-338)+(1.012)+(15.064), (I-338)+(1.012)+(16.001), (I-338)+(1.012)+(16.002), (I-338)+(1.012)+(16.003), (I-338)+(1.012)+(16.004), (I-338)+(1.012)+(16.005), (I-338)+(1.012)+(16.006), (I-338)+(1.012)+(16.007), (I-338)+(1.012)+(16.008), (I-338)+(1.012)+(17.001), (I-338)+(1.012)+(17.002), (I-338)+(1.012)+(17.003), (I-338)+(1.012)+(17.004), (I-338)+(1.012)+(17.005), (I-338)+(1.012)+(17.006), (I-338)+(1.012)+(17.007), (I-338)+(1.012)+(17.008), (I-338)+(1.012)+(17.009), (I-338)+(1.012)+(17.010), (I-338)+(1.012)+(17.011), (I-338)+(1.012)+(17.012), (I-338)+(1.012)+(18.001), (I-338)+(1.013)+(1.014), (I-338)+(1.013)+(1.015), (I-338)+(1.013)+(1.016), (I-338)+(1.013)+(1.017), (I-338)+(1.013)+(1.018), (I-338)+(1.013)+(1.019), (I-338)+(1.013)+(1.020), (I-338)+(1.013)+(1.021), (I-338)+(1.013)+(1.022), (I-338)+(1.013)+(1.023), (I-338)+(1.013)+(1.024), (I-338)+(1.013)+(1.025), (I-338)+(1.013)+(1.026), (I-338)+(1.013)+(1.027), (I-338)+(1.013)+(1.028), (I-338)+(1.013)+(1.029), (I-338)+(1.013)+(1.030), (I-338)+(1.013)+(1.031), (I-338)+(1.013)+(1.032), (I-338)+(1.013)+(1.033), (I-338)+(1.013)+(1.034), (I-338)+(1.013)+(1.035), (I-338)+(1.013)+(1.036), (I-338)+(1.013)+(1.037), (I-338)+(1.013)+(1.038), (I-338)+(1.013)+(1.039), (I-338)+(1.013)+(1.040), (I-338)+(1.013)+(1.041), (I-338)+(1.013)+(1.042), (I-338)+(1.013)+(1.043), (I-338)+(1.013)+(1.044), (I-338)+(1.013)+(1.045), (I-338)+(1.013)+(1.046), (I-338)+(1.013)+(1.047), (I-338)+(1.013)+(1.048), (I-338)+(1.013)+(1.049), (I-338)+(1.013)+(1.050), (I-338)+(1.013)+(1.051), (I-338)+(1.013)+(1.052), (I-338)+(1.013)+(1.053), (I-338)+(1.013)+(1.054), (I-338)+(1.013)+(1.055), (I-338)+(1.013)+(1.056), (I-338)+(1.013)+(1.057), (I-338)+(1.013)+(1.058), (I-338)+(1.013)+(1.059), (I-338)+(1.013)+(1.060), (I-338)+(1.013)+(1.061), (I-338)+(1.013)+(1.062), (I-338)+(1.013)+(1.063), (I-338)+(1.013)+(1.064), (I-338)+(1.013)+(1.065), (I-338)+(1.013)+(1.066), (I-338)+(1.013)+(1.067), (I-338)+(1.013)+(1.068), (I-338)+(1.013)+(1.069), (I-338)+(1.013)+(1.070), (I-338)+(1.013)+(1.071), (I-338)+(1.013)+(1.072), (I-338)+(1.013)+(1.073), (I-338)+(1.013)+(1.074), (I-338)+(1.013)+(1.075), (I-338)+(1.013)+(1.076), (I-338)+(1.013)+(1.077), (I-338)+(1.013)+(1.078), (I-338)+(1.013)+(1.079), (I-338)+(1.013)+(1.080), (I-338)+(1.013)+(1.081), (I-338)+(1.013)+(1.082), (I-338)+(1.013)+(1.083), (I-338)+(1.013)+(1.084), (I-338)+(1.013)+(1.085), (I-338)+(1.013)+(1.086), (I-338)+(1.013)+(1.087), (I-338)+(1.013)+(1.088), (I-338)+(1.013)+(1.089), (I-338)+(1.013)+(1.090), (I-338)+(1.013)+(1.091), (I-338)+(1.013)+(1.092), (I-338)+(1.013)+(2.001), (I-338)+(1.013)+(2.002), (I-338)+(1.013)+(2.003), (I-338)+(1.013)+(2.004), (I-338)+(1.013)+(2.005), (I-338)+(1.013)+(2.006), (I-338)+(1.013)+(2.007), (I-338)+(1.013)+(2.008), (I-338)+(1.013)+(2.009), (I-338)+(1.013)+(2.010), (I-338)+(1.013)+(2.011), (I-338)+(1.013)+(2.012), (I-338)+(1.013)+(2.013), (I-338)+(1.013)+(2.014), (I-338)+(1.013)+(2.015), (I-338)+(1.013)+(2.016), (I-338)+(1.013)+(2.017), (I-338)+(1.013)+(2.018), (I-338)+(1.013)+(2.019), (I-338)+(1.013)+(2.020), (I-338)+(1.013)+(2.021), (I-338)+(1.013)+(2.022), (I-338)+(1.013)+(2.023), (I-338)+(1.013)+(2.024), (I-338)+(1.013)+(2.025), (I-338)+(1.013)+(2.026), (I-338)+(1.013)+(2.027), (I-338)+(1.013)+(2.028), (I-338)+(1.013)+(2.029), (I-338)+(1.013)+(2.030), (I-338)+(1.013)+(2.031), (I-338)+(1.013)+(2.032), (I-338)+(1.013)+(2.033), (I-338)+(1.013)+(2.034), (I-338)+(1.013)+(2.035), (I-338)+(1.013)+(2.036), (I-338)+(1.013)+(2.037), (I-338)+(1.013)+(2.038), (I-338)+(1.013)+(2.039), (I-338)+(1.013)+(2.040), (I-338)+(1.013)+(2.041), (I-338)+(1.013)+(2.042), (I-338)+(1.013)+(2.043), (I-338)+(1.013)+(2.044), (I-338)+(1.013)+(2.045), (I-338)+(1.013)+(2.046), (I-338)+(1.013)+(2.047), (I-338)+(1.013)+(2.048), (I-338)+(1.013)+(2.049), (I-338)+(1.013)+(2.050), (I-338)+(1.013)+(2.051), (I-338)+(1.013)+(2.052), (I-338)+(1.013)+(2.053), (I-338)+(1.013)+(2.054), (I-338)+(1.013)+(2.055), (I-338)+(1.013)+(2.056), (I-338)+(1.013)+(2.057), (I-338)+(1.013)+(2.058), (I-338)+(1.013)+(2.059), (I-338)+(1.013)+(3.001), (I-338)+(1.013)+(3.002), (I-338)+(1.013)+(3.003), (I-338)+(1.013)+(3.004), (I-338)+(1.013)+(3.005), (I-338)+(1.013)+(3.006), (I-338)+(1.013)+(3.007), (I-338)+(1.013)+(3.008), (I-338)+(1.013)+(3.009), (I-338)+(1.013)+(3.010), (I-338)+(1.013)+(3.011), (I-338)+(1.013)+(3.012), (I-338)+(1.013)+(3.013), (I-338)+(1.013)+(3.014), (I-338)+(1.013)+(3.015), (I-338)+(1.013)+(3.016), (I-338)+(1.013)+(3.017), (I-338)+(1.013)+(3.018), (I-338)+(1.013)+(3.019), (I-338)+(1.013)+(3.020), (I-338)+(1.013)+(3.021), (I-338)+(1.013)+(3.022), (I-338)+(1.013)+(3.023), (I-338)+(1.013)+(3.024), (I-338)+(1.013)+(3.025), (I-338)+(1.013)+(3.026), (I-338)+(1.013)+(3.027), (I-338)+(1.013)+(3.028), (I-338)+(1.013)+(3.029), (I-338)+(1.013)+(3.030), (I-338)+(1.013)+(3.031), (I-338)+(1.013)+(5.001), (I-338)+(1.013)+(5.002), (I-338)+(1.013)+(5.003), (I-338)+(1.013)+(5.004), (I-338)+(1.013)+(5.005), (I-338)+(1.013)+(5.006), (I-338)+(1.013)+(5.007), (I-338)+(1.013)+(5.008), (I-338)+(1.013)+(5.009), (I-338)+(1.013)+(5.010), (I-338)+(1.013)+(5.011), (I-338)+(1.013)+(5.012), (I-338)+(1.013)+(5.013), (I-338)+(1.013)+(5.014), (I-338)+(1.013)+(5.015), (I-338)+(1.013)+(5.016), (I-338)+(1.013)+(5.017), (I-338)+(1.013)+(5.018), (I-338)+(1.013)+(5.019), (I-338)+(1.013)+(5.020), (I-338)+(1.013)+(5.021), (I-338)+(1.013)+(5.022), (I-338)+(1.013)+(5.023), (I-338)+(1.013)+(6.001), (I-338)+(1.013)+(6.002), (I-338)+(1.013)+(6.003), (I-338)+(1.013)+(6.004), (I-338)+(1.013)+(7.001), (I-338)+(1.013)+(7.002), (I-338)+(1.013)+(7.003), (I-338)+(1.013)+(7.004), (I-338)+(1.013)+(7.005), (I-338)+(1.013)+(7.006), (I-338)+(1.013)+(9.001), (I-338)+(1.013)+(9.002), (I-338)+(1.013)+(9.003), (I-338)+(1.013)+(9.004), (I-338)+(1.013)+(9.005), (I-338)+(1.013)+(9.006), (I-338)+(1.013)+(9.007), (I-338)+(1.013)+(9.008), (I-338)+(1.013)+(9.009), (I-338)+(1.013)+(14.001), (I-338)+(1.013)+(14.002), (I-338)+(1.013)+(15.008), (I-338)+(1.013)+(15.011), (I-338)+(1.013)+(15.012), (I-338)+(1.013)+(15.016), (I-338)+(1.013)+(15.025), (I-338)+(1.013)+(15.027), (I-338)+(1.013)+(15.047), (I-338)+(1.013)+(15.063), (I-338)+(1.013)+(15.064), (I-338)+(1.013)+(16.001), (I-338)+(1.013)+(16.002), (I-338)+(1.013)+(16.003), (I-338)+(1.013)+(16.004), (I-338)+(1.013)+(16.005), (I-338)+(1.013)+(16.006), (I-338)+(1.013)+(16.007), (I-338)+(1.013)+(16.008), (I-338)+(1.013)+(17.001), (I-338)+(1.013)+(17.002), (I-338)+(1.013)+(17.003), (I-338)+(1.013)+(17.004), (I-338)+(1.013)+(17.005), (I-338)+(1.013)+(17.006), (I-338)+(1.013)+(17.007), (I-338)+(1.013)+(17.008), (I-338)+(1.013)+(17.009), (I-338)+(1.013)+(17.010), (I-338)+(1.013)+(17.011), (I-338)+(1.013)+(17.012), (I-338)+(1.013)+(18.001), (I-338)+(1.014)+(1.015), (I-338)+(1.014)+(1.016), (I-338)+(1.014)+(1.017), (I-338)+(1.014)+(1.018), (I-338)+(1.014)+(1.019), (I-338)+(1.014)+(1.020), (I-338)+(1.014)+(1.021), (I-338)+(1.014)+(1.022), (I-338)+(1.014)+(1.023), (I-338)+(1.014)+(1.024), (I-338)+(1.014)+(1.025), (I-338)+(1.014)+(1.026), (I-338)+(1.014)+(1.027), (I-338)+(1.014)+(1.028), (I-338)+(1.014)+(1.029), (I-338)+(1.014)+(1.030), (I-338)+(1.014)+(1.031), (I-338)+(1.014)+(1.032), (I-338)+(1.014)+(1.033), (I-338)+(1.014)+(1.034), (I-338)+(1.014)+(1.035), (I-338)+(1.014)+(1.036), (I-338)+(1.014)+(1.037), (I-338)+(1.014)+(1.038), (I-338)+(1.014)+(1.039), (I-338)+(1.014)+(1.040), (I-338)+(1.014)+(1.041), (I-338)+(1.014)+(1.042), (I-338)+(1.014)+(1.043), (I-338)+(1.014)+(1.044), (I-338)+(1.014)+(1.045), (I-338)+(1.014)+(1.046), (I-338)+(1.014)+(1.047), (I-338)+(1.014)+(1.048), (I-338)+(1.014)+(1.049), (I-338)+(1.014)+(1.050), (I-338)+(1.014)+(1.051), (I-338)+(1.014)+(1.052), (I-338)+(1.014)+(1.053), (I-338)+(1.014)+(1.054), (I-338)+(1.014)+(1.055), (I-338)+(1.014)+(1.056), (I-338)+(1.014)+(1.057), (I-338)+(1.014)+(1.058), (I-338)+(1.014)+(1.059), (I-338)+(1.014)+(1.060), (I-338)+(1.014)+(1.061), (I-338)+(1.014)+(1.062), (I-338)+(1.014)+(1.063), (I-338)+(1.014)+(1.064), (I-338)+(1.014)+(1.065), (I-338)+(1.014)+(1.066), (I-338)+(1.014)+(1.067), (I-338)+(1.014)+(1.068), (I-338)+(1.014)+(1.069), (I-338)+(1.014)+(1.070), (I-338)+(1.014)+(1.071), (I-338)+(1.014)+(1.072), (I-338)+(1.014)+(1.073), (I-338)+(1.014)+(1.074), (I-338)+(1.014)+(1.075), (I-338)+(1.014)+(1.076), (I-338)+(1.014)+(1.077), (I-338)+(1.014)+(1.078), (I-338)+(1.014)+(1.079), (I-338)+(1.014)+(1.080), (I-338)+(1.014)+(1.081), (I-338)+(1.014)+(1.082), (I-338)+(1.014)+(1.083), (I-338)+(1.014)+(1.084), (I-338)+(1.014)+(1.085), (I-338)+(1.014)+(1.086), (I-338)+(1.014)+(1.087), (I-338)+(1.014)+(1.088), (I-338)+(1.014)+(1.089), (I-338)+(1.014)+(1.090), (I-338)+(1.014)+(1.091), (I-338)+(1.014)+(1.092), (I-338)+(1.014)+(2.001), (I-338)+(1.014)+(2.002), (I-338)+(1.014)+(2.003), (I-338)+(1.014)+(2.004), (I-338)+(1.014)+(2.005), (I-338)+(1.014)+(2.006), (I-338)+(1.014)+(2.007), (I-338)+(1.014)+(2.008), (I-338)+(1.014)+(2.009), (I-338)+(1.014)+(2.010), (I-338)+(1.014)+(2.011), (I-338)+(1.014)+(2.012), (I-338)+(1.014)+(2.013), (I-338)+(1.014)+(2.014), (I-338)+(1.014)+(2.015), (I-338)+(1.014)+(2.016), (I-338)+(1.014)+(2.017), (I-338)+(1.014)+(2.018), (I-338)+(1.014)+(2.019), (I-338)+(1.014)+(2.020), (I-338)+(1.014)+(2.021), (I-338)+(1.014)+(2.022), (I-338)+(1.014)+(2.023), (I-338)+(1.014)+(2.024), (I-338)+(1.014)+(2.025), (I-338)+(1.014)+(2.026), (I-338)+(1.014)+(2.027), (I-338)+(1.014)+(2.028), (I-338)+(1.014)+(2.029), (I-338)+(1.014)+(2.030), (I-338)+(1.014)+(2.031), (I-338)+(1.014)+(2.032), (I-338)+(1.014)+(2.033), (I-338)+(1.014)+(2.034), (I-338)+(1.014)+(2.035), (I-338)+(1.014)+(2.036), (I-338)+(1.014)+(2.037), (I-338)+(1.014)+(2.038), (I-338)+(1.014)+(2.039), (I-338)+(1.014)+(2.040), (I-338)+(1.014)+(2.041), (I-338)+(1.014)+(2.042), (I-338)+(1.014)+(2.043), (I-338)+(1.014)+(2.044), (I-338)+(1.014)+(2.045), (I-338)+(1.014)+(2.046), (I-338)+(1.014)+(2.047), (I-338)+(1.014)+(2.048), (I-338)+(1.014)+(2.049), (I-338)+(1.014)+(2.050), (I-338)+(1.014)+(2.051), (I-338)+(1.014)+(2.052), (I-338)+(1.014)+(2.053), (I-338)+(1.014)+(2.054), (I-338)+(1.014)+(2.055), (I-338)+(1.014)+(2.056), (I-338)+(1.014)+(2.057), (I-338)+(1.014)+(2.058), (I-338)+(1.014)+(2.059), (I-338)+(1.014)+(3.001), (I-338)+(1.014)+(3.002), (I-338)+(1.014)+(3.003), (I-338)+(1.014)+(3.004), (I-338)+(1.014)+(3.005), (I-338)+(1.014)+(3.006), (I-338)+(1.014)+(3.007), (I-338)+(1.014)+(3.008), (I-338)+(1.014)+(3.009), (I-338)+(1.014)+(3.010), (I-338)+(1.014)+(3.011), (I-338)+(1.014)+(3.012), (I-338)+(1.014)+(3.013), (I-338)+(1.014)+(3.014), (I-338)+(1.014)+(3.015), (I-338)+(1.014)+(3.016), (I-338)+(1.014)+(3.017), (I-338)+(1.014)+(3.018), (I-338)+(1.014)+(3.019), (I-338)+(1.014)+(3.020), (I-338)+(1.014)+(3.021), (I-338)+(1.014)+(3.022), (I-338)+(1.014)+(3.023), (I-338)+(1.014)+(3.024), (I-338)+(1.014)+(3.025), (I-338)+(1.014)+(3.026), (I-338)+(1.014)+(3.027), (I-338)+(1.014)+(3.028), (I-338)+(1.014)+(3.029), (I-338)+(1.014)+(3.030), (I-338)+(1.014)+(3.031), (I-338)+(1.014)+(5.001), (I-338)+(1.014)+(5.002), (I-338)+(1.014)+(5.003), (I-338)+(1.014)+(5.004), (I-338)+(1.014)+(5.005), (I-338)+(1.014)+(5.006), (I-338)+(1.014)+(5.007), (I-338)+(1.014)+(5.008), (I-338)+(1.014)+(5.009), (I-338)+(1.014)+(5.010), (I-338)+(1.014)+(5.011), (I-338)+(1.014)+(5.012), (I-338)+(1.014)+(5.013), (I-338)+(1.014)+(5.014), (I-338)+(1.014)+(5.015), (I-338)+(1.014)+(5.016), (I-338)+(1.014)+(5.017), (I-338)+(1.014)+(5.018), (I-338)+(1.014)+(5.019), (I-338)+(1.014)+(5.020), (I-338)+(1.014)+(5.021), (I-338)+(1.014)+(5.022), (I-338)+(1.014)+(5.023), (I-338)+(1.014)+(6.001), (I-338)+(1.014)+(6.002), (I-338)+(1.014)+(6.003), (I-338)+(1.014)+(6.004), (I-338)+(1.014)+(7.001), (I-338)+(1.014)+(7.002), (I-338)+(1.014)+(7.003), (I-338)+(1.014)+(7.004), (I-338)+(1.014)+(7.005), (I-338)+(1.014)+(7.006), (I-338)+(1.014)+(9.001), (I-338)+(1.014)+(9.002), (I-338)+(1.014)+(9.003), (I-338)+(1.014)+(9.004), (I-338)+(1.014)+(9.005), (I-338)+(1.014)+(9.006), (I-338)+(1.014)+(9.007), (I-338)+(1.014)+(9.008), (I-338)+(1.014)+(9.009), (I-338)+(1.014)+(14.001), (I-338)+(1.014)+(14.002), (I-338)+(1.014)+(15.008), (I-338)+(1.014)+(15.011), (I-338)+(1.014)+(15.012), (I-338)+(1.014)+(15.016), (I-338)+(1.014)+(15.025), (I-338)+(1.014)+(15.027), (I-338)+(1.014)+(15.047), (I-338)+(1.014)+(15.063), (I-338)+(1.014)+(15.064), (I-338)+(1.014)+(16.001), (I-338)+(1.014)+(16.002), (I-338)+(1.014)+(16.003), (I-338)+(1.014)+(16.004), (I-338)+(1.014)+(16.005), (I-338)+(1.014)+(16.006), (I-338)+(1.014)+(16.007), (I-338)+(1.014)+(16.008), (I-338)+(1.014)+(17.001), (I-338)+(1.014)+(17.002), (I-338)+(1.014)+(17.003), (I-338)+(1.014)+(17.004), (I-338)+(1.014)+(17.005), (I-338)+(1.014)+(17.006), (I-338)+(1.014)+(17.007), (I-338)+(1.014)+(17.008), (I-338)+(1.014)+(17.009), (I-338)+(1.014)+(17.010), (I-338)+(1.014)+(17.011), (I-338)+(1.014)+(17.012), (I-338)+(1.014)+(18.001), (I-338)+(1.015)+(1.016), (I-338)+(1.015)+(1.017), (I-338)+(1.015)+(1.018), (I-338)+(1.015)+(1.019), (I-338)+(1.015)+(1.020), (I-338)+(1.015)+(1.021), (I-338)+(1.015)+(1.022), (I-338)+(1.015)+(1.023), (I-338)+(1.015)+(1.024), (I-338)+(1.015)+(1.025), (I-338)+(1.015)+(1.026), (I-338)+(1.015)+(1.027), (I-338)+(1.015)+(1.028), (I-338)+(1.015)+(1.029), (I-338)+(1.015)+(1.030), (I-338)+(1.015)+(1.031), (I-338)+(1.015)+(1.032), (I-338)+(1.015)+(1.033), (I-338)+(1.015)+(1.034), (I-338)+(1.015)+(1.035), (I-338)+(1.015)+(1.036), (I-338)+(1.015)+(1.037), (I-338)+(1.015)+(1.038), (I-338)+(1.015)+(1.039), (I-338)+(1.015)+(1.040), (I-338)+(1.015)+(1.041), (I-338)+(1.015)+(1.042), (I-338)+(1.015)+(1.043), (I-338)+(1.015)+(1.044), (I-338)+(1.015)+(1.045), (I-338)+(1.015)+(1.046), (I-338)+(1.015)+(1.047), (I-338)+(1.015)+(1.048), (I-338)+(1.015)+(1.049), (I-338)+(1.015)+(1.050), (I-338)+(1.015)+(1.051), (I-338)+(1.015)+(1.052), (I-338)+(1.015)+(1.053), (I-338)+(1.015)+(1.054), (I-338)+(1.015)+(1.055), (I-338)+(1.015)+(1.056), (I-338)+(1.015)+(1.057), (I-338)+(1.015)+(1.058), (I-338)+(1.015)+(1.059), (I-338)+(1.015)+(1.060), (I-338)+(1.015)+(1.061), (I-338)+(1.015)+(1.062), (I-338)+(1.015)+(1.063), (I-338)+(1.015)+(1.064), (I-338)+(1.015)+(1.065), (I-338)+(1.015)+(1.066), (I-338)+(1.015)+(1.067), (I-338)+(1.015)+(1.068), (I-338)+(1.015)+(1.069), (I-338)+(1.015)+(1.070), (I-338)+(1.015)+(1.071), (I-338)+(1.015)+(1.072), (I-338)+(1.015)+(1.073), (I-338)+(1.015)+(1.074), (I-338)+(1.015)+(1.075), (I-338)+(1.015)+(1.076), (I-338)+(1.015)+(1.077), (I-338)+(1.015)+(1.078), (I-338)+(1.015)+(1.079), (I-338)+(1.015)+(1.080), (I-338)+(1.015)+(1.081), (I-338)+(1.015)+(1.082), (I-338)+(1.015)+(1.083), (I-338)+(1.015)+(1.084), (I-338)+(1.015)+(1.085), (I-338)+(1.015)+(1.086), (I-338)+(1.015)+(1.087), (I-338)+(1.015)+(1.088), (I-338)+(1.015)+(1.089), (I-338)+(1.015)+(1.090), (I-338)+(1.015)+(1.091), (I-338)+(1.015)+(1.092), (I-338)+(1.015)+(2.001), (I-338)+(1.015)+(2.002), (I-338)+(1.015)+(2.003), (I-338)+(1.015)+(2.004), (I-338)+(1.015)+(2.005), (I-338)+(1.015)+(2.006), (I-338)+(1.015)+(2.007), (I-338)+(1.015)+(2.008), (I-338)+(1.015)+(2.009), (I-338)+(1.015)+(2.010), (I-338)+(1.015)+(2.011), (I-338)+(1.015)+(2.012), (I-338)+(1.015)+(2.013), (I-338)+(1.015)+(2.014), (I-338)+(1.015)+(2.015), (I-338)+(1.015)+(2.016), (I-338)+(1.015)+(2.017), (I-338)+(1.015)+(2.018), (I-338)+(1.015)+(2.019), (I-338)+(1.015)+(2.020), (I-338)+(1.015)+(2.021), (I-338)+(1.015)+(2.022), (I-338)+(1.015)+(2.023), (I-338)+(1.015)+(2.024), (I-338)+(1.015)+(2.025), (I-338)+(1.015)+(2.026), (I-338)+(1.015)+(2.027), (I-338)+(1.015)+(2.028), (I-338)+(1.015)+(2.029), (I-338)+(1.015)+(2.030), (I-338)+(1.015)+(2.031), (I-338)+(1.015)+(2.032), (I-338)+(1.015)+(2.033), (I-338)+(1.015)+(2.034), (I-338)+(1.015)+(2.035), (I-338)+(1.015)+(2.036), (I-338)+(1.015)+(2.037), (I-338)+(1.015)+(2.038), (I-338)+(1.015)+(2.039), (I-338)+(1.015)+(2.040), (I-338)+(1.015)+(2.041), (I-338)+(1.015)+(2.042), (I-338)+(1.015)+(2.043), (I-338)+(1.015)+(2.044), (I-338)+(1.015)+(2.045), (I-338)+(1.015)+(2.046), (I-338)+(1.015)+(2.047), (I-338)+(1.015)+(2.048), (I-338)+(1.015)+(2.049), (I-338)+(1.015)+(2.050), (I-338)+(1.015)+(2.051), (I-338)+(1.015)+(2.052), (I-338)+(1.015)+(2.053), (I-338)+(1.015)+(2.054), (I-338)+(1.015)+(2.055), (I-338)+(1.015)+(2.056), (I-338)+(1.015)+(2.057), (I-338)+(1.015)+(2.058), (I-338)+(1.015)+(2.059), (I-338)+(1.015)+(3.001), (I-338)+(1.015)+(3.002), (I-338)+(1.015)+(3.003), (I-338)+(1.015)+(3.004), (I-338)+(1.015)+(3.005), (I-338)+(1.015)+(3.006), (I-338)+(1.015)+(3.007), (I-338)+(1.015)+(3.008), (I-338)+(1.015)+(3.009), (I-338)+(1.015)+(3.010), (I-338)+(1.015)+(3.011), (I-338)+(1.015)+(3.012), (I-338)+(1.015)+(3.013), (I-338)+(1.015)+(3.014), (I-338)+(1.015)+(3.015), (I-338)+(1.015)+(3.016), (I-338)+(1.015)+(3.017), (I-338)+(1.015)+(3.018), (I-338)+(1.015)+(3.019), (I-338)+(1.015)+(3.020), (I-338)+(1.015)+(3.021), (I-338)+(1.015)+(3.022), (I-338)+(1.015)+(3.023), (I-338)+(1.015)+(3.024), (I-338)+(1.015)+(3.025), (I-338)+(1.015)+(3.026), (I-338)+(1.015)+(3.027), (I-338)+(1.015)+(3.028), (I-338)+(1.015)+(3.029), (I-338)+(1.015)+(3.030), (I-338)+(1.015)+(3.031), (I-338)+(1.015)+(5.001), (I-338)+(1.015)+(5.002), (I-338)+(1.015)+(5.003), (I-338)+(1.015)+(5.004), (I-338)+(1.015)+(5.005), (I-338)+(1.015)+(5.006), (I-338)+(1.015)+(5.007), (I-338)+(1.015)+(5.008), (I-338)+(1.015)+(5.009), (I-338)+(1.015)+(5.010), (I-338)+(1.015)+(5.011), (I-338)+(1.015)+(5.012), (I-338)+(1.015)+(5.013), (I-338)+(1.015)+(5.014), (I-338)+(1.015)+(5.015), (I-338)+(1.015)+(5.016), (I-338)+(1.015)+(5.017), (I-338)+(1.015)+(5.018), (I-338)+(1.015)+(5.019), (I-338)+(1.015)+(5.020), (I-338)+(1.015)+(5.021), (I-338)+(1.015)+(5.022), (I-338)+(1.015)+(5.023), (I-338)+(1.015)+(6.001), (I-338)+(1.015)+(6.002), (I-338)+(1.015)+(6.003), (I-338)+(1.015)+(6.004), (I-338)+(1.015)+(7.001), (I-338)+(1.015)+(7.002), (I-338)+(1.015)+(7.003), (I-338)+(1.015)+(7.004), (I-338)+(1.015)+(7.005), (I-338)+(1.015)+(7.006), (I-338)+(1.015)+(9.001), (I-338)+(1.015)+(9.002), (I-338)+(1.015)+(9.003), (I-338)+(1.015)+(9.004), (I-338)+(1.015)+(9.005), (I-338)+(1.015)+(9.006), (I-338)+(1.015)+(9.007), (I-338)+(1.015)+(9.008), (I-338)+(1.015)+(9.009), (I-338)+(1.015)+(14.001), (I-338)+(1.015)+(14.002), (I-338)+(1.015)+(15.008), (I-338)+(1.015)+(15.011), (I-338)+(1.015)+(15.012), (I-338)+(1.015)+(15.016), (I-338)+(1.015)+(15.025), (I-338)+(1.015)+(15.027), (I-338)+(1.015)+(15.047), (I-338)+(1.015)+(15.063), (I-338)+(1.015)+(15.064), (I-338)+(1.015)+(16.001), (I-338)+(1.015)+(16.002), (I-338)+(1.015)+(16.003), (I-338)+(1.015)+(16.004), (I-338)+(1.015)+(16.005), (I-338)+(1.015)+(16.006), (I-338)+(1.015)+(16.007), (I-338)+(1.015)+(16.008), (I-338)+(1.015)+(17.001), (I-338)+(1.015)+(17.002), (I-338)+(1.015)+(17.003), (I-338)+(1.015)+(17.004), (I-338)+(1.015)+(17.005), (I-338)+(1.015)+(17.006), (I-338)+(1.015)+(17.007), (I-338)+(1.015)+(17.008), (I-338)+(1.015)+(17.009), (I-338)+(1.015)+(17.010), (I-338)+(1.015)+(17.011), (I-338)+(1.015)+(17.012), (I-338)+(1.015)+(18.001),
(I-338)+(1.016)+(1.017), (I-338)+(1.016)+(1.018), (I-338)+(1.016)+(1.019), (I-338)+(1.016)+(1.020), (I-338)+(1.016)+(1.021), (I-338)+(1.016)+(1.022), (I-338)+(1.016)+(1.023), (I-338)+(1.016)+(1.024), (I-338)+(1.016)+(1.025), (I-338)+(1.016)+(1.026), (I-338)+(1.016)+(1.027), (I-338)+(1.016)+(1.028), (I-338)+(1.016)+(1.029), (I-338)+(1.016)+(1.030), (I-338)+(1.016)+(1.031), (I-338)+(1.016)+(1.032), (I-338)+(1.016)+(1.033), (I-338)+(1.016)+(1.034), (I-338)+(1.016)+(1.035), (I-338)+(1.016)+(1.036), (I-338)+(1.016)+(1.037), (I-338)+(1.016)+(1.038), (I-338)+(1.016)+(1.039), (I-338)+(1.016)+(1.040), (I-338)+(1.016)+(1.041), (I-338)+(1.016)+(1.042), (I-338)+(1.016)+(1.043), (I-338)+(1.016)+(1.044), (I-338)+(1.016)+(1.045), (I-338)+(1.016)+(1.046), (I-338)+(1.016)+(1.047), (I-338)+(1.016)+(1.048), (I-338)+(1.016)+(1.049), (I-338)+(1.016)+(1.050), (I-338)+(1.016)+(1.051), (I-338)+(1.016)+(1.052), (I-338)+(1.016)+(1.053), (I-338)+(1.016)+(1.054), (I-338)+(1.016)+(1.055), (I-338)+(1.016)+(1.056), (I-338)+(1.016)+(1.057), (I-338)+(1.016)+(1.058), (I-338)+(1.016)+(1.059), (I-338)+(1.016)+(1.060), (I-338)+(1.016)+(1.061), (I-338)+(1.016)+(1.062), (I-338)+(1.016)+(1.063), (I-338)+(1.016)+(1.064), (I-338)+(1.016)+(1.065), (I-338)+(1.016)+(1.066), (I-338)+(1.016)+(1.067), (I-338)+(1.016)+(1.068), (I-338)+(1.016)+(1.069), (I-338)+(1.016)+(1.070), (I-338)+(1.016)+(1.071), (I-338)+(1.016)+(1.072), (I-338)+(1.016)+(1.073), (I-338)+(1.016)+(1.074), (I-338)+(1.016)+(1.075), (I-338)+(1.016)+(1.076), (I-338)+(1.016)+(1.077), (I-338)+(1.016)+(1.078), (I-338)+(1.016)+(1.079), (I-338)+(1.016)+(1.080), (I-338)+(1.016)+(1.081), (I-338)+(1.016)+(1.082), (I-338)+(1.016)+(1.083), (I-338)+(1.016)+(1.084), (I-338)+(1.016)+(1.085), (I-338)+(1.016)+(1.086), (I-338)+(1.016)+(1.087), (I-338)+(1.016)+(1.088), (I-338)+(1.016)+(1.089), (I-338)+(1.016)+(1.090), (I-338)+(1.016)+(1.091), (I-338)+(1.016)+(1.092), (I-338)+(1.016)+(2.001), (I-338)+(1.016)+(2.002), (I-338)+(1.016)+(2.003), (I-338)+(1.016)+(2.004), (I-338)+(1.016)+(2.005), (I-338)+(1.016)+(2.006), (I-338)+(1.016)+(2.007), (I-338)+(1.016)+(2.008), (I-338)+(1.016)+(2.009), (I-338)+(1.016)+(2.010), (I-338)+(1.016)+(2.011), (I-338)+(1.016)+(2.012), (I-338)+(1.016)+(2.013), (I-338)+(1.016)+(2.014), (I-338)+(1.016)+(2.015), (I-338)+(1.016)+(2.016), (I-338)+(1.016)+(2.017), (I-338)+(1.016)+(2.018), (I-338)+(1.016)+(2.019), (I-338)+(1.016)+(2.020), (I-338)+(1.016)+(2.021), (I-338)+(1.016)+(2.022), (I-338)+(1.016)+(2.023), (I-338)+(1.016)+(2.024), (I-338)+(1.016)+(2.025), (I-338)+(1.016)+(2.026), (I-338)+(1.016)+(2.027), (I-338)+(1.016)+(2.028), (I-338)+(1.016)+(2.029), (I-338)+(1.016)+(2.030), (I-338)+(1.016)+(2.031), (I-338)+(1.016)+(2.032), (I-338)+(1.016)+(2.033), (I-338)+(1.016)+(2.034), (I-338)+(1.016)+(2.035), (I-338)+(1.016)+(2.036), (I-338)+(1.016)+(2.037), (I-338)+(1.016)+(2.038), (I-338)+(1.016)+(2.039), (I-338)+(1.016)+(2.040), (I-338)+(1.016)+(2.041), (I-338)+(1.016)+(2.042), (I-338)+(1.016)+(2.043), (I-338)+(1.016)+(2.044), (I-338)+(1.016)+(2.045), (I-338)+(1.016)+(2.046), (I-338)+(1.016)+(2.047), (I-338)+(1.016)+(2.048), (I-338)+(1.016)+(2.049), (I-338)+(1.016)+(2.050), (I-338)+(1.016)+(2.051), (I-338)+(1.016)+(2.052), (I-338)+(1.016)+(2.053), (I-338)+(1.016)+(2.054), (I-338)+(1.016)+(2.055), (I-338)+(1.016)+(2.056), (I-338)+(1.016)+(2.057), (I-338)+(1.016)+(2.058), (I-338)+(1.016)+(2.059), (I-338)+(1.016)+(3.001), (I-338)+(1.016)+(3.002), (I-338)+(1.016)+(3.003), (I-338)+(1.016)+(3.004), (I-338)+(1.016)+(3.005), (I-338)+(1.016)+(3.006), (I-338)+(1.016)+(3.007), (I-338)+(1.016)+(3.008), (I-338)+(1.016)+(3.009), (I-338)+(1.016)+(3.010), (I-338)+(1.016)+(3.011), (I-338)+(1.016)+(3.012), (I-338)+(1.016)+(3.013), (I-338)+(1.016)+(3.014), (I-338)+(1.016)+(3.015), (I-338)+(1.016)+(3.016), (I-338)+(1.016)+(3.017), (I-338)+(1.016)+(3.018), (I-338)+(1.016)+(3.019), (I-338)+(1.016)+(3.020), (I-338)+(1.016)+(3.021), (I-338)+(1.016)+(3.022), (I-338)+(1.016)+(3.023), (I-338)+(1.016)+(3.024), (I-338)+(1.016)+(3.025), (I-338)+(1.016)+(3.026), (I-338)+(1.016)+(3.027), (I-338)+(1.016)+(3.028), (I-338)+(1.016)+(3.029), (I-338)+(1.016)+(3.030), (I-338)+(1.016)+(3.031), (I-338)+(1.016)+(5.001), (I-338)+(1.016)+(5.002), (I-338)+(1.016)+(5.003), (I-338)+(1.016)+(5.004), (I-338)+(1.016)+(5.005), (I-338)+(1.016)+(5.006), (I-338)+(1.016)+(5.007), (I-338)+(1.016)+(5.008), (I-338)+(1.016)+(5.009), (I-338)+(1.016)+(5.010), (I-338)+(1.016)+(5.011), (I-338)+(1.016)+(5.012), (I-338)+(1.016)+(5.013), (I-338)+(1.016)+(5.014), (I-338)+(1.016)+(5.015), (I-338)+(1.016)+(5.016), (I-338)+(1.016)+(5.017), (I-338)+(1.016)+(5.018), (I-338)+(1.016)+(5.019), (I-338)+(1.016)+(5.020), (I-338)+(1.016)+(5.021), (I-338)+(1.016)+(5.022), (I-338)+(1.016)+(5.023), (I-338)+(1.016)+(6.001), (I-338)+(1.016)+(6.002), (I-338)+(1.016)+(6.003), (I-338)+(1.016)+(6.004), (I-338)+(1.016)+(7.001), (I-338)+(1.016)+(7.002), (I-338)+(1.016)+(7.003), (I-338)+(1.016)+(7.004), (I-338)+(1.016)+(7.005), (I-338)+(1.016)+(7.006), (I-338)+(1.016)+(9.001), (I-338)+(1.016)+(9.002), (I-338)+(1.016)+(9.003), (I-338)+(1.016)+(9.004), (I-338)+(1.016)+(9.005), (I-338)+(1.016)+(9.006), (I-338)+(1.016)+(9.007), (I-338)+(1.016)+(9.008), (I-338)+(1.016)+(9.009), (I-338)+(1.016)+(14.001), (I-338)+(1.016)+(14.002), (I-338)+(1.016)+(15.008), (I-338)+(1.016)+(15.011), (I-338)+(1.016)+(15.012), (I-338)+(1.016)+(15.016), (I-338)+(1.016)+(15.025), (I-338)+(1.016)+(15.027), (I-338)+(1.016)+(15.047), (I-338)+(1.016)+(15.063), (I-338)+(1.016)+(15.064), (I-338)+(1.016)+(16.001), (I-338)+(1.016)+(16.002), (I-338)+(1.016)+(16.003), (I-338)+(1.016)+(16.004), (I-338)+(1.016)+(16.005), (I-338)+(1.016)+(16.006), (I-338)+(1.016)+(16.007), (I-338)+(1.016)+(16.008), (I-338)+(1.016)+(17.001), (I-338)+(1.016)+(17.002), (I-338)+(1.016)+(17.003), (I-338)+(1.016)+(17.004), (I-338)+(1.016)+(17.005), (I-338)+(1.016)+(17.006), (I-338)+(1.016)+(17.007), (I-338)+(1.016)+(17.008), (I-338)+(1.016)+(17.009), (I-338)+(1.016)+(17.010), (I-338)+(1.016)+(17.011), (I-338)+(1.016)+(17.012), (I-338)+(1.016)+(18.001),
(I-338)+(1.017)+(1.018), (I-338)+(1.017)+(1.019), (I-338)+(1.017)+(1.020), (I-338)+(1.017)+(1.021), (I-338)+(1.017)+(1.022), (I-338)+(1.017)+(1.023), (I-338)+(1.017)+(1.024), (I-338)+(1.017)+(1.025), (I-338)+(1.017)+(1.026), (I-338)+(1.017)+(1.027), (I-338)+(1.017)+(1.028), (I-338)+(1.017)+(1.029), (I-338)+(1.017)+(1.030), (I-338)+(1.017)+(1.031), (I-338)+(1.017)+(1.032), (I-338)+(1.017)+(1.033), (I-338)+(1.017)+(1.034), (I-338)+(1.017)+(1.035), (I-338)+(1.017)+(1.036), (I-338)+(1.017)+(1.037), (I-338)+(1.017)+(1.038), (I-338)+(1.017)+(1.039), (I-338)+(1.017)+(1.040), (I-338)+(1.017)+(1.041), (I-338)+(1.017)+(1.042), (I-338)+(1.017)+(1.043), (I-338)+(1.017)+(1.044), (I-338)+(1.017)+(1.045), (I-338)+(1.017)+(1.046), (I-338)+(1.017)+(1.047), (I-338)+(1.017)+(1.048), (I-338)+(1.017)+(1.049), (I-338)+(1.017)+(1.050), (I-338)+(1.017)+(1.051), (I-338)+(1.017)+(1.052), (I-338)+(1.017)+(1.053), (I-338)+(1.017)+(1.054), (I-338)+(1.017)+(1.055), (I-338)+(1.017)+(1.056), (I-338)+(1.017)+(1.057), (I-338)+(1.017)+(1.058), (I-338)+(1.017)+(1.059), (I-338)+(1.017)+(1.060), (I-338)+(1.017)+(1.061), (I-338)+(1.017)+(1.062), (I-338)+(1.017)+(1.063), (I-338)+(1.017)+(1.064), (I-338)+(1.017)+(1.065), (I-338)+(1.017)+(1.066), (I-338)+(1.017)+(1.067), (I-338)+(1.017)+(1.068), (I-338)+(1.017)+(1.069), (I-338)+(1.017)+(1.070), (I-338)+(1.017)+(1.071), (I-338)+(1.017)+(1.072), (I-338)+(1.017)+(1.073), (I-338)+(1.017)+(1.074), (I-338)+(1.017)+(1.075), (I-338)+(1.017)+(1.076), (I-338)+(1.017)+(1.077), (I-338)+(1.017)+(1.078), (I-338)+(1.017)+(1.079), (I-338)+(1.017)+(1.080), (I-338)+(1.017)+(1.081), (I-338)+(1.017)+(1.082), (I-338)+(1.017)+(1.083), (I-338)+(1.017)+(1.084), (I-338)+(1.017)+(1.085), (I-338)+(1.017)+(1.086), (I-338)+(1.017)+(1.087), (I-338)+(1.017)+(1.088), (I-338)+(1.017)+(1.089), (I-338)+(1.017)+(1.090), (I-338)+(1.017)+(1.091), (I-338)+(1.017)+(1.092), (I-338)+(1.017)+(2.001), (I-338)+(1.017)+(2.002), (I-338)+(1.017)+(2.003), (I-338)+(1.017)+(2.004), (I-338)+(1.017)+(2.005), (I-338)+(1.017)+(2.006), (I-338)+(1.017)+(2.007), (I-338)+(1.017)+(2.008), (I-338)+(1.017)+(2.009), (I-338)+(1.017)+(2.010), (I-338)+(1.017)+(2.011), (I-338)+(1.017)+(2.012), (I-338)+(1.017)+(2.013), (I-338)+(1.017)+(2.014), (I-338)+(1.017)+(2.015), (I-338)+(1.017)+(2.016), (I-338)+(1.017)+(2.017), (I-338)+(1.017)+(2.018), (I-338)+(1.017)+(2.019), (I-338)+(1.017)+(2.020), (I-338)+(1.017)+(2.021), (I-338)+(1.017)+(2.022), (I-338)+(1.017)+(2.023), (I-338)+(1.017)+(2.024), (I-338)+(1.017)+(2.025), (I-338)+(1.017)+(2.026), (I-338)+(1.017)+(2.027), (I-338)+(1.017)+(2.028), (I-338)+(1.017)+(2.029), (I-338)+(1.017)+(2.030), (I-338)+(1.017)+(2.031), (I-338)+(1.017)+(2.032), (I-338)+(1.017)+(2.033), (I-338)+(1.017)+(2.034), (I-338)+(1.017)+(2.035), (I-338)+(1.017)+(2.036), (I-338)+(1.017)+(2.037), (I-338)+(1.017)+(2.038), (I-338)+(1.017)+(2.039), (I-338)+(1.017)+(2.040), (I-338)+(1.017)+(2.041), (I-338)+(1.017)+(2.042), (I-338)+(1.017)+(2.043), (I-338)+(1.017)+(2.044), (I-338)+(1.017)+(2.045), (I-338)+(1.017)+(2.046), (I-338)+(1.017)+(2.047), (I-338)+(1.017)+(2.048), (I-338)+(1.017)+(2.049), (I-338)+(1.017)+(2.050), (I-338)+(1.017)+(2.051), (I-338)+(1.017)+(2.052), (I-338)+(1.017)+(2.053), (I-338)+(1.017)+(2.054), (I-338)+(1.017)+(2.055), (I-338)+(1.017)+(2.056), (I-338)+(1.017)+(2.057), (I-338)+(1.017)+(2.058), (I-338)+(1.017)+(2.059), (I-338)+(1.017)+(3.001), (I-338)+(1.017)+(3.002), (I-338)+(1.017)+(3.003), (I-338)+(1.017)+(3.004), (I-338)+(1.017)+(3.005), (I-338)+(1.017)+(3.006), (I-338)+(1.017)+(3.007), (I-338)+(1.017)+(3.008), (I-338)+(1.017)+(3.009), (I-338)+(1.017)+(3.010), (I-338)+(1.017)+(3.011), (I-338)+(1.017)+(3.012), (I-338)+(1.017)+(3.013), (I-338)+(1.017)+(3.014), (I-338)+(1.017)+(3.015), (I-338)+(1.017)+(3.016), (I-338)+(1.017)+(3.017), (I-338)+(1.017)+(3.018), (I-338)+(1.017)+(3.019), (I-338)+(1.017)+(3.020), (I-338)+(1.017)+(3.021), (I-338)+(1.017)+(3.022), (I-338)+(1.017)+(3.023), (I-338)+(1.017)+(3.024), (I-338)+(1.017)+(3.025), (I-338)+(1.017)+(3.026), (I-338)+(1.017)+(3.027), (I-338)+(1.017)+(3.028), (I-338)+(1.017)+(3.029), (I-338)+(1.017)+(3.030), (I-338)+(1.017)+(3.031), (I-338)+(1.017)+(5.001), (I-338)+(1.017)+(5.002), (I-338)+(1.017)+(5.003), (I-338)+(1.017)+(5.004), (I-338)+(1.017)+(5.005), (I-338)+(1.017)+(5.006), (I-338)+(1.017)+(5.007), (I-338)+(1.017)+(5.008), (I-338)+(1.017)+(5.009), (I-338)+(1.017)+(5.010), (I-338)+(1.017)+(5.011), (I-338)+(1.017)+(5.012), (I-338)+(1.017)+(5.013), (I-338)+(1.017)+(5.014), (I-338)+(1.017)+(5.015), (I-338)+(1.017)+(5.016), (I-338)+(1.017)+(5.017), (I-338)+(1.017)+(5.018), (I-338)+(1.017)+(5.019), (I-338)+(1.017)+(5.020), (I-338)+(1.017)+(5.021), (I-338)+(1.017)+(5.022), (I-338)+(1.017)+(5.023), (I-338)+(1.017)+(6.001), (I-338)+(1.017)+(6.002), (I-338)+(1.017)+(6.003), (I-338)+(1.017)+(6.004), (I-338)+(1.017)+(7.001), (I-338)+(1.017)+(7.002), (I-338)+(1.017)+(7.003), (I-338)+(1.017)+(7.004), (I-338)+(1.017)+(7.005), (I-338)+(1.017)+(7.006), (I-338)+(1.017)+(9.001), (I-338)+(1.017)+(9.002), (I-338)+(1.017)+(9.003), (I-338)+(1.017)+(9.004), (I-338)+(1.017)+(9.005), (I-338)+(1.017)+(9.006), (I-338)+(1.017)+(9.007), (I-338)+(1.017)+(9.008), (I-338)+(1.017)+(9.009), (I-338)+(1.017)+(14.001), (I-338)+(1.017)+(14.002), (I-338)+(1.017)+(15.008), (I-338)+(1.017)+(15.011), (I-338)+(1.017)+(15.012), (I-338)+(1.017)+(15.016), (I-338)+(1.017)+(15.025), (I-338)+(1.017)+(15.027), (I-338)+(1.017)+(15.047), (I-338)+(1.017)+(15.063), (I-338)+(1.017)+(15.064), (I-338)+(1.017)+(16.001), (I-338)+(1.017)+(16.002), (I-338)+(1.017)+(16.003), (I-338)+(1.017)+(16.004), (I-338)+(1.017)+(16.005), (I-338)+(1.017)+(16.006), (I-338)+(1.017)+(16.007), (I-338)+(1.017)+(16.008), (I-338)+(1.017)+(17.001), (I-338)+(1.017)+(17.002), (I-338)+(1.017)+(17.003), (I-338)+(1.017)+(17.004), (I-338)+(1.017)+(17.005), (I-338)+(1.017)+(17.006), (I-338)+(1.017)+(17.007), (I-338)+(1.017)+(17.008), (I-338)+(1.017)+(17.009), (I-338)+(1.017)+(17.010), (I-338)+(1.017)+(17.011), (I-338)+(1.017)+(17.012), (I-338)+(1.017)+(18.001), (I-338)+(1.018)+(1.019), (I-338)+(1.018)+(1.020), (I-338)+(1.018)+(1.021), (I-338)+(1.018)+(1.022), (I-338)+(1.018)+(1.023), (I-338)+(1.018)+(1.024), (I-338)+(1.018)+(1.025), (I-338)+(1.018)+(1.026), (I-338)+(1.018)+(1.027), (I-338)+(1.018)+(1.028), (I-338)+(1.018)+(1.029), (I-338)+(1.018)+(1.030), (I-338)+(1.018)+(1.031), (I-338)+(1.018)+(1.032), (I-338)+(1.018)+(1.033), (I-338)+(1.018)+(1.034), (I-338)+(1.018)+(1.035), (I-338)+(1.018)+(1.036), (I-338)+(1.018)+(1.037), (I-338)+(1.018)+(1.038), (I-338)+(1.018)+(1.039), (I-338)+(1.018)+(1.040), (I-338)+(1.018)+(1.041), (I-338)+(1.018)+(1.042), (I-338)+(1.018)+(1.043), (I-338)+(1.018)+(1.044), (I-338)+(1.018)+(1.045), (I-338)+(1.018)+(1.046), (I-338)+(1.018)+(1.047), (I-338)+(1.018)+(1.048), (I-338)+(1.018)+(1.049), (I-338)+(1.018)+(1.050), (I-338)+(1.018)+(1.051), (I-338)+(1.018)+(1.052), (I-338)+(1.018)+(1.053), (I-338)+(1.018)+(1.054), (I-338)+(1.018)+(1.055), (I-338)+(1.018)+(1.056), (I-338)+(1.018)+(1.057), (I-338)+(1.018)+(1.058), (I-338)+(1.018)+(1.059), (I-338)+(1.018)+(1.060), (I-338)+(1.018)+(1.061), (I-338)+(1.018)+(1.062), (I-338)+(1.018)+(1.063), (I-338)+(1.018)+(1.064), (I-338)+(1.018)+(1.065), (I-338)+(1.018)+(1.066), (I-338)+(1.018)+(1.067), (I-338)+(1.018)+(1.068), (I-338)+(1.018)+(1.069), (I-338)+(1.018)+(1.070), (I-338)+(1.018)+(1.071), (I-338)+(1.018)+(1.072), (I-338)+(1.018)+(1.073), (I-338)+(1.018)+(1.074), (I-338)+(1.018)+(1.075), (I-338)+(1.018)+(1.076), (I-338)+(1.018)+(1.077), (I-338)+(1.018)+(1.078), (I-338)+(1.018)+(1.079), (I-338)+(1.018)+(1.080), (I-338)+(1.018)+(1.081), (I-338)+(1.018)+(1.082), (I-338)+(1.018)+(1.083), (I-338)+(1.018)+(1.084), (I-338)+(1.018)+(1.085), (I-338)+(1.018)+(1.086), (I-338)+(1.018)+(1.087), (I-338)+(1.018)+(1.088), (I-338)+(1.018)+(1.089), (I-338)+(1.018)+(1.090), (I-338)+(1.018)+(1.091), (I-338)+(1.018)+(1.092), (I-338)+(1.018)+(2.001), (I-338)+(1.018)+(2.002), (I-338)+(1.018)+(2.003), (I-338)+(1.018)+(2.004), (I-338)+(1.018)+(2.005), (I-338)+(1.018)+(2.006), (I-338)+(1.018)+(2.007), (I-338)+(1.018)+(2.008), (I-338)+(1.018)+(2.009), (I-338)+(1.018)+(2.010), (I-338)+(1.018)+(2.011), (I-338)+(1.018)+(2.012), (I-338)+(1.018)+(2.013), (I-338)+(1.018)+(2.014), (I-338)+(1.018)+(2.015), (I-338)+(1.018)+(2.016), (I-338)+(1.018)+(2.017), (I-338)+(1.018)+(2.018), (I-338)+(1.018)+(2.019), (I-338)+(1.018)+(2.020), (I-338)+(1.018)+(2.021), (I-338)+(1.018)+(2.022), (I-338)+(1.018)+(2.023), (I-338)+(1.018)+(2.024), (I-338)+(1.018)+(2.025), (I-338)+(1.018)+(2.026), (I-338)+(1.018)+(2.027), (I-338)+(1.018)+(2.028), (I-338)+(1.018)+(2.029), (I-338)+(1.018)+(2.030), (I-338)+(1.018)+(2.031), (I-338)+(1.018)+(2.032), (I-338)+(1.018)+(2.033), (I-338)+(1.018)+(2.034), (I-338)+(1.018)+(2.035), (I-338)+(1.018)+(2.036), (I-338)+(1.018)+(2.037), (I-338)+(1.018)+(2.038), (I-338)+(1.018)+(2.039), (I-338)+(1.018)+(2.040), (I-338)+(1.018)+(2.041), (I-338)+(1.018)+(2.042), (I-338)+(1.018)+(2.043), (I-338)+(1.018)+(2.044), (I-338)+(1.018)+(2.045), (I-338)+(1.018)+(2.046), (I-338)+(1.018)+(2.047), (I-338)+(1.018)+(2.048), (I-338)+(1.018)+(2.049), (I-338)+(1.018)+(2.050), (I-338)+(1.018)+(2.051), (I-338)+(1.018)+(2.052), (I-338)+(1.018)+(2.053), (I-338)+(1.018)+(2.054), (I-338)+(1.018)+(2.055), (I-338)+(1.018)+(2.056), (I-338)+(1.018)+(2.057), (I-338)+(1.018)+(2.058), (I-338)+(1.018)+(2.059), (I-338)+(1.018)+(3.001), (I-338)+(1.018)+(3.002), (I-338)+(1.018)+(3.003), (I-338)+(1.018)+(3.004), (I-338)+(1.018)+(3.005), (I-338)+(1.018)+(3.006), (I-338)+(1.018)+(3.007), (I-338)+(1.018)+(3.008), (I-338)+(1.018)+(3.009), (I-338)+(1.018)+(3.010), (I-338)+(1.018)+(3.011), (I-338)+(1.018)+(3.012), (I-338)+(1.018)+(3.013), (I-338)+(1.018)+(3.014), (I-338)+(1.018)+(3.015), (I-338)+(1.018)+(3.016), (I-338)+(1.018)+(3.017), (I-338)+(1.018)+(3.018), (I-338)+(1.018)+(3.019), (I-338)+(1.018)+(3.020), (I-338)+(1.018)+(3.021), (I-338)+(1.018)+(3.022), (I-338)+(1.018)+(3.023), (I-338)+(1.018)+(3.024), (I-338)+(1.018)+(3.025), (I-338)+(1.018)+(3.026), (I-338)+(1.018)+(3.027), (I-338)+(1.018)+(3.028), (I-338)+(1.018)+(3.029), (I-338)+(1.018)+(3.030), (I-338)+(1.018)+(3.031), (I-338)+(1.018)+(5.001), (I-338)+(1.018)+(5.002), (I-338)+(1.018)+(5.003), (I-338)+(1.018)+(5.004), (I-338)+(1.018)+(5.005), (I-338)+(1.018)+(5.006), (I-338)+(1.018)+(5.007), (I-338)+(1.018)+(5.008), (I-338)+(1.018)+(5.009), (I-338)+(1.018)+(5.010), (I-338)+(1.018)+(5.011), (I-338)+(1.018)+(5.012), (I-338)+(1.018)+(5.013), (I-338)+(1.018)+(5.014), (I-338)+(1.018)+(5.015), (I-338)+(1.018)+(5.016), (I-338)+(1.018)+(5.017), (I-338)+(1.018)+(5.018), (I-338)+(1.018)+(5.019), (I-338)+(1.018)+(5.020), (I-338)+(1.018)+(5.021), (I-338)+(1.018)+(5.022), (I-338)+(1.018)+(5.023), (I-338)+(1.018)+(6.001), (I-338)+(1.018)+(6.002), (I-338)+(1.018)+(6.003), (I-338)+(1.018)+(6.004), (I-338)+(1.018)+(7.001), (I-338)+(1.018)+(7.002), (I-338)+(1.018)+(7.003), (I-338)+(1.018)+(7.004), (I-338)+(1.018)+(7.005), (I-338)+(1.018)+(7.006), (I-338)+(1.018)+(9.001), (I-338)+(1.018)+(9.002), (I-338)+(1.018)+(9.003), (I-338)+(1.018)+(9.004), (I-338)+(1.018)+(9.005), (I-338)+(1.018)+(9.006), (I-338)+(1.018)+(9.007), (I-338)+(1.018)+(9.008), (I-338)+(1.018)+(9.009), (I-338)+(1.018)+(14.001), (I-338)+(1.018)+(14.002), (I-338)+(1.018)+(15.008), (I-338)+(1.018)+(15.011), (I-338)+(1.018)+(15.012), (I-338)+(1.018)+(15.016), (I-338)+(1.018)+(15.025), (I-338)+(1.018)+(15.027), (I-338)+(1.018)+(15.047), (I-338)+(1.018)+(15.063), (I-338)+(1.018)+(15.064), (I-338)+(1.018)+(16.001), (I-338)+(1.018)+(16.002), (I-338)+(1.018)+(16.003), (I-338)+(1.018)+(16.004), (I-338)+(1.018)+(16.005), (I-338)+(1.018)+(16.006), (I-338)+(1.018)+(16.007), (I-338)+(1.018)+(16.008), (I-338)+(1.018)+(17.001), (I-338)+(1.018)+(17.002), (I-338)+(1.018)+(17.003), (I-338)+(1.018)+(17.004), (I-338)+(1.018)+(17.005), (I-338)+(1.018)+(17.006), (I-338)+(1.018)+(17.007), (I-338)+(1.018)+(17.008), (I-338)+(1.018)+(17.009), (I-338)+(1.018)+(17.010), (I-338)+(1.018)+(17.011), (I-338)+(1.018)+(17.012), (I-338)+(1.018)+(18.001), (I-338)+(1.019)+(1.020), (I-338)+(1.019)+(1.021), (I-338)+(1.019)+(1.022), (I-338)+(1.019)+(1.023), (I-338)+(1.019)+(1.024), (I-338)+(1.019)+(1.025), (I-338)+(1.019)+(1.026), (I-338)+(1.019)+(1.027), (I-338)+(1.019)+(1.028), (I-338)+(1.019)+(1.029), (I-338)+(1.019)+(1.030), (I-338)+(1.019)+(1.031), (I-338)+(1.019)+(1.032), (I-338)+(1.019)+(1.033), (I-338)+(1.019)+(1.034), (I-338)+(1.019)+(1.035), (I-338)+(1.019)+(1.036), (I-338)+(1.019)+(1.037), (I-338)+(1.019)+(1.038), (I-338)+(1.019)+(1.039), (I-338)+(1.019)+(1.040), (I-338)+(1.019)+(1.041), (I-338)+(1.019)+(1.042), (I-338)+(1.019)+(1.043), (I-338)+(1.019)+(1.044), (I-338)+(1.019)+(1.045), (I-338)+(1.019)+(1.046), (I-338)+(1.019)+(1.047), (I-338)+(1.019)+(1.048), (I-338)+(1.019)+(1.049), (I-338)+(1.019)+(1.050), (I-338)+(1.019)+(1.051), (I-338)+(1.019)+(1.052), (I-338)+(1.019)+(1.053), (I-338)+(1.019)+(1.054), (I-338)+(1.019)+(1.055), (I-338)+(1.019)+(1.056), (I-338)+(1.019)+(1.057), (I-338)+(1.019)+(1.058), (I-338)+(1.019)+(1.059), (I-338)+(1.019)+(1.060), (I-338)+(1.019)+(1.061), (I-338)+(1.019)+(1.062), (I-338)+(1.019)+(1.063), (I-338)+(1.019)+(1.064), (I-338)+(1.019)+(1.065), (I-338)+(1.019)+(1.066), (I-338)+(1.019)+(1.067), (I-338)+(1.019)+(1.068), (I-338)+(1.019)+(1.069), (I-338)+(1.019)+(1.070), (I-338)+(1.019)+(1.071), (I-338)+(1.019)+(1.072), (I-338)+(1.019)+(1.073), (I-338)+(1.019)+(1.074), (I-338)+(1.019)+(1.075), (I-338)+(1.019)+(1.076), (I-338)+(1.019)+(1.077), (I-338)+(1.019)+(1.078), (I-338)+(1.019)+(1.079), (I-338)+(1.019)+(1.080), (I-338)+(1.019)+(1.081), (I-338)+(1.019)+(1.082), (I-338)+(1.019)+(1.083), (I-338)+(1.019)+(1.084), (I-338)+(1.019)+(1.085), (I-338)+(1.019)+(1.086), (I-338)+(1.019)+(1.087), (I-338)+(1.019)+(1.088), (I-338)+(1.019)+(1.089), (I-338)+(1.019)+(1.090), (I-338)+(1.019)+(1.091), (I-338)+(1.019)+(1.092), (I-338)+(1.019)+(2.001), (I-338)+(1.019)+(2.002), (I-338)+(1.019)+(2.003), (I-338)+(1.019)+(2.004), (I-338)+(1.019)+(2.005), (I-338)+(1.019)+(2.006), (I-338)+(1.019)+(2.007), (I-338)+(1.019)+(2.008), (I-338)+(1.019)+(2.009), (I-338)+(1.019)+(2.010), (I-338)+(1.019)+(2.011), (I-338)+(1.019)+(2.012), (I-338)+(1.019)+(2.013), (I-338)+(1.019)+(2.014), (I-338)+(1.019)+(2.015), (I-338)+(1.019)+(2.016), (I-338)+(1.019)+(2.017), (I-338)+(1.019)+(2.018), (I-338)+(1.019)+(2.019), (I-338)+(1.019)+(2.020), (I-338)+(1.019)+(2.021), (I-338)+(1.019)+(2.022), (I-338)+(1.019)+(2.023), (I-338)+(1.019)+(2.024), (I-338)+(1.019)+(2.025), (I-338)+(1.019)+(2.026), (I-338)+(1.019)+(2.027), (I-338)+(1.019)+(2.028), (I-338)+(1.019)+(2.029), (I-338)+(1.019)+(2.030), (I-338)+(1.019)+(2.031), (I-338)+(1.019)+(2.032), (I-338)+(1.019)+(2.033), (I-338)+(1.019)+(2.034), (I-338)+(1.019)+(2.035), (I-338)+(1.019)+(2.036), (I-338)+(1.019)+(2.037), (I-338)+(1.019)+(2.038), (I-338)+(1.019)+(2.039), (I-338)+(1.019)+(2.040), (I-338)+(1.019)+(2.041), (I-338)+(1.019)+(2.042), (I-338)+(1.019)+(2.043), (I-338)+(1.019)+(2.044), (I-338)+(1.019)+(2.045), (I-338)+(1.019)+(2.046), (I-338)+(1.019)+(2.047), (I-338)+(1.019)+(2.048), (I-338)+(1.019)+(2.049), (I-338)+(1.019)+(2.050), (I-338)+(1.019)+(2.051), (I-338)+(1.019)+(2.052), (I-338)+(1.019)+(2.053), (I-338)+(1.019)+(2.054), (I-338)+(1.019)+(2.055), (I-338)+(1.019)+(2.056), (I-338)+(1.019)+(2.057), (I-338)+(1.019)+(2.058), (I-338)+(1.019)+(2.059), (I-338)+(1.019)+(3.001), (I-338)+(1.019)+(3.002), (I-338)+(1.019)+(3.003), (I-338)+(1.019)+(3.004), (I-338)+(1.019)+(3.005), (I-338)+(1.019)+(3.006), (I-338)+(1.019)+(3.007), (I-338)+(1.019)+(3.008), (I-338)+(1.019)+(3.009), (I-338)+(1.019)+(3.010), (I-338)+(1.019)+(3.011), (I-338)+(1.019)+(3.012), (I-338)+(1.019)+(3.013), (I-338)+(1.019)+(3.014), (I-338)+(1.019)+(3.015), (I-338)+(1.019)+(3.016), (I-338)+(1.019)+(3.017), (I-338)+(1.019)+(3.018), (I-338)+(1.019)+(3.019), (I-338)+(1.019)+(3.020), (I-338)+(1.019)+(3.021), (I-338)+(1.019)+(3.022), (I-338)+(1.019)+(3.023), (I-338)+(1.019)+(3.024), (I-338)+(1.019)+(3.025), (I-338)+(1.019)+(3.026), (I-338)+(1.019)+(3.027), (I-338)+(1.019)+(3.028), (I-338)+(1.019)+(3.029), (I-338)+(1.019)+(3.030), (I-338)+(1.019)+(3.031), (I-338)+(1.019)+(5.001), (I-338)+(1.019)+(5.002), (I-338)+(1.019)+(5.003), (I-338)+(1.019)+(5.004), (I-338)+(1.019)+(5.005), (I-338)+(1.019)+(5.006), (I-338)+(1.019)+(5.007), (I-338)+(1.019)+(5.008), (I-338)+(1.019)+(5.009), (I-338)+(1.019)+(5.010), (I-338)+(1.019)+(5.011), (I-338)+(1.019)+(5.012), (I-338)+(1.019)+(5.013), (I-338)+(1.019)+(5.014), (I-338)+(1.019)+(5.015), (I-338)+(1.019)+(5.016), (I-338)+(1.019)+(5.017), (I-338)+(1.019)+(5.018), (I-338)+(1.019)+(5.019), (I-338)+(1.019)+(5.020), (I-338)+(1.019)+(5.021), (I-338)+(1.019)+(5.022), (I-338)+(1.019)+(5.023), (I-338)+(1.019)+(6.001), (I-338)+(1.019)+(6.002), (I-338)+(1.019)+(6.003), (I-338)+(1.019)+(6.004), (I-338)+(1.019)+(7.001), (I-338)+(1.019)+(7.002), (I-338)+(1.019)+(7.003), (I-338)+(1.019)+(7.004), (I-338)+(1.019)+(7.005), (I-338)+(1.019)+(7.006), (I-338)+(1.019)+(9.001), (I-338)+(1.019)+(9.002), (I-338)+(1.019)+(9.003), (I-338)+(1.019)+(9.004), (I-338)+(1.019)+(9.005), (I-338)+(1.019)+(9.006), (I-338)+(1.019)+(9.007), (I-338)+(1.019)+(9.008), (I-338)+(1.019)+(9.009), (I-338)+(1.019)+(14.001), (I-338)+(1.019)+(14.002), (I-338)+(1.019)+(15.008), (I-338)+(1.019)+(15.011), (I-338)+(1.019)+(15.012), (I-338)+(1.019)+(15.016), (I-338)+(1.019)+(15.025), (I-338)+(1.019)+(15.027), (I-338)+(1.019)+(15.047), (I-338)+(1.019)+(15.063), (I-338)+(1.019)+(15.064), (I-338)+(1.019)+(16.001), (I-338)+(1.019)+(16.002), (I-338)+(1.019)+(16.003), (I-338)+(1.019)+(16.004), (I-338)+(1.019)+(16.005), (I-338)+(1.019)+(16.006), (I-338)+(1.019)+(16.007), (I-338)+(1.019)+(16.008), (I-338)+(1.019)+(17.001), (I-338)+(1.019)+(17.002), (I-338)+(1.019)+(17.003), (I-338)+(1.019)+(17.004), (I-338)+(1.019)+(17.005), (I-338)+(1.019)+(17.006), (I-338)+(1.019)+(17.007), (I-338)+(1.019)+(17.008), (I-338)+(1.019)+(17.009), (I-338)+(1.019)+(17.010), (I-338)+(1.019)+(17.011), (I-338)+(1.019)+(17.012), (I-338)+(1.019)+(18.001), (I-338)+(1.020)+(1.021), (I-338)+(1.020)+(1.022), (I-338)+(1.020)+(1.023), (I-338)+(1.020)+(1.024), (I-338)+(1.020)+(1.025), (I-338)+(1.020)+(1.026), (I-338)+(1.020)+(1.027), (I-338)+(1.020)+(1.028), (I-338)+(1.020)+(1.029), (I-338)+(1.020)+(1.030), (I-338)+(1.020)+(1.031), (I-338)+(1.020)+(1.032), (I-338)+(1.020)+(1.033), (I-338)+(1.020)+(1.034), (I-338)+(1.020)+(1.035), (I-338)+(1.020)+(1.036), (I-338)+(1.020)+(1.037), (I-338)+(1.020)+(1.038), (I-338)+(1.020)+(1.039), (I-338)+(1.020)+(1.040), (I-338)+(1.020)+(1.041), (I-338)+(1.020)+(1.042), (I-338)+(1.020)+(1.043), (I-338)+(1.020)+(1.044), (I-338)+(1.020)+(1.045), (I-338)+(1.020)+(1.046), (I-338)+(1.020)+(1.047), (I-338)+(1.020)+(1.048), (I-338)+(1.020)+(1.049), (I-338)+(1.020)+(1.050), (I-338)+(1.020)+(1.051), (I-338)+(1.020)+(1.052), (I-338)+(1.020)+(1.053), (I-338)+(1.020)+(1.054), (I-338)+(1.020)+(1.055), (I-338)+(1.020)+(1.056), (I-338)+(1.020)+(1.057), (I-338)+(1.020)+(1.058), (I-338)+(1.020)+(1.059), (I-338)+(1.020)+(1.060), (I-338)+(1.020)+(1.061), (I-338)+(1.020)+(1.062), (I-338)+(1.020)+(1.063), (I-338)+(1.020)+(1.064), (I-338)+(1.020)+(1.065), (I-338)+(1.020)+(1.066), (I-338)+(1.020)+(1.067), (I-338)+(1.020)+(1.068), (I-338)+(1.020)+(1.069), (I-338)+(1.020)+(1.070), (I-338)+(1.020)+(1.071), (I-338)+(1.020)+(1.072), (I-338)+(1.020)+(1.073), (I-338)+(1.020)+(1.074), (I-338)+(1.020)+(1.075), (I-338)+(1.020)+(1.076), (I-338)+(1.020)+(1.077), (I-338)+(1.020)+(1.078), (I-338)+(1.020)+(1.079), (I-338)+(1.020)+(1.080), (I-338)+(1.020)+(1.081), (I-338)+(1.020)+(1.082), (I-338)+(1.020)+(1.083), (I-338)+(1.020)+(1.084), (I-338)+(1.020)+(1.085), (I-338)+(1.020)+(1.086), (I-338)+(1.020)+(1.087), (I-338)+(1.020)+(1.088), (I-338)+(1.020)+(1.089), (I-338)+(1.020)+(1.090), (I-338)+(1.020)+(1.091), (I-338)+(1.020)+(1.092), (I-338)+(1.020)+(2.001), (I-338)+(1.020)+(2.002), (I-338)+(1.020)+(2.003), (I-338)+(1.020)+(2.004), (I-338)+(1.020)+(2.005), (I-338)+(1.020)+(2.006), (I-338)+(1.020)+(2.007), (I-338)+(1.020)+(2.008), (I-338)+(1.020)+(2.009), (I-338)+(1.020)+(2.010), (I-338)+(1.020)+(2.011), (I-338)+(1.020)+(2.012), (I-338)+(1.020)+(2.013), (I-338)+(1.020)+(2.014), (I-338)+(1.020)+(2.015), (I-338)+(1.020)+(2.016), (I-338)+(1.020)+(2.017), (I-338)+(1.020)+(2.018), (I-338)+(1.020)+(2.019), (I-338)+(1.020)+(2.020), (I-338)+(1.020)+(2.021), (I-338)+(1.020)+(2.022), (I-338)+(1.020)+(2.023), (I-338)+(1.020)+(2.024), (I-338)+(1.020)+(2.025), (I-338)+(1.020)+(2.026), (I-338)+(1.020)+(2.027), (I-338)+(1.020)+(2.028), (I-338)+(1.020)+(2.029), (I-338)+(1.020)+(2.030), (I-338)+(1.020)+(2.031), (I-338)+(1.020)+(2.032), (I-338)+(1.020)+(2.033), (I-338)+(1.020)+(2.034), (I-338)+(1.020)+(2.035), (I-338)+(1.020)+(2.036), (I-338)+(1.020)+(2.037), (I-338)+(1.020)+(2.038), (I-338)+(1.020)+(2.039), (I-338)+(1.020)+(2.040), (I-338)+(1.020)+(2.041), (I-338)+(1.020)+(2.042), (I-338)+(1.020)+(2.043), (I-338)+(1.020)+(2.044), (I-338)+(1.020)+(2.045), (I-338)+(1.020)+(2.046), (I-338)+(1.020)+(2.047), (I-338)+(1.020)+(2.048), (I-338)+(1.020)+(2.049), (I-338)+(1.020)+(2.050), (I-338)+(1.020)+(2.051), (I-338)+(1.020)+(2.052), (I-338)+(1.020)+(2.053), (I-338)+(1.020)+(2.054), (I-338)+(1.020)+(2.055), (I-338)+(1.020)+(2.056), (I-338)+(1.020)+(2.057), (I-338)+(1.020)+(2.058), (I-338)+(1.020)+(2.059), (I-338)+(1.020)+(3.001), (I-338)+(1.020)+(3.002), (I-338)+(1.020)+(3.003), (I-338)+(1.020)+(3.004), (I-338)+(1.020)+(3.005), (I-338)+(1.020)+(3.006), (I-338)+(1.020)+(3.007), (I-338)+(1.020)+(3.008), (I-338)+(1.020)+(3.009), (I-338)+(1.020)+(3.010), (I-338)+(1.020)+(3.011), (I-338)+(1.020)+(3.012), (I-338)+(1.020)+(3.013), (I-338)+(1.020)+(3.014), (I-338)+(1.020)+(3.015), (I-338)+(1.020)+(3.016), (I-338)+(1.020)+(3.017), (I-338)+(1.020)+(3.018), (I-338)+(1.020)+(3.019), (I-338)+(1.020)+(3.020), (I-338)+(1.020)+(3.021), (I-338)+(1.020)+(3.022), (I-338)+(1.020)+(3.023), (I-338)+(1.020)+(3.024), (I-338)+(1.020)+(3.025), (I-338)+(1.020)+(3.026), (I-338)+(1.020)+(3.027), (I-338)+(1.020)+(3.028), (I-338)+(1.020)+(3.029), (I-338)+(1.020)+(3.030), (I-338)+(1.020)+(3.031), (I-338)+(1.020)+(5.001), (I-338)+(1.020)+(5.002), (I-338)+(1.020)+(5.003), (I-338)+(1.020)+(5.004), (I-338)+(1.020)+(5.005), (I-338)+(1.020)+(5.006), (I-338)+(1.020)+(5.007), (I-338)+(1.020)+(5.008), (I-338)+(1.020)+(5.009), (I-338)+(1.020)+(5.010), (I-338)+(1.020)+(5.011), (I-338)+(1.020)+(5.012), (I-338)+(1.020)+(5.013), (I-338)+(1.020)+(5.014), (I-338)+(1.020)+(5.015), (I-338)+(1.020)+(5.016), (I-338)+(1.020)+(5.017), (I-338)+(1.020)+(5.018), (I-338)+(1.020)+(5.019), (I-338)+(1.020)+(5.020), (I-338)+(1.020)+(5.021), (I-338)+(1.020)+(5.022), (I-338)+(1.020)+(5.023), (I-338)+(1.020)+(6.001), (I-338)+(1.020)+(6.002), (I-338)+(1.020)+(6.003), (I-338)+(1.020)+(6.004), (I-338)+(1.020)+(7.001), (I-338)+(1.020)+(7.002), (I-338)+(1.020)+(7.003), (I-338)+(1.020)+(7.004), (I-338)+(1.020)+(7.005), (I-338)+(1.020)+(7.006), (I-338)+(1.020)+(9.001), (I-338)+(1.020)+(9.002), (I-338)+(1.020)+(9.003), (I-338)+(1.020)+(9.004), (I-338)+(1.020)+(9.005), (I-338)+(1.020)+(9.006), (I-338)+(1.020)+(9.007), (I-338)+(1.020)+(9.008), (I-338)+(1.020)+(9.009), (I-338)+(1.020)+(14.001), (I-338)+(1.020)+(14.002), (I-338)+(1.020)+(15.008), (I-338)+(1.020)+(15.011), (I-338)+(1.020)+(15.012), (I-338)+(1.020)+(15.016), (I-338)+(1.020)+(15.025), (I-338)+(1.020)+(15.027), (I-338)+(1.020)+(15.047), (I-338)+(1.020)+(15.063), (I-338)+(1.020)+(15.064), (I-338)+(1.020)+(16.001), (I-338)+(1.020)+(16.002), (I-338)+(1.020)+(16.003), (I-338)+(1.020)+(16.004), (I-338)+(1.020)+(16.005), (I-338)+(1.020)+(16.006), (I-338)+(1.020)+(16.007), (I-338)+(1.020)+(16.008), (I-338)+(1.020)+(17.001), (I-338)+(1.020)+(17.002), (I-338)+(1.020)+(17.003), (I-338)+(1.020)+(17.004), (I-338)+(1.020)+(17.005), (I-338)+(1.020)+(17.006), (I-338)+(1.020)+(17.007), (I-338)+(1.020)+(17.008), (I-338)+(1.020)+(17.009), (I-338)+(1.020)+(17.010), (I-338)+(1.020)+(17.011), (I-338)+(1.020)+(17.012), (I-338)+(1.020)+(18.001), (I-338)+(1.021)+(1.022), (I-338)+(1.021)+(1.023), (I-338)+(1.021)+(1.024), (I-338)+(1.021)+(1.025), (I-338)+(1.021)+(1.026), (I-338)+(1.021)+(1.027), (I-338)+(1.021)+(1.028), (I-338)+(1.021)+(1.029), (I-338)+(1.021)+(1.030), (I-338)+(1.021)+(1.031), (I-338)+(1.021)+(1.032), (I-338)+(1.021)+(1.033), (I-338)+(1.021)+(1.034), (I-338)+(1.021)+(1.035), (I-338)+(1.021)+(1.036), (I-338)+(1.021)+(1.037), (I-338)+(1.021)+(1.038), (I-338)+(1.021)+(1.039), (I-338)+(1.021)+(1.040), (I-338)+(1.021)+(1.041), (I-338)+(1.021)+(1.042), (I-338)+(1.021)+(1.043), (I-338)+(1.021)+(1.044), (I-338)+(1.021)+(1.045), (I-338)+(1.021)+(1.046), (I-338)+(1.021)+(1.047), (I-338)+(1.021)+(1.048), (I-338)+(1.021)+(1.049), (I-338)+(1.021)+(1.050), (I-338)+(1.021)+(1.051), (I-338)+(1.021)+(1.052), (I-338)+(1.021)+(1.053), (I-338)+(1.021)+(1.054), (I-338)+(1.021)+(1.055), (I-338)+(1.021)+(1.056), (I-338)+(1.021)+(1.057), (I-338)+(1.021)+(1.058), (I-338)+(1.021)+(1.059), (I-338)+(1.021)+(1.060), (I-338)+(1.021)+(1.061), (I-338)+(1.021)+(1.062), (I-338)+(1.021)+(1.063), (I-338)+(1.021)+(1.064), (I-338)+(1.021)+(1.065), (I-338)+(1.021)+(1.066), (I-338)+(1.021)+(1.067), (I-338)+(1.021)+(1.068), (I-338)+(1.021)+(1.069), (I-338)+(1.021)+(1.070), (I-338)+(1.021)+(1.071), (I-338)+(1.021)+(1.072), (I-338)+(1.021)+(1.073), (I-338)+(1.021)+(1.074), (I-338)+(1.021)+(1.075), (I-338)+(1.021)+(1.076), (I-338)+(1.021)+(1.077), (I-338)+(1.021)+(1.078), (I-338)+(1.021)+(1.079), (I-338)+(1.021)+(1.080), (I-338)+(1.021)+(1.081), (I-338)+(1.021)+(1.082), (I-338)+(1.021)+(1.083), (I-338)+(1.021)+(1.084), (I-338)+(1.021)+(1.085), (I-338)+(1.021)+(1.086), (I-338)+(1.021)+(1.087), (I-338)+(1.021)+(1.088), (I-338)+(1.021)+(1.089), (I-338)+(1.021)+(1.090), (I-338)+(1.021)+(1.091), (I-338)+(1.021)+(1.092), (I-338)+(1.021)+(2.001), (I-338)+(1.021)+(2.002), (I-338)+(1.021)+(2.003), (I-338)+(1.021)+(2.004), (I-338)+(1.021)+(2.005), (I-338)+(1.021)+(2.006), (I-338)+(1.021)+(2.007), (I-338)+(1.021)+(2.008), (I-338)+(1.021)+(2.009), (I-338)+(1.021)+(2.010), (I-338)+(1.021)+(2.011), (I-338)+(1.021)+(2.012), (I-338)+(1.021)+(2.013), (I-338)+(1.021)+(2.014), (I-338)+(1.021)+(2.015), (I-338)+(1.021)+(2.016), (I-338)+(1.021)+(2.017), (I-338)+(1.021)+(2.018), (I-338)+(1.021)+(2.019), (I-338)+(1.021)+(2.020), (I-338)+(1.021)+(2.021), (I-338)+(1.021)+(2.022), (I-338)+(1.021)+(2.023), (I-338)+(1.021)+(2.024), (I-338)+(1.021)+(2.025), (I-338)+(1.021)+(2.026), (I-338)+(1.021)+(2.027), (I-338)+(1.021)+(2.028), (I-338)+(1.021)+(2.029), (I-338)+(1.021)+(2.030), (I-338)+(1.021)+(2.031), (I-338)+(1.021)+(2.032), (I-338)+(1.021)+(2.033), (I-338)+(1.021)+(2.034), (I-338)+(1.021)+(2.035), (I-338)+(1.021)+(2.036), (I-338)+(1.021)+(2.037), (I-338)+(1.021)+(2.038), (I-338)+(1.021)+(2.039), (I-338)+(1.021)+(2.040), (I-338)+(1.021)+(2.041), (I-338)+(1.021)+(2.042), (I-338)+(1.021)+(2.043), (I-338)+(1.021)+(2.044), (I-338)+(1.021)+(2.045), (I-338)+(1.021)+(2.046), (I-338)+(1.021)+(2.047), (I-338)+(1.021)+(2.048), (I-338)+(1.021)+(2.049), (I-338)+(1.021)+(2.050), (I-338)+(1.021)+(2.051), (I-338)+(1.021)+(2.052), (I-338)+(1.021)+(2.053), (I-338)+(1.021)+(2.054), (I-338)+(1.021)+(2.055), (I-338)+(1.021)+(2.056), (I-338)+(1.021)+(2.057), (I-338)+(1.021)+(2.058), (I-338)+(1.021)+(2.059), (I-338)+(1.021)+(3.001), (I-338)+(1.021)+(3.002), (I-338)+(1.021)+(3.003), (I-338)+(1.021)+(3.004), (I-338)+(1.021)+(3.005), (I-338)+(1.021)+(3.006), (I-338)+(1.021)+(3.007), (I-338)+(1.021)+(3.008), (I-338)+(1.021)+(3.009), (I-338)+(1.021)+(3.010), (I-338)+(1.021)+(3.011), (I-338)+(1.021)+(3.012), (I-338)+(1.021)+(3.013), (I-338)+(1.021)+(3.014), (I-338)+(1.021)+(3.015), (I-338)+(1.021)+(3.016), (I-338)+(1.021)+(3.017), (I-338)+(1.021)+(3.018), (I-338)+(1.021)+(3.019), (I-338)+(1.021)+(3.020), (I-338)+(1.021)+(3.021), (I-338)+(1.021)+(3.022), (I-338)+(1.021)+(3.023), (I-338)+(1.021)+(3.024), (I-338)+(1.021)+(3.025), (I-338)+(1.021)+(3.026), (I-338)+(1.021)+(3.027), (I-338)+(1.021)+(3.028), (I-338)+(1.021)+(3.029), (I-338)+(1.021)+(3.030), (I-338)+(1.021)+(3.031), (I-338)+(1.021)+(5.001), (I-338)+(1.021)+(5.002), (I-338)+(1.021)+(5.003), (I-338)+(1.021)+(5.004), (I-338)+(1.021)+(5.005), (I-338)+(1.021)+(5.006), (I-338)+(1.021)+(5.007), (I-338)+(1.021)+(5.008), (I-338)+(1.021)+(5.009), (I-338)+(1.021)+(5.010), (I-338)+(1.021)+(5.011), (I-338)+(1.021)+(5.012), (I-338)+(1.021)+(5.013), (I-338)+(1.021)+(5.014), (I-338)+(1.021)+(5.015), (I-338)+(1.021)+(5.016), (I-338)+(1.021)+(5.017), (I-338)+(1.021)+(5.018), (I-338)+(1.021)+(5.019), (I-338)+(1.021)+(5.020), (I-338)+(1.021)+(5.021), (I-338)+(1.021)+(5.022), (I-338)+(1.021)+(5.023), (I-338)+(1.021)+(6.001), (I-338)+(1.021)+(6.002), (I-338)+(1.021)+(6.003), (I-338)+(1.021)+(6.004), (I-338)+(1.021)+(7.001), (I-338)+(1.021)+(7.002), (I-338)+(1.021)+(7.003), (I-338)+(1.021)+(7.004), (I-338)+(1.021)+(7.005), (I-338)+(1.021)+(7.006), (I-338)+(1.021)+(9.001), (I-338)+(1.021)+(9.002), (I-338)+(1.021)+(9.003), (I-338)+(1.021)+(9.004), (I-338)+(1.021)+(9.005), (I-338)+(1.021)+(9.006), (I-338)+(1.021)+(9.007), (I-338)+(1.021)+(9.008), (I-338)+(1.021)+(9.009), (I-338)+(1.021)+(14.001), (I-338)+(1.021)+(14.002), (I-338)+(1.021)+(15.008), (I-338)+(1.021)+(15.011), (I-338)+(1.021)+(15.012), (I-338)+(1.021)+(15.016), (I-338)+(1.021)+(15.025), (I-338)+(1.021)+(15.027), (I-338)+(1.021)+(15.047), (I-338)+(1.021)+(15.063), (I-338)+(1.021)+(15.064), (I-338)+(1.021)+(16.001), (I-338)+(1.021)+(16.002), (I-338)+(1.021)+(16.003), (I-338)+(1.021)+(16.004), (I-338)+(1.021)+(16.005), (I-338)+(1.021)+(16.006), (I-338)+(1.021)+(16.007), (I-338)+(1.021)+(16.008), (I-338)+(1.021)+(17.001), (I-338)+(1.021)+(17.002), (I-338)+(1.021)+(17.003), (I-338)+(1.021)+(17.004), (I-338)+(1.021)+(17.005), (I-338)+(1.021)+(17.006), (I-338)+(1.021)+(17.007), (I-338)+(1.021)+(17.008), (I-338)+(1.021)+(17.009), (I-338)+(1.021)+(17.010), (I-338)+(1.021)+(17.011), (I-338)+(1.021)+(17.012), (I-338)+(1.021)+(18.001), (I-338)+(1.022)+(1.023), (I-338)+(1.022)+(1.024), (I-338)+(1.022)+(1.025), (I-338)+(1.022)+(1.026), (I-338)+(1.022)+(1.027), (I-338)+(1.022)+(1.028), (I-338)+(1.022)+(1.029), (I-338)+(1.022)+(1.030), (I-338)+(1.022)+(1.031), (I-338)+(1.022)+(1.032), (I-338)+(1.022)+(1.033), (I-338)+(1.022)+(1.034), (I-338)+(1.022)+(1.035), (I-338)+(1.022)+(1.036), (I-338)+(1.022)+(1.037), (I-338)+(1.022)+(1.038), (I-338)+(1.022)+(1.039), (I-338)+(1.022)+(1.040), (I-338)+(1.022)+(1.041), (I-338)+(1.022)+(1.042), (I-338)+(1.022)+(1.043), (I-338)+(1.022)+(1.044), (I-338)+(1.022)+(1.045), (I-338)+(1.022)+(1.046), (I-338)+(1.022)+(1.047), (I-338)+(1.022)+(1.048), (I-338)+(1.022)+(1.049), (I-338)+(1.022)+(1.050), (I-338)+(1.022)+(1.051), (I-338)+(1.022)+(1.052), (I-338)+(1.022)+(1.053), (I-338)+(1.022)+(1.054), (I-338)+(1.022)+(1.055), (I-338)+(1.022)+(1.056), (I-338)+(1.022)+(1.057), (I-338)+(1.022)+(1.058), (I-338)+(1.022)+(1.059), (I-338)+(1.022)+(1.060), (I-338)+(1.022)+(1.061), (I-338)+(1.022)+(1.062), (I-338)+(1.022)+(1.063), (I-338)+(1.022)+(1.064), (I-338)+(1.022)+(1.065), (I-338)+(1.022)+(1.066), (I-338)+(1.022)+(1.067), (I-338)+(1.022)+(1.068), (I-338)+(1.022)+(1.069), (I-338)+(1.022)+(1.070), (I-338)+(1.022)+(1.071), (I-338)+(1.022)+(1.072), (I-338)+(1.022)+(1.073), (I-338)+(1.022)+(1.074), (I-338)+(1.022)+(1.075), (I-338)+(1.022)+(1.076), (I-338)+(1.022)+(1.077), (I-338)+(1.022)+(1.078), (I-338)+(1.022)+(1.079), (I-338)+(1.022)+(1.080), (I-338)+(1.022)+(1.081), (I-338)+(1.022)+(1.082), (I-338)+(1.022)+(1.083), (I-338)+(1.022)+(1.084), (I-338)+(1.022)+(1.085), (I-338)+(1.022)+(1.086), (I-338)+(1.022)+(1.087), (I-338)+(1.022)+(1.088), (I-338)+(1.022)+(1.089), (I-338)+(1.022)+(1.090), (I-338)+(1.022)+(1.091), (I-338)+(1.022)+(1.092), (I-338)+(1.022)+(2.001), (I-338)+(1.022)+(2.002), (I-338)+(1.022)+(2.003), (I-338)+(1.022)+(2.004), (I-338)+(1.022)+(2.005), (I-338)+(1.022)+(2.006), (I-338)+(1.022)+(2.007), (I-338)+(1.022)+(2.008), (I-338)+(1.022)+(2.009), (I-338)+(1.022)+(2.010), (I-338)+(1.022)+(2.011), (I-338)+(1.022)+(2.012), (I-338)+(1.022)+(2.013), (I-338)+(1.022)+(2.014), (I-338)+(1.022)+(2.015), (I-338)+(1.022)+(2.016), (I-338)+(1.022)+(2.017), (I-338)+(1.022)+(2.018), (I-338)+(1.022)+(2.019), (I-338)+(1.022)+(2.020), (I-338)+(1.022)+(2.021), (I-338)+(1.022)+(2.022), (I-338)+(1.022)+(2.023), (I-338)+(1.022)+(2.024), (I-338)+(1.022)+(2.025), (I-338)+(1.022)+(2.026), (I-338)+(1.022)+(2.027), (I-338)+(1.022)+(2.028), (I-338)+(1.022)+(2.029), (I-338)+(1.022)+(2.030), (I-338)+(1.022)+(2.031), (I-338)+(1.022)+(2.032), (I-338)+(1.022)+(2.033), (I-338)+(1.022)+(2.034), (I-338)+(1.022)+(2.035), (I-338)+(1.022)+(2.036), (I-338)+(1.022)+(2.037), (I-338)+(1.022)+(2.038), (I-338)+(1.022)+(2.039), (I-338)+(1.022)+(2.040), (I-338)+(1.022)+(2.041), (I-338)+(1.022)+(2.042), (I-338)+(1.022)+(2.043), (I-338)+(1.022)+(2.044), (I-338)+(1.022)+(2.045), (I-338)+(1.022)+(2.046), (I-338)+(1.022)+(2.047), (I-338)+(1.022)+(2.048), (I-338)+(1.022)+(2.049), (I-338)+(1.022)+(2.050), (I-338)+(1.022)+(2.051), (I-338)+(1.022)+(2.052), (I-338)+(1.022)+(2.053), (I-338)+(1.022)+(2.054), (I-338)+(1.022)+(2.055), (I-338)+(1.022)+(2.056), (I-338)+(1.022)+(2.057), (I-338)+(1.022)+(2.058), (I-338)+(1.022)+(2.059), (I-338)+(1.022)+(3.001), (I-338)+(1.022)+(3.002), (I-338)+(1.022)+(3.003), (I-338)+(1.022)+(3.004), (I-338)+(1.022)+(3.005), (I-338)+(1.022)+(3.006), (I-338)+(1.022)+(3.007), (I-338)+(1.022)+(3.008), (I-338)+(1.022)+(3.009), (I-338)+(1.022)+(3.010), (I-338)+(1.022)+(3.011), (I-338)+(1.022)+(3.012), (I-338)+(1.022)+(3.013), (I-338)+(1.022)+(3.014), (I-338)+(1.022)+(3.015), (I-338)+(1.022)+(3.016), (I-338)+(1.022)+(3.017), (I-338)+(1.022)+(3.018), (I-338)+(1.022)+(3.019), (I-338)+(1.022)+(3.020), (I-338)+(1.022)+(3.021), (I-338)+(1.022)+(3.022), (I-338)+(1.022)+(3.023), (I-338)+(1.022)+(3.024), (I-338)+(1.022)+(3.025), (I-338)+(1.022)+(3.026), (I-338)+(1.022)+(3.027), (I-338)+(1.022)+(3.028), (I-338)+(1.022)+(3.029), (I-338)+(1.022)+(3.030), (I-338)+(1.022)+(3.031), (I-338)+(1.022)+(5.001), (I-338)+(1.022)+(5.002), (I-338)+(1.022)+(5.003), (I-338)+(1.022)+(5.004), (I-338)+(1.022)+(5.005), (I-338)+(1.022)+(5.006), (I-338)+(1.022)+(5.007), (I-338)+(1.022)+(5.008), (I-338)+(1.022)+(5.009), (I-338)+(1.022)+(5.010), (I-338)+(1.022)+(5.011), (I-338)+(1.022)+(5.012), (I-338)+(1.022)+(5.013), (I-338)+(1.022)+(5.014), (I-338)+(1.022)+(5.015), (I-338)+(1.022)+(5.016), (I-338)+(1.022)+(5.017), (I-338)+(1.022)+(5.018), (I-338)+(1.022)+(5.019), (I-338)+(1.022)+(5.020), (I-338)+(1.022)+(5.021), (I-338)+(1.022)+(5.022), (I-338)+(1.022)+(5.023), (I-338)+(1.022)+(6.001), (I-338)+(1.022)+(6.002), (I-338)+(1.022)+(6.003), (I-338)+(1.022)+(6.004), (I-338)+(1.022)+(7.001), (I-338)+(1.022)+(7.002), (I-338)+(1.022)+(7.003), (I-338)+(1.022)+(7.004), (I-338)+(1.022)+(7.005), (I-338)+(1.022)+(7.006), (I-338)+(1.022)+(9.001), (I-338)+(1.022)+(9.002), (I-338)+(1.022)+(9.003), (I-338)+(1.022)+(9.004), (I-338)+(1.022)+(9.005), (I-338)+(1.022)+(9.006), (I-338)+(1.022)+(9.007), (I-338)+(1.022)+(9.008), (I-338)+(1.022)+(9.009), (I-338)+(1.022)+(14.001), (I-338)+(1.022)+(14.002), (I-338)+(1.022)+(15.008), (I-338)+(1.022)+(15.011), (I-338)+(1.022)+(15.012), (I-338)+(1.022)+(15.016), (I-338)+(1.022)+(15.025), (I-338)+(1.022)+(15.027), (I-338)+(1.022)+(15.047), (I-338)+(1.022)+(15.063), (I-338)+(1.022)+(15.064), (I-338)+(1.022)+(16.001), (I-338)+(1.022)+(16.002), (I-338)+(1.022)+(16.003), (I-338)+(1.022)+(16.004), (I-338)+(1.022)+(16.005), (I-338)+(1.022)+(16.006), (I-338)+(1.022)+(16.007), (I-338)+(1.022)+(16.008), (I-338)+(1.022)+(17.001), (I-338)+(1.022)+(17.002), (I-338)+(1.022)+(17.003), (I-338)+(1.022)+(17.004), (I-338)+(1.022)+(17.005), (I-338)+(1.022)+(17.006), (I-338)+(1.022)+(17.007), (I-338)+(1.022)+(17.008), (I-338)+(1.022)+(17.009), (I-338)+(1.022)+(17.010), (I-338)+(1.022)+(17.011), (I-338)+(1.022)+(17.012), (I-338)+(1.022)+(18.001), (I-338)+(1.023)+(1.024), (I-338)+(1.023)+(1.025), (I-338)+(1.023)+(1.026), (I-338)+(1.023)+(1.027), (I-338)+(1.023)+(1.028), (I-338)+(1.023)+(1.029), (I-338)+(1.023)+(1.030), (I-338)+(1.023)+(1.031), (I-338)+(1.023)+(1.032), (I-338)+(1.023)+(1.033), (I-338)+(1.023)+(1.034), (I-338)+(1.023)+(1.035), (I-338)+(1.023)+(1.036), (I-338)+(1.023)+(1.037), (I-338)+(1.023)+(1.038), (I-338)+(1.023)+(1.039), (I-338)+(1.023)+(1.040), (I-338)+(1.023)+(1.041), (I-338)+(1.023)+(1.042), (I-338)+(1.023)+(1.043), (I-338)+(1.023)+(1.044), (I-338)+(1.023)+(1.045), (I-338)+(1.023)+(1.046), (I-338)+(1.023)+(1.047), (I-338)+(1.023)+(1.048), (I-338)+(1.023)+(1.049), (I-338)+(1.023)+(1.050), (I-338)+(1.023)+(1.051), (I-338)+(1.023)+(1.052), (I-338)+(1.023)+(1.053), (I-338)+(1.023)+(1.054), (I-338)+(1.023)+(1.055), (I-338)+(1.023)+(1.056), (I-338)+(1.023)+(1.057), (I-338)+(1.023)+(1.058), (I-338)+(1.023)+(1.059), (I-338)+(1.023)+(1.060), (I-338)+(1.023)+(1.061), (I-338)+(1.023)+(1.062), (I-338)+(1.023)+(1.063), (I-338)+(1.023)+(1.064), (I-338)+(1.023)+(1.065), (I-338)+(1.023)+(1.066), (I-338)+(1.023)+(1.067), (I-338)+(1.023)+(1.068), (I-338)+(1.023)+(1.069), (I-338)+(1.023)+(1.070), (I-338)+(1.023)+(1.071), (I-338)+(1.023)+(1.072), (I-338)+(1.023)+(1.073), (I-338)+(1.023)+(1.074), (I-338)+(1.023)+(1.075), (I-338)+(1.023)+(1.076), (I-338)+(1.023)+(1.077), (I-338)+(1.023)+(1.078), (I-338)+(1.023)+(1.079), (I-338)+(1.023)+(1.080), (I-338)+(1.023)+(1.081), (I-338)+(1.023)+(1.082), (I-338)+(1.023)+(1.083), (I-338)+(1.023)+(1.084), (I-338)+(1.023)+(1.085), (I-338)+(1.023)+(1.086), (I-338)+(1.023)+(1.087), (I-338)+(1.023)+(1.088), (I-338)+(1.023)+(1.089), (I-338)+(1.023)+(1.090), (I-338)+(1.023)+(1.091), (I-338)+(1.023)+(1.092), (I-338)+(1.023)+(2.001), (I-338)+(1.023)+(2.002), (I-338)+(1.023)+(2.003), (I-338)+(1.023)+(2.004), (I-338)+(1.023)+(2.005), (I-338)+(1.023)+(2.006), (I-338)+(1.023)+(2.007), (I-338)+(1.023)+(2.008), (I-338)+(1.023)+(2.009), (I-338)+(1.023)+(2.010), (I-338)+(1.023)+(2.011), (I-338)+(1.023)+(2.012), (I-338)+(1.023)+(2.013), (I-338)+(1.023)+(2.014), (I-338)+(1.023)+(2.015), (I-338)+(1.023)+(2.016), (I-338)+(1.023)+(2.017), (I-338)+(1.023)+(2.018), (I-338)+(1.023)+(2.019), (I-338)+(1.023)+(2.020), (I-338)+(1.023)+(2.021), (I-338)+(1.023)+(2.022), (I-338)+(1.023)+(2.023), (I-338)+(1.023)+(2.024), (I-338)+(1.023)+(2.025), (I-338)+(1.023)+(2.026), (I-338)+(1.023)+(2.027), (I-338)+(1.023)+(2.028), (I-338)+(1.023)+(2.029), (I-338)+(1.023)+(2.030), (I-338)+(1.023)+(2.031), (I-338)+(1.023)+(2.032), (I-338)+(1.023)+(2.033), (I-338)+(1.023)+(2.034), (I-338)+(1.023)+(2.035), (I-338)+(1.023)+(2.036), (I-338)+(1.023)+(2.037), (I-338)+(1.023)+(2.038), (I-338)+(1.023)+(2.039), (I-338)+(1.023)+(2.040), (I-338)+(1.023)+(2.041), (I-338)+(1.023)+(2.042), (I-338)+(1.023)+(2.043), (I-338)+(1.023)+(2.044), (I-338)+(1.023)+(2.045), (I-338)+(1.023)+(2.046), (I-338)+(1.023)+(2.047), (I-338)+(1.023)+(2.048), (I-338)+(1.023)+(2.049), (I-338)+(1.023)+(2.050), (I-338)+(1.023)+(2.051), (I-338)+(1.023)+(2.052), (I-338)+(1.023)+(2.053), (I-338)+(1.023)+(2.054), (I-338)+(1.023)+(2.055), (I-338)+(1.023)+(2.056), (I-338)+(1.023)+(2.057), (I-338)+(1.023)+(2.058), (I-338)+(1.023)+(2.059), (I-338)+(1.023)+(3.001), (I-338)+(1.023)+(3.002), (I-338)+(1.023)+(3.003), (I-338)+(1.023)+(3.004), (I-338)+(1.023)+(3.005), (I-338)+(1.023)+(3.006), (I-338)+(1.023)+(3.007), (I-338)+(1.023)+(3.008), (I-338)+(1.023)+(3.009), (I-338)+(1.023)+(3.010), (I-338)+(1.023)+(3.011), (I-338)+(1.023)+(3.012), (I-338)+(1.023)+(3.013), (I-338)+(1.023)+(3.014), (I-338)+(1.023)+(3.015), (I-338)+(1.023)+(3.016), (I-338)+(1.023)+(3.017), (I-338)+(1.023)+(3.018), (I-338)+(1.023)+(3.019), (I-338)+(1.023)+(3.020), (I-338)+(1.023)+(3.021), (I-338)+(1.023)+(3.022), (I-338)+(1.023)+(3.023), (I-338)+(1.023)+(3.024), (I-338)+(1.023)+(3.025), (I-338)+(1.023)+(3.026), (I-338)+(1.023)+(3.027), (I-338)+(1.023)+(3.028), (I-338)+(1.023)+(3.029), (I-338)+(1.023)+(3.030), (I-338)+(1.023)+(3.031), (I-338)+(1.023)+(5.001), (I-338)+(1.023)+(5.002), (I-338)+(1.023)+(5.003), (I-338)+(1.023)+(5.004), (I-338)+(1.023)+(5.005), (I-338)+(1.023)+(5.006), (I-338)+(1.023)+(5.007), (I-338)+(1.023)+(5.008), (I-338)+(1.023)+(5.009), (I-338)+(1.023)+(5.010), (I-338)+(1.023)+(5.011), (I-338)+(1.023)+(5.012), (I-338)+(1.023)+(5.013), (I-338)+(1.023)+(5.014), (I-338)+(1.023)+(5.015), (I-338)+(1.023)+(5.016), (I-338)+(1.023)+(5.017), (I-338)+(1.023)+(5.018), (I-338)+(1.023)+(5.019), (I-338)+(1.023)+(5.020), (I-338)+(1.023)+(5.021), (I-338)+(1.023)+(5.022), (I-338)+(1.023)+(5.023), (I-338)+(1.023)+(6.001), (I-338)+(1.023)+(6.002), (I-338)+(1.023)+(6.003), (I-338)+(1.023)+(6.004), (I-338)+(1.023)+(7.001), (I-338)+(1.023)+(7.002), (I-338)+(1.023)+(7.003), (I-338)+(1.023)+(7.004), (I-338)+(1.023)+(7.005), (I-338)+(1.023)+(7.006), (I-338)+(1.023)+(9.001), (I-338)+(1.023)+(9.002), (I-338)+(1.023)+(9.003), (I-338)+(1.023)+(9.004), (I-338)+(1.023)+(9.005), (I-338)+(1.023)+(9.006), (I-338)+(1.023)+(9.007), (I-338)+(1.023)+(9.008), (I-338)+(1.023)+(9.009), (I-338)+(1.023)+(14.001), (I-338)+(1.023)+(14.002), (I-338)+(1.023)+(15.008), (I-338)+(1.023)+(15.011), (I-338)+(1.023)+(15.012), (I-338)+(1.023)+(15.016), (I-338)+(1.023)+(15.025), (I-338)+(1.023)+(15.027), (I-338)+(1.023)+(15.047), (I-338)+(1.023)+(15.063), (I-338)+(1.023)+(15.064), (I-338)+(1.023)+(16.001), (I-338)+(1.023)+(16.002), (I-338)+(1.023)+(16.003), (I-338)+(1.023)+(16.004), (I-338)+(1.023)+(16.005), (I-338)+(1.023)+(16.006), (I-338)+(1.023)+(16.007), (I-338)+(1.023)+(16.008), (I-338)+(1.023)+(17.001), (I-338)+(1.023)+(17.002), (I-338)+(1.023)+(17.003), (I-338)+(1.023)+(17.004), (I-338)+(1.023)+(17.005), (I-338)+(1.023)+(17.006), (I-338)+(1.023)+(17.007), (I-338)+(1.023)+(17.008), (I-338)+(1.023)+(17.009), (I-338)+(1.023)+(17.010), (I-338)+(1.023)+(17.011), (I-338)+(1.023)+(17.012), (I-338)+(1.023)+(18.001), (I-338)+(1.024)+(1.025), (I-338)+(1.024)+(1.026), (I-338)+(1.024)+(1.027), (I-338)+(1.024)+(1.028), (I-338)+(1.024)+(1.029), (I-338)+(1.024)+(1.030), (I-338)+(1.024)+(1.031), (I-338)+(1.024)+(1.032), (I-338)+(1.024)+(1.033), (I-338)+(1.024)+(1.034), (I-338)+(1.024)+(1.035), (I-338)+(1.024)+(1.036), (I-338)+(1.024)+(1.037), (I-338)+(1.024)+(1.038), (I-338)+(1.024)+(1.039), (I-338)+(1.024)+(1.040), (I-338)+(1.024)+(1.041), (I-338)+(1.024)+(1.042), (I-338)+(1.024)+(1.043), (I-338)+(1.024)+(1.044), (I-338)+(1.024)+(1.045), (I-338)+(1.024)+(1.046), (I-338)+(1.024)+(1.047), (I-338)+(1.024)+(1.048), (I-338)+(1.024)+(1.049), (I-338)+(1.024)+(1.050), (I-338)+(1.024)+(1.051), (I-338)+(1.024)+(1.052), (I-338)+(1.024)+(1.053), (I-338)+(1.024)+(1.054), (I-338)+(1.024)+(1.055), (I-338)+(1.024)+(1.056), (I-338)+(1.024)+(1.057), (I-338)+(1.024)+(1.058), (I-338)+(1.024)+(1.059), (I-338)+(1.024)+(1.060), (I-338)+(1.024)+(1.061), (I-338)+(1.024)+(1.062), (I-338)+(1.024)+(1.063), (I-338)+(1.024)+(1.064), (I-338)+(1.024)+(1.065), (I-338)+(1.024)+(1.066), (I-338)+(1.024)+(1.067), (I-338)+(1.024)+(1.068), (I-338)+(1.024)+(1.069), (I-338)+(1.024)+(1.070), (I-338)+(1.024)+(1.071), (I-338)+(1.024)+(1.072), (I-338)+(1.024)+(1.073), (I-338)+(1.024)+(1.074), (I-338)+(1.024)+(1.075), (I-338)+(1.024)+(1.076), (I-338)+(1.024)+(1.077), (I-338)+(1.024)+(1.078), (I-338)+(1.024)+(1.079), (I-338)+(1.024)+(1.080), (I-338)+(1.024)+(1.081), (I-338)+(1.024)+(1.082), (I-338)+(1.024)+(1.083), (I-338)+(1.024)+(1.084), (I-338)+(1.024)+(1.085), (I-338)+(1.024)+(1.086), (I-338)+(1.024)+(1.087), (I-338)+(1.024)+(1.088), (I-338)+(1.024)+(1.089), (I-338)+(1.024)+(1.090), (I-338)+(1.024)+(1.091), (I-338)+(1.024)+(1.092), (I-338)+(1.024)+(2.001), (I-338)+(1.024)+(2.002), (I-338)+(1.024)+(2.003), (I-338)+(1.024)+(2.004), (I-338)+(1.024)+(2.005), (I-338)+(1.024)+(2.006), (I-338)+(1.024)+(2.007), (I-338)+(1.024)+(2.008), (I-338)+(1.024)+(2.009), (I-338)+(1.024)+(2.010), (I-338)+(1.024)+(2.011), (I-338)+(1.024)+(2.012), (I-338)+(1.024)+(2.013), (I-338)+(1.024)+(2.014), (I-338)+(1.024)+(2.015), (I-338)+(1.024)+(2.016), (I-338)+(1.024)+(2.017), (I-338)+(1.024)+(2.018), (I-338)+(1.024)+(2.019), (I-338)+(1.024)+(2.020), (I-338)+(1.024)+(2.021), (I-338)+(1.024)+(2.022), (I-338)+(1.024)+(2.023), (I-338)+(1.024)+(2.024), (I-338)+(1.024)+(2.025), (I-338)+(1.024)+(2.026), (I-338)+(1.024)+(2.027), (I-338)+(1.024)+(2.028), (I-338)+(1.024)+(2.029), (I-338)+(1.024)+(2.030), (I-338)+(1.024)+(2.031), (I-338)+(1.024)+(2.032), (I-338)+(1.024)+(2.033), (I-338)+(1.024)+(2.034), (I-338)+(1.024)+(2.035), (I-338)+(1.024)+(2.036), (I-338)+(1.024)+(2.037), (I-338)+(1.024)+(2.038), (I-338)+(1.024)+(2.039), (I-338)+(1.024)+(2.040), (I-338)+(1.024)+(2.041), (I-338)+(1.024)+(2.042), (I-338)+(1.024)+(2.043), (I-338)+(1.024)+(2.044), (I-338)+(1.024)+(2.045), (I-338)+(1.024)+(2.046), (I-338)+(1.024)+(2.047), (I-338)+(1.024)+(2.048), (I-338)+(1.024)+(2.049), (I-338)+(1.024)+(2.050), (I-338)+(1.024)+(2.051), (I-338)+(1.024)+(2.052), (I-338)+(1.024)+(2.053), (I-338)+(1.024)+(2.054), (I-338)+(1.024)+(2.055), (I-338)+(1.024)+(2.056), (I-338)+(1.024)+(2.057), (I-338)+(1.024)+(2.058), (I-338)+(1.024)+(2.059), (I-338)+(1.024)+(3.001), (I-338)+(1.024)+(3.002), (I-338)+(1.024)+(3.003), (I-338)+(1.024)+(3.004), (I-338)+(1.024)+(3.005), (I-338)+(1.024)+(3.006), (I-338)+(1.024)+(3.007), (I-338)+(1.024)+(3.008), (I-338)+(1.024)+(3.009), (I-338)+(1.024)+(3.010), (I-338)+(1.024)+(3.011), (I-338)+(1.024)+(3.012), (I-338)+(1.024)+(3.013), (I-338)+(1.024)+(3.014), (I-338)+(1.024)+(3.015), (I-338)+(1.024)+(3.016), (I-338)+(1.024)+(3.017), (I-338)+(1.024)+(3.018), (I-338)+(1.024)+(3.019), (I-338)+(1.024)+(3.020), (I-338)+(1.024)+(3.021), (I-338)+(1.024)+(3.022), (I-338)+(1.024)+(3.023), (I-338)+(1.024)+(3.024), (I-338)+(1.024)+(3.025), (I-338)+(1.024)+(3.026), (I-338)+(1.024)+(3.027), (I-338)+(1.024)+(3.028), (I-338)+(1.024)+(3.029), (I-338)+(1.024)+(3.030), (I-338)+(1.024)+(3.031), (I-338)+(1.024)+(5.001), (I-338)+(1.024)+(5.002), (I-338)+(1.024)+(5.003), (I-338)+(1.024)+(5.004), (I-338)+(1.024)+(5.005), (I-338)+(1.024)+(5.006), (I-338)+(1.024)+(5.007), (I-338)+(1.024)+(5.008), (I-338)+(1.024)+(5.009), (I-338)+(1.024)+(5.010), (I-338)+(1.024)+(5.011), (I-338)+(1.024)+(5.012), (I-338)+(1.024)+(5.013), (I-338)+(1.024)+(5.014), (I-338)+(1.024)+(5.015), (I-338)+(1.024)+(5.016), (I-338)+(1.024)+(5.017), (I-338)+(1.024)+(5.018), (I-338)+(1.024)+(5.019), (I-338)+(1.024)+(5.020), (I-338)+(1.024)+(5.021), (I-338)+(1.024)+(5.022), (I-338)+(1.024)+(5.023), (I-338)+(1.024)+(6.001), (I-338)+(1.024)+(6.002), (I-338)+(1.024)+(6.003), (I-338)+(1.024)+(6.004), (I-338)+(1.024)+(7.001), (I-338)+(1.024)+(7.002), (I-338)+(1.024)+(7.003), (I-338)+(1.024)+(7.004), (I-338)+(1.024)+(7.005), (I-338)+(1.024)+(7.006), (I-338)+(1.024)+(9.001), (I-338)+(1.024)+(9.002), (I-338)+(1.024)+(9.003), (I-338)+(1.024)+(9.004), (I-338)+(1.024)+(9.005), (I-338)+(1.024)+(9.006), (I-338)+(1.024)+(9.007), (I-338)+(1.024)+(9.008), (I-338)+(1.024)+(9.009), (I-338)+(1.024)+(14.001), (I-338)+(1.024)+(14.002), (I-338)+(1.024)+(15.008), (I-338)+(1.024)+(15.011), (I-338)+(1.024)+(15.012), (I-338)+(1.024)+(15.016), (I-338)+(1.024)+(15.025), (I-338)+(1.024)+(15.027), (I-338)+(1.024)+(15.047), (I-338)+(1.024)+(15.063), (I-338)+(1.024)+(15.064), (I-338)+(1.024)+(16.001), (I-338)+(1.024)+(16.002), (I-338)+(1.024)+(16.003), (I-338)+(1.024)+(16.004), (I-338)+(1.024)+(16.005), (I-338)+(1.024)+(16.006), (I-338)+(1.024)+(16.007), (I-338)+(1.024)+(16.008), (I-338)+(1.024)+(17.001), (I-338)+(1.024)+(17.002), (I-338)+(1.024)+(17.003), (I-338)+(1.024)+(17.004), (I-338)+(1.024)+(17.005), (I-338)+(1.024)+(17.006), (I-338)+(1.024)+(17.007), (I-338)+(1.024)+(17.008), (I-338)+(1.024)+(17.009), (I-338)+(1.024)+(17.010), (I-338)+(1.024)+(17.011), (I-338)+(1.024)+(17.012), (I-338)+(1.024)+(18.001), (I-338)+(1.025)+(1.026), (I-338)+(1.025)+(1.027), (I-338)+(1.025)+(1.028), (I-338)+(1.025)+(1.029), (I-338)+(1.025)+(1.030), (I-338)+(1.025)+(1.031), (I-338)+(1.025)+(1.032), (I-338)+(1.025)+(1.033), (I-338)+(1.025)+(1.034), (I-338)+(1.025)+(1.035), (I-338)+(1.025)+(1.036), (I-338)+(1.025)+(1.037), (I-338)+(1.025)+(1.038), (I-338)+(1.025)+(1.039), (I-338)+(1.025)+(1.040), (I-338)+(1.025)+(1.041), (I-338)+(1.025)+(1.042), (I-338)+(1.025)+(1.043), (I-338)+(1.025)+(1.044), (I-338)+(1.025)+(1.045), (I-338)+(1.025)+(1.046), (I-338)+(1.025)+(1.047), (I-338)+(1.025)+(1.048), (I-338)+(1.025)+(1.049), (I-338)+(1.025)+(1.050), (I-338)+(1.025)+(1.051), (I-338)+(1.025)+(1.052), (I-338)+(1.025)+(1.053), (I-338)+(1.025)+(1.054), (I-338)+(1.025)+(1.055), (I-338)+(1.025)+(1.056), (I-338)+(1.025)+(1.057), (I-338)+(1.025)+(1.058), (I-338)+(1.025)+(1.059), (I-338)+(1.025)+(1.060), (I-338)+(1.025)+(1.061), (I-338)+(1.025)+(1.062), (I-338)+(1.025)+(1.063), (I-338)+(1.025)+(1.064), (I-338)+(1.025)+(1.065), (I-338)+(1.025)+(1.066), (I-338)+(1.025)+(1.067), (I-338)+(1.025)+(1.068), (I-338)+(1.025)+(1.069), (I-338)+(1.025)+(1.070), (I-338)+(1.025)+(1.071), (I-338)+(1.025)+(1.072), (I-338)+(1.025)+(1.073), (I-338)+(1.025)+(1.074), (I-338)+(1.025)+(1.075), (I-338)+(1.025)+(1.076), (I-338)+(1.025)+(1.077), (I-338)+(1.025)+(1.078), (I-338)+(1.025)+(1.079), (I-338)+(1.025)+(1.080), (I-338)+(1.025)+(1.081), (I-338)+(1.025)+(1.082), (I-338)+(1.025)+(1.083), (I-338)+(1.025)+(1.084), (I-338)+(1.025)+(1.085), (I-338)+(1.025)+(1.086), (I-338)+(1.025)+(1.087), (I-338)+(1.025)+(1.088), (I-338)+(1.025)+(1.089), (I-338)+(1.025)+(1.090), (I-338)+(1.025)+(1.091), (I-338)+(1.025)+(1.092), (I-338)+(1.025)+(2.001), (I-338)+(1.025)+(2.002), (I-338)+(1.025)+(2.003), (I-338)+(1.025)+(2.004), (I-338)+(1.025)+(2.005), (I-338)+(1.025)+(2.006), (I-338)+(1.025)+(2.007), (I-338)+(1.025)+(2.008), (I-338)+(1.025)+(2.009), (I-338)+(1.025)+(2.010), (I-338)+(1.025)+(2.011), (I-338)+(1.025)+(2.012), (I-338)+(1.025)+(2.013), (I-338)+(1.025)+(2.014), (I-338)+(1.025)+(2.015), (I-338)+(1.025)+(2.016), (I-338)+(1.025)+(2.017), (I-338)+(1.025)+(2.018), (I-338)+(1.025)+(2.019), (I-338)+(1.025)+(2.020), (I-338)+(1.025)+(2.021), (I-338)+(1.025)+(2.022), (I-338)+(1.025)+(2.023), (I-338)+(1.025)+(2.024), (I-338)+(1.025)+(2.025), (I-338)+(1.025)+(2.026), (I-338)+(1.025)+(2.027), (I-338)+(1.025)+(2.028), (I-338)+(1.025)+(2.029), (I-338)+(1.025)+(2.030), (I-338)+(1.025)+(2.031), (I-338)+(1.025)+(2.032), (I-338)+(1.025)+(2.033), (I-338)+(1.025)+(2.034), (I-338)+(1.025)+(2.035), (I-338)+(1.025)+(2.036), (I-338)+(1.025)+(2.037), (I-338)+(1.025)+(2.038), (I-338)+(1.025)+(2.039), (I-338)+(1.025)+(2.040), (I-338)+(1.025)+(2.041), (I-338)+(1.025)+(2.042), (I-338)+(1.025)+(2.043), (I-338)+(1.025)+(2.044), (I-338)+(1.025)+(2.045), (I-338)+(1.025)+(2.046), (I-338)+(1.025)+(2.047), (I-338)+(1.025)+(2.048), (I-338)+(1.025)+(2.049), (I-338)+(1.025)+(2.050), (I-338)+(1.025)+(2.051), (I-338)+(1.025)+(2.052), (I-338)+(1.025)+(2.053), (I-338)+(1.025)+(2.054), (I-338)+(1.025)+(2.055), (I-338)+(1.025)+(2.056), (I-338)+(1.025)+(2.057), (I-338)+(1.025)+(2.058), (I-338)+(1.025)+(2.059), (I-338)+(1.025)+(3.001), (I-338)+(1.025)+(3.002), (I-338)+(1.025)+(3.003), (I-338)+(1.025)+(3.004), (I-338)+(1.025)+(3.005), (I-338)+(1.025)+(3.006), (I-338)+(1.025)+(3.007), (I-338)+(1.025)+(3.008), (I-338)+(1.025)+(3.009), (I-338)+(1.025)+(3.010), (I-338)+(1.025)+(3.011), (I-338)+(1.025)+(3.012), (I-338)+(1.025)+(3.013), (I-338)+(1.025)+(3.014), (I-338)+(1.025)+(3.015), (I-338)+(1.025)+(3.016), (I-338)+(1.025)+(3.017), (I-338)+(1.025)+(3.018), (I-338)+(1.025)+(3.019), (I-338)+(1.025)+(3.020), (I-338)+(1.025)+(3.021), (I-338)+(1.025)+(3.022), (I-338)+(1.025)+(3.023), (I-338)+(1.025)+(3.024), (I-338)+(1.025)+(3.025), (I-338)+(1.025)+(3.026), (I-338)+(1.025)+(3.027), (I-338)+(1.025)+(3.028), (I-338)+(1.025)+(3.029), (I-338)+(1.025)+(3.030), (I-338)+(1.025)+(3.031), (I-338)+(1.025)+(5.001), (I-338)+(1.025)+(5.002), (I-338)+(1.025)+(5.003), (I-338)+(1.025)+(5.004), (I-338)+(1.025)+(5.005), (I-338)+(1.025)+(5.006), (I-338)+(1.025)+(5.007), (I-338)+(1.025)+(5.008), (I-338)+(1.025)+(5.009), (I-338)+(1.025)+(5.010), (I-338)+(1.025)+(5.011), (I-338)+(1.025)+(5.012), (I-338)+(1.025)+(5.013), (I-338)+(1.025)+(5.014), (I-338)+(1.025)+(5.015), (I-338)+(1.025)+(5.016), (I-338)+(1.025)+(5.017), (I-338)+(1.025)+(5.018), (I-338)+(1.025)+(5.019), (I-338)+(1.025)+(5.020), (I-338)+(1.025)+(5.021), (I-338)+(1.025)+(5.022), (I-338)+(1.025)+(5.023), (I-338)+(1.025)+(6.001), (I-338)+(1.025)+(6.002), (I-338)+(1.025)+(6.003), (I-338)+(1.025)+(6.004), (I-338)+(1.025)+(7.001), (I-338)+(1.025)+(7.002), (I-338)+(1.025)+(7.003), (I-338)+(1.025)+(7.004), (I-338)+(1.025)+(7.005), (I-338)+(1.025)+(7.006), (I-338)+(1.025)+(9.001), (I-338)+(1.025)+(9.002), (I-338)+(1.025)+(9.003), (I-338)+(1.025)+(9.004), (I-338)+(1.025)+(9.005), (I-338)+(1.025)+(9.006), (I-338)+(1.025)+(9.007), (I-338)+(1.025)+(9.008), (I-338)+(1.025)+(9.009), (I-338)+(1.025)+(14.001), (I-338)+(1.025)+(14.002), (I-338)+(1.025)+(15.008), (I-338)+(1.025)+(15.011), (I-338)+(1.025)+(15.012), (I-338)+(1.025)+(15.016), (I-338)+(1.025)+(15.025), (I-338)+(1.025)+(15.027), (I-338)+(1.025)+(15.047), (I-338)+(1.025)+(15.063), (I-338)+(1.025)+(15.064), (I-338)+(1.025)+(16.001), (I-338)+(1.025)+(16.002), (I-338)+(1.025)+(16.003), (I-338)+(1.025)+(16.004), (I-338)+(1.025)+(16.005), (I-338)+(1.025)+(16.006), (I-338)+(1.025)+(16.007), (I-338)+(1.025)+(16.008), (I-338)+(1.025)+(17.001), (I-338)+(1.025)+(17.002), (I-338)+(1.025)+(17.003), (I-338)+(1.025)+(17.004), (I-338)+(1.025)+(17.005), (I-338)+(1.025)+(17.006), (I-338)+(1.025)+(17.007), (I-338)+(1.025)+(17.008), (I-338)+(1.025)+(17.009), (I-338)+(1.025)+(17.010), (I-338)+(1.025)+(17.011), (I-338)+(1.025)+(17.012), (I-338)+(1.025)+(18.001), (I-338)+(1.026)+(1.027), (I-338)+(1.026)+(1.028), (I-338)+(1.026)+(1.029), (I-338)+(1.026)+(1.030), (I-338)+(1.026)+(1.031), (I-338)+(1.026)+(1.032), (I-338)+(1.026)+(1.033), (I-338)+(1.026)+(1.034), (I-338)+(1.026)+(1.035), (I-338)+(1.026)+(1.036), (I-338)+(1.026)+(1.037), (I-338)+(1.026)+(1.038), (I-338)+(1.026)+(1.039), (I-338)+(1.026)+(1.040), (I-338)+(1.026)+(1.041), (I-338)+(1.026)+(1.042), (I-338)+(1.026)+(1.043), (I-338)+(1.026)+(1.044), (I-338)+(1.026)+(1.045), (I-338)+(1.026)+(1.046), (I-338)+(1.026)+(1.047), (I-338)+(1.026)+(1.048), (I-338)+(1.026)+(1.049), (I-338)+(1.026)+(1.050), (I-338)+(1.026)+(1.051), (I-338)+(1.026)+(1.052), (I-338)+(1.026)+(1.053), (I-338)+(1.026)+(1.054), (I-338)+(1.026)+(1.055), (I-338)+(1.026)+(1.056), (I-338)+(1.026)+(1.057), (I-338)+(1.026)+(1.058), (I-338)+(1.026)+(1.059), (I-338)+(1.026)+(1.060), (I-338)+(1.026)+(1.061), (I-338)+(1.026)+(1.062), (I-338)+(1.026)+(1.063), (I-338)+(1.026)+(1.064), (I-338)+(1.026)+(1.065), (I-338)+(1.026)+(1.066), (I-338)+(1.026)+(1.067), (I-338)+(1.026)+(1.068), (I-338)+(1.026)+(1.069), (I-338)+(1.026)+(1.070), (I-338)+(1.026)+(1.071), (I-338)+(1.026)+(1.072), (I-338)+(1.026)+(1.073), (I-338)+(1.026)+(1.074), (I-338)+(1.026)+(1.075), (I-338)+(1.026)+(1.076), (I-338)+(1.026)+(1.077), (I-338)+(1.026)+(1.078), (I-338)+(1.026)+(1.079), (I-338)+(1.026)+(1.080), (I-338)+(1.026)+(1.081), (I-338)+(1.026)+(1.082), (I-338)+(1.026)+(1.083), (I-338)+(1.026)+(1.084), (I-338)+(1.026)+(1.085), (I-338)+(1.026)+(1.086), (I-338)+(1.026)+(1.087), (I-338)+(1.026)+(1.088), (I-338)+(1.026)+(1.089), (I-338)+(1.026)+(1.090), (I-338)+(1.026)+(1.091), (I-338)+(1.026)+(1.092), (I-338)+(1.026)+(2.001), (I-338)+(1.026)+(2.002), (I-338)+(1.026)+(2.003), (I-338)+(1.026)+(2.004), (I-338)+(1.026)+(2.005), (I-338)+(1.026)+(2.006), (I-338)+(1.026)+(2.007), (I-338)+(1.026)+(2.008), (I-338)+(1.026)+(2.009), (I-338)+(1.026)+(2.010), (I-338)+(1.026)+(2.011), (I-338)+(1.026)+(2.012), (I-338)+(1.026)+(2.013), (I-338)+(1.026)+(2.014), (I-338)+(1.026)+(2.015), (I-338)+(1.026)+(2.016), (I-338)+(1.026)+(2.017), (I-338)+(1.026)+(2.018), (I-338)+(1.026)+(2.019), (I-338)+(1.026)+(2.020), (I-338)+(1.026)+(2.021), (I-338)+(1.026)+(2.022), (I-338)+(1.026)+(2.023), (I-338)+(1.026)+(2.024), (I-338)+(1.026)+(2.025), (I-338)+(1.026)+(2.026), (I-338)+(1.026)+(2.027), (I-338)+(1.026)+(2.028), (I-338)+(1.026)+(2.029), (I-338)+(1.026)+(2.030), (I-338)+(1.026)+(2.031), (I-338)+(1.026)+(2.032), (I-338)+(1.026)+(2.033), (I-338)+(1.026)+(2.034), (I-338)+(1.026)+(2.035), (I-338)+(1.026)+(2.036), (I-338)+(1.026)+(2.037), (I-338)+(1.026)+(2.038), (I-338)+(1.026)+(2.039), (I-338)+(1.026)+(2.040), (I-338)+(1.026)+(2.041), (I-338)+(1.026)+(2.042), (I-338)+(1.026)+(2.043), (I-338)+(1.026)+(2.044), (I-338)+(1.026)+(2.045), (I-338)+(1.026)+(2.046), (I-338)+(1.026)+(2.047), (I-338)+(1.026)+(2.048), (I-338)+(1.026)+(2.049), (I-338)+(1.026)+(2.050), (I-338)+(1.026)+(2.051), (I-338)+(1.026)+(2.052), (I-338)+(1.026)+(2.053), (I-338)+(1.026)+(2.054), (I-338)+(1.026)+(2.055), (I-338)+(1.026)+(2.056), (I-338)+(1.026)+(2.057), (I-338)+(1.026)+(2.058), (I-338)+(1.026)+(2.059), (I-338)+(1.026)+(3.001), (I-338)+(1.026)+(3.002), (I-338)+(1.026)+(3.003), (I-338)+(1.026)+(3.004), (I-338)+(1.026)+(3.005), (I-338)+(1.026)+(3.006), (I-338)+(1.026)+(3.007), (I-338)+(1.026)+(3.008), (I-338)+(1.026)+(3.009), (I-338)+(1.026)+(3.010), (I-338)+(1.026)+(3.011), (I-338)+(1.026)+(3.012), (I-338)+(1.026)+(3.013), (I-338)+(1.026)+(3.014), (I-338)+(1.026)+(3.015), (I-338)+(1.026)+(3.016), (I-338)+(1.026)+(3.017), (I-338)+(1.026)+(3.018), (I-338)+(1.026)+(3.019), (I-338)+(1.026)+(3.020), (I-338)+(1.026)+(3.021), (I-338)+(1.026)+(3.022), (I-338)+(1.026)+(3.023), (I-338)+(1.026)+(3.024), (I-338)+(1.026)+(3.025), (I-338)+(1.026)+(3.026), (I-338)+(1.026)+(3.027), (I-338)+(1.026)+(3.028), (I-338)+(1.026)+(3.029), (I-338)+(1.026)+(3.030), (I-338)+(1.026)+(3.031), (I-338)+(1.026)+(5.001), (I-338)+(1.026)+(5.002), (I-338)+(1.026)+(5.003), (I-338)+(1.026)+(5.004), (I-338)+(1.026)+(5.005), (I-338)+(1.026)+(5.006), (I-338)+(1.026)+(5.007), (I-338)+(1.026)+(5.008), (I-338)+(1.026)+(5.009), (I-338)+(1.026)+(5.010), (I-338)+(1.026)+(5.011), (I-338)+(1.026)+(5.012), (I-338)+(1.026)+(5.013), (I-338)+(1.026)+(5.014), (I-338)+(1.026)+(5.015), (I-338)+(1.026)+(5.016), (I-338)+(1.026)+(5.017), (I-338)+(1.026)+(5.018), (I-338)+(1.026)+(5.019), (I-338)+(1.026)+(5.020), (I-338)+(1.026)+(5.021), (I-338)+(1.026)+(5.022), (I-338)+(1.026)+(5.023), (I-338)+(1.026)+(6.001), (I-338)+(1.026)+(6.002), (I-338)+(1.026)+(6.003), (I-338)+(1.026)+(6.004), (I-338)+(1.026)+(7.001), (I-338)+(1.026)+(7.002), (I-338)+(1.026)+(7.003), (I-338)+(1.026)+(7.004), (I-338)+(1.026)+(7.005), (I-338)+(1.026)+(7.006), (I-338)+(1.026)+(9.001), (I-338)+(1.026)+(9.002), (I-338)+(1.026)+(9.003), (I-338)+(1.026)+(9.004), (I-338)+(1.026)+(9.005), (I-338)+(1.026)+(9.006), (I-338)+(1.026)+(9.007), (I-338)+(1.026)+(9.008), (I-338)+(1.026)+(9.009), (I-338)+(1.026)+(14.001), (I-338)+(1.026)+(14.002), (I-338)+(1.026)+(15.008), (I-338)+(1.026)+(15.011), (I-338)+(1.026)+(15.012), (I-338)+(1.026)+(15.016), (I-338)+(1.026)+(15.025), (I-338)+(1.026)+(15.027), (I-338)+(1.026)+(15.047), (I-338)+(1.026)+(15.063), (I-338)+(1.026)+(15.064), (I-338)+(1.026)+(16.001), (I-338)+(1.026)+(16.002), (I-338)+(1.026)+(16.003), (I-338)+(1.026)+(16.004), (I-338)+(1.026)+(16.005), (I-338)+(1.026)+(16.006), (I-338)+(1.026)+(16.007), (I-338)+(1.026)+(16.008), (I-338)+(1.026)+(17.001), (I-338)+(1.026)+(17.002), (I-338)+(1.026)+(17.003), (I-338)+(1.026)+(17.004), (I-338)+(1.026)+(17.005), (I-338)+(1.026)+(17.006), (I-338)+(1.026)+(17.007), (I-338)+(1.026)+(17.008), (I-338)+(1.026)+(17.009), (I-338)+(1.026)+(17.010), (I-338)+(1.026)+(17.011), (I-338)+(1.026)+(17.012), (I-338)+(1.026)+(18.001), (I-338)+(1.027)+(1.028), (I-338)+(1.027)+(1.029), (I-338)+(1.027)+(1.030), (I-338)+(1.027)+(1.031), (I-338)+(1.027)+(1.032), (I-338)+(1.027)+(1.033), (I-338)+(1.027)+(1.034), (I-338)+(1.027)+(1.035), (I-338)+(1.027)+(1.036), (I-338)+(1.027)+(1.037), (I-338)+(1.027)+(1.038), (I-338)+(1.027)+(1.039), (I-338)+(1.027)+(1.040), (I-338)+(1.027)+(1.041), (I-338)+(1.027)+(1.042), (I-338)+(1.027)+(1.043), (I-338)+(1.027)+(1.044), (I-338)+(1.027)+(1.045), (I-338)+(1.027)+(1.046), (I-338)+(1.027)+(1.047), (I-338)+(1.027)+(1.048), (I-338)+(1.027)+(1.049), (I-338)+(1.027)+(1.050), (I-338)+(1.027)+(1.051), (I-338)+(1.027)+(1.052), (I-338)+(1.027)+(1.053), (I-338)+(1.027)+(1.054), (I-338)+(1.027)+(1.055), (I-338)+(1.027)+(1.056), (I-338)+(1.027)+(1.057), (I-338)+(1.027)+(1.058), (I-338)+(1.027)+(1.059), (I-338)+(1.027)+(1.060), (I-338)+(1.027)+(1.061), (I-338)+(1.027)+(1.062), (I-338)+(1.027)+(1.063), (I-338)+(1.027)+(1.064), (I-338)+(1.027)+(1.065), (I-338)+(1.027)+(1.066), (I-338)+(1.027)+(1.067), (I-338)+(1.027)+(1.068), (I-338)+(1.027)+(1.069), (I-338)+(1.027)+(1.070), (I-338)+(1.027)+(1.071), (I-338)+(1.027)+(1.072), (I-338)+(1.027)+(1.073), (I-338)+(1.027)+(1.074), (I-338)+(1.027)+(1.075), (I-338)+(1.027)+(1.076), (I-338)+(1.027)+(1.077), (I-338)+(1.027)+(1.078), (I-338)+(1.027)+(1.079), (I-338)+(1.027)+(1.080), (I-338)+(1.027)+(1.081), (I-338)+(1.027)+(1.082), (I-338)+(1.027)+(1.083), (I-338)+(1.027)+(1.084), (I-338)+(1.027)+(1.085), (I-338)+(1.027)+(1.086), (I-338)+(1.027)+(1.087), (I-338)+(1.027)+(1.088), (I-338)+(1.027)+(1.089), (I-338)+(1.027)+(1.090), (I-338)+(1.027)+(1.091), (I-338)+(1.027)+(1.092), (I-338)+(1.027)+(2.001), (I-338)+(1.027)+(2.002), (I-338)+(1.027)+(2.003), (I-338)+(1.027)+(2.004), (I-338)+(1.027)+(2.005), (I-338)+(1.027)+(2.006), (I-338)+(1.027)+(2.007), (I-338)+(1.027)+(2.008), (I-338)+(1.027)+(2.009), (I-338)+(1.027)+(2.010), (I-338)+(1.027)+(2.011), (I-338)+(1.027)+(2.012), (I-338)+(1.027)+(2.013), (I-338)+(1.027)+(2.014), (I-338)+(1.027)+(2.015), (I-338)+(1.027)+(2.016), (I-338)+(1.027)+(2.017), (I-338)+(1.027)+(2.018), (I-338)+(1.027)+(2.019), (I-338)+(1.027)+(2.020), (I-338)+(1.027)+(2.021), (I-338)+(1.027)+(2.022), (I-338)+(1.027)+(2.023), (I-338)+(1.027)+(2.024), (I-338)+(1.027)+(2.025), (I-338)+(1.027)+(2.026), (I-338)+(1.027)+(2.027), (I-338)+(1.027)+(2.028), (I-338)+(1.027)+(2.029), (I-338)+(1.027)+(2.030), (I-338)+(1.027)+(2.031), (I-338)+(1.027)+(2.032), (I-338)+(1.027)+(2.033), (I-338)+(1.027)+(2.034), (I-338)+(1.027)+(2.035), (I-338)+(1.027)+(2.036), (I-338)+(1.027)+(2.037), (I-338)+(1.027)+(2.038), (I-338)+(1.027)+(2.039), (I-338)+(1.027)+(2.040), (I-338)+(1.027)+(2.041), (I-338)+(1.027)+(2.042), (I-338)+(1.027)+(2.043), (I-338)+(1.027)+(2.044), (I-338)+(1.027)+(2.045), (I-338)+(1.027)+(2.046), (I-338)+(1.027)+(2.047), (I-338)+(1.027)+(2.048), (I-338)+(1.027)+(2.049), (I-338)+(1.027)+(2.050), (I-338)+(1.027)+(2.051), (I-338)+(1.027)+(2.052), (I-338)+(1.027)+(2.053), (I-338)+(1.027)+(2.054), (I-338)+(1.027)+(2.055), (I-338)+(1.027)+(2.056), (I-338)+(1.027)+(2.057), (I-338)+(1.027)+(2.058), (I-338)+(1.027)+(2.059), (I-338)+(1.027)+(3.001), (I-338)+(1.027)+(3.002), (I-338)+(1.027)+(3.003), (I-338)+(1.027)+(3.004), (I-338)+(1.027)+(3.005), (I-338)+(1.027)+(3.006), (I-338)+(1.027)+(3.007), (I-338)+(1.027)+(3.008), (I-338)+(1.027)+(3.009), (I-338)+(1.027)+(3.010), (I-338)+(1.027)+(3.011), (I-338)+(1.027)+(3.012), (I-338)+(1.027)+(3.013), (I-338)+(1.027)+(3.014), (I-338)+(1.027)+(3.015), (I-338)+(1.027)+(3.016), (I-338)+(1.027)+(3.017), (I-338)+(1.027)+(3.018), (I-338)+(1.027)+(3.019), (I-338)+(1.027)+(3.020), (I-338)+(1.027)+(3.021), (I-338)+(1.027)+(3.022), (I-338)+(1.027)+(3.023), (I-338)+(1.027)+(3.024), (I-338)+(1.027)+(3.025), (I-338)+(1.027)+(3.026), (I-338)+(1.027)+(3.027), (I-338)+(1.027)+(3.028), (I-338)+(1.027)+(3.029), (I-338)+(1.027)+(3.030), (I-338)+(1.027)+(3.031), (I-338)+(1.027)+(5.001), (I-338)+(1.027)+(5.002), (I-338)+(1.027)+(5.003), (I-338)+(1.027)+(5.004), (I-338)+(1.027)+(5.005), (I-338)+(1.027)+(5.006), (I-338)+(1.027)+(5.007), (I-338)+(1.027)+(5.008), (I-338)+(1.027)+(5.009), (I-338)+(1.027)+(5.010), (I-338)+(1.027)+(5.011), (I-338)+(1.027)+(5.012), (I-338)+(1.027)+(5.013), (I-338)+(1.027)+(5.014), (I-338)+(1.027)+(5.015), (I-338)+(1.027)+(5.016), (I-338)+(1.027)+(5.017), (I-338)+(1.027)+(5.018), (I-338)+(1.027)+(5.019), (I-338)+(1.027)+(5.020), (I-338)+(1.027)+(5.021), (I-338)+(1.027)+(5.022), (I-338)+(1.027)+(5.023), (I-338)+(1.027)+(6.001), (I-338)+(1.027)+(6.002), (I-338)+(1.027)+(6.003), (I-338)+(1.027)+(6.004), (I-338)+(1.027)+(7.001), (I-338)+(1.027)+(7.002), (I-338)+(1.027)+(7.003), (I-338)+(1.027)+(7.004), (I-338)+(1.027)+(7.005), (I-338)+(1.027)+(7.006), (I-338)+(1.027)+(9.001), (I-338)+(1.027)+(9.002), (I-338)+(1.027)+(9.003), (I-338)+(1.027)+(9.004), (I-338)+(1.027)+(9.005), (I-338)+(1.027)+(9.006), (I-338)+(1.027)+(9.007), (I-338)+(1.027)+(9.008), (I-338)+(1.027)+(9.009), (I-338)+(1.027)+(14.001), (I-338)+(1.027)+(14.002), (I-338)+(1.027)+(15.008), (I-338)+(1.027)+(15.011), (I-338)+(1.027)+(15.012), (I-338)+(1.027)+(15.016), (I-338)+(1.027)+(15.025), (I-338)+(1.027)+(15.027), (I-338)+(1.027)+(15.047), (I-338)+(1.027)+(15.063), (I-338)+(1.027)+(15.064), (I-338)+(1.027)+(16.001), (I-338)+(1.027)+(16.002), (I-338)+(1.027)+(16.003), (I-338)+(1.027)+(16.004), (I-338)+(1.027)+(16.005), (I-338)+(1.027)+(16.006), (I-338)+(1.027)+(16.007), (I-338)+(1.027)+(16.008), (I-338)+(1.027)+(17.001), (I-338)+(1.027)+(17.002), (I-338)+(1.027)+(17.003), (I-338)+(1.027)+(17.004), (I-338)+(1.027)+(17.005), (I-338)+(1.027)+(17.006), (I-338)+(1.027)+(17.007), (I-338)+(1.027)+(17.008), (I-338)+(1.027)+(17.009), (I-338)+(1.027)+(17.010), (I-338)+(1.027)+(17.011), (I-338)+(1.027)+(17.012), (I-338)+(1.027)+(18.001), (I-338)+(1.028)+(1.029), (I-338)+(1.028)+(1.030), (I-338)+(1.028)+(1.031), (I-338)+(1.028)+(1.032), (I-338)+(1.028)+(1.033), (I-338)+(1.028)+(1.034), (I-338)+(1.028)+(1.035), (I-338)+(1.028)+(1.036), (I-338)+(1.028)+(1.037), (I-338)+(1.028)+(1.038), (I-338)+(1.028)+(1.039), (I-338)+(1.028)+(1.040), (I-338)+(1.028)+(1.041), (I-338)+(1.028)+(1.042), (I-338)+(1.028)+(1.043), (I-338)+(1.028)+(1.044), (I-338)+(1.028)+(1.045), (I-338)+(1.028)+(1.046), (I-338)+(1.028)+(1.047), (I-338)+(1.028)+(1.048), (I-338)+(1.028)+(1.049), (I-338)+(1.028)+(1.050), (I-338)+(1.028)+(1.051), (I-338)+(1.028)+(1.052), (I-338)+(1.028)+(1.053), (I-338)+(1.028)+(1.054), (I-338)+(1.028)+(1.055), (I-338)+(1.028)+(1.056), (I-338)+(1.028)+(1.057), (I-338)+(1.028)+(1.058), (I-338)+(1.028)+(1.059), (I-338)+(1.028)+(1.060), (I-338)+(1.028)+(1.061), (I-338)+(1.028)+(1.062), (I-338)+(1.028)+(1.063), (I-338)+(1.028)+(1.064), (I-338)+(1.028)+(1.065), (I-338)+(1.028)+(1.066), (I-338)+(1.028)+(1.067), (I-338)+(1.028)+(1.068), (I-338)+(1.028)+(1.069), (I-338)+(1.028)+(1.070), (I-338)+(1.028)+(1.071), (I-338)+(1.028)+(1.072), (I-338)+(1.028)+(1.073), (I-338)+(1.028)+(1.074), (I-338)+(1.028)+(1.075), (I-338)+(1.028)+(1.076), (I-338)+(1.028)+(1.077), (I-338)+(1.028)+(1.078), (I-338)+(1.028)+(1.079), (I-338)+(1.028)+(1.080), (I-338)+(1.028)+(1.081), (I-338)+(1.028)+(1.082), (I-338)+(1.028)+(1.083), (I-338)+(1.028)+(1.084), (I-338)+(1.028)+(1.085), (I-338)+(1.028)+(1.086), (I-338)+(1.028)+(1.087), (I-338)+(1.028)+(1.088), (I-338)+(1.028)+(1.089), (I-338)+(1.028)+(1.090), (I-338)+(1.028)+(1.091), (I-338)+(1.028)+(1.092), (I-338)+(1.028)+(2.001), (I-338)+(1.028)+(2.002), (I-338)+(1.028)+(2.003), (I-338)+(1.028)+(2.004), (I-338)+(1.028)+(2.005), (I-338)+(1.028)+(2.006), (I-338)+(1.028)+(2.007), (I-338)+(1.028)+(2.008), (I-338)+(1.028)+(2.009), (I-338)+(1.028)+(2.010), (I-338)+(1.028)+(2.011), (I-338)+(1.028)+(2.012), (I-338)+(1.028)+(2.013), (I-338)+(1.028)+(2.014), (I-338)+(1.028)+(2.015), (I-338)+(1.028)+(2.016), (I-338)+(1.028)+(2.017), (I-338)+(1.028)+(2.018), (I-338)+(1.028)+(2.019), (I-338)+(1.028)+(2.020), (I-338)+(1.028)+(2.021), (I-338)+(1.028)+(2.022), (I-338)+(1.028)+(2.023), (I-338)+(1.028)+(2.024), (I-338)+(1.028)+(2.025), (I-338)+(1.028)+(2.026), (I-338)+(1.028)+(2.027), (I-338)+(1.028)+(2.028), (I-338)+(1.028)+(2.029), (I-338)+(1.028)+(2.030), (I-338)+(1.028)+(2.031), (I-338)+(1.028)+(2.032), (I-338)+(1.028)+(2.033), (I-338)+(1.028)+(2.034), (I-338)+(1.028)+(2.035), (I-338)+(1.028)+(2.036), (I-338)+(1.028)+(2.037), (I-338)+(1.028)+(2.038), (I-338)+(1.028)+(2.039), (I-338)+(1.028)+(2.040), (I-338)+(1.028)+(2.041), (I-338)+(1.028)+(2.042), (I-338)+(1.028)+(2.043), (I-338)+(1.028)+(2.044), (I-338)+(1.028)+(2.045), (I-338)+(1.028)+(2.046), (I-338)+(1.028)+(2.047), (I-338)+(1.028)+(2.048), (I-338)+(1.028)+(2.049), (I-338)+(1.028)+(2.050), (I-338)+(1.028)+(2.051), (I-338)+(1.028)+(2.052), (I-338)+(1.028)+(2.053), (I-338)+(1.028)+(2.054), (I-338)+(1.028)+(2.055), (I-338)+(1.028)+(2.056), (I-338)+(1.028)+(2.057), (I-338)+(1.028)+(2.058), (I-338)+(1.028)+(2.059), (I-338)+(1.028)+(3.001), (I-338)+(1.028)+(3.002), (I-338)+(1.028)+(3.003), (I-338)+(1.028)+(3.004), (I-338)+(1.028)+(3.005), (I-338)+(1.028)+(3.006), (I-338)+(1.028)+(3.007), (I-338)+(1.028)+(3.008), (I-338)+(1.028)+(3.009), (I-338)+(1.028)+(3.010), (I-338)+(1.028)+(3.011), (I-338)+(1.028)+(3.012), (I-338)+(1.028)+(3.013), (I-338)+(1.028)+(3.014), (I-338)+(1.028)+(3.015), (I-338)+(1.028)+(3.016), (I-338)+(1.028)+(3.017), (I-338)+(1.028)+(3.018), (I-338)+(1.028)+(3.019), (I-338)+(1.028)+(3.020), (I-338)+(1.028)+(3.021), (I-338)+(1.028)+(3.022), (I-338)+(1.028)+(3.023), (I-338)+(1.028)+(3.024), (I-338)+(1.028)+(3.025), (I-338)+(1.028)+(3.026), (I-338)+(1.028)+(3.027), (I-338)+(1.028)+(3.028), (I-338)+(1.028)+(3.029), (I-338)+(1.028)+(3.030), (I-338)+(1.028)+(3.031), (I-338)+(1.028)+(5.001), (I-338)+(1.028)+(5.002), (I-338)+(1.028)+(5.003), (I-338)+(1.028)+(5.004), (I-338)+(1.028)+(5.005), (I-338)+(1.028)+(5.006), (I-338)+(1.028)+(5.007), (I-338)+(1.028)+(5.008), (I-338)+(1.028)+(5.009), (I-338)+(1.028)+(5.010), (I-338)+(1.028)+(5.011), (I-338)+(1.028)+(5.012), (I-338)+(1.028)+(5.013), (I-338)+(1.028)+(5.014), (I-338)+(1.028)+(5.015), (I-338)+(1.028)+(5.016), (I-338)+(1.028)+(5.017), (I-338)+(1.028)+(5.018), (I-338)+(1.028)+(5.019), (I-338)+(1.028)+(5.020), (I-338)+(1.028)+(5.021), (I-338)+(1.028)+(5.022), (I-338)+(1.028)+(5.023), (I-338)+(1.028)+(6.001), (I-338)+(1.028)+(6.002), (I-338)+(1.028)+(6.003), (I-338)+(1.028)+(6.004), (I-338)+(1.028)+(7.001), (I-338)+(1.028)+(7.002), (I-338)+(1.028)+(7.003), (I-338)+(1.028)+(7.004), (I-338)+(1.028)+(7.005), (I-338)+(1.028)+(7.006), (I-338)+(1.028)+(9.001), (I-338)+(1.028)+(9.002), (I-338)+(1.028)+(9.003), (I-338)+(1.028)+(9.004), (I-338)+(1.028)+(9.005), (I-338)+(1.028)+(9.006), (I-338)+(1.028)+(9.007), (I-338)+(1.028)+(9.008), (I-338)+(1.028)+(9.009), (I-338)+(1.028)+(14.001), (I-338)+(1.028)+(14.002), (I-338)+(1.028)+(15.008), (I-338)+(1.028)+(15.011), (I-338)+(1.028)+(15.012), (I-338)+(1.028)+(15.016), (I-338)+(1.028)+(15.025), (I-338)+(1.028)+(15.027), (I-338)+(1.028)+(15.047), (I-338)+(1.028)+(15.063), (I-338)+(1.028)+(15.064), (I-338)+(1.028)+(16.001), (I-338)+(1.028)+(16.002), (I-338)+(1.028)+(16.003), (I-338)+(1.028)+(16.004), (I-338)+(1.028)+(16.005), (I-338)+(1.028)+(16.006), (I-338)+(1.028)+(16.007), (I-338)+(1.028)+(16.008), (I-338)+(1.028)+(17.001), (I-338)+(1.028)+(17.002), (I-338)+(1.028)+(17.003), (I-338)+(1.028)+(17.004), (I-338)+(1.028)+(17.005), (I-338)+(1.028)+(17.006), (I-338)+(1.028)+(17.007), (I-338)+(1.028)+(17.008), (I-338)+(1.028)+(17.009), (I-338)+(1.028)+(17.010), (I-338)+(1.028)+(17.011), (I-338)+(1.028)+(17.012), (I-338)+(1.028)+(18.001), (I-338)+(1.029)+(1.030), (I-338)+(1.029)+(1.031), (I-338)+(1.029)+(1.032), (I-338)+(1.029)+(1.033), (I-338)+(1.029)+(1.034), (I-338)+(1.029)+(1.035), (I-338)+(1.029)+(1.036), (I-338)+(1.029)+(1.037), (I-338)+(1.029)+(1.038), (I-338)+(1.029)+(1.039), (I-338)+(1.029)+(1.040), (I-338)+(1.029)+(1.041), (I-338)+(1.029)+(1.042), (I-338)+(1.029)+(1.043), (I-338)+(1.029)+(1.044), (I-338)+(1.029)+(1.045), (I-338)+(1.029)+(1.046), (I-338)+(1.029)+(1.047), (I-338)+(1.029)+(1.048), (I-338)+(1.029)+(1.049), (I-338)+(1.029)+(1.050), (I-338)+(1.029)+(1.051), (I-338)+(1.029)+(1.052), (I-338)+(1.029)+(1.053), (I-338)+(1.029)+(1.054), (I-338)+(1.029)+(1.055), (I-338)+(1.029)+(1.056), (I-338)+(1.029)+(1.057), (I-338)+(1.029)+(1.058), (I-338)+(1.029)+(1.059), (I-338)+(1.029)+(1.060), (I-338)+(1.029)+(1.061), (I-338)+(1.029)+(1.062), (I-338)+(1.029)+(1.063), (I-338)+(1.029)+(1.064), (I-338)+(1.029)+(1.065), (I-338)+(1.029)+(1.066), (I-338)+(1.029)+(1.067), (I-338)+(1.029)+(1.068), (I-338)+(1.029)+(1.069), (I-338)+(1.029)+(1.070), (I-338)+(1.029)+(1.071), (I-338)+(1.029)+(1.072), (I-338)+(1.029)+(1.073), (I-338)+(1.029)+(1.074), (I-338)+(1.029)+(1.075), (I-338)+(1.029)+(1.076), (I-338)+(1.029)+(1.077), (I-338)+(1.029)+(1.078), (I-338)+(1.029)+(1.079), (I-338)+(1.029)+(1.080), (I-338)+(1.029)+(1.081), (I-338)+(1.029)+(1.082), (I-338)+(1.029)+(1.083), (I-338)+(1.029)+(1.084), (I-338)+(1.029)+(1.085), (I-338)+(1.029)+(1.086), (I-338)+(1.029)+(1.087), (I-338)+(1.029)+(1.088), (I-338)+(1.029)+(1.089), (I-338)+(1.029)+(1.090), (I-338)+(1.029)+(1.091), (I-338)+(1.029)+(1.092), (I-338)+(1.029)+(2.001), (I-338)+(1.029)+(2.002), (I-338)+(1.029)+(2.003), (I-338)+(1.029)+(2.004), (I-338)+(1.029)+(2.005), (I-338)+(1.029)+(2.006), (I-338)+(1.029)+(2.007), (I-338)+(1.029)+(2.008), (I-338)+(1.029)+(2.009), (I-338)+(1.029)+(2.010), (I-338)+(1.029)+(2.011), (I-338)+(1.029)+(2.012), (I-338)+(1.029)+(2.013), (I-338)+(1.029)+(2.014), (I-338)+(1.029)+(2.015), (I-338)+(1.029)+(2.016), (I-338)+(1.029)+(2.017), (I-338)+(1.029)+(2.018), (I-338)+(1.029)+(2.019), (I-338)+(1.029)+(2.020), (I-338)+(1.029)+(2.021), (I-338)+(1.029)+(2.022), (I-338)+(1.029)+(2.023), (I-338)+(1.029)+(2.024), (I-338)+(1.029)+(2.025), (I-338)+(1.029)+(2.026), (I-338)+(1.029)+(2.027), (I-338)+(1.029)+(2.028), (I-338)+(1.029)+(2.029), (I-338)+(1.029)+(2.030), (I-338)+(1.029)+(2.031), (I-338)+(1.029)+(2.032), (I-338)+(1.029)+(2.033), (I-338)+(1.029)+(2.034), (I-338)+(1.029)+(2.035), (I-338)+(1.029)+(2.036), (I-338)+(1.029)+(2.037), (I-338)+(1.029)+(2.038), (I-338)+(1.029)+(2.039), (I-338)+(1.029)+(2.040), (I-338)+(1.029)+(2.041), (I-338)+(1.029)+(2.042), (I-338)+(1.029)+(2.043), (I-338)+(1.029)+(2.044), (I-338)+(1.029)+(2.045), (I-338)+(1.029)+(2.046), (I-338)+(1.029)+(2.047), (I-338)+(1.029)+(2.048), (I-338)+(1.029)+(2.049), (I-338)+(1.029)+(2.050), (I-338)+(1.029)+(2.051), (I-338)+(1.029)+(2.052), (I-338)+(1.029)+(2.053), (I-338)+(1.029)+(2.054), (I-338)+(1.029)+(2.055), (I-338)+(1.029)+(2.056), (I-338)+(1.029)+(2.057), (I-338)+(1.029)+(2.058), (I-338)+(1.029)+(2.059), (I-338)+(1.029)+(3.001), (I-338)+(1.029)+(3.002), (I-338)+(1.029)+(3.003), (I-338)+(1.029)+(3.004), (I-338)+(1.029)+(3.005), (I-338)+(1.029)+(3.006), (I-338)+(1.029)+(3.007), (I-338)+(1.029)+(3.008), (I-338)+(1.029)+(3.009), (I-338)+(1.029)+(3.010), (I-338)+(1.029)+(3.011), (I-338)+(1.029)+(3.012), (I-338)+(1.029)+(3.013), (I-338)+(1.029)+(3.014), (I-338)+(1.029)+(3.015), (I-338)+(1.029)+(3.016), (I-338)+(1.029)+(3.017), (I-338)+(1.029)+(3.018), (I-338)+(1.029)+(3.019), (I-338)+(1.029)+(3.020), (I-338)+(1.029)+(3.021), (I-338)+(1.029)+(3.022), (I-338)+(1.029)+(3.023), (I-338)+(1.029)+(3.024), (I-338)+(1.029)+(3.025), (I-338)+(1.029)+(3.026), (I-338)+(1.029)+(3.027), (I-338)+(1.029)+(3.028), (I-338)+(1.029)+(3.029), (I-338)+(1.029)+(3.030), (I-338)+(1.029)+(3.031), (I-338)+(1.029)+(5.001), (I-338)+(1.029)+(5.002), (I-338)+(1.029)+(5.003), (I-338)+(1.029)+(5.004), (I-338)+(1.029)+(5.005), (I-338)+(1.029)+(5.006), (I-338)+(1.029)+(5.007), (I-338)+(1.029)+(5.008), (I-338)+(1.029)+(5.009), (I-338)+(1.029)+(5.010), (I-338)+(1.029)+(5.011), (I-338)+(1.029)+(5.012), (I-338)+(1.029)+(5.013), (I-338)+(1.029)+(5.014), (I-338)+(1.029)+(5.015), (I-338)+(1.029)+(5.016), (I-338)+(1.029)+(5.017), (I-338)+(1.029)+(5.018), (I-338)+(1.029)+(5.019), (I-338)+(1.029)+(5.020), (I-338)+(1.029)+(5.021), (I-338)+(1.029)+(5.022), (I-338)+(1.029)+(5.023), (I-338)+(1.029)+(6.001), (I-338)+(1.029)+(6.002), (I-338)+(1.029)+(6.003), (I-338)+(1.029)+(6.004), (I-338)+(1.029)+(7.001), (I-338)+(1.029)+(7.002), (I-338)+(1.029)+(7.003), (I-338)+(1.029)+(7.004), (I-338)+(1.029)+(7.005), (I-338)+(1.029)+(7.006), (I-338)+(1.029)+(9.001), (I-338)+(1.029)+(9.002), (I-338)+(1.029)+(9.003), (I-338)+(1.029)+(9.004), (I-338)+(1.029)+(9.005), (I-338)+(1.029)+(9.006), (I-338)+(1.029)+(9.007), (I-338)+(1.029)+(9.008), (I-338)+(1.029)+(9.009), (I-338)+(1.029)+(14.001), (I-338)+(1.029)+(14.002), (I-338)+(1.029)+(15.008), (I-338)+(1.029)+(15.011), (I-338)+(1.029)+(15.012), (I-338)+(1.029)+(15.016), (I-338)+(1.029)+(15.025), (I-338)+(1.029)+(15.027), (I-338)+(1.029)+(15.047), (I-338)+(1.029)+(15.063), (I-338)+(1.029)+(15.064), (I-338)+(1.029)+(16.001), (I-338)+(1.029)+(16.002), (I-338)+(1.029)+(16.003), (I-338)+(1.029)+(16.004), (I-338)+(1.029)+(16.005), (I-338)+(1.029)+(16.006), (I-338)+(1.029)+(16.007), (I-338)+(1.029)+(16.008), (I-338)+(1.029)+(17.001), (I-338)+(1.029)+(17.002), (I-338)+(1.029)+(17.003), (I-338)+(1.029)+(17.004), (I-338)+(1.029)+(17.005), (I-338)+(1.029)+(17.006), (I-338)+(1.029)+(17.007), (I-338)+(1.029)+(17.008), (I-338)+(1.029)+(17.009), (I-338)+(1.029)+(17.010), (I-338)+(1.029)+(17.011), (I-338)+(1.029)+(17.012), (I-338)+(1.029)+(18.001), (I-338)+(1.030)+(1.031), (I-338)+(1.030)+(1.032), (I-338)+(1.030)+(1.033), (I-338)+(1.030)+(1.034), (I-338)+(1.030)+(1.035), (I-338)+(1.030)+(1.036), (I-338)+(1.030)+(1.037), (I-338)+(1.030)+(1.038), (I-338)+(1.030)+(1.039), (I-338)+(1.030)+(1.040), (I-338)+(1.030)+(1.041), (I-338)+(1.030)+(1.042), (I-338)+(1.030)+(1.043), (I-338)+(1.030)+(1.044), (I-338)+(1.030)+(1.045), (I-338)+(1.030)+(1.046), (I-338)+(1.030)+(1.047), (I-338)+(1.030)+(1.048), (I-338)+(1.030)+(1.049), (I-338)+(1.030)+(1.050), (I-338)+(1.030)+(1.051), (I-338)+(1.030)+(1.052), (I-338)+(1.030)+(1.053), (I-338)+(1.030)+(1.054), (I-338)+(1.030)+(1.055), (I-338)+(1.030)+(1.056), (I-338)+(1.030)+(1.057), (I-338)+(1.030)+(1.058), (I-338)+(1.030)+(1.059), (I-338)+(1.030)+(1.060), (I-338)+(1.030)+(1.061), (I-338)+(1.030)+(1.062), (I-338)+(1.030)+(1.063), (I-338)+(1.030)+(1.064), (I-338)+(1.030)+(1.065), (I-338)+(1.030)+(1.066), (I-338)+(1.030)+(1.067), (I-338)+(1.030)+(1.068), (I-338)+(1.030)+(1.069), (I-338)+(1.030)+(1.070), (I-338)+(1.030)+(1.071), (I-338)+(1.030)+(1.072), (I-338)+(1.030)+(1.073), (I-338)+(1.030)+(1.074), (I-338)+(1.030)+(1.075), (I-338)+(1.030)+(1.076), (I-338)+(1.030)+(1.077), (I-338)+(1.030)+(1.078), (I-338)+(1.030)+(1.079), (I-338)+(1.030)+(1.080), (I-338)+(1.030)+(1.081), (I-338)+(1.030)+(1.082), (I-338)+(1.030)+(1.083), (I-338)+(1.030)+(1.084), (I-338)+(1.030)+(1.085), (I-338)+(1.030)+(1.086), (I-338)+(1.030)+(1.087), (I-338)+(1.030)+(1.088), (I-338)+(1.030)+(1.089), (I-338)+(1.030)+(1.090), (I-338)+(1.030)+(1.091), (I-338)+(1.030)+(1.092), (I-338)+(1.030)+(2.001), (I-338)+(1.030)+(2.002), (I-338)+(1.030)+(2.003), (I-338)+(1.030)+(2.004), (I-338)+(1.030)+(2.005), (I-338)+(1.030)+(2.006), (I-338)+(1.030)+(2.007), (I-338)+(1.030)+(2.008), (I-338)+(1.030)+(2.009), (I-338)+(1.030)+(2.010), (I-338)+(1.030)+(2.011), (I-338)+(1.030)+(2.012), (I-338)+(1.030)+(2.013), (I-338)+(1.030)+(2.014), (I-338)+(1.030)+(2.015), (I-338)+(1.030)+(2.016), (I-338)+(1.030)+(2.017), (I-338)+(1.030)+(2.018), (I-338)+(1.030)+(2.019), (I-338)+(1.030)+(2.020), (I-338)+(1.030)+(2.021), (I-338)+(1.030)+(2.022), (I-338)+(1.030)+(2.023), (I-338)+(1.030)+(2.024), (I-338)+(1.030)+(2.025), (I-338)+(1.030)+(2.026), (I-338)+(1.030)+(2.027), (I-338)+(1.030)+(2.028), (I-338)+(1.030)+(2.029), (I-338)+(1.030)+(2.030), (I-338)+(1.030)+(2.031), (I-338)+(1.030)+(2.032), (I-338)+(1.030)+(2.033), (I-338)+(1.030)+(2.034), (I-338)+(1.030)+(2.035), (I-338)+(1.030)+(2.036), (I-338)+(1.030)+(2.037), (I-338)+(1.030)+(2.038), (I-338)+(1.030)+(2.039), (I-338)+(1.030)+(2.040), (I-338)+(1.030)+(2.041), (I-338)+(1.030)+(2.042), (I-338)+(1.030)+(2.043), (I-338)+(1.030)+(2.044), (I-338)+(1.030)+(2.045), (I-338)+(1.030)+(2.046), (I-338)+(1.030)+(2.047), (I-338)+(1.030)+(2.048), (I-338)+(1.030)+(2.049), (I-338)+(1.030)+(2.050), (I-338)+(1.030)+(2.051), (I-338)+(1.030)+(2.052), (I-338)+(1.030)+(2.053), (I-338)+(1.030)+(2.054), (I-338)+(1.030)+(2.055), (I-338)+(1.030)+(2.056), (I-338)+(1.030)+(2.057), (I-338)+(1.030)+(2.058), (I-338)+(1.030)+(2.059), (I-338)+(1.030)+(3.001), (I-338)+(1.030)+(3.002), (I-338)+(1.030)+(3.003), (I-338)+(1.030)+(3.004), (I-338)+(1.030)+(3.005), (I-338)+(1.030)+(3.006), (I-338)+(1.030)+(3.007), (I-338)+(1.030)+(3.008), (I-338)+(1.030)+(3.009), (I-338)+(1.030)+(3.010), (I-338)+(1.030)+(3.011), (I-338)+(1.030)+(3.012), (I-338)+(1.030)+(3.013), (I-338)+(1.030)+(3.014), (I-338)+(1.030)+(3.015), (I-338)+(1.030)+(3.016), (I-338)+(1.030)+(3.017), (I-338)+(1.030)+(3.018), (I-338)+(1.030)+(3.019), (I-338)+(1.030)+(3.020), (I-338)+(1.030)+(3.021), (I-338)+(1.030)+(3.022), (I-338)+(1.030)+(3.023), (I-338)+(1.030)+(3.024), (I-338)+(1.030)+(3.025), (I-338)+(1.030)+(3.026), (I-338)+(1.030)+(3.027), (I-338)+(1.030)+(3.028), (I-338)+(1.030)+(3.029), (I-338)+(1.030)+(3.030), (I-338)+(1.030)+(3.031), (I-338)+(1.030)+(5.001), (I-338)+(1.030)+(5.002), (I-338)+(1.030)+(5.003), (I-338)+(1.030)+(5.004), (I-338)+(1.030)+(5.005), (I-338)+(1.030)+(5.006), (I-338)+(1.030)+(5.007), (I-338)+(1.030)+(5.008), (I-338)+(1.030)+(5.009), (I-338)+(1.030)+(5.010), (I-338)+(1.030)+(5.011), (I-338)+(1.030)+(5.012), (I-338)+(1.030)+(5.013), (I-338)+(1.030)+(5.014), (I-338)+(1.030)+(5.015), (I-338)+(1.030)+(5.016), (I-338)+(1.030)+(5.017), (I-338)+(1.030)+(5.018), (I-338)+(1.030)+(5.019), (I-338)+(1.030)+(5.020), (I-338)+(1.030)+(5.021), (I-338)+(1.030)+(5.022), (I-338)+(1.030)+(5.023), (I-338)+(1.030)+(6.001), (I-338)+(1.030)+(6.002), (I-338)+(1.030)+(6.003), (I-338)+(1.030)+(6.004), (I-338)+(1.030)+(7.001), (I-338)+(1.030)+(7.002), (I-338)+(1.030)+(7.003), (I-338)+(1.030)+(7.004), (I-338)+(1.030)+(7.005), (I-338)+(1.030)+(7.006), (I-338)+(1.030)+(9.001), (I-338)+(1.030)+(9.002), (I-338)+(1.030)+(9.003), (I-338)+(1.030)+(9.004), (I-338)+(1.030)+(9.005), (I-338)+(1.030)+(9.006), (I-338)+(1.030)+(9.007), (I-338)+(1.030)+(9.008), (I-338)+(1.030)+(9.009), (I-338)+(1.030)+(14.001), (I-338)+(1.030)+(14.002), (I-338)+(1.030)+(15.008), (I-338)+(1.030)+(15.011), (I-338)+(1.030)+(15.012), (I-338)+(1.030)+(15.016), (I-338)+(1.030)+(15.025), (I-338)+(1.030)+(15.027), (I-338)+(1.030)+(15.047), (I-338)+(1.030)+(15.063), (I-338)+(1.030)+(15.064), (I-338)+(1.030)+(16.001), (I-338)+(1.030)+(16.002), (I-338)+(1.030)+(16.003), (I-338)+(1.030)+(16.004), (I-338)+(1.030)+(16.005), (I-338)+(1.030)+(16.006), (I-338)+(1.030)+(16.007), (I-338)+(1.030)+(16.008), (I-338)+(1.030)+(17.001), (I-338)+(1.030)+(17.002), (I-338)+(1.030)+(17.003), (I-338)+(1.030)+(17.004), (I-338)+(1.030)+(17.005), (I-338)+(1.030)+(17.006), (I-338)+(1.030)+(17.007), (I-338)+(1.030)+(17.008), (I-338)+(1.030)+(17.009), (I-338)+(1.030)+(17.010), (I-338)+(1.030)+(17.011), (I-338)+(1.030)+(17.012), (I-338)+(1.030)+(18.001), (I-338)+(1.031)+(1.032), (I-338)+(1.031)+(1.033), (I-338)+(1.031)+(1.034), (I-338)+(1.031)+(1.035), (I-338)+(1.031)+(1.036), (I-338)+(1.031)+(1.037), (I-338)+(1.031)+(1.038), (I-338)+(1.031)+(1.039), (I-338)+(1.031)+(1.040), (I-338)+(1.031)+(1.041), (I-338)+(1.031)+(1.042), (I-338)+(1.031)+(1.043), (I-338)+(1.031)+(1.044), (I-338)+(1.031)+(1.045), (I-338)+(1.031)+(1.046), (I-338)+(1.031)+(1.047), (I-338)+(1.031)+(1.048), (I-338)+(1.031)+(1.049), (I-338)+(1.031)+(1.050), (I-338)+(1.031)+(1.051), (I-338)+(1.031)+(1.052), (I-338)+(1.031)+(1.053), (I-338)+(1.031)+(1.054), (I-338)+(1.031)+(1.055), (I-338)+(1.031)+(1.056), (I-338)+(1.031)+(1.057), (I-338)+(1.031)+(1.058), (I-338)+(1.031)+(1.059), (I-338)+(1.031)+(1.060), (I-338)+(1.031)+(1.061), (I-338)+(1.031)+(1.062), (I-338)+(1.031)+(1.063), (I-338)+(1.031)+(1.064), (I-338)+(1.031)+(1.065), (I-338)+(1.031)+(1.066), (I-338)+(1.031)+(1.067), (I-338)+(1.031)+(1.068), (I-338)+(1.031)+(1.069), (I-338)+(1.031)+(1.070), (I-338)+(1.031)+(1.071), (I-338)+(1.031)+(1.072), (I-338)+(1.031)+(1.073), (I-338)+(1.031)+(1.074), (I-338)+(1.031)+(1.075), (I-338)+(1.031)+(1.076), (I-338)+(1.031)+(1.077), (I-338)+(1.031)+(1.078), (I-338)+(1.031)+(1.079), (I-338)+(1.031)+(1.080), (I-338)+(1.031)+(1.081), (I-338)+(1.031)+(1.082), (I-338)+(1.031)+(1.083), (I-338)+(1.031)+(1.084), (I-338)+(1.031)+(1.085), (I-338)+(1.031)+(1.086), (I-338)+(1.031)+(1.087), (I-338)+(1.031)+(1.088), (I-338)+(1.031)+(1.089), (I-338)+(1.031)+(1.090), (I-338)+(1.031)+(1.091), (I-338)+(1.031)+(1.092), (I-338)+(1.031)+(2.001), (I-338)+(1.031)+(2.002), (I-338)+(1.031)+(2.003), (I-338)+(1.031)+(2.004), (I-338)+(1.031)+(2.005), (I-338)+(1.031)+(2.006), (I-338)+(1.031)+(2.007), (I-338)+(1.031)+(2.008), (I-338)+(1.031)+(2.009), (I-338)+(1.031)+(2.010), (I-338)+(1.031)+(2.011), (I-338)+(1.031)+(2.012), (I-338)+(1.031)+(2.013), (I-338)+(1.031)+(2.014), (I-338)+(1.031)+(2.015), (I-338)+(1.031)+(2.016), (I-338)+(1.031)+(2.017), (I-338)+(1.031)+(2.018), (I-338)+(1.031)+(2.019), (I-338)+(1.031)+(2.020), (I-338)+(1.031)+(2.021), (I-338)+(1.031)+(2.022), (I-338)+(1.031)+(2.023), (I-338)+(1.031)+(2.024), (I-338)+(1.031)+(2.025), (I-338)+(1.031)+(2.026), (I-338)+(1.031)+(2.027), (I-338)+(1.031)+(2.028), (I-338)+(1.031)+(2.029), (I-338)+(1.031)+(2.030), (I-338)+(1.031)+(2.031), (I-338)+(1.031)+(2.032), (I-338)+(1.031)+(2.033), (I-338)+(1.031)+(2.034), (I-338)+(1.031)+(2.035), (I-338)+(1.031)+(2.036), (I-338)+(1.031)+(2.037), (I-338)+(1.031)+(2.038), (I-338)+(1.031)+(2.039), (I-338)+(1.031)+(2.040), (I-338)+(1.031)+(2.041), (I-338)+(1.031)+(2.042), (I-338)+(1.031)+(2.043), (I-338)+(1.031)+(2.044), (I-338)+(1.031)+(2.045), (I-338)+(1.031)+(2.046), (I-338)+(1.031)+(2.047), (I-338)+(1.031)+(2.048), (I-338)+(1.031)+(2.049), (I-338)+(1.031)+(2.050), (I-338)+(1.031)+(2.051), (I-338)+(1.031)+(2.052), (I-338)+(1.031)+(2.053), (I-338)+(1.031)+(2.054), (I-338)+(1.031)+(2.055), (I-338)+(1.031)+(2.056), (I-338)+(1.031)+(2.057), (I-338)+(1.031)+(2.058), (I-338)+(1.031)+(2.059), (I-338)+(1.031)+(3.001), (I-338)+(1.031)+(3.002), (I-338)+(1.031)+(3.003), (I-338)+(1.031)+(3.004), (I-338)+(1.031)+(3.005), (I-338)+(1.031)+(3.006), (I-338)+(1.031)+(3.007), (I-338)+(1.031)+(3.008), (I-338)+(1.031)+(3.009), (I-338)+(1.031)+(3.010), (I-338)+(1.031)+(3.011), (I-338)+(1.031)+(3.012), (I-338)+(1.031)+(3.013), (I-338)+(1.031)+(3.014), (I-338)+(1.031)+(3.015), (I-338)+(1.031)+(3.016), (I-338)+(1.031)+(3.017), (I-338)+(1.031)+(3.018), (I-338)+(1.031)+(3.019), (I-338)+(1.031)+(3.020), (I-338)+(1.031)+(3.021), (I-338)+(1.031)+(3.022), (I-338)+(1.031)+(3.023), (I-338)+(1.031)+(3.024), (I-338)+(1.031)+(3.025), (I-338)+(1.031)+(3.026), (I-338)+(1.031)+(3.027), (I-338)+(1.031)+(3.028), (I-338)+(1.031)+(3.029), (I-338)+(1.031)+(3.030), (I-338)+(1.031)+(3.031), (I-338)+(1.031)+(5.001), (I-338)+(1.031)+(5.002), (I-338)+(1.031)+(5.003), (I-338)+(1.031)+(5.004), (I-338)+(1.031)+(5.005), (I-338)+(1.031)+(5.006), (I-338)+(1.031)+(5.007), (I-338)+(1.031)+(5.008), (I-338)+(1.031)+(5.009), (I-338)+(1.031)+(5.010), (I-338)+(1.031)+(5.011), (I-338)+(1.031)+(5.012), (I-338)+(1.031)+(5.013), (I-338)+(1.031)+(5.014), (I-338)+(1.031)+(5.015), (I-338)+(1.031)+(5.016), (I-338)+(1.031)+(5.017), (I-338)+(1.031)+(5.018), (I-338)+(1.031)+(5.019), (I-338)+(1.031)+(5.020), (I-338)+(1.031)+(5.021), (I-338)+(1.031)+(5.022), (I-338)+(1.031)+(5.023), (I-338)+(1.031)+(6.001), (I-338)+(1.031)+(6.002), (I-338)+(1.031)+(6.003), (I-338)+(1.031)+(6.004), (I-338)+(1.031)+(7.001), (I-338)+(1.031)+(7.002), (I-338)+(1.031)+(7.003), (I-338)+(1.031)+(7.004), (I-338)+(1.031)+(7.005), (I-338)+(1.031)+(7.006), (I-338)+(1.031)+(9.001), (I-338)+(1.031)+(9.002), (I-338)+(1.031)+(9.003), (I-338)+(1.031)+(9.004), (I-338)+(1.031)+(9.005), (I-338)+(1.031)+(9.006), (I-338)+(1.031)+(9.007), (I-338)+(1.031)+(9.008), (I-338)+(1.031)+(9.009), (I-338)+(1.031)+(14.001), (I-338)+(1.031)+(14.002), (I-338)+(1.031)+(15.008), (I-338)+(1.031)+(15.011), (I-338)+(1.031)+(15.012), (I-338)+(1.031)+(15.016), (I-338)+(1.031)+(15.025), (I-338)+(1.031)+(15.027), (I-338)+(1.031)+(15.047), (I-338)+(1.031)+(15.063), (I-338)+(1.031)+(15.064), (I-338)+(1.031)+(16.001), (I-338)+(1.031)+(16.002), (I-338)+(1.031)+(16.003), (I-338)+(1.031)+(16.004), (I-338)+(1.031)+(16.005), (I-338)+(1.031)+(16.006), (I-338)+(1.031)+(16.007), (I-338)+(1.031)+(16.008), (I-338)+(1.031)+(17.001), (I-338)+(1.031)+(17.002), (I-338)+(1.031)+(17.003), (I-338)+(1.031)+(17.004), (I-338)+(1.031)+(17.005), (I-338)+(1.031)+(17.006), (I-338)+(1.031)+(17.007), (I-338)+(1.031)+(17.008), (I-338)+(1.031)+(17.009), (I-338)+(1.031)+(17.010), (I-338)+(1.031)+(17.011), (I-338)+(1.031)+(17.012), (I-338)+(1.031)+(18.001), (I-338)+(1.032)+(1.033), (I-338)+(1.032)+(1.034), (I-338)+(1.032)+(1.035), (I-338)+(1.032)+(1.036), (I-338)+(1.032)+(1.037), (I-338)+(1.032)+(1.038), (I-338)+(1.032)+(1.039), (I-338)+(1.032)+(1.040), (I-338)+(1.032)+(1.041), (I-338)+(1.032)+(1.042), (I-338)+(1.032)+(1.043), (I-338)+(1.032)+(1.044), (I-338)+(1.032)+(1.045), (I-338)+(1.032)+(1.046), (I-338)+(1.032)+(1.047), (I-338)+(1.032)+(1.048), (I-338)+(1.032)+(1.049), (I-338)+(1.032)+(1.050), (I-338)+(1.032)+(1.051), (I-338)+(1.032)+(1.052), (I-338)+(1.032)+(1.053), (I-338)+(1.032)+(1.054), (I-338)+(1.032)+(1.055), (I-338)+(1.032)+(1.056), (I-338)+(1.032)+(1.057), (I-338)+(1.032)+(1.058), (I-338)+(1.032)+(1.059), (I-338)+(1.032)+(1.060), (I-338)+(1.032)+(1.061), (I-338)+(1.032)+(1.062), (I-338)+(1.032)+(1.063), (I-338)+(1.032)+(1.064), (I-338)+(1.032)+(1.065), (I-338)+(1.032)+(1.066), (I-338)+(1.032)+(1.067), (I-338)+(1.032)+(1.068), (I-338)+(1.032)+(1.069), (I-338)+(1.032)+(1.070), (I-338)+(1.032)+(1.071), (I-338)+(1.032)+(1.072), (I-338)+(1.032)+(1.073), (I-338)+(1.032)+(1.074), (I-338)+(1.032)+(1.075), (I-338)+(1.032)+(1.076), (I-338)+(1.032)+(1.077), (I-338)+(1.032)+(1.078), (I-338)+(1.032)+(1.079), (I-338)+(1.032)+(1.080), (I-338)+(1.032)+(1.081), (I-338)+(1.032)+(1.082), (I-338)+(1.032)+(1.083), (I-338)+(1.032)+(1.084), (I-338)+(1.032)+(1.085), (I-338)+(1.032)+(1.086), (I-338)+(1.032)+(1.087), (I-338)+(1.032)+(1.088), (I-338)+(1.032)+(1.089), (I-338)+(1.032)+(1.090), (I-338)+(1.032)+(1.091), (I-338)+(1.032)+(1.092), (I-338)+(1.032)+(2.001), (I-338)+(1.032)+(2.002), (I-338)+(1.032)+(2.003), (I-338)+(1.032)+(2.004), (I-338)+(1.032)+(2.005), (I-338)+(1.032)+(2.006), (I-338)+(1.032)+(2.007), (I-338)+(1.032)+(2.008), (I-338)+(1.032)+(2.009), (I-338)+(1.032)+(2.010), (I-338)+(1.032)+(2.011), (I-338)+(1.032)+(2.012), (I-338)+(1.032)+(2.013), (I-338)+(1.032)+(2.014), (I-338)+(1.032)+(2.015), (I-338)+(1.032)+(2.016), (I-338)+(1.032)+(2.017), (I-338)+(1.032)+(2.018), (I-338)+(1.032)+(2.019), (I-338)+(1.032)+(2.020), (I-338)+(1.032)+(2.021), (I-338)+(1.032)+(2.022), (I-338)+(1.032)+(2.023), (I-338)+(1.032)+(2.024), (I-338)+(1.032)+(2.025), (I-338)+(1.032)+(2.026), (I-338)+(1.032)+(2.027), (I-338)+(1.032)+(2.028), (I-338)+(1.032)+(2.029), (I-338)+(1.032)+(2.030), (I-338)+(1.032)+(2.031), (I-338)+(1.032)+(2.032), (I-338)+(1.032)+(2.033), (I-338)+(1.032)+(2.034), (I-338)+(1.032)+(2.035), (I-338)+(1.032)+(2.036), (I-338)+(1.032)+(2.037), (I-338)+(1.032)+(2.038), (I-338)+(1.032)+(2.039), (I-338)+(1.032)+(2.040), (I-338)+(1.032)+(2.041), (I-338)+(1.032)+(2.042), (I-338)+(1.032)+(2.043), (I-338)+(1.032)+(2.044), (I-338)+(1.032)+(2.045), (I-338)+(1.032)+(2.046), (I-338)+(1.032)+(2.047), (I-338)+(1.032)+(2.048), (I-338)+(1.032)+(2.049), (I-338)+(1.032)+(2.050), (I-338)+(1.032)+(2.051), (I-338)+(1.032)+(2.052), (I-338)+(1.032)+(2.053), (I-338)+(1.032)+(2.054), (I-338)+(1.032)+(2.055), (I-338)+(1.032)+(2.056), (I-338)+(1.032)+(2.057), (I-338)+(1.032)+(2.058), (I-338)+(1.032)+(2.059), (I-338)+(1.032)+(3.001), (I-338)+(1.032)+(3.002), (I-338)+(1.032)+(3.003), (I-338)+(1.032)+(3.004), (I-338)+(1.032)+(3.005), (I-338)+(1.032)+(3.006), (I-338)+(1.032)+(3.007), (I-338)+(1.032)+(3.008), (I-338)+(1.032)+(3.009), (I-338)+(1.032)+(3.010), (I-338)+(1.032)+(3.011), (I-338)+(1.032)+(3.012), (I-338)+(1.032)+(3.013), (I-338)+(1.032)+(3.014), (I-338)+(1.032)+(3.015), (I-338)+(1.032)+(3.016), (I-338)+(1.032)+(3.017), (I-338)+(1.032)+(3.018), (I-338)+(1.032)+(3.019), (I-338)+(1.032)+(3.020), (I-338)+(1.032)+(3.021), (I-338)+(1.032)+(3.022), (I-338)+(1.032)+(3.023), (I-338)+(1.032)+(3.024), (I-338)+(1.032)+(3.025), (I-338)+(1.032)+(3.026), (I-338)+(1.032)+(3.027), (I-338)+(1.032)+(3.028), (I-338)+(1.032)+(3.029), (I-338)+(1.032)+(3.030), (I-338)+(1.032)+(3.031), (I-338)+(1.032)+(5.001), (I-338)+(1.032)+(5.002), (I-338)+(1.032)+(5.003), (I-338)+(1.032)+(5.004), (I-338)+(1.032)+(5.005), (I-338)+(1.032)+(5.006), (I-338)+(1.032)+(5.007), (I-338)+(1.032)+(5.008), (I-338)+(1.032)+(5.009), (I-338)+(1.032)+(5.010), (I-338)+(1.032)+(5.011), (I-338)+(1.032)+(5.012), (I-338)+(1.032)+(5.013), (I-338)+(1.032)+(5.014), (I-338)+(1.032)+(5.015), (I-338)+(1.032)+(5.016), (I-338)+(1.032)+(5.017), (I-338)+(1.032)+(5.018), (I-338)+(1.032)+(5.019), (I-338)+(1.032)+(5.020), (I-338)+(1.032)+(5.021), (I-338)+(1.032)+(5.022), (I-338)+(1.032)+(5.023), (I-338)+(1.032)+(6.001), (I-338)+(1.032)+(6.002), (I-338)+(1.032)+(6.003), (I-338)+(1.032)+(6.004), (I-338)+(1.032)+(7.001), (I-338)+(1.032)+(7.002), (I-338)+(1.032)+(7.003), (I-338)+(1.032)+(7.004), (I-338)+(1.032)+(7.005), (I-338)+(1.032)+(7.006), (I-338)+(1.032)+(9.001), (I-338)+(1.032)+(9.002), (I-338)+(1.032)+(9.003), (I-338)+(1.032)+(9.004), (I-338)+(1.032)+(9.005), (I-338)+(1.032)+(9.006), (I-338)+(1.032)+(9.007), (I-338)+(1.032)+(9.008), (I-338)+(1.032)+(9.009), (I-338)+(1.032)+(14.001), (I-338)+(1.032)+(14.002), (I-338)+(1.032)+(15.008), (I-338)+(1.032)+(15.011), (I-338)+(1.032)+(15.012), (I-338)+(1.032)+(15.016), (I-338)+(1.032)+(15.025), (I-338)+(1.032)+(15.027), (I-338)+(1.032)+(15.047), (I-338)+(1.032)+(15.063), (I-338)+(1.032)+(15.064), (I-338)+(1.032)+(16.001), (I-338)+(1.032)+(16.002), (I-338)+(1.032)+(16.003), (I-338)+(1.032)+(16.004), (I-338)+(1.032)+(16.005), (I-338)+(1.032)+(16.006), (I-338)+(1.032)+(16.007), (I-338)+(1.032)+(16.008), (I-338)+(1.032)+(17.001), (I-338)+(1.032)+(17.002), (I-338)+(1.032)+(17.003), (I-338)+(1.032)+(17.004), (I-338)+(1.032)+(17.005), (I-338)+(1.032)+(17.006), (I-338)+(1.032)+(17.007), (I-338)+(1.032)+(17.008), (I-338)+(1.032)+(17.009), (I-338)+(1.032)+(17.010), (I-338)+(1.032)+(17.011), (I-338)+(1.032)+(17.012), (I-338)+(1.032)+(18.001), (I-338)+(1.033)+(1.034), (I-338)+(1.033)+(1.035), (I-338)+(1.033)+(1.036), (I-338)+(1.033)+(1.037), (I-338)+(1.033)+(1.038), (I-338)+(1.033)+(1.039), (I-338)+(1.033)+(1.040), (I-338)+(1.033)+(1.041), (I-338)+(1.033)+(1.042), (I-338)+(1.033)+(1.043), (I-338)+(1.033)+(1.044), (I-338)+(1.033)+(1.045), (I-338)+(1.033)+(1.046), (I-338)+(1.033)+(1.047), (I-338)+(1.033)+(1.048), (I-338)+(1.033)+(1.049), (I-338)+(1.033)+(1.050), (I-338)+(1.033)+(1.051), (I-338)+(1.033)+(1.052), (I-338)+(1.033)+(1.053), (I-338)+(1.033)+(1.054), (I-338)+(1.033)+(1.055), (I-338)+(1.033)+(1.056), (I-338)+(1.033)+(1.057), (I-338)+(1.033)+(1.058), (I-338)+(1.033)+(1.059), (I-338)+(1.033)+(1.060), (I-338)+(1.033)+(1.061), (I-338)+(1.033)+(1.062), (I-338)+(1.033)+(1.063), (I-338)+(1.033)+(1.064), (I-338)+(1.033)+(1.065), (I-338)+(1.033)+(1.066), (I-338)+(1.033)+(1.067), (I-338)+(1.033)+(1.068), (I-338)+(1.033)+(1.069), (I-338)+(1.033)+(1.070), (I-338)+(1.033)+(1.071), (I-338)+(1.033)+(1.072), (I-338)+(1.033)+(1.073), (I-338)+(1.033)+(1.074), (I-338)+(1.033)+(1.075), (I-338)+(1.033)+(1.076), (I-338)+(1.033)+(1.077), (I-338)+(1.033)+(1.078), (I-338)+(1.033)+(1.079), (I-338)+(1.033)+(1.080), (I-338)+(1.033)+(1.081), (I-338)+(1.033)+(1.082), (I-338)+(1.033)+(1.083), (I-338)+(1.033)+(1.084), (I-338)+(1.033)+(1.085), (I-338)+(1.033)+(1.086), (I-338)+(1.033)+(1.087), (I-338)+(1.033)+(1.088), (I-338)+(1.033)+(1.089), (I-338)+(1.033)+(1.090), (I-338)+(1.033)+(1.091), (I-338)+(1.033)+(1.092), (I-338)+(1.033)+(2.001), (I-338)+(1.033)+(2.002), (I-338)+(1.033)+(2.003), (I-338)+(1.033)+(2.004), (I-338)+(1.033)+(2.005), (I-338)+(1.033)+(2.006), (I-338)+(1.033)+(2.007), (I-338)+(1.033)+(2.008), (I-338)+(1.033)+(2.009), (I-338)+(1.033)+(2.010), (I-338)+(1.033)+(2.011), (I-338)+(1.033)+(2.012), (I-338)+(1.033)+(2.013), (I-338)+(1.033)+(2.014), (I-338)+(1.033)+(2.015), (I-338)+(1.033)+(2.016), (I-338)+(1.033)+(2.017), (I-338)+(1.033)+(2.018), (I-338)+(1.033)+(2.019), (I-338)+(1.033)+(2.020), (I-338)+(1.033)+(2.021), (I-338)+(1.033)+(2.022), (I-338)+(1.033)+(2.023), (I-338)+(1.033)+(2.024), (I-338)+(1.033)+(2.025), (I-338)+(1.033)+(2.026), (I-338)+(1.033)+(2.027), (I-338)+(1.033)+(2.028), (I-338)+(1.033)+(2.029), (I-338)+(1.033)+(2.030), (I-338)+(1.033)+(2.031), (I-338)+(1.033)+(2.032), (I-338)+(1.033)+(2.033), (I-338)+(1.033)+(2.034), (I-338)+(1.033)+(2.035), (I-338)+(1.033)+(2.036), (I-338)+(1.033)+(2.037), (I-338)+(1.033)+(2.038), (I-338)+(1.033)+(2.039), (I-338)+(1.033)+(2.040), (I-338)+(1.033)+(2.041), (I-338)+(1.033)+(2.042), (I-338)+(1.033)+(2.043), (I-338)+(1.033)+(2.044), (I-338)+(1.033)+(2.045), (I-338)+(1.033)+(2.046), (I-338)+(1.033)+(2.047), (I-338)+(1.033)+(2.048), (I-338)+(1.033)+(2.049), (I-338)+(1.033)+(2.050), (I-338)+(1.033)+(2.051), (I-338)+(1.033)+(2.052), (I-338)+(1.033)+(2.053), (I-338)+(1.033)+(2.054), (I-338)+(1.033)+(2.055), (I-338)+(1.033)+(2.056), (I-338)+(1.033)+(2.057), (I-338)+(1.033)+(2.058), (I-338)+(1.033)+(2.059), (I-338)+(1.033)+(3.001), (I-338)+(1.033)+(3.002), (I-338)+(1.033)+(3.003), (I-338)+(1.033)+(3.004), (I-338)+(1.033)+(3.005), (I-338)+(1.033)+(3.006), (I-338)+(1.033)+(3.007), (I-338)+(1.033)+(3.008), (I-338)+(1.033)+(3.009), (I-338)+(1.033)+(3.010), (I-338)+(1.033)+(3.011), (I-338)+(1.033)+(3.012), (I-338)+(1.033)+(3.013), (I-338)+(1.033)+(3.014), (I-338)+(1.033)+(3.015), (I-338)+(1.033)+(3.016), (I-338)+(1.033)+(3.017), (I-338)+(1.033)+(3.018), (I-338)+(1.033)+(3.019), (I-338)+(1.033)+(3.020), (I-338)+(1.033)+(3.021), (I-338)+(1.033)+(3.022), (I-338)+(1.033)+(3.023), (I-338)+(1.033)+(3.024), (I-338)+(1.033)+(3.025), (I-338)+(1.033)+(3.026), (I-338)+(1.033)+(3.027), (I-338)+(1.033)+(3.028), (I-338)+(1.033)+(3.029), (I-338)+(1.033)+(3.030), (I-338)+(1.033)+(3.031), (I-338)+(1.033)+(5.001), (I-338)+(1.033)+(5.002), (I-338)+(1.033)+(5.003), (I-338)+(1.033)+(5.004), (I-338)+(1.033)+(5.005), (I-338)+(1.033)+(5.006), (I-338)+(1.033)+(5.007), (I-338)+(1.033)+(5.008), (I-338)+(1.033)+(5.009), (I-338)+(1.033)+(5.010), (I-338)+(1.033)+(5.011), (I-338)+(1.033)+(5.012), (I-338)+(1.033)+(5.013), (I-338)+(1.033)+(5.014), (I-338)+(1.033)+(5.015), (I-338)+(1.033)+(5.016), (I-338)+(1.033)+(5.017), (I-338)+(1.033)+(5.018), (I-338)+(1.033)+(5.019), (I-338)+(1.033)+(5.020), (I-338)+(1.033)+(5.021), (I-338)+(1.033)+(5.022), (I-338)+(1.033)+(5.023), (I-338)+(1.033)+(6.001), (I-338)+(1.033)+(6.002), (I-338)+(1.033)+(6.003), (I-338)+(1.033)+(6.004), (I-338)+(1.033)+(7.001), (I-338)+(1.033)+(7.002), (I-338)+(1.033)+(7.003), (I-338)+(1.033)+(7.004), (I-338)+(1.033)+(7.005), (I-338)+(1.033)+(7.006), (I-338)+(1.033)+(9.001), (I-338)+(1.033)+(9.002), (I-338)+(1.033)+(9.003), (I-338)+(1.033)+(9.004), (I-338)+(1.033)+(9.005), (I-338)+(1.033)+(9.006), (I-338)+(1.033)+(9.007), (I-338)+(1.033)+(9.008), (I-338)+(1.033)+(9.009), (I-338)+(1.033)+(14.001), (I-338)+(1.033)+(14.002), (I-338)+(1.033)+(15.008), (I-338)+(1.033)+(15.011), (I-338)+(1.033)+(15.012), (I-338)+(1.033)+(15.016), (I-338)+(1.033)+(15.025), (I-338)+(1.033)+(15.027), (I-338)+(1.033)+(15.047), (I-338)+(1.033)+(15.063), (I-338)+(1.033)+(15.064), (I-338)+(1.033)+(16.001), (I-338)+(1.033)+(16.002), (I-338)+(1.033)+(16.003), (I-338)+(1.033)+(16.004), (I-338)+(1.033)+(16.005), (I-338)+(1.033)+(16.006), (I-338)+(1.033)+(16.007), (I-338)+(1.033)+(16.008), (I-338)+(1.033)+(17.001), (I-338)+(1.033)+(17.002), (I-338)+(1.033)+(17.003), (I-338)+(1.033)+(17.004), (I-338)+(1.033)+(17.005), (I-338)+(1.033)+(17.006), (I-338)+(1.033)+(17.007), (I-338)+(1.033)+(17.008), (I-338)+(1.033)+(17.009), (I-338)+(1.033)+(17.010), (I-338)+(1.033)+(17.011), (I-338)+(1.033)+(17.012), (I-338)+(1.033)+(18.001), (I-338)+(1.034)+(1.035), (I-338)+(1.034)+(1.036), (I-338)+(1.034)+(1.037), (I-338)+(1.034)+(1.038), (I-338)+(1.034)+(1.039), (I-338)+(1.034)+(1.040), (I-338)+(1.034)+(1.041), (I-338)+(1.034)+(1.042), (I-338)+(1.034)+(1.043), (I-338)+(1.034)+(1.044), (I-338)+(1.034)+(1.045), (I-338)+(1.034)+(1.046), (I-338)+(1.034)+(1.047), (I-338)+(1.034)+(1.048), (I-338)+(1.034)+(1.049), (I-338)+(1.034)+(1.050), (I-338)+(1.034)+(1.051), (I-338)+(1.034)+(1.052), (I-338)+(1.034)+(1.053), (I-338)+(1.034)+(1.054), (I-338)+(1.034)+(1.055), (I-338)+(1.034)+(1.056), (I-338)+(1.034)+(1.057), (I-338)+(1.034)+(1.058), (I-338)+(1.034)+(1.059), (I-338)+(1.034)+(1.060), (I-338)+(1.034)+(1.061), (I-338)+(1.034)+(1.062), (I-338)+(1.034)+(1.063), (I-338)+(1.034)+(1.064), (I-338)+(1.034)+(1.065), (I-338)+(1.034)+(1.066), (I-338)+(1.034)+(1.067), (I-338)+(1.034)+(1.068), (I-338)+(1.034)+(1.069), (I-338)+(1.034)+(1.070), (I-338)+(1.034)+(1.071), (I-338)+(1.034)+(1.072), (I-338)+(1.034)+(1.073), (I-338)+(1.034)+(1.074), (I-338)+(1.034)+(1.075), (I-338)+(1.034)+(1.076), (I-338)+(1.034)+(1.077), (I-338)+(1.034)+(1.078), (I-338)+(1.034)+(1.079), (I-338)+(1.034)+(1.080), (I-338)+(1.034)+(1.081), (I-338)+(1.034)+(1.082), (I-338)+(1.034)+(1.083), (I-338)+(1.034)+(1.084), (I-338)+(1.034)+(1.085), (I-338)+(1.034)+(1.086), (I-338)+(1.034)+(1.087), (I-338)+(1.034)+(1.088), (I-338)+(1.034)+(1.089), (I-338)+(1.034)+(1.090), (I-338)+(1.034)+(1.091), (I-338)+(1.034)+(1.092), (I-338)+(1.034)+(2.001), (I-338)+(1.034)+(2.002), (I-338)+(1.034)+(2.003), (I-338)+(1.034)+(2.004), (I-338)+(1.034)+(2.005), (I-338)+(1.034)+(2.006), (I-338)+(1.034)+(2.007), (I-338)+(1.034)+(2.008), (I-338)+(1.034)+(2.009), (I-338)+(1.034)+(2.010), (I-338)+(1.034)+(2.011), (I-338)+(1.034)+(2.012), (I-338)+(1.034)+(2.013), (I-338)+(1.034)+(2.014), (I-338)+(1.034)+(2.015), (I-338)+(1.034)+(2.016), (I-338)+(1.034)+(2.017), (I-338)+(1.034)+(2.018), (I-338)+(1.034)+(2.019), (I-338)+(1.034)+(2.020), (I-338)+(1.034)+(2.021), (I-338)+(1.034)+(2.022), (I-338)+(1.034)+(2.023), (I-338)+(1.034)+(2.024), (I-338)+(1.034)+(2.025), (I-338)+(1.034)+(2.026), (I-338)+(1.034)+(2.027), (I-338)+(1.034)+(2.028), (I-338)+(1.034)+(2.029), (I-338)+(1.034)+(2.030), (I-338)+(1.034)+(2.031), (I-338)+(1.034)+(2.032), (I-338)+(1.034)+(2.033), (I-338)+(1.034)+(2.034), (I-338)+(1.034)+(2.035), (I-338)+(1.034)+(2.036), (I-338)+(1.034)+(2.037), (I-338)+(1.034)+(2.038), (I-338)+(1.034)+(2.039), (I-338)+(1.034)+(2.040), (I-338)+(1.034)+(2.041), (I-338)+(1.034)+(2.042), (I-338)+(1.034)+(2.043), (I-338)+(1.034)+(2.044), (I-338)+(1.034)+(2.045), (I-338)+(1.034)+(2.046), (I-338)+(1.034)+(2.047), (I-338)+(1.034)+(2.048), (I-338)+(1.034)+(2.049), (I-338)+(1.034)+(2.050), (I-338)+(1.034)+(2.051), (I-338)+(1.034)+(2.052), (I-338)+(1.034)+(2.053), (I-338)+(1.034)+(2.054), (I-338)+(1.034)+(2.055), (I-338)+(1.034)+(2.056), (I-338)+(1.034)+(2.057), (I-338)+(1.034)+(2.058), (I-338)+(1.034)+(2.059), (I-338)+(1.034)+(3.001), (I-338)+(1.034)+(3.002), (I-338)+(1.034)+(3.003), (I-338)+(1.034)+(3.004), (I-338)+(1.034)+(3.005), (I-338)+(1.034)+(3.006), (I-338)+(1.034)+(3.007), (I-338)+(1.034)+(3.008), (I-338)+(1.034)+(3.009), (I-338)+(1.034)+(3.010), (I-338)+(1.034)+(3.011), (I-338)+(1.034)+(3.012), (I-338)+(1.034)+(3.013), (I-338)+(1.034)+(3.014), (I-338)+(1.034)+(3.015), (I-338)+(1.034)+(3.016), (I-338)+(1.034)+(3.017), (I-338)+(1.034)+(3.018), (I-338)+(1.034)+(3.019), (I-338)+(1.034)+(3.020), (I-338)+(1.034)+(3.021), (I-338)+(1.034)+(3.022), (I-338)+(1.034)+(3.023), (I-338)+(1.034)+(3.024), (I-338)+(1.034)+(3.025), (I-338)+(1.034)+(3.026), (I-338)+(1.034)+(3.027), (I-338)+(1.034)+(3.028), (I-338)+(1.034)+(3.029), (I-338)+(1.034)+(3.030), (I-338)+(1.034)+(3.031), (I-338)+(1.034)+(5.001), (I-338)+(1.034)+(5.002), (I-338)+(1.034)+(5.003), (I-338)+(1.034)+(5.004), (I-338)+(1.034)+(5.005), (I-338)+(1.034)+(5.006), (I-338)+(1.034)+(5.007), (I-338)+(1.034)+(5.008), (I-338)+(1.034)+(5.009), (I-338)+(1.034)+(5.010), (I-338)+(1.034)+(5.011), (I-338)+(1.034)+(5.012), (I-338)+(1.034)+(5.013), (I-338)+(1.034)+(5.014), (I-338)+(1.034)+(5.015), (I-338)+(1.034)+(5.016), (I-338)+(1.034)+(5.017), (I-338)+(1.034)+(5.018), (I-338)+(1.034)+(5.019), (I-338)+(1.034)+(5.020), (I-338)+(1.034)+(5.021), (I-338)+(1.034)+(5.022), (I-338)+(1.034)+(5.023), (I-338)+(1.034)+(6.001), (I-338)+(1.034)+(6.002), (I-338)+(1.034)+(6.003), (I-338)+(1.034)+(6.004), (I-338)+(1.034)+(7.001), (I-338)+(1.034)+(7.002), (I-338)+(1.034)+(7.003), (I-338)+(1.034)+(7.004), (I-338)+(1.034)+(7.005), (I-338)+(1.034)+(7.006), (I-338)+(1.034)+(9.001), (I-338)+(1.034)+(9.002), (I-338)+(1.034)+(9.003), (I-338)+(1.034)+(9.004), (I-338)+(1.034)+(9.005), (I-338)+(1.034)+(9.006), (I-338)+(1.034)+(9.007), (I-338)+(1.034)+(9.008), (I-338)+(1.034)+(9.009), (I-338)+(1.034)+(14.001), (I-338)+(1.034)+(14.002), (I-338)+(1.034)+(15.008), (I-338)+(1.034)+(15.011), (I-338)+(1.034)+(15.012), (I-338)+(1.034)+(15.016), (I-338)+(1.034)+(15.025), (I-338)+(1.034)+(15.027), (I-338)+(1.034)+(15.047), (I-338)+(1.034)+(15.063), (I-338)+(1.034)+(15.064), (I-338)+(1.034)+(16.001), (I-338)+(1.034)+(16.002), (I-338)+(1.034)+(16.003), (I-338)+(1.034)+(16.004), (I-338)+(1.034)+(16.005), (I-338)+(1.034)+(16.006), (I-338)+(1.034)+(16.007), (I-338)+(1.034)+(16.008), (I-338)+(1.034)+(17.001), (I-338)+(1.034)+(17.002), (I-338)+(1.034)+(17.003), (I-338)+(1.034)+(17.004), (I-338)+(1.034)+(17.005), (I-338)+(1.034)+(17.006), (I-338)+(1.034)+(17.007), (I-338)+(1.034)+(17.008), (I-338)+(1.034)+(17.009), (I-338)+(1.034)+(17.010), (I-338)+(1.034)+(17.011), (I-338)+(1.034)+(17.012), (I-338)+(1.034)+(18.001), (I-338)+(1.035)+(1.036), (I-338)+(1.035)+(1.037), (I-338)+(1.035)+(1.038), (I-338)+(1.035)+(1.039), (I-338)+(1.035)+(1.040), (I-338)+(1.035)+(1.041), (I-338)+(1.035)+(1.042), (I-338)+(1.035)+(1.043), (I-338)+(1.035)+(1.044), (I-338)+(1.035)+(1.045), (I-338)+(1.035)+(1.046), (I-338)+(1.035)+(1.047), (I-338)+(1.035)+(1.048), (I-338)+(1.035)+(1.049), (I-338)+(1.035)+(1.050), (I-338)+(1.035)+(1.051), (I-338)+(1.035)+(1.052), (I-338)+(1.035)+(1.053), (I-338)+(1.035)+(1.054), (I-338)+(1.035)+(1.055), (I-338)+(1.035)+(1.056), (I-338)+(1.035)+(1.057), (I-338)+(1.035)+(1.058), (I-338)+(1.035)+(1.059), (I-338)+(1.035)+(1.060), (I-338)+(1.035)+(1.061), (I-338)+(1.035)+(1.062), (I-338)+(1.035)+(1.063), (I-338)+(1.035)+(1.064), (I-338)+(1.035)+(1.065), (I-338)+(1.035)+(1.066), (I-338)+(1.035)+(1.067), (I-338)+(1.035)+(1.068), (I-338)+(1.035)+(1.069), (I-338)+(1.035)+(1.070), (I-338)+(1.035)+(1.071), (I-338)+(1.035)+(1.072), (I-338)+(1.035)+(1.073), (I-338)+(1.035)+(1.074), (I-338)+(1.035)+(1.075), (I-338)+(1.035)+(1.076), (I-338)+(1.035)+(1.077), (I-338)+(1.035)+(1.078), (I-338)+(1.035)+(1.079), (I-338)+(1.035)+(1.080), (I-338)+(1.035)+(1.081), (I-338)+(1.035)+(1.082), (I-338)+(1.035)+(1.083), (I-338)+(1.035)+(1.084), (I-338)+(1.035)+(1.085), (I-338)+(1.035)+(1.086), (I-338)+(1.035)+(1.087), (I-338)+(1.035)+(1.088), (I-338)+(1.035)+(1.089), (I-338)+(1.035)+(1.090), (I-338)+(1.035)+(1.091), (I-338)+(1.035)+(1.092), (I-338)+(1.035)+(2.001), (I-338)+(1.035)+(2.002), (I-338)+(1.035)+(2.003), (I-338)+(1.035)+(2.004), (I-338)+(1.035)+(2.005), (I-338)+(1.035)+(2.006), (I-338)+(1.035)+(2.007), (I-338)+(1.035)+(2.008), (I-338)+(1.035)+(2.009), (I-338)+(1.035)+(2.010), (I-338)+(1.035)+(2.011), (I-338)+(1.035)+(2.012), (I-338)+(1.035)+(2.013), (I-338)+(1.035)+(2.014), (I-338)+(1.035)+(2.015), (I-338)+(1.035)+(2.016), (I-338)+(1.035)+(2.017), (I-338)+(1.035)+(2.018), (I-338)+(1.035)+(2.019), (I-338)+(1.035)+(2.020), (I-338)+(1.035)+(2.021), (I-338)+(1.035)+(2.022), (I-338)+(1.035)+(2.023), (I-338)+(1.035)+(2.024), (I-338)+(1.035)+(2.025), (I-338)+(1.035)+(2.026), (I-338)+(1.035)+(2.027), (I-338)+(1.035)+(2.028), (I-338)+(1.035)+(2.029), (I-338)+(1.035)+(2.030), (I-338)+(1.035)+(2.031), (I-338)+(1.035)+(2.032), (I-338)+(1.035)+(2.033), (I-338)+(1.035)+(2.034), (I-338)+(1.035)+(2.035), (I-338)+(1.035)+(2.036), (I-338)+(1.035)+(2.037), (I-338)+(1.035)+(2.038), (I-338)+(1.035)+(2.039), (I-338)+(1.035)+(2.040), (I-338)+(1.035)+(2.041), (I-338)+(1.035)+(2.042), (I-338)+(1.035)+(2.043), (I-338)+(1.035)+(2.044), (I-338)+(1.035)+(2.045), (I-338)+(1.035)+(2.046), (I-338)+(1.035)+(2.047), (I-338)+(1.035)+(2.048), (I-338)+(1.035)+(2.049), (I-338)+(1.035)+(2.050), (I-338)+(1.035)+(2.051), (I-338)+(1.035)+(2.052), (I-338)+(1.035)+(2.053), (I-338)+(1.035)+(2.054), (I-338)+(1.035)+(2.055), (I-338)+(1.035)+(2.056), (I-338)+(1.035)+(2.057), (I-338)+(1.035)+(2.058), (I-338)+(1.035)+(2.059), (I-338)+(1.035)+(3.001), (I-338)+(1.035)+(3.002), (I-338)+(1.035)+(3.003), (I-338)+(1.035)+(3.004), (I-338)+(1.035)+(3.005), (I-338)+(1.035)+(3.006), (I-338)+(1.035)+(3.007), (I-338)+(1.035)+(3.008), (I-338)+(1.035)+(3.009), (I-338)+(1.035)+(3.010), (I-338)+(1.035)+(3.011), (I-338)+(1.035)+(3.012), (I-338)+(1.035)+(3.013), (I-338)+(1.035)+(3.014), (I-338)+(1.035)+(3.015), (I-338)+(1.035)+(3.016), (I-338)+(1.035)+(3.017), (I-338)+(1.035)+(3.018), (I-338)+(1.035)+(3.019), (I-338)+(1.035)+(3.020), (I-338)+(1.035)+(3.021), (I-338)+(1.035)+(3.022), (I-338)+(1.035)+(3.023), (I-338)+(1.035)+(3.024), (I-338)+(1.035)+(3.025), (I-338)+(1.035)+(3.026), (I-338)+(1.035)+(3.027), (I-338)+(1.035)+(3.028), (I-338)+(1.035)+(3.029), (I-338)+(1.035)+(3.030), (I-338)+(1.035)+(3.031), (I-338)+(1.035)+(5.001), (I-338)+(1.035)+(5.002), (I-338)+(1.035)+(5.003), (I-338)+(1.035)+(5.004), (I-338)+(1.035)+(5.005), (I-338)+(1.035)+(5.006), (I-338)+(1.035)+(5.007), (I-338)+(1.035)+(5.008), (I-338)+(1.035)+(5.009), (I-338)+(1.035)+(5.010), (I-338)+(1.035)+(5.011), (I-338)+(1.035)+(5.012), (I-338)+(1.035)+(5.013), (I-338)+(1.035)+(5.014), (I-338)+(1.035)+(5.015), (I-338)+(1.035)+(5.016), (I-338)+(1.035)+(5.017), (I-338)+(1.035)+(5.018), (I-338)+(1.035)+(5.019), (I-338)+(1.035)+(5.020), (I-338)+(1.035)+(5.021), (I-338)+(1.035)+(5.022), (I-338)+(1.035)+(5.023), (I-338)+(1.035)+(6.001), (I-338)+(1.035)+(6.002), (I-338)+(1.035)+(6.003), (I-338)+(1.035)+(6.004), (I-338)+(1.035)+(7.001), (I-338)+(1.035)+(7.002), (I-338)+(1.035)+(7.003), (I-338)+(1.035)+(7.004), (I-338)+(1.035)+(7.005), (I-338)+(1.035)+(7.006), (I-338)+(1.035)+(9.001), (I-338)+(1.035)+(9.002), (I-338)+(1.035)+(9.003), (I-338)+(1.035)+(9.004), (I-338)+(1.035)+(9.005), (I-338)+(1.035)+(9.006), (I-338)+(1.035)+(9.007), (I-338)+(1.035)+(9.008), (I-338)+(1.035)+(9.009), (I-338)+(1.035)+(14.001), (I-338)+(1.035)+(14.002), (I-338)+(1.035)+(15.008), (I-338)+(1.035)+(15.011), (I-338)+(1.035)+(15.012), (I-338)+(1.035)+(15.016), (I-338)+(1.035)+(15.025), (I-338)+(1.035)+(15.027), (I-338)+(1.035)+(15.047), (I-338)+(1.035)+(15.063), (I-338)+(1.035)+(15.064), (I-338)+(1.035)+(16.001), (I-338)+(1.035)+(16.002), (I-338)+(1.035)+(16.003), (I-338)+(1.035)+(16.004), (I-338)+(1.035)+(16.005), (I-338)+(1.035)+(16.006), (I-338)+(1.035)+(16.007), (I-338)+(1.035)+(16.008), (I-338)+(1.035)+(17.001), (I-338)+(1.035)+(17.002), (I-338)+(1.035)+(17.003), (I-338)+(1.035)+(17.004), (I-338)+(1.035)+(17.005), (I-338)+(1.035)+(17.006), (I-338)+(1.035)+(17.007), (I-338)+(1.035)+(17.008), (I-338)+(1.035)+(17.009), (I-338)+(1.035)+(17.010), (I-338)+(1.035)+(17.011), (I-338)+(1.035)+(17.012), (I-338)+(1.035)+(18.001), (I-338)+(1.036)+(1.037), (I-338)+(1.036)+(1.038), (I-338)+(1.036)+(1.039), (I-338)+(1.036)+(1.040), (I-338)+(1.036)+(1.041), (I-338)+(1.036)+(1.042), (I-338)+(1.036)+(1.043), (I-338)+(1.036)+(1.044), (I-338)+(1.036)+(1.045), (I-338)+(1.036)+(1.046), (I-338)+(1.036)+(1.047), (I-338)+(1.036)+(1.048), (I-338)+(1.036)+(1.049), (I-338)+(1.036)+(1.050), (I-338)+(1.036)+(1.051), (I-338)+(1.036)+(1.052), (I-338)+(1.036)+(1.053), (I-338)+(1.036)+(1.054), (I-338)+(1.036)+(1.055), (I-338)+(1.036)+(1.056), (I-338)+(1.036)+(1.057), (I-338)+(1.036)+(1.058), (I-338)+(1.036)+(1.059), (I-338)+(1.036)+(1.060), (I-338)+(1.036)+(1.061), (I-338)+(1.036)+(1.062), (I-338)+(1.036)+(1.063), (I-338)+(1.036)+(1.064), (I-338)+(1.036)+(1.065), (I-338)+(1.036)+(1.066), (I-338)+(1.036)+(1.067), (I-338)+(1.036)+(1.068), (I-338)+(1.036)+(1.069), (I-338)+(1.036)+(1.070), (I-338)+(1.036)+(1.071), (I-338)+(1.036)+(1.072), (I-338)+(1.036)+(1.073), (I-338)+(1.036)+(1.074), (I-338)+(1.036)+(1.075), (I-338)+(1.036)+(1.076), (I-338)+(1.036)+(1.077), (I-338)+(1.036)+(1.078), (I-338)+(1.036)+(1.079), (I-338)+(1.036)+(1.080), (I-338)+(1.036)+(1.081), (I-338)+(1.036)+(1.082), (I-338)+(1.036)+(1.083), (I-338)+(1.036)+(1.084), (I-338)+(1.036)+(1.085), (I-338)+(1.036)+(1.086), (I-338)+(1.036)+(1.087), (I-338)+(1.036)+(1.088), (I-338)+(1.036)+(1.089), (I-338)+(1.036)+(1.090), (I-338)+(1.036)+(1.091), (I-338)+(1.036)+(1.092), (I-338)+(1.036)+(2.001), (I-338)+(1.036)+(2.002), (I-338)+(1.036)+(2.003), (I-338)+(1.036)+(2.004), (I-338)+(1.036)+(2.005), (I-338)+(1.036)+(2.006), (I-338)+(1.036)+(2.007), (I-338)+(1.036)+(2.008), (I-338)+(1.036)+(2.009), (I-338)+(1.036)+(2.010), (I-338)+(1.036)+(2.011), (I-338)+(1.036)+(2.012), (I-338)+(1.036)+(2.013), (I-338)+(1.036)+(2.014), (I-338)+(1.036)+(2.015), (I-338)+(1.036)+(2.016), (I-338)+(1.036)+(2.017), (I-338)+(1.036)+(2.018), (I-338)+(1.036)+(2.019), (I-338)+(1.036)+(2.020), (I-338)+(1.036)+(2.021), (I-338)+(1.036)+(2.022), (I-338)+(1.036)+(2.023), (I-338)+(1.036)+(2.024), (I-338)+(1.036)+(2.025), (I-338)+(1.036)+(2.026), (I-338)+(1.036)+(2.027), (I-338)+(1.036)+(2.028), (I-338)+(1.036)+(2.029), (I-338)+(1.036)+(2.030), (I-338)+(1.036)+(2.031), (I-338)+(1.036)+(2.032), (I-338)+(1.036)+(2.033), (I-338)+(1.036)+(2.034), (I-338)+(1.036)+(2.035), (I-338)+(1.036)+(2.036), (I-338)+(1.036)+(2.037), (I-338)+(1.036)+(2.038), (I-338)+(1.036)+(2.039), (I-338)+(1.036)+(2.040), (I-338)+(1.036)+(2.041), (I-338)+(1.036)+(2.042), (I-338)+(1.036)+(2.043), (I-338)+(1.036)+(2.044), (I-338)+(1.036)+(2.045), (I-338)+(1.036)+(2.046), (I-338)+(1.036)+(2.047), (I-338)+(1.036)+(2.048), (I-338)+(1.036)+(2.049), (I-338)+(1.036)+(2.050), (I-338)+(1.036)+(2.051), (I-338)+(1.036)+(2.052), (I-338)+(1.036)+(2.053), (I-338)+(1.036)+(2.054), (I-338)+(1.036)+(2.055), (I-338)+(1.036)+(2.056), (I-338)+(1.036)+(2.057), (I-338)+(1.036)+(2.058), (I-338)+(1.036)+(2.059), (I-338)+(1.036)+(3.001), (I-338)+(1.036)+(3.002), (I-338)+(1.036)+(3.003), (I-338)+(1.036)+(3.004), (I-338)+(1.036)+(3.005), (I-338)+(1.036)+(3.006), (I-338)+(1.036)+(3.007), (I-338)+(1.036)+(3.008), (I-338)+(1.036)+(3.009), (I-338)+(1.036)+(3.010), (I-338)+(1.036)+(3.011), (I-338)+(1.036)+(3.012), (I-338)+(1.036)+(3.013), (I-338)+(1.036)+(3.014), (I-338)+(1.036)+(3.015), (I-338)+(1.036)+(3.016), (I-338)+(1.036)+(3.017), (I-338)+(1.036)+(3.018), (I-338)+(1.036)+(3.019), (I-338)+(1.036)+(3.020), (I-338)+(1.036)+(3.021), (I-338)+(1.036)+(3.022), (I-338)+(1.036)+(3.023), (I-338)+(1.036)+(3.024), (I-338)+(1.036)+(3.025), (I-338)+(1.036)+(3.026), (I-338)+(1.036)+(3.027), (I-338)+(1.036)+(3.028), (I-338)+(1.036)+(3.029), (I-338)+(1.036)+(3.030), (I-338)+(1.036)+(3.031), (I-338)+(1.036)+(5.001), (I-338)+(1.036)+(5.002), (I-338)+(1.036)+(5.003), (I-338)+(1.036)+(5.004), (I-338)+(1.036)+(5.005), (I-338)+(1.036)+(5.006), (I-338)+(1.036)+(5.007), (I-338)+(1.036)+(5.008), (I-338)+(1.036)+(5.009), (I-338)+(1.036)+(5.010), (I-338)+(1.036)+(5.011), (I-338)+(1.036)+(5.012), (I-338)+(1.036)+(5.013), (I-338)+(1.036)+(5.014), (I-338)+(1.036)+(5.015), (I-338)+(1.036)+(5.016), (I-338)+(1.036)+(5.017), (I-338)+(1.036)+(5.018), (I-338)+(1.036)+(5.019), (I-338)+(1.036)+(5.020), (I-338)+(1.036)+(5.021), (I-338)+(1.036)+(5.022), (I-338)+(1.036)+(5.023), (I-338)+(1.036)+(6.001), (I-338)+(1.036)+(6.002), (I-338)+(1.036)+(6.003), (I-338)+(1.036)+(6.004), (I-338)+(1.036)+(7.001), (I-338)+(1.036)+(7.002), (I-338)+(1.036)+(7.003), (I-338)+(1.036)+(7.004), (I-338)+(1.036)+(7.005), (I-338)+(1.036)+(7.006), (I-338)+(1.036)+(9.001), (I-338)+(1.036)+(9.002), (I-338)+(1.036)+(9.003), (I-338)+(1.036)+(9.004), (I-338)+(1.036)+(9.005), (I-338)+(1.036)+(9.006), (I-338)+(1.036)+(9.007), (I-338)+(1.036)+(9.008), (I-338)+(1.036)+(9.009), (I-338)+(1.036)+(14.001), (I-338)+(1.036)+(14.002), (I-338)+(1.036)+(15.008), (I-338)+(1.036)+(15.011), (I-338)+(1.036)+(15.012), (I-338)+(1.036)+(15.016), (I-338)+(1.036)+(15.025), (I-338)+(1.036)+(15.027), (I-338)+(1.036)+(15.047), (I-338)+(1.036)+(15.063), (I-338)+(1.036)+(15.064), (I-338)+(1.036)+(16.001), (I-338)+(1.036)+(16.002), (I-338)+(1.036)+(16.003), (I-338)+(1.036)+(16.004), (I-338)+(1.036)+(16.005), (I-338)+(1.036)+(16.006), (I-338)+(1.036)+(16.007), (I-338)+(1.036)+(16.008), (I-338)+(1.036)+(17.001), (I-338)+(1.036)+(17.002), (I-338)+(1.036)+(17.003), (I-338)+(1.036)+(17.004), (I-338)+(1.036)+(17.005), (I-338)+(1.036)+(17.006), (I-338)+(1.036)+(17.007), (I-338)+(1.036)+(17.008), (I-338)+(1.036)+(17.009), (I-338)+(1.036)+(17.010), (I-338)+(1.036)+(17.011), (I-338)+(1.036)+(17.012), (I-338)+(1.036)+(18.001), (I-338)+(1.037)+(1.038), (I-338)+(1.037)+(1.039), (I-338)+(1.037)+(1.040), (I-338)+(1.037)+(1.041), (I-338)+(1.037)+(1.042), (I-338)+(1.037)+(1.043), (I-338)+(1.037)+(1.044), (I-338)+(1.037)+(1.045), (I-338)+(1.037)+(1.046), (I-338)+(1.037)+(1.047), (I-338)+(1.037)+(1.048), (I-338)+(1.037)+(1.049), (I-338)+(1.037)+(1.050), (I-338)+(1.037)+(1.051), (I-338)+(1.037)+(1.052), (I-338)+(1.037)+(1.053), (I-338)+(1.037)+(1.054), (I-338)+(1.037)+(1.055), (I-338)+(1.037)+(1.056), (I-338)+(1.037)+(1.057), (I-338)+(1.037)+(1.058), (I-338)+(1.037)+(1.059), (I-338)+(1.037)+(1.060), (I-338)+(1.037)+(1.061), (I-338)+(1.037)+(1.062), (I-338)+(1.037)+(1.063), (I-338)+(1.037)+(1.064), (I-338)+(1.037)+(1.065), (I-338)+(1.037)+(1.066), (I-338)+(1.037)+(1.067), (I-338)+(1.037)+(1.068), (I-338)+(1.037)+(1.069), (I-338)+(1.037)+(1.070), (I-338)+(1.037)+(1.071), (I-338)+(1.037)+(1.072), (I-338)+(1.037)+(1.073), (I-338)+(1.037)+(1.074), (I-338)+(1.037)+(1.075), (I-338)+(1.037)+(1.076), (I-338)+(1.037)+(1.077), (I-338)+(1.037)+(1.078), (I-338)+(1.037)+(1.079), (I-338)+(1.037)+(1.080), (I-338)+(1.037)+(1.081), (I-338)+(1.037)+(1.082), (I-338)+(1.037)+(1.083), (I-338)+(1.037)+(1.084), (I-338)+(1.037)+(1.085), (I-338)+(1.037)+(1.086), (I-338)+(1.037)+(1.087), (I-338)+(1.037)+(1.088), (I-338)+(1.037)+(1.089), (I-338)+(1.037)+(1.090), (I-338)+(1.037)+(1.091), (I-338)+(1.037)+(1.092), (I-338)+(1.037)+(2.001), (I-338)+(1.037)+(2.002), (I-338)+(1.037)+(2.003), (I-338)+(1.037)+(2.004), (I-338)+(1.037)+(2.005), (I-338)+(1.037)+(2.006), (I-338)+(1.037)+(2.007), (I-338)+(1.037)+(2.008), (I-338)+(1.037)+(2.009), (I-338)+(1.037)+(2.010), (I-338)+(1.037)+(2.011), (I-338)+(1.037)+(2.012), (I-338)+(1.037)+(2.013), (I-338)+(1.037)+(2.014), (I-338)+(1.037)+(2.015), (I-338)+(1.037)+(2.016), (I-338)+(1.037)+(2.017), (I-338)+(1.037)+(2.018), (I-338)+(1.037)+(2.019), (I-338)+(1.037)+(2.020), (I-338)+(1.037)+(2.021), (I-338)+(1.037)+(2.022), (I-338)+(1.037)+(2.023), (I-338)+(1.037)+(2.024), (I-338)+(1.037)+(2.025), (I-338)+(1.037)+(2.026), (I-338)+(1.037)+(2.027), (I-338)+(1.037)+(2.028), (I-338)+(1.037)+(2.029), (I-338)+(1.037)+(2.030), (I-338)+(1.037)+(2.031), (I-338)+(1.037)+(2.032), (I-338)+(1.037)+(2.033), (I-338)+(1.037)+(2.034), (I-338)+(1.037)+(2.035), (I-338)+(1.037)+(2.036), (I-338)+(1.037)+(2.037), (I-338)+(1.037)+(2.038), (I-338)+(1.037)+(2.039), (I-338)+(1.037)+(2.040), (I-338)+(1.037)+(2.041), (I-338)+(1.037)+(2.042), (I-338)+(1.037)+(2.043), (I-338)+(1.037)+(2.044), (I-338)+(1.037)+(2.045), (I-338)+(1.037)+(2.046), (I-338)+(1.037)+(2.047), (I-338)+(1.037)+(2.048), (I-338)+(1.037)+(2.049), (I-338)+(1.037)+(2.050), (I-338)+(1.037)+(2.051), (I-338)+(1.037)+(2.052), (I-338)+(1.037)+(2.053), (I-338)+(1.037)+(2.054), (I-338)+(1.037)+(2.055), (I-338)+(1.037)+(2.056), (I-338)+(1.037)+(2.057), (I-338)+(1.037)+(2.058), (I-338)+(1.037)+(2.059), (I-338)+(1.037)+(3.001), (I-338)+(1.037)+(3.002), (I-338)+(1.037)+(3.003), (I-338)+(1.037)+(3.004), (I-338)+(1.037)+(3.005), (I-338)+(1.037)+(3.006), (I-338)+(1.037)+(3.007), (I-338)+(1.037)+(3.008), (I-338)+(1.037)+(3.009), (I-338)+(1.037)+(3.010), (I-338)+(1.037)+(3.011), (I-338)+(1.037)+(3.012), (I-338)+(1.037)+(3.013), (I-338)+(1.037)+(3.014), (I-338)+(1.037)+(3.015), (I-338)+(1.037)+(3.016), (I-338)+(1.037)+(3.017), (I-338)+(1.037)+(3.018), (I-338)+(1.037)+(3.019), (I-338)+(1.037)+(3.020), (I-338)+(1.037)+(3.021), (I-338)+(1.037)+(3.022), (I-338)+(1.037)+(3.023), (I-338)+(1.037)+(3.024), (I-338)+(1.037)+(3.025), (I-338)+(1.037)+(3.026), (I-338)+(1.037)+(3.027), (I-338)+(1.037)+(3.028), (I-338)+(1.037)+(3.029), (I-338)+(1.037)+(3.030), (I-338)+(1.037)+(3.031), (I-338)+(1.037)+(5.001), (I-338)+(1.037)+(5.002), (I-338)+(1.037)+(5.003), (I-338)+(1.037)+(5.004), (I-338)+(1.037)+(5.005), (I-338)+(1.037)+(5.006), (I-338)+(1.037)+(5.007), (I-338)+(1.037)+(5.008), (I-338)+(1.037)+(5.009), (I-338)+(1.037)+(5.010), (I-338)+(1.037)+(5.011), (I-338)+(1.037)+(5.012), (I-338)+(1.037)+(5.013), (I-338)+(1.037)+(5.014), (I-338)+(1.037)+(5.015), (I-338)+(1.037)+(5.016), (I-338)+(1.037)+(5.017), (I-338)+(1.037)+(5.018), (I-338)+(1.037)+(5.019), (I-338)+(1.037)+(5.020), (I-338)+(1.037)+(5.021), (I-338)+(1.037)+(5.022), (I-338)+(1.037)+(5.023), (I-338)+(1.037)+(6.001), (I-338)+(1.037)+(6.002), (I-338)+(1.037)+(6.003), (I-338)+(1.037)+(6.004), (I-338)+(1.037)+(7.001), (I-338)+(1.037)+(7.002), (I-338)+(1.037)+(7.003), (I-338)+(1.037)+(7.004), (I-338)+(1.037)+(7.005), (I-338)+(1.037)+(7.006), (I-338)+(1.037)+(9.001), (I-338)+(1.037)+(9.002), (I-338)+(1.037)+(9.003), (I-338)+(1.037)+(9.004), (I-338)+(1.037)+(9.005), (I-338)+(1.037)+(9.006), (I-338)+(1.037)+(9.007), (I-338)+(1.037)+(9.008), (I-338)+(1.037)+(9.009), (I-338)+(1.037)+(14.001), (I-338)+(1.037)+(14.002), (I-338)+(1.037)+(15.008), (I-338)+(1.037)+(15.011), (I-338)+(1.037)+(15.012), (I-338)+(1.037)+(15.016), (I-338)+(1.037)+(15.025), (I-338)+(1.037)+(15.027), (I-338)+(1.037)+(15.047), (I-338)+(1.037)+(15.063), (I-338)+(1.037)+(15.064), (I-338)+(1.037)+(16.001), (I-338)+(1.037)+(16.002), (I-338)+(1.037)+(16.003), (I-338)+(1.037)+(16.004), (I-338)+(1.037)+(16.005), (I-338)+(1.037)+(16.006), (I-338)+(1.037)+(16.007), (I-338)+(1.037)+(16.008), (I-338)+(1.037)+(17.001), (I-338)+(1.037)+(17.002), (I-338)+(1.037)+(17.003), (I-338)+(1.037)+(17.004), (I-338)+(1.037)+(17.005), (I-338)+(1.037)+(17.006), (I-338)+(1.037)+(17.007), (I-338)+(1.037)+(17.008), (I-338)+(1.037)+(17.009), (I-338)+(1.037)+(17.010), (I-338)+(1.037)+(17.011), (I-338)+(1.037)+(17.012), (I-338)+(1.037)+(18.001), (I-338)+(1.038)+(1.039), (I-338)+(1.038)+(1.040), (I-338)+(1.038)+(1.041), (I-338)+(1.038)+(1.042), (I-338)+(1.038)+(1.043), (I-338)+(1.038)+(1.044), (I-338)+(1.038)+(1.045), (I-338)+(1.038)+(1.046), (I-338)+(1.038)+(1.047), (I-338)+(1.038)+(1.048), (I-338)+(1.038)+(1.049), (I-338)+(1.038)+(1.050), (I-338)+(1.038)+(1.051), (I-338)+(1.038)+(1.052), (I-338)+(1.038)+(1.053), (I-338)+(1.038)+(1.054), (I-338)+(1.038)+(1.055), (I-338)+(1.038)+(1.056), (I-338)+(1.038)+(1.057), (I-338)+(1.038)+(1.058), (I-338)+(1.038)+(1.059), (I-338)+(1.038)+(1.060), (I-338)+(1.038)+(1.061), (I-338)+(1.038)+(1.062), (I-338)+(1.038)+(1.063), (I-338)+(1.038)+(1.064), (I-338)+(1.038)+(1.065), (I-338)+(1.038)+(1.066), (I-338)+(1.038)+(1.067), (I-338)+(1.038)+(1.068), (I-338)+(1.038)+(1.069), (I-338)+(1.038)+(1.070), (I-338)+(1.038)+(1.071), (I-338)+(1.038)+(1.072), (I-338)+(1.038)+(1.073), (I-338)+(1.038)+(1.074), (I-338)+(1.038)+(1.075), (I-338)+(1.038)+(1.076), (I-338)+(1.038)+(1.077), (I-338)+(1.038)+(1.078), (I-338)+(1.038)+(1.079), (I-338)+(1.038)+(1.080), (I-338)+(1.038)+(1.081), (I-338)+(1.038)+(1.082), (I-338)+(1.038)+(1.083), (I-338)+(1.038)+(1.084), (I-338)+(1.038)+(1.085), (I-338)+(1.038)+(1.086), (I-338)+(1.038)+(1.087), (I-338)+(1.038)+(1.088), (I-338)+(1.038)+(1.089), (I-338)+(1.038)+(1.090), (I-338)+(1.038)+(1.091), (I-338)+(1.038)+(1.092), (I-338)+(1.038)+(2.001), (I-338)+(1.038)+(2.002), (I-338)+(1.038)+(2.003), (I-338)+(1.038)+(2.004), (I-338)+(1.038)+(2.005), (I-338)+(1.038)+(2.006), (I-338)+(1.038)+(2.007), (I-338)+(1.038)+(2.008), (I-338)+(1.038)+(2.009), (I-338)+(1.038)+(2.010), (I-338)+(1.038)+(2.011), (I-338)+(1.038)+(2.012), (I-338)+(1.038)+(2.013), (I-338)+(1.038)+(2.014), (I-338)+(1.038)+(2.015), (I-338)+(1.038)+(2.016), (I-338)+(1.038)+(2.017), (I-338)+(1.038)+(2.018), (I-338)+(1.038)+(2.019), (I-338)+(1.038)+(2.020), (I-338)+(1.038)+(2.021), (I-338)+(1.038)+(2.022), (I-338)+(1.038)+(2.023), (I-338)+(1.038)+(2.024), (I-338)+(1.038)+(2.025), (I-338)+(1.038)+(2.026), (I-338)+(1.038)+(2.027), (I-338)+(1.038)+(2.028), (I-338)+(1.038)+(2.029), (I-338)+(1.038)+(2.030), (I-338)+(1.038)+(2.031), (I-338)+(1.038)+(2.032), (I-338)+(1.038)+(2.033), (I-338)+(1.038)+(2.034), (I-338)+(1.038)+(2.035), (I-338)+(1.038)+(2.036), (I-338)+(1.038)+(2.037), (I-338)+(1.038)+(2.038), (I-338)+(1.038)+(2.039), (I-338)+(1.038)+(2.040), (I-338)+(1.038)+(2.041), (I-338)+(1.038)+(2.042), (I-338)+(1.038)+(2.043), (I-338)+(1.038)+(2.044), (I-338)+(1.038)+(2.045), (I-338)+(1.038)+(2.046), (I-338)+(1.038)+(2.047), (I-338)+(1.038)+(2.048), (I-338)+(1.038)+(2.049), (I-338)+(1.038)+(2.050), (I-338)+(1.038)+(2.051), (I-338)+(1.038)+(2.052), (I-338)+(1.038)+(2.053), (I-338)+(1.038)+(2.054), (I-338)+(1.038)+(2.055), (I-338)+(1.038)+(2.056), (I-338)+(1.038)+(2.057), (I-338)+(1.038)+(2.058), (I-338)+(1.038)+(2.059), (I-338)+(1.038)+(3.001), (I-338)+(1.038)+(3.002), (I-338)+(1.038)+(3.003), (I-338)+(1.038)+(3.004), (I-338)+(1.038)+(3.005), (I-338)+(1.038)+(3.006), (I-338)+(1.038)+(3.007), (I-338)+(1.038)+(3.008), (I-338)+(1.038)+(3.009), (I-338)+(1.038)+(3.010), (I-338)+(1.038)+(3.011), (I-338)+(1.038)+(3.012), (I-338)+(1.038)+(3.013), (I-338)+(1.038)+(3.014), (I-338)+(1.038)+(3.015), (I-338)+(1.038)+(3.016), (I-338)+(1.038)+(3.017), (I-338)+(1.038)+(3.018), (I-338)+(1.038)+(3.019), (I-338)+(1.038)+(3.020), (I-338)+(1.038)+(3.021), (I-338)+(1.038)+(3.022), (I-338)+(1.038)+(3.023), (I-338)+(1.038)+(3.024), (I-338)+(1.038)+(3.025), (I-338)+(1.038)+(3.026), (I-338)+(1.038)+(3.027), (I-338)+(1.038)+(3.028), (I-338)+(1.038)+(3.029), (I-338)+(1.038)+(3.030), (I-338)+(1.038)+(3.031), (I-338)+(1.038)+(5.001), (I-338)+(1.038)+(5.002), (I-338)+(1.038)+(5.003), (I-338)+(1.038)+(5.004), (I-338)+(1.038)+(5.005), (I-338)+(1.038)+(5.006), (I-338)+(1.038)+(5.007), (I-338)+(1.038)+(5.008), (I-338)+(1.038)+(5.009), (I-338)+(1.038)+(5.010), (I-338)+(1.038)+(5.011), (I-338)+(1.038)+(5.012), (I-338)+(1.038)+(5.013), (I-338)+(1.038)+(5.014), (I-338)+(1.038)+(5.015), (I-338)+(1.038)+(5.016), (I-338)+(1.038)+(5.017), (I-338)+(1.038)+(5.018), (I-338)+(1.038)+(5.019), (I-338)+(1.038)+(5.020), (I-338)+(1.038)+(5.021), (I-338)+(1.038)+(5.022), (I-338)+(1.038)+(5.023), (I-338)+(1.038)+(6.001), (I-338)+(1.038)+(6.002), (I-338)+(1.038)+(6.003), (I-338)+(1.038)+(6.004), (I-338)+(1.038)+(7.001), (I-338)+(1.038)+(7.002), (I-338)+(1.038)+(7.003), (I-338)+(1.038)+(7.004), (I-338)+(1.038)+(7.005), (I-338)+(1.038)+(7.006), (I-338)+(1.038)+(9.001), (I-338)+(1.038)+(9.002), (I-338)+(1.038)+(9.003), (I-338)+(1.038)+(9.004), (I-338)+(1.038)+(9.005), (I-338)+(1.038)+(9.006), (I-338)+(1.038)+(9.007), (I-338)+(1.038)+(9.008), (I-338)+(1.038)+(9.009), (I-338)+(1.038)+(14.001), (I-338)+(1.038)+(14.002), (I-338)+(1.038)+(15.008), (I-338)+(1.038)+(15.011), (I-338)+(1.038)+(15.012), (I-338)+(1.038)+(15.016), (I-338)+(1.038)+(15.025), (I-338)+(1.038)+(15.027), (I-338)+(1.038)+(15.047), (I-338)+(1.038)+(15.063), (I-338)+(1.038)+(15.064), (I-338)+(1.038)+(16.001), (I-338)+(1.038)+(16.002), (I-338)+(1.038)+(16.003), (I-338)+(1.038)+(16.004), (I-338)+(1.038)+(16.005), (I-338)+(1.038)+(16.006), (I-338)+(1.038)+(16.007), (I-338)+(1.038)+(16.008), (I-338)+(1.038)+(17.001), (I-338)+(1.038)+(17.002), (I-338)+(1.038)+(17.003), (I-338)+(1.038)+(17.004), (I-338)+(1.038)+(17.005), (I-338)+(1.038)+(17.006), (I-338)+(1.038)+(17.007), (I-338)+(1.038)+(17.008), (I-338)+(1.038)+(17.009), (I-338)+(1.038)+(17.010), (I-338)+(1.038)+(17.011), (I-338)+(1.038)+(17.012), (I-338)+(1.038)+(18.001), (I-338)+(1.039)+(1.040), (I-338)+(1.039)+(1.041), (I-338)+(1.039)+(1.042), (I-338)+(1.039)+(1.043), (I-338)+(1.039)+(1.044), (I-338)+(1.039)+(1.045), (I-338)+(1.039)+(1.046), (I-338)+(1.039)+(1.047), (I-338)+(1.039)+(1.048), (I-338)+(1.039)+(1.049), (I-338)+(1.039)+(1.050), (I-338)+(1.039)+(1.051), (I-338)+(1.039)+(1.052), (I-338)+(1.039)+(1.053), (I-338)+(1.039)+(1.054), (I-338)+(1.039)+(1.055), (I-338)+(1.039)+(1.056), (I-338)+(1.039)+(1.057), (I-338)+(1.039)+(1.058), (I-338)+(1.039)+(1.059), (I-338)+(1.039)+(1.060), (I-338)+(1.039)+(1.061), (I-338)+(1.039)+(1.062), (I-338)+(1.039)+(1.063), (I-338)+(1.039)+(1.064), (I-338)+(1.039)+(1.065), (I-338)+(1.039)+(1.066), (I-338)+(1.039)+(1.067), (I-338)+(1.039)+(1.068), (I-338)+(1.039)+(1.069), (I-338)+(1.039)+(1.070), (I-338)+(1.039)+(1.071), (I-338)+(1.039)+(1.072), (I-338)+(1.039)+(1.073), (I-338)+(1.039)+(1.074), (I-338)+(1.039)+(1.075), (I-338)+(1.039)+(1.076), (I-338)+(1.039)+(1.077), (I-338)+(1.039)+(1.078), (I-338)+(1.039)+(1.079), (I-338)+(1.039)+(1.080), (I-338)+(1.039)+(1.081), (I-338)+(1.039)+(1.082), (I-338)+(1.039)+(1.083), (I-338)+(1.039)+(1.084), (I-338)+(1.039)+(1.085), (I-338)+(1.039)+(1.086), (I-338)+(1.039)+(1.087), (I-338)+(1.039)+(1.088), (I-338)+(1.039)+(1.089), (I-338)+(1.039)+(1.090), (I-338)+(1.039)+(1.091), (I-338)+(1.039)+(1.092), (I-338)+(1.039)+(2.001), (I-338)+(1.039)+(2.002), (I-338)+(1.039)+(2.003), (I-338)+(1.039)+(2.004), (I-338)+(1.039)+(2.005), (I-338)+(1.039)+(2.006), (I-338)+(1.039)+(2.007), (I-338)+(1.039)+(2.008), (I-338)+(1.039)+(2.009), (I-338)+(1.039)+(2.010), (I-338)+(1.039)+(2.011), (I-338)+(1.039)+(2.012), (I-338)+(1.039)+(2.013), (I-338)+(1.039)+(2.014), (I-338)+(1.039)+(2.015), (I-338)+(1.039)+(2.016), (I-338)+(1.039)+(2.017), (I-338)+(1.039)+(2.018), (I-338)+(1.039)+(2.019), (I-338)+(1.039)+(2.020), (I-338)+(1.039)+(2.021), (I-338)+(1.039)+(2.022), (I-338)+(1.039)+(2.023), (I-338)+(1.039)+(2.024), (I-338)+(1.039)+(2.025), (I-338)+(1.039)+(2.026), (I-338)+(1.039)+(2.027), (I-338)+(1.039)+(2.028), (I-338)+(1.039)+(2.029), (I-338)+(1.039)+(2.030), (I-338)+(1.039)+(2.031), (I-338)+(1.039)+(2.032), (I-338)+(1.039)+(2.033), (I-338)+(1.039)+(2.034), (I-338)+(1.039)+(2.035), (I-338)+(1.039)+(2.036), (I-338)+(1.039)+(2.037), (I-338)+(1.039)+(2.038), (I-338)+(1.039)+(2.039), (I-338)+(1.039)+(2.040), (I-338)+(1.039)+(2.041), (I-338)+(1.039)+(2.042), (I-338)+(1.039)+(2.043), (I-338)+(1.039)+(2.044), (I-338)+(1.039)+(2.045), (I-338)+(1.039)+(2.046), (I-338)+(1.039)+(2.047), (I-338)+(1.039)+(2.048), (I-338)+(1.039)+(2.049), (I-338)+(1.039)+(2.050), (I-338)+(1.039)+(2.051), (I-338)+(1.039)+(2.052), (I-338)+(1.039)+(2.053), (I-338)+(1.039)+(2.054), (I-338)+(1.039)+(2.055), (I-338)+(1.039)+(2.056), (I-338)+(1.039)+(2.057), (I-338)+(1.039)+(2.058), (I-338)+(1.039)+(2.059), (I-338)+(1.039)+(3.001), (I-338)+(1.039)+(3.002), (I-338)+(1.039)+(3.003), (I-338)+(1.039)+(3.004), (I-338)+(1.039)+(3.005), (I-338)+(1.039)+(3.006), (I-338)+(1.039)+(3.007), (I-338)+(1.039)+(3.008), (I-338)+(1.039)+(3.009), (I-338)+(1.039)+(3.010), (I-338)+(1.039)+(3.011), (I-338)+(1.039)+(3.012), (I-338)+(1.039)+(3.013), (I-338)+(1.039)+(3.014), (I-338)+(1.039)+(3.015), (I-338)+(1.039)+(3.016), (I-338)+(1.039)+(3.017), (I-338)+(1.039)+(3.018), (I-338)+(1.039)+(3.019), (I-338)+(1.039)+(3.020), (I-338)+(1.039)+(3.021), (I-338)+(1.039)+(3.022), (I-338)+(1.039)+(3.023), (I-338)+(1.039)+(3.024), (I-338)+(1.039)+(3.025), (I-338)+(1.039)+(3.026), (I-338)+(1.039)+(3.027), (I-338)+(1.039)+(3.028), (I-338)+(1.039)+(3.029), (I-338)+(1.039)+(3.030), (I-338)+(1.039)+(3.031), (I-338)+(1.039)+(5.001), (I-338)+(1.039)+(5.002), (I-338)+(1.039)+(5.003), (I-338)+(1.039)+(5.004), (I-338)+(1.039)+(5.005), (I-338)+(1.039)+(5.006), (I-338)+(1.039)+(5.007), (I-338)+(1.039)+(5.008), (I-338)+(1.039)+(5.009), (I-338)+(1.039)+(5.010), (I-338)+(1.039)+(5.011), (I-338)+(1.039)+(5.012), (I-338)+(1.039)+(5.013), (I-338)+(1.039)+(5.014), (I-338)+(1.039)+(5.015), (I-338)+(1.039)+(5.016), (I-338)+(1.039)+(5.017), (I-338)+(1.039)+(5.018), (I-338)+(1.039)+(5.019), (I-338)+(1.039)+(5.020), (I-338)+(1.039)+(5.021), (I-338)+(1.039)+(5.022), (I-338)+(1.039)+(5.023), (I-338)+(1.039)+(6.001), (I-338)+(1.039)+(6.002), (I-338)+(1.039)+(6.003), (I-338)+(1.039)+(6.004), (I-338)+(1.039)+(7.001), (I-338)+(1.039)+(7.002), (I-338)+(1.039)+(7.003), (I-338)+(1.039)+(7.004), (I-338)+(1.039)+(7.005), (I-338)+(1.039)+(7.006), (I-338)+(1.039)+(9.001), (I-338)+(1.039)+(9.002), (I-338)+(1.039)+(9.003), (I-338)+(1.039)+(9.004), (I-338)+(1.039)+(9.005), (I-338)+(1.039)+(9.006), (I-338)+(1.039)+(9.007), (I-338)+(1.039)+(9.008), (I-338)+(1.039)+(9.009), (I-338)+(1.039)+(14.001), (I-338)+(1.039)+(14.002), (I-338)+(1.039)+(15.008), (I-338)+(1.039)+(15.011), (I-338)+(1.039)+(15.012), (I-338)+(1.039)+(15.016), (I-338)+(1.039)+(15.025), (I-338)+(1.039)+(15.027), (I-338)+(1.039)+(15.047), (I-338)+(1.039)+(15.063), (I-338)+(1.039)+(15.064), (I-338)+(1.039)+(16.001), (I-338)+(1.039)+(16.002), (I-338)+(1.039)+(16.003), (I-338)+(1.039)+(16.004), (I-338)+(1.039)+(16.005), (I-338)+(1.039)+(16.006), (I-338)+(1.039)+(16.007), (I-338)+(1.039)+(16.008), (I-338)+(1.039)+(17.001), (I-338)+(1.039)+(17.002), (I-338)+(1.039)+(17.003), (I-338)+(1.039)+(17.004), (I-338)+(1.039)+(17.005), (I-338)+(1.039)+(17.006), (I-338)+(1.039)+(17.007), (I-338)+(1.039)+(17.008), (I-338)+(1.039)+(17.009), (I-338)+(1.039)+(17.010), (I-338)+(1.039)+(17.011), (I-338)+(1.039)+(17.012), (I-338)+(1.039)+(18.001), (I-338)+(1.040)+(1.041), (I-338)+(1.040)+(1.042), (I-338)+(1.040)+(1.043), (I-338)+(1.040)+(1.044), (I-338)+(1.040)+(1.045), (I-338)+(1.040)+(1.046), (I-338)+(1.040)+(1.047), (I-338)+(1.040)+(1.048), (I-338)+(1.040)+(1.049), (I-338)+(1.040)+(1.050), (I-338)+(1.040)+(1.051), (I-338)+(1.040)+(1.052), (I-338)+(1.040)+(1.053), (I-338)+(1.040)+(1.054), (I-338)+(1.040)+(1.055), (I-338)+(1.040)+(1.056), (I-338)+(1.040)+(1.057), (I-338)+(1.040)+(1.058), (I-338)+(1.040)+(1.059), (I-338)+(1.040)+(1.060), (I-338)+(1.040)+(1.061), (I-338)+(1.040)+(1.062), (I-338)+(1.040)+(1.063), (I-338)+(1.040)+(1.064), (I-338)+(1.040)+(1.065), (I-338)+(1.040)+(1.066), (I-338)+(1.040)+(1.067), (I-338)+(1.040)+(1.068), (I-338)+(1.040)+(1.069), (I-338)+(1.040)+(1.070), (I-338)+(1.040)+(1.071), (I-338)+(1.040)+(1.072), (I-338)+(1.040)+(1.073), (I-338)+(1.040)+(1.074), (I-338)+(1.040)+(1.075), (I-338)+(1.040)+(1.076), (I-338)+(1.040)+(1.077), (I-338)+(1.040)+(1.078), (I-338)+(1.040)+(1.079), (I-338)+(1.040)+(1.080), (I-338)+(1.040)+(1.081), (I-338)+(1.040)+(1.082), (I-338)+(1.040)+(1.083), (I-338)+(1.040)+(1.084), (I-338)+(1.040)+(1.085), (I-338)+(1.040)+(1.086), (I-338)+(1.040)+(1.087), (I-338)+(1.040)+(1.088), (I-338)+(1.040)+(1.089), (I-338)+(1.040)+(1.090), (I-338)+(1.040)+(1.091), (I-338)+(1.040)+(1.092), (I-338)+(1.040)+(2.001), (I-338)+(1.040)+(2.002), (I-338)+(1.040)+(2.003), (I-338)+(1.040)+(2.004), (I-338)+(1.040)+(2.005), (I-338)+(1.040)+(2.006), (I-338)+(1.040)+(2.007), (I-338)+(1.040)+(2.008), (I-338)+(1.040)+(2.009), (I-338)+(1.040)+(2.010), (I-338)+(1.040)+(2.011), (I-338)+(1.040)+(2.012), (I-338)+(1.040)+(2.013), (I-338)+(1.040)+(2.014), (I-338)+(1.040)+(2.015), (I-338)+(1.040)+(2.016), (I-338)+(1.040)+(2.017), (I-338)+(1.040)+(2.018), (I-338)+(1.040)+(2.019), (I-338)+(1.040)+(2.020), (I-338)+(1.040)+(2.021), (I-338)+(1.040)+(2.022), (I-338)+(1.040)+(2.023), (I-338)+(1.040)+(2.024), (I-338)+(1.040)+(2.025), (I-338)+(1.040)+(2.026), (I-338)+(1.040)+(2.027), (I-338)+(1.040)+(2.028), (I-338)+(1.040)+(2.029), (I-338)+(1.040)+(2.030), (I-338)+(1.040)+(2.031), (I-338)+(1.040)+(2.032), (I-338)+(1.040)+(2.033), (I-338)+(1.040)+(2.034), (I-338)+(1.040)+(2.035), (I-338)+(1.040)+(2.036), (I-338)+(1.040)+(2.037), (I-338)+(1.040)+(2.038), (I-338)+(1.040)+(2.039), (I-338)+(1.040)+(2.040), (I-338)+(1.040)+(2.041), (I-338)+(1.040)+(2.042), (I-338)+(1.040)+(2.043), (I-338)+(1.040)+(2.044), (I-338)+(1.040)+(2.045), (I-338)+(1.040)+(2.046), (I-338)+(1.040)+(2.047), (I-338)+(1.040)+(2.048), (I-338)+(1.040)+(2.049), (I-338)+(1.040)+(2.050), (I-338)+(1.040)+(2.051), (I-338)+(1.040)+(2.052), (I-338)+(1.040)+(2.053), (I-338)+(1.040)+(2.054), (I-338)+(1.040)+(2.055), (I-338)+(1.040)+(2.056), (I-338)+(1.040)+(2.057), (I-338)+(1.040)+(2.058), (I-338)+(1.040)+(2.059), (I-338)+(1.040)+(3.001), (I-338)+(1.040)+(3.002), (I-338)+(1.040)+(3.003), (I-338)+(1.040)+(3.004), (I-338)+(1.040)+(3.005), (I-338)+(1.040)+(3.006), (I-338)+(1.040)+(3.007), (I-338)+(1.040)+(3.008), (I-338)+(1.040)+(3.009), (I-338)+(1.040)+(3.010), (I-338)+(1.040)+(3.011), (I-338)+(1.040)+(3.012), (I-338)+(1.040)+(3.013), (I-338)+(1.040)+(3.014), (I-338)+(1.040)+(3.015), (I-338)+(1.040)+(3.016), (I-338)+(1.040)+(3.017), (I-338)+(1.040)+(3.018), (I-338)+(1.040)+(3.019), (I-338)+(1.040)+(3.020), (I-338)+(1.040)+(3.021), (I-338)+(1.040)+(3.022), (I-338)+(1.040)+(3.023), (I-338)+(1.040)+(3.024), (I-338)+(1.040)+(3.025), (I-338)+(1.040)+(3.026), (I-338)+(1.040)+(3.027), (I-338)+(1.040)+(3.028), (I-338)+(1.040)+(3.029), (I-338)+(1.040)+(3.030), (I-338)+(1.040)+(3.031), (I-338)+(1.040)+(5.001), (I-338)+(1.040)+(5.002), (I-338)+(1.040)+(5.003), (I-338)+(1.040)+(5.004), (I-338)+(1.040)+(5.005), (I-338)+(1.040)+(5.006), (I-338)+(1.040)+(5.007), (I-338)+(1.040)+(5.008), (I-338)+(1.040)+(5.009), (I-338)+(1.040)+(5.010), (I-338)+(1.040)+(5.011), (I-338)+(1.040)+(5.012), (I-338)+(1.040)+(5.013), (I-338)+(1.040)+(5.014), (I-338)+(1.040)+(5.015), (I-338)+(1.040)+(5.016), (I-338)+(1.040)+(5.017), (I-338)+(1.040)+(5.018), (I-338)+(1.040)+(5.019), (I-338)+(1.040)+(5.020), (I-338)+(1.040)+(5.021), (I-338)+(1.040)+(5.022), (I-338)+(1.040)+(5.023), (I-338)+(1.040)+(6.001), (I-338)+(1.040)+(6.002), (I-338)+(1.040)+(6.003), (I-338)+(1.040)+(6.004), (I-338)+(1.040)+(7.001), (I-338)+(1.040)+(7.002), (I-338)+(1.040)+(7.003), (I-338)+(1.040)+(7.004), (I-338)+(1.040)+(7.005), (I-338)+(1.040)+(7.006), (I-338)+(1.040)+(9.001), (I-338)+(1.040)+(9.002), (I-338)+(1.040)+(9.003), (I-338)+(1.040)+(9.004), (I-338)+(1.040)+(9.005), (I-338)+(1.040)+(9.006), (I-338)+(1.040)+(9.007), (I-338)+(1.040)+(9.008), (I-338)+(1.040)+(9.009), (I-338)+(1.040)+(14.001), (I-338)+(1.040)+(14.002), (I-338)+(1.040)+(15.008), (I-338)+(1.040)+(15.011), (I-338)+(1.040)+(15.012), (I-338)+(1.040)+(15.016), (I-338)+(1.040)+(15.025), (I-338)+(1.040)+(15.027), (I-338)+(1.040)+(15.047), (I-338)+(1.040)+(15.063), (I-338)+(1.040)+(15.064), (I-338)+(1.040)+(16.001), (I-338)+(1.040)+(16.002), (I-338)+(1.040)+(16.003), (I-338)+(1.040)+(16.004), (I-338)+(1.040)+(16.005), (I-338)+(1.040)+(16.006), (I-338)+(1.040)+(16.007), (I-338)+(1.040)+(16.008), (I-338)+(1.040)+(17.001), (I-338)+(1.040)+(17.002), (I-338)+(1.040)+(17.003), (I-338)+(1.040)+(17.004), (I-338)+(1.040)+(17.005), (I-338)+(1.040)+(17.006), (I-338)+(1.040)+(17.007), (I-338)+(1.040)+(17.008), (I-338)+(1.040)+(17.009), (I-338)+(1.040)+(17.010), (I-338)+(1.040)+(17.011), (I-338)+(1.040)+(17.012), (I-338)+(1.040)+(18.001), (I-338)+(1.041)+(1.042), (I-338)+(1.041)+(1.043), (I-338)+(1.041)+(1.044), (I-338)+(1.041)+(1.045), (I-338)+(1.041)+(1.046), (I-338)+(1.041)+(1.047), (I-338)+(1.041)+(1.048), (I-338)+(1.041)+(1.049), (I-338)+(1.041)+(1.050), (I-338)+(1.041)+(1.051), (I-338)+(1.041)+(1.052), (I-338)+(1.041)+(1.053), (I-338)+(1.041)+(1.054), (I-338)+(1.041)+(1.055), (I-338)+(1.041)+(1.056), (I-338)+(1.041)+(1.057), (I-338)+(1.041)+(1.058), (I-338)+(1.041)+(1.059), (I-338)+(1.041)+(1.060), (I-338)+(1.041)+(1.061), (I-338)+(1.041)+(1.062), (I-338)+(1.041)+(1.063), (I-338)+(1.041)+(1.064), (I-338)+(1.041)+(1.065), (I-338)+(1.041)+(1.066), (I-338)+(1.041)+(1.067), (I-338)+(1.041)+(1.068), (I-338)+(1.041)+(1.069), (I-338)+(1.041)+(1.070), (I-338)+(1.041)+(1.071), (I-338)+(1.041)+(1.072), (I-338)+(1.041)+(1.073), (I-338)+(1.041)+(1.074), (I-338)+(1.041)+(1.075), (I-338)+(1.041)+(1.076), (I-338)+(1.041)+(1.077), (I-338)+(1.041)+(1.078), (I-338)+(1.041)+(1.079), (I-338)+(1.041)+(1.080), (I-338)+(1.041)+(1.081), (I-338)+(1.041)+(1.082), (I-338)+(1.041)+(1.083), (I-338)+(1.041)+(1.084), (I-338)+(1.041)+(1.085), (I-338)+(1.041)+(1.086), (I-338)+(1.041)+(1.087), (I-338)+(1.041)+(1.088), (I-338)+(1.041)+(1.089), (I-338)+(1.041)+(1.090), (I-338)+(1.041)+(1.091), (I-338)+(1.041)+(1.092), (I-338)+(1.041)+(2.001), (I-338)+(1.041)+(2.002), (I-338)+(1.041)+(2.003), (I-338)+(1.041)+(2.004), (I-338)+(1.041)+(2.005), (I-338)+(1.041)+(2.006), (I-338)+(1.041)+(2.007), (I-338)+(1.041)+(2.008), (I-338)+(1.041)+(2.009), (I-338)+(1.041)+(2.010), (I-338)+(1.041)+(2.011), (I-338)+(1.041)+(2.012), (I-338)+(1.041)+(2.013), (I-338)+(1.041)+(2.014), (I-338)+(1.041)+(2.015), (I-338)+(1.041)+(2.016), (I-338)+(1.041)+(2.017), (I-338)+(1.041)+(2.018), (I-338)+(1.041)+(2.019), (I-338)+(1.041)+(2.020), (I-338)+(1.041)+(2.021), (I-338)+(1.041)+(2.022), (I-338)+(1.041)+(2.023), (I-338)+(1.041)+(2.024), (I-338)+(1.041)+(2.025), (I-338)+(1.041)+(2.026), (I-338)+(1.041)+(2.027), (I-338)+(1.041)+(2.028), (I-338)+(1.041)+(2.029), (I-338)+(1.041)+(2.030), (I-338)+(1.041)+(2.031), (I-338)+(1.041)+(2.032), (I-338)+(1.041)+(2.033), (I-338)+(1.041)+(2.034), (I-338)+(1.041)+(2.035), (I-338)+(1.041)+(2.036), (I-338)+(1.041)+(2.037), (I-338)+(1.041)+(2.038), (I-338)+(1.041)+(2.039), (I-338)+(1.041)+(2.040), (I-338)+(1.041)+(2.041), (I-338)+(1.041)+(2.042), (I-338)+(1.041)+(2.043), (I-338)+(1.041)+(2.044), (I-338)+(1.041)+(2.045), (I-338)+(1.041)+(2.046), (I-338)+(1.041)+(2.047), (I-338)+(1.041)+(2.048), (I-338)+(1.041)+(2.049), (I-338)+(1.041)+(2.050), (I-338)+(1.041)+(2.051), (I-338)+(1.041)+(2.052), (I-338)+(1.041)+(2.053), (I-338)+(1.041)+(2.054), (I-338)+(1.041)+(2.055), (I-338)+(1.041)+(2.056), (I-338)+(1.041)+(2.057), (I-338)+(1.041)+(2.058), (I-338)+(1.041)+(2.059), (I-338)+(1.041)+(3.001), (I-338)+(1.041)+(3.002), (I-338)+(1.041)+(3.003), (I-338)+(1.041)+(3.004), (I-338)+(1.041)+(3.005), (I-338)+(1.041)+(3.006), (I-338)+(1.041)+(3.007), (I-338)+(1.041)+(3.008), (I-338)+(1.041)+(3.009), (I-338)+(1.041)+(3.010), (I-338)+(1.041)+(3.011), (I-338)+(1.041)+(3.012), (I-338)+(1.041)+(3.013), (I-338)+(1.041)+(3.014), (I-338)+(1.041)+(3.015), (I-338)+(1.041)+(3.016), (I-338)+(1.041)+(3.017), (I-338)+(1.041)+(3.018), (I-338)+(1.041)+(3.019), (I-338)+(1.041)+(3.020), (I-338)+(1.041)+(3.021), (I-338)+(1.041)+(3.022), (I-338)+(1.041)+(3.023), (I-338)+(1.041)+(3.024), (I-338)+(1.041)+(3.025), (I-338)+(1.041)+(3.026), (I-338)+(1.041)+(3.027), (I-338)+(1.041)+(3.028), (I-338)+(1.041)+(3.029), (I-338)+(1.041)+(3.030), (I-338)+(1.041)+(3.031), (I-338)+(1.041)+(5.001), (I-338)+(1.041)+(5.002), (I-338)+(1.041)+(5.003), (I-338)+(1.041)+(5.004), (I-338)+(1.041)+(5.005), (I-338)+(1.041)+(5.006), (I-338)+(1.041)+(5.007), (I-338)+(1.041)+(5.008), (I-338)+(1.041)+(5.009), (I-338)+(1.041)+(5.010), (I-338)+(1.041)+(5.011), (I-338)+(1.041)+(5.012), (I-338)+(1.041)+(5.013), (I-338)+(1.041)+(5.014), (I-338)+(1.041)+(5.015), (I-338)+(1.041)+(5.016), (I-338)+(1.041)+(5.017), (I-338)+(1.041)+(5.018), (I-338)+(1.041)+(5.019), (I-338)+(1.041)+(5.020), (I-338)+(1.041)+(5.021), (I-338)+(1.041)+(5.022), (I-338)+(1.041)+(5.023), (I-338)+(1.041)+(6.001), (I-338)+(1.041)+(6.002), (I-338)+(1.041)+(6.003), (I-338)+(1.041)+(6.004), (I-338)+(1.041)+(7.001), (I-338)+(1.041)+(7.002), (I-338)+(1.041)+(7.003), (I-338)+(1.041)+(7.004), (I-338)+(1.041)+(7.005), (I-338)+(1.041)+(7.006), (I-338)+(1.041)+(9.001), (I-338)+(1.041)+(9.002), (I-338)+(1.041)+(9.003), (I-338)+(1.041)+(9.004), (I-338)+(1.041)+(9.005), (I-338)+(1.041)+(9.006), (I-338)+(1.041)+(9.007), (I-338)+(1.041)+(9.008), (I-338)+(1.041)+(9.009), (I-338)+(1.041)+(14.001), (I-338)+(1.041)+(14.002), (I-338)+(1.041)+(15.008), (I-338)+(1.041)+(15.011), (I-338)+(1.041)+(15.012), (I-338)+(1.041)+(15.016), (I-338)+(1.041)+(15.025), (I-338)+(1.041)+(15.027), (I-338)+(1.041)+(15.047), (I-338)+(1.041)+(15.063), (I-338)+(1.041)+(15.064), (I-338)+(1.041)+(16.001), (I-338)+(1.041)+(16.002), (I-338)+(1.041)+(16.003), (I-338)+(1.041)+(16.004), (I-338)+(1.041)+(16.005), (I-338)+(1.041)+(16.006), (I-338)+(1.041)+(16.007), (I-338)+(1.041)+(16.008), (I-338)+(1.041)+(17.001), (I-338)+(1.041)+(17.002), (I-338)+(1.041)+(17.003), (I-338)+(1.041)+(17.004), (I-338)+(1.041)+(17.005), (I-338)+(1.041)+(17.006), (I-338)+(1.041)+(17.007), (I-338)+(1.041)+(17.008), (I-338)+(1.041)+(17.009), (I-338)+(1.041)+(17.010), (I-338)+(1.041)+(17.011), (I-338)+(1.041)+(17.012), (I-338)+(1.041)+(18.001), (I-338)+(1.042)+(1.043), (I-338)+(1.042)+(1.044), (I-338)+(1.042)+(1.045), (I-338)+(1.042)+(1.046), (I-338)+(1.042)+(1.047), (I-338)+(1.042)+(1.048), (I-338)+(1.042)+(1.049), (I-338)+(1.042)+(1.050), (I-338)+(1.042)+(1.051), (I-338)+(1.042)+(1.052), (I-338)+(1.042)+(1.053), (I-338)+(1.042)+(1.054), (I-338)+(1.042)+(1.055), (I-338)+(1.042)+(1.056), (I-338)+(1.042)+(1.057), (I-338)+(1.042)+(1.058), (I-338)+(1.042)+(1.059), (I-338)+(1.042)+(1.060), (I-338)+(1.042)+(1.061), (I-338)+(1.042)+(1.062), (I-338)+(1.042)+(1.063), (I-338)+(1.042)+(1.064), (I-338)+(1.042)+(1.065), (I-338)+(1.042)+(1.066), (I-338)+(1.042)+(1.067), (I-338)+(1.042)+(1.068), (I-338)+(1.042)+(1.069), (I-338)+(1.042)+(1.070), (I-338)+(1.042)+(1.071), (I-338)+(1.042)+(1.072), (I-338)+(1.042)+(1.073), (I-338)+(1.042)+(1.074), (I-338)+(1.042)+(1.075), (I-338)+(1.042)+(1.076), (I-338)+(1.042)+(1.077), (I-338)+(1.042)+(1.078), (I-338)+(1.042)+(1.079), (I-338)+(1.042)+(1.080), (I-338)+(1.042)+(1.081), (I-338)+(1.042)+(1.082), (I-338)+(1.042)+(1.083), (I-338)+(1.042)+(1.084), (I-338)+(1.042)+(1.085), (I-338)+(1.042)+(1.086), (I-338)+(1.042)+(1.087), (I-338)+(1.042)+(1.088), (I-338)+(1.042)+(1.089), (I-338)+(1.042)+(1.090), (I-338)+(1.042)+(1.091), (I-338)+(1.042)+(1.092), (I-338)+(1.042)+(2.001), (I-338)+(1.042)+(2.002), (I-338)+(1.042)+(2.003), (I-338)+(1.042)+(2.004), (I-338)+(1.042)+(2.005), (I-338)+(1.042)+(2.006), (I-338)+(1.042)+(2.007), (I-338)+(1.042)+(2.008), (I-338)+(1.042)+(2.009), (I-338)+(1.042)+(2.010), (I-338)+(1.042)+(2.011), (I-338)+(1.042)+(2.012), (I-338)+(1.042)+(2.013), (I-338)+(1.042)+(2.014), (I-338)+(1.042)+(2.015), (I-338)+(1.042)+(2.016), (I-338)+(1.042)+(2.017), (I-338)+(1.042)+(2.018), (I-338)+(1.042)+(2.019), (I-338)+(1.042)+(2.020), (I-338)+(1.042)+(2.021), (I-338)+(1.042)+(2.022), (I-338)+(1.042)+(2.023), (I-338)+(1.042)+(2.024), (I-338)+(1.042)+(2.025), (I-338)+(1.042)+(2.026), (I-338)+(1.042)+(2.027), (I-338)+(1.042)+(2.028), (I-338)+(1.042)+(2.029), (I-338)+(1.042)+(2.030), (I-338)+(1.042)+(2.031), (I-338)+(1.042)+(2.032), (I-338)+(1.042)+(2.033), (I-338)+(1.042)+(2.034), (I-338)+(1.042)+(2.035), (I-338)+(1.042)+(2.036), (I-338)+(1.042)+(2.037), (I-338)+(1.042)+(2.038), (I-338)+(1.042)+(2.039), (I-338)+(1.042)+(2.040), (I-338)+(1.042)+(2.041), (I-338)+(1.042)+(2.042), (I-338)+(1.042)+(2.043), (I-338)+(1.042)+(2.044), (I-338)+(1.042)+(2.045), (I-338)+(1.042)+(2.046), (I-338)+(1.042)+(2.047), (I-338)+(1.042)+(2.048), (I-338)+(1.042)+(2.049), (I-338)+(1.042)+(2.050), (I-338)+(1.042)+(2.051), (I-338)+(1.042)+(2.052), (I-338)+(1.042)+(2.053), (I-338)+(1.042)+(2.054), (I-338)+(1.042)+(2.055), (I-338)+(1.042)+(2.056), (I-338)+(1.042)+(2.057), (I-338)+(1.042)+(2.058), (I-338)+(1.042)+(2.059), (I-338)+(1.042)+(3.001), (I-338)+(1.042)+(3.002), (I-338)+(1.042)+(3.003), (I-338)+(1.042)+(3.004), (I-338)+(1.042)+(3.005), (I-338)+(1.042)+(3.006), (I-338)+(1.042)+(3.007), (I-338)+(1.042)+(3.008), (I-338)+(1.042)+(3.009), (I-338)+(1.042)+(3.010), (I-338)+(1.042)+(3.011), (I-338)+(1.042)+(3.012), (I-338)+(1.042)+(3.013), (I-338)+(1.042)+(3.014), (I-338)+(1.042)+(3.015), (I-338)+(1.042)+(3.016), (I-338)+(1.042)+(3.017), (I-338)+(1.042)+(3.018), (I-338)+(1.042)+(3.019), (I-338)+(1.042)+(3.020), (I-338)+(1.042)+(3.021), (I-338)+(1.042)+(3.022), (I-338)+(1.042)+(3.023), (I-338)+(1.042)+(3.024), (I-338)+(1.042)+(3.025), (I-338)+(1.042)+(3.026), (I-338)+(1.042)+(3.027), (I-338)+(1.042)+(3.028), (I-338)+(1.042)+(3.029), (I-338)+(1.042)+(3.030), (I-338)+(1.042)+(3.031), (I-338)+(1.042)+(5.001), (I-338)+(1.042)+(5.002), (I-338)+(1.042)+(5.003), (I-338)+(1.042)+(5.004), (I-338)+(1.042)+(5.005), (I-338)+(1.042)+(5.006), (I-338)+(1.042)+(5.007), (I-338)+(1.042)+(5.008), (I-338)+(1.042)+(5.009), (I-338)+(1.042)+(5.010), (I-338)+(1.042)+(5.011), (I-338)+(1.042)+(5.012), (I-338)+(1.042)+(5.013), (I-338)+(1.042)+(5.014), (I-338)+(1.042)+(5.015), (I-338)+(1.042)+(5.016), (I-338)+(1.042)+(5.017), (I-338)+(1.042)+(5.018), (I-338)+(1.042)+(5.019), (I-338)+(1.042)+(5.020), (I-338)+(1.042)+(5.021), (I-338)+(1.042)+(5.022), (I-338)+(1.042)+(5.023), (I-338)+(1.042)+(6.001), (I-338)+(1.042)+(6.002), (I-338)+(1.042)+(6.003), (I-338)+(1.042)+(6.004), (I-338)+(1.042)+(7.001), (I-338)+(1.042)+(7.002), (I-338)+(1.042)+(7.003), (I-338)+(1.042)+(7.004), (I-338)+(1.042)+(7.005), (I-338)+(1.042)+(7.006), (I-338)+(1.042)+(9.001), (I-338)+(1.042)+(9.002), (I-338)+(1.042)+(9.003), (I-338)+(1.042)+(9.004), (I-338)+(1.042)+(9.005), (I-338)+(1.042)+(9.006), (I-338)+(1.042)+(9.007), (I-338)+(1.042)+(9.008), (I-338)+(1.042)+(9.009), (I-338)+(1.042)+(14.001), (I-338)+(1.042)+(14.002), (I-338)+(1.042)+(15.008), (I-338)+(1.042)+(15.011), (I-338)+(1.042)+(15.012), (I-338)+(1.042)+(15.016), (I-338)+(1.042)+(15.025), (I-338)+(1.042)+(15.027), (I-338)+(1.042)+(15.047), (I-338)+(1.042)+(15.063), (I-338)+(1.042)+(15.064), (I-338)+(1.042)+(16.001), (I-338)+(1.042)+(16.002), (I-338)+(1.042)+(16.003), (I-338)+(1.042)+(16.004), (I-338)+(1.042)+(16.005), (I-338)+(1.042)+(16.006), (I-338)+(1.042)+(16.007), (I-338)+(1.042)+(16.008), (I-338)+(1.042)+(17.001), (I-338)+(1.042)+(17.002), (I-338)+(1.042)+(17.003), (I-338)+(1.042)+(17.004), (I-338)+(1.042)+(17.005), (I-338)+(1.042)+(17.006), (I-338)+(1.042)+(17.007), (I-338)+(1.042)+(17.008), (I-338)+(1.042)+(17.009), (I-338)+(1.042)+(17.010), (I-338)+(1.042)+(17.011), (I-338)+(1.042)+(17.012), (I-338)+(1.042)+(18.001), (I-338)+(1.043)+(1.044), (I-338)+(1.043)+(1.045), (I-338)+(1.043)+(1.046), (I-338)+(1.043)+(1.047), (I-338)+(1.043)+(1.048), (I-338)+(1.043)+(1.049), (I-338)+(1.043)+(1.050), (I-338)+(1.043)+(1.051), (I-338)+(1.043)+(1.052), (I-338)+(1.043)+(1.053), (I-338)+(1.043)+(1.054), (I-338)+(1.043)+(1.055), (I-338)+(1.043)+(1.056), (I-338)+(1.043)+(1.057), (I-338)+(1.043)+(1.058), (I-338)+(1.043)+(1.059), (I-338)+(1.043)+(1.060), (I-338)+(1.043)+(1.061), (I-338)+(1.043)+(1.062), (I-338)+(1.043)+(1.063), (I-338)+(1.043)+(1.064), (I-338)+(1.043)+(1.065), (I-338)+(1.043)+(1.066), (I-338)+(1.043)+(1.067), (I-338)+(1.043)+(1.068), (I-338)+(1.043)+(1.069), (I-338)+(1.043)+(1.070), (I-338)+(1.043)+(1.071), (I-338)+(1.043)+(1.072), (I-338)+(1.043)+(1.073), (I-338)+(1.043)+(1.074), (I-338)+(1.043)+(1.075), (I-338)+(1.043)+(1.076), (I-338)+(1.043)+(1.077), (I-338)+(1.043)+(1.078), (I-338)+(1.043)+(1.079), (I-338)+(1.043)+(1.080), (I-338)+(1.043)+(1.081), (I-338)+(1.043)+(1.082), (I-338)+(1.043)+(1.083), (I-338)+(1.043)+(1.084), (I-338)+(1.043)+(1.085), (I-338)+(1.043)+(1.086), (I-338)+(1.043)+(1.087), (I-338)+(1.043)+(1.088), (I-338)+(1.043)+(1.089), (I-338)+(1.043)+(1.090), (I-338)+(1.043)+(1.091), (I-338)+(1.043)+(1.092), (I-338)+(1.043)+(2.001), (I-338)+(1.043)+(2.002), (I-338)+(1.043)+(2.003), (I-338)+(1.043)+(2.004), (I-338)+(1.043)+(2.005), (I-338)+(1.043)+(2.006), (I-338)+(1.043)+(2.007), (I-338)+(1.043)+(2.008), (I-338)+(1.043)+(2.009), (I-338)+(1.043)+(2.010), (I-338)+(1.043)+(2.011), (I-338)+(1.043)+(2.012), (I-338)+(1.043)+(2.013), (I-338)+(1.043)+(2.014), (I-338)+(1.043)+(2.015), (I-338)+(1.043)+(2.016), (I-338)+(1.043)+(2.017), (I-338)+(1.043)+(2.018), (I-338)+(1.043)+(2.019), (I-338)+(1.043)+(2.020), (I-338)+(1.043)+(2.021), (I-338)+(1.043)+(2.022), (I-338)+(1.043)+(2.023), (I-338)+(1.043)+(2.024), (I-338)+(1.043)+(2.025), (I-338)+(1.043)+(2.026), (I-338)+(1.043)+(2.027), (I-338)+(1.043)+(2.028), (I-338)+(1.043)+(2.029), (I-338)+(1.043)+(2.030), (I-338)+(1.043)+(2.031), (I-338)+(1.043)+(2.032), (I-338)+(1.043)+(2.033), (I-338)+(1.043)+(2.034), (I-338)+(1.043)+(2.035), (I-338)+(1.043)+(2.036), (I-338)+(1.043)+(2.037), (I-338)+(1.043)+(2.038), (I-338)+(1.043)+(2.039), (I-338)+(1.043)+(2.040), (I-338)+(1.043)+(2.041), (I-338)+(1.043)+(2.042), (I-338)+(1.043)+(2.043), (I-338)+(1.043)+(2.044), (I-338)+(1.043)+(2.045), (I-338)+(1.043)+(2.046), (I-338)+(1.043)+(2.047), (I-338)+(1.043)+(2.048), (I-338)+(1.043)+(2.049), (I-338)+(1.043)+(2.050), (I-338)+(1.043)+(2.051), (I-338)+(1.043)+(2.052), (I-338)+(1.043)+(2.053), (I-338)+(1.043)+(2.054), (I-338)+(1.043)+(2.055), (I-338)+(1.043)+(2.056), (I-338)+(1.043)+(2.057), (I-338)+(1.043)+(2.058), (I-338)+(1.043)+(2.059), (I-338)+(1.043)+(3.001), (I-338)+(1.043)+(3.002), (I-338)+(1.043)+(3.003), (I-338)+(1.043)+(3.004), (I-338)+(1.043)+(3.005), (I-338)+(1.043)+(3.006), (I-338)+(1.043)+(3.007), (I-338)+(1.043)+(3.008), (I-338)+(1.043)+(3.009), (I-338)+(1.043)+(3.010), (I-338)+(1.043)+(3.011), (I-338)+(1.043)+(3.012), (I-338)+(1.043)+(3.013), (I-338)+(1.043)+(3.014), (I-338)+(1.043)+(3.015), (I-338)+(1.043)+(3.016), (I-338)+(1.043)+(3.017), (I-338)+(1.043)+(3.018), (I-338)+(1.043)+(3.019), (I-338)+(1.043)+(3.020), (I-338)+(1.043)+(3.021), (I-338)+(1.043)+(3.022), (I-338)+(1.043)+(3.023), (I-338)+(1.043)+(3.024), (I-338)+(1.043)+(3.025), (I-338)+(1.043)+(3.026), (I-338)+(1.043)+(3.027), (I-338)+(1.043)+(3.028), (I-338)+(1.043)+(3.029), (I-338)+(1.043)+(3.030), (I-338)+(1.043)+(3.031), (I-338)+(1.043)+(5.001), (I-338)+(1.043)+(5.002), (I-338)+(1.043)+(5.003), (I-338)+(1.043)+(5.004), (I-338)+(1.043)+(5.005), (I-338)+(1.043)+(5.006), (I-338)+(1.043)+(5.007), (I-338)+(1.043)+(5.008), (I-338)+(1.043)+(5.009), (I-338)+(1.043)+(5.010), (I-338)+(1.043)+(5.011), (I-338)+(1.043)+(5.012), (I-338)+(1.043)+(5.013), (I-338)+(1.043)+(5.014), (I-338)+(1.043)+(5.015), (I-338)+(1.043)+(5.016), (I-338)+(1.043)+(5.017), (I-338)+(1.043)+(5.018), (I-338)+(1.043)+(5.019), (I-338)+(1.043)+(5.020), (I-338)+(1.043)+(5.021), (I-338)+(1.043)+(5.022), (I-338)+(1.043)+(5.023), (I-338)+(1.043)+(6.001), (I-338)+(1.043)+(6.002), (I-338)+(1.043)+(6.003), (I-338)+(1.043)+(6.004), (I-338)+(1.043)+(7.001), (I-338)+(1.043)+(7.002), (I-338)+(1.043)+(7.003), (I-338)+(1.043)+(7.004), (I-338)+(1.043)+(7.005), (I-338)+(1.043)+(7.006), (I-338)+(1.043)+(9.001), (I-338)+(1.043)+(9.002), (I-338)+(1.043)+(9.003), (I-338)+(1.043)+(9.004), (I-338)+(1.043)+(9.005), (I-338)+(1.043)+(9.006), (I-338)+(1.043)+(9.007), (I-338)+(1.043)+(9.008), (I-338)+(1.043)+(9.009), (I-338)+(1.043)+(14.001), (I-338)+(1.043)+(14.002), (I-338)+(1.043)+(15.008), (I-338)+(1.043)+(15.011), (I-338)+(1.043)+(15.012), (I-338)+(1.043)+(15.016), (I-338)+(1.043)+(15.025), (I-338)+(1.043)+(15.027), (I-338)+(1.043)+(15.047), (I-338)+(1.043)+(15.063), (I-338)+(1.043)+(15.064), (I-338)+(1.043)+(16.001), (I-338)+(1.043)+(16.002), (I-338)+(1.043)+(16.003), (I-338)+(1.043)+(16.004), (I-338)+(1.043)+(16.005), (I-338)+(1.043)+(16.006), (I-338)+(1.043)+(16.007), (I-338)+(1.043)+(16.008), (I-338)+(1.043)+(17.001), (I-338)+(1.043)+(17.002), (I-338)+(1.043)+(17.003), (I-338)+(1.043)+(17.004), (I-338)+(1.043)+(17.005), (I-338)+(1.043)+(17.006), (I-338)+(1.043)+(17.007), (I-338)+(1.043)+(17.008), (I-338)+(1.043)+(17.009), (I-338)+(1.043)+(17.010), (I-338)+(1.043)+(17.011), (I-338)+(1.043)+(17.012), (I-338)+(1.043)+(18.001), (I-338)+(1.044)+(1.045), (I-338)+(1.044)+(1.046), (I-338)+(1.044)+(1.047), (I-338)+(1.044)+(1.048), (I-338)+(1.044)+(1.049), (I-338)+(1.044)+(1.050), (I-338)+(1.044)+(1.051), (I-338)+(1.044)+(1.052), (I-338)+(1.044)+(1.053), (I-338)+(1.044)+(1.054), (I-338)+(1.044)+(1.055), (I-338)+(1.044)+(1.056), (I-338)+(1.044)+(1.057), (I-338)+(1.044)+(1.058), (I-338)+(1.044)+(1.059), (I-338)+(1.044)+(1.060), (I-338)+(1.044)+(1.061), (I-338)+(1.044)+(1.062), (I-338)+(1.044)+(1.063), (I-338)+(1.044)+(1.064), (I-338)+(1.044)+(1.065), (I-338)+(1.044)+(1.066), (I-338)+(1.044)+(1.067), (I-338)+(1.044)+(1.068), (I-338)+(1.044)+(1.069), (I-338)+(1.044)+(1.070), (I-338)+(1.044)+(1.071), (I-338)+(1.044)+(1.072), (I-338)+(1.044)+(1.073), (I-338)+(1.044)+(1.074), (I-338)+(1.044)+(1.075), (I-338)+(1.044)+(1.076), (I-338)+(1.044)+(1.077), (I-338)+(1.044)+(1.078), (I-338)+(1.044)+(1.079), (I-338)+(1.044)+(1.080), (I-338)+(1.044)+(1.081), (I-338)+(1.044)+(1.082), (I-338)+(1.044)+(1.083), (I-338)+(1.044)+(1.084), (I-338)+(1.044)+(1.085), (I-338)+(1.044)+(1.086), (I-338)+(1.044)+(1.087), (I-338)+(1.044)+(1.088), (I-338)+(1.044)+(1.089), (I-338)+(1.044)+(1.090), (I-338)+(1.044)+(1.091), (I-338)+(1.044)+(1.092), (I-338)+(1.044)+(2.001), (I-338)+(1.044)+(2.002), (I-338)+(1.044)+(2.003), (I-338)+(1.044)+(2.004), (I-338)+(1.044)+(2.005), (I-338)+(1.044)+(2.006), (I-338)+(1.044)+(2.007), (I-338)+(1.044)+(2.008), (I-338)+(1.044)+(2.009), (I-338)+(1.044)+(2.010), (I-338)+(1.044)+(2.011), (I-338)+(1.044)+(2.012), (I-338)+(1.044)+(2.013), (I-338)+(1.044)+(2.014), (I-338)+(1.044)+(2.015), (I-338)+(1.044)+(2.016), (I-338)+(1.044)+(2.017), (I-338)+(1.044)+(2.018), (I-338)+(1.044)+(2.019), (I-338)+(1.044)+(2.020), (I-338)+(1.044)+(2.021), (I-338)+(1.044)+(2.022), (I-338)+(1.044)+(2.023), (I-338)+(1.044)+(2.024), (I-338)+(1.044)+(2.025), (I-338)+(1.044)+(2.026), (I-338)+(1.044)+(2.027), (I-338)+(1.044)+(2.028), (I-338)+(1.044)+(2.029), (I-338)+(1.044)+(2.030), (I-338)+(1.044)+(2.031), (I-338)+(1.044)+(2.032), (I-338)+(1.044)+(2.033), (I-338)+(1.044)+(2.034), (I-338)+(1.044)+(2.035), (I-338)+(1.044)+(2.036), (I-338)+(1.044)+(2.037), (I-338)+(1.044)+(2.038), (I-338)+(1.044)+(2.039), (I-338)+(1.044)+(2.040), (I-338)+(1.044)+(2.041), (I-338)+(1.044)+(2.042), (I-338)+(1.044)+(2.043), (I-338)+(1.044)+(2.044), (I-338)+(1.044)+(2.045), (I-338)+(1.044)+(2.046), (I-338)+(1.044)+(2.047), (I-338)+(1.044)+(2.048), (I-338)+(1.044)+(2.049), (I-338)+(1.044)+(2.050), (I-338)+(1.044)+(2.051), (I-338)+(1.044)+(2.052), (I-338)+(1.044)+(2.053), (I-338)+(1.044)+(2.054), (I-338)+(1.044)+(2.055), (I-338)+(1.044)+(2.056), (I-338)+(1.044)+(2.057), (I-338)+(1.044)+(2.058), (I-338)+(1.044)+(2.059), (I-338)+(1.044)+(3.001), (I-338)+(1.044)+(3.002), (I-338)+(1.044)+(3.003), (I-338)+(1.044)+(3.004), (I-338)+(1.044)+(3.005), (I-338)+(1.044)+(3.006), (I-338)+(1.044)+(3.007), (I-338)+(1.044)+(3.008), (I-338)+(1.044)+(3.009), (I-338)+(1.044)+(3.010), (I-338)+(1.044)+(3.011), (I-338)+(1.044)+(3.012), (I-338)+(1.044)+(3.013), (I-338)+(1.044)+(3.014), (I-338)+(1.044)+(3.015), (I-338)+(1.044)+(3.016), (I-338)+(1.044)+(3.017), (I-338)+(1.044)+(3.018), (I-338)+(1.044)+(3.019), (I-338)+(1.044)+(3.020), (I-338)+(1.044)+(3.021), (I-338)+(1.044)+(3.022), (I-338)+(1.044)+(3.023), (I-338)+(1.044)+(3.024), (I-338)+(1.044)+(3.025), (I-338)+(1.044)+(3.026), (I-338)+(1.044)+(3.027), (I-338)+(1.044)+(3.028), (I-338)+(1.044)+(3.029), (I-338)+(1.044)+(3.030), (I-338)+(1.044)+(3.031), (I-338)+(1.044)+(5.001), (I-338)+(1.044)+(5.002), (I-338)+(1.044)+(5.003), (I-338)+(1.044)+(5.004), (I-338)+(1.044)+(5.005), (I-338)+(1.044)+(5.006), (I-338)+(1.044)+(5.007), (I-338)+(1.044)+(5.008), (I-338)+(1.044)+(5.009), (I-338)+(1.044)+(5.010), (I-338)+(1.044)+(5.011), (I-338)+(1.044)+(5.012), (I-338)+(1.044)+(5.013), (I-338)+(1.044)+(5.014), (I-338)+(1.044)+(5.015), (I-338)+(1.044)+(5.016), (I-338)+(1.044)+(5.017), (I-338)+(1.044)+(5.018), (I-338)+(1.044)+(5.019), (I-338)+(1.044)+(5.020), (I-338)+(1.044)+(5.021), (I-338)+(1.044)+(5.022), (I-338)+(1.044)+(5.023), (I-338)+(1.044)+(6.001), (I-338)+(1.044)+(6.002), (I-338)+(1.044)+(6.003), (I-338)+(1.044)+(6.004), (I-338)+(1.044)+(7.001), (I-338)+(1.044)+(7.002), (I-338)+(1.044)+(7.003), (I-338)+(1.044)+(7.004), (I-338)+(1.044)+(7.005), (I-338)+(1.044)+(7.006), (I-338)+(1.044)+(9.001), (I-338)+(1.044)+(9.002), (I-338)+(1.044)+(9.003), (I-338)+(1.044)+(9.004), (I-338)+(1.044)+(9.005), (I-338)+(1.044)+(9.006), (I-338)+(1.044)+(9.007), (I-338)+(1.044)+(9.008), (I-338)+(1.044)+(9.009), (I-338)+(1.044)+(14.001), (I-338)+(1.044)+(14.002), (I-338)+(1.044)+(15.008), (I-338)+(1.044)+(15.011), (I-338)+(1.044)+(15.012), (I-338)+(1.044)+(15.016), (I-338)+(1.044)+(15.025), (I-338)+(1.044)+(15.027), (I-338)+(1.044)+(15.047), (I-338)+(1.044)+(15.063), (I-338)+(1.044)+(15.064), (I-338)+(1.044)+(16.001), (I-338)+(1.044)+(16.002), (I-338)+(1.044)+(16.003), (I-338)+(1.044)+(16.004), (I-338)+(1.044)+(16.005), (I-338)+(1.044)+(16.006), (I-338)+(1.044)+(16.007), (I-338)+(1.044)+(16.008), (I-338)+(1.044)+(17.001), (I-338)+(1.044)+(17.002), (I-338)+(1.044)+(17.003), (I-338)+(1.044)+(17.004), (I-338)+(1.044)+(17.005), (I-338)+(1.044)+(17.006), (I-338)+(1.044)+(17.007), (I-338)+(1.044)+(17.008), (I-338)+(1.044)+(17.009), (I-338)+(1.044)+(17.010), (I-338)+(1.044)+(17.011), (I-338)+(1.044)+(17.012), (I-338)+(1.044)+(18.001), (I-338)+(1.045)+(1.046), (I-338)+(1.045)+(1.047), (I-338)+(1.045)+(1.048), (I-338)+(1.045)+(1.049), (I-338)+(1.045)+(1.050), (I-338)+(1.045)+(1.051), (I-338)+(1.045)+(1.052), (I-338)+(1.045)+(1.053), (I-338)+(1.045)+(1.054), (I-338)+(1.045)+(1.055), (I-338)+(1.045)+(1.056), (I-338)+(1.045)+(1.057), (I-338)+(1.045)+(1.058), (I-338)+(1.045)+(1.059), (I-338)+(1.045)+(1.060), (I-338)+(1.045)+(1.061), (I-338)+(1.045)+(1.062), (I-338)+(1.045)+(1.063), (I-338)+(1.045)+(1.064), (I-338)+(1.045)+(1.065), (I-338)+(1.045)+(1.066), (I-338)+(1.045)+(1.067), (I-338)+(1.045)+(1.068), (I-338)+(1.045)+(1.069), (I-338)+(1.045)+(1.070), (I-338)+(1.045)+(1.071), (I-338)+(1.045)+(1.072), (I-338)+(1.045)+(1.073), (I-338)+(1.045)+(1.074), (I-338)+(1.045)+(1.075), (I-338)+(1.045)+(1.076), (I-338)+(1.045)+(1.077), (I-338)+(1.045)+(1.078), (I-338)+(1.045)+(1.079), (I-338)+(1.045)+(1.080), (I-338)+(1.045)+(1.081), (I-338)+(1.045)+(1.082), (I-338)+(1.045)+(1.083), (I-338)+(1.045)+(1.084), (I-338)+(1.045)+(1.085), (I-338)+(1.045)+(1.086), (I-338)+(1.045)+(1.087), (I-338)+(1.045)+(1.088), (I-338)+(1.045)+(1.089), (I-338)+(1.045)+(1.090), (I-338)+(1.045)+(1.091), (I-338)+(1.045)+(1.092), (I-338)+(1.045)+(2.001), (I-338)+(1.045)+(2.002), (I-338)+(1.045)+(2.003), (I-338)+(1.045)+(2.004), (I-338)+(1.045)+(2.005), (I-338)+(1.045)+(2.006), (I-338)+(1.045)+(2.007), (I-338)+(1.045)+(2.008), (I-338)+(1.045)+(2.009), (I-338)+(1.045)+(2.010), (I-338)+(1.045)+(2.011), (I-338)+(1.045)+(2.012), (I-338)+(1.045)+(2.013), (I-338)+(1.045)+(2.014), (I-338)+(1.045)+(2.015), (I-338)+(1.045)+(2.016), (I-338)+(1.045)+(2.017), (I-338)+(1.045)+(2.018), (I-338)+(1.045)+(2.019), (I-338)+(1.045)+(2.020), (I-338)+(1.045)+(2.021), (I-338)+(1.045)+(2.022), (I-338)+(1.045)+(2.023), (I-338)+(1.045)+(2.024), (I-338)+(1.045)+(2.025), (I-338)+(1.045)+(2.026), (I-338)+(1.045)+(2.027), (I-338)+(1.045)+(2.028), (I-338)+(1.045)+(2.029), (I-338)+(1.045)+(2.030), (I-338)+(1.045)+(2.031), (I-338)+(1.045)+(2.032), (I-338)+(1.045)+(2.033), (I-338)+(1.045)+(2.034), (I-338)+(1.045)+(2.035), (I-338)+(1.045)+(2.036), (I-338)+(1.045)+(2.037), (I-338)+(1.045)+(2.038), (I-338)+(1.045)+(2.039), (I-338)+(1.045)+(2.040), (I-338)+(1.045)+(2.041), (I-338)+(1.045)+(2.042), (I-338)+(1.045)+(2.043), (I-338)+(1.045)+(2.044), (I-338)+(1.045)+(2.045), (I-338)+(1.045)+(2.046), (I-338)+(1.045)+(2.047), (I-338)+(1.045)+(2.048), (I-338)+(1.045)+(2.049), (I-338)+(1.045)+(2.050), (I-338)+(1.045)+(2.051), (I-338)+(1.045)+(2.052), (I-338)+(1.045)+(2.053), (I-338)+(1.045)+(2.054), (I-338)+(1.045)+(2.055), (I-338)+(1.045)+(2.056), (I-338)+(1.045)+(2.057), (I-338)+(1.045)+(2.058), (I-338)+(1.045)+(2.059), (I-338)+(1.045)+(3.001), (I-338)+(1.045)+(3.002), (I-338)+(1.045)+(3.003), (I-338)+(1.045)+(3.004), (I-338)+(1.045)+(3.005), (I-338)+(1.045)+(3.006), (I-338)+(1.045)+(3.007), (I-338)+(1.045)+(3.008), (I-338)+(1.045)+(3.009), (I-338)+(1.045)+(3.010), (I-338)+(1.045)+(3.011), (I-338)+(1.045)+(3.012), (I-338)+(1.045)+(3.013), (I-338)+(1.045)+(3.014), (I-338)+(1.045)+(3.015), (I-338)+(1.045)+(3.016), (I-338)+(1.045)+(3.017), (I-338)+(1.045)+(3.018), (I-338)+(1.045)+(3.019), (I-338)+(1.045)+(3.020), (I-338)+(1.045)+(3.021), (I-338)+(1.045)+(3.022), (I-338)+(1.045)+(3.023), (I-338)+(1.045)+(3.024), (I-338)+(1.045)+(3.025), (I-338)+(1.045)+(3.026), (I-338)+(1.045)+(3.027), (I-338)+(1.045)+(3.028), (I-338)+(1.045)+(3.029), (I-338)+(1.045)+(3.030), (I-338)+(1.045)+(3.031), (I-338)+(1.045)+(5.001), (I-338)+(1.045)+(5.002), (I-338)+(1.045)+(5.003), (I-338)+(1.045)+(5.004), (I-338)+(1.045)+(5.005), (I-338)+(1.045)+(5.006), (I-338)+(1.045)+(5.007), (I-338)+(1.045)+(5.008), (I-338)+(1.045)+(5.009), (I-338)+(1.045)+(5.010), (I-338)+(1.045)+(5.011), (I-338)+(1.045)+(5.012), (I-338)+(1.045)+(5.013), (I-338)+(1.045)+(5.014), (I-338)+(1.045)+(5.015), (I-338)+(1.045)+(5.016), (I-338)+(1.045)+(5.017), (I-338)+(1.045)+(5.018), (I-338)+(1.045)+(5.019), (I-338)+(1.045)+(5.020), (I-338)+(1.045)+(5.021), (I-338)+(1.045)+(5.022), (I-338)+(1.045)+(5.023), (I-338)+(1.045)+(6.001), (I-338)+(1.045)+(6.002), (I-338)+(1.045)+(6.003), (I-338)+(1.045)+(6.004), (I-338)+(1.045)+(7.001), (I-338)+(1.045)+(7.002), (I-338)+(1.045)+(7.003), (I-338)+(1.045)+(7.004), (I-338)+(1.045)+(7.005), (I-338)+(1.045)+(7.006), (I-338)+(1.045)+(9.001), (I-338)+(1.045)+(9.002), (I-338)+(1.045)+(9.003), (I-338)+(1.045)+(9.004), (I-338)+(1.045)+(9.005), (I-338)+(1.045)+(9.006), (I-338)+(1.045)+(9.007), (I-338)+(1.045)+(9.008), (I-338)+(1.045)+(9.009), (I-338)+(1.045)+(14.001), (I-338)+(1.045)+(14.002), (I-338)+(1.045)+(15.008), (I-338)+(1.045)+(15.011), (I-338)+(1.045)+(15.012), (I-338)+(1.045)+(15.016), (I-338)+(1.045)+(15.025), (I-338)+(1.045)+(15.027), (I-338)+(1.045)+(15.047), (I-338)+(1.045)+(15.063), (I-338)+(1.045)+(15.064), (I-338)+(1.045)+(16.001), (I-338)+(1.045)+(16.002), (I-338)+(1.045)+(16.003), (I-338)+(1.045)+(16.004), (I-338)+(1.045)+(16.005), (I-338)+(1.045)+(16.006), (I-338)+(1.045)+(16.007), (I-338)+(1.045)+(16.008), (I-338)+(1.045)+(17.001), (I-338)+(1.045)+(17.002), (I-338)+(1.045)+(17.003), (I-338)+(1.045)+(17.004), (I-338)+(1.045)+(17.005), (I-338)+(1.045)+(17.006), (I-338)+(1.045)+(17.007), (I-338)+(1.045)+(17.008), (I-338)+(1.045)+(17.009), (I-338)+(1.045)+(17.010), (I-338)+(1.045)+(17.011), (I-338)+(1.045)+(17.012), (I-338)+(1.045)+(18.001), (I-338)+(1.046)+(1.047), (I-338)+(1.046)+(1.048), (I-338)+(1.046)+(1.049), (I-338)+(1.046)+(1.050), (I-338)+(1.046)+(1.051), (I-338)+(1.046)+(1.052), (I-338)+(1.046)+(1.053), (I-338)+(1.046)+(1.054), (I-338)+(1.046)+(1.055), (I-338)+(1.046)+(1.056), (I-338)+(1.046)+(1.057), (I-338)+(1.046)+(1.058), (I-338)+(1.046)+(1.059), (I-338)+(1.046)+(1.060), (I-338)+(1.046)+(1.061), (I-338)+(1.046)+(1.062), (I-338)+(1.046)+(1.063), (I-338)+(1.046)+(1.064), (I-338)+(1.046)+(1.065), (I-338)+(1.046)+(1.066), (I-338)+(1.046)+(1.067), (I-338)+(1.046)+(1.068), (I-338)+(1.046)+(1.069), (I-338)+(1.046)+(1.070), (I-338)+(1.046)+(1.071), (I-338)+(1.046)+(1.072), (I-338)+(1.046)+(1.073), (I-338)+(1.046)+(1.074), (I-338)+(1.046)+(1.075), (I-338)+(1.046)+(1.076), (I-338)+(1.046)+(1.077), (I-338)+(1.046)+(1.078), (I-338)+(1.046)+(1.079), (I-338)+(1.046)+(1.080), (I-338)+(1.046)+(1.081), (I-338)+(1.046)+(1.082), (I-338)+(1.046)+(1.083), (I-338)+(1.046)+(1.084), (I-338)+(1.046)+(1.085), (I-338)+(1.046)+(1.086), (I-338)+(1.046)+(1.087), (I-338)+(1.046)+(1.088), (I-338)+(1.046)+(1.089), (I-338)+(1.046)+(1.090), (I-338)+(1.046)+(1.091), (I-338)+(1.046)+(1.092), (I-338)+(1.046)+(2.001), (I-338)+(1.046)+(2.002), (I-338)+(1.046)+(2.003), (I-338)+(1.046)+(2.004), (I-338)+(1.046)+(2.005), (I-338)+(1.046)+(2.006), (I-338)+(1.046)+(2.007), (I-338)+(1.046)+(2.008), (I-338)+(1.046)+(2.009), (I-338)+(1.046)+(2.010), (I-338)+(1.046)+(2.011), (I-338)+(1.046)+(2.012), (I-338)+(1.046)+(2.013), (I-338)+(1.046)+(2.014), (I-338)+(1.046)+(2.015), (I-338)+(1.046)+(2.016), (I-338)+(1.046)+(2.017), (I-338)+(1.046)+(2.018), (I-338)+(1.046)+(2.019), (I-338)+(1.046)+(2.020), (I-338)+(1.046)+(2.021), (I-338)+(1.046)+(2.022), (I-338)+(1.046)+(2.023), (I-338)+(1.046)+(2.024), (I-338)+(1.046)+(2.025), (I-338)+(1.046)+(2.026), (I-338)+(1.046)+(2.027), (I-338)+(1.046)+(2.028), (I-338)+(1.046)+(2.029), (I-338)+(1.046)+(2.030), (I-338)+(1.046)+(2.031), (I-338)+(1.046)+(2.032), (I-338)+(1.046)+(2.033), (I-338)+(1.046)+(2.034), (I-338)+(1.046)+(2.035), (I-338)+(1.046)+(2.036), (I-338)+(1.046)+(2.037), (I-338)+(1.046)+(2.038), (I-338)+(1.046)+(2.039), (I-338)+(1.046)+(2.040), (I-338)+(1.046)+(2.041), (I-338)+(1.046)+(2.042), (I-338)+(1.046)+(2.043), (I-338)+(1.046)+(2.044), (I-338)+(1.046)+(2.045), (I-338)+(1.046)+(2.046), (I-338)+(1.046)+(2.047), (I-338)+(1.046)+(2.048), (I-338)+(1.046)+(2.049), (I-338)+(1.046)+(2.050), (I-338)+(1.046)+(2.051), (I-338)+(1.046)+(2.052), (I-338)+(1.046)+(2.053), (I-338)+(1.046)+(2.054), (I-338)+(1.046)+(2.055), (I-338)+(1.046)+(2.056), (I-338)+(1.046)+(2.057), (I-338)+(1.046)+(2.058), (I-338)+(1.046)+(2.059), (I-338)+(1.046)+(3.001), (I-338)+(1.046)+(3.002), (I-338)+(1.046)+(3.003), (I-338)+(1.046)+(3.004), (I-338)+(1.046)+(3.005), (I-338)+(1.046)+(3.006), (I-338)+(1.046)+(3.007), (I-338)+(1.046)+(3.008), (I-338)+(1.046)+(3.009), (I-338)+(1.046)+(3.010), (I-338)+(1.046)+(3.011), (I-338)+(1.046)+(3.012), (I-338)+(1.046)+(3.013), (I-338)+(1.046)+(3.014), (I-338)+(1.046)+(3.015), (I-338)+(1.046)+(3.016), (I-338)+(1.046)+(3.017), (I-338)+(1.046)+(3.018), (I-338)+(1.046)+(3.019), (I-338)+(1.046)+(3.020), (I-338)+(1.046)+(3.021), (I-338)+(1.046)+(3.022), (I-338)+(1.046)+(3.023), (I-338)+(1.046)+(3.024), (I-338)+(1.046)+(3.025), (I-338)+(1.046)+(3.026), (I-338)+(1.046)+(3.027), (I-338)+(1.046)+(3.028), (I-338)+(1.046)+(3.029), (I-338)+(1.046)+(3.030), (I-338)+(1.046)+(3.031), (I-338)+(1.046)+(5.001), (I-338)+(1.046)+(5.002), (I-338)+(1.046)+(5.003), (I-338)+(1.046)+(5.004), (I-338)+(1.046)+(5.005), (I-338)+(1.046)+(5.006), (I-338)+(1.046)+(5.007), (I-338)+(1.046)+(5.008), (I-338)+(1.046)+(5.009), (I-338)+(1.046)+(5.010), (I-338)+(1.046)+(5.011), (I-338)+(1.046)+(5.012), (I-338)+(1.046)+(5.013), (I-338)+(1.046)+(5.014), (I-338)+(1.046)+(5.015), (I-338)+(1.046)+(5.016), (I-338)+(1.046)+(5.017), (I-338)+(1.046)+(5.018), (I-338)+(1.046)+(5.019), (I-338)+(1.046)+(5.020), (I-338)+(1.046)+(5.021), (I-338)+(1.046)+(5.022), (I-338)+(1.046)+(5.023), (I-338)+(1.046)+(6.001), (I-338)+(1.046)+(6.002), (I-338)+(1.046)+(6.003), (I-338)+(1.046)+(6.004), (I-338)+(1.046)+(7.001), (I-338)+(1.046)+(7.002), (I-338)+(1.046)+(7.003), (I-338)+(1.046)+(7.004), (I-338)+(1.046)+(7.005), (I-338)+(1.046)+(7.006), (I-338)+(1.046)+(9.001), (I-338)+(1.046)+(9.002), (I-338)+(1.046)+(9.003), (I-338)+(1.046)+(9.004), (I-338)+(1.046)+(9.005), (I-338)+(1.046)+(9.006), (I-338)+(1.046)+(9.007), (I-338)+(1.046)+(9.008), (I-338)+(1.046)+(9.009), (I-338)+(1.046)+(14.001), (I-338)+(1.046)+(14.002), (I-338)+(1.046)+(15.008), (I-338)+(1.046)+(15.011), (I-338)+(1.046)+(15.012), (I-338)+(1.046)+(15.016), (I-338)+(1.046)+(15.025), (I-338)+(1.046)+(15.027), (I-338)+(1.046)+(15.047), (I-338)+(1.046)+(15.063), (I-338)+(1.046)+(15.064), (I-338)+(1.046)+(16.001), (I-338)+(1.046)+(16.002), (I-338)+(1.046)+(16.003), (I-338)+(1.046)+(16.004), (I-338)+(1.046)+(16.005), (I-338)+(1.046)+(16.006), (I-338)+(1.046)+(16.007), (I-338)+(1.046)+(16.008), (I-338)+(1.046)+(17.001), (I-338)+(1.046)+(17.002), (I-338)+(1.046)+(17.003), (I-338)+(1.046)+(17.004), (I-338)+(1.046)+(17.005), (I-338)+(1.046)+(17.006), (I-338)+(1.046)+(17.007), (I-338)+(1.046)+(17.008), (I-338)+(1.046)+(17.009), (I-338)+(1.046)+(17.010), (I-338)+(1.046)+(17.011), (I-338)+(1.046)+(17.012), (I-338)+(1.046)+(18.001), (I-338)+(1.047)+(1.048), (I-338)+(1.047)+(1.049), (I-338)+(1.047)+(1.050), (I-338)+(1.047)+(1.051), (I-338)+(1.047)+(1.052), (I-338)+(1.047)+(1.053), (I-338)+(1.047)+(1.054), (I-338)+(1.047)+(1.055), (I-338)+(1.047)+(1.056), (I-338)+(1.047)+(1.057), (I-338)+(1.047)+(1.058), (I-338)+(1.047)+(1.059), (I-338)+(1.047)+(1.060), (I-338)+(1.047)+(1.061), (I-338)+(1.047)+(1.062), (I-338)+(1.047)+(1.063), (I-338)+(1.047)+(1.064), (I-338)+(1.047)+(1.065), (I-338)+(1.047)+(1.066), (I-338)+(1.047)+(1.067), (I-338)+(1.047)+(1.068), (I-338)+(1.047)+(1.069), (I-338)+(1.047)+(1.070), (I-338)+(1.047)+(1.071), (I-338)+(1.047)+(1.072), (I-338)+(1.047)+(1.073), (I-338)+(1.047)+(1.074), (I-338)+(1.047)+(1.075), (I-338)+(1.047)+(1.076), (I-338)+(1.047)+(1.077), (I-338)+(1.047)+(1.078), (I-338)+(1.047)+(1.079), (I-338)+(1.047)+(1.080), (I-338)+(1.047)+(1.081), (I-338)+(1.047)+(1.082), (I-338)+(1.047)+(1.083), (I-338)+(1.047)+(1.084), (I-338)+(1.047)+(1.085), (I-338)+(1.047)+(1.086), (I-338)+(1.047)+(1.087), (I-338)+(1.047)+(1.088), (I-338)+(1.047)+(1.089), (I-338)+(1.047)+(1.090), (I-338)+(1.047)+(1.091), (I-338)+(1.047)+(1.092), (I-338)+(1.047)+(2.001), (I-338)+(1.047)+(2.002), (I-338)+(1.047)+(2.003), (I-338)+(1.047)+(2.004), (I-338)+(1.047)+(2.005), (I-338)+(1.047)+(2.006), (I-338)+(1.047)+(2.007), (I-338)+(1.047)+(2.008), (I-338)+(1.047)+(2.009), (I-338)+(1.047)+(2.010), (I-338)+(1.047)+(2.011), (I-338)+(1.047)+(2.012), (I-338)+(1.047)+(2.013), (I-338)+(1.047)+(2.014), (I-338)+(1.047)+(2.015), (I-338)+(1.047)+(2.016), (I-338)+(1.047)+(2.017), (I-338)+(1.047)+(2.018), (I-338)+(1.047)+(2.019), (I-338)+(1.047)+(2.020), (I-338)+(1.047)+(2.021), (I-338)+(1.047)+(2.022), (I-338)+(1.047)+(2.023), (I-338)+(1.047)+(2.024), (I-338)+(1.047)+(2.025), (I-338)+(1.047)+(2.026), (I-338)+(1.047)+(2.027), (I-338)+(1.047)+(2.028), (I-338)+(1.047)+(2.029), (I-338)+(1.047)+(2.030), (I-338)+(1.047)+(2.031), (I-338)+(1.047)+(2.032), (I-338)+(1.047)+(2.033), (I-338)+(1.047)+(2.034), (I-338)+(1.047)+(2.035), (I-338)+(1.047)+(2.036), (I-338)+(1.047)+(2.037), (I-338)+(1.047)+(2.038), (I-338)+(1.047)+(2.039), (I-338)+(1.047)+(2.040), (I-338)+(1.047)+(2.041), (I-338)+(1.047)+(2.042), (I-338)+(1.047)+(2.043), (I-338)+(1.047)+(2.044), (I-338)+(1.047)+(2.045), (I-338)+(1.047)+(2.046), (I-338)+(1.047)+(2.047), (I-338)+(1.047)+(2.048), (I-338)+(1.047)+(2.049), (I-338)+(1.047)+(2.050), (I-338)+(1.047)+(2.051), (I-338)+(1.047)+(2.052), (I-338)+(1.047)+(2.053), (I-338)+(1.047)+(2.054), (I-338)+(1.047)+(2.055), (I-338)+(1.047)+(2.056), (I-338)+(1.047)+(2.057), (I-338)+(1.047)+(2.058), (I-338)+(1.047)+(2.059), (I-338)+(1.047)+(3.001), (I-338)+(1.047)+(3.002), (I-338)+(1.047)+(3.003), (I-338)+(1.047)+(3.004), (I-338)+(1.047)+(3.005), (I-338)+(1.047)+(3.006), (I-338)+(1.047)+(3.007), (I-338)+(1.047)+(3.008), (I-338)+(1.047)+(3.009), (I-338)+(1.047)+(3.010), (I-338)+(1.047)+(3.011), (I-338)+(1.047)+(3.012), (I-338)+(1.047)+(3.013), (I-338)+(1.047)+(3.014), (I-338)+(1.047)+(3.015), (I-338)+(1.047)+(3.016), (I-338)+(1.047)+(3.017), (I-338)+(1.047)+(3.018), (I-338)+(1.047)+(3.019), (I-338)+(1.047)+(3.020), (I-338)+(1.047)+(3.021), (I-338)+(1.047)+(3.022), (I-338)+(1.047)+(3.023), (I-338)+(1.047)+(3.024), (I-338)+(1.047)+(3.025), (I-338)+(1.047)+(3.026), (I-338)+(1.047)+(3.027), (I-338)+(1.047)+(3.028), (I-338)+(1.047)+(3.029), (I-338)+(1.047)+(3.030), (I-338)+(1.047)+(3.031), (I-338)+(1.047)+(5.001), (I-338)+(1.047)+(5.002), (I-338)+(1.047)+(5.003), (I-338)+(1.047)+(5.004), (I-338)+(1.047)+(5.005), (I-338)+(1.047)+(5.006), (I-338)+(1.047)+(5.007), (I-338)+(1.047)+(5.008), (I-338)+(1.047)+(5.009), (I-338)+(1.047)+(5.010), (I-338)+(1.047)+(5.011), (I-338)+(1.047)+(5.012), (I-338)+(1.047)+(5.013), (I-338)+(1.047)+(5.014), (I-338)+(1.047)+(5.015), (I-338)+(1.047)+(5.016), (I-338)+(1.047)+(5.017), (I-338)+(1.047)+(5.018), (I-338)+(1.047)+(5.019), (I-338)+(1.047)+(5.020), (I-338)+(1.047)+(5.021), (I-338)+(1.047)+(5.022), (I-338)+(1.047)+(5.023), (I-338)+(1.047)+(6.001), (I-338)+(1.047)+(6.002), (I-338)+(1.047)+(6.003), (I-338)+(1.047)+(6.004), (I-338)+(1.047)+(7.001), (I-338)+(1.047)+(7.002), (I-338)+(1.047)+(7.003), (I-338)+(1.047)+(7.004), (I-338)+(1.047)+(7.005), (I-338)+(1.047)+(7.006), (I-338)+(1.047)+(9.001), (I-338)+(1.047)+(9.002), (I-338)+(1.047)+(9.003), (I-338)+(1.047)+(9.004), (I-338)+(1.047)+(9.005), (I-338)+(1.047)+(9.006), (I-338)+(1.047)+(9.007), (I-338)+(1.047)+(9.008), (I-338)+(1.047)+(9.009), (I-338)+(1.047)+(14.001), (I-338)+(1.047)+(14.002), (I-338)+(1.047)+(15.008), (I-338)+(1.047)+(15.011), (I-338)+(1.047)+(15.012), (I-338)+(1.047)+(15.016), (I-338)+(1.047)+(15.025), (I-338)+(1.047)+(15.027), (I-338)+(1.047)+(15.047), (I-338)+(1.047)+(15.063), (I-338)+(1.047)+(15.064), (I-338)+(1.047)+(16.001), (I-338)+(1.047)+(16.002), (I-338)+(1.047)+(16.003), (I-338)+(1.047)+(16.004), (I-338)+(1.047)+(16.005), (I-338)+(1.047)+(16.006), (I-338)+(1.047)+(16.007), (I-338)+(1.047)+(16.008), (I-338)+(1.047)+(17.001), (I-338)+(1.047)+(17.002), (I-338)+(1.047)+(17.003), (I-338)+(1.047)+(17.004), (I-338)+(1.047)+(17.005), (I-338)+(1.047)+(17.006), (I-338)+(1.047)+(17.007), (I-338)+(1.047)+(17.008), (I-338)+(1.047)+(17.009), (I-338)+(1.047)+(17.010), (I-338)+(1.047)+(17.011), (I-338)+(1.047)+(17.012), (I-338)+(1.047)+(18.001), (I-338)+(1.048)+(1.049), (I-338)+(1.048)+(1.050), (I-338)+(1.048)+(1.051), (I-338)+(1.048)+(1.052), (I-338)+(1.048)+(1.053), (I-338)+(1.048)+(1.054), (I-338)+(1.048)+(1.055), (I-338)+(1.048)+(1.056), (I-338)+(1.048)+(1.057), (I-338)+(1.048)+(1.058), (I-338)+(1.048)+(1.059), (I-338)+(1.048)+(1.060), (I-338)+(1.048)+(1.061), (I-338)+(1.048)+(1.062), (I-338)+(1.048)+(1.063), (I-338)+(1.048)+(1.064), (I-338)+(1.048)+(1.065), (I-338)+(1.048)+(1.066), (I-338)+(1.048)+(1.067), (I-338)+(1.048)+(1.068), (I-338)+(1.048)+(1.069), (I-338)+(1.048)+(1.070), (I-338)+(1.048)+(1.071), (I-338)+(1.048)+(1.072), (I-338)+(1.048)+(1.073), (I-338)+(1.048)+(1.074), (I-338)+(1.048)+(1.075), (I-338)+(1.048)+(1.076), (I-338)+(1.048)+(1.077), (I-338)+(1.048)+(1.078), (I-338)+(1.048)+(1.079), (I-338)+(1.048)+(1.080), (I-338)+(1.048)+(1.081), (I-338)+(1.048)+(1.082), (I-338)+(1.048)+(1.083), (I-338)+(1.048)+(1.084), (I-338)+(1.048)+(1.085), (I-338)+(1.048)+(1.086), (I-338)+(1.048)+(1.087), (I-338)+(1.048)+(1.088), (I-338)+(1.048)+(1.089), (I-338)+(1.048)+(1.090), (I-338)+(1.048)+(1.091), (I-338)+(1.048)+(1.092), (I-338)+(1.048)+(2.001), (I-338)+(1.048)+(2.002), (I-338)+(1.048)+(2.003), (I-338)+(1.048)+(2.004), (I-338)+(1.048)+(2.005), (I-338)+(1.048)+(2.006), (I-338)+(1.048)+(2.007), (I-338)+(1.048)+(2.008), (I-338)+(1.048)+(2.009), (I-338)+(1.048)+(2.010), (I-338)+(1.048)+(2.011), (I-338)+(1.048)+(2.012), (I-338)+(1.048)+(2.013), (I-338)+(1.048)+(2.014), (I-338)+(1.048)+(2.015), (I-338)+(1.048)+(2.016), (I-338)+(1.048)+(2.017), (I-338)+(1.048)+(2.018), (I-338)+(1.048)+(2.019), (I-338)+(1.048)+(2.020), (I-338)+(1.048)+(2.021), (I-338)+(1.048)+(2.022), (I-338)+(1.048)+(2.023), (I-338)+(1.048)+(2.024), (I-338)+(1.048)+(2.025), (I-338)+(1.048)+(2.026), (I-338)+(1.048)+(2.027), (I-338)+(1.048)+(2.028), (I-338)+(1.048)+(2.029), (I-338)+(1.048)+(2.030), (I-338)+(1.048)+(2.031), (I-338)+(1.048)+(2.032), (I-338)+(1.048)+(2.033), (I-338)+(1.048)+(2.034), (I-338)+(1.048)+(2.035), (I-338)+(1.048)+(2.036), (I-338)+(1.048)+(2.037), (I-338)+(1.048)+(2.038), (I-338)+(1.048)+(2.039), (I-338)+(1.048)+(2.040), (I-338)+(1.048)+(2.041), (I-338)+(1.048)+(2.042), (I-338)+(1.048)+(2.043), (I-338)+(1.048)+(2.044), (I-338)+(1.048)+(2.045), (I-338)+(1.048)+(2.046), (I-338)+(1.048)+(2.047), (I-338)+(1.048)+(2.048), (I-338)+(1.048)+(2.049), (I-338)+(1.048)+(2.050), (I-338)+(1.048)+(2.051), (I-338)+(1.048)+(2.052), (I-338)+(1.048)+(2.053), (I-338)+(1.048)+(2.054), (I-338)+(1.048)+(2.055), (I-338)+(1.048)+(2.056), (I-338)+(1.048)+(2.057), (I-338)+(1.048)+(2.058), (I-338)+(1.048)+(2.059), (I-338)+(1.048)+(3.001), (I-338)+(1.048)+(3.002), (I-338)+(1.048)+(3.003), (I-338)+(1.048)+(3.004), (I-338)+(1.048)+(3.005), (I-338)+(1.048)+(3.006), (I-338)+(1.048)+(3.007), (I-338)+(1.048)+(3.008), (I-338)+(1.048)+(3.009), (I-338)+(1.048)+(3.010), (I-338)+(1.048)+(3.011), (I-338)+(1.048)+(3.012), (I-338)+(1.048)+(3.013), (I-338)+(1.048)+(3.014), (I-338)+(1.048)+(3.015), (I-338)+(1.048)+(3.016), (I-338)+(1.048)+(3.017), (I-338)+(1.048)+(3.018), (I-338)+(1.048)+(3.019), (I-338)+(1.048)+(3.020), (I-338)+(1.048)+(3.021), (I-338)+(1.048)+(3.022), (I-338)+(1.048)+(3.023), (I-338)+(1.048)+(3.024), (I-338)+(1.048)+(3.025), (I-338)+(1.048)+(3.026), (I-338)+(1.048)+(3.027), (I-338)+(1.048)+(3.028), (I-338)+(1.048)+(3.029), (I-338)+(1.048)+(3.030), (I-338)+(1.048)+(3.031), (I-338)+(1.048)+(5.001), (I-338)+(1.048)+(5.002), (I-338)+(1.048)+(5.003), (I-338)+(1.048)+(5.004), (I-338)+(1.048)+(5.005), (I-338)+(1.048)+(5.006), (I-338)+(1.048)+(5.007), (I-338)+(1.048)+(5.008), (I-338)+(1.048)+(5.009), (I-338)+(1.048)+(5.010), (I-338)+(1.048)+(5.011), (I-338)+(1.048)+(5.012), (I-338)+(1.048)+(5.013), (I-338)+(1.048)+(5.014), (I-338)+(1.048)+(5.015), (I-338)+(1.048)+(5.016), (I-338)+(1.048)+(5.017), (I-338)+(1.048)+(5.018), (I-338)+(1.048)+(5.019), (I-338)+(1.048)+(5.020), (I-338)+(1.048)+(5.021), (I-338)+(1.048)+(5.022), (I-338)+(1.048)+(5.023), (I-338)+(1.048)+(6.001), (I-338)+(1.048)+(6.002), (I-338)+(1.048)+(6.003), (I-338)+(1.048)+(6.004), (I-338)+(1.048)+(7.001), (I-338)+(1.048)+(7.002), (I-338)+(1.048)+(7.003), (I-338)+(1.048)+(7.004), (I-338)+(1.048)+(7.005), (I-338)+(1.048)+(7.006), (I-338)+(1.048)+(9.001), (I-338)+(1.048)+(9.002), (I-338)+(1.048)+(9.003), (I-338)+(1.048)+(9.004), (I-338)+(1.048)+(9.005), (I-338)+(1.048)+(9.006), (I-338)+(1.048)+(9.007), (I-338)+(1.048)+(9.008), (I-338)+(1.048)+(9.009), (I-338)+(1.048)+(14.001), (I-338)+(1.048)+(14.002), (I-338)+(1.048)+(15.008), (I-338)+(1.048)+(15.011), (I-338)+(1.048)+(15.012), (I-338)+(1.048)+(15.016), (I-338)+(1.048)+(15.025), (I-338)+(1.048)+(15.027), (I-338)+(1.048)+(15.047), (I-338)+(1.048)+(15.063), (I-338)+(1.048)+(15.064), (I-338)+(1.048)+(16.001), (I-338)+(1.048)+(16.002), (I-338)+(1.048)+(16.003), (I-338)+(1.048)+(16.004), (I-338)+(1.048)+(16.005), (I-338)+(1.048)+(16.006), (I-338)+(1.048)+(16.007), (I-338)+(1.048)+(16.008), (I-338)+(1.048)+(17.001), (I-338)+(1.048)+(17.002), (I-338)+(1.048)+(17.003), (I-338)+(1.048)+(17.004), (I-338)+(1.048)+(17.005), (I-338)+(1.048)+(17.006), (I-338)+(1.048)+(17.007), (I-338)+(1.048)+(17.008), (I-338)+(1.048)+(17.009), (I-338)+(1.048)+(17.010), (I-338)+(1.048)+(17.011), (I-338)+(1.048)+(17.012), (I-338)+(1.048)+(18.001), (I-338)+(1.049)+(1.050), (I-338)+(1.049)+(1.051), (I-338)+(1.049)+(1.052), (I-338)+(1.049)+(1.053), (I-338)+(1.049)+(1.054), (I-338)+(1.049)+(1.055), (I-338)+(1.049)+(1.056), (I-338)+(1.049)+(1.057), (I-338)+(1.049)+(1.058), (I-338)+(1.049)+(1.059), (I-338)+(1.049)+(1.060), (I-338)+(1.049)+(1.061), (I-338)+(1.049)+(1.062), (I-338)+(1.049)+(1.063), (I-338)+(1.049)+(1.064), (I-338)+(1.049)+(1.065), (I-338)+(1.049)+(1.066), (I-338)+(1.049)+(1.067), (I-338)+(1.049)+(1.068), (I-338)+(1.049)+(1.069), (I-338)+(1.049)+(1.070), (I-338)+(1.049)+(1.071), (I-338)+(1.049)+(1.072), (I-338)+(1.049)+(1.073), (I-338)+(1.049)+(1.074), (I-338)+(1.049)+(1.075), (I-338)+(1.049)+(1.076), (I-338)+(1.049)+(1.077), (I-338)+(1.049)+(1.078), (I-338)+(1.049)+(1.079), (I-338)+(1.049)+(1.080), (I-338)+(1.049)+(1.081), (I-338)+(1.049)+(1.082), (I-338)+(1.049)+(1.083), (I-338)+(1.049)+(1.084), (I-338)+(1.049)+(1.085), (I-338)+(1.049)+(1.086), (I-338)+(1.049)+(1.087), (I-338)+(1.049)+(1.088), (I-338)+(1.049)+(1.089), (I-338)+(1.049)+(1.090), (I-338)+(1.049)+(1.091), (I-338)+(1.049)+(1.092), (I-338)+(1.049)+(2.001), (I-338)+(1.049)+(2.002), (I-338)+(1.049)+(2.003), (I-338)+(1.049)+(2.004), (I-338)+(1.049)+(2.005), (I-338)+(1.049)+(2.006), (I-338)+(1.049)+(2.007), (I-338)+(1.049)+(2.008), (I-338)+(1.049)+(2.009), (I-338)+(1.049)+(2.010), (I-338)+(1.049)+(2.011), (I-338)+(1.049)+(2.012), (I-338)+(1.049)+(2.013), (I-338)+(1.049)+(2.014), (I-338)+(1.049)+(2.015), (I-338)+(1.049)+(2.016), (I-338)+(1.049)+(2.017), (I-338)+(1.049)+(2.018), (I-338)+(1.049)+(2.019), (I-338)+(1.049)+(2.020), (I-338)+(1.049)+(2.021), (I-338)+(1.049)+(2.022), (I-338)+(1.049)+(2.023), (I-338)+(1.049)+(2.024), (I-338)+(1.049)+(2.025), (I-338)+(1.049)+(2.026), (I-338)+(1.049)+(2.027), (I-338)+(1.049)+(2.028), (I-338)+(1.049)+(2.029), (I-338)+(1.049)+(2.030), (I-338)+(1.049)+(2.031), (I-338)+(1.049)+(2.032), (I-338)+(1.049)+(2.033), (I-338)+(1.049)+(2.034), (I-338)+(1.049)+(2.035), (I-338)+(1.049)+(2.036), (I-338)+(1.049)+(2.037), (I-338)+(1.049)+(2.038), (I-338)+(1.049)+(2.039), (I-338)+(1.049)+(2.040), (I-338)+(1.049)+(2.041), (I-338)+(1.049)+(2.042), (I-338)+(1.049)+(2.043), (I-338)+(1.049)+(2.044), (I-338)+(1.049)+(2.045), (I-338)+(1.049)+(2.046), (I-338)+(1.049)+(2.047), (I-338)+(1.049)+(2.048), (I-338)+(1.049)+(2.049), (I-338)+(1.049)+(2.050), (I-338)+(1.049)+(2.051), (I-338)+(1.049)+(2.052), (I-338)+(1.049)+(2.053), (I-338)+(1.049)+(2.054), (I-338)+(1.049)+(2.055), (I-338)+(1.049)+(2.056), (I-338)+(1.049)+(2.057), (I-338)+(1.049)+(2.058), (I-338)+(1.049)+(2.059), (I-338)+(1.049)+(3.001), (I-338)+(1.049)+(3.002), (I-338)+(1.049)+(3.003), (I-338)+(1.049)+(3.004), (I-338)+(1.049)+(3.005), (I-338)+(1.049)+(3.006), (I-338)+(1.049)+(3.007), (I-338)+(1.049)+(3.008), (I-338)+(1.049)+(3.009), (I-338)+(1.049)+(3.010), (I-338)+(1.049)+(3.011), (I-338)+(1.049)+(3.012), (I-338)+(1.049)+(3.013), (I-338)+(1.049)+(3.014), (I-338)+(1.049)+(3.015), (I-338)+(1.049)+(3.016), (I-338)+(1.049)+(3.017), (I-338)+(1.049)+(3.018), (I-338)+(1.049)+(3.019), (I-338)+(1.049)+(3.020), (I-338)+(1.049)+(3.021), (I-338)+(1.049)+(3.022), (I-338)+(1.049)+(3.023), (I-338)+(1.049)+(3.024), (I-338)+(1.049)+(3.025), (I-338)+(1.049)+(3.026), (I-338)+(1.049)+(3.027), (I-338)+(1.049)+(3.028), (I-338)+(1.049)+(3.029), (I-338)+(1.049)+(3.030), (I-338)+(1.049)+(3.031), (I-338)+(1.049)+(5.001), (I-338)+(1.049)+(5.002), (I-338)+(1.049)+(5.003), (I-338)+(1.049)+(5.004), (I-338)+(1.049)+(5.005), (I-338)+(1.049)+(5.006), (I-338)+(1.049)+(5.007), (I-338)+(1.049)+(5.008), (I-338)+(1.049)+(5.009), (I-338)+(1.049)+(5.010), (I-338)+(1.049)+(5.011), (I-338)+(1.049)+(5.012), (I-338)+(1.049)+(5.013), (I-338)+(1.049)+(5.014), (I-338)+(1.049)+(5.015), (I-338)+(1.049)+(5.016), (I-338)+(1.049)+(5.017), (I-338)+(1.049)+(5.018), (I-338)+(1.049)+(5.019), (I-338)+(1.049)+(5.020), (I-338)+(1.049)+(5.021), (I-338)+(1.049)+(5.022), (I-338)+(1.049)+(5.023), (I-338)+(1.049)+(6.001), (I-338)+(1.049)+(6.002), (I-338)+(1.049)+(6.003), (I-338)+(1.049)+(6.004), (I-338)+(1.049)+(7.001), (I-338)+(1.049)+(7.002), (I-338)+(1.049)+(7.003), (I-338)+(1.049)+(7.004), (I-338)+(1.049)+(7.005), (I-338)+(1.049)+(7.006), (I-338)+(1.049)+(9.001), (I-338)+(1.049)+(9.002), (I-338)+(1.049)+(9.003), (I-338)+(1.049)+(9.004), (I-338)+(1.049)+(9.005), (I-338)+(1.049)+(9.006), (I-338)+(1.049)+(9.007), (I-338)+(1.049)+(9.008), (I-338)+(1.049)+(9.009), (I-338)+(1.049)+(14.001), (I-338)+(1.049)+(14.002), (I-338)+(1.049)+(15.008), (I-338)+(1.049)+(15.011), (I-338)+(1.049)+(15.012), (I-338)+(1.049)+(15.016), (I-338)+(1.049)+(15.025), (I-338)+(1.049)+(15.027), (I-338)+(1.049)+(15.047), (I-338)+(1.049)+(15.063), (I-338)+(1.049)+(15.064), (I-338)+(1.049)+(16.001), (I-338)+(1.049)+(16.002), (I-338)+(1.049)+(16.003), (I-338)+(1.049)+(16.004), (I-338)+(1.049)+(16.005), (I-338)+(1.049)+(16.006), (I-338)+(1.049)+(16.007), (I-338)+(1.049)+(16.008), (I-338)+(1.049)+(17.001), (I-338)+(1.049)+(17.002), (I-338)+(1.049)+(17.003), (I-338)+(1.049)+(17.004), (I-338)+(1.049)+(17.005), (I-338)+(1.049)+(17.006), (I-338)+(1.049)+(17.007), (I-338)+(1.049)+(17.008), (I-338)+(1.049)+(17.009), (I-338)+(1.049)+(17.010), (I-338)+(1.049)+(17.011), (I-338)+(1.049)+(17.012), (I-338)+(1.049)+(18.001), (I-338)+(1.050)+(1.051), (I-338)+(1.050)+(1.052), (I-338)+(1.050)+(1.053), (I-338)+(1.050)+(1.054), (I-338)+(1.050)+(1.055), (I-338)+(1.050)+(1.056), (I-338)+(1.050)+(1.057), (I-338)+(1.050)+(1.058), (I-338)+(1.050)+(1.059), (I-338)+(1.050)+(1.060), (I-338)+(1.050)+(1.061), (I-338)+(1.050)+(1.062), (I-338)+(1.050)+(1.063), (I-338)+(1.050)+(1.064), (I-338)+(1.050)+(1.065), (I-338)+(1.050)+(1.066), (I-338)+(1.050)+(1.067), (I-338)+(1.050)+(1.068), (I-338)+(1.050)+(1.069), (I-338)+(1.050)+(1.070), (I-338)+(1.050)+(1.071), (I-338)+(1.050)+(1.072), (I-338)+(1.050)+(1.073), (I-338)+(1.050)+(1.074), (I-338)+(1.050)+(1.075), (I-338)+(1.050)+(1.076), (I-338)+(1.050)+(1.077), (I-338)+(1.050)+(1.078), (I-338)+(1.050)+(1.079), (I-338)+(1.050)+(1.080), (I-338)+(1.050)+(1.081), (I-338)+(1.050)+(1.082), (I-338)+(1.050)+(1.083), (I-338)+(1.050)+(1.084), (I-338)+(1.050)+(1.085), (I-338)+(1.050)+(1.086), (I-338)+(1.050)+(1.087), (I-338)+(1.050)+(1.088), (I-338)+(1.050)+(1.089), (I-338)+(1.050)+(1.090), (I-338)+(1.050)+(1.091), (I-338)+(1.050)+(1.092), (I-338)+(1.050)+(2.001), (I-338)+(1.050)+(2.002), (I-338)+(1.050)+(2.003), (I-338)+(1.050)+(2.004), (I-338)+(1.050)+(2.005), (I-338)+(1.050)+(2.006), (I-338)+(1.050)+(2.007), (I-338)+(1.050)+(2.008), (I-338)+(1.050)+(2.009), (I-338)+(1.050)+(2.010), (I-338)+(1.050)+(2.011), (I-338)+(1.050)+(2.012), (I-338)+(1.050)+(2.013), (I-338)+(1.050)+(2.014), (I-338)+(1.050)+(2.015), (I-338)+(1.050)+(2.016), (I-338)+(1.050)+(2.017), (I-338)+(1.050)+(2.018), (I-338)+(1.050)+(2.019), (I-338)+(1.050)+(2.020), (I-338)+(1.050)+(2.021), (I-338)+(1.050)+(2.022), (I-338)+(1.050)+(2.023), (I-338)+(1.050)+(2.024), (I-338)+(1.050)+(2.025), (I-338)+(1.050)+(2.026), (I-338)+(1.050)+(2.027), (I-338)+(1.050)+(2.028), (I-338)+(1.050)+(2.029), (I-338)+(1.050)+(2.030), (I-338)+(1.050)+(2.031), (I-338)+(1.050)+(2.032), (I-338)+(1.050)+(2.033), (I-338)+(1.050)+(2.034), (I-338)+(1.050)+(2.035), (I-338)+(1.050)+(2.036), (I-338)+(1.050)+(2.037), (I-338)+(1.050)+(2.038), (I-338)+(1.050)+(2.039), (I-338)+(1.050)+(2.040), (I-338)+(1.050)+(2.041), (I-338)+(1.050)+(2.042), (I-338)+(1.050)+(2.043), (I-338)+(1.050)+(2.044), (I-338)+(1.050)+(2.045), (I-338)+(1.050)+(2.046), (I-338)+(1.050)+(2.047), (I-338)+(1.050)+(2.048), (I-338)+(1.050)+(2.049), (I-338)+(1.050)+(2.050), (I-338)+(1.050)+(2.051), (I-338)+(1.050)+(2.052), (I-338)+(1.050)+(2.053), (I-338)+(1.050)+(2.054), (I-338)+(1.050)+(2.055), (I-338)+(1.050)+(2.056), (I-338)+(1.050)+(2.057), (I-338)+(1.050)+(2.058), (I-338)+(1.050)+(2.059), (I-338)+(1.050)+(3.001), (I-338)+(1.050)+(3.002), (I-338)+(1.050)+(3.003), (I-338)+(1.050)+(3.004), (I-338)+(1.050)+(3.005), (I-338)+(1.050)+(3.006), (I-338)+(1.050)+(3.007), (I-338)+(1.050)+(3.008), (I-338)+(1.050)+(3.009), (I-338)+(1.050)+(3.010), (I-338)+(1.050)+(3.011), (I-338)+(1.050)+(3.012), (I-338)+(1.050)+(3.013), (I-338)+(1.050)+(3.014), (I-338)+(1.050)+(3.015), (I-338)+(1.050)+(3.016), (I-338)+(1.050)+(3.017), (I-338)+(1.050)+(3.018), (I-338)+(1.050)+(3.019), (I-338)+(1.050)+(3.020), (I-338)+(1.050)+(3.021), (I-338)+(1.050)+(3.022), (I-338)+(1.050)+(3.023), (I-338)+(1.050)+(3.024), (I-338)+(1.050)+(3.025), (I-338)+(1.050)+(3.026), (I-338)+(1.050)+(3.027), (I-338)+(1.050)+(3.028), (I-338)+(1.050)+(3.029), (I-338)+(1.050)+(3.030), (I-338)+(1.050)+(3.031), (I-338)+(1.050)+(5.001), (I-338)+(1.050)+(5.002), (I-338)+(1.050)+(5.003), (I-338)+(1.050)+(5.004), (I-338)+(1.050)+(5.005), (I-338)+(1.050)+(5.006), (I-338)+(1.050)+(5.007), (I-338)+(1.050)+(5.008), (I-338)+(1.050)+(5.009), (I-338)+(1.050)+(5.010), (I-338)+(1.050)+(5.011), (I-338)+(1.050)+(5.012), (I-338)+(1.050)+(5.013), (I-338)+(1.050)+(5.014), (I-338)+(1.050)+(5.015), (I-338)+(1.050)+(5.016), (I-338)+(1.050)+(5.017), (I-338)+(1.050)+(5.018), (I-338)+(1.050)+(5.019), (I-338)+(1.050)+(5.020), (I-338)+(1.050)+(5.021), (I-338)+(1.050)+(5.022), (I-338)+(1.050)+(5.023), (I-338)+(1.050)+(6.001), (I-338)+(1.050)+(6.002), (I-338)+(1.050)+(6.003), (I-338)+(1.050)+(6.004), (I-338)+(1.050)+(7.001), (I-338)+(1.050)+(7.002), (I-338)+(1.050)+(7.003), (I-338)+(1.050)+(7.004), (I-338)+(1.050)+(7.005), (I-338)+(1.050)+(7.006), (I-338)+(1.050)+(9.001), (I-338)+(1.050)+(9.002), (I-338)+(1.050)+(9.003), (I-338)+(1.050)+(9.004), (I-338)+(1.050)+(9.005), (I-338)+(1.050)+(9.006), (I-338)+(1.050)+(9.007), (I-338)+(1.050)+(9.008), (I-338)+(1.050)+(9.009), (I-338)+(1.050)+(14.001), (I-338)+(1.050)+(14.002), (I-338)+(1.050)+(15.008), (I-338)+(1.050)+(15.011), (I-338)+(1.050)+(15.012), (I-338)+(1.050)+(15.016), (I-338)+(1.050)+(15.025), (I-338)+(1.050)+(15.027), (I-338)+(1.050)+(15.047), (I-338)+(1.050)+(15.063), (I-338)+(1.050)+(15.064), (I-338)+(1.050)+(16.001), (I-338)+(1.050)+(16.002), (I-338)+(1.050)+(16.003), (I-338)+(1.050)+(16.004), (I-338)+(1.050)+(16.005), (I-338)+(1.050)+(16.006), (I-338)+(1.050)+(16.007), (I-338)+(1.050)+(16.008), (I-338)+(1.050)+(17.001), (I-338)+(1.050)+(17.002), (I-338)+(1.050)+(17.003), (I-338)+(1.050)+(17.004), (I-338)+(1.050)+(17.005), (I-338)+(1.050)+(17.006), (I-338)+(1.050)+(17.007), (I-338)+(1.050)+(17.008), (I-338)+(1.050)+(17.009), (I-338)+(1.050)+(17.010), (I-338)+(1.050)+(17.011), (I-338)+(1.050)+(17.012), (I-338)+(1.050)+(18.001), (I-338)+(1.051)+(1.052), (I-338)+(1.051)+(1.053), (I-338)+(1.051)+(1.054), (I-338)+(1.051)+(1.055), (I-338)+(1.051)+(1.056), (I-338)+(1.051)+(1.057), (I-338)+(1.051)+(1.058), (I-338)+(1.051)+(1.059), (I-338)+(1.051)+(1.060), (I-338)+(1.051)+(1.061), (I-338)+(1.051)+(1.062), (I-338)+(1.051)+(1.063), (I-338)+(1.051)+(1.064), (I-338)+(1.051)+(1.065), (I-338)+(1.051)+(1.066), (I-338)+(1.051)+(1.067), (I-338)+(1.051)+(1.068), (I-338)+(1.051)+(1.069), (I-338)+(1.051)+(1.070), (I-338)+(1.051)+(1.071), (I-338)+(1.051)+(1.072), (I-338)+(1.051)+(1.073), (I-338)+(1.051)+(1.074), (I-338)+(1.051)+(1.075), (I-338)+(1.051)+(1.076), (I-338)+(1.051)+(1.077), (I-338)+(1.051)+(1.078), (I-338)+(1.051)+(1.079), (I-338)+(1.051)+(1.080), (I-338)+(1.051)+(1.081), (I-338)+(1.051)+(1.082), (I-338)+(1.051)+(1.083), (I-338)+(1.051)+(1.084), (I-338)+(1.051)+(1.085), (I-338)+(1.051)+(1.086), (I-338)+(1.051)+(1.087), (I-338)+(1.051)+(1.088), (I-338)+(1.051)+(1.089), (I-338)+(1.051)+(1.090), (I-338)+(1.051)+(1.091), (I-338)+(1.051)+(1.092), (I-338)+(1.051)+(2.001), (I-338)+(1.051)+(2.002), (I-338)+(1.051)+(2.003), (I-338)+(1.051)+(2.004), (I-338)+(1.051)+(2.005), (I-338)+(1.051)+(2.006), (I-338)+(1.051)+(2.007), (I-338)+(1.051)+(2.008), (I-338)+(1.051)+(2.009), (I-338)+(1.051)+(2.010), (I-338)+(1.051)+(2.011), (I-338)+(1.051)+(2.012), (I-338)+(1.051)+(2.013), (I-338)+(1.051)+(2.014), (I-338)+(1.051)+(2.015), (I-338)+(1.051)+(2.016), (I-338)+(1.051)+(2.017), (I-338)+(1.051)+(2.018), (I-338)+(1.051)+(2.019), (I-338)+(1.051)+(2.020), (I-338)+(1.051)+(2.021), (I-338)+(1.051)+(2.022), (I-338)+(1.051)+(2.023), (I-338)+(1.051)+(2.024), (I-338)+(1.051)+(2.025), (I-338)+(1.051)+(2.026), (I-338)+(1.051)+(2.027), (I-338)+(1.051)+(2.028), (I-338)+(1.051)+(2.029), (I-338)+(1.051)+(2.030), (I-338)+(1.051)+(2.031), (I-338)+(1.051)+(2.032), (I-338)+(1.051)+(2.033), (I-338)+(1.051)+(2.034), (I-338)+(1.051)+(2.035), (I-338)+(1.051)+(2.036), (I-338)+(1.051)+(2.037), (I-338)+(1.051)+(2.038), (I-338)+(1.051)+(2.039), (I-338)+(1.051)+(2.040), (I-338)+(1.051)+(2.041), (I-338)+(1.051)+(2.042), (I-338)+(1.051)+(2.043), (I-338)+(1.051)+(2.044), (I-338)+(1.051)+(2.045), (I-338)+(1.051)+(2.046), (I-338)+(1.051)+(2.047), (I-338)+(1.051)+(2.048), (I-338)+(1.051)+(2.049), (I-338)+(1.051)+(2.050), (I-338)+(1.051)+(2.051), (I-338)+(1.051)+(2.052), (I-338)+(1.051)+(2.053), (I-338)+(1.051)+(2.054), (I-338)+(1.051)+(2.055), (I-338)+(1.051)+(2.056), (I-338)+(1.051)+(2.057), (I-338)+(1.051)+(2.058), (I-338)+(1.051)+(2.059), (I-338)+(1.051)+(3.001), (I-338)+(1.051)+(3.002), (I-338)+(1.051)+(3.003), (I-338)+(1.051)+(3.004), (I-338)+(1.051)+(3.005), (I-338)+(1.051)+(3.006), (I-338)+(1.051)+(3.007), (I-338)+(1.051)+(3.008), (I-338)+(1.051)+(3.009), (I-338)+(1.051)+(3.010), (I-338)+(1.051)+(3.011), (I-338)+(1.051)+(3.012), (I-338)+(1.051)+(3.013), (I-338)+(1.051)+(3.014), (I-338)+(1.051)+(3.015), (I-338)+(1.051)+(3.016), (I-338)+(1.051)+(3.017), (I-338)+(1.051)+(3.018), (I-338)+(1.051)+(3.019), (I-338)+(1.051)+(3.020), (I-338)+(1.051)+(3.021), (I-338)+(1.051)+(3.022), (I-338)+(1.051)+(3.023), (I-338)+(1.051)+(3.024), (I-338)+(1.051)+(3.025), (I-338)+(1.051)+(3.026), (I-338)+(1.051)+(3.027), (I-338)+(1.051)+(3.028), (I-338)+(1.051)+(3.029), (I-338)+(1.051)+(3.030), (I-338)+(1.051)+(3.031), (I-338)+(1.051)+(5.001), (I-338)+(1.051)+(5.002), (I-338)+(1.051)+(5.003), (I-338)+(1.051)+(5.004), (I-338)+(1.051)+(5.005), (I-338)+(1.051)+(5.006), (I-338)+(1.051)+(5.007), (I-338)+(1.051)+(5.008), (I-338)+(1.051)+(5.009), (I-338)+(1.051)+(5.010), (I-338)+(1.051)+(5.011), (I-338)+(1.051)+(5.012), (I-338)+(1.051)+(5.013), (I-338)+(1.051)+(5.014), (I-338)+(1.051)+(5.015), (I-338)+(1.051)+(5.016), (I-338)+(1.051)+(5.017), (I-338)+(1.051)+(5.018), (I-338)+(1.051)+(5.019), (I-338)+(1.051)+(5.020), (I-338)+(1.051)+(5.021), (I-338)+(1.051)+(5.022), (I-338)+(1.051)+(5.023), (I-338)+(1.051)+(6.001), (I-338)+(1.051)+(6.002), (I-338)+(1.051)+(6.003), (I-338)+(1.051)+(6.004), (I-338)+(1.051)+(7.001), (I-338)+(1.051)+(7.002), (I-338)+(1.051)+(7.003), (I-338)+(1.051)+(7.004), (I-338)+(1.051)+(7.005), (I-338)+(1.051)+(7.006), (I-338)+(1.051)+(9.001), (I-338)+(1.051)+(9.002), (I-338)+(1.051)+(9.003), (I-338)+(1.051)+(9.004), (I-338)+(1.051)+(9.005), (I-338)+(1.051)+(9.006), (I-338)+(1.051)+(9.007), (I-338)+(1.051)+(9.008), (I-338)+(1.051)+(9.009), (I-338)+(1.051)+(14.001), (I-338)+(1.051)+(14.002), (I-338)+(1.051)+(15.008), (I-338)+(1.051)+(15.011), (I-338)+(1.051)+(15.012), (I-338)+(1.051)+(15.016), (I-338)+(1.051)+(15.025), (I-338)+(1.051)+(15.027), (I-338)+(1.051)+(15.047), (I-338)+(1.051)+(15.063), (I-338)+(1.051)+(15.064), (I-338)+(1.051)+(16.001), (I-338)+(1.051)+(16.002), (I-338)+(1.051)+(16.003), (I-338)+(1.051)+(16.004), (I-338)+(1.051)+(16.005), (I-338)+(1.051)+(16.006), (I-338)+(1.051)+(16.007), (I-338)+(1.051)+(16.008), (I-338)+(1.051)+(17.001), (I-338)+(1.051)+(17.002), (I-338)+(1.051)+(17.003), (I-338)+(1.051)+(17.004), (I-338)+(1.051)+(17.005), (I-338)+(1.051)+(17.006), (I-338)+(1.051)+(17.007), (I-338)+(1.051)+(17.008), (I-338)+(1.051)+(17.009), (I-338)+(1.051)+(17.010), (I-338)+(1.051)+(17.011), (I-338)+(1.051)+(17.012), (I-338)+(1.051)+(18.001), (I-338)+(1.052)+(1.053), (I-338)+(1.052)+(1.054), (I-338)+(1.052)+(1.055), (I-338)+(1.052)+(1.056), (I-338)+(1.052)+(1.057), (I-338)+(1.052)+(1.058), (I-338)+(1.052)+(1.059), (I-338)+(1.052)+(1.060), (I-338)+(1.052)+(1.061), (I-338)+(1.052)+(1.062), (I-338)+(1.052)+(1.063), (I-338)+(1.052)+(1.064), (I-338)+(1.052)+(1.065), (I-338)+(1.052)+(1.066), (I-338)+(1.052)+(1.067), (I-338)+(1.052)+(1.068), (I-338)+(1.052)+(1.069), (I-338)+(1.052)+(1.070), (I-338)+(1.052)+(1.071), (I-338)+(1.052)+(1.072), (I-338)+(1.052)+(1.073), (I-338)+(1.052)+(1.074), (I-338)+(1.052)+(1.075), (I-338)+(1.052)+(1.076), (I-338)+(1.052)+(1.077), (I-338)+(1.052)+(1.078), (I-338)+(1.052)+(1.079), (I-338)+(1.052)+(1.080), (I-338)+(1.052)+(1.081), (I-338)+(1.052)+(1.082), (I-338)+(1.052)+(1.083), (I-338)+(1.052)+(1.084), (I-338)+(1.052)+(1.085), (I-338)+(1.052)+(1.086), (I-338)+(1.052)+(1.087), (I-338)+(1.052)+(1.088), (I-338)+(1.052)+(1.089), (I-338)+(1.052)+(1.090), (I-338)+(1.052)+(1.091), (I-338)+(1.052)+(1.092), (I-338)+(1.052)+(2.001), (I-338)+(1.052)+(2.002), (I-338)+(1.052)+(2.003), (I-338)+(1.052)+(2.004), (I-338)+(1.052)+(2.005), (I-338)+(1.052)+(2.006), (I-338)+(1.052)+(2.007), (I-338)+(1.052)+(2.008), (I-338)+(1.052)+(2.009), (I-338)+(1.052)+(2.010), (I-338)+(1.052)+(2.011), (I-338)+(1.052)+(2.012), (I-338)+(1.052)+(2.013), (I-338)+(1.052)+(2.014), (I-338)+(1.052)+(2.015), (I-338)+(1.052)+(2.016), (I-338)+(1.052)+(2.017), (I-338)+(1.052)+(2.018), (I-338)+(1.052)+(2.019), (I-338)+(1.052)+(2.020), (I-338)+(1.052)+(2.021), (I-338)+(1.052)+(2.022), (I-338)+(1.052)+(2.023), (I-338)+(1.052)+(2.024), (I-338)+(1.052)+(2.025), (I-338)+(1.052)+(2.026), (I-338)+(1.052)+(2.027), (I-338)+(1.052)+(2.028), (I-338)+(1.052)+(2.029), (I-338)+(1.052)+(2.030), (I-338)+(1.052)+(2.031), (I-338)+(1.052)+(2.032), (I-338)+(1.052)+(2.033), (I-338)+(1.052)+(2.034), (I-338)+(1.052)+(2.035), (I-338)+(1.052)+(2.036), (I-338)+(1.052)+(2.037), (I-338)+(1.052)+(2.038), (I-338)+(1.052)+(2.039), (I-338)+(1.052)+(2.040), (I-338)+(1.052)+(2.041), (I-338)+(1.052)+(2.042), (I-338)+(1.052)+(2.043), (I-338)+(1.052)+(2.044), (I-338)+(1.052)+(2.045), (I-338)+(1.052)+(2.046), (I-338)+(1.052)+(2.047), (I-338)+(1.052)+(2.048), (I-338)+(1.052)+(2.049), (I-338)+(1.052)+(2.050), (I-338)+(1.052)+(2.051), (I-338)+(1.052)+(2.052), (I-338)+(1.052)+(2.053), (I-338)+(1.052)+(2.054), (I-338)+(1.052)+(2.055), (I-338)+(1.052)+(2.056), (I-338)+(1.052)+(2.057), (I-338)+(1.052)+(2.058), (I-338)+(1.052)+(2.059), (I-338)+(1.052)+(3.001), (I-338)+(1.052)+(3.002), (I-338)+(1.052)+(3.003), (I-338)+(1.052)+(3.004), (I-338)+(1.052)+(3.005), (I-338)+(1.052)+(3.006), (I-338)+(1.052)+(3.007), (I-338)+(1.052)+(3.008), (I-338)+(1.052)+(3.009), (I-338)+(1.052)+(3.010), (I-338)+(1.052)+(3.011), (I-338)+(1.052)+(3.012), (I-338)+(1.052)+(3.013), (I-338)+(1.052)+(3.014), (I-338)+(1.052)+(3.015), (I-338)+(1.052)+(3.016), (I-338)+(1.052)+(3.017), (I-338)+(1.052)+(3.018), (I-338)+(1.052)+(3.019), (I-338)+(1.052)+(3.020), (I-338)+(1.052)+(3.021), (I-338)+(1.052)+(3.022), (I-338)+(1.052)+(3.023), (I-338)+(1.052)+(3.024), (I-338)+(1.052)+(3.025), (I-338)+(1.052)+(3.026), (I-338)+(1.052)+(3.027), (I-338)+(1.052)+(3.028), (I-338)+(1.052)+(3.029), (I-338)+(1.052)+(3.030), (I-338)+(1.052)+(3.031), (I-338)+(1.052)+(5.001), (I-338)+(1.052)+(5.002), (I-338)+(1.052)+(5.003), (I-338)+(1.052)+(5.004), (I-338)+(1.052)+(5.005), (I-338)+(1.052)+(5.006), (I-338)+(1.052)+(5.007), (I-338)+(1.052)+(5.008), (I-338)+(1.052)+(5.009), (I-338)+(1.052)+(5.010), (I-338)+(1.052)+(5.011), (I-338)+(1.052)+(5.012), (I-338)+(1.052)+(5.013), (I-338)+(1.052)+(5.014), (I-338)+(1.052)+(5.015), (I-338)+(1.052)+(5.016), (I-338)+(1.052)+(5.017), (I-338)+(1.052)+(5.018), (I-338)+(1.052)+(5.019), (I-338)+(1.052)+(5.020), (I-338)+(1.052)+(5.021), (I-338)+(1.052)+(5.022), (I-338)+(1.052)+(5.023), (I-338)+(1.052)+(6.001), (I-338)+(1.052)+(6.002), (I-338)+(1.052)+(6.003), (I-338)+(1.052)+(6.004), (I-338)+(1.052)+(7.001), (I-338)+(1.052)+(7.002), (I-338)+(1.052)+(7.003), (I-338)+(1.052)+(7.004), (I-338)+(1.052)+(7.005), (I-338)+(1.052)+(7.006), (I-338)+(1.052)+(9.001), (I-338)+(1.052)+(9.002), (I-338)+(1.052)+(9.003), (I-338)+(1.052)+(9.004), (I-338)+(1.052)+(9.005), (I-338)+(1.052)+(9.006), (I-338)+(1.052)+(9.007), (I-338)+(1.052)+(9.008), (I-338)+(1.052)+(9.009), (I-338)+(1.052)+(14.001), (I-338)+(1.052)+(14.002), (I-338)+(1.052)+(15.008), (I-338)+(1.052)+(15.011), (I-338)+(1.052)+(15.012), (I-338)+(1.052)+(15.016), (I-338)+(1.052)+(15.025), (I-338)+(1.052)+(15.027), (I-338)+(1.052)+(15.047), (I-338)+(1.052)+(15.063), (I-338)+(1.052)+(15.064), (I-338)+(1.052)+(16.001), (I-338)+(1.052)+(16.002), (I-338)+(1.052)+(16.003), (I-338)+(1.052)+(16.004), (I-338)+(1.052)+(16.005), (I-338)+(1.052)+(16.006), (I-338)+(1.052)+(16.007), (I-338)+(1.052)+(16.008), (I-338)+(1.052)+(17.001), (I-338)+(1.052)+(17.002), (I-338)+(1.052)+(17.003), (I-338)+(1.052)+(17.004), (I-338)+(1.052)+(17.005), (I-338)+(1.052)+(17.006), (I-338)+(1.052)+(17.007), (I-338)+(1.052)+(17.008), (I-338)+(1.052)+(17.009), (I-338)+(1.052)+(17.010), (I-338)+(1.052)+(17.011), (I-338)+(1.052)+(17.012), (I-338)+(1.052)+(18.001), (I-338)+(1.053)+(1.054), (I-338)+(1.053)+(1.055), (I-338)+(1.053)+(1.056), (I-338)+(1.053)+(1.057), (I-338)+(1.053)+(1.058), (I-338)+(1.053)+(1.059), (I-338)+(1.053)+(1.060), (I-338)+(1.053)+(1.061), (I-338)+(1.053)+(1.062), (I-338)+(1.053)+(1.063), (I-338)+(1.053)+(1.064), (I-338)+(1.053)+(1.065), (I-338)+(1.053)+(1.066), (I-338)+(1.053)+(1.067), (I-338)+(1.053)+(1.068), (I-338)+(1.053)+(1.069), (I-338)+(1.053)+(1.070), (I-338)+(1.053)+(1.071), (I-338)+(1.053)+(1.072), (I-338)+(1.053)+(1.073), (I-338)+(1.053)+(1.074), (I-338)+(1.053)+(1.075), (I-338)+(1.053)+(1.076), (I-338)+(1.053)+(1.077), (I-338)+(1.053)+(1.078), (I-338)+(1.053)+(1.079), (I-338)+(1.053)+(1.080), (I-338)+(1.053)+(1.081), (I-338)+(1.053)+(1.082), (I-338)+(1.053)+(1.083), (I-338)+(1.053)+(1.084), (I-338)+(1.053)+(1.085), (I-338)+(1.053)+(1.086), (I-338)+(1.053)+(1.087), (I-338)+(1.053)+(1.088), (I-338)+(1.053)+(1.089), (I-338)+(1.053)+(1.090), (I-338)+(1.053)+(1.091), (I-338)+(1.053)+(1.092), (I-338)+(1.053)+(2.001), (I-338)+(1.053)+(2.002), (I-338)+(1.053)+(2.003), (I-338)+(1.053)+(2.004), (I-338)+(1.053)+(2.005), (I-338)+(1.053)+(2.006), (I-338)+(1.053)+(2.007), (I-338)+(1.053)+(2.008), (I-338)+(1.053)+(2.009), (I-338)+(1.053)+(2.010), (I-338)+(1.053)+(2.011), (I-338)+(1.053)+(2.012), (I-338)+(1.053)+(2.013), (I-338)+(1.053)+(2.014), (I-338)+(1.053)+(2.015), (I-338)+(1.053)+(2.016), (I-338)+(1.053)+(2.017), (I-338)+(1.053)+(2.018), (I-338)+(1.053)+(2.019), (I-338)+(1.053)+(2.020), (I-338)+(1.053)+(2.021), (I-338)+(1.053)+(2.022), (I-338)+(1.053)+(2.023), (I-338)+(1.053)+(2.024), (I-338)+(1.053)+(2.025), (I-338)+(1.053)+(2.026), (I-338)+(1.053)+(2.027), (I-338)+(1.053)+(2.028), (I-338)+(1.053)+(2.029), (I-338)+(1.053)+(2.030), (I-338)+(1.053)+(2.031), (I-338)+(1.053)+(2.032), (I-338)+(1.053)+(2.033), (I-338)+(1.053)+(2.034), (I-338)+(1.053)+(2.035), (I-338)+(1.053)+(2.036), (I-338)+(1.053)+(2.037), (I-338)+(1.053)+(2.038), (I-338)+(1.053)+(2.039), (I-338)+(1.053)+(2.040), (I-338)+(1.053)+(2.041), (I-338)+(1.053)+(2.042), (I-338)+(1.053)+(2.043), (I-338)+(1.053)+(2.044), (I-338)+(1.053)+(2.045), (I-338)+(1.053)+(2.046), (I-338)+(1.053)+(2.047), (I-338)+(1.053)+(2.048), (I-338)+(1.053)+(2.049), (I-338)+(1.053)+(2.050), (I-338)+(1.053)+(2.051), (I-338)+(1.053)+(2.052), (I-338)+(1.053)+(2.053), (I-338)+(1.053)+(2.054), (I-338)+(1.053)+(2.055), (I-338)+(1.053)+(2.056), (I-338)+(1.053)+(2.057), (I-338)+(1.053)+(2.058), (I-338)+(1.053)+(2.059), (I-338)+(1.053)+(3.001), (I-338)+(1.053)+(3.002), (I-338)+(1.053)+(3.003), (I-338)+(1.053)+(3.004), (I-338)+(1.053)+(3.005), (I-338)+(1.053)+(3.006), (I-338)+(1.053)+(3.007), (I-338)+(1.053)+(3.008), (I-338)+(1.053)+(3.009), (I-338)+(1.053)+(3.010), (I-338)+(1.053)+(3.011), (I-338)+(1.053)+(3.012), (I-338)+(1.053)+(3.013), (I-338)+(1.053)+(3.014), (I-338)+(1.053)+(3.015), (I-338)+(1.053)+(3.016), (I-338)+(1.053)+(3.017), (I-338)+(1.053)+(3.018), (I-338)+(1.053)+(3.019), (I-338)+(1.053)+(3.020), (I-338)+(1.053)+(3.021), (I-338)+(1.053)+(3.022), (I-338)+(1.053)+(3.023), (I-338)+(1.053)+(3.024), (I-338)+(1.053)+(3.025), (I-338)+(1.053)+(3.026), (I-338)+(1.053)+(3.027), (I-338)+(1.053)+(3.028), (I-338)+(1.053)+(3.029), (I-338)+(1.053)+(3.030), (I-338)+(1.053)+(3.031), (I-338)+(1.053)+(5.001), (I-338)+(1.053)+(5.002), (I-338)+(1.053)+(5.003), (I-338)+(1.053)+(5.004), (I-338)+(1.053)+(5.005), (I-338)+(1.053)+(5.006), (I-338)+(1.053)+(5.007), (I-338)+(1.053)+(5.008), (I-338)+(1.053)+(5.009), (I-338)+(1.053)+(5.010), (I-338)+(1.053)+(5.011), (I-338)+(1.053)+(5.012), (I-338)+(1.053)+(5.013), (I-338)+(1.053)+(5.014), (I-338)+(1.053)+(5.015), (I-338)+(1.053)+(5.016), (I-338)+(1.053)+(5.017), (I-338)+(1.053)+(5.018), (I-338)+(1.053)+(5.019), (I-338)+(1.053)+(5.020), (I-338)+(1.053)+(5.021), (I-338)+(1.053)+(5.022), (I-338)+(1.053)+(5.023), (I-338)+(1.053)+(6.001), (I-338)+(1.053)+(6.002), (I-338)+(1.053)+(6.003), (I-338)+(1.053)+(6.004), (I-338)+(1.053)+(7.001), (I-338)+(1.053)+(7.002), (I-338)+(1.053)+(7.003), (I-338)+(1.053)+(7.004), (I-338)+(1.053)+(7.005), (I-338)+(1.053)+(7.006), (I-338)+(1.053)+(9.001), (I-338)+(1.053)+(9.002), (I-338)+(1.053)+(9.003), (I-338)+(1.053)+(9.004), (I-338)+(1.053)+(9.005), (I-338)+(1.053)+(9.006), (I-338)+(1.053)+(9.007), (I-338)+(1.053)+(9.008), (I-338)+(1.053)+(9.009), (I-338)+(1.053)+(14.001), (I-338)+(1.053)+(14.002), (I-338)+(1.053)+(15.008), (I-338)+(1.053)+(15.011), (I-338)+(1.053)+(15.012), (I-338)+(1.053)+(15.016), (I-338)+(1.053)+(15.025), (I-338)+(1.053)+(15.027), (I-338)+(1.053)+(15.047), (I-338)+(1.053)+(15.063), (I-338)+(1.053)+(15.064), (I-338)+(1.053)+(16.001), (I-338)+(1.053)+(16.002), (I-338)+(1.053)+(16.003), (I-338)+(1.053)+(16.004), (I-338)+(1.053)+(16.005), (I-338)+(1.053)+(16.006), (I-338)+(1.053)+(16.007), (I-338)+(1.053)+(16.008), (I-338)+(1.053)+(17.001), (I-338)+(1.053)+(17.002), (I-338)+(1.053)+(17.003), (I-338)+(1.053)+(17.004), (I-338)+(1.053)+(17.005), (I-338)+(1.053)+(17.006), (I-338)+(1.053)+(17.007), (I-338)+(1.053)+(17.008), (I-338)+(1.053)+(17.009), (I-338)+(1.053)+(17.010), (I-338)+(1.053)+(17.011), (I-338)+(1.053)+(17.012), (I-338)+(1.053)+(18.001), (I-338)+(1.054)+(1.055), (I-338)+(1.054)+(1.056), (I-338)+(1.054)+(1.057), (I-338)+(1.054)+(1.058), (I-338)+(1.054)+(1.059), (I-338)+(1.054)+(1.060), (I-338)+(1.054)+(1.061), (I-338)+(1.054)+(1.062), (I-338)+(1.054)+(1.063), (I-338)+(1.054)+(1.064), (I-338)+(1.054)+(1.065), (I-338)+(1.054)+(1.066), (I-338)+(1.054)+(1.067), (I-338)+(1.054)+(1.068), (I-338)+(1.054)+(1.069), (I-338)+(1.054)+(1.070), (I-338)+(1.054)+(1.071), (I-338)+(1.054)+(1.072), (I-338)+(1.054)+(1.073), (I-338)+(1.054)+(1.074), (I-338)+(1.054)+(1.075), (I-338)+(1.054)+(1.076), (I-338)+(1.054)+(1.077), (I-338)+(1.054)+(1.078), (I-338)+(1.054)+(1.079), (I-338)+(1.054)+(1.080), (I-338)+(1.054)+(1.081), (I-338)+(1.054)+(1.082), (I-338)+(1.054)+(1.083), (I-338)+(1.054)+(1.084), (I-338)+(1.054)+(1.085), (I-338)+(1.054)+(1.086), (I-338)+(1.054)+(1.087), (I-338)+(1.054)+(1.088), (I-338)+(1.054)+(1.089), (I-338)+(1.054)+(1.090), (I-338)+(1.054)+(1.091), (I-338)+(1.054)+(1.092), (I-338)+(1.054)+(2.001), (I-338)+(1.054)+(2.002), (I-338)+(1.054)+(2.003), (I-338)+(1.054)+(2.004), (I-338)+(1.054)+(2.005), (I-338)+(1.054)+(2.006), (I-338)+(1.054)+(2.007), (I-338)+(1.054)+(2.008), (I-338)+(1.054)+(2.009), (I-338)+(1.054)+(2.010), (I-338)+(1.054)+(2.011), (I-338)+(1.054)+(2.012), (I-338)+(1.054)+(2.013), (I-338)+(1.054)+(2.014), (I-338)+(1.054)+(2.015), (I-338)+(1.054)+(2.016), (I-338)+(1.054)+(2.017), (I-338)+(1.054)+(2.018), (I-338)+(1.054)+(2.019), (I-338)+(1.054)+(2.020), (I-338)+(1.054)+(2.021), (I-338)+(1.054)+(2.022), (I-338)+(1.054)+(2.023), (I-338)+(1.054)+(2.024), (I-338)+(1.054)+(2.025), (I-338)+(1.054)+(2.026), (I-338)+(1.054)+(2.027), (I-338)+(1.054)+(2.028), (I-338)+(1.054)+(2.029), (I-338)+(1.054)+(2.030), (I-338)+(1.054)+(2.031), (I-338)+(1.054)+(2.032), (I-338)+(1.054)+(2.033), (I-338)+(1.054)+(2.034), (I-338)+(1.054)+(2.035), (I-338)+(1.054)+(2.036), (I-338)+(1.054)+(2.037), (I-338)+(1.054)+(2.038), (I-338)+(1.054)+(2.039), (I-338)+(1.054)+(2.040), (I-338)+(1.054)+(2.041), (I-338)+(1.054)+(2.042), (I-338)+(1.054)+(2.043), (I-338)+(1.054)+(2.044), (I-338)+(1.054)+(2.045), (I-338)+(1.054)+(2.046), (I-338)+(1.054)+(2.047), (I-338)+(1.054)+(2.048), (I-338)+(1.054)+(2.049), (I-338)+(1.054)+(2.050), (I-338)+(1.054)+(2.051), (I-338)+(1.054)+(2.052), (I-338)+(1.054)+(2.053), (I-338)+(1.054)+(2.054), (I-338)+(1.054)+(2.055), (I-338)+(1.054)+(2.056), (I-338)+(1.054)+(2.057), (I-338)+(1.054)+(2.058), (I-338)+(1.054)+(2.059), (I-338)+(1.054)+(3.001), (I-338)+(1.054)+(3.002), (I-338)+(1.054)+(3.003), (I-338)+(1.054)+(3.004), (I-338)+(1.054)+(3.005), (I-338)+(1.054)+(3.006), (I-338)+(1.054)+(3.007), (I-338)+(1.054)+(3.008), (I-338)+(1.054)+(3.009), (I-338)+(1.054)+(3.010), (I-338)+(1.054)+(3.011), (I-338)+(1.054)+(3.012), (I-338)+(1.054)+(3.013), (I-338)+(1.054)+(3.014), (I-338)+(1.054)+(3.015), (I-338)+(1.054)+(3.016), (I-338)+(1.054)+(3.017), (I-338)+(1.054)+(3.018), (I-338)+(1.054)+(3.019), (I-338)+(1.054)+(3.020), (I-338)+(1.054)+(3.021), (I-338)+(1.054)+(3.022), (I-338)+(1.054)+(3.023), (I-338)+(1.054)+(3.024), (I-338)+(1.054)+(3.025), (I-338)+(1.054)+(3.026), (I-338)+(1.054)+(3.027), (I-338)+(1.054)+(3.028), (I-338)+(1.054)+(3.029), (I-338)+(1.054)+(3.030), (I-338)+(1.054)+(3.031), (I-338)+(1.054)+(5.001), (I-338)+(1.054)+(5.002), (I-338)+(1.054)+(5.003), (I-338)+(1.054)+(5.004), (I-338)+(1.054)+(5.005), (I-338)+(1.054)+(5.006), (I-338)+(1.054)+(5.007), (I-338)+(1.054)+(5.008), (I-338)+(1.054)+(5.009), (I-338)+(1.054)+(5.010), (I-338)+(1.054)+(5.011), (I-338)+(1.054)+(5.012), (I-338)+(1.054)+(5.013), (I-338)+(1.054)+(5.014), (I-338)+(1.054)+(5.015), (I-338)+(1.054)+(5.016), (I-338)+(1.054)+(5.017), (I-338)+(1.054)+(5.018), (I-338)+(1.054)+(5.019), (I-338)+(1.054)+(5.020), (I-338)+(1.054)+(5.021), (I-338)+(1.054)+(5.022), (I-338)+(1.054)+(5.023), (I-338)+(1.054)+(6.001), (I-338)+(1.054)+(6.002), (I-338)+(1.054)+(6.003), (I-338)+(1.054)+(6.004), (I-338)+(1.054)+(7.001), (I-338)+(1.054)+(7.002), (I-338)+(1.054)+(7.003), (I-338)+(1.054)+(7.004), (I-338)+(1.054)+(7.005), (I-338)+(1.054)+(7.006), (I-338)+(1.054)+(9.001), (I-338)+(1.054)+(9.002), (I-338)+(1.054)+(9.003), (I-338)+(1.054)+(9.004), (I-338)+(1.054)+(9.005), (I-338)+(1.054)+(9.006), (I-338)+(1.054)+(9.007), (I-338)+(1.054)+(9.008), (I-338)+(1.054)+(9.009), (I-338)+(1.054)+(14.001), (I-338)+(1.054)+(14.002), (I-338)+(1.054)+(15.008), (I-338)+(1.054)+(15.011), (I-338)+(1.054)+(15.012), (I-338)+(1.054)+(15.016), (I-338)+(1.054)+(15.025), (I-338)+(1.054)+(15.027), (I-338)+(1.054)+(15.047), (I-338)+(1.054)+(15.063), (I-338)+(1.054)+(15.064), (I-338)+(1.054)+(16.001), (I-338)+(1.054)+(16.002), (I-338)+(1.054)+(16.003), (I-338)+(1.054)+(16.004), (I-338)+(1.054)+(16.005), (I-338)+(1.054)+(16.006), (I-338)+(1.054)+(16.007), (I-338)+(1.054)+(16.008), (I-338)+(1.054)+(17.001), (I-338)+(1.054)+(17.002), (I-338)+(1.054)+(17.003), (I-338)+(1.054)+(17.004), (I-338)+(1.054)+(17.005), (I-338)+(1.054)+(17.006), (I-338)+(1.054)+(17.007), (I-338)+(1.054)+(17.008), (I-338)+(1.054)+(17.009), (I-338)+(1.054)+(17.010), (I-338)+(1.054)+(17.011), (I-338)+(1.054)+(17.012), (I-338)+(1.054)+(18.001),
(I-338)+(1.055)+(1.056), (I-338)+(1.055)+(1.057), (I-338)+(1.055)+(1.058), (I-338)+(1.055)+(1.059), (I-338)+(1.055)+(1.060), (I-338)+(1.055)+(1.061), (I-338)+(1.055)+(1.062), (I-338)+(1.055)+(1.063), (I-338)+(1.055)+(1.064), (I-338)+(1.055)+(1.065), (I-338)+(1.055)+(1.066), (I-338)+(1.055)+(1.067), (I-338)+(1.055)+(1.068), (I-338)+(1.055)+(1.069), (I-338)+(1.055)+(1.070), (I-338)+(1.055)+(1.071), (I-338)+(1.055)+(1.072), (I-338)+(1.055)+(1.073), (I-338)+(1.055)+(1.074), (I-338)+(1.055)+(1.075), (I-338)+(1.055)+(1.076), (I-338)+(1.055)+(1.077), (I-338)+(1.055)+(1.078), (I-338)+(1.055)+(1.079), (I-338)+(1.055)+(1.080), (I-338)+(1.055)+(1.081), (I-338)+(1.055)+(1.082), (I-338)+(1.055)+(1.083), (I-338)+(1.055)+(1.084), (I-338)+(1.055)+(1.085), (I-338)+(1.055)+(1.086), (I-338)+(1.055)+(1.087), (I-338)+(1.055)+(1.088), (I-338)+(1.055)+(1.089), (I-338)+(1.055)+(1.090), (I-338)+(1.055)+(1.091), (I-338)+(1.055)+(1.092), (I-338)+(1.055)+(2.001), (I-338)+(1.055)+(2.002), (I-338)+(1.055)+(2.003), (I-338)+(1.055)+(2.004), (I-338)+(1.055)+(2.005), (I-338)+(1.055)+(2.006), (I-338)+(1.055)+(2.007), (I-338)+(1.055)+(2.008), (I-338)+(1.055)+(2.009), (I-338)+(1.055)+(2.010), (I-338)+(1.055)+(2.011), (I-338)+(1.055)+(2.012), (I-338)+(1.055)+(2.013), (I-338)+(1.055)+(2.014), (I-338)+(1.055)+(2.015), (I-338)+(1.055)+(2.016), (I-338)+(1.055)+(2.017), (I-338)+(1.055)+(2.018), (I-338)+(1.055)+(2.019), (I-338)+(1.055)+(2.020), (I-338)+(1.055)+(2.021), (I-338)+(1.055)+(2.022), (I-338)+(1.055)+(2.023), (I-338)+(1.055)+(2.024), (I-338)+(1.055)+(2.025), (I-338)+(1.055)+(2.026), (I-338)+(1.055)+(2.027), (I-338)+(1.055)+(2.028), (I-338)+(1.055)+(2.029), (I-338)+(1.055)+(2.030), (I-338)+(1.055)+(2.031), (I-338)+(1.055)+(2.032), (I-338)+(1.055)+(2.033), (I-338)+(1.055)+(2.034), (I-338)+(1.055)+(2.035), (I-338)+(1.055)+(2.036), (I-338)+(1.055)+(2.037), (I-338)+(1.055)+(2.038), (I-338)+(1.055)+(2.039), (I-338)+(1.055)+(2.040), (I-338)+(1.055)+(2.041), (I-338)+(1.055)+(2.042), (I-338)+(1.055)+(2.043), (I-338)+(1.055)+(2.044), (I-338)+(1.055)+(2.045), (I-338)+(1.055)+(2.046), (I-338)+(1.055)+(2.047), (I-338)+(1.055)+(2.048), (I-338)+(1.055)+(2.049), (I-338)+(1.055)+(2.050), (I-338)+(1.055)+(2.051), (I-338)+(1.055)+(2.052), (I-338)+(1.055)+(2.053), (I-338)+(1.055)+(2.054), (I-338)+(1.055)+(2.055), (I-338)+(1.055)+(2.056), (I-338)+(1.055)+(2.057), (I-338)+(1.055)+(2.058), (I-338)+(1.055)+(2.059), (I-338)+(1.055)+(3.001), (I-338)+(1.055)+(3.002), (I-338)+(1.055)+(3.003), (I-338)+(1.055)+(3.004), (I-338)+(1.055)+(3.005), (I-338)+(1.055)+(3.006), (I-338)+(1.055)+(3.007), (I-338)+(1.055)+(3.008), (I-338)+(1.055)+(3.009), (I-338)+(1.055)+(3.010), (I-338)+(1.055)+(3.011), (I-338)+(1.055)+(3.012), (I-338)+(1.055)+(3.013), (I-338)+(1.055)+(3.014), (I-338)+(1.055)+(3.015), (I-338)+(1.055)+(3.016), (I-338)+(1.055)+(3.017), (I-338)+(1.055)+(3.018), (I-338)+(1.055)+(3.019), (I-338)+(1.055)+(3.020), (I-338)+(1.055)+(3.021), (I-338)+(1.055)+(3.022), (I-338)+(1.055)+(3.023), (I-338)+(1.055)+(3.024), (I-338)+(1.055)+(3.025), (I-338)+(1.055)+(3.026), (I-338)+(1.055)+(3.027), (I-338)+(1.055)+(3.028), (I-338)+(1.055)+(3.029), (I-338)+(1.055)+(3.030), (I-338)+(1.055)+(3.031), (I-338)+(1.055)+(5.001), (I-338)+(1.055)+(5.002), (I-338)+(1.055)+(5.003), (I-338)+(1.055)+(5.004), (I-338)+(1.055)+(5.005), (I-338)+(1.055)+(5.006), (I-338)+(1.055)+(5.007), (I-338)+(1.055)+(5.008), (I-338)+(1.055)+(5.009), (I-338)+(1.055)+(5.010), (I-338)+(1.055)+(5.011), (I-338)+(1.055)+(5.012), (I-338)+(1.055)+(5.013), (I-338)+(1.055)+(5.014), (I-338)+(1.055)+(5.015), (I-338)+(1.055)+(5.016), (I-338)+(1.055)+(5.017), (I-338)+(1.055)+(5.018), (I-338)+(1.055)+(5.019), (I-338)+(1.055)+(5.020), (I-338)+(1.055)+(5.021), (I-338)+(1.055)+(5.022), (I-338)+(1.055)+(5.023), (I-338)+(1.055)+(6.001), (I-338)+(1.055)+(6.002), (I-338)+(1.055)+(6.003), (I-338)+(1.055)+(6.004), (I-338)+(1.055)+(7.001), (I-338)+(1.055)+(7.002), (I-338)+(1.055)+(7.003), (I-338)+(1.055)+(7.004), (I-338)+(1.055)+(7.005), (I-338)+(1.055)+(7.006), (I-338)+(1.055)+(9.001), (I-338)+(1.055)+(9.002), (I-338)+(1.055)+(9.003), (I-338)+(1.055)+(9.004), (I-338)+(1.055)+(9.005), (I-338)+(1.055)+(9.006), (I-338)+(1.055)+(9.007), (I-338)+(1.055)+(9.008), (I-338)+(1.055)+(9.009), (I-338)+(1.055)+(14.001), (I-338)+(1.055)+(14.002), (I-338)+(1.055)+(15.008), (I-338)+(1.055)+(15.011), (I-338)+(1.055)+(15.012), (I-338)+(1.055)+(15.016), (I-338)+(1.055)+(15.025), (I-338)+(1.055)+(15.027), (I-338)+(1.055)+(15.047), (I-338)+(1.055)+(15.063), (I-338)+(1.055)+(15.064), (I-338)+(1.055)+(16.001), (I-338)+(1.055)+(16.002), (I-338)+(1.055)+(16.003), (I-338)+(1.055)+(16.004), (I-338)+(1.055)+(16.005), (I-338)+(1.055)+(16.006), (I-338)+(1.055)+(16.007), (I-338)+(1.055)+(16.008), (I-338)+(1.055)+(17.001), (I-338)+(1.055)+(17.002), (I-338)+(1.055)+(17.003), (I-338)+(1.055)+(17.004), (I-338)+(1.055)+(17.005), (I-338)+(1.055)+(17.006), (I-338)+(1.055)+(17.007), (I-338)+(1.055)+(17.008), (I-338)+(1.055)+(17.009), (I-338)+(1.055)+(17.010), (I-338)+(1.055)+(17.011), (I-338)+(1.055)+(17.012), (I-338)+(1.055)+(18.001), (I-338)+(1.056)+(1.057), (I-338)+(1.056)+(1.058), (I-338)+(1.056)+(1.059), (I-338)+(1.056)+(1.060), (I-338)+(1.056)+(1.061), (I-338)+(1.056)+(1.062), (I-338)+(1.056)+(1.063), (I-338)+(1.056)+(1.064), (I-338)+(1.056)+(1.065), (I-338)+(1.056)+(1.066), (I-338)+(1.056)+(1.067), (I-338)+(1.056)+(1.068), (I-338)+(1.056)+(1.069), (I-338)+(1.056)+(1.070), (I-338)+(1.056)+(1.071), (I-338)+(1.056)+(1.072), (I-338)+(1.056)+(1.073), (I-338)+(1.056)+(1.074), (I-338)+(1.056)+(1.075), (I-338)+(1.056)+(1.076), (I-338)+(1.056)+(1.077), (I-338)+(1.056)+(1.078), (I-338)+(1.056)+(1.079), (I-338)+(1.056)+(1.080), (I-338)+(1.056)+(1.081), (I-338)+(1.056)+(1.082), (I-338)+(1.056)+(1.083), (I-338)+(1.056)+(1.084), (I-338)+(1.056)+(1.085), (I-338)+(1.056)+(1.086), (I-338)+(1.056)+(1.087), (I-338)+(1.056)+(1.088), (I-338)+(1.056)+(1.089), (I-338)+(1.056)+(1.090), (I-338)+(1.056)+(1.091), (I-338)+(1.056)+(1.092), (I-338)+(1.056)+(2.001), (I-338)+(1.056)+(2.002), (I-338)+(1.056)+(2.003), (I-338)+(1.056)+(2.004), (I-338)+(1.056)+(2.005), (I-338)+(1.056)+(2.006), (I-338)+(1.056)+(2.007), (I-338)+(1.056)+(2.008), (I-338)+(1.056)+(2.009), (I-338)+(1.056)+(2.010), (I-338)+(1.056)+(2.011), (I-338)+(1.056)+(2.012), (I-338)+(1.056)+(2.013), (I-338)+(1.056)+(2.014), (I-338)+(1.056)+(2.015), (I-338)+(1.056)+(2.016), (I-338)+(1.056)+(2.017), (I-338)+(1.056)+(2.018), (I-338)+(1.056)+(2.019), (I-338)+(1.056)+(2.020), (I-338)+(1.056)+(2.021), (I-338)+(1.056)+(2.022), (I-338)+(1.056)+(2.023), (I-338)+(1.056)+(2.024), (I-338)+(1.056)+(2.025), (I-338)+(1.056)+(2.026), (I-338)+(1.056)+(2.027), (I-338)+(1.056)+(2.028), (I-338)+(1.056)+(2.029), (I-338)+(1.056)+(2.030), (I-338)+(1.056)+(2.031), (I-338)+(1.056)+(2.032), (I-338)+(1.056)+(2.033), (I-338)+(1.056)+(2.034), (I-338)+(1.056)+(2.035), (I-338)+(1.056)+(2.036), (I-338)+(1.056)+(2.037), (I-338)+(1.056)+(2.038), (I-338)+(1.056)+(2.039), (I-338)+(1.056)+(2.040), (I-338)+(1.056)+(2.041), (I-338)+(1.056)+(2.042), (I-338)+(1.056)+(2.043), (I-338)+(1.056)+(2.044), (I-338)+(1.056)+(2.045), (I-338)+(1.056)+(2.046), (I-338)+(1.056)+(2.047), (I-338)+(1.056)+(2.048), (I-338)+(1.056)+(2.049), (I-338)+(1.056)+(2.050), (I-338)+(1.056)+(2.051), (I-338)+(1.056)+(2.052), (I-338)+(1.056)+(2.053), (I-338)+(1.056)+(2.054), (I-338)+(1.056)+(2.055), (I-338)+(1.056)+(2.056), (I-338)+(1.056)+(2.057), (I-338)+(1.056)+(2.058), (I-338)+(1.056)+(2.059), (I-338)+(1.056)+(3.001), (I-338)+(1.056)+(3.002), (I-338)+(1.056)+(3.003), (I-338)+(1.056)+(3.004), (I-338)+(1.056)+(3.005), (I-338)+(1.056)+(3.006), (I-338)+(1.056)+(3.007), (I-338)+(1.056)+(3.008), (I-338)+(1.056)+(3.009), (I-338)+(1.056)+(3.010), (I-338)+(1.056)+(3.011), (I-338)+(1.056)+(3.012), (I-338)+(1.056)+(3.013), (I-338)+(1.056)+(3.014), (I-338)+(1.056)+(3.015), (I-338)+(1.056)+(3.016), (I-338)+(1.056)+(3.017), (I-338)+(1.056)+(3.018), (I-338)+(1.056)+(3.019), (I-338)+(1.056)+(3.020), (I-338)+(1.056)+(3.021), (I-338)+(1.056)+(3.022), (I-338)+(1.056)+(3.023), (I-338)+(1.056)+(3.024), (I-338)+(1.056)+(3.025), (I-338)+(1.056)+(3.026), (I-338)+(1.056)+(3.027), (I-338)+(1.056)+(3.028), (I-338)+(1.056)+(3.029), (I-338)+(1.056)+(3.030), (I-338)+(1.056)+(3.031), (I-338)+(1.056)+(5.001), (I-338)+(1.056)+(5.002), (I-338)+(1.056)+(5.003), (I-338)+(1.056)+(5.004), (I-338)+(1.056)+(5.005), (I-338)+(1.056)+(5.006), (I-338)+(1.056)+(5.007), (I-338)+(1.056)+(5.008), (I-338)+(1.056)+(5.009), (I-338)+(1.056)+(5.010), (I-338)+(1.056)+(5.011), (I-338)+(1.056)+(5.012), (I-338)+(1.056)+(5.013), (I-338)+(1.056)+(5.014), (I-338)+(1.056)+(5.015), (I-338)+(1.056)+(5.016), (I-338)+(1.056)+(5.017), (I-338)+(1.056)+(5.018), (I-338)+(1.056)+(5.019), (I-338)+(1.056)+(5.020), (I-338)+(1.056)+(5.021), (I-338)+(1.056)+(5.022), (I-338)+(1.056)+(5.023), (I-338)+(1.056)+(6.001), (I-338)+(1.056)+(6.002), (I-338)+(1.056)+(6.003), (I-338)+(1.056)+(6.004), (I-338)+(1.056)+(7.001), (I-338)+(1.056)+(7.002), (I-338)+(1.056)+(7.003), (I-338)+(1.056)+(7.004), (I-338)+(1.056)+(7.005), (I-338)+(1.056)+(7.006), (I-338)+(1.056)+(9.001), (I-338)+(1.056)+(9.002), (I-338)+(1.056)+(9.003), (I-338)+(1.056)+(9.004), (I-338)+(1.056)+(9.005), (I-338)+(1.056)+(9.006), (I-338)+(1.056)+(9.007), (I-338)+(1.056)+(9.008), (I-338)+(1.056)+(9.009), (I-338)+(1.056)+(14.001), (I-338)+(1.056)+(14.002), (I-338)+(1.056)+(15.008), (I-338)+(1.056)+(15.011), (I-338)+(1.056)+(15.012), (I-338)+(1.056)+(15.016), (I-338)+(1.056)+(15.025), (I-338)+(1.056)+(15.027), (I-338)+(1.056)+(15.047), (I-338)+(1.056)+(15.063), (I-338)+(1.056)+(15.064), (I-338)+(1.056)+(16.001), (I-338)+(1.056)+(16.002), (I-338)+(1.056)+(16.003), (I-338)+(1.056)+(16.004), (I-338)+(1.056)+(16.005), (I-338)+(1.056)+(16.006), (I-338)+(1.056)+(16.007), (I-338)+(1.056)+(16.008), (I-338)+(1.056)+(17.001), (I-338)+(1.056)+(17.002), (I-338)+(1.056)+(17.003), (I-338)+(1.056)+(17.004), (I-338)+(1.056)+(17.005), (I-338)+(1.056)+(17.006), (I-338)+(1.056)+(17.007), (I-338)+(1.056)+(17.008), (I-338)+(1.056)+(17.009), (I-338)+(1.056)+(17.010), (I-338)+(1.056)+(17.011), (I-338)+(1.056)+(17.012), (I-338)+(1.056)+(18.001), (I-338)+(1.057)+(1.058), (I-338)+(1.057)+(1.059), (I-338)+(1.057)+(1.060), (I-338)+(1.057)+(1.061), (I-338)+(1.057)+(1.062), (I-338)+(1.057)+(1.063), (I-338)+(1.057)+(1.064), (I-338)+(1.057)+(1.065), (I-338)+(1.057)+(1.066), (I-338)+(1.057)+(1.067), (I-338)+(1.057)+(1.068), (I-338)+(1.057)+(1.069), (I-338)+(1.057)+(1.070), (I-338)+(1.057)+(1.071), (I-338)+(1.057)+(1.072), (I-338)+(1.057)+(1.073), (I-338)+(1.057)+(1.074), (I-338)+(1.057)+(1.075), (I-338)+(1.057)+(1.076), (I-338)+(1.057)+(1.077), (I-338)+(1.057)+(1.078), (I-338)+(1.057)+(1.079), (I-338)+(1.057)+(1.080), (I-338)+(1.057)+(1.081), (I-338)+(1.057)+(1.082), (I-338)+(1.057)+(1.083), (I-338)+(1.057)+(1.084), (I-338)+(1.057)+(1.085), (I-338)+(1.057)+(1.086), (I-338)+(1.057)+(1.087), (I-338)+(1.057)+(1.088), (I-338)+(1.057)+(1.089), (I-338)+(1.057)+(1.090), (I-338)+(1.057)+(1.091), (I-338)+(1.057)+(1.092), (I-338)+(1.057)+(2.001), (I-338)+(1.057)+(2.002), (I-338)+(1.057)+(2.003), (I-338)+(1.057)+(2.004), (I-338)+(1.057)+(2.005), (I-338)+(1.057)+(2.006), (I-338)+(1.057)+(2.007), (I-338)+(1.057)+(2.008), (I-338)+(1.057)+(2.009), (I-338)+(1.057)+(2.010), (I-338)+(1.057)+(2.011), (I-338)+(1.057)+(2.012), (I-338)+(1.057)+(2.013), (I-338)+(1.057)+(2.014), (I-338)+(1.057)+(2.015), (I-338)+(1.057)+(2.016), (I-338)+(1.057)+(2.017), (I-338)+(1.057)+(2.018), (I-338)+(1.057)+(2.019), (I-338)+(1.057)+(2.020), (I-338)+(1.057)+(2.021), (I-338)+(1.057)+(2.022), (I-338)+(1.057)+(2.023), (I-338)+(1.057)+(2.024), (I-338)+(1.057)+(2.025), (I-338)+(1.057)+(2.026), (I-338)+(1.057)+(2.027), (I-338)+(1.057)+(2.028), (I-338)+(1.057)+(2.029), (I-338)+(1.057)+(2.030), (I-338)+(1.057)+(2.031), (I-338)+(1.057)+(2.032), (I-338)+(1.057)+(2.033), (I-338)+(1.057)+(2.034), (I-338)+(1.057)+(2.035), (I-338)+(1.057)+(2.036), (I-338)+(1.057)+(2.037), (I-338)+(1.057)+(2.038), (I-338)+(1.057)+(2.039), (I-338)+(1.057)+(2.040), (I-338)+(1.057)+(2.041), (I-338)+(1.057)+(2.042), (I-338)+(1.057)+(2.043), (I-338)+(1.057)+(2.044), (I-338)+(1.057)+(2.045), (I-338)+(1.057)+(2.046), (I-338)+(1.057)+(2.047), (I-338)+(1.057)+(2.048), (I-338)+(1.057)+(2.049), (I-338)+(1.057)+(2.050), (I-338)+(1.057)+(2.051), (I-338)+(1.057)+(2.052), (I-338)+(1.057)+(2.053), (I-338)+(1.057)+(2.054), (I-338)+(1.057)+(2.055), (I-338)+(1.057)+(2.056), (I-338)+(1.057)+(2.057), (I-338)+(1.057)+(2.058), (I-338)+(1.057)+(2.059), (I-338)+(1.057)+(3.001), (I-338)+(1.057)+(3.002), (I-338)+(1.057)+(3.003), (I-338)+(1.057)+(3.004), (I-338)+(1.057)+(3.005), (I-338)+(1.057)+(3.006), (I-338)+(1.057)+(3.007), (I-338)+(1.057)+(3.008), (I-338)+(1.057)+(3.009), (I-338)+(1.057)+(3.010), (I-338)+(1.057)+(3.011), (I-338)+(1.057)+(3.012), (I-338)+(1.057)+(3.013), (I-338)+(1.057)+(3.014), (I-338)+(1.057)+(3.015), (I-338)+(1.057)+(3.016), (I-338)+(1.057)+(3.017), (I-338)+(1.057)+(3.018), (I-338)+(1.057)+(3.019), (I-338)+(1.057)+(3.020), (I-338)+(1.057)+(3.021), (I-338)+(1.057)+(3.022), (I-338)+(1.057)+(3.023), (I-338)+(1.057)+(3.024), (I-338)+(1.057)+(3.025), (I-338)+(1.057)+(3.026), (I-338)+(1.057)+(3.027), (I-338)+(1.057)+(3.028), (I-338)+(1.057)+(3.029), (I-338)+(1.057)+(3.030), (I-338)+(1.057)+(3.031), (I-338)+(1.057)+(5.001), (I-338)+(1.057)+(5.002), (I-338)+(1.057)+(5.003), (I-338)+(1.057)+(5.004), (I-338)+(1.057)+(5.005), (I-338)+(1.057)+(5.006), (I-338)+(1.057)+(5.007), (I-338)+(1.057)+(5.008), (I-338)+(1.057)+(5.009), (I-338)+(1.057)+(5.010), (I-338)+(1.057)+(5.011), (I-338)+(1.057)+(5.012), (I-338)+(1.057)+(5.013), (I-338)+(1.057)+(5.014), (I-338)+(1.057)+(5.015), (I-338)+(1.057)+(5.016), (I-338)+(1.057)+(5.017), (I-338)+(1.057)+(5.018), (I-338)+(1.057)+(5.019), (I-338)+(1.057)+(5.020), (I-338)+(1.057)+(5.021), (I-338)+(1.057)+(5.022), (I-338)+(1.057)+(5.023), (I-338)+(1.057)+(6.001), (I-338)+(1.057)+(6.002), (I-338)+(1.057)+(6.003), (I-338)+(1.057)+(6.004), (I-338)+(1.057)+(7.001), (I-338)+(1.057)+(7.002), (I-338)+(1.057)+(7.003), (I-338)+(1.057)+(7.004), (I-338)+(1.057)+(7.005), (I-338)+(1.057)+(7.006), (I-338)+(1.057)+(9.001), (I-338)+(1.057)+(9.002), (I-338)+(1.057)+(9.003), (I-338)+(1.057)+(9.004), (I-338)+(1.057)+(9.005), (I-338)+(1.057)+(9.006), (I-338)+(1.057)+(9.007), (I-338)+(1.057)+(9.008), (I-338)+(1.057)+(9.009), (I-338)+(1.057)+(14.001), (I-338)+(1.057)+(14.002), (I-338)+(1.057)+(15.008), (I-338)+(1.057)+(15.011), (I-338)+(1.057)+(15.012), (I-338)+(1.057)+(15.016), (I-338)+(1.057)+(15.025), (I-338)+(1.057)+(15.027), (I-338)+(1.057)+(15.047), (I-338)+(1.057)+(15.063), (I-338)+(1.057)+(15.064), (I-338)+(1.057)+(16.001), (I-338)+(1.057)+(16.002), (I-338)+(1.057)+(16.003), (I-338)+(1.057)+(16.004), (I-338)+(1.057)+(16.005), (I-338)+(1.057)+(16.006), (I-338)+(1.057)+(16.007), (I-338)+(1.057)+(16.008), (I-338)+(1.057)+(17.001), (I-338)+(1.057)+(17.002), (I-338)+(1.057)+(17.003), (I-338)+(1.057)+(17.004), (I-338)+(1.057)+(17.005), (I-338)+(1.057)+(17.006), (I-338)+(1.057)+(17.007), (I-338)+(1.057)+(17.008), (I-338)+(1.057)+(17.009), (I-338)+(1.057)+(17.010), (I-338)+(1.057)+(17.011), (I-338)+(1.057)+(17.012), (I-338)+(1.057)+(18.001), (I-338)+(1.058)+(1.059), (I-338)+(1.058)+(1.060), (I-338)+(1.058)+(1.061), (I-338)+(1.058)+(1.062), (I-338)+(1.058)+(1.063), (I-338)+(1.058)+(1.064), (I-338)+(1.058)+(1.065), (I-338)+(1.058)+(1.066), (I-338)+(1.058)+(1.067), (I-338)+(1.058)+(1.068), (I-338)+(1.058)+(1.069), (I-338)+(1.058)+(1.070), (I-338)+(1.058)+(1.071), (I-338)+(1.058)+(1.072), (I-338)+(1.058)+(1.073), (I-338)+(1.058)+(1.074), (I-338)+(1.058)+(1.075), (I-338)+(1.058)+(1.076), (I-338)+(1.058)+(1.077), (I-338)+(1.058)+(1.078), (I-338)+(1.058)+(1.079), (I-338)+(1.058)+(1.080), (I-338)+(1.058)+(1.081), (I-338)+(1.058)+(1.082), (I-338)+(1.058)+(1.083), (I-338)+(1.058)+(1.084), (I-338)+(1.058)+(1.085), (I-338)+(1.058)+(1.086), (I-338)+(1.058)+(1.087), (I-338)+(1.058)+(1.088), (I-338)+(1.058)+(1.089), (I-338)+(1.058)+(1.090), (I-338)+(1.058)+(1.091), (I-338)+(1.058)+(1.092), (I-338)+(1.058)+(2.001), (I-338)+(1.058)+(2.002), (I-338)+(1.058)+(2.003), (I-338)+(1.058)+(2.004), (I-338)+(1.058)+(2.005), (I-338)+(1.058)+(2.006), (I-338)+(1.058)+(2.007), (I-338)+(1.058)+(2.008), (I-338)+(1.058)+(2.009), (I-338)+(1.058)+(2.010), (I-338)+(1.058)+(2.011), (I-338)+(1.058)+(2.012), (I-338)+(1.058)+(2.013), (I-338)+(1.058)+(2.014), (I-338)+(1.058)+(2.015), (I-338)+(1.058)+(2.016), (I-338)+(1.058)+(2.017), (I-338)+(1.058)+(2.018), (I-338)+(1.058)+(2.019), (I-338)+(1.058)+(2.020), (I-338)+(1.058)+(2.021), (I-338)+(1.058)+(2.022), (I-338)+(1.058)+(2.023), (I-338)+(1.058)+(2.024), (I-338)+(1.058)+(2.025), (I-338)+(1.058)+(2.026), (I-338)+(1.058)+(2.027), (I-338)+(1.058)+(2.028), (I-338)+(1.058)+(2.029), (I-338)+(1.058)+(2.030), (I-338)+(1.058)+(2.031), (I-338)+(1.058)+(2.032), (I-338)+(1.058)+(2.033), (I-338)+(1.058)+(2.034), (I-338)+(1.058)+(2.035), (I-338)+(1.058)+(2.036), (I-338)+(1.058)+(2.037), (I-338)+(1.058)+(2.038), (I-338)+(1.058)+(2.039), (I-338)+(1.058)+(2.040), (I-338)+(1.058)+(2.041), (I-338)+(1.058)+(2.042), (I-338)+(1.058)+(2.043), (I-338)+(1.058)+(2.044), (I-338)+(1.058)+(2.045), (I-338)+(1.058)+(2.046), (I-338)+(1.058)+(2.047), (I-338)+(1.058)+(2.048), (I-338)+(1.058)+(2.049), (I-338)+(1.058)+(2.050), (I-338)+(1.058)+(2.051), (I-338)+(1.058)+(2.052), (I-338)+(1.058)+(2.053), (I-338)+(1.058)+(2.054), (I-338)+(1.058)+(2.055), (I-338)+(1.058)+(2.056), (I-338)+(1.058)+(2.057), (I-338)+(1.058)+(2.058), (I-338)+(1.058)+(2.059), (I-338)+(1.058)+(3.001), (I-338)+(1.058)+(3.002), (I-338)+(1.058)+(3.003), (I-338)+(1.058)+(3.004), (I-338)+(1.058)+(3.005), (I-338)+(1.058)+(3.006), (I-338)+(1.058)+(3.007), (I-338)+(1.058)+(3.008), (I-338)+(1.058)+(3.009), (I-338)+(1.058)+(3.010), (I-338)+(1.058)+(3.011), (I-338)+(1.058)+(3.012), (I-338)+(1.058)+(3.013), (I-338)+(1.058)+(3.014), (I-338)+(1.058)+(3.015), (I-338)+(1.058)+(3.016), (I-338)+(1.058)+(3.017), (I-338)+(1.058)+(3.018), (I-338)+(1.058)+(3.019), (I-338)+(1.058)+(3.020), (I-338)+(1.058)+(3.021), (I-338)+(1.058)+(3.022), (I-338)+(1.058)+(3.023), (I-338)+(1.058)+(3.024), (I-338)+(1.058)+(3.025), (I-338)+(1.058)+(3.026), (I-338)+(1.058)+(3.027), (I-338)+(1.058)+(3.028), (I-338)+(1.058)+(3.029), (I-338)+(1.058)+(3.030), (I-338)+(1.058)+(3.031), (I-338)+(1.058)+(5.001), (I-338)+(1.058)+(5.002), (I-338)+(1.058)+(5.003), (I-338)+(1.058)+(5.004), (I-338)+(1.058)+(5.005), (I-338)+(1.058)+(5.006), (I-338)+(1.058)+(5.007), (I-338)+(1.058)+(5.008), (I-338)+(1.058)+(5.009), (I-338)+(1.058)+(5.010), (I-338)+(1.058)+(5.011), (I-338)+(1.058)+(5.012), (I-338)+(1.058)+(5.013), (I-338)+(1.058)+(5.014), (I-338)+(1.058)+(5.015), (I-338)+(1.058)+(5.016), (I-338)+(1.058)+(5.017), (I-338)+(1.058)+(5.018), (I-338)+(1.058)+(5.019), (I-338)+(1.058)+(5.020), (I-338)+(1.058)+(5.021), (I-338)+(1.058)+(5.022), (I-338)+(1.058)+(5.023), (I-338)+(1.058)+(6.001), (I-338)+(1.058)+(6.002), (I-338)+(1.058)+(6.003), (I-338)+(1.058)+(6.004), (I-338)+(1.058)+(7.001), (I-338)+(1.058)+(7.002), (I-338)+(1.058)+(7.003), (I-338)+(1.058)+(7.004), (I-338)+(1.058)+(7.005), (I-338)+(1.058)+(7.006), (I-338)+(1.058)+(9.001), (I-338)+(1.058)+(9.002), (I-338)+(1.058)+(9.003), (I-338)+(1.058)+(9.004), (I-338)+(1.058)+(9.005), (I-338)+(1.058)+(9.006), (I-338)+(1.058)+(9.007), (I-338)+(1.058)+(9.008), (I-338)+(1.058)+(9.009), (I-338)+(1.058)+(14.001), (I-338)+(1.058)+(14.002), (I-338)+(1.058)+(15.008), (I-338)+(1.058)+(15.011), (I-338)+(1.058)+(15.012), (I-338)+(1.058)+(15.016), (I-338)+(1.058)+(15.025), (I-338)+(1.058)+(15.027), (I-338)+(1.058)+(15.047), (I-338)+(1.058)+(15.063), (I-338)+(1.058)+(15.064), (I-338)+(1.058)+(16.001), (I-338)+(1.058)+(16.002), (I-338)+(1.058)+(16.003), (I-338)+(1.058)+(16.004), (I-338)+(1.058)+(16.005), (I-338)+(1.058)+(16.006), (I-338)+(1.058)+(16.007), (I-338)+(1.058)+(16.008), (I-338)+(1.058)+(17.001), (I-338)+(1.058)+(17.002), (I-338)+(1.058)+(17.003), (I-338)+(1.058)+(17.004), (I-338)+(1.058)+(17.005), (I-338)+(1.058)+(17.006), (I-338)+(1.058)+(17.007), (I-338)+(1.058)+(17.008), (I-338)+(1.058)+(17.009), (I-338)+(1.058)+(17.010), (I-338)+(1.058)+(17.011), (I-338)+(1.058)+(17.012), (I-338)+(1.058)+(18.001), (I-338)+(1.059)+(1.060), (I-338)+(1.059)+(1.061), (I-338)+(1.059)+(1.062), (I-338)+(1.059)+(1.063), (I-338)+(1.059)+(1.064), (I-338)+(1.059)+(1.065), (I-338)+(1.059)+(1.066), (I-338)+(1.059)+(1.067), (I-338)+(1.059)+(1.068), (I-338)+(1.059)+(1.069), (I-338)+(1.059)+(1.070), (I-338)+(1.059)+(1.071), (I-338)+(1.059)+(1.072), (I-338)+(1.059)+(1.073), (I-338)+(1.059)+(1.074), (I-338)+(1.059)+(1.075), (I-338)+(1.059)+(1.076), (I-338)+(1.059)+(1.077), (I-338)+(1.059)+(1.078), (I-338)+(1.059)+(1.079), (I-338)+(1.059)+(1.080), (I-338)+(1.059)+(1.081), (I-338)+(1.059)+(1.082), (I-338)+(1.059)+(1.083), (I-338)+(1.059)+(1.084), (I-338)+(1.059)+(1.085), (I-338)+(1.059)+(1.086), (I-338)+(1.059)+(1.087), (I-338)+(1.059)+(1.088), (I-338)+(1.059)+(1.089), (I-338)+(1.059)+(1.090), (I-338)+(1.059)+(1.091), (I-338)+(1.059)+(1.092), (I-338)+(1.059)+(2.001), (I-338)+(1.059)+(2.002), (I-338)+(1.059)+(2.003), (I-338)+(1.059)+(2.004), (I-338)+(1.059)+(2.005), (I-338)+(1.059)+(2.006), (I-338)+(1.059)+(2.007), (I-338)+(1.059)+(2.008), (I-338)+(1.059)+(2.009), (I-338)+(1.059)+(2.010), (I-338)+(1.059)+(2.011), (I-338)+(1.059)+(2.012), (I-338)+(1.059)+(2.013), (I-338)+(1.059)+(2.014), (I-338)+(1.059)+(2.015), (I-338)+(1.059)+(2.016), (I-338)+(1.059)+(2.017), (I-338)+(1.059)+(2.018), (I-338)+(1.059)+(2.019), (I-338)+(1.059)+(2.020), (I-338)+(1.059)+(2.021), (I-338)+(1.059)+(2.022), (I-338)+(1.059)+(2.023), (I-338)+(1.059)+(2.024), (I-338)+(1.059)+(2.025), (I-338)+(1.059)+(2.026), (I-338)+(1.059)+(2.027), (I-338)+(1.059)+(2.028), (I-338)+(1.059)+(2.029), (I-338)+(1.059)+(2.030), (I-338)+(1.059)+(2.031), (I-338)+(1.059)+(2.032), (I-338)+(1.059)+(2.033), (I-338)+(1.059)+(2.034), (I-338)+(1.059)+(2.035), (I-338)+(1.059)+(2.036), (I-338)+(1.059)+(2.037), (I-338)+(1.059)+(2.038), (I-338)+(1.059)+(2.039), (I-338)+(1.059)+(2.040), (I-338)+(1.059)+(2.041), (I-338)+(1.059)+(2.042), (I-338)+(1.059)+(2.043), (I-338)+(1.059)+(2.044), (I-338)+(1.059)+(2.045), (I-338)+(1.059)+(2.046), (I-338)+(1.059)+(2.047), (I-338)+(1.059)+(2.048), (I-338)+(1.059)+(2.049), (I-338)+(1.059)+(2.050), (I-338)+(1.059)+(2.051), (I-338)+(1.059)+(2.052), (I-338)+(1.059)+(2.053), (I-338)+(1.059)+(2.054), (I-338)+(1.059)+(2.055), (I-338)+(1.059)+(2.056), (I-338)+(1.059)+(2.057), (I-338)+(1.059)+(2.058), (I-338)+(1.059)+(2.059), (I-338)+(1.059)+(3.001), (I-338)+(1.059)+(3.002), (I-338)+(1.059)+(3.003), (I-338)+(1.059)+(3.004), (I-338)+(1.059)+(3.005), (I-338)+(1.059)+(3.006), (I-338)+(1.059)+(3.007), (I-338)+(1.059)+(3.008), (I-338)+(1.059)+(3.009), (I-338)+(1.059)+(3.010), (I-338)+(1.059)+(3.011), (I-338)+(1.059)+(3.012), (I-338)+(1.059)+(3.013), (I-338)+(1.059)+(3.014), (I-338)+(1.059)+(3.015), (I-338)+(1.059)+(3.016), (I-338)+(1.059)+(3.017), (I-338)+(1.059)+(3.018), (I-338)+(1.059)+(3.019), (I-338)+(1.059)+(3.020), (I-338)+(1.059)+(3.021), (I-338)+(1.059)+(3.022), (I-338)+(1.059)+(3.023), (I-338)+(1.059)+(3.024), (I-338)+(1.059)+(3.025), (I-338)+(1.059)+(3.026), (I-338)+(1.059)+(3.027), (I-338)+(1.059)+(3.028), (I-338)+(1.059)+(3.029), (I-338)+(1.059)+(3.030), (I-338)+(1.059)+(3.031), (I-338)+(1.059)+(5.001), (I-338)+(1.059)+(5.002), (I-338)+(1.059)+(5.003), (I-338)+(1.059)+(5.004), (I-338)+(1.059)+(5.005), (I-338)+(1.059)+(5.006), (I-338)+(1.059)+(5.007), (I-338)+(1.059)+(5.008), (I-338)+(1.059)+(5.009), (I-338)+(1.059)+(5.010), (I-338)+(1.059)+(5.011), (I-338)+(1.059)+(5.012), (I-338)+(1.059)+(5.013), (I-338)+(1.059)+(5.014), (I-338)+(1.059)+(5.015), (I-338)+(1.059)+(5.016), (I-338)+(1.059)+(5.017), (I-338)+(1.059)+(5.018), (I-338)+(1.059)+(5.019), (I-338)+(1.059)+(5.020), (I-338)+(1.059)+(5.021), (I-338)+(1.059)+(5.022), (I-338)+(1.059)+(5.023), (I-338)+(1.059)+(6.001), (I-338)+(1.059)+(6.002), (I-338)+(1.059)+(6.003), (I-338)+(1.059)+(6.004), (I-338)+(1.059)+(7.001), (I-338)+(1.059)+(7.002), (I-338)+(1.059)+(7.003), (I-338)+(1.059)+(7.004), (I-338)+(1.059)+(7.005), (I-338)+(1.059)+(7.006), (I-338)+(1.059)+(9.001), (I-338)+(1.059)+(9.002), (I-338)+(1.059)+(9.003), (I-338)+(1.059)+(9.004), (I-338)+(1.059)+(9.005), (I-338)+(1.059)+(9.006), (I-338)+(1.059)+(9.007), (I-338)+(1.059)+(9.008), (I-338)+(1.059)+(9.009), (I-338)+(1.059)+(14.001), (I-338)+(1.059)+(14.002), (I-338)+(1.059)+(15.008), (I-338)+(1.059)+(15.011), (I-338)+(1.059)+(15.012), (I-338)+(1.059)+(15.016), (I-338)+(1.059)+(15.025), (I-338)+(1.059)+(15.027), (I-338)+(1.059)+(15.047), (I-338)+(1.059)+(15.063), (I-338)+(1.059)+(15.064), (I-338)+(1.059)+(16.001), (I-338)+(1.059)+(16.002), (I-338)+(1.059)+(16.003), (I-338)+(1.059)+(16.004), (I-338)+(1.059)+(16.005), (I-338)+(1.059)+(16.006), (I-338)+(1.059)+(16.007), (I-338)+(1.059)+(16.008), (I-338)+(1.059)+(17.001), (I-338)+(1.059)+(17.002), (I-338)+(1.059)+(17.003), (I-338)+(1.059)+(17.004), (I-338)+(1.059)+(17.005), (I-338)+(1.059)+(17.006), (I-338)+(1.059)+(17.007), (I-338)+(1.059)+(17.008), (I-338)+(1.059)+(17.009), (I-338)+(1.059)+(17.010), (I-338)+(1.059)+(17.011), (I-338)+(1.059)+(17.012), (I-338)+(1.059)+(18.001), (I-338)+(1.060)+(1.061), (I-338)+(1.060)+(1.062), (I-338)+(1.060)+(1.063), (I-338)+(1.060)+(1.064), (I-338)+(1.060)+(1.065), (I-338)+(1.060)+(1.066), (I-338)+(1.060)+(1.067), (I-338)+(1.060)+(1.068), (I-338)+(1.060)+(1.069), (I-338)+(1.060)+(1.070), (I-338)+(1.060)+(1.071), (I-338)+(1.060)+(1.072), (I-338)+(1.060)+(1.073), (I-338)+(1.060)+(1.074), (I-338)+(1.060)+(1.075), (I-338)+(1.060)+(1.076), (I-338)+(1.060)+(1.077), (I-338)+(1.060)+(1.078), (I-338)+(1.060)+(1.079), (I-338)+(1.060)+(1.080), (I-338)+(1.060)+(1.081), (I-338)+(1.060)+(1.082), (I-338)+(1.060)+(1.083), (I-338)+(1.060)+(1.084), (I-338)+(1.060)+(1.085), (I-338)+(1.060)+(1.086), (I-338)+(1.060)+(1.087), (I-338)+(1.060)+(1.088), (I-338)+(1.060)+(1.089), (I-338)+(1.060)+(1.090), (I-338)+(1.060)+(1.091), (I-338)+(1.060)+(1.092), (I-338)+(1.060)+(2.001), (I-338)+(1.060)+(2.002), (I-338)+(1.060)+(2.003), (I-338)+(1.060)+(2.004), (I-338)+(1.060)+(2.005), (I-338)+(1.060)+(2.006), (I-338)+(1.060)+(2.007), (I-338)+(1.060)+(2.008), (I-338)+(1.060)+(2.009), (I-338)+(1.060)+(2.010), (I-338)+(1.060)+(2.011), (I-338)+(1.060)+(2.012), (I-338)+(1.060)+(2.013), (I-338)+(1.060)+(2.014), (I-338)+(1.060)+(2.015), (I-338)+(1.060)+(2.016), (I-338)+(1.060)+(2.017), (I-338)+(1.060)+(2.018), (I-338)+(1.060)+(2.019), (I-338)+(1.060)+(2.020), (I-338)+(1.060)+(2.021), (I-338)+(1.060)+(2.022), (I-338)+(1.060)+(2.023), (I-338)+(1.060)+(2.024), (I-338)+(1.060)+(2.025), (I-338)+(1.060)+(2.026), (I-338)+(1.060)+(2.027), (I-338)+(1.060)+(2.028), (I-338)+(1.060)+(2.029), (I-338)+(1.060)+(2.030), (I-338)+(1.060)+(2.031), (I-338)+(1.060)+(2.032), (I-338)+(1.060)+(2.033), (I-338)+(1.060)+(2.034), (I-338)+(1.060)+(2.035), (I-338)+(1.060)+(2.036), (I-338)+(1.060)+(2.037), (I-338)+(1.060)+(2.038), (I-338)+(1.060)+(2.039), (I-338)+(1.060)+(2.040), (I-338)+(1.060)+(2.041), (I-338)+(1.060)+(2.042), (I-338)+(1.060)+(2.043), (I-338)+(1.060)+(2.044), (I-338)+(1.060)+(2.045), (I-338)+(1.060)+(2.046), (I-338)+(1.060)+(2.047), (I-338)+(1.060)+(2.048), (I-338)+(1.060)+(2.049), (I-338)+(1.060)+(2.050), (I-338)+(1.060)+(2.051), (I-338)+(1.060)+(2.052), (I-338)+(1.060)+(2.053), (I-338)+(1.060)+(2.054), (I-338)+(1.060)+(2.055), (I-338)+(1.060)+(2.056), (I-338)+(1.060)+(2.057), (I-338)+(1.060)+(2.058), (I-338)+(1.060)+(2.059), (I-338)+(1.060)+(3.001), (I-338)+(1.060)+(3.002), (I-338)+(1.060)+(3.003), (I-338)+(1.060)+(3.004), (I-338)+(1.060)+(3.005), (I-338)+(1.060)+(3.006), (I-338)+(1.060)+(3.007), (I-338)+(1.060)+(3.008), (I-338)+(1.060)+(3.009), (I-338)+(1.060)+(3.010), (I-338)+(1.060)+(3.011), (I-338)+(1.060)+(3.012), (I-338)+(1.060)+(3.013), (I-338)+(1.060)+(3.014), (I-338)+(1.060)+(3.015), (I-338)+(1.060)+(3.016), (I-338)+(1.060)+(3.017), (I-338)+(1.060)+(3.018), (I-338)+(1.060)+(3.019), (I-338)+(1.060)+(3.020), (I-338)+(1.060)+(3.021), (I-338)+(1.060)+(3.022), (I-338)+(1.060)+(3.023), (I-338)+(1.060)+(3.024), (I-338)+(1.060)+(3.025), (I-338)+(1.060)+(3.026), (I-338)+(1.060)+(3.027), (I-338)+(1.060)+(3.028), (I-338)+(1.060)+(3.029), (I-338)+(1.060)+(3.030), (I-338)+(1.060)+(3.031), (I-338)+(1.060)+(5.001), (I-338)+(1.060)+(5.002), (I-338)+(1.060)+(5.003), (I-338)+(1.060)+(5.004), (I-338)+(1.060)+(5.005), (I-338)+(1.060)+(5.006), (I-338)+(1.060)+(5.007), (I-338)+(1.060)+(5.008), (I-338)+(1.060)+(5.009), (I-338)+(1.060)+(5.010), (I-338)+(1.060)+(5.011), (I-338)+(1.060)+(5.012), (I-338)+(1.060)+(5.013), (I-338)+(1.060)+(5.014), (I-338)+(1.060)+(5.015), (I-338)+(1.060)+(5.016), (I-338)+(1.060)+(5.017), (I-338)+(1.060)+(5.018), (I-338)+(1.060)+(5.019), (I-338)+(1.060)+(5.020), (I-338)+(1.060)+(5.021), (I-338)+(1.060)+(5.022), (I-338)+(1.060)+(5.023), (I-338)+(1.060)+(6.001), (I-338)+(1.060)+(6.002), (I-338)+(1.060)+(6.003), (I-338)+(1.060)+(6.004), (I-338)+(1.060)+(7.001), (I-338)+(1.060)+(7.002), (I-338)+(1.060)+(7.003), (I-338)+(1.060)+(7.004), (I-338)+(1.060)+(7.005), (I-338)+(1.060)+(7.006), (I-338)+(1.060)+(9.001), (I-338)+(1.060)+(9.002), (I-338)+(1.060)+(9.003), (I-338)+(1.060)+(9.004), (I-338)+(1.060)+(9.005), (I-338)+(1.060)+(9.006), (I-338)+(1.060)+(9.007), (I-338)+(1.060)+(9.008), (I-338)+(1.060)+(9.009), (I-338)+(1.060)+(14.001), (I-338)+(1.060)+(14.002), (I-338)+(1.060)+(15.008), (I-338)+(1.060)+(15.011), (I-338)+(1.060)+(15.012), (I-338)+(1.060)+(15.016), (I-338)+(1.060)+(15.025), (I-338)+(1.060)+(15.027), (I-338)+(1.060)+(15.047), (I-338)+(1.060)+(15.063), (I-338)+(1.060)+(15.064), (I-338)+(1.060)+(16.001), (I-338)+(1.060)+(16.002), (I-338)+(1.060)+(16.003), (I-338)+(1.060)+(16.004), (I-338)+(1.060)+(16.005), (I-338)+(1.060)+(16.006), (I-338)+(1.060)+(16.007), (I-338)+(1.060)+(16.008), (I-338)+(1.060)+(17.001), (I-338)+(1.060)+(17.002), (I-338)+(1.060)+(17.003), (I-338)+(1.060)+(17.004), (I-338)+(1.060)+(17.005), (I-338)+(1.060)+(17.006), (I-338)+(1.060)+(17.007), (I-338)+(1.060)+(17.008), (I-338)+(1.060)+(17.009), (I-338)+(1.060)+(17.010), (I-338)+(1.060)+(17.011), (I-338)+(1.060)+(17.012), (I-338)+(1.060)+(18.001), (I-338)+(1.061)+(1.062), (I-338)+(1.061)+(1.063), (I-338)+(1.061)+(1.064), (I-338)+(1.061)+(1.065), (I-338)+(1.061)+(1.066), (I-338)+(1.061)+(1.067), (I-338)+(1.061)+(1.068), (I-338)+(1.061)+(1.069), (I-338)+(1.061)+(1.070), (I-338)+(1.061)+(1.071), (I-338)+(1.061)+(1.072), (I-338)+(1.061)+(1.073), (I-338)+(1.061)+(1.074), (I-338)+(1.061)+(1.075), (I-338)+(1.061)+(1.076), (I-338)+(1.061)+(1.077), (I-338)+(1.061)+(1.078), (I-338)+(1.061)+(1.079), (I-338)+(1.061)+(1.080), (I-338)+(1.061)+(1.081), (I-338)+(1.061)+(1.082), (I-338)+(1.061)+(1.083), (I-338)+(1.061)+(1.084), (I-338)+(1.061)+(1.085), (I-338)+(1.061)+(1.086), (I-338)+(1.061)+(1.087), (I-338)+(1.061)+(1.088), (I-338)+(1.061)+(1.089), (I-338)+(1.061)+(1.090), (I-338)+(1.061)+(1.091), (I-338)+(1.061)+(1.092), (I-338)+(1.061)+(2.001), (I-338)+(1.061)+(2.002), (I-338)+(1.061)+(2.003), (I-338)+(1.061)+(2.004), (I-338)+(1.061)+(2.005), (I-338)+(1.061)+(2.006), (I-338)+(1.061)+(2.007), (I-338)+(1.061)+(2.008), (I-338)+(1.061)+(2.009), (I-338)+(1.061)+(2.010), (I-338)+(1.061)+(2.011), (I-338)+(1.061)+(2.012), (I-338)+(1.061)+(2.013), (I-338)+(1.061)+(2.014), (I-338)+(1.061)+(2.015), (I-338)+(1.061)+(2.016), (I-338)+(1.061)+(2.017), (I-338)+(1.061)+(2.018), (I-338)+(1.061)+(2.019), (I-338)+(1.061)+(2.020), (I-338)+(1.061)+(2.021), (I-338)+(1.061)+(2.022), (I-338)+(1.061)+(2.023), (I-338)+(1.061)+(2.024), (I-338)+(1.061)+(2.025), (I-338)+(1.061)+(2.026), (I-338)+(1.061)+(2.027), (I-338)+(1.061)+(2.028), (I-338)+(1.061)+(2.029), (I-338)+(1.061)+(2.030), (I-338)+(1.061)+(2.031), (I-338)+(1.061)+(2.032), (I-338)+(1.061)+(2.033), (I-338)+(1.061)+(2.034), (I-338)+(1.061)+(2.035), (I-338)+(1.061)+(2.036), (I-338)+(1.061)+(2.037), (I-338)+(1.061)+(2.038), (I-338)+(1.061)+(2.039), (I-338)+(1.061)+(2.040), (I-338)+(1.061)+(2.041), (I-338)+(1.061)+(2.042), (I-338)+(1.061)+(2.043), (I-338)+(1.061)+(2.044), (I-338)+(1.061)+(2.045), (I-338)+(1.061)+(2.046), (I-338)+(1.061)+(2.047), (I-338)+(1.061)+(2.048), (I-338)+(1.061)+(2.049), (I-338)+(1.061)+(2.050), (I-338)+(1.061)+(2.051), (I-338)+(1.061)+(2.052), (I-338)+(1.061)+(2.053), (I-338)+(1.061)+(2.054), (I-338)+(1.061)+(2.055), (I-338)+(1.061)+(2.056), (I-338)+(1.061)+(2.057), (I-338)+(1.061)+(2.058), (I-338)+(1.061)+(2.059), (I-338)+(1.061)+(3.001), (I-338)+(1.061)+(3.002), (I-338)+(1.061)+(3.003), (I-338)+(1.061)+(3.004), (I-338)+(1.061)+(3.005), (I-338)+(1.061)+(3.006), (I-338)+(1.061)+(3.007), (I-338)+(1.061)+(3.008), (I-338)+(1.061)+(3.009), (I-338)+(1.061)+(3.010), (I-338)+(1.061)+(3.011), (I-338)+(1.061)+(3.012), (I-338)+(1.061)+(3.013), (I-338)+(1.061)+(3.014), (I-338)+(1.061)+(3.015), (I-338)+(1.061)+(3.016), (I-338)+(1.061)+(3.017), (I-338)+(1.061)+(3.018), (I-338)+(1.061)+(3.019), (I-338)+(1.061)+(3.020), (I-338)+(1.061)+(3.021), (I-338)+(1.061)+(3.022), (I-338)+(1.061)+(3.023), (I-338)+(1.061)+(3.024), (I-338)+(1.061)+(3.025), (I-338)+(1.061)+(3.026), (I-338)+(1.061)+(3.027), (I-338)+(1.061)+(3.028), (I-338)+(1.061)+(3.029), (I-338)+(1.061)+(3.030), (I-338)+(1.061)+(3.031), (I-338)+(1.061)+(5.001), (I-338)+(1.061)+(5.002), (I-338)+(1.061)+(5.003), (I-338)+(1.061)+(5.004), (I-338)+(1.061)+(5.005), (I-338)+(1.061)+(5.006), (I-338)+(1.061)+(5.007), (I-338)+(1.061)+(5.008), (I-338)+(1.061)+(5.009), (I-338)+(1.061)+(5.010), (I-338)+(1.061)+(5.011), (I-338)+(1.061)+(5.012), (I-338)+(1.061)+(5.013), (I-338)+(1.061)+(5.014), (I-338)+(1.061)+(5.015), (I-338)+(1.061)+(5.016), (I-338)+(1.061)+(5.017), (I-338)+(1.061)+(5.018), (I-338)+(1.061)+(5.019), (I-338)+(1.061)+(5.020), (I-338)+(1.061)+(5.021), (I-338)+(1.061)+(5.022), (I-338)+(1.061)+(5.023), (I-338)+(1.061)+(6.001), (I-338)+(1.061)+(6.002), (I-338)+(1.061)+(6.003), (I-338)+(1.061)+(6.004), (I-338)+(1.061)+(7.001), (I-338)+(1.061)+(7.002), (I-338)+(1.061)+(7.003), (I-338)+(1.061)+(7.004), (I-338)+(1.061)+(7.005), (I-338)+(1.061)+(7.006), (I-338)+(1.061)+(9.001), (I-338)+(1.061)+(9.002), (I-338)+(1.061)+(9.003), (I-338)+(1.061)+(9.004), (I-338)+(1.061)+(9.005), (I-338)+(1.061)+(9.006), (I-338)+(1.061)+(9.007), (I-338)+(1.061)+(9.008), (I-338)+(1.061)+(9.009), (I-338)+(1.061)+(14.001), (I-338)+(1.061)+(14.002), (I-338)+(1.061)+(15.008), (I-338)+(1.061)+(15.011), (I-338)+(1.061)+(15.012), (I-338)+(1.061)+(15.016), (I-338)+(1.061)+(15.025), (I-338)+(1.061)+(15.027), (I-338)+(1.061)+(15.047), (I-338)+(1.061)+(15.063), (I-338)+(1.061)+(15.064), (I-338)+(1.061)+(16.001), (I-338)+(1.061)+(16.002), (I-338)+(1.061)+(16.003), (I-338)+(1.061)+(16.004), (I-338)+(1.061)+(16.005), (I-338)+(1.061)+(16.006), (I-338)+(1.061)+(16.007), (I-338)+(1.061)+(16.008), (I-338)+(1.061)+(17.001), (I-338)+(1.061)+(17.002), (I-338)+(1.061)+(17.003), (I-338)+(1.061)+(17.004), (I-338)+(1.061)+(17.005), (I-338)+(1.061)+(17.006), (I-338)+(1.061)+(17.007), (I-338)+(1.061)+(17.008), (I-338)+(1.061)+(17.009), (I-338)+(1.061)+(17.010), (I-338)+(1.061)+(17.011), (I-338)+(1.061)+(17.012), (I-338)+(1.061)+(18.001), (I-338)+(1.062)+(1.063), (I-338)+(1.062)+(1.064), (I-338)+(1.062)+(1.065), (I-338)+(1.062)+(1.066), (I-338)+(1.062)+(1.067), (I-338)+(1.062)+(1.068), (I-338)+(1.062)+(1.069), (I-338)+(1.062)+(1.070), (I-338)+(1.062)+(1.071), (I-338)+(1.062)+(1.072), (I-338)+(1.062)+(1.073), (I-338)+(1.062)+(1.074), (I-338)+(1.062)+(1.075), (I-338)+(1.062)+(1.076), (I-338)+(1.062)+(1.077), (I-338)+(1.062)+(1.078), (I-338)+(1.062)+(1.079), (I-338)+(1.062)+(1.080), (I-338)+(1.062)+(1.081), (I-338)+(1.062)+(1.082), (I-338)+(1.062)+(1.083), (I-338)+(1.062)+(1.084), (I-338)+(1.062)+(1.085), (I-338)+(1.062)+(1.086), (I-338)+(1.062)+(1.087), (I-338)+(1.062)+(1.088), (I-338)+(1.062)+(1.089), (I-338)+(1.062)+(1.090), (I-338)+(1.062)+(1.091), (I-338)+(1.062)+(1.092), (I-338)+(1.062)+(2.001), (I-338)+(1.062)+(2.002), (I-338)+(1.062)+(2.003), (I-338)+(1.062)+(2.004), (I-338)+(1.062)+(2.005), (I-338)+(1.062)+(2.006), (I-338)+(1.062)+(2.007), (I-338)+(1.062)+(2.008), (I-338)+(1.062)+(2.009), (I-338)+(1.062)+(2.010), (I-338)+(1.062)+(2.011), (I-338)+(1.062)+(2.012), (I-338)+(1.062)+(2.013), (I-338)+(1.062)+(2.014), (I-338)+(1.062)+(2.015), (I-338)+(1.062)+(2.016), (I-338)+(1.062)+(2.017), (I-338)+(1.062)+(2.018), (I-338)+(1.062)+(2.019), (I-338)+(1.062)+(2.020), (I-338)+(1.062)+(2.021), (I-338)+(1.062)+(2.022), (I-338)+(1.062)+(2.023), (I-338)+(1.062)+(2.024), (I-338)+(1.062)+(2.025), (I-338)+(1.062)+(2.026), (I-338)+(1.062)+(2.027), (I-338)+(1.062)+(2.028), (I-338)+(1.062)+(2.029), (I-338)+(1.062)+(2.030), (I-338)+(1.062)+(2.031), (I-338)+(1.062)+(2.032), (I-338)+(1.062)+(2.033), (I-338)+(1.062)+(2.034), (I-338)+(1.062)+(2.035), (I-338)+(1.062)+(2.036), (I-338)+(1.062)+(2.037), (I-338)+(1.062)+(2.038), (I-338)+(1.062)+(2.039), (I-338)+(1.062)+(2.040), (I-338)+(1.062)+(2.041), (I-338)+(1.062)+(2.042), (I-338)+(1.062)+(2.043), (I-338)+(1.062)+(2.044), (I-338)+(1.062)+(2.045), (I-338)+(1.062)+(2.046), (I-338)+(1.062)+(2.047), (I-338)+(1.062)+(2.048), (I-338)+(1.062)+(2.049), (I-338)+(1.062)+(2.050), (I-338)+(1.062)+(2.051), (I-338)+(1.062)+(2.052), (I-338)+(1.062)+(2.053), (I-338)+(1.062)+(2.054), (I-338)+(1.062)+(2.055), (I-338)+(1.062)+(2.056), (I-338)+(1.062)+(2.057), (I-338)+(1.062)+(2.058), (I-338)+(1.062)+(2.059), (I-338)+(1.062)+(3.001), (I-338)+(1.062)+(3.002), (I-338)+(1.062)+(3.003), (I-338)+(1.062)+(3.004), (I-338)+(1.062)+(3.005), (I-338)+(1.062)+(3.006), (I-338)+(1.062)+(3.007), (I-338)+(1.062)+(3.008), (I-338)+(1.062)+(3.009), (I-338)+(1.062)+(3.010), (I-338)+(1.062)+(3.011), (I-338)+(1.062)+(3.012), (I-338)+(1.062)+(3.013), (I-338)+(1.062)+(3.014), (I-338)+(1.062)+(3.015), (I-338)+(1.062)+(3.016), (I-338)+(1.062)+(3.017), (I-338)+(1.062)+(3.018), (I-338)+(1.062)+(3.019), (I-338)+(1.062)+(3.020), (I-338)+(1.062)+(3.021), (I-338)+(1.062)+(3.022), (I-338)+(1.062)+(3.023), (I-338)+(1.062)+(3.024), (I-338)+(1.062)+(3.025), (I-338)+(1.062)+(3.026), (I-338)+(1.062)+(3.027), (I-338)+(1.062)+(3.028), (I-338)+(1.062)+(3.029), (I-338)+(1.062)+(3.030), (I-338)+(1.062)+(3.031), (I-338)+(1.062)+(5.001), (I-338)+(1.062)+(5.002), (I-338)+(1.062)+(5.003), (I-338)+(1.062)+(5.004), (I-338)+(1.062)+(5.005), (I-338)+(1.062)+(5.006), (I-338)+(1.062)+(5.007), (I-338)+(1.062)+(5.008), (I-338)+(1.062)+(5.009), (I-338)+(1.062)+(5.010), (I-338)+(1.062)+(5.011), (I-338)+(1.062)+(5.012), (I-338)+(1.062)+(5.013), (I-338)+(1.062)+(5.014), (I-338)+(1.062)+(5.015), (I-338)+(1.062)+(5.016), (I-338)+(1.062)+(5.017), (I-338)+(1.062)+(5.018), (I-338)+(1.062)+(5.019), (I-338)+(1.062)+(5.020), (I-338)+(1.062)+(5.021), (I-338)+(1.062)+(5.022), (I-338)+(1.062)+(5.023), (I-338)+(1.062)+(6.001), (I-338)+(1.062)+(6.002), (I-338)+(1.062)+(6.003), (I-338)+(1.062)+(6.004), (I-338)+(1.062)+(7.001), (I-338)+(1.062)+(7.002), (I-338)+(1.062)+(7.003), (I-338)+(1.062)+(7.004), (I-338)+(1.062)+(7.005), (I-338)+(1.062)+(7.006), (I-338)+(1.062)+(9.001), (I-338)+(1.062)+(9.002), (I-338)+(1.062)+(9.003), (I-338)+(1.062)+(9.004), (I-338)+(1.062)+(9.005), (I-338)+(1.062)+(9.006), (I-338)+(1.062)+(9.007), (I-338)+(1.062)+(9.008), (I-338)+(1.062)+(9.009), (I-338)+(1.062)+(14.001), (I-338)+(1.062)+(14.002), (I-338)+(1.062)+(15.008), (I-338)+(1.062)+(15.011), (I-338)+(1.062)+(15.012), (I-338)+(1.062)+(15.016), (I-338)+(1.062)+(15.025), (I-338)+(1.062)+(15.027), (I-338)+(1.062)+(15.047), (I-338)+(1.062)+(15.063), (I-338)+(1.062)+(15.064), (I-338)+(1.062)+(16.001), (I-338)+(1.062)+(16.002), (I-338)+(1.062)+(16.003), (I-338)+(1.062)+(16.004), (I-338)+(1.062)+(16.005), (I-338)+(1.062)+(16.006), (I-338)+(1.062)+(16.007), (I-338)+(1.062)+(16.008), (I-338)+(1.062)+(17.001), (I-338)+(1.062)+(17.002), (I-338)+(1.062)+(17.003), (I-338)+(1.062)+(17.004), (I-338)+(1.062)+(17.005), (I-338)+(1.062)+(17.006), (I-338)+(1.062)+(17.007), (I-338)+(1.062)+(17.008), (I-338)+(1.062)+(17.009), (I-338)+(1.062)+(17.010), (I-338)+(1.062)+(17.011), (I-338)+(1.062)+(17.012), (I-338)+(1.062)+(18.001), (I-338)+(1.063)+(1.064), (I-338)+(1.063)+(1.065), (I-338)+(1.063)+(1.066), (I-338)+(1.063)+(1.067), (I-338)+(1.063)+(1.068), (I-338)+(1.063)+(1.069), (I-338)+(1.063)+(1.070), (I-338)+(1.063)+(1.071), (I-338)+(1.063)+(1.072), (I-338)+(1.063)+(1.073), (I-338)+(1.063)+(1.074), (I-338)+(1.063)+(1.075), (I-338)+(1.063)+(1.076), (I-338)+(1.063)+(1.077), (I-338)+(1.063)+(1.078), (I-338)+(1.063)+(1.079), (I-338)+(1.063)+(1.080), (I-338)+(1.063)+(1.081), (I-338)+(1.063)+(1.082), (I-338)+(1.063)+(1.083), (I-338)+(1.063)+(1.084), (I-338)+(1.063)+(1.085), (I-338)+(1.063)+(1.086), (I-338)+(1.063)+(1.087), (I-338)+(1.063)+(1.088), (I-338)+(1.063)+(1.089), (I-338)+(1.063)+(1.090), (I-338)+(1.063)+(1.091), (I-338)+(1.063)+(1.092), (I-338)+(1.063)+(2.001), (I-338)+(1.063)+(2.002), (I-338)+(1.063)+(2.003), (I-338)+(1.063)+(2.004), (I-338)+(1.063)+(2.005), (I-338)+(1.063)+(2.006), (I-338)+(1.063)+(2.007), (I-338)+(1.063)+(2.008), (I-338)+(1.063)+(2.009), (I-338)+(1.063)+(2.010), (I-338)+(1.063)+(2.011), (I-338)+(1.063)+(2.012), (I-338)+(1.063)+(2.013), (I-338)+(1.063)+(2.014), (I-338)+(1.063)+(2.015), (I-338)+(1.063)+(2.016), (I-338)+(1.063)+(2.017), (I-338)+(1.063)+(2.018), (I-338)+(1.063)+(2.019), (I-338)+(1.063)+(2.020), (I-338)+(1.063)+(2.021), (I-338)+(1.063)+(2.022), (I-338)+(1.063)+(2.023), (I-338)+(1.063)+(2.024), (I-338)+(1.063)+(2.025), (I-338)+(1.063)+(2.026), (I-338)+(1.063)+(2.027), (I-338)+(1.063)+(2.028), (I-338)+(1.063)+(2.029), (I-338)+(1.063)+(2.030), (I-338)+(1.063)+(2.031), (I-338)+(1.063)+(2.032), (I-338)+(1.063)+(2.033), (I-338)+(1.063)+(2.034), (I-338)+(1.063)+(2.035), (I-338)+(1.063)+(2.036), (I-338)+(1.063)+(2.037), (I-338)+(1.063)+(2.038), (I-338)+(1.063)+(2.039), (I-338)+(1.063)+(2.040), (I-338)+(1.063)+(2.041), (I-338)+(1.063)+(2.042), (I-338)+(1.063)+(2.043), (I-338)+(1.063)+(2.044), (I-338)+(1.063)+(2.045), (I-338)+(1.063)+(2.046), (I-338)+(1.063)+(2.047), (I-338)+(1.063)+(2.048), (I-338)+(1.063)+(2.049), (I-338)+(1.063)+(2.050), (I-338)+(1.063)+(2.051), (I-338)+(1.063)+(2.052), (I-338)+(1.063)+(2.053), (I-338)+(1.063)+(2.054), (I-338)+(1.063)+(2.055), (I-338)+(1.063)+(2.056), (I-338)+(1.063)+(2.057), (I-338)+(1.063)+(2.058), (I-338)+(1.063)+(2.059), (I-338)+(1.063)+(3.001), (I-338)+(1.063)+(3.002), (I-338)+(1.063)+(3.003), (I-338)+(1.063)+(3.004), (I-338)+(1.063)+(3.005), (I-338)+(1.063)+(3.006), (I-338)+(1.063)+(3.007), (I-338)+(1.063)+(3.008), (I-338)+(1.063)+(3.009), (I-338)+(1.063)+(3.010), (I-338)+(1.063)+(3.011), (I-338)+(1.063)+(3.012), (I-338)+(1.063)+(3.013), (I-338)+(1.063)+(3.014), (I-338)+(1.063)+(3.015), (I-338)+(1.063)+(3.016), (I-338)+(1.063)+(3.017), (I-338)+(1.063)+(3.018), (I-338)+(1.063)+(3.019), (I-338)+(1.063)+(3.020), (I-338)+(1.063)+(3.021), (I-338)+(1.063)+(3.022), (I-338)+(1.063)+(3.023), (I-338)+(1.063)+(3.024), (I-338)+(1.063)+(3.025), (I-338)+(1.063)+(3.026), (I-338)+(1.063)+(3.027), (I-338)+(1.063)+(3.028), (I-338)+(1.063)+(3.029), (I-338)+(1.063)+(3.030), (I-338)+(1.063)+(3.031), (I-338)+(1.063)+(5.001), (I-338)+(1.063)+(5.002), (I-338)+(1.063)+(5.003), (I-338)+(1.063)+(5.004), (I-338)+(1.063)+(5.005), (I-338)+(1.063)+(5.006), (I-338)+(1.063)+(5.007), (I-338)+(1.063)+(5.008), (I-338)+(1.063)+(5.009), (I-338)+(1.063)+(5.010), (I-338)+(1.063)+(5.011), (I-338)+(1.063)+(5.012), (I-338)+(1.063)+(5.013), (I-338)+(1.063)+(5.014), (I-338)+(1.063)+(5.015), (I-338)+(1.063)+(5.016), (I-338)+(1.063)+(5.017), (I-338)+(1.063)+(5.018), (I-338)+(1.063)+(5.019), (I-338)+(1.063)+(5.020), (I-338)+(1.063)+(5.021), (I-338)+(1.063)+(5.022), (I-338)+(1.063)+(5.023), (I-338)+(1.063)+(6.001), (I-338)+(1.063)+(6.002), (I-338)+(1.063)+(6.003), (I-338)+(1.063)+(6.004), (I-338)+(1.063)+(7.001), (I-338)+(1.063)+(7.002), (I-338)+(1.063)+(7.003), (I-338)+(1.063)+(7.004), (I-338)+(1.063)+(7.005), (I-338)+(1.063)+(7.006), (I-338)+(1.063)+(9.001), (I-338)+(1.063)+(9.002), (I-338)+(1.063)+(9.003), (I-338)+(1.063)+(9.004), (I-338)+(1.063)+(9.005), (I-338)+(1.063)+(9.006), (I-338)+(1.063)+(9.007), (I-338)+(1.063)+(9.008), (I-338)+(1.063)+(9.009), (I-338)+(1.063)+(14.001), (I-338)+(1.063)+(14.002), (I-338)+(1.063)+(15.008), (I-338)+(1.063)+(15.011), (I-338)+(1.063)+(15.012), (I-338)+(1.063)+(15.016), (I-338)+(1.063)+(15.025), (I-338)+(1.063)+(15.027), (I-338)+(1.063)+(15.047), (I-338)+(1.063)+(15.063), (I-338)+(1.063)+(15.064), (I-338)+(1.063)+(16.001), (I-338)+(1.063)+(16.002), (I-338)+(1.063)+(16.003), (I-338)+(1.063)+(16.004), (I-338)+(1.063)+(16.005), (I-338)+(1.063)+(16.006), (I-338)+(1.063)+(16.007), (I-338)+(1.063)+(16.008), (I-338)+(1.063)+(17.001), (I-338)+(1.063)+(17.002), (I-338)+(1.063)+(17.003), (I-338)+(1.063)+(17.004), (I-338)+(1.063)+(17.005), (I-338)+(1.063)+(17.006), (I-338)+(1.063)+(17.007), (I-338)+(1.063)+(17.008), (I-338)+(1.063)+(17.009), (I-338)+(1.063)+(17.010), (I-338)+(1.063)+(17.011), (I-338)+(1.063)+(17.012), (I-338)+(1.063)+(18.001), (I-338)+(1.064)+(1.065), (I-338)+(1.064)+(1.066), (I-338)+(1.064)+(1.067), (I-338)+(1.064)+(1.068), (I-338)+(1.064)+(1.069), (I-338)+(1.064)+(1.070), (I-338)+(1.064)+(1.071), (I-338)+(1.064)+(1.072), (I-338)+(1.064)+(1.073), (I-338)+(1.064)+(1.074), (I-338)+(1.064)+(1.075), (I-338)+(1.064)+(1.076), (I-338)+(1.064)+(1.077), (I-338)+(1.064)+(1.078), (I-338)+(1.064)+(1.079), (I-338)+(1.064)+(1.080), (I-338)+(1.064)+(1.081), (I-338)+(1.064)+(1.082), (I-338)+(1.064)+(1.083), (I-338)+(1.064)+(1.084), (I-338)+(1.064)+(1.085), (I-338)+(1.064)+(1.086), (I-338)+(1.064)+(1.087), (I-338)+(1.064)+(1.088), (I-338)+(1.064)+(1.089), (I-338)+(1.064)+(1.090), (I-338)+(1.064)+(1.091), (I-338)+(1.064)+(1.092), (I-338)+(1.064)+(2.001), (I-338)+(1.064)+(2.002), (I-338)+(1.064)+(2.003), (I-338)+(1.064)+(2.004), (I-338)+(1.064)+(2.005), (I-338)+(1.064)+(2.006), (I-338)+(1.064)+(2.007), (I-338)+(1.064)+(2.008), (I-338)+(1.064)+(2.009), (I-338)+(1.064)+(2.010), (I-338)+(1.064)+(2.011), (I-338)+(1.064)+(2.012), (I-338)+(1.064)+(2.013), (I-338)+(1.064)+(2.014), (I-338)+(1.064)+(2.015), (I-338)+(1.064)+(2.016), (I-338)+(1.064)+(2.017), (I-338)+(1.064)+(2.018), (I-338)+(1.064)+(2.019), (I-338)+(1.064)+(2.020), (I-338)+(1.064)+(2.021), (I-338)+(1.064)+(2.022), (I-338)+(1.064)+(2.023), (I-338)+(1.064)+(2.024), (I-338)+(1.064)+(2.025), (I-338)+(1.064)+(2.026), (I-338)+(1.064)+(2.027), (I-338)+(1.064)+(2.028), (I-338)+(1.064)+(2.029), (I-338)+(1.064)+(2.030), (I-338)+(1.064)+(2.031), (I-338)+(1.064)+(2.032), (I-338)+(1.064)+(2.033), (I-338)+(1.064)+(2.034), (I-338)+(1.064)+(2.035), (I-338)+(1.064)+(2.036), (I-338)+(1.064)+(2.037), (I-338)+(1.064)+(2.038), (I-338)+(1.064)+(2.039), (I-338)+(1.064)+(2.040), (I-338)+(1.064)+(2.041), (I-338)+(1.064)+(2.042), (I-338)+(1.064)+(2.043), (I-338)+(1.064)+(2.044), (I-338)+(1.064)+(2.045), (I-338)+(1.064)+(2.046), (I-338)+(1.064)+(2.047), (I-338)+(1.064)+(2.048), (I-338)+(1.064)+(2.049), (I-338)+(1.064)+(2.050), (I-338)+(1.064)+(2.051), (I-338)+(1.064)+(2.052), (I-338)+(1.064)+(2.053), (I-338)+(1.064)+(2.054), (I-338)+(1.064)+(2.055), (I-338)+(1.064)+(2.056), (I-338)+(1.064)+(2.057), (I-338)+(1.064)+(2.058), (I-338)+(1.064)+(2.059), (I-338)+(1.064)+(3.001), (I-338)+(1.064)+(3.002), (I-338)+(1.064)+(3.003), (I-338)+(1.064)+(3.004), (I-338)+(1.064)+(3.005), (I-338)+(1.064)+(3.006), (I-338)+(1.064)+(3.007), (I-338)+(1.064)+(3.008), (I-338)+(1.064)+(3.009), (I-338)+(1.064)+(3.010), (I-338)+(1.064)+(3.011), (I-338)+(1.064)+(3.012), (I-338)+(1.064)+(3.013), (I-338)+(1.064)+(3.014), (I-338)+(1.064)+(3.015), (I-338)+(1.064)+(3.016), (I-338)+(1.064)+(3.017), (I-338)+(1.064)+(3.018), (I-338)+(1.064)+(3.019), (I-338)+(1.064)+(3.020), (I-338)+(1.064)+(3.021), (I-338)+(1.064)+(3.022), (I-338)+(1.064)+(3.023), (I-338)+(1.064)+(3.024), (I-338)+(1.064)+(3.025), (I-338)+(1.064)+(3.026), (I-338)+(1.064)+(3.027), (I-338)+(1.064)+(3.028), (I-338)+(1.064)+(3.029), (I-338)+(1.064)+(3.030), (I-338)+(1.064)+(3.031), (I-338)+(1.064)+(5.001), (I-338)+(1.064)+(5.002), (I-338)+(1.064)+(5.003), (I-338)+(1.064)+(5.004), (I-338)+(1.064)+(5.005), (I-338)+(1.064)+(5.006), (I-338)+(1.064)+(5.007), (I-338)+(1.064)+(5.008), (I-338)+(1.064)+(5.009), (I-338)+(1.064)+(5.010), (I-338)+(1.064)+(5.011), (I-338)+(1.064)+(5.012), (I-338)+(1.064)+(5.013), (I-338)+(1.064)+(5.014), (I-338)+(1.064)+(5.015), (I-338)+(1.064)+(5.016), (I-338)+(1.064)+(5.017), (I-338)+(1.064)+(5.018), (I-338)+(1.064)+(5.019), (I-338)+(1.064)+(5.020), (I-338)+(1.064)+(5.021), (I-338)+(1.064)+(5.022), (I-338)+(1.064)+(5.023), (I-338)+(1.064)+(6.001), (I-338)+(1.064)+(6.002), (I-338)+(1.064)+(6.003), (I-338)+(1.064)+(6.004), (I-338)+(1.064)+(7.001), (I-338)+(1.064)+(7.002), (I-338)+(1.064)+(7.003), (I-338)+(1.064)+(7.004), (I-338)+(1.064)+(7.005), (I-338)+(1.064)+(7.006), (I-338)+(1.064)+(9.001), (I-338)+(1.064)+(9.002), (I-338)+(1.064)+(9.003), (I-338)+(1.064)+(9.004), (I-338)+(1.064)+(9.005), (I-338)+(1.064)+(9.006), (I-338)+(1.064)+(9.007), (I-338)+(1.064)+(9.008), (I-338)+(1.064)+(9.009), (I-338)+(1.064)+(14.001), (I-338)+(1.064)+(14.002), (I-338)+(1.064)+(15.008), (I-338)+(1.064)+(15.011), (I-338)+(1.064)+(15.012), (I-338)+(1.064)+(15.016), (I-338)+(1.064)+(15.025), (I-338)+(1.064)+(15.027), (I-338)+(1.064)+(15.047), (I-338)+(1.064)+(15.063), (I-338)+(1.064)+(15.064), (I-338)+(1.064)+(16.001), (I-338)+(1.064)+(16.002), (I-338)+(1.064)+(16.003), (I-338)+(1.064)+(16.004), (I-338)+(1.064)+(16.005), (I-338)+(1.064)+(16.006), (I-338)+(1.064)+(16.007), (I-338)+(1.064)+(16.008), (I-338)+(1.064)+(17.001), (I-338)+(1.064)+(17.002), (I-338)+(1.064)+(17.003), (I-338)+(1.064)+(17.004), (I-338)+(1.064)+(17.005), (I-338)+(1.064)+(17.006), (I-338)+(1.064)+(17.007), (I-338)+(1.064)+(17.008), (I-338)+(1.064)+(17.009), (I-338)+(1.064)+(17.010), (I-338)+(1.064)+(17.011), (I-338)+(1.064)+(17.012), (I-338)+(1.064)+(18.001), (I-338)+(1.065)+(1.066), (I-338)+(1.065)+(1.067), (I-338)+(1.065)+(1.068), (I-338)+(1.065)+(1.069), (I-338)+(1.065)+(1.070), (I-338)+(1.065)+(1.071), (I-338)+(1.065)+(1.072), (I-338)+(1.065)+(1.073), (I-338)+(1.065)+(1.074), (I-338)+(1.065)+(1.075), (I-338)+(1.065)+(1.076), (I-338)+(1.065)+(1.077), (I-338)+(1.065)+(1.078), (I-338)+(1.065)+(1.079), (I-338)+(1.065)+(1.080), (I-338)+(1.065)+(1.081), (I-338)+(1.065)+(1.082), (I-338)+(1.065)+(1.083), (I-338)+(1.065)+(1.084), (I-338)+(1.065)+(1.085), (I-338)+(1.065)+(1.086), (I-338)+(1.065)+(1.087), (I-338)+(1.065)+(1.088), (I-338)+(1.065)+(1.089), (I-338)+(1.065)+(1.090), (I-338)+(1.065)+(1.091), (I-338)+(1.065)+(1.092), (I-338)+(1.065)+(2.001), (I-338)+(1.065)+(2.002), (I-338)+(1.065)+(2.003), (I-338)+(1.065)+(2.004), (I-338)+(1.065)+(2.005), (I-338)+(1.065)+(2.006), (I-338)+(1.065)+(2.007), (I-338)+(1.065)+(2.008), (I-338)+(1.065)+(2.009), (I-338)+(1.065)+(2.010), (I-338)+(1.065)+(2.011), (I-338)+(1.065)+(2.012), (I-338)+(1.065)+(2.013), (I-338)+(1.065)+(2.014), (I-338)+(1.065)+(2.015), (I-338)+(1.065)+(2.016), (I-338)+(1.065)+(2.017), (I-338)+(1.065)+(2.018), (I-338)+(1.065)+(2.019), (I-338)+(1.065)+(2.020), (I-338)+(1.065)+(2.021), (I-338)+(1.065)+(2.022), (I-338)+(1.065)+(2.023), (I-338)+(1.065)+(2.024), (I-338)+(1.065)+(2.025), (I-338)+(1.065)+(2.026), (I-338)+(1.065)+(2.027), (I-338)+(1.065)+(2.028), (I-338)+(1.065)+(2.029), (I-338)+(1.065)+(2.030), (I-338)+(1.065)+(2.031), (I-338)+(1.065)+(2.032), (I-338)+(1.065)+(2.033), (I-338)+(1.065)+(2.034), (I-338)+(1.065)+(2.035), (I-338)+(1.065)+(2.036), (I-338)+(1.065)+(2.037), (I-338)+(1.065)+(2.038), (I-338)+(1.065)+(2.039), (I-338)+(1.065)+(2.040), (I-338)+(1.065)+(2.041), (I-338)+(1.065)+(2.042), (I-338)+(1.065)+(2.043), (I-338)+(1.065)+(2.044), (I-338)+(1.065)+(2.045), (I-338)+(1.065)+(2.046), (I-338)+(1.065)+(2.047), (I-338)+(1.065)+(2.048), (I-338)+(1.065)+(2.049), (I-338)+(1.065)+(2.050), (I-338)+(1.065)+(2.051), (I-338)+(1.065)+(2.052), (I-338)+(1.065)+(2.053), (I-338)+(1.065)+(2.054), (I-338)+(1.065)+(2.055), (I-338)+(1.065)+(2.056), (I-338)+(1.065)+(2.057), (I-338)+(1.065)+(2.058), (I-338)+(1.065)+(2.059), (I-338)+(1.065)+(3.001), (I-338)+(1.065)+(3.002), (I-338)+(1.065)+(3.003), (I-338)+(1.065)+(3.004), (I-338)+(1.065)+(3.005), (I-338)+(1.065)+(3.006), (I-338)+(1.065)+(3.007), (I-338)+(1.065)+(3.008), (I-338)+(1.065)+(3.009), (I-338)+(1.065)+(3.010), (I-338)+(1.065)+(3.011), (I-338)+(1.065)+(3.012), (I-338)+(1.065)+(3.013), (I-338)+(1.065)+(3.014), (I-338)+(1.065)+(3.015), (I-338)+(1.065)+(3.016), (I-338)+(1.065)+(3.017), (I-338)+(1.065)+(3.018), (I-338)+(1.065)+(3.019), (I-338)+(1.065)+(3.020), (I-338)+(1.065)+(3.021), (I-338)+(1.065)+(3.022), (I-338)+(1.065)+(3.023), (I-338)+(1.065)+(3.024), (I-338)+(1.065)+(3.025), (I-338)+(1.065)+(3.026), (I-338)+(1.065)+(3.027), (I-338)+(1.065)+(3.028), (I-338)+(1.065)+(3.029), (I-338)+(1.065)+(3.030), (I-338)+(1.065)+(3.031), (I-338)+(1.065)+(5.001), (I-338)+(1.065)+(5.002), (I-338)+(1.065)+(5.003), (I-338)+(1.065)+(5.004), (I-338)+(1.065)+(5.005), (I-338)+(1.065)+(5.006), (I-338)+(1.065)+(5.007), (I-338)+(1.065)+(5.008), (I-338)+(1.065)+(5.009), (I-338)+(1.065)+(5.010), (I-338)+(1.065)+(5.011), (I-338)+(1.065)+(5.012), (I-338)+(1.065)+(5.013), (I-338)+(1.065)+(5.014), (I-338)+(1.065)+(5.015), (I-338)+(1.065)+(5.016), (I-338)+(1.065)+(5.017), (I-338)+(1.065)+(5.018), (I-338)+(1.065)+(5.019), (I-338)+(1.065)+(5.020), (I-338)+(1.065)+(5.021), (I-338)+(1.065)+(5.022), (I-338)+(1.065)+(5.023), (I-338)+(1.065)+(6.001), (I-338)+(1.065)+(6.002), (I-338)+(1.065)+(6.003), (I-338)+(1.065)+(6.004), (I-338)+(1.065)+(7.001), (I-338)+(1.065)+(7.002), (I-338)+(1.065)+(7.003), (I-338)+(1.065)+(7.004), (I-338)+(1.065)+(7.005), (I-338)+(1.065)+(7.006), (I-338)+(1.065)+(9.001), (I-338)+(1.065)+(9.002), (I-338)+(1.065)+(9.003), (I-338)+(1.065)+(9.004), (I-338)+(1.065)+(9.005), (I-338)+(1.065)+(9.006), (I-338)+(1.065)+(9.007), (I-338)+(1.065)+(9.008), (I-338)+(1.065)+(9.009), (I-338)+(1.065)+(14.001), (I-338)+(1.065)+(14.002), (I-338)+(1.065)+(15.008), (I-338)+(1.065)+(15.011), (I-338)+(1.065)+(15.012), (I-338)+(1.065)+(15.016), (I-338)+(1.065)+(15.025), (I-338)+(1.065)+(15.027), (I-338)+(1.065)+(15.047), (I-338)+(1.065)+(15.063), (I-338)+(1.065)+(15.064), (I-338)+(1.065)+(16.001), (I-338)+(1.065)+(16.002), (I-338)+(1.065)+(16.003), (I-338)+(1.065)+(16.004), (I-338)+(1.065)+(16.005), (I-338)+(1.065)+(16.006), (I-338)+(1.065)+(16.007), (I-338)+(1.065)+(16.008), (I-338)+(1.065)+(17.001), (I-338)+(1.065)+(17.002), (I-338)+(1.065)+(17.003), (I-338)+(1.065)+(17.004), (I-338)+(1.065)+(17.005), (I-338)+(1.065)+(17.006), (I-338)+(1.065)+(17.007), (I-338)+(1.065)+(17.008), (I-338)+(1.065)+(17.009), (I-338)+(1.065)+(17.010), (I-338)+(1.065)+(17.011), (I-338)+(1.065)+(17.012), (I-338)+(1.065)+(18.001), (I-338)+(1.066)+(1.067), (I-338)+(1.066)+(1.068), (I-338)+(1.066)+(1.069), (I-338)+(1.066)+(1.070), (I-338)+(1.066)+(1.071), (I-338)+(1.066)+(1.072), (I-338)+(1.066)+(1.073), (I-338)+(1.066)+(1.074), (I-338)+(1.066)+(1.075), (I-338)+(1.066)+(1.076), (I-338)+(1.066)+(1.077), (I-338)+(1.066)+(1.078), (I-338)+(1.066)+(1.079), (I-338)+(1.066)+(1.080), (I-338)+(1.066)+(1.081), (I-338)+(1.066)+(1.082), (I-338)+(1.066)+(1.083), (I-338)+(1.066)+(1.084), (I-338)+(1.066)+(1.085), (I-338)+(1.066)+(1.086), (I-338)+(1.066)+(1.087), (I-338)+(1.066)+(1.088), (I-338)+(1.066)+(1.089), (I-338)+(1.066)+(1.090), (I-338)+(1.066)+(1.091), (I-338)+(1.066)+(1.092), (I-338)+(1.066)+(2.001), (I-338)+(1.066)+(2.002), (I-338)+(1.066)+(2.003), (I-338)+(1.066)+(2.004), (I-338)+(1.066)+(2.005), (I-338)+(1.066)+(2.006), (I-338)+(1.066)+(2.007), (I-338)+(1.066)+(2.008), (I-338)+(1.066)+(2.009), (I-338)+(1.066)+(2.010), (I-338)+(1.066)+(2.011), (I-338)+(1.066)+(2.012), (I-338)+(1.066)+(2.013), (I-338)+(1.066)+(2.014), (I-338)+(1.066)+(2.015), (I-338)+(1.066)+(2.016), (I-338)+(1.066)+(2.017), (I-338)+(1.066)+(2.018), (I-338)+(1.066)+(2.019), (I-338)+(1.066)+(2.020), (I-338)+(1.066)+(2.021), (I-338)+(1.066)+(2.022), (I-338)+(1.066)+(2.023), (I-338)+(1.066)+(2.024), (I-338)+(1.066)+(2.025), (I-338)+(1.066)+(2.026), (I-338)+(1.066)+(2.027), (I-338)+(1.066)+(2.028), (I-338)+(1.066)+(2.029), (I-338)+(1.066)+(2.030), (I-338)+(1.066)+(2.031), (I-338)+(1.066)+(2.032), (I-338)+(1.066)+(2.033), (I-338)+(1.066)+(2.034), (I-338)+(1.066)+(2.035), (I-338)+(1.066)+(2.036), (I-338)+(1.066)+(2.037), (I-338)+(1.066)+(2.038), (I-338)+(1.066)+(2.039), (I-338)+(1.066)+(2.040), (I-338)+(1.066)+(2.041), (I-338)+(1.066)+(2.042), (I-338)+(1.066)+(2.043), (I-338)+(1.066)+(2.044), (I-338)+(1.066)+(2.045), (I-338)+(1.066)+(2.046), (I-338)+(1.066)+(2.047), (I-338)+(1.066)+(2.048), (I-338)+(1.066)+(2.049), (I-338)+(1.066)+(2.050), (I-338)+(1.066)+(2.051), (I-338)+(1.066)+(2.052), (I-338)+(1.066)+(2.053), (I-338)+(1.066)+(2.054), (I-338)+(1.066)+(2.055), (I-338)+(1.066)+(2.056), (I-338)+(1.066)+(2.057), (I-338)+(1.066)+(2.058), (I-338)+(1.066)+(2.059), (I-338)+(1.066)+(3.001), (I-338)+(1.066)+(3.002), (I-338)+(1.066)+(3.003), (I-338)+(1.066)+(3.004), (I-338)+(1.066)+(3.005), (I-338)+(1.066)+(3.006), (I-338)+(1.066)+(3.007), (I-338)+(1.066)+(3.008), (I-338)+(1.066)+(3.009), (I-338)+(1.066)+(3.010), (I-338)+(1.066)+(3.011), (I-338)+(1.066)+(3.012), (I-338)+(1.066)+(3.013), (I-338)+(1.066)+(3.014), (I-338)+(1.066)+(3.015), (I-338)+(1.066)+(3.016), (I-338)+(1.066)+(3.017), (I-338)+(1.066)+(3.018), (I-338)+(1.066)+(3.019), (I-338)+(1.066)+(3.020), (I-338)+(1.066)+(3.021), (I-338)+(1.066)+(3.022), (I-338)+(1.066)+(3.023), (I-338)+(1.066)+(3.024), (I-338)+(1.066)+(3.025), (I-338)+(1.066)+(3.026), (I-338)+(1.066)+(3.027), (I-338)+(1.066)+(3.028), (I-338)+(1.066)+(3.029), (I-338)+(1.066)+(3.030), (I-338)+(1.066)+(3.031), (I-338)+(1.066)+(5.001), (I-338)+(1.066)+(5.002), (I-338)+(1.066)+(5.003), (I-338)+(1.066)+(5.004), (I-338)+(1.066)+(5.005), (I-338)+(1.066)+(5.006), (I-338)+(1.066)+(5.007), (I-338)+(1.066)+(5.008), (I-338)+(1.066)+(5.009), (I-338)+(1.066)+(5.010), (I-338)+(1.066)+(5.011), (I-338)+(1.066)+(5.012), (I-338)+(1.066)+(5.013), (I-338)+(1.066)+(5.014), (I-338)+(1.066)+(5.015), (I-338)+(1.066)+(5.016), (I-338)+(1.066)+(5.017), (I-338)+(1.066)+(5.018), (I-338)+(1.066)+(5.019), (I-338)+(1.066)+(5.020), (I-338)+(1.066)+(5.021), (I-338)+(1.066)+(5.022), (I-338)+(1.066)+(5.023), (I-338)+(1.066)+(6.001), (I-338)+(1.066)+(6.002), (I-338)+(1.066)+(6.003), (I-338)+(1.066)+(6.004), (I-338)+(1.066)+(7.001), (I-338)+(1.066)+(7.002), (I-338)+(1.066)+(7.003), (I-338)+(1.066)+(7.004), (I-338)+(1.066)+(7.005), (I-338)+(1.066)+(7.006), (I-338)+(1.066)+(9.001), (I-338)+(1.066)+(9.002), (I-338)+(1.066)+(9.003), (I-338)+(1.066)+(9.004), (I-338)+(1.066)+(9.005), (I-338)+(1.066)+(9.006), (I-338)+(1.066)+(9.007), (I-338)+(1.066)+(9.008), (I-338)+(1.066)+(9.009), (I-338)+(1.066)+(14.001), (I-338)+(1.066)+(14.002), (I-338)+(1.066)+(15.008), (I-338)+(1.066)+(15.011), (I-338)+(1.066)+(15.012), (I-338)+(1.066)+(15.016), (I-338)+(1.066)+(15.025), (I-338)+(1.066)+(15.027), (I-338)+(1.066)+(15.047), (I-338)+(1.066)+(15.063), (I-338)+(1.066)+(15.064), (I-338)+(1.066)+(16.001), (I-338)+(1.066)+(16.002), (I-338)+(1.066)+(16.003), (I-338)+(1.066)+(16.004), (I-338)+(1.066)+(16.005), (I-338)+(1.066)+(16.006), (I-338)+(1.066)+(16.007), (I-338)+(1.066)+(16.008), (I-338)+(1.066)+(17.001), (I-338)+(1.066)+(17.002), (I-338)+(1.066)+(17.003), (I-338)+(1.066)+(17.004), (I-338)+(1.066)+(17.005), (I-338)+(1.066)+(17.006), (I-338)+(1.066)+(17.007), (I-338)+(1.066)+(17.008), (I-338)+(1.066)+(17.009), (I-338)+(1.066)+(17.010), (I-338)+(1.066)+(17.011), (I-338)+(1.066)+(17.012), (I-338)+(1.066)+(18.001), (I-338)+(1.067)+(1.068), (I-338)+(1.067)+(1.069), (I-338)+(1.067)+(1.070), (I-338)+(1.067)+(1.071), (I-338)+(1.067)+(1.072), (I-338)+(1.067)+(1.073), (I-338)+(1.067)+(1.074), (I-338)+(1.067)+(1.075), (I-338)+(1.067)+(1.076), (I-338)+(1.067)+(1.077), (I-338)+(1.067)+(1.078), (I-338)+(1.067)+(1.079), (I-338)+(1.067)+(1.080), (I-338)+(1.067)+(1.081), (I-338)+(1.067)+(1.082), (I-338)+(1.067)+(1.083), (I-338)+(1.067)+(1.084), (I-338)+(1.067)+(1.085), (I-338)+(1.067)+(1.086), (I-338)+(1.067)+(1.087), (I-338)+(1.067)+(1.088), (I-338)+(1.067)+(1.089), (I-338)+(1.067)+(1.090), (I-338)+(1.067)+(1.091), (I-338)+(1.067)+(1.092), (I-338)+(1.067)+(2.001), (I-338)+(1.067)+(2.002), (I-338)+(1.067)+(2.003), (I-338)+(1.067)+(2.004), (I-338)+(1.067)+(2.005), (I-338)+(1.067)+(2.006), (I-338)+(1.067)+(2.007), (I-338)+(1.067)+(2.008), (I-338)+(1.067)+(2.009), (I-338)+(1.067)+(2.010), (I-338)+(1.067)+(2.011), (I-338)+(1.067)+(2.012), (I-338)+(1.067)+(2.013), (I-338)+(1.067)+(2.014), (I-338)+(1.067)+(2.015), (I-338)+(1.067)+(2.016), (I-338)+(1.067)+(2.017), (I-338)+(1.067)+(2.018), (I-338)+(1.067)+(2.019), (I-338)+(1.067)+(2.020), (I-338)+(1.067)+(2.021), (I-338)+(1.067)+(2.022), (I-338)+(1.067)+(2.023), (I-338)+(1.067)+(2.024), (I-338)+(1.067)+(2.025), (I-338)+(1.067)+(2.026), (I-338)+(1.067)+(2.027), (I-338)+(1.067)+(2.028), (I-338)+(1.067)+(2.029), (I-338)+(1.067)+(2.030), (I-338)+(1.067)+(2.031), (I-338)+(1.067)+(2.032), (I-338)+(1.067)+(2.033), (I-338)+(1.067)+(2.034), (I-338)+(1.067)+(2.035), (I-338)+(1.067)+(2.036), (I-338)+(1.067)+(2.037), (I-338)+(1.067)+(2.038), (I-338)+(1.067)+(2.039), (I-338)+(1.067)+(2.040), (I-338)+(1.067)+(2.041), (I-338)+(1.067)+(2.042), (I-338)+(1.067)+(2.043), (I-338)+(1.067)+(2.044), (I-338)+(1.067)+(2.045), (I-338)+(1.067)+(2.046), (I-338)+(1.067)+(2.047), (I-338)+(1.067)+(2.048), (I-338)+(1.067)+(2.049), (I-338)+(1.067)+(2.050), (I-338)+(1.067)+(2.051), (I-338)+(1.067)+(2.052), (I-338)+(1.067)+(2.053), (I-338)+(1.067)+(2.054), (I-338)+(1.067)+(2.055), (I-338)+(1.067)+(2.056), (I-338)+(1.067)+(2.057), (I-338)+(1.067)+(2.058), (I-338)+(1.067)+(2.059), (I-338)+(1.067)+(3.001), (I-338)+(1.067)+(3.002), (I-338)+(1.067)+(3.003), (I-338)+(1.067)+(3.004), (I-338)+(1.067)+(3.005), (I-338)+(1.067)+(3.006), (I-338)+(1.067)+(3.007), (I-338)+(1.067)+(3.008), (I-338)+(1.067)+(3.009), (I-338)+(1.067)+(3.010), (I-338)+(1.067)+(3.011), (I-338)+(1.067)+(3.012), (I-338)+(1.067)+(3.013), (I-338)+(1.067)+(3.014), (I-338)+(1.067)+(3.015), (I-338)+(1.067)+(3.016), (I-338)+(1.067)+(3.017), (I-338)+(1.067)+(3.018), (I-338)+(1.067)+(3.019), (I-338)+(1.067)+(3.020), (I-338)+(1.067)+(3.021), (I-338)+(1.067)+(3.022), (I-338)+(1.067)+(3.023), (I-338)+(1.067)+(3.024), (I-338)+(1.067)+(3.025), (I-338)+(1.067)+(3.026), (I-338)+(1.067)+(3.027), (I-338)+(1.067)+(3.028), (I-338)+(1.067)+(3.029), (I-338)+(1.067)+(3.030), (I-338)+(1.067)+(3.031), (I-338)+(1.067)+(5.001), (I-338)+(1.067)+(5.002), (I-338)+(1.067)+(5.003), (I-338)+(1.067)+(5.004), (I-338)+(1.067)+(5.005), (I-338)+(1.067)+(5.006), (I-338)+(1.067)+(5.007), (I-338)+(1.067)+(5.008), (I-338)+(1.067)+(5.009), (I-338)+(1.067)+(5.010), (I-338)+(1.067)+(5.011), (I-338)+(1.067)+(5.012), (I-338)+(1.067)+(5.013), (I-338)+(1.067)+(5.014), (I-338)+(1.067)+(5.015), (I-338)+(1.067)+(5.016), (I-338)+(1.067)+(5.017), (I-338)+(1.067)+(5.018), (I-338)+(1.067)+(5.019), (I-338)+(1.067)+(5.020), (I-338)+(1.067)+(5.021), (I-338)+(1.067)+(5.022), (I-338)+(1.067)+(5.023), (I-338)+(1.067)+(6.001), (I-338)+(1.067)+(6.002), (I-338)+(1.067)+(6.003), (I-338)+(1.067)+(6.004), (I-338)+(1.067)+(7.001), (I-338)+(1.067)+(7.002), (I-338)+(1.067)+(7.003), (I-338)+(1.067)+(7.004), (I-338)+(1.067)+(7.005), (I-338)+(1.067)+(7.006), (I-338)+(1.067)+(9.001), (I-338)+(1.067)+(9.002), (I-338)+(1.067)+(9.003), (I-338)+(1.067)+(9.004), (I-338)+(1.067)+(9.005), (I-338)+(1.067)+(9.006), (I-338)+(1.067)+(9.007), (I-338)+(1.067)+(9.008), (I-338)+(1.067)+(9.009), (I-338)+(1.067)+(14.001), (I-338)+(1.067)+(14.002), (I-338)+(1.067)+(15.008), (I-338)+(1.067)+(15.011), (I-338)+(1.067)+(15.012), (I-338)+(1.067)+(15.016), (I-338)+(1.067)+(15.025), (I-338)+(1.067)+(15.027), (I-338)+(1.067)+(15.047), (I-338)+(1.067)+(15.063), (I-338)+(1.067)+(15.064), (I-338)+(1.067)+(16.001), (I-338)+(1.067)+(16.002), (I-338)+(1.067)+(16.003), (I-338)+(1.067)+(16.004), (I-338)+(1.067)+(16.005), (I-338)+(1.067)+(16.006), (I-338)+(1.067)+(16.007), (I-338)+(1.067)+(16.008), (I-338)+(1.067)+(17.001), (I-338)+(1.067)+(17.002), (I-338)+(1.067)+(17.003), (I-338)+(1.067)+(17.004), (I-338)+(1.067)+(17.005), (I-338)+(1.067)+(17.006), (I-338)+(1.067)+(17.007), (I-338)+(1.067)+(17.008), (I-338)+(1.067)+(17.009), (I-338)+(1.067)+(17.010), (I-338)+(1.067)+(17.011), (I-338)+(1.067)+(17.012), (I-338)+(1.067)+(18.001), (I-338)+(1.068)+(1.069), (I-338)+(1.068)+(1.070), (I-338)+(1.068)+(1.071), (I-338)+(1.068)+(1.072), (I-338)+(1.068)+(1.073), (I-338)+(1.068)+(1.074), (I-338)+(1.068)+(1.075), (I-338)+(1.068)+(1.076), (I-338)+(1.068)+(1.077), (I-338)+(1.068)+(1.078), (I-338)+(1.068)+(1.079), (I-338)+(1.068)+(1.080), (I-338)+(1.068)+(1.081), (I-338)+(1.068)+(1.082), (I-338)+(1.068)+(1.083), (I-338)+(1.068)+(1.084), (I-338)+(1.068)+(1.085), (I-338)+(1.068)+(1.086), (I-338)+(1.068)+(1.087), (I-338)+(1.068)+(1.088), (I-338)+(1.068)+(1.089), (I-338)+(1.068)+(1.090), (I-338)+(1.068)+(1.091), (I-338)+(1.068)+(1.092), (I-338)+(1.068)+(2.001), (I-338)+(1.068)+(2.002), (I-338)+(1.068)+(2.003), (I-338)+(1.068)+(2.004), (I-338)+(1.068)+(2.005), (I-338)+(1.068)+(2.006), (I-338)+(1.068)+(2.007), (I-338)+(1.068)+(2.008), (I-338)+(1.068)+(2.009), (I-338)+(1.068)+(2.010), (I-338)+(1.068)+(2.011), (I-338)+(1.068)+(2.012), (I-338)+(1.068)+(2.013), (I-338)+(1.068)+(2.014), (I-338)+(1.068)+(2.015), (I-338)+(1.068)+(2.016), (I-338)+(1.068)+(2.017), (I-338)+(1.068)+(2.018), (I-338)+(1.068)+(2.019), (I-338)+(1.068)+(2.020), (I-338)+(1.068)+(2.021), (I-338)+(1.068)+(2.022), (I-338)+(1.068)+(2.023), (I-338)+(1.068)+(2.024), (I-338)+(1.068)+(2.025), (I-338)+(1.068)+(2.026), (I-338)+(1.068)+(2.027), (I-338)+(1.068)+(2.028), (I-338)+(1.068)+(2.029), (I-338)+(1.068)+(2.030), (I-338)+(1.068)+(2.031), (I-338)+(1.068)+(2.032), (I-338)+(1.068)+(2.033), (I-338)+(1.068)+(2.034), (I-338)+(1.068)+(2.035), (I-338)+(1.068)+(2.036), (I-338)+(1.068)+(2.037), (I-338)+(1.068)+(2.038), (I-338)+(1.068)+(2.039), (I-338)+(1.068)+(2.040), (I-338)+(1.068)+(2.041), (I-338)+(1.068)+(2.042), (I-338)+(1.068)+(2.043), (I-338)+(1.068)+(2.044), (I-338)+(1.068)+(2.045), (I-338)+(1.068)+(2.046), (I-338)+(1.068)+(2.047), (I-338)+(1.068)+(2.048), (I-338)+(1.068)+(2.049), (I-338)+(1.068)+(2.050), (I-338)+(1.068)+(2.051), (I-338)+(1.068)+(2.052), (I-338)+(1.068)+(2.053), (I-338)+(1.068)+(2.054), (I-338)+(1.068)+(2.055), (I-338)+(1.068)+(2.056), (I-338)+(1.068)+(2.057), (I-338)+(1.068)+(2.058), (I-338)+(1.068)+(2.059), (I-338)+(1.068)+(3.001), (I-338)+(1.068)+(3.002), (I-338)+(1.068)+(3.003), (I-338)+(1.068)+(3.004), (I-338)+(1.068)+(3.005), (I-338)+(1.068)+(3.006), (I-338)+(1.068)+(3.007), (I-338)+(1.068)+(3.008), (I-338)+(1.068)+(3.009), (I-338)+(1.068)+(3.010), (I-338)+(1.068)+(3.011), (I-338)+(1.068)+(3.012), (I-338)+(1.068)+(3.013), (I-338)+(1.068)+(3.014), (I-338)+(1.068)+(3.015), (I-338)+(1.068)+(3.016), (I-338)+(1.068)+(3.017), (I-338)+(1.068)+(3.018), (I-338)+(1.068)+(3.019), (I-338)+(1.068)+(3.020), (I-338)+(1.068)+(3.021), (I-338)+(1.068)+(3.022), (I-338)+(1.068)+(3.023), (I-338)+(1.068)+(3.024), (I-338)+(1.068)+(3.025), (I-338)+(1.068)+(3.026), (I-338)+(1.068)+(3.027), (I-338)+(1.068)+(3.028), (I-338)+(1.068)+(3.029), (I-338)+(1.068)+(3.030), (I-338)+(1.068)+(3.031), (I-338)+(1.068)+(5.001), (I-338)+(1.068)+(5.002), (I-338)+(1.068)+(5.003), (I-338)+(1.068)+(5.004), (I-338)+(1.068)+(5.005), (I-338)+(1.068)+(5.006), (I-338)+(1.068)+(5.007), (I-338)+(1.068)+(5.008), (I-338)+(1.068)+(5.009), (I-338)+(1.068)+(5.010), (I-338)+(1.068)+(5.011), (I-338)+(1.068)+(5.012), (I-338)+(1.068)+(5.013), (I-338)+(1.068)+(5.014), (I-338)+(1.068)+(5.015), (I-338)+(1.068)+(5.016), (I-338)+(1.068)+(5.017), (I-338)+(1.068)+(5.018), (I-338)+(1.068)+(5.019), (I-338)+(1.068)+(5.020), (I-338)+(1.068)+(5.021), (I-338)+(1.068)+(5.022), (I-338)+(1.068)+(5.023), (I-338)+(1.068)+(6.001), (I-338)+(1.068)+(6.002), (I-338)+(1.068)+(6.003), (I-338)+(1.068)+(6.004), (I-338)+(1.068)+(7.001), (I-338)+(1.068)+(7.002), (I-338)+(1.068)+(7.003), (I-338)+(1.068)+(7.004), (I-338)+(1.068)+(7.005), (I-338)+(1.068)+(7.006), (I-338)+(1.068)+(9.001), (I-338)+(1.068)+(9.002), (I-338)+(1.068)+(9.003), (I-338)+(1.068)+(9.004), (I-338)+(1.068)+(9.005), (I-338)+(1.068)+(9.006), (I-338)+(1.068)+(9.007), (I-338)+(1.068)+(9.008), (I-338)+(1.068)+(9.009), (I-338)+(1.068)+(14.001), (I-338)+(1.068)+(14.002), (I-338)+(1.068)+(15.008), (I-338)+(1.068)+(15.011), (I-338)+(1.068)+(15.012), (I-338)+(1.068)+(15.016), (I-338)+(1.068)+(15.025), (I-338)+(1.068)+(15.027), (I-338)+(1.068)+(15.047), (I-338)+(1.068)+(15.063), (I-338)+(1.068)+(15.064), (I-338)+(1.068)+(16.001), (I-338)+(1.068)+(16.002), (I-338)+(1.068)+(16.003), (I-338)+(1.068)+(16.004), (I-338)+(1.068)+(16.005), (I-338)+(1.068)+(16.006), (I-338)+(1.068)+(16.007), (I-338)+(1.068)+(16.008), (I-338)+(1.068)+(17.001), (I-338)+(1.068)+(17.002), (I-338)+(1.068)+(17.003), (I-338)+(1.068)+(17.004), (I-338)+(1.068)+(17.005), (I-338)+(1.068)+(17.006), (I-338)+(1.068)+(17.007), (I-338)+(1.068)+(17.008), (I-338)+(1.068)+(17.009), (I-338)+(1.068)+(17.010), (I-338)+(1.068)+(17.011), (I-338)+(1.068)+(17.012), (I-338)+(1.068)+(18.001), (I-338)+(1.069)+(1.070), (I-338)+(1.069)+(1.071), (I-338)+(1.069)+(1.072), (I-338)+(1.069)+(1.073), (I-338)+(1.069)+(1.074), (I-338)+(1.069)+(1.075), (I-338)+(1.069)+(1.076), (I-338)+(1.069)+(1.077), (I-338)+(1.069)+(1.078), (I-338)+(1.069)+(1.079), (I-338)+(1.069)+(1.080), (I-338)+(1.069)+(1.081), (I-338)+(1.069)+(1.082), (I-338)+(1.069)+(1.083), (I-338)+(1.069)+(1.084), (I-338)+(1.069)+(1.085), (I-338)+(1.069)+(1.086), (I-338)+(1.069)+(1.087), (I-338)+(1.069)+(1.088), (I-338)+(1.069)+(1.089), (I-338)+(1.069)+(1.090), (I-338)+(1.069)+(1.091), (I-338)+(1.069)+(1.092), (I-338)+(1.069)+(2.001), (I-338)+(1.069)+(2.002), (I-338)+(1.069)+(2.003), (I-338)+(1.069)+(2.004), (I-338)+(1.069)+(2.005), (I-338)+(1.069)+(2.006), (I-338)+(1.069)+(2.007), (I-338)+(1.069)+(2.008), (I-338)+(1.069)+(2.009), (I-338)+(1.069)+(2.010), (I-338)+(1.069)+(2.011), (I-338)+(1.069)+(2.012), (I-338)+(1.069)+(2.013), (I-338)+(1.069)+(2.014), (I-338)+(1.069)+(2.015), (I-338)+(1.069)+(2.016), (I-338)+(1.069)+(2.017), (I-338)+(1.069)+(2.018), (I-338)+(1.069)+(2.019), (I-338)+(1.069)+(2.020), (I-338)+(1.069)+(2.021), (I-338)+(1.069)+(2.022), (I-338)+(1.069)+(2.023), (I-338)+(1.069)+(2.024), (I-338)+(1.069)+(2.025), (I-338)+(1.069)+(2.026), (I-338)+(1.069)+(2.027), (I-338)+(1.069)+(2.028), (I-338)+(1.069)+(2.029), (I-338)+(1.069)+(2.030), (I-338)+(1.069)+(2.031), (I-338)+(1.069)+(2.032), (I-338)+(1.069)+(2.033), (I-338)+(1.069)+(2.034), (I-338)+(1.069)+(2.035), (I-338)+(1.069)+(2.036), (I-338)+(1.069)+(2.037), (I-338)+(1.069)+(2.038), (I-338)+(1.069)+(2.039), (I-338)+(1.069)+(2.040), (I-338)+(1.069)+(2.041), (I-338)+(1.069)+(2.042), (I-338)+(1.069)+(2.043), (I-338)+(1.069)+(2.044), (I-338)+(1.069)+(2.045), (I-338)+(1.069)+(2.046), (I-338)+(1.069)+(2.047), (I-338)+(1.069)+(2.048), (I-338)+(1.069)+(2.049), (I-338)+(1.069)+(2.050), (I-338)+(1.069)+(2.051), (I-338)+(1.069)+(2.052), (I-338)+(1.069)+(2.053), (I-338)+(1.069)+(2.054), (I-338)+(1.069)+(2.055), (I-338)+(1.069)+(2.056), (I-338)+(1.069)+(2.057), (I-338)+(1.069)+(2.058), (I-338)+(1.069)+(2.059), (I-338)+(1.069)+(3.001), (I-338)+(1.069)+(3.002), (I-338)+(1.069)+(3.003), (I-338)+(1.069)+(3.004), (I-338)+(1.069)+(3.005), (I-338)+(1.069)+(3.006), (I-338)+(1.069)+(3.007), (I-338)+(1.069)+(3.008), (I-338)+(1.069)+(3.009), (I-338)+(1.069)+(3.010), (I-338)+(1.069)+(3.011), (I-338)+(1.069)+(3.012), (I-338)+(1.069)+(3.013), (I-338)+(1.069)+(3.014), (I-338)+(1.069)+(3.015), (I-338)+(1.069)+(3.016), (I-338)+(1.069)+(3.017), (I-338)+(1.069)+(3.018), (I-338)+(1.069)+(3.019), (I-338)+(1.069)+(3.020), (I-338)+(1.069)+(3.021), (I-338)+(1.069)+(3.022), (I-338)+(1.069)+(3.023), (I-338)+(1.069)+(3.024), (I-338)+(1.069)+(3.025), (I-338)+(1.069)+(3.026), (I-338)+(1.069)+(3.027), (I-338)+(1.069)+(3.028), (I-338)+(1.069)+(3.029), (I-338)+(1.069)+(3.030), (I-338)+(1.069)+(3.031), (I-338)+(1.069)+(5.001), (I-338)+(1.069)+(5.002), (I-338)+(1.069)+(5.003), (I-338)+(1.069)+(5.004), (I-338)+(1.069)+(5.005), (I-338)+(1.069)+(5.006), (I-338)+(1.069)+(5.007), (I-338)+(1.069)+(5.008), (I-338)+(1.069)+(5.009), (I-338)+(1.069)+(5.010), (I-338)+(1.069)+(5.011), (I-338)+(1.069)+(5.012), (I-338)+(1.069)+(5.013), (I-338)+(1.069)+(5.014), (I-338)+(1.069)+(5.015), (I-338)+(1.069)+(5.016), (I-338)+(1.069)+(5.017), (I-338)+(1.069)+(5.018), (I-338)+(1.069)+(5.019), (I-338)+(1.069)+(5.020), (I-338)+(1.069)+(5.021), (I-338)+(1.069)+(5.022), (I-338)+(1.069)+(5.023), (I-338)+(1.069)+(6.001), (I-338)+(1.069)+(6.002), (I-338)+(1.069)+(6.003), (I-338)+(1.069)+(6.004), (I-338)+(1.069)+(7.001), (I-338)+(1.069)+(7.002), (I-338)+(1.069)+(7.003), (I-338)+(1.069)+(7.004), (I-338)+(1.069)+(7.005), (I-338)+(1.069)+(7.006), (I-338)+(1.069)+(9.001), (I-338)+(1.069)+(9.002), (I-338)+(1.069)+(9.003), (I-338)+(1.069)+(9.004), (I-338)+(1.069)+(9.005), (I-338)+(1.069)+(9.006), (I-338)+(1.069)+(9.007), (I-338)+(1.069)+(9.008), (I-338)+(1.069)+(9.009), (I-338)+(1.069)+(14.001), (I-338)+(1.069)+(14.002), (I-338)+(1.069)+(15.008), (I-338)+(1.069)+(15.011), (I-338)+(1.069)+(15.012), (I-338)+(1.069)+(15.016), (I-338)+(1.069)+(15.025), (I-338)+(1.069)+(15.027), (I-338)+(1.069)+(15.047), (I-338)+(1.069)+(15.063), (I-338)+(1.069)+(15.064), (I-338)+(1.069)+(16.001), (I-338)+(1.069)+(16.002), (I-338)+(1.069)+(16.003), (I-338)+(1.069)+(16.004), (I-338)+(1.069)+(16.005), (I-338)+(1.069)+(16.006), (I-338)+(1.069)+(16.007), (I-338)+(1.069)+(16.008), (I-338)+(1.069)+(17.001), (I-338)+(1.069)+(17.002), (I-338)+(1.069)+(17.003), (I-338)+(1.069)+(17.004), (I-338)+(1.069)+(17.005), (I-338)+(1.069)+(17.006), (I-338)+(1.069)+(17.007), (I-338)+(1.069)+(17.008), (I-338)+(1.069)+(17.009), (I-338)+(1.069)+(17.010), (I-338)+(1.069)+(17.011), (I-338)+(1.069)+(17.012), (I-338)+(1.069)+(18.001), (I-338)+(1.070)+(1.071), (I-338)+(1.070)+(1.072), (I-338)+(1.070)+(1.073), (I-338)+(1.070)+(1.074), (I-338)+(1.070)+(1.075), (I-338)+(1.070)+(1.076), (I-338)+(1.070)+(1.077), (I-338)+(1.070)+(1.078), (I-338)+(1.070)+(1.079), (I-338)+(1.070)+(1.080), (I-338)+(1.070)+(1.081), (I-338)+(1.070)+(1.082), (I-338)+(1.070)+(1.083), (I-338)+(1.070)+(1.084), (I-338)+(1.070)+(1.085), (I-338)+(1.070)+(1.086), (I-338)+(1.070)+(1.087), (I-338)+(1.070)+(1.088), (I-338)+(1.070)+(1.089), (I-338)+(1.070)+(1.090), (I-338)+(1.070)+(1.091), (I-338)+(1.070)+(1.092), (I-338)+(1.070)+(2.001), (I-338)+(1.070)+(2.002), (I-338)+(1.070)+(2.003), (I-338)+(1.070)+(2.004), (I-338)+(1.070)+(2.005), (I-338)+(1.070)+(2.006), (I-338)+(1.070)+(2.007), (I-338)+(1.070)+(2.008), (I-338)+(1.070)+(2.009), (I-338)+(1.070)+(2.010), (I-338)+(1.070)+(2.011), (I-338)+(1.070)+(2.012), (I-338)+(1.070)+(2.013), (I-338)+(1.070)+(2.014), (I-338)+(1.070)+(2.015), (I-338)+(1.070)+(2.016), (I-338)+(1.070)+(2.017), (I-338)+(1.070)+(2.018), (I-338)+(1.070)+(2.019), (I-338)+(1.070)+(2.020), (I-338)+(1.070)+(2.021), (I-338)+(1.070)+(2.022), (I-338)+(1.070)+(2.023), (I-338)+(1.070)+(2.024), (I-338)+(1.070)+(2.025), (I-338)+(1.070)+(2.026), (I-338)+(1.070)+(2.027), (I-338)+(1.070)+(2.028), (I-338)+(1.070)+(2.029), (I-338)+(1.070)+(2.030), (I-338)+(1.070)+(2.031), (I-338)+(1.070)+(2.032), (I-338)+(1.070)+(2.033), (I-338)+(1.070)+(2.034), (I-338)+(1.070)+(2.035), (I-338)+(1.070)+(2.036), (I-338)+(1.070)+(2.037), (I-338)+(1.070)+(2.038), (I-338)+(1.070)+(2.039), (I-338)+(1.070)+(2.040), (I-338)+(1.070)+(2.041), (I-338)+(1.070)+(2.042), (I-338)+(1.070)+(2.043), (I-338)+(1.070)+(2.044), (I-338)+(1.070)+(2.045), (I-338)+(1.070)+(2.046), (I-338)+(1.070)+(2.047), (I-338)+(1.070)+(2.048), (I-338)+(1.070)+(2.049), (I-338)+(1.070)+(2.050), (I-338)+(1.070)+(2.051), (I-338)+(1.070)+(2.052), (I-338)+(1.070)+(2.053), (I-338)+(1.070)+(2.054), (I-338)+(1.070)+(2.055), (I-338)+(1.070)+(2.056), (I-338)+(1.070)+(2.057), (I-338)+(1.070)+(2.058), (I-338)+(1.070)+(2.059), (I-338)+(1.070)+(3.001), (I-338)+(1.070)+(3.002), (I-338)+(1.070)+(3.003), (I-338)+(1.070)+(3.004), (I-338)+(1.070)+(3.005), (I-338)+(1.070)+(3.006), (I-338)+(1.070)+(3.007), (I-338)+(1.070)+(3.008), (I-338)+(1.070)+(3.009), (I-338)+(1.070)+(3.010), (I-338)+(1.070)+(3.011), (I-338)+(1.070)+(3.012), (I-338)+(1.070)+(3.013), (I-338)+(1.070)+(3.014), (I-338)+(1.070)+(3.015), (I-338)+(1.070)+(3.016), (I-338)+(1.070)+(3.017), (I-338)+(1.070)+(3.018), (I-338)+(1.070)+(3.019), (I-338)+(1.070)+(3.020), (I-338)+(1.070)+(3.021), (I-338)+(1.070)+(3.022), (I-338)+(1.070)+(3.023), (I-338)+(1.070)+(3.024), (I-338)+(1.070)+(3.025), (I-338)+(1.070)+(3.026), (I-338)+(1.070)+(3.027), (I-338)+(1.070)+(3.028), (I-338)+(1.070)+(3.029), (I-338)+(1.070)+(3.030), (I-338)+(1.070)+(3.031), (I-338)+(1.070)+(5.001), (I-338)+(1.070)+(5.002), (I-338)+(1.070)+(5.003), (I-338)+(1.070)+(5.004), (I-338)+(1.070)+(5.005), (I-338)+(1.070)+(5.006), (I-338)+(1.070)+(5.007), (I-338)+(1.070)+(5.008), (I-338)+(1.070)+(5.009), (I-338)+(1.070)+(5.010), (I-338)+(1.070)+(5.011), (I-338)+(1.070)+(5.012), (I-338)+(1.070)+(5.013), (I-338)+(1.070)+(5.014), (I-338)+(1.070)+(5.015), (I-338)+(1.070)+(5.016), (I-338)+(1.070)+(5.017), (I-338)+(1.070)+(5.018), (I-338)+(1.070)+(5.019), (I-338)+(1.070)+(5.020), (I-338)+(1.070)+(5.021), (I-338)+(1.070)+(5.022), (I-338)+(1.070)+(5.023), (I-338)+(1.070)+(6.001), (I-338)+(1.070)+(6.002), (I-338)+(1.070)+(6.003), (I-338)+(1.070)+(6.004), (I-338)+(1.070)+(7.001), (I-338)+(1.070)+(7.002), (I-338)+(1.070)+(7.003), (I-338)+(1.070)+(7.004), (I-338)+(1.070)+(7.005), (I-338)+(1.070)+(7.006), (I-338)+(1.070)+(9.001), (I-338)+(1.070)+(9.002), (I-338)+(1.070)+(9.003), (I-338)+(1.070)+(9.004), (I-338)+(1.070)+(9.005), (I-338)+(1.070)+(9.006), (I-338)+(1.070)+(9.007), (I-338)+(1.070)+(9.008), (I-338)+(1.070)+(9.009), (I-338)+(1.070)+(14.001), (I-338)+(1.070)+(14.002), (I-338)+(1.070)+(15.008), (I-338)+(1.070)+(15.011), (I-338)+(1.070)+(15.012), (I-338)+(1.070)+(15.016), (I-338)+(1.070)+(15.025), (I-338)+(1.070)+(15.027), (I-338)+(1.070)+(15.047), (I-338)+(1.070)+(15.063), (I-338)+(1.070)+(15.064), (I-338)+(1.070)+(16.001), (I-338)+(1.070)+(16.002), (I-338)+(1.070)+(16.003), (I-338)+(1.070)+(16.004), (I-338)+(1.070)+(16.005), (I-338)+(1.070)+(16.006), (I-338)+(1.070)+(16.007), (I-338)+(1.070)+(16.008), (I-338)+(1.070)+(17.001), (I-338)+(1.070)+(17.002), (I-338)+(1.070)+(17.003), (I-338)+(1.070)+(17.004), (I-338)+(1.070)+(17.005), (I-338)+(1.070)+(17.006), (I-338)+(1.070)+(17.007), (I-338)+(1.070)+(17.008), (I-338)+(1.070)+(17.009), (I-338)+(1.070)+(17.010), (I-338)+(1.070)+(17.011), (I-338)+(1.070)+(17.012), (I-338)+(1.070)+(18.001), (I-338)+(1.071)+(1.072), (I-338)+(1.071)+(1.073), (I-338)+(1.071)+(1.074), (I-338)+(1.071)+(1.075), (I-338)+(1.071)+(1.076), (I-338)+(1.071)+(1.077), (I-338)+(1.071)+(1.078), (I-338)+(1.071)+(1.079), (I-338)+(1.071)+(1.080), (I-338)+(1.071)+(1.081), (I-338)+(1.071)+(1.082), (I-338)+(1.071)+(1.083), (I-338)+(1.071)+(1.084), (I-338)+(1.071)+(1.085), (I-338)+(1.071)+(1.086), (I-338)+(1.071)+(1.087), (I-338)+(1.071)+(1.088), (I-338)+(1.071)+(1.089), (I-338)+(1.071)+(1.090), (I-338)+(1.071)+(1.091), (I-338)+(1.071)+(1.092), (I-338)+(1.071)+(2.001), (I-338)+(1.071)+(2.002), (I-338)+(1.071)+(2.003), (I-338)+(1.071)+(2.004), (I-338)+(1.071)+(2.005), (I-338)+(1.071)+(2.006), (I-338)+(1.071)+(2.007), (I-338)+(1.071)+(2.008), (I-338)+(1.071)+(2.009), (I-338)+(1.071)+(2.010), (I-338)+(1.071)+(2.011), (I-338)+(1.071)+(2.012), (I-338)+(1.071)+(2.013), (I-338)+(1.071)+(2.014), (I-338)+(1.071)+(2.015), (I-338)+(1.071)+(2.016), (I-338)+(1.071)+(2.017), (I-338)+(1.071)+(2.018), (I-338)+(1.071)+(2.019), (I-338)+(1.071)+(2.020), (I-338)+(1.071)+(2.021), (I-338)+(1.071)+(2.022), (I-338)+(1.071)+(2.023), (I-338)+(1.071)+(2.024), (I-338)+(1.071)+(2.025), (I-338)+(1.071)+(2.026), (I-338)+(1.071)+(2.027), (I-338)+(1.071)+(2.028), (I-338)+(1.071)+(2.029), (I-338)+(1.071)+(2.030), (I-338)+(1.071)+(2.031), (I-338)+(1.071)+(2.032), (I-338)+(1.071)+(2.033), (I-338)+(1.071)+(2.034), (I-338)+(1.071)+(2.035), (I-338)+(1.071)+(2.036), (I-338)+(1.071)+(2.037), (I-338)+(1.071)+(2.038), (I-338)+(1.071)+(2.039), (I-338)+(1.071)+(2.040), (I-338)+(1.071)+(2.041), (I-338)+(1.071)+(2.042), (I-338)+(1.071)+(2.043), (I-338)+(1.071)+(2.044), (I-338)+(1.071)+(2.045), (I-338)+(1.071)+(2.046), (I-338)+(1.071)+(2.047), (I-338)+(1.071)+(2.048), (I-338)+(1.071)+(2.049), (I-338)+(1.071)+(2.050), (I-338)+(1.071)+(2.051), (I-338)+(1.071)+(2.052), (I-338)+(1.071)+(2.053), (I-338)+(1.071)+(2.054), (I-338)+(1.071)+(2.055), (I-338)+(1.071)+(2.056), (I-338)+(1.071)+(2.057), (I-338)+(1.071)+(2.058), (I-338)+(1.071)+(2.059), (I-338)+(1.071)+(3.001), (I-338)+(1.071)+(3.002), (I-338)+(1.071)+(3.003), (I-338)+(1.071)+(3.004), (I-338)+(1.071)+(3.005), (I-338)+(1.071)+(3.006), (I-338)+(1.071)+(3.007), (I-338)+(1.071)+(3.008), (I-338)+(1.071)+(3.009), (I-338)+(1.071)+(3.010), (I-338)+(1.071)+(3.011), (I-338)+(1.071)+(3.012), (I-338)+(1.071)+(3.013), (I-338)+(1.071)+(3.014), (I-338)+(1.071)+(3.015), (I-338)+(1.071)+(3.016), (I-338)+(1.071)+(3.017), (I-338)+(1.071)+(3.018), (I-338)+(1.071)+(3.019), (I-338)+(1.071)+(3.020), (I-338)+(1.071)+(3.021), (I-338)+(1.071)+(3.022), (I-338)+(1.071)+(3.023), (I-338)+(1.071)+(3.024), (I-338)+(1.071)+(3.025), (I-338)+(1.071)+(3.026), (I-338)+(1.071)+(3.027), (I-338)+(1.071)+(3.028), (I-338)+(1.071)+(3.029), (I-338)+(1.071)+(3.030), (I-338)+(1.071)+(3.031), (I-338)+(1.071)+(5.001), (I-338)+(1.071)+(5.002), (I-338)+(1.071)+(5.003), (I-338)+(1.071)+(5.004), (I-338)+(1.071)+(5.005), (I-338)+(1.071)+(5.006), (I-338)+(1.071)+(5.007), (I-338)+(1.071)+(5.008), (I-338)+(1.071)+(5.009), (I-338)+(1.071)+(5.010), (I-338)+(1.071)+(5.011), (I-338)+(1.071)+(5.012), (I-338)+(1.071)+(5.013), (I-338)+(1.071)+(5.014), (I-338)+(1.071)+(5.015), (I-338)+(1.071)+(5.016), (I-338)+(1.071)+(5.017), (I-338)+(1.071)+(5.018), (I-338)+(1.071)+(5.019), (I-338)+(1.071)+(5.020), (I-338)+(1.071)+(5.021), (I-338)+(1.071)+(5.022), (I-338)+(1.071)+(5.023), (I-338)+(1.071)+(6.001), (I-338)+(1.071)+(6.002), (I-338)+(1.071)+(6.003), (I-338)+(1.071)+(6.004), (I-338)+(1.071)+(7.001), (I-338)+(1.071)+(7.002), (I-338)+(1.071)+(7.003), (I-338)+(1.071)+(7.004), (I-338)+(1.071)+(7.005), (I-338)+(1.071)+(7.006), (I-338)+(1.071)+(9.001), (I-338)+(1.071)+(9.002), (I-338)+(1.071)+(9.003), (I-338)+(1.071)+(9.004), (I-338)+(1.071)+(9.005), (I-338)+(1.071)+(9.006), (I-338)+(1.071)+(9.007), (I-338)+(1.071)+(9.008), (I-338)+(1.071)+(9.009), (I-338)+(1.071)+(14.001), (I-338)+(1.071)+(14.002), (I-338)+(1.071)+(15.008), (I-338)+(1.071)+(15.011), (I-338)+(1.071)+(15.012), (I-338)+(1.071)+(15.016), (I-338)+(1.071)+(15.025), (I-338)+(1.071)+(15.027), (I-338)+(1.071)+(15.047), (I-338)+(1.071)+(15.063), (I-338)+(1.071)+(15.064), (I-338)+(1.071)+(16.001), (I-338)+(1.071)+(16.002), (I-338)+(1.071)+(16.003), (I-338)+(1.071)+(16.004), (I-338)+(1.071)+(16.005), (I-338)+(1.071)+(16.006), (I-338)+(1.071)+(16.007), (I-338)+(1.071)+(16.008), (I-338)+(1.071)+(17.001), (I-338)+(1.071)+(17.002), (I-338)+(1.071)+(17.003), (I-338)+(1.071)+(17.004), (I-338)+(1.071)+(17.005), (I-338)+(1.071)+(17.006), (I-338)+(1.071)+(17.007), (I-338)+(1.071)+(17.008), (I-338)+(1.071)+(17.009), (I-338)+(1.071)+(17.010), (I-338)+(1.071)+(17.011), (I-338)+(1.071)+(17.012), (I-338)+(1.071)+(18.001), (I-338)+(1.072)+(1.073), (I-338)+(1.072)+(1.074), (I-338)+(1.072)+(1.075), (I-338)+(1.072)+(1.076), (I-338)+(1.072)+(1.077), (I-338)+(1.072)+(1.078), (I-338)+(1.072)+(1.079), (I-338)+(1.072)+(1.080), (I-338)+(1.072)+(1.081), (I-338)+(1.072)+(1.082), (I-338)+(1.072)+(1.083), (I-338)+(1.072)+(1.084), (I-338)+(1.072)+(1.085), (I-338)+(1.072)+(1.086), (I-338)+(1.072)+(1.087), (I-338)+(1.072)+(1.088), (I-338)+(1.072)+(1.089), (I-338)+(1.072)+(1.090), (I-338)+(1.072)+(1.091), (I-338)+(1.072)+(1.092), (I-338)+(1.072)+(2.001), (I-338)+(1.072)+(2.002), (I-338)+(1.072)+(2.003), (I-338)+(1.072)+(2.004), (I-338)+(1.072)+(2.005), (I-338)+(1.072)+(2.006), (I-338)+(1.072)+(2.007), (I-338)+(1.072)+(2.008), (I-338)+(1.072)+(2.009), (I-338)+(1.072)+(2.010), (I-338)+(1.072)+(2.011), (I-338)+(1.072)+(2.012), (I-338)+(1.072)+(2.013), (I-338)+(1.072)+(2.014), (I-338)+(1.072)+(2.015), (I-338)+(1.072)+(2.016), (I-338)+(1.072)+(2.017), (I-338)+(1.072)+(2.018), (I-338)+(1.072)+(2.019), (I-338)+(1.072)+(2.020), (I-338)+(1.072)+(2.021), (I-338)+(1.072)+(2.022), (I-338)+(1.072)+(2.023), (I-338)+(1.072)+(2.024), (I-338)+(1.072)+(2.025), (I-338)+(1.072)+(2.026), (I-338)+(1.072)+(2.027), (I-338)+(1.072)+(2.028), (I-338)+(1.072)+(2.029), (I-338)+(1.072)+(2.030), (I-338)+(1.072)+(2.031), (I-338)+(1.072)+(2.032), (I-338)+(1.072)+(2.033), (I-338)+(1.072)+(2.034), (I-338)+(1.072)+(2.035), (I-338)+(1.072)+(2.036), (I-338)+(1.072)+(2.037), (I-338)+(1.072)+(2.038), (I-338)+(1.072)+(2.039), (I-338)+(1.072)+(2.040), (I-338)+(1.072)+(2.041), (I-338)+(1.072)+(2.042), (I-338)+(1.072)+(2.043), (I-338)+(1.072)+(2.044), (I-338)+(1.072)+(2.045), (I-338)+(1.072)+(2.046), (I-338)+(1.072)+(2.047), (I-338)+(1.072)+(2.048), (I-338)+(1.072)+(2.049), (I-338)+(1.072)+(2.050), (I-338)+(1.072)+(2.051), (I-338)+(1.072)+(2.052), (I-338)+(1.072)+(2.053), (I-338)+(1.072)+(2.054), (I-338)+(1.072)+(2.055), (I-338)+(1.072)+(2.056), (I-338)+(1.072)+(2.057), (I-338)+(1.072)+(2.058), (I-338)+(1.072)+(2.059), (I-338)+(1.072)+(3.001), (I-338)+(1.072)+(3.002), (I-338)+(1.072)+(3.003), (I-338)+(1.072)+(3.004), (I-338)+(1.072)+(3.005), (I-338)+(1.072)+(3.006), (I-338)+(1.072)+(3.007), (I-338)+(1.072)+(3.008), (I-338)+(1.072)+(3.009), (I-338)+(1.072)+(3.010), (I-338)+(1.072)+(3.011), (I-338)+(1.072)+(3.012), (I-338)+(1.072)+(3.013), (I-338)+(1.072)+(3.014), (I-338)+(1.072)+(3.015), (I-338)+(1.072)+(3.016), (I-338)+(1.072)+(3.017), (I-338)+(1.072)+(3.018), (I-338)+(1.072)+(3.019), (I-338)+(1.072)+(3.020), (I-338)+(1.072)+(3.021), (I-338)+(1.072)+(3.022), (I-338)+(1.072)+(3.023), (I-338)+(1.072)+(3.024), (I-338)+(1.072)+(3.025), (I-338)+(1.072)+(3.026), (I-338)+(1.072)+(3.027), (I-338)+(1.072)+(3.028), (I-338)+(1.072)+(3.029), (I-338)+(1.072)+(3.030), (I-338)+(1.072)+(3.031), (I-338)+(1.072)+(5.001), (I-338)+(1.072)+(5.002), (I-338)+(1.072)+(5.003), (I-338)+(1.072)+(5.004), (I-338)+(1.072)+(5.005), (I-338)+(1.072)+(5.006), (I-338)+(1.072)+(5.007), (I-338)+(1.072)+(5.008), (I-338)+(1.072)+(5.009), (I-338)+(1.072)+(5.010), (I-338)+(1.072)+(5.011), (I-338)+(1.072)+(5.012), (I-338)+(1.072)+(5.013), (I-338)+(1.072)+(5.014), (I-338)+(1.072)+(5.015), (I-338)+(1.072)+(5.016), (I-338)+(1.072)+(5.017), (I-338)+(1.072)+(5.018), (I-338)+(1.072)+(5.019), (I-338)+(1.072)+(5.020), (I-338)+(1.072)+(5.021), (I-338)+(1.072)+(5.022), (I-338)+(1.072)+(5.023), (I-338)+(1.072)+(6.001), (I-338)+(1.072)+(6.002), (I-338)+(1.072)+(6.003), (I-338)+(1.072)+(6.004), (I-338)+(1.072)+(7.001), (I-338)+(1.072)+(7.002), (I-338)+(1.072)+(7.003), (I-338)+(1.072)+(7.004), (I-338)+(1.072)+(7.005), (I-338)+(1.072)+(7.006), (I-338)+(1.072)+(9.001), (I-338)+(1.072)+(9.002), (I-338)+(1.072)+(9.003), (I-338)+(1.072)+(9.004), (I-338)+(1.072)+(9.005), (I-338)+(1.072)+(9.006), (I-338)+(1.072)+(9.007), (I-338)+(1.072)+(9.008), (I-338)+(1.072)+(9.009), (I-338)+(1.072)+(14.001), (I-338)+(1.072)+(14.002), (I-338)+(1.072)+(15.008), (I-338)+(1.072)+(15.011), (I-338)+(1.072)+(15.012), (I-338)+(1.072)+(15.016), (I-338)+(1.072)+(15.025), (I-338)+(1.072)+(15.027), (I-338)+(1.072)+(15.047), (I-338)+(1.072)+(15.063), (I-338)+(1.072)+(15.064), (I-338)+(1.072)+(16.001), (I-338)+(1.072)+(16.002), (I-338)+(1.072)+(16.003), (I-338)+(1.072)+(16.004), (I-338)+(1.072)+(16.005), (I-338)+(1.072)+(16.006), (I-338)+(1.072)+(16.007), (I-338)+(1.072)+(16.008), (I-338)+(1.072)+(17.001), (I-338)+(1.072)+(17.002), (I-338)+(1.072)+(17.003), (I-338)+(1.072)+(17.004), (I-338)+(1.072)+(17.005), (I-338)+(1.072)+(17.006), (I-338)+(1.072)+(17.007), (I-338)+(1.072)+(17.008), (I-338)+(1.072)+(17.009), (I-338)+(1.072)+(17.010), (I-338)+(1.072)+(17.011), (I-338)+(1.072)+(17.012), (I-338)+(1.072)+(18.001), (I-338)+(1.073)+(1.074), (I-338)+(1.073)+(1.075), (I-338)+(1.073)+(1.076), (I-338)+(1.073)+(1.077), (I-338)+(1.073)+(1.078), (I-338)+(1.073)+(1.079), (I-338)+(1.073)+(1.080), (I-338)+(1.073)+(1.081), (I-338)+(1.073)+(1.082), (I-338)+(1.073)+(1.083), (I-338)+(1.073)+(1.084), (I-338)+(1.073)+(1.085), (I-338)+(1.073)+(1.086), (I-338)+(1.073)+(1.087), (I-338)+(1.073)+(1.088), (I-338)+(1.073)+(1.089), (I-338)+(1.073)+(1.090), (I-338)+(1.073)+(1.091), (I-338)+(1.073)+(1.092), (I-338)+(1.073)+(2.001), (I-338)+(1.073)+(2.002), (I-338)+(1.073)+(2.003), (I-338)+(1.073)+(2.004), (I-338)+(1.073)+(2.005), (I-338)+(1.073)+(2.006), (I-338)+(1.073)+(2.007), (I-338)+(1.073)+(2.008), (I-338)+(1.073)+(2.009), (I-338)+(1.073)+(2.010), (I-338)+(1.073)+(2.011), (I-338)+(1.073)+(2.012), (I-338)+(1.073)+(2.013), (I-338)+(1.073)+(2.014), (I-338)+(1.073)+(2.015), (I-338)+(1.073)+(2.016), (I-338)+(1.073)+(2.017), (I-338)+(1.073)+(2.018), (I-338)+(1.073)+(2.019), (I-338)+(1.073)+(2.020), (I-338)+(1.073)+(2.021), (I-338)+(1.073)+(2.022), (I-338)+(1.073)+(2.023), (I-338)+(1.073)+(2.024), (I-338)+(1.073)+(2.025), (I-338)+(1.073)+(2.026), (I-338)+(1.073)+(2.027), (I-338)+(1.073)+(2.028), (I-338)+(1.073)+(2.029), (I-338)+(1.073)+(2.030), (I-338)+(1.073)+(2.031), (I-338)+(1.073)+(2.032), (I-338)+(1.073)+(2.033), (I-338)+(1.073)+(2.034), (I-338)+(1.073)+(2.035), (I-338)+(1.073)+(2.036), (I-338)+(1.073)+(2.037), (I-338)+(1.073)+(2.038), (I-338)+(1.073)+(2.039), (I-338)+(1.073)+(2.040), (I-338)+(1.073)+(2.041), (I-338)+(1.073)+(2.042), (I-338)+(1.073)+(2.043), (I-338)+(1.073)+(2.044), (I-338)+(1.073)+(2.045), (I-338)+(1.073)+(2.046), (I-338)+(1.073)+(2.047), (I-338)+(1.073)+(2.048), (I-338)+(1.073)+(2.049), (I-338)+(1.073)+(2.050), (I-338)+(1.073)+(2.051), (I-338)+(1.073)+(2.052), (I-338)+(1.073)+(2.053), (I-338)+(1.073)+(2.054), (I-338)+(1.073)+(2.055), (I-338)+(1.073)+(2.056), (I-338)+(1.073)+(2.057), (I-338)+(1.073)+(2.058), (I-338)+(1.073)+(2.059), (I-338)+(1.073)+(3.001), (I-338)+(1.073)+(3.002), (I-338)+(1.073)+(3.003), (I-338)+(1.073)+(3.004), (I-338)+(1.073)+(3.005), (I-338)+(1.073)+(3.006), (I-338)+(1.073)+(3.007), (I-338)+(1.073)+(3.008), (I-338)+(1.073)+(3.009), (I-338)+(1.073)+(3.010), (I-338)+(1.073)+(3.011), (I-338)+(1.073)+(3.012), (I-338)+(1.073)+(3.013), (I-338)+(1.073)+(3.014), (I-338)+(1.073)+(3.015), (I-338)+(1.073)+(3.016), (I-338)+(1.073)+(3.017), (I-338)+(1.073)+(3.018), (I-338)+(1.073)+(3.019), (I-338)+(1.073)+(3.020), (I-338)+(1.073)+(3.021), (I-338)+(1.073)+(3.022), (I-338)+(1.073)+(3.023), (I-338)+(1.073)+(3.024), (I-338)+(1.073)+(3.025), (I-338)+(1.073)+(3.026), (I-338)+(1.073)+(3.027), (I-338)+(1.073)+(3.028), (I-338)+(1.073)+(3.029), (I-338)+(1.073)+(3.030), (I-338)+(1.073)+(3.031), (I-338)+(1.073)+(5.001), (I-338)+(1.073)+(5.002), (I-338)+(1.073)+(5.003), (I-338)+(1.073)+(5.004), (I-338)+(1.073)+(5.005), (I-338)+(1.073)+(5.006), (I-338)+(1.073)+(5.007), (I-338)+(1.073)+(5.008), (I-338)+(1.073)+(5.009), (I-338)+(1.073)+(5.010), (I-338)+(1.073)+(5.011), (I-338)+(1.073)+(5.012), (I-338)+(1.073)+(5.013), (I-338)+(1.073)+(5.014), (I-338)+(1.073)+(5.015), (I-338)+(1.073)+(5.016), (I-338)+(1.073)+(5.017), (I-338)+(1.073)+(5.018), (I-338)+(1.073)+(5.019), (I-338)+(1.073)+(5.020), (I-338)+(1.073)+(5.021), (I-338)+(1.073)+(5.022), (I-338)+(1.073)+(5.023), (I-338)+(1.073)+(6.001), (I-338)+(1.073)+(6.002), (I-338)+(1.073)+(6.003), (I-338)+(1.073)+(6.004), (I-338)+(1.073)+(7.001), (I-338)+(1.073)+(7.002), (I-338)+(1.073)+(7.003), (I-338)+(1.073)+(7.004), (I-338)+(1.073)+(7.005), (I-338)+(1.073)+(7.006), (I-338)+(1.073)+(9.001), (I-338)+(1.073)+(9.002), (I-338)+(1.073)+(9.003), (I-338)+(1.073)+(9.004), (I-338)+(1.073)+(9.005), (I-338)+(1.073)+(9.006), (I-338)+(1.073)+(9.007), (I-338)+(1.073)+(9.008), (I-338)+(1.073)+(9.009), (I-338)+(1.073)+(14.001), (I-338)+(1.073)+(14.002), (I-338)+(1.073)+(15.008), (I-338)+(1.073)+(15.011), (I-338)+(1.073)+(15.012), (I-338)+(1.073)+(15.016), (I-338)+(1.073)+(15.025), (I-338)+(1.073)+(15.027), (I-338)+(1.073)+(15.047), (I-338)+(1.073)+(15.063), (I-338)+(1.073)+(15.064), (I-338)+(1.073)+(16.001), (I-338)+(1.073)+(16.002), (I-338)+(1.073)+(16.003), (I-338)+(1.073)+(16.004), (I-338)+(1.073)+(16.005), (I-338)+(1.073)+(16.006), (I-338)+(1.073)+(16.007), (I-338)+(1.073)+(16.008), (I-338)+(1.073)+(17.001), (I-338)+(1.073)+(17.002), (I-338)+(1.073)+(17.003), (I-338)+(1.073)+(17.004), (I-338)+(1.073)+(17.005), (I-338)+(1.073)+(17.006), (I-338)+(1.073)+(17.007), (I-338)+(1.073)+(17.008), (I-338)+(1.073)+(17.009), (I-338)+(1.073)+(17.010), (I-338)+(1.073)+(17.011), (I-338)+(1.073)+(17.012), (I-338)+(1.073)+(18.001), (I-338)+(1.074)+(1.075), (I-338)+(1.074)+(1.076), (I-338)+(1.074)+(1.077), (I-338)+(1.074)+(1.078), (I-338)+(1.074)+(1.079), (I-338)+(1.074)+(1.080), (I-338)+(1.074)+(1.081), (I-338)+(1.074)+(1.082), (I-338)+(1.074)+(1.083), (I-338)+(1.074)+(1.084), (I-338)+(1.074)+(1.085), (I-338)+(1.074)+(1.086), (I-338)+(1.074)+(1.087), (I-338)+(1.074)+(1.088), (I-338)+(1.074)+(1.089), (I-338)+(1.074)+(1.090), (I-338)+(1.074)+(1.091), (I-338)+(1.074)+(1.092), (I-338)+(1.074)+(2.001), (I-338)+(1.074)+(2.002), (I-338)+(1.074)+(2.003), (I-338)+(1.074)+(2.004), (I-338)+(1.074)+(2.005), (I-338)+(1.074)+(2.006), (I-338)+(1.074)+(2.007), (I-338)+(1.074)+(2.008), (I-338)+(1.074)+(2.009), (I-338)+(1.074)+(2.010), (I-338)+(1.074)+(2.011), (I-338)+(1.074)+(2.012), (I-338)+(1.074)+(2.013), (I-338)+(1.074)+(2.014), (I-338)+(1.074)+(2.015), (I-338)+(1.074)+(2.016), (I-338)+(1.074)+(2.017), (I-338)+(1.074)+(2.018), (I-338)+(1.074)+(2.019), (I-338)+(1.074)+(2.020), (I-338)+(1.074)+(2.021), (I-338)+(1.074)+(2.022), (I-338)+(1.074)+(2.023), (I-338)+(1.074)+(2.024), (I-338)+(1.074)+(2.025), (I-338)+(1.074)+(2.026), (I-338)+(1.074)+(2.027), (I-338)+(1.074)+(2.028), (I-338)+(1.074)+(2.029), (I-338)+(1.074)+(2.030), (I-338)+(1.074)+(2.031), (I-338)+(1.074)+(2.032), (I-338)+(1.074)+(2.033), (I-338)+(1.074)+(2.034), (I-338)+(1.074)+(2.035), (I-338)+(1.074)+(2.036), (I-338)+(1.074)+(2.037), (I-338)+(1.074)+(2.038), (I-338)+(1.074)+(2.039), (I-338)+(1.074)+(2.040), (I-338)+(1.074)+(2.041), (I-338)+(1.074)+(2.042), (I-338)+(1.074)+(2.043), (I-338)+(1.074)+(2.044), (I-338)+(1.074)+(2.045), (I-338)+(1.074)+(2.046), (I-338)+(1.074)+(2.047), (I-338)+(1.074)+(2.048), (I-338)+(1.074)+(2.049), (I-338)+(1.074)+(2.050), (I-338)+(1.074)+(2.051), (I-338)+(1.074)+(2.052), (I-338)+(1.074)+(2.053), (I-338)+(1.074)+(2.054), (I-338)+(1.074)+(2.055), (I-338)+(1.074)+(2.056), (I-338)+(1.074)+(2.057), (I-338)+(1.074)+(2.058), (I-338)+(1.074)+(2.059), (I-338)+(1.074)+(3.001), (I-338)+(1.074)+(3.002), (I-338)+(1.074)+(3.003), (I-338)+(1.074)+(3.004), (I-338)+(1.074)+(3.005), (I-338)+(1.074)+(3.006), (I-338)+(1.074)+(3.007), (I-338)+(1.074)+(3.008), (I-338)+(1.074)+(3.009), (I-338)+(1.074)+(3.010), (I-338)+(1.074)+(3.011), (I-338)+(1.074)+(3.012), (I-338)+(1.074)+(3.013), (I-338)+(1.074)+(3.014), (I-338)+(1.074)+(3.015), (I-338)+(1.074)+(3.016), (I-338)+(1.074)+(3.017), (I-338)+(1.074)+(3.018), (I-338)+(1.074)+(3.019), (I-338)+(1.074)+(3.020), (I-338)+(1.074)+(3.021), (I-338)+(1.074)+(3.022), (I-338)+(1.074)+(3.023), (I-338)+(1.074)+(3.024), (I-338)+(1.074)+(3.025), (I-338)+(1.074)+(3.026), (I-338)+(1.074)+(3.027), (I-338)+(1.074)+(3.028), (I-338)+(1.074)+(3.029), (I-338)+(1.074)+(3.030), (I-338)+(1.074)+(3.031), (I-338)+(1.074)+(5.001), (I-338)+(1.074)+(5.002), (I-338)+(1.074)+(5.003), (I-338)+(1.074)+(5.004), (I-338)+(1.074)+(5.005), (I-338)+(1.074)+(5.006), (I-338)+(1.074)+(5.007), (I-338)+(1.074)+(5.008), (I-338)+(1.074)+(5.009), (I-338)+(1.074)+(5.010), (I-338)+(1.074)+(5.011), (I-338)+(1.074)+(5.012), (I-338)+(1.074)+(5.013), (I-338)+(1.074)+(5.014), (I-338)+(1.074)+(5.015), (I-338)+(1.074)+(5.016), (I-338)+(1.074)+(5.017), (I-338)+(1.074)+(5.018), (I-338)+(1.074)+(5.019), (I-338)+(1.074)+(5.020), (I-338)+(1.074)+(5.021), (I-338)+(1.074)+(5.022), (I-338)+(1.074)+(5.023), (I-338)+(1.074)+(6.001), (I-338)+(1.074)+(6.002), (I-338)+(1.074)+(6.003), (I-338)+(1.074)+(6.004), (I-338)+(1.074)+(7.001), (I-338)+(1.074)+(7.002), (I-338)+(1.074)+(7.003), (I-338)+(1.074)+(7.004), (I-338)+(1.074)+(7.005), (I-338)+(1.074)+(7.006), (I-338)+(1.074)+(9.001), (I-338)+(1.074)+(9.002), (I-338)+(1.074)+(9.003), (I-338)+(1.074)+(9.004), (I-338)+(1.074)+(9.005), (I-338)+(1.074)+(9.006), (I-338)+(1.074)+(9.007), (I-338)+(1.074)+(9.008), (I-338)+(1.074)+(9.009), (I-338)+(1.074)+(14.001), (I-338)+(1.074)+(14.002), (I-338)+(1.074)+(15.008), (I-338)+(1.074)+(15.011), (I-338)+(1.074)+(15.012), (I-338)+(1.074)+(15.016), (I-338)+(1.074)+(15.025), (I-338)+(1.074)+(15.027), (I-338)+(1.074)+(15.047), (I-338)+(1.074)+(15.063), (I-338)+(1.074)+(15.064), (I-338)+(1.074)+(16.001), (I-338)+(1.074)+(16.002), (I-338)+(1.074)+(16.003), (I-338)+(1.074)+(16.004), (I-338)+(1.074)+(16.005), (I-338)+(1.074)+(16.006), (I-338)+(1.074)+(16.007), (I-338)+(1.074)+(16.008), (I-338)+(1.074)+(17.001), (I-338)+(1.074)+(17.002), (I-338)+(1.074)+(17.003), (I-338)+(1.074)+(17.004), (I-338)+(1.074)+(17.005), (I-338)+(1.074)+(17.006), (I-338)+(1.074)+(17.007), (I-338)+(1.074)+(17.008), (I-338)+(1.074)+(17.009), (I-338)+(1.074)+(17.010), (I-338)+(1.074)+(17.011), (I-338)+(1.074)+(17.012), (I-338)+(1.074)+(18.001), (I-338)+(1.075)+(1.076), (I-338)+(1.075)+(1.077), (I-338)+(1.075)+(1.078), (I-338)+(1.075)+(1.079), (I-338)+(1.075)+(1.080), (I-338)+(1.075)+(1.081), (I-338)+(1.075)+(1.082), (I-338)+(1.075)+(1.083), (I-338)+(1.075)+(1.084), (I-338)+(1.075)+(1.085), (I-338)+(1.075)+(1.086), (I-338)+(1.075)+(1.087), (I-338)+(1.075)+(1.088), (I-338)+(1.075)+(1.089), (I-338)+(1.075)+(1.090), (I-338)+(1.075)+(1.091), (I-338)+(1.075)+(1.092), (I-338)+(1.075)+(2.001), (I-338)+(1.075)+(2.002), (I-338)+(1.075)+(2.003), (I-338)+(1.075)+(2.004), (I-338)+(1.075)+(2.005), (I-338)+(1.075)+(2.006), (I-338)+(1.075)+(2.007), (I-338)+(1.075)+(2.008), (I-338)+(1.075)+(2.009), (I-338)+(1.075)+(2.010), (I-338)+(1.075)+(2.011), (I-338)+(1.075)+(2.012), (I-338)+(1.075)+(2.013), (I-338)+(1.075)+(2.014), (I-338)+(1.075)+(2.015), (I-338)+(1.075)+(2.016), (I-338)+(1.075)+(2.017), (I-338)+(1.075)+(2.018), (I-338)+(1.075)+(2.019), (I-338)+(1.075)+(2.020), (I-338)+(1.075)+(2.021), (I-338)+(1.075)+(2.022), (I-338)+(1.075)+(2.023), (I-338)+(1.075)+(2.024), (I-338)+(1.075)+(2.025), (I-338)+(1.075)+(2.026), (I-338)+(1.075)+(2.027), (I-338)+(1.075)+(2.028), (I-338)+(1.075)+(2.029), (I-338)+(1.075)+(2.030), (I-338)+(1.075)+(2.031), (I-338)+(1.075)+(2.032), (I-338)+(1.075)+(2.033), (I-338)+(1.075)+(2.034), (I-338)+(1.075)+(2.035), (I-338)+(1.075)+(2.036), (I-338)+(1.075)+(2.037), (I-338)+(1.075)+(2.038), (I-338)+(1.075)+(2.039), (I-338)+(1.075)+(2.040), (I-338)+(1.075)+(2.041), (I-338)+(1.075)+(2.042), (I-338)+(1.075)+(2.043), (I-338)+(1.075)+(2.044), (I-338)+(1.075)+(2.045), (I-338)+(1.075)+(2.046), (I-338)+(1.075)+(2.047), (I-338)+(1.075)+(2.048), (I-338)+(1.075)+(2.049), (I-338)+(1.075)+(2.050), (I-338)+(1.075)+(2.051), (I-338)+(1.075)+(2.052), (I-338)+(1.075)+(2.053), (I-338)+(1.075)+(2.054), (I-338)+(1.075)+(2.055), (I-338)+(1.075)+(2.056), (I-338)+(1.075)+(2.057), (I-338)+(1.075)+(2.058), (I-338)+(1.075)+(2.059), (I-338)+(1.075)+(3.001), (I-338)+(1.075)+(3.002), (I-338)+(1.075)+(3.003), (I-338)+(1.075)+(3.004), (I-338)+(1.075)+(3.005), (I-338)+(1.075)+(3.006), (I-338)+(1.075)+(3.007), (I-338)+(1.075)+(3.008), (I-338)+(1.075)+(3.009), (I-338)+(1.075)+(3.010), (I-338)+(1.075)+(3.011), (I-338)+(1.075)+(3.012), (I-338)+(1.075)+(3.013), (I-338)+(1.075)+(3.014), (I-338)+(1.075)+(3.015), (I-338)+(1.075)+(3.016), (I-338)+(1.075)+(3.017), (I-338)+(1.075)+(3.018), (I-338)+(1.075)+(3.019), (I-338)+(1.075)+(3.020), (I-338)+(1.075)+(3.021), (I-338)+(1.075)+(3.022), (I-338)+(1.075)+(3.023), (I-338)+(1.075)+(3.024), (I-338)+(1.075)+(3.025), (I-338)+(1.075)+(3.026), (I-338)+(1.075)+(3.027), (I-338)+(1.075)+(3.028), (I-338)+(1.075)+(3.029), (I-338)+(1.075)+(3.030), (I-338)+(1.075)+(3.031), (I-338)+(1.075)+(5.001), (I-338)+(1.075)+(5.002), (I-338)+(1.075)+(5.003), (I-338)+(1.075)+(5.004), (I-338)+(1.075)+(5.005), (I-338)+(1.075)+(5.006), (I-338)+(1.075)+(5.007), (I-338)+(1.075)+(5.008), (I-338)+(1.075)+(5.009), (I-338)+(1.075)+(5.010), (I-338)+(1.075)+(5.011), (I-338)+(1.075)+(5.012), (I-338)+(1.075)+(5.013), (I-338)+(1.075)+(5.014), (I-338)+(1.075)+(5.015), (I-338)+(1.075)+(5.016), (I-338)+(1.075)+(5.017), (I-338)+(1.075)+(5.018), (I-338)+(1.075)+(5.019), (I-338)+(1.075)+(5.020), (I-338)+(1.075)+(5.021), (I-338)+(1.075)+(5.022), (I-338)+(1.075)+(5.023), (I-338)+(1.075)+(6.001), (I-338)+(1.075)+(6.002), (I-338)+(1.075)+(6.003), (I-338)+(1.075)+(6.004), (I-338)+(1.075)+(7.001), (I-338)+(1.075)+(7.002), (I-338)+(1.075)+(7.003), (I-338)+(1.075)+(7.004), (I-338)+(1.075)+(7.005), (I-338)+(1.075)+(7.006), (I-338)+(1.075)+(9.001), (I-338)+(1.075)+(9.002), (I-338)+(1.075)+(9.003), (I-338)+(1.075)+(9.004), (I-338)+(1.075)+(9.005), (I-338)+(1.075)+(9.006), (I-338)+(1.075)+(9.007), (I-338)+(1.075)+(9.008), (I-338)+(1.075)+(9.009), (I-338)+(1.075)+(14.001), (I-338)+(1.075)+(14.002), (I-338)+(1.075)+(15.008), (I-338)+(1.075)+(15.011), (I-338)+(1.075)+(15.012), (I-338)+(1.075)+(15.016), (I-338)+(1.075)+(15.025), (I-338)+(1.075)+(15.027), (I-338)+(1.075)+(15.047), (I-338)+(1.075)+(15.063), (I-338)+(1.075)+(15.064), (I-338)+(1.075)+(16.001), (I-338)+(1.075)+(16.002), (I-338)+(1.075)+(16.003), (I-338)+(1.075)+(16.004), (I-338)+(1.075)+(16.005), (I-338)+(1.075)+(16.006), (I-338)+(1.075)+(16.007), (I-338)+(1.075)+(16.008), (I-338)+(1.075)+(17.001), (I-338)+(1.075)+(17.002), (I-338)+(1.075)+(17.003), (I-338)+(1.075)+(17.004), (I-338)+(1.075)+(17.005), (I-338)+(1.075)+(17.006), (I-338)+(1.075)+(17.007), (I-338)+(1.075)+(17.008), (I-338)+(1.075)+(17.009), (I-338)+(1.075)+(17.010), (I-338)+(1.075)+(17.011), (I-338)+(1.075)+(17.012), (I-338)+(1.075)+(18.001), (I-338)+(1.076)+(1.077), (I-338)+(1.076)+(1.078), (I-338)+(1.076)+(1.079), (I-338)+(1.076)+(1.080), (I-338)+(1.076)+(1.081), (I-338)+(1.076)+(1.082), (I-338)+(1.076)+(1.083), (I-338)+(1.076)+(1.084), (I-338)+(1.076)+(1.085), (I-338)+(1.076)+(1.086), (I-338)+(1.076)+(1.087), (I-338)+(1.076)+(1.088), (I-338)+(1.076)+(1.089), (I-338)+(1.076)+(1.090), (I-338)+(1.076)+(1.091), (I-338)+(1.076)+(1.092), (I-338)+(1.076)+(2.001), (I-338)+(1.076)+(2.002), (I-338)+(1.076)+(2.003), (I-338)+(1.076)+(2.004), (I-338)+(1.076)+(2.005), (I-338)+(1.076)+(2.006), (I-338)+(1.076)+(2.007), (I-338)+(1.076)+(2.008), (I-338)+(1.076)+(2.009), (I-338)+(1.076)+(2.010), (I-338)+(1.076)+(2.011), (I-338)+(1.076)+(2.012), (I-338)+(1.076)+(2.013), (I-338)+(1.076)+(2.014), (I-338)+(1.076)+(2.015), (I-338)+(1.076)+(2.016), (I-338)+(1.076)+(2.017), (I-338)+(1.076)+(2.018), (I-338)+(1.076)+(2.019), (I-338)+(1.076)+(2.020), (I-338)+(1.076)+(2.021), (I-338)+(1.076)+(2.022), (I-338)+(1.076)+(2.023), (I-338)+(1.076)+(2.024), (I-338)+(1.076)+(2.025), (I-338)+(1.076)+(2.026), (I-338)+(1.076)+(2.027), (I-338)+(1.076)+(2.028), (I-338)+(1.076)+(2.029), (I-338)+(1.076)+(2.030), (I-338)+(1.076)+(2.031), (I-338)+(1.076)+(2.032), (I-338)+(1.076)+(2.033), (I-338)+(1.076)+(2.034), (I-338)+(1.076)+(2.035), (I-338)+(1.076)+(2.036), (I-338)+(1.076)+(2.037), (I-338)+(1.076)+(2.038), (I-338)+(1.076)+(2.039), (I-338)+(1.076)+(2.040), (I-338)+(1.076)+(2.041), (I-338)+(1.076)+(2.042), (I-338)+(1.076)+(2.043), (I-338)+(1.076)+(2.044), (I-338)+(1.076)+(2.045), (I-338)+(1.076)+(2.046), (I-338)+(1.076)+(2.047), (I-338)+(1.076)+(2.048), (I-338)+(1.076)+(2.049), (I-338)+(1.076)+(2.050), (I-338)+(1.076)+(2.051), (I-338)+(1.076)+(2.052), (I-338)+(1.076)+(2.053), (I-338)+(1.076)+(2.054), (I-338)+(1.076)+(2.055), (I-338)+(1.076)+(2.056), (I-338)+(1.076)+(2.057), (I-338)+(1.076)+(2.058), (I-338)+(1.076)+(2.059), (I-338)+(1.076)+(3.001), (I-338)+(1.076)+(3.002), (I-338)+(1.076)+(3.003), (I-338)+(1.076)+(3.004), (I-338)+(1.076)+(3.005), (I-338)+(1.076)+(3.006), (I-338)+(1.076)+(3.007), (I-338)+(1.076)+(3.008), (I-338)+(1.076)+(3.009), (I-338)+(1.076)+(3.010), (I-338)+(1.076)+(3.011), (I-338)+(1.076)+(3.012), (I-338)+(1.076)+(3.013), (I-338)+(1.076)+(3.014), (I-338)+(1.076)+(3.015), (I-338)+(1.076)+(3.016), (I-338)+(1.076)+(3.017), (I-338)+(1.076)+(3.018), (I-338)+(1.076)+(3.019), (I-338)+(1.076)+(3.020), (I-338)+(1.076)+(3.021), (I-338)+(1.076)+(3.022), (I-338)+(1.076)+(3.023), (I-338)+(1.076)+(3.024), (I-338)+(1.076)+(3.025), (I-338)+(1.076)+(3.026), (I-338)+(1.076)+(3.027), (I-338)+(1.076)+(3.028), (I-338)+(1.076)+(3.029), (I-338)+(1.076)+(3.030), (I-338)+(1.076)+(3.031), (I-338)+(1.076)+(5.001), (I-338)+(1.076)+(5.002), (I-338)+(1.076)+(5.003), (I-338)+(1.076)+(5.004), (I-338)+(1.076)+(5.005), (I-338)+(1.076)+(5.006), (I-338)+(1.076)+(5.007), (I-338)+(1.076)+(5.008), (I-338)+(1.076)+(5.009), (I-338)+(1.076)+(5.010), (I-338)+(1.076)+(5.011), (I-338)+(1.076)+(5.012), (I-338)+(1.076)+(5.013), (I-338)+(1.076)+(5.014), (I-338)+(1.076)+(5.015), (I-338)+(1.076)+(5.016), (I-338)+(1.076)+(5.017), (I-338)+(1.076)+(5.018), (I-338)+(1.076)+(5.019), (I-338)+(1.076)+(5.020), (I-338)+(1.076)+(5.021), (I-338)+(1.076)+(5.022), (I-338)+(1.076)+(5.023), (I-338)+(1.076)+(6.001), (I-338)+(1.076)+(6.002), (I-338)+(1.076)+(6.003), (I-338)+(1.076)+(6.004), (I-338)+(1.076)+(7.001), (I-338)+(1.076)+(7.002), (I-338)+(1.076)+(7.003), (I-338)+(1.076)+(7.004), (I-338)+(1.076)+(7.005), (I-338)+(1.076)+(7.006), (I-338)+(1.076)+(9.001), (I-338)+(1.076)+(9.002), (I-338)+(1.076)+(9.003), (I-338)+(1.076)+(9.004), (I-338)+(1.076)+(9.005), (I-338)+(1.076)+(9.006), (I-338)+(1.076)+(9.007), (I-338)+(1.076)+(9.008), (I-338)+(1.076)+(9.009), (I-338)+(1.076)+(14.001), (I-338)+(1.076)+(14.002), (I-338)+(1.076)+(15.008), (I-338)+(1.076)+(15.011), (I-338)+(1.076)+(15.012), (I-338)+(1.076)+(15.016), (I-338)+(1.076)+(15.025), (I-338)+(1.076)+(15.027), (I-338)+(1.076)+(15.047), (I-338)+(1.076)+(15.063), (I-338)+(1.076)+(15.064), (I-338)+(1.076)+(16.001), (I-338)+(1.076)+(16.002), (I-338)+(1.076)+(16.003), (I-338)+(1.076)+(16.004), (I-338)+(1.076)+(16.005), (I-338)+(1.076)+(16.006), (I-338)+(1.076)+(16.007), (I-338)+(1.076)+(16.008), (I-338)+(1.076)+(17.001), (I-338)+(1.076)+(17.002), (I-338)+(1.076)+(17.003), (I-338)+(1.076)+(17.004), (I-338)+(1.076)+(17.005), (I-338)+(1.076)+(17.006), (I-338)+(1.076)+(17.007), (I-338)+(1.076)+(17.008), (I-338)+(1.076)+(17.009), (I-338)+(1.076)+(17.010), (I-338)+(1.076)+(17.011), (I-338)+(1.076)+(17.012), (I-338)+(1.076)+(18.001), (I-338)+(1.077)+(1.078), (I-338)+(1.077)+(1.079), (I-338)+(1.077)+(1.080), (I-338)+(1.077)+(1.081), (I-338)+(1.077)+(1.082), (I-338)+(1.077)+(1.083), (I-338)+(1.077)+(1.084), (I-338)+(1.077)+(1.085), (I-338)+(1.077)+(1.086), (I-338)+(1.077)+(1.087), (I-338)+(1.077)+(1.088), (I-338)+(1.077)+(1.089), (I-338)+(1.077)+(1.090), (I-338)+(1.077)+(1.091), (I-338)+(1.077)+(1.092), (I-338)+(1.077)+(2.001), (I-338)+(1.077)+(2.002), (I-338)+(1.077)+(2.003), (I-338)+(1.077)+(2.004), (I-338)+(1.077)+(2.005), (I-338)+(1.077)+(2.006), (I-338)+(1.077)+(2.007), (I-338)+(1.077)+(2.008), (I-338)+(1.077)+(2.009), (I-338)+(1.077)+(2.010), (I-338)+(1.077)+(2.011), (I-338)+(1.077)+(2.012), (I-338)+(1.077)+(2.013), (I-338)+(1.077)+(2.014), (I-338)+(1.077)+(2.015), (I-338)+(1.077)+(2.016), (I-338)+(1.077)+(2.017), (I-338)+(1.077)+(2.018), (I-338)+(1.077)+(2.019), (I-338)+(1.077)+(2.020), (I-338)+(1.077)+(2.021), (I-338)+(1.077)+(2.022), (I-338)+(1.077)+(2.023), (I-338)+(1.077)+(2.024), (I-338)+(1.077)+(2.025), (I-338)+(1.077)+(2.026), (I-338)+(1.077)+(2.027), (I-338)+(1.077)+(2.028), (I-338)+(1.077)+(2.029), (I-338)+(1.077)+(2.030), (I-338)+(1.077)+(2.031), (I-338)+(1.077)+(2.032), (I-338)+(1.077)+(2.033), (I-338)+(1.077)+(2.034), (I-338)+(1.077)+(2.035), (I-338)+(1.077)+(2.036), (I-338)+(1.077)+(2.037), (I-338)+(1.077)+(2.038), (I-338)+(1.077)+(2.039), (I-338)+(1.077)+(2.040), (I-338)+(1.077)+(2.041), (I-338)+(1.077)+(2.042), (I-338)+(1.077)+(2.043), (I-338)+(1.077)+(2.044), (I-338)+(1.077)+(2.045), (I-338)+(1.077)+(2.046), (I-338)+(1.077)+(2.047), (I-338)+(1.077)+(2.048), (I-338)+(1.077)+(2.049), (I-338)+(1.077)+(2.050), (I-338)+(1.077)+(2.051), (I-338)+(1.077)+(2.052), (I-338)+(1.077)+(2.053), (I-338)+(1.077)+(2.054), (I-338)+(1.077)+(2.055), (I-338)+(1.077)+(2.056), (I-338)+(1.077)+(2.057), (I-338)+(1.077)+(2.058), (I-338)+(1.077)+(2.059), (I-338)+(1.077)+(3.001), (I-338)+(1.077)+(3.002), (I-338)+(1.077)+(3.003), (I-338)+(1.077)+(3.004), (I-338)+(1.077)+(3.005), (I-338)+(1.077)+(3.006), (I-338)+(1.077)+(3.007), (I-338)+(1.077)+(3.008), (I-338)+(1.077)+(3.009), (I-338)+(1.077)+(3.010), (I-338)+(1.077)+(3.011), (I-338)+(1.077)+(3.012), (I-338)+(1.077)+(3.013), (I-338)+(1.077)+(3.014), (I-338)+(1.077)+(3.015), (I-338)+(1.077)+(3.016), (I-338)+(1.077)+(3.017), (I-338)+(1.077)+(3.018), (I-338)+(1.077)+(3.019), (I-338)+(1.077)+(3.020), (I-338)+(1.077)+(3.021), (I-338)+(1.077)+(3.022), (I-338)+(1.077)+(3.023), (I-338)+(1.077)+(3.024), (I-338)+(1.077)+(3.025), (I-338)+(1.077)+(3.026), (I-338)+(1.077)+(3.027), (I-338)+(1.077)+(3.028), (I-338)+(1.077)+(3.029), (I-338)+(1.077)+(3.030), (I-338)+(1.077)+(3.031), (I-338)+(1.077)+(5.001), (I-338)+(1.077)+(5.002), (I-338)+(1.077)+(5.003), (I-338)+(1.077)+(5.004), (I-338)+(1.077)+(5.005), (I-338)+(1.077)+(5.006), (I-338)+(1.077)+(5.007), (I-338)+(1.077)+(5.008), (I-338)+(1.077)+(5.009), (I-338)+(1.077)+(5.010), (I-338)+(1.077)+(5.011), (I-338)+(1.077)+(5.012), (I-338)+(1.077)+(5.013), (I-338)+(1.077)+(5.014), (I-338)+(1.077)+(5.015), (I-338)+(1.077)+(5.016), (I-338)+(1.077)+(5.017), (I-338)+(1.077)+(5.018), (I-338)+(1.077)+(5.019), (I-338)+(1.077)+(5.020), (I-338)+(1.077)+(5.021), (I-338)+(1.077)+(5.022), (I-338)+(1.077)+(5.023), (I-338)+(1.077)+(6.001), (I-338)+(1.077)+(6.002), (I-338)+(1.077)+(6.003), (I-338)+(1.077)+(6.004), (I-338)+(1.077)+(7.001), (I-338)+(1.077)+(7.002), (I-338)+(1.077)+(7.003), (I-338)+(1.077)+(7.004), (I-338)+(1.077)+(7.005), (I-338)+(1.077)+(7.006), (I-338)+(1.077)+(9.001), (I-338)+(1.077)+(9.002), (I-338)+(1.077)+(9.003), (I-338)+(1.077)+(9.004), (I-338)+(1.077)+(9.005), (I-338)+(1.077)+(9.006), (I-338)+(1.077)+(9.007), (I-338)+(1.077)+(9.008), (I-338)+(1.077)+(9.009), (I-338)+(1.077)+(14.001), (I-338)+(1.077)+(14.002), (I-338)+(1.077)+(15.008), (I-338)+(1.077)+(15.011), (I-338)+(1.077)+(15.012), (I-338)+(1.077)+(15.016), (I-338)+(1.077)+(15.025), (I-338)+(1.077)+(15.027), (I-338)+(1.077)+(15.047), (I-338)+(1.077)+(15.063), (I-338)+(1.077)+(15.064), (I-338)+(1.077)+(16.001), (I-338)+(1.077)+(16.002), (I-338)+(1.077)+(16.003), (I-338)+(1.077)+(16.004), (I-338)+(1.077)+(16.005), (I-338)+(1.077)+(16.006), (I-338)+(1.077)+(16.007), (I-338)+(1.077)+(16.008), (I-338)+(1.077)+(17.001), (I-338)+(1.077)+(17.002), (I-338)+(1.077)+(17.003), (I-338)+(1.077)+(17.004), (I-338)+(1.077)+(17.005), (I-338)+(1.077)+(17.006), (I-338)+(1.077)+(17.007), (I-338)+(1.077)+(17.008), (I-338)+(1.077)+(17.009), (I-338)+(1.077)+(17.010), (I-338)+(1.077)+(17.011), (I-338)+(1.077)+(17.012), (I-338)+(1.077)+(18.001), (I-338)+(1.078)+(1.079), (I-338)+(1.078)+(1.080), (I-338)+(1.078)+(1.081), (I-338)+(1.078)+(1.082), (I-338)+(1.078)+(1.083), (I-338)+(1.078)+(1.084), (I-338)+(1.078)+(1.085), (I-338)+(1.078)+(1.086), (I-338)+(1.078)+(1.087), (I-338)+(1.078)+(1.088), (I-338)+(1.078)+(1.089), (I-338)+(1.078)+(1.090), (I-338)+(1.078)+(1.091), (I-338)+(1.078)+(1.092), (I-338)+(1.078)+(2.001), (I-338)+(1.078)+(2.002), (I-338)+(1.078)+(2.003), (I-338)+(1.078)+(2.004), (I-338)+(1.078)+(2.005), (I-338)+(1.078)+(2.006), (I-338)+(1.078)+(2.007), (I-338)+(1.078)+(2.008), (I-338)+(1.078)+(2.009), (I-338)+(1.078)+(2.010), (I-338)+(1.078)+(2.011), (I-338)+(1.078)+(2.012), (I-338)+(1.078)+(2.013), (I-338)+(1.078)+(2.014), (I-338)+(1.078)+(2.015), (I-338)+(1.078)+(2.016), (I-338)+(1.078)+(2.017), (I-338)+(1.078)+(2.018), (I-338)+(1.078)+(2.019), (I-338)+(1.078)+(2.020), (I-338)+(1.078)+(2.021), (I-338)+(1.078)+(2.022), (I-338)+(1.078)+(2.023), (I-338)+(1.078)+(2.024), (I-338)+(1.078)+(2.025), (I-338)+(1.078)+(2.026), (I-338)+(1.078)+(2.027), (I-338)+(1.078)+(2.028), (I-338)+(1.078)+(2.029), (I-338)+(1.078)+(2.030), (I-338)+(1.078)+(2.031), (I-338)+(1.078)+(2.032), (I-338)+(1.078)+(2.033), (I-338)+(1.078)+(2.034), (I-338)+(1.078)+(2.035), (I-338)+(1.078)+(2.036), (I-338)+(1.078)+(2.037), (I-338)+(1.078)+(2.038), (I-338)+(1.078)+(2.039), (I-338)+(1.078)+(2.040), (I-338)+(1.078)+(2.041), (I-338)+(1.078)+(2.042), (I-338)+(1.078)+(2.043), (I-338)+(1.078)+(2.044), (I-338)+(1.078)+(2.045), (I-338)+(1.078)+(2.046), (I-338)+(1.078)+(2.047), (I-338)+(1.078)+(2.048), (I-338)+(1.078)+(2.049), (I-338)+(1.078)+(2.050), (I-338)+(1.078)+(2.051), (I-338)+(1.078)+(2.052), (I-338)+(1.078)+(2.053), (I-338)+(1.078)+(2.054), (I-338)+(1.078)+(2.055), (I-338)+(1.078)+(2.056), (I-338)+(1.078)+(2.057), (I-338)+(1.078)+(2.058), (I-338)+(1.078)+(2.059), (I-338)+(1.078)+(3.001), (I-338)+(1.078)+(3.002), (I-338)+(1.078)+(3.003), (I-338)+(1.078)+(3.004), (I-338)+(1.078)+(3.005), (I-338)+(1.078)+(3.006), (I-338)+(1.078)+(3.007), (I-338)+(1.078)+(3.008), (I-338)+(1.078)+(3.009), (I-338)+(1.078)+(3.010), (I-338)+(1.078)+(3.011), (I-338)+(1.078)+(3.012), (I-338)+(1.078)+(3.013), (I-338)+(1.078)+(3.014), (I-338)+(1.078)+(3.015), (I-338)+(1.078)+(3.016), (I-338)+(1.078)+(3.017), (I-338)+(1.078)+(3.018), (I-338)+(1.078)+(3.019), (I-338)+(1.078)+(3.020), (I-338)+(1.078)+(3.021), (I-338)+(1.078)+(3.022), (I-338)+(1.078)+(3.023), (I-338)+(1.078)+(3.024), (I-338)+(1.078)+(3.025), (I-338)+(1.078)+(3.026), (I-338)+(1.078)+(3.027), (I-338)+(1.078)+(3.028), (I-338)+(1.078)+(3.029), (I-338)+(1.078)+(3.030), (I-338)+(1.078)+(3.031), (I-338)+(1.078)+(5.001), (I-338)+(1.078)+(5.002), (I-338)+(1.078)+(5.003), (I-338)+(1.078)+(5.004), (I-338)+(1.078)+(5.005), (I-338)+(1.078)+(5.006), (I-338)+(1.078)+(5.007), (I-338)+(1.078)+(5.008), (I-338)+(1.078)+(5.009), (I-338)+(1.078)+(5.010), (I-338)+(1.078)+(5.011), (I-338)+(1.078)+(5.012), (I-338)+(1.078)+(5.013), (I-338)+(1.078)+(5.014), (I-338)+(1.078)+(5.015), (I-338)+(1.078)+(5.016), (I-338)+(1.078)+(5.017), (I-338)+(1.078)+(5.018), (I-338)+(1.078)+(5.019), (I-338)+(1.078)+(5.020), (I-338)+(1.078)+(5.021), (I-338)+(1.078)+(5.022), (I-338)+(1.078)+(5.023), (I-338)+(1.078)+(6.001), (I-338)+(1.078)+(6.002), (I-338)+(1.078)+(6.003), (I-338)+(1.078)+(6.004), (I-338)+(1.078)+(7.001), (I-338)+(1.078)+(7.002), (I-338)+(1.078)+(7.003), (I-338)+(1.078)+(7.004), (I-338)+(1.078)+(7.005), (I-338)+(1.078)+(7.006), (I-338)+(1.078)+(9.001), (I-338)+(1.078)+(9.002), (I-338)+(1.078)+(9.003), (I-338)+(1.078)+(9.004), (I-338)+(1.078)+(9.005), (I-338)+(1.078)+(9.006), (I-338)+(1.078)+(9.007), (I-338)+(1.078)+(9.008), (I-338)+(1.078)+(9.009), (I-338)+(1.078)+(14.001), (I-338)+(1.078)+(14.002), (I-338)+(1.078)+(15.008), (I-338)+(1.078)+(15.011), (I-338)+(1.078)+(15.012), (I-338)+(1.078)+(15.016), (I-338)+(1.078)+(15.025), (I-338)+(1.078)+(15.027), (I-338)+(1.078)+(15.047), (I-338)+(1.078)+(15.063), (I-338)+(1.078)+(15.064), (I-338)+(1.078)+(16.001), (I-338)+(1.078)+(16.002), (I-338)+(1.078)+(16.003), (I-338)+(1.078)+(16.004), (I-338)+(1.078)+(16.005), (I-338)+(1.078)+(16.006), (I-338)+(1.078)+(16.007), (I-338)+(1.078)+(16.008), (I-338)+(1.078)+(17.001), (I-338)+(1.078)+(17.002), (I-338)+(1.078)+(17.003), (I-338)+(1.078)+(17.004), (I-338)+(1.078)+(17.005), (I-338)+(1.078)+(17.006), (I-338)+(1.078)+(17.007), (I-338)+(1.078)+(17.008), (I-338)+(1.078)+(17.009), (I-338)+(1.078)+(17.010), (I-338)+(1.078)+(17.011), (I-338)+(1.078)+(17.012), (I-338)+(1.078)+(18.001), (I-338)+(1.079)+(1.080), (I-338)+(1.079)+(1.081), (I-338)+(1.079)+(1.082), (I-338)+(1.079)+(1.083), (I-338)+(1.079)+(1.084), (I-338)+(1.079)+(1.085), (I-338)+(1.079)+(1.086), (I-338)+(1.079)+(1.087), (I-338)+(1.079)+(1.088), (I-338)+(1.079)+(1.089), (I-338)+(1.079)+(1.090), (I-338)+(1.079)+(1.091), (I-338)+(1.079)+(1.092), (I-338)+(1.079)+(2.001), (I-338)+(1.079)+(2.002), (I-338)+(1.079)+(2.003), (I-338)+(1.079)+(2.004), (I-338)+(1.079)+(2.005), (I-338)+(1.079)+(2.006), (I-338)+(1.079)+(2.007), (I-338)+(1.079)+(2.008), (I-338)+(1.079)+(2.009), (I-338)+(1.079)+(2.010), (I-338)+(1.079)+(2.011), (I-338)+(1.079)+(2.012), (I-338)+(1.079)+(2.013), (I-338)+(1.079)+(2.014), (I-338)+(1.079)+(2.015), (I-338)+(1.079)+(2.016), (I-338)+(1.079)+(2.017), (I-338)+(1.079)+(2.018), (I-338)+(1.079)+(2.019), (I-338)+(1.079)+(2.020), (I-338)+(1.079)+(2.021), (I-338)+(1.079)+(2.022), (I-338)+(1.079)+(2.023), (I-338)+(1.079)+(2.024), (I-338)+(1.079)+(2.025), (I-338)+(1.079)+(2.026), (I-338)+(1.079)+(2.027), (I-338)+(1.079)+(2.028), (I-338)+(1.079)+(2.029), (I-338)+(1.079)+(2.030), (I-338)+(1.079)+(2.031), (I-338)+(1.079)+(2.032), (I-338)+(1.079)+(2.033), (I-338)+(1.079)+(2.034), (I-338)+(1.079)+(2.035), (I-338)+(1.079)+(2.036), (I-338)+(1.079)+(2.037), (I-338)+(1.079)+(2.038), (I-338)+(1.079)+(2.039), (I-338)+(1.079)+(2.040), (I-338)+(1.079)+(2.041), (I-338)+(1.079)+(2.042), (I-338)+(1.079)+(2.043), (I-338)+(1.079)+(2.044), (I-338)+(1.079)+(2.045), (I-338)+(1.079)+(2.046), (I-338)+(1.079)+(2.047), (I-338)+(1.079)+(2.048), (I-338)+(1.079)+(2.049), (I-338)+(1.079)+(2.050), (I-338)+(1.079)+(2.051), (I-338)+(1.079)+(2.052), (I-338)+(1.079)+(2.053), (I-338)+(1.079)+(2.054), (I-338)+(1.079)+(2.055), (I-338)+(1.079)+(2.056), (I-338)+(1.079)+(2.057), (I-338)+(1.079)+(2.058), (I-338)+(1.079)+(2.059), (I-338)+(1.079)+(3.001), (I-338)+(1.079)+(3.002), (I-338)+(1.079)+(3.003), (I-338)+(1.079)+(3.004), (I-338)+(1.079)+(3.005), (I-338)+(1.079)+(3.006), (I-338)+(1.079)+(3.007), (I-338)+(1.079)+(3.008), (I-338)+(1.079)+(3.009), (I-338)+(1.079)+(3.010), (I-338)+(1.079)+(3.011), (I-338)+(1.079)+(3.012), (I-338)+(1.079)+(3.013), (I-338)+(1.079)+(3.014), (I-338)+(1.079)+(3.015), (I-338)+(1.079)+(3.016), (I-338)+(1.079)+(3.017), (I-338)+(1.079)+(3.018), (I-338)+(1.079)+(3.019), (I-338)+(1.079)+(3.020), (I-338)+(1.079)+(3.021), (I-338)+(1.079)+(3.022), (I-338)+(1.079)+(3.023), (I-338)+(1.079)+(3.024), (I-338)+(1.079)+(3.025), (I-338)+(1.079)+(3.026), (I-338)+(1.079)+(3.027), (I-338)+(1.079)+(3.028), (I-338)+(1.079)+(3.029), (I-338)+(1.079)+(3.030), (I-338)+(1.079)+(3.031), (I-338)+(1.079)+(5.001), (I-338)+(1.079)+(5.002), (I-338)+(1.079)+(5.003), (I-338)+(1.079)+(5.004), (I-338)+(1.079)+(5.005), (I-338)+(1.079)+(5.006), (I-338)+(1.079)+(5.007), (I-338)+(1.079)+(5.008), (I-338)+(1.079)+(5.009), (I-338)+(1.079)+(5.010), (I-338)+(1.079)+(5.011), (I-338)+(1.079)+(5.012), (I-338)+(1.079)+(5.013), (I-338)+(1.079)+(5.014), (I-338)+(1.079)+(5.015), (I-338)+(1.079)+(5.016), (I-338)+(1.079)+(5.017), (I-338)+(1.079)+(5.018), (I-338)+(1.079)+(5.019), (I-338)+(1.079)+(5.020), (I-338)+(1.079)+(5.021), (I-338)+(1.079)+(5.022), (I-338)+(1.079)+(5.023), (I-338)+(1.079)+(6.001), (I-338)+(1.079)+(6.002), (I-338)+(1.079)+(6.003), (I-338)+(1.079)+(6.004), (I-338)+(1.079)+(7.001), (I-338)+(1.079)+(7.002), (I-338)+(1.079)+(7.003), (I-338)+(1.079)+(7.004), (I-338)+(1.079)+(7.005), (I-338)+(1.079)+(7.006), (I-338)+(1.079)+(9.001), (I-338)+(1.079)+(9.002), (I-338)+(1.079)+(9.003), (I-338)+(1.079)+(9.004), (I-338)+(1.079)+(9.005), (I-338)+(1.079)+(9.006), (I-338)+(1.079)+(9.007), (I-338)+(1.079)+(9.008), (I-338)+(1.079)+(9.009), (I-338)+(1.079)+(14.001), (I-338)+(1.079)+(14.002), (I-338)+(1.079)+(15.008), (I-338)+(1.079)+(15.011), (I-338)+(1.079)+(15.012), (I-338)+(1.079)+(15.016), (I-338)+(1.079)+(15.025), (I-338)+(1.079)+(15.027), (I-338)+(1.079)+(15.047), (I-338)+(1.079)+(15.063), (I-338)+(1.079)+(15.064), (I-338)+(1.079)+(16.001), (I-338)+(1.079)+(16.002), (I-338)+(1.079)+(16.003), (I-338)+(1.079)+(16.004), (I-338)+(1.079)+(16.005), (I-338)+(1.079)+(16.006), (I-338)+(1.079)+(16.007), (I-338)+(1.079)+(16.008), (I-338)+(1.079)+(17.001), (I-338)+(1.079)+(17.002), (I-338)+(1.079)+(17.003), (I-338)+(1.079)+(17.004), (I-338)+(1.079)+(17.005), (I-338)+(1.079)+(17.006), (I-338)+(1.079)+(17.007), (I-338)+(1.079)+(17.008), (I-338)+(1.079)+(17.009), (I-338)+(1.079)+(17.010), (I-338)+(1.079)+(17.011), (I-338)+(1.079)+(17.012), (I-338)+(1.079)+(18.001), (I-338)+(1.080)+(1.081), (I-338)+(1.080)+(1.082), (I-338)+(1.080)+(1.083), (I-338)+(1.080)+(1.084), (I-338)+(1.080)+(1.085), (I-338)+(1.080)+(1.086), (I-338)+(1.080)+(1.087), (I-338)+(1.080)+(1.088), (I-338)+(1.080)+(1.089), (I-338)+(1.080)+(1.090), (I-338)+(1.080)+(1.091), (I-338)+(1.080)+(1.092), (I-338)+(1.080)+(2.001), (I-338)+(1.080)+(2.002), (I-338)+(1.080)+(2.003), (I-338)+(1.080)+(2.004), (I-338)+(1.080)+(2.005), (I-338)+(1.080)+(2.006), (I-338)+(1.080)+(2.007), (I-338)+(1.080)+(2.008), (I-338)+(1.080)+(2.009), (I-338)+(1.080)+(2.010), (I-338)+(1.080)+(2.011), (I-338)+(1.080)+(2.012), (I-338)+(1.080)+(2.013), (I-338)+(1.080)+(2.014), (I-338)+(1.080)+(2.015), (I-338)+(1.080)+(2.016), (I-338)+(1.080)+(2.017), (I-338)+(1.080)+(2.018), (I-338)+(1.080)+(2.019), (I-338)+(1.080)+(2.020), (I-338)+(1.080)+(2.021), (I-338)+(1.080)+(2.022), (I-338)+(1.080)+(2.023), (I-338)+(1.080)+(2.024), (I-338)+(1.080)+(2.025), (I-338)+(1.080)+(2.026), (I-338)+(1.080)+(2.027), (I-338)+(1.080)+(2.028), (I-338)+(1.080)+(2.029), (I-338)+(1.080)+(2.030), (I-338)+(1.080)+(2.031), (I-338)+(1.080)+(2.032), (I-338)+(1.080)+(2.033), (I-338)+(1.080)+(2.034), (I-338)+(1.080)+(2.035), (I-338)+(1.080)+(2.036), (I-338)+(1.080)+(2.037), (I-338)+(1.080)+(2.038), (I-338)+(1.080)+(2.039), (I-338)+(1.080)+(2.040), (I-338)+(1.080)+(2.041), (I-338)+(1.080)+(2.042), (I-338)+(1.080)+(2.043), (I-338)+(1.080)+(2.044), (I-338)+(1.080)+(2.045), (I-338)+(1.080)+(2.046), (I-338)+(1.080)+(2.047), (I-338)+(1.080)+(2.048), (I-338)+(1.080)+(2.049), (I-338)+(1.080)+(2.050), (I-338)+(1.080)+(2.051), (I-338)+(1.080)+(2.052), (I-338)+(1.080)+(2.053), (I-338)+(1.080)+(2.054), (I-338)+(1.080)+(2.055), (I-338)+(1.080)+(2.056), (I-338)+(1.080)+(2.057), (I-338)+(1.080)+(2.058), (I-338)+(1.080)+(2.059), (I-338)+(1.080)+(3.001), (I-338)+(1.080)+(3.002), (I-338)+(1.080)+(3.003), (I-338)+(1.080)+(3.004), (I-338)+(1.080)+(3.005), (I-338)+(1.080)+(3.006), (I-338)+(1.080)+(3.007), (I-338)+(1.080)+(3.008), (I-338)+(1.080)+(3.009), (I-338)+(1.080)+(3.010), (I-338)+(1.080)+(3.011), (I-338)+(1.080)+(3.012), (I-338)+(1.080)+(3.013), (I-338)+(1.080)+(3.014), (I-338)+(1.080)+(3.015), (I-338)+(1.080)+(3.016), (I-338)+(1.080)+(3.017), (I-338)+(1.080)+(3.018), (I-338)+(1.080)+(3.019), (I-338)+(1.080)+(3.020), (I-338)+(1.080)+(3.021), (I-338)+(1.080)+(3.022), (I-338)+(1.080)+(3.023), (I-338)+(1.080)+(3.024), (I-338)+(1.080)+(3.025), (I-338)+(1.080)+(3.026), (I-338)+(1.080)+(3.027), (I-338)+(1.080)+(3.028), (I-338)+(1.080)+(3.029), (I-338)+(1.080)+(3.030), (I-338)+(1.080)+(3.031), (I-338)+(1.080)+(5.001), (I-338)+(1.080)+(5.002), (I-338)+(1.080)+(5.003), (I-338)+(1.080)+(5.004), (I-338)+(1.080)+(5.005), (I-338)+(1.080)+(5.006), (I-338)+(1.080)+(5.007), (I-338)+(1.080)+(5.008), (I-338)+(1.080)+(5.009), (I-338)+(1.080)+(5.010), (I-338)+(1.080)+(5.011), (I-338)+(1.080)+(5.012), (I-338)+(1.080)+(5.013), (I-338)+(1.080)+(5.014), (I-338)+(1.080)+(5.015), (I-338)+(1.080)+(5.016), (I-338)+(1.080)+(5.017), (I-338)+(1.080)+(5.018), (I-338)+(1.080)+(5.019), (I-338)+(1.080)+(5.020), (I-338)+(1.080)+(5.021), (I-338)+(1.080)+(5.022), (I-338)+(1.080)+(5.023), (I-338)+(1.080)+(6.001), (I-338)+(1.080)+(6.002), (I-338)+(1.080)+(6.003), (I-338)+(1.080)+(6.004), (I-338)+(1.080)+(7.001), (I-338)+(1.080)+(7.002), (I-338)+(1.080)+(7.003), (I-338)+(1.080)+(7.004), (I-338)+(1.080)+(7.005), (I-338)+(1.080)+(7.006), (I-338)+(1.080)+(9.001), (I-338)+(1.080)+(9.002), (I-338)+(1.080)+(9.003), (I-338)+(1.080)+(9.004), (I-338)+(1.080)+(9.005), (I-338)+(1.080)+(9.006), (I-338)+(1.080)+(9.007), (I-338)+(1.080)+(9.008), (I-338)+(1.080)+(9.009), (I-338)+(1.080)+(14.001), (I-338)+(1.080)+(14.002), (I-338)+(1.080)+(15.008), (I-338)+(1.080)+(15.011), (I-338)+(1.080)+(15.012), (I-338)+(1.080)+(15.016), (I-338)+(1.080)+(15.025), (I-338)+(1.080)+(15.027), (I-338)+(1.080)+(15.047), (I-338)+(1.080)+(15.063), (I-338)+(1.080)+(15.064), (I-338)+(1.080)+(16.001), (I-338)+(1.080)+(16.002), (I-338)+(1.080)+(16.003), (I-338)+(1.080)+(16.004), (I-338)+(1.080)+(16.005), (I-338)+(1.080)+(16.006), (I-338)+(1.080)+(16.007), (I-338)+(1.080)+(16.008), (I-338)+(1.080)+(17.001), (I-338)+(1.080)+(17.002), (I-338)+(1.080)+(17.003), (I-338)+(1.080)+(17.004), (I-338)+(1.080)+(17.005), (I-338)+(1.080)+(17.006), (I-338)+(1.080)+(17.007), (I-338)+(1.080)+(17.008), (I-338)+(1.080)+(17.009), (I-338)+(1.080)+(17.010), (I-338)+(1.080)+(17.011), (I-338)+(1.080)+(17.012), (I-338)+(1.080)+(18.001), (I-338)+(1.081)+(1.082), (I-338)+(1.081)+(1.083), (I-338)+(1.081)+(1.084), (I-338)+(1.081)+(1.085), (I-338)+(1.081)+(1.086), (I-338)+(1.081)+(1.087), (I-338)+(1.081)+(1.088), (I-338)+(1.081)+(1.089), (I-338)+(1.081)+(1.090), (I-338)+(1.081)+(1.091), (I-338)+(1.081)+(1.092), (I-338)+(1.081)+(2.001), (I-338)+(1.081)+(2.002), (I-338)+(1.081)+(2.003), (I-338)+(1.081)+(2.004), (I-338)+(1.081)+(2.005), (I-338)+(1.081)+(2.006), (I-338)+(1.081)+(2.007), (I-338)+(1.081)+(2.008), (I-338)+(1.081)+(2.009), (I-338)+(1.081)+(2.010), (I-338)+(1.081)+(2.011), (I-338)+(1.081)+(2.012), (I-338)+(1.081)+(2.013), (I-338)+(1.081)+(2.014), (I-338)+(1.081)+(2.015), (I-338)+(1.081)+(2.016), (I-338)+(1.081)+(2.017), (I-338)+(1.081)+(2.018), (I-338)+(1.081)+(2.019), (I-338)+(1.081)+(2.020), (I-338)+(1.081)+(2.021), (I-338)+(1.081)+(2.022), (I-338)+(1.081)+(2.023), (I-338)+(1.081)+(2.024), (I-338)+(1.081)+(2.025), (I-338)+(1.081)+(2.026), (I-338)+(1.081)+(2.027), (I-338)+(1.081)+(2.028), (I-338)+(1.081)+(2.029), (I-338)+(1.081)+(2.030), (I-338)+(1.081)+(2.031), (I-338)+(1.081)+(2.032), (I-338)+(1.081)+(2.033), (I-338)+(1.081)+(2.034), (I-338)+(1.081)+(2.035), (I-338)+(1.081)+(2.036), (I-338)+(1.081)+(2.037), (I-338)+(1.081)+(2.038), (I-338)+(1.081)+(2.039), (I-338)+(1.081)+(2.040), (I-338)+(1.081)+(2.041), (I-338)+(1.081)+(2.042), (I-338)+(1.081)+(2.043), (I-338)+(1.081)+(2.044), (I-338)+(1.081)+(2.045), (I-338)+(1.081)+(2.046), (I-338)+(1.081)+(2.047), (I-338)+(1.081)+(2.048), (I-338)+(1.081)+(2.049), (I-338)+(1.081)+(2.050), (I-338)+(1.081)+(2.051), (I-338)+(1.081)+(2.052), (I-338)+(1.081)+(2.053), (I-338)+(1.081)+(2.054), (I-338)+(1.081)+(2.055), (I-338)+(1.081)+(2.056), (I-338)+(1.081)+(2.057), (I-338)+(1.081)+(2.058), (I-338)+(1.081)+(2.059), (I-338)+(1.081)+(3.001), (I-338)+(1.081)+(3.002), (I-338)+(1.081)+(3.003), (I-338)+(1.081)+(3.004), (I-338)+(1.081)+(3.005), (I-338)+(1.081)+(3.006), (I-338)+(1.081)+(3.007), (I-338)+(1.081)+(3.008), (I-338)+(1.081)+(3.009), (I-338)+(1.081)+(3.010), (I-338)+(1.081)+(3.011), (I-338)+(1.081)+(3.012), (I-338)+(1.081)+(3.013), (I-338)+(1.081)+(3.014), (I-338)+(1.081)+(3.015), (I-338)+(1.081)+(3.016), (I-338)+(1.081)+(3.017), (I-338)+(1.081)+(3.018), (I-338)+(1.081)+(3.019), (I-338)+(1.081)+(3.020), (I-338)+(1.081)+(3.021), (I-338)+(1.081)+(3.022), (I-338)+(1.081)+(3.023), (I-338)+(1.081)+(3.024), (I-338)+(1.081)+(3.025), (I-338)+(1.081)+(3.026), (I-338)+(1.081)+(3.027), (I-338)+(1.081)+(3.028), (I-338)+(1.081)+(3.029), (I-338)+(1.081)+(3.030), (I-338)+(1.081)+(3.031), (I-338)+(1.081)+(5.001), (I-338)+(1.081)+(5.002), (I-338)+(1.081)+(5.003), (I-338)+(1.081)+(5.004), (I-338)+(1.081)+(5.005), (I-338)+(1.081)+(5.006), (I-338)+(1.081)+(5.007), (I-338)+(1.081)+(5.008), (I-338)+(1.081)+(5.009), (I-338)+(1.081)+(5.010), (I-338)+(1.081)+(5.011), (I-338)+(1.081)+(5.012), (I-338)+(1.081)+(5.013), (I-338)+(1.081)+(5.014), (I-338)+(1.081)+(5.015), (I-338)+(1.081)+(5.016), (I-338)+(1.081)+(5.017), (I-338)+(1.081)+(5.018), (I-338)+(1.081)+(5.019), (I-338)+(1.081)+(5.020), (I-338)+(1.081)+(5.021), (I-338)+(1.081)+(5.022), (I-338)+(1.081)+(5.023), (I-338)+(1.081)+(6.001), (I-338)+(1.081)+(6.002), (I-338)+(1.081)+(6.003), (I-338)+(1.081)+(6.004), (I-338)+(1.081)+(7.001), (I-338)+(1.081)+(7.002), (I-338)+(1.081)+(7.003), (I-338)+(1.081)+(7.004), (I-338)+(1.081)+(7.005), (I-338)+(1.081)+(7.006), (I-338)+(1.081)+(9.001), (I-338)+(1.081)+(9.002), (I-338)+(1.081)+(9.003), (I-338)+(1.081)+(9.004), (I-338)+(1.081)+(9.005), (I-338)+(1.081)+(9.006), (I-338)+(1.081)+(9.007), (I-338)+(1.081)+(9.008), (I-338)+(1.081)+(9.009), (I-338)+(1.081)+(14.001), (I-338)+(1.081)+(14.002), (I-338)+(1.081)+(15.008), (I-338)+(1.081)+(15.011), (I-338)+(1.081)+(15.012), (I-338)+(1.081)+(15.016), (I-338)+(1.081)+(15.025), (I-338)+(1.081)+(15.027), (I-338)+(1.081)+(15.047), (I-338)+(1.081)+(15.063), (I-338)+(1.081)+(15.064), (I-338)+(1.081)+(16.001), (I-338)+(1.081)+(16.002), (I-338)+(1.081)+(16.003), (I-338)+(1.081)+(16.004), (I-338)+(1.081)+(16.005), (I-338)+(1.081)+(16.006), (I-338)+(1.081)+(16.007), (I-338)+(1.081)+(16.008), (I-338)+(1.081)+(17.001), (I-338)+(1.081)+(17.002), (I-338)+(1.081)+(17.003), (I-338)+(1.081)+(17.004), (I-338)+(1.081)+(17.005), (I-338)+(1.081)+(17.006), (I-338)+(1.081)+(17.007), (I-338)+(1.081)+(17.008), (I-338)+(1.081)+(17.009), (I-338)+(1.081)+(17.010), (I-338)+(1.081)+(17.011), (I-338)+(1.081)+(17.012), (I-338)+(1.081)+(18.001), (I-338)+(1.082)+(1.083), (I-338)+(1.082)+(1.084), (I-338)+(1.082)+(1.085), (I-338)+(1.082)+(1.086), (I-338)+(1.082)+(1.087), (I-338)+(1.082)+(1.088), (I-338)+(1.082)+(1.089), (I-338)+(1.082)+(1.090), (I-338)+(1.082)+(1.091), (I-338)+(1.082)+(1.092), (I-338)+(1.082)+(2.001), (I-338)+(1.082)+(2.002), (I-338)+(1.082)+(2.003), (I-338)+(1.082)+(2.004), (I-338)+(1.082)+(2.005), (I-338)+(1.082)+(2.006), (I-338)+(1.082)+(2.007), (I-338)+(1.082)+(2.008), (I-338)+(1.082)+(2.009), (I-338)+(1.082)+(2.010), (I-338)+(1.082)+(2.011), (I-338)+(1.082)+(2.012), (I-338)+(1.082)+(2.013), (I-338)+(1.082)+(2.014), (I-338)+(1.082)+(2.015), (I-338)+(1.082)+(2.016), (I-338)+(1.082)+(2.017), (I-338)+(1.082)+(2.018), (I-338)+(1.082)+(2.019), (I-338)+(1.082)+(2.020), (I-338)+(1.082)+(2.021), (I-338)+(1.082)+(2.022), (I-338)+(1.082)+(2.023), (I-338)+(1.082)+(2.024), (I-338)+(1.082)+(2.025), (I-338)+(1.082)+(2.026), (I-338)+(1.082)+(2.027), (I-338)+(1.082)+(2.028), (I-338)+(1.082)+(2.029), (I-338)+(1.082)+(2.030), (I-338)+(1.082)+(2.031), (I-338)+(1.082)+(2.032), (I-338)+(1.082)+(2.033), (I-338)+(1.082)+(2.034), (I-338)+(1.082)+(2.035), (I-338)+(1.082)+(2.036), (I-338)+(1.082)+(2.037), (I-338)+(1.082)+(2.038), (I-338)+(1.082)+(2.039), (I-338)+(1.082)+(2.040), (I-338)+(1.082)+(2.041), (I-338)+(1.082)+(2.042), (I-338)+(1.082)+(2.043), (I-338)+(1.082)+(2.044), (I-338)+(1.082)+(2.045), (I-338)+(1.082)+(2.046), (I-338)+(1.082)+(2.047), (I-338)+(1.082)+(2.048), (I-338)+(1.082)+(2.049), (I-338)+(1.082)+(2.050), (I-338)+(1.082)+(2.051), (I-338)+(1.082)+(2.052), (I-338)+(1.082)+(2.053), (I-338)+(1.082)+(2.054), (I-338)+(1.082)+(2.055), (I-338)+(1.082)+(2.056), (I-338)+(1.082)+(2.057), (I-338)+(1.082)+(2.058), (I-338)+(1.082)+(2.059), (I-338)+(1.082)+(3.001), (I-338)+(1.082)+(3.002), (I-338)+(1.082)+(3.003), (I-338)+(1.082)+(3.004), (I-338)+(1.082)+(3.005), (I-338)+(1.082)+(3.006), (I-338)+(1.082)+(3.007), (I-338)+(1.082)+(3.008), (I-338)+(1.082)+(3.009), (I-338)+(1.082)+(3.010), (I-338)+(1.082)+(3.011), (I-338)+(1.082)+(3.012), (I-338)+(1.082)+(3.013), (I-338)+(1.082)+(3.014), (I-338)+(1.082)+(3.015), (I-338)+(1.082)+(3.016), (I-338)+(1.082)+(3.017), (I-338)+(1.082)+(3.018), (I-338)+(1.082)+(3.019), (I-338)+(1.082)+(3.020), (I-338)+(1.082)+(3.021), (I-338)+(1.082)+(3.022), (I-338)+(1.082)+(3.023), (I-338)+(1.082)+(3.024), (I-338)+(1.082)+(3.025), (I-338)+(1.082)+(3.026), (I-338)+(1.082)+(3.027), (I-338)+(1.082)+(3.028), (I-338)+(1.082)+(3.029), (I-338)+(1.082)+(3.030), (I-338)+(1.082)+(3.031), (I-338)+(1.082)+(5.001), (I-338)+(1.082)+(5.002), (I-338)+(1.082)+(5.003), (I-338)+(1.082)+(5.004), (I-338)+(1.082)+(5.005), (I-338)+(1.082)+(5.006), (I-338)+(1.082)+(5.007), (I-338)+(1.082)+(5.008), (I-338)+(1.082)+(5.009), (I-338)+(1.082)+(5.010), (I-338)+(1.082)+(5.011), (I-338)+(1.082)+(5.012), (I-338)+(1.082)+(5.013), (I-338)+(1.082)+(5.014), (I-338)+(1.082)+(5.015), (I-338)+(1.082)+(5.016), (I-338)+(1.082)+(5.017), (I-338)+(1.082)+(5.018), (I-338)+(1.082)+(5.019), (I-338)+(1.082)+(5.020), (I-338)+(1.082)+(5.021), (I-338)+(1.082)+(5.022), (I-338)+(1.082)+(5.023), (I-338)+(1.082)+(6.001), (I-338)+(1.082)+(6.002), (I-338)+(1.082)+(6.003), (I-338)+(1.082)+(6.004), (I-338)+(1.082)+(7.001), (I-338)+(1.082)+(7.002), (I-338)+(1.082)+(7.003), (I-338)+(1.082)+(7.004), (I-338)+(1.082)+(7.005), (I-338)+(1.082)+(7.006), (I-338)+(1.082)+(9.001), (I-338)+(1.082)+(9.002), (I-338)+(1.082)+(9.003), (I-338)+(1.082)+(9.004), (I-338)+(1.082)+(9.005), (I-338)+(1.082)+(9.006), (I-338)+(1.082)+(9.007), (I-338)+(1.082)+(9.008), (I-338)+(1.082)+(9.009), (I-338)+(1.082)+(14.001), (I-338)+(1.082)+(14.002), (I-338)+(1.082)+(15.008), (I-338)+(1.082)+(15.011), (I-338)+(1.082)+(15.012), (I-338)+(1.082)+(15.016), (I-338)+(1.082)+(15.025), (I-338)+(1.082)+(15.027), (I-338)+(1.082)+(15.047), (I-338)+(1.082)+(15.063), (I-338)+(1.082)+(15.064), (I-338)+(1.082)+(16.001), (I-338)+(1.082)+(16.002), (I-338)+(1.082)+(16.003), (I-338)+(1.082)+(16.004), (I-338)+(1.082)+(16.005), (I-338)+(1.082)+(16.006), (I-338)+(1.082)+(16.007), (I-338)+(1.082)+(16.008), (I-338)+(1.082)+(17.001), (I-338)+(1.082)+(17.002), (I-338)+(1.082)+(17.003), (I-338)+(1.082)+(17.004), (I-338)+(1.082)+(17.005), (I-338)+(1.082)+(17.006), (I-338)+(1.082)+(17.007), (I-338)+(1.082)+(17.008), (I-338)+(1.082)+(17.009), (I-338)+(1.082)+(17.010), (I-338)+(1.082)+(17.011), (I-338)+(1.082)+(17.012), (I-338)+(1.082)+(18.001), (I-338)+(1.083)+(1.084), (I-338)+(1.083)+(1.085), (I-338)+(1.083)+(1.086), (I-338)+(1.083)+(1.087), (I-338)+(1.083)+(1.088), (I-338)+(1.083)+(1.089), (I-338)+(1.083)+(1.090), (I-338)+(1.083)+(1.091), (I-338)+(1.083)+(1.092), (I-338)+(1.083)+(2.001), (I-338)+(1.083)+(2.002), (I-338)+(1.083)+(2.003), (I-338)+(1.083)+(2.004), (I-338)+(1.083)+(2.005), (I-338)+(1.083)+(2.006), (I-338)+(1.083)+(2.007), (I-338)+(1.083)+(2.008), (I-338)+(1.083)+(2.009), (I-338)+(1.083)+(2.010), (I-338)+(1.083)+(2.011), (I-338)+(1.083)+(2.012), (I-338)+(1.083)+(2.013), (I-338)+(1.083)+(2.014), (I-338)+(1.083)+(2.015), (I-338)+(1.083)+(2.016), (I-338)+(1.083)+(2.017), (I-338)+(1.083)+(2.018), (I-338)+(1.083)+(2.019), (I-338)+(1.083)+(2.020), (I-338)+(1.083)+(2.021), (I-338)+(1.083)+(2.022), (I-338)+(1.083)+(2.023), (I-338)+(1.083)+(2.024), (I-338)+(1.083)+(2.025), (I-338)+(1.083)+(2.026), (I-338)+(1.083)+(2.027), (I-338)+(1.083)+(2.028), (I-338)+(1.083)+(2.029), (I-338)+(1.083)+(2.030), (I-338)+(1.083)+(2.031), (I-338)+(1.083)+(2.032), (I-338)+(1.083)+(2.033), (I-338)+(1.083)+(2.034), (I-338)+(1.083)+(2.035), (I-338)+(1.083)+(2.036), (I-338)+(1.083)+(2.037), (I-338)+(1.083)+(2.038), (I-338)+(1.083)+(2.039), (I-338)+(1.083)+(2.040), (I-338)+(1.083)+(2.041), (I-338)+(1.083)+(2.042), (I-338)+(1.083)+(2.043), (I-338)+(1.083)+(2.044), (I-338)+(1.083)+(2.045), (I-338)+(1.083)+(2.046), (I-338)+(1.083)+(2.047), (I-338)+(1.083)+(2.048), (I-338)+(1.083)+(2.049), (I-338)+(1.083)+(2.050), (I-338)+(1.083)+(2.051), (I-338)+(1.083)+(2.052), (I-338)+(1.083)+(2.053), (I-338)+(1.083)+(2.054), (I-338)+(1.083)+(2.055), (I-338)+(1.083)+(2.056), (I-338)+(1.083)+(2.057), (I-338)+(1.083)+(2.058), (I-338)+(1.083)+(2.059), (I-338)+(1.083)+(3.001), (I-338)+(1.083)+(3.002), (I-338)+(1.083)+(3.003), (I-338)+(1.083)+(3.004), (I-338)+(1.083)+(3.005), (I-338)+(1.083)+(3.006), (I-338)+(1.083)+(3.007), (I-338)+(1.083)+(3.008), (I-338)+(1.083)+(3.009), (I-338)+(1.083)+(3.010), (I-338)+(1.083)+(3.011), (I-338)+(1.083)+(3.012), (I-338)+(1.083)+(3.013), (I-338)+(1.083)+(3.014), (I-338)+(1.083)+(3.015), (I-338)+(1.083)+(3.016), (I-338)+(1.083)+(3.017), (I-338)+(1.083)+(3.018), (I-338)+(1.083)+(3.019), (I-338)+(1.083)+(3.020), (I-338)+(1.083)+(3.021), (I-338)+(1.083)+(3.022), (I-338)+(1.083)+(3.023), (I-338)+(1.083)+(3.024), (I-338)+(1.083)+(3.025), (I-338)+(1.083)+(3.026), (I-338)+(1.083)+(3.027), (I-338)+(1.083)+(3.028), (I-338)+(1.083)+(3.029), (I-338)+(1.083)+(3.030), (I-338)+(1.083)+(3.031), (I-338)+(1.083)+(5.001), (I-338)+(1.083)+(5.002), (I-338)+(1.083)+(5.003), (I-338)+(1.083)+(5.004), (I-338)+(1.083)+(5.005), (I-338)+(1.083)+(5.006), (I-338)+(1.083)+(5.007), (I-338)+(1.083)+(5.008), (I-338)+(1.083)+(5.009), (I-338)+(1.083)+(5.010), (I-338)+(1.083)+(5.011), (I-338)+(1.083)+(5.012), (I-338)+(1.083)+(5.013), (I-338)+(1.083)+(5.014), (I-338)+(1.083)+(5.015), (I-338)+(1.083)+(5.016), (I-338)+(1.083)+(5.017), (I-338)+(1.083)+(5.018), (I-338)+(1.083)+(5.019), (I-338)+(1.083)+(5.020), (I-338)+(1.083)+(5.021), (I-338)+(1.083)+(5.022), (I-338)+(1.083)+(5.023), (I-338)+(1.083)+(6.001), (I-338)+(1.083)+(6.002), (I-338)+(1.083)+(6.003), (I-338)+(1.083)+(6.004), (I-338)+(1.083)+(7.001), (I-338)+(1.083)+(7.002), (I-338)+(1.083)+(7.003), (I-338)+(1.083)+(7.004), (I-338)+(1.083)+(7.005), (I-338)+(1.083)+(7.006), (I-338)+(1.083)+(9.001), (I-338)+(1.083)+(9.002), (I-338)+(1.083)+(9.003), (I-338)+(1.083)+(9.004), (I-338)+(1.083)+(9.005), (I-338)+(1.083)+(9.006), (I-338)+(1.083)+(9.007), (I-338)+(1.083)+(9.008), (I-338)+(1.083)+(9.009), (I-338)+(1.083)+(14.001), (I-338)+(1.083)+(14.002), (I-338)+(1.083)+(15.008), (I-338)+(1.083)+(15.011), (I-338)+(1.083)+(15.012), (I-338)+(1.083)+(15.016), (I-338)+(1.083)+(15.025), (I-338)+(1.083)+(15.027), (I-338)+(1.083)+(15.047), (I-338)+(1.083)+(15.063), (I-338)+(1.083)+(15.064), (I-338)+(1.083)+(16.001), (I-338)+(1.083)+(16.002), (I-338)+(1.083)+(16.003), (I-338)+(1.083)+(16.004), (I-338)+(1.083)+(16.005), (I-338)+(1.083)+(16.006), (I-338)+(1.083)+(16.007), (I-338)+(1.083)+(16.008), (I-338)+(1.083)+(17.001), (I-338)+(1.083)+(17.002), (I-338)+(1.083)+(17.003), (I-338)+(1.083)+(17.004), (I-338)+(1.083)+(17.005), (I-338)+(1.083)+(17.006), (I-338)+(1.083)+(17.007), (I-338)+(1.083)+(17.008), (I-338)+(1.083)+(17.009), (I-338)+(1.083)+(17.010), (I-338)+(1.083)+(17.011), (I-338)+(1.083)+(17.012), (I-338)+(1.083)+(18.001), (I-338)+(1.084)+(1.085), (I-338)+(1.084)+(1.086), (I-338)+(1.084)+(1.087), (I-338)+(1.084)+(1.088), (I-338)+(1.084)+(1.089), (I-338)+(1.084)+(1.090), (I-338)+(1.084)+(1.091), (I-338)+(1.084)+(1.092), (I-338)+(1.084)+(2.001), (I-338)+(1.084)+(2.002), (I-338)+(1.084)+(2.003), (I-338)+(1.084)+(2.004), (I-338)+(1.084)+(2.005), (I-338)+(1.084)+(2.006), (I-338)+(1.084)+(2.007), (I-338)+(1.084)+(2.008), (I-338)+(1.084)+(2.009), (I-338)+(1.084)+(2.010), (I-338)+(1.084)+(2.011), (I-338)+(1.084)+(2.012), (I-338)+(1.084)+(2.013), (I-338)+(1.084)+(2.014), (I-338)+(1.084)+(2.015), (I-338)+(1.084)+(2.016), (I-338)+(1.084)+(2.017), (I-338)+(1.084)+(2.018), (I-338)+(1.084)+(2.019), (I-338)+(1.084)+(2.020), (I-338)+(1.084)+(2.021), (I-338)+(1.084)+(2.022), (I-338)+(1.084)+(2.023), (I-338)+(1.084)+(2.024), (I-338)+(1.084)+(2.025), (I-338)+(1.084)+(2.026), (I-338)+(1.084)+(2.027), (I-338)+(1.084)+(2.028), (I-338)+(1.084)+(2.029), (I-338)+(1.084)+(2.030), (I-338)+(1.084)+(2.031), (I-338)+(1.084)+(2.032), (I-338)+(1.084)+(2.033), (I-338)+(1.084)+(2.034), (I-338)+(1.084)+(2.035), (I-338)+(1.084)+(2.036), (I-338)+(1.084)+(2.037), (I-338)+(1.084)+(2.038), (I-338)+(1.084)+(2.039), (I-338)+(1.084)+(2.040), (I-338)+(1.084)+(2.041), (I-338)+(1.084)+(2.042), (I-338)+(1.084)+(2.043), (I-338)+(1.084)+(2.044), (I-338)+(1.084)+(2.045), (I-338)+(1.084)+(2.046), (I-338)+(1.084)+(2.047), (I-338)+(1.084)+(2.048), (I-338)+(1.084)+(2.049), (I-338)+(1.084)+(2.050), (I-338)+(1.084)+(2.051), (I-338)+(1.084)+(2.052), (I-338)+(1.084)+(2.053), (I-338)+(1.084)+(2.054), (I-338)+(1.084)+(2.055), (I-338)+(1.084)+(2.056), (I-338)+(1.084)+(2.057), (I-338)+(1.084)+(2.058), (I-338)+(1.084)+(2.059), (I-338)+(1.084)+(3.001), (I-338)+(1.084)+(3.002), (I-338)+(1.084)+(3.003), (I-338)+(1.084)+(3.004), (I-338)+(1.084)+(3.005), (I-338)+(1.084)+(3.006), (I-338)+(1.084)+(3.007), (I-338)+(1.084)+(3.008), (I-338)+(1.084)+(3.009), (I-338)+(1.084)+(3.010), (I-338)+(1.084)+(3.011), (I-338)+(1.084)+(3.012), (I-338)+(1.084)+(3.013), (I-338)+(1.084)+(3.014), (I-338)+(1.084)+(3.015), (I-338)+(1.084)+(3.016), (I-338)+(1.084)+(3.017), (I-338)+(1.084)+(3.018), (I-338)+(1.084)+(3.019), (I-338)+(1.084)+(3.020), (I-338)+(1.084)+(3.021), (I-338)+(1.084)+(3.022), (I-338)+(1.084)+(3.023), (I-338)+(1.084)+(3.024), (I-338)+(1.084)+(3.025), (I-338)+(1.084)+(3.026), (I-338)+(1.084)+(3.027), (I-338)+(1.084)+(3.028), (I-338)+(1.084)+(3.029), (I-338)+(1.084)+(3.030), (I-338)+(1.084)+(3.031), (I-338)+(1.084)+(5.001), (I-338)+(1.084)+(5.002), (I-338)+(1.084)+(5.003), (I-338)+(1.084)+(5.004), (I-338)+(1.084)+(5.005), (I-338)+(1.084)+(5.006), (I-338)+(1.084)+(5.007), (I-338)+(1.084)+(5.008), (I-338)+(1.084)+(5.009), (I-338)+(1.084)+(5.010), (I-338)+(1.084)+(5.011), (I-338)+(1.084)+(5.012), (I-338)+(1.084)+(5.013), (I-338)+(1.084)+(5.014), (I-338)+(1.084)+(5.015), (I-338)+(1.084)+(5.016), (I-338)+(1.084)+(5.017), (I-338)+(1.084)+(5.018), (I-338)+(1.084)+(5.019), (I-338)+(1.084)+(5.020), (I-338)+(1.084)+(5.021), (I-338)+(1.084)+(5.022), (I-338)+(1.084)+(5.023), (I-338)+(1.084)+(6.001), (I-338)+(1.084)+(6.002), (I-338)+(1.084)+(6.003), (I-338)+(1.084)+(6.004), (I-338)+(1.084)+(7.001), (I-338)+(1.084)+(7.002), (I-338)+(1.084)+(7.003), (I-338)+(1.084)+(7.004), (I-338)+(1.084)+(7.005), (I-338)+(1.084)+(7.006), (I-338)+(1.084)+(9.001), (I-338)+(1.084)+(9.002), (I-338)+(1.084)+(9.003), (I-338)+(1.084)+(9.004), (I-338)+(1.084)+(9.005), (I-338)+(1.084)+(9.006), (I-338)+(1.084)+(9.007), (I-338)+(1.084)+(9.008), (I-338)+(1.084)+(9.009), (I-338)+(1.084)+(14.001), (I-338)+(1.084)+(14.002), (I-338)+(1.084)+(15.008), (I-338)+(1.084)+(15.011), (I-338)+(1.084)+(15.012), (I-338)+(1.084)+(15.016), (I-338)+(1.084)+(15.025), (I-338)+(1.084)+(15.027), (I-338)+(1.084)+(15.047), (I-338)+(1.084)+(15.063), (I-338)+(1.084)+(15.064), (I-338)+(1.084)+(16.001), (I-338)+(1.084)+(16.002), (I-338)+(1.084)+(16.003), (I-338)+(1.084)+(16.004), (I-338)+(1.084)+(16.005), (I-338)+(1.084)+(16.006), (I-338)+(1.084)+(16.007), (I-338)+(1.084)+(16.008), (I-338)+(1.084)+(17.001), (I-338)+(1.084)+(17.002), (I-338)+(1.084)+(17.003), (I-338)+(1.084)+(17.004), (I-338)+(1.084)+(17.005), (I-338)+(1.084)+(17.006), (I-338)+(1.084)+(17.007), (I-338)+(1.084)+(17.008), (I-338)+(1.084)+(17.009), (I-338)+(1.084)+(17.010), (I-338)+(1.084)+(17.011), (I-338)+(1.084)+(17.012), (I-338)+(1.084)+(18.001), (I-338)+(1.085)+(1.086), (I-338)+(1.085)+(1.087), (I-338)+(1.085)+(1.088), (I-338)+(1.085)+(1.089), (I-338)+(1.085)+(1.090), (I-338)+(1.085)+(1.091), (I-338)+(1.085)+(1.092), (I-338)+(1.085)+(2.001), (I-338)+(1.085)+(2.002), (I-338)+(1.085)+(2.003), (I-338)+(1.085)+(2.004), (I-338)+(1.085)+(2.005), (I-338)+(1.085)+(2.006), (I-338)+(1.085)+(2.007), (I-338)+(1.085)+(2.008), (I-338)+(1.085)+(2.009), (I-338)+(1.085)+(2.010), (I-338)+(1.085)+(2.011), (I-338)+(1.085)+(2.012), (I-338)+(1.085)+(2.013), (I-338)+(1.085)+(2.014), (I-338)+(1.085)+(2.015), (I-338)+(1.085)+(2.016), (I-338)+(1.085)+(2.017), (I-338)+(1.085)+(2.018), (I-338)+(1.085)+(2.019), (I-338)+(1.085)+(2.020), (I-338)+(1.085)+(2.021), (I-338)+(1.085)+(2.022), (I-338)+(1.085)+(2.023), (I-338)+(1.085)+(2.024), (I-338)+(1.085)+(2.025), (I-338)+(1.085)+(2.026), (I-338)+(1.085)+(2.027), (I-338)+(1.085)+(2.028), (I-338)+(1.085)+(2.029), (I-338)+(1.085)+(2.030), (I-338)+(1.085)+(2.031), (I-338)+(1.085)+(2.032), (I-338)+(1.085)+(2.033), (I-338)+(1.085)+(2.034), (I-338)+(1.085)+(2.035), (I-338)+(1.085)+(2.036), (I-338)+(1.085)+(2.037), (I-338)+(1.085)+(2.038), (I-338)+(1.085)+(2.039), (I-338)+(1.085)+(2.040), (I-338)+(1.085)+(2.041), (I-338)+(1.085)+(2.042), (I-338)+(1.085)+(2.043), (I-338)+(1.085)+(2.044), (I-338)+(1.085)+(2.045), (I-338)+(1.085)+(2.046), (I-338)+(1.085)+(2.047), (I-338)+(1.085)+(2.048), (I-338)+(1.085)+(2.049), (I-338)+(1.085)+(2.050), (I-338)+(1.085)+(2.051), (I-338)+(1.085)+(2.052), (I-338)+(1.085)+(2.053), (I-338)+(1.085)+(2.054), (I-338)+(1.085)+(2.055), (I-338)+(1.085)+(2.056), (I-338)+(1.085)+(2.057), (I-338)+(1.085)+(2.058), (I-338)+(1.085)+(2.059), (I-338)+(1.085)+(3.001), (I-338)+(1.085)+(3.002), (I-338)+(1.085)+(3.003), (I-338)+(1.085)+(3.004), (I-338)+(1.085)+(3.005), (I-338)+(1.085)+(3.006), (I-338)+(1.085)+(3.007), (I-338)+(1.085)+(3.008), (I-338)+(1.085)+(3.009), (I-338)+(1.085)+(3.010), (I-338)+(1.085)+(3.011), (I-338)+(1.085)+(3.012), (I-338)+(1.085)+(3.013), (I-338)+(1.085)+(3.014), (I-338)+(1.085)+(3.015), (I-338)+(1.085)+(3.016), (I-338)+(1.085)+(3.017), (I-338)+(1.085)+(3.018), (I-338)+(1.085)+(3.019), (I-338)+(1.085)+(3.020), (I-338)+(1.085)+(3.021), (I-338)+(1.085)+(3.022), (I-338)+(1.085)+(3.023), (I-338)+(1.085)+(3.024), (I-338)+(1.085)+(3.025), (I-338)+(1.085)+(3.026), (I-338)+(1.085)+(3.027), (I-338)+(1.085)+(3.028), (I-338)+(1.085)+(3.029), (I-338)+(1.085)+(3.030), (I-338)+(1.085)+(3.031), (I-338)+(1.085)+(5.001), (I-338)+(1.085)+(5.002), (I-338)+(1.085)+(5.003), (I-338)+(1.085)+(5.004), (I-338)+(1.085)+(5.005), (I-338)+(1.085)+(5.006), (I-338)+(1.085)+(5.007), (I-338)+(1.085)+(5.008), (I-338)+(1.085)+(5.009), (I-338)+(1.085)+(5.010), (I-338)+(1.085)+(5.011), (I-338)+(1.085)+(5.012), (I-338)+(1.085)+(5.013), (I-338)+(1.085)+(5.014), (I-338)+(1.085)+(5.015), (I-338)+(1.085)+(5.016), (I-338)+(1.085)+(5.017), (I-338)+(1.085)+(5.018), (I-338)+(1.085)+(5.019), (I-338)+(1.085)+(5.020), (I-338)+(1.085)+(5.021), (I-338)+(1.085)+(5.022), (I-338)+(1.085)+(5.023), (I-338)+(1.085)+(6.001), (I-338)+(1.085)+(6.002), (I-338)+(1.085)+(6.003), (I-338)+(1.085)+(6.004), (I-338)+(1.085)+(7.001), (I-338)+(1.085)+(7.002), (I-338)+(1.085)+(7.003), (I-338)+(1.085)+(7.004), (I-338)+(1.085)+(7.005), (I-338)+(1.085)+(7.006), (I-338)+(1.085)+(9.001), (I-338)+(1.085)+(9.002), (I-338)+(1.085)+(9.003), (I-338)+(1.085)+(9.004), (I-338)+(1.085)+(9.005), (I-338)+(1.085)+(9.006), (I-338)+(1.085)+(9.007), (I-338)+(1.085)+(9.008), (I-338)+(1.085)+(9.009), (I-338)+(1.085)+(14.001), (I-338)+(1.085)+(14.002), (I-338)+(1.085)+(15.008), (I-338)+(1.085)+(15.011), (I-338)+(1.085)+(15.012), (I-338)+(1.085)+(15.016), (I-338)+(1.085)+(15.025), (I-338)+(1.085)+(15.027), (I-338)+(1.085)+(15.047), (I-338)+(1.085)+(15.063), (I-338)+(1.085)+(15.064), (I-338)+(1.085)+(16.001), (I-338)+(1.085)+(16.002), (I-338)+(1.085)+(16.003), (I-338)+(1.085)+(16.004), (I-338)+(1.085)+(16.005), (I-338)+(1.085)+(16.006), (I-338)+(1.085)+(16.007), (I-338)+(1.085)+(16.008), (I-338)+(1.085)+(17.001), (I-338)+(1.085)+(17.002), (I-338)+(1.085)+(17.003), (I-338)+(1.085)+(17.004), (I-338)+(1.085)+(17.005), (I-338)+(1.085)+(17.006), (I-338)+(1.085)+(17.007), (I-338)+(1.085)+(17.008), (I-338)+(1.085)+(17.009), (I-338)+(1.085)+(17.010), (I-338)+(1.085)+(17.011), (I-338)+(1.085)+(17.012), (I-338)+(1.085)+(18.001), (I-338)+(1.086)+(1.087), (I-338)+(1.086)+(1.088), (I-338)+(1.086)+(1.089), (I-338)+(1.086)+(1.090), (I-338)+(1.086)+(1.091), (I-338)+(1.086)+(1.092), (I-338)+(1.086)+(2.001), (I-338)+(1.086)+(2.002), (I-338)+(1.086)+(2.003), (I-338)+(1.086)+(2.004), (I-338)+(1.086)+(2.005), (I-338)+(1.086)+(2.006), (I-338)+(1.086)+(2.007), (I-338)+(1.086)+(2.008), (I-338)+(1.086)+(2.009), (I-338)+(1.086)+(2.010), (I-338)+(1.086)+(2.011), (I-338)+(1.086)+(2.012), (I-338)+(1.086)+(2.013), (I-338)+(1.086)+(2.014), (I-338)+(1.086)+(2.015), (I-338)+(1.086)+(2.016), (I-338)+(1.086)+(2.017), (I-338)+(1.086)+(2.018), (I-338)+(1.086)+(2.019), (I-338)+(1.086)+(2.020), (I-338)+(1.086)+(2.021), (I-338)+(1.086)+(2.022), (I-338)+(1.086)+(2.023), (I-338)+(1.086)+(2.024), (I-338)+(1.086)+(2.025), (I-338)+(1.086)+(2.026), (I-338)+(1.086)+(2.027), (I-338)+(1.086)+(2.028), (I-338)+(1.086)+(2.029), (I-338)+(1.086)+(2.030), (I-338)+(1.086)+(2.031), (I-338)+(1.086)+(2.032), (I-338)+(1.086)+(2.033), (I-338)+(1.086)+(2.034), (I-338)+(1.086)+(2.035), (I-338)+(1.086)+(2.036), (I-338)+(1.086)+(2.037), (I-338)+(1.086)+(2.038), (I-338)+(1.086)+(2.039), (I-338)+(1.086)+(2.040), (I-338)+(1.086)+(2.041), (I-338)+(1.086)+(2.042), (I-338)+(1.086)+(2.043), (I-338)+(1.086)+(2.044), (I-338)+(1.086)+(2.045), (I-338)+(1.086)+(2.046), (I-338)+(1.086)+(2.047), (I-338)+(1.086)+(2.048), (I-338)+(1.086)+(2.049), (I-338)+(1.086)+(2.050), (I-338)+(1.086)+(2.051), (I-338)+(1.086)+(2.052), (I-338)+(1.086)+(2.053), (I-338)+(1.086)+(2.054), (I-338)+(1.086)+(2.055), (I-338)+(1.086)+(2.056), (I-338)+(1.086)+(2.057), (I-338)+(1.086)+(2.058), (I-338)+(1.086)+(2.059), (I-338)+(1.086)+(3.001), (I-338)+(1.086)+(3.002), (I-338)+(1.086)+(3.003), (I-338)+(1.086)+(3.004), (I-338)+(1.086)+(3.005), (I-338)+(1.086)+(3.006), (I-338)+(1.086)+(3.007), (I-338)+(1.086)+(3.008), (I-338)+(1.086)+(3.009), (I-338)+(1.086)+(3.010), (I-338)+(1.086)+(3.011), (I-338)+(1.086)+(3.012), (I-338)+(1.086)+(3.013), (I-338)+(1.086)+(3.014), (I-338)+(1.086)+(3.015), (I-338)+(1.086)+(3.016), (I-338)+(1.086)+(3.017), (I-338)+(1.086)+(3.018), (I-338)+(1.086)+(3.019), (I-338)+(1.086)+(3.020), (I-338)+(1.086)+(3.021), (I-338)+(1.086)+(3.022), (I-338)+(1.086)+(3.023), (I-338)+(1.086)+(3.024), (I-338)+(1.086)+(3.025), (I-338)+(1.086)+(3.026), (I-338)+(1.086)+(3.027), (I-338)+(1.086)+(3.028), (I-338)+(1.086)+(3.029), (I-338)+(1.086)+(3.030), (I-338)+(1.086)+(3.031), (I-338)+(1.086)+(5.001), (I-338)+(1.086)+(5.002), (I-338)+(1.086)+(5.003), (I-338)+(1.086)+(5.004), (I-338)+(1.086)+(5.005), (I-338)+(1.086)+(5.006), (I-338)+(1.086)+(5.007), (I-338)+(1.086)+(5.008), (I-338)+(1.086)+(5.009), (I-338)+(1.086)+(5.010), (I-338)+(1.086)+(5.011), (I-338)+(1.086)+(5.012), (I-338)+(1.086)+(5.013), (I-338)+(1.086)+(5.014), (I-338)+(1.086)+(5.015), (I-338)+(1.086)+(5.016), (I-338)+(1.086)+(5.017), (I-338)+(1.086)+(5.018), (I-338)+(1.086)+(5.019), (I-338)+(1.086)+(5.020), (I-338)+(1.086)+(5.021), (I-338)+(1.086)+(5.022), (I-338)+(1.086)+(5.023), (I-338)+(1.086)+(6.001), (I-338)+(1.086)+(6.002), (I-338)+(1.086)+(6.003), (I-338)+(1.086)+(6.004), (I-338)+(1.086)+(7.001), (I-338)+(1.086)+(7.002), (I-338)+(1.086)+(7.003), (I-338)+(1.086)+(7.004), (I-338)+(1.086)+(7.005), (I-338)+(1.086)+(7.006), (I-338)+(1.086)+(9.001), (I-338)+(1.086)+(9.002), (I-338)+(1.086)+(9.003), (I-338)+(1.086)+(9.004), (I-338)+(1.086)+(9.005), (I-338)+(1.086)+(9.006), (I-338)+(1.086)+(9.007), (I-338)+(1.086)+(9.008), (I-338)+(1.086)+(9.009), (I-338)+(1.086)+(14.001), (I-338)+(1.086)+(14.002), (I-338)+(1.086)+(15.008), (I-338)+(1.086)+(15.011), (I-338)+(1.086)+(15.012), (I-338)+(1.086)+(15.016), (I-338)+(1.086)+(15.025), (I-338)+(1.086)+(15.027), (I-338)+(1.086)+(15.047), (I-338)+(1.086)+(15.063), (I-338)+(1.086)+(15.064), (I-338)+(1.086)+(16.001), (I-338)+(1.086)+(16.002), (I-338)+(1.086)+(16.003), (I-338)+(1.086)+(16.004), (I-338)+(1.086)+(16.005), (I-338)+(1.086)+(16.006), (I-338)+(1.086)+(16.007), (I-338)+(1.086)+(16.008), (I-338)+(1.086)+(17.001), (I-338)+(1.086)+(17.002), (I-338)+(1.086)+(17.003), (I-338)+(1.086)+(17.004), (I-338)+(1.086)+(17.005), (I-338)+(1.086)+(17.006), (I-338)+(1.086)+(17.007), (I-338)+(1.086)+(17.008), (I-338)+(1.086)+(17.009), (I-338)+(1.086)+(17.010), (I-338)+(1.086)+(17.011), (I-338)+(1.086)+(17.012), (I-338)+(1.086)+(18.001), (I-338)+(1.087)+(1.088), (I-338)+(1.087)+(1.089), (I-338)+(1.087)+(1.090), (I-338)+(1.087)+(1.091), (I-338)+(1.087)+(1.092), (I-338)+(1.087)+(2.001), (I-338)+(1.087)+(2.002), (I-338)+(1.087)+(2.003), (I-338)+(1.087)+(2.004), (I-338)+(1.087)+(2.005), (I-338)+(1.087)+(2.006), (I-338)+(1.087)+(2.007), (I-338)+(1.087)+(2.008), (I-338)+(1.087)+(2.009), (I-338)+(1.087)+(2.010), (I-338)+(1.087)+(2.011), (I-338)+(1.087)+(2.012), (I-338)+(1.087)+(2.013), (I-338)+(1.087)+(2.014), (I-338)+(1.087)+(2.015), (I-338)+(1.087)+(2.016), (I-338)+(1.087)+(2.017), (I-338)+(1.087)+(2.018), (I-338)+(1.087)+(2.019), (I-338)+(1.087)+(2.020), (I-338)+(1.087)+(2.021), (I-338)+(1.087)+(2.022), (I-338)+(1.087)+(2.023), (I-338)+(1.087)+(2.024), (I-338)+(1.087)+(2.025), (I-338)+(1.087)+(2.026), (I-338)+(1.087)+(2.027), (I-338)+(1.087)+(2.028), (I-338)+(1.087)+(2.029), (I-338)+(1.087)+(2.030), (I-338)+(1.087)+(2.031), (I-338)+(1.087)+(2.032), (I-338)+(1.087)+(2.033), (I-338)+(1.087)+(2.034), (I-338)+(1.087)+(2.035), (I-338)+(1.087)+(2.036), (I-338)+(1.087)+(2.037), (I-338)+(1.087)+(2.038), (I-338)+(1.087)+(2.039), (I-338)+(1.087)+(2.040), (I-338)+(1.087)+(2.041), (I-338)+(1.087)+(2.042), (I-338)+(1.087)+(2.043), (I-338)+(1.087)+(2.044), (I-338)+(1.087)+(2.045), (I-338)+(1.087)+(2.046), (I-338)+(1.087)+(2.047), (I-338)+(1.087)+(2.048), (I-338)+(1.087)+(2.049), (I-338)+(1.087)+(2.050), (I-338)+(1.087)+(2.051), (I-338)+(1.087)+(2.052), (I-338)+(1.087)+(2.053), (I-338)+(1.087)+(2.054), (I-338)+(1.087)+(2.055), (I-338)+(1.087)+(2.056), (I-338)+(1.087)+(2.057), (I-338)+(1.087)+(2.058), (I-338)+(1.087)+(2.059), (I-338)+(1.087)+(3.001), (I-338)+(1.087)+(3.002), (I-338)+(1.087)+(3.003), (I-338)+(1.087)+(3.004), (I-338)+(1.087)+(3.005), (I-338)+(1.087)+(3.006), (I-338)+(1.087)+(3.007), (I-338)+(1.087)+(3.008), (I-338)+(1.087)+(3.009), (I-338)+(1.087)+(3.010), (I-338)+(1.087)+(3.011), (I-338)+(1.087)+(3.012), (I-338)+(1.087)+(3.013), (I-338)+(1.087)+(3.014), (I-338)+(1.087)+(3.015), (I-338)+(1.087)+(3.016), (I-338)+(1.087)+(3.017), (I-338)+(1.087)+(3.018), (I-338)+(1.087)+(3.019), (I-338)+(1.087)+(3.020), (I-338)+(1.087)+(3.021), (I-338)+(1.087)+(3.022), (I-338)+(1.087)+(3.023), (I-338)+(1.087)+(3.024), (I-338)+(1.087)+(3.025), (I-338)+(1.087)+(3.026), (I-338)+(1.087)+(3.027), (I-338)+(1.087)+(3.028), (I-338)+(1.087)+(3.029), (I-338)+(1.087)+(3.030), (I-338)+(1.087)+(3.031), (I-338)+(1.087)+(5.001), (I-338)+(1.087)+(5.002), (I-338)+(1.087)+(5.003), (I-338)+(1.087)+(5.004), (I-338)+(1.087)+(5.005), (I-338)+(1.087)+(5.006), (I-338)+(1.087)+(5.007), (I-338)+(1.087)+(5.008), (I-338)+(1.087)+(5.009), (I-338)+(1.087)+(5.010), (I-338)+(1.087)+(5.011), (I-338)+(1.087)+(5.012), (I-338)+(1.087)+(5.013), (I-338)+(1.087)+(5.014), (I-338)+(1.087)+(5.015), (I-338)+(1.087)+(5.016), (I-338)+(1.087)+(5.017), (I-338)+(1.087)+(5.018), (I-338)+(1.087)+(5.019), (I-338)+(1.087)+(5.020), (I-338)+(1.087)+(5.021), (I-338)+(1.087)+(5.022), (I-338)+(1.087)+(5.023), (I-338)+(1.087)+(6.001), (I-338)+(1.087)+(6.002), (I-338)+(1.087)+(6.003), (I-338)+(1.087)+(6.004), (I-338)+(1.087)+(7.001), (I-338)+(1.087)+(7.002), (I-338)+(1.087)+(7.003), (I-338)+(1.087)+(7.004), (I-338)+(1.087)+(7.005), (I-338)+(1.087)+(7.006), (I-338)+(1.087)+(9.001), (I-338)+(1.087)+(9.002), (I-338)+(1.087)+(9.003), (I-338)+(1.087)+(9.004), (I-338)+(1.087)+(9.005), (I-338)+(1.087)+(9.006), (I-338)+(1.087)+(9.007), (I-338)+(1.087)+(9.008), (I-338)+(1.087)+(9.009), (I-338)+(1.087)+(14.001), (I-338)+(1.087)+(14.002), (I-338)+(1.087)+(15.008), (I-338)+(1.087)+(15.011), (I-338)+(1.087)+(15.012), (I-338)+(1.087)+(15.016), (I-338)+(1.087)+(15.025), (I-338)+(1.087)+(15.027), (I-338)+(1.087)+(15.047), (I-338)+(1.087)+(15.063), (I-338)+(1.087)+(15.064), (I-338)+(1.087)+(16.001), (I-338)+(1.087)+(16.002), (I-338)+(1.087)+(16.003), (I-338)+(1.087)+(16.004), (I-338)+(1.087)+(16.005), (I-338)+(1.087)+(16.006), (I-338)+(1.087)+(16.007), (I-338)+(1.087)+(16.008), (I-338)+(1.087)+(17.001), (I-338)+(1.087)+(17.002), (I-338)+(1.087)+(17.003), (I-338)+(1.087)+(17.004), (I-338)+(1.087)+(17.005), (I-338)+(1.087)+(17.006), (I-338)+(1.087)+(17.007), (I-338)+(1.087)+(17.008), (I-338)+(1.087)+(17.009), (I-338)+(1.087)+(17.010), (I-338)+(1.087)+(17.011), (I-338)+(1.087)+(17.012), (I-338)+(1.087)+(18.001), (I-338)+(1.088)+(1.089), (I-338)+(1.088)+(1.090), (I-338)+(1.088)+(1.091), (I-338)+(1.088)+(1.092), (I-338)+(1.088)+(2.001), (I-338)+(1.088)+(2.002), (I-338)+(1.088)+(2.003), (I-338)+(1.088)+(2.004), (I-338)+(1.088)+(2.005), (I-338)+(1.088)+(2.006), (I-338)+(1.088)+(2.007), (I-338)+(1.088)+(2.008), (I-338)+(1.088)+(2.009), (I-338)+(1.088)+(2.010), (I-338)+(1.088)+(2.011), (I-338)+(1.088)+(2.012), (I-338)+(1.088)+(2.013), (I-338)+(1.088)+(2.014), (I-338)+(1.088)+(2.015), (I-338)+(1.088)+(2.016), (I-338)+(1.088)+(2.017), (I-338)+(1.088)+(2.018), (I-338)+(1.088)+(2.019), (I-338)+(1.088)+(2.020), (I-338)+(1.088)+(2.021), (I-338)+(1.088)+(2.022), (I-338)+(1.088)+(2.023), (I-338)+(1.088)+(2.024), (I-338)+(1.088)+(2.025), (I-338)+(1.088)+(2.026), (I-338)+(1.088)+(2.027), (I-338)+(1.088)+(2.028), (I-338)+(1.088)+(2.029), (I-338)+(1.088)+(2.030), (I-338)+(1.088)+(2.031), (I-338)+(1.088)+(2.032), (I-338)+(1.088)+(2.033), (I-338)+(1.088)+(2.034), (I-338)+(1.088)+(2.035), (I-338)+(1.088)+(2.036), (I-338)+(1.088)+(2.037), (I-338)+(1.088)+(2.038), (I-338)+(1.088)+(2.039), (I-338)+(1.088)+(2.040), (I-338)+(1.088)+(2.041), (I-338)+(1.088)+(2.042), (I-338)+(1.088)+(2.043), (I-338)+(1.088)+(2.044), (I-338)+(1.088)+(2.045), (I-338)+(1.088)+(2.046), (I-338)+(1.088)+(2.047), (I-338)+(1.088)+(2.048), (I-338)+(1.088)+(2.049), (I-338)+(1.088)+(2.050), (I-338)+(1.088)+(2.051), (I-338)+(1.088)+(2.052), (I-338)+(1.088)+(2.053), (I-338)+(1.088)+(2.054), (I-338)+(1.088)+(2.055), (I-338)+(1.088)+(2.056), (I-338)+(1.088)+(2.057), (I-338)+(1.088)+(2.058), (I-338)+(1.088)+(2.059), (I-338)+(1.088)+(3.001), (I-338)+(1.088)+(3.002), (I-338)+(1.088)+(3.003), (I-338)+(1.088)+(3.004), (I-338)+(1.088)+(3.005), (I-338)+(1.088)+(3.006), (I-338)+(1.088)+(3.007), (I-338)+(1.088)+(3.008), (I-338)+(1.088)+(3.009), (I-338)+(1.088)+(3.010), (I-338)+(1.088)+(3.011), (I-338)+(1.088)+(3.012), (I-338)+(1.088)+(3.013), (I-338)+(1.088)+(3.014), (I-338)+(1.088)+(3.015), (I-338)+(1.088)+(3.016), (I-338)+(1.088)+(3.017), (I-338)+(1.088)+(3.018), (I-338)+(1.088)+(3.019), (I-338)+(1.088)+(3.020), (I-338)+(1.088)+(3.021), (I-338)+(1.088)+(3.022), (I-338)+(1.088)+(3.023), (I-338)+(1.088)+(3.024), (I-338)+(1.088)+(3.025), (I-338)+(1.088)+(3.026), (I-338)+(1.088)+(3.027), (I-338)+(1.088)+(3.028), (I-338)+(1.088)+(3.029), (I-338)+(1.088)+(3.030), (I-338)+(1.088)+(3.031), (I-338)+(1.088)+(5.001), (I-338)+(1.088)+(5.002), (I-338)+(1.088)+(5.003), (I-338)+(1.088)+(5.004), (I-338)+(1.088)+(5.005), (I-338)+(1.088)+(5.006), (I-338)+(1.088)+(5.007), (I-338)+(1.088)+(5.008), (I-338)+(1.088)+(5.009), (I-338)+(1.088)+(5.010), (I-338)+(1.088)+(5.011), (I-338)+(1.088)+(5.012), (I-338)+(1.088)+(5.013), (I-338)+(1.088)+(5.014), (I-338)+(1.088)+(5.015), (I-338)+(1.088)+(5.016), (I-338)+(1.088)+(5.017), (I-338)+(1.088)+(5.018), (I-338)+(1.088)+(5.019), (I-338)+(1.088)+(5.020), (I-338)+(1.088)+(5.021), (I-338)+(1.088)+(5.022), (I-338)+(1.088)+(5.023), (I-338)+(1.088)+(6.001), (I-338)+(1.088)+(6.002), (I-338)+(1.088)+(6.003), (I-338)+(1.088)+(6.004), (I-338)+(1.088)+(7.001), (I-338)+(1.088)+(7.002), (I-338)+(1.088)+(7.003), (I-338)+(1.088)+(7.004), (I-338)+(1.088)+(7.005), (I-338)+(1.088)+(7.006), (I-338)+(1.088)+(9.001), (I-338)+(1.088)+(9.002), (I-338)+(1.088)+(9.003), (I-338)+(1.088)+(9.004), (I-338)+(1.088)+(9.005), (I-338)+(1.088)+(9.006), (I-338)+(1.088)+(9.007), (I-338)+(1.088)+(9.008), (I-338)+(1.088)+(9.009), (I-338)+(1.088)+(14.001), (I-338)+(1.088)+(14.002), (I-338)+(1.088)+(15.008), (I-338)+(1.088)+(15.011), (I-338)+(1.088)+(15.012), (I-338)+(1.088)+(15.016), (I-338)+(1.088)+(15.025), (I-338)+(1.088)+(15.027), (I-338)+(1.088)+(15.047), (I-338)+(1.088)+(15.063), (I-338)+(1.088)+(15.064), (I-338)+(1.088)+(16.001), (I-338)+(1.088)+(16.002), (I-338)+(1.088)+(16.003), (I-338)+(1.088)+(16.004), (I-338)+(1.088)+(16.005), (I-338)+(1.088)+(16.006), (I-338)+(1.088)+(16.007), (I-338)+(1.088)+(16.008), (I-338)+(1.088)+(17.001), (I-338)+(1.088)+(17.002), (I-338)+(1.088)+(17.003), (I-338)+(1.088)+(17.004), (I-338)+(1.088)+(17.005), (I-338)+(1.088)+(17.006), (I-338)+(1.088)+(17.007), (I-338)+(1.088)+(17.008), (I-338)+(1.088)+(17.009), (I-338)+(1.088)+(17.010), (I-338)+(1.088)+(17.011), (I-338)+(1.088)+(17.012), (I-338)+(1.088)+(18.001), (I-338)+(1.089)+(1.090), (I-338)+(1.089)+(1.091), (I-338)+(1.089)+(1.092), (I-338)+(1.089)+(2.001), (I-338)+(1.089)+(2.002), (I-338)+(1.089)+(2.003), (I-338)+(1.089)+(2.004), (I-338)+(1.089)+(2.005), (I-338)+(1.089)+(2.006), (I-338)+(1.089)+(2.007), (I-338)+(1.089)+(2.008), (I-338)+(1.089)+(2.009), (I-338)+(1.089)+(2.010), (I-338)+(1.089)+(2.011), (I-338)+(1.089)+(2.012), (I-338)+(1.089)+(2.013), (I-338)+(1.089)+(2.014), (I-338)+(1.089)+(2.015), (I-338)+(1.089)+(2.016), (I-338)+(1.089)+(2.017), (I-338)+(1.089)+(2.018), (I-338)+(1.089)+(2.019), (I-338)+(1.089)+(2.020), (I-338)+(1.089)+(2.021), (I-338)+(1.089)+(2.022), (I-338)+(1.089)+(2.023), (I-338)+(1.089)+(2.024), (I-338)+(1.089)+(2.025), (I-338)+(1.089)+(2.026), (I-338)+(1.089)+(2.027), (I-338)+(1.089)+(2.028), (I-338)+(1.089)+(2.029), (I-338)+(1.089)+(2.030), (I-338)+(1.089)+(2.031), (I-338)+(1.089)+(2.032), (I-338)+(1.089)+(2.033), (I-338)+(1.089)+(2.034), (I-338)+(1.089)+(2.035), (I-338)+(1.089)+(2.036), (I-338)+(1.089)+(2.037), (I-338)+(1.089)+(2.038), (I-338)+(1.089)+(2.039), (I-338)+(1.089)+(2.040), (I-338)+(1.089)+(2.041), (I-338)+(1.089)+(2.042), (I-338)+(1.089)+(2.043), (I-338)+(1.089)+(2.044), (I-338)+(1.089)+(2.045), (I-338)+(1.089)+(2.046), (I-338)+(1.089)+(2.047), (I-338)+(1.089)+(2.048), (I-338)+(1.089)+(2.049), (I-338)+(1.089)+(2.050), (I-338)+(1.089)+(2.051), (I-338)+(1.089)+(2.052), (I-338)+(1.089)+(2.053), (I-338)+(1.089)+(2.054), (I-338)+(1.089)+(2.055), (I-338)+(1.089)+(2.056), (I-338)+(1.089)+(2.057), (I-338)+(1.089)+(2.058), (I-338)+(1.089)+(2.059), (I-338)+(1.089)+(3.001), (I-338)+(1.089)+(3.002), (I-338)+(1.089)+(3.003), (I-338)+(1.089)+(3.004), (I-338)+(1.089)+(3.005), (I-338)+(1.089)+(3.006), (I-338)+(1.089)+(3.007), (I-338)+(1.089)+(3.008), (I-338)+(1.089)+(3.009), (I-338)+(1.089)+(3.010), (I-338)+(1.089)+(3.011), (I-338)+(1.089)+(3.012), (I-338)+(1.089)+(3.013), (I-338)+(1.089)+(3.014), (I-338)+(1.089)+(3.015), (I-338)+(1.089)+(3.016), (I-338)+(1.089)+(3.017), (I-338)+(1.089)+(3.018), (I-338)+(1.089)+(3.019), (I-338)+(1.089)+(3.020), (I-338)+(1.089)+(3.021), (I-338)+(1.089)+(3.022), (I-338)+(1.089)+(3.023), (I-338)+(1.089)+(3.024), (I-338)+(1.089)+(3.025), (I-338)+(1.089)+(3.026), (I-338)+(1.089)+(3.027), (I-338)+(1.089)+(3.028), (I-338)+(1.089)+(3.029), (I-338)+(1.089)+(3.030), (I-338)+(1.089)+(3.031), (I-338)+(1.089)+(5.001), (I-338)+(1.089)+(5.002), (I-338)+(1.089)+(5.003), (I-338)+(1.089)+(5.004), (I-338)+(1.089)+(5.005), (I-338)+(1.089)+(5.006), (I-338)+(1.089)+(5.007), (I-338)+(1.089)+(5.008), (I-338)+(1.089)+(5.009), (I-338)+(1.089)+(5.010), (I-338)+(1.089)+(5.011), (I-338)+(1.089)+(5.012), (I-338)+(1.089)+(5.013), (I-338)+(1.089)+(5.014), (I-338)+(1.089)+(5.015), (I-338)+(1.089)+(5.016), (I-338)+(1.089)+(5.017), (I-338)+(1.089)+(5.018), (I-338)+(1.089)+(5.019), (I-338)+(1.089)+(5.020), (I-338)+(1.089)+(5.021), (I-338)+(1.089)+(5.022), (I-338)+(1.089)+(5.023), (I-338)+(1.089)+(6.001), (I-338)+(1.089)+(6.002), (I-338)+(1.089)+(6.003), (I-338)+(1.089)+(6.004), (I-338)+(1.089)+(7.001), (I-338)+(1.089)+(7.002), (I-338)+(1.089)+(7.003), (I-338)+(1.089)+(7.004), (I-338)+(1.089)+(7.005), (I-338)+(1.089)+(7.006), (I-338)+(1.089)+(9.001), (I-338)+(1.089)+(9.002), (I-338)+(1.089)+(9.003), (I-338)+(1.089)+(9.004), (I-338)+(1.089)+(9.005), (I-338)+(1.089)+(9.006), (I-338)+(1.089)+(9.007), (I-338)+(1.089)+(9.008), (I-338)+(1.089)+(9.009), (I-338)+(1.089)+(14.001), (I-338)+(1.089)+(14.002), (I-338)+(1.089)+(15.008), (I-338)+(1.089)+(15.011), (I-338)+(1.089)+(15.012), (I-338)+(1.089)+(15.016), (I-338)+(1.089)+(15.025), (I-338)+(1.089)+(15.027), (I-338)+(1.089)+(15.047), (I-338)+(1.089)+(15.063), (I-338)+(1.089)+(15.064), (I-338)+(1.089)+(16.001), (I-338)+(1.089)+(16.002), (I-338)+(1.089)+(16.003), (I-338)+(1.089)+(16.004), (I-338)+(1.089)+(16.005), (I-338)+(1.089)+(16.006), (I-338)+(1.089)+(16.007), (I-338)+(1.089)+(16.008), (I-338)+(1.089)+(17.001), (I-338)+(1.089)+(17.002), (I-338)+(1.089)+(17.003), (I-338)+(1.089)+(17.004), (I-338)+(1.089)+(17.005), (I-338)+(1.089)+(17.006), (I-338)+(1.089)+(17.007), (I-338)+(1.089)+(17.008), (I-338)+(1.089)+(17.009), (I-338)+(1.089)+(17.010), (I-338)+(1.089)+(17.011), (I-338)+(1.089)+(17.012), (I-338)+(1.089)+(18.001), (I-338)+(1.090)+(1.091), (I-338)+(1.090)+(1.092), (I-338)+(1.090)+(2.001), (I-338)+(1.090)+(2.002), (I-338)+(1.090)+(2.003), (I-338)+(1.090)+(2.004), (I-338)+(1.090)+(2.005), (I-338)+(1.090)+(2.006), (I-338)+(1.090)+(2.007), (I-338)+(1.090)+(2.008), (I-338)+(1.090)+(2.009), (I-338)+(1.090)+(2.010), (I-338)+(1.090)+(2.011), (I-338)+(1.090)+(2.012), (I-338)+(1.090)+(2.013), (I-338)+(1.090)+(2.014), (I-338)+(1.090)+(2.015), (I-338)+(1.090)+(2.016), (I-338)+(1.090)+(2.017), (I-338)+(1.090)+(2.018), (I-338)+(1.090)+(2.019), (I-338)+(1.090)+(2.020), (I-338)+(1.090)+(2.021), (I-338)+(1.090)+(2.022), (I-338)+(1.090)+(2.023), (I-338)+(1.090)+(2.024), (I-338)+(1.090)+(2.025), (I-338)+(1.090)+(2.026), (I-338)+(1.090)+(2.027), (I-338)+(1.090)+(2.028), (I-338)+(1.090)+(2.029), (I-338)+(1.090)+(2.030), (I-338)+(1.090)+(2.031), (I-338)+(1.090)+(2.032), (I-338)+(1.090)+(2.033), (I-338)+(1.090)+(2.034), (I-338)+(1.090)+(2.035), (I-338)+(1.090)+(2.036), (I-338)+(1.090)+(2.037), (I-338)+(1.090)+(2.038), (I-338)+(1.090)+(2.039), (I-338)+(1.090)+(2.040), (I-338)+(1.090)+(2.041), (I-338)+(1.090)+(2.042), (I-338)+(1.090)+(2.043), (I-338)+(1.090)+(2.044), (I-338)+(1.090)+(2.045), (I-338)+(1.090)+(2.046), (I-338)+(1.090)+(2.047), (I-338)+(1.090)+(2.048), (I-338)+(1.090)+(2.049), (I-338)+(1.090)+(2.050), (I-338)+(1.090)+(2.051), (I-338)+(1.090)+(2.052), (I-338)+(1.090)+(2.053), (I-338)+(1.090)+(2.054), (I-338)+(1.090)+(2.055), (I-338)+(1.090)+(2.056), (I-338)+(1.090)+(2.057), (I-338)+(1.090)+(2.058), (I-338)+(1.090)+(2.059), (I-338)+(1.090)+(3.001), (I-338)+(1.090)+(3.002), (I-338)+(1.090)+(3.003), (I-338)+(1.090)+(3.004), (I-338)+(1.090)+(3.005), (I-338)+(1.090)+(3.006), (I-338)+(1.090)+(3.007), (I-338)+(1.090)+(3.008), (I-338)+(1.090)+(3.009), (I-338)+(1.090)+(3.010), (I-338)+(1.090)+(3.011), (I-338)+(1.090)+(3.012), (I-338)+(1.090)+(3.013), (I-338)+(1.090)+(3.014), (I-338)+(1.090)+(3.015), (I-338)+(1.090)+(3.016), (I-338)+(1.090)+(3.017), (I-338)+(1.090)+(3.018), (I-338)+(1.090)+(3.019), (I-338)+(1.090)+(3.020), (I-338)+(1.090)+(3.021), (I-338)+(1.090)+(3.022), (I-338)+(1.090)+(3.023), (I-338)+(1.090)+(3.024), (I-338)+(1.090)+(3.025), (I-338)+(1.090)+(3.026), (I-338)+(1.090)+(3.027), (I-338)+(1.090)+(3.028), (I-338)+(1.090)+(3.029), (I-338)+(1.090)+(3.030), (I-338)+(1.090)+(3.031), (I-338)+(1.090)+(5.001), (I-338)+(1.090)+(5.002), (I-338)+(1.090)+(5.003), (I-338)+(1.090)+(5.004), (I-338)+(1.090)+(5.005), (I-338)+(1.090)+(5.006), (I-338)+(1.090)+(5.007), (I-338)+(1.090)+(5.008), (I-338)+(1.090)+(5.009), (I-338)+(1.090)+(5.010), (I-338)+(1.090)+(5.011), (I-338)+(1.090)+(5.012), (I-338)+(1.090)+(5.013), (I-338)+(1.090)+(5.014), (I-338)+(1.090)+(5.015), (I-338)+(1.090)+(5.016), (I-338)+(1.090)+(5.017), (I-338)+(1.090)+(5.018), (I-338)+(1.090)+(5.019), (I-338)+(1.090)+(5.020), (I-338)+(1.090)+(5.021), (I-338)+(1.090)+(5.022), (I-338)+(1.090)+(5.023), (I-338)+(1.090)+(6.001), (I-338)+(1.090)+(6.002), (I-338)+(1.090)+(6.003), (I-338)+(1.090)+(6.004), (I-338)+(1.090)+(7.001), (I-338)+(1.090)+(7.002), (I-338)+(1.090)+(7.003), (I-338)+(1.090)+(7.004), (I-338)+(1.090)+(7.005), (I-338)+(1.090)+(7.006), (I-338)+(1.090)+(9.001), (I-338)+(1.090)+(9.002), (I-338)+(1.090)+(9.003), (I-338)+(1.090)+(9.004), (I-338)+(1.090)+(9.005), (I-338)+(1.090)+(9.006), (I-338)+(1.090)+(9.007), (I-338)+(1.090)+(9.008), (I-338)+(1.090)+(9.009), (I-338)+(1.090)+(14.001), (I-338)+(1.090)+(14.002), (I-338)+(1.090)+(15.008), (I-338)+(1.090)+(15.011), (I-338)+(1.090)+(15.012), (I-338)+(1.090)+(15.016), (I-338)+(1.090)+(15.025), (I-338)+(1.090)+(15.027), (I-338)+(1.090)+(15.047), (I-338)+(1.090)+(15.063), (I-338)+(1.090)+(15.064), (I-338)+(1.090)+(16.001), (I-338)+(1.090)+(16.002), (I-338)+(1.090)+(16.003), (I-338)+(1.090)+(16.004), (I-338)+(1.090)+(16.005), (I-338)+(1.090)+(16.006), (I-338)+(1.090)+(16.007), (I-338)+(1.090)+(16.008), (I-338)+(1.090)+(17.001), (I-338)+(1.090)+(17.002), (I-338)+(1.090)+(17.003), (I-338)+(1.090)+(17.004), (I-338)+(1.090)+(17.005), (I-338)+(1.090)+(17.006), (I-338)+(1.090)+(17.007), (I-338)+(1.090)+(17.008), (I-338)+(1.090)+(17.009), (I-338)+(1.090)+(17.010), (I-338)+(1.090)+(17.011), (I-338)+(1.090)+(17.012), (I-338)+(1.090)+(18.001), (I-338)+(1.091)+(1.092), (I-338)+(1.091)+(2.001), (I-338)+(1.091)+(2.002), (I-338)+(1.091)+(2.003), (I-338)+(1.091)+(2.004), (I-338)+(1.091)+(2.005), (I-338)+(1.091)+(2.006), (I-338)+(1.091)+(2.007), (I-338)+(1.091)+(2.008), (I-338)+(1.091)+(2.009), (I-338)+(1.091)+(2.010), (I-338)+(1.091)+(2.011), (I-338)+(1.091)+(2.012), (I-338)+(1.091)+(2.013), (I-338)+(1.091)+(2.014), (I-338)+(1.091)+(2.015), (I-338)+(1.091)+(2.016), (I-338)+(1.091)+(2.017), (I-338)+(1.091)+(2.018), (I-338)+(1.091)+(2.019), (I-338)+(1.091)+(2.020), (I-338)+(1.091)+(2.021), (I-338)+(1.091)+(2.022), (I-338)+(1.091)+(2.023), (I-338)+(1.091)+(2.024), (I-338)+(1.091)+(2.025), (I-338)+(1.091)+(2.026), (I-338)+(1.091)+(2.027), (I-338)+(1.091)+(2.028), (I-338)+(1.091)+(2.029), (I-338)+(1.091)+(2.030), (I-338)+(1.091)+(2.031), (I-338)+(1.091)+(2.032), (I-338)+(1.091)+(2.033), (I-338)+(1.091)+(2.034), (I-338)+(1.091)+(2.035), (I-338)+(1.091)+(2.036), (I-338)+(1.091)+(2.037), (I-338)+(1.091)+(2.038), (I-338)+(1.091)+(2.039), (I-338)+(1.091)+(2.040), (I-338)+(1.091)+(2.041), (I-338)+(1.091)+(2.042), (I-338)+(1.091)+(2.043), (I-338)+(1.091)+(2.044), (I-338)+(1.091)+(2.045), (I-338)+(1.091)+(2.046), (I-338)+(1.091)+(2.047), (I-338)+(1.091)+(2.048), (I-338)+(1.091)+(2.049), (I-338)+(1.091)+(2.050), (I-338)+(1.091)+(2.051), (I-338)+(1.091)+(2.052), (I-338)+(1.091)+(2.053), (I-338)+(1.091)+(2.054), (I-338)+(1.091)+(2.055), (I-338)+(1.091)+(2.056), (I-338)+(1.091)+(2.057), (I-338)+(1.091)+(2.058), (I-338)+(1.091)+(2.059), (I-338)+(1.091)+(3.001), (I-338)+(1.091)+(3.002), (I-338)+(1.091)+(3.003), (I-338)+(1.091)+(3.004), (I-338)+(1.091)+(3.005), (I-338)+(1.091)+(3.006), (I-338)+(1.091)+(3.007), (I-338)+(1.091)+(3.008), (I-338)+(1.091)+(3.009), (I-338)+(1.091)+(3.010), (I-338)+(1.091)+(3.011), (I-338)+(1.091)+(3.012), (I-338)+(1.091)+(3.013), (I-338)+(1.091)+(3.014), (I-338)+(1.091)+(3.015), (I-338)+(1.091)+(3.016), (I-338)+(1.091)+(3.017), (I-338)+(1.091)+(3.018), (I-338)+(1.091)+(3.019), (I-338)+(1.091)+(3.020), (I-338)+(1.091)+(3.021), (I-338)+(1.091)+(3.022), (I-338)+(1.091)+(3.023), (I-338)+(1.091)+(3.024), (I-338)+(1.091)+(3.025), (I-338)+(1.091)+(3.026), (I-338)+(1.091)+(3.027), (I-338)+(1.091)+(3.028), (I-338)+(1.091)+(3.029), (I-338)+(1.091)+(3.030), (I-338)+(1.091)+(3.031), (I-338)+(1.091)+(5.001), (I-338)+(1.091)+(5.002), (I-338)+(1.091)+(5.003), (I-338)+(1.091)+(5.004), (I-338)+(1.091)+(5.005), (I-338)+(1.091)+(5.006), (I-338)+(1.091)+(5.007), (I-338)+(1.091)+(5.008), (I-338)+(1.091)+(5.009), (I-338)+(1.091)+(5.010), (I-338)+(1.091)+(5.011), (I-338)+(1.091)+(5.012), (I-338)+(1.091)+(5.013), (I-338)+(1.091)+(5.014), (I-338)+(1.091)+(5.015), (I-338)+(1.091)+(5.016), (I-338)+(1.091)+(5.017), (I-338)+(1.091)+(5.018), (I-338)+(1.091)+(5.019), (I-338)+(1.091)+(5.020), (I-338)+(1.091)+(5.021), (I-338)+(1.091)+(5.022), (I-338)+(1.091)+(5.023), (I-338)+(1.091)+(6.001), (I-338)+(1.091)+(6.002), (I-338)+(1.091)+(6.003), (I-338)+(1.091)+(6.004), (I-338)+(1.091)+(7.001), (I-338)+(1.091)+(7.002), (I-338)+(1.091)+(7.003), (I-338)+(1.091)+(7.004), (I-338)+(1.091)+(7.005), (I-338)+(1.091)+(7.006), (I-338)+(1.091)+(9.001), (I-338)+(1.091)+(9.002), (I-338)+(1.091)+(9.003), (I-338)+(1.091)+(9.004), (I-338)+(1.091)+(9.005), (I-338)+(1.091)+(9.006), (I-338)+(1.091)+(9.007), (I-338)+(1.091)+(9.008), (I-338)+(1.091)+(9.009), (I-338)+(1.091)+(14.001), (I-338)+(1.091)+(14.002), (I-338)+(1.091)+(15.008), (I-338)+(1.091)+(15.011), (I-338)+(1.091)+(15.012), (I-338)+(1.091)+(15.016), (I-338)+(1.091)+(15.025), (I-338)+(1.091)+(15.027), (I-338)+(1.091)+(15.047), (I-338)+(1.091)+(15.063), (I-338)+(1.091)+(15.064), (I-338)+(1.091)+(16.001), (I-338)+(1.091)+(16.002), (I-338)+(1.091)+(16.003), (I-338)+(1.091)+(16.004), (I-338)+(1.091)+(16.005), (I-338)+(1.091)+(16.006), (I-338)+(1.091)+(16.007), (I-338)+(1.091)+(16.008), (I-338)+(1.091)+(17.001), (I-338)+(1.091)+(17.002), (I-338)+(1.091)+(17.003), (I-338)+(1.091)+(17.004), (I-338)+(1.091)+(17.005), (I-338)+(1.091)+(17.006), (I-338)+(1.091)+(17.007), (I-338)+(1.091)+(17.008), (I-338)+(1.091)+(17.009), (I-338)+(1.091)+(17.010), (I-338)+(1.091)+(17.011), (I-338)+(1.091)+(17.012), (I-338)+(1.091)+(18.001), (I-338)+(1.092)+(2.001), (I-338)+(1.092)+(2.002), (I-338)+(1.092)+(2.003), (I-338)+(1.092)+(2.004), (I-338)+(1.092)+(2.005), (I-338)+(1.092)+(2.006), (I-338)+(1.092)+(2.007), (I-338)+(1.092)+(2.008), (I-338)+(1.092)+(2.009), (I-338)+(1.092)+(2.010), (I-338)+(1.092)+(2.011), (I-338)+(1.092)+(2.012), (I-338)+(1.092)+(2.013), (I-338)+(1.092)+(2.014), (I-338)+(1.092)+(2.015), (I-338)+(1.092)+(2.016), (I-338)+(1.092)+(2.017), (I-338)+(1.092)+(2.018), (I-338)+(1.092)+(2.019), (I-338)+(1.092)+(2.020), (I-338)+(1.092)+(2.021), (I-338)+(1.092)+(2.022), (I-338)+(1.092)+(2.023), (I-338)+(1.092)+(2.024), (I-338)+(1.092)+(2.025), (I-338)+(1.092)+(2.026), (I-338)+(1.092)+(2.027), (I-338)+(1.092)+(2.028), (I-338)+(1.092)+(2.029), (I-338)+(1.092)+(2.030), (I-338)+(1.092)+(2.031), (I-338)+(1.092)+(2.032), (I-338)+(1.092)+(2.033), (I-338)+(1.092)+(2.034), (I-338)+(1.092)+(2.035), (I-338)+(1.092)+(2.036), (I-338)+(1.092)+(2.037), (I-338)+(1.092)+(2.038), (I-338)+(1.092)+(2.039), (I-338)+(1.092)+(2.040), (I-338)+(1.092)+(2.041), (I-338)+(1.092)+(2.042), (I-338)+(1.092)+(2.043), (I-338)+(1.092)+(2.044), (I-338)+(1.092)+(2.045), (I-338)+(1.092)+(2.046), (I-338)+(1.092)+(2.047), (I-338)+(1.092)+(2.048), (I-338)+(1.092)+(2.049), (I-338)+(1.092)+(2.050), (I-338)+(1.092)+(2.051), (I-338)+(1.092)+(2.052), (I-338)+(1.092)+(2.053), (I-338)+(1.092)+(2.054), (I-338)+(1.092)+(2.055), (I-338)+(1.092)+(2.056), (I-338)+(1.092)+(2.057), (I-338)+(1.092)+(2.058), (I-338)+(1.092)+(2.059), (I-338)+(1.092)+(3.001), (I-338)+(1.092)+(3.002), (I-338)+(1.092)+(3.003), (I-338)+(1.092)+(3.004), (I-338)+(1.092)+(3.005), (I-338)+(1.092)+(3.006), (I-338)+(1.092)+(3.007), (I-338)+(1.092)+(3.008), (I-338)+(1.092)+(3.009), (I-338)+(1.092)+(3.010), (I-338)+(1.092)+(3.011), (I-338)+(1.092)+(3.012), (I-338)+(1.092)+(3.013), (I-338)+(1.092)+(3.014), (I-338)+(1.092)+(3.015), (I-338)+(1.092)+(3.016), (I-338)+(1.092)+(3.017), (I-338)+(1.092)+(3.018), (I-338)+(1.092)+(3.019), (I-338)+(1.092)+(3.020), (I-338)+(1.092)+(3.021), (I-338)+(1.092)+(3.022), (I-338)+(1.092)+(3.023), (I-338)+(1.092)+(3.024), (I-338)+(1.092)+(3.025), (I-338)+(1.092)+(3.026), (I-338)+(1.092)+(3.027), (I-338)+(1.092)+(3.028), (I-338)+(1.092)+(3.029), (I-338)+(1.092)+(3.030), (I-338)+(1.092)+(3.031), (I-338)+(1.092)+(5.001), (I-338)+(1.092)+(5.002), (I-338)+(1.092)+(5.003), (I-338)+(1.092)+(5.004), (I-338)+(1.092)+(5.005), (I-338)+(1.092)+(5.006), (I-338)+(1.092)+(5.007), (I-338)+(1.092)+(5.008), (I-338)+(1.092)+(5.009), (I-338)+(1.092)+(5.010), (I-338)+(1.092)+(5.011), (I-338)+(1.092)+(5.012), (I-338)+(1.092)+(5.013), (I-338)+(1.092)+(5.014), (I-338)+(1.092)+(5.015), (I-338)+(1.092)+(5.016), (I-338)+(1.092)+(5.017), (I-338)+(1.092)+(5.018), (I-338)+(1.092)+(5.019), (I-338)+(1.092)+(5.020), (I-338)+(1.092)+(5.021), (I-338)+(1.092)+(5.022), (I-338)+(1.092)+(5.023), (I-338)+(1.092)+(6.001), (I-338)+(1.092)+(6.002), (I-338)+(1.092)+(6.003), (I-338)+(1.092)+(6.004), (I-338)+(1.092)+(7.001), (I-338)+(1.092)+(7.002), (I-338)+(1.092)+(7.003), (I-338)+(1.092)+(7.004), (I-338)+(1.092)+(7.005), (I-338)+(1.092)+(7.006), (I-338)+(1.092)+(9.001), (I-338)+(1.092)+(9.002), (I-338)+(1.092)+(9.003), (I-338)+(1.092)+(9.004), (I-338)+(1.092)+(9.005), (I-338)+(1.092)+(9.006), (I-338)+(1.092)+(9.007), (I-338)+(1.092)+(9.008), (I-338)+(1.092)+(9.009), (I-338)+(1.092)+(14.001), (I-338)+(1.092)+(14.002), (I-338)+(1.092)+(15.008), (I-338)+(1.092)+(15.011), (I-338)+(1.092)+(15.012), (I-338)+(1.092)+(15.016), (I-338)+(1.092)+(15.025), (I-338)+(1.092)+(15.027), (I-338)+(1.092)+(15.047), (I-338)+(1.092)+(15.063), (I-338)+(1.092)+(15.064), (I-338)+(1.092)+(16.001), (I-338)+(1.092)+(16.002), (I-338)+(1.092)+(16.003), (I-338)+(1.092)+(16.004), (I-338)+(1.092)+(16.005), (I-338)+(1.092)+(16.006), (I-338)+(1.092)+(16.007), (I-338)+(1.092)+(16.008), (I-338)+(1.092)+(17.001), (I-338)+(1.092)+(17.002), (I-338)+(1.092)+(17.003), (I-338)+(1.092)+(17.004), (I-338)+(1.092)+(17.005), (I-338)+(1.092)+(17.006), (I-338)+(1.092)+(17.007), (I-338)+(1.092)+(17.008), (I-338)+(1.092)+(17.009), (I-338)+(1.092)+(17.010), (I-338)+(1.092)+(17.011), (I-338)+(1.092)+(17.012), (I-338)+(1.092)+(18.001), (I-338)+(2.001)+(3.001), (I-338)+(2.001)+(3.002), (I-338)+(2.001)+(3.003), (I-338)+(2.001)+(3.004), (I-338)+(2.001)+(3.005), (I-338)+(2.001)+(3.006), (I-338)+(2.001)+(3.007), (I-338)+(2.001)+(3.008), (I-338)+(2.001)+(3.009), (I-338)+(2.001)+(3.010), (I-338)+(2.001)+(3.011), (I-338)+(2.001)+(3.012), (I-338)+(2.001)+(3.013), (I-338)+(2.001)+(3.014), (I-338)+(2.001)+(3.015), (I-338)+(2.001)+(3.016), (I-338)+(2.001)+(3.017), (I-338)+(2.001)+(3.018), (I-338)+(2.001)+(3.019), (I-338)+(2.001)+(3.020), (I-338)+(2.001)+(3.021), (I-338)+(2.001)+(3.022), (I-338)+(2.001)+(3.023), (I-338)+(2.001)+(3.024), (I-338)+(2.001)+(3.025), (I-338)+(2.001)+(3.026), (I-338)+(2.001)+(3.027), (I-338)+(2.001)+(3.028), (I-338)+(2.001)+(3.029), (I-338)+(2.001)+(3.030), (I-338)+(2.001)+(3.031), (I-338)+(2.001)+(5.001), (I-338)+(2.001)+(5.002), (I-338)+(2.001)+(5.003), (I-338)+(2.001)+(5.004), (I-338)+(2.001)+(5.005), (I-338)+(2.001)+(5.006), (I-338)+(2.001)+(5.007), (I-338)+(2.001)+(5.008), (I-338)+(2.001)+(5.009), (I-338)+(2.001)+(5.010), (I-338)+(2.001)+(5.011), (I-338)+(2.001)+(5.012), (I-338)+(2.001)+(5.013), (I-338)+(2.001)+(5.014), (I-338)+(2.001)+(5.015), (I-338)+(2.001)+(5.016), (I-338)+(2.001)+(5.017), (I-338)+(2.001)+(5.018), (I-338)+(2.001)+(5.019), (I-338)+(2.001)+(5.020), (I-338)+(2.001)+(5.021), (I-338)+(2.001)+(5.022), (I-338)+(2.001)+(5.023), (I-338)+(2.001)+(6.001), (I-338)+(2.001)+(6.002), (I-338)+(2.001)+(6.003), (I-338)+(2.001)+(6.004), (I-338)+(2.001)+(7.001), (I-338)+(2.001)+(7.002), (I-338)+(2.001)+(7.003), (I-338)+(2.001)+(7.004), (I-338)+(2.001)+(7.005), (I-338)+(2.001)+(7.006), (I-338)+(2.001)+(9.001), (I-338)+(2.001)+(9.002), (I-338)+(2.001)+(9.003), (I-338)+(2.001)+(9.004), (I-338)+(2.001)+(9.005), (I-338)+(2.001)+(9.006), (I-338)+(2.001)+(9.007), (I-338)+(2.001)+(9.008), (I-338)+(2.001)+(9.009), (I-338)+(2.001)+(14.001), (I-338)+(2.001)+(14.002), (I-338)+(2.001)+(15.008), (I-338)+(2.001)+(15.011), (I-338)+(2.001)+(15.012), (I-338)+(2.001)+(15.016), (I-338)+(2.001)+(15.025), (I-338)+(2.001)+(15.027), (I-338)+(2.001)+(15.047), (I-338)+(2.001)+(15.063), (I-338)+(2.001)+(15.064), (I-338)+(2.001)+(16.001), (I-338)+(2.001)+(16.002), (I-338)+(2.001)+(16.003), (I-338)+(2.001)+(16.004), (I-338)+(2.001)+(16.005), (I-338)+(2.001)+(16.006), (I-338)+(2.001)+(16.007), (I-338)+(2.001)+(16.008), (I-338)+(2.001)+(17.001), (I-338)+(2.001)+(17.002), (I-338)+(2.001)+(17.003), (I-338)+(2.001)+(17.004), (I-338)+(2.001)+(17.005), (I-338)+(2.001)+(17.006), (I-338)+(2.001)+(17.007), (I-338)+(2.001)+(17.008), (I-338)+(2.001)+(17.009), (I-338)+(2.001)+(17.010), (I-338)+(2.001)+(17.011), (I-338)+(2.001)+(17.012), (I-338)+(2.001)+(18.001), (I-338)+(2.002)+(3.001), (I-338)+(2.002)+(3.002), (I-338)+(2.002)+(3.003), (I-338)+(2.002)+(3.004), (I-338)+(2.002)+(3.005), (I-338)+(2.002)+(3.006), (I-338)+(2.002)+(3.007), (I-338)+(2.002)+(3.008), (I-338)+(2.002)+(3.009), (I-338)+(2.002)+(3.010), (I-338)+(2.002)+(3.011), (I-338)+(2.002)+(3.012), (I-338)+(2.002)+(3.013), (I-338)+(2.002)+(3.014), (I-338)+(2.002)+(3.015), (I-338)+(2.002)+(3.016), (I-338)+(2.002)+(3.017), (I-338)+(2.002)+(3.018), (I-338)+(2.002)+(3.019), (I-338)+(2.002)+(3.020), (I-338)+(2.002)+(3.021), (I-338)+(2.002)+(3.022), (I-338)+(2.002)+(3.023), (I-338)+(2.002)+(3.024), (I-338)+(2.002)+(3.025), (I-338)+(2.002)+(3.026), (I-338)+(2.002)+(3.027), (I-338)+(2.002)+(3.028), (I-338)+(2.002)+(3.029), (I-338)+(2.002)+(3.030), (I-338)+(2.002)+(3.031), (I-338)+(2.002)+(5.001), (I-338)+(2.002)+(5.002), (I-338)+(2.002)+(5.003), (I-338)+(2.002)+(5.004), (I-338)+(2.002)+(5.005), (I-338)+(2.002)+(5.006), (I-338)+(2.002)+(5.007), (I-338)+(2.002)+(5.008), (I-338)+(2.002)+(5.009), (I-338)+(2.002)+(5.010), (I-338)+(2.002)+(5.011), (I-338)+(2.002)+(5.012), (I-338)+(2.002)+(5.013), (I-338)+(2.002)+(5.014), (I-338)+(2.002)+(5.015), (I-338)+(2.002)+(5.016), (I-338)+(2.002)+(5.017), (I-338)+(2.002)+(5.018), (I-338)+(2.002)+(5.019), (I-338)+(2.002)+(5.020), (I-338)+(2.002)+(5.021), (I-338)+(2.002)+(5.022), (I-338)+(2.002)+(5.023), (I-338)+(2.002)+(6.001), (I-338)+(2.002)+(6.002), (I-338)+(2.002)+(6.003), (I-338)+(2.002)+(6.004), (I-338)+(2.002)+(7.001), (I-338)+(2.002)+(7.002), (I-338)+(2.002)+(7.003), (I-338)+(2.002)+(7.004), (I-338)+(2.002)+(7.005), (I-338)+(2.002)+(7.006), (I-338)+(2.002)+(9.001), (I-338)+(2.002)+(9.002), (I-338)+(2.002)+(9.003), (I-338)+(2.002)+(9.004), (I-338)+(2.002)+(9.005), (I-338)+(2.002)+(9.006), (I-338)+(2.002)+(9.007), (I-338)+(2.002)+(9.008), (I-338)+(2.002)+(9.009), (I-338)+(2.002)+(14.001), (I-338)+(2.002)+(14.002), (I-338)+(2.002)+(15.008), (I-338)+(2.002)+(15.011), (I-338)+(2.002)+(15.012), (I-338)+(2.002)+(15.016), (I-338)+(2.002)+(15.025), (I-338)+(2.002)+(15.027), (I-338)+(2.002)+(15.047), (I-338)+(2.002)+(15.063), (I-338)+(2.002)+(15.064), (I-338)+(2.002)+(16.001), (I-338)+(2.002)+(16.002), (I-338)+(2.002)+(16.003), (I-338)+(2.002)+(16.004), (I-338)+(2.002)+(16.005), (I-338)+(2.002)+(16.006), (I-338)+(2.002)+(16.007), (I-338)+(2.002)+(16.008), (I-338)+(2.002)+(17.001), (I-338)+(2.002)+(17.002), (I-338)+(2.002)+(17.003), (I-338)+(2.002)+(17.004), (I-338)+(2.002)+(17.005), (I-338)+(2.002)+(17.006), (I-338)+(2.002)+(17.007), (I-338)+(2.002)+(17.008), (I-338)+(2.002)+(17.009), (I-338)+(2.002)+(17.010), (I-338)+(2.002)+(17.011), (I-338)+(2.002)+(17.012), (I-338)+(2.002)+(18.001),
(I-338)+(2.003)+(3.001), (I-338)+(2.003)+(3.002), (I-338)+(2.003)+(3.003), (I-338)+(2.003)+(3.004), (I-338)+(2.003)+(3.005), (I-338)+(2.003)+(3.006), (I-338)+(2.003)+(3.007), (I-338)+(2.003)+(3.008), (I-338)+(2.003)+(3.009), (I-338)+(2.003)+(3.010), (I-338)+(2.003)+(3.011), (I-338)+(2.003)+(3.012), (I-338)+(2.003)+(3.013), (I-338)+(2.003)+(3.014), (I-338)+(2.003)+(3.015), (I-338)+(2.003)+(3.016), (I-338)+(2.003)+(3.017), (I-338)+(2.003)+(3.018), (I-338)+(2.003)+(3.019), (I-338)+(2.003)+(3.020), (I-338)+(2.003)+(3.021), (I-338)+(2.003)+(3.022), (I-338)+(2.003)+(3.023), (I-338)+(2.003)+(3.024), (I-338)+(2.003)+(3.025), (I-338)+(2.003)+(3.026), (I-338)+(2.003)+(3.027), (I-338)+(2.003)+(3.028), (I-338)+(2.003)+(3.029), (I-338)+(2.003)+(3.030), (I-338)+(2.003)+(3.031), (I-338)+(2.003)+(5.001), (I-338)+(2.003)+(5.002), (I-338)+(2.003)+(5.003), (I-338)+(2.003)+(5.004), (I-338)+(2.003)+(5.005), (I-338)+(2.003)+(5.006), (I-338)+(2.003)+(5.007), (I-338)+(2.003)+(5.008), (I-338)+(2.003)+(5.009), (I-338)+(2.003)+(5.010), (I-338)+(2.003)+(5.011), (I-338)+(2.003)+(5.012), (I-338)+(2.003)+(5.013), (I-338)+(2.003)+(5.014), (I-338)+(2.003)+(5.015), (I-338)+(2.003)+(5.016), (I-338)+(2.003)+(5.017), (I-338)+(2.003)+(5.018), (I-338)+(2.003)+(5.019), (I-338)+(2.003)+(5.020), (I-338)+(2.003)+(5.021), (I-338)+(2.003)+(5.022), (I-338)+(2.003)+(5.023), (I-338)+(2.003)+(6.001), (I-338)+(2.003)+(6.002), (I-338)+(2.003)+(6.003), (I-338)+(2.003)+(6.004), (I-338)+(2.003)+(7.001), (I-338)+(2.003)+(7.002), (I-338)+(2.003)+(7.003), (I-338)+(2.003)+(7.004), (I-338)+(2.003)+(7.005), (I-338)+(2.003)+(7.006), (I-338)+(2.003)+(9.001), (I-338)+(2.003)+(9.002), (I-338)+(2.003)+(9.003), (I-338)+(2.003)+(9.004), (I-338)+(2.003)+(9.005), (I-338)+(2.003)+(9.006), (I-338)+(2.003)+(9.007), (I-338)+(2.003)+(9.008), (I-338)+(2.003)+(9.009), (I-338)+(2.003)+(14.001), (I-338)+(2.003)+(14.002), (I-338)+(2.003)+(15.008), (I-338)+(2.003)+(15.011), (I-338)+(2.003)+(15.012), (I-338)+(2.003)+(15.016), (I-338)+(2.003)+(15.025), (I-338)+(2.003)+(15.027), (I-338)+(2.003)+(15.047), (I-338)+(2.003)+(15.063), (I-338)+(2.003)+(15.064), (I-338)+(2.003)+(16.001), (I-338)+(2.003)+(16.002), (I-338)+(2.003)+(16.003), (I-338)+(2.003)+(16.004), (I-338)+(2.003)+(16.005), (I-338)+(2.003)+(16.006), (I-338)+(2.003)+(16.007), (I-338)+(2.003)+(16.008), (I-338)+(2.003)+(17.001), (I-338)+(2.003)+(17.002), (I-338)+(2.003)+(17.003), (I-338)+(2.003)+(17.004), (I-338)+(2.003)+(17.005), (I-338)+(2.003)+(17.006), (I-338)+(2.003)+(17.007), (I-338)+(2.003)+(17.008), (I-338)+(2.003)+(17.009), (I-338)+(2.003)+(17.010), (I-338)+(2.003)+(17.011), (I-338)+(2.003)+(17.012), (I-338)+(2.003)+(18.001),
(I-338)+(2.004)+(3.001), (I-338)+(2.004)+(3.002), (I-338)+(2.004)+(3.003), (I-338)+(2.004)+(3.004), (I-338)+(2.004)+(3.005), (I-338)+(2.004)+(3.006), (I-338)+(2.004)+(3.007), (I-338)+(2.004)+(3.008), (I-338)+(2.004)+(3.009), (I-338)+(2.004)+(3.010), (I-338)+(2.004)+(3.011), (I-338)+(2.004)+(3.012), (I-338)+(2.004)+(3.013), (I-338)+(2.004)+(3.014), (I-338)+(2.004)+(3.015), (I-338)+(2.004)+(3.016), (I-338)+(2.004)+(3.017), (I-338)+(2.004)+(3.018), (I-338)+(2.004)+(3.019), (I-338)+(2.004)+(3.020), (I-338)+(2.004)+(3.021), (I-338)+(2.004)+(3.022), (I-338)+(2.004)+(3.023), (I-338)+(2.004)+(3.024), (I-338)+(2.004)+(3.025), (I-338)+(2.004)+(3.026), (I-338)+(2.004)+(3.027), (I-338)+(2.004)+(3.028), (I-338)+(2.004)+(3.029), (I-338)+(2.004)+(3.030), (I-338)+(2.004)+(3.031), (I-338)+(2.004)+(5.001), (I-338)+(2.004)+(5.002), (I-338)+(2.004)+(5.003), (I-338)+(2.004)+(5.004), (I-338)+(2.004)+(5.005), (I-338)+(2.004)+(5.006), (I-338)+(2.004)+(5.007), (I-338)+(2.004)+(5.008), (I-338)+(2.004)+(5.009), (I-338)+(2.004)+(5.010), (I-338)+(2.004)+(5.011), (I-338)+(2.004)+(5.012), (I-338)+(2.004)+(5.013), (I-338)+(2.004)+(5.014), (I-338)+(2.004)+(5.015), (I-338)+(2.004)+(5.016), (I-338)+(2.004)+(5.017), (I-338)+(2.004)+(5.018), (I-338)+(2.004)+(5.019), (I-338)+(2.004)+(5.020), (I-338)+(2.004)+(5.021), (I-338)+(2.004)+(5.022), (I-338)+(2.004)+(5.023), (I-338)+(2.004)+(6.001), (I-338)+(2.004)+(6.002), (I-338)+(2.004)+(6.003), (I-338)+(2.004)+(6.004), (I-338)+(2.004)+(7.001), (I-338)+(2.004)+(7.002), (I-338)+(2.004)+(7.003), (I-338)+(2.004)+(7.004), (I-338)+(2.004)+(7.005), (I-338)+(2.004)+(7.006), (I-338)+(2.004)+(9.001), (I-338)+(2.004)+(9.002), (I-338)+(2.004)+(9.003), (I-338)+(2.004)+(9.004), (I-338)+(2.004)+(9.005), (I-338)+(2.004)+(9.006), (I-338)+(2.004)+(9.007), (I-338)+(2.004)+(9.008), (I-338)+(2.004)+(9.009), (I-338)+(2.004)+(14.001), (I-338)+(2.004)+(14.002), (I-338)+(2.004)+(15.008), (I-338)+(2.004)+(15.011), (I-338)+(2.004)+(15.012), (I-338)+(2.004)+(15.016), (I-338)+(2.004)+(15.025), (I-338)+(2.004)+(15.027), (I-338)+(2.004)+(15.047), (I-338)+(2.004)+(15.063), (I-338)+(2.004)+(15.064), (I-338)+(2.004)+(16.001), (I-338)+(2.004)+(16.002), (I-338)+(2.004)+(16.003), (I-338)+(2.004)+(16.004), (I-338)+(2.004)+(16.005), (I-338)+(2.004)+(16.006), (I-338)+(2.004)+(16.007), (I-338)+(2.004)+(16.008), (I-338)+(2.004)+(17.001), (I-338)+(2.004)+(17.002), (I-338)+(2.004)+(17.003), (I-338)+(2.004)+(17.004), (I-338)+(2.004)+(17.005), (I-338)+(2.004)+(17.006), (I-338)+(2.004)+(17.007), (I-338)+(2.004)+(17.008), (I-338)+(2.004)+(17.009), (I-338)+(2.004)+(17.010), (I-338)+(2.004)+(17.011), (I-338)+(2.004)+(17.012), (I-338)+(2.004)+(18.001),
(I-338)+(2.005)+(3.001), (I-338)+(2.005)+(3.002), (I-338)+(2.005)+(3.003), (I-338)+(2.005)+(3.004), (I-338)+(2.005)+(3.005), (I-338)+(2.005)+(3.006), (I-338)+(2.005)+(3.007), (I-338)+(2.005)+(3.008), (I-338)+(2.005)+(3.009), (I-338)+(2.005)+(3.010), (I-338)+(2.005)+(3.011), (I-338)+(2.005)+(3.012), (I-338)+(2.005)+(3.013), (I-338)+(2.005)+(3.014), (I-338)+(2.005)+(3.015), (I-338)+(2.005)+(3.016), (I-338)+(2.005)+(3.017), (I-338)+(2.005)+(3.018), (I-338)+(2.005)+(3.019), (I-338)+(2.005)+(3.020), (I-338)+(2.005)+(3.021), (I-338)+(2.005)+(3.022), (I-338)+(2.005)+(3.023), (I-338)+(2.005)+(3.024), (I-338)+(2.005)+(3.025), (I-338)+(2.005)+(3.026), (I-338)+(2.005)+(3.027), (I-338)+(2.005)+(3.028), (I-338)+(2.005)+(3.029), (I-338)+(2.005)+(3.030), (I-338)+(2.005)+(3.031), (I-338)+(2.005)+(5.001), (I-338)+(2.005)+(5.002), (I-338)+(2.005)+(5.003), (I-338)+(2.005)+(5.004), (I-338)+(2.005)+(5.005), (I-338)+(2.005)+(5.006), (I-338)+(2.005)+(5.007), (I-338)+(2.005)+(5.008), (I-338)+(2.005)+(5.009), (I-338)+(2.005)+(5.010), (I-338)+(2.005)+(5.011), (I-338)+(2.005)+(5.012), (I-338)+(2.005)+(5.013), (I-338)+(2.005)+(5.014), (I-338)+(2.005)+(5.015), (I-338)+(2.005)+(5.016), (I-338)+(2.005)+(5.017), (I-338)+(2.005)+(5.018), (I-338)+(2.005)+(5.019), (I-338)+(2.005)+(5.020), (I-338)+(2.005)+(5.021), (I-338)+(2.005)+(5.022), (I-338)+(2.005)+(5.023), (I-338)+(2.005)+(6.001), (I-338)+(2.005)+(6.002), (I-338)+(2.005)+(6.003), (I-338)+(2.005)+(6.004), (I-338)+(2.005)+(7.001), (I-338)+(2.005)+(7.002), (I-338)+(2.005)+(7.003), (I-338)+(2.005)+(7.004), (I-338)+(2.005)+(7.005), (I-338)+(2.005)+(7.006), (I-338)+(2.005)+(9.001), (I-338)+(2.005)+(9.002), (I-338)+(2.005)+(9.003), (I-338)+(2.005)+(9.004), (I-338)+(2.005)+(9.005), (I-338)+(2.005)+(9.006), (I-338)+(2.005)+(9.007), (I-338)+(2.005)+(9.008), (I-338)+(2.005)+(9.009), (I-338)+(2.005)+(14.001), (I-338)+(2.005)+(14.002), (I-338)+(2.005)+(15.008), (I-338)+(2.005)+(15.011), (I-338)+(2.005)+(15.012), (I-338)+(2.005)+(15.016), (I-338)+(2.005)+(15.025), (I-338)+(2.005)+(15.027), (I-338)+(2.005)+(15.047), (I-338)+(2.005)+(15.063), (I-338)+(2.005)+(15.064), (I-338)+(2.005)+(16.001), (I-338)+(2.005)+(16.002), (I-338)+(2.005)+(16.003), (I-338)+(2.005)+(16.004), (I-338)+(2.005)+(16.005), (I-338)+(2.005)+(16.006), (I-338)+(2.005)+(16.007), (I-338)+(2.005)+(16.008), (I-338)+(2.005)+(17.001), (I-338)+(2.005)+(17.002), (I-338)+(2.005)+(17.003), (I-338)+(2.005)+(17.004), (I-338)+(2.005)+(17.005), (I-338)+(2.005)+(17.006), (I-338)+(2.005)+(17.007), (I-338)+(2.005)+(17.008), (I-338)+(2.005)+(17.009), (I-338)+(2.005)+(17.010), (I-338)+(2.005)+(17.011), (I-338)+(2.005)+(17.012), (I-338)+(2.005)+(18.001), (I-338)+(2.006)+(3.001), (I-338)+(2.006)+(3.002), (I-338)+(2.006)+(3.003), (I-338)+(2.006)+(3.004), (I-338)+(2.006)+(3.005), (I-338)+(2.006)+(3.006), (I-338)+(2.006)+(3.007), (I-338)+(2.006)+(3.008), (I-338)+(2.006)+(3.009), (I-338)+(2.006)+(3.010), (I-338)+(2.006)+(3.011), (I-338)+(2.006)+(3.012), (I-338)+(2.006)+(3.013), (I-338)+(2.006)+(3.014), (I-338)+(2.006)+(3.015), (I-338)+(2.006)+(3.016), (I-338)+(2.006)+(3.017), (I-338)+(2.006)+(3.018), (I-338)+(2.006)+(3.019), (I-338)+(2.006)+(3.020), (I-338)+(2.006)+(3.021), (I-338)+(2.006)+(3.022), (I-338)+(2.006)+(3.023), (I-338)+(2.006)+(3.024), (I-338)+(2.006)+(3.025), (I-338)+(2.006)+(3.026), (I-338)+(2.006)+(3.027), (I-338)+(2.006)+(3.028), (I-338)+(2.006)+(3.029), (I-338)+(2.006)+(3.030), (I-338)+(2.006)+(3.031), (I-338)+(2.006)+(5.001), (I-338)+(2.006)+(5.002), (I-338)+(2.006)+(5.003), (I-338)+(2.006)+(5.004), (I-338)+(2.006)+(5.005), (I-338)+(2.006)+(5.006), (I-338)+(2.006)+(5.007), (I-338)+(2.006)+(5.008), (I-338)+(2.006)+(5.009), (I-338)+(2.006)+(5.010), (I-338)+(2.006)+(5.011), (I-338)+(2.006)+(5.012), (I-338)+(2.006)+(5.013), (I-338)+(2.006)+(5.014), (I-338)+(2.006)+(5.015), (I-338)+(2.006)+(5.016), (I-338)+(2.006)+(5.017), (I-338)+(2.006)+(5.018), (I-338)+(2.006)+(5.019), (I-338)+(2.006)+(5.020), (I-338)+(2.006)+(5.021), (I-338)+(2.006)+(5.022), (I-338)+(2.006)+(5.023), (I-338)+(2.006)+(6.001), (I-338)+(2.006)+(6.002), (I-338)+(2.006)+(6.003), (I-338)+(2.006)+(6.004), (I-338)+(2.006)+(7.001), (I-338)+(2.006)+(7.002), (I-338)+(2.006)+(7.003), (I-338)+(2.006)+(7.004), (I-338)+(2.006)+(7.005), (I-338)+(2.006)+(7.006), (I-338)+(2.006)+(9.001), (I-338)+(2.006)+(9.002), (I-338)+(2.006)+(9.003), (I-338)+(2.006)+(9.004), (I-338)+(2.006)+(9.005), (I-338)+(2.006)+(9.006), (I-338)+(2.006)+(9.007), (I-338)+(2.006)+(9.008), (I-338)+(2.006)+(9.009), (I-338)+(2.006)+(14.001), (I-338)+(2.006)+(14.002), (I-338)+(2.006)+(15.008), (I-338)+(2.006)+(15.011), (I-338)+(2.006)+(15.012), (I-338)+(2.006)+(15.016), (I-338)+(2.006)+(15.025), (I-338)+(2.006)+(15.027), (I-338)+(2.006)+(15.047), (I-338)+(2.006)+(15.063), (I-338)+(2.006)+(15.064), (I-338)+(2.006)+(16.001), (I-338)+(2.006)+(16.002), (I-338)+(2.006)+(16.003), (I-338)+(2.006)+(16.004), (I-338)+(2.006)+(16.005), (I-338)+(2.006)+(16.006), (I-338)+(2.006)+(16.007), (I-338)+(2.006)+(16.008), (I-338)+(2.006)+(17.001), (I-338)+(2.006)+(17.002), (I-338)+(2.006)+(17.003), (I-338)+(2.006)+(17.004), (I-338)+(2.006)+(17.005), (I-338)+(2.006)+(17.006), (I-338)+(2.006)+(17.007), (I-338)+(2.006)+(17.008), (I-338)+(2.006)+(17.009), (I-338)+(2.006)+(17.010), (I-338)+(2.006)+(17.011), (I-338)+(2.006)+(17.012), (I-338)+(2.006)+(18.001), (I-338)+(2.007)+(3.001), (I-338)+(2.007)+(3.002), (I-338)+(2.007)+(3.003), (I-338)+(2.007)+(3.004), (I-338)+(2.007)+(3.005), (I-338)+(2.007)+(3.006), (I-338)+(2.007)+(3.007), (I-338)+(2.007)+(3.008), (I-338)+(2.007)+(3.009), (I-338)+(2.007)+(3.010), (I-338)+(2.007)+(3.011), (I-338)+(2.007)+(3.012), (I-338)+(2.007)+(3.013), (I-338)+(2.007)+(3.014), (I-338)+(2.007)+(3.015), (I-338)+(2.007)+(3.016), (I-338)+(2.007)+(3.017), (I-338)+(2.007)+(3.018), (I-338)+(2.007)+(3.019), (I-338)+(2.007)+(3.020), (I-338)+(2.007)+(3.021), (I-338)+(2.007)+(3.022), (I-338)+(2.007)+(3.023), (I-338)+(2.007)+(3.024), (I-338)+(2.007)+(3.025), (I-338)+(2.007)+(3.026), (I-338)+(2.007)+(3.027), (I-338)+(2.007)+(3.028), (I-338)+(2.007)+(3.029), (I-338)+(2.007)+(3.030), (I-338)+(2.007)+(3.031), (I-338)+(2.007)+(5.001), (I-338)+(2.007)+(5.002), (I-338)+(2.007)+(5.003), (I-338)+(2.007)+(5.004), (I-338)+(2.007)+(5.005), (I-338)+(2.007)+(5.006), (I-338)+(2.007)+(5.007), (I-338)+(2.007)+(5.008), (I-338)+(2.007)+(5.009), (I-338)+(2.007)+(5.010), (I-338)+(2.007)+(5.011), (I-338)+(2.007)+(5.012), (I-338)+(2.007)+(5.013), (I-338)+(2.007)+(5.014), (I-338)+(2.007)+(5.015), (I-338)+(2.007)+(5.016), (I-338)+(2.007)+(5.017), (I-338)+(2.007)+(5.018), (I-338)+(2.007)+(5.019), (I-338)+(2.007)+(5.020), (I-338)+(2.007)+(5.021), (I-338)+(2.007)+(5.022), (I-338)+(2.007)+(5.023), (I-338)+(2.007)+(6.001), (I-338)+(2.007)+(6.002), (I-338)+(2.007)+(6.003), (I-338)+(2.007)+(6.004), (I-338)+(2.007)+(7.001), (I-338)+(2.007)+(7.002), (I-338)+(2.007)+(7.003), (I-338)+(2.007)+(7.004), (I-338)+(2.007)+(7.005), (I-338)+(2.007)+(7.006), (I-338)+(2.007)+(9.001), (I-338)+(2.007)+(9.002), (I-338)+(2.007)+(9.003), (I-338)+(2.007)+(9.004), (I-338)+(2.007)+(9.005), (I-338)+(2.007)+(9.006), (I-338)+(2.007)+(9.007), (I-338)+(2.007)+(9.008), (I-338)+(2.007)+(9.009), (I-338)+(2.007)+(14.001), (I-338)+(2.007)+(14.002), (I-338)+(2.007)+(15.008), (I-338)+(2.007)+(15.011), (I-338)+(2.007)+(15.012), (I-338)+(2.007)+(15.016), (I-338)+(2.007)+(15.025), (I-338)+(2.007)+(15.027), (I-338)+(2.007)+(15.047), (I-338)+(2.007)+(15.063), (I-338)+(2.007)+(15.064), (I-338)+(2.007)+(16.001), (I-338)+(2.007)+(16.002), (I-338)+(2.007)+(16.003), (I-338)+(2.007)+(16.004), (I-338)+(2.007)+(16.005), (I-338)+(2.007)+(16.006), (I-338)+(2.007)+(16.007), (I-338)+(2.007)+(16.008), (I-338)+(2.007)+(17.001), (I-338)+(2.007)+(17.002), (I-338)+(2.007)+(17.003), (I-338)+(2.007)+(17.004), (I-338)+(2.007)+(17.005), (I-338)+(2.007)+(17.006), (I-338)+(2.007)+(17.007), (I-338)+(2.007)+(17.008), (I-338)+(2.007)+(17.009), (I-338)+(2.007)+(17.010), (I-338)+(2.007)+(17.011), (I-338)+(2.007)+(17.012), (I-338)+(2.007)+(18.001), (I-338)+(2.008)+(3.001), (I-338)+(2.008)+(3.002), (I-338)+(2.008)+(3.003), (I-338)+(2.008)+(3.004), (I-338)+(2.008)+(3.005), (I-338)+(2.008)+(3.006), (I-338)+(2.008)+(3.007), (I-338)+(2.008)+(3.008), (I-338)+(2.008)+(3.009), (I-338)+(2.008)+(3.010), (I-338)+(2.008)+(3.011), (I-338)+(2.008)+(3.012), (I-338)+(2.008)+(3.013), (I-338)+(2.008)+(3.014), (I-338)+(2.008)+(3.015), (I-338)+(2.008)+(3.016), (I-338)+(2.008)+(3.017), (I-338)+(2.008)+(3.018), (I-338)+(2.008)+(3.019), (I-338)+(2.008)+(3.020), (I-338)+(2.008)+(3.021), (I-338)+(2.008)+(3.022), (I-338)+(2.008)+(3.023), (I-338)+(2.008)+(3.024), (I-338)+(2.008)+(3.025), (I-338)+(2.008)+(3.026), (I-338)+(2.008)+(3.027), (I-338)+(2.008)+(3.028), (I-338)+(2.008)+(3.029), (I-338)+(2.008)+(3.030), (I-338)+(2.008)+(3.031), (I-338)+(2.008)+(5.001), (I-338)+(2.008)+(5.002), (I-338)+(2.008)+(5.003), (I-338)+(2.008)+(5.004), (I-338)+(2.008)+(5.005), (I-338)+(2.008)+(5.006), (I-338)+(2.008)+(5.007), (I-338)+(2.008)+(5.008), (I-338)+(2.008)+(5.009), (I-338)+(2.008)+(5.010), (I-338)+(2.008)+(5.011), (I-338)+(2.008)+(5.012), (I-338)+(2.008)+(5.013), (I-338)+(2.008)+(5.014), (I-338)+(2.008)+(5.015), (I-338)+(2.008)+(5.016), (I-338)+(2.008)+(5.017), (I-338)+(2.008)+(5.018), (I-338)+(2.008)+(5.019), (I-338)+(2.008)+(5.020), (I-338)+(2.008)+(5.021), (I-338)+(2.008)+(5.022), (I-338)+(2.008)+(5.023), (I-338)+(2.008)+(6.001), (I-338)+(2.008)+(6.002), (I-338)+(2.008)+(6.003), (I-338)+(2.008)+(6.004), (I-338)+(2.008)+(7.001), (I-338)+(2.008)+(7.002), (I-338)+(2.008)+(7.003), (I-338)+(2.008)+(7.004), (I-338)+(2.008)+(7.005), (I-338)+(2.008)+(7.006), (I-338)+(2.008)+(9.001), (I-338)+(2.008)+(9.002), (I-338)+(2.008)+(9.003), (I-338)+(2.008)+(9.004), (I-338)+(2.008)+(9.005), (I-338)+(2.008)+(9.006), (I-338)+(2.008)+(9.007), (I-338)+(2.008)+(9.008), (I-338)+(2.008)+(9.009), (I-338)+(2.008)+(14.001), (I-338)+(2.008)+(14.002), (I-338)+(2.008)+(15.008), (I-338)+(2.008)+(15.011), (I-338)+(2.008)+(15.012), (I-338)+(2.008)+(15.016), (I-338)+(2.008)+(15.025), (I-338)+(2.008)+(15.027), (I-338)+(2.008)+(15.047), (I-338)+(2.008)+(15.063), (I-338)+(2.008)+(15.064), (I-338)+(2.008)+(16.001), (I-338)+(2.008)+(16.002), (I-338)+(2.008)+(16.003), (I-338)+(2.008)+(16.004), (I-338)+(2.008)+(16.005), (I-338)+(2.008)+(16.006), (I-338)+(2.008)+(16.007), (I-338)+(2.008)+(16.008), (I-338)+(2.008)+(17.001), (I-338)+(2.008)+(17.002), (I-338)+(2.008)+(17.003), (I-338)+(2.008)+(17.004), (I-338)+(2.008)+(17.005), (I-338)+(2.008)+(17.006), (I-338)+(2.008)+(17.007), (I-338)+(2.008)+(17.008), (I-338)+(2.008)+(17.009), (I-338)+(2.008)+(17.010), (I-338)+(2.008)+(17.011), (I-338)+(2.008)+(17.012), (I-338)+(2.008)+(18.001), (I-338)+(2.009)+(3.001), (I-338)+(2.009)+(3.002), (I-338)+(2.009)+(3.003), (I-338)+(2.009)+(3.004), (I-338)+(2.009)+(3.005), (I-338)+(2.009)+(3.006), (I-338)+(2.009)+(3.007), (I-338)+(2.009)+(3.008), (I-338)+(2.009)+(3.009), (I-338)+(2.009)+(3.010), (I-338)+(2.009)+(3.011), (I-338)+(2.009)+(3.012), (I-338)+(2.009)+(3.013), (I-338)+(2.009)+(3.014), (I-338)+(2.009)+(3.015), (I-338)+(2.009)+(3.016), (I-338)+(2.009)+(3.017), (I-338)+(2.009)+(3.018), (I-338)+(2.009)+(3.019), (I-338)+(2.009)+(3.020), (I-338)+(2.009)+(3.021), (I-338)+(2.009)+(3.022), (I-338)+(2.009)+(3.023), (I-338)+(2.009)+(3.024), (I-338)+(2.009)+(3.025), (I-338)+(2.009)+(3.026), (I-338)+(2.009)+(3.027), (I-338)+(2.009)+(3.028), (I-338)+(2.009)+(3.029), (I-338)+(2.009)+(3.030), (I-338)+(2.009)+(3.031), (I-338)+(2.009)+(5.001), (I-338)+(2.009)+(5.002), (I-338)+(2.009)+(5.003), (I-338)+(2.009)+(5.004), (I-338)+(2.009)+(5.005), (I-338)+(2.009)+(5.006), (I-338)+(2.009)+(5.007), (I-338)+(2.009)+(5.008), (I-338)+(2.009)+(5.009), (I-338)+(2.009)+(5.010), (I-338)+(2.009)+(5.011), (I-338)+(2.009)+(5.012), (I-338)+(2.009)+(5.013), (I-338)+(2.009)+(5.014), (I-338)+(2.009)+(5.015), (I-338)+(2.009)+(5.016), (I-338)+(2.009)+(5.017), (I-338)+(2.009)+(5.018), (I-338)+(2.009)+(5.019), (I-338)+(2.009)+(5.020), (I-338)+(2.009)+(5.021), (I-338)+(2.009)+(5.022), (I-338)+(2.009)+(5.023), (I-338)+(2.009)+(6.001), (I-338)+(2.009)+(6.002), (I-338)+(2.009)+(6.003), (I-338)+(2.009)+(6.004), (I-338)+(2.009)+(7.001), (I-338)+(2.009)+(7.002), (I-338)+(2.009)+(7.003), (I-338)+(2.009)+(7.004), (I-338)+(2.009)+(7.005), (I-338)+(2.009)+(7.006), (I-338)+(2.009)+(9.001), (I-338)+(2.009)+(9.002), (I-338)+(2.009)+(9.003), (I-338)+(2.009)+(9.004), (I-338)+(2.009)+(9.005), (I-338)+(2.009)+(9.006), (I-338)+(2.009)+(9.007), (I-338)+(2.009)+(9.008), (I-338)+(2.009)+(9.009), (I-338)+(2.009)+(14.001), (I-338)+(2.009)+(14.002), (I-338)+(2.009)+(15.008), (I-338)+(2.009)+(15.011), (I-338)+(2.009)+(15.012), (I-338)+(2.009)+(15.016), (I-338)+(2.009)+(15.025), (I-338)+(2.009)+(15.027), (I-338)+(2.009)+(15.047), (I-338)+(2.009)+(15.063), (I-338)+(2.009)+(15.064), (I-338)+(2.009)+(16.001), (I-338)+(2.009)+(16.002), (I-338)+(2.009)+(16.003), (I-338)+(2.009)+(16.004), (I-338)+(2.009)+(16.005), (I-338)+(2.009)+(16.006), (I-338)+(2.009)+(16.007), (I-338)+(2.009)+(16.008), (I-338)+(2.009)+(17.001), (I-338)+(2.009)+(17.002), (I-338)+(2.009)+(17.003), (I-338)+(2.009)+(17.004), (I-338)+(2.009)+(17.005), (I-338)+(2.009)+(17.006), (I-338)+(2.009)+(17.007), (I-338)+(2.009)+(17.008), (I-338)+(2.009)+(17.009), (I-338)+(2.009)+(17.010), (I-338)+(2.009)+(17.011), (I-338)+(2.009)+(17.012), (I-338)+(2.009)+(18.001), (I-338)+(2.010)+(3.001), (I-338)+(2.010)+(3.002), (I-338)+(2.010)+(3.003), (I-338)+(2.010)+(3.004), (I-338)+(2.010)+(3.005), (I-338)+(2.010)+(3.006), (I-338)+(2.010)+(3.007), (I-338)+(2.010)+(3.008), (I-338)+(2.010)+(3.009), (I-338)+(2.010)+(3.010), (I-338)+(2.010)+(3.011), (I-338)+(2.010)+(3.012), (I-338)+(2.010)+(3.013), (I-338)+(2.010)+(3.014), (I-338)+(2.010)+(3.015), (I-338)+(2.010)+(3.016), (I-338)+(2.010)+(3.017), (I-338)+(2.010)+(3.018), (I-338)+(2.010)+(3.019), (I-338)+(2.010)+(3.020), (I-338)+(2.010)+(3.021), (I-338)+(2.010)+(3.022), (I-338)+(2.010)+(3.023), (I-338)+(2.010)+(3.024), (I-338)+(2.010)+(3.025), (I-338)+(2.010)+(3.026), (I-338)+(2.010)+(3.027), (I-338)+(2.010)+(3.028), (I-338)+(2.010)+(3.029), (I-338)+(2.010)+(3.030), (I-338)+(2.010)+(3.031), (I-338)+(2.010)+(5.001), (I-338)+(2.010)+(5.002), (I-338)+(2.010)+(5.003), (I-338)+(2.010)+(5.004), (I-338)+(2.010)+(5.005), (I-338)+(2.010)+(5.006), (I-338)+(2.010)+(5.007), (I-338)+(2.010)+(5.008), (I-338)+(2.010)+(5.009), (I-338)+(2.010)+(5.010), (I-338)+(2.010)+(5.011), (I-338)+(2.010)+(5.012), (I-338)+(2.010)+(5.013), (I-338)+(2.010)+(5.014), (I-338)+(2.010)+(5.015), (I-338)+(2.010)+(5.016), (I-338)+(2.010)+(5.017), (I-338)+(2.010)+(5.018), (I-338)+(2.010)+(5.019), (I-338)+(2.010)+(5.020), (I-338)+(2.010)+(5.021), (I-338)+(2.010)+(5.022), (I-338)+(2.010)+(5.023), (I-338)+(2.010)+(6.001), (I-338)+(2.010)+(6.002), (I-338)+(2.010)+(6.003), (I-338)+(2.010)+(6.004), (I-338)+(2.010)+(7.001), (I-338)+(2.010)+(7.002), (I-338)+(2.010)+(7.003), (I-338)+(2.010)+(7.004), (I-338)+(2.010)+(7.005), (I-338)+(2.010)+(7.006), (I-338)+(2.010)+(9.001), (I-338)+(2.010)+(9.002), (I-338)+(2.010)+(9.003), (I-338)+(2.010)+(9.004), (I-338)+(2.010)+(9.005), (I-338)+(2.010)+(9.006), (I-338)+(2.010)+(9.007), (I-338)+(2.010)+(9.008), (I-338)+(2.010)+(9.009), (I-338)+(2.010)+(14.001), (I-338)+(2.010)+(14.002), (I-338)+(2.010)+(15.008), (I-338)+(2.010)+(15.011), (I-338)+(2.010)+(15.012), (I-338)+(2.010)+(15.016), (I-338)+(2.010)+(15.025), (I-338)+(2.010)+(15.027), (I-338)+(2.010)+(15.047), (I-338)+(2.010)+(15.063), (I-338)+(2.010)+(15.064), (I-338)+(2.010)+(16.001), (I-338)+(2.010)+(16.002), (I-338)+(2.010)+(16.003), (I-338)+(2.010)+(16.004), (I-338)+(2.010)+(16.005), (I-338)+(2.010)+(16.006), (I-338)+(2.010)+(16.007), (I-338)+(2.010)+(16.008), (I-338)+(2.010)+(17.001), (I-338)+(2.010)+(17.002), (I-338)+(2.010)+(17.003), (I-338)+(2.010)+(17.004), (I-338)+(2.010)+(17.005), (I-338)+(2.010)+(17.006), (I-338)+(2.010)+(17.007), (I-338)+(2.010)+(17.008), (I-338)+(2.010)+(17.009), (I-338)+(2.010)+(17.010), (I-338)+(2.010)+(17.011), (I-338)+(2.010)+(17.012), (I-338)+(2.010)+(18.001), (I-338)+(2.011)+(3.001), (I-338)+(2.011)+(3.002), (I-338)+(2.011)+(3.003), (I-338)+(2.011)+(3.004), (I-338)+(2.011)+(3.005), (I-338)+(2.011)+(3.006), (I-338)+(2.011)+(3.007), (I-338)+(2.011)+(3.008), (I-338)+(2.011)+(3.009), (I-338)+(2.011)+(3.010), (I-338)+(2.011)+(3.011), (I-338)+(2.011)+(3.012), (I-338)+(2.011)+(3.013), (I-338)+(2.011)+(3.014), (I-338)+(2.011)+(3.015), (I-338)+(2.011)+(3.016), (I-338)+(2.011)+(3.017), (I-338)+(2.011)+(3.018), (I-338)+(2.011)+(3.019), (I-338)+(2.011)+(3.020), (I-338)+(2.011)+(3.021), (I-338)+(2.011)+(3.022), (I-338)+(2.011)+(3.023), (I-338)+(2.011)+(3.024), (I-338)+(2.011)+(3.025), (I-338)+(2.011)+(3.026), (I-338)+(2.011)+(3.027), (I-338)+(2.011)+(3.028), (I-338)+(2.011)+(3.029), (I-338)+(2.011)+(3.030), (I-338)+(2.011)+(3.031), (I-338)+(2.011)+(5.001), (I-338)+(2.011)+(5.002), (I-338)+(2.011)+(5.003), (I-338)+(2.011)+(5.004), (I-338)+(2.011)+(5.005), (I-338)+(2.011)+(5.006), (I-338)+(2.011)+(5.007), (I-338)+(2.011)+(5.008), (I-338)+(2.011)+(5.009), (I-338)+(2.011)+(5.010), (I-338)+(2.011)+(5.011), (I-338)+(2.011)+(5.012), (I-338)+(2.011)+(5.013), (I-338)+(2.011)+(5.014), (I-338)+(2.011)+(5.015), (I-338)+(2.011)+(5.016), (I-338)+(2.011)+(5.017), (I-338)+(2.011)+(5.018), (I-338)+(2.011)+(5.019), (I-338)+(2.011)+(5.020), (I-338)+(2.011)+(5.021), (I-338)+(2.011)+(5.022), (I-338)+(2.011)+(5.023), (I-338)+(2.011)+(6.001), (I-338)+(2.011)+(6.002), (I-338)+(2.011)+(6.003), (I-338)+(2.011)+(6.004), (I-338)+(2.011)+(7.001), (I-338)+(2.011)+(7.002), (I-338)+(2.011)+(7.003), (I-338)+(2.011)+(7.004), (I-338)+(2.011)+(7.005), (I-338)+(2.011)+(7.006), (I-338)+(2.011)+(9.001), (I-338)+(2.011)+(9.002), (I-338)+(2.011)+(9.003), (I-338)+(2.011)+(9.004), (I-338)+(2.011)+(9.005), (I-338)+(2.011)+(9.006), (I-338)+(2.011)+(9.007), (I-338)+(2.011)+(9.008), (I-338)+(2.011)+(9.009), (I-338)+(2.011)+(14.001), (I-338)+(2.011)+(14.002), (I-338)+(2.011)+(15.008), (I-338)+(2.011)+(15.011), (I-338)+(2.011)+(15.012), (I-338)+(2.011)+(15.016), (I-338)+(2.011)+(15.025), (I-338)+(2.011)+(15.027), (I-338)+(2.011)+(15.047), (I-338)+(2.011)+(15.063), (I-338)+(2.011)+(15.064), (I-338)+(2.011)+(16.001), (I-338)+(2.011)+(16.002), (I-338)+(2.011)+(16.003), (I-338)+(2.011)+(16.004), (I-338)+(2.011)+(16.005), (I-338)+(2.011)+(16.006), (I-338)+(2.011)+(16.007), (I-338)+(2.011)+(16.008), (I-338)+(2.011)+(17.001), (I-338)+(2.011)+(17.002), (I-338)+(2.011)+(17.003), (I-338)+(2.011)+(17.004), (I-338)+(2.011)+(17.005), (I-338)+(2.011)+(17.006), (I-338)+(2.011)+(17.007), (I-338)+(2.011)+(17.008), (I-338)+(2.011)+(17.009), (I-338)+(2.011)+(17.010), (I-338)+(2.011)+(17.011), (I-338)+(2.011)+(17.012), (I-338)+(2.011)+(18.001), (I-338)+(2.012)+(3.001), (I-338)+(2.012)+(3.002), (I-338)+(2.012)+(3.003), (I-338)+(2.012)+(3.004), (I-338)+(2.012)+(3.005), (I-338)+(2.012)+(3.006), (I-338)+(2.012)+(3.007), (I-338)+(2.012)+(3.008), (I-338)+(2.012)+(3.009), (I-338)+(2.012)+(3.010), (I-338)+(2.012)+(3.011), (I-338)+(2.012)+(3.012), (I-338)+(2.012)+(3.013), (I-338)+(2.012)+(3.014), (I-338)+(2.012)+(3.015), (I-338)+(2.012)+(3.016), (I-338)+(2.012)+(3.017), (I-338)+(2.012)+(3.018), (I-338)+(2.012)+(3.019), (I-338)+(2.012)+(3.020), (I-338)+(2.012)+(3.021), (I-338)+(2.012)+(3.022), (I-338)+(2.012)+(3.023), (I-338)+(2.012)+(3.024), (I-338)+(2.012)+(3.025), (I-338)+(2.012)+(3.026), (I-338)+(2.012)+(3.027), (I-338)+(2.012)+(3.028), (I-338)+(2.012)+(3.029), (I-338)+(2.012)+(3.030), (I-338)+(2.012)+(3.031), (I-338)+(2.012)+(5.001), (I-338)+(2.012)+(5.002), (I-338)+(2.012)+(5.003), (I-338)+(2.012)+(5.004), (I-338)+(2.012)+(5.005), (I-338)+(2.012)+(5.006), (I-338)+(2.012)+(5.007), (I-338)+(2.012)+(5.008), (I-338)+(2.012)+(5.009), (I-338)+(2.012)+(5.010), (I-338)+(2.012)+(5.011), (I-338)+(2.012)+(5.012), (I-338)+(2.012)+(5.013), (I-338)+(2.012)+(5.014), (I-338)+(2.012)+(5.015), (I-338)+(2.012)+(5.016), (I-338)+(2.012)+(5.017), (I-338)+(2.012)+(5.018), (I-338)+(2.012)+(5.019), (I-338)+(2.012)+(5.020), (I-338)+(2.012)+(5.021), (I-338)+(2.012)+(5.022), (I-338)+(2.012)+(5.023), (I-338)+(2.012)+(6.001), (I-338)+(2.012)+(6.002), (I-338)+(2.012)+(6.003), (I-338)+(2.012)+(6.004), (I-338)+(2.012)+(7.001), (I-338)+(2.012)+(7.002), (I-338)+(2.012)+(7.003), (I-338)+(2.012)+(7.004), (I-338)+(2.012)+(7.005), (I-338)+(2.012)+(7.006), (I-338)+(2.012)+(9.001), (I-338)+(2.012)+(9.002), (I-338)+(2.012)+(9.003), (I-338)+(2.012)+(9.004), (I-338)+(2.012)+(9.005), (I-338)+(2.012)+(9.006), (I-338)+(2.012)+(9.007), (I-338)+(2.012)+(9.008), (I-338)+(2.012)+(9.009), (I-338)+(2.012)+(14.001), (I-338)+(2.012)+(14.002), (I-338)+(2.012)+(15.008), (I-338)+(2.012)+(15.011), (I-338)+(2.012)+(15.012), (I-338)+(2.012)+(15.016), (I-338)+(2.012)+(15.025), (I-338)+(2.012)+(15.027), (I-338)+(2.012)+(15.047), (I-338)+(2.012)+(15.063), (I-338)+(2.012)+(15.064), (I-338)+(2.012)+(16.001), (I-338)+(2.012)+(16.002), (I-338)+(2.012)+(16.003), (I-338)+(2.012)+(16.004), (I-338)+(2.012)+(16.005), (I-338)+(2.012)+(16.006), (I-338)+(2.012)+(16.007), (I-338)+(2.012)+(16.008), (I-338)+(2.012)+(17.001), (I-338)+(2.012)+(17.002), (I-338)+(2.012)+(17.003), (I-338)+(2.012)+(17.004), (I-338)+(2.012)+(17.005), (I-338)+(2.012)+(17.006), (I-338)+(2.012)+(17.007), (I-338)+(2.012)+(17.008), (I-338)+(2.012)+(17.009), (I-338)+(2.012)+(17.010), (I-338)+(2.012)+(17.011), (I-338)+(2.012)+(17.012), (I-338)+(2.012)+(18.001), (I-338)+(2.013)+(3.001), (I-338)+(2.013)+(3.002), (I-338)+(2.013)+(3.003), (I-338)+(2.013)+(3.004), (I-338)+(2.013)+(3.005), (I-338)+(2.013)+(3.006), (I-338)+(2.013)+(3.007), (I-338)+(2.013)+(3.008), (I-338)+(2.013)+(3.009), (I-338)+(2.013)+(3.010), (I-338)+(2.013)+(3.011), (I-338)+(2.013)+(3.012), (I-338)+(2.013)+(3.013), (I-338)+(2.013)+(3.014), (I-338)+(2.013)+(3.015), (I-338)+(2.013)+(3.016), (I-338)+(2.013)+(3.017), (I-338)+(2.013)+(3.018), (I-338)+(2.013)+(3.019), (I-338)+(2.013)+(3.020), (I-338)+(2.013)+(3.021), (I-338)+(2.013)+(3.022), (I-338)+(2.013)+(3.023), (I-338)+(2.013)+(3.024), (I-338)+(2.013)+(3.025), (I-338)+(2.013)+(3.026), (I-338)+(2.013)+(3.027), (I-338)+(2.013)+(3.028), (I-338)+(2.013)+(3.029), (I-338)+(2.013)+(3.030), (I-338)+(2.013)+(3.031), (I-338)+(2.013)+(5.001), (I-338)+(2.013)+(5.002), (I-338)+(2.013)+(5.003), (I-338)+(2.013)+(5.004), (I-338)+(2.013)+(5.005), (I-338)+(2.013)+(5.006), (I-338)+(2.013)+(5.007), (I-338)+(2.013)+(5.008), (I-338)+(2.013)+(5.009), (I-338)+(2.013)+(5.010), (I-338)+(2.013)+(5.011), (I-338)+(2.013)+(5.012), (I-338)+(2.013)+(5.013), (I-338)+(2.013)+(5.014), (I-338)+(2.013)+(5.015), (I-338)+(2.013)+(5.016), (I-338)+(2.013)+(5.017), (I-338)+(2.013)+(5.018), (I-338)+(2.013)+(5.019), (I-338)+(2.013)+(5.020), (I-338)+(2.013)+(5.021), (I-338)+(2.013)+(5.022), (I-338)+(2.013)+(5.023), (I-338)+(2.013)+(6.001), (I-338)+(2.013)+(6.002), (I-338)+(2.013)+(6.003), (I-338)+(2.013)+(6.004), (I-338)+(2.013)+(7.001), (I-338)+(2.013)+(7.002), (I-338)+(2.013)+(7.003), (I-338)+(2.013)+(7.004), (I-338)+(2.013)+(7.005), (I-338)+(2.013)+(7.006), (I-338)+(2.013)+(9.001), (I-338)+(2.013)+(9.002), (I-338)+(2.013)+(9.003), (I-338)+(2.013)+(9.004), (I-338)+(2.013)+(9.005), (I-338)+(2.013)+(9.006), (I-338)+(2.013)+(9.007), (I-338)+(2.013)+(9.008), (I-338)+(2.013)+(9.009), (I-338)+(2.013)+(14.001), (I-338)+(2.013)+(14.002), (I-338)+(2.013)+(15.008), (I-338)+(2.013)+(15.011), (I-338)+(2.013)+(15.012), (I-338)+(2.013)+(15.016), (I-338)+(2.013)+(15.025), (I-338)+(2.013)+(15.027), (I-338)+(2.013)+(15.047), (I-338)+(2.013)+(15.063), (I-338)+(2.013)+(15.064), (I-338)+(2.013)+(16.001), (I-338)+(2.013)+(16.002), (I-338)+(2.013)+(16.003), (I-338)+(2.013)+(16.004), (I-338)+(2.013)+(16.005), (I-338)+(2.013)+(16.006), (I-338)+(2.013)+(16.007), (I-338)+(2.013)+(16.008), (I-338)+(2.013)+(17.001), (I-338)+(2.013)+(17.002), (I-338)+(2.013)+(17.003), (I-338)+(2.013)+(17.004), (I-338)+(2.013)+(17.005), (I-338)+(2.013)+(17.006), (I-338)+(2.013)+(17.007), (I-338)+(2.013)+(17.008), (I-338)+(2.013)+(17.009), (I-338)+(2.013)+(17.010), (I-338)+(2.013)+(17.011), (I-338)+(2.013)+(17.012), (I-338)+(2.013)+(18.001), (I-338)+(2.014)+(3.001), (I-338)+(2.014)+(3.002), (I-338)+(2.014)+(3.003), (I-338)+(2.014)+(3.004), (I-338)+(2.014)+(3.005), (I-338)+(2.014)+(3.006), (I-338)+(2.014)+(3.007), (I-338)+(2.014)+(3.008), (I-338)+(2.014)+(3.009), (I-338)+(2.014)+(3.010), (I-338)+(2.014)+(3.011), (I-338)+(2.014)+(3.012), (I-338)+(2.014)+(3.013), (I-338)+(2.014)+(3.014), (I-338)+(2.014)+(3.015), (I-338)+(2.014)+(3.016), (I-338)+(2.014)+(3.017), (I-338)+(2.014)+(3.018), (I-338)+(2.014)+(3.019), (I-338)+(2.014)+(3.020), (I-338)+(2.014)+(3.021), (I-338)+(2.014)+(3.022), (I-338)+(2.014)+(3.023), (I-338)+(2.014)+(3.024), (I-338)+(2.014)+(3.025), (I-338)+(2.014)+(3.026), (I-338)+(2.014)+(3.027), (I-338)+(2.014)+(3.028), (I-338)+(2.014)+(3.029), (I-338)+(2.014)+(3.030), (I-338)+(2.014)+(3.031), (I-338)+(2.014)+(5.001), (I-338)+(2.014)+(5.002), (I-338)+(2.014)+(5.003), (I-338)+(2.014)+(5.004), (I-338)+(2.014)+(5.005), (I-338)+(2.014)+(5.006), (I-338)+(2.014)+(5.007), (I-338)+(2.014)+(5.008), (I-338)+(2.014)+(5.009), (I-338)+(2.014)+(5.010), (I-338)+(2.014)+(5.011), (I-338)+(2.014)+(5.012), (I-338)+(2.014)+(5.013), (I-338)+(2.014)+(5.014), (I-338)+(2.014)+(5.015), (I-338)+(2.014)+(5.016), (I-338)+(2.014)+(5.017), (I-338)+(2.014)+(5.018), (I-338)+(2.014)+(5.019), (I-338)+(2.014)+(5.020), (I-338)+(2.014)+(5.021), (I-338)+(2.014)+(5.022), (I-338)+(2.014)+(5.023), (I-338)+(2.014)+(6.001), (I-338)+(2.014)+(6.002), (I-338)+(2.014)+(6.003), (I-338)+(2.014)+(6.004), (I-338)+(2.014)+(7.001), (I-338)+(2.014)+(7.002), (I-338)+(2.014)+(7.003), (I-338)+(2.014)+(7.004), (I-338)+(2.014)+(7.005), (I-338)+(2.014)+(7.006), (I-338)+(2.014)+(9.001), (I-338)+(2.014)+(9.002), (I-338)+(2.014)+(9.003), (I-338)+(2.014)+(9.004), (I-338)+(2.014)+(9.005), (I-338)+(2.014)+(9.006), (I-338)+(2.014)+(9.007), (I-338)+(2.014)+(9.008), (I-338)+(2.014)+(9.009), (I-338)+(2.014)+(14.001), (I-338)+(2.014)+(14.002), (I-338)+(2.014)+(15.008), (I-338)+(2.014)+(15.011), (I-338)+(2.014)+(15.012), (I-338)+(2.014)+(15.016), (I-338)+(2.014)+(15.025), (I-338)+(2.014)+(15.027), (I-338)+(2.014)+(15.047), (I-338)+(2.014)+(15.063), (I-338)+(2.014)+(15.064), (I-338)+(2.014)+(16.001), (I-338)+(2.014)+(16.002), (I-338)+(2.014)+(16.003), (I-338)+(2.014)+(16.004), (I-338)+(2.014)+(16.005), (I-338)+(2.014)+(16.006), (I-338)+(2.014)+(16.007), (I-338)+(2.014)+(16.008), (I-338)+(2.014)+(17.001), (I-338)+(2.014)+(17.002), (I-338)+(2.014)+(17.003), (I-338)+(2.014)+(17.004), (I-338)+(2.014)+(17.005), (I-338)+(2.014)+(17.006), (I-338)+(2.014)+(17.007), (I-338)+(2.014)+(17.008), (I-338)+(2.014)+(17.009), (I-338)+(2.014)+(17.010), (I-338)+(2.014)+(17.011), (I-338)+(2.014)+(17.012), (I-338)+(2.014)+(18.001), (I-338)+(2.015)+(3.001), (I-338)+(2.015)+(3.002), (I-338)+(2.015)+(3.003), (I-338)+(2.015)+(3.004), (I-338)+(2.015)+(3.005), (I-338)+(2.015)+(3.006), (I-338)+(2.015)+(3.007), (I-338)+(2.015)+(3.008), (I-338)+(2.015)+(3.009), (I-338)+(2.015)+(3.010), (I-338)+(2.015)+(3.011), (I-338)+(2.015)+(3.012), (I-338)+(2.015)+(3.013), (I-338)+(2.015)+(3.014), (I-338)+(2.015)+(3.015), (I-338)+(2.015)+(3.016), (I-338)+(2.015)+(3.017), (I-338)+(2.015)+(3.018), (I-338)+(2.015)+(3.019), (I-338)+(2.015)+(3.020), (I-338)+(2.015)+(3.021), (I-338)+(2.015)+(3.022), (I-338)+(2.015)+(3.023), (I-338)+(2.015)+(3.024), (I-338)+(2.015)+(3.025), (I-338)+(2.015)+(3.026), (I-338)+(2.015)+(3.027), (I-338)+(2.015)+(3.028), (I-338)+(2.015)+(3.029), (I-338)+(2.015)+(3.030), (I-338)+(2.015)+(3.031), (I-338)+(2.015)+(5.001), (I-338)+(2.015)+(5.002), (I-338)+(2.015)+(5.003), (I-338)+(2.015)+(5.004), (I-338)+(2.015)+(5.005), (I-338)+(2.015)+(5.006), (I-338)+(2.015)+(5.007), (I-338)+(2.015)+(5.008), (I-338)+(2.015)+(5.009), (I-338)+(2.015)+(5.010), (I-338)+(2.015)+(5.011), (I-338)+(2.015)+(5.012), (I-338)+(2.015)+(5.013), (I-338)+(2.015)+(5.014), (I-338)+(2.015)+(5.015), (I-338)+(2.015)+(5.016), (I-338)+(2.015)+(5.017), (I-338)+(2.015)+(5.018), (I-338)+(2.015)+(5.019), (I-338)+(2.015)+(5.020), (I-338)+(2.015)+(5.021), (I-338)+(2.015)+(5.022), (I-338)+(2.015)+(5.023), (I-338)+(2.015)+(6.001), (I-338)+(2.015)+(6.002), (I-338)+(2.015)+(6.003), (I-338)+(2.015)+(6.004), (I-338)+(2.015)+(7.001), (I-338)+(2.015)+(7.002), (I-338)+(2.015)+(7.003), (I-338)+(2.015)+(7.004), (I-338)+(2.015)+(7.005), (I-338)+(2.015)+(7.006), (I-338)+(2.015)+(9.001), (I-338)+(2.015)+(9.002), (I-338)+(2.015)+(9.003), (I-338)+(2.015)+(9.004), (I-338)+(2.015)+(9.005), (I-338)+(2.015)+(9.006), (I-338)+(2.015)+(9.007), (I-338)+(2.015)+(9.008), (I-338)+(2.015)+(9.009), (I-338)+(2.015)+(14.001), (I-338)+(2.015)+(14.002), (I-338)+(2.015)+(15.008), (I-338)+(2.015)+(15.011), (I-338)+(2.015)+(15.012), (I-338)+(2.015)+(15.016), (I-338)+(2.015)+(15.025), (I-338)+(2.015)+(15.027), (I-338)+(2.015)+(15.047), (I-338)+(2.015)+(15.063), (I-338)+(2.015)+(15.064), (I-338)+(2.015)+(16.001), (I-338)+(2.015)+(16.002), (I-338)+(2.015)+(16.003), (I-338)+(2.015)+(16.004), (I-338)+(2.015)+(16.005), (I-338)+(2.015)+(16.006), (I-338)+(2.015)+(16.007), (I-338)+(2.015)+(16.008), (I-338)+(2.015)+(17.001), (I-338)+(2.015)+(17.002), (I-338)+(2.015)+(17.003), (I-338)+(2.015)+(17.004), (I-338)+(2.015)+(17.005), (I-338)+(2.015)+(17.006), (I-338)+(2.015)+(17.007), (I-338)+(2.015)+(17.008), (I-338)+(2.015)+(17.009), (I-338)+(2.015)+(17.010), (I-338)+(2.015)+(17.011), (I-338)+(2.015)+(17.012), (I-338)+(2.015)+(18.001), (I-338)+(2.016)+(3.001), (I-338)+(2.016)+(3.002), (I-338)+(2.016)+(3.003), (I-338)+(2.016)+(3.004), (I-338)+(2.016)+(3.005), (I-338)+(2.016)+(3.006), (I-338)+(2.016)+(3.007), (I-338)+(2.016)+(3.008), (I-338)+(2.016)+(3.009), (I-338)+(2.016)+(3.010), (I-338)+(2.016)+(3.011), (I-338)+(2.016)+(3.012), (I-338)+(2.016)+(3.013), (I-338)+(2.016)+(3.014), (I-338)+(2.016)+(3.015), (I-338)+(2.016)+(3.016), (I-338)+(2.016)+(3.017), (I-338)+(2.016)+(3.018), (I-338)+(2.016)+(3.019), (I-338)+(2.016)+(3.020), (I-338)+(2.016)+(3.021), (I-338)+(2.016)+(3.022), (I-338)+(2.016)+(3.023), (I-338)+(2.016)+(3.024), (I-338)+(2.016)+(3.025), (I-338)+(2.016)+(3.026), (I-338)+(2.016)+(3.027), (I-338)+(2.016)+(3.028), (I-338)+(2.016)+(3.029), (I-338)+(2.016)+(3.030), (I-338)+(2.016)+(3.031), (I-338)+(2.016)+(5.001), (I-338)+(2.016)+(5.002), (I-338)+(2.016)+(5.003), (I-338)+(2.016)+(5.004), (I-338)+(2.016)+(5.005), (I-338)+(2.016)+(5.006), (I-338)+(2.016)+(5.007), (I-338)+(2.016)+(5.008), (I-338)+(2.016)+(5.009), (I-338)+(2.016)+(5.010), (I-338)+(2.016)+(5.011), (I-338)+(2.016)+(5.012), (I-338)+(2.016)+(5.013), (I-338)+(2.016)+(5.014), (I-338)+(2.016)+(5.015), (I-338)+(2.016)+(5.016), (I-338)+(2.016)+(5.017), (I-338)+(2.016)+(5.018), (I-338)+(2.016)+(5.019), (I-338)+(2.016)+(5.020), (I-338)+(2.016)+(5.021), (I-338)+(2.016)+(5.022), (I-338)+(2.016)+(5.023), (I-338)+(2.016)+(6.001), (I-338)+(2.016)+(6.002), (I-338)+(2.016)+(6.003), (I-338)+(2.016)+(6.004), (I-338)+(2.016)+(7.001), (I-338)+(2.016)+(7.002), (I-338)+(2.016)+(7.003), (I-338)+(2.016)+(7.004), (I-338)+(2.016)+(7.005), (I-338)+(2.016)+(7.006), (I-338)+(2.016)+(9.001), (I-338)+(2.016)+(9.002), (I-338)+(2.016)+(9.003), (I-338)+(2.016)+(9.004), (I-338)+(2.016)+(9.005), (I-338)+(2.016)+(9.006), (I-338)+(2.016)+(9.007), (I-338)+(2.016)+(9.008), (I-338)+(2.016)+(9.009), (I-338)+(2.016)+(14.001), (I-338)+(2.016)+(14.002), (I-338)+(2.016)+(15.008), (I-338)+(2.016)+(15.011), (I-338)+(2.016)+(15.012), (I-338)+(2.016)+(15.016), (I-338)+(2.016)+(15.025), (I-338)+(2.016)+(15.027), (I-338)+(2.016)+(15.047), (I-338)+(2.016)+(15.063), (I-338)+(2.016)+(15.064), (I-338)+(2.016)+(16.001), (I-338)+(2.016)+(16.002), (I-338)+(2.016)+(16.003), (I-338)+(2.016)+(16.004), (I-338)+(2.016)+(16.005), (I-338)+(2.016)+(16.006), (I-338)+(2.016)+(16.007), (I-338)+(2.016)+(16.008), (I-338)+(2.016)+(17.001), (I-338)+(2.016)+(17.002), (I-338)+(2.016)+(17.003), (I-338)+(2.016)+(17.004), (I-338)+(2.016)+(17.005), (I-338)+(2.016)+(17.006), (I-338)+(2.016)+(17.007), (I-338)+(2.016)+(17.008), (I-338)+(2.016)+(17.009), (I-338)+(2.016)+(17.010), (I-338)+(2.016)+(17.011), (I-338)+(2.016)+(17.012), (I-338)+(2.016)+(18.001), (I-338)+(2.017)+(3.001), (I-338)+(2.017)+(3.002), (I-338)+(2.017)+(3.003), (I-338)+(2.017)+(3.004), (I-338)+(2.017)+(3.005), (I-338)+(2.017)+(3.006), (I-338)+(2.017)+(3.007), (I-338)+(2.017)+(3.008), (I-338)+(2.017)+(3.009), (I-338)+(2.017)+(3.010), (I-338)+(2.017)+(3.011), (I-338)+(2.017)+(3.012), (I-338)+(2.017)+(3.013), (I-338)+(2.017)+(3.014), (I-338)+(2.017)+(3.015), (I-338)+(2.017)+(3.016), (I-338)+(2.017)+(3.017), (I-338)+(2.017)+(3.018), (I-338)+(2.017)+(3.019), (I-338)+(2.017)+(3.020), (I-338)+(2.017)+(3.021), (I-338)+(2.017)+(3.022), (I-338)+(2.017)+(3.023), (I-338)+(2.017)+(3.024), (I-338)+(2.017)+(3.025), (I-338)+(2.017)+(3.026), (I-338)+(2.017)+(3.027), (I-338)+(2.017)+(3.028), (I-338)+(2.017)+(3.029), (I-338)+(2.017)+(3.030), (I-338)+(2.017)+(3.031), (I-338)+(2.017)+(5.001), (I-338)+(2.017)+(5.002), (I-338)+(2.017)+(5.003), (I-338)+(2.017)+(5.004), (I-338)+(2.017)+(5.005), (I-338)+(2.017)+(5.006), (I-338)+(2.017)+(5.007), (I-338)+(2.017)+(5.008), (I-338)+(2.017)+(5.009), (I-338)+(2.017)+(5.010), (I-338)+(2.017)+(5.011), (I-338)+(2.017)+(5.012), (I-338)+(2.017)+(5.013), (I-338)+(2.017)+(5.014), (I-338)+(2.017)+(5.015), (I-338)+(2.017)+(5.016), (I-338)+(2.017)+(5.017), (I-338)+(2.017)+(5.018), (I-338)+(2.017)+(5.019), (I-338)+(2.017)+(5.020), (I-338)+(2.017)+(5.021), (I-338)+(2.017)+(5.022), (I-338)+(2.017)+(5.023), (I-338)+(2.017)+(6.001), (I-338)+(2.017)+(6.002), (I-338)+(2.017)+(6.003), (I-338)+(2.017)+(6.004), (I-338)+(2.017)+(7.001), (I-338)+(2.017)+(7.002), (I-338)+(2.017)+(7.003), (I-338)+(2.017)+(7.004), (I-338)+(2.017)+(7.005), (I-338)+(2.017)+(7.006), (I-338)+(2.017)+(9.001), (I-338)+(2.017)+(9.002), (I-338)+(2.017)+(9.003), (I-338)+(2.017)+(9.004), (I-338)+(2.017)+(9.005), (I-338)+(2.017)+(9.006), (I-338)+(2.017)+(9.007), (I-338)+(2.017)+(9.008), (I-338)+(2.017)+(9.009), (I-338)+(2.017)+(14.001), (I-338)+(2.017)+(14.002), (I-338)+(2.017)+(15.008), (I-338)+(2.017)+(15.011), (I-338)+(2.017)+(15.012), (I-338)+(2.017)+(15.016), (I-338)+(2.017)+(15.025), (I-338)+(2.017)+(15.027), (I-338)+(2.017)+(15.047), (I-338)+(2.017)+(15.063), (I-338)+(2.017)+(15.064), (I-338)+(2.017)+(16.001), (I-338)+(2.017)+(16.002), (I-338)+(2.017)+(16.003), (I-338)+(2.017)+(16.004), (I-338)+(2.017)+(16.005), (I-338)+(2.017)+(16.006), (I-338)+(2.017)+(16.007), (I-338)+(2.017)+(16.008), (I-338)+(2.017)+(17.001), (I-338)+(2.017)+(17.002), (I-338)+(2.017)+(17.003), (I-338)+(2.017)+(17.004), (I-338)+(2.017)+(17.005), (I-338)+(2.017)+(17.006), (I-338)+(2.017)+(17.007), (I-338)+(2.017)+(17.008), (I-338)+(2.017)+(17.009), (I-338)+(2.017)+(17.010), (I-338)+(2.017)+(17.011), (I-338)+(2.017)+(17.012), (I-338)+(2.017)+(18.001), (I-338)+(2.018)+(3.001), (I-338)+(2.018)+(3.002), (I-338)+(2.018)+(3.003), (I-338)+(2.018)+(3.004), (I-338)+(2.018)+(3.005), (I-338)+(2.018)+(3.006), (I-338)+(2.018)+(3.007), (I-338)+(2.018)+(3.008), (I-338)+(2.018)+(3.009), (I-338)+(2.018)+(3.010), (I-338)+(2.018)+(3.011), (I-338)+(2.018)+(3.012), (I-338)+(2.018)+(3.013), (I-338)+(2.018)+(3.014), (I-338)+(2.018)+(3.015), (I-338)+(2.018)+(3.016), (I-338)+(2.018)+(3.017), (I-338)+(2.018)+(3.018), (I-338)+(2.018)+(3.019), (I-338)+(2.018)+(3.020), (I-338)+(2.018)+(3.021), (I-338)+(2.018)+(3.022), (I-338)+(2.018)+(3.023), (I-338)+(2.018)+(3.024), (I-338)+(2.018)+(3.025), (I-338)+(2.018)+(3.026), (I-338)+(2.018)+(3.027), (I-338)+(2.018)+(3.028), (I-338)+(2.018)+(3.029), (I-338)+(2.018)+(3.030), (I-338)+(2.018)+(3.031), (I-338)+(2.018)+(5.001), (I-338)+(2.018)+(5.002), (I-338)+(2.018)+(5.003), (I-338)+(2.018)+(5.004), (I-338)+(2.018)+(5.005), (I-338)+(2.018)+(5.006), (I-338)+(2.018)+(5.007), (I-338)+(2.018)+(5.008), (I-338)+(2.018)+(5.009), (I-338)+(2.018)+(5.010), (I-338)+(2.018)+(5.011), (I-338)+(2.018)+(5.012), (I-338)+(2.018)+(5.013), (I-338)+(2.018)+(5.014), (I-338)+(2.018)+(5.015), (I-338)+(2.018)+(5.016), (I-338)+(2.018)+(5.017), (I-338)+(2.018)+(5.018), (I-338)+(2.018)+(5.019), (I-338)+(2.018)+(5.020), (I-338)+(2.018)+(5.021), (I-338)+(2.018)+(5.022), (I-338)+(2.018)+(5.023), (I-338)+(2.018)+(6.001), (I-338)+(2.018)+(6.002), (I-338)+(2.018)+(6.003), (I-338)+(2.018)+(6.004), (I-338)+(2.018)+(7.001), (I-338)+(2.018)+(7.002), (I-338)+(2.018)+(7.003), (I-338)+(2.018)+(7.004), (I-338)+(2.018)+(7.005), (I-338)+(2.018)+(7.006), (I-338)+(2.018)+(9.001), (I-338)+(2.018)+(9.002), (I-338)+(2.018)+(9.003), (I-338)+(2.018)+(9.004), (I-338)+(2.018)+(9.005), (I-338)+(2.018)+(9.006), (I-338)+(2.018)+(9.007), (I-338)+(2.018)+(9.008), (I-338)+(2.018)+(9.009), (I-338)+(2.018)+(14.001), (I-338)+(2.018)+(14.002), (I-338)+(2.018)+(15.008), (I-338)+(2.018)+(15.011), (I-338)+(2.018)+(15.012), (I-338)+(2.018)+(15.016), (I-338)+(2.018)+(15.025), (I-338)+(2.018)+(15.027), (I-338)+(2.018)+(15.047), (I-338)+(2.018)+(15.063), (I-338)+(2.018)+(15.064), (I-338)+(2.018)+(16.001), (I-338)+(2.018)+(16.002), (I-338)+(2.018)+(16.003), (I-338)+(2.018)+(16.004), (I-338)+(2.018)+(16.005), (I-338)+(2.018)+(16.006), (I-338)+(2.018)+(16.007), (I-338)+(2.018)+(16.008), (I-338)+(2.018)+(17.001), (I-338)+(2.018)+(17.002), (I-338)+(2.018)+(17.003), (I-338)+(2.018)+(17.004), (I-338)+(2.018)+(17.005), (I-338)+(2.018)+(17.006), (I-338)+(2.018)+(17.007), (I-338)+(2.018)+(17.008), (I-338)+(2.018)+(17.009), (I-338)+(2.018)+(17.010), (I-338)+(2.018)+(17.011), (I-338)+(2.018)+(17.012), (I-338)+(2.018)+(18.001), (I-338)+(2.019)+(3.001), (I-338)+(2.019)+(3.002), (I-338)+(2.019)+(3.003), (I-338)+(2.019)+(3.004), (I-338)+(2.019)+(3.005), (I-338)+(2.019)+(3.006), (I-338)+(2.019)+(3.007), (I-338)+(2.019)+(3.008), (I-338)+(2.019)+(3.009), (I-338)+(2.019)+(3.010), (I-338)+(2.019)+(3.011), (I-338)+(2.019)+(3.012), (I-338)+(2.019)+(3.013), (I-338)+(2.019)+(3.014), (I-338)+(2.019)+(3.015), (I-338)+(2.019)+(3.016), (I-338)+(2.019)+(3.017), (I-338)+(2.019)+(3.018), (I-338)+(2.019)+(3.019), (I-338)+(2.019)+(3.020), (I-338)+(2.019)+(3.021), (I-338)+(2.019)+(3.022), (I-338)+(2.019)+(3.023), (I-338)+(2.019)+(3.024), (I-338)+(2.019)+(3.025), (I-338)+(2.019)+(3.026), (I-338)+(2.019)+(3.027), (I-338)+(2.019)+(3.028), (I-338)+(2.019)+(3.029), (I-338)+(2.019)+(3.030), (I-338)+(2.019)+(3.031), (I-338)+(2.019)+(5.001), (I-338)+(2.019)+(5.002), (I-338)+(2.019)+(5.003), (I-338)+(2.019)+(5.004), (I-338)+(2.019)+(5.005), (I-338)+(2.019)+(5.006), (I-338)+(2.019)+(5.007), (I-338)+(2.019)+(5.008), (I-338)+(2.019)+(5.009), (I-338)+(2.019)+(5.010), (I-338)+(2.019)+(5.011), (I-338)+(2.019)+(5.012), (I-338)+(2.019)+(5.013), (I-338)+(2.019)+(5.014), (I-338)+(2.019)+(5.015), (I-338)+(2.019)+(5.016), (I-338)+(2.019)+(5.017), (I-338)+(2.019)+(5.018), (I-338)+(2.019)+(5.019), (I-338)+(2.019)+(5.020), (I-338)+(2.019)+(5.021), (I-338)+(2.019)+(5.022), (I-338)+(2.019)+(5.023), (I-338)+(2.019)+(6.001), (I-338)+(2.019)+(6.002), (I-338)+(2.019)+(6.003), (I-338)+(2.019)+(6.004), (I-338)+(2.019)+(7.001), (I-338)+(2.019)+(7.002), (I-338)+(2.019)+(7.003), (I-338)+(2.019)+(7.004), (I-338)+(2.019)+(7.005), (I-338)+(2.019)+(7.006), (I-338)+(2.019)+(9.001), (I-338)+(2.019)+(9.002), (I-338)+(2.019)+(9.003), (I-338)+(2.019)+(9.004), (I-338)+(2.019)+(9.005), (I-338)+(2.019)+(9.006), (I-338)+(2.019)+(9.007), (I-338)+(2.019)+(9.008), (I-338)+(2.019)+(9.009), (I-338)+(2.019)+(14.001), (I-338)+(2.019)+(14.002), (I-338)+(2.019)+(15.008), (I-338)+(2.019)+(15.011), (I-338)+(2.019)+(15.012), (I-338)+(2.019)+(15.016), (I-338)+(2.019)+(15.025), (I-338)+(2.019)+(15.027), (I-338)+(2.019)+(15.047), (I-338)+(2.019)+(15.063), (I-338)+(2.019)+(15.064), (I-338)+(2.019)+(16.001), (I-338)+(2.019)+(16.002), (I-338)+(2.019)+(16.003), (I-338)+(2.019)+(16.004), (I-338)+(2.019)+(16.005), (I-338)+(2.019)+(16.006), (I-338)+(2.019)+(16.007), (I-338)+(2.019)+(16.008), (I-338)+(2.019)+(17.001), (I-338)+(2.019)+(17.002), (I-338)+(2.019)+(17.003), (I-338)+(2.019)+(17.004), (I-338)+(2.019)+(17.005), (I-338)+(2.019)+(17.006), (I-338)+(2.019)+(17.007), (I-338)+(2.019)+(17.008), (I-338)+(2.019)+(17.009), (I-338)+(2.019)+(17.010), (I-338)+(2.019)+(17.011), (I-338)+(2.019)+(17.012), (I-338)+(2.019)+(18.001), (I-338)+(2.020)+(3.001), (I-338)+(2.020)+(3.002), (I-338)+(2.020)+(3.003), (I-338)+(2.020)+(3.004), (I-338)+(2.020)+(3.005), (I-338)+(2.020)+(3.006), (I-338)+(2.020)+(3.007), (I-338)+(2.020)+(3.008), (I-338)+(2.020)+(3.009), (I-338)+(2.020)+(3.010), (I-338)+(2.020)+(3.011), (I-338)+(2.020)+(3.012), (I-338)+(2.020)+(3.013), (I-338)+(2.020)+(3.014), (I-338)+(2.020)+(3.015), (I-338)+(2.020)+(3.016), (I-338)+(2.020)+(3.017), (I-338)+(2.020)+(3.018), (I-338)+(2.020)+(3.019), (I-338)+(2.020)+(3.020), (I-338)+(2.020)+(3.021), (I-338)+(2.020)+(3.022), (I-338)+(2.020)+(3.023), (I-338)+(2.020)+(3.024), (I-338)+(2.020)+(3.025), (I-338)+(2.020)+(3.026), (I-338)+(2.020)+(3.027), (I-338)+(2.020)+(3.028), (I-338)+(2.020)+(3.029), (I-338)+(2.020)+(3.030), (I-338)+(2.020)+(3.031), (I-338)+(2.020)+(5.001), (I-338)+(2.020)+(5.002), (I-338)+(2.020)+(5.003), (I-338)+(2.020)+(5.004), (I-338)+(2.020)+(5.005), (I-338)+(2.020)+(5.006), (I-338)+(2.020)+(5.007), (I-338)+(2.020)+(5.008), (I-338)+(2.020)+(5.009), (I-338)+(2.020)+(5.010), (I-338)+(2.020)+(5.011), (I-338)+(2.020)+(5.012), (I-338)+(2.020)+(5.013), (I-338)+(2.020)+(5.014), (I-338)+(2.020)+(5.015), (I-338)+(2.020)+(5.016), (I-338)+(2.020)+(5.017), (I-338)+(2.020)+(5.018), (I-338)+(2.020)+(5.019), (I-338)+(2.020)+(5.020), (I-338)+(2.020)+(5.021), (I-338)+(2.020)+(5.022), (I-338)+(2.020)+(5.023), (I-338)+(2.020)+(6.001), (I-338)+(2.020)+(6.002), (I-338)+(2.020)+(6.003), (I-338)+(2.020)+(6.004), (I-338)+(2.020)+(7.001), (I-338)+(2.020)+(7.002), (I-338)+(2.020)+(7.003), (I-338)+(2.020)+(7.004), (I-338)+(2.020)+(7.005), (I-338)+(2.020)+(7.006), (I-338)+(2.020)+(9.001), (I-338)+(2.020)+(9.002), (I-338)+(2.020)+(9.003), (I-338)+(2.020)+(9.004), (I-338)+(2.020)+(9.005), (I-338)+(2.020)+(9.006), (I-338)+(2.020)+(9.007), (I-338)+(2.020)+(9.008), (I-338)+(2.020)+(9.009), (I-338)+(2.020)+(14.001), (I-338)+(2.020)+(14.002), (I-338)+(2.020)+(15.008), (I-338)+(2.020)+(15.011), (I-338)+(2.020)+(15.012), (I-338)+(2.020)+(15.016), (I-338)+(2.020)+(15.025), (I-338)+(2.020)+(15.027), (I-338)+(2.020)+(15.047), (I-338)+(2.020)+(15.063), (I-338)+(2.020)+(15.064), (I-338)+(2.020)+(16.001), (I-338)+(2.020)+(16.002), (I-338)+(2.020)+(16.003), (I-338)+(2.020)+(16.004), (I-338)+(2.020)+(16.005), (I-338)+(2.020)+(16.006), (I-338)+(2.020)+(16.007), (I-338)+(2.020)+(16.008), (I-338)+(2.020)+(17.001), (I-338)+(2.020)+(17.002), (I-338)+(2.020)+(17.003), (I-338)+(2.020)+(17.004), (I-338)+(2.020)+(17.005), (I-338)+(2.020)+(17.006), (I-338)+(2.020)+(17.007), (I-338)+(2.020)+(17.008), (I-338)+(2.020)+(17.009), (I-338)+(2.020)+(17.010), (I-338)+(2.020)+(17.011), (I-338)+(2.020)+(17.012), (I-338)+(2.020)+(18.001), (I-338)+(2.021)+(3.001), (I-338)+(2.021)+(3.002), (I-338)+(2.021)+(3.003), (I-338)+(2.021)+(3.004), (I-338)+(2.021)+(3.005), (I-338)+(2.021)+(3.006), (I-338)+(2.021)+(3.007), (I-338)+(2.021)+(3.008), (I-338)+(2.021)+(3.009), (I-338)+(2.021)+(3.010), (I-338)+(2.021)+(3.011), (I-338)+(2.021)+(3.012), (I-338)+(2.021)+(3.013), (I-338)+(2.021)+(3.014), (I-338)+(2.021)+(3.015), (I-338)+(2.021)+(3.016), (I-338)+(2.021)+(3.017), (I-338)+(2.021)+(3.018), (I-338)+(2.021)+(3.019), (I-338)+(2.021)+(3.020), (I-338)+(2.021)+(3.021), (I-338)+(2.021)+(3.022), (I-338)+(2.021)+(3.023), (I-338)+(2.021)+(3.024), (I-338)+(2.021)+(3.025), (I-338)+(2.021)+(3.026), (I-338)+(2.021)+(3.027), (I-338)+(2.021)+(3.028), (I-338)+(2.021)+(3.029), (I-338)+(2.021)+(3.030), (I-338)+(2.021)+(3.031), (I-338)+(2.021)+(5.001), (I-338)+(2.021)+(5.002), (I-338)+(2.021)+(5.003), (I-338)+(2.021)+(5.004), (I-338)+(2.021)+(5.005), (I-338)+(2.021)+(5.006), (I-338)+(2.021)+(5.007), (I-338)+(2.021)+(5.008), (I-338)+(2.021)+(5.009), (I-338)+(2.021)+(5.010), (I-338)+(2.021)+(5.011), (I-338)+(2.021)+(5.012), (I-338)+(2.021)+(5.013), (I-338)+(2.021)+(5.014), (I-338)+(2.021)+(5.015), (I-338)+(2.021)+(5.016), (I-338)+(2.021)+(5.017), (I-338)+(2.021)+(5.018), (I-338)+(2.021)+(5.019), (I-338)+(2.021)+(5.020), (I-338)+(2.021)+(5.021), (I-338)+(2.021)+(5.022), (I-338)+(2.021)+(5.023), (I-338)+(2.021)+(6.001), (I-338)+(2.021)+(6.002), (I-338)+(2.021)+(6.003), (I-338)+(2.021)+(6.004), (I-338)+(2.021)+(7.001), (I-338)+(2.021)+(7.002), (I-338)+(2.021)+(7.003), (I-338)+(2.021)+(7.004), (I-338)+(2.021)+(7.005), (I-338)+(2.021)+(7.006), (I-338)+(2.021)+(9.001), (I-338)+(2.021)+(9.002), (I-338)+(2.021)+(9.003), (I-338)+(2.021)+(9.004), (I-338)+(2.021)+(9.005), (I-338)+(2.021)+(9.006), (I-338)+(2.021)+(9.007), (I-338)+(2.021)+(9.008), (I-338)+(2.021)+(9.009), (I-338)+(2.021)+(14.001), (I-338)+(2.021)+(14.002), (I-338)+(2.021)+(15.008), (I-338)+(2.021)+(15.011), (I-338)+(2.021)+(15.012), (I-338)+(2.021)+(15.016), (I-338)+(2.021)+(15.025), (I-338)+(2.021)+(15.027), (I-338)+(2.021)+(15.047), (I-338)+(2.021)+(15.063), (I-338)+(2.021)+(15.064), (I-338)+(2.021)+(16.001), (I-338)+(2.021)+(16.002), (I-338)+(2.021)+(16.003), (I-338)+(2.021)+(16.004), (I-338)+(2.021)+(16.005), (I-338)+(2.021)+(16.006), (I-338)+(2.021)+(16.007), (I-338)+(2.021)+(16.008), (I-338)+(2.021)+(17.001), (I-338)+(2.021)+(17.002), (I-338)+(2.021)+(17.003), (I-338)+(2.021)+(17.004), (I-338)+(2.021)+(17.005), (I-338)+(2.021)+(17.006), (I-338)+(2.021)+(17.007), (I-338)+(2.021)+(17.008), (I-338)+(2.021)+(17.009), (I-338)+(2.021)+(17.010), (I-338)+(2.021)+(17.011), (I-338)+(2.021)+(17.012), (I-338)+(2.021)+(18.001), (I-338)+(2.022)+(3.001), (I-338)+(2.022)+(3.002), (I-338)+(2.022)+(3.003), (I-338)+(2.022)+(3.004), (I-338)+(2.022)+(3.005), (I-338)+(2.022)+(3.006), (I-338)+(2.022)+(3.007), (I-338)+(2.022)+(3.008), (I-338)+(2.022)+(3.009), (I-338)+(2.022)+(3.010), (I-338)+(2.022)+(3.011), (I-338)+(2.022)+(3.012), (I-338)+(2.022)+(3.013), (I-338)+(2.022)+(3.014), (I-338)+(2.022)+(3.015), (I-338)+(2.022)+(3.016), (I-338)+(2.022)+(3.017), (I-338)+(2.022)+(3.018), (I-338)+(2.022)+(3.019), (I-338)+(2.022)+(3.020), (I-338)+(2.022)+(3.021), (I-338)+(2.022)+(3.022), (I-338)+(2.022)+(3.023), (I-338)+(2.022)+(3.024), (I-338)+(2.022)+(3.025), (I-338)+(2.022)+(3.026), (I-338)+(2.022)+(3.027), (I-338)+(2.022)+(3.028), (I-338)+(2.022)+(3.029), (I-338)+(2.022)+(3.030), (I-338)+(2.022)+(3.031), (I-338)+(2.022)+(5.001), (I-338)+(2.022)+(5.002), (I-338)+(2.022)+(5.003), (I-338)+(2.022)+(5.004), (I-338)+(2.022)+(5.005), (I-338)+(2.022)+(5.006), (I-338)+(2.022)+(5.007), (I-338)+(2.022)+(5.008), (I-338)+(2.022)+(5.009), (I-338)+(2.022)+(5.010), (I-338)+(2.022)+(5.011), (I-338)+(2.022)+(5.012), (I-338)+(2.022)+(5.013), (I-338)+(2.022)+(5.014), (I-338)+(2.022)+(5.015), (I-338)+(2.022)+(5.016), (I-338)+(2.022)+(5.017), (I-338)+(2.022)+(5.018), (I-338)+(2.022)+(5.019), (I-338)+(2.022)+(5.020), (I-338)+(2.022)+(5.021), (I-338)+(2.022)+(5.022), (I-338)+(2.022)+(5.023), (I-338)+(2.022)+(6.001), (I-338)+(2.022)+(6.002), (I-338)+(2.022)+(6.003), (I-338)+(2.022)+(6.004), (I-338)+(2.022)+(7.001), (I-338)+(2.022)+(7.002), (I-338)+(2.022)+(7.003), (I-338)+(2.022)+(7.004), (I-338)+(2.022)+(7.005), (I-338)+(2.022)+(7.006), (I-338)+(2.022)+(9.001), (I-338)+(2.022)+(9.002), (I-338)+(2.022)+(9.003), (I-338)+(2.022)+(9.004), (I-338)+(2.022)+(9.005), (I-338)+(2.022)+(9.006), (I-338)+(2.022)+(9.007), (I-338)+(2.022)+(9.008), (I-338)+(2.022)+(9.009), (I-338)+(2.022)+(14.001), (I-338)+(2.022)+(14.002), (I-338)+(2.022)+(15.008), (I-338)+(2.022)+(15.011), (I-338)+(2.022)+(15.012), (I-338)+(2.022)+(15.016), (I-338)+(2.022)+(15.025), (I-338)+(2.022)+(15.027), (I-338)+(2.022)+(15.047), (I-338)+(2.022)+(15.063), (I-338)+(2.022)+(15.064), (I-338)+(2.022)+(16.001), (I-338)+(2.022)+(16.002), (I-338)+(2.022)+(16.003), (I-338)+(2.022)+(16.004), (I-338)+(2.022)+(16.005), (I-338)+(2.022)+(16.006), (I-338)+(2.022)+(16.007), (I-338)+(2.022)+(16.008), (I-338)+(2.022)+(17.001), (I-338)+(2.022)+(17.002), (I-338)+(2.022)+(17.003), (I-338)+(2.022)+(17.004), (I-338)+(2.022)+(17.005), (I-338)+(2.022)+(17.006), (I-338)+(2.022)+(17.007), (I-338)+(2.022)+(17.008), (I-338)+(2.022)+(17.009), (I-338)+(2.022)+(17.010), (I-338)+(2.022)+(17.011), (I-338)+(2.022)+(17.012), (I-338)+(2.022)+(18.001), (I-338)+(2.023)+(3.001), (I-338)+(2.023)+(3.002), (I-338)+(2.023)+(3.003), (I-338)+(2.023)+(3.004), (I-338)+(2.023)+(3.005), (I-338)+(2.023)+(3.006), (I-338)+(2.023)+(3.007), (I-338)+(2.023)+(3.008), (I-338)+(2.023)+(3.009), (I-338)+(2.023)+(3.010), (I-338)+(2.023)+(3.011), (I-338)+(2.023)+(3.012), (I-338)+(2.023)+(3.013), (I-338)+(2.023)+(3.014), (I-338)+(2.023)+(3.015), (I-338)+(2.023)+(3.016), (I-338)+(2.023)+(3.017), (I-338)+(2.023)+(3.018), (I-338)+(2.023)+(3.019), (I-338)+(2.023)+(3.020), (I-338)+(2.023)+(3.021), (I-338)+(2.023)+(3.022), (I-338)+(2.023)+(3.023), (I-338)+(2.023)+(3.024), (I-338)+(2.023)+(3.025), (I-338)+(2.023)+(3.026), (I-338)+(2.023)+(3.027), (I-338)+(2.023)+(3.028), (I-338)+(2.023)+(3.029), (I-338)+(2.023)+(3.030), (I-338)+(2.023)+(3.031), (I-338)+(2.023)+(5.001), (I-338)+(2.023)+(5.002), (I-338)+(2.023)+(5.003), (I-338)+(2.023)+(5.004), (I-338)+(2.023)+(5.005), (I-338)+(2.023)+(5.006), (I-338)+(2.023)+(5.007), (I-338)+(2.023)+(5.008), (I-338)+(2.023)+(5.009), (I-338)+(2.023)+(5.010), (I-338)+(2.023)+(5.011), (I-338)+(2.023)+(5.012), (I-338)+(2.023)+(5.013), (I-338)+(2.023)+(5.014), (I-338)+(2.023)+(5.015), (I-338)+(2.023)+(5.016), (I-338)+(2.023)+(5.017), (I-338)+(2.023)+(5.018), (I-338)+(2.023)+(5.019), (I-338)+(2.023)+(5.020), (I-338)+(2.023)+(5.021), (I-338)+(2.023)+(5.022), (I-338)+(2.023)+(5.023), (I-338)+(2.023)+(6.001), (I-338)+(2.023)+(6.002), (I-338)+(2.023)+(6.003), (I-338)+(2.023)+(6.004), (I-338)+(2.023)+(7.001), (I-338)+(2.023)+(7.002), (I-338)+(2.023)+(7.003), (I-338)+(2.023)+(7.004), (I-338)+(2.023)+(7.005), (I-338)+(2.023)+(7.006), (I-338)+(2.023)+(9.001), (I-338)+(2.023)+(9.002), (I-338)+(2.023)+(9.003), (I-338)+(2.023)+(9.004), (I-338)+(2.023)+(9.005), (I-338)+(2.023)+(9.006), (I-338)+(2.023)+(9.007), (I-338)+(2.023)+(9.008), (I-338)+(2.023)+(9.009), (I-338)+(2.023)+(14.001), (I-338)+(2.023)+(14.002), (I-338)+(2.023)+(15.008), (I-338)+(2.023)+(15.011), (I-338)+(2.023)+(15.012), (I-338)+(2.023)+(15.016), (I-338)+(2.023)+(15.025), (I-338)+(2.023)+(15.027), (I-338)+(2.023)+(15.047), (I-338)+(2.023)+(15.063), (I-338)+(2.023)+(15.064), (I-338)+(2.023)+(16.001), (I-338)+(2.023)+(16.002), (I-338)+(2.023)+(16.003), (I-338)+(2.023)+(16.004), (I-338)+(2.023)+(16.005), (I-338)+(2.023)+(16.006), (I-338)+(2.023)+(16.007), (I-338)+(2.023)+(16.008), (I-338)+(2.023)+(17.001), (I-338)+(2.023)+(17.002), (I-338)+(2.023)+(17.003), (I-338)+(2.023)+(17.004), (I-338)+(2.023)+(17.005), (I-338)+(2.023)+(17.006), (I-338)+(2.023)+(17.007), (I-338)+(2.023)+(17.008), (I-338)+(2.023)+(17.009), (I-338)+(2.023)+(17.010), (I-338)+(2.023)+(17.011), (I-338)+(2.023)+(17.012), (I-338)+(2.023)+(18.001), (I-338)+(2.024)+(3.001), (I-338)+(2.024)+(3.002), (I-338)+(2.024)+(3.003), (I-338)+(2.024)+(3.004), (I-338)+(2.024)+(3.005), (I-338)+(2.024)+(3.006), (I-338)+(2.024)+(3.007), (I-338)+(2.024)+(3.008), (I-338)+(2.024)+(3.009), (I-338)+(2.024)+(3.010), (I-338)+(2.024)+(3.011), (I-338)+(2.024)+(3.012), (I-338)+(2.024)+(3.013), (I-338)+(2.024)+(3.014), (I-338)+(2.024)+(3.015), (I-338)+(2.024)+(3.016), (I-338)+(2.024)+(3.017), (I-338)+(2.024)+(3.018), (I-338)+(2.024)+(3.019), (I-338)+(2.024)+(3.020), (I-338)+(2.024)+(3.021), (I-338)+(2.024)+(3.022), (I-338)+(2.024)+(3.023), (I-338)+(2.024)+(3.024), (I-338)+(2.024)+(3.025), (I-338)+(2.024)+(3.026), (I-338)+(2.024)+(3.027), (I-338)+(2.024)+(3.028), (I-338)+(2.024)+(3.029), (I-338)+(2.024)+(3.030), (I-338)+(2.024)+(3.031), (I-338)+(2.024)+(5.001), (I-338)+(2.024)+(5.002), (I-338)+(2.024)+(5.003), (I-338)+(2.024)+(5.004), (I-338)+(2.024)+(5.005), (I-338)+(2.024)+(5.006), (I-338)+(2.024)+(5.007), (I-338)+(2.024)+(5.008), (I-338)+(2.024)+(5.009), (I-338)+(2.024)+(5.010), (I-338)+(2.024)+(5.011), (I-338)+(2.024)+(5.012), (I-338)+(2.024)+(5.013), (I-338)+(2.024)+(5.014), (I-338)+(2.024)+(5.015), (I-338)+(2.024)+(5.016), (I-338)+(2.024)+(5.017), (I-338)+(2.024)+(5.018), (I-338)+(2.024)+(5.019), (I-338)+(2.024)+(5.020), (I-338)+(2.024)+(5.021), (I-338)+(2.024)+(5.022), (I-338)+(2.024)+(5.023), (I-338)+(2.024)+(6.001), (I-338)+(2.024)+(6.002), (I-338)+(2.024)+(6.003), (I-338)+(2.024)+(6.004), (I-338)+(2.024)+(7.001), (I-338)+(2.024)+(7.002), (I-338)+(2.024)+(7.003), (I-338)+(2.024)+(7.004), (I-338)+(2.024)+(7.005), (I-338)+(2.024)+(7.006), (I-338)+(2.024)+(9.001), (I-338)+(2.024)+(9.002), (I-338)+(2.024)+(9.003), (I-338)+(2.024)+(9.004), (I-338)+(2.024)+(9.005), (I-338)+(2.024)+(9.006), (I-338)+(2.024)+(9.007), (I-338)+(2.024)+(9.008), (I-338)+(2.024)+(9.009), (I-338)+(2.024)+(14.001), (I-338)+(2.024)+(14.002), (I-338)+(2.024)+(15.008), (I-338)+(2.024)+(15.011), (I-338)+(2.024)+(15.012), (I-338)+(2.024)+(15.016), (I-338)+(2.024)+(15.025), (I-338)+(2.024)+(15.027), (I-338)+(2.024)+(15.047), (I-338)+(2.024)+(15.063), (I-338)+(2.024)+(15.064), (I-338)+(2.024)+(16.001), (I-338)+(2.024)+(16.002), (I-338)+(2.024)+(16.003), (I-338)+(2.024)+(16.004), (I-338)+(2.024)+(16.005), (I-338)+(2.024)+(16.006), (I-338)+(2.024)+(16.007), (I-338)+(2.024)+(16.008), (I-338)+(2.024)+(17.001), (I-338)+(2.024)+(17.002), (I-338)+(2.024)+(17.003), (I-338)+(2.024)+(17.004), (I-338)+(2.024)+(17.005), (I-338)+(2.024)+(17.006), (I-338)+(2.024)+(17.007), (I-338)+(2.024)+(17.008), (I-338)+(2.024)+(17.009), (I-338)+(2.024)+(17.010), (I-338)+(2.024)+(17.011), (I-338)+(2.024)+(17.012), (I-338)+(2.024)+(18.001), (I-338)+(2.025)+(3.001), (I-338)+(2.025)+(3.002), (I-338)+(2.025)+(3.003), (I-338)+(2.025)+(3.004), (I-338)+(2.025)+(3.005), (I-338)+(2.025)+(3.006), (I-338)+(2.025)+(3.007), (I-338)+(2.025)+(3.008), (I-338)+(2.025)+(3.009), (I-338)+(2.025)+(3.010), (I-338)+(2.025)+(3.011), (I-338)+(2.025)+(3.012), (I-338)+(2.025)+(3.013), (I-338)+(2.025)+(3.014), (I-338)+(2.025)+(3.015), (I-338)+(2.025)+(3.016), (I-338)+(2.025)+(3.017), (I-338)+(2.025)+(3.018), (I-338)+(2.025)+(3.019), (I-338)+(2.025)+(3.020), (I-338)+(2.025)+(3.021), (I-338)+(2.025)+(3.022), (I-338)+(2.025)+(3.023), (I-338)+(2.025)+(3.024), (I-338)+(2.025)+(3.025), (I-338)+(2.025)+(3.026), (I-338)+(2.025)+(3.027), (I-338)+(2.025)+(3.028), (I-338)+(2.025)+(3.029), (I-338)+(2.025)+(3.030), (I-338)+(2.025)+(3.031), (I-338)+(2.025)+(5.001), (I-338)+(2.025)+(5.002), (I-338)+(2.025)+(5.003), (I-338)+(2.025)+(5.004), (I-338)+(2.025)+(5.005), (I-338)+(2.025)+(5.006), (I-338)+(2.025)+(5.007), (I-338)+(2.025)+(5.008), (I-338)+(2.025)+(5.009), (I-338)+(2.025)+(5.010), (I-338)+(2.025)+(5.011), (I-338)+(2.025)+(5.012), (I-338)+(2.025)+(5.013), (I-338)+(2.025)+(5.014), (I-338)+(2.025)+(5.015), (I-338)+(2.025)+(5.016), (I-338)+(2.025)+(5.017), (I-338)+(2.025)+(5.018), (I-338)+(2.025)+(5.019), (I-338)+(2.025)+(5.020), (I-338)+(2.025)+(5.021), (I-338)+(2.025)+(5.022), (I-338)+(2.025)+(5.023), (I-338)+(2.025)+(6.001), (I-338)+(2.025)+(6.002), (I-338)+(2.025)+(6.003), (I-338)+(2.025)+(6.004), (I-338)+(2.025)+(7.001), (I-338)+(2.025)+(7.002), (I-338)+(2.025)+(7.003), (I-338)+(2.025)+(7.004), (I-338)+(2.025)+(7.005), (I-338)+(2.025)+(7.006), (I-338)+(2.025)+(9.001), (I-338)+(2.025)+(9.002), (I-338)+(2.025)+(9.003), (I-338)+(2.025)+(9.004), (I-338)+(2.025)+(9.005), (I-338)+(2.025)+(9.006), (I-338)+(2.025)+(9.007), (I-338)+(2.025)+(9.008), (I-338)+(2.025)+(9.009), (I-338)+(2.025)+(14.001), (I-338)+(2.025)+(14.002), (I-338)+(2.025)+(15.008), (I-338)+(2.025)+(15.011), (I-338)+(2.025)+(15.012), (I-338)+(2.025)+(15.016), (I-338)+(2.025)+(15.025), (I-338)+(2.025)+(15.027), (I-338)+(2.025)+(15.047), (I-338)+(2.025)+(15.063), (I-338)+(2.025)+(15.064), (I-338)+(2.025)+(16.001), (I-338)+(2.025)+(16.002), (I-338)+(2.025)+(16.003), (I-338)+(2.025)+(16.004), (I-338)+(2.025)+(16.005), (I-338)+(2.025)+(16.006), (I-338)+(2.025)+(16.007), (I-338)+(2.025)+(16.008), (I-338)+(2.025)+(17.001), (I-338)+(2.025)+(17.002), (I-338)+(2.025)+(17.003), (I-338)+(2.025)+(17.004), (I-338)+(2.025)+(17.005), (I-338)+(2.025)+(17.006), (I-338)+(2.025)+(17.007), (I-338)+(2.025)+(17.008), (I-338)+(2.025)+(17.009), (I-338)+(2.025)+(17.010), (I-338)+(2.025)+(17.011), (I-338)+(2.025)+(17.012), (I-338)+(2.025)+(18.001), (I-338)+(2.026)+(3.001), (I-338)+(2.026)+(3.002), (I-338)+(2.026)+(3.003), (I-338)+(2.026)+(3.004), (I-338)+(2.026)+(3.005), (I-338)+(2.026)+(3.006), (I-338)+(2.026)+(3.007), (I-338)+(2.026)+(3.008), (I-338)+(2.026)+(3.009), (I-338)+(2.026)+(3.010), (I-338)+(2.026)+(3.011), (I-338)+(2.026)+(3.012), (I-338)+(2.026)+(3.013), (I-338)+(2.026)+(3.014), (I-338)+(2.026)+(3.015), (I-338)+(2.026)+(3.016), (I-338)+(2.026)+(3.017), (I-338)+(2.026)+(3.018), (I-338)+(2.026)+(3.019), (I-338)+(2.026)+(3.020), (I-338)+(2.026)+(3.021), (I-338)+(2.026)+(3.022), (I-338)+(2.026)+(3.023), (I-338)+(2.026)+(3.024), (I-338)+(2.026)+(3.025), (I-338)+(2.026)+(3.026), (I-338)+(2.026)+(3.027), (I-338)+(2.026)+(3.028), (I-338)+(2.026)+(3.029), (I-338)+(2.026)+(3.030), (I-338)+(2.026)+(3.031), (I-338)+(2.026)+(5.001), (I-338)+(2.026)+(5.002), (I-338)+(2.026)+(5.003), (I-338)+(2.026)+(5.004), (I-338)+(2.026)+(5.005), (I-338)+(2.026)+(5.006), (I-338)+(2.026)+(5.007), (I-338)+(2.026)+(5.008), (I-338)+(2.026)+(5.009), (I-338)+(2.026)+(5.010), (I-338)+(2.026)+(5.011), (I-338)+(2.026)+(5.012), (I-338)+(2.026)+(5.013), (I-338)+(2.026)+(5.014), (I-338)+(2.026)+(5.015), (I-338)+(2.026)+(5.016), (I-338)+(2.026)+(5.017), (I-338)+(2.026)+(5.018), (I-338)+(2.026)+(5.019), (I-338)+(2.026)+(5.020), (I-338)+(2.026)+(5.021), (I-338)+(2.026)+(5.022), (I-338)+(2.026)+(5.023), (I-338)+(2.026)+(6.001), (I-338)+(2.026)+(6.002), (I-338)+(2.026)+(6.003), (I-338)+(2.026)+(6.004), (I-338)+(2.026)+(7.001), (I-338)+(2.026)+(7.002), (I-338)+(2.026)+(7.003), (I-338)+(2.026)+(7.004), (I-338)+(2.026)+(7.005), (I-338)+(2.026)+(7.006), (I-338)+(2.026)+(9.001), (I-338)+(2.026)+(9.002), (I-338)+(2.026)+(9.003), (I-338)+(2.026)+(9.004), (I-338)+(2.026)+(9.005), (I-338)+(2.026)+(9.006), (I-338)+(2.026)+(9.007), (I-338)+(2.026)+(9.008), (I-338)+(2.026)+(9.009), (I-338)+(2.026)+(14.001), (I-338)+(2.026)+(14.002), (I-338)+(2.026)+(15.008), (I-338)+(2.026)+(15.011), (I-338)+(2.026)+(15.012), (I-338)+(2.026)+(15.016), (I-338)+(2.026)+(15.025), (I-338)+(2.026)+(15.027), (I-338)+(2.026)+(15.047), (I-338)+(2.026)+(15.063), (I-338)+(2.026)+(15.064), (I-338)+(2.026)+(16.001), (I-338)+(2.026)+(16.002), (I-338)+(2.026)+(16.003), (I-338)+(2.026)+(16.004), (I-338)+(2.026)+(16.005), (I-338)+(2.026)+(16.006), (I-338)+(2.026)+(16.007), (I-338)+(2.026)+(16.008), (I-338)+(2.026)+(17.001), (I-338)+(2.026)+(17.002), (I-338)+(2.026)+(17.003), (I-338)+(2.026)+(17.004), (I-338)+(2.026)+(17.005), (I-338)+(2.026)+(17.006), (I-338)+(2.026)+(17.007), (I-338)+(2.026)+(17.008), (I-338)+(2.026)+(17.009), (I-338)+(2.026)+(17.010), (I-338)+(2.026)+(17.011), (I-338)+(2.026)+(17.012), (I-338)+(2.026)+(18.001), (I-338)+(2.027)+(3.001), (I-338)+(2.027)+(3.002), (I-338)+(2.027)+(3.003), (I-338)+(2.027)+(3.004), (I-338)+(2.027)+(3.005), (I-338)+(2.027)+(3.006), (I-338)+(2.027)+(3.007), (I-338)+(2.027)+(3.008), (I-338)+(2.027)+(3.009), (I-338)+(2.027)+(3.010), (I-338)+(2.027)+(3.011), (I-338)+(2.027)+(3.012), (I-338)+(2.027)+(3.013), (I-338)+(2.027)+(3.014), (I-338)+(2.027)+(3.015), (I-338)+(2.027)+(3.016), (I-338)+(2.027)+(3.017), (I-338)+(2.027)+(3.018), (I-338)+(2.027)+(3.019), (I-338)+(2.027)+(3.020), (I-338)+(2.027)+(3.021), (I-338)+(2.027)+(3.022), (I-338)+(2.027)+(3.023), (I-338)+(2.027)+(3.024), (I-338)+(2.027)+(3.025), (I-338)+(2.027)+(3.026), (I-338)+(2.027)+(3.027), (I-338)+(2.027)+(3.028), (I-338)+(2.027)+(3.029), (I-338)+(2.027)+(3.030), (I-338)+(2.027)+(3.031), (I-338)+(2.027)+(5.001), (I-338)+(2.027)+(5.002), (I-338)+(2.027)+(5.003), (I-338)+(2.027)+(5.004), (I-338)+(2.027)+(5.005), (I-338)+(2.027)+(5.006), (I-338)+(2.027)+(5.007), (I-338)+(2.027)+(5.008), (I-338)+(2.027)+(5.009), (I-338)+(2.027)+(5.010), (I-338)+(2.027)+(5.011), (I-338)+(2.027)+(5.012), (I-338)+(2.027)+(5.013), (I-338)+(2.027)+(5.014), (I-338)+(2.027)+(5.015), (I-338)+(2.027)+(5.016), (I-338)+(2.027)+(5.017), (I-338)+(2.027)+(5.018), (I-338)+(2.027)+(5.019), (I-338)+(2.027)+(5.020), (I-338)+(2.027)+(5.021), (I-338)+(2.027)+(5.022), (I-338)+(2.027)+(5.023), (I-338)+(2.027)+(6.001), (I-338)+(2.027)+(6.002), (I-338)+(2.027)+(6.003), (I-338)+(2.027)+(6.004), (I-338)+(2.027)+(7.001), (I-338)+(2.027)+(7.002), (I-338)+(2.027)+(7.003), (I-338)+(2.027)+(7.004), (I-338)+(2.027)+(7.005), (I-338)+(2.027)+(7.006), (I-338)+(2.027)+(9.001), (I-338)+(2.027)+(9.002), (I-338)+(2.027)+(9.003), (I-338)+(2.027)+(9.004), (I-338)+(2.027)+(9.005), (I-338)+(2.027)+(9.006), (I-338)+(2.027)+(9.007), (I-338)+(2.027)+(9.008), (I-338)+(2.027)+(9.009), (I-338)+(2.027)+(14.001), (I-338)+(2.027)+(14.002), (I-338)+(2.027)+(15.008), (I-338)+(2.027)+(15.011), (I-338)+(2.027)+(15.012), (I-338)+(2.027)+(15.016), (I-338)+(2.027)+(15.025), (I-338)+(2.027)+(15.027), (I-338)+(2.027)+(15.047), (I-338)+(2.027)+(15.063), (I-338)+(2.027)+(15.064), (I-338)+(2.027)+(16.001), (I-338)+(2.027)+(16.002), (I-338)+(2.027)+(16.003), (I-338)+(2.027)+(16.004), (I-338)+(2.027)+(16.005), (I-338)+(2.027)+(16.006), (I-338)+(2.027)+(16.007), (I-338)+(2.027)+(16.008), (I-338)+(2.027)+(17.001), (I-338)+(2.027)+(17.002), (I-338)+(2.027)+(17.003), (I-338)+(2.027)+(17.004), (I-338)+(2.027)+(17.005), (I-338)+(2.027)+(17.006), (I-338)+(2.027)+(17.007), (I-338)+(2.027)+(17.008), (I-338)+(2.027)+(17.009), (I-338)+(2.027)+(17.010), (I-338)+(2.027)+(17.011), (I-338)+(2.027)+(17.012), (I-338)+(2.027)+(18.001), (I-338)+(2.028)+(3.001), (I-338)+(2.028)+(3.002), (I-338)+(2.028)+(3.003), (I-338)+(2.028)+(3.004), (I-338)+(2.028)+(3.005), (I-338)+(2.028)+(3.006), (I-338)+(2.028)+(3.007), (I-338)+(2.028)+(3.008), (I-338)+(2.028)+(3.009), (I-338)+(2.028)+(3.010), (I-338)+(2.028)+(3.011), (I-338)+(2.028)+(3.012), (I-338)+(2.028)+(3.013), (I-338)+(2.028)+(3.014), (I-338)+(2.028)+(3.015), (I-338)+(2.028)+(3.016), (I-338)+(2.028)+(3.017), (I-338)+(2.028)+(3.018), (I-338)+(2.028)+(3.019), (I-338)+(2.028)+(3.020), (I-338)+(2.028)+(3.021), (I-338)+(2.028)+(3.022), (I-338)+(2.028)+(3.023), (I-338)+(2.028)+(3.024), (I-338)+(2.028)+(3.025), (I-338)+(2.028)+(3.026), (I-338)+(2.028)+(3.027), (I-338)+(2.028)+(3.028), (I-338)+(2.028)+(3.029), (I-338)+(2.028)+(3.030), (I-338)+(2.028)+(3.031), (I-338)+(2.028)+(5.001), (I-338)+(2.028)+(5.002), (I-338)+(2.028)+(5.003), (I-338)+(2.028)+(5.004), (I-338)+(2.028)+(5.005), (I-338)+(2.028)+(5.006), (I-338)+(2.028)+(5.007), (I-338)+(2.028)+(5.008), (I-338)+(2.028)+(5.009), (I-338)+(2.028)+(5.010), (I-338)+(2.028)+(5.011), (I-338)+(2.028)+(5.012), (I-338)+(2.028)+(5.013), (I-338)+(2.028)+(5.014), (I-338)+(2.028)+(5.015), (I-338)+(2.028)+(5.016), (I-338)+(2.028)+(5.017), (I-338)+(2.028)+(5.018), (I-338)+(2.028)+(5.019), (I-338)+(2.028)+(5.020), (I-338)+(2.028)+(5.021), (I-338)+(2.028)+(5.022), (I-338)+(2.028)+(5.023), (I-338)+(2.028)+(6.001), (I-338)+(2.028)+(6.002), (I-338)+(2.028)+(6.003), (I-338)+(2.028)+(6.004), (I-338)+(2.028)+(7.001), (I-338)+(2.028)+(7.002), (I-338)+(2.028)+(7.003), (I-338)+(2.028)+(7.004), (I-338)+(2.028)+(7.005), (I-338)+(2.028)+(7.006), (I-338)+(2.028)+(9.001), (I-338)+(2.028)+(9.002), (I-338)+(2.028)+(9.003), (I-338)+(2.028)+(9.004), (I-338)+(2.028)+(9.005), (I-338)+(2.028)+(9.006), (I-338)+(2.028)+(9.007), (I-338)+(2.028)+(9.008), (I-338)+(2.028)+(9.009), (I-338)+(2.028)+(14.001), (I-338)+(2.028)+(14.002), (I-338)+(2.028)+(15.008), (I-338)+(2.028)+(15.011), (I-338)+(2.028)+(15.012), (I-338)+(2.028)+(15.016), (I-338)+(2.028)+(15.025), (I-338)+(2.028)+(15.027), (I-338)+(2.028)+(15.047), (I-338)+(2.028)+(15.063), (I-338)+(2.028)+(15.064), (I-338)+(2.028)+(16.001), (I-338)+(2.028)+(16.002), (I-338)+(2.028)+(16.003), (I-338)+(2.028)+(16.004), (I-338)+(2.028)+(16.005), (I-338)+(2.028)+(16.006), (I-338)+(2.028)+(16.007), (I-338)+(2.028)+(16.008), (I-338)+(2.028)+(17.001), (I-338)+(2.028)+(17.002), (I-338)+(2.028)+(17.003), (I-338)+(2.028)+(17.004), (I-338)+(2.028)+(17.005), (I-338)+(2.028)+(17.006), (I-338)+(2.028)+(17.007), (I-338)+(2.028)+(17.008), (I-338)+(2.028)+(17.009), (I-338)+(2.028)+(17.010), (I-338)+(2.028)+(17.011), (I-338)+(2.028)+(17.012), (I-338)+(2.028)+(18.001), (I-338)+(2.029)+(3.001), (I-338)+(2.029)+(3.002), (I-338)+(2.029)+(3.003), (I-338)+(2.029)+(3.004), (I-338)+(2.029)+(3.005), (I-338)+(2.029)+(3.006), (I-338)+(2.029)+(3.007), (I-338)+(2.029)+(3.008), (I-338)+(2.029)+(3.009), (I-338)+(2.029)+(3.010), (I-338)+(2.029)+(3.011), (I-338)+(2.029)+(3.012), (I-338)+(2.029)+(3.013), (I-338)+(2.029)+(3.014), (I-338)+(2.029)+(3.015), (I-338)+(2.029)+(3.016), (I-338)+(2.029)+(3.017), (I-338)+(2.029)+(3.018), (I-338)+(2.029)+(3.019), (I-338)+(2.029)+(3.020), (I-338)+(2.029)+(3.021), (I-338)+(2.029)+(3.022), (I-338)+(2.029)+(3.023), (I-338)+(2.029)+(3.024), (I-338)+(2.029)+(3.025), (I-338)+(2.029)+(3.026), (I-338)+(2.029)+(3.027), (I-338)+(2.029)+(3.028), (I-338)+(2.029)+(3.029), (I-338)+(2.029)+(3.030), (I-338)+(2.029)+(3.031), (I-338)+(2.029)+(5.001), (I-338)+(2.029)+(5.002), (I-338)+(2.029)+(5.003), (I-338)+(2.029)+(5.004), (I-338)+(2.029)+(5.005), (I-338)+(2.029)+(5.006), (I-338)+(2.029)+(5.007), (I-338)+(2.029)+(5.008), (I-338)+(2.029)+(5.009), (I-338)+(2.029)+(5.010), (I-338)+(2.029)+(5.011), (I-338)+(2.029)+(5.012), (I-338)+(2.029)+(5.013), (I-338)+(2.029)+(5.014), (I-338)+(2.029)+(5.015), (I-338)+(2.029)+(5.016), (I-338)+(2.029)+(5.017), (I-338)+(2.029)+(5.018), (I-338)+(2.029)+(5.019), (I-338)+(2.029)+(5.020), (I-338)+(2.029)+(5.021), (I-338)+(2.029)+(5.022), (I-338)+(2.029)+(5.023), (I-338)+(2.029)+(6.001), (I-338)+(2.029)+(6.002), (I-338)+(2.029)+(6.003), (I-338)+(2.029)+(6.004), (I-338)+(2.029)+(7.001), (I-338)+(2.029)+(7.002), (I-338)+(2.029)+(7.003), (I-338)+(2.029)+(7.004), (I-338)+(2.029)+(7.005), (I-338)+(2.029)+(7.006), (I-338)+(2.029)+(9.001), (I-338)+(2.029)+(9.002), (I-338)+(2.029)+(9.003), (I-338)+(2.029)+(9.004), (I-338)+(2.029)+(9.005), (I-338)+(2.029)+(9.006), (I-338)+(2.029)+(9.007), (I-338)+(2.029)+(9.008), (I-338)+(2.029)+(9.009), (I-338)+(2.029)+(14.001), (I-338)+(2.029)+(14.002), (I-338)+(2.029)+(15.008), (I-338)+(2.029)+(15.011), (I-338)+(2.029)+(15.012), (I-338)+(2.029)+(15.016), (I-338)+(2.029)+(15.025), (I-338)+(2.029)+(15.027), (I-338)+(2.029)+(15.047), (I-338)+(2.029)+(15.063), (I-338)+(2.029)+(15.064), (I-338)+(2.029)+(16.001), (I-338)+(2.029)+(16.002), (I-338)+(2.029)+(16.003), (I-338)+(2.029)+(16.004), (I-338)+(2.029)+(16.005), (I-338)+(2.029)+(16.006), (I-338)+(2.029)+(16.007), (I-338)+(2.029)+(16.008), (I-338)+(2.029)+(17.001), (I-338)+(2.029)+(17.002), (I-338)+(2.029)+(17.003), (I-338)+(2.029)+(17.004), (I-338)+(2.029)+(17.005), (I-338)+(2.029)+(17.006), (I-338)+(2.029)+(17.007), (I-338)+(2.029)+(17.008), (I-338)+(2.029)+(17.009), (I-338)+(2.029)+(17.010), (I-338)+(2.029)+(17.011), (I-338)+(2.029)+(17.012), (I-338)+(2.029)+(18.001), (I-338)+(2.030)+(3.001), (I-338)+(2.030)+(3.002), (I-338)+(2.030)+(3.003), (I-338)+(2.030)+(3.004), (I-338)+(2.030)+(3.005), (I-338)+(2.030)+(3.006), (I-338)+(2.030)+(3.007), (I-338)+(2.030)+(3.008), (I-338)+(2.030)+(3.009), (I-338)+(2.030)+(3.010), (I-338)+(2.030)+(3.011), (I-338)+(2.030)+(3.012), (I-338)+(2.030)+(3.013), (I-338)+(2.030)+(3.014), (I-338)+(2.030)+(3.015), (I-338)+(2.030)+(3.016), (I-338)+(2.030)+(3.017), (I-338)+(2.030)+(3.018), (I-338)+(2.030)+(3.019), (I-338)+(2.030)+(3.020), (I-338)+(2.030)+(3.021), (I-338)+(2.030)+(3.022), (I-338)+(2.030)+(3.023), (I-338)+(2.030)+(3.024), (I-338)+(2.030)+(3.025), (I-338)+(2.030)+(3.026), (I-338)+(2.030)+(3.027), (I-338)+(2.030)+(3.028), (I-338)+(2.030)+(3.029), (I-338)+(2.030)+(3.030), (I-338)+(2.030)+(3.031), (I-338)+(2.030)+(5.001), (I-338)+(2.030)+(5.002), (I-338)+(2.030)+(5.003), (I-338)+(2.030)+(5.004), (I-338)+(2.030)+(5.005), (I-338)+(2.030)+(5.006), (I-338)+(2.030)+(5.007), (I-338)+(2.030)+(5.008), (I-338)+(2.030)+(5.009), (I-338)+(2.030)+(5.010), (I-338)+(2.030)+(5.011), (I-338)+(2.030)+(5.012), (I-338)+(2.030)+(5.013), (I-338)+(2.030)+(5.014), (I-338)+(2.030)+(5.015), (I-338)+(2.030)+(5.016), (I-338)+(2.030)+(5.017), (I-338)+(2.030)+(5.018), (I-338)+(2.030)+(5.019), (I-338)+(2.030)+(5.020), (I-338)+(2.030)+(5.021), (I-338)+(2.030)+(5.022), (I-338)+(2.030)+(5.023), (I-338)+(2.030)+(6.001), (I-338)+(2.030)+(6.002), (I-338)+(2.030)+(6.003), (I-338)+(2.030)+(6.004), (I-338)+(2.030)+(7.001), (I-338)+(2.030)+(7.002), (I-338)+(2.030)+(7.003), (I-338)+(2.030)+(7.004), (I-338)+(2.030)+(7.005), (I-338)+(2.030)+(7.006), (I-338)+(2.030)+(9.001), (I-338)+(2.030)+(9.002), (I-338)+(2.030)+(9.003), (I-338)+(2.030)+(9.004), (I-338)+(2.030)+(9.005), (I-338)+(2.030)+(9.006), (I-338)+(2.030)+(9.007), (I-338)+(2.030)+(9.008), (I-338)+(2.030)+(9.009), (I-338)+(2.030)+(14.001), (I-338)+(2.030)+(14.002), (I-338)+(2.030)+(15.008), (I-338)+(2.030)+(15.011), (I-338)+(2.030)+(15.012), (I-338)+(2.030)+(15.016), (I-338)+(2.030)+(15.025), (I-338)+(2.030)+(15.027), (I-338)+(2.030)+(15.047), (I-338)+(2.030)+(15.063), (I-338)+(2.030)+(15.064), (I-338)+(2.030)+(16.001), (I-338)+(2.030)+(16.002), (I-338)+(2.030)+(16.003), (I-338)+(2.030)+(16.004), (I-338)+(2.030)+(16.005), (I-338)+(2.030)+(16.006), (I-338)+(2.030)+(16.007), (I-338)+(2.030)+(16.008), (I-338)+(2.030)+(17.001), (I-338)+(2.030)+(17.002), (I-338)+(2.030)+(17.003), (I-338)+(2.030)+(17.004), (I-338)+(2.030)+(17.005), (I-338)+(2.030)+(17.006), (I-338)+(2.030)+(17.007), (I-338)+(2.030)+(17.008), (I-338)+(2.030)+(17.009), (I-338)+(2.030)+(17.010), (I-338)+(2.030)+(17.011), (I-338)+(2.030)+(17.012), (I-338)+(2.030)+(18.001), (I-338)+(2.031)+(3.001), (I-338)+(2.031)+(3.002), (I-338)+(2.031)+(3.003), (I-338)+(2.031)+(3.004), (I-338)+(2.031)+(3.005), (I-338)+(2.031)+(3.006), (I-338)+(2.031)+(3.007), (I-338)+(2.031)+(3.008), (I-338)+(2.031)+(3.009), (I-338)+(2.031)+(3.010), (I-338)+(2.031)+(3.011), (I-338)+(2.031)+(3.012), (I-338)+(2.031)+(3.013), (I-338)+(2.031)+(3.014), (I-338)+(2.031)+(3.015), (I-338)+(2.031)+(3.016), (I-338)+(2.031)+(3.017), (I-338)+(2.031)+(3.018), (I-338)+(2.031)+(3.019), (I-338)+(2.031)+(3.020), (I-338)+(2.031)+(3.021), (I-338)+(2.031)+(3.022), (I-338)+(2.031)+(3.023), (I-338)+(2.031)+(3.024), (I-338)+(2.031)+(3.025), (I-338)+(2.031)+(3.026), (I-338)+(2.031)+(3.027), (I-338)+(2.031)+(3.028), (I-338)+(2.031)+(3.029), (I-338)+(2.031)+(3.030), (I-338)+(2.031)+(3.031), (I-338)+(2.031)+(5.001), (I-338)+(2.031)+(5.002), (I-338)+(2.031)+(5.003), (I-338)+(2.031)+(5.004), (I-338)+(2.031)+(5.005), (I-338)+(2.031)+(5.006), (I-338)+(2.031)+(5.007), (I-338)+(2.031)+(5.008), (I-338)+(2.031)+(5.009), (I-338)+(2.031)+(5.010), (I-338)+(2.031)+(5.011), (I-338)+(2.031)+(5.012), (I-338)+(2.031)+(5.013), (I-338)+(2.031)+(5.014), (I-338)+(2.031)+(5.015), (I-338)+(2.031)+(5.016), (I-338)+(2.031)+(5.017), (I-338)+(2.031)+(5.018), (I-338)+(2.031)+(5.019), (I-338)+(2.031)+(5.020), (I-338)+(2.031)+(5.021), (I-338)+(2.031)+(5.022), (I-338)+(2.031)+(5.023), (I-338)+(2.031)+(6.001), (I-338)+(2.031)+(6.002), (I-338)+(2.031)+(6.003), (I-338)+(2.031)+(6.004), (I-338)+(2.031)+(7.001), (I-338)+(2.031)+(7.002), (I-338)+(2.031)+(7.003), (I-338)+(2.031)+(7.004), (I-338)+(2.031)+(7.005), (I-338)+(2.031)+(7.006), (I-338)+(2.031)+(9.001), (I-338)+(2.031)+(9.002), (I-338)+(2.031)+(9.003), (I-338)+(2.031)+(9.004), (I-338)+(2.031)+(9.005), (I-338)+(2.031)+(9.006), (I-338)+(2.031)+(9.007), (I-338)+(2.031)+(9.008), (I-338)+(2.031)+(9.009), (I-338)+(2.031)+(14.001), (I-338)+(2.031)+(14.002), (I-338)+(2.031)+(15.008), (I-338)+(2.031)+(15.011), (I-338)+(2.031)+(15.012), (I-338)+(2.031)+(15.016), (I-338)+(2.031)+(15.025), (I-338)+(2.031)+(15.027), (I-338)+(2.031)+(15.047), (I-338)+(2.031)+(15.063), (I-338)+(2.031)+(15.064), (I-338)+(2.031)+(16.001), (I-338)+(2.031)+(16.002), (I-338)+(2.031)+(16.003), (I-338)+(2.031)+(16.004), (I-338)+(2.031)+(16.005), (I-338)+(2.031)+(16.006), (I-338)+(2.031)+(16.007), (I-338)+(2.031)+(16.008), (I-338)+(2.031)+(17.001), (I-338)+(2.031)+(17.002), (I-338)+(2.031)+(17.003), (I-338)+(2.031)+(17.004), (I-338)+(2.031)+(17.005), (I-338)+(2.031)+(17.006), (I-338)+(2.031)+(17.007), (I-338)+(2.031)+(17.008), (I-338)+(2.031)+(17.009), (I-338)+(2.031)+(17.010), (I-338)+(2.031)+(17.011), (I-338)+(2.031)+(17.012), (I-338)+(2.031)+(18.001), (I-338)+(2.032)+(3.001), (I-338)+(2.032)+(3.002), (I-338)+(2.032)+(3.003), (I-338)+(2.032)+(3.004), (I-338)+(2.032)+(3.005), (I-338)+(2.032)+(3.006), (I-338)+(2.032)+(3.007), (I-338)+(2.032)+(3.008), (I-338)+(2.032)+(3.009), (I-338)+(2.032)+(3.010), (I-338)+(2.032)+(3.011), (I-338)+(2.032)+(3.012), (I-338)+(2.032)+(3.013), (I-338)+(2.032)+(3.014), (I-338)+(2.032)+(3.015), (I-338)+(2.032)+(3.016), (I-338)+(2.032)+(3.017), (I-338)+(2.032)+(3.018), (I-338)+(2.032)+(3.019), (I-338)+(2.032)+(3.020), (I-338)+(2.032)+(3.021), (I-338)+(2.032)+(3.022), (I-338)+(2.032)+(3.023), (I-338)+(2.032)+(3.024), (I-338)+(2.032)+(3.025), (I-338)+(2.032)+(3.026), (I-338)+(2.032)+(3.027), (I-338)+(2.032)+(3.028), (I-338)+(2.032)+(3.029), (I-338)+(2.032)+(3.030), (I-338)+(2.032)+(3.031), (I-338)+(2.032)+(5.001), (I-338)+(2.032)+(5.002), (I-338)+(2.032)+(5.003), (I-338)+(2.032)+(5.004), (I-338)+(2.032)+(5.005), (I-338)+(2.032)+(5.006), (I-338)+(2.032)+(5.007), (I-338)+(2.032)+(5.008), (I-338)+(2.032)+(5.009), (I-338)+(2.032)+(5.010), (I-338)+(2.032)+(5.011), (I-338)+(2.032)+(5.012), (I-338)+(2.032)+(5.013), (I-338)+(2.032)+(5.014), (I-338)+(2.032)+(5.015), (I-338)+(2.032)+(5.016), (I-338)+(2.032)+(5.017), (I-338)+(2.032)+(5.018), (I-338)+(2.032)+(5.019), (I-338)+(2.032)+(5.020), (I-338)+(2.032)+(5.021), (I-338)+(2.032)+(5.022), (I-338)+(2.032)+(5.023), (I-338)+(2.032)+(6.001), (I-338)+(2.032)+(6.002), (I-338)+(2.032)+(6.003), (I-338)+(2.032)+(6.004), (I-338)+(2.032)+(7.001), (I-338)+(2.032)+(7.002), (I-338)+(2.032)+(7.003), (I-338)+(2.032)+(7.004), (I-338)+(2.032)+(7.005), (I-338)+(2.032)+(7.006), (I-338)+(2.032)+(9.001), (I-338)+(2.032)+(9.002), (I-338)+(2.032)+(9.003), (I-338)+(2.032)+(9.004), (I-338)+(2.032)+(9.005), (I-338)+(2.032)+(9.006), (I-338)+(2.032)+(9.007), (I-338)+(2.032)+(9.008), (I-338)+(2.032)+(9.009), (I-338)+(2.032)+(14.001), (I-338)+(2.032)+(14.002), (I-338)+(2.032)+(15.008), (I-338)+(2.032)+(15.011), (I-338)+(2.032)+(15.012), (I-338)+(2.032)+(15.016), (I-338)+(2.032)+(15.025), (I-338)+(2.032)+(15.027), (I-338)+(2.032)+(15.047), (I-338)+(2.032)+(15.063), (I-338)+(2.032)+(15.064), (I-338)+(2.032)+(16.001), (I-338)+(2.032)+(16.002), (I-338)+(2.032)+(16.003), (I-338)+(2.032)+(16.004), (I-338)+(2.032)+(16.005), (I-338)+(2.032)+(16.006), (I-338)+(2.032)+(16.007), (I-338)+(2.032)+(16.008), (I-338)+(2.032)+(17.001), (I-338)+(2.032)+(17.002), (I-338)+(2.032)+(17.003), (I-338)+(2.032)+(17.004), (I-338)+(2.032)+(17.005), (I-338)+(2.032)+(17.006), (I-338)+(2.032)+(17.007), (I-338)+(2.032)+(17.008), (I-338)+(2.032)+(17.009), (I-338)+(2.032)+(17.010), (I-338)+(2.032)+(17.011), (I-338)+(2.032)+(17.012), (I-338)+(2.032)+(18.001), (I-338)+(2.033)+(3.001), (I-338)+(2.033)+(3.002), (I-338)+(2.033)+(3.003), (I-338)+(2.033)+(3.004), (I-338)+(2.033)+(3.005), (I-338)+(2.033)+(3.006), (I-338)+(2.033)+(3.007), (I-338)+(2.033)+(3.008), (I-338)+(2.033)+(3.009), (I-338)+(2.033)+(3.010), (I-338)+(2.033)+(3.011), (I-338)+(2.033)+(3.012), (I-338)+(2.033)+(3.013), (I-338)+(2.033)+(3.014), (I-338)+(2.033)+(3.015), (I-338)+(2.033)+(3.016), (I-338)+(2.033)+(3.017), (I-338)+(2.033)+(3.018), (I-338)+(2.033)+(3.019), (I-338)+(2.033)+(3.020), (I-338)+(2.033)+(3.021), (I-338)+(2.033)+(3.022), (I-338)+(2.033)+(3.023), (I-338)+(2.033)+(3.024), (I-338)+(2.033)+(3.025), (I-338)+(2.033)+(3.026), (I-338)+(2.033)+(3.027), (I-338)+(2.033)+(3.028), (I-338)+(2.033)+(3.029), (I-338)+(2.033)+(3.030), (I-338)+(2.033)+(3.031), (I-338)+(2.033)+(5.001), (I-338)+(2.033)+(5.002), (I-338)+(2.033)+(5.003), (I-338)+(2.033)+(5.004), (I-338)+(2.033)+(5.005), (I-338)+(2.033)+(5.006), (I-338)+(2.033)+(5.007), (I-338)+(2.033)+(5.008), (I-338)+(2.033)+(5.009), (I-338)+(2.033)+(5.010), (I-338)+(2.033)+(5.011), (I-338)+(2.033)+(5.012), (I-338)+(2.033)+(5.013), (I-338)+(2.033)+(5.014), (I-338)+(2.033)+(5.015), (I-338)+(2.033)+(5.016), (I-338)+(2.033)+(5.017), (I-338)+(2.033)+(5.018), (I-338)+(2.033)+(5.019), (I-338)+(2.033)+(5.020), (I-338)+(2.033)+(5.021), (I-338)+(2.033)+(5.022), (I-338)+(2.033)+(5.023), (I-338)+(2.033)+(6.001), (I-338)+(2.033)+(6.002), (I-338)+(2.033)+(6.003), (I-338)+(2.033)+(6.004), (I-338)+(2.033)+(7.001), (I-338)+(2.033)+(7.002), (I-338)+(2.033)+(7.003), (I-338)+(2.033)+(7.004), (I-338)+(2.033)+(7.005), (I-338)+(2.033)+(7.006), (I-338)+(2.033)+(9.001), (I-338)+(2.033)+(9.002), (I-338)+(2.033)+(9.003), (I-338)+(2.033)+(9.004), (I-338)+(2.033)+(9.005), (I-338)+(2.033)+(9.006), (I-338)+(2.033)+(9.007), (I-338)+(2.033)+(9.008), (I-338)+(2.033)+(9.009), (I-338)+(2.033)+(14.001), (I-338)+(2.033)+(14.002), (I-338)+(2.033)+(15.008), (I-338)+(2.033)+(15.011), (I-338)+(2.033)+(15.012), (I-338)+(2.033)+(15.016), (I-338)+(2.033)+(15.025), (I-338)+(2.033)+(15.027), (I-338)+(2.033)+(15.047), (I-338)+(2.033)+(15.063), (I-338)+(2.033)+(15.064), (I-338)+(2.033)+(16.001), (I-338)+(2.033)+(16.002), (I-338)+(2.033)+(16.003), (I-338)+(2.033)+(16.004), (I-338)+(2.033)+(16.005), (I-338)+(2.033)+(16.006), (I-338)+(2.033)+(16.007), (I-338)+(2.033)+(16.008), (I-338)+(2.033)+(17.001), (I-338)+(2.033)+(17.002), (I-338)+(2.033)+(17.003), (I-338)+(2.033)+(17.004), (I-338)+(2.033)+(17.005), (I-338)+(2.033)+(17.006), (I-338)+(2.033)+(17.007), (I-338)+(2.033)+(17.008), (I-338)+(2.033)+(17.009), (I-338)+(2.033)+(17.010), (I-338)+(2.033)+(17.011), (I-338)+(2.033)+(17.012), (I-338)+(2.033)+(18.001), (I-338)+(2.034)+(3.001), (I-338)+(2.034)+(3.002), (I-338)+(2.034)+(3.003), (I-338)+(2.034)+(3.004), (I-338)+(2.034)+(3.005), (I-338)+(2.034)+(3.006), (I-338)+(2.034)+(3.007), (I-338)+(2.034)+(3.008), (I-338)+(2.034)+(3.009), (I-338)+(2.034)+(3.010), (I-338)+(2.034)+(3.011), (I-338)+(2.034)+(3.012), (I-338)+(2.034)+(3.013), (I-338)+(2.034)+(3.014), (I-338)+(2.034)+(3.015), (I-338)+(2.034)+(3.016), (I-338)+(2.034)+(3.017), (I-338)+(2.034)+(3.018), (I-338)+(2.034)+(3.019), (I-338)+(2.034)+(3.020), (I-338)+(2.034)+(3.021), (I-338)+(2.034)+(3.022), (I-338)+(2.034)+(3.023), (I-338)+(2.034)+(3.024), (I-338)+(2.034)+(3.025), (I-338)+(2.034)+(3.026), (I-338)+(2.034)+(3.027), (I-338)+(2.034)+(3.028), (I-338)+(2.034)+(3.029), (I-338)+(2.034)+(3.030), (I-338)+(2.034)+(3.031), (I-338)+(2.034)+(5.001), (I-338)+(2.034)+(5.002), (I-338)+(2.034)+(5.003), (I-338)+(2.034)+(5.004), (I-338)+(2.034)+(5.005), (I-338)+(2.034)+(5.006), (I-338)+(2.034)+(5.007), (I-338)+(2.034)+(5.008), (I-338)+(2.034)+(5.009), (I-338)+(2.034)+(5.010), (I-338)+(2.034)+(5.011), (I-338)+(2.034)+(5.012), (I-338)+(2.034)+(5.013), (I-338)+(2.034)+(5.014), (I-338)+(2.034)+(5.015), (I-338)+(2.034)+(5.016), (I-338)+(2.034)+(5.017), (I-338)+(2.034)+(5.018), (I-338)+(2.034)+(5.019), (I-338)+(2.034)+(5.020), (I-338)+(2.034)+(5.021), (I-338)+(2.034)+(5.022), (I-338)+(2.034)+(5.023), (I-338)+(2.034)+(6.001), (I-338)+(2.034)+(6.002), (I-338)+(2.034)+(6.003), (I-338)+(2.034)+(6.004), (I-338)+(2.034)+(7.001), (I-338)+(2.034)+(7.002), (I-338)+(2.034)+(7.003), (I-338)+(2.034)+(7.004), (I-338)+(2.034)+(7.005), (I-338)+(2.034)+(7.006), (I-338)+(2.034)+(9.001), (I-338)+(2.034)+(9.002), (I-338)+(2.034)+(9.003), (I-338)+(2.034)+(9.004), (I-338)+(2.034)+(9.005), (I-338)+(2.034)+(9.006), (I-338)+(2.034)+(9.007), (I-338)+(2.034)+(9.008), (I-338)+(2.034)+(9.009), (I-338)+(2.034)+(14.001), (I-338)+(2.034)+(14.002), (I-338)+(2.034)+(15.008), (I-338)+(2.034)+(15.011), (I-338)+(2.034)+(15.012), (I-338)+(2.034)+(15.016), (I-338)+(2.034)+(15.025), (I-338)+(2.034)+(15.027), (I-338)+(2.034)+(15.047), (I-338)+(2.034)+(15.063), (I-338)+(2.034)+(15.064), (I-338)+(2.034)+(16.001), (I-338)+(2.034)+(16.002), (I-338)+(2.034)+(16.003), (I-338)+(2.034)+(16.004), (I-338)+(2.034)+(16.005), (I-338)+(2.034)+(16.006), (I-338)+(2.034)+(16.007), (I-338)+(2.034)+(16.008), (I-338)+(2.034)+(17.001), (I-338)+(2.034)+(17.002), (I-338)+(2.034)+(17.003), (I-338)+(2.034)+(17.004), (I-338)+(2.034)+(17.005), (I-338)+(2.034)+(17.006), (I-338)+(2.034)+(17.007), (I-338)+(2.034)+(17.008), (I-338)+(2.034)+(17.009), (I-338)+(2.034)+(17.010), (I-338)+(2.034)+(17.011), (I-338)+(2.034)+(17.012), (I-338)+(2.034)+(18.001), (I-338)+(2.035)+(3.001), (I-338)+(2.035)+(3.002), (I-338)+(2.035)+(3.003), (I-338)+(2.035)+(3.004), (I-338)+(2.035)+(3.005), (I-338)+(2.035)+(3.006), (I-338)+(2.035)+(3.007), (I-338)+(2.035)+(3.008), (I-338)+(2.035)+(3.009), (I-338)+(2.035)+(3.010), (I-338)+(2.035)+(3.011), (I-338)+(2.035)+(3.012), (I-338)+(2.035)+(3.013), (I-338)+(2.035)+(3.014), (I-338)+(2.035)+(3.015), (I-338)+(2.035)+(3.016), (I-338)+(2.035)+(3.017), (I-338)+(2.035)+(3.018), (I-338)+(2.035)+(3.019), (I-338)+(2.035)+(3.020), (I-338)+(2.035)+(3.021), (I-338)+(2.035)+(3.022), (I-338)+(2.035)+(3.023), (I-338)+(2.035)+(3.024), (I-338)+(2.035)+(3.025), (I-338)+(2.035)+(3.026), (I-338)+(2.035)+(3.027), (I-338)+(2.035)+(3.028), (I-338)+(2.035)+(3.029), (I-338)+(2.035)+(3.030), (I-338)+(2.035)+(3.031), (I-338)+(2.035)+(5.001), (I-338)+(2.035)+(5.002), (I-338)+(2.035)+(5.003), (I-338)+(2.035)+(5.004), (I-338)+(2.035)+(5.005), (I-338)+(2.035)+(5.006), (I-338)+(2.035)+(5.007), (I-338)+(2.035)+(5.008), (I-338)+(2.035)+(5.009), (I-338)+(2.035)+(5.010), (I-338)+(2.035)+(5.011), (I-338)+(2.035)+(5.012), (I-338)+(2.035)+(5.013), (I-338)+(2.035)+(5.014), (I-338)+(2.035)+(5.015), (I-338)+(2.035)+(5.016), (I-338)+(2.035)+(5.017), (I-338)+(2.035)+(5.018), (I-338)+(2.035)+(5.019), (I-338)+(2.035)+(5.020), (I-338)+(2.035)+(5.021), (I-338)+(2.035)+(5.022), (I-338)+(2.035)+(5.023), (I-338)+(2.035)+(6.001), (I-338)+(2.035)+(6.002), (I-338)+(2.035)+(6.003), (I-338)+(2.035)+(6.004), (I-338)+(2.035)+(7.001), (I-338)+(2.035)+(7.002), (I-338)+(2.035)+(7.003), (I-338)+(2.035)+(7.004), (I-338)+(2.035)+(7.005), (I-338)+(2.035)+(7.006), (I-338)+(2.035)+(9.001), (I-338)+(2.035)+(9.002), (I-338)+(2.035)+(9.003), (I-338)+(2.035)+(9.004), (I-338)+(2.035)+(9.005), (I-338)+(2.035)+(9.006), (I-338)+(2.035)+(9.007), (I-338)+(2.035)+(9.008), (I-338)+(2.035)+(9.009), (I-338)+(2.035)+(14.001), (I-338)+(2.035)+(14.002), (I-338)+(2.035)+(15.008), (I-338)+(2.035)+(15.011), (I-338)+(2.035)+(15.012), (I-338)+(2.035)+(15.016), (I-338)+(2.035)+(15.025), (I-338)+(2.035)+(15.027), (I-338)+(2.035)+(15.047), (I-338)+(2.035)+(15.063), (I-338)+(2.035)+(15.064), (I-338)+(2.035)+(16.001), (I-338)+(2.035)+(16.002), (I-338)+(2.035)+(16.003), (I-338)+(2.035)+(16.004), (I-338)+(2.035)+(16.005), (I-338)+(2.035)+(16.006), (I-338)+(2.035)+(16.007), (I-338)+(2.035)+(16.008), (I-338)+(2.035)+(17.001), (I-338)+(2.035)+(17.002), (I-338)+(2.035)+(17.003), (I-338)+(2.035)+(17.004), (I-338)+(2.035)+(17.005), (I-338)+(2.035)+(17.006), (I-338)+(2.035)+(17.007), (I-338)+(2.035)+(17.008), (I-338)+(2.035)+(17.009), (I-338)+(2.035)+(17.010), (I-338)+(2.035)+(17.011), (I-338)+(2.035)+(17.012), (I-338)+(2.035)+(18.001), (I-338)+(2.036)+(3.001), (I-338)+(2.036)+(3.002), (I-338)+(2.036)+(3.003), (I-338)+(2.036)+(3.004), (I-338)+(2.036)+(3.005), (I-338)+(2.036)+(3.006), (I-338)+(2.036)+(3.007), (I-338)+(2.036)+(3.008), (I-338)+(2.036)+(3.009), (I-338)+(2.036)+(3.010), (I-338)+(2.036)+(3.011), (I-338)+(2.036)+(3.012), (I-338)+(2.036)+(3.013), (I-338)+(2.036)+(3.014), (I-338)+(2.036)+(3.015), (I-338)+(2.036)+(3.016), (I-338)+(2.036)+(3.017), (I-338)+(2.036)+(3.018), (I-338)+(2.036)+(3.019), (I-338)+(2.036)+(3.020), (I-338)+(2.036)+(3.021), (I-338)+(2.036)+(3.022), (I-338)+(2.036)+(3.023), (I-338)+(2.036)+(3.024), (I-338)+(2.036)+(3.025), (I-338)+(2.036)+(3.026), (I-338)+(2.036)+(3.027), (I-338)+(2.036)+(3.028), (I-338)+(2.036)+(3.029), (I-338)+(2.036)+(3.030), (I-338)+(2.036)+(3.031), (I-338)+(2.036)+(5.001), (I-338)+(2.036)+(5.002), (I-338)+(2.036)+(5.003), (I-338)+(2.036)+(5.004), (I-338)+(2.036)+(5.005), (I-338)+(2.036)+(5.006), (I-338)+(2.036)+(5.007), (I-338)+(2.036)+(5.008), (I-338)+(2.036)+(5.009), (I-338)+(2.036)+(5.010), (I-338)+(2.036)+(5.011), (I-338)+(2.036)+(5.012), (I-338)+(2.036)+(5.013), (I-338)+(2.036)+(5.014), (I-338)+(2.036)+(5.015), (I-338)+(2.036)+(5.016), (I-338)+(2.036)+(5.017), (I-338)+(2.036)+(5.018), (I-338)+(2.036)+(5.019), (I-338)+(2.036)+(5.020), (I-338)+(2.036)+(5.021), (I-338)+(2.036)+(5.022), (I-338)+(2.036)+(5.023), (I-338)+(2.036)+(6.001), (I-338)+(2.036)+(6.002), (I-338)+(2.036)+(6.003), (I-338)+(2.036)+(6.004), (I-338)+(2.036)+(7.001), (I-338)+(2.036)+(7.002), (I-338)+(2.036)+(7.003), (I-338)+(2.036)+(7.004), (I-338)+(2.036)+(7.005), (I-338)+(2.036)+(7.006), (I-338)+(2.036)+(9.001), (I-338)+(2.036)+(9.002), (I-338)+(2.036)+(9.003), (I-338)+(2.036)+(9.004), (I-338)+(2.036)+(9.005), (I-338)+(2.036)+(9.006), (I-338)+(2.036)+(9.007), (I-338)+(2.036)+(9.008), (I-338)+(2.036)+(9.009), (I-338)+(2.036)+(14.001), (I-338)+(2.036)+(14.002), (I-338)+(2.036)+(15.008), (I-338)+(2.036)+(15.011), (I-338)+(2.036)+(15.012), (I-338)+(2.036)+(15.016), (I-338)+(2.036)+(15.025), (I-338)+(2.036)+(15.027), (I-338)+(2.036)+(15.047), (I-338)+(2.036)+(15.063), (I-338)+(2.036)+(15.064), (I-338)+(2.036)+(16.001), (I-338)+(2.036)+(16.002), (I-338)+(2.036)+(16.003), (I-338)+(2.036)+(16.004), (I-338)+(2.036)+(16.005), (I-338)+(2.036)+(16.006), (I-338)+(2.036)+(16.007), (I-338)+(2.036)+(16.008), (I-338)+(2.036)+(17.001), (I-338)+(2.036)+(17.002), (I-338)+(2.036)+(17.003), (I-338)+(2.036)+(17.004), (I-338)+(2.036)+(17.005), (I-338)+(2.036)+(17.006), (I-338)+(2.036)+(17.007), (I-338)+(2.036)+(17.008), (I-338)+(2.036)+(17.009), (I-338)+(2.036)+(17.010), (I-338)+(2.036)+(17.011), (I-338)+(2.036)+(17.012), (I-338)+(2.036)+(18.001), (I-338)+(2.037)+(3.001), (I-338)+(2.037)+(3.002), (I-338)+(2.037)+(3.003), (I-338)+(2.037)+(3.004), (I-338)+(2.037)+(3.005), (I-338)+(2.037)+(3.006), (I-338)+(2.037)+(3.007), (I-338)+(2.037)+(3.008), (I-338)+(2.037)+(3.009), (I-338)+(2.037)+(3.010), (I-338)+(2.037)+(3.011), (I-338)+(2.037)+(3.012), (I-338)+(2.037)+(3.013), (I-338)+(2.037)+(3.014), (I-338)+(2.037)+(3.015), (I-338)+(2.037)+(3.016), (I-338)+(2.037)+(3.017), (I-338)+(2.037)+(3.018), (I-338)+(2.037)+(3.019), (I-338)+(2.037)+(3.020), (I-338)+(2.037)+(3.021), (I-338)+(2.037)+(3.022), (I-338)+(2.037)+(3.023), (I-338)+(2.037)+(3.024), (I-338)+(2.037)+(3.025), (I-338)+(2.037)+(3.026), (I-338)+(2.037)+(3.027), (I-338)+(2.037)+(3.028), (I-338)+(2.037)+(3.029), (I-338)+(2.037)+(3.030), (I-338)+(2.037)+(3.031), (I-338)+(2.037)+(5.001), (I-338)+(2.037)+(5.002), (I-338)+(2.037)+(5.003), (I-338)+(2.037)+(5.004), (I-338)+(2.037)+(5.005), (I-338)+(2.037)+(5.006), (I-338)+(2.037)+(5.007), (I-338)+(2.037)+(5.008), (I-338)+(2.037)+(5.009), (I-338)+(2.037)+(5.010), (I-338)+(2.037)+(5.011), (I-338)+(2.037)+(5.012), (I-338)+(2.037)+(5.013), (I-338)+(2.037)+(5.014), (I-338)+(2.037)+(5.015), (I-338)+(2.037)+(5.016), (I-338)+(2.037)+(5.017), (I-338)+(2.037)+(5.018), (I-338)+(2.037)+(5.019), (I-338)+(2.037)+(5.020), (I-338)+(2.037)+(5.021), (I-338)+(2.037)+(5.022), (I-338)+(2.037)+(5.023), (I-338)+(2.037)+(6.001), (I-338)+(2.037)+(6.002), (I-338)+(2.037)+(6.003), (I-338)+(2.037)+(6.004), (I-338)+(2.037)+(7.001), (I-338)+(2.037)+(7.002), (I-338)+(2.037)+(7.003), (I-338)+(2.037)+(7.004), (I-338)+(2.037)+(7.005), (I-338)+(2.037)+(7.006), (I-338)+(2.037)+(9.001), (I-338)+(2.037)+(9.002), (I-338)+(2.037)+(9.003), (I-338)+(2.037)+(9.004), (I-338)+(2.037)+(9.005), (I-338)+(2.037)+(9.006), (I-338)+(2.037)+(9.007), (I-338)+(2.037)+(9.008), (I-338)+(2.037)+(9.009), (I-338)+(2.037)+(14.001), (I-338)+(2.037)+(14.002), (I-338)+(2.037)+(15.008), (I-338)+(2.037)+(15.011), (I-338)+(2.037)+(15.012), (I-338)+(2.037)+(15.016), (I-338)+(2.037)+(15.025), (I-338)+(2.037)+(15.027), (I-338)+(2.037)+(15.047), (I-338)+(2.037)+(15.063), (I-338)+(2.037)+(15.064), (I-338)+(2.037)+(16.001), (I-338)+(2.037)+(16.002), (I-338)+(2.037)+(16.003), (I-338)+(2.037)+(16.004), (I-338)+(2.037)+(16.005), (I-338)+(2.037)+(16.006), (I-338)+(2.037)+(16.007), (I-338)+(2.037)+(16.008), (I-338)+(2.037)+(17.001), (I-338)+(2.037)+(17.002), (I-338)+(2.037)+(17.003), (I-338)+(2.037)+(17.004), (I-338)+(2.037)+(17.005), (I-338)+(2.037)+(17.006), (I-338)+(2.037)+(17.007), (I-338)+(2.037)+(17.008), (I-338)+(2.037)+(17.009), (I-338)+(2.037)+(17.010), (I-338)+(2.037)+(17.011), (I-338)+(2.037)+(17.012), (I-338)+(2.037)+(18.001), (I-338)+(2.038)+(3.001), (I-338)+(2.038)+(3.002), (I-338)+(2.038)+(3.003), (I-338)+(2.038)+(3.004), (I-338)+(2.038)+(3.005), (I-338)+(2.038)+(3.006), (I-338)+(2.038)+(3.007), (I-338)+(2.038)+(3.008), (I-338)+(2.038)+(3.009), (I-338)+(2.038)+(3.010), (I-338)+(2.038)+(3.011), (I-338)+(2.038)+(3.012), (I-338)+(2.038)+(3.013), (I-338)+(2.038)+(3.014), (I-338)+(2.038)+(3.015), (I-338)+(2.038)+(3.016), (I-338)+(2.038)+(3.017), (I-338)+(2.038)+(3.018), (I-338)+(2.038)+(3.019), (I-338)+(2.038)+(3.020), (I-338)+(2.038)+(3.021), (I-338)+(2.038)+(3.022), (I-338)+(2.038)+(3.023), (I-338)+(2.038)+(3.024), (I-338)+(2.038)+(3.025), (I-338)+(2.038)+(3.026), (I-338)+(2.038)+(3.027), (I-338)+(2.038)+(3.028), (I-338)+(2.038)+(3.029), (I-338)+(2.038)+(3.030), (I-338)+(2.038)+(3.031), (I-338)+(2.038)+(5.001), (I-338)+(2.038)+(5.002), (I-338)+(2.038)+(5.003), (I-338)+(2.038)+(5.004), (I-338)+(2.038)+(5.005), (I-338)+(2.038)+(5.006), (I-338)+(2.038)+(5.007), (I-338)+(2.038)+(5.008), (I-338)+(2.038)+(5.009), (I-338)+(2.038)+(5.010), (I-338)+(2.038)+(5.011), (I-338)+(2.038)+(5.012), (I-338)+(2.038)+(5.013), (I-338)+(2.038)+(5.014), (I-338)+(2.038)+(5.015), (I-338)+(2.038)+(5.016), (I-338)+(2.038)+(5.017), (I-338)+(2.038)+(5.018), (I-338)+(2.038)+(5.019), (I-338)+(2.038)+(5.020), (I-338)+(2.038)+(5.021), (I-338)+(2.038)+(5.022), (I-338)+(2.038)+(5.023), (I-338)+(2.038)+(6.001), (I-338)+(2.038)+(6.002), (I-338)+(2.038)+(6.003), (I-338)+(2.038)+(6.004), (I-338)+(2.038)+(7.001), (I-338)+(2.038)+(7.002), (I-338)+(2.038)+(7.003), (I-338)+(2.038)+(7.004), (I-338)+(2.038)+(7.005), (I-338)+(2.038)+(7.006), (I-338)+(2.038)+(9.001), (I-338)+(2.038)+(9.002), (I-338)+(2.038)+(9.003), (I-338)+(2.038)+(9.004), (I-338)+(2.038)+(9.005), (I-338)+(2.038)+(9.006), (I-338)+(2.038)+(9.007), (I-338)+(2.038)+(9.008), (I-338)+(2.038)+(9.009), (I-338)+(2.038)+(14.001), (I-338)+(2.038)+(14.002), (I-338)+(2.038)+(15.008), (I-338)+(2.038)+(15.011), (I-338)+(2.038)+(15.012), (I-338)+(2.038)+(15.016), (I-338)+(2.038)+(15.025), (I-338)+(2.038)+(15.027), (I-338)+(2.038)+(15.047), (I-338)+(2.038)+(15.063), (I-338)+(2.038)+(15.064), (I-338)+(2.038)+(16.001), (I-338)+(2.038)+(16.002), (I-338)+(2.038)+(16.003), (I-338)+(2.038)+(16.004), (I-338)+(2.038)+(16.005), (I-338)+(2.038)+(16.006), (I-338)+(2.038)+(16.007), (I-338)+(2.038)+(16.008), (I-338)+(2.038)+(17.001), (I-338)+(2.038)+(17.002), (I-338)+(2.038)+(17.003), (I-338)+(2.038)+(17.004), (I-338)+(2.038)+(17.005), (I-338)+(2.038)+(17.006), (I-338)+(2.038)+(17.007), (I-338)+(2.038)+(17.008), (I-338)+(2.038)+(17.009), (I-338)+(2.038)+(17.010), (I-338)+(2.038)+(17.011), (I-338)+(2.038)+(17.012), (I-338)+(2.038)+(18.001), (I-338)+(2.039)+(3.001), (I-338)+(2.039)+(3.002), (I-338)+(2.039)+(3.003), (I-338)+(2.039)+(3.004), (I-338)+(2.039)+(3.005), (I-338)+(2.039)+(3.006), (I-338)+(2.039)+(3.007), (I-338)+(2.039)+(3.008), (I-338)+(2.039)+(3.009), (I-338)+(2.039)+(3.010), (I-338)+(2.039)+(3.011), (I-338)+(2.039)+(3.012), (I-338)+(2.039)+(3.013), (I-338)+(2.039)+(3.014), (I-338)+(2.039)+(3.015), (I-338)+(2.039)+(3.016), (I-338)+(2.039)+(3.017), (I-338)+(2.039)+(3.018), (I-338)+(2.039)+(3.019), (I-338)+(2.039)+(3.020), (I-338)+(2.039)+(3.021), (I-338)+(2.039)+(3.022), (I-338)+(2.039)+(3.023), (I-338)+(2.039)+(3.024), (I-338)+(2.039)+(3.025), (I-338)+(2.039)+(3.026), (I-338)+(2.039)+(3.027), (I-338)+(2.039)+(3.028), (I-338)+(2.039)+(3.029), (I-338)+(2.039)+(3.030), (I-338)+(2.039)+(3.031), (I-338)+(2.039)+(5.001), (I-338)+(2.039)+(5.002), (I-338)+(2.039)+(5.003), (I-338)+(2.039)+(5.004), (I-338)+(2.039)+(5.005), (I-338)+(2.039)+(5.006), (I-338)+(2.039)+(5.007), (I-338)+(2.039)+(5.008), (I-338)+(2.039)+(5.009), (I-338)+(2.039)+(5.010), (I-338)+(2.039)+(5.011), (I-338)+(2.039)+(5.012), (I-338)+(2.039)+(5.013), (I-338)+(2.039)+(5.014), (I-338)+(2.039)+(5.015), (I-338)+(2.039)+(5.016), (I-338)+(2.039)+(5.017), (I-338)+(2.039)+(5.018), (I-338)+(2.039)+(5.019), (I-338)+(2.039)+(5.020), (I-338)+(2.039)+(5.021), (I-338)+(2.039)+(5.022), (I-338)+(2.039)+(5.023), (I-338)+(2.039)+(6.001), (I-338)+(2.039)+(6.002), (I-338)+(2.039)+(6.003), (I-338)+(2.039)+(6.004), (I-338)+(2.039)+(7.001), (I-338)+(2.039)+(7.002), (I-338)+(2.039)+(7.003), (I-338)+(2.039)+(7.004), (I-338)+(2.039)+(7.005), (I-338)+(2.039)+(7.006), (I-338)+(2.039)+(9.001), (I-338)+(2.039)+(9.002), (I-338)+(2.039)+(9.003), (I-338)+(2.039)+(9.004), (I-338)+(2.039)+(9.005), (I-338)+(2.039)+(9.006), (I-338)+(2.039)+(9.007), (I-338)+(2.039)+(9.008), (I-338)+(2.039)+(9.009), (I-338)+(2.039)+(14.001), (I-338)+(2.039)+(14.002), (I-338)+(2.039)+(15.008), (I-338)+(2.039)+(15.011), (I-338)+(2.039)+(15.012), (I-338)+(2.039)+(15.016), (I-338)+(2.039)+(15.025), (I-338)+(2.039)+(15.027), (I-338)+(2.039)+(15.047), (I-338)+(2.039)+(15.063), (I-338)+(2.039)+(15.064), (I-338)+(2.039)+(16.001), (I-338)+(2.039)+(16.002), (I-338)+(2.039)+(16.003), (I-338)+(2.039)+(16.004), (I-338)+(2.039)+(16.005), (I-338)+(2.039)+(16.006), (I-338)+(2.039)+(16.007), (I-338)+(2.039)+(16.008), (I-338)+(2.039)+(17.001), (I-338)+(2.039)+(17.002), (I-338)+(2.039)+(17.003), (I-338)+(2.039)+(17.004), (I-338)+(2.039)+(17.005), (I-338)+(2.039)+(17.006), (I-338)+(2.039)+(17.007), (I-338)+(2.039)+(17.008), (I-338)+(2.039)+(17.009), (I-338)+(2.039)+(17.010), (I-338)+(2.039)+(17.011), (I-338)+(2.039)+(17.012), (I-338)+(2.039)+(18.001), (I-338)+(2.040)+(3.001), (I-338)+(2.040)+(3.002), (I-338)+(2.040)+(3.003), (I-338)+(2.040)+(3.004), (I-338)+(2.040)+(3.005), (I-338)+(2.040)+(3.006), (I-338)+(2.040)+(3.007), (I-338)+(2.040)+(3.008), (I-338)+(2.040)+(3.009), (I-338)+(2.040)+(3.010), (I-338)+(2.040)+(3.011), (I-338)+(2.040)+(3.012), (I-338)+(2.040)+(3.013), (I-338)+(2.040)+(3.014), (I-338)+(2.040)+(3.015), (I-338)+(2.040)+(3.016), (I-338)+(2.040)+(3.017), (I-338)+(2.040)+(3.018), (I-338)+(2.040)+(3.019), (I-338)+(2.040)+(3.020), (I-338)+(2.040)+(3.021), (I-338)+(2.040)+(3.022), (I-338)+(2.040)+(3.023), (I-338)+(2.040)+(3.024), (I-338)+(2.040)+(3.025), (I-338)+(2.040)+(3.026), (I-338)+(2.040)+(3.027), (I-338)+(2.040)+(3.028), (I-338)+(2.040)+(3.029), (I-338)+(2.040)+(3.030), (I-338)+(2.040)+(3.031), (I-338)+(2.040)+(5.001), (I-338)+(2.040)+(5.002), (I-338)+(2.040)+(5.003), (I-338)+(2.040)+(5.004), (I-338)+(2.040)+(5.005), (I-338)+(2.040)+(5.006), (I-338)+(2.040)+(5.007), (I-338)+(2.040)+(5.008), (I-338)+(2.040)+(5.009), (I-338)+(2.040)+(5.010), (I-338)+(2.040)+(5.011), (I-338)+(2.040)+(5.012), (I-338)+(2.040)+(5.013), (I-338)+(2.040)+(5.014), (I-338)+(2.040)+(5.015), (I-338)+(2.040)+(5.016), (I-338)+(2.040)+(5.017), (I-338)+(2.040)+(5.018), (I-338)+(2.040)+(5.019), (I-338)+(2.040)+(5.020), (I-338)+(2.040)+(5.021), (I-338)+(2.040)+(5.022), (I-338)+(2.040)+(5.023), (I-338)+(2.040)+(6.001), (I-338)+(2.040)+(6.002), (I-338)+(2.040)+(6.003), (I-338)+(2.040)+(6.004), (I-338)+(2.040)+(7.001), (I-338)+(2.040)+(7.002), (I-338)+(2.040)+(7.003), (I-338)+(2.040)+(7.004), (I-338)+(2.040)+(7.005), (I-338)+(2.040)+(7.006), (I-338)+(2.040)+(9.001), (I-338)+(2.040)+(9.002), (I-338)+(2.040)+(9.003), (I-338)+(2.040)+(9.004), (I-338)+(2.040)+(9.005), (I-338)+(2.040)+(9.006), (I-338)+(2.040)+(9.007), (I-338)+(2.040)+(9.008), (I-338)+(2.040)+(9.009), (I-338)+(2.040)+(14.001), (I-338)+(2.040)+(14.002), (I-338)+(2.040)+(15.008), (I-338)+(2.040)+(15.011), (I-338)+(2.040)+(15.012), (I-338)+(2.040)+(15.016), (I-338)+(2.040)+(15.025), (I-338)+(2.040)+(15.027), (I-338)+(2.040)+(15.047), (I-338)+(2.040)+(15.063), (I-338)+(2.040)+(15.064), (I-338)+(2.040)+(16.001), (I-338)+(2.040)+(16.002), (I-338)+(2.040)+(16.003), (I-338)+(2.040)+(16.004), (I-338)+(2.040)+(16.005), (I-338)+(2.040)+(16.006), (I-338)+(2.040)+(16.007), (I-338)+(2.040)+(16.008), (I-338)+(2.040)+(17.001), (I-338)+(2.040)+(17.002), (I-338)+(2.040)+(17.003), (I-338)+(2.040)+(17.004), (I-338)+(2.040)+(17.005), (I-338)+(2.040)+(17.006), (I-338)+(2.040)+(17.007), (I-338)+(2.040)+(17.008), (I-338)+(2.040)+(17.009), (I-338)+(2.040)+(17.010), (I-338)+(2.040)+(17.011), (I-338)+(2.040)+(17.012), (I-338)+(2.040)+(18.001), (I-338)+(2.041)+(3.001), (I-338)+(2.041)+(3.002), (I-338)+(2.041)+(3.003), (I-338)+(2.041)+(3.004), (I-338)+(2.041)+(3.005), (I-338)+(2.041)+(3.006), (I-338)+(2.041)+(3.007), (I-338)+(2.041)+(3.008), (I-338)+(2.041)+(3.009), (I-338)+(2.041)+(3.010), (I-338)+(2.041)+(3.011), (I-338)+(2.041)+(3.012), (I-338)+(2.041)+(3.013), (I-338)+(2.041)+(3.014), (I-338)+(2.041)+(3.015), (I-338)+(2.041)+(3.016), (I-338)+(2.041)+(3.017), (I-338)+(2.041)+(3.018), (I-338)+(2.041)+(3.019), (I-338)+(2.041)+(3.020), (I-338)+(2.041)+(3.021), (I-338)+(2.041)+(3.022), (I-338)+(2.041)+(3.023), (I-338)+(2.041)+(3.024), (I-338)+(2.041)+(3.025), (I-338)+(2.041)+(3.026), (I-338)+(2.041)+(3.027), (I-338)+(2.041)+(3.028), (I-338)+(2.041)+(3.029), (I-338)+(2.041)+(3.030), (I-338)+(2.041)+(3.031), (I-338)+(2.041)+(5.001), (I-338)+(2.041)+(5.002), (I-338)+(2.041)+(5.003), (I-338)+(2.041)+(5.004), (I-338)+(2.041)+(5.005), (I-338)+(2.041)+(5.006), (I-338)+(2.041)+(5.007), (I-338)+(2.041)+(5.008), (I-338)+(2.041)+(5.009), (I-338)+(2.041)+(5.010), (I-338)+(2.041)+(5.011), (I-338)+(2.041)+(5.012), (I-338)+(2.041)+(5.013), (I-338)+(2.041)+(5.014), (I-338)+(2.041)+(5.015), (I-338)+(2.041)+(5.016), (I-338)+(2.041)+(5.017), (I-338)+(2.041)+(5.018), (I-338)+(2.041)+(5.019), (I-338)+(2.041)+(5.020), (I-338)+(2.041)+(5.021), (I-338)+(2.041)+(5.022), (I-338)+(2.041)+(5.023), (I-338)+(2.041)+(6.001), (I-338)+(2.041)+(6.002), (I-338)+(2.041)+(6.003), (I-338)+(2.041)+(6.004), (I-338)+(2.041)+(7.001), (I-338)+(2.041)+(7.002), (I-338)+(2.041)+(7.003), (I-338)+(2.041)+(7.004), (I-338)+(2.041)+(7.005), (I-338)+(2.041)+(7.006), (I-338)+(2.041)+(9.001), (I-338)+(2.041)+(9.002), (I-338)+(2.041)+(9.003), (I-338)+(2.041)+(9.004), (I-338)+(2.041)+(9.005), (I-338)+(2.041)+(9.006), (I-338)+(2.041)+(9.007), (I-338)+(2.041)+(9.008), (I-338)+(2.041)+(9.009), (I-338)+(2.041)+(14.001), (I-338)+(2.041)+(14.002), (I-338)+(2.041)+(15.008), (I-338)+(2.041)+(15.011), (I-338)+(2.041)+(15.012), (I-338)+(2.041)+(15.016), (I-338)+(2.041)+(15.025), (I-338)+(2.041)+(15.027), (I-338)+(2.041)+(15.047), (I-338)+(2.041)+(15.063), (I-338)+(2.041)+(15.064), (I-338)+(2.041)+(16.001), (I-338)+(2.041)+(16.002), (I-338)+(2.041)+(16.003), (I-338)+(2.041)+(16.004), (I-338)+(2.041)+(16.005), (I-338)+(2.041)+(16.006), (I-338)+(2.041)+(16.007), (I-338)+(2.041)+(16.008), (I-338)+(2.041)+(17.001), (I-338)+(2.041)+(17.002), (I-338)+(2.041)+(17.003), (I-338)+(2.041)+(17.004), (I-338)+(2.041)+(17.005), (I-338)+(2.041)+(17.006), (I-338)+(2.041)+(17.007), (I-338)+(2.041)+(17.008), (I-338)+(2.041)+(17.009), (I-338)+(2.041)+(17.010), (I-338)+(2.041)+(17.011), (I-338)+(2.041)+(17.012), (I-338)+(2.041)+(18.001), (I-338)+(2.042)+(3.001), (I-338)+(2.042)+(3.002), (I-338)+(2.042)+(3.003), (I-338)+(2.042)+(3.004), (I-338)+(2.042)+(3.005), (I-338)+(2.042)+(3.006), (I-338)+(2.042)+(3.007), (I-338)+(2.042)+(3.008), (I-338)+(2.042)+(3.009), (I-338)+(2.042)+(3.010), (I-338)+(2.042)+(3.011), (I-338)+(2.042)+(3.012), (I-338)+(2.042)+(3.013), (I-338)+(2.042)+(3.014), (I-338)+(2.042)+(3.015), (I-338)+(2.042)+(3.016), (I-338)+(2.042)+(3.017), (I-338)+(2.042)+(3.018), (I-338)+(2.042)+(3.019), (I-338)+(2.042)+(3.020), (I-338)+(2.042)+(3.021), (I-338)+(2.042)+(3.022), (I-338)+(2.042)+(3.023), (I-338)+(2.042)+(3.024), (I-338)+(2.042)+(3.025), (I-338)+(2.042)+(3.026), (I-338)+(2.042)+(3.027), (I-338)+(2.042)+(3.028), (I-338)+(2.042)+(3.029), (I-338)+(2.042)+(3.030), (I-338)+(2.042)+(3.031), (I-338)+(2.042)+(5.001), (I-338)+(2.042)+(5.002), (I-338)+(2.042)+(5.003), (I-338)+(2.042)+(5.004), (I-338)+(2.042)+(5.005), (I-338)+(2.042)+(5.006), (I-338)+(2.042)+(5.007), (I-338)+(2.042)+(5.008), (I-338)+(2.042)+(5.009), (I-338)+(2.042)+(5.010), (I-338)+(2.042)+(5.011), (I-338)+(2.042)+(5.012), (I-338)+(2.042)+(5.013), (I-338)+(2.042)+(5.014), (I-338)+(2.042)+(5.015), (I-338)+(2.042)+(5.016), (I-338)+(2.042)+(5.017), (I-338)+(2.042)+(5.018), (I-338)+(2.042)+(5.019), (I-338)+(2.042)+(5.020), (I-338)+(2.042)+(5.021), (I-338)+(2.042)+(5.022), (I-338)+(2.042)+(5.023), (I-338)+(2.042)+(6.001), (I-338)+(2.042)+(6.002), (I-338)+(2.042)+(6.003), (I-338)+(2.042)+(6.004), (I-338)+(2.042)+(7.001), (I-338)+(2.042)+(7.002), (I-338)+(2.042)+(7.003), (I-338)+(2.042)+(7.004), (I-338)+(2.042)+(7.005), (I-338)+(2.042)+(7.006), (I-338)+(2.042)+(9.001), (I-338)+(2.042)+(9.002), (I-338)+(2.042)+(9.003), (I-338)+(2.042)+(9.004), (I-338)+(2.042)+(9.005), (I-338)+(2.042)+(9.006), (I-338)+(2.042)+(9.007), (I-338)+(2.042)+(9.008), (I-338)+(2.042)+(9.009), (I-338)+(2.042)+(14.001), (I-338)+(2.042)+(14.002), (I-338)+(2.042)+(15.008), (I-338)+(2.042)+(15.011), (I-338)+(2.042)+(15.012), (I-338)+(2.042)+(15.016), (I-338)+(2.042)+(15.025), (I-338)+(2.042)+(15.027), (I-338)+(2.042)+(15.047), (I-338)+(2.042)+(15.063), (I-338)+(2.042)+(15.064), (I-338)+(2.042)+(16.001), (I-338)+(2.042)+(16.002), (I-338)+(2.042)+(16.003), (I-338)+(2.042)+(16.004), (I-338)+(2.042)+(16.005), (I-338)+(2.042)+(16.006), (I-338)+(2.042)+(16.007), (I-338)+(2.042)+(16.008), (I-338)+(2.042)+(17.001), (I-338)+(2.042)+(17.002), (I-338)+(2.042)+(17.003), (I-338)+(2.042)+(17.004), (I-338)+(2.042)+(17.005), (I-338)+(2.042)+(17.006), (I-338)+(2.042)+(17.007), (I-338)+(2.042)+(17.008), (I-338)+(2.042)+(17.009), (I-338)+(2.042)+(17.010), (I-338)+(2.042)+(17.011), (I-338)+(2.042)+(17.012), (I-338)+(2.042)+(18.001), (I-338)+(2.043)+(3.001), (I-338)+(2.043)+(3.002), (I-338)+(2.043)+(3.003), (I-338)+(2.043)+(3.004), (I-338)+(2.043)+(3.005), (I-338)+(2.043)+(3.006), (I-338)+(2.043)+(3.007), (I-338)+(2.043)+(3.008), (I-338)+(2.043)+(3.009), (I-338)+(2.043)+(3.010), (I-338)+(2.043)+(3.011), (I-338)+(2.043)+(3.012), (I-338)+(2.043)+(3.013), (I-338)+(2.043)+(3.014), (I-338)+(2.043)+(3.015), (I-338)+(2.043)+(3.016), (I-338)+(2.043)+(3.017), (I-338)+(2.043)+(3.018), (I-338)+(2.043)+(3.019), (I-338)+(2.043)+(3.020), (I-338)+(2.043)+(3.021), (I-338)+(2.043)+(3.022), (I-338)+(2.043)+(3.023), (I-338)+(2.043)+(3.024), (I-338)+(2.043)+(3.025), (I-338)+(2.043)+(3.026), (I-338)+(2.043)+(3.027), (I-338)+(2.043)+(3.028), (I-338)+(2.043)+(3.029), (I-338)+(2.043)+(3.030), (I-338)+(2.043)+(3.031), (I-338)+(2.043)+(5.001), (I-338)+(2.043)+(5.002), (I-338)+(2.043)+(5.003), (I-338)+(2.043)+(5.004), (I-338)+(2.043)+(5.005), (I-338)+(2.043)+(5.006), (I-338)+(2.043)+(5.007), (I-338)+(2.043)+(5.008), (I-338)+(2.043)+(5.009), (I-338)+(2.043)+(5.010), (I-338)+(2.043)+(5.011), (I-338)+(2.043)+(5.012), (I-338)+(2.043)+(5.013), (I-338)+(2.043)+(5.014), (I-338)+(2.043)+(5.015), (I-338)+(2.043)+(5.016), (I-338)+(2.043)+(5.017), (I-338)+(2.043)+(5.018), (I-338)+(2.043)+(5.019), (I-338)+(2.043)+(5.020), (I-338)+(2.043)+(5.021), (I-338)+(2.043)+(5.022), (I-338)+(2.043)+(5.023), (I-338)+(2.043)+(6.001), (I-338)+(2.043)+(6.002), (I-338)+(2.043)+(6.003), (I-338)+(2.043)+(6.004), (I-338)+(2.043)+(7.001), (I-338)+(2.043)+(7.002), (I-338)+(2.043)+(7.003), (I-338)+(2.043)+(7.004), (I-338)+(2.043)+(7.005), (I-338)+(2.043)+(7.006), (I-338)+(2.043)+(9.001), (I-338)+(2.043)+(9.002), (I-338)+(2.043)+(9.003), (I-338)+(2.043)+(9.004), (I-338)+(2.043)+(9.005), (I-338)+(2.043)+(9.006), (I-338)+(2.043)+(9.007), (I-338)+(2.043)+(9.008), (I-338)+(2.043)+(9.009), (I-338)+(2.043)+(14.001), (I-338)+(2.043)+(14.002), (I-338)+(2.043)+(15.008), (I-338)+(2.043)+(15.011), (I-338)+(2.043)+(15.012), (I-338)+(2.043)+(15.016), (I-338)+(2.043)+(15.025), (I-338)+(2.043)+(15.027), (I-338)+(2.043)+(15.047), (I-338)+(2.043)+(15.063), (I-338)+(2.043)+(15.064), (I-338)+(2.043)+(16.001), (I-338)+(2.043)+(16.002), (I-338)+(2.043)+(16.003), (I-338)+(2.043)+(16.004), (I-338)+(2.043)+(16.005), (I-338)+(2.043)+(16.006), (I-338)+(2.043)+(16.007), (I-338)+(2.043)+(16.008), (I-338)+(2.043)+(17.001), (I-338)+(2.043)+(17.002), (I-338)+(2.043)+(17.003), (I-338)+(2.043)+(17.004), (I-338)+(2.043)+(17.005), (I-338)+(2.043)+(17.006), (I-338)+(2.043)+(17.007), (I-338)+(2.043)+(17.008), (I-338)+(2.043)+(17.009), (I-338)+(2.043)+(17.010), (I-338)+(2.043)+(17.011), (I-338)+(2.043)+(17.012), (I-338)+(2.043)+(18.001), (I-338)+(2.044)+(3.001), (I-338)+(2.044)+(3.002), (I-338)+(2.044)+(3.003), (I-338)+(2.044)+(3.004), (I-338)+(2.044)+(3.005), (I-338)+(2.044)+(3.006), (I-338)+(2.044)+(3.007), (I-338)+(2.044)+(3.008), (I-338)+(2.044)+(3.009), (I-338)+(2.044)+(3.010), (I-338)+(2.044)+(3.011), (I-338)+(2.044)+(3.012), (I-338)+(2.044)+(3.013), (I-338)+(2.044)+(3.014), (I-338)+(2.044)+(3.015), (I-338)+(2.044)+(3.016), (I-338)+(2.044)+(3.017), (I-338)+(2.044)+(3.018), (I-338)+(2.044)+(3.019), (I-338)+(2.044)+(3.020), (I-338)+(2.044)+(3.021), (I-338)+(2.044)+(3.022), (I-338)+(2.044)+(3.023), (I-338)+(2.044)+(3.024), (I-338)+(2.044)+(3.025), (I-338)+(2.044)+(3.026), (I-338)+(2.044)+(3.027), (I-338)+(2.044)+(3.028), (I-338)+(2.044)+(3.029), (I-338)+(2.044)+(3.030), (I-338)+(2.044)+(3.031), (I-338)+(2.044)+(5.001), (I-338)+(2.044)+(5.002), (I-338)+(2.044)+(5.003), (I-338)+(2.044)+(5.004), (I-338)+(2.044)+(5.005), (I-338)+(2.044)+(5.006), (I-338)+(2.044)+(5.007), (I-338)+(2.044)+(5.008), (I-338)+(2.044)+(5.009), (I-338)+(2.044)+(5.010), (I-338)+(2.044)+(5.011), (I-338)+(2.044)+(5.012), (I-338)+(2.044)+(5.013), (I-338)+(2.044)+(5.014), (I-338)+(2.044)+(5.015), (I-338)+(2.044)+(5.016), (I-338)+(2.044)+(5.017), (I-338)+(2.044)+(5.018), (I-338)+(2.044)+(5.019), (I-338)+(2.044)+(5.020), (I-338)+(2.044)+(5.021), (I-338)+(2.044)+(5.022), (I-338)+(2.044)+(5.023), (I-338)+(2.044)+(6.001), (I-338)+(2.044)+(6.002), (I-338)+(2.044)+(6.003), (I-338)+(2.044)+(6.004), (I-338)+(2.044)+(7.001), (I-338)+(2.044)+(7.002), (I-338)+(2.044)+(7.003), (I-338)+(2.044)+(7.004), (I-338)+(2.044)+(7.005), (I-338)+(2.044)+(7.006), (I-338)+(2.044)+(9.001), (I-338)+(2.044)+(9.002), (I-338)+(2.044)+(9.003), (I-338)+(2.044)+(9.004), (I-338)+(2.044)+(9.005), (I-338)+(2.044)+(9.006), (I-338)+(2.044)+(9.007), (I-338)+(2.044)+(9.008), (I-338)+(2.044)+(9.009), (I-338)+(2.044)+(14.001), (I-338)+(2.044)+(14.002), (I-338)+(2.044)+(15.008), (I-338)+(2.044)+(15.011), (I-338)+(2.044)+(15.012), (I-338)+(2.044)+(15.016), (I-338)+(2.044)+(15.025), (I-338)+(2.044)+(15.027), (I-338)+(2.044)+(15.047), (I-338)+(2.044)+(15.063), (I-338)+(2.044)+(15.064), (I-338)+(2.044)+(16.001), (I-338)+(2.044)+(16.002), (I-338)+(2.044)+(16.003), (I-338)+(2.044)+(16.004), (I-338)+(2.044)+(16.005), (I-338)+(2.044)+(16.006), (I-338)+(2.044)+(16.007), (I-338)+(2.044)+(16.008), (I-338)+(2.044)+(17.001), (I-338)+(2.044)+(17.002), (I-338)+(2.044)+(17.003), (I-338)+(2.044)+(17.004), (I-338)+(2.044)+(17.005), (I-338)+(2.044)+(17.006), (I-338)+(2.044)+(17.007), (I-338)+(2.044)+(17.008), (I-338)+(2.044)+(17.009), (I-338)+(2.044)+(17.010), (I-338)+(2.044)+(17.011), (I-338)+(2.044)+(17.012), (I-338)+(2.044)+(18.001), (I-338)+(2.045)+(3.001), (I-338)+(2.045)+(3.002), (I-338)+(2.045)+(3.003), (I-338)+(2.045)+(3.004), (I-338)+(2.045)+(3.005), (I-338)+(2.045)+(3.006), (I-338)+(2.045)+(3.007), (I-338)+(2.045)+(3.008), (I-338)+(2.045)+(3.009), (I-338)+(2.045)+(3.010), (I-338)+(2.045)+(3.011), (I-338)+(2.045)+(3.012), (I-338)+(2.045)+(3.013), (I-338)+(2.045)+(3.014), (I-338)+(2.045)+(3.015), (I-338)+(2.045)+(3.016), (I-338)+(2.045)+(3.017), (I-338)+(2.045)+(3.018), (I-338)+(2.045)+(3.019), (I-338)+(2.045)+(3.020), (I-338)+(2.045)+(3.021), (I-338)+(2.045)+(3.022), (I-338)+(2.045)+(3.023), (I-338)+(2.045)+(3.024), (I-338)+(2.045)+(3.025), (I-338)+(2.045)+(3.026), (I-338)+(2.045)+(3.027), (I-338)+(2.045)+(3.028), (I-338)+(2.045)+(3.029), (I-338)+(2.045)+(3.030), (I-338)+(2.045)+(3.031), (I-338)+(2.045)+(5.001), (I-338)+(2.045)+(5.002), (I-338)+(2.045)+(5.003), (I-338)+(2.045)+(5.004), (I-338)+(2.045)+(5.005), (I-338)+(2.045)+(5.006), (I-338)+(2.045)+(5.007), (I-338)+(2.045)+(5.008), (I-338)+(2.045)+(5.009), (I-338)+(2.045)+(5.010), (I-338)+(2.045)+(5.011), (I-338)+(2.045)+(5.012), (I-338)+(2.045)+(5.013), (I-338)+(2.045)+(5.014), (I-338)+(2.045)+(5.015), (I-338)+(2.045)+(5.016), (I-338)+(2.045)+(5.017), (I-338)+(2.045)+(5.018), (I-338)+(2.045)+(5.019), (I-338)+(2.045)+(5.020), (I-338)+(2.045)+(5.021), (I-338)+(2.045)+(5.022), (I-338)+(2.045)+(5.023), (I-338)+(2.045)+(6.001), (I-338)+(2.045)+(6.002), (I-338)+(2.045)+(6.003), (I-338)+(2.045)+(6.004), (I-338)+(2.045)+(7.001), (I-338)+(2.045)+(7.002), (I-338)+(2.045)+(7.003), (I-338)+(2.045)+(7.004), (I-338)+(2.045)+(7.005), (I-338)+(2.045)+(7.006), (I-338)+(2.045)+(9.001), (I-338)+(2.045)+(9.002), (I-338)+(2.045)+(9.003), (I-338)+(2.045)+(9.004), (I-338)+(2.045)+(9.005), (I-338)+(2.045)+(9.006), (I-338)+(2.045)+(9.007), (I-338)+(2.045)+(9.008), (I-338)+(2.045)+(9.009), (I-338)+(2.045)+(14.001), (I-338)+(2.045)+(14.002), (I-338)+(2.045)+(15.008), (I-338)+(2.045)+(15.011), (I-338)+(2.045)+(15.012), (I-338)+(2.045)+(15.016), (I-338)+(2.045)+(15.025), (I-338)+(2.045)+(15.027), (I-338)+(2.045)+(15.047), (I-338)+(2.045)+(15.063), (I-338)+(2.045)+(15.064), (I-338)+(2.045)+(16.001), (I-338)+(2.045)+(16.002), (I-338)+(2.045)+(16.003), (I-338)+(2.045)+(16.004), (I-338)+(2.045)+(16.005), (I-338)+(2.045)+(16.006), (I-338)+(2.045)+(16.007), (I-338)+(2.045)+(16.008), (I-338)+(2.045)+(17.001), (I-338)+(2.045)+(17.002), (I-338)+(2.045)+(17.003), (I-338)+(2.045)+(17.004), (I-338)+(2.045)+(17.005), (I-338)+(2.045)+(17.006), (I-338)+(2.045)+(17.007), (I-338)+(2.045)+(17.008), (I-338)+(2.045)+(17.009), (I-338)+(2.045)+(17.010), (I-338)+(2.045)+(17.011), (I-338)+(2.045)+(17.012), (I-338)+(2.045)+(18.001), (I-338)+(2.046)+(3.001), (I-338)+(2.046)+(3.002), (I-338)+(2.046)+(3.003), (I-338)+(2.046)+(3.004), (I-338)+(2.046)+(3.005), (I-338)+(2.046)+(3.006), (I-338)+(2.046)+(3.007), (I-338)+(2.046)+(3.008), (I-338)+(2.046)+(3.009), (I-338)+(2.046)+(3.010), (I-338)+(2.046)+(3.011), (I-338)+(2.046)+(3.012), (I-338)+(2.046)+(3.013), (I-338)+(2.046)+(3.014), (I-338)+(2.046)+(3.015), (I-338)+(2.046)+(3.016), (I-338)+(2.046)+(3.017), (I-338)+(2.046)+(3.018), (I-338)+(2.046)+(3.019), (I-338)+(2.046)+(3.020), (I-338)+(2.046)+(3.021), (I-338)+(2.046)+(3.022), (I-338)+(2.046)+(3.023), (I-338)+(2.046)+(3.024), (I-338)+(2.046)+(3.025), (I-338)+(2.046)+(3.026), (I-338)+(2.046)+(3.027), (I-338)+(2.046)+(3.028), (I-338)+(2.046)+(3.029), (I-338)+(2.046)+(3.030), (I-338)+(2.046)+(3.031), (I-338)+(2.046)+(5.001), (I-338)+(2.046)+(5.002), (I-338)+(2.046)+(5.003), (I-338)+(2.046)+(5.004), (I-338)+(2.046)+(5.005), (I-338)+(2.046)+(5.006), (I-338)+(2.046)+(5.007), (I-338)+(2.046)+(5.008), (I-338)+(2.046)+(5.009), (I-338)+(2.046)+(5.010), (I-338)+(2.046)+(5.011), (I-338)+(2.046)+(5.012), (I-338)+(2.046)+(5.013), (I-338)+(2.046)+(5.014), (I-338)+(2.046)+(5.015), (I-338)+(2.046)+(5.016), (I-338)+(2.046)+(5.017), (I-338)+(2.046)+(5.018), (I-338)+(2.046)+(5.019), (I-338)+(2.046)+(5.020), (I-338)+(2.046)+(5.021), (I-338)+(2.046)+(5.022), (I-338)+(2.046)+(5.023), (I-338)+(2.046)+(6.001), (I-338)+(2.046)+(6.002), (I-338)+(2.046)+(6.003), (I-338)+(2.046)+(6.004), (I-338)+(2.046)+(7.001), (I-338)+(2.046)+(7.002), (I-338)+(2.046)+(7.003), (I-338)+(2.046)+(7.004), (I-338)+(2.046)+(7.005), (I-338)+(2.046)+(7.006), (I-338)+(2.046)+(9.001), (I-338)+(2.046)+(9.002), (I-338)+(2.046)+(9.003), (I-338)+(2.046)+(9.004), (I-338)+(2.046)+(9.005), (I-338)+(2.046)+(9.006), (I-338)+(2.046)+(9.007), (I-338)+(2.046)+(9.008), (I-338)+(2.046)+(9.009), (I-338)+(2.046)+(14.001), (I-338)+(2.046)+(14.002), (I-338)+(2.046)+(15.008), (I-338)+(2.046)+(15.011), (I-338)+(2.046)+(15.012), (I-338)+(2.046)+(15.016), (I-338)+(2.046)+(15.025), (I-338)+(2.046)+(15.027), (I-338)+(2.046)+(15.047), (I-338)+(2.046)+(15.063), (I-338)+(2.046)+(15.064), (I-338)+(2.046)+(16.001), (I-338)+(2.046)+(16.002), (I-338)+(2.046)+(16.003), (I-338)+(2.046)+(16.004), (I-338)+(2.046)+(16.005), (I-338)+(2.046)+(16.006), (I-338)+(2.046)+(16.007), (I-338)+(2.046)+(16.008), (I-338)+(2.046)+(17.001), (I-338)+(2.046)+(17.002), (I-338)+(2.046)+(17.003), (I-338)+(2.046)+(17.004), (I-338)+(2.046)+(17.005), (I-338)+(2.046)+(17.006), (I-338)+(2.046)+(17.007), (I-338)+(2.046)+(17.008), (I-338)+(2.046)+(17.009), (I-338)+(2.046)+(17.010), (I-338)+(2.046)+(17.011), (I-338)+(2.046)+(17.012), (I-338)+(2.046)+(18.001), (I-338)+(2.047)+(3.001), (I-338)+(2.047)+(3.002), (I-338)+(2.047)+(3.003), (I-338)+(2.047)+(3.004), (I-338)+(2.047)+(3.005), (I-338)+(2.047)+(3.006), (I-338)+(2.047)+(3.007), (I-338)+(2.047)+(3.008), (I-338)+(2.047)+(3.009), (I-338)+(2.047)+(3.010), (I-338)+(2.047)+(3.011), (I-338)+(2.047)+(3.012), (I-338)+(2.047)+(3.013), (I-338)+(2.047)+(3.014), (I-338)+(2.047)+(3.015), (I-338)+(2.047)+(3.016), (I-338)+(2.047)+(3.017), (I-338)+(2.047)+(3.018), (I-338)+(2.047)+(3.019), (I-338)+(2.047)+(3.020), (I-338)+(2.047)+(3.021), (I-338)+(2.047)+(3.022), (I-338)+(2.047)+(3.023), (I-338)+(2.047)+(3.024), (I-338)+(2.047)+(3.025), (I-338)+(2.047)+(3.026), (I-338)+(2.047)+(3.027), (I-338)+(2.047)+(3.028), (I-338)+(2.047)+(3.029), (I-338)+(2.047)+(3.030), (I-338)+(2.047)+(3.031), (I-338)+(2.047)+(5.001), (I-338)+(2.047)+(5.002), (I-338)+(2.047)+(5.003), (I-338)+(2.047)+(5.004), (I-338)+(2.047)+(5.005), (I-338)+(2.047)+(5.006), (I-338)+(2.047)+(5.007), (I-338)+(2.047)+(5.008), (I-338)+(2.047)+(5.009), (I-338)+(2.047)+(5.010), (I-338)+(2.047)+(5.011), (I-338)+(2.047)+(5.012), (I-338)+(2.047)+(5.013), (I-338)+(2.047)+(5.014), (I-338)+(2.047)+(5.015), (I-338)+(2.047)+(5.016), (I-338)+(2.047)+(5.017), (I-338)+(2.047)+(5.018), (I-338)+(2.047)+(5.019), (I-338)+(2.047)+(5.020), (I-338)+(2.047)+(5.021), (I-338)+(2.047)+(5.022), (I-338)+(2.047)+(5.023), (I-338)+(2.047)+(6.001), (I-338)+(2.047)+(6.002), (I-338)+(2.047)+(6.003), (I-338)+(2.047)+(6.004), (I-338)+(2.047)+(7.001), (I-338)+(2.047)+(7.002), (I-338)+(2.047)+(7.003), (I-338)+(2.047)+(7.004), (I-338)+(2.047)+(7.005), (I-338)+(2.047)+(7.006), (I-338)+(2.047)+(9.001), (I-338)+(2.047)+(9.002), (I-338)+(2.047)+(9.003), (I-338)+(2.047)+(9.004), (I-338)+(2.047)+(9.005), (I-338)+(2.047)+(9.006), (I-338)+(2.047)+(9.007), (I-338)+(2.047)+(9.008), (I-338)+(2.047)+(9.009), (I-338)+(2.047)+(14.001), (I-338)+(2.047)+(14.002), (I-338)+(2.047)+(15.008), (I-338)+(2.047)+(15.011), (I-338)+(2.047)+(15.012), (I-338)+(2.047)+(15.016), (I-338)+(2.047)+(15.025), (I-338)+(2.047)+(15.027), (I-338)+(2.047)+(15.047), (I-338)+(2.047)+(15.063), (I-338)+(2.047)+(15.064), (I-338)+(2.047)+(16.001), (I-338)+(2.047)+(16.002), (I-338)+(2.047)+(16.003), (I-338)+(2.047)+(16.004), (I-338)+(2.047)+(16.005), (I-338)+(2.047)+(16.006), (I-338)+(2.047)+(16.007), (I-338)+(2.047)+(16.008), (I-338)+(2.047)+(17.001), (I-338)+(2.047)+(17.002), (I-338)+(2.047)+(17.003), (I-338)+(2.047)+(17.004), (I-338)+(2.047)+(17.005), (I-338)+(2.047)+(17.006), (I-338)+(2.047)+(17.007), (I-338)+(2.047)+(17.008), (I-338)+(2.047)+(17.009), (I-338)+(2.047)+(17.010), (I-338)+(2.047)+(17.011), (I-338)+(2.047)+(17.012), (I-338)+(2.047)+(18.001), (I-338)+(2.048)+(3.001), (I-338)+(2.048)+(3.002), (I-338)+(2.048)+(3.003), (I-338)+(2.048)+(3.004), (I-338)+(2.048)+(3.005), (I-338)+(2.048)+(3.006), (I-338)+(2.048)+(3.007), (I-338)+(2.048)+(3.008), (I-338)+(2.048)+(3.009), (I-338)+(2.048)+(3.010), (I-338)+(2.048)+(3.011), (I-338)+(2.048)+(3.012), (I-338)+(2.048)+(3.013), (I-338)+(2.048)+(3.014), (I-338)+(2.048)+(3.015), (I-338)+(2.048)+(3.016), (I-338)+(2.048)+(3.017), (I-338)+(2.048)+(3.018), (I-338)+(2.048)+(3.019), (I-338)+(2.048)+(3.020), (I-338)+(2.048)+(3.021), (I-338)+(2.048)+(3.022), (I-338)+(2.048)+(3.023), (I-338)+(2.048)+(3.024), (I-338)+(2.048)+(3.025), (I-338)+(2.048)+(3.026), (I-338)+(2.048)+(3.027), (I-338)+(2.048)+(3.028), (I-338)+(2.048)+(3.029), (I-338)+(2.048)+(3.030), (I-338)+(2.048)+(3.031), (I-338)+(2.048)+(5.001), (I-338)+(2.048)+(5.002), (I-338)+(2.048)+(5.003), (I-338)+(2.048)+(5.004), (I-338)+(2.048)+(5.005), (I-338)+(2.048)+(5.006), (I-338)+(2.048)+(5.007), (I-338)+(2.048)+(5.008), (I-338)+(2.048)+(5.009), (I-338)+(2.048)+(5.010), (I-338)+(2.048)+(5.011), (I-338)+(2.048)+(5.012), (I-338)+(2.048)+(5.013), (I-338)+(2.048)+(5.014), (I-338)+(2.048)+(5.015), (I-338)+(2.048)+(5.016), (I-338)+(2.048)+(5.017), (I-338)+(2.048)+(5.018), (I-338)+(2.048)+(5.019), (I-338)+(2.048)+(5.020), (I-338)+(2.048)+(5.021), (I-338)+(2.048)+(5.022), (I-338)+(2.048)+(5.023), (I-338)+(2.048)+(6.001), (I-338)+(2.048)+(6.002), (I-338)+(2.048)+(6.003), (I-338)+(2.048)+(6.004), (I-338)+(2.048)+(7.001), (I-338)+(2.048)+(7.002), (I-338)+(2.048)+(7.003), (I-338)+(2.048)+(7.004), (I-338)+(2.048)+(7.005), (I-338)+(2.048)+(7.006), (I-338)+(2.048)+(9.001), (I-338)+(2.048)+(9.002), (I-338)+(2.048)+(9.003), (I-338)+(2.048)+(9.004), (I-338)+(2.048)+(9.005), (I-338)+(2.048)+(9.006), (I-338)+(2.048)+(9.007), (I-338)+(2.048)+(9.008), (I-338)+(2.048)+(9.009), (I-338)+(2.048)+(14.001), (I-338)+(2.048)+(14.002), (I-338)+(2.048)+(15.008), (I-338)+(2.048)+(15.011), (I-338)+(2.048)+(15.012), (I-338)+(2.048)+(15.016), (I-338)+(2.048)+(15.025), (I-338)+(2.048)+(15.027), (I-338)+(2.048)+(15.047), (I-338)+(2.048)+(15.063), (I-338)+(2.048)+(15.064), (I-338)+(2.048)+(16.001), (I-338)+(2.048)+(16.002), (I-338)+(2.048)+(16.003), (I-338)+(2.048)+(16.004), (I-338)+(2.048)+(16.005), (I-338)+(2.048)+(16.006), (I-338)+(2.048)+(16.007), (I-338)+(2.048)+(16.008), (I-338)+(2.048)+(17.001), (I-338)+(2.048)+(17.002), (I-338)+(2.048)+(17.003), (I-338)+(2.048)+(17.004), (I-338)+(2.048)+(17.005), (I-338)+(2.048)+(17.006), (I-338)+(2.048)+(17.007), (I-338)+(2.048)+(17.008), (I-338)+(2.048)+(17.009), (I-338)+(2.048)+(17.010), (I-338)+(2.048)+(17.011), (I-338)+(2.048)+(17.012), (I-338)+(2.048)+(18.001), (I-338)+(2.049)+(3.001), (I-338)+(2.049)+(3.002), (I-338)+(2.049)+(3.003), (I-338)+(2.049)+(3.004), (I-338)+(2.049)+(3.005), (I-338)+(2.049)+(3.006), (I-338)+(2.049)+(3.007), (I-338)+(2.049)+(3.008), (I-338)+(2.049)+(3.009), (I-338)+(2.049)+(3.010), (I-338)+(2.049)+(3.011), (I-338)+(2.049)+(3.012), (I-338)+(2.049)+(3.013), (I-338)+(2.049)+(3.014), (I-338)+(2.049)+(3.015), (I-338)+(2.049)+(3.016), (I-338)+(2.049)+(3.017), (I-338)+(2.049)+(3.018), (I-338)+(2.049)+(3.019), (I-338)+(2.049)+(3.020), (I-338)+(2.049)+(3.021), (I-338)+(2.049)+(3.022), (I-338)+(2.049)+(3.023), (I-338)+(2.049)+(3.024), (I-338)+(2.049)+(3.025), (I-338)+(2.049)+(3.026), (I-338)+(2.049)+(3.027), (I-338)+(2.049)+(3.028), (I-338)+(2.049)+(3.029), (I-338)+(2.049)+(3.030), (I-338)+(2.049)+(3.031), (I-338)+(2.049)+(5.001), (I-338)+(2.049)+(5.002), (I-338)+(2.049)+(5.003), (I-338)+(2.049)+(5.004), (I-338)+(2.049)+(5.005), (I-338)+(2.049)+(5.006), (I-338)+(2.049)+(5.007), (I-338)+(2.049)+(5.008), (I-338)+(2.049)+(5.009), (I-338)+(2.049)+(5.010), (I-338)+(2.049)+(5.011), (I-338)+(2.049)+(5.012), (I-338)+(2.049)+(5.013), (I-338)+(2.049)+(5.014), (I-338)+(2.049)+(5.015), (I-338)+(2.049)+(5.016), (I-338)+(2.049)+(5.017), (I-338)+(2.049)+(5.018), (I-338)+(2.049)+(5.019), (I-338)+(2.049)+(5.020), (I-338)+(2.049)+(5.021), (I-338)+(2.049)+(5.022), (I-338)+(2.049)+(5.023), (I-338)+(2.049)+(6.001), (I-338)+(2.049)+(6.002), (I-338)+(2.049)+(6.003), (I-338)+(2.049)+(6.004), (I-338)+(2.049)+(7.001), (I-338)+(2.049)+(7.002), (I-338)+(2.049)+(7.003), (I-338)+(2.049)+(7.004), (I-338)+(2.049)+(7.005), (I-338)+(2.049)+(7.006), (I-338)+(2.049)+(9.001), (I-338)+(2.049)+(9.002), (I-338)+(2.049)+(9.003), (I-338)+(2.049)+(9.004), (I-338)+(2.049)+(9.005), (I-338)+(2.049)+(9.006), (I-338)+(2.049)+(9.007), (I-338)+(2.049)+(9.008), (I-338)+(2.049)+(9.009), (I-338)+(2.049)+(14.001), (I-338)+(2.049)+(14.002), (I-338)+(2.049)+(15.008), (I-338)+(2.049)+(15.011), (I-338)+(2.049)+(15.012), (I-338)+(2.049)+(15.016), (I-338)+(2.049)+(15.025), (I-338)+(2.049)+(15.027), (I-338)+(2.049)+(15.047), (I-338)+(2.049)+(15.063), (I-338)+(2.049)+(15.064), (I-338)+(2.049)+(16.001), (I-338)+(2.049)+(16.002), (I-338)+(2.049)+(16.003), (I-338)+(2.049)+(16.004), (I-338)+(2.049)+(16.005), (I-338)+(2.049)+(16.006), (I-338)+(2.049)+(16.007), (I-338)+(2.049)+(16.008), (I-338)+(2.049)+(17.001), (I-338)+(2.049)+(17.002), (I-338)+(2.049)+(17.003), (I-338)+(2.049)+(17.004), (I-338)+(2.049)+(17.005), (I-338)+(2.049)+(17.006), (I-338)+(2.049)+(17.007), (I-338)+(2.049)+(17.008), (I-338)+(2.049)+(17.009), (I-338)+(2.049)+(17.010), (I-338)+(2.049)+(17.011), (I-338)+(2.049)+(17.012), (I-338)+(2.049)+(18.001), (I-338)+(2.050)+(3.001), (I-338)+(2.050)+(3.002), (I-338)+(2.050)+(3.003), (I-338)+(2.050)+(3.004), (I-338)+(2.050)+(3.005), (I-338)+(2.050)+(3.006), (I-338)+(2.050)+(3.007), (I-338)+(2.050)+(3.008), (I-338)+(2.050)+(3.009), (I-338)+(2.050)+(3.010), (I-338)+(2.050)+(3.011), (I-338)+(2.050)+(3.012), (I-338)+(2.050)+(3.013), (I-338)+(2.050)+(3.014), (I-338)+(2.050)+(3.015), (I-338)+(2.050)+(3.016), (I-338)+(2.050)+(3.017), (I-338)+(2.050)+(3.018), (I-338)+(2.050)+(3.019), (I-338)+(2.050)+(3.020), (I-338)+(2.050)+(3.021), (I-338)+(2.050)+(3.022), (I-338)+(2.050)+(3.023), (I-338)+(2.050)+(3.024), (I-338)+(2.050)+(3.025), (I-338)+(2.050)+(3.026), (I-338)+(2.050)+(3.027), (I-338)+(2.050)+(3.028), (I-338)+(2.050)+(3.029), (I-338)+(2.050)+(3.030), (I-338)+(2.050)+(3.031), (I-338)+(2.050)+(5.001), (I-338)+(2.050)+(5.002), (I-338)+(2.050)+(5.003), (I-338)+(2.050)+(5.004), (I-338)+(2.050)+(5.005), (I-338)+(2.050)+(5.006), (I-338)+(2.050)+(5.007), (I-338)+(2.050)+(5.008), (I-338)+(2.050)+(5.009), (I-338)+(2.050)+(5.010), (I-338)+(2.050)+(5.011), (I-338)+(2.050)+(5.012), (I-338)+(2.050)+(5.013), (I-338)+(2.050)+(5.014), (I-338)+(2.050)+(5.015), (I-338)+(2.050)+(5.016), (I-338)+(2.050)+(5.017), (I-338)+(2.050)+(5.018), (I-338)+(2.050)+(5.019), (I-338)+(2.050)+(5.020), (I-338)+(2.050)+(5.021), (I-338)+(2.050)+(5.022), (I-338)+(2.050)+(5.023), (I-338)+(2.050)+(6.001), (I-338)+(2.050)+(6.002), (I-338)+(2.050)+(6.003), (I-338)+(2.050)+(6.004), (I-338)+(2.050)+(7.001), (I-338)+(2.050)+(7.002), (I-338)+(2.050)+(7.003), (I-338)+(2.050)+(7.004), (I-338)+(2.050)+(7.005), (I-338)+(2.050)+(7.006), (I-338)+(2.050)+(9.001), (I-338)+(2.050)+(9.002), (I-338)+(2.050)+(9.003), (I-338)+(2.050)+(9.004), (I-338)+(2.050)+(9.005), (I-338)+(2.050)+(9.006), (I-338)+(2.050)+(9.007), (I-338)+(2.050)+(9.008), (I-338)+(2.050)+(9.009), (I-338)+(2.050)+(14.001), (I-338)+(2.050)+(14.002), (I-338)+(2.050)+(15.008), (I-338)+(2.050)+(15.011), (I-338)+(2.050)+(15.012), (I-338)+(2.050)+(15.016), (I-338)+(2.050)+(15.025), (I-338)+(2.050)+(15.027), (I-338)+(2.050)+(15.047), (I-338)+(2.050)+(15.063), (I-338)+(2.050)+(15.064), (I-338)+(2.050)+(16.001), (I-338)+(2.050)+(16.002), (I-338)+(2.050)+(16.003), (I-338)+(2.050)+(16.004), (I-338)+(2.050)+(16.005), (I-338)+(2.050)+(16.006), (I-338)+(2.050)+(16.007), (I-338)+(2.050)+(16.008), (I-338)+(2.050)+(17.001), (I-338)+(2.050)+(17.002), (I-338)+(2.050)+(17.003), (I-338)+(2.050)+(17.004), (I-338)+(2.050)+(17.005), (I-338)+(2.050)+(17.006), (I-338)+(2.050)+(17.007), (I-338)+(2.050)+(17.008), (I-338)+(2.050)+(17.009), (I-338)+(2.050)+(17.010), (I-338)+(2.050)+(17.011), (I-338)+(2.050)+(17.012), (I-338)+(2.050)+(18.001), (I-338)+(2.051)+(3.001), (I-338)+(2.051)+(3.002), (I-338)+(2.051)+(3.003), (I-338)+(2.051)+(3.004), (I-338)+(2.051)+(3.005), (I-338)+(2.051)+(3.006), (I-338)+(2.051)+(3.007), (I-338)+(2.051)+(3.008), (I-338)+(2.051)+(3.009), (I-338)+(2.051)+(3.010), (I-338)+(2.051)+(3.011), (I-338)+(2.051)+(3.012), (I-338)+(2.051)+(3.013), (I-338)+(2.051)+(3.014), (I-338)+(2.051)+(3.015), (I-338)+(2.051)+(3.016), (I-338)+(2.051)+(3.017), (I-338)+(2.051)+(3.018), (I-338)+(2.051)+(3.019), (I-338)+(2.051)+(3.020), (I-338)+(2.051)+(3.021), (I-338)+(2.051)+(3.022), (I-338)+(2.051)+(3.023), (I-338)+(2.051)+(3.024), (I-338)+(2.051)+(3.025), (I-338)+(2.051)+(3.026), (I-338)+(2.051)+(3.027), (I-338)+(2.051)+(3.028), (I-338)+(2.051)+(3.029), (I-338)+(2.051)+(3.030), (I-338)+(2.051)+(3.031), (I-338)+(2.051)+(5.001), (I-338)+(2.051)+(5.002), (I-338)+(2.051)+(5.003), (I-338)+(2.051)+(5.004), (I-338)+(2.051)+(5.005), (I-338)+(2.051)+(5.006), (I-338)+(2.051)+(5.007), (I-338)+(2.051)+(5.008), (I-338)+(2.051)+(5.009), (I-338)+(2.051)+(5.010), (I-338)+(2.051)+(5.011), (I-338)+(2.051)+(5.012), (I-338)+(2.051)+(5.013), (I-338)+(2.051)+(5.014), (I-338)+(2.051)+(5.015), (I-338)+(2.051)+(5.016), (I-338)+(2.051)+(5.017), (I-338)+(2.051)+(5.018), (I-338)+(2.051)+(5.019), (I-338)+(2.051)+(5.020), (I-338)+(2.051)+(5.021), (I-338)+(2.051)+(5.022), (I-338)+(2.051)+(5.023), (I-338)+(2.051)+(6.001), (I-338)+(2.051)+(6.002), (I-338)+(2.051)+(6.003), (I-338)+(2.051)+(6.004), (I-338)+(2.051)+(7.001), (I-338)+(2.051)+(7.002), (I-338)+(2.051)+(7.003), (I-338)+(2.051)+(7.004), (I-338)+(2.051)+(7.005), (I-338)+(2.051)+(7.006), (I-338)+(2.051)+(9.001), (I-338)+(2.051)+(9.002), (I-338)+(2.051)+(9.003), (I-338)+(2.051)+(9.004), (I-338)+(2.051)+(9.005), (I-338)+(2.051)+(9.006), (I-338)+(2.051)+(9.007), (I-338)+(2.051)+(9.008), (I-338)+(2.051)+(9.009), (I-338)+(2.051)+(14.001), (I-338)+(2.051)+(14.002), (I-338)+(2.051)+(15.008), (I-338)+(2.051)+(15.011), (I-338)+(2.051)+(15.012), (I-338)+(2.051)+(15.016), (I-338)+(2.051)+(15.025), (I-338)+(2.051)+(15.027), (I-338)+(2.051)+(15.047), (I-338)+(2.051)+(15.063), (I-338)+(2.051)+(15.064), (I-338)+(2.051)+(16.001), (I-338)+(2.051)+(16.002), (I-338)+(2.051)+(16.003), (I-338)+(2.051)+(16.004), (I-338)+(2.051)+(16.005), (I-338)+(2.051)+(16.006), (I-338)+(2.051)+(16.007), (I-338)+(2.051)+(16.008), (I-338)+(2.051)+(17.001), (I-338)+(2.051)+(17.002), (I-338)+(2.051)+(17.003), (I-338)+(2.051)+(17.004), (I-338)+(2.051)+(17.005), (I-338)+(2.051)+(17.006), (I-338)+(2.051)+(17.007), (I-338)+(2.051)+(17.008), (I-338)+(2.051)+(17.009), (I-338)+(2.051)+(17.010), (I-338)+(2.051)+(17.011), (I-338)+(2.051)+(17.012), (I-338)+(2.051)+(18.001), (I-338)+(2.052)+(3.001), (I-338)+(2.052)+(3.002), (I-338)+(2.052)+(3.003), (I-338)+(2.052)+(3.004), (I-338)+(2.052)+(3.005), (I-338)+(2.052)+(3.006), (I-338)+(2.052)+(3.007), (I-338)+(2.052)+(3.008), (I-338)+(2.052)+(3.009), (I-338)+(2.052)+(3.010), (I-338)+(2.052)+(3.011), (I-338)+(2.052)+(3.012), (I-338)+(2.052)+(3.013), (I-338)+(2.052)+(3.014), (I-338)+(2.052)+(3.015), (I-338)+(2.052)+(3.016), (I-338)+(2.052)+(3.017), (I-338)+(2.052)+(3.018), (I-338)+(2.052)+(3.019), (I-338)+(2.052)+(3.020), (I-338)+(2.052)+(3.021), (I-338)+(2.052)+(3.022), (I-338)+(2.052)+(3.023), (I-338)+(2.052)+(3.024), (I-338)+(2.052)+(3.025), (I-338)+(2.052)+(3.026), (I-338)+(2.052)+(3.027), (I-338)+(2.052)+(3.028), (I-338)+(2.052)+(3.029), (I-338)+(2.052)+(3.030), (I-338)+(2.052)+(3.031), (I-338)+(2.052)+(5.001), (I-338)+(2.052)+(5.002), (I-338)+(2.052)+(5.003), (I-338)+(2.052)+(5.004), (I-338)+(2.052)+(5.005), (I-338)+(2.052)+(5.006), (I-338)+(2.052)+(5.007), (I-338)+(2.052)+(5.008), (I-338)+(2.052)+(5.009), (I-338)+(2.052)+(5.010), (I-338)+(2.052)+(5.011), (I-338)+(2.052)+(5.012), (I-338)+(2.052)+(5.013), (I-338)+(2.052)+(5.014), (I-338)+(2.052)+(5.015), (I-338)+(2.052)+(5.016), (I-338)+(2.052)+(5.017), (I-338)+(2.052)+(5.018), (I-338)+(2.052)+(5.019), (I-338)+(2.052)+(5.020), (I-338)+(2.052)+(5.021), (I-338)+(2.052)+(5.022), (I-338)+(2.052)+(5.023), (I-338)+(2.052)+(6.001), (I-338)+(2.052)+(6.002), (I-338)+(2.052)+(6.003), (I-338)+(2.052)+(6.004), (I-338)+(2.052)+(7.001), (I-338)+(2.052)+(7.002), (I-338)+(2.052)+(7.003), (I-338)+(2.052)+(7.004), (I-338)+(2.052)+(7.005), (I-338)+(2.052)+(7.006), (I-338)+(2.052)+(9.001), (I-338)+(2.052)+(9.002), (I-338)+(2.052)+(9.003), (I-338)+(2.052)+(9.004), (I-338)+(2.052)+(9.005), (I-338)+(2.052)+(9.006), (I-338)+(2.052)+(9.007), (I-338)+(2.052)+(9.008), (I-338)+(2.052)+(9.009), (I-338)+(2.052)+(14.001), (I-338)+(2.052)+(14.002), (I-338)+(2.052)+(15.008), (I-338)+(2.052)+(15.011), (I-338)+(2.052)+(15.012), (I-338)+(2.052)+(15.016), (I-338)+(2.052)+(15.025), (I-338)+(2.052)+(15.027), (I-338)+(2.052)+(15.047), (I-338)+(2.052)+(15.063), (I-338)+(2.052)+(15.064), (I-338)+(2.052)+(16.001), (I-338)+(2.052)+(16.002), (I-338)+(2.052)+(16.003), (I-338)+(2.052)+(16.004), (I-338)+(2.052)+(16.005), (I-338)+(2.052)+(16.006), (I-338)+(2.052)+(16.007), (I-338)+(2.052)+(16.008), (I-338)+(2.052)+(17.001), (I-338)+(2.052)+(17.002), (I-338)+(2.052)+(17.003), (I-338)+(2.052)+(17.004), (I-338)+(2.052)+(17.005), (I-338)+(2.052)+(17.006), (I-338)+(2.052)+(17.007), (I-338)+(2.052)+(17.008), (I-338)+(2.052)+(17.009), (I-338)+(2.052)+(17.010), (I-338)+(2.052)+(17.011), (I-338)+(2.052)+(17.012), (I-338)+(2.052)+(18.001), (I-338)+(2.053)+(3.001), (I-338)+(2.053)+(3.002), (I-338)+(2.053)+(3.003), (I-338)+(2.053)+(3.004), (I-338)+(2.053)+(3.005), (I-338)+(2.053)+(3.006), (I-338)+(2.053)+(3.007), (I-338)+(2.053)+(3.008), (I-338)+(2.053)+(3.009), (I-338)+(2.053)+(3.010), (I-338)+(2.053)+(3.011), (I-338)+(2.053)+(3.012), (I-338)+(2.053)+(3.013), (I-338)+(2.053)+(3.014), (I-338)+(2.053)+(3.015), (I-338)+(2.053)+(3.016), (I-338)+(2.053)+(3.017), (I-338)+(2.053)+(3.018), (I-338)+(2.053)+(3.019), (I-338)+(2.053)+(3.020), (I-338)+(2.053)+(3.021), (I-338)+(2.053)+(3.022), (I-338)+(2.053)+(3.023), (I-338)+(2.053)+(3.024), (I-338)+(2.053)+(3.025), (I-338)+(2.053)+(3.026), (I-338)+(2.053)+(3.027), (I-338)+(2.053)+(3.028), (I-338)+(2.053)+(3.029), (I-338)+(2.053)+(3.030), (I-338)+(2.053)+(3.031), (I-338)+(2.053)+(5.001), (I-338)+(2.053)+(5.002), (I-338)+(2.053)+(5.003), (I-338)+(2.053)+(5.004), (I-338)+(2.053)+(5.005), (I-338)+(2.053)+(5.006), (I-338)+(2.053)+(5.007), (I-338)+(2.053)+(5.008), (I-338)+(2.053)+(5.009), (I-338)+(2.053)+(5.010), (I-338)+(2.053)+(5.011), (I-338)+(2.053)+(5.012), (I-338)+(2.053)+(5.013), (I-338)+(2.053)+(5.014), (I-338)+(2.053)+(5.015), (I-338)+(2.053)+(5.016), (I-338)+(2.053)+(5.017), (I-338)+(2.053)+(5.018), (I-338)+(2.053)+(5.019), (I-338)+(2.053)+(5.020), (I-338)+(2.053)+(5.021), (I-338)+(2.053)+(5.022), (I-338)+(2.053)+(5.023), (I-338)+(2.053)+(6.001), (I-338)+(2.053)+(6.002), (I-338)+(2.053)+(6.003), (I-338)+(2.053)+(6.004), (I-338)+(2.053)+(7.001), (I-338)+(2.053)+(7.002), (I-338)+(2.053)+(7.003), (I-338)+(2.053)+(7.004), (I-338)+(2.053)+(7.005), (I-338)+(2.053)+(7.006), (I-338)+(2.053)+(9.001), (I-338)+(2.053)+(9.002), (I-338)+(2.053)+(9.003), (I-338)+(2.053)+(9.004), (I-338)+(2.053)+(9.005), (I-338)+(2.053)+(9.006), (I-338)+(2.053)+(9.007), (I-338)+(2.053)+(9.008), (I-338)+(2.053)+(9.009), (I-338)+(2.053)+(14.001), (I-338)+(2.053)+(14.002), (I-338)+(2.053)+(15.008), (I-338)+(2.053)+(15.011), (I-338)+(2.053)+(15.012), (I-338)+(2.053)+(15.016), (I-338)+(2.053)+(15.025), (I-338)+(2.053)+(15.027), (I-338)+(2.053)+(15.047), (I-338)+(2.053)+(15.063), (I-338)+(2.053)+(15.064), (I-338)+(2.053)+(16.001), (I-338)+(2.053)+(16.002), (I-338)+(2.053)+(16.003), (I-338)+(2.053)+(16.004), (I-338)+(2.053)+(16.005), (I-338)+(2.053)+(16.006), (I-338)+(2.053)+(16.007), (I-338)+(2.053)+(16.008), (I-338)+(2.053)+(17.001), (I-338)+(2.053)+(17.002), (I-338)+(2.053)+(17.003), (I-338)+(2.053)+(17.004), (I-338)+(2.053)+(17.005), (I-338)+(2.053)+(17.006), (I-338)+(2.053)+(17.007), (I-338)+(2.053)+(17.008), (I-338)+(2.053)+(17.009), (I-338)+(2.053)+(17.010), (I-338)+(2.053)+(17.011), (I-338)+(2.053)+(17.012), (I-338)+(2.053)+(18.001), (I-338)+(2.054)+(3.001), (I-338)+(2.054)+(3.002), (I-338)+(2.054)+(3.003), (I-338)+(2.054)+(3.004), (I-338)+(2.054)+(3.005), (I-338)+(2.054)+(3.006), (I-338)+(2.054)+(3.007), (I-338)+(2.054)+(3.008), (I-338)+(2.054)+(3.009), (I-338)+(2.054)+(3.010), (I-338)+(2.054)+(3.011), (I-338)+(2.054)+(3.012), (I-338)+(2.054)+(3.013), (I-338)+(2.054)+(3.014), (I-338)+(2.054)+(3.015), (I-338)+(2.054)+(3.016), (I-338)+(2.054)+(3.017), (I-338)+(2.054)+(3.018), (I-338)+(2.054)+(3.019), (I-338)+(2.054)+(3.020), (I-338)+(2.054)+(3.021), (I-338)+(2.054)+(3.022), (I-338)+(2.054)+(3.023), (I-338)+(2.054)+(3.024), (I-338)+(2.054)+(3.025), (I-338)+(2.054)+(3.026), (I-338)+(2.054)+(3.027), (I-338)+(2.054)+(3.028), (I-338)+(2.054)+(3.029), (I-338)+(2.054)+(3.030), (I-338)+(2.054)+(3.031), (I-338)+(2.054)+(5.001), (I-338)+(2.054)+(5.002), (I-338)+(2.054)+(5.003), (I-338)+(2.054)+(5.004), (I-338)+(2.054)+(5.005), (I-338)+(2.054)+(5.006), (I-338)+(2.054)+(5.007), (I-338)+(2.054)+(5.008), (I-338)+(2.054)+(5.009), (I-338)+(2.054)+(5.010), (I-338)+(2.054)+(5.011), (I-338)+(2.054)+(5.012), (I-338)+(2.054)+(5.013), (I-338)+(2.054)+(5.014), (I-338)+(2.054)+(5.015), (I-338)+(2.054)+(5.016), (I-338)+(2.054)+(5.017), (I-338)+(2.054)+(5.018), (I-338)+(2.054)+(5.019), (I-338)+(2.054)+(5.020), (I-338)+(2.054)+(5.021), (I-338)+(2.054)+(5.022), (I-338)+(2.054)+(5.023), (I-338)+(2.054)+(6.001), (I-338)+(2.054)+(6.002), (I-338)+(2.054)+(6.003), (I-338)+(2.054)+(6.004), (I-338)+(2.054)+(7.001), (I-338)+(2.054)+(7.002), (I-338)+(2.054)+(7.003), (I-338)+(2.054)+(7.004), (I-338)+(2.054)+(7.005), (I-338)+(2.054)+(7.006), (I-338)+(2.054)+(9.001), (I-338)+(2.054)+(9.002), (I-338)+(2.054)+(9.003), (I-338)+(2.054)+(9.004), (I-338)+(2.054)+(9.005), (I-338)+(2.054)+(9.006), (I-338)+(2.054)+(9.007), (I-338)+(2.054)+(9.008), (I-338)+(2.054)+(9.009), (I-338)+(2.054)+(14.001), (I-338)+(2.054)+(14.002), (I-338)+(2.054)+(15.008), (I-338)+(2.054)+(15.011), (I-338)+(2.054)+(15.012), (I-338)+(2.054)+(15.016), (I-338)+(2.054)+(15.025), (I-338)+(2.054)+(15.027), (I-338)+(2.054)+(15.047), (I-338)+(2.054)+(15.063), (I-338)+(2.054)+(15.064), (I-338)+(2.054)+(16.001), (I-338)+(2.054)+(16.002), (I-338)+(2.054)+(16.003), (I-338)+(2.054)+(16.004), (I-338)+(2.054)+(16.005), (I-338)+(2.054)+(16.006), (I-338)+(2.054)+(16.007), (I-338)+(2.054)+(16.008), (I-338)+(2.054)+(17.001), (I-338)+(2.054)+(17.002), (I-338)+(2.054)+(17.003), (I-338)+(2.054)+(17.004), (I-338)+(2.054)+(17.005), (I-338)+(2.054)+(17.006), (I-338)+(2.054)+(17.007), (I-338)+(2.054)+(17.008), (I-338)+(2.054)+(17.009), (I-338)+(2.054)+(17.010), (I-338)+(2.054)+(17.011), (I-338)+(2.054)+(17.012), (I-338)+(2.054)+(18.001), (I-338)+(2.055)+(3.001), (I-338)+(2.055)+(3.002), (I-338)+(2.055)+(3.003), (I-338)+(2.055)+(3.004), (I-338)+(2.055)+(3.005), (I-338)+(2.055)+(3.006), (I-338)+(2.055)+(3.007), (I-338)+(2.055)+(3.008), (I-338)+(2.055)+(3.009), (I-338)+(2.055)+(3.010), (I-338)+(2.055)+(3.011), (I-338)+(2.055)+(3.012), (I-338)+(2.055)+(3.013), (I-338)+(2.055)+(3.014), (I-338)+(2.055)+(3.015), (I-338)+(2.055)+(3.016), (I-338)+(2.055)+(3.017), (I-338)+(2.055)+(3.018), (I-338)+(2.055)+(3.019), (I-338)+(2.055)+(3.020), (I-338)+(2.055)+(3.021), (I-338)+(2.055)+(3.022), (I-338)+(2.055)+(3.023), (I-338)+(2.055)+(3.024), (I-338)+(2.055)+(3.025), (I-338)+(2.055)+(3.026), (I-338)+(2.055)+(3.027), (I-338)+(2.055)+(3.028), (I-338)+(2.055)+(3.029), (I-338)+(2.055)+(3.030), (I-338)+(2.055)+(3.031), (I-338)+(2.055)+(5.001), (I-338)+(2.055)+(5.002), (I-338)+(2.055)+(5.003), (I-338)+(2.055)+(5.004), (I-338)+(2.055)+(5.005), (I-338)+(2.055)+(5.006), (I-338)+(2.055)+(5.007), (I-338)+(2.055)+(5.008), (I-338)+(2.055)+(5.009), (I-338)+(2.055)+(5.010), (I-338)+(2.055)+(5.011), (I-338)+(2.055)+(5.012), (I-338)+(2.055)+(5.013), (I-338)+(2.055)+(5.014), (I-338)+(2.055)+(5.015), (I-338)+(2.055)+(5.016), (I-338)+(2.055)+(5.017), (I-338)+(2.055)+(5.018), (I-338)+(2.055)+(5.019), (I-338)+(2.055)+(5.020), (I-338)+(2.055)+(5.021), (I-338)+(2.055)+(5.022), (I-338)+(2.055)+(5.023), (I-338)+(2.055)+(6.001), (I-338)+(2.055)+(6.002), (I-338)+(2.055)+(6.003), (I-338)+(2.055)+(6.004), (I-338)+(2.055)+(7.001), (I-338)+(2.055)+(7.002), (I-338)+(2.055)+(7.003), (I-338)+(2.055)+(7.004), (I-338)+(2.055)+(7.005), (I-338)+(2.055)+(7.006), (I-338)+(2.055)+(9.001), (I-338)+(2.055)+(9.002), (I-338)+(2.055)+(9.003), (I-338)+(2.055)+(9.004), (I-338)+(2.055)+(9.005), (I-338)+(2.055)+(9.006), (I-338)+(2.055)+(9.007), (I-338)+(2.055)+(9.008), (I-338)+(2.055)+(9.009), (I-338)+(2.055)+(14.001), (I-338)+(2.055)+(14.002), (I-338)+(2.055)+(15.008), (I-338)+(2.055)+(15.011), (I-338)+(2.055)+(15.012), (I-338)+(2.055)+(15.016), (I-338)+(2.055)+(15.025), (I-338)+(2.055)+(15.027), (I-338)+(2.055)+(15.047), (I-338)+(2.055)+(15.063), (I-338)+(2.055)+(15.064), (I-338)+(2.055)+(16.001), (I-338)+(2.055)+(16.002), (I-338)+(2.055)+(16.003), (I-338)+(2.055)+(16.004), (I-338)+(2.055)+(16.005), (I-338)+(2.055)+(16.006), (I-338)+(2.055)+(16.007), (I-338)+(2.055)+(16.008), (I-338)+(2.055)+(17.001), (I-338)+(2.055)+(17.002), (I-338)+(2.055)+(17.003), (I-338)+(2.055)+(17.004), (I-338)+(2.055)+(17.005), (I-338)+(2.055)+(17.006), (I-338)+(2.055)+(17.007), (I-338)+(2.055)+(17.008), (I-338)+(2.055)+(17.009), (I-338)+(2.055)+(17.010), (I-338)+(2.055)+(17.011), (I-338)+(2.055)+(17.012), (I-338)+(2.055)+(18.001), (I-338)+(2.056)+(3.001), (I-338)+(2.056)+(3.002), (I-338)+(2.056)+(3.003), (I-338)+(2.056)+(3.004), (I-338)+(2.056)+(3.005), (I-338)+(2.056)+(3.006), (I-338)+(2.056)+(3.007), (I-338)+(2.056)+(3.008), (I-338)+(2.056)+(3.009), (I-338)+(2.056)+(3.010), (I-338)+(2.056)+(3.011), (I-338)+(2.056)+(3.012), (I-338)+(2.056)+(3.013), (I-338)+(2.056)+(3.014), (I-338)+(2.056)+(3.015), (I-338)+(2.056)+(3.016), (I-338)+(2.056)+(3.017), (I-338)+(2.056)+(3.018), (I-338)+(2.056)+(3.019), (I-338)+(2.056)+(3.020), (I-338)+(2.056)+(3.021), (I-338)+(2.056)+(3.022), (I-338)+(2.056)+(3.023), (I-338)+(2.056)+(3.024), (I-338)+(2.056)+(3.025), (I-338)+(2.056)+(3.026), (I-338)+(2.056)+(3.027), (I-338)+(2.056)+(3.028), (I-338)+(2.056)+(3.029), (I-338)+(2.056)+(3.030), (I-338)+(2.056)+(3.031), (I-338)+(2.056)+(5.001), (I-338)+(2.056)+(5.002), (I-338)+(2.056)+(5.003), (I-338)+(2.056)+(5.004), (I-338)+(2.056)+(5.005), (I-338)+(2.056)+(5.006), (I-338)+(2.056)+(5.007), (I-338)+(2.056)+(5.008), (I-338)+(2.056)+(5.009), (I-338)+(2.056)+(5.010), (I-338)+(2.056)+(5.011), (I-338)+(2.056)+(5.012), (I-338)+(2.056)+(5.013), (I-338)+(2.056)+(5.014), (I-338)+(2.056)+(5.015), (I-338)+(2.056)+(5.016), (I-338)+(2.056)+(5.017), (I-338)+(2.056)+(5.018), (I-338)+(2.056)+(5.019), (I-338)+(2.056)+(5.020), (I-338)+(2.056)+(5.021), (I-338)+(2.056)+(5.022), (I-338)+(2.056)+(5.023), (I-338)+(2.056)+(6.001), (I-338)+(2.056)+(6.002), (I-338)+(2.056)+(6.003), (I-338)+(2.056)+(6.004), (I-338)+(2.056)+(7.001), (I-338)+(2.056)+(7.002), (I-338)+(2.056)+(7.003), (I-338)+(2.056)+(7.004), (I-338)+(2.056)+(7.005), (I-338)+(2.056)+(7.006), (I-338)+(2.056)+(9.001), (I-338)+(2.056)+(9.002), (I-338)+(2.056)+(9.003), (I-338)+(2.056)+(9.004), (I-338)+(2.056)+(9.005), (I-338)+(2.056)+(9.006), (I-338)+(2.056)+(9.007), (I-338)+(2.056)+(9.008), (I-338)+(2.056)+(9.009), (I-338)+(2.056)+(14.001), (I-338)+(2.056)+(14.002), (I-338)+(2.056)+(15.008), (I-338)+(2.056)+(15.011), (I-338)+(2.056)+(15.012), (I-338)+(2.056)+(15.016), (I-338)+(2.056)+(15.025), (I-338)+(2.056)+(15.027), (I-338)+(2.056)+(15.047), (I-338)+(2.056)+(15.063), (I-338)+(2.056)+(15.064), (I-338)+(2.056)+(16.001), (I-338)+(2.056)+(16.002), (I-338)+(2.056)+(16.003), (I-338)+(2.056)+(16.004), (I-338)+(2.056)+(16.005), (I-338)+(2.056)+(16.006), (I-338)+(2.056)+(16.007), (I-338)+(2.056)+(16.008), (I-338)+(2.056)+(17.001), (I-338)+(2.056)+(17.002), (I-338)+(2.056)+(17.003), (I-338)+(2.056)+(17.004), (I-338)+(2.056)+(17.005), (I-338)+(2.056)+(17.006), (I-338)+(2.056)+(17.007), (I-338)+(2.056)+(17.008), (I-338)+(2.056)+(17.009), (I-338)+(2.056)+(17.010), (I-338)+(2.056)+(17.011), (I-338)+(2.056)+(17.012), (I-338)+(2.056)+(18.001), (I-338)+(2.057)+(3.001), (I-338)+(2.057)+(3.002), (I-338)+(2.057)+(3.003), (I-338)+(2.057)+(3.004), (I-338)+(2.057)+(3.005), (I-338)+(2.057)+(3.006), (I-338)+(2.057)+(3.007), (I-338)+(2.057)+(3.008), (I-338)+(2.057)+(3.009), (I-338)+(2.057)+(3.010), (I-338)+(2.057)+(3.011), (I-338)+(2.057)+(3.012), (I-338)+(2.057)+(3.013), (I-338)+(2.057)+(3.014), (I-338)+(2.057)+(3.015), (I-338)+(2.057)+(3.016), (I-338)+(2.057)+(3.017), (I-338)+(2.057)+(3.018), (I-338)+(2.057)+(3.019), (I-338)+(2.057)+(3.020), (I-338)+(2.057)+(3.021), (I-338)+(2.057)+(3.022), (I-338)+(2.057)+(3.023), (I-338)+(2.057)+(3.024), (I-338)+(2.057)+(3.025), (I-338)+(2.057)+(3.026), (I-338)+(2.057)+(3.027), (I-338)+(2.057)+(3.028), (I-338)+(2.057)+(3.029), (I-338)+(2.057)+(3.030), (I-338)+(2.057)+(3.031), (I-338)+(2.057)+(5.001), (I-338)+(2.057)+(5.002), (I-338)+(2.057)+(5.003), (I-338)+(2.057)+(5.004), (I-338)+(2.057)+(5.005), (I-338)+(2.057)+(5.006), (I-338)+(2.057)+(5.007), (I-338)+(2.057)+(5.008), (I-338)+(2.057)+(5.009), (I-338)+(2.057)+(5.010), (I-338)+(2.057)+(5.011), (I-338)+(2.057)+(5.012), (I-338)+(2.057)+(5.013), (I-338)+(2.057)+(5.014), (I-338)+(2.057)+(5.015), (I-338)+(2.057)+(5.016), (I-338)+(2.057)+(5.017), (I-338)+(2.057)+(5.018), (I-338)+(2.057)+(5.019), (I-338)+(2.057)+(5.020), (I-338)+(2.057)+(5.021), (I-338)+(2.057)+(5.022), (I-338)+(2.057)+(5.023), (I-338)+(2.057)+(6.001), (I-338)+(2.057)+(6.002), (I-338)+(2.057)+(6.003), (I-338)+(2.057)+(6.004), (I-338)+(2.057)+(7.001), (I-338)+(2.057)+(7.002), (I-338)+(2.057)+(7.003), (I-338)+(2.057)+(7.004), (I-338)+(2.057)+(7.005), (I-338)+(2.057)+(7.006), (I-338)+(2.057)+(9.001), (I-338)+(2.057)+(9.002), (I-338)+(2.057)+(9.003), (I-338)+(2.057)+(9.004), (I-338)+(2.057)+(9.005), (I-338)+(2.057)+(9.006), (I-338)+(2.057)+(9.007), (I-338)+(2.057)+(9.008), (I-338)+(2.057)+(9.009), (I-338)+(2.057)+(14.001), (I-338)+(2.057)+(14.002), (I-338)+(2.057)+(15.008), (I-338)+(2.057)+(15.011), (I-338)+(2.057)+(15.012), (I-338)+(2.057)+(15.016), (I-338)+(2.057)+(15.025), (I-338)+(2.057)+(15.027), (I-338)+(2.057)+(15.047), (I-338)+(2.057)+(15.063), (I-338)+(2.057)+(15.064), (I-338)+(2.057)+(16.001), (I-338)+(2.057)+(16.002), (I-338)+(2.057)+(16.003), (I-338)+(2.057)+(16.004), (I-338)+(2.057)+(16.005), (I-338)+(2.057)+(16.006), (I-338)+(2.057)+(16.007), (I-338)+(2.057)+(16.008), (I-338)+(2.057)+(17.001), (I-338)+(2.057)+(17.002), (I-338)+(2.057)+(17.003), (I-338)+(2.057)+(17.004), (I-338)+(2.057)+(17.005), (I-338)+(2.057)+(17.006), (I-338)+(2.057)+(17.007), (I-338)+(2.057)+(17.008), (I-338)+(2.057)+(17.009), (I-338)+(2.057)+(17.010), (I-338)+(2.057)+(17.011), (I-338)+(2.057)+(17.012), (I-338)+(2.057)+(18.001), (I-338)+(2.058)+(3.001), (I-338)+(2.058)+(3.002), (I-338)+(2.058)+(3.003), (I-338)+(2.058)+(3.004), (I-338)+(2.058)+(3.005), (I-338)+(2.058)+(3.006), (I-338)+(2.058)+(3.007), (I-338)+(2.058)+(3.008), (I-338)+(2.058)+(3.009), (I-338)+(2.058)+(3.010), (I-338)+(2.058)+(3.011), (I-338)+(2.058)+(3.012), (I-338)+(2.058)+(3.013), (I-338)+(2.058)+(3.014), (I-338)+(2.058)+(3.015), (I-338)+(2.058)+(3.016), (I-338)+(2.058)+(3.017), (I-338)+(2.058)+(3.018), (I-338)+(2.058)+(3.019), (I-338)+(2.058)+(3.020), (I-338)+(2.058)+(3.021), (I-338)+(2.058)+(3.022), (I-338)+(2.058)+(3.023), (I-338)+(2.058)+(3.024), (I-338)+(2.058)+(3.025), (I-338)+(2.058)+(3.026), (I-338)+(2.058)+(3.027), (I-338)+(2.058)+(3.028), (I-338)+(2.058)+(3.029), (I-338)+(2.058)+(3.030), (I-338)+(2.058)+(3.031), (I-338)+(2.058)+(5.001), (I-338)+(2.058)+(5.002), (I-338)+(2.058)+(5.003), (I-338)+(2.058)+(5.004), (I-338)+(2.058)+(5.005), (I-338)+(2.058)+(5.006), (I-338)+(2.058)+(5.007), (I-338)+(2.058)+(5.008), (I-338)+(2.058)+(5.009), (I-338)+(2.058)+(5.010), (I-338)+(2.058)+(5.011), (I-338)+(2.058)+(5.012), (I-338)+(2.058)+(5.013), (I-338)+(2.058)+(5.014), (I-338)+(2.058)+(5.015), (I-338)+(2.058)+(5.016), (I-338)+(2.058)+(5.017), (I-338)+(2.058)+(5.018), (I-338)+(2.058)+(5.019), (I-338)+(2.058)+(5.020), (I-338)+(2.058)+(5.021), (I-338)+(2.058)+(5.022), (I-338)+(2.058)+(5.023), (I-338)+(2.058)+(6.001), (I-338)+(2.058)+(6.002), (I-338)+(2.058)+(6.003), (I-338)+(2.058)+(6.004), (I-338)+(2.058)+(7.001), (I-338)+(2.058)+(7.002), (I-338)+(2.058)+(7.003), (I-338)+(2.058)+(7.004), (I-338)+(2.058)+(7.005), (I-338)+(2.058)+(7.006), (I-338)+(2.058)+(9.001), (I-338)+(2.058)+(9.002), (I-338)+(2.058)+(9.003), (I-338)+(2.058)+(9.004), (I-338)+(2.058)+(9.005), (I-338)+(2.058)+(9.006), (I-338)+(2.058)+(9.007), (I-338)+(2.058)+(9.008), (I-338)+(2.058)+(9.009), (I-338)+(2.058)+(14.001), (I-338)+(2.058)+(14.002), (I-338)+(2.058)+(15.008), (I-338)+(2.058)+(15.011), (I-338)+(2.058)+(15.012), (I-338)+(2.058)+(15.016), (I-338)+(2.058)+(15.025), (I-338)+(2.058)+(15.027), (I-338)+(2.058)+(15.047), (I-338)+(2.058)+(15.063), (I-338)+(2.058)+(15.064), (I-338)+(2.058)+(16.001), (I-338)+(2.058)+(16.002), (I-338)+(2.058)+(16.003), (I-338)+(2.058)+(16.004), (I-338)+(2.058)+(16.005), (I-338)+(2.058)+(16.006), (I-338)+(2.058)+(16.007), (I-338)+(2.058)+(16.008), (I-338)+(2.058)+(17.001), (I-338)+(2.058)+(17.002), (I-338)+(2.058)+(17.003), (I-338)+(2.058)+(17.004), (I-338)+(2.058)+(17.005), (I-338)+(2.058)+(17.006), (I-338)+(2.058)+(17.007), (I-338)+(2.058)+(17.008), (I-338)+(2.058)+(17.009), (I-338)+(2.058)+(17.010), (I-338)+(2.058)+(17.011), (I-338)+(2.058)+(17.012), (I-338)+(2.058)+(18.001), (I-338)+(2.059)+(3.001), (I-338)+(2.059)+(3.002), (I-338)+(2.059)+(3.003), (I-338)+(2.059)+(3.004), (I-338)+(2.059)+(3.005), (I-338)+(2.059)+(3.006), (I-338)+(2.059)+(3.007), (I-338)+(2.059)+(3.008), (I-338)+(2.059)+(3.009), (I-338)+(2.059)+(3.010), (I-338)+(2.059)+(3.011), (I-338)+(2.059)+(3.012), (I-338)+(2.059)+(3.013), (I-338)+(2.059)+(3.014), (I-338)+(2.059)+(3.015), (I-338)+(2.059)+(3.016), (I-338)+(2.059)+(3.017), (I-338)+(2.059)+(3.018), (I-338)+(2.059)+(3.019), (I-338)+(2.059)+(3.020), (I-338)+(2.059)+(3.021), (I-338)+(2.059)+(3.022), (I-338)+(2.059)+(3.023), (I-338)+(2.059)+(3.024), (I-338)+(2.059)+(3.025), (I-338)+(2.059)+(3.026), (I-338)+(2.059)+(3.027), (I-338)+(2.059)+(3.028), (I-338)+(2.059)+(3.029), (I-338)+(2.059)+(3.030), (I-338)+(2.059)+(3.031), (I-338)+(2.059)+(5.001), (I-338)+(2.059)+(5.002), (I-338)+(2.059)+(5.003), (I-338)+(2.059)+(5.004), (I-338)+(2.059)+(5.005), (I-338)+(2.059)+(5.006), (I-338)+(2.059)+(5.007), (I-338)+(2.059)+(5.008), (I-338)+(2.059)+(5.009), (I-338)+(2.059)+(5.010), (I-338)+(2.059)+(5.011), (I-338)+(2.059)+(5.012), (I-338)+(2.059)+(5.013), (I-338)+(2.059)+(5.014), (I-338)+(2.059)+(5.015), (I-338)+(2.059)+(5.016), (I-338)+(2.059)+(5.017), (I-338)+(2.059)+(5.018), (I-338)+(2.059)+(5.019), (I-338)+(2.059)+(5.020), (I-338)+(2.059)+(5.021), (I-338)+(2.059)+(5.022), (I-338)+(2.059)+(5.023), (I-338)+(2.059)+(6.001), (I-338)+(2.059)+(6.002), (I-338)+(2.059)+(6.003), (I-338)+(2.059)+(6.004), (I-338)+(2.059)+(7.001), (I-338)+(2.059)+(7.002), (I-338)+(2.059)+(7.003), (I-338)+(2.059)+(7.004), (I-338)+(2.059)+(7.005), (I-338)+(2.059)+(7.006), (I-338)+(2.059)+(9.001), (I-338)+(2.059)+(9.002), (I-338)+(2.059)+(9.003), (I-338)+(2.059)+(9.004), (I-338)+(2.059)+(9.005), (I-338)+(2.059)+(9.006), (I-338)+(2.059)+(9.007), (I-338)+(2.059)+(9.008), (I-338)+(2.059)+(9.009), (I-338)+(2.059)+(14.001), (I-338)+(2.059)+(14.002), (I-338)+(2.059)+(15.008), (I-338)+(2.059)+(15.011), (I-338)+(2.059)+(15.012), (I-338)+(2.059)+(15.016), (I-338)+(2.059)+(15.025), (I-338)+(2.059)+(15.027), (I-338)+(2.059)+(15.047), (I-338)+(2.059)+(15.063), (I-338)+(2.059)+(15.064), (I-338)+(2.059)+(16.001), (I-338)+(2.059)+(16.002), (I-338)+(2.059)+(16.003), (I-338)+(2.059)+(16.004), (I-338)+(2.059)+(16.005), (I-338)+(2.059)+(16.006), (I-338)+(2.059)+(16.007), (I-338)+(2.059)+(16.008), (I-338)+(2.059)+(17.001), (I-338)+(2.059)+(17.002), (I-338)+(2.059)+(17.003), (I-338)+(2.059)+(17.004), (I-338)+(2.059)+(17.005), (I-338)+(2.059)+(17.006), (I-338)+(2.059)+(17.007), (I-338)+(2.059)+(17.008), (I-338)+(2.059)+(17.009), (I-338)+(2.059)+(17.010), (I-338)+(2.059)+(17.011), (I-338)+(2.059)+(17.012), (I-338)+(2.059)+(18.001), (I-338)+(3.001)+(3.025), (I-338)+(3.001)+(3.030), (I-338)+(3.001)+(3.031), (I-338)+(3.001)+(5.001), (I-338)+(3.001)+(5.002), (I-338)+(3.001)+(5.003), (I-338)+(3.001)+(5.004), (I-338)+(3.001)+(5.005), (I-338)+(3.001)+(5.006), (I-338)+(3.001)+(5.007), (I-338)+(3.001)+(5.008), (I-338)+(3.001)+(5.009), (I-338)+(3.001)+(5.010), (I-338)+(3.001)+(5.011), (I-338)+(3.001)+(5.012), (I-338)+(3.001)+(5.013), (I-338)+(3.001)+(5.014), (I-338)+(3.001)+(5.015), (I-338)+(3.001)+(5.016), (I-338)+(3.001)+(5.017), (I-338)+(3.001)+(5.018), (I-338)+(3.001)+(5.019), (I-338)+(3.001)+(5.020), (I-338)+(3.001)+(5.021), (I-338)+(3.001)+(5.022), (I-338)+(3.001)+(5.023), (I-338)+(3.001)+(6.001), (I-338)+(3.001)+(6.002), (I-338)+(3.001)+(6.003), (I-338)+(3.001)+(6.004), (I-338)+(3.001)+(7.001), (I-338)+(3.001)+(7.002), (I-338)+(3.001)+(7.003), (I-338)+(3.001)+(7.004), (I-338)+(3.001)+(7.005), (I-338)+(3.001)+(7.006), (I-338)+(3.001)+(9.001), (I-338)+(3.001)+(9.002), (I-338)+(3.001)+(9.003), (I-338)+(3.001)+(9.004), (I-338)+(3.001)+(9.005), (I-338)+(3.001)+(9.006), (I-338)+(3.001)+(9.007), (I-338)+(3.001)+(9.008), (I-338)+(3.001)+(9.009), (I-338)+(3.001)+(14.001), (I-338)+(3.001)+(14.002), (I-338)+(3.001)+(15.008), (I-338)+(3.001)+(15.011), (I-338)+(3.001)+(15.012), (I-338)+(3.001)+(15.016), (I-338)+(3.001)+(15.025), (I-338)+(3.001)+(15.027), (I-338)+(3.001)+(15.047), (I-338)+(3.001)+(15.063), (I-338)+(3.001)+(15.064), (I-338)+(3.001)+(16.001), (I-338)+(3.001)+(16.002), (I-338)+(3.001)+(16.003), (I-338)+(3.001)+(16.004), (I-338)+(3.001)+(16.005), (I-338)+(3.001)+(16.006), (I-338)+(3.001)+(16.007), (I-338)+(3.001)+(16.008), (I-338)+(3.001)+(17.001), (I-338)+(3.001)+(17.002), (I-338)+(3.001)+(17.003), (I-338)+(3.001)+(17.004), (I-338)+(3.001)+(17.005), (I-338)+(3.001)+(17.006), (I-338)+(3.001)+(17.007), (I-338)+(3.001)+(17.008), (I-338)+(3.001)+(17.009), (I-338)+(3.001)+(17.010), (I-338)+(3.001)+(17.011), (I-338)+(3.001)+(17.012), (I-338)+(3.001)+(18.001), (I-338)+(3.002)+(3.025), (I-338)+(3.002)+(3.030), (I-338)+(3.002)+(3.031), (I-338)+(3.002)+(5.001), (I-338)+(3.002)+(5.002), (I-338)+(3.002)+(5.003), (I-338)+(3.002)+(5.004), (I-338)+(3.002)+(5.005), (I-338)+(3.002)+(5.006), (I-338)+(3.002)+(5.007), (I-338)+(3.002)+(5.008), (I-338)+(3.002)+(5.009), (I-338)+(3.002)+(5.010), (I-338)+(3.002)+(5.011), (I-338)+(3.002)+(5.012), (I-338)+(3.002)+(5.013), (I-338)+(3.002)+(5.014), (I-338)+(3.002)+(5.015), (I-338)+(3.002)+(5.016), (I-338)+(3.002)+(5.017), (I-338)+(3.002)+(5.018), (I-338)+(3.002)+(5.019), (I-338)+(3.002)+(5.020), (I-338)+(3.002)+(5.021), (I-338)+(3.002)+(5.022), (I-338)+(3.002)+(5.023), (I-338)+(3.002)+(6.001), (I-338)+(3.002)+(6.002), (I-338)+(3.002)+(6.003), (I-338)+(3.002)+(6.004), (I-338)+(3.002)+(7.001), (I-338)+(3.002)+(7.002), (I-338)+(3.002)+(7.003), (I-338)+(3.002)+(7.004), (I-338)+(3.002)+(7.005), (I-338)+(3.002)+(7.006), (I-338)+(3.002)+(9.001), (I-338)+(3.002)+(9.002), (I-338)+(3.002)+(9.003), (I-338)+(3.002)+(9.004), (I-338)+(3.002)+(9.005), (I-338)+(3.002)+(9.006), (I-338)+(3.002)+(9.007), (I-338)+(3.002)+(9.008), (I-338)+(3.002)+(9.009), (I-338)+(3.002)+(14.001), (I-338)+(3.002)+(14.002), (I-338)+(3.002)+(15.008), (I-338)+(3.002)+(15.011), (I-338)+(3.002)+(15.012), (I-338)+(3.002)+(15.016), (I-338)+(3.002)+(15.025), (I-338)+(3.002)+(15.027), (I-338)+(3.002)+(15.047), (I-338)+(3.002)+(15.063), (I-338)+(3.002)+(15.064), (I-338)+(3.002)+(16.001), (I-338)+(3.002)+(16.002), (I-338)+(3.002)+(16.003), (I-338)+(3.002)+(16.004), (I-338)+(3.002)+(16.005), (I-338)+(3.002)+(16.006), (I-338)+(3.002)+(16.007), (I-338)+(3.002)+(16.008), (I-338)+(3.002)+(17.001), (I-338)+(3.002)+(17.002), (I-338)+(3.002)+(17.003), (I-338)+(3.002)+(17.004), (I-338)+(3.002)+(17.005), (I-338)+(3.002)+(17.006), (I-338)+(3.002)+(17.007), (I-338)+(3.002)+(17.008), (I-338)+(3.002)+(17.009), (I-338)+(3.002)+(17.010), (I-338)+(3.002)+(17.011), (I-338)+(3.002)+(17.012), (I-338)+(3.002)+(18.001), (I-338)+(3.003)+(3.025), (I-338)+(3.003)+(3.030), (I-338)+(3.003)+(3.031), (I-338)+(3.003)+(5.001), (I-338)+(3.003)+(5.002), (I-338)+(3.003)+(5.003), (I-338)+(3.003)+(5.004), (I-338)+(3.003)+(5.005), (I-338)+(3.003)+(5.006), (I-338)+(3.003)+(5.007), (I-338)+(3.003)+(5.008), (I-338)+(3.003)+(5.009), (I-338)+(3.003)+(5.010), (I-338)+(3.003)+(5.011), (I-338)+(3.003)+(5.012), (I-338)+(3.003)+(5.013), (I-338)+(3.003)+(5.014), (I-338)+(3.003)+(5.015), (I-338)+(3.003)+(5.016), (I-338)+(3.003)+(5.017), (I-338)+(3.003)+(5.018), (I-338)+(3.003)+(5.019), (I-338)+(3.003)+(5.020), (I-338)+(3.003)+(5.021), (I-338)+(3.003)+(5.022), (I-338)+(3.003)+(5.023), (I-338)+(3.003)+(6.001), (I-338)+(3.003)+(6.002), (I-338)+(3.003)+(6.003), (I-338)+(3.003)+(6.004), (I-338)+(3.003)+(7.001), (I-338)+(3.003)+(7.002), (I-338)+(3.003)+(7.003), (I-338)+(3.003)+(7.004), (I-338)+(3.003)+(7.005), (I-338)+(3.003)+(7.006), (I-338)+(3.003)+(9.001), (I-338)+(3.003)+(9.002), (I-338)+(3.003)+(9.003), (I-338)+(3.003)+(9.004), (I-338)+(3.003)+(9.005), (I-338)+(3.003)+(9.006), (I-338)+(3.003)+(9.007), (I-338)+(3.003)+(9.008), (I-338)+(3.003)+(9.009), (I-338)+(3.003)+(14.001), (I-338)+(3.003)+(14.002), (I-338)+(3.003)+(15.008), (I-338)+(3.003)+(15.011), (I-338)+(3.003)+(15.012), (I-338)+(3.003)+(15.016), (I-338)+(3.003)+(15.025), (I-338)+(3.003)+(15.027), (I-338)+(3.003)+(15.047), (I-338)+(3.003)+(15.063), (I-338)+(3.003)+(15.064), (I-338)+(3.003)+(16.001), (I-338)+(3.003)+(16.002), (I-338)+(3.003)+(16.003), (I-338)+(3.003)+(16.004), (I-338)+(3.003)+(16.005), (I-338)+(3.003)+(16.006), (I-338)+(3.003)+(16.007), (I-338)+(3.003)+(16.008), (I-338)+(3.003)+(17.001), (I-338)+(3.003)+(17.002), (I-338)+(3.003)+(17.003), (I-338)+(3.003)+(17.004), (I-338)+(3.003)+(17.005), (I-338)+(3.003)+(17.006), (I-338)+(3.003)+(17.007), (I-338)+(3.003)+(17.008), (I-338)+(3.003)+(17.009), (I-338)+(3.003)+(17.010), (I-338)+(3.003)+(17.011), (I-338)+(3.003)+(17.012), (I-338)+(3.003)+(18.001), (I-338)+(3.004)+(3.025), (I-338)+(3.004)+(3.030), (I-338)+(3.004)+(3.031), (I-338)+(3.004)+(5.001), (I-338)+(3.004)+(5.002), (I-338)+(3.004)+(5.003), (I-338)+(3.004)+(5.004), (I-338)+(3.004)+(5.005), (I-338)+(3.004)+(5.006), (I-338)+(3.004)+(5.007), (I-338)+(3.004)+(5.008), (I-338)+(3.004)+(5.009), (I-338)+(3.004)+(5.010), (I-338)+(3.004)+(5.011), (I-338)+(3.004)+(5.012), (I-338)+(3.004)+(5.013), (I-338)+(3.004)+(5.014), (I-338)+(3.004)+(5.015), (I-338)+(3.004)+(5.016), (I-338)+(3.004)+(5.017), (I-338)+(3.004)+(5.018), (I-338)+(3.004)+(5.019), (I-338)+(3.004)+(5.020), (I-338)+(3.004)+(5.021), (I-338)+(3.004)+(5.022), (I-338)+(3.004)+(5.023), (I-338)+(3.004)+(6.001), (I-338)+(3.004)+(6.002), (I-338)+(3.004)+(6.003), (I-338)+(3.004)+(6.004), (I-338)+(3.004)+(7.001), (I-338)+(3.004)+(7.002), (I-338)+(3.004)+(7.003), (I-338)+(3.004)+(7.004), (I-338)+(3.004)+(7.005), (I-338)+(3.004)+(7.006), (I-338)+(3.004)+(9.001), (I-338)+(3.004)+(9.002), (I-338)+(3.004)+(9.003), (I-338)+(3.004)+(9.004), (I-338)+(3.004)+(9.005), (I-338)+(3.004)+(9.006), (I-338)+(3.004)+(9.007), (I-338)+(3.004)+(9.008), (I-338)+(3.004)+(9.009), (I-338)+(3.004)+(14.001), (I-338)+(3.004)+(14.002), (I-338)+(3.004)+(15.008), (I-338)+(3.004)+(15.011), (I-338)+(3.004)+(15.012), (I-338)+(3.004)+(15.016), (I-338)+(3.004)+(15.025), (I-338)+(3.004)+(15.027), (I-338)+(3.004)+(15.047), (I-338)+(3.004)+(15.063), (I-338)+(3.004)+(15.064), (I-338)+(3.004)+(16.001), (I-338)+(3.004)+(16.002), (I-338)+(3.004)+(16.003), (I-338)+(3.004)+(16.004), (I-338)+(3.004)+(16.005), (I-338)+(3.004)+(16.006), (I-338)+(3.004)+(16.007), (I-338)+(3.004)+(16.008), (I-338)+(3.004)+(17.001), (I-338)+(3.004)+(17.002), (I-338)+(3.004)+(17.003), (I-338)+(3.004)+(17.004), (I-338)+(3.004)+(17.005), (I-338)+(3.004)+(17.006), (I-338)+(3.004)+(17.007), (I-338)+(3.004)+(17.008), (I-338)+(3.004)+(17.009), (I-338)+(3.004)+(17.010), (I-338)+(3.004)+(17.011), (I-338)+(3.004)+(17.012), (I-338)+(3.004)+(18.001), (I-338)+(3.005)+(3.025), (I-338)+(3.005)+(3.030), (I-338)+(3.005)+(3.031), (I-338)+(3.005)+(5.001), (I-338)+(3.005)+(5.002), (I-338)+(3.005)+(5.003), (I-338)+(3.005)+(5.004), (I-338)+(3.005)+(5.005), (I-338)+(3.005)+(5.006), (I-338)+(3.005)+(5.007), (I-338)+(3.005)+(5.008), (I-338)+(3.005)+(5.009), (I-338)+(3.005)+(5.010), (I-338)+(3.005)+(5.011), (I-338)+(3.005)+(5.012), (I-338)+(3.005)+(5.013), (I-338)+(3.005)+(5.014), (I-338)+(3.005)+(5.015), (I-338)+(3.005)+(5.016), (I-338)+(3.005)+(5.017), (I-338)+(3.005)+(5.018), (I-338)+(3.005)+(5.019), (I-338)+(3.005)+(5.020), (I-338)+(3.005)+(5.021), (I-338)+(3.005)+(5.022), (I-338)+(3.005)+(5.023), (I-338)+(3.005)+(6.001), (I-338)+(3.005)+(6.002), (I-338)+(3.005)+(6.003), (I-338)+(3.005)+(6.004), (I-338)+(3.005)+(7.001), (I-338)+(3.005)+(7.002), (I-338)+(3.005)+(7.003), (I-338)+(3.005)+(7.004), (I-338)+(3.005)+(7.005), (I-338)+(3.005)+(7.006), (I-338)+(3.005)+(9.001), (I-338)+(3.005)+(9.002), (I-338)+(3.005)+(9.003), (I-338)+(3.005)+(9.004), (I-338)+(3.005)+(9.005), (I-338)+(3.005)+(9.006), (I-338)+(3.005)+(9.007), (I-338)+(3.005)+(9.008), (I-338)+(3.005)+(9.009), (I-338)+(3.005)+(14.001), (I-338)+(3.005)+(14.002), (I-338)+(3.005)+(15.008), (I-338)+(3.005)+(15.011), (I-338)+(3.005)+(15.012), (I-338)+(3.005)+(15.016), (I-338)+(3.005)+(15.025), (I-338)+(3.005)+(15.027), (I-338)+(3.005)+(15.047), (I-338)+(3.005)+(15.063), (I-338)+(3.005)+(15.064), (I-338)+(3.005)+(16.001), (I-338)+(3.005)+(16.002), (I-338)+(3.005)+(16.003), (I-338)+(3.005)+(16.004), (I-338)+(3.005)+(16.005), (I-338)+(3.005)+(16.006), (I-338)+(3.005)+(16.007), (I-338)+(3.005)+(16.008), (I-338)+(3.005)+(17.001), (I-338)+(3.005)+(17.002), (I-338)+(3.005)+(17.003), (I-338)+(3.005)+(17.004), (I-338)+(3.005)+(17.005), (I-338)+(3.005)+(17.006), (I-338)+(3.005)+(17.007), (I-338)+(3.005)+(17.008), (I-338)+(3.005)+(17.009), (I-338)+(3.005)+(17.010), (I-338)+(3.005)+(17.011), (I-338)+(3.005)+(17.012), (I-338)+(3.005)+(18.001), (I-338)+(3.006)+(3.025), (I-338)+(3.006)+(3.030), (I-338)+(3.006)+(3.031), (I-338)+(3.006)+(5.001), (I-338)+(3.006)+(5.002), (I-338)+(3.006)+(5.003), (I-338)+(3.006)+(5.004), (I-338)+(3.006)+(5.005), (I-338)+(3.006)+(5.006), (I-338)+(3.006)+(5.007), (I-338)+(3.006)+(5.008), (I-338)+(3.006)+(5.009), (I-338)+(3.006)+(5.010), (I-338)+(3.006)+(5.011), (I-338)+(3.006)+(5.012), (I-338)+(3.006)+(5.013), (I-338)+(3.006)+(5.014), (I-338)+(3.006)+(5.015), (I-338)+(3.006)+(5.016), (I-338)+(3.006)+(5.017), (I-338)+(3.006)+(5.018), (I-338)+(3.006)+(5.019), (I-338)+(3.006)+(5.020), (I-338)+(3.006)+(5.021), (I-338)+(3.006)+(5.022), (I-338)+(3.006)+(5.023), (I-338)+(3.006)+(6.001), (I-338)+(3.006)+(6.002), (I-338)+(3.006)+(6.003), (I-338)+(3.006)+(6.004), (I-338)+(3.006)+(7.001), (I-338)+(3.006)+(7.002), (I-338)+(3.006)+(7.003), (I-338)+(3.006)+(7.004), (I-338)+(3.006)+(7.005), (I-338)+(3.006)+(7.006), (I-338)+(3.006)+(9.001), (I-338)+(3.006)+(9.002), (I-338)+(3.006)+(9.003), (I-338)+(3.006)+(9.004), (I-338)+(3.006)+(9.005), (I-338)+(3.006)+(9.006), (I-338)+(3.006)+(9.007), (I-338)+(3.006)+(9.008), (I-338)+(3.006)+(9.009), (I-338)+(3.006)+(14.001), (I-338)+(3.006)+(14.002), (I-338)+(3.006)+(15.008), (I-338)+(3.006)+(15.011), (I-338)+(3.006)+(15.012), (I-338)+(3.006)+(15.016), (I-338)+(3.006)+(15.025), (I-338)+(3.006)+(15.027), (I-338)+(3.006)+(15.047), (I-338)+(3.006)+(15.063), (I-338)+(3.006)+(15.064), (I-338)+(3.006)+(16.001), (I-338)+(3.006)+(16.002), (I-338)+(3.006)+(16.003), (I-338)+(3.006)+(16.004), (I-338)+(3.006)+(16.005), (I-338)+(3.006)+(16.006), (I-338)+(3.006)+(16.007), (I-338)+(3.006)+(16.008), (I-338)+(3.006)+(17.001), (I-338)+(3.006)+(17.002), (I-338)+(3.006)+(17.003), (I-338)+(3.006)+(17.004), (I-338)+(3.006)+(17.005), (I-338)+(3.006)+(17.006), (I-338)+(3.006)+(17.007), (I-338)+(3.006)+(17.008), (I-338)+(3.006)+(17.009), (I-338)+(3.006)+(17.010), (I-338)+(3.006)+(17.011), (I-338)+(3.006)+(17.012), (I-338)+(3.006)+(18.001), (I-338)+(3.007)+(3.025), (I-338)+(3.007)+(3.030), (I-338)+(3.007)+(3.031), (I-338)+(3.007)+(5.001), (I-338)+(3.007)+(5.002), (I-338)+(3.007)+(5.003), (I-338)+(3.007)+(5.004), (I-338)+(3.007)+(5.005), (I-338)+(3.007)+(5.006), (I-338)+(3.007)+(5.007), (I-338)+(3.007)+(5.008), (I-338)+(3.007)+(5.009), (I-338)+(3.007)+(5.010), (I-338)+(3.007)+(5.011), (I-338)+(3.007)+(5.012), (I-338)+(3.007)+(5.013), (I-338)+(3.007)+(5.014), (I-338)+(3.007)+(5.015), (I-338)+(3.007)+(5.016), (I-338)+(3.007)+(5.017), (I-338)+(3.007)+(5.018), (I-338)+(3.007)+(5.019), (I-338)+(3.007)+(5.020), (I-338)+(3.007)+(5.021), (I-338)+(3.007)+(5.022), (I-338)+(3.007)+(5.023), (I-338)+(3.007)+(6.001), (I-338)+(3.007)+(6.002), (I-338)+(3.007)+(6.003), (I-338)+(3.007)+(6.004), (I-338)+(3.007)+(7.001), (I-338)+(3.007)+(7.002), (I-338)+(3.007)+(7.003), (I-338)+(3.007)+(7.004), (I-338)+(3.007)+(7.005), (I-338)+(3.007)+(7.006), (I-338)+(3.007)+(9.001), (I-338)+(3.007)+(9.002), (I-338)+(3.007)+(9.003), (I-338)+(3.007)+(9.004), (I-338)+(3.007)+(9.005), (I-338)+(3.007)+(9.006), (I-338)+(3.007)+(9.007), (I-338)+(3.007)+(9.008), (I-338)+(3.007)+(9.009), (I-338)+(3.007)+(14.001), (I-338)+(3.007)+(14.002), (I-338)+(3.007)+(15.008), (I-338)+(3.007)+(15.011), (I-338)+(3.007)+(15.012), (I-338)+(3.007)+(15.016), (I-338)+(3.007)+(15.025), (I-338)+(3.007)+(15.027), (I-338)+(3.007)+(15.047), (I-338)+(3.007)+(15.063), (I-338)+(3.007)+(15.064), (I-338)+(3.007)+(16.001), (I-338)+(3.007)+(16.002), (I-338)+(3.007)+(16.003), (I-338)+(3.007)+(16.004), (I-338)+(3.007)+(16.005), (I-338)+(3.007)+(16.006), (I-338)+(3.007)+(16.007), (I-338)+(3.007)+(16.008), (I-338)+(3.007)+(17.001), (I-338)+(3.007)+(17.002), (I-338)+(3.007)+(17.003), (I-338)+(3.007)+(17.004), (I-338)+(3.007)+(17.005), (I-338)+(3.007)+(17.006), (I-338)+(3.007)+(17.007), (I-338)+(3.007)+(17.008), (I-338)+(3.007)+(17.009), (I-338)+(3.007)+(17.010), (I-338)+(3.007)+(17.011), (I-338)+(3.007)+(17.012), (I-338)+(3.007)+(18.001), (I-338)+(3.008)+(3.025), (I-338)+(3.008)+(3.030), (I-338)+(3.008)+(3.031), (I-338)+(3.008)+(5.001), (I-338)+(3.008)+(5.002), (I-338)+(3.008)+(5.003), (I-338)+(3.008)+(5.004), (I-338)+(3.008)+(5.005), (I-338)+(3.008)+(5.006), (I-338)+(3.008)+(5.007), (I-338)+(3.008)+(5.008), (I-338)+(3.008)+(5.009), (I-338)+(3.008)+(5.010), (I-338)+(3.008)+(5.011), (I-338)+(3.008)+(5.012), (I-338)+(3.008)+(5.013), (I-338)+(3.008)+(5.014), (I-338)+(3.008)+(5.015), (I-338)+(3.008)+(5.016), (I-338)+(3.008)+(5.017), (I-338)+(3.008)+(5.018), (I-338)+(3.008)+(5.019), (I-338)+(3.008)+(5.020), (I-338)+(3.008)+(5.021), (I-338)+(3.008)+(5.022), (I-338)+(3.008)+(5.023), (I-338)+(3.008)+(6.001), (I-338)+(3.008)+(6.002), (I-338)+(3.008)+(6.003), (I-338)+(3.008)+(6.004), (I-338)+(3.008)+(7.001), (I-338)+(3.008)+(7.002), (I-338)+(3.008)+(7.003), (I-338)+(3.008)+(7.004), (I-338)+(3.008)+(7.005), (I-338)+(3.008)+(7.006), (I-338)+(3.008)+(9.001), (I-338)+(3.008)+(9.002), (I-338)+(3.008)+(9.003), (I-338)+(3.008)+(9.004), (I-338)+(3.008)+(9.005), (I-338)+(3.008)+(9.006), (I-338)+(3.008)+(9.007), (I-338)+(3.008)+(9.008), (I-338)+(3.008)+(9.009), (I-338)+(3.008)+(14.001), (I-338)+(3.008)+(14.002), (I-338)+(3.008)+(15.008), (I-338)+(3.008)+(15.011), (I-338)+(3.008)+(15.012), (I-338)+(3.008)+(15.016), (I-338)+(3.008)+(15.025), (I-338)+(3.008)+(15.027), (I-338)+(3.008)+(15.047), (I-338)+(3.008)+(15.063), (I-338)+(3.008)+(15.064), (I-338)+(3.008)+(16.001), (I-338)+(3.008)+(16.002), (I-338)+(3.008)+(16.003), (I-338)+(3.008)+(16.004), (I-338)+(3.008)+(16.005), (I-338)+(3.008)+(16.006), (I-338)+(3.008)+(16.007), (I-338)+(3.008)+(16.008), (I-338)+(3.008)+(17.001), (I-338)+(3.008)+(17.002), (I-338)+(3.008)+(17.003), (I-338)+(3.008)+(17.004), (I-338)+(3.008)+(17.005), (I-338)+(3.008)+(17.006), (I-338)+(3.008)+(17.007), (I-338)+(3.008)+(17.008), (I-338)+(3.008)+(17.009), (I-338)+(3.008)+(17.010), (I-338)+(3.008)+(17.011), (I-338)+(3.008)+(17.012), (I-338)+(3.008)+(18.001), (I-338)+(3.009)+(3.025), (I-338)+(3.009)+(3.030), (I-338)+(3.009)+(3.031), (I-338)+(3.009)+(5.001), (I-338)+(3.009)+(5.002), (I-338)+(3.009)+(5.003), (I-338)+(3.009)+(5.004), (I-338)+(3.009)+(5.005), (I-338)+(3.009)+(5.006), (I-338)+(3.009)+(5.007), (I-338)+(3.009)+(5.008), (I-338)+(3.009)+(5.009), (I-338)+(3.009)+(5.010), (I-338)+(3.009)+(5.011), (I-338)+(3.009)+(5.012), (I-338)+(3.009)+(5.013), (I-338)+(3.009)+(5.014), (I-338)+(3.009)+(5.015), (I-338)+(3.009)+(5.016), (I-338)+(3.009)+(5.017), (I-338)+(3.009)+(5.018), (I-338)+(3.009)+(5.019), (I-338)+(3.009)+(5.020), (I-338)+(3.009)+(5.021), (I-338)+(3.009)+(5.022), (I-338)+(3.009)+(5.023), (I-338)+(3.009)+(6.001), (I-338)+(3.009)+(6.002), (I-338)+(3.009)+(6.003), (I-338)+(3.009)+(6.004), (I-338)+(3.009)+(7.001), (I-338)+(3.009)+(7.002), (I-338)+(3.009)+(7.003), (I-338)+(3.009)+(7.004), (I-338)+(3.009)+(7.005), (I-338)+(3.009)+(7.006), (I-338)+(3.009)+(9.001), (I-338)+(3.009)+(9.002), (I-338)+(3.009)+(9.003), (I-338)+(3.009)+(9.004), (I-338)+(3.009)+(9.005), (I-338)+(3.009)+(9.006), (I-338)+(3.009)+(9.007), (I-338)+(3.009)+(9.008), (I-338)+(3.009)+(9.009), (I-338)+(3.009)+(14.001), (I-338)+(3.009)+(14.002), (I-338)+(3.009)+(15.008), (I-338)+(3.009)+(15.011), (I-338)+(3.009)+(15.012), (I-338)+(3.009)+(15.016), (I-338)+(3.009)+(15.025), (I-338)+(3.009)+(15.027), (I-338)+(3.009)+(15.047), (I-338)+(3.009)+(15.063), (I-338)+(3.009)+(15.064), (I-338)+(3.009)+(16.001), (I-338)+(3.009)+(16.002), (I-338)+(3.009)+(16.003), (I-338)+(3.009)+(16.004), (I-338)+(3.009)+(16.005), (I-338)+(3.009)+(16.006), (I-338)+(3.009)+(16.007), (I-338)+(3.009)+(16.008), (I-338)+(3.009)+(17.001), (I-338)+(3.009)+(17.002), (I-338)+(3.009)+(17.003), (I-338)+(3.009)+(17.004), (I-338)+(3.009)+(17.005), (I-338)+(3.009)+(17.006), (I-338)+(3.009)+(17.007), (I-338)+(3.009)+(17.008), (I-338)+(3.009)+(17.009), (I-338)+(3.009)+(17.010), (I-338)+(3.009)+(17.011), (I-338)+(3.009)+(17.012), (I-338)+(3.009)+(18.001), (I-338)+(3.010)+(3.025), (I-338)+(3.010)+(3.030), (I-338)+(3.010)+(3.031), (I-338)+(3.010)+(5.001), (I-338)+(3.010)+(5.002), (I-338)+(3.010)+(5.003), (I-338)+(3.010)+(5.004), (I-338)+(3.010)+(5.005), (I-338)+(3.010)+(5.006), (I-338)+(3.010)+(5.007), (I-338)+(3.010)+(5.008), (I-338)+(3.010)+(5.009), (I-338)+(3.010)+(5.010), (I-338)+(3.010)+(5.011), (I-338)+(3.010)+(5.012), (I-338)+(3.010)+(5.013), (I-338)+(3.010)+(5.014), (I-338)+(3.010)+(5.015), (I-338)+(3.010)+(5.016), (I-338)+(3.010)+(5.017), (I-338)+(3.010)+(5.018), (I-338)+(3.010)+(5.019), (I-338)+(3.010)+(5.020), (I-338)+(3.010)+(5.021), (I-338)+(3.010)+(5.022), (I-338)+(3.010)+(5.023), (I-338)+(3.010)+(6.001), (I-338)+(3.010)+(6.002), (I-338)+(3.010)+(6.003), (I-338)+(3.010)+(6.004), (I-338)+(3.010)+(7.001), (I-338)+(3.010)+(7.002), (I-338)+(3.010)+(7.003), (I-338)+(3.010)+(7.004), (I-338)+(3.010)+(7.005), (I-338)+(3.010)+(7.006), (I-338)+(3.010)+(9.001), (I-338)+(3.010)+(9.002), (I-338)+(3.010)+(9.003), (I-338)+(3.010)+(9.004), (I-338)+(3.010)+(9.005), (I-338)+(3.010)+(9.006), (I-338)+(3.010)+(9.007), (I-338)+(3.010)+(9.008), (I-338)+(3.010)+(9.009), (I-338)+(3.010)+(14.001), (I-338)+(3.010)+(14.002), (I-338)+(3.010)+(15.008), (I-338)+(3.010)+(15.011), (I-338)+(3.010)+(15.012), (I-338)+(3.010)+(15.016), (I-338)+(3.010)+(15.025), (I-338)+(3.010)+(15.027), (I-338)+(3.010)+(15.047), (I-338)+(3.010)+(15.063), (I-338)+(3.010)+(15.064), (I-338)+(3.010)+(16.001), (I-338)+(3.010)+(16.002), (I-338)+(3.010)+(16.003), (I-338)+(3.010)+(16.004), (I-338)+(3.010)+(16.005), (I-338)+(3.010)+(16.006), (I-338)+(3.010)+(16.007), (I-338)+(3.010)+(16.008), (I-338)+(3.010)+(17.001), (I-338)+(3.010)+(17.002), (I-338)+(3.010)+(17.003), (I-338)+(3.010)+(17.004), (I-338)+(3.010)+(17.005), (I-338)+(3.010)+(17.006), (I-338)+(3.010)+(17.007), (I-338)+(3.010)+(17.008), (I-338)+(3.010)+(17.009), (I-338)+(3.010)+(17.010), (I-338)+(3.010)+(17.011), (I-338)+(3.010)+(17.012), (I-338)+(3.010)+(18.001), (I-338)+(3.011)+(3.025), (I-338)+(3.011)+(3.030), (I-338)+(3.011)+(3.031), (I-338)+(3.011)+(5.001), (I-338)+(3.011)+(5.002), (I-338)+(3.011)+(5.003), (I-338)+(3.011)+(5.004), (I-338)+(3.011)+(5.005), (I-338)+(3.011)+(5.006), (I-338)+(3.011)+(5.007), (I-338)+(3.011)+(5.008), (I-338)+(3.011)+(5.009), (I-338)+(3.011)+(5.010), (I-338)+(3.011)+(5.011), (I-338)+(3.011)+(5.012), (I-338)+(3.011)+(5.013), (I-338)+(3.011)+(5.014), (I-338)+(3.011)+(5.015), (I-338)+(3.011)+(5.016), (I-338)+(3.011)+(5.017), (I-338)+(3.011)+(5.018), (I-338)+(3.011)+(5.019), (I-338)+(3.011)+(5.020), (I-338)+(3.011)+(5.021), (I-338)+(3.011)+(5.022), (I-338)+(3.011)+(5.023), (I-338)+(3.011)+(6.001), (I-338)+(3.011)+(6.002), (I-338)+(3.011)+(6.003), (I-338)+(3.011)+(6.004), (I-338)+(3.011)+(7.001), (I-338)+(3.011)+(7.002), (I-338)+(3.011)+(7.003), (I-338)+(3.011)+(7.004), (I-338)+(3.011)+(7.005), (I-338)+(3.011)+(7.006), (I-338)+(3.011)+(9.001), (I-338)+(3.011)+(9.002), (I-338)+(3.011)+(9.003), (I-338)+(3.011)+(9.004), (I-338)+(3.011)+(9.005), (I-338)+(3.011)+(9.006), (I-338)+(3.011)+(9.007), (I-338)+(3.011)+(9.008), (I-338)+(3.011)+(9.009), (I-338)+(3.011)+(14.001), (I-338)+(3.011)+(14.002), (I-338)+(3.011)+(15.008), (I-338)+(3.011)+(15.011), (I-338)+(3.011)+(15.012), (I-338)+(3.011)+(15.016), (I-338)+(3.011)+(15.025), (I-338)+(3.011)+(15.027), (I-338)+(3.011)+(15.047), (I-338)+(3.011)+(15.063), (I-338)+(3.011)+(15.064), (I-338)+(3.011)+(16.001), (I-338)+(3.011)+(16.002), (I-338)+(3.011)+(16.003), (I-338)+(3.011)+(16.004), (I-338)+(3.011)+(16.005), (I-338)+(3.011)+(16.006), (I-338)+(3.011)+(16.007), (I-338)+(3.011)+(16.008), (I-338)+(3.011)+(17.001), (I-338)+(3.011)+(17.002), (I-338)+(3.011)+(17.003), (I-338)+(3.011)+(17.004), (I-338)+(3.011)+(17.005), (I-338)+(3.011)+(17.006), (I-338)+(3.011)+(17.007), (I-338)+(3.011)+(17.008), (I-338)+(3.011)+(17.009), (I-338)+(3.011)+(17.010), (I-338)+(3.011)+(17.011), (I-338)+(3.011)+(17.012), (I-338)+(3.011)+(18.001), (I-338)+(3.012)+(3.025), (I-338)+(3.012)+(3.030), (I-338)+(3.012)+(3.031), (I-338)+(3.012)+(5.001), (I-338)+(3.012)+(5.002), (I-338)+(3.012)+(5.003), (I-338)+(3.012)+(5.004), (I-338)+(3.012)+(5.005), (I-338)+(3.012)+(5.006), (I-338)+(3.012)+(5.007), (I-338)+(3.012)+(5.008), (I-338)+(3.012)+(5.009), (I-338)+(3.012)+(5.010), (I-338)+(3.012)+(5.011), (I-338)+(3.012)+(5.012), (I-338)+(3.012)+(5.013), (I-338)+(3.012)+(5.014), (I-338)+(3.012)+(5.015), (I-338)+(3.012)+(5.016), (I-338)+(3.012)+(5.017), (I-338)+(3.012)+(5.018), (I-338)+(3.012)+(5.019), (I-338)+(3.012)+(5.020), (I-338)+(3.012)+(5.021), (I-338)+(3.012)+(5.022), (I-338)+(3.012)+(5.023), (I-338)+(3.012)+(6.001), (I-338)+(3.012)+(6.002), (I-338)+(3.012)+(6.003), (I-338)+(3.012)+(6.004), (I-338)+(3.012)+(7.001), (I-338)+(3.012)+(7.002), (I-338)+(3.012)+(7.003), (I-338)+(3.012)+(7.004), (I-338)+(3.012)+(7.005), (I-338)+(3.012)+(7.006), (I-338)+(3.012)+(9.001), (I-338)+(3.012)+(9.002), (I-338)+(3.012)+(9.003), (I-338)+(3.012)+(9.004), (I-338)+(3.012)+(9.005), (I-338)+(3.012)+(9.006), (I-338)+(3.012)+(9.007), (I-338)+(3.012)+(9.008), (I-338)+(3.012)+(9.009), (I-338)+(3.012)+(14.001), (I-338)+(3.012)+(14.002), (I-338)+(3.012)+(15.008), (I-338)+(3.012)+(15.011), (I-338)+(3.012)+(15.012), (I-338)+(3.012)+(15.016), (I-338)+(3.012)+(15.025), (I-338)+(3.012)+(15.027), (I-338)+(3.012)+(15.047), (I-338)+(3.012)+(15.063), (I-338)+(3.012)+(15.064), (I-338)+(3.012)+(16.001), (I-338)+(3.012)+(16.002), (I-338)+(3.012)+(16.003), (I-338)+(3.012)+(16.004), (I-338)+(3.012)+(16.005), (I-338)+(3.012)+(16.006), (I-338)+(3.012)+(16.007), (I-338)+(3.012)+(16.008), (I-338)+(3.012)+(17.001), (I-338)+(3.012)+(17.002), (I-338)+(3.012)+(17.003), (I-338)+(3.012)+(17.004), (I-338)+(3.012)+(17.005), (I-338)+(3.012)+(17.006), (I-338)+(3.012)+(17.007), (I-338)+(3.012)+(17.008), (I-338)+(3.012)+(17.009), (I-338)+(3.012)+(17.010), (I-338)+(3.012)+(17.011), (I-338)+(3.012)+(17.012), (I-338)+(3.012)+(18.001), (I-338)+(3.013)+(3.025), (I-338)+(3.013)+(3.030), (I-338)+(3.013)+(3.031), (I-338)+(3.013)+(5.001), (I-338)+(3.013)+(5.002), (I-338)+(3.013)+(5.003), (I-338)+(3.013)+(5.004), (I-338)+(3.013)+(5.005), (I-338)+(3.013)+(5.006), (I-338)+(3.013)+(5.007), (I-338)+(3.013)+(5.008), (I-338)+(3.013)+(5.009), (I-338)+(3.013)+(5.010), (I-338)+(3.013)+(5.011), (I-338)+(3.013)+(5.012), (I-338)+(3.013)+(5.013), (I-338)+(3.013)+(5.014), (I-338)+(3.013)+(5.015), (I-338)+(3.013)+(5.016), (I-338)+(3.013)+(5.017), (I-338)+(3.013)+(5.018), (I-338)+(3.013)+(5.019), (I-338)+(3.013)+(5.020), (I-338)+(3.013)+(5.021), (I-338)+(3.013)+(5.022), (I-338)+(3.013)+(5.023), (I-338)+(3.013)+(6.001), (I-338)+(3.013)+(6.002), (I-338)+(3.013)+(6.003), (I-338)+(3.013)+(6.004), (I-338)+(3.013)+(7.001), (I-338)+(3.013)+(7.002), (I-338)+(3.013)+(7.003), (I-338)+(3.013)+(7.004), (I-338)+(3.013)+(7.005), (I-338)+(3.013)+(7.006), (I-338)+(3.013)+(9.001), (I-338)+(3.013)+(9.002), (I-338)+(3.013)+(9.003), (I-338)+(3.013)+(9.004), (I-338)+(3.013)+(9.005), (I-338)+(3.013)+(9.006), (I-338)+(3.013)+(9.007), (I-338)+(3.013)+(9.008), (I-338)+(3.013)+(9.009), (I-338)+(3.013)+(14.001), (I-338)+(3.013)+(14.002), (I-338)+(3.013)+(15.008), (I-338)+(3.013)+(15.011), (I-338)+(3.013)+(15.012), (I-338)+(3.013)+(15.016), (I-338)+(3.013)+(15.025), (I-338)+(3.013)+(15.027), (I-338)+(3.013)+(15.047), (I-338)+(3.013)+(15.063), (I-338)+(3.013)+(15.064), (I-338)+(3.013)+(16.001), (I-338)+(3.013)+(16.002), (I-338)+(3.013)+(16.003), (I-338)+(3.013)+(16.004), (I-338)+(3.013)+(16.005), (I-338)+(3.013)+(16.006), (I-338)+(3.013)+(16.007), (I-338)+(3.013)+(16.008), (I-338)+(3.013)+(17.001), (I-338)+(3.013)+(17.002), (I-338)+(3.013)+(17.003), (I-338)+(3.013)+(17.004), (I-338)+(3.013)+(17.005), (I-338)+(3.013)+(17.006), (I-338)+(3.013)+(17.007), (I-338)+(3.013)+(17.008), (I-338)+(3.013)+(17.009), (I-338)+(3.013)+(17.010), (I-338)+(3.013)+(17.011), (I-338)+(3.013)+(17.012), (I-338)+(3.013)+(18.001), (I-338)+(3.014)+(3.025), (I-338)+(3.014)+(3.030), (I-338)+(3.014)+(3.031), (I-338)+(3.014)+(5.001), (I-338)+(3.014)+(5.002), (I-338)+(3.014)+(5.003), (I-338)+(3.014)+(5.004), (I-338)+(3.014)+(5.005), (I-338)+(3.014)+(5.006), (I-338)+(3.014)+(5.007), (I-338)+(3.014)+(5.008), (I-338)+(3.014)+(5.009), (I-338)+(3.014)+(5.010), (I-338)+(3.014)+(5.011), (I-338)+(3.014)+(5.012), (I-338)+(3.014)+(5.013), (I-338)+(3.014)+(5.014), (I-338)+(3.014)+(5.015), (I-338)+(3.014)+(5.016), (I-338)+(3.014)+(5.017), (I-338)+(3.014)+(5.018), (I-338)+(3.014)+(5.019), (I-338)+(3.014)+(5.020), (I-338)+(3.014)+(5.021), (I-338)+(3.014)+(5.022), (I-338)+(3.014)+(5.023), (I-338)+(3.014)+(6.001), (I-338)+(3.014)+(6.002), (I-338)+(3.014)+(6.003), (I-338)+(3.014)+(6.004), (I-338)+(3.014)+(7.001), (I-338)+(3.014)+(7.002), (I-338)+(3.014)+(7.003), (I-338)+(3.014)+(7.004), (I-338)+(3.014)+(7.005), (I-338)+(3.014)+(7.006), (I-338)+(3.014)+(9.001), (I-338)+(3.014)+(9.002), (I-338)+(3.014)+(9.003), (I-338)+(3.014)+(9.004), (I-338)+(3.014)+(9.005), (I-338)+(3.014)+(9.006), (I-338)+(3.014)+(9.007), (I-338)+(3.014)+(9.008), (I-338)+(3.014)+(9.009), (I-338)+(3.014)+(14.001), (I-338)+(3.014)+(14.002), (I-338)+(3.014)+(15.008), (I-338)+(3.014)+(15.011), (I-338)+(3.014)+(15.012), (I-338)+(3.014)+(15.016), (I-338)+(3.014)+(15.025), (I-338)+(3.014)+(15.027), (I-338)+(3.014)+(15.047), (I-338)+(3.014)+(15.063), (I-338)+(3.014)+(15.064), (I-338)+(3.014)+(16.001), (I-338)+(3.014)+(16.002), (I-338)+(3.014)+(16.003), (I-338)+(3.014)+(16.004), (I-338)+(3.014)+(16.005), (I-338)+(3.014)+(16.006), (I-338)+(3.014)+(16.007), (I-338)+(3.014)+(16.008), (I-338)+(3.014)+(17.001), (I-338)+(3.014)+(17.002), (I-338)+(3.014)+(17.003), (I-338)+(3.014)+(17.004), (I-338)+(3.014)+(17.005), (I-338)+(3.014)+(17.006), (I-338)+(3.014)+(17.007), (I-338)+(3.014)+(17.008), (I-338)+(3.014)+(17.009), (I-338)+(3.014)+(17.010), (I-338)+(3.014)+(17.011), (I-338)+(3.014)+(17.012), (I-338)+(3.014)+(18.001), (I-338)+(3.015)+(3.025), (I-338)+(3.015)+(3.030), (I-338)+(3.015)+(3.031), (I-338)+(3.015)+(5.001), (I-338)+(3.015)+(5.002), (I-338)+(3.015)+(5.003), (I-338)+(3.015)+(5.004), (I-338)+(3.015)+(5.005), (I-338)+(3.015)+(5.006), (I-338)+(3.015)+(5.007), (I-338)+(3.015)+(5.008), (I-338)+(3.015)+(5.009), (I-338)+(3.015)+(5.010), (I-338)+(3.015)+(5.011), (I-338)+(3.015)+(5.012), (I-338)+(3.015)+(5.013), (I-338)+(3.015)+(5.014), (I-338)+(3.015)+(5.015), (I-338)+(3.015)+(5.016), (I-338)+(3.015)+(5.017), (I-338)+(3.015)+(5.018), (I-338)+(3.015)+(5.019), (I-338)+(3.015)+(5.020), (I-338)+(3.015)+(5.021), (I-338)+(3.015)+(5.022), (I-338)+(3.015)+(5.023), (I-338)+(3.015)+(6.001), (I-338)+(3.015)+(6.002), (I-338)+(3.015)+(6.003), (I-338)+(3.015)+(6.004), (I-338)+(3.015)+(7.001), (I-338)+(3.015)+(7.002), (I-338)+(3.015)+(7.003), (I-338)+(3.015)+(7.004), (I-338)+(3.015)+(7.005), (I-338)+(3.015)+(7.006), (I-338)+(3.015)+(9.001), (I-338)+(3.015)+(9.002), (I-338)+(3.015)+(9.003), (I-338)+(3.015)+(9.004), (I-338)+(3.015)+(9.005), (I-338)+(3.015)+(9.006), (I-338)+(3.015)+(9.007), (I-338)+(3.015)+(9.008), (I-338)+(3.015)+(9.009), (I-338)+(3.015)+(14.001), (I-338)+(3.015)+(14.002), (I-338)+(3.015)+(15.008), (I-338)+(3.015)+(15.011), (I-338)+(3.015)+(15.012), (I-338)+(3.015)+(15.016), (I-338)+(3.015)+(15.025), (I-338)+(3.015)+(15.027), (I-338)+(3.015)+(15.047), (I-338)+(3.015)+(15.063), (I-338)+(3.015)+(15.064), (I-338)+(3.015)+(16.001), (I-338)+(3.015)+(16.002), (I-338)+(3.015)+(16.003), (I-338)+(3.015)+(16.004), (I-338)+(3.015)+(16.005), (I-338)+(3.015)+(16.006), (I-338)+(3.015)+(16.007), (I-338)+(3.015)+(16.008), (I-338)+(3.015)+(17.001), (I-338)+(3.015)+(17.002), (I-338)+(3.015)+(17.003), (I-338)+(3.015)+(17.004), (I-338)+(3.015)+(17.005), (I-338)+(3.015)+(17.006), (I-338)+(3.015)+(17.007), (I-338)+(3.015)+(17.008), (I-338)+(3.015)+(17.009), (I-338)+(3.015)+(17.010), (I-338)+(3.015)+(17.011), (I-338)+(3.015)+(17.012), (I-338)+(3.015)+(18.001), (I-338)+(3.016)+(3.025), (I-338)+(3.016)+(3.030), (I-338)+(3.016)+(3.031), (I-338)+(3.016)+(5.001), (I-338)+(3.016)+(5.002), (I-338)+(3.016)+(5.003), (I-338)+(3.016)+(5.004), (I-338)+(3.016)+(5.005), (I-338)+(3.016)+(5.006), (I-338)+(3.016)+(5.007), (I-338)+(3.016)+(5.008), (I-338)+(3.016)+(5.009), (I-338)+(3.016)+(5.010), (I-338)+(3.016)+(5.011), (I-338)+(3.016)+(5.012), (I-338)+(3.016)+(5.013), (I-338)+(3.016)+(5.014), (I-338)+(3.016)+(5.015), (I-338)+(3.016)+(5.016), (I-338)+(3.016)+(5.017), (I-338)+(3.016)+(5.018), (I-338)+(3.016)+(5.019), (I-338)+(3.016)+(5.020), (I-338)+(3.016)+(5.021), (I-338)+(3.016)+(5.022), (I-338)+(3.016)+(5.023), (I-338)+(3.016)+(6.001), (I-338)+(3.016)+(6.002), (I-338)+(3.016)+(6.003), (I-338)+(3.016)+(6.004), (I-338)+(3.016)+(7.001), (I-338)+(3.016)+(7.002), (I-338)+(3.016)+(7.003), (I-338)+(3.016)+(7.004), (I-338)+(3.016)+(7.005), (I-338)+(3.016)+(7.006), (I-338)+(3.016)+(9.001), (I-338)+(3.016)+(9.002), (I-338)+(3.016)+(9.003), (I-338)+(3.016)+(9.004), (I-338)+(3.016)+(9.005), (I-338)+(3.016)+(9.006), (I-338)+(3.016)+(9.007), (I-338)+(3.016)+(9.008), (I-338)+(3.016)+(9.009), (I-338)+(3.016)+(14.001), (I-338)+(3.016)+(14.002), (I-338)+(3.016)+(15.008), (I-338)+(3.016)+(15.011), (I-338)+(3.016)+(15.012), (I-338)+(3.016)+(15.016), (I-338)+(3.016)+(15.025), (I-338)+(3.016)+(15.027), (I-338)+(3.016)+(15.047), (I-338)+(3.016)+(15.063), (I-338)+(3.016)+(15.064), (I-338)+(3.016)+(16.001), (I-338)+(3.016)+(16.002), (I-338)+(3.016)+(16.003), (I-338)+(3.016)+(16.004), (I-338)+(3.016)+(16.005), (I-338)+(3.016)+(16.006), (I-338)+(3.016)+(16.007), (I-338)+(3.016)+(16.008), (I-338)+(3.016)+(17.001), (I-338)+(3.016)+(17.002), (I-338)+(3.016)+(17.003), (I-338)+(3.016)+(17.004), (I-338)+(3.016)+(17.005), (I-338)+(3.016)+(17.006), (I-338)+(3.016)+(17.007), (I-338)+(3.016)+(17.008), (I-338)+(3.016)+(17.009), (I-338)+(3.016)+(17.010), (I-338)+(3.016)+(17.011), (I-338)+(3.016)+(17.012), (I-338)+(3.016)+(18.001), (I-338)+(3.017)+(3.025), (I-338)+(3.017)+(3.030), (I-338)+(3.017)+(3.031), (I-338)+(3.017)+(5.001), (I-338)+(3.017)+(5.002), (I-338)+(3.017)+(5.003), (I-338)+(3.017)+(5.004), (I-338)+(3.017)+(5.005), (I-338)+(3.017)+(5.006), (I-338)+(3.017)+(5.007), (I-338)+(3.017)+(5.008), (I-338)+(3.017)+(5.009), (I-338)+(3.017)+(5.010), (I-338)+(3.017)+(5.011), (I-338)+(3.017)+(5.012), (I-338)+(3.017)+(5.013), (I-338)+(3.017)+(5.014), (I-338)+(3.017)+(5.015), (I-338)+(3.017)+(5.016), (I-338)+(3.017)+(5.017), (I-338)+(3.017)+(5.018), (I-338)+(3.017)+(5.019), (I-338)+(3.017)+(5.020), (I-338)+(3.017)+(5.021), (I-338)+(3.017)+(5.022), (I-338)+(3.017)+(5.023), (I-338)+(3.017)+(6.001), (I-338)+(3.017)+(6.002), (I-338)+(3.017)+(6.003), (I-338)+(3.017)+(6.004), (I-338)+(3.017)+(7.001), (I-338)+(3.017)+(7.002), (I-338)+(3.017)+(7.003), (I-338)+(3.017)+(7.004), (I-338)+(3.017)+(7.005), (I-338)+(3.017)+(7.006), (I-338)+(3.017)+(9.001), (I-338)+(3.017)+(9.002), (I-338)+(3.017)+(9.003), (I-338)+(3.017)+(9.004), (I-338)+(3.017)+(9.005), (I-338)+(3.017)+(9.006), (I-338)+(3.017)+(9.007), (I-338)+(3.017)+(9.008), (I-338)+(3.017)+(9.009), (I-338)+(3.017)+(14.001), (I-338)+(3.017)+(14.002), (I-338)+(3.017)+(15.008), (I-338)+(3.017)+(15.011), (I-338)+(3.017)+(15.012), (I-338)+(3.017)+(15.016), (I-338)+(3.017)+(15.025), (I-338)+(3.017)+(15.027), (I-338)+(3.017)+(15.047), (I-338)+(3.017)+(15.063), (I-338)+(3.017)+(15.064), (I-338)+(3.017)+(16.001), (I-338)+(3.017)+(16.002), (I-338)+(3.017)+(16.003), (I-338)+(3.017)+(16.004), (I-338)+(3.017)+(16.005), (I-338)+(3.017)+(16.006), (I-338)+(3.017)+(16.007), (I-338)+(3.017)+(16.008), (I-338)+(3.017)+(17.001), (I-338)+(3.017)+(17.002), (I-338)+(3.017)+(17.003), (I-338)+(3.017)+(17.004), (I-338)+(3.017)+(17.005), (I-338)+(3.017)+(17.006), (I-338)+(3.017)+(17.007), (I-338)+(3.017)+(17.008), (I-338)+(3.017)+(17.009), (I-338)+(3.017)+(17.010), (I-338)+(3.017)+(17.011), (I-338)+(3.017)+(17.012), (I-338)+(3.017)+(18.001), (I-338)+(3.018)+(3.025), (I-338)+(3.018)+(3.030), (I-338)+(3.018)+(3.031), (I-338)+(3.018)+(5.001), (I-338)+(3.018)+(5.002), (I-338)+(3.018)+(5.003), (I-338)+(3.018)+(5.004), (I-338)+(3.018)+(5.005), (I-338)+(3.018)+(5.006), (I-338)+(3.018)+(5.007), (I-338)+(3.018)+(5.008), (I-338)+(3.018)+(5.009), (I-338)+(3.018)+(5.010), (I-338)+(3.018)+(5.011), (I-338)+(3.018)+(5.012), (I-338)+(3.018)+(5.013), (I-338)+(3.018)+(5.014), (I-338)+(3.018)+(5.015), (I-338)+(3.018)+(5.016), (I-338)+(3.018)+(5.017), (I-338)+(3.018)+(5.018), (I-338)+(3.018)+(5.019), (I-338)+(3.018)+(5.020), (I-338)+(3.018)+(5.021), (I-338)+(3.018)+(5.022), (I-338)+(3.018)+(5.023), (I-338)+(3.018)+(6.001), (I-338)+(3.018)+(6.002), (I-338)+(3.018)+(6.003), (I-338)+(3.018)+(6.004), (I-338)+(3.018)+(7.001), (I-338)+(3.018)+(7.002), (I-338)+(3.018)+(7.003), (I-338)+(3.018)+(7.004), (I-338)+(3.018)+(7.005), (I-338)+(3.018)+(7.006), (I-338)+(3.018)+(9.001), (I-338)+(3.018)+(9.002), (I-338)+(3.018)+(9.003), (I-338)+(3.018)+(9.004), (I-338)+(3.018)+(9.005), (I-338)+(3.018)+(9.006), (I-338)+(3.018)+(9.007), (I-338)+(3.018)+(9.008), (I-338)+(3.018)+(9.009), (I-338)+(3.018)+(14.001), (I-338)+(3.018)+(14.002), (I-338)+(3.018)+(15.008), (I-338)+(3.018)+(15.011), (I-338)+(3.018)+(15.012), (I-338)+(3.018)+(15.016), (I-338)+(3.018)+(15.025), (I-338)+(3.018)+(15.027), (I-338)+(3.018)+(15.047), (I-338)+(3.018)+(15.063), (I-338)+(3.018)+(15.064), (I-338)+(3.018)+(16.001), (I-338)+(3.018)+(16.002), (I-338)+(3.018)+(16.003), (I-338)+(3.018)+(16.004), (I-338)+(3.018)+(16.005), (I-338)+(3.018)+(16.006), (I-338)+(3.018)+(16.007), (I-338)+(3.018)+(16.008), (I-338)+(3.018)+(17.001), (I-338)+(3.018)+(17.002), (I-338)+(3.018)+(17.003), (I-338)+(3.018)+(17.004), (I-338)+(3.018)+(17.005), (I-338)+(3.018)+(17.006), (I-338)+(3.018)+(17.007), (I-338)+(3.018)+(17.008), (I-338)+(3.018)+(17.009), (I-338)+(3.018)+(17.010), (I-338)+(3.018)+(17.011), (I-338)+(3.018)+(17.012), (I-338)+(3.018)+(18.001), (I-338)+(3.019)+(3.025), (I-338)+(3.019)+(3.030), (I-338)+(3.019)+(3.031), (I-338)+(3.019)+(5.001), (I-338)+(3.019)+(5.002), (I-338)+(3.019)+(5.003), (I-338)+(3.019)+(5.004), (I-338)+(3.019)+(5.005), (I-338)+(3.019)+(5.006), (I-338)+(3.019)+(5.007), (I-338)+(3.019)+(5.008), (I-338)+(3.019)+(5.009), (I-338)+(3.019)+(5.010), (I-338)+(3.019)+(5.011), (I-338)+(3.019)+(5.012), (I-338)+(3.019)+(5.013), (I-338)+(3.019)+(5.014), (I-338)+(3.019)+(5.015), (I-338)+(3.019)+(5.016), (I-338)+(3.019)+(5.017), (I-338)+(3.019)+(5.018), (I-338)+(3.019)+(5.019), (I-338)+(3.019)+(5.020), (I-338)+(3.019)+(5.021), (I-338)+(3.019)+(5.022), (I-338)+(3.019)+(5.023), (I-338)+(3.019)+(6.001), (I-338)+(3.019)+(6.002), (I-338)+(3.019)+(6.003), (I-338)+(3.019)+(6.004), (I-338)+(3.019)+(7.001), (I-338)+(3.019)+(7.002), (I-338)+(3.019)+(7.003), (I-338)+(3.019)+(7.004), (I-338)+(3.019)+(7.005), (I-338)+(3.019)+(7.006), (I-338)+(3.019)+(9.001), (I-338)+(3.019)+(9.002), (I-338)+(3.019)+(9.003), (I-338)+(3.019)+(9.004), (I-338)+(3.019)+(9.005), (I-338)+(3.019)+(9.006), (I-338)+(3.019)+(9.007), (I-338)+(3.019)+(9.008), (I-338)+(3.019)+(9.009), (I-338)+(3.019)+(14.001), (I-338)+(3.019)+(14.002), (I-338)+(3.019)+(15.008), (I-338)+(3.019)+(15.011), (I-338)+(3.019)+(15.012), (I-338)+(3.019)+(15.016), (I-338)+(3.019)+(15.025), (I-338)+(3.019)+(15.027), (I-338)+(3.019)+(15.047), (I-338)+(3.019)+(15.063), (I-338)+(3.019)+(15.064), (I-338)+(3.019)+(16.001), (I-338)+(3.019)+(16.002), (I-338)+(3.019)+(16.003), (I-338)+(3.019)+(16.004), (I-338)+(3.019)+(16.005), (I-338)+(3.019)+(16.006), (I-338)+(3.019)+(16.007), (I-338)+(3.019)+(16.008), (I-338)+(3.019)+(17.001), (I-338)+(3.019)+(17.002), (I-338)+(3.019)+(17.003), (I-338)+(3.019)+(17.004), (I-338)+(3.019)+(17.005), (I-338)+(3.019)+(17.006), (I-338)+(3.019)+(17.007), (I-338)+(3.019)+(17.008), (I-338)+(3.019)+(17.009), (I-338)+(3.019)+(17.010), (I-338)+(3.019)+(17.011), (I-338)+(3.019)+(17.012), (I-338)+(3.019)+(18.001), (I-338)+(3.020)+(3.025), (I-338)+(3.020)+(3.030), (I-338)+(3.020)+(3.031), (I-338)+(3.020)+(5.001), (I-338)+(3.020)+(5.002), (I-338)+(3.020)+(5.003), (I-338)+(3.020)+(5.004), (I-338)+(3.020)+(5.005), (I-338)+(3.020)+(5.006), (I-338)+(3.020)+(5.007), (I-338)+(3.020)+(5.008), (I-338)+(3.020)+(5.009), (I-338)+(3.020)+(5.010), (I-338)+(3.020)+(5.011), (I-338)+(3.020)+(5.012), (I-338)+(3.020)+(5.013), (I-338)+(3.020)+(5.014), (I-338)+(3.020)+(5.015), (I-338)+(3.020)+(5.016), (I-338)+(3.020)+(5.017), (I-338)+(3.020)+(5.018), (I-338)+(3.020)+(5.019), (I-338)+(3.020)+(5.020), (I-338)+(3.020)+(5.021), (I-338)+(3.020)+(5.022), (I-338)+(3.020)+(5.023), (I-338)+(3.020)+(6.001), (I-338)+(3.020)+(6.002), (I-338)+(3.020)+(6.003), (I-338)+(3.020)+(6.004), (I-338)+(3.020)+(7.001), (I-338)+(3.020)+(7.002), (I-338)+(3.020)+(7.003), (I-338)+(3.020)+(7.004), (I-338)+(3.020)+(7.005), (I-338)+(3.020)+(7.006), (I-338)+(3.020)+(9.001), (I-338)+(3.020)+(9.002), (I-338)+(3.020)+(9.003), (I-338)+(3.020)+(9.004), (I-338)+(3.020)+(9.005), (I-338)+(3.020)+(9.006), (I-338)+(3.020)+(9.007), (I-338)+(3.020)+(9.008), (I-338)+(3.020)+(9.009), (I-338)+(3.020)+(14.001), (I-338)+(3.020)+(14.002), (I-338)+(3.020)+(15.008), (I-338)+(3.020)+(15.011), (I-338)+(3.020)+(15.012), (I-338)+(3.020)+(15.016), (I-338)+(3.020)+(15.025), (I-338)+(3.020)+(15.027), (I-338)+(3.020)+(15.047), (I-338)+(3.020)+(15.063), (I-338)+(3.020)+(15.064), (I-338)+(3.020)+(16.001), (I-338)+(3.020)+(16.002), (I-338)+(3.020)+(16.003), (I-338)+(3.020)+(16.004), (I-338)+(3.020)+(16.005), (I-338)+(3.020)+(16.006), (I-338)+(3.020)+(16.007), (I-338)+(3.020)+(16.008), (I-338)+(3.020)+(17.001), (I-338)+(3.020)+(17.002), (I-338)+(3.020)+(17.003), (I-338)+(3.020)+(17.004), (I-338)+(3.020)+(17.005), (I-338)+(3.020)+(17.006), (I-338)+(3.020)+(17.007), (I-338)+(3.020)+(17.008), (I-338)+(3.020)+(17.009), (I-338)+(3.020)+(17.010), (I-338)+(3.020)+(17.011), (I-338)+(3.020)+(17.012), (I-338)+(3.020)+(18.001), (I-338)+(3.021)+(3.025), (I-338)+(3.021)+(3.030), (I-338)+(3.021)+(3.031), (I-338)+(3.021)+(5.001), (I-338)+(3.021)+(5.002), (I-338)+(3.021)+(5.003), (I-338)+(3.021)+(5.004), (I-338)+(3.021)+(5.005), (I-338)+(3.021)+(5.006), (I-338)+(3.021)+(5.007), (I-338)+(3.021)+(5.008), (I-338)+(3.021)+(5.009), (I-338)+(3.021)+(5.010), (I-338)+(3.021)+(5.011), (I-338)+(3.021)+(5.012), (I-338)+(3.021)+(5.013), (I-338)+(3.021)+(5.014), (I-338)+(3.021)+(5.015), (I-338)+(3.021)+(5.016), (I-338)+(3.021)+(5.017), (I-338)+(3.021)+(5.018), (I-338)+(3.021)+(5.019), (I-338)+(3.021)+(5.020), (I-338)+(3.021)+(5.021), (I-338)+(3.021)+(5.022), (I-338)+(3.021)+(5.023), (I-338)+(3.021)+(6.001), (I-338)+(3.021)+(6.002), (I-338)+(3.021)+(6.003), (I-338)+(3.021)+(6.004), (I-338)+(3.021)+(7.001), (I-338)+(3.021)+(7.002), (I-338)+(3.021)+(7.003), (I-338)+(3.021)+(7.004), (I-338)+(3.021)+(7.005), (I-338)+(3.021)+(7.006), (I-338)+(3.021)+(9.001), (I-338)+(3.021)+(9.002), (I-338)+(3.021)+(9.003), (I-338)+(3.021)+(9.004), (I-338)+(3.021)+(9.005), (I-338)+(3.021)+(9.006), (I-338)+(3.021)+(9.007), (I-338)+(3.021)+(9.008), (I-338)+(3.021)+(9.009), (I-338)+(3.021)+(14.001), (I-338)+(3.021)+(14.002), (I-338)+(3.021)+(15.008), (I-338)+(3.021)+(15.011), (I-338)+(3.021)+(15.012), (I-338)+(3.021)+(15.016), (I-338)+(3.021)+(15.025), (I-338)+(3.021)+(15.027), (I-338)+(3.021)+(15.047), (I-338)+(3.021)+(15.063), (I-338)+(3.021)+(15.064), (I-338)+(3.021)+(16.001), (I-338)+(3.021)+(16.002), (I-338)+(3.021)+(16.003), (I-338)+(3.021)+(16.004), (I-338)+(3.021)+(16.005), (I-338)+(3.021)+(16.006), (I-338)+(3.021)+(16.007), (I-338)+(3.021)+(16.008), (I-338)+(3.021)+(17.001), (I-338)+(3.021)+(17.002), (I-338)+(3.021)+(17.003), (I-338)+(3.021)+(17.004), (I-338)+(3.021)+(17.005), (I-338)+(3.021)+(17.006), (I-338)+(3.021)+(17.007), (I-338)+(3.021)+(17.008), (I-338)+(3.021)+(17.009), (I-338)+(3.021)+(17.010), (I-338)+(3.021)+(17.011), (I-338)+(3.021)+(17.012), (I-338)+(3.021)+(18.001), (I-338)+(3.022)+(3.025), (I-338)+(3.022)+(3.030), (I-338)+(3.022)+(3.031), (I-338)+(3.022)+(5.001), (I-338)+(3.022)+(5.002), (I-338)+(3.022)+(5.003), (I-338)+(3.022)+(5.004), (I-338)+(3.022)+(5.005), (I-338)+(3.022)+(5.006), (I-338)+(3.022)+(5.007), (I-338)+(3.022)+(5.008), (I-338)+(3.022)+(5.009), (I-338)+(3.022)+(5.010), (I-338)+(3.022)+(5.011), (I-338)+(3.022)+(5.012), (I-338)+(3.022)+(5.013), (I-338)+(3.022)+(5.014), (I-338)+(3.022)+(5.015), (I-338)+(3.022)+(5.016), (I-338)+(3.022)+(5.017), (I-338)+(3.022)+(5.018), (I-338)+(3.022)+(5.019), (I-338)+(3.022)+(5.020), (I-338)+(3.022)+(5.021), (I-338)+(3.022)+(5.022), (I-338)+(3.022)+(5.023), (I-338)+(3.022)+(6.001), (I-338)+(3.022)+(6.002), (I-338)+(3.022)+(6.003), (I-338)+(3.022)+(6.004), (I-338)+(3.022)+(7.001), (I-338)+(3.022)+(7.002), (I-338)+(3.022)+(7.003), (I-338)+(3.022)+(7.004), (I-338)+(3.022)+(7.005), (I-338)+(3.022)+(7.006), (I-338)+(3.022)+(9.001), (I-338)+(3.022)+(9.002), (I-338)+(3.022)+(9.003), (I-338)+(3.022)+(9.004), (I-338)+(3.022)+(9.005), (I-338)+(3.022)+(9.006), (I-338)+(3.022)+(9.007), (I-338)+(3.022)+(9.008), (I-338)+(3.022)+(9.009), (I-338)+(3.022)+(14.001), (I-338)+(3.022)+(14.002), (I-338)+(3.022)+(15.008), (I-338)+(3.022)+(15.011), (I-338)+(3.022)+(15.012), (I-338)+(3.022)+(15.016), (I-338)+(3.022)+(15.025), (I-338)+(3.022)+(15.027), (I-338)+(3.022)+(15.047), (I-338)+(3.022)+(15.063), (I-338)+(3.022)+(15.064), (I-338)+(3.022)+(16.001), (I-338)+(3.022)+(16.002), (I-338)+(3.022)+(16.003), (I-338)+(3.022)+(16.004), (I-338)+(3.022)+(16.005), (I-338)+(3.022)+(16.006), (I-338)+(3.022)+(16.007), (I-338)+(3.022)+(16.008), (I-338)+(3.022)+(17.001), (I-338)+(3.022)+(17.002), (I-338)+(3.022)+(17.003), (I-338)+(3.022)+(17.004), (I-338)+(3.022)+(17.005), (I-338)+(3.022)+(17.006), (I-338)+(3.022)+(17.007), (I-338)+(3.022)+(17.008), (I-338)+(3.022)+(17.009), (I-338)+(3.022)+(17.010), (I-338)+(3.022)+(17.011), (I-338)+(3.022)+(17.012), (I-338)+(3.022)+(18.001), (I-338)+(3.023)+(3.025), (I-338)+(3.023)+(3.030), (I-338)+(3.023)+(3.031), (I-338)+(3.023)+(5.001), (I-338)+(3.023)+(5.002), (I-338)+(3.023)+(5.003), (I-338)+(3.023)+(5.004), (I-338)+(3.023)+(5.005), (I-338)+(3.023)+(5.006), (I-338)+(3.023)+(5.007), (I-338)+(3.023)+(5.008), (I-338)+(3.023)+(5.009), (I-338)+(3.023)+(5.010), (I-338)+(3.023)+(5.011), (I-338)+(3.023)+(5.012), (I-338)+(3.023)+(5.013), (I-338)+(3.023)+(5.014), (I-338)+(3.023)+(5.015), (I-338)+(3.023)+(5.016), (I-338)+(3.023)+(5.017), (I-338)+(3.023)+(5.018), (I-338)+(3.023)+(5.019), (I-338)+(3.023)+(5.020), (I-338)+(3.023)+(5.021), (I-338)+(3.023)+(5.022), (I-338)+(3.023)+(5.023), (I-338)+(3.023)+(6.001), (I-338)+(3.023)+(6.002), (I-338)+(3.023)+(6.003), (I-338)+(3.023)+(6.004), (I-338)+(3.023)+(7.001), (I-338)+(3.023)+(7.002), (I-338)+(3.023)+(7.003), (I-338)+(3.023)+(7.004), (I-338)+(3.023)+(7.005), (I-338)+(3.023)+(7.006), (I-338)+(3.023)+(9.001), (I-338)+(3.023)+(9.002), (I-338)+(3.023)+(9.003), (I-338)+(3.023)+(9.004), (I-338)+(3.023)+(9.005), (I-338)+(3.023)+(9.006), (I-338)+(3.023)+(9.007), (I-338)+(3.023)+(9.008), (I-338)+(3.023)+(9.009), (I-338)+(3.023)+(14.001), (I-338)+(3.023)+(14.002), (I-338)+(3.023)+(15.008), (I-338)+(3.023)+(15.011), (I-338)+(3.023)+(15.012), (I-338)+(3.023)+(15.016), (I-338)+(3.023)+(15.025), (I-338)+(3.023)+(15.027), (I-338)+(3.023)+(15.047), (I-338)+(3.023)+(15.063), (I-338)+(3.023)+(15.064), (I-338)+(3.023)+(16.001), (I-338)+(3.023)+(16.002), (I-338)+(3.023)+(16.003), (I-338)+(3.023)+(16.004), (I-338)+(3.023)+(16.005), (I-338)+(3.023)+(16.006), (I-338)+(3.023)+(16.007), (I-338)+(3.023)+(16.008), (I-338)+(3.023)+(17.001), (I-338)+(3.023)+(17.002), (I-338)+(3.023)+(17.003), (I-338)+(3.023)+(17.004), (I-338)+(3.023)+(17.005), (I-338)+(3.023)+(17.006), (I-338)+(3.023)+(17.007), (I-338)+(3.023)+(17.008), (I-338)+(3.023)+(17.009), (I-338)+(3.023)+(17.010), (I-338)+(3.023)+(17.011), (I-338)+(3.023)+(17.012), (I-338)+(3.023)+(18.001), (I-338)+(3.024)+(3.025), (I-338)+(3.024)+(3.030), (I-338)+(3.024)+(3.031), (I-338)+(3.024)+(5.001), (I-338)+(3.024)+(5.002), (I-338)+(3.024)+(5.003), (I-338)+(3.024)+(5.004), (I-338)+(3.024)+(5.005), (I-338)+(3.024)+(5.006), (I-338)+(3.024)+(5.007), (I-338)+(3.024)+(5.008), (I-338)+(3.024)+(5.009), (I-338)+(3.024)+(5.010), (I-338)+(3.024)+(5.011), (I-338)+(3.024)+(5.012), (I-338)+(3.024)+(5.013), (I-338)+(3.024)+(5.014), (I-338)+(3.024)+(5.015), (I-338)+(3.024)+(5.016), (I-338)+(3.024)+(5.017), (I-338)+(3.024)+(5.018), (I-338)+(3.024)+(5.019), (I-338)+(3.024)+(5.020), (I-338)+(3.024)+(5.021), (I-338)+(3.024)+(5.022), (I-338)+(3.024)+(5.023), (I-338)+(3.024)+(6.001), (I-338)+(3.024)+(6.002), (I-338)+(3.024)+(6.003), (I-338)+(3.024)+(6.004), (I-338)+(3.024)+(7.001), (I-338)+(3.024)+(7.002), (I-338)+(3.024)+(7.003), (I-338)+(3.024)+(7.004), (I-338)+(3.024)+(7.005), (I-338)+(3.024)+(7.006), (I-338)+(3.024)+(9.001), (I-338)+(3.024)+(9.002), (I-338)+(3.024)+(9.003), (I-338)+(3.024)+(9.004), (I-338)+(3.024)+(9.005), (I-338)+(3.024)+(9.006), (I-338)+(3.024)+(9.007), (I-338)+(3.024)+(9.008), (I-338)+(3.024)+(9.009), (I-338)+(3.024)+(14.001), (I-338)+(3.024)+(14.002), (I-338)+(3.024)+(15.008), (I-338)+(3.024)+(15.011), (I-338)+(3.024)+(15.012), (I-338)+(3.024)+(15.016), (I-338)+(3.024)+(15.025), (I-338)+(3.024)+(15.027), (I-338)+(3.024)+(15.047), (I-338)+(3.024)+(15.063), (I-338)+(3.024)+(15.064), (I-338)+(3.024)+(16.001), (I-338)+(3.024)+(16.002), (I-338)+(3.024)+(16.003), (I-338)+(3.024)+(16.004), (I-338)+(3.024)+(16.005), (I-338)+(3.024)+(16.006), (I-338)+(3.024)+(16.007), (I-338)+(3.024)+(16.008), (I-338)+(3.024)+(17.001), (I-338)+(3.024)+(17.002), (I-338)+(3.024)+(17.003), (I-338)+(3.024)+(17.004), (I-338)+(3.024)+(17.005), (I-338)+(3.024)+(17.006), (I-338)+(3.024)+(17.007), (I-338)+(3.024)+(17.008), (I-338)+(3.024)+(17.009), (I-338)+(3.024)+(17.010), (I-338)+(3.024)+(17.011), (I-338)+(3.024)+(17.012), (I-338)+(3.024)+(18.001), (I-338)+(3.025)+(3.030), (I-338)+(3.025)+(3.031), (I-338)+(3.025)+(5.001), (I-338)+(3.025)+(5.002), (I-338)+(3.025)+(5.003), (I-338)+(3.025)+(5.004), (I-338)+(3.025)+(5.005), (I-338)+(3.025)+(5.006), (I-338)+(3.025)+(5.007), (I-338)+(3.025)+(5.008), (I-338)+(3.025)+(5.009), (I-338)+(3.025)+(5.010), (I-338)+(3.025)+(5.011), (I-338)+(3.025)+(5.012), (I-338)+(3.025)+(5.013), (I-338)+(3.025)+(5.014), (I-338)+(3.025)+(5.015), (I-338)+(3.025)+(5.016), (I-338)+(3.025)+(5.017), (I-338)+(3.025)+(5.018), (I-338)+(3.025)+(5.019), (I-338)+(3.025)+(5.020), (I-338)+(3.025)+(5.021), (I-338)+(3.025)+(5.022), (I-338)+(3.025)+(5.023), (I-338)+(3.025)+(6.001), (I-338)+(3.025)+(6.002), (I-338)+(3.025)+(6.003), (I-338)+(3.025)+(6.004), (I-338)+(3.025)+(7.001), (I-338)+(3.025)+(7.002), (I-338)+(3.025)+(7.003), (I-338)+(3.025)+(7.004), (I-338)+(3.025)+(7.005), (I-338)+(3.025)+(7.006), (I-338)+(3.025)+(9.001), (I-338)+(3.025)+(9.002), (I-338)+(3.025)+(9.003), (I-338)+(3.025)+(9.004), (I-338)+(3.025)+(9.005), (I-338)+(3.025)+(9.006), (I-338)+(3.025)+(9.007), (I-338)+(3.025)+(9.008), (I-338)+(3.025)+(9.009), (I-338)+(3.025)+(14.001), (I-338)+(3.025)+(14.002), (I-338)+(3.025)+(15.008), (I-338)+(3.025)+(15.011), (I-338)+(3.025)+(15.012), (I-338)+(3.025)+(15.016), (I-338)+(3.025)+(15.025), (I-338)+(3.025)+(15.027), (I-338)+(3.025)+(15.047), (I-338)+(3.025)+(15.063), (I-338)+(3.025)+(15.064), (I-338)+(3.025)+(16.001), (I-338)+(3.025)+(16.002), (I-338)+(3.025)+(16.003), (I-338)+(3.025)+(16.004), (I-338)+(3.025)+(16.005), (I-338)+(3.025)+(16.006), (I-338)+(3.025)+(16.007), (I-338)+(3.025)+(16.008), (I-338)+(3.025)+(17.001), (I-338)+(3.025)+(17.002), (I-338)+(3.025)+(17.003), (I-338)+(3.025)+(17.004), (I-338)+(3.025)+(17.005), (I-338)+(3.025)+(17.006), (I-338)+(3.025)+(17.007), (I-338)+(3.025)+(17.008), (I-338)+(3.025)+(17.009), (I-338)+(3.025)+(17.010), (I-338)+(3.025)+(17.011), (I-338)+(3.025)+(17.012), (I-338)+(3.025)+(18.001), (I-338)+(3.026)+(3.025), (I-338)+(3.026)+(3.030), (I-338)+(3.026)+(3.031), (I-338)+(3.026)+(5.001), (I-338)+(3.026)+(5.002), (I-338)+(3.026)+(5.003), (I-338)+(3.026)+(5.004), (I-338)+(3.026)+(5.005), (I-338)+(3.026)+(5.006), (I-338)+(3.026)+(5.007), (I-338)+(3.026)+(5.008), (I-338)+(3.026)+(5.009), (I-338)+(3.026)+(5.010), (I-338)+(3.026)+(5.011), (I-338)+(3.026)+(5.012), (I-338)+(3.026)+(5.013), (I-338)+(3.026)+(5.014), (I-338)+(3.026)+(5.015), (I-338)+(3.026)+(5.016), (I-338)+(3.026)+(5.017), (I-338)+(3.026)+(5.018), (I-338)+(3.026)+(5.019), (I-338)+(3.026)+(5.020), (I-338)+(3.026)+(5.021), (I-338)+(3.026)+(5.022), (I-338)+(3.026)+(5.023), (I-338)+(3.026)+(6.001), (I-338)+(3.026)+(6.002), (I-338)+(3.026)+(6.003), (I-338)+(3.026)+(6.004), (I-338)+(3.026)+(7.001), (I-338)+(3.026)+(7.002), (I-338)+(3.026)+(7.003), (I-338)+(3.026)+(7.004), (I-338)+(3.026)+(7.005), (I-338)+(3.026)+(7.006), (I-338)+(3.026)+(9.001), (I-338)+(3.026)+(9.002), (I-338)+(3.026)+(9.003), (I-338)+(3.026)+(9.004), (I-338)+(3.026)+(9.005), (I-338)+(3.026)+(9.006), (I-338)+(3.026)+(9.007), (I-338)+(3.026)+(9.008), (I-338)+(3.026)+(9.009), (I-338)+(3.026)+(14.001), (I-338)+(3.026)+(14.002), (I-338)+(3.026)+(15.008), (I-338)+(3.026)+(15.011), (I-338)+(3.026)+(15.012), (I-338)+(3.026)+(15.016), (I-338)+(3.026)+(15.025), (I-338)+(3.026)+(15.027), (I-338)+(3.026)+(15.047), (I-338)+(3.026)+(15.063), (I-338)+(3.026)+(15.064), (I-338)+(3.026)+(16.001), (I-338)+(3.026)+(16.002), (I-338)+(3.026)+(16.003), (I-338)+(3.026)+(16.004), (I-338)+(3.026)+(16.005), (I-338)+(3.026)+(16.006), (I-338)+(3.026)+(16.007), (I-338)+(3.026)+(16.008), (I-338)+(3.026)+(17.001), (I-338)+(3.026)+(17.002), (I-338)+(3.026)+(17.003), (I-338)+(3.026)+(17.004), (I-338)+(3.026)+(17.005), (I-338)+(3.026)+(17.006), (I-338)+(3.026)+(17.007), (I-338)+(3.026)+(17.008), (I-338)+(3.026)+(17.009), (I-338)+(3.026)+(17.010), (I-338)+(3.026)+(17.011), (I-338)+(3.026)+(17.012), (I-338)+(3.026)+(18.001), (I-338)+(3.027)+(3.025), (I-338)+(3.027)+(3.030), (I-338)+(3.027)+(3.031), (I-338)+(3.027)+(5.001), (I-338)+(3.027)+(5.002), (I-338)+(3.027)+(5.003), (I-338)+(3.027)+(5.004), (I-338)+(3.027)+(5.005), (I-338)+(3.027)+(5.006), (I-338)+(3.027)+(5.007), (I-338)+(3.027)+(5.008), (I-338)+(3.027)+(5.009), (I-338)+(3.027)+(5.010), (I-338)+(3.027)+(5.011), (I-338)+(3.027)+(5.012), (I-338)+(3.027)+(5.013), (I-338)+(3.027)+(5.014), (I-338)+(3.027)+(5.015), (I-338)+(3.027)+(5.016), (I-338)+(3.027)+(5.017), (I-338)+(3.027)+(5.018), (I-338)+(3.027)+(5.019), (I-338)+(3.027)+(5.020), (I-338)+(3.027)+(5.021), (I-338)+(3.027)+(5.022), (I-338)+(3.027)+(5.023), (I-338)+(3.027)+(6.001), (I-338)+(3.027)+(6.002), (I-338)+(3.027)+(6.003), (I-338)+(3.027)+(6.004), (I-338)+(3.027)+(7.001), (I-338)+(3.027)+(7.002), (I-338)+(3.027)+(7.003), (I-338)+(3.027)+(7.004), (I-338)+(3.027)+(7.005), (I-338)+(3.027)+(7.006), (I-338)+(3.027)+(9.001), (I-338)+(3.027)+(9.002), (I-338)+(3.027)+(9.003), (I-338)+(3.027)+(9.004), (I-338)+(3.027)+(9.005), (I-338)+(3.027)+(9.006), (I-338)+(3.027)+(9.007), (I-338)+(3.027)+(9.008), (I-338)+(3.027)+(9.009), (I-338)+(3.027)+(14.001), (I-338)+(3.027)+(14.002), (I-338)+(3.027)+(15.008), (I-338)+(3.027)+(15.011), (I-338)+(3.027)+(15.012), (I-338)+(3.027)+(15.016), (I-338)+(3.027)+(15.025), (I-338)+(3.027)+(15.027), (I-338)+(3.027)+(15.047), (I-338)+(3.027)+(15.063), (I-338)+(3.027)+(15.064), (I-338)+(3.027)+(16.001), (I-338)+(3.027)+(16.002), (I-338)+(3.027)+(16.003), (I-338)+(3.027)+(16.004), (I-338)+(3.027)+(16.005), (I-338)+(3.027)+(16.006), (I-338)+(3.027)+(16.007), (I-338)+(3.027)+(16.008), (I-338)+(3.027)+(17.001), (I-338)+(3.027)+(17.002), (I-338)+(3.027)+(17.003), (I-338)+(3.027)+(17.004), (I-338)+(3.027)+(17.005), (I-338)+(3.027)+(17.006), (I-338)+(3.027)+(17.007), (I-338)+(3.027)+(17.008), (I-338)+(3.027)+(17.009), (I-338)+(3.027)+(17.010), (I-338)+(3.027)+(17.011), (I-338)+(3.027)+(17.012), (I-338)+(3.027)+(18.001), (I-338)+(3.028)+(3.025), (I-338)+(3.028)+(3.030), (I-338)+(3.028)+(3.031), (I-338)+(3.028)+(5.001), (I-338)+(3.028)+(5.002), (I-338)+(3.028)+(5.003), (I-338)+(3.028)+(5.004), (I-338)+(3.028)+(5.005), (I-338)+(3.028)+(5.006), (I-338)+(3.028)+(5.007), (I-338)+(3.028)+(5.008), (I-338)+(3.028)+(5.009), (I-338)+(3.028)+(5.010), (I-338)+(3.028)+(5.011), (I-338)+(3.028)+(5.012), (I-338)+(3.028)+(5.013), (I-338)+(3.028)+(5.014), (I-338)+(3.028)+(5.015), (I-338)+(3.028)+(5.016), (I-338)+(3.028)+(5.017), (I-338)+(3.028)+(5.018), (I-338)+(3.028)+(5.019), (I-338)+(3.028)+(5.020), (I-338)+(3.028)+(5.021), (I-338)+(3.028)+(5.022), (I-338)+(3.028)+(5.023), (I-338)+(3.028)+(6.001), (I-338)+(3.028)+(6.002), (I-338)+(3.028)+(6.003), (I-338)+(3.028)+(6.004), (I-338)+(3.028)+(7.001), (I-338)+(3.028)+(7.002), (I-338)+(3.028)+(7.003), (I-338)+(3.028)+(7.004), (I-338)+(3.028)+(7.005), (I-338)+(3.028)+(7.006), (I-338)+(3.028)+(9.001), (I-338)+(3.028)+(9.002), (I-338)+(3.028)+(9.003), (I-338)+(3.028)+(9.004), (I-338)+(3.028)+(9.005), (I-338)+(3.028)+(9.006), (I-338)+(3.028)+(9.007), (I-338)+(3.028)+(9.008), (I-338)+(3.028)+(9.009), (I-338)+(3.028)+(14.001), (I-338)+(3.028)+(14.002), (I-338)+(3.028)+(15.008), (I-338)+(3.028)+(15.011), (I-338)+(3.028)+(15.012), (I-338)+(3.028)+(15.016), (I-338)+(3.028)+(15.025), (I-338)+(3.028)+(15.027), (I-338)+(3.028)+(15.047), (I-338)+(3.028)+(15.063), (I-338)+(3.028)+(15.064), (I-338)+(3.028)+(16.001), (I-338)+(3.028)+(16.002), (I-338)+(3.028)+(16.003), (I-338)+(3.028)+(16.004), (I-338)+(3.028)+(16.005), (I-338)+(3.028)+(16.006), (I-338)+(3.028)+(16.007), (I-338)+(3.028)+(16.008), (I-338)+(3.028)+(17.001), (I-338)+(3.028)+(17.002), (I-338)+(3.028)+(17.003), (I-338)+(3.028)+(17.004), (I-338)+(3.028)+(17.005), (I-338)+(3.028)+(17.006), (I-338)+(3.028)+(17.007), (I-338)+(3.028)+(17.008), (I-338)+(3.028)+(17.009), (I-338)+(3.028)+(17.010), (I-338)+(3.028)+(17.011), (I-338)+(3.028)+(17.012), (I-338)+(3.028)+(18.001), (I-338)+(3.029)+(3.025), (I-338)+(3.029)+(3.030), (I-338)+(3.029)+(3.031), (I-338)+(3.029)+(5.001), (I-338)+(3.029)+(5.002), (I-338)+(3.029)+(5.003), (I-338)+(3.029)+(5.004), (I-338)+(3.029)+(5.005), (I-338)+(3.029)+(5.006), (I-338)+(3.029)+(5.007), (I-338)+(3.029)+(5.008), (I-338)+(3.029)+(5.009), (I-338)+(3.029)+(5.010), (I-338)+(3.029)+(5.011), (I-338)+(3.029)+(5.012), (I-338)+(3.029)+(5.013), (I-338)+(3.029)+(5.014), (I-338)+(3.029)+(5.015), (I-338)+(3.029)+(5.016), (I-338)+(3.029)+(5.017), (I-338)+(3.029)+(5.018), (I-338)+(3.029)+(5.019), (I-338)+(3.029)+(5.020), (I-338)+(3.029)+(5.021), (I-338)+(3.029)+(5.022), (I-338)+(3.029)+(5.023), (I-338)+(3.029)+(6.001), (I-338)+(3.029)+(6.002), (I-338)+(3.029)+(6.003), (I-338)+(3.029)+(6.004), (I-338)+(3.029)+(7.001), (I-338)+(3.029)+(7.002), (I-338)+(3.029)+(7.003), (I-338)+(3.029)+(7.004), (I-338)+(3.029)+(7.005), (I-338)+(3.029)+(7.006), (I-338)+(3.029)+(9.001), (I-338)+(3.029)+(9.002), (I-338)+(3.029)+(9.003), (I-338)+(3.029)+(9.004), (I-338)+(3.029)+(9.005), (I-338)+(3.029)+(9.006), (I-338)+(3.029)+(9.007), (I-338)+(3.029)+(9.008), (I-338)+(3.029)+(9.009), (I-338)+(3.029)+(14.001), (I-338)+(3.029)+(14.002), (I-338)+(3.029)+(15.008), (I-338)+(3.029)+(15.011), (I-338)+(3.029)+(15.012), (I-338)+(3.029)+(15.016), (I-338)+(3.029)+(15.025), (I-338)+(3.029)+(15.027), (I-338)+(3.029)+(15.047), (I-338)+(3.029)+(15.063), (I-338)+(3.029)+(15.064), (I-338)+(3.029)+(16.001), (I-338)+(3.029)+(16.002), (I-338)+(3.029)+(16.003), (I-338)+(3.029)+(16.004), (I-338)+(3.029)+(16.005), (I-338)+(3.029)+(16.006), (I-338)+(3.029)+(16.007), (I-338)+(3.029)+(16.008), (I-338)+(3.029)+(17.001), (I-338)+(3.029)+(17.002), (I-338)+(3.029)+(17.003), (I-338)+(3.029)+(17.004), (I-338)+(3.029)+(17.005), (I-338)+(3.029)+(17.006), (I-338)+(3.029)+(17.007), (I-338)+(3.029)+(17.008), (I-338)+(3.029)+(17.009), (I-338)+(3.029)+(17.010), (I-338)+(3.029)+(17.011), (I-338)+(3.029)+(17.012), (I-338)+(3.029)+(18.001), (I-338)+(3.030)+(3.025), (I-338)+(3.030)+(3.031), (I-338)+(3.030)+(5.001), (I-338)+(3.030)+(5.002), (I-338)+(3.030)+(5.003), (I-338)+(3.030)+(5.004), (I-338)+(3.030)+(5.005), (I-338)+(3.030)+(5.006), (I-338)+(3.030)+(5.007), (I-338)+(3.030)+(5.008), (I-338)+(3.030)+(5.009), (I-338)+(3.030)+(5.010), (I-338)+(3.030)+(5.011), (I-338)+(3.030)+(5.012), (I-338)+(3.030)+(5.013), (I-338)+(3.030)+(5.014), (I-338)+(3.030)+(5.015), (I-338)+(3.030)+(5.016), (I-338)+(3.030)+(5.017), (I-338)+(3.030)+(5.018), (I-338)+(3.030)+(5.019), (I-338)+(3.030)+(5.020), (I-338)+(3.030)+(5.021), (I-338)+(3.030)+(5.022), (I-338)+(3.030)+(5.023), (I-338)+(3.030)+(6.001), (I-338)+(3.030)+(6.002), (I-338)+(3.030)+(6.003), (I-338)+(3.030)+(6.004), (I-338)+(3.030)+(7.001), (I-338)+(3.030)+(7.002), (I-338)+(3.030)+(7.003), (I-338)+(3.030)+(7.004), (I-338)+(3.030)+(7.005), (I-338)+(3.030)+(7.006), (I-338)+(3.030)+(9.001), (I-338)+(3.030)+(9.002), (I-338)+(3.030)+(9.003), (I-338)+(3.030)+(9.004), (I-338)+(3.030)+(9.005), (I-338)+(3.030)+(9.006), (I-338)+(3.030)+(9.007), (I-338)+(3.030)+(9.008), (I-338)+(3.030)+(9.009), (I-338)+(3.030)+(14.001), (I-338)+(3.030)+(14.002), (I-338)+(3.030)+(15.008), (I-338)+(3.030)+(15.011), (I-338)+(3.030)+(15.012), (I-338)+(3.030)+(15.016), (I-338)+(3.030)+(15.025), (I-338)+(3.030)+(15.027), (I-338)+(3.030)+(15.047), (I-338)+(3.030)+(15.063), (I-338)+(3.030)+(15.064), (I-338)+(3.030)+(16.001), (I-338)+(3.030)+(16.002), (I-338)+(3.030)+(16.003), (I-338)+(3.030)+(16.004), (I-338)+(3.030)+(16.005), (I-338)+(3.030)+(16.006), (I-338)+(3.030)+(16.007), (I-338)+(3.030)+(16.008), (I-338)+(3.030)+(17.001), (I-338)+(3.030)+(17.002), (I-338)+(3.030)+(17.003), (I-338)+(3.030)+(17.004), (I-338)+(3.030)+(17.005), (I-338)+(3.030)+(17.006), (I-338)+(3.030)+(17.007), (I-338)+(3.030)+(17.008), (I-338)+(3.030)+(17.009), (I-338)+(3.030)+(17.010), (I-338)+(3.030)+(17.011), (I-338)+(3.030)+(17.012), (I-338)+(3.030)+(18.001), (I-338)+(3.031)+(3.025), (I-338)+(3.031)+(3.030), (I-338)+(3.031)+(5.001), (I-338)+(3.031)+(5.002), (I-338)+(3.031)+(5.003), (I-338)+(3.031)+(5.004), (I-338)+(3.031)+(5.005), (I-338)+(3.031)+(5.006), (I-338)+(3.031)+(5.007), (I-338)+(3.031)+(5.008), (I-338)+(3.031)+(5.009), (I-338)+(3.031)+(5.010), (I-338)+(3.031)+(5.011), (I-338)+(3.031)+(5.012), (I-338)+(3.031)+(5.013), (I-338)+(3.031)+(5.014), (I-338)+(3.031)+(5.015), (I-338)+(3.031)+(5.016), (I-338)+(3.031)+(5.017), (I-338)+(3.031)+(5.018), (I-338)+(3.031)+(5.019), (I-338)+(3.031)+(5.020), (I-338)+(3.031)+(5.021), (I-338)+(3.031)+(5.022), (I-338)+(3.031)+(5.023), (I-338)+(3.031)+(6.001), (I-338)+(3.031)+(6.002), (I-338)+(3.031)+(6.003), (I-338)+(3.031)+(6.004), (I-338)+(3.031)+(7.001), (I-338)+(3.031)+(7.002), (I-338)+(3.031)+(7.003), (I-338)+(3.031)+(7.004), (I-338)+(3.031)+(7.005), (I-338)+(3.031)+(7.006), (I-338)+(3.031)+(9.001), (I-338)+(3.031)+(9.002), (I-338)+(3.031)+(9.003), (I-338)+(3.031)+(9.004), (I-338)+(3.031)+(9.005), (I-338)+(3.031)+(9.006), (I-338)+(3.031)+(9.007), (I-338)+(3.031)+(9.008), (I-338)+(3.031)+(9.009), (I-338)+(3.031)+(14.001), (I-338)+(3.031)+(14.002), (I-338)+(3.031)+(15.008), (I-338)+(3.031)+(15.011), (I-338)+(3.031)+(15.012), (I-338)+(3.031)+(15.016), (I-338)+(3.031)+(15.025), (I-338)+(3.031)+(15.027), (I-338)+(3.031)+(15.047), (I-338)+(3.031)+(15.063), (I-338)+(3.031)+(15.064), (I-338)+(3.031)+(16.001), (I-338)+(3.031)+(16.002), (I-338)+(3.031)+(16.003), (I-338)+(3.031)+(16.004), (I-338)+(3.031)+(16.005), (I-338)+(3.031)+(16.006), (I-338)+(3.031)+(16.007), (I-338)+(3.031)+(16.008), (I-338)+(3.031)+(17.001), (I-338)+(3.031)+(17.002), (I-338)+(3.031)+(17.003), (I-338)+(3.031)+(17.004), (I-338)+(3.031)+(17.005), (I-338)+(3.031)+(17.006), (I-338)+(3.031)+(17.007), (I-338)+(3.031)+(17.008), (I-338)+(3.031)+(17.009), (I-338)+(3.031)+(17.010), (I-338)+(3.031)+(17.011), (I-338)+(3.031)+(17.012), (I-338)+(3.031)+(18.001), (I-338)+(5.001)+(9.001), (I-338)+(5.001)+(9.002), (I-338)+(5.001)+(9.003), (I-338)+(5.001)+(9.004), (I-338)+(5.001)+(9.005), (I-338)+(5.001)+(9.006), (I-338)+(5.001)+(9.007), (I-338)+(5.001)+(9.008), (I-338)+(5.001)+(9.009), (I-338)+(5.001)+(15.012), (I-338)+(5.001)+(15.016), (I-338)+(5.001)+(15.025), (I-338)+(5.001)+(15.027), (I-338)+(5.001)+(15.047), (I-338)+(5.001)+(15.063), (I-338)+(5.001)+(15.064), (I-338)+(5.002)+(9.001), (I-338)+(5.002)+(9.002), (I-338)+(5.002)+(9.003), (I-338)+(5.002)+(9.004), (I-338)+(5.002)+(9.005), (I-338)+(5.002)+(9.006), (I-338)+(5.002)+(9.007), (I-338)+(5.002)+(9.008), (I-338)+(5.002)+(9.009), (I-338)+(5.002)+(15.012), (I-338)+(5.002)+(15.016), (I-338)+(5.002)+(15.025), (I-338)+(5.002)+(15.027), (I-338)+(5.002)+(15.047), (I-338)+(5.002)+(15.063), (I-338)+(5.002)+(15.064), (I-338)+(5.003)+(9.001), (I-338)+(5.003)+(9.002), (I-338)+(5.003)+(9.003), (I-338)+(5.003)+(9.004), (I-338)+(5.003)+(9.005), (I-338)+(5.003)+(9.006), (I-338)+(5.003)+(9.007), (I-338)+(5.003)+(9.008), (I-338)+(5.003)+(9.009), (I-338)+(5.003)+(15.012), (I-338)+(5.003)+(15.016), (I-338)+(5.003)+(15.025), (I-338)+(5.003)+(15.027), (I-338)+(5.003)+(15.047), (I-338)+(5.003)+(15.063), (I-338)+(5.003)+(15.064), (I-338)+(5.004)+(9.001), (I-338)+(5.004)+(9.002), (I-338)+(5.004)+(9.003), (I-338)+(5.004)+(9.004), (I-338)+(5.004)+(9.005), (I-338)+(5.004)+(9.006), (I-338)+(5.004)+(9.007), (I-338)+(5.004)+(9.008), (I-338)+(5.004)+(9.009), (I-338)+(5.004)+(15.012), (I-338)+(5.004)+(15.016), (I-338)+(5.004)+(15.025), (I-338)+(5.004)+(15.027), (I-338)+(5.004)+(15.047), (I-338)+(5.004)+(15.063), (I-338)+(5.004)+(15.064), (I-338)+(5.005)+(9.001), (I-338)+(5.005)+(9.002), (I-338)+(5.005)+(9.003), (I-338)+(5.005)+(9.004), (I-338)+(5.005)+(9.005), (I-338)+(5.005)+(9.006), (I-338)+(5.005)+(9.007), (I-338)+(5.005)+(9.008), (I-338)+(5.005)+(9.009), (I-338)+(5.005)+(15.012), (I-338)+(5.005)+(15.016), (I-338)+(5.005)+(15.025), (I-338)+(5.005)+(15.027), (I-338)+(5.005)+(15.047), (I-338)+(5.005)+(15.063), (I-338)+(5.005)+(15.064), (I-338)+(5.006)+(9.001), (I-338)+(5.006)+(9.002), (I-338)+(5.006)+(9.003), (I-338)+(5.006)+(9.004), (I-338)+(5.006)+(9.005), (I-338)+(5.006)+(9.006), (I-338)+(5.006)+(9.007), (I-338)+(5.006)+(9.008), (I-338)+(5.006)+(9.009), (I-338)+(5.006)+(15.012), (I-338)+(5.006)+(15.016), (I-338)+(5.006)+(15.025), (I-338)+(5.006)+(15.027), (I-338)+(5.006)+(15.047), (I-338)+(5.006)+(15.063), (I-338)+(5.006)+(15.064), (I-338)+(5.007)+(9.001), (I-338)+(5.007)+(9.002), (I-338)+(5.007)+(9.003), (I-338)+(5.007)+(9.004), (I-338)+(5.007)+(9.005), (I-338)+(5.007)+(9.006), (I-338)+(5.007)+(9.007), (I-338)+(5.007)+(9.008), (I-338)+(5.007)+(9.009), (I-338)+(5.007)+(15.012), (I-338)+(5.007)+(15.016), (I-338)+(5.007)+(15.025), (I-338)+(5.007)+(15.027), (I-338)+(5.007)+(15.047), (I-338)+(5.007)+(15.063), (I-338)+(5.007)+(15.064), (I-338)+(5.008)+(9.001), (I-338)+(5.008)+(9.002), (I-338)+(5.008)+(9.003), (I-338)+(5.008)+(9.004), (I-338)+(5.008)+(9.005), (I-338)+(5.008)+(9.006), (I-338)+(5.008)+(9.007), (I-338)+(5.008)+(9.008), (I-338)+(5.008)+(9.009), (I-338)+(5.008)+(15.012), (I-338)+(5.008)+(15.016), (I-338)+(5.008)+(15.025), (I-338)+(5.008)+(15.027), (I-338)+(5.008)+(15.047), (I-338)+(5.008)+(15.063), (I-338)+(5.008)+(15.064), (I-338)+(5.009)+(9.001), (I-338)+(5.009)+(9.002), (I-338)+(5.009)+(9.003), (I-338)+(5.009)+(9.004), (I-338)+(5.009)+(9.005), (I-338)+(5.009)+(9.006), (I-338)+(5.009)+(9.007), (I-338)+(5.009)+(9.008), (I-338)+(5.009)+(9.009), (I-338)+(5.009)+(15.012), (I-338)+(5.009)+(15.016), (I-338)+(5.009)+(15.025), (I-338)+(5.009)+(15.027), (I-338)+(5.009)+(15.047), (I-338)+(5.009)+(15.063), (I-338)+(5.009)+(15.064), (I-338)+(5.010)+(9.001), (I-338)+(5.010)+(9.002), (I-338)+(5.010)+(9.003), (I-338)+(5.010)+(9.004), (I-338)+(5.010)+(9.005), (I-338)+(5.010)+(9.006), (I-338)+(5.010)+(9.007), (I-338)+(5.010)+(9.008), (I-338)+(5.010)+(9.009), (I-338)+(5.010)+(15.012), (I-338)+(5.010)+(15.016), (I-338)+(5.010)+(15.025), (I-338)+(5.010)+(15.027), (I-338)+(5.010)+(15.047), (I-338)+(5.010)+(15.063), (I-338)+(5.010)+(15.064), (I-338)+(5.011)+(9.001), (I-338)+(5.011)+(9.002), (I-338)+(5.011)+(9.003), (I-338)+(5.011)+(9.004), (I-338)+(5.011)+(9.005), (I-338)+(5.011)+(9.006), (I-338)+(5.011)+(9.007), (I-338)+(5.011)+(9.008), (I-338)+(5.011)+(9.009), (I-338)+(5.011)+(15.012), (I-338)+(5.011)+(15.016), (I-338)+(5.011)+(15.025), (I-338)+(5.011)+(15.027), (I-338)+(5.011)+(15.047), (I-338)+(5.011)+(15.063), (I-338)+(5.011)+(15.064), (I-338)+(5.012)+(9.001), (I-338)+(5.012)+(9.002), (I-338)+(5.012)+(9.003), (I-338)+(5.012)+(9.004), (I-338)+(5.012)+(9.005), (I-338)+(5.012)+(9.006), (I-338)+(5.012)+(9.007), (I-338)+(5.012)+(9.008), (I-338)+(5.012)+(9.009), (I-338)+(5.012)+(15.012), (I-338)+(5.012)+(15.016), (I-338)+(5.012)+(15.025), (I-338)+(5.012)+(15.027), (I-338)+(5.012)+(15.047), (I-338)+(5.012)+(15.063), (I-338)+(5.012)+(15.064), (I-338)+(5.013)+(9.001), (I-338)+(5.013)+(9.002), (I-338)+(5.013)+(9.003), (I-338)+(5.013)+(9.004), (I-338)+(5.013)+(9.005), (I-338)+(5.013)+(9.006), (I-338)+(5.013)+(9.007), (I-338)+(5.013)+(9.008), (I-338)+(5.013)+(9.009), (I-338)+(5.013)+(15.012), (I-338)+(5.013)+(15.016), (I-338)+(5.013)+(15.025), (I-338)+(5.013)+(15.027), (I-338)+(5.013)+(15.047), (I-338)+(5.013)+(15.063), (I-338)+(5.013)+(15.064), (I-338)+(5.014)+(9.001), (I-338)+(5.014)+(9.002), (I-338)+(5.014)+(9.003), (I-338)+(5.014)+(9.004), (I-338)+(5.014)+(9.005), (I-338)+(5.014)+(9.006), (I-338)+(5.014)+(9.007), (I-338)+(5.014)+(9.008), (I-338)+(5.014)+(9.009), (I-338)+(5.014)+(15.012), (I-338)+(5.014)+(15.016), (I-338)+(5.014)+(15.025), (I-338)+(5.014)+(15.027), (I-338)+(5.014)+(15.047), (I-338)+(5.014)+(15.063), (I-338)+(5.014)+(15.064), (I-338)+(5.015)+(9.001), (I-338)+(5.015)+(9.002), (I-338)+(5.015)+(9.003), (I-338)+(5.015)+(9.004), (I-338)+(5.015)+(9.005), (I-338)+(5.015)+(9.006), (I-338)+(5.015)+(9.007), (I-338)+(5.015)+(9.008), (I-338)+(5.015)+(9.009), (I-338)+(5.015)+(15.012), (I-338)+(5.015)+(15.016), (I-338)+(5.015)+(15.025), (I-338)+(5.015)+(15.027), (I-338)+(5.015)+(15.047), (I-338)+(5.015)+(15.063), (I-338)+(5.015)+(15.064), (I-338)+(5.016)+(9.001), (I-338)+(5.016)+(9.002), (I-338)+(5.016)+(9.003), (I-338)+(5.016)+(9.004), (I-338)+(5.016)+(9.005), (I-338)+(5.016)+(9.006), (I-338)+(5.016)+(9.007), (I-338)+(5.016)+(9.008), (I-338)+(5.016)+(9.009), (I-338)+(5.016)+(15.012), (I-338)+(5.016)+(15.016), (I-338)+(5.016)+(15.025), (I-338)+(5.016)+(15.027), (I-338)+(5.016)+(15.047), (I-338)+(5.016)+(15.063), (I-338)+(5.016)+(15.064), (I-338)+(5.017)+(9.001), (I-338)+(5.017)+(9.002), (I-338)+(5.017)+(9.003), (I-338)+(5.017)+(9.004), (I-338)+(5.017)+(9.005), (I-338)+(5.017)+(9.006), (I-338)+(5.017)+(9.007), (I-338)+(5.017)+(9.008), (I-338)+(5.017)+(9.009), (I-338)+(5.017)+(15.012), (I-338)+(5.017)+(15.016), (I-338)+(5.017)+(15.025), (I-338)+(5.017)+(15.027), (I-338)+(5.017)+(15.047), (I-338)+(5.017)+(15.063), (I-338)+(5.017)+(15.064), (I-338)+(5.018)+(9.001), (I-338)+(5.018)+(9.002), (I-338)+(5.018)+(9.003), (I-338)+(5.018)+(9.004), (I-338)+(5.018)+(9.005), (I-338)+(5.018)+(9.006), (I-338)+(5.018)+(9.007), (I-338)+(5.018)+(9.008), (I-338)+(5.018)+(9.009), (I-338)+(5.018)+(15.012), (I-338)+(5.018)+(15.016), (I-338)+(5.018)+(15.025), (I-338)+(5.018)+(15.027), (I-338)+(5.018)+(15.047), (I-338)+(5.018)+(15.063), (I-338)+(5.018)+(15.064), (I-338)+(5.019)+(9.001), (I-338)+(5.019)+(9.002), (I-338)+(5.019)+(9.003), (I-338)+(5.019)+(9.004), (I-338)+(5.019)+(9.005), (I-338)+(5.019)+(9.006), (I-338)+(5.019)+(9.007), (I-338)+(5.019)+(9.008), (I-338)+(5.019)+(9.009), (I-338)+(5.019)+(15.012), (I-338)+(5.019)+(15.016), (I-338)+(5.019)+(15.025), (I-338)+(5.019)+(15.027), (I-338)+(5.019)+(15.047), (I-338)+(5.019)+(15.063), (I-338)+(5.019)+(15.064), (I-338)+(5.020)+(9.001), (I-338)+(5.020)+(9.002), (I-338)+(5.020)+(9.003), (I-338)+(5.020)+(9.004), (I-338)+(5.020)+(9.005), (I-338)+(5.020)+(9.006), (I-338)+(5.020)+(9.007), (I-338)+(5.020)+(9.008), (I-338)+(5.020)+(9.009), (I-338)+(5.020)+(15.012), (I-338)+(5.020)+(15.016), (I-338)+(5.020)+(15.025), (I-338)+(5.020)+(15.027), (I-338)+(5.020)+(15.047), (I-338)+(5.020)+(15.063), (I-338)+(5.020)+(15.064), (I-338)+(5.021)+(9.001), (I-338)+(5.021)+(9.002), (I-338)+(5.021)+(9.003), (I-338)+(5.021)+(9.004), (I-338)+(5.021)+(9.005), (I-338)+(5.021)+(9.006), (I-338)+(5.021)+(9.007), (I-338)+(5.021)+(9.008), (I-338)+(5.021)+(9.009), (I-338)+(5.021)+(15.012), (I-338)+(5.021)+(15.016), (I-338)+(5.021)+(15.025), (I-338)+(5.021)+(15.027), (I-338)+(5.021)+(15.047), (I-338)+(5.021)+(15.063), (I-338)+(5.021)+(15.064), (I-338)+(5.022)+(9.001), (I-338)+(5.022)+(9.002), (I-338)+(5.022)+(9.003), (I-338)+(5.022)+(9.004), (I-338)+(5.022)+(9.005), (I-338)+(5.022)+(9.006), (I-338)+(5.022)+(9.007), (I-338)+(5.022)+(9.008), (I-338)+(5.022)+(9.009), (I-338)+(5.022)+(15.012), (I-338)+(5.022)+(15.016), (I-338)+(5.022)+(15.025), (I-338)+(5.022)+(15.027), (I-338)+(5.022)+(15.047), (I-338)+(5.022)+(15.063), (I-338)+(5.022)+(15.064), (I-338)+(5.023)+(9.001), (I-338)+(5.023)+(9.002), (I-338)+(5.023)+(9.003), (I-338)+(5.023)+(9.004), (I-338)+(5.023)+(9.005), (I-338)+(5.023)+(9.006), (I-338)+(5.023)+(9.007), (I-338)+(5.023)+(9.008), (I-338)+(5.023)+(9.009), (I-338)+(5.023)+(15.012), (I-338)+(5.023)+(15.016), (I-338)+(5.023)+(15.025), (I-338)+(5.023)+(15.027), (I-338)+(5.023)+(15.047), (I-338)+(5.023)+(15.063), (I-338)+(5.023)+(15.064).

According to the invention, the expression "combination" stands for the various combinations of compounds (A) and (B), for example in a single "ready-mix" form, in a combined spray mixture composed from separate formulations of the single active compounds, such as a "tank-mix", and in a combined use of the single active ingredients when applied in a sequential manner, i.e. one after the other within a reasonably short period, such as a few hours or days. Preferably the order of applying the compounds (A) and (B) is not essential for working the present invention.

In the combinations according to the invention the compounds (A) and (B) can be present in a broad range of effective weight ratio of A:B, for example in a range of 250000:1 to 1:250000, preferably in a weight ratio of 5000:1 to 1:5000, more preferably in a weight ratio of 1000:1 to 1:1000, even more preferably in a weight ratio of 500:1 to 1:500, and most preferably in a weight ratio of 100:1 to 1:100.

Further ratios of A:B which can be used according to the present invention are: 95:1 to 1:95, 90:1 to 1:90, 85:1 to 1:85, 80:1 to 1:80, 75:1 to 1:75, 70:1 to 1:70, 65:1 to 1:65, 60:1 to 1:60, 55:1 to 1:55, 50:1 to 1:50, 45:1 to 1:45, 40:1 to 1:40, 35:1 to 1:35, 30:1 to 1:30, 25:1 to 1:25, 20:1 to 1:20, 15:1 to 1:15, 10:1 to 1:10, 5:1 to 1:5, 4:1 to 1:4, 3:1 to 1:3, 2:1 to 1:2.

Further ratios of A:B which can be used according to the present invention are: 1000:1 to 1:1, 500:1 to 1:1, 250:1 to 1:1, 100:1 to 1:1, 95:1 to 1:1, 90:1 to 1:1, 85:1 to 1:1, 80:1 to 1:1, 75:1 to 1:1, 70:1 to 1:1, 65:1 to 1:1, 60:1 to 1:1, 55:1 to 1:1, 50:1 to 1:1, 45:1 to 1:1, 40:1 to 1:1, 35:1 to 1:1, 30:1 to 1:1, 25:1 to 1:1, 20:1 to 1:1, 15:1 to 1:1, 10:1 to 1:1, 5:1 to 1:1, 4:1 to 1:1, 3:1 to 1:1, 2:1 to 1:1.

Further ratios of A:B which can be used according to the present invention are: 1:1 to 1:1000, 1:1 to 1:500, 1:1 to 1:250, 1:1 to 1:100, 1:1 to 1:95, 1:1 to 1:90, 1:1 to 1:85, 1:1 to 1:80, 1:1 to 1:75, 1:1 to 1:70, 1:1 to 1:65, 1:1 to 1:60, 1:1 to 1:55, 1:1 to 1:50, 1:1 to 1:45, 1:1 to 1:40, 1:1 to 1:35, 1:1 to 1:30, 1:1 to 1:25, 1:1 to 1:20, 1:1 to 1:15, 1:1 to 1:10, 1:1 to 1:5, 1:1 to 1:4, 1:1 to 1:3, 1:1 to 1:2.

If more than one, e.g. 2 or 3, compounds (B) are present, the weight ratio refers to the total amount of compound (B), i.e. to the sum of the amount of each compound (B) present in the combination. This applies mutatis mutandis if more than one, e.g. 2 or 3, compounds (A) are present.

If more than one, e.g. 2 or 3, compounds (B) are present in the combinations according to the invention the individual compounds (B) can be present in a broad range of effective weight ratio. If for example 2 compounds (B) are present, which are in the following referred to as compounds (B1) and (B2) the effective weight ratio of B1:B2, can vary for example in a range of 100:1 to 1:100, preferably in a weight ratio of 50:1 to 1:50, most preferably in a weight ratio of 20:1 to 1:20. Further ratios of B1:B2 which can be used according to the present invention with increasing preference in the order given are: 95:1 to 1:95, 90:1 to 1:90, 85:1 to 1:85, 80:1 to 1:80, 75:1 to 1:75, 70:1 to 1:70, 65:1 to 1:65, 60:1 to 1:60, 55:1 to 1:55, 50:1 to 1:50, 45:1 to 1:45, 40:1 to 1:40, 35:1 to 1:35, 30:1 to 1:30, 25:1 to 1:25, 15:1 to 1:15, 10:1 to 1:10, 5:1 to 1:5, 4:1 to 1:4, 3:1 to 1:3, 2:1 to 1:2.

Further ratios of B1:B2 which can be used according to the present invention are: 95:1 to 1:1, 90:1 to 1:1, 85:1 to 1:1, 80:1 to 1:1, 75:1 to 1:1, 70:1 to 1:1, 65:1 to 1:1, 60:1 to 1:1, 55:1 to 1:1, 50:1 to 1:1, 45:1 to 1:1, 40:1 to 1:1, 35:1 to 1:1, 30:1 to 1:1, 25:1 to 1:1, 20:1 to 1:1, 15:1 to 1:1, 10:1 to 1:1, 5:1 to 1:1, 4:1 to 1:1, 3:1 to 1:1, 2:1 to 1:1.

Further ratios of B1:B2 which can be used according to the present invention are: 1:1 to 1:95, 1:1 to 1:90, 1:1 to 1:85, 1:1 to 1:80, 1:1 to 1:75, 1:1 to 1:70, 1:1 to 1:65, 1:1 to 1:60, 1:1 to 1:55, 1:1 to 1:50, 1:1 to 1:45, 1:1 to 1:40, 1:1 to 1:35, 1:1 to 1:30, 1:1 to 1:25, 1:1 to 1:20, 1:1 to 1:15, 1:1 to 1:10, 1:1 to 1:5, 1:1 to 1:4, 1:1 to 1:3, 1:1 to 1:2.

Isomers

Depending on the nature of the substituents of compound (A) and the nature of compound (B), those compounds may be present in the compound combinations of the invention in the form of different stereoisomers. These stereoisomers are, for example, enantiomers, diastereomers, atropisomers or geometric isomers. Accordingly, the invention encompasses both pure stereoisomers and any mixture of these isomers. Where a compound can be present in two or more tautomer forms in equilibrium, reference to the compound by means of one tautomeric description is to be considered to include all tautomer forms. Where a compound can be present in isomeric forms and/or tautomeric forms, such a compound is understood hereinabove and hereinbelow also to include, where applicable, corresponding isomeric and/or tautomeric forms or mixtures thereof, even when these are not specifically mentioned in each case.

Salts/N-Oxides

The compounds present in the compound combination of the invention may independently of one another be present in the form of the free compound and/or, if applicable, an agrochemically active salt and/or a N-oxide thereof.

Agrochemically active salts include acid addition salts of inorganic and organic acids well as salts of customary bases. Examples of inorganic acids are hydrohalic acids, such as hydrogen fluoride, hydrogen chloride, hydrogen bromide and hydrogen iodide, sulfuric acid, phosphoric acid and nitric acid, and acidic salts, such as sodium bisulfate and potassium bisulfate. Useful organic acids include, for example, formic acid, carbonic acid and alkanoic acids such as acetic acid, trifluoroacetic acid, trichloroacetic acid and propionic acid, and also glycolic acid, thiocyanic acid, lactic acid, succinic acid, citric acid, benzoic acid, cinnamic acid, oxalic acid, saturated or mono- or diunsaturated fatty acids having 6 to 20 carbon atoms, alkylsulphuric monoesters, alkylsulphonic acids (sulphonic acids having straight-chain or branched alkyl radicals having 1 to 20 carbon atoms), arylsulphonic acids or aryldisulphonic acids (aromatic radicals, such as phenyl and naphthyl, which bear one or two sulphonic acid groups), alkylphosphonic acids (phosphonic acids having straight-chain or branched alkyl radicals having 1 to 20 carbon atoms), arylphosphonic acids or aryldiphosphonic acids (aromatic radicals, such as phenyl and naphthyl, which bear one or two phosphonic acid radicals), where the alkyl and aryl radicals may bear further substituents, for example p-toluenesulphonic acid, salicylic acid, p-aminosalicylic acid, 2-phenoxybenzoic acid, 2-acetoxybenzoic acid.

N-oxides of compounds present in the compound combination of the invention or intermediates thereof can be obtained in a simple manner by customary processes, for example by N-oxidation with hydrogen peroxide ($H_2O_2$), peracids, for example peroxy sulfuric acid or peroxy carboxylic acids, such as meta-chloroperoxybenzoic acid or peroxymonosulfuric acid (Caro's acid).

E.g. the corresponding N-oxides may be prepared starting from the respective compounds using conventional oxidation methods, e.g. by treating the compounds with an organic peracid such as metachloroperbenzoic acid (e.g. WO-A 2003/64572 or J. Med. Chem. 38 (11), 1892-1903, 1995); or with inorganic oxidizing agents such as hydrogen peroxide (e.g. J. Heterocyc. Chem. 18 (7), 1305-1308, 1981) or oxone (e.g. J. Am. Chem. Soc. 123 (25), 5962-5973, 2001). The oxidation may lead to pure mono-N-oxides or to a mixture of different N-oxides, which can be separated by conventional methods such as chromatography.

Crystalline Form

The compounds present in the compound combinations of the invention may exist in multiple crystalline and/or amorphous forms. Crystalline forms include unsolvated crystalline forms, solvates and hydrates, in each case of the individual compounds or adducts thereof.

Solvates of the compounds present in the compound combinations of the invention or their salts are stoichiometric compositions of the compounds with solvents.

Formulations

The present invention further relates to compositions for controlling unwanted microorganisms, comprising the compound combination according to the invention. The compositions may be applied to the microorganisms and/or in their habitat.

The composition comprises the compound combination of the invention and at least one agriculturally suitable auxiliary, e.g. carrier(s) and/or surfactant(s).

A carrier is a solid or liquid, natural or synthetic, organic or inorganic substance that is generally inert. The carrier generally improves the application of the compounds, for instance, to plants, plants parts or seeds. Examples of suitable solid carriers include, but are not limited to, ammonium salts, in particular ammonium sulfates, ammonium phosphates and ammonium nitrates, natural rock flours, such as kaolins, clays, talc, chalk, quartz, attapulgite, montmorillonite and diatomaceous earth, silica gel and synthetic rock flours, such as finely divided silica, alumina and silicates. Examples of typically useful solid carriers for preparing granules include, but are not limited to crushed and fractionated natural rocks such as calcite, marble, pumice, sepiolite and dolomite, synthetic granules of inorganic and organic flours and granules of organic material such as paper, sawdust, coconut shells, maize cobs and tobacco stalks. Examples of suitable liquid carriers include, but are not limited to, water, organic solvents and combinations thereof. Examples of suitable solvents include polar and nonpolar organic chemical liquids, for example from the classes of aromatic and nonaromatic hydrocarbons (such as cyclohexane, paraffins, alkylbenzenes, xylene, toluene, tetrahydronaphthalene, alkylnaphthalenes, chlorinated aromatics or chlorinated aliphatic hydrocarbons such as chlorobenzenes, chloroethylenes or methylene chloride), alcohols and polyols (which may optionally also be substituted, etherified and/or esterified, such as ethanol, propanol, butanol, benzylalcohol, cyclohexanol or glycol), ketones (such as acetone, methyl ethyl ketone, methyl isobutyl ketone or cyclohexanone), esters (including fats and oils) and (poly)ethers, unsubstituted and substituted amines, amides (such as dimethylformamide or fatty acid amides) and esters thereof, lactams (such as N-alkylpyrrolidones, in particular N-methylpyrrolidone) and lactones, sulfones and sulfoxides (such as dimethyl sulfoxide), oils of vegetable or animal origin. The carrier may also be a liquefied gaseous extender, i.e. liquid which is gaseous at standard temperature and under standard pressure, for example aerosol propellants such as halohydrocarbons, butane, propane, nitrogen and carbon dioxide.

Preferred solid carriers are selected from clays, talc and silica.

Preferred liquid carriers are selected from water, fatty acid amides and esters thereof, aromatic and nonaromatic hydrocarbons, lactams and carbonic acid esters.

The amount of carrier typically ranges from 1 to 99.99%, preferably from 5 to 99.9%, more preferably from 10 to 99.5%, and most preferably from 20 to 99% by weight of the composition.

Liquid carriers are typically present in a range of from 20 to 90%, for example 30 to 80% by weight of the composition.

Solid carriers are typically present in a range of from 0 to 50%, preferably 5 to 45%, for example 10 to 30% by weight of the composition.

If the composition comprises two or more carriers, the outlined ranges refer to the total amount of carriers.

The surfactant can be an ionic (cationic or anionic), amphoteric or non-ionic surfactant, such as ionic or non-ionic emulsifier(s), foam former(s), dispersant(s), wetting agent(s), penetration enhancer(s) and any mixtures thereof. Examples of suitable surfactants include, but are not limited to, salts of polyacrylic acid, salts of lignosulfonic acid (such as sodium lignosulfonate), salts of phenolsulfonic acid or naphthalenesulfonic acid, polycondensates of ethylene oxide and/or propylene oxide with fatty alcohols, fatty acids or fatty amines (for example, polyoxyethylene fatty acid esters such as castor oil ethoxylate, polyoxyethylene fatty alcohol ethers, for example alkylaryl polyglycol ethers), substituted phenols (preferably alkylphenols or arylphenols) and ethoxylates thereof (such as tristyrylphenol ethoxylate), salts of sulfosuccinic esters, taurine derivatives (preferably alkyl taurates), phosphoric esters of polyethoxylated alcohols or phenols, fatty esters of polyols (such a fatty acid esters of glycerol, sorbitol or sucrose), sulfates (such as alkyl sulfates and alkyl ether sulfates), sulfonates (for example, alkylsulfonates, arylsulfonates and alkylbenzene sulfonates), phosphate esters, protein hydrolysates, lignosulfite waste liquors and methylcellulose. Any reference to salts in this paragraph refers preferably to the respective alkali, alkaline earth and ammonium salts.

Preferred surfactants are selected from polyoxyethylene fatty alcohol ethers, polyoxyethylene fatty acid esters, alkylbenzene sulfonates, such as calcium dodecylbenzenesulfonate, castor oil ethoxylate, sodium lignosulfonate and arylphenol ethoxylates, such as tristyrylphenol ethoxylate.

The amount of surfactants typically ranges from 5 to 40%, for example 10 to 20%, by weight of the composition.

Further examples of suitable auxiliaries include water repellents, siccatives, binders (adhesive, tackifier, fixing agent, such as carboxymethylcellulose, natural and synthetic polymers in the form of powders, granules or latices, such as gum arabic, polyvinyl alcohol and polyvinyl acetate, natural phospholipids such as cephalins and lecithins and synthetic phospholipids, polyvinylpyrrolidone and tylose), thickeners and secondary thickeners (such as cellulose ethers, acrylic acid derivatives, xanthan gum, modified clays, e.g. the products available under the name Bentone, and finely divided silica), stabilizers (e.g. cold stabilizers, preservatives (e.g. dichlorophene and benzyl alcohol hemiformal), antioxidants, light stabilizers, in particular UV stabilizers, or other agents which improve chemical and/or physical stability), dyes or pigments (such as inorganic pigments, e.g. iron oxide, titanium oxide and Prussian Blue; organic dyes, e.g. alizarin, azo and metal phthalocyanine dyes), antifoams (e.g. silicone antifoams and magnesium stearate), antifreezes, stickers, gibberellins and processing auxiliaries, mineral and vegetable oils, perfumes, waxes, nutrients (including trace nutrients, such as salts of iron, manganese, boron, copper, cobalt, molybdenum and zinc), protective colloids, thixotropic substances, penetrants, sequestering agents and complex formers.

The choice of the auxiliaries depends on the intended mode of application of the compound combination of the invention and/or on the physical properties of the active compound(s) present in said compound combination. Furthermore, the auxiliaries may be chosen to impart particular properties (technical, physical and/or biological properties) to the compositions or use forms prepared therefrom. The choice of auxiliaries may allow customizing the compositions to specific needs.

The composition of the invention may be provided to the end user as ready-for-use formulation, i.e. the compositions may be directly applied to the plants or seeds by a suitable device, such as a spraying or dusting device. Alternatively, the compositions may be provided to the end user in the form of concentrates which have to be diluted, preferably with water, prior to use.

The composition of the invention can be prepared in conventional manners, for example by mixing the compound combination of the invention with one or more suitable auxiliaries, such as disclosed herein above.

The composition comprises a fungicidally effective amount of a compound combination of the invention. The term "effective amount" denotes an amount, which is sufficient for controlling harmful fungi on cultivated plants or in the protection of materials and which does not result in a substantial damage to the treated plants. Such an amount can vary in a broad range and is dependent on various factors, such as the fungal species to be controlled, the treated cultivated plant or material, the climatic conditions and the specific compound combination of the invention used. Usually, the composition according to the invention contains from 0.01 to 99% by weight, preferably from 0.05 to 98% by weight, more preferred from 0.1 to 95% by weight, even more preferably from 0.5 to 90% by weight, most preferably from 1 to 80% by weight of the compound combination of the invention.

The composition of the invention may be in any customary composition type, such as solutions (e.g aqueous solutions), emulsions, water- and oil-based suspensions, powders (e.g. wettable powders, soluble powders), dusts, pastes, granules (e.g. soluble granules, granules for broadcasting), suspoemulsion concentrates, natural or synthetic products impregnated with the compound combination of the invention, fertilizers and also microencapsulations in polymeric substances. The compound combination of the invention may be present in a suspended, emulsified or dissolved form. Examples of particular suitable composition types are solutions, watersoluble concentrates (e.g. SL, LS), dispersible concentrates (DC), suspensions and suspension concentrates (e.g. SC, OD, OF, FS), emulsifiable concentrates (e.g. EC), emulsions (e.g. EW, EO, ES, ME, SE), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GW, GF). These and further compositions types are defined by the Food and Agriculture Organization of the United Nations (FAO). An overview is given in the "Catalogue of pesticide formulation types and international coding system", Technical Monograph No. 2, 6th Ed. May 2008, Croplife International.

Preferably, the composition of the invention is in form of one of the following types: EC, SC, FS, SE, OD and WG, more preferred EC, SC, OD and WG.

Further details about examples of composition types and their preparation are given below. The outlined amount of compound combination of the invention refers to the total amount of compounds (A) and (B) present in the compound combination of the present invention. If two or more representatives of any further component of the composition, e.g. wetting agent, binder, are present, the outlined amounts of the respective component refers to the total amount of all representatives of said component, e.g. all wetting agents, all binders, all solvents and so on.

i) Water-Soluble Concentrates (SL, LS)

10-60% by weight of the compound combination of the invention and 5-15% by weight surfactant (e.g. polyoxyethylene fatty alcohol ether) are dissolved in such amount of water and/or water-soluble solvent (e.g. alcohols such as propylene glycol or carbonates such as propylene carbonate) to result in a total amount of 100% by weight. Before application the concentrate is diluted with water.

ii) Dispersible Concentrates (DC)

5-25% by weight of the compound combination of the invention and 1-10% by weight surfactant and/or binder (e.g. polyvinylpyrrolidone) are dissolved in such amount of organic solvent (e.g. cyclohexanone) to result in a total amount of 100% by weight. Dilution with water gives a dispersion.

iii) Emulsifiable Concentrates (EC)

15-70% by weight of the compound combination of the invention and 5-10% by weight surfactant (e.g. a mixture of calcium dodecylbenzenesulfonate and castor oil ethoxylate) are dissolved in such amount of water-insoluble organic solvent (e.g. aromatic hydrocarbon or fatty acid amide) and if needed additional water-soluble solvent to result in a total amount of 100% by weight. Dilution with water gives an emulsion.

iv) Emulsions (EW, EO, ES)

5-40% by weight of the compound combination of the invention and 1-10% by weight surfactant (e.g. a mixture of calcium dodecylbenzenesulfonate and castor oil ethoxylate) are dissolved in 20-40% by weight water-insoluble organic solvent (e.g. aromatic hydrocarbon). This mixture is added to such amount of water by means of an emulsifying machine to result in a total amount of 100% by weight. The resulting composition is a homogeneous emulsion. Before application the emulsion may be further diluted with water.

v) Suspensions and Suspension Concentrates v-1) Water-Based (SC, FS)

In a suitable grinding equipment, e.g. an agitated ball mill, 20-60% by weight of the compound combination of the invention are comminuted with addition of 2-10% by weight surfactant (e.g. sodium lignosulfonate and polyoxyethylene fatty alcohol ether), 0.1-2% by weight thickener (e.g. xanthan gum) and water to give a fine active substance suspension. Water is added in such amount to result in a total amount of 100% by weight. Dilution with water gives a stable suspension of the active substances. For FS type compositions up to 40% by weight binder (e.g. polyvinylalcohol) is added.

v-2) Oil-Based (OD, OF)

In a suitable grinding equipment, e.g. an agitated ball mill, 20-60% by weight of the compound combination of the invention are comminuted with addition of 2-10% by weight surfactant (e.g. sodium lignosulfonate and polyoxyethylene fatty alcohol ether), 0.1-2% by weight thickener (e.g. modified clay, in particular Bentone, or silica) and an organic carrier to give a fine active substance oil suspension. The organic carrier is added in such amount to result in a total amount of 100% by weight. Dilution with water gives a stable dispersion of the active substances.

vi) Water-Dispersible Granules and Water-Soluble Granules (WG, SG)

50-80% by weight of the compound combination of the invention are ground finely with addition of surfactant (e.g. sodium lignosulfonate and polyoxyethylene fatty alcohol ether) and converted to water-dispersible or water-soluble granules by means of technical appliances (e. g. extrusion, spray tower, fluidized bed). The surfactant is used in such amount to result in a total amount of 100% by weight. Dilution with water gives a stable dispersion or solution of the active substances.

vii) Water-Dispersible Powders and Water-Soluble Powders (WP, SP, WS)

50-80% by weight of the compound combination of the invention are ground in a suitable mill, preferably a rotor-stator mill, with addition of 1-8% by weight surfactant (e.g. sodium lignosulfonate, polyoxyethylene fatty alcohol ether) and such amount of solid carrier, e.g. silica gel, to result in a total amount of 100% by weight. Dilution with water gives a stable dispersion or solution of the active substances.

viii) Gel (GW, GF)

In a suitable mill, e.g. an agitated ball mill, 5-25% by weight of the compound combination of the invention are comminuted with addition of 3-10% by weight surfactant (e.g. sodium lignosulfonate), 1-5% by weight binder (e.g. carboxymethylcellulose) and such amount of water to result in a total amount of 100% by weight. This results in a fine suspension of the active substance. Dilution with water gives a stable suspension of the active substances.

ix) Microemulsion (ME)

5-20% by weight of the compound combination of the invention are added to 5-30% by weight organic solvent blend (e.g. fatty acid dimethylamide and cyclohexanone), 10-25% by weight surfactant blend (e.g. polyoxyethylene fatty alcohol ether and arylphenol ethoxylate), and such amount of water to result in a total amount of 100% by weight. This mixture is stirred for 1 h to produce spontaneously a thermodynamically stable microemulsion.

x) Microcapsules (CS)

An oil phase comprising 5-50% by weight of the compound combination of the invention, 0-40% by weight water-insoluble organic solvent (e.g. aromatic hydrocarbon), 2-15% by weight acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50% by weight of the compound combination of the invention, 0-40% by weight water-insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10% by weight of the total CS composition.

xi) Dustable Powders (DP, DS)

1-10% by weight of the compound combination of the invention are ground finely and mixed intimately with such amount of solid carrier, e.g. finely divided kaolin, to result in a total amount of 100% by weight.

xii) Granules (GR, FG)

0.5-30% by weight of the compound combination of the invention are ground finely and associated with such amount of solid carrier (e.g. silicate) to result in a total amount of 100% by weight. Granulation is achieved by extrusion, spray-drying or the fluidized bed.

xiii) Ultra-Low Volume Liquids (UL)

1-50% by weight of the compound combination of the invention are dissolved in such amount of organic solvent, e.g. aromatic hydrocarbon, to result in a total amount of 100% by weight.

The compositions types i) to xiii) may optionally comprise further auxiliaries, such as 0.1-1% by weight preservatives, 0.1-1% by weight antifoams, 0.1-1% by weight dyes and/or pigments, and 5-10% by weight antifreezes.

Further Active Ingredients

Compound combinations according to the invention can be used as such or in compositions/formulations thereof and can be mixed with further known active ingredients, for example biological control agents, bactericides, acaricides, nematicides or insecticides, in order thus to broaden, for example, the activity spectrum or to prevent development of resistance.

Useful mixing partners include, for example, insecticides, acaricides, nematicides and bactericides (see also Pesticide Manual, 14th ed.).

A mixture with other known active ingredients, such as herbicides, or with fertilizers and growth regulators, safeners and/or semiochemicals, is also possible.

"Insecticides" as well as the term "insecticidal" refers to the ability of a substance to increase mortality or inhibit growth rate of insects. As used herein, the term "insects" comprises all organisms in the class "Insecta".

"Nematicide" and "nematicidal" refers to the ability of a substance to increase mortality or inhibit the growth rate of nematodes. In general, the term "nematode" comprises eggs, larvae, juvenile and mature forms of said organism.

"Acaricide" and "acaricidal" refers to the ability of a substance to increase mortality or inhibit growth rate of ectoparasites belonging to the class Arachnida, sub-class Acari.

As used herein, the term"biological control" is defined as control of harmful organisms such as a phytopathogenic fungi and/or insects and/or acarids and/or nematodes by the use or employment of a biological control agent.

As used herein, the term "biological control agent" is defined as an organism other than the harmful organisms and/or proteins or secondary metabolites produced by such an organism for the purpose of biological control. Mutants of the second organism shall be included within the definition of the biological control agent. The term "mutant" refers to a variant of the parental strain as well as methods for obtaining a mutant or variant in which the pesticidal activity is greater than that expressed by the parental strain. The "parent strain" is defined herein as the original strain before mutagenesis. To obtain such mutants the parental strain may be treated with a chemical such as N-methyl-N'-nitro-N-nitrosoguanidine, ethylmethanesulfone, or by irradiation using gamma, x-ray, or UV-irradiation, or by other means well known to those skilled in the art. Known mechanisms of biological control agents comprise enteric bacteria that control root rot by out-competing fungi for space on the surface of the root. Bacterial toxins, such as antibiotics, have been used to control pathogens. The toxin can be isolated and applied directly to the plant or the bacterial species may be administered so it produces the toxin in situ.

A "variant" is a strain having all the identifying characteristics of the NRRL or ATCC Accession Numbers as indicated in this text and can be identified as having a genome that hybridizes under conditions of high stringency to the genome of the NRRL or ATCC Accession Numbers.

"Hybridization" refers to a reaction in which one or more polynucleotides react to form a complex that is stabilized via hydrogen bonding between the bases of the nucleotide residues. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these. Hybridization reactions can be performed under conditions of different "stringency". In general, a low stringency hybridization reaction is carried out at about 40° C. in 10×SSC or a solution of equivalent ionic strength/temperature. A moderate stringency hybridization is typically performed at about 50° C. in 6×SSC, and a high stringency hybridization reaction is generally performed at about 60° C. in 1×SSC.

A variant of the indicated NRRL or ATCC Accession Number may also be defined as a strain having a genomic sequence that is greater than 85%, more preferably greater than 90% or more preferably greater than 95% sequence identity to the genome of the indicated NRRL or ATCC Accession Number. A polynucleotide or polynucleotide region (or a polypeptide or polypeptide region) has a certain percentage (for example, 80%, 85%, 90%, or 95%) of "sequence identity" to another sequence means that, when aligned, that percentage of bases (or amino acids) are the same in comparing the two sequences. This alignment and the percent homology or sequence identity can be determined using software programs known in the art, for example, those described in Current Protocols in Molecular Biology (F. M. Ausubel et al., eds., 1987).

NRRL is the abbreviation for the Agricultural Research Service Culture Collection, an international depositary authority for the purposes of deposing microorganism strains under the Budapest treaty on the international recognition of the deposit of microorganisms for the purposes of patent procedure, having the address National Center for Agricultural Utilization Research, Agricultural Research service, U.S. Department of Agriculture, 1815 North university Street, Peroira, Illinois 61604 USA.

ATCC is the abbreviation for the American Type Culture Collection, an international depositary authority for the purposes of deposing microorganism strains under the Budapest treaty on the international recognition of the deposit of microorganisms for the purposes of patent procedure, having the address ATCC Patent Depository, 10801 University Blvd., Manassas, VA 10110 USA.

Examples of biological control agents which may be combined with the compound combinations of the invention are:

(A) Antibacterial agents selected from the group of:

(A1) bacteria, such as (A1.1) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (A1.2) *Bacillus amyloliquefaciens*, in particular strain D747 (available as Double Nickel™ from Certis, US, having accession number FERM BP-8234 and disclosed in U.S. Pat. No. 7,094,592); (A1.3) *Bacillus pumilus*, in particular strain BU F-33 (having NRRL Accession No. 50185); (A1.4) *Bacillus subtilis* var. *amyloliquefaciens* strain FZB24 (available as Taegro® from Novozymes, US); (A1.5) a *Paenibacillus* sp. strain having Accession No. NRRL B-50972 or Accession No. NRRL B-67129 and described in International Patent Publication No. WO 2016/154297; and (A2) fungi, such as (A2.1) *Aureobasidium pullulans*, in particular blastospores of strain DSM14940; (A2.2) *Aureobasidium pullulans* blastospores of strain DSM 14941; (A2.3) *Aureobasidium pullulans*, in particular mixtures of blastospores of strains DSM14940 and DSM14941;

(B) Biological fungicides selected from the group of:

(B1) bacteria, for example (B1.1) *Bacillus subtilis*, in particular strain QST713/AQ713 (available as SERENADE OPTI or SERENADE ASO from Bayer CropScience LP, US, having NRRL Accession No. B21661 and described in U.S. Pat. No. 6,060,051); (B1.2) *Bacillus pumilus*, in particular strain QST2808 (available as SONATA® from Bayer CropScience LP, US, having Accession No. NRRL B-30087 and described in U.S. Pat. No. 6,245,551); (B1.3) *Bacillus pumilus*, in particular strain GB34 (available as Yield Shield® from Bayer AG, DE); (B1.4) *Bacillus pumilus*, in particular strain BU F-33 (having NRRL Accession No. 50185); (B1.5) *Bacillus amyloliquefaciens*, in particular strain D747 (available as Double Nickel™ from Certis, US, having accession number FERM BP-8234 and disclosed in U.S. Pat. No. 7,094,592); (B1.6) *Bacillus subtilis* Y1336 (available as BIOBAC®WP from Bion-Tech, Taiwan, registered as a biological fungicide in Taiwan under Registration Nos. 4764, 5454, 5096 and 5277); (B1.7) *Bacillus amyloliquefaciens* strain MBI 600 (available as SUBTILEX from BASF SE); (B1.8) *Bacillus subtilis* strain GB03 (available as Kodiak® from Bayer AG, DE); (B1.9) *Bacillus subtilis* var. *amyloliquefaciens* strain FZB24 (available from Novozymes Biologicals Inc., Salem, Virginia or Syngenta Crop Protection, LLC, Greensboro, North Carolina as the fungicide TAEGRO® or TAEGRO© ECO (EPA Registration No. 70127-5); (B1.10) *Bacillus mycoides*, isolate J (available as BmJ TGAI or WG from Certis USA); (B1.11) *Bacillus licheniformis*, in particular strain SB3086 (available as EcoGuard™ Biofungicide and Green Releaf from Novozymes); (B1.12) a *Paenibacillus* sp. strain having Accession No. NRRL B-50972 or Accession No. NRRL B-67129 and described in International Patent Publication No. WO 2016/154297, (C1) fatty acids or derivatives, for example (C1.1) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

In some embodiments, the biological control agent is a *Bacillus subtilis* or *Bacillus amyloliquefaciens* strain that produces a fengycin or plipastatin-type compound, an iturin-type compound, and/or a surfactin-type compound. For background, see the following review article: Ongena, M., et al., "*Bacillus* Lipopeptides: Versatile Weapons for Plant Disease Biocontrol," Trends in Microbiology, Vol 16, No. 3, March 2008, pp. 115-125. *Bacillus* strains capable of producing lipopeptides include *Bacillus subtilis* QST713 (available as SERENADE OPTI or SERENADE ASO from Bayer CropScience LP, US, having NRRL Accession No. B21661 and described in U.S. Pat. No. 6,060,051), *Bacillus amyloliquefaciens* strain D747 (available as Double Nickel™ from Certis, US, having accession number FERM BP-8234 and disclosed in U.S. Pat. No. 7,094,592); *Bacillus subtilis* MBI600 (available as SUBTILEX® from Becker Underwood, US EPA Reg. No. 71840-8); *Bacillus subtilis* Y1336 (available as BIOBAC® WP from Bion-Tech, Taiwan, registered as a biological fungicide in Taiwan under Registration Nos. 4764, 5454, 5096 and 5277); *Bacillus amyloliquefaciens*, in particular strain FZB42 (available as RHIZOVITAL® from ABiTEP, DE); and *Bacillus subtilis* var. *amyloliquefaciens* FZB24 (available from Novozymes Biologicals Inc., Salem, Virginia or Syngenta Crop Protection, LLC, Greensboro, North Carolina as the fungicide TAEGRO® or TAEGRO® ECO (EPA Registration No. 70127-5); and (B2) fungi, for example: (B2.1) *Coniothyrium minitans*, in particular strain CON/M/91-8 (Accession No. DSM-9660; e.g. Contans® from Bayer); (B2.2) *Metschnikowia fructicola*, in particular strain NRRL Y-30752 (e.g. Shemer®); (B2.3) *Microsphaeropsis ochracea* (e.g. Microx® from Prophyta); (B2.5) *Trichoderma* spp., including *Trichoderma atroviride*, strain SC1 described in International Application No. PCT/IT2008/000196); (B2.6) *Trichoderma harzianum rifai* strain KRL-AG2 (also known as strain T-22, /ATCC 208479, e.g. PLANTSHIELD T-22G, Rootshield®, and TurfShield from BioWorks, US); (B2.14) *Gliocladium roseum*, strain 321U from W.F. Stoneman Company LLC; (B2.35) *Talaromyces flavus*, strain V117b; (B2.36) *Trichoderma* asperellum, strain ICC 012 from Isagro; (B2.37) *Trichoderma* asperellum, strain SKT-1 (e.g. ECO-HOPE® from Kumiai Chemical Industry); (B2.38) *Trichoderma atroviride*, strain CNCM 1-1237 (e.g. Esquive® WP from Agrauxine, FR); (B2.39) *Trichoderma atroviride*, strain no. V08/002387; (B2.40) *Trichoderma atroviride*, strain NMI no. V08/002388; (B2.41) *Trichoderma atroviride*, strain NMI no. V08/002389; (B2.42) *Trichoderma atroviride*, strain NMI no. V08/002390; (B2.43) *Trichoderma atroviride*, strain LC52 (e.g. Tenet by Agrimm Technologies Limited); (B2.44) *Trichoderma atroviride*, strain ATCC 20476 (IMI 206040); (B2.45) *Trichoderma atroviride*, strain T11 (IMI352941/CECT20498); (B2.46) *Trichoderma harmatum*; (B2.47) *Trichoderma harzianum*; (B2.48) *Trichoderma harzianum rifai* T39 (e.g. Trichodex® from Makhteshim, US); (B2.49) *Trichoderma harzianum*, in particular, strain KD (e.g. Trichoplus from Biological Control Products, SA (acquired by Becker Underwood)); (B2.50) *Trichoderma harzianum*, strain ITEM 908 (e.g. Trianum-P from Koppert); (B2.51) *Trichoderma harzianum*, strain TH35 (e.g. Root-Pro by Mycontrol); (B2.52) *Trichoderma virens* (also known as *Gliocladium virens*), in particular strain GL-21 (e.g. SoilGard 12G by Certis, US); (B2.53) *Trichoderma viride*, strain TV1 (e.g. Trianum-P by Koppert); (B2.54) *Ampelomyces quisqualis*, in particular strain AQ 10 (e.g. AQ 10® by IntrachemBio Italia); (B2.56) *Aureobasidium pullulans*, in particular blastospores of strain DSM14940; (B2.57) *Aureobasidium pullulans*, in particular blastospores of strain DSM 14941; (B2.58) *Aureobasidium pullulans*, in particular mixtures of blastospores of strains DSM14940 and DSM 14941 (e.g. Botector® by bio-ferm, CH); (B2.64) *Cladosporium cladosporioides*, strain H39 (by Stichting Dienst Landbouwkundig Onderzoek); (B2.69) *Gliocladium catenulatum* (Synonym: *Clonostachys rosea* f *catenulate*) strain J1446 (e.g. Prestop® by AgBio Inc. and also e.g. Primastop® by Kemira Agro Oy); (B2.70) *Lecanicillium lecanii* (formerly known as *Verticillium lecanii*) conidia of strain KV01 (e.g. Vertalec® by Koppert/Arysta); (B2.71) *Penicillium vermiculatum*; (B2.72) *Pichia anomala*, strain WRL-076 (NRRL Y-30842); (B2.75) *Trichoderma atroviride*, strain SKT-1 (FERM P-16510); (B2.76) *Trichoderma atroviride*, strain SKT-2 (FERM P-16511); (B2.77) *Trichoderma atroviride*, strain SKT-3 (FERM P-17021); (B2.78) *Trichoderma gamsii* (formerly *T. viride*), strain ICC080 (IMI CC 392151 CABI, e.g. BioDerma by AGROBIOSOL DE MEXICO, S.A. DE C.V.); (B2.79) *Trichoderma harzianum*, strain DB 103 (e.g., T-Gro 7456 by Dagutat Biolab); (B2.80) *Trichoderma polysporum*, strain IMI 206039 (e.g. Binab TF WP by BINAB Bio-Innovation AB, Sweden); (B2.81) *Trichoderma stromaticum* (e.g. Tricovab by Ceplac, Brazil); (B2.83) *Ulocladium oudemansii*, in particular strain HRU3 (e.g. Botry-Zen® by Botry-Zen Ltd, NZ); (B2.84) *Verticillium albo-atrum* (formerly *V. dahliae*), strain WCS850 (CBS 276.92; e.g. Dutch Trig by Tree Care Innovations); (B2.86) *Verticillium chlamydosporium*; (B2.87) mixtures of *Trichoderma* asperellum strain ICC 012 and *Trichoderma gamsii* strain ICC 080 (product known as e.g. BIO-TAM™ from Bayer CropScience LP, US).

Further examples of biological control agents which may be combined with the compound combination of the invention are:

bacteria selected from the group consisting of *Bacillus cereus*, in particular *B. cereus* strain CNCM I-1562 and *Bacillus firmus*, strain 1-1582 (Accession number CNCM 1-1582), *Bacillus subtilis* strain OST 30002 (Accession No. NRRL B-50421), *Bacillus thuringiensis*, in particular *B. thuringiensis* subspecies *israelensis* (serotype H-14), strain AM65-52 (Accession No. ATCC 1276), *B. thuringiensis* subsp. *aizawai*, in particular strain ABTS-1857 (SD-1372), *B. thuringiensis* subsp. *kurstaki* strain HD-1, *B. thuringiensis* subsp. *tenebrionis* strain NB 176 (SD-5428), *Pasteuria penetrans, Pasteuria* spp. (*Rotylenchulus reniformis* nematode)-PR3 (Accession Number ATCC SD-5834), *Streptomyces microflavus* strain AQ6121 (=QRD 31.013, NRRL B-50550), and *Streptomyces galbus* strain AQ 6047 (Accession Number NRRL 30232);

fungi and yeasts selected from the group consisting of *Beauveria bassiana*, in particular strain ATCC 74040, *Lecanicillium* spp., in particular strain HRO LEC 12, Metarhizium anisopliae, in particular strain F52 (DSM3884 or ATCC 90448), *Paecilomyces fumosoroseus* (now: *Isaria fumosorosea*), in particular strain IFPC 200613, or strain Apopka 97 (Accession No. ATCC 20874), and *Paecilomyces lilacinus*, in particular *P. lilacinus* strain 251 (AGAL 89/030550);

viruses selected from the group consisting of *Adoxophyes orana* (summer fruit *tortrix*) granulosis virus (GV), *Cydia pomonella* (codling moth) granulosis virus (GV), *Helicoverpa armigera* (cotton bollworm) nuclear polyhedrosis virus (NPV), *Spodoptera exigua* (beet armyworm) mNPV, *Spodoptera frugiperda* (fall armyworm) mNPV, and *Spodoptera littoralis* (African cotton leafworm) NPV.

bacteria and fungi which can be added as 'inoculant' to plants or plant parts or plant organs and which, by virtue of their particular properties, promote plant growth and plant health. Examples are: *Agrobacterium* spp., *Azorhizobium caulinodans, Azospirillum* spp., *Azotobacter* spp., *Bradyrhizobium* spp., *Burkholderia* spp., in particular *Burkholderia cepacia* (formerly known as *Pseudomonas cepacia*), *Gigaspora* spp., or

*Gigaspora monosporum, Glomus* spp., *Laccaria* spp., *Lactobacillus buchneri, Paraglomus* spp., *Pisolithus tinctorus, Pseudomonas* spp., *Rhizobium* spp., in particular *Rhizobium trifolii, Rhizopogon* spp., *Scleroderma* spp., *Suillus* spp., and *Streptomyces* spp.

plant extracts and products formed by microorganisms including proteins and secondary metabolites which can be used as biological control agents, such as *Allium sativum, Artemisia absinthium*, azadirachtin, Biokeeper WP, *Cassia nigricans, Celastrus angulatus, Chenopodium anthelminticum*, chitin, Armour-Zen, *Dryopteris filix-mas, Equisetum arvense*, Fortune Aza, Fungastop, Heads Up (*Chenopodium quinoa* saponin extract), *Pyrethrum/Pyrethrins, Quassia amara, Quercus, Quillaja*, Regalia, "Requiem™ Insecticide", rotenone, ryania/ryanodine, *Symphytum officinale, Tanacetum vulgare*, thymol, Triact 70, TriCon, *Tropaeulum majus, Urtica dioica*, Veratrin, *Viscum album, Brassicaceae* extract, in particular oilseed rape powder or mustard powder a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$ (e.g. FLiPPER by AlphaBio Pesticides or Bayer AG).

Examples of insecticides, acaricides and nematicides, respectively, which could be mixed with the compound combination of the invention are:

(1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, such as, for example, cyclodiene-organochlorines, for example chlordane and endosulfan or phenylpyrazoles (fiproles), for example ethiprole and fipronil.

(3) Sodium channel modulators, such as, for example, pyrethroids, e.g. acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, *pyrethrins* (*pyrethrum*), resmethrin, silafluofen, tefluthrin, tetramethrin, tetramethrin [(1R)-isomer)], tralomethrin and transfluthrin or DDT or methoxychlor.

(4) Nicotinic acetylcholine receptor (nAChR) competitive modulators, such as, for example, neonicotinoids, e.g. acetamiprid, clothianidin, dinotefuran, imidacloprid, nitenpyram, thiacloprid and thiamethoxam or nicotine or sulfoxaflor or flupyradifurone.

(5) Nicotinic acetylcholine receptor (nAChR) allosteric modulators, such as, for example, spinosyns, e.g. spinetoram and spinosad.

(6) Glutamate-gated chloride channel (GluCl) allosteric modulators, such as, for example, avermectins/milbemycins, for example abamectin, emamectin benzoate, lepimectin and milbemectin.

(7) Juvenile hormone mimics, such as, for example, juvenile hormone analogues, e.g. hydroprene, kinoprene and methoprene or fenoxycarb or pyriproxyfen.

(8) Miscellaneous non-specific (multi-site) inhibitors, such as, for example, alkyl halides, e.g. methyl bromide and other alkyl halides; or chloropicrine or sulphuryl fluoride or borax or tartar emetic or methyl isocyanate generators, e.g. diazomet and metam.

(9) Modulators of Chordotonal Organs, such as, for example pymetrozine or flonicamid.

(10) Mite growth inhibitors, such as, for example clofentezine, hexythiazox and diflovidazin or etoxazole.

(11) Microbial disruptors of the insect gut membrane, such as, for example *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies *tenebrionis*, and B.t. plant proteins: Cry1Ab, Cry1Ac, Cry1Fa, Cry1A.105, Cry2Ab, Vip3A, mCry3A, Cry3Ab, Cry3Bb, Cry34Ab1/35Ab1.

(12) Inhibitors of mitochondrial ATP synthase, such as, ATP disruptors such as, for example, diafenthiuron or organotin compounds, for example azocyclotin, cyhexatin and fenbutatin oxide or propargite or tetradifon.

(13) Uncouplers of oxidative phosphorylation via disruption of the proton gradient, such as, for example, chlorfenapyr, DNOC and sulfluramid.

(14) Nicotinic acetylcholine receptor channel blockers, such as, for example, bensultap, cartap hydrochloride, thiocylam, and thiosultap-sodium.

(15) Inhibitors of chitin biosynthesis, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, for example buprofezin.

(17) Moulting disruptor (in particular for Diptera, i.e. dipterans), such as, for example, cyromazine.

(18) Ecdysone receptor agonists, such as, for example, chromafenozide, halofenozide, methoxyfenozide and tebufenozide.

(19) Octopamine receptor agonists, such as, for example, amitraz.

(20) Mitochondrial complex III electron transport inhibitors, such as, for example, hydramethylnone or acequinocyl or fluacrypyrim.

(21) Mitochondrial complex I electron transport inhibitors, such as, for example from the group of the METI acaricides, e.g. fenazaquin, fenpyroximate, pyrimidifen, pyridaben, tebufenpyrad and tolfenpyrad or rotenone (Derris).

(22) Voltage-dependent sodium channel blockers, such as, for example indoxacarb or metaflumizone.

(23) Inhibitors of acetyl CoA carboxylase, such as, for example, tetronic and tetramic acid derivatives, e.g. spirodiclofen, spiromesifen and spirotetramat.

(24) Mitochondrial complex IV electron transport inhibitors, such as, for example, phosphines, e.g. aluminium phosphide, calcium phosphide, phosphine and zinc phosphide or cyanides, e.g. calcium cyanide, potassium cyanide and sodium cyanide.

(25) Mitochondrial complex II electron transport inhibitors, such as, for example, beta-ketonitrile derivatives, e.g. cyenopyrafen and cyflumetofen and carboxanilides, such as, for example, pyflubumide.

(28) Ryanodine receptor modulators, such as, for example, diamides, e.g. chlorantraniliprole, cyantraniliprole and flubendiamide, further active compounds such as, for example, Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl) benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl) sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9); N-[4-chloro-2-[[(1,1-dimethylethyl) amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl) [4-[(trifluoromethyl)thio]phenyl]amino]carbonyl]-indeno[1,2-e][1,3,4]oxadiazine-4a(3H)-carboxylic acid methyl ester (known from CN 102391261 A) (CAS 1370358-69-2); 6-deoxy-3-O-ethyl-2,4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016005276 A1) (CAS 1689566-03-7), [N(Z)]—N-[1-[(6-chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS 1332838-17-1).

Examples of safeners which could be mixed with the compound combination of the invention are, for example, benoxacor, cloquintocet (-mexyl), cyometrinil, cyprosulfamide, dichlormid, fenchlorazole (-ethyl), fenclorim, flurazole, fluxofenim, furilazole, isoxadifen (-ethyl), mefenpyr (-diethyl), naphthalic anhydride, oxabetrinil, 2-methoxy-N-({4-[(methylcarbamoyl)amino]phenyl}-sulphonyl)benzamide (CAS 129531-12-0), 4-(dichloroacetyl)-1-oxa-4-azaspiro[4.5]decane (CAS 71526-07-3), 2,2,5-trimethyl-3-(dichloroacetyl)-1,3-oxazolidine (CAS 52836-31-4).

Examples of herbicides which could be mixed with the compound combination of the invention are:

Acetochlor, acifluorfen, acifluorfen-sodium, aclonifen, alachlor, allidochlor, alloxydim, alloxydim-sodium, ametryn, amicarbazone, amidochlor, amidosulfuron, 4-amino-3-chloro-5-fluoro-6-(7-fluoro-1H-indol-6-yl)pyridine-2-carboxylic acid, aminocyclopyrachlor, aminocyclopyrachlor-potassium, aminocyclo-pyrachlor-methyl, aminopyralid, amitrole, ammoniumsulfamate, anilofos, asulam, atrazine, azafenidin, azimsulfuron, beflubutamid, benazolin, benazolin-ethyl, benfluralin, benfuresate, bensulfuron, bensulfuron-methyl, bensulide, bentazone, benzobicyclon, benzofenap, bicyclopyron, bifenox, bilanafos, bilanafos-sodium, bispyribac, bispyribac-sodium, bixlozone, bromacil, bromobutide, bromofenoxim, bromoxynil, bromoxynil-butyrate, -potassium, -heptanoate, and -octanoate, busoxinone, butachlor, butafenacil, butamifos, butenachlor, butralin, butroxydim, butylate, cafenstrole, carbetamide, carfentrazone, carfentrazone-ethyl, chloramben, chlorbromuron, 1-{2-chloro-3-[(3-cyclopropyl-5-hydroxy-1-methyl-1H-pyrazol-4-yl)carbonyl]-6-(trifluormethyl)phenyl}piperidin-2-on, 4-{2-chloro-3-[(3,5-dimethyl-1H-pyrazol-1-yl)methyl]-4-(methylsulfonyl)benzoyl}-1,3-dimethyl-1H-pyrazol-5-yl-1,3-dimethyl-1H-pyrazol-4-carboxylat, chlorfenac, chlorfenac-sodium, chlorfenprop, chlorflurenol, chlorflurenol-methyl, chloridazon, chlorimuron, chlorimuron-ethyl, 2-[2-chloro-4-(methylsulfonyl)-3-(morpholin-4ylmethyl)benzoyl}-3-hydroxycyclohex-2-en-1-on, 4-{2-chloro-4-(methylsulfonyl)-3-[(2,2,2-trifluorethoxy)methyl]benzoyl}-1-ethyl-1H-pyrazol-5-yl-1,3-dimethyl-1H,pyrazol-4-carboxylat, chlorophthalim, chlorotoluron, chlorthal-dimethyl, 3-[5-chloro-4-(trifluormethyl)pyridine-2-yl]-4-hydroxy-1-methylimidazolidine-2-on, chlorsulfuron, cinidon, cinidon-ethyl, cinmethylin, cinosulfuron, clacyfos, clethodim, clodinafop, clodinafop-propargyl, clomazone, clomeprop, clopyralid, cloransulam, cloransulam-methyl, cumyluron, cyanamide, cyanazine, cycloate, cyclopyranil, cyclopyrimorate, cyclosulfamuron, cycloxydim, cyhalofop, cyhalofop-butyl, cyprazine, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, 2,4-DB, 2,4-DB-butyl, -dimethylammonium, -isooctyl, -potassium, and -sodium, daimuron (dymron), dalapon, dazomet, n-decanol, desmedipham, detosyl-pyrazolate (DTP), dicamba, dichlobenil, 2-(2,4-dichlorobenzyl)-4,4-dimethyl-1,2-oxazolidin-3-one, 2-(2,5-dichlorobenzyl)-4,4-dimethyl-1,2-oxazolidin-3-one, dichlorprop, dichlorprop-P, diclofop, diclofop-methyl, diclofop-P-methyl, diclosulam, difenzoquat, diflufenican, diflufenzopyr, diflufenzopyr-sodium, dimefuron, dimepiperate, dimethachlor, dimethametryn, dimethenamid, dimethenamid-P, 3-(2,6-dimethylphenyl)-6-[(2-hydroxy-6-oxocyclohex-1-en-1-yl)carbonyl]-1-methylchinazolin-2,4(1H,3H)-dion, 1,3-dimethyl-4-[2-(methylsulfonyl)-4-(trifluormethyl)benzoyl]-1H-pyrazol-5-yl-1,3-dimethyl-1H-pyrazol-4-carboxylat, dimetrasulfuron, dinitramine, dinoterb, diphenamid, diquat, diquat-dibromid, dithiopyr, diuron, DMPA, DNOC, endothal, EPTC, esprocarb, ethalfluralin, ethametsulfuron, ethametsulfuron-methyl, ethiozin, ethofumesate, ethoxyfen, ethoxyfen-ethyl, ethoxysulfuron, etobenzanid, ethyl-[(3-{2-chloro-4-fluoro-5-[3-methyl-2,6-dioxo-4-(trifluormethyl)-3,6-dihydropyrimidin-1(2H)-yl]phenoxy}pyridine-2-yl)oxy]acetat, F-9960, F-5231, i.e. N-{2-chloro-4-fluoro-5-[4-(3-fluoropropyl)-5-oxo-4,5-dihydro-1H-tetrazol-1-yl]phenyl}ethanesulfonamide, F-7967, i. e. 3-[7-chloro-5-fluoro-2-(trifluoromethyl)-1H-benzimidazol-4-yl]-1-methyl-6-(trifluoromethyl)pyrimidine-2,4(1H,3H)-dione, fenoxaprop, fenoxaprop-P, fenoxaprop-ethyl, fenoxaprop-P-ethyl, fenoxasulfone, fenquinotrione, fentrazamide, flamprop, flamprop-M-isopropyl, flamprop-M-methyl, flazasulfuron, florasulam, fluazifop, fluazifop-P, fluazifop-butyl, fluazifop-P-butyl, flucarbazone, flucarbazone-sodium, flucetosulfuron, fluchloralin, flufenacet, flufenpyr, flufenpyr-ethyl, flumetsulam, flumiclorac, flumiclorac-pentyl, flumioxazin, fluometuron, flurenol, flurenol-butyl, -dimethylammonium and -methyl, fluoroglycofen, fluoroglycofen-ethyl, flupropanate, flupyrsulfuron, flupyrsulfuron-methyl-sodium, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P-sodium, glufosinate-P-ammonium, glufosinate-P-sodium, glyphosate, glyphosate-ammonium, -isopropylammonium, -diammonium, -dimethylammonium, -potassium, -sodium, and -trimesium, H-9201, i.e. O-(2,4-dimethyl-6-nitrophenyl)O-ethyl isopropylphosphoramidothioate, halauxifen, halauxifen-methyl, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P- methyl, hexazinone, HW-02, i.e. 1-(dimethoxyphosphoryl) ethyl-(2,4-dichlorophenoxy)acetate, 4-hydroxy-1-methoxy-5-methyl-3-[4-trifluormethyl)pyridine-2-yl]imidazolidine-2-on, 4-hydroxy-1-methyl-3-[4-trifluormethyl)pyridine-2-yl]imidazolidine-2-on, (5-hydroxy-1-methyl-1H-pyrazol-4-yl)(3,3,4-trimethyl-1,1-dioxido-2,3-dihydro-1-benzothiophen-5-yl)methanon, 6-[(2-hydroxy-6-oxocyclohex-1-en-1-yl)carbonyl]-1,5-dimethyl-3-(2-methylphenyl)chinazolin-2,4(1H,3H)-dion, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-immonium, imazosulfuron, indanofan, indaziflam, iodosulfuron, iodosulfuron-methyl-sodium, ioxynil, ioxynil-octanoate, -potassium and -sodium, ipfencarbazone, isoproturon, isouron, isoxaben, isoxaflutole, karbutilate, KUH-043, i.e. 3-({[5-(difluoromethyl)-1-methyl-3-(trifluoromethyl)-1H-pyrazol-4-yl]methyl}sulfonyl)-5,5-dimethyl-4,5-dihydro-1,2-oxazole, ketospiradox, lactofen, lenacil, linuron, MCPA, MCPA-butotyl, -dimethylammonium, -2-ethylhexyl, -isopropylammonium, -potassium, and -sodium, MCPB, MCPB-methyl, -ethyl, and -sodium, mecoprop, mecoprop-sodium, and -butotyl, mecoprop-P, mecoprop-P-butotyl, -dimethylammonium, -2-ethylhexyl, and -potassium, mefenacet, mefluidide, mesosulfuron, mesosulfuron-methyl, mesotrione, methabenzthiazuron, metam, metamifop, metamitron, metazachlor, metazosulfuron, methabenzthiazuron, methiopyrsulfuron, methiozolin, 2-({2-[(2-methoxyethoxy) methyl]-6-(trifluormethyl)pyridine-3-yl}carbonyl)cyclohexan-1,3-dion, methyl isothiocyanate, 1-methyl-4-[(3,3,4-trimethyl-1,1-dioxido-2,3-dihydro-1-benzothiophen-5-yl) carbonyl]-1H-pyrazol-5-ylpropan-1-sulfonat, metobromuron, metolachlor, S-metolachlor, metosulam, metoxuron, metribuzin, metsulfuron, metsulfuron-methyl, molinat, monolinuron, monosulfuron, monosulfuron-ester, MT-5950, i.e. N-(3-chloro-4-isopropylphenyl)-2-methylpentan amide, NGGC-011, napropamide, NC-310, i.e. [5-(benzyloxy)-1-methyl-1H-pyrazol-4-yl](2,4-dichlorophenyl)methanone, neburon, nicosulfuron, nonanoic acid (pelargonic acid), norflurazon, oleic acid (fatty acids), orbencarb, orthosulfamuron, oryzalin, oxadiargyl, oxadiazon, oxasulfuron, oxaziclomefon, oxyfluorfen, paraquat, paraquat dichloride, pebulate, pendimethalin, penoxsulam, pentachlorphenol, pentoxazone, pethoxamid, petroleum oils, phenmedipham, picloram, picolinafen, pinoxaden, piperophos, pretilachlor, primisulfuron, primisulfuron-methyl, prodiamine, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, QYM-201, QYR-301, rimsulfuron, saflufenacil, sethoxydim, siduron, simazine, simetryn, SL-261, sulcotrion, sulfentrazone, sulfometuron, sulfometuron-methyl, sulfosulfuron, SYN-523, SYP-249, i.e. 1-ethoxy-3-methyl-1-oxobut-3-en-2-yl 5-[2-chloro-4-(trifluoromethyl)phenoxy]-2-nitrobenzoate, SYP-300, i.e. 1-[7-fluoro-3-oxo-4-(prop-2-yn-1-yl)-3,4-dihydro-2H-1,4-benzoxazin-6-yl]-3-propyl-2-thioxoimidazolidine-4,5-dione, 2,3,6-TBA, TCA (trichloroacetic acid), TCA-sodium, tebuthiuron, tefuryltrione, tembotrione, tepraloxydim, terbacil, terbucarb, terbumeton, terbuthylazin, terbutryn, tetflupyrolimet, thenylchlor, thiazopyr, thiencarbazone, thiencarbazone-methyl, thifensulfuron, thifensulfuron-methyl, thiobencarb, tiafenacil, tolpyralate, topra-mezone, tralkoxydim, triafamone, tri-allate, triasulfuron, triaziflam, tribenuron, tribenuron-methyl, triclopyr, trietazine, trifloxysulfuron, trifloxysulfuron-sodium, trifludimoxazin, trifluralin, triflusulfuron, triflusulfuron-methyl, tritosulfuron, urea sulfate, vernolate, XDE-848, ZJ-0862, i.e. 3,4-dichloro-N-{2-[(4,6-dimethoxypyrimidin-2-yl)oxy]benzyl}aniline.

Examples for plant growth regulators are:

Acibenzolar, acibenzolar-S-methyl, 5-aminolevulinic acid, ancymidol, 6-benzylaminopurine, Brassinolid, catechine, chlormequat chloride, cloprop, cyclanilide, 3-(cycloprop-1-enyl) propionic acid, daminozide, dazomet, n-decanol, dikegulac, dikegulac-sodium, endothal, endothal-dipotassium, -disodium, and -mono(N,N-dimethylalkylammonium), ethephon, flumetralin, flurenol, flurenol-butyl, flurprimidol, forchlorfenuron, gibberellic acid, inabenfide, indol-3-acetic acid (IAA), 4-indol-3-ylbutyric acid, isoprothiolane, probenazole, jasmonic acid, maleic hydrazide, mepiquat chloride, 1-methylcyclopropene, methyl jasmonate, 2-(1-naphthyl)acetamide, 1-naphthylacetic acid, 2-naphthyloxyacetic acid, nitrophenolate-mixture, paclobutrazol, N-(2-phenylethyl)-beta-alanine, N-phenylphthalamic acid, prohexadione, prohexadione-calcium, prohydrojasmone, salicylic acid, strigolactone, tecnazene, thidiazuron, triacontanol, trinexapac, trinexapac-ethyl, tsitodef, uniconazole, uniconazole-P.

Methods and Uses

The compound combination and the composition of the invention have potent microbicidal activity and/or plant defense modulating potential. They can be used for controlling unwanted microorganisms, such as unwanted fungi and bacteria, on plants. They can be particularly useful in crop protection (they control microorganisms that cause plants diseases) or for protecting materials (e.g. industrial materials, timber, storage goods) as described in more details herein below. More specifically, compound combination and the composition of the invention can be used to protect seeds, germinating seeds, emerged seedlings, plants, plant parts, fruits, harvest goods and/or the soil in which the plants grow from unwanted microorganisms.

Control or controlling as used herein encompasses protective, curative and eradicative treatment of unwanted microorganisms. Unwanted microorganisms may be pathogenic bacteria, pathogenic virus, pathogenic oomycetes or pathogenic fungi, more specifically phytopathogenic bacteria, phytopathogenic virus, phytopathogenic oomycetes or phytopathogenic fungi. As detailed herein below, these phytopathogenic microorganisms are the causal agents of a broad spectrum of plants diseases.

More specifically, the compound combination and the composition of the invention can be used as fungicides. For the purpose of the specification, the term “fungicide” refers to a compound or composition that can be used in crop protection for the control of unwanted fungi, such as Plasmodiophoromycetes, Chytridiomycetes, Zygomycetes, Ascomycetes, Basidiomycetes and Deuteromycetes and/or for the control of Oomycetes.

The compound combination and the composition of the invention may also be used as antibacterial agent. In particular, they may be used in crop protection, for example for the control of unwanted bacteria, such as Pseudomonadaceae, Rhizobiaceae, Xanthomonadaceae, Enterobacteriaceae, Corynebacteriaceae and Streptomycetaceae.

The present invention also relates to a method for controlling unwanted microorganisms, such as unwanted fungi, oomycetes and bacteria, on plants comprising the step of applying the compound combination or the composition of the invention to the microorganisms and/or their habitat (to the plants, plant parts, seeds, fruits or to the soil in which the plants grow), wherein the compounds (A) and (B) may be applied in a simultaneous, separate or sequential manner. If the single compounds are applied in a sequential manner, i.e. at different times, they are applied one after the other within a reasonably short period, such as a few hours or days.

Typically, when the compound combination and the composition of the invention are used in curative or protective methods for controlling phytopathogenic fungi and/or phytopathogenic oomycetes, an effective and plant-compatible amount thereof is applied to the plants, plant parts, fruits, seeds or to the soil or substrates in which the plants grow. Suitable substrates that may be used for cultivating plants include inorganic based substrates, such as mineral wool, in particular stone wool, perlite, sand or gravel; organic substrates, such as peat, pine bark or sawdust; and petroleum based substrates such as polymeric foams or plastic beads. Effective and plant-compatible amount means an amount that is sufficient to control or destroy the fungi present or liable to appear on the cropland and that does not entail any appreciable symptom of phytotoxicity for said crops. Such an amount can vary within a wide range depending on the fungus to be controlled, the type of crop, the crop growth stage, the climatic conditions and the respective compound or composition of the invention used. This amount can be determined by systematic field trials that are within the capabilities of a person skilled in the art.

Plants and Plant Parts

The compound combination and the composition of the invention may be applied to any plants or plant parts.

Plants mean all plants and plant populations, such as desired and undesired wild plants or crop plants (including naturally occurring crop plants). Crop plants may be plants which can be obtained by conventional breeding and optimization methods or by biotechnological and genetic engineering methods or combinations of these methods, including the genetically modified plants (GMO or transgenic plants) and the plant cultivars which are protectable and non-protectable by plant breeders' rights.

Genetically Modified Plants (GMO)

Genetically modified plants (GMO or transgenic plants) are plants in which a heterologous gene has been stably integrated into the genome. The expression "heterologous gene" essentially means a gene which is provided or assembled outside the plant and when introduced in the nuclear, chloroplastic or mitochondrial genome. This gene gives the transformed plant new or improved agronomic or other properties by expressing a protein or polypeptide of interest or by downregulating or silencing other gene(s) which are present in the plant (using for example, antisense technology, cosuppression technology, RNA interference—RNAi—technology or microRNA—miRNA—technology). A heterologous gene that is located in the genome is also called a transgene. A transgene that is defined by its particular location in the plant genome is called a transformation or transgenic event.

Plant cultivars are understood to mean plants which have new properties ("traits") and have been obtained by conventional breeding, by mutagenesis or by recombinant DNA techniques. They can be cultivars, varieties, bio- or genotypes.

Plant parts are understood to mean all parts and organs of plants above and below the ground, such as shoots, leaves, needles, stalks, stems, flowers, fruit bodies, fruits, seeds, roots, tubers and rhizomes. The plant parts also include harvested material and vegetative and generative propagation material, for example cuttings, tubers, rhizomes, slips and seeds.

Plants which may be treated in accordance with the methods of the invention include the following: cotton, flax, grapevine, fruit, vegetables, such as Rosaceae sp. (for example pome fruits such as apples and pears, but also stone fruits such as apricots, cherries, almonds and peaches, and soft fruits such as strawberries), *Ribesioidae* sp., *Juglandaceae* sp., *Betulaceae* sp., *Anacardiaceae* sp., *Fagaceae* sp., *Moraceae* sp., *Oleaceae* sp., *Actinidaceae* sp., *Lauraceae* sp., *Musaceae* sp. (for example banana trees and plantations), *Rubiaceae* sp. (for example coffee), *Theaceae* sp., *Sterculiceae* sp., *Rutaceae* sp. (for example lemons, oranges and grapefruit); *Solanaceae* sp. (for example tomatoes), *Liliaceae* sp., *Asteraceae* sp. (for example lettuce), *Umbelliferae* sp., *Cruciferae* sp., *Chenopodiaceae* sp., *Cucurbitaceae* sp. (for example cucumber), *Alliaceae* sp. (for example leek, onion), *Papilionaceae* sp. (for example peas); major crop plants, such as *Gramineae* sp. (for example maize, turf, cereals such as wheat, rye, rice, barley, oats, millet and triticale), *Asteraceae* sp. (for example sunflower), *Brassicaceae* sp. (for example white cabbage, red cabbage, broccoli, cauliflower, Brussels sprouts, pak choi, kohlrabi, radishes, and oilseed rape, mustard, horseradish and cress), *Fabacae* sp. (for example bean, peanuts), *Papilionaceae* sp. (for example soya bean), *Solanaceae* sp. (for example potatoes), *Chenopodiaceae* sp. (for example sugar beet, fodder beet, swiss chard, beetroot); useful plants and ornamental plants for gardens and wooded areas; and genetically modified varieties of each of these plants.

Plants and plant cultivars which may be treated by the above disclosed methods include plants and plant cultivars which are resistant against one or more biotic stresses, i.e. said plants show a better defense against animal and microbial pests, such as against nematodes, insects, mites, phytopathogenic fungi, bacteria, viruses and/or viroids.

Plants and plant cultivars which may be treated by the above disclosed methods include those plants which are resistant to one or more abiotic stresses. Abiotic stress conditions may include, for example, drought, cold temperature exposure, heat exposure, osmotic stress, flooding, increased soil salinity, increased mineral exposure, ozone exposure, high light exposure, limited availability of nitrogen nutrients, limited availability of phosphorus nutrients, shade avoidance.

Plants and plant cultivars which may be treated by the above disclosed methods include those plants characterized by enhanced yield characteristics. Increased yield in said plants may be the result of, for example, improved plant physiology, growth and development, such as water use efficiency, water retention efficiency, improved nitrogen use, enhanced carbon assimilation, improved photosynthesis, increased germination efficiency and accelerated maturation. Yield may furthermore be affected by improved plant architecture (under stress and non-stress conditions), including but not limited to, early flowering, flowering control for hybrid seed production, seedling vigor, plant size, internode number and distance, root growth, seed size, fruit size, pod size, pod or ear number, seed number per pod or ear, seed mass, enhanced seed filling, reduced seed dispersal, reduced pod dehiscence and lodging resistance. Further yield traits include seed composition, such as carbohydrate content and composition for example cotton or starch, protein content, oil content and composition, nutritional value, reduction in anti-nutritional compounds, improved processability and better storage stability.

Plants and plant cultivars which may be treated by the above disclosed methods include plants and plant cultivars which are hybrid plants that already express the characteristic of heterosis or hybrid vigor which results in generally higher yield, vigor, health and resistance towards biotic and abiotic stresses.

Plants and plant cultivars (obtained by plant biotechnology methods such as genetic engineering) which may be treated by the above disclosed methods include plants and plant cultivars which are herbicide-tolerant plants, i.e. plants made tolerant to one or more given herbicides. Such plants can be obtained either by genetic transformation, or by selection of plants containing a mutation imparting such herbicide tolerance.

Plants and plant cultivars (obtained by plant biotechnology methods such as genetic engineering) which may be treated by the above disclosed methods include plants and plant cultivars which are insect-resistant transgenic plants, i.e. plants made resistant to attack by certain target insects. Such plants can be obtained by genetic transformation, or by selection of plants containing a mutation imparting such insect resistance.

Plants and plant cultivars (obtained by plant biotechnology methods such as genetic engineering) which may be treated by the above disclosed methods include plants and plant cultivars which are disease-resistant transgenic plants, i.e. plants made resistant to attack by certain target insects. Such plants can be obtained by genetic transformation, or by selection of plants containing a mutation imparting such insect resistance.

Plants and plant cultivars (obtained by plant biotechnology methods such as genetic engineering) which may be treated by the above disclosed methods include plants and plant cultivars which are tolerant to abiotic stresses. Such plants can be obtained by genetic transformation, or by selection of plants containing a mutation imparting such stress resistance.

Plants and plant cultivars (obtained by plant biotechnology methods such as genetic engineering) which may be treated by the above disclosed methods include plants and plant cultivars which show altered quantity, quality and/or storage-stability of the harvested product and/or altered properties of specific ingredients of the harvested product.

Plants and plant cultivars (obtained by plant biotechnology methods such as genetic engineering) which may be treated by the above disclosed methods include plants and plant cultivars, such as cotton plants, with altered fiber characteristics. Such plants can be obtained by genetic transformation, or by selection of plants contain a mutation imparting such altered fiber characteristics.

Plants and plant cultivars (obtained by plant biotechnology methods such as genetic engineering) which may be treated by the above disclosed methods include plants and plant cultivars, such as oilseed rape or related *Brassica* plants, with altered oil profile characteristics. Such plants can be obtained by genetic transformation, or by selection of plants contain a mutation imparting such altered oil profile characteristics.

Plants and plant cultivars (obtained by plant biotechnology methods such as genetic engineering) which may be treated by the above disclosed methods include plants and plant cultivars, such as oilseed rape or related *Brassica* plants, with altered seed shattering characteristics. Such plants can be obtained by genetic transformation, or by selection of plants contain a mutation imparting such altered seed shattering characteristics and include plants such as oilseed rape plants with delayed or reduced seed shattering.

Plants and plant cultivars (obtained by plant biotechnology methods such as genetic engineering) which may be treated by the above disclosed methods include plants and plant cultivars, such as Tobacco plants, with altered post-translational protein modification patterns.

Pathogens

Non-limiting examples of pathogens of fungal diseases which may be treated in accordance with the invention include:

- diseases caused by powdery mildew pathogens, for example *Blumeria* species, for example *Blumeria graminis; Podosphaera* species, for example *Podosphaera leucotricha; Sphaerotheca* species, for example *Sphaerotheca fuliginea; Uncinula* species, for example *Uncinula necator;*
- diseases caused by rust disease pathogens, for example *Gymnosporangium* species, for example *Gymnosporangium sabinae; Hemileia* species, for example *Hemileia vastatrix; Phakopsora* species, for example *Phakopsora pachyrhizi* or *Phakopsora meibomiae; Puccinia* species, for example *Puccinia recondita, Puccinia graminis* oder *Puccinia striiformis; Uromyces* species, for example *Uromyces appendiculatus;*
- diseases caused by pathogens from the group of the Oomycetes, for example Albugo species, for example Albugo *candida; Bremia* species, for example *Bremia lactucae; Peronospora* species, for example *Peronospora pisi* or *P. brassicae; Phytophthora* species, for example *Phytophthora infestans; Plasmopara* species, for example *Plasmopara viticola; Pseudoperonospora* species, for example *Pseudoperonospora humuli* or *Pseudoperonospora cubensis; Pythium* species, for example *Pythium ultimum;*
- leaf blotch diseases and leaf wilt diseases caused, for example, by *Alternaria* species, for example *Alternaria solani* and *Alternaria* alternate; *Cercospora* species, for example *Cercospora beticola; Cladiosporium* species, for example *Cladiosporium cucumerinum; Cochliobolus* species, for example *Cochliobolus sativus* (conidial form: *Drechslera*, syn: *Helminthosporium*) or *Cochliobolus miyabeanus; Colletotrichum* species, for example *Colletotrichum lindemuthanium; Cordana* species, for example *Cordana musae; Corynespora* species, for example *Corynespora cassiicola; Cycloconium* species, for example *Cycloconium oleaginum; Diaporthe* species, for example *Diaporthe citri; Elsinoe* species, for example *Elsinoe fawcettii; Gloeosporium* species, for example *Gloeosporium laeticolor; Glomerella* species, for example *Glomerella cingulata; Guignardia* species, for example *Guignardia bidwelli; Leptosphaeria* species, for example *Leptosphaeria maculans; Magnaporthe* species, for example *Magnaporthe grisea; Microdochium* species, for example *Microdochium nivale; Mycosphaerella* species, for example *Mycosphaerella graminicola, Mycosphaerella arachidicola* or *Mycosphaerella fijiensis; Parastagonospora* species, for example *Parastagonospora nodorum; Phaeosphaeria* species, for example *Phaeosphaeria nodorum; Pyrenophora* species, for example *Pyrenophora teres* or *Pyrenophora tritici repentis;*

*Ramularia* species, for example *Ramularia collo-cygni* or *Ramularia areola; Rhynchosporium* species, for example *Rhynchosporium secalis; Septoria* species, for example *Septoria apii* or *Septoria lycopersici; Stagonospora* species, for example *Stagonospora nodorum; Typhula* species, for example *Typhula incarnata; Ustilago* species, for example *Ustilago segetum; Venturia* species, for example *Venturia inaequalis;* root and stem diseases caused, for example, by *Corticium* species, for example *Corticium graminearum; Fusarium* species, for example *Fusarium oxysporum; Gaeumannomyces* species, for example *Gaeumannomyces graminis; Plasmodiophora* species, for example *Plasmodiophora brassicae; Rhizoctonia* species, for example *Rhizoctonia solani; Sarocladium* species, for example *Sarocladium oryzae; Sclerotium* species, for example *Sclerotium oryzae; Tapesia* species, for example *Tapesia acuformis; Thielaviopsis* species, for example *Thielaviopsis basicola;* ear and panicle diseases (including corn cobs) caused, for example, by *Alternaria* species, for example *Alternaria* spp.; *Aspergillus* species, for example *Aspergillus flavus; Cladosporium* species, for example *Cladosporium cladosporioides; Claviceps* species, for example *Claviceps purpurea; Fusarium* species, for example *Fusarium culmorum; Gibberella* species, for example *Gibberella zeae; Monographella* species, for example *Monographella nivalis; Stagnospora* species, for example *Stagnospora nodorum;* diseases caused by smut fungi, for example *Sphacelotheca* species, for example *Sphacelotheca reiliana; Tilletia* species, for example *Tilletia caries* or *Tilletia controversa; Urocystis* species, for example *Urocystis occulta; Ustilago* species, for example *Ustilago nuda;* fruit rot caused, for example, by *Aspergillus* species, for example *Aspergillus flavus; Botrytis* species, for example *Botrytis cinerea; Monilinia* species, for example *Monilinia laxa; Penicillium* species, for example *Penicillium expansum* or *Penicillium purpurogenum; Rhizopus* species, for example *Rhizopus stolonifer; Sclerotinia* species, for example *Sclerotinia sclerotiorum; Verticilium* species, for example *Verticilium alboatrum;* seed- and soil-borne rot and wilt diseases, and also diseases of seedlings, caused, for example, by *Alternaria* species, for example *Alternaria brassicicola; Aphanomyces* species, for example *Aphanomyces euteiches; Ascochyta* species, for example *Ascochyta lentis; Aspergillus* species, for example *Aspergillus flavus; Cladosporium* species, for example *Cladosporium herbarum; Cochliobolus* species, for example *Cochliobolus sativus* (conidial form: *Drechslera, Bipolaris* Syn: *Helminthosporium*); *Colletotrichum* species, for example *Colletotrichum coccodes; Fusarium* species, for example *Fusarium culmorum; Gibberella* species, for example *Gibberella zeae; Macrophomina* species, for example *Macrophomina phaseolina; Microdochium* species, for example *Microdochium nivale; Monographella* species, for example *Monographella nivalis; Penicillium* species, for example *Penicillium expansum; Phoma* species, for example *Phoma lingam; Phomopsis* species, for example *Phomopsis sojae; Phytophthora* species, for example *Phytophthora cactorum; Pyrenophora* species, for example *Pyrenophora graminea; Pyricularia* species, for example *Pyricularia oryzae; Pythium* species, for example *Pythium ultimum; Rhizoctonia* species, for example *Rhizoctonia solani; Rhizopus* species, for example *Rhizopus oryzae; Sclerotium* species, for example *Sclerotium rolfsii; Septoria* species, for example *Septoria nodorum; Typhula* species, for example *Typhula incarnata; Verticillium* species, for example *Verticillium dahliae;* cancers, galls and witches' broom caused, for example, by *Nectria* species, for example *Nectria galligena;* wilt diseases caused, for example, by *Verticillium* species, for example *Verticillium longisporum; Fusarium* species, for example *Fusarium oxysporum;* deformations of leaves, flowers and fruits caused, for example, by *Exobasidium* species, for example *Exobasidium vexans; Taphrina* species, for example *Taphrina deformans;* degenerative diseases in woody plants, caused, for example, by *Esca* species, for example *Phaeomoniella chlamydospora, Phaeoacremonium aleophilum* or *Fomitiporia mediterranea; Ganoderma* species, for example *Ganoderma boninense;* diseases of plant tubers caused, for example, by *Rhizoctonia* species, for example *Rhizoctonia solani; Helminthosporium* species, for example *Helminthosporium solani;* diseases caused by bacterial pathogens, for example *Xanthomonas* species, for example *Xanthomonas campestris* pv. *oryzae; Pseudomonas* species, for example *Pseudomonas syringae* pv. *lachrymans; Erwinia* species, for example *Erwinia amylovora; Liberibacter* species, for example *Liberibacter asiaticus; Xyella* species, for example *Xylella fastidiosa; Ralstonia* species, for example *Ralstonia solanacearum; Dickeya* species, for example *Dickeya solani; Clavibacter* species, for example *Clavibacter michiganensis; Streptomyces* species, for example *Streptomyces* scabies.

diseases of soya beans:

Fungal diseases on leaves, stems, pods and seeds caused, for example, by *Alternaria* leaf spot (*Alternaria* spec. *atrans tenuissima*), *Anthracnose* (*Colletotrichum gloeosporoides dematium* var. *truncatum*), brown spot (*Septoria glycines*), *cercospora* leaf spot and blight (*Cercospora kikuchii*), *choanephora* leaf blight (*Choanephora infundibulifera trispora* (Syn.)), *dactuliophora* leaf spot (*Dactuliophora glycines*), downy mildew (*Peronospora manshurica*), *drechslera* blight (*Drechslera glycini*), frogeye leaf spot (*Cercospora* sojina), *leptosphaerulina* leaf spot (*Leptosphaerulina trifolii*), *phyllostica* leaf spot (*Phyllosticta sojaecola*), pod and stem blight (*Phomopsis sojae*), powdery mildew (*Microsphaera diffusa*), *pyrenochaeta* leaf spot (*Pyrenochaeta glycines*), *rhizoctonia* aerial, foliage, and web blight (*Rhizoctonia solani*), rust (*Phakopsora pachyrhizi, Phakopsora meibomiae*), scab (*Sphaceloma glycines*), *stemphylium* leaf blight (*Stemphylium botryosum*), sudden death syndrome (*Fusarium virguliforme*), target spot (*Corynespora cassiicola*).

Fungal diseases on roots and the stem base caused, for example, by black root rot (*Calonectria crotalariae*), charcoal rot (*Macrophomina phaseolina*), *fusarium* blight or wilt, root rot, and pod and collar rot (*Fusarium oxysporum, Fusarium orthoceras, Fusarium semitectum, Fusarium eauiseti*), *mycoleptodiscus* root rot (*Mycoleptodiscus terrestris*), *neocosmospora* (*Neocosmospora vasinfecta*), pod and stem blight (*Diaporthe phaseolorum*), stem canker (*Diaporthe phaseolorum* var. *caulivora*), *phytophthora* rot (*Phytophthora megasperma*), brown stem rot (*Phialophora gregata*), *pythium* rot (*Pythium aphanidermatum, Pythium irregulare, Pythium debaryanum, Pythium myriotylum,*

*Pythium ultimum*), *rhizoctonia* root rot, stem decay, and damping-off (*Rhizoctonia solani*), *sclerotinia* stem decay (*Sclerotinia sclerotiorum*), *sclerotinia* southern blight (*Sclerotinia rolfsii*), *thielaviopsis* root rot (*Thielaviopsis basicola*).

Mycotoxins

In addition, the compound combination and the composition of the invention may reduce the mycotoxin content in the harvested material and the foods and feeds prepared therefrom. Mycotoxins include particularly, but not exclusively, the following: deoxynivalenol (DON), nivalenol, 15-Ac-DON, 3-Ac-DON, T2- and HT2-toxin, fumonisins, zearalenon, moniliformin, fusarin, diaceotoxyscirpenol (DAS), beauvericin, enniatin, fusaroproliferin, fusarenol, ochratoxins, patulin, ergot alkaloids and aflatoxins which can be produced, for example, by the following fungi: *Fusarium* spec., such as *F. acuminatum, F. asiaticum, F. avenaceum, F. crookwellense, F. culmorum, F. graminearum* (*Gibberella zeae*), *F. equiseti, F. fujikoroi, F. musarum, F. oxysporum, F. proliferatum, F. poae, F. pseudograminearum, F. sambucinum, F. scirpi, F. semitectum, F. solani, F. sporotrichoides, F. langsethiae, F. subglutinans, F. tricinctum, F. verticillioides*, and also by *Aspergillus* spec., such as *A. flavus, A. parasiticus, A. nomius, A. ochraceus, A. clavatus, A. terreus, A. versicolor, Penicillium* spec., such as *P. verrucosum, P. viridicatum, P. citrinum, P. expansum, P. claviforme, P. roqueforti, Claviceps* spec., such as *C. purpurea, C. fusiformis, C. paspali, C. africana, Stachybotrys* spec. and others.

Material Protection

The compound combination and the composition of the invention may also be used in the protection of materials, especially for the protection of industrial materials against attack and destruction by phytopathogenic fungi.

In addition, the compound combination and the composition of the invention may be used as antifouling compositions, alone or in combinations with other active ingredients.

Industrial materials in the present context are understood to mean inanimate materials which have been prepared for use in industry. For example, industrial materials which are to be protected from microbial alteration or destruction may be adhesives, glues, paper, wallpaper and board/cardboard, textiles, carpets, leather, wood, fibers and tissues, paints and plastic articles, cooling lubricants and other materials which can be infected with or destroyed by microorganisms. Parts of production plants and buildings, for example cooling-water circuits, cooling and heating systems and ventilation and air-conditioning units, which may be impaired by the proliferation of microorganisms may also be mentioned within the scope of the materials to be protected. Industrial materials within the scope of the present invention preferably include adhesives, sizes, paper and card, leather, wood, paints, cooling lubricants and heat transfer fluids, more preferably wood.

The compound combination and the composition of the invention may prevent adverse effects, such as rotting, decay, discoloration, decoloration or formation of mould.

In the case of treatment of wood the compound combination and the composition of the invention may also be used against fungal diseases liable to grow on or inside timber.

Timber means all types of species of wood, and all types of working of this wood intended for construction, for example solid wood, high-density wood, laminated wood, and plywood. In addition, the compound and the composition of the invention may be used to protect objects which come into contact with saltwater or brackish water, especially hulls, screens, nets, buildings, moorings and signalling systems, from fouling.

The compound combination and the composition of the invention may also be employed for protecting storage goods. Storage goods are understood to mean natural substances of vegetable or animal origin or processed products thereof which are of natural origin, and for which long-term protection is desired. Storage goods of vegetable origin, for example plants or plant parts, such as stems, leaves, tubers, seeds, fruits, grains, may be protected freshly harvested or after processing by (pre)drying, moistening, comminuting, grinding, pressing or roasting. Storage goods also include timber, both unprocessed, such as construction timber, electricity poles and barriers, or in the form of finished products, such as furniture. Storage goods of animal origin are, for example, hides, leather, furs and hairs. The compound combination and the composition of the invention may prevent adverse effects, such as rotting, decay, discoloration, decoloration or formation of mould.

Microorganisms capable of degrading or altering industrial materials include, for example, bacteria, fungi, yeasts, algae and slime organisms. The compound combination and the composition of the invention preferably act against fungi, especially moulds, wood-discoloring and wood-destroying fungi (Ascomycetes, Basidiomycetes, Deuteromycetes and Zygomycetes), and against slime organisms and algae. Examples include microorganisms of the following genera: *Alternaria*, such as *Alternaria tenuis; Aspergillus*, such as *Aspergillus niger; Chaetomium*, such as *Chaetomium globosum; Coniophora*, such as *Coniophora puetana; Lentinus*, such as *Lentinus tigrinus; Penicillium*, such as *Penicillium glaucum; Polyporus*, such as *Polyporus versicolor; Aureobasidium*, such as *Aureobasidium pullulans; Sclerophoma*, such as *Sclerophoma pityophila; Trichoderma*, such as *Trichoderma viride; Ophiostoma* spp., *Ceratocystis* spp., *Humicola* spp., *Petriella* spp., *Trichurus* spp., *Coriolus* spp., *Gloeophyllum* spp., *Pleurotus* spp., *Poria* spp., *Serpula* spp. and *Tyromyces* spp., *Cladosporium* spp., *Paecilomyces* spp. *Mucor* spp., *Escherichia*, such as *Escherichia coli; Pseudomonas*, such as *Pseudomonas aeruginosa; Staphylococcus*, such as *Staphylococcus aureus, Candida* spp. and *Saccharomyces* spp., such as *Saccharomyces cerevisae.*

Seed Treatment

The compound combination and the composition of the invention may also be used to protect seeds from unwanted microorganisms, such as phytopathogenic microorganisms, for instance phytopathogenic fungi or phytopathogenic oomycetes. The term seed(s) as used herein include dormant seeds, primed seeds, pregerminated seeds and seeds with emerged roots and leaves.

Thus, the present invention also relates to a method for protecting seeds from unwanted microorganisms which comprises the step of treating the seeds with the compound combination or the composition of the invention, wherein the seeds may be treated simultaneously, separately or sequentially with the compounds (A) and (B).

The treatment of seeds with the compound combination or the composition of the invention protects the seeds from phytopathogenic microorganisms, but also protects the germinating seeds, the emerging seedlings and the plants after emergence from the treated seeds. Therefore, the present invention also relates to a method for protecting seeds, germinating seeds and emerging seedlings.

The seeds treatment may be performed prior to sowing, at the time of sowing or shortly thereafter.

When the seeds treatment is performed prior to sowing (e.g. so-called on-seed applications), the seeds treatment may be performed as follows: the seeds may be placed into a mixer with a desired amount of the compound combination or the composition of the invention, the seeds and the compound combination or the composition of the invention are mixed until an homogeneous distribution on seeds is achieved. If appropriate, the seeds may then be dried.

The invention also relates to seeds coated with the compound combination or the composition of the invention.

Preferably, the seeds are treated in a state in which it is sufficiently stable for no damage to occur in the course of treatment. In general, seeds can be treated at any time between harvest and shortly after sowing. It is customary to use seeds which have been separated from the plant and freed from cobs, shells, stalks, coats, hairs or the flesh of the fruits. For example, it is possible to use seeds which have been harvested, cleaned and dried down to a moisture content of less than 15% by weight. Alternatively, it is also possible to use seeds which, after drying, for example, have been treated with water and then dried again, or seeds just after priming, or seeds stored in primed conditions or pre-germinated seeds, or seeds sown on nursery trays, tapes or paper.

The amount of the compound combination or the composition of the invention applied to the seeds is typically such that the germination of the seed is not impaired, or that the resulting plant is not damaged. This must be ensured particularly in case the compounds contained in the compound combination of the invention would exhibit phytotoxic effects at certain application rates. The intrinsic phenotypes of transgenic plants should also be taken into consideration when determining the amount of the compound combination of the invention to be applied to the seed in order to achieve optimum seed and germinating plant protection with a minimum amount of compound being employed.

The compounds contained in the compound combination of the invention can be applied as such, directly to the seeds, i.e. without the use of any other components and without having been diluted. They can be applied in a simultaneous, separate or sequential manner. Also compositions containing the compounds contained in the compound combination of the invention, such as the composition of the invention, can be applied to the seeds.

The compound combination and the composition of the invention are suitable for protecting seeds of any plant variety. Preferred seeds are that of cereals (such as wheat, barley, rye, millet, triticale, and oats), oilseed rape, maize, cotton, soybean, rice, potatoes, sunflower, beans, coffee, peas, beet (e.g. sugar beet and fodder beet), peanut, vegetables (such as tomato, cucumber, onions and lettuce), lawns and ornamental plants. More preferred are seeds of wheat, soybean, oilseed rape, maize and rice.

The compound combination and the composition of the invention may be used for treating transgenic seeds, in particular seeds of plants capable of expressing a polypeptide or protein which acts against pests, herbicidal damage or abiotic stress, thereby increasing the protective effect. Seeds of plants capable of expressing a polypeptide or protein which acts against pests, herbicidal damage or abiotic stress may contain at least one heterologous gene which allows the expression of said polypeptide or protein. These heterologous genes in transgenic seeds may originate, for example, from microorganisms of the species *Bacillus, Rhizobium, Pseudomonas, Serratia, Trichoderma, Clavibacter, Glomus* or *Gliocladium*. These heterologous genes preferably originate from *Bacillus* sp., in which case the gene product is effective against the European corn borer and/or the Western corn rootworm. Particularly preferably, the heterologous genes originate from *Bacillus thuringiensis.*

Application

The compound combination of the invention can be applied as such, or for example in the form of as ready-to-use solutions, emulsions, water- or oil-based suspensions, powders, wettable powders, pastes, soluble powders, dusts, soluble granules, granules for broadcasting, suspoemulsion concentrates, natural products impregnated with the compound combination of the invention, synthetic substances impregnated with the compound combination of the invention, fertilizers or microencapsulations in polymeric substances.

Application is accomplished in a customary manner, for example by watering, spraying, atomizing, broadcasting, dusting, foaming or spreading-on. It is also possible to deploy the compound combination of the invention by the ultra-low volume method, via a drip irrigation system or drench application, to apply it in-furrow or to inject it into the soil stem or trunk. It is further possible to apply the compound combination of the invention by means of a wound seal, paint or other wound dressing. The effective and plant-compatible amount of the compound combination of the invention which is applied to the plants, plant parts, fruits, seeds or soil will depend on various factors, such as the compound/composition employed, the subject of the treatment (plant, plant part, fruit, seed or soil), the type of treatment (dusting, spraying, seed dressing), the purpose of the treatment (curative and protective), the type of microorganisms, the development stage of the microorganisms, the sensitivity of the microorganisms, the crop growth stage and the environmental conditions.

When the compound combination of the invention is used as a fungicide, the application rates can vary within a relatively wide range, depending on the kind of application. For the treatment of plant parts, such as leaves, the application rate may range from 0.1 to 10 000 g/ha, preferably from 10 to 1000 g/ha, more preferably from 50 to 300 g/ha (in the case of application by watering or dripping, it is even possible to reduce the application rate, especially when inert substrates such as rockwool or perlite are used). For the treatment of seeds, the application rate may range from 0.1 to 200 g per 100 kg of seeds, preferably from 1 to 150 g per 100 kg of seeds, more preferably from 2.5 to 25 g per 100 kg of seeds, even more preferably from 2.5 to 12.5 g per 100 kg of seeds. For the treatment of soil, the application rate may range from 0.1 to 10 000 g/ha, preferably from 1 to 5000 g/ha. The outlined application rates refer to the total application rates of compounds (A) and (B) present in the compound combination of the present invention.

These application rates are merely examples and are not intended to limit the scope of the present invention.

The compound combination of the invention can be used in combination with models e.g. embedded in computer programs for site specific crop management, satellite farming, precision farming or precision agriculture. Such models support the site specific management of agricultural sites with data from various sources such as soils, weather, crops (e.g. type, growth stage, plant health), weeds (e.g. type, growth stage), diseases, pests, nutrients, water, moisture, biomass, satellite data, yield etc. with the purpose to optimize profitability, sustainability and protection of the environment. In particular, such models can help to optimize agronomical decisions, control the precision of pesticide applications and record the work performed.

As an example, the compound of the invention can be applied to a crop plant according to appropriate dose regime if a model models the development of a fungal disease and calculates that a threshold has been reached for which it is recommendable to apply the compound of the invention to the crop plant.

Commercially available systems which include agronomic models are e.g. FieldScripts™ from The Climate Corporation, Xarvio™ from BASF, AGLogic™ from John Deere, etc.

The compounds of the invention can also be used in combination with smart spraying equipment such as e.g. spot spraying or precision spraying equipment attached to or housed within a farm vehicle such as a tractor, robot, helicopter, airplane, unmanned aerial vehicle (UAV) such as a drone, etc. Such an equipment usually includes input sensors (such as e.g. a camera) and a processing unit configured to analyze the input data and configured to provide a decision based on the analysis of the input data to apply the compound of the invention to the crop plants (respectively the weeds) in a specific and precise manner. The use of such smart spraying equipment usually also requires positions systems (e.g. GPS receivers) to localize recorded data and to guide or to control farm vehicles; geographic information systems (GIS) to represent the information on intelligible maps, and appropriate farm vehicles to perform the required farm action such as the spraying.

In an example, fungal diseases can be detected from imagery acquired by a camera. In an example fungal diseases can be identified and/or classified based on that imagery. Such identification and/classification can make use of image processing algorithms. Such image processing algorithms can utilize machine learning algorithms, such as trained neutral networks, decision trees and utilize artificial intelligence algorithms. In this manner, the compounds described herein can be applied only where needed.

EXAMPLES

Generality

Measurement of Log P Values

Measurement of Log P values as provided herein was performed according to EEC directive 79/831 Annex V.A8 by HPLC (High Performance Liquid Chromatography) on reversed phase columns with the following methods:

[a] Log P value is determined by measurement of LC-UV, in an acidic range, with 0.1% formic acid in water and acetonitrile as eluent (linear gradient from 10% acetonitrile to 95% acetonitrile).

[b] Log P value is determined by measurement of LC-UV, in a neutral range, with 0.001 molar ammonium acetate solution in water and acetonitrile as eluent (linear gradient from 10% acetonitrile to 95% acetonitrile).

[c] Log P value is determined by measurement of LC-UV, in an acidic range, with 0.1% phosphoric acid and acetonitrile as eluent (linear gradient from 10% acetonitrile to 95% acetonitrile).

If more than one Log P value is available within the same method, all the values are given and separated by "+".

Calibration was done with straight-chain alkan2-ones (with 3 to 16 carbon atoms) with known Log P values (measurement of Log P values using retention times with linear interpolation between successive alkanones). Lambda-max-values were determined using UV-spectra from 200 nm to 400 nm and the peak values of the chromatographic signals $^1$H-NMR Data $^1$H-NMR data of selected examples as provided herein are written in form of 1H-NMR-peak lists. To each signal peak are listed the δ-value in ppm and the signal intensity in round brackets. Between the δ-value—signal intensity pairs are semicolons as delimiters.

The peak list of an example has therefore the form:

$\delta_1$ (intensity$_1$); $\delta_2$ (intensity$_2$); . . . ; $\delta_i$ (intensity$_i$); . . . ; $\delta_n$ (intensity$_n$)

Intensity of sharp signals correlates with the height of the signals in a printed example of a NMR spectrum in cm and shows the real relations of signal intensities. From broad signals several peaks or the middle of the signal and their relative intensity in comparison to the most intensive signal in the spectrum can be shown. For calibrating chemical shift for 1H spectra, we use tetramethylsilane and/or the chemical shift of the solvent used, especially in the case of spectra measured in DMSO. Therefore in NMR peak lists, tetramethylsilane peak can occur but not necessarily.

The 1H-NMR peak lists are similar to classical 1H-NMR prints and contains therefore usually all peaks, which are listed at classical NMR-interpretation.

Additionally they can show like classical 1H-NMR prints signals of solvents, stereoisomers of the target compounds, which are also object of the invention, and/or peaks of impurities.

To show compound signals in the delta-range of solvents and/or water the usual peaks of solvents, for example peaks of DMSO in DMSO-$D_6$ and the peak of water are shown in our 1H-NMR peak lists and have usually on average a high intensity.

The peaks of stereoisomers of the target compounds and/or peaks of impurities have usually on average a lower intensity than the peaks of target compounds (for example with a purity >90%).

Such stereoisomers and/or impurities can be typical for the specific preparation process. Therefore their peaks can help to recognize the reproduction of our preparation process via "side-products-fingerprints".

An expert, who calculates the peaks of the target compounds with known methods (MestreC, ACD-simulation, but also with empirically evaluated expectation values) can isolate the peaks of the target compounds as needed optionally using additional intensity filters. This isolation would be similar to relevant peak picking at classical 1H-NMR interpretation.

Further details of NMR-data description with peak lists you find in the publication "Citation of NMR Peaklist Data within Patent Applications" of the Research Disclosure Database Number 564025.

Separation of Enantiomers

Enantiomeric separations of racemates are performed by preparative supercritical fluid chromatography using supercritical carbon dioxide as mobile phase and lower alcohols as modifier, more preferably methanol, ethanol or isopropanol in a ratio comprised between 15 and 30% by volume. Total flow rates are in a range 70-100 ml/min and chromatographic separations are done at a temperature in a range of between 30° C. and 50° C. and a back pressure in a range of between 70 bar to 130 bar on one of the thermostated chiral stationary phases, commercially available and known as follows:

ChiralPak® IA, 250×20 mm from Daicel Chemical Industries, Ltd.

Lux® Amylose-1, 250×21.2 mm 5 μm, Axia packed from Phenomenex Inc.

Lux® Cellulose-1, 250×21.2 mm 5 μm, Axia packed from Phenomenex Inc.

Lux® i-Cellulose-5, 250×21.2 mm 5 μm, Axia packed from Phenomenex Inc.

The separations on preparative scale were performed on apparatus SFC-PICLAB Hybrid 10-150 from Pic Solution with UV-detection in a range of between 210 nm and 280 nm, preferably 220 and 254 nm.

The following examples illustrate in a non-limiting manner the preparation and biological activity of the compounds of formula (I) according to the invention.

Synthesis of Compounds of Formula (I) and Intermediates

Synthesis of Compounds of Formula (I)

Preparation of Example 1: Preparation of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine (Compound 1.059)

Step 1: Preparation of ethyl 6-chloro-3-[3-(trifluoromethyl)phenoxy]pyridazine-4-carboxylate Under argon, sodium hydride (2.8 g, 70 mmol) was added to a solution of 3-(trifluoromethyl)phenol (9.7 g, 60 mmol) in DMF (30 mL). The reaction mixture was stirred 1 h at room temperature, then ethyl 3,6-dichloropyridazine-4-carboxylate (13.8 g, 50 mmol) was added portionwise to the solution. The reaction mixture was stirred for 18 h at room temperature, then diluted with water and extracted with ether (3×200 mL). The organic extracts were washed with water and brine, dried over magnesium sulfate, filtered and concentrated under reduced pressure. Purification of the residue by column chromatography on silica gel (gradient heptane/EtOAc) afforded, after evaporation of the solvents, 20 g (90% purity, 100% yield) of ethyl 6-chloro-3-[3-(trifluoromethyl)phenoxy]pyridazine-4-carboxylate as an oil.

Step 2: Preparation of 6-chloro-3-[3-(trifluoromethyl)phenoxy]pyridazine-4-carboxylic acid To a solution of ethyl 6-chloro-3-[3-(trifluoromethyl)phenoxy]pyridazine-4-carboxylate (15 g, 35 mmol) in dioxane/water 2:1 (75 mL) was added lithium hydroxide (2.5 g, 105 mmol). The reaction was stirred for 4 h at room temperature then diluted with water. The aqueous phase was acidified with 1M aqueous HCl solution and extracted with ethyl acetate (3×200 mL). The organic extracts were dried over magnesium sulfate, filtered and concentrated under reduced pressure. Evaporation of the solvents afforded 9.7 g (98% purity, 85% yield) of 6-chloro-3-[3-(trifluoromethyl)phenoxy]pyridazine-4-carboxylic acid as a solid.

Step 3: Preparation of 6-chloro-N-[rac-1-[(2,4-dimethylphenyl)methyl]-2-(1,3-dioxoisoindolin-2-yl)oxy-ethyl]-3-[3-(trifluoromethyl)phenoxy]pyridazine-4-carboxamide (Compound 3-16)

Under argon, to a solution of 6-chloro-3-[3-(trifluoromethyl)phenoxy]pyridazine-4-carboxylic acid (5.0 g, 15.7 mmol) and HATU (6.56 g, 17.26 mmol) in DMF (100 mL) were successively added at 0° C., 2-[rac-2-amino-3-(2,4-dimethylphenyl)propoxy]isoindoline-1,3-dione; 2,2,2-trifluoroacetic acid (7.57 g, 17.26 mmol) and N,N-Diisopropylethylamine (8.2 mL, 47.07 mmol). After 15 min at 0° C., the reaction mixture was stirred for 3 h at room temperature. It was then diluted with water and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 7.95 g (100% purity, 81% yield) of 6-chloro-N-[rac-1-[(2,4-dimethylphenyl)methyl]-2-(1,3-dioxoisoindolin-2-yl)oxy-ethyl]-3-[3-(trifluoro-methyl)phenoxy]pyridazine-4-carboxamide as a white solid.

Step 4: Preparation of 6-chloro-N-[rac-1-(aminooxymethyl)-2-(2,4-dimethylphenyl)ethyl]-3-[3-(trifluoro-methyl)phenoxy]pyridazine-4-carboxamide (Compound 4-17)

Under argon, hydrazine monohydrate (2.31 mL, 37.92 mmol) was added to a solution of 6-chloro-N-[rac-1-[(2,4-dimethylphenyl)methyl]-2-(1,3-dioxoisoindolin-2-yl)oxy-ethyl]-3-[3-(trifluoro-methyl)phenoxy]pyridazine-4-carboxamide (7.9 g, 12.64 mmol) in DCM/MeOH (110 mL, 1:1). The reaction mixture was stirred for 4 h at room temperature and concentrated. It was then diluted with water and extracted with ethyl acetate (2×200 mL). The organic extracts were dried over magnesium sulfate, filtered and concentrated under reduced pressure. Evaporation of the solvents afforded 6.35 g (97% purity, 98% yield) of 6-chloro-N-[rac-1-(aminooxymethyl)-2-(2,4-dimethylphenyl)ethyl]-3-[3-(trifluoromethyl)phenoxy]pyridazine-4-carboxamide as a yellow oil.

Step 5: Preparation of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine Under argon, $POCl_3$ (3.56 mL, 38.19 mmol) was added at 80° C. to a solution 6-chloro-N-[rac-1-(aminooxymethyl)-2-(2,4-dimethylphenyl)ethyl]-3-[3-(trifluoromethyl)phenoxy]pyridazine-4-carboxamide (6.3 g, 12.73 mmol) in AcCN (114 mL). The reaction mixture was stirred for 18 h at 80° C. After cooling to room temperature, the mixture was poured into a saturated sodium bicarbonate solution, then extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 2.52 g (98% purity, 41% yield) of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine as a yellow solid.

Preparation of Example 2: Preparation of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine (Compound 1.059)

Step 1: Preparation of 6-chloro-N-[1-(chloromethyl)-2-(2,4-dimethylphenyl)ethyl]-3-[3-(trifluoromethyl)phenoxy]pyridazine-4-carboxamide (Compound 21-01)

To a solution of 6-chloro-3-[3-(trifluoromethyl)phenoxy]pyridazine-4-carboxylic acid (100 mg, 0.31 mmol) in dichloromethane (2 mL) was added at room temperature oxalyl chloride (119 mg, 0.94 mmol) and a drop of dimethylformamide. After 30 min, the reaction was concentrated under reduced pressure. The residue was dissolved in dichloromethane (2 ml) and added at 0° C. to a suspension of 1-chloro-3-(2,4-dimethylphenyl)propan-2-amine; hydrochloride (73 mg, 0.31 mmol) in dichloromethane (1 mL), followed by addition of N,N-diisopropylethylamine (0.16 mL, 0.94 mmol). The reaction mixture was stirred at room temperature for 1 h, then concentrated under reduced pressure. Purification of the residue by column chromatography on silica gel (gradient heptane/EtOAc) afforded, after evaporation of the solvents, 142 mg (87% purity, 79% yield) of 6-chloro-N-[1-(chloromethyl)-2-(2,4-dimethylphenyl)ethyl]-3-[3-(trifluoromethyl)phenoxy]pyridazine-4-carboxamide as a colourless oil.

Step 2: Preparation of 6-chloro-N-[1-(chloromethyl)-2-(2,4-dimethylphenyl)ethyl]-N'-hydroxy-3-[3-(trifluoromethyl)phenoxy]pyridazine-4-carboxamidine (Compound 20-01)

To a solution of 6-chloro-N-[1-(chloromethyl)-2-(2,4-dimethylphenyl)ethyl]-3-[3-(trifluoro-methyl)phenoxy]pyridazine-4-carboxamide (130 mg, 0.23 mmol) in AcCN (2 mL) was added phosphorous pentachloride (205 mg, 0.99 mmol). The reaction mixture was stirred at room temperature for 18 h, then concentrated under reduced pressure. The residue was dissolved in AcCN (5 mL) and a solution of hydroxylamine in water (300 mg, 4.53 mmol, 50% in water) was added to the reaction mixture. After stirring at room temperature for 1 h the reaction mixture was diluted with water and toluene, and extracted with ethyl acetate (3×50 mL). The organic extracts were washed with water and brine, dried over sodium sulfate, filtered and concentrated under reduced pressure. Evaporation of the solvents, afforded 150 mg (65% purity, 83% yield) of 6-chloro-N-[1-(chloromethyl)-2-(2,4-dimethylphenyl)ethyl]-N'-hydroxy-3-[3-(trifluoromethyl)phenoxy]pyridazine-4-carboxamidine as a yellow oil.

Step 3: Preparation of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine To a solution of 6-chloro-N-[1-(chloromethyl)-2-(2,4-dimethylphenyl)ethyl]-N'-hydroxy-3-[3-(trifluoro-methyl)phenoxy]pyridazine-4-carboxamidine (150 mg, 0.23 mmol) in AcCN (2 mL) was added potassium tert-butoxide (47.3 mg, 0.42 mmol). The reaction mixture was stirred at room temperature for 1 h30, then diluted with a saturated ammonium chloride solution and extracted with dichloromethane (2×50 mL). The organic extracts were dried over sodium sulfate, filtered and concentrated under reduced pressure. Purification of the residue by column chromatography on silica gel (gradient heptane/EtOAc) afforded, after evaporation of the solvents, 56 mg (87% purity, 43% yield) of rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine as a yellow solid.

Preparation of Example 3: Preparation of rac-5-(4-chlorophenyl)-3-[6-methyl-3-[3-(trifluoro-methyl)phenoxy]pyridazin-4-yl]-5,6-dihydro-4H-1,2,4-oxadiazine (Compound 1.040)

Step 1: Preparation of 6-chloro-3-[3-(trifluoromethyl)phenoxy]pyridazine-4-carbonitrile (Compound 9-03)

Under argon, sodium hydride (1.30 g, 32 mmol) was added at 0° C. to a solution of 3-(trifluoromethyl)phenol (4.6 g, 28 mmol) in THF (100 mL). After 30 min, 3,6-dichloropyridazine-4-carbonitrile (5.0 g, 28.7 mmol) was added portionwise to the solution. The reaction mixture was stirred for 3 h at room temperature, then diluted with saturated ammonium chloride solution and extracted with EtOAc (3×200 mL). The organic extracts were washed with water and brine, dried over magnesium sulfate, filtered and concentrated under reduced pressure. Purification of the residue by column chromatography on silica gel (gradient heptane/EtOAc) afforded, after evaporation of the solvents, 6.1 g (95% purity, 67% yield) of 6-chloro-3-[3-(trifluoromethyl)phenoxy]pyridazine-4-carbonitrile as an oil.

Step 2: Preparation of 6-methyl-3-[3-(trifluoromethyl)phenoxy]pyridazine-4-carbonitrile (Compound 9-02)

Under argon, 2,4,6-trimethyl-1,3,5,2,4,6-trioxatriborinane (12.57 g, 50.0 mmol) was added to a stirred solution of 6-chloro-3-[3-(trifluoromethyl)phenoxy]pyridazine-4-carbonitrile (3.0 g, 10.0 mmol), [1,1'-Bis(diphenylphosphino)ferrocene]dichloropalladium(II) complex with dichloromethane (64 mg, 0.10 mmol) and cesium carbonate (4.89 g, 15.0 mmol) in dioxane (30 mL). The reaction mixture was stirred at 100° C. for 4 h, then diluted with water and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 1.82 g (100% purity, 65% yield) of 6-methyl-3-[3-(trifluoromethyl)phenoxy]pyridazine-4-carbonitrile as a solid.

Step 3: preparation of N'-hydroxy-6-methyl-3-[3-(trifluoromethyl)phenoxy]pyridazine-4-carboxamidine (Compound 10-02)

To a solution of 6-methyl-3-[3-(trifluoromethyl)phenoxy]pyridazine-4-carbonitrile (1.82 g, 6.52 mmol) in EtOH (32 mL) was added hydroxylamine hydrochloride (1.13 g, 16.29 mmol) and potassium carbonate (2.25 g, 16.29 mmol). The reaction mixture was stirred at 60° C. for 2 h. The precipitate was filtered off. The filtrate was concentrated, diluted with water and extracted with EtOAc (2×100 mL). The organic extracts were dried over magnesium sulfate, filtered and concentrated under reduced pressure. Purification of the residue by column chromatography on silica gel (gradient heptane/EtOAc) afforded, after evaporation of the solvents, 1.38 g (91% purity, 62% yield) of N'-hydroxy-6-methyl-3-[3-(trifluoromethyl)phenoxy]pyridazine-4-carboxamidine as a yellow solid.

Step 4: preparation of N'-[2-(4-chlorophenyl)-2-oxo-ethoxy]-6-methyl-3-[3-(trifluoro-methyl)phenoxy]pyridazine-4-carboxamidine (Compound 12-03)

Under argon, 2-tert-butylimino-N,N-diethyl-1,3-dimethyl-1,3,2lambda5-diazaphosphinan-2-amine (BEMP) (210.9 mg, 0.77 mmol) was added at room temperature to a solution of N'-hydroxy-6-methyl-3-[3-(trifluoromethyl)phenoxy]pyridazine-4-carboxamidine (200 mg, 0.64 mmol) in AcCN (2.7 mL). After 15 min, 2-bromo-1-(4-chlorophenyl)ethanone (224 mg, 0.96 mmol) was added, the reaction was stirred further for 3 h, then concentrated under reduced pressure. Purification of the residue by column chromatography on silica gel (gradient heptane/EtOAc) afforded, after evaporation of the solvents, 65.6 mg (91% purity, 20% yield) of N'-[2-(4-chlorophenyl)-2-oxo-ethoxy]-6-methyl-3-[3-(trifluoromethyl)phenoxy]pyridazine-4-carboxamidine as an oil.

Step 5: Preparation of rac-5-(4-chlorophenyl)-3-[6-methyl-3-[3-(trifluoromethyl)phenoxy]pyridazin-4-yl]-5,6-dihydro-4H-1,2,4-oxadiazine Under argon, N'-[2-(4-chlorophenyl)-2-oxo-ethoxy]-6-methyl-3-[3-(trifluoromethyl)phenoxy]pyridazine-4-carboxamidine (69.2 mg, 0.13 mmol) was dissolved in MeOH (0.94 mL) and acetic acid (0.21 mL) and heated to 60° C. After 1 h, sodium cyanoborohydride (9.3 mg, 0.15 mmol) was added and the reaction was stirred further for 2 h. After cooling to room temperature, the mixture was poured into a 1M NaOH solution and extracted with ethyl acetate (2×20 mL). The organic extracts were dried over magnesium sulfate, filtered and concentrated under reduced pressure. Purification of the residue by PREP-HPLC afforded, after evaporation of the solvents, 29 mg (100% purity, 47% yield) of rac-5-(4-chlorophenyl)-3-[6-methyl-3-[3-(trifluoromethyl)phenoxy]pyridazin-4-yl]-5,6-dihydro-4H-1,2,4-oxadiazine as a solid.

Preparation of Example 4: Preparation of rac-5-(1-methylindol-3-yl)-3-[6-methyl-3-[3-(trifluoromethyl)phenoxy]pyridazin-4-yl]-5,6-dihydro-4H-1,2,4-oxadiazine (Compound 1.011)

Step 1: preparation of N'-allyloxy-6-methyl-3-[3-(trifluoromethyl)phenoxy]pyridazine-4-carboxamidine (Compound 13-01)

Under argon, O-allylhydroxylamine hydrochloride (658 mg, 5.4 mmol) was added at room temperature to a stirred solution of 6-methyl-3-[3-(trifluoromethyl)phenoxy]pyridazine-4-carbonitrile (500 mg, 1.79 mol) and $NaHCO_3$ (752.1 mg, 8.95 mmol) in MeOH. The resulting mixture was stirred at 60° C. for 36 h, cooled to room temperature and concentrated under vacuum. The resulting mixture was extracted with dichloromethane (3×200 mL). The organic extracts were washed with brine, dried over sodium sulfate, filtered and concentrated under reduced pressure. Purification of the residue by column chromatography on silica gel (gradient PE/EtOAc) afforded, after evaporation of the solvents, 400 mg (98% purity, 63% yield) of N'-allyloxy-6-methyl-3-[3-(trifluoromethyl)phenoxy]pyridazine-4-carboxamidine as a brown oil.

Step 2: Preparation of rac-3-[6-methyl-3-[3-(trifluoromethyl)phenoxy]pyridazin-4-yl]-5,6-dihydro-4H-1,2,4-oxadiazin-5-ol (Compound 14-01)

In a 50 mL round bottom flask $OSO_4$ (902 mg, 0.14 mmol, 4% wt in water) and $NaIO_4$ (759 mg, 3.55 mmol) were added at room temperature to a solution of N'-allyloxy-6-methyl-3-[3-(trifluoro-methyl)phenoxy]pyridazine-4-carboxamidine (500 mg, 1.42 mmol) in THF (20 ml) and water (5 mL). The reaction mixture was stirred for 2 h at room temperature, then diluted with a saturated ammonium chloride solution and extracted with ethyl acetate (2×100 mL). The organic extracts were dried over magnesium sulfate, filtered and concentrated under reduced pressure. Purification of the residue by column chromatography on silica gel (gradient heptane/EtOAc) afforded, after evaporation of the solvents, 260 mg (100% purity, 51% yield) of rac-3-[6-methyl-3-[3-(trifluoromethyl)phenoxy]pyridazin-4-yl]-5,6-dihydro-4H-1,2,4-oxadiazin-5-ol as a white solid.

Step 3: Preparation of rac-5-(1-methylindol-3-yl)-3-[6-methyl-3-[3-(trifluoromethyl)phenoxy]pyridazin-4-yl]-5,6-dihydro-4H-1,2,4-oxadiazine In a 50 mL round bottom flask, 1-methylindole (37 mg, 0.28 mmol) was added to a solution of rac-3-[6-methyl-3-[3-(trifluoromethyl)phenoxy]pyridazin-4-yl]-5,6-dihydro-4H-1,2,4-oxadiazin-5-ol (50 mg, 0.14 mmol) in formic acid (2 mL). The reaction mixture was stirred for 45 min at 50° C. then cooled to room temperature and stirred further for 3 h. The solvent was removed under reduced pressure. Purification of the residue by column chromatography on silica gel (gradient heptane/EtOAc) afforded, after evaporation of the solvents, 59 mg (100% purity, 89% yield) of rac-5-(1-methylindol-3-yl)-3-[6-methyl-3-[3-(trifluoromethyl)phenoxy]pyridazin-4-yl]-5,6-dihydro-4H-1,2,4-oxadiazine as a pink solid.

Preparation of Example 5: Preparation of rac-5-[(4-bromo-2-chloro-phenyl)methyl]-3-[6-chloro-3-[3-(trifluoromethyl)phenoxy]pyridazin-4-yl]-5,6-dihydro-4H-1,2,4-oxadiazine (Compound 1.016)

Step 1: Preparation of methyl 6-chloro-3-[3-(trifluoromethyl)phenoxy]pyridazine-4-carboximidate (Compound 25-02)

Under argon, sodium methanolate (32 mg, 0.59 mmol) was added at 0° C. to a solution of 6-chloro-3-[3-(trifluoromethyl)phenoxy]pyridazine-4-carbonitrile (160 mg, 0.33 mmol) in MeOH (1.5 mL). The reaction mixture was stirred at 0° C. for 30 min. The crude solution contained 53% of methyl 6-chloro-3-[3-(trifluoromethyl)phenoxy]pyridazine-4-carboximidate and was used without further purification in the next step.

Step 2: Preparation of rac-5-[(4-bromo-2-chloro-phenyl)methyl]-3-[6-chloro-3-[3-(trifluoro-methyl)phenoxy]pyridazin-4-yl]-5,6-dihydro-4H-1,2,4-oxadiazine To the previous solution was added O-[rac-2-amino-3-(4-bromo-2-chloro-phenyl)propyl]hydroxylamine (157 mg, 0.51 mmol) dissolved in MeOH/acetic acid (1 mL, 1:1). The reaction mixture was stirred at room temperature for 3 h then heated at 100° C. for 7 h. After cooling to room temperature, the mixture was poured into a saturated sodium bicarbonate solution and extracted with ethyl acetate (2×50 mL). The organic extracts were washed with brine, dried over sodium sulfate, filtered and concentrated under reduced pressure. Purification of the residue by preparative HPLC afforded, after evaporation of the solvents, 5 mg (93% purity, 2% yield) of rac-5-[(4-bromo-2-chloro-phenyl)methyl]-3-[6-chloro-3-[3-(trifluoromethyl)phenoxy]pyridazin-4-yl]-5,6-dihydro-4H-1,2,4-oxadiazine as an oil.

Preparation of Example 6: Preparation of rac-3-[6-chloro-3-(2-fluoro-3-methoxy-phenoxy)pyridazin-4-yl]-5-[(2,4-dimethylphenyl)methyl]-5,6-dihydro-4H-1,2,4-oxadiazine (Compound 1.005)

Step 1: Preparation of 3,6-dichloro-N-[rac-1-[(2,4-dimethylphenyl)methyl]-2-(1,3-dioxoisoindolin-2-yl)oxy-ethyl]pyridazine-4-carboxamide (Compound 6-01)

Under argon, to a solution of 3,6-dichloropyridazine-4-carboxylic acid (700 mg, 3.62 mmol) and HATU (1.52 g, 3.99 mmol) in DMF (25 mL) were successively added at 0° C., 2-[rac-2-amino-3-(2,4-dimethylphenyl)propoxy]isoindoline-1,3-dione; 2,2,2-trifluoroacetic acid (1.75 g, 4.0 mmol) and N,N-Diisopropylethylamine (1.89 mL, 10.88 mmol). After 15 min at 0° C., the reaction mixture was stirred for 18 h at room temperature. It was then diluted with water and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 1.15 g (87% purity, 55% yield) of 3,6-dichloro-N-[rac-1-[(2,4-dimethylphenyl)methyl]-2-(1,3-dioxoisoindolin-2-yl)oxy-ethyl]pyridazine-4-carboxamide as a white solid.

Step 2: Preparation of 3,6-dichloro-N-[rac-1-(aminooxymethyl)-2-(2,4-dimethylphenyl)ethyl]pyridazine-4-carboxamide (Compound 6-02)

Under argon, hydrazine monohydrate (0.42 mL, 6.91 mmol) was added to a solution of 3,6-dichloro-N-[rac-1-[(2,4-dimethylphenyl)methyl]-2-(1,3-dioxoisoindolin-2-yl)oxy-ethyl]pyridazine-4-carboxamide (1.15 g, 2.3 mmol) in DCM/MeOH (15 mL, 1:1). The reaction mixture was stirred for 3 h at room temperature and concentrated. It was then diluted with water and extracted with ethyl acetate (2×200 mL). The organic extracts were dried over magnesium sulfate, filtered and concentrated under reduced pressure. Evaporation of the solvents afforded 900 mg (74% purity, 78% yield) of 3,6-dichloro-N-[rac-1-(aminooxymethyl)-2-(2,4-dimethylphenyl)ethyl]pyridazine-4-carboxamide as a yellow solid.

Step 3: Preparation of rac-3-(3,6-dichloropyridazin-4-yl)-5-[(2,4-dimethylphenyl)methyl]-5,6-dihydro-4H-1,2,4-oxadiazine (Compound 7-01)

Under argon, $POCl_3$ (0.56 mL, 6.0 mmol) was added at 80° C. to a solution of 3,6-dichloro-N-[rac-1-(aminooxymethyl)-2-(2,4-dimethylphenyl)ethyl]pyridazine-4-carboxamide (738 mg, 2.0 mmol) in AcCN (15 mL). The reaction mixture was stirred for 18 h at 80° C. After cooling to room temperature, the mixture was poured into a saturated sodium bicarbonate solution, then extracted with ethyl acetate (2×200 mL). The organic extracts were dried over magnesium sulfate, filtered and concentrated under reduced pressure. Purification of the residue by PREP-HPLC afforded, after evaporation of the solvents, 90 mg (92% purity, 17% yield) of rac-3-(3,6-dichloropyridazin-4-yl)-5-[(2,4-dimethylphenyl)methyl]-5,6-dihydro-4H-1,2,4-oxadiazine as a yellow solid.

Step 4: Preparation of rac-3-[6-chloro-3-(2-fluoro-3-methoxy-phenoxy)pyridazin-4-yl]-5-[(2,4-dimethyl-phenyl)methyl]-5,6-dihydro-4H-1,2,4-oxadiazine To a solution of rac-3-(3,6-dichloropyridazin-4-yl)-5-[(2,4-dimethylphenyl)methyl]-5,6-dihydro-4H-1,2,4-oxadiazine (60 mg, 0.17 mmol) in AcCN (1 mL) were added 2-fluoro-3-methoxy-phenol (27 mg, 0.19 mmol) and potassium carbonate (47 mg, 0.34 mmol). The reaction mixture was stirred at 50° C. for 5 h, then concentrated under reduced pressure. Purification of the residue by column chromatography on silica gel (gradient heptane/EtOAc) afforded, after evaporation of the solvents, 74 mg (97% purity, 90% yield) of rac-3-[6-chloro-3-(2-fluoro-3-methoxy-phenoxy)pyridazin-4-yl]-5-[(2,4-dimethylphenyl)methyl]-5,6-dihydro-4H-1,2,4-oxadiazine as a yellow oil.

Preparation of Example 7: Preparation of 1-[5-[rac-5-[(2,4-dimethylphenyl)methyl]-5,6-dihydro-4H-1,2,4-oxadiazin-3-yl]-6-[3-(trifluoromethyl)phenoxy]pyridazin-3-yl]ethanone (Compound 1.042)

Step 1: Preparation of rac-5-[(2,4-dimethylphenyl)methyl]-3-[6-(1-ethoxyvinyl)-3-[3-(trifluoro-methyl)phenoxy]pyridazin-4-yl]-5,6-dihydro-4H-1,2,4-oxadiazine (Compound 1.009)

In a microwave vial, rac-3-[6-chloro-3-[3-(trifluoromethyl)phenoxy]pyridazin-4-yl]-5-[(2,4-dimethyl-phenyl)methyl]-5,6-dihydro-4H-1,2,4-oxadiazine (500 mg, 1.05 mmol), tributyl(1-ethoxyvinyl)stannane (473 mg, 1.31 mmol) and bis(triphenylphosphine)palladium dichloride (73 mg, 0.103 mmol) were dissolved under argon in DMF (0.5 mL). The tube was sealed and the reaction mixture was heated in the microwave at 120° C. for 20 min. The reaction mixture was diluted with water and extracted with ethyl acetate (2×50 mL). The organic extracts were washed with water and brine, dried over magnesium sulfate, filtered and concentrated under reduced pressure. Purification of the residue by column chromatography on silica gel (gradient heptane/EtOAc) afforded, after evaporation of the solvents, 435 mg (100% purity, 80% yield) of rac-5-[(2,4-dimethylphenyl)methyl]-3-[6-(1-ethoxyvinyl)-3-[3-(trifluoromethyl)phenoxy]pyridazin-4-yl]-5,6-dihydro-4H-1,2,4-oxadiazine as an oil.

Step 2: Preparation of 1-[5-[rac-5-[(2,4-dimethylphenyl)methyl]-5,6-dihydro-4H-1,2,4-oxadiazin-3-yl]-6-[3-(trifluoromethyl)phenoxy]pyridazin-3-yl]ethanone To a solution of rac-5-[(2,4-dimethylphenyl)methyl]-3-[6-(1-ethoxyvinyl)-3-[3-(trifluoro-methyl)phenoxy]pyridazin-4-yl]-5,6-dihydro-4H-1,2,4-oxadiazine (100 mg, 0.19 mmol) in THF (1 mL) was added at room temperature a 2M aqueous HCl solution (0.15 mL, 0.30 mmol). The reaction was stirred for 30 min then diluted with water and extracted with ethyl acetate (2×50 mL). The organic extracts were washed with water and brine, dried over magnesium sulfate, filtered and concentrated under reduced pressure. Purification of the residue by column chromatography on silica gel (gradient heptane/EtOAc) afforded, after evaporation of the solvents, 35 mg (100% purity, 37% yield) of 1-[5-[rac-5-[(2,4-dimethylphenyl)methyl]-5,6-dihydro-4H-1,2,4-oxadiazin-3-yl]-6-[3-(trifluoromethyl)phenoxy]pyridazin-3-yl]ethanone as a oil.

Preparation of Example 8: Preparation of 3-chloro-N-cyclopropyl-5-[rac-5-[(2,4-dimethylphenyl)methyl]-5,6-dihydro-4H-1,2,4-oxadiazin-3-yl]-6-[3-(trifluoromethyl)phenoxy]pyridazin-4-amine (Compound 1.041)

Step 1: Preparation of rac-3-[6-chloro-5-iodo-3-[3-(trifluoromethyl)phenoxy]pyridazin-4-yl]-5-[(2,4-dimethylphenyl)methyl]-5,6-dihydro-4H-1,2,4-oxadiazine (Compound 1.065)

Under argon, a solution of TMPZnCl·LiCl (2.77 mmol, 5.1 mL, 17% in THF, CAS number 109-99-9) was added to rac-3-[6-chloro-3-[3-(trifluoromethyl)phenoxy]pyridazin-4- yl]-5-[(2,4-dimethylphenyl)methyl]-5,6-dihydro-4H-1,2,4-oxadiazine (600 mg, 1.26 mmol) in THF (60 mL). After stirring 1 h at room temperature, NIS (566 mg, 2.52 mmol) was added portionwise. The reaction mixture was stirred 2 h at room temperature, then it was diluted with a saturated sodium thiosulfate solution and saturated sodium bicarbonate solution, and extracted with ethyl acetate (2×250 mL). The organic extracts were washed with brine, dried over magnesium sulfate, filtered and concentrated under reduced pressure. Purification of the residue by PREP-HPLC afforded, after evaporation of the solvents, 178 mg (70% purity, 16% yield) of rac-3-[6-chloro-5-iodo-3-[3-(trifluoromethyl)phenoxy]pyridazin-4-yl]-5-[(2,4-dimethylphenyl)methyl]-5,6-dihydro-4H-1,2,4-oxadiazine as a yellow solid.

Step 2: Preparation of 3-chloro-N-cyclopropyl-5-[rac-5-[(2,4-dimethylphenyl)methyl]-5,6-dihydro-4H-1,2,4-oxadiazin-3-yl]-6-[3-(trifluoromethyl)phenoxy]pyridazin-4-amine Under argon, cyclopropylamine (6 mg, 0.10 mmol) and N,N-diisopropylethylamine (0.017 mL, 0.10 mmol) were added at room temperature to a solution of rac-3-[6-chloro-5-iodo-3-[3-(trifluoro-methyl)phenoxy]pyridazin-4-yl]-5-[(2,4-dimethylphenyl)methyl]-5,6-dihydro-4H-1,2,4-oxadiazine (50 mg, 0.08 mmol) in AcCN (0.7 mL). The reaction mixture was stirred at 50° C. for 18 h, then it was diluted with water and extracted with ethyl acetate (2×50 mL). The organic extracts were washed with brine, dried over magnesium sulfate, filtered and concentrated under reduced pressure. Evaporation of the solvent afforded 42 mg (98% purity, 93% yield) of 3-chloro-N-cyclopropyl-5-[rac-5-[(2,4-dimethylphenyl)methyl]-5,6-dihydro-4H-1,2,4-oxadiazin-3-yl]-6-[3-(trifluoromethyl)phenoxy]pyridazin-4-amine as an oil.

Preparation of Example 9: Preparation of 6-chloro-4-[rac-5-[(2,4-dichlorophenyl)methyl]-4,5-dihydro-1H-imidazol-2-yl]-3-[3-(trifluoromethyl)phenoxy]pyridazine (Compound 1.007)

A solution of $POCl_3$ (1.05 mL, 11.3 mmol) was added at room temperature to a mixture of 6-chloro-3-[3-(trifluoromethyl)phenoxy]pyridazine-4-carboxylic acid (400 mg, 1.25 mmol) and 3-(2,4-dichlorophenyl)propane-1,2-diamine (550 mg, 2.51 mmol) in 1,4-dioxane (10 mL). The reaction was heated to reflux and stirred for 36 h. After cooling, the reaction mixture was poured into a saturated sodium bicarbonate solution at 0° C., then extracted with ethyl acetate (2×100 mL). The organic extracts were washed with brine, dried over magnesium sulfate, filtered and concentrated under reduced pressure. Purification of the residue by PREP-HPLC afforded, after evaporation of the solvents, 90 mg (98% purity, 14% yield) of 6-chloro-4-[rac-5-[(2,4-dichlorophenyl)methyl]-4,5-dihydro-1H-imidazol-2-yl]-3-[3-(trifluoromethyl)phenoxy]pyridazine as a yellow oil.

Preparation of Example 10: preparation of (5S)-5-benzyl-3-[6-chloro-3-[3-(trifluoro-methyl)phenoxy]pyridazin-4-yl]-5,6-dihydro-4H-1,2,4-oxadiazine (compound I-070)

Step 1: Preparation of 6-chloro-N-methoxy-N-methyl-3-[3-(trifluoromethyl)phenoxy]pyridazine-4-carboxamide (Compound 1.03)

To a suspension of 6-chloro-3-[3-(trifluoromethyl)phenoxy]pyridazine-4-carboxylic acid (5.0 g, 16.7 mmol) in dichloromethane (75 mL) was added oxalyl chloride (3.19 g, 25.14 mmol) followed by two drops of DMF.

The reaction mixture was stirred at room temperature for 1 h. To the pre-formed acyl chloride was added N-methoxymethanamine; hydrochloride (2.12 g, 21.79 mmol) and triethylamine (8.17 mL, 58.68 mmol). The reaction mixture was stirred at room temperature for 2 h, then it was diluted with water and extracted with dichloromethane (2×200 mL). The organic extracts were washed with water and brine, dried over magnesium sulfate, filtered and concentrated under reduced pressure. The residue was diluted in dichloromethane and filtered over silica gel. Evaporation of the solvent afforded 3.38 g (95% purity, 56% yield) of 6-chloro-N-methoxy-N-methyl-3-[3-(trifluoromethyl)phenoxy]pyridazine-4-carboxamide as a oil.

Step 2: Preparation of 6-chloro-3-[3-(trifluoromethyl)phenoxy]pyridazine-4-carbaldehyde (Compound 16-01)

Under argon, a solution of DIBAL-H (0.88 mL, 0.88 mmol, 1M in hexan) was added at −50° C. to a solution of 6-chloro-N-methoxy-N-methyl-3-[3-(trifluoromethyl)phenoxy]pyridazine-4-carboxamide (100 mg, 0.29 mmol) in THF (1.8 mL). After 4 h at −30° C., the reaction was stopped by addition of saturated ammonium chloride solution then the mixture was extracted with ethyl acetate (2×50 mL). The organic extracts were dried over magnesium sulfate, filtered and concentrated under reduced pressure. Purification of the residue by column chromatography on silica gel (gradient heptane/EtOAc) afforded, after evaporation of the solvents, 43.6 mg (90% purity, 47% yield) of 6-chloro-3-[3-(trifluoromethyl)phenoxy]pyridazine-4-carbaldehyde as an oil.

Step 3: Preparation of 6-chloro-3-[3-(trifluoromethyl)phenoxy]pyridazine-4-carbaldehyde oxime (Compound 17-01)

Under argon, hydroxylamine; hydrochloride (156 mg, 2.24 mmol) and potassium acetate (415 mg, 4.23 mmol) were added to 6-chloro-3-[3-(trifluoromethyl)phenoxy]pyridazine-4-carbaldehyde (400 mg, 1.32 mmol) in EtOH (40 mL). The reaction mixture was stirred at reflux for 2 h, diluted in water and extracted with ethyl acetate (2×50 mL). The organic extracts were dried over magnesium sulfate, filtered and concentrated under reduced pressure. Evaporation of the solvents afforded 215 mg (90% purity, 47% yield) of 6-chloro-3-[3-(trifluoromethyl)phenoxy]pyridazine-4-carbaldehyde oxime as a solid.

Step 4: preparation of (5S)-5-benzyl-3-[6-chloro-3-[3-(trifluoromethyl)phenoxy]pyridazin-4-yl]-5,6-dihydro-4H-1,2,4-oxadiazine To a solution of 6-chloro-3-[3-(trifluoromethyl)phenoxy]pyridazine-4-carbaldehyde oxime (10 mg, 0.031 mmol) in AcCN (0.2 mL) was added NCS (5.4 mg, 0.04 mmol) at room temperature. The reaction mixture was stirred for 1 h, then a solution of (2S)-1-bromo-3-phenyl-propan-2-amine; 2,2,2-trifluoroacetic acid (15.4 mg, 0.047 mmol) in AcCN/water (0.3 mL, 2:1) was added. The reaction was stirred at room temperature for 5 h then 1,2-bis(dimethylamino)ethane (18.3 mg, 0.16 mmol) was added to the reaction mixture. After 30 min, a solution of sodium carbonate (34 mg, 0.31 mmol, 1M in water) was added and the reaction was further stirred for 1 h at room temperature. The reaction mixture was diluted with water and dichloromethane and the aqueous phase was extracted with dichloromethane (2×50 mL). The organic layer was dried over sodium sulfate, filtered and concentrated under reduced pressure. Purification of the residue by preparative HPLC afforded, after evaporation of the solvents, 10.9 mg (85% purity, 65% yield) of (5S)-5-benzyl-3-[6-chloro-3-[3-(trifluoromethyl)phenoxy]pyridazin-4-yl]-5,6-dihydro-4H-1,2,4-oxadiazine as a yellow solid.

Preparation of Example 11: Preparation of rac-3-[6-chloro-5-(2-methoxyethoxy)-3-[3-(trifluoro-methyl)phenoxy]pyridazin-4-yl]-5-[(2,4-dimethylphenyl)methyl]-5,6-dihydro-4H-1,2,4-oxadiazine (Compound 1.072)

Under argon, 2-methoxyethanol (0.15 mL, 0.30 mmol) and sodium hydride (11 mg, 0.27 mmol) were added at room temperature to a solution of rac-3-[6-chloro-5-iodo-3-[3-(trifluoromethyl)phenoxy]pyridazin-4-yl]-5-[(2,4-dimethylphenyl)methyl]-5,6-dihydro-4H-1,2,4-oxadiazine (150 mg, 0.25 mmol) in AcCN (2 mL). The reaction mixture was stirred at room temperature for 1 h, then it was diluted with water and extracted with ethyl acetate (2×50 mL). The organic extracts were washed with brine, dried over magnesium sulfate, filtered and concentrated under reduced pressure. Purification of the residue by column chromatography on silica gel (gradient heptane/EtOAc) afforded, after evaporation of the solvents, 30 mg (90% purity, 19% yield) of rac-3-[6-chloro-5-(2-methoxyethoxy)-3-[3-(trifluoromethyl)phenoxy]pyridazin-4-yl]-5-[(2,4-dimethylphenyl)methyl]-5,6-dihydro-4H-1,2,4-oxadiazine as a colorless oil.

Preparation of Example 12: Preparation of rac-3-[6-chloro-5-(4-pyridyl)-3-[3-(trifluoro-methyl)phenoxy]pyridazin-4-yl]-5-[(2,4-dimethylphenyl)methyl]-5,6-dihydro-4H-1,2,4-oxadiazine (Compound 1.088)

Under argon, a solution of TMPZnCl·LiCl (0.22 mmol, 0.40 mL, 17% in THF, CAS number 109-99-9) was added to rac-3-[6-chloro-3-[3-(trifluoromethyl)phenoxy]pyridazin-4-yl]-5-[(2,4-dimethylphenyl)methyl]-5,6-dihydro-4H-1,2,4-oxadiazine (50 mg, 0.10 mmol) in THF (3 mL), followed by addition of 4-bromopyridine (20 mg, 0.12 mmol), $Pd(dba)_2$ (18 mg, 0.031 mmol) and trifurylphosphine (15 m, 0.063 mmol). The reaction mixture was stirred 4 h at 60° C., then diluted with saturated ammonium chloride solution and saturated sodium bicarbonate solution, and extracted with ethyl acetate (2×100 mL). The organic extracts were washed with brine, dried over magnesium sulfate, filtered and concentrated under reduced pressure. Purification of the residue by PREP-HPLC afforded, after evaporation of the solvents, 32 mg (86% purity, 47% yield) of rac-3-[6-chloro-5-(4-pyridyl)-3-[3-(trifluoromethyl)phenoxy]pyridazin-4-yl]-5-[(2,4-dimethylphenyl)methyl]-5,6-dihydro-4H-1,2,4-oxadiazine as an oil.

Preparation of Example 13: Preparation of rac-5-[(2,4-dimethylphenyl)methyl]-3-[6-(2-methoxyethylsulfanyl)-5-methyl-3-[3-(trifluoromethyl)phenoxy]pyridazin-4-yl]-5,6-dihydro-4H-1,2,4-oxadiazine (Compound 1.187)

Under argon, 2-methoxyethanethiol (20 mg, 0.22 mmol) and sodium hydride (8 mg, 0.22 mmol) were added at 0° C. to a solution of rac-3-[6-chloro-5-methyl-3-[3-(trifluoromethyl)phenoxy]pyridazin-4-yl]-5-[(2,4-dimethylphenyl)methyl]-5,6-dihydro-4H-1,2,4-oxadiazine (100 mg, 0.20 mmol) in THF (2 mL). The reaction mixture was stirred at 0° C. for 2 h, then it was diluted with water and extracted with ethyl acetate (2×50 mL). The organic extracts were washed with brine, dried over magnesium sulfate, filtered and concentrated under reduced pressure. Purification of the residue by column chromatography on silica gel (gradient heptane/EtOAc) afforded, after evaporation of the solvents, 21 mg (96% purity, 18% yield) of rac-5-[(2,4-dimethylphenyl)methyl]-3-[6-(2-methoxyethylsulfanyl)-5-methyl-3-[3-(trifluoromethyl)phenoxy]pyridazin-4-yl]-5,6-dihydro-4H-1,2,4-oxadiazine as a colorless oil.

Preparation of Example 14: Preparation of rac-2-[6-chloro-3-(3-cyclopropylphenoxy)pyridazin-4-yl]-6-[(2,4-dimethylphenyl)methyl]-5,6-dihydro-1H-pyrimidin-4-one (Compound 1.078)

Step 1: preparation of methyl 6-chloro-3-(3-cyclopropylphenoxy)pyridazine-4-carboximidate (compound 25-01)

Under argon, sodium methanolate (43 mg, 0.81 mmol) was added at 0° C. to a solution of 6-chloro-3-(3-cyclopropylphenoxy)pyridazine-4-carbonitrile (200 mg, 0.74 mmol) in MeOH (2 mL). The reaction mixture was stirred at 0° C. for 30 min. The crude solution contained 48% of methyl 6-chloro-3-(3-cyclopropylphenoxy)pyridazine-4-carboximidate and was used without further purification in the next step.

Step 2: Preparation of rac-2-[6-chloro-3-(3-cyclopropylphenoxy)pyridazin-4-yl]-6-[(2,4-dimethylphenyl)methyl]-5,6-dihydro-1H-pyrimidin-4-one To the previous solution was added rac-3-amino-4-(2,4-dimethylphenyl)butanamide (93 mg, 0.45 mmol) dissolved in MeOH (0.5 mL) and acetic acid (17 μL). The reaction mixture was stirred at room temperature for 15 min then heated at 60° C. for 18 h. After cooling to room temperature, the mixture was poured into a saturated sodium bicarbonate solution and extracted with ethyl acetate (2×50 mL). The organic extracts were washed with brine, dried over sodium sulfate, filtered and concentrated under reduced pressure. Purification of the residue by preparative HPLC afforded, after evaporation of the solvents, 40.7 mg (100% purity, 29% yield) of rac-2-[6-chloro-3-(3-cyclopropylphenoxy)pyridazin-4-yl]-6-[(2,4-dimethylphenyl)methyl]-5,6-dihydro-1H-pyrimidin-4-one as an oil.

Preparation of Example 15: Preparation of rac-5-[(2,4-dimethylphenoxy)methyl]-3-[6-methyl-3-[3-(trifluoromethyl)phenoxy]pyridazin-4-yl]-5,6-dihydro-4H-1,2,4-oxadiazine (Compound 1.144)

Step 1: preparation of tert-butyl rac-4-[(2,4-dimethylphenoxy)methyl]-2,2-dimethyl-oxazolidine-3-carboxylate Under argon, diisopropyl azodicarboxylate (1.92 g, 9.51 mmol) was added to a solution of tert-butyl rac-4-(hydroxymethyl)-2,2-dimethyl-oxazolidine-3-carboxylate (2.0 g, 8.64 mmol), 2,4-dimethylphenol (1.16 g, 9.51 mmol) and triphenylphosphine (2.49 g, 9.51 mmol) in 2-methyltetrahydrofuran (30 mL). The reaction mixture was heated at 80° C. for 3 h, cooled to room temperature and extracted with ethyl acetate (2×200 mL). The organic layer was washed with 1M aqueous NaOH solution and brine, dried over magnesium sulfate, filtered and concentrated under reduced pressure. Purification of the residue by column chromatography on silica gel (gradient heptane/EtOAc) afforded, after evaporation of the solvents, 1.82 g (95% purity, 59% yield) of tert-butyl rac-4-[(2,4-dimethylphenoxy)methyl]-2,2-dimethyl-oxazolidine-3-carboxylate as a colorless oil.

Step 2: Preparation of rac-2-amino-3-(2,4-dimethylphenoxy)propan-1-ol

A solution of tert-butyl rac-4-[(2,4-dimethylphenoxy)methyl]-2,2-dimethyl-oxazolidine-3-carboxylate (1.8 g, 5.37 mmol) was dissolved in MeOH (25 mL) and aqueous 1M HCl solution (15 mL). The reaction mixture was stirred at 50° C. for 2 h. After cooling to room temperature, the solvents were evaporated and the residue was poured into a saturated sodium bicarbonate solution and extracted with ethyl acetate (2×200 mL). The organic extracts were dried over magnesium sulfate, filtered and concentrated under reduced pressure. Evaporation of the solvents afforded 833 mg (87% purity, 69% yield) of rac-2-amino-3-(2,4-dimethylphenoxy)propan-1-ol as a yellow oil.

Step 3: preparation of tert-butyl N-[rac-1-[(2,4-dimethylphenoxy)methyl]-2-hydroxy-ethyl]carbamate Di-tert-butyl dicarbonate (1.02 mL, 4.46 mmol) and N,N-Diisopropylethylamine (1.55 mL, 8.93 mmol) were successively added to a solution of rac-2-amino-3-(2,4-dimethylphenoxy)propan-1-ol (830 mg, 4.25 mmol) in 2-methyltetrahydrofuran (5.5 mL). The reaction mixture was stirred at room temperature for 1 h30, then it was diluted with brine and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 909 mg (97% purity, 70% yield) of tert-butyl N-[rac-1-[(2,4-dimethylphenoxy)methyl]-2-hydroxy-ethyl]carbamate as a colorless oil.

Step 4: Preparation of tert-butyl N-[rac-1-[(2,4-dimethylphenoxy)methyl]-2-(1,3-dioxoisoindolin-2-yl)oxy-ethyl]carbamate (Compound 2-13)

Under argon, diisopropyl azodicarboxylate (684 mg, 3.38 mmol) was added to a solution of tert-butyl N-[rac-1-[(2,4-dimethylphenoxy)methyl]-2-hydroxy-ethyl]carbamate (909 mg, 3.0 mmol), N-hydroxyphthalimide (552.2 mg, 3.38 mmol) and triphenylphosphine (888 mg, 3.38 mmol) in 2-methyltetrahydrofuran (10 mL). The reaction mixture was stirred at room temperature for 2 h, then extracted with ethylacetate (2×200 mL). The organic layer was washed with 1M aqueous NaOH solution and brine, dried over magnesium sulfate, filtered and concentrated under reduced pressure. Purification of the residue by column chromatography on silica gel (gradient heptane/EtOAc) afforded, after evaporation of the solvents, 1.16 g (92% purity, 79% yield) of tert-butyl N-[rac-1-[(2,4-dimethylphenoxy)methyl]-2-(1,3-dioxoisoindolin-2-yl)oxy-ethyl]carbamate as a colorless oil.

Step 5: Preparation of 2-[rac-2-amino-3-(2,4-dimethylphenoxy)propoxy]isoindoline-1,3-dione 2,2,2-trifluoroacetate (Compound 2-12)

To a solution of tert-butyl N-[rac-1-[(2,4-dimethylphenoxy)methyl]-2-(1,3-dioxoisoindolin-2-yl)oxy-ethyl]carbamate (1.16 g, 2.63 mmol) in 1,2-dichloroethane (15 mL) was added trifluoroacetic acid (1.014 mL, 13.17 mmol). The reaction mixture was stirred at room temperature for 4 h. Evaporation of the solvents afforded 1.4 g (79% purity, 93% yield) of 2-[rac-2-amino-3-(2,4-dimethylphenoxy)propoxy]isoindoline-1,3-dione; 2,2,2-trifluoroacetic acid as a yellow oil.

Step 6: Preparation of 6-methyl-N-[rac-1-[(2,4-dimethylphenoxy)methyl]-2-(1,3-dioxoisoindolin-2-yl)oxy-ethyl]-3-[3-(trifluoromethyl)phenoxy]pyridazine-4-carboxamide (Compound 3-33)

Under argon, to a solution of 6-methyl-3-[3-(trifluoromethyl)phenoxy]pyridazine-4-carboxylic acid (405 mg, 1.36 mmol) and HATU (542 mg, 1.42 mmol) in DMF (10 mL) were successively added 2-[rac-2-amino-3-(2,4-dimethylphenoxy)propoxy]isoindoline-1,3-dione; 2,2,2-trifluoroacetic acid (647 mg, 1.42 mmol) and N,N-Diisopropylethylamine (0.71 mL, 4.07 mmol). The reaction mixture was stirred for 1 h at room temperature. It was then diluted with water and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 550 mg (93% purity, 60% yield) of 6-methyl-N-[rac-1-[(2,4-dimethylphenoxy)methyl]-2-(1,3-dioxoisoindolin-2-yl)oxy-ethyl]-3-[3-(trifluoromethyl)phenoxy]pyridazine-4-carboxamide as a colorless oil.

Step 7: Preparation of 6-methyl-N-[rac-1-(aminooxymethyl)-2-(2,4-dimethylphenoxy)ethyl]-3-[3-(trifluoromethyl)phenoxy]pyridazine-4-carboxamide (Compound 4-33)

Under argon, hydrazine monohydrate (0.16 mL, 2.66 mmol) was added to a solution of 6-methyl-N-[rac-1-[(2,4-dimethylphenoxy)methyl]-2-(1,3-dioxoisoindolin-2-yl)oxy-ethyl]-3-[3-(trifluoro-methyl)phenoxy]pyridazine-4-carboxamide (550 mg, 0.89 mmol) in DCM/MeOH (16 mL, 1:1). The reaction mixture was stirred for 2 h at room temperature then concentrated. The residue was diluted with water and extracted with dichloromethane (2×200 mL). The organic extracts were dried over magnesium sulfate, filtered and concentrated under reduced pressure. Evaporation of the solvents afforded 490 mg (75% purity, 84% yield) of 6-methyl-N-[rac-1-(aminooxymethyl)-2-(2,4-dimethylphenoxy)ethyl]-3-[3-(trifluoromethyl)phenoxy]pyridazine-4-carboxamide as a white oil.

Step 8: Preparation of rac-5-[(2,4-dimethylphenoxy)methyl]-3-[6-methyl-3-[3-(trifluoro-methyl)phenoxy]pyridazin-4-yl]-5,6-dihydro-4H-1,2,4-oxadiazine Under argon, $POCl_3$ (0.22 mL, 2.39 mmol) was added at 80° C. to a solution of 6-methyl-N-[rac-1-(aminooxymethyl)-2-(2,4-dimethylphenoxy)ethyl]-3-[3-(trifluoromethyl)phenoxy]pyridazine-4-carboxamide (490 mg, 0.80 mmol) in AcCN (10 mL). The reaction mixture was stirred for 4 h at 80° C. After cooling to room temperature, the mixture was poured into a saturated sodium bicarbonate solution, then extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 89 mg (95% purity, 22% yield) of rac-5-[(2,4-dimethylphenoxy)methyl]-3-[6-methyl-3-[3-(trifluoromethyl)phenoxy] pyridazin-4-yl]-5,6-dihydro-4H-1,2,4-oxadiazine as a brown oil.

Preparation of Example 16: Preparation of rac-5-(1-methylindol-5-yl)-3-[6-methyl-3-[3-(trifluoro-methyl)phenoxy]pyridazin-4-yl]-4,5,6,7-tetrahydro-1,2,4-oxadiazepine (Compound 1.062)

Step 1: preparation of N'-allyloxy-6-methyl-3-[3-(trifluoromethyl)phenoxy]pyridazine-4-carboxamidine In analogy to step 1 of example 4.

Step 2: Preparation of 6-methyl-N'-[3-(1-methylindol-5-yl)allyloxy]-3-[3-(trifluoro-methyl)phenoxy] pyridazine-4-carboxamidine (Compound 30-01)

Under argon, a mixture of N'-allyloxy-6-methyl-3-[3-(trifluoromethyl)phenoxy]pyridazine-4-carboxamidine (500 mg, 1.42 mmol), 5-bromo-1-methyl-indole (596 mg, 2.83 mmol), triethylamine (0.40 mL, 2.84 mmol), palladium(II) acetate (32 mg, 0.14 mmol) and tri-2tolylphosphine (86 mg, 0.28 mmol) in AcCN (5 mL) was stirred at reflux for 18 h. After cooling to room temperature, the reaction mixture was diluted with a saturated ammonium chloride solution and extracted with ethyl acetate (3×30 mL). Purification of the residue by column chromatography on silica gel (gradient heptane/EtOAc) afforded, after evaporation of the solvents, 203 mg (93% purity, 27% yield) of 6-methyl-N'-[3-(1-methylindol-5-yl)allyloxy]-3-[3-(trifluoromethyl)phenoxy] pyridazine-4-carboxamidine as an oil.

Step 3: Preparation of rac-5-(1-methylindol-5-yl)-3-[6-methyl-3-[3-(trifluoromethyl)phenoxy]pyridazin-4-yl]-4,5,6,7-tetrahydro-1,2,4-oxadiazepine A solution of iodine (13.2 mg, 0.052 mmol) and phenylsilane (11.2 mg, 0.104 mmol) in dichloromethane (5 mL) was stirred at room temperature for 30 min, then 6-methyl-N'-[3-(1-methylindol-5-yl)allyloxy]-3-[3-(trifluoromethyl) phenoxy]pyridazine-4-carboxamidine (25.0 mg, 0.052 mmol) was added. The reaction mixture was stirred for 1 h, then diluted with a saturated sodium thiosulfate solution and extracted with ethyl acetate (2×50 mL). The organic extracts were dried over magnesium sulfate, filtered and concentrated under reduced pressure. Purification of the residue by PREP-HPLC afforded, after evaporation of the solvents, 8 mg (88% purity, 28% yield) of rac-5-(1-methylindol-5-yl)-3-[6-methyl-3-[3-(trifluoromethyl)phenoxy]pyridazin-4-yl]-4,5,6,7-tetrahydro-1,2,4-oxadiazepine as an oil.

Preparation of Example 17: Preparation of rac-3-[6-chloro-3-[3-(trifluoromethyl)phenoxy]pyridazin-4-yl]-5-[(2,4-dimethylphenyl)methyl]-1,4,5,6-tetrahydro-1,2,4-triazine (Compound I.173)

Step 1: Preparation of 6-chloro-N-[1-(chloromethyl)-2-(2,4-dimethylphenyl)ethyl]-3-[3-(trifluoromethyl)phenoxy]pyridazine-4-carboxamide See step 1 of example 2.

Step 2: Preparation of rac-3-[6-chloro-3-[3-(trifluoromethyl)phenoxy]pyridazin-4-yl]-5-[(2,4-dimethylphenyl)methyl]-1,4,5,6-tetrahydro-1,2,4-triazine To a solution of 6-chloro-N-[1-(chloromethyl)-2-(2,4-dimethylphenyl)ethyl]-3-[3-(trifluoro-methyl)phenoxy] pyridazine-4-carboxamide (339 mg, 0.68 mmol) in toluene (6 mL) was added phosphorous pentachloride (425 mg, 2.04 mmol). The reaction mixture was stirred at 75° C. for 1 h30, then concentrated under reduced pressure. The residue was dissolved in AcCN (4 mL) and a solution of hydrazine hydrate (170.27 mg, 3.40 mmol) was added at room temperature to the reaction mixture. After stirring at room temperature for 1 h the reaction mixture was diluted with water and extracted with ethyl acetate (2×100 mL). The organic extracts were washed with water and brine, dried over sodium sulfate, filtered and concentrated under reduced pressure. Purification of the residue by column chromatography on silica gel (gradient heptane/EtOAc) afforded, after evaporation of the solvents, 197 mg (100% purity, 60% yield) of rac-3-[6-chloro-3-[3-(trifluoromethyl)phenoxy] pyridazin-4-yl]-5-[(2,4-dimethylphenyl)methyl]-1,4,5,6-tetrahydro-1,2,4-triazine.

Preparation of Example 18: Preparation of 6-chloro-4-[rac-6-[(2,4-dimethylphenyl)methyl]-1,4,5,6-tetrahydropyrimidin-2-yl]-3-[3-(trifluoromethyl) phenoxy]pyridazine (Compound 1.117)

Step 1: preparation of tert-butyl N-[rac-1-[(2,4-dimethylphenyl)methyl]-3-hydroxy-propyl]carbamate Di-tert-butyl dicarbonate (2.13 g, 9.79 mmol) and triethylamine (2.73 mL, 19.6 mmol) were successively added at 0° C. to a suspension of rac-3-amino-4-(2,4-dimethylphenyl)butan-1-ol hydrochloride (1.5 g, 6.52 mmol) in tetrahydrofuran (10 mL). The reaction mixture was stirred at room temperature for 18 h, then concentrated under reduced pressure. Purification of the residue by column chromatography on silica gel (gradient heptane/EtOAc) afforded, after evaporation of the solvents, 1.8 g (97% purity, 91% yield) of tert-butyl N-[rac-1-[(2,4-dimethylphenyl)methyl]-3-hydroxy-propyl]carbamate as a white solid.

Step 2: preparation of tert-butyl N-[rac-1-[(2,4-dimethylphenyl)methyl]-3-(1,3-dioxoisoindolin-2-yl)propyl]carbamate Under argon, diethyl azodicarboxylate (6.87 g, 15.3 mmol) was added at 0° C. to a solution of tert-butyl N-[rac-1-[(2,4-dimethylphenyl)methyl]-3-hydroxy-propyl] carbamate (1.8 g, 6.13 mmol), phthalimide (5.41 g, 36.8 mmol) and triphenylphosphine (9.65 g, 36.8 mmol) in tetrahydrofuran (200 mL). The reaction mixture was stirred at room temperature for 24 h, diluted with water and extracted with ethylacetate (3×200 mL). The organic layer was washed with brine, dried over magnesium sulfate, filtered and concentrated under reduced pressure. Purification of the residue by column chromatography on silica gel (gradient heptane/EtOAc) afforded, after evaporation of the solvents, 2.0 g (84% purity, 60% yield) of tert-butyl N-[rac-1-[(2,4-dimethylphenyl)methyl]-3-(1,3-dioxoisoindolin-2-yl)propyl]carbamate as a colorless oil.

Step 3: Preparation of 2-[rac-3-amino-4-(2,4-dimethylphenyl)butyl]isoindoline-1,3-dione; 2,2,2-trifluoroacetate To a solution of tert-butyl N-[rac-1-[(2,4-dimethylphenyl) methyl]-3-(1,3-dioxoisoindolin-2-yl)propyl]carbamate (1.2 g, 2.84 mmol) in dichloromethane (20 mL) was added trifluoroacetic acid (0.65 mL, 8.52 mmol). The reaction mixture was stirred at room temperature for 3 days. Evaporation of the solvents afforded 1.2 g (54% purity, 52% yield) of 2-[rac-3-amino-4-(2,4-dimethylphenyl)butyl]isoindoline-1,3-dione; 2,2,2-trifluoroacetic acid as a solid.

Step 4: Preparation of rac-4-(2,4-dimethylphenyl)butane-1,3-diamine

Under argon, hydrazine monohydrate (3.73 mL, 41.24 mmol) was added to a solution of 2-[rac-3-amino-4-(2,4-dimethylphenyl)butyl]isoindoline-1,3-dione; 2,2,2-trifluoroacetic acid (1.2 g, 2.75 mmol) in EtOH (5 mL). The reaction mixture was stirred for 3 days at room temperature then concentrated. It was then diluted with water and extracted with dichloromethane (2×200 mL). The organic extracts were dried over magnesium sulfate, filtered and concentrated under reduced pressure. The residue was stirred in MTBE and the white solid that formed was filtered off. Concentration of the filtrate afforded 520 mg (95% purity, 93% yield) of rac-4-(2,4-dimethylphenyl)butane-1,3-diamine as a white solid.

Step 5: Preparation of methyl 6-chloro-3-[3-(trifluoromethyl)phenoxy]pyridazine-4-carboximidate See step 1 of example 5 starting from 6-chloro-3-[3-(trifluoromethyl)phenoxy]pyridazine-4-carbonitrile (100 mg, 0.33 mmol)

Step 6: Preparation of 6-chloro-4-[rac-6-[(2,4-dimethylphenyl)methyl]-1,4,5,6-tetrahydropyrimidin-2-yl]-3-[3-(trifluoromethyl)phenoxy]pyridazine To the previous solution of methyl 6-chloro-3-[3-(trifluoromethyl)phenoxy]pyridazine-4-carboximidate was added at 0° C. rac-4-(2,4-dimethylphenyl)butane-1,3-diamine (124 mg, 0.45 mmol) dissolved in MeOH (0.5 mL) and acetic acid (9 μL). The reaction mixture was stirred at room temperature for 5 h, then the mixture was poured into a saturated sodium bicarbonate solution and extracted with ethyl acetate (2×50 mL). The organic extracts were washed with brine, dried over sodium sulfate, filtered and concentrated under reduced pressure. Purification of the residue by column chromatography on silica gel (gradient heptane/EtOAc) afforded, after evaporation of the solvents, 26 mg (90% purity, 16% yield) of 6-chloro-4-[rac-6-[(2,4-dimethylphenyl)methyl]-1,4,5,6-tetrahydropyrimidin-2-yl]-3-[3-(trifluoromethyl)phenoxy]pyridazine as a yellow oil.

Preparation of Example 19: Preparation of rac-6,6-difluoro-5-(4-methoxyphenyl)-3-[6-methyl-3-[3-(trifluoromethyl)phenoxy]pyridazin-4-yl]-4,5-dihydro-1,2,4-oxadiazine (Compound I.154)

Step 1: preparation of N'-hydroxy-6-methyl-3-[3-(trifluoromethyl)phenoxy]pyridazine-4-carboxamidine (Compound 10-02)

See step 3 of example 3

Step 2: Preparation of N'-[1,1-difluoro-2-(4-methoxyphenyl)-2-oxo-ethoxy]-6-methyl-3-[3-(trifluoro-methyl)phenoxy]pyridazine-4-carboxamidine (Compound 12-14)

Under argon, 2-tert-butylimino-N,N-diethyl-1,3-dimethyl-1,3,2lambda5-diazaphosphinan-2-amine (BEMP) (105 mg, 0.38 mmol) was added at room temperature to a solution of N'-hydroxy-6-methyl-3-[3-(trifluoromethyl)phenoxy]pyridazine-4-carboxamidine (100 mg, 0.32 mmol) in AcCN (1.5 mL). After 15 min, 2-bromo-2,2-difluoro-1-(4-methoxyphenyl)ethanone (127 mg, 0.48 mmol) was added and the reaction was stirred further for 15 min. The reaction mixture was diluted with a saturated ammonium chloride solution and extracted with ethyl acetate (2×50 mL). The organic extracts were dried over magnesium sulfate, filtered and concentrated under reduced pressure. Evaporation of the solvents afforded 222 mg (27% purity, 80% yield) of N'-[1,1-difluoro-2-(4-methoxyphenyl)-2-oxo-ethoxy]-6-methyl-3-[3-(trifluoromethyl)phenoxy]pyridazine-4-carboxamidine as an oil.

Step 3: Preparation of rac-6,6-difluoro-5-(4-methoxyphenyl)-3-[6-methyl-3-[3-(trifluoro-methyl)phenoxy]pyridazine-4-yl]-4,5-dihydro-1,2,4-oxadiazine Under argon, N'-[1,1-difluoro-2-(4-methoxyphenyl)-2-oxo-ethoxy]-6-methyl-3-[3-(trifluoro-methyl)phenoxy]pyridazine-4-carboxamidine (222 mg, 0.25 mmol) was dissolved in tert-butanol (6.4 mL) and acetic acid (1.6 mL) and heated to 80° C. After 30 min, sodium cyanoborohydride (21 mg, 0.34 mmol) was added and the reaction was stirred further for 2 h. After cooling to room temperature, the mixture was poured into a 1M aqueous NaOH solution and extracted with ethyl acetate (2×20 mL). The organic extracts were dried over magnesium sulfate, filtered and concentrated under reduced pressure. Purification of the residue by PREP-HPLC afforded, after evaporation of the solvents, 4 mg (96% purity, 3% yield) of rac-6,6-difluoro-5-(4-methoxyphenyl)-3-[6-methyl-3-[3-(trifluoromethyl)phenoxy]pyridazin-4-yl]-4,5-dihydro-1,2,4-oxadiazine as a yellow solid.

Preparation of Example 20: Preparation of rac-3-[6-chloro-3-(3-cyclopropyl-2-fluoro-phenoxy)-5-methyl-pyridazin-4-yl]-5-[(2,4-dimethylphenyl)methyl]-5,6-dihydro-4H-1,2,4-oxadiazine (Compound 1.058)

Step 1: preparation of isopropyl 6-chloro-3-(3-cyclopropyl-2-fluoro-phenoxy)-5-methyl-pyridazine-4-carboxylate (Compound 1-24)

To a solution of isopropyl 6-chloro-3-(3-cyclopropyl-2-fluoro-phenoxy)pyridazine-4-carboxylate (800 mg, 2.28 mmol) in dimethyl sulfoxide (2.5 mL) was added nitromethane (0.62 mL, 11.40 mmol). The reaction was stirred at room temperature for 30 min, then triethylamine (0.48 mL, 3.42 mmol) was added. The reaction was stirred at room temperature for 24 h, then it was diluted with water and extracted with ethyl acetate (2×100 mL). The organic extracts were dried over magnesium sulfate, filtered and concentrated under reduced pressure. Evaporation of the solvents afforded 917 mg (76% purity, 84% yield) of isopropyl 6-chloro-3-(3-cyclopropyl-2-fluoro-phenoxy)-5-methyl-pyridazine-4-carboxylate as an orange oil.

Step 2: Preparation of 6-chloro-3-(3-cyclopropyl-2-fluoro-phenoxy)-5-methyl-pyridazine-4-carboxylic acid (Compound 1-02)

To a solution of isopropyl 6-chloro-3-(3-cyclopropyl-2-fluoro-phenoxy)-5-methyl-pyridazine-4-carboxylate (927 mg, 2.5 mmol) in tetrahydrofuran (4 mL) was added a 2M aqueous solution of lithium hydroxide (182 mg, 7.62 mmol). The reaction was stirred for 4 days at room temperature then it was diluted with water. The aqueous phase was acidified with 1M aqueous HCl solution and extracted with ethyl acetate (3×200 mL). The organic extracts were dried over magnesium sulfate, filtered and concentrated under reduced pressure. Evaporation of the solvents afforded 617 mg (81% purity, 60% yield) of 6-chloro-3-(3-cyclopropyl-2-fluoro-phenoxy)-5-methyl-pyridazine-4-carboxylic acid as a solid.

Step 3: Preparation of 6-chloro-3-(3-cyclopropyl-2-fluoro-phenoxy)-5-methyl-N-[rac-1-[(2,4-dimethylphenyl)methyl]-2-(1,3-dioxoisoindolin-2-yl)oxy-ethyl]pyridazine-4-carboxamide Under argon, to a solution of 6-chloro-3-(3-cyclopropyl-2-fluoro-phenoxy)-5-methyl-pyridazine-4-carboxylic acid (500 mg, 1.55 mmol) and HATU (648 mg, 1.70 mmol) in DMF (10 mL) were successively added at 0° C., 2-[rac-2-amino-3-(2,4-dimethylphenyl)propoxy]isoindoline-1,3-dione 2,2,2-trifluoroacetate (747 mg, 1.70 mmol) and N,N-Diisopropylethylamine (0.80 mL, 4.64 mmol). After 15 min at 0° C., the reaction mixture was stirred for 18 h at room temperature. It was then diluted with water and extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 639.5 g (100% purity, 65% yield) of 6-chloro-3-(3-cyclopropyl-2-fluoro-phenoxy)-5-methyl-N-[rac-1-[(2,4-dimethylphenyl)methyl]-2-(1,3-dioxoisoindolin-2-yl)oxy-ethyl]pyridazine-4-carboxamide as a solid.

Step 4: Preparation of 6-chloro-3-(3-cyclopropyl-2-fluoro-phenoxy)-5-methyl-N-[rac-1-(aminooxymethyl)-2-(2,4-dimethylphenyl)ethyl]pyridazine-4-carboxamide Under argon, hydrazine monohydrate (0.18 mL, 3.0 mmol) was added to a solution of 6-chloro-3-(3-cyclopropyl-2-fluoro-phenoxy)-5-methyl-N-[rac-1-[(2,4-dimethylphenyl)methyl]-2-(1,3-dioxoisoindolin-2-yl)oxy-ethyl]pyridazine-4-carboxamide (639 mg, 1.0 mmol) in DCM/MeOH (12 mL, 1:1). The reaction mixture was stirred for 18 h at room temperature and concentrated. It was then diluted with water and extracted with dichloromethane (2×200 mL). The organic extracts were dried over magnesium sulfate, filtered and concentrated under reduced pressure. Evaporation of the solvents afforded 453 mg (100% purity, 89% yield) of 6-chloro-3-(3-cyclopropyl-2-fluoro-phenoxy)-5-methyl-N-[rac-1-(aminooxymethyl)-2-(2,4-dimethylphenyl)ethyl]pyridazine-4-carboxamide as a white oil.

Step 5: Preparation of rac-3-[6-chloro-3-(3-cyclopropyl-2-fluoro-phenoxy)-5-methyl-pyridazin-4-yl]-5-[(2,4-dimethylphenyl)methyl]-5,6-dihydro-4H-1,2,4-oxadiazine Under argon, $POCl_3$ (0.25 mL, 2.72 mmol) was added at 80° C. to a solution 6-chloro-3-(3-cyclopropyl-2-fluoro-phenoxy)-5-methyl-N-[rac-1-(aminooxymethyl)-2-(2,4-dimethylphenyl)ethyl]pyridazine-4-carboxamide (453 mg, 0.90 mmol) in AcCN (5 mL). The reaction mixture was stirred for 18 h at 80° C. After cooling to room temperature, the mixture was poured into a saturated sodium bicarbonate solution, then extracted with ethyl acetate (2×200 mL). The organic extracts were dried over magnesium sulfate, filtered and concentrated under reduced pressure. Purification of the residue by column chromatography on silica gel (gradient heptane/EtOAc) afforded, after evaporation of the solvents, 196 mg (100% purity, 44% yield) of rac-3-[6-chloro-3-(3-cyclopropyl-2-fluoro-phenoxy)-5-methyl-pyridazin-4-yl]-5-[(2,4-dimethylphenyl)methyl]-5,6-dihydro-4H-1,2,4-oxadiazine as a yellow solid.

The compounds as shown in table 1 below were prepared in analogy with the examples provided above or following methods described herein. $^1H$-NMR data of these compounds is shown in table 2.

TABLE 1

Compounds according to formula (I)

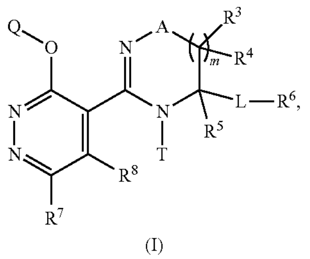

(I)

wherein

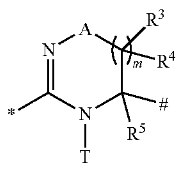

TABLE 1-continued
| Compounds according to formula (I) |
|---|
| 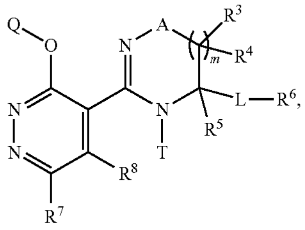 |
| (I) |
in table 1 has the following meanings:
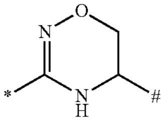
Ring 1
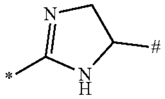
Ring 2
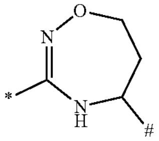
Ring 3
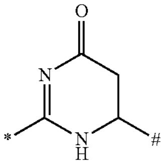
Ring 4
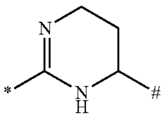
Ring 5
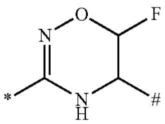
Ring 6
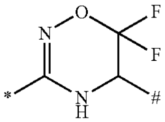
Ring 7

TABLE 1-continued
Compounds according to formula (I)
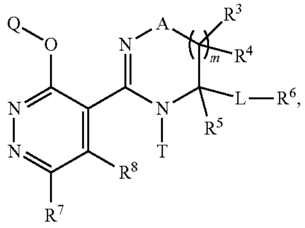
(I)
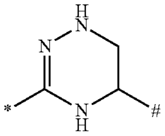
Ring 8
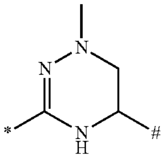
Ring 9
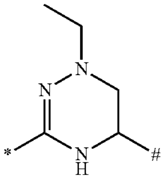
Ring 10
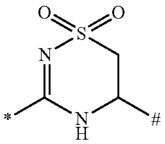
Ring 11
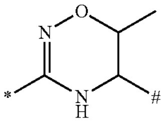
Ring 12
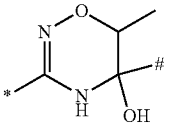
Ring 13
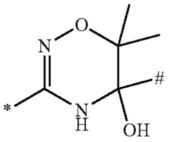
Ring 14

TABLE 1-continued

Compounds according to formula (I)

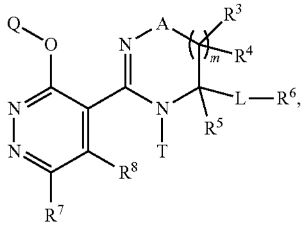

(I)

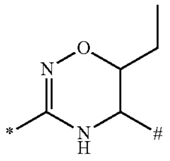

Ring 15

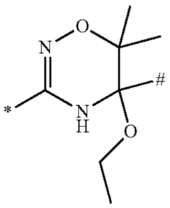

Ring 16

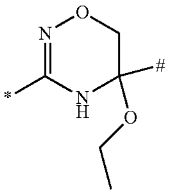

Ring 17

In table 1, "#" denotes the point of attachment to the L—$R^6$ group and "*" denotes the point of attachment to the pyridazin-4-yl group.

| Ex N° | $R^7$ | $R^8$ | Q | 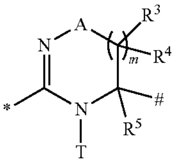 | L—$R^6$ | LogP |
|---|---|---|---|---|---|---|
| I-001 | chloro | H | 3-cyclopropyl-2-fluorophenyl | Ring 1 | (2,4-dimethylphenyl)methyl | 4.61[a] |
| I-002 | methylamino | H | 3-(trifluoromethyl)phenyl | Ring 1 | (2,4-dimethylphenyl)methyl | 2.84[a] |
| I-003 | chloro | H | 3-(trifluoromethyl)phenyl | Ring 1 | (4-chlorophenyl)methyl | 3.99[a]; 3.96[b] |
| I-004 | methyl | H | 2-fluoro-3-(trifluoromethyl) phenyl | Ring 1 | (2,4-dimethylphenyl)methyl | 3.99[a] |
| I-005 | chloro | H | 2-fluoro-3-methoxyphenyl | Ring 1 | (2,4-dimethylphenyl)methyl | 3.91[a] |
| I-006 | methyl | methoxy | 3-chlorophenyl | Ring 1 | (2,4-dimethylphenyl)methyl | 3.50[a] |
| I-007 | chloro | H | 3-(trifluoromethyl)phenyl | Ring 2 | (2,4-dichlorophenyl)methyl | 2.39[a] |
| I-008 | cyclopropyl-amino | H | 3-(trifluoromethyl)phenyl | Ring 1 | (2,4-dimethylphenyl)methyl | 3.17[a] |
| I-009 | 1-ethoxyethen-1-yl | H | 3-(trifluoromethyl)phenyl | Ring 1 | (2,4-dimethylphenyl)methyl | 4.98[a] |
| I-010 | methyl | H | 3-(trifluoromethyl)phenyl | Ring 1 | 2,4-dichlorophenyl | 3.85[a]; 3.80[b] |
| I-011(*) | methyl | H | 3-(trifluoromethyl)phenyl | Ring 1 | 1-methyl-1H-indol-3-yl | 3.23[a] |
| I-012 | ethyl | H | 3-(trifluoromethyl)phenyl | Ring 1 | (2,4-dimethylphenyl)methyl | 4.20[a] |
| I-013(*) | methyl | H | 3-(difluoromethyl)phenyl | Ring 1 | (2,4-dimethylphenyl)methyl | 3.29[a] |

TABLE 1-continued

Compounds according to formula (I)

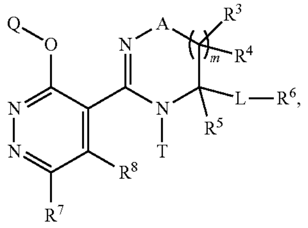

(I)

| | | | | | | |
|---|---|---|---|---|---|---|
| I-014 | vinyl | H | 3-(trifluoromethyl)phenyl | Ring 1 | (2,4-dimethylphenyl)methyl | 4.25[a] |
| I-015 | methyl | H | 3-(trifluoromethyl)phenyl | Ring 1 | naphthalen-2-yl | 3.48[a] |
| I-016(*) | chloro | H | 3-(trifluoromethyl)phenyl | Ring 1 | (4-bromo-2-chlorophenyl)methyl | 4.61[a] |
| I-017(*) | chloro | H | 3-(trifluoromethyl)phenyl | Ring 1 | (4-bromo-2-methylphenyl)methyl | 4.49[a] |
| I-018 | methyl | H | 3-(trifluoromethyl)phenyl | Ring 1 | 3,4-dimethylphenyl | 3.58[a] |
| I-019 | chloro | H | 3-(trifluoromethyl)phenyl | Ring 1 | (4-cyclopropyl-2-methylphenyl)methyl | 4.67[a] |
| I-020 | chloro | H | 3-(trifluoromethyl)phenyl | Ring 1 | (2-chloro-4-cyclopropylphenyl)methyl | 4.74[a] |
| I-021 | chloro | H | 3-(trifluoromethyl)phenyl | Ring 1 | (2-chloro-4-isopropylphenyl)methyl | 5.11[a] |
| I-022 | chloro | H | 3-(trifluoromethyl)phenyl | Ring 1 | (3,4-dimethylphenyl)methyl | 4.41[a] |
| I-023 | chloro | H | 3-(trifluoromethyl)phenyl | Ring 1 | (4-isopropyl-2-methylphenyl)methyl | 5.03[a] |
| I-024 | chloro | H | 3-(difluoromethyl)-2-fluorophenyl | Ring 1 | (2,4-dimethylphenyl)methyl | 4.08[a] |
| I-025(*) | chloro | H | 3-(trifluoromethyl)phenyl | Ring 1 | (2,4-dichlorophenyl)methyl | 4.51[a] |
| I-026 | methyl | H | 3-(trifluoromethyl)phenyl | Ring 3 | 3-methylphenyl | 3.30[a] |
| I-027(*) | methyl | H | 3-cyclopropyl-2-fluorophenyl | Ring 1 | (4-bromo-2-chlorophenyl)methyl | 4.28[a] |
| I-028 | methyl | H | 3-(difluoromethyl)phenyl | Ring 1 | (2,4-dichlorophenyl)methyl | 3.50[a] |
| I-029 | methyl | H | 3-(trifluoromethyl)phenyl | Ring 1 | furan-2-yl | 2.62[a] |
| I-030(*) | methyl | H | 3-cyclopropyl-2-fluorophenyl | Ring 1 | (2,4-dichlorophenyl)methyl | 4.23[a] |
| I-031 | methyl | H | 3-(trifluoromethyl)phenyl | Ring 1 | phenyl | 2.94[a] |
| I-032 | methyl | H | 3-(trifluoromethyl)phenyl | Ring 1 | (2-chloro-4-isopropylphenyl)methyl | 4.56[a] |
| I-033 | chloro | H | 3-(2,2-difluorocyclopropyl)phenyl | Ring 1 | (4-bromo-2-chlorophenyl)methyl | 4.42[a] |
| I-034 | chloro | methyl | 3-(trifluoromethyl)phenyl | Ring 1 | (2,4-dimethylphenyl)methyl | 4.12[a] |
| I-035 | methyl | H | 3-(trifluoromethyl)phenyl | Ring 1 | (4-isopropyl-2-methylphenyl)methyl | 4.49[a] |
| I-036 | methyl | H | 2-fluoro-3-(trifluoromethyl)phenyl | Ring 1 | (2,4-dichlorophenyl)methyl | 4.03[a] |
| I-037 | chloro | methylamino | 3-(trifluoromethyl)phenyl | Ring 1 | (2,4-dimethylphenyl)methyl | 3.69[a] |
| I-038 | methyl | H | 3-(trifluoromethyl)phenyl | Ring 1 | (2-chloro-4-cyclopropylphenyl)methyl | 4.18[a] |
| I-039 | chloro | H | 3-(1-fluorocyclopropyl)phenyl | Ring 1 | (2,4-dimethylphenyl)methyl | 4.34[a] |
| I-040 | methyl | H | 3-(trifluoromethyl)phenyl | Ring 1 | 4-chlorophenyl | 3.29[a] |
| I-041 | chloro | cyclopropylamino | 3-(trifluoromethyl)phenyl | Ring 1 | (2,4-dimethylphenyl)methyl | 4.03[a] |
| I-042 | acetyl | H | 3-(trifluoromethyl)phenyl | Ring 1 | (2,4-dimethylphenyl)methyl | 4.27[a] |
| I-043 | methyl | chloro | 3-chlorophenyl | Ring 1 | (2,4-dimethylphenyl)methyl | 3.83[a] |
| I-044 | chloro | H | 3-(2,2-difluorocyclopropyl)phenyl | Ring 1 | (2,4-dimethylphenyl)methyl | 4.24[a] |
| I-045 | methyl | H | 3-cyclopropyl-2-fluorophenyl | Ring 1 | (3,4-dimethylphenyl)methyl | 4.01[a] |
| I-046 | pyridin-4-yl | H | 3-(trifluoromethyl)phenyl | Ring 1 | (2,4-dimethylphenyl)methyl | 3.37[a] |
| I-047 | chloro | H | 2-fluoro-3-methylsulfanylphenyl | Ring 1 | (2,4-dimethylphenyl)methyl | 4.33[a] |
| I-048 | chloro | H | 2-fluoro-3-(trifluoromethoxy)phenyl | Ring 1 | (2,4-dimethylphenyl)methyl | 4.61[a] |
| I-049 | chloro | H | 3-(trifluoromethyl)phenyl | Ring 1 | 2,4-dichlorophenyl | 4.30[a]; 4.23[b] |
| I-050 | methyl | H | 3-cyclopropylphenyl | Ring 1 | (2,4-dimethylphenyl)methyl | 3.90[a] |
| I-051(*) | chloro | H | 3-(trifluoromethyl)phenyl | Ring 1 | (2,4-dimethylphenyl)methyl | 4.39[a] |
| I-052(*) | methyl | H | 3-cyclopropyl-2-fluorophenyl | Ring 1 | (2,4-dimethylphenyl)methyl | 4.01[a] |
| I-053(*) | chloro | H | 3-(trifluoromethyl)phenyl | Ring 1 | (2,4-dimethylphenyl)methyl | 4.39[a] |
| I-054 | methyl | H | 3-(trifluoromethyl)phenyl | Ring 1 | indan-5-yl | 3.67[a] |
| I-055(*) | methyl | methyl | 3-(trifluoromethyl)phenyl | Ring 1 | (2,4-dimethylphenyl)methyl | 3.63[a] |
| I-056(*) | methyl | H | 3-cyclopropyl-2-fluorophenyl | Ring 1 | (4-bromo-2-methylphenyl)methyl | 4.12[a] |
| I-057 | methyl | H | 3-cyclopropyl-2-fluorophenyl | Ring 1 | (4-cyclopropyl-2-methylphenyl)methyl | 4.28[a] |
| I-058 | chloro | methyl | 3-cyclopropyl-2-fluorophenyl | Ring 1 | (2,4-dimethylphenyl)methyl | 4.30[a] |
| I-059(*) | chloro | H | 3-(trifluoromethyl)phenyl | Ring 1 | (2,4-dimethylphenyl)methyl | 4.39[a] |
| I-060 | 3-chloropyridin-4-yl | H | 3-(trifluoromethyl)phenyl | Ring 1 | (2,4-dimethylphenyl)methyl | 4.37[a] |
| I-061 | methyl | H | 3-(trifluoromethyl)phenyl | Ring 1 | 4-methoxyphenyl | 2.90[a] |
| I-062 | methyl | H | 3-(trifluoromethyl)phenyl | Ring 3 | 1-methyl-1H-indol-5-yl | 1.92[a] |
| I-063 | (1Z)-1-(methoxyimino)ethyl | H | 3-(trifluoromethyl)phenyl | Ring 1 | (2,4-dimethylphenyl)methyl | 4.53[a] |
| I-064 | (1E)-1-(methoxyimino)ethyl | H | 3-(trifluoromethyl)phenyl | Ring 1 | (2,4-dimethylphenyl)methyl | 4.96[a] |
| I-065 | chloro | iodo | 3-(trifluoromethyl)phenyl | Ring 1 | (2,4-dimethylphenyl)methyl | 4.37[a] |
| I-066 | 1-hydroxyethyl | H | 3-(trifluoromethyl)phenyl | Ring 1 | (2,4-dimethylphenyl)methyl | 3.55[a] |
| I-067 | 1-fluoroethyl | H | 3-(trifluoromethyl)phenyl | Ring 1 | (2,4-dimethylphenyl)methyl | 4.30[a] |

TABLE 1-continued

Compounds according to formula (I)

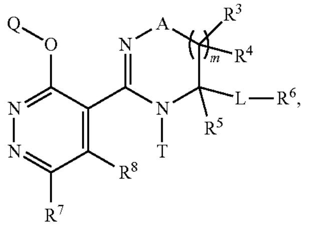

(I)

| | | | | | | |
|---|---|---|---|---|---|---|
| I-068 | cyclopropyl | H | 3-(trifluoromethyl)phenyl | Ring 1 | (2,4-dimethylphenyl)methyl | 4.47[a] |
| I-069 | 2-trimethylsilyl-ethyn-1-yl | H | 3-(trifluoromethyl)phenyl | Ring 1 | (2,4-dimethylphenyl)methyl | 5.54[a] |
| I-070(*) | chloro | H | 3-(trifluoromethyl)phenyl | Ring 1 | benzyl | 3.81[a] |
| I-071 | ethynyl | H | 3-(trifluoromethyl)phenyl | Ring 1 | (2,4-dimethylphenyl)methyl | 3.59[a] |
| I-072 | chloro | 2-methoxyethoxy | 3-(trifluoromethyl)phenyl | Ring 1 | (2,4-dimethylphenyl)methyl | 4.18[a] |
| I-073 | 1H-imidazol-1-yl | H | 3-(trifluoromethyl)phenyl | Ring 1 | (2,4-dimethylphenyl)methyl | 3.11[a] |
| I-074 | methyl | H | 3-(trifluoromethyl)phenyl | Ring 1 | 2-hydroxy-3,5-dimethylphenyl | 3.01[a] |
| I-075 | methyl | H | 3-cyclopropyl-2-fluorophenyl | Ring 1 | (2-chloro-4-cyclopropylphenyl)methyl | 4.39[a] |
| I-076 | chloro | methyl | 3-cyclopropyl-2-fluorophenyl | Ring 1 | (2,4-dichlorophenyl)methyl | 4.51[a] |
| I-077 | chloro | H | 3-cyclopropylphenyl | Ring 4 | 2,4-dimethylphenyl | 4.11[a] |
| I-078 | chloro | H | 3-cyclopropylphenyl | Ring 4 | (2,4-dimethylphenyl)methyl | 4.31[a] |
| I-079 | methyl | H | 3-(trifluoromethyl)phenyl | Ring 3 | (2,4-dichlorophenyl)methyl | 3.97[a] |
| I-080 | methyl | H | 3-(trifluoromethyl)phenyl | Ring 13 | 4-chlorophenyl | 3.35[a] |
| I-081 | methyl | H | 3-(trifluoromethyl)phenyl | Ring 12 | 4-chlorophenyl | 3.45[a] |
| I-082 | chloro | H | 5-bromopyridin-3-yl | Ring 1 | (2,4-dimethylphenyl)methyl | 3.67[a] |
| I-083 | chloro | H | 6-chloro-5-(trifluoromethyl) pyridin-3-yl | Ring 1 | (2,4-dimethylphenyl)methyl | 4.41[a] |
| I-084 | chloro | methyl | 3-cyclopropyl-2-fluorophenyl | Ring 1 | (4-bromo-2-chlorophenyl)methyl | 4.61[a] |
| I-085 | chloro | methyl | 3-cyclopropyl-2-fluorophenyl | Ring 1 | (2-chloro-4-cyclopropylphenyl)methyl | 4.69[a] |
| I-086 | chloro | H | 3-cyclopropylphenyl | Ring 1 | (2,4-dimethylphenyl)methyl | 4.53[a] |
| I-087 | methyl | H | 3-(trifluoromethyl)phenyl | Ring 1 | 2,3-dihydro-1-benzofuran-5-yl | 2.88[a] |
| I-088 | chloro | pyridin-4-yl | 3-(trifluoromethyl)phenyl | Ring 1 | (2,4-dimethylphenyl)methyl | 3.76[a] |
| I-089 | vinyl | H | 3-cyclopropyl-2-fluorophenyl | Ring 1 | (2,4-dimethylphenyl)methyl | 4.46[a] |
| I-090 | methyl | H | 3-(trifluoromethyl)phenyl | Ring 1 | 2,5-dimethyl-3-thienyl | 3.44[a] |
| I-091 | methyl | H | 3-(trifluoromethyl)phenyl | Ring 1 | 5-methyl-2-thienyl | 3.11[a] |
| I-092 | methyl | H | 3-(trifluoromethyl)phenyl | Ring 1 | 1-methyl-1H-pyrrolo[2,3-b] pyridin-3-yl | 2.25[a] |
| I-093 | methyl | H | 3-(trifluoromethyl)phenyl | Ring 1 | 2-(4-chloro-2,6-difluorophenyl)ethyl | 3.96[a] |
| I-094 | methyl | H | 3-(trifluoromethyl)phenyl | Ring 1 | (4-methylphenyl)methyl | 3.58[a] |
| I-095 | methyl | H | 3-(trifluoromethyl)phenyl | Ring 14 | 2,4-difluorophenyl | 3.13[a] |
| I-096 | methyl | H | 3-(trifluoromethyl)phenyl | Ring 15 | 2,4-dichlorophenyl | 4.56[a] |
| I-097 | chloro | H | 5-(difluoromethyl)pyridin-3-yl | Ring 1 | (2,4-dimethylphenyl)methyl | 3.42[a] |
| I-098 | 1-ethoxyethen-1-yl | H | 3-cyclopropylphenyl | Ring 1 | (2,4-dimethylphenyl)methyl | 5.11[a] |
| I-099 | methyl | H | 3-(trifluoromethyl)phenyl | Ring 1 | 5-chloro-2-thienyl | 3.25[a] |
| I-100 | methyl | H | 3-(trifluoromethyl)phenyl | Ring 1 | 5-methyl-2-furyl | 2.92[a] |
| I-101 | methyl | H | 3-(trifluoromethyl)phenyl | Ring 1 | 2,5-dimethyl-3-furyl | 3.13[a] |
| I-102 | methyl | H | 3-(trifluoromethyl)phenyl | Ring 1 | 4,5-dimethyl-2-furyl | 3.21[a] |
| I-103 | methyl | H | 3-(trifluoromethyl)phenyl | Ring 1 | 5-chloro-2-methyl-3-thienyl | 3.57[a] |
| I-104 | methyl | H | 3-(trifluoromethyl)phenyl | Ring 1 | 6-chloro-1-methyl-1H-indol-3-yl | 3.57[a] |
| I-105 | methyl | H | 3-(trifluoromethyl)phenyl | Ring 1 | thiophen-2-yl | 2.80[a] |
| I-106 | methyl | H | 3-(trifluoromethyl)phenyl | Ring 1 | 1-benzothiophen-3-yl | 3.44[a] |
| I-107 | methyl | H | 3-(trifluoromethyl)phenyl | Ring 1 | 5-chloro-4-methyl-2-thienyl | 3.62[a] |
| I-108 | pyrrolidin-1-yl | H | 3-(trifluoromethyl)phenyl | Ring 1 | (2,4-dimethylphenyl)methyl | 3.37[a] |
| I-109 | vinyl | H | 3-cyclopropylphenyl | Ring 1 | (2,4-dimethylphenyl)methyl | 4.36[a] |
| I-110 | ethyl | H | 3-cyclopropyl-2-fluorophenyl | Ring 1 | (2,4-dimethylphenyl)methyl | 4.44[a] |
| I-111 | ethyl | H | 3-cyclopropylphenyl | Ring 1 | (2,4-dimethylphenyl)methyl | 4.29[a] |
| I-112 | 1-ethoxyethen-1-yl | H | 3-cyclopropyl-2-fluorophenyl | Ring 1 | (2,4-dimethylphenyl)methyl | 5.27[a] |
| I-113 | chloro | H | 2-fluoro-3-vinylphenyl | Ring 1 | (2,4-dimethylphenyl)methyl | 4.46[a] |
| I-114 | methyl | H | 3-(trifluoromethyl)phenyl | Ring 1 | 1-benzofuran-2-yl | 3.31[a] |
| I-115 | methyl | H | 3-(trifluoromethyl)phenyl | Ring 1 | 3-methyl-2-thienyl | 3.11[a] |
| I-116 | methyl | H | 3-(trifluoromethyl)phenyl | Ring 1 | 4-methyl-2-thienyl | 3.15[a] |
| I-117 | chloro | H | 3-(trifluoromethyl)phenyl | Ring 5 | (2,4-dimethylphenyl)methyl | 2.56[a] |
| I-118 | chloro | H | 3-cyclopropylphenyl | Ring 5 | (2,4-dimethylphenyl)methyl | 2.41[a] |
| I-119(*) | methyl | H | 3-cyclopropyl-2-fluorophenyl | Ring 1 | (2,4-dimethylphenyl)methyl | 4.12[a] |
| I-120 | acetyl | H | 3-cyclopropyl-2-fluorophenyl | Ring 1 | (2,4-dimethylphenyl)methyl | 4.49[a] |
| I-121 | acetyl | H | 3-cyclopropylphenyl | Ring 1 | (2,4-dimethylphenyl)methyl | 4.37[a] |
| I-122 | 1-hydroxyethyl | H | 3-cyclopropyl-2-fluorophenyl | Ring 1 | (2,4-dimethylphenyl)methyl | 3.70[a] |
| I-123 | chloro | H | 3-cyclopropylphenyl | Ring 1 | (2,4-dichlorophenyl)methyl | 4.67[a] |
| I-124 | 1-fluoroethyl | H | 3-cyclopropyl-2-fluorophenyl | Ring 1 | (2,4-dimethylphenyl)methyl | 4.59[a] |
| I-125 | 1-fluoroethyl | H | 3-cyclopropylphenyl | Ring 1 | (2,4-dimethylphenyl)methyl | 4.46[a] |

TABLE 1-continued

Compounds according to formula (I)

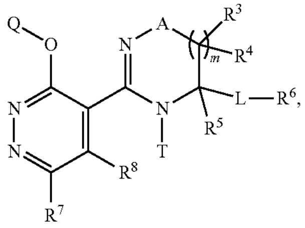

(I)

| | | | | | | |
|---|---|---|---|---|---|---|
| I-126 | methyl | H | 3-(trifluoromethyl)phenyl | Ring 1 | (2,4-dimethylphenyl)methoxy | 3.55[a] |
| I-127 | vinyl | H | 3-cyclopropylphenyl | Ring 1 | (2,4-dichlorophenyl)methyl | 4.44[a] |
| I-128 | chloro | methyl | 5-(difluoromethyl)pyridin-3-yl | Ring 1 | (2,4-dimethylphenyl)methyl | 3.21[a] |
| I-129 | ethyl | H | 3-cyclopropylphenyl | Ring 1 | (2,4-dichlorophenyl)methyl | 4.37[a] |
| I-130(*) | methyl | H | 3-cyclopropyl-2-fluorophenyl | Ring 1 | (2,4-dimethylphenyl)methyl | 4.12[a] |
| I-131 | methyl | H | 3-(trifluoromethyl)phenyl | Ring 1 | (2,4-dimethylphenyl)thio | 3.92[a] |
| I-132 | methyl | H | 3-(trifluoromethyl)phenyl | Ring 1 | 2-(2,4-dichlorophenyl)propan-2-yl | 4.49[a] |
| I-133 | methyl | H | 3-(trifluoromethyl)phenyl | Ring 1 | 2-(4-chlorophenyl)ethyl | 3.72[a] |
| I-134 | methyl | H | 3-(trifluoromethyl)phenyl | Ring 16 | 3,4-dichlorophenyl | 4.80[a] |
| I-135 | methyl | H | 3-(trifluoromethyl)phenyl | Ring 17 | (4-chlorophenoxy)methyl | 3.89[a] |
| I-136 | acetyl | H | 3-cyclopropylphenyl | Ring 1 | (2,4-dichlorophenyl)methyl | 4.49[a] |
| I-137 | 1-hydroxyethyl | H | 3-cyclopropylphenyl | Ring 1 | (2,4-dichlorophenyl)methyl | 3.71[a] |
| I-138 | methyl | H | 3-cyclopropyl-2-fluorophenyl | Ring 1 | (2-methyl-4-vinylphenyl)methyl | 4.08[a] |
| I-139 | methyl | H | 3-(trifluoromethyl)phenyl | Ring 1 | (4-chlorophenoxy)methyl | 3.64[a] |
| I-140 | methyl | H | 3-cyclopropyl-2-fluorophenyl | Ring 1 | (2-methyl-4-pyridin-3-ylphenyl) methyl | 2.28[a] |
| I-141 | 1-fluoroethyl | H | 3-cyclopropylphenyl | Ring 1 | (2,4-dichlorophenyl)methyl | 4.56[a] |
| I-142 | methyl | H | 3-cyclopropyl-2-fluorophenyl | Ring 1 | (4-ethynyl-2-methylphenyl)methyl | 3.67[a] |
| I-143 | methyl | H | 3-(trifluoromethyl)phenyl | Ring 6 | 4-chlorophenyl | 3.50[a] |
| I-144 | methyl | H | 3-(trifluoromethyl)phenyl | Ring 1 | (2,4-dimethylphenoxy)methyl | 3.98[a] |
| I-145(*) | methyl | methyl | 3-(trifluoromethyl)phenyl | Ring 1 | (2,4-dimethylphenyl)methyl | 3.71[a] |
| I-146(*) | methyl | methyl | 3-(trifluoromethyl)phenyl | Ring 1 | (2,4-dimethylphenyl)methyl | 3.71[a] |
| I-147 | chloro | H | 3-cyclopropyl-2-fluorophenyl | Ring 1 | (2,4-dichlorophenyl)methyl | 4.81[a] |
| I-148 | 3-methyl-pyridin-4-yl | H | 3-(trifluoromethyl)phenyl | Ring 1 | (2,4-dimethylphenyl)methyl | 3.37[a] |
| I-149 | 3-methoxy-pyridin-4-yl | H | 3-(trifluoromethyl)phenyl | Ring 1 | (2,4-dimethylphenyl)methyl | 3.72[a] |
| I-150 | pyridin-4-yl | methyl | 3-cyclopropyl-2-fluorophenyl | Ring 1 | (2,4-dimethylphenyl)methyl | 3.29[a] |
| I-151(*) | chloro | H | 3-(trifluoromethyl)phenyl | Ring 1 | (2,4-dichlorophenyl)methyl | 4.59[a] |
| I-152(*) | chloro | H | 3-(trifluoromethyl)phenyl | Ring 1 | (2,4-dichlorophenyl)methyl | 4.59[a] |
| I-153 | chloro | H | 2-fluoro-3-[rac-2,2-difluorocyclopropyl]phenyl | Ring 1 | (2,4-dimethylphenyl)methyl | 4.37[a] |
| I-154 | methyl | H | 3-(trifluoromethyl)phenyl | Ring 7 | 4-methoxyphenyl | 3.60[a] |
| I-155 | methyl | H | 2-fluoro-3-[rac-2,2-difluorocyclopropyl]phenyl | Ring 1 | (2,4-dimethylphenyl)methyl | 3.81[a] |
| I-156 | chloro | H | 3-(trifluoromethyl)phenyl | Ring 8 | benzyl | 2.72[a] |
| I-157 | iodo | methyl | 3-(trifluoromethyl)phenyl | Ring 1 | (2,4-dimethylphenyl)methyl | 4.37[a] |
| I-158 | 1,3-thiazol-5-yl | H | 3-(trifluoromethyl)phenyl | Ring 1 | (2,4-dimethylphenyl)methyl | 4.18[a] |
| I-159 | cyano | H | 3-(trifluoromethyl)phenyl | Ring 1 | (2,4-dimethylphenyl)methyl | 4.30[a] |
| I-160(*) | methyl | H | 3-(difluoromethyl)phenyl | Ring 1 | (2,4-dimethylphenyl)methyl | 3.47[a] |
| I-161(*) | methyl | H | 3-(difluoromethyl)phenyl | Ring 1 | (2,4-dimethylphenyl)methyl | 3.47[a] |
| I-162(*) | chloro | H | 3-(trifluoromethyl)phenyl | Ring 1 | (4-bromo-2-chlorophenyl)methyl | 4.70[a] |
| I-163(*) | chloro | H | 3-(trifluoromethyl)phenyl | Ring 1 | (4-bromo-2-chlorophenyl)methyl | 4.70[a] |
| I-164(*) | chloro | H | 3-(trifluoromethyl)phenyl | Ring 1 | (4-bromo-2-methylphenyl)methyl | 4.59[a] |
| I-165(*) | chloro | H | 3-(trifluoromethyl)phenyl | Ring 1 | (4-bromo-2-methylphenyl)methyl | 4.59[a] |
| I-166(*) | methyl | H | 3-(trifluoromethyl)phenyl | Ring 1 | 1-methyl-1H-indol-3-yl | 3.31[a] |
| I-167(*) | methyl | H | 3-(trifluoromethyl)phenyl | Ring 1 | 1-methyl-1H-indol-3-yl | 3.31[a] |
| I-168 | methyl | H | 3-(trifluoromethyl)phenyl | Ring 1 | 3,5-dichloropyridin-2-yl | 3.54[a] |
| I-169 | (cyclopropyl-amino)carbonyl | methyl | 3-(trifluoromethyl)phenyl | Ring 1 | (2,4-dimethylphenyl)methyl | 3.84[a] |
| I-170 | vinyl | H | 3-cyclopropyl-2-fluorophenyl | Ring 1 | (2,4-dichlorophenyl)methyl | 4.66[a] |
| I-171 | acetyl | H | 3-cyclopropyl-2-fluorophenyl | Ring 1 | (2,4-dichlorophenyl)methyl | 4.66[a] |
| I-172 | ethyl | H | 3-cyclopropyl-2-fluorophenyl | Ring 1 | (2,4-dichlorophenyl)methyl | 4.59[a] |
| I-173 | chloro | H | 3-(trifluoromethyl)phenyl | Ring 8 | (2,4-dimethylphenyl)methyl | 3.31[a] |
| I-174 | chloro | methyl | 2-fluoro-3-[rac-2,2-difluorocyclopropyl]phenyl | Ring 1 | (2,4-dimethylphenyl)methyl | 4.15[a] |
| I-175 | chloro | H | 3-(trifluoromethyl)phenyl | Ring 1 | [4-(trifluoromethyl)phenyl]methyl | 4.23[a] |
| I-176 | methylsulfanyl | methyl | 3-(trifluoromethyl)phenyl | Ring 1 | (2,4-dimethylphenyl)methyl | 4.51[a] |
| I-177 | 4-methyl-1H-pyrazol-1-yl | H | 3-(trifluoromethyl)phenyl | Ring 1 | (2,4-dimethylphenyl)methyl | 4.55[a] |
| I-178 | allylthio | methyl | 3-(trifluoromethyl)phenyl | Ring 1 | (2,4-dimethylphenyl)methyl | 5.00[a] |
| I-179 | chloro | H | 3-(trifluoromethyl)phenyl | Ring 1 | [(2,4-dimethylphenyl)thio]methyl | 4.78[a] |

TABLE 1-continued

Compounds according to formula (I)

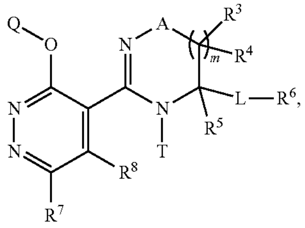

(I)

| | | | | | | |
|---|---|---|---|---|---|---|
| I-180 | methylsulfonyl | methyl | 3-(trifluoromethyl)phenyl | Ring 1 | (2,4-dimethylphenyl)methyl | 4.01[a] |
| I-181 | chloro | H | 3-(trifluoromethyl)phenyl | Ring 9 | (2,4-dimethylphenyl)methyl | 5.00[a] |
| I-182 | chloro | H | 3-(trifluoromethyl)phenyl | Ring 10 | (2,4-dimethylphenyl)methyl | 5.61[a] |
| I-183 | chloro | H | 3-(trifluoromethyl)phenyl | Ring 1 | [4-(trifluoromethoxy)phenyl]methyl | 4.40[a] |
| I-184 | chloro | H | 3-(trifluoromethyl)phenyl | Ring 11 | 2,4-dichlorophenyl | 3.88[a] |
| I-185 | chloro | H | 3-(trifluoromethyl)phenyl | Ring 4 | 4-chlorophenyl | 4.13[a] |
| I-186 | chloro | H | 3-chloro-2-fluorophenyl | Ring 1 | (2,4-dimethylphenyl)methyl | 4.40[a] |
| I-187 | 2-methoxy-ethylthio | methyl | 3-(trifluoromethyl)phenyl | Ring 1 | (2,4-dimethylphenyl)methyl | 4.51[a] |
| I-188 | chloro | H | 3-(trifluoromethyl)phenyl | Ring 1 | [4-(difluoromethoxy)phenyl]methyl | 3.88[a] |
| I-189 | vinyl | H | 3-chloro-2-fluorophenyl | Ring 1 | (2,4-dimethylphenyl)methyl | 4.19[a] |
| I-190 | methyl | H | 3-chloro-2-fluorophenyl | Ring 1 | (2,4-dimethylphenyl)methyl | 3.81[a] |
| I-191 | methoxy | methyl | 3-(trifluoromethyl)phenyl | Ring 1 | (2,4-dimethylphenyl)methyl | 3.56[a] |
| I-192 | methyl | H | 3-cyclopropyl-2-fluorophenyl | Ring 1 | (4-cyclopentyl-2-methylphenyl) methyl | 5.28[a] |
| I-193 | methyl | H | 3-cyclopropyl-2-fluorophenyl | Ring 1 | (4-cyclobutyl-2-methylphenyl) methyl | 4.97[a] |
| I-194 | chloro | H | 3-(trifluoromethyl)phenyl | Ring 4 | 2,4-dichlorophenyl | 4.77[a] |
| I-195 | chloro | H | 3-(trifluoromethyl)phenyl | Ring 11 | 4-chlorophenyl | 3.56[a] |
| I-196 | chloro | H | 5-(trifluoromethyl)-3-thienyl | Ring 1 | (2,4-dimethylphenyl)methyl | 4.59[a] |
| I-197 | chloro | H | 5-chloro-4-fluoropyridin-3-yl | Ring 1 | (2,4-dimethylphenyl)methyl | 3.84[a] |
| I-198 | chloro | H | 5-cyclopropylpyridin-3-yl | Ring 1 | (2,4-dimethylphenyl)methyl | 3.34[a] |
| I-199 | chloro | H | phenyl | Ring 1 | (2,4-dimethylphenyl)methyl | 3.91[a] |
| I-200 | chloro | H | 3-methylphenyl | Ring 1 | (2,4-dimethylphenyl)methyl | 4.26[a] |
| I-201 | chloro | H | 3-ethynylphenyl | Ring 1 | (2,4-dimethylphenyl)methyl | 4.05[a] |
| I-202 | chloro | H | 3-formylphenyl | Ring 1 | (2,4-dimethylphenyl)methyl | 3.47[a] |
| I-203 | chloro | H | 3-ethylphenyl | Ring 1 | (2,4-dimethylphenyl)methyl | 4.59[a] |
| I-204 | chloro | H | 3-methoxyphenyl | Ring 1 | (2,4-dimethylphenyl)methyl | 3.91[a] |
| I-205 | chloro | H | 2-fluoro-3-methylphenyl | Ring 1 | (2,4-dimethylphenyl)methyl | 4.33[a] |
| I-206 | chloro | H | 1-isopropyl-1H-pyrazol-4-yl | Ring 1 | (2,4-dimethylphenyl)methyl | 3.40[a] |
| I-207 | chloro | H | 2,3-difluorophenyl | Ring 1 | (2,4-dimethylphenyl)methyl | 4.08[a] |
| I-208 | chloro | H | 1H-indol-5-yl | Ring 1 | (2,4-dimethylphenyl)methyl | 3.57[a] |
| I-209 | chloro | H | indan-4-yl | Ring 1 | (2,4-dimethylphenyl)methyl | 4.74[a] |
| I-210 | chloro | H | indan-5-yl | Ring 1 | (2,4-dimethylphenyl)methyl | 4.78[a] |
| I-211 | chloro | H | 6,7-dihydro-5H-cyclopenta[b]pyridin-3-yl | Ring 1 | (2,4-dimethylphenyl)methyl | 3.14[a] |
| I-212 | chloro | H | 2,3-dihydro-1-benzofuran-5-yl | Ring 1 | (2,4-dimethylphenyl)methyl | 3.81[a] |
| I-213 | chloro | H | 3-acetylphenyl | Ring 1 | (2,4-dimethylphenyl)methyl | 3.54[a] |
| I-214 | chloro | H | 3-propylphenyl | Ring 1 | (2,4-dimethylphenyl)methyl | 5.00[a] |
| I-215 | chloro | H | 3-(dimethylamino)phenyl | Ring 1 | (2,4-dimethylphenyl)methyl | 4.12[a] |
| I-216 | chloro | H | 3-ethoxyphenyl | Ring 1 | (2,4-dimethylphenyl)methyl | 4.26[a] |
| I-217 | chloro | H | 3-(methoxymethyl)phenyl | Ring 1 | (2,4-dimethylphenyl)methyl | 3.87[a] |
| I-218 | chloro | H | 3-nitrophenyl | Ring 1 | (2,4-dimethylphenyl)methyl | 3.84[a] |
| I-219 | chloro | H | 2-fluoro-3-formylphenyl | Ring 1 | (2,4-dimethylphenyl)methyl | 3.64[a] |
| I-220 | chloro | H | 3-ethyl-2-fluorophenyl | Ring 1 | (2,4-dimethylphenyl)methyl | 4.70[a] |
| I-221 | chloro | H | 3-methylsulfanylphenyl | Ring 1 | (2,4-dimethylphenyl)methyl | 4.26[a] |
| I-222 | chloro | H | 3-chloro-4-methylphenyl | Ring 1 | (2,4-dimethylphenyl)methyl | 4.70[a] |
| I-223 | chloro | H | naphthalen-2-yl | Ring 1 | (2,4-dimethylphenyl)methyl | 4.51[a] |
| I-224 | chloro | H | quinolin-3-yl | Ring 1 | (2,4-dimethylphenyl)methyl | 3.57[a] |
| I-225 | chloro | H | 3-chloro-5-fluorophenyl | Ring 1 | (2,4-dimethylphenyl)methyl | 4.47[a] |
| I-226 | chloro | H | 3-chloro-4-fluorophenyl | Ring 1 | (2,4-dimethylphenyl)methyl | 4.37[a] |
| I-227 | chloro | H | 2,4,5-trifluorophenyl | Ring 1 | (2,4-dimethylphenyl)methyl | 4.19[a] |
| I-228 | chloro | H | 3-cyclobutylphenyl | Ring 1 | (2,4-dimethylphenyl)methyl | 5.12[a] |
| I-229 | chloro | H | 3-(oxetan-3-yl)phenyl | Ring 1 | (2,4-dimethylphenyl)methyl | 3.47[a] |
| I-230 | chloro | H | 1-benzothiophen-6-yl | Ring 1 | (2,4-dimethylphenyl)methyl | 4.33[a] |
| I-231 | chloro | H | 3-(methoxycarbonyl)phenyl | Ring 1 | (2,4-dimethylphenyl)methyl | 3.84[a] |
| I-232 | chloro | H | 3-(2-fluorocyclopropyl)phenyl | Ring 1 | (2,4-dimethylphenyl)methyl | 4.15 & 4.26[a] |
| I-233 | chloro | H | 4-(trifluoromethyl)phenyl | Ring 1 | (2,4-dimethylphenyl)methyl | 4.44[a] |
| I-234 | chloro | H | 3,4-dichlorophenyl | Ring 1 | (2,4-dimethylphenyl)methyl | 4.74[a] |
| I-235 | chloro | H | 3-phenylphenyl | Ring 1 | (2,4-dimethylphenyl)methyl | 4.89[a] |
| I-236 | chloro | H | 3-bromophenyl | Ring 1 | (2,4-dimethylphenyl)methyl | 4.40[a] |
| I-237 | chloro | H | 3-(trifluoromethoxy)phenyl | Ring 1 | (2,4-dimethylphenyl)methyl | 4.59[a] |
| I-238 | chloro | H | 4-(trifluoromethoxy)phenyl | Ring 1 | (2,4-dimethylphenyl)methyl | 4.59[a] |

TABLE 1-continued

Compounds according to formula (I)

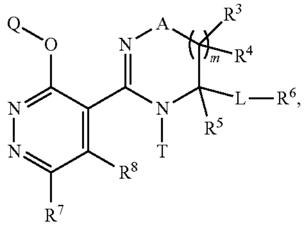

(I)

| | | | | | | |
|---|---|---|---|---|---|---|
| I-239(*) | chloro | H | 3-bromo-2-fluorophenyl | Ring 1 | (2,4-dimethylphenyl)methyl | 4.47[a] |
| I-240 | chloro | H | 3-(trifluoromethylthio)phenyl | Ring 1 | (2,4-dimethylphenyl)methyl | 4.85[a] |
| I-241 | chloro | H | 3-iodophenyl | Ring 1 | (2,4-dimethylphenyl)methyl | 4.55[a] |
| I-242 | chloro | H | 3-[3-(trifluoromethyl)-1H-pyrazol-1-yl]phenyl | Ring 1 | (2,4-dimethylphenyl)methyl | 4.66[a] |
| I-243 | chloro | H | 3-methylsulfonylphenyl | Ring 1 | (2,4-dimethylphenyl)methyl | 3.13[a] |
| I-244 | chloro | H | 5-methyl-2-(trifluoromethyl)-1,3-thiazol-4-yl | Ring 1 | (2,4-dimethylphenyl)methyl | 4.40[a] |
| I-245(*) | methyl | H | 3-cyclopropyl-2-fluorophenyl | Ring 1 | (2,4-dichlorophenyl)methyl | 4.19[a] |
| I-246(*) | methyl | H | 3-cyclopropyl-2-fluorophenyl | Ring 1 | (4-bromo-2-chlorophenyl)methyl | 4.30[a] |
| I-247(*) | methyl | H | 3-cyclopropyl-2-fluorophenyl | Ring 1 | (4-bromo-2-chlorophenyl)methyl | 4.30[a] |
| I-248 | methyl | H | 3-cyclopropyl-2-fluorophenyl | Ring 1 | [2-methyl-4-(oxetan-3-yl) phenyl]methyl | 3.13[a] |
| I-249 | methyl | H | 3-cyclopropyl-2-fluorophenyl | Ring 1 | [2-methyl-4-(oxolan-3-yl) phenyl]methyl | 3.97[a] |
| I-250(*) | methyl | H | 3-cyclopropyl-2-fluorophenyl | Ring 1 | (2,4-dichlorophenyl)methyl | 4.19[a] |
| I-251 | 2-methoxyethyl | methyl | 3-(trifluoromethyl)phenyl | Ring 1 | (2,4-dimethylphenyl)methyl | 3.85[a] |
| I-252 | ethyl | H | 3-chloro-2-fluorophenyl | Ring 1 | (2,4-dimethylphenyl)methyl | 4.15[a] |
| I-253 | oxetan-3-yl | H | 3-(trifluoromethyl)phenyl | Ring 1 | (2,4-dimethylphenyl)methyl | 3.77[a] |
| I-254 | 2-methoxyethyl | H | 3-(trifluoromethyl)phenyl | Ring 1 | (2,4-dimethylphenyl)methyl | 4.05[a] |
| I-255 | oxolan-3-yl | H | 3-(trifluoromethyl)phenyl | Ring 1 | (2,4-dimethylphenyl)methyl | 4.01[a] |
| I-256 | 2-cyanoethyl | H | 3-(trifluoromethyl)phenyl | Ring 1 | (2,4-dimethylphenyl)methyl | 4.01[a] |
| I-257 | cyclobutyl-methyl | H | 3-(trifluoromethyl)phenyl | Ring 1 | (2,4-dimethylphenyl)methyl | 5.08[a] |
| I-258 | chloro | H | 3-cyano-2-fluorophenyl | Ring 1 | (2,4-dimethylphenyl)methyl | 3.77[a] |
| I-259 | methyl | H | 3-cyclopropyl-2-fluorophenyl | Ring 1 | (2-bromo-4-methylphenyl)methyl | 4.26[a] |
| I-260 | chloro | H | 5-(trifluoromethyl)-3-thienyl | Ring 1 | (2,4-dichlorophenyl)methyl | 4.66[a] |
| I-261 | chloro | H | 5-(trifluoromethyl)-3-thienyl | Ring 1 | (4-bromo-2-chlorophenyl)methyl | 4.74[a] |
| I-262 | chloro | H | 2-fluoro-3-(1-fluorocyclopropyl)phenyl | Ring 1 | (2,4-dimethylphenyl)methyl | 4.44[a] |
| I-263 | chloro | methyl | 2-fluoro-3-(1-fluorocyclopropyl)phenyl | Ring 1 | (2,4-dimethylphenyl)methyl | 4.19[a] |
| I-264 | chloro | 2-methoxyethyl | 3-(trifluoromethyl)phenyl | Ring 1 | (2,4-dimethylphenyl)methyl | 4.47[a] |
| I-265 | chloro | cyclopentyl | 3-(trifluoromethyl)phenyl | Ring 1 | (2,4-dimethylphenyl)methyl | 5.20[a] |
| I-266 | chloro | (4-methoxy-4-oxobutyl)amino | 3-(trifluoromethyl)phenyl | Ring 1 | (2,4-dimethylphenyl)methyl | 4.05[a] |
| I-267 | chloro | (2-hydroxy-2-methyl-propyl)amino | 3-(trifluoromethyl)phenyl | Ring 1 | (2,4-dimethylphenyl)methyl | 3.88[a] |
| I-268 | chloro | 5-(trifluoromethyl)-1H-pyrazol-1-yl | 3-(trifluoromethyl)phenyl | Ring 1 | (2,4-dimethylphenyl)methyl | 5.04[a] |
| I-269 | chloro | 3-carboxy-propylamino | 3-(trifluoromethyl)phenyl | Ring 1 | (2,4-dimethylphenyl)methyl | 3.40[a] |
| I-270 | chloro | H | 3-(trifluoromethyl)phenyl | Ring 1 | [4-(difluoromethyl)phenyl]methyl | 3.48[a] |
| I-271 | chloro | H | 3-(difluoromethoxy)phenyl | Ring 1 | (2,4-dimethylphenyl)methyl | 4.08[a] |
| I-272 | chloro | H | 2,2-difluoro-1,3-benzodioxol-5-yl | Ring 1 | (2,4-dimethylphenyl)methyl | 4.55[a] |
| I-273 | methyl | H | 3-cyclopropyl-2-fluorophenyl | Ring 1 | [2-chloro-4-(trifluoromethyl)phenyl]methyl | 4.26[a] |
| I-274 | chloro | H | 3-(trifluoromethyl)phenyl | Ring 1 | (1-methyl-1H-indol-3-yl)methyl | 4.12[a] |
| I-275 | chloro | H | 3-bicyclo[4.2.0]octa-1,3,5-trienyl | Ring 1 | (2,4-dimethylphenyl)methyl | 4.44[a] |
| I-276 | chloro | H | 3-(difluoromethoxy)-2-fluorophenyl | Ring 1 | (2,4-dimethylphenyl)methyl | 4.12[a] |
| I-277 | 2-cyclopropyl-cyclopropyl | H | 3-(trifluoromethyl)phenyl | Ring 1 | (2,4-dimethylphenyl)methyl | 5.20[a] |
| I-278 | chloro | 2-cyclopropyl-cyclopropyl | 3-(trifluoromethyl)phenyl | Ring 1 | (2,4-dimethylphenyl)methyl | 5.16[a] |
| I-279 | chloro | allyloxy | 3-(trifluoromethyl)phenyl | Ring 1 | (2,4-dimethylphenyl)methyl | 4.67[a] |
| I-280 | chloro | (2-methyl-1,3-dioxolan-4-yl)methylamino | 3-(trifluoromethyl)phenyl | Ring 1 | (2,4-dimethylphenyl)methyl | 4.19[a] |
| I-281 | chloro | 2-oxopyrrolidin-1-yl | 3-(trifluoromethyl)phenyl | Ring 1 | (2,4-dimethylphenyl)methyl | 4.12[a] |

TABLE 1-continued

Compounds according to formula (I)

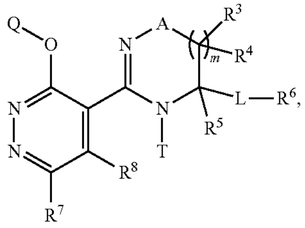

(I)

| | | | | | | |
|---|---|---|---|---|---|---|
| I-282 | chloro | 2-oxa-6-aza-spiro[3.3]heptan-6-yl | 3-(trifluoromethyl)phenyl | Ring 1 | (2,4-dimethylphenyl)methyl | 3.71[a] |
| I-283 | chloro | (1-methylcyclo-propyl)amino | 3-(trifluoromethyl)phenyl | Ring 1 | (2,4-dimethylphenyl)methyl | 4.44[a] |
| I-284 | chloro | 2-cyclopropyl-ethylamino | 3-(trifluoromethyl)phenyl | Ring 1 | (2,4-dimethylphenyl)methyl | 4.74[a] |
| I-285 | chloro | but-3-en-2-yl-amino | 3-(trifluoromethyl)phenyl | Ring 1 | (2,4-dimethylphenyl)methyl | 4.55[a] |
| I-286 | chloro | oxetan-3-ylamino | 3-(trifluoromethyl)phenyl | Ring 1 | (2,4-dimethylphenyl)methyl | 3.71[a] |
| I-287 | chloro | 3,3,3-trifluoro-propylamino | 3-(trifluoromethyl)phenyl | Ring 1 | (2,4-dimethylphenyl)methyl | 4.51[a] |
| I-288 | chloro | (2-cyclopropyl-cyclopropyl)amino | 3-(trifluoromethyl)phenyl | Ring 1 | (2,4-dimethylphenyl)methyl | 4.78[a] |
| I-289 | chloro | 2-methylsulfanyl-ethylamino | 3-(trifluoromethyl)phenyl | Ring 1 | (2,4-dimethylphenyl)methyl | 4.40[a] |
| I-290 | methyl | H | 3-cyclopropyl-2-fluorophenyl | Ring 1 | (2-chloro-4-methylphenyl)methyl | 4.12[a] |
| I-291 | chloro | 3-(oxolan-2-yl)-1H-pyrazol-1-yl | 3-(trifluoromethyl)phenyl | Ring 1 | (2,4-dimethylphenyl)methyl | 4.55[a] |
| I-292 | chloro | methylsulfanyl | 3-(trifluoromethyl)phenyl | Ring 1 | (2,4-dimethylphenyl)methyl | 4.51[a] |
| I-293 | 4-methoxy-1H-pyrazol-1-yl | 4-methoxy-1H-pyrazol-1-yl | 3-(trifluoromethyl)phenyl | Ring 1 | (2,4-dimethylphenyl)methyl | 4.40[a] |
| I-294 | chloro | 1,3-thiazol-4-yl | 3-(trifluoromethyl)phenyl | Ring 1 | (2,4-dimethylphenyl)methyl | 4.17[a] |
| I-295 | methyl | H | 3-cyclopropyl-2-fluorophenyl | Ring 1 | (3,4-dichlorophenyl)methyl | 4.08[a] |
| I-296 | chloro | H | 3-(trifluoromethyl)phenyl | Ring 1 | (4-nitrophenyl)methyl | 3.54[a] |
| I-297 | chloro | H | 3-(trifluoromethyl)phenyl | Ring 1 | [4-(trifluoromethylthio)phenyl]methyl | 4.67[a] |
| I-298 | methyl | H | 3-chloro-2-fluorophenyl | Ring 1 | (2-chloro-4-cyclopropylphenyl)methyl | 4.14[a] |
| I-299 | methyl | H | 3-chloro-2-fluorophenyl | Ring 1 | (4-cyclopropyl-2-methylphenyl)methyl | 4.12[a] |
| I-300(*) | methyl | H | 3-chloro-2-fluorophenyl | Ring 1 | (4-bromo-2-methylphenyl)methyl | 3.94[a] |
| I-301 | methyl | H | 3-cyclopropyl-2-fluorophenyl | Ring 1 | (2-chloro-4-methoxyphenyl)methyl | 3.73[a] |
| I-302(*) | methyl | H | 3-chloro-2-fluorophenyl | Ring 1 | (2-chloro-4-methylphenyl)methyl | 3.94[a] |
| I-303 | methyl | H | 3-chloro-2-fluorophenyl | Ring 1 | (3,4-dimethylphenyl)methyl | 3.87[a] |
| I-304 | chloro | H | 3-(trifluoromethyl)phenyl | Ring 5 | 2,4-dichlorophenyl | 2.76[a] |
| I-305 | methyl | H | 3-(difluoromethyl)phenyl | Ring 1 | (3,4-dimethylphenyl)methyl | 3.46[a] |
| I-306 | methyl | H | 3-(difluoromethyl)phenyl | Ring 1 | (4-cyclopropyl-2-methylphenyl)methyl | 3.72[a] |
| I-307 | chloro | H | 3-(trifluoromethyl)phenyl | Ring 1 | (5-chloropyridin-2-yl)methyl | 3.43[a] |
| I-308 | chloro | H | 3-ethynyl-2-fluorophenyl | Ring 1 | (2,4-dichlorophenyl)methyl | 4.16[a] |
| I-309 | methyl | H | 3-cyclopropyl-2-fluorophenyl | Ring 1 | (3-bromo-5-methylphenyl)methyl | 4.26[a] |
| I-310 | chloro | H | 3-(trifluoromethyl)phenyl | Ring 1 | (4,5-dimethyl-3-thienyl)methyl | 4.36[a] |
| I-311 | methyl | H | 3-(trifluoromethyl)phenyl | Ring 1 | 2-phenylcyclopropyl | 3.57[a] |
| I-312(*) | chloro | H | 3-bromo-2-fluorophenyl | Ring 1 | (2,4-dimethylphenyl)methyl | 4.51[a] |
| I-313(*) | chloro | H | 3-bromo-2-fluorophenyl | Ring 1 | (2,4-dimethylphenyl)methyl | 4.51[a] |
| I-314 | methyl | H | 3-cyclopropyl-2-fluorophenyl | Ring 1 | [4-methyl-2-(2-trimethylsilylethyn-1-yl)phenyl]methyl | 5.79[a] |
| I-315 | methyl | H | 3-cyclopropyl-2-fluorophenyl | Ring 1 | (2-ethynyl-4-methylphenyl)methyl | 3.88[a] |
| I-316 | methyl | H | 3-(difluoromethyl)-2-fluorophenyl | Ring 1 | (2,4-dimethylphenyl)methyl | 3.59[a] |
| I-317 | methyl | H | 3-(difluoromethyl)-2-fluorophenyl | Ring 1 | (3,4-dimethylphenyl)methyl | 3.62[a] |
| I-318 | methyl | H | 3-(trifluoromethyl)phenyl | Ring 1 | 2,3-dihydro-1,4-benzodioxin-6-yl | 2.89[a] |
| I-319 | chloro | H | 3-[rac-oxiran-2-yl]phenyl | Ring 1 | (2,4-dichlorophenyl)methyl | 3.84[a] |
| I-320 | chloro | 2-methoxy-ethylthio | 3-(trifluoromethyl)phenyl | Ring 1 | (2,4-dimethylphenyl)methyl | 4.52[a] |
| I-321 | chloro | H | 3-ethynyl-2-fluorophenyl | Ring 1 | (2,4-dimethylphenyl)methyl | 4.17[a] |
| I-322(*) | methyl | H | 3-cyclopropyl-2-fluorophenyl | Ring 1 | (4-bromo-2-methylphenyl)methyl | 4.23[a] |
| I-323(*) | methyl | H | 3-cyclopropyl-2-fluorophenyl | Ring 1 | (4-bromo-2-methylphenyl)methyl | 4.23[a] |
| I-324 | methyl | H | 3-(difluoromethyl)-2-fluorophenyl | Ring 1 | (4-cyclopropyl-2-methylphenyl)methyl | 3.88[a] |
| I-325 | methyl | H | 2-fluoro-3-vinylphenyl | Ring 1 | (2,4-dimethylphenyl)methyl | 3.88[a] |
| I-326 | methyl | H | 2-fluoro-3-methylphenyl | Ring 1 | (2,4-dimethylphenyl)methyl | 3.70[a] |
| I-327 | methyl | H | 3-cyclopropylphenyl | Ring 1 | (2-chloro-4-cyclopropylphenyl)methyl | 4.36[a] |
| I-328 | methyl | H | 3-cyclopropylphenyl | Ring 1 | (4-cyclopropyl-2-methylphenyl)methyl | 4.19[a] |
| I-329 | methyl | H | 3-cyclopropylphenyl | Ring 1 | (4-bromo-2-methylphenyl)methyl | 4.03[a] |

TABLE 1-continued

Compounds according to formula (I)

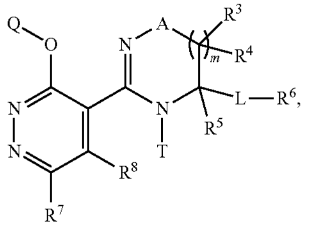

(I)

| | | | | | | |
|---|---|---|---|---|---|---|
| I-330 | methyl | H | 3-cyclopropylphenyl | Ring 1 | (3,4-dimethylphenyl)methyl | 3.93[a] |
| I-331 | methyl | H | 3-cyclopropyl-2-fluorophenyl | Ring 1 | [2-chloro-4-(difluoro-methyl)phenyl]methyl | 3.73[a] |
| I-332 | methyl | H | 3-cyclopropyl-2-fluorophenyl | Ring 1 | [2-chloro-4-(difluoro-methoxy)phenyl]methyl | 3.81[a] |
| I-333 | methyl | H | 3-(difluoromethyl)phenyl | Ring 1 | (2-chloro-4-methylphenyl)methyl | 3.49[a] |
| I-334 | methyl | H | 3-cyclopropyl-2-fluorophenyl | Ring 1 | [2-chloro-4-(trifluoro-methoxy)phenyl]methyl | 4.41[a] |
| I-335 | methyl | H | 3-cyclopropyl-2-fluorophenyl | Ring 1 | (2-cyclopropyl-4-methylphenyl)methyl | 4.51[a] |
| I-336(*) | methyl | H | 3-chloro-2-fluorophenyl | Ring 1 | (4-bromo-2-methylphenyl)methyl | 3.94[a] |
| I-337(*) | methyl | H | 3-chloro-2-fluorophenyl | Ring 1 | (4-bromo-2-methylphenyl)methyl | 3.94[a] |
| I-338(*) | methyl | H | 3-chloro-2-fluorophenyl | Ring 1 | (2-chloro-4-methylphenyl)methyl | 3.87[a] |
| I-339(*) | methyl | H | 3-chloro-2-fluorophenyl | Ring 1 | (2-chloro-4-methylphenyl)methyl | 3.87[a] |
| I-340 | chloro | H | 6-chloropyridin-2-yl | Ring 1 | (2,4-dichlorophenyl)methyl | 3.77[a] |
| I-341 | chloro | H | 3-vinylphenyl | Ring 1 | (2,4-dichlorophenyl)methyl | 4.44[a] |
| I-342 | chloro | 4-methoxy-1H-pyrazol-1-yl | 3-(trifluoromethyl)phenyl | Ring 1 | (2,4-dimethylphenyl)methyl | 4.35[a] |
| I-343 | chloro | cyclopropyl | 3-(trifluoromethyl)phenyl | Ring 1 | (2,4-dimethylphenyl)methyl | 4.46[a] |
| I-344 | methyl | H | 3-(difluoromethyl)-2-fluorophenyl | Ring 1 | (2-chloro-4-methylphenyl)methyl | 3.63[a] |
| I-345 | methyl | H | 2-fluoro-3-formylphenyl | Ring 1 | (2,4-dimethylphenyl)methyl | 3.09[a] |
| I-346 | methyl | H | 3-cyclopropylphenyl | Ring 1 | (2-chloro-4-methylphenyl)methyl | 3.96[a] |
| I-347 | chloro | H | 3-(trifluoromethyl)phenyl | Ring 1 | (E)-2-phenylethen-1-yl | 3.91[a] |
| I-348 | methyl | H | 3-ethynyl-2-fluorophenyl | Ring 1 | (2,4-dimethylphenyl)methyl | 3.52[a] |

(*)Ex I-051 and I-053 are the two enantiomers of Ex I-059
Ex I-051: Optical rotation: +92.7° (c = 0.95, DCM, 25° C.); concentration c is expressed in g/100 mL.
Ex I-053: Optical rotation: −86.6° (c = 1.04, DCM, 25° C.); concentration c is expressed in g/100 mL.
(*)Ex I-119 and I-130 are the 2 enantiomers of Ex I-052
Ex I-119: Optical rotation: +95.3° (c = 1.05, CDCl3, 20° C.); concentration c is expressed in g/100 mL.
Ex I-130: Optical rotation: −93.3° (c = 1.20, CDCl3, 20° C.); concentration c is expressed in g/100 mL.
(*)Ex I-145 and I-146 are the 2 enantiomers of Ex I-055
Ex I-145: Optical rotation: +86.3° (c = 1.62, CDCl3, 20° C.); concentration c is expressed in g/100 mL.
Ex I-146: Optical rotation: −90° (c = 1.60, CDCl3, 20° C.); concentration c is expressed in g/100 mL.
(*)Ex I-151 and I-152 are the 2 enantiomers of Ex I-025
Ex I-151: Optical rotation: +54.8° (c = 1.1, CDCl3, 25° C.); concentration c is expressed in g/100 mL.
Ex I-152: Optical rotation: −51.4° (c = 1.09, CDCl3, 25° C.); concentration c is expressed in g/100 mL.
(*)Ex I-160 and I-161 are the 2 enantiomers of Ex I-013
Ex I-160: Optical rotation: +85.6° (c = 2.15, CDCl3, 25° C.); concentration c is expressed in g/100 mL.
Ex I-161: Optical rotation: −78.1° (c = 2.15, CDCl3, 25° C.); concentration c is expressed in g/100 mL.
(*)Ex I-162 and I-163 are the 2 enantiomers of Ex I-016
Ex I-162: Optical rotation: +52.2° (c = 1.15, CDCl3, 25° C.); concentration c is expressed in g/100 mL.
Ex I-163: Optical rotation: −72° (c = 1.0, CDCl3, 25° C.); concentration c is expressed in g/100 mL.
(*)Ex I-164 and I-165 are the 2 enantiomers of Ex I-017
Ex I-164: Optical rotation: +78.3° (c = 1.15, CDCl3, 25° C.); concentration c is expressed in g/100 mL.
Ex I-165: Optical rotation: −85.5° (c = 1.1, CDCl3, 25° C.); concentration c is expressed in g/100 mL.
(*)Ex I-166 and I-167 are the 2 enantiomers of Ex I-011
Ex I-166: Optical rotation: 0° (c = 0.95, CDCl3, 25° C.); concentration c is expressed in g/100 mL.
Ex I-167: Optical rotation: −7.3° (c = 1.1, CDCl3, 25°C); concentration c is expressed in g/100 mL.
(*)Ex I-245 and I-250 are the 2 enantiomers of Ex I-030
Ex I-245: Optical rotation: +57.1° (c = 0.67, CDCl3, 25° C.); concentration c is expressed in g/100 mL.
Ex I-250: Optical rotation: −63.8° (c = 0.69, CDCl3, 25° C.); concentration c is expressed in g/100 mL.
(*)Ex I-246 and I-247 are the 2 enantiomers of Ex I-027
Ex I-246: Optical rotation: +60° (c = 0.6, CDCl3, 25° C.); concentration c is expressed in g/100 mL.
Ex I-247: Optical rotation: −55° (c = 0.8, CDCl3, 25° C.); concentration c is expressed in g/100 mL.
(*)Ex I-312 and I-313 are the 2 enantiomers of Ex I-239
Ex I-312: Optical rotation: −88.6° (c = 3.50, DCM, 20° C.); concentration c is expressed in g/100 mL.
Ex I-313: Optical rotation: +73.2° (c = 2.95, DCM, 20° C.); concentration c is expressed in g/100 mL.
(*)Ex I-322 and I-323 are the 2 enantiomers of Ex I-056
(*)Ex I-336 and I-337 are the 2 enantiomers of Ex I-300
Ex I-336: Optical rotation: +71.6° (c = 1.01, CDCl3, 25° C.); concentration c is expressed in g/100 mL.
Ex I-337: Optical rotation: −72.5° (c = 1.02, CDCl3, 25° C.); concentration c is expressed in g/100 mL.
(*)Ex I-338 and I-339 are the 2 enantiomers of Ex I-302
Ex I-338: Optical rotation: +71.5° (c = 1.04, CDCl3, 25° C.); concentration c is expressed in g/100 mL.
Ex I-339: Optical rotation: −75.2° (c = 1.01, CDCl3, 25° C.); concentration c is expressed in g/100 mL.

TABLE 1-continued
Compounds according to formula (I)
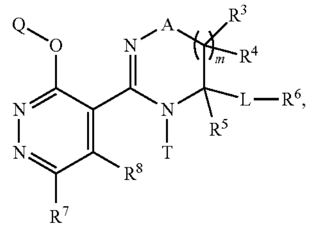
(I)
(*)Ex I-070 is Single Stereoisomer
Ex I-070: Optical rotation: −78.1° (c = 2.51, CDCl3, 25° C.); concentration c is expressed in g/100 mL.
TABLE 2
I-001: $^1$H-NMR(300.2 MHz, CDCl3):
δ = 8.1367 (6.2); 7.2983 (14.2); 7.1511 (0.6); 7.1469 (0.6); 7.1244 (1.4); 7.1206 (1.4); 7.0979 (1.0); 7.0941 (1.0); 7.0120 (2.6); 6.9870 (3.2); 6.9609 (0.6); 6.9557 (0.6); 6.9061 (2.1); 6.8920 (0.9); 6.8868 (0.8); 6.8649 (1.3); 6.8434 (0.6); 6.8386 (0.6); 6.6980 (1.2); 6.6728 (1.0); 6.2039 (1.4); 5.3372 (8.7); 4.3108 (0.7); 4.3024 (1.0); 4.2776 (1.1); 4.2677 (0.9); 3.9014 (0.6); 3.8854 (0.6); 3.8792 (0.5); 3.8620 (2.1); 3.8417 (0.6); 3.8275 (1.4); 3.8068 (0.8); 3.0515 (0.7); 3.0359 (0.7); 3.0069 (1.0); 2.9905 (1.0); 2.7798 (0.9); 2.7488 (0.9); 2.7346 (0.8); 2.7033 (0.7); 2.3087 (11.5); 2.1735 (10.9); 2.1492 (0.6); 2.1373 (0.6); 2.1204 (1.0); 2.1032 (0.6); 2.0921 (0.6); 2.0830 (1.5); 1.5870 (16.0); 1.3455 (0.4); 1.3211 (1.0); 1.3053 (2.5); 1.2976 (2.7); 1.2736 (0.5); 1.1084 (0.7); 1.0953 (1.4); 1.0884 (1.8); 1.0831 (1.1); 1.0802 (1.1); 1.0753 (1.1); 1.0665 (1.4); 1.0601 (1.7); 1.0472 (0.9); 0.9420 (0.8); 0.9203 (2.6); 0.8972 (1.1); 0.8445 (0.8); 0.8369 (0.9); 0.8279 (1.9); 0.8203 (1.6); 0.8124 (2.0); 0.8052 (1.2); 0.7949 (0.7); 0.1077 (3.9); 0.0489 (0.4); 0.0381 (12.7); 0.0272 (0.6)
I-002: $^1$H-NMR(499.9 MHz, CDCl3):
δ = 7.5046 (0.5); 7.4888 (2.4); 7.4771 (5.7); 7.4754 (5.5); 7.3398 (6.4); 7.2616 (4.9); 7.2520 (3.1); 7.1885 (1.0); 7.1827 (1.7); 7.1783 (1.6); 7.1702 (1.5); 7.1659 (1.0); 6.9515 (2.6); 6.9363 (3.0); 6.8897 (3.3); 6.7050 (1.8); 6.6901 (1.6); 6.1002 (2.2); 4.7630 (1.1); 4.7533 (1.2); 4.2173 (1.3); 4.2108 (1.5); 4.1958 (1.5); 4.1893 (1.6); 3.8515 (0.7); 3.8475 (0.7); 3.8417 (0.9); 3.8381 (0.9); 3.8319 (1.0); 3.8285 (0.9); 3.8249 (0.8); 3.8227 (0.8); 3.8122 (0.4); 3.7817 (2.0); 3.7692 (1.4); 3.7602 (1.8); 3.7476 (1.4); 2.9828 (8.6); 2.9727 (9.1); 2.9600 (1.6); 2.9503 (1.4); 2.9323 (1.5); 2.9228 (1.4); 2.7000 (1.5); 2.6804 (1.5); 2.6727 (1.4); 2.6529 (1.2); 2.6119 (12.8); 2.2491 (16.0); 2.1702 (15.0); 1.2548 (0.8); 0.8463 (0.4); 0.0712 (1.2); −0.0002 (5.3)
I-003: $^1$H-NMR(400.0 MHz, $d_6$-DMSO):
δ = 8.0691 (16.0); 7.7706 (1.0); 7.7504 (3.4); 7.7303 (3.6); 7.7152 (4.4); 7.7016 (5.9); 7.6184 (2.8); 7.5984 (2.1); 7.4089 (3.5); 7.4013 (3.3); 7.2721 (7.1); 7.2511 (10.1); 7.1570 (11.0); 7.1361 (7.7); 5.7549 (6.2); 4.0558 (0.5); 4.0380 (1.6); 4.0202 (1.7); 4.0024 (0.6); 3.8298 (1.1); 3.8230 (2.0); 3.7994 (4.4); 3.7725 (2.0); 3.7605 (3.2); 3.7534 (1.9); 3.7365 (1.8); 3.7284 (0.8); 3.3217 (129.8); 2.8669 (0.5); 2.8538 (0.6); 2.8337 (2.9); 2.8215 (4.4); 2.8054 (2.6); 2.7907 (0.6); 2.7712 (0.5); 2.6753 (0.8); 2.6709 (1.0); 2.6663 (0.8); 2.6619 (0.4); 2.5240 (3.1); 2.5106 (63.6); 2.5063 (131.0); 2.5018 (174.2); 2.4973 (124.7); 2.4929 (59.8); 2.3331 (0.7); 2.3285 (1.0); 2.3241 (0.7); 2.0739 (3.3); 1.9886 (7.0); 1.3358 (0.4); 1.2983 (0.7); 1.2587 (1.1); 1.2346 (2.6); 1.1928 (2.2); 1.1750 (4.2); 1.1572 (2.1); 0.9404 (0.4); 0.9235 (0.4); 0.8534 (0.4); 0.0077 (0.6); −0.0003 (17.2); −0.0084 (0.6)
I-004: $^1$H-NMR(499.9 MHz, CDCl3):
δ = 7.9364 (5.2); 7.5605 (0.6); 7.5473 (1.0); 7.5342 (0.6); 7.4162 (0.5); 7.4138 (0.5); 7.3999 (1.1); 7.3861 (0.7); 7.3837 (0.6); 7.3215 (0.9); 7.3054 (1.3); 7.2893 (0.5); 7.2598 (4.4); 6.9781 (1.8); 6.9628 (2.0); 6.8688 (2.0); 6.6891 (1.1); 6.6741 (1.0); 6.0251 (1.2); 4.2657 (0.9); 4.2592 (1.0); 4.2442 (1.0); 4.2377 (1.0); 3.8922 (0.4); 3.8876 (0.4); 3.8818 (0.6); 3.8780 (0.5); 3.8721 (0.6); 3.8684 (0.5); 3.8655 (0.4); 3.8623 (0.4); 3.8302 (1.6); 3.8179 (1.0); 3.8087 (1.4); 3.7963 (1.0); 2.9979 (0.8); 2.9881 (0.8); 2.9706 (1.0); 2.9607 (0.9); 2.7425 (1.1); 2.7230 (1.1); 2.7152 (0.9); 2.6956 (0.9); 2.6411 (16.0); 2.2708 (11.4); 2.1118 (10.6); −0.0002 (5.4)
I-005: $^1$H-NMR(400.2 MHz, $d_6$-DMSO):
δ = 8.0849 (8.6); 7.9524 (1.3); 7.4247 (1.5); 7.4167 (1.5); 7.2527 (0.5); 7.2484 (0.5); 7.2317 (1.4); 7.2276 (1.4); 7.2108 (1.1); 7.2070 (1.2); 7.1790 (0.9); 7.1751 (1.0); 7.1570 (1.4); 7.1390 (0.6); 7.1354 (0.5); 7.0574 (2.0); 7.0382 (2.4); 6.9707 (0.8); 6.9667 (0.9); 6.9537 (1.0); 6.9504 (1.5); 6.9466 (1.0); 6.9334 (3.1); 6.8353 (1.3); 6.8165 (1.1); 3.9038 (16.0); 3.7795 (0.3); 3.7611 (1.5); 3.7519 (3.0); 3.7482 (2.9); 3.7361 (0.7); 3.7264 (1.1); 3.7208 (0.9); 3.7084 (0.6); 3.6996 (0.4); 3.3316 (26.0); 2.8906 (9.7); 2.8112 (1.2); 2.7965 (2.0); 2.7804 (1.3); 2.7316 (8.4); 2.5249 (0.6); 2.5201 (0.8); 2.5114 (9.7); 2.5070 (19.6); 2.5025 (25.9); 2.4979 (19.2); 2.4934 (9.5); 2.2409 (11.6); 2.1940 (10.6); −0.0002 (5.1)
I-006: $^1$H-NMR(300.2 MHz, CDCl3):
δ = 7.3681 (1.0); 7.3416 (2.4); 7.3147 (1.8); 7.2998 (5.3); 7.2987 (5.2); 7.2380 (1.8); 7.2349 (1.8); 7.2048 (2.2); 7.1972 (2.7); 7.1910 (1.4); 7.1157 (1.3); 7.1113 (1.2); 7.0883 (1.0); 7.0847 (1.0); 7.0424 (2.7); 7.0212 (0.8); 6.9957 (3.7); 6.9854 (2.6); 6.9592 (0.6); 5.3371 (2.7); 5.3360 (2.6); 4.9524 (1.6); 4.2431 (16.0); 4.1684 (0.4); 4.1582 (0.9); 4.1461 (1.2); 4.1217 (1.2); 4.1102 (1.2); 3.9416 (0.5); 3.9328 (0.6); 3.9224 (0.7); 3.9135 (0.8); 3.9037 (0.7); 3.8945 (0.5); 3.8849 (0.4); 3.8417 (1.5); 3.8229 (1.0); 3.8052 (1.1); 3.7864 (0.9); 3.0132 (0.7); 2.9936 (0.7); 2.9671 (1.2); 2.9475 (1.1); 2.8402 (1.2); 2.8118 (1.1); 2.7942 (0.8); 2.7657 (0.7); 2.6456 (0.4); 2.5162 (15.1); 2.3298 (12.2); 2.3104 (13.5); 2.1655 (0.8); 2.0810 (1.2); 2.0433 (5.2); 2.0422 (5.1); 1.6617 (1.1); 1.3203 (0.4); 1.2952 (1.2); 1.2731 (0.6); 0.8981 (0.5); 0.8766 (0.6); 0.1081 (0.7); 0.0380 (5.1); 0.0368 (5.0)
I-007: $^1$H-NMR(499.9 MHz, $d_6$-DMSO):
δ = 8.1831 (16.0); 8.1727 (0.4); 8.1431 (8.2); 7.7474 (6.8); 7.7330 (4.5); 7.7171 (3.9); 7.6924 (4.7); 7.6769 (2.4); 7.6446 (3.4); 7.6284 (2.5); 7.5820 (6.9); 7.5777 (7.3); 7.4682 (3.6); 7.4517 (4.4); 7.3128 (2.7); 7.3093 (2.8); 7.2965 (2.3); 7.2930 (2.3); 4.3091 (1.2); 3.7162 (1.2); 3.5268 (0.9); 3.3395 (6.1); 3.0209 (2.1); 3.0071 (2.1); 2.9934 (2.9); 2.9797 (2.8); 2.8882 (2.8); 2.8746 (2.9); 2.8608 (2.1); 2.8471 (2.0); 2.6402 (0.7); 2.6366 (0.9); 2.6330 (0.8); 2.5231 (2.8); 2.5195 (3.6); 2.5053 (81.5); 2.5017 (113.2); 2.4982 (87.2); 2.3664 (0.6); 2.3628 (0.8); 2.3593 (0.6)
I-008: $^1$H-NMR(300.2 MHz, CDCl3):
δ = 7.6575 (6.0); 7.5545 (0.4); 7.5258 (2.8); 7.5083 (5.3); 7.2989 (10.6); 7.2789 (2.8); 7.2264 (0.3); 7.2119 (1.0); 7.1998 (1.4); 7.1931 (1.4); 7.1819 (1.1); 7.1740 (0.8); 6.9976 (2.5); 6.9722 (3.0); 6.9358 (3.2); 6.7594 (1.8); 6.7339 (1.5); 6.1087 (2.1);

TABLE 2-continued 5.3656 (2.2); 5.3375 (0.6); 4.2843 (1.2); 4.2745 (1.4); 4.2495 (1.5); 4.2400 (1.4); 3.8933 (0.8); 3.8766 (0.9); 3.8683 (0.7); 3.8608 (0.8); 3.8446 (2.6); 3.8238 (0.9); 3.8099 (1.8); 3.7889 (1.1); 3.0177 (1.0); 3.0031 (1.0); 2.9725 (1.4); 2.9571 (1.3); 2.7530 (1.4); 2.7214 (1.3); 2.7080 (1.1); 2.6757 (1.0); 2.6232 (0.9); 2.6111 (1.2); 2.6036 (0.9); 2.3343 (0.5); 2.3261 (0.4); 2.2904 (16.0); 2.2529 (0.5); 2.2179 (15.0); 1.7901 (0.8); 1.2916 (0.8); 0.9108 (0.6); 0.8898 (3.1); 0.8734 (3.2); 0.8683 (2.8); 0.8527 (0.9); 0.6339 (0.9); 0.6189 (2.8); 0.6109 (3.2); 0.6009 (2.6); 0.5845 (0.8); 0.1074 (1.3); 0.0373 (11.6)

I-009: $^{1}$H-NMR(300.2 MHz, CDCl3):
δ = 8.4299 (6.8); 7.6093 (4.4); 7.5923 (4.4); 7.5654 (0.3); 7.3649 (2.6); 7.3138 (1.1); 7.2989 (10.8); 7.2760 (0.7); 7.0123 (2.5); 6.9868 (2.9); 6.9249 (3.1); 6.7230 (1.7); 6.6994 (1.4); 6.0943 (2.1); 5.5674 (3.4); 5.5594 (3.5); 5.3373 (0.8); 4.4552 (3.1); 4.4472 (3.2); 4.3387 (1.1); 4.3290 (1.4); 4.3041 (1.5); 4.2949 (1.4); 4.0408 (1.4); 4.0176 (4.4); 3.9943 (4.5); 3.9709 (1.6); 3.9480 (0.6); 3.9313 (0.8); 3.9151 (0.8); 3.9065 (0.7); 3.8992 (0.8); 3.8865 (2.7); 3.8659 (0.8); 3.8522 (1.8); 3.8312 (1.1); 3.0565 (1.0); 3.0426 (1.0); 3.0115 (1.4); 2.9963 (1.3); 2.7774 (1.3); 2.7456 (1.3); 2.7323 (1.1); 2.6998 (1.0); 2.3049 (16.0); 2.2389 (0.4); 2.1940 (14.9); 1.5999 (14.5); 1.4943 (4.7); 1.4710 (9.8); 1.4478 (4.6); 1.4067 (0.4); 1.3835 (0.4); 1.3610 (0.6); 1.3333 (0.5); 1.3069 (1.1); 0.9852 (0.6); 0.9610 (1.2); 0.9369 (0.7); 0.9201 (0.8); 0.8968 (0.4); 0.1087 (1.2); 0.0485 (0.4); 0.0382 (10.6)

I-010: $^{1}$H-NMR(400.2 MHz, $d_6$-DMSO):
δ = 8.3149 (0.5); 8.0160 (1.7); 8.0061 (1.7); 7.8968 (6.8); 7.7408 (0.6); 7.7215 (1.8); 7.7004 (3.4); 7.6683 (3.9); 7.6630 (5.1); 7.6385 (2.1); 7.6175 (0.9); 7.6131 (0.9); 7.5242 (2.5); 7.5031 (3.3); 7.3900 (2.0); 7.3847 (1.9); 7.3690 (1.5); 7.3637 (1.4); 5.7548 (8.8); 5.0826 (0.6); 5.0741 (1.5); 5.0647 (1.5); 5.0558 (0.6); 4.0399 (0.9); 4.0314 (1.0); 4.0119 (1.5); 4.0035 (1.3); 3.9015 (1.2); 3.8933 (1.2); 3.8734 (0.9); 3.8650 (1.0); 3.3216 (143.7); 2.6751 (1.2); 2.6705 (1.7); 2.6660 (1.2); 2.6615 (0.6); 2.6263 (16.0); 2.5241 (5.2); 2.5192 (8.1); 2.5106 (99.3); 2.5061 (195.0); 2.5016 (253.0); 2.4970 (184.0); 2.4925 (90.1); 2.3375 (0.6); 2.3330 (1.2); 2.3284 (1.6); 2.3239 (1.2); 2.3195 (0.6); 2.0737 (0.3); 1.2352 (0.5); 0.8761 (0.4); 0.1460 (1.4); 0.1168 (3.2); 0.0899 (2.2); 0.0610 (2.0); 0.0080 (11.2); −0.0001 (308.4); −0.0084 (12.5); −0.1496 (1.4)

I-011: $^{1}$H-NMR(499.9 MHz, CDCl3):
δ = 7.9822 (5.1); 7.6532 (2.2); 7.6372 (2.1); 7.5021 (0.5); 7.4859 (2.9); 7.4759 (4.8); 7.3538 (2.8); 7.3316 (2.4); 7.3159 (3.8); 7.2585 (9.4); 7.2423 (1.9); 7.2272 (1.0); 7.0797 (4.9); 7.0568 (1.4); 7.0411 (2.1); 7.0267 (1.1); 6.1856 (2.1); 5.0888 (1.1); 5.0808 (1.2); 5.0732 (1.2); 5.0649 (1.0); 4.4325 (1.2); 4.4242 (1.2); 4.4105 (1.3); 4.4022 (1.2); 4.0366 (1.5); 4.0202 (1.6); 4.0147 (1.4); 3.9983 (1.2); 3.7438 (16.0); 2.6947 (15.5); 2.0428 (1.2); 1.5564 (2.7); 1.2723 (0.5); 1.2579 (0.9); 1.2437 (0.3); 0.0701 (0.6); −0.0002 (10.2)

I-012: $^{1}$H-NMR(300.2 MHz, CDCl3):
δ = 8.0009 (6.4); 7.5966 (4.6); 7.5798 (4.1); 7.5534 (0.3); 7.3519 (2.7); 7.2997 (14.2); 7.2981 (13.5); 7.2789 (1.4); 7.2726 (1.2); 7.2657 (1.0); 7.2574 (0.7); 7.0046 (2.5); 6.9790 (2.9); 6.9209 (3.1); 6.7152 (1.7); 6.6901 (1.4); 6.1644 (2.0); 4.3314 (1.2); 4.3213 (1.4); 4.2964 (1.5); 4.2863 (1.5); 4.1721 (0.9); 4.1483 (0.9); 4.1242 (0.4); 3.9181 (0.8); 3.9058 (0.9); 3.8987 (0.7); 3.8890 (0.7); 3.8818 (0.6); 3.8661 (2.3); 3.8450 (1.0); 3.8313 (1.8); 3.8101 (1.1); 3.0521 (1.1); 3.0377 (1.2); 3.0246 (1.6); 2.9992 (5.2); 2.9739 (4.9); 2.9485 (1.7); 2.7618 (1.4); 2.7295 (1.4); 2.7167 (1.2); 2.6837 (1.1); 2.3006 (16.0); 2.1898 (14.9); 2.0843 (4.1); 1.6221 (0.7); 1.3974 (5.0); 1.3725 (10.0); 1.3715 (9.9); 1.3470 (4.9); 1.3222 (1.2); 1.2967 (3.0); 1.2745 (1.2); 0.1082 (0.7); 0.0479 (0.6); 0.0386 (16.4); 0.0370 (15.8)

I-013: $^{1}$H-NMR(499.9 MHz, CDCl3):
δ = 7.9380 (5.2); 7.5220 (0.8); 7.5063 (1.8); 7.4904 (1.2); 7.4267 (1.6); 7.4113 (1.1); 7.2610 (11.8); 7.2063 (2.1); 7.1461 (1.1); 7.1439 (1.1); 7.1299 (1.1); 7.1276 (1.0); 6.9597 (2.0); 6.9444 (2.2); 6.8873 (2.4); 6.7791 (1.1); 6.6850 (1.3); 6.6665 (3.0); 6.5535 (1.1); 6.1534 (1.5); 5.2986 (7.8); 4.2586 (1.0); 4.2522 (1.1); 4.2371 (1.1); 4.2307 (1.2); 3.8749 (0.4); 3.8709 (0.5); 3.8654 (0.6); 3.8614 (0.6); 3.8552 (0.7); 3.8481 (0.5); 3.8455 (0.5); 3.8071 (1.6); 3.7945 (1.1); 3.7855 (1.4); 3.7729 (1.1); 2.9894 (0.8); 2.9800 (0.9); 2.9620 (1.0); 2.9526 (1.0); 2.7114 (1.1); 2.6916 (1.1); 2.6840 (1.0); 2.6642 (0.9); 2.6367 (16.0); 2.2594 (12.2); 2.1649 (11.5); 2.0445 (1.3); 1.5820 (9.2); 1.2586 (0.9); 1.2555 (0.9); 1.2446 (0.3); 0.9357 (0.4); 0.0062 (0.4); −0.0002 (11.4)

I-014: $^{1}$H-NMR(300.2 MHz, CDCl3):
δ = 8.2582 (3.2); 7.6116 (2.1); 7.5949 (1.7); 7.3622 (1.2); 7.2987 (8.5); 7.2881 (0.8); 7.2814 (0.6); 7.2679 (0.3); 7.0348 (0.7); 7.0072 (1.2); 6.9982 (0.9); 6.9815 (1.4); 6.9387 (0.9); 6.9231 (1.5); 6.7145 (0.8); 6.6896 (0.7); 6.2641 (1.5); 6.2049 (1.3); 6.1586 (1.0); 5.6878 (1.4); 5.6509 (1.4); 4.3449 (0.5); 4.3347 (0.6); 4.3096 (0.7); 4.2995 (0.7); 3.9299 (0.4); 3.9146 (0.4); 3.8985 (0.3); 3.8914 (0.3); 3.8778 (1.1); 3.8570 (0.4); 3.8430 (0.8); 3.8219 (0.5); 3.0604 (0.5); 3.0462 (0.5); 3.0154 (0.6); 2.9999 (0.6); 2.7673 (0.6); 2.7349 (0.6); 2.7221 (0.6); 2.6891 (0.5); 2.3039 (7.3); 2.1892 (6.9); 2.0834 (0.5); 1.6029 (16.0); 1.2973 (0.9); 0.9193 (0.6); 0.1070 (0.8); 0.0480 (0.3); 0.0372 (7.7)

I-015: $^{1}$H-NMR(300.2 MHz, CDCl3):
δ = 8.0398 (5.2); 7.9135 (1.8); 7.8942 (1.1); 7.8851 (2.7); 7.8628 (3.4); 7.7663 (0.9); 7.7483 (0.9); 7.7351 (1.1); 7.5838 (1.5); 7.5693 (2.0); 7.5644 (4.1); 7.5611 (4.1); 7.5538 (2.2); 7.5501 (2.4); 7.5356 (3.4); 7.5260 (3.2); 7.5030 (1.7); 7.4971 (1.5); 7.4744 (1.4); 7.4686 (1.4); 7.4634 (1.0); 7.4522 (1.2); 7.4448 (1.0); 7.4320 (0.8); 7.4238 (0.4); 7.2989 (15.3); 6.3678 (1.4); 4.9973 (0.6); 4.9882 (0.7); 4.9818 (0.8); 4.9732 (0.7); 4.9646 (0.6); 4.4812 (0.8); 4.4697 (0.8); 4.4441 (1.0); 4.4328 (0.9); 4.1707 (0.4); 4.1473 (0.4); 4.1240 (0.4); 4.1022 (0.6); 3.9204 (1.4); 3.8962 (1.4); 3.8834 (1.3); 3.8591 (1.2); 2.7518 (16.0); 2.0828 (3.6); 1.6711 (0.4); 1.6490 (0.5); 1.6402 (0.5); 1.6011 (1.3); 1.3444 (0.3); 1.3208 (0.8); 1.2940 (2.8); 1.2732 (0.7); 0.9980 (0.5); 0.9736 (1.0); 0.9492 (0.4); 0.9191 (0.4); 0.1089 (1.0); 0.0495 (0.6); 0.0387 (18.3); 0.0278 (0.8)

I-016: $^{1}$H-NMR(300.2 MHz, CDCl3):
δ = 8.1593 (8.5); 7.6555 (4.0); 7.6382 (5.0); 7.4904 (3.5); 7.4847 (3.6); 7.4149 (2.3); 7.3157 (0.9); 7.2987 (17.1); 7.2855 (1.1); 7.2769 (0.8); 7.1496 (1.0); 7.1436 (0.9); 7.1225 (3.4); 7.1164 (3.6); 7.1015 (5.3); 7.0744 (1.4); 6.0646 (1.5); 5.3375 (2.2); 4.2023 (1.2); 4.1925 (1.5); 4.1666 (1.8); 4.1565 (2.0); 4.0578 (0.6); 4.0472 (0.8); 4.0306 (0.9); 4.0184 (1.0); 4.0087 (0.6); 4.0012 (0.6); 3.9914 (0.4); 3.9757 (2.2); 3.9600 (1.3); 3.9398 (1.5); 3.9242 (1.1); 3.1762 (1.1); 3.1589 (1.1); 3.1311 (1.9); 3.1136 (1.8); 3.0183 (1.9); 2.9887 (1.8); 2.9734 (1.2); 2.9435 (1.1); 2.0823 (1.1); 1.5867 (16.0); 1.2968 (0.7); 0.1076 (3.9); 0.0488 (0.7); 0.0379 (19.0); 0.0269 (0.7)

I-017: $^{1}$H-NMR(300.2 MHz, CDCl3):
δ = 8.1640 (8.3); 7.6566 (3.3); 7.6519 (2.1); 7.6393 (4.9); 7.3917 (2.2); 7.2985 (14.8); 7.2564 (3.3); 7.2501 (3.5); 7.2432 (1.7); 7.2366 (1.3); 7.2270 (1.0); 7.2187 (0.7); 7.0563 (0.9); 7.0500 (0.8); 7.0293 (2.1); 7.0228 (2.2); 6.9936 (4.2); 6.9666 (1.6); 6.0785 (1.6); 5.3374 (2.7); 4.2585 (1.4); 4.2329 (1.7); 4.2136 (0.4); 3.9344 (0.5); 3.9249 (0.6); 3.9160 (0.9); 3.9019 (2.1); 3.8870 (0.9); 3.8724 (2.1); 3.8541 (0.8); 3.0382 (0.9); 3.0230 (0.9); 2.9926 (1.4); 2.9768 (1.3); 2.8220 (1.2); 2.7909 (1.2); 2.7766 (0.9); 2.7448 (0.8); 2.3204 (16.0); 2.0827 (1.2); 1.5830 (9.2); 1.2971 (0.5); 0.1078 (0.6); 0.0487 (0.7); 0.0381 (19.4); 0.0270 (0.6)

I-018: $^{1}$H-NMR(300.2 MHz, CDCl3):
δ = 8.0009 (5.2); 7.6148 (0.5); 7.5891 (1.7); 7.5671 (4.8); 7.5460 (0.5); 7.4934 (2.6); 7.4568 (1.0); 7.4492 (1.6); 7.4425 (1.1); 7.4265 (1.1); 7.3003 (11.0); 7.1857 (1.3); 7.1596 (3.3); 7.1476 (3.3); 7.1277 (2.2); 7.0992 (0.9); 6.1870 (1.9); 5.3393 (5.2); 4.7514 (0.9); 4.7380 (1.0); 4.7269 (1.0); 4.7124 (1.0); 4.3916 (1.2); 4.3777 (1.1); 4.3549 (1.3); 4.3409 (1.2); 3.7520 (1.5); 3.7260 (1.4); 3.7152 (1.4); 3.6893 (1.3); 2.7564 (0.4); 2.7335 (16.0); 2.3486 (0.4); 2.3228 (0.4); 2.2834 (13.3); 2.2222 (13.1); 2.1877 (0.3); 2.0844 (1.4); 1.6154 (4.2); 1.3223 (0.5); 1.2985 (1.0); 1.2748 (0.4); 0.1092 (3.2); 0.0392 (14.1)

TABLE 2-continued

I-019: $^{1}$H-NMR(300.2 MHz, CDCl3):
δ = 8.1622 (8.7); 7.6504 (0.4); 7.6394 (4.7); 7.6362 (4.7); 7.6288 (2.0); 7.6243 (2.1); 7.6182 (2.5); 7.5917 (0.4); 7.3989 (2.3); 7.2987 (14.6); 7.2847 (1.0); 7.2761 (1.2); 7.2641 (1.3); 7.2574 (1.2); 7.2460 (0.7); 6.9900 (2.6); 6.9641 (3.0); 6.8192 (2.8); 6.5891 (1.6); 6.5835 (1.6); 6.5634 (1.4); 6.5577 (1.4); 6.1172 (1.9); 4.3289 (1.0); 4.3202 (1.3); 4.2942 (1.4); 4.2857 (1.2); 3.9179 (0.5); 3.9019 (0.7); 3.8915 (0.6); 3.8851 (0.8); 3.8760 (0.6); 3.8689 (0.8); 3.8596 (2.7); 3.8390 (0.8); 3.8252 (1.9); 3.8043 (1.1); 3.0504 (1.0); 3.0364 (1.0); 3.0053 (1.4); 2.9902 (1.3); 2.7430 (1.2); 2.7108 (1.2); 2.6978 (1.2); 2.6650 (1.0); 2.2999 (16.0); 1.7742 (0.3); 1.7572 (0.7); 1.7459 (0.8); 1.7292 (1.5); 1.7123 (0.9); 1.7011 (0.9); 1.6841 (0.6); 1.6521 (5.5); 0.9521 (0.5); 0.9359 (2.4); 0.9295 (2.7); 0.9135 (1.2); 0.9077 (2.5); 0.9014 (2.4); 0.8857 (0.6); 0.5647 (1.0); 0.5576 (1.3); 0.5485 (2.0); 0.5417 (2.6); 0.5349 (2.2); 0.5251 (1.5); 0.5185 (1.1); 0.1077 (1.3); 0.0485 (0.5); 0.0377 (16.0); 0.0268 (0.6)
I-020: $^{1}$H-NMR(300.2 MHz, CDCl3):
δ = 8.2759 (0.5); 8.1614 (16.0); 7.6511 (0.9); 7.6402 (8.7); 7.6374 (8.0); 7.6284 (4.0); 7.6230 (5.9); 7.5938 (0.6); 7.4169 (4.4); 7.3341 (1.8); 7.3250 (2.1); 7.3151 (2.8); 7.3088 (2.4); 7.2986 (16.3); 7.0801 (5.7); 7.0540 (6.4); 7.0100 (6.5); 7.0041 (6.8); 6.9887 (0.3); 6.6804 (3.7); 6.6744 (3.7); 6.6543 (3.2); 6.6483 (3.2); 6.1040 (3.1); 4.2671 (2.3); 4.2564 (2.6); 4.2310 (2.9); 4.2203 (3.1); 4.0577 (0.4); 4.0473 (0.6); 4.0396 (1.0); 4.0305 (1.3); 4.0233 (1.3); 4.0153 (1.4); 4.0083 (1.4); 3.9999 (1.4); 3.9921 (1.1); 3.9833 (0.9); 3.9733 (0.5); 3.9182 (3.8); 3.8998 (2.7); 3.8820 (3.1); 3.8636 (2.4); 3.1723 (2.1); 3.1564 (2.1); 3.1272 (3.1); 3.1113 (2.9); 2.9287 (3.1); 2.8975 (3.0); 2.8837 (2.3); 2.8524 (2.1); 2.0819 (1.0); 2.0438 (0.9); 1.7885 (0.7); 1.7717 (1.3); 1.7605 (1.4); 1.7437 (2.8); 1.7269 (1.6); 1.7158 (1.5); 1.6988 (0.8); 1.5983 (12.6); 1.2964 (0.5); 0.9968 (0.9); 0.9792 (4.5); 0.9733 (5.2); 0.9700 (4.3); 0.9512 (4.7); 0.9453 (4.5); 0.9283 (1.0); 0.9101 (0.3); 0.6107 (0.5); 0.6020 (0.4); 0.5935 (0.6); 0.5795 (2.9); 0.5757 (2.4); 0.5703 (2.3); 0.5632 (4.7); 0.5578 (4.4); 0.5543 (4.2); 0.5474 (2.3); 0.5399 (2.6); 0.5267 (0.5); 0.5224 (0.5); 0.5160 (0.4); 0.5056 (0.4); 0.0477 (0.6); 0.0371 (19.6); 0.0261 (0.7)
I-021: $^{1}$H-NMR(300.2 MHz, CDCl3):
δ = 8.1713 (12.5); 7.6375 (6.4); 7.6343 (6.6); 7.6261 (3.0); 7.6208 (3.8); 7.6172 (4.1); 7.5906 (0.6); 7.4428 (3.3); 7.3555 (1.3); 7.3470 (1.7); 7.3364 (2.0); 7.3298 (1.7); 7.3257 (1.3); 7.3169 (1.0); 7.2989 (19.2); 7.1958 (4.5); 7.1902 (4.8); 7.1358 (4.1); 7.1098 (4.8); 6.8484 (2.6); 6.8428 (2.6); 6.8224 (2.2); 6.8168 (2.2); 6.1296 (2.4); 5.3379 (0.4); 4.2733 (1.7); 4.2626 (2.0); 4.2372 (2.2); 4.2265 (2.4); 4.0481 (0.7); 4.0327 (1.0); 4.0244 (1.1); 4.0174 (1.0); 4.0086 (1.1); 4.0012 (0.8); 3.9929 (0.7); 3.9823 (0.4); 3.9344 (2.9); 3.9160 (2.0); 3.8983 (2.3); 3.8798 (1.7); 3.1899 (1.6); 3.1744 (1.6); 3.1450 (2.3); 3.1293 (2.2); 2.9467 (2.4); 2.9156 (2.2); 2.9019 (1.8); 2.8705 (1.6); 2.8134 (0.6); 2.7907 (1.5); 2.7678 (2.1); 2.7448 (1.6); 2.7216 (0.7); 1.6106 (4.4); 1.2911 (0.4); 1.2434 (0.5); 1.2203 (0.6); 1.1628 (15.5); 1.1543 (16.0); 1.1397 (15.5); 1.1313 (15.5); 0.9294 (0.4); 0.9052 (0.7); 0.1074 (1.8); 0.0482 (0.7); 0.0374 (21.2); 0.0265 (0.8)
I-022: $^{1}$H-NMR(300.2 MHz, CDCl3):
δ = 8.1556 (4.2); 7.6218 (2.2); 7.6188 (2.6); 7.6093 (0.9); 7.5989 (1.2); 7.3483 (1.2); 7.2987 (8.7); 7.2672 (0.5); 7.2595 (0.7); 7.2454 (0.6); 7.2380 (0.7); 7.2287 (0.4); 6.9673 (1.6); 6.8960 (1.8); 6.8897 (3.2); 6.1298 (0.9); 5.3372 (1.8); 4.3501 (0.6); 4.3400 (0.6); 4.3143 (0.7); 4.3038 (0.7); 4.1714 (1.0); 4.1476 (1.0); 4.1239 (0.4); 3.9270 (0.4); 3.9223 (0.4); 3.9164 (0.4); 3.9108 (0.3); 3.9054 (0.4); 3.8250 (1.2); 3.8029 (0.7); 3.7891 (1.0); 3.7670 (0.7); 3.0294 (0.5); 3.0140 (0.5); 2.9845 (0.7); 2.9690 (0.6); 2.6547 (0.8); 2.6217 (0.8); 2.6098 (0.7); 2.5765 (0.6); 2.1286 (7.9); 2.1021 (8.1); 2.0826 (5.0); 2.0440 (1.3); 1.5959 (16.0); 1.3208 (1.2); 1.2970 (2.4); 1.2732 (1.1); 0.1076 (1.9); 0.0378 (9.7); 0.0269 (0.4)
I-023: $^{1}$H-NMR(300.2 MHz, CDCl3):
δ = 8.1706 (8.2); 7.6486 (0.3); 7.6360 (4.0); 7.6328 (4.6); 7.6272 (1.9); 7.6226 (1.8); 7.6134 (2.2); 7.5870 (0.4); 7.4230 (2.1); 7.3165 (0.9); 7.3089 (1.3); 7.2987 (12.3); 7.2883 (1.4); 7.2784 (0.7); 7.0377 (2.3); 7.0119 (2.8); 6.9867 (2.7); 6.7625 (1.5); 6.7569 (1.5); 6.7367 (1.3); 6.7312 (1.3); 6.1531 (1.7); 4.3309 (0.9); 4.3222 (1.2); 4.2963 (1.3); 4.2876 (1.1); 4.1947 (0.9); 4.1708 (2.7); 4.1470 (2.8); 4.1233 (1.0); 3.9274 (0.5); 3.9144 (0.6); 3.9064 (0.6); 3.8952 (0.7); 3.8854 (0.6); 3.8716 (2.5); 3.8511 (0.6); 3.8373 (1.8); 3.8164 (1.0); 3.0636 (0.9); 3.0500 (0.9); 3.0183 (1.4); 3.0038 (1.3); 2.7925 (0.4); 2.7691 (1.1); 2.7576 (1.3); 2.7462 (1.5); 2.7243 (2.0); 2.7121 (1.2); 2.7007 (0.5); 2.6795 (1.0); 2.3677 (0.5); 2.3298 (14.7); 2.0830 (12.3); 1.6012 (16.0); 1.3210 (3.3); 1.2972 (6.5); 1.2839 (0.4); 1.2734 (3.2); 1.2609 (0.3); 1.2227 (0.6); 1.1997 (0.6); 1.1621 (10.2); 1.1526 (10.5); 1.1391 (10.2); 1.1296 (10.2); 0.1077 (1.1); 0.0484 (0.4); 0.0376 (12.9); 0.0266 (0.5)
I-024: $^{1}$H-NMR(499.9 MHz, CDCl3):
δ = 8.1176 (8.0); 7.5773 (0.7); 7.5655 (1.3); 7.5518 (0.8); 7.3426 (0.8); 7.3266 (2.1); 7.3108 (1.9); 7.3032 (1.1); 7.2999 (1.2); 7.2874 (1.4); 7.2716 (0.6); 7.2601 (7.6); 6.9914 (1.4); 6.9602 (2.5); 6.9449 (2.7); 6.8819 (2.9); 6.8645 (2.8); 6.7724 (1.4); 6.6673 (1.5); 6.6523 (1.3); 6.0266 (1.7); 4.2866 (1.3); 4.2802 (1.3); 4.2651 (1.4); 4.2585 (1.4); 3.8865 (0.6); 3.8824 (0.6); 3.8788 (0.8); 3.8765 (0.8); 3.8727 (0.7); 3.8665 (0.8); 3.8629 (0.6); 3.8597 (0.6); 3.8567 (0.6); 3.8530 (0.4); 3.8226 (2.1); 3.8101 (1.3); 3.8011 (1.8); 3.7886 (1.3); 3.0078 (1.1); 2.9981 (1.1); 2.9805 (1.3); 2.9708 (1.2); 2.7181 (1.4); 2.6983 (1.4); 2.6908 (1.2); 2.6710 (1.1); 2.2663 (15.0); 2.1374 (0.3); 2.1112 (14.0); 2.0035 (16.0); 1.5659 (3.3); 0.0062 (0.5); −0.0002 (7.6)
I-025: $^{1}$H-NMR(300.2 MHz, CDCl3):
δ = 8.1610 (3.5); 7.6500 (1.9); 7.6327 (1.8); 7.4041 (1.0); 7.3372 (1.5); 7.3302 (1.6); 7.3194 (0.4); 7.3107 (0.5); 7.2987 (8.3); 7.2807 (0.3); 7.1690 (1.2); 7.1417 (1.6); 6.9965 (1.0); 6.9894 (1.0); 6.9693 (0.7); 6.9622 (0.7); 6.0661 (0.6); 5.3373 (2.4); 4.2068 (0.5); 4.1966 (0.6); 4.1707 (0.8); 4.1608 (0.8); 4.0501 (0.3); 4.0331 (0.4); 4.0217 (0.4); 3.9754 (0.9); 3.9597 (0.6); 3.9396 (0.6); 3.9238 (0.5); 3.1899 (0.4); 3.1726 (0.4); 3.1448 (0.8); 3.1274 (0.7); 3.0286 (0.8); 2.9989 (0.7); 2.9836 (0.5); 2.9536 (0.4); 2.0820 (0.5); 1.5923 (16.0); 1.3452 (0.4); 1.3202 (0.8); 1.3045 (2.3); 1.2974 (2.1); 0.9414 (0.8); 0.9197 (2.5); 0.8964 (1.0); 0.1073 (2.3); 0.0376 (9.0); 0.0267 (0.3)
I-026: $^{1}$H-NMR(300.1 MHz, CDCl3):
δ = 7.6924 (5.4); 7.5036 (0.4); 7.4781 (2.0); 7.4678 (2.2); 7.4585 (4.7); 7.3058 (3.2); 7.2842 (1.6); 7.2645 (1.1); 7.1899 (3.9); 7.1099 (6.2); 7.0966 (6.2); 7.0421 (1.3); 7.0293 (1.4); 7.0105 (0.7); 5.2336 (1.4); 5.1971 (1.4); 5.1334 (1.9); 4.3992 (0.5); 4.3898 (0.6); 4.3753 (0.7); 4.3654 (0.8); 4.3586 (0.9); 4.3489 (0.9); 4.3345 (0.9); 4.3250 (0.8); 4.1797 (0.6); 4.1558 (0.9); 4.1503 (0.9); 4.1390 (0.6); 4.1263 (0.8); 4.1149 (0.7); 4.1093 (0.7); 4.0853 (0.5); 2.7381 (0.4); 2.7328 (0.4); 2.7270 (0.4); 2.7144 (0.5); 2.7088 (0.5); 2.7021 (0.5); 2.6907 (0.6); 2.6852 (0.6); 2.6786 (0.6); 2.6726 (0.5); 2.6604 (0.5); 2.6543 (0.5); 2.6492 (0.5); 2.6242 (0.4); 2.5767 (16.0); 2.1486 (0.7); 2.1251 (0.8); 2.1163 (0.8); 2.0887 (14.0); 1.9181 (0.4); 1.7135 (0.4); −0.0008 (1.9); −0.0762 (1.4)
I-027: $^{1}$H-NMR(499.9 MHz, CDCl3):
δ = 7.8980 (5.4); 7.4723 (3.2); 7.4687 (3.1); 7.2638 (1.8); 7.1046 (1.0); 7.0886 (2.3); 7.0828 (2.2); 7.0723 (1.9); 7.0665 (3.8); 7.0414 (2.5); 7.0378 (2.4); 7.0249 (2.1); 7.0101 (1.6); 6.9962 (0.8); 6.9936 (0.7); 6.8242 (1.0); 6.8220 (1.0); 6.8089 (1.6); 6.7954 (0.8); 6.1646 (1.7); 4.1371 (1.3); 4.1308 (1.4); 4.1153 (1.6); 4.1090 (1.5); 4.0015 (0.4); 3.9921 (0.7); 3.9856 (1.0); 3.9767 (1.0); 3.9682 (1.0); 3.9586 (0.6); 3.9207 (1.6); 3.9115 (1.2); 3.8989 (1.3); 3.8897 (1.0); 3.1377 (1.1); 3.1277 (1.1); 3.1108 (1.4); 3.1007 (1.3); 2.9453 (1.4); 2.9270 (1.4); 2.9184 (1.1); 2.9000 (1.0); 2.6365 (16.0); 2.1019 (0.4); 2.0915 (0.7); 2.0848 (0.8); 2.0747 (1.2); 2.0645 (0.8); 2.0579 (0.7); 1.6411 (1.0); 1.0409 (0.7); 1.0316 (2.3); 1.0282 (2.4); 1.0256 (2.0); 1.0147 (2.3); 1.0113 (2.2); 1.0022 (0.5); 0.8031 (0.4); 0.7996 (0.4); 0.7862 (1.7); 0.7804 (1.6); 0.7763 (2.4); 0.7732 (2.4); 0.7711 (2.4); 0.7609 (1.4); −0.0002 (2.4)
I-028: $^{1}$H-NMR(300.2 MHz, CDCl3):
δ = 7.9768 (4.5); 7.5997 (0.6); 7.5735 (1.4); 7.5470 (1.0); 7.4838 (1.2); 7.4579 (0.7); 7.3462 (2.3); 7.3392 (2.4); 7.2989 (10.5); 7.2770 (1.5); 7.2251 (0.8); 7.2218 (0.9); 7.2178 (0.8); 7.1950 (0.8); 7.1910 (0.7); 7.1625 (1.9); 7.1352 (2.4); 6.9665 (1.5); 6.9594 (1.5); 6.9393 (1.2); 6.9322 (1.1); 6.9082 (1.0); 6.7205 (1.9); 6.5327 (1.0); 6.1544 (0.9); 5.3374 (9.2); 4.1905 (0.8);

TABLE 2-continued 4.1803 (0.9); 4.1703 (0.4); 4.1546 (1.1); 4.1447 (1.4); 4.0373 (0.5); 4.0212 (0.5); 4.0082 (0.6); 3.9985 (0.4); 3.9912 (0.4); 3.9599 (1.4); 3.9442 (0.8); 3.9241 (0.9); 3.9083 (0.7); 3.1856 (0.7); 3.1684 (0.7); 3.1406 (1.1); 3.1233 (1.0); 3.0109 (1.1); 2.9810 (1.1); 2.9658 (0.7); 2.9358 (0.7); 2.6888 (14.2); 2.0824 (1.4); 1.6051 (16.0); 1.3203 (0.4); 1.2965 (0.8); 1.2727 (0.3); 0.1066 (1.8); 0.0478 (0.4); 0.0369 (11.6); 0.0258 (0.4)

I-029: $^1$H-NMR(499.9 MHz, CDCl3):
δ = 7.9706 (2.5); 7.8850 (4.3); 7.5588 (0.4); 7.5433 (1.4); 7.5274 (1.9); 7.5215 (2.1); 7.5062 (0.6); 7.4720 (1.9); 7.4249 (1.2); 7.4098 (0.9); 7.3756 (2.3); 7.2823 (0.9); 6.4695 (1.2); 6.3671 (1.0); 6.3607 (1.8); 6.3572 (1.8); 6.3387 (2.3); 6.3322 (1.6); 4.8737 (0.5); 4.8668 (0.8); 4.8613 (1.2); 4.8555 (0.9); 4.8490 (0.6); 4.3114 (0.9); 4.3036 (1.0); 4.2894 (1.1); 4.2816 (1.1); 4.0395 (1.2); 4.0269 (1.2); 4.0176 (1.1); 4.0050 (1.0); 2.9393 (16.0); 2.8554 (14.8); 2.6614 (13.0); 1.9093 (0.6); −0.0002 (1.0)

I-030: $^1$H-NMR(400.1 MHz, $d_6$-DMSO):
δ = 7.7353 (16.0); 7.5384 (10.0); 7.4019 (7.4); 7.3811 (9.6); 7.3707 (6.9); 7.3622 (6.5); 7.1722 (6.9); 7.1555 (9.0); 7.1377 (9.8); 7.1163 (5.2); 7.0971 (1.8); 6.9317 (2.9); 6.9171 (5.2); 6.8983 (2.7); 5.7597 (1.1); 3.8638 (5.8); 3.8416 (9.8); 3.7722 (3.6); 3.7641 (5.0); 3.7435 (3.5); 3.3131 (22.3); 3.0449 (1.4); 3.0255 (1.6); 3.0111 (5.0); 2.9910 (7.5); 2.9735 (4.7); 2.9544 (1.6); 2.9395 (1.3); 2.5789 (43.3); 2.5101 (13.6); 2.1043 (1.0); 2.0910 (2.1); 2.0826 (2.6); 2.0706 (3.9); 2.0586 (2.6); 2.0505 (2.2); 2.0369 (1.0); 1.0606 (0.4); 1.0464 (2.4); 1.0323 (8.3); 1.0119 (8.0); 1.0008 (2.7); 0.8415 (0.4); 0.8282 (0.4); 0.8031 (3.1); 0.7909 (10.3); 0.7789 (9.7); 0.7661 (2.4)

I-031: $^1$H-NMR(300.2 MHz, CDCl3):
δ = 8.0083 (5.3); 7.5863 (1.3); 7.5644 (4.0); 7.5427 (0.4); 7.4936 (1.9); 7.4536 (0.9); 7.4451 (1.5); 7.4379 (1.1); 7.4211 (2.4); 7.4066 (13.7); 7.3887 (0.8); 7.3803 (0.7); 7.2986 (8.3); 6.2693 (1.2); 4.8288 (0.6); 4.8235 (0.6); 4.8155 (0.7); 4.8096 (0.8); 4.8053 (0.8); 4.7993 (0.7); 4.7913 (0.7); 4.7859 (0.7); 4.4019 (0.9); 4.3907 (0.8); 4.3672 (1.0); 4.3650 (1.0); 4.3537 (0.9); 3.8252 (1.5); 3.8010 (1.4); 3.7883 (1.4); 3.7641 (1.3); 2.7339 (16.0); 1.6570 (0.4); 1.2937 (0.6); 0.1086 (0.8); 0.0381 (7.9)

I-032: $^1$H-NMR(300.2 MHz, CDCl3):
δ = 7.9905 (5.3); 7.6025 (3.3); 7.5856 (3.9); 7.4362 (2.1); 7.3449 (0.8); 7.3371 (0.9); 7.3295 (1.2); 7.3237 (1.1); 7.3146 (0.9); 7.2999 (9.6); 7.2028 (2.7); 7.1979 (2.8); 7.1412 (2.3); 7.1152 (2.6); 6.8417 (1.5); 6.8364 (1.5); 6.8158 (1.3); 6.8106 (1.3); 6.1569 (1.5); 4.2561 (1.0); 4.2453 (1.1); 4.2201 (1.3); 4.2093 (1.4); 4.0222 (0.7); 4.0153 (0.7); 4.0077 (0.7); 3.9283 (1.6); 3.9100 (1.1); 3.8922 (1.2); 3.8738 (1.0); 3.1875 (0.9); 3.1718 (0.9); 3.1423 (1.3); 3.1267 (1.2); 2.9446 (1.3); 2.9135 (1.3); 2.8996 (1.0); 2.8685 (0.9); 2.8195 (0.4); 2.8102 (0.5); 2.7968 (0.9); 2.7739 (1.4); 2.7507 (1.0); 2.7277 (0.4); 2.6854 (16.0); 1.6057 (9.2); 1.3031 (1.3); 1.2613 (0.5); 1.1696 (8.4); 1.1618 (8.8); 1.1466 (8.4); 1.1388 (8.4); 0.9344 (0.6); 0.9198 (1.1); 0.9100 (0.6); 0.8965 (0.5); 0.0383 (11.8)

I-033: $^1$H-NMR(499.9 MHz, CDCl3):
δ = 8.0987 (3.8); 7.4527 (1.0); 7.4487 (1.3); 7.4444 (0.9); 7.4400 (0.7); 7.4233 (1.2); 7.4074 (0.9); 7.2604 (4.6); 7.2091 (0.5); 7.1955 (0.7); 7.1819 (0.5); 7.0428 (0.4); 7.0265 (1.5); 7.0212 (2.2); 7.0172 (1.4); 7.0011 (0.3); 6.9678 (0.7); 6.9635 (1.0); 6.9564 (0.8); 6.9512 (0.7); 6.9463 (1.0); 6.1527 (0.7); 5.2965 (16.0); 4.1433 (0.4); 4.1396 (0.4); 4.1372 (0.4); 4.1335 (0.4); 4.1215 (0.4); 4.1176 (0.6); 4.1154 (0.6); 4.1117 (0.5); 3.9788 (0.4); 3.9693 (0.4); 3.9611 (0.4); 3.9066 (0.6); 3.8971 (0.5); 3.8850 (0.5); 3.8755 (0.4); 3.1203 (0.5); 3.1100 (0.5); 3.0932 (0.7); 3.0829 (0.7); 2.9325 (0.5); 2.9297 (0.5); 2.9143 (0.5); 2.9114 (0.5); 2.9055 (0.4); 2.9026 (0.4); 2.8872 (0.4); 2.8843 (0.4); 2.8017 (0.4); 2.7858 (0.5); 2.7769 (0.4); 2.7609 (0.4); 2.2960 (0.4); 1.8918 (0.4); 1.8768 (0.4); 1.8673 (0.5); 1.6558 (0.3); 1.6476 (0.4); 1.6439 (0.4); 1.6388 (0.4); 1.6350 (0.4); 1.6305 (0.5); 1.6266 (0.4); 1.6224 (0.4); 1.6186 (0.4); 1.6142 (0.4); 1.6103 (0.3); 1.6063 (0.4); 1.6024 (0.4); 1.5862 (0.5); 1.2919 (0.3); 1.2555 (1.3); 1.2396 (0.4); 0.8810 (0.3); 0.8453 (0.4); 0.8382 (0.4); 0.8331 (0.4); −0.0002 (5.4)

I-034: $^1$H-NMR(300.2 MHz, $d_6$-DMSO):
δ =7.7819 (0.6); 7.7562 (1.8); 7.7302 (2.1); 7.7118 (2.6); 7.6863 (1.1); 7.6251 (3.1); 7.5836 (1.4); 7.4295 (2.1); 7.0467 (1.9); 7.0212 (2.4); 6.9600 (3.0); 6.8484 (1.8); 6.8237 (1.4); 3.8068 (5.6); 3.7715 (1.2); 3.3540 (16.0); 2.8234 (2.8); 2.8043 (2.7); 2.5226 (2.7); 2.4553 (12.2); 2.2395 (12.4); 2.2208 (12.0); 2.0099 (0.8); 1.2521 (0.4); 1.1954 (0.4)

I-035: $^1$H-NMR(300.2 MHz, CDCl3):
δ = 7.9894 (5.2); 7.5999 (3.6); 7.5970 (3.2); 7.5827 (2.9); 7.4150 (1.9); 7.2993 (10.4); 7.2869 (1.3); 7.2807 (1.2); 7.2666 (0.6); 7.0522 (2.0); 7.0264 (2.4); 6.9910 (2.4); 6.7809 (1.3); 6.7757 (1.4); 6.7555 (1.1); 6.7505 (1.1); 6.1794 (1.6); 4.3094 (0.8); 4.3001 (1.1); 4.2745 (1.1); 4.2659 (1.0); 3.9279 (0.5); 3.9096 (0.7); 3.8957 (0.7); 3.8691 (2.2); 3.8488 (0.7); 3.8348 (1.5); 3.8140 (0.9); 3.0513 (0.8); 3.0373 (0.8); 3.0060 (1.2); 2.9912 (1.1); 2.8045 (0.4); 2.7814 (1.1); 2.7722 (1.3); 2.7585 (1.4); 2.7378 (1.6); 2.7271 (1.2); 2.7121 (0.7); 2.6932 (1.5); 2.6814 (16.0); 2.3301 (12.1); 1.6054 (4.2); 1.3710 (0.3); 1.3460 (0.6); 1.3047 (2.8); 1.2619 (0.5); 1.1729 (8.7); 1.1643 (9.0); 1.1498 (8.7); 1.1413 (8.6); 0.9419 (1.0); 0.9205 (2.8); 0.8971 (1.1); 0.0492 (0.6); 0.0385 (12.4); 0.0278 (0.7)

I-036: $^1$H-NMR(300.2 MHz, CDCl3):
δ = 8.0518 (2.5); 7.9605 (2.4); 7.6169 (0.4); 7.5937 (0.7); 7.5687 (0.4); 7.5290 (0.3); 7.5025 (0.7); 7.4794 (0.4); 7.3953 (0.6); 7.3675 (0.8); 7.3535 (1.4); 7.3467 (1.5); 7.2989 (10.8); 7.1995 (1.0); 7.1720 (1.4); 7.0196 (0.8); 7.0131 (0.8); 6.9924 (0.6); 6.9857 (0.6); 6.0153 (0.7); 5.3368 (0.4); 4.1899 (0.5); 4.1803 (0.6); 4.1544 (0.7); 4.1445 (0.8); 4.0605 (0.4); 4.0448 (0.4); 4.0333 (0.4); 3.9898 (0.8); 3.746 (0.5); 3.9538 (0.6); 3.9386 (0.4); 3.2016 (0.4); 3.1843 (0.4); 3.1568 (0.7); 3.1393 (0.7); 3.0406 (0.8); 3.0105 (1.1); 2.9931 (16.0); 2.9670 (0.6); 2.9195 (14.7); 2.6942 (7.4); 1.6281 (0.4); 1.2897 (0.4); 0.1046 (1.3); 0.0352 (11.7)

I-037: $^1$H-NMR(300.2 MHz, CDCl3):
δ = 7.5712 (0.6); 7.5456 (2.0); 7.5210 (5.3); 7.4961 (0.7); 7.4253 (2.8); 7.3852 (1.2); 7.3784 (1.8); 7.3714 (1.2); 7.3554 (1.2); 7.2992 (11.9); 7.0362 (3.3); 7.0171 (1.6); 6.9915 (3.9); 6.9666 (2.6); 6.9409 (0.9); 5.7875 (0.8); 5.7693 (0.8); 4.9664 (1.9); 4.1941 (0.9); 4.1703 (3.2); 4.1465 (2.9); 4.1393 (1.5); 4.1234 (1.7); 3.9538 (0.6); 3.9445 (0.8); 3.9346 (0.9); 3.9245 (1.0); 3.9149 (0.9); 3.9051 (0.7); 3.8308 (1.5); 3.8111 (1.1); 3.7941 (1.3); 3.7746 (0.9); 3.3482 (0.3); 3.3304 (0.4); 3.2743 (9.2); 3.2562 (9.2); 3.0161 (0.9); 2.9972 (0.9); 2.9699 (1.4); 2.9511 (1.4); 2.8211 (1.4); 2.7921 (1.4); 2.7751 (1.0); 2.7457 (0.8); 2.3202 (15.4); 2.3054 (16.0); 2.0826 (11.0); 1.6119 (12.6); 1.3209 (3.1); 1.2970 (6.8); 1.2733 (3.1); 0.0378 (13.7)

I-038: $^1$H-NMR(499.9 MHz, CDCl3):
δ = 7.9415 (5.3); 7.5621 (3.4); 7.5520 (4.7); 7.3731 (2.5); 7.2786 (0.9); 7.2700 (1.5); 7.2613 (6.6); 7.0422 (2.4); 7.0265 (2.7); 6.9821 (3.0); 6.9790 (3.3); 6.6343 (1.6); 6.6312 (1.7); 6.6187 (1.6); 6.6156 (1.7); 6.0883 (1.8); 5.2981 (3.5); 4.1991 (1.1); 4.1926 (1.3); 4.1773 (1.4); 4.1708 (1.5); 3.9875 (0.6); 3.9732 (0.9); 3.9694 (0.9); 3.9645 (0.9); 3.9592 (0.7); 3.8646 (1.5); 3.8536 (1.3); 3.8428 (1.4); 3.8317 (1.2); 3.1161 (1.0); 3.1065 (1.1); 3.0890 (1.4); 3.0794 (1.4); 2.8777 (1.3); 2.8589 (1.3); 2.8507 (1.2); 2.8318 (1.0); 2.6456 (16.0); 1.7310 (0.7); 1.7241 (0.8); 1.7143 (1.4); 1.7044 (0.9); 1.6976 (0.8); 1.6875 (0.4); 1.5834 (8.5); 1.2547 (0.4); 0.9329 (2.8); 0.9303 (3.1); 0.9162 (3.0); 0.9136 (3.1); 0.8994 (0.5); 0.8911 (0.4); 0.5625 (0.3); 0.5597 (0.4); 0.5523 (0.4); 0.5433 (1.6); 0.5330 (1.7); 0.5299 (1.8); 0.5255 (1.9); 0.5154 (1.7); 0.5002 (0.5); 0.4967 (0.5); −0.0002 (6.7)

I-039: $^1$H-NMR(400.1 MHz, CDCl3):
δ = 8.1051 (5.7); 7.4339 (1.4); 7.4140 (2.8); 7.3942 (1.6); 7.2586 (39.1); 7.1119 (2.3); 7.0923 (2.0); 7.0155 (3.4); 6.9954 (0.5); 6.9506 (4.4); 6.9312 (4.5); 6.8850 (3.7); 6.6719 (2.0); 6.6530 (1.8); 6.1858 (2.4); 4.2683 (1.4); 4.2612 (1.5); 4.2420 (1.6); 4.2348 (1.6); 3.8524 (1.0); 3.8406 (1.1); 3.8288 (0.9); 3.8057 (2.1); 3.7898 (1.1); 3.7792 (1.8); 3.7635 (1.1); 3.0013 (1.2); 2.9900 (1.2); 2.9673 (1.5); 2.9556 (1.4); 2.7062 (1.4); 2.6820 (1.4); 2.6724 (1.3); 2.6480 (1.1); 2.3027 (0.5); 2.2879 (0.4); 2.2618 (16.0); 2.2313 (0.4); 2.2192 (0.3); 2.1654 (15.0); 2.1436 (0.8); 1.5791 (1.9); 1.5599 (4.7); 1.5324 (10.1); 1.5173 (6.4);

1.4972 (2.5); 1.4326 (0.6); 1.3673 (0.4); 1.3331 (0.5); 1.2558 (4.3); 1.2172 (0.8); 1.2002 (0.7); 1.1534 (0.4); 1.1259 (0.9); 1.1081 (3.1); 1.0889 (3.2); 1.0705 (0.9); 0.8804 (0.7); 0.8600 (2.3); 0.8445 (2.8); −0.0002 (46.5)

I-040: $^1$H-NMR(300.2 MHz, CDCl3):
δ = 8.0064 (5.0); 7.5969 (1.4); 7.5759 (4.0); 7.4850 (1.8); 7.4396 (0.8); 7.4299 (1.3); 7.4227 (0.9); 7.4080 (2.9); 7.4010 (1.3); 7.3865 (1.4); 7.3792 (5.7); 7.3729 (1.1); 7.3446 (5.4); 7.3375 (1.3); 7.3224 (0.9); 7.3161 (2.1); 7.2984 (12.1); 6.2825 (1.2); 5.3368 (1.8); 4.8171 (0.6); 4.8101 (0.6); 4.8042 (0.7); 4.7964 (1.1); 4.7885 (0.7); 4.7826 (0.7); 4.7757 (0.6); 4.3523 (0.9); 4.3393 (0.9); 4.3154 (1.0); 4.3023 (1.0); 4.1933 (0.3); 4.1696 (1.0); 4.1457 (1.1); 4.1223 (0.5); 4.1009 (0.4); 3.8470 (1.4); 3.8250 (1.4); 3.8100 (1.3); 3.7881 (1.2); 2.7339 (16.0); 2.0810 (6.1); 1.6215 (0.4); 1.5974 (1.2); 1.3198 (1.4); 1.2960 (3.0); 1.2722 (1.3); 0.9972 (0.3); 0.9727 (0.7); 0.0483 (0.5); 0.0375 (13.5); 0.0266 (0.5)

I-041: $^1$H-NMR(300.2 MHz, CDCl3):
δ = 7.5778 (0.7); 7.5519 (2.1); 7.5283 (5.4); 7.5050 (0.7); 7.4129 (2.8); 7.3759 (1.4); 7.3686 (2.0); 7.3614 (1.3); 7.3461 (1.4); 7.2989 (14.2); 7.0299 (3.2); 7.0117 (1.8); 6.9861 (3.8); 6.9541 (2.3); 6.9266 (1.0); 6.0253 (1.5); 4.9370 (2.0); 4.1977 (1.1); 4.1858 (1.2); 4.1698 (0.7); 4.1615 (1.3); 4.1495 (1.4); 3.9180 (0.8); 3.9079 (0.9); 3.8991 (1.0); 3.8905 (0.9); 3.8794 (0.8); 3.8601 (0.4); 3.8009 (1.8); 3.7793 (1.3); 3.7645 (1.5); 3.7430 (1.2); 3.2025 (0.5); 3.1918 (0.8); 3.1796 (1.2); 3.1702 (1.2); 3.1577 (0.9); 3.1480 (0.6); 3.1352 (0.3); 2.9992 (0.9); 2.9803 (0.9); 2.9528 (1.4); 2.9336 (1.3); 2.7913 (1.5); 2.7620 (1.4); 2.7451 (1.2); 2.7160 (1.0); 2.3508 (0.7); 2.3151 (14.6); 2.2969 (16.0); 2.2303 (0.6); 2.2023 (0.3); 2.1853 (0.5); 2.1787 (0.4); 2.0824 (2.2); 1.9749 (1.0); 1.6375 (1.4); 1.3205 (0.6); 1.2966 (1.4); 1.2729 (0.6); 0.9955 (0.4); 0.9725 (0.8); 0.9613 (0.8); 0.9486 (1.1); 0.9384 (1.1); 0.9297 (1.2); 0.9253 (1.2); 0.9182 (1.5); 0.9055 (1.6); 0.8942 (1.2); 0.8868 (1.3); 0.8781 (1.3); 0.8646 (1.2); 0.8532 (0.9); 0.8464 (0.8); 0.8313 (0.7); 0.8123 (0.6); 0.7938 (0.5); 0.7648 (0.6); 0.7503 (0.8); 0.7300 (1.0); 0.7162 (1.4); 0.6991 (1.5); 0.6865 (0.9); 0.6681 (0.8); 0.6560 (1.4); 0.6439 (1.1); 0.6371 (1.4); 0.6236 (1.1); 0.6107 (0.7); 0.6034 (0.7); 0.5900 (0.5); 0.5697 (0.4); 0.5530 (0.4); 0.5352 (0.5); 0.5165 (0.4); 0.5002 (0.3); 0.1077 (8.2); 0.0481 (0.6); 0.0373 (17.4); 0.0266 (1.5)

I-042: $^1$H-NMR(300.2 MHz, CDCl3):
δ = 8.7320 (5.6); 7.6696 (3.1); 7.6666 (2.8); 7.6577 (1.4); 7.6524 (2.1); 7.3995 (1.6); 7.3541 (0.7); 7.3452 (0.7); 7.3354 (1.0); 7.3291 (0.8); 7.3240 (0.6); 7.3157 (0.5); 7.2989 (8.7); 7.0075 (1.6); 6.9819 (1.9); 6.9263 (1.9); 6.7168 (1.0); 6.6912 (0.8); 5.9713 (1.2); 4.3525 (0.7); 4.3430 (0.8); 4.3174 (0.9); 4.3084 (0.9); 3.9512 (0.3); 3.9366 (0.5); 3.9297 (0.4); 3.9183 (0.5); 3.9084 (0.4); 3.9021 (0.5); 3.8876 (1.8); 3.8669 (0.6); 3.8529 (1.3); 3.8320 (0.8); 3.0708 (0.6); 3.0567 (0.6); 3.0258 (0.9); 3.0106 (0.8); 2.8013 (16.0); 2.7738 (1.0); 2.7414 (0.9); 2.7286 (0.8); 2.6955 (0.7); 2.3075 (10.5); 2.1886 (9.7); 1.6012 (15.3); 1.3601 (0.3); 1.3432 (0.6); 1.3038 (3.7); 0.9409 (1.3); 0.9192 (4.2); 0.8959 (1.6); 0.1075 (1.1); 0.0372 (9.7); 0.0264 (0.4)

I-043: $^1$H-NMR(499.9 MHz, $d_6$-DMSO):
δ = 7.8070 (0.5); 7.5225 (1.4); 7.5062 (3.2); 7.4899 (2.0); 7.4263 (1.8); 7.4210 (1.7); 7.3783 (1.5); 7.3769 (1.6); 7.3746 (1.7); 7.3732 (1.5); 7.3622 (1.2); 7.3607 (1.2); 7.3585 (1.4); 7.3572 (1.2); 7.3255 (2.1); 7.3213 (3.3); 7.3171 (1.7); 7.2362 (1.5); 7.2348 (1.6); 7.2318 (1.4); 7.2198 (1.4); 7.2184 (1.3); 7.2154 (1.3); 7.0407 (2.1); 7.0254 (2.4); 6.9556 (2.7); 6.8623 (1.5); 6.8472 (1.3); 4.0573 (0.4); 4.0430 (1.1); 4.0288 (1.1); 4.0146 (0.4); 3.7869 (1.0); 3.7700 (2.6); 3.7635 (2.8); 3.7603 (2.8); 3.7351 (0.8); 3.3236 (16.8); 2.8005 (1.5); 2.7877 (2.2); 2.7778 (1.2); 2.7621 (0.3); 2.6728 (16.0); 2.5136 (1.3); 2.5103 (2.3); 2.5068 (2.9); 2.5032 (2.1); 2.4608 (0.6); 2.3486 (0.5); 2.2639 (0.5); 2.2354 (12.6); 2.2198 (11.8); 2.1545 (0.3); 1.9945 (4.7); 1.1954 (1.3); 1.1812 (2.5); 1.1670 (1.2)

I-044: $^1$H-NMR(600.1 MHz, $d_6$-DMSO):
δ = 8.0423 (0.4); 8.0383 (0.5); 5.7559 (0.9); 3.3179 (16.0); 2.5188 (0.4); 2.5157 (0.4); 2.5069 (7.0); 2.5039 (15.0); 2.5008 (20.9); 2.4978 (15.5); 2.4948 (7.4); 2.2309 (0.8); 2.2267 (0.8); 2.1867 (0.7); 2.1834 (0.7); −0.0001 (1.0)

I-045: $^1$H-NMR(300.2 MHz, CDCl3):
δ = 7.9417 (5.1); 7.2986 (13.9); 7.1243 (0.6); 7.1204 (0.6); 7.0977 (1.4); 7.0940 (1.4); 7.0713 (1.0); 7.0676 (1.1); 7.0088 (0.9); 7.0031 (1.1); 6.9812 (3.3); 6.9529 (1.2); 6.9282 (1.8); 6.9232 (1.8); 6.9069 (2.7); 6.8815 (0.8); 6.8479 (0.7); 6.8424 (0.7); 6.8212 (1.2); 6.7996 (1.6); 6.7946 (0.6); 6.2640 (1.3); 5.3372 (10.4); 4.2937 (0.8); 4.2838 (0.9); 4.2583 (1.0); 4.2478 (1.0); 3.9239 (0.4); 3.9075 (0.6); 3.8959 (0.5); 3.8756 (0.4); 3.8698 (0.3); 3.8274 (1.7); 3.8058 (1.0); 3.7917 (1.3); 3.7703 (0.9); 2.9967 (0.7); 2.9797 (0.7); 2.9517 (1.0); 2.9352 (0.9); 2.7207 (1.2); 2.6896 (1.1); 2.6757 (1.1); 2.6617 (16.0); 2.6449 (0.9); 2.1415 (11.0); 2.1161 (11.1); 2.0928 (0.7); 2.0830 (1.4); 1.5960 (12.1); 1.3213 (0.4); 1.3057 (0.4); 1.2975 (0.8); 1.0859 (0.6); 1.0722 (1.6); 1.0653 (1.8); 1.0519 (1.0); 1.0435 (1.7); 1.0369 (1.7); 1.0237 (0.8); 0.8264 (0.9); 0.8127 (1.7); 0.8092 (2.0); 0.8047 (1.6); 0.7955 (1.9); 0.7927 (1.8); 0.7877 (1.4); 0.7755 (0.6); 0.1080 (6.3); 0.0491 (0.6); 0.0384 (16.0); 0.0274 (0.6)

I-046: $^1$H-NMR(499.9 MHz, CDCl3):
δ = 8.7600 (4.2); 8.7483 (4.1); 8.7364 (0.5); 8.7241 (0.3); 8.5985 (7.4); 8.5708 (0.4); 7.9420 (5.2); 7.9326 (3.7); 7.9298 (4.8); 7.6179 (5.3); 7.6171 (5.3); 7.6087 (3.1); 7.6067 (3.1); 7.5902 (0.4); 7.3692 (3.0); 7.3125 (1.2); 7.3077 (1.5); 7.3010 (1.6); 7.2970 (1.4); 7.2900 (0.9); 7.2612 (8.2); 6.9781 (2.7); 6.9629 (2.9); 6.8904 (3.4); 6.6719 (1.9); 6.6570 (1.7); 6.2023 (2.5); 4.3392 (1.4); 4.3328 (1.5); 4.3177 (1.6); 4.3113 (1.5); 4.1279 (0.9); 4.1136 (0.9); 3.9296 (0.7); 3.9216 (1.0); 3.9100 (1.0); 3.9026 (0.8); 3.8585 (2.0); 3.8456 (1.4); 3.8369 (1.8); 3.8241 (1.3); 3.0390 (1.2); 3.0300 (1.2); 3.0117 (1.4); 3.0026 (1.3); 2.7316 (1.4); 2.7113 (1.5); 2.7043 (1.3); 2.6840 (1.2); 2.3245 (1.0); 2.3041 (1.1); 2.2803 (16.0); 2.1499 (15.2); 2.0432 (4.2); 1.6182 (7.0); 1.2726 (1.0); 1.2583 (2.1); 1.2440 (1.0); −0.0002 (9.6)

I-047: $^1$H-NMR(400.2 MHz, $d_6$-DMSO):
δ = 8.3164 (0.4); 8.0962 (9.8); 7.9525 (1.7); 7.4134 (2.1); 7.4052 (2.1); 7.3427 (0.5); 7.3280 (1.7); 7.3218 (3.4); 7.3189 (3.8); 7.3082 (2.1); 7.3038 (4.3); 7.2837 (1.0); 7.2330 (1.2); 7.2274 (1.3); 7.2146 (1.8); 7.2087 (1.0); 7.2049 (1.1); 7.2009 (0.9); 7.1906 (0.7); 7.0533 (2.7); 7.0342 (3.2); 6.9293 (3.3); 6.8264 (1.8); 6.8072 (1.5); 3.7543 (5.3); 3.7401 (1.0); 3.7307 (1.4); 3.7213 (1.1); 3.7127 (0.8); 3.7038 (0.5); 3.3314 (34.7); 2.8908 (11.4); 2.8461 (0.3); 2.8282 (0.4); 2.8112 (1.8); 2.8005 (2.3); 2.7955 (2.2); 2.7838 (1.9); 2.7664 (0.4); 2.7320 (10.0); 2.5455 (24.0); 2.5250 (0.7); 2.5201 (1.0); 2.5114 (12.8); 2.5071 (26.0); 2.5026 (34.4); 2.4981 (25.7); 2.4938 (13.0); 2.2401 (16.0); 2.1912 (14.7); −0.0002 (6.2)

I-048: $^1$H-NMR(300.2 MHz, CDCl3):
δ = 8.1592 (8.0); 7.3738 (0.5); 7.3466 (1.2); 7.3250 (1.1); 7.2987 (11.0); 7.2745 (2.0); 7.2690 (2.1); 7.2466 (0.9); 7.2412 (1.1); 7.2000 (1.3); 7.1941 (1.3); 7.1785 (1.3); 7.1724 (1.9); 7.1669 (0.8); 7.1516 (0.8); 7.1454 (0.8); 7.0113 (2.5); 6.9858 (2.9); 6.9083 (2.9); 6.7238 (1.6); 6.6993 (1.4); 6.0356 (1.9); 4.3301 (1.1); 4.3210 (1.4); 4.2955 (1.5); 4.2864 (1.4); 3.9198 (0.8); 3.9096 (0.7); 3.9039 (0.8); 3.8972 (0.6); 3.8881 (0.7); 3.8756 (2.8); 3.8554 (0.8); 3.8411 (1.9); 3.8205 (1.2); 3.0596 (1.0); 3.0446 (1.0); 3.0146 (1.4); 2.9986 (1.3); 2.7801 (1.4); 2.7486 (1.3); 2.7350 (1.2); 2.7029 (1.1); 2.3073 (16.0); 2.1635 (15.1); 1.6012 (0.8); 1.3716 (0.4); 1.2931 (7.9); 1.0386 (0.4); 1.0162 (0.4); 0.9186 (0.7); 0.8946 (0.8); 0.8806 (0.7); 0.0492 (0.3); 0.0382 (11.7); 0.0275 (0.5)

I-049: $^1$H-NMR(400.2 MHz, $d_6$-DMSO):
δ = 8.3142 (1.5); 8.2404 (15.3); 8.0564 (3.1); 8.0466 (3.1); 7.7721 (4.3); 7.7680 (3.5); 7.7464 (2.7); 7.7267 (3.6); 7.6950 (5.1); 7.6896 (3.0); 7.6742 (8.2); 7.6689 (8.0); 7.5448 (4.7); 7.5238 (6.3); 7.4038 (3.6); 7.3985 (3.4); 7.3828 (2.7); 7.3774 (2.6); 5.7544 (16.0); 5.1088 (1.0); 5.1010 (2.8); 5.0919 (2.8); 5.0833 (1.0); 4.0629 (1.7); 4.0544 (1.9); 4.0349 (2.8); 4.0265 (2.4); 3.9250 (2.3); 3.9167 (2.3); 3.8969 (1.7); 3.8888 (1.6); 3.3172 (234.5); 2.6932 (0.7); 2.6791 (1.7); 2.6747 (3.6); 2.6702 (5.0); 2.6656 (3.7); 2.6610 (1.7); 2.5237 (14.7); 2.5189 (21.5); 2.5102 (297.3); 2.5058 (611.1); 2.5012 (807.2); 2.4966 (578.2);

TABLE 2-continued 2.4921 (277.7); 2.3372 (1.6); 2.3326 (3.6); 2.3280 (5.0); 2.3235 (3.7); 2.3189 (1.7); 2.0734 (1.7); 1.9882 (1.2); 1.2346 (1.0); 1.1927 (0.5); 1.1749 (0.8); 1.1570 (0.4); 0.1548 (0.5); 0.1458 (1.2); 0.1224 (3.6); 0.0879 (3.0); 0.0814 (0.5); 0.0656 (0.3); 0.0573 (2.4); 0.0080 (8.2); −0.0002 (284.6); −0.0085 (9.3); −0.1497 (1.1)

I-050: $^1$H-NMR(300.2 MHz, CDCl3):
δ = 7.9516 (5.1); 7.3391 (1.3); 7.3128 (2.8); 7.2984 (13.2); 7.2866 (1.9); 7.0024 (2.6); 6.9768 (2.9); 6.9335 (2.4); 6.8479 (1.2); 6.8450 (1.2); 6.8402 (1.4); 6.8213 (1.0); 6.8182 (1.0); 6.8134 (1.4); 6.7890 (1.9); 6.7831 (2.4); 6.7198 (1.4); 6.6947 (1.1); 6.3121 (1.5); 5.3370 (7.4); 4.2646 (0.8); 4.2561 (1.2); 4.2307 (1.2); 4.2216 (1.0); 4.1953 (0.4); 4.1715 (1.1); 4.1477 (1.1); 4.1241 (0.5); 3.8750 (0.7); 3.8651 (0.7); 3.8596 (0.7); 3.8526 (0.7); 3.8374 (2.3); 3.8176 (0.6); 3.8035 (1.5); 3.7827 (0.9); 3.0246 (0.7); 3.0101 (0.8); 2.9803 (1.1); 2.9642 (1.1); 2.7638 (1.1); 2.7330 (1.1); 2.7181 (1.1); 2.6871 (1.0); 2.6649 (16.0); 2.2984 (12.2); 2.2308 (11.6); 2.0831 (5.5); 2.0442 (1.5); 1.9841 (0.4); 1.9673 (0.6); 1.9558 (0.7); 1.9394 (1.2); 1.9226 (0.8); 1.9116 (0.7); 1.8944 (0.4); 1.6054 (14.1); 1.3210 (1.5); 1.2971 (2.9); 1.2733 (1.4); 1.0531 (0.8); 1.0383 (2.1); 1.0313 (2.3); 1.0165 (1.3); 1.0098 (2.2); 1.0033 (2.1); 0.9886 (1.1); 0.9733 (0.5); 0.7682 (1.0); 0.7532 (2.6); 0.7481 (2.3); 0.7366 (2.3); 0.7313 (2.6); 0.7148 (0.9); 0.1073 (0.9); 0.0483 (0.6); 0.0376 (13.3); 0.0268 (0.9)

I-051: $^1$H-NMR(499.9 MHz, CDCl3):
δ = 8.1253 (7.9); 7.6006 (0.5); 7.5856 (5.1); 7.5709 (2.1); 7.5552 (0.6); 7.3128 (2.5); 7.2593 (9.1); 7.2432 (1.0); 7.2391 (1.4); 7.2292 (1.0); 7.2250 (1.6); 7.2206 (0.7); 6.9450 (2.5); 6.9298 (2.8); 6.8791 (2.9); 6.6589 (1.5); 6.6438 (1.4); 6.0731 (1.8); 5.2975 (6.2); 4.2956 (1.3); 4.2890 (1.4); 4.2740 (1.4); 4.2674 (1.4); 3.8848 (0.5); 3.8809 (0.5); 3.8770 (0.7); 3.8715 (0.6); 3.8682 (0.6); 3.8647 (0.8); 3.8609 (0.6); 3.8574 (0.6); 3.8550 (0.5); 3.8136 (2.1); 3.8008 (1.4); 3.7919 (1.8); 3.7792 (1.4); 3.0080 (1.1); 2.9988 (1.1); 2.9806 (1.3); 2.9714 (1.2); 2.6946 (1.4); 2.6744 (1.4); 2.6672 (1.3); 2.6469 (1.2); 2.2591 (16.0); 2.1419 (14.8); 1.5511 (4.3); −0.0002 (8.6)

I-052: $^1$H-NMR(499.9 MHz, CDCl3):
δ = 7.9145 (5.3); 7.2597 (11.3); 7.0779 (0.7); 7.0620 (1.6); 7.0461 (1.0); 6.9827 (1.9); 6.9752 (0.9); 6.9720 (1.1); 6.9674 (2.3); 6.9581 (1.4); 6.9448 (0.6); 6.9418 (0.6); 6.8703 (2.2); 6.8100 (0.7); 6.8073 (0.7); 6.7943 (1.3); 6.7811 (0.6); 6.7785 (0.6); 6.6683 (1.2); 6.6534 (1.1); 6.2105 (1.4); 5.2980 (0.9); 4.2377 (0.9); 4.2312 (1.0); 4.2163 (1.1); 4.2098 (1.1); 3.8698 (0.4); 3.8628 (0.5); 3.8590 (0.6); 3.8553 (0.5); 3.8518 (0.6); 3.8483 (0.6); 3.8401 (0.5); 3.8358 (0.3); 3.8132 (1.6); 3.8009 (0.9); 3.7918 (1.4); 3.7795 (1.0); 2.9882 (0.8); 2.9781 (0.8); 2.9610 (1.0); 2.9507 (1.0); 2.7468 (1.1); 2.7279 (1.1); 2.7197 (0.9); 2.7007 (0.8); 2.6274 (16.0); 2.2715 (11.9); 2.1441 (11.3); 2.0931 (0.5); 2.0865 (0.6); 2.0762 (1.0); 2.0660 (0.6); 2.0593 (0.6); 2.0044 (0.4); 1.5590 (15.4); 1.0340 (0.6); 1.0313 (0.8); 1.0272 (1.3); 1.0243 (1.7); 1.0182 (1.4); 1.0146 (1.0); 1.0106 (1.4); 1.0073 (1.7); 1.0031 (0.9); 0.7832 (1.1); 0.7794 (0.9); 0.7753 (1.6); 0.7721 (1.7); 0.7685 (1.8); 0.7658 (1.7); 0.7610 (0.9); 0.7579 (1.1); 0.0063 (0.4); −0.0002 (13.0); −0.0066 (0.7)

I-053: $^1$H-NMR(499.9 MHz, CDCl3):
δ = 8.1251 (7.5); 7.6004 (0.7); 7.5977 (0.7); 7.5855 (5.2); 7.5708 (2.1); 7.5552 (0.6); 7.3128 (2.6); 7.2592 (8.6); 7.2432 (1.2); 7.2391 (1.5); 7.2291 (1.1); 7.2250 (1.6); 7.2206 (0.8); 6.9450 (2.6); 6.9297 (2.8); 6.8793 (3.0); 6.6591 (1.7); 6.6441 (1.4); 6.0734 (1.9); 5.2974 (6.3); 4.2954 (1.4); 4.2887 (1.4); 4.2738 (1.5); 4.2671 (1.4); 3.8846 (0.6); 3.8808 (0.7); 3.8768 (0.8); 3.8680 (0.7); 3.8647 (0.9); 3.8609 (0.6); 3.8573 (0.6); 3.8448 (0.3); 3.8135 (2.1); 3.8007 (1.4); 3.7918 (1.8); 3.7791 (1.4); 3.0079 (1.2); 2.9987 (1.2); 2.9805 (1.4); 2.9713 (1.3); 2.6946 (1.5); 2.6744 (1.5); 2.6672 (1.3); 2.6469 (1.2); 2.3031 (0.4); 2.2590 (16.0); 2.1419 (14.9); 1.5522 (3.8); 0.0059 (0.5); −0.0002 (7.9); −0.0066 (0.3)

I-054: $^1$H-NMR(300.2 MHz, CDCl3):
δ = 8.0002 (5.3); 7.6152 (0.4); 7.5885 (1.5); 7.5663 (4.4); 7.5442 (0.4); 7.4950 (2.2); 7.4560 (0.9); 7.4480 (1.4); 7.4405 (0.9); 7.4256 (0.9); 7.2991 (7.1); 7.2649 (3.1); 7.2424 (2.2); 7.1598 (1.7); 7.1334 (1.1); 6.2020 (1.7); 5.3382 (0.9); 4.7865 (0.7); 4.7718 (0.9); 4.7627 (0.9); 4.7479 (0.8); 4.3983 (1.0); 4.3845 (1.0); 4.3614 (1.1); 4.3477 (1.0); 3.7639 (1.4); 3.7383 (1.4); 3.7272 (1.3); 3.7015 (1.2); 2.9523 (1.9); 2.9277 (3.7); 2.9025 (2.7); 2.8750 (1.6); 2.8450 (1.6); 2.8187 (0.8); 2.7904 (0.4); 2.7326 (16.0); 2.1522 (0.7); 2.1274 (2.3); 2.1026 (3.2); 2.0779 (2.0); 2.0530 (0.5); 1.6084 (2.7); 1.2937 (0.4); 0.0489 (0.4); 0.0383 (9.1)

I-055: $^1$H-NMR(300.2 MHz, CDCl3):
δ = 7.5891 (0.4); 7.5632 (1.3); 7.5376 (3.5); 7.5133 (0.4); 7.4448 (1.9); 7.4118 (0.8); 7.4048 (1.3); 7.3976 (0.7); 7.3871 (0.5); 7.3813 (0.8); 7.3745 (0.5); 7.2990 (7.3); 7.0373 (1.7); 7.0261 (2.1); 7.0126 (2.5); 6.9469 (1.3); 6.9205 (0.8); 4.7215 (1.3); 4.1991 (1.0); 4.1734 (1.2); 3.9658 (0.3); 3.9562 (0.5); 3.9327 (1.7); 3.9277 (1.4); 3.9192 (0.7); 3.9099 (0.6); 3.9018 (1.3); 3.8847 (0.6); 3.0322 (0.5); 3.0162 (0.5); 2.9866 (1.0); 2.9699 (0.9); 2.9049 (0.9); 2.8753 (0.8); 2.8593 (0.5); 2.8291 (0.4); 2.6255 (14.3); 2.4371 (14.2); 2.3169 (16.0); 1.6242 (3.6); 0.0376 (7.7)

I-056: $^1$H-NMR(499.9 MHz, CDCl3):
δ = 7.9093 (3.3); 7.2606 (12.8); 7.2105 (3.5); 7.1071 (1.0); 7.0912 (2.3); 7.0754 (1.5); 7.0278 (0.3); 7.0200 (0.4); 7.0044 (0.9); 6.9857 (4.1); 6.9770 (5.6); 6.9604 (1.8); 6.8265 (1.1); 6.8130 (1.9); 6.7994 (1.0); 6.1910 (2.0); 4.1948 (0.5); 4.1842 (1.6); 4.1690 (1.7); 4.1582 (0.6); 3.8500 (2.8); 3.8347 (2.7); 3.8240 (1.0); 2.9674 (1.1); 2.9582 (1.1); 2.9401 (1.4); 2.9306 (1.4); 2.8002 (1.2); 2.7825 (1.2); 2.7734 (1.0); 2.7626 (0.4); 2.7547 (0.9); 2.7252 (0.6); 2.6347 (14.4); 2.3286 (0.8); 2.3216 (0.4); 2.3131 (0.5); 2.2860 (16.0); 2.1092 (0.4); 2.0988 (0.8); 2.0921 (0.9); 2.0819 (1.5); 2.0718 (1.0); 2.0651 (0.9); 2.0546 (0.5); 1.5859 (0.4); 1.2548 (0.8); 1.0426 (0.5); 1.0329 (2.5); 1.0295 (2.7); 1.0161 (2.7); 1.0126 (2.7); 1.0033 (0.8); 0.9930 (0.5); 0.9826 (0.4); 0.8088 (0.3); 0.7919 (1.7); 0.7817 (2.6); 0.7788 (2.8); 0.7768 (2.9); 0.7666 (1.9); 0.7535 (0.5); 0.7480 (0.6); 0.7386 (0.4); −0.0002 (15.6)

I-057: $^1$H-NMR(300.2 MHz, CDCl3):
δ = 7.9592 (5.2); 7.2995 (12.8); 7.1388 (0.7); 7.1124 (1.8); 7.0860 (1.4); 7.0315 (2.9); 7.0051 (3.6); 6.9819 (0.6); 6.9767 (0.6); 6.8597 (1.0); 6.8412 (3.7); 6.8170 (0.8); 6.8129 (0.7); 6.5738 (1.4); 6.5481 (1.2); 6.2798 (1.7); 5.3386 (8.0); 4.2659 (1.2); 4.2411 (1.4); 3.8811 (0.7); 3.8576 (2.0); 3.8245 (1.6); 3.8041 (0.8); 3.0342 (0.7); 3.0188 (0.8); 2.9889 (1.2); 2.9733 (1.2); 2.7860 (1.0); 2.7655 (0.7); 2.7553 (1.0); 2.7406 (0.9); 2.7099 (0.7); 2.6679 (16.0); 2.3524 (0.8); 2.3123 (12.8); 2.1571 (0.5); 2.1456 (0.6); 2.1286 (1.1); 2.1117 (0.7); 2.1011 (0.7); 2.0842 (0.5); 1.7700 (0.6); 1.7585 (0.6); 1.7419 (1.2); 1.7254 (0.7); 1.7138 (0.6); 1.6965 (0.3); 1.6000 (12.3); 1.2947 (0.4); 1.0883 (0.7); 1.0738 (1.5); 1.0686 (2.0); 1.0610 (1.5); 1.0558 (1.4); 1.0460 (1.7); 1.0402 (2.0); 1.0271 (1.0); 0.9081 (2.7); 0.8848 (2.5); 0.8803 (2.5); 0.8571 (0.4); 0.8361 (1.0); 0.8206 (2.2); 0.8137 (2.2); 0.8045 (2.4); 0.7878 (0.9); 0.5893 (0.4); 0.5735 (1.3); 0.5523 (1.6); 0.5442 (1.5); 0.5273 (1.3); 0.5148 (0.3); 0.1080 (1.2); 0.0385 (16.6)

I-058: $^1$H-NMR(300.2 MHz, CDCl3):
δ = 7.2993 (16.7); 7.1281 (2.1); 7.1179 (1.4); 7.1148 (1.5); 7.1030 (2.7); 7.0558 (1.4); 7.0301 (2.1); 7.0149 (2.0); 6.9399 (1.1); 6.9148 (0.7); 6.8558 (0.5); 6.8453 (0.5); 6.8343 (1.0); 6.8227 (0.8); 6.8134 (0.4); 6.8018 (0.4); 4.7922 (1.2); 4.2187 (0.9); 4.1935 (1.0); 3.9560 (0.5); 3.9469 (0.5); 3.9281 (1.6); 3.9104 (0.6); 3.8946 (1.1); 3.8764 (0.6); 3.0399 (0.4); 3.0230 (0.4); 2.9935 (0.9); 2.9765 (0.8); 2.8977 (0.7); 2.8683 (0.7); 2.8514 (0.5); 2.8227 (0.4); 2.5587 (12.9); 2.3218 (9.9); 2.3084 (9.4); 2.1237 (0.4); 2.1119 (0.5); 2.0950 (0.8); 2.0784 (0.5); 2.0667 (0.5); 1.5883 (16.0); 1.2927 (0.5); 1.0784 (0.4); 1.0635 (1.3); 1.0573 (1.6); 1.0427 (0.7); 1.0351 (1.5); 1.0288 (1.6); 1.0144 (0.6); 0.8218 (0.6); 0.8077 (1.7); 0.8019 (1.8); 0.7907 (1.6); 0.7846 (1.8); 0.7694 (0.6); 0.1079 (4.9); 0.0494 (0.6); 0.0385 (21.6); 0.0279 (1.1)

I-059: $^1$H-NMR(499.9 MHz, CDCl3):
δ = 8.1139 (8.8); 7.5958 (0.6); 7.5933 (0.6); 7.5813 (5.2); 7.5667 (2.1); 7.5510 (0.6); 7.3129 (2.5); 7.2580 (3.0); 7.2422 (1.0); 7.2381 (1.4); 7.2282 (1.1); 7.2240 (1.6); 7.2196 (0.7); 6.9438 (2.6); 6.9285 (2.8); 6.8774 (2.9); 6.6591 (1.6); 6.6441 (1.4);

TABLE 2-continued 6.0812 (1.8); 4.2843 (1.3); 4.2779 (1.3); 4.2627 (1.4); 4.2562 (1.4); 3.8805 (0.6); 3.8767 (0.6); 3.8730 (0.8); 3.8672 (0.7); 3.8641 (0.7); 3.8605 (0.8); 3.8567 (0.6); 3.8534 (0.6); 3.8510 (0.6); 3.8091 (2.2); 3.7964 (1.4); 3.7875 (1.9); 3.7748 (1.4); 3.0035 (1.1); 2.9942 (1.1); 2.9760 (1.3); 2.9668 (1.3); 2.6950 (1.4); 2.6748 (1.5); 2.6676 (1.3); 2.6474 (1.2); 2.2563 (16.0); 2.1411 (14.7); 1.5971 (3.6); 1.1369 (0.7); 1.1247 (0.7); −0.0002 (2.5)
I-060: $^1$H-NMR(300.2 MHz, CDCl3):
δ = 8.7742 (4.7); 8.6566 (3.0); 8.6400 (3.1); 8.6154 (6.9); 7.6617 (5.0); 7.6488 (5.2); 7.6447 (4.6); 7.6170 (0.5); 7.4264 (2.4); 7.3760 (1.0); 7.3675 (1.2); 7.3589 (1.5); 7.3523 (1.4); 7.3462 (1.0); 7.3383 (0.8); 7.2986 (12.9); 7.0239 (2.2); 6.9984 (2.6); 6.9324 (2.7); 6.7212 (1.5); 6.6967 (1.3); 6.1765 (1.9); 4.3741 (1.1); 4.3646 (1.2); 4.3388 (1.3); 4.3290 (1.2); 3.9732 (0.6); 3.9590 (0.8); 3.9408 (0.8); 3.9239 (0.7); 3.8933 (2.0); 3.8720 (1.0); 3.8580 (1.6); 3.8366 (1.1); 3.0877 (0.9); 3.0728 (0.9); 3.0417 (1.2); 3.0274 (1.1); 2.7800 (1.2); 2.7470 (1.2); 2.7349 (1.1); 2.7014 (0.9); 2.3610 (0.7); 2.3430 (0.8); 2.3183 (13.3); 2.2498 (0.4); 2.1945 (12.5); 1.6136 (16.0); 1.2928 (0.6); 0.1072 (1.3); 0.0370 (14.8); 0.0263 (1.1)
I-061: $^1$H-NMR(499.9 MHz, CDCl3):
δ = 7.8861 (4.6); 7.4878 (0.5); 7.4724 (1.5); 7.4572 (2.9); 7.4393 (0.4); 7.3795 (1.8); 7.3362 (0.9); 7.3323 (1.3); 7.3283 (0.8); 7.3177 (0.9); 7.2118 (3.5); 7.2079 (1.5); 7.1943 (4.5); 7.1895 (10.0); 6.8319 (3.9); 6.8279 (1.4); 6.8183 (1.5); 6.8145 (3.3); 6.8086 (0.4); 6.0588 (1.4); 5.2277 (3.8); 4.6454 (0.7); 4.6432 (0.7); 4.6374 (0.8); 4.6348 (0.8); 4.6308 (0.8); 4.6225 (0.7); 4.2570 (0.9); 4.2488 (0.9); 4.2348 (1.0); 4.2266 (0.9); 3.7263 (16.0); 3.6518 (1.3); 3.6366 (1.3); 3.6296 (1.2); 3.6145 (1.2); 2.6223 (14.3); 1.9722 (0.5); 1.4836 (4.0); 1.1873 (0.5); −0.0002 (15.1); −0.0645 (1.0); −0.0706 (10.6); −0.0771 (0.4)
I-062: $^1$H-NMR(499.9 MHz, CDCl3):
δ = 9.3730 (0.4); 8.2205 (0.6); 8.0631 (0.4); 7.6952 (0.4); 7.6815 (0.5); 7.6686 (0.4); 7.6548 (0.4); 7.6357 (0.4); 7.6204 (0.4); 7.6019 (0.4); 7.5868 (0.4); 7.5711 (0.4); 7.5568 (0.7); 7.5430 (0.8); 7.5219 (0.6); 7.5101 (0.5); 7.4949 (0.5); 7.4807 (0.5); 7.4668 (0.6); 7.4483 (0.4); 7.4412 (0.4); 7.4335 (0.4); 7.4255 (0.4); 7.3922 (0.5); 7.3780 (0.7); 7.3596 (0.8); 7.3416 (1.0); 7.3267 (0.9); 7.2940 (2.0); 7.2796 (2.5); 7.2601 (19.7); 7.2362 (1.8); 7.2204 (2.3); 7.2051 (1.5); 7.1856 (0.8); 7.1807 (0.8); 7.1701 (1.0); 7.1537 (3.6); 7.1421 (1.6); 7.1255 (1.2); 7.1020 (0.7); 7.0824 (0.4); 7.0446 (2.2); 7.0346 (3.4); 7.0284 (4.8); 6.7240 (0.8); 6.6794 (1.6); 6.6628 (1.4); 6.2983 (2.5); 6.2925 (2.6); 5.6003 (0.6); 5.5858 (1.1); 5.5712 (0.6); 4.6604 (0.3); 4.6449 (0.8); 4.6303 (0.8); 4.6153 (0.4); 4.5481 (1.0); 4.5408 (1.0); 3.7037 (0.4); 3.6803 (16.0); 3.3172 (0.7); 3.2609 (0.6); 3.2161 (0.5); 3.0668 (1.0); 3.0547 (1.0); 3.0441 (1.3); 2.9324 (1.0); 2.8568 (0.8); 2.5180 (1.1); 2.4929 (1.1); 2.4795 (0.9); 2.4619 (0.4); 2.4000 (4.1); 1.9994 (14.5); 1.2982 (0.4); 1.2839 (0.7); 1.2563 (3.5); 0.8936 (0.4); 0.8801 (0.8); 0.8664 (0.5); 0.0062 (0.8); −0.0002 (21.7); −0.0066 (1.2)
I-063: $^1$H-NMR(499.9 MHz, CDCl3):
δ = 8.6578 (5.4); 7.5859 (3.4); 7.5845 (3.1); 7.5789 (1.7); 7.5758 (2.2); 7.3339 (1.8); 7.2798 (0.7); 7.2746 (0.9); 7.2718 (0.6); 7.2683 (1.1); 7.2642 (1.0); 7.2601 (2.9); 6.9650 (1.8); 6.9497 (2.0); 6.8854 (2.1); 6.6821 (1.1); 6.6672 (1.0); 6.0109 (1.4); 5.2949 (4.2); 4.2979 (0.9); 4.2913 (1.0); 4.2763 (1.0); 4.2697 (1.0); 3.9235 (16.0); 3.9051 (0.6); 3.9009 (0.6); 3.8971 (0.7); 3.8914 (0.6); 3.8848 (0.7); 3.8811 (0.5); 3.8776 (0.5); 3.8353 (1.4); 3.8226 (1.0); 3.8137 (1.2); 3.8010 (0.9); 3.0129 (0.7); 3.0037 (0.8); 2.9855 (0.9); 2.9763 (0.9); 2.7226 (1.0); 2.7025 (1.0); 2.6953 (0.9); 2.6751 (0.8); 2.3336 (15.4); 2.2675 (10.8); 2.1527 (10.1); 1.5897 (0.5); −0.0002 (2.8)
I-064: $^1$H-NMR(499.9 MHz, CDCl3):
δ = 8.6875 (5.6); 7.5797 (3.1); 7.5721 (1.5); 7.5693 (2.4); 7.3360 (1.5); 7.2841 (0.7); 7.2792 (0.7); 7.2736 (1.0); 7.2697 (0.9); 7.2660 (0.7); 7.2596 (3.9); 6.9694 (1.6); 6.9542 (1.8); 6.8870 (1.8); 6.6856 (1.0); 6.6706 (0.8); 5.9863 (1.2); 4.2861 (0.8); 4.2800 (0.8); 4.2647 (0.9); 4.2585 (0.9); 4.0366 (16.0); 3.8992 (0.4); 3.8953 (0.4); 3.8902 (0.6); 3.8857 (0.5); 3.8827 (0.4); 3.8793 (0.5); 3.8755 (0.4); 3.8725 (0.4); 3.8695 (0.4); 3.8424 (1.4); 3.8299 (0.8); 3.8209 (1.2); 3.8085 (0.8); 3.0061 (0.7); 2.9969 (0.7); 2.9788 (0.8); 2.9694 (0.8); 2.7318 (0.9); 2.7119 (0.9); 2.7044 (0.8); 2.6845 (0.7); 2.3291 (15.0); 2.2680 (9.8); 2.1537 (9.0); 2.0419 (0.5); 2.0017 (0.9); 1.5664 (1.0); −0.0002 (4.4)
I-065: $^1$H-NMR(400.1 MHz, $d_6$-DMSO):
δ = 7.7607 (0.8); 7.7412 (2.5); 7.7216 (2.5); 7.7035 (3.2); 7.6840 (1.4); 7.6253 (3.6); 7.6014 (2.2); 7.5814 (1.6); 7.4082 (2.4); 7.4028 (2.5); 7.0822 (2.0); 7.0632 (2.3); 6.9530 (3.7); 6.8487 (1.5); 6.8304 (1.4); 3.8004 (7.4); 3.3444 (21.3); 2.8242 (3.1); 2.8095 (3.0); 2.5137 (4.1); 2.5098 (5.3); 2.5058 (4.0); 2.2356 (14.4); 2.2138 (16.0); 2.0841 (1.5)
I-066: $^1$H-NMR(300.2 MHz, CDCl3):
δ = 8.1875 (7.1); 7.6297 (4.7); 7.6125 (3.7); 7.3652 (2.6); 7.3143 (1.0); 7.2983 (13.3); 7.2769 (0.7); 7.0047 (2.5); 6.9792 (3.0); 6.9213 (3.0); 6.7137 (1.6); 6.6886 (1.4); 6.1361 (1.6); 5.3368 (9.5); 5.1204 (0.8); 5.1003 (1.0); 5.0823 (0.9); 4.3441 (1.1); 4.3341 (1.3); 4.3089 (1.4); 4.2989 (1.4); 3.9464 (0.5); 3.9291 (0.7); 3.9127 (0.8); 3.8965 (0.6); 3.8890 (0.6); 3.8737 (2.3); 3.8526 (1.0); 3.8387 (1.8); 3.8177 (1.1); 3.4839 (1.0); 3.4751 (1.3); 3.4595 (1.1); 3.0622 (1.0); 3.0476 (1.0); 3.0169 (1.4); 3.0016 (1.3); 2.7648 (1.2); 2.7322 (1.2); 2.7198 (1.0); 2.6866 (0.9); 2.3035 (16.0); 2.1871 (14.3); 2.0823 (0.8); 1.6094 (10.8); 1.6044 (8.6); 1.5866 (6.3); 1.5822 (6.9); 1.3028 (0.4); 1.2964 (0.7); 1.2797 (0.6); 0.0478 (0.4); 0.0371 (15.0); 0.0263 (0.6)
I-067: $^1$H-NMR(300.2 MHz, CDCl3):
δ = 8.3181 (6.0); 7.6233 (4.5); 7.6065 (3.3); 7.5784 (0.3); 7.3678 (2.4); 7.3120 (1.0); 7.2988 (8.6); 7.2861 (1.1); 7.2741 (0.6); 7.0082 (2.3); 6.9827 (2.8); 6.9230 (2.9); 6.7174 (1.3); 6.6922 (1.1); 6.1085 (1.9); 5.9760 (0.7); 5.9705 (0.7); 5.9543 (0.8); 5.9489 (0.7); 5.8177 (0.7); 5.8124 (0.7); 5.7961 (0.7); 5.7905 (0.7); 4.3479 (1.1); 4.3378 (1.2); 4.3130 (1.4); 4.3029 (1.3); 3.9505 (0.5); 3.9351 (0.7); 3.9288 (0.7); 3.9239 (0.7); 3.9177 (0.8); 3.9075 (0.6); 3.9014 (0.7); 3.8941 (0.6); 3.8816 (2.2); 3.8606 (0.9); 3.8468 (1.6); 3.8257 (1.0); 3.0646 (0.9); 3.0499 (1.0); 3.0191 (1.3); 3.0040 (1.2); 2.7731 (0.8); 2.7670 (0.9); 2.7404 (0.8); 2.7343 (0.9); 2.7287 (0.8); 2.7218 (0.8); 2.6952 (0.6); 2.6889 (0.7); 2.3062 (16.0); 2.1889 (14.8); 1.8262 (2.6); 1.8148 (3.1); 1.8044 (2.7); 1.7930 (3.1); 1.7451 (2.7); 1.7337 (3.2); 1.7233 (2.7); 1.7120 (3.0); 1.6043 (2.4); 1.3030 (1.1); 0.9422 (0.4); 0.9204 (1.1); 0.8972 (0.4); 0.1091 (0.4); 0.0384 (9.3); 0.0276 (0.4)
I-068: $^1$H-NMR(300.2 MHz, CDCl3):
δ = 7.9029 (8.4); 7.5863 (4.4); 7.5690 (4.7); 7.3267 (2.5); 7.2985 (11.1); 7.2792 (1.0); 7.2707 (1.0); 7.2626 (1.6); 7.2564 (1.3); 7.2491 (0.9); 7.2409 (0.7); 6.9986 (2.5); 6.9731 (2.9); 6.9166 (3.0); 6.7121 (1.6); 6.6866 (1.4); 6.1474 (1.9); 4.3254 (1.1); 4.3158 (1.3); 4.2907 (1.4); 4.2806 (1.4); 4.2141 (0.6); 3.9315 (0.6); 3.9194 (0.8); 3.9096 (0.7); 3.8986 (0.8); 3.8914 (0.6); 3.8825 (0.7); 3.8749 (0.6); 3.8613 (2.5); 3.8403 (1.0); 3.8264 (1.9); 3.8053 (1.2); 3.0466 (1.0); 3.0320 (1.0); 3.0012 (1.4); 2.9860 (1.3); 2.7576 (1.4); 2.7251 (1.4); 2.7123 (1.2); 2.6793 (1.0); 2.2974 (16.0); 2.1858 (15.1); 2.1659 (0.9); 2.1568 (1.8); 2.1455 (0.7); 2.1397 (0.9); 2.1302 (1.0); 2.1128 (0.6); 1.6075 (3.2); 1.2927 (0.4); 1.1820 (0.4); 1.1597 (1.7); 1.1513 (3.9); 1.1451 (3.4); 1.1346 (5.3); 1.1286 (5.4); 1.1211 (1.9); 1.1088 (2.1); 1.1021 (3.1); 1.0932 (1.7); 1.0724 (0.4); 0.7120 (0.4); 0.7038 (0.6); 0.6948 (0.5); 0.6822 (0.6); 0.6737 (0.9); 0.6650 (0.6); 0.6519 (0.4); 0.6453 (0.4); 0.6200 (0.3); 0.6108 (0.6); 0.6007 (0.5); 0.5912 (0.7); 0.5835 (0.4); 0.5182 (0.4); 0.5061 (0.4); 0.0483 (0.5); 0.0376 (13.4); 0.0268 (0.6); −0.1248 (0.4)
I-069: $^1$H-NMR(300.2 MHz, CDCl3):
δ = 8.2219 (1.7); 7.6115 (1.1); 7.6089 (1.1); 7.6028 (0.5); 7.5982 (0.5); 7.5898 (0.6); 7.3508 (0.6); 7.2988 (2.8); 6.9956 (0.6); 6.9702 (0.7); 6.9213 (0.7); 6.7079 (0.4); 6.0933 (0.5); 4.2941 (0.3); 4.2841 (0.3); 3.8595 (0.5); 3.8246 (0.4); 2.2962 (3.6); 2.1896 (3.3); 1.6004 (2.6); 0.3194 (0.5); 0.3125 (0.8); 0.3008 (16.0); 0.2895 (0.8); 0.0379 (3.3)
I-070: $^1$H-NMR(499.9 MHz, CDCl3):
δ = 8.1126 (16.0); 7.5854 (1.0); 7.5708 (10.5); 7.5561 (4.7); 7.5405 (1.5); 7.5325 (0.4); 7.2596 (10.0); 7.2541 (6.1); 7.2374 (2.6); 7.2335 (3.2); 7.2235 (2.6); 7.2193 (3.4); 7.2153 (1.9); 7.2024 (0.4); 7.1703 (1.5); 7.1560 (5.0); 7.1499 (9.7); 7.1402 (17.4); 7.1342 (10.4); 7.1267 (6.0); 6.0810 (3.7); 4.2867 (2.6); 4.2799 (2.9); 4.2649 (3.0); 4.2582 (3.2); 3.9225 (0.4); 3.9099

TABLE 2-continued (1.2); 3.9059 (1.3); 3.9022 (1.7); 3.8992 (1.6); 3.8962 (1.6); 3.8899 (1.9); 3.8863 (1.5); 3.8824 (1.4); 3.8698 (0.7); 3.8137 (4.1); 3.8011 (3.2); 3.7919 (3.8); 3.7793 (3.0); 3.0428 (2.6); 3.0333 (2.7); 3.0158 (3.1); 3.0064 (3.1); 2.7014 (3.3); 2.6814 (3.3); 2.6744 (3.1); 2.6544 (2.8); 2.1659 (7.3); 1.5873 (0.8); 0.0062 (0.4); −0.0002 (9.4); −0.0065 (0.7)

I-071: $^{1}$H-NMR(300.2 MHz, CDCl3):

δ = 7.6492 (8.8); 7.4138 (1.0); 7.3877 (2.7); 7.3712 (1.9); 7.3457 (2.3); 7.3199 (1.0); 7.2989 (4.7); 7.1656 (1.7); 7.1397 (1.6); 7.1254 (4.0); 7.0988 (3.6); 7.0341 (4.4); 7.0170 (1.7); 4.3139 (1.9); 4.2769 (2.3); 4.1709 (0.7); 4.1471 (0.7); 4.0378 (0.7); 4.0150 (1.3); 3.9878 (0.7); 3.9066 (1.5); 3.8989 (1.5); 3.8695 (1.4); 3.8619 (1.3); 3.2617 (9.0); 3.0687 (2.2); 3.0572 (2.0); 3.0402 (2.8); 3.0116 (0.4); 2.3339 (15.3); 2.2980 (0.4); 2.2414 (16.0); 2.0818 (3.7); 1.7418 (0.4); 1.3197 (1.0); 1.2957 (2.7); 1.2722 (0.9); 0.0379 (4.3)

I-072: $^{1}$H-NMR(300.2 MHz, CDCl3):

δ = 7.5830 (1.1); 7.5616 (3.2); 7.5398 (0.4); 7.4678 (1.5); 7.4343 (0.7); 7.4255 (1.1); 7.4183 (0.6); 7.4112 (0.4); 7.4035 (0.6); 7.3967 (0.4); 7.2990 (4.8); 7.0362 (2.8); 7.0109 (2.2); 6.9696 (1.2); 6.9443 (0.6); 5.3365 (0.9); 4.9700 (1.1); 4.7061 (0.4); 4.6931 (0.5); 4.6772 (0.4); 4.6697 (0.8); 4.6555 (1.5); 4.6411 (0.8); 4.6183 (0.7); 4.6032 (1.4); 4.5885 (0.8); 4.5821 (0.4); 4.5687 (0.4); 4.5652 (0.5); 4.5522 (0.3); 4.1810 (0.4); 4.1720 (0.8); 4.1465 (1.0); 4.1376 (0.6); 3.9367 (0.5); 3.9277 (0.5); 3.9183 (0.6); 3.9090 (0.8); 3.9015 (1.4); 3.8674 (1.0); 3.8495 (0.6); 3.8008 (2.1); 3.7866 (3.1); 3.7715 (1.8); 3.4187 (16.0); 3.0154 (0.4); 2.9970 (0.4); 2.9696 (0.9); 2.9509 (0.8); 2.8856 (0.7); 2.8570 (0.7); 2.8391 (0.5); 2.8111 (0.4); 2.3497 (0.5); 2.3172 (12.2); 2.0405 (9.2); 1.6172 (1.0); 0.0384 (5.0)

I-073: $^{1}$H-NMR(300.2 MHz, CDCl3):

δ = 8.4004 (0.4); 8.3143 (5.2); 7.7190 (0.5); 7.6709 (0.5); 7.6603 (4.7); 7.6576 (4.7); 7.6409 (3.1); 7.6136 (0.4); 7.3830 (2.7); 7.3483 (0.3); 7.3358 (1.2); 7.3273 (1.4); 7.3170 (1.7); 7.3101 (1.6); 7.2991 (10.8); 7.0081 (2.5); 6.9826 (3.0); 6.9222 (3.0); 6.6987 (1.6); 6.6735 (1.4); 6.2869 (2.1); 4.3887 (1.1); 4.3789 (1.2); 4.3536 (1.4); 4.3439 (1.4); 3.9680 (0.5); 3.9510 (0.7); 3.9347 (0.8); 3.9185 (0.7); 3.9113 (0.6); 3.8954 (2.3); 3.8741 (1.0); 3.8604 (1.8); 3.8390 (1.1); 3.0893 (1.0); 3.0747 (1.0); 3.0439 (1.4); 3.0290 (1.2); 2.7679 (1.4); 2.7350 (1.3); 2.7227 (1.2); 2.6892 (1.0); 2.3320 (0.8); 2.3135 (16.0); 2.2506 (0.6); 2.1783 (15.0); 1.7670 (0.5); 1.2922 (1.5); 0.0374 (10.2); 0.0266 (0.5)

I-074: $^{1}$H-NMR(499.9 MHz, $d_6$-DMSO):

δ = 8.3436 (2.3); 7.8313 (6.3); 7.7605 (2.6); 7.7368 (2.3); 7.7305 (2.2); 7.7216 (2.1); 7.6751 (2.8); 7.6596 (1.7); 6.9652 (2.4); 6.7853 (2.3); 5.0047 (1.3); 4.1443 (1.0); 4.1364 (1.1); 4.1225 (1.2); 4.1146 (1.1); 3.5631 (1.2); 3.5513 (1.2); 3.5413 (1.2); 3.5295 (1.1); 3.3168 (36.0); 2.6156 (16.0); 2.5116 (5.9); 2.5083 (12.5); 2.5047 (17.4); 2.5012 (13.2); 2.4978 (6.8); 2.1474 (1.4); 2.1378 (12.0); 2.0675 (1.1); 1.9924 (0.8); 1.8396 (11.8); 1.1789 (0.4)

I-075: $^{1}$H-NMR(300.2 MHz, CDCl3):

δ = 7.9550 (5.2); 7.2987 (14.4); 7.1410 (0.6); 7.1136 (3.4); 7.0876 (3.4); 7.0603 (3.4); 7.0551 (2.9); 7.0424 (1.1); 7.0371 (1.4); 7.0157 (0.6); 7.0099 (0.6); 6.8645 (0.8); 6.8584 (0.7); 6.8380 (1.2); 6.8166 (0.6); 6.8112 (0.6); 6.6263 (1.3); 6.6203 (1.3); 6.6002 (1.2); 6.5943 (1.2); 6.2336 (1.2); 5.3369 (9.3); 4.2320 (0.9); 4.2212 (1.0); 4.1959 (1.1); 4.1851 (1.2); 4.0257 (0.4); 4.0161 (0.5); 3.9963 (0.6); 3.9868 (0.6); 3.9778 (0.4); 3.9692 (0.3); 3.9173 (1.5); 3.8994 (1.0); 3.8813 (1.2); 3.8635 (0.9); 3.1906 (0.8); 3.1743 (0.8); 3.1460 (1.1); 3.1295 (1.1); 2.9936 (0.6); 2.9215 (1.6); 2.8912 (1.1); 2.8767 (0.9); 2.8464 (0.8); 2.7107 (0.5); 2.6723 (16.0); 2.1517 (0.4); 2.1406 (0.5); 2.1234 (1.0); 2.1061 (0.6); 2.0951 (0.6); 2.0784 (0.3); 1.7846 (0.6); 1.7735 (0.6); 1.7569 (1.1); 1.7401 (0.7); 1.7289 (0.6); 1.7124 (0.4); 1.6119 (1.3); 1.2967 (0.4); 1.0878 (0.7); 1.0748 (1.3); 1.0677 (1.8); 1.0598 (1.2); 1.0547 (1.2); 1.0460 (1.5); 1.0395 (1.8); 1.0264 (1.0); 0.9577 (2.2); 0.9517 (2.5); 0.9295 (2.4); 0.9237 (2.4); 0.8987 (0.4); 0.8328 (0.8); 0.8258 (0.9); 0.8167 (1.8); 0.8094 (1.8); 0.8018 (2.0); 0.7942 (1.4); 0.7838 (0.7); 0.6283 (0.3); 0.6231 (0.4); 0.6118 (0.3); 0.6062 (0.3); 0.6010 (0.4); 0.5918 (1.0); 0.5888 (1.0); 0.5752 (1.0); 0.5712 (1.1); 0.5644 (0.9); 0.5580 (1.2); 0.5473 (0.8); 0.5414 (1.1); 0.5334 (0.4); 0.5166 (0.3); 0.1075 (2.0); 0.0484 (0.5); 0.0377 (16.4); 0.0267 (0.7)

I-076: $^{1}$H-NMR(300.2 MHz, CDCl3):

δ = 7.4211 (2.5); 7.4141 (2.6); 7.2989 (14.2); 7.2019 (2.0); 7.1745 (2.8); 7.1640 (0.4); 7.1461 (2.4); 7.1400 (1.7); 7.1369 (1.8); 7.1332 (1.6); 7.1208 (3.3); 7.0604 (1.7); 7.0534 (1.7); 7.0331 (1.1); 7.0261 (1.2); 6.8688 (0.6); 6.8595 (0.6); 6.8465 (1.2); 6.8348 (0.8); 6.8277 (0.5); 6.8143 (0.5); 5.3381 (0.4); 4.8325 (1.0); 4.8241 (1.0); 4.1418 (0.4); 4.1330 (0.9); 4.1064 (1.1); 4.1000 (1.4); 4.0924 (0.9); 4.0759 (0.8); 4.0655 (0.8); 4.0468 (1.9); 4.0140 (0.8); 4.0031 (0.4); 3.2014 (0.4); 3.1833 (0.4); 3.1561 (1.2); 3.1388 (1.2); 3.1158 (1.1); 3.0879 (1.0); 3.0700 (0.4); 3.0434 (0.4); 2.5696 (16.0); 2.1117 (0.4); 2.1008 (0.5); 2.0828 (1.3); 2.0663 (0.6); 2.0555 (0.5); 1.5887 (7.7); 1.2970 (0.6); 1.0865 (0.4); 1.0813 (0.4); 1.0716 (1.4); 1.0634 (1.6); 1.0533 (0.8); 1.0483 (0.7); 1.0428 (1.4); 1.0354 (1.7); 1.0258 (0.5); 1.0203 (0.5); 0.8248 (0.5); 0.8185 (0.5); 0.8086 (2.2); 0.8020 (2.1); 0.7916 (2.2); 0.7854 (2.0); 0.7743 (0.4); 0.7687 (0.4); 0.1073 (4.8); 0.0485 (0.6); 0.0377 (18.4); 0.0268 (0.7)

I-077: $^{1}$H-NMR(400.1 MHz, $d_6$-DMSO):

δ = 10.9075 (2.2); 8.1383 (6.9); 7.9621 (2.6); 7.3552 (1.5); 7.3357 (3.0); 7.3160 (1.9); 7.2458 (2.4); 7.2270 (2.8); 7.0556 (1.9); 7.0517 (2.1); 7.0293 (2.7); 7.0242 (2.8); 7.0014 (10.7); 6.9806 (1.9); 5.0954 (1.2); 5.0818 (1.3); 5.0642 (1.4); 5.0507 (1.2); 3.3154 (3.8); 2.8997 (16.0); 2.7410 (14.5); 2.6392 (1.1); 2.6255 (1.2); 2.5980 (1.7); 2.5844 (1.6); 2.5135 (13.0); 2.5095 (16.6); 2.4033 (1.6); 2.3720 (1.8); 2.3622 (1.5); 2.3306 (1.6); 2.3120 (15.5); 2.2578 (14.4); 2.2206 (0.4); 1.9992 (0.4); 1.9862 (0.8); 1.9775 (1.0); 1.9656 (1.7); 1.9530 (1.0); 1.9448 (0.9); 1.9322 (0.5); 1.0042 (1.0); 0.9932 (2.9); 0.9879 (3.2); 0.9724 (3.0); 0.9672 (3.0); 0.9569 (1.2); 0.7039 (1.2); 0.6930 (3.5); 0.6888 (3.5); 0.6809 (3.3); 0.6765 (3.6); 0.6650 (1.0)

I-078: $^{1}$H-NMR(499.9 MHz, CDCl3):

δ = 9.1273 (1.6); 8.6675 (0.5); 8.2413 (8.7); 8.0140 (1.6); 7.3345 (0.4); 7.3271 (1.8); 7.3187 (0.4); 7.3113 (3.6); 7.2954 (2.2); 7.2592 (12.4); 7.0889 (2.4); 7.0735 (3.2); 7.0472 (0.3); 7.0429 (0.3); 7.0222 (4.1); 7.0040 (2.0); 7.0012 (2.2); 6.9991 (2.0); 6.9831 (1.4); 6.9558 (1.5); 6.9541 (1.6); 6.9510 (1.7); 6.9493 (1.6); 6.9396 (1.4); 6.9379 (1.4); 6.9348 (1.6); 6.9331 (1.4); 6.8813 (2.2); 6.8774 (2.9); 6.8733 (1.9); 4.0911 (0.4); 4.0795 (0.7); 4.0749 (0.6); 4.0684 (0.9); 4.0635 (0.8); 4.0571 (0.8); 4.0523 (0.8); 4.0457 (0.5); 4.0411 (0.7); 4.0295 (0.4); 3.2083 (1.2); 3.1961 (1.2); 3.1807 (1.4); 3.1686 (1.3); 2.9531 (14.4); 2.8806 (12.2); 2.8801 (12.4); 2.8608 (1.5); 2.8495 (1.4); 2.8332 (1.2); 2.5865 (1.5); 2.5755 (1.6); 2.5531 (2.0); 2.5421 (1.9); 2.3698 (2.6); 2.3571 (16.0); 2.3476 (2.4); 2.3364 (1.8); 2.3140 (2.4); 2.3064 (14.3); 2.2360 (0.9); 2.1111 (0.8); 2.0026 (0.5); 1.9395 (0.5); 1.9294 (0.9); 1.9228 (0.9); 1.9196 (0.6); 1.9127 (1.6); 1.9058 (0.6); 1.9026 (0.9); 1.8959 (0.8); 1.8858 (0.5); 1.5905 (0.6); 1.0039 (1.3); 0.9944 (2.8); 0.9908 (3.0); 0.9872 (1.6); 0.9816 (1.7); 0.9776 (2.9); 0.9740 (2.7); 0.9648 (1.3); 0.7282 (1.6); 0.7187 (3.7); 0.7154 (3.2); 0.7089 (2.9); 0.7056 (3.6); 0.6958 (1.1); 0.0063 (0.8); −0.0002 (15.6); −0.0069 (0.5)

I-079: $^{1}$H-NMR(300.1 MHz, $d_6$-DMSO):

δ = 7.7389 (0.7); 7.7172 (8.1); 7.6852 (2.8); 7.6763 (3.1); 7.6587 (2.5); 7.6327 (1.1); 7.5939 (1.8); 7.5678 (1.1); 7.5424 (3.1); 7.5357 (3.3); 7.4345 (2.4); 7.4068 (3.1); 7.2348 (2.0); 7.2277 (1.9); 7.2073 (1.6); 7.2002 (1.5); 6.8128 (2.0); 6.8026 (1.9); 4.2243 (0.4); 4.2057 (0.7); 4.1831 (1.0); 4.1641 (1.3); 4.1413 (1.2); 4.1289 (0.8); 4.1130 (0.8); 4.0010 (0.5); 3.9780 (1.2); 3.9567 (0.8); 3.9367 (0.9); 3.9133 (0.4); 3.3255 (1.4); 3.1423 (0.8); 3.1192 (0.8); 3.0961 (1.1); 3.0734 (1.0); 2.8798 (1.1); 2.8554 (1.1); 2.8339 (0.8); 2.8093 (0.8); 2.5810 (16.0); 2.5092 (5.3); 2.5034 (6.9); 2.4976 (4.9); 2.0613 (0.6); 2.0384 (1.0); 2.0124 (1.2); 1.9890 (1.1); −0.0005 (5.2)

I-080: $^{1}$H-NMR(400.1 MHz, CDCl3):

δ = 8.0017 (0.6); 7.9803 (0.6); 7.9065 (5.3); 7.6479 (0.7); 7.5681 (0.5); 7.5473 (2.6); 7.5320 (7.5); 7.5257 (6.6); 7.5092 (4.1); 7.5041 (5.5); 7.4565 (1.2); 7.4351 (3.8); 7.3813 (1.8); 7.3755 (2.2); 7.3560 (6.6); 7.3395 (3.3); 7.3346 (4.2); 7.2669 (2.4); 7.2612 (5.3); 7.2508 (0.8); 6.7548 (2.8); 5.6001 (0.5); 3.8279 (0.6); 3.8124 (2.1); 3.7967 (2.2); 3.7863 (0.7); 3.7812 (0.8);

TABLE 2-continued 3.2369 (1.2); 2.7506 (0.4); 2.6986 (16.0); 2.6095 (2.1); 1.6808 (0.4); 1.6203 (1.8); 1.6030 (2.1); 1.4230 (1.7); 1.3909 (0.5); 1.3735 (0.5); 1.3320 (0.9); 1.2571 (8.3); 1.1584 (8.1); 1.1427 (8.4); 1.0319 (0.5); 1.0155 (0.5); 0.9945 (0.4); 0.9782 (0.4); 0.8950 (1.0); 0.8801 (1.7); 0.8700 (1.3); 0.8629 (1.3); 0.0715 (0.5); 0.0057 (2.7); −0.0002 (6.1)

I-081: $^1$H-NMR(499.9 MHz, CDCl3):

δ = 8.0074 (5.1); 7.5465 (0.3); 7.5308 (1.4); 7.5168 (4.0); 7.5029 (0.3); 7.4219 (1.8); 7.3604 (0.7); 7.3558 (1.3); 7.3515 (0.8); 7.3479 (0.5); 7.3460 (0.6); 7.3409 (1.1); 7.3351 (3.6); 7.3313 (1.2); 7.3219 (1.5); 7.3181 (4.7); 7.3132 (0.6); 7.2614 (4.1); 7.2306 (0.7); 7.2261 (4.4); 7.2224 (1.3); 7.2128 (1.2); 7.2092 (3.2); 7.2043 (0.4); 6.5340 (0.9); 6.5254 (0.9); 4.5924 (1.1); 4.5863 (1.3); 4.5836 (1.3); 4.5774 (1.1); 4.1824 (1.0); 4.1765 (1.0); 4.1695 (1.0); 4.1635 (1.0); 2.6861 (16.0); 1.9977 (0.5); 1.5905 (0.3); 1.0315 (7.0); 1.0186 (6.9); −0.0002 (4.9)

I-082: $^1$H-NMR(300.2 MHz, CDCl3):

δ = 8.6780 (3.4); 8.6717 (3.5); 8.3307 (0.3); 8.3202 (3.4); 8.3122 (3.5); 8.1643 (8.6); 7.6383 (2.3); 7.6308 (3.6); 7.6240 (2.3); 7.2991 (5.3); 6.9977 (2.4); 6.9721 (3.0); 6.9485 (2.9); 6.7777 (1.6); 6.7523 (1.2); 5.9734 (1.8); 4.3550 (1.1); 4.3453 (1.3); 4.3197 (1.4); 4.3098 (1.4); 3.9450 (0.5); 3.9390 (0.5); 3.9297 (0.7); 3.9234 (0.7); 3.9118 (0.8); 3.9051 (0.6); 3.9008 (0.6); 3.8952 (0.6); 3.8894 (0.5); 3.8798 (0.4); 3.8608 (2.4); 3.8396 (1.2); 3.8254 (1.9); 3.8042 (1.3); 3.0706 (1.0); 3.0555 (1.0); 3.0251 (1.3); 3.0096 (1.3); 2.7437 (1.5); 2.7102 (1.4); 2.6982 (1.2); 2.6643 (1.1); 2.4286 (0.4); 2.3063 (16.0); 2.2424 (14.7); 2.0427 (4.5); 1.6422 (0.9); 0.0361 (6.4)

I-083: $^1$H-NMR(499.9 MHz, CDCl3):

δ = 8.2832 (2.8); 8.2780 (2.8); 8.1440 (7.0); 7.7726 (3.3); 7.7673 (3.1); 7.2602 (12.4); 6.9574 (2.6); 6.9422 (2.9); 6.9081 (3.4); 6.7340 (1.9); 6.7191 (1.6); 5.8274 (2.2); 4.3260 (1.4); 4.3195 (1.4); 4.3043 (1.5); 4.2978 (1.5); 3.9177 (0.7); 3.9097 (1.0); 3.8978 (1.0); 3.8936 (0.8); 3.8900 (0.7); 3.8265 (1.9); 3.8137 (1.5); 3.8047 (1.7); 3.7920 (1.3); 3.0301 (1.2); 3.0210 (1.2); 3.0026 (1.4); 2.9934 (1.3); 2.6971 (1.5); 2.6764 (1.5); 2.6696 (1.4); 2.6489 (1.2); 2.3270 (0.3); 2.3149 (0.3); 2.3035 (0.6); 2.2742 (16.0); 2.1789 (15.2); 1.5479 (12.8); 1.2734 (0.6); 1.2608 (0.7); −0.0002 (15.1)

I-084: $^1$H-NMR(300.2 MHz, CDCl3):

δ = 7.5701 (2.5); 7.5638 (2.6); 7.2989 (11.2); 7.2116 (1.0); 7.2052 (0.9); 7.1845 (1.9); 7.1781 (2.0); 7.1451 (2.7); 7.1356 (4.8); 7.1199 (3.2); 7.1086 (1.7); 6.8693 (0.6); 6.8595 (0.6); 6.8473 (1.1); 6.8359 (0.9); 6.8269 (0.5); 6.8150 (0.5); 4.8462 (1.1); 4.8382 (1.1); 4.1687 (0.4); 4.1448 (0.5); 4.1366 (0.4); 4.1283 (0.9); 4.1219 (0.4); 4.1004 (1.3); 4.0959 (1.4); 4.0879 (0.9); 4.0778 (0.8); 4.0713 (0.7); 4.0608 (0.9); 4.0439 (1.9); 4.0126 (0.8); 4.0011 (0.4); 3.1868 (0.4); 3.1689 (0.4); 3.1411 (1.2); 3.1243 (1.2); 3.1026 (1.0); 3.0746 (1.0); 3.0571 (0.4); 3.0301 (0.4); 2.5670 (16.0); 2.1168 (0.4); 2.1058 (0.5); 2.0885 (1.0); 2.0816 (2.8); 2.0713 (0.6); 2.0605 (0.5); 1.5965 (10.9); 1.3201 (0.5); 1.2963 (1.1); 1.2725 (0.4); 1.0906 (0.3); 1.0820 (0.4); 1.0744 (1.3); 1.0658 (1.7); 1.0456 (1.4); 1.0382 (1.8); 1.0313 (0.6); 1.0225 (0.4); 0.9969 (0.3); 0.9726 (0.5); 0.8277 (0.5); 0.8188 (0.4); 0.8108 (2.1); 0.8038 (1.7); 0.7943 (2.0); 0.7873 (1.8); 0.7790 (0.4); 0.7706 (0.4); 0.1071 (3.8); 0.0482 (0.4); 0.0373 (11.6); 0.0264 (0.4)

I-085: $^1$H-NMR(300.2 MHz, CDCl3):

δ = 7.2989 (13.4); 7.1569 (0.4); 7.1359 (1.8); 7.1291 (4.2); 7.1121 (4.1); 7.1025 (4.9); 7.0859 (0.5); 6.8599 (0.6); 6.8513 (0.7); 6.8374 (1.2); 6.8242 (2.2); 6.8190 (1.9); 6.8059 (0.7); 6.7986 (1.2); 6.7926 (1.2); 4.8268 (1.2); 4.8173 (1.2); 4.1651 (0.8); 4.1548 (1.0); 4.1466 (0.5); 4.1289 (1.2); 4.1188 (1.5); 4.0785 (0.4); 4.0633 (0.6); 4.0486 (0.7); 4.0379 (0.6); 4.0201 (0.4); 3.9935 (1.4); 3.9792 (0.8); 3.9575 (0.9); 3.9432 (0.7); 3.1701 (0.6); 3.1519 (0.6); 3.1249 (1.3); 3.1066 (1.2); 3.0459 (1.2); 3.0180 (1.2); 3.0009 (0.7); 2.9728 (0.6); 2.5597 (16.0); 2.1279 (0.5); 2.1167 (0.5); 2.0996 (1.0); 2.0827 (3.0); 2.0715 (0.6); 1.8776 (0.5); 1.8662 (0.6); 1.8495 (1.1); 1.8328 (0.6); 1.8216 (0.6); 1.5941 (13.3); 1.3208 (0.5); 1.2970 (1.1); 1.2731 (0.4); 1.0781 (0.4); 1.0625 (1.8); 1.0558 (2.0); 1.0344 (2.1); 1.0273 (2.0); 1.0211 (2.1); 1.0145 (2.5); 0.9993 (1.2); 0.9927 (2.0); 0.9864 (1.8); 0.9720 (1.2); 0.8231 (0.8); 0.8090 (1.9); 0.8052 (2.0); 0.7918 (1.9); 0.7874 (1.8); 0.7708 (0.6); 0.7079 (0.9); 0.6924 (2.3); 0.6868 (2.0); 0.6762 (1.9); 0.6704 (2.4); 0.6543 (0.7); 0.1073 (1.6); 0.0486 (0.4); 0.0376 (14.2); 0.0265 (0.5)

I-086: $^1$H-NMR(300.2 MHz, CDCl3):

δ = 8.1343 (5.8); 7.3665 (1.2); 7.3402 (2.5); 7.3138 (1.6); 7.2990 (16.2); 7.0495 (1.5); 7.0237 (1.2); 6.9870 (1.8); 6.9616 (2.2); 6.9259 (2.2); 6.8496 (1.0); 6.8442 (1.2); 6.8224 (0.8); 6.8173 (1.1); 6.7829 (1.7); 6.7768 (2.2); 6.7702 (1.3); 6.6910 (1.2); 6.6680 (1.0); 6.2783 (1.4); 4.2975 (0.7); 4.2887 (1.0); 4.2634 (1.1); 4.2545 (0.9); 4.1962 (0.3); 4.1723 (1.0); 4.1485 (1.0); 4.1247 (0.4); 3.8854 (0.5); 3.8807 (0.5); 3.8705 (0.5); 3.8644 (0.6); 3.8568 (0.5); 3.8427 (2.1); 3.8228 (0.5); 3.8088 (1.4); 3.7879 (0.8); 3.0419 (0.7); 3.0268 (0.6); 2.9968 (1.0); 2.9810 (1.0); 2.7490 (0.9); 2.7176 (0.9); 2.7111 (0.6); 2.7035 (0.9); 2.6721 (0.8); 2.3334 (0.4); 2.3164 (0.5); 2.2986 (11.7); 2.2185 (10.9); 2.0843 (4.6); 1.9800 (0.5); 1.9690 (0.6); 1.9522 (1.1); 1.9355 (0.6); 1.9243 (0.6); 1.9076 (0.3); 1.5911 (16.0); 1.3221 (1.2); 1.2983 (2.3); 1.2745 (1.1); 1.0762 (0.7); 1.0609 (1.8); 1.0543 (2.0); 1.0395 (1.0); 1.0326 (2.0); 1.0262 (1.8); 1.0117 (0.9); 0.7767 (0.8); 0.7613 (2.3); 0.7556 (2.1); 0.7452 (2.0); 0.7393 (2.4); 0.7234 (0.8); 0.0494 (0.6); 0.0385 (19.1); 0.0278 (0.9)

I-087: $^1$H-NMR(300.2 MHz, CDCl3):

δ = 7.9885 (5.2); 7.5896 (1.3); 7.5673 (4.1); 7.5456 (0.4); 7.4894 (1.9); 7.4509 (0.8); 7.4423 (1.4); 7.4349 (0.8); 7.4201 (0.8); 7.4127 (0.4); 7.2990 (8.7); 7.2289 (2.1); 7.1343 (1.1); 7.1289 (1.0); 7.1070 (1.2); 7.1020 (1.2); 6.8063 (2.5); 6.7790 (2.1); 6.1439 (1.5); 4.7393 (0.6); 4.7250 (0.8); 4.7181 (0.8); 4.7142 (0.7); 4.7033 (0.7); 4.6331 (2.1); 4.6042 (4.0); 4.5747 (2.4); 4.3707 (0.9); 4.3590 (0.8); 4.3339 (1.0); 4.3219 (0.9); 4.1698 (0.5); 4.1460 (0.5); 4.1226 (0.3); 4.1011 (0.4); 3.7539 (1.4); 3.7284 (1.4); 3.7170 (1.3); 3.6916 (1.2); 3.2304 (0.3); 3.2073 (0.7); 3.1787 (1.2); 3.1683 (0.7); 3.1494 (0.7); 3.1386 (1.2); 3.1099 (0.6); 3.0867 (0.3); 2.7304 (16.0); 2.0821 (3.4); 1.6084 (2.3); 1.3202 (0.7); 1.2963 (1.5); 1.2725 (0.6); 0.9726 (0.6); 0.1075 (4.1); 0.0483 (0.4); 0.0373 (10.6); 0.0267 (0.4)

I-088: $^1$H-NMR(400.1 MHz, CDCl3):

δ = 8.7679 (3.6); 8.7592 (3.8); 7.6044 (0.5); 7.5847 (2.2); 7.5690 (6.7); 7.4657 (4.0); 7.4341 (2.1); 7.4293 (2.1); 7.4169 (1.7); 7.3367 (4.8); 7.3255 (5.0); 7.2639 (4.3); 7.2599 (4.5); 6.9715 (4.5); 6.8823 (1.8); 6.8631 (2.9); 6.8025 (3.4); 6.7835 (2.2); 5.2996 (0.5); 5.2958 (0.5); 4.6223 (3.1); 3.8036 (1.5); 3.7763 (2.0); 3.6596 (1.3); 3.6528 (1.3); 3.5978 (1.9); 3.5870 (1.4); 3.5704 (1.5); 3.5598 (1.2); 2.7710 (1.0); 2.7589 (1.1); 2.7363 (1.6); 2.7239 (1.6); 2.6000 (1.5); 2.5767 (1.5); 2.5666 (1.2); 2.5424 (1.1); 2.2787 (15.7); 2.1913 (16.0); 2.0922 (0.4); 1.6137 (0.8); 1.2585 (0.5); 0.0038 (4.2); −0.0002 (4.4)

I-089: $^1$H-NMR(300.2 MHz, CDCl3):

δ = 8.2317 (8.4); 7.2989 (10.4); 7.1428 (0.8); 7.1390 (0.8); 7.1162 (1.9); 7.1127 (2.0); 7.0896 (1.4); 7.0863 (1.6); 7.0318 (4.7); 7.0068 (4.3); 6.9938 (2.1); 6.9820 (1.0); 6.9761 (1.1); 6.9714 (2.2); 6.9345 (2.0); 6.9117 (3.0); 6.8689 (1.0); 6.8634 (1.0); 6.8422 (1.8); 6.8207 (0.9); 6.8154 (0.8); 6.7119 (1.6); 6.6870 (1.3); 6.2528 (4.9); 6.1934 (2.8); 5.6604 (3.2); 5.6232 (3.1); 5.3373 (0.8); 4.3082 (1.0); 4.2994 (1.4); 4.2740 (1.5); 4.2651 (1.2); 3.9212 (0.7); 3.9151 (0.8); 3.9049 (0.7); 3.8994 (0.8); 3.8931 (0.7); 3.8772 (2.9); 3.8574 (0.7); 3.8433 (2.0); 3.8227 (1.1); 3.0533 (0.9); 3.0380 (0.9); 3.0087 (1.4); 2.9921 (1.3); 2.8035 (1.2); 2.7729 (1.2); 2.7584 (1.1); 2.7276 (1.0); 2.3161 (16.0); 2.1821 (15.1); 2.1512 (0.7); 2.1401 (0.8); 2.1229 (1.4); 2.1055 (0.9); 2.0946 (0.8); 2.0775 (0.4); 1.6227 (0.9); 1.0957 (0.9); 1.0822 (1.9); 1.0758 (2.4); 1.0710 (1.5); 1.0677 (1.5); 1.0628 (1.5); 1.0537 (2.0); 1.0475 (2.3); 1.0345 (1.2); 0.8379 (1.2); 0.8309 (1.2); 0.8219 (2.6); 0.8147 (2.4); 0.8062 (2.7); 0.7991 (1.7); 0.7888 (0.9); 0.0492 (0.4); 0.0384 (13.1); 0.0275 (0.5)

I-090: $^1$H-NMR(499.9 MHz, CDCl3):

δ = 7.9242 (5.2); 7.5668 (0.5); 7.5513 (1.5); 7.5358 (2.5); 7.5319 (2.2); 7.5161 (0.5); 7.4530 (1.8); 7.4096 (0.8); 7.4060 (1.2); 7.4020 (0.8); 7.3910 (0.9); 7.2613 (6.0); 6.5759 (2.5); 5.9837 (1.4); 4.7968 (0.7); 4.7942 (0.7); 4.7883 (0.8); 4.7856 (0.8); 4.7809 (0.8); 4.7781 (0.8); 4.7722 (0.7); 4.7696 (0.7); 4.2757 (0.8); 4.2743 (0.9); 4.2673 (0.8); 4.2657 (0.9); 4.2537 (0.9);

TABLE 2-continued 4.2521 (1.0); 4.2451 (0.9); 4.2436 (0.9); 3.7076 (1.4); 3.6915 (1.4); 3.6855 (1.4); 3.6694 (1.3); 2.6872 (16.0); 2.3844 (11.4); 2.2880 (9.2); 2.0425 (1.3); 1.5864 (0.8); 1.2724 (0.4); 1.2581 (0.7); 1.2438 (0.3); −0.0002 (6.3)
I-091: $^{1}$H-NMR(499.9 MHz, CDCl3):
δ = 7.9085 (5.6); 7.5517 (0.6); 7.5361 (1.7); 7.5210 (3.1); 7.5021 (0.6); 7.4658 (1.9); 7.4195 (0.8); 7.4158 (1.3); 7.4117 (0.8); 7.4044 (0.6); 7.4009 (0.9); 7.3973 (0.6); 7.2655 (1.2); 6.8568 (2.2); 6.8499 (2.3); 6.6336 (1.5); 6.6314 (1.6); 6.6291 (1.2); 6.6267 (1.5); 6.6245 (1.5); 6.3102 (1.3); 5.2913 (3.7); 4.9634 (0.6); 4.9601 (0.7); 4.9555 (0.7); 4.9507 (0.9); 4.9461 (0.7); 4.9415 (0.7); 4.9382 (0.6); 4.3320 (1.0); 4.3254 (0.9); 4.3239 (1.0); 4.3111 (0.9); 4.3099 (1.1); 4.3033 (0.9); 4.3019 (1.0); 3.8426 (1.5); 3.8284 (1.5); 3.8205 (1.4); 3.8063 (1.4); 2.6695 (2.2); 2.6640 (16.0); 2.4647 (1.7); 2.4334 (8.8); 2.4316 (10.3); 2.4155 (0.4); 2.4135 (0.4); 2.0313 (0.5); −0.0002 (1.1)
I-092: $^{1}$H-NMR(499.9 MHz, CDCl3):
δ = 8.3438 (1.5); 8.3410 (1.7); 8.3345 (1.6); 8.3317 (1.7); 7.9737 (5.2); 7.9564 (1.6); 7.9536 (1.7); 7.9406 (1.6); 7.9378 (1.7); 7.4972 (3.0); 7.4869 (3.9); 7.3556 (2.0); 7.3143 (0.8); 7.3093 (0.8); 7.3052 (1.1); 7.3014 (1.0); 7.2962 (0.8); 7.2913 (0.6); 7.2654 (3.9); 7.2306 (4.6); 6.9768 (1.5); 6.9674 (1.6); 6.9610 (1.6); 6.9516 (1.5); 6.2094 (1.7); 5.0486 (0.7); 5.0458 (0.7); 5.0406 (0.8); 5.0375 (0.9); 5.0338 (0.9); 5.0306 (0.8); 5.0254 (0.8); 5.0225 (0.8); 4.3966 (1.0); 4.3885 (1.0); 4.3745 (1.1); 4.3664 (1.0); 4.1387 (1.1); 4.1244 (3.3); 4.1101 (3.4); 4.0959 (1.2); 4.0372 (1.4); 4.0219 (1.4); 4.0151 (1.3); 3.9998 (1.2); 3.8770 (0.3); 3.8474 (16.0); 2.7143 (0.5); 2.6950 (15.6); 2.6682 (0.3); 2.0403 (13.9); 1.6847 (1.3); 1.2707 (3.7); 1.2564 (7.3); 1.2421 (3.6); −0.0002 (3.6)
I-093: $^{1}$H-NMR(300.2 MHz, CDCl3):
δ = 7.9640 (5.3); 7.6306 (0.3); 7.6047 (1.3); 7.5814 (4.1); 7.5583 (0.4); 7.5255 (1.9); 7.4632 (0.8); 7.4553 (1.4); 7.4481 (0.8); 7.4423 (0.5); 7.4394 (0.5); 7.4325 (0.8); 7.4254 (0.5); 7.2989 (2.2); 6.9466 (0.4); 6.9313 (3.7); 6.9072 (3.7); 6.8921 (0.4); 6.3688 (1.0); 6.3588 (1.1); 4.0732 (0.9); 4.0620 (1.0); 4.0365 (1.4); 4.0252 (1.5); 3.9118 (1.2); 3.8980 (1.4); 3.8749 (0.8); 3.8612 (0.9); 3.6071 (0.4); 3.5922 (0.6); 3.5790 (0.8); 3.5657 (0.6); 3.5509 (0.4); 2.8386 (0.8); 2.8123 (1.4); 2.7853 (0.7); 2.6957 (16.0); 2.0252 (0.6); 2.0017 (0.7); 1.9746 (0.6); 1.9409 (0.3); 1.9232 (0.4); 1.9141 (0.7); 1.8964 (0.8); 1.8880 (0.4); 1.8690 (0.6); 1.8508 (0.3); 1.6872 (1.2); 1.2885 (0.5); 0.1067 (1.1); 0.0327 (2.2)
I-094: $^{1}$H-NMR(300.2 MHz, CDCl3):
δ = 7.9769 (5.0); 7.5949 (3.5); 7.5777 (2.7); 7.3439 (1.7); 7.3415 (1.7); 7.2983 (10.5); 7.2791 (0.7); 7.2715 (0.8); 7.2606 (1.0); 7.2543 (0.9); 7.2490 (0.6); 7.2408 (0.5); 7.0949 (2.4); 7.0684 (3.8); 6.9821 (3.3); 6.9559 (2.1); 6.1624 (1.2); 4.3289 (0.8); 4.3176 (0.9); 4.2933 (1.0); 4.2819 (1.0); 3.9204 (0.4); 3.9088 (0.5); 3.9045 (0.5); 3.8983 (0.5); 3.8932 (0.5); 3.8872 (0.6); 3.8810 (0.4); 3.8761 (0.4); 3.8711 (0.4); 3.8299 (1.7); 3.8082 (0.9); 3.7944 (1.4); 3.7726 (0.9); 3.0386 (0.7); 3.0236 (0.7); 2.9939 (0.9); 2.9789 (0.8); 2.7145 (0.3); 2.7045 (1.2); 2.6770 (16.0); 2.6599 (1.0); 2.6269 (0.8); 2.2320 (10.4); 2.0445 (0.7); 1.6121 (0.4); 1.2935 (0.4); 0.0483 (0.4); 0.0375 (12.4); 0.0282 (0.4); 0.0266 (0.4)
I-095: $^{1}$H-NMR(499.9 MHz, CDCl3):
δ = 7.9642 (5.3); 7.7837 (0.6); 7.7707 (0.6); 7.7654 (1.2); 7.7525 (1.2); 7.7473 (0.7); 7.7343 (0.6); 7.5635 (0.4); 7.5480 (1.4); 7.5321 (3.5); 7.5191 (0.5); 7.5162 (0.5); 7.4751 (2.0); 7.4380 (0.4); 7.4196 (0.9); 7.4157 (1.5); 7.4117 (0.9); 7.4012 (1.0); 7.2632 (3.2); 7.1944 (1.9); 6.9462 (0.5); 6.9415 (0.6); 6.9299 (0.8); 6.9278 (1.0); 6.9134 (0.5); 6.9088 (0.6); 6.8344 (0.7); 6.8294 (0.7); 6.8173 (0.7); 6.8100 (1.0); 6.8047 (0.7); 6.7927 (0.7); 6.7876 (0.7); 5.2975 (1.5); 3.5148 (3.4); 2.6879 (16.0); 2.6071 (1.3); 2.0381 (0.5); 1.6754 (2.2); 1.6156 (2.1); 1.3315 (11.1); 1.2691 (0.3); 1.2546 (0.8); 1.2479 (6.0); 1.2424 (6.3); 0.0725 (0.6); −0.0002 (3.6)
I-096: $^{1}$H-NMR(499.9 MHz, CDCl3):
δ = 8.0252 (5.0); 7.9715 (1.2); 7.7436 (0.4); 7.5661 (0.4); 7.5534 (0.4); 7.5458 (0.6); 7.5380 (1.7); 7.5243 (4.5); 7.4259 (2.6); 7.4222 (2.7); 7.4059 (2.3); 7.3889 (2.9); 7.3798 (2.8); 7.3756 (3.3); 7.3682 (0.9); 7.3623 (1.0); 7.3575 (1.7); 7.3537 (1.6); 7.3439 (1.1); 7.3374 (1.2); 7.2619 (7.7); 7.2577 (2.2); 7.2494 (0.7); 7.2448 (1.7); 7.2404 (1.4); 7.2327 (0.4); 7.2286 (0.4); 6.5471 (1.1); 6.5374 (1.2); 6.1503 (0.4); 5.2979 (2.6); 5.2719 (1.2); 5.2659 (1.4); 5.2620 (1.4); 5.2560 (1.3); 4.9665 (0.3); 4.9603 (0.3); 4.9557 (0.3); 4.1244 (0.7); 4.1101 (0.7); 3.9345 (0.6); 3.9279 (1.1); 3.9215 (0.7); 3.9158 (0.8); 3.9092 (1.1); 3.9026 (0.7); 3.4398 (0.9); 2.6840 (16.0); 2.6409 (0.4); 2.0405 (3.6); 2.0012 (0.4); 1.6225 (0.4); 1.6166 (0.3); 1.6074 (0.5); 1.5862 (1.7); 1.5786 (1.5); 1.5710 (1.0); 1.5635 (0.9); 1.5561 (0.8); 1.5496 (0.8); 1.5422 (0.7); 1.5347 (0.6); 1.5275 (0.6); 1.2710 (1.1); 1.2566 (2.7); 1.2424 (1.0); 1.1931 (0.4); 1.1783 (0.6); 1.1742 (0.5); 1.1642 (0.6); 1.1596 (0.6); 1.1495 (0.5); 1.1456 (0.6); 1.1355 (0.3); 1.1308 (0.4); 1.0793 (0.9); 1.0611 (3.9); 1.0463 (6.5); 1.0316 (2.6); 0.9793 (0.4); 0.9594 (0.4); 0.9446 (0.6); 0.9346 (0.4); 0.9299 (0.4); 0.0710 (3.4); −0.0002 (5.8)
I-097: $^{1}$H-NMR(499.9 MHz, CDCl3):
δ = 8.7031 (2.8); 8.7014 (2.9); 8.4501 (2.3); 8.4453 (2.5); 8.1332 (8.2); 7.6000 (2.4); 7.2619 (4.0); 6.9540 (2.5); 6.9388 (2.9); 6.8914 (4.5); 6.7801 (3.1); 6.7059 (1.6); 6.6909 (1.5); 6.6689 (1.6); 5.9697 (2.0); 4.3061 (1.3); 4.2996 (1.4); 4.2844 (1.4); 4.2779 (1.5); 3.9034 (0.6); 3.8996 (0.6); 3.8955 (0.8); 3.8899 (0.7); 3.8834 (0.9); 3.8796 (0.7); 3.8760 (0.6); 3.8737 (0.6); 3.8634 (0.4); 3.8230 (2.0); 3.8104 (1.4); 3.8013 (1.8); 3.7887 (1.4); 3.0207 (1.1); 3.0113 (1.1); 2.9932 (1.3); 2.9838 (1.3); 2.7030 (1.4); 2.6827 (1.4); 2.6756 (1.3); 2.6552 (1.2); 2.3239 (0.3); 2.2999 (0.4); 2.2670 (16.0); 2.1593 (14.9); 2.0014 (1.5); 1.6105 (2.1); −0.0002 (4.5)
I-098: $^{1}$H-NMR(300.2 MHz, CDCl3):
δ = 8.4063 (8.2); 7.3548 (1.6); 7.3285 (3.5); 7.2989 (13.9); 7.0134 (3.5); 6.9876 (3.8); 6.9345 (2.9); 6.8785 (1.3); 6.8758 (1.4); 6.8706 (1.7); 6.8680 (1.7); 6.8517 (1.1); 6.8490 (1.2); 6.8439 (1.6); 6.8412 (1.5); 6.8076 (2.3); 6.8013 (3.1); 6.7947 (1.8); 6.7207 (1.6); 6.6960 (1.3); 6.2671 (2.0); 5.5662 (3.6); 5.5585 (3.7); 5.3375 (15.9); 4.4268 (3.1); 4.4191 (3.2); 4.2866 (0.8); 4.2778 (1.4); 4.2528 (1.6); 4.2447 (1.1); 4.0329 (1.5); 4.0096 (4.7); 3.9863 (4.7); 3.9631 (1.5); 3.8984 (0.6); 3.8927 (0.8); 3.8841 (0.7); 3.8771 (0.9); 3.8642 (2.4); 3.8448 (0.6); 3.8309 (2.0); 3.8104 (1.1); 3.0389 (0.8); 3.0239 (0.8); 2.9940 (1.4); 2.9779 (1.3); 2.7803 (1.1); 2.7492 (1.1); 2.7349 (1.1); 2.7109 (0.5); 2.7038 (0.9); 2.6669 (0.3); 2.3352 (0.4); 2.3060 (16.0); 2.2580 (0.4); 2.2298 (14.9); 1.9888 (0.4); 1.9720 (0.7); 1.9608 (0.8); 1.9441 (1.5); 1.9274 (0.9); 1.9161 (0.9); 1.8993 (0.5); 1.6006 (13.8); 1.4882 (5.2); 1.4650 (10.9); 1.4417 (5.1); 1.4090 (0.4); 1.3848 (0.3); 1.3610 (0.6); 1.3335 (0.4); 1.3071 (0.6); 1.2980 (0.5); 1.0584 (1.0); 1.0431 (2.5); 1.0364 (2.8); 1.0309 (1.5); 1.0217 (1.5); 1.0148 (2.8); 1.0082 (2.5); 0.9938 (1.3); 0.9855 (0.7); 0.9611 (1.3); 0.9427 (0.4); 0.9367 (0.7); 0.9203 (0.5); 0.7723 (1.3); 0.7571 (3.2); 0.7511 (2.9); 0.7408 (2.7); 0.7348 (3.4); 0.7188 (1.0); 0.1085 (0.5); 0.0494 (0.4); 0.0384 (15.6); 0.0274 (0.6)
I-099: $^{1}$H-NMR(499.9 MHz, CDCl3):
δ = 7.9843 (2.1); 7.9094 (3.3); 7.5519 (1.0); 7.5365 (1.7); 7.5329 (1.5); 7.5171 (0.4); 7.4655 (1.2); 7.4058 (0.5); 7.4023 (0.8); 7.3985 (0.5); 7.3873 (0.6); 7.2708 (1.8); 6.8574 (1.3); 6.8499 (1.7); 6.8024 (2.3); 6.7948 (1.8); 6.5050 (0.8); 4.9677 (0.4); 4.9614 (0.6); 4.9559 (0.8); 4.9505 (0.6); 4.9441 (0.4); 4.2840 (0.7); 4.2766 (0.7); 4.2618 (0.8); 4.2545 (0.7); 3.9547 (0.9); 3.9432 (0.9); 3.9326 (0.8); 3.9210 (0.8); 2.9450 (16.0); 2.8643 (14.1); 2.6741 (10.1); 1.7417 (1.6); −0.0002 (2.3)
I-100: $^{1}$H-NMR(499.9 MHz, CDCl3):
δ = 8.0006 (2.0); 7.9130 (3.1); 7.5652 (0.3); 7.5497 (0.9); 7.5339 (1.3); 7.5286 (1.2); 7.5129 (0.3); 7.4751 (1.1); 7.4264 (0.5); 7.4230 (0.7); 7.4193 (0.5); 7.4079 (0.5); 7.2735 (1.7); 6.3133 (0.8); 6.2066 (1.3); 6.2003 (1.3); 5.9351 (0.9); 5.9333 (1.0); 5.9315 (0.8); 5.9290 (0.9); 5.9272 (0.8); 4.8087 (0.4); 4.8046 (0.4); 4.8009 (0.4); 4.7959 (0.6); 4.7908 (0.4); 4.7871 (0.4); 4.7830 (0.3); 4.3383 (0.6); 4.3302 (0.6); 4.3164 (0.7); 4.3085 (0.6); 3.9721 (0.9); 3.9581 (0.9); 3.9502 (0.8); 3.9362 (0.8); 2.9506 (16.0); 2.8734 (13.8); 2.7409 (0.4); 2.6721 (9.7); 2.2084 (6.3); −0.0002 (2.2)

TABLE 2-continued

I-101: $^{1}$H-NMR(300.2 MHz, CDCl3):
δ = 8.0518 (2.0); 7.9603 (1.7); 7.5885 (0.6); 7.5655 (1.5); 7.5432 (0.4); 7.4724 (0.7); 7.4506 (0.4); 7.4416 (0.5); 7.4338 (0.3); 7.4200 (0.3); 7.2985 (13.4); 5.9276 (0.4); 5.8869 (0.9); 4.2664 (0.3); 4.2520 (0.3); 3.7468 (0.5); 3.7197 (0.4); 3.7103 (0.4); 3.6829 (0.4); 2.9931 (16.0); 2.9195 (14.4); 2.7836 (0.6); 2.7352 (0.5); 2.7184 (5.4); 2.6870 (0.4); 2.6780 (0.5); 2.6686 (0.5); 2.5486 (0.4); 2.5413 (0.3); 2.5078 (0.7); 2.4517 (0.3); 2.3490 (0.6); 2.3111 (0.6); 2.2906 (4.1); 2.2100 (3.4); 2.1955 (0.7); 2.1118 (1.0); 2.0652 (1.1); 1.8253 (0.9); 1.6586 (1.2); 1.2893 (0.8); 0.0353 (15.3)
I-102: $^{1}$H-NMR(499.9 MHz, CDCl3):
δ = 8.0114 (2.1); 7.9275 (3.6); 7.5675 (0.4); 7.5520 (1.1); 7.5363 (1.8); 7.5321 (1.6); 7.5164 (0.4); 7.4734 (1.5); 7.4334 (0.6); 7.4299 (0.9); 7.4262 (0.6); 7.4149 (0.7); 7.2639 (6.2); 6.2298 (0.9); 6.0954 (2.6); 4.7636 (0.4); 4.7598 (0.5); 4.7558 (0.5); 4.7507 (0.7); 4.7458 (0.5); 4.7417 (0.5); 4.7378 (0.4); 4.3296 (0.7); 4.3215 (0.7); 4.3077 (0.8); 4.2997 (0.8); 3.9367 (1.0); 3.9224 (1.0); 3.9148 (1.0); 3.9006 (0.9); 2.9545 (16.0); 2.8805 (14.2); 2.6762 (11.3); 2.1101 (7.1); 1.8848 (7.1); 1.6447 (1.0); −0.0002 (6.1); −0.0065 (0.4)
I-103: $^{1}$H-NMR(499.9 MHz, CDCl3):
δ =7.9928 (2.2); 7.9231 (0.6); 7.9055 (2.8); 7.5731 (0.4); 7.5576 (1.1); 7.5416 (1.4); 7.5353 (1.6); 7.5196 (0.4); 7.4683 (1.3); 7.3982 (0.8); 7.3829 (0.6); 7.2670 (2.8); 6.7808 (2.7); 6.1278 (0.8); 4.8065 (0.4); 4.8032 (0.5); 4.7984 (0.5); 4.7947 (0.5); 4.7926 (0.6); 4.7887 (0.5); 4.7838 (0.4); 4.7805 (0.4); 4.2503 (0.6); 4.2418 (0.6); 4.2281 (0.7); 4.2197 (0.6); 3.7546 (0.8); 3.7399 (0.8); 3.7323 (0.7); 3.7177 (0.7); 2.9485 (16.0); 2.8703 (14.4); 2.6847 (9.1); 2.6795 (2.2); 2.3849 (8.9); 2.3416 (1.0); 2.3131 (0.6); 2.3113 (0.6); 2.1183 (0.8); 1.6763 (1.3); −0.0002 (3.5)
I-104: $^{1}$H-NMR(499.9 MHz, CDCl3):
δ = 8.0138 (2.1); 7.9777 (2.7); 7.5406 (1.3); 7.5236 (1.4); 7.5044 (1.1); 7.4988 (1.0); 7.4941 (2.0); 7.4926 (2.0); 7.3464 (1.1); 7.3267 (0.5); 7.3191 (0.8); 7.3146 (2.0); 7.3110 (1.7); 7.3039 (0.3); 7.2612 (9.2); 7.0707 (2.5); 7.0061 (0.9); 7.0026 (0.8); 6.9891 (0.8); 6.9856 (0.8); 6.1904 (0.9); 5.0544 (0.4); 5.0518 (0.4); 5.0462 (0.4); 5.0434 (0.4); 5.0391 (0.4); 5.0363 (0.4); 5.0307 (0.4); 4.4016 (0.5); 4.3939 (0.5); 4.3795 (0.6); 4.3718 (0.5); 4.0100 (0.7); 3.9944 (0.7); 3.9880 (0.7); 3.9724 (0.6); 3.7086 (8.5); 2.9538 (16.0); 2.8809 (14.3); 2.6967 (8.2); 2.0046 (0.4); 1.5842 (0.9); −0.0002 (11.7); −0.0067 (0.4)
I-105: $^{1}$H-NMR(499.9 MHz, CDCl3):
δ = 7.9551 (2.2); 7.8911 (3.9); 7.8852 (0.4); 7.5504 (0.3); 7.5349 (1.1); 7.5192 (1.8); 7.5143 (1.6); 7.4988 (0.5); 7.4653 (1.5); 7.4106 (0.6); 7.4074 (0.9); 7.4036 (0.6); 7.3923 (0.7); 7.2983 (1.2); 7.2963 (1.2); 7.2882 (1.3); 7.2861 (1.3); 7.2821 (1.1); 7.0850 (1.2); 7.0783 (1.4); 7.0052 (1.3); 6.9981 (1.2); 6.9951 (1.3); 6.9880 (1.1); 6.5474 (1.0); 5.0768 (0.4); 5.0728 (0.5); 5.0692 (0.6); 5.0644 (0.8); 5.0597 (0.6); 5.0560 (0.6); 5.0521 (0.5); 4.3399 (0.7); 4.3325 (0.7); 4.3180 (0.8); 4.3104 (0.8); 3.9075 (1.1); 3.8941 (1.1); 3.8854 (1.0); 3.8721 (1.0); 2.9336 (16.0); 2.8490 (14.1); 2.6633 (11.8); 1.9319 (0.6); −0.0002 (0.9)
I-106: $^{1}$H-NMR(499.9 MHz, CDCl3):
δ = 7.9425 (2.5); 7.9175 (2.8); 7.8837 (1.0); 7.8690 (1.0); 7.8194 (0.9); 7.8048 (0.9); 7.5284 (0.3); 7.5125 (1.1); 7.4992 (2.4); 7.4462 (2.4); 7.4203 (1.3); 7.3888 (0.4); 7.3766 (1.0); 7.3747 (0.9); 7.3668 (0.7); 7.3617 (1.8); 7.3593 (1.7); 7.3483 (0.8); 7.3441 (1.2); 7.3295 (0.4); 7.3276 (0.4); 7.2753 (0.8); 6.6147 (0.9); 5.2321 (0.4); 5.2251 (0.5); 5.2203 (0.6); 5.2155 (0.4); 5.2086 (0.4); 4.4403 (0.6); 4.4327 (0.6); 4.4182 (0.6); 4.4106 (0.6); 4.0454 (0.7); 4.0319 (0.7); 4.0232 (0.7); 4.0098 (0.6); 2.9171 (16.0); 2.8365 (14.6); 2.6734 (8.2); 2.6673 (1.0); 1.8968 (0.7); −0.0002 (0.9)
I-107: $^{1}$H-NMR(499.9 MHz, CDCl3):
δ = 7.9528 (2.2); 7.8657 (3.8); 7.5613 (0.4); 7.5458 (1.2); 7.5302 (1.5); 7.5240 (1.5); 7.5083 (0.4); 7.4729 (1.4); 7.4129 (0.6); 7.4096 (0.9); 7.4059 (0.6); 7.3943 (0.7); 7.2837 (0.9); 6.7581 (3.0); 6.5827 (0.9); 4.9035 (0.5); 4.8971 (0.6); 4.8917 (0.9); 4.8863 (0.6); 4.8797 (0.4); 4.2536 (0.8); 4.2460 (0.8); 4.2314 (0.9); 4.2240 (0.8); 3.9114 (1.0); 3.8995 (1.0); 3.8892 (0.9); 3.8774 (0.9); 2.9344 (16.0); 2.8463 (14.0); 2.6601 (11.3); 2.1094 (11.4); 1.9315 (0.6); −0.0002 (1.0)
I-108: $^{1}$H-NMR(300.2 MHz, CDCl3):
δ = 7.5460 (0.6); 7.5190 (2.1); 7.5101 (1.8); 7.5055 (2.0); 7.4999 (5.2); 7.4967 (4.9); 7.4846 (0.4); 7.4803 (0.4); 7.4611 (0.4); 7.3585 (8.3); 7.2987 (7.9); 7.2754 (2.5); 7.2277 (1.0); 7.2172 (1.6); 7.2101 (1.3); 7.1970 (1.1); 7.1896 (0.7); 6.9996 (2.4); 6.9741 (2.9); 6.9321 (2.9); 6.7551 (1.6); 6.7302 (1.4); 6.1424 (2.0); 5.3361 (1.4); 4.2728 (1.0); 4.2629 (1.3); 4.2378 (1.4); 4.2286 (1.3); 3.9024 (0.5); 3.8861 (0.7); 3.8754 (0.7); 3.8698 (0.8); 3.8629 (0.6); 3.8537 (0.7); 3.8380 (2.6); 3.8171 (0.9); 3.8033 (1.8); 3.7824 (1.2); 3.5514 (2.7); 3.5292 (7.3); 3.5073 (2.9); 3.0120 (0.9); 2.9973 (0.9); 2.9667 (1.4); 2.9512 (1.2); 2.7551 (1.4); 2.7236 (1.3); 2.7099 (1.1); 2.6777 (1.0); 2.3167 (0.3); 2.2903 (16.0); 2.2125 (14.5); 2.1097 (0.5); 2.0959 (0.4); 2.0757 (3.0); 2.0634 (3.2); 2.0536 (8.1); 2.0435 (3.3); 2.0313 (2.9); 2.0110 (0.4); 1.2923 (0.8); 0.0372 (8.8); 0.0262 (0.4)
I-109: $^{1}$H-NMR(300.2 MHz, CDCl3):
δ = 8.2328 (8.0); 7.3549 (1.6); 7.3286 (3.4); 7.2986 (15.5); 7.0324 (2.0); 7.0240 (2.2); 7.0076 (2.9); 6.9959 (3.7); 6.9823 (3.3); 6.9734 (2.5); 6.9363 (4.7); 6.8715 (1.4); 6.8688 (1.5); 6.8637 (1.8); 6.8611 (1.7); 6.8448 (1.2); 6.8419 (1.2); 6.8370 (1.7); 6.8342 (1.6); 6.8058 (2.4); 6.7996 (3.1); 6.7929 (1.8); 6.7139 (1.6); 6.6893 (1.4); 6.3269 (1.8); 6.2412 (3.1); 6.1822 (2.7); 5.6520 (3.0); 5.6146 (2.8); 5.3374 (5.3); 4.2908 (0.9); 4.2824 (1.4); 4.2566 (1.5); 4.2479 (1.2); 4.1719 (0.5); 4.1481 (0.5); 3.8977 (0.7); 3.8916 (0.8); 3.8824 (0.8); 3.8765 (0.9); 3.8693 (0.8); 3.8569 (2.6); 3.8374 (0.8); 3.8234 (2.0); 3.8026 (1.2); 3.0411 (0.9); 3.0263 (0.9); 2.9965 (1.4); 2.9803 (1.3); 2.7721 (1.2); 2.7411 (1.2); 2.7268 (1.2); 2.6957 (1.0); 2.6796 (1.0); 2.4362 (0.4); 2.3052 (16.0); 2.2278 (15.0); 2.0841 (2.3); 1.9912 (0.4); 1.9745 (0.8); 1.9633 (0.9); 1.9466 (1.6); 1.9299 (1.0); 1.9187 (1.0); 1.9018 (0.6); 1.6416 (0.6); 1.3216 (0.6); 1.2978 (1.1); 1.2741 (0.5); 1.0609 (1.0); 1.0458 (2.5); 1.0391 (2.9); 1.0243 (1.6); 1.0175 (2.9); 1.0108 (2.6); 0.9965 (1.4); 0.9739 (0.4); 0.7742 (1.3); 0.7592 (3.2); 0.7530 (3.0); 0.7428 (2.9); 0.7370 (3.4); 0.7209 (1.2); 0.0491 (0.4); 0.0382 (18.8); 0.0274 (0.9)
I-110: $^{1}$H-NMR(300.2 MHz, CDCl3):
δ = 7.9707 (7.8); 7.2989 (14.6); 7.1322 (0.8); 7.1284 (0.8); 7.1055 (2.0); 7.1019 (2.0); 7.0789 (1.4); 7.0757 (1.6); 7.0300 (2.8); 7.0202 (1.7); 7.0038 (3.6); 6.9754 (0.9); 6.9698 (0.8); 6.9100 (2.9); 6.8525 (1.0); 6.8473 (1.0); 6.8262 (1.7); 6.8044 (0.9); 6.7994 (0.8); 6.7105 (1.6); 6.6864 (1.4); 6.2729 (1.9); 4.2946 (1.0); 4.2859 (1.4); 4.2601 (1.5); 4.2513 (1.3); 4.1712 (0.4); 4.1474 (0.4); 3.9054 (0.8); 3.8898 (0.8); 3.8744 (0.9); 3.8652 (2.8); 3.8447 (0.8); 3.8309 (1.9); 3.8102 (1.2); 3.0455 (0.9); 3.0300 (1.0); 3.0135 (1.8); 3.0011 (1.6); 2.9881 (5.9); 2.9628 (5.4); 2.9375 (1.8); 2.7975 (1.3); 2.7671 (1.2); 2.7524 (1.1); 2.7216 (1.0); 2.3126 (16.0); 2.1812 (15.0); 2.1495 (0.8); 2.1382 (0.8); 2.1213 (1.4); 2.1038 (0.9); 2.0933 (0.8); 2.0845 (2.2); 2.0764 (0.4); 1.6160 (1.6); 1.3936 (6.1); 1.3684 (12.8); 1.3430 (5.9); 1.3213 (0.7); 1.2974 (1.6); 1.2910 (1.5); 1.2737 (0.7); 1.0909 (1.0); 1.0777 (1.9); 1.0710 (2.5); 1.0662 (1.6); 1.0627 (1.5); 1.0581 (1.5); 1.0488 (2.0); 1.0427 (2.3); 1.0299 (1.2); 0.8858 (0.3); 0.8682 (0.3); 0.8326 (1.2); 0.8262 (1.2); 0.8170 (2.6); 0.8096 (2.4); 0.8013 (2.7); 0.7941 (1.7); 0.7841 (0.9); 0.1074 (7.4); 0.0478 (0.6); 0.0370 (17.2); 0.0261 (0.7)
I-111: $^{1}$H-NMR(300.2 MHz, CDCl3):
δ = 7.9690 (7.4); 7.3430 (1.6); 7.3167 (3.5); 7.2989 (15.7); 7.2907 (2.4); 7.0046 (4.3); 6.9792 (4.6); 6.9317 (3.1); 6.8589 (1.5); 6.8537 (1.7); 6.8321 (1.2); 6.8270 (1.7); 6.7986 (2.4); 6.7926 (3.1); 6.7859 (1.8); 6.7142 (1.7); 6.6902 (1.4); 6.3377 (1.8); 4.2747 (1.0); 4.2663 (1.4); 4.2407 (1.5); 4.2320 (1.2); 4.1952 (0.5); 4.1713 (1.4); 4.1475 (1.4); 4.1238 (0.6); 3.8807 (0.8); 3.8646 (0.9); 3.8581 (0.8); 3.8437 (2.8); 3.8238 (0.8); 3.8100 (2.0); 3.7892 (1.2); 3.0316 (1.0); 3.0105 (1.9); 2.9851 (6.1); 2.9708 (1.6); 2.9596 (5.2); 2.9343 (1.8); 2.7647 (1.2); 2.7340 (1.3); 2.7193 (1.2); 2.6885 (1.0); 2.6788 (1.1); 2.4322 (0.4); 2.3373 (0.4); 2.3260 (0.6); 2.3013 (16.0); 2.2281 (14.9); 2.1814 (0.4); 2.0846 (6.9); 1.9851 (0.4); 1.9682 (0.8); 1.9569 (0.9); 1.9403 (1.6); 1.9235 (1.0); 1.9122 (0.9); 1.8957 (0.5); 1.6343 (2.0); 1.3890 (5.7); 1.3637 (11.9); 1.3383 (5.4); 1.3215 (1.8); 1.2977 (3.5); 1.2738 (1.7); 1.0545 (1.0); 1.0393 (2.6); 1.0327 (2.9); 1.0179 (1.6); 1.0110 (2.9); 1.0046 (2.6); 0.9901 (1.4);

TABLE 2-continued 0.9731 (0.5); 0.9675 (0.4); 0.7704 (1.4); 0.7553 (3.3); 0.7492 (3.0); 0.7390 (2.9); 0.7331 (3.4); 0.7171 (1.1); 0.1072 (0.6); 0.0480 (0.6); 0.0372 (18.4); 0.0263 (0.9)

I-112: $^{1}$H-NMR(300.2 MHz, CDCl3):
δ = 8.4109 (8.4); 7.2988 (15.2); 7.1415 (0.8); 7.1377 (0.8); 7.1149 (1.9); 7.1113 (2.0); 7.0883 (1.4); 7.0850 (1.6); 7.0367 (3.3); 7.0102 (4.6); 6.9877 (0.9); 6.9821 (0.8); 6.9140 (2.9); 6.8618 (1.0); 6.8563 (1.1); 6.8353 (1.7); 6.8136 (0.9); 6.8085 (0.8); 6.7188 (1.6); 6.6936 (1.3); 6.1933 (1.9); 5.5710 (3.6); 5.5631 (3.7); 4.4338 (3.2); 4.4259 (3.2); 4.3053 (0.8); 4.2963 (1.4); 4.2710 (1.6); 4.2628 (1.1); 4.0330 (1.5); 4.0097 (4.7); 3.9863 (4.7); 3.9632 (1.5); 3.9330 (0.5); 3.9155 (0.8); 3.8995 (0.8); 3.8855 (2.5); 3.8659 (0.6); 3.8518 (2.0); 3.8313 (1.1); 3.0509 (0.8); 3.0346 (0.8); 3.0058 (1.4); 2.9892 (1.3); 2.8108 (1.1); 2.7798 (1.1); 2.7654 (1.1); 2.7346 (0.9); 2.3397 (0.4); 2.3162 (16.0); 2.2957 (0.6); 2.1850 (14.9); 2.1665 (0.5); 2.1486 (0.7); 2.1376 (0.8); 2.1202 (1.4); 2.1033 (0.9); 2.0919 (0.8); 2.0844 (0.4); 2.0748 (0.4); 1.5989 (14.1); 1.4881 (5.2); 1.4649 (11.1); 1.4416 (5.1); 1.4096 (0.5); 1.3838 (0.4); 1.3608 (0.7); 1.3336 (0.5); 1.3075 (0.4); 1.0933 (0.9); 1.0799 (1.8); 1.0733 (2.4); 1.0688 (1.5); 1.0653 (1.4); 1.0603 (1.5); 1.0513 (2.0); 1.0450 (2.3); 1.0319 (1.2); 0.9850 (0.9); 0.9609 (1.6); 0.9366 (0.7); 0.8337 (1.2); 0.8267 (1.1); 0.8176 (2.5); 0.8103 (2.3); 0.8022 (2.6); 0.7949 (1.6); 0.7845 (0.9); 0.1082 (0.5); 0.0489 (0.5); 0.0381 (18.6); 0.0271 (0.7)

I-113: $^{1}$H-NMR(499.9 MHz, CDCl3):
δ = 8.0980 (8.5); 7.4563 (1.0); 7.4535 (1.0); 7.4405 (1.8); 7.4273 (1.0); 7.4246 (0.9); 7.2591 (8.8); 7.1851 (1.1); 7.1834 (1.1); 7.1690 (2.2); 7.1675 (2.2); 7.1531 (1.2); 7.1515 (1.2); 7.0769 (1.2); 7.0739 (1.2); 7.0601 (1.7); 7.0466 (0.9); 7.0435 (0.8); 6.9590 (2.7); 6.9438 (2.9); 6.8505 (3.1); 6.8326 (1.6); 6.8196 (1.6); 6.7972 (1.5); 6.6448 (1.7); 6.6298 (1.4); 6.1193 (1.9); 5.8860 (2.7); 5.8848 (2.7); 5.8506 (2.5); 5.8493 (2.4); 5.4687 (2.7); 5.4678 (2.6); 5.4463 (2.5); 5.4452 (2.5); 4.2751 (1.4); 4.2690 (1.4); 4.2537 (1.5); 4.2474 (1.4); 3.8901 (0.3); 3.8778 (0.7); 3.8735 (0.8); 3.8701 (0.9); 3.8674 (0.9); 3.8639 (0.8); 3.8603 (0.9); 3.8576 (0.9); 3.8543 (0.8); 3.8512 (0.7); 3.8480 (0.7); 3.8442 (0.5); 3.8378 (0.4); 3.8136 (2.3); 3.8011 (1.5); 3.7921 (1.9); 3.7795 (1.4); 2.9984 (1.2); 2.9885 (1.2); 2.9711 (1.4); 2.9612 (1.3); 2.7187 (1.5); 2.6991 (1.5); 2.6915 (1.3); 2.6718 (1.2); 2.2619 (16.0); 2.1331 (0.5); 2.1129 (15.0); 1.5587 (3.1); 0.0061 (0.6); −0.0002 (8.5); −0.0067 (0.4)

I-114: $^{1}$H-NMR(499.9 MHz, CDCl3):
δ = 7.9145 (5.4); 7.5379 (0.8); 7.5223 (4.5); 7.5096 (6.6); 7.4865 (3.0); 7.3952 (3.2); 7.3860 (1.8); 7.3799 (3.0); 7.2938 (1.2); 7.2925 (1.2); 7.2781 (2.1); 7.2633 (1.5); 7.2609 (1.5); 7.2582 (1.6); 7.2371 (1.7); 7.2221 (2.3); 7.2075 (1.0); 6.7082 (4.5); 6.5376 (2.0); 6.5349 (2.0); 4.9913 (0.9); 4.9847 (1.5); 4.9800 (1.6); 4.9752 (1.5); 4.9685 (0.8); 4.3520 (1.3); 4.3446 (1.3); 4.3299 (1.7); 4.3225 (1.6); 4.2144 (1.7); 4.2033 (1.6); 4.1923 (1.3); 4.1813 (1.2); 2.7219 (0.3); 2.6557 (16.0); 1.9701 (1.7); 1.6965 (0.4); −0.0002 (1.0)

I-115: $^{1}$H-NMR(499.9 MHz, CDCl3):
δ = 7.9253 (5.4); 7.5498 (0.5); 7.5344 (1.6); 7.5191 (3.0); 7.5157 (2.4); 7.4999 (0.6); 7.4683 (2.0); 7.4111 (1.0); 7.4074 (1.4); 7.4035 (0.9); 7.3926 (1.0); 7.2649 (1.0); 7.1959 (2.4); 7.1857 (2.4); 6.8454 (2.7); 6.8353 (2.5); 6.3374 (1.5); 5.1064 (0.8); 5.1039 (0.9); 5.0983 (0.9); 5.0956 (0.9); 5.0913 (0.9); 5.0886 (0.9); 5.0831 (0.8); 5.0806 (0.7); 4.3492 (1.0); 4.3475 (1.0); 4.3411 (1.0); 4.3393 (0.9); 4.3271 (1.0); 4.3254 (1.0); 4.3190 (1.0); 4.3173 (0.9); 3.7962 (1.5); 3.7809 (1.6); 3.7741 (1.4); 3.7588 (1.4); 2.6671 (16.0); 2.2617 (15.2); 1.9859 (1.2); 1.7375 (0.6); −0.0002 (0.9)

I-116: $^{1}$H-NMR(499.9 MHz, CDCl3):
δ = 7.9413 (5.1); 7.5600 (0.5); 7.5445 (1.7); 7.5290 (3.4); 7.5112 (0.6); 7.4652 (2.4); 7.4106 (1.4); 7.3959 (1.1); 7.2614 (3.3); 6.8922 (3.2); 6.8609 (2.7); 6.3099 (1.6); 5.0027 (0.7); 4.9999 (0.8); 4.9950 (0.8); 4.9905 (1.1); 4.9860 (0.8); 4.9811 (0.8); 4.9783 (0.7); 4.3637 (1.1); 4.3559 (1.1); 4.3417 (1.2); 4.3338 (1.2); 3.8607 (1.4); 3.8466 (1.4); 3.8387 (1.4); 3.8245 (1.3); 2.6793 (16.0); 2.4379 (0.3); 2.2698 (0.8); 2.2071 (11.7); 1.6064 (1.7); −0.0002 (3.2)

I-117: $^{1}$H-NMR(300.2 MHz, CDCl3):
δ = 8.2689 (15.3); 8.0219 (1.4); 7.6190 (1.0); 7.6081 (9.3); 7.6048 (9.8); 7.5973 (4.2); 7.5927 (4.5); 7.5869 (5.3); 7.5560 (1.1); 7.5376 (1.2); 7.5140 (0.5); 7.4890 (0.8); 7.4378 (0.6); 7.3955 (0.4); 7.3889 (0.6); 7.3814 (0.6); 7.3551 (2.8); 7.2989 (6.2); 7.2631 (1.7); 7.0214 (2.2); 6.9969 (2.4); 6.9049 (3.3); 6.7155 (1.1); 3.7959 (1.2); 3.7818 (1.6); 3.7658 (2.4); 3.7508 (2.8); 3.7358 (2.5); 3.7212 (1.6); 3.7052 (0.9); 3.6402 (1.0); 3.6014 (1.0); 2.9536 (1.0); 2.7554 (0.6); 2.3015 (16.0); 2.1892 (10.8); 2.1026 (1.3); 2.0920 (1.3); 2.0814 (1.8); 2.0615 (1.4); 2.0521 (1.4); 2.0361 (10.1); 1.7319 (1.1); 1.7028 (1.0); 1.2969 (0.8); 0.1139 (0.5); 0.0403 (5.2)

I-118: $^{1}$H-NMR(300.2 MHz, CDCl3):
δ = 8.2465 (12.0); 7.3503 (2.8); 7.3241 (6.0); 7.2984 (5.1); 7.0304 (5.6); 7.0048 (5.2); 6.9720 (0.4); 6.9245 (3.6); 6.8518 (2.0); 6.8249 (1.9); 6.7923 (3.6); 6.7306 (1.1); 3.7671 (1.0); 3.7374 (2.0); 3.7217 (2.3); 3.7075 (2.2); 3.6774 (0.9); 3.5985 (0.8); 3.5709 (0.9); 2.9204 (1.1); 2.8540 (0.4); 2.7985 (0.5); 2.3506 (0.8); 2.3128 (16.0); 2.2367 (14.2); 2.0653 (1.0); 2.0528 (1.0); 2.0227 (1.3); 2.0103 (1.2); 1.9922 (1.1); 1.9750 (1.5); 1.9637 (1.6); 1.9471 (2.9); 1.9303 (1.7); 1.9192 (1.7); 1.9023 (0.9); 1.7057 (1.0); 1.6915 (0.9); 1.6765 (0.9); 1.3075 (0.4); 1.0646 (1.6); 1.0491 (4.5); 1.0427 (5.1); 1.0279 (2.8); 1.0210 (5.1); 1.0145 (4.7); 1.0001 (2.3); 0.9772 (0.4); 0.7760 (2.2); 0.7608 (5.9); 0.7548 (5.4); 0.7445 (5.3); 0.7386 (6.0); 0.7226 (1.9); 0.0507 (1.7)

I-119: $^{1}$H-NMR(499.9 MHz, CDCl3):
δ = 7.9139 (5.2); 7.2598 (4.9); 7.0773 (2.2); 7.0621 (3.3); 7.0467 (2.3); 6.9816 (4.2); 6.9680 (4.8); 6.9432 (1.6); 6.8707 (4.7); 6.8076 (2.1); 6.7940 (2.8); 6.7808 (1.4); 6.6682 (2.9); 6.6538 (2.3); 6.2125 (3.3); 5.2968 (0.6); 4.2334 (2.3); 4.2138 (2.2); 3.8583 (2.3); 3.8125 (2.4); 3.8000 (1.9); 3.7917 (2.0); 3.7794 (1.3); 2.9869 (2.0); 2.9778 (2.0); 2.9601 (2.2); 2.9514 (1.9); 2.9011 (0.4); 2.7465 (2.4); 2.7271 (2.6); 2.7005 (2.0); 2.6267 (16.0); 2.4974 (0.4); 2.4801 (0.4); 2.4652 (0.4); 2.3939 (0.6); 2.2711 (15.8); 2.1440 (15.4); 2.0762 (2.1); 1.5793 (6.6); 1.0243 (4.5); 0.7720 (5.0); −0.0002 (5.5)

I-120: $^{1}$H-NMR(300.2 MHz, CDCl3):
δ = 8.7215 (5.8); 7.2989 (7.9); 7.1815 (0.5); 7.1775 (0.5); 7.1548 (1.2); 7.1509 (1.3); 7.1282 (0.8); 7.1245 (0.9); 7.0419 (0.8); 7.0363 (1.0); 7.0279 (1.7); 7.0180 (1.0); 7.0131 (1.3); 7.0024 (2.0); 6.9914 (0.7); 6.9860 (0.6); 6.9143 (1.9); 6.8816 (1.1); 6.8597 (0.6); 6.8549 (0.5); 6.7148 (1.0); 6.6909 (0.9); 6.0572 (1.2); 4.3216 (0.6); 4.3131 (0.9); 4.2871 (1.0); 4.2790 (0.7); 3.9234 (0.4); 3.9177 (0.5); 3.9087 (0.4); 3.9022 (0.5); 3.8940 (0.5); 3.8854 (1.6); 3.8655 (0.4); 3.8515 (1.3); 3.8310 (0.7); 3.0612 (0.5); 3.0460 (0.5); 3.0166 (1.0); 3.0002 (0.8); 2.8624 (0.4); 2.8047 (16.0); 2.7678 (0.8); 2.7538 (0.8); 2.7226 (0.6); 2.3409 (0.3); 2.3148 (10.1); 2.1830 (9.5); 2.1605 (0.6); 2.1434 (0.9); 2.1262 (0.5); 2.1152 (0.5); 1.6014 (6.7); 1.3039 (1.4); 1.2977 (1.3); 1.1228 (0.6); 1.1095 (1.2); 1.1027 (1.6); 1.0981 (1.0); 1.0949 (1.0); 1.0894 (1.0); 1.0806 (1.3); 1.0744 (1.5); 1.0611 (0.8); 0.9412 (0.5); 0.9195 (1.5); 0.8961 (0.6); 0.8572 (0.8); 0.8499 (0.7); 0.8408 (1.6); 0.8337 (1.4); 0.8258 (1.6); 0.8188 (1.1); 0.8078 (0.5); 0.1079 (0.4); 0.0375 (9.3); 0.0266 (0.4)

I-121: $^{1}$H-NMR(300.2 MHz, CDCl3):
δ = 8.7079 (3.7); 7.4030 (0.7); 7.3767 (1.5); 7.3503 (0.9); 7.2988 (3.9); 7.0732 (0.8); 7.0471 (0.7); 7.0047 (1.1); 6.9792 (1.2); 6.9296 (1.2); 6.9079 (0.6); 6.9050 (0.6); 6.9000 (0.7); 6.8972 (0.7); 6.8811 (0.5); 6.8782 (0.5); 6.8731 (0.7); 6.8704 (0.6); 6.8277 (0.9); 6.8214 (1.3); 6.8147 (0.8); 6.7020 (0.7); 6.6784 (0.6); 6.1351 (0.8); 4.3083 (0.4); 4.3000 (0.6); 4.2739 (0.7); 4.2657 (0.5); 4.1931 (1.1); 4.1692 (3.5); 4.1454 (3.5); 4.1217 (1.2); 3.8985 (0.3); 3.8831 (0.4); 3.8753 (0.4); 3.8655 (1.1); 3.8317 (0.8); 3.8110 (0.5); 3.0534 (0.4); 3.0385 (0.4); 3.0084 (0.6); 2.9926 (0.6); 2.7924 (10.3); 2.7727 (0.6); 2.7410 (0.5); 2.7267 (0.5); 2.6956 (0.4); 2.3054 (6.7); 2.2193 (6.3); 2.0815 (16.0); 1.9849 (0.4); 1.9682 (0.6); 1.9515 (0.4); 1.9402 (0.4);

TABLE 2-continued 1.6240 (3.3); 1.3194 (4.3); 1.2956 (8.7); 1.2718 (4.1); 1.0868 (0.4); 1.0715 (1.1); 1.0648 (1.2); 1.0593 (0.7); 1.0499 (0.6); 1.0431 (1.2); 1.0367 (1.1); 1.0221 (0.5); 0.9179 (0.4); 0.7915 (0.5); 0.7763 (1.4); 0.7701 (1.2); 0.7599 (1.2); 0.7541 (1.4); 0.7379 (0.4); 0.0360 (4.4)

I-122: $^1$H-NMR(300.2 MHz, CDCl3):
δ = 8.1520 (6.4); 7.2987 (14.0); 7.1576 (0.8); 7.1536 (0.8); 7.1306 (1.9); 7.1272 (2.1); 7.1007 (1.5); 7.0291 (3.2); 7.0225 (1.7); 7.0040 (4.2); 6.9769 (0.9); 6.9719 (0.9); 6.9118 (3.0); 6.8820 (1.1); 6.8770 (1.1); 6.8553 (1.8); 6.8338 (0.9); 6.8286 (0.9); 6.7128 (1.6); 6.6875 (1.4); 6.2374 (1.5); 5.1212 (0.4); 5.0988 (1.3); 5.0767 (1.3); 5.0553 (0.5); 4.3102 (1.0); 4.3011 (1.3); 4.2758 (1.5); 4.2667 (1.3); 4.1711 (0.6); 4.1474 (0.6); 3.9149 (0.8); 3.8985 (0.8); 3.8731 (2.6); 3.8530 (0.8); 3.8389 (1.8); 3.8182 (1.1); 3.6124 (0.5); 3.0556 (0.9); 3.0400 (0.9); 3.0108 (1.4); 2.9941 (1.3); 2.7974 (1.1); 2.7672 (1.1); 2.7528 (1.0); 2.7215 (0.9); 2.3463 (0.5); 2.3150 (16.0); 2.1803 (14.0); 2.1630 (1.0); 2.1511 (0.9); 2.1343 (1.4); 2.1173 (0.9); 2.1061 (0.9); 2.0833 (3.1); 1.6582 (0.6); 1.6354 (0.6); 1.6067 (6.8); 1.6009 (5.8); 1.5847 (6.7); 1.5790 (5.6); 1.3209 (0.8); 1.2971 (1.6); 1.2733 (0.7); 1.1074 (0.9); 1.0938 (1.8); 1.0874 (2.4); 1.0822 (1.5); 1.0796 (1.5); 1.0745 (1.5); 1.0654 (2.0); 1.0592 (2.4); 1.0461 (1.3); 1.0204 (0.4); 0.8452 (1.1); 0.8384 (1.1); 0.8294 (2.5); 0.8222 (2.4); 0.8135 (2.7); 0.8066 (1.7); 0.7962 (1.0); 0.1080 (1.3); 0.0484 (0.6); 0.0376 (17.8); 0.0268 (0.7)

I-123: $^1$H-NMR(300.2 MHz, CDCl3):
δ = 8.1333 (16.0); 7.3876 (3.0); 7.3612 (6.8); 7.3553 (7.2); 7.3482 (7.0); 7.3349 (3.9); 7.2989 (18.2); 7.1396 (5.4); 7.1225 (0.8); 7.1123 (6.8); 7.0614 (3.5); 7.0354 (3.0); 6.9187 (4.2); 6.9116 (4.2); 6.8915 (3.4); 6.8844 (3.4); 6.8745 (2.4); 6.8716 (2.6); 6.8665 (3.0); 6.8637 (3.0); 6.8477 (1.9); 6.8448 (2.1); 6.8397 (2.9); 6.8368 (2.8); 6.8103 (4.0); 6.8041 (5.2); 6.7972 (3.1); 6.2560 (2.7); 6.2497 (2.7); 5.3375 (1.7); 4.1952 (2.2); 4.1852 (2.6); 4.1595 (3.0); 4.1495 (3.3); 4.0404 (0.4); 4.0300 (0.6); 4.0242 (0.9); 4.0136 (1.4); 3.9970 (1.5); 3.9843 (1.7); 3.9749 (1.1); 3.9675 (1.1); 3.9581 (0.8); 3.9462 (4.0); 3.9303 (2.1); 3.9106 (2.8); 3.8945 (2.0); 3.1891 (2.0); 3.1726 (2.0); 3.1443 (3.1); 3.1274 (2.8); 2.9761 (3.0); 2.9463 (2.8); 2.9312 (2.1); 2.9012 (2.0); 2.6931 (0.8); 2.0054 (0.6); 1.9886 (1.3); 1.9775 (1.4); 1.9721 (1.0); 1.9607 (2.8); 1.9440 (1.6); 1.9327 (1.6); 1.9159 (0.8); 1.6015 (9.7); 1.3665 (0.4); 1.3439 (0.9); 1.3036 (5.6); 1.0802 (1.8); 1.0649 (4.4); 1.0583 (5.0); 1.0527 (2.8); 1.0434 (2.8); 1.0365 (5.0); 1.0302 (4.5); 1.0154 (2.4); 0.9931 (0.4); 0.9651 (0.4); 0.9410 (2.0); 0.9192 (6.5); 0.8959 (2.4); 0.7815 (2.3); 0.7662 (5.8); 0.7601 (5.1); 0.7498 (5.0); 0.7442 (6.0); 0.7279 (1.9); 0.1076 (0.8); 0.0483 (0.7); 0.0374 (23.1); 0.0265 (0.9)

I-124: $^1$H-NMR(300.2 MHz, CDCl3):
δ = 8.2941 (5.2); 7.2988 (12.0); 7.1462 (0.9); 7.1198 (2.0); 7.0933 (1.5); 7.0334 (2.8); 7.0245 (1.5); 7.0179 (1.1); 7.0078 (3.7); 6.9800 (0.7); 6.9739 (0.9); 6.9137 (3.1); 6.8768 (1.0); 6.8719 (1.0); 6.8504 (1.8); 6.8285 (0.9); 6.7192 (1.4); 6.6936 (1.2); 6.2021 (1.7); 5.9711 (0.6); 5.9664 (0.8); 5.9493 (0.7); 5.9448 (0.8); 5.8129 (0.7); 5.8082 (0.8); 5.7911 (0.7); 5.7865 (0.8); 4.3115 (1.0); 4.3028 (1.4); 4.2774 (1.5); 4.2686 (1.2); 3.9238 (0.7); 3.9182 (0.8); 3.9030 (0.8); 3.8957 (0.8); 3.8815 (2.8); 3.8619 (0.7); 3.8478 (1.9); 3.8273 (1.1); 3.0557 (0.8); 3.0409 (0.8); 3.0115 (1.3); 2.9950 (1.2); 2.8049 (1.0); 2.7774 (0.9); 2.7636 (0.8); 2.7324 (0.7); 2.7272 (0.6); 2.3405 (0.5); 2.3172 (16.0); 2.1830 (14.9); 2.1570 (0.8); 2.1453 (0.8); 2.1288 (1.4); 2.1117 (0.9); 2.1006 (0.8); 2.0832 (0.4); 1.8271 (2.9); 1.8169 (2.6); 1.8054 (3.1); 1.7952 (2.6); 1.7460 (3.0); 1.7358 (2.7); 1.7243 (3.0); 1.7141 (2.5); 1.5931 (6.1); 1.3463 (0.4); 1.3062 (2.2); 1.1031 (0.9); 1.0886 (1.9); 1.0831 (2.5); 1.0783 (1.6); 1.0700 (1.6); 1.0611 (2.1); 1.0548 (2.4); 1.0418 (1.3); 0.9431 (0.8); 0.9213 (2.2); 0.8978 (0.9); 0.8414 (1.2); 0.8255 (2.7); 0.8185 (2.5); 0.8101 (2.8); 0.8030 (1.8); 0.7926 (1.0); 0.1093 (0.9); 0.0499 (0.6); 0.0392 (14.8); 0.0284 (0.7)

I-125: $^1$H-NMR(300.2 MHz, CDCl3):
δ = 8.2886 (5.6); 8.2800 (1.7); 7.3647 (1.2); 7.3384 (2.7); 7.3299 (1.0); 7.3099 (2.5); 7.3003 (7.9); 7.2983 (8.8); 7.2901 (2.9); 7.0332 (2.2); 7.0088 (4.3); 6.9835 (3.1); 6.9323 (3.4); 6.8694 (1.9); 6.8427 (1.7); 6.8031 (3.3); 6.7164 (1.7); 6.6914 (1.5); 6.2739 (2.4); 5.9688 (0.8); 5.9473 (0.8); 5.9256 (0.4); 5.8103 (0.8); 5.7888 (0.8); 5.7684 (0.3); 4.2968 (1.2); 4.2882 (1.7); 4.2632 (1.8); 4.2541 (1.6); 3.8966 (1.1); 3.8815 (1.3); 3.8620 (3.0); 3.8426 (1.1); 3.8283 (1.9); 3.8195 (0.8); 3.8080 (1.1); 3.0440 (0.9); 3.0316 (1.0); 3.0006 (1.4); 2.9856 (1.4); 2.7746 (1.1); 2.7437 (1.2); 2.7317 (1.2); 2.6984 (0.9); 2.3381 (0.6); 2.3073 (16.0); 2.2262 (14.8); 2.1841 (0.4); 1.9979 (0.4); 1.9805 (0.8); 1.9700 (1.0); 1.9629 (0.9); 1.9529 (1.6); 1.9430 (1.1); 1.9358 (1.2); 1.9255 (1.1); 1.9079 (0.6); 1.8204 (2.8); 1.8107 (3.4); 1.7989 (3.2); 1.7899 (3.3); 1.7806 (1.2); 1.7393 (2.8); 1.7296 (3.4); 1.7178 (3.2); 1.7088 (3.2); 1.6995 (1.2); 1.5957 (7.5); 1.5873 (2.7); 1.3627 (0.4); 1.3021 (2.0); 1.0677 (0.9); 1.0527 (2.9); 1.0454 (3.3); 1.0311 (2.4); 1.0246 (3.3); 1.0176 (3.1); 1.0049 (1.5); 0.9878 (0.6); 0.9705 (0.5); 0.9623 (0.7); 0.9374 (0.9); 0.9214 (1.6); 0.9132 (0.8); 0.8986 (0.7); 0.7784 (1.2); 0.7632 (3.6); 0.7579 (3.7); 0.7484 (3.8); 0.7414 (4.0); 0.7262 (1.3); 0.1092 (0.6); 0.0466 (2.1); 0.0410 (9.5); 0.0391 (10.9); 0.0309 (3.7)

I-126: $^1$H-NMR(499.9 MHz, CDCl3):
δ =7.9136 (5.3); 7.5848 (0.5); 7.5690 (1.7); 7.5563 (4.2); 7.5455 (0.4); 7.5435 (0.4); 7.4563 (2.0); 7.3848 (0.8); 7.3796 (1.4); 7.3753 (1.0); 7.3711 (0.6); 7.3665 (1.0); 7.3621 (0.6); 7.2593 (1.7); 7.1176 (1.9); 7.1023 (2.1); 6.9442 (2.3); 6.8860 (1.3); 6.8708 (1.1); 6.6620 (1.1); 6.6538 (1.1); 4.9467 (0.8); 4.9424 (1.6); 4.9380 (1.5); 4.9336 (1.6); 4.9293 (0.8); 4.7514 (1.7); 4.7277 (2.4); 4.6307 (2.5); 4.6070 (1.7); 4.2059 (1.1); 4.2022 (1.1); 4.1831 (1.2); 4.1794 (1.2); 3.7888 (1.5); 3.7844 (1.6); 3.7660 (1.4); 3.7616 (1.3); 2.6508 (16.0); 2.3075 (0.4); 2.2783 (12.1); 2.2558 (11.3); 1.9877 (0.7); −0.0002 (1.7)

I-127: $^1$H-NMR(499.9 MHz, CDCl3):
δ = 9.1297 (0.3); 8.1906 (16.0); 7.3232 (8.1); 7.3189 (8.1); 7.3097 (7.2); 7.2939 (4.1); 7.2604 (19.5); 7.1093 (6.1); 7.0930 (7.1); 6.9944 (3.7); 6.9829 (4.4); 6.9791 (3.9); 6.9612 (3.7); 6.9477 (3.9); 6.9256 (3.7); 6.8781 (4.1); 6.8739 (4.2); 6.8618 (3.6); 6.8576 (3.7); 6.8441 (2.8); 6.8407 (3.3); 6.8395 (3.2); 6.8294 (2.5); 6.8280 (2.6); 6.8247 (3.2); 6.8234 (3.0); 6.7913 (4.2); 6.7876 (6.0); 6.7836 (3.9); 6.2600 (3.1); 6.2560 (3.2); 6.2016 (6.3); 6.1660 (5.8); 5.6193 (6.3); 5.5971 (6.1); 4.1503 (2.6); 4.1439 (3.1); 4.1283 (3.9); 4.1221 (3.6); 4.1135 (1.0); 4.0992 (0.4); 3.9922 (0.4); 3.9856 (0.7); 3.9822 (1.0); 3.9758 (1.7); 3.9662 (1.8); 3.9582 (2.0); 3.9520 (1.3); 3.9481 (1.2); 3.9418 (0.7); 3.9087 (3.7); 3.8990 (2.8); 3.8869 (3.2); 3.8772 (2.6); 3.1437 (2.4); 3.1335 (2.5); 3.1167 (3.1); 3.1064 (3.1); 2.9380 (3.0); 2.9199 (3.0); 2.9110 (2.6); 2.8928 (2.4); 2.0433 (3.4); 1.9451 (0.7); 1.9349 (1.5); 1.9282 (1.7); 1.9252 (1.2); 1.9181 (3.1); 1.9111 (1.3); 1.9081 (1.8); 1.9014 (1.8); 1.8912 (0.9); 1.5724 (3.2); 1.2727 (0.9); 1.2584 (1.8); 1.2441 (0.9); 1.0129 (2.0); 1.0036 (5.0); 1.0000 (5.6); 0.9963 (3.2); 0.9910 (3.1); 0.9868 (5.5); 0.9832 (5.4); 0.9743 (2.6); 0.9608 (0.4); 0.8817 (0.3); 0.7311 (2.4); 0.7218 (6.3); 0.7186 (5.7); 0.7120 (5.7); 0.7088 (6.8); 0.6992 (2.3); 0.0063 (0.7); −0.0002 (22.9); −0.0066 (1.5)

I-128: $^1$H-NMR(300.2 MHz, CDCl3):
δ = 8.6747 (2.1); 8.6171 (1.6); 8.6089 (1.7); 7.7456 (1.7); 7.2991 (10.6); 7.0350 (3.5); 7.0097 (2.7); 6.9725 (1.6); 6.9676 (1.7); 6.9395 (0.7); 6.7883 (2.3); 6.6029 (1.1); 4.8018 (1.4); 4.2199 (1.2); 4.1939 (1.4); 4.1759 (0.5); 4.0996 (0.6); 3.9909 (0.3); 3.9623 (2.0); 3.9457 (0.6); 3.9351 (1.6); 3.9183 (0.6); 3.0505 (0.5); 3.0340 (0.6); 3.0044 (1.0); 2.9875 (0.9); 2.9215 (0.9); 2.8928 (0.9); 2.8762 (0.5); 2.8462 (0.5); 2.5663 (16.0); 2.5332 (0.5); 2.3702 (0.5); 2.3591 (0.6); 2.3234 (13.9); 2.3194 (13.8); 1.6045 (5.9); 0.1074 (0.6); 0.0483 (0.4); 0.0375 (12.9); 0.0268 (0.6)

I-129: $^1$H-NMR(300.2 MHz, CDCl3):
δ = 7.9701 (4.1); 7.3609 (2.5); 7.3535 (2.1); 7.3366 (1.9); 7.3103 (1.2); 7.2984 (6.5); 7.1470 (1.6); 7.1197 (2.0); 7.0199 (1.0); 6.9940 (0.9); 6.9145 (1.3); 6.9073 (1.3); 6.8872 (1.1); 6.8802 (1.7); 6.8725 (1.0); 6.8696 (0.9); 6.8538 (0.6); 6.8506 (0.6); 6.8458 (0.9); 6.8429 (0.8); 6.8234 (1.2); 6.8174 (1.6); 6.8104 (0.8); 6.3166 (0.8); 6.3096 (0.8); 4.1841 (0.6); 4.1739 (0.8); 4.1483 (0.9); 4.1382 (1.0); 4.0086 (0.4); 3.9916 (0.5); 3.9793 (0.5); 3.9626 (0.3); 3.9420 (1.2); 3.9260 (0.6); 3.9063 (0.8); 3.8904 (0.6); 3.1874 (0.6); 3.1708 (0.6); 3.1426 (0.9); 3.1257 (0.8); 3.0214 (0.9); 2.9960 (2.8); 2.9773 (1.1); 2.9707 (3.0); 2.9460 (1.5); 2.9329 (0.7); 2.9030 (0.6); 2.0428 (16.0); 1.9768 (0.4); 1.9660 (0.5); 1.9494 (0.8); 1.9325 (0.5); 1.9213 (0.5);

TABLE 2-continued 1.3963 (3.3); 1.3710 (7.0); 1.3456 (3.2); 1.2909 (0.4); 1.0579 (0.6); 1.0429 (1.4); 1.0359 (1.6); 1.0301 (0.8); 1.0211 (0.9); 1.0145 (1.5); 1.0079 (1.4); 0.9932 (0.8); 0.7742 (0.7); 0.7591 (1.8); 0.7533 (1.5); 0.7426 (1.5); 0.7371 (1.8); 0.7207 (0.6); 0.1060 (0.6); 0.0357 (7.8)

I-130: $^1$H-NMR(499.9 MHz, CDCl3):
δ = 7.9135 (5.2); 7.2597 (3.9); 7.0779 (1.0); 7.0622 (2.2); 7.0465 (1.5); 6.9825 (2.6); 6.9675 (3.2); 6.9584 (2.2); 6.9438 (1.1); 6.8703 (3.3); 6.8074 (1.2); 6.7938 (1.9); 6.7801 (1.1); 6.6686 (1.9); 6.6537 (1.7); 6.2127 (2.3); 4.2361 (1.3); 4.2300 (1.4); 4.2148 (1.5); 4.2087 (1.5); 3.8584 (1.1); 3.8510 (1.2); 3.8126 (1.9); 3.8003 (1.2); 3.7913 (1.6); 3.7790 (1.2); 2.9876 (1.1); 2.9776 (1.2); 2.9604 (1.4); 2.9503 (1.4); 2.7468 (1.4); 2.7279 (1.5); 2.7198 (1.3); 2.7007 (1.2); 2.6263 (16.0); 2.2710 (14.1); 2.1441 (13.7); 2.1031 (0.6); 2.0925 (0.9); 2.0858 (1.0); 2.0758 (1.5); 2.0659 (1.0); 2.0592 (0.9); 2.0487 (0.5); 1.5911 (4.8); 1.0239 (2.6); 1.0176 (2.4); 1.0097 (2.5); 1.0071 (2.5); 0.7824 (1.8); 0.7715 (2.9); 0.7681 (3.0); −0.0002 (4.5)

I-131: $^1$H-NMR(300.2 MHz, CDCl3):
δ = 7.9635 (5.2); 7.6147 (2.1); 7.6093 (1.5); 7.6003 (3.3); 7.5973 (3.8); 7.4300 (1.8); 7.3869 (0.8); 7.3740 (2.9); 7.3672 (1.1); 7.3570 (0.8); 7.3486 (2.7); 7.2987 (2.4); 7.0316 (1.9); 6.8036 (1.0); 6.8009 (1.0); 6.7775 (0.9); 6.7749 (0.9); 6.5811 (1.3); 4.9614 (0.7); 4.9544 (0.7); 4.9486 (0.9); 4.9410 (1.4); 4.9334 (0.9); 4.9276 (0.8); 4.9206 (0.7); 4.4547 (1.0); 4.4422 (1.0); 4.4173 (1.2); 4.4047 (1.1); 3.9154 (1.4); 3.8943 (1.3); 3.8778 (1.2); 3.8568 (1.2); 2.6863 (16.0); 2.4418 (11.7); 2.2473 (11.2); 1.6627 (1.4); 1.3028 (0.5); 0.9177 (0.5); 0.0362 (2.5)

I-132: $^1$H-NMR(300.2 MHz, CDCl3):
δ = 7.9377 (5.2); 7.6040 (2.6); 7.5866 (3.7); 7.3405 (1.8); 7.2988 (10.9); 7.2658 (0.8); 7.2570 (0.8); 7.2513 (1.2); 7.2448 (1.2); 7.2332 (6.9); 7.2271 (7.3); 7.0920 (1.7); 7.0860 (2.9); 7.0800 (1.4); 5.9166 (1.2); 5.3367 (1.8); 4.2371 (0.8); 4.2250 (0.8); 4.1998 (1.1); 4.1899 (1.1); 4.1701 (1.3); 4.1463 (1.3); 4.1230 (0.9); 4.1014 (1.1); 4.0791 (0.6); 3.9664 (1.1); 3.9465 (1.5); 3.9296 (0.7); 3.9097 (1.4); 3.8695 (0.8); 3.8617 (1.0); 3.8580 (1.0); 3.8500 (1.2); 3.8423 (0.7); 3.8300 (0.5); 2.6726 (16.0); 2.0817 (9.3); 2.0433 (1.3); 1.9121 (0.3); 1.8875 (0.3); 1.6706 (0.4); 1.6470 (0.5); 1.6340 (1.2); 1.6074 (2.6); 1.4561 (0.4); 1.4322 (11.7); 1.4202 (10.8); 1.3812 (0.7); 1.3565 (0.4); 1.3198 (1.9); 1.2960 (4.2); 1.2722 (1.7); 1.2222 (0.4); 1.1985 (0.4); 0.9966 (0.9); 0.9801 (0.4); 0.9722 (1.8); 0.9578 (0.3); 0.9478 (0.8); 0.9172 (0.4); 0.1134 (0.8); 0.1066 (4.1); 0.0476 (0.4); 0.0367 (12.4); 0.0259 (0.6)

I-133: $^1$H-NMR(300.2 MHz, CDCl3):
δ = 7.9636 (5.1); 7.6466 (0.3); 7.6208 (1.4); 7.5987 (4.1); 7.5771 (0.4); 7.5151 (1.9); 7.4524 (0.8); 7.4438 (1.3); 7.4365 (0.8); 7.4289 (0.5); 7.4222 (0.8); 7.4142 (0.5); 7.2986 (13.7); 7.2668 (3.2); 7.2605 (1.2); 7.2452 (1.4); 7.2388 (4.6); 7.1113 (4.0); 7.0833 (2.8); 6.1074 (1.1); 6.0984 (1.1); 5.3374 (1.4); 4.1705 (0.5); 4.1467 (0.5); 4.1244 (1.2); 4.1135 (1.1); 4.1017 (0.4); 4.0883 (1.3); 4.0771 (1.4); 3.8777 (1.2); 3.8613 (1.4); 3.8411 (0.9); 3.8245 (1.1); 3.6814 (0.5); 3.6701 (0.7); 3.6589 (0.6); 3.6543 (0.7); 3.6427 (0.5); 2.7870 (0.8); 2.7623 (1.6); 2.7406 (1.8); 2.7040 (16.0); 2.0826 (3.3); 2.0183 (1.1); 1.9930 (2.3); 1.9692 (2.4); 1.9437 (0.9); 1.5976 (5.2); 1.3205 (0.7); 1.2967 (1.6); 1.2730 (0.6); 0.9728 (0.5); 0.1071 (4.2); 0.0481 (0.6); 0.0373 (17.0); 0.0264 (0.8)

I-134: $^1$H-NMR(300.2 MHz, CDCl3):
δ = 8.0243 (5.4); 7.6547 (2.9); 7.6476 (3.2); 7.6166 (1.5); 7.5945 (4.4); 7.5726 (0.4); 7.5272 (2.2); 7.5187 (2.6); 7.4903 (3.8); 7.4651 (0.9); 7.4566 (1.5); 7.4491 (1.0); 7.4306 (2.7); 7.4236 (2.2); 7.4024 (1.2); 7.3952 (1.1); 7.2987 (11.2); 6.7359 (2.3); 5.3373 (2.5); 3.5815 (1.0); 3.5581 (1.1); 3.5528 (1.2); 3.5295 (1.1); 3.5063 (0.4); 3.2517 (1.1); 3.2283 (1.2); 3.2231 (1.1); 3.1997 (1.0); 2.7482 (16.0); 1.5974 (1.0); 1.4621 (11.8); 1.2899 (5.8); 1.2662 (8.2); 1.2429 (3.9); 1.0820 (12.2); 0.9173 (0.4); 0.1073 (1.4); 0.0477 (0.6); 0.0371 (12.4)

I-135: $^1$H-NMR(300.2 MHz, CDCl3):
δ = 8.0279 (0.4); 7.9920 (5.2); 7.5683 (0.7); 7.5504 (3.7); 7.5424 (1.5); 7.5291 (1.8); 7.5029 (0.5); 7.4374 (1.8); 7.3626 (0.8); 7.3555 (1.0); 7.3401 (0.8); 7.3328 (1.1); 7.3243 (0.5); 7.2987 (7.4); 7.2884 (0.5); 7.2584 (0.5); 7.2004 (0.4); 7.1889 (4.0); 7.1815 (1.3); 7.1663 (1.4); 7.1588 (4.5); 7.1474 (0.4); 6.9329 (0.4); 6.9028 (0.4); 6.8448 (1.9); 6.7539 (0.5); 6.7425 (4.5); 6.7350 (1.4); 6.7198 (1.2); 6.7124 (3.9); 6.7009 (0.4); 5.3361 (1.0); 4.5252 (0.5); 4.3210 (1.8); 4.2824 (2.2); 4.1508 (1.7); 4.1180 (3.3); 4.0589 (3.2); 4.0261 (1.7); 3.9603 (2.8); 3.9217 (2.4); 3.8713 (0.7); 3.8644 (0.5); 3.8479 (0.8); 3.8410 (1.5); 3.8243 (0.4); 3.8175 (1.8); 3.7932 (1.8); 3.7695 (1.5); 3.7628 (0.8); 3.7461 (0.5); 3.7392 (0.7); 2.7273 (16.0); 1.2923 (1.5); 1.2614 (4.3); 1.2381 (8.6); 1.2147 (4.0); 0.0371 (7.8); 0.0263 (0.3)

I-136: $^1$H-NMR(300.2 MHz, CDCl3):
δ = 8.7028 (5.8); 7.4227 (1.1); 7.3963 (2.3); 7.3699 (1.5); 7.3589 (2.4); 7.3518 (2.5); 7.2985 (7.1); 7.1665 (2.0); 7.1392 (2.5); 7.0872 (1.2); 7.0612 (1.1); 6.9322 (1.9); 6.9256 (2.2); 6.9190 (1.2); 6.9050 (1.6); 6.8983 (1.8); 6.8922 (1.0); 6.8575 (1.5); 6.8513 (1.9); 6.8444 (1.1); 6.0984 (1.0); 6.0913 (1.0); 4.2064 (0.8); 4.1965 (1.0); 4.1706 (1.2); 4.1611 (1.2); 4.0327 (0.5); 4.0162 (0.6); 4.0037 (0.6); 3.9944 (0.4); 3.9870 (0.4); 3.9723 (1.5); 3.9567 (0.7); 3.9366 (1.0); 3.9210 (0.7); 3.2038 (0.7); 3.1872 (0.7); 3.1590 (1.1); 3.1420 (1.0); 3.0096 (1.1); 2.9802 (1.0); 2.9649 (0.8); 2.9350 (0.7); 2.8021 (16.0); 2.0810 (0.5); 2.0064 (0.5); 1.9951 (0.5); 1.9784 (1.0); 1.9617 (0.6); 1.9504 (0.6); 1.5990 (7.1); 1.3436 (0.4); 1.3194 (0.7); 1.3038 (2.3); 1.2962 (2.1); 1.2721 (0.3); 1.0901 (0.7); 1.0749 (1.6); 1.0681 (1.9); 1.0625 (1.0); 1.0531 (1.0); 1.0464 (1.8); 1.0400 (1.7); 1.0252 (0.9); 0.9597 (0.4); 0.9404 (0.8); 0.9187 (2.6); 0.8954 (1.0); 0.7970 (0.8); 0.7816 (2.2); 0.7756 (1.8); 0.7651 (1.8); 0.7595 (2.2); 0.7432 (0.7); 0.1194 (0.4); 0.1073 (10.1); 0.0952 (0.4); 0.0367 (8.3); 0.0259 (0.3)

I-137: $^1$H-NMR(300.2 MHz, CDCl3):
δ = 8.1464 (11.5); 7.3954 (2.6); 7.3691 (6.0); 7.3618 (6.8); 7.3547 (6.7); 7.3428 (3.6); 7.2983 (30.0); 7.1553 (4.8); 7.1281 (6.1); 7.0543 (3.2); 7.0281 (2.8); 6.9471 (0.4); 6.9209 (2.9); 6.9164 (2.8); 6.8958 (4.2); 6.8901 (4.6); 6.8719 (1.9); 6.8688 (1.9); 6.8638 (2.7); 6.8342 (3.8); 6.8282 (5.0); 6.8214 (2.8); 6.2853 (2.5); 5.1330 (0.4); 5.1110 (1.4); 5.0896 (1.8); 5.0726 (1.5); 5.0516 (0.5); 4.2034 (1.9); 4.1936 (2.5); 4.1682 (2.8); 4.1577 (2.9); 4.1467 (1.0); 4.1233 (0.5); 4.1017 (0.4); 4.0509 (0.4); 4.0345 (0.8); 4.0241 (1.4); 4.0077 (1.4); 3.9953 (1.5); 3.9866 (1.0); 3.9784 (1.0); 3.9687 (0.7); 3.9557 (3.3); 3.9396 (1.9); 3.9200 (2.4); 3.9040 (1.7); 3.6352 (1.9); 3.6271 (2.4); 3.6190 (2.1); 3.6107 (2.1); 3.1997 (1.8); 3.1830 (1.8); 3.1548 (2.8); 3.1380 (2.6); 2.9898 (2.5); 2.9601 (2.3); 2.9453 (1.8); 2.9151 (1.6); 2.0824 (4.4); 2.0104 (0.6); 1.9936 (1.2); 1.9825 (1.3); 1.9658 (2.5); 1.9490 (1.5); 1.9377 (1.5); 1.9209 (0.8); 1.6697 (0.4); 1.6478 (0.4); 1.6082 (12.6); 1.6040 (16.0); 1.5865 (10.1); 1.5820 (11.1); 1.3203 (1.1); 1.3143 (0.4); 1.2964 (2.4); 1.2726 (1.0); 1.0757 (1.6); 1.0606 (4.1); 1.0538 (4.7); 1.0388 (2.6); 1.0323 (4.6); 1.0258 (4.3); 1.0110 (2.2); 0.9972 (0.7); 0.9726 (0.7); 0.9604 (0.6); 0.9542 (0.4); 0.9481 (0.4); 0.9295 (0.5); 0.7866 (2.0); 0.7714 (5.3); 0.7658 (4.7); 0.7550 (4.5); 0.7495 (5.7); 0.7331 (1.8); 0.1071 (9.4); 0.0477 (1.2); 0.0369 (38.3); 0.0260 (1.5)

I-138: $^1$H-NMR(300.2 MHz, CDCl3):
δ = 7.9565 (5.2); 7.2987 (12.7); 7.1347 (2.4); 7.1194 (0.9); 7.1109 (2.0); 7.0923 (1.9); 7.0850 (2.6); 7.0696 (1.2); 7.0666 (1.2); 7.0198 (1.0); 7.0141 (1.1); 6.9910 (1.4); 6.9693 (0.7); 6.9638 (0.7); 6.9493 (1.5); 6.9238 (1.1); 6.8494 (0.8); 6.8441 (0.8); 6.8233 (1.3); 6.8013 (0.7); 6.7964 (0.6); 6.6059 (1.0); 6.5696 (1.1); 6.5473 (1.2); 6.5109 (1.2); 6.2725 (1.5); 5.6538 (2.0); 5.5952 (1.8); 5.3378 (6.2); 5.2142 (2.0); 5.1778 (1.9); 4.2677 (1.1); 4.2426 (1.3); 4.2340 (0.9); 4.1716 (0.7); 4.1478 (0.7); 3.9336 (0.4); 3.9229 (0.6); 3.9163 (0.7); 3.8862 (2.0); 3.8676 (0.5); 3.8523 (1.4); 3.8325 (0.8); 3.0678 (0.7); 3.0521 (0.6); 3.0227 (1.2); 3.0063 (1.1); 2.8494 (0.9); 2.8182 (0.9); 2.8036 (0.9); 2.7731 (0.7); 2.6697 (16.0); 2.3483 (12.2); 2.1241 (0.5); 2.1128 (0.6); 2.0959 (1.1); 2.0838 (3.6); 2.0680 (0.6); 2.0458 (0.5); 1.5979 (2.8); 1.3213 (1.0); 1.2975 (1.9); 1.2738 (0.8); 1.0724 (0.8); 1.0595 (1.5); 1.0527 (1.9); 1.0444 (1.3); 1.0401 (1.3); 1.0305 (1.5); 1.0244 (1.8); 1.0118 (0.9); 0.8171 (0.9); 0.8117 (1.0); 0.8024 (2.1); 0.7951 (2.0); 0.7864 (2.1); 0.7794 (1.2); 0.7695 (0.7); 0.1074 (3.7); 0.0377 (16.6); 0.0270 (0.8)

TABLE 2-continued

I-139: $^1$H-NMR(499.9 MHz, CDCl3):
δ = 7.9215 (5.3); 7.5367 (3.3); 7.5264 (2.9); 7.4475 (1.8); 7.3641 (0.7); 7.3591 (0.8); 7.3535 (1.0); 7.3496 (1.0); 7.3460 (0.6); 7.3409 (0.5); 7.2611 (3.8); 7.2042 (0.4); 7.1972 (4.2); 7.1928 (1.4); 7.1837 (1.3); 7.1792 (4.6); 7.1723 (0.5); 6.7660 (0.4); 6.7591 (4.5); 6.7546 (1.4); 6.7455 (1.3); 6.7410 (4.2); 6.7342 (0.4); 6.5356 (1.1); 5.2961 (1.6); 4.1452 (0.7); 4.1350 (1.3); 4.1312 (1.1); 4.1190 (1.9); 4.1160 (1.8); 4.1125 (1.9); 4.1062 (1.2); 4.0997 (1.0); 4.0925 (0.9); 4.0836 (1.8); 4.0641 (0.9); 4.0588 (0.5); 4.0408 (0.9); 4.0253 (1.1); 4.0117 (0.5); 2.6635 (16.0); −0.0002 (4.8)

I-140: $^1$H-NMR(300.2 MHz, CDCl3):
δ = 8.6825 (1.2); 8.6768 (1.3); 8.6195 (0.9); 8.6144 (1.0); 8.6036 (1.0); 8.5983 (1.0); 7.9766 (3.7); 7.7337 (0.6); 7.7280 (0.8); 7.7204 (0.6); 7.7074 (0.7); 7.7017 (0.8); 7.6997 (0.8); 7.6941 (0.7); 7.3785 (0.8); 7.3760 (0.7); 7.3623 (0.8); 7.3600 (0.8); 7.3521 (0.7); 7.3496 (0.7); 7.3300 (1.5); 7.3242 (1.5); 7.2987 (15.8); 7.2809 (1.3); 7.2549 (1.6); 7.1225 (0.9); 7.1164 (0.8); 7.0967 (0.6); 7.0905 (0.6); 7.0159 (1.4); 7.0086 (1.0); 6.9959 (2.4); 6.9878 (0.9); 6.9804 (1.0); 6.7599 (0.4); 6.7471 (0.5); 6.7388 (0.6); 6.7295 (0.7); 6.7134 (0.4); 6.7061 (0.4); 6.3273 (1.0); 4.3124 (0.4); 4.3038 (0.7); 4.2787 (0.8); 4.2701 (0.5); 4.1943 (0.7); 4.1705 (2.1); 4.1467 (2.1); 4.1234 (1.5); 4.1017 (1.8); 4.0793 (0.9); 3.9767 (0.4); 3.9689 (0.4); 3.9604 (0.4); 3.9468 (1.2); 3.9291 (0.3); 3.9131 (0.9); 3.8943 (0.5); 3.1385 (0.4); 3.1229 (0.4); 3.0931 (0.7); 3.0774 (0.7); 2.9348 (0.6); 2.9029 (0.5); 2.8897 (0.5); 2.8580 (0.4); 2.6726 (11.0); 2.4426 (7.6); 2.0963 (0.6); 2.0829 (16.0); 2.0451 (0.9); 2.0231 (0.3); 2.0119 (0.4); 1.9950 (0.6); 1.9779 (0.4); 1.9669 (0.4); 1.6943 (0.3); 1.6703 (0.8); 1.6615 (0.6); 1.6484 (1.2); 1.6391 (1.0); 1.6269 (0.9); 1.6221 (1.1); 1.5997 (0.6); 1.4562 (0.4); 1.4304 (0.6); 1.4051 (0.6); 1.3809 (0.4); 1.3202 (2.8); 1.2964 (5.6); 1.2726 (2.6); 0.9966 (1.5); 0.9801 (1.4); 0.9720 (3.4); 0.9637 (0.8); 0.9579 (1.2); 0.9537 (1.5); 0.9479 (1.9); 0.9411 (0.7); 0.9357 (0.6); 0.9308 (0.7); 0.9260 (1.0); 0.7187 (0.4); 0.7082 (0.9); 0.7034 (1.3); 0.6975 (1.1); 0.6914 (1.3); 0.6862 (1.2); 0.6807 (1.2); 0.1061 (5.1); 0.0472 (0.6); 0.0364 (18.0); 0.0255 (0.6)

I-141: $^1$H-NMR(300.2 MHz, CDCl3):
δ = 8.2914 (11.6); 7.3869 (3.0); 7.3613 (12.0); 7.3561 (7.7); 7.3343 (3.9); 7.2987 (34.0); 7.1575 (6.4); 7.1303 (7.9); 7.0473 (3.8); 7.0214 (3.4); 6.9474 (0.4); 6.9305 (3.0); 6.9233 (3.0); 6.9172 (2.7); 6.9100 (2.7); 6.9032 (2.8); 6.8958 (5.0); 6.8898 (4.8); 6.8843 (3.6); 6.8684 (2.4); 6.8606 (3.3); 6.8340 (4.8); 6.8279 (6.2); 6.8210 (3.5); 6.2510 (3.2); 6.0024 (0.6); 5.9802 (1.7); 5.9584 (1.7); 5.9366 (0.6); 5.8433 (0.6); 5.8218 (1.8); 5.7999 (1.8); 5.7784 (0.6); 4.2048 (2.5); 4.1948 (3.0); 4.1691 (3.6); 4.1592 (3.8); 4.0541 (0.4); 4.0377 (1.1); 4.0270 (1.7); 4.0106 (1.8); 3.9979 (2.0); 3.9884 (1.3); 3.9813 (1.4); 3.9634 (4.0); 3.9474 (2.0); 3.9278 (2.7); 3.9117 (1.8); 3.2005 (1.8); 3.1842 (1.8); 3.1556 (2.8); 3.1389 (2.6); 2.9965 (2.0); 2.9913 (2.2); 2.9669 (1.9); 2.9618 (2.1); 2.9521 (1.5); 2.9465 (1.6); 2.9217 (1.3); 2.9167 (1.5); 2.8045 (0.8); 2.0065 (0.7); 1.9893 (1.5); 1.9781 (1.7); 1.9613 (3.2); 1.9445 (1.8); 1.9333 (1.8); 1.9166 (0.9); 1.8271 (5.9); 1.8196 (7.0); 1.8053 (6.1); 1.7978 (7.0); 1.7459 (6.2); 1.7385 (7.3); 1.7242 (6.0); 1.7167 (6.8); 1.5968 (16.0); 1.3676 (0.4); 1.3430 (0.9); 1.3039 (5.5); 1.0727 (2.2); 1.0575 (5.2); 1.0508 (6.1); 1.0359 (3.4); 1.0291 (5.8); 1.0227 (5.3); 1.0080 (2.8); 0.9855 (0.6); 0.9595 (0.7); 0.9408 (2.1); 0.9192 (6.4); 0.8960 (2.4); 0.8164 (0.4); 0.7834 (2.7); 0.7681 (6.8); 0.7622 (6.1); 0.7517 (5.8); 0.7460 (7.0); 0.7298 (2.1); 0.1072 (2.1); 0.0480 (1.4); 0.0372 (41.6); 0.0263 (1.7)

I-142: $^1$H-NMR(300.2 MHz, CDCl3):
δ = 7.9508 (1.0); 7.9441 (4.6); 7.2985 (6.3); 7.2411 (2.0); 7.1475 (0.7); 7.1442 (0.7); 7.1208 (1.6); 7.1167 (1.9); 7.0882 (3.3); 7.0613 (1.7); 7.0570 (1.8); 7.0411 (1.1); 7.0355 (1.6); 7.0169 (1.1); 7.0123 (1.3); 6.9906 (0.6); 6.9851 (0.6); 6.8657 (0.6); 6.8603 (0.7); 6.8390 (1.2); 6.8173 (0.6); 6.8123 (0.6); 6.2313 (1.2); 5.3347 (1.8); 4.2339 (0.6); 4.2263 (1.1); 4.2013 (1.1); 4.1929 (0.9); 4.1690 (1.1); 4.1452 (1.0); 4.1225 (1.9); 4.1004 (3.3); 4.0780 (1.7); 3.9383 (0.4); 3.9293 (0.5); 3.9198 (0.6); 3.8994 (1.7); 3.8832 (1.0); 3.8736 (0.4); 3.8660 (1.3); 3.8481 (0.8); 3.0627 (0.6); 3.0465 (0.6); 3.0339 (4.6); 3.0179 (1.2); 3.0012 (1.0); 2.8923 (0.8); 2.8617 (0.9); 2.8470 (0.6); 2.8164 (0.6); 2.6723 (14.1); 2.3492 (1.8); 2.3385 (0.9); 2.3238 (10.3); 2.1563 (0.6); 2.1410 (0.5); 2.1294 (0.6); 2.1212 (0.7); 2.1124 (1.0); 2.0948 (1.3); 2.0815 (16.0); 2.0413 (0.6); 1.6936 (0.4); 1.6691 (1.0); 1.6603 (0.4); 1.6470 (1.3); 1.6382 (0.7); 1.6207 (1.1); 1.5982 (0.5); 1.4794 (0.3); 1.4641 (0.4); 1.4549 (0.8); 1.4455 (0.4); 1.4289 (1.1); 1.4036 (1.2); 1.3798 (0.8); 1.3694 (0.4); 1.3558 (0.5); 1.3396 (0.4); 1.3186 (1.7); 1.2947 (4.3); 1.2710 (1.5); 1.2635 (0.4); 1.2397 (0.4); 1.0796 (0.6); 1.0770 (0.6); 1.0655 (1.7); 1.0586 (2.0); 1.0481 (1.1); 1.0445 (1.0); 1.0366 (1.8); 1.0303 (1.9); 1.0164 (0.8); 1.0095 (0.5); 0.9953 (2.8); 0.9789 (1.0); 0.9709 (5.4); 0.9566 (0.8); 0.9465 (2.2); 0.9156 (0.5); 0.8909 (0.5); 0.8678 (0.5); 0.8306 (0.9); 0.8244 (1.0); 0.8151 (1.9); 0.8078 (2.0); 0.7988 (2.0); 0.7912 (1.3); 0.7822 (0.7); 0.1127 (1.0); 0.1062 (2.8); 0.0355 (7.4); 0.0246 (0.3)

I-143: $^1$H-NMR(300.2 MHz, CDCl3):
δ = 8.0094 (5.3); 7.5950 (1.5); 7.5749 (4.2); 7.5723 (3.6); 7.5592 (0.4); 7.5547 (0.4); 7.4835 (2.0); 7.4536 (0.4); 7.4279 (21.0); 7.4067 (1.0); 7.3988 (0.7); 7.2984 (2.4); 6.3373 (1.6); 6.0795 (1.0); 6.0748 (1.3); 5.9068 (0.9); 5.9021 (1.3); 5.8973 (0.9); 5.3335 (2.5); 4.7576 (1.2); 4.7526 (1.2); 4.6921 (1.2); 4.6870 (1.2); 2.7327 (16.0); 2.0729 (0.6); 1.2919 (0.7); 0.1096 (1.1); 0.0362 (3.0)

I-144: $^1$H-NMR(499.9 MHz, CDCl3):
δ = 7.9500 (5.0); 7.5200 (6.9); 7.4341 (4.4); 7.3359 (2.8); 7.2584 (4.2); 6.9615 (0.4); 6.9468 (0.5); 6.9150 (2.7); 6.8972 (6.3); 6.6860 (3.0); 6.6707 (2.7); 6.6113 (0.6); 6.5725 (3.3); 5.2952 (1.8); 4.1339 (6.8); 4.1179 (7.2); 4.0341 (1.7); 4.0153 (2.9); 2.7247 (0.4); 2.6630 (16.0); 2.2822 (1.4); 2.2344 (14.6); 2.1731 (0.8); 2.0322 (14.5); 1.6016 (0.4); 1.2559 (0.6); −0.0002 (4.9)

I-145: $^1$H-NMR(499.9 MHz, CDCl3):
δ = 7.5306 (0.6); 7.5151 (1.6); 7.4996 (1.8); 7.4919 (2.0); 7.4762 (0.7); 7.4076 (2.0); 7.3601 (1.2); 7.3447 (1.0); 7.2592 (4.1); 6.9892 (2.6); 6.9854 (2.4); 6.9750 (2.4); 6.9003 (1.3); 6.8849 (1.0); 4.7171 (1.4); 4.1491 (0.6); 4.1435 (1.1); 4.1281 (1.3); 4.1228 (0.9); 3.9091 (0.4); 3.9032 (0.6); 3.8979 (0.6); 3.8920 (0.7); 3.8858 (0.9); 3.8812 (1.8); 3.8606 (1.3); 3.8503 (0.8); 2.9734 (0.5); 2.9631 (0.6); 2.9459 (1.0); 2.9353 (1.0); 2.8527 (0.8); 2.8349 (0.9); 2.8250 (0.8); 2.8072 (0.7); 2.5795 (14.3); 2.5470 (0.3); 2.3914 (14.2); 2.2747 (16.0); 2.2196 (0.4); 2.2012 (0.4); 1.5881 (0.4); 0.0710 (3.5); −0.0002 (4.8); −0.0066 (0.4)

I-146: $^1$H-NMR(499.9 MHz, CDCl3):
δ = 7.5302 (0.5); 7.5147 (1.4); 7.4991 (1.6); 7.4916 (1.9); 7.4760 (0.6); 7.4079 (1.8); 7.3599 (1.1); 7.3446 (0.9); 7.2591 (2.8); 6.9888 (2.4); 6.9853 (2.3); 6.9748 (2.1); 6.9001 (1.2); 6.8847 (0.9); 4.7263 (1.4); 4.1475 (0.6); 4.1421 (1.0); 4.1266 (1.2); 4.1214 (0.8); 3.9082 (0.4); 3.9022 (0.6); 3.8970 (0.6); 3.8912 (0.7); 3.8805 (1.7); 3.8601 (1.1); 3.8498 (0.7); 2.9728 (0.5); 2.9626 (0.5); 2.9453 (1.0); 2.9348 (0.9); 2.8531 (0.8); 2.8352 (0.8); 2.8253 (0.7); 2.8077 (0.6); 2.5787 (12.1); 2.3909 (12.0); 2.2748 (16.0); 1.5934 (1.1); −0.0002 (3.3)

I-147: $^1$H-NMR(300.2 MHz, CDCl3):
δ = 8.1266 (16.0); 7.3610 (6.9); 7.3540 (7.4); 7.2986 (28.3); 7.1781 (6.5); 7.1505 (9.8); 7.1224 (2.9); 7.1187 (3.2); 7.0710 (2.4); 7.0653 (2.9); 7.0470 (2.7); 7.0425 (3.5); 7.0205 (1.6); 7.0150 (1.6); 6.9503 (4.3); 6.9432 (4.2); 6.9231 (3.4); 6.9160 (3.4); 6.9038 (2.1); 6.8984 (2.0); 6.8770 (3.3); 6.8553 (1.7); 6.8499 (1.6); 6.1439 (3.0); 5.3379 (0.6); 4.2090 (2.4); 4.1989 (2.9); 4.1732 (3.4); 4.1632 (3.8); 4.0718 (0.4); 4.0555 (1.0); 4.0451 (1.6); 4.0293 (1.8); 4.0154 (1.8); 4.0068 (1.2); 3.9990 (1.2); 3.9893 (0.8); 3.9789 (4.3); 3.9634 (2.4); 3.9432 (3.0); 3.9276 (2.2); 3.2102 (2.2); 3.1937 (2.2); 3.1654 (3.4); 3.1487 (3.2); 3.0043 (3.3); 2.9744 (3.2); 2.9595 (2.4); 2.9291 (2.2); 2.1590 (0.6); 2.1417 (1.2); 2.1306 (1.4); 2.1136 (2.5); 2.0962 (1.5); 2.0845 (1.7); 2.0677 (0.7); 1.5879 (12.6); 1.2976 (0.8); 1.1100 (1.2); 1.1069 (1.2); 1.0953 (4.1); 1.0891 (4.8); 1.0785 (2.8); 1.0746 (2.2); 1.0670 (4.4); 1.0608 (4.5); 1.0499 (1.7); 1.0469 (1.6); 0.9194 (0.6); 0.8969 (0.5); 0.8420 (2.5); 0.8355 (2.3); 0.8267 (5.1); 0.8192 (5.0); 0.8101 (5.8); 0.8028 (3.3); 0.7932 (1.9); 0.7711 (0.4); 0.0485 (1.2); 0.0375 (35.8); 0.0271 (1.5)

TABLE 2-continued

I-148: $^{1}$H-NMR(300.2 MHz, CDCl3):
δ = 8.6134 (4.6); 8.5969 (3.1); 8.5803 (2.8); 8.3197 (7.6); 8.2906 (0.3); 7.6531 (4.4); 7.6361 (4.6); 7.4188 (2.7); 7.3985 (3.0); 7.3817 (3.0); 7.3716 (1.2); 7.3631 (1.2); 7.3546 (1.6); 7.3486 (1.3); 7.3411 (1.0); 7.3329 (0.8); 7.2983 (6.2); 7.0579 (0.4); 7.0214 (2.4); 6.9959 (2.8); 6.9299 (3.1); 6.7168 (1.7); 6.6923 (1.4); 6.2299 (2.2); 4.3686 (1.2); 4.3583 (1.3); 4.3333 (1.4); 4.3228 (1.5); 4.2424 (0.5); 4.1686 (1.0); 4.1448 (1.0); 4.1213 (0.5); 3.9694 (0.6); 3.9551 (0.8); 3.9368 (0.8); 3.9253 (0.7); 3.9208 (0.7); 3.8874 (2.1); 3.8661 (1.1); 3.8521 (1.7); 3.8307 (1.1); 3.0843 (1.0); 3.0696 (1.0); 3.0388 (1.3); 3.0238 (1.2); 2.7768 (1.4); 2.7436 (1.4); 2.7315 (1.2); 2.6979 (1.0); 2.4409 (16.0); 2.3600 (0.8); 2.3378 (1.0); 2.3159 (15.2); 2.1936 (14.2); 2.1050 (0.9); 2.0807 (5.0): 1.6993 (0.5): 1.3186 (1.1); 1.2948 (2.3); 1.2710 (1.1); 0.9711 (0.4); 0.1075 (0.4); 0.0358 (6.8)
I-149: $^{1}$H-NMR(300.2 MHz, CDCl3):
δ = 8.7500 (6.2); 8.4871 (4.3); 8.4181 (2.7); 8.4018 (2.8); 7.8519 (2.5); 7.8357 (2.4); 7.6405 (3.2); 7.6232 (3.4); 7.4022 (1.8); 7.3547 (0.7); 7.3459 (0.7); 7.3379 (1.1); 7.3319 (0.9); 7.3243 (0.7); 7.3162 (0.5); 7.2983 (5.5); 7.0230 (1.8); 6.9975 (2.1); 6.9320 (2.1); 6.7300 (1.2); 6.7051 (1.0); 6.1511 (1.5); 4.3642 (0.8); 4.3539 (0.9); 4.3291 (1.0); 4.3187 (1.0); 4.1687 (0.6); 4.1448 (0.6); 4.0491 (16.0); 3.9724 (0.4); 3.9600 (0.5); 3.9392 (0.6); 3.9254 (1.1); 3.9084 (0.3); 3.8959 (1.6); 3.8746 (0.8); 3.8607 (1.3); 3.8395 (0.8); 3.0783 (0.7); 3.0637 (0.7); 3.0330 (1.0); 3.0178 (0.9); 2.7866 (1.0); 2.7538 (1.0); 2.7412 (0.8); 2.7081 (0.7); 2.3399 (0.4); 2.3152 (11.2); 2.1984 (10.4); 2.0808 (3.1); 1.6921 (0.4); 1.3187 (0.7); 1.2949 (1.5); 1.2710 (0.7); 0.1076 (0.4); 0.0360 (6.1)
I-150: $^{1}$H-NMR(300.2 MHz, CDCl3):
δ = 8.7825 (4.1); 8.7771 (2.6); 8.7676 (2.7); 8.7623 (4.2); 7.4856 (4.4); 7.4802 (2.8); 7.4708 (2.8); 7.4654 (4.3); 7.2985 (11.6); 7.1942 (0.4); 7.1874 (0.5); 7.1671 (1.4); 7.1604 (1.3); 7.1503 (3.5); 7.1390 (1.4); 7.1282 (2.1); 7.1007 (0.7); 7.0879 (1.7); 7.0623 (2.4); 7.0250 (2.3); 6.9585 (1.4); 6.9323 (1.0); 6.8642 (0.8); 6.8577 (0.8); 6.8409 (1.1); 6.8322 (1.1); 6.8215 (0.6); 6.8104 (0.6); 4.8753 (1.6); 4.2537 (0.6); 4.2452 (1.4); 4.2196 (1.3); 4.2110 (0.8); 4.1939 (0.4); 4.1701 (1.0); 4.1463 (1.0); 4.1226 (0.4); 3.9990 (0.4); 3.9889 (0.6); 3.9799 (0.6); 3.9702 (0.8); 3.9544 (1.8); 3.9209 (1.2); 3.9028 (0.7); 3.0597 (0.5); 3.0428 (0.5); 3.0137 (1.1); 2.9960 (1.0); 2.9256 (0.9); 2.8959 (0.9); 2.8793 (0.6); 2.8503 (0.6); 2.5007 (16.0); 2.3340 (11.8); 2.3151 (11.2); 2.1464 (0.6); 2.1356 (0.6); 2.1185 (1.0); 2.1012 (0.7); 2.0822 (4.6); 1.6283 (2.1); 1.3203 (1.2); 1.2965 (2.4); 1.2727 (1.2); 1.0862 (0.6); 1.0714 (1.8); 1.0644 (2.1); 1.0500 (1.0); 1.0427 (1.9); 1.0361 (2.0); 1.0221 (0.7); 0.8338 (0.8); 0.8191 (2.3); 0.8139 (2.3); 0.8019 (2.2); 0.7963 (2.2); 0.7805 (0.6); 0.1073 (0.9); 0.0479 (0.7); 0.0372 (14.0); 0.0263 (0.6)
I-151: $^{1}$H-NMR(499.9 MHz, CDCl3):
δ = 8.1189 (16.0); 7.6061 (9.8); 7.5959 (8.2); 7.5791 (0.9); 7.3657 (5.3); 7.2964 (7.3); 7.2923 (7.7); 7.2809 (0.7); 7.2726 (2.2); 7.2671 (2.9); 7.2605 (19.7); 7.2497 (2.3); 7.1243 (6.1); 7.1079 (7.4); 6.9526 (4.3); 6.9484 (4.5); 6.9363 (3.7); 6.9321 (3.8); 6.0300 (3.4); 4.1553 (2.8); 4.1491 (3.3); 4.1335 (3.6); 4.1272 (3.9); 4.0208 (0.4); 4.0142 (0.9); 4.0106 (1.1); 4.0042 (1.9); 3.9943 (2.0); 3.9869 (2.1); 3.9808 (1.4); 3.9765 (1.3); 3.9703 (0.7); 3.9265 (3.9); 3.9169 (3.1); 3.9046 (3.3); 3.8951 (2.8); 3.1355 (2.4); 3.1250 (2.5); 3.1084 (3.5); 3.0978 (3.4); 2.9774 (3.4); 2.9593 (3.4); 2.9503 (2.7); 2.9321 (2.5); 2.6072 (0.4); 1.5517 (6.0); 1.2553 (0.8); 0.0060 (0.9); −0.0002 (19.7); −0.0064 (1.5)
I-152: $^{1}$H-NMR(499.9 MHz, CDCl3):
δ = 8.1188 (16.0); 7.6063 (9.7); 7.5986 (4.9); 7.5960 (7.2); 7.5788 (0.5); 7.3667 (4.9); 7.2965 (7.4); 7.2923 (7.2); 7.2725 (2.6); 7.2670 (3.4); 7.2606 (19.6); 7.2496 (1.5); 7.1243 (5.9); 7.1079 (6.8); 6.9527 (4.4); 6.9485 (4.3); 6.9364 (3.6); 6.9322 (3.4); 6.0339 (3.2); 4.1552 (2.9); 4.1489 (3.1); 4.1334 (3.5); 4.1271 (3.4); 4.0207 (0.6); 4.0143 (1.0); 4.0107 (1.3); 4.0042 (1.9); 3.9944 (1.9); 3.9868 (1.9); 3.9825 (1.1); 3.9806 (1.1); 3.9765 (1.0); 3.9701 (0.5); 3.9265 (3.8); 3.9169 (3.0); 3.9045 (3.1); 3.8950 (2.4); 3.4879 (0.6); 3.1355 (2.4); 3.1249 (2.4); 3.1083 (3.3); 3.0978 (3.0); 2.9775 (3.3); 2.9593 (3.3); 2.9504 (2.5); 2.9322 (2.3); 2.6073 (0.7); 1.5530 (5.2); 1.2553 (0.6); 0.0062 (1.6); −0.0002 (19.8); −0.0067 (0.8)
I-153: $^{1}$H-NMR(300.2 MHz, CDCl3):
δ = 8.1653 (3.3); 8.1409 (3.5); 7.2983 (38.6); 7.2320 (0.6); 7.2158 (0.9); 7.2059 (1.1); 7.1892 (1.2); 7.1786 (1.5); 7.1553 (1.7); 7.1296 (1.0); 7.1048 (0.7); 7.0998 (0.5); 7.0784 (0.3); 7.0140 (1.2); 6.9839 (1.4); 6.9217 (1.1); 6.8903 (1.1); 6.7110 (0.6); 6.6867 (1.0); 6.6651 (0.6); 6.1834 (0.7); 6.1180 (0.7); 4.3248 (0.4); 4.3151 (0.8); 4.3045 (0.6); 4.2908 (0.6); 4.2800 (1.0); 4.2697 (0.5); 3.9084 (0.6); 3.8933 (0.6); 3.8697 (1.7); 3.8469 (0.4); 3.8368 (1.0); 3.8163 (0.5); 3.0525 (0.5); 3.0142 (0.6); 3.0078 (0.7); 2.9995 (0.6); 2.9917 (0.6); 2.9070 (0.6); 2.8940 (0.5); 2.8819 (0.4); 2.8666 (0.6); 2.7792 (0.6); 2.7544 (0.6); 2.7404 (0.6); 2.7094 (0.4); 2.7016 (0.5); 2.3385 (0.4); 2.3086 (10.6); 2.1787 (5.6); 2.1461 (5.6); 2.0392 (0.3); 2.0220 (0.4); 2.0127 (0.4); 2.0000 (0.6); 1.9825 (0.6); 1.9731 (0.8); 1.9557 (0.8); 1.9432 (0.4); 1.9339 (0.4); 1.9168 (0.4); 1.7648 (0.4); 1.7572 (0.4); 1.7518 (0.5); 1.7444 (0.6); 1.7377 (0.4); 1.7296 (0.4); 1.7235 (0.5); 1.7159 (0.5); 1.7026 (0.4); 1.5781 (16.0); 1.2983 (0.9); 0.9416 (0.3); 0.9202 (1.0); 0.8969 (0.4); 0.0487 (1.8); 0.0379 (50.8); 0.0270 (1.9)
I-154: $^{1}$H-NMR(300.2 MHz, CDCl3):
δ = 8.0367 (4.6); 7.5989 (1.5); 7.5797 (3.8); 7.4870 (1.9); 7.4537 (0.8); 7.4427 (1.4); 7.4319 (3.0); 7.4032 (2.8); 7.2983 (10.6); 6.9827 (3.7); 6.9535 (3.2); 6.5887 (1.0); 4.9199 (0.9); 4.8869 (0.9); 3.9353 (0.5); 3.8517 (16.0); 2.7829 (0.8); 2.7547 (14.0); 2.6993 (0.4); 1.3221 (0.5); 1.2933 (1.1); 0.8898 (0.4); 0.8730 (0.4); 0.1076 (2.6); 0.0480 (0.6); 0.0375 (12.9); 0.0266 (0.6)
I-155: $^{1}$H-NMR(300.2 MHz, CDCl3):
δ = 7.9810 (2.8); 7.9566 (2.8); 7.2986 (19.6); 7.2114 (0.7); 7.1942 (0.6); 7.1862 (2.0); 7.1788 (1.0); 7.1669 (1.3); 7.1586 (0.8); 7.1499 (0.6); 7.1377 (1.6); 7.1293 (0.9); 7.1192 (1.3); 7.1148 (1.3); 7.1066 (0.6); 7.0901 (0.5); 7.0237 (1.2); 6.9982 (1.4); 6.9244 (1.1); 6.8946 (1.1); 6.7220 (0.6); 6.6985 (1.0); 6.6775 (0.5); 6.2293 (0.7); 6.1603 (0.7); 4.2987 (0.5); 4.2905 (0.9); 4.2828 (0.6); 4.2640 (0.6); 4.2558 (1.0); 4.2479 (0.6); 3.9088 (0.5); 3.8935 (0.6); 3.8674 (1.8); 3.8469 (0.5); 3.8346 (1.1); 3.8142 (0.6); 3.0483 (0.4); 3.0408 (0.5); 3.0337 (0.4); 3.0264 (0.4); 3.0042 (0.6); 2.9969 (0.7); 2.9879 (0.6); 2.9803 (0.6); 2.9011 (0.6); 2.8896 (0.4); 2.8740 (0.4); 2.8611 (0.6); 2.7966 (0.7); 2.7708 (0.7); 2.7660 (0.6); 2.7566 (0.6); 2.7515 (0.6); 2.7261 (0.6); 2.7203 (0.5); 2.6709 (16.0); 2.3101 (11.2); 2.1872 (5.6); 2.1560 (5.6); 2.0840 (0.8); 2.0196 (0.3); 2.0022 (0.4); 1.9929 (0.4); 1.9798 (0.7); 1.9758 (0.6); 1.9627 (0.7); 1.9533 (0.8); 1.9362 (0.8); 1.9233 (0.4); 1.9139 (0.4); 1.8967 (0.4); 1.7537 (0.4); 1.7471 (0.4); 1.7403 (0.5); 1.7337 (0.5); 1.7260 (0.4); 1.7193 (0.4); 1.7115 (0.5); 1.7052 (0.5); 1.6986 (0.4); 1.6919 (0.4); 1.5911 (8.7); 1.3217 (0.4); 1.2979 (0.9); 0.9202 (0.6); 0.0488 (0.9); 0.0380 (25.2); 0.0289 (0.7); 0.0272 (0.9)
I-156: $^{1}$H-NMR(499.9 MHz, CDCl3):
δ = 8.0662 (16.0); 7.6775 (0.3); 7.5574 (0.9); 7.5470 (10.9); 7.5344 (4.9); 7.5187 (1.1); 7.2627 (5.6); 7.2584 (8.8); 7.2297 (2.1); 7.2253 (2.8); 7.2167 (2.6); 7.2122 (3.2); 7.2070 (1.6); 7.2004 (0.3); 7.1965 (0.3); 7.1591 (2.8); 7.1543 (3.8); 7.1472 (5.9); 7.1399 (7.1); 7.1316 (1.7); 7.1226 (2.7); 7.1158 (15.4); 7.1106 (11.3); 7.1070 (5.8); 7.1030 (6.6); 5.8108 (3.9); 3.9784 (0.4); 3.9747 (0.5); 3.9662 (1.2); 3.9568 (1.7); 3.9523 (1.5); 3.9475 (1.8); 3.9383 (1.3); 3.9299 (0.6); 3.9261 (0.5); 3.3707 (2.7); 3.3632 (2.8); 3.3492 (3.1); 3.3417 (3.0); 3.0213 (2.5); 3.0117 (2.6); 2.9946 (3.0); 2.9849 (2.9); 2.9726 (3.5); 2.9599 (3.4); 2.9510 (3.2); 2.9383 (3.1); 2.7010 (3.1); 2.6816 (3.1); 2.6743 (2.9); 2.6549 (2.8); 2.1657 (0.9); 1.9962 (1.6); −0.0002 (6.1); −0.0064 (0.4)
I-157: $^{1}$H-NMR(300.2 MHz, CDCl3):
δ = 7.5877 (1.1); 7.5682 (2.8); 7.5649 (2.5); 7.4429 (1.4); 7.4139 (0.6); 7.4039 (0.9); 7.3966 (0.7); 7.3832 (0.6); 7.3764 (0.4); 7.2986 (13.5); 7.0347 (2.6); 7.0092 (1.9); 6.9550 (1.1); 6.9288 (0.6); 4.6804 (1.0); 4.2132 (0.8); 4.1872 (0.9); 4.1697 (0.3); 3.9684 (0.5); 3.9452 (1.3); 3.9147 (1.0); 3.8981 (0.4); 3.0411 (0.4); 3.0247 (0.4); 2.9952 (0.7); 2.9789 (0.7); 2.9067 (0.7); 2.8770 (0.6); 2.8608 (0.4); 2.8301 (0.3); 2.5760 (11.7); 2.5600 (0.9); 2.3191 (16.0); 1.5850 (11.2); 1.3042 (0.8); 1.2975 (0.8); 0.9200 (0.8); 0.8963 (0.3); 0.1074 (0.4); 0.0487 (0.8); 0.0379 (15.9); 0.0271 (0.7)

TABLE 2-continued

I-158: $^1$H-NMR(300.2 MHz, CDCl3):
δ = 8.9079 (6.3); 8.9070 (6.2); 8.8864 (0.6); 8.5297 (9.5); 8.5072 (0.8); 8.4290 (6.5); 8.4278 (6.5); 8.2951 (0.6); 7.6427 (5.0); 7.6394 (4.6); 7.6308 (2.4); 7.6254 (3.4); 7.5965 (0.4); 7.3836 (2.6); 7.3378 (1.1); 7.3289 (1.2); 7.3243 (0.9); 7.3192 (1.7); 7.3127 (1.4); 7.3064 (1.2); 7.2987 (14.4); 7.1089 (0.4); 7.0586 (0.7); 7.0153 (2.6); 6.9898 (3.0); 6.9244 (3.0); 6.7060 (1.6); 6.6817 (1.4); 6.2183 (2.1); 4.3836 (1.0); 4.3747 (1.3); 4.3487 (1.4); 4.3395 (1.4); 4.1709 (0.7); 4.1471 (0.7); 3.9700 (0.6); 3.9484 (0.8); 3.9440 (0.7); 3.9371 (0.9); 3.9269 (0.7); 3.9208 (0.8); 3.9030 (2.6); 3.8819 (1.0); 3.8683 (2.0); 3.8469 (1.3); 3.8362 (0.4); 3.0858 (1.0); 3.0718 (1.0); 3.0406 (1.4); 3.0254 (1.3); 2.7771 (1.4); 2.7446 (1.4); 2.7319 (1.2); 2.6988 (1.1); 2.3618 (1.6); 2.3512 (1.0); 2.3387 (2.2); 2.3155 (16.0); 2.2758 (0.4); 2.1828 (14.8); 2.0829 (3.6); 1.6485 (1.3); 1.3206 (1.0); 1.2968 (2.0); 1.2730 (0.9); 0.1082 (0.5); 0.0482 (0.6); 0.0374 (16.4); 0.0265 (0.6)
I-159: $^1$H-NMR(300.2 MHz, CDCl3):
δ = 8.4940 (8.2); 7.7014 (0.5); 7.6819 (5.2); 7.6590 (2.2); 7.6326 (0.7); 7.3703 (2.6); 7.3145 (1.2); 7.3069 (1.7); 7.2987 (7.7); 7.2924 (1.5); 7.2848 (1.7); 7.2774 (0.8); 6.9847 (2.5); 6.9593 (2.9); 6.9157 (3.0); 6.6783 (1.7); 6.6536 (1.4); 6.1265 (2.0); 4.3831 (1.2); 4.3737 (1.3); 4.3477 (1.4); 4.3383 (1.4); 3.9448 (0.6); 3.9293 (0.8); 3.9234 (0.8); 3.9116 (0.8); 3.9007 (0.6); 3.8953 (0.7); 3.8888 (0.6); 3.8805 (0.5); 3.8694 (2.4); 3.8479 (1.1); 3.8342 (1.9); 3.8127 (1.2); 3.0851 (1.0); 3.0706 (1.0); 3.0397 (1.4); 3.0247 (1.3); 2.7366 (1.5); 2.7033 (1.4); 2.6913 (1.2); 2.6575 (1.1); 2.3027 (16.0); 2.1679 (14.8); 1.5940 (1.8); 0.1091 (0.5); 0.0491 (0.4); 0.0385 (8.5); 0.0277 (0.4)
I-160: $^1$H-NMR(499.9 MHz, CDCl3):
δ = 7.9338 (4.8); 7.5181 (0.8); 7.5024 (2.0); 7.4865 (1.3); 7.4227 (1.6); 7.4073 (1.2); 7.2604 (3.1); 7.2056 (2.2); 7.1446 (1.2); 7.1423 (1.2); 7.1284 (1.1); 7.1261 (1.1); 6.9589 (2.1); 6.9436 (2.4); 6.8862 (2.5); 6.7753 (1.2); 6.6850 (1.4); 6.6694 (1.3); 6.6626 (2.7); 6.5497 (1.3); 6.1586 (1.6); 4.2517 (1.1); 4.2452 (1.2); 4.2302 (1.2); 4.2237 (1.2); 3.8719 (0.5); 3.8679 (0.5); 3.8622 (0.7); 3.8584 (0.6); 3.8521 (0.7); 3.8487 (0.6); 3.8451 (0.5); 3.8427 (0.5); 3.8041 (1.7); 3.7915 (1.1); 3.7825 (1.5); 3.7699 (1.1); 2.9866 (0.9); 2.9771 (1.0); 2.9592 (1.1); 2.9498 (1.2); 2.7112 (1.2); 2.6915 (1.2); 2.6839 (1.1); 2.6641 (1.0); 2.6575 (0.3); 2.6324 (16.0); 2.2577 (13.2); 2.1642 (12.4); 1.9988 (8.9); 1.6185 (0.4); −0.0002 (3.0)
I-161: $^1$H-NMR(499.9 MHz, CDCl3):
δ = 9.7273 (0.4); 7.9335 (5.0); 7.5179 (0.8); 7.5022 (1.9); 7.4863 (1.3); 7.4227 (1.7); 7.4073 (1.2); 7.2606 (3.3); 7.2053 (2.2); 7.1441 (1.2); 7.1420 (1.2); 7.1279 (1.1); 7.1257 (1.1); 6.9587 (2.1); 6.9435 (2.4); 6.8862 (2.6); 6.7753 (1.2); 6.6850 (1.4); 6.6693 (1.4); 6.6625 (2.6); 6.5497 (1.2); 6.1582 (1.6); 4.2517 (1.1); 4.2452 (1.2); 4.2302 (1.2); 4.2236 (1.2); 3.8718 (0.5); 3.8623 (0.7); 3.8585 (0.7); 3.8521 (0.7); 3.8451 (0.6); 3.8429 (0.6); 3.8039 (1.6); 3.7913 (1.1); 3.7823 (1.4); 3.7697 (1.1); 2.9866 (0.9); 2.9771 (0.9); 2.9592 (1.1); 2.9498 (1.2); 2.7111 (1.2); 2.6914 (1.2); 2.6838 (1.1); 2.6639 (1.1); 2.6568 (0.8); 2.6321 (16.0); 2.3083 (0.6); 2.2577 (12.8); 2.1642 (12.1); 1.9990 (10.8); −0.0002 (3.3)
I-162: $^1$H-NMR(499.9 MHz, CDCl3):
δ = 8.1157 (16.0); 7.6279 (0.5); 7.6114 (8.6); 7.6012 (10.4); 7.5857 (0.3); 7.4499 (7.6); 7.4462 (7.8); 7.3769 (5.4); 7.2770 (0.6); 7.2690 (2.4); 7.2607 (20.0); 7.2513 (2.2); 7.2464 (1.6); 7.1025 (2.6); 7.0988 (2.5); 7.0862 (5.8); 7.0825 (5.9); 7.0603 (9.2); 7.0440 (4.0); 6.0336 (3.3); 4.1497 (2.9); 4.1434 (3.1); 4.1278 (3.5); 4.1216 (3.6); 4.0169 (0.5); 4.0069 (1.2); 4.0003 (1.8); 3.9907 (2.0); 3.9831 (1.9); 3.9770 (1.2); 3.9729 (1.0); 3.9666 (0.5); 3.9268 (3.8); 3.9173 (2.9); 3.9049 (3.1); 3.8955 (2.5); 3.7962 (0.4); 3.1210 (2.4); 3.1105 (2.4); 3.0939 (3.4); 3.0833 (3.2); 2.9674 (3.4); 2.9493 (3.4); 2.9403 (2.5); 2.9221 (2.4); 2.6088 (0.6); 2.3990 (0.4); 2.0028 (13.4); 1.5537 (2.3); 1.2554 (1.2); 0.8456 (0.4); −0.0002 (18.8); −0.0067 (0.7)
I-163: $^1$H-NMR(499.9 MHz, CDCl3):
δ = 8.1153 (16.0); 7.6280 (0.4); 7.6114 (8.6); 7.6011 (11.0); 7.5855 (0.4); 7.4498 (8.0); 7.4460 (8.5); 7.3767 (5.7); 7.2773 (0.5); 7.2694 (2.0); 7.2607 (21.2); 7.2517 (2.5); 7.2466 (1.8); 7.1025 (2.7); 7.0987 (2.6); 7.0862 (6.0); 7.0825 (6.2); 7.0720 (0.3); 7.0604 (9.6); 7.0441 (4.3); 6.0313 (3.2); 4.1495 (2.7); 4.1433 (3.2); 4.1276 (3.4); 4.1214 (3.7); 4.0169 (0.5); 4.0070 (1.1); 4.0005 (1.8); 3.9910 (1.9); 3.9834 (1.9); 3.9732 (1.1); 3.9669 (0.5); 3.9270 (3.7); 3.9176 (2.9); 3.9051 (3.0); 3.8957 (2.5); 3.1210 (2.5); 3.1104 (2.5); 3.0938 (3.5); 3.0833 (3.4); 2.9676 (3.4); 2.9495 (3.4); 2.9405 (2.6); 2.9223 (2.4); 2.6113 (0.6); 2.0026 (14.9); 1.5559 (1.7); 1.4318 (0.5); 1.2842 (0.4); 1.2554 (1.6); 1.2420 (0.3); 1.2147 (2.0); 1.2025 (1.9); 0.8586 (0.5); 0.8456 (0.7); 0.0772 (0.4); 0.0700 (9.6); 0.0628 (0.5); 0.0062 (0.7); −0.0002 (20.6); −0.0067 (1.0)
I-164: $^1$H-NMR(499.9 MHz, CDCl3):
δ = 8.1190 (8.7); 7.6120 (2.8); 7.6088 (2.2); 7.6032 (4.6); 7.6017 (5.2); 7.3536 (2.5); 7.2606 (8.1); 7.2117 (3.7); 7.2039 (1.6); 7.2001 (1.6); 7.1969 (0.9); 7.1939 (1.2); 7.1887 (0.9); 7.0098 (1.1); 7.0060 (1.1); 6.9936 (1.9); 6.9898 (2.0); 6.9514 (3.7); 6.9352 (2.2); 6.0439 (1.7); 4.2125 (0.8); 4.2077 (1.6); 4.1923 (1.6); 4.1874 (1.0); 3.8828 (0.5); 3.8773 (0.7); 3.8722 (0.7); 3.8670 (0.8); 3.8581 (2.3); 3.8487 (1.2); 3.8375 (2.0); 3.8265 (1.1); 2.9836 (0.9); 2.9790 (0.6); 2.9740 (0.9); 2.9562 (1.4); 2.9517 (0.6); 2.9464 (1.4); 2.7712 (1.1); 2.7624 (0.3); 2.7523 (1.1); 2.7436 (1.1); 2.7248 (1.0); 2.2805 (16.0); 2.0022 (11.9); 1.5574 (1.0); 1.2555 (0.3); −0.0002 (8.9); −0.0067 (0.5)
I-165: $^1$H-NMR(499.9 MHz, CDCl3):
δ = 8.1193 (8.3); 7.6296 (0.3); 7.6122 (3.2); 7.6089 (2.5); 7.6036 (4.6); 7.6019 (5.0); 7.3545 (2.5); 7.2606 (8.3); 7.2151 (3.3); 7.2118 (3.8); 7.2039 (1.5); 7.2000 (1.5); 7.1968 (0.8); 7.1938 (1.1); 7.1886 (0.8); 7.0097 (1.2); 7.0058 (1.1); 6.9935 (2.0); 6.9897 (1.9); 6.9514 (3.7); 6.9352 (2.1); 6.0440 (1.7); 4.2129 (0.9); 4.2081 (1.5); 4.1926 (1.6); 4.1880 (1.0); 3.8879 (0.3); 3.8828 (0.6); 3.8774 (0.8); 3.8722 (0.8); 3.8670 (1.0); 3.8583 (2.4); 3.8489 (1.1); 3.8376 (1.9); 3.8266 (1.0); 2.9837 (1.0); 2.9793 (0.6); 2.9741 (0.9); 2.9563 (1.5); 2.9465 (1.3); 2.7711 (1.1); 2.7618 (0.4); 2.7521 (1.2); 2.7435 (1.0); 2.7247 (0.9); 2.2806 (16.0); 2.0024 (11.8); 1.5566 (1.2); 1.2555 (0.5); 0.0062 (0.7); −0.0002 (9.1); −0.0068 (0.3)
I-166: $^1$H-NMR(499.9 MHz, CDCl3):
δ = 7.9800 (4.0); 7.6528 (1.6); 7.6368 (1.6); 7.5021 (0.3); 7.4846 (1.9); 7.4746 (3.6); 7.3536 (1.9); 7.3302 (1.7); 7.3207 (1.3); 7.3150 (2.6); 7.2592 (6.5); 7.2414 (1.4); 7.2252 (0.7); 7.0794 (3.8); 7.0548 (1.0); 7.0405 (1.5); 7.0248 (0.8); 6.1856 (1.4); 5.2969 (3.7); 5.0872 (0.7); 5.0789 (0.8); 5.0712 (0.8); 5.0628 (0.7); 4.4304 (0.9); 4.4219 (0.8); 4.4083 (1.0); 4.3999 (0.9); 4.0363 (1.1); 4.0199 (1.1); 4.0143 (1.1); 3.9980 (1.0); 3.7432 (12.5); 2.6938 (12.0); 2.0019 (16.0); 1.5663 (1.8); −0.0002 (6.4)
I-167: $^1$H-NMR(499.9 MHz, CDCl3):
δ = 7.9811 (5.0); 7.6528 (1.7); 7.6368 (1.8); 7.5022 (0.4); 7.4863 (2.0); 7.4841 (2.0); 7.4808 (1.8); 7.4760 (3.5); 7.4742 (3.7); 7.3531 (1.9); 7.3315 (1.8); 7.3200 (1.4); 7.3152 (2.9); 7.3099 (1.0); 7.3045 (0.5); 7.2584 (9.2); 7.2435 (1.3); 7.2417 (1.6); 7.2271 (0.8); 7.2254 (0.7); 7.0793 (4.4); 7.0566 (1.0); 7.0551 (1.1); 7.0409 (1.7); 7.0266 (0.8); 7.0251 (0.8); 6.1856 (1.5); 5.2966 (5.4); 5.0893 (0.8); 5.0870 (0.8); 5.0810 (0.8); 5.0785 (0.8); 5.0732 (0.8); 5.0708 (0.8); 5.0647 (0.7); 5.0625 (0.7); 4.4320 (0.9); 4.4308 (0.9); 4.4238 (0.9); 4.4224 (0.9); 4.4101 (1.0); 4.4088 (1.0); 4.4017 (0.9); 4.0362 (1.4); 4.0199 (1.4); 4.0142 (1.3); 3.9979 (1.2); 3.7434 (16.0); 2.6940 (15.3); 1.5617 (1.5); 0.0061 (0.7); −0.0002 (9.3); −0.0066 (0.4)
I-168: $^1$H-NMR(499.9 MHz, CDCl3):
δ = 8.2557 (2.7); 8.2516 (3.0); 7.9074 (5.3); 7.7310 (3.1); 7.7269 (3.2); 7.5203 (0.5); 7.5111 (2.2); 7.5067 (2.2); 7.4897 (1.9); 7.4749 (2.1); 7.4700 (1.9); 7.4649 (2.0); 7.4504 (0.9); 7.2318 (1.4); 7.1902 (31.8); 5.2290 (11.7); 5.0100 (0.6); 5.0025 (0.9); 4.9964 (0.8); 4.9940 (0.9); 4.9864 (0.9); 4.9803 (0.7); 4.7926 (1.2); 4.7848 (1.2); 4.7717 (1.3); 4.7638 (1.2); 4.0730 (0.4); 4.0587 (1.2); 4.0444 (1.2); 4.0301 (0.4); 3.2432 (1.3); 3.2268 (1.4); 3.2223 (1.5); 3.2059 (1.3); 2.6335 (16.0); 2.2104 (0.3); 1.9741 (5.4); 1.9358 (4.1); 1.4856 (2.6); 1.2233 (0.4); 1.2142 (0.4); 1.2032 (1.8); 1.1889 (4.1); 1.1845 (2.9); 1.1747 (1.9); 1.1627 (0.4); 1.0994 (0.4); 1.0959 (0.4); 1.0867 (0.5); 1.0832 (0.5); 1.0629 (0.3); 0.8101 (0.5); 0.1164 (0.4); −0.0002 (89.6); −0.0638 (1.1); −0.0703 (34.5); −0.0765 (2.9); −0.1196 (0.6)

TABLE 2-continued

I-169: $^1$H-NMR(300.2 MHz, CDCl3):
δ = 7.9111 (1.1); 7.9004 (1.1); 7.6445 (0.4); 7.6184 (1.5); 7.5972 (4.4); 7.5809 (0.8); 7.4673 (2.4); 7.4407 (1.0); 7.4320 (1.5); 7.4247 (1.0); 7.4112 (1.0); 7.4033 (0.6); 7.2983 (9.1); 7.0593 (1.8); 7.0332 (5.3); 6.9629 (1.7); 6.9360 (1.0); 5.3359 (1.0); 4.6975 (1.5); 4.2290 (0.4); 4.2125 (1.2); 4.1865 (1.4); 4.1700 (0.6); 3.9993 (0.8); 3.9840 (2.1); 3.9561 (1.8); 3.4764 (0.4); 3.0485 (0.4); 3.0324 (0.5); 3.0028 (1.2); 2.9866 (1.2); 2.9551 (1.2); 2.9383 (1.1); 2.9264 (2.1); 2.9140 (1.5); 2.9024 (1.1); 2.8834 (16.0); 2.8174 (1.7); 2.5233 (0.6); 2.3283 (14.0); 2.3172 (13.6); 1.7869 (0.3); 1.6704 (0.6); 1.2915 (0.4); 0.9114 (0.6); 0.8877 (2.5); 0.8695 (2.5); 0.8641 (2.0); 0.8465 (0.8); 0.6380 (0.8); 0.6239 (1.9); 0.6207 (2.1); 0.6143 (2.1); 0.6077 (2.0); 0.6034 (1.9); 0.5847 (0.6); 0.1071 (0.6); 0.0474 (0.4); 0.0366 (9.9); 0.0259 (0.4)
I-170: $^1$H-NMR(300.2 MHz, CDCl3):
δ = 8.2165 (16.0); 8.0518 (0.3); 7.3659 (6.9); 7.3589 (7.1); 7.2985 (23.7); 7.1937 (5.7); 7.1664 (8.3); 7.1391 (3.9); 7.1104 (3.7); 7.0889 (2.6); 7.0825 (3.3); 7.0653 (2.8); 7.0600 (3.4); 7.0406 (3.9); 7.0329 (1.7); 7.0040 (3.5); 6.9816 (3.9); 6.9453 (7.6); 6.9388 (4.7); 6.9186 (3.5); 6.9115 (3.4); 6.8823 (1.9); 6.8762 (1.9); 6.8561 (3.0); 6.8341 (1.7); 6.8287 (1.6); 6.2618 (6.3); 6.2023 (7.7); 5.6757 (6.2); 5.6384 (5.8); 4.2157 (2.3); 4.2056 (2.9); 4.1940 (0.5); 4.1800 (3.2); 4.1701 (4.2); 4.1464 (0.7); 4.0792 (0.4); 4.0630 (1.0); 4.0526 (1.6); 4.0367 (1.8); 4.0231 (1.8); 4.0137 (1.1); 4.0066 (1.2); 3.9883 (4.1); 3.9730 (2.2); 3.9528 (2.9); 3.9372 (2.0); 3.2175 (2.1); 3.2010 (2.1); 3.1728 (3.2); 3.1560 (3.0); 3.0166 (3.1); 2.9927 (3.3); 2.9870 (3.2); 2.9719 (2.2); 2.9417 (2.1); 2.9206 (2.4); 2.1596 (0.6); 2.1422 (1.2); 2.1311 (1.3); 2.1140 (2.4); 2.0968 (1.5); 2.0824 (3.7); 2.0686 (0.8); 1.6048 (10.8); 1.3674 (0.4); 1.3437 (0.9); 1.3200 (2.2); 1.3034 (5.6); 1.2965 (6.0); 1.2726 (1.2); 1.0968 (1.1); 1.0932 (1.2); 1.0823 (4.1); 1.0755 (4.9); 1.0650 (2.8); 1.0610 (2.2); 1.0536 (4.4); 1.0473 (4.5); 1.0366 (1.7); 1.0330 (1.6); 1.0156 (0.3); 0.9405 (2.0); 0.9187 (6.2); 0.8955 (2.4); 0.8721 (0.3); 0.8570 (0.4); 0.8351 (2.4); 0.8287 (2.4); 0.8199 (4.9); 0.8123 (4.9); 0.8033 (5.6); 0.7960 (3.4); 0.7864 (2.0); 0.7653 (0.4); 0.1069 (1.6); 0.0476 (0.9); 0.0367 (27.9); 0.0259 (1.2)
I-171: $^1$H-NMR(300.2 MHz, CDCl3):
δ = 8.7047 (5.9); 7.3638 (2.4); 7.3568 (2.4); 7.2983 (9.5); 7.2052 (0.6); 7.1955 (2.0); 7.1784 (1.4); 7.1743 (1.4); 7.1683 (2.5); 7.1516 (1.0); 7.1485 (1.0); 7.0983 (0.8); 7.0925 (0.9); 7.0744 (0.9); 7.0695 (1.1); 7.0477 (0.5); 7.0423 (0.5); 6.9592 (1.4); 6.9521 (1.4); 6.9320 (1.2); 6.9246 (1.6); 6.9181 (0.7); 6.8965 (1.1); 6.8750 (0.5); 6.8697 (0.5); 5.9875 (1.0); 5.9804 (1.0); 4.2173 (0.7); 4.2075 (0.9); 4.1817 (1.1); 4.1721 (1.2); 4.0697 (0.3); 4.0587 (0.5); 4.0428 (0.6); 4.0294 (0.6); 4.0217 (0.4); 4.0132 (0.4); 4.0029 (1.5); 3.9877 (0.7); 3.9671 (0.9); 3.9520 (0.7); 3.2195 (0.7); 3.2032 (0.7); 3.1749 (1.1); 3.1580 (1.0); 3.0299 (1.0); 3.0005 (1.0); 2.9853 (0.7); 2.9553 (0.7); 2.8133 (16.0); 2.1621 (0.4); 2.1508 (0.4); 2.1338 (0.8); 2.1164 (0.5); 2.1055 (0.4); 1.5939 (8.3); 1.3033 (1.1); 1.1217 (0.4); 1.1183 (0.4); 1.1070 (1.4); 1.1001 (1.6); 1.0896 (0.9); 1.0854 (0.7); 1.0783 (1.5); 1.0719 (1.5); 1.0607 (0.5); 1.0574 (0.5); 0.9398 (0.4); 0.9183 (1.3); 0.8951 (0.5); 0.8541 (0.8); 0.8467 (0.8); 0.8381 (1.6); 0.8314 (1.5); 0.8219 (1.8); 0.8151 (1.1); 0.8046 (0.6); 0.1064 (0.8); 0.0470 (0.3); 0.0362 (11.2); 0.0270 (0.4); 0.0254 (0.5)
I-172: $^1$H-NMR(300.2 MHz, CDCl3):
δ = 7.9751 (0.4); 7.9587 (9.7); 7.3650 (5.0); 7.3580 (5.0); 7.2986 (22.6); 7.1915 (4.0); 7.1642 (5.0); 7.1556 (1.5); 7.1283 (3.0); 7.1004 (2.8); 7.0838 (2.1); 7.0773 (2.4); 7.0602 (2.1); 7.0550 (2.4); 7.0336 (1.2); 7.0278 (1.0); 6.9428 (3.0); 6.9357 (2.8); 6.9155 (2.5); 6.9085 (2.4); 6.8686 (1.4); 6.8620 (1.4); 6.8445 (2.3); 6.8202 (1.3); 6.8151 (1.2); 6.2138 (2.1); 4.2037 (1.7); 4.1938 (2.2); 4.1690 (2.7); 4.1580 (2.6); 4.1468 (1.2); 4.1234 (0.5); 4.0699 (0.4); 4.0534 (0.8); 4.0426 (1.2); 4.0271 (1.4); 4.0135 (1.4); 4.0067 (1.0); 3.9972 (1.0); 3.9877 (0.7); 3.9760 (2.9); 3.9605 (1.7); 3.9402 (2.1); 3.9247 (1.5); 3.2112 (1.5); 3.1945 (1.5); 3.1663 (2.3); 3.1496 (2.2); 3.0271 (2.3); 3.0095 (2.9); 3.0018 (7.1); 2.9766 (7.9); 2.9656 (2.1); 2.9512 (2.6); 2.9350 (1.6); 2.9219 (0.5); 2.1568 (0.4); 2.1403 (1.0); 2.1293 (1.1); 2.1122 (1.9); 2.0950 (1.3); 2.0828 (5.9); 2.0667 (0.6); 1.6148 (2.5); 1.4036 (7.7); 1.3783 (16.0); 1.3529 (7.3); 1.3203 (1.3); 1.2965 (2.6); 1.2727 (1.2); 1.2154 (0.4); 1.1480 (0.4); 1.0921 (1.0); 1.0880 (1.0); 1.0773 (3.2); 1.0709 (3.7); 1.0605 (2.2); 1.0562 (1.9); 1.0488 (3.4); 1.0427 (3.4); 1.0322 (1.4); 1.0282 (1.3); 0.9962 (0.4); 0.9723 (0.5); 0.8534 (0.4); 0.8310 (1.9); 0.8247 (2.0); 0.8160 (3.7); 0.8083 (3.8); 0.7993 (4.2); 0.7919 (2.6); 0.7826 (1.5); 0.7618 (0.4); 0.1065 (2.1); 0.0474 (1.0); 0.0367 (23.3); 0.0258 (1.2)
I-173: $^1$H-NMR(499.9 MHz, CDCl3):
δ = 8.0750 (10.2); 7.5797 (0.4); 7.5743 (0.7); 7.5721 (0.7); 7.5616 (5.6); 7.5567 (1.8); 7.5488 (2.2); 7.5330 (0.5); 7.3157 (2.5); 7.2584 (10.3); 7.2355 (1.0); 7.2313 (1.4); 7.2266 (0.7); 7.2244 (0.7); 7.2221 (1.3); 7.2178 (1.7); 7.2126 (0.7); 6.9483 (2.7); 6.9331 (2.8); 6.8612 (2.8); 6.6324 (1.6); 6.6172 (1.4); 5.7973 (1.9); 5.3681 (1.4); 5.2968 (2.2); 3.9547 (0.3); 3.9459 (0.7); 3.9418 (0.7); 3.9381 (0.8); 3.9320 (0.7); 3.9263 (0.8); 3.9224 (0.6); 3.9183 (0.6); 3.3820 (1.2); 3.3747 (1.2); 3.3606 (1.3); 3.3533 (1.2); 2.9929 (1.3); 2.9855 (2.2); 2.9730 (1.7); 2.9647 (2.5); 2.9563 (1.4); 2.9516 (1.5); 2.6989 (1.5); 2.6792 (1.5); 2.6717 (1.3); 2.6520 (1.2); 2.2512 (16.0); 2.1429 (14.8); 1.5545 (3.0); 0.0063 (0.7); −0.0002 (12.8); −0.0069 (0.4)
I-174: $^1$H-NMR(300.2 MHz, CDCl3):
δ = 7.2988 (1.7); 7.2858 (0.4); 7.2716 (0.7); 7.2672 (0.7); 7.2586 (0.7); 7.2522 (0.8); 7.2430 (0.6); 7.2361 (0.6); 7.2293 (0.6); 7.2239 (0.7); 7.2126 (0.7); 7.1962 (1.0); 7.1862 (1.0); 7.1695 (0.5); 7.1593 (0.5); 7.1255 (0.8); 7.1030 (1.1); 7.0796 (0.5); 7.0528 (0.8); 7.0416 (0.9); 7.0162 (3.6); 6.9458 (1.5); 6.9201 (0.9); 5.3334 (2.0); 4.9457 (0.8); 4.9061 (0.8); 4.2042 (0.5); 4.1782 (0.7); 4.1695 (0.6); 4.1588 (0.6); 4.1327 (0.7); 3.9242 (1.4); 3.9023 (1.3); 3.8966 (1.3); 3.8787 (0.4); 3.8700 (0.6); 3.8517 (0.3); 3.0245 (0.5); 3.0073 (0.5); 2.9790 (1.0); 2.9614 (0.9); 2.9093 (0.6); 2.8818 (1.1); 2.8650 (1.0); 2.8523 (1.0); 2.8363 (1.0); 2.8254 (0.7); 2.8080 (0.5); 2.5437 (7.4); 2.5354 (7.6); 2.3073 (16.0); 1.9572 (0.6); 1.9401 (0.5); 1.9343 (0.5); 1.9173 (0.6); 1.7314 (0.4); 1.7185 (0.6); 1.7070 (0.6); 1.6904 (0.6); 1.6786 (0.6); 1.6662 (0.5); 1.6511 (0.4); 0.0413 (1.7)
I-175: $^1$H-NMR(499.9 MHz, CDCl3):
δ = 8.1195 (16.0); 7.6182 (0.4); 7.6034 (1.7); 7.5876 (5.7); 7.5816 (5.2); 7.5658 (4.7); 7.5502 (2.0); 7.5190 (0.4); 7.4077 (6.5); 7.3915 (9.2); 7.3626 (0.4); 7.3384 (5.3); 7.3098 (8.6); 7.2936 (6.3); 7.2606 (13.4); 7.1951 (2.8); 7.1799 (2.9); 7.1768 (2.0); 6.0747 (3.3); 4.2144 (2.4); 4.2084 (2.9); 4.1930 (3.1); 4.1871 (3.1); 3.9386 (0.4); 3.9324 (0.6); 3.9279 (1.1); 3.9222 (1.5); 3.9172 (1.5); 3.9125 (1.6); 3.9090 (1.6); 3.9036 (1.6); 3.8982 (1.3); 3.8934 (1.4); 3.8849 (4.5); 3.8742 (2.0); 3.8635 (3.5); 3.8528 (2.4); 3.0894 (2.0); 3.0797 (2.0); 3.0625 (2.5); 3.0526 (2.4); 2.8706 (2.7); 2.8519 (2.6); 2.8438 (2.3); 2.8248 (2.1); 1.5603 (13.3); 0.0063 (0.5); −0.0002 (14.7); −0.0066 (0.7)
I-176: $^1$H-NMR(300.2 MHz, CDCl3):
δ = 7.5785 (1.0); 7.5541 (2.1); 7.5236 (0.3); 7.4362 (1.4); 7.4208 (0.8); 7.4141 (1.0); 7.4074 (0.5); 7.3900 (0.6); 7.2987 (7.1); 7.0418 (1.2); 7.0276 (1.7); 7.0168 (2.0); 6.9547 (1.1); 6.9293 (0.6); 4.6790 (1.0); 4.2087 (0.8); 4.1829 (1.0); 3.9618 (0.5); 3.9391 (1.3); 3.9086 (1.0); 3.8914 (0.4); 3.0338 (0.4); 3.0180 (0.4); 2.9879 (0.8); 2.9716 (0.7); 2.9056 (0.7); 2.8756 (0.6); 2.8601 (0.4); 2.8296 (0.4); 2.6636 (12.4); 2.4262 (12.0); 2.3187 (16.0); 1.5962 (0.3); 0.1200 (0.6); 0.1082 (10.9); 0.0959 (0.6); 0.0489 (0.5); 0.0381 (9.0); 0.0274 (0.4)
I-177: $^1$H-NMR(300.2 MHz, CDCl3):
δ = 8.1047 (3.8); 7.6302 (0.7); 7.6045 (9.5); 7.5800 (4.1); 7.5496 (0.9); 7.5306 (2.7); 7.4646 (5.7); 7.4454 (1.3); 7.2986 (19.1); 7.0484 (3.1); 7.0039 (0.7); 6.9679 (5.2); 6.9417 (0.7); 5.8345 (2.0); 4.1620 (0.4); 4.1422 (1.4); 4.1174 (1.7); 4.0972 (0.6); 3.8625 (0.9); 3.8432 (2.6); 3.8278 (1.6); 3.8197 (2.4); 3.8008 (0.8); 2.9570 (0.7); 2.9388 (0.7); 2.9110 (1.3); 2.8926 (1.2); 2.8047 (1.2); 2.7784 (1.2); 2.7586 (0.7); 2.7326 (0.7); 2.3389 (15.0); 2.3200 (16.0); 2.2962 (0.7); 2.1853 (14.1); 1.5955 (6.9); 1.3715 (0.3); 1.3224 (0.5); 1.2931 (1.8); 1.2605 (0.4); 0.8940 (0.5); 0.8779 (0.4); 0.8692 (0.5); 0.1078 (1.8); 0.0380 (17.5); 0.0273 (0.9)

TABLE 2-continued

I-178: $^1$H-NMR(300.2 MHz, CDCl3):
δ = 7.5813 (1.0); 7.5568 (2.0); 7.5525 (1.8); 7.4325 (1.4); 7.4168 (0.7); 7.4104 (1.0); 7.4035 (0.5); 7.3943 (0.4); 7.3859 (0.6); 7.2986 (11.4); 7.0383 (1.2); 7.0276 (1.6); 7.0138 (1.9); 6.9541 (1.0); 6.9284 (0.6); 6.0502 (0.5); 6.0168 (0.8); 5.9938 (0.8); 5.9603 (0.6); 5.3793 (0.4); 5.3749 (1.1); 5.3703 (1.1); 5.3183 (0.9); 5.3138 (0.9); 5.3095 (0.4); 5.1848 (1.0); 5.1804 (1.0); 5.1514 (0.9); 5.1471 (0.9); 4.6572 (1.0); 4.2069 (0.8); 4.1811 (0.9); 3.9819 (2.4); 3.9787 (1.8); 3.9591 (2.6); 3.9556 (1.9); 3.9377 (1.2); 3.9140 (0.4); 3.9070 (1.0); 3.8901 (0.4); 3.0315 (0.4); 3.0153 (0.4); 2.9852 (0.7); 2.9692 (0.7); 2.9026 (0.6); 2.8726 (0.6); 2.8573 (0.4); 2.8263 (0.3); 2.4189 (12.6); 2.3181 (16.0); 1.5980 (1.2); 0.1075 (0.9); 0.0487 (0.4); 0.0378 (13.0); 0.0270 (0.5)
I-179: $^1$H-NMR(499.9 MHz, CDCl3):
δ = 8.0923 (8.6); 7.6036 (0.4); 7.5877 (2.2); 7.5825 (1.9); 7.5797 (2.0); 7.5762 (5.3); 7.5744 (5.4); 7.5007 (2.6); 7.4372 (0.9); 7.4310 (1.5); 7.4266 (1.5); 7.4189 (1.2); 7.4141 (0.8); 7.2588 (5.5); 7.2181 (2.8); 7.2023 (3.1); 6.9924 (2.8); 6.9089 (1.5); 6.9076 (1.5); 6.8933 (1.4); 6.8920 (1.4); 6.7314 (1.7); 4.1307 (1.3); 4.1238 (1.5); 4.1086 (1.7); 4.1017 (1.7); 3.8850 (1.6); 3.8743 (1.8); 3.8629 (1.4); 3.8521 (1.6); 3.6649 (0.5); 3.6594 (0.7); 3.6572 (0.7); 3.6503 (0.9); 3.6412 (0.8); 3.6358 (0.6); 3.1578 (1.5); 3.1485 (1.6); 3.1306 (1.8); 3.1212 (1.8); 2.8608 (1.7); 2.8420 (1.7); 2.8335 (1.6); 2.8148 (1.4); 2.3860 (0.4); 2.2862 (16.0); 2.2623 (15.6); 0.0710 (0.4); −0.0002 (6.1); −0.0066 (0.4)
I-180: $^1$H-NMR(499.9 MHz, CDCl3):
δ = 7.7251 (1.0); 7.6237 (0.5); 7.6081 (2.0); 7.5940 (4.9); 7.5800 (0.5); 7.4353 (2.6); 7.4001 (1.0); 7.3961 (1.6); 7.3822 (1.2); 7.3682 (0.5); 7.3523 (0.4); 7.2596 (9.2); 7.0813 (0.6); 7.0035 (2.4); 6.9950 (3.3); 6.9891 (3.2); 6.9209 (1.9); 6.9055 (1.4); 5.2980 (1.7); 4.6981 (2.0); 4.1913 (1.4); 4.1847 (0.6); 4.1755 (1.6); 4.1657 (0.6); 4.1550 (0.5); 4.1429 (0.4); 3.9415 (2.5); 3.9235 (1.8); 3.9136 (0.7); 3.4298 (16.0); 3.0029 (0.8); 2.9934 (0.8); 2.9751 (1.2); 2.9655 (1.1); 2.8886 (1.1); 2.8707 (1.1); 2.8613 (0.8); 2.8427 (0.7); 2.8020 (15.4); 2.4847 (1.4); 2.3464 (2.0); 2.2881 (14.9); 2.2812 (13.5); 2.1644 (0.8); 2.0397 (0.7); 1.5484 (2.2); 1.2568 (0.6); −0.0002 (10.3)
I-181: $^1$H-NMR(499.9 MHz, CDCl3):
δ = 8.1255 (7.3); 7.5722 (0.6); 7.5643 (3.7); 7.5625 (4.3); 7.5570 (1.6); 7.5503 (1.8); 7.5345 (0.4); 7.3179 (2.1); 7.2585 (8.0); 7.2422 (0.9); 7.2379 (1.1); 7.2329 (0.6); 7.2292 (1.1); 7.2248 (1.2); 7.2193 (0.6); 6.9353 (2.1); 6.9200 (2.3); 6.8670 (2.3); 6.6343 (1.3); 6.6193 (1.1); 5.8391 (0.9); 3.9805 (0.6); 3.9720 (0.6); 3.1553 (0.8); 3.1479 (0.8); 3.1335 (0.9); 3.1263 (0.8); 2.9821 (1.1); 2.9725 (1.1); 2.9548 (1.4); 2.9380 (16.0); 2.6823 (1.2); 2.6627 (1.2); 2.6551 (1.1); 2.6356 (1.0); 2.6195 (1.4); 2.6065 (1.4); 2.5976 (1.3); 2.5847 (1.2); 2.2760 (0.5); 2.2452 (12.8); 2.1515 (11.7); 0.0699 (0.6); 0.0062 (0.5); −0.0002 (8.6)
I-182: $^1$H-NMR(499.9 MHz, CDCl3):
δ = 8.1228 (9.3); 7.5650 (0.8); 7.5572 (4.5); 7.5555 (5.6); 7.5503 (2.0); 7.5431 (2.3); 7.5273 (0.5); 7.3565 (0.4); 7.3124 (2.7); 7.2582 (12.1); 7.2329 (1.1); 7.2288 (1.5); 7.2239 (0.8); 7.2199 (1.4); 7.2156 (1.6); 7.2101 (0.8); 6.9374 (2.7); 6.9221 (2.8); 6.8645 (3.0); 6.6315 (1.6); 6.6166 (1.4); 5.7947 (0.8); 3.9664 (0.7); 3.1671 (0.8); 3.1491 (1.8); 3.1349 (3.0); 3.1206 (2.8); 3.1065 (1.0); 2.9815 (1.0); 2.9719 (1.0); 2.9543 (1.2); 2.9448 (1.1); 2.6713 (1.4); 2.6589 (1.8); 2.6518 (1.7); 2.6456 (2.5); 2.6373 (1.7); 2.6244 (2.5); 2.2914 (0.7); 2.2456 (16.0); 2.2122 (0.7); 2.1496 (14.7); 1.3100 (3.3); 1.2958 (6.4); 1.2816 (3.1); 1.2712 (0.4); 1.0585 (0.4); 0.0062 (1.0); −0.0002 (14.5); −0.0068 (0.6)
I-183: $^1$H-NMR(300.2 MHz, CDCl3):
δ = 8.1668 (16.0); 7.6526 (0.8); 7.6388 (8.2); 7.6357 (9.3); 7.6154 (4.3); 7.5891 (1.1); 7.3838 (4.5); 7.2983 (33.3); 7.2874 (2.4); 7.2797 (2.8); 7.2646 (3.1); 7.2543 (9.2); 7.2256 (10.0); 7.0435 (6.7); 7.0171 (5.3); 6.1203 (3.3); 5.3377 (5.5); 4.2605 (2.8); 4.2348 (3.2); 4.2274 (1.6); 4.2167 (0.8); 3.9614 (0.3); 3.9432 (0.9); 3.9331 (1.3); 3.9253 (1.5); 3.9103 (4.3); 3.9024 (3.9); 3.8764 (3.8); 3.8579 (1.8); 3.0841 (1.7); 3.0697 (1.6); 3.0390 (2.7); 3.0237 (2.5); 2.8493 (2.2); 2.8332 (0.7); 2.8182 (2.2); 2.8044 (1.8); 2.7731 (1.6); 1.5856 (12.7); 1.3466 (0.5); 1.2925 (1.1); 0.9180 (0.3); 0.1069 (5.2); 0.0478 (1.5); 0.0371 (44.2); 0.0262 (1.9); −0.0297 (0.4)
I-184: $^1$H-NMR(400.2 MHz, $d_6$-DMSO):
δ = 10.1012 (5.6); 8.2715 (16.0); 7.8018 (5.5); 7.7810 (14.2); 7.7760 (8.8); 7.7625 (3.8); 7.7422 (4.5); 7.7307 (5.9); 7.7234 (5.3); 7.7038 (2.2); 7.6876 (3.6); 7.6686 (2.1); 7.4753 (3.7); 7.4700 (3.6); 7.4542 (3.3); 7.4488 (3.3); 5.5264 (1.7); 5.5161 (1.9); 5.4964 (2.0); 5.4854 (1.8); 3.8482 (1.8); 3.8377 (2.0); 3.8142 (2.4); 3.8038 (2.2); 3.5946 (2.4); 3.5636 (3.1); 3.5303 (2.0); 3.3414 (13.7); 2.6716 (0.4); 2.5069 (50.8); 2.5025 (68.1); 2.4980 (50.1); 2.3336 (0.4); 2.3293 (0.4); 0.0080 (0.4); 0.0001 (8.2)
I-185: $^1$H-NMR(300.1 MHz, $d_6$-DMSO):
δ = 11.0094 (5.2); 8.2358 (16.0); 8.1566 (0.6); 7.8011 (5.9); 7.7774 (1.1); 7.7518 (3.4); 7.7263 (5.7); 7.7094 (5.9); 7.6891 (5.8); 7.6643 (2.1); 7.5211 (6.5); 7.4927 (12.4); 7.4339 (14.4); 7.4055 (7.4); 5.0679 (2.0); 5.0498 (2.3); 5.0250 (2.5); 5.0069 (2.1); 3.3270 (1.5); 2.7891 (1.9); 2.7707 (2.1); 2.7343 (3.2); 2.7160 (2.8); 2.5516 (3.1); 2.5079 (33.8); 2.5022 (41.1); 2.4966 (30.5); 2.4538 (2.2); 2.0755 (3.5); −0.0005 (5.8)
I-186: $^1$H-NMR(400.2 MHz, $d_6$-DMSO):
δ = 8.1261 (10.9); 7.9532 (1.6); 7.6102 (1.0); 7.6062 (1.1); 7.5936 (1.2); 7.5896 (2.2); 7.5860 (1.4); 7.5738 (1.2); 7.5694 (1.2); 7.4468 (0.9); 7.4427 (1.0); 7.4297 (3.0); 7.4259 (3.7); 7.4221 (3.5); 7.4092 (1.8); 7.4048 (1.4); 7.3784 (1.8); 7.3753 (1.7); 7.3581 (2.2); 7.3548 (2.3); 7.3377 (0.8); 7.3342 (0.8); 7.0562 (2.7); 7.0371 (3.2); 6.9243 (3.3); 6.8250 (1.8); 6.8060 (1.5); 3.7625 (6.4); 3.7520 (1.2); 3.7434 (1.2); 3.7342 (1.0); 3.7250 (0.8); 3.7163 (0.5); 3.3321 (34.6); 2.8915 (11.2); 2.8527 (0.4); 2.8348 (0.4); 2.8180 (1.6); 2.8045 (2.7); 2.7883 (1.9); 2.7711 (0.4); 2.7323 (9.5); 2.5258 (0.7); 2.5209 (1.1); 2.5123 (13.2); 2.5079 (26.0); 2.5033 (33.7); 2.4988 (24.5); 2.4943 (11.9); 2.2407 (16.0); 2.1887 (14.6); −0.0002 (6.2)
I-187: $^1$H-NMR(300.2 MHz, CDCl3):
δ = 7.5821 (1.0); 7.5574 (2.0); 7.5527 (1.8); 7.5273 (0.3); 7.4362 (1.4); 7.4156 (0.7); 7.4087 (1.0); 7.4023 (0.5); 7.3896 (0.5); 7.3838 (0.6); 7.2983 (6.6); 7.0382 (1.3); 7.0267 (1.7); 7.0134 (1.9); 6.9532 (1.0); 6.9270 (0.6); 4.6657 (1.0); 4.2026 (0.8); 4.1768 (0.9); 3.9376 (1.3); 3.9084 (1.0); 3.8915 (0.4); 3.7231 (1.1); 3.7024 (3.0); 3.6838 (2.0); 3.5541 (2.0); 3.5348 (2.8); 3.5161 (1.0); 3.3973 (15.2); 3.0300 (0.4); 3.0142 (0.4); 2.9838 (0.7); 2.9678 (0.6); 2.9051 (0.6); 2.8755 (0.6); 2.8598 (0.4); 2.4285 (12.0); 2.3174 (16.0); 1.6183 (0.5); 0.1075 (0.6); 0.0373 (6.7)
I-188: $^1$H-NMR(300.2 MHz, CDCl3):
δ = 8.1487 (16.0); 8.0661 (1.0); 7.9641 (0.4); 7.6337 (14.9); 7.6204 (9.3); 7.5880 (1.9); 7.5348 (0.8); 7.5091 (0.6); 7.4441 (0.7); 7.3817 (8.9); 7.3435 (1.1); 7.2985 (9.3); 7.2789 (6.0); 7.2668 (5.7); 7.2598 (5.6); 7.2139 (12.5); 7.1860 (14.4); 7.1564 (1.8); 7.1269 (1.4); 7.1048 (1.4); 7.0827 (1.2); 7.0536 (0.7); 7.0325 (0.7); 7.0046 (0.8); 6.9449 (13.7); 6.9173 (11.0); 6.8539 (0.4); 6.7847 (0.4); 6.6385 (4.1); 6.5391 (0.6); 6.3933 (8.1); 6.2928 (0.4); 6.1479 (6.0); 6.1301 (7.0); 5.3349 (0.6); 4.2616 (4.6); 4.2357 (5.3); 4.1693 (0.4); 4.0366 (0.4); 4.0094 (0.5); 3.8795 (8.6); 3.8464 (5.2); 3.8273 (3.0); 3.7955 (0.8); 3.7618 (0.4); 3.0621 (3.1); 3.0478 (3.1); 3.0176 (4.7); 3.0019 (4.2); 2.9611 (0.4); 2.9155 (0.6); 2.8958 (0.8); 2.8711 (0.5); 2.8051 (3.7); 2.7739 (3.8); 2.7603 (3.5); 2.7291 (2.8); 1.6319 (6.7); 1.2900 (0.7); 0.1080 (1.8); 0.0354 (8.2)
I-189: $^1$H-NMR(300.2 MHz, CDCl3):
δ = 8.2358 (6.4); 7.4223 (0.7); 7.4143 (0.7); 7.3974 (1.2); 7.3897 (1.0); 7.3743 (1.0); 7.3681 (1.0); 7.2986 (10.7); 7.2206 (0.7); 7.2163 (0.5); 7.1932 (1.8); 7.1889 (1.6); 7.1658 (3.1); 7.1578 (1.5); 7.1447 (1.2); 7.1385 (1.5); 7.1173 (0.6); 7.1111 (0.5); 7.0280 (1.6); 7.0214 (2.1); 6.9953 (2.6); 6.9689 (1.6); 6.9321 (1.6); 6.9102 (2.3); 6.7312 (1.3); 6.7061 (1.0); 6.2635 (2.8); 6.2044 (2.4); 6.0891 (1.5); 5.6836 (2.7); 5.6467 (2.5); 4.3355 (0.9); 4.3258 (1.1); 4.3010 (1.1); 4.2909 (1.1); 4.1946 (1.2); 4.1708 (3.5); 4.1470 (3.5); 4.1232 (1.2); 3.9478 (0.4); 3.9309 (0.6); 3.9256 (0.6); 3.9199 (0.6); 3.9149 (0.7); 3.8989 (0.6);

3.8915 (0.6); 3.8812 (2.1); 3.8604 (0.7); 3.8463 (1.5); 3.8255 (1.0); 3.0598 (0.8); 3.0443 (0.8); 3.0148 (1.1); 2.9985 (1.0); 2.7882 (1.2); 2.7567 (1.1); 2.7432 (0.9); 2.7110 (0.8); 2.3124 (12.7); 2.1859 (11.9); 2.0831 (16.0); 1.6073 (6.4); 1.3205 (4.3); 1.2967 (8.9); 1.2729 (4.1); 0.9190 (0.7); 0.0475 (0.4); 0.0368 (13.3); 0.0259 (0.5)
I-190: $^1$H-NMR(499.9 MHz, CDCl3):
δ = 7.8522 (5.3); 7.2856 (0.7); 7.2820 (0.8); 7.2696 (1.5); 7.2664 (1.0); 7.2565 (0.9); 7.2534 (0.9); 7.1890 (5.2); 7.0843 (0.7); 7.0818 (0.7); 7.0678 (1.6); 7.0654 (1.7); 7.0495 (1.4); 7.0372 (1.1); 7.0337 (1.2); 7.0240 (1.1); 7.0210 (1.5); 7.0077 (0.6); 7.0047 (0.6); 6.9004 (2.1); 6.8851 (2.4); 6.7973 (2.7); 6.6168 (1.4); 6.6017 (1.3); 5.9699 (1.7); 4.1921 (1.1); 4.1856 (1.2); 4.1706 (1.2); 4.1640 (1.3); 3.8143 (0.5); 3.8042 (0.8); 3.8007 (0.7); 3.7948 (0.8); 3.7849 (0.6); 3.7748 (0.3); 3.7462 (1.6); 3.7337 (1.1); 3.7246 (1.4); 3.7121 (1.1); 2.9231 (0.9); 2.9132 (1.0); 2.8958 (1.2); 2.8858 (1.1); 2.6614 (1.2); 2.6419 (1.2); 2.6343 (1.1); 2.6146 (0.9); 2.5625 (16.0); 2.5522 (0.7); 2.2313 (0.4); 2.1965 (13.2); 2.0772 (12.4); 1.9725 (1.7); 1.1870 (0.8); 0.8644 (0.4); −0.0002 (6.5); −0.0712 (6.2)
I-192: $^1$H-NMR(300.2 MHz, CDCl3):
δ = 7.9700 (5.3); 7.2984 (10.0); 7.1265 (1.0); 7.1020 (2.4); 7.0711 (3.3); 7.0433 (3.3); 6.9991 (4.1); 6.8461 (1.2); 6.8231 (2.0); 6.8010 (1.2); 6.7718 (2.1); 6.7466 (1.8); 6.3163 (2.5); 5.3375 (0.5); 4.2789 (1.6); 4.2538 (1.7); 4.1710 (0.7); 4.1474 (0.6); 4.1243 (0.7); 4.1019 (1.0); 4.0797 (0.6); 3.8670 (2.9); 3.8345 (1.8); 3.8147 (0.9); 3.0478 (1.0); 3.0342 (1.0); 3.0035 (1.6); 2.9892 (1.4); 2.8809 (0.4); 2.8538 (0.9); 2.8271 (1.5); 2.7924 (1.9); 2.7602 (1.4); 2.7454 (1.3); 2.7149 (1.2); 2.6672 (16.0); 2.3330 (14.1); 2.1703 (0.6); 2.1520 (0.9); 2.1421 (1.1); 2.1255 (1.7); 2.1089 (1.4); 2.0972 (1.8); 2.0843 (5.8); 2.0467 (0.6); 1.9563 (1.9); 1.7832 (2.3); 1.7718 (2.0); 1.7617 (2.0); 1.7426 (1.7); 1.7277 (1.7); 1.7006 (2.2); 1.6854 (2.3); 1.6731 (2.6); 1.6612 (2.4); 1.6462 (2.8); 1.6231 (3.1); 1.4530 (1.7); 1.4312 (1.9); 1.4058 (1.5); 1.3817 (1.0); 1.3571 (0.6); 1.3210 (1.1); 1.2972 (2.0); 1.2733 (0.9); 1.0860 (1.2); 1.0662 (2.8); 1.0440 (2.6); 1.0381 (2.6); 1.0251 (1.5); 0.9970 (1.2); 0.9725 (1.8); 0.9480 (0.9); 0.9168 (0.4); 0.8813 (0.4); 0.8630 (0.4); 0.8108 (3.4); 0.7966 (3.3); 0.7784 (1.2); 0.1666 (0.7); 0.1346 (0.5); 0.1067 (2.7); 0.0367 (12.4)
I-193: $^1$H-NMR(300.2 MHz, CDCl3):
δ = 7.9644 (5.4); 7.2987 (2.7); 7.1288 (0.6); 7.1025 (1.7); 7.0806 (2.9); 7.0559 (2.5); 7.0283 (1.0); 7.0227 (1.2); 6.9999 (1.5); 6.9778 (0.7); 6.9724 (0.8); 6.9547 (2.6); 6.8572 (0.8); 6.8520 (0.8); 6.8310 (1.5); 6.8092 (0.8); 6.8042 (0.7); 6.7573 (1.4); 6.7317 (1.2); 6.3076 (1.8); 4.2720 (1.2); 4.2469 (1.4); 4.2397 (0.8); 4.1697 (0.4); 4.1460 (0.4); 4.1232 (0.4); 4.1013 (0.5); 3.8964 (0.6); 3.8902 (0.7); 3.8654 (2.0); 3.8323 (1.5); 3.8120 (0.8); 3.4151 (0.6); 3.3836 (0.7); 3.3569 (0.7); 3.0500 (0.7); 3.0350 (0.7); 3.0050 (1.2); 2.9895 (1.1); 2.7991 (0.9); 2.7681 (0.9); 2.7539 (0.9); 2.7232 (0.8); 2.6653 (16.0); 2.3352 (12.8); 2.3128 (0.6); 2.3068 (0.6); 2.3011 (0.5); 2.2876 (0.8); 2.2777 (1.5); 2.2678 (1.3); 2.2521 (1.5); 2.2418 (1.0); 2.2342 (0.6); 2.2281 (0.7); 2.2194 (0.4); 2.1710 (0.3); 2.1531 (0.6); 2.1420 (0.7); 2.1249 (1.2); 2.1078 (0.8); 2.0965 (0.9); 2.0831 (3.5); 2.0579 (0.6); 2.0519 (0.7); 2.0378 (0.7); 2.0307 (1.4); 2.0207 (1.6); 2.0086 (1.9); 2.0025 (2.4); 1.9921 (1.8); 1.9860 (1.4); 1.9635 (0.6); 1.9595 (0.6); 1.9500 (0.5); 1.8559 (0.4); 1.8338 (0.8); 1.8265 (0.9); 1.8173 (0.7); 1.8078 (0.6); 1.7991 (0.4); 1.3201 (0.5); 1.2962 (1.0); 1.2725 (0.4); 1.0892 (0.8); 1.0751 (1.8); 1.0686 (2.0); 1.0550 (1.4); 1.0468 (1.9); 1.0403 (1.9); 1.0268 (1.0); 0.9968 (0.5); 0.9723 (0.9); 0.9478 (0.4); 0.8330 (1.0); 0.8155 (2.4); 0.8019 (2.3); 0.7820 (0.7); 0.1808 (0.4); 0.1757 (0.4); 0.1696 (0.4); 0.1095 (0.3); 0.0373 (3.0)
I-194: $^1$H-NMR(300.1 MHz, $d_6$-DMSO):
δ = 11.1329 (3.6); 8.2414 (16.0); 7.8090 (5.9); 7.7810 (1.0); 7.7555 (3.2); 7.7300 (5.4); 7.7122 (5.9); 7.6950 (5.4); 7.6717 (7.8); 7.6628 (9.3); 7.6556 (8.7); 7.6439 (7.6); 7.4971 (4.6); 7.4902 (4.2); 7.4690 (3.4); 7.4621 (3.2); 5.2573 (2.2); 5.2397 (2.5); 5.2122 (2.7); 5.1946 (2.2); 3.3274 (2.6); 2.7605 (1.8); 2.7426 (2.1); 2.7304 (0.4); 2.7234 (0.3); 2.7055 (2.9); 2.6878 (2.6); 2.5317 (3.7); 2.5097 (21.9); 2.5040 (28.0); 2.4983 (20.0); 2.4772 (2.6); 2.4317 (2.1); 2.0772 (5.8); −0.0001 (4.3)
I-195: $^1$H-NMR(400.2 MHz, $d_6$-DMSO):
δ = 10.0195 (2.3); 8.2622 (16.0); 7.7817 (1.1); 7.7626 (3.3); 7.7421 (3.8); 7.7200 (10.7); 7.7042 (2.4); 7.6810 (3.8); 7.6575 (9.8); 7.6361 (10.2); 7.4643 (10.8); 7.4431 (8.9); 5.2581 (2.0); 5.2477 (2.2); 5.2269 (2.3); 5.2163 (2.1); 4.0946 (0.6); 3.7996 (2.0); 3.7889 (2.2); 3.7658 (2.7); 3.7552 (2.4); 3.5227 (2.2); 3.4901 (3.4); 3.4574 (1.8); 3.3292 (14.2); 3.1609 (0.3); 2.8905 (1.6); 2.7309 (1.4); 2.6708 (0.4); 2.6670 (0.4); 2.5106 (24.6); 2.5064 (49.0); 2.5020 (65.0); 2.4975 (47.2); 2.4934 (23.2); 2.4441 (0.4); 2.3331 (0.4); 2.3286 (0.4); 2.3240 (0.3); 2.0762 (3.1); 0.0081 (0.3); 0.0000 (8.0)
I-196: $^1$H-NMR(499.9 MHz, CDCl3):
δ = 8.1061 (6.7); 7.2601 (6.1); 7.1886 (3.4); 7.1855 (4.3); 7.1563 (3.3); 6.9955 (2.6); 6.9802 (3.0); 6.9608 (3.2); 6.7899 (1.8); 6.7750 (1.6); 5.9616 (2.0); 4.2837 (1.3); 4.2770 (1.5); 4.2620 (1.5); 4.2553 (1.6); 3.9031 (0.6); 3.8990 (0.7); 3.8949 (0.9); 3.8906 (0.8); 3.8832 (1.0); 3.8795 (0.8); 3.8752 (0.8); 3.8633 (0.4); 3.8174 (1.9); 3.8049 (1.5); 3.7957 (1.8); 3.7832 (1.4); 3.0129 (1.1); 3.0037 (1.2); 2.9853 (1.4); 2.9761 (1.4); 2.7178 (1.5); 2.6975 (1.5); 2.6903 (1.4); 2.6699 (1.2); 2.2848 (16.0); 2.2322 (15.1); 2.1687 (0.9); 1.5633 (5.0); 0.0059 (0.4); −0.0002 (7.1)
I-197: $^1$H-NMR(499.9 MHz, CDCl3):
δ = 8.6129 (2.8); 8.5973 (2.7); 8.5222 (0.8); 8.4418 (0.7); 8.3317 (2.8); 8.3157 (2.8); 8.1354 (6.6); 7.9525 (0.7); 7.2620 (4.7); 6.9665 (2.7); 6.9513 (3.0); 6.9397 (0.5); 6.8818 (3.6); 6.7244 (2.0); 6.7093 (1.7); 5.8554 (2.2); 4.3135 (1.4); 4.3070 (1.5); 4.2918 (1.6); 4.2853 (1.5); 3.9004 (1.0); 3.8948 (1.0); 3.8890 (1.0); 3.8813 (0.8); 3.8300 (2.0); 3.8174 (1.5); 3.8083 (1.8); 3.7957 (1.3); 3.0382 (0.3); 3.0256 (1.3); 3.0160 (1.2); 2.9982 (1.6); 2.9886 (1.4); 2.7155 (1.5); 2.6953 (1.6); 2.6883 (1.4); 2.6680 (1.2); 2.3885 (0.6); 2.2738 (16.0); 2.2587 (0.9); 2.2436 (1.8); 2.1538 (15.4); 2.1422 (2.3); 2.0042 (6.7); 1.5956 (5.1); −0.0002 (5.7)
I-198: $^1$H-NMR(499.9 MHz, CDCl3):
δ = 8.3713 (3.3); 8.3687 (3.6); 8.1234 (3.2); 8.1185 (3.4); 8.1094 (6.3); 7.2615 (5.8); 7.0288 (1.9); 7.0247 (3.2); 7.0211 (2.2); 6.9419 (2.6); 6.9266 (2.9); 6.8872 (3.4); 6.6802 (1.8); 6.6651 (1.6); 6.0662 (2.2); 4.2829 (1.3); 4.2764 (1.4); 4.2613 (1.5); 4.2548 (1.5); 3.8778 (0.6); 3.8686 (0.9); 3.8584 (0.9); 3.8489 (0.7); 3.8086 (1.9); 3.7959 (1.3); 3.7870 (1.7); 3.7743 (1.2); 3.0064 (1.1); 2.9969 (1.2); 2.9790 (1.4); 2.9695 (1.3); 2.6971 (1.4); 2.6772 (1.4); 2.6698 (1.3); 2.6498 (1.2); 2.2634 (16.0); 2.1781 (15.3); 2.0038 (4.3); 1.9860 (0.4); 1.9759 (0.8); 1.9689 (0.9); 1.9591 (1.5); 1.9493 (1.0); 1.9424 (0.8); 1.9322 (0.4); 1.6075 (0.8); 1.1130 (0.8); 1.1013 (2.8); 1.0872 (2.6); 1.0845 (2.7); 1.0751 (0.8); 0.7733 (1.0); 0.7632 (3.2); 0.7526 (3.1); 0.7422 (0.9); −0.0002 (6.7)
I-199: $^1$H-NMR(400.2 MHz, $d_6$-DMSO):
δ = 8.0368 (10.5); 7.9520 (1.4); 7.5037 (0.4); 7.4984 (2.5); 7.4933 (1.0); 7.4795 (4.4); 7.4777 (4.2); 7.4632 (1.4); 7.4586 (3.7); 7.4528 (0.6); 7.4314 (2.0); 7.4243 (2.0); 7.3185 (1.7); 7.3161 (1.1); 7.3000 (2.8); 7.2840 (0.7); 7.2815 (1.2); 7.2790 (0.7); 7.2519 (4.1); 7.2491 (5.0); 7.2441 (1.3); 7.2302 (4.2); 7.2281 (3.5); 7.2216 (0.4); 7.0504 (2.7); 7.0312 (3.2); 6.9337 (3.2); 6.8020 (1.7); 6.7830 (1.5); 3.7570 (0.6); 3.7389 (1.6); 3.7292 (4.6); 3.7217 (3.3); 3.7100 (1.3); 3.7009 (1.7); 3.6821 (0.4); 3.3374 (62.1); 2.8904 (10.0); 2.8113 (0.4); 2.7942 (1.7); 2.7844 (2.2); 2.7796 (2.1); 2.7679 (1.9); 2.7504 (0.3); 2.7322 (8.6); 2.7314 (8.2); 2.5248 (0.7); 2.5199 (1.0); 2.5113 (13.1); 2.5069 (25.9); 2.5023 (33.6); 2.4977 (24.4); 2.4933 (11.9); 2.2340 (16.0); 2.1914 (14.7); −0.0002 (7.4)
I-200: $^1$H-NMR(400.2 MHz, $d_6$-DMSO):
δ = 8.0264 (10.8); 7.9518 (1.2); 7.4085 (2.1); 7.4010 (2.0); 7.3687 (1.5); 7.3493 (3.2); 7.3300 (1.9); 7.1216 (2.1); 7.1027 (1.8); 7.0468 (4.7); 7.0445 (4.3); 7.0405 (4.8); 7.0289 (3.4); 7.0199 (1.7); 6.9388 (3.2); 6.8064 (1.7); 6.7874 (1.5); 3.7542 (0.6);

TABLE 2-continued 3.7361 (1.6); 3.7260 (4.4); 3.7178 (3.2); 3.7058 (1.2); 3.6969 (1.8); 3.6783 (0.4); 3.3317 (40.4); 2.8901 (9.1); 2.7874 (1.9); 2.7811 (2.2); 2.7722 (2.0); 2.7639 (2.0); 2.7312 (7.8); 2.5244 (0.7); 2.5196 (1.0); 2.5109 (12.6); 2.5065 (25.4); 2.5019 (33.5); 2.4973 (24.5); 2.4928 (12.1); 2.3452 (15.8); 2.3289 (0.4); 2.2333 (16.0); 2.1965 (14.6); −0.0002 (6.0)
I-201: $^{1}$H-NMR(400.2 MHz, $d_6$-DMSO):
δ = 8.0473 (10.7); 7.9521 (2.0); 7.5156 (1.4); 7.4960 (3.6); 7.4762 (3.0); 7.4320 (1.7); 7.4290 (3.0); 7.4260 (2.2); 7.4130 (1.1); 7.4097 (2.0); 7.4068 (1.3); 7.3845 (2.8); 7.3790 (5.2); 7.3757 (4.2); 7.3702 (2.3); 7.3388 (1.8); 7.3362 (1.9); 7.3330 (1.6); 7.3303 (1.4); 7.3186 (1.4); 7.3159 (1.4); 7.3127 (1.4); 7.3100 (1.2); 7.0405 (2.8); 7.0213 (3.3); 6.9225 (3.3); 6.7801 (1.7); 6.7622 (1.5); 4.3067 (8.3); 3.7743 (0.4); 3.7558 (2.1); 3.7467 (4.4); 3.7315 (1.0); 3.7224 (1.4); 3.7167 (1.2); 3.7042 (0.8); 3.6954 (0.5); 3.3311 (34.2); 2.8906 (14.9); 2.7890 (3.5); 2.7722 (3.5); 2.7315 (12.4); 2.5248 (0.7); 2.5199 (1.0); 2.5114 (14.0); 2.5069 (28.3); 2.5024 (37.2); 2.4978 (27.3); 2.4933 (13.5); 2.2285 (16.0); 2.1921 (14.8); −0.0002 (8.1)
I-202: $^{1}$H-NMR(400.2 MHz, $d_6$-DMSO):
δ = 10.0480 (10.1); 8.0739 (11.2); 7.9525 (2.0); 7.8987 (1.3); 7.8957 (2.2); 7.8926 (1.5); 7.8799 (1.8); 7.8767 (2.9); 7.8737 (1.9); 7.7946 (0.4); 7.7893 (2.5); 7.7836 (3.1); 7.7800 (2.6); 7.7526 (2.0); 7.7327 (3.6); 7.7135 (2.2); 7.6308 (1.8); 7.6282 (2.0); 7.6247 (1.8); 7.6221 (1.8); 7.6105 (1.4); 7.6079 (1.4); 7.6044 (1.4); 7.6018 (1.2); 7.4569 (2.1); 7.4489 (2.1); 7.0457 (2.8); 7.0265 (3.2); 6.9114 (3.2); 6.7744 (1.7); 6.7554 (1.5); 3.7486 (6.2); 3.7310 (1.2); 3.7222 (1.1); 3.7126 (0.8); 3.7038 (0.5); 3.3315 (31.6); 2.8910 (14.7); 2.7923 (2.5); 2.7804 (2.1); 2.7753 (2.3); 2.7326 (12.1); 2.7315 (12.4); 2.5252 (0.8); 2.5206 (1.1); 2.5118 (14.1); 2.5073 (28.7); 2.5027 (37.8); 2.4981 (27.6); 2.4936 (13.5); 2.2683 (0.4); 2.2273 (16.0); 2.1696 (14.7); −0.0002 (8.6)
I-203: $^{1}$H-NMR(400.2 MHz, $d_6$-DMSO):
δ = 8.0265 (9.6); 7.9520 (0.8); 7.4125 (2.0); 7.4052 (2.0); 7.3939 (1.9); 7.3743 (3.6); 7.3548 (2.3); 7.1564 (2.1); 7.1372 (1.8); 7.0756 (3.2); 7.0524 (4.0); 7.0330 (4.5); 6.9366 (3.2); 6.7952 (1.7); 6.7765 (1.5); 3.7550 (0.6); 3.7369 (1.6); 3.7271 (4.5); 3.7192 (3.2); 3.7066 (1.2); 3.6980 (1.7); 3.6792 (0.4); 3.3299 (26.4); 2.8901 (5.5); 2.7824 (2.3); 2.7723 (2.1); 2.7650 (2.0); 2.7313 (4.8); 2.6775 (1.4); 2.6587 (4.2); 2.6397 (4.3); 2.6207 (1.5); 2.5243 (0.6); 2.5195 (1.0); 2.5108 (12.2); 2.5064 (24.5); 2.5018 (32.2); 2.4973 (23.7); 2.4928 (11.7); 2.2335 (16.0); 2.1907 (14.7); 1.2369 (0.4); 1.2211 (6.6); 1.2022 (13.9); 1.1832 (6.3); −0.0002 (5.3)
I-204: $^{1}$H-NMR(400.2 MHz, $d_6$-DMSO):
δ = 8.0331 (6.6); 7.9520 (0.8); 7.4001 (1.2); 7.3915 (2.3); 7.3710 (2.5); 7.3505 (1.4); 7.0489 (1.6); 7.0297 (1.9); 6.9333 (1.8); 6.8935 (0.8); 6.8917 (1.0); 6.8875 (1.1); 6.8857 (1.2); 6.8728 (0.8); 6.8711 (0.8); 6.8667 (1.1); 6.8649 (1.1); 6.8418 (1.3); 6.8363 (2.6); 6.8306 (1.5); 6.8213 (1.3); 6.8194 (1.4); 6.8159 (0.9); 6.8139 (0.9); 6.8015 (1.6); 6.7997 (1.4); 6.7958 (1.1); 6.7938 (1.1); 6.7890 (0.9); 3.7654 (16.0); 3.7419 (1.0); 3.7302 (1.6); 3.7171 (1.8); 3.7100 (0.9); 3.6966 (0.9); 3.6908 (0.6); 3.3311 (21.3); 2.8903 (5.6); 2.7866 (1.1); 2.7804 (1.3); 2.7715 (1.1); 2.7638 (1.2); 2.7322 (4.7); 2.7310 (4.8); 2.5244 (0.4); 2.5197 (0.6); 2.5111 (7.1); 2.5066 (14.4); 2.5020 (19.0); 2.4974 (14.0); 2.4929 (6.8); 2.2330 (9.3); 2.1933 (8.5); −0.0002 (4.4)
I-205: $^{1}$H-NMR(400.2 MHz, $d_6$-DMSO):
δ = 8.0824 (9.6); 7.9525 (1.5); 7.4187 (2.1); 7.4107 (2.0); 7.2695 (0.5); 7.2649 (0.6); 7.2527 (1.2); 7.2467 (1.5); 7.2389 (1.0); 7.2303 (1.5); 7.2154 (1.8); 7.2103 (1.3); 7.2010 (5.9); 7.1932 (1.2); 7.1845 (2.4); 7.1641 (0.6); 7.0566 (2.7); 7.0374 (3.2); 6.9327 (3.2); 6.8270 (1.7); 6.8094 (1.5); 3.7812 (0.4); 3.7628 (2.0); 3.7536 (4.3); 3.7383 (1.0); 3.7290 (1.4); 3.7232 (1.2); 3.7108 (0.8); 3.7021 (0.5); 3.3305 (28.1); 2.8906 (10.9); 2.8474 (0.3); 2.8297 (0.4); 2.8124 (1.7); 2.7995 (2.5); 2.7834 (1.8); 2.7662 (0.4); 2.7498 (0.3); 2.7319 (9.3); 2.5248 (0.6); 2.5199 (1.0); 2.5114 (12.4); 2.5070 (24.8); 2.5025 (32.6); 2.4979 (23.9); 2.4935 (11.8); 2.3001 (9.3); 2.2961 (9.4); 2.2416 (16.0); 2.1921 (14.6); −0.0002 (5.8)
I-206: $^{1}$H-NMR(400.2 MHz, $d_6$-DMSO):
δ = 8.0006 (7.9); 7.9492 (4.5); 7.9478 (4.4); 7.5006 (4.2); 7.4990 (4.1); 7.4429 (1.3); 7.4348 (1.3); 7.0869 (1.6); 7.0678 (2.0); 6.9731 (2.0); 6.8823 (1.1); 6.8637 (0.9); 4.5285 (0.4); 4.5118 (1.1); 4.4952 (1.5); 4.4786 (1.1); 4.4619 (0.4); 3.7362 (3.5); 3.7231 (0.6); 3.7136 (0.8); 3.7077 (0.6); 3.7043 (0.6); 3.6964 (0.5); 3.3280 (34.5); 2.8907 (3.6); 2.8391 (0.3); 2.8214 (0.9); 2.8049 (1.0); 2.7984 (1.1); 2.7805 (1.0); 2.7321 (3.0); 2.7308 (3.0); 2.5244 (0.7); 2.5196 (1.1); 2.5109 (13.7); 2.5064 (27.6); 2.5019 (36.0); 2.4973 (26.3); 2.4928 (12.8); 2.2561 (10.0); 2.2176 (9.1); 1.4407 (16.0); 1.4240 (15.8); −0.0002 (7.4)
I-207: $^{1}$H-NMR(400.2 MHz, $d_6$-DMSO):
δ = 8.1276 (10.9); 7.9532 (1.4); 7.4903 (0.4); 7.4864 (0.5); 7.4688 (1.1); 7.4651 (1.1); 7.4602 (0.8); 7.4499 (2.7); 7.4477 (2.7); 7.4428 (2.8); 7.4257 (0.6); 7.4218 (0.6); 7.3744 (0.5); 7.3696 (0.5); 7.3596 (0.5); 7.3535 (1.1); 7.3486 (1.1); 7.3386 (1.0); 7.3343 (1.2); 7.3275 (0.6); 7.3174 (0.6); 7.3138 (0.6); 7.2930 (0.8); 7.2890 (1.3); 7.2856 (0.9); 7.2726 (1.5); 7.2686 (1.3); 7.2518 (0.8); 7.0621 (2.7); 7.0429 (3.2); 6.9302 (3.2); 6.8394 (1.7); 6.8204 (1.5); 3.7606 (6.4); 3.7425 (1.2); 3.7337 (1.0); 3.7240 (0.7); 3.7153 (0.5); 3.3319 (32.7); 2.8914 (10.8); 2.8554 (0.4); 2.8376 (0.5); 2.8207 (1.5); 2.8045 (3.1); 2.7874 (1.8); 2.7698 (0.4); 2.7536 (0.4); 2.7331 (8.6); 2.7322 (9.0); 2.5257 (0.7); 2.5210 (1.1); 2.5122 (12.6); 2.5078 (25.3); 2.5032 (33.1); 2.4986 (24.2); 2.4941 (11.8); 2.2429 (16.0); 2.1931 (14.6); −0.0002 (6.6)
I-208: $^{1}$H-NMR(400.2 MHz, $d_6$-DMSO):
δ = 11.2170 (2.0); 8.3156 (0.3); 7.9940 (10.5); 7.9519 (0.4); 7.4546 (3.5); 7.4481 (2.4); 7.4404 (2.3); 7.4329 (3.9); 7.4220 (3.6); 7.4151 (2.3); 7.3697 (3.6); 7.3641 (3.7); 7.0650 (2.8); 7.0458 (3.2); 6.9717 (2.4); 6.9660 (2.3); 6.9500 (2.3); 6.9441 (2.5); 6.9346 (3.3); 6.8085 (1.7); 6.7896 (1.5); 6.4575 (1.9); 6.4523 (2.8); 6.4472 (1.9); 3.7882 (0.3); 3.7768 (1.0); 3.7584 (1.7); 3.7468 (1.8); 3.7335 (1.6); 3.7253 (2.9); 3.7107 (1.2); 3.7046 (1.7); 3.3360 (50.2); 2.8891 (3.1); 2.8419 (0.3); 2.8253 (0.4); 2.8077 (1.6); 2.7936 (2.6); 2.7782 (1.7); 2.7609 (0.4); 2.7316 (2.6); 2.7307 (2.6); 2.5242 (0.8); 2.5195 (1.2); 2.5108 (14.7); 2.5064 (29.2); 2.5018 (38.1); 2.4972 (27.8); 2.4927 (13.6); 2.2397 (16.0); 2.1770 (14.6); −0.0002 (7.5)
I-209: $^{1}$H-NMR(400.2 MHz, $d_6$-DMSO):
δ = 8.0448 (10.4); 7.9522 (1.6); 7.3686 (2.0); 7.3613 (2.0); 7.2510 (1.1); 7.2321 (2.9); 7.2129 (2.4); 7.1842 (2.9); 7.1667 (1.5); 7.0486 (2.8); 7.0294 (3.2); 7.0069 (2.6); 6.9875 (2.2); 6.9326 (3.2); 6.8133 (1.7); 6.7943 (1.5); 3.7669 (0.8); 3.7490 (1.6); 3.7374 (4.0); 3.7278 (3.3); 3.7195 (1.4); 3.7077 (1.6); 3.7007 (1.0); 3.6916 (0.4); 3.3306 (31.7); 2.9548 (1.8); 2.9364 (3.5); 2.9178 (1.9); 2.8904 (12.2); 2.8148 (0.3); 2.7972 (1.6); 2.7885 (2.2); 2.7823 (2.0); 2.7720 (1.9); 2.7319 (10.0); 2.7314 (10.0); 2.5975 (1.1); 2.5881 (1.1); 2.5790 (2.2); 2.5698 (2.1); 2.5603 (1.2); 2.5517 (1.2); 2.5287 (0.4); 2.5247 (0.8); 2.5198 (1.1); 2.5111 (13.0); 2.5067 (26.1); 2.5021 (34.3); 2.4975 (25.0); 2.4930 (12.3); 2.2342 (16.0); 2.1938 (14.6); 2.0208 (0.6); 2.0024 (2.2); 1.9839 (3.1); 1.9652 (2.0); 1.9462 (0.5); −0.0002 (6.9)
I-210: $^{1}$H-NMR(400.2 MHz, $d_6$-DMSO):
δ = 8.0074 (10.5); 7.9519 (1.7); 7.3966 (2.1); 7.3890 (2.1); 7.2947 (2.5); 7.2744 (2.8); 7.0710 (2.9); 7.0662 (3.1); 7.0481 (2.7); 7.0290 (3.2); 6.9804 (2.0); 6.9747 (1.8); 6.9601 (1.8); 6.9545 (1.7); 6.9401 (3.3); 6.8091 (1.7); 6.7907 (1.5); 3.7603 (0.8); 3.7421 (1.7); 3.7305 (3.1); 3.7196 (3.0); 3.7040 (1.2); 3.6971 (1.7); 3.6859 (0.8); 3.6770 (0.4); 3.3299 (34.2); 2.9003 (3.1); 2.8902 (14.4); 2.8827 (5.8); 2.8639 (3.1); 2.7874 (2.1); 2.7820 (2.2); 2.7719 (2.2); 2.7644 (2.0); 2.7475 (0.3); 2.7315 (10.5); 2.5242 (0.8); 2.5193 (1.2); 2.5108 (14.2); 2.5064 (27.9); 2.5018 (36.1); 2.4972 (26.3); 2.4928 (12.8); 2.2348 (16.0); 2.1965 (14.6); 2.1091 (0.7); 2.0906 (2.4); 2.0720 (3.4); 2.0538 (2.3); 2.0353 (0.6); −0.0002 (6.9)
I-211: $^{1}$H-NMR(400.2 MHz, $d_6$-DMSO):
δ = 8.2211 (2.9); 8.2148 (3.1); 8.0498 (10.1); 7.9522 (2.0); 7.5363 (2.7); 7.5303 (2.8); 7.4099 (2.0); 7.4021 (2.0); 7.0500 (2.7); 7.0308 (3.1); 6.9279 (3.1); 6.7980 (1.7); 6.7800 (1.4); 3.7805 (0.4); 3.7622 (1.9); 3.7526 (4.4); 3.7291 (1.3); 3.7235 (1.3); 3.7134 (0.8); 3.7044 (0.5); 3.3397 (13.4); 2.9659 (1.8); 2.9488 (4.9); 2.9307 (5.5); 2.9120 (2.4); 2.8910 (14.5); 2.8169 (0.3); 2.7951 (2.4); 2.7832 (2.1); 2.7776 (2.2); 2.7323 (12.1); 2.7314 (11.7); 2.5248 (0.8); 2.5201 (1.2); 2.5115 (14.0); 2.5070 (28.4);

TABLE 2-continued 2.5024 (37.4); 2.4978 (27.4); 2.4934 (13.5); 2.2620 (0.4); 2.2349 (16.0); 2.1900 (14.3); 2.1601 (2.4); 2.1411 (3.2); 2.1225 (2.2); 2.1035 (0.6); −0.0002 (7.3)
I-212: $^1$H-NMR(400.2 MHz, $d_6$-DMSO):
δ = 7.9916 (11.5); 7.3976 (2.1); 7.3898 (2.1); 7.1111 (2.8); 7.1050 (3.0); 7.0593 (2.7); 7.0401 (3.2); 6.9477 (4.5); 6.9328 (2.2); 6.9264 (2.1); 6.8286 (1.8); 6.8188 (5.0); 6.8128 (1.7); 6.7975 (3.6); 4.6007 (2.6); 4.5789 (5.6); 4.5571 (2.8); 3.7697 (0.7); 3.7515 (1.8); 3.7406 (3.5); 3.7310 (3.1); 3.7219 (1.0); 3.7113 (1.6); 3.7054 (1.5); 3.6939 (0.8); 3.6849 (0.5); 3.3317 (37.3); 3.2348 (1.9); 3.2132 (3.7); 3.1915 (1.8); 2.8903 (1.3); 2.7971 (2.0); 2.7908 (2.2); 2.7814 (2.1); 2.7735 (1.9); 2.7319 (1.1); 2.5243 (0.7); 2.5196 (1.0); 2.5109 (12.6); 2.5065 (25.4); 2.5019 (33.3); 2.4973 (24.3); 2.4928 (11.8); 2.2400 (16.0); 2.2038 (14.7); −0.0002 (6.8)
I-213: $^1$H-NMR(400.2 MHz, $d_6$-DMSO):
δ = 8.0603 (7.4); 7.9523 (1.2); 7.9360 (0.9); 7.9327 (1.3); 7.9297 (1.0); 7.9168 (1.1); 7.9132 (1.5); 7.9105 (1.1); 7.8173 (1.6); 7.8123 (2.2); 7.8077 (1.6); 7.6678 (1.2); 7.6479 (2.5); 7.6283 (1.5); 7.5541 (1.2); 7.5517 (1.3); 7.5482 (1.2); 7.5458 (1.2); 7.5339 (0.9); 7.5315 (0.9); 7.5279 (0.9); 7.5255 (0.8); 7.4515 (1.4); 7.4436 (1.3); 7.0477 (1.8); 7.0285 (2.0); 6.9130 (2.0); 6.7775 (1.1); 6.7589 (1.0); 3.7611 (1.2); 3.7517 (2.9); 3.7401 (0.8); 3.7272 (0.8); 3.7225 (0.9); 3.7122 (0.5); 3.3317 (27.3); 2.8908 (8.4); 2.7929 (1.7); 2.7791 (1.5); 2.7755 (1.5); 2.7324 (6.9); 2.7313 (7.1); 2.6060 (16.0); 2.5250 (0.6); 2.5201 (0.8); 2.5115 (9.5); 2.5070 (18.9); 2.5025 (24.6); 2.4978 (17.9); 2.4933 (8.7); 2.2283 (10.2); 2.1703 (9.4); −0.0002 (5.0)
I-214: $^1$H-NMR(400.2 MHz, $d_6$-DMSO):
δ = 8.0246 (11.2); 7.9522 (0.5); 7.4096 (2.1); 7.4020 (2.1); 7.3878 (1.4); 7.3687 (2.7); 7.3673 (2.8); 7.3482 (1.7); 7.1339 (2.3); 7.1145 (1.9); 7.0534 (8.3); 7.0339 (4.8); 6.9353 (3.2); 6.7911 (1.7); 6.7732 (1.5); 3.7551 (0.6); 3.7370 (1.7); 3.7274 (4.4); 3.7200 (3.3); 3.7063 (1.2); 3.6980 (1.6); 3.6876 (0.8); 3.6787 (0.5); 3.3301 (32.0); 2.8903 (3.9); 2.7822 (2.3); 2.7714 (2.1); 2.7648 (2.1); 2.7322 (3.4); 2.7312 (3.4); 2.6117 (2.4); 2.5933 (3.5); 2.5738 (2.6); 2.5245 (0.7); 2.5197 (1.0); 2.5110 (12.6); 2.5066 (25.5); 2.5020 (33.4); 2.4974 (24.4); 2.4929 (12.0); 2.2315 (16.0); 2.1900 (14.7); 1.6579 (0.4); 1.6394 (1.7); 1.6207 (2.9); 1.6017 (2.9); 1.5832 (1.7); 1.5649 (0.4); 0.9287 (6.3); 0.9105 (12.9); 0.8921 (5.7); −0.0002 (7.1)
I-215: $^1$H-NMR(400.2 MHz, $d_6$-DMSO):
δ = 8.0036 (3.9); 7.9519 (0.6); 7.3949 (0.8); 7.3877 (0.8); 7.2556 (0.7); 7.2352 (1.4); 7.2148 (0.9); 7.0527 (1.0); 7.0335 (1.2); 6.9399 (1.2); 6.8189 (0.6); 6.7998 (0.6); 6.6436 (0.6); 6.6377 (0.6); 6.6227 (0.5); 6.6173 (0.6); 6.5457 (0.8); 6.5400 (1.4); 6.5343 (0.8); 6.4784 (0.7); 6.4737 (0.6); 6.4587 (0.6); 6.4543 (0.6); 3.7603 (0.4); 3.7418 (0.6); 3.7302 (0.6); 3.7051 (1.1); 3.6920 (0.5); 3.6846 (0.6); 3.3289 (28.5); 2.9018 (16.0); 2.8905 (4.2); 2.7770 (0.9); 2.7660 (0.8); 2.7609 (0.8); 2.7312 (3.5); 2.5241 (0.5); 2.5193 (0.8); 2.5107 (9.8); 2.5063 (19.7); 2.5018 (25.8); 2.4972 (18.9); 2.4928 (9.4); 2.2351 (6.0); 2.1947 (5.5); −0.0002 (4.8)
I-216: $^1$H-NMR(400.2 MHz, $d_6$-DMSO):
δ = 8.0306 (11.3); 7.9521 (1.1); 7.3869 (2.2); 7.3794 (2.2); 7.3736 (2.4); 7.3532 (3.9); 7.3328 (2.2); 7.0455 (2.8); 7.0263 (3.2); 6.9329 (3.2); 6.8705 (1.6); 6.8665 (1.8); 6.8648 (1.8); 6.8500 (1.4); 6.8456 (1.9); 6.8441 (1.8); 6.8187 (2.0); 6.8133 (4.2); 6.8051 (4.3); 6.8032 (4.3); 6.8000 (3.0); 6.7848 (3.3); 6.7834 (3.4); 6.7798 (2.9); 4.0477 (1.6); 4.0303 (5.3); 4.0128 (5.4); 3.9954 (1.7); 3.7596 (0.9); 3.7416 (1.7); 3.7301 (2.6); 3.7254 (2.3); 3.7160 (3.2); 3.7078 (1.4); 3.6959 (1.7); 3.6888 (1.1); 3.6807 (0.4); 3.3307 (38.4); 2.8904 (8.2); 2.7797 (2.4); 2.7676 (2.2); 2.7628 (2.2); 2.7320 (6.9); 2.5245 (0.7); 2.5197 (1.1); 2.5110 (13.6); 2.5066 (27.4); 2.5021 (35.7); 2.4975 (26.0); 2.4930 (12.7); 2.2311 (16.0); 2.1930 (14.7); 1.3440 (5.9); 1.3266 (12.4); 1.3092 (5.7); −0.0002 (7.1)
I-217: $^1$H-NMR(400.2 MHz, $d_6$-DMSO):
δ = 8.0319 (11.6); 7.9519 (0.7); 7.4689 (1.8); 7.4493 (3.8); 7.4297 (4.0); 7.2481 (2.2); 7.2290 (1.9); 7.2092 (2.0); 7.2044 (3.1); 7.1715 (1.8); 7.1673 (1.4); 7.1515 (1.4); 7.1472 (1.3); 7.0501 (2.8); 7.0310 (3.2); 6.9354 (3.2); 6.8018 (1.7); 6.7844 (1.4); 4.4582 (11.5); 3.7587 (0.4); 3.7405 (2.0); 3.7310 (4.4); 3.7178 (1.1); 3.7073 (1.3); 3.7013 (1.2); 3.6904 (0.8); 3.6817 (0.5); 3.3313 (38.8); 3.3211 (34.2); 2.8902 (5.2); 2.7862 (2.4); 2.7741 (2.1); 2.7688 (2.2); 2.7321 (4.3); 2.7310 (4.2); 2.5244 (0.7); 2.5196 (1.1); 2.5110 (12.6); 2.5065 (25.7); 2.5019 (34.0); 2.4973 (24.8); 2.4927 (12.1); 2.2331 (16.0); 2.1917 (14.6); −0.0002 (7.2)
I-218: $^1$H-NMR(400.2 MHz, $d_6$-DMSO):
δ = 8.2138 (1.0); 8.2082 (2.0); 8.2054 (1.1); 8.2014 (2.3); 8.1983 (2.5); 8.1952 (4.1); 8.1933 (6.3); 8.1885 (6.6); 8.1787 (0.4); 8.0908 (12.9); 7.9527 (2.1); 7.8229 (0.5); 7.8200 (0.4); 7.8026 (3.4); 7.7965 (3.4); 7.7912 (4.1); 7.7877 (3.7); 7.7846 (6.3); 7.7755 (0.6); 7.4419 (2.0); 7.4338 (2.0); 7.0467 (2.8); 7.0275 (3.2); 6.8947 (3.2); 6.7646 (1.7); 6.7457 (1.5); 3.7702 (6.3); 3.7551 (1.2); 3.7465 (1.0); 3.7370 (0.7); 3.7284 (0.5); 3.3324 (44.2); 2.8915 (15.4); 2.8001 (3.0); 2.7835 (2.9); 2.7331 (12.8); 2.7318 (13.0); 2.5256 (0.8); 2.5209 (1.2); 2.5122 (14.0); 2.5077 (28.2); 2.5031 (37.0); 2.4984 (26.8); 2.4939 (12.8); 2.2239 (16.0); 2.1581 (14.7); −0.0002 (8.4)
I-219: $^1$H-NMR(400.2 MHz, $d_6$-DMSO):
δ = 10.2376 (7.3); 8.1356 (10.4); 7.9526 (1.9); 7.8429 (0.8); 7.8389 (1.0); 7.8276 (1.0); 7.8237 (1.8); 7.8195 (1.2); 7.8085 (1.0); 7.8044 (1.0); 7.7818 (0.8); 7.7778 (0.9); 7.7620 (1.7); 7.7585 (1.6); 7.7429 (1.1); 7.7388 (0.9); 7.5267 (1.5); 7.5069 (2.6); 7.4870 (1.2); 7.4632 (2.0); 7.4551 (2.0); 7.0633 (2.7); 7.0441 (3.1); 6.9232 (3.2); 6.8321 (1.7); 6.8131 (1.4); 3.7680 (6.2); 3.7512 (1.2); 3.7421 (1.1); 3.7329 (0.8); 3.7241 (0.5); 3.3574 (0.3); 3.3328 (72.2); 2.8913 (13.7); 2.8607 (0.4); 2.8430 (0.5); 2.8260 (1.4); 2.8101 (3.0); 2.7933 (1.8); 2.7760 (0.4); 2.7592 (0.3); 2.7324 (11.4); 2.6717 (0.4); 2.5252 (1.2); 2.5205 (1.7); 2.5118 (20.4); 2.5073 (41.3); 2.5028 (54.4); 2.4982 (40.0); 2.4937 (19.7); 2.3297 (0.4); 2.2431 (16.0); 2.1804 (14.4); 1.2394 (0.6); −0.0002 (10.0)
I-220: $^1$H-NMR(400.2 MHz, $d_6$-DMSO):
δ = 8.0828 (11.1); 7.9528 (1.0); 7.4192 (2.0); 7.4110 (2.0); 7.2919 (0.5); 7.2840 (0.7); 7.2763 (1.2); 7.2678 (1.6); 7.2616 (0.9); 7.2523 (1.4); 7.2465 (0.9); 7.2322 (3.7); 7.2273 (3.6); 7.2231 (2.6); 7.2133 (2.9); 7.0584 (2.8); 7.0392 (3.2); 6.9299 (3.2); 6.8201 (1.7); 6.8018 (1.5); 3.7815 (0.4); 3.7535 (4.8); 3.7386 (1.0); 3.7282 (1.3); 3.7195 (1.0); 3.7111 (0.8); 3.7022 (0.5); 3.3326 (39.5); 2.8908 (7.5); 2.8479 (0.4); 2.8304 (0.4); 2.8132 (1.7); 2.8009 (2.4); 2.7845 (1.8); 2.7674 (0.4); 2.7506 (0.3); 2.7326 (6.2); 2.7317 (6.2); 2.7119 (1.1); 2.6930 (3.3); 2.6742 (3.5); 2.6553 (1.2); 2.5252 (0.7); 2.5204 (1.0); 2.5118 (12.7); 2.5073 (25.7); 2.5027 (33.8); 2.4981 (24.7); 2.4936 (12.1); 2.2417 (16.0); 2.1871 (14.6); 1.2274 (6.1); 1.2086 (13.1); 1.1897 (5.8); −0.0002 (6.8)
I-221: $^1$H-NMR(400.2 MHz, $d_6$-DMSO):
δ = 8.0358 (12.4); 7.9518 (1.4); 7.4278 (2.0); 7.4078 (4.4); 7.3879 (4.7); 7.3812 (2.2); 7.2042 (1.6); 7.2022 (2.0); 7.2000 (2.1); 7.1980 (2.0); 7.1845 (1.4); 7.1824 (1.6); 7.1802 (1.9); 7.1782 (1.7); 7.1533 (2.7); 7.1483 (4.2); 7.1434 (2.4); 7.0447 (2.8); 7.0262 (4.8); 7.0084 (1.7); 7.0064 (1.7); 7.0028 (1.7); 7.0008 (1.6); 6.9315 (3.2); 6.7958 (1.7); 6.7783 (1.5); 3.7715 (0.8); 3.7532 (1.7); 3.7417 (2.9); 3.7296 (3.0); 3.7160 (1.2); 3.7081 (1.9); 3.6886 (0.5); 3.3309 (40.9); 2.8902 (10.6); 2.7854 (3.4); 2.7687 (3.1); 2.7319 (8.5); 2.7310 (8.8); 2.5243 (0.7); 2.5196 (1.2); 2.5109 (13.2); 2.5065 (26.5); 2.5019 (34.6); 2.4973 (25.4); 2.4928 (12.8); 2.4858 (28.2); 2.2310 (16.0); 2.1955 (14.7); −0.0002 (6.7)
I-222: $^1$H-NMR(400.2 MHz, $d_6$-DMSO):
δ = 8.0384 (12.8); 7.4652 (2.7); 7.4442 (3.0); 7.4433 (3.0); 7.3792 (4.2); 7.3731 (4.8); 7.3670 (2.4); 7.3588 (2.1); 7.1791 (2.3); 7.1731 (2.2); 7.1584 (2.1); 7.1524 (2.0); 7.0430 (2.7); 7.0238 (3.2); 6.9261 (3.2); 6.7913 (1.7); 6.7726 (1.5); 3.7755 (0.5); 3.7574 (1.8); 3.7484 (4.2); 3.7428 (3.7); 3.7335 (1.1); 3.7223 (1.4); 3.7164 (1.3); 3.7057 (0.8); 3.6968 (0.5); 3.3295 (28.9);

TABLE 2-continued 2.8906 (1.4); 2.7879 (3.4); 2.7710 (3.2); 2.7324 (1.2); 2.7313 (1.2); 2.5248 (0.8); 2.5201 (1.0); 2.5113 (12.5); 2.5068 (25.4); 2.5022 (33.4); 2.4976 (24.6); 2.4931 (12.1); 2.3677 (16.0); 2.2301 (15.8); 2.1921 (14.5); −0.0002 (7.4)

I-223: $^{1}$H-NMR(400.2 MHz, $d_6$-DMSO):

δ = 8.0803 (10.0); 8.0432 (3.0); 8.0208 (3.3); 8.0060 (1.8); 7.9873 (1.9); 7.9841 (1.8); 7.9529 (2.1); 7.9269 (1.8); 7.9080 (2.0); 7.7449 (3.2); 7.7392 (3.4); 7.5925 (0.6); 7.5889 (0.8); 7.5753 (2.0); 7.5717 (1.8); 7.5574 (3.0); 7.5537 (3.0); 7.5393 (1.8); 7.5357 (1.9); 7.5221 (0.8); 7.5185 (0.6); 7.4777 (2.1); 7.4718 (2.1); 7.4493 (2.4); 7.4434 (2.3); 7.4271 (2.2); 7.4211 (2.2); 7.0478 (2.8); 7.0286 (3.2); 6.9102 (3.3); 6.7676 (1.8); 6.7499 (1.6); 3.7658 (1.0); 3.7472 (1.8); 3.7356 (3.4); 3.7306 (3.1); 3.7218 (2.8); 3.7019 (1.4); 3.3353 (43.9); 2.8900 (14.6); 2.8358 (0.4); 2.8191 (0.4); 2.8017 (1.2); 2.7838 (2.5); 2.7676 (1.6); 2.7502 (0.4); 2.7323 (12.6); 2.5250 (0.8); 2.5117 (13.2); 2.5073 (26.5); 2.5028 (34.9); 2.4982 (25.9); 2.4939 (13.0); 2.2270 (16.0); 2.1406 (14.8); 0.9123 (0.4); −0.0002 (6.4)

I-224: $^{1}$H-NMR(400.2 MHz, $d_6$-DMSO):

δ = 8.8912 (4.7); 8.8845 (4.8); 8.2638 (3.2); 8.2574 (3.2); 8.1237 (12.4); 8.0984 (2.4); 8.0280 (1.9); 8.0092 (2.1); 8.0071 (2.1); 7.8224 (1.2); 7.8188 (1.3); 7.8051 (1.7); 7.8014 (2.4); 7.7977 (1.2); 7.7840 (1.5); 7.7804 (1.4); 7.7069 (1.5); 7.7041 (1.5); 7.6867 (2.4); 7.6840 (1.6); 7.6693 (1.1); 7.6665 (1.0); 7.4969 (2.0); 7.4903 (1.9); 7.0545 (2.7); 7.0353 (3.1); 6.8868 (3.1); 6.7458 (1.6); 6.7288 (1.5); 3.7921 (0.5); 3.7661 (6.2); 3.7421 (0.9); 3.3314 (265.9); 3.2973 (0.3); 2.8909 (1.7); 2.8520 (0.3); 2.8346 (0.4); 2.8183 (1.1); 2.8015 (2.4); 2.7860 (1.6); 2.7311 (1.4); 2.6802 (0.4); 2.6759 (0.7); 2.6713 (1.0); 2.6668 (0.8); 2.6623 (0.4); 2.5249 (3.1); 2.5201 (4.6); 2.5114 (59.7); 2.5070 (121.3); 2.5024 (159.8); 2.4978 (117.0); 2.4933 (57.5); 2.3381 (0.3); 2.3337 (0.7); 2.3292 (1.0); 2.3247 (0.7); 2.3201 (0.4); 2.2294 (16.0); 2.1116 (14.6); 1.2398 (1.1); 0.0080 (1.0); −0.0002 (33.0); −0.0085 (1.1)

I-225: $^{1}$H-NMR(400.2 MHz, $d_6$-DMSO):

δ = 8.0839 (12.1); 7.4439 (1.3); 7.4386 (2.0); 7.4335 (1.4); 7.4221 (1.3); 7.4171 (2.0); 7.4118 (1.3); 7.3355 (2.1); 7.3276 (2.1); 7.3131 (1.7); 7.3082 (3.3); 7.3056 (3.3); 7.3011 (1.9); 7.2798 (1.6); 7.2743 (2.2); 7.2689 (1.1); 7.2557 (1.5); 7.2503 (2.3); 7.2448 (1.1); 7.0395 (2.8); 7.0203 (3.2); 6.9201 (3.3); 6.7871 (1.8); 6.7686 (1.5); 3.7514 (6.3); 3.7373 (1.3); 3.7284 (1.2); 3.7187 (0.8); 3.7099 (0.5); 3.3317 (39.5); 2.8910 (1.2); 2.7876 (3.4); 2.7707 (3.3); 2.7327 (1.0); 2.7316 (1.0); 2.5251 (0.7); 2.5204 (1.0); 2.5116 (12.2); 2.5072 (24.6); 2.5026 (32.2); 2.4980 (23.7); 2.4935 (11.7); 2.2265 (16.0); 2.1943 (14.7); −0.0002 (6.8)

I-226: $^{1}$H-NMR(400.2 MHz, $d_6$-DMSO):

δ = 8.0558 (9.3); 7.9520 (1.7); 7.5986 (1.9); 7.5915 (2.1); 7.5827 (2.1); 7.5754 (3.7); 7.5524 (3.9); 7.5298 (2.1); 7.3616 (2.3); 7.3531 (3.4); 7.3458 (1.8); 7.3433 (1.9); 7.3358 (1.3); 7.3304 (1.2); 7.3207 (1.3); 7.3132 (1.0); 7.0465 (2.7); 7.0273 (3.2); 6.9189 (3.5); 6.7885 (1.9); 6.7693 (1.6); 3.7600 (6.3); 3.7488 (1.3); 3.7385 (1.3); 3.7306 (1.2); 3.7217 (0.8); 3.7130 (0.5); 3.3339 (44.9); 2.8911 (10.6); 2.7958 (3.7); 2.7789 (3.6); 2.7318 (9.7); 2.5073 (23.3); 2.5029 (30.8); 2.4984 (23.5); 2.2299 (16.0); 2.1910 (14.8); −0.0002 (4.1)

I-227: $^{1}$H-NMR(400.2 MHz, $d_6$-DMSO):

δ = 8.1186 (9.4); 7.9532 (1.6); 7.9091 (0.7); 7.8901 (0.8); 7.8829 (1.3); 7.8642 (1.3); 7.8567 (0.8); 7.8380 (0.6); 7.6990 (0.7); 7.6796 (1.2); 7.6720 (0.8); 7.6605 (0.8); 7.6529 (1.2); 7.6337 (0.6); 7.3903 (2.0); 7.3824 (2.0); 7.0617 (2.6); 7.0426 (3.2); 6.9212 (3.2); 6.8429 (1.7); 6.8234 (1.5); 3.7696 (6.4); 3.7569 (1.3); 3.7477 (1.2); 3.7382 (0.8); 3.7292 (0.6); 3.3311 (25.3); 2.8917 (11.0); 2.8566 (0.4); 2.8383 (0.5); 2.8218 (1.4); 2.8065 (2.8); 2.7903 (1.8); 2.7725 (0.4); 2.7328 (9.4); 2.5256 (0.7); 2.5121 (12.8); 2.5077 (25.2); 2.5032 (32.6); 2.4986 (23.9); 2.4943 (11.8); 2.2696 (0.6); 2.2381 (16.0); 2.1938 (14.2); −0.0002 (6.2)

I-228: $^{1}$H-NMR(400.2 MHz, $d_6$-DMSO):

δ = 8.0248 (10.7); 7.9519 (1.2); 7.4088 (3.6); 7.4035 (2.2); 7.3890 (3.9); 7.3694 (2.5); 7.1710 (2.1); 7.1518 (1.8); 7.0952 (1.9); 7.0908 (3.3); 7.0519 (4.5); 7.0326 (4.7); 6.9344 (3.2); 6.7839 (1.7); 6.7665 (1.5); 3.7626 (0.7); 3.7445 (1.7); 3.7337 (3.9); 3.7246 (3.1); 3.7091 (1.2); 3.7017 (1.6); 3.6905 (0.8); 3.6818 (0.5); 3.5848 (1.0); 3.5625 (1.5); 3.5406 (1.0); 3.5188 (0.3); 3.3332 (51.8); 2.8903 (9.4); 2.7852 (2.8); 2.7694 (2.4); 2.7313 (7.8); 2.5246 (0.8); 2.5199 (1.1); 2.5112 (13.4); 2.5067 (27.2); 2.5021 (36.0); 2.4975 (26.4); 2.4930 (13.0); 2.3429 (0.7); 2.3363 (0.9); 2.3295 (0.7); 2.3225 (1.4); 2.3155 (2.4); 2.3087 (1.4); 2.3016 (1.2); 2.2947 (2.4); 2.2884 (1.8); 2.2803 (0.7); 2.2742 (1.1); 2.2690 (1.0); 2.2332 (16.0); 2.1878 (14.7); 2.1503 (0.4); 2.1474 (0.4); 2.1437 (0.4); 2.1248 (1.4); 2.1187 (1.0); 2.1011 (2.2); 2.0957 (1.8); 2.0794 (1.5); 2.0727 (1.7); 2.0569 (0.5); 2.0529 (0.5); 2.0506 (0.6); 2.0326 (0.5); 2.0141 (0.9); 2.0087 (0.7); 1.9941 (0.5); 1.9893 (1.4); 1.9819 (0.4); 1.9726 (0.3); 1.9644 (1.3); 1.9458 (0.5); 1.9401 (0.6); 1.8499 (0.4); 1.8444 (0.6); 1.8242 (1.1); 1.8224 (1.1); 1.8178 (0.8); 1.8062 (0.5); 1.8027 (0.8); 1.7991 (0.8); 1.7962 (0.9); −0.0002 (7.1)

I-229: $^{1}$H-NMR(400.2 MHz, $d_6$-DMSO):

δ = 8.0397 (10.3); 7.9519 (1.4); 7.4946 (1.7); 7.4750 (3.7); 7.4552 (2.6); 7.4273 (2.1); 7.4199 (2.0); 7.3456 (2.2); 7.3261 (1.7); 7.2979 (2.2); 7.2930 (3.4); 7.2887 (2.1); 7.1581 (1.7); 7.1542 (1.6); 7.1524 (1.5); 7.1399 (1.4); 7.1379 (1.5); 7.1341 (1.5); 7.0508 (2.7); 7.0316 (3.2); 6.9303 (3.2); 6.7818 (1.7); 6.7642 (1.5); 4.9745 (2.6); 4.9727 (2.7); 4.9598 (3.1); 4.9578 (3.2); 4.9538 (3.2); 4.9518 (3.1); 4.9390 (3.1); 4.9371 (3.1); 4.6345 (3.9); 4.6186 (6.2); 4.6030 (4.0); 4.3343 (0.5); 4.3139 (1.0); 4.2965 (1.7); 4.2792 (0.9); 4.2764 (0.9); 4.2588 (0.3); 3.7609 (0.6); 3.7428 (1.6); 3.7331 (4.4); 3.7255 (3.2); 3.7117 (1.2); 3.7035 (1.6); 3.6931 (0.8); 3.6842 (0.4); 3.3333 (95.9); 2.8905 (11.0); 2.7836 (2.4); 2.7713 (2.2); 2.7660 (2.1); 2.7311 (9.2); 2.6710 (0.4); 2.5246 (1.1); 2.5198 (1.6); 2.5111 (21.4); 2.5067 (43.3); 2.5021 (56.9); 2.4975 (41.7); 2.4930 (20.6); 2.3290 (0.4); 2.2314 (16.0); 2.1819 (14.7); 1.2391 (0.4); −0.0002 (10.0); −0.0085 (0.4)

I-230: $^{1}$H-NMR(400.2 MHz, $d_6$-DMSO):

δ = 8.0576 (9.9); 7.9730 (3.8); 7.9516 (6.1); 7.8960 (3.5); 7.8907 (3.5); 7.7958 (4.7); 7.7822 (5.2); 7.5166 (3.5); 7.5029 (3.2); 7.4408 (2.2); 7.4341 (2.1); 7.3079 (2.7); 7.3024 (2.6); 7.2863 (2.6); 7.2809 (2.5); 7.0488 (2.8); 7.0296 (3.2); 6.9165 (3.3); 6.7702 (1.8); 6.7513 (1.6); 3.7739 (0.8); 3.7556 (1.6); 3.7436 (3.6); 3.7329 (3.0); 3.7209 (1.2); 3.7124 (1.5); 3.3369 (64.4); 2.8902 (15.9); 2.8162 (0.4); 2.7989 (1.5); 2.7891 (2.6); 2.7734 (2.0); 2.7547 (0.3); 2.7315 (13.5); 2.5250 (0.9); 2.5115 (15.4); 2.5072 (30.2); 2.5027 (39.0); 2.4981 (28.6); 2.4937 (14.2); 2.2289 (16.0); 2.1574 (14.9); 1.2383 (0.3); −0.0002 (6.6)

I-231: $^{1}$H-NMR(400.2 MHz, $d_6$-DMSO):

δ = 8.0570 (7.7); 7.9529 (1.2); 7.9202 (0.9); 7.9171 (1.5); 7.9138 (1.1); 7.9011 (1.1); 7.8976 (1.7); 7.8946 (1.2); 7.8545 (1.7); 7.8495 (2.3); 7.8451 (1.6); 7.6679 (1.2); 7.6479 (2.6); 7.6284 (1.6); 7.5797 (1.3); 7.5770 (1.4); 7.5737 (1.3); 7.5711 (1.2); 7.5594 (0.8); 7.5567 (0.8); 7.5533 (0.9); 7.5507 (0.8); 7.4513 (1.4); 7.4430 (1.4); 7.0453 (1.8); 7.0261 (2.1); 6.9084 (2.2); 6.7631 (1.2); 6.7451 (1.0); 3.8789 (16.0); 3.7624 (2.1); 3.7553 (4.1); 3.7409 (0.7); 3.7318 (0.8); 3.7230 (0.7); 3.7143 (0.5); 3.7056 (0.3); 3.3336 (34.6); 2.8913 (8.4); 2.7954 (2.2); 2.7786 (2.2); 2.7328 (7.2); 2.5256 (0.5); 2.5208 (0.7); 2.5120 (8.9); 2.5077 (17.9); 2.5031 (23.5); 2.4986 (17.4); 2.4942 (8.7); 2.2285 (10.6); 2.1677 (9.8); −0.0002 (4.3)

I-232: $^{1}$H-NMR(400.2 MHz, $d_6$-DMSO):

δ = 8.3163 (0.6); 8.0320 (6.3); 8.0284 (4.2); 7.9518 (2.0); 7.4209 (1.4); 7.4100 (1.8); 7.3898 (4.1); 7.3700 (3.2); 7.3503 (1.1); 7.1979 (1.2); 7.1788 (1.1); 7.1368 (1.8); 7.1323 (1.8); 7.0992 (1.3); 7.0934 (1.0); 7.0783 (1.7); 7.0760 (1.7); 7.0728 (1.6); 7.0515 (1.9); 7.0417 (1.6); 7.0318 (1.8); 7.0268 (2.3); 7.0229 (2.4); 7.0084 (0.8); 6.9929 (0.8); 6.9872 (1.4); 6.9824 (1.2); 6.9344 (3.4); 6.8003 (0.7); 6.7873 (1.7); 6.7716 (1.3); 5.0389 (0.4); 5.0319 (0.4); 5.0237 (0.7); 5.0166 (0.7); 5.0085 (0.4); 5.0014 (0.3); 4.9623 (0.4); 4.9566 (0.4); 4.8721 (0.3); 4.8651 (0.4); 4.8570 (0.7); 4.8498 (0.7); 4.8417 (0.4); 4.8345 (0.4); 4.8024 (0.4); 4.7968 (0.4); 3.7616 (0.4); 3.7574 (0.5); 3.7337 (2.5); 3.7260 (3.6); 3.7179 (2.6); 3.7042 (1.4); 3.6973 (1.5); 3.3294 (35.0); 2.8900 (14.9); 2.7830 (2.5); 2.7766 (2.3); 2.7671 (2.4); 2.7317 (12.3); 2.7309 (12.4); 2.5402 (0.3); 2.5352 (0.4);

TABLE 2-continued 2.5298 (0.4); 2.5242 (1.0); 2.5192 (1.4); 2.5106 (17.7); 2.5062 (35.0); 2.5016 (45.3); 2.4970 (33.0); 2.4925 (16.2); 2.4622 (0.3); 2.4572 (0.3); 2.2314 (16.0); 2.1930 (9.9); 2.1887 (11.5); 2.1636 (0.3); 1.5820 (0.4); 1.5536 (0.3); 1.5241 (0.3); 1.5211 (0.3); 1.3932 (0.6); 1.3863 (0.6); 1.3739 (0.4); 1.3669 (0.4); 1.3358 (0.6); 1.3288 (0.6); 1.3167 (0.4); 1.3099 (0.4); 1.2912 (0.4); 1.2763 (0.5); 1.2730 (0.4); 1.2656 (0.4); 1.2577 (0.8); 1.2508 (0.6); 1.2474 (0.5); 1.2424 (0.7); 1.2392 (0.8); 1.2322 (0.8); 1.2244 (0.4); 1.2170 (0.5); 1.2138 (0.4); 1.1987 (0.3); 1.1922 (0.6); 1.1747 (0.6); 1.1650 (0.6); 1.1474 (0.5); −0.0002 (9.7)

I-233: $^1$H-NMR(400.2 MHz, $d_6$-DMSO):
δ = 8.3161 (0.4); 8.0969 (11.6); 7.9525 (1.1); 7.8756 (4.0); 7.8540 (4.5); 7.4866 (4.2); 7.4655 (3.9); 7.4297 (2.0); 7.4220 (2.0); 7.0317 (2.7); 7.0125 (3.1); 6.9112 (3.1); 6.7618 (1.7); 6.7441 (1.5); 3.7307 (6.1); 3.7191 (1.3); 3.7096 (1.2); 3.7003 (0.8); 3.6914 (0.5); 3.3320 (81.7); 2.8911 (8.1); 2.7846 (1.6); 2.7776 (2.4); 2.7689 (1.8); 2.7609 (2.1); 2.7324 (6.8); 2.7315 (6.8); 2.6715 (0.4); 2.5250 (1.3); 2.5202 (2.0); 2.5116 (22.7); 2.5071 (45.8); 2.5026 (60.2); 2.4980 (44.2); 2.4935 (21.8); 2.3293 (0.4); 2.3250 (0.3); 2.2247 (16.0); 2.1713 (14.6); 1.2392 (0.5); 0.0080 (0.4); −0.0002 (11.4); −0.0085 (0.4)

I-234: $^1$H-NMR(400.2 MHz, $d_6$-DMSO):
δ = 8.0690 (9.7); 7.9524 (1.9); 7.7725 (4.4); 7.7505 (4.9); 7.6366 (4.5); 7.6299 (4.8); 7.3580 (2.2); 7.3501 (2.2); 7.3430 (3.0); 7.3362 (2.6); 7.3210 (2.4); 7.3142 (2.4); 7.0391 (2.7); 7.0199 (3.2); 6.9149 (3.4); 6.7831 (1.8); 6.7639 (1.6); 3.7545 (6.3); 3.7377 (1.3); 3.7287 (1.2); 3.7191 (0.8); 3.7105 (0.5); 3.3374 (68.8); 2.8915 (12.7); 2.7897 (3.4); 2.7728 (3.3); 2.7323 (11.0); 2.5256 (0.7); 2.5120 (13.3); 2.5077 (26.4); 2.5032 (34.4); 2.4987 (25.6); 2.4944 (12.9); 2.2272 (16.0); 2.1876 (14.8); −0.0002 (5.1)

I-235: $^1$H-NMR(400.2 MHz, $d_6$-DMSO):
δ = 8.0608 (1.2); 8.0552 (9.9); 7.9523 (2.3); 7.7732 (0.6); 7.7515 (0.6); 7.7138 (0.4); 7.6910 (3.0); 7.6876 (4.2); 7.6692 (4.6); 7.6320 (1.4); 7.6287 (1.1); 7.6124 (2.9); 7.6094 (2.1); 7.5897 (2.5); 7.5701 (3.6); 7.5577 (2.4); 7.5520 (4.2); 7.5031 (2.3); 7.4988 (1.0); 7.4849 (5.0); 7.4653 (3.1); 7.4158 (3.9); 7.4080 (2.4); 7.3975 (2.8); 7.3927 (0.8); 7.3865 (0.4); 7.3794 (0.9); 7.3477 (0.6); 7.3261 (0.6); 7.2718 (1.4); 7.2693 (1.7); 7.2664 (1.6); 7.2635 (1.5); 7.2522 (1.3); 7.2497 (1.4); 7.2468 (1.5); 7.2440 (1.3); 7.0458 (2.8); 7.0267 (3.0); 6.9375 (0.3); 6.8976 (3.2); 6.7336 (1.7); 6.7144 (1.5); 3.7970 (0.3); 3.7865 (0.8); 3.7681 (1.7); 3.7569 (2.3); 3.7515 (2.0); 3.7422 (3.1); 3.7278 (1.3); 3.7202 (2.0); 3.7012 (0.5); 3.3337 (46.3); 2.8900 (16.0); 2.7918 (3.5); 2.7750 (3.2); 2.7313 (14.1); 2.5247 (0.9); 2.5111 (15.0); 2.5069 (30.0); 2.5024 (39.7); 2.4979 (29.8); 2.4936 (15.2); 2.2434 (1.6); 2.2220 (15.3); 2.1853 (1.4); 2.1201 (14.2); −0.0002 (7.4)

I-236: $^1$H-NMR(400.2 MHz, $d_6$-DMSO):
δ = 8.3152 (0.4); 8.0538 (11.2); 7.9521 (1.5); 7.5401 (1.8); 7.5373 (5.1); 7.5334 (6.0); 7.5304 (2.5); 7.5181 (2.4); 7.5155 (2.7); 7.5139 (2.3); 7.5110 (1.7); 7.4743 (1.9); 7.4729 (1.7); 7.4542 (3.2); 7.4514 (1.6); 7.4363 (0.9); 7.4333 (1.5); 7.3710 (2.1); 7.3628 (2.0); 7.3173 (1.9); 7.3132 (2.8); 7.3090 (1.8); 7.2970 (1.5); 7.2944 (1.5); 7.2915 (1.6); 7.2889 (1.4); 7.0399 (2.8); 7.0207 (3.2); 6.9248 (3.2); 6.7787 (1.7); 6.7611 (1.5); 3.7772 (0.4); 3.7493 (5.0); 3.7346 (1.0); 3.7261 (1.4); 3.7158 (1.0); 3.7073 (0.8); 3.6987 (0.5); 3.3375 (69.0); 2.8909 (11.2); 2.7887 (3.6); 2.7718 (3.5); 2.7326 (9.0); 2.7316 (9.3); 2.5254 (0.6); 2.5206 (1.0); 2.5119 (12.4); 2.5074 (25.0); 2.5029 (32.7); 2.4982 (23.8); 2.4937 (11.6); 2.2293 (16.0); 2.1955 (14.7); −0.0002 (3.9)

I-237: $^1$H-NMR(400.2 MHz, $d_6$-DMSO):
δ = 8.0687 (10.4); 7.9527 (0.6); 7.6426 (1.7); 7.6217 (3.5); 7.6015 (1.9); 7.3943 (2.1); 7.3865 (2.1); 7.3517 (3.6); 7.3497 (3.5); 7.3445 (4.0); 7.3402 (2.2); 7.3242 (3.2); 7.3191 (2.1); 7.0472 (2.8); 7.0280 (3.2); 6.9155 (3.2); 6.7625 (1.7); 6.7445 (1.5); 3.7793 (0.4); 3.7510 (4.7); 3.7319 (1.2); 3.7276 (1.2); 3.7232 (1.3); 3.7131 (0.8); 3.7045 (0.5); 3.3382 (75.7); 2.8913 (4.7); 2.7901 (3.3); 2.7733 (3.1); 2.7325 (3.9); 2.5256 (0.8); 2.5208 (1.2); 2.5122 (13.8); 2.5078 (27.3); 2.5032 (35.5); 2.4986 (25.7); 2.4942 (12.4); 2.2249 (16.0); 2.1765 (14.7); −0.0002 (5.9)

I-238: $^1$H-NMR(400.2 MHz, $d_6$-DMSO):
δ = 8.0634 (11.4); 7.9524 (0.7); 7.5080 (3.0); 7.4869 (4.4); 7.4854 (4.4); 7.4122 (2.5); 7.4033 (9.5); 7.3974 (2.6); 7.3862 (1.9); 7.3804 (5.8); 7.3716 (0.5); 7.0417 (2.8); 7.0225 (3.2); 6.9137 (3.2); 6.7530 (1.7); 6.7341 (1.5); 3.7527 (3.1); 3.7450 (5.9); 3.7290 (1.0); 3.7193 (1.2); 3.7107 (1.1); 3.7019 (0.8); 3.6932 (0.5); 3.3350 (60.0); 2.8909 (5.5); 2.7918 (3.1); 2.7748 (2.9); 2.7328 (4.3); 2.7317 (4.7); 2.5253 (0.6); 2.5206 (0.9); 2.5118 (12.8); 2.5073 (26.5); 2.5028 (35.3); 2.4982 (26.2); 2.4936 (13.1); 2.2298 (16.0); 2.1735 (14.7); 1.2394 (0.3); −0.0002 (6.9)

I-239: $^1$H-NMR(400.2 MHz, $d_6$-DMSO):
δ = 8.1218 (10.8); 7.9530 (1.6); 7.7160 (1.1); 7.7121 (1.3); 7.7005 (1.2); 7.6961 (2.0); 7.6919 (1.4); 7.6802 (1.3); 7.6764 (1.3); 7.4717 (1.0); 7.4679 (1.1); 7.4507 (2.2); 7.4475 (1.6); 7.4333 (1.6); 7.4294 (1.6); 7.4215 (2.1); 7.4132 (2.1); 7.3203 (1.5); 7.3167 (1.5); 7.2998 (2.4); 7.2962 (2.4); 7.2793 (1.1); 7.2757 (1.0); 7.0535 (2.7); 7.0343 (3.2); 6.9228 (3.2); 6.8198 (1.7); 6.8007 (1.5); 4.2232 (0.3); 3.7688 (3.2); 3.7620 (6.3); 3.7499 (1.2); 3.7415 (1.2); 3.7321 (1.1); 3.7234 (0.8); 3.7144 (0.5); 3.3363 (64.6); 2.8916 (11.3); 2.8506 (0.4); 2.8327 (0.4); 2.8159 (1.6); 2.8043 (2.4); 2.7878 (1.9); 2.7705 (0.4); 2.7333 (9.2); 2.7323 (9.6); 2.5261 (0.6); 2.5213 (1.0); 2.5126 (13.8); 2.5081 (27.7); 2.5036 (36.2); 2.4990 (26.6); 2.4945 (13.1); 2.2399 (16.0); 2.1882 (14.6); 1.2385 (0.4); 0.9132 (0.6); −0.0002 (5.9)

I-240: $^1$H-NMR(400.2 MHz, $d_6$-DMSO):
δ = 8.0671 (12.0); 7.9525 (0.9); 7.6758 (8.3); 7.6692 (2.9); 7.6597 (4.3); 7.6497 (0.4); 7.6394 (0.9); 7.5521 (0.4); 7.5475 (1.6); 7.5410 (2.5); 7.5333 (1.6); 7.5317 (1.4); 7.5265 (1.3); 7.5243 (1.4); 7.5185 (1.1); 7.4203 (2.1); 7.4122 (2.1); 7.0521 (2.8); 7.0329 (3.2); 6.9157 (3.3); 6.7652 (1.7); 6.7461 (1.5); 3.7559 (5.4); 3.7447 (1.2); 3.7342 (1.3); 3.7278 (1.2); 3.7176 (0.8); 3.7087 (0.5); 3.3336 (54.1); 2.8911 (6.2); 2.7941 (3.2); 2.7774 (3.0); 2.7329 (5.2); 2.7317 (5.2); 2.5253 (0.7); 2.5206 (1.1); 2.5118 (13.6); 2.5074 (27.4); 2.5028 (35.9); 2.4982 (26.3); 2.4937 (12.9); 2.2258 (16.0); 2.1762 (14.7); −0.0002 (7.2)

I-241: $^1$H-NMR(400.2 MHz, $d_6$-DMSO):
δ = 8.3142 (0.5); 8.0412 (9.8); 7.9520 (1.8); 7.6963 (1.1); 7.6921 (2.3); 7.6868 (1.6); 7.6705 (5.4); 7.3636 (2.1); 7.3552 (2.1); 7.3205 (0.8); 7.3151 (0.6); 7.3045 (2.8); 7.3000 (6.9); 7.2949 (2.6); 7.2825 (2.9); 7.2621 (0.8); 7.0384 (2.8); 7.0192 (3.2); 6.9300 (3.2); 6.7815 (1.7); 6.7634 (1.5); 3.7777 (0.4); 3.7490 (4.2); 3.7263 (1.0); 3.7202 (1.4); 3.7115 (1.1); 3.7032 (0.8); 3.6943 (0.5); 3.3662 (0.4); 3.3397 (87.8); 3.3178 (0.5); 2.8911 (13.0); 2.7859 (3.7); 2.7689 (3.6); 2.7321 (11.0); 2.5253 (0.8); 2.5206 (1.1); 2.5119 (14.0); 2.5075 (27.9); 2.5030 (36.5); 2.4984 (26.7); 2.4940 (13.1); 2.2301 (16.0); 2.2044 (14.7); 0.9128 (0.3); −0.0002 (3.3)

I-242: $^1$H-NMR(400.2 MHz, $d_6$-DMSO):
δ = 8.7889 (2.6); 8.7848 (2.7); 8.0704 (9.8); 8.0439 (0.4); 7.9539 (2.1); 7.8755 (1.3); 7.8717 (1.8); 7.8537 (6.1); 7.8509 (6.0); 7.6893 (1.5); 7.6681 (3.0); 7.6481 (1.5); 7.4533 (2.1); 7.4453 (2.1); 7.3335 (1.9); 7.3293 (1.8); 7.3148 (1.4); 7.3111 (2.0); 7.3073 (1.4); 7.3023 (0.4); 7.0926 (3.5); 7.0862 (3.4); 7.0469 (2.8); 7.0278 (3.2); 6.8975 (3.3); 6.7597 (1.8); 6.7397 (1.6); 3.7935 (0.6); 3.7752 (1.9); 3.7659 (3.9); 3.7577 (3.2); 3.7448 (0.9); 3.7359 (1.6); 3.7255 (1.1); 3.7169 (0.8); 3.7081 (0.5); 3.3361 (56.7); 2.8923 (15.0); 2.7942 (3.6); 2.7774 (3.5); 2.7335 (12.8); 2.5268 (1.0); 2.5219 (1.3); 2.5133 (16.1); 2.5089 (31.8); 2.5044 (41.2); 2.4998 (29.9); 2.4954 (14.6); 2.2257 (16.0); 2.2056 (0.7); 2.1225 (14.8); 1.2384 (0.4); 0.9137 (0.4); −0.0002 (6.7)

I-243: $^1$H-NMR(300.2 MHz, CDCl3):
δ = 8.1687 (5.4); 7.9487 (1.2); 7.9226 (1.5); 7.9205 (1.4); 7.7716 (0.4); 7.7289 (1.7); 7.7253 (1.6); 7.7183 (2.3); 7.7118 (1.5); 7.7032 (2.5); 7.6768 (1.3); 7.3811 (1.2); 7.3786 (1.1); 7.3733 (1.1); 7.3538 (1.0); 7.3461 (1.0); 7.2985 (7.2); 7.0645 (0.4); 6.9873 (1.8); 6.9619 (2.2); 6.9320 (2.2); 6.7494 (1.2); 6.7243 (1.0); 6.0714 (1.5); 4.3139 (0.8); 4.3043 (1.0); 4.2791 (1.1);

TABLE 2-continued 4.2696 (1.0); 3.9113 (0.6); 3.9024 (0.6); 3.8952 (0.6); 3.8885 (0.6); 3.8796 (0.6); 3.8657 (1.9); 3.8455 (0.6); 3.8310 (1.3); 3.8105 (0.8); 3.1418 (15.4); 3.1202 (0.4); 3.0554 (0.7); 3.0401 (0.7); 3.0103 (1.0); 2.9941 (1.0); 2.7618 (1.0); 2.7305 (0.9); 2.7165 (0.8); 2.6846 (0.8); 2.3505 (0.9); 2.3360 (1.0); 2.3035 (11.6); 2.1975 (10.9); 2.0444 (16.0); 1.6222 (3.0); 1.2899 (1.7); 0.0366 (5.4); 0.0348 (7.5)
I-244: $^{1}$H-NMR(300.2 MHz, CDCl3):
δ = 8.1453 (8.4); 7.2987 (4.6); 7.0274 (2.5); 7.0019 (3.0); 6.9271 (2.9); 6.7491 (1.6); 6.7238 (1.3); 6.1505 (1.9); 4.2900 (1.0); 4.2809 (1.4); 4.2555 (1.5); 4.2463 (1.3); 3.9247 (0.5); 3.9126 (0.6); 3.9066 (0.8); 3.8959 (0.8); 3.8898 (0.8); 3.8841 (0.7); 3.8751 (0.8); 3.8654 (2.8); 3.8458 (0.8); 3.8308 (1.9); 3.8109 (1.2); 3.0433 (0.9); 3.0277 (0.9); 2.9984 (1.4); 2.9816 (1.3); 2.7965 (1.3); 2.7657 (1.3); 2.7512 (1.2); 2.7200 (1.0); 2.3476 (12.9); 2.3460 (12.7); 2.3078 (16.0); 2.2337 (14.9); 2.2087 (0.5); 2.0448 (0.4); 1.6518 (1.2); 0.0365 (5.6)
I-245: $^{1}$H-NMR(499.9 MHz, CDCl3):
δ = 7.9043 (5.1); 7.3247 (3.0); 7.3206 (2.8); 7.2614 (12.0); 7.1435 (2.4); 7.1272 (2.7); 7.1043 (0.7); 7.0885 (1.8); 7.0726 (1.2); 7.0325 (1.0); 7.0295 (1.0); 7.0161 (1.4); 7.0022 (0.7); 6.9994 (0.6); 6.8967 (1.7); 6.8925 (1.6); 6.8804 (1.5); 6.8762 (1.4); 6.8254 (0.9); 6.8230 (0.9); 6.8099 (1.5); 6.7965 (0.8); 6.1556 (1.4); 4.1483 (1.1); 4.1420 (1.2); 4.1265 (1.4); 4.1201 (1.4); 4.0004 (0.5); 3.9942 (0.8); 3.9852 (0.8); 3.9767 (0.8); 3.9670 (0.4); 3.9247 (1.5); 3.9154 (1.1); 3.9029 (1.2); 3.8935 (1.0); 3.4877 (14.0); 3.4371 (0.8); 3.1551 (1.0); 3.1450 (1.0); 3.1281 (1.3); 3.1180 (1.2); 2.9585 (1.3); 2.9402 (1.3); 2.9315 (1.0); 2.9132 (0.9); 2.6681 (0.6); 2.6423 (16.0); 2.0867 (0.6); 2.0800 (0.7); 2.0699 (1.2); 2.0596 (0.7); 2.0530 (0.6); 2.0055 (5.0); 1.5712 (1.1); 1.2427 (0.3); 1.0396 (0.5); 1.0304 (2.1); 1.0269 (2.2); 1.0240 (1.8); 1.0134 (2.2); 1.0099 (2.1); 1.0009 (0.6); 0.7834 (1.5); 0.7808 (1.3); 0.7771 (1.4); 0.7734 (2.2); 0.7701 (2.2); 0.7680 (2.2); 0.7579 (1.3); −0.0002 (14.6)
I-246: $^{1}$H-NMR(499.9 MHz, CDCl3):
δ = 7.9040 (4.8); 7.4760 (2.6); 7.4726 (2.7); 7.2609 (11.5); 7.1091 (0.8); 7.0929 (1.8); 7.0835 (1.7); 7.0772 (1.4); 7.0673 (3.4); 7.0424 (1.9); 7.0391 (2.0); 7.0269 (1.7); 7.0231 (1.2); 7.0138 (1.5); 6.9998 (0.6); 6.8255 (0.9); 6.8122 (1.4); 6.7985 (0.7); 6.1529 (1.4); 4.1455 (1.0); 4.1392 (1.2); 4.1237 (1.3); 4.1174 (1.4); 3.9967 (0.4); 3.9900 (0.7); 3.9812 (0.8); 3.9727 (0.8); 3.9253 (1.4); 3.9159 (1.1); 3.9034 (1.2); 3.8941 (0.9); 3.4856 (0.5); 3.4375 (0.4); 3.1423 (1.0); 3.1322 (1.0); 3.1153 (1.2); 3.1052 (1.2); 2.9460 (1.2); 2.9277 (1.2); 2.9192 (1.0); 2.9008 (0.9); 2.6680 (1.0); 2.6418 (14.6); 2.0943 (0.6); 2.0875 (0.6); 2.0775 (1.1); 2.0674 (0.7); 2.0606 (0.6); 2.0052 (16.0); 1.5580 (10.7); 1.0338 (1.8); 1.0304 (2.0); 1.0169 (2.0); 1.0135 (2.0); 1.0044 (0.6); 0.7884 (1.3); 0.7781 (2.1); 0.7736 (2.2); 0.7635 (1.4); −0.0002 (14.0)
I-247: $^{1}$H-NMR(499.9 MHz, CDCl3):
δ = 7.9036 (3.8); 7.4760 (2.2); 7.4725 (2.1); 7.2612 (7.6); 7.1099 (0.6); 7.0933 (1.4); 7.0838 (1.4); 7.0777 (1.0); 7.0675 (2.6); 7.0426 (1.7); 7.0390 (1.6); 7.0268 (1.4); 7.0228 (0.9); 7.0138 (1.1); 6.9997 (0.5); 6.8255 (0.7); 6.8124 (1.1); 6.7989 (0.6); 6.1559 (1.1); 4.1452 (0.8); 4.1389 (0.9); 4.1234 (1.0); 4.1171 (1.0); 3.9965 (0.4); 3.9900 (0.6); 3.9811 (0.6); 3.9726 (0.6); 3.9253 (1.1); 3.9160 (0.8); 3.9034 (0.9); 3.8942 (0.7); 3.1423 (0.8); 3.1322 (0.8); 3.1153 (1.0); 3.1052 (0.9); 2.9463 (0.9); 2.9279 (0.9); 2.9194 (0.8); 2.9010 (0.7); 2.6660 (1.1); 2.6415 (11.4); 2.0945 (0.5); 2.0878 (0.5); 2.0776 (0.9); 2.0675 (0.6); 2.0608 (0.5); 2.0050 (16.0); 1.5636 (5.5); 1.0339 (1.5); 1.0305 (1.6); 1.0170 (1.6); 1.0135 (1.6); 1.0044 (0.4); 0.7885 (1.1); 0.7786 (1.8); 0.7755 (1.8); 0.7736 (1.8); 0.7638 (1.0); −0.0002 (9.4)
I-248: $^{1}$H-NMR(300.2 MHz, CDCl3):
δ = 7.9692 (5.4); 7.2990 (7.5); 7.1670 (2.0); 7.1402 (3.8); 7.1202 (0.7); 7.1099 (0.3); 7.0970 (1.6); 7.0937 (1.6); 7.0704 (1.1); 7.0674 (1.2); 7.0193 (0.9); 7.0135 (1.1); 6.9953 (1.1); 6.9904 (1.3); 6.9687 (0.6); 6.9632 (0.6); 6.9381 (1.3); 6.9323 (1.2); 6.9123 (1.0); 6.9068 (1.0); 6.8563 (0.8); 6.8507 (0.7); 6.8298 (1.3); 6.8080 (0.7); 6.8029 (0.6); 6.2922 (1.5); 5.3361 (4.3); 5.0228 (1.5); 5.0169 (1.5); 5.0030 (1.8); 4.9959 (2.6); 4.9890 (1.7); 4.9751 (1.8); 4.9692 (1.7); 4.6478 (1.5); 4.6308 (2.0); 4.6257 (2.3); 4.6088 (2.4); 4.5889 (1.5); 4.2779 (0.6); 4.2699 (1.1); 4.2447 (1.2); 4.2368 (0.7); 4.1932 (0.7); 4.1694 (2.1); 4.1456 (2.1); 4.1219 (0.8); 4.0971 (0.3); 4.0737 (0.7); 4.0695 (0.7); 4.0463 (1.1); 4.0232 (0.6); 4.0190 (0.6); 3.9960 (0.4); 3.9345 (0.5); 3.9233 (0.6); 3.9174 (0.6); 3.8945 (1.8); 3.8607 (1.6); 3.8413 (0.9); 3.0768 (0.6); 3.0613 (0.6); 3.0318 (1.1); 3.0158 (1.1); 2.8565 (0.8); 2.8415 (1.0); 2.8253 (0.8); 2.8111 (0.7); 2.7801 (0.6); 2.6683 (16.0); 2.3741 (11.8); 2.1360 (0.5); 2.1250 (0.6); 2.1080 (1.0); 2.0820 (9.9); 2.0627 (0.4); 1.3195 (2.6); 1.2957 (5.2); 1.2719 (2.4); 1.0979 (0.7); 1.0836 (1.6); 1.0769 (1.9); 1.0701 (1.1); 1.0630 (1.2); 1.0550 (1.7); 1.0485 (1.8); 1.0348 (1.0); 0.8358 (0.9); 0.8218 (2.0); 0.8179 (2.0); 0.8091 (1.3); 0.8047 (2.0); 0.8007 (1.9); 0.7839 (0.8); 0.1063 (2.4); 0.0359 (9.0); 0.0251 (0.4)
I-249: $^{1}$H-NMR(300.2 MHz, CDCl3):
δ = 7.9706 (5.1); 7.2989 (7.3); 7.2037 (0.4); 7.1955 (0.5); 7.1887 (0.5); 7.1642 (0.7); 7.1512 (0.5); 7.1352 (1.1); 7.1078 (4.3); 7.0817 (3.9); 7.0597 (0.5); 7.0332 (1.3); 7.0289 (1.3); 7.0052 (4.0); 6.9834 (0.7); 6.9788 (0.7); 6.8551 (0.9); 6.8315 (1.4); 6.8065 (0.9); 6.7876 (1.7); 6.7615 (1.3); 6.2972 (1.8); 5.3356 (2.2); 4.2640 (1.3); 4.2388 (1.4); 4.1687 (0.6); 4.1453 (0.5); 4.1225 (0.4); 4.1137 (0.4); 4.1005 (0.4); 4.0806 (1.0); 4.0681 (0.9); 4.0540 (2.0); 4.0401 (2.0); 4.0264 (2.2); 4.0095 (1.4); 3.9979 (1.2); 3.9761 (0.4); 3.9494 (1.1); 3.9427 (1.0); 3.9228 (1.8); 3.9163 (1.8); 3.8912 (2.2); 3.8793 (2.4); 3.8730 (2.4); 3.8469 (1.9); 3.8275 (1.0); 3.7598 (0.4); 3.7472 (0.4); 3.7217 (0.4); 3.6010 (0.8); 3.5747 (1.3); 3.5660 (0.8); 3.5476 (0.8); 3.5392 (1.3); 3.5121 (0.8); 3.2613 (0.6); 3.2527 (0.6); 3.2348 (0.8); 3.2265 (0.9); 3.2086 (0.6); 3.2004 (0.6); 3.0544 (0.9); 3.0397 (0.8); 3.0095 (1.4); 2.9941 (1.3); 2.8392 (1.2); 2.8232 (1.0); 2.8053 (0.5); 2.7919 (1.3); 2.7782 (0.8); 2.7522 (1.8); 2.7344 (0.6); 2.7105 (0.3); 2.6970 (0.6); 2.6852 (1.0); 2.6668 (16.0); 2.6393 (0.4); 2.3911 (0.5); 2.3615 (2.3); 2.3452 (13.5); 2.3176 (1.3); 2.3056 (0.8); 2.2889 (0.8); 2.2791 (0.9); 2.2639 (0.9); 2.2537 (0.7); 2.2379 (0.7); 2.2287 (0.4); 2.2136 (0.4); 2.1674 (0.4); 2.1498 (0.6); 2.1378 (0.8); 2.1222 (1.2); 2.1057 (1.0); 2.0938 (1.0); 2.0821 (2.4); 2.0415 (0.4); 1.9072 (0.8); 1.8797 (1.1); 1.8663 (0.7); 1.8524 (0.8); 1.8388 (0.9); 1.8114 (0.7); 1.3196 (0.5); 1.2956 (1.2); 1.2719 (0.4); 1.0961 (0.7); 1.0817 (1.7); 1.0753 (2.0); 1.0613 (1.5); 1.0535 (2.1); 1.0468 (2.5); 1.0335 (1.5); 1.0170 (0.8); 1.0102 (0.8); 0.9964 (0.6); 0.9717 (0.4); 0.8335 (0.8); 0.8184 (2.3); 0.8015 (2.4); 0.7973 (2.4); 0.7548 (0.4); 0.1751 (0.8); 0.1611 (0.8); 0.1359 (0.4); 0.1070 (2.6); 0.0470 (0.3); 0.0363 (9.0)
I-250: $^{1}$H-NMR(499.9 MHz, CDCl3):
δ = 7.9038 (4.0); 7.3244 (2.3); 7.3203 (2.2); 7.2611 (8.6); 7.1433 (1.8); 7.1270 (2.0); 7.1027 (0.6); 7.0869 (1.4); 7.0711 (1.0); 7.0321 (0.7); 7.0291 (0.8); 7.0153 (1.1); 7.0017 (0.5); 6.9990 (0.5); 6.8966 (1.3); 6.8926 (1.2); 6.8804 (1.1); 6.8763 (1.0); 6.8225 (0.8); 6.8094 (1.2); 6.7960 (0.6); 6.1544 (1.2); 4.1478 (0.9); 4.1415 (0.9); 4.1260 (1.1); 4.1196 (1.1); 4.0000 (0.4); 3.9936 (0.6); 3.9846 (0.7); 3.9761 (0.6); 3.9698 (0.4); 3.9665 (0.4); 3.9240 (1.2); 3.9146 (0.9); 3.9021 (1.0); 3.8928 (0.7); 3.1546 (0.8); 3.1446 (0.8); 3.1277 (1.0); 3.1176 (1.0); 2.9581 (1.0); 2.9397 (1.0); 2.9311 (0.8); 2.9128 (0.7); 2.6671 (1.0); 2.6415 (12.2); 2.0863 (0.5); 2.0795 (0.6); 2.0695 (0.9); 2.0593 (0.6); 2.0526 (0.5); 2.0050 (16.0); 1.5617 (4.4); 1.0392 (0.4); 1.0301 (1.6); 1.0267 (1.6); 1.0237 (1.4); 1.0132 (1.8); 1.0098 (1.6); 1.0073 (1.3); 1.0007 (0.4); 0.7831 (1.2); 0.7807 (1.1); 0.7730 (1.9); 0.7702 (1.9); 0.7677 (1.9); 0.7577 (1.1); −0.0002 (10.4)
I-251: $^{1}$H-NMR(300.2 MHz, CDCl3):
δ = 7.5985 (0.4); 7.5723 (1.4); 7.5483 (2.6); 7.5221 (0.4); 7.4533 (2.1); 7.4300 (0.9); 7.4231 (1.3); 7.4076 (0.6); 7.3992 (0.8); 7.2988 (13.4); 7.0495 (1.5); 7.0253 (3.4); 6.9558 (1.4); 6.9312 (0.9); 5.3375 (0.5); 4.8697 (1.2); 4.6754 (1.3); 4.2116 (0.9); 4.1856 (1.1); 3.9738 (0.6); 3.9440 (1.7); 3.9129 (1.4); 3.9081 (1.8); 3.8964 (0.7); 3.8852 (3.7); 3.8629 (2.0); 3.6653 (0.4); 3.6570 (0.4); 3.6492 (0.6); 3.5716 (0.6); 3.5635 (0.4); 3.5563 (0.4); 3.5422 (0.3); 3.4180 (1.8); 3.4080 (0.6); 3.3912 (3.6); 3.3719 (14.5); 3.3555 (0.4); 3.3211 (0.3); 3.2013 (1.7); 3.1789 (3.4); 3.1563 (1.6); 3.0378 (0.5); 3.0220 (0.5); 2.9919 (1.0); 2.9762 (0.9); 2.9139 (0.9); 2.8842 (0.8); 2.8678 (0.5); 2.8379 (0.4); 2.6049 (1.1); 2.6004 (1.2); 2.5933 (2.4); 2.5723 (0.4); 2.5326 (0.7); 2.4878 (11.2); 2.3210 (16.0); 2.2881 (0.6); 2.2705 (0.4); 2.2557 (0.4); 2.0445 (0.6); 1.6878 (0.5); 1.6675 (0.5);

1.2918 (0.5); 0.2209 (0.5); 0.2068 (0.5); 0.1930 (0.8); 0.1848 (1.0); 0.1775 (1.0); 0.1634 (1.1); 0.1072 (0.4); 0.0481 (0.4); 0.0373 (11.1); 0.0264 (0.6)

I-252: $^1$H-NMR(300.2 MHz, CDCl3):

δ = 7.9788 (6.3); 7.4090 (0.8); 7.4004 (0.9); 7.3850 (1.4); 7.3765 (1.2); 7.3612 (1.1); 7.3549 (1.2); 7.2989 (12.1); 7.2101 (0.8); 7.1826 (2.1); 7.1789 (2.0); 7.1557 (3.0); 7.1381 (1.6); 7.1318 (1.9); 7.1108 (0.8); 7.1045 (0.7); 7.0361 (0.4); 7.0187 (2.5); 6.9932 (3.0); 6.9478 (0.4); 6.9077 (3.0); 6.7283 (1.6); 6.7046 (1.3); 6.0997 (1.8); 4.3227 (1.0); 4.3128 (1.2); 4.2877 (1.4); 4.2779 (1.3); 4.1942 (1.1); 4.1704 (3.4); 4.1466 (3.4); 4.1228 (1.3); 4.1014 (0.4); 3.9218 (0.9); 3.9058 (0.9); 3.8998 (0.8); 3.8900 (0.8); 3.8814 (0.8); 3.8694 (2.4); 3.8486 (1.1); 3.8346 (1.8); 3.8136 (1.2); 3.0519 (0.9); 3.0366 (1.0); 3.0183 (1.6); 3.0071 (1.5); 2.9928 (5.4); 2.9677 (4.6); 2.9423 (1.7); 2.7823 (1.4); 2.7507 (1.4); 2.7374 (1.2); 2.7051 (1.0); 2.3338 (0.8); 2.3088 (15.1); 2.2420 (0.8); 2.2168 (0.5); 2.1848 (14.2); 2.1182 (0.3); 2.0840 (16.0); 1.6703 (0.5); 1.6486 (0.5); 1.6213 (0.3); 1.3943 (4.9); 1.3691 (10.1); 1.3437 (4.8); 1.3207 (4.0); 1.2969 (8.0); 1.2731 (4.0); 0.9721 (0.5); 0.0472 (0.3); 0.0364 (14.5); 0.0257 (0.8)

I-253: $^1$H-NMR(300.2 MHz, CDCl3):

δ = 9.0325 (0.6); 9.0159 (0.6); 8.1695 (7.8); 8.1306 (0.6); 8.1141 (0.6); 7.6278 (5.3); 7.6105 (4.3); 7.5822 (0.3); 7.3626 (2.8); 7.3148 (1.3); 7.2988 (14.4); 7.2911 (1.6); 7.2768 (0.7); 7.0043 (2.6); 6.9787 (3.0); 6.9208 (3.2); 6.7060 (1.8); 6.6806 (1.5); 6.1911 (2.0); 5.1198 (2.9); 5.0996 (4.4); 5.0916 (3.4); 5.0713 (4.7); 5.0238 (2.4); 5.0154 (2.4); 5.0017 (3.4); 4.9936 (3.3); 4.9809 (1.8); 4.9726 (1.7); 4.6289 (0.5); 4.6063 (1.1); 4.6010 (1.0); 4.5835 (0.7); 4.5783 (1.8); 4.5556 (0.8); 4.5501 (0.8); 4.5275 (0.3); 4.3517 (1.1); 4.3423 (1.4); 4.3168 (1.4); 4.3069 (1.5); 3.9470 (0.6); 3.9311 (0.8); 3.9140 (0.9); 3.9034 (0.7); 3.8977 (0.7); 3.8734 (2.5); 3.8522 (1.1); 3.8384 (1.9); 3.8171 (1.2); 3.0667 (1.0); 3.0523 (1.0); 3.0214 (1.4); 3.0064 (1.3); 2.7607 (1.6); 2.7279 (1.5); 2.7153 (1.3); 2.6821 (1.2); 2.3047 (16.0); 2.1844 (15.0); 1.6327 (1.8); 1.2913 (0.6); 1.2565 (1.9); 1.2361 (1.9); 0.0471 (0.5); 0.0363 (12.9); 0.0254 (0.5)

I-254: $^1$H-NMR(300.2 MHz, CDCl3):

δ = 8.0397 (4.6); 7.5998 (2.7); 7.5824 (2.4); 7.3536 (1.4); 7.2989 (12.3); 7.2798 (0.9); 7.2733 (0.8); 7.2670 (0.5); 7.2588 (0.4); 7.0023 (1.5); 6.9768 (1.7); 6.9206 (1.7); 6.7170 (0.9); 6.6913 (0.8); 6.1224 (1.1); 4.3288 (0.6); 4.3196 (0.8); 4.2943 (0.8); 4.2843 (0.8); 3.9211 (0.4); 3.9029 (0.5); 3.8867 (0.4); 3.8803 (0.4); 3.8715 (0.4); 3.8631 (1.5); 3.8417 (0.8); 3.8346 (1.8); 3.8283 (1.4); 3.8132 (4.2); 3.7919 (2.1); 3.4322 (0.3); 3.3682 (16.0); 3.2259 (2.0); 3.2046 (3.9); 3.1832 (1.7); 3.0504 (0.6); 3.0357 (0.6); 3.0051 (0.8); 2.9897 (0.8); 2.7572 (0.8); 2.7247 (0.8); 2.7119 (0.7); 2.6789 (0.6); 2.2995 (9.4); 2.1898 (8.7); 1.6101 (4.1); 1.2916 (0.4); 0.0476 (0.4); 0.0368 (12.2); 0.0260 (0.5)

I-255: $^1$H-NMR(300.2 MHz, CDCl3):

δ = 8.0465 (8.3); 7.6130 (4.5); 7.5961 (3.9); 7.3514 (2.6); 7.2987 (23.2); 7.2882 (1.6); 7.2853 (1.5); 7.2671 (0.7); 7.0004 (2.4); 6.9749 (2.8); 6.9184 (2.9); 6.7065 (1.6); 6.6823 (1.3); 6.1588 (2.0); 4.3427 (1.2); 4.3328 (1.3); 4.3073 (1.5); 4.2976 (1.4); 4.2616 (1.6); 4.2363 (2.3); 4.2332 (2.3); 4.2080 (2.1); 4.1365 (0.6); 4.1176 (0.7); 4.1084 (1.4); 4.0905 (1.5); 4.0811 (1.0); 4.0626 (0.9); 4.0185 (1.2); 3.9941 (2.5); 3.9694 (1.7); 3.9661 (1.8); 3.9537 (1.5); 3.9487 (1.6); 3.9412 (1.5); 3.9301 (2.2); 3.9252 (2.9); 3.9202 (1.8); 3.9016 (1.8); 3.8967 (1.8); 3.8677 (2.5); 3.8467 (1.1); 3.8328 (2.0); 3.8115 (1.3); 3.8031 (0.6); 3.7787 (1.4); 3.7507 (1.5); 3.7264 (1.2); 3.7021 (0.4); 3.0588 (1.0); 3.0446 (1.0); 3.0138 (1.4); 2.9987 (1.3); 2.7572 (1.2); 2.7239 (1.2); 2.7122 (1.0); 2.6785 (0.9); 2.4983 (0.4); 2.4805 (0.4); 2.4715 (0.5); 2.4563 (0.9); 2.4390 (0.7); 2.4295 (1.0); 2.4127 (0.8); 2.4034 (0.6); 2.3862 (0.6); 2.3454 (0.7); 2.3190 (1.8); 2.3013 (16.0); 2.2776 (1.1); 2.2533 (0.9); 2.2293 (0.4); 2.1831 (14.7); 1.6145 (4.4); 1.2913 (0.9); 1.2574 (0.3); 0.0471 (1.0); 0.0363 (20.6); 0.0253 (0.9)

I-256: $^1$H-NMR(300.2 MHz, CDCl3):

δ = 8.0537 (6.4); 7.6303 (4.7); 7.6132 (4.1); 7.5857 (0.6); 7.4773 (0.5); 7.3582 (2.8); 7.2987 (13.1); 7.2846 (1.9); 7.2712 (1.1); 7.0018 (2.6); 6.9763 (3.0); 6.9481 (0.4); 6.9166 (3.2); 6.7033 (1.8); 6.6787 (1.5); 6.1610 (2.2); 4.3441 (1.1); 4.3349 (1.3); 4.3094 (1.4); 4.2996 (1.5); 3.9182 (0.9); 3.9071 (1.0); 3.8904 (0.8); 3.8653 (2.3); 3.8440 (1.2); 3.8302 (1.8); 3.8089 (1.2); 3.3168 (2.2); 3.2922 (5.1); 3.2678 (3.2); 3.0619 (1.1); 3.0478 (1.2); 3.0170 (1.5); 3.0019 (1.6); 2.9892 (3.6); 2.9648 (5.4); 2.9401 (2.4); 2.7542 (1.4); 2.7214 (1.4); 2.7090 (1.3); 2.6755 (1.1); 2.3430 (1.1); 2.3296 (1.0); 2.3026 (16.0); 2.2459 (0.7); 2.1794 (14.2); 2.0906 (0.4); 1.9021 (0.4); 1.8946 (0.4); 1.8823 (0.4); 1.6454 (1.4); 1.5037 (0.4); 1.4813 (0.5); 1.4733 (0.5); 1.4629 (0.6); 1.4258 (0.5); 1.2907 (0.6); 1.2583 (0.4); 0.2277 (1.2); 0.2010 (1.2); 0.1948 (1.1); 0.1698 (0.7); 0.1402 (0.4); 0.0362 (9.4)

I-257: $^1$H-NMR(499.9 MHz, CDCl3):

δ = 7.8888 (6.4); 7.5502 (5.4); 7.5403 (3.9); 7.5235 (0.5); 7.3135 (3.1); 7.2604 (8.7); 7.2494 (1.4); 7.2444 (1.5); 7.2381 (1.6); 7.2347 (1.5); 7.2269 (0.9); 6.9573 (2.7); 6.9421 (2.9); 6.8797 (3.4); 6.6718 (2.0); 6.6567 (1.7); 6.1097 (2.3); 4.2785 (1.5); 4.2718 (1.5); 4.2569 (1.6); 4.2503 (1.5); 3.8842 (0.8); 3.8765 (1.1); 3.8651 (1.1); 3.8573 (0.9); 3.8129 (2.0); 3.8001 (1.4); 3.7913 (1.7); 3.7786 (1.3); 3.0032 (5.8); 2.9968 (2.3); 2.9879 (7.2); 2.9691 (1.6); 2.9599 (1.5); 2.7526 (0.7); 2.7369 (1.4); 2.7213 (1.9); 2.7059 (2.8); 2.6863 (1.7); 2.6789 (1.5); 2.6588 (1.2); 2.3126 (0.4); 2.3040 (0.5); 2.2584 (16.0); 2.2326 (0.4); 2.1511 (15.4); 2.0891 (0.8); 2.0743 (1.7); 2.0667 (1.9); 2.0575 (2.0); 2.0528 (1.9); 2.0470 (1.5); 2.0430 (1.6); 2.0322 (0.8); 2.0277 (0.8); 1.9137 (0.3); 1.8921 (0.7); 1.8731 (1.6); 1.8659 (1.5); 1.8589 (2.5); 1.8566 (2.5); 1.8494 (1.5); 1.8407 (2.5); 1.8293 (1.2); 1.7903 (1.0); 1.7874 (1.0); 1.7710 (1.9); 1.7516 (2.2); 1.7340 (1.5); 1.7177 (0.5); 1.5735 (4.6); 1.3333 (0.4); 1.2840 (0.7); 1.2554 (3.3); 1.2178 (0.5); 0.8934 (0.4); 0.8804 (0.5); 0.8662 (0.5); 0.8582 (0.8); 0.8455 (1.0); −0.0002 (9.0)

I-258: $^1$H-NMR(300.2 MHz, CDCl3):

δ = 8.1576 (9.5); 7.6702 (1.0); 7.6645 (1.1); 7.6519 (1.1); 7.6451 (1.9); 7.6386 (1.4); 7.6262 (1.2); 7.6203 (1.3); 7.5680 (0.4); 7.5158 (0.9); 7.5100 (0.9); 7.4918 (1.1); 7.4880 (2.0); 7.4826 (1.5); 7.4646 (1.7); 7.4586 (1.4); 7.4133 (1.9); 7.4097 (1.8); 7.3858 (2.1); 7.3836 (2.2); 7.3600 (1.0); 7.3561 (1.0); 7.2988 (9.8); 7.0064 (2.5); 6.9810 (3.0); 6.9174 (2.9); 6.7366 (1.6); 6.7105 (1.3); 5.9193 (1.9); 4.3410 (1.2); 4.3320 (1.4); 4.3057 (1.5); 4.2966 (1.5); 3.9502 (0.6); 3.9432 (0.7); 3.9374 (0.8); 3.9332 (0.8); 3.9271 (0.8); 3.9216 (0.8); 3.9167 (0.9); 3.9006 (0.7); 3.8932 (0.7); 3.8793 (2.6); 3.8588 (1.1); 3.8442 (2.0); 3.8236 (1.3); 3.0662 (1.1); 3.0506 (1.0); 3.0209 (1.4); 3.0048 (1.3); 2.7760 (1.5); 2.7439 (1.4); 2.7307 (1.2); 2.6981 (1.1); 2.3646 (0.6); 2.3412 (0.7); 2.3088 (16.0); 2.2090 (2.6); 2.1925 (15.0); 2.0454 (4.6); 1.6023 (7.3); 0.0477 (0.5); 0.0369 (12.3); 0.0260 (0.6)

I-259: $^1$H-NMR(499.9 MHz, CDCl3):

δ = 7.9086 (5.4); 7.3117 (2.9); 7.2648 (1.2); 7.0812 (0.7); 7.0671 (3.9); 7.0517 (3.6); 7.0158 (0.9); 7.0127 (1.1); 6.9989 (1.5); 6.9856 (0.6); 6.9826 (0.6); 6.8065 (0.8); 6.8038 (0.8); 6.7909 (1.5); 6.7777 (0.8); 6.7751 (0.7); 6.7318 (1.5); 6.7165 (1.4); 6.1799 (1.6); 4.1825 (1.1); 4.1758 (1.2); 4.1606 (1.3); 4.1540 (1.4); 4.0174 (0.5); 4.0110 (0.7); 4.0052 (0.7); 4.0023 (0.8); 3.9997 (0.8); 3.9940 (0.8); 3.9880 (0.6); 3.9839 (0.4); 3.8817 (1.4); 3.8711 (1.2); 3.8598 (1.2); 3.8492 (1.1); 3.1430 (0.9); 3.1328 (1.0); 3.1161 (1.2); 3.1059 (1.1); 2.9028 (1.2); 2.8843 (1.2); 2.8759 (1.0); 2.8574 (0.9); 2.6296 (16.0); 2.1631 (12.3); 2.0869 (0.6); 2.0802 (0.7); 2.0700 (1.1); 2.0598 (0.7); 2.0531 (0.6); 1.9962 (0.6); 1.6990 (1.2); 1.0292 (1.0); 1.0252 (1.6); 1.0224 (2.0); 1.0172 (1.6); 1.0147 (1.5); 1.0087 (1.7); 1.0054 (2.0); 1.0013 (1.2); 0.7772 (1.2); 0.7738 (1.2); 0.7683 (1.9); 0.7650 (2.0); 0.7624 (2.2); 0.7547 (1.2); 0.7519 (1.3); −0.0002 (1.7)

I-260: $^1$H-NMR(300.2 MHz, CDCl3):

δ = 8.1222 (16.0); 7.4002 (6.2); 7.3933 (6.4); 7.2990 (9.6); 7.2957 (4.2); 7.2896 (5.5); 7.2862 (4.7); 7.2684 (9.9); 7.2625 (6.5); 7.2054 (4.3); 7.1782 (7.4); 7.1121 (4.8); 7.1051 (4.6); 7.0849 (2.7); 7.0779 (2.6); 5.9521 (2.5); 5.9445 (2.5); 4.1739 (2.1); 4.1639 (2.6); 4.1379 (3.0); 4.1280 (3.6); 4.0768 (0.4); 4.0616 (0.8); 4.0482 (1.4); 4.0435 (1.1); 4.0373 (1.4); 4.0329 (1.7); 4.0221 (1.7); 4.0127 (1.0); 4.0040 (1.0); 3.9940 (0.6); 3.9732 (3.8); 3.9582 (2.3); 3.9374 (2.5); 3.9223 (1.9); 3.1891 (1.7);

TABLE 2-continued 3.1709 (1.7); 3.1439 (3.2); 3.1256 (3.0); 3.0485 (3.2); 3.0194 (3.1); 3.0034 (1.8); 2.9741 (1.8); 2.2035 (2.1); 1.6101 (3.9); 0.9966 (0.3); 0.1070 (0.5); 0.0469 (0.4); 0.0360 (10.9); 0.0252 (0.4)

I-261: $^1$H-NMR(300.2 MHz, CDCl3):
δ = 8.1225 (16.0); 7.5511 (6.7); 7.5447 (6.8); 7.3106 (4.6); 7.3051 (6.4); 7.2988 (12.4); 7.2617 (4.3); 7.2558 (12.0); 7.2501 (8.0); 7.2347 (5.0); 7.2282 (4.6); 7.1396 (7.4); 7.1124 (4.8); 5.9485 (2.9); 5.9416 (2.9); 4.1726 (2.2); 4.1627 (2.7); 4.1367 (3.2); 4.1269 (3.7); 4.0750 (0.5); 4.0598 (1.0); 4.0462 (1.6); 4.0418 (1.4); 4.0350 (1.6); 4.0310 (1.9); 4.0203 (1.8); 4.0117 (1.2); 4.0023 (1.2); 3.9921 (0.8); 3.9753 (4.0); 3.9604 (2.4); 3.9395 (2.7); 3.9245 (2.0); 3.1765 (1.8); 3.1586 (1.8); 3.1315 (3.4); 3.1133 (3.1); 3.0375 (3.4); 3.0085 (3.2); 2.9925 (1.9); 2.9632 (1.8); 2.2045 (6.1); 2.0417 (3.8); 1.6129 (1.9); 0.1065 (0.6); 0.0465 (0.8); 0.0359 (13.5); 0.0250 (0.6)

I-262: $^1$H-NMR(300.2 MHz, CDCl3):
δ = 8.1526 (0.5); 8.1431 (8.7); 7.5304 (0.5); 7.5257 (0.7); 7.5238 (0.7); 7.5199 (0.6); 7.5011 (1.5); 7.4830 (0.7); 7.4783 (1.0); 7.4731 (0.7); 7.2988 (3.9); 7.2668 (2.2); 7.2406 (1.8); 7.2274 (1.0); 7.2248 (1.1); 7.2209 (1.2); 7.2011 (1.4); 7.1992 (1.4); 7.1745 (0.6); 7.0107 (2.5); 6.9852 (2.9); 6.9105 (3.0); 6.7154 (1.6); 6.6906 (1.4); 6.1589 (2.0); 4.3121 (1.0); 4.3037 (1.4); 4.2777 (1.5); 4.2692 (1.2); 3.9222 (0.5); 3.9052 (0.8); 3.8951 (0.7); 3.8895 (0.8); 3.8824 (0.7); 3.8664 (2.9); 3.8464 (0.7); 3.8321 (1.9); 3.8116 (1.1); 3.0533 (0.9); 3.0383 (0.9); 3.0086 (1.4); 2.9924 (1.3); 2.7778 (1.2); 2.7466 (1.2); 2.7326 (1.1); 2.7010 (1.0); 2.3086 (16.0); 2.1616 (15.0); 2.0412 (1.9); 1.6467 (1.4); 1.5431 (0.6); 1.5171 (2.1); 1.4968 (0.8); 1.4802 (0.6); 1.4538 (2.1); 1.4335 (0.8); 1.2289 (0.6); 1.2221 (0.5); 1.2052 (2.2); 1.1989 (2.4); 1.1754 (2.6); 1.1688 (1.9); 1.1523 (0.4); 1.1457 (0.4); 0.0383 (3.8)

I-263: $^1$H-NMR(300.2 MHz, CDCl3):
δ = 7.4738 (0.3); 7.4483 (0.5); 7.4269 (0.4); 7.3453 (0.6); 7.3217 (0.5); 7.3191 (0.4); 7.2987 (17.9); 7.2791 (0.7); 7.2528 (0.7); 7.0508 (0.8); 7.0246 (2.1); 6.9477 (0.8); 6.9225 (0.4); 4.7748 (0.7); 4.2165 (0.6); 4.1909 (0.7); 3.9375 (0.9); 3.9238 (0.4); 3.9071 (0.7); 2.9959 (0.5); 2.9788 (0.5); 2.9038 (0.5); 2.8746 (0.4); 2.5591 (9.3); 2.3245 (6.2); 2.3065 (5.8); 2.0460 (16.0); 1.5902 (7.6); 1.4943 (0.8); 1.4312 (0.8); 1.4090 (0.3); 1.1862 (0.8); 1.1792 (0.9); 1.1565 (0.9); 0.0483 (0.8); 0.0375 (21.6); 0.0266 (0.7)

I-264: $^1$H-NMR(300.2 MHz, CDCl3):
δ = 8.1623 (1.6); 7.6310 (0.9); 7.6277 (1.0); 7.6229 (0.5); 7.6098 (0.6); 7.5867 (1.1); 7.5616 (3.1); 7.5563 (1.7); 7.5374 (0.4); 7.5093 (1.7); 7.4814 (0.8); 7.4740 (1.2); 7.4668 (0.6); 7.4593 (0.5); 7.4567 (0.5); 7.4509 (0.7); 7.4436 (0.4); 7.3508 (0.4); 7.2988 (6.7); 7.0805 (1.2); 7.0549 (2.3); 7.0410 (1.9); 7.0011 (1.3); 6.9755 (0.7); 6.9631 (0.6); 6.9180 (0.5); 5.6422 (1.1); 4.1494 (0.9); 4.1235 (1.0); 3.9395 (0.4); 3.9314 (0.6); 3.9081 (1.7); 3.8938 (0.7); 3.8854 (0.6); 3.8765 (1.3); 3.8592 (0.9); 3.8249 (0.4); 3.8040 (0.3); 3.7236 (0.9); 3.7188 (0.9); 3.7034 (2.0); 3.6852 (1.0); 3.6790 (1.0); 3.1836 (0.8); 3.1624 (1.4); 3.1510 (1.6); 3.1433 (0.9); 3.1318 (0.8); 3.1035 (0.4); 3.0884 (16.0); 2.9193 (1.0); 2.8990 (1.8); 2.8721 (0.9); 2.3372 (10.2); 2.3197 (9.5); 2.2971 (3.0); 2.1801 (2.6); 1.4843 (0.6); 1.4720 (0.7); 1.2926 (0.5); 0.1087 (0.4); 0.0380 (6.9)

I-265: $^1$H-NMR(499.9 MHz, CDCl3):
δ = 7.5506 (0.5); 7.5351 (1.7); 7.5196 (4.4); 7.5047 (0.6); 7.4170 (2.6); 7.3727 (1.6); 7.3584 (1.2); 7.2591 (3.2); 6.9995 (3.0); 6.9852 (1.8); 6.9698 (2.8); 6.9247 (1.9); 6.9095 (1.2); 4.6809 (1.9); 4.1229 (1.0); 4.1171 (1.2); 4.1013 (1.3); 4.0954 (1.3); 3.9300 (0.8); 3.9201 (0.9); 3.9134 (0.9); 3.9081 (0.7); 3.9027 (0.6); 3.8927 (1.7); 3.8830 (0.8); 3.8709 (1.2); 3.8612 (0.9); 3.5416 (0.8); 3.5232 (1.2); 3.5052 (0.8); 2.9721 (0.7); 2.9616 (0.8); 2.9444 (1.3); 2.9337 (1.2); 2.8718 (1.3); 2.8539 (1.2); 2.8443 (0.8); 2.8261 (0.8); 2.2822 (15.0); 2.2782 (16.0); 2.2594 (0.4); 2.1659 (0.6); 2.1486 (1.1); 2.1391 (1.2); 2.1314 (1.2); 2.0996 (0.4); 1.9969 (0.6); 1.9659 (2.4); 1.9581 (2.2); 1.9410 (1.6); 1.7424 (1.4); 1.7353 (1.5); 1.5712 (2.3); 1.2562 (0.4); −0.0002 (3.7)

I-266: $^1$H-NMR(300.2 MHz, CDCl3):
δ = 7.5347 (1.2); 7.5107 (3.3); 7.4871 (0.3); 7.4209 (1.6); 7.3758 (0.7); 7.3682 (1.2); 7.3610 (0.6); 7.3544 (0.4); 7.3516 (0.5); 7.3455 (0.7); 7.3381 (0.4); 7.2989 (4.3); 7.0283 (1.8); 7.0111 (0.9); 6.9855 (2.5); 6.9612 (1.4); 6.9354 (0.5); 5.9718 (0.7); 5.9573 (0.4); 5.0851 (1.1); 5.0801 (1.2); 4.1354 (0.6); 4.1239 (0.7); 4.0987 (0.8); 4.0872 (0.8); 3.9200 (0.3); 3.9111 (0.4); 3.9004 (0.5); 3.8920 (0.6); 3.8818 (0.5); 3.8726 (0.4); 3.8061 (1.0); 3.7868 (0.7); 3.7696 (0.9); 3.7503 (0.8); 3.7288 (16.0); 3.6910 (0.8); 3.6739 (0.9); 3.6555 (0.8); 3.6371 (0.7); 3.6146 (0.4); 2.9907 (0.5); 2.9706 (0.5); 2.9445 (0.8); 2.9244 (0.8); 2.8125 (0.8); 2.7847 (0.8); 2.7665 (0.6); 2.7385 (0.5); 2.5322 (1.5); 2.5095 (3.2); 2.4868 (1.8); 2.3163 (9.2); 2.2988 (9.8); 2.1019 (0.5); 2.0793 (1.6); 2.0567 (2.2); 2.0341 (1.4); 2.0112 (0.3); 1.6466 (0.6); 0.0374 (4.8)

I-267: $^1$H-NMR(300.2 MHz, CDCl3):
δ = 7.5571 (0.5); 7.5311 (2.0); 7.5074 (5.6); 7.4842 (0.6); 7.4414 (2.8); 7.3855 (1.1); 7.3780 (1.9); 7.3709 (1.1); 7.3643 (0.7); 7.3552 (1.2); 7.2989 (9.1); 7.0345 (3.2); 7.0089 (1.2); 6.9833 (4.5); 6.9690 (2.8); 6.9409 (0.7); 6.0630 (0.8); 6.0451 (1.5); 6.0263 (0.8); 5.2446 (2.0); 4.1009 (0.9); 4.0907 (1.1); 4.0652 (1.2); 4.0549 (1.3); 3.8906 (0.7); 3.8806 (0.8); 3.8718 (0.9); 3.8643 (0.9); 3.8438 (0.6); 3.8306 (1.9); 3.8129 (0.8); 3.7947 (1.3); 3.7770 (0.9); 3.5758 (0.5); 3.5568 (0.5); 3.5314 (1.8); 3.5123 (2.0); 3.5051 (1.8); 3.4852 (1.4); 3.4604 (0.4); 3.4411 (0.4); 2.9973 (0.8); 2.9773 (0.8); 2.9519 (1.4); 2.9309 (1.3); 2.8350 (1.3); 2.8090 (1.3); 2.7892 (0.8); 2.7627 (0.8); 2.5402 (1.2); 2.3208 (15.1); 2.2944 (16.0); 1.6456 (2.7); 1.3312 (15.6); 1.3194 (15.9); 1.2921 (1.0); 1.2648 (0.3); 1.2587 (0.4); 0.1079 (0.7); 0.0375 (10.6); 0.0267 (0.5)

I-268: $^1$H-NMR(300.2 MHz, CDCl3):
δ = 8.0565 (2.3); 8.0535 (2.4); 8.0477 (2.5); 8.0448 (2.2); 7.6358 (2.5); 7.6320 (2.5); 7.6269 (2.2); 7.6188 (5.2); 7.6154 (5.7); 7.6009 (0.4); 7.4929 (2.7); 7.4722 (0.4); 7.4650 (0.4); 7.4584 (1.2); 7.4454 (1.6); 7.4385 (1.5); 7.4283 (1.1); 7.4198 (0.7); 7.2988 (13.8); 7.0904 (0.4); 7.0679 (0.4); 7.0350 (2.3); 7.0095 (6.4); 6.9330 (2.0); 6.9074 (1.1); 6.8841 (3.2); 6.8753 (3.2); 6.8595 (0.4); 6.8504 (0.3); 5.0046 (1.8); 4.9954 (1.8); 3.9002 (1.1); 3.8895 (1.4); 3.8643 (1.3); 3.8537 (2.1); 3.8236 (0.8); 3.8132 (0.8); 3.8050 (0.8); 3.7957 (0.8); 3.7861 (0.6); 3.7757 (0.5); 3.7289 (0.5); 3.7022 (1.8); 3.6863 (1.4); 3.6664 (1.3); 3.6506 (1.0); 2.9169 (0.5); 2.8970 (0.6); 2.8705 (1.8); 2.8462 (2.4); 2.8166 (1.7); 2.7992 (0.5); 2.7706 (0.5); 2.3586 (1.7); 2.3415 (1.6); 2.3119 (15.1); 2.2947 (16.0); 2.0813 (0.7); 1.6469 (0.6); 1.2929 (0.8); 0.1088 (1.4); 0.0491 (0.5); 0.0458 (0.4); 0.0383 (16.6); 0.0290 (0.6); 0.0274 (0.7)

I-269: $^1$H-NMR(300.2 MHz, CDCl3):
δ = 7.5276 (0.5); 7.5007 (2.3); 7.4805 (6.0); 7.4613 (0.6); 7.4224 (3.0); 7.3812 (0.4); 7.3651 (1.3); 7.3553 (1.7); 7.3476 (1.4); 7.3342 (1.2); 7.3268 (0.7); 7.2984 (18.0); 7.0145 (3.7); 6.9918 (1.4); 6.9662 (4.6); 6.9495 (3.0); 6.9236 (0.8); 6.0218 (0.8); 6.0053 (1.6); 5.9887 (0.8); 5.3805 (1.7); 4.1931 (0.8); 4.1693 (2.5); 4.1455 (2.5); 4.1218 (1.0); 4.1006 (0.4); 4.0844 (1.0); 4.0730 (1.1); 4.0479 (1.2); 4.0368 (1.2); 3.8627 (1.0); 3.7884 (1.6); 3.7699 (1.1); 3.7516 (1.3); 3.7329 (1.1); 3.7014 (0.7); 3.6796 (1.2); 3.6622 (1.4); 3.6419 (1.4); 3.6232 (1.1); 3.6010 (0.7); 3.5803 (0.4); 3.0141 (0.4); 3.0010 (0.4); 2.9523 (1.3); 2.9322 (1.4); 2.9069 (2.0); 2.8858 (2.0); 2.8132 (2.5); 2.7866 (2.6); 2.7672 (2.1); 2.7406 (1.9); 2.5335 (2.3); 2.5121 (3.9); 2.4900 (2.5); 2.3738 (0.4); 2.3080 (16.0); 2.2717 (16.0); 2.1158 (1.3); 2.0829 (11.9); 2.0523 (2.0); 2.0307 (2.6); 2.0089 (1.6); 1.9868 (0.5); 1.4680 (1.6); 1.3195 (3.1); 1.2957 (6.3); 1.2719 (3.1); 1.2571 (1.0); 0.1057 (9.4); 0.0934 (0.4); 0.0462 (1.0); 0.0354 (22.9); 0.0261 (0.7); 0.0246 (0.8)

I-270: $^1$H-NMR(300.2 MHz, CDCl3):
δ = 8.1526 (10.5); 7.6416 (0.6); 7.6284 (5.6); 7.6253 (6.4); 7.6162 (2.4); 7.6052 (2.9); 7.5788 (0.7); 7.3624 (3.2); 7.3441 (1.1); 7.3126 (19.1); 7.2990 (7.2); 7.2822 (1.0); 7.2529 (1.3); 7.2457 (1.8); 7.2369 (0.9); 7.2312 (1.6); 7.2239 (1.8); 7.2149 (0.9); 6.7125 (2.2); 6.5247 (4.3); 6.3369 (2.1); 6.1198 (2.2); 5.3355 (5.7); 4.2806 (1.4); 4.2715 (1.8); 4.2458 (2.0); 4.2365 (1.8); 4.1909 (0.9); 4.1671 (2.8); 4.1433 (2.8); 4.1200 (1.4); 4.0987 (1.2); 4.0764 (0.6); 3.9684 (0.7); 3.9594 (0.8); 3.9517 (0.9);

TABLE 2-continued 3.9430 (0.9); 3.9363 (1.0); 3.9276 (1.0); 3.9189 (1.0); 3.9083 (3.4); 3.8900 (1.1); 3.8735 (2.4); 3.8547 (1.4); 3.1250 (1.0); 3.1100 (1.0); 3.0806 (1.5); 3.0646 (1.4); 2.8740 (1.6); 2.8431 (1.6); 2.8295 (1.4); 2.7980 (1.2); 2.0928 (0.4); 2.0796 (16.0); 2.0392 (1.8); 1.6690 (0.5); 1.6467 (0.7); 1.6376 (0.7); 1.6205 (1.2); 1.5988 (0.5); 1.4288 (0.4); 1.4041 (0.4); 1.3184 (3.5); 1.2945 (7.7); 1.2708 (3.3); 0.9957 (1.0); 0.9790 (0.4); 0.9712 (2.0); 0.9469 (0.8); 0.1074 (2.0); 0.0361 (8.0); 0.0252 (0.3)

I-271: $^{1}$H-NMR(300.2 MHz, CDCl3):

δ = 8.1283 (9.7); 7.4820 (1.8); 7.4545 (3.9); 7.4270 (2.3); 7.2991 (1.4); 7.1318 (1.5); 7.1294 (1.3); 7.1262 (1.5); 7.1246 (1.5); 7.1042 (1.2); 7.1016 (1.1); 7.0988 (1.3); 6.9948 (2.5); 6.9693 (3.0); 6.9439 (1.6); 6.9413 (2.0); 6.9338 (4.4); 6.9168 (1.3); 6.9142 (1.4); 6.9093 (1.7); 6.9067 (1.7); 6.8745 (2.0); 6.8671 (3.2); 6.8600 (1.5); 6.8252 (2.2); 6.7383 (1.6); 6.7130 (1.3); 6.5809 (4.6); 6.3365 (2.3); 6.1467 (1.9); 5.3310 (0.5); 4.3019 (1.1); 4.2919 (1.3); 4.2668 (1.5); 4.2576 (1.4); 3.9149 (0.5); 3.9085 (0.6); 3.9031 (0.7); 3.8987 (0.7); 3.8927 (0.7); 3.8878 (0.7); 3.8822 (0.8); 3.8758 (0.6); 3.8731 (0.6); 3.8662 (0.7); 3.8582 (0.7); 3.8466 (2.5); 3.8260 (1.0); 3.8118 (1.9); 3.7910 (1.2); 3.0447 (1.0); 3.0295 (1.0); 2.9994 (1.4); 2.9836 (1.3); 2.7524 (1.4); 2.7206 (1.4); 2.7072 (1.2); 2.6748 (1.1); 2.2965 (16.0); 2.2161 (14.9); 1.6829 (4.2); 0.0412 (1.7)

I-272: $^{1}$H-NMR(300.2 MHz, CDCl3):

δ = 8.1079 (9.0); 7.2991 (0.8); 7.1374 (3.4); 7.1091 (4.0); 7.0066 (2.5); 6.9811 (3.1); 6.9411 (3.0); 6.8138 (2.9); 6.8069 (4.8); 6.7971 (3.6); 6.7891 (1.6); 6.7686 (3.3); 6.7608 (3.4); 6.7377 (1.4); 6.1056 (2.2); 4.3091 (1.2); 4.2990 (1.3); 4.2738 (1.5); 4.2637 (1.4); 3.9259 (0.5); 3.9192 (0.6); 3.9097 (0.8); 3.9035 (0.7); 3.8930 (0.8); 3.8872 (0.6); 3.8767 (0.6); 3.8698 (0.5); 3.8610 (0.4); 3.8438 (2.3); 3.8230 (1.2); 3.8084 (1.8); 3.7876 (1.2); 3.0525 (1.0); 3.0368 (1.0); 3.0071 (1.4); 2.9910 (1.3); 2.7532 (1.5); 2.7207 (1.4); 2.7078 (1.2); 2.6749 (1.1); 2.3035 (16.0); 2.2287 (15.0); 2.1965 (0.9); 2.0299 (2.6); 0.0402 (0.8)

I-273: $^{1}$H-NMR(300.2 MHz, CDCl3):

δ = 7.9511 (5.2); 7.6284 (2.2); 7.4035 (1.4); 7.3774 (2.0); 7.2987 (8.3); 7.2179 (1.4); 7.1914 (1.0); 7.1348 (0.6); 7.1079 (1.6); 7.0812 (1.4); 7.0528 (1.0); 7.0467 (1.1); 7.0290 (1.1); 7.0239 (1.2); 7.0024 (0.6); 6.9967 (0.5); 6.8555 (0.7); 6.8496 (0.7); 6.8290 (1.2); 6.8074 (0.7); 6.8019 (0.6); 6.2083 (1.2); 6.2012 (1.2); 5.3366 (9.0); 4.1933 (0.8); 4.1838 (1.1); 4.1580 (1.4); 4.1489 (1.4); 4.0865 (0.4); 4.0753 (0.6); 4.0599 (0.7); 4.0461 (0.6); 4.0266 (1.9); 4.0131 (0.7); 3.9916 (1.0); 3.9777 (0.7); 3.3038 (0.6); 3.2888 (0.6); 3.2599 (1.1); 3.2440 (1.0); 3.1217 (1.0); 3.0920 (1.0); 3.0776 (0.8); 3.0474 (0.7); 2.6832 (16.0); 2.6373 (0.6); 2.1128 (0.5); 2.1014 (0.6); 2.0835 (1.2); 2.0671 (0.6); 2.0562 (0.5); 1.6032 (9.0); 1.2964 (0.5); 1.0803 (0.4); 1.0660 (1.6); 1.0591 (1.9); 1.0485 (1.0); 1.0444 (0.9); 1.0374 (1.7); 1.0309 (1.8); 1.0196 (0.7); 0.8115 (0.9); 0.7957 (2.0); 0.7889 (1.8); 0.7795 (2.1); 0.7725 (1.3): 0.7620 (0.8); 0.1074 (2.9); 0.0480 (0.4); 0.0372 (11.6); 0.0264 (0.5)

I-274: $^{1}$H-NMR(499.9 MHz, CDCl3):

δ = 8.1159 (5.7); 7.5661 (1.2); 7.5528 (4.0); 7.5377 (2.4); 7.5286 (1.6); 7.5125 (2.1); 7.4969 (0.9); 7.2596 (19.4); 7.2071 (6.5); 7.1994 (4.9); 7.0789 (0.8); 7.0710 (1.4); 7.0627 (2.6); 7.0556 (2.1); 7.0468 (1.9); 6.8197 (4.3); 6.1876 (1.8); 5.2984 (4.6); 4.3560 (1.1); 4.3490 (1.2); 4.3342 (1.2); 4.3273 (1.3); 4.0189 (0.5); 4.0110 (0.7); 4.0055 (0.7); 3.9990 (0.8); 3.9914 (0.6); 3.8370 (1.4); 3.8240 (1.2); 3.8152 (1.4); 3.8022 (1.2); 3.4563 (16.0); 3.1722 (0.9); 3.1628 (1.0); 3.1436 (1.2); 3.1343 (1.2); 2.8727 (1.2); 2.8527 (1.2); 2.8442 (1.1); 2.8242 (1.0); 2.0050 (0.3); 1.7880 (0.7); 1.6424 (0.3); 1.6022 (0.4); 1.5920 (0.4); 1.5778 (0.4); 1.5651 (0.4); 1.5424 (0.5); 1.5250 (0.3); 1.4218 (0.3); 1.3208 (0.3); 1.3078 (0.4); 1.2838 (0.5); 1.2546 (3.5); 1.2317 (0.6); 1.2159 (0.5); 0.8802 (0.5); 0.8579 (1.1); 0.8451 (1.5); −0.0002 (24.2)

I-275: $^{1}$H-NMR(300.2 MHz, CDCl3):

δ = 8.1152 (6.1); 7.2988 (2.8); 7.1320 (1.6); 7.1064 (2.0); 7.0016 (1.7); 6.9761 (2.0); 6.9334 (2.0); 6.8585 (1.2); 6.8514 (1.5); 6.8322 (1.0); 6.8252 (1.3); 6.7823 (2.1); 6.7757 (1.9); 6.7340 (1.1); 6.7087 (0.9); 6.2953 (1.3); 4.2905 (0.7); 4.2822 (0.9); 4.2569 (1.0); 4.2475 (0.8); 3.8998 (0.3); 3.8887 (0.4); 3.8828 (0.5); 3.8727 (0.5); 3.8675 (0.5); 3.8607 (0.5); 3.8438 (1.9); 3.8235 (0.5); 3.8095 (1.3); 3.7887 (0.8); 3.2373 (16.0); 3.0421 (0.6); 3.0266 (0.6); 2.9973 (1.0); 2.9808 (0.9); 2.7581 (0.8); 2.7272 (0.8); 2.7127 (0.8); 2.6816 (0.7); 2.3019 (10.8); 2.2288 (10.0); 1.6484 (0.5); 0.0401 (2.9)

I-276: $^{1}$H-NMR(300.2 MHz, CDCl3):

δ = 8.1422 (10.2); 7.2988 (2.9); 7.2744 (1.3); 7.2714 (1.3); 7.2681 (1.2); 7.2530 (3.1); 7.2292 (2.1); 7.2245 (2.2); 7.2011 (0.7); 7.1966 (1.0); 7.1093 (1.4); 7.1030 (1.4); 7.0875 (1.4); 7.0825 (1.2); 7.0783 (1.6); 7.0635 (1.0); 7.0544 (0.9); 7.0087 (2.5); 6.9832 (3.0); 6.9093 (2.8); 6.8612 (1.9); 6.7297 (1.6); 6.7045 (1.3); 6.6187 (3.9); 6.3762 (2.0); 6.0757 (1.9); 4.3131 (1.1); 4.3040 (1.4); 4.2782 (1.4); 4.2692 (1.4); 3.9279 (0.5); 3.9207 (0.6); 3.9158 (0.7); 3.9107 (0.8); 3.9041 (0.7); 3.8999 (0.7); 3.8948 (0.8); 3.8883 (0.6); 3.8789 (0.8); 3.8651 (2.8); 3.8448 (0.9); 3.8304 (2.0); 3.8099 (1.2); 3.0530 (1.0); 3.0375 (1.0); 3.0080 (1.4); 2.9916 (1.3); 2.7770 (1.4); 2.7457 (1.3); 2.7320 (1.2); 2.7001 (1.1); 2.3039 (16.0); 2.1724 (15.0); 1.6681 (0.8); 0.0389 (2.3)

I-277: $^{1}$H-NMR(300.2 MHz, CDCl3):

δ = 8.0748 (0.4); 8.0680 (0.5); 7.8830 (4.3); 7.8780 (4.2); 7.5795 (4.6); 7.5625 (4.2); 7.5346 (0.5); 7.5111 (0.4); 7.3519 (0.4); 7.3180 (2.6); 7.2987 (37.3); 7.2865 (0.7); 7.2703 (1.0); 7.2629 (1.0); 7.2541 (1.4); 7.2473 (1.1); 7.2401 (0.9); 7.2321 (0.8); 7.0338 (0.4); 6.9962 (2.3); 6.9708 (2.7); 6.9153 (2.9); 6.7144 (1.6); 6.6886 (1.3); 6.1638 (0.3); 6.1296 (1.9); 4.3200 (1.0); 4.3097 (1.2); 4.2854 (1.3); 4.2755 (1.2); 3.9493 (0.3); 3.9080 (0.9); 3.8952 (0.9); 3.8800 (0.8); 3.8580 (2.0); 3.8365 (1.0); 3.8234 (1.4); 3.8024 (1.0); 3.3985 (0.6); 3.3901 (0.4); 3.1339 (0.5); 3.0424 (1.0); 3.0281 (0.9); 2.9973 (1.3); 2.9819 (1.2); 2.7557 (1.3); 2.7243 (1.3); 2.7113 (1.1); 2.6775 (1.0); 2.3576 (0.4); 2.3285 (1.3); 2.2957 (16.0); 2.1859 (14.4); 1.9616 (0.5); 1.9437 (1.0); 1.9295 (1.0); 1.9155 (1.1); 1.9007 (0.6); 1.6002 (9.7); 1.5465 (1.6); 1.5320 (1.5); 1.5171 (1.4); 1.4969 (1.3); 1.4810 (0.8); 1.4591 (0.5); 1.4210 (0.3); 1.3242 (1.0); 1.3169 (1.1); 1.2938 (4.0); 1.2794 (1.5); 1.2720 (1.3); 1.2629 (1.0); 1.2557 (0.9); 1.1671 (0.3); 0.9797 (0.4); 0.9663 (1.1); 0.9522 (1.6); 0.9478 (1.5); 0.9365 (1.9); 0.9187 (2.0); 0.8980 (1.1); 0.8718 (0.4); 0.4991 (0.6); 0.4847 (1.4); 0.4696 (1.6); 0.4553 (1.8); 0.4423 (1.4); 0.4278 (0.8); 0.4088 (0.4); 0.3980 (0.4); 0.2215 (0.5); 0.1939 (1.9); 0.1833 (2.2); 0.1074 (0.9); 0.0487 (1.2); 0.0379 (45.2); 0.0287 (2.3); 0.0271 (2.4); −0.0022 (0.4); −0.0301 (0.3)

I-278: $^{1}$H-NMR(499.9 MHz, CDCl3):

δ = 7.5541 (0.5); 7.5384 (1.4); 7.5255 (3.4); 7.5230 (3.5); 7.5110 (0.5); 7.3864 (2.0); 7.3488 (1.3); 7.3446 (1.3); 7.3404 (0.9); 7.3348 (1.0); 7.3308 (1.0); 7.2600 (11.3); 7.0032 (2.4); 6.9998 (2.3); 6.9883 (2.9); 6.9222 (0.9); 6.9059 (0.6); 6.8957 (0.9); 6.8801 (0.6); 4.7032 (1.0); 4.6853 (0.9); 4.2035 (0.5); 4.1972 (0.6); 4.1818 (0.6); 4.1752 (0.7); 4.1602 (0.7); 4.1447 (0.7); 3.9342 (0.4); 3.9281 (0.5); 3.9226 (0.6); 3.9051 (1.5); 3.8978 (0.9); 3.8889 (1.2); 3.8798 (1.2); 3.8685 (0.6); 3.8578 (0.7); 3.8466 (0.5); 3.8041 (0.7); 3.7816 (0.7); 3.7710 (0.6); 3.7483 (0.6); 3.0127 (0.4); 3.0027 (0.5); 2.9917 (0.6); 2.9847 (0.7); 2.9809 (0.8); 2.9752 (0.6); 2.9641 (0.6); 2.9528 (0.6); 2.8642 (0.6); 2.8475 (0.6); 2.8367 (0.4); 2.8184 (0.8); 2.8002 (0.6); 2.7900 (0.5); 2.7723 (0.4); 2.3743 (0.4); 2.3691 (0.4); 2.3251 (0.9); 2.2820 (16.0); 2.2760 (8.2); 1.8252 (0.4); 1.8132 (0.7); 1.8102 (0.7); 1.8079 (0.7); 1.7974 (1.1); 1.7867 (0.7); 1.7846 (0.7); 1.7813 (0.8); 1.7693 (0.5); 1.5708 (2.0); 1.4769 (0.4); 1.4656 (0.6); 1.4579 (0.7); 1.4476 (0.9); 1.4391 (0.9); 1.4288 (0.7); 1.4212 (0.6); 1.4098 (0.3); 1.2840 (0.4); 1.2568 (1.7); 1.1690 (0.4); 1.1604 (0.7); 1.1522 (0.9); 1.1437 (1.0); 1.1351 (0.9); 1.1269 (0.6); 1.1181 (0.4); 1.0818 (0.5); 1.0705 (0.7); 1.0640 (0.5); 1.0588 (0.6); 1.0526 (0.6); 1.0410 (0.5); 1.0282 (0.4); 1.0169 (0.7); 1.0104 (0.5); 1.0052 (0.6); 0.9992 (0.6); 0.9874 (0.5); 0.9486 (0.6); 0.9378 (1.0); 0.9269 (1.0); 0.9201 (1.0); 0.9092 (0.9); 0.8983 (0.5); 0.8942 (0.4); 0.8802 (0.5); 0.8665 (0.4); 0.5735 (0.4); 0.5640 (0.6); 0.5553 (0.8); 0.5459 (1.0); 0.5376 (0.8); 0.5293 (0.6); 0.5199 (0.4); 0.4486 (0.4); 0.4460 (0.4); 0.4374 (0.6); 0.4348 (0.6); 0.4292 (0.8); 0.4209 (0.9); 0.4104 (0.7); 0.4026 (0.5); 0.2718 (0.4); 0.2656 (0.5); 0.2609 (0.6); 0.2577 (0.7); 0.2530 (0.8); 0.2469 (0.8); 0.2425 (0.8); 0.2385 (0.7); 0.2341 (0.7); 0.2280 (0.4); 0.2233 (0.4); 0.2037 (0.5); 0.1947 (1.0); 0.1846 (1.0); 0.1758 (0.8); 0.1658 (0.5); 0.0060 (0.8); −0.0002 (11.6); −0.0066 (0.6)

TABLE 2-continued

I-279: $^{1}$H-NMR(300.2 MHz, CDCl3):
δ = 8.4114 (0.5); 7.6165 (0.4); 7.5901 (1.5); 7.5688 (4.0); 7.5485 (0.5); 7.4643 (2.0); 7.4352 (0.9); 7.4264 (1.3); 7.4187 (0.8); 7.4053 (0.9); 7.2993 (16.0); 7.0382 (2.5); 7.0080 (2.8); 6.9720 (1.7); 6.9469 (0.8); 6.1375 (0.6); 6.1197 (0.5); 6.1025 (0.7); 6.0806 (0.8); 6.0628 (0.6); 6.0456 (0.8); 6.0271 (0.4); 5.5680 (1.3); 5.5636 (1.3); 5.5109 (1.1); 5.5064 (1.1); 5.4135 (1.4); 5.4100 (1.4); 5.3787 (1.2); 5.3751 (1.2); 5.3378 (1.2); 5.0691 (0.5); 5.0505 (0.5); 5.0287 (1.2); 5.0104 (1.1); 4.9858 (1.2); 4.9674 (1.1); 4.9454 (0.4); 4.9269 (0.4); 4.8564 (1.4); 4.2052 (0.9); 4.1948 (1.0); 4.1693 (1.2); 4.1592 (1.1); 3.9841 (0.3); 3.9753 (0.4); 3.9650 (0.7); 3.9553 (0.6); 3.9462 (0.8); 3.9364 (0.7); 3.9278 (0.6); 3.9081 (1.8); 3.8902 (0.7); 3.8723 (1.2); 3.8543 (0.8); 3.7191 (0.4); 3.6962 (0.5); 3.6747 (0.4); 3.1490 (0.3); 3.1244 (0.8); 3.0995 (0.8); 3.0757 (0.4); 3.0327 (0.8); 3.0141 (0.8); 2.9869 (1.3); 2.9682 (1.2); 2.8845 (1.4); 2.8557 (1.3); 2.8384 (0.9); 2.8093 (0.9); 2.7587 (0.4); 2.7508 (0.4); 2.7401 (0.4); 2.7078 (0.4); 2.6696 (0.4); 2.6378 (0.4); 2.6153 (0.4); 2.5271 (0.4); 2.5004 (0.4); 2.4102 (0.6); 2.3845 (0.6); 2.3591 (0.9); 2.3197 (16.0); 2.2518 (0.4); 2.1343 (0.5); 1.6191 (0.4); 1.5988 (0.4); 1.5734 (0.4); 1.5040 (1.1); 1.4795 (1.9); 1.4543 (6.5); 1.4322 (5.8); 1.3662 (0.5); 1.2915 (1.9); 1.2550 (0.5); 0.9587 (0.4); 0.9411 (0.4); 0.8988 (1.2); 0.8776 (1.3); 0.1073 (0.8); 0.0569 (0.3); 0.0480 (0.8); 0.0374 (14.5); 0.0268 (0.7)
I-280: $^{1}$H-NMR(400.1 MHz, CDCl3):
δ = 8.0072 (2.2); 7.5345 (0.6); 7.5155 (1.8); 7.4906 (3.7); 7.4715 (0.7); 7.3897 (2.4); 7.3418 (1.6); 7.3242 (1.1); 7.2621 (19.2); 7.0038 (3.6); 6.9710 (0.6); 6.9520 (2.0); 6.9351 (3.5); 6.9076 (0.5); 6.0694 (0.5); 6.0242 (0.7); 6.0124 (0.6); 5.3007 (1.0); 5.2271 (0.6); 5.2152 (0.7); 5.2044 (0.7); 5.1924 (0.6); 5.0549 (1.0); 5.0485 (0.5); 5.0429 (1.1); 5.0369 (1.0); 5.0306 (0.5); 5.0248 (0.9); 4.9629 (0.9); 4.9110 (0.7); 4.8802 (0.8); 4.3992 (0.8); 4.3904 (1.1); 4.3820 (0.9); 4.3730 (1.0); 4.3621 (0.6); 4.2208 (0.8); 4.2044 (0.8); 4.1993 (0.9); 4.1830 (0.7); 4.1487 (0.4); 4.1401 (0.4); 4.1214 (0.9); 4.1123 (1.0); 4.1013 (0.5); 4.0930 (0.9); 4.0847 (0.7); 4.0741 (0.5); 4.0654 (0.5); 4.0012 (0.7); 3.9802 (1.3); 3.9592 (1.0); 3.9353 (0.7); 3.9247 (0.7); 3.9130 (0.5); 3.9024 (0.6); 3.8679 (1.8); 3.8612 (1.4); 3.8564 (1.4); 3.8463 (1.2); 3.8353 (0.9); 3.7757 (0.7); 3.7580 (1.1); 3.7424 (1.3); 3.7274 (1.4); 3.7149 (1.8); 3.6831 (0.6); 3.6693 (0.9); 3.6551 (0.5); 3.6463 (0.5); 3.6304 (0.5); 3.6245 (0.5); 3.6089 (0.8); 3.5933 (0.6); 3.5874 (0.7); 3.5718 (0.7); 3.5496 (0.5); 2.9552 (16.0); 2.9246 (1.1); 2.9110 (1.1); 2.8800 (13.8); 2.7663 (0.5); 2.7466 (1.0); 2.7262 (0.8); 2.7129 (0.9); 2.7054 (0.6); 2.6914 (0.5); 2.6830 (0.4); 2.2858 (13.3); 2.2651 (13.0); 1.5821 (7.6); 1.4676 (4.2); 1.4632 (4.4); 1.4557 (4.5); 1.4512 (4.2); 1.3878 (3.8); 1.3760 (3.8); 0.0077 (1.3); −0.0002 (23.6)
I-281: $^{1}$H-NMR(400.1 MHz, CDCl3):
δ = 8.0124 (2.1); 7.6080 (1.2); 7.5930 (2.9); 7.5494 (0.4); 7.5386 (1.1); 7.5253 (2.0); 7.5233 (2.1); 7.4413 (1.5); 7.3952 (1.3); 7.3803 (1.0); 7.3748 (0.8); 7.3643 (0.7); 7.3417 (0.5); 7.3326 (0.6); 7.3276 (0.6); 7.3189 (0.5); 7.3129 (0.4); 7.2620 (17.5); 7.0874 (0.9); 7.0682 (1.3); 7.0095 (1.3); 6.9984 (0.4); 6.9757 (0.9); 6.9499 (1.5); 6.9304 (1.5); 6.8866 (1.6); 6.7357 (0.9); 6.7172 (0.8); 5.3006 (1.1); 5.1570 (0.8); 5.1031 (0.9); 5.0952 (1.0); 4.1073 (0.8); 4.0993 (0.8); 4.0931 (0.9); 4.0763 (1.3); 4.0710 (1.5); 4.0621 (0.7); 4.0542 (0.9); 4.0396 (0.5); 3.9280 (2.1); 3.9189 (2.9); 3.8393 (0.5); 3.8291 (0.8); 3.8204 (1.0); 3.8128 (1.0); 3.8029 (0.8); 3.7951 (0.8); 3.7768 (0.9); 3.7614 (1.2); 3.7585 (1.1); 3.7393 (1.0); 3.7203 (0.4); 3.6625 (0.6); 3.6479 (0.6); 3.6351 (0.6); 3.6206 (0.5); 2.9556 (15.6); 2.9288 (0.5); 2.9111 (0.6); 2.8934 (1.1); 2.8815 (16.0); 2.8646 (1.7); 2.7892 (0.6); 2.7703 (0.6); 2.7549 (0.4); 2.7358 (0.4); 2.6467 (0.4); 2.6282 (0.6); 2.6098 (0.5); 2.5980 (0.4); 2.5795 (0.4); 2.5739 (0.6); 2.5643 (0.5); 2.5553 (1.1); 2.5418 (0.8); 2.5372 (0.9); 2.5320 (0.7); 2.5219 (0.7); 2.5099 (1.0); 2.4990 (0.4); 2.4892 (0.8); 2.4794 (0.4); 2.4669 (0.4); 2.3710 (0.4); 2.3581 (0.8); 2.3393 (1.3); 2.3199 (2.2); 2.3027 (7.2); 2.2865 (6.3); 2.2602 (0.5); 2.2267 (11.5); 1.6067 (2.1); 1.2217 (0.5); 0.0078 (1.1); −0.0002 (21.7); −0.0083 (1.1)
I-282: $^{1}$H-NMR(400.1 MHz, CDCl3):
δ = 8.0094 (1.5); 7.5258 (0.5); 7.5065 (1.4); 7.4866 (2.4); 7.4813 (2.2); 7.4618 (0.5); 7.3865 (2.0); 7.3322 (1.2); 7.3133 (0.9); 7.2622 (12.1); 7.0255 (2.5); 6.9696 (0.3); 6.9510 (5.6); 5.3007 (0.7); 4.8266 (1.1); 4.7961 (1.7); 4.7736 (16.0); 4.7026 (1.2); 4.6790 (0.8); 4.1407 (0.4); 4.1303 (0.4); 4.1227 (0.4); 3.9172 (0.6); 3.9088 (0.7); 3.9021 (0.7); 3.7101 (0.4); 2.9762 (0.8); 2.9557 (11.4); 2.9416 (1.0); 2.9272 (0.9); 2.8811 (9.8); 2.7482 (0.4); 2.7250 (0.5); 2.7147 (0.4); 2.2997 (11.6); 2.2820 (11.5); 1.5851 (5.6); 0.0078 (0.8); −0.0002 (15.1)
I-283: $^{1}$H-NMR(400.1 MHz, CDCl3):
δ = 8.1232 (1.2); 8.0006 (2.1); 7.5894 (0.8); 7.5732 (0.5); 7.5614 (1.0); 7.5467 (2.4); 7.5445 (2.2); 7.5236 (0.3); 7.5041 (0.9); 7.4890 (2.1); 7.4276 (1.2); 7.4009 (0.5); 7.3931 (0.7); 7.3876 (0.6); 7.3777 (0.6); 7.3111 (1.5); 7.2620 (16.2); 7.2471 (0.8); 7.2364 (0.6); 7.0550 (1.0); 7.0358 (1.4); 6.9985 (1.4); 6.9555 (1.6); 6.9346 (1.3); 6.9270 (1.2); 6.9066 (0.6); 6.8800 (0.4); 6.8520 (0.7); 6.8342 (0.5); 5.3007 (0.8); 5.1839 (0.5); 4.7495 (0.8); 4.1962 (0.5); 4.1868 (0.6); 4.1728 (0.8); 4.1602 (0.7); 4.1537 (0.8); 3.9663 (0.5); 3.9546 (1.0); 3.9443 (0.4); 3.9330 (1.0); 3.9047 (0.4); 3.8969 (0.4); 3.8907 (0.4); 3.8812 (0.4); 3.7800 (0.7); 3.7638 (0.5); 3.7527 (0.6); 3.7365 (0.4); 3.0069 (0.4); 2.9940 (0.4); 2.9717 (1.0); 2.9542 (16.0); 2.9363 (0.8); 2.9279 (0.8); 2.9142 (1.1); 2.9013 (0.4); 2.8770 (13.9); 2.7302 (0.5); 2.7067 (0.6); 2.6967 (0.6); 2.6722 (0.6); 2.2979 (6.8); 2.2860 (6.5); 2.2752 (1.0); 2.2597 (2.8); 2.2498 (10.8); 2.1422 (2.0); 2.0614 (0.4); 1.5827 (4.2); 1.5471 (6.1); 0.9551 (0.8); 0.9477 (1.1); 0.8098 (0.4); 0.7959 (1.6); 0.0078 (0.9); −0.0002 (19.5); −0.0083 (1.0)
I-284: $^{1}$H-NMR(400.1 MHz, CDCl3):
δ = 8.0097 (1.1); 7.5235 (0.7); 7.5042 (2.1); 7.4848 (3.7); 7.4801 (3.2); 7.4601 (0.7); 7.3881 (2.8); 7.3414 (1.8); 7.3225 (1.3); 7.2616 (16.3); 7.0013 (3.3); 6.9804 (1.8); 6.9612 (3.6); 6.9295 (2.2); 6.9105 (1.0); 5.8225 (0.8); 5.3006 (0.5); 4.9025 (1.8); 4.1189 (0.9); 4.1106 (1.0); 4.0913 (1.1); 4.0829 (1.1); 3.9015 (0.6); 3.8949 (0.8); 3.8873 (1.0); 3.8805 (1.0); 3.8725 (0.9); 3.8655 (0.6); 3.7940 (1.4); 3.7797 (1.0); 3.7663 (1.2); 3.7521 (1.0); 3.7308 (0.5); 3.7165 (0.8); 3.6999 (1.0); 3.6865 (0.9); 3.6698 (0.4); 3.6372 (0.7); 3.6235 (0.8); 3.6077 (0.6); 3.5925 (0.4); 2.9756 (1.0); 2.9556 (8.4); 2.9409 (1.4); 2.9265 (1.3); 2.8812 (7.1); 2.7826 (1.3); 2.7608 (1.3); 2.7481 (1.0); 2.7263 (0.9); 2.3219 (0.5); 2.3057 (0.6); 2.2844 (15.4); 2.2709 (16.0); 1.6508 (0.3); 1.6328 (0.9); 1.6157 (2.1); 1.6054 (2.2); 1.5989 (2.4); 1.5882 (2.9); 1.5747 (10.3); 0.7386 (0.6); 0.7210 (1.0); 0.7134 (0.6); 0.7017 (0.7); 0.6893 (0.4); 0.5817 (1.1); 0.5678 (3.1); 0.5567 (1.6); 0.5506 (2.8); 0.5369 (0.9); 0.1837 (1.0); 0.1709 (3.6); 0.1584 (3.4); 0.1467 (0.9); 0.0078 (1.0); −0.0002 (20.2); −0.0084 (1.0)
I-285: $^{1}$H-NMR(400.1 MHz, CDCl3):
δ = 8.1252 (0.6); 8.0065 (2.0); 7.5895 (0.5); 7.5619 (0.6); 7.5472 (1.3); 7.5449 (1.3); 7.5319 (0.6); 7.5128 (1.4); 7.4946 (2.8); 7.4911 (2.6); 7.4865 (2.4); 7.4803 (3.3); 7.4272 (0.7); 7.3996 (0.4); 7.3927 (0.7); 7.3796 (1.8); 7.3473 (1.7); 7.3363 (0.9); 7.3315 (1.1); 7.3264 (0.9); 7.3130 (1.1); 7.3077 (1.1); 7.3009 (1.1); 7.2958 (0.8); 7.2838 (0.9); 7.2617 (24.3); 7.0536 (0.6); 7.0344 (0.8); 6.9910 (3.2); 6.9739 (1.3); 6.9538 (2.5); 6.9332 (2.2); 6.9077 (2.0); 6.8868 (0.8); 5.9738 (0.5); 5.9624 (0.5); 5.9476 (0.6); 5.9362 (0.6); 5.9306 (0.7); 5.9193 (0.9); 5.9045 (0.8); 5.8932 (0.9); 5.8760 (0.5); 5.8646 (0.5); 5.8499 (0.5); 5.8383 (0.5); 5.8330 (0.6); 5.8214 (0.6); 5.8068 (0.5); 5.7953 (0.6); 5.6980 (0.4); 5.6798 (0.4); 5.3006 (1.0); 5.2009 (1.0); 5.1981 (1.0); 5.1691 (1.2); 5.1576 (1.0); 5.1550 (1.0); 5.1452 (1.0); 5.1430 (1.0); 5.0845 (1.0); 5.0391 (0.9); 4.9914 (1.1); 4.9655 (1.9); 4.8942 (0.4); 4.8875 (0.4); 4.8771 (0.4); 4.8602 (0.4); 4.8459 (0.5); 4.8293 (0.5); 4.8120 (0.4); 4.7684 (1.0); 4.7249 (0.4); 4.1851 (0.8); 4.1757 (1.0); 4.1568 (1.1); 4.1498 (0.9); 4.0916 (0.6); 4.0837 (0.7); 4.0646 (0.8); 4.0564 (0.8); 3.9555 (0.6); 3.9329 (0.6); 3.8993 (0.4); 3.8851 (0.6); 3.8779 (0.7); 3.8717 (0.7); 3.8639 (0.7); 3.8576 (0.6); 3.8501 (0.5); 3.8431 (0.5); 3.8257 (1.4); 3.8126 (1.0); 3.7986 (1.1); 3.7851 (0.7); 3.7697 (1.2); 3.7536 (0.7); 3.7424 (0.9); 3.7263 (0.6); 3.1205 (2.1); 3.0703 (0.4); 2.9688 (1.1); 2.9552 (16.0); 2.9346 (1.4); 2.9267 (0.9); 2.9196 (1.0); 2.9049 (0.9); 2.8910 (1.0); 2.8796 (13.5); 2.7791 (0.9); 2.7574 (0.9); 2.7441 (0.7); 2.7209 (1.1); 2.6974 (0.8); 2.6854 (0.6); 2.6628 (0.6); 2.2969 (4.0); 2.2856 (6.5); 2.2766 (12.6); 2.2665 (11.3); 2.2564 (9.3); 2.1422 (1.1); 1.7467 (0.4); 1.7320 (0.4); 1.5776 (10.8); 1.4124 (5.0); 1.4041 (5.4); 1.3959 (5.3); 1.3876 (5.1); 0.0078 (1.4); −0.0002 (29.6); −0.0083 (1.7)

TABLE 2-continued

I-286: $^1$H-NMR(400.1 MHz, CDCl3):
δ = 8.0097 (2.2); 7.5435 (0.4); 7.5232 (1.7); 7.5078 (4.1); 7.3441 (2.1); 7.2953 (0.9); 7.2886 (1.4); 7.2830 (1.1); 7.2715 (1.4); 7.2620 (17.2); 6.9892 (2.4); 6.9663 (1.5); 6.9472 (2.4); 6.8900 (1.5); 6.8710 (1.0); 6.7660 (0.4); 5.3008 (0.8); 5.1414 (1.3); 5.0232 (0.7); 5.0068 (1.6); 5.0008 (1.0); 4.9888 (1.6); 4.9836 (2.2); 4.9688 (1.8); 4.9597 (1.0); 4.9468 (0.6); 4.9298 (0.4); 4.6307 (1.0); 4.6184 (1.4); 4.6139 (1.3); 4.6019 (1.4); 4.5874 (1.5); 4.5729 (0.8); 4.2104 (0.8); 4.2010 (0.9); 4.1827 (1.0); 4.1733 (1.0); 3.9340 (0.7); 3.9253 (0.7); 3.7631 (1.2); 3.7467 (1.0); 3.7353 (1.1); 3.7192 (0.9); 3.0035 (0.8); 2.9902 (0.8); 2.9686 (1.2); 2.9563 (16.0); 2.8814 (13.8); 2.7456 (0.9); 2.7225 (1.0); 2.7109 (0.8); 2.6876 (0.7); 2.3161 (0.5); 2.2800 (11.6); 2.2645 (11.8); 2.2353 (0.4); 2.1792 (0.4); 1.6049 (1.1); −0.0002 (21.2)
I-287: $^1$H-NMR(400.1 MHz, CDCl3):
δ = 8.0052 (1.6); 7.5403 (0.6); 7.5207 (2.2); 7.5029 (5.4); 7.4859 (0.5); 7.3696 (2.8); 7.3259 (1.1); 7.3204 (1.8); 7.3152 (1.2); 7.3032 (1.4); 7.2616 (16.6); 6.9939 (3.1); 6.9618 (1.8); 6.9427 (3.6); 6.9111 (2.2); 6.8921 (1.0); 6.0560 (0.9); 5.3005 (0.4); 5.0332 (1.9); 4.1530 (1.2); 4.1439 (1.3); 4.1253 (1.4); 4.1164 (1.4); 3.9262 (0.4); 3.9100 (0.9); 3.9049 (1.0); 3.8906 (1.7); 3.8747 (2.8); 3.8586 (3.3); 3.8424 (2.2); 3.8259 (0.8); 3.8071 (0.4); 3.7768 (1.6); 3.7617 (1.3); 3.7490 (1.4); 3.7339 (1.1); 3.0698 (0.3); 2.9761 (1.1); 2.9548 (12.2); 2.9415 (1.5); 2.9272 (1.3); 2.8790 (10.6); 2.7579 (1.4); 2.7357 (1.3); 2.7233 (1.1); 2.7010 (1.0); 2.6058 (0.4); 2.5893 (0.7); 2.5797 (1.1); 2.5732 (0.6); 2.5630 (2.0); 2.5536 (1.3); 2.5465 (1.2); 2.5368 (2.0); 2.5269 (0.6); 2.5201 (1.0); 2.5107 (0.7); 2.3170 (0.6); 2.3066 (0.8); 2.2745 (15.2); 2.2647 (16.0); 1.5748 (7.7); 0.0077 (1.1); −0.0002 (20.6); −0.0082 (1.0)
I-288: $^1$H-NMR(400.1 MHz, CDCl3):
δ = 8.0122 (2.0); 7.5373 (0.5); 7.5183 (1.6); 7.4993 (3.4); 7.4915 (3.2); 7.4867 (3.5); 7.3734 (1.8); 7.3472 (1.7); 7.3247 (1.6); 7.3058 (1.3); 7.2996 (1.3); 7.2823 (0.8); 7.2759 (0.7); 7.2618 (22.4); 6.9842 (3.1); 6.9694 (1.5); 6.9498 (2.3); 6.9397 (1.2); 6.9186 (0.6); 6.9038 (1.6); 6.8866 (1.6); 6.8679 (0.6); 6.1756 (0.4); 6.1116 (0.4); 5.3006 (0.9); 5.0572 (0.8); 4.9332 (1.0); 4.8651 (0.3); 4.1883 (0.5); 4.1800 (0.6); 4.1612 (0.8); 4.1495 (1.1); 4.1391 (0.8); 4.1202 (1.0); 4.1117 (0.8); 3.8690 (1.0); 3.8622 (1.1); 3.8546 (1.0); 3.8482 (1.0); 3.7745 (0.8); 3.7600 (1.3); 3.7472 (1.3); 3.7325 (1.4); 3.7172 (0.7); 3.1815 (0.4); 3.1732 (0.5); 3.1641 (0.7); 3.1549 (0.5); 3.1463 (0.4); 2.9730 (0.7); 2.9562 (16.0); 2.9396 (1.9); 2.9249 (2.0); 2.9211 (2.0); 2.9069 (1.5); 2.8822 (13.6); 2.7442 (1.0); 2.7240 (1.1); 2.7126 (1.0); 2.7019 (0.7); 2.6896 (0.8); 2.3255 (0.3); 2.3054 (0.7); 2.2742 (11.3); 2.2681 (12.0); 2.2568 (14.4); 1.5762 (13.5); 1.1762 (0.5); 1.1657 (0.7); 1.1522 (0.7); 1.1427 (0.6); 1.0119 (0.4); 1.0009 (0.5); 0.9912 (0.6); 0.9797 (0.8); 0.9668 (0.7); 0.9587 (0.8); 0.9483 (0.8); 0.9380 (0.6); 0.9281 (0.4); 0.6861 (0.6); 0.6765 (0.9); 0.6624 (0.8); 0.6528 (1.3); 0.6365 (1.3); 0.6197 (0.8); 0.6029 (0.8); 0.5917 (0.7); 0.5865 (0.7); 0.5783 (0.8); 0.5697 (1.5); 0.5546 (1.1); 0.5430 (0.6); 0.5331 (0.5); 0.5207 (0.5); 0.5076 (0.8); 0.4988 (1.0); 0.4878 (1.1); 0.4770 (1.0); 0.4652 (0.9); 0.4544 (0.8); 0.4455 (0.4); 0.4054 (0.4); 0.3878 (0.9); 0.3815 (0.9); 0.3767 (1.0); 0.3674 (1.0); 0.3565 (0.6); 0.2583 (0.5); 0.2488 (0.7); 0.2437 (0.7); 0.2324 (0.6); 0.2215 (0.5); 0.2099 (0.4); 0.1989 (0.4); 0.1889 (0.4); 0.1789 (0.5); 0.1655 (0.5); 0.1548 (0.8); 0.1419 (1.1); 0.1308 (1.2); 0.1179 (1.1); 0.1073 (0.7); 0.0941 (0.4); 0.0828 (0.4); 0.0704 (0.7); 0.0544 (0.9); 0.0428 (0.9); 0.0306 (0.7); 0.0175 (0.6); −0.0002 (27.9)
I-289: $^1$H-NMR(400.1 MHz, CDCl3):
δ = 8.0078 (1.1); 7.5305 (0.5); 7.5113 (1.4); 7.4921 (2.5); 7.4682 (0.5); 7.3925 (1.8); 7.3445 (1.1); 7.3259 (0.8); 7.2620 (10.8); 7.0016 (2.1); 6.9688 (1.0); 6.9496 (2.5); 6.9289 (1.5); 6.9082 (0.6); 6.2002 (0.7); 5.3007 (0.5); 4.9305 (1.2); 4.1389 (0.7); 4.1299 (0.7); 4.1113 (0.8); 4.1021 (0.8); 3.9096 (0.4); 3.9027 (0.5); 3.8947 (0.6); 3.8877 (0.6); 3.8805 (0.5); 3.8728 (0.4); 3.8151 (0.4); 3.7981 (0.5); 3.7795 (1.4); 3.7647 (1.1); 3.7516 (1.0); 3.7364 (0.7); 3.6957 (0.6); 3.6808 (0.6); 3.6634 (0.4); 3.6477 (0.3); 2.9686 (0.8); 2.9553 (8.8); 2.9342 (0.9); 2.9198 (0.8); 2.8802 (7.2); 2.8380 (1.0); 2.8315 (1.1); 2.8227 (1.8); 2.8161 (1.6); 2.8076 (1.1); 2.7997 (0.9); 2.7696 (0.9); 2.7476 (0.8); 2.7349 (0.6); 2.7129 (0.6); 2.3189 (0.4); 2.3048 (0.5); 2.2838 (9.7); 2.2679 (10.1); 2.1226 (16.0); 2.0998 (0.4); 1.5783 (7.4); 0.0077 (0.7); −0.0002 (13.4); −0.0084 (0.7)
I-290: $^1$H-NMR(300.2 MHz, CDCl3):
δ = 7.9513 (5.2); 7.2991 (11.6); 7.1523 (2.4); 7.1384 (0.6); 7.1127 (3.4); 7.0870 (3.3); 7.0620 (1.0); 7.0556 (1.2); 7.0381 (1.1); 7.0333 (1.3); 7.0117 (0.6); 7.0060 (0.5); 6.8578 (0.8); 6.8520 (0.7); 6.8319 (1.2); 6.8098 (0.6); 6.8048 (0.6); 6.7423 (1.3); 6.7190 (1.2); 6.2145 (1.3); 4.2405 (1.0); 4.2294 (1.1); 4.2044 (1.2); 4.1933 (1.3); 4.0527 (0.4); 4.0416 (0.6); 4.0330 (0.6); 4.0227 (0.7); 4.0138 (0.7); 4.0040 (0.5); 3.9959 (0.4); 3.9184 (1.5); 3.9005 (1.1); 3.8823 (1.2); 3.8643 (1.0); 3.1979 (0.8); 3.1808 (0.8); 3.1532 (1.2); 3.1363 (1.1); 2.9372 (1.2); 2.9068 (1.2); 2.8927 (0.9); 2.8621 (0.8); 2.6724 (16.0); 2.2087 (11.9); 2.1399 (0.5); 2.1285 (0.6); 2.1114 (1.0); 2.0943 (0.6); 2.0829 (0.6); 2.0663 (0.3); 2.0443 (5.3); 1.6057 (3.5); 1.2933 (0.8); 1.0884 (0.7); 1.0747 (1.5); 1.0684 (1.9); 1.0557 (1.2); 1.0465 (1.6); 1.0401 (1.8); 1.0272 (0.9); 0.8828 (0.3); 0.8650 (0.3); 0.8294 (0.9); 0.8223 (0.9); 0.8133 (2.0); 0.8061 (1.9); 0.7975 (2.1); 0.7905 (1.3); 0.7803 (0.7); 0.1076 (2.6); 0.0486 (0.6); 0.0379 (15.8); 0.0271 (0.7)
I-291: $^1$H-NMR(300.2 MHz, CDCl3):
δ = 7.9364 (0.9); 7.9278 (1.7); 7.9193 (0.9); 7.6253 (0.9); 7.6030 (2.4); 7.5108 (1.2); 7.4744 (0.5); 7.4647 (0.8); 7.4575 (0.5); 7.4431 (0.5); 7.2986 (21.0); 7.0352 (0.9); 7.0108 (2.4); 6.9479 (0.9); 6.9216 (0.5); 6.5852 (1.0); 6.5763 (1.0); 6.5715 (1.0); 6.5628 (0.9); 5.3376 (0.4); 5.0231 (0.6); 5.0077 (0.6); 4.9872 (0.3); 4.9345 (0.8); 4.0731 (0.5); 4.0523 (0.6); 4.0277 (0.3); 3.9776 (0.5); 3.9532 (1.0); 3.9429 (0.7); 3.9334 (0.6); 3.9264 (0.6); 3.9088 (0.8); 3.7656 (0.8); 3.7287 (0.7); 3.6926 (0.4); 2.8701 (0.7); 2.8503 (0.6); 2.8210 (0.5); 2.7929 (0.5); 2.3683 (0.4); 2.3564 (0.4); 2.3426 (0.6); 2.3185 (6.9); 2.3013 (7.3); 2.1150 (0.5); 2.1000 (0.9); 2.0825 (1.4); 2.0601 (0.8); 2.0446 (0.4); 1.5959 (16.0); 1.2936 (0.8); 0.0489 (0.9); 0.0473 (0.7); 0.0382 (24.5); 0.0290 (0.8); 0.0273 (0.9)
I-292: $^1$H-NMR(300.2 MHz, CDCl3):
δ = 7.5739 (3.6); 7.4593 (2.3); 7.4167 (1.3); 7.3005 (5.7); 7.0488 (3.4); 7.0271 (2.0); 6.9816 (1.8); 6.9551 (0.9); 4.7633 (1.9); 4.2308 (1.0); 4.1957 (1.3); 3.9545 (1.0); 3.9150 (1.3); 3.8766 (0.8); 3.0376 (0.6); 2.9959 (1.0); 2.8877 (0.9); 2.8572 (0.9); 2.8168 (0.5); 2.7403 (8.4); 2.3267 (16.0); 1.5876 (6.1); 1.3000 (0.6); 0.0403 (7.9)
I-293: $^1$H-NMR(499.9 MHz, CDCl3):
δ = 8.1090 (0.4); 7.9834 (4.3); 7.6876 (4.4); 7.5809 (1.0); 7.5643 (3.3); 7.5573 (5.4); 7.5360 (2.2); 7.5251 (2.4); 7.5091 (4.1); 7.4906 (1.4); 7.4700 (3.9); 7.4583 (4.1); 7.4166 (0.9); 7.4019 (2.2); 7.3871 (1.4); 7.2583 (3.4); 6.9870 (3.9); 6.9726 (2.9); 6.9566 (3.7); 6.9419 (2.9); 6.9268 (1.2); 6.8918 (0.6); 6.8775 (0.7); 5.3935 (2.0); 5.0670 (0.6); 3.8947 (1.8); 3.8789 (2.1); 3.8230 (6.0); 3.8085 (16.0); 3.7850 (15.4); 3.7509 (0.9); 3.7440 (0.8); 3.7319 (1.5); 3.7215 (2.1); 3.7010 (2.5); 3.6869 (1.4); 2.8512 (1.0); 2.8376 (1.1); 2.8331 (1.1); 2.8233 (1.5); 2.8112 (1.2); 2.7978 (0.6); 2.7805 (0.6); 2.7696 (0.4); 2.7526 (1.4); 2.7382 (1.3); 2.7250 (0.8); 2.7108 (0.6); 2.3172 (1.0); 2.2847 (13.5); 2.2750 (6.1); 2.2576 (16.0); 2.1415 (1.1); 1.7036 (0.3); 1.2561 (0.5); 0.0722 (0.9); −0.0002 (4.0)
I-294: $^1$H-NMR(300.2 MHz, CDCl3):
δ = 8.9328 (4.5); 7.9802 (4.3); 7.6442 (0.8); 7.5916 (7.1); 7.5234 (4.4); 7.4754 (3.2); 7.2998 (8.4); 7.1556 (0.3); 7.0126 (4.9); 6.9316 (9.8); 4.8526 (3.6); 3.9255 (1.9); 3.8947 (2.5); 3.7330 (4.4); 3.7022 (1.9); 2.8647 (1.1); 2.8202 (2.2); 2.7551 (1.7); 2.7271 (1.7); 2.6848 (0.8); 2.3159 (15.8); 2.2728 (16.0); 2.0441 (1.0); 1.6119 (8.3); 0.1096 (1.1); 0.0400 (11.3)
I-295: $^1$H-NMR(300.2 MHz, CDCl3):
δ = 7.9357 (5.2); 7.3546 (2.6); 7.3480 (2.6); 7.2987 (16.4); 7.2130 (2.2); 7.1858 (3.2); 7.1470 (0.6); 7.1206 (1.6); 7.0940 (1.4); 7.0920 (1.4); 7.0801 (1.8); 7.0734 (1.7); 7.0653 (1.1); 7.0589 (1.3); 7.0529 (1.3); 7.0456 (1.4); 7.0416 (1.3); 7.0378 (1.3); 7.0147 (0.6); 7.0089 (0.5); 6.8594 (0.8); 6.8539 (0.8); 6.8328 (1.3); 6.8108 (0.6); 6.8061 (0.6); 6.2520 (1.2); 5.3375 (1.7); 4.2123 (0.4); 4.1949 (2.0); 4.1707 (3.8); 4.1471 (2.7); 4.1233 (0.9); 3.9275 (1.0); 3.9116 (1.9); 3.8979 (0.7); 3.8858 (1.8);

TABLE 2-continued 3.8699 (0.6); 3.0176 (0.6); 3.0024 (0.7); 2.9730 (1.0); 2.9564 (1.0); 2.8715 (1.1); 2.8435 (1.0); 2.8272 (0.7); 2.7969 (0.6); 2.6782 (16.0); 2.1311 (0.5); 2.1200 (0.6); 2.1031 (1.0); 2.0830 (12.0); 2.0573 (0.4); 1.6042 (5.8); 1.3205 (3.2); 1.2967 (6.4); 1.2729 (3.0); 1.0830 (0.4); 1.0725 (1.8); 1.0654 (1.9); 1.0549 (1.0); 1.0504 (0.8); 1.0439 (1.8); 1.0370 (1.8); 1.0265 (0.7); 1.0225 (0.7); 0.8231 (1.0); 0.8076 (2.0); 0.8009 (1.9); 0.7911 (2.2); 0.7841 (1.4); 0.7736 (0.8); 0.1065 (5.0); 0.0476 (0.7); 0.0368 (23.6); 0.0276 (0.8); 0.0259 (0.9)
I-296: $^1$H-NMR(300.2 MHz, CDCl3):
δ = 8.1563 (13.7); 8.0581 (8.1); 8.0292 (8.6); 7.6479 (0.8); 7.6279 (8.3); 7.6037 (3.6); 7.5776 (1.0); 7.4148 (8.2); 7.3860 (7.3); 7.3507 (4.1); 7.2984 (22.8); 7.2685 (1.8); 7.2616 (2.3); 7.2453 (1.7); 7.2383 (2.5); 7.2311 (1.2); 6.1043 (2.6); 5.3369 (13.6); 4.2139 (1.2); 4.2054 (2.6); 4.1792 (3.0); 4.1711 (1.9); 4.1012 (0.5); 4.0352 (0.3); 4.0177 (0.8); 4.0091 (1.2); 4.0006 (1.2); 3.9814 (4.1); 3.9622 (1.4); 3.9471 (2.9); 3.9316 (1.5); 3.1946 (1.2); 3.1772 (1.2); 3.1495 (2.6); 3.1319 (2.4); 3.0356 (2.1); 3.0232 (0.6); 3.0057 (2.1); 2.9907 (1.4); 2.9608 (1.4); 2.0816 (2.0); 2.0423 (0.7); 1.5903 (16.0); 1.3198 (0.4); 1.2960 (0.8); 0.9971 (0.4); 0.9727 (0.7); 0.1069 (4.0); 0.0478 (1.2); 0.0371 (27.6); 0.0263 (1.0)
I-297: $^1$H-NMR(300.2 MHz, CDCl3):
δ = 8.1645 (7.0); 7.6614 (0.4); 7.6433 (4.4); 7.6217 (1.9); 7.5954 (0.5); 7.4913 (3.2); 7.4645 (4.1); 7.3898 (2.1); 7.2987 (13.7); 7.2920 (5.2); 7.2806 (1.5); 7.2646 (4.3); 7.2572 (1.8); 7.2491 (0.6); 6.1210 (1.5); 5.3374 (1.1); 4.2434 (1.3); 4.2176 (1.4); 4.2095 (0.8); 3.9682 (0.4); 3.9590 (0.6); 3.9512 (0.6); 3.9317 (2.0); 3.8990 (1.6); 3.8814 (0.8); 3.1077 (0.7); 3.0918 (0.7); 3.0628 (1.3); 3.0468 (1.2); 2.9039 (1.0); 2.8731 (1.0); 2.8592 (0.8); 2.8284 (0.7); 1.5842 (16.0); 0.1078 (1.9); 0.0489 (0.7); 0.0381 (16.4); 0.0289 (0.4); 0.0272 (0.5)
I-298: $^1$H-NMR(300.2 MHz, CDCl3):
δ = 7.9606 (5.3); 7.4108 (0.7); 7.3969 (0.8); 7.3918 (1.1); 7.3796 (1.4); 7.3662 (1.0); 7.3567 (1.0); 7.2986 (8.2); 7.2219 (0.5); 7.2090 (0.4); 7.1949 (4.6); 7.1810 (2.4); 7.1794 (2.4); 7.1760 (2.1); 7.1711 (2.6); 7.1517 (0.4); 7.1030 (2.3); 7.0769 (2.6); 7.0430 (2.6); 7.0372 (2.6); 6.6897 (1.4); 6.6839 (1.4); 6.6635 (1.2); 6.6578 (1.2); 6.0532 (1.3); 4.2478 (0.9); 4.2369 (1.1); 4.2118 (1.2); 4.2006 (1.3); 4.0454 (0.4); 4.0355 (0.6); 4.0198 (0.6); 4.0149 (0.6); 4.0056 (0.6); 3.9964 (0.5); 3.9887 (0.4); 3.9221 (1.5); 3.9041 (1.1); 3.8860 (1.2); 3.8680 (0.9); 3.1863 (0.9); 3.1700 (0.9); 3.1415 (1.2); 3.1251 (1.2); 2.9248 (1.2); 2.8938 (1.2); 2.8799 (0.9); 2.8490 (0.9); 2.7434 (0.4); 2.6795 (16.0); 1.7928 (0.6); 1.7818 (0.6); 1.7651 (1.1); 1.7482 (0.6); 1.7372 (0.7); 1.7201 (0.3); 1.6034 (4.8); 0.9932 (0.4); 0.9765 (1.7); 0.9703 (2.1); 0.9668 (1.6); 0.9481 (1.9); 0.9423 (1.9); 0.9259 (0.5); 0.6030 (1.0); 0.5989 (1.0); 0.5936 (1.1); 0.5885 (1.7); 0.5822 (1.9); 0.5769 (1.7); 0.5659 (1.1); 0.5598 (0.9); 0.0484 (0.4); 0.0377 (10.8); 0.0285 (0.4); 0.0268 (0.4)
I-299: $^1$H-NMR(300.2 MHz, CDCl3):
δ = 7.9665 (4.0); 7.4121 (0.5); 7.4043 (0.6); 7.3869 (1.0); 7.3794 (0.7); 7.3641 (0.8); 7.3579 (0.7); 7.2986 (19.5); 7.2144 (0.5); 7.2099 (0.4); 7.1869 (1.3); 7.1825 (1.2); 7.1576 (2.1); 7.1499 (1.1); 7.1364 (1.0); 7.1303 (1.1); 7.1089 (0.4); 7.1028 (0.4); 7.0197 (1.5); 6.9937 (1.6); 6.8312 (1.7); 6.6202 (0.9); 6.6141 (0.9); 6.5939 (0.8); 6.0979 (1.1); 4.2992 (0.6); 4.2911 (0.8); 4.2660 (0.9); 4.2567 (0.7); 4.1728 (0.4); 4.1489 (0.4); 3.9000 (0.5); 3.8840 (0.5); 3.8764 (0.5); 3.8639 (1.5); 3.8439 (0.4); 3.8303 (1.1); 3.8096 (0.6); 3.0387 (0.6); 3.0236 (0.5); 2.9938 (0.8); 2.9778 (0.8); 2.7776 (0.7); 2.7460 (0.8); 2.7320 (0.7); 2.7002 (0.6); 2.6755 (12.4); 2.3519 (0.5); 2.3107 (9.2); 2.0830 (2.2); 1.7686 (0.4); 1.7575 (0.4); 1.7409 (0.8); 1.7236 (0.5); 1.7126 (0.5); 1.5803 (16.0); 1.3217 (0.5); 1.2979 (1.2); 1.2741 (0.5); 0.9428 (0.4); 0.9367 (0.4); 0.9277 (1.3); 0.9213 (1.6); 0.9064 (0.6); 0.8994 (1.4); 0.8933 (1.4); 0.8784 (0.4); 0.5831 (0.7); 0.5736 (0.8); 0.5683 (1.5); 0.5605 (1.5); 0.5520 (1.7); 0.5447 (0.9); 0.5357 (0.6); 0.0496 (1.0); 0.0389 (27.7); 0.0297 (0.9); 0.0281 (1.1)
I-300: $^1$H-NMR(300.2 MHz, CDCl3):
δ = 7.9619 (5.3); 7.4224 (0.6); 7.4162 (0.7); 7.4008 (0.8); 7.3956 (1.4); 7.3898 (1.0); 7.3738 (1.0); 7.3681 (0.9); 7.2989 (12.5); 7.2554 (1.9); 7.2500 (2.1); 7.2383 (0.9); 7.2331 (0.8); 7.2109 (1.6); 7.2059 (1.6); 7.1836 (1.1); 7.1792 (1.2); 7.1581 (1.2); 7.1520 (1.3); 7.1361 (1.1); 7.1306 (1.5); 7.1246 (0.6); 7.1088 (0.7); 7.1030 (0.6); 7.0943 (0.8); 7.0880 (0.8); 7.0673 (1.5); 7.0609 (1.5); 7.0220 (2.9); 6.9950 (1.3); 6.0635 (1.2); 5.3373 (1.8); 4.2396 (1.1); 4.2141 (1.2); 4.1955 (0.4); 3.9344 (0.4); 3.9248 (0.6); 3.9168 (0.8); 3.9088 (1.4); 3.9032 (1.7); 3.8951 (1.0); 3.8868 (0.6); 3.8764 (1.7); 3.8582 (0.7); 3.0260 (0.7); 3.0103 (0.7); 2.9806 (1.0); 2.9644 (1.0); 2.8541 (1.0); 2.8239 (0.9); 2.8091 (0.7); 2.7778 (0.6); 2.7021 (0.6); 2.6834 (16.0); 2.3519 (0.6); 2.3299 (11.7); 2.0825 (0.6); 1.5902 (5.6); 1.2974 (0.4); 0.0495 (0.6); 0.0385 (17.2); 0.0278 (0.7)
I-301: $^1$H-NMR(300.2 MHz, CDCl3):
δ = 7.9548 (4.4); 7.2989 (10.6); 7.1469 (2.1); 7.1186 (2.5); 7.0873 (2.2); 7.0780 (1.2); 7.0630 (0.9); 7.0570 (1.0); 7.0362 (0.4); 7.0299 (0.3); 6.9005 (2.2); 6.8918 (2.3); 6.8600 (0.6); 6.8522 (0.6); 6.8371 (1.0); 6.8311 (0.8); 6.8127 (0.5); 6.8065 (0.5); 6.5032 (1.3); 6.4945 (1.2); 6.4751 (1.2); 6.4664 (1.1); 6.2321 (1.0); 4.2297 (0.8); 4.2187 (0.8); 4.1937 (1.0); 4.1827 (1.0); 4.0275 (0.3); 4.0171 (0.5); 4.0074 (0.5); 3.9977 (0.5); 3.9890 (0.5); 3.9794 (0.4); 3.9183 (1.2); 3.9005 (0.9); 3.8823 (1.0); 3.8645 (0.8); 3.6949 (16.0); 3.1682 (0.7); 3.1512 (0.7); 3.1230 (1.0); 3.1060 (0.9); 2.9230 (1.0); 2.8930 (1.0); 2.8778 (0.7); 2.8477 (0.7); 2.6747 (13.6); 2.1345 (0.4); 2.1237 (0.4); 2.1068 (0.8); 2.0893 (0.5); 2.0829 (0.9); 1.5976 (7.9); 1.3442 (0.4); 1.3208 (0.8); 1.3051 (2.3); 1.2975 (2.1); 1.2734 (0.3); 1.0793 (0.5); 1.0658 (1.3); 1.0586 (1.6); 1.0549 (1.0); 1.0510 (0.8); 1.0453 (0.9); 1.0369 (1.4); 1.0304 (1.4); 1.0170 (0.7); 0.9418 (0.8); 0.9200 (2.6); 0.8968 (1.0); 0.8212 (0.8); 0.8126 (0.8); 0.8075 (1.5); 0.8040 (1.6); 0.7994 (1.4); 0.7903 (1.6); 0.7873 (1.5); 0.7823 (1.2); 0.7704 (0.6); 0.1076 (5.3); 0.0486 (0.6); 0.0379 (15.2); 0.0269 (0.6)
I-302: $^1$H-NMR(300.2 MHz, CDCl3):
δ = 7.9580 (5.1); 7.4077 (0.7); 7.3956 (0.8); 7.3867 (1.3); 7.3751 (1.5); 7.3644 (0.9); 7.3534 (1.0); 7.2989 (12.0); 7.2202 (0.4); 7.2113 (0.4); 7.1954 (3.8); 7.1832 (2.1); 7.1742 (1.9); 7.1709 (3.1); 7.1497 (2.3); 7.1469 (2.3); 7.1356 (0.5); 7.1052 (2.1); 7.0796 (2.4); 6.7903 (1.1); 6.7647 (0.9); 6.0392 (1.0); 4.2576 (0.8); 4.2467 (1.0); 4.2215 (1.1); 4.2104 (1.2); 4.1950 (0.5); 4.1711 (1.3); 4.1473 (1.4); 4.1236 (0.5); 4.0681 (0.4); 4.0584 (0.5); 4.0498 (0.5); 4.0428 (0.5); 4.0372 (0.5); 4.0285 (0.5); 4.0196 (0.4); 3.9240 (1.4); 3.9059 (1.1); 3.8879 (1.2); 3.8697 (1.0); 3.1951 (0.7); 3.1786 (0.7); 3.1505 (1.0); 3.1336 (1.0); 2.9379 (1.2); 2.9070 (1.1); 2.8930 (0.9); 2.8621 (0.8); 2.6796 (16.0); 2.6684 (0.8); 2.5492 (1.7); 2.3907 (1.2); 2.2241 (10.3); 2.0826 (6.4); 1.6144 (4.4); 1.4694 (2.0); 1.3204 (1.7); 1.2967 (3.5); 1.2729 (1.6); 0.1072 (3.6); 0.0480 (0.5); 0.0462 (0.3); 0.0446 (0.4); 0.0372 (15.8); 0.0294 (0.4); 0.0278 (0.4); 0.0263 (0.6)
I-303: $^1$H-NMR(300.2 MHz, CDCl3):
δ = 7.9489 (4.9); 7.4000 (0.6); 7.3924 (0.7); 7.3746 (1.2); 7.3672 (0.9); 7.3518 (0.9); 7.3458 (0.8); 7.2988 (9.5); 7.2015 (0.7); 7.1970 (0.5); 7.1741 (1.6); 7.1696 (1.4); 7.1441 (2.2); 7.1354 (1.3); 7.1217 (1.1); 7.1156 (1.4); 7.0942 (0.6); 7.0882 (0.4); 6.9785 (2.4); 6.9464 (0.4); 6.9131 (4.3); 6.8861 (0.4); 6.0956 (1.3); 4.3239 (0.8); 4.3125 (0.9); 4.2878 (1.0); 4.2765 (1.1); 3.9428 (0.4); 3.9266 (0.6); 3.9208 (0.5); 3.9107 (0.6); 3.8991 (0.4); 3.8948 (0.4); 3.8309 (1.6); 3.8091 (1.0); 3.7950 (1.3); 3.7733 (0.9); 3.0175 (0.7); 3.0009 (0.7); 2.9725 (1.0); 2.9563 (0.9); 2.6893 (1.2); 2.6685 (15.3); 2.6577 (1.8); 2.6446 (1.0); 2.6121 (0.8); 2.1437 (11.4); 2.1273 (11.4); 1.6113 (16.0); 1.3042 (1.3); 0.9412 (0.4); 0.9193 (1.4); 0.8963 (0.5); 0.1071 (0.6); 0.0480 (0.4); 0.0372 (12.3); 0.0280 (0.4); 0.0263 (0.5)
I-304: $^1$H-NMR(300.1 MHz, $d_6$-DMSO):
δ = 8.1840 (16.0); 8.1689 (3.0); 7.7574 (4.4); 7.7351 (2.8); 7.7093 (3.6); 7.6889 (3.7); 7.6640 (3.4); 7.6589 (3.6); 7.6328 (1.6); 7.6014 (6.5); 7.5944 (7.0); 7.5205 (4.1); 7.4925 (6.2); 7.3910 (3.8); 7.3840 (3.6); 7.3630 (2.5); 7.3560 (2.5); 4.8376 (1.3); 4.8240 (1.6); 4.8134 (1.6); 4.7983 (1.3); 3.4683 (0.6); 3.4543 (0.8); 3.4383 (0.8); 3.4231 (1.5); 3.4098 (1.2); 3.3939 (1.4); 3.3799 (1.3); 3.3176 (1.0); 3.2839 (1.4); 3.2673 (2.2); 3.2497 (1.3); 3.2403 (1.0); 3.2221 (1.3); 3.2037 (0.7); 2.7339 (0.5); 2.7277 (0.6); 2.7216 (0.4); 2.5135 (41.2); 2.5075 (81.7); 2.5015 (109.2); 2.4956 (75.8); 2.4898 (35.2); 2.2776 (0.5); 2.2715

(0.7); 2.2650 (0.5); 2.1469 (0.9); 2.1308 (1.0); 2.1169 (0.8); 2.1023 (1.1); 2.0872 (1.0); 1.5063 (0.6); 1.4897 (0.9); 1.4753 (0.7); 1.4624 (0.8); 1.4483 (0.6); 0.0108 (0.9); −0.0002 (24.7); −0.0112 (0.8)
I-305: $^{1}$H-NMR(300.2 MHz, CDCl3):
δ = 7.9502 (5.3); 7.5550 (0.7); 7.5288 (1.8); 7.5026 (1.4); 7.4525 (1.6); 7.4269 (0.9); 7.2983 (0.9); 7.2431 (1.9); 7.2420 (1.9); 7.1687 (1.0); 7.1655 (1.2); 7.1617 (1.0); 7.1421 (0.9); 7.1387 (1.0); 7.1349 (0.9); 6.9671 (2.7); 6.9048 (6.6); 6.9021 (6.4); 6.8746 (1.2); 6.6867 (2.4); 6.4989 (1.2); 6.2326 (1.6); 4.2939 (0.9); 4.2825 (1.0); 4.2581 (1.1); 4.2466 (1.1); 3.9168 (0.4); 3.9044 (0.6); 3.9006 (0.6); 3.8945 (0.6); 3.8885 (0.6); 3.8844 (0.6); 3.8727 (0.5); 3.8684 (0.4); 3.8058 (1.6); 3.7840 (1.0); 3.7700 (1.4); 3.7482 (1.0); 2.9972 (0.8); 2.9813 (0.8); 2.9524 (1.0); 2.9363 (1.0); 2.6693 (1.6); 2.6564 (16.0); 2.6377 (1.3); 2.6250 (1.0); 2.5926 (1.0); 2.1976 (0.6); 2.1477 (12.1); 2.1083 (12.2); 0.0364 (1.1)
I-306: $^{1}$H-NMR(300.2 MHz, CDCl3):
δ = 7.9665 (5.4); 7.5785 (0.7); 7.5524 (1.7); 7.5260 (1.3); 7.4733 (1.6); 7.4476 (0.9); 7.2991 (2.0); 7.2695 (1.9); 7.1881 (1.1); 7.1843 (1.0); 7.1646 (0.8); 7.1613 (1.0); 7.1575 (0.9); 7.0038 (2.0); 6.9778 (2.3); 6.8966 (1.2); 6.8359 (2.2); 6.8318 (2.3); 6.7087 (2.4); 6.6111 (1.3); 6.6054 (1.2); 6.5852 (1.1); 6.5796 (1.1); 6.5209 (1.2); 6.2074 (1.5); 4.2824 (0.8); 4.2733 (1.0); 4.2480 (1.1); 4.2392 (1.0); 3.9022 (0.4); 3.8909 (0.5); 3.8860 (0.6); 3.8805 (0.5); 3.8764 (0.6); 3.8702 (0.6); 3.8618 (0.5); 3.8464 (2.1); 3.8261 (0.6); 3.8121 (1.4); 3.7914 (0.8); 3.0270 (0.8); 3.0126 (0.7); 2.9820 (1.1); 2.9666 (1.1); 2.7564 (1.0); 2.7249 (1.0); 2.7109 (1.0); 2.6695 (16.0); 2.2956 (12.3); 2.0361 (4.9); 1.8012 (0.4); 1.7843 (0.7); 1.7731 (0.7); 1.7563 (1.2); 1.7447 (0.5); 1.7395 (0.8); 1.7284 (0.7); 1.7114 (0.4); 0.9571 (0.4); 0.9405 (2.0); 0.9341 (2.2); 0.9175 (1.0); 0.9123 (2.1); 0.9058 (2.0); 0.8899 (0.5); 0.5917 (0.8); 0.5848 (1.2); 0.5749 (1.6); 0.5681 (2.2); 0.5617 (1.7); 0.5514 (1.3); 0.5449 (0.9); 0.0371 (2.6)
I-307: $^{1}$H-NMR(300.2 MHz, CDCl3):
δ = 8.1461 (16.0); 8.0469 (8.1); 8.0395 (7.9); 7.8515 (1.8); 7.6487 (12.2); 7.6322 (15.1); 7.5876 (6.0); 7.5794 (5.5); 7.5600 (6.2); 7.5519 (5.9); 7.5216 (1.4); 7.4683 (9.9); 7.4500 (7.0); 7.4113 (4.1); 7.3974 (5.2); 7.3919 (4.7); 7.3821 (3.8); 7.2988 (13.2); 7.2496 (0.4); 7.2321 (0.4); 7.1681 (7.9); 7.1407 (6.8); 5.3362 (0.7); 4.3141 (3.8); 4.3029 (4.3); 4.2780 (4.4); 4.2667 (4.9); 4.1729 (3.1); 4.1664 (3.3); 4.1601 (3.4); 3.9018 (4.9); 3.8818 (4.4); 3.8653 (4.3); 3.8457 (3.6); 3.0635 (14.2); 3.0418 (10.3); 2.9887 (0.7); 2.6570 (0.7); 2.3408 (0.3); 2.1482 (0.4); 2.0817 (0.5); 1.6317 (3.1); 1.2908 (3.5); 0.9162 (0.5); 0.8926 (0.4); 0.1066 (5.1); 0.0357 (15.8)
I-308: $^{1}$H-NMR(499.9 MHz, CDCl3):
δ = 8.0500 (16.0); 8.0146 (1.1); 7.4739 (0.5); 7.4474 (3.7); 7.4334 (6.2); 7.4204 (4.4); 7.3921 (1.1); 7.3812 (0.9); 7.3666 (0.8); 7.3061 (12.1); 7.2705 (2.8); 7.2364 (3.5); 7.2208 (6.8); 7.2066 (6.0); 7.1920 (7.3); 7.1764 (8.3); 7.1603 (3.8); 7.1359 (8.5); 7.1197 (9.8); 7.0533 (1.7); 7.0284 (0.7); 7.0093 (0.7); 6.9756 (7.2); 6.9593 (6.1); 6.9125 (0.5); 6.0321 (7.2); 4.1085 (4.3); 4.1038 (4.8); 4.0867 (5.4); 4.0819 (5.7); 3.9862 (4.0); 3.9790 (4.5); 3.9719 (4.3); 3.9129 (5.7); 3.9039 (4.8); 3.8910 (4.8); 3.8821 (4.0); 3.4250 (0.4); 3.3750 (15.2); 3.3306 (0.8); 3.1269 (3.7); 3.1163 (3.9); 3.0998 (5.1); 3.0891 (4.9); 3.0623 (0.9); 3.0487 (0.9); 3.0235 (0.5); 2.9675 (4.8); 2.9496 (5.0); 2.9406 (4.1); 2.9226 (3.6); 1.9907 (4.5); −0.0002 (1.7)
I-309: $^{1}$H-NMR(499.9 MHz, $d_6$-DMSO):
δ = 7.7226 (7.6); 7.3443 (2.5); 7.3381 (2.6); 7.2808 (3.8); 7.2204 (3.7); 7.1631 (0.4); 7.1473 (4.6); 7.1365 (4.2); 7.1206 (0.8); 7.0632 (3.9); 6.9126 (0.9); 6.9005 (1.5); 6.8939 (1.6); 6.8856 (1.1); 6.8806 (0.9); 5.7547 (0.4); 3.8020 (2.7); 3.7925 (1.5); 3.7849 (3.3); 3.7797 (2.0); 3.7219 (1.4); 3.7118 (1.8); 3.6984 (1.4); 3.6889 (0.8); 3.3456 (65.7); 2.8019 (4.0); 2.7887 (4.0); 2.5729 (19.2); 2.5084 (1.9); 2.5051 (2.5); 2.5018 (2.0); 2.1733 (16.0); 2.0870 (0.4); 2.0766 (0.8); 2.0700 (0.9); 2.0599 (1.6); 2.0497 (1.0); 2.0433 (1.0); 2.0328 (0.5); 1.0323 (0.9); 1.0239 (2.8); 1.0196 (3.0); 1.0117 (1.8); 1.0071 (2.9); 1.0028 (3.0); 0.9951 (1.3); 0.7839 (1.1); 0.7756 (3.0); 0.7723 (3.4); 0.7656 (3.4); 0.7620 (3.3); 0.7534 (1.2)
I-310: $^{1}$H-NMR(300.2 MHz, CDCl3):
δ = 8.1605 (9.8); 7.6440 (0.4); 7.6300 (4.8); 7.6126 (4.8); 7.3922 (2.6); 7.3425 (1.1); 7.3343 (1.1); 7.3257 (1.7); 7.3193 (1.4); 7.3123 (1.1); 7.2989 (13.0); 6.7089 (5.3); 6.2273 (2.0); 4.3514 (1.2); 4.3421 (1.4); 4.3159 (1.5); 4.3062 (1.5); 3.9054 (0.6); 3.8994 (0.6); 3.8933 (0.8); 3.8898 (0.8); 3.8782 (0.7); 3.8719 (0.9); 3.8657 (0.6); 3.8558 (0.6); 3.8145 (2.6); 3.7926 (1.4); 3.7789 (2.0); 3.7571 (1.4); 2.9493 (1.0); 2.9342 (1.0); 2.9020 (1.5); 2.8876 (1.4); 2.7077 (1.7); 2.6744 (1.6); 2.6607 (1.2); 2.6272 (1.2); 2.2636 (16.0); 2.0705 (16.0); 2.0459 (1.1); 1.6052 (2.2); 1.2919 (1.6); 1.2686 (0.3); 1.2437 (0.4); 0.9172 (0.3); 0.8931 (0.3); 0.1072 (5.6); 0.0480 (0.5); 0.0372 (15.5); 0.0263 (0.6)
I-311: $^{1}$H-NMR(300.2 MHz, CDCl3):
δ = 7.9678 (6.9); 7.6456 (0.5); 7.6203 (1.5); 7.5964 (4.4); 7.5730 (1.1); 7.5483 (3.6); 7.5120 (1.4); 7.4881 (1.4); 7.4814 (1.8); 7.4737 (1.0); 7.4448 (1.7); 7.3255 (1.3); 7.2986 (16.8); 7.2774 (3.1); 7.2417 (2.2); 7.2254 (0.8); 7.2180 (1.8); 7.1928 (0.7); 7.1753 (2.5); 7.1630 (3.4); 7.1539 (3.6); 7.1411 (0.6); 7.0967 (2.8); 7.0922 (3.4); 7.0687 (2.7); 7.0106 (1.7); 6.9987 (1.8); 6.9864 (1.4); 6.9788 (1.2); 6.2992 (1.2); 6.1797 (1.6); 5.3375 (6.1); 4.3859 (0.8); 4.3718 (1.0); 4.3646 (1.1); 4.3506 (1.7); 4.3350 (1.1); 4.3283 (1.3); 4.3157 (1.2); 3.8838 (1.3); 3.8614 (1.5); 3.8467 (1.6); 3.8246 (1.5); 3.8197 (1.3); 3.8064 (0.9); 3.7827 (0.9); 3.2524 (0.4); 3.2403 (0.5); 3.2320 (0.7); 3.2233 (0.8); 3.2169 (0.8); 3.2107 (0.8); 3.2032 (1.0); 3.1949 (0.8); 3.1888 (0.8); 3.1821 (0.8); 3.1722 (0.6); 3.1665 (0.6); 3.1594 (0.6); 3.1439 (0.4); 2.7134 (16.0); 2.6948 (12.0); 2.0413 (0.4); 2.0250 (0.8); 2.0112 (1.2); 1.9957 (1.4); 1.9890 (1.2); 1.9740 (1.1); 1.9494 (0.6); 1.6069 (15.5); 1.3811 (0.4); 1.3550 (0.8); 1.3429 (1.0); 1.3343 (1.0); 1.3194 (1.1); 1.3136 (1.1); 1.3044 (1.2); 1.2912 (1.6); 1.2733 (0.9); 1.2579 (0.7); 1.2460 (0.5); 1.2275 (0.4); 1.1667 (0.5); 1.1484 (1.2); 1.1391 (0.6); 1.1302 (1.0); 1.1181 (3.1); 1.0938 (3.7); 1.0830 (1.5); 1.0709 (2.8); 1.0532 (1.1); 1.0352 (0.4); 0.1073 (5.4); 0.0373 (19.3)
I-312: $^{1}$H-NMR(499.9 MHz, CDCl3):
δ = 8.0976 (8.0); 7.5320 (0.9); 7.5280 (1.1); 7.5200 (1.0); 7.5168 (1.3); 7.5129 (1.9); 7.5076 (1.1); 7.5006 (1.1); 7.2591 (2.3); 7.1452 (0.4); 7.1411 (0.6); 7.1289 (1.9); 7.1247 (1.8); 7.1197 (5.4); 7.1127 (2.0); 7.1057 (2.6); 7.0888 (0.8); 6.9547 (2.6); 6.9394 (3.0); 6.8670 (3.2); 6.6759 (1.7); 6.6608 (1.6); 6.0109 (2.1); 5.2946 (2.3); 4.2771 (1.3); 4.2706 (1.4); 4.2556 (1.5); 4.2491 (1.6); 3.8791 (0.6); 3.8750 (0.7); 3.8690 (0.9); 3.8655 (0.8); 3.8592 (0.9); 3.8559 (0.8); 3.8528 (0.7); 3.8495 (0.8); 3.8394 (0.4); 3.8130 (2.1); 3.8005 (1.4); 3.7914 (1.9); 3.7789 (1.4); 3.0015 (1.1); 2.9917 (1.2); 2.9742 (1.4); 2.9643 (1.4); 2.7125 (1.5); 2.6927 (1.5); 2.6852 (1.4); 2.6654 (1.3); 2.2639 (16.0); 2.1413 (15.2); 1.5976 (1.5); −0.0002 (2.1)
I-314: $^{1}$H-NMR(300.2 MHz, CDCl3):
δ = 7.6449 (0.4); 7.3843 (0.4); 7.3651 (0.7); 7.3292 (20.9); 7.3164 (16.8); 7.3106 (18.7); 7.2988 (76.8); 7.2836 (0.8); 7.2440 (0.6); 7.2323 (0.4); 7.2103 (0.4); 7.1809 (0.4); 7.1491 (10.3); 7.1447 (9.8); 7.1208 (7.4); 7.1165 (7.2); 6.9477 (0.4); 5.3371 (0.7); 3.7565 (1.4); 3.7361 (2.6); 3.7155 (1.3); 3.7000 (11.0); 3.6872 (11.9); 3.6647 (14.7); 3.6520 (15.6); 3.6280 (2.2); 3.6063 (1.1); 3.4614 (13.0); 3.4384 (16.0); 3.4261 (10.0); 3.4032 (12.6); 3.2783 (3.3); 3.2653 (3.6); 3.2596 (4.7); 3.2510 (5.5); 3.2469 (5.3); 3.2377 (6.9); 3.2325 (5.7); 3.2282 (5.0); 3.2238 (4.7); 3.2196 (5.4); 3.2096 (4.0); 3.1967 (3.3); 3.1585 (0.3); 2.9942 (10.0); 2.9755 (8.7); 2.9490 (14.1); 2.9304 (12.6); 2.8250 (0.3); 2.7615 (14.2); 2.7343 (12.9); 2.7164 (10.1); 2.6891 (8.9); 2.6244 (0.4); 2.3395 (0.3); 2.3172 (0.3); 2.2785 (0.3); 2.2381 (0.4); 2.0560 (0.6); 2.0391 (0.6); 1.9759 (0.7); 1.9495 (1.0); 1.9298 (1.2); 1.9008 (1.2); 1.8807 (1.1); 1.8269 (1.1); 1.8050 (1.3); 1.7866 (1.8); 1.7578 (1.9); 1.7483 (2.0); 1.7285 (2.8); 1.7171 (2.4); 1.7093 (2.3); 1.5696 (3.5); 1.3838 (1.4); 1.3224 (1.2); 1.2932 (1.8); 1.2571 (0.8); 1.2271 (0.8); 1.0531 (0.4); 1.0099 (0.5); 0.9171 (0.4); 0.8904 (0.4); 0.2034 (0.6); 0.1925 (20.0); 0.1817 (0.8); 0.1651 (1.6); 0.1063 (5.6); 0.0473 (2.6); 0.0442 (1.7); 0.0366 (84.4); 0.0273 (3.2); 0.0257 (3.6); 0.0024 (0.4); −0.0299 (0.5); −0.1621 (0.4)

TABLE 2-continued

I-315: $^1$H-NMR(300.2 MHz, CDCl3):
δ = 7.9471 (5.3); 7.2988 (8.3); 7.2705 (2.2); 7.1365 (0.6); 7.1015 (2.2); 7.0754 (2.5); 7.0524 (1.0); 7.0463 (1.1); 7.0285 (1.1); 7.0238 (1.3); 7.0021 (0.6); 6.9964 (0.5); 6.8548 (0.9); 6.8479 (1.8); 6.8284 (1.4); 6.8228 (1.5); 6.8079 (0.8); 6.8021 (0.6); 6.2214 (1.4); 5.3375 (0.5); 4.2693 (0.9); 4.2580 (1.0); 4.2331 (1.1); 4.2218 (1.2); 4.0819 (0.4); 4.0711 (0.6); 4.0640 (0.6); 4.0517 (0.6); 4.0446 (0.6); 4.0344 (0.5); 3.8907 (1.4); 3.8712 (1.2); 3.8545 (1.2); 3.8350 (1.0); 3.2652 (5.4); 3.2514 (0.9); 3.2346 (0.8); 3.2072 (1.1); 3.1906 (1.0); 2.9531 (1.1); 2.9226 (1.1); 2.9092 (0.9); 2.8788 (0.9); 2.6677 (16.0); 2.2034 (11.3); 2.1406 (0.5); 2.1294 (0.6); 2.1124 (1.0); 2.0953 (0.6); 2.0843 (0.6); 1.6122 (5.9); 1.0880 (0.7); 1.0748 (1.5); 1.0680 (1.8); 1.0599 (1.0); 1.0553 (1.1); 1.0462 (1.6); 1.0398 (1.7); 1.0269 (0.8); 0.8298 (0.9); 0.8226 (0.9); 0.8135 (1.9); 0.8067 (1.7); 0.7980 (2.0); 0.7908 (1.2); 0.7806 (0.6); 0.1187 (0.6); 0.1067 (15.2); 0.0944 (0.6); 0.0473 (0.5); 0.0367 (11.7); 0.0258 (0.5)
I-316: $^1$H-NMR(300.2 MHz, CDCl3):
δ = 7.9734 (5.2); 7.5974 (0.4); 7.5796 (0.9); 7.5676 (0.8); 7.5535 (0.5); 7.5494 (0.5); 7.5457 (0.5); 7.3494 (3.7); 7.3315 (2.3); 7.3252 (1.8); 7.2988 (2.9); 7.0973 (1.1); 7.0163 (1.7); 6.9908 (2.0); 6.9146 (2.6); 6.9036 (2.1); 6.7321 (1.2); 6.7172 (1.1); 6.6917 (1.0); 6.1098 (1.3); 4.3139 (0.8); 4.3044 (0.9); 4.2792 (1.0); 4.2694 (1.0); 3.9352 (0.4); 3.9283 (0.4); 3.9230 (0.5); 3.9183 (0.5); 3.9124 (0.5); 3.9074 (0.5); 3.9020 (0.6); 3.8960 (0.4); 3.8862 (0.5); 3.8783 (0.5); 3.8685 (1.8); 3.8479 (0.7); 3.8336 (1.4); 3.8129 (0.9); 3.0490 (0.7); 3.0335 (0.7); 3.0040 (1.0); 2.9879 (0.9); 2.7831 (1.1); 2.7518 (1.0); 2.7384 (1.3); 2.7061 (0.8); 2.6721 (16.0); 2.3053 (11.2); 2.2878 (0.4); 2.1571 (10.5); 0.0372 (3.8)
I-317: $^1$H-NMR(300.2 MHz, CDCl3):
δ = 7.9610 (4.9); 7.5909 (0.4); 7.5753 (0.8); 7.5624 (0.7); 7.5464 (0.5); 7.5427 (0.5); 7.3690 (0.4); 7.3415 (2.7); 7.3237 (2.5); 7.3184 (1.9); 7.3109 (1.1); 7.2986 (3.0); 7.0888 (1.0); 6.9818 (2.1); 6.9434 (0.6); 6.9175 (1.9); 6.9120 (2.1); 6.9060 (3.0); 6.9007 (3.0); 6.8748 (0.7); 6.7237 (1.1); 6.1214 (1.2); 4.3159 (0.8); 4.3063 (0.9); 4.2802 (0.9); 4.2703 (1.0); 3.9378 (0.4); 3.9314 (0.4); 3.9261 (0.5); 3.9213 (0.5); 3.9155 (0.5); 3.9099 (0.5); 3.9054 (0.5); 3.9000 (0.4); 3.8942 (0.4); 3.8890 (0.4); 3.8349 (1.6); 3.8133 (0.9); 3.7991 (1.3); 3.7776 (0.9); 3.0137 (0.7); 2.9975 (0.7); 2.9689 (0.9); 2.9526 (0.8); 2.6994 (1.1); 2.6679 (16.0); 2.6553 (1.3); 2.6225 (0.8); 2.1207 (10.7); 2.1135 (11.0); 0.0372 (3.7)
I-318: $^1$H-NMR(300.2 MHz, CDCl3):
δ = 7.9778 (4.9); 7.6071 (0.7); 7.5825 (2.3); 7.5599 (5.6); 7.5205 (3.1); 7.4593 (2.0); 7.4369 (1.3); 7.2993 (4.8); 6.9232 (3.7); 6.9049 (1.7); 6.8772 (4.4); 6.8596 (3.2); 6.8320 (1.0); 6.8271 (0.9); 6.1626 (2.5); 4.7046 (1.2); 4.6832 (1.4); 4.6695 (1.2); 4.3650 (1.6); 4.3520 (1.6); 4.3285 (1.9); 4.3156 (1.9); 4.2709 (16.0); 4.1919 (0.8); 4.1683 (1.8); 4.1445 (1.8); 4.1204 (0.7); 3.7407 (1.5); 3.7155 (1.6); 3.7038 (1.5); 3.6787 (1.3); 2.7262 (15.1); 2.0810 (6.7); 1.6349 (1.9); 1.3191 (2.5); 1.2951 (5.4); 1.2716 (2.3); 0.9166 (0.4); 0.1071 (2.8); 0.0363 (5.8)
I-319: $^1$H-NMR(499.9 MHz, CDCl3):
δ = 8.2201 (0.7); 8.1037 (16.0); 8.1028 (15.8); 7.8124 (0.7); 7.4671 (0.5); 7.4574 (2.7); 7.4530 (2.8); 7.4417 (6.0); 7.4375 (5.9); 7.4260 (3.9); 7.4218 (3.6); 7.4096 (0.8); 7.3918 (0.8); 7.3751 (0.4); 7.3649 (0.5); 7.3485 (0.4); 7.3152 (6.9); 7.3103 (9.7); 7.3053 (6.4); 7.2801 (4.1); 7.2606 (42.6); 7.2295 (0.5); 7.2257 (0.6); 7.2031 (0.5); 7.1867 (0.5); 7.1826 (0.4); 7.1739 (0.5); 7.1623 (0.4); 7.1435 (0.4); 7.1278 (0.4); 7.1073 (8.9); 7.0909 (10.3); 7.0488 (0.4); 7.0093 (2.5); 7.0048 (3.1); 6.9990 (3.0); 6.9947 (4.6); 6.9899 (3.3); 6.9735 (10.0); 6.9252 (3.3); 6.9211 (3.2); 6.9088 (3.0); 6.9044 (3.4); 6.9012 (3.9); 6.8970 (3.4); 6.8847 (3.0); 6.8807 (2.8); 6.1420 (5.4); 5.7650 (0.5); 5.0348 (0.6); 4.1525 (2.6); 4.1468 (4.5); 4.1412 (2.8); 4.1307 (3.3); 4.1250 (5.4); 4.1194 (3.2); 3.9801 (3.0); 3.9719 (3.4); 3.9650 (3.1); 3.9108 (7.1); 3.9068 (9.4); 3.9023 (9.8); 3.8986 (9.1); 3.8898 (4.0); 3.8860 (3.7); 3.8801 (2.9); 3.8764 (2.7); 3.3633 (0.3); 3.1808 (3.7); 3.1779 (3.9); 3.1699 (7.3); 3.1618 (4.6); 3.1590 (4.2); 3.1364 (3.4); 3.1264 (3.4); 3.1093 (4.4); 3.0992 (4.3); 2.9481 (2.6); 2.9380 (2.9); 2.9299 (2.8); 2.9202 (4.2); 2.9109 (2.3); 2.9028 (2.1); 2.8926 (2.0); 2.7911 (3.6); 2.7859 (6.6); 2.7805 (6.8); 2.7750 (6.4); 2.7698 (3.6); 1.5551 (24.7); 1.2551 (1.3); 0.8818 (0.3); 0.0695 (0.5); −0.0002 (52.8)
I-320: $^1$H-NMR(300.2 MHz, CDCl3):
δ = 7.5913 (1.2); 7.5685 (3.5); 7.5462 (0.4); 7.4871 (1.8); 7.4617 (0.8); 7.4538 (1.2); 7.4465 (0.7); 7.4413 (0.5); 7.4381 (0.5); 7.4319 (0.7); 7.2991 (5.5); 7.0809 (1.3); 7.0553 (2.2); 7.0311 (2.0); 6.9805 (1.2); 6.9557 (0.7); 5.2802 (1.2); 4.1627 (0.9); 4.1371 (1.1); 4.1205 (0.4); 3.9665 (0.7); 3.9504 (1.5); 3.9365 (0.6); 3.9226 (1.5); 3.9007 (0.5); 3.6408 (0.9); 3.6252 (1.7); 3.6198 (1.4); 3.6112 (1.3); 3.6046 (1.7); 3.5907 (1.2); 3.4632 (0.4); 3.4488 (0.4); 3.4416 (0.3); 3.4268 (0.3); 3.4169 (0.9); 3.4019 (1.0); 3.3955 (0.9); 3.3806 (0.7); 3.3565 (0.8); 3.3395 (0.9); 3.3360 (1.0); 3.3192 (0.7); 3.3103 (0.4); 3.2939 (0.4); 3.2891 (0.4); 3.1594 (16.0); 3.1408 (0.4); 2.9716 (1.2); 2.9537 (1.9); 2.9272 (0.9); 2.3703 (0.4); 2.3364 (9.9); 2.3183 (9.3); 1.6290 (1.4); 0.1080 (1.3); 0.0376 (5.9)
I-321: $^1$H-NMR(300.2 MHz, CDCl3):
δ = 8.1345 (10.4); 7.5040 (0.9); 7.4924 (1.0); 7.4836 (1.9); 7.4724 (2.0); 7.4633 (1.0); 7.4520 (1.2); 7.2989 (3.0); 7.2393 (0.4); 7.2335 (0.4); 7.2169 (4.7); 7.2122 (2.7); 7.2059 (2.4); 7.2030 (2.6); 7.1960 (2.4); 7.1916 (4.4); 7.1755 (0.4); 7.1689 (0.3); 7.0008 (2.5); 6.9753 (3.0); 6.9004 (2.8); 6.7174 (1.5); 6.6920 (1.3); 6.0870 (1.8); 4.3209 (1.1); 4.3119 (1.3); 4.2856 (1.4); 4.2768 (1.4); 3.9253 (0.5); 3.9185 (0.6); 3.9133 (0.7); 3.9083 (0.8); 3.9023 (0.7); 3.8975 (0.7); 3.8921 (0.8); 3.8862 (0.6); 3.8829 (0.6); 3.8762 (0.7); 3.8677 (0.7); 3.8582 (2.6); 3.8376 (1.0); 3.8234 (2.0); 3.8026 (1.3); 3.4046 (5.8); 3.0518 (1.0); 3.0362 (1.0); 3.0068 (1.4); 2.9904 (1.3); 2.7657 (1.4); 2.7341 (1.4); 2.7207 (1.2); 2.6885 (1.1); 2.3518 (0.5); 2.3328 (0.5); 2.3014 (16.0); 2.2059 (0.4); 2.1794 (15.0); 2.0394 (7.0); 1.6666 (0.5); 0.0378 (4.0)
I-322: $^1$H-NMR(499.9 MHz, CDCl3):
δ = 7.9095 (5.3); 7.2604 (13.4); 7.2106 (2.7); 7.1075 (0.7); 7.0916 (1.8); 7.0756 (1.1); 7.0050 (0.6); 7.0016 (0.5); 6.9856 (3.1); 6.9774 (4.6); 6.9607 (1.6); 6.8269 (0.8); 6.8136 (1.5); 6.8002 (0.8); 6.7979 (0.8); 6.1901 (1.6); 4.1964 (0.4); 4.1854 (1.3); 4.1703 (1.4); 4.1592 (0.5); 3.8680 (0.4); 3.8505 (2.2); 3.8454 (1.2); 3.8355 (2.3); 3.8247 (0.9); 2.9680 (0.8); 2.9588 (0.9); 2.9407 (1.1); 2.9312 (1.1); 2.8005 (1.0); 2.7828 (1.0); 2.7737 (0.9); 2.7636 (0.4); 2.7550 (0.7); 2.6367 (16.0); 2.2866 (13.1); 2.0995 (0.5); 2.0928 (0.6); 2.0826 (1.1); 2.0724 (0.7); 2.0657 (0.7); 2.0552 (0.4); 1.5588 (7.4); 1.2552 (0.5); 1.0432 (0.3); 1.0333 (1.9); 1.0298 (2.1); 1.0275 (1.9); 1.0164 (2.1); 1.0128 (2.2); 1.0035 (0.6); 0.7925 (1.3); 0.7905 (1.2); 0.7869 (1.2); 0.7824 (2.0); 0.7793 (2.1); 0.7771 (2.3); 0.7669 (1.5); 0.7542 (0.3); 0.7485 (0.4); 0.0061 (0.6); −0.0002 (15.6)
I-323: $^1$H-NMR(499.9 MHz, CDCl3):
δ = 7.9094 (5.3); 7.2606 (11.9); 7.2110 (2.8); 7.1079 (0.8); 7.0920 (1.8); 7.0761 (1.2); 7.0049 (0.6); 7.0020 (0.5); 6.9874 (3.2); 6.9775 (4.8); 6.9608 (1.6); 6.8273 (0.8); 6.8138 (1.5); 6.8002 (0.8); 6.1910 (1.7); 4.1962 (0.4); 4.1854 (1.4); 4.1703 (1.5); 4.1593 (0.5); 3.8678 (0.4); 3.8509 (2.3); 3.8356 (2.3); 3.8248 (0.8); 2.9681 (0.9); 2.9589 (0.9); 2.9407 (1.1); 2.9313 (1.1); 2.8006 (1.0); 2.7830 (1.0); 2.7739 (0.8); 2.7639 (0.4); 2.7552 (0.7); 2.6367 (16.0); 2.2866 (13.5); 2.0995 (0.6); 2.0928 (0.7); 2.0827 (1.1); 2.0725 (0.7); 2.0659 (0.7); 2.0554 (0.3); 1.5632 (8.4); 1.3191 (0.4); 1.2557 (0.5); 1.0432 (0.4); 1.0334 (2.0); 1.0298 (2.2); 1.0165 (2.2); 1.0129 (2.2); 1.0036 (0.6); 0.9362 (0.3); 0.9213 (0.6); 0.9062 (0.4); 0.8958 (0.5); 0.7925 (1.4); 0.7869 (1.2); 0.7823 (2.1); 0.7792 (2.2); 0.7773 (2.3); 0.7670 (1.5); −0.0002 (13.2)
I-324: $^1$H-NMR(300.2 MHz, CDCl3):
δ = 7.9749 (5.2); 7.6011 (0.4); 7.5834 (1.0); 7.5715 (0.8); 7.5572 (0.5); 7.5530 (0.5); 7.3822 (0.3); 7.3555 (3.7); 7.3377 (2.3); 7.3315 (1.8); 7.3100 (0.3); 7.2987 (3.2); 7.1090 (1.1); 7.0202 (1.9); 6.9943 (2.2); 6.9263 (2.3); 6.8172 (2.0); 6.8128 (2.1); 6.7437 (1.2); 6.6082 (1.2); 6.6025 (1.1); 6.5823 (1.0); 6.5767 (1.0); 6.1224 (1.4); 4.2980 (0.7); 4.2898 (1.0); 4.2639 (1.1); 4.2552 (0.8); 3.9196 (0.4); 3.9079 (0.5); 3.9031 (0.5); 3.8970 (0.5); 3.8932 (0.5); 3.8872 (0.6); 3.8792 (0.6); 3.8674 (1.9); 3.8479 (0.5); 3.8336 (1.4); 3.8132 (0.8); 3.0378 (0.7); 3.0229 (0.7); 2.9929 (1.1); 2.9770 (1.0); 2.7795 (0.9); 2.7477 (0.9); 2.7340 (0.9); 2.7024 (0.8); 2.6734 (16.0); 2.3052 (11.6); 2.0410 (0.6); 1.7615 (0.3); 1.7446 (0.6); 1.7334 (0.6); 1.7166 (1.1);

1.7050 (0.5); 1.6998 (0.7); 1.6886 (0.6); 1.6717 (0.3); 0.9363 (0.4); 0.9202 (1.7); 0.9142 (2.0); 0.9101 (1.5); 0.8922 (1.8); 0.8861 (1.7); 0.8825 (1.3); 0.8708 (0.4); 0.5583 (1.4); 0.5541 (1.0); 0.5486 (1.0); 0.5417 (1.9); 0.5365 (1.7); 0.5322 (1.8); 0.5264 (1.0); 0.5189 (1.0); 0.5162 (1.1); 0.0374 (4.1)

I-325: $^{1}$H-NMR(300.2 MHz, CDCl3):

δ = 7.9534 (5.3); 7.4775 (0.6); 7.4716 (0.6); 7.4511 (1.2); 7.4294 (0.7); 7.4240 (0.7); 7.2988 (2.7); 7.2175 (0.6); 7.2144 (0.6); 7.1906 (1.5); 7.1881 (1.5); 7.1620 (1.1); 7.1362 (0.9); 7.1301 (1.0); 7.1122 (1.0); 7.1072 (1.1); 7.0857 (0.5); 7.0801 (0.5); 7.0163 (1.8); 6.9908 (2.0); 6.9133 (1.0); 6.8900 (2.0); 6.8761 (1.1); 6.8542 (1.1); 6.8168 (1.1); 6.6975 (1.1); 6.6726 (0.9); 6.2088 (1.3); 5.9215 (1.8); 5.9187 (1.9); 5.8624 (1.6); 5.8596 (1.6); 5.4888 (1.8); 5.4861 (1.8); 5.4515 (1.7); 5.4488 (1.7); 4.2993 (0.8); 4.2900 (0.9); 4.2645 (1.0); 4.2552 (1.0); 3.9259 (0.4); 3.9188 (0.4); 3.9142 (0.5); 3.9087 (0.6); 3.9027 (0.5); 3.8979 (0.5); 3.8927 (0.6); 3.8771 (0.5); 3.8687 (0.5); 3.8598 (1.9); 3.8391 (0.7); 3.8250 (1.4); 3.8043 (0.9); 3.0393 (0.7); 3.0236 (0.7); 2.9943 (1.0); 2.9778 (0.9); 2.7861 (1.0); 2.7550 (1.0); 2.7411 (0.8); 2.7093 (0.8); 2.6631 (16.0); 2.3013 (11.2); 2.1600 (10.6); 2.0408 (1.3); 1.6708 (1.2); 0.1094 (0.3); 0.0377 (3.3)

I-326: $^{1}$H-NMR(300.2 MHz, CDCl3):

δ = 7.9465 (5.2); 7.2987 (1.6); 7.1681 (0.4); 7.1480 (1.0); 7.1434 (0.9); 7.1290 (2.8); 7.1223 (1.0); 7.1044 (2.4); 7.0786 (1.0); 7.0559 (0.8); 7.0499 (0.8); 7.0318 (1.1); 7.0212 (2.3); 7.0094 (0.6); 6.9950 (2.2); 6.9030 (2.2); 6.7018 (1.2); 6.6765 (1.0); 6.2424 (1.4); 4.2789 (0.8); 4.2701 (1.0); 4.2448 (1.1); 4.2355 (1.0); 3.9154 (0.4); 3.9039 (0.5); 3.8976 (0.6); 3.8871 (0.6); 3.8833 (0.6); 3.8807 (0.6); 3.8767 (0.5); 3.8668 (0.6); 3.8569 (2.1); 3.8367 (0.6); 3.8225 (1.4); 3.8020 (0.8); 3.0347 (0.7); 3.0189 (0.7); 2.9899 (1.1); 2.9731 (1.0); 2.7940 (1.0); 2.7636 (1.0); 2.7489 (0.8); 2.7181 (0.8); 2.6587 (16.0); 2.3480 (6.9); 2.3409 (7.2); 2.3038 (11.8); 2.1839 (11.0); 2.0366 (2.2); 0.0379 (2.2)

I-327: $^{1}$H-NMR(300.2 MHz, CDCl3):

δ = 7.9563 (5.4); 7.3531 (1.2); 7.3269 (2.6); 7.2986 (10.7); 7.0739 (2.4); 7.0472 (5.4); 7.0162 (1.5); 6.9902 (1.3); 6.8816 (1.0); 6.8787 (1.0); 6.8737 (1.4); 6.8473 (1.5); 6.8444 (1.4); 6.8366 (2.0); 6.8310 (2.4); 6.6090 (1.5); 6.6033 (1.4); 6.5828 (1.3); 6.5770 (1.3); 6.3105 (1.4); 4.2165 (0.9); 4.2056 (1.1); 4.1805 (1.2); 4.1701 (1.6); 4.1472 (0.4); 3.9978 (0.4); 3.9880 (0.6); 3.9677 (0.6); 3.9588 (0.6); 3.9496 (0.5); 3.9419 (0.4); 3.8890 (1.5); 3.8708 (1.0); 3.8530 (1.2); 3.8348 (0.9); 3.1667 (0.9); 3.1504 (0.9); 3.1220 (1.2); 3.1056 (1.1); 2.8944 (1.2); 2.8641 (1.2); 2.8496 (0.9); 2.8192 (0.9); 2.6690 (16.0); 2.0833 (1.9); 1.9740 (0.6); 1.9626 (0.6); 1.9460 (1.2); 1.9291 (0.7); 1.9180 (0.7); 1.9011 (0.4); 1.8061 (0.6); 1.7948 (0.7); 1.7782 (1.2); 1.7615 (0.8); 1.7502 (0.7); 1.7335 (0.4); 1.6431 (0.4); 1.3207 (0.5); 1.2969 (1.1); 1.2730 (0.5); 1.0537 (0.6); 1.0391 (2.0); 1.0321 (2.1); 1.0177 (1.2); 1.0107 (2.1); 1.0038 (2.0); 0.9898 (1.1); 0.9814 (2.3); 0.9746 (2.7); 0.9532 (2.4); 0.9466 (2.4); 0.9280 (0.4); 0.7765 (1.0); 0.7619 (2.4); 0.7453 (2.2); 0.7406 (2.2); 0.7241 (0.8); 0.6161 (1.3); 0.6082 (0.9); 0.5988 (2.0); 0.5915 (2.1); 0.5818 (0.9); 0.5747 (1.4); 0.1069 (7.4); 0.0476 (0.5); 0.0368 (13.8); 0.0276 (0.6); 0.0260 (0.6)

I-328: $^{1}$H-NMR(300.2 MHz, CDCl3):

δ = 7.9519 (5.3); 7.3518 (0.8); 7.3475 (0.5); 7.3233 (1.5); 7.2989 (13.9); 7.1268 (0.4); 7.0119 (1.6); 7.0029 (2.1); 6.9861 (1.5); 6.9769 (2.2); 6.8546 (2.8); 6.8475 (1.9); 6.8233 (4.2); 6.8196 (3.7); 6.5801 (1.1); 6.5743 (1.1); 6.5543 (1.0); 6.5484 (1.0); 6.3248 (1.4); 4.2535 (0.5); 4.2464 (1.1); 4.2214 (1.1); 3.8621 (0.5); 3.8561 (0.6); 3.8471 (0.6); 3.8337 (1.7); 3.8003 (1.5); 3.7799 (0.7); 3.0194 (0.6); 3.0039 (0.6); 2.9739 (1.0); 2.9585 (0.9); 2.7538 (0.8); 2.7232 (0.9); 2.7084 (0.8); 2.6659 (16.0); 2.3399 (0.7); 2.3000 (11.4); 2.0842 (0.5); 1.9752 (0.5); 1.9641 (0.6); 1.9474 (1.1); 1.9304 (0.7); 1.9192 (0.6); 1.9026 (0.3); 1.8072 (0.5); 1.7960 (0.6); 1.7792 (1.0); 1.7621 (0.6); 1.7511 (0.6); 1.6046 (12.9); 1.3448 (0.3); 1.3213 (0.6); 1.3047 (2.2); 1.2984 (2.0); 1.0520 (0.7); 1.0368 (1.9); 1.0300 (2.1); 1.0244 (1.1); 1.0153 (1.1); 1.0084 (2.1); 1.0018 (1.9); 0.9874 (1.0); 0.9605 (0.5); 0.9431 (2.5); 0.9369 (2.8); 0.9200 (3.4); 0.9157 (2.6); 0.9087 (2.2); 0.8968 (1.1); 0.7780 (0.9); 0.7629 (2.2); 0.7566 (2.1); 0.7464 (2.1); 0.7406 (2.4); 0.7246 (0.8); 0.6104 (1.1); 0.6026 (0.9); 0.5972 (1.5); 0.5907 (2.1); 0.5854 (1.4); 0.5736 (1.2); 0.5677 (0.8); 0.1077 (0.9); 0.0491 (0.5); 0.0381 (17.5); 0.0272 (0.7)

I-329: $^{1}$H-NMR(300.2 MHz, CDCl3):

δ = 7.9663 (5.2); 7.3698 (0.8); 7.3429 (2.0); 7.3180 (1.3); 7.3080 (0.5); 7.2989 (12.6); 7.2676 (2.2); 7.0406 (0.7); 7.0342 (0.6); 7.0146 (2.4); 7.0072 (2.1); 6.9945 (1.9); 6.9873 (3.9); 6.9600 (1.2); 6.8367 (0.9); 6.8317 (1.3); 6.8289 (1.3); 6.8057 (3.4); 6.8031 (3.5); 6.3226 (1.3); 4.2259 (0.3); 4.2074 (1.2); 4.1948 (0.6); 4.1822 (1.3); 4.1710 (1.5); 4.1472 (1.4); 4.1234 (0.4); 3.8801 (0.8); 3.8650 (1.8); 3.8501 (0.7); 3.8406 (1.9); 3.8226 (0.6); 3.1222 (0.3); 3.0080 (0.8); 2.9926 (0.7); 2.9584 (1.1); 2.9462 (0.9); 2.8119 (0.9); 2.7833 (0.9); 2.7676 (0.7); 2.7425 (0.8); 2.7375 (0.8); 2.7001 (0.4); 2.6788 (16.0); 2.3392 (0.5); 2.3101 (12.2); 2.2301 (0.4); 2.2062 (0.4); 2.0831 (5.9); 1.9857 (0.6); 1.9746 (0.6); 1.9577 (1.2); 1.9408 (0.8); 1.9299 (0.7); 1.9127 (0.4); 1.7536 (0.6); 1.3208 (1.7); 1.2969 (3.5); 1.2732 (1.7); 1.0633 (0.7); 1.0480 (1.9); 1.0412 (2.2); 1.0263 (1.2); 1.0196 (2.1); 1.0131 (1.9); 0.9984 (1.1); 0.7800 (0.9); 0.7646 (2.4); 0.7588 (2.2); 0.7484 (2.1); 0.7425 (2.6); 0.7262 (0.9); 0.1069 (1.2); 0.0479 (0.5); 0.0371 (16.6); 0.0262 (0.7)

I-330: $^{1}$H-NMR(300.2 MHz, CDCl3):

δ = 7.9422 (5.1); 7.3307 (1.1); 7.2985 (8.6); 7.2785 (1.4); 6.9987 (1.5); 6.9675 (3.0); 6.9127 (6.3); 6.9097 (6.0); 6.8317 (1.0); 6.8286 (1.0); 6.8237 (1.4); 6.8209 (1.1); 6.8052 (0.6); 6.7974 (1.6); 6.7939 (1.7); 6.7898 (2.0); 6.7841 (2.3); 6.7780 (1.0); 6.3312 (1.4); 5.3371 (3.1); 4.2797 (0.9); 4.2684 (1.0); 4.2440 (1.0); 4.2326 (1.1); 3.8992 (0.4); 3.8827 (0.6); 3.8671 (0.6); 3.8509 (0.4); 3.8013 (1.7); 3.7795 (1.0); 3.7657 (1.4); 3.7439 (1.0); 2.9825 (0.8); 2.9663 (0.8); 2.9378 (1.0); 2.9213 (1.0); 2.6824 (1.2); 2.6593 (16.0); 2.6377 (1.0); 2.6062 (0.9); 2.1764 (11.8); 2.1164 (11.9); 1.9592 (0.6); 1.9479 (0.6); 1.9313 (1.1); 1.9144 (0.7); 1.9032 (0.8); 1.8864 (0.3); 1.6225 (3.6); 1.2972 (0.4); 1.0497 (0.7); 1.0351 (1.9); 1.0280 (2.1); 1.0219 (1.0); 1.0135 (1.0); 1.0066 (2.0); 1.0000 (1.9); 0.9856 (0.9); 0.7610 (0.9); 0.7463 (2.4); 0.7415 (2.0); 0.7295 (2.0); 0.7246 (2.3); 0.7081 (0.7); 0.0483 (0.4); 0.0375 (11.6); 0.0284 (0.4); 0.0267 (0.4)

I-331: $^{1}$H-NMR(300.2 MHz, CDCl3):

δ = 7.9512 (4.1); 7.5078 (1.7); 7.3604 (1.2); 7.3341 (1.4); 7.2987 (13.0); 7.1394 (0.4); 7.1354 (0.4); 7.1126 (1.2); 7.0869 (1.5); 7.0674 (0.9); 7.0552 (0.8); 7.0489 (0.9); 7.0313 (0.8); 7.0260 (0.9); 7.0045 (0.4); 6.9988 (0.4); 6.8570 (0.6); 6.8508 (0.6); 6.8301 (0.9); 6.8088 (0.5); 6.8030 (0.4); 6.6654 (0.8); 6.4780 (1.7); 6.2907 (0.8); 6.2041 (0.8); 4.2067 (0.7); 4.1964 (0.9); 4.1709 (1.1); 4.1606 (1.1); 4.0772 (0.5); 4.0619 (0.5); 4.0478 (0.5); 4.0020 (1.2); 3.9870 (0.7); 3.9661 (0.8); 3.9510 (0.6); 3.2872 (0.5); 3.2710 (0.5); 3.2431 (0.7); 3.2263 (0.7); 3.0858 (0.8); 3.0556 (0.8); 3.0415 (0.6); 3.0112 (0.5); 2.6810 (12.4); 2.5382 (0.4); 2.1233 (0.4); 2.1119 (0.4); 2.0951 (0.7); 2.0833 (0.8); 2.0778 (0.5); 2.0667 (0.4); 1.6021 (16.0); 1.2968 (0.5); 1.0876 (0.4); 1.0734 (1.2); 1.0667 (1.4); 1.0561 (0.8); 1.0522 (0.7); 1.0448 (1.3); 1.0385 (1.3); 1.0270 (0.5); 1.0242 (0.5); 0.8201 (0.7); 0.8131 (0.7); 0.8044 (1.4); 0.7971 (1.4); 0.7881 (1.6); 0.7810 (1.0); 0.7708 (0.6); 0.1065 (4.3); 0.0474 (0.6); 0.0367 (17.1); 0.0258 (0.7)

I-332: $^{1}$H-NMR(300.2 MHz, CDCl3):

δ = 7.9550 (5.2); 7.2987 (12.4); 7.2597 (2.3); 7.2318 (2.6); 7.1624 (2.2); 7.1543 (2.2); 7.1213 (1.5); 7.0930 (1.5); 7.0773 (1.1); 7.0706 (1.3); 7.0539 (1.1); 7.0483 (1.3); 7.0271 (0.6); 7.0212 (0.5); 6.8631 (0.7); 6.8564 (0.7); 6.8390 (1.1); 6.8150 (0.7); 6.8091 (0.6); 6.7384 (1.2); 6.7303 (1.1); 6.7107 (1.0); 6.7025 (1.0); 6.5663 (1.6); 6.3222 (3.1); 6.2061 (1.1); 6.0783 (1.6); 4.2068 (0.8); 4.1966 (1.1); 4.1710 (1.8); 4.1615 (1.3); 4.1470 (0.6); 4.0496 (0.4); 4.0389 (0.6); 4.0234 (0.6); 4.0090 (0.6); 3.9997 (0.4); 3.9931 (0.5); 3.9797 (1.6); 3.9643 (0.8); 3.9443 (1.1); 3.9286 (0.8); 3.2239 (0.8); 3.2082 (0.8); 3.1793 (1.2); 3.1630 (1.1); 3.0126 (1.2); 2.9828 (1.1); 2.9679 (0.8); 2.9375 (0.8); 2.6802 (16.0); 2.5653 (0.6); 2.1299 (0.4); 2.1187 (0.5); 2.1016 (1.0); 2.0831 (3.1); 2.0736 (0.6); 1.6050 (6.4); 1.3437 (0.7); 1.3205 (1.7); 1.3032 (3.8); 1.2968 (4.5); 1.2729 (1.0);

TABLE 2-continued 1.0908 (0.5); 1.0769 (1.6); 1.0699 (1.8); 1.0568 (0.9); 1.0482 (1.8); 1.0417 (1.7); 1.0283 (0.8); 0.9405 (1.3); 0.9187 (4.4); 0.8955 (1.6); 0.8256 (0.9); 0.8085 (1.9); 0.8038 (1.6); 0.7946 (1.9); 0.7918 (1.9); 0.7866 (1.4); 0.7748 (0.8); 0.1066 (4.5); 0.0474 (0.6); 0.0367 (17.6); 0.0257 (0.7)

I-333: $^1$H-NMR(300.2 MHz, CDCl3):
δ = 7.9621 (5.3); 7.5684 (0.6); 7.5423 (1.6); 7.5160 (1.2); 7.4585 (1.5); 7.4329 (0.9); 7.2991 (1.3); 7.2627 (1.9); 7.2293 (1.0); 7.2260 (1.2); 7.2223 (1.1); 7.2187 (0.8); 7.2027 (0.9); 7.1993 (1.0); 7.1954 (0.9); 7.1919 (0.7); 7.1344 (2.2); 7.1320 (2.3); 7.0793 (2.1); 7.0537 (2.4); 6.8868 (1.1); 6.7649 (1.3); 6.7618 (1.3); 6.7393 (1.1); 6.7362 (1.1); 6.6990 (2.3); 6.5112 (1.2); 6.1963 (1.3); 5.3271 (5.4); 4.2354 (0.9); 4.2245 (1.0); 4.1993 (1.1); 4.1885 (1.2); 4.0357 (0.4); 4.0264 (0.5); 4.0185 (0.5); 4.0112 (0.6); 4.0048 (0.6); 3.9963 (0.6); 3.9874 (0.5); 3.9795 (0.4); 3.8981 (1.5); 3.8797 (1.1); 3.8620 (1.2); 3.8436 (1.0); 3.1666 (0.8); 3.1503 (0.8); 3.1217 (1.1); 3.1055 (1.0); 2.9205 (1.2); 2.8894 (1.1); 2.8758 (1.0); 2.8445 (0.8); 2.6641 (16.0); 2.2075 (11.0); 1.7663 (0.9); 0.0325 (1.4)

I-334: $^1$H-NMR(300.2 MHz, CDCl3):
δ = 7.9519 (5.2); 7.2988 (13.0); 7.2702 (2.7); 7.2584 (1.7); 7.2530 (1.7); 7.1430 (0.5); 7.1397 (0.5); 7.1160 (1.5); 7.0879 (1.5); 7.0735 (1.0); 7.0667 (1.2); 7.0500 (1.1); 7.0445 (1.2); 7.0232 (0.6); 7.0173 (0.5); 6.8570 (0.8); 6.8501 (1.4); 6.8415 (1.1); 6.8344 (1.5); 6.8218 (1.0); 6.8183 (1.0); 6.8101 (1.2); 6.2116 (1.1); 5.3376 (3.4); 4.1907 (0.7); 4.1814 (1.1); 4.1557 (1.3); 4.1464 (1.2); 4.0549 (0.4); 4.0439 (0.6); 4.0287 (0.7); 4.0151 (0.7); 3.9978 (1.8); 3.9833 (0.6); 3.9625 (1.0); 3.9479 (0.7); 3.2400 (0.7); 3.2245 (0.7); 3.1956 (1.2); 3.1792 (1.1); 3.0479 (1.0); 3.0184 (1.0); 3.0030 (0.8); 2.9734 (0.7); 2.6824 (16.0); 2.1260 (0.5); 2.1147 (0.5); 2.0975 (0.9); 2.0808 (0.6); 2.0694 (0.5); 1.6072 (9.5); 1.0835 (0.5); 1.0709 (1.6); 1.0641 (1.8); 1.0517 (0.9); 1.0423 (1.7); 1.0358 (1.7); 1.0231 (0.7); 0.8184 (1.0); 0.8013 (2.0); 0.7965 (1.6); 0.7874 (1.8); 0.7846 (1.8); 0.7795 (1.4); 0.7675 (0.7); 0.1066 (3.8); 0.0474 (0.6); 0.0366 (15.6); 0.0257 (0.6)

I-335: $^1$H-NMR(300.2 MHz, CDCl3):
δ = 7.9551 (4.9); 7.2986 (14.6); 7.1298 (0.5); 7.1263 (0.5); 7.1030 (1.4); 7.1001 (1.3); 7.0767 (1.0); 7.0736 (1.0); 7.0329 (1.9); 7.0218 (0.9); 7.0159 (1.1); 7.0076 (2.2); 6.9929 (1.2); 6.9711 (0.6); 6.9657 (0.5); 6.8537 (0.7); 6.8484 (0.7); 6.8270 (1.2); 6.8056 (0.6); 6.8007 (0.5); 6.7277 (2.1); 6.6924 (1.2); 6.6675 (1.0); 6.2726 (1.3); 5.3378 (12.4); 4.3082 (0.8); 4.2966 (0.9); 4.2722 (0.9); 4.2608 (1.0); 4.1713 (0.4); 4.1475 (0.4); 4.0277 (0.5); 4.0146 (0.6); 4.0078 (0.5); 3.9959 (0.4); 3.8839 (1.4); 3.8631 (1.0); 3.8478 (1.1); 3.8270 (0.9); 3.2672 (0.7); 3.2499 (0.7); 3.2221 (0.9); 3.2047 (0.9); 2.9493 (1.0); 2.9177 (1.0); 2.9038 (0.8); 2.8726 (0.7); 2.6668 (14.7); 2.1789 (10.4); 2.1388 (0.4); 2.1283 (0.5); 2.1109 (1.0); 2.0935 (0.6); 2.0837 (2.3); 2.0461 (0.5); 1.9572 (0.5); 1.9468 (0.5); 1.9408 (0.3); 1.9292 (0.9); 1.9115 (0.5); 1.9011 (0.5); 1.6037 (16.0); 1.3210 (0.7); 1.2971 (1.4); 1.2734 (0.6); 1.0862 (0.6); 1.0731 (1.4); 1.0660 (1.7); 1.0614 (1.0); 1.0582 (1.0); 1.0530 (1.0); 1.0442 (1.4); 1.0378 (1.6); 1.0246 (0.8); 1.0046 (0.3); 0.9894 (0.5); 0.9750 (1.2); 0.9604 (1.4); 0.9545 (1.1); 0.9461 (1.3); 0.9323 (1.2); 0.9167 (0.7); 0.9014 (0.4); 0.8301 (0.8); 0.8133 (1.7); 0.8077 (1.5); 0.7985 (1.8); 0.7911 (1.2); 0.7802 (0.6); 0.6935 (0.6); 0.6826 (1.2); 0.6648 (2.1); 0.6550 (1.0); 0.6471 (1.0); 0.6378 (0.6); 0.1067 (4.2); 0.0478 (0.7); 0.0462 (0.5); 0.0370 (19.2); 0.0294 (0.6); 0.0278 (0.6); 0.0262 (0.7)

I-336: $^1$H-NMR(499.9 MHz, CDCl3):
δ = 7.9211 (5.3); 7.3693 (1.0); 7.3561 (2.0); 7.3537 (1.9); 7.3403 (1.7); 7.2620 (6.0); 7.2120 (3.5); 7.1871 (1.3); 7.1844 (1.4); 7.1678 (2.4); 7.1515 (1.8); 7.1066 (1.3); 7.0931 (2.1); 7.0773 (1.4); 7.0433 (1.5); 7.0271 (2.6); 6.9794 (3.1); 6.9632 (2.5); 6.0258 (2.4); 5.2989 (0.4); 4.1931 (1.7); 4.1775 (2.0); 3.8593 (3.1); 3.8428 (2.9); 3.8322 (1.9); 3.4869 (7.2); 2.9726 (0.9); 2.9632 (1.2); 2.9552 (1.4); 2.9456 (1.8); 2.9357 (1.9); 2.8816 (0.8); 2.8029 (1.0); 2.7931 (0.7); 2.7842 (1.4); 2.7756 (1.4); 2.7570 (1.2); 2.6442 (16.0); 2.2905 (14.1); 1.5839 (5.6); −0.0002 (7.4)

I-337: $^1$H-NMR(499.9 MHz, CDCl3):
δ = 8.0116 (0.5); 7.9208 (5.2); 7.3719 (0.7); 7.3689 (0.8); 7.3558 (1.6); 7.3527 (1.1); 7.3425 (0.9); 7.3396 (1.0); 7.2619 (6.3); 7.2121 (2.6); 7.1867 (0.8); 7.1837 (0.8); 7.1702 (1.6); 7.1672 (1.8); 7.1538 (1.0); 7.1509 (1.1); 7.1095 (1.0); 7.1065 (1.1); 7.0960 (1.1); 7.0932 (1.6); 7.0797 (0.7); 7.0767 (0.7); 7.0467 (1.0); 7.0433 (1.0); 7.0305 (1.6); 7.0271 (1.7); 6.9794 (2.9); 6.9632 (1.8); 6.0277 (1.6); 4.1927 (1.3); 4.1772 (1.4); 3.8840 (0.4); 3.8785 (0.6); 3.8733 (0.7); 3.8620 (2.1); 3.8426 (1.7); 3.8318 (0.9); 3.4866 (1.9); 2.9726 (0.8); 2.9630 (0.9); 2.9547 (3.7); 2.9455 (1.4); 2.9355 (1.2); 2.8812 (3.2); 2.8031 (1.0); 2.7934 (0.4); 2.7845 (1.0); 2.7758 (0.9); 2.7571 (0.8); 2.6439 (16.0); 2.2905 (12.9); 1.5854 (6.9); −0.0002 (8.0)

I-338: $^1$H-NMR(499.9 MHz, CDCl3):
δ = 7.9181 (5.2); 7.3573 (0.7); 7.3502 (0.8); 7.3446 (1.3); 7.3377 (1.4); 7.3315 (0.8); 7.3248 (0.8); 7.2614 (5.6); 7.1672 (0.5); 7.1620 (0.6); 7.1523 (3.8); 7.1450 (2.5); 7.1381 (3.2); 7.1280 (0.4); 7.1234 (0.4); 7.1092 (2.6); 7.0620 (2.2); 7.0466 (2.4); 6.7473 (1.4); 6.7329 (1.2); 5.9996 (1.4); 4.2072 (1.1); 4.2005 (1.2); 4.1853 (1.2); 4.1787 (1.2); 4.0190 (0.6); 4.0129 (0.7); 4.0077 (0.7); 4.0041 (0.7); 4.0009 (0.7); 3.9955 (0.7); 3.9896 (0.5); 3.9852 (0.4); 3.8755 (1.5); 3.8645 (1.3); 3.8536 (1.3); 3.8427 (1.1); 3.4865 (0.3); 3.1426 (1.0); 3.1325 (1.0); 3.1157 (1.2); 3.1056 (1.0); 2.8876 (1.2); 2.8689 (1.2); 2.8607 (1.0); 2.8420 (0.9); 2.6413 (16.0); 2.1865 (11.8); 1.5792 (4.8); 0.0061 (0.6); −0.0002 (7.2)

I-339: $^1$H-NMR(499.9 MHz, CDCl3):
δ = 7.9180 (5.2); 7.3574 (0.6); 7.3503 (0.7); 7.3447 (1.3); 7.3379 (1.4); 7.3316 (0.8); 7.3250 (0.9); 7.2616 (5.6); 7.1523 (3.6); 7.1451 (2.5); 7.1383 (3.4); 7.1284 (0.5); 7.1238 (0.4); 7.1091 (3.0); 7.0620 (2.3); 7.0466 (2.6); 6.7475 (1.6); 6.7323 (1.5); 5.9992 (1.6); 4.2071 (1.1); 4.2005 (1.2); 4.1853 (1.3); 4.1786 (1.4); 4.0189 (0.5); 4.0127 (0.7); 4.0073 (0.8); 4.0009 (0.8); 3.9956 (0.8); 3.9897 (0.6); 3.8756 (1.4); 3.8647 (1.3); 3.8537 (1.3); 3.8428 (1.2); 3.1426 (1.0); 3.1325 (1.0); 3.1157 (1.2); 3.1056 (1.2); 2.9550 (1.8); 2.8876 (1.3); 2.8824 (1.9); 2.8691 (1.3); 2.8609 (1.1); 2.8422 (1.0); 2.6414 (16.0); 2.1865 (12.7); 1.5834 (4.2); −0.0002 (6.8)

I-340: $^1$H-NMR(499.9 MHz, CDCl3):
δ = 7.6087 (16.0); 7.5194 (4.3); 7.5035 (7.6); 7.4877 (4.6); 7.4666 (1.1); 7.4573 (7.9); 7.4532 (8.0); 7.4417 (0.7); 7.4294 (5.7); 7.4130 (6.6); 7.3656 (0.4); 7.2775 (5.8); 7.2734 (5.8); 7.2603 (48.1); 6.9052 (7.5); 6.8898 (7.0); 6.6143 (5.3); 6.5980 (5.0); 5.2992 (14.3); 4.4164 (1.7); 4.4019 (2.9); 4.3870 (1.6); 4.3079 (4.0); 4.3056 (4.1); 4.2859 (4.4); 4.2837 (4.4); 3.9983 (3.5); 3.9944 (3.6); 3.9765 (3.1); 3.9725 (2.9); 3.3313 (2.2); 3.3177 (2.2); 3.3036 (3.0); 3.2900 (2.8); 3.1815 (3.5); 3.1654 (3.4); 3.1537 (2.5); 3.1376 (2.3); 1.7006 (0.4); 1.5621 (3.7); 1.4796 (0.5); 1.2544 (1.7); 0.1164 (0.4); 0.0691 (2.5); 0.0059 (3.3); −0.0002 (48.0); −0.0064 (2.3)

I-341: $^1$H-NMR(300.2 MHz, CDCl3):
δ = 8.1297 (16.0); 7.4699 (2.1); 7.4440 (6.0); 7.4181 (5.1); 7.3933 (5.2); 7.3673 (2.2); 7.3413 (6.7); 7.3343 (6.9); 7.2988 (6.5); 7.1470 (5.9); 7.1404 (4.2); 7.1338 (5.4); 7.1276 (4.2); 7.1198 (7.4); 6.9887 (2.4); 6.9844 (2.7); 6.9811 (2.6); 6.9770 (2.2); 6.9629 (2.2); 6.9585 (2.4); 6.9550 (2.4); 6.9508 (2.1); 6.9423 (4.5); 6.9352 (4.3); 6.9151 (3.4); 6.9080 (3.3); 6.7956 (2.5); 6.7594 (2.8); 6.7371 (3.0); 6.7009 (3.0); 6.2353 (2.9); 6.2284 (2.9); 5.8228 (6.0); 5.7644 (5.3); 5.3864 (5.8); 5.3500 (5.5); 4.1904 (2.3); 4.1802 (2.7); 4.1545 (3.1); 4.1443 (3.4); 4.0496 (0.4); 4.0389 (0.7); 4.0330 (1.0); 4.0225 (1.6); 4.0162 (1.2); 4.0059 (1.6); 3.9934 (1.7); 3.9835 (1.1); 3.9763 (1.1); 3.9665 (0.6); 3.9464 (4.0); 3.9304 (2.4); 3.9105 (2.8); 3.8945 (2.1); 3.1832 (2.0); 3.1661 (2.0); 3.1382 (3.2); 3.1210 (3.0); 2.9885 (3.2); 2.9586 (3.0); 2.9436 (2.2); 2.9134 (2.0); 2.0373 (3.0); 0.0366 (7.8)

I-342: $^1$H-NMR(300.2 MHz, CDCl3):
δ = 7.6222 (1.3); 7.6026 (7.2); 7.5822 (4.1); 7.5102 (1.9); 7.4729 (0.7); 7.4633 (1.1); 7.4558 (0.8); 7.4423 (0.7); 7.4353 (0.4); 7.2989 (14.4); 7.0479 (1.4); 7.0219 (3.9); 6.9452 (1.2); 6.9185 (0.7); 4.9396 (1.1); 4.9305 (1.2); 3.9820 (0.7); 3.9725 (0.9); 3.9475 (1.1); 3.9375 (1.1); 3.8707 (16.0); 3.8532 (1.1); 3.8329 (1.2); 3.8177 (0.5); 3.8102 (0.6); 3.7996 (0.6); 3.7913 (0.5);

TABLE 2-continued 3.7734 (1.6); 3.7575 (0.6); 3.7384 (0.9); 3.7221 (0.6); 2.9365 (0.4); 2.9182 (0.4); 2.8911 (1.1); 2.8720 (1.0); 2.8510 (1.0); 2.8228 (1.0); 2.8059 (0.4); 2.7768 (0.4); 2.3184 (10.4); 2.3083 (10.4); 1.6113 (7.9); 1.2982 (0.8); 1.2923 (0.9); 0.1073 (2.2); 0.0481 (0.6); 0.0375 (15.7); 0.0266 (0.6)

I-343: $^{1}$H-NMR(300.2 MHz, CDCl3):

δ = 7.5808 (1.1); 7.5613 (2.9); 7.5583 (2.6); 7.4230 (1.4); 7.3975 (0.6); 7.3872 (0.8); 7.3798 (0.6); 7.3667 (0.6); 7.3594 (0.4); 7.2990 (3.6); 7.0397 (1.2); 7.0264 (1.7); 7.0148 (1.9); 6.9393 (1.0); 6.9137 (0.6); 4.8214 (1.0); 4.2075 (0.8); 4.1817 (0.9); 3.9625 (0.4); 3.9422 (1.4); 3.9260 (0.4); 3.9142 (1.1); 3.8970 (0.4); 3.0469 (0.4); 3.0300 (0.4); 3.0006 (0.7); 2.9834 (0.6); 2.9027 (0.6); 2.8746 (0.6); 2.8571 (0.4); 2.8279 (0.3); 2.3142 (16.0); 2.0709 (0.4); 2.0617 (0.4); 2.0421 (0.9); 2.0223 (0.5); 2.0132 (0.5); 1.6259 (0.8); 1.2927 (0.4); 1.2821 (0.4); 1.2642 (1.4); 1.2602 (1.4); 1.2529 (1.0); 1.2443 (0.7); 1.2354 (1.0); 1.2313 (1.2); 1.2244 (0.8); 1.2155 (0.4); 1.0466 (0.8); 1.0392 (0.7); 1.0361 (0.8); 1.0317 (0.9); 1.0260 (1.2); 1.0201 (1.2); 1.0057 (0.6); 1.0017 (0.7); 0.1088 (0.5); 0.0379 (3.9)

I-344: $^{1}$H-NMR(300.2 MHz, CDCl3):

δ = 7.9635 (5.2); 7.5882 (0.5); 7.5627 (0.8); 7.5496 (0.5); 7.5399 (0.5); 7.4082 (0.3); 7.3875 (1.0); 7.3856 (1.0); 7.3814 (0.8); 7.3656 (3.1); 7.3588 (0.9); 7.3421 (1.4); 7.3142 (0.4); 7.2986 (2.2); 7.1401 (2.1); 7.1377 (2.1); 7.1032 (2.1); 7.0935 (1.2); 7.0776 (2.4); 6.9109 (2.2); 6.7749 (1.2); 6.7720 (1.2); 6.7493 (1.0); 6.7463 (1.0); 6.7283 (1.1); 6.0664 (1.2); 4.2522 (0.9); 4.2414 (1.0); 4.2161 (1.1); 4.2052 (1.2); 4.0622 (0.4); 4.0524 (0.5); 4.0435 (0.5); 4.0369 (0.5); 4.0315 (0.6); 4.0227 (0.6); 4.0131 (0.4); 3.9230 (1.4); 3.9049 (1.1); 3.8868 (1.2); 3.8687 (0.9); 3.1924 (0.8); 3.1758 (0.8); 3.1476 (1.1); 3.1310 (1.0); 2.9369 (1.1); 2.9060 (1.1); 2.8921 (0.9); 2.8612 (0.8); 2.6743 (16.0); 2.2035 (0.5); 2.1894 (10.8); 2.0383 (0.4); 0.0341 (2.9)

I-345: $^{1}$H-NMR(300.2 MHz, CDCl3):

δ = 10.3610 (4.4); 9.9815 (0.4); 7.9845 (5.2); 7.8765 (0.7); 7.8705 (0.7); 7.8565 (0.7); 7.8504 (1.4); 7.8446 (0.8); 7.8308 (0.8); 7.8247 (0.7); 7.7702 (0.4); 7.5012 (0.6); 7.4953 (0.6); 7.4746 (1.2); 7.4695 (1.1); 7.4504 (1.0); 7.4442 (0.9); 7.3962 (1.2); 7.3699 (1.6); 7.3435 (0.6); 7.2987 (4.6); 7.0310 (1.8); 7.0056 (2.1); 6.8927 (2.0); 6.7094 (1.1); 6.6850 (1.0); 6.0840 (1.3); 4.3229 (0.8); 4.3127 (1.0); 4.2875 (1.0); 4.2775 (1.1); 3.9565 (0.4); 3.9487 (0.4); 3.9388 (0.5); 3.9328 (0.5); 3.9276 (0.5); 3.9227 (0.6); 3.9172 (0.5); 3.9069 (0.5); 3.8988 (0.4); 3.8913 (0.4); 3.8827 (1.8); 3.8622 (0.8); 3.8476 (1.4); 3.8270 (0.9); 3.0569 (0.7); 3.0407 (0.7); 3.0117 (1.0); 2.9951 (1.0); 2.8022 (1.1); 2.7706 (1.0); 2.7570 (0.8); 2.7331 (1.2); 2.7250 (0.8); 2.6806 (16.0); 2.3094 (11.6); 2.2605 (0.9); 2.1483 (10.8); 2.0439 (3.1); 0.0355 (6.4)

I-346: $^{1}$H-NMR(300.2 MHz, CDCl3):

δ = 7.9573 (5.1); 7.3432 (1.2); 7.3170 (2.6); 7.2988 (8.8); 7.2908 (1.7); 7.1491 (2.1); 7.0760 (2.0); 7.0504 (2.3); 7.0118 (1.4); 6.9859 (1.2); 6.8761 (0.9); 6.8731 (1.0); 6.8682 (1.2); 6.8652 (1.1); 6.8493 (0.8); 6.8462 (0.8); 6.8414 (1.1); 6.8383 (1.0); 6.8018 (1.6); 6.7956 (2.1); 6.7887 (1.2); 6.7342 (1.2); 6.7310 (1.2); 6.7086 (1.0); 6.7054 (1.0); 6.3037 (1.1); 4.2237 (0.9); 4.2129 (1.0); 4.1877 (1.1); 4.1768 (1.2); 4.0210 (0.4); 4.0104 (0.5); 4.0025 (0.5); 3.9908 (0.6); 3.9820 (0.6); 3.9728 (0.4); 3.8919 (1.4); 3.8735 (1.0); 3.8559 (1.2); 3.8375 (0.9); 3.1723 (0.8); 3.1556 (0.8); 3.1275 (1.0); 3.1108 (1.0); 2.9090 (1.1); 2.8787 (1.1); 2.8643 (0.8); 2.8338 (0.8); 2.6689 (16.0); 2.2369 (10.5); 2.0835 (0.8); 1.9668 (0.5); 1.9557 (0.6); 1.9389 (1.1); 1.9222 (0.6); 1.9110 (0.6); 1.6146 (3.4); 1.3208 (0.6); 1.3035 (1.6); 1.2972 (1.7); 1.2733 (0.3); 1.0554 (0.6); 1.0409 (1.7); 1.0340 (2.0); 1.0277 (0.9); 1.0195 (0.9); 1.0123 (1.9); 1.0059 (1.7); 0.9918 (0.8); 0.9406 (0.7); 0.9191 (1.8); 0.8959 (0.7); 0.7671 (1.0); 0.7528 (2.0); 0.7499 (1.9); 0.7454 (1.8); 0.7395 (1.2); 0.7361 (2.0); 0.7317 (1.9); 0.7287 (1.7); 0.7150 (0.8); 0.1071 (0.4); 0.0480 (0.4); 0.0371 (12.1); 0.0262 (0.5)

I-347: $^{1}$H-NMR(499.9 MHz, CDCl3):

δ = 8.1955 (0.3); 8.1353 (11.6); 8.1319 (12.5); 8.0891 (1.0); 8.0855 (1.0); 7.8055 (0.4); 7.7711 (0.4); 7.7591 (0.4); 7.7464 (0.5); 7.7271 (0.5); 7.6582 (0.7); 7.5742 (16.0); 7.5017 (10.4); 7.4703 (1.4); 7.4205 (6.6); 7.4089 (5.7); 7.3503 (6.6); 7.3378 (26.2); 7.3229 (14.5); 7.3092 (7.6); 7.2961 (6.7); 7.2925 (6.5); 7.2822 (6.0); 7.2633 (19.1); 7.2596 (19.8); 7.2296 (1.6); 7.1952 (1.0); 7.1842 (1.0); 7.1408 (1.3); 7.1257 (1.1); 7.0886 (0.4); 7.0481 (0.4); 7.0293 (0.4); 7.0052 (0.3); 6.9853 (0.3); 6.9670 (0.4); 6.9329 (0.3); 6.8675 (0.3); 6.8335 (0.3); 6.7718 (0.3); 6.7173 (6.0); 6.6855 (6.6); 6.1720 (3.7); 6.1568 (4.0); 6.1404 (3.6); 6.1252 (3.7); 6.0942 (7.3); 5.9845 (0.5); 4.3792 (4.4); 4.2813 (3.9); 4.2612 (4.4); 4.0964 (0.4); 4.0725 (0.4); 3.8190 (3.9); 3.8058 (4.1); 3.8002 (4.0); 3.7971 (4.0); 3.7844 (3.5); 3.6330 (0.3); 2.7611 (0.4); 2.7453 (0.4); 2.1688 (0.3); 1.9937 (0.3); 1.9805 (0.6); 1.9665 (0.6); 1.9496 (0.3); 1.5768 (2.4); 1.3662 (0.4); 1.3325 (0.4); 1.2552 (1.2); 0.0701 (2.3); 0.0036 (19.3); −0.0002 (21.7)

I-348: $^{1}$H-NMR(300.2 MHz, CDCl3):

δ = 7.9593 (5.2); 7.4751 (0.7); 7.4681 (0.8); 7.4547 (0.8); 7.4506 (0.9); 7.4439 (1.4); 7.4337 (0.8); 7.4233 (0.8); 7.2987 (8.1); 7.2526 (0.4); 7.2456 (0.5); 7.2251 (1.4); 7.2183 (1.2); 7.2060 (4.1); 7.1965 (1.3); 7.1835 (1.8); 7.1546 (0.6); 7.0155 (1.8); 6.9901 (2.1); 6.9038 (2.0); 6.7288 (1.1); 6.7030 (0.9); 6.1207 (1.3); 4.3083 (0.8); 4.2987 (0.9); 4.2728 (1.0); 4.2636 (1.0); 3.9301 (0.4); 3.9229 (0.4); 3.9178 (0.5); 3.9125 (0.6); 3.9068 (0.5); 3.9021 (0.5); 3.8967 (0.6); 3.8809 (0.5); 3.8723 (0.5); 3.8612 (1.8); 3.8405 (0.7); 3.8263 (1.4); 3.8056 (0.9); 3.3798 (4.0); 3.0440 (0.7); 3.0283 (0.7); 2.9991 (1.0); 2.9827 (1.0); 2.7831 (1.1); 2.7517 (1.0); 2.7378 (0.9); 2.7315 (0.7); 2.7062 (0.8); 2.6689 (16.0); 2.3057 (11.4); 2.2881 (1.1); 2.1877 (10.7); 2.1559 (0.5); 2.0452 (2.4); 0.0480 (0.4); 0.0372 (11.0); 0.0264 (0.5)

The compounds as shown in table 3, 5, 7, 9, 11, 13, 15, 17, 19, 21, 23, 25, 27, 29, 31, 33, 35, 37, 39, 41 and 43 below were prepared in analogy with the examples provided above or following methods described herein. $^{1}$H-NMR data of these compounds is respectively shown in tables 4, 6, 8, 10, 12, 14, 16, 18, 20, 22, 24, 26, 28, 30, 32, 34, 36, 38 40, 42 and 44.

TABLE 3

Compounds according to formula (1)

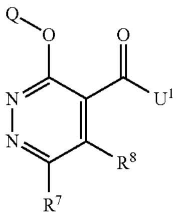

(1)

| Ex N° | $R^7$ | $R^8$ | Q | $U^1$ | LogP |
|---|---|---|---|---|---|
| 1-01 | Cl | H | 3-(difluoromethyl)phenyl | hydroxy | 1.45[a] |
| 1-02 | Cl | methyl | 3-cyclopropyl-2-fluorophenyl | hydroxy | 1.84[a] |
| 1-03 | methyl | H | 3-(trifluoromethyl)phenyl | methoxy(methyl)amino | 2.33[a] |
| 1-04 | Cl | methyl | 3-(trifluoromethyl)phenyl | hydroxy | 1.70[a] |
| 1-05 | Cl | cyclopropylamino | 3-(trifluoromethyl)phenyl | hydroxy | 2.20[a] |
| 1-06 | Cl | H | 3-cyclopropylphenyl | hydroxy | 1.87[a] |
| 1-07 | Cl | H | 3-(trifluoromethyl)phenyl | methoxy(methyl)amino | 2.90[a] |
| 1-08 | Cl | H | 3-(difluoromethyl)-2-fluorophenyl | isopropyloxy | 3.68[a] |
| 1-09 | Cl | cyclopropylamino | 3-(trifluoromethyl)phenyl | methoxy | 3.35[a] |
| 1-10 | Cl | H | 3-cyclopropyl-2-fluorophenyl | hydroxy | 2.01[a] |
| 1-11 | ethyl | H | 3-(trifluoromethyl)phenyl | hydroxy | 1.82[a] |
| 1-12 | ethyl | H | 3-(trifluoromethyl)phenyl | isopropyloxy | 3.96[a] |
| 1-13 | acetyl | H | 3-(trifluoromethyl)phenyl | hydroxy | 2.01[a] |
| 1-14 | methyl | H | 3-(trifluoromethyl)phenyl | methoxy | 2.77[a] |
| 1-15 | vinyl | H | 3-(trifluoromethyl)phenyl | isopropyloxy | 4.01[a] |
| 1-16 | methyl | H | 3-cyclopropylphenyl | hydroxy | 1.46[a] |
| 1-17 | methyl | H | 2-fluoro-3-(trifluoromethyl)phenyl | methoxy | 2.90[a] |
| 1-18 | Cl | H | 2-fluoro-3-(trifluoromethyl)phenyl | hydroxy | 1.98[a] |
| 1-19 | Cl | H | 2-fluoro-3-(trifluoromethyl)phenyl | methoxy | 3.35[a] |
| 1-20 | Cl | I | 3-(trifluoromethyl)phenyl | methoxy | 3.25[a] |
| 1-21 | Cl | H | 3-cyclopropyl-2-fluorophenyl | isopropyloxy | 4.30[a] |
| 1-22 | Cl | H | 3-cyclopropylphenyl | isopropyloxy | 4.15[a] |
| 1-23 | Cl | H | 3-(difluoromethyl)-2-fluorophenyl | hydroxy | 1.63[a] |
| 1-24 | Cl | methyl | 3-cyclopropyl-2-fluorophenyl | isopropyloxy | 4.51[a] |
| 1-25 | I | H | 3-(trifluoromethyl)phenyl | isopropyloxy | 4.25[a] |
| 1-26 | methyl | H | 2-fluoro-3-(trifluoromethyl)phenyl | hydroxy | 1.75[a] |
| 1-27 | methyl | methyl | 3-(trifluoromethyl)phenyl | hydroxy | 1.52[a] |
| 1-28 | 1-ethoxyethen-1-yl | H | 3-(trifluoromethyl)phenyl | isopropyloxy | 4.90[a] |
| 1-29 | acetyl | H | 3-(trifluoromethyl)phenyl | isopropyloxy | 3.99[a] |
| 1-30 | methyl | H | 3-cyclopropyl-2-fluorophenyl | hydroxy | 1.70[a] |
| 1-31 | methyl | methyl | 3-(trifluoromethyl)phenyl | methoxy | 2.98[a] |
| 1-32 | Cl | H | 3-(trifluoromethyl)phenyl | isopropyloxy | 4.06[a] |
| 1-33 | Cl | methyl | 3-(trifluoromethyl)phenyl | methoxy | 3.55[a] |
| 1-34 | Cl | H | 6-chloro-5-(trifluoromethyl)pyridin-3-yl | hydroxy | 1.14[a] |
| 1-35 | Cl | H | 6-chloro-5-(trifluoromethyl)pyridin-3-yl | ethoxy | 3.74[a] |
| 1-36 | Cl | H | 5-bromopyridin-3-yl | hydroxy | 0.94[a]; 0.53[a] |
| 1-37 | Cl | H | 3-(1-fluorocyclopropyl)phenyl | hydroxy | 1.82[a] |
| 1-38 | Cl | H | 3-(1-fluorocyclopropyl)phenyl | isopropyloxy | 3.99[a] |
| 1-39 | Cl | H | 2-fluoro-3-[rac-2,2-difluorocyclopropyl]phenyl | hydroxy | 1.95[a] |
| 1-40 | Cl | H | 2-fluoro-3-[rac-2,2-difluorocyclopropyl]phenyl | isopropyloxy | 3.96[a] |
| 1-41 | Cl | methyl | 2-fluoro-3-[rac-2,2-difluorocyclopropyl]phenyl | hydroxy | 1.82[a] |
| 1-42 | Cl | methyl | 2-fluoro-3-[rac-2,2-difluorocyclopropyl]phenyl | isopropyloxy | 4.23[a] |
| 1-43 | Cl | H | 2-fluoro-3-(1-fluorocyclopropyl)phenyl | hydroxy | 1.99[a] |

TABLE 3-continued

Compounds according to formula (1)

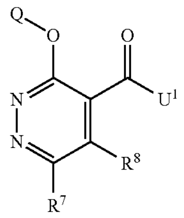

(1)

| Ex N° | $R^7$ | $R^8$ | Q | $U^1$ | LogP |
|---|---|---|---|---|---|
| 1-44 | Cl | H | 2-fluoro-3-(1-fluorocyclopropyl)phenyl | isopropyloxy | 4.62[a] |
| 1-45 | Cl | methyl | 2-fluoro-3-(1-fluorocyclopropyl)phenyl | isopropyloxy | 4.33[a] |
| 1-46 | methyl | H | 3-(difluoromethyl)-2-fluorophenyl | hydroxy | 1.43[a] |

TABLE 4

1-01: $^1$H-NMR(400.1 MHz, $d_6$-DMSO):
δ = 8.2400 (16.0); 7.6498 (2.3); 7.6302 (5.4); 7.6106 (3.8); 7.5151 (4.9); 7.4824 (7.4); 7.4627 (4.5); 7.4423 (3.4); 7.2113 (3.0); 7.0721 (6.5); 6.9329 (3.2); 2.5098 (2.1)
1-02: $^1$H-NMR(499.9 MHz, $d_6$-DMSO):
δ =7.2008 (0.5); 7.1974 (0.6); 7.1845 (1.3); 7.1815 (1.2); 7.1714 (1.3); 7.1667 (1.4); 7.1639 (2.1); 7.1483 (1.9); 7.1323 (0.7); 6.9341 (0.8); 6.9309 (0.8); 6.9188 (1.1); 6.9163 (1.2); 6.9061 (0.6); 6.9020 (0.5); 2.5135 (0.4); 2.5099 (0.5); 2.5063 (0.4); 2.3968 (16.0); 2.3846 (0.4); 2.0707 (0.6); 2.0641 (0.6); 2.0539 (1.1); 2.0436 (0.7); 2.0371 (0.6); 1.0253 (0.9); 1.0166 (2.2); 1.0122 (2.3); 1.0086 (1.3); 1.0039 (1.3); 0.9997 (2.2); 0.9953 (2.2); 0.9871 (0.9); 0.7823 (1.0); 0.7739 (2.4); 0.7720 (2.1); 0.7698 (2.5); 0.7637 (2.4); 0.7596 (2.5); 0.7507 (0.8)
1-03: $^1$H-NMR(300.2 MHz, CDCl3):
δ = 7.5607 (0.9); 7.5349 (2.7); 7.5100 (2.2); 7.4700 (0.9); 7.4634 (1.4); 7.4561 (0.7); 7.4478 (0.5); 7.4453 (0.5); 7.4390 (0.7); 7.4323 (0.5); 7.4022 (1.8); 7.2986 (8.6); 5.3359 (5.0); 3.7789 (0.8); 3.6362 (3.8); 3.4357 (4.8); 3.2797 (1.0); 2.7276 (16.0); 1.6155 (15.9); 1.2931 (0.5); 0.9180 (0.4); 0.1060 (4.2); 0.0360 (5.0)
1-04: $^1$H-NMR(300.2 MHz, $d_6$-DMSO):
δ = 7.7747 (2.4); 7.7475 (8.1); 7.7204 (13.3); 7.7120 (13.1); 7.6924 (16.0); 7.6526 (0.5); 7.6169 (7.8); 7.5910 (5.1); 3.6770 (0.3); 3.6257 (0.3); 3.6165 (0.3); 3.5687 (0.4); 3.5321 (0.4); 3.4984 (0.4); 3.4631 (0.4); 3.4373 (0.4); 3.4027 (0.4); 3.3673 (0.4); 3.2814 (0.3); 3.2318 (0.3); 2.6507 (0.6); 2.5397 (13.4); 2.5340 (16.5); 2.4347 (75.8); 2.2151 (0.4); 2.1066 (1.0); 1.3861 (0.4); 1.2634 (1.1); 1.2122 (0.8); 0.0288 (8.6)
1-05: $^1$H-NMR(300.2 MHz, CDCl3):
δ = 7.6445 (0.5); 7.5698 (2.7); 7.5445 (7.8); 7.5195 (16.0); 7.5093 (9.8); 7.4764 (11.2); 7.4396 (5.2); 7.4332 (8.1); 7.4263 (4.2); 7.4086 (5.5); 7.3826 (0.6); 7.3637 (0.7); 7.3254 (0.6); 7.3137 (0.6); 7.2986 (53.8); 7.2646 (0.4); 6.2623 (0.4); 6.1844 (3.5); 6.0638 (0.7); 6.0086 (0.3); 4.1995 (0.8); 4.1756 (2.3); 4.1519 (2.3); 4.1283 (0.8); 3.9955 (1.5); 3.7885 (5.4); 2.9593 (1.0); 2.9468 (2.0); 2.9363 (3.0); 2.9243 (4.0); 2.9173 (4.2); 2.9054 (2.9); 2.8954 (2.1); 2.8833 (1.1); 2.1754 (0.6); 2.0898 (11.2); 1.3210 (2.9); 1.2972 (5.9); 1.2734 (2.9); 1.2573 (0.8); 1.0060 (0.5); 0.9871 (0.6); 0.9703 (0.5); 0.9336 (2.4); 0.9096 (10.1); 0.8908 (10.0); 0.8686 (4.7); 0.8384 (1.8); 0.8233 (1.3); 0.8183 (1.3); 0.7839 (4.0); 0.7680 (10.0); 0.7601 (11.9); 0.7312 (2.6); 0.0482 (1.6); 0.0450 (0.8); 0.0374 (52.7); 0.0282 (1.7); 0.0265 (2.1)
1-06: $^1$H-NMR(300.2 MHz, $d_6$-DMSO):
δ = 8.2130 (16.0); 7.3593 (2.5); 7.3332 (5.6); 7.3070 (3.4); 7.0221 (3.3); 7.0179 (3.1); 7.0083 (2.7); 7.0051 (2.6); 7.0002 (5.0); 6.9971 (5.0); 6.9819 (1.8); 6.9786 (1.8); 6.9739 (3.5); 6.9708 (2.8); 6.9607 (4.6); 6.9548 (5.0); 6.9484 (2.6); 5.7756 (1.8); 2.5344 (1.4); 2.5284 (3.0); 2.5223 (4.1); 2.5162 (3.0); 2.5103 (1.4); 2.0139 (0.6); 2.0090 (0.4); 1.9970 (1.2); 1.9859 (1.4); 1.9807 (1.0); 1.9693 (2.6); 1.9578 (1.0); 1.9524 (1.5); 1.9414 (1.4); 1.9245 (0.7); 1.0128 (1.6); 0.9983 (4.4); 0.9908 (4.9); 0.9852 (2.4); 0.9772 (2.6); 0.9702 (4.7); 0.9628 (4.5); 0.9494 (2.0); 0.7347 (2.0); 0.7209 (5.0); 0.7178 (4.2); 0.7139 (5.2); 0.7044 (4.8); 0.6974 (5.3); 0.6822 (1.6); 0.0194 (4.1)
1-07: $^1$H-NMR(499.9 MHz, CDCl3):
δ = 7.5660 (0.9); 7.5561 (3.4); 7.5510 (2.4); 7.5352 (2.5); 7.5283 (2.4); 7.5127 (0.7); 7.4844 (2.5); 7.4365 (1.2); 7.4331 (1.7); 7.4293 (1.1); 7.4207 (0.9); 7.4177 (1.2); 7.4143 (0.8); 7.3066 (0.4); 4.0134 (0.5); 4.0012 (1.2); 3.9889 (1.6); 3.9767 (1.2); 3.9644 (0.5); 3.6270 (7.7); 3.3918 (8.4); 1.9661 (0.7); 1.1838 (15.7); 1.1790 (0.7); 1.1715 (16.0); −0.0002 (0.4)
1-08: $^1$H-NMR(300.2 MHz, CDCl3):
δ = 7.9376 (5.4); 7.6355 (0.5); 7.5766 (0.4); 7.5552 (0.8); 7.5345 (0.5); 7.5325 (0.5); 7.5089 (0.4); 7.5061 (0.4); 7.4818 (0.9); 7.4792 (0.8); 7.4575 (0.6); 7.4549 (0.6); 7.3709 (0.8); 7.3437 (1.2); 7.3177 (0.4); 7.2984 (2.8); 7.1103 (0.9); 6.9278 (1.8); 6.7452 (0.9); 5.4078 (0.4); 5.3870 (1.0); 5.3661 (1.3); 5.3452 (1.0); 5.3244 (0.4); 1.6170 (0.8); 1.4798 (1.5); 1.4609 (16.0); 1.4400 (15.1); 1.4256 (0.5); 1.4046 (0.4); 1.2465 (0.4); 0.0361 (2.9)
1-09: $^1$H-NMR(300.2 MHz, CDCl3):
δ = 7.5541 (0.4); 7.5433 (0.9); 7.5165 (2.2); 7.5102 (1.3); 7.4902 (1.5); 7.4883 (1.4); 7.4831 (1.6); 7.4402 (0.7); 7.4327 (1.2); 7.4255 (0.6); 7.4169 (0.4); 7.4144 (0.4); 7.4090 (0.6); 7.4018 (0.3); 7.2985 (2.8); 5.6931 (0.8); 4.0184 (1.9); 4.0071 (0.4); 3.9923 (16.0); 2.7929 (0.4); 2.7891 (0.4); 2.7825 (0.4); 2.7771 (0.6); 2.7705 (0.7); 2.7651 (0.5); 2.7585 (0.4); 2.7550 (0.4); 2.7483 (0.4); 2.0802 (0.7); 1.6331 (0.7); 1.2941 (0.4); 0.8795 (1.4); 0.8742 (0.9); 0.8618 (1.4); 0.8570 (1.2); 0.8517 (0.9); 0.8395 (0.7); 0.8107 (0.4); 0.7720 (0.7); 0.7589 (1.5); 0.7490 (1.5); 0.7455 (1.5); 0.7325 (0.8); 0.7197 (0.3); 0.0350 (2.4)
1-10: $^1$H-NMR(499.9 MHz, $d_6$-DMSO):
δ = 8.2502 (16.0); 8.0080 (1.2); 7.2221 (0.5); 7.2063 (1.3); 7.2027 (1.4); 7.1899 (3.5); 7.1868 (3.2); 7.1767 (7.8); 7.1620 (5.1); 7.1458 (1.7); 6.9476 (2.0); 6.9442 (2.1); 6.9334 (2.8); 6.9290 (3.0); 6.9209 (1.5); 6.9154 (1.3); 2.5087 (2.8); 2.5051 (3.7); 2.5016 (2.6); 2.0890 (0.9); 2.0788 (1.6); 2.0720 (1.8); 2.0620 (2.9); 2.0519 (1.7); 2.0452 (1.5); 2.0348 (0.7); 1.9900 (0.6); 1.1759 (0.4); 1.0341 (2.4); 1.0255 (5.8); 1.0211 (5.8); 1.0175 (3.2); 1.0127 (3.3); 1.0086 (5.4); 1.0042 (5.4); 0.9960 (2.0); 0.8237 (0.4); 0.8130 (0.5); 0.7937 (2.7); 0.7854 (6.6); 0.7813 (6.5); 0.7753 (6.2); 0.7712 (6.0); 0.7622 (1.8)

TABLE 4-continued 1-11: $^{1}$H-NMR(300.2 MHz, $d_6$-DMSO):
δ = 8.0139 (9.2); 7.7429 (0.8); 7.7169 (2.4); 7.6915 (2.4); 7.6678 (3.0); 7.6430 (4.7); 7.5644 (2.0); 7.5380 (1.5); 3.0021 (1.8); 2.9768 (5.6); 2.9515 (5.7); 2.9263 (1.9); 2.5341 (2.3); 2.5281 (4.7); 2.5221 (6.5); 2.5161 (4.7); 2.5102 (2.2); 2.0085 (0.5); 1.9290 (0.4); 1.3136 (7.2); 1.2884 (16.0); 1.2631 (6.9); 0.0182 (7.1); −0.0419 (1.3)
1-12: $^{1}$H-NMR(300.2 MHz, CDCl3):
δ = 7.7672 (4.6); 7.5697 (1.0); 7.5431 (1.7); 7.5290 (2.2); 7.5215 (1.8); 7.4764 (0.8); 7.4707 (1.1); 7.4641 (0.7); 7.4453 (0.7); 7.2990 (5.2); 5.3887 (0.4); 5.3679 (1.0); 5.3470 (1.3); 5.3261 (1.0); 5.3053 (0.4); 3.1003 (1.0); 3.0749 (3.3); 3.0496 (3.4); 3.0243 (1.2); 1.6181 (9.2); 1.4489 (4.2); 1.4341 (16.0); 1.4236 (8.8); 1.4132 (15.9); 1.3982 (3.9); 0.1066 (1.2); 0.0359 (4.9)
1-13: $^{1}$H-NMR(300.2 MHz, CDCl3):
δ = 8.9312 (0.5); 8.7218 (5.7); 7.6865 (0.4); 7.6605 (1.5); 7.6368 (4.5); 7.6136 (0.6); 7.5818 (2.3); 7.5362 (1.0); 7.5285 (1.6); 7.5213 (0.9); 7.5058 (1.0); 7.2986 (8.3); 7.1162 (0.3); 4.1844 (0.7); 4.1606 (0.8); 3.8821 (0.4); 2.8702 (16.0); 2.6686 (1.2); 2.1970 (2.5); 2.1014 (3.4); 1.9497 (0.5); 1.6815 (0.4); 1.4679 (0.4); 1.4314 (0.3); 1.4067 (0.5); 1.3816 (0.5); 1.3593 (0.8); 1.3319 (0.6); 1.3261 (1.1); 1.3023 (2.0); 1.2902 (0.4); 1.2784 (1.0); 0.9825 (1.0); 0.9582 (1.8); 0.9340 (0.8); 0.1065 (0.7); 0.0352 (8.0); 0.0243 (0.4)
1-14: $^{1}$H-NMR(400.1 MHz, $d_6$-DMSO):
δ = 8.0394 (5.5); 7.7256 (0.6); 7.7063 (1.9); 7.6866 (1.6); 7.6542 (2.3); 7.6331 (3.8); 7.5609 (1.6); 7.5403 (1.4); 3.9145 (16.0); 3.3269 (11.0); 2.6442 (15.2); 2.5097 (1.8)
1-15: $^{1}$H-NMR(300.2 MHz, CDCl3):
δ = 8.0165 (5.2); 7.5853 (1.0); 7.5593 (2.0); 7.5527 (1.6); 7.5470 (1.9); 7.5370 (1.8); 7.4918 (0.7); 7.4850 (1.1); 7.4782 (0.6); 7.4654 (0.4); 7.4598 (0.6); 7.2985 (4.6); 7.1094 (1.0); 7.0725 (1.2); 7.0501 (1.2); 7.0133 (1.2); 6.2880 (2.3); 6.2288 (2.0); 5.7406 (2.3); 5.7037 (2.1); 5.4053 (0.4); 5.3845 (1.0); 5.3636 (1.4); 5.3427 (1.0); 5.3219 (0.4); 1.6133 (1.8); 1.4481 (16.0); 1.4272 (15.8); 0.0363 (4.3)
1-16: $^{1}$H-NMR(400.1 MHz, $d_6$-DMSO):
δ = 7.8912 (5.7); 7.3097 (1.3); 7.2902 (2.8); 7.2706 (1.7); 6.9569 (2.0); 6.9376 (1.9); 6.9046 (1.9); 6.8752 (3.4); 2.6079 (16.0); 2.5101 (2.7); 1.9793 (0.3); 1.9665 (0.7); 1.9580 (0.9); 1.9458 (1.4); 1.9335 (1.0); 1.9250 (0.9); 1.9123 (0.4); 0.9823 (0.8); 0.9712 (2.4); 0.9660 (2.8); 0.9504 (2.7); 0.9453 (2.8); 0.9351 (1.2); 0.7049 (1.0); 0.6935 (3.0); 0.6899 (3.2); 0.6818 (3.0); 0.6774 (3.3); 0.6659 (1.0)
1-17: $^{1}$H-NMR(300.2 MHz, CDCl3):
δ = 7.8520 (4.3); 7.5819 (0.6); 7.5583 (1.4); 7.5372 (1.4); 7.5170 (0.7); 7.3531 (0.7); 7.3263 (1.1); 7.2986 (2.2); 4.0423 (16.0); 2.7528 (14.2); 1.2898 (0.5); 0.0335 (1.6)
1-18: $^{1}$H-NMR(300.2 MHz, $d_6$-DMSO):
δ = 8.2409 (16.0); 8.1115 (0.6); 7.9405 (1.1); 7.8747 (1.8); 7.8503 (3.7); 7.8227 (2.3); 7.8127 (2.0); 7.7868 (3.6); 7.7656 (2.3); 7.5853 (2.5); 7.5587 (4.1); 7.5321 (1.8); 4.1145 (0.5); 4.0839 (0.4); 4.0726 (1.0); 4.0489 (1.0); 3.5064 (0.4); 3.3515 (0.6); 3.3099 (0.5); 3.0723 (1.7); 3.0521 (0.7); 3.0411 (0.5); 3.0096 (0.3); 2.9228 (1.8); 2.8928 (0.7); 2.8579 (0.4); 2.7637 (1.5); 2.5463 (9.6); 2.5404 (20.1); 2.5343 (27.5); 2.5283 (19.6); 2.5224 (9.0); 2.0211 (3.9); 1.3872 (0.8); 1.2914 (0.5); 1.2660 (1.1); 1.2300 (1.3); 1.2062 (2.6); 1.2012 (1.1); 1.1825 (1.2); 0.1641 (0.4); 0.1162 (0.4); 0.0419 (0.5); 0.0310 (14.4); 0.0201 (0.6)
1-19: $^{1}$H-NMR(499.9 MHz, CDCl3):
δ = 7.9753 (5.2); 7.6683 (0.6); 7.5512 (0.8); 7.5390 (1.8); 7.5259 (2.2); 7.5122 (1.1); 7.3323 (1.0); 7.3162 (1.8); 7.3001 (0.8); 7.2636 (1.5); 7.0994 (0.4); 4.0289 (16.0); 3.1503 (0.4); 2.9572 (1.4); 2.9112 (0.4); 2.8836 (1.2); −0.0002 (1.2)
1-20: $^{1}$H-NMR(499.9 MHz, CDCl3):
δ = 7.5717 (0.3); 7.5706 (0.3); 7.5562 (1.2); 7.5436 (3.3); 7.4786 (1.5); 7.4294 (0.6); 7.4239 (1.1); 7.4197 (0.8); 7.4157 (0.5); 7.4107 (0.7); 7.4065 (0.4); 7.2606 (2.2); 4.1428 (0.3); 4.0748 (1.1); 4.0582 (16.0); 3.9978 (0.3); 1.5556 (2.7); −0.0002 (2.2)
1-21: $^{1}$H-NMR(300.2 MHz, CDCl3):
δ = 7.8995 (5.5); 7.5887 (0.6); 7.2987 (3.4); 7.1384 (0.3); 7.1201 (1.3); 7.1163 (1.4); 7.1109 (2.2); 7.0931 (3.4); 7.0661 (0.3); 6.8539 (0.6); 6.8451 (0.7); 6.8314 (1.0); 6.8215 (0.8); 6.8166 (1.1); 6.8003 (0.4); 5.4035 (0.4); 5.3827 (1.0); 5.3618 (1.4); 5.3409 (1.0); 5.3201 (0.4); 2.1478 (0.4); 2.1369 (0.5); 2.1304 (0.4); 2.1196 (0.9); 2.1087 (0.4); 2.1021 (0.6); 2.0914 (0.5); 1.6022 (2.8); 1.4751 (1.8); 1.4579 (16.0); 1.4371 (15.5); 1.0643 (0.7); 1.0492 (1.6); 1.0423 (1.7); 1.0362 (0.9); 1.0329 (0.7); 1.0275 (1.2); 1.0206 (1.8); 1.0138 (1.6); 0.9993 (0.9); 0.8139 (0.8); 0.7990 (1.9); 0.7929 (1.8); 0.7818 (1.8); 0.7764 (1.9); 0.7645 (0.6); 0.7597 (0.9); 0.7476 (0.4); 0.7418 (0.4); 0.0381 (3.4)
1-22: $^{1}$H-NMR(300.2 MHz, CDCl3):
δ = 7.8527 (4.8); 7.8448 (0.7); 7.4713 (1.5); 7.3465 (0.9); 7.3329 (0.6); 7.3203 (1.7); 7.3065 (0.4); 7.2983 (1.8); 7.2940 (1.3); 7.0217 (1.2); 7.0137 (1.9); 7.0082 (1.4); 6.9977 (1.0); 6.9945 (1.0); 6.9866 (1.6); 6.9832 (1.3); 6.9467 (1.3); 6.9404 (1.7); 6.9331 (1.1); 6.9253 (0.5); 5.3803 (0.4); 5.3706 (0.3); 5.3595 (1.0); 5.3497 (0.4); 5.3387 (1.3); 5.3309 (0.7); 5.3178 (1.0); 5.2970 (0.4); 1.9690 (0.5); 1.9576 (0.5); 1.9410 (0.9); 1.9242 (0.5); 1.9131 (0.5); 1.6409 (2.4); 1.4629 (2.6); 1.4591 (4.6); 1.4361 (16.0); 1.4151 (14.5); 1.4033 (0.6); 1.3822 (0.4); 1.0347 (0.9); 1.0296 (0.6); 1.0194 (1.5); 1.0125 (1.7); 1.0096 (1.3); 0.9978 (1.0); 0.9910 (1.6); 0.9847 (1.4); 0.9697 (0.8); 0.7664 (0.9); 0.7513 (2.3); 0.7453 (2.0); 0.7348 (1.8); 0.7290 (2.4); 0.7126 (0.7); 0.0368 (1.6)
1-23: $^{1}$H-NMR(300.2 MHz, $d_6$-DMSO):
δ = 8.3083 (0.5); 8.3008 (16.0); 8.2931 (0.5); 8.0538 (0.7); 7.7123 (1.1); 7.6854 (2.4); 7.6603 (1.4); 7.6429 (1.1); 7.6185 (2.3); 7.5975 (1.6); 7.4964 (2.2); 7.4816 (2.6); 7.4699 (3.2); 7.4433 (1.2); 7.3016 (5.2); 7.1217 (2.6); 4.1088 (2.0); 2.5343 (1.6); 2.5284 (3.4); 2.5223 (4.6); 2.5162 (3.4); 2.5104 (1.6); 2.0075 (1.0); 1.1924 (0.6); 0.0159 (4.0)
1-24: $^{1}$H-NMR(300.2 MHz, CDCl3):
δ = 7.2986 (6.2); 7.1237 (0.4); 7.1045 (1.4); 7.0965 (2.2); 7.0911 (2.7); 7.0769 (1.8); 7.0728 (2.5); 7.0454 (0.5); 6.8423 (0.3); 6.8363 (0.7); 6.8284 (0.8); 6.8208 (0.5); 6.8141 (1.1); 6.8033 (0.8); 6.7976 (0.8); 6.7828 (0.5); 5.8161 (0.4); 5.4585 (0.4); 5.4377 (1.0); 5.4168 (1.4); 5.3959 (1.1); 5.3751 (0.4); 2.6527 (8.2); 2.4601 (15.6); 2.4508 (2.3); 2.1444 (0.5); 2.1331 (0.6); 2.1162 (1.0); 2.0996 (0.7); 2.0878 (0.6); 2.0711 (0.3); 1.6184 (0.6); 1.4808 (1.7); 1.4701 (0.6); 1.4552 (16.0); 1.4343 (15.6); 1.4130 (0.5); 1.3921 (0.4); 1.2935 (0.4); 1.0594 (0.8); 1.0441 (1.9); 1.0373 (2.0); 1.0312 (1.4); 1.0226 (1.5); 1.0155 (2.0); 1.0091 (1.8); 0.9945 (1.1); 0.8051 (1.0); 0.7901 (2.2); 0.7840 (2.1); 0.7732 (2.0); 0.7670 (2.3); 0.7574 (0.7); 0.7509 (0.8); 0.7410 (0.5); 0.1079 (1.1); 0.0374 (5.2)
1-25: $^{1}$H-NMR(499.9 MHz, CDCl3):
δ = 8.1443 (5.2); 7.5649 (0.5); 7.5494 (1.7); 7.5338 (2.0); 7.5254 (2.4); 7.5099 (0.9); 7.4936 (2.5); 7.4298 (1.5); 7.4146 (1.2); 7.2672 (0.5); 5.3302 (0.5); 5.3177 (1.2); 5.3052 (1.6); 5.2927 (1.2); 5.2802 (0.5); 1.6345 (0.4); 1.4002 (15.4); 1.3876 (16.0); −0.0002 (0.5)
1-26: $^{1}$H-NMR(499.9 MHz, $d_6$-DMSO):
δ = 8.0179 (6.6); 7.7953 (0.7); 7.7804 (1.4); 7.7656 (0.8); 7.7208 (0.7); 7.7069 (1.2); 7.6936 (0.8); 7.5189 (1.0); 7.5027 (1.6); 7.4865 (0.7); 2.6214 (16.0); 2.5058 (0.4); 1.3515 (0.9)
1-27: $^{1}$H-NMR(400.2 MHz, $d_6$-DMSO):
δ = 7.7089 (0.7); 7.6892 (2.0); 7.6694 (1.7); 7.6395 (2.0); 7.6200 (1.1); 7.5614 (2.6); 7.5153 (1.4); 7.4954 (1.1); 2.5592 (16.4); 2.5156 (2.0); 2.5112 (4.2); 2.5069 (5.7); 2.5024 (4.1); 2.4983 (2.0); 2.3154 (0.5); 2.3022 (16.0); 0.0008 (4.3)

TABLE 4-continued 1-28: $^1$H-NMR(300.2 MHz, CDCl3):
δ = 8.2043 (5.1); 7.5859 (1.0); 7.5595 (2.0); 7.5517 (1.6); 7.5471 (1.5); 7.5332 (2.0); 7.4915 (0.8); 7.4854 (1.1); 7.4788 (0.6); 7.4604 (0.6); 7.2986 (5.3); 5.6409 (2.3); 5.6325 (2.4); 5.4040 (0.4); 5.3831 (1.0); 5.3623 (1.4); 5.3414 (1.0); 5.3205 (0.4); 4.5051 (2.0); 4.4967 (2.0); 4.0863 (0.9); 4.0630 (3.0); 4.0397 (3.1); 4.0164 (1.0); 1.5943 (5.2); 1.5232 (3.4); 1.5000 (7.1); 1.4767 (3.4); 1.4479 (16.0); 1.4270 (15.8); 1.4090 (0.3); 1.3594 (0.3); 0.9838 (0.4); 0.9596 (0.8); 0.9353 (0.3); 0.1073 (0.3); 0.0366 (5.2)
1-29: $^1$H-NMR(300.2 MHz, CDCl3):
δ = 8.5419 (5.5); 7.6428 (1.0); 7.6180 (2.9); 7.6128 (1.5); 7.5942 (0.4); 7.5693 (1.4); 7.5279 (0.7); 7.5201 (1.2); 7.5129 (0.6); 7.5057 (0.4); 7.5029 (0.4); 7.4971 (0.6); 7.4897 (0.4); 7.2985 (4.3); 5.4235 (0.4); 5.4026 (1.0); 5.3817 (1.4); 5.3609 (1.0); 5.3400 (0.4); 2.8544 (16.0); 1.6014 (4.4); 1.4677 (15.6); 1.4468 (15.8); 1.4331 (0.4); 1.4255 (0.6); 1.4068 (0.3); 1.3583 (0.5); 1.3309 (0.4); 0.9821 (0.6); 0.9579 (1.2); 0.9336 (0.5); 0.1058 (0.5); 0.0345 (4.0)
1-30: $^1$H-NMR(499.9 MHz, $d_6$-DMSO):
δ = 7.9572 (6.3); 7.1617 (0.3); 7.1570 (0.4); 7.1478 (3.0); 7.1410 (1.9); 7.1387 (1.9); 7.1330 (2.8); 6.9088 (0.7); 6.9020 (0.7); 6.8961 (1.2); 6.8896 (1.1); 6.8827 (0.6); 6.8765 (0.5); 2.7404 (0.9); 2.6089 (16.0); 2.5168 (0.3); 2.5134 (0.6); 2.5098 (0.8); 2.5062 (0.6); 2.0661 (0.6); 2.0596 (0.7); 2.0494 (1.2); 2.0424 (0.5); 2.0391 (0.7); 2.0326 (0.6); 1.0221 (0.9); 1.0134 (2.3); 1.0091 (2.4); 1.0053 (1.3); 1.0007 (1.4); 0.9965 (2.2); 0.9922 (2.3); 0.9840 (0.9); 0.7812 (1.0); 0.7729 (2.5); 0.7706 (2.3); 0.7689 (2.6); 0.7627 (2.5); 0.7587 (2.5); 0.7498 (0.8)
1-31: $^1$H-NMR(400.1 MHz, CDCl3):
δ = 7.5310 (0.4); 7.5109 (1.2); 7.4911 (1.8); 7.4829 (1.9); 7.4692 (2.3); 7.4189 (1.2); 7.3997 (0.7); 7.2594 (7.0); 3.9970 (16.0); 2.6349 (13.6); 2.3177 (13.5); 1.5482 (6.2); −0.0002 (6.0)
1-32: $^1$H-NMR(300.2 MHz, CDCl3):
δ = 7.9240 (16.0); 7.6334 (0.9); 7.6078 (3.4); 7.5830 (11.0); 7.5582 (1.3); 7.5351 (5.3); 7.5109 (0.6); 7.4887 (2.3); 7.4814 (3.8); 7.4742 (2.2); 7.4641 (1.5); 7.4581 (2.4); 7.3042 (16.9); 5.4053 (1.2); 5.3845 (3.1); 5.3636 (4.1); 5.3428 (3.1); 5.3220 (1.3); 3.2115 (0.5); 3.0865 (0.6); 1.6662 (0.7); 1.6272 (3.0); 1.4829 (4.0); 1.4561 (47.2); 1.4352 (46.6); 1.4148 (1.2); 1.4098 (1.0); 1.3939 (1.0); 1.3890 (0.9); 1.2961 (1.1); 1.2429 (0.4); 1.2215 (0.3); 0.1139 (0.4); 0.0523 (0.6); 0.0415 (15.6); 0.0307 (0.6)
1-33: $^1$H-NMR(499.9 MHz, CDCl3):
δ = 7.5580 (0.4); 7.5425 (1.5); 7.5268 (3.1); 7.5088 (0.6); 7.4751 (2.1); 7.4226 (1.3); 7.4079 (1.0); 7.2602 (3.1); 4.0240 (16.0); 2.4323 (15.4); 1.5511 (4.0); −0.0002 (3.2)
1-34: $^1$H-NMR(300.2 MHz, CDCl3):
δ = 8.6515 (4.6); 8.6433 (4.4); 8.1431 (16.0); 8.0830 (0.7); 8.0735 (0.9); 8.0629 (5.2); 8.0538 (5.0); 8.0328 (1.6); 7.8430 (1.9); 7.2989 (30.5); 5.6864 (0.3); 5.6319 (0.3); 5.6114 (0.3); 4.2139 (0.5); 4.1900 (1.7); 4.1662 (1.7); 4.1424 (0.6); 2.2125 (0.5); 2.1079 (8.1); 1.3303 (2.2); 1.3065 (4.4); 1.2932 (0.5); 1.2827 (2.2); 0.1072 (4.5); 0.0480 (1.1); 0.0371 (32.3); 0.0263 (1.2)
1-35: $^1$H-NMR(300.2 MHz, CDCl3):
δ = 8.5958 (2.6); 8.5877 (2.5); 8.0485 (0.4); 8.0394 (0.5); 8.0248 (3.6); 8.0199 (11.4); 7.8867 (0.8); 7.6915 (1.2); 7.2987 (16.5); 5.3377 (0.8); 4.5648 (2.2); 4.5550 (1.1); 4.5410 (7.0); 4.5310 (1.5); 4.5172 (7.1); 4.5070 (1.0); 4.4935 (2.3); 1.5921 (15.2); 1.5188 (0.9); 1.5025 (7.9); 1.4950 (2.2); 1.4787 (16.0); 1.4714 (1.5); 1.4549 (7.6); 1.2911 (0.4); 0.1061 (0.7); 0.0470 (0.6); 0.0361 (16.8); 0.0252 (0.6)
1-36: $^1$H-NMR(300.2 MHz, $d_6$-DMSO):
δ = 8.7017 (1.3); 8.6952 (1.5); 8.6861 (6.0); 8.6850 (5.6); 8.6797 (6.3); 8.6674 (1.4); 8.6596 (1.4); 8.6268 (5.9); 8.6189 (6.2); 8.3059 (16.0); 8.2818 (0.9); 8.2749 (1.4); 8.2674 (0.8); 8.2297 (4.5); 8.2230 (6.4); 8.2154 (4.1); 8.1457 (0.4); 8.0647 (0.3); 8.0472 (3.3); 5.7778 (0.4); 4.0597 (0.5); 4.0360 (0.4); 3.1873 (0.4); 2.5611 (14.4); 2.5339 (3.5); 2.5279 (7.4); 2.5218 (10.0); 2.5158 (7.2); 2.5099 (3.3); 2.0085 (1.8); 1.9286 (1.0); 1.2173 (0.5); 1.1936 (1.0); 1.1698 (0.5); 0.0294 (0.5); 0.0186 (13.5); 0.0093 (0.4); 0.0076 (0.5)
1-37: $^1$H-NMR(300.2 MHz, $d_6$-DMSO):
δ = 8.2172 (16.0); 7.8172 (1.1); 7.5335 (0.4); 7.5209 (2.7); 7.5083 (1.1); 7.4950 (5.9); 7.4813 (1.3); 7.4687 (4.0); 7.4323 (0.4); 7.2414 (0.8); 7.2065 (8.3); 7.1989 (5.9); 7.1802 (5.2); 7.1726 (5.8); 7.1660 (6.8); 7.1604 (6.4); 5.7866 (0.5); 5.5279 (0.3); 5.4410 (0.6); 5.2844 (0.6); 4.0613 (0.8); 4.0377 (0.8); 4.0142 (0.4); 3.6447 (0.3); 3.3505 (11.6); 3.2182 (0.8); 3.1169 (0.4); 2.7483 (0.5); 2.5853 (0.4); 2.5346 (21.8); 2.5287 (46.6); 2.5227 (64.6); 2.5167 (46.8); 2.5108 (21.7); 2.2933 (0.4); 2.0100 (3.1); 1.9297 (5.9); 1.7140 (0.4); 1.5738 (1.3); 1.5537 (4.9); 1.5468 (4.9); 1.5277 (1.9); 1.5086 (1.4); 1.4880 (4.7); 1.4816 (5.0); 1.4631 (2.0); 1.3997 (0.4); 1.2828 (0.4); 1.2537 (2.2); 1.2318 (5.2); 1.2236 (6.3); 1.2011 (6.3); 1.1951 (6.3); 1.1713 (2.0); 0.2153 (0.4); 0.0318 (2.5); 0.0208 (76.8); 0.0098 (2.6)
1-38: $^1$H-NMR(300.2 MHz, CDCl3):
δ = 7.8774 (4.8); 7.8763 (4.8); 7.5175 (0.7); 7.4681 (0.7); 7.4420 (1.6); 7.4164 (0.9); 7.2999 (5.3); 7.2987 (5.2); 7.1733 (4.2); 7.1458 (2.4); 7.1188 (1.3); 5.3926 (0.4); 5.3715 (1.0); 5.3635 (0.4); 5.3507 (1.3); 5.3300 (1.2); 5.3091 (0.4); 1.5965 (4.9); 1.5767 (1.5); 1.5715 (1.5); 1.5498 (0.6); 1.5350 (0.6); 1.5130 (1.6); 1.5078 (1.6); 1.4867 (0.7); 1.4693 (2.5); 1.4462 (16.0); 1.4250 (14.6); 1.4046 (0.4); 1.1657 (0.6); 1.1437 (1.7); 1.1387 (2.1); 1.1150 (2.0); 1.1095 (1.8); 1.0871 (0.5); 0.0391 (7.1); 0.0378 (6.9)
1-39: $^1$H-NMR(300.2 MHz, $d_6$-DMSO):
δ = 8.2768 (16.0); 7.4354 (1.2); 7.4196 (2.2); 7.4107 (1.5); 7.4026 (2.9); 7.3861 (1.8); 7.3781 (1.9); 7.3314 (1.5); 7.3053 (8.5); 7.2868 (6.3); 7.2596 (0.6); 7.2507 (0.4); 3.1586 (0.9); 3.1303 (1.2); 3.1189 (1.7); 3.0879 (1.7); 3.0500 (1.0); 2.5338 (2.8);

TABLE 4-continued 2.5279 (5.7); 2.5219 (7.5); 2.5158 (5.4); 2.5100 (2.6); 2.1738 (0.4); 2.1459 (1.0); 2.1356 (0.7); 2.1246 (1.3); 2.1079 (2.6); 2.0856 (2.4); 2.0732 (2.9); 2.0612 (1.6); 2.0469 (2.2); 2.0323 (1.4); 2.0196 (0.5); 1.9291 (12.3); 0.0183 (5.8)

1-40: $^1$H-NMR(300.2 MHz, CDCl3):

δ = 7.9179 (6.4); 7.6094 (0.4); 7.2986 (12.0); 7.2758 (0.9); 7.2703 (0.8); 7.2528 (0.8); 7.2468 (0.8); 7.2235 (0.9); 7.1975 (1.4); 7.1945 (1.4); 7.1706 (0.7); 7.1679 (0.8); 7.1405 (0.6); 7.1375 (0.6); 7.1348 (0.6); 7.1165 (0.8); 7.1141 (0.7); 5.4071 (0.4); 5.3862 (1.1); 5.3653 (1.4); 5.3445 (1.1); 5.3236 (0.4); 2.9082 (0.3); 2.8949 (0.6); 2.8677 (0.6); 2.8544 (0.3); 2.8268 (0.3); 1.9830 (0.3); 1.9734 (0.4); 1.9603 (0.6); 1.9564 (0.5); 1.9434 (0.6); 1.9339 (0.7); 1.9207 (0.4); 1.9168 (0.7); 1.8944 (0.4); 1.8772 (0.3); 1.7473 (0.3); 1.7342 (0.4); 1.7204 (0.6); 1.7069 (0.8); 1.6927 (0.6); 1.6785 (0.7); 1.6652 (0.6); 1.6511 (0.4); 1.5844 (7.9); 1.4782 (1.3); 1.4618 (16.0); 1.4409 (15.7); 0.0481 (0.4); 0.0433 (0.4); 0.0374 (14.2); 0.0297 (0.4); 0.0280 (0.4); 0.0265 (0.5)

1-41: $^1$H-NMR(300.2 MHz, $d_6$-DMSO):

δ = 8.2790 (2.3); 7.4340 (0.6); 7.4198 (2.0); 7.4024 (3.7); 7.3950 (2.2); 7.3866 (4.6); 7.3720 (2.9); 7.3623 (3.1); 7.3269 (1.8); 7.3015 (16.0); 7.2845 (9.6); 7.2771 (8.0); 7.2585 (1.1); 3.6128 (0.3); 3.5872 (0.4); 3.3811 (0.8); 3.3129 (0.7); 3.2895 (0.7); 3.1978 (0.4); 3.1540 (1.7); 3.1237 (2.2); 3.1138 (3.0); 3.0836 (3.1); 3.0453 (1.9); 2.9110 (2.3); 2.7518 (2.1); 2.7092 (1.2); 2.5340 (13.1); 2.5280 (28.4); 2.5219 (39.3); 2.5158 (28.3); 2.5100 (13.3); 2.4263 (55.4); 2.4070 (3.8); 2.3600 (0.4); 2.2074 (0.4); 2.1720 (0.7); 2.1441 (1.7); 2.1347 (1.0); 2.1229 (2.1); 2.1062 (4.3); 2.0840 (4.2); 2.0712 (5.1); 2.0587 (2.6); 2.0447 (3.8); 2.0300 (2.4); 2.0159 (0.8); 2.0093 (1.0); 2.0035 (0.5); 1.9289 (1.1); 0.0307 (1.7); 0.0290 (0.9); 0.0275 (1.2); 0.0199 (53.0); 0.0122 (1.8); 0.0107 (1.8); 0.0090 (1.9)

1-42: $^1$H-NMR(300.2 MHz, CDCl3):

δ = 7.9172 (0.6); 7.2981 (5.1); 7.2842 (0.6); 7.2625 (1.2); 7.2397 (0.9); 7.2341 (1.0); 7.2004 (1.0); 7.1740 (1.8); 7.1470 (1.0); 7.1173 (1.0); 7.0966 (1.1); 7.0713 (0.4); 5.4608 (0.4); 5.4399 (1.1); 5.4190 (1.4); 5.3981 (1.1); 5.3773 (0.4); 2.9312 (0.4); 2.9033 (0.5); 2.8906 (0.8); 2.8629 (0.9); 2.8501 (0.5); 2.8224 (0.5); 2.4670 (16.0); 2.4551 (1.6); 2.2082 (8.2); 1.9938 (0.3); 1.9766 (0.4); 1.9673 (0.4); 1.9540 (0.7); 1.9371 (0.7); 1.9278 (0.7); 1.9110 (0.8); 1.8974 (0.4); 1.8882 (0.4); 1.8710 (0.4); 1.7393 (0.4); 1.7261 (0.4); 1.7122 (0.6); 1.6988 (0.9); 1.6847 (0.7); 1.6707 (0.9); 1.6571 (0.7); 1.6434 (0.4); 1.6300 (0.3); 1.6007 (4.9); 1.4817 (1.2); 1.4683 (1.5); 1.4570 (14.6); 1.4361 (14.0); 1.2956 (0.5); 0.9183 (0.4); 0.0361 (3.6)

1-43: $^1$H-NMR(300.2 MHz, $d_6$-DMSO):

δ = 8.2836 (1.4); 8.2772 (16.0); 8.0256 (0.8); 7.5855 (0.4); 7.5487 (1.7); 7.5442 (1.5); 7.5229 (3.8); 7.5103 (3.4); 7.5049 (3.4); 7.4983 (2.9); 7.4936 (2.4); 7.4892 (2.2); 7.4835 (2.2); 7.3768 (2.8); 7.3503 (3.9); 7.3238 (1.6); 4.0603 (0.6); 4.0366 (0.6); 3.3605 (1.2); 3.2371 (0.6); 2.5342 (7.1); 2.5283 (15.8); 2.5223 (22.2); 2.5162 (16.4); 2.5104 (7.8); 2.0093 (2.6); 1.9292 (7.7); 1.5028 (1.0); 1.4759 (3.9); 1.4545 (1.6); 1.4402 (1.2); 1.4132 (4.0); 1.3921 (1.8); 1.2548 (0.4); 1.2247 (1.6); 1.2181 (1.1); 1.2027 (4.2); 1.1948 (5.8); 1.1732 (5.1); 1.1443 (1.2); 0.0302 (0.7); 0.0194 (25.5); 0.0085 (1.1)

1-44: $^1$H-NMR(300.2 MHz, CDCl3):

δ = 7.9261 (0.4); 7.9166 (5.3); 7.6145 (0.4); 7.4855 (0.3); 7.4803 (0.5); 7.4756 (0.4); 7.4594 (0.9); 7.4543 (1.0); 7.4502 (0.6); 7.4386 (0.5); 7.4333 (0.6); 7.4286 (0.5); 7.3637 (0.4); 7.3600 (0.4); 7.3388 (1.0); 7.3366 (0.9); 7.3154 (0.8); 7.3128 (0.7); 7.3095 (0.7); 7.2990 (4.7); 7.2686 (1.1); 7.2422 (1.3); 7.2156 (0.5); 7.0516 (1.2); 7.0471 (0.8); 7.0317 (0.7); 7.0277 (0.4); 5.4051 (0.4); 5.3843 (1.0); 5.3634 (1.4); 5.3425 (1.0); 5.3217 (0.4); 5.2848 (0.6); 5.2686 (0.6); 1.6046 (3.3); 1.5156 (0.5); 1.4927 (1.6); 1.4894 (1.6); 1.4769 (1.7); 1.4597 (16.0); 1.4388 (15.7); 1.4037 (0.7); 1.3039 (1.0); 1.2341 (0.6); 1.2131 (1.4); 1.2057 (1.6); 1.1833 (1.7); 1.1758 (1.3); 1.1636 (0.5); 1.1557 (0.8); 1.1340 (0.5); 1.1287 (0.4); 0.9410 (0.3); 0.9194 (1.1); 0.8961 (0.4); 0.0375 (6.0)

1-45: $^1$H-NMR(300.2 MHz, CDCl3):

δ = 7.4720 (0.4); 7.4670 (0.6); 7.4621 (0.4); 7.4457 (0.9); 7.4409 (1.0); 7.4252 (0.5); 7.4199 (0.6); 7.4152 (0.5); 7.3599 (0.3); 7.3545 (0.4); 7.3508 (0.4); 7.3296 (0.9); 7.3275 (0.9); 7.2991 (13.2); 7.2490 (0.9); 7.2224 (1.2); 7.1957 (0.5); 7.0557 (1.4); 7.0506 (1.0); 7.0353 (0.7); 7.0309 (0.4); 5.4608 (0.4); 5.4399 (1.0); 5.4191 (1.3); 5.3982 (1.0); 5.3773 (0.4); 5.2403 (0.8); 5.2239 (0.8); 2.4655 (15.5); 2.4545 (1.8); 1.5914 (11.8); 1.5121 (0.4); 1.4898 (1.6); 1.4817 (2.4); 1.4570 (16.0); 1.4361 (15.8); 1.4231 (1.7); 1.4001 (0.6); 1.3042 (1.3); 1.2301 (0.6); 1.2093 (1.4); 1.2019 (1.6); 1.1796 (1.6); 1.1717 (1.4); 1.1587 (0.6); 1.1516 (0.5); 1.1363 (0.6); 0.9417 (0.5); 0.9200 (1.4); 0.8966 (0.6); 0.0489 (0.5); 0.0380 (16.4); 0.0270 (0.6)

1-46: $^1$H-NMR(300.2 MHz, $d_6$-DMSO):

δ = 14.2022 (0.6); 8.7327 (0.4); 8.0182 (16.0); 7.6607 (1.6); 7.6333 (3.2); 7.6098 (3.3); 7.5871 (3.0); 7.5663 (2.2); 7.4954 (0.4); 7.4753 (3.5); 7.4691 (3.9); 7.4488 (4.2); 7.4232 (1.6); 7.2887 (6.9); 7.1086 (3.4); 4.1060 (0.6); 4.0607 (0.8); 4.0369 (0.7); 3.5879 (2.3); 3.3496 (11.3); 2.7485 (0.3); 2.6346 (42.2); 2.5682 (0.4); 2.5340 (17.1); 2.5280 (36.5); 2.5220 (50.3); 2.5159 (36.1); 2.5100 (16.8); 2.4556 (0.5); 2.0093 (3.1); 1.2181 (0.9); 1.1944 (1.8); 1.1706 (0.9); 0.0308 (1.3); 0.0199 (43.9); 0.0089 (1.6); −0.0465 (0.4)

TABLE 5
Compounds according to formula (2)
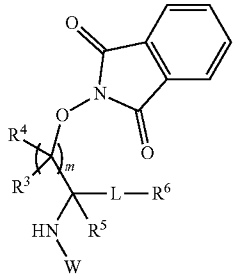
(2)
In table 5, "#" denotes the point of attachment to the L-$R^6$ group.
| Ex No | 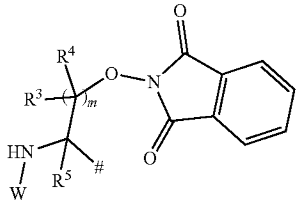 | L-$R^6$ | LogP | Salt |
|---|---|---|---|---|
| 2-01 | 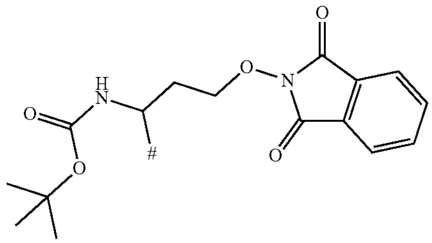 | 3-methylphenyl | 3.71[a] | |
| 2-02 | 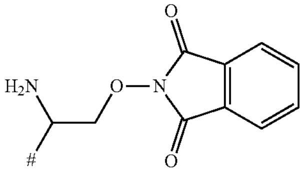 | (2,4-dimethylphenyl)methyl | 1.60[a] | TFA |
| 2-03 | 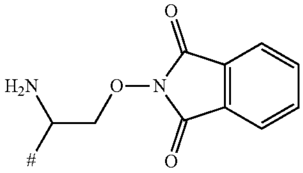 | (2-chloro-4-cyclopropylphenyl)methyl | 1.60[a] | TFA |
| 2-04 | 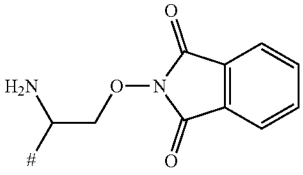 | (4-cyclopropyl-2-methylphenyl)methyl | 1.56[a] | TFA |
| 2-05 | 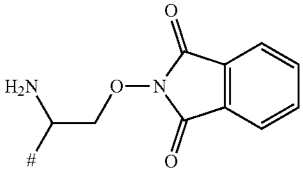 | (2,4-dichlorophenyl)methyl | 1.54[a] | TFA |

TABLE 5-continued
Compounds according to formula (2)
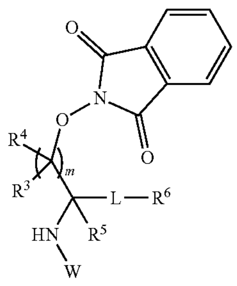
(2)
In table 5, "#" denotes the point of attachment to the $L-R^6$ group.
| Ex No | 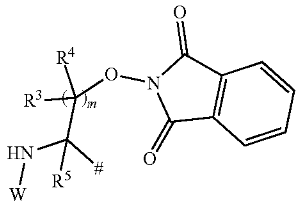 | $L-R^6$ | LogP | Salt |
|---|---|---|---|---|
| 2-06 | 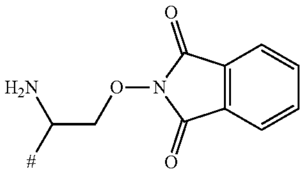 | (2-chloro-4-isopropylphenyl)methyl | 1.59[a] | TFA |
| 2-07 | 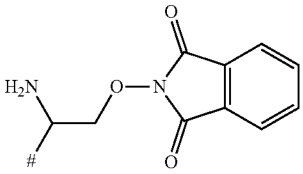 | (4-isopropyl-2-methylphenyl)methyl | 1.55[a] | TFA |
| 2-08 | 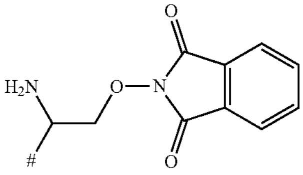 | (3,4-dimethylphenyl)methyl | 1.32[a] | TFA |
| 2-09 | 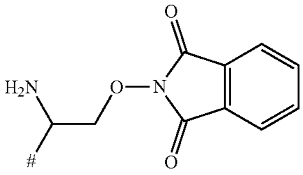 | (4-bromo-2-chlorophenyl)methyl | 1.54[a] | TFA |
| 2-10 | 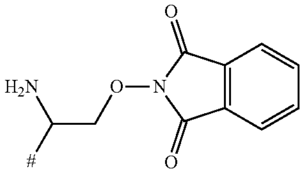 | (4-bromo-2-methylphenyl)methyl | 1.52[a] | TFA |

TABLE 5-continued
Compounds according to formula (2)
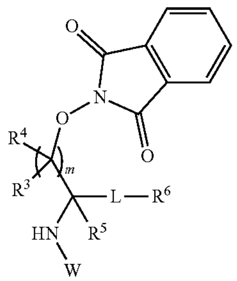
(2)
In table 5, "#" denotes the point of attachment to the L-$R^6$ group.
| Ex No | 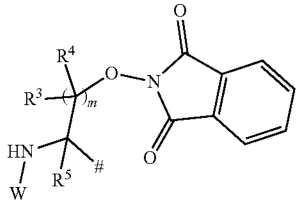 | L-$R^6$ | LogP | Salt |
|---|---|---|---|---|
| 2-11 | 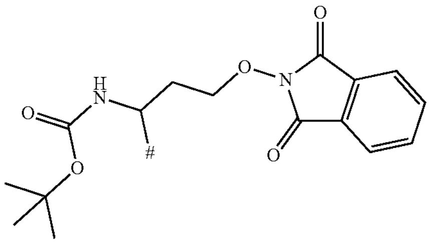 | (2,4-dichlorophenyl)methyl | 4.41[a] | |
| 2-12 | 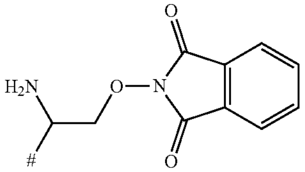 | (2,4-dimethylphenoxy)methyl | 1.70[a] | TFA |
| 2-13 | 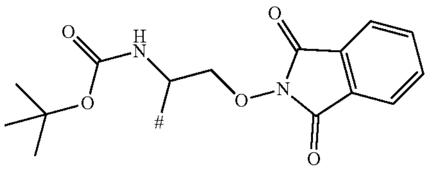 | (2,4-dimethylphenoxy)methyl | 4.51[a] | |
| 2-14 | 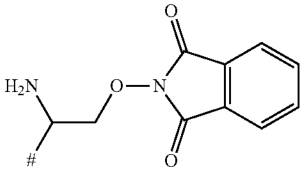 | (4-chlorophenoxy)methyl | 1.53[a] | TFA |
| 2-15 | 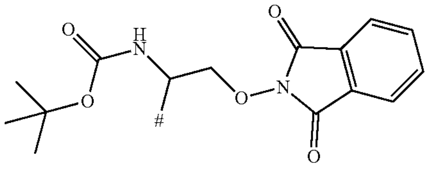 | (4-chlorophenoxy)methyl | 4.20[a] | |

TABLE 5-continued
Compounds according to formula (2)
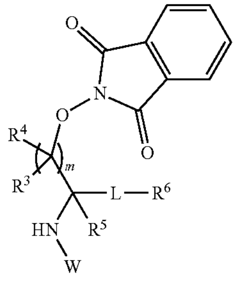
(2)
In table 5, "#" denotes the point of attachment to the L-$R^6$ group.
| Ex No | 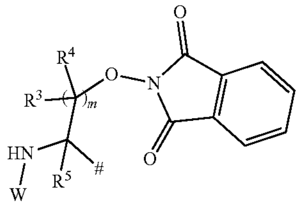 | L-$R^6$ | LogP | Salt |
|---|---|---|---|---|
| 2-16 | 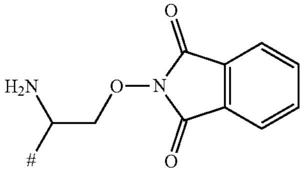 | [(2,4-dimethylphenyl)thio]methyl | 1.79[a] | TFA |
| 2-17 | 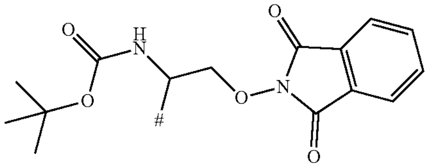 | [(2,4-dimethylphenyl)thio]methyl | 4.74[a] | |
| 2-18 | 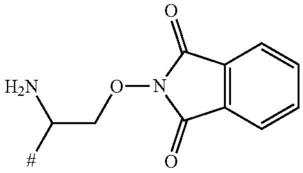 | (5-chloropyridin-2-yl)methyl | 1.23[a] | TFA |
| 2-19 | 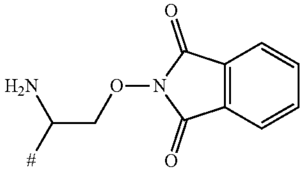 | (4,5-dimethyl-3-thienyl)methyl | 1.64[a] | TFA |
| 2-20 | 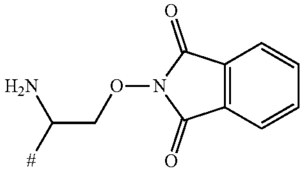 | (2-chloro-4-methylphenyl)methyl | 1.61[a] | TFA |

TABLE 5-continued
Compounds according to formula (2)
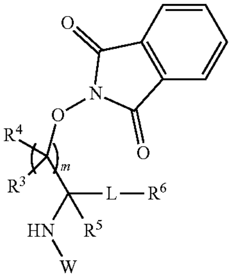
(2)
In table 5, "#" denotes the point of attachment to the $L-R^6$ group.
| Ex No | 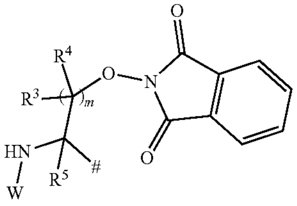 | $L-R^6$ | LogP | Salt |
|---|---|---|---|---|
| 2-21 | 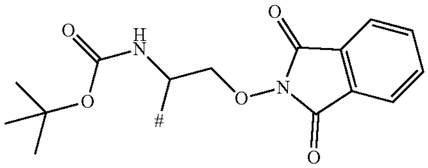 | (2-chloro-4-methylphenyl)methyl | 4.51[a] | |
TABLE 6
2-01: $^1$H-NMR(400.2 MHz, $d_6$-DMSO):
δ = 7.8588 (11.8); 7.8355 (0.4); 7.4419 (0.8); 7.4196 (0.8); 7.2178 (0.7); 7.2089 (0.4); 7.1988 (1.9); 7.1804 (1.4); 7.1339 (2.1); 7.1076 (0.8); 7.0372 (1.3); 7.0195 (1.1); 4.7012 (0.5); 4.6852 (0.6); 4.6034 (0.4); 4.1784 (0.5); 4.1695 (0.5); 4.1521 (0.7); 4.1363 (0.3); 4.0846 (0.4); 4.0684 (0.7); 4.0529 (0.5); 4.0431 (0.5); 3.3205 (109.8); 2.6736 (0.3); 2.6694 (0.4); 2.5089 (28.2); 2.5046 (56.6); 2.5001 (75.0); 2.4957 (53.0); 2.4913 (24.6); 2.3317 (0.3); 2.3271 (0.4); 2.3220 (0.3); 2.2878 (11.1); 2.0501 (1.2); 2.0312 (0.4); 2.0151 (0.8); 1.9955 (1.1); 1.9788 (0.9); 1.9636 (0.4); 1.3501 (16.0); 1.2356 (0.6); 1.2103 (0.7); −0.0014 (6.8)
2-02: $^1$H-NMR(499.9 MHz, $d_6$-DMSO):
δ = 8.3331 (4.3); 7.8923 (16.0); 7.1867 (2.1); 7.1714 (2.5); 6.9966 (3.3); 6.9726 (2.0); 6.9574 (1.8); 4.2888 (0.8); 4.2756 (1.0); 4.2668 (1.5); 4.2540 (1.5); 4.2169 (1.6); 4.2106 (1.8); 4.1952 (1.1); 4.1888 (1.0); 3.7123 (1.1); 3.7064 (1.1); 3.7009 (1.1); 3.3434 (3.2); 2.9949 (0.4); 2.9828 (0.6); 2.9669 (1.6); 2.9529 (2.4); 2.9328 (1.6); 2.9049 (0.6); 2.5088 (3.2); 2.2745 (12.3); 2.2293 (12.2)
2-03: $^1$H-NMR(400.2 MHz, $d_6$-DMSO):
δ = 8.3411 (2.0); 7.8880 (16.0); 7.3658 (2.0); 7.3459 (2.4); 7.1652 (2.8); 7.1612 (2.9); 7.0376 (1.5); 7.0335 (1.5); 7.0178 (1.4); 7.0136 (1.3); 4.2982 (0.4); 4.2822 (0.5); 4.2703 (1.4); 4.2534 (2.0); 4.2407 (1.6); 4.2224 (0.6); 4.2129 (0.4); 3.7788 (0.7); 3.3905 (0.5); 3.3731 (0.4); 3.0783 (2.6); 3.0598 (2.2); 2.5045 (18.0); 2.5002 (23.4); 2.4960 (17.8); 1.9344 (0.6); 1.9259 (0.7); 1.9135 (1.1); 1.9011 (0.7); 1.8927 (0.6); 1.8801 (0.3); 1.1071 (0.3); 1.0895 (0.7); 1.0720 (0.3); 0.9822 (0.6); 0.9711 (2.0); 0.9659 (2.2); 0.9553 (1.3); 0.9503 (2.1); 0.9450 (2.1); 0.9349 (0.9); 0.6997 (0.8); 0.6889 (2.4); 0.6843 (2.4); 0.6768 (2.3); 0.6721 (2.4); 0.6607 (0.8); −0.0017 (2.7)
2-04: $^1$H-NMR(400.2 MHz, $d_6$-DMSO):
δ = 8.2662 (1.8); 7.9096 (0.5); 7.8877 (16.0); 7.8654 (0.5); 7.1680 (2.1); 7.1485 (2.3); 6.8848 (2.7); 6.8630 (1.6); 6.8434 (1.4); 4.2706 (0.6); 4.2541 (0.7); 4.2431 (1.4); 4.2270 (1.5); 4.2123 (1.5); 4.2033 (1.6); 4.1851 (0.7); 4.1760 (0.6); 3.6896 (0.7); 3.4075 (0.4); 3.3904 (0.8); 3.3729 (1.0); 3.3554 (0.8); 2.9473 (0.3); 2.9281 (2.4); 2.9128 (1.6); 2.9061 (1.6); 2.5044 (32.8); 2.5000 (43.1); 2.4956 (31.6); 2.3269 (0.3); 2.3139 (0.8); 2.2604 (11.3); 1.8500 (0.6); 1.8416 (0.7); 1.8292 (1.2); 1.8167 (0.8); 1.8083 (0.7); 1.7952 (0.4); 1.1069 (0.4); 1.0894 (0.7); 1.0720 (0.3); 0.9254 (0.8); 0.9148 (2.2); 0.9094 (2.4); 0.9045 (1.2); 0.8994 (1.3); 0.8938 (2.3); 0.8885 (2.3); 0.8786 (0.9); 0.6309 (0.9); 0.6208 (2.4); 0.6159 (2.5); 0.6083 (2.5); 0.6034 (2.4); 0.5926 (0.9); 0.0064 (0.4); −0.0015 (7.0); −0.0099 (0.4)
2-05: $^1$H-NMR(400.2 MHz, $d_6$-DMSO):
δ = 8.3427 (3.2); 7.9146 (0.5); 7.8924 (16.0); 7.6434 (3.4); 7.6385 (3.8); 7.5409 (2.2); 7.5202 (3.4); 7.4546 (2.3); 7.4496 (2.3); 7.4340 (1.6); 7.4290 (1.6); 4.2841 (3.5); 4.2717 (4.2); 3.8317 (0.8); 3.8200 (1.2); 3.8061 (0.9); 3.3429 (0.6); 3.1333 (2.4); 3.1288 (2.4); 3.1145 (2.6); 2.5004 (16.3); −0.0018 (4.8)
2-06: $^1$H-NMR(400.2 MHz, $d_6$-DMSO):
δ = 8.3621 (1.7); 7.9167 (0.5); 7.9031 (1.8); 7.8934 (13.0); 7.8713 (0.4); 7.8692 (0.4); 7.4399 (2.2); 7.4201 (2.7); 7.3358 (2.9); 7.3317 (3.1); 7.2431 (0.4); 7.2352 (1.7); 7.2310 (1.6); 7.2154 (1.4); 7.2112 (1.3); 4.2830 (1.3); 4.2687 (2.6); 4.2592 (1.8); 4.2414 (0.6); 4.2315 (0.4); 3.8155 (0.6); 3.8062 (0.7); 3.3927 (0.8); 3.3752 (0.8); 3.1039 (2.4); 3.0857 (2.2); 2.9229 (0.4); 2.9057 (0.9); 2.8884 (1.3); 2.8712 (1.0); 2.8540 (0.4); 2.5255 (0.5); 2.5120 (9.0); 2.5076 (18.2); 2.5031 (24.5); 2.4986 (17.4); 2.4942 (8.1); 1.1938 (16.0); 1.1766 (15.6); 1.1551 (0.3); 1.1094 (0.7); 1.0919 (1.4); 1.0744 (0.7); 0.8789 (0.4); 0.0007 (1.9)

TABLE 6-continued 2-07: $^1$H-NMR(400.2 MHz, $d_6$-DMSO):
δ = 8.3080 (1.3); 7.9160 (0.5); 7.9132 (0.4); 7.9026 (1.6); 7.8938 (11.0); 7.8920 (11.1); 7.8832 (1.6); 7.8699 (0.4); 7.2333 (1.9); 7.2139 (2.3); 7.0596 (2.7); 7.0435 (1.6); 7.0241 (1.3); 4.2877 (0.3); 4.2611 (0.9); 4.2450 (1.0); 4.2321 (1.4); 4.2231 (1.5); 4.2050 (0.6); 4.1959 (0.5); 3.7189 (0.6); 3.3924 (0.6); 3.3749 (0.6); 3.3575 (0.4); 2.9529 (1.8); 2.9342 (1.6); 2.8492 (0.4); 2.8322 (0.9); 2.8149 (1.2); 2.7977 (0.9); 2.7805 (0.4); 2.5112 (11.1); 2.5069 (22.4); 2.5024 (29.8); 2.4979 (21.4); 2.4935 (10.1); 2.3158 (0.4); 2.2934 (11.6); 1.1805 (16.0); 1.1632 (15.6); 1.1091 (0.5); 1.0916 (0.9); 1.0741 (0.4); 0.0006 (2.8)
2-08: $^1$H-NMR(400.2 MHz, $d_6$-DMSO):
δ = 8.2269 (1.6); 7.9157 (0.5); 7.9020 (1.9); 7.8923 (16.0); 7.8702 (0.5); 7.1019 (2.0); 7.0847 (5.1); 7.0377 (2.3); 7.0187 (1.3); 5.7587 (0.4); 4.2409 (0.5); 4.2244 (3.6); 4.2137 (2.9); 3.7359 (0.8); 3.7220 (1.0); 3.7096 (0.7); 3.3344 (0.6); 2.9028 (2.6); 2.8853 (2.6); 2.5113 (13.6); 2.5069 (28.1); 2.5024 (38.0); 2.4979 (27.2); 2.4935 (12.8); 2.1946 (15.6); 2.1763 (14.8); 1.1067 (0.9); 0.0007 (3.4)
2-09: $^1$H-NMR(400.2 MHz, $d_6$-DMSO):
δ = 8.3668 (3.1); 7.9176 (0.5); 7.8953 (16.0); 7.8726 (0.4); 7.7539 (4.1); 7.7489 (4.3); 7.5803 (1.7); 7.5752 (1.6); 7.5597 (2.5); 7.5547 (2.4); 7.4744 (3.7); 7.4537 (2.5); 4.2906 (2.7); 4.2881 (2.6); 4.2765 (3.8); 4.2592 (0.4); 3.8354 (0.7); 3.8228 (1.0); 3.8088 (0.6); 3.1559 (0.3); 3.1269 (2.0); 3.1205 (2.0); 3.1075 (2.0); 3.1031 (2.0); 2.5126 (6.5); 2.5083 (13.2); 2.5038 (17.8); 2.4994 (12.7); 2.4950 (6.0); 0.0007 (1.2)
2-10: $^1$H-NMR(400.2 MHz, $d_6$-DMSO):
δ = 8.3381 (3.4); 7.9140 (0.6); 7.8920 (16.0); 7.8688 (0.6); 7.4251 (2.9); 7.4209 (3.3); 7.3677 (1.4); 7.3630 (1.2); 7.3474 (2.1); 7.3425 (2.0); 7.2808 (3.5); 7.2603 (2.2); 7.1732 (0.4); 4.2842 (0.5); 4.2692 (0.6); 4.2565 (2.0); 4.2429 (3.4); 4.2345 (2.4); 4.2169 (0.7); 4.2067 (0.4); 3.7575 (0.8); 3.7467 (1.0); 3.7332 (0.8); 2.9774 (2.5); 2.9581 (2.9); 2.5060 (6.1); 2.5017 (7.9); 2.4975 (5.8); 2.3132 (15.1); −0.0020 (3.4)
2-11: $^1$H-NMR(300.1 MHz, $d_6$-DMSO):
δ = 7.8598 (15.3); 7.5312 (1.4); 7.5249 (1.4); 7.3677 (0.5); 7.3616 (0.4); 7.3400 (1.3); 7.3336 (1.2); 7.3171 (1.6); 7.2894 (0.6); 6.8031 (0.6); 6.7729 (0.6); 4.1931 (0.7); 4.1715 (1.2); 4.1471 (0.6); 3.9005 (0.4); 3.8715 (0.3); 3.3414 (4.6); 2.9636 (0.4); 2.9468 (0.5); 2.9186 (0.6); 2.9025 (0.6); 2.7338 (0.6); 2.7276 (0.6); 2.7037 (0.4); 2.6910 (0.3); 2.5134 (25.8); 2.5074 (51.6); 2.5014 (69.3); 2.4954 (47.3); 2.4895 (21.4); 2.2712 (0.4); 1.9037 (0.5); 1.8769 (0.5); 1.8284 (0.3); 1.2494 (16.0); 1.1197 (1.9); 0.0105 (0.4); −0.0004 (11.5); −0.0115 (0.4)
2-12: $^1$H-NMR(300.2 MHz, CDCl3):
δ = 7.8522 (0.6); 7.8435 (2.0); 7.8314 (2.3); 7.8278 (2.2); 7.8228 (2.8); 7.8143 (5.7); 7.8030 (3.0); 7.7915 (5.7); 7.7830 (2.6); 7.7738 (2.3); 7.7623 (1.9); 7.3225 (1.3); 7.3170 (0.6); 7.2986 (12.1); 7.2821 (1.1); 7.2740 (3.7); 7.2266 (5.1); 7.2025 (3.0); 7.1728 (0.5); 6.9253 (4.9); 6.9026 (1.8); 6.7442 (2.2); 6.7146 (1.7); 4.7935 (0.5); 4.7654 (0.7); 4.7532 (1.2); 4.7260 (1.2); 4.6923 (1.3); 4.6814 (1.4); 4.6527 (0.7); 4.6413 (0.6); 4.3871 (0.5); 4.3697 (0.6); 4.3529 (1.4); 4.3350 (1.6); 4.3274 (1.6); 4.3096 (1.4); 4.2926 (0.5); 4.2752 (0.5); 4.0616 (0.9); 4.0472 (0.8); 2.3964 (16.0); 2.2962 (1.1); 2.2448 (14.4); 2.2252 (0.7); 2.1836 (14.4); 1.4798 (0.9); 1.4742 (0.8); 1.4532 (0.6); 0.0522 (0.4); 0.0413 (11.8); 0.0307 (0.5)
2-13: $^1$H-NMR(300.2 MHz, CDCl3):
δ = 7.8812 (1.0); 7.8707 (1.1); 7.8640 (1.0); 7.8617 (0.9); 7.8526 (1.8); 7.8140 (0.3); 7.8010 (1.8); 7.7915 (1.0); 7.7893 (0.9); 7.7826 (1.1); 7.7721 (1.0); 7.2984 (4.6); 6.9715 (1.0); 6.8385 (1.0); 6.8091 (0.7); 5.3378 (4.5); 4.5030 (0.4); 4.4884 (0.4); 4.4521 (0.6); 4.4315 (0.9); 4.4206 (0.5); 4.3968 (0.6); 4.3910 (0.5); 4.1961 (0.5); 4.1788 (0.4); 4.1652 (0.4); 4.1480 (0.3); 2.3504 (0.4); 2.2861 (4.8); 2.2345 (5.0); 1.6061 (2.8); 1.4776 (16.0); 1.4520 (0.4); 0.0378 (6.0)
2-14: $^1$H-NMR(300.2 MHz, CDCl3):
δ = 8.5726 (0.6); 7.8154 (1.6); 7.8082 (1.3); 7.7999 (3.1); 7.7917 (5.8); 7.7858 (16.0); 7.7776 (15.6); 7.7633 (3.1); 7.7551 (1.2); 7.7479 (1.6); 7.7397 (0.5); 7.3197 (1.1); 7.3142 (0.6); 7.3107 (0.5); 7.2983 (6.6); 7.2793 (1.0); 7.2715 (3.0); 7.2246 (4.2); 7.2040 (10.0); 7.1974 (5.2); 7.1813 (3.2); 7.1742 (10.3); 7.1631 (1.3); 6.8614 (1.1); 6.8502 (9.3); 6.8432 (3.1); 6.8272 (2.7); 6.8202 (7.9); 6.8089 (0.9); 4.7388 (0.9); 4.7115 (1.2); 4.6990 (2.0); 4.6722 (2.2); 4.6450 (2.2); 4.6321 (2.5); 4.6055 (1.2); 4.5925 (1.0); 4.3808 (0.6); 4.3632 (0.9); 4.3462 (2.6); 4.3308 (4.4); 4.3153 (2.9); 4.2983 (0.8); 4.2810 (0.7); 4.0622 (1.2); 4.0486 (1.5); 4.0358 (1.4); 4.0225 (1.0); 2.3937 (12.7); 1.2928 (0.8); 1.2720 (0.8); 0.0406 (5.9)
2-15: $^1$H-NMR(300.2 MHz, CDCl3):
δ = 7.8812 (0.8); 7.8706 (0.9); 7.8641 (0.7); 7.8615 (0.8); 7.8524 (1.6); 7.8068 (1.6); 7.7975 (0.8); 7.7950 (0.8); 7.7885 (1.0); 7.7779 (0.9); 7.2986 (2.2); 7.2803 (1.6); 7.2729 (0.5); 7.2577 (0.5); 7.2502 (1.9); 6.9369 (1.9); 6.9294 (0.6); 6.9143 (0.5); 6.9068 (1.6); 4.4878 (0.3); 4.4732 (0.4); 4.4138 (0.3); 4.4044 (0.4); 4.3833 (0.6); 4.3490 (0.4); 4.1977 (0.6); 4.1793 (0.4); 4.1667 (0.5); 4.1484 (0.3); 1.6261 (1.1); 1.4799 (16.0); 1.2924 (0.4); 0.0361 (2.8)
2-16: $^1$H-NMR(300.2 MHz, CDCl3):
δ = 7.8646 (0.6); 7.8551 (0.6); 7.8515 (0.8); 7.8491 (0.7); 7.8431 (1.0); 7.8352 (2.3); 7.8295 (1.2); 7.8227 (1.2); 7.8178 (2.3); 7.8094 (1.0); 7.8035 (0.8); 7.8009 (0.8); 7.7975 (0.6); 7.7879 (0.7); 7.2986 (2.5); 7.2748 (1.2); 6.9980 (1.1); 6.9180 (0.6); 6.8916 (0.5); 4.6936 (0.4); 4.6637 (0.6); 4.6535 (0.6); 4.6026 (0.5); 4.5750 (0.6); 3.7770 (0.3); 3.7694 (16.0); 3.7604 (0.4); 3.4399 (0.4); 3.3922 (0.5); 3.3717 (0.4); 3.1601 (0.5); 3.1326 (0.4); 3.1125 (0.4); 3.0850 (0.3); 2.3843 (5.9); 2.2377 (5.6); 2.2202 (0.9); 0.0376 (2.4)
2-17: $^1$H-NMR(300.2 MHz, CDCl3):
δ = 7.8888 (1.1); 7.8783 (1.2); 7.8716 (1.1); 7.8693 (1.0); 7.8602 (2.0); 7.8468 (0.4); 7.8241 (0.3); 7.8218 (0.3); 7.8088 (2.0); 7.7993 (1.1); 7.7971 (1.0); 7.7905 (1.2); 7.7799 (1.1); 7.4011 (0.5); 7.3750 (0.6); 7.2982 (3.1); 7.0174 (1.1); 6.9823 (0.5); 4.5948 (0.6); 4.5808 (0.6); 4.5605 (0.7); 4.5466 (0.7); 4.3163 (0.4); 4.3009 (0.4); 4.2822 (0.3); 4.2667 (0.4); 3.2991 (0.6); 3.2742 (0.6); 2.4199 (5.8); 2.2971 (5.6); 1.6199 (2.0); 1.4724 (0.4); 1.4503 (16.0); 1.3035 (1.3); 0.9406 (0.5); 0.9188 (1.5); 0.8957 (0.5); 0.0368 (3.9)
2-19: $^1$H-NMR(499.9 MHz, $d_6$-DMSO):
δ = 8.8714 (0.4); 8.2981 (3.5); 7.9160 (0.6); 7.8967 (14.7); 7.8812 (1.2); 7.8789 (1.2); 7.1212 (5.9); 4.2957 (0.4); 4.2810 (4.5); 4.2736 (3.5); 4.2696 (3.4); 4.2471 (0.5); 3.7070 (0.3); 3.6960 (0.9); 3.6858 (1.1); 3.6782 (1.2); 3.6692 (0.9); 3.6585 (0.4); 3.3929 (0.3); 3.3548 (156.6); 2.9562 (0.8); 2.9382 (0.9); 2.9272 (1.6); 2.9093 (1.6); 2.8698 (1.5); 2.8581 (1.7); 2.8409 (1.0); 2.8291 (0.9); 2.5091 (4.1); 2.5061 (5.5); 2.5028 (4.4); 2.2780 (16.0); 2.0370 (15.8); 1.1904 (1.9); 1.1780 (2.0)
2-20: $^1$H-NMR(300.2 MHz, $d_6$-DMSO):
δ = 8.3905 (1.6); 7.9068 (16.0); 7.8779 (0.3); 7.4117 (1.8); 7.3858 (2.2); 7.3075 (2.2); 7.1760 (1.2); 7.1728 (1.2); 7.1502 (1.0); 7.1470 (1.0); 5.7761 (0.6); 4.3304 (0.3); 4.3091 (0.4); 4.2933 (1.1); 4.2707 (2.0); 4.2563 (1.4); 4.2320 (0.4); 4.2195 (0.3); 3.8116 (0.5); 3.1178 (2.0); 3.0959 (1.3); 3.0901 (1.3); 2.5342 (1.5); 2.5283 (3.0); 2.5222 (4.1); 2.5162 (3.0); 2.5102 (1.5); 2.2951 (8.9); 1.5526 (4.8); 1.3275 (0.4); 1.1290 (1.1); 0.0169 (3.1)
2-21: $^1$H-NMR(300.2 MHz, CDCl3):
δ = 7.9005 (2.2); 7.8901 (2.5); 7.8833 (2.3); 7.8813 (2.1); 7.8720 (3.8); 7.8585 (0.6); 7.8560 (0.5); 7.8271 (0.6); 7.8245 (0.6); 7.8114 (3.8); 7.8019 (2.4); 7.7931 (2.5); 7.7826 (2.2); 7.3523 (1.4); 7.3265 (1.8); 7.2984 (7.6); 7.2157 (2.3); 7.0894 (1.3); 7.0637 (1.1); 5.3343 (0.4); 4.3680 (0.4); 4.3533 (1.1); 4.3345 (1.5); 4.3215 (0.8); 4.2467 (0.6); 4.2344 (1.1); 4.2115 (1.2); 4.1978 (1.0); 4.1838 (0.6); 4.1707 (0.4); 3.2056 (1.6); 3.1823 (1.5); 2.3394 (10.9); 1.6190 (13.4); 1.3998 (16.0); 0.1059 (0.8); 0.0465 (0.4); 0.0358 (9.5)

TABLE 7

Compounds according to formula (3)

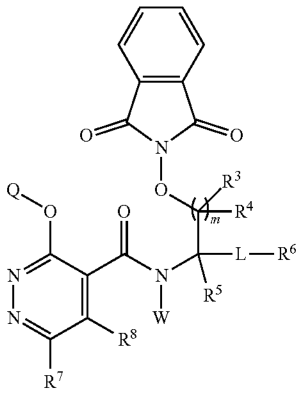

(3)

In table 7, "#" denotes the point of attachment to the L-$R^6$ group and "*" denotes the point of attachment to the pyridazin-4-yl group

| Ex-No | $R^7$ | $R^8$ | Q | 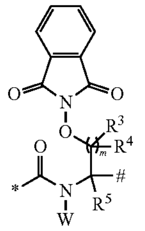 | L-$R^6$ | LogP |
|---|---|---|---|---|---|---|
| 3-02 | Cl | H | 3-(trifluoro-methyl)phenyl | 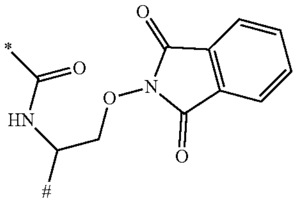 | (4-chloro-phenyl)methyl | 4.51[a]; 4.35[b] |
| 3-03 | $CH_3$ | H | 3-(trifluoro-methyl)phenyl | 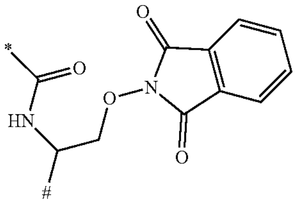 | 2,4-dichlorophenyl | 4.27[a]; 4.24[b] |
| 3-04 | Cl | H | 3-(trifluoro-methyl)phenyl | 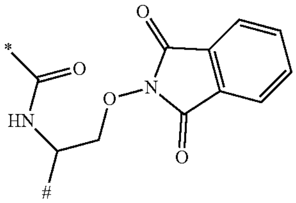 | 2,4-dichlorophenyl | 4.72[a]; 4.63[b] |
| 3-05 | Cl | $CH_3$ | 3-(trifluoro-methyl)phenyl | 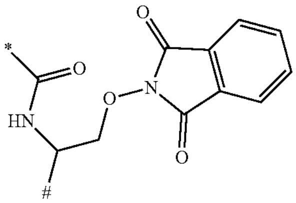 | (2,4-dimethyl-phenyl)methyl | 4.65[a] |

TABLE 7-continued

Compounds according to formula (3)

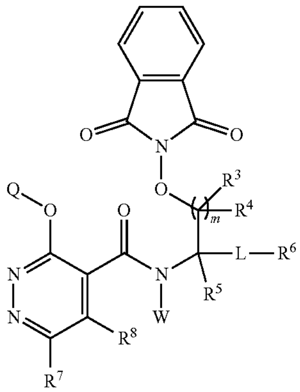

(3)

In table 7, "#" denotes the point of attachment to the L-$R^6$ group and "*" denotes the point of attachment to the pyridazin-4-yl group

| Ex-No | $R^7$ | $R^8$ | Q | 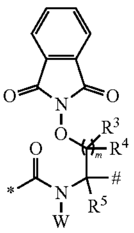 | L-$R^6$ | LogP |
|---|---|---|---|---|---|---|
| 3-06 | I | H | 3-(trifluoro-methyl)phenyl | 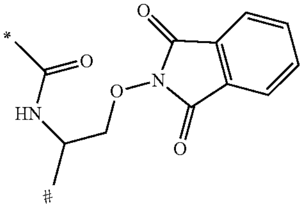 [SMILES: CC(=O)NC(C)CON1C(=O)c2ccccc2C1=O] | (2,4-dimethyl-phenyl)methyl | 5.03[a] |
| 3-07 | $CH_3$ | $CH_3$ | 3-(trifluoro-methyl)phenyl | 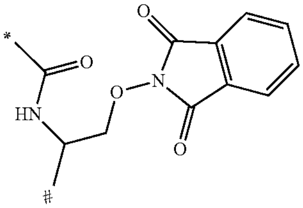 | (2,4-dimethyl-phenyl)methyl | 3.99[a] |
| 3-08 | $CH_3$ | H | 3-cyclopropyl-phenyl | 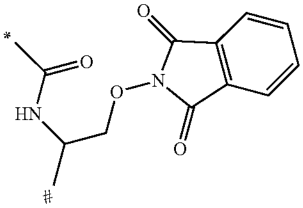 | (2,4-dimethyl-phenyl)methyl | 4.59[a] |

TABLE 7-continued

Compounds according to formula (3)

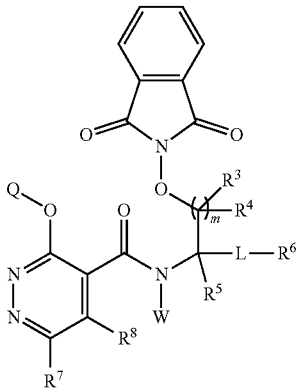

(3)

In table 7, "#" denotes the point of attachment to the L-$R^6$ group and "*" denotes the point of attachment to the pyridazin-4-yl group

| Ex-No | $R^7$ | $R^8$ | Q | 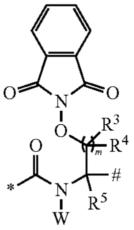 | L-$R^6$ | LogP |
|---|---|---|---|---|---|---|
| 3-09 | $CH_3$ | H | 3-cyclopropyl-2-fluorophenyl | 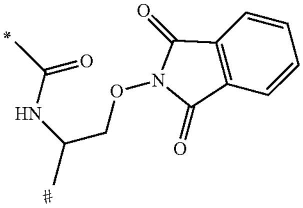 | (2,4-dimethyl-phenyl)methyl | 4.61[a] |
| 3-10 | Cl | H | 3-(trifluoro-methyl)phenyl | 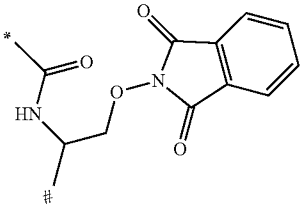 | (3,4-dimethyl-phenyl)methyl | 4.92[a] |
| 3-11 | Cl | H | 3-(trifluoro-methyl)phenyl | 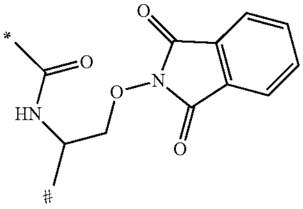 | (4-bromo-2-chloro-phenyl)methyl | 5.16[a] |

TABLE 7-continued

Compounds according to formula (3)

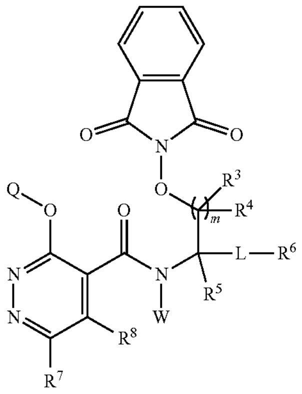

(3)

In table 7, "#" denotes the point of attachment to the L-$R^6$ group and "*" denotes the point of attachment to the pyridazin-4-yl group

| Ex-No | $R^7$ | $R^8$ | Q | 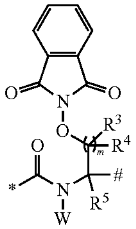 | L-$R^6$ | LogP |
|---|---|---|---|---|---|---|
| 3-12 | Cl | H | 3-(trifluoro-methyl)phenyl | 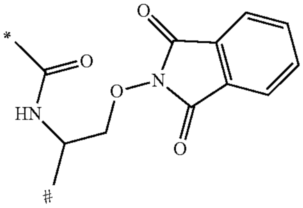 | (4-bromo-2-methyl-phenyl)methyl | 5.08[a] |
| 3-13 | Cl | H | 3-(difluoro-methyl)-2-fluorophenyl | 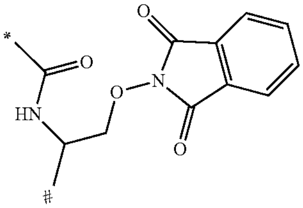 | (2,4-dimethyl-phenyl)methyl | 4.56[a] |
| 3-14 | $CH_3$ | H | 3-cyclopropyl-2-fluorophenyl | 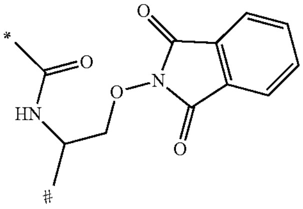 | (4-bromo-2-chloro-phenyl)methyl | 4.86[a] |

TABLE 7-continued

Compounds according to formula (3)

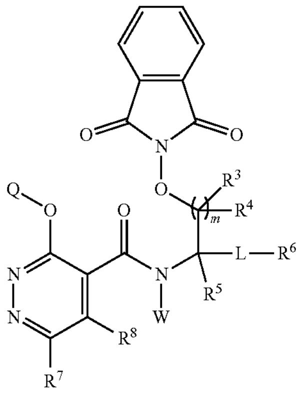

(3)

In table 7, "#" denotes the point of attachment to the L-$R^6$ group and "*" denotes the point of attachment to the pyridazin-4-yl group

| Ex-No | $R^7$ | $R^8$ | Q | 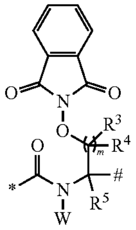 | L-$R^6$ | LogP |
|---|---|---|---|---|---|---|
| 3-15 | $CH_3$ | H | 3-cyclopropyl-2-fluorophenyl | 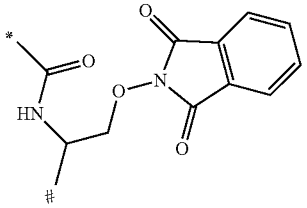 | (3,4-dimethyl-phenyl)methyl | 4.64[a] |
| 3-16 | Cl | H | 3-(trifluoro-methyl)phenyl | 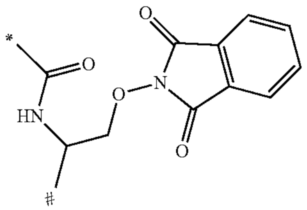 | (2,4-dimethyl-phenyl)methyl | 5.00[a] |
| 3-17 | Cl | H | 3-(trifluoro-methyl)phenyl | 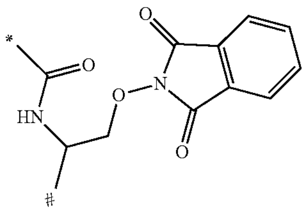 | (4-cyclopropyl-2-methyl-phenyl)methyl | 5.14[a] |

TABLE 7-continued

Compounds according to formula (3)

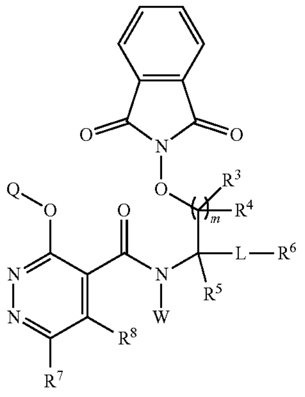

(3)

In table 7, "#" denotes the point of attachment to the L-$R^6$ group and "*" denotes the point of attachment to the pyridazin-4-yl group

| Ex-No | $R^7$ | $R^8$ | Q | 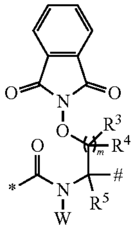 | L-$R^6$ | LogP |
|---|---|---|---|---|---|---|
| 3-18 | Cl | H | 3-(trifluoro-methyl)phenyl | 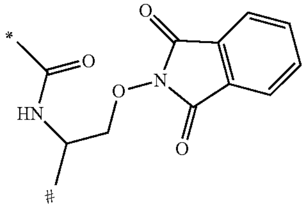 | (2-chloro-4-cyclo-propyl-phenyl)methyl | 5.17[a] |
| 3-19 | Cl | H | 3-(trifluoro-methyl)phenyl | 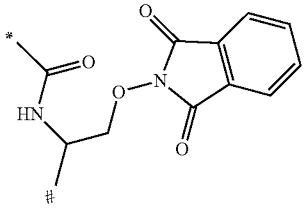 | (2-chloro-4-isopropyl-phenyl)methyl | 5.48[a] |
| 3-20 | $CH_3$ | H | 3-(difluoro-methyl)phenyl | 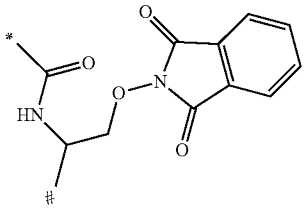 | (2,4-dimethyl-phenyl)methyl | 4.04[a] |

TABLE 7-continued

Compounds according to formula (3)

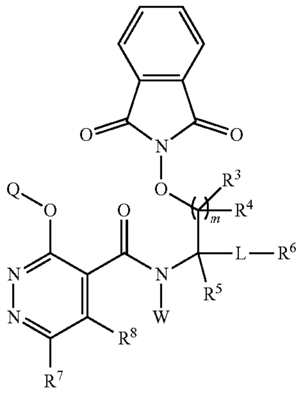

(3)

In table 7, "#" denotes the point of attachment to the L-$R^6$ group and "*" denotes the point of attachment to the pyridazin-4-yl group

| Ex-No | $R^7$ | $R^8$ | Q | 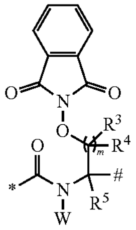 | L-$R^6$ | LogP |
|---|---|---|---|---|---|---|
| 3-21 | Cl | H | 3-(trifluoro-methyl)phenyl | 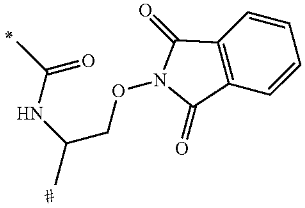 | (4-isopropyl-2-methyl-phenyl)methyl | 5.48[a] |
| 3-22 | Cl | H | 3-(trifluoro-methyl)phenyl | 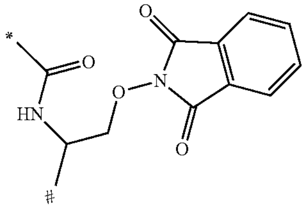 | (2,4-dichloro-phenyl)methyl | 5.03[a] |
| 3-23 | Cl | H | 5-bromopyridin-3-yl | 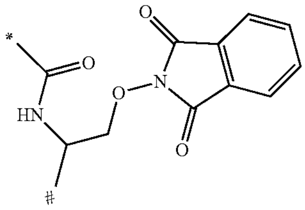 | (2,4-dimethyl-phenyl)methyl | 4.19 & 4.34[a] |

TABLE 7-continued

Compounds according to formula (3)

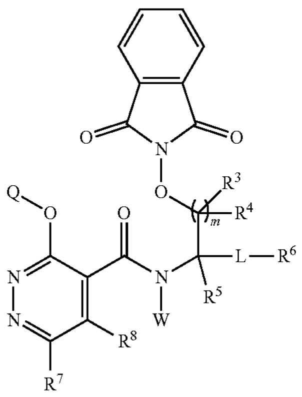

(3)

In table 7, "#" denotes the point of attachment to the L-$R^6$ group and "*" denotes the point of attachment to the pyridazin-4-yl group

| Ex-No | $R^7$ | $R^8$ | Q | 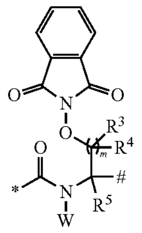 | L-$R^6$ | LogP |
|---|---|---|---|---|---|---|
| 3-24 | Cl | H | 6-chloro-5-(trifluoromethyl) pyridin-3-yl | 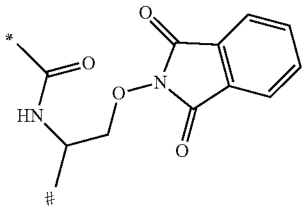 | (2,4-dimethyl-phenyl)methyl | 5.01[a] |
| 3-25 | Cl | $CH_3$ | 3-cyclopropyl-2-fluorophenyl | 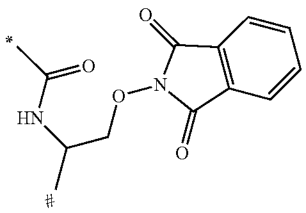 | (4-bromo-2-chloro-phenyl)methyl | 5.03[a] |
| 3-26 | Cl | $CH_3$ | 3-cyclopropyl-2-fluorophenyl | 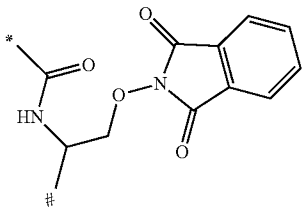 | (2-chloro-4-cyclo-propyl-phenyl)methyl | 5.05[a] |

TABLE 7-continued

Compounds according to formula (3)

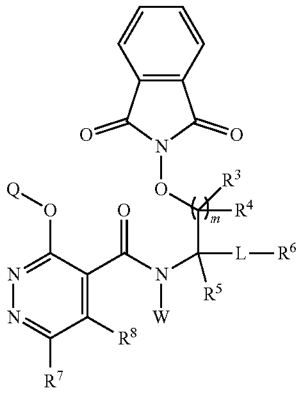

(3)

In table 7, "#" denotes the point of attachment to the L-$R^6$ group and "*" denotes the point of attachment to the pyridazin-4-yl group

| Ex-No | $R^7$ | $R^8$ | Q | 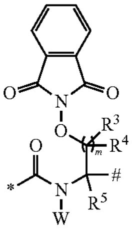 | L-$R^6$ | LogP |
|---|---|---|---|---|---|---|
| 3-27 | Cl | H | 3-cyclopropyl-phenyl | 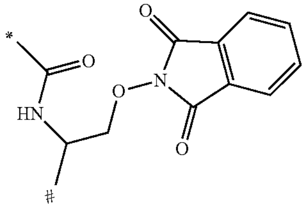 | (2,4-dimethyl-phenyl)methyl | 5.11[a] |
| 3-28 | Cl | H | 3-(1-fluoro-cyclo-propyl)phenyl | 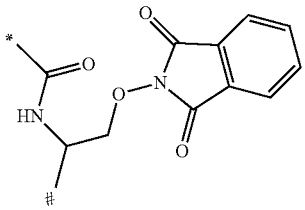 | (2,4-dimethyl-phenyl)methyl | 4.92[a] |
| 3-29 | $CH_3$ | H | 3-cyclopropyl-2-fluorophenyl | 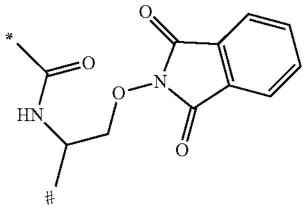 | (2-chloro-4-cyclo-propyl-phenyl)methyl | 4.90[a] |

TABLE 7-continued

Compounds according to formula (3)

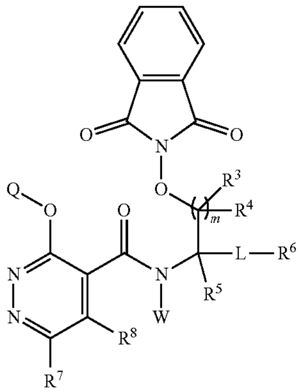

(3)

In table 7, "#" denotes the point of attachment to the L-$R^6$ group and "*" denotes the point of attachment to the pyridazin-4-yl group

| Ex-No | $R^7$ | $R^8$ | Q | 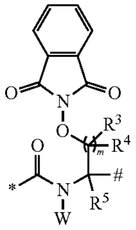 | L-$R^6$ | LogP |
|---|---|---|---|---|---|---|
| 3-30 | Cl | $CH_3$ | 3-cyclopropyl-2-fluorophenyl | 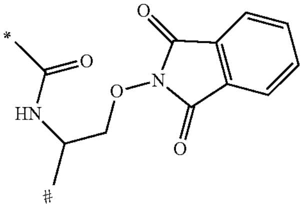 | (2,4-dichloro-phenyl)methyl | 4.90[a] |
| 3-31 | Cl | H | 3-cyclo-propylphenyl | 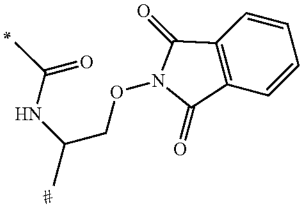 | (2,4-dichloro-phenyl)methyl | 5.27[a] |
| 3-32 | Cl | H | 2-fluoro-3-[rac-2,2-difluorocyclo-propyl]phenyl | 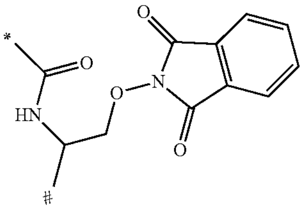 | (2,4-dimethyl-phenyl)methyl | 4.85[a] |

TABLE 7-continued

Compounds according to formula (3)

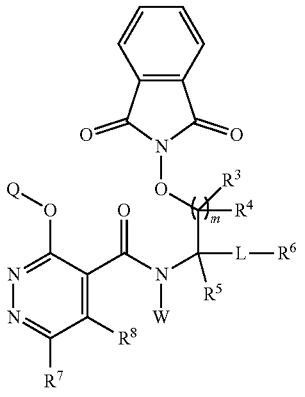

(3)

In table 7, "#" denotes the point of attachment to the L-$R^6$ group and "*" denotes the point of attachment to the pyridazin-4-yl group

| Ex-No | $R^7$ | $R^8$ | Q | 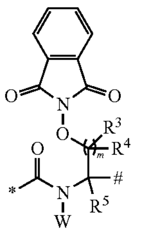 | L-$R^6$ | LogP |
|---|---|---|---|---|---|---|
| 3-33 | $CH_3$ | H | 3-(trifluoro-methyl)phenyl | 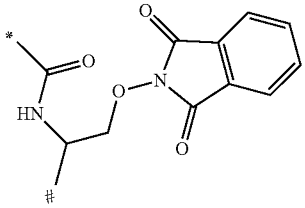 | (2,4-dimethyl-phenoxy)methyl | 4.56[a] |
| 3-34 | $CH_3$ | H | 3-(trifluoro-methyl)phenyl | 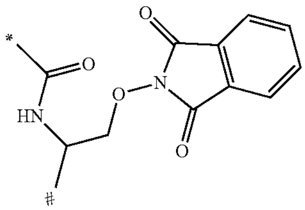 | (4-chloro-phenoxy)methyl | 4.37[a] |
| 3-35 | Cl | H | 3-(trifluoro-methyl)phenyl | 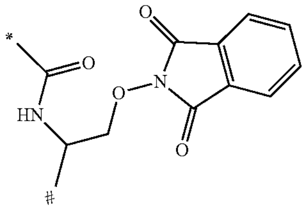 | [(2,4-dimethyl-phenyl)thio]methyl | 5.28[a] |

TABLE 7-continued

Compounds according to formula (3)

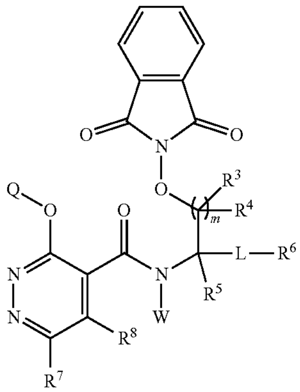

(3)

In table 7, "#" denotes the point of attachment to the L-$R^6$ group and "*" denotes the point of attachment to the pyridazin-4-yl group

| Ex-No | $R^7$ | $R^8$ | Q | 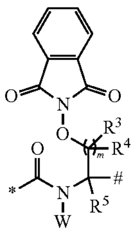 | L-$R^6$ | LogP |
|---|---|---|---|---|---|---|
| 3-36 | Cl | $CH_3$ | 2-fluoro-3-[rac-2,2-difluorocyclo-propyl]phenyl | 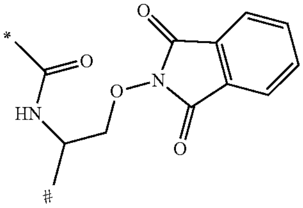 | (2,4-dimethyl-phenyl)methyl | 4.59[a] |
| 3-37 | $CH_3$ | H | 2-fluoro-3-(trifluoro-methyl)phenyl | 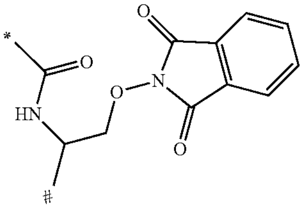 | (2,4-dichloro-phenyl)methyl | 4.64[a] |
| 3-38 | $CH_3$ | H | 2-fluoro-3-(trifluoro-methyl)phenyl | 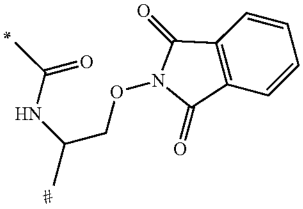 | (2,4-dimethyl-phenyl)methyl | 4.54[a] |

TABLE 7-continued

Compounds according to formula (3)

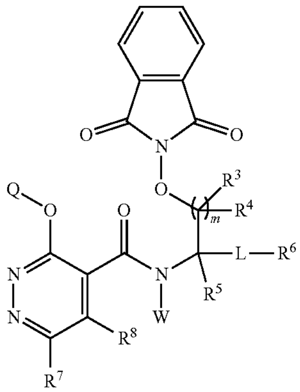

(3)

In table 7, "#" denotes the point of attachment to the L-$R^6$ group and "*" denotes the point of attachment to the pyridazin-4-yl group

| Ex-No | $R^7$ | $R^8$ | Q | 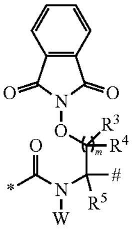 | L-$R^6$ | LogP |
|---|---|---|---|---|---|---|
| 3-39 | $CH_3$ | H | 3-(difluoro-methyl)phenyl | 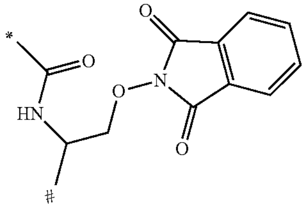 | (2,4-dichloro-phenyl)methyl | 4.18[a] |
| 3-40 | Cl | H | 2-fluoro-3-(1-fluorocyclo-propyl)phenyl | 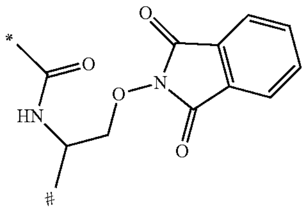 | (2,4-dimethyl-phenyl)methyl | 4.97[a] |
| 3-41 | Cl | $CH_3$ | 2-fluoro-3-(1-fluorocyclo-propyl)phenyl | 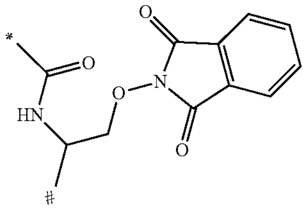 | (2,4-dimethyl-phenyl)methyl | 4.62[a] |

TABLE 7-continued

Compounds according to formula (3)

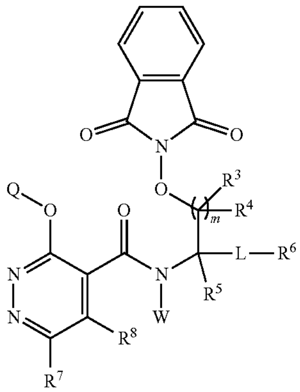

(3)

In table 7, "#" denotes the point of attachment to the L-$R^6$ group and "*" denotes the point of attachment to the pyridazin-4-yl group

| Ex-No | $R^7$ | $R^8$ | Q | 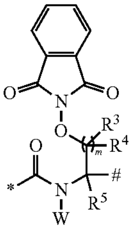 | L-$R^6$ | LogP |
|---|---|---|---|---|---|---|
| 3-42 | $CH_3$ | H | 3-chloro-2-fluorophenyl | 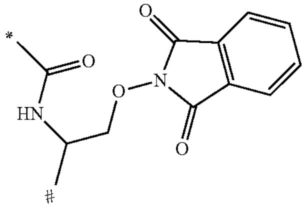 | (2-chloro-4-cyclo-propyl-phenyl)methyl | 4.70[a] |
| 3-43 | $CH_3$ | H | 3-chloro-2-fluorophenyl | 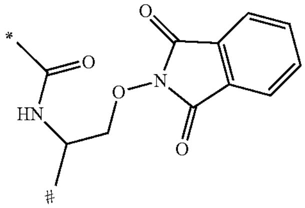 | (4-cyclopropyl-2-methyl-phenyl)methyl | 4.74[a] |
| 3-44 | $CH_3$ | H | 3-chloro-2-fluorophenyl | 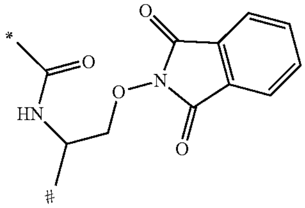 | (4-bromo-2-methyl-phenyl)methyl | 4.62[a] |

TABLE 7-continued

Compounds according to formula (3)

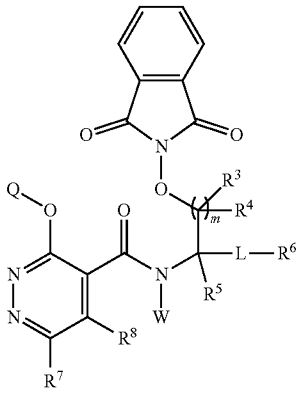

(3)

In table 7, "#" denotes the point of attachment to the L-$R^6$ group and "*" denotes the point of attachment to the pyridazin-4-yl group

| Ex-No | $R^7$ | $R^8$ | Q | 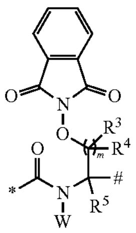 | L-$R^6$ | LogP |
|---|---|---|---|---|---|---|
| 3-45 | $CH_3$ | H | 3-chloro-2-fluorophenyl | 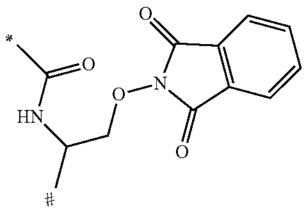 | (3,4-dimethyl-phenyl)methyl | 4.42[a] |
| 3-46 | $CH_3$ | H | 3-(difluoro-methyl)-2-fluorophenyl | 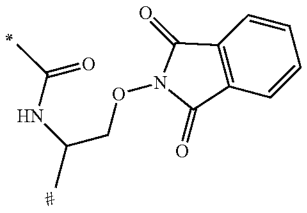 | (4-cyclopropyl-2-methyl-phenyl)methyl | 4.55[a] |
| 3-47 | $CH_3$ | H | 3-(difluor-omethyl)phenyl | 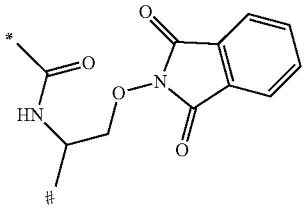 | (3,4-dimethyl-phenyl)methyl | 4.12[a] |

TABLE 7-continued

Compounds according to formula (3)

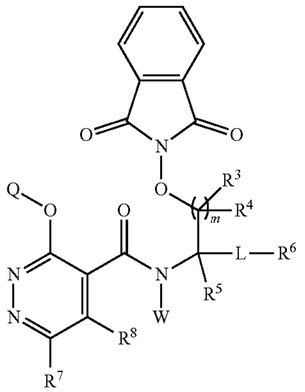

(3)

In table 7, "#" denotes the point of attachment to the L-$R^6$ group and "*" denotes the point of attachment to the pyridazin-4-yl group

| Ex-No | $R^7$ | $R^8$ | Q | 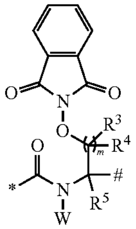 | L-$R^6$ | LogP |
|---|---|---|---|---|---|---|
| 3-48 | $CH_3$ | H | 3-(difluoro-methyl)phenyl | 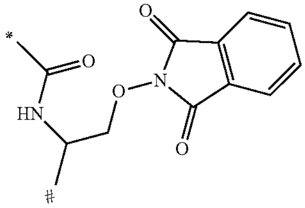 | (4-cyclopropyl-2-methyl-phenyl)methyl | 4.37[a] |
| 3-49 | $CH_3$ | H | 3-(difluoro-methyl)-2-fluorophenyl | 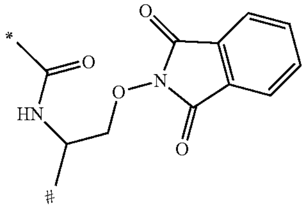 | (3,4-dimethyl-phenyl)methyl | 4.30[a] |
| 3-50 | $CH_3$ | H | 3-cyclopropyl-2-fluorophenyl | 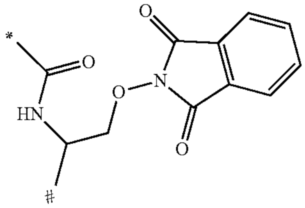 | (4-bromo-2-methyl-phenyl)methyl | 4.82[a] |

TABLE 7-continued

Compounds according to formula (3)

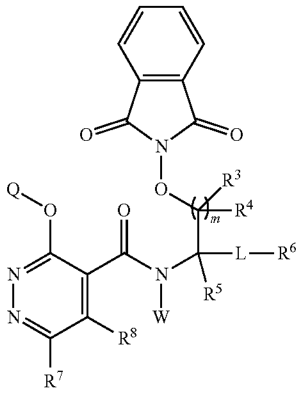

(3)

In table 7, "#" denotes the point of attachment to the L-$R^6$ group and "*" denotes the point of attachment to the pyridazin-4-yl group

| Ex-No | $R^7$ | $R^8$ | Q | 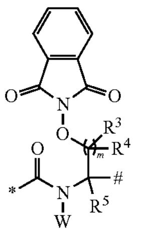 | L-$R^6$ | LogP |
|---|---|---|---|---|---|---|
| 3-51 | Cl | H | 3-(trifluoro-methyl)phenyl | 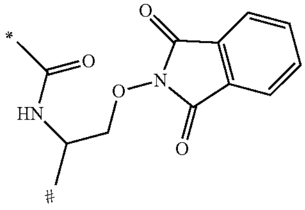 | (5-chloropyridin-2-yl)methyl4.15[a] | 4.06 & |
| 3-52 | Cl | H | 3-(trifluoro-methyl)phenyl | 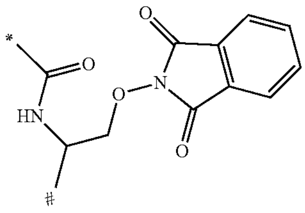 | (4,5-dimethyl-3-thienyl)methyl | 4.88[a] |
| 3-53 | $CH_3$ | H | 3-cyclopropyl-phenyl | 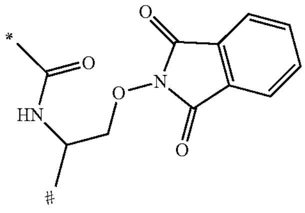 | (3,4-dimethyl-phenyl)methyl | 4.70[a] |

TABLE 7-continued

Compounds according to formula (3)

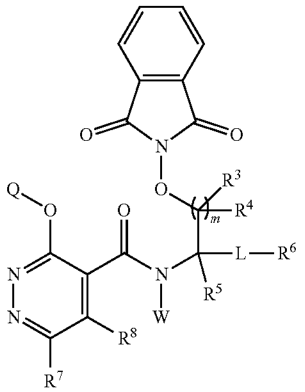

(3)

In table 7, "#" denotes the point of attachment to the L-$R^6$ group and "*" denotes the point of attachment to the pyridazin-4-yl group

| Ex-No | $R^7$ | $R^8$ | Q | 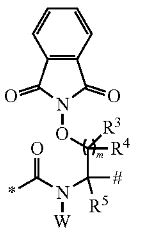 | L-$R^6$ | LogP |
|---|---|---|---|---|---|---|
| 3-54 | $CH_3$ | H | 3-cyclopropyl-phenyl | 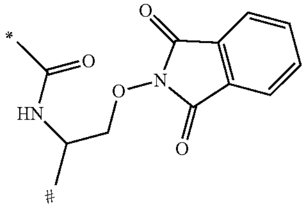 | (4-bromo-2-methyl-phenyl)methyl | 4.89[a] |
| 3-55 | $CH_3$ | H | 3-cyclopropyl-phenyl | 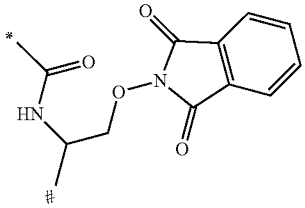 | (4-cyclopropyl-2-methyl-phenyl)methyl | 4.93[a] |
| 3-56 | $CH_3$ | H | 3-(difluoro-methyl)-2-fluorophenyl | 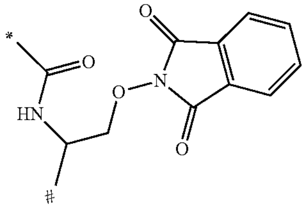 | (2-chloro-4-methyl-phenyl)methyl | 4.21[a] |

TABLE 7-continued

Compounds according to formula (3)

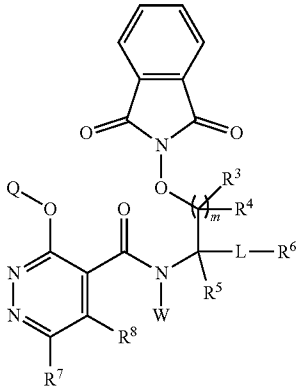

(3)

In table 7, "#" denotes the point of attachment to the L-$R^6$ group and "*" denotes the point of attachment to the pyridazin-4-yl group

| Ex-No | $R^7$ | $R^8$ | Q | 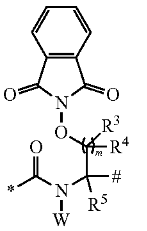 | L-$R^6$ | LogP |
|---|---|---|---|---|---|---|
| 3-57 | Cl | H | 3-cyclopropyl-2-fluorophenyl | 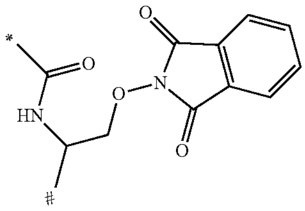 | (2,4-dimethyl-phenyl)methyl | 5.08[a] |
| 3-58 | $CH_3$ | H | 3-(difluoro-methyl)-2-fluorophenyl | 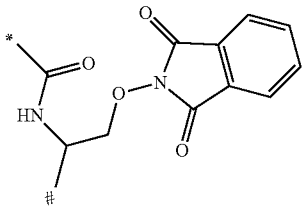 | (2,4-dimethyl-phenyl)methyl | 4.32[a] |

TABLE 8

3-01: $^1$H-NMR(400.2 MHz, $d_6$-DMSO):
δ = 9.2013 (1.7); 9.1803 (1.8); 7.8708 (0.7); 7.8670 (0.7); 7.8585 (1.5); 7.8488 (9.6); 7.8452 (9.6); 7.8356 (1.4); 7.8225 (7.4); 7.6798 (0.7); 7.6600 (2.0); 7.6410 (3.5); 7.5973 (2.0); 7.5781 (1.3); 7.5656 (1.5); 7.5462 (1.0); 7.2508 (3.2); 7.2272 (2.0); 7.2060 (1.6); 7.1876 (2.4); 7.1689 (1.0); 7.0456 (1.6); 7.0272 (1.3); 5.3251 (0.4); 5.3114 (0.5); 5.3030 (0.9); 5.2898 (0.8); 5.2812 (0.6); 5.2675 (0.4); 4.3016 (0.3); 4.2851 (0.7); 4.2755 (0.7); 4.2676 (0.6); 4.2593 (1.0); 4.2421 (0.5); 4.1981 (0.5); 4.1838 (1.1); 4.1690 (0.8); 4.1579 (0.7); 4.1428 (0.3); 3.3314 (29.1); 2.6054 (16.0); 2.5118 (9.4); 2.5076 (19.0); 2.5032 (25.5); 2.4987 (18.3); 2.4945 (8.7); 2.2157 (0.3); 2.1967 (0.7); 2.1778 (13.3); 2.1500 (1.0); 2.1357 (0.6); 2.1269 (0.8); 2.1124 (0.5); 2.0773 (5.6); 0.0091 (0.8); 0.0010 (20.0); −0.0072 (0.8)

3-02: $^1$H-NMR(400.0 MHz, $d_6$-DMSO):
δ = 8.9386 (2.3); 8.9181 (2.4); 7.9829 (11.3); 7.9103 (0.7); 7.8974 (2.2); 7.8882 (16.0); 7.8857 (15.5); 7.8636 (0.8); 7.8267 (0.4); 7.7634 (0.9); 7.7437 (2.8); 7.7241 (2.8); 7.7078 (3.4); 7.6885 (1.4); 7.6363 (3.9); 7.5592 (2.2); 7.5390 (1.7); 7.3224 (5.6); 7.3015 (6.7); 7.0934 (7.4); 7.0725 (6.2); 6.5891 (0.8); 4.4548 (0.8); 4.4431 (1.0); 4.4342 (1.0); 4.4215 (0.9); 4.4110 (0.6); 4.3400 (1.1); 4.3255 (1.0); 4.3146 (2.4); 4.3009 (1.8); 4.2808 (2.2); 4.2667 (2.0); 4.2555 (1.2); 4.2416 (0.9); 4.0558 (0.7); 4.0380 (2.2); 4.0201 (2.2); 4.0023 (0.8); 3.3237 (121.9); 3.2013 (1.2); 3.1903 (1.3); 3.1660 (1.5); 3.1555 (1.4); 2.8923 (1.4); 2.8681 (1.4); 2.8583 (1.3); 2.8339 (1.1); 2.6707 (1.0); 2.6664 (0.7); 2.5063 (135.6); 2.5019 (175.8); 2.4975 (126.0); 2.3333

TABLE 8-continued (0.8); 2.3287 (1.0); 2.3245 (0.7); 2.0572 (0.6); 2.0367 (0.5); 1.9888 (9.5); 1.3975 (8.3); 1.2410 (0.8); 1.2348 (0.8); 1.2248 (0.5); 1.2123 (0.5); 1.1927 (2.8); 1.1749 (5.4); 1.1570 (2.6); 0.1462 (0.6); 0.0079 (6.0); −0.0003 (140.6); −0.0085 (5.6); −0.1499 (0.6)

3-03: $^1$H-NMR(400.2 MHz, $d_6$-DMSO):
δ = 9.6166 (1.0); 9.5974 (1.0); 8.3148 (1.3); 7.8731 (16.0); 7.8040 (4.2); 7.7169 (0.4); 7.6979 (1.0); 7.6775 (0.9); 7.6601 (2.4); 7.6548 (2.5); 7.6383 (2.8); 7.6301 (1.8); 7.6220 (0.7); 7.6088 (1.9); 7.5768 (0.9); 7.5582 (0.6); 7.3653 (1.1); 7.3601 (1.1); 7.3443 (1.0); 7.3390 (1.0); 5.7550 (2.5); 5.7371 (0.8); 4.4326 (2.0); 4.4167 (1.9); 4.0379 (0.4); 4.0201 (0.4); 3.3194 (193.5); 2.6794 (1.2); 2.6749 (2.4); 2.6704 (3.2); 2.6659 (2.3); 2.6613 (1.2); 2.6538 (0.4); 2.6330 (9.9); 2.5238 (11.2); 2.5190 (17.7); 2.5105 (183.5); 2.5060 (360.1); 2.5014 (470.6); 2.4968 (346.0); 2.4924 (170.3); 2.3373 (1.0); 2.3328 (2.2); 2.3283 (3.0); 2.3237 (2.1); 2.3193 (1.0); 1.9885 (1.8); 1.1927 (0.5); 1.1749 (1.0); 1.1583 (1.0); −0.0002 (4.2)

3-04: $^1$H-NMR(400.2 MHz, $d_6$-DMSO):
δ = 9.7249 (0.7); 9.7057 (0.7); 8.1326 (3.5); 7.8726 (12.5); 7.7269 (0.8); 7.7083 (1.5); 7.6806 (0.9); 7.6675 (1.7); 7.6622 (2.0); 7.6500 (1.4); 7.6289 (1.6); 7.4007 (0.8); 7.3954 (0.8); 7.3796 (0.7); 7.3742 (0.7); 5.7426 (0.5); 5.7309 (0.4); 4.4549 (0.9); 4.4481 (0.9); 4.4435 (0.8); 4.4283 (0.7); 3.3216 (34.1); 2.6709 (0.4); 2.5244 (1.3); 2.5196 (2.1); 2.5109 (25.0); 2.5065 (49.9); 2.5019 (65.8); 2.4974 (48.8); 2.4929 (24.4); 2.3780 (0.3); 2.3288 (0.4); 1.9886 (0.4); 1.3978 (16.0); 0.1460 (0.5); 0.0079 (4.4); -0.0002 (106.0); −0.0085 (4.1); −0.1495 (0.5)

3-05: $^1$H-NMR(300.2 MHz, $d_6$-DMSO):
δ = 9.1301 (0.8); 9.1012 (0.9); 7.8984 (10.4); 7.7347 (0.9); 7.7088 (1.2); 7.6978 (1.3); 7.6715 (0.4); 7.5699 (1.3); 7.5259 (0.8); 7.5000 (0.6); 7.1130 (1.1); 7.0873 (1.2); 6.8433 (1.3); 6.5679 (0.7); 6.5445 (0.6); 4.5774 (0.3); 4.5625 (0.4); 4.3261 (1.6); 4.3094 (1.2); 3.3512 (16.0); 3.1072 (0.3); 3.0927 (0.4); 3.0589 (0.5); 3.0450 (0.4); 2.8591 (0.4); 2.8254 (0.4); 2.8107 (0.4); 2.5341 (1.4); 2.5282 (3.0); 2.5221 (4.0); 2.5161 (2.9); 2.5101 (1.4); 2.2850 (13.3); 2.0769 (5.5); 0.0193 (3.0)

3-06: $^1$H-NMR(300.2 MHz, CDCl3):
δ = 8.5193 (1.1); 8.0509 (2.1); 7.8044 (1.6); 7.7976 (1.6); 7.6930 (0.5); 7.6078 (0.9); 7.2987 (3.0); 7.2523 (0.4); 7.2269 (0.5); 7.0071 (0.5); 6.9614 (0.4); 5.3343 (0.4); 3.2164 (0.4); 2.9925 (16.0); 2.9173 (14.6); 2.8370 (4.8); 2.6222 (1.1); 2.4428 (2.4); 2.3666 (0.4); 2.2982 (2.3); 2.2361 (0.3); 1.5414 (0.3); 1.5164 (0.7); 1.4914 (0.8); 0.0327 (3.6)

3-07: $^1$H-NMR(300.2 MHz, CDCl3):
δ = 8.0489 (2.0); 7.8577 (0.6); 7.8491 (0.5); 7.8433 (1.0); 7.8354 (1.3); 7.8276 (3.8); 7.8167 (3.8); 7.8085 (1.1); 7.8007 (1.0); 7.7944 (0.5); 7.7861 (0.7); 7.6118 (0.6); 7.5848 (0.7); 7.5096 (1.4); 7.4824 (0.8); 7.4580 (1.9); 7.4337 (0.3); 7.4146 (0.6); 7.4070 (0.9); 7.4003 (0.4); 7.3830 (0.4); 7.2985 (8.8); 7.2674 (1.1); 7.2418 (1.3); 7.0242 (1.4); 6.9911 (0.8); 6.9654 (0.7); 4.6662 (0.3); 4.6445 (0.3); 4.6062 (0.9); 4.5956 (0.5); 4.5728 (0.8); 4.5622 (0.6); 4.1676 (0.6); 4.1582 (0.7); 4.1343 (0.6); 4.1249 (0.6); 3.7640 (0.4); 3.7422 (0.5); 3.7201 (0.4); 3.3161 (0.4); 3.2935 (0.4); 3.2700 (0.6); 3.2469 (0.7); 3.2166 (0.8); 3.1920 (0.7); 3.1365 (0.6); 3.1076 (0.6); 3.0907 (0.4); 3.0612 (0.4); 2.9940 (15.4); 2.9172 (13.9); 2.8368 (16.0); 2.6547 (8.3); 2.6132 (2.0); 2.4645 (6.6); 2.3675 (0.7); 2.2977 (11.9); 2.2374 (0.6); 1.6962 (1.0); 1.5315 (0.9); 1.5068 (1.9); 1.4828 (4.4); 1.4618 (3.7); 0.0334 (9.4)

3-08: $^1$H-NMR(300.2 MHz, CDCl3):
δ = 8.5184 (0.9); 8.4920 (1.0); 8.0672 (5.3); 7.8441 (1.7); 7.8339 (1.8); 7.8276 (1.7); 7.8236 (2.0); 7.8153 (4.1); 7.8009 (1.9); 7.7871 (4.1); 7.7781 (1.9); 7.7741 (1.6); 7.7692 (1.8); 7.7577 (1.7); 7.3651 (1.2); 7.3381 (2.7); 7.3112 (1.8); 7.2985 (10.5); 7.2613 (1.8); 7.2358 (2.1); 7.0980 (0.9); 7.0945 (1.2); 7.0906 (1.2); 7.0872 (1.2); 7.0711 (0.8); 7.0678 (0.9); 7.0634 (1.1); 7.0603 (1.0); 7.0321 (1.9); 7.0273 (2.5); 7.0200 (2.5); 7.0122 (2.2); 7.0072 (1.7); 6.9955 (2.2); 6.9355 (1.2); 6.9095 (1.0); 5.3370 (2.7); 4.6830 (0.4); 4.6704 (0.7); 4.6580 (0.6); 4.6447 (0.7); 4.6327 (0.4); 4.4702 (0.9); 4.4585 (0.8); 4.4382 (1.4); 4.4267 (1.2); 4.3362 (1.3); 4.3236 (1.3); 4.3043 (0.9); 4.2917 (0.8); 3.2161 (2.9); 3.1907 (2.6); 2.9952 (0.9); 2.9231 (0.8); 2.8411 (16.0); 2.7139 (15.1); 2.4400 (10.8); 2.2968 (10.2); 1.9694 (0.6); 1.9581 (0.6); 1.9415 (1.1); 1.9248 (0.6); 1.9135 (0.6); 1.6312 (10.6); 1.0180 (0.4); 1.0001 (1.7); 0.9931 (2.3); 0.9717 (1.7); 0.9652 (2.3); 0.9481 (0.5); 0.7797 (0.7); 0.7697 (1.4); 0.7624 (1.7); 0.7543 (2.1); 0.7470 (1.5); 0.7387 (1.2); 0.7273 (0.4); 0.1073 (0.5); 0.0475 (0.5); 0.0367 (11.2); 0.0258 (0.4)

3-09: $^1$H-NMR(300.2 MHz, CDCl3):
δ = 8.3935 (0.9); 8.3674 (0.9); 8.0770 (5.2); 7.8323 (1.5); 7.8203 (1.4); 7.8161 (1.4); 7.8115 (1.9); 7.8031 (4.1); 7.7909 (2.2); 7.7791 (4.1); 7.7704 (1.8); 7.7658 (1.5); 7.7615 (1.6); 7.7496 (1.6); 7.2986 (16.3); 7.2715 (1.8); 7.2556 (0.7); 7.2460 (2.1); 7.2284 (1.2); 7.2234 (1.0); 7.2053 (0.9); 7.1997 (0.9); 7.1458 (0.9); 7.1423 (0.8); 7.1193 (1.3); 7.1158 (1.4); 7.0927 (0.6); 7.0892 (0.6); 6.9800 (2.0); 6.9301 (1.1); 6.9049 (0.9); 6.8626 (0.7); 6.8576 (0.7); 6.8360 (1.2); 6.8144 (0.6); 6.8096 (0.5); 5.3380 (1.3); 4.7022 (0.4); 4.6897 (0.7); 4.6769 (0.6); 4.6641 (0.7); 4.6515 (0.4); 4.4842 (0.8); 4.4721 (0.8); 4.4517 (1.4); 4.4397 (1.2); 4.3551 (1.3); 4.3417 (1.2); 4.3227 (0.9); 4.3093 (0.8); 3.2482 (2.8); 3.2231 (2.7); 2.8414 (4.1); 2.7194 (14.8); 2.4454 (10.3); 2.2797 (9.7); 2.1626 (0.4); 2.1518 (0.5); 2.1346 (0.9); 2.1171 (0.5); 2.1064 (0.5); 1.6071 (16.0); 1.0688 (0.4); 1.0567 (1.6); 1.0496 (1.8); 1.0386 (0.8); 1.0349 (0.8); 1.0281 (1.7); 1.0213 (1.6); 1.0093 (0.5); 0.8250 (0.9); 0.8113 (1.6); 0.8077 (1.9); 0.8034 (1.6); 0.7942 (1.7); 0.7912 (1.6); 0.7862 (1.3); 0.7740 (0.6); 0.0477 (0.6); 0.0369 (17.7); 0.0259 (0.7)

3-10: $^1$H-NMR(300.2 MHz, CDCl3):
δ = 8.3459 (0.6); 8.3201 (0.6); 8.2535 (4.6); 7.8416 (0.7); 7.8331 (0.6); 7.8270 (1.2); 7.8192 (1.4); 7.8112 (4.6); 7.8007 (4.6); 7.7928 (1.3); 7.7849 (1.2); 7.7787 (0.5); 7.7703 (0.7); 7.6720 (1.3); 7.6426 (1.0); 7.6226 (3.0); 7.6197 (2.5); 7.5451 (0.6); 7.5339 (0.8); 7.5269 (0.7); 7.5134 (0.6); 7.2986 (12.7); 7.1382 (1.6); 7.0922 (0.5); 7.0866 (0.4); 7.0668 (1.2); 7.0616 (1.2); 7.0375 (1.9); 7.0120 (0.7); 4.6552 (0.5); 4.6439 (0.4); 4.6320 (0.4); 4.4499 (0.6); 4.4363 (0.6); 4.4170 (1.1); 4.4035 (0.9); 4.3337 (1.0); 4.3212 (1.0); 4.3009 (0.6); 4.2883 (0.6); 4.1961 (0.4); 4.1722 (1.2); 4.1484 (1.2); 4.1247 (0.4); 3.1786 (1.0); 3.1563 (1.8); 3.1301 (0.9); 2.2265 (16.0); 2.0835 (5.2); 1.5879 (9.2); 1.3216 (1.6); 1.2979 (3.3); 1.2740 (1.4); 0.9204 (0.7); 0.1083 (3.2); 0.0491 (0.5); 0.0384 (15.9); 0.0275 (0.6)

3-11: $^1$H-NMR(300.2 MHz, CDCl3):
δ = 8.4360 (0.7); 8.4091 (0.7); 8.2289 (5.4); 8.2202 (0.5); 7.8510 (0.6); 7.8442 (0.5); 7.8358 (1.2); 7.8277 (2.0); 7.8215 (5.9); 7.8130 (5.7); 7.8070 (2.2); 7.7987 (1.2); 7.7906 (0.4); 7.7837 (0.6); 7.7127 (1.4); 7.6795 (0.4); 7.6542 (1.0); 7.6315 (3.4); 7.6136 (0.4); 7.5532 (0.8); 7.5404 (2.5); 7.5382 (2.6); 7.5232 (0.8); 7.5157 (0.5); 7.3707 (5.5); 7.3657 (3.0); 7.2987 (20.3); 4.8371 (0.4); 4.8240 (0.6); 4.8113 (0.5); 4.7986 (0.6); 4.7868 (0.4); 4.5119 (0.8); 4.4996 (0.8); 4.4786 (1.1); 4.4663 (1.0); 4.3421 (1.0); 4.3306 (1.1); 4.3088 (0.8); 4.2973 (0.8); 4.1720 (0.6); 4.1482 (0.7); 3.4516 (0.6); 3.4246 (0.6); 3.4053 (1.0); 3.3787 (1.0); 3.3038 (1.0); 3.2791 (1.0); 3.2578 (0.6); 3.2332 (0.6); 2.6132 (0.4); 2.5489 (0.4); 2.0833 (2.9); 1.5843 (16.0); 1.3214 (1.0); 1.2977 (2.1); 1.2739 (0.8); 0.9201 (0.7); 0.1078 (1.1); 0.0488 (0.9); 0.0381 (25.5); 0.0272 (0.8)

3-12: $^1$H-NMR(300.2 MHz, CDCl3):
δ = 8.5824 (0.7); 8.5563 (0.8); 8.2650 (5.2); 7.8456 (0.6); 7.8398 (0.4); 7.8297 (1.0); 7.8163 (6.2); 7.8106 (6.4); 7.7973 (1.1); 7.7806 (0.5); 7.7395 (1.5); 7.6447 (1.2); 7.6215 (3.6); 7.6005 (0.4); 7.5604 (0.9); 7.5517 (1.4); 7.5444 (0.8); 7.5293 (0.8); 7.3595 (2.1); 7.2986 (26.4); 4.6233 (0.5); 4.6048 (0.5); 4.5966 (0.5); 4.4896 (0.9); 4.4791 (0.8); 4.4573 (1.1); 4.4470 (1.1); 4.2482 (1.0); 4.2381 (1.0); 4.2164 (0.8); 4.2059 (0.8); 4.1722 (0.5); 4.1484 (0.5); 3.2868 (0.5); 3.2647 (0.5); 3.2407 (1.0); 3.2189 (1.0); 3.1810 (1.1); 3.1506 (1.1); 3.1352 (0.5); 3.1043 (0.5); 2.5095 (0.5); 2.4966 (1.5); 2.4845 (10.0); 2.0836 (2.1); 1.5811 (16.0); 1.3216 (0.7); 1.2978 (1.6); 1.2741 (0.6); 0.9202 (0.5); 0.1079 (0.9); 0.0489 (1.0); 0.0382 (30.9); 0.0272 (1.2)

3-13: $^1$H-NMR(300.2 MHz, $d_6$-DMSO):
δ = 7.9942 (1.7); 7.8900 (3.4); 7.8241 (1.3); 7.3116 (0.5); 7.1359 (0.4); 7.1108 (0.4); 6.8937 (0.5); 4.3518 (0.6); 4.3332 (0.5); 3.3406 (16.0); 2.5340 (0.8); 2.5280 (1.7); 2.5219 (2.4); 2.5158 (1.7); 2.5098 (0.8); 2.3102 (2.1); 2.2774 (0.6); 2.1694 (0.6); 2.1089 (2.0); 0.0201 (2.1)

TABLE 8-continued 3-14: $^{1}$H-NMR(300.2 MHz, CDCl3):
δ = 8.2952 (0.8); 8.2683 (0.8); 8.0574 (0.3); 8.0321 (4.6); 7.8452 (1.4); 7.8334 (1.4); 7.8290 (1.3); 7.8246 (1.8); 7.8158 (3.8); 7.8037 (2.0); 7.7914 (3.6); 7.7830 (1.7); 7.7784 (1.4); 7.7740 (1.4); 7.7622 (1.4); 7.5135 (2.2); 7.5071 (2.4); 7.3991 (1.4); 7.3718 (2.8); 7.3254 (1.8); 7.3189 (1.7); 7.2990 (17.5); 7.2573 (0.5); 7.2517 (0.5); 7.2301 (1.1); 7.2251 (0.9); 7.2073 (0.9); 7.2014 (0.8); 7.1604 (0.8); 7.1572 (0.8); 7.1340 (1.2); 7.1306 (1.3); 7.1073 (0.6); 7.1040 (0.6); 6.8765 (0.6); 6.8716 (0.6); 6.8500 (1.0); 6.8287 (0.5); 6.8237 (0.5); 5.3373 (1.2); 4.8609 (0.4); 4.8473 (0.6); 4.8347 (0.5); 4.8216 (0.6); 4.8093 (0.4); 4.5003 (0.6); 4.4874 (0.6); 4.4667 (1.3); 4.4541 (1.2); 4.4158 (1.3); 4.4017 (1.3); 4.3822 (0.7); 4.3682 (0.6); 3.3929 (2.7); 3.3677 (2.4); 2.9941 (2.9); 2.9213 (2.5); 2.8413 (12.6); 2.7158 (13.2); 2.7062 (1.4); 2.6599 (0.4); 2.1703 (0.4); 2.1600 (0.4); 2.1427 (0.8); 2.1259 (0.5); 2.1146 (0.4); 1.6004 (16.0); 1.0821 (0.6); 1.0678 (1.3); 1.0607 (1.6); 1.0541 (1.0); 1.0466 (1.0); 1.0391 (1.5); 1.0323 (1.5); 1.0184 (0.8); 0.8339 (0.8); 0.8198 (1.6); 0.8158 (1.7); 0.8127 (1.6); 0.8025 (1.6); 0.7981 (1.7); 0.7813 (0.6); 0.0486 (0.7); 0.0378 (22.2); 0.0268 (0.8)
3-15: $^{1}$H-NMR(300.2 MHz, CDCl3):
δ = 8.2283 (0.6); 8.2029 (0.6); 8.0706 (3.3); 8.0561 (0.7); 7.8436 (1.1); 7.8329 (1.2); 7.8269 (1.1); 7.8235 (1.3); 7.8146 (2.5); 7.8015 (0.6); 7.7940 (0.6); 7.7812 (2.5); 7.7722 (1.3); 7.7688 (1.2); 7.7631 (1.3); 7.7521 (1.3); 7.2986 (7.3); 7.2175 (0.3); 7.2119 (0.4); 7.1904 (0.8); 7.1851 (0.7); 7.1681 (0.8); 7.1616 (0.9); 7.1495 (1.6); 7.1146 (1.0); 7.1057 (0.7); 7.0871 (0.6); 7.0800 (0.9); 6.9841 (1.3); 6.9585 (1.0); 6.8660 (0.5); 6.8612 (0.5); 6.8392 (0.8); 6.8189 (0.4); 6.8131 (0.3); 5.3360 (1.4); 4.7020 (0.4); 4.6881 (0.3); 4.6781 (0.4); 4.4263 (0.4); 4.4124 (0.4); 4.3932 (1.1); 4.3794 (1.0); 4.3630 (1.1); 4.3467 (1.0); 4.3298 (0.4); 4.3135 (0.4); 3.2064 (1.5); 3.1830 (1.5); 2.9932 (5.3); 2.9216 (4.5); 2.9204 (4.4); 2.8405 (16.0); 2.7453 (0.7); 2.7189 (9.4); 2.1968 (9.4); 2.1739 (0.7); 2.1525 (0.7); 2.1291 (0.7); 2.1121 (0.4); 2.1006 (0.3); 2.0820 (0.6); 1.6299 (5.6); 1.2962 (0.4); 1.0600 (1.1); 1.0530 (1.2); 1.0425 (0.7); 1.0383 (0.6); 1.0314 (1.1); 1.0248 (1.1); 1.0140 (0.4); 1.0104 (0.4); 0.8251 (0.6); 0.8090 (1.2); 0.8028 (1.1); 0.7930 (1.3); 0.7860 (0.8); 0.7756 (0.4); 0.1072 (2.2); 0.0476 (0.4); 0.0369 (8.9)
3-16: $^{1}$H-NMR(300.2 MHz, CDCl3):
δ = 8.5044 (1.3); 8.4786 (1.3); 8.2554 (10.1); 7.8397 (1.0); 7.8320 (0.8); 7.8243 (2.0); 7.8160 (3.4); 7.8101 (10.9); 7.8014 (10.2); 7.7948 (3.0); 7.7866 (2.1); 7.7787 (0.7); 7.7718 (1.0); 7.7066 (2.7); 7.6685 (0.4); 7.6430 (1.8); 7.6206 (6.2); 7.6039 (0.6); 7.5861 (0.3); 7.5687 (1.3); 7.5593 (1.9); 7.5522 (1.3); 7.5449 (0.6); 7.5376 (1.0); 7.5299 (0.6); 7.2982 (12.4); 7.2596 (2.6); 7.2341 (3.0); 7.0138 (3.1); 6.9688 (1.7); 6.9432 (1.4); 4.6767 (0.4); 4.6481 (0.8); 4.6381 (0.7); 4.6256 (0.8); 4.5991 (0.4); 4.5149 (1.5); 4.5033 (1.3); 4.4825 (2.0); 4.4711 (1.7); 4.2888 (1.7); 4.2779 (1.7); 4.2565 (1.4); 4.2456 (1.3); 3.2916 (0.7); 3.2692 (0.7); 3.2458 (1.6); 3.2232 (1.5); 3.1837 (1.6); 3.1546 (1.6); 3.1376 (0.8); 3.1086 (0.7); 2.4490 (16.0); 2.3037 (15.1); 2.0451 (5.9); 1.6237 (1.1); 0.0481 (0.4); 0.0373 (12.0); 0.0264 (0.4)
3-17: $^{1}$H-NMR(300.2 MHz, CDCl3):
δ = 8.5172 (1.5); 8.4917 (1.4); 8.2586 (9.3); 8.0646 (0.6); 8.0551 (0.8); 7.8696 (0.4); 7.8382 (1.2); 7.8310 (0.9); 7.8227 (2.2); 7.8144 (3.9); 7.8086 (11.0); 7.8007 (10.7); 7.7867 (2.2); 7.7781 (1.3); 7.7711 (1.1); 7.7196 (2.8); 7.7050 (0.6); 7.6959 (0.5); 7.6857 (0.6); 7.6669 (0.4); 7.6409 (1.8); 7.6185 (6.6); 7.5974 (0.7); 7.5827 (0.4); 7.5646 (1.6); 7.5558 (2.4); 7.5488 (1.6); 7.5415 (0.9); 7.5334 (1.2); 7.5259 (1.0); 7.5201 (0.8); 7.2987 (21.4); 7.2652 (2.8); 7.2392 (3.2); 7.1880 (0.3); 6.9717 (0.4); 6.9096 (3.4); 6.8589 (1.9); 6.8527 (1.9); 6.8329 (1.7); 6.8273 (1.4); 4.6575 (0.4); 4.6279 (0.8); 4.6183 (0.7); 4.6079 (0.8); 4.5797 (0.4); 4.5057 (1.6); 4.4942 (1.4); 4.4734 (2.0); 4.4621 (1.7); 4.4249 (0.4); 4.2767 (1.8); 4.2659 (1.7); 4.2445 (1.5); 4.2337 (1.2); 3.7987 (0.3); 3.7766 (0.9); 3.7543 (1.2); 3.7321 (1.0); 3.7098 (0.4); 3.2814 (0.8); 3.2596 (0.9); 3.2355 (1.7); 3.2213 (1.0); 3.2133 (1.8); 3.1969 (1.8); 3.1717 (3.4); 3.1415 (1.8); 3.1248 (1.0); 3.0951 (0.8); 2.9954 (6.3); 2.9213 (5.5); 2.8406 (5.3); 2.6207 (9.5); 2.4963 (1.1); 2.4786 (0.7); 2.4518 (16.0); 2.4081 (0.4); 2.3767 (0.4); 2.3647 (2.0); 2.0977 (0.3); 1.8906 (0.8); 1.8740 (1.2); 1.8628 (1.3); 1.8461 (2.0); 1.8291 (1.4); 1.8180 (1.2); 1.8011 (0.8); 1.7872 (0.5); 1.7693 (0.4); 1.5298 (2.1); 1.5051 (4.7); 1.4802 (5.1); 0.9920 (1.1); 0.9772 (2.9); 0.9705 (3.2); 0.9564 (1.8); 0.9489 (3.2); 0.9423 (2.9); 0.9285 (1.4); 0.9107 (0.5); 0.9041 (0.5); 0.8822 (0.4); 0.8765 (0.4); 0.7041 (1.4); 0.6896 (3.3); 0.6837 (3.1); 0.6730 (3.1); 0.6676 (3.2); 0.6517 (1.2); 0.6304 (0.4); 0.6126 (0.4); 0.1075 (1.0); 0.0478 (0.8); 0.0370 (26.6); 0.0261 (1.1)
3-18: $^{1}$H-NMR(300.2 MHz, CDCl3):
δ = 8.5153 (0.4); 8.3645 (2.0); 8.3380 (2.0); 8.2481 (0.5); 8.2221 (12.5); 8.1835 (0.4); 8.0544 (1.2); 8.0320 (0.6); 7.8893 (0.3); 7.8796 (0.4); 7.8705 (0.6); 7.8413 (2.0); 7.8338 (1.7); 7.8265 (3.8); 7.8183 (5.4); 7.8117 (16.0); 7.8023 (15.4); 7.7958 (4.8); 7.7874 (3.6); 7.7725 (1.8); 7.7630 (0.6); 7.7458 (0.3); 7.7219 (0.7); 7.7113 (0.5); 7.6912 (4.0); 7.6497 (2.9); 7.6280 (9.2); 7.6119 (1.1); 7.5795 (1.0); 7.5622 (2.2); 7.5527 (3.2); 7.5456 (2.3); 7.5305 (1.9); 7.5233 (1.5); 7.5082 (1.0); 7.4973 (0.7); 7.4755 (0.5); 7.4458 (0.4); 7.4342 (0.4); 7.3721 (0.4); 7.3634 (0.4); 7.3538 (0.4); 7.3448 (0.6); 7.3314 (4.6); 7.3046 (6.2); 7.2988 (33.3); 7.2393 (0.5); 7.2295 (0.7); 7.2179 (0.5); 7.2109 (0.6); 7.1984 (0.6); 7.0501 (5.4); 7.0443 (5.6); 7.0276 (0.9); 6.9972 (0.5); 6.9092 (2.9); 6.9033 (2.8); 6.8830 (2.6); 6.8772 (2.5); 4.8343 (0.6); 4.8215 (0.9); 4.8097 (1.4); 4.7972 (1.3); 4.7844 (1.5); 4.7712 (1.0); 4.7589 (0.6); 4.7470 (0.4); 4.5040 (1.9); 4.4907 (1.8); 4.4708 (3.0); 4.4575 (2.7); 4.4039 (0.5); 4.3756 (2.7); 4.3637 (2.8); 4.3423 (1.9); 4.3305 (1.8); 3.7984 (0.6); 3.7764 (1.7); 3.7541 (2.3); 3.7318 (1.8); 3.7096 (0.8); 3.4247 (1.4); 3.3983 (1.3); 3.3785 (2.5); 3.3520 (2.7); 3.3253 (0.3); 3.2891 (2.4); 3.2652 (2.5); 3.2428 (1.5); 3.2174 (2.0); 3.1917 (3.2); 3.1669 (3.3); 3.1421 (1.2); 2.9949 (9.6); 2.9666 (0.6); 2.9204 (8.4); 2.8396 (8.7); 2.6407 (9.4); 2.0914 (0.3); 2.0646 (0.3); 2.0425 (0.5); 1.9762 (0.5); 1.9418 (0.5); 1.9280 (0.5); 1.9139 (0.6); 1.8976 (0.6); 1.8809 (1.0); 1.8645 (1.5); 1.8534 (1.6); 1.8364 (2.6); 1.8197 (1.7); 1.8088 (1.6); 1.7919 (1.1); 1.7652 (0.4); 1.5233 (3.6); 1.4985 (8.6); 1.4737 (10.0); 1.3849 (0.4); 1.2901 (0.5); 1.0269 (1.5); 1.0112 (4.0); 1.0049 (4.5); 0.9899 (2.4); 0.9831 (4.5); 0.9768 (4.3); 0.9621 (2.1); 0.9545 (0.9); 0.9470 (0.8); 0.9322 (0.5); 0.9254 (0.5); 0.9175 (0.5); 0.7240 (0.4); 0.6990 (1.9); 0.6835 (5.0); 0.6781 (4.5); 0.6672 (4.4); 0.6616 (5.2); 0.6455 (1.9); 0.6253 (0.8); 0.6178 (0.6); 0.1064 (1.5); 0.0470 (0.9); 0.0361 (40.4); 0.0254 (2.2)
3-19: $^{1}$H-NMR(300.2 MHz, CDCl3):
δ = 8.3834 (1.0); 8.3572 (1.0); 8.2244 (6.6); 8.2184 (1.0); 8.0533 (0.7); 8.0347 (0.4); 7.8415 (1.0); 7.8338 (0.8); 7.8267 (2.0); 7.8186 (2.8); 7.8118 (8.5); 7.8023 (8.3); 7.7958 (2.7); 7.7874 (2.0); 7.7725 (1.0); 7.7187 (0.4); 7.7010 (2.1); 7.6742 (0.5); 7.6484 (1.4); 7.6268 (4.9); 7.6117 (0.7); 7.5862 (0.5); 7.5803 (0.5); 7.5682 (1.3); 7.5593 (1.8); 7.5522 (1.2); 7.5458 (0.8); 7.5372 (1.0); 7.4990 (0.5); 7.3813 (2.2); 7.3551 (2.7); 7.2988 (14.5); 7.2731 (0.4); 7.2231 (2.6); 7.2176 (3.0); 7.1983 (0.5); 7.1925 (0.4); 7.1720 (0.4); 7.1631 (0.4); 7.0740 (1.5); 7.0684 (1.4); 7.0479 (1.3); 7.0421 (1.2); 4.8313 (0.5); 4.8191 (0.8); 4.8063 (0.7); 4.7937 (0.7); 4.7806 (0.5); 4.5133 (1.0); 4.4996 (0.9); 4.4798 (1.5); 4.4662 (1.4); 4.4027 (0.4); 4.3904 (1.4); 4.3786 (1.5); 4.3571 (0.9); 4.3453 (0.9); 3.7957 (0.4); 3.7734 (0.9); 3.7511 (1.2); 3.7289 (0.9); 3.7067 (0.4); 3.4394 (0.8); 3.4129 (0.8); 3.3932 (1.3); 3.3668 (1.3); 3.3043 (1.3); 3.2800 (1.3); 3.2581 (0.8); 3.2337 (0.7); 3.2126 (0.6); 3.1879 (1.7); 3.1631 (1.7); 3.1383 (0.6); 2.9943 (5.7); 2.9193 (5.0); 2.8861 (0.9); 2.8632 (1.2); 2.8394 (6.1); 2.8170 (0.5); 2.6203 (5.5); 1.5190 (1.9); 1.4943 (4.2); 1.4697 (5.3); 1.4517 (4.0); 1.2950 (0.9); 1.2796 (0.7); 1.2721 (1.0); 1.2459 (16.0); 1.2228 (15.7); 1.2064 (1.5); 1.2000 (1.2); 1.1897 (1.0); 1.1832 (1.0); 1.1769 (0.9); 0.9453 (0.4); 0.1066 (0.7); 0.0467 (0.6); 0.0359 (17.5); 0.0250 (0.6)
3-20: $^{1}$H-NMR(300.2 MHz, CDCl3):
δ = 8.4697 (0.7); 8.4436 (0.7); 7.9844 (5.3); 7.7663 (1.0); 7.7580 (0.8); 7.7517 (1.8); 7.7439 (2.2); 7.7359 (7.2); 7.7257 (7.0); 7.7180 (2.0); 7.7100 (1.8); 7.7038 (0.8); 7.6954 (1.0); 7.5276 (0.6); 7.5015 (1.8); 7.4751 (1.4); 7.4450 (2.0); 7.3938 (1.6); 7.3695 (2.1); 7.3469 (0.9); 7.3432 (0.8); 7.2979 (3.9); 7.1631 (1.9); 7.1376 (2.2); 6.9112 (2.3); 6.8547 (1.3); 6.8273 (2.2);

TABLE 8-continued 6.6395 (2.4); 6.4518 (1.2); 5.2682 (1.3); 4.5955 (0.4); 4.5852 (0.6); 4.5716 (0.6); 4.5593 (0.6); 4.5462 (0.4); 4.4073 (1.0); 4.3950 (0.9); 4.3752 (1.4); 4.3629 (1.3); 4.2464 (1.3); 4.2346 (1.3); 4.2144 (1.0); 4.2026 (0.9); 3.5649 (4.7); 3.3193 (0.7); 3.1593 (0.3); 3.1370 (1.5); 3.1183 (1.8); 3.1149 (1.8); 3.0922 (1.4); 3.0732 (0.3); 2.7622 (1.1); 2.6423 (16.0); 2.3490 (11.7); 2.2027 (11.1); 2.0010 (0.9); 1.2133 (0.5); −0.0536 (3.9)

3-21: $^1$H-NMR(300.2 MHz, CDCl3):
δ = 8.5383 (1.0); 8.5126 (1.2); 8.2637 (6.8); 8.0688 (0.4); 8.0535 (0.8); 7.8386 (0.8); 7.8321 (0.7); 7.8237 (1.6); 7.8157 (2.6); 7.8095 (8.0); 7.8012 (7.9); 7.7871 (1.7); 7.7802 (1.0); 7.7718 (0.9); 7.7630 (0.4); 7.7298 (2.1); 7.7134 (0.6); 7.7035 (0.4); 7.6953 (0.5); 7.6850 (0.4); 7.6403 (1.4); 7.6178 (4.7); 7.5955 (0.5); 7.5909 (0.5); 7.5723 (1.0); 7.5635 (1.8); 7.5564 (1.2); 7.5412 (1.0); 7.5050 (0.4); 7.3062 (2.1); 7.2988 (12.5); 7.2806 (2.4); 7.0620 (2.5); 7.0464 (0.4); 7.0309 (1.5); 7.0247 (1.4); 7.0050 (1.2); 6.9989 (1.2); 4.6443 (0.6); 4.6339 (0.5); 4.6263 (0.6); 4.6185 (0.6); 4.5212 (1.2); 4.5094 (1.0); 4.4889 (1.5); 4.4772 (1.2); 4.2919 (1.2); 4.2812 (1.2); 4.2596 (1.0); 4.2491 (0.9); 3.7971 (0.3); 3.7748 (0.8); 3.7525 (1.2); 3.7303 (0.9); 3.7080 (0.4); 3.2940 (0.6); 3.2722 (0.6); 3.2479 (1.2); 3.2264 (1.2); 3.2152 (0.7); 3.1902 (1.8); 3.1807 (1.4); 3.1655 (1.8); 3.1509 (1.3); 3.1409 (0.8); 3.1355 (0.7); 3.1048 (0.6); 2.9949 (6.2); 2.9197 (5.3); 2.8876 (1.2); 2.8646 (1.4); 2.8400 (6.3); 2.8190 (0.5); 2.6042 (7.6); 2.4936 (1.1); 2.4803 (11.5); 2.4626 (0.6); 2.4357 (0.4); 2.3897 (1.5); 1.5205 (1.9); 1.4958 (4.2); 1.4712 (5.2); 1.4532 (3.7); 1.2988 (0.8); 1.2859 (0.7); 1.2757 (1.3); 1.2620 (16.0); 1.2390 (15.6); 1.2178 (0.9); 1.2052 (1.2); 1.1983 (1.2); 1.1822 (1.1); 1.1753 (1.1); 0.1075 (0.6); 0.0474 (0.5); 0.0366 (14.6); 0.0257 (0.6)

3-22: $^1$H-NMR(300.2 MHz, CDCl3):
δ = 8.4361 (0.7); 8.4090 (0.7); 8.2269 (4.4); 7.8510 (0.5); 7.8437 (0.4); 7.8358 (1.1); 7.8276 (1.8); 7.8214 (5.4); 7.8128 (5.3); 7.7983 (1.1); 7.7905 (0.4); 7.7832 (0.5); 7.7082 (1.4); 7.6522 (1.0); 7.6301 (3.2); 7.5558 (0.6); 7.5470 (1.1); 7.5399 (0.7); 7.5244 (0.7); 7.4510 (1.6); 7.4235 (2.0); 7.3909 (1.9); 7.3839 (2.1); 7.2990 (8.4); 7.2317 (1.3); 7.2246 (1.2); 7.2043 (1.0); 7.1972 (0.9); 4.8258 (0.5); 4.8132 (0.5); 4.8002 (0.6); 4.7875 (0.3); 4.5140 (0.7); 4.5016 (0.7); 4.4807 (1.0); 4.4684 (0.9); 4.3435 (1.0); 4.3321 (1.0); 4.3104 (0.7); 4.2989 (0.7); 3.4610 (0.5); 3.4343 (0.5); 3.4151 (0.9); 3.3885 (0.9); 3.3165 (0.9); 3.2920 (0.9); 3.2705 (0.5); 3.2460 (0.5); 1.6008 (16.0); 1.2972 (0.9); 0.9194 (0.7); 0.1080 (2.2); 0.0376 (6.8)

3-23: $^1$H-NMR(300.2 MHz, CDCl3):
δ = 10.3413 (0.5); 8.7359 (0.5); 8.7298 (0.5); 8.7114 (0.5); 8.7038 (0.5); 8.6767 (3.8); 8.6706 (3.9); 8.6511 (3.8); 8.6433 (3.9); 8.4418 (1.3); 8.4155 (1.3); 8.2757 (0.9); 8.2584 (10.0); 7.9782 (3.0); 7.9711 (4.2); 7.9640 (2.6); 7.8533 (1.5); 7.8446 (1.1); 7.8390 (2.3); 7.8312 (2.9); 7.8228 (8.5); 7.8111 (8.6); 7.8029 (2.9); 7.7951 (2.7); 7.7896 (1.6); 7.7809 (2.5); 7.7694 (0.7); 7.7570 (1.0); 7.7484 (0.5); 7.7391 (0.4); 7.7282 (0.4); 7.2989 (23.3); 7.2605 (2.6); 7.2351 (3.1); 7.0281 (3.1); 6.9991 (1.8); 6.9679 (1.5); 6.9404 (0.6); 6.8727 (0.3); 5.3379 (4.1); 4.6678 (0.3); 4.6383 (0.8); 4.6269 (0.8); 4.6120 (0.8); 4.5897 (0.6); 4.5368 (1.6); 4.5254 (1.3); 4.5042 (1.9); 4.4928 (1.6); 4.2507 (1.7); 4.2403 (1.8); 4.2181 (1.4); 4.2077 (1.3); 3.2966 (0.8); 3.2751 (0.8); 3.2511 (1.7); 3.2290 (1.7); 3.1708 (1.6); 3.1409 (1.5); 3.1251 (0.8); 3.0949 (0.8); 2.4561 (16.0); 2.3220 (15.1); 2.2705 (2.4); 2.2573 (2.8); 1.6017 (12.0); 0.0485 (1.0); 0.0378 (30.5); 0.0268 (1.1)

3-24: $^1$H-NMR(300.2 MHz, CDCl3):
δ = 8.6979 (1.3); 8.6890 (1.3); 8.4932 (0.6); 8.4672 (0.6); 8.2986 (4.6); 8.2361 (0.6); 8.2166 (0.5); 8.2090 (1.6); 8.1998 (1.6); 7.8517 (0.4); 7.8464 (0.4); 7.8136 (16.0); 7.7975 (0.5); 7.7936 (0.4); 7.7796 (0.3); 7.2988 (12.2); 7.2799 (1.3); 7.2546 (1.5); 7.0399 (2.0); 7.0234 (1.0); 6.9976 (0.7); 5.3381 (1.6); 4.6400 (0.3); 4.6294 (0.4); 4.6128 (0.4); 4.6032 (0.4); 4.5526 (0.8); 4.5414 (0.6); 4.5205 (0.9); 4.5093 (0.7); 4.1878 (0.8); 4.1781 (0.8); 4.1559 (0.7); 4.1461 (0.6); 3.3000 (0.4); 3.2795 (0.4); 3.2542 (0.7); 3.2339 (0.7); 3.1476 (0.8); 3.1160 (0.7); 3.1016 (0.4); 3.0704 (0.4); 2.4713 (8.5); 2.4597 (1.1); 2.3247 (8.2); 1.6005 (1.8); 1.3154 (0.5); 1.2945 (0.6); 0.0487 (0.5); 0.0378 (15.3); 0.0269 (0.5)

3-25: $^1$H-NMR(300.2 MHz, CDCl3):
δ = 7.8863 (1.7); 7.8756 (2.0); 7.8698 (1.8); 7.8660 (2.2); 7.8573 (4.5); 7.8425 (1.8); 7.8281 (4.4); 7.8191 (2.2); 7.8158 (1.9); 7.8100 (2.0); 7.7989 (1.8); 7.4866 (2.8); 7.4801 (3.0); 7.3678 (2.1); 7.3403 (4.1); 7.3100 (1.5); 7.2989 (18.0); 7.2463 (1.9); 7.2398 (1.8); 7.2190 (1.3); 7.2125 (1.2); 7.0709 (3.0); 7.0588 (1.8); 7.0557 (1.9); 7.0511 (1.9); 7.0460 (3.1); 7.0242 (0.4); 6.8095 (0.7); 6.7968 (0.6); 6.7884 (1.1); 6.7773 (1.2); 6.7660 (0.6); 6.7555 (0.6); 5.3380 (1.8); 4.8528 (0.5); 4.8445 (0.6); 4.8250 (0.6); 4.6138 (1.1); 4.6002 (1.0); 4.5789 (1.4); 4.5656 (1.2); 4.3315 (1.3); 4.3200 (1.3); 4.2968 (1.1); 4.2853 (1.0); 3.4323 (0.7); 3.4025 (0.7); 3.3853 (1.2); 3.3557 (1.2); 3.2941 (1.2); 3.2729 (1.2); 3.2474 (0.7); 3.2264 (0.6); 2.8395 (1.1); 2.4032 (16.0); 2.3576 (1.1); 2.0614 (0.5); 2.0505 (0.6); 2.0332 (1.1); 2.0161 (0.6); 2.0050 (0.6); 1.6025 (15.2); 1.2916 (0.4); 1.0292 (0.7); 1.0150 (1.6); 1.0077 (1.9); 0.9935 (1.2); 0.9863 (1.7); 0.9793 (1.9); 0.9653 (0.9); 0.7820 (0.9); 0.7674 (2.1); 0.7625 (2.2); 0.7503 (2.1); 0.7448 (2.4); 0.7289 (0.8); 0.1073 (7.5); 0.0482 (0.8); 0.0375 (22.5); 0.0266 (0.9)

3-26: $^1$H-NMR(300.2 MHz, $d_6$-DMSO):
δ = 7.9029 (1.6); 7.1243 (0.4); 7.1184 (0.5); 3.3492 (16.0); 2.5345 (0.8); 2.5287 (1.7); 2.5227 (2.4); 2.5167 (1.7); 2.5109 (0.8); 2.2965 (1.6); 0.0206 (1.6)

3-27: $^1$H-NMR(300.2 MHz, CDCl3):
δ = 8.4821 (0.4); 8.4555 (0.4); 8.2039 (2.9); 8.0482 (1.8); 7.8413 (0.7); 7.8316 (0.6); 7.8280 (0.8); 7.8257 (0.8); 7.8201 (1.0); 7.8117 (2.3); 7.8051 (1.1); 7.7992 (1.3); 7.7927 (2.2); 7.7845 (1.1); 7.7791 (0.8); 7.7759 (0.8); 7.7721 (0.9); 7.7629 (1.0); 7.7533 (0.4); 7.3814 (0.5); 7.3554 (1.1); 7.3292 (0.7); 7.2988 (3.2); 7.2373 (0.8); 7.2118 (1.0); 7.0975 (0.5); 7.0926 (0.5); 7.0897 (0.6); 7.0695 (0.7); 7.0632 (1.1); 7.0384 (0.7); 7.0229 (0.9); 7.0164 (1.1); 7.0102 (0.6); 6.9931 (1.1); 6.9646 (0.3); 6.9334 (0.6); 6.9091 (0.6); 4.6506 (0.4); 4.6237 (0.4); 4.4819 (0.4); 4.4702 (0.4); 4.4496 (0.6); 4.4379 (0.6); 4.3193 (0.6); 4.3075 (0.6); 4.2871 (0.5); 4.2753 (0.4); 3.2222 (0.4); 3.2058 (1.0); 3.1988 (1.1); 3.1820 (1.0); 3.1723 (1.0); 2.9944 (14.4); 2.9134 (16.0); 2.8347 (11.5); 2.4264 (5.0); 2.3482 (1.2); 2.3261 (0.4); 2.2939 (4.7); 2.2345 (1.1); 1.9470 (0.5); 1.5072 (1.0); 1.4820 (4.7); 1.4584 (3.9); 1.4479 (3.3); 1.4257 (3.0); 1.0156 (0.7); 1.0083 (1.1); 0.9870 (0.8); 0.9808 (1.1); 0.7684 (0.7); 0.7601 (0.6); 0.7519 (1.1); 0.7462 (0.6); 0.7425 (0.6); 0.7360 (0.6); 0.0317 (3.6)

3-28: $^1$H-NMR(300.2 MHz, CDCl3):
δ = 8.4990 (0.5); 8.4731 (0.5); 8.2278 (3.6); 7.8700 (0.4); 7.8442 (0.8); 7.8319 (1.0); 7.8230 (1.2); 7.8148 (2.8); 7.8079 (1.3); 7.8031 (1.2); 7.7960 (2.7); 7.7877 (1.1); 7.7822 (0.8); 7.7792 (0.9); 7.7665 (0.8); 7.5092 (0.4); 7.4830 (1.1); 7.4567 (1.2); 7.2989 (16.2); 7.2561 (1.0); 7.2490 (1.6); 7.2237 (1.7); 7.1938 (1.0); 7.1660 (0.8); 7.0652 (0.4); 7.0057 (1.3); 6.9536 (0.7); 6.9277 (0.6); 4.6582 (0.4); 4.6322 (0.4); 4.4994 (0.6); 4.4877 (0.5); 4.4669 (0.8); 4.4554 (0.7); 4.3172 (0.7); 4.3057 (0.7); 4.2850 (0.6); 4.2734 (0.5); 4.1726 (0.4); 4.1488 (0.4); 3.2266 (0.8); 3.2038 (1.4); 3.1764 (0.8); 2.4747 (1.0); 2.4394 (6.4); 2.3484 (0.9); 2.3013 (6.0); 2.0840 (1.8); 1.5876 (16.0); 1.5705 (0.9); 1.5638 (1.0); 1.5440 (0.4); 1.5266 (0.4); 1.5073 (0.8); 1.5001 (1.0); 1.4801 (0.4); 1.3221 (0.6); 1.2983 (1.5); 1.2745 (0.5); 1.1723 (0.5); 1.1674 (1.0); 1.1602 (1.0); 1.1432 (0.6); 1.1378 (1.2); 1.1302 (0.9); 0.9207 (0.8); 0.0495 (0.7); 0.0387 (19.3); 0.0277 (0.7)

3-29: $^1$H-NMR(300.2 MHz, CDCl3):
δ = 8.2631 (1.1); 8.2369 (1.1); 8.0329 (5.4); 7.8263 (1.7); 7.8151 (2.0); 7.8100 (1.9); 7.8060 (2.2); 7.7970 (4.5); 7.7834 (2.3); 7.7698 (4.5); 7.7613 (2.1); 7.7575 (2.0); 7.7518 (2.0); 7.7409 (1.7); 7.3521 (2.3); 7.3258 (2.6); 7.2992 (2.2); 7.2505 (0.6); 7.2453 (0.7); 7.2231 (1.4); 7.2006 (1.0); 7.1951 (1.0); 7.1454 (1.1); 7.1187 (1.8); 7.0919 (0.9); 7.0364 (2.6); 7.0307 (2.8); 6.8586 (2.2); 6.8524 (1.7); 6.8378 (1.7); 6.8326 (2.1); 6.8262 (1.5); 6.8174 (0.8); 6.8122 (0.7); 5.3275 (0.9); 4.8378 (0.5); 4.8247 (0.8); 4.8118 (0.7); 4.7991 (0.8); 4.7858 (0.5); 4.4842 (0.5); 4.4706 (0.5); 4.4509 (1.8); 4.4340 (2.5); 4.4190 (1.8); 4.3997 (0.6); 4.3855 (0.5); 3.3667 (3.3); 3.3421 (3.2); 2.8345 (6.3); 2.6990 (16.0); 2.6037 (0.4); 2.1628 (0.5); 2.1518 (0.6); 2.1347 (1.0); 2.1237 (0.5); 2.1174 (0.6); 2.1067 (0.6); 2.0755 (0.5); 1.8449 (0.6); 1.8335 (0.6); 1.8170 (1.2); 1.8003 (0.7); 1.7891 (0.7); 1.7718 (0.4); 1.7563 (4.3); 1.2901 (0.4); 1.0714 (0.6); 1.0560 (2.0); 1.0496 (2.1); 1.0354 (1.3); 1.0278 (2.1);

TABLE 8-continued 1.0212 (2.1); 1.0074 (1.0); 0.9964 (0.9); 0.9804 (2.1); 0.9742 (2.2); 0.9589 (1.2); 0.9524 (2.2); 0.9461 (2.0); 0.9315 (1.0); 0.8273 (0.9); 0.8089 (2.4); 0.7958 (2.2); 0.7906 (2.4); 0.7743 (0.8); 0.6810 (0.9); 0.6651 (2.6); 0.6599 (2.3); 0.6492 (2.2); 0.6432 (2.7); 0.6272 (0.8); 0.0330 (1.0)

3-30: $^{1}$H-NMR(300.2 MHz, CDCl3):
δ = 7.8866 (0.9); 7.8755 (0.9); 7.8701 (0.8); 7.8663 (1.0); 7.8575 (2.1); 7.8425 (0.7); 7.8277 (2.1); 7.8189 (1.0); 7.8152 (0.9); 7.8098 (0.9); 7.7985 (0.9); 7.4293 (1.1); 7.4017 (1.4); 7.3361 (1.7); 7.3289 (1.6); 7.3121 (0.6); 7.2988 (11.9); 7.1049 (0.8); 7.0978 (0.8); 7.0775 (0.8); 7.0688 (1.8); 7.0577 (0.9); 7.0547 (0.8); 7.0433 (1.6); 6.8091 (0.3); 6.7877 (0.6); 6.7765 (0.5); 4.6153 (0.5); 4.6019 (0.5); 4.5807 (0.7); 4.5674 (0.6); 4.3340 (0.6); 4.3224 (0.6); 4.2994 (0.5); 4.2878 (0.5); 3.4448 (0.3); 3.3979 (0.6); 3.3686 (0.6); 3.3091 (0.6); 3.2879 (0.6); 3.2621 (0.3); 2.4047 (8.1); 2.0826 (0.8); 2.0313 (0.5); 1.5965 (16.0); 1.3209 (0.4); 1.2972 (0.8); 1.0284 (0.4); 1.0143 (0.8); 1.0069 (0.9); 0.9927 (0.5); 0.9855 (0.8); 0.9785 (0.9); 0.9645 (0.4); 0.9199 (0.5); 0.7805 (0.4); 0.7659 (1.0); 0.7598 (1.0); 0.7488 (0.9); 0.7429 (1.0); 0.7273 (0.4); 0.1075 (0.7); 0.0488 (0.4); 0.0379 (13.7); 0.0270 (0.5)

3-31: $^{1}$H-NMR(300.2 MHz, CDCl3):
δ = 8.3987 (0.7); 8.3709 (0.7); 8.1721 (3.4); 8.0509 (2.0); 7.8531 (0.8); 7.8435 (0.7); 7.8402 (0.9); 7.8374 (1.0); 7.8318 (1.3); 7.8235 (2.6); 7.8170 (1.4); 7.8116 (1.3); 7.8051 (2.6); 7.7970 (1.1); 7.7913 (0.9); 7.7884 (0.9); 7.7755 (0.8); 7.4219 (1.3); 7.4110 (0.4); 7.3947 (2.1); 7.3831 (0.4); 7.3710 (2.1); 7.3649 (2.0); 7.3426 (0.8); 7.2988 (5.7); 7.1704 (1.0); 7.1633 (0.9); 7.1431 (0.8); 7.1360 (0.7); 7.0860 (0.8); 7.0786 (1.4); 7.0586 (0.6); 7.0507 (1.3); 7.0106 (1.0); 7.0042 (1.3); 6.9977 (0.7); 4.8128 (0.3); 4.8010 (0.3); 4.7890 (0.4); 4.4865 (0.4); 4.4743 (0.5); 4.4531 (0.8); 4.4410 (0.7); 4.3817 (0.8); 4.3691 (0.8); 4.3485 (0.5); 4.3359 (0.4); 3.7742 (0.4); 3.7605 (0.4); 3.7520 (0.6); 3.7384 (0.6); 3.7300 (0.5); 3.7162 (0.4); 3.3757 (0.8); 3.3465 (1.2); 3.3215 (0.7); 3.2256 (0.8); 3.2113 (0.8); 3.2010 (0.8); 3.1865 (0.8); 3.1763 (0.3); 2.9972 (16.0); 2.9679 (1.3); 2.9160 (13.5); 2.8344 (13.6); 2.0459 (0.4); 1.9732 (0.3); 1.9564 (0.6); 1.9396 (0.4); 1.9286 (0.3); 1.5261 (1.7); 1.4985 (7.0); 1.4759 (7.3); 1.4637 (6.3); 1.4415 (6.0); 1.0278 (0.9); 1.0207 (1.2); 0.9992 (0.9); 0.9930 (1.2); 0.9757 (0.3); 0.7739 (0.8); 0.7676 (1.0); 0.7598 (1.0); 0.7575 (1.0); 0.7508 (0.9); 0.7437 (0.7); 0.1032 (0.4); 0.0322 (6.1)

3-32: $^{1}$H-NMR(300.2 MHz, CDCl3):
δ = 8.3902 (0.3); 8.3776 (0.4); 8.2485 (2.0); 8.2445 (1.9); 7.8314 (0.3); 7.8249 (0.4); 7.8170 (0.6); 7.8093 (0.9); 7.8021 (2.0); 7.7950 (2.1); 7.7903 (2.1); 7.7857 (2.0); 7.7703 (0.6); 7.7595 (0.3); 7.3966 (0.3); 7.3148 (0.3); 7.3103 (0.6); 7.2983 (47.4); 7.2862 (0.5); 7.2716 (0.6); 7.2609 (0.9); 7.2466 (0.6); 7.2339 (1.3); 7.2055 (0.6); 7.1788 (0.4); 7.1580 (0.5); 6.9986 (1.0); 6.9475 (0.6); 6.9274 (0.4); 4.5010 (0.4); 4.4783 (0.4); 4.4678 (0.5); 4.4585 (0.3); 4.3120 (0.6); 4.3003 (0.4); 4.2795 (0.4); 3.2424 (0.4); 3.2248 (0.9); 3.1982 (0.5); 2.8969 (0.3); 2.4529 (2.9); 2.4436 (2.9); 2.2904 (3.9); 1.9406 (0.4); 1.7484 (0.4); 1.7340 (0.3); 1.7208 (0.4); 1.7062 (0.3); 1.5764 (16.0); 0.0486 (2.1); 0.0470 (1.3); 0.0378 (65.6); 0.0301 (2.3); 0.0286 (2.2); 0.0270 (2.6); 0.0199 (0.5); 0.0169 (0.4)

3-33: $^{1}$H-NMR(300.2 MHz, CDCl3):
δ = 8.5695 (0.9); 8.5428 (0.9); 8.1512 (5.4); 7.8535 (1.6); 7.8437 (1.4); 7.8412 (1.7); 7.8373 (1.7); 7.8325 (2.2); 7.8239 (4.4); 7.8142 (2.1); 7.8123 (2.0); 7.8026 (4.3); 7.7939 (1.9); 7.7891 (1.6); 7.7852 (1.6); 7.7829 (1.3); 7.7730 (1.7); 7.6511 (1.7); 7.6487 (1.8); 7.5778 (2.8); 7.5602 (3.9); 7.5149 (0.3); 7.5031 (0.9); 7.4951 (0.9); 7.4864 (1.0); 7.4805 (1.0); 7.4726 (0.5); 7.4640 (0.4); 7.2987 (14.7); 6.9608 (0.8); 6.9335 (1.2); 6.9084 (1.9); 6.8146 (2.2); 6.7873 (1.6); 4.9746 (0.4); 4.9615 (0.5); 4.9564 (0.6); 4.9450 (0.6); 4.9350 (0.5); 4.9294 (0.5); 4.9171 (0.4); 4.6717 (0.7); 4.6535 (0.7); 4.6372 (1.6); 4.6191 (1.4); 4.5929 (1.5); 4.5742 (1.5); 4.5586 (0.8); 4.5397 (0.7); 4.5071 (0.9); 4.4947 (0.9); 4.4748 (1.2); 4.4625 (1.1); 4.3257 (1.2); 4.3079 (1.1); 4.2932 (0.9); 4.2756 (0.8); 2.7625 (16.0); 2.3243 (0.7); 2.2625 (10.2); 2.2419 (0.8); 2.0839 (1.1); 2.0382 (10.5); 2.0223 (0.9); 1.6177 (0.5); 1.2977 (0.6); 0.1083 (0.7); 0.0488 (0.7); 0.0380 (18.0); 0.0289 (0.5); 0.0271 (0.7)

3-34: $^{1}$H-NMR(499.9 MHz, CDCl3):
δ = 8.5428 (1.0); 8.5272 (1.0); 8.0976 (5.5); 7.8042 (1.8); 7.7977 (2.1); 7.7941 (1.8); 7.7923 (2.2); 7.7867 (4.2); 7.7784 (0.9); 7.7727 (0.9); 7.7647 (4.1); 7.7594 (2.0); 7.7577 (1.9); 7.7538 (2.1); 7.7475 (1.9); 7.6265 (1.9); 7.5520 (1.9); 7.5489 (1.5); 7.5434 (3.7); 7.5418 (4.3); 7.4779 (0.8); 7.4730 (0.8); 7.4702 (1.0); 7.4664 (1.1); 7.4600 (0.7); 7.4548 (0.5); 7.2610 (6.7); 7.1930 (0.4); 7.1860 (4.1); 7.1817 (1.4); 7.1724 (1.3); 7.1680 (4.7); 7.1612 (0.5); 6.8142 (0.4); 6.8073 (4.5); 6.8029 (1.5); 6.7937 (1.3); 6.7893 (4.2); 6.7824 (0.4); 5.2976 (12.8); 4.8559 (0.4); 4.8477 (0.5); 4.8446 (0.6); 4.8377 (0.6); 4.8329 (0.6); 4.8297 (0.6); 4.8216 (0.4); 4.6262 (1.1); 4.6160 (1.0); 4.6054 (1.4); 4.5952 (1.3); 4.5027 (1.1); 4.4948 (1.2); 4.4910 (1.5); 4.4833 (1.5); 4.4796 (1.7); 4.4758 (1.4); 4.4701 (1.2); 4.4588 (1.0); 4.2768 (1.2); 4.2651 (1.2); 4.2575 (1.1); 4.2459 (1.0); 4.1279 (0.5); 4.1136 (0.5); 2.7296 (16.0); 2.0432 (2.2); 1.5759 (3.8); 1.2726 (0.6); 1.2583 (1.2); 1.2440 (0.6); −0.0002 (8.6); −0.0067 (0.4)

3-35: $^{1}$H-NMR(300.2 MHz, CDCl3):
δ = 8.5282 (1.4); 8.5031 (1.4); 8.2283 (9.2); 7.8325 (0.5); 7.8299 (0.5); 7.8120 (1.7); 7.8004 (13.8); 7.7984 (13.2); 7.7868 (1.6); 7.7687 (0.5); 7.6989 (2.7); 7.6205 (1.6); 7.6000 (6.2); 7.5858 (0.7); 7.5782 (0.8); 7.5716 (0.5); 7.5619 (1.4); 7.5511 (1.6); 7.5443 (1.3); 7.5305 (0.9); 7.5230 (0.6); 7.4021 (2.7); 7.3760 (3.1); 7.2983 (3.6); 6.9851 (3.1); 6.9668 (1.8); 6.9404 (1.4); 4.7335 (1.3); 4.7178 (1.5); 4.6995 (1.5); 4.6838 (1.9); 4.5878 (0.6); 4.5756 (0.8); 4.5637 (0.8); 4.5540 (0.8); 4.5434 (0.6); 4.4162 (1.7); 4.4036 (1.6); 4.3822 (1.5); 4.3697 (1.3); 3.5093 (1.0); 3.4891 (1.0); 3.4626 (1.9); 3.4426 (1.7); 3.3731 (1.8); 3.3489 (1.8); 3.3264 (1.0); 3.3022 (1.0); 2.3679 (16.0); 2.2643 (15.3); 2.0399 (4.0); 0.0372 (4.3)

3-36: $^{1}$H-NMR(300.2 MHz, CDCl3):
δ = 8.2432 (0.3); 7.8764 (1.4); 7.8694 (1.7); 7.8655 (1.9); 7.8598 (2.3); 7.8562 (2.4); 7.8480 (4.3); 7.8406 (3.9); 7.8340 (2.4); 7.8286 (2.3); 7.8211 (4.0); 7.8165 (4.4); 7.8081 (2.7); 7.8030 (3.0); 7.7920 (2.0); 7.7872 (1.8); 7.7735 (0.6); 7.7002 (0.4); 7.6352 (0.8); 7.6082 (0.8); 7.5411 (0.8); 7.5138 (0.9); 7.2986 (26.5); 7.2825 (0.4); 7.2708 (0.6); 7.2574 (2.4); 7.2490 (2.0); 7.2317 (3.1); 7.2245 (2.2); 7.2135 (1.3); 7.2067 (0.9); 7.1492 (1.2); 7.1228 (2.5); 7.0961 (1.5); 7.0625 (1.2); 7.0402 (1.5); 7.0130 (2.3); 6.9953 (1.8); 6.9755 (1.3); 6.9494 (2.0); 6.9247 (0.8); 4.7062 (0.5); 4.6947 (0.7); 4.6794 (0.8); 4.6671 (0.9); 4.6547 (0.8); 4.6423 (0.6); 4.6287 (1.2); 4.6183 (0.8); 4.6081 (1.0); 4.5957 (1.6); 4.5842 (0.9); 4.5742 (1.0); 4.5632 (0.8); 4.2118 (0.9); 4.2015 (1.0); 4.1921 (0.9); 4.1807 (1.2); 4.1679 (0.9); 4.1575 (1.0); 4.1478 (0.8); 3.3161 (0.5); 3.3021 (0.6); 3.2937 (0.6); 3.2702 (1.0); 3.2557 (1.0); 3.2474 (1.0); 3.2328 (0.8); 3.1625 (1.4); 3.1346 (1.4); 3.1172 (0.8); 3.0879 (0.7); 2.8309 (0.5); 2.8038 (0.6); 2.7912 (1.0); 2.7633 (1.0); 2.7510 (0.6); 2.7229 (0.6); 2.6022 (4.0); 2.5343 (3.7); 2.4856 (1.3); 2.4605 (9.3); 2.4514 (9.3); 2.4195 (11.8); 2.4046 (12.6); 2.3737 (1.4); 2.3543 (1.2); 2.3160 (1.3); 2.2880 (9.0); 2.2646 (7.7); 2.2397 (1.4); 2.0834 (0.7); 1.9456 (0.4); 1.9282 (0.4); 1.9191 (0.5); 1.9018 (0.9); 1.8886 (0.6); 1.8849 (0.6); 1.8789 (0.8); 1.8752 (0.7); 1.8619 (0.9); 1.8491 (0.3); 1.8449 (0.3); 1.8398 (0.4); 1.8189 (0.4); 1.6966 (0.4); 1.6855 (0.5); 1.6692 (0.7); 1.6569 (1.1); 1.6440 (0.7); 1.6298 (1.0); 1.6144 (0.9); 1.6008 (16.0); 1.2975 (0.6); 0.0489 (1.1); 0.0379 (33.4); 0.0271 (1.2)

3-37: $^{1}$H-NMR(300.2 MHz, CDCl3):
δ = 8.3020 (0.4); 8.2763 (0.4); 8.0712 (2.2); 8.0521 (1.0); 7.8195 (0.6); 7.8114 (0.8); 7.8047 (2.9); 7.7954 (2.9); 7.7891 (0.9); 7.7807 (0.6); 7.7656 (0.3); 7.6933 (0.5); 7.5960 (0.4); 7.4730 (0.9); 7.4455 (1.1); 7.4034 (0.4); 7.3777 (1.5); 7.3709 (1.4); 7.2989 (16.2); 7.2324 (0.7); 7.2255 (0.6); 7.2052 (0.5); 7.1980 (0.5); 4.5166 (0.4); 4.5040 (0.4); 4.4833 (0.6); 4.4707 (0.5); 4.3607 (0.5); 4.3480 (0.5); 4.3279 (0.4); 4.3150 (0.4); 3.4103 (0.6); 3.3830 (0.6); 3.3698 (0.5); 3.3460 (0.6); 2.9942 (8.6); 2.9204 (7.4); 2.8400 (1.0); 2.7548 (0.8); 2.7398 (6.2); 1.6330 (16.0); 1.5291 (0.4); 0.1059 (1.9); 0.0470 (0.6); 0.0362 (19.9); 0.0253 (0.8)

TABLE 8-continued 3-38: $^1$H-NMR(300.2 MHz, CDCl3):
δ = 8.3877 (0.9); 8.3621 (0.9); 8.1146 (5.5); 7.8174 (0.6); 7.8107 (0.5); 7.8020 (1.3); 7.7940 (2.4); 7.7880 (7.4); 7.7802 (7.3); 7.7745 (2.3); 7.7662 (1.3); 7.7576 (0.4); 7.7504 (0.6); 7.7189 (0.6); 7.6955 (1.2); 7.6726 (0.7); 7.6687 (0.7); 7.6099 (0.6); 7.5876 (1.1); 7.5662 (0.7); 7.3902 (0.8); 7.3638 (1.3); 7.3358 (0.6); 7.2985 (11.9); 7.2876 (2.0); 7.2618 (2.1); 6.9997 (2.2); 6.9661 (1.2); 6.9403 (1.0); 5.3372 (0.7); 4.6667 (0.6); 4.6560 (0.5); 4.6453 (0.6); 4.5108 (1.1); 4.4988 (0.9); 4.4785 (1.4); 4.4667 (1.2); 4.3054 (1.2); 4.2936 (1.2); 4.2733 (1.0); 4.2614 (0.9); 3.3085 (0.4); 3.2865 (0.4); 3.2625 (1.2); 3.2404 (1.2); 3.2220 (1.3); 3.1934 (1.2); 3.1759 (0.5); 3.1473 (0.4); 2.7440 (16.0); 2.4622 (11.3); 2.2860 (10.7); 1.5950 (5.1); 0.1086 (0.4); 0.0492 (0.5); 0.0383 (15.0); 0.0275 (0.6)
3-39: $^1$H-NMR(300.2 MHz, CDCl3):
δ = 8.4206 (0.9); 8.3936 (0.9); 8.0605 (5.6); 7.8468 (1.4); 7.8373 (1.2); 7.8339 (1.6); 7.8312 (1.6); 7.8255 (2.1); 7.8171 (4.7); 7.8112 (2.2); 7.8052 (2.0); 7.7990 (4.8); 7.7908 (1.9); 7.7851 (1.8); 7.7823 (1.7); 7.7789 (1.3); 7.7693 (1.5); 7.6107 (0.6); 7.5846 (1.6); 7.5581 (1.4); 7.5378 (1.8); 7.4785 (1.5); 7.4546 (4.1); 7.4273 (3.5); 7.3741 (2.8); 7.3671 (3.1); 7.2988 (15.5); 7.2021 (1.7); 7.1950 (1.7); 7.1748 (1.5); 7.1676 (1.4); 7.1028 (0.4); 7.0964 (0.4); 6.9043 (1.1); 6.7163 (2.3); 6.5285 (1.2); 4.8523 (0.4); 4.8402 (0.7); 4.8280 (0.6); 4.8154 (0.7); 4.8030 (0.4); 4.4895 (0.9); 4.4771 (0.8); 4.4564 (1.5); 4.4441 (1.4); 4.3807 (1.5); 4.3684 (1.5); 4.3478 (0.9); 4.3353 (0.8); 3.4499 (0.5); 3.4229 (0.5); 3.4038 (1.3); 3.3769 (1.3); 3.3518 (1.3); 3.3280 (1.3); 3.3054 (0.6); 3.2819 (0.6); 2.9943 (2.4); 2.9201 (2.1); 2.9045 (2.6); 2.8402 (1.0); 2.7612 (0.6); 2.7273 (16.0); 1.6548 (1.1); 1.5569 (0.4); 1.5318 (0.6); 1.5257 (0.6); 1.5034 (0.6); 1.4832 (0.5); 1.4620 (0.5); 1.2939 (0.4); 0.1071 (7.5); 0.0478 (0.5); 0.0370 (16.3); 0.0260 (0.6)
3-40: $^1$H-NMR(300.2 MHz, CDCl3):
δ = 8.4025 (0.4); 8.3760 (0.4); 8.2476 (2.3); 7.8302 (0.4); 7.8158 (0.7); 7.8077 (0.8); 7.7997 (2.4); 7.7881 (2.4); 7.7721 (0.7); 7.7576 (0.4); 7.5055 (0.5); 7.4846 (0.5); 7.4621 (0.5); 7.4387 (0.3); 7.2989 (17.8); 7.2795 (0.8); 7.2651 (0.9); 7.2532 (0.4); 7.2397 (0.9); 7.0007 (1.0); 6.9570 (0.5); 6.9338 (0.4); 4.5057 (0.4); 4.4939 (0.3); 4.4731 (0.6); 4.4613 (0.5); 4.3141 (0.5); 4.3022 (0.5); 4.2815 (0.4); 4.2700 (0.4); 3.2451 (0.6); 3.2219 (1.0); 3.1942 (0.5); 2.6019 (0.4); 2.5345 (0.4); 2.4820 (0.4); 2.4498 (4.5); 2.3560 (0.3); 2.2901 (4.3); 2.0846 (0.6); 1.5856 (16.0); 1.5034 (0.6); 1.4401 (0.6); 1.3218 (0.4); 1.2983 (1.1); 1.2309 (0.7); 1.2244 (0.8); 1.2005 (0.8); 0.9201 (0.9); 0.8969 (0.4); 0.0487 (0.8); 0.0379 (22.9); 0.0272 (0.9)
3-41: $^1$H-NMR(300.2 MHz, CDCl3):
δ = 7.4279 (0.4); 7.2985 (15.1); 7.2761 (0.4); 7.2733 (0.4); 7.2573 (0.6); 7.2318 (0.6); 7.1077 (0.6); 7.0821 (0.8); 6.9754 (0.7); 6.8899 (0.4); 6.8646 (0.6); 5.5893 (1.9); 4.1713 (0.6); 4.1475 (0.6); 3.8339 (0.6); 3.8232 (0.5); 3.7556 (0.5); 3.7376 (0.5); 2.9808 (1.2); 2.9557 (1.1); 2.8403 (2.7); 2.4018 (4.1); 2.3884 (6.0); 2.2488 (3.7); 2.0837 (2.6); 1.5893 (16.0); 1.4921 (0.5); 1.4293 (0.5); 1.3213 (0.9); 1.2975 (2.1); 1.2737 (0.7); 1.1826 (0.6); 1.1753 (0.6); 1.1531 (0.6); 0.9197 (1.0); 0.8967 (0.4); 0.0482 (0.6); 0.0466 (0.4); 0.0374 (18.6); 0.0297 (0.6); 0.0282 (0.6); 0.0265 (0.7)
3-42: $^1$H-NMR(300.2 MHz, CDCl3):
δ = 8.1996 (0.9); 8.1732 (0.9); 8.0545 (5.3); 7.8339 (1.4); 7.8243 (1.3); 7.8212 (1.6); 7.8180 (1.5); 7.8126 (2.2); 7.8047 (4.6); 7.7975 (2.1); 7.7923 (2.2); 7.7859 (4.6); 7.7773 (2.0); 7.7719 (1.6); 7.7687 (1.6); 7.7654 (1.3); 7.7560 (1.4); 7.4184 (0.6); 7.4129 (1.3); 7.4098 (1.2); 7.4041 (0.7); 7.3970 (0.7); 7.3916 (1.6); 7.3870 (2.4); 7.3814 (2.1); 7.3760 (0.7); 7.3709 (0.7); 7.3654 (1.7); 7.3590 (1.6); 7.3489 (2.2); 7.3226 (2.4); 7.2987 (8.6); 7.2334 (1.3); 7.2278 (1.2); 7.2052 (1.3); 7.2012 (1.4); 7.1788 (0.7); 7.1731 (0.7); 7.0371 (2.4); 7.0311 (2.6); 6.8929 (1.4); 6.8870 (1.3); 6.8666 (1.2); 6.8607 (1.2); 4.8357 (0.4); 4.8225 (0.6); 4.8110 (0.6); 4.7985 (0.7); 4.7852 (0.4); 4.5047 (0.8); 4.4912 (0.8); 4.4711 (1.5); 4.4577 (1.3); 4.4092 (1.4); 4.3959 (1.4); 4.3756 (0.9); 4.3622 (0.7); 4.1700 (0.9); 4.1462 (1.0); 4.1225 (0.3); 3.4251 (0.4); 3.3983 (0.4); 3.3789 (1.4); 3.3532 (2.4); 3.3312 (1.4); 3.3080 (0.4); 2.8399 (3.0); 2.7545 (0.8); 2.7171 (16.0); 2.7018 (0.6); 2.0816 (4.3); 1.8570 (0.5); 1.8458 (0.6); 1.8403 (0.4); 1.8291 (1.0); 1.8175 (0.4); 1.8121 (0.6); 1.8011 (0.6); 1.6253 (15.5); 1.3194 (1.6); 1.2957 (3.8); 1.2718 (1.3); 1.0143 (0.7); 0.9990 (1.8); 0.9924 (2.0); 0.9866 (1.1); 0.9774 (1.1); 0.9706 (2.1); 0.9643 (1.9); 0.9495 (1.0); 0.9400 (0.9); 0.9266 (0.6); 0.9181 (2.4); 0.8949 (0.8); 0.6961 (0.9); 0.6808 (2.3); 0.6750 (2.0); 0.6643 (2.0); 0.6587 (2.4); 0.6425 (0.8); 0.1072 (0.5); 0.0470 (0.4); 0.0363 (10.2); 0.0254 (0.4)
3-43: $^1$H-NMR(300.2 MHz, CDCl3):
δ = 8.3440 (0.5); 8.3184 (0.5); 8.0901 (3.2); 8.0546 (1.8); 7.8260 (0.7); 7.8168 (0.6); 7.8121 (1.0); 7.8040 (1.2); 7.7965 (3.1); 7.7822 (3.1); 7.7740 (1.1); 7.7669 (0.9); 7.7611 (0.5); 7.7520 (0.7); 7.4064 (1.2); 7.3849 (1.2); 7.3826 (1.2); 7.3791 (1.8); 7.3573 (1.7); 7.2986 (8.7); 7.2724 (1.1); 7.2463 (1.3); 7.2223 (0.7); 7.2167 (0.6); 7.1969 (0.6); 7.1922 (0.8); 7.1675 (0.5); 7.1619 (0.4); 6.8919 (1.3); 6.8347 (0.7); 6.8293 (0.6); 6.8088 (0.6); 6.8035 (0.6); 4.6554 (0.4); 4.6441 (0.3); 4.6307 (0.3); 4.4946 (0.6); 4.4826 (0.5); 4.4621 (0.8); 4.4502 (0.7); 4.3183 (0.7); 4.3062 (0.7); 4.2860 (0.6); 4.2737 (0.5); 3.2420 (0.8); 3.2205 (1.4); 3.1939 (0.8); 2.9933 (16.0); 2.9209 (14.0); 2.8397 (11.7); 2.7319 (9.3); 2.7156 (0.3); 2.4989 (0.4); 2.4511 (6.5); 2.0812 (0.5); 1.8479 (0.3); 1.8309 (0.6); 1.8140 (0.4); 1.8030 (0.4); 1.6331 (14.3); 1.2955 (0.4); 0.9772 (0.4); 0.9625 (1.1); 0.9555 (1.2); 0.9493 (0.6); 0.9415 (0.6); 0.9341 (1.2); 0.9275 (1.1); 0.9136 (0.5); 0.6936 (0.5); 0.6791 (1.3); 0.6734 (1.2); 0.6625 (1.2); 0.6570 (1.3); 0.6411 (0.4); 0.0469 (0.4); 0.0360 (12.0); 0.0250 (0.4)
3-44: $^1$H-NMR(300.2 MHz, CDCl3):
δ = 8.3984 (0.6); 8.3720 (0.6); 8.0900 (4.0); 7.8342 (0.7); 7.8257 (0.6); 7.8196 (1.3); 7.8117 (1.6); 7.8036 (5.0); 7.7935 (4.9); 7.7856 (1.7); 7.7777 (1.4); 7.7714 (0.6); 7.7630 (0.8); 7.4105 (1.4); 7.3897 (1.4); 7.3875 (1.6); 7.3838 (2.1); 7.3618 (2.0); 7.3390 (1.6); 7.3152 (0.4); 7.3080 (0.4); 7.3064 (0.4); 7.2989 (11.5); 7.2905 (4.9); 7.2313 (0.9); 7.2256 (0.9); 7.2061 (0.7); 7.2001 (1.0); 7.1967 (0.8); 7.1766 (0.6); 7.1708 (0.7); 4.6610 (0.5); 4.6494 (0.4); 4.6346 (0.4); 4.4844 (0.7); 4.4734 (0.7); 4.4520 (1.0); 4.4409 (0.8); 4.2953 (0.9); 4.2836 (0.9); 4.2629 (0.7); 4.2512 (0.6); 3.2448 (1.2); 3.2323 (1.2); 3.2214 (1.1); 3.2044 (1.0); 2.8413 (2.1); 2.7609 (0.4); 2.7445 (11.5); 2.7351 (1.4); 2.7245 (0.4); 2.5002 (0.8); 2.4818 (8.2); 2.4616 (0.3); 2.0827 (0.5); 1.6016 (16.0); 1.2971 (0.4); 0.0484 (0.5); 0.0452 (0.3); 0.0377 (14.5); 0.0283 (0.4); 0.0268 (0.5)
3-45: $^1$H-NMR(300.2 MHz, CDCl3):
δ = 8.1718 (0.6); 8.1464 (0.6); 8.0882 (3.6); 7.8403 (1.0); 7.8283 (1.0); 7.8242 (1.0); 7.8195 (1.3); 7.8110 (2.9); 7.7992 (1.5); 7.7874 (2.8); 7.7789 (1.2); 7.7744 (1.0); 7.7700 (1.1); 7.7581 (1.0); 7.4148 (0.4); 7.4094 (0.5); 7.3935 (0.5); 7.3879 (1.0); 7.3824 (0.8); 7.3772 (0.6); 7.3715 (0.5); 7.3667 (0.6); 7.3611 (0.7); 7.3550 (0.6); 7.3494 (1.1); 7.3440 (0.6); 7.3273 (0.8); 7.3217 (0.5); 7.2990 (6.6); 7.2262 (0.8); 7.2206 (0.7); 7.1988 (1.0); 7.1933 (1.0); 7.1716 (0.4); 7.1659 (0.5); 7.1479 (1.5); 7.1020 (0.6); 7.0764 (1.0); 7.0710 (0.9); 7.0080 (1.5); 6.9830 (0.9); 4.6879 (0.5); 4.6751 (0.4); 4.6630 (0.5); 4.4454 (0.5); 4.4318 (0.5); 4.4123 (1.0); 4.3988 (0.9); 4.3533 (1.0); 4.3384 (1.0); 4.3202 (0.6); 4.3054 (0.5); 3.1994 (1.8); 3.1754 (1.5); 2.7329 (10.4); 2.7168 (0.4); 2.2121 (16.0); 2.0835 (0.4); 1.6181 (11.5); 1.3208 (0.5); 1.3038 (1.5); 1.2974 (1.5); 0.9410 (0.5); 0.9192 (1.7); 0.8959 (0.6); 0.1077 (0.4); 0.0373 (8.7)
3-46: $^1$H-NMR(300.2 MHz, CDCl3):
δ = 8.4217 (0.5); 8.3963 (0.4); 8.1160 (2.7); 7.8021 (0.6); 7.7941 (1.2); 7.7882 (3.5); 7.7797 (3.4); 7.7737 (1.1); 7.7656 (0.6); 7.7504 (0.4); 7.6006 (0.8); 7.5750 (0.8); 7.5548 (0.3); 7.3845 (0.5); 7.3579 (0.7); 7.2989 (14.0); 7.2675 (1.0); 7.1349 (0.5); 6.9521 (1.0); 6.8968 (1.0); 6.8501 (0.6); 6.8237 (0.5); 6.8185 (0.5); 6.7695 (0.5); 4.4934 (0.5); 4.4816 (0.4); 4.4614 (0.6); 4.4494 (0.5); 4.2989 (0.6); 4.2870 (0.6); 4.2670 (0.4); 4.2551 (0.4); 3.2496 (0.6); 3.2275 (0.6); 3.2119 (0.6); 3.1832 (0.6); 2.7408 (7.6); 2.5080 (0.4); 2.4631 (5.1); 1.8327 (0.5); 1.5932 (16.0); 0.9662 (0.9); 0.9593 (1.0); 0.9454 (0.5); 0.9378 (1.0); 0.9310 (0.9); 0.9174 (0.4); 0.6953 (0.4); 0.6812 (1.0); 0.6778 (0.9); 0.6644 (0.9); 0.6596 (0.9); 0.1071 (0.4); 0.0483 (0.7); 0.0375 (19.7); 0.0267 (0.7)

TABLE 8-continued 3-47: $^1$H-NMR(300.2 MHz, CDCl3):
δ = 8.3569 (0.7); 8.3313 (0.7); 8.0976 (4.0); 7.8406 (1.2); 7.8305 (1.1); 7.8287 (1.2); 7.8244 (1.2); 7.8199 (1.5); 7.8117 (3.2); 7.7990 (1.7); 7.7870 (3.1); 7.7781 (1.4); 7.7737 (1.2); 7.7693 (1.3); 7.7574 (1.2); 7.6002 (0.4); 7.5739 (1.2); 7.5476 (1.0); 7.5147 (1.4); 7.4731 (1.1); 7.4445 (1.3); 7.4141 (0.6); 7.4103 (0.6); 7.2990 (4.3); 7.1499 (1.7); 7.1002 (0.6); 7.0744 (1.1); 7.0698 (1.1); 7.0207 (1.7); 6.9952 (0.9); 6.8974 (0.8); 6.7095 (1.7); 6.5216 (0.8); 5.3360 (16.0); 4.6740 (0.5); 4.6619 (0.4); 4.6498 (0.5); 4.6368 (0.3); 4.4272 (0.5); 4.4138 (0.5); 4.3946 (1.2); 4.3812 (1.1); 4.3524 (1.2); 4.3385 (1.1); 4.3198 (0.6); 4.3059 (0.5); 4.1708 (0.4); 4.1471 (0.4); 3.1812 (1.6); 3.1608 (1.2); 3.1546 (1.3); 2.7333 (11.5); 2.2146 (9.3); 2.0826 (1.7); 1.6356 (7.2); 1.3205 (0.5); 1.2967 (1.0); 1.2729 (0.5); 0.0375 (5.8)
3-48: $^1$H-NMR(300.2 MHz, CDCl3):
δ = 8.5232 (0.9); 8.4975 (0.9); 8.1022 (5.3); 7.8355 (1.3); 7.8259 (1.2); 7.8227 (1.5); 7.8197 (1.5); 7.8142 (2.0); 7.8064 (4.3); 7.7993 (2.0); 7.7939 (1.9); 7.7876 (4.4); 7.7790 (1.8); 7.7735 (1.5); 7.7704 (1.5); 7.7673 (1.1); 7.7577 (1.3); 7.5992 (0.6); 7.5689 (1.3); 7.5561 (1.9); 7.5493 (2.1); 7.5472 (2.2); 7.4691 (2.6); 7.4667 (2.5); 7.4418 (1.6); 7.2989 (10.4); 7.2774 (1.8); 7.2513 (2.0); 6.9021 (2.3); 6.8439 (1.2); 6.8386 (1.0); 6.8182 (1.0); 6.8129 (1.0); 6.7087 (2.2); 6.5206 (1.1); 5.3373 (1.5); 4.6481 (0.6); 4.6373 (0.5); 4.6249 (0.5); 4.4803 (0.9); 4.4687 (0.8); 4.4483 (1.3); 4.4367 (1.1); 4.3161 (1.2); 4.3045 (1.1); 4.2841 (0.9); 4.2726 (0.8); 3.2799 (0.4); 3.2574 (0.4); 3.2337 (1.2); 3.2114 (1.2); 3.1978 (1.2); 3.1691 (1.1); 3.1515 (0.4); 3.1231 (0.4); 2.7343 (15.2); 2.4981 (0.6); 2.4534 (10.6); 2.0837 (0.6); 1.8705 (0.5); 1.8593 (0.5); 1.8426 (1.0); 1.8258 (0.6); 1.8146 (0.6); 1.6088 (16.0); 1.2976 (0.5); 0.9845 (0.6); 0.9699 (1.8); 0.9630 (2.0); 0.9487 (1.0); 0.9415 (1.9); 0.9349 (1.8); 0.9207 (0.9); 0.7009 (0.8); 0.6863 (2.1); 0.6836 (1.9); 0.6807 (2.0); 0.6696 (1.9); 0.6643 (2.1); 0.6482 (0.6); 0.0487 (0.5); 0.0471 (0.4); 0.0454 (0.4); 0.0380 (14.6); 0.0287 (0.4); 0.0271 (0.5)
3-49: $^1$H-NMR(300.2 MHz, CDCl3):
δ = 8.2403 (1.0); 8.2145 (1.0); 8.1071 (5.4); 7.8289 (1.2); 7.8196 (1.0); 7.8139 (1.6); 7.8073 (2.1); 7.7989 (5.1); 7.7836 (5.0); 7.7756 (1.9); 7.7675 (1.6); 7.7632 (1.0); 7.7538 (1.3); 7.5978 (1.0); 7.5727 (1.7); 7.5562 (0.9); 7.5452 (0.9); 7.3883 (1.0); 7.3619 (1.5); 7.3344 (0.6); 7.2989 (6.9); 7.1594 (2.3); 7.1254 (1.2); 7.1120 (1.0); 7.0867 (1.6); 7.0174 (2.3); 6.9920 (1.3); 6.9428 (2.3); 6.7602 (1.1); 5.3370 (0.4); 4.6950 (0.4); 4.6816 (0.7); 4.6695 (0.6); 4.6579 (0.7); 4.6444 (0.4); 4.4392 (0.8); 4.4256 (0.8); 4.4064 (1.6); 4.3929 (1.4); 4.3396 (1.5); 4.3253 (1.4); 4.3069 (0.9); 4.2926 (0.8); 3.1997 (1.6); 3.1902 (1.8); 3.1776 (1.6); 3.1650 (1.5); 2.7392 (15.6); 2.2113 (16.0); 2.0835 (0.4); 1.6221 (3.5); 0.0482 (0.3); 0.0374 (8.8); 0.0266 (0.4)
3-50: $^1$H-NMR(300.2 MHz, CDCl3):
δ = 8.4207 (1.0); 8.3941 (1.0); 8.0769 (0.6); 8.0691 (5.6); 7.8370 (1.5); 7.8272 (1.3); 7.8245 (1.5); 7.8210 (1.5); 7.8159 (2.1); 7.8077 (4.6); 7.7993 (1.9); 7.7955 (1.9); 7.7874 (4.6); 7.7789 (2.1); 7.7736 (1.6); 7.7702 (1.6); 7.7577 (1.5); 7.3195 (2.2); 7.2986 (18.0); 7.2698 (3.8); 7.2603 (2.9); 7.2550 (2.4); 7.2336 (1.7); 7.2113 (1.0); 7.2056 (0.9); 7.1531 (1.1); 7.1496 (1.0); 7.1266 (1.5); 7.1231 (1.7); 7.0998 (0.7); 7.0964 (0.7); 6.8690 (0.7); 6.8641 (0.8); 6.8421 (1.3); 6.8208 (0.6); 6.8159 (0.6); 4.6933 (0.4); 4.6812 (0.7); 4.6682 (0.6); 4.6548 (0.7); 4.6428 (0.5); 4.4692 (0.9); 4.4578 (0.9); 4.4368 (1.4); 4.4255 (1.3); 4.3388 (1.4); 4.3257 (1.4); 4.3063 (1.0); 4.2932 (0.8); 4.1718 (0.5); 4.1480 (0.5); 3.2454 (2.7); 3.2199 (2.8); 2.8416 (0.3); 2.7296 (16.0); 2.4928 (1.0); 2.4667 (11.8); 2.1654 (0.5); 2.1547 (0.5); 2.1371 (1.0); 2.1200 (0.6); 2.1088 (0.5); 2.0831 (2.2); 1.5947 (13.3); 1.3211 (0.7); 1.2973 (1.6); 1.2735 (0.6); 1.0706 (0.5); 1.0576 (1.8); 1.0508 (2.0); 1.0364 (0.9); 1.0291 (1.9); 1.0224 (1.8); 1.0095 (0.7); 0.9199 (0.6); 0.8255 (0.9); 0.8118 (1.9); 0.8080 (2.2); 0.8041 (1.8); 0.7945 (2.0); 0.7911 (1.9); 0.7867 (1.6); 0.7739 (0.7); 0.0485 (0.7); 0.0378 (22.2); 0.0269 (0.8)
3-51: $^1$H-NMR(300.2 MHz, CDCl3):
δ = 10.6536 (0.5); 10.6346 (0.4); 9.0611 (2.0); 9.0354 (2.0); 8.4177 (0.7); 8.4096 (0.7); 8.3715 (2.0); 8.3640 (2.0); 8.2929 (2.4); 8.2486 (12.5); 8.0699 (4.6); 8.0628 (4.7); 8.0014 (2.4); 7.8667 (1.2); 7.8563 (3.7); 7.8468 (3.3); 7.8398 (4.5); 7.8352 (4.9); 7.8268 (10.1); 7.8197 (5.4); 7.8144 (5.0); 7.8080 (10.4); 7.7993 (5.4); 7.7939 (5.3); 7.7910 (5.5); 7.7781 (4.0); 7.7573 (3.0); 7.7417 (8.2); 7.7344 (7.8); 7.7206 (1.6); 7.7119 (0.9); 7.7040 (1.2); 7.6674 (8.9); 7.6567 (16.0); 7.6407 (5.2); 7.6214 (4.2); 7.6130 (4.0); 7.6001 (1.0); 7.5914 (1.4); 7.5617 (2.8); 7.5516 (3.8); 7.5434 (3.9); 7.5325 (2.5); 7.5247 (3.1); 7.5163 (2.2); 7.4797 (0.6); 7.4728 (0.7); 7.4477 (0.4); 7.3714 (4.9); 7.3438 (4.0); 7.2992 (34.0); 7.2679 (0.9); 7.2406 (0.8); 7.1310 (2.2); 7.1036 (1.9); 5.3608 (0.3); 5.3374 (11.3); 5.3134 (0.7); 5.2960 (0.7); 5.2794 (0.4); 4.9627 (0.9); 4.9432 (1.5); 4.9202 (1.6); 4.9011 (1.0); 4.7985 (1.6); 4.7762 (0.9); 4.5436 (0.7); 4.5100 (2.9); 4.4943 (2.2); 4.4764 (3.1); 4.4603 (2.8); 4.4214 (1.2); 4.4080 (1.3); 4.3819 (0.7); 4.3680 (0.6); 4.2895 (2.8); 4.2696 (2.8); 4.2556 (2.2); 4.2357 (2.0); 4.1711 (0.5); 4.1474 (0.4); 3.7877 (0.7); 3.7551 (0.8); 3.7401 (0.9); 3.7076 (0.9); 3.5798 (0.5); 3.5445 (1.6); 3.5229 (1.9); 3.4949 (2.8); 3.4745 (2.8); 3.4086 (2.6); 3.3898 (2.7); 3.3601 (1.4); 3.3408 (1.4); 3.3267 (1.2); 3.3067 (1.1); 3.2784 (0.9); 3.2591 (0.8); 2.1179 (0.4); 2.0835 (2.4); 1.9363 (3.8); 1.7465 (0.5); 1.3204 (1.1); 1.2966 (2.0); 1.2729 (0.8); 0.9182 (0.5); 0.1068 (7.9); 0.0364 (41.2); 0.0256 (2.0)
3-52: $^1$H-NMR(300.2 MHz, CDCl3):
δ = 8.4948 (0.4); 8.4696 (0.4); 8.2870 (3.1); 7.8291 (0.7); 7.8209 (1.0); 7.8146 (3.2); 7.8053 (3.0); 7.7985 (0.8); 7.7903 (0.6); 7.7147 (0.8); 7.6335 (0.5); 7.6105 (1.8); 7.5686 (0.4); 7.5592 (0.6); 7.5522 (0.4); 7.2989 (6.6); 7.0175 (1.6); 5.3378 (0.3); 4.5166 (0.5); 4.5047 (0.4); 4.4848 (0.6); 4.4729 (0.5); 4.3087 (0.5); 4.2977 (0.5); 4.2769 (0.4); 4.2660 (0.4); 3.1513 (1.0); 3.1301 (0.7); 3.1227 (0.7); 2.3596 (4.4); 2.2062 (4.3); 1.6049 (16.0); 1.3160 (1.9); 1.2951 (2.0); 0.1072 (0.9); 0.0371 (8.1)
3-53: $^1$H-NMR(300.2 MHz, CDCl3):
δ = 8.3637 (0.8); 8.3378 (0.8); 8.0640 (4.8); 7.8507 (1.6); 7.8401 (1.8); 7.8340 (1.5); 7.8307 (1.8); 7.8218 (3.6); 7.8087 (0.8); 7.8003 (0.9); 7.7874 (3.6); 7.7784 (1.7); 7.7752 (1.6); 7.7693 (1.8); 7.7584 (1.7); 7.3647 (0.9); 7.3384 (2.0); 7.3123 (1.4); 7.2989 (8.6); 7.1431 (1.9); 7.0942 (0.8); 7.0635 (1.9); 7.0558 (1.2); 7.0526 (1.3); 7.0364 (1.5); 7.0326 (2.0); 7.0292 (1.9); 6.9994 (3.7); 6.9934 (2.2); 6.9745 (1.2); 4.6768 (0.6); 4.6637 (0.5); 4.6521 (0.6); 4.6380 (0.4); 4.4149 (0.6); 4.4015 (0.5); 4.3822 (1.5); 4.3689 (1.3); 4.3513 (1.4); 4.3361 (1.4); 4.3187 (0.6); 4.3035 (0.5); 3.1788 (2.3); 3.1549 (2.3); 2.8416 (2.2); 2.7147 (13.8); 2.2216 (8.9); 2.2040 (9.2); 1.9726 (0.5); 1.9613 (0.5); 1.9560 (0.4); 1.9446 (1.0); 1.9279 (0.6); 1.9165 (0.5); 1.6262 (16.0); 1.0265 (0.4); 1.0181 (0.4); 1.0102 (1.6); 1.0030 (2.0); 0.9869 (0.7); 0.9817 (1.7); 0.9750 (1.8); 0.9677 (0.5); 0.9591 (0.5); 0.7804 (0.6); 0.7763 (0.5); 0.7684 (1.2); 0.7638 (1.8); 0.7572 (1.6); 0.7513 (1.3); 0.7473 (1.6); 0.7405 (1.3); 0.7324 (0.4); 0.7285 (0.4); 0.0483 (0.4); 0.0375 (12.1); 0.0265 (0.4)
3-54: $^1$H-NMR(300.2 MHz, CDCl3):
δ = 8.5469 (1.0); 8.5205 (1.0); 8.0676 (1.0); 8.0602 (5.7); 7.8510 (1.7); 7.8409 (1.6); 7.8391 (1.7); 7.8347 (1.8); 7.8303 (2.3); 7.8220 (4.4); 7.8092 (2.4); 7.7969 (4.4); 7.7882 (2.3); 7.7836 (1.8); 7.7792 (2.0); 7.7674 (1.8); 7.7607 (0.4); 7.3709 (1.2); 7.3607 (0.5); 7.3546 (0.4); 7.3438 (3.0); 7.3348 (2.6); 7.3170 (1.9); 7.3094 (0.5); 7.2988 (12.5); 7.2866 (0.6); 7.2595 (4.4); 7.2496 (2.3); 7.2278 (0.3); 7.2223 (0.3); 7.0924 (1.0); 7.0887 (1.2); 7.0849 (1.2); 7.0814 (1.4); 7.0655 (1.0); 7.0622 (1.0); 7.0577 (1.3); 7.0544 (1.2); 7.0294 (3.2); 7.0224 (2.7); 7.0149 (1.9); 7.0093 (1.7); 4.6832 (0.3); 4.6684 (0.4); 4.6567 (0.8); 4.6446 (0.6); 4.6305 (0.8); 4.6184 (0.4); 4.4502 (1.0); 4.4394 (0.9); 4.4182 (1.4); 4.4075 (1.3); 4.3190 (1.4); 4.3067 (1.4); 4.2870 (1.0); 4.2748 (0.9); 3.2324 (0.4); 3.2132 (3.2); 3.1874 (3.1); 2.8411 (0.7); 2.7410 (1.1); 2.7233 (16.0); 2.4856 (1.2); 2.4598 (11.8); 2.2927 (0.8); 2.0835 (0.7); 1.9736 (0.6); 1.9623 (0.6); 1.9454 (1.2); 1.9289 (0.7); 1.9175 (0.6); 1.9006 (0.3); 1.6163 (14.1); 1.3208 (0.4); 1.2971 (1.2); 1.0204 (0.4); 1.0023 (1.8); 0.9995 (1.7); 0.9949 (2.7); 0.9735 (1.9); 0.9671 (2.6); 0.9493 (0.5); 0.9410 (0.4); 0.9305 (0.4); 0.9189 (1.1); 0.8956 (0.4); 0.7806 (0.9); 0.7721 (1.7); 0.7664 (1.4); 0.7628 (1.7); 0.7554 (2.8); 0.7497 (1.5); 0.7455 (1.5); 0.7388 (1.3); 0.7319 (0.6); 0.0478 (0.6); 0.0370 (16.8); 0.0277 (0.5); 0.0261 (0.6)

TABLE 8-continued
3-55: $^1$H-NMR(300.2 MHz, CDCl3):
δ = 8.5228 (1.1); 8.4966 (1.0); 8.0672 (5.6); 7.8426 (1.7); 7.8325 (1.8); 7.8310 (1.8); 7.8261 (1.7); 7.8221 (2.1); 7.8139 (4.3); 7.7996 (2.0); 7.7861 (4.4); 7.7769 (2.1); 7.7729 (1.8); 7.7681 (2.0); 7.7565 (1.8); 7.3648 (1.0); 7.3385 (2.1); 7.3109 (1.4); 7.2987 (10.3); 7.2639 (2.0); 7.2378 (2.2); 7.0978 (1.0); 7.0924 (1.4); 7.0866 (1.3); 7.0706 (0.8); 7.0675 (0.9); 7.0629 (1.2); 7.0600 (1.1); 7.0339 (4.0); 7.0296 (4.0); 7.0063 (1.4); 6.8969 (2.3); 6.8129 (1.2); 6.8075 (1.2); 6.7868 (1.1); 6.7815 (1.1); 4.6642 (0.4); 4.6520 (0.7); 4.6391 (0.6); 4.6262 (0.7); 4.6144 (0.5); 4.4616 (0.9); 4.4498 (0.9); 4.4297 (1.4); 4.4181 (1.3); 4.3314 (1.4); 4.3190 (1.3); 4.2995 (1.0); 4.2871 (0.8); 3.2070 (3.0); 3.1814 (2.5); 2.8416 (7.2); 2.7155 (16.0); 2.4865 (0.7); 2.4415 (11.5); 1.9708 (0.6); 1.9596 (0.6); 1.9428 (1.2); 1.9260 (0.7); 1.9150 (0.6); 1.8979 (0.4); 1.8677 (0.5); 1.8564 (0.6); 1.8397 (1.1); 1.8229 (0.6); 1.8118 (0.6); 1.7950 (0.3); 1.6244 (10.6); 1.3036 (0.9); 1.0163 (0.4); 0.9985 (1.9); 0.9916 (2.5); 0.9789 (1.0); 0.9638 (4.3); 0.9576 (2.6); 0.9431 (1.5); 0.9360 (2.3); 0.9292 (2.2); 0.9193 (1.4); 0.9154 (1.2); 0.8963 (0.5); 0.7815 (0.7); 0.7716 (1.5); 0.7644 (1.8); 0.7562 (2.3); 0.7489 (1.7); 0.7408 (1.3); 0.7295 (0.5); 0.6984 (0.9); 0.6837 (2.4); 0.6783 (2.2); 0.6671 (2.1); 0.6617 (2.4); 0.6455 (0.7); 0.0482 (0.5); 0.0374 (14.2); 0.0283 (0.5); 0.0266 (0.5)
3-56: $^1$H-NMR(300.2 MHz, CDCl3):
δ = 8.0711 (1.7); 7.8298 (0.3); 7.8156 (0.5); 7.8077 (0.6); 7.7993 (1.8); 7.7872 (1.8); 7.7790 (0.6); 7.7710 (0.5); 7.7569 (0.4); 7.6027 (0.5); 7.5814 (0.4); 7.3644 (0.8); 7.3382 (0.8); 7.2990 (8.4); 7.1563 (0.7); 7.1325 (0.3); 7.0032 (0.4); 6.9773 (0.4); 6.9497 (0.7); 6.7672 (0.4); 4.4789 (0.5); 4.4657 (0.4); 4.4002 (0.5); 4.3871 (0.5); 3.3939 (0.4); 3.3669 (0.5); 3.3582 (0.5); 3.3345 (0.4); 2.7221 (4.9); 2.2891 (3.4); 2.0839 (0.8); 1.5977 (16.0); 1.3212 (0.4); 1.2975 (1.0); 0.9193 (0.7); 0.1068 (0.9); 0.0479 (0.4); 0.0372 (9.9); 0.0263 (0.3)
3-57: $^1$H-NMR(300.2 MHz, CDCl3):
δ = 8.3646 (1.0); 8.3387 (1.0); 8.2237 (7.2); 7.8349 (1.5); 7.8253 (1.3); 7.8219 (1.7); 7.8191 (1.5); 7.8135 (2.2); 7.8060 (4.8); 7.7992 (2.1); 7.7934 (2.1); 7.7876 (4.8); 7.7789 (1.9); 7.7733 (1.8); 7.7702 (1.5); 7.7670 (1.1); 7.7575 (1.4); 7.5206 (0.4); 7.2983 (23.6); 7.2640 (0.8); 7.2582 (0.9); 7.2513 (2.0); 7.2367 (1.5); 7.2311 (1.5); 7.2260 (2.3); 7.2141 (1.1); 7.2084 (0.9); 7.1632 (1.0); 7.1367 (1.5); 7.1334 (1.5); 7.1103 (0.8); 7.1068 (0.8); 6.9868 (2.2); 6.9327 (1.2); 6.9066 (1.1); 6.8915 (0.8); 6.8697 (1.3); 6.8488 (0.7); 5.3375 (16.0); 4.6831 (0.4); 4.6712 (0.8); 4.6584 (0.7); 4.6455 (0.8); 4.6330 (0.5); 4.4989 (1.0); 4.4868 (0.8); 4.4660 (1.5); 4.4540 (1.2); 4.3459 (1.4); 4.3333 (1.3); 4.3131 (1.0); 4.3006 (0.9); 4.1721 (0.7); 4.1485 (0.5); 3.2379 (2.8); 3.2123 (2.2); 2.6030 (1.6); 2.5349 (1.4); 2.4806 (0.6); 2.4386 (11.3); 2.3741 (0.7); 2.3526 (0.5); 2.2848 (10.7); 2.2403 (0.6); 2.1671 (0.5); 2.1559 (0.5); 2.1388 (1.0); 2.1219 (0.6); 2.1102 (0.5); 2.0925 (0.4); 2.0833 (2.5); 1.5871 (15.9); 1.3214 (0.9); 1.2976 (2.1); 1.2738 (0.7); 1.0900 (0.4); 1.0864 (0.4); 1.0749 (1.8); 1.0678 (2.0); 1.0573 (1.0); 1.0523 (0.8); 1.0462 (1.9); 1.0396 (1.9); 1.0282 (0.6); 1.0245 (0.6); 0.9203 (0.8); 0.8352 (0.9); 0.8180 (2.0); 0.8135 (1.8); 0.8042 (1.9); 0.7964 (1.5); 0.7843 (0.7); 0.1079 (2.9); 0.0490 (0.9); 0.0473 (0.6); 0.0382 (23.5); 0.0305 (0.8); 0.0290 (0.8); 0.0273 (0.9)
3-58: $^1$H-NMR(300.2 MHz, CDCl3):
δ = 8.4089 (1.0); 8.3832 (1.0); 8.1117 (5.6); 7.8165 (0.8); 7.8090 (0.6); 7.8016 (1.6); 7.7935 (2.4); 7.7870 (7.7); 7.7777 (7.5); 7.7713 (2.3); 7.7630 (1.6); 7.7556 (0.6); 7.7481 (0.9); 7.6273 (0.6); 7.6017 (1.7); 7.5756 (1.7); 7.5542 (0.7); 7.3861 (1.0); 7.3593 (1.5); 7.3327 (0.6); 7.2990 (2.8); 7.2878 (1.9); 7.2623 (2.2); 7.1323 (1.1); 6.9952 (2.3); 6.9499 (2.9); 6.9332 (1.1); 6.7669 (1.1); 5.3337 (6.3); 4.6801 (0.4); 4.6678 (0.6); 4.6563 (0.6); 4.6453 (0.6); 4.6317 (0.4); 4.5022 (1.0); 4.4903 (1.0); 4.4700 (1.4); 4.4582 (1.2); 4.3107 (1.2); 4.2987 (1.3); 4.2785 (1.0); 4.2666 (0.9); 3.3047 (0.4); 3.2822 (0.4); 3.2586 (1.3); 3.2361 (1.3); 3.2247 (1.4); 3.1961 (1.2); 3.1785 (0.4); 3.1500 (0.4); 2.7365 (16.0); 2.4601 (11.4); 2.2850 (10.8); 1.6740 (2.9); 0.0374 (3.8)
TABLE 9
Compounds according to formula (4)
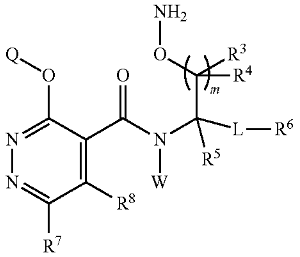
(4)
In table 9, "#" denotes the point of attachment to the L-$R^6$ group and "*" denotes the point of attachment to the pyridazin-4-yl group.
| Ex No | $R^7$ | $R^8$ | Q | 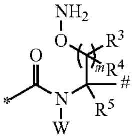 | L-$R^6$ | LogP |
|---|---|---|---|---|---|---|
| 4-01 | $CH_3$ | H | 3-(trifluoro-methyl)phenyl | 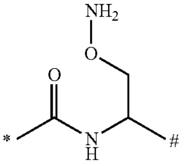 | 2,4-dichlorophenyl | 3.29[a]; 3.36[b] |

TABLE 9-continued

Compounds according to formula (4)

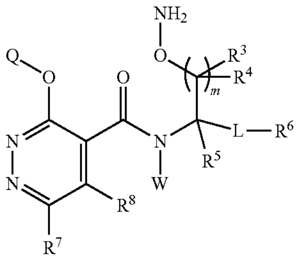

(4)

In table 9, "#" denotes the point of attachment to the L-$R^6$ group and "*" denotes the point of attachment to the pyridazin-4-yl group.

| Ex No | $R^7$ | $R^8$ | Q | 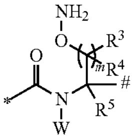 | L-$R^6$ | LogP |
|---|---|---|---|---|---|---|
| 4-02 | Cl | H | 3-(trifluoro-methyl)phenyl | 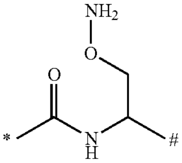 | 2,4-dichlorophenyl | 3.76[a]; 3.82[b] |
| 4-03 | Cl | H | 3-cyclopropyl-2-fluorophenyl | 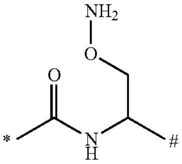 | (2,4-dimethyl-phenyl)methyl | 3.46[a] |
| 4-04 | Cl | H | 3-(difluoromethyl)-2-fluorophenyl | 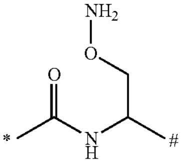 | (2,4-dimethyl-phenyl)methyl | 3.02[a] |
| 4-05 | $CH_3$ | H | 3-cyclopropyl-2-fluorophenyl | 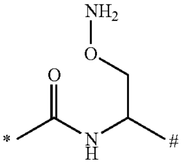 | (4-bromo-2-chloro-phenyl)methyl | 3.17[a] |
| 4-06 | Cl | $CH_3$ | 3-(trifluoro-methyl)phenyl | 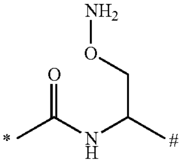 | (2,4-dimethyl-phenyl)methyl | 3.06[a] |
| 4-07 | $CH_3$ | H | 3-cyclopropylphenyl | 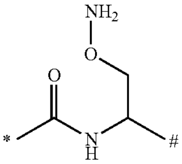 | (2,4-dimethyl-phenyl)methyl | 2.69[a] |

TABLE 9-continued

Compounds according to formula (4)

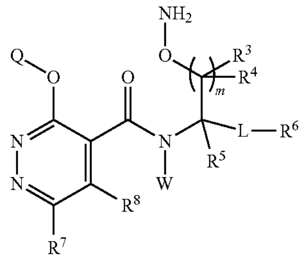

(4)

In table 9, "#" denotes the point of attachment to the L-$R^6$ group and "*" denotes the point of attachment to the pyridazin-4-yl group.

| Ex No | $R^7$ | $R^8$ | Q | 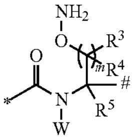 | L-$R^6$ | LogP |
|---|---|---|---|---|---|---|
| 4-08 | I | H | 3-(trifluor-omethyl)phenyl | 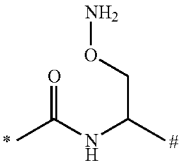 | (2,4-dimethyl-phenyl)methyl | 3.37[a] |
| 4-09 | $CH_3$ | H | 3-cyclopropyl-2-fluorophenyl | 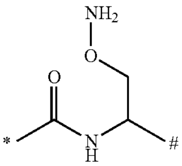 | (2,4-dimethyl-phenyl)methyl | 2.90[a] |
| 4-10 | Cl | H | 3-(trifluoro-methyl)phenyl | 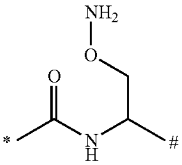 | (3,4-dimethyl-phenyl)methyl | 3.25[a] |
| 4-11 | Cl | H | 3-(trifluoro-methyl)phenyl | 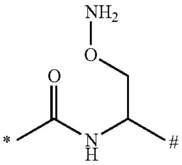 | (2,4-dichloro-phenyl)methyl | 3.51[a] |
| 4-12 | Cl | H | 3-(trifluoro-methyl)phenyl | 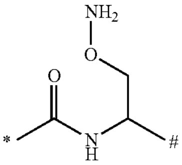 | (4-cyclopropyl-2-methyl-phenyl)methyl | 3.59[a] |
| 4-13 | Cl | H | 3-(trifluoro-methyl)phenyl | 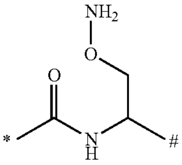 | (2-chloro-4-cyclopropyl-phenyl)methyl | 3.68[a] |

TABLE 9-continued

Compounds according to formula (4)

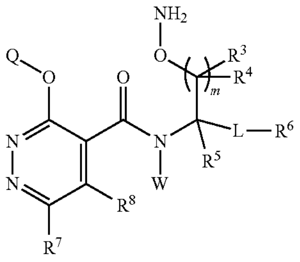

(4)

In table 9, "#" denotes the point of attachment to the L-$R^6$ group and "*" denotes the point of attachment to the pyridazin-4-yl group.

| Ex No | $R^7$ | $R^8$ | Q | 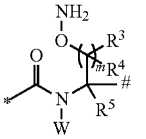 | L-$R^6$ | LogP |
|---|---|---|---|---|---|---|
| 4-14 | Cl | H | 3-(trifluoro-methyl)phenyl | 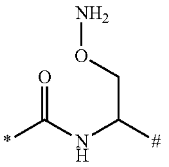 | (2-chloro-4-isopropyl-phenyl)methyl | 4.01[a] |
| 4-15 | Cl | H | 3-(trifluoro-methyl)phenyl | 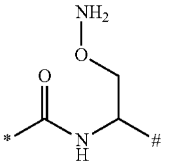 | (4-isopropyl-2-methyl-phenyl)methyl | 3.94[a] |
| 4-16 | $CH_3$ | H | 3-cyclopropyl-2-fluorophenyl | 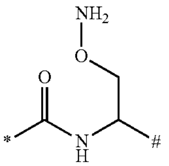 | (3,4-dimethyl-phenyl)methyl | 2.78[a] |
| 4-17 | Cl | H | 3-(trifluoro-methyl)phenyl | 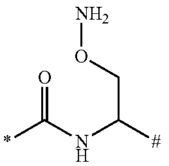 | (2,4-dimethyl-phenyl)methyl | 3.37[a] |
| 4-18 | Cl | H | 3-(trifluoro-methyl)phenyl | 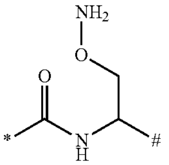 | (4-chlorophenyl)methyl | 3.18[a]; 3.42[b] |
| 4-19 | $CH_3$ | $CH_3$ | 3-(trifluoro-methyl)phenyl | 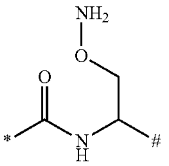 | (2,4-dimethyl-phenyl)methyl | 2.51[a] |

TABLE 9-continued

Compounds according to formula (4)

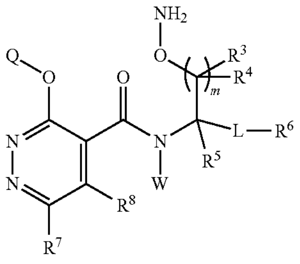

(4)

In table 9, "#" denotes the point of attachment to the L-R6 group and "*" denotes the point of attachment to the pyridazin-4-yl group.

| Ex No | $R^7$ | $R^8$ | Q | 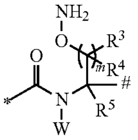 | L-$R^6$ | LogP |
|---|---|---|---|---|---|---|
| 4-20 | $CH_3$ | H | 3-(difluoro-methyl)phenyl | 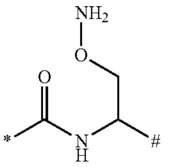 | (2,4-dimethyl-phenyl)methyl | 2.40[a] |
| 4-21 | Cl | H | 3-(trifluoro-methyl)phenyl | 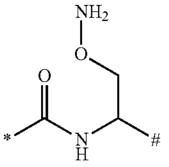 | (4-bromo-2-chloro-phenyl)methyl | 3.63[a] |
| 4-22 | Cl | H | 3-(trifluoro-methyl)phenyl | 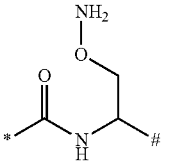 | (4-bromo-2-methyl-phenyl)methyl | 3.55[a] |
| 4-23 | Cl | H | 5-bromopyridin-3-yl | 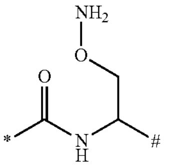 | (2,4-dimethyl-phenyl)methyl | 2.50[a] |
| 4-24 | Cl | H | 6-chloro-5-(trifluoro-methyl)pyridin-3-yl | 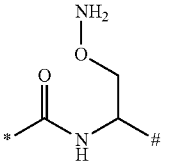 | (2,4-dimethyl-phenyl)methyl | 3.37[a] |
| 4-25 | Cl | $CH_3$ | 3-cyclopropyl-2-fluorophenyl | 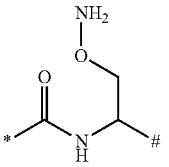 | (4-bromo-2-chlorophenyl)methyl | 3.41[a] |

TABLE 9-continued

Compounds according to formula (4)

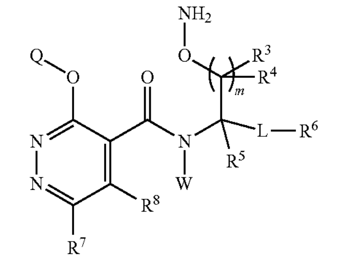

(4)

In table 9, "#" denotes the point of attachment to the L-$R^6$ group and "*" denotes the point of attachment to the pyridazin-4-yl group.

| Ex No | $R^7$ | $R^8$ | Q | 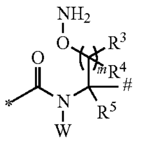 | L-$R^6$ | LogP |
|---|---|---|---|---|---|---|
| 4-26 | Cl | $CH_3$ | 3-cyclopropyl-2-fluorophenyl | 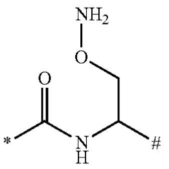 | (2-chloro-4-cyclo-propylphenyl)methyl | 3.46[a] |
| 4-27 | Cl | H | 3-cyclopropylphenyl | 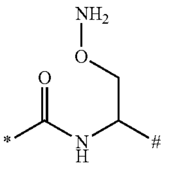 | (2,4-dimethyl-phenyl)methyl | 3.39[a] |
| 4-28 | Cl | H | 3-(1-fluoro-cyclopropyl)phenyl | 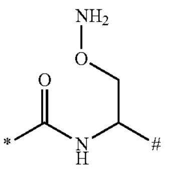 | (2,4-dimethyl-phenyl)methyl | 3.27[a] |
| 4-29 | $CH_3$ | H | 3-cyclopropyl-2-fluorophenyl | 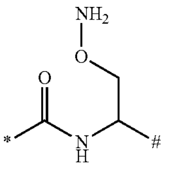 | (2-chloro-4-cyclopropyl-phenyl)methyl | 3.21[a] |
| 4-30 | Cl | $CH_3$ | 3-cyclopropyl-2-fluorophenyl | 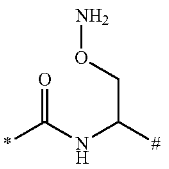 | (2,4-dichloro-phenyl)methyl | 3.33[a] |
| 4-31 | Cl | H | 3-cyclopropylphenyl | 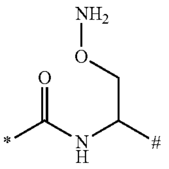 | (2,4-dichloro-phenyl)methyl | 3.68[a] |

TABLE 9-continued

Compounds according to formula (4)

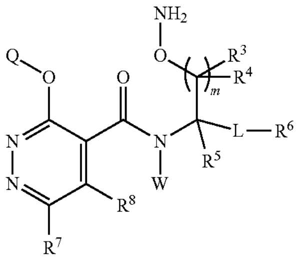

(4)

In table 9, "#" denotes the point of attachment to the L-$R^6$ group and "*" denotes the point of attachment to the pyridazin-4-yl group.

| Ex No | $R^7$ | $R^8$ | Q | 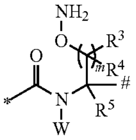 | L-$R^6$ | LogP |
|---|---|---|---|---|---|---|
| 4-32 | Cl | H | 2-fluoro-3-[rac-2,2-difluoro-cyclopropyl]phenyl | 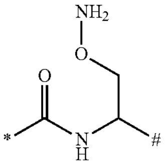 | (2,4-dimethyl-phenyl)methyl | 3.23[a] |
| 4-33 | $CH_3$ | H | 3-(trifluoro-methyl)phenyl | 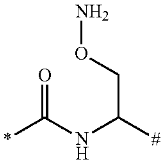 | (2,4-dimethyl-phenoxy)methyl | 3.13[a] |
| 4-34 | $CH_3$ | H | 3-(trifluoro-methyl)phenyl | 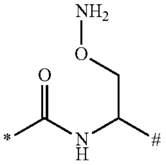 | (4-chlorophenoxy)methyl | 2.88[a] |
| 4-35 | Cl | H | 3-(trifluoro-methyl)phenyl | 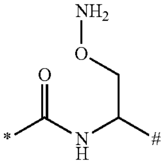 | [(2,4-dimethyl-phenyl)thio]methyl | 4.76[a] |
| 4-36 | Cl | $CH_3$ | 2-fluoro-3-[rac-2,2-difluoro-cyclopropyl]phenyl | 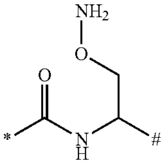 | (2,4-dimethyl-phenyl)methyl | 3.03[a] |
| 4-37 | $CH_3$ | H | 2-fluoro-3-(trifluoro-methyl)phenyl | 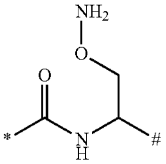 | (2,4-dimethyl-phenyl)methyl | 2.88[a] |

TABLE 9-continued

Compounds according to formula (4)

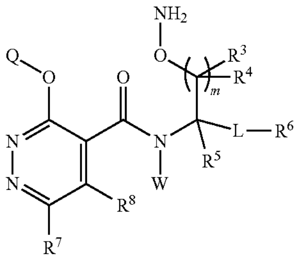

(4)

In table 9, "#" denotes the point of attachment to the L-$R^6$ group and "*" denotes the point of attachment to the pyridazin-4-yl group.

| Ex No | $R^7$ | $R^8$ | Q | 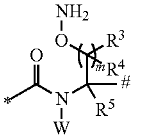 | L-$R^6$ | LogP |
|---|---|---|---|---|---|---|
| 4-38 | $CH_3$ | H | 2-fluoro-3-(trifluoro-methyl)phenyl | 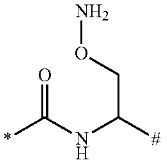 | (2,4-dichloro-phenyl)methyl | 3.04[a] |
| 4-39 | $CH_3$ | H | 3-(difluoro-methyl)phenyl | 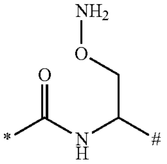 | (2,4-dichloro-phenyl)methyl | 2.61[a] |
| 4-40 | Cl | H | 2-fluoro-3-(1-fluoro-cyclopropyl)phenyl | 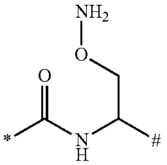 | (2,4-dimethyl-phenyl)methyl | 3.28[a] |
| 4-41 | Cl | $CH_3$ | 2-fluoro-3-(1-fluoro-cyclopropyl)phenyl | 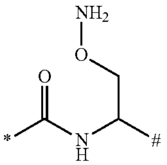 | (2,4-dimethylphenyl)methyl | 3.01[a] |
| 4-42 | $CH_3$ | H | 3-chloro-2-fluorophenyl | 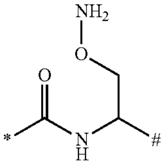 | (2-chloro-4-cyclo-propylphenyl)methyl | 3.01[a] |
| 4-43 | $CH_3$ | H | 3-chloro-2-fluorophenyl | 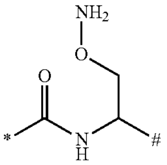 | (4-cyclopropyl-2-methylphenyl)methyl | 2.91[a] |

TABLE 9-continued

Compounds according to formula (4)

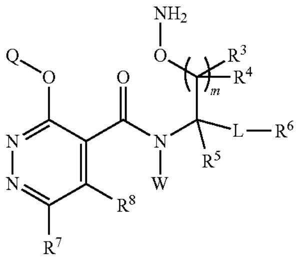

(4)

In table 9, "#" denotes the point of attachment to the L-$R^6$ group and "*" denotes the point of attachment to the pyridazin-4-yl group.

| Ex No | $R^7$ | $R^8$ | Q | 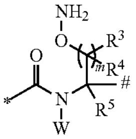 | L-$R^6$ | LogP |
|---|---|---|---|---|---|---|
| 4-44 | $CH_3$ | H | 3-chloro-2-fluorophenyl | 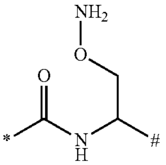 | (4-bromo-2-methyl-phenyl)methyl | 2.86[a] |
| 4-45 | $CH_3$ | H | 3-chloro-2-fluorophenyl | 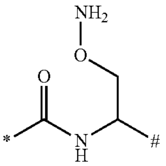 | (3,4-dimethyl-phenyl)methyl | 2.65[a] |
| 4-46 | $CH_3$ | H | 3-(difluoromethyl)-2-fluorophenyl | 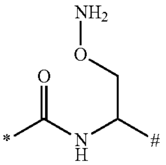 | (4-cyclopropyl-2-methylphenyl)methyl | 2.83[a] |
| 4-47 | $CH_3$ | H | 3-(difluoro-methyl)phenyl | 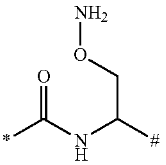 | (3,4-dimethyl-phenyl)methyl | 2.44[a] |
| 4-48 | $CH_3$ | H | 3-(difluoro-methyl)phenyl | 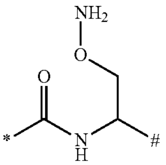 | (4-cyclopropyl-2-methylphenyl)methyl | 2.73[a] |
| 4-49 | $CH_3$ | H | 3-(difluoromethyl)-2-fluorophenyl | 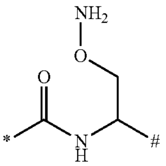 | (2,4-dimethyl-phenyl)methyl | 2.59[a] |

TABLE 9-continued

Compounds according to formula (4)

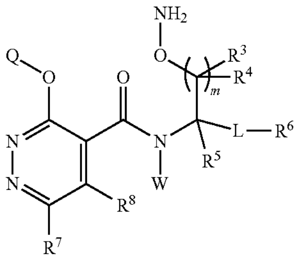

(4)

In table 9, "#" denotes the point of attachment to the L-$R^6$ group and "*" denotes the point of attachment to the pyridazin-4-yl group.

| Ex No | $R^7$ | $R^8$ | Q | 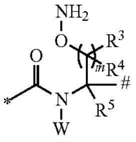 | L-$R^6$ | LogP |
|---|---|---|---|---|---|---|
| 4-50 | $CH_3$ | H | 3-(difluoromethyl)-2-fluorophenyl | 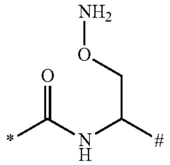 | (3,4-dimethyl-phenyl)methyl | 2.51[a] |
| 4-51 | $CH_3$ | H | 3-cyclopropyl-2-fluorophenyl | 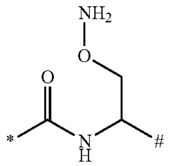 | (4-bromo-2-methyl-phenyl)methyl | 3.08[a] |
| 4-52 | Cl | H | 3-(trifluoro-methyl)phenyl | 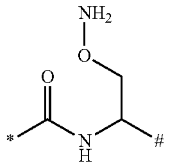 | (5-chloropyridin-2-yl)methyl | 2.50[a] |
| 4-53 | Cl | H | 3-(trifluoro-methyl)phenyl | 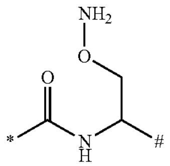 | (4,5-dimethyl-3-thienyl)methyl | 3.24[a] |
| 4-54 | $CH_3$ | H | 3-cyclopropylphenyl | 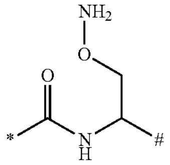 | (3,4-dimethyl-phenyl)methyl | 2.83[a] |
| 4-55 | $CH_3$ | H | 3-cyclopropylphenyl | 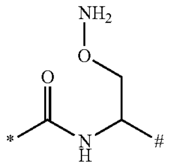 | (4-bromo-2-methyl-phenyl)methyl | 3.10[a] |

TABLE 9-continued

Compounds according to formula (4)

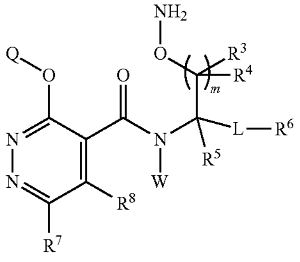

(4)

In table 9, "#" denotes the point of attachment to the L-$R^6$ group and "*" denotes the point of attachment to the pyridazin-4-yl group.

| Ex No | $R^7$ | $R^8$ | Q | 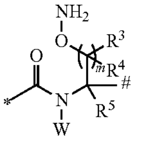 | L-$R^6$ | LogP |
|---|---|---|---|---|---|---|
| 4-56 | $CH_3$ | H | 3-cyclopropylphenyl | 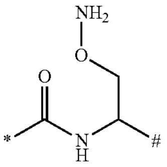 | (2-chloro-4-cyclopropyl-phenyl)methyl | 3.25[a] |
| 4-57 | $CH_3$ | H | 3-(difluoromethyl)-2-fluorophenyl | 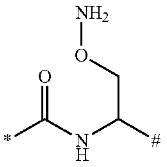 | (2-chloro-4-methyl-phenyl)methyl | 2.67[a] |

TABLE 10

4-01: $^1$H-NMR(400.2 MHz, $d_6$-DMSO):
δ = 9.4264 (1.4); 9.4079 (1.4); 7.8269 (5.7); 7.7301 (0.7); 7.7105 (1.9); 7.6908 (1.6); 7.6581 (3.5); 7.6362 (1.1); 7.6128 (4.2); 7.6074 (4.2); 7.5899 (1.5); 7.5714 (1.0); 7.5396 (2.2); 7.5185 (2.6); 7.3288 (1.8); 7.3235 (1.8); 7.3078 (1.5); 7.3025 (1.5); 5.6745 (0.5); 5.6565 (1.2); 5.6435 (1.0); 5.6382 (0.8); 5.6253 (0.5); 3.7626 (0.4); 3.7466 (2.1); 3.7428 (2.1); 3.7352 (1.8); 3.7239 (1.5); 3.6958 (0.3); 3.4354 (0.3); 3.3975 (0.4); 3.3754 (0.4); 3.3686 (0.5); 3.3433 (0.5); 3.3158 (0.4); 2.6756 (0.4); 2.6709 (0.5); 2.6663 (0.4); 2.6181 (16.0); 2.5242 (1.4); 2.5194 (2.2); 2.5107 (29.1); 2.5064 (57.5); 2.5018 (75.0); 2.4973 (55.0); 2.4930 (27.3); 2.3330 (0.3); 2.3287 (0.5); 2.3242 (0.4); 2.0737 (0.4); 0.1461 (0.4); 0.1230 (0.4); 0.0080 (2.6); −0.0002 (82.1); −0.0085 (3.1); −0.1495 (0.4)
4-02: $^1$H-NMR(400.2 MHz, $d_6$-DMSO):
δ = 9.5104 (2.8); 9.4918 (2.8); 8.3144 (0.7); 8.1803 (16.0); 7.7577 (1.1); 7.7380 (3.4); 7.7234 (4.6); 7.7195 (6.1); 7.6939 (3.8); 7.6749 (1.7); 7.6429 (2.6); 7.6173 (7.8); 7.6120 (7.2); 7.5398 (4.9); 7.5187 (6.0); 7.3351 (3.5); 7.3298 (3.4); 7.3141 (2.9); 7.3087 (2.9); 5.7543 (5.1); 5.6710 (0.9); 5.6592 (1.1); 5.6523 (2.1); 5.6403 (1.9); 5.6337 (1.3); 5.6215 (0.9); 3.7807 (0.9); 3.7686 (1.2); 3.7524 (3.5); 3.7393 (4.9); 3.7187 (3.1); 3.7099 (1.1); 3.6907 (1.1); 3.3237 (59.5); 2.6797 (0.7); 2.6753 (1.5); 2.6707 (2.1); 2.6662 (1.5); 2.6617 (0.7); 2.6176 (0.5); 2.5242 (6.6); 2.5194 (10.0); 2.5108 (126.0); 2.5063 (250.8); 2.5018 (328.0); 2.4972 (239.8); 2.4928 (118.0); 2.3377 (0.8); 2.3331 (1.6); 2.3286 (2.1); 2.3241 (1.6); 2.3198 (0.7); 2.0735 (1.3); 0.1461 (1.7); 0.0184 (0.5); 0.0080 (13.0); −0.0002 (382.0); −0.0085 (14.4); −0.1494 (1.7)
4-03: $^1$H-NMR(300.2 MHz, CDCl3):
δ = 8.4942 (1.0); 8.4682 (1.0); 8.2884 (8.9); 7.2986 (24.3); 7.1809 (0.6); 7.1539 (2.0); 7.1281 (4.0); 7.1238 (2.5); 7.1104 (1.5); 7.1041 (1.9); 7.0849 (2.8); 7.0598 (3.1); 6.9700 (2.9); 6.9075 (1.0); 6.8859 (3.0); 6.8789 (1.6); 6.8608 (2.0); 5.5759 (5.8); 5.3377 (10.9); 4.6628 (0.5); 4.6524 (0.6); 4.6452 (0.7); 4.6349 (0.8); 4.6255 (0.7); 4.6189 (0.6); 4.6075 (0.6); 3.8733 (1.2); 3.8622 (1.2); 3.8352 (2.4); 3.8241 (2.2); 3.7703 (2.2); 3.7520 (2.1); 3.7321 (1.2); 3.7139 (1.1); 3.0017 (4.7); 2.9773 (4.6); 2.6036 (0.5); 2.5355 (0.4); 2.4075 (16.0); 2.3743 (0.4); 2.2727 (14.8); 2.2402 (0.4); 2.1933 (0.4); 2.1756 (0.6); 2.1650 (0.7); 2.1475 (1.3); 2.1304 (0.8); 2.1190 (0.7); 2.1023 (0.4); 2.0836 (0.8); 1.5892 (13.4); 1.3218 (0.4); 1.2977 (0.9); 1.1173 (1.0); 1.1024 (2.4); 1.0954 (2.7); 1.0807 (1.6); 1.0738 (2.6); 1.0671 (2.5); 1.0525 (1.2); 0.8495 (1.3); 0.8344 (3.0); 0.8285 (2.9); 0.8174 (2.7); 0.8121 (3.1); 0.7956 (1.0); 0.1080 (4.1); 0.0493 (0.9); 0.0385 (23.5); 0.0276 (0.9)
4-04: $^1$H-NMR(300.2 MHz, CDCl3):
δ = 8.3531 (0.8); 8.3266 (0.9); 8.3029 (9.1); 8.2979 (1.4); 7.6447 (0.8); 7.6209 (1.3); 7.6017 (0.8); 7.4923 (0.6); 7.4684 (1.3); 7.4480 (1.0); 7.4415 (0.8); 7.4208 (1.9); 7.3936 (2.0); 7.3667 (0.7); 7.2987 (15.0); 7.1293 (1.5); 7.0969 (0.3); 7.0763 (2.1); 7.0507 (2.7); 6.9910 (0.5); 6.9656 (2.5); 6.9472 (3.1); 6.8896 (1.5); 6.8637 (1.1); 6.7649 (1.5); 5.5723 (2.6); 5.3374 (16.0); 4.6678 (0.5); 4.6569 (0.5); 4.6500 (0.6); 4.6403 (0.7); 4.6303 (0.6); 4.6233 (0.6); 4.6124 (0.5); 4.1731 (0.4); 4.1678 (0.3); 3.8756 (1.0); 3.8646 (1.1); 3.8373 (2.2); 3.8263 (2.0); 3.7736 (2.0); 3.7555 (2.0); 3.7353 (1.0); 3.7172 (1.0); 3.0308 (0.5);

TABLE 10-continued 3.0077 (4.3); 2.9834 (4.1); 2.4224 (2.0); 2.4021 (14.3); 2.2882 (2.0); 2.2628 (13.1); 2.0092 (0.4); 1.7645 (2.2); 1.6738 (1.5); 1.5973 (4.0); 1.2976 (0.5); 0.9950 (0.4); 0.9916 (0.6); 0.9694 (1.0); 0.9667 (1.3); 0.9416 (0.6); 0.1087 (1.3); 0.0496 (0.6); 0.0387 (16.6); 0.0279 (0.5)
4-05: $^{1}$H-NMR(300.2 MHz, CDCl3):
δ = 8.3293 (0.7); 8.3029 (0.7); 8.0813 (3.9); 8.0578 (0.4); 7.9229 (0.4); 7.9124 (0.4); 7.9050 (0.4); 7.8949 (0.5); 7.7956 (0.6); 7.7854 (0.4); 7.7782 (0.4); 7.5138 (2.0); 7.5075 (2.0); 7.2993 (27.9); 7.2652 (1.5); 7.2593 (1.5); 7.2107 (2.5); 7.1835 (1.3); 7.1500 (2.7); 7.1328 (2.0); 7.1256 (2.2); 6.8830 (0.5); 6.8625 (0.8); 6.8513 (0.9); 6.8393 (0.5); 6.8296 (0.4); 5.6053 (2.6); 5.3384 (9.3); 4.8221 (0.5); 4.8139 (0.5); 4.7902 (0.3); 4.1798 (0.6); 3.9277 (0.7); 3.9160 (0.7); 3.8904 (1.2); 3.8782 (1.1); 3.8037 (1.2); 3.7848 (1.1); 3.7659 (0.7); 3.7471 (0.7); 3.1483 (0.3); 3.1240 (1.5); 3.1126 (1.5); 3.1019 (1.4); 3.0864 (1.3); 2.9947 (2.6); 2.9225 (2.4); 2.8422 (13.2); 2.7308 (11.6); 2.1745 (0.4); 2.1637 (0.5); 2.1461 (0.8); 2.1297 (0.5); 2.1184 (0.5); 1.5902 (16.0); 1.1037 (0.5); 1.0877 (1.4); 1.0818 (1.6); 1.0667 (0.9); 1.0593 (1.5); 1.0531 (1.6); 1.0389 (0.7); 0.8430 (0.6); 0.8220 (1.9); 0.8109 (1.7); 0.8049 (2.0); 0.7888 (0.6); 0.1076 (0.4); 0.0384 (33.0)
4-06: $^{1}$H-NMR(300.2 MHz, CDCl3):
δ = 7.5743 (1.6); 7.5543 (4.2); 7.5518 (3.7); 7.4635 (2.0); 7.4208 (0.8); 7.4106 (1.2); 7.4032 (1.0); 7.3903 (0.8); 7.3822 (0.4); 7.2991 (5.8); 7.1002 (1.8); 7.0746 (2.2); 6.9869 (2.2); 6.8936 (1.3); 6.8681 (1.0); 6.7547 (0.9); 6.7260 (1.0); 5.5895 (1.4); 5.3373 (0.5); 4.7540 (0.4); 4.7436 (0.4); 4.7352 (0.5); 4.7252 (0.6); 4.7152 (0.5); 4.7066 (0.4); 4.6994 (0.4); 3.8770 (0.9); 3.8660 (0.9); 3.8389 (1.6); 3.8281 (1.4); 3.7527 (1.4); 3.7334 (1.4); 3.7147 (0.8); 3.6954 (0.8); 2.9608 (2.8); 2.9359 (2.5); 2.3908 (12.0); 2.3557 (16.0); 2.2590 (11.0); 1.6273 (1.7); 1.2959 (0.4); 0.9197 (0.3); 0.0380 (5.9)
4-07: $^{1}$H-NMR(300.2 MHz, CDCl3):
δ = 8.5484 (0.8); 8.5220 (0.8); 8.1316 (5.3); 7.3789 (1.2); 7.3527 (2.6); 7.3264 (1.6); 7.2985 (8.9); 7.0784 (1.8); 7.0528 (2.3); 7.0303 (1.5); 7.0042 (1.4); 6.9990 (1.3); 6.9972 (1.4); 6.9938 (1.2); 6.9887 (1.5); 6.9856 (1.5); 6.9726 (2.4); 6.9621 (1.4); 6.9326 (1.8); 6.9265 (2.2); 6.9197 (1.2); 6.8903 (1.2); 6.8640 (0.9); 5.5661 (3.3); 5.3373 (4.8); 4.6634 (0.4); 4.6523 (0.4); 4.6455 (0.5); 4.6356 (0.6); 4.6260 (0.5); 4.6188 (0.4); 4.6081 (0.4); 3.8555 (0.8); 3.8440 (0.8); 3.8179 (1.7); 3.8065 (1.5); 3.7563 (1.6); 3.7378 (1.5); 3.7187 (0.8); 3.7002 (0.8); 2.9746 (3.4); 2.9502 (3.3); 2.8414 (1.0); 2.7284 (16.0); 2.4032 (11.7); 2.2843 (10.8); 1.9859 (0.6); 1.9745 (0.6); 1.9578 (1.1); 1.9411 (0.6); 1.9300 (0.6); 1.6272 (4.9); 1.0670 (0.7); 1.0521 (1.9); 1.0451 (2.1); 1.0304 (1.1); 1.0237 (2.0); 1.0169 (1.8); 1.0025 (0.9); 0.7874 (0.9); 0.7723 (2.4); 0.7662 (2.0); 0.7558 (2.0); 0.7504 (2.4); 0.7340 (0.7); 0.0480 (0.4); 0.0372 (9.5); 0.0264 (0.3)
4-08: $^{1}$H-NMR(300.2 MHz, CDCl3):
δ = 8.5851 (2.9); 8.3666 (0.4); 8.3414 (0.4); 8.0516 (1.9); 7.6494 (1.5); 7.6325 (2.0); 7.4774 (1.1); 7.4438 (0.5); 7.4354 (0.5); 7.4294 (0.6); 7.4230 (0.6); 7.4138 (0.5); 7.4064 (0.3); 7.2991 (5.9); 7.0597 (0.9); 7.0341 (1.2); 6.9704 (1.4); 6.8836 (0.7); 6.8586 (0.6); 5.5622 (0.6); 5.3360 (3.0); 4.6248 (0.4); 3.8703 (0.4); 3.8593 (0.5); 3.8320 (0.8); 3.8211 (0.8); 3.7676 (0.8); 3.7496 (0.8); 3.7294 (0.5); 3.7114 (0.4); 2.9928 (16.0); 2.9685 (2.0); 2.9189 (12.9); 2.8535 (0.6); 2.8398 (12.6); 2.5989 (0.9); 2.5341 (0.8); 2.4302 (0.4); 2.3931 (6.0); 2.3705 (1.0); 2.3247 (0.6); 2.3156 (0.7); 2.2994 (0.5); 2.2723 (5.7); 2.2366 (0.8); 1.2893 (0.4); 0.1063 (0.6); 0.0355 (7.4); 0.0250 (0.6)
4-09: $^{1}$H-NMR(300.2 MHz, CDCl3):
δ = 8.4893 (0.7); 8.4622 (0.7); 8.1340 (5.3); 7.2986 (10.2); 7.1365 (3.4); 7.1187 (2.5); 7.1142 (2.0); 7.1083 (1.7); 7.0964 (1.8); 7.0708 (2.1); 6.9661 (2.0); 6.8878 (1.2); 6.8740 (0.8); 6.8578 (1.7); 6.8429 (1.1); 6.8290 (0.6); 6.8202 (0.5); 5.5930 (4.3); 5.3376 (6.4); 4.6797 (0.4); 4.6686 (0.4); 4.6615 (0.5); 4.6519 (0.5); 4.6418 (0.4); 4.6346 (0.4); 4.6237 (0.4); 3.8724 (0.8); 3.8609 (0.8); 3.8347 (1.6); 3.8232 (1.5); 3.7705 (1.5); 3.7517 (1.5); 3.7328 (0.8); 3.7140 (0.8); 2.9963 (3.2); 2.9720 (3.1); 2.8413 (0.4); 2.7316 (16.0); 2.4111 (11.1); 2.2693 (10.3); 2.1737 (0.5); 2.1624 (0.5); 2.1454 (1.0); 2.1281 (0.5); 2.1172 (0.5); 1.6214 (7.0); 1.0988 (0.7); 1.0841 (1.7); 1.0770 (1.9); 1.0708 (1.0); 1.0624 (1.1); 1.0555 (1.8); 1.0487 (1.7); 1.0342 (0.8); 0.8393 (0.9); 0.8244 (2.0); 0.8217 (1.9); 0.8184 (2.0); 0.8074 (1.8); 0.8020 (2.1); 0.7856 (0.7); 0.1072 (1.5); 0.0479 (0.4); 0.0371 (10.7); 0.0262 (0.4)
4-10: $^{1}$H-NMR(300.2 MHz, CDCl3):
δ = 8.3120 (8.0); 8.1748 (0.9); 8.1483 (0.9); 8.1096 (0.4); 7.6560 (4.2); 7.6387 (4.1); 7.5841 (0.4); 7.4593 (2.3); 7.4293 (0.4); 7.4171 (1.0); 7.4088 (1.0); 7.3996 (1.4); 7.3929 (1.2); 7.3867 (0.9); 7.3784 (0.6); 7.2986 (15.0); 7.0095 (3.2); 6.9479 (7.9); 6.9448 (7.9); 5.5944 (2.4); 5.3373 (5.2); 4.7284 (0.5); 4.7159 (0.6); 4.7062 (0.7); 4.6940 (0.7); 4.6894 (0.7); 4.6799 (0.6); 4.6677 (0.5); 3.8849 (1.2); 3.8729 (1.2); 3.8467 (2.2); 3.8347 (2.0); 3.7582 (2.0); 3.7375 (1.9); 3.7200 (1.2); 3.6993 (1.1); 2.9561 (2.7); 2.9511 (2.7); 2.9306 (3.1); 2.2886 (0.7); 2.2781 (0.8); 2.1918 (16.0); 2.1817 (15.7); 1.6069 (2.1); 1.2931 (0.4); 0.1082 (1.2); 0.0490 (0.6); 0.0383 (19.0); 0.0273 (0.7)
4-11: $^{1}$H-NMR(300.2 MHz, CDCl3):
δ = 8.3034 (1.9); 8.2671 (16.0); 8.0569 (0.6); 7.8932 (0.3); 7.7950 (0.4); 7.6958 (0.5); 7.6681 (5.2); 7.6627 (3.8); 7.6507 (9.6); 7.5985 (0.6); 7.5021 (4.5); 7.4706 (1.0); 7.4569 (2.0); 7.4431 (2.7); 7.4369 (2.7); 7.4270 (2.1); 7.4186 (1.4); 7.3549 (6.5); 7.3479 (6.8); 7.2986 (39.9); 7.2800 (4.8); 7.2643 (0.8); 7.2525 (8.0); 7.2318 (0.4); 7.1838 (5.0); 7.1768 (4.6); 7.1563 (2.8); 7.1494 (2.6); 5.5747 (10.3); 5.3375 (4.8); 4.8424 (0.3); 4.8153 (1.0); 4.8006 (1.2); 4.7900 (1.5); 4.7635 (1.1); 4.7468 (0.5); 4.7347 (0.4); 4.3179 (0.5); 3.9240 (2.3); 3.9127 (2.4); 3.9000 (0.4); 3.8857 (4.3); 3.8745 (3.9); 3.7995 (3.9); 3.7815 (3.9); 3.7611 (2.4); 3.7432 (2.2); 3.2068 (1.0); 3.1809 (1.0); 3.1603 (4.4); 3.1359 (6.7); 3.1144 (4.2); 3.0912 (1.0); 3.0678 (0.8); 1.5910 (12.7); 1.2941 (0.9); 0.1073 (2.1); 0.0485 (1.7); 0.0377 (51.4); 0.0267 (1.8)
4-12: $^{1}$H-NMR(300.2 MHz, CDCl3):
δ = 8.4370 (1.1); 8.4102 (1.0); 8.3174 (8.6); 8.1076 (0.4); 7.6916 (0.3); 7.6629 (3.5); 7.6456 (5.4); 7.5911 (0.4); 7.5393 (0.4); 7.5044 (2.6); 7.4686 (0.6); 7.4555 (1.3); 7.4475 (1.1); 7.4410 (1.7); 7.4346 (1.5); 7.4254 (1.1); 7.4171 (0.8); 7.2986 (19.3); 7.1630 (0.4); 7.1519 (0.4); 7.1072 (0.6); 7.0807 (0.5); 7.0655 (2.5); 7.0395 (3.0); 6.8983 (0.5); 6.8726 (3.3); 6.7781 (1.7); 6.7725 (1.6); 6.7520 (1.4); 6.7465 (1.3); 5.5561 (0.5); 5.3378 (12.9); 4.6404 (0.6); 4.6227 (0.7); 4.6138 (0.8); 4.6047 (0.7); 4.5892 (0.6); 4.2910 (0.3); 3.8671 (1.1); 3.8563 (1.1); 3.8451 (0.3); 3.8288 (2.2); 3.8180 (2.0); 3.7649 (2.3); 3.7472 (2.1); 3.7264 (1.3); 3.7089 (1.1); 3.0508 (0.3); 3.0174 (0.4); 2.9948 (4.7); 2.9690 (3.2); 2.9227 (0.6); 2.8608 (0.8); 2.8530 (1.0); 2.8425 (5.2); 2.7206 (0.5); 2.6503 (2.0); 2.5976 (0.8); 2.5321 (0.8); 2.4973 (0.6); 2.4844 (0.6); 2.4606 (0.5); 2.4465 (1.0); 2.4387 (0.9); 2.4010 (16.0); 2.3710 (0.6); 2.3203 (1.3); 2.0073 (0.4); 1.8635 (0.6); 1.8469 (1.0); 1.8358 (1.0); 1.8191 (1.6); 1.8023 (1.0); 1.7911 (1.0); 1.7742 (0.5); 1.3947 (0.5); 1.3734 (0.5); 1.2921 (0.8); 0.9795 (1.3); 0.9648 (3.0); 0.9581 (3.4); 0.9439 (1.8); 0.9366 (3.2); 0.9299 (3.0); 0.9161 (1.4); 0.7074 (0.5); 0.6943 (0.7); 0.6880 (0.7); 0.6742 (1.6); 0.6597 (3.2); 0.6544 (2.9); 0.6431 (2.9); 0.6377 (3.1); 0.6219 (1.0); 0.1081 (2.7); 0.0485 (0.7); 0.0379 (24.0); 0.0270 (1.0)
4-13: $^{1}$H-NMR(300.2 MHz, CDCl3):
δ = 8.3099 (0.4); 8.2680 (16.0); 8.1493 (2.0); 8.1212 (2.0); 8.0665 (0.7); 8.0229 (0.4); 7.8920 (0.4); 7.8079 (0.5); 7.7950 (0.6); 7.7795 (0.5); 7.7666 (0.3); 7.7239 (0.4); 7.7075 (0.6); 7.6898 (0.8); 7.6633 (7.2); 7.6458 (10.6); 7.6213 (0.4); 7.6091 (0.4); 7.5934 (0.6); 7.5833 (0.6); 7.5539 (0.7); 7.5422 (0.5); 7.4987 (4.9); 7.4689 (1.4); 7.4556 (2.4); 7.4458 (2.9); 7.4409 (3.5); 7.4343 (2.9); 7.4252 (2.4); 7.4171 (1.8); 7.3855 (0.5); 7.3574 (0.3); 7.2987 (31.6); 7.2496 (0.5); 7.2242 (0.5); 7.1890 (1.0); 7.1779 (6.1); 7.1515 (6.6); 7.1038 (0.7); 7.0909 (0.4); 7.0836 (0.4); 7.0653 (0.6); 7.0387 (0.6); 7.0150 (6.9); 7.0092 (6.9); 6.9476 (0.5); 6.9239 (0.5); 6.8969 (0.4); 6.8608 (3.9); 6.8549 (3.6); 6.8345 (3.3); 6.8286 (3.0); 5.6459 (0.4); 5.6374 (0.4); 5.5899 (0.4); 5.5433 (0.4); 5.5253 (0.4); 5.3373 (2.6); 4.8645 (0.4); 4.8525 (0.5); 4.8405 (1.0); 4.8286 (1.2); 4.8207 (1.4); 4.8094 (1.5); 4.7930 (1.3); 4.7810 (1.1); 4.7682 (0.6); 4.7566 (0.5); 4.3030 (0.6); 4.1825 (0.4); 4.1639 (0.4); 3.9301 (2.6); 3.9182 (2.6); 3.9087 (0.6); 3.8922 (4.4); 3.8805 (4.0); 3.8165 (0.4); 3.7884 (3.9); 3.7686 (3.9); 3.7505 (2.6); 3.7307 (2.5);

TABLE 10-continued 3.7018 (0.4); 3.1801 (0.5); 3.1540 (0.7); 3.1125 (7.9); 3.0882 (8.8); 3.0668 (0.7); 3.0438 (0.4); 3.0197 (0.3); 2.9948 (0.3); 2.8409 (4.2); 2.7308 (0.3); 2.6474 (0.7); 2.6029 (1.6); 2.5410 (1.6); 2.5226 (0.6); 2.5002 (0.6); 1.8814 (0.4); 1.8592 (1.0); 1.8425 (1.6); 1.8311 (1.9); 1.8143 (3.1); 1.7975 (1.9); 1.7865 (1.8); 1.7695 (0.9); 1.7490 (0.6); 1.7160 (0.5); 1.4777 (0.5); 1.4528 (1.1); 1.4360 (2.4); 1.4139 (2.4); 1.2912 (0.8); 1.0175 (2.2); 1.0021 (5.5); 0.9957 (6.3); 0.9807 (3.6); 0.9739 (6.0); 0.9677 (5.6); 0.9528 (2.8); 0.9344 (0.6); 0.9225 (0.5); 0.9025 (0.4); 0.7254 (0.7); 0.7083 (0.9); 0.6753 (2.8); 0.6599 (6.6); 0.6545 (5.7); 0.6434 (5.9); 0.6381 (6.8); 0.6219 (2.3); 0.1074 (3.3); 0.0477 (1.1); 0.0370 (40.0); 0.0261 (1.8)
4-14: $^1$H-NMR(300.2 MHz, CDCl3):
δ = 8.2695 (5.8); 8.2625 (0.9); 8.1828 (0.8); 8.1548 (0.8); 7.6916 (0.4); 7.6631 (3.0); 7.6457 (4.2); 7.5532 (0.5); 7.5434 (0.4); 7.5142 (2.0); 7.4767 (0.4); 7.4648 (1.0); 7.4566 (1.0); 7.4500 (1.3); 7.4434 (1.2); 7.4345 (1.0); 7.4128 (0.4); 7.2989 (12.8); 7.2709 (0.4); 7.2285 (2.2); 7.2151 (0.5); 7.2021 (2.9); 7.1897 (2.8); 7.1842 (2.8); 7.0880 (0.4); 7.0270 (1.5); 7.0213 (1.4); 7.0008 (1.2); 6.9950 (1.1); 4.8509 (0.4); 4.8210 (0.6); 4.8040 (0.5); 4.7921 (0.4); 3.9394 (1.0); 3.9276 (1.0); 3.9016 (1.7); 3.8899 (1.6); 3.7964 (1.5); 3.7767 (1.4); 3.7585 (1.0); 3.7388 (1.0); 3.1540 (0.4); 3.1281 (2.5); 3.1056 (2.8); 3.0816 (0.4); 2.9943 (0.4); 2.8876 (0.4); 2.8645 (1.0); 2.8411 (4.0); 2.8185 (1.0); 2.7956 (0.5); 2.6492 (0.4); 2.6027 (0.8); 2.5422 (0.8); 1.4561 (0.5); 1.4389 (1.4); 1.4165 (1.4); 1.2823 (0.8); 1.2748 (0.7); 1.2586 (1.3); 1.2522 (0.8); 1.2427 (0.9); 1.2292 (16.0); 1.2062 (16.0); 1.1802 (0.8); 0.9339 (0.4); 0.1075 (1.1); 0.0371 (15.8); 0.0262 (0.9)
4-15: $^1$H-NMR(300.2 MHz, CDCl3):
δ = 8.4712 (0.8); 8.4447 (0.8); 8.3224 (5.9); 7.6768 (0.3); 7.6632 (2.7); 7.6459 (3.9); 7.5189 (2.0); 7.4824 (0.5); 7.4673 (0.9); 7.4586 (0.8); 7.4525 (1.3); 7.4462 (1.1); 7.4368 (0.8); 7.4285 (0.7); 7.2988 (10.0); 7.1102 (1.8); 7.0843 (2.5); 7.0590 (0.4); 7.0294 (2.6); 6.9486 (1.4); 6.9434 (1.2); 6.9229 (1.0); 6.9176 (0.9); 5.3376 (1.4); 4.6526 (0.4); 4.6419 (0.5); 4.6355 (0.5); 4.6258 (0.6); 4.6141 (0.5); 4.6022 (0.5); 3.8770 (0.8); 3.8662 (0.8); 3.8387 (1.7); 3.8280 (1.5); 3.7791 (1.6); 3.7616 (1.5); 3.7407 (0.9); 3.7233 (0.8); 3.0131 (2.0); 3.0075 (2.2); 2.9911 (1.9); 2.9809 (1.8); 2.8848 (0.6); 2.8617 (1.4); 2.8420 (3.2); 2.8158 (1.1); 2.7931 (0.5); 2.7293 (0.4); 2.6419 (0.4); 2.5964 (0.7); 2.5343 (0.7); 2.4973 (0.5); 2.4886 (0.5); 2.4618 (0.6); 2.4321 (11.9); 2.3959 (0.8); 2.3282 (0.5); 1.4441 (0.7); 1.4222 (0.7); 1.2840 (1.1); 1.2753 (1.0); 1.2597 (2.0); 1.2419 (16.0); 1.2188 (15.5); 1.2028 (0.9); 1.1862 (0.6); 1.1793 (0.6); 0.1089 (1.1); 0.0383 (12.4); 0.0274 (0.6)
4-16: $^1$H-NMR(300.2 MHz, CDCl3):
δ = 8.2731 (0.7); 8.2461 (0.7); 8.1328 (5.3); 7.2989 (11.8); 7.1537 (0.5); 7.1257 (1.7); 7.1141 (1.4); 7.1035 (4.1); 7.0926 (1.2); 7.0858 (1.4); 7.0658 (0.5); 7.0589 (0.4); 7.0230 (2.3); 7.0025 (0.8); 6.9766 (1.9); 6.9717 (1.7); 6.9543 (2.7); 6.9290 (0.8); 6.8727 (0.7); 6.8618 (0.7); 6.8510 (1.2); 6.8429 (1.0); 6.8254 (0.6); 6.8188 (0.6); 5.6229 (1.2); 5.3372 (2.5); 4.7436 (0.4); 4.7309 (0.5); 4.7218 (0.6); 4.7161 (0.5); 4.7091 (0.5); 4.7034 (0.5); 4.6943 (0.5); 4.6814 (0.4); 3.8777 (0.9); 3.8651 (0.9); 3.8399 (1.6); 3.8274 (1.5); 3.7492 (1.5); 3.7277 (1.4); 3.7115 (0.9); 3.6900 (0.8); 2.9940 (0.5); 2.9450 (3.2); 2.9223 (3.5); 2.8419 (9.9); 2.7348 (16.0); 2.2637 (0.4); 2.2083 (0.7); 2.1883 (10.9); 2.1765 (11.2); 2.1540 (0.7); 2.1368 (1.0); 2.1193 (0.6); 2.1087 (0.6); 1.7825 (0.6); 1.7429 (0.6); 1.6276 (0.4); 1.2936 (0.3); 1.0957 (0.7); 1.0813 (1.6); 1.0744 (1.9); 1.0679 (1.1); 1.0603 (1.2); 1.0526 (1.8); 1.0460 (1.8); 1.0321 (0.9); 0.8360 (0.9); 0.8217 (2.0); 0.8178 (2.0); 0.8046 (2.0); 0.8001 (2.0); 0.7835 (0.7); 0.1081 (2.6); 0.0492 (0.5); 0.0384 (14.4); 0.0275 (0.6)
4-17: $^1$H-NMR(300.2 MHz, CDCl3):
δ = 8.4081 (1.0); 8.3812 (1.0); 8.3154 (9.0); 7.6623 (3.6); 7.6447 (5.2); 7.4867 (2.6); 7.4710 (0.4); 7.4574 (1.1); 7.4490 (0.9); 7.4426 (1.6); 7.4360 (1.2); 7.4272 (1.0); 7.4190 (0.6); 7.2983 (9.0); 7.0656 (2.4); 7.0401 (3.1); 6.9740 (2.9); 6.8883 (1.6); 6.8622 (1.2); 5.3371 (3.3); 4.6641 (0.6); 4.6534 (0.7); 4.6468 (0.8); 4.6371 (0.9); 4.6272 (0.7); 4.6208 (0.7); 4.6101 (0.6); 3.8790 (1.1); 3.8680 (1.2); 3.8407 (2.3); 3.8298 (2.1); 3.7752 (2.1); 3.7574 (2.1); 3.7369 (1.1); 3.7191 (1.1); 3.0029 (4.7); 2.9784 (4.6); 2.4252 (0.6); 2.3972 (16.0); 2.2980 (0.7); 2.2754 (14.8); 1.7687 (0.8); 1.6801 (0.7); 1.2936 (0.4); 0.0380 (8.2)
4-18: $^1$H-NMR(400.2 MHz, d6-DMSO):
δ = 8.6892 (3.3); 8.6678 (3.4); 8.0001 (16.0); 7.7646 (1.4); 7.7451 (4.1); 7.7255 (4.1); 7.7092 (4.9); 7.6895 (1.9); 7.6467 (5.6); 7.5657 (3.1); 7.5458 (2.5); 7.2498 (8.2); 7.2289 (10.6); 7.0991 (11.6); 7.0782 (8.9); 6.1717 (2.2); 5.7565 (8.3); 4.4375 (0.8); 4.4253 (1.1); 4.4151 (1.6); 4.4033 (1.6); 4.3937 (1.2); 4.3815 (0.8); 3.6291 (0.4); 3.6012 (7.2); 3.5860 (7.1); 3.5586 (0.3); 3.3272 (85.1); 2.9543 (1.7); 2.9424 (1.9); 2.9196 (2.4); 2.9079 (2.2); 2.7369 (2.3); 2.7143 (2.4); 2.7025 (1.9); 2.6796 (2.2); 2.6712 (1.5); 2.6667 (1.0); 2.5243 (6.3); 2.5107 (83.4); 2.5066 (162.9); 2.5022 (211.7); 2.4977 (157.3); 2.3334 (1.0); 2.3289 (1.4); 2.3245 (1.0); 2.0746 (5.0); 0.1461 (0.5); 0.0079 (4.9); −0.0002 (123.5); −0.1496 (0.6)
4-19: $^1$H-NMR(300.2 MHz, CDCl3):
δ = 8.0332 (0.6); 7.5717 (0.4); 7.5459 (1.5); 7.5210 (3.9); 7.4956 (0.5); 7.4616 (2.2); 7.4198 (0.9); 7.4127 (1.5); 7.4057 (0.8); 7.3891 (0.9); 7.2988 (8.6); 7.1126 (1.9); 7.0870 (2.4); 6.9864 (2.4); 6.8986 (1.3); 6.8726 (1.1); 6.6832 (1.0); 6.6545 (1.0); 5.5815 (3.8); 5.3369 (1.1); 4.7528 (0.4); 4.7424 (0.5); 4.7341 (0.5); 4.7239 (0.7); 4.7137 (0.5); 4.7053 (0.5); 4.6958 (0.4); 3.8683 (0.9); 3.8572 (1.0); 3.8307 (1.7); 3.8197 (1.5); 3.7449 (1.5); 3.7256 (1.5); 3.7072 (0.9); 3.6881 (0.9); 2.9878 (5.0); 2.9601 (3.5); 2.9352 (3.4); 2.9113 (4.5); 2.6225 (15.1); 2.4649 (0.3); 2.4169 (0.4); 2.3932 (12.5); 2.3341 (0.4); 2.2726 (16.0); 2.2640 (12.5); 1.6449 (1.8); 0.0471 (0.4); 0.0363 (9.4); 0.0271 (0.3); 0.0255 (0.4)
4-20: $^1$H-NMR(300.2 MHz, CDCl3):
δ = 8.4595 (0.7); 8.4329 (0.7); 8.1585 (5.2); 7.6163 (0.6); 7.5901 (1.6); 7.5641 (1.2); 7.4915 (1.4); 7.4659 (0.9); 7.3861 (1.8); 7.3698 (1.1); 7.3666 (1.2); 7.3432 (0.8); 7.3399 (0.9); 7.3361 (0.7); 7.2984 (10.5); 7.0769 (1.6); 7.0513 (2.1); 6.9720 (2.0); 6.9148 (1.1); 6.8908 (1.2); 6.8650 (0.9); 6.7270 (2.2); 6.5392 (1.1); 5.5669 (5.1); 5.3372 (0.5); 4.6689 (0.4); 4.6583 (0.4); 4.6516 (0.5); 4.6417 (0.6); 4.6314 (0.4); 4.6259 (0.4); 4.6144 (0.4); 4.1711 (0.6); 4.1473 (0.6); 3.8679 (0.8); 3.8566 (0.8); 3.8302 (1.6); 3.8190 (1.5); 3.7684 (1.5); 3.7504 (1.5); 3.7307 (0.8); 3.7127 (0.8); 2.9934 (3.3); 2.9690 (3.0); 2.8410 (2.3); 2.7424 (16.0); 2.4022 (11.2); 2.2764 (10.3); 2.0835 (2.6); 1.6153 (10.0); 1.3208 (0.7); 1.2971 (1.5); 1.2732 (0.7); 0.0479 (0.4); 0.0371 (10.9); 0.0262 (0.4)
4-21: $^1$H-NMR(300.2 MHz, CDCl3):
δ = 8.3034 (1.9); 8.2740 (2.1); 8.2654 (16.0); 8.0558 (0.6); 7.7849 (0.3); 7.6968 (0.5); 7.6706 (4.5); 7.6623 (3.9); 7.6538 (8.8); 7.6508 (9.8); 7.5951 (0.6); 7.5866 (0.9); 7.5047 (10.8); 7.4984 (9.2); 7.4882 (1.2); 7.4743 (0.8); 7.4670 (1.0); 7.4533 (2.0); 7.4401 (2.7); 7.4335 (2.8); 7.4233 (2.1); 7.4146 (1.4); 7.3920 (0.4); 7.3849 (0.4); 7.3644 (0.4); 7.3315 (3.2); 7.3250 (3.1); 7.3040 (6.1); 7.2984 (31.9); 7.2753 (0.4); 7.2149 (7.8); 7.1875 (5.5); 7.1696 (0.4); 7.1567 (0.5); 5.5738 (6.6); 5.3366 (7.0); 4.8391 (0.4); 4.8280 (0.5); 4.8127 (1.0); 4.7985 (1.2); 4.7867 (1.5); 4.7769 (1.1); 4.7605 (1.0); 4.7446 (0.5); 4.7338 (0.4); 4.3157 (0.3); 3.9345 (0.4); 3.9210 (2.3); 3.9097 (2.6); 3.8969 (0.6); 3.8827 (4.3); 3.8715 (3.9); 3.8174 (0.4); 3.7966 (4.0); 3.7786 (4.0); 3.7582 (2.4); 3.7402 (2.2); 3.1939 (1.0); 3.1786 (0.6); 3.1676 (1.2); 3.1476 (4.3); 3.1224 (7.7); 3.1000 (4.2); 3.0769 (1.0); 3.0539 (0.9); 2.8451 (0.8); 2.6575 (0.4); 2.6119 (1.0); 2.5504 (0.8); 1.6958 (0.3); 1.6138 (6.2); 1.2931 (1.2); 0.1189 (0.4); 0.1070 (11.8); 0.0947 (0.4); 0.0477 (0.9); 0.0369 (27.1); 0.0259 (1.0)
4-22: $^1$H-NMR(300.2 MHz, CDCl3):
δ = 8.6098 (1.1); 8.5848 (1.0); 8.3157 (7.9); 8.1002 (0.3); 7.6698 (2.3); 7.6647 (2.3); 7.6600 (2.3); 7.6522 (5.1); 7.6493 (5.4); 7.5979 (0.3); 7.5096 (2.6); 7.4825 (0.5); 7.4723 (0.5); 7.4575 (1.1); 7.4453 (1.5); 7.4385 (1.5); 7.4275 (1.3); 7.4188 (0.8); 7.3212 (3.1); 7.2987 (18.0); 7.2380 (1.4); 7.2324 (1.3); 7.2110 (1.9); 7.2047 (1.8); 7.1888 (0.3); 7.1625 (0.4); 7.0793 (3.5); 7.0522 (2.6); 5.5291 (5.3); 5.3371 (6.8); 4.5874 (0.6); 4.5768 (0.7); 4.5602 (0.8); 4.5505 (0.7); 4.5394 (0.6); 3.8568 (1.0); 3.8468 (1.2); 3.8338 (0.4); 3.8178 (2.2); 3.8079 (2.0); 3.7649 (0.3); 3.7487 (2.2); 3.7328 (2.1); 3.7099 (1.2); 3.6939 (1.1); 3.0645 (0.5); 3.0435 (0.7); 3.0189 (2.2); 2.9959 (3.6); 2.9664 (2.0); 2.9494 (0.6); 2.9206 (0.6); 2.4656 (0.6); 2.4346 (16.0); 2.4106 (0.4); 1.6023 (9.4); 1.2930 (0.7); 0.1074 (2.0); 0.0482 (0.6); 0.0375 (18.1)

TABLE 10-continued 4-23: $^1$H-NMR(300.2 MHz, CDCl3):
δ = 8.7061 (3.1); 8.7000 (3.3); 8.5022 (3.0); 8.4943 (3.1); 8.3147 (7.1); 8.2932 (0.9); 8.2672 (1.0); 7.9204 (0.4); 7.9100 (0.4); 7.9021 (0.4); 7.8921 (0.6); 7.8128 (2.0); 7.8059 (3.2); 7.7985 (2.2); 7.7850 (0.6); 7.7774 (0.6); 7.7669 (0.6); 7.2989 (13.7); 7.0695 (2.0); 7.0440 (2.8); 6.9835 (2.7); 6.9132 (1.5); 6.8869 (1.1); 5.5729 (0.9); 5.3376 (16.0); 4.6530 (0.5); 4.6431 (0.6); 4.6369 (0.6); 4.6270 (0.8); 4.6179 (0.6); 4.6114 (0.6); 4.6013 (0.6); 3.8776 (0.9); 3.8669 (1.0); 3.8391 (2.0); 3.8284 (1.9); 3.7778 (1.8); 3.7604 (1.8); 3.7394 (1.0); 3.7220 (0.9); 3.0090 (4.1); 2.9845 (3.9); 2.4009 (13.8); 2.3299 (0.4); 2.3185 (0.8); 2.2940 (13.4); 2.2715 (0.9); 2.2568 (0.8); 1.6331 (0.3); 0.0480 (0.6); 0.0372 (17.0); 0.0263 (0.7)
4-24: $^1$H-NMR(300.2 MHz, CDCl3):
δ = 8.5386 (0.4); 8.5271 (2.5); 8.5179 (2.5); 8.3170 (8.8); 8.2250 (1.2); 8.2127 (0.9); 8.1620 (0.9); 8.1354 (1.0); 7.9786 (3.0); 7.9694 (2.9); 7.9453 (0.4); 7.9353 (0.4); 7.9220 (0.3); 7.9118 (0.4); 7.8935 (0.5); 7.7965 (0.5); 7.7864 (0.3); 7.7783 (0.3); 7.7680 (0.3); 7.2990 (24.4); 7.1074 (0.4); 7.0909 (0.4); 7.0689 (2.2); 7.0434 (3.1); 7.0116 (0.6); 6.9805 (3.0); 6.9481 (0.4); 6.9109 (1.6); 6.8859 (1.2); 5.5826 (2.1); 5.3383 (10.8); 4.6635 (0.6); 4.6528 (0.7); 4.6466 (0.8); 4.6370 (0.9); 4.6270 (0.7); 4.6221 (0.7); 4.6107 (0.7); 3.8861 (1.0); 3.8754 (1.1); 3.8476 (2.3); 3.8370 (2.2); 3.8172 (0.4); 3.8045 (0.4); 3.7861 (2.2); 3.7686 (2.1); 3.7474 (1.4); 3.7301 (1.2); 3.0142 (4.5); 2.9896 (4.2); 2.9438 (0.5); 2.9207 (0.7); 2.4432 (0.4); 2.4011 (16.0); 2.3329 (0.7); 2.3103 (2.2); 2.2831 (14.0); 1.6055 (1.7); 1.3149 (0.8); 1.2940 (1.2); 0.1075 (0.4); 0.0484 (1.0); 0.0377 (29.5); 0.0268 (1.0)
4-25: $^1$H-NMR(300.2 MHz, CDCl3):
δ = 7.9196 (0.5); 7.9093 (0.5); 7.9016 (0.5); 7.8912 (0.8); 7.7948 (0.8); 7.7847 (0.6); 7.7767 (0.6); 7.7664 (0.5); 7.4570 (2.4); 7.4532 (2.4); 7.2988 (13.3); 7.2539 (0.4); 7.2258 (6.3); 7.2200 (3.2); 7.1925 (0.3); 7.1405 (0.7); 7.1147 (1.5); 7.0866 (1.4); 7.0690 (0.4); 7.0593 (1.0); 7.0530 (1.1); 7.0302 (1.2); 7.0085 (0.5); 7.0029 (0.5); 6.8549 (0.7); 6.8488 (0.8); 6.8281 (1.2); 6.8014 (1.5); 6.7719 (0.9); 5.6181 (4.4); 5.3376 (0.8); 4.8889 (0.3); 4.8788 (0.4); 4.8683 (0.5); 4.8582 (0.6); 4.8492 (0.6); 4.8395 (0.5); 4.8287 (0.4); 4.1784 (0.7); 3.9303 (0.9); 3.9190 (0.9); 3.8920 (1.6); 3.8808 (1.6); 3.7994 (1.4); 3.7799 (1.4); 3.7613 (0.9); 3.7418 (0.9); 3.1451 (0.4); 3.1167 (0.4); 3.0976 (1.8); 3.0834 (1.8); 3.0693 (2.1); 3.0617 (2.0); 2.8357 (0.8); 2.3794 (16.0); 2.3239 (1.1); 2.1326 (0.5); 2.1214 (0.5); 2.1044 (1.0); 2.0875 (0.6); 2.0766 (0.6); 1.5989 (5.9); 1.2920 (0.4); 1.0795 (0.6); 1.0656 (1.6); 1.0582 (1.9); 1.0443 (1.0); 1.0370 (1.7); 1.0298 (2.0); 1.0162 (0.8); 0.8242 (0.7); 0.8097 (2.1); 0.8043 (2.4); 0.7929 (2.1); 0.7868 (2.4); 0.7715 (0.7); 0.1071 (1.8); 0.0479 (0.6); 0.0372 (17.8); 0.0263 (0.7)
4-26: $^1$H-NMR(300.2 MHz, CDCl3):
δ = 7.9193 (0.5); 7.9089 (0.6); 7.9015 (0.5); 7.8909 (0.8); 7.7944 (0.8); 7.7844 (0.6); 7.7762 (0.6); 7.7659 (0.6); 7.2987 (12.3); 7.2294 (2.2); 7.2030 (2.5); 7.1225 (0.6); 7.0958 (1.7); 7.0689 (2.4); 7.0580 (1.5); 7.0423 (1.1); 7.0368 (1.4); 7.0215 (2.7); 7.0156 (3.2); 6.8431 (0.7); 6.8354 (0.8); 6.8144 (2.6); 6.7949 (0.8); 6.7884 (1.9); 6.7822 (1.3); 6.6886 (1.0); 6.6592 (1.0); 5.6212 (3.9); 4.8800 (0.3); 4.8690 (0.4); 4.8597 (0.4); 4.8491 (0.6); 4.8299 (0.4); 4.1775 (0.8); 3.9284 (0.9); 3.9168 (1.0); 3.8906 (1.6); 3.8791 (1.5); 3.7845 (1.4); 3.7640 (1.4); 3.7466 (0.9); 3.7263 (0.9); 3.0768 (2.1); 3.0724 (2.2); 3.0499 (3.3); 2.3638 (0.3); 2.3372 (16.0); 2.3249 (1.2); 2.1361 (0.5); 2.1256 (0.6); 2.1082 (1.0); 2.0911 (0.6); 2.0803 (0.6); 2.0439 (1.0); 1.8122 (0.4); 1.8014 (0.6); 1.7904 (0.6); 1.7734 (1.1); 1.7568 (0.6); 1.7455 (0.6); 1.6028 (5.1); 1.2914 (0.4); 1.0765 (0.6); 1.0617 (1.8); 1.0547 (2.1); 1.0405 (1.1); 1.0331 (2.0); 1.0264 (2.1); 1.0123 (0.9); 0.9830 (0.5); 0.9684 (1.6); 0.9624 (2.0); 0.9518 (1.0); 0.9403 (1.8); 0.9345 (1.8); 0.9235 (0.6); 0.9203 (0.7); 0.8168 (0.8); 0.8020 (2.2); 0.7968 (2.4); 0.7851 (2.2); 0.7795 (2.5); 0.7636 (0.8); 0.6314 (0.9); 0.6255 (0.9); 0.6162 (2.1); 0.6090 (1.8); 0.5999 (2.2); 0.5928 (1.1); 0.5837 (0.7); 0.1071 (6.3); 0.0481 (0.5); 0.0373 (16.0); 0.0264 (0.7)
4-27: $^1$H-NMR(300.2 MHz, CDCl3):
δ = 8.5619 (1.0); 8.5346 (1.0); 8.2838 (8.1); 7.7928 (0.6); 7.7836 (0.5); 7.7744 (0.7); 7.7657 (0.3); 7.7025 (0.5); 7.6923 (0.4); 7.6843 (0.4); 7.6740 (0.3); 7.3996 (1.6); 7.3733 (3.5); 7.3469 (2.1); 7.2988 (6.2); 7.0700 (3.2); 7.0449 (3.8); 7.0160 (0.4); 6.9932 (1.8); 6.9843 (3.4); 6.9767 (3.7); 6.9611 (2.0); 6.9587 (1.9); 6.9248 (2.3); 6.9187 (3.1); 6.9121 (1.9); 6.8917 (1.8); 6.8664 (1.4); 4.6466 (0.6); 4.6360 (0.6); 4.6293 (0.7); 4.6192 (0.9); 4.6097 (0.7); 4.6031 (0.7); 4.5922 (0.6); 4.1949 (0.6); 4.1711 (1.7); 4.1473 (1.6); 4.1233 (0.6); 3.8587 (1.1); 3.8477 (1.2); 3.8207 (2.2); 3.8097 (2.2); 3.7581 (2.2); 3.7401 (2.1); 3.7202 (1.2); 3.7022 (1.1); 2.9941 (1.4); 2.9830 (4.7); 2.9585 (4.6); 2.9196 (1.2); 2.8414 (6.7); 2.7765 (0.7); 2.7476 (0.5); 2.5799 (4.9); 2.4403 (0.4); 2.4167 (0.4); 2.4004 (16.0); 2.3736 (2.3); 2.3263 (0.7); 2.3142 (1.4); 2.3081 (1.3); 2.2866 (15.0); 2.2395 (1.7); 2.0831 (6.8); 2.0120 (0.4); 2.0035 (0.6); 1.9950 (0.8); 1.9838 (0.8); 1.9670 (1.6); 1.9504 (0.9); 1.9391 (0.9); 1.9223 (0.5); 1.5055 (0.5); 1.4812 (1.7); 1.4591 (1.5); 1.3211 (1.8); 1.2973 (3.7); 1.2735 (1.8); 1.0862 (0.9); 1.0709 (2.4); 1.0643 (2.7); 1.0496 (1.4); 1.0427 (2.7); 1.0363 (2.6); 1.0216 (1.3); 0.7921 (1.1); 0.7767 (3.1); 0.7710 (2.9); 0.7605 (2.7); 0.7548 (3.4); 0.7387 (1.1); 0.1102 (0.5); 0.0385 (7.4)
4-28: $^1$H-NMR(300.2 MHz, CDCl3):
δ = 8.2998 (1.3); 7.4893 (0.4); 7.2986 (8.8); 7.2093 (0.4); 7.2028 (0.4); 7.1543 (0.4); 7.1462 (0.5); 7.1265 (0.3); 7.1187 (0.5); 7.0742 (0.4); 7.0487 (0.5); 6.9802 (0.5); 5.5613 (1.1); 3.8287 (0.4); 3.8178 (0.3); 3.7662 (0.4); 3.7485 (0.3); 2.9941 (0.7); 2.9695 (0.7); 2.4038 (2.5); 2.2835 (2.2); 1.6232 (0.4); 1.6179 (0.5); 1.6126 (0.4); 1.5880 (16.0); 1.5590 (0.4); 1.5544 (0.4); 1.2979 (0.5); 1.1756 (0.4); 1.1698 (0.4); 1.1460 (0.4); 1.1411 (0.3); 0.9201 (0.4); 0.0488 (0.6); 0.0380 (10.3); 0.0270 (0.4)
4-29: $^1$H-NMR(300.2 MHz, CDCl3):
δ = 8.2419 (0.7); 8.2122 (0.8); 8.0974 (5.3); 8.0861 (0.4); 7.8929 (0.4); 7.7941 (0.4); 7.7760 (0.3); 7.2989 (13.3); 7.1923 (2.2); 7.1661 (2.6); 7.1436 (3.1); 7.1315 (1.8); 7.1281 (1.8); 7.1243 (2.1); 7.1188 (2.7); 7.1013 (0.4); 7.0417 (2.4); 7.0357 (2.6); 6.8800 (0.7); 6.8672 (0.6); 6.8591 (1.1); 6.8478 (1.2); 6.8356 (0.6); 6.8269 (1.9); 6.8213 (1.5); 6.8009 (1.3); 6.7949 (1.2); 5.6215 (1.3); 5.3370 (4.1); 4.8519 (0.4); 4.8295 (0.5); 4.8247 (0.5); 4.8173 (0.5); 4.8031 (0.4); 4.7917 (0.4); 3.9274 (0.9); 3.9151 (1.0); 3.8899 (1.6); 3.8775 (1.4); 3.7826 (1.4); 3.7619 (1.4); 3.7450 (1.0); 3.7244 (0.9); 3.1532 (0.3); 3.1079 (1.8); 3.0969 (1.8); 3.0858 (1.8); 3.0715 (1.6); 2.8410 (4.4); 2.7235 (16.0); 2.5966 (0.4); 2.1746 (0.5); 2.1637 (0.5); 2.1463 (1.0); 2.1290 (0.6); 2.1182 (0.6); 1.8443 (0.6); 1.8332 (0.6); 1.8164 (1.1); 1.7996 (0.6); 1.7887 (0.6); 1.7716 (0.3); 1.6153 (1.6); 1.0977 (0.6); 1.0825 (1.8); 1.0758 (2.0); 1.0611 (1.1); 1.0540 (2.0); 1.0474 (2.0); 1.0329 (1.0); 0.9983 (0.7); 0.9833 (1.9); 0.9768 (2.0); 0.9623 (0.9); 0.9551 (2.0); 0.9486 (1.8); 0.9344 (0.8); 0.8414 (0.9); 0.8264 (2.1); 0.8205 (2.2); 0.8096 (2.0); 0.8036 (2.4); 0.7875 (0.8); 0.6747 (0.9); 0.6597 (2.1); 0.6535 (1.8); 0.6433 (2.0); 0.6381 (2.1); 0.6220 (0.8); 0.1077 (0.7); 0.0486 (0.5); 0.0377 (16.6); 0.0267 (0.6)
4-30: $^1$H-NMR(300.2 MHz, CDCl3):
δ = 7.3096 (5.0); 7.2989 (16.5); 7.2825 (2.6); 7.1373 (0.5); 7.1340 (0.5); 7.1103 (1.4); 7.0917 (1.8); 7.0845 (2.6); 7.0642 (1.5); 7.0574 (1.8); 7.0530 (1.3); 7.0353 (1.0); 7.0299 (1.2); 7.0085 (0.5); 7.0028 (0.4); 6.8553 (0.7); 6.8489 (0.7); 6.8287 (1.1); 6.8067 (0.7); 6.8012 (0.7); 6.7892 (0.8); 6.7592 (0.8); 5.6176 (3.0); 5.3374 (12.2); 4.8777 (0.4); 4.8697 (0.4); 4.8602 (0.5); 4.8501 (0.5); 4.8402 (0.4); 4.8286 (0.4); 4.1028 (0.4); 3.9329 (0.9); 3.9216 (0.9); 3.8948 (1.5); 3.8835 (1.4); 3.8026 (1.4); 3.7831 (1.4); 3.7646 (0.9); 3.7451 (0.8); 3.1123 (1.7); 3.0995 (1.6); 3.0842 (1.9); 3.0775 (1.9); 2.3821 (16.0); 2.2885 (0.4); 2.1316 (0.4); 2.1204 (0.5); 2.1034 (0.9); 2.0822 (0.7); 2.0751 (0.5); 1.5982 (6.8); 1.2964 (0.6); 1.2918 (0.6); 1.0792 (0.6); 1.0654 (1.5); 1.0579 (1.8); 1.0438 (1.0); 1.0367 (1.5); 1.0296 (1.7); 1.0156 (0.8); 0.8232 (0.7); 0.8089 (1.9); 0.8028 (2.1); 0.7918 (1.9); 0.7856 (2.1); 0.7704 (0.7); 0.1074 (7.8); 0.0488 (0.6); 0.0379 (18.2); 0.0270 (0.7)
4-31: $^1$H-NMR(300.2 MHz, CDCl3):
δ = 8.4207 (0.4); 8.3917 (0.4); 8.2335 (3.6); 7.4023 (0.8); 7.3760 (1.6); 7.3621 (1.8); 7.3551 (1.8); 7.3499 (1.1); 7.2986 (4.6); 7.2540 (1.2); 7.2264 (1.8); 7.1469 (1.2); 7.1399 (1.1); 7.1195 (0.7); 7.1125 (0.6); 7.0670 (0.9); 7.0409 (0.7); 6.9860 (0.6); 6.9833 (0.6); 6.9781 (0.8); 6.9593 (0.5); 6.9565 (0.5); 6.9513 (0.7); 6.9487 (0.6); 6.9156 (1.0); 6.9096 (1.3); 6.9030 (0.7);

TABLE 10-continued 4.7806 (0.4); 4.1917 (1.2); 4.1678 (3.5); 4.1440 (3.6); 4.1203 (1.2); 3.9080 (0.5); 3.8964 (0.6); 3.8699 (0.9); 3.8584 (0.9); 3.7813 (0.9); 3.7626 (1.0); 3.7429 (0.7); 3.7244 (0.5); 3.1204 (2.2); 3.0960 (2.1); 2.9933 (1.2); 2.9180 (1.0); 2.8382 (6.0); 2.7013 (1.4); 2.0802 (16.0); 1.9951 (0.4); 1.9839 (0.4); 1.9722 (0.5); 1.9673 (0.8); 1.9503 (0.5); 1.9392 (0.5); 1.7230 (0.6); 1.7108 (0.6); 1.5112 (0.7); 1.4863 (0.8); 1.4791 (0.6); 1.3178 (4.1); 1.2940 (8.4); 1.2701 (4.1); 1.0869 (0.4); 1.0716 (1.0); 1.0649 (1.2); 1.0500 (0.7); 1.0433 (1.2); 1.0369 (1.2); 1.0220 (0.6); 0.7904 (0.5); 0.7750 (1.4); 0.7693 (1.2); 0.7588 (1.2); 0.7530 (1.6); 0.7367 (0.5); 0.1050 (0.8); 0.0342 (4.5)

4-32: $^{1}$H-NMR(300.2 MHz, CDCl3):
δ = 8.5021 (0.6); 8.4782 (0.7); 8.4594 (0.6); 8.2996 (8.4); 7.2986 (26.2); 7.2793 (1.0); 7.2719 (2.0); 7.2658 (3.1); 7.2600 (2.0); 7.2515 (1.6); 7.2470 (3.1); 7.2421 (2.7); 7.2206 (0.7); 7.2153 (0.6); 7.1960 (1.0); 7.1802 (1.0); 7.1659 (0.9); 7.1506 (0.4); 7.0859 (1.5); 7.0608 (1.9); 6.9723 (2.0); 6.8936 (1.5); 6.8690 (1.2); 5.5708 (3.8); 5.5626 (3.6); 4.6565 (0.4); 4.6463 (0.6); 4.6290 (0.7); 4.6207 (0.7); 4.6123 (0.6); 4.6051 (0.6); 4.1959 (1.2); 4.1721 (3.6); 4.1482 (3.5); 4.1244 (1.2); 3.8721 (0.9); 3.8615 (1.0); 3.8339 (2.0); 3.8231 (1.8); 3.7708 (1.6); 3.7534 (1.5); 3.7314 (0.8); 3.7132 (0.7); 3.0096 (4.0); 2.9856 (3.4); 2.9618 (0.4); 2.9203 (0.7); 2.8903 (0.7); 2.8509 (0.4); 2.4095 (10.9); 2.2747 (7.4); 2.2666 (7.6); 2.0839 (16.0); 2.0469 (0.5); 2.0295 (0.5); 2.0200 (0.6); 2.0074 (0.9); 2.0028 (0.7); 1.9901 (0.8); 1.9807 (1.0); 1.9681 (0.6); 1.9633 (1.0); 1.9507 (0.5); 1.9415 (0.5); 1.9241 (0.5); 1.7924 (0.3); 1.7752 (0.3); 1.7613 (0.6); 1.7485 (0.8); 1.7375 (0.6); 1.7341 (0.6); 1.7229 (0.8); 1.7103 (0.6); 1.7063 (0.6); 1.5885 (8.1); 1.3676 (0.4); 1.3453 (0.8); 1.3217 (5.6); 1.2980 (12.7); 1.2741 (4.6); 0.9420 (1.9); 0.9202 (6.1); 0.8971 (2.2); 0.0489 (1.3); 0.0381 (35.2); 0.0272 (1.5)

4-33: $^{1}$H-NMR(300.2 MHz, CDCl3):
δ = 8.5286 (0.7); 8.5005 (0.7); 8.2051 (5.0); 7.9219 (0.4); 7.9115 (0.4); 7.9037 (0.4); 7.8935 (0.5); 7.7953 (0.5); 7.7853 (0.4); 7.7772 (0.4); 7.7669 (0.4); 7.5796 (3.1); 7.5762 (3.6); 7.5670 (1.5); 7.5562 (1.9); 7.5298 (0.5); 7.4890 (1.8); 7.4218 (0.8); 7.4144 (1.0); 7.3996 (0.9); 7.3924 (1.0); 7.3835 (0.5); 7.2985 (15.9); 6.9612 (0.9); 6.9339 (1.1); 6.8975 (1.8); 6.7512 (2.2); 6.7237 (1.7); 5.6826 (3.0); 5.3377 (8.4); 4.9848 (0.3); 4.9715 (0.6); 4.9587 (0.6); 4.9464 (0.6); 4.9342 (0.5); 4.9197 (0.4); 4.2084 (3.1); 4.1955 (3.7); 4.1060 (0.8); 4.0822 (0.8); 4.0678 (1.7); 4.0440 (1.6); 4.0116 (1.6); 3.9964 (1.6); 3.9734 (0.8); 3.9582 (0.7); 2.7713 (16.0); 2.3256 (0.7); 2.2648 (10.3); 2.2413 (0.4); 2.1848 (0.4); 1.9744 (10.4); 1.6013 (2.6); 0.1075 (0.8); 0.0486 (0.8); 0.0378 (19.7); 0.0268 (0.7)

4-34: $^{1}$H-NMR(300.2 MHz, CDCl3):
δ = 8.6187 (0.7); 8.5920 (0.7); 8.1920 (5.3); 7.9206 (0.3); 7.9103 (0.4); 7.8922 (0.5); 7.7945 (0.5); 7.7848 (0.3); 7.7763 (0.4); 7.7660 (0.4); 7.6089 (3.3); 7.6055 (3.0); 7.5969 (1.5); 7.5920 (2.2); 7.5888 (2.1); 7.5203 (1.7); 7.4600 (0.8); 7.4504 (0.8); 7.4460 (0.5); 7.4403 (1.0); 7.4337 (0.8); 7.4293 (0.6); 7.4211 (0.4); 7.2985 (12.5); 7.2341 (0.4); 7.2226 (4.1); 7.2152 (1.3); 7.2000 (1.4); 7.1925 (4.6); 7.1812 (0.4); 6.7972 (0.5); 6.7857 (4.7); 6.7782 (1.4); 6.7631 (1.3); 6.7556 (4.0); 6.7441 (0.4); 5.6493 (3.9); 5.3370 (4.7); 4.8959 (0.4); 4.8903 (0.5); 4.8837 (0.5); 4.8789 (0.5); 4.8691 (0.5); 4.8626 (0.5); 4.8578 (0.4); 4.2576 (0.6); 4.2468 (0.7); 4.2262 (1.8); 4.2155 (1.6); 4.1973 (1.8); 4.1796 (2.0); 4.1659 (0.7); 4.1480 (0.7); 4.0809 (0.8); 4.0590 (0.7); 4.0424 (1.7); 4.0206 (1.6); 3.9863 (1.6); 3.9711 (1.7); 3.9479 (0.8); 3.9327 (0.7); 2.7754 (16.0); 1.6059 (2.7); 0.1068 (0.6); 0.0476 (0.6); 0.0368 (15.6); 0.0259 (0.5)

4-35: $^{1}$H-NMR(300.2 MHz, CDCl3):
δ = 8.6003 (0.9); 8.5741 (0.9); 8.3001 (8.1); 7.6370 (3.8); 7.6197 (4.9); 7.5115 (2.4); 7.4735 (1.0); 7.4652 (0.9); 7.4579 (1.4); 7.4516 (1.2); 7.4430 (0.8); 7.4348 (0.6); 7.3728 (2.2); 7.3471 (2.5); 7.2991 (8.9); 6.9878 (5.4); 6.9615 (1.4); 5.5215 (3.5); 5.3380 (12.9); 4.6777 (0.4); 4.6665 (0.5); 4.6542 (0.7); 4.6408 (0.7); 4.6342 (0.7); 4.6274 (0.5); 4.6163 (0.4); 4.0228 (1.3); 4.0038 (1.2); 3.9842 (2.0); 3.9653 (1.9); 3.8697 (2.0); 3.8573 (1.9); 3.8311 (1.3); 3.8188 (1.2); 3.3324 (0.8); 3.3156 (0.8); 3.2865 (2.2); 3.2697 (2.1); 3.2431 (2.3); 3.2199 (2.3); 3.1972 (1.0); 3.1740 (0.8); 2.4148 (0.5); 2.3205 (16.0); 2.2827 (15.2); 1.6218 (0.5); 0.1081 (0.8); 0.0486 (0.4); 0.0377 (10.5); 0.0269 (0.4)

4-36: $^{1}$H-NMR(300.2 MHz, CDCl3):
δ = 7.2983 (3.2); 7.2436 (0.4); 7.2238 (0.9); 7.2170 (0.9); 7.2036 (2.7); 7.2000 (2.1); 7.1941 (2.4); 7.1793 (2.9); 7.1761 (2.7); 7.1522 (0.8); 7.1222 (1.2); 7.1022 (2.3); 7.0889 (2.0); 7.0770 (1.9); 7.0633 (1.5); 7.0413 (0.8); 7.0131 (0.7); 6.9793 (1.6); 6.9559 (2.0); 6.9286 (0.7); 6.8896 (0.9); 6.8630 (0.8); 6.8475 (0.8); 6.8206 (0.6); 5.5829 (1.2); 4.7230 (0.5); 4.7118 (0.6); 4.7053 (0.7); 4.6948 (0.7); 4.6871 (0.6); 4.6766 (0.6); 4.1846 (0.5); 4.1608 (1.7); 4.1369 (1.7); 4.1132 (0.6); 3.8525 (0.6); 3.8453 (0.7); 3.8420 (0.8); 3.8352 (0.6); 3.8145 (1.1); 3.8075 (1.4); 3.7974 (1.1); 3.7377 (0.9); 3.7258 (1.0); 3.7196 (1.1); 3.7064 (0.9); 3.6999 (0.7); 3.6879 (0.6); 3.6816 (0.6); 3.6685 (0.5); 2.9586 (2.2); 2.9468 (2.3); 2.9336 (2.3); 2.9221 (2.1); 2.8998 (0.4); 2.8810 (0.4); 2.8694 (0.8); 2.8597 (0.6); 2.8396 (0.6); 2.8299 (0.8); 2.8186 (0.4); 2.8001 (0.4); 2.7910 (0.3); 2.4134 (1.0); 2.3959 (7.9); 2.3816 (16.0); 2.3425 (10.1); 2.3296 (1.1); 2.2935 (0.6); 2.2831 (0.6); 2.2588 (6.9); 2.2246 (6.5); 2.0752 (7.7); 1.9970 (0.4); 1.9798 (0.4); 1.9703 (0.5); 1.9572 (0.9); 1.9537 (0.7); 1.9403 (0.8); 1.9308 (0.9); 1.9138 (1.0); 1.9009 (0.5); 1.8915 (0.5); 1.8742 (0.4); 1.7434 (0.6); 1.7298 (0.8); 1.7162 (1.1); 1.7022 (1.1); 1.6882 (1.0); 1.6745 (1.0); 1.6608 (0.7); 1.6473 (0.4); 1.3166 (2.2); 1.2928 (4.4); 1.2690 (2.1); 0.0382 (3.3)

4-37: $^{1}$H-NMR(300.2 MHz, CDCl3):
δ = 8.2876 (0.6); 8.2607 (0.6); 8.1486 (5.1); 7.6268 (0.6); 7.6044 (1.5); 7.5780 (1.6); 7.5535 (0.7); 7.4033 (0.8); 7.3759 (1.2); 7.3496 (0.5); 7.2985 (4.2); 7.0874 (1.6); 7.0618 (2.0); 6.9601 (1.9); 6.8875 (1.1); 6.8621 (0.8); 5.5849 (1.6); 5.3350 (12.2); 4.6868 (0.3); 4.6755 (0.4); 4.6685 (0.4); 4.6589 (0.5); 4.6492 (0.4); 4.6424 (0.4); 4.6311 (0.4); 4.1708 (0.6); 4.1470 (0.6); 3.8762 (0.7); 3.8647 (0.8); 3.8385 (1.6); 3.8271 (1.4); 3.7780 (1.4); 3.7595 (1.4); 3.7402 (0.7); 3.7218 (0.7); 3.0075 (3.2); 2.9833 (3.0); 2.7472 (16.0); 2.4296 (0.8); 2.4052 (10.6); 2.2830 (0.7); 2.2552 (9.7); 2.0817 (2.8); 1.7931 (1.0); 1.7119 (1.0); 1.3202 (0.7); 1.2964 (1.5); 1.2726 (0.7); 0.0379 (5.2)

4-38: $^{1}$H-NMR(300.2 MHz, d6-DMSO):
δ = 8.7017 (1.5); 8.6718 (1.5); 7.8368 (1.3); 7.7887 (0.7); 7.7665 (1.9); 7.7400 (2.2); 7.7098 (7.4); 7.5775 (1.1); 7.5505 (1.6); 7.5231 (0.7); 7.4864 (3.3); 7.4792 (3.5); 7.3898 (2.5); 7.3622 (3.1); 7.1153 (1.8); 7.1081 (1.8); 7.0878 (1.5); 7.0806 (1.5); 6.1721 (1.7); 5.7775 (14.2); 4.6318 (0.5); 4.6126 (0.6); 4.6007 (0.6); 4.5819 (0.5); 3.7275 (0.3); 3.7071 (0.4); 3.6918 (1.9); 3.6819 (2.0); 3.6715 (2.0); 3.6621 (1.9); 3.6465 (0.4); 3.6269 (0.3); 3.3477 (16.0); 3.1251 (0.8); 3.1110 (0.8); 3.0785 (1.1); 3.0646 (1.0); 2.8723 (1.0); 2.8378 (1.0); 2.8254 (0.8); 2.7915 (0.7); 2.7580 (0.5); 2.7369 (0.5); 2.7103 (0.8); 2.6054 (15.8); 2.5479 (0.6); 2.5348 (3.7); 2.5287 (8.0); 2.5227 (10.9); 2.5166 (7.9); 2.5107 (3.8); 2.4635 (2.1); 2.3667 (1.8); 0.0206 (8.2)

4-39: $^{1}$H-NMR(300.2 MHz, CDCl3):
δ = 8.3324 (0.7); 8.3049 (0.7); 8.1039 (5.2); 7.6217 (0.6); 7.5960 (1.6); 7.5695 (1.2); 7.4957 (1.4); 7.4699 (0.9); 7.3878 (1.8); 7.3639 (1.3); 7.3600 (1.2); 7.3527 (3.0); 7.3456 (3.0); 7.3374 (1.1); 7.2988 (11.9); 7.2668 (1.9); 7.2394 (3.0); 7.1571 (1.9); 7.1500 (1.8); 7.1296 (1.2); 7.1226 (1.1); 6.9191 (1.1); 6.7312 (2.2); 6.5435 (1.1); 5.5799 (2.6); 5.3368 (3.7); 4.8289 (0.4); 4.8178 (0.4); 4.8112 (0.5); 4.8000 (0.6); 4.7895 (0.5); 4.7832 (0.4); 4.7718 (0.4); 3.9172 (0.9); 3.9055 (0.9); 3.8795 (1.6); 3.8678 (1.6); 3.7948 (1.5); 3.7764 (1.5); 3.7570 (0.9); 3.7387 (0.9); 3.1338 (3.3); 3.1093 (3.5); 2.8453 (0.6); 2.8403 (0.6); 2.8350 (0.3); 2.7397 (16.0); 2.6125 (1.5); 2.5495 (1.4); 2.5157 (0.4); 1.6176 (1.8); 0.1069 (1.4); 0.0479 (0.4); 0.0370 (13.9); 0.0262 (0.6)

4-40: $^{1}$H-NMR(300.2 MHz, CDCl3):
δ = 8.4530 (0.6); 8.4252 (0.6); 8.2973 (5.7); 7.5343 (0.5); 7.5289 (0.4); 7.5193 (0.9); 7.5104 (1.0); 7.5046 (0.8); 7.4916 (0.6); 7.4868 (0.6); 7.4825 (0.5); 7.3646 (0.4); 7.3412 (1.0); 7.3220 (1.2); 7.3154 (2.6); 7.2989 (17.2); 7.2638 (0.5); 7.0842 (1.5); 7.0586 (2.0); 6.9716 (1.9); 6.8960 (1.1); 6.8709 (0.8); 5.6073 (0.4); 5.5762 (5.0); 4.6576 (0.4); 4.6469 (0.4); 4.6404 (0.5); 4.6310 (0.6); 4.6212 (0.5); 4.6145 (0.5); 4.6042 (0.4); 4.1722 (0.9); 4.1484 (0.9); 3.8721 (0.7); 3.8612 (0.8); 3.8340 (1.6);

TABLE 10-continued 3.8230 (1.5); 3.7709 (1.5); 3.7530 (1.5); 3.7328 (0.8); 3.7147 (0.7); 3.0064 (3.1); 2.9822 (2.9); 2.4415 (0.9); 2.4075 (10.4); 2.3358 (0.8); 2.2694 (9.7); 2.0843 (3.9); 1.5935 (16.0); 1.5570 (0.4); 1.5308 (1.4); 1.5080 (0.6); 1.4945 (0.5); 1.4714 (1.2); 1.4674 (1.3); 1.4452 (0.6); 1.3450 (0.4); 1.3219 (1.5); 1.2982 (3.6); 1.2744 (1.2); 1.2454 (0.6); 1.2234 (1.5); 1.2164 (1.6); 1.1938 (1.7); 1.1868 (1.3); 1.1668 (0.4); 0.9421 (0.7); 0.9203 (2.1); 0.8970 (0.8); 0.0491 (0.7); 0.0382 (21.3); 0.0273 (0.9)

4-41: $^1$H-NMR(300.2 MHz, CDCl3):
δ = 7.8732 (1.6); 7.8631 (1.6); 7.8615 (1.5); 7.8569 (1.5); 7.8526 (2.0); 7.8441 (4.0); 7.8311 (2.2); 7.8184 (4.0); 7.8096 (1.8); 7.8054 (1.5); 7.8007 (1.6); 7.7890 (1.6); 7.5862 (1.0); 7.5588 (1.0); 7.4160 (0.4); 7.4110 (0.6); 7.4061 (0.4); 7.3897 (1.0); 7.3849 (1.0); 7.3686 (0.5); 7.3641 (0.7); 7.3590 (0.5); 7.3304 (0.5); 7.3255 (0.4); 7.2988 (15.8); 7.2835 (0.7); 7.2802 (0.8); 7.2504 (1.7); 7.2249 (1.9); 7.1945 (1.0); 7.1679 (1.3); 7.1416 (0.5); 7.0038 (1.9); 6.9642 (1.1); 6.9388 (0.9); 4.6866 (0.6); 4.6756 (0.5); 4.6623 (0.6); 4.6512 (0.4); 4.6163 (1.2); 4.6052 (0.8); 4.5824 (1.2); 4.5713 (1.0); 4.2033 (1.0); 4.1934 (1.1); 4.1699 (1.0); 4.1596 (0.9); 3.3053 (0.5); 3.2821 (0.5); 3.2589 (0.9); 3.2352 (0.9); 3.1605 (0.9); 3.1323 (0.9); 3.1142 (0.6); 3.0859 (0.5); 2.9939 (0.3); 2.8404 (6.7); 2.4840 (0.5); 2.4542 (10.0); 2.4112 (15.0); 2.3531 (0.4); 2.3131 (0.6); 2.2740 (9.4); 2.0836 (0.5); 1.6095 (16.0); 1.4447 (0.4); 1.4224 (1.2); 1.4187 (1.3); 1.3963 (0.6); 1.3818 (0.4); 1.3595 (1.2); 1.3554 (1.3); 1.3333 (0.6); 1.2975 (0.6); 1.1599 (0.5); 1.1380 (1.4); 1.1308 (1.6); 1.1083 (1.6); 1.1009 (1.2); 1.0814 (0.4); 0.9197 (0.5); 0.0486 (0.6); 0.0378 (18.9); 0.0268 (0.8)

4-42: $^1$HNMR(300.2 MHz, CDCl3):
δ = 8.1022 (5.4); 8.0922 (1.3); 8.0640 (0.8); 7.8915 (0.3); 7.7933 (0.3); 7.4291 (0.7); 7.4231 (0.8); 7.4076 (0.8); 7.4022 (1.4); 7.3966 (1.1); 7.3821 (0.8); 7.3751 (0.9); 7.2989 (8.7); 7.2812 (0.5); 7.2745 (1.6); 7.2685 (1.0); 7.2539 (1.4); 7.2469 (1.1); 7.2353 (1.7); 7.2317 (1.5); 7.2095 (1.4); 7.2047 (1.6); 7.1856 (2.4); 7.1773 (0.9); 7.1595 (2.6); 7.0244 (2.4); 7.0186 (2.6); 6.8480 (1.4); 6.8421 (1.4); 6.8217 (1.2); 6.8159 (1.2); 5.6152 (0.6); 5.3363 (0.4); 4.8492 (0.4); 4.8370 (0.4); 4.8279 (0.5); 4.8158 (0.5); 4.8006 (0.4); 4.7885 (0.4); 3.9276 (0.9); 3.9152 (1.0); 3.8900 (1.6); 3.8777 (1.4); 3.7879 (1.4); 3.7683 (1.7); 3.7503 (0.9); 3.7299 (0.9); 3.1079 (3.5); 3.0837 (2.9); 2.8403 (2.4); 2.7314 (16.0); 1.8440 (0.6); 1.8326 (0.6); 1.8161 (1.2); 1.7996 (0.7); 1.7882 (0.7); 1.7713 (0.4); 1.6558 (0.5); 1.2920 (0.4); 1.0066 (0.7); 0.9913 (1.9); 0.9847 (2.1); 0.9697 (1.1); 0.9630 (2.0); 0.9567 (1.9); 0.9419 (0.9); 0.6788 (0.9); 0.6635 (2.4); 0.6581 (2.1); 0.6470 (2.0); 0.6415 (2.5); 0.6253 (0.8); 0.1074 (1.8); 0.0478 (0.3); 0.0370 (11.4); 0.0262 (0.5)

4-43: $^1$H-NMR(300.2 MHz, CDCl3):
δ = 8.3602 (0.6); 8.3335 (0.6); 8.1421 (5.1); 7.4271 (0.7); 7.4209 (0.8); 7.4056 (0.7); 7.4005 (1.1); 7.3980 (1.0); 7.3945 (1.0); 7.3807 (0.8); 7.3730 (0.9); 7.2988 (8.8); 7.2906 (0.6); 7.2840 (0.6); 7.2703 (0.4); 7.2628 (1.6); 7.2566 (1.0); 7.2429 (1.4); 7.2350 (1.3); 7.2312 (1.8); 7.2281 (1.5); 7.2061 (1.2); 7.2014 (1.4); 7.1787 (0.4); 7.1739 (0.5); 7.0840 (1.7); 7.0579 (2.0); 6.8671 (1.9); 6.7738 (1.1); 6.7680 (1.0); 6.7478 (0.9); 6.7417 (0.8); 5.5789 (1.3); 4.6600 (0.4); 4.6490 (0.4); 4.6420 (0.4); 4.6337 (0.5); 4.6077 (0.3); 4.1713 (0.5); 4.1474 (0.5); 3.8635 (0.7); 3.8521 (0.8); 3.8256 (1.5); 3.8143 (1.4); 3.7618 (1.4); 3.7434 (1.4); 3.7240 (0.8); 3.7056 (0.7); 2.9935 (2.6); 2.9718 (1.8); 2.9667 (1.8); 2.8411 (1.0); 2.7429 (16.0); 2.7301 (0.7); 2.4580 (0.6); 2.4374 (0.4); 2.4081 (10.7); 2.0833 (2.4); 1.8413 (0.5); 1.8301 (0.5); 1.8132 (1.0); 1.7964 (0.6); 1.7854 (0.6); 1.6250 (0.8); 1.3209 (0.6); 1.2971 (1.3); 1.2733 (0.6); 0.9681 (0.7); 0.9537 (1.8); 0.9467 (2.0); 0.9402 (1.0); 0.9325 (1.1); 0.9252 (1.9); 0.9186 (1.7); 0.9045 (0.9); 0.6718 (0.9); 0.6574 (2.1); 0.6547 (1.8); 0.6511 (1.8); 0.6406 (1.9); 0.6354 (2.0); 0.6193 (0.7); 0.1079 (0.7); 0.0482 (0.3); 0.0375 (11.6); 0.0298 (0.4); 0.0282 (0.3); 0.0266 (0.4)

4-44: $^1$H-NMR(300.2 MHz, CDCl3):
δ = 8.4905 (0.7); 8.4635 (0.7); 8.1392 (0.7); 8.1295 (5.1); 7.4299 (0.7); 7.4237 (0.8); 7.4082 (0.8); 7.4032 (1.2); 7.4006 (1.2); 7.3974 (1.1); 7.3833 (0.8); 7.3756 (0.9); 7.3140 (2.0); 7.3082 (2.4); 7.2989 (11.8); 7.2725 (1.7); 7.2664 (1.1); 7.2526 (1.6); 7.2447 (1.4); 7.2402 (2.0); 7.2370 (1.9); 7.2262 (1.0); 7.2151 (1.4); 7.2102 (2.0); 7.2063 (1.8); 7.1989 (1.4); 7.1878 (0.6); 7.1830 (0.8); 7.1509 (0.4); 7.0898 (2.6); 7.0627 (1.8); 5.5643 (1.4); 4.6248 (0.4); 4.6137 (0.5); 4.6079 (0.5); 4.5974 (0.6); 4.5864 (0.5); 4.5751 (0.4); 4.1706 (0.6); 4.1468 (0.6); 3.8593 (0.8); 3.8486 (0.8); 3.8209 (1.6); 3.8103 (1.5); 3.7530 (1.5); 3.7360 (1.5); 3.7145 (0.8); 3.6975 (0.8); 3.0487 (0.4); 3.0280 (0.3); 3.0048 (1.7); 2.9942 (1.8); 2.9827 (1.7); 2.9673 (1.7); 2.8404 (0.6); 2.7494 (16.0); 2.7023 (0.4); 2.4578 (1.4); 2.4371 (11.6); 2.4009 (0.4); 2.0828 (2.4); 1.6224 (0.7); 1.3204 (0.8); 1.2965 (1.5); 1.2727 (0.7); 0.1072 (1.8); 0.0476 (0.5); 0.0460 (0.3); 0.0444 (0.4); 0.0368 (15.1); 0.0276 (0.5); 0.0259 (0.5)

4-45: $^1$H-NMR(300.2 MHz, CDCl3):
δ = 8.1411 (5.4); 8.1244 (0.8); 8.0974 (0.7); 7.4247 (0.7); 7.4176 (0.8); 7.4031 (0.8); 7.3990 (1.0); 7.3922 (1.6); 7.3813 (0.8); 7.3705 (0.9); 7.2988 (10.9); 7.2644 (0.4); 7.2574 (0.5); 7.2369 (1.6); 7.2299 (1.3); 7.2193 (4.2); 7.2097 (1.3); 7.1968 (1.4); 7.1933 (1.4); 7.1658 (0.5); 7.0152 (2.4); 6.9906 (0.6); 6.9646 (2.3); 6.9593 (2.4); 6.9520 (3.4); 6.9261 (0.6); 5.6229 (0.4); 4.7434 (0.4); 4.7308 (0.5); 4.7217 (0.6); 4.7160 (0.6); 4.7091 (0.6); 4.7036 (0.6); 4.6944 (0.5); 4.6819 (0.4); 4.1707 (0.8); 4.1469 (0.8); 4.1233 (0.3); 3.8816 (0.9); 3.8692 (0.9); 3.8437 (1.6); 3.8313 (1.5); 3.7556 (1.5); 3.7343 (1.4); 3.7178 (0.9); 3.6964 (0.9); 2.9484 (3.0); 2.9259 (3.2); 2.7434 (16.0); 2.1864 (12.1); 2.1795 (12.5); 2.0834 (4.0); 1.6494 (1.0); 1.3206 (1.0); 1.2968 (2.0); 1.2729 (1.0); 0.1068 (2.0); 0.0474 (0.5); 0.0366 (13.4); 0.0258 (0.7)

4-46: $^1$H-NMR(300.2 MHz, CDCl3):
δ = 8.3531 (0.7); 8.3271 (0.7); 8.1514 (5.2); 7.6115 (0.5); 7.5891 (1.0); 7.5688 (0.6); 7.5004 (0.4); 7.4738 (1.0); 7.4710 (1.0); 7.4499 (0.7); 7.4001 (1.1); 7.3726 (1.4); 7.3459 (0.5); 7.2986 (15.7); 7.1288 (1.1); 7.0852 (1.8); 7.0591 (2.0); 6.9464 (2.1); 6.8622 (2.0); 6.7713 (1.2); 6.7644 (2.0); 6.7457 (1.0); 6.7395 (0.9); 5.5759 (3.2); 5.3378 (10.7); 4.6672 (0.4); 4.6556 (0.5); 4.6479 (0.5); 4.6398 (0.6); 4.6140 (0.4); 3.8659 (0.8); 3.8545 (0.8); 3.8280 (1.6); 3.8167 (1.4); 3.7634 (1.5); 3.7449 (1.4); 3.7255 (0.8); 3.7071 (0.7); 2.9953 (2.6); 2.9742 (1.8); 2.9682 (1.8); 2.7447 (16.0); 2.4533 (0.7); 2.4060 (10.8); 2.3844 (0.3); 1.8342 (0.5); 1.8231 (0.5); 1.8064 (1.0); 1.7893 (0.6); 1.7783 (0.6); 1.6031 (8.1); 0.9668 (0.7); 0.9523 (1.8); 0.9454 (2.0); 0.9390 (1.0); 0.9312 (1.1); 0.9239 (1.9); 0.9173 (1.8); 0.9033 (0.9); 0.6652 (0.9); 0.6507 (2.1); 0.6480 (1.8); 0.6445 (1.9); 0.6339 (2.0); 0.6288 (2.1); 0.6126 (0.7); 0.1071 (0.5); 0.0482 (0.7); 0.0374 (21.3); 0.0265 (0.9)

4-47: $^1$H-NMR(300.2 MHz, CDCl3):
δ = 8.2539 (0.8); 8.2264 (0.8); 8.1553 (5.3); 7.6054 (0.6); 7.5792 (1.7); 7.5530 (1.3); 7.4885 (1.6); 7.4628 (0.9); 7.3589 (1.9); 7.3268 (1.1); 7.3238 (1.2); 7.3199 (1.0); 7.2987 (5.0); 7.0150 (2.6); 6.9528 (6.2); 6.9062 (1.1); 6.7184 (2.3); 6.5306 (1.2); 5.6022 (3.1); 5.3353 (4.2); 4.7319 (0.4); 4.7193 (0.5); 4.7103 (0.6); 4.7047 (0.5); 4.6976 (0.6); 4.6922 (0.6); 4.6831 (0.5); 4.6708 (0.4); 3.8731 (0.9); 3.8608 (0.9); 3.8354 (1.6); 3.8231 (1.5); 3.7479 (1.5); 3.7270 (1.5); 3.7101 (0.9); 3.6892 (0.9); 2.9442 (3.1); 2.9215 (3.2); 2.7437 (16.0); 2.1949 (11.9); 2.1791 (12.0); 1.6631 (1.4); 0.0371 (5.4)

4-48: $^1$H-NMR(300.2 MHz, CDCl3):
δ = 8.4737 (0.7); 8.4469 (0.7); 8.1580 (5.3); 7.6170 (0.6); 7.5907 (1.6); 7.5647 (1.2); 7.4925 (1.4); 7.4667 (0.9); 7.3951 (1.7); 7.3691 (1.0); 7.3658 (1.1); 7.3621 (0.9); 7.3425 (0.8); 7.3390 (0.8); 7.3351 (0.7); 7.3315 (0.6); 7.2987 (8.0); 7.0753 (1.8); 7.0494 (2.1); 6.9163 (1.1); 6.8760 (1.9); 6.8715 (2.0); 6.7773 (1.2); 6.7716 (1.1); 6.7514 (1.0); 6.7454 (0.9); 6.7285 (2.2); 6.5407 (1.1); 5.5584 (4.0); 5.3368 (10.1); 4.6500 (0.4); 4.6390 (0.4); 4.6326 (0.5); 4.6233 (0.5); 4.6119 (0.4); 4.5981 (0.4); 3.8579 (0.7); 3.8467 (0.8); 3.8203 (1.6); 3.8090 (1.4); 3.7587 (1.5); 3.7407 (1.4); 3.7209 (0.8); 3.7030 (0.7); 2.9848 (2.3); 2.9639 (1.8); 2.9572 (1.8); 2.7440 (16.0); 2.4501 (0.6); 2.4037 (11.0); 1.8501 (0.5); 1.8388 (0.5); 1.8221 (1.0); 1.8052 (0.6); 1.7941 (0.6); 1.6237 (4.3); 0.9737 (0.7); 0.9593 (1.8); 0.9523 (2.0); 0.9457 (0.9); 0.9384 (1.0); 0.9309 (1.9); 0.9243 (1.7); 0.9104 (0.8); 0.6761 (0.9); 0.6619 (2.0); 0.6586 (1.8); 0.6451 (1.9); 0.6402 (1.9); 0.6241 (0.7); 0.0482 (0.4); 0.0375 (10.8); 0.0266 (0.4)

TABLE 10-continued 4-49: $^1$H-NMR(300.2 MHz, CDCl3):
δ = 8.3383 (0.8); 8.3119 (0.8); 8.1497 (5.3); 7.8904 (0.4); 7.7933 (0.4); 7.6111 (0.5); 7.5877 (1.0); 7.5659 (0.6); 7.4958 (0.5); 7.4715 (1.1); 7.4691 (1.0); 7.4477 (0.8); 7.3979 (1.2); 7.3709 (1.4); 7.3442 (0.5); 7.2986 (4.4); 7.1259 (1.1); 7.0857 (1.8); 7.0601 (2.2); 6.9600 (2.1); 6.9434 (2.3); 6.8850 (1.2); 6.8597 (1.0); 6.7609 (1.1); 5.5870 (3.0); 5.3357 (10.2); 4.6853 (0.4); 4.6739 (0.5); 4.6668 (0.5); 4.6573 (0.6); 4.6473 (0.5); 4.6405 (0.5); 4.6293 (0.4); 4.1836 (0.4); 3.8744 (0.8); 3.8630 (0.8); 3.8366 (1.7); 3.8253 (1.5); 3.7729 (1.5); 3.7544 (1.5); 3.7351 (0.8); 3.7165 (0.8); 3.0026 (3.4); 2.9784 (3.3); 2.7409 (16.0); 2.4043 (11.5); 2.3840 (0.4); 2.2581 (10.7); 1.6489 (1.6); 0.0367 (6.0)
4-50: $^1$H-NMR(300.2 MHz, CDCl3):
δ = 8.1521 (4.0); 8.1305 (0.6); 8.1029 (0.5); 7.6110 (0.4); 7.5885 (0.7); 7.5696 (0.4); 7.4669 (0.3); 7.4402 (0.8); 7.4196 (0.6); 7.3918 (1.0); 7.3649 (1.1); 7.3378 (0.4); 7.2989 (11.6); 7.1178 (0.8); 7.0173 (1.7); 6.9915 (0.5); 6.9653 (1.5); 6.9603 (1.5); 6.9477 (2.3); 6.9354 (1.8); 6.9221 (0.6); 6.7529 (0.8); 5.6231 (1.8); 5.3383 (5.3); 4.7373 (0.4); 4.7279 (0.4); 4.7220 (0.4); 4.7154 (0.4); 4.7096 (0.4); 4.7006 (0.4); 3.8820 (0.7); 3.8696 (0.7); 3.8441 (1.2); 3.8317 (1.1); 3.7533 (1.1); 3.7318 (1.1); 3.7153 (0.7); 3.6940 (0.6); 2.9518 (2.4); 2.9295 (2.4); 2.7460 (12.1); 2.1747 (16.0); 1.6073 (7.8); 0.0480 (0.6); 0.0372 (15.6); 0.0263 (0.7)
4-51: $^1$H-NMR(300.2 MHz, CDCl3):
δ = 8.5932 (0.9); 8.5672 (0.9); 8.1311 (0.7); 8.1206 (5.2); 7.2990 (18.0); 7.2211 (1.2); 7.2149 (1.0); 7.1940 (1.6); 7.1879 (1.5); 7.1711 (0.5); 7.1441 (3.7); 7.1259 (3.2); 7.0923 (3.1); 7.0650 (1.9); 6.8781 (0.8); 6.8618 (1.2); 6.8564 (1.0); 6.8470 (1.2); 6.8332 (0.8); 6.8243 (0.6); 5.6126 (0.3); 5.5706 (5.4); 5.3381 (0.5); 4.6377 (0.5); 4.6118 (0.7); 4.5977 (0.6); 4.5863 (0.5); 3.8636 (0.8); 3.8525 (0.9); 3.8254 (1.7); 3.8144 (1.6); 3.7556 (1.6); 3.7381 (1.6); 3.7175 (0.9); 3.6999 (0.8); 3.0398 (0.4); 3.0174 (0.4); 2.9928 (3.1); 2.9707 (2.3); 2.9658 (2.4); 2.8414 (1.1); 2.7395 (16.0); 2.6943 (0.8); 2.4596 (1.8); 2.4342 (12.6); 2.1741 (0.6); 2.1627 (0.6); 2.1458 (1.1); 2.1285 (0.7); 2.1171 (0.6); 2.1001 (0.3); 1.5988 (13.5); 1.2917 (0.6); 1.1017 (0.6); 1.0863 (1.9); 1.0797 (2.2); 1.0652 (1.2); 1.0580 (2.0); 1.0515 (2.2); 1.0372 (1.0); 0.8398 (0.9); 0.8197 (2.6); 0.8080 (2.3); 0.8023 (2.7); 0.7861 (0.9); 0.1072 (5.3); 0.0481 (0.8); 0.0375 (22.2)
4-52: $^1$H-NMR(300.2 MHz, CDCl3):
δ = 9.2470 (1.9); 9.2200 (1.9); 8.3241 (16.0); 8.3046 (2.5); 8.1121 (0.6); 8.1045 (0.6); 8.0472 (0.5); 8.0382 (0.5); 7.9332 (5.7); 7.9254 (5.9); 7.7161 (0.5); 7.6893 (7.5); 7.6720 (12.5); 7.6131 (0.8); 7.6042 (1.2); 7.5972 (4.2); 7.5888 (4.1); 7.5692 (7.6); 7.5612 (9.9); 7.5290 (1.0); 7.5154 (2.6); 7.5072 (2.7); 7.5016 (3.6); 7.4955 (3.1); 7.4861 (2.3); 7.4774 (1.6); 7.3917 (0.4); 7.3722 (0.5); 7.2991 (26.8); 7.2209 (0.9); 7.1909 (6.8); 7.1632 (5.4); 6.6003 (0.6); 6.5817 (0.5); 5.6810 (1.0); 5.3374 (5.6); 5.0383 (0.4); 5.0192 (1.3); 5.0104 (0.7); 5.0003 (2.2); 4.9918 (1.6); 4.9817 (1.7); 4.9728 (2.1); 4.9632 (0.7); 4.9543 (1.4); 4.9354 (0.4); 4.8914 (0.4); 4.8693 (0.4); 4.2712 (0.5); 4.2559 (0.5); 4.2130 (0.6); 4.1948 (1.4); 4.1702 (2.7); 4.1583 (0.4); 4.1464 (2.7); 4.1228 (1.2); 4.1014 (0.7); 4.0907 (0.4); 4.0788 (0.4); 4.0733 (0.4); 3.7480 (12.6); 3.7282 (11.7); 3.2718 (1.6); 3.2544 (1.6); 3.2219 (4.8); 3.2047 (4.5); 3.1648 (4.2); 3.1466 (4.2); 3.1152 (1.7); 3.0971 (1.7); 2.0826 (13.7); 2.0451 (0.8); 1.7621 (3.5); 1.7585 (2.8); 1.7437 (3.5); 1.7388 (2.6); 1.6708 (1.4); 1.6490 (1.4); 1.4517 (0.3); 1.4294 (0.4); 1.4035 (0.4); 1.3201 (3.5); 1.2963 (7.0); 1.2725 (3.2); 0.9964 (0.6); 0.9719 (1.0); 0.9467 (0.6); 0.9213 (0.5); 0.9036 (0.4); 0.1186 (0.4); 0.1064 (11.0); 0.0471 (1.5); 0.0363 (36.8); 0.0256 (1.8)
4-53: $^1$H-NMR(300.2 MHz, CDCl3):
δ = 8.3852 (1.1); 8.3591 (1.1); 8.3338 (10.3); 7.6531 (3.5); 7.6480 (2.4); 7.6389 (5.0); 7.6358 (5.8); 7.4946 (2.7); 7.4725 (0.4); 7.4591 (1.2); 7.4500 (1.1); 7.4447 (1.7); 7.4385 (1.4); 7.4292 (1.1); 7.4204 (0.7); 7.2988 (15.4); 6.7705 (5.4); 5.5580 (4.5); 5.0161 (0.4); 4.6575 (0.6); 4.6463 (0.6); 4.6393 (0.8); 4.6287 (0.9); 4.6200 (0.7); 4.6128 (0.7); 4.6021 (0.6); 3.8835 (1.1); 3.8723 (1.2); 3.8452 (2.7); 3.8340 (2.5); 3.7953 (2.5); 3.7770 (2.4); 3.7570 (1.2); 3.7387 (1.1); 2.9333 (4.5); 2.9096 (4.8); 2.3255 (16.0); 2.1521 (16.0); 1.6024 (4.5); 1.3157 (5.4); 1.2948 (5.5); 0.1075 (1.8); 0.0483 (0.9); 0.0375 (21.8); 0.0265 (0.8)
4-54: $^1$H-NMR(300.2 MHz, CDCl3):
δ = 8.3508 (0.8); 8.3239 (0.8); 8.1300 (5.3); 7.3696 (1.2); 7.3434 (2.6); 7.3171 (1.6); 7.2986 (8.8); 7.0266 (1.8); 7.0133 (2.9); 6.9861 (0.4); 6.9545 (7.4); 6.9351 (1.0); 6.9274 (1.6); 6.9055 (1.9); 6.8998 (2.4); 5.6023 (0.9); 4.7241 (0.4); 4.7116 (0.5); 4.7028 (0.6); 4.6973 (0.6); 4.6900 (0.6); 4.6753 (0.5); 4.6629 (0.4); 4.1944 (0.8); 4.1706 (2.3); 4.1468 (2.3); 4.1231 (0.8); 3.8609 (0.9); 3.8484 (0.9); 3.8232 (1.6); 3.8108 (1.5); 3.7321 (1.5); 3.7108 (1.5); 3.6944 (0.9); 3.6732 (0.9); 2.9262 (2.8); 2.9034 (3.0); 2.8407 (1.1); 2.7305 (16.0); 2.2065 (12.1); 2.1829 (12.3); 2.0831 (10.3); 1.9962 (0.3); 1.9796 (0.6); 1.9682 (0.7); 1.9516 (1.2); 1.9350 (0.7); 1.9237 (0.7); 1.9068 (0.3); 1.6501 (2.0); 1.3204 (2.8); 1.2966 (5.6); 1.2728 (2.7); 1.0628 (0.7); 1.0481 (1.9); 1.0411 (2.2); 1.0265 (1.2); 1.0197 (2.0); 1.0132 (1.9); 0.9987 (0.9); 0.7797 (0.9); 0.7649 (2.5); 0.7602 (2.1); 0.7482 (2.2); 0.7433 (2.4); 0.7268 (0.8); 0.1069 (2.2); 0.0473 (0.4); 0.0365 (11.5); 0.0256 (0.5)
4-55: $^1$H-NMR(300.2 MHz, CDCl3):
δ = 8.6557 (0.8); 8.6299 (0.8); 8.1587 (0.4); 8.1283 (0.7); 8.1206 (5.2); 7.3836 (1.1); 7.3574 (2.6); 7.3310 (1.7); 7.3176 (2.1); 7.3115 (2.4); 7.2993 (15.6); 7.2149 (1.0); 7.2082 (0.9); 7.1878 (1.4); 7.1809 (1.4); 7.0692 (2.7); 7.0420 (2.2); 7.0290 (1.7); 7.0030 (1.5); 6.9893 (1.2); 6.9866 (1.2); 6.9815 (1.5); 6.9788 (1.4); 6.9600 (1.0); 6.9549 (1.4); 6.9521 (1.3); 6.9337 (2.1); 6.9276 (2.6); 5.5388 (1.0); 4.6156 (0.4); 4.5986 (0.5); 4.5886 (0.6); 4.5749 (0.5); 4.5631 (0.4); 4.1948 (0.6); 4.1709 (1.7); 4.1471 (1.8); 4.1233 (0.6); 3.8431 (0.8); 3.8322 (0.8); 3.8052 (1.6); 3.7942 (1.5); 3.7390 (1.5); 3.7219 (1.5); 3.7009 (0.8); 3.6839 (0.8); 3.0187 (0.3); 2.9962 (0.4); 2.9738 (2.1); 2.9692 (2.2); 2.9510 (1.9); 2.9423 (1.9); 2.8411 (0.4); 2.7572 (1.6); 2.7365 (16.0); 2.4499 (1.0); 2.4247 (11.8); 2.3849 (0.4); 2.3250 (1.0); 2.0836 (7.6); 2.0046 (0.3); 1.9876 (0.6); 1.9766 (0.7); 1.9599 (1.3); 1.9431 (0.8); 1.9320 (0.8); 1.9148 (0.4); 1.6548 (0.9); 1.5550 (0.3); 1.3209 (2.1); 1.2971 (4.2); 1.2733 (2.1); 1.0708 (0.7); 1.0545 (1.8); 1.0490 (2.2); 1.0342 (1.3); 1.0270 (2.2); 1.0206 (2.1); 1.0064 (1.1); 0.7875 (1.0); 0.7724 (2.6); 0.7660 (2.4); 0.7560 (2.5); 0.7497 (2.7); 0.7341 (1.1); 0.1069 (4.1); 0.0478 (0.6); 0.0369 (19.1); 0.0261 (1.0)
4-56: $^1$H-NMR(300.2 MHz, CDCl3):
δ = 8.3067 (0.9); 8.2790 (0.8); 8.0914 (5.2); 8.0822 (0.4); 7.3771 (1.2); 7.3509 (2.7); 7.3246 (1.7); 7.2986 (3.9); 7.1651 (2.3); 7.1388 (2.6); 7.0338 (4.0); 7.0285 (3.9); 7.0058 (1.4); 6.9897 (1.2); 6.9867 (1.1); 6.9818 (1.4); 6.9630 (1.0); 6.9598 (1.0); 6.9552 (1.4); 6.9329 (1.9); 6.9270 (2.4); 6.9203 (1.3); 6.8143 (1.5); 6.8085 (1.4); 6.7881 (1.3); 6.7822 (1.2); 5.6043 (0.5); 4.8376 (0.4); 4.8249 (0.4); 4.8164 (0.5); 4.8042 (0.5); 4.7889 (0.4); 4.7767 (0.4); 4.1917 (0.5); 4.1679 (1.5); 4.1441 (1.5); 4.1204 (0.5); 3.9070 (0.9); 3.8945 (1.0); 3.8695 (1.6); 3.8572 (1.4); 3.7608 (1.4); 3.7402 (1.4); 3.7234 (0.9); 3.7028 (0.9); 3.0840 (2.0); 3.0769 (2.0); 3.0618 (1.8); 3.0516 (1.8); 2.8379 (4.4); 2.7471 (0.4); 2.7163 (16.0); 2.0803 (6.7); 2.0031 (0.3); 1.9864 (0.6); 1.9750 (0.7); 1.9584 (1.3); 1.9417 (0.8); 1.9304 (0.8); 1.9136 (0.4); 1.8631 (0.4); 1.8460 (0.6); 1.8347 (0.7); 1.8181 (1.2); 1.8014 (0.7); 1.7902 (0.7); 1.7733 (0.4); 1.3178 (1.8); 1.2940 (3.7); 1.2702 (1.8); 1.0640 (0.8); 1.0489 (2.1); 1.0419 (2.3); 1.0363 (1.2); 1.0270 (1.4); 1.0205 (2.3); 1.0139 (2.2); 1.0043 (1.0); 0.9992 (1.3); 0.9895 (2.1); 0.9827 (2.3); 0.9680 (1.1); 0.9610 (2.1); 0.9547 (2.0); 0.9402 (0.9); 0.7893 (0.9); 0.7742 (2.6); 0.7690 (2.3); 0.7576 (2.2); 0.7522 (2.8); 0.7356 (0.8); 0.6778 (0.9); 0.6629 (2.4); 0.6583 (2.0); 0.6462 (2.1); 0.6414 (2.4); 0.6250 (0.8); 0.1068 (1.1); 0.0349 (5.2)
4-57: $^1$H-NMR(300.2 MHz, CDCl3):
δ = 8.1097 (5.4); 8.0920 (0.8); 8.0642 (0.8); 7.9214 (0.4); 7.9111 (0.4); 7.8930 (0.5); 7.7952 (0.5); 7.7856 (0.3); 7.7771 (0.4); 7.7667 (0.4); 7.6141 (0.5); 7.5905 (1.0); 7.5690 (0.6); 7.5121 (0.5); 7.4876 (1.1); 7.4635 (0.8); 7.4029 (1.2); 7.3759 (1.5); 7.3490 (0.5); 7.2985 (10.6); 7.1962 (2.1); 7.1703 (2.5); 7.1327 (2.4); 6.9433 (2.9); 6.9252 (1.1); 6.7603 (1.1); 5.6266 (3.3);

TABLE 10-continued

| |
|---|
| 5.3373 (13.4); 4.8692 (0.4); 4.8568 (0.4); 4.8484 (0.5); 4.8355 (0.5); 4.8211 (0.4); 4.8091 (0.4); 4.1807 (0.4); 3.9366 (1.0); 3.9243 (1.0); 3.8990 (1.6); 3.8868 (1.5); 3.7989 (1.5); 3.7785 (1.5); 3.7612 (1.0); 3.7410 (0.9); 3.1193 (3.2); 3.0943 (2.3); 2.7300 (16.0); 2.2696 (11.4); 1.6096 (4.4); 0.0471 (0.5); 0.0455 (0.4); 0.0363 (14.4); 0.0287 (0.5); 0.0271 (0.5); 0.0255 (0.5) |

TABLE 11

Compounds according to formula (6)

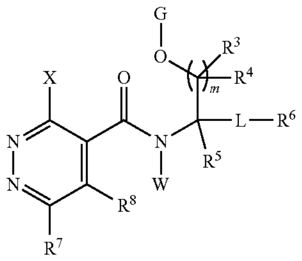

(6)

In table 11, "#" denotes the point of attachment to the L-$R^6$ group and "*" denotes the point of attachment to the pyridazin-4-yl group.

| Ex No | $R^7$ | $R^8$ | X | 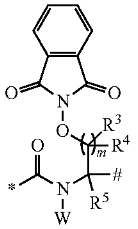 | 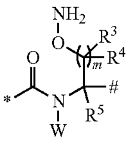 | L-$R^6$ | LogP |
|---|---|---|---|---|---|---|---|
| 6-01 | Cl | H | Cl | 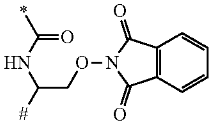 | — | (2,4-dimethyl-phenyl)methyl | 3.72[a] |
| 6-02 | Cl | H | Cl | — | 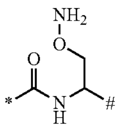 | (2,4-dimethyl-phenyl)methyl | 1.93[a] |
| 6-03 | Cl | $CH_3$ | Cl | — | 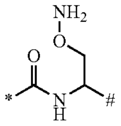 | (2,4-dimethyl-phenyl)methyl | 1.96[a] |
| 6-04 | Cl | $CH_3$ | Cl | 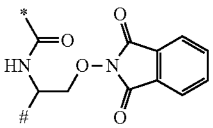 | — | (2,4-dimethyl-phenyl)methyl | 3.79[a] |
| 6-05 | $CH_3$ | H | Cl | 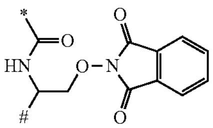 | — | (2,4-dimethyl-phenyl)methyl | 3.17[a] |

TABLE 11-continued
Compounds according to formula (6)
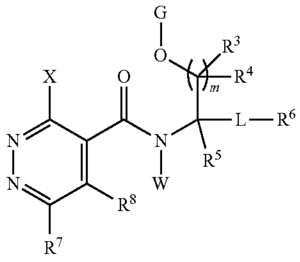
(6)
In table 11, "#" denotes the point of attachment to the L-$R^6$ group and "*" denotes the point of attachment to the pyridazin-4-yl group.
| Ex No | $R^7$ | $R^8$ | X | 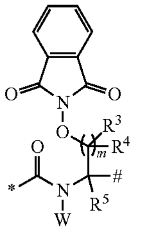 | 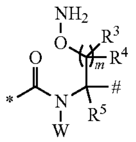 | L-$R^6$ | LogP |
|---|---|---|---|---|---|---|---|
| 6-06 | $CH_3$ | H | Cl | — | 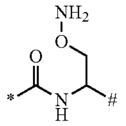 | (2,4-dimethyl-phenyl)methyl | 1.53[a] |
| 6-07 | Cl | H | Cl | — | 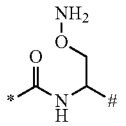 | (2,4-dichloro-phenyl)methyl | 2.30[a] |
| 6-08 | Cl | H | Cl | — | 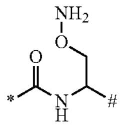 | (4-bromo-2-chloro-phenyl)methyl | 2.40[a] |
45
TABLE 12
6-01: 1H-NMR(300.2 MHz, CDCl3):
δ = 8.2099 (0.5); 7.8978 (2.5); 7.8864 (2.8); 7.8813 (2.6); 7.8775 (3.2); 7.8684 (5.9); 7.8540 (2.8); 7.8391 (6.0); 7.8304 (3.4); 7.8267 (3.4); 7.8211 (3.9); 7.8102 (3.2); 7.7920 (1.7); 7.7731 (0.8); 7.7607 (9.1); 7.2991 (10.6); 7.2605 (2.1); 7.2355 (2.6); 7.0697 (6.2); 7.0444 (1.6); 4.6013 (1.4); 4.5909 (2.2); 4.5587 (2.6); 4.5329 (0.6); 4.5213 (0.4); 4.1646 (1.7); 4.1405 (1.5); 4.1325 (1.0); 3.2737 (0.7); 3.2525 (0.7); 3.2282 (1.5); 3.2072 (1.4); 3.1614 (1.6); 3.1314 (1.5); 3.1159 (0.8); 3.0850 (0.7); 2.8360 (3.4); 2.5356 (0.4); 2.4648 (16.0); 2.4377 (0.5); 2.3529 (14.9); 2.3192 (1.1); 1.6452 (13.9); 1.2914 (0.3); 0.1072 (1.2); 0.0473 (0.5); 0.0365 (10.6); 0.0258 (0.6)
6-02: 1H-NMR(300.2 MHz, CDCl3):
δ = 7.7365 (6.3); 7.4863 (0.9); 7.4609 (0.9); 7.2997 (10.2); 7.1523 (0.4); 7.1169 (2.2); 7.0916 (3.4); 7.0689 (0.6); 7.0430 (3.6); 7.0044 (2.4); 6.9780 (1.5); 5.6118 (0.9); 4.5915 (0.6); 4.5801 (0.7); 4.5755 (0.7); 4.5652 (0.9); 4.5520 (0.7); 4.5409 (0.6); 3.8608 (0.9); 3.8510 (1.0); 3.8223 (2.2); 3.8125 (2.1); 3.7881 (0.4); 3.7795 (0.4); 3.7678 (2.1); 3.7514 (2.2); 3.7293 (1.1); 3.7130 (1.0); 3.0153 (3.4); 2.9950 (2.4); 2.9864 (2.6); 2.9704 (0.6); 2.9408 (0.5); 2.4268 (15.5); 2.3947 (0.8); 2.3688 (0.4); 2.3344 (16.0); 2.3055 (0.8); 2.0827 (0.4); 2.0538 (0.5); 2.0463 (0.4); 1.6254 (2.2); 1.2920 (1.1); 0.1076 (0.9); 0.0474 (0.4); 0.0378 (12.2)
6-03: 1H-NMR(300.2 MHz, CDCl3):
δ = 7.2991 (3.5); 7.2693 (0.9); 7.0968 (1.7); 7.0713 (2.5); 7.0177 (2.3); 6.9780 (1.4); 6.9525 (1.0); 5.6453 (2.4); 5.3355 (5.7); 4.7585 (0.4); 4.7478 (0.4); 4.7288 (0.6); 4.7102 (0.4); 4.7031 (0.4); 4.0194 (1.2); 3.8879 (0.8); 3.8762 (0.8); 3.8505 (1.6); 3.8388 (1.5); 3.7887 (1.5); 3.7683 (1.5); 3.7512 (0.8); 3.7308 (0.8); 3.0130 (0.4); 2.9888 (0.4); 2.9662 (1.4); 2.9415 (1.5); 2.9341 (1.6); 2.9071 (1.3); 2.8869 (0.4); 2.8602 (0.4); 2.4098 (0.4); 2.3906 (12.0); 2.3676 (0.5); 2.3225 (11.7); 2.2559 (16.0); 2.1947 (1.2); 2.1032 (0.4); 1.3059 (0.8); 1.2851 (0.9); 0.0367 (3.1)

TABLE 12-continued 6-05: 1H-NMR(300.2 MHz, d6-DMSO):
δ = 9.0523 (0.8); 9.0241 (0.8); 7.9728 (1.8); 7.9147 (0.6); 7.9025 (5.0); 7.8991 (5.2); 7.8867 (0.8); 7.5732 (3.0); 7.1726 (1.0); 7.1471 (1.2); 7.0074 (1.4); 6.9831 (0.8); 6.9572 (0.6); 4.4854 (0.4); 4.4659 (0.4); 4.2938 (1.8); 4.2756 (1.5); 3.3515 (16.0); 3.1042 (0.3); 3.0841 (0.4); 3.0568 (0.5); 3.0365 (0.4); 2.9109 (13.2); 2.8742 (0.5); 2.8456 (0.5); 2.8268 (0.4); 2.7984 (0.3); 2.7516 (11.0); 2.7092 (1.6); 2.6716 (7.8); 2.5284 (2.1); 2.5224 (2.9); 2.5166 (2.1); 2.3343 (6.0); 2.2611 (5.6); 0.0199 (2.5)
6-06: 1H-NMR(300.2 MHz, CDCl3):
δ = 7.6200 (4.8); 7.4446 (0.6); 7.4168 (0.6); 7.2987 (7.6); 7.1318 (1.6); 7.1062 (2.3); 7.0390 (2.2); 7.0006 (1.4); 6.9752 (1.0); 5.6037 (2.5); 5.3375 (1.5); 4.5950 (0.4); 4.5844 (0.5); 4.5733 (0.5); 4.5677 (0.6); 4.5566 (0.6); 4.5457 (0.4); 3.8533 (0.8); 3.8431 (0.8); 3.8151 (1.7); 3.8050 (1.6); 3.7606 (1.6); 3.7441 (1.6); 3.7225 (0.8); 3.7061 (0.8); 3.0473 (0.3); 3.0238 (1.6); 3.0046 (2.3); 2.9777 (1.5); 2.9608 (0.3); 2.9320 (0.4); 2.7799 (16.0); 2.4318 (12.0); 2.4025 (0.4); 2.3307 (11.0); 1.6229 (0.7); 0.1067 (0.8); 0.0474 (0.4); 0.0368 (10.0); 0.0261 (0.4)
6-07: 1H-NMR(400.2 MHz, d6-DMSO):
δ = 8.8676 (2.8); 8.8455 (3.0); 8.8348 (0.6); 8.8315 (0.5); 8.8133 (0.4); 8.7923 (0.3); 8.2245 (0.8); 8.0032 (16.0); 7.5994 (6.4); 7.4597 (0.4); 7.4542 (0.4); 7.4454 (0.4); 7.4218 (0.7); 7.4174 (0.4); 7.3972 (15.4); 7.3784 (0.6); 6.2059 (3.3); 4.5405 (0.7); 4.5280 (1.0); 4.5174 (1.4); 4.5049 (1.4); 4.4945 (1.0); 4.4820 (0.7); 3.6675 (1.2); 3.6519 (1.3); 3.6408 (3.5); 3.6252 (3.9); 3.6204 (3.8); 3.6058 (3.4); 3.5936 (1.4); 3.5792 (1.1); 3.3400 (0.6); 3.0866 (1.8); 3.0744 (1.9); 3.0513 (2.4); 3.0391 (2.2); 2.8077 (2.2); 2.7838 (2.2); 2.7724 (1.8); 2.7485 (1.7); 2.5148 (4.0); 2.5105 (7.8); 2.5061 (10.1); 2.5016 (7.2); 2.4974 (3.4); 0.0001 (1.3)
6-08: 1H-NMR(300.1 MHz, d6-DMSO):
δ = 8.8488 (2.4); 8.8194 (2.4); 7.9916 (16.0); 7.7106 (6.1); 7.7038 (6.5); 7.5395 (2.9); 7.5328 (2.6); 7.5121 (3.7); 7.5054 (3.5); 7.3382 (5.6); 7.3107 (4.4); 6.1450 (10.9); 4.5456 (0.6); 4.5285 (0.8); 4.5144 (1.2); 4.4983 (1.2); 4.4844 (0.8); 4.4675 (0.6); 3.6722 (0.8); 3.6514 (0.9); 3.6366 (3.3); 3.6183 (4.6); 3.6005 (3.1); 3.5844 (0.9); 3.5650 (0.7); 3.3187 (6.9); 3.0769 (1.4); 3.0605 (1.4); 3.0299 (2.0); 3.0136 (1.8); 2.8016 (1.8); 2.7699 (1.8); 2.7545 (1.4); 2.7228 (1.3); 2.5143 (2.4); 2.5084 (4.7); 2.5024 (6.1); 2.4964 (4.2); 2.4906 (1.9); 2.0753 (0.4); −0.0004 (7.0)

TABLE 13

Compounds according to formula (7)

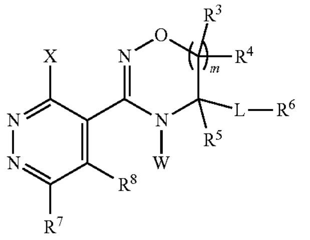

(7)

In table 13, "#" denotes the point of attachment to the L-$R^6$ group and "*" denotes the point of attachment to the pyridazin-4-yl group.

| Ex No | $R^7$ | $R^8$ | X | 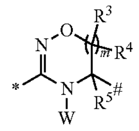 | L-$R^6$ | LogP |
|---|---|---|---|---|---|---|
| 7-01 (*) | Cl | H | Cl | 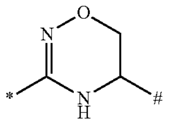 | (2,4-dimethylphenyl)methyl | 2.98[a] |
| 7-02 | Cl | $CH_3$ | Cl | 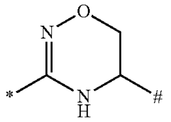 | (2,4-dimethylphenyl)methyl | 3.00[a] |
| 7-03 (*) | $CH_3$ | H | Cl | 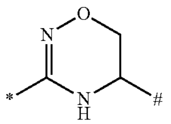 | (2,4-dimethylphenyl)methyl | 2.45[a] |

TABLE 13-continued

Compounds according to formula (7)

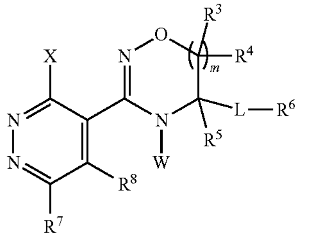

(7)

In table 13, "#" denotes the point of attachment to the L-$R^6$ group and "*" denotes the point of attachment to the pyridazin-4-yl group.

| Ex No | $R^7$ | $R^8$ | X | 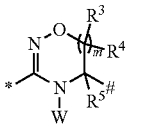 | L-$R^6$ | LogP |
|---|---|---|---|---|---|---|
| 7-04 (*) | $CH_3$ | H | Cl | 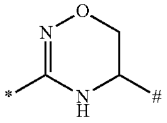 | (2,4-dimethylphenyl)methyl | 2.44[a] |
| 7-05 (*) | Cl | H | Cl | 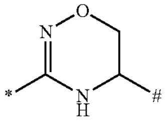 | (2,4-dichlorophenyl)methyl | 3.17[a] |
| 7-06 (*) | Cl | H | Cl | 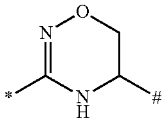 | (4-bromo-2-chloro-phenyl)methyl | 3.28[a] |
| 7-07 (*) | Cl | H | Cl | 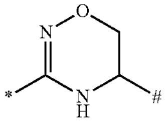 | (2,4-dichlorophenyl)methyl | 3.19[a] |
| 7-08 (*) | Cl | H | Cl | 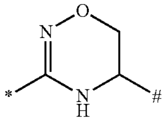 | (2,4-dichlorophenyl)methyl | 3.19[a] |
| 7-09 (*) | Cl | H | Cl | 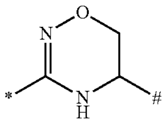 | (4-bromo-2-chloro-phenyl)methyl | 3.31[a] |
| 7-10 (*) | Cl | H | Cl | 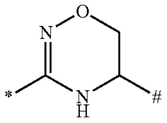 | (4-bromo-2-chloro-phenyl)methyl | 3.31[a] |
| 7-11 (*) | Cl | H | Cl | 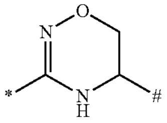 | (2,4-dimethylphenyl)methyl | 3.04[a] |

TABLE 13-continued

Compounds according to formula (7)

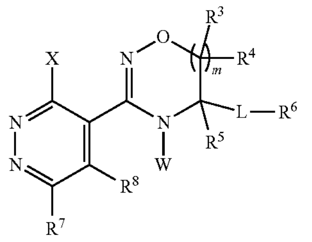

(7)

In table 13, "#" denotes the point of attachment to the L-R6 group and "*" denotes the point of attachment to the pyridazin-4-yl group.

| Ex No | $R^7$ | $R^8$ | X | 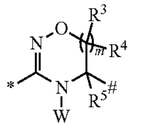 | L-$R^6$ | LogP |
|---|---|---|---|---|---|---|
| 7-12 (*) | Cl | H | Cl | 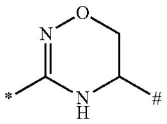 | (2,4-dimethylphenyl)methyl | 3.04[a] |

(*) Ex 7-07 and 7-08 are the 2 enantiomers of Ex 7-05
Ex 7-07: Optical rotation: +61.9° (c = 2.23, CDCl3, 20° C.); concentration c is expressed in g/100 mL.
Ex 7-08: Optical rotation: −59.6° (c = 2.45, CDCl3, 20° C.); concentration c is expressed in g/100 mL.
(*) Ex 7-09 and 7-10 are the 2 enantiomers of Ex 7-06
Ex 7-09: Optical rotation: +62.4° (c = 2.28, CDCl3, 20° C.); concentration c is expressed in g/100 mL.
Ex 7-10: Optical rotation: −59.6° (c = 2.35, CDCl3, 20° C.); concentration c is expressed in g/100 mL.
(*) Ex 7-11 and 7-12 are the 2 enantiomers of Ex 7-01
Ex 7-11: Optical rotation: −90.1° (c = 2.18, CDCl3, 20° C.); concentration c is expressed in g/100 mL.
Ex 7-12: Optical rotation: +93.2° (c = 1.83, CDCl3, 20° C.); concentration c is expressed in g/100 mL.
(*) Ex 7-03 is Single Stereoisomer; Ex 7-04 is racemate

TABLE 14

7-01: 1H-NMR(300.2 MHz, CDCl3):
δ = 7.7686 (8.3); 7.7444 (0.7); 7.2987 (6.5); 7.1869 (0.4); 7.1608 (0.4); 7.0830 (1.5); 7.0568 (6.5); 7.0283 (2.4); 7.0021 (1.0); 5.1557 (1.6); 4.1917 (1.0); 4.1832 (1.6); 4.1652 (0.6); 4.1570 (1.8); 4.1479 (1.4); 4.1423 (0.8); 3.9419 (0.5); 3.9324 (0.8); 3.9231 (0.9); 3.9135 (1.0); 3.9046 (1.1); 3.8897 (2.5); 3.8722 (0.7); 3.8552 (1.8); 3.8368 (1.0); 3.0482 (0.8); 3.0295 (0.8); 3.0205 (0.4); 3.0028 (1.6); 2.9833 (1.5); 2.8882 (1.3); 2.8600 (1.3); 2.8421 (1.0); 2.8139 (0.9); 2.4274 (1.3); 2.3479 (16.0); 2.3293 (15.0); 2.0792 (2.4); 1.6221 (1.2); 1.3191 (0.6); 1.2952 (1.2); 1.2714 (0.5); 0.1071 (0.7); 0.0368 (7.6)
7-02: 1H-NMR(300.2 MHz, CDCl3):
δ = 7.2986 (9.5); 7.1704 (0.3); 7.0662 (1.2); 7.0399 (3.6); 7.0011 (1.4); 6.9745 (0.6); 4.9509 (1.0); 4.1927 (0.6); 4.1828 (1.0); 4.1569 (1.1); 4.1477 (0.8); 4.1012 (0.4); 3.9669 (0.5); 3.9573 (0.6); 3.9477 (0.6); 3.9392 (0.8); 3.9287 (1.5); 3.9121 (0.4); 3.8937 (1.0); 3.8762 (0.6); 3.0600 (0.5); 3.0402 (0.5); 3.0143 (1.2); 2.9944 (1.1); 2.9229 (0.8); 2.8952 (0.8); 2.8767 (0.6); 2.8489 (0.5); 2.5357 (16.0); 2.4138 (0.8); 2.4101 (1.5); 2.3656 (1.4); 2.3469 (11.4); 2.3118 (10.0); 2.2791 (2.2); 2.2677 (1.1); 2.2591 (2.3); 1.9072 (1.4); 1.9006 (1.6); 1.8791 (2.0); 1.8171 (0.4); 1.7937 (2.0); 1.6050 (2.4); 1.3137 (1.4); 1.2926 (3.0); 0.1068 (0.5); 0.0478 (0.4); 0.0370 (11.4); 0.0260 (0.4)
7-03: 1H-NMR(300.2 MHz, CDCl3):
δ = 7.5488 (5.1); 7.3040 (0.6); 7.3003 (1.3); 7.2983 (1.5); 7.2941 (0.9); 7.0889 (1.6); 7.0636 (2.9); 7.0365 (3.4); 7.0110 (2.3); 6.9853 (1.2); 5.3719 (1.2); 4.1347 (1.4); 4.1085 (1.6); 4.1002 (1.3); 3.9197 (0.7); 3.9105 (0.8); 3.8798 (2.2); 3.8457 (1.4); 3.8279 (1.0); 3.0325 (0.6); 3.0129 (0.6); 2.9871 (1.4); 2.9667 (1.3); 2.9172 (1.1); 2.8905 (1.1); 2.8718 (0.8); 2.8443 (0.6); 2.7086 (16.0); 2.6614 (1.8); 2.3748 (0.6); 2.3421 (13.1); 2.3191 (12.8); 2.2094 (2.6); 1.3369 (0.4); 1.3029 (1.6); 1.2821 (6.9); 0.9134 (0.3); 0.8900 (0.3); 0.0387 (0.5); 0.0351 (1.2); 0.0332 (1.4); 0.0291 (0.8)
7-04: 1H-NMR(300.2 MHz, CDCl3):
δ = 7.6408 (1.0); 7.5715 (4.8); 7.2988 (6.8); 7.1867 (0.7); 7.1604 (0.8); 7.1440 (0.4); 7.1183 (0.5); 7.0967 (1.2); 7.0712 (2.7); 7.0566 (2.2); 7.0314 (1.6); 7.0041 (1.0); 6.5721 (0.6); 6.5458 (0.6); 5.3372 (0.8); 5.0665 (1.1); 4.2669 (0.3); 4.1969 (0.4); 4.1886 (0.8); 4.1800 (1.2); 4.1540 (1.2); 4.1443 (1.2); 3.9390 (0.4); 3.9297 (0.6); 3.9202 (0.6); 3.9107 (0.7); 3.9016 (0.8); 3.8848 (2.0); 3.8669 (0.6); 3.8503 (1.3); 3.8316 (0.8); 3.0495 (0.6); 3.0311 (0.6); 3.0178 (0.4); 3.0039 (1.2); 2.9849 (1.2); 2.8930 (1.0); 2.8651 (0.9); 2.8470 (0.7); 2.8190 (0.7); 2.7773 (3.6); 2.7436 (16.0); 2.4360 (2.5); 2.3510 (11.6); 2.3315 (13.0); 2.0812 (0.9); 1.6260 (2.6); 1.2958 (0.5); 0.1069 (1.8); 0.0368 (9.1); 0.0260 (0.3)
7-05: 1H-NMR(300.1 MHz, d6-DMSO):
δ = 8.2197 (16.0); 7.6184 (6.6); 7.6119 (7.2); 7.5499 (3.6); 7.5392 (3.7); 7.4737 (3.0); 7.4462 (8.5); 7.4229 (6.0); 7.4162 (5.5); 7.3954 (2.2); 7.3887 (2.2); 5.7586 (1.1); 3.8657 (3.5); 3.8339 (5.2); 3.8233 (3.3); 3.8069 (3.5); 3.7936 (3.4); 3.7680 (1.6); 3.7551 (0.8); 3.4504 (0.3); 3.4426 (0.3); 3.0545 (0.7); 3.0309 (0.7); 3.0099 (3.4); 2.9929 (4.5); 2.9860 (4.2); 2.9733 (3.6); 2.9491 (0.7); 2.9271 (0.5); 2.5127 (5.5); 2.5070 (6.9); 2.5014 (5.0); 1.9933 (0.8); 1.2849 (0.5); 1.2299 (0.5); 1.1782 (0.5); 0.9138 (0.5); 0.8885 (0.3); 0.8776 (0.6); 0.8621 (0.5); 0.8544 (0.6); 0.8323 (0.4); −0.0004 (0.9)

TABLE 14-continued 7-06: 1H-NMR(300.1 MHz, d6-DMSO):
δ = 8.2155 (16.0); 7.7341 (7.2); 7.7275 (7.7); 7.5506 (3.7); 7.5436 (4.5); 7.5372 (4.2); 7.5236 (7.6); 7.5168 (5.3); 7.4449 (0.3); 7.4157 (0.4); 7.3984 (6.8); 7.3709 (4.8); 3.8599 (3.8); 3.8492 (2.5); 3.8298 (5.2); 3.8195 (3.2); 3.8003 (3.4); 3.7868 (3.4); 3.7610 (1.7); 3.7479 (0.8); 3.3219 (11.9); 3.0330 (0.6); 3.0099 (0.7); 2.9888 (3.5); 2.9737 (4.4); 2.9646 (4.0); 2.9539 (3.7); 2.9298 (0.7); 2.9071 (0.4); 2.5086 (8.0); 2.5028 (10.3); 2.4971 (7.5); −0.0005 (5.0)
7-07: 1H-NMR(499.9 MHz, CDCl3):
δ = 7.7140 (16.0); 7.4065 (7.6); 7.4032 (7.7); 7.2656 (5.4); 7.2307 (1.6); 7.2271 (1.3); 7.2143 (8.0); 7.2106 (9.0); 7.2056 (11.5); 7.1892 (2.1); 5.4993 (3.4); 5.3006 (2.8); 4.0313 (0.4); 4.0240 (1.1); 4.0171 (1.8); 4.0099 (2.6); 4.0029 (2.8); 3.9958 (2.1); 3.9887 (1.7); 3.9841 (3.1); 3.9784 (1.7); 3.9618 (5.6); 3.9557 (4.4); 3.9353 (4.4); 3.9277 (3.9); 3.9130 (1.9); 3.9054 (1.6); 3.7266 (1.2); 3.7126 (3.6); 3.6986 (3.6); 3.6845 (1.2); 3.0865 (11.0); 3.0723 (10.4); 1.6189 (0.7); 1.2466 (4.2); 1.2325 (8.2); 1.2185 (4.1); −0.0002 (7.5)
7-08: 1H-NMR(499.9 MHz, CDCl3):
δ = 7.7124 (16.0); 7.4052 (6.8); 7.4019 (7.1); 7.2660 (5.6); 7.2295 (1.4); 7.2259 (1.1); 7.2131 (7.5); 7.2094 (8.7); 7.2050 (11.2); 7.1886 (1.8); 5.5207 (3.3); 5.5152 (3.1); 5.3006 (2.8); 4.0308 (0.4); 4.0235 (1.0); 4.0166 (1.7); 4.0093 (2.4); 4.0024 (2.6); 3.9952 (2.0); 3.9883 (1.4); 3.9820 (2.9); 3.9762 (1.4); 3.9598 (5.4); 3.9536 (4.2); 3.9347 (4.4); 3.9270 (3.7); 3.9123 (1.8); 3.9047 (1.5); 3.7258 (1.3); 3.7118 (4.0); 3.6978 (4.0); 3.6837 (1.4); 3.0860 (10.7); 3.0718 (10.3); 1.6191 (0.5); 1.2542 (0.5); 1.2460 (4.6); 1.2320 (8.9); 1.2179 (4.4); −0.0002 (6.9); −0.0066 (0.4)
7-09: 1H-NMR(499.9 MHz, CDCl3):
δ = 7.7134 (16.0); 7.5543 (7.9); 7.5505 (7.7); 7.3725 (4.0); 7.3686 (3.6); 7.3562 (4.6); 7.3524 (4.2); 7.2649 (5.7); 7.1463 (7.1); 7.1300 (6.1); 5.4857 (3.4); 5.3005 (0.5); 4.0322 (0.4); 4.0250 (1.1); 4.0180 (1.8); 4.0108 (2.6); 4.0038 (2.7); 3.9967 (2.1); 3.9898 (1.5); 3.9836 (3.0); 3.9778 (1.5); 3.9613 (5.6); 3.9553 (4.3); 3.9370 (4.6); 3.9293 (3.9); 3.9146 (1.8); 3.9069 (1.6); 3.4736 (3.7); 3.0745 (10.6); 3.0603 (10.0); 2.9415 (0.4); 2.8305 (0.3); 1.6217 (0.8); 1.2548 (0.4); 1.2471 (0.5); 1.2330 (0.8); 1.2190 (0.4); −0.0002 (7.5)
7-10: 1H-NMR(499.9 MHz, CDCl3):
δ = 7.7114 (16.0); 7.5523 (7.6); 7.5485 (8.2); 7.3704 (3.8); 7.3666 (3.8); 7.3541 (4.4); 7.3503 (4.4); 7.2651 (5.4); 7.1454 (7.0); 7.1291 (6.1); 5.5112 (3.8); 5.5053 (3.6); 4.0314 (0.4); 4.0242 (1.1); 4.0172 (1.9); 4.0100 (2.7); 4.0031 (2.8); 3.9959 (2.1); 3.9891 (1.4); 3.9811 (2.8); 3.9750 (1.5); 3.9584 (5.7); 3.9524 (4.5); 3.9358 (4.8); 3.9282 (4.0); 3.9134 (1.8); 3.9058 (1.5); 3.4723 (4.3); 3.0738 (10.8); 3.0596 (10.4); 1.6192 (1.5); 1.2547 (0.5); 1.2464 (0.4); 1.2323 (0.6); −0.0002 (7.1)
7-11: 1H-NMR(499.9 MHz, CDCl3):
δ = 7.7119 (8.6); 7.2611 (2.8); 7.0321 (2.0); 7.0168 (3.4); 7.0016 (3.3); 6.9848 (0.4); 6.9697 (2.2); 6.9560 (1.4); 5.2907 (1.8); 4.1155 (1.3); 4.1093 (1.5); 4.0938 (1.6); 4.0877 (1.8); 3.8916 (0.3); 3.8859 (0.6); 3.8806 (0.9); 3.8748 (1.0); 3.8691 (1.1); 3.8635 (1.0); 3.8582 (0.8); 3.8521 (0.7); 3.8467 (0.5); 3.8397 (2.3); 3.8289 (1.2); 3.8180 (1.8); 3.8072 (1.3); 2.9820 (1.0); 2.9700 (1.0); 2.9545 (1.5); 2.9422 (1.5); 2.8545 (1.5); 2.8379 (1.5); 2.8270 (1.1); 2.8101 (1.0); 2.3045 (16.0); 2.2828 (15.3); 1.6297 (0.9); 1.3879 (3.7); −0.0002 (3.7)
7-12: 1H-NMR(499.9 MHz, CDCl3):
δ =7.7147 (8.0); 7.2607 (2.9); 7.0332 (2.2); 7.0179 (3.5); 7.0045 (3.1); 6.9744 (2.0); 6.9590 (1.2); 5.2531 (1.7); 4.1214 (1.4); 4.1152 (1.5); 4.0997 (1.6); 4.0935 (1.6); 3.8992 (0.3); 3.8930 (0.5); 3.8874 (0.7); 3.8820 (1.0); 3.8761 (1.1); 3.8705 (1.1); 3.8648 (1.1); 3.8594 (0.8); 3.8534 (0.7); 3.8479 (0.6); 3.8402 (2.2); 3.8293 (1.2); 3.8185 (1.7); 3.8076 (1.2); 2.9847 (1.1); 2.9727 (1.0); 2.9572 (1.5); 2.9449 (1.4); 2.8515 (1.6); 2.8347 (1.5); 2.8240 (1.1); 2.8069 (1.0); 2.3058 (16.0); 2.2846 (14.6); 1.5927 (1.7); −0.0002 (3.8)

TABLE 43

Compounds according to formula (8)

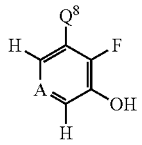

(8)

TABLE 43-continued

| Ex No | A | QS | LogP |
|---|---|---|---|
| 8-01 | CH | vinyl | 1.96[a] |
| 8-02 | CH | ethynyl | 1.72[a] |
| 8-03 | CH | cyclopropyl | 2.12[a] |
| 8-04 | CH | rac-2,2-difluorocyclopropyl | |
| 8-05 | CH | 1-fluorocyclopropyl | |

TABLE 44

8-01: $^1$H-NMR(300.2 MHz, CDCl3):
δ = 7.2988 (8.3); 7.0822 (1.8); 7.0748 (2.4); 7.0563 (7.2); 7.0491 (7.3); 7.0406 (18.4); 7.0294 (8.8); 7.0183 (16.0); 7.0042 (0.7); 6.9921 (5.6); 6.9704 (6.4); 6.9630 (5.7); 6.9437 (7.8); 6.9375 (3.4); 6.9324 (4.6); 6.9257 (7.2); 6.9223 (4.7); 6.9109 (3.1); 6.8885 (6.8); 6.8667 (7.3); 6.8294 (7.6); 5.8978 (11.2); 5.8944 (11.6); 5.8387 (10.0); 5.8353 (10.3); 5.4557 (11.1); 5.4523 (11.2); 5.4184 (10.5); 5.4150 (10.7); 5.3378 (12.9); 5.2491 (9.5); 4.1831 (0.6); 4.1593 (0.6); 2.0946 (2.9); 1.6957 (8.4); 1.3266 (1.2); 1.3201 (1.8); 1.3029 (3.6); 1.2968 (3.9); 1.2790 (1.0); 1.2733 (1.4); 1.2639 (0.5); 0.9451 (0.6); 0.9234 (1.7); 0.9002 (0.7); 0.3136 (0.6); 0.3114 (0.6); 0.1135 (0.5); 0.0418 (9.8); 0.0309 (0.3)
8-02: $^1$H-NMR(300.2 MHz, $d_6$-DMSO):
δ = 10.1455 (8.9); 7.0552 (1.1); 7.0470 (1.7); 7.0289 (5.0); 7.0205 (9.8); 7.0119 (10.7); 6.9960 (16.0); 6.9699 (3.5); 6.9607 (5.1); 6.9527 (4.7); 6.9417 (4.7); 6.9369 (2.7); 6.9275 (4.1); 6.9101 (2.0); 5.7739 (1.2); 4.4408 (14.4); 3.3664 (6.0); 2.5345 (1.2); 2.5285 (2.7); 2.5225 (3.8); 2.5164 (2.8); 2.5105 (1.3); 1.2949 (0.5); 1.2576 (3.4); 1.0987 (1.2); 1.0754 (2.3); 1.0521 (1.1); 0.8946 (0.9); 0.8730 (3.1); 0.8497 (1.1); 0.0148 (5.1)
8-03: $^1$H-NMR(300.1 MHz, $d_6$-DMSO):
δ = 9.6264 (16.0); 6.8628 (2.1); 6.8591 (2.1); 6.8364 (5.2); 6.8326 (5.3); 6.8101 (3.6); 6.8066 (3.8); 6.7434 (3.5); 6.7378 (3.8); 6.7159 (5.1); 6.7104 (5.3); 6.6887 (2.4); 6.6832 (2.3); 6.3737 (2.6); 6.3684 (2.6); 6.3475 (4.7); 6.3262 (2.4); 6.3211 (2.2); 5.7578 (0.4); 4.0415 (0.8); 4.0178 (0.9); 3.3382 (6.7); 2.5154 (2.8); 2.5095 (5.4); 2.5036 (7.2); 2.4976 (4.9); 2.4918 (2.2); 2.0462 (0.7); 2.0289 (1.6); 2.0180 (1.8); 2.0009 (3.3); 1.9896 (5.1); 1.9730 (1.8); 1.9556 (0.9); 1.1988 (1.0); 1.1751 (2.1); 1.1513 (1.0); 0.9636 (2.7); 0.9495 (7.4); 0.9420 (7.8); 0.9356 (3.5); 0.9287 (4.0); 0.9210 (7.8); 0.9136 (7.1); 0.9005 (3.3); 0.8787 (0.4); 0.7131 (0.3); 0.6811 (3.5); 0.6678 (8.1); 0.6606 (8.4); 0.6506 (7.8); 0.6434 (8.0); 0.6289 (2.6); −0.0004 (5.8)

TABLE 44-continued 8-04: $^1$H-NMR(300.2 MHz, CDCl3):
δ = 7.2988 (0.5); 7.0418 (0.4); 7.0149 (1.2); 6.9891 (2.4); 6.9810 (1.1); 6.9623 (0.9); 6.9569 (0.9); 6.9354 (0.3); 6.7340 (0.4); 6.7264 (0.4); 6.7100 (0.8); 6.6868 (0.4); 6.6841 (0.4); 5.4977 (1.0); 5.3330 (0.8); 2.8803 (0.3); 2.8674 (0.6); 2.8398 (0.6); 2.8264 (0.4); 2.7988 (0.3); 2.0439 (16.0); 1.9405 (0.4); 1.9265 (0.6); 1.9103 (0.5); 1.9009 (0.6); 1.8842 (0.6); 1.8612 (0.4); 1.8442 (0.4); 1.7154 (0.3); 1.7014 (0.5); 1.6880 (0.7); 1.6738 (0.5); 1.6597 (0.7); 1.6462 (0.6); 0.0359 (0.7)
8-05: $^1$H-NMR(300.2 MHz, CDCl3):
δ = 7.2989 (22.6); 7.1680 (0.4); 7.1558 (0.6); 7.1500 (0.9); 7.1325 (1.2); 7.1213 (0.4); 7.1047 (1.8); 7.0896 (1.0); 7.0770 (4.3); 7.0605 (33.6); 7.0549 (23.8); 7.0432 (11.9); 7.0398 (16.0); 7.0347 (9.4); 7.0256 (4.5); 7.0210 (3.8); 7.0125 (2.1); 7.0074 (1.9); 7.0039 (1.9); 5.1920 (11.4); 3.6842 (0.4); 3.3468 (0.4); 2.1527 (0.4); 2.1394 (0.3); 2.1195 (0.3); 2.1161 (0.3); 2.0859 (0.3); 2.0500 (0.4); 1.6703 (0.4); 1.6596 (0.6); 1.6394 (7.8); 1.5230 (3.1); 1.5003 (9.4); 1.4973 (10.4); 1.4743 (4.2); 1.4603 (3.2); 1.4377 (9.4); 1.4345 (10.3); 1.4116 (4.9); 1.3500 (0.5); 1.2497 (0.7); 1.2391 (0.5); 1.2200 (0.8); 1.1889 (4.2); 1.1732 (5.5); 1.1681 (11.0); 1.1612 (12.7); 1.1386 (13.2); 1.1327 (9.8); 1.1110 (3.1); 0.0502 (0.9); 0.0394 (29.9); 0.0285 (1.1)

TABLE 15

Compounds according to formula (9)

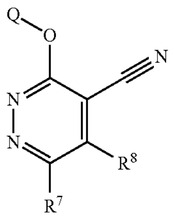

(9)

TABLE 15-continued

| Ex No | $R^7$ | $R^8$ | Q | LogP |
|---|---|---|---|---|
| 9-01 | Cl | H | 3-cyclopropylphenyl | 3.37[a] |
| 9-02 | $CH_3$ | H | 3-(trifluoromethyl)phenyl | 2.84[a] |
| 9-03 | Cl | H | 3-(trifluoromethyl)phenyl | 3.25[a] |
| 9-04 | Cl | H | 3-cyclopropyl-2-fluorophenyl | 3.54[a] |
| 9-05 | Cl | H | 3-bromo-2-fluorophenyl | 3.28[a] |
| 9-06 | Cl | H | 3-chloro-2-fluorophenyl | 3.23[a] |
| 9-07 | Cl | H | 3-chlorophenyl | 3.14[a] |
| 9-08 | Cl | H | 3-methoxyphenyl | 2.75[a] |
| 9-09 | Cl | H | 3-(difluoromethyl)-2-fluorophenyl | 3.00[a] |

TABLE 16

9-01: $^1$H-NMR(300.2 MHz, $d_6$-DMSO):
δ = 8.8636 (0.4); 8.7495 (0.4); 8.7364 (8.6); 8.4333 (0.4); 7.4065 (1.6); 7.3804 (3.7); 7.3543 (2.6); 7.1249 (2.0); 7.1174 (2.3); 7.0975 (4.0); 7.0683 (5.1); 7.0618 (3.7); 3.3454 (16.0); 2.5285 (3.7); 2.5226 (5.0); 2.5167 (3.6); 2.0302 (0.4); 2.0131 (1.0); 2.0022 (1.1); 1.9856 (1.9); 1.9689 (1.1); 1.9578 (1.1); 1.9411 (0.5); 1.0323 (1.2); 1.0176 (3.3); 1.0102 (3.7); 0.9965 (1.9); 0.9897 (3.5); 0.9824 (3.3); 0.9689 (1.4); 0.7438 (1.4); 0.7298 (3.8); 0.7230 (4.0); 0.7135 (3.7); 0.7066 (4.1); 0.6913 (1.1); 0.0207 (3.9)
9-02: $^1$H-NMR(499.9 MHz, $d_6$-DMSO):
δ = 8.3226 (5.8); 7.8030 (2.1); 7.7645 (0.5); 7.7488 (1.7); 7.7330 (1.7); 7.7108 (1.8); 7.6949 (1.0); 7.6900 (1.4); 7.6870 (1.4); 7.6711 (0.8); 3.3405 (9.8); 2.6232 (16.0); 2.5124 (1.0); 2.5089 (2.1); 2.5053 (2.9); 2.5018 (2.2); 2.4984 (1.1)
9-03: 1H-NMR(499.9 MHz, CDCl3):
δ = 7.8051 (16.0); 7.7925 (0.5); 7.6282 (0.7); 7.6123 (4.7); 7.6047 (4.6); 7.6008 (11.6); 7.5994 (11.9); 7.5751 (0.4); 7.5593 (5.7); 7.5460 (0.6); 7.5055 (0.5); 7.5014 (0.5); 7.4962 (2.1); 7.4897 (3.3); 7.4855 (3.2); 7.4780 (2.6); 7.4732 (1.7); 7.2595 (5.8); 4.1272 (0.3); 4.1129 (0.3); 2.0409 (1.4); 1.5504 (11.9); 1.2892 (0.4); 1.2712 (0.9); 1.2659 (1.2); 1.2572 (1.3); 1.2429 (0.6); 0.8953 (0.7); 0.8817 (1.8); 0.8675 (0.9); −0.0002 (4.6)
9-04: $^1$H-NMR(300.2 MHz, CDCl3):
δ = 7.8211 (16.0); 7.5866 (0.7); 7.2986 (19.8); 7.1715 (0.7); 7.1570 (0.5); 7.1443 (8.9); 7.1296 (5.4); 7.1264 (6.9); 7.1215 (4.7); 7.1169 (4.3); 7.0990 (1.1); 7.0899 (0.4); 6.9111 (1.7); 6.8941 (2.4); 6.8893 (2.0); 6.8796 (2.8); 6.8664 (1.6); 6.8573 (1.4); 2.1713 (0.6); 2.1541 (1.2); 2.1429 (1.3); 2.1257 (2.4); 2.1083 (1.4); 2.0975 (1.3); 2.0802 (0.7); 1.5885 (9.5); 1.2911 (1.0); 1.0918 (1.8); 1.0765 (4.7); 1.0697 (5.0); 1.0637 (2.5); 1.0547 (2.7); 1.0478 (4.9); 1.0414 (4.4); 1.0265 (2.2); 1.0049 (0.3); 0.8975 (0.4); 0.8794 (0.6); 0.8615 (0.4); 0.8294 (2.4); 0.8143 (5.5); 0.8082 (5.2); 0.7973 (4.8); 0.7919 (5.8); 0.7752 (1.7); 0.1071 (6.8); 0.0482 (1.0); 0.0465 (0.6); 0.0374 (26.7); 0.0280 (1.0); 0.0265 (1.2)
9-05: $^1$H-NMR(300.2 MHz, CDCl3):
δ = 7.8483 (16.0); 7.6320 (0.6); 7.6035 (1.9); 7.5983 (2.1); 7.5835 (2.1); 7.5776 (3.4); 7.5712 (2.4); 7.5564 (2.3); 7.5510 (2.4); 7.3553 (1.7); 7.3501 (1.8); 7.3330 (1.9); 7.3279 (4.2); 7.3227 (2.6); 7.3054 (3.4); 7.2987 (23.6); 7.2069 (2.8); 7.2015 (2.7); 7.1796 (4.2); 7.1742 (4.2); 7.1523 (1.7); 7.1469 (1.8); 5.3383 (0.4); 2.0467 (0.6); 1.5894 (7.8); 1.3214 (0.3); 1.2924 (1.1); 0.8972 (0.6); 0.8770 (0.7); 0.1066 (0.6); 0.0479 (0.5); 0.0371 (30.2); 0.0263 (1.8)
9-06: $^1$H-NMR(300.2 MHz, CDCl3):
δ = 7.8612 (0.3); 7.8506 (16.0); 7.6349 (0.8); 7.4606 (1.7); 7.4545 (1.8); 7.4390 (1.9); 7.4336 (3.1); 7.4279 (2.5); 7.4136 (2.1); 7.4064 (2.4); 7.3149 (1.3); 7.3088 (1.6); 7.2987 (18.4); 7.2874 (4.3); 7.2812 (2.7); 7.2672 (3.6); 7.2600 (2.8); 7.2509 (4.1); 7.2471 (3.6); 7.2253 (3.7); 7.2202 (3.8); 7.1978 (1.2); 7.1928 (1.3); 5.3383 (0.4); 1.5935 (2.8); 1.3708 (0.4); 1.2919 (2.4); 1.2543 (0.4); 0.9173 (0.4); 0.8981 (0.9); 0.8773 (1.1); 0.1068 (1.2); 0.0479 (0.5); 0.0370 (24.2); 0.0263 (1.2)
9-07: $^1$H-NMR(300.2 MHz, CDCl3):
δ = 7.8274 (16.0); 7.5440 (0.3); 7.4731 (2.2); 7.4652 (0.6); 7.4521 (0.8); 7.4445 (5.0); 7.4222 (1.7); 7.4173 (4.1); 7.3734 (2.1); 7.3673 (4.1); 7.3636 (4.1); 7.3525 (3.4); 7.3451 (8.3); 7.3399 (8.1); 7.2990 (12.4); 7.2359 (2.8); 7.2323 (3.0); 7.2283 (2.8); 7.2247 (2.6); 7.2091 (2.2); 7.2028 (2.7); 7.1976 (2.0); 1.5900 (5.7); 1.2927 (0.5); 0.0485 (0.5); 0.0376 (16.9); 0.0267 (0.7)
9-08: $^1$H-NMR(300.2 MHz, CDCl3):
δ = 7.8019 (5.3); 7.4234 (1.0); 7.3960 (2.2); 7.3687 (1.3); 7.2987 (4.8); 6.9231 (0.8); 6.9207 (0.9); 6.9152 (1.0); 6.9128 (1.0); 6.8956 (1.5); 6.8929 (1.5); 6.8880 (2.0); 6.8854 (1.7); 6.8689 (0.6); 6.8661 (0.7); 6.8615 (1.2); 6.8587 (0.9); 6.8445 (1.6); 6.8370 (2.1); 6.8294 (0.9); 3.8603 (16.0); 1.5917 (2.5); 0.0375 (6.6)
9-09: $^1$H-NMR(300.2 MHz, CDCl3):
δ = 7.8680 (0.3); 7.8574 (16.0); 7.6502 (2.0); 7.6241 (2.3); 7.6015 (1.5); 7.5329 (1.0); 7.5302 (1.0); 7.5086 (2.4); 7.5059 (2.4); 7.4846 (1.8); 7.4819 (1.7); 7.4791 (1.5); 7.4205 (2.2); 7.3927 (3.0); 7.3653 (1.3); 7.2988 (20.2); 7.1180 (2.6); 6.9358 (5.1); 6.7537 (2.6); 1.5905 (3.2); 1.2925 (1.2); 0.8974 (0.6); 0.8773 (0.8); 0.1070 (0.5); 0.0481 (0.6); 0.0373 (28.1); 0.0264 (1.5)

TABLE 17

Compounds according to formula (10)

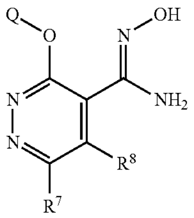

(10)

| Ex No | $R^7$ | $R^8$ | Q | LogP |
|---|---|---|---|---|
| 10-01 | Cl | H | 3-(trifluoromethyl)phenyl | 2.18[a] |
| 10-02 | $CH_3$ | H | 3-(trifluoromethyl)phenyl | 1.69[a] |
| 10-03 | Cl | H | 3-methoxyphenyl | 1.59[a] |
| 10-04 | Cl | H | 3-chlorophenyl | 2.00[a] |
| 10-05 | Cl | H | 3-bromo-2-fluorophenyl | 2.21[a] |
| 10-06 | Cl | H | 3-chloro-2-fluorophenyl | 2.12[a] |
| 10-07 | Cl | H | 3-cyclopropyl-2-fluorophenyl | 2.34[a] |
| 10-08 | Cl | H | 3-cyclopropylphenyl | 2.19[a] |
| 10-09 | Cl | H | 3-(difluoromethyl)-2-fluorophenyl | 1.91[a] |
| 10-01 | Cl | H | 3-(trifluoromethyl)phenyl | 2.18[a] |

TABLE 18

10-01: 1H-NMR(300.2 MHz, d6-DMSO):

δ = 10.2733 (5.4); 8.0186 (5.3); 7.7748 (1.5); 7.7413 (1.1); 7.7155 (1.4); 7.6965 (1.5); 7.6706 (0.6); 7.6530 (1.1); 7.6271 (0.6); 6.1846 (2.2); 3.3428 (16.0); 2.5343 (1.0); 2.5284 (2.0); 2.5223 (2.7); 2.5163 (2.0); 2.5104 (0.9); 1.2674 (0.7); 0.8788 (0.7); 0.0204 (1.5)

10-02: 1H-NMR(499.9 MHz, CDCl3):

δ = 7.7682 (5.0); 7.7215 (0.9); 7.5696 (0.5); 7.5541 (1.5); 7.5386 (1.9); 7.5317 (1.9); 7.5161 (0.6); 7.4900 (1.8); 7.4271 (0.9); 7.4239 (1.2); 7.4203 (0.8); 7.4085 (0.9); 7.2612 (3.8); 5.5062 (1.6); 2.7415 (0.6); 2.6724 (16.0); 2.0465 (1.1); 1.6500 (0.5); 1.2593 (0.6); - 0.0002 (3.9)

10-03: 1H-NMR(300.2 MHz, CDCl3):

δ = 7.9700 (5.3); 7.8904 (0.6); 7.4004 (1.2); 7.3734 (2.3); 7.3460 (1.4); 7.2992 (2.0); 6.8900 (1.1); 6.8826 (1.2); 6.8616 (1.0); 6.8562 (1.1); 6.8382 (1.2); 6.8326 (1.4); 6.8020 (2.6); 6.7936 (2.5); 6.7865 (1.0); 5.6142 (2.0); 5.3362 (1.5); 3.8566 (1.5); 3.8453 (16.0); 1.7378 (0.5); 0.1086 (0.7); 0.0373 (2.5)

10-07: 1H-NMR(300.2 MHz, CDCl3):

δ = 8.3416 (0.4); 7.9757 (16.0); 7.5480 (1.0); 7.4814 (0.3); 7.2990 (10.6); 7.1786 (0.6); 7.1711 (1.0); 7.1641 (0.4); 7.1518 (3.6); 7.1438 (6.0); 7.1384 (7.2); 7.1242 (4.2); 7.1199 (6.7); 7.0926 (1.3); 6.8834 (1.8); 6.8758 (1.8); 6.8602 (2.8); 6.8510 (1.8); 6.8444 (2.0); 6.8294 (1.3); 5.6089 (3.9); 5.3373 (1.6); 2.1656 (0.6); 2.1482 (1.2); 2.1372 (1.3); 2.1200 (2.4); 2.1027 (1.4); 2.0918 (1.3); 2.0743 (0.7); 1.6747 (1.7); 1.5523 (0.5); 1.2925 (1.0); 1.0807 (1.8); 1.0653 (4.5); 1.0585 (5.0); 1.0528 (2.7); 1.0438 (2.7); 1.0367 (4.9); 1.0302 (4.5); 1.0155 (2.2); 0.8718 (0.4); 0.8219 (2.3); 0.8068 (5.4); 0.8007 (5.4); 0.7899 (4.8); 0.7841 (5.8); 0.7677 (1.7); 0.1078 (4.1); 0.0481 (0.4); 0.0371 (12.8); 0.0262 (0.5)

10-08: 1H-NMR(300.2 MHz, d6-DMSO):

δ = 10.2338 (5.4); 7.9672 (5.9); 7.3559 (0.9); 7.3298 (1.8); 7.3038 (1.2); 7.0338 (1.6); 7.0267 (2.7); 7.0066 (1.4); 7.0000 (3.0); 6.9839 (1.8); 6.9778 (2.0); 6.9717 (1.0); 6.1422 (2.4); 4.0838 (1.2); 4.0601 (3.5); 4.0364 (3.6); 4.0127 (1.2); 3.3534 (16.0); 2.5338 (1.6); 2.5279 (3.2); 2.5218 (4.3); 2.5158 (3.1); 2.5099 (1.5); 2.0092 (15.8); 1.9907 (0.6); 1.9792 (0.6); 1.9627 (1.0); 1.9458 (0.6); 1.9348 (0.5); 1.2177 (4.3); 1.1940 (8.6); 1.1703 (4.2); 1.0158 (0.6); 1.0013 (1.7); 0.9938 (1.8); 0.9883 (1.0); 0.9803 (1.1); 0.9733 (1.8); 0.9659 (1.6); 0.9526 (0.7); 0.9040 (0.3); 0.7246 (0.8); 0.7109 (1.9); 0.7039 (1.9); 0.6943 (1.8); 0.6874 (1.9); 0.6724 (0.6); 0.0195 (3.6)

10-09: 1H-NMR(300.2 MHz, CDCl3):

δ = 8.3615 (0.4); 7.9923 (16.0); 7.6200 (2.6); 7.6096 (2.6); 7.5837 (3.0); 7.5607 (2.0); 7.5368 (1.9); 7.5113 (3.2); 7.4869 (2.0); 7.3976 (2.8); 7.3704 (3.8); 7.3432 (1.5); 7.2989 (8.7); 7.1114 (3.0); 6.9290 (6.1); 6.7467 (3.0); 5.5443 (4.3); 5.3371 (2.9); 1.6823 (2.5); 1.2920 (0.5); 0.1076 (0.9); 0.0473 (0.3); 0.0366 (10.8); 0.0258 (0.5)

TABLE 19
Compounds according to formula (12)
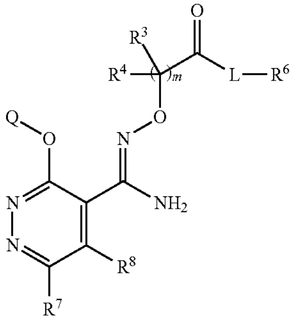
(12)
| Ex No | $R^7$ | $R^8$ | Q | 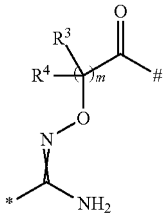 | L—$R^6$ | LogP |
|---|---|---|---|---|---|---|
| 12-01 | $CH_3$ | H | 3-(trifluoro-methyl)phenyl | 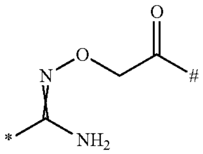 | 4-methoxyphenyl | 3.00[a] |
| 12-02 | $CH_3$ | H | 3-(trifluoro-methyl)phenyl | 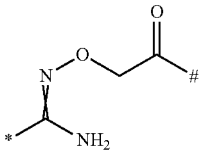 | phenyl | 3.04[a] |
| 12-03 | $CH_3$ | H | 3-(trifluoro-methyl)phenyl | 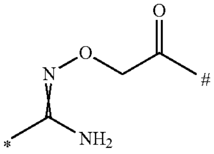 | 4-chlorophenyl | 3.42[a] |
| 12-04 | $CH_3$ | H | 3-(trifluoro-methyl)phenyl | 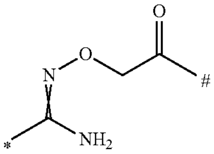 | 3,4-dimethylphenyl | 3.60[a] |
| 12-05 | $CH_3$ | H | 3-(trifluoro-methyl)phenyl | 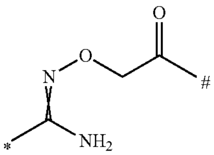 | 1-methyl-1H-indol-3-yl | 3.00[a] |

TABLE 19-continued
Compounds according to formula (12)
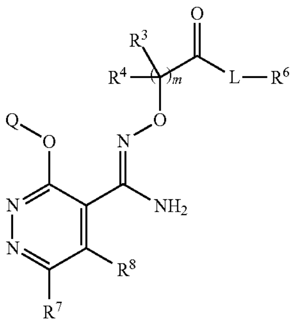
(12)
| Ex No | $R^7$ | $R^8$ | Q | 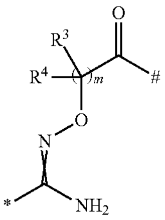 | L—$R^6$ | LogP |
|---|---|---|---|---|---|---|
| 12-06 | $CH_3$ | H | 3-(trifluoro-methyl)phenyl | 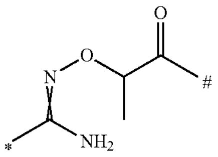 | 4-chlorophenyl | 3.35 & 3.79[a] |
| 12-07 | $CH_3$ | H | 3-(trifluoro-methyl)phenyl | 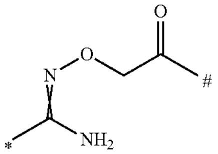 | 2,3-dihydro-1-benzofuran-5-yl | 3.00[a] |
| 12-08 | $CH_3$ | H | 3-(trifluoro-methyl)phenyl | 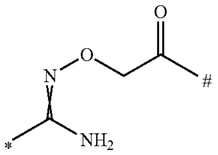 | 2-(4-chloro-2,6-difluorophenyl)ethyl | 3.42 & 4.03[a] |
| 12-09 | $CH_3$ | H | 3-(trifluoro-methyl)phenyl | 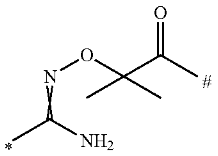 | 2,4-difluorophenyl | 3.88[a] |
| 12-10 | $CH_3$ | H | 3-(trifluoro-methyl)phenyl | 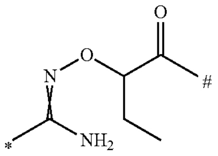 | 2,4-dichlorophenyl | 4.06 & 4.49[a] |

TABLE 19-continued
Compounds according to formula (12)
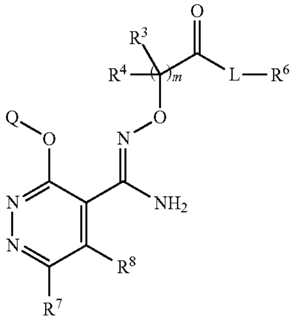
(12)
| Ex No | $R^7$ | $R^8$ | Q | 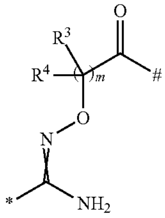 | L—$R^6$ | LogP |
|---|---|---|---|---|---|---|
| 12-11 | $CH_3$ | H | 3-(trifluoro-methyl)phenyl | 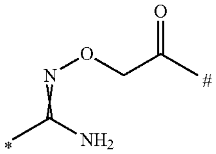 | 2-(4-chlorophenyl)ethyl | 3.19[a] |
| 12-12 | $CH_3$ | H | 3-(trifluoro-methyl)phenyl | 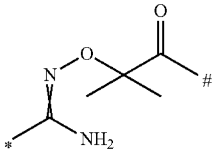 | 3,4-dichlorophenyl | 4.59[a] |
| 12-13 | $CH_3$ | H | 3-(trifluoro-methyl)phenyl | 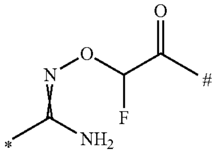 | 4-chlorophenyl | 3.19[a] |
| 12-14 | $CH_3$ | H | 3-(trifluoro-methyl)phenyl | 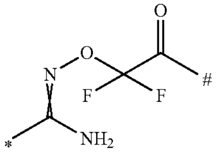 | 4-methoxyphenyl | 3.13[a] |
| 12-15 | $CH_3$ | H | 3-(trifluoro-methyl)phenyl | 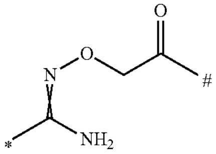 | 2-phenylcyclopropyl | 3.57[a] |

TABLE 19-continued
Compounds according to formula (12)
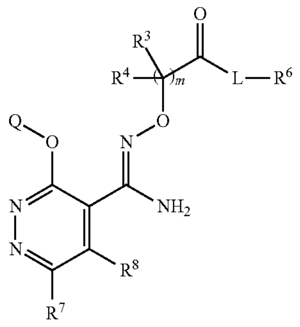
(12)
| Ex No | $R^7$ | $R^8$ | Q | 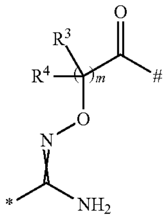 | L—$R^6$ | LogP |
|---|---|---|---|---|---|---|
| 12-16 | $CH_3$ | H | 3-(trifluoro-methyl)phenyl | 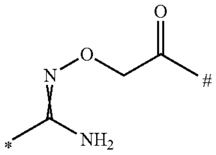 | 2,3-dihydro-1,4-benzo-dioxin-6-yl | 3.07[a] |
In table 19, "#" denotes the point of attachment to the L—$R^6$ group and "*" denotes the point of attachment to the pyridazin-4-yl group.
TABLE 20
12-02: $^1$H-NMR(300.2 MHz, CDCl3):
δ = 8.1719 (0.8); 8.0856 (0.3); 8.0280 (2.6); 8.0044 (3.2); 7.9996 (2.5); 7.9595 (0.4); 7.9386 (0.4); 7.9154 (0.4); 7.8590 (0.5); 7.8431 (0.5); 7.8347 (0.6); 7.8300 (0.5); 7.8114 (5.0); 7.7793 (0.6); 7.7553 (0.6); 7.7513 (0.6); 7.7031 (1.0); 7.6761 (1.3); 7.6591 (0.9); 7.6518 (2.0); 7.6447 (1.1); 7.6316 (1.4); 7.6269 (1.9); 7.6222 (1.7); 7.6095 (1.1); 7.5971 (2.3); 7.5871 (1.4); 7.5711 (4.7); 7.5655 (4.3); 7.5381 (4.1); 7.5203 (2.8); 7.5143 (2.7); 7.4913 (1.3); 7.4823 (1.3); 7.4697 (2.1); 7.4612 (2.2); 7.4542 (1.7); 7.4381 (1.6); 7.4087 (0.5); 7.3699 (0.6); 7.3434 (0.7); 7.3182 (0.5); 7.2987 (25.4); 5.8101 (0.6); 5.7328 (1.7); 5.4210 (10.8); 5.3829 (0.4); 5.3375 (7.1); 3.9859 (0.3); 2.7983 (0.5); 2.7516 (0.8); 2.7265 (1.9); 2.7090 (0.5); 2.6908 (2.5); 2.6728 (16.0); 1.6253 (0.5); 1.2932 (0.8); 0.1083 (0.7); 0.0492 (1.0); 0.0384 (27.6); 0.0277 (1.1)
12-03: $^1$H-NMR(300.2 MHz, CDCl3):
δ = 7.9778 (4.0); 7.9714 (1.4); 7.9552 (1.6); 7.9490 (4.4); 7.9410 (0.7); 7.7872 (5.1); 7.6443 (0.3); 7.6225 (0.6); 7.5959 (1.6); 7.5722 (4.1); 7.5476 (0.8); 7.5251 (6.0); 7.5187 (3.4); 7.5025 (1.8); 7.4964 (4.1); 7.4620 (1.1); 7.4540 (1.7); 7.4467 (1.0); 7.4372 (0.9); 7.4315 (1.2); 7.4142 (0.4); 7.2984 (16.0); 5.7581 (0.3); 5.7160 (1.9); 5.3565 (11.0); 5.3370 (8.4); 2.7744 (0.4); 2.7492 (0.6); 2.7019 (0.7); 2.6727 (16.0); 2.0823 (0.3); 1.6105 (1.4); 1.2963 (0.8); 0.9198 (0.4); 0.0483 (0.8); 0.0377 (16.4); 0.0267 (0.6)
12-04: $^1$H-NMR(300.2 MHz, CDCl3):
δ = 7.8196 (3.4); 7.7834 (1.8); 7.7570 (1.0); 7.7309 (1.0); 7.5940 (1.0); 7.5691 (2.9); 7.5439 (0.5); 7.5239 (1.5); 7.4670 (0.7); 7.4594 (1.0); 7.4526 (0.6); 7.4362 (0.7); 7.2984 (4.8); 7.2663 (1.3); 5.7438 (1.6); 5.3956 (6.8); 4.1939 (0.4); 4.1701 (1.1); 4.1464 (1.1); 4.1227 (0.4); 2.6685 (10.4); 2.3923 (0.5); 2.3680 (16.0); 2.3455 (1.0); 2.2569 (0.4); 2.1591 (0.4); 2.0821 (5.0); 1.6509 (1.4); 1.3196 (1.3); 1.2958 (2.7); 1.2720 (1.2); 0.1075 (1.6); 0.0377 (5.4); 0.0365 (5.8)

TABLE 20-continued 12-05: $^{1}$H-NMR(499.9 MHz, CDCl3):
δ = 8.4050 (1.0); 8.4035 (1.1); 8.3969 (0.7); 8.3915 (1.1); 8.3869 (1.0); 8.0076 (0.5); 7.9742 (0.6); 7.8914 (4.7); 7.7961 (5.1); 7.6517 (0.6); 7.5515 (0.4); 7.5361 (1.4); 7.5211 (2.9); 7.5035 (0.5); 7.4816 (2.0); 7.4719 (0.5); 7.4701 (0.5); 7.4087 (0.8); 7.4047 (1.3); 7.4005 (0.8); 7.3901 (0.9); 7.3862 (0.6); 7.3762 (0.3); 7.3748 (0.3); 7.3693 (0.6); 7.3642 (0.8); 7.3594 (2.0); 7.3561 (3.1); 7.3512 (1.1); 7.3473 (2.4); 7.3431 (2.8); 7.3348 (1.6); 7.3281 (2.1); 7.3231 (1.1); 7.3194 (0.3); 7.3153 (0.6); 7.3105 (0.7); 7.2839 (0.4); 7.2594 (5.6); 7.0776 (0.5); 5.7284 (2.1); 5.1739 (10.2); 3.8656 (0.5); 3.8514 (16.0); 3.7950 (0.6); 3.7721 (1.3); 3.7371 (2.0); 3.3521 (0.7); 3.3351 (0.4); 2.9475 (3.9); 2.8759 (3.4); 2.7301 (0.4); 2.6900 (1.9); 2.6113 (15.7); 2.0415 (1.0); 1.6621 (2.3); 1.2568 (0.5); −0.0002 (5.6)
12-06: $^{1}$H-NMR(300.2 MHz, CDCl3):
δ = 8.1894 (0.4); 8.0615 (1.4); 8.0491 (2.3); 8.0333 (1.8); 8.0201 (4.2); 8.0036 (1.6); 7.9914 (2.2); 7.9779 (0.7); 7.9589 (3.5); 7.9383 (0.8); 7.9286 (1.3); 7.9002 (0.4); 7.6900 (2.5); 7.6454 (0.5); 7.6171 (1.0); 7.5725 (6.2); 7.5444 (5.2); 7.5250 (2.6); 7.5170 (3.3); 7.5083 (3.1); 7.5015 (4.4); 7.4958 (4.3); 7.4888 (3.7); 7.4787 (3.8); 7.4728 (4.0); 7.4561 (1.8); 7.4427 (1.4); 7.4231 (1.9); 7.4157 (2.2); 7.4019 (5.2); 7.3730 (3.4); 7.3324 (0.5); 7.2996 (27.1); 7.2505 (0.6); 7.2261 (0.5); 7.1571 (0.6); 7.0382 (0.4); 6.9101 (0.6); 6.7943 (1.2); 5.6440 (1.2); 5.5646 (0.4); 5.5417 (1.1); 5.5187 (1.2); 5.4961 (0.6); 5.4794 (0.6); 5.4572 (0.6); 5.3381 (0.4); 5.2734 (0.7); 5.2511 (0.8); 5.2286 (0.9); 5.2064 (0.7); 4.2017 (0.4); 4.1934 (0.8); 4.1796 (0.5); 4.1697 (2.1); 4.1460 (2.1); 4.1220 (0.8); 3.8602 (1.1); 3.8392 (1.1); 3.8176 (0.3); 3.7251 (0.4); 3.3231 (0.5); 3.3077 (0.4); 3.2934 (1.2); 3.2839 (1.0); 3.2698 (1.6); 3.2566 (1.7); 3.2439 (1.5); 3.2334 (2.3); 3.2097 (0.5); 3.0283 (0.9); 3.0042 (0.9); 2.8353 (5.0); 2.8015 (5.5); 2.7751 (1.8); 2.7433 (12.9); 2.6817 (0.5); 2.6513 (8.0); 2.6119 (0.9); 2.0822 (9.7); 2.0452 (0.4); 1.9517 (2.8); 1.9297 (2.7); 1.7936 (3.0); 1.7786 (2.8); 1.7716 (3.6); 1.7557 (2.5); 1.7279 (0.4); 1.7025 (0.4); 1.6650 (4.0); 1.6419 (4.2); 1.6157 (16.0); 1.5688 (0.5); 1.5500 (0.3); 1.4934 (1.0); 1.4625 (10.9); 1.4374 (1.0); 1.4142 (0.9); 1.3202 (2.6); 1.2964 (5.3); 1.2850 (1.4); 1.2726 (2.7); 1.2595 (3.6); 1.2352 (5.1); 1.2114 (6.4); 1.1905 (4.3); 1.1138 (0.4); 1.0836 (1.8); 1.0618 (1.7); 0.1071 (1.3); 0.0479 (1.4); 0.0371 (34.0)
12-07: $^{1}$H-NMR(300.2 MHz, CDCl3):
δ = 8.6214 (0.3); 8.1868 (0.4); 7.9076 (1.7); 7.8686 (1.0); 7.8630 (0.9); 7.8407 (1.2); 7.8239 (3.3); 7.6164 (0.8); 7.5932 (1.4); 7.5857 (1.0); 7.5682 (2.5); 7.5432 (0.7); 7.5217 (1.3); 7.4933 (0.4); 7.4658 (0.7); 7.4584 (1.1); 7.4519 (0.7); 7.4347 (0.7); 7.2987 (14.2); 6.8835 (2.1); 6.8556 (2.0); 6.3723 (0.3); 5.7407 (1.2); 5.3717 (0.8); 5.3555 (5.9); 5.3366 (16.0); 5.2948 (0.9); 4.7521 (1.2); 4.7431 (1.8); 4.7232 (2.3); 4.7139 (3.4); 4.6935 (1.6); 4.6846 (2.1); 4.6740 (2.9); 4.6620 (0.5); 3.3341 (1.5); 3.3051 (2.9); 3.2755 (1.9); 3.2617 (0.8); 3.2377 (0.5); 3.2225 (0.4); 2.9866 (0.9); 2.8389 (0.8); 2.8049 (0.9); 2.7902 (0.8); 2.7740 (1.4); 2.7568 (0.3); 2.7423 (0.4); 2.7129 (0.4); 2.6926 (0.6); 2.6691 (9.1); 2.0822 (0.9); 1.6578 (2.5); 1.4680 (1.6); 1.4658 (1.6); 1.2957 (0.6); 1.2635 (0.4); 1.2397 (0.7); 1.2160 (0.3); 0.1062 (5.2); 0.0470 (0.7); 0.0361 (18.0); 0.0254 (0.8)
12-09: $^{1}$H-NMR(499.9 MHz, CDCl3):
δ = 7.6446 (0.3); 7.6283 (0.7); 7.6148 (0.6); 7.6122 (0.6); 7.5986 (0.4); 7.5453 (0.9); 7.5299 (1.9); 7.5126 (0.3); 7.4418 (3.0); 7.4222 (1.3); 7.3556 (0.8); 7.3520 (0.5); 7.3409 (0.6); 7.2607 (4.0); 6.8640 (0.4); 6.8520 (0.6); 6.8474 (0.7); 6.8322 (0.7); 6.8147 (0.5); 6.8118 (0.7); 6.8077 (0.5); 6.7944 (0.4); 6.7897 (0.4); 5.4371 (1.5); 2.6997 (0.4); 2.6145 (9.2); 1.6786 (16.0); 1.5624 (3.6); 1.2548 (0.6); 0.0701 (0.9); −0.0002 (4.5)
12-10: $^{1}$H-NMR(300.2 MHz, CDCl3):
δ = 8.0836 (0.9); 8.0419 (0.5); 8.0131 (0.5); 7.7172 (2.2); 7.6770 (0.4); 7.6492 (0.6); 7.6349 (0.4); 7.6139 (0.8); 7.5921 (0.8); 7.5679 (2.0); 7.5496 (1.3); 7.5439 (1.3); 7.5281 (1.3); 7.5160 (1.1); 7.5005 (2.6); 7.4960 (2.0); 7.4894 (2.3); 7.4816 (2.8); 7.4745 (1.9); 7.4580 (0.9); 7.4506 (1.1); 7.4419 (1.1); 7.4320 (0.9); 7.4246 (0.5); 7.4079 (1.0); 7.3982 (0.9); 7.3918 (1.2); 7.3865 (1.1); 7.3806 (1.1); 7.3637 (1.1); 7.3544 (0.6); 7.3412 (1.1); 7.3347 (1.0); 7.3134 (0.8); 7.3066 (1.0); 7.2988 (18.8); 7.2731 (0.4); 7.1033 (0.4); 5.5598 (1.0); 5.3376 (16.0); 5.2373 (0.5); 5.2216 (0.5); 5.2102 (0.6); 5.1942 (0.5); 5.0645 (0.3); 5.0584 (0.4); 5.0381 (0.4); 3.2934 (0.6); 3.2793 (0.4); 3.2694 (0.6); 3.2559 (0.7); 3.2317 (0.5); 3.0234 (0.7); 2.9993 (0.7); 2.8402 (2.3); 2.8149 (1.2); 2.8063 (2.7); 2.7763 (1.3); 2.7429 (0.4); 2.7265 (2.9); 2.6994 (0.7); 2.6836 (6.8); 2.1479 (0.5); 2.1233 (0.6); 2.1069 (0.4); 2.0995 (0.6); 2.0839 (0.5); 2.0755 (0.6); 2.0595 (0.6); 2.0376 (0.6); 2.0271 (0.4); 2.0134 (0.7); 2.0060 (0.5); 1.9882 (0.6); 1.9822 (0.4); 1.9649 (0.4); 1.6705 (0.3); 1.4633 (4.5); 1.3466 (0.3); 1.3383 (0.4); 1.3043 (0.5); 1.2847 (1.2); 1.2732 (1.2); 1.2606 (1.6); 1.2495 (2.1); 1.2364 (0.9); 1.2254 (1.1); 1.1973 (0.7); 1.1796 (1.1); 1.1616 (2.4); 1.1554 (2.5); 1.1371 (4.8); 1.1271 (1.7); 1.1125 (2.2); 1.1025 (0.8); 1.0399 (0.8); 1.0152 (1.4); 0.9905 (0.7); 0.1066 (3.4); 0.0476 (0.6); 0.0369 (22.3); 0.0261 (1.1)
12-11: $^{1}$H-NMR(400.1 MHz, $d_6$-DMSO):
δ = 7.9907 (3.5); 7.7237 (3.5); 7.7109 (6.1); 7.6847 (2.3); 7.6651 (2.2); 7.6298 (2.7); 7.6089 (3.3); 7.5865 (1.3); 7.2503 (4.3); 7.2299 (5.7); 7.1867 (0.4); 7.1769 (0.4); 7.1065 (5.3); 7.0860 (3.9); 5.9670 (5.1); 3.7999 (2.0); 3.7727 (2.6); 3.6163 (2.8); 3.5884 (2.2); 3.4305 (0.4); 3.3130 (289.4); 2.6897 (2.0); 2.6749 (2.4); 2.6016 (16.0); 2.5009 (57.6); 2.3256 (0.4); 2.0835 (0.4); 1.9868 (0.4); 1.8835 (2.1); 1.8677 (2.0); 1.8512 (1.1); −0.0002 (14.4)
12-15: 1H-NMR(300.2 MHz, CDCl3):
δ = 7.6709 (5.0); 7.6227 (0.3); 7.5970 (1.3); 7.5740 (3.9); 7.5515 (0.4); 7.4943 (1.8); 7.4442 (0.7); 7.4356 (1.3); 7.4283 (0.8); 7.4231 (0.5); 7.4197 (0.5); 7.4137 (0.8); 7.4059 (0.5); 7.2987 (15.0); 7.2780 (0.6); 7.2718 (0.8); 7.2661 (0.4); 7.2495 (2.5); 7.2442 (1.3); 7.2254 (3.0); 7.2162 (1.1); 7.2102 (1.7); 7.2048 (1.1); 7.1965 (0.5); 7.1878 (1.3); 7.1630 (0.4); 7.1237 (2.4); 7.1180 (2.9); 7.0959 (2.1); 5.6457 (2.0); 5.3379 (9.7); 4.8253 (6.6); 4.8221 (6.4); 2.6511 (16.0); 2.6277 (0.6); 2.6190 (0.6); 2.6103 (0.6); 2.6058 (0.7); 2.5978 (0.7); 2.5890 (0.5); 2.5756 (0.6); 2.5478 (0.7); 2.5341 (0.7); 2.5297 (1.0); 2.5209 (0.9); 2.5164 (0.7); 2.5074 (0.8); 2.5029 (0.9); 2.4894 (0.6); 2.0837 (0.7); 1.8899 (0.7); 1.8759 (0.9); 1.8719 (0.8); 1.8594 (1.2); 1.8460 (0.8); 1.8419 (0.8); 1.8281 (0.6); 1.6017 (10.5); 1.5040 (0.7); 1.4902 (0.8); 1.4818 (0.8); 1.4771 (0.9); 1.4680 (0.8); 1.4635 (0.8); 1.4550 (0.8); 1.4413 (0.6); 1.3215 (0.3); 1.2974 (0.7); 0.1074 (4.3); 0.0484 (0.7); 0.0377 (20.6); 0.0283 (0.6); 0.0268 (0.7)

TABLE 20-continued
| |
|---|
| 12-16: $^1$H-NMR(300.2 MHz, CDCl3):<br>δ = 7.9519 (0.5); 7.8240 (3.6); 7.6362 (0.7); 7.6207 (0.9); 7.5962 (1.4); 7.5694 (7.8); 7.5433 (2.0); 7.5361 (1.6); 7.5234 (1.8); 7.4812 (0.4); 7.4670 (0.9); 7.4591 (1.3); 7.4521 (0.8); 7.4361 (1.0); 7.2985 (18.9); 6.9890 (1.6); 6.9629 (1.5); 6.9433 (0.4); 5.7332 (1.8); 5.7051 (1.1); 5.3385 (11.1); 4.3764 (2.2); 4.3634 (3.0); 4.3589 (3.6); 4.3412 (3.6); 4.3352 (2.7); 4.3293 (2.0); 4.3231 (2.2); 4.3147 (2.8); 4.3024 (1.4); 4.1709 (0.4); 4.1472 (0.4); 2.7775 (0.9); 2.7564 (0.4); 2.7461 (0.5); 2.7149 (0.9); 2.7036 (0.5); 2.6725 (12.7); 2.0836 (1.6); 1.6030 (16.0); 1.3208 (0.7); 1.2969 (1.3); 1.2730 (0.4); 0.1064 (2.4); 0.0367 (26.3) |
TABLE 21
Compounds according to formula (13)
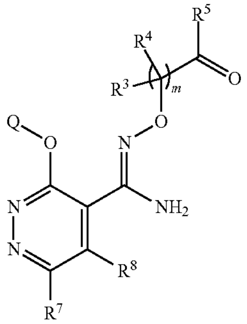
(13)
| Ex No | $R^7$ | $R^8$ | Q | 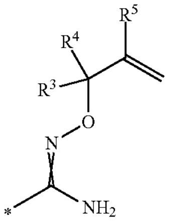 | LogP |
|---|---|---|---|---|---|
| 13-01 | $CH_3$ | H | 3-(trifluoromethyl)phenyl | 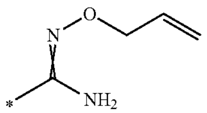 | 2.88[a] |
In table 21, "*" denotes the point of attachment to the pyridazin-4-yl group.
TABLE 22
| |
|---|
| 13-01: $^1$H-NMR(400.2 MHz, $d_6$-DMSO):<br>δ = 8.3350 (1.3); 7.8120 (0.4); 7.7348 (0.4); 7.7165 (0.8); 7.6962 (3.5); 7.6853 (6.8); 7.6760 (1.8); 7.6415 (1.8); 7.6220 (1.0); 7.5837 (1.2); 7.5640 (0.9); 6.4004 (3.2); 6.0510 (0.4); 6.0374 (0.8); 6.0243 (0.7); 6.0111 (1.0); 6.0078 (0.6); 5.9975 (0.5); 5.9941 (1.1); 5.9809 (0.8); 5.9678 (1.0); 5.9542 (0.5); 5.3533 (0.5); 5.3492 (1.5); 5.3445 (1.6); 5.3404 (0.6); 5.3100 (0.5); 5.3058 (1.3); 5.3012 (1.4); 5.2970 (0.6); 5.1856 (0.6); 5.1823 (1.4); 5.1776 (1.4); 5.1743 (0.7); 5.1593 (0.6); 5.1560 (1.3); 5.1513 (1.3); 5.1481 (0.6); 4.4739 (2.0); 4.4703 (3.5); 4.4668 (2.2); 4.4603 (2.2); 4.4567 (3.5); 4.4531 (2.1); 3.3302 (10.7); 2.6206 (3.5); 2.5747 (16.0); 2.5115 (5.5); 2.5071 (11.6); 2.5026 (16.1); 2.4981 (11.8); 2.4937 (5.8); 0.0089 (0.4); 0.0007 (11.1); −0.0076 (0.4) |

TABLE 23
Compounds according to formula (14)
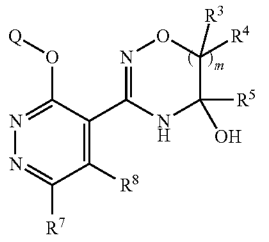
(14)
| Ex No | $R^7$ | $R^8$ | Q | 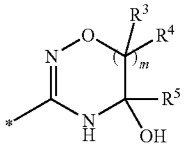 | LogP |
|---|---|---|---|---|---|
| 14-01 | methyl | H | 3-(trifluoromethyl)phenyl | 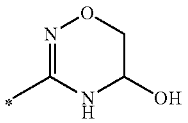 | 1.59[a] |
In table 23, "*" denotes the point of attachment to the pyridazin-4-yl group.
TABLE 24
| |
|---|
| 14-01: $^1$H-NMR(499.9 MHz, $d_6$-DMSO): δ = 8.1864 (2.7); 7.9128 (5.7); 7.9095 (3.8); 7.8930 (1.0); 7.8730 (5.1); 7.8246 (2.8); 7.8095 (1.7); 7.7633 (2.3); 7.7480 (1.8); 6.2754 (2.8); 6.2720 (2.2); 6.2626 (2.8); 5.1829 (2.1); 5.1780 (2.1); 4.2128 (0.8); 4.2093 (0.5); 4.2062 (0.4); 4.1986 (0.8); 4.1954 (0.5); 3.9584 (1.6); 3.9542 (1.7); 3.9361 (2.1); 3.9320 (2.2); 3.7960 (2.1); 3.7921 (2.3); 3.7736 (1.7); 3.7697 (1.8); 3.5161 (0.4); 3.4921 (53.5); 3.4569 (0.3); 2.7970 (0.4); 2.7638 (16.0); 2.7608 (11.2); 2.6771 (15.2); 2.6741 (13.4); 2.1696 (1.2); 2.1644 (3.1); 2.1613 (2.0); 1.3705 (0.3); 1.3652 (0.8); 1.3620 (0.7); 1.3581 (0.7); 1.3563 (0.6); 1.3510 (1.6); 1.3478 (1.1); 1.3446 (0.7); 1.3367 (0.8); 1.3336 (0.6) |
TABLE 25
Compound according to formula (16)
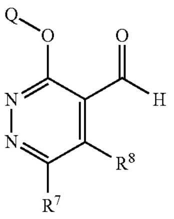
(16)
| Ex No | $R^7$ | $R^8$ | Q | LogP |
|---|---|---|---|---|
| 16-01 | Cl | H | 3-(trifluoromethyl)phenyl | 2.04[a] |
TABLE 26
| |
|---|
| 16-01: $^1$H-NMR(300.2 MHz, CDCl3): δ = 10.5580 (16.0); 7.9322 (15.8); 7.8206 (0.6); 7.7859 (1.8); 7.7263 (2.4); 7.6892 (0.8); 7.6636 (3.5); 7.6416 (11.1); 7.6200 (1.4); 7.5996 (5.4); 7.5701 (2.2); 7.5529 (4.4); 7.5427 (4.8); 7.5360 (3.8); 7.5203 (2.8); 7.4913 (0.4); 7.4602 (1.2); 7.4305 (0.4); 7.4165 (0.6); 7.4013 (0.8); 7.3954 (0.8); 7.3774 (1.1); 7.3040 (22.8); 7.2888 (0.5); 7.2787 (0.3); 6.4615 (0.8); 6.4242 (1.0); 3.7775 (0.6); 3.7541 (0.6); 1.6618 (3.9); 1.5797 (0.3); 1.3863 (0.4); 1.3636 (0.9); 1.3401 (1.2); 1.2976 (7.5); 1.2856 (2.9); 1.2620 (1.5); 0.9215 (1.0); 0.8985 (0.8); 0.8740 (0.5); 0.1126 (4.4); 0.0526 (0.7); 0.0419 (18.2); 0.0310 (0.8) |

TABLE 27
| Compound according to formula (17) | | | | |
|---|---|---|---|---|
| 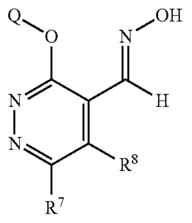 (17) | | | | |
| Ex No | $R^7$ | $R^8$ | Q | LogP |
| 17-01 | Cl | H | 3-(trifluoromethyl)phenyl | 2.88[a] |
TABLE 28
17-01: $^1$H-NMR(300.2 MHz, CDCl3):
δ = 8.5770 (3.1); 8.4318 (16.0); 8.0705 (0.4); 7.9391 (16.0); 7.9021 (2.4); 7.8912 (0.5); 7.8754 (0.7); 7.7791 (0.4); 7.6673 (0.6); 7.6366 (1.1); 7.6109 (4.2); 7.5868 (13.7); 7.5641 (3.1); 7.5324 (7.4); 7.5070 (1.8); 7.4856 (3.2); 7.4783 (5.4); 7.4711 (3.4); 7.4617 (2.6); 7.4557 (3.6); 7.3980 (0.5); 7.3719 (0.5); 7.2982 (33.3); 7.2317 (0.5); 7.2023 (0.4); 7.1131 (0.5); 7.0160 (0.5); 6.1094 (0.5); 5.4728 (0.4); 3.8536 (0.5); 3.8439 (1.4); 3.6757 (1.7); 3.5771 (0.3); 3.5687 (0.5); 3.5030 (1.6); 3.4970 (1.8); 3.4515 (2.1); 3.4123 (3.1); 3.3468 (0.4); 3.3327 (1.0); 3.0167 (2.4); 2.9451 (2.1); 2.8681 (0.4); 2.8019 (2.5); 2.7821 (0.4); 2.7550 (1.3); 2.6951 (0.5); 2.6692 (1.5); 2.4815 (0.3); 2.4560 (0.9); 2.4305 (1.0); 2.4048 (0.4); 2.3068 (1.1); 2.2814 (2.6); 2.2696 (0.6); 2.2564 (2.7); 2.2443 (0.7); 2.2316 (1.0); 2.1491 (6.0); 2.0501 (2.4); 1.9364 (11.8); 1.9237 (1.4); 1.9168 (4.1); 1.4698 (4.0); 1.3681 (0.6); 1.3445 (1.1); 1.3210 (0.8); 1.2929 (1.4); 1.2259 (0.4); 1.2004 (0.5); 1.1633 (3.5); 1.1562 (1.4); 1.1482 (0.9); 1.1384 (7.0); 1.1307 (2.7); 1.1233 (1.5); 1.1133 (3.3); 1.1051 (1.4); 1.0983 (0.8); 0.9168 (0.3); 0.1078 (11.8); 0.0956 (0.5); 0.0481 (1.0); 0.0373 (36.4); 0.0264 (1.6)
TABLE 31
| Compounds according to formula (19) | | | | |
|---|---|---|---|---|
| 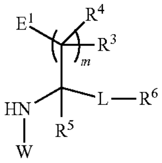 (19) | | | | |
| Ex No | 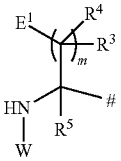 | L—$R^6$ | LogP | Salt |
| 19-01 | 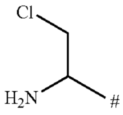 | (2,4-dimethylphenyl)methyl | 1.13[a] | HCl |
| 19-02 | 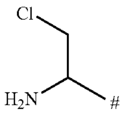 | [4-(trifluoromethyl)phenyl]methyl | 1.27[a] | HCl |

TABLE 31-continued

Compounds according to formula (19)

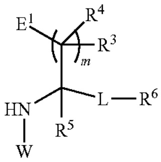

(19)

| Ex No | 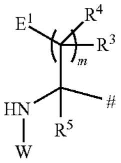 | L—$R^6$ | LogP | Salt |
|---|---|---|---|---|
| 19-03 | 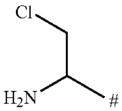 | [4-(difluoromethoxy)phenyl]methyl | 3.40[a] | HCl |
| 19-04 | 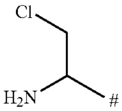 | [4-(trifluoromethoxy)phenyl]methyl | 1.38[a] | HCl |
| 19-05 | 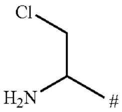 | (2,4-dimethylphenyl)methyl | 1.16[a] | HCl |
| 19-06 | 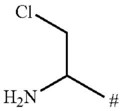 | (2,4-dimethylphenyl)methyl | 1.28[a] | HCl |
| 19-07 | 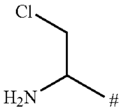 | [(2,4-dimethylphenyl)thio]methyl | 1.42[a] | HCl |
| 19-08 | 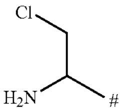 | [4-(difluoromethyl)phenyl]methyl | 0.83[a] | HCl |
| 19-09 | 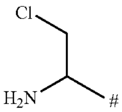 | (2-bromo-4-methylphenyl)methyl | 1.23[a] | HCl |
| 19-10 | 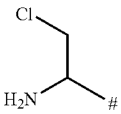 | [2-chloro-4-(trifluoromethyl)phenyl]methyl | 1.43[a] | HCl |
| 19-11 | 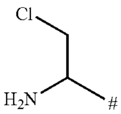 | (2-chloro-4-methylphenyl)methyl | 1.09[a] | HCl |

TABLE 31-continued

Compounds according to formula (19)

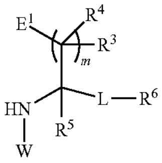

(19)

| Ex No | 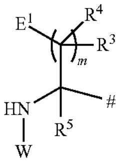 | L—$R^6$ | LogP | Salt |
|---|---|---|---|---|
| 19-12 | 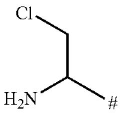 | (3,4-dichlorophenyl)methyl | 1.34[a] | HCl |
| 19-13 | 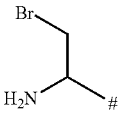 | (1-methyl-1H-indol-3-yl)methyl | 1.23[a] | TFA |
| 19-14 | 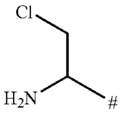 | (4-nitrophenyl)methyl | 0.63[a] | HCl |
| 19-15 | 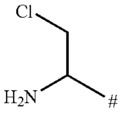 | (4-methylsulfanylphenyl)methyl | 1.14[a] | HCl |
| 19-16 | 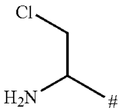 | (2-chloro-4-methoxyphenyl)methyl | 1.09[a] | HCl |
| 19-17 | 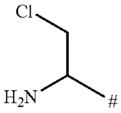 | [2-chloro-4-(difluoromethyl)phenyl]methyl | 1.18[a] | HCl |
| 19-18 | 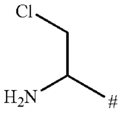 | [2-chloro-4-(difluoromethoxy)phenyl]methyl | 1.30[a] | HCl |
| 19-19 | 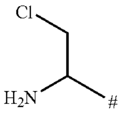 | [2-chloro-4-(trifluoromethoxy)phenyl]methyl | 1.55[a] | HCl |
| 19-20 | 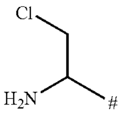 | (3-bromo-5-methylphenyl)methyl | 1.51[a] | HCl |

TABLE 31-continued
Compounds according to formula (19)
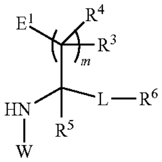
(19)
| Ex No | 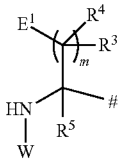 W | L—$R^6$ | LogP | Salt |
|---|---|---|---|---|
| 19-21 | 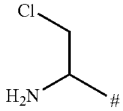 | (2-bromo-4-methylphenyl)methyl | 1.27[a] | HCl |
| 19-22 | 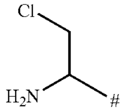 | (2-cyclopropyl-4-methylphenyl)methyl | 1.48[a] | HCl |
In table 31, "#" denotes the point of attachment to the L—$R^6$ group.
TABLE 32
19-01: $^1$H-NMR(300.2 MHz, CDCl3):
δ = 7.6438 (0.5); 7.3661 (0.6); 7.3167 (0.5); 7.2990 (107.3); 7.2639 (0.4); 7.2354 (0.5); 7.1375 (1.2); 7.1101 (1.9); 7.0359 (2.6); 7.0282 (2.3); 7.0171 (1.6); 6.9904 (1.0); 6.9484 (0.8); 4.5372 (0.5); 4.5099 (0.4); 4.2226 (0.4); 4.2061 (0.5); 4.0962 (0.4); 3.8770 (0.7); 3.8498 (0.8); 3.8306 (0.6); 3.8113 (0.5); 3.7436 (16.0); 3.7105 (1.5); 3.6820 (1.5); 3.2699 (0.5); 3.2302 (0.7); 3.1379 (0.5); 3.1032 (0.6); 3.0910 (0.7); 3.0610 (0.4); 2.9134 (0.4); 2.8926 (0.7); 2.8630 (0.4); 2.3783 (9.4); 2.3379 (3.1); 2.3211 (13.5); 2.0640 (0.3); 1.7885 (0.7); 1.7676 (0.8); 1.7013 (2.1); 1.6039 (3.8); 1.3928 (1.2); 1.3716 (2.1); 1.3493 (1.3); 1.3233 (0.6); 1.2923 (1.1); 1.2598 (2.2); 1.2395 (1.4); 0.2335 (0.6); 0.1071 (9.8); 0.0771 (0.4); 0.0551 (0.5); 0.0487 (3.2); 0.0380 (131.2); 0.0275 (5.8); −0.0108 (0.4); −0.0221 (0.5); −0.0306 (0.5); −0.1608 (0.5)
19-02: $^1$H-NMR(300.2 MHz, $d_6$-DMSO):
δ = 8.3651 (10.2); 7.7615 (11.8); 7.7346 (15.2); 7.6880 (0.5); 7.6309 (0.3); 7.5701 (14.4); 7.5433 (11.2); 7.4918 (0.4); 3.9314 (3.6); 3.9201 (4.8); 3.8822 (7.9); 3.8626 (3.6); 3.8481 (3.5); 3.8425 (3.2); 3.8288 (2.2); 3.8158 (1.3); 3.7302 (0.5); 3.7034 (4.7); 3.6892 (5.3); 3.6641 (4.6); 3.6508 (3.1); 3.5861 (1.0); 3.3564 (16.0); 3.1792 (2.1); 3.1588 (2.2); 3.1330 (4.3); 3.1133 (4.1); 3.0771 (5.0); 3.0508 (4.8); 3.0312 (2.1); 3.0052 (1.9); 2.5337 (7.6); 2.5279 (14.8); 2.5219 (19.4); 2.5160 (14.2); 2.5102 (7.0); 1.2534 (0.4); 0.0278 (0.8); 0.0173 (15.6); 0.0063 (0.8)
19-03: $^1$H-NMR(300.2 MHz, $d_6$-DMSO):
δ = 8.3448 (1.4); 7.5005 (1.1); 7.3804 (2.3); 7.3521 (3.0); 7.2536 (2.4); 7.2001 (3.1); 7.1720 (2.3); 7.1498 (0.3); 7.0067 (1.2); 3.9042 (0.6); 3.8943 (0.8); 3.8644 (0.8); 3.8543 (0.9); 3.7826 (0.6); 3.7708 (0.6); 3.6638 (0.9); 3.6490 (0.8); 3.6240 (0.8); 3.6093 (0.8); 3.5861 (16.0); 3.3614 (2.8); 3.0797 (0.5); 3.0610 (0.4); 3.0340 (0.8); 3.0149 (0.8); 2.9573 (0.8); 2.9295 (0.8); 2.9114 (0.5); 2.8834 (0.4); 2.5279 (2.7); 2.5221 (3.4); 2.5163 (2.6); 0.0177 (1.7)
19-04: $^1$H-NMR(300.2 MHz, $d_6$-DMSO):
δ = 8.1127 (3.4); 7.4631 (7.7); 7.4341 (16.0); 7.3819 (11.7); 7.3550 (6.2); 3.9068 (2.5); 3.8956 (3.1); 3.8675 (3.4); 3.8564 (4.2); 3.8119 (0.8); 3.7869 (2.2); 3.7746 (2.4); 3.7522 (1.7); 3.7406 (1.0); 3.7270 (0.4); 3.7142 (0.3); 3.6848 (4.2); 3.6698 (3.4); 3.6453 (3.2); 3.6305 (2.6); 3.5861 (0.6); 3.3562 (3.6); 3.0893 (1.4); 3.0686 (1.5); 3.0431 (3.8); 3.0225 (3.6); 2.9992 (4.1); 2.9730 (3.8); 2.9532 (1.7); 2.9268 (1.5); 2.5338 (5.0); 2.5278 (10.6); 2.5218 (14.5); 2.5157 (10.6); 2.5099 (5.0); 0.0280 (0.4); 0.0172 (11.6); 0.0062 (0.5)
19-05: $^1$H-NMR(300.2 MHz, CDCl3):
δ = 8.9346 (1.8); 7.2989 (17.2); 7.1470 (2.1); 7.1216 (3.0); 7.0363 (3.7); 7.0169 (2.2); 6.9911 (1.5); 3.9223 (0.9); 3.8910 (1.2); 3.8479 (0.4); 3.8296 (0.8); 3.8103 (1.0); 3.7631 (1.9); 3.7436 (7.7); 3.7263 (1.1); 3.7103 (0.7); 3.7050 (0.7); 3.6845 (0.5); 3.4173 (0.7); 3.3824 (0.9); 3.3726 (0.9); 3.1976 (0.7); 3.1618 (0.8); 3.1544 (0.8); 3.1198 (0.5); 2.3904 (14.8); 2.3184 (16.0); 1.7116 (3.4); 1.4012 (0.4); 1.3776 (0.7); 1.3539 (0.4); 0.0489 (0.8); 0.0380 (21.8); 0.0270 (0.8)
19-06: $^1$H-NMR(300.2 MHz, CDCl3):
δ = 8.9132 (1.8); 7.2991 (19.2); 7.1628 (0.4); 7.1461 (2.2); 7.1206 (3.1); 7.0718 (1.1); 7.0458 (2.9); 7.0329 (5.5); 7.0083 (2.9); 6.9838 (1.8); 5.2500 (0.5); 5.2354 (0.5); 5.2238 (0.5); 5.2099 (0.5); 3.9307 (1.2); 3.8997 (1.4); 3.8285 (0.6); 3.8111 (1.0); 3.7951 (1.1); 3.7645 (2.4); 3.7470 (1.6); 3.7325 (1.5); 3.7280 (1.4); 3.7099 (2.4); 3.6956 (1.9); 3.6757 (0.4); 3.6486 (1.7); 3.6250 (1.6); 3.6115 (0.9); 3.5881 (0.8); 3.4217 (0.8); 3.3895 (1.1); 3.3756 (1.0); 3.1983 (0.9); 3.1620 (0.9); 3.1508 (1.6); 3.1290 (0.9); 3.1187 (0.7); 3.1045 (1.1); 3.0833 (1.0); 2.9046 (1.1); 2.8779 (1.0); 2.8587 (0.7); 2.8322 (0.7); 2.3885 (15.7); 2.3747 (10.8); 2.3277 (12.3); 2.3178 (16.0); 1.6923 (3.7); 1.6375 (0.4); 1.6139 (0.6); 1.4807 (0.4); 1.4709 (0.4); 1.4213 (0.4); 1.4130 (0.4); 1.2944 (1.2); 0.9418 (0.4); 0.9205 (1.0); 0.8965 (0.4); 0.0488 (0.9); 0.0385 (23.9); 0.0277 (1.0)

TABLE 32-continued 19-07: $^1$H-NMR(300.2 MHz, $d_6$-DMSO):
δ = 8.6579 (0.8); 7.4235 (0.6); 7.3971 (0.7); 7.1170 (0.7); 7.0699 (0.4); 7.0435 (0.3); 4.0532 (1.1); 4.0402 (1.1); 3.5863 (16.0); 3.3664 (2.3); 3.2852 (0.4); 3.2666 (0.3); 3.1844 (0.4); 3.1563 (0.3); 2.5335 (0.4); 2.5279 (0.7); 2.5219 (0.9); 2.5159 (0.7); 2.3484 (3.4); 2.2743 (3.3); 0.0182 (0.5)
19-08: $^1$H-NMR(300.2 MHz, CDCl3):
δ = 8.8682 (0.5); 7.5387 (0.6); 7.5121 (1.0); 7.4409 (1.1); 7.4143 (0.7); 7.2988 (1.6); 6.6564 (0.7); 6.4687 (0.3); 3.9633 (0.3); 3.9282 (0.5); 3.7411 (16.0); 0.1055 (0.4); 0.0356 (2.3)
19-09: $^1$H-NMR(300.2 MHz, CDCl3):
δ = 8.9628 (1.0); 7.4374 (1.8); 7.3198 (1.3); 7.2993 (6.0); 7.2946 (2.1); 7.1333 (1.0); 7.1104 (0.8); 4.0085 (0.4); 3.9705 (0.7); 3.9301 (0.8); 3.9194 (0.6); 3.7796 (0.7); 3.7622 (0.8); 3.7563 (0.5); 3.7548 (0.5); 3.7534 (0.5); 3.7518 (0.5); 3.7427 (16.0); 3.7307 (0.3); 3.7219 (0.5); 3.5169 (0.4); 3.4989 (0.4); 3.4709 (0.6); 3.4532 (0.5); 3.3356 (0.6); 3.3039 (0.6); 3.2899 (0.4); 3.2582 (0.4); 2.3388 (7.4); 1.7299 (1.1); 0.1070 (2.0); 0.0483 (0.3); 0.0375 (8.3)
19-10: $^1$H-NMR(300.2 MHz, CDCl3):
δ = 9.0001 (0.7); 7.7214 (1.0); 7.6215 (0.3); 7.5948 (1.0); 7.5742 (0.8); 7.2987 (3.6); 4.0018 (0.4); 3.9605 (0.5); 3.9499 (0.4); 3.7420 (16.0); 3.7314 (0.5); 3.7298 (0.5); 3.7285 (0.5); 3.7032 (0.3); 3.5700 (0.4); 3.4327 (0.4); 3.4011 (0.4); 1.7790 (0.4); 0.1060 (0.5); 0.0363 (5.2)
19-11: $^1$H-NMR(300.2 MHz, CDCl3):
δ = 7.3110 (3.0); 7.2987 (10.0); 7.2853 (3.6); 7.2445 (3.7); 7.0862 (2.0); 7.0833 (2.0); 7.0605 (1.7); 3.9922 (0.7); 3.9792 (1.0); 3.9628 (1.0); 3.9489 (2.1); 3.9398 (1.6); 3.9083 (1.9); 3.8973 (1.3); 3.7592 (1.4); 3.7416 (11.2); 3.7191 (1.2); 3.7016 (0.9); 3.4903 (0.7); 3.4720 (0.8); 3.4444 (1.4); 3.4266 (1.2); 3.3066 (1.2); 3.2747 (1.2); 3.2603 (1.0); 3.2297 (0.8); 2.3404 (16.0); 0.1069 (3.3); 0.0479 (0.6); 0.0372 (13.0); 0.0262 (0.4)
19-12: $^1$H-NMR(300.2 MHz, $d_6$-DMSO):
δ = 8.5130 (0.6); 7.6534 (0.8); 7.6379 (0.9); 7.6311 (1.1); 7.6263 (1.1); 7.3496 (0.5); 7.3431 (0.4); 7.3221 (0.4); 7.3155 (0.4); 3.9050 (0.4); 3.7472 (0.4); 3.7322 (0.3); 3.5870 (16.0); 3.3605 (5.8); 3.0564 (0.4); 3.0350 (0.3); 3.0075 (0.4); 2.9826 (0.4); 2.5287 (1.0); 2.5228 (1.4); 2.5169 (1.0); 0.0181 (0.4)
19-14: $^1$H-NMR(400.1 MHz, $d_6$-DMSO):
δ = 8.4809 (9.4); 8.2759 (0.4); 8.2398 (14.0); 8.2189 (16.0); 8.1999 (2.1); 8.1799 (0.4); 8.1574 (0.4); 8.0897 (0.9); 7.6671 (0.4); 7.6147 (14.1); 7.5938 (14.2); 7.5753 (1.9); 3.9090 (7.4); 3.8842 (8.2); 3.7360 (0.4); 3.6985 (3.5); 3.6855 (4.6); 3.6661 (4.0); 3.6537 (2.5); 3.6069 (0.5); 3.5675 (2.6); 3.5449 (1.8); 3.4262 (1587.9); 3.2834 (0.9); 3.2378 (0.6); 3.1997 (2.4); 3.1844 (2.5); 3.1651 (4.6); 3.1501 (4.4); 3.1134 (4.6); 3.0943 (4.5); 3.0793 (2.5); 3.0597 (2.2); 3.0314 (1.1); 3.0196 (1.3); 3.0028 (0.8); 2.5083 (24.0)
19-15: $^1$H-NMR(400.1 MHz, $d_6$-DMSO):
δ = 8.3662 (3.7); 7.9724 (1.6); 7.2680 (2.1); 7.2613 (1.7); 7.2463 (16.0); 7.2415 (14.2); 7.2250 (10.7); 7.2009 (0.6); 5.3558 (0.3); 3.8614 (1.5); 3.8536 (1.8); 3.8311 (1.9); 3.8235 (2.2); 3.7599 (1.2); 3.7139 (0.5); 3.7010 (0.7); 3.6805 (0.7); 3.6669 (0.6); 3.6512 (0.4); 3.6343 (2.3); 3.6231 (2.1); 3.6040 (2.1); 3.5929 (1.9); 3.5686 (3.9); 3.4925 (6.0); 3.4244 (1340.4); 3.3430 (1.6); 3.3241 (0.8); 3.3053 (0.9); 3.2854 (0.9); 3.0030 (1.2); 2.9884 (1.2); 2.9685 (2.0); 2.9538 (1.9); 2.8951 (2.0); 2.8732 (2.3); 2.8601 (1.6); 2.8385 (2.1); 2.8240 (1.1); 2.7994 (1.2); 2.7776 (1.1); 2.7661 (0.6); 2.7437 (0.5); 2.5084 (16.9); 2.4640 (29.0); 2.4587 (17.0); 2.4306 (0.5); 2.4211 (0.4); 1.3543 (0.5)
19-16: $^1$H-NMR(400.1 MHz, $d_6$-DMSO):
δ = 8.4813 (2.3); 7.3558 (2.2); 7.3344 (2.4); 7.0779 (2.6); 7.0715 (2.8); 7.0486 (0.3); 6.9553 (1.6); 6.9489 (1.4); 6.9339 (1.5); 6.9276 (1.3); 3.8732 (0.9); 3.8650 (1.0); 3.8430 (1.2); 3.8349 (1.3); 3.8198 (0.6); 3.8103 (0.3); 3.7882 (1.4); 3.7705 (16.0); 3.7404 (0.8); 3.6795 (1.3); 3.6686 (1.1); 3.6494 (1.0); 3.6384 (0.8); 3.5679 (10.9); 3.5503 (0.4); 3.4269 (400.8); 3.3447 (0.4); 3.0942 (0.4); 3.0790 (0.5); 3.0594 (1.5); 3.0444 (2.7); 3.0234 (1.4); 3.0097 (0.4); 2.9882 (0.4); 2.5123 (3.8); 2.5085 (4.8)
19-17: $^1$H-NMR(300.2 MHz, $d_6$-DMSO):
δ = 8.5982 (2.8); 8.1942 (0.8); 7.7276 (4.0); 7.7096 (1.9); 7.6521 (1.7); 7.6256 (4.4); 7.6125 (2.5); 7.5992 (3.4); 7.5748 (2.3); 7.5531 (0.7); 7.2650 (1.6); 7.2572 (0.9); 7.0800 (3.6); 7.0716 (1.8); 6.8952 (1.8); 6.8868 (0.9); 5.4431 (0.7); 3.9516 (1.1); 3.9400 (1.6); 3.9018 (2.8); 3.8796 (1.4); 3.7671 (1.6); 3.7540 (1.8); 3.7281 (1.5); 3.7159 (0.9); 3.5866 (1.1); 3.5320 (0.6); 3.4608 (0.8); 3.4468 (0.9); 3.4238 (1.0); 3.3584 (16.0); 3.2148 (3.5); 3.1905 (2.7); 3.1428 (0.3); 3.0988 (1.6); 3.0763 (1.3); 2.5279 (9.2); 2.5222 (11.5); 2.5166 (8.7); 2.3155 (0.3); 0.0183 (5.6)
19-18: $^1$H-NMR(300.2 MHz, CDCl3):
δ = 8.9078 (1.1); 7.4704 (1.9); 7.4422 (2.2); 7.2986 (5.6); 7.2480 (2.3); 7.2401 (2.4); 7.0924 (1.2); 7.0846 (1.1); 7.0645 (1.1); 7.0568 (1.0); 6.7833 (1.4); 6.5401 (3.0); 6.2969 (1.5); 4.0135 (0.6); 3.9952 (1.5); 3.9581 (1.1); 3.9480 (0.8); 3.7594 (0.8); 3.7550 (0.7); 3.7534 (0.7); 3.7414 (16.0); 3.7308 (0.4); 3.7293 (0.4); 3.7278 (0.4); 3.7191 (0.8); 3.7028 (0.5); 3.5210 (0.5); 3.5032 (0.5); 3.4748 (0.8); 3.4570 (0.7); 3.3437 (0.7); 3.3123 (0.7); 3.2977 (0.6); 3.2661 (0.4); 1.8785 (0.7); 0.1055 (0.8); 0.0356 (7.0)
19-19: $^1$H-NMR(300.2 MHz, CDCl3):
δ = 7.5131 (0.5); 7.4848 (0.6); 7.3376 (0.6); 7.3329 (0.6); 7.2989 (2.1); 4.0040 (0.4); 3.7415 (16.0); 1.8525 (0.3); 0.0355 (2.6)
19-20: $^1$H-NMR(300.2 MHz, $d_6$-DMSO):
δ = 8.5216 (6.7); 7.3467 (11.2); 7.3411 (9.7); 7.1413 (8.8); 3.9265 (2.8); 3.9155 (3.6); 3.8868 (3.4); 3.8762 (5.2); 3.8237 (2.1); 3.7030 (4.5); 3.6880 (4.0); 3.6634 (3.6); 3.6487 (2.8); 3.5874 (0.6); 3.4075 (16.0); 3.0693 (2.0); 3.0494 (2.0); 3.0233 (3.6); 3.0036 (3.4); 2.9316 (3.9); 2.9044 (3.8); 2.8854 (2.3); 2.8585 (2.0); 2.5349 (4.7); 2.5290 (9.6); 2.5230 (12.9); 2.5169 (9.3); 2.5110 (4.4); 2.3826 (0.3); 2.3165 (40.5); 0.0298 (0.4); 0.0190 (8.5); 0.0080 (0.3)
19-21: $^1$H-NMR(300.2 MHz, $d_6$-DMSO):
δ = 8.6186 (1.2); 7.5130 (1.6); 7.5105 (1.6); 7.3597 (1.2); 7.3338 (1.7); 7.2347 (1.0); 7.2315 (0.9); 7.2088 (0.7); 7.2057 (0.6); 3.9187 (0.5); 3.9074 (0.6); 3.8792 (0.6); 3.8681 (0.9); 3.8089 (0.4); 3.7192 (0.8); 3.7047 (0.7); 3.6797 (0.6); 3.6655 (0.5); 3.5866 (2.4); 3.3809 (16.0); 3.1318 (0.9); 3.1154 (1.3); 3.0882 (0.8); 2.5350 (0.8); 2.5290 (1.6); 2.5230 (2.1); 2.5169 (1.5); 2.5110 (0.7); 2.3116 (6.9); 0.0179 (1.5)
19-22: $^1$H-NMR(300.2 MHz, $d_6$-DMSO):
δ = 8.5284 (3.2); 7.1867 (2.2); 7.1255 (2.7); 7.1000 (3.9); 6.9895 (2.2); 6.9639 (1.6); 6.8054 (3.6); 3.8936 (1.1); 3.8837 (1.4); 3.8539 (1.4); 3.8442 (1.9); 3.8256 (0.5); 3.8117 (0.8); 3.7951 (1.1); 3.7813 (1.0); 3.7683 (0.8); 3.6825 (1.8); 3.6685 (1.5); 3.6427 (1.4); 3.6291 (1.1); 3.3544 (8.5); 3.2607 (0.8); 3.2444 (0.8); 3.2148 (1.4); 3.1981 (1.2); 3.0841 (1.4); 3.0522 (1.4); 3.0382 (1.0); 3.0063 (1.0); 2.5340 (3.1); 2.5281 (6.2); 2.5221 (8.2); 2.5161 (6.0); 2.5103 (2.8); 2.3061 (1.4); 2.2555 (16.0); 2.0957 (0.3); 2.0784 (0.8); 2.0685 (0.9); 2.0611 (0.7); 2.0506 (1.5); 2.0412 (0.8); 2.0329 (0.9); 2.0230 (0.8); 2.0051 (0.4); 0.9907 (0.7); 0.9754 (2.8); 0.9690 (3.2); 0.9591 (1.6); 0.9550 (1.5); 0.9475 (2.8); 0.9412 (3.1); 0.9276 (0.9); 0.6964 (1.0); 0.6829 (3.0); 0.6768 (3.4); 0.6655 (3.4); 0.6600 (2.8); 0.6463 (0.9); 0.0188 (6.3)

TABLE 29

Compounds according to formula (20)

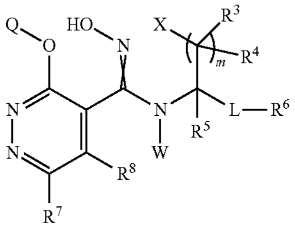

(20)

| Ex No | $R^7$ | $R^8$ | Q | 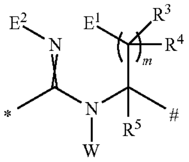 | L—R6 | LogP |
|---|---|---|---|---|---|---|
| 20-01 | Cl | H | 3-(trifluoro-methyl)phenyl | 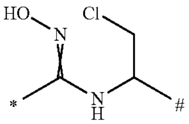 | (2,4-dimethyl-phenyl)methyl | 4.34[a] |
| 20-02 | Cl | H | 3-(trifluoro-methyl)phenyl | 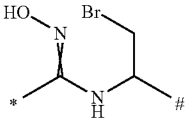 | (2,4-dimethyl-phenyl)methyl | 4.49[a] |
| 20-03 | Cl | H | 3-(trifluoro-methyl)phenyl | 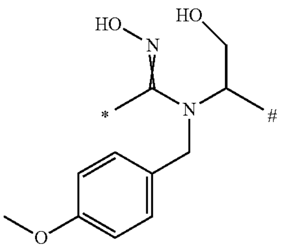 | (4-chlorophenyl)methyl | 4.15[a] |
| 20-04 | $CH_3$ | H | 3-cyclopropyl-2-fluorophenyl | 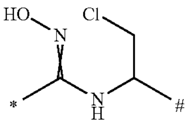 | (2,4-dimethyl-phenyl)methyl | 3.94[a] |
| 20-05 | Cl | H | 3-(trifluoro-methyl)phenyl | 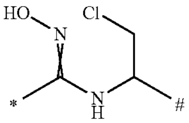 | [4-(trifluoro-methyl)phenyl]methyl | 4.32[a] |
| 20-06 | Cl | H | 3-(trifluoro-methyl)phenyl | 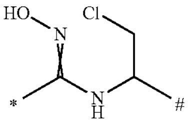 | [4-(difluoro-methoxy)phenyl]methyl | 3.91[a] |
| 20-07 | Cl | H | 3-(trifluoro-methyl)phenyl | 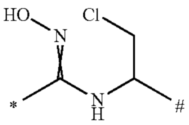 | [4-(trifluoro-methoxy)phenyl]methyl | 4.37[a] |

TABLE 29-continued

Compounds according to formula (20)

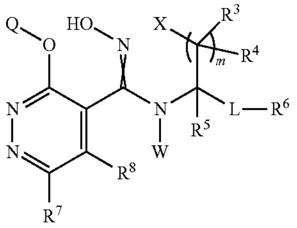

(20)

| Ex No | $R^7$ | $R^8$ | Q | 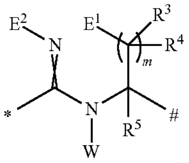 | L—R6 | LogP |
|---|---|---|---|---|---|---|
| 20-08 | Cl | H | 3-(trifluoro-methyl)phenyl | 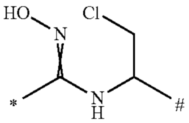 | (2,4-dimethylphenyl)methyl | 2.77[a] |
| 20-09 | $CH_3$ | H | 3-cyclopropyl-2-fluorophenyl | 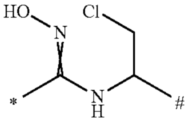 | (2,4-dimethylphenyl)methyl | 3.98[a] |
| 20-10 | $CH_3$ | H | 3-cyclopropyl-2-fluorophenyl | 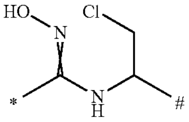 | (2-bromo-4-methyl-phenyl)methyl | 4.12[a] |
| 20-11 | $CH_3$ | H | 3-cyclopropyl-2-fluorophenyl | 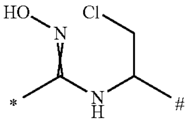 | (3,4-dichloro-phenyl)methyl | 4.15[a] |
| 20-12 | Cl | H | 3-(trifluoro-methyl)phenyl | 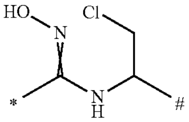 | [4-(difluoro-methyl)phenyl]methyl | 3.87[a] |
| 20-13 | $CH_3$ | H | 3-cyclopropyl-2-fluorophenyl | 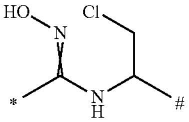 | [2-chloro-4-(trifluoro-methyl)phenyl]methyl | 4.30[a] |
| 20-14 | $CH_3$ | H | 3-cyclopropyl-2-fluorophenyl | 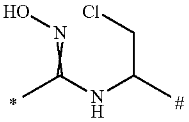 | (2-chloro-4-methyl-phenyl)methyl | 4.05[a] |
| 20-15 | Cl | H | 3-(trifluoro-methyl)phenyl | 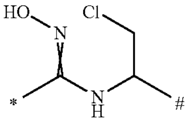 | (4-nitrophenyl)methyl | 3.71[a] |

TABLE 29-continued

Compounds according to formula (20)

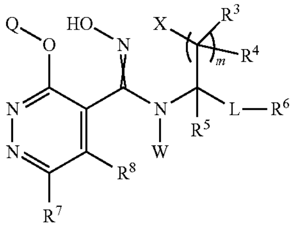

(20)

| Ex No | $R^7$ | $R^8$ | Q | 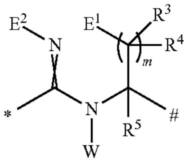 | L—R6 | LogP |
|---|---|---|---|---|---|---|
| 20-16 | Cl | H | 3-(trifluoro-methyl)phenyl | 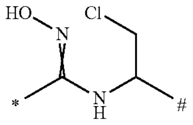 | [4-(trifluoromethyl-thio)phenyl]methyl | 4.67[a] |
| 20-17 | $CH_3$ | H | 3-chloro-2-fluorophenyl | 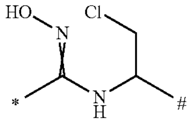 | (2-chloro-4-methyl-phenyl)methyl | 3.88[a] |
| 20-18 | $CH_3$ | H | 3-cyclopropyl-2-fluorophenyl | 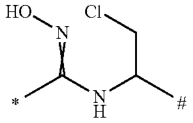 | (2-chloro-4-methoxy-phenyl)methyl | 3.81[a] |
| 20-19 | $CH_3$ | H | 3-(difluoro-methyl)phenyl | 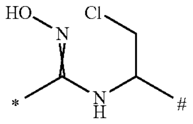 | (2-chloro-4-methyl-phenyl)methyl | 3.49[a] |
| 20-20 | $CH_3$ | H | 3-cyclopropyl-2-fluorophenyl | 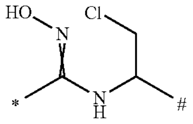 | [2-chloro-4-(difluoro-methyl)phenyl]methyl | 3.86[a] |
| 20-21 | $CH_3$ | H | 3-cyclopropyl-2-fluorophenyl | 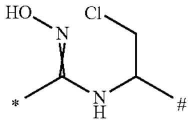 | [2-chloro-4-(difluoro-methoxy)phenyl]methyl | 4.02[a] |
| 20-22 | $CH_3$ | H | 3-cyclopropyl-2-fluorophenyl | 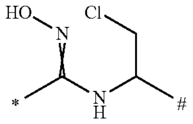 | [2-chloro-4-(trifluoro-methoxy)phenyl]methyl | 4.51[a] |
| 20-23 | $CH_3$ | H | 3-cyclopropyl-2-fluorophenyl | 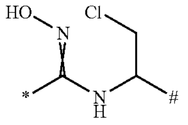 | (2-bromo-4-methyl-phenyl)methyl | 4.12[a] |

TABLE 29-continued

Compounds according to formula (20)

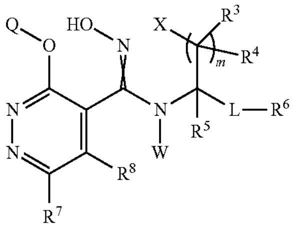

(20)

| Ex No | $R^7$ | $R^8$ | Q | 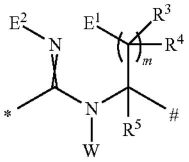 | L—R6 | LogP |
|---|---|---|---|---|---|---|
| 20-24 | $CH_3$ | H | 3-cyclopropyl-2-fluorophenyl | 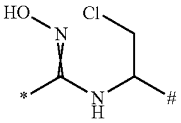 | (3-bromo-5-methyl-phenyl)methyl | 4.32[a] |
| 20-25 | Cl | H | 3-cyclopropyl-phenyl | 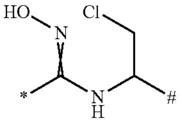 | (2,4-dimethylphenyl)methyl | 4.51[a] |
| 20-26 | Cl | H | 3-cyclopropyl-2-fluorophenyl | 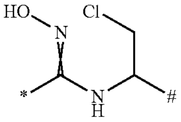 | (2,4-dimethylphenyl)methyl | 4.62[a] |
| 20-27 | Cl | H | 3-(difluoro-methyl)phenyl | 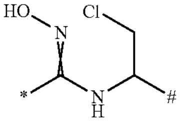 | (2,4-dimethylphenyl)methyl | 4.05[a] |
| 20-28 | Cl | H | 3-bromophenyl | 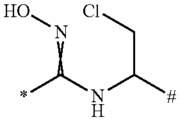 | (2,4-dimethylphenyl)methyl | 4.40[a] |
| 20-29 | Cl | H | 3-chlorophenyl | 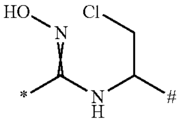 | (2,4-dimethylphenyl)methyl | 4.33[a] |
| 20-30 | $CH_3$ | H | 2-fluoro-3-(trifluoro-methyl)phenyl | 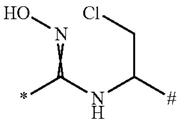 | (2,4-dimethylphenyl)methyl | 4.01[a] |
| 20-31 | Cl | H | 3-(difluoro-methyl)phenyl | 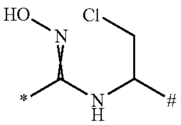 | (2-bromo-4-methyl-phenyl)methyl | 4.15[a] |

TABLE 29-continued

Compounds according to formula (20)

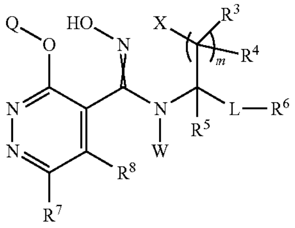

(20)

| Ex No | $R^7$ | $R^8$ | Q | 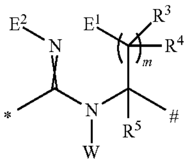 | L—R6 | LogP |
|---|---|---|---|---|---|---|
| 20-32 | Cl | H | 3-cyclopropyl-2-fluorophenyl | 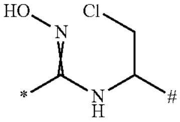 | (4-bromo-2-methyl-phenyl)methyl | 4.74[a] |
| 20-33 | $CH_3$ | H | 3-cyclopropyl-2-fluorophenyl | 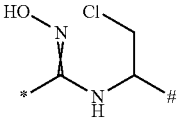 | (4-bromo-2-methyl-phenyl)methyl | 4.19[a] |
| 20-34 | Cl | H | 3-cyclopropyl-phenyl | 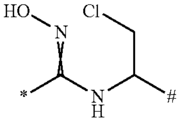 | (2-bromo-4-methyl-phenyl)methyl | 4.62[a] |
| 20-35 | Cl | H | 3-cyclopropyl-2-fluorophenyl | 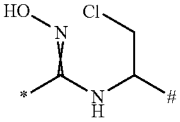 | (2-bromo-4-methyl-phenyl)methyl | 4.74[a] |
| 20-36 | $CH_3$ | H | 3-cyclopropyl-2-fluorophenyl | 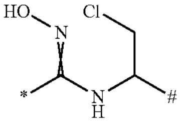 | (2-cyclopropyl-4-methylphenyl)methyl | 4.24[a] |

In table 29, "#" denotes the point of attachment to the L—$R^6$ group and "*" denotes the point of attachment to the pyridazin-4-yl group.

TABLE 30

| |
|---|
| 20-01: $^1$H-NMR(300.2 MHz, CDCl3): |
| δ = 7.6137 (0.6); 7.5864 (2.6); 7.5738 (2.3); 7.5673 (5.6); 7.5651 (5.6); 7.5531 (0.7); 7.5184 (0.3); 7.4835 (0.5); 7.4473 (2.9); 7.4262 (0.4); 7.4022 (0.5); 7.3866 (1.1); 7.3761 (1.5); 7.3690 (1.4); 7.3563 (1.2); 7.3485 (0.8); 7.2992 (8.7); 7.0071 (1.7); 6.9893 (4.8); 6.9670 (0.5); 6.9438 (3.7); 6.9272 (0.6); 6.9165 (1.7); 6.2302 (3.6); 5.6560 (1.5); 5.6183 (1.5); 5.3382 (1.4); 3.8359 (0.5); 3.8223 (0.6); 3.7993 (2.5); 3.7851 (4.4); 3.7660 (2.5); 3.7479 (0.6); 3.7296 (0.7); 3.4491 (0.7); 3.4331 (0.7); 3.4164 (0.5); 3.3963 (0.3); 3.0941 (1.1); 3.0840 (1.1); 3.0481 (1.5); 3.0378 (1.4); 2.9975 (0.4); 2.9271 (0.4); 2.7997 (1.4); 2.7655 (1.3); 2.7537 (1.2); 2.7194 (1.0); 2.4069 (15.5); 2.3735 (0.4); 2.3469 (1.4); 2.3261 (0.4); 2.2946 (0.4); 2.1032 (1.2); 2.0749 (16.0); 1.6890 (0.4); 1.2937 (0.9); 0.1096 (0.7); 0.0393 (8.8); 0.0286 (0.4) |
| 20-03: $^1$H-NMR(499.9 MHz, $d_6$-DMSO): |
| δ = 10.9854 (5.4); 9.5820 (0.5); 8.1369 (0.4); 7.7406 (0.4); 7.7193 (0.5); 7.7035 (0.5); 7.6942 (0.5); 7.6775 (0.4); 7.6611 (0.4); 7.6379 (0.8); 7.6224 (1.7); 7.6065 (3.2); 7.5932 (0.5); 7.5902 (0.6); 7.4155 (0.3); 7.3802 (3.2); 7.3765 (1.6); 7.3633 (5.8); 7.3424 (0.6); 7.3169 (4.3); 7.3000 (2.6); 7.2776 (0.3); 7.2687 (0.4); 7.2648 (0.4); 7.2518 (0.4); 7.2475 (0.4); 7.2395 (0.6); 7.2305 (0.4); 7.2227 (0.6); 7.2175 (0.5); 7.2051 (0.6); 7.1891 (0.5); 7.1743 (1.0); 7.1707 (1.5); 7.1668 (1.1); 7.1560 (1.3); 7.1521 (1.2); 7.1350 (0.5); 7.1024 (2.0); 7.0643 (0.5); 7.0592 (0.4); 7.0444 (2.9); 7.0271 (3.1); 6.9195 (0.3); 6.9021 (0.4); 6.7815 (3.9); 6.7641 (3.5); 6.7542 (0.5); 5.7593 (0.9); 4.9835 (1.0); 4.9737 (1.9); 4.9637 (0.9); 4.4109 (1.0); 4.3790 (1.2); 4.2791 (0.4); 4.2650 (0.7); 4.2509 (0.4); 4.1803 (1.4); 4.1484 (1.1); 4.1040 (0.5); 4.0926 (0.7); 4.0802 (0.5); 3.7895 (0.4); 3.7594 (0.5); 3.7493 (1.0); 3.7413 (0.8); 3.7301 (1.4); 3.7191 (1.9); 3.7147 (1.0); 3.7071 (1.0); 3.7040 (0.9); 3.7009 (0.9); |

TABLE 30-continued 3.6946 (1.3); 3.6777 (0.8); 3.6691 (0.9); 3.6588 (16.0); 3.6286 (1.0); 3.5016 (0.6); 3.4918 (1.0); 3.4815 (0.8); 3.4696 (0.8); 3.4599 (0.5); 3.3220 (43.6); 3.1838 (0.6); 3.1709 (0.7); 3.1569 (0.8); 3.1441 (0.7); 2.9661 (0.8); 2.9497 (0.9); 2.9392 (0.7); 2.9229 (0.6); 2.5141 (3.2); 2.5105 (6.2); 2.5069 (8.2); 2.5033 (5.8); 2.4997 (2.7); 2.4288 (0.6); 2.4122 (0.4); 1.2961 (0.5); 1.2826 (1.0); 1.2710 (1.1); 1.2676 (1.2); 1.2502 (2.9); 0.8769 (1.9); 0.8633 (5.2); 0.8490 (2.2)

20-04: $^{1}$H-NMR(300.2 MHz, CDCl3):
δ = 7.2990 (28.0); 7.0996 (0.5); 7.0732 (1.3); 7.0455 (1.3); 7.0293 (1.0); 7.0225 (1.1); 7.0000 (1.2); 6.9804 (5.0); 6.9776 (5.5); 6.9156 (1.9); 6.8123 (0.6); 6.8062 (0.6); 6.7886 (1.0); 6.7646 (0.5); 6.7586 (0.4); 6.1773 (1.4); 5.8058 (0.8); 5.7684 (0.8); 4.6349 (0.4); 4.5797 (0.5); 4.1723 (0.4); 4.1484 (0.4); 3.9148 (0.3); 3.8991 (0.4); 3.8775 (1.0); 3.8625 (1.2); 3.8413 (1.1); 3.8314 (1.3); 3.8048 (0.4); 3.7956 (0.4); 3.6822 (0.5); 3.6709 (0.4); 3.6615 (0.4); 2.9929 (0.4); 2.9805 (0.5); 2.9467 (1.0); 2.9342 (0.9); 2.8823 (1.0); 2.8491 (0.9); 2.8360 (0.5); 2.8028 (0.4); 2.5246 (0.7); 2.4914 (11.8); 2.3842 (9.2); 2.3623 (0.7); 2.3501 (0.4); 2.1329 (0.5); 2.1218 (0.6); 2.1055 (0.9); 2.0847 (2.2); 2.0468 (3.1); 2.0279 (5.3); 2.0149 (9.4); 1.8953 (16.0); 1.3213 (0.4); 1.2975 (0.9); 1.2736 (0.4); 1.0638 (0.6); 1.0484 (1.5); 1.0416 (1.6); 1.0270 (1.0); 1.0197 (1.6); 1.0132 (1.6); 0.9988 (0.8); 0.8072 (0.7); 0.7921 (1.8); 0.7864 (1.8); 0.7755 (1.6); 0.7695 (1.9); 0.7536 (0.6); 0.0482 (0.7); 0.0372 (35.8); 0.0263 (1.8)

20-06: $^{1}$H-NMR(300.2 MHz, CDCl3):
δ = 7.5997 (1.6); 7.5885 (1.6); 7.5809 (3.7); 7.5659 (0.7); 7.5125 (0.4); 7.4571 (1.8); 7.4101 (0.4); 7.3961 (0.8); 7.3848 (1.1); 7.3775 (1.0); 7.3655 (1.0); 7.3574 (0.6); 7.2984 (16.1); 7.1490 (0.8); 7.1183 (9.4); 7.0957 (0.5); 7.0846 (0.6); 7.0679 (0.6); 6.9863 (0.4); 6.9476 (0.3); 6.8246 (1.2); 6.7247 (1.8); 6.5794 (2.4); 6.3344 (1.2); 5.6259 (1.0); 5.5886 (1.1); 5.3379 (0.6); 4.1953 (1.2); 4.1715 (3.5); 4.1477 (3.6); 4.1240 (1.3); 3.7442 (0.8); 3.7368 (0.4); 3.7140 (1.8); 3.7071 (2.0); 3.6998 (2.0); 3.6899 (1.9); 3.4969 (0.3); 3.4814 (0.4); 3.4660 (0.5); 3.4438 (0.5); 3.4295 (0.4); 3.4130 (0.3); 3.0725 (0.7); 3.0579 (0.7); 3.0268 (1.2); 3.0124 (1.1); 2.8982 (1.1); 2.8687 (1.0); 2.8525 (0.7); 2.8229 (0.6); 2.0845 (16.0); 1.6278 (0.8); 1.3208 (4.3); 1.2970 (8.5); 1.2732 (4.0); 0.1062 (4.5); 0.0472 (0.6); 0.0363 (17.7); 0.0256 (0.7)

20-07: $^{1}$H-NMR(300.2 MHz, CDCl3):
δ = 7.6445 (0.5); 7.6275 (1.0); 7.6012 (7.0); 7.5960 (6.2); 7.5911 (6.1); 7.5834 (15.9); 7.5802 (16.0); 7.5657 (1.7); 7.5159 (0.8); 7.4607 (7.4); 7.4305 (0.4); 7.4137 (1.2); 7.3989 (3.2); 7.3869 (4.6); 7.3801 (4.2); 7.3690 (3.4); 7.3608 (2.3); 7.3210 (0.8); 7.2984 (52.3); 7.2151 (7.2); 7.1918 (17.9); 7.1763 (25.5); 7.1550 (3.0); 7.1466 (5.3); 6.9474 (0.3); 6.7551 (8.7); 5.6253 (4.5); 5.5877 (4.8); 4.1967 (0.8); 4.1729 (2.4); 4.1491 (2.5); 4.1253 (0.9); 3.7456 (0.9); 3.7311 (1.4); 3.7085 (7.9); 3.7012 (8.9); 3.6941 (8.9); 3.6841 (8.8); 3.6643 (1.1); 3.6471 (1.5); 3.6277 (0.4); 3.6172 (0.3); 3.5319 (0.6); 3.5165 (1.3); 3.5014 (1.8); 3.4862 (2.1); 3.4794 (1.8); 3.4709 (2.0); 3.4654 (1.9); 3.4494 (1.8); 3.4338 (1.3); 3.4194 (0.5); 3.0973 (3.1); 3.0821 (3.1); 3.0515 (5.0); 3.0364 (4.6); 2.9236 (4.7); 2.8944 (4.3); 2.8777 (3.1); 2.8487 (2.7); 2.0852 (11.4); 1.6150 (4.0); 1.3218 (3.4); 1.2980 (6.7); 1.2741 (3.0); 0.9180 (0.4); 0.1196 (0.4); 0.1075 (12.3); 0.0954 (0.6); 0.0485 (2.4); 0.0377 (70.0); 0.0267 (2.7)

20-09: $^{1}$H-NMR(300.2 MHz, CDCl3):
δ = 7.2986 (10.3); 7.1030 (0.6); 7.0759 (1.7); 7.0486 (1.8); 7.0364 (1.2); 7.0295 (1.4); 7.0127 (1.2); 7.0071 (1.4); 6.9858 (0.9); 6.9700 (6.6); 6.9464 (0.4); 6.9130 (2.5); 6.8158 (0.8); 6.8092 (0.8); 6.7922 (1.2); 6.7675 (0.7); 6.7621 (0.6); 6.1817 (2.0); 5.7998 (1.1); 5.7626 (1.2); 5.3377 (2.4); 3.9131 (0.5); 3.8984 (0.6); 3.8768 (1.4); 3.8620 (1.6); 3.8395 (1.4); 3.8298 (1.6); 3.8030 (0.6); 3.7933 (0.6); 3.7218 (0.3); 3.6876 (0.6); 3.6755 (0.6); 3.6659 (0.4); 3.6542 (0.4); 2.9858 (0.6); 2.9736 (0.6); 2.9399 (1.3); 2.9278 (1.2); 2.8756 (1.2); 2.8427 (1.1); 2.8298 (0.7); 2.7968 (0.6); 2.4971 (16.0); 2.3837 (11.9); 2.1362 (0.5); 2.1247 (0.6); 2.1079 (1.0); 2.0853 (1.4); 2.0801 (0.7); 2.0622 (0.4); 2.0083 (11.8); 1.3221 (0.5); 1.2983 (1.1); 1.2745 (0.4); 1.0656 (0.8); 1.0504 (1.9); 1.0436 (2.2); 1.0376 (1.2); 1.0290 (1.2); 1.0218 (2.1); 1.0151 (2.0); 1.0008 (1.0); 0.9204 (0.7); 0.8097 (1.0); 0.7949 (2.4); 0.7924 (2.2); 0.7887 (2.4); 0.7778 (2.2); 0.7722 (2.5); 0.7559 (0.8); 0.1081 (2.5); 0.0492 (0.6); 0.0384 (13.8); 0.0275 (0.6)

20-10: $^{1}$H-NMR(300.2 MHz, CDCl3):
δ = 7.2990 (19.4); 7.1801 (1.1); 7.1543 (3.8); 7.1373 (2.2); 7.1106 (0.7); 7.0974 (0.6); 7.0707 (1.7); 7.0437 (2.0); 7.0364 (1.3); 7.0290 (1.4); 7.0129 (1.2); 7.0074 (1.3); 6.9862 (0.6); 6.9804 (0.5); 6.8524 (0.4); 6.8092 (0.9); 6.8021 (0.9); 6.7860 (1.4); 6.7611 (0.7); 6.7552 (0.6); 6.3131 (2.6); 5.8564 (1.0); 5.8193 (1.0); 5.3386 (7.0); 3.9895 (0.3); 3.9667 (0.9); 3.9567 (1.6); 3.9401 (0.8); 3.9283 (1.8); 3.9166 (1.2); 3.8196 (1.4); 3.7922 (1.0); 3.1019 (0.6); 3.0886 (0.6); 3.0567 (1.3); 3.0435 (1.2); 2.9815 (1.0); 2.9497 (1.0); 2.9364 (0.6); 2.9042 (0.5); 2.5377 (16.0); 2.3979 (11.7); 2.1410 (0.5); 2.1298 (0.6); 2.1132 (1.0); 2.0959 (0.6); 2.0848 (0.6); 1.6159 (1.2); 1.2923 (0.4); 1.0623 (0.7); 1.0470 (2.0); 1.0403 (2.2); 1.0257 (1.2); 1.0185 (2.1); 1.0119 (2.0); 0.9975 (0.9); 0.8060 (1.0); 0.7912 (2.4); 0.7852 (2.3); 0.7742 (2.2); 0.7688 (2.4); 0.7524 (0.7); 0.1073 (6.5); 0.0487 (1.1); 0.0379 (24.0); 0.0271 (1.2)

20-11: $^{1}$H-NMR(300.2 MHz, CDCl3):
δ = 7.6035 (0.6); 7.4458 (0.7); 7.4278 (2.0); 7.4208 (3.0); 7.4034 (2.4); 7.3940 (1.0); 7.3789 (3.9); 7.3518 (3.7); 7.2985 (19.8); 7.2200 (2.9); 7.2134 (3.0); 7.1980 (0.5); 7.1689 (0.4); 7.1470 (0.6); 7.1223 (0.9); 7.1149 (1.0); 7.0872 (2.0); 7.0593 (1.7); 7.0348 (1.2); 7.0284 (1.5); 7.0053 (1.8); 6.9919 (1.8); 6.9850 (2.2); 6.9646 (1.5); 6.9578 (1.4); 6.9211 (1.2); 6.8482 (0.4); 6.8340 (0.9); 6.8277 (1.0); 6.8092 (1.4); 6.7858 (0.8); 6.7807 (0.7); 6.6546 (1.5); 5.7742 (0.7); 5.7382 (0.8); 4.6344 (6.3); 3.8233 (0.4); 3.8083 (0.6); 3.7869 (1.1); 3.7710 (1.4); 3.7459 (1.4); 3.7363 (1.9); 3.7073 (1.4); 3.6780 (1.0); 3.6679 (0.7); 3.6548 (0.6); 2.9519 (0.6); 2.9215 (3.6); 2.8996 (2.6); 2.7552 (0.6); 2.5983 (16.0); 2.3497 (0.4); 2.2796 (0.4); 2.1375 (0.7); 2.1268 (0.8); 2.1097 (1.2); 2.0919 (0.8); 2.0815 (0.8); 2.0644 (0.4); 1.7108 (0.8); 1.2937 (0.6); 1.0723 (1.1); 1.0568 (2.4); 1.0500 (2.6); 1.0356 (1.5); 1.0284 (2.4); 1.0219 (2.3); 1.0074 (1.0); 0.8293 (0.4); 0.8158 (1.5); 0.8006 (2.9); 0.7959 (3.0); 0.7842 (2.4); 0.7786 (2.9); 0.7619 (1.0); 0.1073 (2.7); 0.0484 (0.6); 0.0376 (21.7); 0.0268 (1.0)

20-12: $^{1}$H-NMR(300.2 MHz, CDCl3):
δ = 8.3093 (0.9); 7.6816 (0.5); 7.6643 (0.5); 7.5937 (0.8); 7.5847 (0.7); 7.5761 (1.6); 7.5734 (1.6); 7.5379 (0.4); 7.5109 (1.1); 7.4844 (1.4); 7.4514 (1.2); 7.4285 (1.0); 7.4012 (0.7); 7.3938 (0.9); 7.3856 (0.7); 7.3735 (0.9); 7.3669 (0.8); 7.3560 (0.5); 7.3474 (0.4); 7.2987 (4.0); 7.2418 (1.3); 7.2155 (1.0); 6.8947 (0.4); 6.7069 (0.9); 6.6275 (0.4); 6.5592 (0.7); 6.5192 (0.4); 5.6695 (0.4); 5.6321 (0.4); 4.6345 (1.1); 3.7463 (16.0); 3.7371 (0.6); 3.7326 (0.9); 3.7213 (1.1); 3.7045 (1.0); 3.6929 (0.3); 3.1207 (0.5); 3.0897 (0.5); 3.0759 (0.5); 2.9477 (0.4); 2.9172 (0.4); 2.0862 (0.6); 0.1077 (0.6); 0.0372 (5.6)

20-13: $^{1}$H-NMR(300.2 MHz, CDCl3):
δ = 7.5433 (2.7); 7.5349 (1.4); 7.5067 (1.7); 7.4396 (2.2); 7.4132 (1.3); 7.2988 (15.3); 7.1016 (0.7); 7.0780 (1.8); 7.0492 (1.6); 7.0211 (1.1); 7.0150 (1.3); 6.9971 (1.2); 6.9920 (1.4); 6.9706 (0.7); 6.9650 (0.6); 6.8218 (0.8); 6.8162 (0.8); 6.7956 (1.3); 6.7737 (0.7); 6.7685 (0.6); 6.4365 (2.0); 5.8781 (1.1); 5.8413 (1.1); 5.3378 (4.7); 4.0144 (0.3); 3.9961 (0.5); 3.9821 (0.6); 3.9505 (1.2); 3.9138 (1.5); 3.9005 (1.1); 3.8136 (1.2); 3.8050 (1.4); 3.7773 (0.9); 3.7682 (0.7); 3.2292 (0.6); 3.2147 (0.6); 3.1842 (1.2); 3.1698 (1.1); 3.0953 (1.1); 3.0642 (1.0); 3.0504 (0.7); 3.0194 (0.6); 2.5406 (16.0); 2.1338 (0.5); 2.1238 (0.6); 2.1058 (1.0); 2.0845 (0.8); 2.0775 (0.6); 1.6213 (1.5); 1.3047 (0.6); 1.2977 (0.7); 1.0686 (0.7); 1.0534 (1.9); 1.0466 (2.2); 1.0320 (1.2); 1.0248 (2.1); 1.0182 (2.0); 1.0038 (1.0); 0.9199 (0.4); 0.8094 (0.9); 0.7945 (2.3); 0.7919 (2.2); 0.7885 (2.3); 0.7775 (2.2); 0.7719 (2.5); 0.7557 (0.8); 0.1075 (1.9); 0.0488 (0.7); 0.0379 (21.3); 0.0270 (1.0)

20-14: $^{1}$H-NMR(300.2 MHz, CDCl3):
δ = 7.2990 (16.3); 7.1616 (1.7); 7.1361 (3.0); 7.0973 (3.2); 7.0816 (2.0); 7.0698 (2.0); 7.0555 (1.2); 7.0426 (2.0); 7.0336 (1.2); 7.0265 (1.4); 7.0101 (1.2); 7.0046 (1.4); 6.9834 (0.6); 6.9775 (0.6); 6.8100 (0.8); 6.8029 (0.8); 6.7865 (1.3); 6.7621 (0.7); 6.7564 (0.6); 6.3830 (2.4); 5.8550 (0.9); 5.8179 (0.9); 4.1959 (0.4); 4.1722 (1.1); 4.1484 (1.1); 4.1248 (0.4); 3.9303 (1.2);

TABLE 30-continued 3.8988 (1.8); 3.8600 (0.4); 3.7998 (1.4); 3.7727 (1.0); 3.1118 (0.6); 3.0983 (0.6); 3.0662 (1.0); 3.0527 (0.9); 2.9676 (1.0); 2.9376 (0.9); 2.9229 (0.6); 2.8918 (0.5); 2.5405 (16.0); 2.3929 (11.4); 2.3381 (0.4); 2.1375 (0.5); 2.1265 (0.6); 2.1089 (1.0); 2.0841 (5.8); 2.0634 (0.4); 1.6411 (1.0); 1.3213 (1.5); 1.2975 (2.9); 1.2737 (1.3); 1.0598 (0.7); 1.0445 (1.9); 1.0377 (2.0); 1.0232 (1.2); 1.0159 (2.0); 1.0092 (1.9); 0.9951 (1.0); 0.9732 (0.4); 0.8042 (0.9); 0.7892 (2.2); 0.7833 (2.2); 0.7723 (2.1); 0.7665 (2.5); 0.7503 (0.8); 0.1071 (4.8); 0.0486 (0.6); 0.0376 (20.4); 0.0266 (0.9)

20-15: $^1$H-NMR(300.2 MHz, CDCl3):
δ = 8.3004 (1.5); 8.2075 (15.1); 8.1785 (16.0); 8.1419 (0.4); 7.6878 (0.7); 7.6706 (1.0); 7.6446 (0.6); 7.6223 (0.9); 7.5945 (10.8); 7.5771 (15.7); 7.5518 (1.2); 7.5391 (1.4); 7.5241 (0.7); 7.5026 (1.5); 7.4794 (1.8); 7.4290 (10.0); 7.4020 (4.0); 7.3834 (3.1); 7.3699 (4.5); 7.3558 (7.6); 7.3469 (17.9); 7.3327 (3.8); 7.3179 (14.8); 7.2989 (56.2); 7.2734 (0.8); 7.2312 (0.7); 7.1957 (0.5); 7.1205 (0.3); 6.8042 (8.5); 5.6595 (4.5); 5.6224 (4.8); 5.3382 (11.5); 4.6350 (9.2); 4.1727 (0.8); 4.1488 (1.1); 4.1257 (0.8); 4.1040 (1.0); 4.0815 (0.5); 3.8156 (0.3); 3.7756 (0.4); 3.7524 (1.0); 3.7375 (1.3); 3.7150 (8.0); 3.7087 (8.6); 3.7004 (9.3); 3.6916 (9.2); 3.6544 (1.5); 3.6212 (0.8); 3.6068 (1.5); 3.5923 (2.0); 3.5772 (2.3); 3.5635 (2.1); 3.5558 (2.0); 3.5404 (1.8); 3.5250 (1.4); 3.2529 (0.4); 3.2292 (0.4); 3.2232 (0.5); 3.2033 (2.8); 3.1883 (2.8); 3.1577 (4.9); 3.1434 (4.6); 3.1189 (0.4); 3.0493 (4.6); 3.0201 (4.2); 3.0044 (2.9); 2.9751 (2.5); 2.3936 (1.1); 2.0855 (7.2); 2.0729 (0.5); 2.0461 (0.4); 1.9397 (1.4); 1.7942 (0.4); 1.7851 (0.5); 1.6711 (2.1); 1.6480 (2.5); 1.6234 (2.3); 1.5582 (1.1); 1.5049 (0.5); 1.4837 (0.5); 1.4559 (0.5); 1.4337 (0.6); 1.4067 (0.6); 1.3810 (0.5); 1.3449 (0.6); 1.3217 (1.7); 1.2978 (3.0); 1.2834 (1.3); 1.2741 (1.3); 1.2600 (0.5); 1.0113 (0.4); 0.9982 (1.0); 0.9731 (1.7); 0.9587 (0.3); 0.9482 (0.7); 0.9175 (0.4); 0.1192 (0.8); 0.1072 (22.3); 0.0481 (2.1); 0.0373 (71.4); 0.0281 (2.8); 0.0264 (3.2); −0.0286 (0.4)

20-16: $^1$H-NMR(300.2 MHz, CDCl3):
δ = 8.3054 (3.9); 8.0981 (0.6); 8.0728 (0.6); 7.6857 (2.4); 7.6685 (3.0); 7.6494 (11.3); 7.6227 (13.0); 7.6036 (8.0); 7.5940 (6.5); 7.5832 (16.0); 7.5556 (1.8); 7.5073 (1.0); 7.4944 (0.6); 7.4579 (8.1); 7.4222 (2.7); 7.4036 (2.9); 7.3961 (3.5); 7.3840 (5.3); 7.3770 (5.6); 7.3721 (5.4); 7.3452 (2.9); 7.2987 (52.2); 7.2196 (14.2); 7.1925 (12.5); 7.1496 (0.9); 7.1242 (2.0); 7.0409 (0.5); 7.0189 (0.4); 6.9480 (0.5); 6.7538 (0.6); 6.7061 (7.6); 5.6396 (4.2); 5.6023 (4.3); 4.7827 (0.4); 4.7719 (0.5); 4.7602 (0.4); 4.6354 (4.6); 4.1042 (0.4); 4.0277 (0.7); 3.9809 (1.0); 3.8507 (0.6); 3.8367 (0.6); 3.8118 (0.9); 3.7985 (1.0); 3.7579 (0.9); 3.7442 (1.2); 3.7213 (6.8); 3.7123 (8.5); 3.7077 (8.6); 3.6953 (8.2); 3.6760 (1.1); 3.6577 (1.7); 3.6283 (0.4); 3.5633 (0.6); 3.5462 (1.2); 3.5320 (1.7); 3.5169 (2.0); 3.5017 (1.8); 3.4791 (1.6); 3.4635 (1.1); 3.4482 (0.4); 3.2155 (0.4); 3.1934 (0.4); 3.1695 (1.1); 3.1471 (1.4); 3.1329 (2.9); 3.1175 (2.8); 3.0875 (4.3); 3.0728 (4.0); 2.9981 (0.3); 2.9532 (4.0); 2.9237 (3.7); 2.9078 (2.7); 2.8786 (2.4); 2.3501 (1.6); 2.2807 (1.4); 2.0857 (1.9); 1.9222 (1.9); 1.8047 (0.3); 1.6265 (2.7); 1.4311 (0.4); 1.4095 (0.4); 1.3220 (0.6); 1.2954 (1.1); 0.9984 (0.6); 0.9733 (0.8); 0.9182 (0.3); 0.1076 (6.6); 0.0486 (3.1); 0.0378 (70.6); 0.0271 (3.3); −0.0286 (0.5); −0.1601 (0.4)

20-17: $^1$H-NMR(300.2 MHz, CDCl3):
δ = 7.3617 (0.8); 7.3537 (0.9); 7.3399 (0.9); 7.3372 (1.0); 7.3289 (1.2); 7.3254 (1.1); 7.3224 (0.9); 7.3073 (1.1); 7.2990 (7.0); 7.1882 (0.5); 7.1688 (1.8); 7.1599 (3.2); 7.1561 (3.8); 7.1507 (2.1); 7.1417 (1.8); 7.1369 (2.2); 7.1248 (3.1); 7.1079 (0.6); 7.0938 (2.7); 7.0749 (1.9); 7.0493 (0.9); 6.4302 (2.4); 5.8519 (0.9); 5.8159 (0.9); 3.8940 (0.5); 3.8826 (1.3); 3.8720 (0.5); 3.8500 (1.7); 3.8286 (0.5); 3.8192 (0.4); 3.8058 (0.4); 3.7855 (0.9); 3.7770 (1.3); 3.7507 (0.9); 3.1014 (0.6); 3.0874 (0.6); 3.0558 (1.0); 3.0422 (1.0); 2.9513 (1.0); 2.9217 (0.9); 2.9060 (0.6); 2.8765 (0.5); 2.5552 (16.0); 2.5397 (0.7); 2.3867 (11.2); 2.0442 (10.8); 1.6646 (0.5); 0.1074 (0.4); 0.0482 (0.4); 0.0375 (9.2); 0.0265 (0.3)

20-18: $^1$H-NMR(300.2 MHz, CDCl3):
δ = 7.2986 (14.2); 7.1672 (1.8); 7.1400 (2.0); 7.0970 (0.5); 7.0704 (1.5); 7.0439 (1.7); 7.0356 (1.0); 7.0283 (1.2); 7.0120 (1.0); 7.0066 (1.1); 6.9855 (0.5); 6.9793 (0.5); 6.9294 (0.8); 6.8313 (1.5); 6.8232 (4.0); 6.8120 (1.2); 6.8053 (0.8); 6.7934 (1.8); 6.7848 (1.8); 6.7644 (0.6); 6.7589 (0.5); 6.5156 (2.4); 5.8450 (0.8); 5.8086 (0.9); 4.1964 (0.4); 4.1726 (1.3); 4.1488 (1.3); 4.1250 (0.5); 3.9415 (0.6); 3.9292 (1.2); 3.9179 (0.5); 3.8957 (1.5); 3.8738 (0.7); 3.8506 (16.0); 3.8054 (0.8); 3.7970 (1.2); 3.7699 (0.9); 3.0815 (0.5); 3.0674 (0.6); 3.0352 (1.0); 3.0217 (0.9); 2.9422 (0.9); 2.9119 (0.9); 2.8959 (0.5); 2.8665 (0.5); 2.5530 (13.4); 2.1390 (0.4); 2.1274 (0.5); 2.1106 (0.9); 2.0837 (6.4); 1.6128 (3.3); 1.3213 (1.7); 1.2975 (3.5); 1.2737 (1.6); 1.0606 (0.6); 1.0455 (1.7); 1.0386 (1.8); 1.0239 (1.0); 1.0170 (1.8); 1.0104 (1.7); 0.9958 (0.8); 0.8055 (0.8); 0.7906 (2.1); 0.7855 (2.0); 0.7736 (1.8); 0.7684 (2.1); 0.7517 (0.6); 0.1075 (5.2); 0.0488 (0.8); 0.0472 (0.6); 0.0381 (20.2); 0.0304 (0.5); 0.0288 (0.6); 0.0272 (0.7)

20-19: $^1$H-NMR(300.2 MHz, CDCl3):
δ = 7.5404 (0.8); 7.5144 (2.0); 7.4882 (1.5); 7.4589 (0.6); 7.4436 (0.4); 7.4346 (0.5); 7.4288 (0.7); 7.4119 (2.2); 7.3859 (1.4); 7.3656 (0.7); 7.3404 (2.6); 7.3126 (1.8); 7.2990 (7.0); 7.2862 (1.4); 7.1705 (0.5); 7.1454 (2.2); 7.1201 (3.8); 7.0862 (3.4); 7.0725 (2.6); 7.0465 (1.4); 6.9468 (0.8); 6.8599 (1.3); 6.6884 (0.4); 6.6719 (2.7); 6.5230 (2.4); 6.4841 (1.4); 5.8071 (1.1); 5.7721 (1.1); 4.6322 (1.4); 4.1945 (1.0); 4.1707 (2.9); 4.1469 (3.0); 4.1231 (1.0); 3.8049 (0.3); 3.7676 (1.6); 3.7595 (1.0); 3.7412 (2.7); 3.7274 (2.0); 3.7141 (1.8); 3.6986 (1.8); 3.6747 (1.1); 3.1486 (0.9); 3.1342 (1.0); 3.1037 (1.7); 3.0889 (1.2); 2.8982 (0.9); 2.8688 (0.9); 2.8529 (0.8); 2.8236 (0.7); 2.7361 (0.5); 2.5703 (16.0); 2.3711 (13.0); 2.3441 (2.0); 2.3201 (0.5); 2.3105 (0.6); 2.2927 (0.6); 2.2778 (0.5); 2.0831 (13.4); 1.9213 (1.4); 1.6009 (0.6); 1.5761 (1.3); 1.5514 (1.1); 1.5048 (0.6); 1.4819 (0.7); 1.3192 (3.6); 1.2954 (7.2); 1.2715 (3.6); 0.0466 (0.3); 0.0359 (8.3); 0.0250 (0.4)

20-20: $^1$H-NMR(300.2 MHz, CDCl3):
δ = 8.0677 (0.4); 7.6320 (0.4); 7.6238 (0.4); 7.6164 (0.4); 7.6062 (0.6); 7.6003 (0.5); 7.4443 (3.4); 7.4323 (1.9); 7.4217 (1.8); 7.4021 (1.9); 7.3906 (7.2); 7.3560 (0.4); 7.2990 (18.0); 7.2314 (0.4); 7.1992 (0.5); 7.1885 (0.4); 7.1697 (0.5); 7.1616 (0.4); 7.1449 (0.6); 7.1238 (1.0); 7.1035 (0.9); 7.0765 (2.0); 7.0482 (1.8); 7.0252 (1.2); 7.0188 (1.4); 7.0013 (1.3); 6.9961 (1.4); 6.9746 (0.6); 6.9689 (0.6); 6.9324 (0.3); 6.8461 (1.3); 6.8176 (0.9); 6.8117 (0.9); 6.7921 (1.3); 6.7694 (0.7); 6.7645 (0.7); 6.7538 (1.1); 6.6591 (2.6); 6.4720 (1.3); 6.4095 (2.2); 5.8703 (1.2); 5.8331 (1.2); 5.3382 (0.5); 4.6353 (3.0); 4.0264 (0.4); 4.0107 (0.3); 3.9800 (1.0); 3.9541 (1.4); 3.9435 (1.1); 3.9298 (0.7); 3.9175 (1.8); 3.9047 (1.2); 3.8182 (1.1); 3.8102 (1.4); 3.7824 (1.0); 3.7728 (0.7); 3.2082 (0.7); 3.1949 (0.7); 3.1634 (1.2); 3.1494 (1.1); 3.0677 (1.1); 3.0365 (1.0); 3.0234 (0.7); 2.9917 (0.6); 2.7335 (1.1); 2.5440 (16.0); 2.5205 (0.3); 2.3499 (0.8); 2.2802 (0.7); 2.1364 (0.6); 2.1261 (0.7); 2.1083 (1.2); 2.0911 (0.8); 2.0848 (1.2); 2.0627 (0.4); 1.6256 (2.1); 1.3217 (0.4); 1.2979 (0.8); 1.0672 (0.9); 1.0522 (2.2); 1.0454 (2.4); 1.0308 (1.4); 1.0236 (2.2); 1.0170 (2.2); 1.0027 (1.0); 0.8087 (1.1); 0.7938 (2.7); 0.7879 (2.6); 0.7769 (2.5); 0.7712 (2.7); 0.7548 (0.8); 0.1075 (3.9); 0.0486 (0.9); 0.0378 (23.8); 0.0269 (1.0)

20-21: $^1$H-NMR(300.2 MHz, CDCl3):
δ = 8.0778 (0.3); 7.6061 (0.3); 7.4558 (0.5); 7.4468 (0.5); 7.4381 (0.8); 7.4322 (1.0); 7.4220 (1.1); 7.4021 (0.8); 7.3775 (0.5); 7.3209 (0.4); 7.2986 (22.3); 7.2882 (2.8); 7.2602 (2.9); 7.1991 (0.3); 7.1698 (0.5); 7.1466 (0.4); 7.1238 (0.9); 7.0966 (2.4); 7.0883 (3.1); 7.0765 (2.0); 7.0609 (2.0); 7.0510 (2.5); 7.0301 (2.0); 7.0236 (2.2); 7.0059 (1.3); 7.0007 (1.4); 6.9793 (0.7); 6.9737 (0.6); 6.9477 (0.3); 6.9403 (0.6); 6.8172 (0.9); 6.8107 (0.9); 6.8011 (1.8); 6.7932 (1.4); 6.7689 (0.7); 6.7635 (0.7); 6.7536 (0.8); 6.5585 (4.4); 6.5438 (0.4); 6.3155 (1.5); 5.8490 (1.1); 5.8125 (1.2); 5.3381 (0.6); 4.6352 (2.2); 3.9800 (0.5); 3.9368 (1.4); 3.9301 (1.4); 3.9026 (1.8); 3.7900 (1.4); 3.7622 (1.1); 3.7520 (0.6); 3.1428 (0.6); 3.1288 (0.6); 3.0980 (1.3); 3.0837 (1.2); 3.0069 (1.0); 2.9764 (1.0); 2.9611 (0.7); 2.9308 (0.6); 2.7365 (1.0); 2.5711 (16.0); 2.3499 (0.6); 2.2804 (0.5); 2.1524 (0.3); 2.1347 (0.6); 2.1240 (0.7); 2.1070 (1.2); 2.0846 (1.2); 2.0788 (0.7); 2.0627 (0.5); 1.9023 (1.6); 1.6174 (0.7); 1.3214 (0.4); 1.2976 (0.8); 1.0655 (1.0); 1.0503 (2.2); 1.0434 (2.4); 1.0289 (1.3); 1.0217 (2.2); 1.0152 (2.1); 1.0007 (0.9); 0.8076 (1.2); 0.7928 (2.6); 0.7870 (2.5); 0.7761 (2.4); 0.7702 (2.6); 0.7537 (0.8); 0.1069 (0.9); 0.0482 (1.1); 0.0374 (31.8); 0.0265 (1.3)

TABLE 30-continued 20-22: $^{1}$H-NMR(300.2 MHz, CDCl3):
δ = 8.0730 (0.3); 7.6323 (0.4); 7.6060 (0.5); 7.6003 (0.4); 7.4561 (0.7); 7.4476 (0.6); 7.4383 (1.0); 7.4325 (1.5); 7.4221 (1.6); 7.4029 (1.2); 7.3954 (0.4); 7.3847 (0.6); 7.3779 (0.7); 7.3696 (0.6); 7.3551 (0.4); 7.3373 (2.6); 7.3093 (3.7); 7.2990 (26.0); 7.2322 (0.4); 7.1991 (0.6); 7.1800 (2.2); 7.1533 (1.6); 7.1242 (1.8); 7.1072 (0.8); 7.0800 (1.7); 7.0516 (1.7); 7.0323 (1.2); 7.0258 (1.4); 7.0086 (1.2); 7.0031 (1.4); 6.9818 (0.7); 6.9760 (0.6); 6.9445 (0.4); 6.8200 (0.9); 6.8140 (0.9); 6.7943 (1.3); 6.7720 (0.7); 6.7663 (0.7); 6.7538 (1.0); 6.5678 (2.4); 5.8514 (1.1); 5.8149 (1.1); 5.3386 (4.0); 4.6356 (3.5); 4.0265 (0.4); 3.9809 (0.7); 3.9658 (0.5); 3.9421 (1.4); 3.9237 (0.7); 3.9060 (1.9); 3.8929 (1.1); 3.7864 (1.4); 3.7587 (1.0); 3.7505 (0.6); 3.1658 (0.6); 3.1514 (0.6); 3.1210 (1.2); 3.1057 (1.2); 3.0345 (1.1); 3.0054 (1.0); 2.9902 (0.7); 2.9595 (0.6); 2.7373 (1.0); 2.5693 (16.0); 2.3504 (0.8); 2.2804 (0.7); 2.1309 (0.6); 2.1199 (0.6); 2.1029 (1.1); 2.0850 (1.6); 2.0750 (0.7); 2.0575 (0.4); 1.9025 (0.6); 1.6107 (1.7); 1.3219 (0.5); 1.2981 (1.0); 1.2919 (0.8); 1.2743 (0.4); 1.0654 (0.9); 1.0503 (2.0); 1.0434 (2.2); 1.0374 (1.4); 1.0289 (1.3); 1.0215 (2.1); 1.0149 (2.1); 1.0005 (1.0); 0.8073 (1.1); 0.7924 (2.5); 0.7863 (2.5); 0.7754 (2.3); 0.7697 (2.6); 0.7535 (0.8); 0.1074 (5.8); 0.0488 (1.1); 0.0379 (36.1); 0.0271 (1.7)
20-23: $^{1}$H-NMR(300.2 MHz, CDCl3):
δ = 7.7077 (0.4); 7.2989 (5.5); 7.2913 (2.6); 7.1648 (1.0); 7.1391 (4.0); 7.1256 (2.2); 7.1221 (2.1); 7.0964 (1.0); 7.0703 (1.6); 7.0433 (2.7); 7.0336 (1.4); 7.0184 (1.1); 7.0125 (1.3); 6.9917 (0.5); 6.9854 (0.4); 6.8098 (0.7); 6.8021 (0.7); 6.7869 (1.2); 6.7809 (1.0); 6.7621 (0.6); 6.7563 (0.6); 6.3328 (2.6); 5.8637 (0.9); 5.8270 (1.0); 4.1729 (0.8); 4.1491 (0.8); 3.9643 (0.4); 3.9493 (1.2); 3.9428 (1.3); 3.9150 (1.7); 3.9031 (1.0); 3.8084 (1.3); 3.7809 (0.9); 3.7711 (0.4); 3.0956 (0.5); 3.0824 (0.5); 3.0503 (1.1); 3.0368 (1.0); 2.9662 (0.9); 2.9349 (0.9); 2.9207 (0.6); 2.8899 (0.5); 2.5416 (16.0); 2.3912 (11.5); 2.1415 (0.5); 2.1304 (0.5); 2.1133 (1.0); 2.0960 (0.6); 2.0845 (4.1); 1.3449 (0.5); 1.3211 (1.7); 1.3049 (3.0); 1.2974 (4.2); 1.2736 (1.2); 1.0609 (0.7); 1.0458 (1.8); 1.0390 (2.0); 1.0330 (1.1); 1.0245 (1.1); 1.0172 (1.9); 1.0105 (1.9); 0.9963 (0.9); 0.9419 (1.1); 0.9200 (3.6); 0.8968 (1.3); 0.8060 (0.9); 0.7913 (2.2); 0.7884 (2.0); 0.7853 (2.1); 0.7743 (2.0); 0.7688 (2.3); 0.7525 (0.7); 0.0381 (6.8)
20-24: $^{1}$H-NMR(300.2 MHz, d6-DMSO):
δ = 10.3120 (11.4); 9.2399 (0.5); 7.3633 (0.5); 7.3163 (3.6); 7.1855 (1.0); 7.1595 (2.8); 7.1331 (2.6); 7.1130 (4.0); 7.0943 (1.5); 7.0886 (1.7); 7.0649 (2.0); 7.0432 (1.0); 7.0378 (0.9); 6.9400 (5.2); 6.9131 (2.1); 6.8907 (1.2); 6.8858 (1.0); 6.5325 (0.9); 6.3513 (2.4); 6.3147 (2.5); 5.7781 (0.5); 4.0847 (0.4); 4.0610 (1.2); 4.0373 (1.2); 4.0136 (0.4); 3.7837 (0.6); 3.7661 (0.9); 3.7477 (2.0); 3.7293 (2.5); 3.7026 (2.0); 3.6878 (0.7); 3.6664 (0.7); 3.4157 (0.7); 3.3964 (0.8); 3.3807 (0.9); 3.3508 (11.7); 2.9358 (1.0); 2.9238 (1.1); 2.8919 (1.6); 2.8803 (1.4); 2.7623 (1.3); 2.7296 (1.2); 2.7190 (1.0); 2.6861 (0.8); 2.5858 (1.1); 2.5345 (3.0); 2.5284 (6.3); 2.5223 (8.7); 2.5163 (6.4); 2.5102 (3.2); 2.4900 (21.2); 2.2376 (16.0); 2.1048 (0.4); 2.0867 (0.8); 2.0756 (1.0); 2.0591 (1.7); 2.0419 (1.0); 2.0312 (1.0); 2.0094 (5.4); 1.3010 (0.5); 1.2657 (3.1); 1.2184 (1.5); 1.1946 (2.9); 1.1709 (1.4); 1.0763 (0.3); 1.0584 (1.1); 1.0437 (3.0); 1.0364 (3.4); 1.0307 (1.9); 1.0229 (1.9); 1.0155 (3.1); 1.0083 (3.2); 0.9951 (1.3); 0.8996 (0.9); 0.8777 (3.1); 0.8545 (1.1); 0.8121 (1.4); 0.7986 (3.5); 0.7923 (3.8); 0.7819 (3.5); 0.7753 (3.6); 0.7600 (1.1); 0.0196 (7.3)
20-28: $^{1}$H-NMR(400.1 MHz, CDCl3):
δ = 8.2581 (2.5); 8.0622 (0.5); 8.0424 (0.4); 7.5078 (0.7); 7.4881 (0.9); 7.4061 (2.7); 7.4008 (2.2); 7.3901 (3.3); 7.3704 (1.5); 7.3502 (0.8); 7.3052 (4.7); 7.2829 (3.7); 7.2610 (29.0); 7.2015 (1.2); 7.1829 (1.3); 7.1595 (1.0); 7.1321 (0.6); 7.1114 (0.7); 7.0872 (3.2); 7.0678 (1.8); 7.0464 (1.0); 7.0273 (1.2); 6.9970 (0.5); 6.9682 (3.0); 6.9523 (6.8); 6.9070 (3.1); 6.8865 (2.3); 6.8695 (0.7); 6.1766 (2.7); 5.6167 (1.5); 5.5889 (1.6); 5.3009 (0.6); 4.6747 (0.3); 4.6550 (0.4); 4.6453 (0.4); 4.5983 (0.6); 3.9882 (0.8); 3.9432 (1.0); 3.8272 (0.5); 3.8174 (0.5); 3.7989 (1.2); 3.7901 (1.3); 3.7732 (2.2); 3.7639 (2.6); 3.7572 (2.5); 3.7433 (2.2); 3.7302 (0.7); 3.7160 (0.8); 3.7084 (0.9); 3.7020 (0.9); 3.6803 (0.6); 3.6736 (0.6); 3.3927 (1.0); 3.0303 (2.6); 3.0031 (1.8); 2.9950 (1.6); 2.7660 (1.5); 2.7394 (1.5); 2.7317 (1.3); 2.7053 (1.1); 2.4274 (0.4); 2.3712 (16.0); 2.3603 (6.9); 2.3360 (0.8); 2.3124 (2.3); 2.2722 (5.9); 2.2426 (2.0); 2.1901 (0.5); 2.1746 (0.7); 2.1195 (0.4); 2.0894 (0.8); 2.0332 (15.8); 1.9824 (0.6); 1.9601 (0.5); 1.8693 (4.5); 1.7859 (0.5); 1.7227 (0.4); 1.6717 (0.4); 1.6392 (0.5); 1.6015 (0.6); 1.5817 (0.6); 1.5630 (0.6); 1.5438 (0.8); 1.4837 (0.5); 1.4734 (0.5); 1.4219 (0.6); 1.3594 (0.5); 1.2541 (5.6); 1.2253 (1.2); 1.1344 (0.4); 1.1204 (0.4); 1.1039 (0.4); 0.9961 (0.3); 0.9827 (0.3); 0.9624 (0.3); 0.8960 (0.7); 0.8796 (1.2); 0.8583 (1.9); 0.8424 (1.9); -0.0002 (30.0)
20-31: $^{1}$H-NMR(400.1 MHz, CDCl3):
δ = 8.2278 (0.5); 7.5356 (1.2); 7.5161 (2.6); 7.4958 (1.8); 7.4163 (2.6); 7.3973 (2.1); 7.3691 (0.4); 7.3433 (0.5); 7.3209 (3.6); 7.2984 (4.9); 7.2879 (2.8); 7.2612 (21.0); 7.2002 (0.8); 7.1840 (1.0); 7.1690 (0.8); 7.1593 (1.3); 7.1326 (1.4); 7.1098 (8.7); 7.0868 (2.4); 6.7955 (1.4); 6.6549 (3.0); 6.5141 (1.5); 6.3458 (3.2); 5.7365 (1.6); 5.7088 (1.6); 3.9887 (1.3); 3.9431 (1.5); 3.8428 (0.5); 3.8339 (0.6); 3.8020 (1.5); 3.7750 (3.6); 3.7651 (4.4); 3.7556 (2.4); 3.7378 (0.7); 3.7287 (0.6); 3.1223 (1.3); 3.1147 (1.3); 3.0887 (1.7); 3.0805 (1.5); 2.8566 (1.3); 2.8329 (1.3); 2.8229 (1.2); 2.7978 (1.0); 2.3839 (16.0); 2.3119 (2.7); 2.2627 (1.4); 2.2424 (2.6); 1.8833 (0.9); 1.8412 (0.4); 1.8032 (0.4); 1.7564 (0.5); 1.6947 (0.5); 1.6731 (0.5); 1.6402 (0.5); 1.6022 (0.6); 1.5794 (0.6); 1.5430 (0.6); 1.4857 (0.4); 1.4287 (0.4); 1.2536 (2.9); 1.2082 (0.6); 0.8792 (0.5); 0.8575 (1.1); 0.8418 (1.3); −0.0002 (21.1)
20-33: $^{1}$H-NMR(400.1 MHz, CDCl3):
δ = 8.0736 (0.7); 7.5690 (0.3); 7.4113 (0.5); 7.4001 (0.7); 7.3846 (0.6); 7.3664 (0.5); 7.2876 (0.9); 7.2612 (25.2); 7.2394 (2.2); 7.2031 (3.7); 7.1715 (0.8); 7.1591 (1.1); 7.1310 (1.0); 7.1123 (1.2); 7.0859 (2.1); 7.0646 (1.7); 7.0441 (2.6); 7.0232 (1.7); 7.0006 (0.7); 6.9887 (1.1); 6.9775 (1.7); 6.9693 (1.1); 6.9606 (1.9); 6.9422 (1.2); 6.9256 (2.9); 6.9055 (2.4); 6.8699 (0.8); 6.8164 (0.4); 6.7995 (0.5); 6.7790 (1.3); 6.7590 (1.8); 6.7422 (1.2); 6.7160 (0.5); 6.2610 (1.8); 5.7603 (1.5); 5.7326 (1.6); 5.7091 (0.4); 5.3006 (0.9); 4.7249 (0.6); 4.7064 (0.6); 4.5975 (0.9); 3.9885 (1.0); 3.9430 (1.2); 3.8730 (0.6); 3.8613 (0.7); 3.8450 (1.6); 3.8341 (1.7); 3.8082 (1.8); 3.8026 (2.0); 3.7752 (1.2); 3.7554 (0.4); 3.7297 (0.4); 3.6936 (0.6); 3.6763 (1.1); 3.6683 (1.2); 3.6486 (0.9); 3.0374 (0.5); 3.0180 (0.6); 2.9813 (0.3); 2.9305 (0.9); 2.9219 (1.0); 2.8959 (1.7); 2.8874 (1.6); 2.8457 (1.7); 2.8204 (1.7); 2.8112 (1.1); 2.7857 (0.9); 2.7435 (0.4); 2.7114 (1.9); 2.5436 (16.0); 2.5248 (0.7); 2.3936 (1.8); 2.3793 (0.5); 2.3518 (0.4); 2.3320 (0.4); 2.3122 (2.3); 2.2425 (2.1); 2.1918 (0.4); 2.1741 (0.4); 2.1643 (0.4); 2.1419 (0.4); 2.0991 (0.8); 2.0808 (1.4); 2.0669 (1.8); 2.0539 (1.3); 2.0458 (1.3); 2.0321 (0.9); 2.0067 (16.0); 1.8750 (1.5); 1.8197 (0.4); 1.7885 (0.4); 1.7212 (0.4); 1.6471 (0.5); 1.6016 (0.6); 1.5628 (0.6); 1.5412 (0.7); 1.4234 (0.5); 1.3571 (0.6); 1.2536 (6.2); 1.2245 (1.2); 1.1355 (0.4); 1.1226 (0.4); 1.1062 (0.4); 1.0929 (0.4); 1.0542 (0.5); 1.0384 (1.0); 1.0262 (2.0); 1.0144 (3.2); 1.0097 (3.5); 0.9934 (3.0); 0.9889 (2.9); 0.9776 (1.4); 0.9620 (0.6); 0.9405 (0.4); 0.8796 (1.4); 0.8588 (1.9); 0.8424 (1.9); 0.7930 (0.9); 0.7688 (2.0); 0.7570 (4.1); 0.7457 (3.3); 0.7415 (3.4); 0.7292 (1.1); −0.0002 (24.8)
20-34: $^{1}$H-NMR(400.1 MHz, CDCl3):
δ = 8.2040 (1.4); 7.3983 (0.4); 7.3869 (0.4); 7.3744 (0.5); 7.3645 (0.4); 7.3545 (0.8); 7.3350 (1.4); 7.2978 (6.0); 7.2777 (4.2); 7.2611 (26.4); 7.2008 (0.6); 7.1838 (0.8); 7.1692 (0.6); 7.1594 (1.0); 7.1316 (1.6); 7.1047 (6.5); 7.0858 (2.1); 7.0514 (0.6); 7.0332 (0.5); 7.0039 (0.7); 6.9712 (2.6); 6.9518 (2.3); 6.9178 (2.4); 6.9132 (2.3); 6.8928 (1.7); 6.8293 (3.4); 6.3072 (3.5); 5.7293 (1.6); 5.7016 (1.6); 5.3016 (0.5); 3.9889 (0.9); 3.9436 (1.0); 3.8655 (0.6); 3.8557 (0.8); 3.8477 (0.7); 3.8136 (1.6); 3.8041 (1.0); 3.7868 (3.1); 3.7754 (2.7); 3.7619 (2.2); 3.7429 (0.8); 3.7348 (0.6); 3.7140 (0.5); 3.7062 (0.4); 3.6848 (0.3); 3.6782 (0.3); 3.1747 (0.4); 3.1541 (0.4); 3.1391 (0.5); 3.1213 (1.6); 3.1136 (1.3); 3.0870 (1.7); 3.0794 (1.5); 2.8537 (1.2); 2.8289 (1.3); 2.8203 (1.2); 2.7949 (1.0); 2.3886 (16.0); 2.3124 (1.8); 2.2683 (3.3); 2.2429 (1.7); 1.9643 (0.4); 1.9445 (0.5); 1.9327 (0.5); 1.9216 (0.8); 1.9090 (1.1); 1.9002 (1.3); 1.8881 (2.0); 1.8754 (1.6); 1.8673 (1.3); 1.8535 (0.8); 1.8311 (0.4); 1.7960 (0.4); 1.7858 (0.5); 1.7636 (0.6); 1.6399 (1.0); 1.6098 (1.0); 1.6010 (1.1); 1.5459 (0.9); 1.4236 (0.5); 1.2541 (3.2);

TABLE 30-continued
1.0460 (0.4); 1.0297 (0.8); 1.0085 (0.9); 0.9812 (3.1); 0.9767 (3.2); 0.9601 (3.1); 0.9559 (3.0); 0.9191 (0.3); 0.8800 (0.6); 0.8574 (1.2); 0.8423 (1.3); 0.7614 (0.3); 0.7491 (0.9); 0.7330 (0.9); 0.7217 (0.6); 0.6923 (3.2); 0.6869 (3.2); 0.6808 (3.2); 0.6688 (1.2); −0.0002 (27.5)
20-35: $^{1}$H-NMR(400.1 MHz, CDCl3):
δ = 8.2043 (1.0); 7.3992 (0.3); 7.3851 (0.4); 7.3660 (0.3); 7.3364 (0.9); 7.3187 (4.4); 7.2607 (24.7); 7.2018 (0.8); 7.1889 (1.1); 7.1696 (0.9); 7.1590 (1.3); 7.1511 (1.2); 7.1357 (1.6); 7.1304 (1.7); 7.1079 (10.0); 7.0865 (2.2); 7.0714 (1.4); 7.0515 (2.5); 7.0313 (1.8); 6.9963 (0.5); 6.9807 (1.5); 6.9642 (2.2); 6.9461 (1.2); 6.8675 (0.5); 6.8605 (0.4); 6.7970 (1.3); 6.7784 (2.0); 6.7611 (1.1); 6.2293 (3.4); 5.8048 (1.4); 5.7767 (1.4); 5.3005 (0.4); 4.5971 (0.4); 3.9886 (1.1); 3.9425 (1.7); 3.9246 (2.2); 3.9031 (2.9); 3.8951 (1.8); 3.8737 (0.4); 3.8631 (0.4); 3.8336 (2.0); 3.8130 (1.3); 3.7155 (0.3); 3.1812 (0.4); 3.1653 (0.5); 3.1490 (0.4); 3.0603 (1.0); 3.0546 (1.0); 3.0269 (1.8); 3.0194 (1.6); 2.9325 (1.4); 2.9068 (1.3); 2.8975 (1.0); 2.8861 (0.4); 2.8737 (0.9); 2.3926 (16.0); 2.3525 (0.3); 2.3221 (0.8); 2.3122 (2.4); 2.2912 (0.6); 2.2637 (2.8); 2.2425 (2.3); 2.1917 (0.8); 2.1614 (0.5); 2.1413 (0.5); 2.1321 (0.4); 2.1191 (0.8); 2.1042 (1.1); 2.0968 (1.2); 2.0839 (1.8); 2.0716 (1.2); 2.0626 (1.1); 2.0491 (0.7); 1.9982 (0.4); 1.9501 (0.4); 1.9261 (0.4); 1.9106 (0.5); 1.8335 (0.6); 1.7658 (0.8); 1.7482 (0.9); 1.6657 (1.4); 1.6324 (1.6); 1.6016 (1.6); 1.5854 (1.6); 1.5680 (1.6); 1.5437 (1.5); 1.5249 (1.4); 1.4225 (1.1); 1.2536 (12.6); 1.2232 (2.8); 1.2063 (2.2); 1.1688 (1.2); 1.1338 (1.0); 1.0944 (0.9); 1.0750 (1.0); 1.0585 (1.3); 1.0388 (2.0); 1.0277 (3.7); 1.0233 (3.8); 1.0067 (3.7); 1.0023 (3.6); 0.9919 (1.9); 0.9719 (1.2); 0.9513 (1.2); 0.8800 (4.0); 0.8579 (4.2); 0.8430 (3.6); 0.8164 (2.0); 0.8047 (2.1); 0.7915 (1.9); 0.7745 (2.4); 0.7612 (4.3); 0.7505 (4.0); 0.7354 (1.6); −0.0002 (26.6)
20-36: $^{1}$H-NMR(300.2 MHz, CDCl3):
δ = 7.4556 (0.5); 7.4468 (0.7); 7.4381 (0.8); 7.4291 (1.9); 7.4219 (2.8); 7.4025 (2.2); 7.3953 (0.7); 7.3844 (1.1); 7.3777 (1.2); 7.3697 (0.6); 7.3548 (0.6); 7.3077 (0.7); 7.2987 (21.2); 7.2321 (0.4); 7.2216 (0.3); 7.1998 (0.4); 7.1887 (0.4); 7.1641 (0.3); 7.1513 (0.4); 7.1381 (0.5); 7.1245 (1.4); 7.0981 (1.6); 7.0700 (2.3); 7.0455 (2.9); 7.0293 (1.9); 7.0218 (5.4); 7.0058 (3.5); 7.0011 (3.7); 6.9792 (1.3); 6.9739 (1.1); 6.8543 (1.4); 6.8319 (0.4); 6.8150 (1.0); 6.8087 (1.0); 6.7914 (1.5); 6.7671 (0.9); 6.7618 (0.7); 6.7537 (0.6); 6.6909 (0.4); 6.6549 (2.4); 6.1202 (1.9); 5.8019 (1.1); 5.7652 (1.3); 5.3379 (0.8); 4.6354 (6.9); 4.1727 (0.3); 4.1489 (0.4); 3.9811 (0.4); 3.9328 (0.4); 3.9167 (0.5); 3.8963 (1.5); 3.8807 (2.1); 3.8718 (1.8); 3.8619 (2.2); 3.8415 (0.7); 3.8258 (1.1); 3.7843 (0.8); 3.7631 (0.6); 3.7520 (0.6); 3.2837 (0.9); 3.2731 (0.9); 3.2378 (1.2); 3.2278 (1.0); 2.9408 (1.0); 2.9074 (1.1); 2.8952 (0.9); 2.8617 (0.7); 2.7391 (0.9); 2.5206 (0.9); 2.4958 (1.0); 2.4605 (16.0); 2.4064 (0.8); 2.3808 (12.1); 2.3633 (2.2); 2.3502 (0.9); 2.2814 (1.2); 2.1384 (0.4); 2.1212 (0.7); 2.1101 (0.8); 2.0922 (1.3); 2.0851 (2.1); 2.0755 (0.9); 2.0643 (0.7); 2.0472 (0.4); 1.6583 (0.9); 1.6369 (0.8); 1.6126 (0.9); 1.5946 (1.0); 1.5845 (1.0); 1.5669 (1.4); 1.5492 (0.9); 1.5396 (0.8); 1.5220 (0.5); 1.3218 (0.6); 1.2980 (1.2); 1.2742 (0.5); 1.0592 (1.3); 1.0446 (2.5); 1.0376 (2.8); 1.0232 (1.6); 1.0160 (2.5); 1.0094 (2.2); 0.9952 (1.1); 0.8477 (0.4); 0.8303 (0.9); 0.8169 (1.0); 0.8066 (2.0); 0.8003 (1.9); 0.7889 (4.0); 0.7749 (3.4); 0.7707 (3.4); 0.7615 (1.5); 0.7533 (1.4); 0.7463 (1.1); 0.7323 (1.0); 0.7154 (0.7); 0.7070 (0.7); 0.6555 (0.5); 0.6377 (0.9); 0.6236 (1.0); 0.6118 (0.7); 0.6059 (1.0); 0.5945 (0.8); 0.5781 (0.3); 0.1076 (6.1); 0.0487 (1.0); 0.0379 (25.9); 0.0271 (1.0); 0.0126 (0.4); −0.0050 (0.7); −0.0156 (0.9); −0.0330 (0.9); −0.0479 (0.6)
TABLE 33
Compounds according to formula (21)
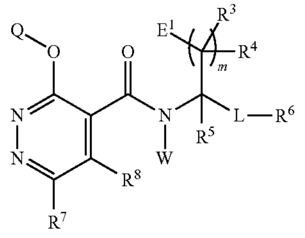
(21)
| Ex No | $R^7$ | $R^8$ | Q | 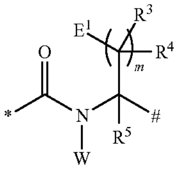 | L—$R^6$ | LogP |
|---|---|---|---|---|---|---|
| 21-01 | Cl | H | 3-(trifluoro-methyl)phenyl | 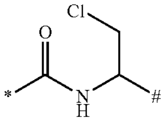 | (2,4-dimethyl-phenyl)methyl | 5.00[a] |
| 21-02 | $CH_3$ | H | 3-cyclopropyl-2-fluorophenyl | 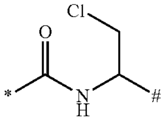 | (2,4-dimethyl-phenyl)methyl | 4.69[a] |

TABLE 33-continued

Compounds according to formula (21)

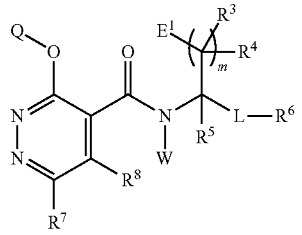

(21)

| Ex No | $R^7$ | $R^8$ | Q | 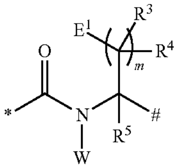 | L—$R^6$ | LogP |
|---|---|---|---|---|---|---|
| 21-03 | Cl | H | 3-(trifluoro-methyl)phenyl | 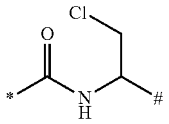 | benzyl | 4.33[a] |
| 21-04 | Cl | H | 3-(trifluoro-methyl)phenyl | 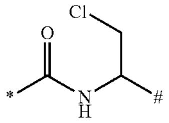 | [4-(trifluoro-methyl)phenyl]methyl | 4.62[a] |
| 21-05 | Cl | H | 3-(trifluoro-methyl)phenyl | 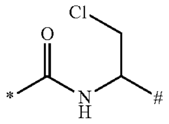 | [4-(difluoro-methoxy)phenyl]methyl | 4.30[a] |
| 21-06 | Cl | H | 3-(trifluoro-methyl)phenyl | 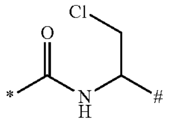 | [4-(trifluoro-methoxy)phenyl]methyl | 4.78[a] |
| 21-07 | $CH_3$ | H | 3-cyclopropyl-2-fluorophenyl | 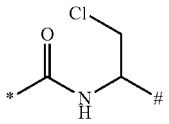 | (2,4-dimethyl-phenyl)methyl | 4.74[a] |
| 21-08 | $CH_3$ | H | 3-cyclopropyl-2-fluorophenyl | 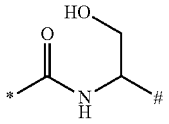 | (2-bromo-4-methyl-phenyl)methyl | 3.37[a] |
| 21-09 | $CH_3$ | H | 3-cyclopropyl-2-fluorophenyl | 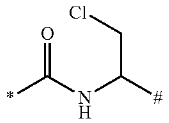 | (3,4-dichloro-phenyl)methyl | 4.66[a] |
| 21-10 | Cl | H | 3-(trifluoro-methyl)phenyl | 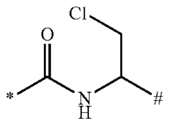 | [4-(difluoro-methyl)phenyl]methyl | 4.19[a] |

TABLE 33-continued

Compounds according to formula (21)

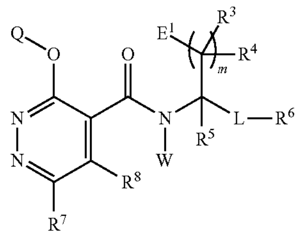

(21)

| Ex No | $R^7$ | $R^8$ | Q | 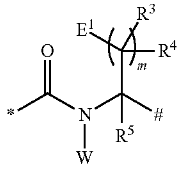 | L—$R^6$ | LogP |
|---|---|---|---|---|---|---|
| 21-11 | $CH_3$ | H | 3-cyclopropyl-2-fluorophenyl | 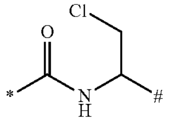 | [2-chloro-4-(trifluoro-methyl)phenyl]methyl | 4.81[a] |
| 21-12 | $CH_3$ | H | 3-cyclopropyl-2-fluorophenyl | 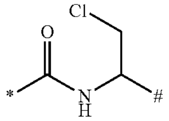 | (2-chloro-4-methyl-phenyl)methyl | 4.62[a] |
| 21-13 | Cl | H | 3-(trifluoro-methyl)phenyl | 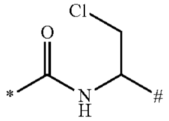 | (4-nitrophenyl)methyl | 3.98[a] |
| 21-14 | Cl | H | 3-(trifluoro-methyl)phenyl | 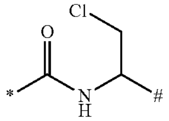 | [4-(trifluoromethyl-thio)phenyl]methyl | 5.08[a] |
| 21-15 | $CH_3$ | H | 3-chloro-2-fluorophenyl | 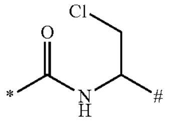 | (2-chloro-4-methyl-phenyl)methyl | 4.51[a] |
| 21-16 | $CH_3$ | H | 3-cyclopropyl-2-fluorophenyl | 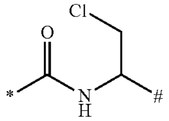 | (2-chloro-4-methoxy-phenyl)methyl | 4.36[a] |
| 21-17 | $CH_3$ | H | 3-(difluoromethyl) phenyl | 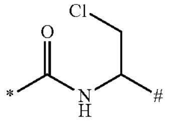 | (2-chloro-4-methylphenyl)methyl | 4.13[a] |
| 21-18 | Cl | H | 3-(difluoromethyl)-2-fluorophenyl | 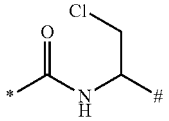 | (2-chloro-4-methylphenyl)methyl | 4.66[a] |

TABLE 33-continued

Compounds according to formula (21)

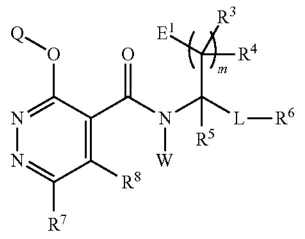

(21)

| Ex No | $R^7$ | $R^8$ | Q | 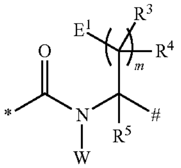 | L—$R^6$ | LogP |
|---|---|---|---|---|---|---|
| 21-19 | $CH_3$ | H | 3-cyclopropyl-2-fluorophenyl | 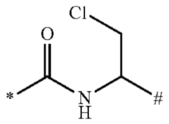 | [2-chloro-4-(difluoromethyl)phenyl]methyl | 4.40[a] |
| 21-20 | $CH_3$ | H | 3-cyclopropyl-2-fluorophenyl | 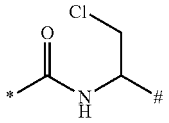 | [2-chloro-4-(difluoromethoxy)phenyl]methyl | 4.47[a] |
| 21-21 | $CH_3$ | H | 3-cyclopropyl-2-fluorophenyl | 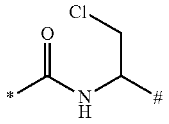 | [2-chloro-4-(trifluoromethoxy)phenyl]methyl | 5.08[a] |
| 21-22 | $CH_3$ | H | 3-cyclopropyl-2-fluorophenyl | 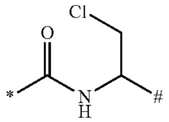 | (3-bromo-5-methylphenyl)methyl | 4.84[a] |
| 21-23 | $CH_3$ | H | 3-cyclopropyl-2-fluorophenyl | 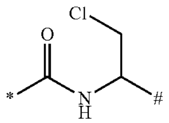 | (2-bromo-4-methylphenyl)methyl | 4.84[a] |
| 21-24 | $CH_3$ | H | 3-cyclopropyl-2-fluorophenyl | 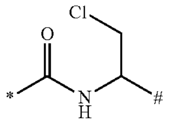 | (4-bromo-2-methylphenyl)methyl | 4.85[a] |
| 21-25 | Cl | H | 3-cyclopropylphenyl | 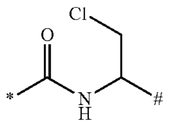 | (2,4-dimethylphenyl)methyl | 5.19[a] |
| 21-26 | Cl | H | 3-cyclopropyl-2-fluorophenyl | 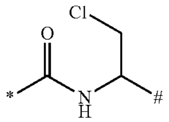 | (2,4-dimethylphenyl)methyl | 5.23[a] |

TABLE 33-continued

Compounds according to formula (21)

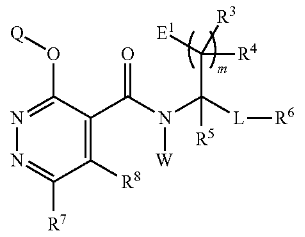

(21)

| Ex No | $R^7$ | $R^8$ | Q | 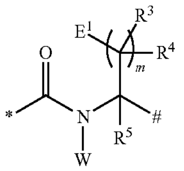 | L—$R^6$ | LogP |
|---|---|---|---|---|---|---|
| 21-27 | Cl | H | 3-(difluoromethyl)phenyl | 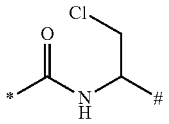 | (2,4-dimethylphenyl)methyl | 4.53[a] |
| 21-28 | Cl | H | 3-bromophenyl | 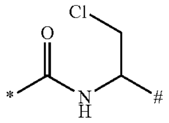 | (2,4-dimethylphenyl)methyl | 5.00[a] |
| 21-29 | Cl | H | 3-chlorophenyl | 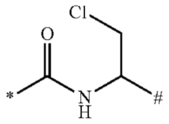 | (2,4-dimethylphenyl)methyl | 4.90[a] |
| 21-30 | Cl | H | 3-(difluoromethyl) phenyl | 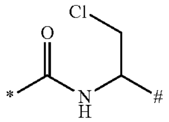 | (2-bromo-4-methylphenyl)methyl | 4.62[a] |
| 21-31 | $CH_3$ | H | 2-fluoro-3-(trifluoromethyl) phenyl | 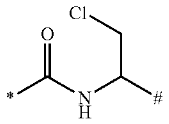 | (2,4-dimethylphenyl)methyl | 4.56[a] |
| 21-32 | Cl | H | 3-cyclopropyl-2-fluorophenyl | 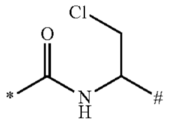 | (4-bromo-2-methylphenyl)methyl | 5.32[a] |
| 21-33 | Cl | H | 3-cyclopropylphenyl | 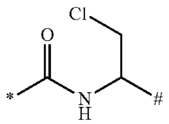 | (2-bromo-4-methylphenyl)methyl | 5.28[a] |
| 21-34 | Cl | H | 3-cyclopropyl-2-fluorophenyl | 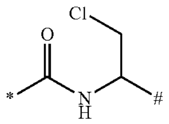 | (2-bromo-4-methylphenyl)methyl | 5.31[a] |

TABLE 33-continued

Compounds according to formula (21)

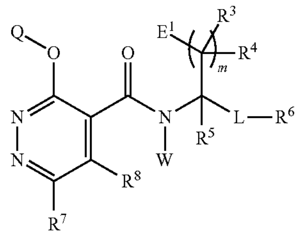

(21)

| Ex No | $R^7$ | $R^8$ | Q | 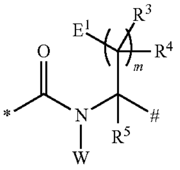 | L—$R^6$ | LogP |
|---|---|---|---|---|---|---|
| 21-35 | $CH_3$ | H | 3-cyclopropyl-2-fluorophenyl | 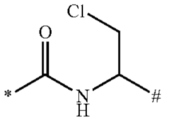 | (2-cyclopropyl-4-methylphenyl)methyl | 5.08[a] |

In table 33, "#" denotes the point of attachment to the L—$R^6$ group and "*" denotes the point of attachment to the pyridazin-4-yl group.

TABLE 34

21-01: $^1$H-NMR(499.9 MHz, CDCl3):
δ = 8.2680 (8.8); 8.0465 (1.1); 8.0311 (1.0); 7.6522 (0.5); 7.6349 (3.2); 7.6313 (2.4); 7.6260 (4.8); 7.6244 (5.2); 7.6185 (0.4); 7.6158 (0.4); 7.5084 (2.6); 7.4628 (0.4); 7.4544 (1.1); 7.4493 (1.2); 7.4463 (1.5); 7.4425 (1.5); 7.4365 (1.1); 7.4313 (0.7); 7.2577 (5.2); 7.0422 (2.6); 7.0269 (3.0); 6.9595 (3.0); 6.8715 (1.8); 6.8562 (1.4); 5.2958 (1.1); 4.6896 (0.4); 4.6817 (0.7); 4.6756 (1.0); 4.6678 (1.0); 4.6599 (0.9); 4.6536 (0.6); 3.8303 (1.4); 3.8223 (1.4); 3.8076 (2.0); 3.7996 (1.8); 3.7126 (2.2); 3.7071 (2.1); 3.6900 (1.5); 3.6844 (1.4); 3.0690 (0.5); 3.0551 (0.7); 3.0411 (2.3); 3.0305 (2.9); 3.0146 (2.1); 3.0030 (0.4); 2.9866 (0.4); 2.3588 (16.0); 2.2554 (14.7); 1.5535 (4.3); 0.0059 (0.5); −0.0002 (5.9)
21-02: $^1$H-NMR(300.2 MHz, CDCl3):
δ = 8.2238 (0.8); 8.1980 (0.8); 8.1207 (5.3); 7.2986 (7.3); 7.1850 (0.4); 7.1663 (1.9); 7.1643 (1.9); 7.1581 (2.8); 7.1405 (4.0); 7.1192 (1.9); 7.0937 (2.3); 6.9889 (2.3); 6.9151 (1.3); 6.8871 (1.7); 6.8729 (1.2); 6.8586 (0.9); 6.8416 (0.5); 4.7282 (0.5); 4.7154 (0.6); 4.7032 (0.7); 4.6915 (0.6); 4.6783 (0.5); 3.8621 (0.8); 3.8480 (0.9); 3.8246 (1.6); 3.8106 (1.5); 3.7412 (1.6); 3.7312 (1.6); 3.7037 (0.9); 3.6937 (0.9); 3.0852 (3.4); 3.0604 (3.4); 2.7425 (16.0); 2.4135 (12.0); 2.2895 (11.2); 2.1836 (0.5); 2.1724 (0.6); 2.1555 (1.0); 2.1382 (0.6); 2.1272 (0.6); 2.0456 (1.4); 1.6084 (6.1); 1.1004 (0.7); 1.0854 (1.8); 1.0785 (2.0); 1.0639 (1.1); 1.0568 (1.9); 1.0502 (1.8); 1.0357 (0.8); 0.8491 (0.9); 0.8341 (2.2); 0.8287 (2.1); 0.8172 (1.9); 0.8119 (2.3); 0.7953 (0.7); 0.0382 (9.0); 0.0273 (0.4)
21-03: $^1$H-NMR(499.9 MHz, CDCl3):
δ = 8.2630 (16.0); 7.9631 (1.8); 7.9477 (1.8); 7.6317 (8.3); 7.6214 (9.6); 7.6058 (0.5); 7.4670 (4.9); 7.4382 (0.4); 7.4302 (1.8); 7.4253 (2.0); 7.4206 (2.9); 7.4169 (2.6); 7.4121 (2.0); 7.4071 (1.5); 7.3996 (0.4); 7.2586 (11.5); 7.2368 (5.8); 7.2315 (39.9); 7.2113 (1.6); 7.2049 (0.6); 7.2008 (0.4); 4.7304 (0.4); 4.7236 (0.5); 4.7216 (0.6); 4.7150 (1.3); 4.7082 (1.6); 4.6998 (1.7); 4.6927 (1.6); 4.6859 (1.4); 4.6793 (0.7); 4.6704 (0.4); 3.7932 (2.5); 3.7842 (2.5); 3.7706 (3.8); 3.7615 (3.8); 3.6839 (4.0); 3.6775 (4.2); 3.6612 (2.8); 3.6549 (2.8); 3.1202 (1.7); 3.1069 (1.8); 3.0926 (3.8); 3.0793 (3.8); 3.0509 (4.0); 3.0353 (4.0); 3.0234 (2.0); 3.0077 (1.9); 1.5508 (5.7); 0.0061 (0.5); −0.0002 (13.9); −0.0064 (0.9)
21-04: $^1$H-NMR(300.2 MHz, CDCl3):
δ =8.3083 (16.0); 8.0825 (1.8); 8.0562 (1.8); 7.6838 (8.2); 7.6664 (8.1); 7.6445 (0.4); 7.6398 (0.5); 7.5770 (5.5); 7.5499 (11.8); 7.4807 (0.5); 7.4678 (1.9); 7.4596 (2.0); 7.4507 (2.8); 7.4438 (2.9); 7.4319 (8.4); 7.4053 (5.4); 7.2985 (34.4); 5.3383 (0.4); 4.8199 (0.5); 4.8026 (1.0); 4.7929 (1.4); 4.7797 (1.5); 4.7665 (1.4); 4.7559 (1.0); 4.7438 (0.6); 4.7300 (0.4); 3.8470 (2.1); 3.8331 (2.1); 3.8086 (3.6); 3.7947 (3.4); 3.6961 (4.0); 3.6862 (4.0); 3.6578 (2.6); 3.6479 (2.5); 3.2495 (0.9); 3.2268 (1.0); 3.2038 (3.0); 3.1818 (3.0); 3.1682 (3.5); 3.1411 (3.2); 3.1224 (1.1); 3.0955 (1.0); 1.7032 (3.3); 1.2940 (0.7); 0.1072 (1.5); 0.0483 (1.6); 0.0374 (46.8); 0.0266 (2.0)
21-05: $^1$H-NMR(300.2 MHz, CDCl3):
δ = 8.3108 (6.7); 8.0600 (0.9); 8.0338 (0.9); 7.6840 (3.3); 7.6668 (4.5); 7.5469 (2.2); 7.4823 (0.9); 7.4736 (0.9); 7.4666 (1.2); 7.4601 (1.1); 7.4517 (0.8); 7.4435 (0.6); 7.2988 (21.6); 7.2701 (4.6); 7.0663 (4.1); 7.0382 (3.3); 6.7470 (1.6); 6.5015 (3.3); 6.2561 (1.6); 5.3387 (3.6); 4.7491 (0.5); 4.7376 (0.7); 4.7247 (0.7); 4.7127 (0.7); 4.7016 (0.5); 3.8376 (1.0); 3.8236 (1.0); 3.7993 (1.7); 3.7853 (1.7); 3.7062 (1.8); 3.6963 (1.9); 3.6682 (1.1); 3.6583 (1.0); 3.1664 (0.5); 3.1442 (0.5); 3.1202 (1.7); 3.0984 (1.7); 3.0854 (1.9); 3.0583 (1.7); 3.0389 (0.6); 3.0122 (0.6); 1.5895 (16.0); 1.2916 (0.5); 0.1068 (4.2); 0.0479 (0.8); 0.0371 (21.2); 0.0264 (0.9)

TABLE 34-continued 21-06: $^1$H-NMR(300.2 MHz, CDCl3):
δ = 8.3091 (13.7); 8.0732 (1.4); 8.0471 (1.4); 7.6826 (5.9); 7.6653 (7.0); 7.5473 (3.4); 7.4925 (0.3); 7.4808 (1.4); 7.4716 (1.5); 7.4640 (2.2); 7.4578 (2.0); 7.4538 (1.0); 7.4500 (1.3); 7.4418 (1.0); 7.3345 (5.8); 7.3056 (8.5); 7.2985 (21.2); 7.1617 (5.2); 7.1354 (3.8); 5.3378 (3.5); 4.7745 (0.4); 4.7612 (0.8); 4.7510 (1.1); 4.7472 (1.0); 4.7378 (1.1); 4.7290 (1.0); 4.7248 (1.1); 4.7154 (0.8); 4.7014 (0.4); 3.8424 (1.6); 3.8285 (1.6); 3.8042 (2.8); 3.7903 (2.6); 3.7061 (3.1); 3.6962 (3.2); 3.6679 (1.9); 3.6580 (1.8); 3.1868 (0.8); 3.1646 (0.8); 3.1405 (2.6); 3.1186 (2.7); 3.1066 (3.0); 3.0793 (2.7); 3.0605 (0.9); 3.0334 (0.9); 1.5924 (16.0); 0.1073 (3.7); 0.0478 (0.9); 0.0370 (22.2); 0.0261 (0.9)
21-07: $^1$H-NMR(300.2 MHz, CDCl3):
δ = 8.2229 (0.8); 8.1964 (0.8); 8.1204 (5.3); 7.2983 (12.0); 7.1847 (0.4); 7.1663 (1.9); 7.1639 (1.8); 7.1578 (2.8); 7.1402 (4.0); 7.1191 (1.8); 7.0936 (2.3); 6.9890 (2.2); 6.9149 (1.3); 6.8940 (1.2); 6.8873 (1.7); 6.8729 (1.2); 6.8585 (0.9); 6.8419 (0.5); 5.3377 (0.9); 4.7282 (0.5); 4.7168 (0.6); 4.7031 (0.7); 4.6913 (0.7); 4.6780 (0.5); 3.8619 (0.9); 3.8478 (0.9); 3.8243 (1.6); 3.8103 (1.5); 3.7409 (1.6); 3.7309 (1.6); 3.7033 (0.9); 3.6934 (0.9); 3.0852 (3.4); 3.0604 (3.4); 2.7424 (16.0); 2.4134 (11.8); 2.3384 (0.4); 2.2894 (11.0); 2.1834 (0.5); 2.1724 (0.6); 2.1551 (1.0); 2.1377 (0.6); 2.1268 (0.6); 1.6010 (2.0); 1.1001 (0.7); 1.0852 (1.8); 1.0782 (2.0); 1.0636 (1.1); 1.0566 (1.9); 1.0499 (1.8); 1.0354 (0.9); 0.8488 (0.9); 0.8340 (2.2); 0.8289 (2.1); 0.8169 (1.9); 0.8118 (2.3); 0.7951 (0.7); 0.1079 (0.8); 0.0488 (0.5); 0.0380 (15.4); 0.0272 (0.6)
21-08: $^1$H-NMR(300.2 MHz, CDCl3):
δ = 8.0957 (5.6); 8.0600 (0.8); 7.3333 (2.4); 7.2990 (10.0); 7.1910 (2.1); 7.1653 (2.7); 7.1409 (3.6); 7.1229 (2.8); 7.1185 (2.1); 7.1137 (1.8); 7.0955 (0.4); 6.9527 (1.4); 6.9293 (1.1); 6.8816 (0.7); 6.8651 (1.0); 6.8598 (0.9); 6.8505 (1.2); 6.8365 (0.6); 6.8278 (0.6); 5.3379 (0.4); 4.5903 (0.4); 4.5780 (0.6); 4.5674 (0.6); 4.5552 (0.6); 4.5434 (0.4); 3.9217 (0.4); 3.8907 (0.9); 3.8388 (0.8); 3.8243 (0.8); 3.8029 (0.4); 3.7863 (0.4); 3.2302 (0.5); 3.2086 (0.6); 3.1835 (1.4); 3.1620 (1.3); 3.1302 (1.4); 3.1021 (1.4); 3.0838 (0.6); 3.0556 (0.6); 2.7278 (16.0); 2.6123 (0.5); 2.2684 (11.6); 2.1674 (0.5); 2.1564 (0.6); 2.1392 (1.0); 2.1223 (0.6); 2.1109 (0.6); 1.6168 (0.5); 1.0980 (0.6); 1.0825 (1.9); 1.0760 (2.0); 1.0613 (1.1); 1.0541 (2.0); 1.0475 (1.9); 1.0332 (0.8); 0.8421 (0.9); 0.8271 (2.3); 0.8213 (2.3); 0.8103 (2.1); 0.8044 (2.4); 0.7883 (0.7); 0.1074 (2.7); 0.0484 (0.5); 0.0376 (14.2); 0.0269 (0.7)
21-09: $^1$H-NMR(300.2 MHz, $d_6$-DMSO):
δ = 7.6095 (1.1); 7.5577 (0.5); 7.5514 (0.5); 7.3941 (0.4); 7.3667 (0.7); 7.2957 (0.4); 7.2891 (0.3); 7.1466 (0.4); 5.7760 (1.7); 3.3407 (16.0); 2.6006 (2.7); 2.5349 (0.6); 2.5289 (1.3); 2.5229 (1.8); 2.5168 (1.3); 2.5109 (0.6); 1.0502 (0.3); 1.0428 (0.4); 1.0220 (0.4); 1.0148 (0.4); 0.8035 (0.4); 0.7970 (0.4); 0.7865 (0.4); 0.7798 (0.4); 0.0212 (1.0)
21-10: $^1$H-NMR(300.2 MHz, CDCl3):
δ = 8.3056 (16.0); 8.2808 (1.1); 8.0621 (1.9); 8.0357 (1.9); 7.6823 (7.9); 7.6651 (9.3); 7.6394 (0.4); 7.5777 (0.6); 7.5373 (4.7); 7.5046 (0.4); 7.4998 (0.4); 7.4825 (0.7); 7.4670 (2.6); 7.4589 (5.8); 7.4520 (4.9); 7.4454 (3.4); 7.4305 (10.4); 7.3944 (10.0); 7.3671 (4.2); 7.2987 (16.0); 6.8163 (2.7); 6.6283 (5.7); 6.4404 (2.8); 5.3374 (4.6); 4.8160 (0.3); 4.8027 (0.5); 4.7903 (1.0); 4.7793 (1.5); 4.7663 (1.6); 4.7530 (1.5); 4.7426 (1.1); 4.7302 (0.6); 4.7164 (0.4); 3.8430 (2.1); 3.8288 (2.1); 3.8047 (3.7); 3.7906 (3.5); 3.7040 (4.1); 3.6939 (4.0); 3.6658 (2.5); 3.6557 (2.4); 3.2275 (0.9); 3.2058 (0.9); 3.1822 (2.9); 3.1598 (3.0); 3.1483 (3.3); 3.1214 (3.0); 3.1025 (1.0); 3.0757 (0.9); 1.6025 (2.4); 1.2969 (0.5); 0.1081 (2.3); 0.0481 (0.7); 0.0466 (0.5); 0.0374 (22.2); 0.0282 (0.8); 0.0265 (0.9)
21-11: $^1$H-NMR(300.2 MHz, CDCl3):
δ = 8.1805 (0.7); 8.1530 (0.8); 8.0622 (5.2); 7.6909 (1.1); 7.6441 (2.1); 7.5427 (0.4); 7.5199 (1.0); 7.5157 (1.0); 7.4846 (1.3); 7.4747 (1.0); 7.4476 (2.6); 7.4299 (1.9); 7.4252 (1.8); 7.4024 (0.6); 7.3986 (0.6); 7.2991 (12.7); 7.1876 (0.4); 7.1693 (2.2); 7.1610 (2.1); 7.1571 (1.8); 7.1442 (3.8); 7.1189 (0.3); 6.8998 (0.7); 6.8913 (0.7); 6.8776 (1.2); 6.8649 (0.8); 6.8606 (0.6); 6.8458 (0.5); 5.3376 (0.6); 4.9651 (0.4); 4.9531 (0.6); 4.9396 (0.6); 4.9264 (0.6); 4.9156 (0.4); 3.9478 (1.0); 3.9337 (1.0); 3.9096 (1.5); 3.8956 (1.5); 3.7731 (1.5); 3.7626 (1.6); 3.7424 (0.4); 3.7352 (1.2); 3.7245 (1.2); 3.7158 (0.9); 3.6918 (1.0); 3.6717 (0.4); 3.5710 (0.5); 3.5523 (1.3); 3.5276 (1.4); 3.5175 (0.6); 3.5075 (0.4); 3.3189 (1.7); 3.3101 (1.7); 3.2924 (1.9); 3.2875 (1.9); 3.1620 (0.3); 3.1158 (0.6); 3.0970 (0.6); 3.0096 (0.5); 2.9860 (0.5); 2.9634 (0.4); 2.9420 (0.4); 2.7356 (16.0); 2.1965 (0.3); 2.1794 (0.6); 2.1682 (0.6); 2.1511 (1.1); 2.1339 (0.7); 2.1228 (0.7); 2.1059 (0.4); 1.1068 (0.7); 1.0925 (1.5); 1.0852 (1.9); 1.0788 (1.1); 1.0707 (1.1); 1.0638 (1.6); 1.0569 (1.8); 1.0425 (1.0); 0.8467 (0.9); 0.8321 (2.0); 0.8255 (2.0); 0.8149 (1.9); 0.8098 (2.1); 0.7934 (0.8); 0.1076 (3.3); 0.0483 (0.6); 0.0374 (18.2); 0.0266 (1.0)
21-12: $^1$H-NMR(300.2 MHz, CDCl3):
δ = 8.1231 (0.7); 8.0963 (0.8); 8.0838 (5.4); 7.2986 (13.3); 7.2337 (0.5); 7.2011 (2.1); 7.1860 (0.6); 7.1744 (4.1); 7.1679 (4.0); 7.1585 (2.8); 7.1405 (3.9); 7.1135 (0.4); 7.0685 (0.3); 6.9575 (1.2); 6.9540 (1.2); 6.9314 (1.0); 6.8963 (0.7); 6.8880 (0.7); 6.8734 (1.1); 6.8638 (0.7); 6.8588 (1.0); 6.8422 (0.5); 5.3370 (9.4); 4.8993 (0.4); 4.8865 (0.6); 4.8744 (0.7); 4.8621 (0.6); 4.8488 (0.5); 3.9338 (1.0); 3.9196 (1.0); 3.8961 (1.6); 3.8819 (1.5); 3.7581 (1.5); 3.7472 (1.6); 3.7204 (1.1); 3.7095 (1.0); 3.6604 (0.4); 3.6490 (0.4); 3.5378 (0.3); 3.5173 (0.5); 3.4820 (0.4); 3.2082 (2.0); 3.2031 (2.0); 3.1818 (2.3); 2.7298 (16.0); 2.3482 (2.6); 2.2960 (10.8); 2.1820 (0.5); 2.1707 (0.5); 2.1538 (1.0); 2.1365 (0.6); 2.1256 (0.5); 1.6208 (3.8); 1.2970 (0.4); 1.1013 (0.7); 1.0865 (1.7); 1.0794 (1.9); 1.0648 (1.0); 1.0578 (1.8); 1.0512 (1.7); 1.0366 (0.9); 0.8501 (0.9); 0.8352 (2.1); 0.8298 (1.9); 0.8183 (1.8); 0.8128 (2.2); 0.7964 (0.7); 0.1080 (4.5); 0.0490 (0.6); 0.0383 (18.9); 0.0306 (0.6); 0.0289 (0.6); 0.0274 (0.7)
21-13: $^1$H-NMR(300.2 MHz, CDCl3):
δ = 8.2968 (16.0); 8.2877 (0.9); 8.2095 (1.2); 8.2015 (8.6); 8.1952 (3.2); 8.1789 (3.2); 8.1724 (9.7); 8.1363 (1.8); 8.1098 (1.8); 7.6874 (7.1); 7.6700 (8.5); 7.6446 (0.6); 7.5522 (4.0); 7.5026 (8.7); 7.4866 (2.5); 7.4736 (9.2); 7.4647 (3.4); 7.4571 (1.7); 7.4486 (1.2); 7.2990 (23.7); 5.3380 (0.7); 4.8694 (0.3); 4.8572 (0.5); 4.8424 (0.9); 4.8329 (1.4); 4.8198 (1.5); 4.8065 (1.4); 4.7974 (0.9); 4.7930 (0.8); 4.7825 (0.6); 4.7704 (0.4); 3.8673 (2.1); 3.8542 (2.2); 3.8286 (3.2); 3.8157 (3.0); 3.6878 (3.6); 3.6782 (3.6); 3.6491 (2.4); 3.6395 (2.4); 3.2991 (0.9); 3.2764 (1.0); 3.2533 (3.2); 3.2307 (3.5); 3.2226 (3.9); 3.1954 (3.3); 3.1769 (1.0); 3.1494 (1.0); 2.0829 (1.2); 1.5943 (12.8); 1.3207 (0.5); 1.2969 (1.0); 1.2732 (0.3); 0.1193 (0.4); 0.1072 (9.1); 0.0951 (0.4); 0.0479 (1.2); 0.0371 (32.3); 0.0261 (1.3)
21-14: $^1$H-NMR(300.2 MHz, CDCl3):
δ = 8.3023 (12.6); 8.0931 (1.6); 8.0664 (1.6); 7.6855 (6.2); 7.6684 (7.1); 7.6442 (0.4); 7.6104 (5.7); 7.5836 (7.0); 7.5522 (3.7); 7.4808 (1.5); 7.4715 (1.5); 7.4637 (2.2); 7.4575 (1.9); 7.4501 (1.3); 7.4420 (1.0); 7.3720 (7.8); 7.3449 (6.1); 7.2987 (22.1); 5.3380 (2.8); 4.8075 (0.4); 4.7929 (0.8); 4.7832 (1.2); 4.7706 (1.2); 4.7573 (1.1); 4.7470 (0.8); 4.7342 (0.5); 3.8505 (1.6); 3.8369 (1.7); 3.8122 (2.8); 3.7987 (2.7); 3.7038 (3.0); 3.6940 (3.1); 3.6654 (1.9); 3.6556 (1.8); 3.2150 (0.8); 3.1934 (0.8); 3.1693 (2.8); 3.1472 (3.0); 3.1389 (3.3); 3.1117 (2.9); 3.0930 (0.9); 3.0658 (0.8); 1.5896 (16.0); 1.2936 (0.4); 0.1075 (2.0); 0.0483 (1.2); 0.0375 (30.2); 0.0283 (0.9); 0.0266 (1.1)
21-15: $^1$H-NMR(300.2 MHz, CDCl3):
δ = 8.0953 (5.2); 7.9718 (0.8); 7.9462 (0.8); 7.4471 (0.7); 7.4413 (0.7); 7.4256 (0.8); 7.4201 (1.4); 7.4147 (1.0); 7.3996 (0.8); 7.3931 (0.9); 7.3320 (0.6); 7.3262 (0.6); 7.3107 (0.7); 7.2987 (10.8); 7.2834 (1.3); 7.2770 (1.0); 7.2541 (1.5); 7.2498 (1.3); 7.2277 (1.5); 7.2227 (1.6); 7.1967 (2.6); 7.1710 (2.9); 7.1566 (2.5); 6.9724 (1.4); 6.9471 (1.2); 4.8983 (0.5); 4.8863 (0.7); 4.8737 (0.7); 4.8603 (0.7); 4.8487 (0.5); 3.9378 (1.0); 3.9236 (1.0); 3.9001 (1.6); 3.8859 (1.5); 3.7658 (1.6); 3.7552 (1.6); 3.7280 (1.1); 3.7174 (1.1); 3.2752 (0.5); 3.2486 (0.5); 3.2288 (1.5); 3.2023 (1.6); 3.1902 (1.6); 3.1672 (1.5); 3.1438 (0.5); 3.1208 (0.4); 2.7387 (16.0); 2.2996 (11.9); 2.0838 (0.4); 1.6009 (13.1); 1.3441 (0.4); 1.3034 (2.7); 1.2735 (0.3); 0.9409 (0.9); 0.9192 (2.7); 0.8960 (1.1); 0.0478 (0.5); 0.0371 (13.2); 0.0278 (0.6); 0.0263 (0.6)

TABLE 34-continued 21-16: $^1$H-NMR(300.2 MHz, CDCl3):
δ = 8.1355 (0.6); 8.1089 (0.6); 8.0898 (4.6); 7.2990 (8.4); 7.2282 (2.0); 7.1999 (2.4); 7.1747 (1.2); 7.1660 (1.7); 7.1609 (2.5); 7.1472 (1.4); 7.1419 (2.1); 7.1146 (0.4); 6.9122 (2.2); 6.9035 (2.4); 6.8948 (0.7); 6.8874 (0.7); 6.8715 (0.9); 6.8617 (0.7); 6.8547 (0.6); 6.8408 (0.5); 6.7208 (1.3); 6.7121 (1.2); 6.6926 (1.2); 6.6838 (1.1); 5.3375 (5.4); 4.8809 (0.4); 4.8680 (0.5); 4.8557 (0.6); 4.8431 (0.5); 4.8301 (0.4); 3.9287 (0.8); 3.9146 (0.8); 3.8910 (1.3); 3.8769 (1.2); 3.8064 (0.4); 3.7798 (16.0); 3.7660 (0.4); 3.7497 (1.3); 3.7389 (1.3); 3.7120 (0.9); 3.7011 (0.9); 3.1808 (1.6); 3.1717 (1.6); 3.1555 (1.6); 3.1480 (1.6); 2.7331 (13.7); 2.1800 (0.4); 2.1686 (0.4); 2.1517 (0.8); 2.1345 (0.5); 2.1234 (0.4); 2.0835 (0.6); 1.6051 (5.9); 1.2972 (0.5); 1.0976 (0.6); 1.0824 (1.5); 1.0755 (1.7); 1.0697 (0.9); 1.0608 (0.9); 1.0538 (1.6); 1.0470 (1.5); 1.0326 (0.8); 0.8468 (0.8); 0.8318 (1.8); 0.8256 (1.8); 0.8148 (1.6); 0.8090 (1.9); 0.7927 (0.6); 0.1075 (0.8); 0.0483 (0.4); 0.0374 (11.6); 0.0266 (0.4)
21-17: $^1$H-NMR(300.2 MHz, CDCl3):
δ = 8.1059 (5.6); 8.0924 (0.9); 7.6316 (0.6); 7.6055 (1.6); 7.5793 (1.2); 7.5095 (1.4); 7.4839 (0.9); 7.4176 (1.9); 7.3996 (1.2); 7.3964 (1.2); 7.3926 (1.0); 7.3730 (0.8); 7.3696 (0.9); 7.3657 (0.8); 7.2988 (2.4); 7.1805 (2.0); 7.1553 (4.4); 6.9634 (1.3); 6.9606 (1.3); 6.9375 (1.0); 6.9345 (1.0); 6.9222 (1.2); 6.7344 (2.2); 6.5466 (1.1); 5.3335 (10.6); 4.8996 (0.4); 4.8881 (0.6); 4.8751 (0.7); 4.8618 (0.6); 4.8506 (0.5); 3.9341 (1.0); 3.9201 (1.0); 3.8963 (1.5); 3.8824 (1.5); 3.7604 (1.6); 3.7499 (1.6); 3.7226 (1.1); 3.7121 (1.0); 3.2693 (0.5); 3.2429 (0.5); 3.2231 (1.4); 3.1968 (1.4); 3.1732 (1.4); 3.1501 (1.4); 3.1270 (0.6); 3.1039 (0.5); 2.7354 (16.0); 2.3400 (0.4); 2.3315 (0.3); 2.2929 (11.0); 0.0358 (3.2)
21-18: $^1$H-NMR(300.2 MHz, CDCl3):
δ = 8.2516 (8.2); 8.1521 (0.4); 7.9205 (1.1); 7.8941 (1.1); 7.6641 (0.8); 7.6406 (1.5); 7.6187 (0.9); 7.5383 (0.7); 7.5139 (1.6); 7.4901 (1.1); 7.4407 (1.7); 7.4138 (2.1); 7.3871 (0.8); 7.2986 (3.3); 7.1914 (2.8); 7.1650 (4.2); 7.1581 (3.6); 7.1401 (1.6); 6.9821 (2.0); 6.9576 (4.5); 6.7756 (1.5); 5.3354 (16.0); 4.9066 (0.3); 4.8934 (0.6); 4.8811 (0.9); 4.8686 (0.9); 4.8554 (0.9); 4.8442 (0.7); 4.8311 (0.4); 4.3608 (1.1); 3.9397 (1.3); 3.9257 (1.3); 3.9017 (2.1); 3.8878 (2.0); 3.7684 (2.1); 3.7579 (2.1); 3.7305 (1.5); 3.7200 (1.4); 3.2923 (0.9); 3.2653 (0.8); 3.2460 (1.9); 3.2190 (1.9); 3.1763 (1.8); 3.1537 (1.9); 3.1302 (0.9); 3.1074 (0.8); 2.3400 (0.8); 2.2951 (15.9); 1.6225 (3.9); 0.0366 (4.4)
21-19: $^1$H-NMR(300.2 MHz, CDCl3):
δ = 8.1689 (0.8); 8.1423 (0.8); 8.0647 (5.2); 7.5246 (2.0); 7.4359 (1.3); 7.4097 (2.0); 7.3124 (1.4); 7.2988 (10.6); 7.2882 (1.0); 7.1878 (0.4); 7.1692 (2.3); 7.1611 (2.2); 7.1571 (1.8); 7.1441 (3.8); 6.8988 (0.7); 6.8901 (0.7); 6.8764 (1.2); 6.8637 (0.8); 6.8593 (0.6); 6.8449 (0.5); 6.7775 (1.1); 6.5901 (2.2); 6.4028 (1.1); 5.3377 (1.2); 4.9565 (0.4); 4.9439 (0.6); 4.9310 (0.6); 4.9177 (0.6); 4.9061 (0.4); 3.9447 (1.0); 3.9306 (1.0); 3.9066 (1.5); 3.8926 (1.5); 3.7699 (1.5); 3.7593 (1.5); 3.7319 (1.1); 3.7213 (1.0); 3.2983 (1.6); 3.2910 (1.6); 3.2699 (2.0); 2.7492 (0.4); 2.7331 (16.0); 2.1817 (0.5); 2.1705 (0.5); 2.1534 (1.0); 2.1361 (0.6); 2.1252 (0.5); 2.0836 (1.1); 1.6023 (7.9); 1.3210 (0.4); 1.2972 (0.9); 1.1071 (0.7); 1.0926 (1.6); 1.0854 (2.0); 1.0791 (1.1); 1.0709 (1.1); 1.0639 (1.7); 1.0570 (1.8); 1.0427 (0.9); 0.9190 (0.3); 0.8490 (0.9); 0.8343 (2.1); 0.8314 (1.9); 0.8281 (2.0); 0.8172 (1.9); 0.8119 (2.1); 0.7955 (0.7); 0.1072 (3.8); 0.0479 (0.5); 0.0371 (14.4); 0.0262 (0.6)
21-20: $^1$H-NMR(300.2 MHz, CDCl3):
δ = 8.1518 (0.8); 8.1255 (0.8); 8.0749 (5.3); 7.3293 (2.3); 7.2991 (10.5); 7.1924 (0.5); 7.1745 (3.1); 7.1685 (3.9); 7.1462 (3.8); 7.1191 (0.4); 6.9571 (1.2); 6.9488 (1.2); 6.9291 (1.1); 6.9209 (1.0); 6.8980 (0.7); 6.8896 (0.8); 6.8754 (1.2); 6.8661 (0.7); 6.8608 (1.0); 6.8442 (0.5); 6.7258 (1.5); 6.4819 (3.2); 6.2380 (1.6); 5.3377 (1.5); 4.9136 (0.4); 4.9014 (0.6); 4.8887 (0.6); 4.8753 (0.6); 4.8636 (0.5); 3.9377 (1.0); 3.9236 (1.0); 3.8997 (1.5); 3.8858 (1.4); 3.7622 (1.5); 3.7515 (1.5); 3.7242 (1.0); 3.7136 (1.0); 3.2348 (2.0); 3.2273 (2.0); 3.2086 (2.2); 3.2042 (2.2); 2.7360 (16.0); 2.1792 (0.5); 2.1682 (0.6); 2.1510 (1.0); 2.1339 (0.6); 2.1230 (0.5); 1.6046 (6.7); 1.1052 (0.7); 1.0906 (1.6); 1.0835 (2.0); 1.0690 (1.1); 1.0619 (1.7); 1.0552 (1.8); 1.0408 (0.9); 0.8475 (1.0); 0.8327 (2.1); 0.8301 (2.0); 0.8264 (2.1); 0.8157 (1.9); 0.8101 (2.2); 0.7940 (0.7); 0.1073 (0.5); 0.0480 (0.4); 0.0372 (12.3); 0.0263 (0.5)
21-21: $^1$H-NMR(300.2 MHz, CDCl3):
δ = 8.1740 (0.8); 8.1470 (0.9); 8.0704 (5.3); 7.3689 (2.4); 7.3406 (2.8); 7.2988 (13.8); 7.2694 (1.8); 7.2646 (1.8); 7.1920 (0.4); 7.1733 (1.6); 7.1640 (2.7); 7.1461 (3.8); 7.1188 (0.4); 7.0539 (1.1); 7.0496 (1.0); 7.0259 (0.9); 6.8979 (0.7); 6.8896 (0.8); 6.8753 (1.2); 6.8659 (0.7); 6.8605 (1.1); 6.8438 (0.6); 5.3381 (1.0); 4.9282 (0.5); 4.9154 (0.7); 4.9029 (0.7); 4.8898 (0.7); 4.8774 (0.5); 3.9419 (1.0); 3.9279 (1.0); 3.9038 (1.5); 3.8900 (1.4); 3.7649 (1.5); 3.7544 (1.5); 3.7268 (1.0); 3.7164 (1.0); 3.2546 (2.0); 3.2473 (2.1); 3.2281 (2.3); 3.2242 (2.4); 2.7369 (16.0); 2.1796 (0.5); 2.1681 (0.6); 2.1514 (1.0); 2.1343 (0.6); 2.1233 (0.6); 2.0838 (0.6); 1.5965 (7.4); 1.3210 (0.4); 1.2974 (1.2); 1.1046 (0.7); 1.0899 (1.8); 1.0829 (2.0); 1.0683 (1.1); 1.0613 (1.8); 1.0546 (1.9); 1.0403 (0.9); 0.9410 (0.3); 0.9192 (0.9); 0.8964 (0.4); 0.8464 (0.9); 0.8315 (2.2); 0.8263 (2.2); 0.8146 (2.0); 0.8093 (2.3); 0.7931 (0.7); 0.0480 (0.7); 0.0371 (20.1); 0.0263 (0.8)
21-22: $^1$H-NMR(499.9 MHz, $d_6$-DMSO):
δ = 8.7876 (2.3); 8.7708 (2.2); 7.5690 (7.6); 7.2853 (3.7); 7.1907 (3.7); 7.1683 (1.0); 7.1521 (3.0); 7.1440 (2.0); 7.1382 (5.2); 7.1307 (1.7); 7.1272 (1.8); 7.1147 (0.7); 7.1110 (0.5); 7.0821 (3.9); 6.9136 (1.0); 6.9073 (1.1); 6.9005 (1.8); 6.8959 (1.5); 6.8851 (1.0); 6.8820 (0.8); 4.4489 (0.6); 4.4390 (0.8); 4.4314 (1.0); 4.4217 (1.0); 4.4128 (0.7); 4.4033 (0.5); 3.8470 (1.3); 3.8377 (1.4); 3.8248 (2.0); 3.8155 (1.7); 3.7506 (1.8); 3.7381 (1.9); 3.7283 (1.3); 3.7159 (1.2); 3.3402 (33.7); 2.9809 (1.1); 2.9715 (1.2); 2.9533 (1.5); 2.9441 (1.4); 2.8227 (1.5); 2.8037 (1.5); 2.7953 (1.2); 2.7763 (1.0); 2.5890 (19.3); 2.5076 (1.5); 2.5041 (1.9); 2.5008 (1.4); 2.1623 (16.0); 2.0781 (0.5); 2.0678 (0.9); 2.0612 (1.0); 2.0511 (1.6); 2.0409 (1.0); 2.0343 (0.9); 2.0239 (0.4); 1.0292 (1.3); 1.0206 (3.0); 1.0164 (3.2); 1.0083 (1.8); 1.0039 (2.9); 0.9996 (2.9); 0.9916 (1.1); 0.7815 (1.5); 0.7731 (3.4); 0.7697 (3.7); 0.7632 (3.3); 0.7593 (3.3); 0.7505 (1.0)
21-23: $^1$H-NMR(300.2 MHz, CDCl3):
δ = 8.1287 (0.8); 8.1011 (0.8); 8.0838 (5.4); 7.3700 (2.3); 7.2989 (5.4); 7.2003 (2.2); 7.1917 (0.6); 7.1739 (3.4); 7.1646 (2.7); 7.1595 (2.8); 7.1417 (2.9); 7.1146 (0.7); 6.9988 (1.3); 6.9959 (1.3); 6.9731 (1.0); 6.8947 (0.7); 6.8871 (0.8); 6.8718 (1.1); 6.8621 (0.7); 6.8565 (1.0); 6.8410 (0.5); 4.9293 (0.5); 4.9162 (0.7); 4.9038 (0.7); 4.8915 (0.7); 4.8784 (0.5); 3.9454 (1.0); 3.9314 (1.0); 3.9077 (1.6); 3.8937 (1.5); 3.7643 (1.5); 3.7536 (1.6); 3.7266 (1.1); 3.7158 (1.0); 3.2135 (3.6); 3.1888 (3.6); 2.7288 (16.0); 2.3570 (0.6); 2.3446 (1.0); 2.2942 (11.3); 2.1824 (0.5); 2.1713 (0.5); 2.1542 (1.0); 2.1370 (0.6); 2.1260 (0.6); 1.6160 (1.1); 1.4701 (0.6); 1.2942 (0.6); 1.1013 (0.7); 1.0863 (1.8); 1.0793 (2.0); 1.0648 (1.1); 1.0578 (1.9); 1.0510 (1.8); 1.0366 (0.9); 0.8494 (0.9); 0.8346 (2.2); 0.8293 (2.1); 0.8176 (1.9); 0.8122 (2.3); 0.7958 (0.7); 0.1099 (0.3); 0.0381 (7.4)
21-24: $^1$H-NMR(400.1 MHz, CDCl3):
δ = 8.1965 (1.1); 8.1766 (1.1); 8.0709 (5.6); 7.2898 (2.9); 7.2617 (11.1); 7.2001 (1.3); 7.1799 (1.7); 7.1760 (1.6); 7.1446 (0.4); 7.1302 (2.8); 7.1249 (3.0); 7.1122 (4.0); 7.0931 (0.4); 7.0663 (2.9); 7.0459 (2.1); 6.8556 (0.8); 6.8489 (0.9); 6.8391 (1.4); 6.8306 (1.2); 6.8155 (0.6); 4.6895 (0.6); 4.6806 (0.8); 4.6715 (0.9); 4.6615 (0.8); 4.6527 (0.6); 3.8142 (1.1); 3.8039 (1.0); 3.7858 (1.6); 3.7754 (1.5); 3.6765 (1.6); 3.6694 (1.6); 3.6481 (1.2); 3.6410 (1.1); 3.0370 (3.8); 3.0182 (4.0); 2.9581 (1.5); 2.8851 (1.4); 2.7112 (16.0); 2.6750 (0.4); 2.6417 (0.3); 2.3943 (13.6); 2.3557 (0.5); 2.3481 (0.4); 2.2663 (0.4); 2.1409 (0.6); 2.1323 (0.7); 2.1199 (1.2); 2.1069 (0.8); 2.0989 (0.7); 2.0855 (0.4); 1.5742 (2.8); 1.0576 (0.8); 1.0461 (2.2); 1.0414 (2.4); 1.0302 (1.4); 1.0249 (2.3); 1.0204 (2.3); 1.0095 (0.9); 0.8054 (1.0); 0.7933 (2.9); 0.7813 (2.6); 0.7778 (2.8); 0.7655 (0.8); −0.0002 (14.8)
21-25: $^1$H-NMR(400.1 MHz, CDCl3):
δ = 8.2421 (7.0); 8.2130 (1.3); 7.3753 (1.4); 7.3555 (3.1); 7.3357 (1.8); 7.2614 (12.0); 7.0504 (4.7); 7.0311 (5.0); 7.0144 (1.8); 7.0100 (1.9); 6.9944 (1.6); 6.9892 (1.7); 6.9646 (3.6); 6.9255 (3.4); 6.8781 (2.1); 6.8590 (1.6); 4.6679 (0.7); 4.6601 (1.0); 4.6505 (1.1); 4.6409 (1.0); 4.6320 (0.7); 4.6228 (0.4); 3.8142 (1.2); 3.8043 (1.2); 3.7858 (1.9); 3.7760 (1.8); 3.6960

TABLE 34-continued (2.0); 3.6892 (2.0); 3.6676 (1.3); 3.6609 (1.3); 3.0220 (4.8); 3.0033 (4.5); 2.9580 (0.9); 2.8848 (0.8); 2.3626 (16.0); 2.2659 (15.2); 1.9768 (0.4); 1.9641 (0.8); 1.9557 (0.9); 1.9436 (1.6); 1.9312 (1.0); 1.9226 (0.9); 1.9102 (0.4); 1.5745 (20.6); 1.0443 (0.9); 1.0320 (2.8); 1.0279 (2.9); 1.0114 (2.9); 1.0073 (2.7); 0.9959 (1.0); 0.7609 (1.1); 0.7486 (3.6); 0.7332 (3.4); 0.7208 (0.9); −0.0002 (9.2)
21-26: $^1$H-NMR(400.1 MHz, CDCl3):
δ = 8.2401 (6.7); 8.1113 (1.3); 8.0920 (1.3); 7.2611 (7.1); 7.1552 (0.6); 7.1343 (3.0); 7.1195 (4.5); 7.1100 (1.9); 7.0950 (0.5); 7.0636 (2.5); 7.0445 (3.0); 6.9546 (3.5); 6.8829 (1.2); 6.8722 (3.2); 6.8596 (2.2); 4.6867 (0.4); 4.6771 (0.8); 4.6684 (1.0); 4.6588 (1.1); 4.6496 (1.0); 4.6403 (0.7); 4.6320 (0.4); 3.8215 (1.2); 3.8113 (1.2); 3.7932 (1.9); 3.7830 (1.8); 3.6999 (2.0); 3.6929 (2.0); 3.6716 (1.3); 3.6646 (1.2); 3.0421 (4.9); 3.0235 (4.8); 2.9579 (1.3); 2.8849 (1.3); 2.3683 (16.0); 2.2537 (15.2); 2.1541 (0.4); 2.1415 (0.8); 2.1329 (0.9); 2.1204 (1.5); 2.1079 (0.9); 2.0991 (0.8); 2.0864 (0.4); 1.5844 (10.4); 1.0729 (0.9); 1.0613 (2.7); 1.0567 (2.8); 1.0401 (2.8); 1.0357 (2.6); 1.0247 (1.0); 0.8147 (1.2); 0.8028 (3.5); 0.7903 (3.1); 0.7871 (3.3); 0.7748 (0.9); −0.0002 (5.4)
21-27: $^1$H-NMR(400.1 MHz, CDCl3):
δ = 8.2684 (6.6); 8.1165 (1.2); 8.0974 (1.2); 8.0164 (0.7); 7.6177 (1.0); 7.5983 (2.4); 7.5786 (1.7); 7.5088 (2.3); 7.4896 (1.5); 7.4046 (3.0); 7.3707 (1.8); 7.3495 (1.5); 7.2620 (12.0); 7.0473 (2.4); 7.0281 (3.0); 6.9631 (3.5); 6.8782 (2.0); 6.8530 (2.1); 6.7114 (2.9); 6.5708 (1.5); 4.6922 (0.4); 4.6823 (0.7); 4.6737 (1.0); 4.6646 (1.0); 4.6545 (1.0); 4.6464 (0.7); 4.6361 (0.4); 3.8304 (1.2); 3.8204 (1.2); 3.8020 (1.9); 3.7920 (1.8); 3.7106 (2.0); 3.7040 (2.0); 3.6824 (1.3); 3.6758 (1.2); 3.0538 (0.4); 3.0327 (3.1); 3.0196 (2.6); 3.0120 (2.5); 2.9758 (0.3); 2.9583 (4.2); 2.8845 (4.0); 2.3613 (16.0); 2.2595 (15.4); 1.5863 (11.1); −0.0002 (9.0)
21-28: $^1$H-NMR(400.1 MHz, CDCl3):
δ = 8.2539 (6.9); 8.0583 (1.2); 8.0391 (1.2); 7.5067 (1.6); 7.4865 (2.2); 7.4038 (2.4); 7.3991 (3.7); 7.3942 (2.5); 7.3901 (2.2); 7.3694 (3.4); 7.3492 (1.7); 7.2612 (5.9); 7.2017 (1.9); 7.1973 (1.8); 7.1813 (1.5); 7.1771 (1.4); 7.0454 (2.4); 7.0263 (3.0); 6.9676 (3.4); 6.8869 (2.0); 6.8678 (1.6); 4.6826 (0.4); 4.6731 (0.7); 4.6645 (1.0); 4.6549 (1.0); 4.6455 (1.0); 4.6366 (0.7); 4.6267 (0.4); 3.8266 (1.2); 3.8165 (1.2); 3.7982 (1.9); 3.7882 (1.8); 3.7086 (2.0); 3.7019 (2.0); 3.6803 (1.3); 3.6736 (1.2); 3.0306 (3.7); 3.0141 (2.8); 3.0095 (2.8); 2.9573 (1.5); 2.8833 (1.4); 2.3595 (16.0); 2.2715 (15.1); 1.5862 (9.1); −0.0002 (4.4)
21-29: $^1$H-NMR(400.1 MHz, CDCl3):
δ = 8.2563 (6.9); 8.0676 (1.2); 8.0485 (1.2); 8.0164 (0.6); 7.4493 (1.3); 7.4290 (3.3); 7.4088 (2.3); 7.3538 (2.3); 7.3328 (1.4); 7.2609 (7.1); 7.2515 (2.4); 7.2465 (3.7); 7.2416 (2.1); 7.1557 (1.8); 7.1519 (1.7); 7.1360 (1.6); 7.1315 (1.4); 7.0476 (2.4); 7.0284 (3.0); 6.9665 (3.4); 6.8863 (2.0); 6.8673 (1.6); 4.6842 (0.4); 4.6743 (0.7); 4.6664 (1.0); 4.6569 (1.0); 4.6473 (1.0); 4.6388 (0.7); 4.6285 (0.4); 3.8262 (1.2); 3.8161 (1.2); 3.7978 (1.9); 3.7879 (1.8); 3.7083 (2.1); 3.7016 (2.0); 3.6799 (1.3); 3.6733 (1.2); 3.0508 (0.4); 3.0329 (3.0); 3.0294 (3.1); 3.0162 (2.6); 3.0089 (2.5); 2.9737 (0.3); 2.9576 (3.4); 2.8841 (3.2); 2.3607 (16.0); 2.2697 (15.2); 1.5838 (2.6); −0.0002 (9.2)
21-30: $^1$H-NMR(400.1 MHz, CDCl3):
δ = 8.2241 (7.2); 8.0182 (3.0); 8.0014 (1.4); 7.6167 (1.0); 7.5969 (2.5); 7.5771 (1.7); 7.5067 (2.3); 7.4875 (1.6); 7.3966 (3.2); 7.3696 (1.9); 7.3496 (1.6); 7.3269 (3.9); 7.2623 (12.4); 7.1392 (2.8); 7.1199 (3.5); 6.9803 (2.2); 6.9619 (1.7); 6.8530 (1.5); 6.7123 (3.1); 6.5716 (1.5); 4.8934 (0.4); 4.8838 (0.7); 4.8745 (1.0); 4.8651 (1.0); 4.8558 (1.0); 4.8470 (0.7); 4.8368 (0.4); 3.9050 (1.4); 3.8948 (1.4); 3.8765 (1.9); 3.8664 (1.8); 3.7293 (1.9); 3.7219 (2.0); 3.7009 (1.5); 3.6935 (1.4); 3.2422 (1.0); 3.2218 (1.0); 3.2073 (1.9); 3.1871 (1.8); 3.1416 (1.8); 3.1246 (1.8); 3.1067 (1.0); 3.0899 (0.9); 2.9579 (12.3); 2.8844 (11.6); 2.2849 (0.7); 2.2625 (16.0); 1.5788 (5.7); −0.0002 (16.0)
21-31: $^1$H-NMR(400.1 MHz, CDCl3):
δ = 8.1057 (5.5); 7.9851 (1.0); 7.9661 (1.0); 7.6073 (0.8); 7.5867 (1.9); 7.5676 (1.8); 7.5473 (1.0); 7.3795 (1.0); 7.3597 (1.7); 7.3403 (0.7); 7.2614 (20.3); 7.0691 (2.0); 7.0499 (2.4); 6.9502 (2.9); 6.8736 (1.6); 6.8541 (1.3); 4.7029 (0.3); 4.6932 (0.6); 4.6834 (0.8); 4.6745 (0.9); 4.6646 (0.8); 4.6556 (0.6); 3.8291 (1.0); 3.8185 (1.0); 3.8009 (1.6); 3.7905 (1.5); 3.7094 (1.7); 3.7022 (1.7); 3.6811 (1.1); 3.6739 (1.0); 3.0500 (3.9); 3.0313 (3.3); 2.9584 (1.3); 2.8854 (1.2); 2.7219 (16.0); 2.3724 (13.4); 2.2405 (12.6); 1.5600 (8.2); −0.0002 (26.9)
21-32: $^1$H-NMR(400.1 MHz, CDCl3):
δ = 8.2363 (6.9); 8.1320 (1.2); 8.1122 (1.3); 7.2957 (3.3); 7.2614 (7.9); 7.2051 (1.5); 7.1849 (2.0); 7.1810 (1.8); 7.1625 (0.6); 7.1420 (2.6); 7.1354 (1.9); 7.1259 (4.6); 7.1149 (1.8); 7.0995 (0.5); 7.0945 (0.4); 7.0568 (3.2); 7.0366 (2.5); 6.8876 (0.9); 6.8780 (1.0); 6.8717 (1.5); 6.8652 (1.4); 6.8525 (0.9); 6.8477 (0.8); 4.6903 (0.4); 4.6808 (0.7); 4.6723 (1.0); 4.6626 (1.0); 4.6534 (1.0); 4.6444 (0.7); 4.6351 (0.4); 3.8172 (1.2); 3.8072 (1.2); 3.7888 (1.9); 3.7787 (1.8); 3.6748 (1.9); 3.6679 (1.9); 3.6463 (1.3); 3.6393 (1.3); 3.0370 (4.9); 3.0183 (4.8); 2.9577 (1.4); 2.8846 (1.3); 2.3896 (16.0); 2.1574 (0.3); 2.1440 (0.7); 2.1356 (0.8); 2.1230 (1.4); 2.1103 (0.9); 2.1020 (0.8); 2.0889 (0.4); 1.5655 (4.8); 1.0761 (0.9); 1.0643 (2.6); 1.0598 (2.7); 1.0433 (2.7); 1.0387 (2.6); 1.0277 (1.0); 0.8151 (1.1); 0.8029 (3.4); 0.7907 (3.0); 0.7873 (3.3); 0.7751 (0.9); −0.0002 (10.5)
21-33: $^1$H-NMR(400.1 MHz, CDCl3):
δ = 8.2021 (7.4); 8.1382 (1.2); 8.1182 (1.2); 8.0192 (1.8); 7.3742 (1.6); 7.3544 (3.4); 7.3348 (5.7); 7.2617 (33.1); 7.1329 (2.8); 7.1135 (3.5); 7.0510 (2.2); 7.0318 (2.0); 7.0076 (1.7); 7.0035 (1.8); 6.9884 (1.5); 6.9832 (1.7); 6.9655 (2.2); 6.9466 (1.8); 6.9186 (3.4); 4.8826 (0.4); 4.8717 (0.7); 4.8637 (1.0); 4.8544 (1.0); 4.8449 (1.0); 4.8350 (0.7); 4.8257 (0.4); 3.8942 (1.4); 3.8840 (1.4); 3.8659 (2.0); 3.8559 (1.8); 3.7141 (1.9); 3.7066 (2.0); 3.6857 (1.5); 3.6783 (1.5); 3.2087 (0.7); 3.1892 (0.7); 3.1742 (2.0); 3.1545 (2.0); 3.1397 (2.0); 3.1222 (2.1); 3.1048 (0.8); 3.0875 (0.6); 2.9587 (12.1); 2.8858 (11.4); 2.2935 (0.5); 2.2687 (16.0); 1.9776 (0.4); 1.9644 (0.8); 1.9561 (1.0); 1.9440 (1.6); 1.9312 (1.0); 1.9228 (0.9); 1.9104 (0.4); 1.5618 (20.4); 1.0463 (0.9); 1.0342 (2.8); 1.0295 (3.0); 1.0133 (3.0); 1.0089 (2.8); 0.9974 (1.1); 0.7615 (1.1); 0.7496 (3.7); 0.7376 (3.1); 0.7334 (3.6); 0.7214 (1.0); −0.0002 (42.6)
21-34: $^1$H-NMR(400.1 MHz, CDCl3):
δ = 8.2016 (7.2); 8.0188 (2.5); 8.0066 (1.4); 7.3355 (3.8); 7.2623 (9.6); 7.1500 (3.0); 7.1360 (5.2); 7.1307 (4.6); 7.1230 (4.4); 7.1023 (0.6); 6.9693 (2.1); 6.9498 (1.7); 6.8819 (0.9); 6.8693 (1.5); 6.8586 (1.6); 6.8483 (0.9); 6.8416 (0.8); 4.8910 (0.4); 4.8810 (0.7); 4.8722 (1.0); 4.8627 (1.0); 4.8531 (1.0); 4.8441 (0.7); 4.8342 (0.4); 3.9018 (1.4); 3.8916 (1.4); 3.8734 (1.9); 3.8632 (1.8); 3.7233 (1.9); 3.7156 (1.9); 3.6949 (1.5); 3.6871 (1.4); 3.2159 (0.5); 3.1957 (0.5); 3.1813 (2.3); 3.1625 (3.0); 3.1488 (2.3); 3.1314 (0.5); 3.1141 (0.4); 2.9580 (11.4); 2.8848 (10.7); 2.2636 (16.0); 2.1549 (0.3); 2.1412 (0.8); 2.1328 (0.9); 2.1202 (1.5); 2.1075 (1.0); 2.0994 (0.9); 2.0861 (0.4); 1.5849 (3.4); 1.0747 (0.9); 1.0631 (2.7); 1.0586 (2.8); 1.0419 (2.8); 1.0375 (2.7); 1.0264 (1.1); 0.8155 (1.1); 0.8033 (3.4); 0.7912 (3.1); 0.7876 (3.3); 0.7755 (0.9); −0.0002 (12.4)
21-35: $^1$H-NMR(300.2 MHz, CDCl3):
δ = 8.2404 (0.7); 8.2149 (0.7); 8.1141 (4.5); 7.2986 (8.0); 7.1821 (0.4); 7.1631 (1.9); 7.1555 (2.3); 7.1380 (3.4); 7.1247 (1.9); 7.1121 (0.4); 7.0993 (2.0); 6.8933 (1.6); 6.8865 (1.5); 6.8707 (1.6); 6.8621 (1.6); 6.8401 (0.5); 6.7705 (2.0); 5.3375 (0.7); 4.8836 (0.4); 4.8725 (0.5); 4.8593 (0.6); 4.8463 (0.5); 4.8345 (0.4); 3.8782 (0.7); 3.8642 (0.7); 3.8407 (1.3); 3.8267 (1.2); 3.7612 (1.4); 3.7513 (1.4); 3.7237 (0.8); 3.7138 (0.7); 3.2725 (1.4); 3.2623 (1.6); 3.2499 (1.4); 3.2358 (1.4); 2.7393 (13.4); 2.2968 (0.8); 2.2827 (9.4); 2.1821 (0.5); 2.1709 (0.5); 2.1537 (1.0); 2.1420 (0.8); 2.1353 (0.8); 2.1254 (0.8); 2.1141 (0.9); 2.0965 (0.5); 2.0862 (0.5); 1.6090 (16.0); 1.0992 (0.6); 1.0842 (1.6); 1.0772 (1.8); 1.0624 (1.6); 1.0549 (2.3); 1.0489 (2.7);

TABLE 34-continued

| |
|---|
| 1.0340 (1.9); 1.0219 (1.2); 1.0159 (1.5); 1.0045 (0.7); 0.8480 (0.8); 0.8330 (2.0); 0.8279 (1.9); 0.8162 (1.8); 0.8107 (2.0); 0.7944 (0.6); 0.7238 (0.7); 0.7138 (1.5); 0.7076 (1.5); 0.6973 (1.6); 0.6904 (0.9); 0.1076 (2.3); 0.0483 (0.4); 0.0374 (9.5); 0.0266 (0.4) |

TABLE 35

Compounds according to formula (22)

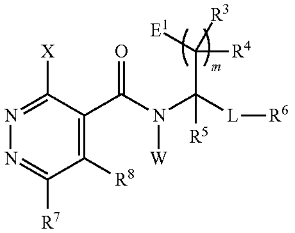

(22)

| Ex No | $R^7$ | $R^8$ | X | 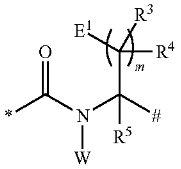 | L—$R^6$ | LogP |
|---|---|---|---|---|---|---|
| 22-01 | Cl | H | Cl | 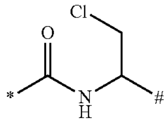 | (2,4-dimethylphenyl)methyl | 3.51[a] |
| 22-02 | $CH_3$ | H | Cl | 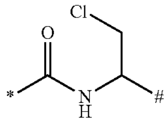 | (2,4-dimethylphenyl)methyl | 2.91[a] |
| 22-03 | Cl | H | Cl | 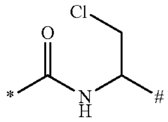 | (4-bromo-2-methylphenyl)methyl | 3.66[a] |
| 22-04 | $CH_3$ | H | Cl | 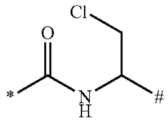 | (4-bromo-2-methylphenyl)methyl | 3.06[a] |
| 22-05 | Cl | H | Cl | 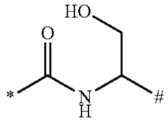 | (2,4-dichlorophenyl)methyl | 2.50[a] |
| 22-06 | $CH_3$ | H | Cl | 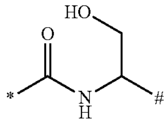 | (2,4-dichlorophenyl)methyl | 2.06[a] |

In table 35, "#" denotes the point of attachment to the L—$R^6$ group and "*" denotes the point of attachment to the pyridazin-4-yl group.

TABLE 35
22-01: $^1$H-NMR(400.1 MHz, CDCl3):
δ = 7.7580 (6.8); 7.2614 (12.3); 7.0994 (2.3); 7.0803 (3.1); 7.0260 (3.4); 6.9891 (2.1); 6.9694 (1.5); 6.8424 (1.0); 6.8226 (0.9); 4.6957 (0.4); 4.6842 (0.7); 4.6763 (1.1); 4.6670 (0.9); 4.6564 (1.1); 4.6476 (0.6); 4.6367 (0.4); 3.8240 (1.3); 3.8148 (1.3); 3.7952 (2.0); 3.7862 (1.8); 3.6895 (2.0); 3.6822 (2.0); 3.6607 (1.4); 3.6534 (1.3); 3.0370 (5.0); 3.0178 (4.7); 2.9557 (1.0); 2.8759 (1.0); 2.3856 (16.0); 2.3063 (15.0); 2.2812 (0.4); 1.5601 (11.3); −0.0002 (16.5)
22-02: $^1$H-NMR(400.1 MHz, CDCl3):
δ = 7.6311 (5.0); 7.2619 (7.1); 7.1157 (1.9); 7.0966 (2.4); 7.0214 (2.7); 6.9844 (1.6); 6.9654 (1.2); 6.9214 (0.8); 6.9012 (0.8); 4.6932 (0.3); 4.6814 (0.5); 4.6735 (0.8); 4.6640 (0.7); 4.6544 (0.8); 4.6465 (0.5); 3.8183 (1.0); 3.8091 (1.0); 3.7896 (1.6); 3.7805 (1.5); 3.6804 (1.6); 3.6731 (1.6); 3.6518 (1.1); 3.6444 (1.1); 3.0375 (3.8); 3.0183 (2.7); 2.7604 (16.0); 2.3922 (12.8); 2.3024 (12.0); 1.5770 (8.4); −0.0002 (9.5)
22-03: $^1$H-NMR(400.1 MHz, CDCl3):
δ = 8.1668 (0.9); 8.0091 (0.5); 7.8283 (6.5); 7.3646 (3.2); 7.3137 (1.8); 7.2936 (2.1); 7.2620 (27.6); 7.1017 (3.4); 7.0815 (2.7); 6.9418 (1.0); 6.9215 (1.0); 4.6923 (0.4); 4.6714 (1.0); 4.6623 (0.8); 4.6531 (1.0); 4.6338 (0.4); 3.8111 (1.3); 3.8026 (1.3); 3.7820 (1.9); 3.7735 (1.7); 3.6539 (2.0); 3.6468 (1.9); 3.6250 (1.6); 3.6178 (1.6); 3.0516 (0.4); 3.0312 (3.8); 3.0161 (2.6); 3.0091 (2.6); 2.9756 (0.4); 2.9577 (3.2); 2.8802 (2.9); 2.4143 (16.0); 2.3922 (2.2); 1.5604 (20.4); 1.2548 (0.6); −0.0002 (33.4)
22-04: $^1$H-NMR(400.1 MHz, CDCl3):
δ = 7.6381 (5.1); 7.3565 (2.6); 7.3041 (1.3); 7.2839 (1.6); 7.2797 (1.5); 7.2627 (7.8); 7.1096 (2.6); 7.0893 (2.1); 6.9978 (0.9); 6.9765 (0.8); 4.6988 (0.3); 4.6789 (0.8); 4.6698 (0.7); 4.6604 (0.8); 3.8127 (1.1); 3.8038 (1.1); 3.7838 (1.6); 3.7750 (1.4); 3.6539 (1.6); 3.6469 (1.6); 3.6250 (1.2); 3.6179 (1.1); 3.0328 (3.8); 3.0155 (2.5); 3.0121 (2.5); 2.9556 (0.6); 2.8763 (0.6); 2.7692 (16.0); 2.4174 (13.3); 1.5769 (6.0); −0.0002 (10.2)
22-05: $^1$H-NMR(400.1 MHz, CDCl3):
δ = 18.7908 (0.3); 16.3068 (0.3); 9.4412 (0.4); 8.0243 (0.3); 8.0119 (1.0); 7.7659 (16.0); 7.5199 (0.6); 7.4619 (0.4); 7.4202 (8.7); 7.4156 (8.3); 7.3272 (0.5); 7.3005 (5.3); 7.2798 (11.9); 7.2618 (113.7); 7.2453 (6.8); 7.2406 (5.9); 7.2247 (3.0); 7.2198 (2.6); 7.1244 (0.4); 6.9987 (0.9); 6.9608 (2.2); 6.9437 (2.2); 6.8868 (0.4); 4.5419 (0.8); 4.5325 (1.1); 4.5225 (1.6); 4.5136 (2.8); 4.5036 (2.4); 4.4936 (2.6); 4.4856 (1.7); 4.4744 (1.2); 4.4673 (0.6); 3.8436 (1.8); 3.8179 (3.5); 3.7669 (3.7); 3.7607 (3.6); 3.7400 (2.0); 3.7336 (1.7); 3.7117 (0.4); 3.5758 (0.4); 3.5509 (0.4); 3.5296 (0.4); 3.5157 (0.4); 3.2221 (0.3); 3.1851 (0.5); 3.1484 (8.7); 3.1295 (8.5); 3.0928 (0.4); 2.9586 (5.4); 2.9111 (0.4); 2.8814 (5.1); 1.9549 (0.7); 1.9279 (2.4); 1.7447 (0.4); 1.6874 (0.4); 1.6781 (0.4); 1.5566 (103.3); 1.4813 (0.4); 1.3480 (0.4); 1.2869 (0.4); 1.2564 (0.9); 1.2369 (0.4); 0.8855 (0.4); 0.8455 (0.4); 0.1459 (0.8); −0.0002 (147.4); −0.1491 (0.7); −3.4400 (0.4)
22-06: $^1$H-NMR(400.1 MHz, CDCl3):
δ = 7.5766 (5.2); 7.4137 (3.0); 7.4088 (2.9); 7.3099 (1.9); 7.2894 (3.3); 7.2619 (38.8); 7.2370 (2.1); 7.2322 (1.9); 7.2165 (1.1); 7.2116 (1.1); 6.9980 (0.4); 6.9818 (0.8); 6.9619 (0.8); 4.5338 (0.4); 4.5240 (0.6); 4.5143 (1.0); 4.5039 (0.8); 4.4945 (0.9); 4.4859 (0.6); 4.4746 (0.4); 3.8543 (0.6); 3.8283 (1.1); 3.7658 (1.1); 3.7338 (0.6); 3.1495 (4.1); 3.1305 (3.9); 2.9584 (1.6); 2.8825 (1.5); 2.7561 (16.0); 2.7243 (1.1); 2.1569 (0.8); 1.5602 (30.8); 1.2889 (0.5); 1.2726 (0.5); 1.1257 (0.4); 1.1093 (0.4); −0.0002 (50.5)
TABLE 37
Compounds according to formula (23)
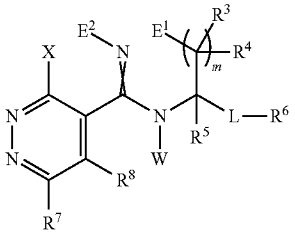
(23)
| Ex No | $R^7$ | $R^8$ | X | 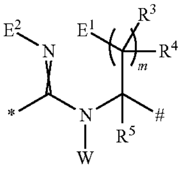 | L—$R^6$ | LogP |
|---|---|---|---|---|---|---|
| 23-01 | Cl | H | Cl | 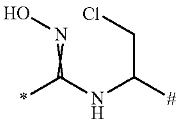 | (2,4-dimethylphenyl)methyl | 3.40[a] |
| 23-02 | Cl | H | Cl | 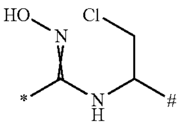 | (4-bromo-2-methylphenyl)methyl | 3.54[a] |

TABLE 37-continued
Compounds according to formula (23)
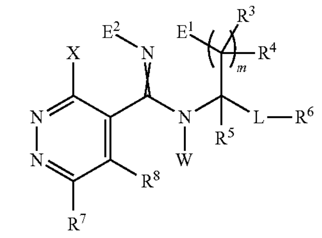
(23)
| Ex No | $R^7$ | $R^8$ | X | 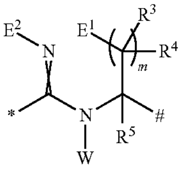 | L—$R^6$ | LogP |
|---|---|---|---|---|---|---|
| 23-03 | $CH_3$ | H | Cl | 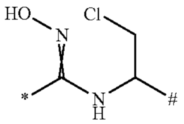 | (4-bromo-2-methylphenyl)methyl | 2.98[a] |
| 23-04 | Cl | H | Cl | 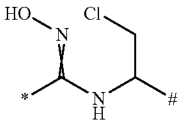 | (2,4-dichlorophenyl)methyl | 3.54[a] |
| 23-05 | $CH_3$ | H | Cl | 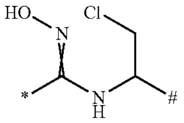 | (2,4-dichlorophenyl)methyl | 2.95[a] |
In table 37, "#" denotes the point of attachment to the L—$R^6$ group and "*" denotes the point of attachment to the pyridazin-4-yl group.
TABLE 38
23-05: $^1$H-NMR(400.1 MHz, CDCl3):
δ = 7.6204 (0.4); 7.4786 (0.3); 7.4252 (0.8); 7.3994 (0.6); 7.3891 (0.6); 7.3660 (0.5); 7.3395 (0.7); 7.3170 (1.1); 7.2981 (4.5); 7.2937 (5.0); 7.2618 (35.2); 7.2446 (3.6); 7.2282 (1.0); 7.1930 (4.7); 7.1726 (3.0); 7.1594 (1.6); 7.1347 (0.9); 7.1108 (0.9); 7.0865 (2.1); 7.0495 (0.4); 6.9975 (0.8); 6.4099 (1.0); 5.7768 (1.4); 5.7485 (1.4); 5.3015 (1.8); 4.8146 (0.9); 3.9885 (1.3); 3.9436 (1.4); 3.8619 (1.1); 3.8519 (1.1); 3.8327 (1.3); 3.8249 (1.4); 3.7953 (0.4); 3.7766 (0.3); 3.7351 (0.3); 3.7169 (0.4); 3.6961 (0.5); 3.6750 (1.6); 3.6682 (1.6); 3.6468 (1.3); 3.6399 (1.2); 3.4547 (1.2); 3.4257 (0.7); 3.4152 (0.4); 3.1434 (0.4); 3.1253 (0.4); 3.0425 (1.3); 3.0294 (1.3); 3.0075 (2.0); 2.9956 (1.7); 2.9346 (1.8); 2.9120 (1.6); 2.9008 (1.1); 2.8785 (0.9); 2.7647 (1.2); 2.7527 (0.4); 2.7387 (0.5); 2.7243 (0.8); 2.6389 (16.0); 2.3125 (2.6); 2.2921 (0.5); 2.2428 (2.5); 2.2073 (0.4); 2.1827 (0.4); 2.1544 (0.4); 2.1352 (0.4); 2.0808 (0.5); 1.9494 (0.4); 1.9100 (0.5); 1.8657 (0.6); 1.8472 (0.6); 1.8433 (0.6); 1.6803 (1.4); 1.6586 (1.5); 1.6427 (1.5); 1.5923 (1.6); 1.5746 (1.9); 1.5584 (2.0); 1.5424 (1.8); 1.4477 (1.0); 1.4293 (1.0); 1.3756 (0.8); 1.2541 (8.4); 1.2070 (1.5); 1.1365 (0.8); 1.1258 (0.8); 1.1101 (0.8); 1.0896 (0.6); 1.0386 (0.5); 1.0184 (0.5); 1.0044 (0.5); 0.9810 (0.5); 0.8797 (1.8); 0.8582 (2.9); 0.8425 (3.0); −0.0002 (37.0)

TABLE 39

Compounds according to formula (25)

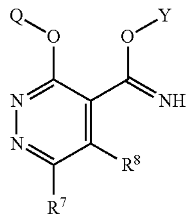

(25)

| Ex No | $R^7$ | $R^8$ | Q | Y | LogP |
|---|---|---|---|---|---|
| 25-01 | Cl | H | 3-cyclopropylphenyl | $CH_3$ | 3.08[a] |
| 25-02 | Cl | H | 3-(trifluoromethyl)phenyl | $CH_3$ | 3.00[a] |

TABLE 40

25-02: $^1$H-NMR(300.2 MHz, CDCl3):
δ = 8.3217 (0.8); 8.2067 (0.3); 7.9791 (1.3); 7.9518 (5.6); 7.9445 (3.3); 7.8565 (0.4); 7.8352 (4.0); 7.8335 (4.2); 7.8211 (1.1); 7.7997 (0.6); 7.6983 (0.8); 7.6463 (0.8); 7.6264 (3.1); 7.6051 (6.6); 7.5701 (2.2); 7.5341 (4.0); 7.4973 (0.7); 7.4804 (1.8); 7.4711 (2.6); 7.4637 (2.5); 7.4507 (1.9); 7.3467 (1.2); 7.3206 (2.6); 7.2997 (4.1); 7.1607 (2.8); 7.1326 (4.4); 7.0469 (1.8); 7.0194 (1.6); 4.5171 (0.5); 4.4932 (0.4); 4.4743 (0.6); 4.4604 (0.4); 4.4508 (2.0); 4.4367 (0.5); 4.4271 (2.0); 4.4127 (0.7); 4.4036 (0.8); 4.3890 (1.7); 4.3653 (1.4); 4.3435 (1.0); 4.3167 (10.9); 4.3132 (9.9); 4.2989 (3.0); 4.2520 (3.8); 4.2483 (3.6); 4.2031 (0.3); 4.1751 (0.5); 4.0500 (3.8); 4.0223 (16.0); 4.0078 (1.7); 3.9919 (3.4); 3.9624 (10.8); 2.0707 (1.2); 1.5051 (1.8); 1.4812 (4.3); 1.4655 (1.7); 1.4570 (3.6); 1.4422 (3.2); 1.4333 (2.0); 1.4185 (1.8); 1.4101 (1.0); 1.2849 (0.4); 1.2739 (0.4); 0.0297 (3.2)

TABLE 41

Compounds according to formula (30)

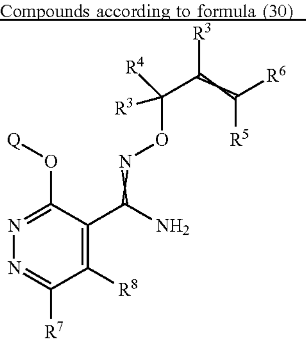

(30)

| Ex No | $R^7$ | $R^8$ | Q | 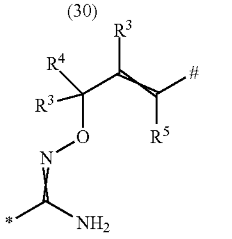 | $R^6$ | LogP |
|---|---|---|---|---|---|---|
| 30-01 | $CH_3$ | H | 3-(trifluoro-methyl)phenyl | 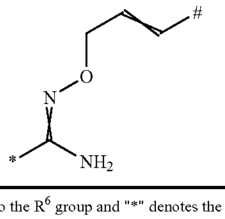 | 1-methyl-1H-indol-5-yl | 3.92[a] |

In table 41, "#" denotes the point of attachment to the $R^6$ group and "*" denotes the point of attachment to the pyridazin-4-yl group.

TABLE 42

| |
|---|
| 30-01: $^1$H-NMR(400.1 MHz, $d_6$-DMSO): |
| δ = 7.9615 (2.0); 7.7306 (6.3); 7.7206 (3.1); 7.6923 (2.0); 7.6727 (1.9); 7.6479 (2.4); 7.6283 (1.3); 7.5904 (1.7); 7.5736 (4.3); 7.4225 (0.4); 7.4047 (1.5); 7.3833 (2.8); 7.3375 (2.3); 7.3157 (4.2); 7.3081 (3.3); 6.7820 (1.5); 6.7422 (1.9); 6.4213 (3.9); 6.4019 (3.6); 6.3940 (3.2); 6.3874 (1.9); 6.3715 (0.8); 6.3636 (0.8); 6.3475 (1.2); 6.3319 (0.6); 4.6461 (3.1); 4.6307 (3.1); 3.7957 (1.3); 3.7839 (16.0); 3.7691 (1.4); 3.3382 (32.0); 2.8983 (11.7); 2.7392 (10.7); 2.5978 (1.3); 2.5873 (14.6); 2.5735 (1.6); 2.5143 (10.9); 2.5102 (14.5); 2.5061 (11.3) |

Biological Data

The advanced fungicidal activity of the active compound combinations according to the invention is evident from the example below. While the individual active compounds exhibit weaknesses with regard to the fungicidal activity, the combinations have an activity, which exceeds a simple addition of activities.

A synergistic effect of fungicides is always present, when the fungicidal activity of the active compound combinations exceeds the total of activities of the active compounds when applied individually. The expected activity for a given combination of two active compounds can be calculated as follows (cf. Colby, S. R., "Calculating Synergistic and Antagonistic Responses of Herbicide Combinations", *Weeds* 1967, 15, 20-22):

If

X is the efficacy when active compound A is applied at an application rate of m ppm (or g/ha), Y is the efficacy when active compound B is applied at an application rate of n ppm (or g/ha), E is the efficacy when the active compounds A and B are applied at application rates of m and n ppm (or g/ha), respectively, and then $$E = X + Y - \frac{X \cdot Y}{100}$$

The degree of efficacy expressed in % is denoted: 0% means an efficacy, which corresponds to that of the control, while an efficacy of 100% means that no disease is observed.

If the actual fungicidal activity exceeds the calculated value, then the activity of the combination is super-additive, i.e. a synergistic effect exists. In this case, the efficacy, which was actually observed, must be greater than the value for the expected efficacy (E), that was calculated from the above-mentioned formula.

A further way of demonstrating a synergistic effect is the method of Tammes (cf. "Isoboles, a graphic representation of synergism in pesticides" in *Neth. J. Plant Path.*, 1964, 70, 73-80).

The invention is illustrated by the following examples. However, the invention is not limited to the examples.

Example: In Vitro-Test with Fungal Microorganisms

Method A

Wells of 96-well microtiter plates are filled with 10 µl of a preparation of test compound or compound combination in methanol+emulsifier alkylaryl-polyglycol-ether. Thereafter, the solvent is evaporated in a hood. At the next step, 100 µl of liquid potato dextrose medium is given into each well, that has been amended with an appropriate concentration of spores or mycelium suspension of the test fungus.

With the aid of a photometer, the extinction in all wells is measured at the wavelength of 620 nm.

The microtiter plates are incubated at 20° C. and 85% relative humidity. The inhibition of growth is determined again photometrically 3-5 days after the application. Efficacy is calculated in relation to the untreated control, 0% efficacy means fungal growth as high as in untreated control while 100% efficacy means no fungal growth is measured.

Method B

Wells of 96-well microtiter plates are filled with 30 µl of a preparation of test compound or compound combination in methanol+emulsifier alkylaryl-polyglycol-ether. Thereafter, the solvent is evaporated in a hood. At the next step, 200 µl of liquid growth medium is given, that has been amended with an appropriate concentration of spores or mycelium suspension of the test fungus.

With the aid of a photometer, the extinction in all wells is measured at the wavelength of 600 nm.

The microtiter plates are incubated for 3 to 7 days at 20° C. and 85% relative humidity. After the incubation inhibition of growth is determined photometrically. Efficacy is calculated in relation to the untreated control, 0% efficacy means fungal growth as high as in untreated control while 100% efficacy means no fungal growth is measured.

The data in tables A1 to A12, B1 to B14, C1 to C10, D1 to D8, E1 to E8, F1 to F11, G1 to G4, H1 to H4 and I1 to I5 were collected according to Method A. The data in tables A13 to A22, B15 to B18, C11 to C20, E9 to E16, F12 to F15, G5 to G15, H5 to H8, I6 to I11 and J1 to J11 were collected according to Method B.

TABLE A1 in vitro -Test with *Alternaria alternate*

| (I-052) (ppm) | (7.005) pyrimethanil (ppm) | (2.002) bixafen (ppm) | (2.005) fluopyram (ppm) | (2.028) inpyrfluxam (ppm) | Ratio | Efficacy % | Colby expected value % |
|---|---|---|---|---|---|---|---|
| 0.1 | | | | | | 72 | |
| 0.02 | | | | | | 9 | |
| 0.004 | | | | | | 0 | |
| 0.0008 | | | | | | 2 | |
| | 20 | | | | | 82 | |
| | 4 | | | | | 93 | |
| | 0.8 | | | | | 0 | |
| | 0.16 | | | | | 0 | |
| | | 1.0 | | | | 46 | |
| | | 0.2 | | | | 66 | |
| | | 0.04 | | | | 23 | |
| | | 0.008 | | | | 29 | |
| | | | 20.0 | | | 82 | |
| | | | 4.0 | | | 63 | |
| | | | 0.8 | | | 57 | |
| | | | 0.16 | | | 17 | |
| | | | | 1.0 | | 80 | |
| | | | | 0.2 | | 22 | |
| | | | | 0.04 | | 10 | |
| | | | | 0.008 | | 0 | |
| 0.1 | 20 | | | | 1:200 | 99 | 95 |
| 0.1 | 4 | | | | 1:40 | 99 | 98 |
| 0.1 | 0.8 | | | | 1:8 | 91 | 72 |
| 0.1 | 0.16 | | | | 1:1.6 | 100 | 72 |
| 0.1 | | 1.0 | | | 1:10 | 100 | 85 |

TABLE A1-continued in vitro -Test with *Alternaria alternate*

| (I-052) (ppm) | (7.005) pyri-methanil (ppm) | (2.002) bixafen (ppm) | (2.005) fluo-pyram (ppm) | (2.028) inpyr-fluxam (ppm) | Ratio | Effi-cacy % | Colby expected value % |
|---|---|---|---|---|---|---|---|
| 0.1 | | 0.2 | | | 1:2 | 99 | 91 |
| 0.1 | | 0.04 | | | 1:0.4 | 99 | 79 |
| 0.1 | | 0.008 | | | 1:0.08 | 100 | 80 |
| 0.1 | | | 20.0 | | 1:200 | 100 | 95 |
| 0.1 | | | 4.0 | | 1:40 | 99 | 90 |
| 0.1 | | | 0.8 | | 1:8 | 100 | 88 |
| 0.1 | | | 0.16 | | 1:1.6 | 100 | 77 |
| 0.1 | | | | 1.0 | 1:10 | 99 | 95 |
| 0.1 | | | | 0.2 | 1:2 | 100 | 78 |
| 0.1 | | | | 0.04 | 1:0.4 | 99 | 75 |
| 0.1 | | | | 0.008 | 1:0.08 | 100 | 72 |

TABLE A2 in vitro -Test with *Alternaria alternate*

| (I-052) (ppm) | (2.038) isoflucy-pram (ppm) | (3.025) fenpi-coxamid (ppm) | (3.020) trifloxy-strobin (ppm) | (1.002) difeno-conazole (ppm) | Ratio | Effi-cacy % | Colby expected value % |
|---|---|---|---|---|---|---|---|
| 0.1 | | | | | | 72 | |
| 0.02 | | | | | | 9 | |
| 0.004 | | | | | | 0 | |
| 0.0008 | | | | | | 2 | |
| | 1.0 | | | | | 82 | |
| | 0.2 | | | | | 77 | |
| | 0.04 | | | | | 70 | |
| | 0.008 | | | | | 43 | |
| | | 5.0 | | | | 76 | |
| | | 1.0 | | | | 41 | |
| | | 0.2 | | | | 2 | |
| | | 0.04 | | | | 5 | |
| | | | 1.0 | | | 96 | |
| | | | 0.2 | | | 95 | |
| | | | 0.04 | | | 87 | |
| | | | 0.008 | | | 44 | |
| | | | | 1.0 | | 96 | |
| | | | | 0.2 | | 28 | |
| | | | | 0.04 | | 10 | |
| | | | | 0.008 | | 27 | |
| 0.02 | 1.0 | | | | 1:50 | 95 | 82 |
| 0.02 | 0.2 | | | | 1:10 | 96 | 77 |
| 0.02 | 0.04 | | | | 1:2 | 73 | 70 |
| 0.02 | 0.008 | | | | 1:0.4 | 70 | 43 |
| 0.02 | | 5.0 | | | 1:250 | 79 | 76 |
| 0.02 | | 1.0 | | | 1:50 | 54 | 41 |
| 0.02 | | 0.2 | | | 1:10 | 38 | 2 |
| 0.02 | | 0.04 | | | 1:2 | 25 | 5 |
| 0.02 | | | 1.0 | | 1:50 | 99 | 96 |
| 0.02 | | | 0.2 | | 1:10 | 97 | 95 |
| 0.02 | | | 0.04 | | 1:2 | 95 | 87 |
| 0.02 | | | 0.008 | | 1:0.4 | 68 | 44 |
| 0.004 | | | | 1.0 | 1:250 | 93 | 96 |
| 0.004 | | | | 0.2 | 1:50 | 58 | 28 |
| 0.004 | | | | 0.04 | 1:10 | 22 | 10 |
| 0.004 | | | | 0.008 | 1:2 | 13 | 27 |

TABLE A3 in vitro -Test with Alternaria alternate

| (I-052) (ppm) | (5.012) folpet (ppm) | (5.018) propineb (ppm) | Ratio | Efficacy % | Colby expected value % |
|---|---|---|---|---|---|
| 0.1 | | | | 72 | |
| 0.02 | | | | 9 | |
| 0.004 | | | | 0 | |
| 0.0008 | | | | 2 | |
| | 10.0 | | | 100 | |
| | 2.0 | | | 100 | |
| | 0.4 | | | 20 | |
| | 0.08 | | | 4 | |
| | | 100.0 | | 98 | |
| | | 20.0 | | 69 | |
| | | 4.0 | | 15 | |
| | | 0.8 | | 15 | |
| 0.02 | 10.0 | | 1:500 | 100 | 100 |
| 0.02 | 2.0 | | 1:100 | 100 | 100 |
| 0.02 | 0.4 | | 1:20 | 53 | 30 |
| 0.02 | 0.08 | | 1:4 | 47 | 16 |
| 0.02 | | 100.0 | 1:5000 | 95 | 99 |
| 0.02 | | 20.0 | 1:1000 | 86 | 79 |
| 0.02 | | 4.0 | 1:200 | 75 | 41 |
| 0.02 | | 0.8 | 1:40 | 39 | 41 |

TABLE A4 in vitro -Test with *Alternaria alternate*

| (I-300) (ppm) | (7.005) pyri-methanil (ppm) | (2.005) fluo-pyram (ppm) | (2.038) isoflu-cypram (ppm) | Ratio | Efficacy % | Colby expected value % |
|---|---|---|---|---|---|---|
| 0.1 | | | | | 100 | |
| 0.02 | | | | | 48 | |
| 0.004 | | | | | 19 | |
| 0.0008 | | | | | 7 | |
| | 20.0 | | | | 100 | |
| | 4.0 | | | | 100 | |
| | 0.8 | | | | 100 | |
| | 0.16 | | | | 43 | |
| | | 20.0 | | | 99 | |
| | | 4.0 | | | 80 | |
| | | 0.8 | | | 86 | |
| | | 0.16 | | | 76 | |
| | | | 1.0 | | 84 | |
| | | | 0.2 | | 85 | |
| | | | 0.04 | | 71 | |
| | | | 0.008 | | 52 | |
| 0.02 | 20.0 | | | 1:1000 | 100 | 100 |
| 0.02 | 4.0 | | | 1:200 | 100 | 100 |
| 0.02 | 0.8 | | | 1:40 | 100 | 100 |
| 0.02 | 0.16 | | | 1:8 | 97 | 71 |
| 0.0008 | 20.0 | | | 1:25000 | 100 | 100 |
| 0.0008 | 4.0 | | | 1:5000 | 99 | 100 |
| 0.0008 | 0.8 | | | 1:1000 | 100 | 100 |
| 0.0008 | 0.16 | | | 1:200 | 84 | 47 |
| 0.0008 | | 20.0 | | 1:25000 | 94 | 99 |
| 0.0008 | | 4.0 | | 1:5000 | 86 | 82 |
| 0.0008 | | 0.8 | | 1:1000 | 91 | 87 |
| 0.0008 | | 0.16 | | 1:200 | 81 | 78 |
| 0.02 | | | 1.0 | 1:50 | 87 | 84 |
| 0.02 | | | 0.2 | 1:10 | 86 | 85 |
| 0.02 | | | 0.04 | 1:2 | 76 | 71 |
| 0.02 | | | 0.008 | 1:0.4 | 57 | 52 |

TABLE A5

| in vitro -Test with *Alternaria alternate* | | | | | | | |
|---|---|---|---|---|---|---|---|
| (I-300) (ppm) | (3.020) trifloxy-strobin (ppm) | (1.002) difeno-conazole (ppm) | (1.055) mefentriflu-conazole (ppm) | (1.018) prothio-conazole (ppm) | Ratio | Efficacy % | Colby expected value % |
| 0.1 | | | | | | 100 | |
| 0.02 | | | | | | 0 | |
| 0.004 | | | | | | 1 | |
| 0.0008 | | | | | | 20 | |
| | 1.0 | | | | | 99 | |
| | 0.2 | | | | | 97 | |
| | 0.04 | | | | | 78 | |
| | 0.008 | | | | | 51 | |
| | | 1.0 | | | | 91 | |
| | | 0.2 | | | | 39 | |
| | | 0.04 | | | | 17 | |
| | | 0.008 | | | | 2 | |
| | | | 1.0 | | | 100 | |
| | | | 0.2 | | | 96 | |
| | | | 0.04 | | | 58 | |
| | | | 0.008 | | | 9 | |
| | | | | 1.0 | | 100 | |
| | | | | 0.2 | | 94 | |
| | | | | 0.04 | | 15 | |
| | | | | 0.008 | | 20 | |
| 0.02 | 1.0 | | | | 1:50 | 98 | 99 |
| 0.02 | 0.2 | | | | 1:10 | 97 | 97 |
| 0.02 | 0.04 | | | | 1:2 | 91 | 78 |
| 0.02 | 0.008 | | | | 1:0.4 | 66 | 51 |
| 0.02 | | 1.0 | | | 1:50 | 96 | 91 |
| 0.02 | | 0.2 | | | 1:10 | 49 | 39 |
| 0.02 | | 0.04 | | | 1:2 | 21 | 17 |
| 0.02 | | 0.008 | | | 1:0.4 | 9 | 2 |
| 0.02 | | | 1.0 | | 1:50 | 100 | 100 |
| 0.02 | | | 0.2 | | 1:10 | 100 | 96 |
| 0.02 | | | 0.04 | | 1:2 | 95 | 59 |
| 0.02 | | | 0.008 | | 1:0.4 | 8 | 11 |
| 0.02 | | | | 1.0 | 1:50 | 100 | 100 |
| 0.02 | | | | 0.2 | 1:10 | 100 | 94 |
| 0.02 | | | | 0.04 | 1:2 | 27 | 17 |
| 0.02 | | | | 0.008 | 1:0.4 | 52 | 22 |

TABLE A6

| in vitro -Test with *Alternaria alternate* | | | | | | | |
|---|---|---|---|---|---|---|---|
| (I-300) (ppm) | (1.020) spirox-amine (ppm) | (15.064) (ppm) | (13.001) fludi-oxonil (ppm) | (13.004) proqui-nazid (ppm) | Ratio | Efficacy % | Colby expected value % |
| 0.1 | | | | | | 84 | |
| 0.02 | | | | | | 0 | |
| 0.004 | | | | | | 2 | |
| 0.0008 | | | | | | 0 | |
| | 20.0 | | | | | 16 | |
| | 4.0 | | | | | 12 | |
| | 0.8 | | | | | 18 | |
| | 0.16 | | | | | 0 | |
| | | 10.0 | | | | 50 | |
| | | 2.0 | | | | 12 | |
| | | 0.4 | | | | 5 | |
| | | 0.08 | | | | 2 | |
| | | | 5.0 | | | 100 | |
| | | | 1.0 | | | 97 | |
| | | | 0.2 | | | 17 | |
| | | | 0.04 | | | 9 | |
| | | | | 10.0 | | 9 | |
| | | | | 2.0 | | 0 | |
| | | | | 0.4 | | 6 | |
| | | | | 0.08 | | 19 | |
| 0.1 | 20.0 | | | | 1:200 | 98 | 87 |
| 0.1 | 4.0 | | | | 1:40 | 100 | 86 |
| 0.1 | 0.8 | | | | 1:8 | 100 | 87 |

TABLE A6-continued

| in vitro -Test with *Alternaria alternate* | | | | | | | |
|---|---|---|---|---|---|---|---|
| (I-300) (ppm) | (1.020) spirox-amine (ppm) | (15.064) (ppm) | (13.001) fludi-oxonil (ppm) | (13.004) proqui-nazid (ppm) | Ratio | Efficacy % | Colby expected value % |
| 0.1 | 0.16 | | | | 1:1.6 | 99 | 84 |
| 0.1 | | 10.0 | | | 1:200 | 87 | 50 |
| 0.1 | | 2.0 | | | 1:40 | 16 | 12 |
| 0.1 | | 0.4 | | | 1:8 | 7 | 5 |
| 0.1 | | 0.08 | | | 1:1.6 | 9 | 2 |
| 0.1 | | | 5.0 | | 1:50 | 100 | 100 |
| 0.1 | | | 1.0 | | 1:10 | 100 | 100 |
| 0.1 | | | 0.2 | | 1:2 | 98 | 87 |
| 0.1 | | | 0.04 | | 1:0.4 | 97 | 85 |
| 0.1 | | | | 10.0 | 1:100 | 100 | 85 |
| 0.1 | | | | 2.0 | 1:20 | 100 | 84 |
| 0.1 | | | | 0.4 | 1:4 | 100 | 85 |
| 0.1 | | | | 0.08 | 1:0.8 | 100 | 87 |

TABLE A7

| in vitro -Test with *Alternaria alternate* | | | | | | |
|---|---|---|---|---|---|---|
| (I-300) (ppm) | (5.003) captan (ppm) | (5.012) folpet (ppm) | (15.016) metra-fenone (ppm) | Ratio | Efficacy % | Colby expected value % |
| 0.1 | | | | | 100 | |
| 0.02 | | | | | 2 | |
| 0.004 | | | | | 0 | |
| 0.0008 | | | | | 0 | |
| | 20.0 | | | | 56 | |
| | 4.0 | | | | 46 | |
| | 0.8 | | | | 0 | |
| | 0.16 | | | | 4 | |
| | | 10.0 | | | 100 | |
| | | 2.0 | | | 100 | |
| | | 0.4 | | | 7 | |
| | | 0.08 | | | 0 | |
| | | | 20.0 | | 11 | |
| | | | 4.0 | | 0 | |
| | | | 0.8 | | 0 | |
| | | | 0.16 | | 0 | |
| 0.02 | 20.0 | | | 1:200 | 100 | 57 |
| 0.02 | 4.0 | | | 1:40 | 86 | 47 |
| 0.02 | 0.8 | | | 1:8 | 7 | 2 |
| 0.02 | 0.16 | | | 1:1.6 | 6 | 6 |
| 0.0008 | 20.0 | | | 1:25000 | 95 | 56 |
| 0.0008 | 4.0 | | | 1:5000 | 78 | 46 |
| 0.0008 | 0.8 | | | 1:1000 | 19 | 0 |
| 0.0008 | 0.16 | | | 1:200 | 0 | 4 |
| 0.02 | | 10.0 | | 1:500 | 100 | 100 |
| 0.02 | | 2.0 | | 1:100 | 100 | 100 |
| 0.02 | | 0.4 | | 1:20 | 31 | 9 |
| 0.02 | | 0.08 | | 1:4 | 21 | 2 |
| 0.0008 | | 10.0 | | 1:12500 | 100 | 100 |
| 0.0008 | | 2.0 | | 1:2500 | 100 | 100 |
| 0.0008 | | 0.4 | | 1:500 | 8 | 7 |
| 0.0008 | | 0.08 | | 1:100 | 0 | 0 |
| 0.004 | | | 20.0 | 1:5000 | 51 | 11 |
| 0.004 | | | 4.0 | 1:1000 | 14 | 0 |
| 0.004 | | | 0.8 | 1:200 | 10 | 0 |
| 0.004 | | | 0.16 | 1:40 | 0 | 0 |

TABLE A8

| in vitro -Test with *Alternaria alternate* | | | | | | | |
|---|---|---|---|---|---|---|---|
| (I-300) (ppm) | (1.020) spirox-amine (ppm) | (15.064) (ppm) | (13.001) fludi-oxonil (ppm) | (13.004) proqui-nazid (ppm) | Ratio | Effi-cacy % | Colby expected value % |
| 0.1 | | | | | | 84 | |
| 0.02 | | | | | | 0 | |
| 0.004 | | | | | | 2 | |
| 0.0008 | | | | | | 0 | |
| | 20.0 | | | | | 16 | |
| | 4.0 | | | | | 12 | |
| | 0.8 | | | | | 18 | |
| | 0.16 | | | | | 0 | |
| | | 10.0 | | | | 50 | |
| | | 2.0 | | | | 12 | |
| | | 0.4 | | | | 5 | |
| | | 0.08 | | | | 2 | |
| | | | 5.0 | | | 100 | |
| | | | 1.0 | | | 97 | |
| | | | 0.2 | | | 17 | |
| | | | 0.04 | | | 9 | |
| | | | | 10.0 | | 9 | |
| | | | | 2.0 | | 0 | |
| | | | | 0.4 | | 6 | |
| | | | | 0.08 | | 19 | |
| 0.1 | 20.0 | | | | 1:200 | 98 | 87 |
| 0.1 | 4.0 | | | | 1:40 | 100 | 86 |
| 0.1 | 0.8 | | | | 1:8 | 100 | 87 |
| 0.1 | 0.16 | | | | 1:1.6 | 99 | 84 |
| 0.1 | | 10.0 | | | 1:200 | 87 | 50 |
| 0.1 | | 2.0 | | | 1:40 | 16 | 12 |
| 0.1 | | 0.4 | | | 1:8 | 7 | 5 |
| 0.1 | | 0.08 | | | 1:1.6 | 9 | 2 |
| 0.1 | | | 5.0 | | 1:50 | 100 | 100 |
| 0.1 | | | 1.0 | | 1:10 | 100 | 100 |
| 0.1 | | | 0.2 | | 1:2 | 98 | 87 |
| 0.1 | | | 0.04 | | 1:0.4 | 97 | 85 |
| 0.1 | | | | 10.0 | 1:100 | 100 | 85 |
| 0.1 | | | | 2.0 | 1:20 | 100 | 84 |
| 0.1 | | | | 0.4 | 1:4 | 100 | 85 |
| 0.1 | | | | 0.08 | 1:0.8 | 100 | 87 |

TABLE A9 in vitro -Test with Alternaria alternate

| (I-300) (ppm) | (5.012) folpet (ppm) | (15.016) metrafenone (ppm) | Ratio | Efficacy % | Colby expected value % |
|---|---|---|---|---|---|
| 0.1 | | | | 84 | |
| 0.02 | | | | 0 | |
| 0.004 | | | | 2 | |
| 0.0008 | | | | 0 | |
| | 10.0 | | | 100 | |
| | 2.0 | | | 100 | |
| | 0.4 | | | 7 | |
| | 0.08 | | | 0 | |
| | | 20.0 | | 11 | |
| | | 4.0 | | 0 | |
| | | 0.8 | | 0 | |
| | | 0.16 | | 0 | |
| 0.02 | 10.0 | | 1:500 | 100 | 100 |
| 0.02 | 2.0 | | 1:100 | 100 | 100 |
| 0.02 | 0.4 | | 1:20 | 31 | 9 |
| 0.02 | 0.08 | | 1:4 | 21 | 2 |
| 0.004 | 10.0 | | 1:12500 | 100 | 100 |
| 0.004 | 2.0 | | 1:2500 | 100 | 100 |
| 0.004 | 0.4 | | 1:500 | 8 | 7 |
| 0.004 | 0.08 | | 1:100 | 0 | 0 |
| 0.004 | | 20.0 | 1:5000 | 51 | 11 |
| 0.004 | | 4.0 | 1:1000 | 14 | 0 |
| 0.004 | | 0.8 | 1:200 | 10 | 0 |
| 0.004 | | 0.16 | 1:40 | 0 | 0 |

TABLE A10 in vitro -Test with *Alternaria alternate*

| (I-302) (ppm) | (7.005) pyrime-thanil (ppm) | (2.028) inpyr-fluxam (ppm) | (2.038) isoflu-cypram (ppm) | Ratio | Efficacy % | Colby expected value % |
|---|---|---|---|---|---|---|
| 0.1 | | | | | 100 | |
| 0.02 | | | | | 36 | |
| 0.004 | | | | | 6 | |
| 0.0008 | | | | | 9 | |
| | 20.0 | | | | 100 | |
| | 4.0 | | | | 100 | |
| | 0.8 | | | | 100 | |
| | 0.16 | | | | 58 | |
| | | 1.0 | | | 80 | |
| | | 0.2 | | | 67 | |
| | | 0.04 | | | 62 | |
| | | 0.008 | | | 0 | |
| | | | 0.2 | | 83 | |
| | | | 0.04 | | 74 | |
| | | | 0.008 | | 43 | |
| 0.02 | 20.0 | | | 1:1000 | 100 | 100 |
| 0.02 | 4.0 | | | 1:200 | 100 | 100 |
| 0.02 | 0.8 | | | 1:40 | 100 | 100 |
| 0.02 | 0.16 | | | 1:8 | 100 | 94 |
| 0.0008 | 20.0 | | | 1:25000 | 100 | 100 |
| 0.0008 | 4.0 | | | 1:5000 | 100 | 100 |
| 0.0008 | 0.8 | | | 1:1000 | 100 | 100 |
| 0.0008 | 0.16 | | | 1:200 | 93 | 58 |
| 0.0008 | | 1.0 | | 1:1250 | 84 | 80 |
| 0.0008 | | 0.2 | | 1:250 | 71 | 67 |
| 0.0008 | | 0.04 | | 1:50 | 67 | 62 |
| 0.0008 | | 0.008 | | 1:10 | 14 | 0 |
| 0.1 | | | 0.2 | 1:2 | 100 | 100 |
| 0.1 | | | 0.04 | 1:0.4 | 100 | 100 |
| 0.1 | | | 0.008 | 1:0.08 | 100 | 100 |
| 0.02 | | | 0.2 | 1:10 | 88 | 85 |
| 0.02 | | | 0.04 | 1:2 | 79 | 78 |
| 0.02 | | | 0.008 | 1:0.4 | 71 | 51 |
| 0.004 | | | 0.2 | 1:50 | 89 | 83 |
| 0.004 | | | 0.04 | 1:10 | 72 | 74 |
| 0.004 | | | 0.008 | 1:2 | 68 | 43 |
| 0.0008 | | | 0.2 | 1:250 | 93 | 86 |
| 0.0008 | | | 0.04 | 1:50 | 79 | 80 |
| 0.0008 | | | 0.008 | 1:10 | 60 | 55 |

TABLE A11 in vitro -Test with *Alternaria alternate*

| (I-302) (ppm) | (3.025) fenpicoxamid (ppm) | (3.020) trifloxystrobin (ppm) | (1.055) mefen-trifluconazole (ppm) | Ratio | Efficacy % | Colby expected value % |
|---|---|---|---|---|---|---|
| 0.1 | | | | | 100 | |
| 0.02 | | | | | 36 | |
| 0.004 | | | | | 6 | |
| 0.0008 | | | | | 9 | |
| | 5.0 | | | | 59 | |
| | 1.0 | | | | 30 | |
| | 0.2 | | | | 7 | |
| | 0.04 | | | | 9 | |
| | | 1.0 | | | 96 | |
| | | 0.2 | | | 98 | |
| | | 0.04 | | | 79 | |
| | | 0.008 | | | 58 | |
| | | | 1.0 | | 99 | |
| | | | 0.2 | | 100 | |
| | | | 0.04 | | 32 | |
| 0.02 | 5.0 | | | 1:250 | 71 | 65 |
| 0.02 | 1.0 | | | 1:50 | 55 | 40 |
| 0.02 | 0.2 | | | 1:10 | 39 | 20 |
| 0.02 | 0.04 | | | 1:2 | 31 | 22 |
| 0.02 | | 1.0 | | 1:50 | 100 | 97 |
| 0.02 | | 0.2 | | 1:10 | 93 | 98 |
| 0.02 | | 0.04 | | 1:2 | 86 | 82 |
| 0.02 | | 0.008 | | 1:0.4 | 83 | 64 |
| 0.004 | | 1.0 | | 1:250 | 99 | 96 |

TABLE A11-continued in vitro -Test with *Alternaria alternate*

| (I-302) (ppm) | (3.025) fenpicoxamid (ppm) | (3.020) trifloxystrobin (ppm) | (1.055) mefen-trifluconazole (ppm) | Ratio | Efficacy % | Colby expected value % |
|---|---|---|---|---|---|---|
| 0.004 | | 0.2 | | 1:50 | 96 | 98 |
| 0.004 | | 0.04 | | 1:10 | 80 | 79 |
| 0.004 | | 0.008 | | 1:2 | 68 | 58 |
| 0.02 | | | 1.0 | 1:50 | 100 | 99 |
| 0.02 | | | 0.2 | 1:10 | 100 | 100 |
| 0.02 | | | 0.04 | 1:2 | 48 | 35 |
| 0.004 | | | 1.0 | 1:250 | 100 | 99 |
| 0.004 | | | 0.2 | 1:50 | 100 | 100 |
| 0.004 | | | 0.04 | 1:10 | 68 | 36 |
| 0.0008 | | | 1.0 | 1:1250 | 100 | 99 |
| 0.0008 | | | 0.2 | 1:250 | 100 | 100 |
| 0.0008 | | | 0.04 | 1:50 | 55 | 32 |

TABLE A12 in vitro-Test with *Alternaria alternate*

| (I-302) (ppm) | (1.021) tebuconazole (ppm) | (1.020) spiroxamine (ppm) | (13.001) fludioxonil (ppm) | (5.003) captan (ppm) | (5.018) pro-pineb (ppm) | (A1.5) *Paenibacillus terrae* (ppm) | Ratio | Efficacy % | Colby expected value % |
|---|---|---|---|---|---|---|---|---|---|
| 0.1 | | | | | | | | 100 | |
| 0.02 | | | | | | | | 36 | |
| 0.004 | | | | | | | | 6 | |
| 0.0008 | | | | | | | | 9 | |
| | 1.0 | | | | | | | 98 | |
| | 0.2 | | | | | | | 26 | |
| | 0.04 | | | | | | | 19 | |
| | 0.008 | | | | | | | 13 | |
| | | 20.0 | | | | | | 22 | |
| | | 4.0 | | | | | | 21 | |
| | | 0.8 | | | | | | 20 | |
| | | 0.16 | | | | | | 3 | |
| | | | 5.0 | | | | | 100 | |
| | | | 1.0 | | | | | 98 | |
| | | | 0.2 | | | | | 18 | |
| | | | 0.04 | | | | | 0 | |
| | | | | 4.0 | | | | 100 | |
| | | | | 0.8 | | | | 20 | |
| | | | | 0.16 | | | | 0 | |
| | | | | | 20.0 | | | 97 | |
| | | | | | 4.0 | | | 72 | |
| | | | | | 0.8 | | | 19 | |
| | | | | | | 200.0 | | 81 | |
| | | | | | | 40.0 | | 0 | |
| | | | | | | 8.0 | | 0 | |
| | | | | | | 1.6 | | 0 | |
| 0.02 | 1.0 | | | | | | 1:50 | 99 | 98 |
| 0.02 | 0.2 | | | | | | 1:10 | 70 | 29 |
| 0.02 | 0.04 | | | | | | 1:2 | 27 | 23 |
| 0.02 | 0.008 | | | | | | 1:0.4 | 20 | 17 |
| 0.02 | | 20.0 | | | | | 1:1000 | 30 | 22 |
| 0.02 | | 4.0 | | | | | 1:200 | 38 | 21 |
| 0.02 | | 0.8 | | | | | 1:40 | 48 | 20 |
| 0.02 | | 0.16 | | | | | 1:8 | 28 | 3 |
| 0.02 | | | 5.0 | | | | 1:250 | 100 | 100 |
| 0.02 | | | 1.0 | | | | 1:50 | 98 | 98 |
| 0.02 | | | 0.2 | | | | 1:10 | 56 | 18 |
| 0.02 | | | 0.04 | | | | 1:2 | 34 | 0 |
| 0.004 | | | | 4.0 | | | 1:1000 | 100 | 100 |
| 0.004 | | | | 0.8 | | | 1:200 | 44 | 21 |
| 0.004 | | | | 0.16 | | | 1:40 | 13 | 2 |
| 0.004 | | | | | 20.0 | | 1:5000 | 98 | 98 |
| 0.004 | | | | | 4.0 | | 1:1000 | 79 | 73 |
| 0.004 | | | | | 0.8 | | 1:200 | 25 | 24 |
| 0.02 | | | | | | 200.0 | 1:10000 | 100 | 90 |
| 0.02 | | | | | | 40.0 | 1:2000 | 53 | 49 |
| 0.02 | | | | | | 8.0 | 1:400 | 48 | 49 |
| 0.02 | | | | | | 1.6 | 1:80 | 61 | 49 |
| 0.004 | | | | | | 200.0 | 1:50000 | 97 | 83 |

TABLE A12-continued

| in vitro-Test with *Alternaria alternate* | | | | | | | | | |
|---|---|---|---|---|---|---|---|---|---|
| (I-302) (ppm) | (1.021) tebuconazole (ppm) | (1.020) spiroxamine (ppm) | (13.001) fludioxonil (ppm) | (5.003) captan (ppm) | (5.018) pro-pineb (ppm) | (A1.5) *Paenibacillus terrae* (ppm) | Ratio | Efficacy % | Colby expected value % |
| 0.004 | | | | | | 40.0 | 1:10000 | 0 | 9 |
| 0.004 | | | | | | 8.0 | 1:2000 | 27 | 9 |
| 0.004 | | | | | | 1.6 | 1:400 | 18 | 9 |
| 0.0008 | | | | | | 200.0 | 1:250000 | 94 | 81 |
| 0.0008 | | | | | | 40.0 | 1:50000 | 5 | 0 |
| 0.0008 | | | | | | 8.0 | 1:10000 | 0 | 0 |
| 0.0008 | | | | | | 1.6 | 1:2000 | 0 | 0 |

TABLE A13

| in vitro-Test with *Alternaria alternata* | | | | | | | | | |
|---|---|---|---|---|---|---|---|---|---|
| (I-339) (ppm) | (17.001) (ppm) | (2.002) bixafen (ppm) | (5.003) captan (ppm) | (1.002) difenoconazole (ppm) | (5.010) dithianon (ppm) | (3.025) fenpicoxamid (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 9 | |
| | 8 | | | | | | | 8 | |
| | 1.6 | | | | | | | 0 | |
| | | 1 | | | | | | 59 | |
| | | 0.008 | | | | | | 13 | |
| | | | 5 | | | | | 79 | |
| | | | 1 | | | | | 14 | |
| | | | | 1 | | | | 94 | |
| | | | | | 0.4 | | | 0 | |
| | | | | | | 1 | | 61 | |
| | | | | | | 0.04 | | 14 | |
| | | | | | | 0.008 | | 6 | |
| 0.2 | 8 | | | | | | 1:40 | 100 | 100 |
| 0.2 | 1.6 | | | | | | 1:8 | 100 | 100 |
| 0.008 | 8 | | | | | | 1:1000 | 34 | 17 |
| 0.008 | 1.6 | | | | | | 1:200 | 16 | 9 |
| 1 | | 1 | | | | | 1:1 | 100 | 100 |
| 1 | | 0.008 | | | | | 1:0.008 | 100 | 100 |
| 0.04 | | 1 | | | | | 1:25 | 100 | 100 |
| 0.04 | | 0.008 | | | | | 1:0.2 | 100 | 100 |
| 0.008 | | 1 | | | | | 1:125 | 100 | 63 |
| 0.008 | | 0.008 | | | | | 1:1 | 35 | 21 |
| 0.04 | | | 5 | | | | 1:125 | 100 | 100 |
| 0.04 | | | 1 | | | | 1:25 | 100 | 100 |
| 0.008 | | | 5 | | | | 1:625 | 100 | 81 |
| 0.008 | | | 1 | | | | 1:125 | 21 | 22 |
| 0.2 | | | | 1 | | | 1:5 | 100 | 100 |
| 0.04 | | | | 1 | | | 1:25 | 99 | 100 |
| 0.008 | | | | 1 | | | 1:125 | 99 | 95 |
| 0.2 | | | | | 0.4 | | 1:2 | 100 | 100 |
| 0.04 | | | | | 0.4 | | 1:10 | 100 | 100 |
| 0.008 | | | | | 0.4 | | 1:50 | 48 | 22 |
| 0.2 | | | | | | 1 | 1:5 | 100 | 100 |
| 0.2 | | | | | | 0.04 | 1:0.2 | 100 | 100 |
| 0.2 | | | | | | 0.008 | 1:0.04 | 100 | 100 |
| 0.008 | | | | | | 1 | 1:125 | 77 | 70 |
| 0.008 | | | | | | 0.04 | 1:5 | 43 | 34 |
| 0.008 | | | | | | 0.008 | 1:1 | 47 | 27 |

TABLE A14

| in vitro-Test with *Alternaria alternata* | | | | | | | | | |
|---|---|---|---|---|---|---|---|---|---|
| (I-339) (ppm) | (13.001) fludioxonil (ppm) | (15.043) fluoxapiprolin (ppm) | (5.012) folpet (ppm) | (2.038) isoflucy-pram (ppm) | (6.002) isotianil (ppm) | (1.055) mefentri-fluconazole (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 44 | |
| | 5 | | | | | | | 99 | |
| | 0.2 | | | | | | | 18 | |
| | 0.04 | | | | | | | 13 | |
| | | 0.8 | | | | | | 0 | |
| | | 0.16 | | | | | | 0 | |
| | | | 0.2 | | | | | 7 | |
| | | | 0.04 | | | | | 3 | |
| | | | 0.008 | | | | | 6 | |
| | | | | 0.008 | | | | 22 | |
| | | | | | 4 | | | 0 | |
| | | | | | 0.8 | | | 0 | |
| | | | | | | 1 | | 99 | |
| | | | | | | 0.2 | | 65 | |
| 0.2 | 5 | | | | | | 1:25 | 100 | 100 |
| 0.2 | 0.2 | | | | | | 1:1 | 100 | 100 |
| 0.2 | 0.04 | | | | | | 1:0.2 | 100 | 100 |
| 0.008 | 5 | | | | | | 1:625 | 100 | 100 |
| 0.008 | 0.2 | | | | | | 1:25 | 45 | 36 |
| 0.008 | 0.04 | | | | | | 1:5 | 48 | 32 |
| 0.04 | | 0.8 | | | | | 1:20 | 100 | 100 |
| 0.04 | | 0.16 | | | | | 1:4 | 100 | 100 |
| 0.008 | | 0.8 | | | | | 1:100 | 49 | 49 |
| 0.008 | | 0.16 | | | | | 1:20 | 61 | 49 |
| 0.008 | | | 0.2 | | | | 1:25 | 56 | 49 |
| 0.008 | | | 0.04 | | | | 1:5 | 52 | 47 |
| 0.008 | | | 0.008 | | | | 1:1 | 50 | 48 |
| 0.2 | | | | 0.008 | | | 1:0.04 | 100 | 100 |
| 0.04 | | | | 0.008 | | | 1:0.2 | 99 | 100 |
| 0.008 | | | | 0.008 | | | 1:1 | 66 | 57 |
| 0.04 | | | | | 4 | | 1:100 | 100 | 100 |
| 0.04 | | | | | 0.8 | | 1:20 | 99 | 100 |
| 0.008 | | | | | 4 | | 1:500 | 50 | 44 |
| 0.008 | | | | | 0.8 | | 1:100 | 47 | 44 |
| 0.2 | | | | | | 1 | 1:5 | 100 | 100 |
| 0.2 | | | | | | 0.2 | 1:1 | 100 | 100 |
| 0.008 | | | | | | 1 | 1:125 | 98 | 99 |
| 0.008 | | | | | | 0.2 | 1:25 | 95 | 81 |

TABLE A15

| in vitro-Test with *Alternaria alternata* | | | | | | | | | |
|---|---|---|---|---|---|---|---|---|---|
| (I-339) (ppm) | (15.016) metrafenone (ppm) | (17.012) *Paenibacillus terrae* (ppm) | (5.018) propineb (ppm) | (13.004) pro-quinazid (ppm) | (1.018) prothio-conazole (ppm) | (7.005) pyrimethanil (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 0 | |
| | 1 | | | | | | | 0 | |
| | | 200.0 | | | | | | 100 | |
| | | 40.0 | | | | | | 4 | |
| | | 8 | | | | | | 0 | |
| | | 1.6 | | | | | | 0 | |
| | | | 100.0 | | | | | 97 | |
| | | | 20.0 | | | | | 50 | |
| | | | 4 | | | | | 10 | |
| | | | 0.8 | | | | | 10 | |
| | | | | 10.0 | | | | 5 | |
| | | | | 2.0 | | | | 0 | |
| | | | | 0.4 | | | | 10 | |
| | | | | 0.08 | | | | 11 | |
| | | | | | 0.5 | | | 99 | |
| | | | | | 0.1 | | | 100 | |

TABLE A15-continued

| in vitro-Test with *Alternaria alternata* | | | | | | | | | |
|---|---|---|---|---|---|---|---|---|---|
| (I-339) (ppm) | (15.016) metrafenone (ppm) | (17.012) *Paenibacillus terrae* (ppm) | (5.018) propineb (ppm) | (13.004) pro-quinazid (ppm) | (1.018) prothio-conazole (ppm) | (7.005) pyrimethanil (ppm) | Ratio | Efficacy % | Colby expected value % |
| | | | | | 0.02 | | | 89 | |
| | | | | | 0.004 | | | 46 | |
| | | | | | | 20.0 | | 100 | |
| | | | | | | 0.8 | | 96 | |
| | | | | | | 0.16 | | 0 | |
| 1 | 1 | | | | | | 1:1 | 100 | 100 |
| 0.2 | 1 | | | | | | 1:5 | 100 | 100 |
| 0.008 | 1 | | | | | | 1:125 | 93 | 86 |
| 0.008 | | 200.0 | | | | | 1:25000 | 100 | 100 |
| 0.008 | | 40.0 | | | | | 1:5000 | 94 | 86 |
| 0.008 | | 8 | | | | | 1:1000 | 98 | 86 |
| 0.008 | | 1.6 | | | | | 1:200 | 97 | 86 |
| 0.008 | | | 100.0 | | | | 1:12500 | 98 | 98 |
| 0.008 | | | 20.0 | | | | 1:2500 | 71 | 56 |
| 0.008 | | | 4 | | | | 1:500 | 85 | 20 |
| 0.008 | | | 0.8 | | | | 1:100 | 90 | 20 |
| 0.008 | | | | 10.0 | | | 1:1250 | 75 | 16 |
| 0.008 | | | | 2.0 | | | 1:250 | 63 | 12 |
| 0.008 | | | | 0.4 | | | 1:50 | 67 | 21 |
| 0.008 | | | | 0.08 | | | 1:10 | 68 | 21 |
| 0.008 | | | | | 0.5 | | 1:62.5 | 99 | 99 |
| 0.008 | | | | | 0.1 | | 1:12.5 | 99 | 100 |
| 0.008 | | | | | 0.02 | | 1:2.5 | 99 | 90 |
| 0.008 | | | | | 0.004 | | 1:0.5 | 98 | 52 |
| 0.008 | | | | | | 20.0 | 1:2500 | 99 | 100 |
| 0.008 | | | | | | 0.8 | 1:100 | 99 | 97 |
| 0.008 | | | | | | 0.16 | 1:20 | 98 | 12 |

TABLE A16

| in vitro-Test with *Alternaria alternata* | | | | | | | | | |
|---|---|---|---|---|---|---|---|---|---|
| (I-339) (ppm) | (13.005) quinoxyfen (ppm) | (1.020) spiroxamin (ppm) | (I-338) (ppm) | (1.067) | (2.002) bixafen (ppm) | (5.003) captan (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 79 | |
| | 10 | | | | | | | 30 | |
| | | 20 | | | | | | 15 | |
| | | 4 | | | | | | 15 | |
| | | 0.8 | | | | | | 3 | |
| | | 0.16 | | | | | | 0 | |
| | | | 1 | | | | | 22 | |
| | | | 0.2 | | | | | 8 | |
| | | | 0.04 | | | | | 0 | |
| | | | 0.008 | | | | | 1 | |
| | | | | 0.016 | | | | 0 | |
| | | | | | 1 | | | 85 | |
| | | | | | 0.04 | | | 67 | |
| | | | | | 0.008 | | | 23 | |
| | | | | | | 5 | | 100 | |
| | | | | | | 1 | | 58 | |
| | | | | | | 0.2 | | 0 | |
| 1 | 10 | | | | | | 1:10 | 100 | 100 |
| 0.2 | 10 | | | | | | 1:50 | 100 | 100 |
| 0.008 | 10 | | | | | | 1:1250 | 90 | 85 |
| 0.008 | | 20 | | | | | 1:2500 | 83 | 82 |
| 0.008 | | 4 | | | | | 1:500 | 82 | 82 |
| 0.008 | | 0.8 | | | | | 1:100 | 87 | 79 |
| 0.008 | | 0.16 | | | | | 1:20 | 86 | 79 |
| | | | 1 | 0.016 | | | 1:0.016 | 49 | 22 |
| | | | 0.2 | 0.016 | | | 1:0.08 | 10 | 8 |
| | | | 0.04 | 0.016 | | | 1:0.4 | 0 | 0 |
| | | | 0.04 | | 1 | | 1:25 | 85 | 85 |
| | | | 0.04 | | 0.04 | | 1:1 | 75 | 67 |
| | | | 0.04 | | 0.008 | | 1:0.2 | 32 | 23 |

TABLE A16-continued

| in vitro-Test with *Alternaria alternata* | | | | | | | | | |
|---|---|---|---|---|---|---|---|---|---|
| (I-339) (ppm) | (13.005) quinoxyfen (ppm) | (1.020) spiroxamin (ppm) | (I-338) (ppm) | (1.067) | (2.002) bixafen (ppm) | (5.003) captan (ppm) | Ratio | Efficacy % | Colby expected value % |
| | | | 1 | | | 5 | 1:5 | 100 | 100 |
| | | | 1 | | | 1 | 1:1 | 100 | 68 |
| | | | 1 | | | 0.2 | 1:0.2 | 63 | 22 |

TABLE A17

| in vitro-Test with *Alternaria alternata* | | | | | | | | | |
|---|---|---|---|---|---|---|---|---|---|
| (I-338) (ppm) | (1.002) difeno-conazole (ppm) | (5.010) dithianon (ppm) | (13.001) fludioxonil (ppm) | (2.005) fluopyram (ppm) | (15.043) fluoxapiprolin (ppm) | (3.012) fluoxastrobin (ppm) | Ratio | Efficacy % | Colby expected value % |
| 1 | | | | | | | | 68 | |
| 0.2 | | | | | | | | 0 | |
| 0.04 | | | | | | | | 2 | |
| 0.008 | | | | | | | | 3 | |
| | 1 | | | | | | | 100 | |
| | 0.2 | | | | | | | 53 | |
| | 0.04 | | | | | | | 21 | |
| | | 2 | | | | | | 32 | |
| | | | 0.2 | | | | | 28 | |
| | | | | 20 | | | | 91 | |
| | | | | 4 | | | | 81 | |
| | | | | 0.8 | | | | 79 | |
| | | | | 0.16 | | | | 59 | |
| | | | | | 0.8 | | | 0 | |
| | | | | | | 0.4 | | 70 | |
| 1 | 1 | | | | | | 1:5 | 99 | 100 |
| 1 | 0.2 | | | | | | 1:1 | 56 | 53 |
| 1 | 0.04 | | | | | | 1:0.2 | 44 | 21 |
| 1 | | 2 | | | | | 1:2 | 84 | 78 |
| 0.2 | | 2 | | | | | 1:10 | 43 | 32 |
| 0.008 | | 2 | | | | | 1:250 | 45 | 34 |
| 0.2 | | | 0.2 | | | | 1:1 | 57 | 28 |
| 0.04 | | | 0.2 | | | | 1:5 | 32 | 29 |
| 0.008 | | | 0.2 | | | | 1:25 | 59 | 30 |
| 0.2 | | | | 20 | | | 1:100 | 95 | 91 |
| 0.2 | | | | 4 | | | 1:20 | 94 | 81 |
| 0.2 | | | | 0.8 | | | 1:4 | 77 | 79 |
| 0.2 | | | | 0.16 | | | 1:0.8 | 68 | 59 |
| 0.04 | | | | 4 | | | 1:100 | 89 | 82 |
| 0.04 | | | | 0.8 | | | 1:20 | 82 | 80 |
| 0.04 | | | | 0.16 | | | 1:4 | 63 | 60 |
| 0.008 | | | | 4 | | | 1:500 | 94 | 81 |
| 0.008 | | | | 0.8 | | | 1:100 | 74 | 79 |
| 0.008 | | | | 0.16 | | | 1:20 | 65 | 59 |
| 1 | | | | | 0.8 | | 1:0.8 | 43 | 38 |
| 0.2 | | | | | 0.8 | | 1:4 | 17 | 0 |
| 0.04 | | | | | 0.8 | | 1:20 | 3 | 3 |
| 0.008 | | | | | 0.8 | | 1:100 | 0 | 0 |
| 0.2 | | | | | | 0.4 | 1:2 | 68 | 70 |
| 0.04 | | | | | | 0.4 | 1:10 | 80 | 71 |
| 0.008 | | | | | | 0.4 | 1:50 | 91 | 70 |

TABLE A18

| in vitro-Test with *Alternaria alternata* | | | | | | | | | |
|---|---|---|---|---|---|---|---|---|---|
| (I-338) (ppm) | (1.062) fluoxytioconazole (ppm) | (5.012) folpet (ppm) | (15.012) fosetylal (ppm) | (2.028) inpyrfluxam (ppm) | (2.038) isoflucypram (ppm) | (6.002) isotianil (ppm) | Ratio | Efficacy % | Colby expected value % |
| 1 | | | | | | | | 38 | |
| 0.2 | | | | | | | | 0 | |
| 0.04 | | | | | | | | 3 | |
| 0.008 | | | | | | | | 0 | |

TABLE A18-continued in vitro-Test with *Alternaria alternata*

| (I-338) (ppm) | (1.062) fluoxytioconazole (ppm) | (5.012) folpet (ppm) | (15.012) fosetylal (ppm) | (2.028) inpyrfluxam (ppm) | (2.038) isoflucypram (ppm) | (6.002) isotianil (ppm) | Ratio | Efficacy % | Colby expected value % |
|---|---|---|---|---|---|---|---|---|---|
| | 0.008 | | | | | | | 5 | |
| | | 1 | | | | | | 83 | |
| | | | 4 | | | | | 2 | |
| | | | 0.8 | | | | | 0 | |
| | | | | 1 | | | | 75 | |
| | | | | 0.2 | | | | 50 | |
| | | | | 0.04 | | | | 9 | |
| | | | | | 1 | | | 77 | |
| | | | | | | 20 | | 11 | |
| | | | | | | 4 | | 15 | |
| 1 | 0.008 | | | | | | 1:0.008 | 69 | 41 |
| 0.04 | 0.008 | | | | | | 1:0.2 | 14 | 8 |
| 0.008 | 0.008 | | | | | | 1:1 | 9 | 5 |
| 1 | | 1 | | | | | 1:1 | 100 | 89 |
| 0.04 | | 1 | | | | | 1:25 | 90 | 83 |
| 0.008 | | 1 | | | | | 1:125 | 98 | 83 |
| 1 | | | 4 | | | | 1:4 | 41 | 36 |
| 1 | | | 0.8 | | | | 1:0.8 | 38 | 35 |
| 0.2 | | | 4 | | | | 1:20 | 25 | 2 |
| 0.2 | | | 0.8 | | | | 1:4 | 8 | 0 |
| 0.04 | | | 4 | | | | 1:100 | 15 | 2 |
| 0.04 | | | 0.8 | | | | 1:20 | 0 | 0 |
| 1 | | | | 1 | | | 1:1 | 85 | 84 |
| 1 | | | | 0.2 | | | 1:0.2 | 76 | 68 |
| 1 | | | | 0.04 | | | 1:0.04 | 61 | 41 |
| 0.2 | | | | 1 | | | 1:5 | 76 | 75 |
| 0.2 | | | | 0.2 | | | 1:1 | 52 | 50 |
| 0.2 | | | | 0.04 | | | 1:0.2 | 24 | 9 |
| 0.04 | | | | 1 | | | 1:25 | 84 | 75 |
| 0.04 | | | | 0.2 | | | 1:5 | 52 | 50 |
| 0.04 | | | | 0.04 | | | 1:1 | 15 | 9 |
| 0.008 | | | | 1 | | | 1:125 | 80 | 75 |
| 0.008 | | | | 0.2 | | | 1:25 | 69 | 50 |
| 0.008 | | | | 0.04 | | | 1:5 | 8 | 9 |
| 1 | | | | | 1 | | 1:1 | 95 | 85 |
| 0.2 | | | | | 1 | | 1:5 | 90 | 77 |
| 0.04 | | | | | 1 | | 1:25 | 80 | 77 |
| 0.008 | | | | | 1 | | 1:125 | 87 | 77 |
| 1 | | | | | | 20 | 1:20 | 44 | 35 |
| 1 | | | | | | 4 | 1:4 | 38 | 32 |
| 0.2 | | | | | | 20 | 1:100 | 23 | 11 |
| 0.2 | | | | | | 4 | 1:20 | 16 | 15 |
| 0.04 | | | | | | 20 | 1:500 | 15 | 11 |
| 0.04 | | | | | | 4 | 1:100 | 15 | 15 |

TABLE A19 in vitro-Test with *Alternaria alternata*

| (I-338) (ppm) | (5.013) mancozeb (ppm) | (1.055) mefen-trifluconazole (ppm) | (12.004) metalaxyl-m (ppm) | (15.016) metrafenone (ppm) | (3.030) metyltetra-prole (ppm) | (17.012) *Paenibacillus terrae* (ppm) | Ratio | Efficacy % | Colby expected value % |
|---|---|---|---|---|---|---|---|---|---|
| 1 | | | | | | | | 27 | |
| 0.2 | | | | | | | | 0 | |
| 0.04 | | | | | | | | 0 | |
| 0.008 | | | | | | | | 0 | |
| | 4 | | | | | | | 36 | |
| | 0.016 | | | | | | | 0 | |
| | | 0.2 | | | | | | 91 | |
| | | 0.04 | | | | | | 19 | |
| | | 0.008 | | | | | | 9 | |
| | | | 4 | | | | | 10 | |
| | | | | 5 | | | | 16 | |
| | | | | 0.2 | | | | 3 | |
| | | | | 0.04 | | | | 3 | |
| | | | | | 1 | | | 87 | |
| | | | | | 0.008 | | | 0 | |
| | | | | | | 40 | | 8 | |

TABLE A19-continued in vitro-Test with *Alternaria alternata*

| (I-338) (ppm) | (5.013) mancozeb (ppm) | (1.055) mefen-trifluconazole (ppm) | (12.004) metalaxyl-m (ppm) | (15.016) metrafenone (ppm) | (3.030) metyltetra-prole (ppm) | (17.012) *Paenibacillus terrae* (ppm) | Ratio | Efficacy % | Colby expected value % |
|---|---|---|---|---|---|---|---|---|---|
| | | | | | | 8 | | 0 | |
| | | | | | | 1.6 | | 0 | |
| 1 | 4 | | | | | | 1:4 | 59 | 53 |
| 1 | 0.016 | | | | | | 1:0.16 | 32 | 27 |
| 0.2 | 4 | | | | | | 1:20 | 48 | 36 |
| 0.2 | 0.016 | | | | | | 1:0.8 | 8 | 0 |
| 0.04 | 4 | | | | | | 1:100 | 38 | 36 |
| 0.04 | 0.016 | | | | | | 1:4 | 0 | 0 |
| 0.04 | | 0.2 | | | | | 1:5 | 98 | 91 |
| 0.04 | | 0.04 | | | | | 1:1 | 24 | 19 |
| 0.04 | | 0.008 | | | | | 1:0.2 | 8 | 9 |
| 1 | | | 4 | | | | 1:4 | 38 | 34 |
| 0.2 | | | 4 | | | | 1:20 | 18 | 10 |
| 0.008 | | | 4 | | | | 1:500 | 23 | 10 |
| 1 | | | | 5 | | | 1:5 | 54 | 36 |
| 1 | | | | 0.2 | | | 1:0.2 | 27 | 26 |
| 1 | | | | 0.04 | | | 1:0.04 | 30 | 26 |
| 0.008 | | | | 5 | | | 1:625 | 18 | 16 |
| 0.008 | | | | 0.2 | | | 1:25 | 8 | 3 |
| 0.008 | | | | 0.04 | | | 1:5 | 0 | 3 |
| 0.04 | | | | | 1 | | 1:1 | 91 | 90 |
| 0.04 | | | | | 0.008 | | 1:0.008 | 36 | 24 |
| 0.04 | | | | | 1 | | 1:5 | 92 | 87 |
| 0.008 | | | | | 0.008 | | 1:0.04 | 0 | 0 |
| 1 | | | | | | 40 | 1:40 | 44 | 30 |
| 1 | | | | | | 8 | 1:8 | 39 | 24 |
| 1 | | | | | | 1.6 | 1:1.6 | 35 | 24 |

TABLE A20 in vitro-Test with *Alternaria alternata*

| (I-338) (ppm) | (5.018) propineb (ppm) | (13.004) proquinazid (ppm) | (7.005) pyrimethanil (ppm) | (3.020) trifloxystrobin (ppm) | (I-130) (ppm) | (1.067) (ppm) | Ratio | Efficacy % | Colby expected value % |
|---|---|---|---|---|---|---|---|---|---|
| 1 | | | | | | | | 52 | |
| 0.2 | | | | | | | | 10 | |
| 0.04 | | | | | | | | 4 | |
| 0.008 | | | | | | | | 0 | |
| | 20 | | | | | | | 65 | |
| | 4 | | | | | | | 43 | |
| | 0.8 | | | | | | | 14 | |
| | | 2 | | | | | | 4 | |
| | | 0.4 | | | | | | 3 | |
| | | 0.08 | | | | | | 0 | |
| | | | 0.8 | | | | | 96 | |
| | | | 0.16 | | | | | 10 | |
| | | | | 0.2 | | | | 85 | |
| | | | | 0.04 | | | | 49 | |
| | | | | | 1 | | | 100 | |
| | | | | | 0.2 | | | 100 | |
| | | | | | 0.008 | | | 25 | |
| | | | | | | 2 | | 74 | |
| 0.2 | 20 | | | | | | 1:100 | 74 | 68 |
| 0.2 | 4 | | | | | | 1:20 | 49 | 49 |
| 0.2 | 0.8 | | | | | | 1:4 | 26 | 22 |
| 0.04 | 20 | | | | | | 1:500 | 74 | 66 |
| 0.04 | 4 | | | | | | 1:100 | 71 | 45 |
| 0.04 | 0.8 | | | | | | 1:20 | 20 | 17 |
| 0.008 | 20 | | | | | | 1:2500 | 89 | 65 |
| 0.008 | 4 | | | | | | 1:500 | 51 | 43 |
| 0.008 | 0.8 | | | | | | 1:100 | 52 | 14 |
| 0.04 | | 2 | | | | | 1:50 | 16 | 7 |
| 0.04 | | 0.4 | | | | | 1:10 | 19 | 6 |
| 0.04 | | 0.08 | | | | | 1:2 | 14 | 4 |
| 0.008 | | 2 | | | | | 1:250 | 25 | 4 |
| 0.008 | | 0.4 | | | | | 1:50 | 14 | 3 |
| 0.008 | | 0.08 | | | | | 1:10 | 12 | 0 |
| 1 | | | 0.8 | | | | 1:0.8 | 100 | 98 |

TABLE A20-continued in vitro-Test with *Alternaria alternata*

| (I-338) (ppm) | (5.018) propineb (ppm) | (13.004) proquinazid (ppm) | (7.005) pyrimethanil (ppm) | (3.020) trifloxystrobin (ppm) | (I-130) (ppm) | (1.067) (ppm) | Ratio | Efficacy % | Colby expected value % |
|---|---|---|---|---|---|---|---|---|---|
| 1 | | | 0.16 | | | | 1:0.16 | 98 | 56 |
| 0.2 | | | 0.8 | | | | 1:4 | 99 | 97 |
| 0.2 | | | 0.16 | | | | 1:0.8 | 97 | 19 |
| 0.04 | | | 0.8 | | | | 1:20 | 99 | 96 |
| 0.04 | | | 0.16 | | | | 1:4 | 95 | 13 |
| 0.008 | | | 0.8 | | | | 1:100 | 99 | 96 |
| 0.008 | | | 0.16 | | | | 1:20 | 93 | 10 |
| 0.04 | | | | 0.2 | | | 1:5 | 94 | 85 |
| 0.04 | | | | 0.04 | | | 1:1 | 59 | 50 |
| 0.008 | | | | 0.2 | | | 1:25 | 84 | 85 |
| 0.008 | | | | 0.04 | | | 1:5 | 59 | 51 |
| | | | | | 1 | 2 | 1:2 | 100 | 100 |
| | | | | | 0.2 | 2 | 1:10 | 100 | 100 |
| | | | | | 0.008 | 2 | 1:250 | 95 | 81 |

TABLE A21 in vitro-Test with *Alternaria alternata*

| (I-130) (ppm) | (13.001) fludioxonil (ppm) | (2.005) fluopyram (ppm) | (15.043) fluoxapiprolin (ppm) | (3.012) fluoxastrobin (ppm) | (5.012) folpet (ppm) | (15.012) fosetylal (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 19 | |
| | 5 | | | | | | | 100 | |
| | 1 | | | | | | | 88 | |
| | | 20 | | | | | | 88 | |
| | | 4 | | | | | | 81 | |
| | | 0.8 | | | | | | 61 | |
| | | | 20 | | | | | 1 | |
| | | | 4 | | | | | 0 | |
| | | | | 20 | | | | 92 | |
| | | | | 4 | | | | 68 | |
| | | | | 0.016 | | | | 0 | |
| | | | | | 1 | | | 99 | |
| | | | | | 0.2 | | | 6 | |
| | | | | | | 100 | | 8 | |
| | | | | | | 20 | | 4 | |
| | | | | | | 4 | | 0 | |
| 0.2 | 5 | | | | | | 1:25 | 100 | 100 |
| 0.2 | 1 | | | | | | 1:5 | 100 | 100 |
| 0.008 | 5 | | | | | | 1:625 | 99 | 100 |
| 0.008 | 1 | | | | | | 1:125 | 96 | 90 |
| 0.008 | | 20 | | | | | 1:2500 | 91 | 91 |
| 0.008 | | 4 | | | | | 1:500 | 85 | 85 |
| 0.008 | | 0.8 | | | | | 1:100 | 73 | 69 |
| 0.04 | | | 20 | | | | 1:500 | 100 | 100 |
| 0.04 | | | 4 | | | | 1:100 | 100 | 100 |
| 0.008 | | | 20 | | | | 1:2500 | 46 | 21 |
| 0.008 | | | 4 | | | | 1:500 | 46 | 21 |
| 0.008 | | | | 20 | | | 1:250 | 96 | 94 |
| 0.008 | | | | 4 | | | 1:50 | 82 | 74 |
| 0.008 | | | | 0.016 | | | 1:2 | 27 | 21 |
| 0.04 | | | | | 1 | | 1:25 | 100 | 100 |
| 0.04 | | | | | 0.2 | | 1:5 | 100 | 100 |
| 0.008 | | | | | 1 | | 1:125 | 100 | 99 |
| 0.008 | | | | | 0.2 | | 1:25 | 41 | 30 |
| 0.008 | | | | | | 100 | 1:12500 | 53 | 32 |
| 0.008 | | | | | | 20 | 1:2500 | 55 | 29 |
| 0.008 | | | | | | 4 | 1:500 | 36 | 26 |

TABLE A22 in vitro-Test with *Alternaria alternata*

| (I-130) (ppm) | (6.002) isotianil (ppm) | (5.013) mancozeb (ppm) | (15.016) metra-fenone (ppm) | (17.012) *Paenibacillus terrae* (ppm) | (2.017) penflufen (ppm) | Ratio | Efficacy % | Colby expected value % |
|---|---|---|---|---|---|---|---|---|
| 1 | | | | | | | 100 | |
| 0.2 | | | | | | | 100 | |
| 0.04 | | | | | | | 100 | |
| 0.008 | | | | | | | 19 | |
| | 100 | | | | | | 15 | |
| | 20 | | | | | | 0 | |
| | 4 | | | | | | 0 | |
| | | 20 | | | | | 63 | |
| | | 0.8 | | | | | 4 | |
| | | | 5 | | | | 19 | |
| | | | 1 | | | | 6 | |
| | | | 0.2 | | | | 3 | |
| | | | 0.04 | | | | 1 | |
| | | | | 200 | | | 99 | |
| | | | | 40 | | | 16 | |
| | | | | | 5 | | 72 | |
| | | | | | 0.2 | | 22 | |
| 0.008 | 100 | | | | | 1:12500 | 50 | 44 |
| 0.008 | 20 | | | | | 1:2500 | 46 | 35 |
| 0.008 | 4 | | | | | 1:500 | 40 | 35 |
| 0.2 | | 20 | | | | 1:100 | 100 | 100 |
| 0.2 | | 0.8 | | | | 1:4 | 100 | 100 |
| 0.008 | | 20 | | | | 1:2500 | 90 | 76 |
| 0.008 | | 0.8 | | | | 1:100 | 47 | 37 |
| 0.04 | | | 5 | | | 1:125 | 100 | 100 |
| 0.04 | | | 1 | | | 1:25 | 100 | 99 |
| 0.04 | | | 0.2 | | | 1:5 | 100 | 99 |
| 0.04 | | | 0.04 | | | 1:1 | 99 | 99 |
| 0.008 | | | 5 | | | 1:625 | 57 | 47 |
| 0.008 | | | 1 | | | 1:125 | 62 | 38 |
| 0.008 | | | 0.2 | | | 1:25 | 51 | 37 |
| 0.008 | | | 0.04 | | | 1:5 | 42 | 35 |
| 0.04 | | | | 200 | | 1:5000 | 100 | 100 |
| 0.04 | | | | 40 | | 1:1000 | 100 | 100 |
| 0.008 | | | | 200 | | 1:25000 | 100 | 99 |
| 0.008 | | | | 40 | | 1:5000 | 66 | 45 |
| 0.2 | | | | | 5 | 1:25 | 100 | 100 |
| 0.2 | | | | | 0.2 | 1:1 | 100 | 100 |
| 0.008 | | | | | 5 | 1:625 | 85 | 82 |
| 0.008 | | | | | 0.2 | 1:25 | 73 | 49 |

TABLE B1 in vitro-Test with *Botrytis cinerea*

| (I-052) (ppm) | (7.005) pyrimethanil (ppm) | (2.005) fluopyram (ppm) | (2.028) inpyrfluxam (ppm) | (2.038) isoflucypram (ppm) | Ratio | Efficacy % | Colby expected value % |
|---|---|---|---|---|---|---|---|
| 0.1 | | | | | | 88 | |
| 0.02 | | | | | | 0 | |
| 0.004 | | | | | | 0 | |
| 0.0008 | | | | | | 0 | |
| | 20.0 | | | | | 100 | |
| | 4.0 | | | | | 100 | |
| | 0.8 | | | | | 100 | |
| | 0.16 | | | | | 0 | |
| | | 20.0 | | | | 100 | |
| | | 4.0 | | | | 72 | |
| | | 0.8 | | | | 69 | |
| | | 0.16 | | | | 30 | |
| | | | 1.0 | | | 87 | |
| | | | 0.2 | | | 69 | |
| | | | 0.04 | | | 66 | |
| | | | 0.008 | | | 4 | |
| | | | | 1.0 | | 75 | |
| | | | | 0.2 | | 74 | |
| | | | | 0.04 | | 58 | |
| | | | | 0.008 | | 10 | |

TABLE B1-continued

| in vitro-Test with *Botrytis cinerea* | | | | | | | |
|---|---|---|---|---|---|---|---|
| (I-052) (ppm) | (7.005) pyrimethanil (ppm) | (2.005) fluopyram (ppm) | (2.028) inpyrfluxam (ppm) | (2.038) isoflucypram (ppm) | Ratio | Efficacy % | Colby expected value % |
| 0.02 | 20.0 | | | | 1:1000 | 100 | 100 |
| 0.02 | 4.0 | | | | 1:200 | 100 | 100 |
| 0.02 | 0.8 | | | | 1:40 | 100 | 100 |
| 0.02 | 0.16 | | | | 1:8 | 95 | 17 |
| 0.004 | 20.0 | | | | 1:5000 | 100 | 100 |
| 0.004 | 4.0 | | | | 1:1000 | 100 | 100 |
| 0.004 | 0.8 | | | | 1:200 | 100 | 100 |
| 0.004 | 0.16 | | | | 1:40 | 76 | 0 |
| 0.0008 | 20.0 | | | | 1:25000 | 100 | 100 |
| 0.0008 | 4.0 | | | | 1:5000 | 100 | 100 |
| 0.0008 | 0.8 | | | | 1:1000 | 100 | 100 |
| 0.0008 | 0.16 | | | | 1:200 | 24 | 8 |
| 0.02 | | 20.0 | | | 1:1000 | 100 | 100 |
| 0.02 | | 4.0 | | | 1:200 | 89 | 77 |
| 0.02 | | 0.8 | | | 1:40 | 69 | 74 |
| 0.02 | | 0.16 | | | 1:8 | 55 | 41 |
| 0.004 | | 20.0 | | | 1:5000 | 100 | 100 |
| 0.004 | | 4.0 | | | 1:1000 | 79 | 72 |
| 0.004 | | 0.8 | | | 1:200 | 68 | 69 |
| 0.004 | | 0.16 | | | 1:40 | 59 | 30 |
| 0.0008 | | 20.0 | | | 1:25000 | 100 | 100 |
| 0.0008 | | 4.0 | | | 1:5000 | 80 | 74 |
| 0.0008 | | 0.8 | | | 1:1000 | 70 | 71 |
| 0.0008 | | 0.16 | | | 1:200 | 51 | 35 |
| 0.004 | | | 1.0 | | 1:250 | 89 | 87 |
| 0.004 | | | 0.2 | | 1:50 | 79 | 69 |
| 0.004 | | | 0.04 | | 1:10 | 58 | 66 |
| 0.004 | | | 0.008 | | 1:2 | 31 | 4 |
| 0.0008 | | | | 1.0 | 1:250 | 73 | 75 |
| 0.0008 | | | | 0.2 | 1:50 | 74 | 74 |
| 0.0008 | | | | 0.04 | 1:10 | 58 | 58 |
| 0.0008 | | | | 0.008 | 1:2 | 27 | 10 |
| 0.004 | | | | 1.0 | 1:1250 | 73 | 75 |
| 0.004 | | | | 0.2 | 1:250 | 74 | 74 |
| 0.004 | | | | 0.04 | 1:50 | 69 | 58 |
| 0.004 | | | | 0.008 | 1:10 | 20 | 10 |

TABLE B2

| in vitro-Test with *Botrytis cinerea* | | | | | | | |
|---|---|---|---|---|---|---|---|
| (I-052) (ppm) | (3.025) fenpicoxamid (ppm) | (1.055) mefentrifluconazole (ppm) | (1.021) tebuconazole (ppm) | (1.020) spiroxamine (ppm) | Ratio | Efficacy % | Colby expected value % |
| 0.1 | | | | | | 88 | |
| 0.02 | | | | | | 0 | |
| 0.004 | | | | | | 0 | |
| 0.0008 | | | | | | 0 | |
| | 1.0 | | | | | 21 | |
| | 0.2 | | | | | 6 | |
| | 0.04 | | | | | 6 | |
| | | 0.2 | | | | 78 | |
| | | 0.04 | | | | 37 | |
| | | 0.008 | | | | 0 | |
| | | | 1.0 | | | 94 | |
| | | | 0.2 | | | 37 | |
| | | | 0.04 | | | 0 | |
| | | | 0.008 | | | 0 | |
| | | | | 20.0 | | 18 | |
| | | | | 4.0 | | 0 | |
| | | | | 0.8 | | 0 | |
| | | | | 0.16 | | 0 | |
| 0.02 | 1.0 | | | | 1:50 | 37 | 21 |
| 0.02 | 0.2 | | | | 1:10 | 12 | 6 |
| 0.02 | 0.04 | | | | 1:2 | 13 | 6 |
| 0.004 | 1.0 | | | | 1:250 | 31 | 21 |
| 0.004 | 0.2 | | | | 1:50 | 9 | 6 |
| 0.004 | 0.04 | | | | 1:10 | 0 | 6 |
| 0.0008 | 1.0 | | | | 1:1250 | 38 | 21 |
| 0.0008 | 0.2 | | | | 1:250 | 17 | 6 |

TABLE B2-continued in vitro-Test with *Botrytis cinerea*

| (I-052) (ppm) | (3.025) fenpicoxamid (ppm) | (1.055) mefentrifluconazole (ppm) | (1.021) tebuconazole (ppm) | (1.020) spiroxamine (ppm) | Ratio | Efficacy % | Colby expected value % |
|---|---|---|---|---|---|---|---|
| 0.0008 | 0.04 | | | | 1:50 | 4 | 6 |
| 0.02 | | 0.2 | | | 1:10 | 99 | 78 |
| 0.02 | | 0.04 | | | 1:2 | 81 | 37 |
| 0.02 | | 0.008 | | | 1:0.4 | 46 | 0 |
| 0.004 | | 0.2 | | | 1:50 | 99 | 78 |
| 0.004 | | 0.04 | | | 1:10 | 100 | 37 |
| 0.004 | | 0.008 | | | 1:2 | 71 | 0 |
| 0.0008 | | 0.2 | | | 1:250 | 100 | 78 |
| 0.0008 | | 0.04 | | | 1:50 | 100 | 37 |
| 0.0008 | | 0.008 | | | 1:10 | 17 | 0 |
| 0.004 | | | 1.0 | | 1:250 | 98 | 94 |
| 0.004 | | | 0.2 | | 1:50 | 32 | 37 |
| 0.004 | | | 0.04 | | 1:10 | 9 | 0 |
| 0.004 | | | 0.008 | | 1:2 | 4 | 0 |
| 0.0008 | | | 1.0 | | 1:1250 | 95 | 94 |
| 0.0008 | | | 0.2 | | 1:250 | 52 | 37 |
| 0.0008 | | | 0.04 | | 1:50 | 0 | 0 |
| 0.0008 | | | 0.008 | | 1:10 | 19 | 0 |
| 0.1 | | | | 20.0 | 1:200 | 84 | 83 |
| 0.1 | | | | 4.0 | 1:40 | 100 | 79 |
| 0.1 | | | | 0.8 | 1:8 | 100 | 79 |
| 0.1 | | | | 0.16 | 1:1.6 | 100 | 79 |
| 0.004 | | | | 20.0 | 1:5000 | 28 | 19 |
| 0.004 | | | | 4.0 | 1:1000 | 0 | 1 |
| 0.004 | | | | 0.8 | 1:200 | 0 | 1 |
| 0.004 | | | | 0.16 | 1:40 | 0 | 1 |

TABLE B3 in vitro-Test with *Botrytis cinerea*

| (I-052) (ppm) | (15.064) (ppm) | (13.001) fludioxonil (ppm) | (13.004) proquinazid (ppm) | (5.003) captan (ppm) | Ratio | Efficacy % | Colby expected value % |
|---|---|---|---|---|---|---|---|
| 0.1 | | | | | | 88 | |
| 0.02 | | | | | | 0 | |
| 0.004 | | | | | | 0 | |
| 0.0008 | | | | | | 0 | |
| | 2.0 | | | | | 2 | |
| | 0.4 | | | | | 21 | |
| | 0.08 | | | | | 5 | |
| | | 5.0 | | | | 100 | |
| | | 1.0 | | | | 100 | |
| | | 0.2 | | | | 100 | |
| | | 0.04 | | | | 19 | |
| | | | 10.0 | | | 0 | |
| | | | 2.0 | | | 0 | |
| | | | 0.4 | | | 0 | |
| | | | 0.08 | | | 13 | |
| | | | | 20.0 | | 7 | |
| | | | | 4.0 | | 0 | |
| | | | | 0.8 | | 0 | |
| | | | | 0.16 | | 0 | |
| 0.1 | 2.0 | | | | 1:20 | 100 | 79 |
| 0.1 | 0.4 | | | | 1:4 | 100 | 83 |
| 0.1 | 0.08 | | | | 1:0.8 | 100 | 80 |
| 0.1 | | 5.0 | | | 1:50 | 100 | 100 |
| 0.1 | | 1.0 | | | 1:10 | 100 | 100 |
| 0.1 | | 0.2 | | | 1:2 | 100 | 100 |
| 0.1 | | 0.04 | | | 1:0.4 | 99 | 83 |
| 0.1 | | | 10.0 | | 1:100 | 100 | 79 |
| 0.1 | | | 2.0 | | 1:20 | 100 | 79 |
| 0.1 | | | 0.4 | | 1:4 | 100 | 79 |
| 0.1 | | | 0.08 | | 1:0.8 | 99 | 82 |
| 0.02 | | | | 20.0 | 1:1000 | 27 | 7 |
| 0.02 | | | | 4.0 | 1:200 | 0 | 0 |
| 0.02 | | | | 0.8 | 1:40 | 0 | 0 |
| 0.02 | | | | 0.16 | 1:8 | 0 | 0 |
| 0.0008 | | | | 20.0 | 1:25000 | 77 | 7 |

TABLE B3-continued

| in vitro-Test with *Botrytis cinerea* | | | | | | | |
|---|---|---|---|---|---|---|---|
| (I-052) (ppm) | (15.064) (ppm) | (13.001) fludioxonil (ppm) | (13.004) proquinazid (ppm) | (5.003) captan (ppm) | Ratio | Efficacy % | Colby expected value % |
| 0.0008 | | | | 4.0 | 1:5000 | 0 | 0 |
| 0.0008 | | | | 0.8 | 1:1000 | 0 | 0 |
| 0.0008 | | | | 0.16 | 1:200 | 0 | 0 |

TABLE B4

| in vitro-Test with *Botrytis cinerea* | | | | | | |
|---|---|---|---|---|---|---|
| (I-052) (ppm) | (5.010) dithianon (ppm) | (5.013) mancozeb (ppm) | (5.018) propineb (ppm) | Ratio | Efficacy % | Colby expected value % |
| 0.1 | | | | | 88 | |
| 0.02 | | | | | 0 | |
| 0.004 | | | | | 0 | |
| 0.0008 | | | | | 0 | |
| | 20.0 | | | | 100 | |
| | 4.0 | | | | 23 | |
| | 0.8 | | | | 0 | |
| | 0.16 | | | | 0 | |
| | | 10.0 | | | 33 | |
| | | 2.0 | | | 0 | |
| | | 0.4 | | | 0 | |
| | | | 100.0 | | 22 | |
| | | | 4.0 | | 0 | |
| | | | 0.8 | | 0 | |
| 0.1 | 20.0 | | | 1:200 | 100 | 100 |
| 0.1 | 4.0 | | | 1:40 | 100 | 81 |
| 0.1 | 0.8 | | | 1:8 | 68 | 75 |
| 0.1 | 0.16 | | | 1:1.6 | 87 | 75 |
| 0.02 | 20.0 | | | 1:1000 | 100 | 100 |
| 0.02 | 4.0 | | | 1:200 | 40 | 23 |
| 0.02 | 0.8 | | | 1:40 | 0 | 0 |
| 0.02 | 0.16 | | | 1:8 | 0 | 0 |
| 0.004 | 20.0 | | | 1:5000 | 100 | 100 |

TABLE B4-continued

| in vitro-Test with *Botrytis cinerea* | | | | | | |
|---|---|---|---|---|---|---|
| (I-052) (ppm) | (5.010) dithianon (ppm) | (5.013) mancozeb (ppm) | (5.018) propineb (ppm) | Ratio | Efficacy % | Colby expected value % |
| 0.004 | 4.0 | | | 1:1000 | 37 | 23 |
| 0.004 | 0.8 | | | 1:200 | 25 | 0 |
| 0.004 | 0.16 | | | 1:40 | 0 | 0 |
| 0.0008 | 20.0 | | | 1:25000 | 100 | 100 |
| 0.0008 | 4.0 | | | 1:5000 | 35 | 23 |
| 0.0008 | 0.8 | | | 1:1000 | 0 | 0 |
| 0.0008 | 0.16 | | | 1:200 | 5 | 0 |
| 0.1 | | 10.0 | | 1:100 | 100 | 92 |
| 0.1 | | 2.0 | | 1:20 | 99 | 88 |
| 0.1 | | 0.4 | | 1:4 | 81 | 88 |
| 0.02 | | 10.0 | | 1:500 | 52 | 40 |
| 0.02 | | 2.0 | | 1:100 | 30 | 12 |
| 0.02 | | 0.4 | | 1:20 | 0 | 12 |
| 0.004 | | 10.0 | | 1:2500 | 33 | 33 |
| 0.004 | | 2.0 | | 1:500 | 16 | 0 |
| 0.004 | | 0.4 | | 1:100 | 0 | 0 |
| 0.1 | | | 100.0 | 1:1000 | 100 | 90 |
| 0.1 | | | 4.0 | 1:40 | 86 | 88 |
| 0.1 | | | 0.8 | 1:8 | 100 | 88 |
| 0.0008 | | | 100.0 | 1:125000 | 31 | 22 |
| 0.0008 | | | 4.0 | 1:5000 | 20 | 0 |
| 0.0008 | | | 0.8 | 1:1000 | 13 | 0 |

TABLE B5

| in vitro-Test with *Botrytis cinerea* | | | | | | | |
|---|---|---|---|---|---|---|---|
| (I-300) (ppm) | (7.005) pyrimethanil (ppm) | (2.002) bixafen (ppm) | (2.005) fluopyram (ppm) | (2.038) isoflucypram (ppm) | Ratio | Efficacy % | Colby expected value % |
| 0.1 | | | | | | 49 | |
| 0.02 | | | | | | 0 | |
| 0.004 | | | | | | 0 | |
| 0.0008 | | | | | | 0 | |
| | 20.0 | | | | | 100 | |
| | 4.0 | | | | | 100 | |
| | 0.8 | | | | | 76 | |
| | 0.16 | | | | | 3 | |
| | | 1.0 | | | | 67 | |
| | | 0.2 | | | | 63 | |
| | | 0.04 | | | | 22 | |
| | | | 20.0 | | | 86 | |
| | | | 4.0 | | | 72 | |
| | | | 0.8 | | | 67 | |
| | | | 0.16 | | | 35 | |
| | | | | 0.2 | | 71 | |
| | | | | 0.04 | | 64 | |
| | | | | 0.008 | | 7 | |
| 0.02 | 20.0 | | | | 1:1000 | 100 | 100 |
| 0.02 | 4.0 | | | | 1:200 | 100 | 100 |
| 0.02 | 0.8 | | | | 1:40 | 100 | 76 |
| 0.02 | 0.16 | | | | 1:8 | 24 | 3 |
| 0.004 | 20.0 | | | | 1:5000 | 100 | 100 |
| 0.004 | 4.0 | | | | 1:1000 | 100 | 100 |
| 0.004 | 0.8 | | | | 1:200 | 100 | 76 |
| 0.004 | 0.16 | | | | 1:40 | 10 | 3 |

TABLE B5-continued in vitro-Test with *Botrytis cinerea*

| (I-300) (ppm) | (7.005) pyrimethanil (ppm) | (2.002) bixafen (ppm) | (2.005) fluopyram (ppm) | (2.038) isoflucypram (ppm) | Ratio | Efficacy % | Colby expected value % |
|---|---|---|---|---|---|---|---|
| 0.02 | | 1.0 | | | 1:50 | 81 | 67 |
| 0.02 | | 0.2 | | | 1:10 | 66 | 63 |
| 0.02 | | 0.04 | | | 1:2 | 38 | 22 |
| 0.004 | | 1.0 | | | 1:250 | 73 | 67 |
| 0.004 | | 0.2 | | | 1:50 | 70 | 63 |
| 0.004 | | 0.04 | | | 1:10 | 16 | 22 |
| 0.02 | | | 20.0 | | 1:5000 | 99 | 86 |
| 0.02 | | | 4.0 | | 1:1000 | 83 | 72 |
| 0.02 | | | 0.8 | | 1:200 | 66 | 67 |
| 0.02 | | | 0.16 | | 1:40 | 39 | 35 |
| 0.1 | | | | 0.2 | 1:2 | 100 | 88 |
| 0.1 | | | | 0.04 | 1:0.4 | 100 | 85 |
| 0.1 | | | | 0.008 | 1:0.08 | 98 | 62 |
| 0.004 | | | | 0.2 | 1:50 | 77 | 72 |
| 0.004 | | | | 0.04 | 1:10 | 67 | 66 |
| 0.004 | | | | 0.008 | 1:2 | 25 | 12 |

TABLE B6 in vitro-Test with *Botrytis cinerea*

| (I-300) (ppm) | (3.025) fenpi-coxamid (ppm) | (3.020) trifloxy-strobin (ppm) | (1.002) difeno-conazole (ppm) | (1.055) mefentriflu-conazole (ppm) | Ratio | Efficacy % | Colby expected value % |
|---|---|---|---|---|---|---|---|
| 0.1 | | | | | | 49 | |
| 0.02 | | | | | | 0 | |
| 0.004 | | | | | | 0 | |
| 0.0008 | | | | | | 0 | |
| | 5.0 | | | | | 45 | |
| | 1.0 | | | | | 15 | |
| | 0.2 | | | | | 9 | |
| | 0.04 | | | | | 15 | |
| | | 1.0 | | | | 37 | |
| | | 0.2 | | | | 0 | |
| | | 0.04 | | | | 0 | |
| | | 0.008 | | | | 19 | |
| | | | 1.0 | | | 0 | |
| | | | 0.2 | | | 0 | |
| | | | 0.04 | | | 0 | |
| | | | 0.008 | | | 8 | |
| | | | | 1.0 | | 100 | |
| | | | | 0.2 | | 53 | |
| | | | | 0.04 | | 0 | |
| | | | | 0.008 | | 0 | |
| 0.1 | 5.0 | | | | 1:50 | 97 | 77 |
| 0.1 | 1.0 | | | | 1:10 | 92 | 65 |
| 0.1 | 0.2 | | | | 1:2 | 95 | 63 |
| 0.1 | 0.04 | | | | 1:0.4 | 98 | 65 |
| 0.1 | | 1.0 | | | 1:10 | 90 | 74 |
| 0.1 | | 0.2 | | | 1:2 | 86 | 59 |
| 0.1 | | 0.04 | | | 1:0.4 | 78 | 59 |
| 0.1 | | 0.008 | | | 1:0.08 | 69 | 67 |
| 0.1 | | | 1.0 | | 1:10 | 85 | 59 |
| 0.1 | | | 0.2 | | 1:2 | 73 | 59 |
| 0.1 | | | 0.04 | | 1:0.4 | 100 | 59 |
| 0.1 | | | 0.008 | | 1:0.08 | 100 | 62 |
| 0.02 | | | | 1.0 | 1:50 | 100 | 100 |
| 0.02 | | | | 0.2 | 1:10 | 81 | 53 |
| 0.02 | | | | 0.04 | 1:2 | 0 | 0 |
| 0.02 | | | | 0.008 | 1:0.4 | 0 | 0 |
| 0.004 | | | | 1.0 | 1:250 | 100 | 100 |
| 0.004 | | | | 0.2 | 1:50 | 75 | 53 |
| 0.004 | | | | 0.04 | 1:10 | 0 | 0 |
| 0.004 | | | | 0.008 | 1:2 | 0 | 0 |

TABLE B7 in vitro-Test with *Botrytis cinerea*

| (I-300) (ppm) | (1.018) prothioconazole (ppm) | (1.021) tebuconazole (ppm) | (1.020) spiroxamine (ppm) | (15.064) (ppm) | Ratio | Efficacy % | Colby expected value % |
|---|---|---|---|---|---|---|---|
| 0.1 | | | | | | 49 | |
| 0.02 | | | | | | 0 | |
| 0.004 | | | | | | 0 | |
| 0.0008 | | | | | | 0 | |
| | 1.0 | | | | | 100 | |
| | 0.2 | | | | | 94 | |
| | 0.04 | | | | | 48 | |
| | 0.008 | | | | | 0 | |
| | | 1.0 | | | | 100 | |
| | | 0.2 | | | | 45 | |
| | | 0.04 | | | | 0 | |
| | | 0.008 | | | | 0 | |
| | | | 4.0 | | | 8 | |
| | | | 0.8 | | | 0 | |
| | | | 0.16 | | | 0 | |
| | | | | 2.0 | | 5 | |
| | | | | 0.4 | | 0 | |
| | | | | 0.08 | | 9 | |
| 0.0008 | 1.0 | | | | 1:1250 | 100 | 100 |
| 0.0008 | 0.2 | | | | 1:250 | 99 | 94 |
| 0.0008 | 0.04 | | | | 1:50 | 44 | 48 |
| 0.0008 | 0.008 | | | | 1:10 | 0 | 0 |
| 0.1 | | 1.0 | | | 1:10 | 100 | 100 |
| 0.1 | | 0.2 | | | 1:2 | 80 | 72 |
| 0.1 | | 0.04 | | | 1:0.4 | 73 | 49 |
| 0.1 | | 0.008 | | | 1:0.08 | 98 | 49 |
| 0.1 | | | 4.0 | | 1:40 | 100 | 78 |
| 0.1 | | | 0.8 | | 1:8 | 82 | 77 |
| 0.1 | | | 0.16 | | 1:1.6 | 85 | 77 |
| 0.0008 | | | 4.0 | | 1:5000 | 4 | 8 |
| 0.0008 | | | 0.8 | | 1:1000 | 25 | 0 |
| 0.0008 | | | 0.16 | | 1:200 | 0 | 0 |
| 0.1 | | | | 2.0 | 1:20 | 100 | 78 |
| 0.1 | | | | 0.4 | 1:4 | 100 | 77 |
| 0.1 | | | | 0.08 | 1:0.8 | 84 | 79 |
| 0.0008 | | | | 2.0 | 1:2500 | 8 | 5 |
| 0.0008 | | | | 0.4 | 1:500 | 0 | 0 |
| 0.0008 | | | | 0.08 | 1:100 | 11 | 9 |

TABLE B8 in vitro-Test with *Botrytis cinerea*

| (I-300) (ppm) | (13.001) fludioxonil (ppm) | (13.004) proquinazid (ppm) | (13.005) quinoxyfen (ppm) | (5.003) captan (ppm) | Ratio | Efficacy % | Colby expected value % |
|---|---|---|---|---|---|---|---|
| 0.1 | | | | | | 49 | |
| 0.02 | | | | | | 0 | |
| 0.004 | | | | | | 0 | |
| 0.0008 | | | | | | 0 | |
| | 5.0 | | | | | 100 | |
| | 1.0 | | | | | 100 | |
| | 0.2 | | | | | 100 | |
| | 0.04 | | | | | 16 | |
| | | 10.0 | | | | 0 | |
| | | 2.0 | | | | 14 | |
| | | 0.4 | | | | 0 | |
| | | 0.08 | | | | 2 | |
| | | | 10.0 | | | 0 | |
| | | | 2.0 | | | 0 | |
| | | | 0.4 | | | 0 | |
| | | | 0.08 | | | 24 | |
| | | | | 20.0 | | 100 | |
| | | | | 4.0 | | 26 | |
| | | | | 0.8 | | 0 | |
| | | | | 0.16 | | 0 | |
| 0.1 | 5.0 | | | | 1:50 | 100 | 100 |
| 0.1 | 1.0 | | | | 1:10 | 100 | 100 |
| 0.1 | 0.2 | | | | 1:2 | 100 | 100 |

TABLE B8-continued in vitro-Test with *Botrytis cinerea*

| (I-300) (ppm) | (13.001) fludioxonil (ppm) | (13.004) proquinazid (ppm) | (13.005) quinoxyfen (ppm) | (5.003) captan (ppm) | Ratio | Efficacy % | Colby expected value % |
|---|---|---|---|---|---|---|---|
| 0.1 | 0.04 | | | | 1:0.4 | 100 | 80 |
| 0.1 | | 10.0 | | | 1:100 | 100 | 77 |
| 0.1 | | 2.0 | | | 1:20 | 100 | 80 |
| 0.1 | | 0.4 | | | 1:4 | 98 | 77 |
| 0.1 | | 0.08 | | | 1:0.8 | 98 | 77 |
| 0.1 | | | 10.0 | | 1:100 | 100 | 46 |
| 0.1 | | | 2.0 | | 1:20 | 95 | 46 |
| 0.1 | | | 0.4 | | 1:4 | 97 | 46 |
| 0.1 | | | 0.08 | | 1:0.8 | 77 | 59 |
| 0.1 | | | | 20.0 | 1:200 | 100 | 100 |
| 0.1 | | | | 4.0 | 1:40 | 100 | 60 |
| 0.1 | | | | 0.8 | 1:8 | 100 | 46 |
| 0.1 | | | | 0.16 | 1:1.6 | 97 | 46 |

TABLE B9 in vitro-Test with *Botrytis cinerea*

| (I-300) (ppm) | (5.010) dithianon (ppm) | (5.012) folpet (ppm) | (5.013) mancozeb (ppm) | (5.018) propineb (ppm) | Ratio | Efficacy % | Colby expected value % |
|---|---|---|---|---|---|---|---|
| 0.1 | | | | | | 49 | |
| 0.02 | | | | | | 0 | |
| 0.004 | | | | | | 0 | |
| 0.0008 | | | | | | 0 | |
| | 20.0 | | | | | 99 | |
| | 4.0 | | | | | 15 | |
| | 0.8 | | | | | 0 | |
| | 0.16 | | | | | 26 | |
| | | 10.0 | | | | 100 | |
| | | 2.0 | | | | 100 | |
| | | 0.4 | | | | 0 | |
| | | 0.08 | | | | 0 | |
| | | | 100.0 | | | 83 | |
| | | | 20.0 | | | 15 | |
| | | | 4.0 | | | 0 | |
| | | | 0.8 | | | 15 | |
| | | | | 100.0 | | 83 | |
| | | | | 20.0 | | 15 | |
| | | | | 4.0 | | 0 | |
| | | | | 0.8 | | 15 | |
| 0.1 | 20.0 | | | | 1:200 | 100 | 100 |
| 0.1 | 4.0 | | | | 1:40 | 100 | 54 |
| 0.1 | 0.8 | | | | 1:8 | 100 | 46 |
| 0.1 | 0.16 | | | | 1:1.6 | 99 | 60 |
| 0.1 | | 10.0 | | | 1:100 | 100 | 100 |
| 0.1 | | 2.0 | | | 1:20 | 100 | 100 |
| 0.1 | | 0.4 | | | 1:4 | 100 | 46 |
| 0.1 | | 0.08 | | | 1:0.8 | 79 | 46 |
| 0.0008 | | 10.0 | | | 1:12500 | 99 | 100 |
| 0.0008 | | 2.0 | | | 1:2500 | 100 | 100 |
| 0.0008 | | 0.4 | | | 1:500 | 0 | 0 |
| 0.0008 | | 0.08 | | | 1:100 | 15 | 0 |
| 0.1 | | | 100.0 | | 1:100 | 100 | 78 |
| 0.1 | | | 20.0 | | 1:20 | 90 | 64 |
| 0.1 | | | 4.0 | | 1:4 | 79 | 59 |
| 0.1 | | | 0.8 | | 1:0.8 | 82 | 61 |
| 0.0008 | | | 100.0 | | 1:12500 | 64 | 47 |
| 0.0008 | | | 20.0 | | 1:2500 | 13 | 13 |
| 0.0008 | | | 4.0 | | 1:500 | 14 | 1 |
| 0.0008 | | | 0.8 | | 1:100 | 8 | 7 |
| 0.1 | | | | 100.0 | 1:1000 | 100 | 93 |
| 0.1 | | | | 20.0 | 1:200 | 62 | 64 |
| 0.1 | | | | 4.0 | 1:40 | 57 | 58 |
| 0.1 | | | | 0.8 | 1:8 | 74 | 65 |
| 0.0008 | | | | 100.0 | 1:125000 | 95 | 83 |
| 0.0008 | | | | 20.0 | 1:25000 | 15 | 15 |
| 0.0008 | | | | 4.0 | 1:5000 | 0 | 0 |
| 0.0008 | | | | 0.8 | 1:1000 | 7 | 15 |

TABLE B10 in vitro-Test with *Botrytis cinerea*

| (I-300) (ppm) | (15.016) metrafenone (ppm) | (17.001) *Bacillus subtilis* (ppm) | (17.012) *Paenibacillus terrae* (ppm) | (18.001) FLiPPER (ppm) | Ratio | Efficacy % | Colby expected value % |
|---|---|---|---|---|---|---|---|
| 0.1 | | | | | | 49 | |
| 0.02 | | | | | | 0 | |
| 0.004 | | | | | | 0 | |
| 0.0008 | | | | | | 0 | |
| | 20.0 | | | | | 0 | |
| | 4.0 | | | | | 0 | |
| | 0.8 | | | | | 18 | |
| | 0.16 | | | | | 15 | |
| | | 200.0 | | | | 23 | |
| | | 40.0 | | | | 0 | |
| | | 8.0 | | | | 0 | |
| | | 1.6 | | | | 0 | |
| | | | 200.0 | | | 100 | |
| | | | 40.0 | | | 13 | |
| | | | 8.0 | | | 13 | |
| | | | 1.6 | | | 0 | |
| | | | | 200.0 | | 0 | |
| | | | | 40.0 | | 1 | |
| | | | | 8.0 | | 6 | |
| | | | | 1.6 | | 0 | |
| 0.1 | 20.0 | | | | 1:200 | 99 | 58 |
| 0.1 | 4.0 | | | | 1:40 | 71 | 58 |
| 0.1 | 0.8 | | | | 1:8 | 77 | 66 |
| 0.1 | 0.16 | | | | 1:1.6 | 67 | 65 |
| 0.1 | | 200.0 | | | 1:2000 | 85 | 73 |
| 0.1 | | 40.0 | | | 1:400 | 74 | 64 |
| 0.1 | | 8.0 | | | 1:80 | 91 | 64 |
| 0.1 | | 1.6 | | | 1:16 | 58 | 64 |
| 0.0008 | | | 200.0 | | 1:2000 | 100 | 100 |
| 0.0008 | | | 40.0 | | 1:400 | 79 | 69 |
| 0.0008 | | | 8.0 | | 1:80 | 99 | 69 |
| 0.0008 | | | 1.6 | | 1:16 | 69 | 64 |
| 0.1 | | | | 200.0 | 1:2000 | 82 | 64 |
| 0.1 | | | | 40.0 | 1:400 | 100 | 65 |
| 0.1 | | | | 8.0 | 1:80 | 77 | 67 |
| 0.1 | | | | 1.6 | 1:16 | 66 | 64 |

TABLE B11 in vitro-Test with *Botrytis cinerea*

| (I-302) (ppm) | (7.005) pyrimethanil (ppm) | (2.005) fluopyram (ppm) | (2.028) inpyrfluxam (ppm) | (2.038) isoflucypram (ppm) | Ratio | Efficacy % | Colby expected value % |
|---|---|---|---|---|---|---|---|
| 0.1 | | | | | | 88 | |
| 0.02 | | | | | | 2 | |
| 0.004 | | | | | | 0 | |
| 0.0008 | | | | | | 0 | |
| | 20.0 | | | | | 100 | |
| | 4.0 | | | | | 100 | |
| | 0.8 | | | | | 100 | |
| | 0.16 | | | | | 22 | |
| | | 20.0 | | | | 75 | |
| | | 4.0 | | | | 75 | |
| | | 0.8 | | | | 65 | |
| | | 0.16 | | | | 5 | |
| | | | 0.2 | | | 71 | |
| | | | 0.04 | | | 48 | |
| | | | 0.008 | | | 4 | |
| | | | | 1.0 | | 77 | |
| | | | | 0.2 | | 58 | |
| | | | | 0.04 | | 53 | |
| | | | | 0.008 | | 5 | |
| 0.02 | 20.0 | | | | 1:1000 | 100 | 100 |
| 0.02 | 4.0 | | | | 1:200 | 100 | 100 |
| 0.02 | 0.8 | | | | 1:40 | 100 | 100 |
| 0.02 | 0.16 | | | | 1:8 | 68 | 24 |
| 0.004 | 20.0 | | | | 1:5000 | 100 | 100 |

TABLE B11-continued in vitro-Test with *Botrytis cinerea*

| (I-302) (ppm) | (7.005) pyrimethanil (ppm) | (2.005) fluopyram (ppm) | (2.028) inpyrfluxam (ppm) | (2.038) isoflucypram (ppm) | Ratio | Efficacy % | Colby expected value % |
|---|---|---|---|---|---|---|---|
| 0.004 | 4.0 | | | | 1:1000 | 100 | 100 |
| 0.004 | 0.8 | | | | 1:200 | 100 | 100 |
| 0.004 | 0.16 | | | | 1:40 | 54 | 34 |
| 0.1 | | 20.0 | | | 1:200 | 98 | 97 |
| 0.1 | | 4.0 | | | 1:40 | 99 | 97 |
| 0.1 | | 0.8 | | | 1:8 | 98 | 96 |
| 0.1 | | 0.16 | | | 1:1.6 | 100 | 90 |
| 0.0008 | | 20.0 | | | 1:25000 | 89 | 75 |
| 0.0008 | | 4.0 | | | 1:5000 | 78 | 75 |
| 0.0008 | | 0.8 | | | 1:1000 | 68 | 65 |
| 0.0008 | | 0.16 | | | 1:200 | 30 | 5 |
| 0.1 | | | 0.2 | | 1:2 | 98 | 97 |
| 0.1 | | | 0.04 | | 1:0.4 | 100 | 94 |
| 0.1 | | | 0.008 | | 1:0.08 | 100 | 89 |
| 0.0008 | | | 0.2 | | 1:250 | 74 | 71 |
| 0.0008 | | | 0.04 | | 1:50 | 42 | 48 |
| 0.0008 | | | 0.008 | | 1:10 | 12 | 4 |
| 0.1 | | | | 1.0 | 1:10 | 100 | 97 |
| 0.1 | | | | 0.2 | 1:2 | 100 | 95 |
| 0.1 | | | | 0.04 | 1:0.4 | 98 | 94 |
| 0.1 | | | | 0.008 | 1:0.08 | 100 | 88 |
| 0.0008 | | | | 1.0 | 1:1250 | 73 | 77 |
| 0.0008 | | | | 0.2 | 1:250 | 66 | 58 |
| 0.0008 | | | | 0.04 | 1:50 | 52 | 53 |
| 0.0008 | | | | 0.008 | 1:10 | 21 | 5 |

TABLE B12 in vitro-Test with *Botrytis cinerea*

| (I-302) (ppm) | (1.020) spiroxamine (ppm) | (13.001) fludioxonil (ppm) | (13.004) proquinazid (ppm) | (13.005) quinoxyfen (ppm) | Ratio | Efficacy % | Colby expected value % |
|---|---|---|---|---|---|---|---|
| 0.1 | | | | | | 88 | |
| 0.02 | | | | | | 2 | |
| 0.004 | | | | | | 0 | |
| 0.0008 | | | | | | 0 | |
| | 20.0 | | | | | 14 | |
| | 4.0 | | | | | 0 | |
| | 0.8 | | | | | 0 | |
| | 0.16 | | | | | 0 | |
| | | 5.0 | | | | 100 | |
| | | 1.0 | | | | 100 | |
| | | 0.2 | | | | 100 | |
| | | 0.04 | | | | 0 | |
| | | | 10.0 | | | 0 | |
| | | | 2.0 | | | 0 | |
| | | | 0.4 | | | 0 | |
| | | | 0.08 | | | 13 | |
| | | | | 10.0 | | 7 | |
| | | | | 2.0 | | 2 | |
| | | | | 0.4 | | 0 | |
| | | | | 0.08 | | 0 | |
| 0.1 | 20.0 | | | | 1:200 | 75 | 80 |
| 0.1 | 4.0 | | | | 1:40 | 85 | 77 |
| 0.1 | 0.8 | | | | 1:8 | 85 | 77 |
| 0.1 | 0.16 | | | | 1:1.6 | 100 | 77 |
| 0.004 | 20.0 | | | | 1:5000 | 18 | 14 |
| 0.004 | 4.0 | | | | 1:1000 | 0 | 0 |
| 0.004 | 0.8 | | | | 1:200 | 18 | 0 |
| 0.004 | 0.16 | | | | 1:40 | 0 | 0 |
| 0.1 | | 5.0 | | | 1:50 | 100 | 100 |
| 0.1 | | 1.0 | | | 1:10 | 100 | 100 |
| 0.1 | | 0.2 | | | 1:2 | 100 | 100 |
| 0.1 | | 0.04 | | | 1:0.4 | 100 | 77 |
| 0.02 | | 5.0 | | | 1:250 | 100 | 100 |
| 0.02 | | 1.0 | | | 1:50 | 100 | 100 |
| 0.02 | | 0.2 | | | 1:10 | 100 | 100 |
| 0.02 | | 0.04 | | | 1:2 | 59 | 0 |
| 0.1 | | | 10.0 | | 1:100 | 88 | 77 |

TABLE B12-continued in vitro-Test with *Botrytis cinerea*

| (I-302) (ppm) | (1.020) spiroxamine (ppm) | (13.001) fludioxonil (ppm) | (13.004) proquinazid (ppm) | (13.005) quinoxyfen (ppm) | Ratio | Efficacy % | Colby expected value % |
|---|---|---|---|---|---|---|---|
| 0.1 | | | 2.0 | | 1:20 | 100 | 77 |
| 0.1 | | | 0.4 | | 1:4 | 92 | 77 |
| 0.1 | | | 0.08 | | 1:0.8 | 99 | 80 |
| 0.02 | | | 10.0 | | 1:500 | 0 | 0 |
| 0.02 | | | 2.0 | | 1:100 | 8 | 0 |
| 0.02 | | | 0.4 | | 1:20 | 46 | 0 |
| 0.02 | | | 0.08 | | 1:4 | 58 | 13 |
| 0.1 | | | | 10.0 | 1:100 | 99 | 82 |
| 0.1 | | | | 2.0 | 1:20 | 100 | 81 |
| 0.1 | | | | 0.4 | 1:4 | 100 | 80 |
| 0.1 | | | | 0.08 | 1:0.8 | 100 | 80 |

TABLE B13 in vitro-Test with *Botrytis cinerea*

| (I-302) (ppm) | (5.003) captan (ppm) | (5.010) dithianon (ppm) | (5.012) folpet (ppm) | (5.018) propineb (ppm) | Ratio | Efficacy % | Colby expected value % |
|---|---|---|---|---|---|---|---|
| 0.1 | | | | | | 88 | |
| 0.02 | | | | | | 2 | |
| 0.004 | | | | | | 0 | |
| 0.0008 | | | | | | 0 | |
| | 20.0 | | | | | 100 | |
| | 4.0 | | | | | 100 | |
| | 0.8 | | | | | 0 | |
| | 0.16 | | | | | 0 | |
| | | 20.0 | | | | 100 | |
| | | 4.0 | | | | 100 | |
| | | 0.8 | | | | 0 | |
| | | 0.16 | | | | 0 | |
| | | | 10.0 | | | 100 | |
| | | | 2.0 | | | 100 | |
| | | | 0.4 | | | 8 | |
| | | | 0.08 | | | 8 | |
| | | | | 100.0 | | 86 | |
| | | | | 4.0 | | 0 | |
| | | | | 0.8 | | 16 | |
| 0.1 | 20.0 | | | | 1:200 | 100 | 100 |
| 0.1 | 4.0 | | | | 1:40 | 100 | 100 |
| 0.1 | 0.8 | | | | 1:8 | 100 | 80 |
| 0.1 | 0.16 | | | | 1:1.6 | 100 | 80 |
| 0.0008 | 20.0 | | | | 1:25000 | 100 | 100 |
| 0.0008 | 4.0 | | | | 1:5000 | 100 | 100 |
| 0.0008 | 0.8 | | | | 1:1000 | 0 | 0 |
| 0.0008 | 0.16 | | | | 1:200 | 16 | 0 |
| 0.1 | | 20.0 | | | 1:200 | 100 | 100 |
| 0.1 | | 4.0 | | | 1:40 | 100 | 100 |
| 0.1 | | 0.8 | | | 1:8 | 100 | 80 |
| 0.1 | | 0.16 | | | 1:1.6 | 100 | 80 |
| 0.0008 | | 20.0 | | | 1:25000 | 100 | 100 |
| 0.0008 | | 4.0 | | | 1:5000 | 100 | 100 |
| 0.0008 | | 0.8 | | | 1:1000 | 9 | 0 |
| 0.0008 | | 0.16 | | | 1:200 | 13 | 0 |
| 0.1 | | | 10.0 | | 1:100 | 100 | 100 |
| 0.1 | | | 2.0 | | 1:20 | 100 | 100 |
| 0.1 | | | 0.4 | | 1:4 | 100 | 82 |
| 0.1 | | | 0.08 | | 1:0.8 | 98 | 82 |
| 0.0008 | | | 10.0 | | 1:12500 | 100 | 100 |
| 0.0008 | | | 2.0 | | 1:2500 | 100 | 100 |
| 0.0008 | | | 0.4 | | 1:500 | 10 | 8 |
| 0.0008 | | | 0.08 | | 1:100 | 15 | 8 |
| 0.1 | | | | 100.0 | 1:1000 | 100 | 99 |
| 0.1 | | | | 4.0 | 1:40 | 100 | 93 |
| 0.1 | | | | 0.8 | 1:8 | 100 | 94 |
| 0.0008 | | | | 100.0 | 1:125000 | 91 | 86 |
| 0.0008 | | | | 4.0 | 1:5000 | 0 | 0 |
| 0.0008 | | | | 0.8 | 1:1000 | 12 | 16 |

TABLE B14 in vitro-Test with *Botrytis cinerea*

| (I-302) (ppm) | (15.012) fosetylaluminium (ppm) | (15.016) metrafenone (ppm) | (17.012) *Paenibacillus terrae* (ppm) | Ratio | Efficacy % | Colby expected value % |
|---|---|---|---|---|---|---|
| 0.1 | | | | | 88 | |
| 0.02 | | | | | 2 | |
| 0.004 | | | | | 0 | |
| 0.0008 | | | | | 0 | |
| | 100.0 | | | | 1 | |
| | 4.0 | | | | 13 | |
| | 0.8 | | | | 0 | |
| | | 20.0 | | | 0 | |
| | | 0.8 | | | 0 | |
| | | 0.16 | | | 0 | |
| | | | 200.0 | | 94 | |
| | | | 40.0 | | 2 | |
| 0.1 | 100.0 | | | 1:1000 | 100 | 93 |
| 0.1 | 4.0 | | | 1:40 | 96 | 93 |
| 0.1 | 0.8 | | | 1:8 | 97 | 93 |
| 0.0008 | 100.0 | | | 1:125000 | 0 | 1 |
| 0.0008 | 4.0 | | | 1:5000 | 17 | 13 |
| 0.0008 | 0.8 | | | 1:1000 | 23 | 0 |
| 0.1 | | 20.0 | | 1:200 | 100 | 93 |
| 0.1 | | 0.8 | | 1:8 | 99 | 93 |
| 0.1 | | 0.16 | | 1:1.6 | 100 | 93 |
| 0.0008 | | 20.0 | | 1:25000 | 0 | 0 |
| 0.0008 | | 0.8 | | 1:1000 | 0 | 0 |
| 0.0008 | | 0.16 | | 1:200 | 22 | 0 |
| 0.1 | | | 200.0 | 1:2000 | 100 | 100 |
| 0.1 | | | 40.0 | 1:400 | 100 | 100 |
| 0.02 | | | 200.0 | 1:10000 | 100 | 95 |
| 0.02 | | | 40.0 | 1:2000 | 37 | 22 |
| 0.004 | | | 200.0 | 1:50000 | 94 | 94 |
| 0.004 | | | 40.0 | 1:10000 | 0 | 2 |
| 0.0008 | | | 200.0 | 1:250000 | 94 | 88 |
| 0.0008 | | | 40.0 | 1:50000 | 0 | 2 |

TABLE B15 in vitro-Test with *Botrytis cinerea*

| (I-338) (ppm) | (2.002) bixafen (ppm) | (1.002) difeno-conazole (ppm) | (3.025) fenpicox-amid (ppm) | (2.005) fluo-pyram (ppm) | (15.043) fluoxa-piprolin (ppm) | (5.012) folpet (ppm) | Ratio | Efficacy % | Colby expected value % |
|---|---|---|---|---|---|---|---|---|---|
| 1 | | | | | | | | 100 | |
| 0.2 | | | | | | | | 0 | |
| 0.04 | | | | | | | | 8 | |
| 0.008 | | | | | | | | 0 | |
| | 1 | | | | | | | 66 | |
| | 0.2 | | | | | | | 0 | |
| | 0.008 | | | | | | | 6 | |
| | | 1 | | | | | | 13 | |
| | | | 1 | | | | | 52 | |
| | | | 0.2 | | | | | 14 | |
| | | | 0.008 | | | | | 0 | |
| | | | | 20 | | | | 100 | |
| | | | | 4 | | | | 79 | |
| | | | | 0.8 | | | | 51 | |
| | | | | 0.16 | | | | 0 | |
| | | | | | 0.16 | | | 1 | |
| | | | | | | 1 | | 16 | |
| | | | | | | 0.04 | | 1 | |
| | | | | | | 0.008 | | 8 | |
| 0.008 | 1 | | | | | | 1:125 | 70 | 67 |
| 0.008 | 0.2 | | | | | | 1:25 | 25 | 21 |
| 0.008 | 0.008 | | | | | | 1:1 | 40 | 7 |
| 0.2 | | 1 | | | | | 1:5 | 26 | 13 |
| 0.04 | | 1 | | | | | 1:25 | 31 | 13 |
| 0.008 | | 1 | | | | | 1:125 | 27 | 13 |
| 0.008 | | | 1 | | | | 1:125 | 56 | 52 |
| 0.008 | | | 0.2 | | | | 1:25 | 20 | 14 |
| 0.008 | | | 0.008 | | | | 1:1 | 33 | 0 |

TABLE B15-continued in vitro-Test with *Botrytis cinerea*

| (I-338) (ppm) | (2.002) bixafen (ppm) | (1.002) difeno-conazole (ppm) | (3.025) fenpicox-amid (ppm) | (2.005) fluo-pyram (ppm) | (15.043) fluoxa-piprolin (ppm) | (5.012) folpet (ppm) | Ratio | Efficacy % | Colby expected value % |
|---|---|---|---|---|---|---|---|---|---|
| 0.04 | | | | 20 | | | 1:500 | 99 | 100 |
| 0.04 | | | | 4 | | | 1:100 | 84 | 79 |
| 0.04 | | | | 0.8 | | | 1:20 | 57 | 51 |
| 0.04 | | | | 0.16 | | | 1:4 | 6 | 0 |
| 1 | | | | | 0.16 | | 1:0.16 | 100 | 94 |
| 0.04 | | | | | 0.16 | | 1:4 | 1 | 1 |
| 0.008 | | | | | 0.16 | | 1:20 | 4 | 1 |
| 1 | | | | | | 1 | 1:1 | 100 | 87 |
| 1 | | | | | | 0.04 | 1:0.04 | 88 | 85 |
| 1 | | | | | | 0.008 | 1:0.008 | 92 | 86 |
| 0.008 | | | | | | 1 | 1:125 | 24 | 16 |
| 0.008 | | | | | | 0.04 | 1:5 | 5 | 1 |
| 0.008 | | | | | | 0.008 | 1:1 | 7 | 8 |

TABLE B16 in vitro-Test with *Botrytis cinerea*

| (I-338) (ppm) | (15.012) fosetyl-al (ppm) | (2.028) inpyr-fluxam (ppm) | (2.038) isoflucy-pram (ppm) | (5.013) manco-zeb (ppm) | (1.055) mefen-triflu-conazole (ppm) | (3.030) metyl-tetraprole (ppm) | Ratio | Efficacy % | Colby expected value % |
|---|---|---|---|---|---|---|---|---|---|
| 1 | | | | | | | | 85 | |
| 0.2 | | | | | | | | 0 | |
| 0.04 | | | | | | | | 0 | |
| 0.008 | | | | | | | | 0 | |
| | 100 | | | | | | | 0 | |
| | 4 | | | | | | | 2 | |
| | | 1 | | | | | | 71 | |
| | | 0.2 | | | | | | 52 | |
| | | | 1 | | | | | 70 | |
| | | | 0.2 | | | | | 53 | |
| | | | | 20 | | | | 0 | |
| | | | | 0.8 | | | | 0 | |
| | | | | 0.16 | | | | 0 | |
| | | | | | 0.2 | | | 30 | |
| | | | | | 0.04 | | | 0 | |
| | | | | | 0.008 | | | 0 | |
| | | | | | | 1 | | 33 | |
| | | | | | | 0.2 | | 7 | |
| | | | | | | 0.04 | | 11 | |
| | | | | | | 0.008 | | 7 | |
| 1 | 100 | | | | | | 1:100 | 100 | 85 |
| 1 | 4 | | | | | | 1:4 | 87 | 85 |
| 0.008 | 100 | | | | | | 1:12500 | 0 | 0 |
| 0.008 | 4 | | | | | | 1:500 | 8 | 2 |
| 0.2 | | 1 | | | | | 1:5 | 73 | 71 |
| 0.2 | | 0.2 | | | | | 1:1 | 51 | 52 |
| 0.008 | | 1 | | | | | 1:125 | 72 | 71 |
| 0.008 | | 0.2 | | | | | 1:25 | 53 | 52 |
| 0.2 | | | 1 | | | | 1:5 | 77 | 70 |
| 0.2 | | | 0.2 | | | | 1:1 | 56 | 53 |
| 0.04 | | | 1 | | | | 1:25 | 74 | 70 |
| 0.04 | | | 0.2 | | | | 1:5 | 53 | 53 |
| 0.008 | | | 1 | | | | 1:125 | 76 | 70 |
| 0.008 | | | 0.2 | | | | 1:25 | 53 | 53 |
| 0.008 | | | | 20 | | | 1:2500 | 98 | 0 |
| 0.008 | | | | 0.8 | | | 1:100 | 0 | 0 |
| 0.008 | | | | 0.16 | | | 1:20 | 1 | 0 |
| 0.2 | | | | | 0.2 | | 1:1 | 76 | 30 |
| 0.2 | | | | | 0.04 | | 1:0.2 | 5 | 0 |
| 0.2 | | | | | 0.008 | | 1:0.04 | 0 | 0 |
| 0.04 | | | | | | 1 | 1:25 | 36 | 35 |
| 0.04 | | | | | | 0.2 | 1:5 | 25 | 11 |
| 0.04 | | | | | | 0.04 | 1:1 | 21 | 14 |
| 0.04 | | | | | | 0.008 | 1:0.2 | 15 | 10 |

TABLE B17 in vitro-Test with *Botrytis cinerea*

| (I-338) (ppm) | (2.017) penflufen (ppm) | (5.018) propineb (ppm) | (13.004) proquinazid (ppm) | (7.005) pyrimethanil (ppm) | (13.005) quinoxyfen (ppm) | Ratio | Efficacy % | Colby expected value % |
|---|---|---|---|---|---|---|---|---|
| 1 | | | | | | | 74 | |
| 0.2 | | | | | | | 13 | |
| 0.04 | | | | | | | 6 | |
| 0.008 | | | | | | | 3 | |
| | 5 | | | | | | 70 | |
| | 0.04 | | | | | | 0 | |
| | | 100 | | | | | 8 | |
| | | 20 | | | | | 0 | |
| | | 4 | | | | | 5 | |
| | | | 10 | | | | 16 | |
| | | | 2 | | | | 3 | |
| | | | 0.4 | | | | 0 | |
| | | | | 4 | | | 95 | |
| | | | | 0.8 | | | 89 | |
| | | | | 0.16 | | | 16 | |
| | | | | | 0.4 | | 0 | |
| | | | | | 0.08 | | 0 | |
| 0.04 | 5 | | | | | 1:125 | 74 | 71 |
| 0.04 | 0.04 | | | | | 1:1 | 1 | 4 |
| 0.008 | 5 | | | | | 1:625 | 77 | 70 |
| 0.008 | 0.04 | | | | | 1:5 | 7 | 0 |
| 1 | | 100 | | | | 1:100 | 100 | 76 |
| 1 | | 20 | | | | 1:20 | 100 | 74 |
| 1 | | 4 | | | | 1:4 | 100 | 75 |
| 1 | | | 10 | | | 1:10 | 100 | 78 |
| 1 | | | 2 | | | 1:2 | 91 | 75 |
| 1 | | | 0.4 | | | 1:0.4 | 95 | 74 |
| 0.2 | | | | 4 | | 1:20 | 100 | 96 |
| 0.2 | | | | 0.8 | | 1:4 | 93 | 90 |
| 0.2 | | | | 0.16 | | 1:0.8 | 85 | 27 |
| 0.04 | | | | 4 | | 1:100 | 100 | 95 |
| 0.04 | | | | 0.8 | | 1:20 | 96 | 90 |
| 0.04 | | | | 0.16 | | 1:4 | 90 | 21 |
| 0.008 | | | | 4 | | 1:500 | 97 | 95 |
| 0.008 | | | | 0.8 | | 1:100 | 87 | 89 |
| 0.008 | | | | 0.16 | | 1:20 | 89 | 19 |
| 0.04 | | | | | 0.4 | 1:10 | 8 | 0 |
| 0.04 | | | | | 0.08 | 1:2 | 16 | 0 |
| 0.008 | | | | | 0.4 | 1:50 | 8 | 5 |
| 0.008 | | | | | 0.08 | 1:10 | 12 | 5 |

TABLE B18 in vitro-Test with *Botrytis cinerea*

| (I-130) (ppm) | (15.043) fluoxa-piprolin (ppm) | (3.012) fluoxa-strobin (ppm) | (1.062) fluoxytio-conazole (ppm) | (5.013) manco-zeb (ppm) | (12.004) meta-laxyl-m (ppm) | (13.004) pro-quinazid (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 96 | |
| | 20 | | | | | | | 5 | |
| | 4 | | | | | | | 6 | |
| | 0.8 | | | | | | | 0 | |
| | | 2 | | | | | | 31 | |
| | | 0.4 | | | | | | 20 | |
| | | 0.016 | | | | | | 0 | |
| | | | 1 | | | | | 13 | |
| | | | 0.2 | | | | | 0 | |
| | | | 0.008 | | | | | 0 | |
| | | | | 20 | | | | 15 | |
| | | | | 0.8 | | | | 4 | |
| | | | | 0.16 | | | | 0 | |
| | | | | | 100 | | | 13 | |
| | | | | | 20 | | | 4 | |

TABLE B18-continued in vitro-Test with *Botrytis cinerea*

| (I-130) (ppm) | (15.043) fluoxa-piprolin (ppm) | (3.012) fluoxa-strobin (ppm) | (1.062) fluoxytio-conazole (ppm) | (5.013) manco-zeb (ppm) | (12.004) meta-laxyl-m (ppm) | (13.004) pro-quinazid (ppm) | Ratio | Efficacy % | Colby expected value % |
|---|---|---|---|---|---|---|---|---|---|
| | | | | | 4 | | | 3 | |
| | | | | | 0.8 | | | 5 | |
| | | | | | | 10 | | 0 | |
| | | | | | | 2 | | 5 | |
| | | | | | | 0.4 | | 0 | |
| 0.008 | 20 | | | | | | 1:2500 | 100 | 96 |
| 0.008 | 4 | | | | | | 1:500 | 100 | 96 |
| 0.008 | 0.8 | | | | | | 1:100 | 100 | 96 |
| 0.008 | | 2 | | | | | 1:250 | 100 | 97 |
| 0.008 | | 0.4 | | | | | 1:50 | 100 | 97 |
| 0.008 | | 0.016 | | | | | 1:2 | 97 | 96 |
| 0.008 | | | 1 | | | | 1:125 | 100 | 97 |
| 0.008 | | | 0.2 | | | | 1:25 | 100 | 96 |
| 0.008 | | | 0.008 | | | | 1:1 | 97 | 96 |
| 0.008 | | | | 20 | | | 1:2500 | 91 | 86 |
| 0.008 | | | | 0.8 | | | 1:100 | 99 | 85 |
| 0.008 | | | | 0.16 | | | 1:20 | 100 | 84 |
| 0.008 | | | | | 100 | | 1:12500 | 100 | 86 |
| 0.008 | | | | | 20 | | 1:2500 | 99 | 85 |
| 0.008 | | | | | 4 | | 1:500 | 98 | 84 |
| 0.008 | | | | | 0.8 | | 1:100 | 98 | 85 |
| 0.008 | | | | | | 10 | 1:1250 | 61 | 34 |
| 0.008 | | | | | | 2 | 1:250 | 65 | 37 |
| 0.008 | | | | | | 0.4 | 1:50 | 49 | 34 |

TABLE C1 in vitro-Test with *Cercospora beticola*

| (I-052) (ppm) | (7.005) pyrimethanil (ppm) | (2.005) fluopyram (ppm) | (3.025) fenpicoxamid (ppm) | (1.002) difeno-conazole (ppm) | Ratio | Efficacy % | Colby expected value % |
|---|---|---|---|---|---|---|---|
| 0.1 | | | | | | 20 | |
| 0.02 | | | | | | 0 | |
| 0.004 | | | | | | 0 | |
| 0.0008 | | | | | | 0 | |
| | 20.0 | | | | | 100 | |
| | 4.0 | | | | | 98 | |
| | 0.8 | | | | | 10 | |
| | 0.16 | | | | | 11 | |
| | | 20.0 | | | | 39 | |
| | | 4.0 | | | | 27 | |
| | | 0.8 | | | | 0 | |
| | | 0.16 | | | | 3 | |
| | | | 5.0 | | | 92 | |
| | | | 1.0 | | | 62 | |
| | | | 0.2 | | | 41 | |
| | | | 0.04 | | | 0 | |
| | | | | 1.0 | | 99 | |
| | | | | 0.2 | | 79 | |
| 0.02 | 20.0 | | | | 1:1000 | 100 | 100 |
| 0.02 | 4.0 | | | | 1:200 | 92 | 98 |
| 0.02 | 0.8 | | | | 1:40 | 24 | 10 |
| 0.02 | 0.16 | | | | 1:8 | 16 | 11 |
| 0.0008 | 20.0 | | | | 1:25000 | 100 | 100 |
| 0.0008 | 4.0 | | | | 1:5000 | 99 | 98 |
| 0.0008 | 0.8 | | | | 1:1000 | 11 | 10 |
| 0.0008 | 0.16 | | | | 1:200 | 18 | 11 |
| 0.0008 | | 20.0 | | | 1:25000 | 50 | 39 |
| 0.0008 | | 4.0 | | | 1:5000 | 30 | 27 |
| 0.0008 | | 0.8 | | | 1:1000 | 22 | 0 |
| 0.0008 | | 0.16 | | | 1:200 | 18 | 3 |
| 0.1 | | | 5.0 | | 1:50 | 96 | 94 |
| 0.1 | | | 1.0 | | 1:10 | 81 | 69 |
| 0.1 | | | 0.2 | | 1:2 | 78 | 53 |
| 0.1 | | | 0.04 | | 1:0.4 | 20 | 20 |
| 0.1 | | | | 1.0 | 1:10 | 99 | 100 |

TABLE C1-continued in vitro-Test with *Cercospora beticola*

| (I-052) (ppm) | (7.005) pyrimethanil (ppm) | (2.005) fluopyram (ppm) | (3.025) fenpicoxamid (ppm) | (1.002) difeno-conazole (ppm) | Ratio | Efficacy % | Colby expected value % |
|---|---|---|---|---|---|---|---|
| 0.1 | | | | 0.2 | 1:2 | 90 | 83 |
| 0.02 | | | | 1.0 | 1:50 | 100 | 99 |
| 0.02 | | | | 0.2 | 1:10 | 81 | 79 |
| 0.004 | | | | 1.0 | 1:250 | 100 | 99 |
| 0.004 | | | | 0.2 | 1:50 | 91 | 79 |
| 0.0008 | | | | 1.0 | 1:1250 | 100 | 99 |
| 0.0008 | | | | 0.2 | 1:250 | 99 | 79 |

TABLE C2 in vitro-Test with *Cercospora beticola*

| (I-052) (ppm) | (1.055) mefen-triflu-conazole (ppm) | (1.018) prothio-conazole (ppm) | (13.001) fludio-xonil (ppm) | (5.003) captan (ppm) | Ratio | Effi-cacy % | Colby expec-ted value % |
|---|---|---|---|---|---|---|---|
| 0.1 | | | | | | 20 | |
| 0.02 | | | | | | 0 | |
| 0.004 | | | | | | 0 | |
| 0.0008 | | | | | | 0 | |
| | 1.0 | | | | | 100 | |
| | 0.2 | | | | | 100 | |
| | 0.04 | | | | | 100 | |
| | 0.008 | | | | | 60 | |
| | | 1.0 | | | | 100 | |
| | | 0.2 | | | | 100 | |
| | | 0.04 | | | | 22 | |
| | | 0.008 | | | | 21 | |
| | | | 5.0 | | | 93 | |
| | | | 1.0 | | | 44 | |
| | | | 0.2 | | | 14 | |
| | | | | 20.0 | | 57 | |
| | | | | 4.0 | | 45 | |
| | | | | 0.8 | | 0 | |
| 0.02 | 1.0 | | | | 1:50 | 100 | 100 |
| 0.02 | 0.2 | | | | 1:10 | 100 | 100 |
| 0.02 | 0.04 | | | | 1:2 | 100 | 100 |
| 0.02 | 0.008 | | | | 1:0.4 | 79 | 60 |
| 0.004 | 1.0 | | | | 1:250 | 100 | 100 |
| 0.004 | 0.2 | | | | 1:50 | 100 | 100 |
| 0.004 | 0.04 | | | | 1:10 | 100 | 100 |
| 0.004 | 0.008 | | | | 1:2 | 95 | 69 |
| 0.0008 | 1.0 | | | | 1:1250 | 100 | 100 |

TABLE C2-continued in vitro-Test with *Cercospora beticola*

| (I-052) (ppm) | (1.055) mefen-triflu-conazole (ppm) | (1.018) prothio-conazole (ppm) | (13.001) fludio-xonil (ppm) | (5.003) captan (ppm) | Ratio | Effi-cacy % | Colby expec-ted value % |
|---|---|---|---|---|---|---|---|
| 0.0008 | 0.2 | | | | 1:250 | 100 | 100 |
| 0.0008 | 0.04 | | | | 1:50 | 100 | 100 |
| 0.0008 | 0.008 | | | | 1:10 | 88 | 62 |
| 0.1 | | 1.0 | | | 1:10 | 100 | 100 |
| 0.1 | | 0.2 | | | 1:2 | 98 | 100 |
| 0.1 | | 0.04 | | | 1:0.4 | 45 | 22 |
| 0.1 | | 0.008 | | | 1:0.08 | 26 | 21 |
| 0.0008 | | 1.0 | | | 1:1250 | 100 | 100 |
| 0.0008 | | 0.2 | | | 1:250 | 100 | 100 |
| 0.0008 | | 0.04 | | | 1:50 | 86 | 27 |
| 0.0008 | | 0.008 | | | 1:10 | 50 | 25 |
| 0.1 | | | 5.0 | | 1:50 | 100 | 94 |
| 0.1 | | | 1.0 | | 1:10 | 95 | 51 |
| 0.1 | | | 0.2 | | 1:2 | 37 | 26 |
| 0.02 | | | 5.0 | | 1:250 | 92 | 93 |
| 0.02 | | | 1.0 | | 1:50 | 88 | 44 |
| 0.02 | | | 0.2 | | 1:10 | 56 | 14 |
| 0.0008 | | | 5.0 | | 1:6250 | 95 | 93 |
| 0.0008 | | | 1.0 | | 1:1250 | 78 | 49 |
| 0.0008 | | | 0.2 | | 1:250 | 51 | 22 |
| 0.02 | | | | 20.0 | 1:1000 | 74 | 61 |
| 0.02 | | | | 4.0 | 1:200 | 72 | 50 |
| 0.02 | | | | 0.8 | 1:40 | 23 | 11 |
| 0.004 | | | | 20.0 | 1:5000 | 100 | 57 |
| 0.004 | | | | 4.0 | 1:1000 | 100 | 45 |
| 0.004 | | | | 0.8 | 1:200 | 8 | 0 |

TABLE C3 in vitro-Test with *Cercospora beticola*

| (I-052) (ppm) | (5.010) dithianon (ppm) | (5.013) mancozeb (ppm) | (5.018) propineb (ppm) | (17.012) *Paenibacillus terrae* (ppm) | Ratio | Efficacy % | Colby expected value % |
|---|---|---|---|---|---|---|---|
| 0.1 | | | | | | 20 | |
| 0.02 | | | | | | 0 | |
| 0.004 | | | | | | 0 | |
| 0.0008 | | | | | | 0 | |
| | 20.0 | | | | | 99 | |
| | 4.0 | | | | | 100 | |
| | 0.8 | | | | | 0 | |
| | | 10.0 | | | | 100 | |
| | | 2.0 | | | | 100 | |
| | | 0.4 | | | | 0 | |
| | | 0.08 | | | | 0 | |
| | | | 100.0 | | | 100 | |
| | | | 20.0 | | | 100 | |
| | | | 4.0 | | | 100 | |
| | | | 0.8 | | | 0 | |

TABLE C3-continued in vitro-Test with *Cercospora beticola*

| (I-052) (ppm) | (5.010) dithianon (ppm) | (5.013) mancozeb (ppm) | (5.018) propineb (ppm) | (17.012) *Paenibacillus terrae* (ppm) | Ratio | Efficacy % | Colby expected value % |
|---|---|---|---|---|---|---|---|
| | | | | 200.0 | | 100 | |
| | | | | 40.0 | | 30 | |
| | | | | 8.0 | | 0 | |
| | | | | 1.6 | | 6 | |
| 0.1 | 20.0 | | | | 1:200 | 100 | 99 |
| 0.1 | 4.0 | | | | 1:40 | 100 | 100 |
| 0.1 | 0.8 | | | | 1:8 | 28 | 19 |
| 0.004 | 20.0 | | | | 1:5000 | 100 | 99 |
| 0.004 | 4.0 | | | | 1:1000 | 100 | 100 |
| 0.004 | 0.8 | | | | 1:200 | 30 | 0 |
| 0.1 | | 10.0 | | | 1:100 | 100 | 100 |
| 0.1 | | 2.0 | | | 1:20 | 100 | 100 |
| 0.1 | | 0.4 | | | 1:4 | 84 | 2 |
| 0.1 | | 0.08 | | | 1:0.8 | 6 | 2 |
| 0.004 | | 10.0 | | | 1:2500 | 100 | 100 |
| 0.004 | | 2.0 | | | 1:500 | 100 | 100 |
| 0.004 | | 0.4 | | | 1:100 | 0 | 0 |
| 0.004 | | 0.08 | | | 1:20 | 0 | 0 |
| 0.1 | | | 100.0 | | 1:1000 | 100 | 100 |
| 0.1 | | | 20.0 | | 1:200 | 100 | 100 |
| 0.1 | | | 4.0 | | 1:40 | 100 | 100 |
| 0.1 | | | 0.8 | | 1:8 | 69 | 2 |
| 0.004 | | | 100.0 | | 1:25000 | 100 | 100 |
| 0.004 | | | 20.0 | | 1:5000 | 100 | 100 |
| 0.004 | | | 4.0 | | 1:1000 | 100 | 100 |
| 0.004 | | | 0.8 | | 1:200 | 33 | 0 |
| 0.1 | | | | 200.0 | 1:2000 | 100 | 100 |
| 0.1 | | | | 40.0 | 1:400 | 41 | 30 |
| 0.1 | | | | 8.0 | 1:80 | 28 | 0 |
| 0.1 | | | | 1.6 | 1:16 | 6 | 6 |

TABLE C4 in vitro-Test with *Cercospora beticola*

| (I-300) (ppm) | (2.038) isoflu-cypram (ppm) | (3.025) fenpi-coxamid (ppm) | (3.020) trifloxy-strobin (ppm) | (1.002) difeno-conazole (ppm) | Ratio | Effi-cacy % | Colby expect-ed value % |
|---|---|---|---|---|---|---|---|
| 0.1 | | | | | | 19 | |
| 0.02 | | | | | | 10 | |
| 0.004 | | | | | | 0 | |
| 0.0008 | | | | | | 0 | |
| | 1.0 | | | | | 69 | |
| | 0.2 | | | | | 44 | |
| | 0.04 | | | | | 0 | |
| | 0.008 | | | | | 10 | |
| | | 5.0 | | | | 88 | |
| | | 1.0 | | | | 53 | |
| | | 0.2 | | | | 35 | |
| | | 0.04 | | | | 14 | |
| | | | 1.0 | | | 100 | |
| | | | 0.2 | | | 100 | |
| | | | 0.04 | | | 100 | |
| | | | 0.008 | | | 95 | |
| | | | | 1.0 | | 100 | |
| | | | | 0.2 | | 71 | |
| | | | | 0.04 | | 20 | |
| | | | | 0.008 | | 5 | |
| 0.1 | 1.0 | | | | 1:10 | 83 | 69 |
| 0.1 | 0.2 | | | | 1:2 | 58 | 44 |
| 0.1 | 0.04 | | | | 1:0.4 | 0 | 0 |
| 0.1 | 0.008 | | | | 1:0.08 | 0 | 10 |
| 0.1 | | 5.0 | | | 1:50 | 94 | 88 |
| 0.1 | | 1.0 | | | 1:10 | 84 | 53 |
| 0.1 | | 0.2 | | | 1:2 | 82 | 35 |
| 0.1 | | 0.04 | | | 1:0.4 | 55 | 14 |
| 0.02 | | | 1.0 | | 1:50 | 100 | 100 |
| 0.02 | | | 0.2 | | 1:10 | 100 | 100 |

TABLE C4-continued in vitro-Test with *Cercospora beticola*

| (I-300) (ppm) | (2.038) isoflu-cypram (ppm) | (3.025) fenpi-coxamid (ppm) | (3.020) trifloxy-strobin (ppm) | (1.002) difeno-conazole (ppm) | Ratio | Effi-cacy % | Colby expect-ed value % |
|---|---|---|---|---|---|---|---|
| 0.02 | | | 0.04 | | 1:2 | 100 | 100 |
| 0.02 | | | 0.008 | | 1:0.4 | 100 | 95 |
| 0.004 | | | 1.0 | | 1:250 | 100 | 100 |
| 0.004 | | | 0.2 | | 1:50 | 100 | 100 |
| 0.004 | | | 0.04 | | 1:10 | 100 | 100 |
| 0.004 | | | 0.008 | | 1:2 | 99 | 95 |
| 0.02 | | | | 1.0 | 1:50 | 100 | 100 |
| 0.02 | | | | 0.2 | 1:10 | 98 | 73 |
| 0.02 | | | | 0.04 | 1:2 | 57 | 25 |
| 0.02 | | | | 0.008 | 1:0.4 | 31 | 11 |
| 0.0008 | | | | 1.0 | 1:1250 | 99 | 100 |
| 0.0008 | | | | 0.2 | 1:250 | 94 | 71 |
| 0.0008 | | | | 0.04 | 1:50 | 44 | 20 |
| 0.0008 | | | | 0.008 | 1:10 | 6 | 5 |

TABLE C5 in vitro-Test with *Cercospora beticola*

| (I-300) (ppm) | (1.055) mefen-triflu-conazole (ppm) | (1.018) prothio-conazole (ppm) | (1.021) tebu-conazole (ppm) | (13.001) fludio-xonil (ppm) | Ratio | Effi-cacy % | Colby expec-ted value % |
|---|---|---|---|---|---|---|---|
| 0.1 | | | | | | 19 | |
| 0.02 | | | | | | 10 | |
| 0.004 | | | | | | 0 | |

TABLE C5-continued in vitro-Test with *Cercospora beticola*

| (I-300) (ppm) | (1.055) mefen-triflu-conazole (ppm) | (1.018) prothio-conazole (ppm) | (1.021) tebu-conazole (ppm) | (13.001) fludio-xonil (ppm) | Ratio | Effi-cacy % | Colby expec-ted value % |
|---|---|---|---|---|---|---|---|
| 0.0008 | | | | | | 0 | |
| | 1.0 | | | | | 100 | |
| | 0.2 | | | | | 100 | |
| | 0.04 | | | | | 91 | |
| | 0.008 | | | | | 80 | |
| | | 1.0 | | | | 100 | |
| | | 0.2 | | | | 98 | |
| | | 0.04 | | | | 88 | |
| | | 0.008 | | | | 10 | |
| | | | 1.0 | | | 100 | |
| | | | 0.2 | | | 100 | |
| | | | 0.04 | | | 32 | |
| | | | 0.008 | | | 12 | |
| | | | | 5.0 | | 98 | |
| | | | | 1.0 | | 99 | |
| | | | | 0.2 | | 14 | |
| | | | | 0.04 | | 0 | |
| 0.1 | 1.0 | | | | 1:10 | 100 | 100 |
| 0.1 | 0.2 | | | | 1:2 | 100 | 100 |
| 0.1 | 0.04 | | | | 1:0.4 | 100 | 91 |
| 0.1 | 0.008 | | | | 1:0.08 | 97 | 80 |
| 0.02 | 1.0 | | | | 1:50 | 100 | 100 |
| 0.02 | 0.2 | | | | 1:10 | 100 | 100 |
| 0.02 | 0.04 | | | | 1:2 | 100 | 91 |
| 0.02 | 0.008 | | | | 1:0.4 | 96 | 80 |
| 0.1 | | 1.0 | | | 1:10 | 100 | 100 |
| 0.1 | | 0.2 | | | 1:2 | 100 | 98 |
| 0.1 | | 0.04 | | | 1:0.4 | 87 | 88 |
| 0.1 | | 0.008 | | | 1:0.08 | 11 | 10 |
| 0.02 | | 1.0 | | | 1:50 | 100 | 100 |
| 0.02 | | 0.2 | | | 1:10 | 100 | 98 |
| 0.02 | | 0.04 | | | 1:2 | 93 | 88 |
| 0.02 | | 0.008 | | | 1:0.4 | 10 | 10 |
| 0.02 | | | 1.0 | | 1:50 | 100 | 100 |
| 0.02 | | | 0.2 | | 1:10 | 92 | 100 |
| 0.02 | | | 0.04 | | 1:2 | 71 | 32 |
| 0.02 | | | 0.008 | | 1:0.4 | 10 | 12 |
| 0.004 | | | | 5.0 | 1:1250 | 94 | 98 |
| 0.004 | | | | 1.0 | 1:250 | 99 | 99 |
| 0.004 | | | | 0.2 | 1:50 | 44 | 14 |
| 0.004 | | | | 0.04 | 1:10 | 26 | 0 |

TABLE C6 in vitro-Test with *Cercospora beticola*

| (I-300) (ppm) | (13.004) proquinazid (ppm) | (13.005) quinoxyfen (ppm) | (5.003) captan (ppm) | (5.010) dithianon (ppm) | Ratio | Efficacy % | Colby expected value % |
|---|---|---|---|---|---|---|---|
| 0.1 | | | | | | 19 | |
| 0.02 | | | | | | 10 | |
| 0.004 | | | | | | 0 | |
| 0.0008 | | | | | | 0 | |
| | 10.0 | | | | | 19 | |
| | 2.0 | | | | | 0 | |
| | 0.4 | | | | | 0 | |
| | 0.08 | | | | | 9 | |
| | | 10.0 | | | | 34 | |
| | | 2.0 | | | | 4 | |
| | | 0.4 | | | | 0 | |
| | | 0.08 | | | | 10 | |
| | | | 20.0 | | | 25 | |
| | | | 4.0 | | | 13 | |
| | | | 0.8 | | | 0 | |
| | | | | 20.0 | | 99 | |
| | | | | 4.0 | | 99 | |
| | | | | 0.8 | | 28 | |
| | | | | 0.16 | | 12 | |
| 0.1 | 10.0 | | | | 1:500 | 28 | 19 |
| 0.1 | 2.0 | | | | 1:100 | 27 | 0 |
| 0.1 | 0.4 | | | | 1:20 | 27 | 0 |
| 0.1 | 0.08 | | | | 1:4 | 10 | 9 |
| 0.1 | | 10.0 | | | 1:100 | 59 | 34 |
| 0.1 | | 2.0 | | | 1:20 | 23 | 4 |
| 0.1 | | 0.4 | | | 1:4 | 0 | 0 |
| 0.1 | | 0.08 | | | 1:0.8 | 18 | 10 |
| 0.1 | | | 20.0 | | 1:200 | 100 | 25 |
| 0.1 | | | 4.0 | | 1:40 | 28 | 13 |
| 0.1 | | | 0.8 | | 1:8 | 19 | 0 |
| 0.02 | | | 20.0 | | 1:1000 | 99 | 30 |
| 0.02 | | | 4.0 | | 1:200 | 25 | 19 |
| 0.02 | | | 0.8 | | 1:40 | 0 | 7 |
| 0.1 | | | | 20.0 | 1:200 | 98 | 99 |
| 0.1 | | | | 4.0 | 1:40 | 99 | 99 |
| 0.1 | | | | 0.8 | 1:8 | 41 | 28 |
| 0.1 | | | | 0.16 | 1:1.6 | 17 | 12 |

TABLE C7 in vitro-Test with *Cercospora beticola*

| (I-300) (ppm) | (5.012) folpet (ppm) | (5.013) mancozeb (ppm) | (5.018) propineb (ppm) | (15.016) metrafenone (ppm) | Ratio | Efficacy % | Colby expected value % |
|---|---|---|---|---|---|---|---|
| 0.1 | | | | | | 19 | |
| 0.02 | | | | | | 10 | |
| 0.004 | | | | | | 0 | |
| 0.0008 | | | | | | 0 | |
| | 10.0 | | | | | 100 | |
| | 2.0 | | | | | 100 | |
| | 0.4 | | | | | 50 | |
| | 0.08 | | | | | 14 | |
| | | 10.0 | | | | 100 | |
| | | 2.0 | | | | 100 | |
| | | 0.4 | | | | 19 | |
| | | 0.08 | | | | 4 | |
| | | | 100.0 | | | 100 | |
| | | | 20.0 | | | 100 | |
| | | | 4.0 | | | 100 | |
| | | | 0.8 | | | 34 | |
| | | | | 20.0 | | 0 | |
| | | | | 4.0 | | 0 | |
| | | | | 0.8 | | 10 | |
| | | | | 0.16 | | 14 | |
| 0.1 | 10.0 | | | | 1:100 | 100 | 100 |
| 0.1 | 2.0 | | | | 1:20 | 99 | 100 |
| 0.1 | 0.4 | | | | 1:4 | 96 | 50 |
| 0.1 | 0.08 | | | | 1:0.8 | 21 | 14 |
| 0.02 | 10.0 | | | | 1:500 | 100 | 100 |
| 0.02 | 2.0 | | | | 1:100 | 100 | 100 |
| 0.02 | 0.4 | | | | 1:20 | 95 | 53 |
| 0.02 | 0.08 | | | | 1:4 | 21 | 20 |
| 0.1 | | 10.0 | | | 1:100 | 100 | 100 |
| 0.1 | | 2.0 | | | 1:20 | 100 | 100 |
| 0.1 | | 0.4 | | | 1:4 | 100 | 34 |
| 0.1 | | 0.08 | | | 1:0.8 | 25 | 22 |
| 0.004 | | 10.0 | | | 1:2500 | 100 | 100 |
| 0.004 | | 2.0 | | | 1:500 | 100 | 100 |
| 0.004 | | 0.4 | | | 1:100 | 75 | 19 |
| 0.004 | | 0.08 | | | 1:20 | 0 | 4 |
| 0.1 | | | 100.0 | | 1:1000 | 100 | 100 |
| 0.1 | | | 20.0 | | 1:200 | 100 | 100 |
| 0.1 | | | 4.0 | | 1:40 | 100 | 100 |
| 0.1 | | | 0.8 | | 1:8 | 100 | 46 |
| 0.02 | | | 100.0 | | 1:5000 | 100 | 100 |
| 0.02 | | | 20.0 | | 1:1000 | 100 | 100 |
| 0.02 | | | 4.0 | | 1:200 | 100 | 100 |
| 0.02 | | | 0.8 | | 1:40 | 100 | 40 |
| 0.004 | | | 100.0 | | 1:25000 | 100 | 100 |
| 0.004 | | | 20.0 | | 1:5000 | 100 | 100 |
| 0.004 | | | 4.0 | | 1:1000 | 100 | 100 |
| 0.004 | | | 0.8 | | 1:200 | 100 | 34 |
| 0.0008 | | | 100.0 | | 1:125000 | 100 | 100 |
| 0.0008 | | | 20.0 | | 1:25000 | 100 | 100 |
| 0.0008 | | | 4.0 | | 1:5000 | 100 | 100 |
| 0.0008 | | | 0.8 | | 1:1000 | 69 | 34 |
| 0.0008 | | | | 20.0 | 1:25000 | 53 | 0 |
| 0.0008 | | | | 4.0 | 1:5000 | 30 | 0 |
| 0.0008 | | | | 0.8 | 1:1000 | 9 | 10 |
| 0.0008 | | | | 0.16 | 1:200 | 15 | 14 |

TABLE C8 in vitro-Test with *Cercospora beticola*

| (I-302) (ppm) | (7.005) pyrimethanil (ppm) | (2.002) bixafen (ppm) | (2.028) inpyrfluxam (ppm) | (3.025) fenpicoxamid (ppm) | Ratio | Efficacy % | Colby expected value % |
|---|---|---|---|---|---|---|---|
| 0.1 | | | | | | 35 | |
| 0.02 | | | | | | 31 | |
| 0.004 | | | | | | 0 | |
| 0.0008 | | | | | | 0 | |
| | 20.0 | | | | | 100 | |
| | 4.0 | | | | | 100 | |

TABLE C8-continued in vitro-Test with *Cercospora beticola*

| (I-302) (ppm) | (7.005) pyrimethanil (ppm) | (2.002) bixafen (ppm) | (2.028) inpyrfluxam (ppm) | (3.025) fenpicoxamid (ppm) | Ratio | Efficacy % | Colby expected value % |
|---|---|---|---|---|---|---|---|
| | 0.8 | | | | | 20 | |
| | 0.16 | | | | | 0 | |
| | | 1.0 | | | | 0 | |
| | | 0.2 | | | | 0 | |
| | | | 1.0 | | | 11 | |
| | | | 0.2 | | | 8 | |
| | | | 0.04 | | | 16 | |
| | | | 0.008 | | | 25 | |
| | | | | 5.0 | | 98 | |
| | | | | 1.0 | | 20 | |
| | | | | 0.2 | | 2 | |
| | | | | 0.04 | | 0 | |
| 0.02 | 20.0 | | | | 1:1000 | 100 | 100 |
| 0.02 | 4.0 | | | | 1:200 | 100 | 100 |
| 0.02 | 0.8 | | | | 1:40 | 30 | 23 |
| 0.02 | 0.16 | | | | 1:8 | 0 | 5 |
| 0.1 | | 1.0 | | | 1:10 | 55 | 0 |
| 0.1 | | 0.2 | | | 1:2 | 17 | 0 |
| 0.02 | | 1.0 | | | 1:50 | 34 | 5 |
| 0.02 | | 0.2 | | | 1:10 | 24 | 5 |
| 0.004 | | 1.0 | | | 1:250 | 38 | 0 |
| 0.004 | | 0.2 | | | 1:50 | 30 | 0 |
| 0.0008 | | 1.0 | | | 1:1250 | 8 | 2 |
| 0.0008 | | 0.2 | | | 1:250 | 0 | 2 |
| 0.004 | | | 1.0 | | 1:250 | 19 | 11 |
| 0.004 | | | 0.2 | | 1:50 | 12 | 8 |
| 0.004 | | | 0.04 | | 1:10 | 21 | 16 |
| 0.004 | | | 0.008 | | 1:2 | 26 | 25 |
| 0.1 | | | | 5.0 | 1:50 | 98 | 98 |
| 0.1 | | | | 1.0 | 1:10 | 100 | 24 |
| 0.1 | | | | 0.2 | 1:2 | 71 | 8 |
| 0.1 | | | | 0.04 | 1:0.4 | 25 | 6 |
| 0.02 | | | | 5.0 | 1:250 | 100 | 98 |
| 0.02 | | | | 1.0 | 1:50 | 72 | 20 |
| 0.02 | | | | 0.2 | 1:10 | 9 | 2 |
| 0.02 | | | | 0.04 | 1:2 | 9 | 0 |
| 0.004 | | | | 5.0 | 1:1250 | 100 | 98 |
| 0.004 | | | | 1.0 | 1:250 | 76 | 26 |
| 0.004 | | | | 0.2 | 1:50 | 10 | 10 |
| 0.004 | | | | 0.04 | 1:10 | 2 | 8 |
| 0.0008 | | | | 5.0 | 1:6250 | 100 | 98 |
| 0.0008 | | | | 1.0 | 1:1250 | 65 | 26 |
| 0.0008 | | | | 0.2 | 1:250 | 0 | 10 |
| 0.0008 | | | | 0.04 | 1:50 | 14 | 8 |

TABLE C9 in vitro-Test with *Cercospora beticola*

| (I-302) (ppm) | (1.002) difeno-conazole (ppm) | (1.055) mefen-triflu-conazole (ppm) | (1.018) prothio-conazole (ppm) | (13.001) fludio-xonil (ppm) | Ratio | Effi-cacy % | Colby expec-ted value % |
|---|---|---|---|---|---|---|---|
| 0.1 | | | | | | 35 | |
| 0.02 | | | | | | 31 | |
| 0.004 | | | | | | 0 | |
| 0.0008 | | | | | | 0 | |
| | 1.0 | | | | | 99 | |
| | 0.2 | | | | | 89 | |
| | 0.04 | | | | | 40 | |
| | 0.008 | | | | | 15 | |
| | | 1.0 | | | | 100 | |
| | | 0.2 | | | | 100 | |
| | | 0.04 | | | | 100 | |
| | | 0.008 | | | | 12 | |
| | | | 1.0 | | | 100 | |
| | | | 0.2 | | | 100 | |
| | | | 0.04 | | | 38 | |
| | | | 0.008 | | | 6 | |

TABLE C9-continued in vitro-Test with *Cercospora beticola*

| (I-302) (ppm) | (1.002) difeno-conazole (ppm) | (1.055) mefen-triflu-conazole (ppm) | (1.018) prothio-conazole (ppm) | (13.001) fludio-xonil (ppm) | Ratio | Effi-cacy % | Colby expec-ted value % |
|---|---|---|---|---|---|---|---|
| | | | | 5.0 | | 90 | |
| | | | | 1.0 | | 55 | |
| | | | | 0.04 | | 0 | |
| 0.1 | 1.0 | | | | 1:10 | 99 | 99 |
| 0.1 | 0.2 | | | | 1:2 | 92 | 90 |
| 0.1 | 0.04 | | | | 1:0.4 | 48 | 43 |
| 0.1 | 0.008 | | | | 1:0.08 | 46 | 20 |
| 0.02 | 1.0 | | | | 1:50 | 100 | 99 |
| 0.02 | 0.2 | | | | 1:10 | 83 | 89 |
| 0.02 | 0.04 | | | | 1:2 | 53 | 40 |
| 0.02 | 0.008 | | | | 1:0.4 | 21 | 15 |
| 0.02 | | 1.0 | | | 1:50 | 100 | 100 |
| 0.02 | | 0.2 | | | 1:10 | 100 | 100 |
| 0.02 | | 0.04 | | | 1:2 | 98 | 100 |
| 0.02 | | 0.008 | | | 1:0.4 | 63 | 31 |
| 0.004 | | 1.0 | | | 1:250 | 100 | 100 |

TABLE C9-continued in vitro-Test with *Cercospora beticola*

| (I-302) (ppm) | (1.002) difeno-conazole (ppm) | (1.055) mefen-triflu-conazole (ppm) | (1.018) prothio-conazole (ppm) | (13.001) fludio-xonil (ppm) | Ratio | Effi-cacy % | Colby expec-ted value % |
|---|---|---|---|---|---|---|---|
| 0.004 | | 0.2 | | | 1:50 | 100 | 100 |
| 0.004 | | 0.04 | | | 1:10 | 100 | 100 |
| 0.004 | | 0.008 | | | 1:2 | 15 | 12 |
| 0.0008 | | 1.0 | | | 1:1250 | 100 | 100 |
| 0.0008 | | 0.2 | | | 1:250 | 100 | 100 |
| 0.0008 | | 0.04 | | | 1:50 | 100 | 100 |
| 0.0008 | | 0.008 | | | 1:10 | 57 | 12 |
| 0.1 | | | 1.0 | | 1:10 | 100 | 100 |
| 0.1 | | | 0.2 | | 1:2 | 98 | 100 |
| 0.1 | | | 0.04 | | 1:0.4 | 83 | 38 |
| 0.1 | | | 0.008 | | 1:0.08 | 28 | 6 |
| 0.1 | | | | 5.0 | 1:50 | 98 | 90 |

TABLE C9-continued in vitro-Test with *Cercospora beticola*

| (I-302) (ppm) | (1.002) difeno-conazole (ppm) | (1.055) mefen-triflu-conazole (ppm) | (1.018) prothio-conazole (ppm) | (13.001) fludio-xonil (ppm) | Ratio | Effi-cacy % | Colby expec-ted value % |
|---|---|---|---|---|---|---|---|
| 0.1 | | | | 1.0 | 1:10 | 49 | 55 |
| 0.1 | | | | 0.04 | 1:0.4 | 36 | 0 |
| 0.02 | | | | 5.0 | 1:250 | 98 | 91 |
| 0.02 | | | | 1.0 | 1:50 | 98 | 59 |
| 0.02 | | | | 0.04 | 1:2 | 24 | 10 |
| 0.004 | | | | 5.0 | 1:1250 | 100 | 92 |
| 0.004 | | | | 1.0 | 1:250 | 100 | 64 |
| 0.004 | | | | 0.04 | 1:10 | 2 | 21 |
| 0.0008 | | | | 5.0 | 1:6250 | 94 | 91 |
| 0.0008 | | | | 1.0 | 1:1250 | 80 | 58 |
| 0.0008 | | | | 0.04 | 1:50 | 17 | 8 |

TABLE C10 in vitro-Test with *Cercospora beticola*

| (I-302) (ppm) | (5.003) captan (ppm) | (5.010) dithia-non (ppm) | (5.012) folpet (ppm) | (5.013) man-cozeb (ppm) | (17.012) *Paenibacillus terrae* (ppm) | (18.001) FLiPPER (ppm) | Ratio | Efficacy % | Colby expected value % |
|---|---|---|---|---|---|---|---|---|---|
| 0.1 | | | | | | | | 35 | |
| 0.02 | | | | | | | | 31 | |
| 0.004 | | | | | | | | 0 | |
| 0.0008 | | | | | | | | 0 | |
| | 20.0 | | | | | | | 100 | |
| | 4.0 | | | | | | | 100 | |
| | 0.8 | | | | | | | 0 | |
| | 0.16 | | | | | | | 0 | |
| | | 20.0 | | | | | | 99 | |
| | | 4.0 | | | | | | 100 | |
| | | 0.8 | | | | | | 0 | |
| | | 0.16 | | | | | | 0 | |
| | | | 10.0 | | | | | 100 | |
| | | | 2.0 | | | | | 100 | |
| | | | 0.4 | | | | | 0 | |
| | | | 0.08 | | | | | 0 | |
| | | | | 10.0 | | | | 100 | |
| | | | | 2.0 | | | | 100 | |
| | | | | 0.4 | | | | 83 | |
| | | | | 0.08 | | | | 0 | |
| | | | | | 200.0 | | | 100 | |
| | | | | | 40.0 | | | 43 | |
| | | | | | 8.0 | | | 0 | |
| | | | | | 1.6 | | | 1 | |
| | | | | | | 200.0 | | 17 | |
| | | | | | | 40.0 | | 35 | |
| | | | | | | 8.0 | | 25 | |
| | | | | | | 1.6 | | 0 | |
| 0.004 | 20.0 | | | | | | 1:5000 | 100 | 100 |
| 0.004 | 4.0 | | | | | | 1:1000 | 100 | 100 |
| 0.004 | 0.8 | | | | | | 1:200 | 0 | 0 |
| 0.004 | 0.16 | | | | | | 1:40 | 37 | 0 |
| 0.0008 | 20.0 | | | | | | 1:25000 | 100 | 100 |
| 0.0008 | 4.0 | | | | | | 1:5000 | 100 | 100 |
| 0.0008 | 0.8 | | | | | | 1:1000 | 14 | 0 |
| 0.0008 | 0.16 | | | | | | 1:200 | 4 | 0 |
| 0.1 | | 20.0 | | | | | 1:200 | 100 | 99 |
| 0.1 | | 4.0 | | | | | 1:40 | 100 | 100 |
| 0.1 | | 0.8 | | | | | 1:8 | 39 | 0 |
| 0.1 | | 0.16 | | | | | 1:1.6 | 0 | 0 |
| 0.0008 | | 20.0 | | | | | 1:25000 | 100 | 99 |
| 0.0008 | | 4.0 | | | | | 1:5000 | 100 | 100 |
| 0.0008 | | 0.8 | | | | | 1:1000 | 14 | 0 |
| 0.0008 | | 0.16 | | | | | 1:200 | 0 | 0 |
| 0.0008 | | | 10.0 | | | | 1:100 | 100 | 100 |
| 0.0008 | | | 2.0 | | | | 1:20 | 100 | 100 |
| 0.0008 | | | 0.4 | | | | 1:4 | 21 | 0 |
| 0.0008 | | | 0.08 | | | | 1:0.8 | 0 | 0 |

TABLE C10-continued in vitro-Test with *Cercospora beticola*

| (I-302) (ppm) | (5.003) captan (ppm) | (5.010) dithia-non (ppm) | (5.012) folpet (ppm) | (5.013) man-cozeb (ppm) | (17.012) *Paenibacillus terrae* (ppm) | (18.001) FLiPPER (ppm) | Ratio | Efficacy % | Colby expected value % |
|---|---|---|---|---|---|---|---|---|---|
| 0.1 | | | | 10.0 | | | 1:100 | 99 | 100 |
| 0.1 | | | | 2.0 | | | 1:20 | 100 | 100 |
| 0.1 | | | | 0.4 | | | 1:4 | 87 | 89 |
| 0.1 | | | | 0.08 | | | 1:0.8 | 40 | 35 |
| 0.02 | | | | | 200.0 | | 1:10000 | 100 | 100 |
| 0.02 | | | | | 40.0 | | 1:2000 | 46 | 43 |
| 0.02 | | | | | 8.0 | | 1:400 | 0 | 0 |
| 0.02 | | | | | 1.6 | | 1:80 | 16 | 1 |
| 0.004 | | | | | 200.0 | | 1:50000 | 100 | 100 |
| 0.004 | | | | | 40.0 | | 1:10000 | 60 | 55 |
| 0.004 | | | | | 8.0 | | 1:2000 | 4 | 21 |
| 0.004 | | | | | 1.6 | | 1:400 | 41 | 21 |
| 0.0008 | | | | | 200.0 | | 1:250000 | 100 | 100 |
| 0.0008 | | | | | 40.0 | | 1:50000 | 46 | 43 |
| 0.0008 | | | | | 8.0 | | 1:10000 | 37 | 0 |
| 0.0008 | | | | | 1.6 | | 1:2000 | 0 | 1 |
| 0.02 | | | | | | 200.0 | 1:10000 | 26 | 17 |
| 0.02 | | | | | | 40.0 | 1:2000 | 49 | 35 |
| 0.02 | | | | | | 8.0 | 1:400 | 29 | 25 |
| 0.02 | | | | | | 1.6 | 1:80 | 16 | 0 |

TABLE C11 in vitro—Test with *Cercospora beticola*

| (I-339) (ppm) | (2.002) bixafen (ppm) | (1.002) difeno-conazole (ppm) | (5.010) dithianon (ppm) | (13.001) flu-dioxonil (ppm) | (2.005) fluo-pyram (ppm) | (15.043) fluoxa-piprolin (ppm) | Ratio | Efficacy % | Colby expected value % |
|---|---|---|---|---|---|---|---|---|---|
| 1 | | | | | | | | 98 | |
| 0.2 | | | | | | | | 61 | |
| 0.04 | | | | | | | | 0 | |
| 0.008 | | | | | | | | 28 | |
| | 1 | | | | | | | 0 | |
| | | 1 | | | | | | 99 | |
| | | 0.2 | | | | | | 98 | |
| | | 0.04 | | | | | | 60 | |
| | | 0.008 | | | | | | 5 | |
| | | | 2 | | | | | 100 | |
| | | | 0.4 | | | | | 3 | |
| | | | 0.08 | | | | | 0 | |
| | | | | 5 | | | | 93 | |
| | | | | | 20 | | | 56 | |
| | | | | | 4 | | | 0 | |
| | | | | | 0.8 | | | 31 | |
| | | | | | 0.16 | | | 28 | |
| | | | | | | 20 | | 0 | |
| 1 | 1 | | | | | | 1:1 | 100 | 98 |
| 1 | 1 | | | | | | 1:5 | 74 | 61 |
| 1 | 1 | | | | | | 1:25 | 25 | 0 |
| 0.2 | | 1 | | | | | 1:5 | 100 | 99 |
| 0.2 | | 0.2 | | | | | 1:1 | 100 | 98 |
| 0.2 | | 0.04 | | | | | 1:0.2 | 88 | 60 |
| 0.2 | | 0.008 | | | | | 1:0.04 | 18 | 5 |
| 0.2 | | | 2 | | | | 1:10 | 100 | 100 |
| 0.2 | | | 0.4 | | | | 1:2 | 39 | 3 |
| 0.2 | | | 0.08 | | | | 1:0.4 | 5 | 0 |
| 0.008 | | | 2 | | | | 1:250 | 100 | 100 |
| 0.008 | | | 0.4 | | | | 1:50 | 15 | 3 |
| 0.008 | | | 0.08 | | | | 1:10 | 17 | 0 |
| 1 | | | | 5 | | | 1:5 | 100 | 100 |
| 0.2 | | | | 5 | | | 1:25 | 97 | 93 |
| 0.04 | | | | 5 | | | 1:125 | 99 | 93 |
| 0.008 | | | | 5 | | | 1:625 | 98 | 93 |
| 0.2 | | | | | 20 | | 1:100 | 60 | 60 |
| 0.2 | | | | | 4 | | 1:20 | 47 | 9 |
| 0.2 | | | | | 0.8 | | 1:4 | 68 | 38 |
| 0.2 | | | | | 0.16 | | 1:0.8 | 36 | 35 |

TABLE C11-continued in vitro—Test with *Cercospora beticola*

| (I-339) (ppm) | (2.002) bixafen (ppm) | (1.002) difeno-conazole (ppm) | (5.010) dithianon (ppm) | (13.001) flu-dioxonil (ppm) | (2.005) fluo-pyram (ppm) | (15.043) fluoxa-piprolin (ppm) | Ratio | Efficacy % | Colby expected value % |
|---|---|---|---|---|---|---|---|---|---|
| 1 | | | | | | 20 | 1:20 | 100 | 100 |
| 0.2 | | | | | | 20 | 1:100 | 38 | 9 |
| 0.04 | | | | | | 20 | 1:500 | 3 | 3 |

TABLE C12 in vitro—Test with *Cercospora beticola*

| (I-339) (ppm) | (3.012) fluoxa-strobin (ppm) | (5.012) folpet (ppm) | (2.028) inpyr-fluxam (ppm) | (2.038) isoflucy-pram (ppm) | (6.002) isotianil (ppm) | (1.055) mefen-triflu-conazole (ppm) | Ratio | Efficacy % | Colby expected value % |
|---|---|---|---|---|---|---|---|---|---|
| 1 | | | | | | | | 98 | |
| 0.2 | | | | | | | | 61 | |
| 0.04 | | | | | | | | 0 | |
| 0.008 | | | | | | | | 28 | |
| | 0.4 | | | | | | | 100 | |
| | 0.016 | | | | | | | 54 | |
| | | 1 | | | | | | 100 | |
| | | 0.008 | | | | | | 7 | |
| | | | 1 | | | | | 25 | |
| | | | 0.2 | | | | | 23 | |
| | | | 0.04 | | | | | 22 | |
| | | | | 1 | | | | 44 | |
| | | | | 0.2 | | | | 16 | |
| | | | | 0.04 | | | | 14 | |
| | | | | 0.008 | | | | 8 | |
| | | | | | 20 | | | 3 | |
| | | | | | 4 | | | 8 | |
| | | | | | | 0.04 | | 84 | |
| | | | | | | 0.008 | | 24 | |
| 0.04 | 0.4 | | | | | | 1:10 | 100 | 100 |
| 0.04 | 0.016 | | | | | | 1:0.4 | 72 | 55 |
| 0.008 | 0.4 | | | | | | 1:50 | 100 | 100 |
| 0.008 | 0.016 | | | | | | 1:2 | 64 | 62 |
| 0.2 | | 1 | | | | | 1:5 | 100 | 100 |
| 0.2 | | 0.008 | | | | | 1:0.04 | 55 | 7 |
| 0.04 | | 1 | | | | | 1:25 | 93 | 100 |
| 0.04 | | 0.008 | | | | | 1:0.2 | 10 | 7 |
| 0.2 | | | 1 | | | | 1:5 | 50 | 25 |
| 0.2 | | | 0.2 | | | | 1:1 | 57 | 23 |
| 0.2 | | | 0.04 | | | | 1:0.2 | 60 | 22 |
| 0.2 | | | | 1 | | | 1:5 | 70 | 44 |
| 0.2 | | | | 0.2 | | | 1:1 | 64 | 16 |
| 0.2 | | | | 0.04 | | | 1:0.2 | 26 | 14 |
| 0.2 | | | | 0.008 | | | 1:0.04 | 93 | 8 |
| 0.04 | | | | 1 | | | 1:25 | 67 | 44 |
| 0.04 | | | | 0.2 | | | 1:5 | 34 | 16 |
| 0.04 | | | | 0.04 | | | 1:1 | 46 | 14 |
| 0.04 | | | | 0.008 | | | 1:0.2 | 12 | 8 |
| 0.2 | | | | | 20 | | 1:100 | 39 | 22 |
| 0.2 | | | | | 4 | | 1:20 | 50 | 26 |
| 0.008 | | | | | 20 | | 1:2500 | 0 | 3 |
| 0.008 | | | | | 4 | | 1:500 | 17 | 8 |
| 0.2 | | | | | | 0.04 | 1:0.2 | 89 | 87 |
| 0.2 | | | | | | 0.008 | 1:0.04 | 56 | 39 |
| 0.008 | | | | | | 0.04 | 1:1 | 86 | 86 |
| 0.008 | | | | | | 0.008 | 1:0.2 | 54 | 33 |

TABLE C13 in vitro—Test with *Cercospora beticola*

| (I-339) (ppm) | (12.004) meta-laxyl-m (ppm) | (15.016) metra-fenone (ppm) | (17.012) *Paeni-bacillus terrae* (ppm) | (13.004) pro-quinazid (ppm) | (1.018) prothio-conazole (ppm) | (7.005) pyri-methanil (ppm) | Ratio | Efficacy % | Colby expected value % |
|---|---|---|---|---|---|---|---|---|---|
| 1 | | | | | | | | 98 | |
| 0.2 | | | | | | | | 61 | |
| 0.04 | | | | | | | | 0 | |
| 0.008 | | | | | | | | 28 | |
| | 20 | | | | | | | 0 | |
| | 4 | | | | | | | 10 | |
| | | 5 | | | | | | 10 | |
| | | 1 | | | | | | 0 | |
| | | 0.2 | | | | | | 0 | |
| | | | 200 | | | | | 100 | |
| | | | 40 | | | | | 81 | |
| | | | 8 | | | | | 0 | |
| | | | | 10 | | | | 0 | |
| | | | | 2 | | | | 0 | |
| | | | | | 0.5 | | | 100 | |
| | | | | | 0.1 | | | 100 | |
| | | | | | 0.004 | | | 39 | |
| | | | | | | 0.8 | | 0 | |
| 0.2 | 20 | | | | | | 1:100 | 37 | 20 |
| 0.2 | 4 | | | | | | 1:20 | 35 | 28 |
| 0.008 | 20 | | | | | | 1:2500 | 4 | 0 |
| 0.008 | 4 | | | | | | 1:500 | 12 | 10 |
| 0.04 | | 5 | | | | | 1:125 | 44 | 10 |
| 0.04 | | 1 | | | | | 1:25 | 14 | 0 |
| 0.04 | | 0.2 | | | | | 1:5 | 0 | 0 |
| 0.04 | | | 200 | | | | 1:5000 | 100 | 100 |
| 0.04 | | | 40 | | | | 1:1000 | 86 | 81 |
| 0.04 | | | 8 | | | | 1:200 | 0 | 0 |
| 0.04 | | | | 10 | | | 1:250 | 30 | 3 |
| 0.04 | | | | 2 | | | 1:50 | 0 | 3 |
| 0.008 | | | | 10 | | | 1:1250 | 28 | 0 |
| 0.008 | | | | 2 | | | 1:250 | 0 | 0 |
| 0.008 | | | | | 0.5 | | 1:62.5 | 100 | 100 |
| 0.008 | | | | | 0.1 | | 1:12.5 | 100 | 100 |
| 0.008 | | | | | 0.004 | | 1:0.5 | 49 | 39 |
| 0.2 | | | | | | 0.8 | 1:4 | 88 | 83 |
| 0.04 | | | | | | 0.8 | 1:20 | 66 | 3 |
| 0.008 | | | | | | 0.8 | 1:100 | 64 | 0 |

TABLE C14 in vitro—Test with *Cercospora beticola*

| (I-339) (ppm) | (1.021) tebu-conazole (ppm) | (I-338) (ppm) | (1.067) (ppm) | (5.003) captan (ppm) | (1.002) difeno-conazole (ppm) | (3.025) fenpicox-amid (ppm) | Ratio | Efficacy % | Colby expected value % |
|---|---|---|---|---|---|---|---|---|---|
| 1 | | | | | | | | 98 | |
| 0.2 | | | | | | | | 61 | |
| 0.04 | | | | | | | | 0 | |
| 0.008 | | | | | | | | 28 | |
| | 0.2 | | | | | | | 62 | |
| | 0.04 | | | | | | | 1 | |
| | 0.008 | | | | | | | 4 | |
| | | 1 | | | | | | 17 | |
| | | 0.2 | | | | | | 7 | |
| | | 0.04 | | | | | | 0 | |
| | | 0.008 | | | | | | 0 | |
| | | | 2 | | | | | 100 | |
| | | | 0.4 | | | | | 68 | |
| | | | 0.08 | | | | | 0 | |
| | | | | 5 | | | | 100 | |
| | | | | 1 | | | | 61 | |
| | | | | 0.04 | | | | 0 | |
| | | | | | 0.04 | | | 51 | |
| | | | | | 0.008 | | | 16 | |
| | | | | | | 1 | | 97 | |
| | | | | | | 0.2 | | 17 | |

TABLE C14-continued

| in vitro—Test with *Cercospora beticola* | | | | | | | | | |
|---|---|---|---|---|---|---|---|---|---|
| (I-339) (ppm) | (1.021) tebu-conazole (ppm) | (I-338) (ppm) | (1.067) (ppm) | (5.003) captan (ppm) | (1.002) difeno-conazole (ppm) | (3.025) fenpicox-amid (ppm) | Ratio | Efficacy % | Colby expected value % |
| 0.2 | 0.2 | | | | | | 1:1 | 98 | 79 |
| 0.2 | 0.04 | | | | | | 1:0.2 | 62 | 45 |
| 0.2 | 0.008 | | | | | | 1:0.04 | 64 | 47 |
| 0.04 | 0.2 | | | | | | 1:5 | 94 | 70 |
| 0.04 | 0.04 | | | | | | 1:1 | 57 | 21 |
| 0.04 | 0.008 | | | | | | 1:0.2 | 20 | 23 |
| 0.008 | 0.2 | | | | | | 1:25 | 83 | 62 |
| 0.008 | 0.04 | | | | | | 1:5 | 37 | 1 |
| 0.008 | 0.008 | | | | | | 1:1 | 15 | 4 |
| | | 1 | 2 | | | | 1:2 | 100 | 100 |
| | | 1 | 0.4 | | | | 1:0.4 | 80 | 74 |
| | | 1 | 0.08 | | | | 1:0.08 | 42 | 17 |
| | | 0.2 | 2 | | | | 1:10 | 100 | 100 |
| | | 0.2 | 0.4 | | | | 1:2 | 99 | 70 |
| | | 0.2 | 0.08 | | | | 1:0.4 | 7 | 7 |
| | | 0.04 | 2 | | | | 1:50 | 100 | 100 |
| | | 0.04 | 0.4 | | | | 1:10 | 97 | 68 |
| | | 0.04 | 0.08 | | | | 1:2 | 0 | 0 |
| | | 0.008 | 2 | | | | 1:250 | 100 | 100 |
| | | 0.008 | 0.4 | | | | 1:50 | 100 | 68 |
| | | 0.008 | 0.08 | | | | 1:10 | 31 | 0 |
| | | 0.2 | | 5 | | | 1:25 | 100 | 100 |
| | | 0.2 | | 1 | | | 1:5 | 76 | 64 |
| | | 0.2 | | 0.04 | | | 1:0.2 | 0 | 7 |
| | | 0.008 | | 5 | | | 1:625 | 100 | 100 |
| | | 0.008 | | 1 | | | 1:125 | 69 | 61 |
| | | 0.008 | | 0.04 | | | 1:5 | 44 | 0 |
| | | 1 | | | 0.04 | | 1:0.04 | 100 | 51 |
| | | 1 | | | 0.008 | | 1:0.008 | 23 | 16 |
| | | 0.2 | | | 0.008 | | 1:0.04 | 40 | 18 |
| | | 0.008 | | | 0.008 | | 1:1 | 19 | 16 |
| | | 1 | | | | 1 | 1:1 | 100 | 97 |
| | | 1 | | | | 0.2 | 1:0.2 | 36 | 17 |
| | | 0.2 | | | | 1 | 1:5 | 100 | 97 |
| | | 0.2 | | | | 0.2 | 1:1 | 45 | 19 |
| | | 0.008 | | | | 1 | 1:125 | 100 | 97 |
| | | 0.008 | | | | 0.2 | 1:25 | 34 | 17 |

TABLE C15

| in vitro—Test with *Cercospora beticola* | | | | | | | | | |
|---|---|---|---|---|---|---|---|---|---|
| (I-338) (ppm) | (2.005) fluo-pyram (ppm) | (15.043) fluoxa-piprolin (ppm) | (3.012) fluoxa-strobin (ppm) | (1.062) fluoxytio-conazole (ppm) | (5.012) folpet (ppm) | (2.028) inpyr-fluxam (ppm) | Ratio | Efficacy % | Colby expected value % |
| 1 | | | | | | | | 27 | |
| 0.2 | | | | | | | | 15 | |
| 0.04 | | | | | | | | 11 | |
| 0.008 | | | | | | | | 0 | |
| | 20 | | | | | | | 7 | |
| | 0.8 | | | | | | | 11 | |
| | | 20 | | | | | | 0 | |
| | | 4 | | | | | | 3 | |
| | | 0.8 | | | | | | 0 | |
| | | 0.16 | | | | | | 12 | |
| | | | 0.4 | | | | | 100 | |
| | | | 0.08 | | | | | 96 | |
| | | | 0.016 | | | | | 19 | |
| | | | | 1 | | | | 48 | |
| | | | | 0.2 | | | | 0 | |
| | | | | 0.04 | | | | 0 | |
| | | | | | 1 | | | 86 | |
| | | | | | | 0.008 | | 2 | |
| 1 | 0.8 | | | | | | 1:0.8 | 41 | 36 |
| 0.04 | 20 | | | | | | 1:500 | 54 | 17 |
| 0.008 | 20 | | | | | | 1:2500 | 9 | 7 |
| 0.008 | 0.8 | | | | | | 1:100 | 13 | 11 |

TABLE C15-continued in vitro—Test with *Cercospora beticola*

| (I-338) (ppm) | (2.005) fluo-pyram (ppm) | (15.043) fluoxa-piprolin (ppm) | (3.012) fluoxa-strobin (ppm) | (1.062) fluoxytio-conazole (ppm) | (5.012) folpet (ppm) | (2.028) inpyr-fluxam (ppm) | Ratio | Efficacy % | Colby expected value % |
|---|---|---|---|---|---|---|---|---|---|
| 0.04 | | 20 | | | | | 1:500 | 13 | 11 |
| 0.04 | | 4 | | | | | 1:100 | 15 | 14 |
| 0.008 | | 20 | | | | | 1:2500 | 0 | 0 |
| 0.008 | | 4 | | | | | 1:500 | 11 | 3 |
| 0.008 | | 0.8 | | | | | 1:100 | 13 | 0 |
| 0.008 | | 0.16 | | | | | 1:20 | 20 | 12 |
| 1 | | | 0.4 | | | | 1:0.4 | 100 | 100 |
| 1 | | | 0.08 | | | | 1:0.08 | 99 | 97 |
| 1 | | | 0.016 | | | | 1:0.016 | 70 | 41 |
| 0.008 | | | | 1 | | | 1:125 | 58 | 48 |
| 0.008 | | | | 0.2 | | | 1:25 | 34 | 0 |
| 0.008 | | | | 0.04 | | | 1:5 | 0 | 0 |
| 1 | | | | | 1 | | 1:1 | 100 | 89 |
| 0.2 | | | | | 1 | | 1:5 | 100 | 86 |
| 0.04 | | | | | 1 | | 1:25 | 100 | 86 |
| 0.008 | | | | | 1 | | 1:125 | 100 | 86 |
| 0.2 | | | | | | 0.008 | 1:0.04 | 9 | 2 |
| 0.04 | | | | | | 0.008 | 1:0.2 | 15 | 2 |
| 0.008 | | | | | | 0.008 | 1:1 | 17 | 2 |

TABLE C16 in vitro—Test with *Cercospora beticola*

| (I-338) (ppm) | (2.038) isoflucy-pram (ppm) | (6.002) isotianil (ppm) | (5.013) manco-zeb (ppm) | (12.004) metalaxyl-m (ppm) | (15.016) metra-fenone (ppm) | (3.030) metyl-tetra-prole (ppm) | Ratio | Efficacy % | Colby expected value % |
|---|---|---|---|---|---|---|---|---|---|
| 1 | | | | | | | | 27 | |
| 0.2 | | | | | | | | 15 | |
| 0.04 | | | | | | | | 11 | |
| 0.008 | | | | | | | | 0 | |
| | 1 | | | | | | | 40 | |
| | 0.2 | | | | | | | 34 | |
| | 0.04 | | | | | | | 14 | |
| | 0.008 | | | | | | | 40 | |
| | | 100 | | | | | | 0 | |
| | | | 0.8 | | | | | 0 | |
| | | | | 100 | | | | 18 | |
| | | | | | 5 | | | 1 | |
| | | | | | 0.04 | | | 2 | |
| | | | | | | 0.04 | | 100 | |
| | | | | | | 0.008 | | 37 | |
| 1 | 0.04 | | | | | | 1:0.04 | 42 | 32 |
| 1 | 0.008 | | | | | | 1:0.008 | 55 | 52 |
| 0.2 | 0.04 | | | | | | 1:0.2 | 42 | 14 |
| 0.2 | 0.008 | | | | | | 1:0.04 | 42 | 40 |
| 0.008 | 1 | | | | | | 1:125 | 54 | 40 |
| 0.008 | 0.2 | | | | | | 1:25 | 38 | 34 |
| 0.008 | 0.04 | | | | | | 1:5 | 32 | 14 |
| 1 | | 100 | | | | | 1:100 | 24 | 8 |
| 0.2 | | 100 | | | | | 1:500 | 26 | 0 |
| 0.008 | | 100 | | | | | 1:12500 | 0 | 0 |
| 1 | | | 0.8 | | | | 1:0.8 | 10 | 8 |
| 1 | | | | 100 | | | 1:100 | 41 | 25 |
| 0.2 | | | | 100 | | | 1:500 | 49 | 18 |
| 0.04 | | | | 100 | | | 1:2500 | 25 | 23 |
| 0.2 | | | | | 5 | | 1:25 | 14 | 3 |
| 0.2 | | | | | 0.04 | | 1:0.2 | 12 | 3 |
| 0.04 | | | | | 5 | | 1:125 | 12 | 1 |
| 0.04 | | | | | 0.04 | | 1:1 | 11 | 2 |
| 0.2 | | | | | | 0.04 | 1:0.2 | 100 | 100 |
| 0.2 | | | | | | 0.008 | 1:0.04 | 44 | 39 |

TABLE C16-continued in vitro—Test with *Cercospora beticola*

| (I-338) (ppm) | (2.038) isoflucy-pram (ppm) | (6.002) isotianil (ppm) | (5.013) manco-zeb (ppm) | (12.004) metalaxyl-m (ppm) | (15.016) metra-fenone (ppm) | (3.030) metyl-tetra-prole (ppm) | Ratio | Efficacy % | Colby expected value % |
|---|---|---|---|---|---|---|---|---|---|
| 0.04 | | | | | | 0.04 | 1:1 | 100 | 100 |
| 0.04 | | | | | | 0.008 | 1:0.2 | 55 | 39 |
| 0.008 | | | | | | 0.04 | 1:5 | 100 | 100 |
| 0.008 | | | | | | 0.008 | 1:1 | 69 | 42 |

TABLE C17 in vitro—Test with *Cercospora beticola*

| (I-338) (ppm) | (2.017) pen-flufen (ppm) | (5.018) propineb (ppm) | (1.018) prothio-conazole (ppm) | (7.005) pyrmetha-nil (ppm) | (13.005) quinoxi-fen (ppm) | (1.020) spirox-amin (ppm) | Ratio | Efficacy % | Colby expected value % |
|---|---|---|---|---|---|---|---|---|---|
| 1 | | | | | | | | 27 | |
| 0.2 | | | | | | | | 15 | |
| 0.04 | | | | | | | | 11 | |
| 0.008 | | | | | | | | 0 | |
| | 1 | | | | | | | 0 | |
| | | 4 | | | | | | 0 | |
| | | | 0.5 | | | | | 0 | |
| | | | 0.1 | | | | | 15 | |
| | | | 0.02 | | | | | 0 | |
| | | | 0.004 | | | | | 30 | |
| | | | | 0.16 | | | | 0 | |
| | | | | | 2 | | | 0 | |
| | | | | | 0.08 | | | 3 | |
| | | | | | | 4 | | 6 | |
| | | | | | | 0.8 | | 4 | |
| | | | | | | 0.16 | | 0 | |
| 1 | 1 | | | | | | 1:1 | 38 | 19 |
| 0.2 | 1 | | | | | | 1:5 | 20 | 2 |
| 0.04 | 1 | | | | | | 1:25 | 10 | 0 |
| 1 | | 4 | | | | | 1:4 | 29 | 0 |
| 0.2 | | 4 | | | | | 1:20 | 20 | 0 |
| 0.04 | | 4 | | | | | 1:100 | 31 | 0 |
| 0.008 | | 4 | | | | | 1:500 | 7 | 0 |
| 1 | | | 0.5 | | | | 1:0.5 | 16 | 0 |
| 1 | | | 0.1 | | | | 1:0.1 | 28 | 15 |
| 1 | | | 0.02 | | | | 1:0.02 | 24 | 0 |
| 0.2 | | | 0.5 | | | | 1:2.5 | 16 | 0 |
| 0.2 | | | 0.1 | | | | 1:0.5 | 27 | 15 |
| 0.2 | | | 0.02 | | | | 1:0.1 | 30 | 0 |
| 0.2 | | | 0.004 | | | | 1:0.02 | 45 | 30 |
| 1 | | | | 0.16 | | | 1:0.16 | 43 | 0 |
| 0.2 | | | | 0.16 | | | 1:0.8 | 8 | 0 |
| 0.04 | | | | 0.16 | | | 1:4 | 13 | 0 |
| 0.008 | | | | 0.16 | | | 1:20 | 0 | 0 |
| 0.2 | | | | | 2 | | 1:10 | 21 | 8 |
| 0.2 | | | | | 0.08 | | 1:0.4 | 10 | 11 |
| 0.04 | | | | | 2 | | 1:50 | 0 | 0 |
| 0.04 | | | | | 0.08 | | 1:2 | 19 | 3 |
| 0.008 | | | | | 2 | | 1:250 | 10 | 0 |
| 0.008 | | | | | 0.08 | | 1:10 | 13 | 3 |
| 1 | | | | | | 4 | 1:4 | 37 | 17 |
| 1 | | | | | | 0.8 | 1:0.8 | 17 | 15 |
| 1 | | | | | | 0.16 | 1:0.16 | 22 | 11 |

TABLE C18 in vitro—Test with *Cercospora beticola*

| (I-338) (ppm) | (3.020) trifloxy-strobin (ppm) | (I-130) (ppm) | (17.001) (ppm) | (2.002) bixafen (ppm) | (5.003) captan (ppm) | (1.002) difeno-cona-zole (ppm) | (3.025) fen-picoxa-mid (ppm) | Ratio | Efficacy % | Colby expected value % |
|---|---|---|---|---|---|---|---|---|---|---|
| 1 | | | | | | | | | 11 | |
| 0.2 | | | | | | | | | 8 | |
| 0.04 | | | | | | | | | 0 | |
| 0.008 | | | | | | | | | 0 | |
| | 0.008 | | | | | | | | 96 | |
| | | 1 | | | | | | | 96 | |
| | | 0.2 | | | | | | | 5 | |
| | | 0.04 | | | | | | | 0 | |
| | | 0.008 | | | | | | | 0 | |
| | | | 8 | | | | | | 0 | |
| | | | 1.6 | | | | | | 1 | |
| | | | | 1 | | | | | 20 | |
| | | | | 0.2 | | | | | 14 | |
| | | | | | 5 | | | | 100 | |
| | | | | | 1 | | | | 38 | |
| | | | | | 0.4 | | | | 0 | |
| | | | | | | 0.2 | | | 100 | |
| | | | | | | 0.04 | | | 62 | |
| | | | | | | 0.008 | | | 11 | |
| | | | | | | | 1 | | 100 | |
| | | | | | | | 0.2 | | 31 | |
| | | | | | | | 0.008 | | 0 | |
| 1 | 0.008 | | | | | | | 1:0.008 | 98 | 96 |
| 0.2 | 0.008 | | | | | | | 1:0.04 | 99 | 96 |
| 0.04 | 0.008 | | | | | | | 1:0.2 | 100 | 96 |
| | | 0.04 | 8 | | | | | 1:8 | 99 | 96 |
| | | 0.04 | 1.6 | | | | | 1:1.6 | 100 | 96 |
| | | 0.008 | 8 | | | | | 1:1000 | 11 | 0 |
| | | 0.008 | 1.6 | | | | | 1:200 | 3 | 1 |
| | | 1 | | 1 | | | | 1:1 | 100 | 97 |
| | | 1 | | 0.2 | | | | 1:0.2 | 100 | 97 |
| | | 0.008 | | 1 | | | | 1:125 | 28 | 20 |
| | | 0.008 | | 0.2 | | | | 1:25 | 30 | 14 |
| | | 0.04 | | | 5 | | | 1:125 | 100 | 100 |
| | | 0.04 | | | 1 | | | 1:25 | 74 | 38 |
| | | 0.04 | | | 0.4 | | | 1:5 | 0 | 0 |
| | | 0.008 | | | 5 | | | 1:625 | 100 | 100 |
| | | 0.008 | | | 1 | | | 1:125 | 74 | 38 |
| | | 0.008 | | | 0.4 | | | 1:25 | 3 | 0 |
| | | 0.04 | | | | 0.2 | | 1:5 | 100 | 100 |
| | | 0.04 | | | | 0.04 | | 1:1 | 86 | 62 |
| | | 0.2 | | | | 0.008 | | 1:0.04 | 24 | 11 |
| | | 0.2 | | | | | 1 | 1:5 | 100 | 100 |
| | | 0.2 | | | | | 0.2 | 1:1 | 82 | 31 |
| | | 0.2 | | | | | 0.008 | 1:0.04 | 14 | 0 |
| | | 0.04 | | | | | 1 | 1:25 | 100 | 100 |
| | | 0.04 | | | | | 0.2 | 1:5 | 63 | 31 |
| | | 0.04 | | | | | 0.008 | 1:0.2 | 0 | 0 |
| | | 0.008 | | | | | 1 | 1:125 | 100 | 100 |
| | | 0.008 | | | | | 0.2 | 1:25 | 35 | 31 |
| | | 0.008 | | | | | 0.008 | 1:1 | 4 | 0 |

TABLE C19 in vitro—Test with *Cercospora beticola*

| (I-130) (ppm) | (2.005) fluo-pyram (ppm) | (15.043) fluoxa-piprolin (ppm) | (1.062) fluoxy-tiocona-zole (ppm) | (5.012) folpet (ppm) | (2.028) inpyr-fluxam (ppm) | (2.038) isoflucy-pram (ppm) | (1.055) mefen-triflu-conazole (ppm) | Ratio | Effi-cacy % | Colby expected value % |
|---|---|---|---|---|---|---|---|---|---|---|
| 1 | | | | | | | | | 100 | |
| 0.2 | | | | | | | | | 4 | |
| 0.04 | | | | | | | | | 0 | |
| 0.008 | | | | | | | | | 0 | |
| | 20 | | | | | | | | 12 | |
| | 4 | | | | | | | | 0 | |
| | 0.8 | | | | | | | | 7 | |

TABLE C19-continued in vitro—Test with *Cercospora beticola*

| (I-130) (ppm) | (2.005) fluo-pyram (ppm) | (15.043) fluoxa-piprolin (ppm) | (1.062) fluoxy-tiocona-zole (ppm) | (5.012) folpet (ppm) | (2.028) inpyr-fluxam (ppm) | (2.038) isoflucy-pram (ppm) | (1.055) mefen-triflu-conazole (ppm) | Ratio | Effi-cacy % | Colby expected value % |
|---|---|---|---|---|---|---|---|---|---|---|
| | | 20 | | | | | | | 0 | |
| | | 4 | | | | | | | 0 | |
| | | 0.8 | | | | | | | 0 | |
| | | | 1 | | | | | | 54 | |
| | | | 0.008 | | | | | | 0 | |
| | | | | 0.2 | | | | | 16 | |
| | | | | 0.04 | | | | | 0 | |
| | | | | | 1 | | | | 5 | |
| | | | | | 0.2 | | | | 6 | |
| | | | | | 0.04 | | | | 0 | |
| | | | | | | 1 | | | 35 | |
| | | | | | | 0.2 | | | 5 | |
| | | | | | | 0.04 | | | 13 | |
| | | | | | | 0.008 | | | 0 | |
| | | | | | | | 0.04 | | 93 | |
| | | | | | | | 0.008 | | 14 | |
| 1 | 4 | | | | | | | 1:4 | 100 | 100 |
| 0.2 | 4 | | | | | | | 1:20 | 20 | 15 |
| 0.04 | 4 | | | | | | | 1:100 | 14 | 4 |
| 0.008 | 20 | | | | | | | 1:2500 | 40 | 12 |
| 0.008 | 4 | | | | | | | 1:500 | 0 | 0 |
| 0.008 | 0.8 | | | | | | | 1:100 | 15 | 7 |
| 0.008 | | 20 | | | | | | 1:2500 | 19 | 0 |
| 0.008 | | 4 | | | | | | 1:500 | 0 | 0 |
| 0.008 | | 0.8 | | | | | | 1:100 | 10 | 0 |
| 0.008 | | | 1 | | | | | 1:125 | 70 | 54 |
| 0.008 | | | 0.008 | | | | | 1:1 | 0 | 0 |
| 0.2 | | | | 0.2 | | | | 1:1 | 42 | 16 |
| 0.2 | | | | 0.04 | | | | 1:0.2 | 0 | 0 |
| 0.04 | | | | 0.2 | | | | 1:5 | 41 | 16 |
| 0.04 | | | | 0.04 | | | | 1:1 | 15 | 0 |
| 0.2 | | | | | 1 | | | 1:5 | 58 | 5 |
| 0.2 | | | | | 0.2 | | | 1:1 | 46 | 6 |
| 0.2 | | | | | 0.04 | | | 1:0.2 | 57 | 0 |
| 0.04 | | | | | 1 | | | 1:25 | 42 | 5 |
| 0.04 | | | | | 0.2 | | | 1:5 | 39 | 6 |
| 0.04 | | | | | 0.04 | | | 1:1 | 0 | 0 |
| 0.008 | | | | | 1 | | | 1:125 | 32 | 13 |
| 0.008 | | | | | 0.2 | | | 1:25 | 26 | 14 |
| 0.008 | | | | | 0.04 | | | 1:5 | 26 | 8 |
| 1 | | | | | | 1 | | 1:1 | 100 | 99 |
| 1 | | | | | | 0.2 | | 1:0.2 | 99 | 99 |
| 1 | | | | | | 0.04 | | 1:0.04 | 100 | 99 |
| 1 | | | | | | 0.008 | | 1:0.008 | 100 | 99 |
| 0.2 | | | | | | 1 | | 1:5 | 45 | 35 |
| 0.2 | | | | | | 0.2 | | 1:1 | 51 | 5 |
| 0.2 | | | | | | 0.04 | | 1:0.2 | 38 | 13 |
| 0.2 | | | | | | 0.008 | | 1:0.04 | 26 | 0 |
| 0.04 | | | | | | 1 | | 1:25 | 51 | 35 |
| 0.04 | | | | | | 0.2 | | 1:5 | 16 | 5 |
| 0.04 | | | | | | 0.04 | | 1:1 | 25 | 13 |
| 0.04 | | | | | | 0.008 | | 1:0.2 | 1 | 0 |
| 0.2 | | | | | | | 0.04 | 1:0.2 | 99 | 93 |
| 0.2 | | | | | | | 0.008 | 1:0.04 | 73 | 14 |
| 0.008 | | | | | | | 0.04 | 1:5 | 99 | 93 |
| 0.008 | | | | | | | 0.008 | 1:1 | 13 | 14 |

TABLE C20 in vitro—Test with *Cercospora beticola*

| (I-130) (ppm) | (12.004) meta-laxyl-m (ppm) | (15.016) metra-fenone (ppm) | (3.030) metyl-tetra-prole (ppm) | (5.018) propineb (ppm) | (13.004) pro-quinazid (ppm) | (13.005) quinoxy-fen (ppm) | (1.020) spirox-amin (ppm) | Ratio | Effi-cacy % | Colby expected value % |
|---|---|---|---|---|---|---|---|---|---|---|
| 1 | | | | | | | | | 100 | |
| 0.2 | | | | | | | | | 4 | |
| 0.04 | | | | | | | | | 0 | |
| 0.008 | | | | | | | | | 0 | |
| | 100 | | | | | | | | 0 | |
| | 20 | | | | | | | | 0 | |
| | | 0.2 | | | | | | | 0 | |
| | | 0.04 | | | | | | | 0 | |
| | | | 0.2 | | | | | | 100 | |
| | | | 0.008 | | | | | | 0 | |
| | | | | 4 | | | | | 92 | |
| | | | | | 0.08 | | | | 0 | |
| | | | | | | 10 | | | 4 | |
| | | | | | | 2 | | | 0 | |
| | | | | | | 0.4 | | | 0 | |
| | | | | | | | 0.8 | | 0 | |
| | | | | | | | 0.16 | | 0 | |
| 0.04 | 100 | | | | | | | 1:2500 | 21 | 0 |
| 0.04 | 20 | | | | | | | 1:500 | 0 | 0 |
| 0.008 | 100 | | | | | | | 1:12500 | 20 | 0 |
| 0.008 | 20 | | | | | | | 1:2500 | 0 | 0 |
| 0.04 | | 0.2 | | | | | | 1:5 | 19 | 0 |
| 0.04 | | 0.04 | | | | | | 1:1 | 14 | 0 |
| 0.008 | | 0.2 | | | | | | 1:25 | 14 | 0 |
| 0.008 | | 0.04 | | | | | | 1:5 | 0 | 0 |
| 0.04 | | | 0.2 | | | | | 1:5 | 100 | 100 |
| 0.04 | | | 0.008 | | | | | 1:0.2 | 48 | 0 |
| 0.008 | | | 0.2 | | | | | 1:25 | 100 | 100 |
| 0.008 | | | 0.008 | | | | | 1:1 | 3 | 0 |
| 0.2 | | | | 4 | | | | 1:20 | 100 | 92 |
| 0.04 | | | | 4 | | | | 1:100 | 100 | 92 |
| 0.008 | | | | 4 | | | | 1:500 | 100 | 92 |
| 0.2 | | | | | 0.08 | | | 1:0.4 | 41 | 0 |
| 0.04 | | | | | 0.08 | | | 1:2 | 53 | 0 |
| 0.008 | | | | | 0.08 | | | 1:10 | 25 | 0 |
| 0.2 | | | | | | 10 | | 1:50 | 16 | 4 |
| 0.2 | | | | | | 2 | | 1:10 | 9 | 0 |
| 0.2 | | | | | | 0.4 | | 1:2 | 2 | 0 |
| 0.008 | | | | | | 10 | | 1:1250 | 21 | 4 |
| 0.2 | | | | | | | 0.8 | 1:4 | 18 | 0 |
| 0.2 | | | | | | | 0.16 | 1:0.8 | 0 | 0 |
| 0.008 | | | | | | | 0.8 | 1:100 | 7 | 0 |
| 0.008 | | | | | | | 0.16 | 1:20 | 6 | 0 |

TABLE D1 in vitro—Test with *Colletotrichum lindemuthianum*

| (I-052) (ppm) | (2.002) bixafen (ppm) | (2.005) fluo-pyram (ppm) | (3.020) trifloxy-strobin (ppm) | (1.055) mefen-triflu-conazole (ppm) | (1.021) tebu-conazole (ppm) | (1.020) spiro-xamine (ppm) | Ratio | Efficacy % | Colby expected value % |
|---|---|---|---|---|---|---|---|---|---|
| 0.1 | | | | | | | 100 | | |
| 0.02 | | | | | | | 100 | | |
| 0.004 | | | | | | | 0 | | |
| 0.0008 | | | | | | | 0 | | |
| | 1.0 | | | | | | 16 | | |
| | 0.2 | | | | | | 0 | | |
| | 0.04 | | | | | | 0 | | |
| | 0.008 | | | | | | 6 | | |
| | | 20.0 | | | | | 23 | | |
| | | 4.0 | | | | | 3 | | |
| | | 0.8 | | | | | 6 | | |
| | | 0.16 | | | | | 11 | | |
| | | | 1.0 | | | | 84 | | |
| | | | 0.2 | | | | 85 | | |
| | | | 0.04 | | | | 66 | | |

TABLE D1-continued in vitro—Test with *Colletotrichum lindemuthianum*

| (I-052) (ppm) | (2.002) bixafen (ppm) | (2.005) fluo-pyram (ppm) | (3.020) trifloxy-strobin (ppm) | (1.055) mefen-triflu-conazole (ppm) | (1.021) tebu-conazole (ppm) | (1.020) spiro-xamine (ppm) | Ratio | Efficacy % | Colby expected value % |
|---|---|---|---|---|---|---|---|---|---|
| | | | | 0.2 | | | | 11 | |
| | | | | 0.04 | | | | 0 | |
| | | | | 0.008 | | | | 7 | |
| | | | | | 1.0 | | | 4 | |
| | | | | | 0.2 | | | 0 | |
| | | | | | 0.04 | | | 13 | |
| | | | | | 0.008 | | | 0 | |
| | | | | | | 20.0 | | 0 | |
| | | | | | | 4.0 | | 8 | |
| | | | | | | 0.8 | | 0 | |
| | | | | | | 0.16 | | 0 | |
| 0.0008 | 1.0 | | | | | | 1:1250 | 13 | 20 |
| 0.0008 | 0.2 | | | | | | 1:250 | 29 | 5 |
| 0.0008 | 0.04 | | | | | | 1:50 | 11 | 5 |
| 0.0008 | 0.008 | | | | | | 1:10 | 20 | 10 |
| 0.0008 | | 20.0 | | | | | 1:25000 | 55 | 26 |
| 0.0008 | | 4.0 | | | | | 1:5000 | 29 | 7 |
| 0.0008 | | 0.8 | | | | | 1:1000 | 14 | 10 |
| 0.0008 | | 0.16 | | | | | 1:200 | 12 | 15 |
| 0.1 | | | 1.0 | | | | 1:10 | 99 | 100 |
| 0.1 | | | 0.2 | | | | 1:2 | 99 | 100 |
| 0.1 | | | 0.04 | | | | 1:0.4 | 99 | 100 |
| 0.004 | | | 1.0 | | | | 1:250 | 92 | 86 |
| 0.004 | | | 0.2 | | | | 1:50 | 87 | 88 |
| 0.004 | | | 0.04 | | | | 1:10 | 77 | 72 |
| 0.0008 | | | 1.0 | | | | 1:1250 | 90 | 84 |
| 0.0008 | | | 0.2 | | | | 1:250 | 89 | 85 |
| 0.0008 | | | 0.04 | | | | 1:50 | 75 | 66 |
| 0.1 | | | | 0.2 | | | 1:2 | 99 | 100 |
| 0.1 | | | | 0.04 | | | 1:0.4 | 98 | 100 |
| 0.1 | | | | 0.008 | | | 1:0.08 | 100 | 100 |
| 0.004 | | | | 0.2 | | | 1:50 | 61 | 11 |
| 0.004 | | | | 0.04 | | | 1:10 | 25 | 0 |
| 0.004 | | | | 0.008 | | | 1:2 | 22 | 7 |
| 0.0008 | | | | 0.2 | | | 1:250 | 24 | 11 |
| 0.0008 | | | | 0.04 | | | 1:50 | 0 | 0 |
| 0.0008 | | | | 0.008 | | | 1:10 | 24 | 7 |
| 0.1 | | | | | 1.0 | | 1:10 | 98 | 100 |
| 0.1 | | | | | 0.2 | | 1:2 | 98 | 100 |
| 0.1 | | | | | 0.04 | | 1:0.4 | 99 | 100 |
| 0.1 | | | | | 0.008 | | 1:0.08 | 99 | 100 |
| 0.004 | | | | | 1.0 | | 1:250 | 22 | 4 |
| 0.004 | | | | | 0.2 | | 1:50 | 39 | 0 |
| 0.004 | | | | | 0.04 | | 1:10 | 19 | 13 |
| 0.004 | | | | | 0.008 | | 1:2 | 20 | 0 |
| 0.1 | | | | | | 20.0 | 1:1000 | 100 | 100 |
| 0.1 | | | | | | 4.0 | 1:200 | 99 | 100 |
| 0.1 | | | | | | 0.8 | 1:40 | 100 | 100 |
| 0.1 | | | | | | 0.16 | 1:8 | 100 | 100 |
| 0.02 | | | | | | 20.0 | 1:5000 | 33 | 0 |
| 0.02 | | | | | | 4.0 | 1:1000 | 19 | 8 |
| 0.02 | | | | | | 0.8 | 1:200 | 19 | 0 |
| 0.02 | | | | | | 0.16 | 1:40 | 19 | 0 |

TABLE D2 in vitro—Test with *Colletotrichum lindemuthianum*

| (I-052) (ppm) | (13.001) fludio-xonil (ppm) | (13.004) proquin azid (ppm) | (5.010) dithia-non (ppm) | (15.012) fosetyl-alumi-nium (ppm) | (17.012) *Paeni-bacillus terrae* (ppm) | (18.001) FLiPPER (ppm) | Ratio | Effi-cacy % | Colby expected value % |
|---|---|---|---|---|---|---|---|---|---|
| 0.1 | | | | | | | | 100 | |
| 0.02 | | | | | | | | 100 | |
| 0.004 | | | | | | | | 0 | |
| 0.0008 | | | | | | | | 0 | |
| | 5.0 | | | | | | | 88 | |

TABLE D2-continued in vitro—Test with *Colletotrichum lindemuthianum*

| (I-052) (ppm) | (13.001) fludioxonil (ppm) | (13.004) proquinazid (ppm) | (5.010) dithianon (ppm) | (15.012) fosetyl-aluminium (ppm) | (17.012) *Paenibacillus terrae* (ppm) | (18.001) FLiPPER (ppm) | Ratio | Efficacy % | Colby expected value % |
|---|---|---|---|---|---|---|---|---|---|
| | 0.2 | | | | | | 58 | | |
| | 0.04 | | | | | | 0 | | |
| | | 10.0 | | | | | 25 | | |
| | | 2.0 | | | | | 2 | | |
| | | 0.4 | | | | | 0 | | |
| | | 0.08 | | | | | 0 | | |
| | | | 20.0 | | | | 100 | | |
| | | | 0.8 | | | | 0 | | |
| | | | 0.16 | | | | 0 | | |
| | | | | 100.0 | | | 39 | | |
| | | | | 20.0 | | | 0 | | |
| | | | | | 200.0 | | 99 | | |
| | | | | | 40.0 | | 7 | | |
| | | | | | 8.0 | | 0 | | |
| | | | | | 1.6 | | 0 | | |
| | | | | | | 200.0 | 0 | | |
| | | | | | | 40.0 | 2 | | |
| | | | | | | 8.00 | 0 | | |
| 0.1 | 5.0 | | | | | | 1:50 | 99 | 100 |
| 0.1 | 0.2 | | | | | | 1:2 | 96 | 100 |
| 0.1 | 0.04 | | | | | | 1:0.4 | 100 | 100 |
| 0.004 | 5.0 | | | | | | 1:1250 | 87 | 88 |
| 0.004 | 0.2 | | | | | | 1:50 | 85 | 58 |
| 0.004 | 0.04 | | | | | | 1:10 | 5 | 0 |
| 0.0008 | 5.0 | | | | | | 1:6250 | 89 | 88 |
| 0.0008 | 0.2 | | | | | | 1:250 | 54 | 58 |
| 0.0008 | 0.04 | | | | | | 1:50 | 18 | 0 |
| 0.1 | | 10.0 | | | | | 1:100 | 96 | 100 |
| 0.1 | | 2.0 | | | | | 1:20 | 97 | 100 |
| 0.1 | | 0.4 | | | | | 1:4 | 99 | 100 |
| 0.1 | | 0.08 | | | | | 1:0.8 | 97 | 100 |
| 0.004 | | 10.0 | | | | | 1:2500 | 26 | 25 |
| 0.004 | | 2.0 | | | | | 1:500 | 13 | 2 |
| 0.004 | | 0.4 | | | | | 1:100 | 22 | 0 |
| 0.004 | | 0.08 | | | | | 1:20 | 36 | 0 |
| 0.0008 | | 10.0 | | | | | 1:12500 | 36 | 25 |
| 0.0008 | | 2.0 | | | | | 1:2500 | 24 | 2 |
| 0.0008 | | 0.4 | | | | | 1:500 | 0 | 0 |
| 0.0008 | | 0.08 | | | | | 1:100 | 0 | 0 |
| 0.1 | | | 20.0 | | | | 1:200 | 99 | 100 |
| 0.1 | | | 0.8 | | | | 1:8 | 97 | 100 |
| 0.1 | | | 0.16 | | | | 1:1.6 | 100 | 100 |
| 0.004 | | | 20.0 | | | | 1:5000 | 100 | 100 |
| 0.004 | | | 0.8 | | | | 1:200 | 20 | 15 |
| 0.004 | | | 0.16 | | | | 1:40 | 24 | 15 |
| 0.1 | | | | 100.0 | | | 1:1000 | 99 | 100 |
| 0.1 | | | | 20.0 | | | 1:200 | 95 | 100 |
| 0.004 | | | | 100.0 | | | 1:25000 | 83 | 48 |
| 0.004 | | | | 20.0 | | | 1:5000 | 20 | 15 |
| 0.0008 | | | | 100.0 | | | 1:125000 | 63 | 49 |
| 0.0008 | | | | 20.0 | | | 1:25000 | 17 | 16 |
| 0.0008 | | | | | 200.0 | | 1:250000 | 100 | 99 |
| 0.0008 | | | | | 40.0 | | 1:50000 | 39 | 7 |
| 0.0008 | | | | | 8.0 | | 1:10000 | 2 | 0 |
| 0.0008 | | | | | 1.6 | | 1:2000 | 19 | 0 |
| 0.1 | | | | | | 200.0 | 1:2000 | 98 | 100 |
| 0.1 | | | | | | 40.0 | 1:400 | 98 | 100 |
| 0.1 | | | | | | 8.00 | 1:80 | 96 | 100 |
| 0.004 | | | | | | 200.0 | 1:50000 | 44 | 20 |
| 0.004 | | | | | | 40.0 | 1:10000 | 28 | 21 |
| 0.004 | | | | | | 8.00 | 1:2000 | 13 | 20 |
| 0.0008 | | | | | | 200.0 | 1:250000 | 15 | 0 |
| 0.0008 | | | | | | 40.0 | 1:50000 | 10 | 2 |
| 0.0008 | | | | | | 8.00 | 1:10000 | 0 | 0 |

TABLE D3 in vitro-Test with Colletotrichum lindemuthianum

| (I-300) (ppm) | (2.002) bixafen (ppm) | (3.025) fenpico-xamid (ppm) | (3.020) trifloxys-trobin (ppm) | (1.055) mefen-triflu-conazole (ppm) | (13.005) quino-xyfen (ppm) | (5.003) captan (ppm) | Ratio | Effi-cacy % | Colby expected value % |
|---|---|---|---|---|---|---|---|---|---|
| 0.1 | | | | | | | | 100 | |
| 0.02 | | | | | | | | 11 | |
| 0.004 | | | | | | | | 0 | |
| 0.0008 | | | | | | | | 0 | |
| | 1.0 | | | | | | | 5 | |
| | 0.2 | | | | | | | 0 | |
| | 0.04 | | | | | | | 0 | |
| | 0.008 | | | | | | | 0 | |
| | | 5.0 | | | | | | 79 | |
| | | 1.0 | | | | | | 69 | |
| | | | 0.2 | | | | | 77 | |
| | | | 0.04 | | | | | 59 | |
| | | | 0.008 | | | | | 25 | |
| | | | | 1.0 | | | | 0 | |
| | | | | 0.04 | | | | 3 | |
| | | | | 0.008 | | | | 0 | |
| | | | | | 10.0 | | | 24 | |
| | | | | | 2.0 | | | 0 | |
| | | | | | 0.4 | | | 0 | |
| | | | | | 0.08 | | | 1 | |
| | | | | | | 20.0 | | 100 | |
| | | | | | | 4.0 | | 100 | |
| | | | | | | 0.8 | | 0 | |
| | | | | | | 0.16 | | 9 | |
| 0.1 | 1.0 | | | | | | 1:10 | 98 | 100 |
| 0.1 | 0.2 | | | | | | 1:2 | 100 | 100 |
| 0.1 | 0.04 | | | | | | 1:0.4 | 100 | 100 |
| 0.1 | 0.008 | | | | | | 1:0.08 | 92 | 100 |
| 0.02 | 1.0 | | | | | | 1:50 | 18 | 5 |
| 0.02 | 0.2 | | | | | | 1:10 | 10 | 0 |
| 0.02 | 0.04 | | | | | | 1:2 | 22 | 0 |
| 0.02 | 0.008 | | | | | | 1:0.4 | 11 | 0 |
| 0.1 | | 5.0 | | | | | 1:50 | 100 | 100 |
| 0.1 | | 1.0 | | | | | 1:10 | 100 | 100 |
| 0.02 | | 5.0 | | | | | 1:250 | 84 | 83 |
| 0.02 | | 1.0 | | | | | 1:50 | 78 | 74 |
| 0.004 | | 5.0 | | | | | 1:1250 | 83 | 81 |
| 0.004 | | 1.0 | | | | | 1:250 | 75 | 72 |
| 0.0008 | | 5.0 | | | | | 1:6250 | 87 | 79 |
| 0.0008 | | 1.0 | | | | | 1:1250 | 70 | 70 |
| 0.02 | | | 0.2 | | | | 1:10 | 76 | 81 |
| 0.02 | | | 0.04 | | | | 1:2 | 76 | 66 |
| 0.02 | | | 0.008 | | | | 1:0.4 | 49 | 38 |
| 0.004 | | | 0.2 | | | | 1:50 | 86 | 81 |
| 0.004 | | | 0.04 | | | | 1:10 | 82 | 67 |
| 0.004 | | | 0.008 | | | | 1:2 | 33 | 39 |
| 0.0008 | | | 0.2 | | | | 1:250 | 82 | 78 |
| 0.0008 | | | 0.04 | | | | 1:50 | 67 | 60 |
| 0.0008 | | | 0.008 | | | | 1:10 | 38 | 27 |
| 0.1 | | | | 1.0 | | | 1:10 | 99 | 100 |
| 0.1 | | | | 0.04 | | | 1:0.4 | 100 | 100 |
| 0.1 | | | | 0.008 | | | 1:0.08 | 100 | 100 |
| 0.02 | | | | 1.0 | | | 1:50 | 12 | 12 |
| 0.02 | | | | 0.04 | | | 1:2 | 13 | 14 |
| 0.02 | | | | 0.008 | | | 1:0.4 | 29 | 12 |
| 0.004 | | | | 1.0 | | | 1:250 | 19 | 3 |
| 0.004 | | | | 0.04 | | | 1:10 | 0 | 5 |
| 0.004 | | | | 0.008 | | | 1:2 | 8 | 3 |
| 0.0008 | | | | 1.0 | | | 1:1250 | 49 | 5 |
| 0.0008 | | | | 0.04 | | | 1:50 | 0 | 8 |
| 0.0008 | | | | 0.008 | | | 1:10 | 15 | 5 |
| 0.1 | | | | | 10.0 | | 1:100 | 100 | 92 |
| 0.1 | | | | | 2.0 | | 1:20 | 100 | 89 |
| 0.1 | | | | | 0.4 | | 1:4 | 100 | 89 |
| 0.1 | | | | | 0.08 | | 1:0.8 | 100 | 89 |
| 0.02 | | | | | 10.0 | | 1:500 | 36 | 33 |
| 0.02 | | | | | 2.0 | | 1:100 | 23 | 13 |
| 0.02 | | | | | 0.4 | | 1:20 | 12 | 13 |
| 0.02 | | | | | 0.08 | | 1:4 | 29 | 13 |

TABLE D3-continued in vitro-Test with Colletotrichum lindemuthianum

| (I-300) (ppm) | (2.002) bixafen (ppm) | (3.025) fenpico-xamid (ppm) | (3.020) trifloxys-trobin (ppm) | (1.055) mefen-triflu-conazole (ppm) | (13.005) quino-xyfen (ppm) | (5.003) captan (ppm) | Ratio | Effi-cacy % | Colby expected value % |
|---|---|---|---|---|---|---|---|---|---|
| 0.1 | | | | | | 20.0 | 1:200 | 100 | 100 |
| 0.1 | | | | | | 4.0 | 1:40 | 100 | 100 |
| 0.1 | | | | | | 0.8 | 1:8 | 100 | 89 |
| 0.1 | | | | | | 0.16 | 1:1.6 | 97 | 90 |

TABLE D4 in vitro-Test with Colletotrichum lindemuthianum

| (I-300) (ppm) | (5.010) dithia-non (ppm) | (5.012) folpet (ppm) | (5.013) man-cozeb (ppm) | (5.018) pro-pineb (ppm) | (15.012) fosetyl-alumi-nium (ppm) | (17.001) Bacillus subtilis (ppm) | Ratio | Effi-cacy % | Colby expected value % |
|---|---|---|---|---|---|---|---|---|---|
| 0.1 | | | | | | | | 100 | |
| 0.02 | | | | | | | | 11 | |
| 0.004 | | | | | | | | 0 | |
| 0.0008 | | | | | | | | 0 | |
| | 20.0 | | | | | | | 99 | |
| | 4.0 | | | | | | | 100 | |
| | 0.8 | | | | | | | 0 | |
| | 0.16 | | | | | | | 1 | |
| | | 10.0 | | | | | | 100 | |
| | | 2.0 | | | | | | 98 | |
| | | 0.4 | | | | | | 13 | |
| | | 0.08 | | | | | | 0 | |
| | | | 10.0 | | | | | 100 | |
| | | | 0.4 | | | | | 0 | |
| | | | 0.08 | | | | | 4 | |
| | | | | 100.0 | | | | 94 | |
| | | | | 20.0 | | | | 100 | |
| | | | | 4.0 | | | | 32 | |
| | | | | 0.8 | | | | 5 | |
| | | | | | 100.0 | | | 58 | |
| | | | | | 20.0 | | | 22 | |
| | | | | | 4.0 | | | 0 | |
| | | | | | 0.8 | | | 0 | |
| | | | | | | 200.0 | | 0 | |
| | | | | | | 40.0 | | 5 | |
| | | | | | | 1.6 | | 0 | |
| 0.1 | 20.0 | | | | | | 1:200 | 100 | 100 |
| 0.1 | 4.0 | | | | | | 1:40 | 97 | 100 |
| 0.1 | 0.8 | | | | | | 1:8 | 89 | 89 |
| 0.1 | 0.16 | | | | | | 1:1.6 | 100 | 89 |
| 0.1 | | 10.0 | | | | | 1:100 | 99 | 100 |
| 0.1 | | 2.0 | | | | | 1:20 | 99 | 100 |
| 0.1 | | 0.4 | | | | | 1:4 | 95 | 91 |
| 0.1 | | 0.08 | | | | | 1:0.8 | 94 | 89 |
| 0.02 | | | 10.0 | | | | 1:500 | 100 | 100 |
| 0.02 | | | 0.4 | | | | 1:20 | 21 | 11 |
| 0.02 | | | 0.08 | | | | 1:4 | 13 | 14 |
| 0.004 | | | 10.0 | | | | 1:2500 | 100 | 100 |
| 0.004 | | | 0.4 | | | | 1:100 | 0 | 0 |
| 0.004 | | | 0.08 | | | | 1:20 | 0 | 4 |
| 0.0008 | | | 10.0 | | | | 1:12500 | 100 | 100 |
| 0.0008 | | | 0.4 | | | | 1:500 | 0 | 0 |
| 0.0008 | | | 0.08 | | | | 1:100 | 11 | 4 |
| 0.02 | | | | 100.0 | | | 1:5000 | 100 | 95 |
| 0.02 | | | | 20.0 | | | 1:1000 | 100 | 100 |
| 0.02 | | | | 4.0 | | | 1:200 | 69 | 39 |
| 0.02 | | | | 0.8 | | | 1:40 | 18 | 15 |
| 0.004 | | | | | 100.0 | | 1:25000 | 69 | 58 |
| 0.004 | | | | | 20.0 | | 1:5000 | 20 | 22 |
| 0.004 | | | | | 4.0 | | 1:1000 | 0 | 0 |
| 0.004 | | | | | 0.8 | | 1:200 | 0 | 0 |
| 0.1 | | | | | | 200.0 | 1:2000 | 100 | 99 |
| 0.1 | | | | | | 40.0 | 1:400 | 99 | 99 |
| 0.1 | | | | | | 1.6 | 1:16 | 99 | 99 |

TABLE D4-continued in vitro-Test with Colletotrichum lindemuthianum

| (I-300) (ppm) | (5.010) dithia-non (ppm) | (5.012) folpet (ppm) | (5.013) man-cozeb (ppm) | (5.018) pro-pineb (ppm) | (15.012) fosetyl-alumi-nium (ppm) | (17.001) Bacillus subtilis (ppm) | Ratio | Effi-cacy % | Colby expected value % |
|---|---|---|---|---|---|---|---|---|---|
| 0.02 | | | | | | 200.0 | 1:10000 | 70 | 9 |
| 0.02 | | | | | | 40.0 | 1:2000 | 11 | 13 |
| 0.02 | | | | | | 1.6 | 1:80 | 18 | 9 |
| 0.004 | | | | | | 200.0 | 1:50000 | 31 | 0 |
| 0.004 | | | | | | 40.0 | 1:10000 | 0 | 5 |
| 0.004 | | | | | | 1.6 | 1:400 | 18 | 0 |

TABLE D5 in vitro-Test with Colletotrichum lindemuthianum

| (I-302) (ppm) | (7.005) pyrime-thanil (ppm) | (2.002) bixafen (ppm) | (2.005) fluo-pyram (ppm) | (2.028) inpyr-fluxam (ppm) | (2.038) isoflu-cypram (ppm) | (3.025) fenpi-coxamid (ppm) | Ratio | Effi-cacy % | Colby expected value % |
|---|---|---|---|---|---|---|---|---|---|
| 0.1 | | | | | | | | 100 | |
| 0.02 | | | | | | | | 12 | |
| 0.004 | | | | | | | | 0 | |
| 0.0008 | | | | | | | | 1 | |
| | 20.0 | | | | | | | 16 | |
| | 4.0 | | | | | | | 0 | |
| | 0.8 | | | | | | | 1 | |
| | 0.16 | | | | | | | 0 | |
| | | 1.0 | | | | | | 9 | |
| | | 0.2 | | | | | | 0 | |
| | | 0.04 | | | | | | 0 | |
| | | 0.008 | | | | | | 0 | |
| | | | 20.0 | | | | | 28 | |
| | | | 4.0 | | | | | 34 | |
| | | | 0.8 | | | | | 0 | |
| | | | 0.16 | | | | | 0 | |
| | | | | 1.0 | | | | 14 | |
| | | | | 0.2 | | | | 1 | |
| | | | | 0.04 | | | | 0 | |
| | | | | 0.008 | | | | 0 | |
| | | | | | 1.0 | | | 18 | |
| | | | | | 0.2 | | | 0 | |
| | | | | | 0.04 | | | 14 | |
| | | | | | 0.008 | | | 0 | |
| | | | | | | 5.0 | | 86 | |
| | | | | | | 1.0 | | 66 | |
| | | | | | | 0.2 | | 5 | |
| | | | | | | 0.04 | | 0 | |
| 0.02 | 20.0 | | | | | | 1:1000 | 30 | 16 |
| 0.02 | 4.0 | | | | | | 1:200 | 29 | 0 |
| 0.02 | 0.8 | | | | | | 1:40 | 30 | 1 |
| 0.02 | 0.16 | | | | | | 1:8 | 39 | 0 |
| 0.1 | | 1.0 | | | | | 1:10 | 98 | 100 |
| 0.1 | | 0.2 | | | | | 1:2 | 100 | 100 |
| 0.1 | | 0.04 | | | | | 1:0.4 | 100 | 100 |
| 0.1 | | 0.008 | | | | | 1:0.08 | 100 | 100 |
| 0.02 | | 1.0 | | | | | 1:50 | 11 | 9 |
| 0.02 | | 0.2 | | | | | 1:10 | 15 | 0 |
| 0.02 | | 0.04 | | | | | 1:2 | 40 | 0 |
| 0.02 | | 0.008 | | | | | 1:0.4 | 33 | 0 |
| 0.0008 | | 1.0 | | | | | 1:1250 | 20 | 9 |
| 0.0008 | | 0.2 | | | | | 1:250 | 0 | 0 |
| 0.0008 | | 0.04 | | | | | 1:50 | 0 | 0 |
| 0.0008 | | 0.008 | | | | | 1:10 | 0 | 0 |
| 0.1 | | | 20.0 | | | | 1:200 | 98 | 100 |
| 0.1 | | | 4.0 | | | | 1:40 | 100 | 100 |
| 0.1 | | | 0.8 | | | | 1:8 | 100 | 100 |
| 0.1 | | | 0.16 | | | | 1:1.6 | 97 | 100 |
| 0.02 | | | 20.0 | | | | 1:1000 | 62 | 28 |
| 0.02 | | | 4.0 | | | | 1:200 | 25 | 34 |
| 0.02 | | | 0.8 | | | | 1:40 | 32 | 0 |
| 0.02 | | | 0.16 | | | | 1:8 | 32 | 0 |
| 0.1 | | | | 1.0 | | | 1:10 | 95 | 100 |

TABLE D5-continued in vitro-Test with Colletotrichum lindemuthianum

| (I-302) (ppm) | (7.005) pyrime-thanil (ppm) | (2.002) bixafen (ppm) | (2.005) fluo-pyram (ppm) | (2.028) inpyr-fluxam (ppm) | (2.038) isoflu-cypram (ppm) | (3.025) fenpi-coxamid (ppm) | Ratio | Effi-cacy % | Colby expected value % |
|---|---|---|---|---|---|---|---|---|---|
| 0.1 | | | | 0.2 | | | 1:2 | 100 | 100 |
| 0.1 | | | | 0.04 | | | 1:0.4 | 100 | 100 |
| 0.1 | | | | 0.008 | | | 1:0.08 | 97 | 100 |
| 0.02 | | | | 1.0 | | | 1:50 | 21 | 14 |
| 0.02 | | | | 0.2 | | | 1:10 | 59 | 1 |
| 0.02 | | | | 0.04 | | | 1:2 | 31 | 0 |
| 0.02 | | | | 0.008 | | | 1:0.4 | 33 | 0 |
| 0.1 | | | | | 1.0 | | 1:10 | 99 | 100 |
| 0.1 | | | | | 0.2 | | 1:2 | 100 | 100 |
| 0.1 | | | | | 0.04 | | 1:0.4 | 100 | 100 |
| 0.1 | | | | | 0.008 | | 1:0.08 | 100 | 100 |
| 0.02 | | | | | 1.0 | | 1:50 | 33 | 28 |
| 0.02 | | | | | 0.2 | | 1:10 | 22 | 12 |
| 0.02 | | | | | 0.04 | | 1:2 | 16 | 24 |
| 0.02 | | | | | 0.008 | | 1:0.4 | 34 | 12 |
| 0.1 | | | | | | 5.0 | 1:50 | 97 | 100 |
| 0.1 | | | | | | 1.0 | 1:10 | 98 | 100 |
| 0.1 | | | | | | 0.2 | 1:2 | 100 | 100 |
| 0.1 | | | | | | 0.04 | 1:0.4 | 100 | 100 |
| 0.02 | | | | | | 5.0 | 1:250 | 91 | 87 |
| 0.02 | | | | | | 1.0 | 1:50 | 79 | 70 |
| 0.02 | | | | | | 0.2 | 1:10 | 32 | 16 |
| 0.02 | | | | | | 0.04 | 1:2 | 58 | 12 |
| 0.004 | | | | | | 5.0 | 1:1250 | 84 | 86 |
| 0.004 | | | | | | 1.0 | 1:250 | 72 | 66 |
| 0.004 | | | | | | 0.2 | 1:50 | 25 | 5 |
| 0.004 | | | | | | 0.04 | 1:10 | 6 | 0 |
| 0.0008 | | | | | | 5.0 | 1:6250 | 88 | 86 |
| 0.0008 | | | | | | 1.0 | 1:1250 | 66 | 66 |
| 0.0008 | | | | | | 0.2 | 1:250 | 24 | 6 |
| 0.0008 | | | | | | 0.04 | 1:50 | 0 | 1 |

TABLE D6 in vitro-Test with Colletotrichum lindemuthianum

| (I-302) (ppm) | (3.020) trifloxy-strobin (ppm) | (1.002) difeno-cona-zole (ppm) | (1.055) mefen-triflu-conazole (ppm) | (1.018) prothio-conazole (ppm) | (1.021) tebu-conazole (ppm) | (1.020) spiro-xamine (ppm) | Ratio | Effi-cacy % | Colby expected value % |
|---|---|---|---|---|---|---|---|---|---|
| 0.1 | | | | | | | | 100 | |
| 0.02 | | | | | | | | 12 | |
| 0.004 | | | | | | | | 0 | |
| 0.0008 | | | | | | | | 1 | |
| | 1.0 | | | | | | | 88 | |
| | 0.2 | | | | | | | 92 | |
| | 0.04 | | | | | | | 80 | |
| | 0.008 | | | | | | | 30 | |
| | | 1.0 | | | | | | 16 | |
| | | 0.2 | | | | | | 0 | |
| | | 0.04 | | | | | | 2 | |
| | | 0.008 | | | | | | 0 | |
| | | | 1.0 | | | | | 13 | |
| | | | 0.2 | | | | | 6 | |
| | | | 0.04 | | | | | 0 | |
| | | | 0.008 | | | | | 0 | |
| | | | | 1.0 | | | | 100 | |
| | | | | 0.2 | | | | 100 | |
| | | | | 0.04 | | | | 20 | |
| | | | | 0.008 | | | | 0 | |
| | | | | | 1.0 | | | 35 | |
| | | | | | 0.2 | | | 17 | |
| | | | | | 0.04 | | | 0 | |
| | | | | | 0.008 | | | 32 | |
| | | | | | | 20.0 | | 6 | |
| | | | | | | 0.8 | | 0 | |
| | | | | | | 0.16 | | 13 | |

TABLE D6-continued in vitro-Test with Colletotrichum lindemuthianum

| (I-302) (ppm) | (3.020) trifloxy-strobin (ppm) | (1.002) difeno-cona-zole (ppm) | (1.055) mefen-triflu-conazole (ppm) | (1.018) prothio-conazole (ppm) | (1.021) tebu-conazole (ppm) | (1.020) spiro-xamine (ppm) | Ratio | Effi-cacy % | Colby expected value % |
|---|---|---|---|---|---|---|---|---|---|
| 0.1 | 1.0 | | | | | | 1:10 | 96 | 100 |
| 0.1 | 0.2 | | | | | | 1:2 | 100 | 100 |
| 0.1 | 0.04 | | | | | | 1:0.4 | 100 | 100 |
| 0.1 | 0.008 | | | | | | 1:0.08 | 97 | 100 |
| 0.02 | 1.0 | | | | | | 1:50 | 100 | 90 |
| 0.02 | 0.2 | | | | | | 1:10 | 95 | 93 |
| 0.02 | 0.04 | | | | | | 1:2 | 83 | 82 |
| 0.02 | 0.008 | | | | | | 1:0.4 | 53 | 38 |
| 0.004 | 1.0 | | | | | | 1:250 | 97 | 88 |
| 0.004 | 0.2 | | | | | | 1:50 | 90 | 92 |
| 0.004 | 0.04 | | | | | | 1:10 | 77 | 80 |
| 0.004 | 0.008 | | | | | | 1:2 | 41 | 30 |
| 0.0008 | 1.0 | | | | | | 1:1250 | 95 | 89 |
| 0.0008 | 0.2 | | | | | | 1:250 | 99 | 92 |
| 0.0008 | 0.04 | | | | | | 1:50 | 84 | 80 |
| 0.0008 | 0.008 | | | | | | 1:10 | 42 | 30 |
| 0.1 | | 1.0 | | | | | 1:10 | 97 | 100 |
| 0.1 | | 0.2 | | | | | 1:2 | 96 | 100 |
| 0.1 | | 0.04 | | | | | 1:0.4 | 94 | 100 |
| 0.1 | | 0.008 | | | | | 1:0.08 | 96 | 100 |
| 0.02 | | 1.0 | | | | | 1:50 | 59 | 25 |
| 0.02 | | 0.2 | | | | | 1:10 | 40 | 12 |
| 0.02 | | 0.04 | | | | | 1:2 | 16 | 13 |
| 0.02 | | 0.008 | | | | | 1:0.4 | 61 | 12 |
| 0.004 | | 1.0 | | | | | 1:250 | 7 | 16 |
| 0.004 | | 0.2 | | | | | 1:50 | 17 | 0 |
| 0.004 | | 0.04 | | | | | 1:10 | 26 | 2 |
| 0.004 | | 0.008 | | | | | 1:2 | 6 | 0 |
| 0.1 | | | 1.0 | | | | 1:10 | 100 | 98 |
| 0.1 | | | 0.2 | | | | 1:2 | 100 | 98 |
| 0.1 | | | 0.04 | | | | 1:0.4 | 100 | 98 |
| 0.1 | | | 0.008 | | | | 1:0.08 | 100 | 98 |
| 0.02 | | | 1.0 | | | | 1:50 | 46 | 16 |
| 0.02 | | | 0.2 | | | | 1:10 | 32 | 10 |
| 0.02 | | | 0.04 | | | | 1:2 | 17 | 4 |
| 0.02 | | | 0.008 | | | | 1:0.4 | 46 | 4 |
| 0.1 | | | | 1.0 | | | 1:10 | 100 | 100 |
| 0.1 | | | | 0.2 | | | 1:2 | 100 | 100 |
| 0.1 | | | | 0.04 | | | 1:0.4 | 100 | 98 |
| 0.1 | | | | 0.008 | | | 1:0.08 | 98 | 98 |
| 0.02 | | | | 1.0 | | | 1:50 | 100 | 100 |
| 0.02 | | | | 0.2 | | | 1:10 | 100 | 100 |
| 0.02 | | | | 0.04 | | | 1:2 | 41 | 22 |
| 0.02 | | | | 0.008 | | | 1:0.4 | 24 | 4 |
| 0.1 | | | | | 1.0 | | 1:10 | 98 | 99 |
| 0.1 | | | | | 0.2 | | 1:2 | 96 | 98 |
| 0.1 | | | | | 0.04 | | 1:0.4 | 99 | 98 |
| 0.1 | | | | | 0.008 | | 1:0.08 | 99 | 99 |
| 0.02 | | | | | 1.0 | | 1:50 | 66 | 37 |
| 0.02 | | | | | 0.2 | | 1:10 | 52 | 20 |
| 0.02 | | | | | 0.04 | | 1:2 | 44 | 4 |
| 0.02 | | | | | 0.008 | | 1:0.4 | 31 | 35 |
| 0.1 | | | | | | 20.0 | 1:200 | 100 | 100 |
| 0.1 | | | | | | 0.8 | 1:8 | 100 | 100 |
| 0.1 | | | | | | 0.16 | 1:1.6 | 99 | 100 |
| 0.02 | | | | | | 20.0 | 1:1000 | 18 | 22 |
| 0.02 | | | | | | 0.8 | 1:40 | 28 | 17 |
| 0.02 | | | | | | 0.16 | 1:8 | 30 | 27 |

TABLE D7 in vitro-Test with Colletotrichum lindemuthianum

| (I-302) (ppm) | (15.064) (ppm) | (13.001) fludio-xonil (ppm) | (13.005) quino-xyfen (ppm) | (5.003) captan (ppm) | (5.012) folpet (ppm) | (5.018) pro-pineb (ppm) | Ratio | Effi-cacy % | Colby expected value % |
|---|---|---|---|---|---|---|---|---|---|
| 0.1 | | | | | | | | 100 | |
| 0.02 | | | | | | | | 12 | |
| 0.004 | | | | | | | | 0 | |
| 0.0008 | | | | | | | | 1 | |
| | 2.0 | | | | | | | 0 | |
| | 0.4 | | | | | | | 0 | |
| | 0.08 | | | | | | | 16 | |
| | | 5.0 | | | | | | 90 | |
| | | 1.0 | | | | | | 85 | |
| | | 0.2 | | | | | | 60 | |
| | | 0.04 | | | | | | 11 | |
| | | | 2.0 | | | | | 0 | |
| | | | 0.4 | | | | | 0 | |
| | | | 0.08 | | | | | 0 | |
| | | | | 20.0 | | | | 100 | |
| | | | | 4.0 | | | | 100 | |
| | | | | 0.8 | | | | 3 | |
| | | | | 0.16 | | | | 0 | |
| | | | | | 10.0 | | | 100 | |
| | | | | | 2.0 | | | 100 | |
| | | | | | 0.4 | | | 0 | |
| | | | | | 0.08 | | | 0 | |
| | | | | | | 100.0 | | 100 | |
| | | | | | | 20.0 | | 100 | |
| | | | | | | 4.0 | | 50 | |
| 0.1 | 2.0 | | | | | | 1:20 | 100 | 100 |
| 0.1 | 0.4 | | | | | | 1:4 | 98 | 100 |
| 0.1 | 0.08 | | | | | | 1:0.8 | 98 | 100 |
| 0.02 | 2.0 | | | | | | 1:100 | 29 | 17 |
| 0.02 | 0.4 | | | | | | 1:20 | 30 | 17 |
| 0.02 | 0.08 | | | | | | 1:4 | 48 | 30 |
| 0.02 | | 5.0 | | | | | 1:250 | 96 | 92 |
| 0.02 | | 1.0 | | | | | 1:50 | 99 | 88 |
| 0.02 | | 0.2 | | | | | 1:10 | 83 | 67 |
| 0.02 | | 0.04 | | | | | 1:2 | 40 | 26 |
| 0.004 | | 5.0 | | | | | 1:1250 | 95 | 91 |
| 0.004 | | 1.0 | | | | | 1:250 | 100 | 87 |
| 0.004 | | 0.2 | | | | | 1:50 | 78 | 65 |
| 0.004 | | 0.04 | | | | | 1:10 | 53 | 22 |
| 0.0008 | | 5.0 | | | | | 1:6250 | 92 | 91 |
| 0.0008 | | 1.0 | | | | | 1:1250 | 89 | 87 |
| 0.0008 | | 0.2 | | | | | 1:250 | 79 | 65 |
| 0.0008 | | 0.04 | | | | | 1:50 | 24 | 22 |
| 0.1 | | | 2.0 | | | | 1:20 | 100 | 100 |
| 0.1 | | | 0.4 | | | | 1:4 | 99 | 100 |
| 0.1 | | | 0.08 | | | | 1:0.8 | 100 | 100 |
| 0.02 | | | 2.0 | | | | 1:100 | 22 | 15 |
| 0.02 | | | 0.4 | | | | 1:20 | 26 | 15 |
| 0.02 | | | 0.08 | | | | 1:4 | 36 | 15 |
| 0.004 | | | 2.0 | | | | 1:500 | 0 | 0 |
| 0.004 | | | 0.4 | | | | 1:100 | 16 | 0 |
| 0.004 | | | 0.08 | | | | 1:20 | 9 | 0 |
| 0.1 | | | | 20.0 | | | 1:200 | 100 | 100 |
| 0.1 | | | | 4.0 | | | 1:40 | 100 | 100 |
| 0.1 | | | | 0.8 | | | 1:8 | 100 | 100 |
| 0.1 | | | | 0.16 | | | 1:1.6 | 98 | 100 |
| 0.02 | | | | 20.0 | | | 1:1000 | 100 | 100 |
| 0.02 | | | | 4.0 | | | 1:200 | 100 | 100 |
| 0.02 | | | | 0.8 | | | 1:40 | 23 | 18 |
| 0.02 | | | | 0.16 | | | 1:8 | 33 | 15 |
| 0.1 | | | | | 10.0 | | 1:100 | 100 | 100 |
| 0.1 | | | | | 2.0 | | 1:20 | 100 | 100 |
| 0.1 | | | | | 0.4 | | 1:4 | 97 | 100 |
| 0.1 | | | | | 0.08 | | 1:0.8 | 95 | 100 |
| 0.02 | | | | | 10.0 | | 1:500 | 100 | 100 |
| 0.02 | | | | | 2.0 | | 1:100 | 100 | 100 |
| 0.02 | | | | | 0.4 | | 1:20 | 24 | 15 |
| 0.02 | | | | | 0.08 | | 1:4 | 47 | 15 |
| 0.02 | | | | | | 100.0 | 1:5000 | 100 | 100 |
| 0.02 | | | | | | 20.0 | 1:1000 | 100 | 100 |
| 0.02 | | | | | | 4.0 | 1:200 | 100 | 64 |

TABLE D7-continued in vitro-Test with Colletotrichum lindemuthianum

| (I-302) (ppm) | (15.064) (ppm) | (13.001) fludio-xonil (ppm) | (13.005) quino-xyfen (ppm) | (5.003) captan (ppm) | (5.012) folpet (ppm) | (5.018) pro-pineb (ppm) | Ratio | Effi-cacy % | Colby expected value % |
|---|---|---|---|---|---|---|---|---|---|
| 0.004 | | | | | | 100.0 | 1:25000 | 100 | 100 |
| 0.004 | | | | | | 20.0 | 1:5000 | 100 | 100 |
| 0.004 | | | | | | 4.0 | 1:1000 | 69 | 54 |

TABLE D8 in vitro-Test with Colletotrichum lindemuthianum

| (I-302) (ppm) | (15.012) fosetyl-alumi-nium (ppm) | (15.016) metra-fenone (ppm) | (6.002) iso-tianil (ppm) | (17.001) Bacillus subtilis (ppm) | (17.012) Paeni-bacillus terrae (ppm) | (18.001) FLiPPER (ppm) | Ratio | Effi-cacy % | Colby expected value % |
|---|---|---|---|---|---|---|---|---|---|
| 0.1 | | | | | | | | 100 | |
| 0.02 | | | | | | | | 12 | |
| 0.004 | | | | | | | | 0 | |
| 0.0008 | | | | | | | | 1 | |
| | 100.0 | | | | | | | 70 | |
| | 20.0 | | | | | | | 8 | |
| | 4.0 | | | | | | | 0 | |
| | | 20.0 | | | | | | 21 | |
| | | 4.0 | | | | | | 12 | |
| | | 0.8 | | | | | | 10 | |
| | | | 100.0 | | | | | 0 | |
| | | | 20.0 | | | | | 3 | |
| | | | 4.0 | | | | | 9 | |
| | | | 0.8 | | | | | 0 | |
| | | | | 200.0 | | | | 0 | |
| | | | | 40.0 | | | | 0 | |
| | | | | 8.0 | | | | 0 | |
| | | | | 1.6 | | | | 0 | |
| | | | | | 200.0 | | | 100 | |
| | | | | | 40.0 | | | 24 | |
| | | | | | 8.0 | | | 0 | |
| | | | | | 1.6 | | | 2 | |
| | | | | | | 200.0 | | 0 | |
| | | | | | | 40.0 | | 0 | |
| | | | | | | 8.0 | | 12 | |
| | | | | | | 1.6 | | 6 | |
| 0.1 | 100.0 | | | | | | 1:1000 | 96 | 100 |
| 0.1 | 20.0 | | | | | | 1:200 | 95 | 100 |
| 0.1 | 4.0 | | | | | | 1:40 | 96 | 100 |
| 0.02 | 100.0 | | | | | | 1:5000 | 79 | 76 |
| 0.02 | 20.0 | | | | | | 1:1000 | 50 | 34 |
| 0.02 | 4.0 | | | | | | 1:200 | 31 | 29 |
| 0.1 | | 20.0 | | | | | 1:200 | 99 | 100 |
| 0.1 | | 4.0 | | | | | 1:40 | 99 | 100 |
| 0.1 | | 0.8 | | | | | 1:8 | 95 | 100 |
| 0.02 | | 20.0 | | | | | 1:1000 | 60 | 43 |
| 0.02 | | 4.0 | | | | | 1:200 | 29 | 37 |
| 0.02 | | 0.8 | | | | | 1:40 | 63 | 36 |
| 0.1 | | | 100.0 | | | | 1:1000 | 99 | 100 |
| 0.1 | | | 20.0 | | | | 1:200 | 100 | 100 |
| 0.1 | | | 4.0 | | | | 1:40 | 100 | 100 |
| 0.1 | | | 0.8 | | | | 1:8 | 100 | 100 |
| 0.02 | | | 100.0 | | | | 1:5000 | 16 | 0 |
| 0.02 | | | 20.0 | | | | 1:1000 | 9 | 3 |
| 0.02 | | | 4.0 | | | | 1:200 | 16 | 9 |
| 0.02 | | | 0.8 | | | | 1:40 | 21 | 0 |
| 0.1 | | | | 200.0 | | | 1:2000 | 100 | 100 |
| 0.1 | | | | 40.0 | | | 1:400 | 100 | 100 |
| 0.1 | | | | 8.0 | | | 1:80 | 100 | 100 |
| 0.1 | | | | 1.6 | | | 1:16 | 100 | 100 |
| 0.02 | | | | 200.0 | | | 1:10000 | 64 | 0 |
| 0.02 | | | | 40.0 | | | 1:2000 | 6 | 0 |
| 0.02 | | | | 8.0 | | | 1:400 | 49 | 0 |
| 0.02 | | | | 1.6 | | | 1:80 | 23 | 0 |
| 0.02 | | | | | 200.0 | | 1:10000 | 100 | 100 |
| 0.02 | | | | | 40.0 | | 1:2000 | 51 | 24 |

TABLE D8-continued in vitro-Test with Colletotrichum lindemuthianum

| (I-302) (ppm) | (15.012) fosetyl-aluminium (ppm) | (15.016) metrafenone (ppm) | (6.002) isotianil (ppm) | (17.001) Bacillus subtilis (ppm) | (17.012) Paenibacillus terrae (ppm) | (18.001) FLiPPER (ppm) | Ratio | Efficacy % | Colby expected value % |
|---|---|---|---|---|---|---|---|---|---|
| 0.02 | | | | | 8.0 | | 1:400 | 5 | 0 |
| 0.02 | | | | | 1.6 | | 1:80 | 15 | 2 |
| 0.004 | | | | | 200.0 | | 1:50000 | 100 | 100 |
| 0.004 | | | | | 40.0 | | 1:10000 | 24 | 16 |
| 0.004 | | | | | 8.0 | | 1:2000 | 0 | 0 |
| 0.004 | | | | | 1.6 | | 1:400 | 0 | 2 |
| 0.02 | | | | | | 200.0 | 1:10000 | 96 | 0 |
| 0.02 | | | | | | 40.0 | 1:2000 | 12 | 0 |
| 0.02 | | | | | | 8.0 | 1:400 | 25 | 12 |
| 0.02 | | | | | | 1.6 | 1:80 | 8 | 6 |
| 0.004 | | | | | | 200.0 | 1:50000 | 14 | 0 |
| 0.004 | | | | | | 40.0 | 1:10000 | 0 | 0 |
| 0.004 | | | | | | 8.0 | 1:2000 | 15 | 12 |
| 0.004 | | | | | | 1.6 | 1:400 | 17 | 6 |

TABLE E1 in vitro-Test with Cordana musae

| (I-052) (ppm) | (7.005) pyrimethanil (ppm) | (2.038) isoflucypram (ppm) | (3.020) trifloxystrobin (ppm) | (1.021) tebuconazole (ppm) | (1.020) spiroxamine (ppm) | (15.064) (ppm) | Ratio | Efficacy % | Colby expected value % |
|---|---|---|---|---|---|---|---|---|---|
| 0.1 | | | | | | | | 100 | |
| 0.02 | | | | | | | | 83 | |
| 0.004 | | | | | | | | 0 | |
| 0.0008 | | | | | | | | 0 | |
| | 20.0 | | | | | | | 4 | |
| | 4.0 | | | | | | | 24 | |
| | | 1.0 | | | | | | 0 | |
| | | 0.2 | | | | | | 0 | |
| | | 0.04 | | | | | | 0 | |
| | | 0.008 | | | | | | 0 | |
| | | | 1.0 | | | | | 66 | |
| | | | 0.008 | | | | | 3 | |
| | | | | 1.0 | | | | 99 | |
| | | | | 0.2 | | | | 29 | |
| | | | | 0.04 | | | | 0 | |
| | | | | 0.008 | | | | 0 | |
| | | | | | 20.0 | | | 9 | |
| | | | | | 4.0 | | | 0 | |
| | | | | | 0.8 | | | 0 | |
| | | | | | | 10.0 | | 27 | |
| | | | | | | 2.0 | | 0 | |
| | | | | | | 0.4 | | 0 | |
| | | | | | | 0.08 | | 0 | |
| 0.02 | 20.0 | | | | | | 1:1000 | 100 | 83 |
| 0.02 | 4.0 | | | | | | 1:200 | 99 | 86 |
| 0.004 | 20.0 | | | | | | 1:5000 | 19 | 4 |
| 0.004 | 4.0 | | | | | | 1:1000 | 36 | 24 |
| 0.0008 | 20.0 | | | | | | 1:25000 | 53 | 4 |
| 0.0008 | 4.0 | | | | | | 1:5000 | 17 | 24 |
| 0.02 | | 1.0 | | | | | 1:50 | 100 | 83 |
| 0.02 | | 0.2 | | | | | 1:10 | 99 | 83 |
| 0.02 | | 0.04 | | | | | 1:2 | 100 | 83 |
| 0.02 | | 0.008 | | | | | 1:0.4 | 83 | 83 |
| 0.1 | | | 1.0 | | | | 1:10 | 100 | 100 |
| 0.1 | | | 0.008 | | | | 1:0.08 | 99 | 100 |
| 0.004 | | | 1.0 | | | | 1:250 | 72 | 66 |
| 0.004 | | | 0.008 | | | | 1:2 | 54 | 3 |
| 0.0008 | | | 1.0 | | | | 1:1250 | 73 | 66 |
| 0.0008 | | | 0.008 | | | | 1:10 | 29 | 3 |
| 0.1 | | | | 1.0 | | | 1:10 | 100 | 100 |
| 0.1 | | | | 0.2 | | | 1:2 | 100 | 100 |
| 0.1 | | | | 0.04 | | | 1:0.4 | 99 | 100 |
| 0.1 | | | | 0.008 | | | 1:0.08 | 100 | 100 |
| 0.02 | | | | 1.0 | | | 1:50 | 98 | 100 |

TABLE E1-continued in vitro-Test with Cordana musae

| (I-052) (ppm) | (7.005) pyrime-thanil (ppm) | (2.038) isoflu-cypram (ppm) | (3.020) trifloxy-strobin (ppm) | (1.021) tebu-cona-zole (ppm) | (1.020) spiro-xamine (ppm) | (15.064) (ppm) | Ratio | Effi-cacy % | Colby expected value % |
|---|---|---|---|---|---|---|---|---|---|
| 0.02 | | | | 0.2 | | | 1:10 | 87 | 82 |
| 0.02 | | | | 0.04 | | | 1:2 | 74 | 75 |
| 0.02 | | | | 0.008 | | | 1:0.4 | 81 | 75 |
| 0.004 | | | | 1.0 | | | 1:250 | 100 | 99 |
| 0.004 | | | | 0.2 | | | 1:50 | 57 | 29 |
| 0.004 | | | | 0.04 | | | 1:10 | 0 | 0 |
| 0.004 | | | | 0.008 | | | 1:2 | 0 | 0 |
| 0.0008 | | | | 1.0 | | | 1:1250 | 99 | 99 |
| 0.0008 | | | | 0.2 | | | 1:250 | 56 | 29 |
| 0.0008 | | | | 0.04 | | | 1:50 | 0 | 0 |
| 0.0008 | | | | 0.008 | | | 1:10 | 0 | 0 |
| 0.1 | | | | | 20.0 | | 1:200 | 100 | 100 |
| 0.1 | | | | | 4.0 | | 1:40 | 100 | 100 |
| 0.1 | | | | | 0.8 | | 1:8 | 100 | 100 |
| 0.02 | | | | | 20.0 | | 1:1000 | 100 | 78 |
| 0.02 | | | | | 4.0 | | 1:200 | 70 | 76 |
| 0.02 | | | | | 0.8 | | 1:40 | 82 | 76 |
| 0.004 | | | | | 20.0 | | 1:5000 | 37 | 38 |
| 0.004 | | | | | 4.0 | | 1:1000 | 36 | 32 |
| 0.004 | | | | | 0.8 | | 1:200 | 36 | 32 |
| 0.02 | | | | | | 10.0 | 1:500 | 97 | 83 |
| 0.02 | | | | | | 2.0 | 1:100 | 77 | 76 |
| 0.02 | | | | | | 0.4 | 1:20 | 84 | 76 |
| 0.02 | | | | | | 0.08 | 1:4 | 80 | 76 |

TABLE E2 in vitro-Test with Cordana musae

| (I-052) (ppm) | (13.001) fludio-xonil (ppm) | (13.004) pro-quina-zid (ppm) | (13.005) quino-xyfen (ppm) | (5.003) captan (ppm) | (5.018) pro-pineb (ppm) | (17.012) Paeni-bacillus terrae (ppm) | Ratio | Effi-cacy % | Colby expected value % |
|---|---|---|---|---|---|---|---|---|---|
| 0.1 | | | | | | | | 100 | |
| 0.02 | | | | | | | | 83 | |
| 0.004 | | | | | | | | 0 | |
| 0.0008 | | | | | | | | 0 | |
| | 5.0 | | | | | | | 55 | |
| | 1.0 | | | | | | | 83 | |
| | 0.2 | | | | | | | 0 | |
| | 0.04 | | | | | | | 2 | |
| | | 10.0 | | | | | | 26 | |
| | | 2.0 | | | | | | 1 | |
| | | 0.4 | | | | | | 0 | |
| | | 0.08 | | | | | | 0 | |
| | | | 10.0 | | | | | 0 | |
| | | | 2.0 | | | | | 0 | |
| | | | 0.4 | | | | | 0 | |
| | | | | 4.0 | | | | 0 | |
| | | | | 0.16 | | | | 15 | |
| | | | | | 100.0 | | | 100 | |
| | | | | | 20.0 | | | 43 | |
| | | | | | 4.0 | | | 11 | |
| | | | | | 0.8 | | | 1 | |
| | | | | | | 200.0 | | 100 | |
| | | | | | | 40.0 | | 23 | |
| | | | | | | 8.0 | | 28 | |
| | | | | | | 1.6 | | 0 | |
| 0.02 | 5.0 | | | | | | 1:250 | 100 | 89 |
| 0.02 | 1.0 | | | | | | 1:50 | 99 | 96 |
| 0.02 | 0.2 | | | | | | 1:10 | 76 | 76 |
| 0.02 | 0.04 | | | | | | 1:2 | 85 | 77 |
| 0.02 | | 10.0 | | | | | 1:500 | 99 | 83 |
| 0.02 | | 2.0 | | | | | 1:100 | 86 | 76 |
| 0.02 | | 0.4 | | | | | 1:20 | 74 | 76 |
| 0.02 | | 0.08 | | | | | 1:4 | 80 | 76 |
| 0.1 | | | 10.0 | | | | 1:100 | 100 | 100 |

TABLE E2-continued in vitro-Test with Cordana musae

| (I-052) (ppm) | (13.001) fludio-xonil (ppm) | (13.004) pro-quina-zid (ppm) | (13.005) quino-xyfen (ppm) | (5.003) captan (ppm) | (5.018) pro-pineb (ppm) | (17.012) Paeni-bacillus terrae (ppm) | Ratio | Effi-cacy % | Colby expected value % |
|---|---|---|---|---|---|---|---|---|---|
| 0.1 | | | 2.0 | | | | 1:20 | 100 | 100 |
| 0.1 | | | 0.4 | | | | 1:4 | 100 | 100 |
| 0.02 | | | 10.0 | | | | 1:500 | 100 | 77 |
| 0.02 | | | 2.0 | | | | 1:100 | 100 | 77 |
| 0.02 | | | 0.4 | | | | 1:20 | 87 | 77 |
| 0.0008 | | | 10.0 | | | | 1:12500 | 29 | 0 |
| 0.0008 | | | 2.0 | | | | 1:2500 | 0 | 0 |
| 0.0008 | | | 0.4 | | | | 1:500 | 0 | 0 |
| 0.1 | | | | 4.0 | | | 1:40 | 100 | 100 |
| 0.1 | | | | 0.16 | | | 1:1.6 | 99 | 100 |
| 0.02 | | | | 4.0 | | | 1:200 | 100 | 77 |
| 0.02 | | | | 0.16 | | | 1:8 | 85 | 80 |
| 0.004 | | | | 4.0 | | | 1:1000 | 62 | 17 |
| 0.004 | | | | 0.16 | | | 1:40 | 45 | 30 |
| 0.0008 | | | | 4.0 | | | 1:5000 | 0 | 0 |
| 0.0008 | | | | 0.16 | | | 1:200 | 0 | 15 |
| 0.004 | | | | | 100.0 | | 1:25000 | 100 | 100 |
| 0.004 | | | | | 20.0 | | 1:5000 | 84 | 50 |
| 0.004 | | | | | 4.0 | | 1:1000 | 14 | 22 |
| 0.004 | | | | | 0.8 | | 1:200 | 40 | 13 |
| 0.02 | | | | | | 200.0 | 1:10000 | 100 | 100 |
| 0.02 | | | | | | 40.0 | 1:2000 | 84 | 82 |
| 0.02 | | | | | | 8.0 | 1:400 | 84 | 83 |
| 0.02 | | | | | | 1.6 | 1:80 | 90 | 76 |

TABLE E3 in vitro-Test with Cordana musae

| (I-300) (ppm) | (7.005) pyrime-thanil (ppm) | (2.002) bixafen (ppm) | (2.005) fluo-pyram (ppm) | (2.028) inpyr-fluxam (ppm) | (2.038) isoflu-cypram (ppm) | (3.025) fenpi-coxamid (ppm) | Ratio | Effi-cacy % | Colby expected value % |
|---|---|---|---|---|---|---|---|---|---|
| 0.1 | | | | | | | | 100 | |
| 0.02 | | | | | | | | 29 | |
| 0.004 | | | | | | | | 0 | |
| 0.0008 | | | | | | | | 0 | |
| | 20.0 | | | | | | | 24 | |
| | 4.0 | | | | | | | 0 | |
| | 0.8 | | | | | | | 0 | |
| | 0.16 | | | | | | | 0 | |
| | | 1.0 | | | | | | 0 | |
| | | 0.2 | | | | | | 0 | |
| | | 0.04 | | | | | | 2 | |
| | | 0.008 | | | | | | 0 | |
| | | | 20.0 | | | | | 8 | |
| | | | 4.0 | | | | | 1 | |
| | | | 0.8 | | | | | 0 | |
| | | | 0.16 | | | | | 6 | |
| | | | | 1.0 | | | | 0 | |
| | | | | 0.2 | | | | 0 | |
| | | | | 0.04 | | | | 0 | |
| | | | | 0.008 | | | | 0 | |
| | | | | | 1.0 | | | 22 | |
| | | | | | 0.2 | | | 0 | |
| | | | | | | 5.0 | | 80 | |
| | | | | | | 1.0 | | 40 | |
| 0.02 | 20.0 | | | | | | 1:1000 | 35 | 34 |
| 0.02 | 4.0 | | | | | | 1:200 | 21 | 13 |
| 0.02 | 0.8 | | | | | | 1:40 | 38 | 13 |
| 0.02 | 0.16 | | | | | | 1:8 | 17 | 13 |
| 0.004 | 20.0 | | | | | | 1:5000 | 31 | 24 |
| 0.004 | 4.0 | | | | | | 1:1000 | 35 | 0 |
| 0.004 | 0.8 | | | | | | 1:200 | 0 | 0 |
| 0.004 | 0.16 | | | | | | 1:40 | 0 | 0 |
| 0.1 | | 1.0 | | | | | 1:10 | 100 | 100 |
| 0.1 | | 0.2 | | | | | 1:2 | 98 | 100 |
| 0.1 | | 0.04 | | | | | 1:0.4 | 100 | 100 |

TABLE E3-continued in vitro-Test with Cordana musae

| (I-300) (ppm) | (7.005) pyrime-thanil (ppm) | (2.002) bixafen (ppm) | (2.005) fluo-pyram (ppm) | (2.028) inpyr-fluxam (ppm) | (2.038) isoflu-cypram (ppm) | (3.025) fenpi-coxamid (ppm) | Ratio | Effi-cacy % | Colby expected value % |
|---|---|---|---|---|---|---|---|---|---|
| 0.1 | | 0.008 | | | | | 1:0.08 | 100 | 100 |
| 0.004 | | 1.0 | | | | | 1:250 | 45 | 0 |
| 0.004 | | 0.2 | | | | | 1:50 | 0 | 0 |
| 0.004 | | 0.04 | | | | | 1:10 | 0 | 2 |
| 0.004 | | 0.008 | | | | | 1:2 | 15 | 0 |
| 0.02 | | | 20.0 | | | | 1:1000 | 41 | 20 |
| 0.02 | | | 4.0 | | | | 1:200 | 26 | 14 |
| 0.02 | | | 0.8 | | | | 1:40 | 67 | 13 |
| 0.02 | | | 0.16 | | | | 1:8 | 11 | 19 |
| 0.004 | | | 20.0 | | | | 1:5000 | 3 | 8 |
| 0.004 | | | 4.0 | | | | 1:1000 | 24 | 1 |
| 0.004 | | | 0.8 | | | | 1:200 | 0 | 0 |
| 0.004 | | | 0.16 | | | | 1:40 | 26 | 6 |
| 0.1 | | | | 1.0 | | | 1:10 | 100 | 100 |
| 0.1 | | | | 0.2 | | | 1:2 | 98 | 100 |
| 0.1 | | | | 0.04 | | | 1:0.4 | 98 | 100 |
| 0.1 | | | | 0.008 | | | 1:0.08 | 98 | 100 |
| 0.004 | | | | 1.0 | | | 1:250 | 23 | 0 |
| 0.004 | | | | 0.2 | | | 1:50 | 18 | 0 |
| 0.004 | | | | 0.04 | | | 1:10 | 0 | 0 |
| 0.004 | | | | 0.008 | | | 1:2 | 0 | 0 |
| 0.1 | | | | | 0.2 | | 1:2 | 100 | 100 |
| 0.02 | | | | | 0.2 | | 1:10 | 72 | 28 |
| 0.004 | | | | | 0.2 | | 1:50 | 40 | 29 |
| 0.0008 | | | | | 0.2 | | 1:250 | 0 | 0 |
| 0.1 | | | | | | 1.0 | 1:10 | 100 | 100 |
| 0.02 | | | | | | 1.0 | 1:50 | 58 | 57 |
| 0.004 | | | | | | 1.0 | 1:250 | 70 | 57 |
| 0.0008 | | | | | | 1.0 | 1:1250 | 57 | 40 |

TABLE E4 in vitro-Test with Cordana musae

| (I-300) (ppm) | (3.020) trifloxy-strobin (ppm) | (1.002) difeno-conazole (ppm) | (1.055) mefen-triflu-conazole (ppm) | (15.064) (ppm) | (13.001) fludio-xonil (ppm) | (5.003) captan (ppm) | Ratio | Effi-cacy % | Colby expected value % |
|---|---|---|---|---|---|---|---|---|---|
| 0.1 | | | | | | | | 100 | |
| 0.02 | | | | | | | | 29 | |
| 0.004 | | | | | | | | 0 | |
| 0.0008 | | | | | | | | 0 | |
| | 1.0 | | | | | | | 77 | |
| | 0.2 | | | | | | | 48 | |
| | 0.04 | | | | | | | 67 | |
| | | 1.0 | | | | | | 14 | |
| | | 0.2 | | | | | | 0 | |
| | | | 1.0 | | | | | 100 | |
| | | | 0.2 | | | | | 100 | |
| | | | 0.04 | | | | | 29 | |
| | | | 0.008 | | | | | 4 | |
| | | | | 10.0 | | | | 6 | |
| | | | | 2.0 | | | | 0 | |
| | | | | | 5.0 | | | 20 | |
| | | | | | 1.0 | | | 30 | |
| | | | | | 0.2 | | | 4 | |
| | | | | | | 20.0 | | 100 | |
| | | | | | | 4.0 | | 100 | |
| | | | | | | 0.8 | | 21 | |
| | | | | | | 0.16 | | 0 | |
| 0.02 | 1.0 | | | | | | 1:50 | 83 | 83 |
| 0.02 | 0.2 | | | | | | 1:10 | 79 | 62 |
| 0.02 | 0.04 | | | | | | 1:2 | 75 | 76 |
| 0.0008 | 1.0 | | | | | | 1:1250 | 78 | 77 |
| 0.0008 | 0.2 | | | | | | 1:250 | 66 | 48 |
| 0.0008 | 0.04 | | | | | | 1:50 | 79 | 67 |
| 0.1 | | 1.0 | | | | | 1:10 | 100 | 100 |
| 0.02 | | 1.0 | | | | | 1:50 | 49 | 38 |

TABLE E4-continued

| in vitro-Test with Cordana musae | | | | | | | | | |
|---|---|---|---|---|---|---|---|---|---|
| (I-300) (ppm) | (3.020) trifloxy-strobin (ppm) | (1.002) difeno-conazole (ppm) | (1.055) mefen-triflu-conazole (ppm) | (15.064) (ppm) | (13.001) fludio-xonil (ppm) | (5.003) captan (ppm) | Ratio | Effi-cacy % | Colby expected value % |
| 0.004 | | 1.0 | | | | | 1:250 | 46 | 39 |
| 0.0008 | | 1.0 | | | | | 1:1250 | 30 | 14 |
| 0.02 | | | 1.0 | | | | 1:50 | 100 | 100 |
| 0.02 | | | 0.2 | | | | 1:10 | 100 | 100 |
| 0.02 | | | 0.04 | | | | 1:2 | 43 | 39 |
| 0.02 | | | 0.008 | | | | 1:0.4 | 25 | 18 |
| 0.0008 | | | 1.0 | | | | 1:1250 | 100 | 100 |
| 0.0008 | | | 0.2 | | | | 1:250 | 100 | 100 |
| 0.0008 | | | 0.04 | | | | 1:50 | 35 | 29 |
| 0.0008 | | | 0.008 | | | | 1:10 | 14 | 4 |
| 0.1 | | | | 10.0 | | | 1:100 | 100 | 100 |
| 0.02 | | | | 10.0 | | | 1:500 | 65 | 47 |
| 0.004 | | | | 10.0 | | | 1:2500 | 21 | 16 |
| 0.0008 | | | | 10.0 | | | 1:12500 | 37 | 30 |
| 0.1 | | | | | 5.0 | | 1:50 | 100 | 100 |
| 0.1 | | | | | 1.0 | | 1:10 | 99 | 100 |
| 0.1 | | | | | 0.2 | | 1:2 | 98 | 100 |
| 0.02 | | | | | 5.0 | | 1:250 | 95 | 55 |
| 0.02 | | | | | 1.0 | | 1:50 | 81 | 60 |
| 0.02 | | | | | 0.2 | | 1:10 | 75 | 46 |
| 0.004 | | | | | 5.0 | | 1:1250 | 23 | 28 |
| 0.004 | | | | | 1.0 | | 1:250 | 65 | 37 |
| 0.004 | | | | | 0.2 | | 1:50 | 14 | 14 |
| 0.1 | | | | | | 20.0 | 1:200 | 100 | 100 |
| 0.1 | | | | | | 4.0 | 1:40 | 100 | 100 |
| 0.1 | | | | | | 0.8 | 1:8 | 100 | 100 |
| 0.1 | | | | | | 0.16 | 1:1.6 | 99 | 100 |
| 0.02 | | | | | | 20.0 | 1:1000 | 100 | 100 |
| 0.02 | | | | | | 4.0 | 1:200 | 100 | 100 |
| 0.02 | | | | | | 0.8 | 1:40 | 53 | 45 |
| 0.02 | | | | | | 0.16 | 1:8 | 43 | 30 |
| 0.0008 | | | | | | 20.0 | 1:25000 | 100 | 100 |
| 0.0008 | | | | | | 4.0 | 1:5000 | 100 | 100 |
| 0.0008 | | | | | | 0.8 | 1:1000 | 24 | 24 |
| 0.0008 | | | | | | 0.16 | 1:200 | 18 | 4 |

TABLE E5

| in vitro-Test with Cordana musae | | | | | | | | |
|---|---|---|---|---|---|---|---|---|
| (I-300) (ppm) | (5.013) man-cozeb (ppm) | (5.018) pro-pineb (ppm) | (17.001) Bacillus subtilis (ppm) | (17.012) Paeni-bacillus terrae (ppm) | (18.001) FLiPPER (ppm) | Ratio | Effi-cacy % | Colby expected value % |
| 0.1 | | | | | | | 100 | |
| 0.02 | | | | | | | 29 | |
| 0.004 | | | | | | | 0 | |
| 0.0008 | | | | | | | 0 | |
| | 10.0 | | | | | | 100 | |
| | 2.0 | | | | | | 31 | |
| | 0.4 | | | | | | 0 | |
| | 0.08 | | | | | | 0 | |
| | | 100.0 | | | | | 99 | |
| | | 20.0 | | | | | 100 | |
| | | 4.0 | | | | | 31 | |
| | | 0.8 | | | | | 0 | |
| | | | 200.0 | | | | 12 | |
| | | | 40.0 | | | | 0 | |
| | | | 8.0 | | | | 0 | |
| | | | 1.6 | | | | 1 | |
| | | | | 200.0 | | | 100 | |
| | | | | 1.6 | | | 0 | |
| | | | | | 200.0 | | 0 | |
| | | | | | 40.0 | | 7 | |
| | | | | | 8.0 | | 4 | |
| 0.02 | 10.0 | | | | | 1:500 | 100 | 100 |
| 0.02 | 2.0 | | | | | 1:100 | 71 | 31 |
| 0.02 | 0.4 | | | | | 1:20 | 12 | 0 |

TABLE E5-continued in vitro-Test with Cordana musae

| (I-300) (ppm) | (5.013) man-cozeb (ppm) | (5.018) pro-pineb (ppm) | (17.001) Bacillus subtilis (ppm) | (17.012) Paeni-bacillus terrae (ppm) | (18.001) FLiPPER (ppm) | Ratio | Effi-cacy % | Colby expected value % |
|---|---|---|---|---|---|---|---|---|
| 0.02 | 0.08 | | | | | 1:4 | 33 | 0 |
| 0.0008 | 10.0 | | | | | 1:12500 | 100 | 100 |
| 0.0008 | 2.0 | | | | | 1:2500 | 52 | 31 |
| 0.0008 | 0.4 | | | | | 1:500 | 19 | 0 |
| 0.0008 | 0.08 | | | | | 1:100 | 0 | 0 |
| 0.02 | | 100.0 | | | | 1:5000 | 94 | 99 |
| 0.02 | | 20.0 | | | | 1:1000 | 100 | 100 |
| 0.02 | | 4.0 | | | | 1:200 | 44 | 31 |
| 0.02 | | 0.8 | | | | 1:40 | 43 | 0 |
| 0.0008 | | 100.0 | | | | 1:125000 | 100 | 99 |
| 0.0008 | | 20.0 | | | | 1:25000 | 100 | 100 |
| 0.0008 | | 4.0 | | | | 1:5000 | 65 | 31 |
| 0.0008 | | 0.8 | | | | 1:1000 | 0 | 0 |
| 0.02 | | | 200.0 | | | 1:10000 | 67 | 37 |
| 0.02 | | | 40.0 | | | 1:2000 | 30 | 29 |
| 0.02 | | | 8.0 | | | 1:400 | 33 | 29 |
| 0.02 | | | 1.6 | | | 1:80 | 40 | 29 |
| 0.1 | | | | 200.0 | | 1:2000 | 100 | 100 |
| 0.1 | | | | 1.6 | | 1:16 | 99 | 100 |
| 0.02 | | | | 200.0 | | 1:10000 | 100 | 100 |
| 0.02 | | | | 1.6 | | 1:80 | 77 | 29 |
| 0.004 | | | | 200.0 | | 1:50000 | 100 | 100 |
| 0.004 | | | | 1.6 | | 1:400 | 5 | 0 |
| 0.0008 | | | | 200.0 | | 1:250000 | 100 | 100 |
| 0.0008 | | | | 1.6 | | 1:2000 | 2 | 0 |
| 0.1 | | | | | 200.0 | 1:2000 | 99 | 100 |
| 0.1 | | | | | 40.0 | 1:400 | 100 | 100 |
| 0.1 | | | | | 8.0 | 1:80 | 98 | 100 |
| 0.02 | | | | | 200.0 | 1:10000 | 36 | 29 |
| 0.02 | | | | | 40.0 | 1:2000 | 73 | 33 |
| 0.02 | | | | | 8.0 | 1:400 | 71 | 31 |
| 0.0008 | | | | | 200.0 | 1:250000 | 0 | 0 |
| 0.0008 | | | | | 40.0 | 1:50000 | 0 | 7 |
| 0.0008 | | | | | 8.0 | 1:10000 | 16 | 4 |

TABLE E6 in vitro -Test with *Cordana musae*

| (I-302) (ppm) | (7.005) pyrime-thanil (ppm) | (2.002) bixafen (ppm) | (2.005) fluo-pyram (ppm) | (2.038) isoflu-cypram (ppm) | (3.020) trifloxy-strobin (ppm) | (1.018) prothio-conazole (ppm) | Ratio | Effi-cacy % | Colby expected value % |
|---|---|---|---|---|---|---|---|---|---|
| 0.1 | | | | | | | | 100 | |
| 0.02 | | | | | | | | 37 | |
| 0.004 | | | | | | | | 0 | |
| 0.0008 | | | | | | | | 0 | |
| | 20.0 | | | | | | | 33 | |
| | 0.8 | | | | | | | 12 | |
| | 0.16 | | | | | | | 0 | |
| | | 0.2 | | | | | | 0 | |
| | | 0.04 | | | | | | 0 | |
| | | 0.008 | | | | | | 8 | |
| | | | 20.0 | | | | | 28 | |
| | | | 4.0 | | | | | 2 | |
| | | | 0.16 | | | | | 13 | |
| | | | | 1.0 | | | | 27 | |
| | | | | 0.2 | | | | 1 | |
| | | | | 0.04 | | | | 0 | |
| | | | | 0.008 | | | | 0 | |
| | | | | | 1.0 | | | 68 | |
| | | | | | 0.2 | | | 61 | |
| | | | | | 0.008 | | | 13 | |
| | | | | | | 1.0 | | 100 | |
| | | | | | | 0.2 | | 100 | |
| | | | | | | 0.04 | | 6 | |
| 0.02 | 20.0 | | | | | | 1:1000 | 74 | 58 |
| 0.02 | 0.8 | | | | | | 1:40 | 57 | 44 |
| 0.02 | 0.16 | | | | | | 1:8 | 64 | 37 |

TABLE E6-continued in vitro -Test with *Cordana musae*

| (I-302) (ppm) | (7.005) pyrime-thanil (ppm) | (2.002) bixafen (ppm) | (2.005) fluo-pyram (ppm) | (2.038) isoflu-cypram (ppm) | (3.020) trifloxy-strobin (ppm) | (1.018) prothio-conazole (ppm) | Ratio | Effi-cacy % | Colby expected value % |
|---|---|---|---|---|---|---|---|---|---|
| 0.1 | | 0.2 | | | | | 1:2 | 100 | 100 |
| 0.1 | | 0.04 | | | | | 1:0.4 | 100 | 100 |
| 0.1 | | 0.008 | | | | | 1:0.08 | 100 | 100 |
| 0.02 | | 0.2 | | | | | 1:10 | 61 | 37 |
| 0.02 | | 0.04 | | | | | 1:2 | 46 | 37 |
| 0.02 | | 0.008 | | | | | 1:0.4 | 47 | 40 |
| 0.004 | | 0.2 | | | | | 1:50 | 32 | 0 |
| 0.004 | | 0.04 | | | | | 1:10 | 2 | 0 |
| 0.004 | | 0.008 | | | | | 1:2 | 16 | 6 |
| 0.1 | | | 20.0 | | | | 1:200 | 100 | 100 |
| 0.1 | | | 4.0 | | | | 1:40 | 99 | 100 |
| 0.1 | | | 0.16 | | | | 1:1.6 | 100 | 100 |
| 0.02 | | | 20.0 | | | | 1:1000 | 71 | 55 |
| 0.02 | | | 4.0 | | | | 1:200 | 57 | 38 |
| 0.02 | | | 0.16 | | | | 1:8 | 51 | 45 |
| 0.004 | | | 20.0 | | | | 1:5000 | 42 | 28 |
| 0.004 | | | 4.0 | | | | 1:1000 | 21 | 2 |
| 0.004 | | | 0.16 | | | | 1:40 | 3 | 13 |
| 0.02 | | | | 1.0 | | | 27 | 76 | 54 |
| 0.02 | | | | 0.2 | | | 1 | 68 | 38 |
| 0.02 | | | | 0.04 | | | 0 | 67 | 37 |
| 0.02 | | | | 0.008 | | | 0 | 41 | 37 |
| 0.004 | | | | 1.0 | | | 27 | 48 | 27 |
| 0.004 | | | | 0.2 | | | 1 | 0 | 1 |
| 0.004 | | | | 0.04 | | | 0 | 0 | 0 |
| 0.004 | | | | 0.008 | | | 0 | 0 | 0 |
| 0.02 | | | | | 1.0 | | 1:50 | 84 | 80 |
| 0.02 | | | | | 0.2 | | 1:10 | 80 | 75 |
| 0.02 | | | | | 0.008 | | 1:0.4 | 56 | 45 |
| 0.004 | | | | | 1.0 | | 1:250 | 72 | 68 |
| 0.004 | | | | | 0.2 | | 1:50 | 77 | 61 |
| 0.004 | | | | | 0.008 | | 1:2 | 0 | 13 |
| 0.0008 | | | | | 1.0 | | 1:1250 | 72 | 68 |
| 0.0008 | | | | | 0.2 | | 1:250 | 69 | 61 |
| 0.0008 | | | | | 0.008 | | 1:10 | 41 | 13 |
| 0.004 | | | | | | 1.0 | 1:250 | 100 | 100 |
| 0.004 | | | | | | 0.2 | 1:50 | 100 | 100 |
| 0.004 | | | | | | 0.04 | 1:10 | 49 | 10 |
| 0.0008 | | | | | | 1.0 | 1:1250 | 100 | 100 |
| 0.0008 | | | | | | 0.2 | 1:250 | 100 | 100 |
| 0.0008 | | | | | | 0.04 | 1:50 | 3 | 6 |

TABLE E7 in vitro -Test with *Cordana musae*

| (I-302) (ppm) | (15.064) (ppm) | (13.001) fludio-xonil (ppm) | (13.005) quino-xyfen (ppm) | (5.003) captan (ppm) | (5.010) dithia-non (ppm) | (5.012) folpet (ppm) | Ratio | Effi-cacy % | Colby expected value % |
|---|---|---|---|---|---|---|---|---|---|
| 0.1 | | | | | | | | 100 | |
| 0.02 | | | | | | | | 37 | |
| 0.004 | | | | | | | | 0 | |
| 0.0008 | | | | | | | | 0 | |
| | 10.0 | | | | | | | 27 | |
| | 2.0 | | | | | | | 7 | |
| | | 5.0 | | | | | | 2 | |
| | | 1.0 | | | | | | 0 | |
| | | 0.2 | | | | | | 0 | |
| | | 0.04 | | | | | | 0 | |
| | | | 10.0 | | | | | 34 | |
| | | | 2.0 | | | | | 0 | |
| | | | 0.4 | | | | | 0 | |
| | | | 0.08 | | | | | 0 | |
| | | | | 4.0 | | | | 100 | |
| | | | | 0.8 | | | | 0 | |
| | | | | 0.16 | | | | 0 | |
| | | | | | 4.0 | | | 100 | |
| | | | | | 0.8 | | | 0 | |

TABLE E7-continued in vitro -Test with *Cordana musae*

| (I-302) (ppm) | (15.064) (ppm) | (13.001) fludio-xonil (ppm) | (13.005) quino-xyfen (ppm) | (5.003) captan (ppm) | (5.010) dithia-non (ppm) | (5.012) folpet (ppm) | Ratio | Effi-cacy % | Colby expected value % |
|---|---|---|---|---|---|---|---|---|---|
| | | | | | 0.16 | | | 0 | |
| | | | | | | 2.0 | | 100 | |
| | | | | | | 0.4 | | 10 | |
| | | | | | | 0.08 | | 5 | |
| 0.1 | 10.0 | | | | | | 1:100 | 100 | 100 |
| 0.1 | 2.0 | | | | | | 1:20 | 100 | 100 |
| 0.02 | 10.0 | | | | | | 1:500 | 79 | 68 |
| 0.02 | 2.0 | | | | | | 1:100 | 67 | 60 |
| 0.004 | 10.0 | | | | | | 1:2500 | 54 | 38 |
| 0.004 | 2.0 | | | | | | 1:500 | 37 | 22 |
| 0.0008 | 10.0 | | | | | | 1:12500 | 28 | 29 |
| 0.0008 | 2.0 | | | | | | 1:2500 | 22 | 10 |
| 0.02 | | 5.0 | | | | | 1:250 | 86 | 57 |
| 0.02 | | 1.0 | | | | | 1:50 | 87 | 57 |
| 0.02 | | 0.2 | | | | | 1:10 | 74 | 57 |
| 0.02 | | 0.04 | | | | | 1:2 | 82 | 57 |
| 0.02 | | | 10.0 | | | | 1:500 | 100 | 43 |
| 0.02 | | | 2.0 | | | | 1:100 | 75 | 15 |
| 0.02 | | | 0.4 | | | | 1:20 | 48 | 15 |
| 0.02 | | | 0.08 | | | | 1:4 | 58 | 15 |
| 0.02 | | | | 4.0 | | | 1:200 | 100 | 100 |
| 0.02 | | | | 0.8 | | | 1:40 | 62 | 15 |
| 0.02 | | | | 0.16 | | | 1:8 | 87 | 15 |
| 0.004 | | | | 4.0 | | | 1:1000 | 100 | 100 |
| 0.004 | | | | 0.8 | | | 1:200 | 16 | 0 |
| 0.004 | | | | 0.16 | | | 1:40 | 0 | 0 |
| 0.02 | | | | | 4.0 | | 1:200 | 99 | 100 |
| 0.02 | | | | | 0.8 | | 1:40 | 55 | 15 |
| 0.02 | | | | | 0.16 | | 1:8 | 26 | 15 |
| 0.004 | | | | | 4.0 | | 1:1000 | 100 | 100 |
| 0.004 | | | | | 0.8 | | 1:200 | 7 | 0 |
| 0.004 | | | | | 0.16 | | 1:40 | 0 | 0 |
| 0.02 | | | | | | 2.0 | 1:100 | 100 | 100 |
| 0.02 | | | | | | 0.4 | 1:20 | 80 | 24 |
| 0.02 | | | | | | 0.08 | 1:4 | 34 | 19 |
| 0.004 | | | | | | 2.0 | 1:500 | 100 | 100 |
| 0.004 | | | | | | 0.4 | 1:100 | 28 | 10 |
| 0.004 | | | | | | 0.08 | 1:20 | 0 | 5 |

TABLE E8 in vitro -Test with *Cordana musae*

| (I-302) (ppm) | (5.013) mancozeb (ppm) | (5.018) propineb (ppm) | (6.002) isotianil (ppm) | (17.012) *Paenibacillus terrae* (ppm) | Ratio | Efficacy % | Colby expected value % |
|---|---|---|---|---|---|---|---|
| 0.1 | | | | | | 100 | |
| 0.02 | | | | | | 37 | |
| 0.004 | | | | | | 0 | |
| 0.0008 | | | | | | 0 | |
| | 10.0 | | | | | 100 | |
| | 2.0 | | | | | 32 | |
| | 0.4 | | | | | 3 | |
| | 0.08 | | | | | 0 | |
| | | 20.0 | | | | 100 | |
| | | 4.0 | | | | 30 | |
| | | 0.8 | | | | 3 | |
| | | | 20.0 | | | 0 | |
| | | | 4.0 | | | 6 | |
| | | | 0.8 | | | 9 | |
| | | | | 40.0 | | 27 | |
| | | | | 8.0 | | 9 | |
| | | | | 1.6 | | 7 | |
| 0.004 | 10.0 | | | | 1:2500 | 100 | 100 |
| 0.004 | 2.0 | | | | 1:500 | 58 | 32 |
| 0.004 | 0.4 | | | | 1:100 | 0 | 3 |
| 0.004 | 0.08 | | | | 1:20 | 0 | 0 |
| 0.02 | | 20.0 | | | 1:1000 | 100 | 100 |

TABLE E8-continued in vitro -Test with *Cordana musae*

| (I-302) (ppm) | (5.013) mancozeb (ppm) | (5.018) propineb (ppm) | (6.002) isotianil (ppm) | (17.012) *Paenibacillus terrae* (ppm) | Ratio | Efficacy % | Colby expected value % |
|---|---|---|---|---|---|---|---|
| 0.02 | | 4.0 | | | 1:200 | 85 | 71 |
| 0.02 | | 0.8 | | | 1:40 | 58 | 60 |
| 0.004 | | 20.0 | | | 1:5000 | 100 | 100 |
| 0.004 | | 4.0 | | | 1:1000 | 69 | 30 |
| 0.004 | | 0.8 | | | 1:200 | 10 | 3 |
| 0.0008 | | 20.0 | | | 1:25000 | 100 | 100 |
| 0.0008 | | 4.0 | | | 1:5000 | 58 | 30 |
| 0.0008 | | 0.8 | | | 1:1000 | 0 | 3 |
| 0.1 | | | 20.0 | | 1:200 | 100 | 100 |
| 0.1 | | | 4.0 | | 1:40 | 100 | 100 |
| 0.1 | | | 0.8 | | 1:8 | 100 | 100 |
| 0.02 | | | 20.0 | | 1:5000 | 53 | 46 |
| 0.02 | | | 4.0 | | 1:1000 | 45 | 50 |
| 0.02 | | | 0.8 | | 1:200 | 57 | 51 |
| 0.004 | | | 20.0 | | 1:40 | 20 | 0 |
| 0.004 | | | 4.0 | | 1:25000 | 8 | 6 |
| 0.004 | | | 0.8 | | 1:5000 | 4 | 9 |
| 0.02 | | | | 40.0 | 1:10000 | 100 | 100 |
| 0.02 | | | | 8.0 | 1:2000 | 74 | 61 |
| 0.02 | | | | 1.6 | 1:400 | 78 | 51 |
| 0.004 | | | | 40.0 | 1:50000 | 100 | 100 |
| 0.004 | | | | 8.0 | 1:10000 | 28 | 27 |
| 0.004 | | | | 1.6 | 1:2000 | 22 | 9 |

TABLE E9 in vitro -Test with *Cordana musae*

| (I-339) (ppm) | (2.002) bixafen (ppm) | (1.002) difeno-conazole (ppm) | (5.010) dithianon (ppm) | (3.025) fen-picox-amid (ppm) | (13.001) flu-dioxonil (ppm) | (3.012) fluoxa¬strobin (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 63 | |
| | 0.2 | | | | | | | 0 | |
| | 0.04 | | | | | | | 0 | |
| | 0.008 | | | | | | | 0 | |
| | | 0.04 | | | | | | 0 | |
| | | | 10 | | | | | 100 | |
| | | | 0.08 | | | | | 0 | |
| | | | | 0.2 | | | | 52 | |
| | | | | 0.008 | | | | 0 | |
| | | | | | 5 | | | 11 | |
| | | | | | 1 | | | 0 | |
| | | | | | 0.2 | | | 0 | |
| | | | | | | 0.016 | | 0 | |
| 0.008 | 0.2 | | | | | | 1:25 | 84 | 63 |
| 0.008 | 0.04 | | | | | | 1:5 | 62 | 63 |
| 0.008 | 0.008 | | | | | | 1:1 | 99 | 63 |
| 0.2 | | 0.04 | | | | | 1:0.2 | 100 | 100 |
| 0.04 | | 0.04 | | | | | 1:1 | 100 | 100 |
| 0.008 | | 0.04 | | | | | 1:5 | 85 | 56 |
| 0.04 | | | 10 | | | | 1:250 | 100 | 100 |
| 0.04 | | | 0.08 | | | | 1:2 | 100 | 100 |
| 0.008 | | | 10 | | | | 1:1250 | 100 | 100 |
| 0.008 | | | 0.08 | | | | 1:10 | 86 | 56 |
| 0.04 | | | | 0.2 | | | 1:5 | 100 | 100 |
| 0.04 | | | | 0.008 | | | 1:0.2 | 100 | 100 |
| 0.008 | | | | 0.2 | | | 1:25 | 82 | 79 |
| 0.008 | | | | 0.008 | | | 1:1 | 67 | 56 |
| 0.008 | | | | | 5 | | 1:625 | 93 | 61 |
| 0.008 | | | | | 1 | | 1:125 | 100 | 56 |
| 0.008 | | | | | 0.2 | | 1:25 | 99 | 56 |

TABLE E9-continued in vitro -Test with *Cordana musae*

| (I-339) (ppm) | (2.002) bixafen (ppm) | (1.002) difeno-conazole (ppm) | (5.010) dithianon (ppm) | (3.025) fen-picox-amid (ppm) | (13.001) flu-dioxonil (ppm) | (3.012) fluoxa¬strobin (ppm) | Ratio | Efficacy % | Colby expected value % |
|---|---|---|---|---|---|---|---|---|---|
| 0.2 | | | | | | 0.016 | 1:0.08 | 100 | 100 |
| 0.04 | | | | | | 0.016 | 1:0.4 | 100 | 100 |
| 0.008 | | | | | | 0.016 | 1:2 | 86 | 82 |

TABLE E10 in vitro -Test with *Cordana musae*

| (I-339) (ppm) | (1.062) fluoxytio-conazole (ppm) | (6.002) iso-tianil (ppm) | (5.013) manco-zeb (ppm) | (12.004) meta-laxyl-m (ppm) | (15.016) metra-fenone (ppm) | (17.012) Paeni-bacillus terrae (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 63 | |
| | 0.2 | | | | | | | 10 | |
| | | 100 | | | | | | 7 | |
| | | 20 | | | | | | 10 | |
| | | 4 | | | | | | 15 | |
| | | | 20 | | | | | 100 | |
| | | | 4 | | | | | 14 | |
| | | | 0.8 | | | | | 0 | |
| | | | 0.16 | | | | | 0 | |
| | | | | 100 | | | | 33 | |
| | | | | 20 | | | | 0 | |
| | | | | 4 | | | | 0 | |
| | | | | 0.8 | | | | 0 | |
| | | | | | 5 | | | 11 | |
| | | | | | 1 | | | 0 | |
| | | | | | 0.2 | | | 0 | |
| | | | | | 0.04 | | | 0 | |
| | | | | | | 200 | | 100 | |
| | | | | | | 40 | | 0 | |
| | | | | | | 8 | | 0 | |
| | | | | | | 1.6 | | 0 | |
| 1 | 0.2 | | | | | | 1:0.2 | 100 | 100 |
| 0.2 | 0.2 | | | | | | 1:1 | 100 | 100 |
| 0.008 | 0.2 | | | | | | 1:25 | 94 | 84 |
| 0.008 | | 100 | | | | | 1:12500 | 65 | 58 |
| 0.008 | | 20 | | | | | 1:2500 | 61 | 59 |
| 0.008 | | 4 | | | | | 1:500 | 69 | 61 |
| 0.008 | | | 20 | | | | 1:2500 | 100 | 100 |
| 0.008 | | | 4 | | | | 1:500 | 76 | 61 |
| 0.008 | | | 0.8 | | | | 1:100 | 79 | 55 |
| 0.008 | | | 0.16 | | | | 1:20 | 73 | 55 |
| 0.008 | | | | 100 | | | 1:12500 | 79 | 70 |
| 0.008 | | | | 20 | | | 1:2500 | 82 | 55 |
| 0.008 | | | | 4 | | | 1:500 | 71 | 55 |
| 0.008 | | | | 0.8 | | | 1:100 | 81 | 55 |
| 0.008 | | | | | 5 | | 1:625 | 97 | 90 |
| 0.008 | | | | | 1 | | 1:125 | 100 | 88 |
| 0.008 | | | | | 0.2 | | 1:25 | 96 | 88 |
| 0.008 | | | | | 0.04 | | 1:5 | 100 | 88 |
| 0.008 | | | | | | 200 | 1:25000 | 100 | 100 |
| 0.008 | | | | | | 40 | 1:5000 | 96 | 88 |
| 0.008 | | | | | | 8 | 1:1000 | 94 | 88 |
| 0.008 | | | | | | 1.6 | 1:200 | 91 | 88 |

TABLE E11

| in vitro -Test with *Cordana musae* | | | | | | | | |
|---|---|---|---|---|---|---|---|---|
| (I-339) (ppm) | (2.017) penflufen (ppm) | (5.018) propineb (ppm) | (13.004) pro-quinazid (ppm) | (1.018) prothio-conazole (ppm) | (7.005) pyri-methanil (ppm) | Ratio | Efficacy % | Colby expected value % |
| 1 | | | | | | | 100 | |
| 0.2 | | | | | | | 100 | |
| 0.04 | | | | | | | 100 | |
| 0.008 | | | | | | | 63 | |
| | 5 | | | | | | 14 | |
| | 1 | | | | | | 0 | |
| | 0.2 | | | | | | 0 | |
| | 0.04 | | | | | | 0 | |
| | | 20 | | | | | 21 | |
| | | 4 | | | | | 0 | |
| | | 0.8 | | | | | 0 | |
| | | | 10 | | | | 15 | |
| | | | 2 | | | | 0 | |
| | | | 0.4 | | | | 0 | |
| | | | 0.08 | | | | 0 | |
| | | | | 0.5 | | | 100 | |
| | | | | 0.1 | | | 81 | |
| | | | | 0.004 | | | 0 | |
| | | | | | 20 | | 7 | |
| | | | | | 4 | | 7 | |
| | | | | | 0.8 | | 40 | |
| | | | | | 0.16 | | 0 | |
| 0.008 | 5 | | | | | 1:625 | 93 | 90 |
| 0.008 | 1 | | | | | 1:125 | 92 | 88 |
| 0.008 | 0.2 | | | | | 1:25 | 92 | 88 |
| 0.008 | 0.04 | | | | | 1:5 | 92 | 88 |
| 0.008 | | 20 | | | | 1:2500 | 74 | 33 |
| 0.008 | | 4 | | | | 1:500 | 85 | 16 |
| 0.008 | | 0.8 | | | | 1:100 | 83 | 16 |
| 0.008 | | | 10 | | | 1:1250 | 82 | 29 |
| 0.008 | | | 2 | | | 1:250 | 83 | 16 |
| 0.008 | | | 0.4 | | | 1:50 | 86 | 16 |
| 0.008 | | | 0.08 | | | 1:10 | 86 | 16 |
| 0.008 | | | | 0.5 | | 1:62.5 | 100 | 100 |
| 0.008 | | | | 0.1 | | 1:12.5 | 90 | 84 |
| 0.008 | | | | 0.004 | | 1:0.5 | 100 | 16 |
| 0.008 | | | | | 20 | 1:2500 | 83 | 22 |
| 0.008 | | | | | 4 | 1:500 | 38 | 22 |
| 0.008 | | | | | 0.8 | 1:100 | 79 | 50 |
| 0.008 | | | | | 0.16 | 1:20 | 81 | 16 |

TABLE E12

| in vitro -Test with *Cordana musae* | | | | | | | | | |
|---|---|---|---|---|---|---|---|---|---|
| (I-338) (ppm) | (17.001) (ppm) | (1.067) (ppm) | (2.002) bixafen (ppm) | (5.003) captan (ppm) | (1.002) difeno-conazole (ppm) | (5.010) dithianon (ppm) | Ratio | Efficacy % | Colby expected value % |
| 1 | | | | | | | | 57 | |
| 0.2 | | | | | | | | 0 | |
| 0.04 | | | | | | | | 4 | |
| 0.008 | | | | | | | | 5 | |
| | 200 | | | | | | | 0 | |
| | 40 | | | | | | | 0 | |
| | | 2 | | | | | | 100 | |
| | | 0.4 | | | | | | 14 | |
| | | 0.08 | | | | | | 0 | |
| | | 0.016 | | | | | | 4 | |
| | | | 1 | | | | | 2 | |
| | | | 0.2 | | | | | 0 | |
| | | | 0.04 | | | | | 0 | |
| | | | 0.008 | | | | | 17 | |
| | | | | 5 | | | | 100 | |
| | | | | 1 | | | | 0 | |
| | | | | 0.04 | | | | 0 | |
| | | | | | 1 | | | 20 | |
| | | | | | 0.2 | | | 16 | |
| | | | | | 0.04 | | | 0 | |

TABLE E12-continued in vitro -Test with *Cordana musae*

| (I-338) (ppm) | (17.001) (ppm) | (1.067) (ppm) | (2.002) bixafen (ppm) | (5.003) captan (ppm) | (1.002) difeno-conazole (ppm) | (5.010) dithianon (ppm) | Ratio | Efficacy % | Colby expected value % |
|---|---|---|---|---|---|---|---|---|---|
| | | | | | | 2 | | 95 | |
| 1 | 200 | | | | | | 1:200 | 87 | 57 |
| 1 | 40 | | | | | | 1:40 | 87 | 57 |
| 0.2 | 200 | | | | | | 1:1000 | 0 | 0 |
| 0.2 | 40 | | | | | | 1:200 | 0 | 0 |
| 0.2 | | 2 | | | | | 1:10 | 100 | 100 |
| 0.2 | | 0.4 | | | | | 1:2 | 85 | 14 |
| 0.2 | | 0.08 | | | | | 1:0.4 | 19 | 0 |
| 0.2 | | 0.016 | | | | | 1:0.08 | 12 | 4 |
| 0.04 | | 2 | | | | | 1:50 | 100 | 100 |
| 0.04 | | 0.4 | | | | | 1:10 | 74 | 18 |
| 0.04 | | 0.08 | | | | | 1:2 | 17 | 4 |
| 0.04 | | 0.016 | | | | | 1:0.4 | 5 | 7 |
| 0.008 | | 2 | | | | | 1:250 | 100 | 100 |
| 0.008 | | 0.4 | | | | | 1:50 | 60 | 19 |
| 0.008 | | 0.08 | | | | | 1:10 | 8 | 5 |
| 0.008 | | 0.016 | | | | | 1:2 | 28 | 8 |
| 1 | | | 1 | | | | 1:1 | 93 | 58 |
| 1 | | | 0.2 | | | | 1:0.2 | 79 | 57 |
| 1 | | | 0.04 | | | | 1:0.04 | 86 | 57 |
| 1 | | | 0.008 | | | | 1:0.008 | 89 | 64 |
| 0.2 | | | 1 | | | | 1:5 | 46 | 2 |
| 0.2 | | | 0.2 | | | | 1:1 | 15 | 0 |
| 0.2 | | | 0.04 | | | | 1:0.2 | 29 | 0 |
| 0.2 | | | 0.008 | | | | 1:0.04 | 19 | 17 |
| 1 | | | | 5 | | | 1:5 | 100 | 100 |
| 1 | | | | 1 | | | 1:1 | 89 | 57 |
| 1 | | | | 0.04 | | | 1:0.04 | 89 | 57 |
| 0.2 | | | | 5 | | | 1:25 | 100 | 100 |
| 0.2 | | | | 1 | | | 1:5 | 36 | 0 |
| 0.2 | | | | 0.04 | | | 1:0.2 | 31 | 0 |
| 0.04 | | | | | 1 | | 1:25 | 50 | 20 |
| 0.04 | | | | | 0.2 | | 1:5 | 16 | 16 |
| 0.04 | | | | | 0.04 | | 1:1 | 12 | 0 |
| 0.008 | | | | | 1 | | 1:125 | 32 | 20 |
| 0.008 | | | | | 0.2 | | 1:25 | 46 | 16 |
| 0.008 | | | | | 0.04 | | 1:5 | 36 | 0 |
| 1 | | | | | | 2 | 1:2 | 100 | 100 |
| 0.2 | | | | | | 2 | 1:10 | 100 | 96 |
| 0.04 | | | | | | 2 | 1:50 | 100 | 95 |
| 0.008 | | | | | | 2 | 1:250 | 100 | 95 |

TABLE E13 in vitro -Test with *Cordana musae*

| (I-338) (ppm) | (3.025) fenpicox-amid (ppm) | (13.001) fludi-oxonil (ppm) | (2.005) fluo-pyram (ppm) | (15.043) fluoxa-piprolin (ppm) | (3.012) fluoxa-strobin (ppm) | (1.062) fluoxy-tiocona-zole (ppm) | Ratio | Efficacy % | Colby expected value % |
|---|---|---|---|---|---|---|---|---|---|
| 1 | | | | | | | | 100 | |
| 0.2 | | | | | | | | 6 | |
| 0.04 | | | | | | | | 0 | |
| 0.008 | | | | | | | | 0 | |
| | 0.2 | | | | | | | 44 | |
| | | 0.20 | | | | | | 0 | |
| | | 0.04 | | | | | | 6 | |
| | | | 4 | | | | | 0 | |
| | | | 0.8 | | | | | 0 | |
| | | | | 20 | | | | 0 | |
| | | | | 0.16 | | | | 28 | |
| | | | | | 0.08 | | | 3 | |
| | | | | | 0.016 | | | 0 | |
| | | | | | | 0.008 | | 4 | |
| 0.2 | 0.2 | | | | | | 1:1 | 59 | 47 |
| 0.04 | 0.2 | | | | | | 1:5 | 55 | 44 |
| 0.008 | 0.2 | | | | | | 1:25 | 50 | 44 |

TABLE E13-continued in vitro -Test with *Cordana musae*

| (I-338) (ppm) | (3.025) fenpicox-amid (ppm) | (13.001) fludi-oxonil (ppm) | (2.005) fluo-pyram (ppm) | (15.043) fluoxa-piprolin (ppm) | (3.012) fluoxa-strobin (ppm) | (1.062) fluoxy-tiocona-zole (ppm) | Ratio | Efficacy % | Colby expected value % |
|---|---|---|---|---|---|---|---|---|---|
| 0.2 | | 0.20 | | | | | 1:1 | 86 | 6 |
| 0.2 | | 0.04 | | | | | 1:0.2 | 28 | 12 |
| 0.008 | | 0.20 | | | | | 1:25 | 27 | 0 |
| 0.008 | | 0.04 | | | | | 1:5 | 26 | 6 |
| 0.04 | | | 4 | | | | 1:100 | 7 | 3 |
| 0.04 | | | 0.8 | | | | 1:20 | 20 | 3 |
| 0.008 | | | 4 | | | | 1:500 | 45 | 0 |
| 0.008 | | | 0.8 | | | | 1:100 | 19 | 0 |
| 1 | | | | 20 | | | 1:20 | 84 | 75 |
| 0.2 | | | | 20 | | | 1:100 | 20 | 12 |
| 0.2 | | | | 0.16 | | | 1:0.8 | 52 | 36 |
| 0.008 | | | | 20 | | | 1:2500 | 20 | 0 |
| 1 | | | | | 0.08 | | 1:0.08 | 99 | 76 |
| 1 | | | | | 0.016 | | 1:0.016 | 96 | 75 |
| 0.2 | | | | | 0.08 | | 1:0.4 | 52 | 15 |
| 0.2 | | | | | 0.016 | | 1:0.08 | 11 | 12 |
| 0.04 | | | | | 0.08 | | 1:2 | 30 | 6 |
| 0.008 | | | | | 0.08 | | 1:10 | 9 | 3 |
| 1 | | | | | | 0.008 | 1:0.008 | 94 | 76 |
| 0.2 | | | | | | 0.008 | 1:0.04 | 20 | 16 |
| 0.04 | | | | | | 0.008 | 1:0.2 | 13 | 7 |

TABLE E14 in vitro -Test with *Cordana musae*

| (I-338) (ppm) | (5.012) folpet (ppm) | (15.012) fosetyl-al (ppm) | (2.028) inpyr-fluxam (ppm) | (2.038) isoflucy-pram (ppm) | (6.002) isotianil (ppm) | (5.013) mancozeb (ppm) | Ratio | Efficacy % | Colby expected value % |
|---|---|---|---|---|---|---|---|---|---|
| 1 | | | | | | | | 85 | |
| 0.2 | | | | | | | | 22 | |
| 0.04 | | | | | | | | 8 | |
| 0.008 | | | | | | | | 4 | |
| | 1 | | | | | | | 62 | |
| | 0.2 | | | | | | | 17 | |
| | 0.04 | | | | | | | 0 | |
| | 0.008 | | | | | | | 0 | |
| | | 0.8 | | | | | | 0 | |
| | | | 0.2 | | | | | 4 | |
| | | | 0.04 | | | | | 0 | |
| | | | 0.008 | | | | | 0 | |
| | | | | 1 | | | | 20 | |
| | | | | 0.2 | | | | 9 | |
| | | | | | 20 | | | 18 | |
| | | | | | 4 | | | 18 | |
| | | | | | 0.8 | | | 9 | |
| | | | | | | 4 | | 19 | |
| | | | | | | 0.16 | | 18 | |
| 1 | 1 | | | | | | 1:1 | 100 | 94 |
| 0.2 | 1 | | | | | | 1:5 | 87 | 70 |
| 0.2 | 0.2 | | | | | | 1:1 | 37 | 36 |
| 0.2 | 0.04 | | | | | | 1:0.2 | 22 | 22 |
| 0.04 | 0.2 | | | | | | 1:5 | 40 | 24 |
| 0.04 | 0.04 | | | | | | 1:1 | 34 | 8 |
| 0.008 | 0.04 | | | | | | 1:5 | 14 | 4 |
| 0.008 | 0.008 | | | | | | 1:1 | 12 | 4 |
| 1 | | 0.8 | | | | | 1:0.8 | 97 | 85 |
| 0.2 | | 0.8 | | | | | 1:4 | 22 | 22 |
| 0.04 | | 0.8 | | | | | 1:20 | 28 | 8 |
| 0.04 | | | 0.2 | | | | 1:5 | 15 | 12 |
| 0.04 | | | 0.04 | | | | 1:1 | 6 | 8 |
| 0.04 | | | 0.008 | | | | 1:0.2 | 38 | 8 |
| 0.008 | | | 0.2 | | | | 1:25 | 12 | 8 |
| 0.008 | | | 0.04 | | | | 1:5 | 35 | 4 |
| 0.008 | | | 0.008 | | | | 1:1 | 10 | 4 |
| 0.2 | | | | 1 | | | 1:5 | 52 | 38 |
| 0.2 | | | | 0.2 | | | 1:1 | 40 | 29 |

TABLE E14-continued in vitro -Test with *Cordana musae*

| (I-338) (ppm) | (5.012) folpet (ppm) | (15.012) fosetyl-al (ppm) | (2.028) inpyrfluxam (ppm) | (2.038) isoflucypram (ppm) | (6.002) isotianil (ppm) | (5.013) mancozeb (ppm) | Ratio | Efficacy % | Colby expected value % |
|---|---|---|---|---|---|---|---|---|---|
| 0.04 | | | | 1 | | | 1:25 | 30 | 26 |
| 0.04 | | | | 0.2 | | | 1:5 | 17 | 16 |
| 1 | | | | | 20 | | 1:20 | 82 | 82 |
| 1 | | | | | 4 | | 1:4 | 90 | 82 |
| 1 | | | | | 0.8 | | 1:0.8 | 90 | 80 |
| 1 | | | | | | 0.16 | 1:0.16 | 93 | 82 |
| 0.2 | | | | | | 4 | 1:20 | 47 | 20 |
| 0.04 | | | | | | 0.16 | 1:4 | 24 | 18 |

TABLE E15 in vitro -Test with *Cordana musae*

| (I-338) (ppm) | (12.004) metalaxyl-m (ppm) | (3.030) metyltetraprole (ppm) | (17.012) Paenibacillus terrae (ppm) | (2.017) penflufen (ppm) | (5.018) propineb (ppm) | (13.004) proquinazid (ppm) | Ratio | Efficacy % | Colby expected value % |
|---|---|---|---|---|---|---|---|---|---|
| 1 | | | | | | | | 78 | |
| 0.2 | | | | | | | | 2 | |
| 0.04 | | | | | | | | 0 | |
| 0.008 | | | | | | | | 1 | |
| | 100 | | | | | | | 16 | |
| | 20 | | | | | | | 8 | |
| | 4 | | | | | | | 9 | |
| | 0.8 | | | | | | | 0 | |
| | | 1 | | | | | | 70 | |
| | | 0.2 | | | | | | 19 | |
| | | 0.04 | | | | | | 0 | |
| | | 0.008 | | | | | | 0 | |
| | | | 200 | | | | | 92 | |
| | | | | 5 | | | | 0 | |
| | | | | 1 | | | | 0 | |
| | | | | 0.2 | | | | 0 | |
| | | | | 0.04 | | | | 0 | |
| | | | | | 20 | | | 37 | |
| | | | | | 0.8 | | | 0 | |
| | | | | | | 10 | | 20 | |
| | | | | | | 2 | | 16 | |
| | | | | | | 0.4 | | 3 | |
| | | | | | | 0.08 | | 5 | |
| 0.2 | 100 | | | | | | 1:500 | 40 | 18 |
| 0.2 | 20 | | | | | | 1:100 | 24 | 10 |
| 0.2 | 4 | | | | | | 1:20 | 11 | 11 |
| 0.2 | 0.8 | | | | | | 1:4 | 5 | 2 |
| 0.04 | | 0.2 | | | | | 1:5 | 32 | 19 |
| 0.04 | | 0.04 | | | | | 1:1 | 1 | 0 |
| 0.04 | | 0.008 | | | | | 1:0.2 | 0 | 0 |
| 0.008 | | 1 | | | | | 1:125 | 73 | 70 |
| 0.008 | | 0.2 | | | | | 1:25 | 18 | 19 |
| 0.008 | | 0.04 | | | | | 1:5 | 38 | 0 |
| 0.008 | | 0.008 | | | | | 1:1 | 0 | 0 |
| 1 | | | 200 | | | | 1:200 | 100 | 97 |
| 0.2 | | | 200 | | | | 1:1000 | 100 | 95 |
| 0.04 | | | 200 | | | | 1:5000 | 100 | 92 |
| 0.008 | | | 200 | | | | 1:25000 | 99 | 92 |
| 1 | | | | 5 | | | 1:5 | 81 | 67 |
| 1 | | | | 1 | | | 1:1 | 74 | 67 |
| 1 | | | | 0.2 | | | 1:0.2 | 71 | 67 |
| 1 | | | | 0.04 | | | 1:0.04 | 78 | 67 |
| 1 | | | | | 20 | | 1:20 | 72 | 62 |
| 1 | | | | | 0.8 | | 1:0.8 | 87 | 40 |
| 0.2 | | | | | 20 | | 1:100 | 51 | 46 |
| 0.2 | | | | | 0.8 | | 1:4 | 20 | 15 |
| 0.04 | | | | | 20 | | 1:500 | 68 | 39 |
| 0.04 | | | | | 0.8 | | 1:20 | 2 | 4 |
| 0.008 | | | | | 20 | | 1:2500 | 67 | 37 |
| 0.008 | | | | | 0.8 | | 1:100 | 0 | 0 |
| 1 | | | | | | 10 | 1:10 | 66 | 51 |

TABLE E15-continued in vitro -Test with *Cordana musae*

| (I-338) (ppm) | (12.004) meta-laxyl-m (ppm) | (3.030) metyl-tetra-prole (ppm) | (17.012) Paeni-bacillus terrae (ppm) | (2.017) pen-flufen (ppm) | (5.018) pro-pineb (ppm) | (13.004) pro-quinazid (ppm) | Ratio | Efficacy % | Colby expected value % |
|---|---|---|---|---|---|---|---|---|---|
| 1 | | | | | | 2 | 1:2 | 62 | 49 |
| 1 | | | | | | 0.4 | 1:0.4 | 50 | 41 |
| 1 | | | | | | 0.08 | 1:0.08 | 74 | 43 |

TABLE E16 in vitro -Test with *Cordana musae*

| (I-338) (ppm) | (1.018) prothio-conazole (ppm) | (7.005) pyri-methanil (ppm) | (13.005) quinoxy-fen (ppm) | (1.021) tebu-conazole (ppm) | Ratio | Efficacy % | Colby expected value % |
|---|---|---|---|---|---|---|---|
| 1 | | | | | | 40 | |
| 0.2 | | | | | | 15 | |
| 0.04 | | | | | | 4 | |
| 0.008 | | | | | | 0 | |
| | 0.004 | | | | | 0 | |
| | | 20 | | | | 22 | |
| | | 4 | | | | 30 | |
| | | 0.16 | | | | 17 | |
| | | | 10 | | | 2 | |
| | | | 0.4 | | | 0 | |
| | | | 0.08 | | | 0 | |
| | | | | 1 | | 71 | |
| | | | | 0.2 | | 25 | |
| | | | | 0.04 | | 2 | |
| 1 | 0.004 | | | | 1:0.004 | 58 | 40 |
| 0.04 | 0.004 | | | | 1:0.1 | 27 | 4 |
| 0.008 | 0.004 | | | | 1:0.5 | 4 | 0 |
| 1 | | 20 | | | 1:20 | 99 | 53 |
| 1 | | 4 | | | 1:4 | 85 | 58 |
| 1 | | 0.16 | | | 1:0.16 | 50 | 50 |
| 0.04 | | | 10 | | 1:250 | 30 | 13 |
| 0.04 | | | 0.4 | | 1:10 | 10 | 11 |
| 0.04 | | | 0.08 | | 1:2 | 18 | 11 |
| 0.2 | | | | 1 | 1:5 | 93 | 80 |
| 0.04 | | | | 1 | 1:25 | 80 | 74 |
| 0.04 | | | | 0.2 | 1:5 | 51 | 33 |
| 0.04 | | | | 0.04 | 1:1 | 21 | 13 |

TABLE F2 in vitro -Test with *Diaporthe citri*

| (I-052) (ppm) | (7.005) pyrime-thanil (ppm) | (2.028) inpyr-fluxam (ppm) | (3.020) trifloxy -strobin (ppm) | (1.055) mefen-triflu-conazole (ppm) | (5.003) captan (ppm) | (5.013) man-cozeb (ppm) | Ratio | Effi-cacy % | Colby expected value % |
|---|---|---|---|---|---|---|---|---|---|
| 0.1 | | | | | | | | 100 | |
| 0.02 | | | | | | | | 100 | |
| 0.004 | | | | | | | | 0 | |
| 0.0008 | | | | | | | | 0 | |
| | 20.0 | | | | | | | 100 | |
| | 4.0 | | | | | | | 97 | |
| | 0.8 | | | | | | | 0 | |
| | 0.16 | | | | | | | 0 | |
| | | 1.0 | | | | | | 95 | |
| | | 0.2 | | | | | | 47 | |
| | | 0.04 | | | | | | 2 | |
| | | 0.008 | | | | | | 0 | |
| | | | 1.0 | | | | | 96 | |
| | | | 0.2 | | | | | 95 | |

TABLE F2-continued in vitro -Test with *Diaporthe citri*

| (I-052) (ppm) | (7.005) pyrime-thanil (ppm) | (2.028) inpyr-fluxam (ppm) | (3.020) trifloxy -strobin (ppm) | (1.055) mefen-triflu-conazole (ppm) | (5.003) captan (ppm) | (5.013) man-cozeb (ppm) | Ratio | Effi-cacy % | Colby expected value % |
|---|---|---|---|---|---|---|---|---|---|
| | | | 0.04 | | | | | 95 | |
| | | | 0.008 | | | | | 63 | |
| | | | | 1.0 | | | | 100 | |
| | | | | 0.2 | | | | 99 | |
| | | | | 0.04 | | | | 69 | |
| | | | | 0.008 | | | | 17 | |
| | | | | | 4.0 | | | 88 | |
| | | | | | 0.8 | | | 24 | |
| | | | | | 0.16 | | | 83 | |
| | | | | | | 10.0 | | 100 | |
| | | | | | | 2.0 | | 46 | |
| | | | | | | 0.4 | | 0 | |
| | | | | | | 0.08 | | 2 | |
| 0.02 | 20.0 | | | | | | 1:5000 | 100 | 100 |
| 0.02 | 4.0 | | | | | | 1:1000 | 97 | 97 |
| 0.02 | 0.8 | | | | | | 1:200 | 21 | 0 |
| 0.02 | 0.16 | | | | | | 1:40 | 2 | 0 |
| 0.004 | | 1.0 | | | | | 1:250 | 94 | 95 |
| 0.004 | | 0.2 | | | | | 1:50 | 65 | 47 |
| 0.004 | | 0.04 | | | | | 1:10 | 18 | 2 |
| 0.004 | | 0.008 | | | | | 1:2 | 10 | 0 |
| 0.004 | | | 1.0 | | | | 1:250 | 99 | 96 |
| 0.004 | | | 0.2 | | | | 1:50 | 95 | 96 |
| 0.004 | | | 0.04 | | | | 1:10 | 94 | 96 |
| 0.004 | | | 0.008 | | | | 1:2 | 80 | 67 |
| 0.0008 | | | 1.0 | | | | 1:1250 | 97 | 96 |
| 0.0008 | | | 0.2 | | | | 1:250 | 94 | 95 |
| 0.0008 | | | 0.04 | | | | 1:50 | 93 | 95 |
| 0.0008 | | | 0.008 | | | | 1:10 | 78 | 63 |
| 0.0008 | | | | 1.0 | | | 1:1250 | 100 | 100 |
| 0.0008 | | | | 0.2 | | | 1:250 | 100 | 100 |
| 0.0008 | | | | 0.04 | | | 1:50 | 83 | 71 |
| 0.0008 | | | | 0.008 | | | 1:10 | 2 | 23 |
| 0.004 | | | | | 4.0 | | 1:1000 | 100 | 88 |
| 0.004 | | | | | 0.8 | | 1:200 | 71 | 24 |
| 0.004 | | | | | 0.16 | | 1:40 | 98 | 83 |
| 0.0008 | | | | | 4.0 | | 1:5000 | 100 | 91 |
| 0.0008 | | | | | 0.8 | | 1:1000 | 72 | 48 |
| 0.0008 | | | | | 0.16 | | 1:200 | 99 | 88 |
| 0.0008 | | | | | | 10.0 | 1:12500 | 100 | 100 |
| 0.0008 | | | | | | 2.0 | 1:2500 | 65 | 47 |
| 0.0008 | | | | | | 0.4 | 1:500 | 0 | 3 |
| 0.0008 | | | | | | 0.08 | 1:100 | 0 | 5 |

TABLE F3 in vitro - Test with *Diaporthe citri*

| (I-052) (ppm) | (5.018) propineb (ppm) | (6.002) isotianil (ppm) | (17.001) *Bacillus subtilis* (ppm) | (17.012) *Paenibacillus terrae* (ppm) | Ratio | Efficacy % | Colby expected value % |
|---|---|---|---|---|---|---|---|
| 0.1 | | | | | | 100 | |
| 0.02 | | | | | | 100 | |
| 0.004 | | | | | | 0 | |
| 0.0008 | | | | | | 0 | |
| | 100.0 | | | | | 100 | |
| | 20.0 | | | | | 99 | |
| | 4.0 | | | | | 18 | |
| | 0.8 | | | | | 5 | |
| | | 100.0 | | | | 18 | |
| | | 20.0 | | | | 14 | |
| | | 4.0 | | | | 12 | |
| | | 0.8 | | | | 0 | |
| | | | 200.0 | | | 0 | |
| | | | 40.0 | | | 4 | |
| | | | 8.0 | | | 0 | |
| | | | 1.6 | | | 0 | |

TABLE F3-continued in vitro - Test with *Diaporthe citri*

| (I-052) (ppm) | (5.018) propineb (ppm) | (6.002) isotianil (ppm) | (17.001) *Bacillus subtilis* (ppm) | (17.012) *Paenibacillus terrae* (ppm) | Ratio | Efficacy % | Colby expected value % |
|---|---|---|---|---|---|---|---|
| | | | | 200.0 | | 99 | |
| | | | | 40.0 | | 0 | |
| | | | | 8.0 | | 0 | |
| | | | | 1.6 | | 0 | |
| 0.0008 | 100.0 | | | | 1:125000 | 100 | 100 |
| 0.0008 | 20.0 | | | | 1:25000 | 100 | 99 |
| 0.0008 | 4.0 | | | | 1:5000 | 41 | 20 |
| 0.0008 | 0.8 | | | | 1:1000 | 5 | 8 |
| 0.004 | | 100.0 | | | 1:25000 | 12 | 18 |
| 0.004 | | 20.0 | | | 1:5000 | 32 | 14 |
| 0.004 | | 4.0 | | | 1:1000 | 20 | 12 |
| 0.004 | | 0.8 | | | 1:200 | 21 | 0 |
| 0.004 | | | 200.0 | | 1:50000 | 17 | 0 |
| 0.004 | | | 40.0 | | 1:10000 | 0 | 4 |
| 0.004 | | | 8.0 | | 1:2000 | 0 | 0 |
| 0.004 | | | 1.6 | | 1:400 | 0 | 0 |
| 0.004 | | | | 200.0 | 1:50000 | 99 | 99 |
| 0.004 | | | | 40.0 | 1:10000 | 18 | 0 |
| 0.004 | | | | 8.0 | 1:2000 | 18 | 0 |
| 0.004 | | | | 1.6 | 1:400 | 0 | 0 |

TABLE F4 in vitro - Test with *Diaporthe citri*

| (I-300) (ppm) | (7.005) pyrimethanil (ppm) | (2.002) bixafen (ppm) | (2.005) fluopyram (ppm) | (2.028) inpyrfluxam (ppm) | (2.038) isoflucypram (ppm) | (3.025) fenpicoxamid (ppm) | Ratio | Efficacy % | Colby expected value % |
|---|---|---|---|---|---|---|---|---|---|
| 0.1 | | | | | | | | 44 | |
| 0.02 | | | | | | | | 22 | |
| 0.004 | | | | | | | | 10 | |
| 0.0008 | | | | | | | | 0 | |
| | 4.0 | | | | | | | 97 | |
| | 0.8 | | | | | | | 30 | |
| | 0.16 | | | | | | | 2 | |
| | | 1.0 | | | | | | 0 | |
| | | 0.2 | | | | | | 0 | |
| | | 0.04 | | | | | | 8 | |
| | | 0.008 | | | | | | 0 | |
| | | | 20.0 | | | | | 10 | |
| | | | 4.0 | | | | | 15 | |
| | | | 0.8 | | | | | 1 | |
| | | | 0.16 | | | | | 25 | |
| | | | | 1.0 | | | | 96 | |
| | | | | 0.2 | | | | 49 | |
| | | | | 0.04 | | | | 14 | |
| | | | | 0.008 | | | | 6 | |
| | | | | | 1.0 | | | 30 | |
| | | | | | 0.2 | | | 0 | |
| | | | | | 0.008 | | | 0 | |
| | | | | | | 5.0 | | 92 | |
| | | | | | | 1.0 | | 79 | |
| | | | | | | 0.2 | | 53 | |
| 0.1 | 4.0 | | | | | | 1:40 | 100 | 97 |
| 0.1 | 0.8 | | | | | | 1:8 | 100 | 30 |
| 0.1 | 0.16 | | | | | | 1:1.6 | 57 | 2 |
| 0.1 | | 1.0 | | | | | 1:10 | 97 | 0 |
| 0.1 | | 0.2 | | | | | 1:2 | 100 | 0 |
| 0.1 | | 0.04 | | | | | 1:0.4 | 100 | 8 |
| 0.1 | | 0.008 | | | | | 1:0.08 | 99 | 0 |
| 0.1 | | | 20.0 | | | | 1:200 | 97 | 10 |
| 0.1 | | | 4.0 | | | | 1:40 | 88 | 15 |
| 0.1 | | | 0.8 | | | | 1:8 | 76 | 1 |
| 0.1 | | | 0.16 | | | | 1:1.6 | 81 | 25 |
| 0.1 | | | | 1.0 | | | 1:10 | 99 | 96 |
| 0.1 | | | | 0.2 | | | 1:2 | 79 | 49 |
| 0.1 | | | | 0.04 | | | 1:0.4 | 70 | 14 |
| 0.1 | | | | 0.008 | | | 1:0.08 | 57 | 6 |
| 0.1 | | | | | 1.0 | | 1:10 | 82 | 55 |

TABLE F4-continued

| in vitro - Test with *Diaporthe citri* | | | | | | | | | |
|---|---|---|---|---|---|---|---|---|---|
| (I-300) (ppm) | (7.005) pyrimethanil (ppm) | (2.002) bixafen (ppm) | (2.005) fluopyram (ppm) | (2.028) inpyrfluxam (ppm) | (2.038) isoflucypram (ppm) | (3.025) fenpicoxamid (ppm) | Ratio | Efficacy % | Colby expected value % |
| 0.1 | | | | | 0.2 | | 1:2 | 51 | 35 |
| 0.1 | | | | | 0.008 | | 1:0.08 | 46 | 35 |
| 0.02 | | | | | 1.0 | | 1:50 | 36 | 31 |
| 0.02 | | | | | 0.2 | | 1:10 | 5 | 2 |
| 0.02 | | | | | 0.008 | | 1:0.4 | 12 | 2 |
| 0.1 | | | | | | 5.0 | 1:50 | 96 | 95 |
| 0.1 | | | | | | 1.0 | 1:10 | 100 | 86 |
| 0.1 | | | | | | 0.2 | 1:2 | 87 | 69 |
| 0.02 | | | | | | 5.0 | 1:250 | 93 | 92 |
| 0.02 | | | | | | 1.0 | 1:50 | 77 | 79 |
| 0.02 | | | | | | 0.2 | 1:10 | 65 | 53 |
| 0.0008 | | | | | | 5.0 | 1:6250 | 92 | 93 |
| 0.0008 | | | | | | 1.0 | 1:1250 | 83 | 81 |
| 0.0008 | | | | | | 0.2 | 1:250 | 66 | 58 |

TABLE F5

| in vitro - Test with *Diaporthe citri* | | | | | | | | | |
|---|---|---|---|---|---|---|---|---|---|
| (I-300) (ppm) | (3.020) trifloxystrobin (ppm) | (1.002) difeno-conazole (ppm) | (1.055) mefentrifluconazole (ppm) | (1.018) prothioconazole (ppm) | (1.021) tebuconazole (ppm) | (1.020) spiroxamine (ppm) | Ratio | Efficacy % | Colby expected value % |
| 0.1 | | | | | | | | 44 | |
| 0.02 | | | | | | | | 22 | |
| 0.004 | | | | | | | | 10 | |
| 0.0008 | | | | | | | | 0 | |
| | 0.04 | | | | | | | 95 | |
| | 0.008 | | | | | | | 65 | |
| | | 1.0 | | | | | | 86 | |
| | | 0.2 | | | | | | 26 | |
| | | 0.008 | | | | | | 0 | |
| | | | 1.0 | | | | | 100 | |
| | | | 0.2 | | | | | 100 | |
| | | | 0.04 | | | | | 60 | |
| | | | 0.008 | | | | | 0 | |
| | | | | 1.0 | | | | 99 | |
| | | | | 0.2 | | | | 100 | |
| | | | | 0.04 | | | | 95 | |
| | | | | 0.008 | | | | 0 | |
| | | | | | 1.0 | | | 98 | |
| | | | | | 0.2 | | | 89 | |
| | | | | | 0.008 | | | 0 | |
| | | | | | | 4.0 | | 8 | |
| | | | | | | 0.8 | | 6 | |
| | | | | | | 0.16 | | 0 | |
| 0.1 | 0.04 | | | | | | 1:0.4 | 93 | 97 |
| 0.1 | 0.008 | | | | | | 1:0.08 | 93 | 77 |
| 0.02 | 0.04 | | | | | | 1:2 | 96 | 95 |
| 0.02 | 0.008 | | | | | | 1:0.4 | 93 | 65 |
| 0.004 | 0.04 | | | | | | 1:10 | 96 | 97 |
| 0.004 | 0.008 | | | | | | 1:2 | 88 | 78 |
| 0.0008 | 0.04 | | | | | | 1:50 | 98 | 95 |
| 0.0008 | 0.008 | | | | | | 1:10 | 85 | 69 |
| 0.1 | | 1.0 | | | | | 1:10 | 100 | 91 |
| 0.1 | | 0.2 | | | | | 1:2 | 77 | 51 |
| 0.1 | | 0.008 | | | | | 1:0.08 | 0 | 48 |
| 0.02 | | 1.0 | | | | | 1:50 | 98 | 35 |
| 0.02 | | 0.2 | | | | | 1:10 | 91 | 87 |
| 0.02 | | 0.008 | | | | | 1:0.4 | 0 | 2 |
| 0.1 | | | 1.0 | | | | 1:10 | 100 | 100 |
| 0.1 | | | 0.2 | | | | 1:2 | 99 | 100 |
| 0.1 | | | 0.04 | | | | 1:0.4 | 83 | 60 |
| 0.1 | | | 0.008 | | | | 1:0.08 | 67 | 0 |
| 0.02 | | | 1.0 | | | | 1:50 | 100 | 100 |
| 0.02 | | | 0.2 | | | | 1:10 | 100 | 100 |
| 0.02 | | | 0.04 | | | | 1:2 | 66 | 60 |
| 0.02 | | | 0.008 | | | | 1:0.4 | 0 | 0 |
| 0.0008 | | | 1.0 | | | | 1:1250 | 99 | 100 |

TABLE F5-continued in vitro - Test with *Diaporthe citri*

| (I-300) (ppm) | (3.020) trifloxystrobin (ppm) | (1.002) difeno-conazole (ppm) | (1.055) mefentrifluconazole (ppm) | (1.018) prothioconazole (ppm) | (1.021) tebuconazole (ppm) | (1.020) spiroxamine (ppm) | Ratio | Efficacy % | Colby expected value % |
|---|---|---|---|---|---|---|---|---|---|
| 0.0008 | | | 0.2 | | | | 1:250 | 100 | 100 |
| 0.0008 | | | 0.04 | | | | 1:50 | 93 | 63 |
| 0.0008 | | | 0.008 | | | | 1:10 | 0 | 6 |
| 0.0008 | | | | 1.0 | | | 1:1250 | 100 | 99 |
| 0.0008 | | | | 0.2 | | | 1:250 | 99 | 100 |
| 0.0008 | | | | 0.04 | | | 1:50 | 100 | 96 |
| 0.0008 | | | | 0.008 | | | 1:10 | 0 | 6 |
| 0.1 | | | | | 1.0 | | 1:10 | 100 | 98 |
| 0.1 | | | | | 0.2 | | 1:2 | 89 | 89 |
| 0.1 | | | | | 0.008 | | 1:0.08 | 16 | 0 |
| 0.02 | | | | | 1.0 | | 1:50 | 98 | 98 |
| 0.02 | | | | | 0.2 | | 1:10 | 95 | 89 |
| 0.02 | | | | | 0.008 | | 1:0.4 | 0 | 0 |
| 0.004 | | | | | 1.0 | | 1:250 | 98 | 98 |
| 0.004 | | | | | 0.2 | | 1:50 | 89 | 89 |
| 0.004 | | | | | 0.008 | | 1:2 | 0 | 0 |
| 0.0008 | | | | | 1.0 | | 1:1250 | 98 | 98 |
| 0.0008 | | | | | 0.2 | | 1:250 | 94 | 90 |
| 0.0008 | | | | | 0.008 | | 1:10 | 0 | 6 |
| 0.1 | | | | | | 4.0 | 1:40 | 94 | 49 |
| 0.1 | | | | | | 0.8 | 1:8 | 92 | 47 |
| 0.1 | | | | | | 0.16 | 1:1.6 | 63 | 44 |

TABLE F5 in vitro - Test with *Diaporthe citri*

| (I-300) (ppm) | (15.064) (ppm) | (13.001) fludio-xonil (ppm) | (13.004) pro-quinazid (ppm) | (13.005) quino-xyfen (ppm) | (5.003) captan (ppm) | (5.010) dithia-non (ppm) | Ratio | Efficacy % | Colby expected value % |
|---|---|---|---|---|---|---|---|---|---|
| 0.1 | | | | | | | | 44 | |
| 0.02 | | | | | | | | 22 | |
| 0.004 | | | | | | | | 10 | |
| 0.0008 | | | | | | | | 0 | |
| | 2.0 | | | | | | | 0 | |
| | 0.4 | | | | | | | 8 | |
| | 0.08 | | | | | | | 13 | |
| | | 5.0 | | | | | | 57 | |
| | | 1.0 | | | | | | 15 | |
| | | 0.2 | | | | | | 0 | |
| | | | 10.0 | | | | | 21 | |
| | | | 0.4 | | | | | 0 | |
| | | | 0.08 | | | | | 16 | |
| | | | | 10.0 | | | | 41 | |
| | | | | 2.0 | | | | 0 | |
| | | | | 0.4 | | | | 15 | |
| | | | | | 4.0 | | | 99 | |
| | | | | | 0.8 | | | 9 | |
| | | | | | 0.16 | | | 88 | |
| | | | | | | 20.0 | | 98 | |
| | | | | | | 4.0 | | 98 | |
| | | | | | | 0.8 | | 17 | |
| | | | | | | 0.16 | | 0 | |
| 0.1 | 2.0 | | | | | | 1:20 | 100 | 44 |
| 0.1 | 0.4 | | | | | | 1:4 | 100 | 49 |
| 0.1 | 0.08 | | | | | | 1:0.8 | 100 | 51 |
| 0.0008 | 2.0 | | | | | | 1:2500 | 4 | 0 |
| 0.0008 | 0.4 | | | | | | 1:500 | 34 | 8 |
| 0.0008 | 0.08 | | | | | | 1:100 | 15 | 13 |
| 0.1 | | 5.0 | | | | | 1:50 | 96 | 76 |
| 0.1 | | 1.0 | | | | | 1:10 | 93 | 53 |
| 0.1 | | 0.2 | | | | | 1:2 | 86 | 44 |
| 0.1 | | | 10.0 | | | | 1:100 | 100 | 56 |
| 0.1 | | | 0.4 | | | | 1:4 | 73 | 44 |
| 0.1 | | | 0.08 | | | | 1:0.8 | 87 | 53 |
| 0.1 | | | | 10.0 | | | 1:100 | 89 | 41 |
| 0.1 | | | | 2.0 | | | 1:20 | 49 | 0 |
| 0.1 | | | | 0.4 | | | 1:4 | 59 | 15 |

TABLE F5-continued in vitro - Test with *Diaporthe citri*

| (I-300) (ppm) | (15.064) (ppm) | (13.001) fludio-xonil (ppm) | (13.004) pro-quinazid (ppm) | (13.005) quino-xyfen (ppm) | (5.003) captan (ppm) | (5.010) dithia-non (ppm) | Ratio | Efficacy % | Colby expected value % |
|---|---|---|---|---|---|---|---|---|---|
| 0.02 | | | | 10.0 | | | 1:500 | 35 | 41 |
| 0.02 | | | | 2.0 | | | 1:100 | 33 | 0 |
| 0.02 | | | | 0.4 | | | 1:20 | 17 | 15 |
| 0.1 | | | | | 4.0 | | 1:40 | 100 | 99 |
| 0.1 | | | | | 0.8 | | 1:8 | 99 | 9 |
| 0.1 | | | | | 0.16 | | 1:1.6 | 97 | 88 |
| 0.02 | | | | | 4.0 | | 1:200 | 100 | 99 |
| 0.02 | | | | | 0.8 | | 1:40 | 20 | 9 |
| 0.02 | | | | | 0.16 | | 1:8 | 100 | 88 |
| 0.004 | | | | | 4.0 | | 1:1000 | 99 | 100 |
| 0.004 | | | | | 0.8 | | 1:200 | 27 | 32 |
| 0.004 | | | | | 0.16 | | 1:40 | 99 | 91 |
| 0.1 | | | | | | 20.0 | 1:200 | 99 | 98 |
| 0.1 | | | | | | 4.0 | 1:40 | 98 | 98 |
| 0.1 | | | | | | 0.8 | 1:8 | 86 | 17 |
| 0.1 | | | | | | 0.16 | 1:1.6 | 13 | 0 |

TABLE F6 in vitro - Test with *Diaporthe citri*

| (I-300) (ppm) | (5.012) folpet (ppm) | (5.018) pro-pineb (ppm) | (15.016) metra-fenone (ppm) | (6.002) isotianil (ppm) | (17.001) *Bacillus subtilis* (ppm) | Ratio | Efficacy % | Colby expected value % |
|---|---|---|---|---|---|---|---|---|
| 0.1 | | | | | | | 44 | |
| 0.02 | | | | | | | 22 | |
| 0.004 | | | | | | | 10 | |
| 0.0008 | | | | | | | 0 | |
| | 10.0 | | | | | | 98 | |
| | 2.0 | | | | | | 99 | |
| | 0.4 | | | | | | 56 | |
| | 0.08 | | | | | | 1 | |
| | | 100.0 | | | | | 88 | |
| | | 20.0 | | | | | 100 | |
| | | 4.0 | | | | | 100 | |
| | | 0.8 | | | | | 1 | |
| | | | 20.0 | | | | 0 | |
| | | | 4.0 | | | | 10 | |
| | | | 0.8 | | | | 0 | |
| | | | 0.16 | | | | 0 | |
| | | | | 100.0 | | | 16 | |
| | | | | 20.0 | | | 15 | |
| | | | | 4.0 | | | 5 | |
| | | | | 0.8 | | | 29 | |
| | | | | | 200.0 | | 0 | |
| | | | | | 40.0 | | 5 | |
| | | | | | 8.0 | | 7 | |
| | | | | | 1.6 | | 0 | |
| 0.1 | 10.0 | | | | | 1:100 | 100 | 98 |
| 0.1 | 2.0 | | | | | 1:20 | 99 | 99 |
| 0.1 | 0.4 | | | | | 1:4 | 99 | 56 |
| 0.1 | 0.08 | | | | | 1:0.8 | 0 | 1 |
| 0.02 | 10.0 | | | | | 1:500 | 97 | 98 |
| 0.02 | 2.0 | | | | | 1:100 | 99 | 99 |
| 0.02 | 0.4 | | | | | 1:20 | 72 | 56 |
| 0.02 | 0.08 | | | | | 1:4 | 14 | 1 |
| 0.1 | | 100.0 | | | | 1:1000 | 100 | 90 |
| 0.1 | | 20.0 | | | | 1:200 | 96 | 100 |
| 0.1 | | 4.0 | | | | 1:40 | 100 | 100 |
| 0.1 | | 0.8 | | | | 1:8 | 45 | 15 |
| 0.02 | | 100.0 | | | | 1:5000 | 100 | 88 |
| 0.02 | | 20.0 | | | | 1:1000 | 100 | 100 |
| 0.02 | | 4.0 | | | | 1:200 | 100 | 100 |
| 0.02 | | 0.8 | | | | 1:40 | 52 | 1 |
| 0.004 | | 100.0 | | | | 1:25000 | 95 | 88 |
| 0.004 | | 20.0 | | | | 1:5000 | 100 | 100 |
| 0.004 | | 4.0 | | | | 1:1000 | 100 | 100 |
| 0.004 | | 0.8 | | | | 1:200 | 6 | 1 |

TABLE F6-continued in vitro - Test with *Diaporthe citri*

| (I-300) (ppm) | (5.012) folpet (ppm) | (5.018) pro-pineb (ppm) | (15.016) metra-fenone (ppm) | (6.002) isotianil (ppm) | (17.001) *Bacillus subtilis* (ppm) | Ratio | Efficacy % | Colby expected value % |
|---|---|---|---|---|---|---|---|---|
| 0.0008 | | 100.0 | | | | 1:125000 | 100 | 91 |
| 0.0008 | | 20.0 | | | | 1:25000 | 100 | 100 |
| 0.0008 | | 4.0 | | | | 1:5000 | 100 | 100 |
| 0.0008 | | 0.8 | | | | 1:1000 | 35 | 20 |
| 0.1 | | | 20.0 | | | 1:200 | 78 | 14 |
| 0.1 | | | 4.0 | | | 1:40 | 71 | 22 |
| 0.1 | | | 0.8 | | | 1:8 | 80 | 14 |
| 0.1 | | | 0.16 | | | 1:1.6 | 56 | 14 |
| 0.02 | | | 20.0 | | | 1:1000 | 0 | 0 |
| 0.02 | | | 4.0 | | | 1:200 | 20 | 10 |
| 0.02 | | | 0.8 | | | 1:40 | 0 | 0 |
| 0.02 | | | 0.16 | | | 1:8 | 0 | 0 |
| 0.1 | | | | 100.0 | | 1:1000 | 76 | 16 |
| 0.1 | | | | 20.0 | | 1:200 | 84 | 15 |
| 0.1 | | | | 4.0 | | 1:40 | 77 | 5 |
| 0.1 | | | | 0.8 | | 1:8 | 52 | 29 |
| 0.1 | | | | | 200.0 | 1:2000 | 96 | 0 |
| 0.1 | | | | | 40.0 | 1:400 | 100 | 5 |
| 0.1 | | | | | 8.0 | 1:80 | 100 | 7 |
| 0.1 | | | | | 1.6 | 1:16 | 99 | 0 |

TABLE F7 in vitro - Test with Diaporthe citri

| (I-300) (ppm) | (17.012) *Paenibacillus terrae* (ppm) | (18.001) FLIPPER (ppm) | (5.013) mancozeb (ppm) | (15.012) fosetyl-aluminium (ppm) | Ratio | Efficacy % | Colby expected value % |
|---|---|---|---|---|---|---|---|
| 0.1 | | | | | | 44 | |
| 0.02 | | | | | | 22 | |
| 0.004 | | | | | | 10 | |
| 0.0008 | | | | | | 0 | |
| | 200.0 | | | | | 99 | |
| | 40.0 | | | | | 0 | |
| | 8.0 | | | | | 0 | |
| | 1.6 | | | | | 18 | |
| | | 200.0 | | | | 0 | |
| | | 40.0 | | | | 6 | |
| | | 8.0 | | | | 1 | |
| | | 1.6 | | | | 1 | |
| | | | 10.0 | | | 100 | |
| | | | 2.0 | | | 100 | |
| | | | 0.4 | | | 21 | |
| | | | 0.08 | | | 6 | |
| | | | | 100.0 | | 30 | |
| | | | | 4.0 | | 23 | |
| | | | | 0.8 | | 0 | |
| 0.1 | 200.0 | | | | 1:2000 | 99 | 99 |
| 0.1 | 40.0 | | | | 1:400 | 51 | 0 |
| 0.1 | 8.0 | | | | 1:80 | 66 | 0 |
| 0.1 | 1.6 | | | | 1:16 | 29 | 18 |
| 0.1 | | 200.0 | | | 1:2000 | 55 | 0 |
| 0.1 | | 40.0 | | | 1:400 | 96 | 6 |
| 0.1 | | 8.0 | | | 1:80 | 70 | 1 |
| 0.1 | | 1.6 | | | 1:16 | 42 | 1 |
| 0.1 | | | 10.0 | | 1:100 | 100 | 100 |
| 0.1 | | | 2.0 | | 1:20 | 94 | 100 |
| 0.1 | | | 0.4 | | 1:4 | 44 | 32 |
| 0.1 | | | 0.08 | | 1:0.8 | 84 | 19 |
| 0.1 | | | | 100.0 | 1:1000 | 94 | 39 |
| 0.1 | | | | 4.0 | 1:200 | 80 | 33 |
| 0.1 | | | | 0.8 | 1:40 | 33 | 14 |

TABLE F8 in vitro - Test with *Diaporthe citri*

| (I-302) (ppm) | (7.005) pyrime-thanil (ppm) | (2.002) bixafen (ppm) | (2.005) fluo-pyram (ppm) | (2.028) inpyr-fluxam (ppm) | (2.038) isoflu-cypram (ppm) | (3.025) fenpi-coxamid (ppm) | Ratio | Efficacy % | Colby expected value % |
|---|---|---|---|---|---|---|---|---|---|
| 0.1 | | | | | | | | 20 | |
| 0.02 | | | | | | | | 0 | |
| 0.004 | | | | | | | | 1 | |
| 0.0008 | | | | | | | | 0 | |
| | 20.0 | | | | | | | 100 | |
| | 4.0 | | | | | | | 97 | |
| | 0.8 | | | | | | | 0 | |
| | 0.16 | | | | | | | 0 | |
| | | 1.0 | | | | | | 5 | |
| | | 0.2 | | | | | | 5 | |
| | | 0.04 | | | | | | 21 | |
| | | 0.008 | | | | | | 15 | |
| | | | 20.0 | | | | | 22 | |
| | | | 4.0 | | | | | 20 | |
| | | | 0.8 | | | | | 0 | |
| | | | 0.16 | | | | | 0 | |
| | | | | 1.0 | | | | 96 | |
| | | | | 0.2 | | | | 52 | |
| | | | | 0.04 | | | | 9 | |
| | | | | 0.008 | | | | 0 | |
| | | | | | 1.0 | | | 38 | |
| | | | | | 0.2 | | | 29 | |
| | | | | | 0.04 | | | 0 | |
| | | | | | 0.008 | | | 0 | |
| | | | | | | 1.0 | | 66 | |
| | | | | | | 0.2 | | 0 | |
| | | | | | | 0.04 | | 3 | |
| 0.1 | 20.0 | | | | | | 1:200 | 100 | 100 |
| 0.1 | 4.0 | | | | | | 1:40 | 100 | 97 |
| 0.1 | 0.8 | | | | | | 1:8 | 100 | 0 |
| 0.1 | 0.16 | | | | | | 1:1.6 | 99 | 0 |
| 0.1 | | 1.0 | | | | | 1:10 | 98 | 5 |
| 0.1 | | 0.2 | | | | | 1:2 | 100 | 5 |
| 0.1 | | 0.04 | | | | | 1:0.4 | 100 | 21 |
| 0.1 | | 0.008 | | | | | 1:0.08 | 91 | 15 |
| 0.1 | | | 20.0 | | | | 1:200 | 100 | 22 |
| 0.1 | | | 4.0 | | | | 1:40 | 83 | 20 |
| 0.1 | | | 0.8 | | | | 1:8 | 79 | 0 |
| 0.1 | | | 0.16 | | | | 1:1.6 | 91 | 0 |
| 0.1 | | | | 1.0 | | | 1:10 | 96 | 96 |
| 0.1 | | | | 0.2 | | | 1:2 | 88 | 52 |
| 0.1 | | | | 0.04 | | | 1:0.4 | 86 | 9 |
| 0.1 | | | | 0.008 | | | 1:0.08 | 86 | 0 |
| 0.1 | | | | | 1.0 | | 1:10 | 78 | 38 |
| 0.1 | | | | | 0.2 | | 1:2 | 84 | 29 |
| 0.1 | | | | | 0.04 | | 1:0.4 | 52 | 1 |
| 0.1 | | | | | 0.008 | | 1:0.08 | 80 | 1 |
| 0.1 | | | | | | 1.0 | 1:10 | 100 | 66 |
| 0.1 | | | | | | 0.2 | 1:2 | 99 | 1 |
| 0.1 | | | | | | 0.04 | 1:0.4 | 87 | 3 |

TABLE F9 in vitro - Test with *Diaporthe citri*

| (I-302) (ppm) | (1.002) difeno-cona-zole (ppm) | (1.055) mefen-triflu-cona-zole (ppm) | (1.021) tebu-cona-zole (ppm) | (1.020) spiro-xamine (ppm) | (15.064) (ppm) | (13.001) fludio-xonil (ppm) | Ratio | Efficacy % | Colby expected value % |
|---|---|---|---|---|---|---|---|---|---|
| 0.1 | | | | | | | | 20 | |
| 0.02 | | | | | | | | 0 | |
| 0.004 | | | | | | | | 1 | |
| 0.0008 | | | | | | | | 0 | |
| | 1.0 | | | | | | | 1.0 | |
| | 0.2 | | | | | | | 0.2 | |
| | 0.04 | | | | | | | 0.04 | |
| | 0.008 | | | | | | | 0.008 | |

TABLE F9-continued in vitro - Test with *Diaporthe citri*

| (I-302) (ppm) | (1.002) difeno-cona-zole (ppm) | (1.055) mefen-triflu-cona-zole (ppm) | (1.021) tebu-cona-zole (ppm) | (1.020) spiro-xamine (ppm) | (15.064) (ppm) | (13.001) fludio-xonil (ppm) | Ratio | Efficacy % | Colby expected value % |
|---|---|---|---|---|---|---|---|---|---|
| | | 1.0 | | | | | | 100 | |
| | | 0.2 | | | | | | 100 | |
| | | 0.04 | | | | | | 38 | |
| | | 0.008 | | | | | | 0 | |
| | | | 1.0 | | | | | 99 | |
| | | | 0.2 | | | | | 96 | |
| | | | 0.008 | | | | | 28 | |
| | | | | 20.0 | | | | 0 | |
| | | | | 4.0 | | | | 0 | |
| | | | | 0.8 | | | | 0 | |
| | | | | 0.16 | | | | 0 | |
| | | | | | 10.0 | | | 0 | |
| | | | | | 2.0 | | | 0 | |
| | | | | | 0.4 | | | 0 | |
| | | | | | 0.08 | | | 3 | |
| | | | | | | 5.0 | | 0 | |
| | | | | | | 1.0 | | 0 | |
| | | | | | | 0.2 | | 0 | |
| | | | | | | 0.04 | | 0 | |
| 0.1 | 1.0 | | | | | | 1:10 | 100 | 89 |
| 0.1 | 0.2 | | | | | | 1:2 | 74 | 29 |
| 0.1 | 0.04 | | | | | | 1:0.4 | 14 | 20 |
| 0.1 | 0.008 | | | | | | 1:0.08 | 61 | 20 |
| 0.1 | | 1.0 | | | | | 1:10 | 99 | 100 |
| 0.1 | | 0.2 | | | | | 1:2 | 100 | 100 |
| 0.1 | | 0.04 | | | | | 1:0.4 | 94 | 38 |
| 0.1 | | 0.008 | | | | | 1:0.08 | 86 | 0 |
| 0.02 | | 1.0 | | | | | 1:50 | 100 | 100 |
| 0.02 | | 0.2 | | | | | 1:10 | 100 | 100 |
| 0.02 | | 0.04 | | | | | 1:2 | 75 | 38 |
| 0.02 | | 0.008 | | | | | 1:0.4 | 2 | 0 |
| 0.1 | | | 1.0 | | | | 1:10 | 100 | 99 |
| 0.1 | | | 0.2 | | | | 1:2 | 97 | 96 |
| 0.1 | | | 0.008 | | | | 1:0.08 | 80 | 28 |
| 0.1 | | | | 20.0 | | | 1:200 | 49 | 39 |
| 0.1 | | | | 4.0 | | | 1:40 | 100 | 39 |
| 0.1 | | | | 0.8 | | | 1:8 | 100 | 39 |
| 0.1 | | | | 0.16 | | | 1:1.6 | 86 | 39 |
| 0.004 | | | | 20.0 | | | 1:5000 | 14 | 0 |
| 0.004 | | | | 4.0 | | | 1:1000 | 0 | 0 |
| 0.004 | | | | 0.8 | | | 1:200 | 12 | 0 |
| 0.004 | | | | 0.16 | | | 1:40 | 0 | 0 |
| 0.1 | | | | | 10.0 | | 1:100 | 95 | 39 |
| 0.1 | | | | | 2.0 | | 1:20 | 99 | 39 |
| 0.1 | | | | | 0.4 | | 1:4 | 98 | 39 |
| 0.1 | | | | | 0.08 | | 1:0.8 | 90 | 41 |
| 0.008 | | | | | 10.0 | | 1:12500 | 12 | 0 |
| 0.008 | | | | | 2.0 | | 1:2500 | 14 | 0 |
| 0.008 | | | | | 0.4 | | 1:500 | 9 | 0 |
| 0.008 | | | | | 0.08 | | 1:100 | 0 | 3 |
| 0.1 | | | | | | 5.0 | 1:50 | 99 | 39 |
| 0.1 | | | | | | 1.0 | 1:10 | 98 | 39 |
| 0.1 | | | | | | 0.2 | 1:2 | 87 | 39 |
| 0.1 | | | | | | 0.04 | 1:0.4 | 51 | 39 |
| 0.02 | | | | | | 5.0 | 1:250 | 94 | 0 |
| 0.02 | | | | | | 1.0 | 1:50 | 0 | 0 |
| 0.02 | | | | | | 0.2 | 1:10 | 0 | 0 |
| 0.02 | | | | | | 0.04 | 1:2 | 0 | 0 |

TABLE F10 in vitro - Test with *Diaporthe citri*

| (I-302) (ppm) | (13.004) pro-quinazid (ppm) | (13.005) quinoxy-fen (ppm) | (5.003) captan (ppm) | (5.010) dithia-non (ppm) | (5.012) folpet (ppm) | (5.013) man-cozeb (ppm) | Ratio | Efficacy % | Colby expected value % |
|---|---|---|---|---|---|---|---|---|---|
| 0.1 | | | | | | | | 20 | |
| 0.02 | | | | | | | | 0 | |
| 0.004 | | | | | | | | 1 | |
| 0.0008 | | | | | | | | 0 | |
| | 10.0 | | | | | | | 24 | |
| | 2.0 | | | | | | | 12 | |
| | 0.4 | | | | | | | 0 | |
| | 0.08 | | | | | | | 0 | |
| | | 10.0 | | | | | | 20 | |
| | | 2.0 | | | | | | 10 | |
| | | 0.4 | | | | | | 6 | |
| | | 0.08 | | | | | | 52 | |
| | | | 20.0 | | | | | 100 | |
| | | | 4.0 | | | | | 100 | |
| | | | 0.8 | | | | | 18 | |
| | | | 0.16 | | | | | 75 | |
| | | | | 20.0 | | | | 98 | |
| | | | | 4.0 | | | | 99 | |
| | | | | 0.8 | | | | 9 | |
| | | | | 0.16 | | | | 0 | |
| | | | | | 10.0 | | | 100 | |
| | | | | | 2.0 | | | 99 | |
| | | | | | 0.4 | | | 33 | |
| | | | | | 0.08 | | | 12 | |
| | | | | | | 10.0 | | 100 | |
| | | | | | | 2.0 | | 100 | |
| | | | | | | 0.4 | | 46 | |
| | | | | | | 0.08 | | 0 | |
| 0.1 | 10.0 | | | | | | 1:100 | 100 | 54 |
| 0.1 | 2.0 | | | | | | 1:20 | 89 | 46 |
| 0.1 | 0.4 | | | | | | 1:4 | 86 | 39 |
| 0.1 | 0.08 | | | | | | 1:0.8 | 88 | 39 |
| 0.02 | 10.0 | | | | | | 1:500 | 28 | 24 |
| 0.02 | 2.0 | | | | | | 1:100 | 13 | 12 |
| 0.02 | 0.4 | | | | | | 1:20 | 13 | 0 |
| 0.02 | 0.08 | | | | | | 1:4 | 0 | 0 |
| 0.0008 | 10.0 | | | | | | 1:12500 | 44 | 24 |
| 0.0008 | 2.0 | | | | | | 1:2500 | 12 | 12 |
| 0.0008 | 0.4 | | | | | | 1:500 | 9 | 0 |
| 0.0008 | 0.08 | | | | | | 1:100 | 13 | 0 |
| 0.1 | | 10.0 | | | | | 1:100 | 85 | 20 |
| 0.1 | | 2.0 | | | | | 1:20 | 100 | 10 |
| 0.1 | | 0.4 | | | | | 1:4 | 100 | 6 |
| 0.1 | | 0.08 | | | | | 1:0.8 | 92 | 52 |
| 0.1 | | | 20.0 | | | | 1:200 | 100 | 100 |
| 0.1 | | | 4.0 | | | | 1:40 | 99 | 100 |
| 0.1 | | | 0.8 | | | | 1:8 | 99 | 18 |
| 0.1 | | | 0.16 | | | | 1:1.6 | 98 | 75 |
| 0.02 | | | 20.0 | | | | 1:1000 | 100 | 100 |
| 0.02 | | | 4.0 | | | | 1:200 | 100 | 100 |
| 0.02 | | | 0.8 | | | | 1:40 | 45 | 18 |
| 0.02 | | | 0.16 | | | | 1:8 | 100 | 75 |
| 0.004 | | | 20.0 | | | | 1:5000 | 100 | 100 |
| 0.004 | | | 4.0 | | | | 1:1000 | 100 | 100 |
| 0.004 | | | 0.8 | | | | 1:200 | 36 | 18 |
| 0.004 | | | 0.16 | | | | 1:40 | 84 | 75 |
| 0.1 | | | | 20.0 | | | 1:200 | 100 | 98 |
| 0.1 | | | | 4.0 | | | 1:40 | 99 | 99 |
| 0.1 | | | | 0.8 | | | 1:8 | 95 | 9 |
| 0.1 | | | | 0.16 | | | 1:1.6 | 87 | 0 |
| 0.004 | | | | 20.0 | | | 1:5000 | 97 | 98 |
| 0.004 | | | | 4.0 | | | 1:1000 | 99 | 99 |
| 0.004 | | | | 0.8 | | | 1:200 | 23 | 9 |
| 0.004 | | | | 0.16 | | | 1:40 | 0 | 0 |
| 0.1 | | | | | 10.0 | | 1:100 | 100 | 100 |
| 0.1 | | | | | 2.0 | | 1:20 | 100 | 99 |
| 0.1 | | | | | 0.4 | | 1:4 | 100 | 33 |
| 0.1 | | | | | 0.08 | | 1:0.8 | 91 | 12 |
| 0.02 | | | | | 10.0 | | 1:500 | 98 | 100 |
| 0.02 | | | | | 2.0 | | 1:100 | 99 | 99 |
| 0.02 | | | | | 0.4 | | 1:20 | 45 | 33 |
| 0.02 | | | | | 0.08 | | 1:4 | 33 | 12 |
| 0.1 | | | | | | 10.0 | 1:100 | 99 | 100 |

TABLE F10-continued

| in vitro - Test with *Diaporthe citri* | | | | | | | | | |
|---|---|---|---|---|---|---|---|---|---|
| (I-302) (ppm) | (13.004) pro-quinazid (ppm) | (13.005) quinoxy-fen (ppm) | (5.003) captan (ppm) | (5.010) dithia-non (ppm) | (5.012) folpet (ppm) | (5.013) man-cozeb (ppm) | Ratio | Efficacy % | Colby expected value % |
| 0.1 | | | | | | 2.0 | 1:20 | 100 | 100 |
| 0.1 | | | | | | 0.4 | 1:4 | 100 | 57 |
| 0.1 | | | | | | 0.08 | 1:0.8 | 72 | 20 |

TABLE F11

| in vitro - Test with *Diaporthe citri* | | | | | | | | | |
|---|---|---|---|---|---|---|---|---|---|
| (I-302) (ppm) | (5.018) pro-pineb (ppm) | (15.012) fosetyl-alumi-nium (ppm) | (15.016) metra-fenone (ppm) | (6.002) iso-tianil (ppm) | (17.001) *Bacillus subtilis* (ppm) | (17.012) *Paenibacillus terrae* (ppm) | Ratio | Efficacy % | Colby expected value % |
| 0.1 | | | | | | | | 20 | |
| 0.02 | | | | | | | | 0 | |
| 0.004 | | | | | | | | 1 | |
| 0.0008 | | | | | | | | 0 | |
| | 100.0 | | | | | | | 100 | |
| | 20.0 | | | | | | | 100 | |
| | 4.0 | | | | | | | 99 | |
| | 0.8 | | | | | | | 35 | |
| | | 100.0 | | | | | | 0 | |
| | | 20.0 | | | | | | 0 | |
| | | 4.0 | | | | | | 0 | |
| | | 0.8 | | | | | | 23 | |
| | | | 20.0 | | | | | 0 | |
| | | | 4.0 | | | | | 0 | |
| | | | 0.8 | | | | | 0 | |
| | | | 0.16 | | | | | 0 | |
| | | | | 100.0 | | | | 0 | |
| | | | | 20.0 | | | | 37 | |
| | | | | 4.0 | | | | 22 | |
| | | | | 0.8 | | | | 0 | |
| | | | | | 200.0 | | | 9 | |
| | | | | | 40.0 | | | 5 | |
| | | | | | 8.0 | | | 13 | |
| | | | | | 1.6 | | | 5 | |
| | | | | | | 200.0 | | 99 | |
| | | | | | | 40.0 | | 0 | |
| | | | | | | 8.0 | | 0 | |
| | | | | | | 1.6 | | 0 | |
| 0.1 | 100.0 | | | | | | 1:1000 | 100 | 100 |
| 0.1 | 20.0 | | | | | | 1:200 | 100 | 100 |
| 0.1 | 4.0 | | | | | | 1:40 | 97 | 100 |
| 0.1 | 0.8 | | | | | | 1:8 | 93 | 48 |
| 0.02 | 100.0 | | | | | | 1:5000 | 100 | 100 |
| 0.02 | 20.0 | | | | | | 1:1000 | 100 | 100 |
| 0.02 | 4.0 | | | | | | 1:200 | 100 | 99 |
| 0.02 | 0.8 | | | | | | 1:40 | 69 | 35 |
| 0.004 | 100.0 | | | | | | 1:25000 | 100 | 100 |
| 0.004 | 20.0 | | | | | | 1:5000 | 100 | 100 |
| 0.004 | 4.0 | | | | | | 1:1000 | 100 | 99 |
| 0.004 | 0.8 | | | | | | 1:200 | 51 | 36 |
| 0.0008 | 100.0 | | | | | | 1:125000 | 100 | 100 |
| 0.0008 | 20.0 | | | | | | 1:25000 | 100 | 100 |
| 0.0008 | 4.0 | | | | | | 1:5000 | 99 | 99 |
| 0.0008 | 0.8 | | | | | | 1:1000 | 36 | 35 |
| 0.1 | | 100.0 | | | | | 1:1000 | 96 | 20 |
| 0.1 | | 20.0 | | | | | 1:200 | 44 | 20 |
| 0.1 | | 4.0 | | | | | 1:40 | 66 | 20 |
| 0.1 | | 0.8 | | | | | 1:8 | 86 | 39 |
| 0.1 | | | 20.0 | | | | 1:200 | 88 | 20 |
| 0.1 | | | 4.0 | | | | 1:40 | 81 | 20 |
| 0.1 | | | 0.8 | | | | 1:8 | 93 | 20 |
| 0.1 | | | 0.16 | | | | 1:1.6 | 95 | 20 |
| 0.1 | | | | 100.0 | | | 1:1000 | 98 | 60 |
| 0.1 | | | | 20.0 | | | 1:200 | 100 | 75 |
| 0.1 | | | | 4.0 | | | 1:40 | 100 | 69 |
| 0.1 | | | | 0.8 | | | 1:8 | 82 | 60 |

TABLE F11-continued in vitro - Test with *Diaporthe citri*

| (I-302) (ppm) | (5.018) pro-pineb (ppm) | (15.012) fosetyl-alumi-nium (ppm) | (15.016) metra-fenone (ppm) | (6.002) iso-tianil (ppm) | (17.001) *Bacillus subtilis* (ppm) | (17.012) *Paenibacillus terrae* (ppm) | Ratio | Efficacy % | Colby expected value % |
|---|---|---|---|---|---|---|---|---|---|
| 0.1 | | | | | 200.0 | | 1:2000 | 92 | 64 |
| 0.1 | | | | | 40.0 | | 1:400 | 100 | 62 |
| 0.1 | | | | | 8.0 | | 1:80 | 100 | 65 |
| 0.1 | | | | | 1.6 | | 1:16 | 100 | 62 |
| 0.1 | | | | | | 200.0 | 1:2000 | 100 | 100 |
| 0.1 | | | | | | 40.0 | 1:400 | 85 | 60 |
| 0.1 | | | | | | 8.0 | 1:80 | 86 | 60 |
| 0.1 | | | | | | 1.6 | 1:16 | 81 | 60 |

TABLE F12 in vitro—Test with *Diaporthe citri*

| (I-339) (ppm) | (3.025) fenpicoxamid (ppm) | (13.001) fludioxonil (ppm) | (15.012) fosetylal (ppm) | (2.028) inpyrfluxam (ppm) | (15.016) metrafenone (ppm) | (17.012) *Paenibacillus terrae* (ppm) | Ratio | Efficacy % | Colby expected value % |
|---|---|---|---|---|---|---|---|---|---|
| 1 | | | | | | | | 99 | |
| 0.2 | | | | | | | | 100 | |
| 0.04 | | | | | | | | 99 | |
| 0.008 | | | | | | | | 0 | |
| | 1 | | | | | | | 94 | |
| | 0.2 | | | | | | | 83 | |
| | 0.008 | | | | | | | 0 | |
| | | 1 | | | | | | 9 | |
| | | 0.2 | | | | | | 0 | |
| | | | 4 | | | | | 7 | |
| | | | 0.8 | | | | | 13 | |
| | | | | 1 | | | | 65 | |
| | | | | | 5 | | | 0 | |
| | | | | | 1 | | | 3 | |
| | | | | | | 200 | | 100 | |
| | | | | | | 40 | | 0 | |
| | | | | | | 8 | | 7 | |
| | | | | | | 1.6 | | 0 | |
| 0.008 | 1 | | | | | | 1:125 | 95 | 94 |
| 0.008 | 0.2 | | | | | | 1:25 | 90 | 83 |
| 0.008 | 0.008 | | | | | | 1:1 | 29 | 0 |
| 0.2 | | 1 | | | | | 1:5 | 100 | 100 |
| 0.2 | | 0.2 | | | | | 1:1 | 100 | 100 |
| 0.008 | | 1 | | | | | 1:125 | 80 | 9 |
| 0.008 | | 0.2 | | | | | 1:25 | 0 | 0 |
| 0.2 | | | 4 | | | | 1:20 | 100 | 100 |
| 0.2 | | | 0.8 | | | | 1:4 | 100 | 100 |
| 0.008 | | | 4 | | | | 1:500 | 19 | 7 |
| 0.008 | | | 0.8 | | | | 1:100 | 20 | 13 |
| 1 | | | | 1 | | | 1:1 | 100 | 100 |
| 0.2 | | | | 1 | | | 1:5 | 100 | 100 |
| 0.008 | | | | 1 | | | 1:125 | 75 | 65 |
| 0.2 | | | | | 5 | | 1:25 | 100 | 100 |
| 0.2 | | | | | 1 | | 1:5 | 100 | 100 |
| 0.008 | | | | | 5 | | 1:625 | 15 | 6 |
| 0.008 | | | | | 1 | | 1:125 | 18 | 9 |
| 0.008 | | | | | | 200 | 1:25000 | 100 | 100 |
| 0.008 | | | | | | 40 | 1:5000 | 32 | 6 |
| 0.008 | | | | | | 8 | 1:1000 | 19 | 12 |
| 0.008 | | | | | | 1.6 | 1:200 | 0 | 6 |

TABLE F13 in vitro—Test with *Diaporthe citri*

| (I-339) (ppm) | (13.005) quinoxyfen (ppm) | (I-338) (ppm) | (5.010) dithianon (ppm) | (3.025) fenpicoxamid (ppm) | (13.001) fludioxonil (ppm) | (3.012) fluoxastrobin (ppm) | Ratio | Efficacy % | Colby expected value % |
|---|---|---|---|---|---|---|---|---|---|
| 1 | | | | | | | | 99 | |
| 0.2 | | | | | | | | 100 | |
| 0.04 | | | | | | | | 99 | |
| 0.008 | | | | | | | | 0 | |
| | 2 | | | | | | | 24 | |
| | 0.4 | | | | | | | 0 | |
| | 0.08 | | | | | | | 0 | |
| | | 1 | | | | | | 20 | |
| | | 0.2 | | | | | | 11 | |
| | | 0.04 | | | | | | 0 | |
| | | 0.008 | | | | | | 0 | |
| | | | 0.4 | | | | | 13 | |
| | | | | 0.2 | | | | 79 | |
| | | | | | 5 | | | 0 | |
| | | | | | 1 | | | 41 | |
| | | | | | | 2 | | 96 | |
| | | | | | | 0.4 | | 83 | |
| 0.04 | 2 | | | | | | 1:50 | 100 | 100 |
| 0.04 | 0.4 | | | | | | 1:10 | 100 | 99 |
| 0.04 | 0.08 | | | | | | 1:2 | 100 | 99 |
| 0.008 | 2 | | | | | | 1:250 | 48 | 24 |
| 0.008 | 0.4 | | | | | | 1:50 | 17 | 0 |
| 0.008 | 0.08 | | | | | | 1:10 | 26 | 0 |
| | | 1 | 0.4 | | | | 1:0.4 | 33 | 31 |
| | | 0.2 | 0.4 | | | | 1:2 | 45 | 23 |
| | | 0.04 | 0.4 | | | | 1:10 | 39 | 13 |
| | | 0.008 | 0.4 | | | | 1:50 | 14 | 13 |
| | | 0.2 | | 0.2 | | | 1:1 | 87 | 82 |
| | | 0.04 | | 0.2 | | | 1:5 | 84 | 79 |
| | | 0.008 | | 0.2 | | | 1:25 | 87 | 79 |
| | | 1 | | | 5 | | 1:5 | 71 | 20 |
| | | 0.2 | | | 5 | | 1:25 | 73 | 11 |
| | | 0.2 | | | 1 | | 1:5 | 71 | 47 |
| | | 0.04 | | | 5 | | 1:125 | 69 | 0 |
| | | 0.008 | | | 5 | | 1:625 | 78 | 0 |
| | | 0.008 | | | 1 | | 1:125 | 79 | 41 |
| | | 1 | | | | 2 | 1:2 | 95 | 96 |
| | | 1 | | | | 0.4 | 1:0.4 | 88 | 85 |
| | | 0.2 | | | | 2 | 1:10 | 98 | 97 |
| | | 0.2 | | | | 0.4 | 1:2 | 86 | 86 |
| | | 0.04 | | | | 2 | 1:50 | 95 | 96 |
| | | 0.04 | | | | 0.4 | 1:10 | 89 | 84 |
| | | 0.008 | | | | 2 | 1:250 | 96 | 96 |
| | | 0.008 | | | | 0.4 | 1:50 | 89 | 84 |

TABLE F14 in vitro—Test with *Diaporthe citri*

| (I-338) (ppm) | (6.002) isotianil (ppm) | (5.013) mancozeb (ppm) | (1.055) mefentrifluconazole (ppm) | (12.004) metalaxyl-m (ppm) | (15.016) metrafenone (ppm) | (3.030) metyltetraprole (ppm) | Ratio | Efficacy % | Colby expected value % |
|---|---|---|---|---|---|---|---|---|---|
| 1 | | | | | | | | 2 | |
| 0.2 | | | | | | | | 0 | |
| 0.04 | | | | | | | | 0 | |
| 0.008 | | | | | | | | 0 | |
| | 100 | | | | | | | 19 | |
| | 20 | | | | | | | 5 | |
| | 4 | | | | | | | 9 | |
| | 0.8 | | | | | | | 10 | |
| | | 20 | | | | | | 99 | |
| | | 4 | | | | | | 78 | |
| | | 0.8 | | | | | | 0 | |
| | | 0.16 | | | | | | 0 | |
| | | | 1 | | | | | 99 | |
| | | | 0.2 | | | | | 94 | |
| | | | 0.04 | | | | | 21 | |
| | | | 0.008 | | | | | 8 | |
| | | | | 20 | | | | 0 | |
| | | | | 4 | | | | 0 | |

TABLE F14-continued

| in vitro—Test with *Diaporthe citri* | | | | | | | | | |
|---|---|---|---|---|---|---|---|---|---|
| (I-338) (ppm) | (6.002) isotianil (ppm) | (5.013) mancozeb (ppm) | (1.055) mefentrifluconazole (ppm) | (12.004) metalaxyl-m (ppm) | (15.016) metrafenone (ppm) | (3.030) metyltetraprole (ppm) | Ratio | Efficacy % | Colby expected value % |
| | | | | 0.8 | | | | 0 | |
| | | | | | 5 | | | 0 | |
| | | | | | 1 | | | 0 | |
| | | | | | 0.2 | | | 0 | |
| | | | | | 0.04 | | | 0 | |
| | | | | | | 0.2 | | 86 | |
| 1 | 100 | | | | | | 1:100 | 41 | 21 |
| 1 | 20 | | | | | | 1:20 | 23 | 7 |
| 1 | 4 | | | | | | 1:4 | 17 | 11 |
| 1 | 0.8 | | | | | | 1:0.8 | 36 | 12 |
| 1 | | 20 | | | | | 1:20 | 99 | 99 |
| 1 | | 4 | | | | | 1:4 | 81 | 78 |
| 1 | | 0.8 | | | | | 1:0.8 | 22 | 2 |
| 1 | | 0.16 | | | | | 1:0.16 | 14 | 2 |
| 0.2 | | 20 | | | | | 1:100 | 99 | 99 |
| 0.2 | | 4 | | | | | 1:20 | 79 | 78 |
| 0.2 | | 0.8 | | | | | 1:4 | 13 | 0 |
| 0.2 | | 0.16 | | | | | 1:0.8 | 0 | 0 |
| 1 | | | 1 | | | | 1:1 | 100 | 99 |
| 1 | | | 0.2 | | | | 1:0.2 | 100 | 94 |
| 0.04 | | | 1 | | | | 1:25 | 100 | 99 |
| 0.04 | | | 0.2 | | | | 1:5 | 99 | 94 |
| 0.008 | | | 1 | | | | 1:125 | 100 | 99 |
| 0.008 | | | 0.2 | | | | 1:25 | 100 | 94 |
| 0.008 | | | 0.04 | | | | 1:5 | 35 | 21 |
| 0.008 | | | 0.008 | | | | 1:1 | 27 | 8 |
| 1 | | | | 20 | | | 1:20 | 15 | 2 |
| 1 | | | | 4 | | | 1:4 | 21 | 2 |
| 1 | | | | 0.8 | | | 1:0.8 | 9 | 2 |
| 1 | | | | | 5 | | 1:5 | 21 | 0 |
| 1 | | | | | 1 | | 1:1 | 13 | 0 |
| 1 | | | | | 0.2 | | 1:0.2 | 10 | 0 |
| 1 | | | | | 0.04 | | 1:0.04 | 26 | 0 |
| 1 | | | | | | 0.2 | 1:0.2 | 89 | 86 |
| 0.04 | | | | | | 0.2 | 1:5 | 90 | 86 |
| 0.008 | | | | | | 0.2 | 1:25 | 92 | 86 |

TABLE F15

| in vitro—Test with *Diaporthe citri* | | | | | | | | | |
|---|---|---|---|---|---|---|---|---|---|
| (I-338) (ppm) | (17.012) *Paenibacillus terrae* (ppm) | (2.017) penflufen (ppm) | (5.018) propineb (ppm) | (13.005) quinoxyfen (ppm) | (1.020) spiroxamin (ppm) | (3.020) trifloxystrobin (ppm) | Ratio | Efficacy % | Colby expected value % |
| 1 | | | | | | | | 0 | |
| 0.2 | | | | | | | | 2 | |
| 0.04 | | | | | | | | 0 | |
| 0.008 | | | | | | | | 0 | |
| | 40 | | | | | | | 0 | |
| | 8 | | | | | | | 0 | |
| | 1.6 | | | | | | | 0 | |
| | | 5 | | | | | | 3 | |
| | | 1 | | | | | | 0 | |
| | | 0.2 | | | | | | 2 | |
| | | 0.04 | | | | | | 0 | |
| | | | 4 | | | | | 33 | |
| | | | | 10 | | | | 76 | |
| | | | | 2 | | | | 13 | |
| | | | | 0.4 | | | | 0 | |
| | | | | | 20 | | | 4 | |
| | | | | | 4 | | | 0 | |
| | | | | | | 0.008 | | 68 | |
| 0.2 | 40 | | | | | | 1:200 | 25 | 2 |
| 0.2 | 8 | | | | | | 1:40 | 10 | 2 |
| 0.2 | 1.6 | | | | | | 1:8 | 8 | 2 |
| 0.008 | 40 | | | | | | 1:5000 | 19 | 0 |
| 0.008 | 8 | | | | | | 1:1000 | 18 | 0 |
| 0.008 | 1.6 | | | | | | 1:200 | 0 | 0 |
| 0.2 | | 5 | | | | | 1:25 | 11 | 4 |

TABLE F15-continued

| (I-338) (ppm) | (17.012) *Paenibacillus terrae* (ppm) | (2.017) penflufen (ppm) | (5.018) propineb (ppm) | (13.005) quinoxyfen (ppm) | (1.020) spiroxamin (ppm) | (3.020) trifloxystrobin (ppm) | Ratio | Efficacy % | Colby expected value % |
|---|---|---|---|---|---|---|---|---|---|
| in vitro—Test with *Diaporthe citri* | | | | | | | | | |
| 0.2 | | 1 | | | | | 1:5 | 15 | 2 |
| 0.2 | | 0.2 | | | | | 1:1 | 12 | 4 |
| 0.2 | | 0.04 | | | | | 1:0.2 | 0 | 2 |
| 0.008 | | 5 | | | | | 1:625 | 29 | 3 |
| 0.008 | | 1 | | | | | 1:125 | 7 | 0 |
| 0.008 | | 0.2 | | | | | 1:25 | 3 | 2 |
| 0.008 | | 0.04 | | | | | 1:5 | 10 | 0 |
| 1 | | | 4 | | | | 1:4 | 73 | 52 |
| 0.2 | | | 4 | | | | 1:20 | 61 | 48 |
| 0.04 | | | 4 | | | | 1:100 | 83 | 46 |
| 0.008 | | | | 10 | | | 1:1250 | 84 | 76 |
| 0.008 | | | | 2 | | | 1:250 | 16 | 13 |
| 0.008 | | | | 0.4 | | | 1:50 | 31 | 0 |
| 0.04 | | | | | 20 | | 1:500 | 10 | 5 |
| 0.04 | | | | | 4 | | 1:100 | 2 | 2 |
| 0.008 | | | | | 20 | | 1:2500 | 7 | 4 |
| 0.008 | | | | | 4 | | 1:500 | 15 | 0 |
| 1 | | | | | | 0.008 | 1:0.008 | 75 | 73 |
| 0.2 | | | | | | 0.008 | 1:0.04 | 81 | 68 |
| 0.04 | | | | | | 0.008 | 1:0.2 | 72 | 68 |
| 0.008 | | | | | | 0.008 | 1:1 | 75 | 68 |

TABLE G1

| (I-052) (ppm) | (1.055) mefentrifluconazole (ppm) | (5.018) propineb (ppm) | (I-300) (ppm) | (2.005) fluopyram (ppm) | (2.028) inpyrfluxam (ppm) | (3.020) trifloxystrobin (ppm) | Ratio | Efficacy % | Colby expected value % |
|---|---|---|---|---|---|---|---|---|---|
| in vitro—Test with *Fusarium culmorum* | | | | | | | | | |
| 0.1 | | | | | | | | 19 | |
| 0.02 | | | | | | | | 12 | |
| 0.004 | | | | | | | | 22 | |
| 0.0008 | | | | | | | | 0 | |
| | 1.0 | | | | | | | 33 | |
| | 0.2 | | | | | | | 5 | |
| | 0.04 | | | | | | | 22 | |
| | 0.008 | | | | | | | 20 | |
| | | 100.0 | | | | | | 95 | |
| | | 20.0 | | | | | | 0 | |
| | | 4.0 | | | | | | 0 | |
| | | 0.8 | | | | | | 1 | |
| 0.0008 | 1.0 | | | | | | 1:1250 | 100 | 33 |
| 0.0008 | 0.2 | | | | | | 1:250 | 0 | 5 |
| 0.0008 | 0.04 | | | | | | 1:50 | 24 | 22 |
| 0.0008 | 0.008 | | | | | | 1:10 | 28 | 20 |
| 0.1 | | 100.0 | | | | | 1:1000 | 100 | 95 |
| 0.1 | | 20.0 | | | | | 1:200 | 2 | 0 |
| 0.1 | | 4.0 | | | | | 1:40 | 0 | 0 |
| 0.1 | | 0.8 | | | | | 1:8 | 0 | 1 |
| | | | 0.1 | | | | | 2 | |
| | | | 0.02 | | | | | 5 | |
| | | | 0.004 | | | | | 6 | |
| | | | 0.0008 | | | | | 2 | |
| | | | | 20.0 | | | | 21 | |
| | | | | 4.0 | | | | 0 | |
| | | | | 0.8 | | | | 0 | |
| | | | | 0.16 | | | | 1 | |
| | | | | | 1.0 | | | 0 | |
| | | | | | 0.2 | | | 0 | |
| | | | | | 0.04 | | | 0 | |
| | | | | | 0.008 | | | 0 | |
| | | | | | | 1.0 | | 15 | |
| | | | | | | 0.2 | | 15 | |
| | | | | | | 0.04 | | 0 | |
| | | | 0.1 | 20.0 | | | 1:200 | 49 | 21 |
| | | | 0.1 | 4.0 | | | 1:40 | 0 | 0 |
| | | | 0.1 | 0.8 | | | 1:8 | 0 | 0 |
| | | | 0.1 | 0.16 | | | 1:1.6 | 0 | 1 |

TABLE G1-continued in vitro—Test with *Fusarium culmorum*

| (I-052) (ppm) | (1.055) mefentrifluconazole (ppm) | (5.018) propineb (ppm) | (I-300) (ppm) | (2.005) fluopyram (ppm) | (2.028) inpyrfluxam (ppm) | (3.020) trifloxystrobin (ppm) | Ratio | Efficacy % | Colby expected value % |
|---|---|---|---|---|---|---|---|---|---|
| | | | 0.0008 | 20.0 | | | 1:25000 | 53 | 21 |
| | | | 0.0008 | 4.0 | | | 1:5000 | 0 | 0 |
| | | | 0.0008 | 0.8 | | | 1:1000 | 7 | 0 |
| | | | 0.0008 | 0.16 | | | 1:200 | 2 | 1 |
| | | | 0.1 | | 1.0 | | 1:10 | 41 | 0 |
| | | | 0.1 | | 0.2 | | 1:2 | 0 | 0 |
| | | | 0.1 | | 0.04 | | 1:0.4 | 0 | 0 |
| | | | 0.1 | | 0.008 | | 1:0.08 | 0 | 0 |
| | | | 0.1 | | | 1.0 | 1:10 | 67 | 15 |
| | | | 0.1 | | | 0.2 | 1:2 | 43 | 15 |
| | | | 0.1 | | | 0.04 | 1:0.4 | 0 | 0 |
| | | | 0.02 | | | 1.0 | 1:50 | 0 | 28 |
| | | | 0.02 | | | 0.2 | 1:10 | 19 | 15 |
| | | | 0.02 | | | 0.04 | 1:2 | 35 | 15 |
| | | | 0.004 | | | 1.0 | 1:250 | 44 | 0 |
| | | | 0.004 | | | 0.2 | 1:50 | 6 | 28 |
| | | | 0.004 | | | 0.04 | 1:10 | 17 | 15 |

TABLE G2 in vitro—Test with *Fusarium culmorum*

| (I-300) (ppm) | (1.021) tebuconazole (ppm) | (1.020) spiroxamine (ppm) | (15.064) (ppm) | (13.001) fludioxonil (ppm) | (13.005) quinoxyfen (ppm) | (5.010) dithianon (ppm) | Ratio | Efficacy % | Colby expected value % |
|---|---|---|---|---|---|---|---|---|---|
| 0.1 | | | | | | | | 2 | |
| 0.02 | | | | | | | | 5 | |
| 0.004 | | | | | | | | 6 | |
| 0.0008 | | | | | | | | 2 | |
| | 1.0 | | | | | | | 98 | |
| | 0.2 | | | | | | | 26 | |
| | 0.04 | | | | | | | 21 | |
| | 0.008 | | | | | | | 8 | |
| | | 20.0 | | | | | | 0 | |
| | | 4.0 | | | | | | 0 | |
| | | | 10.0 | | | | | 1 | |
| | | | 2.0 | | | | | 0 | |
| | | | | 5.0 | | | | 99 | |
| | | | | 1.0 | | | | 98 | |
| | | | | 0.2 | | | | 36 | |
| | | | | | 10.0 | | | 0 | |
| | | | | | 2.0 | | | 6 | |
| | | | | | 0.4 | | | 1 | |
| | | | | | 0.08 | | | 0 | |
| | | | | | | 20.0 | | 100 | |
| | | | | | | 4.0 | | 0 | |
| 0.1 | 1.0 | | | | | | 1:10 | 100 | 98 |
| 0.1 | 0.2 | | | | | | 1:2 | 67 | 28 |
| 0.1 | 0.04 | | | | | | 1:0.4 | 17 | 23 |
| 0.1 | 0.008 | | | | | | 1:0.08 | 22 | 10 |
| 0.1 | | 20.0 | | | | | 1:200 | 44 | 8 |
| 0.1 | | 4.0 | | | | | 1:40 | 0 | 8 |
| 0.02 | | 20.0 | | | | | 1:1000 | 13 | 4 |
| 0.02 | | 4.0 | | | | | 1:200 | 0 | 4 |
| 0.004 | | 20.0 | | | | | 1:5000 | 24 | 9 |
| 0.004 | | 4.0 | | | | | 1:1000 | 3 | 9 |
| 0.0008 | | 20.0 | | | | | 1:25000 | 8 | 0 |
| 0.0008 | | 4.0 | | | | | 1:5000 | 8 | 0 |
| 0.1 | | | 10.0 | | | | 1:100 | 45 | 10 |
| 0.1 | | | 2.0 | | | | 1:20 | 0 | 8 |
| 0.02 | | | 10.0 | | | | 1:500 | 12 | 5 |
| 0.02 | | | 2.0 | | | | 1:100 | 0 | 4 |
| 0.0008 | | | 10.0 | | | | 1:12500 | 24 | 9 |
| 0.0008 | | | 2.0 | | | | 1:2500 | 13 | 8 |
| 0.1 | | | | 5.0 | | | 1:50 | 100 | 99 |
| 0.1 | | | | 1.0 | | | 1:10 | 98 | 98 |
| 0.1 | | | | 0.2 | | | 1:2 | 48 | 41 |
| 0.1 | | | | | 10.0 | | 1:100 | 44 | 0 |

TABLE G2-continued in vitro—Test with *Fusarium culmorum*

| (I-300) (ppm) | (1.021) tebuconazole (ppm) | (1.020) spiroxamine (ppm) | (15.064) (ppm) | (13.001) fludioxonil (ppm) | (13.005) quinoxyfen (ppm) | (5.010) dithianon (ppm) | Ratio | Efficacy % | Colby expected value % |
|---|---|---|---|---|---|---|---|---|---|
| 0.1 | | | | | 2.0 | | 1:20 | 5 | 6 |
| 0.1 | | | | | 0.4 | | 1:4 | 0 | 1 |
| 0.1 | | | | | 0.08 | | 1:0.8 | 0) | 0 |
| 0.1 | | | | | | 20.0 | 1:200 | 100 | 100 |
| 0.1 | | | | | | 4.0 | 1:40 | 100 | 0 |
| 0.02 | | | | | | 20.0 | 1:1000 | 100 | 100 |
| 0.02 | | | | | | 4.0 | 1:200 | 97 | 11 |
| 0.004 | | | | | | 20.0 | 1:5000 | 100 | 100 |
| 0.004 | | | | | | 4.0 | 1:1000 | 29 | 12 |
| 0.0008 | | | | | | 20.0 | 1:25000 | 100 | 100 |
| 0.0008 | | | | | | 4.0 | 1:5000 | 30 | 0 |

TABLE G3 in vitro—Test with *Fusarium culmorum*

| (I-300) (ppm) | (5.018) propineb (ppm) | (15.012) fosetylaluminium (ppm) | (I-302) (ppm) | (2.005) fluopyram (ppm) | (3.020) trifloxystrobin (ppm) | (1.021) tebuconazole (ppm) | Ratio | Efficacy % | Colby expected value % |
|---|---|---|---|---|---|---|---|---|---|
| 0.1 | | | | | | | | 2 | |
| 0.02 | | | | | | | | 5 | |
| 0.004 | | | | | | | | 6 | |
| 0.0008 | | | | | | | | 2 | |
| | 100.0 | | | | | | | 89 | |
| | 20.0 | | | | | | | 98 | |
| | 4.0 | | | | | | | 0 | |
| | 0.8 | | | | | | | 0 | |
| | | 100.0 | | | | | | 9 | |
| | | 20.0 | | | | | | 5 | |
| | | 4.0 | | | | | | 0 | |
| | | 0.8 | | | | | | 7 | |
| | | | 0.1 | | | | | 0 | |
| | | | 0.02 | | | | | 2 | |
| | | | 0.004 | | | | | 4 | |
| | | | 0.0008 | | | | | 7 | |
| | | | | 20.0 | | | | 16 | |
| | | | | 4.0 | | | | 0 | |
| | | | | 0.8 | | | | 0 | |
| | | | | | 1.0 | | | 5 | |
| | | | | | 0.2 | | | 22 | |
| | | | | | | 1.0 | | 98 | |
| | | | | | | 0.2 | | 57 | |
| | | | | | | 0.04 | | 11 | |
| 0.1 | 100.0 | | | | | | 1:1000 | 100 | 89 |
| 0.1 | 20.0 | | | | | | 1:200 | 93 | 98 |
| 0.1 | 4.0 | | | | | | 1:40 | 0 | 0 |
| 0.1 | 0.8 | | | | | | 1:8 | 0 | 0 |
| 0.1 | | 100.0 | | | | | 1:1000 | 39 | 9 |
| 0.1 | | 20.0 | | | | | 1:200 | 9 | 5 |
| 0.1 | | 4.0 | | | | | 1:40 | 0 | 0 |
| 0.1 | | 0.8 | | | | | 1:8 | 0 | 7 |
| | | | 0.1 | 20.0 | | | 1:200 | 44 | 16 |
| | | | 0.1 | 4.0 | | | 1:40 | 0 | 0 |
| | | | 0.1 | 0.8 | | | 1:8 | 10 | 0 |
| | | | 0.02 | 20.0 | | | 1:1000 | 25 | 20 |
| | | | 0.02 | 4.0 | | | 1:200 | 30 | 5 |
| | | | 0.02 | 0.8 | | | 1:40 | 0 | 5 |
| | | | 0.004 | 20.0 | | | 1:5000 | 27 | 26 |
| | | | 0.004 | 4.0 | | | 1:1000 | 9 | 12 |
| | | | 0.004 | 0.8 | | | 1:200 | 15 | 12 |
| | | | 0.0008 | 20.0 | | | 1:25000 | 30 | 19 |
| | | | 0.0008 | 4.0 | | | 1:5000 | 0 | 3 |
| | | | 0.0008 | 0.8 | | | 1:1000 | 16 | 3 |
| | | | 0.1 | | 1.0 | | 1:10 | 53 | 5 |
| | | | 0.1 | | 0.2 | | 1:2 | 26 | 22 |
| | | | 0.02 | | 1.0 | | 1:50 | 25 | 7 |
| | | | 0.02 | | 0.2 | | 1:10 | 31 | 24 |
| | | | 0.004 | | 1.0 | | 1:250 | 10 | 5 |

TABLE G3-continued

| in vitro—Test with *Fusarium culmorum* | | | | | | | | | |
|---|---|---|---|---|---|---|---|---|---|
| (I-300) (ppm) | (5.018) propineb (ppm) | (15.012) fosetylaluminium (ppm) | (I-302) (ppm) | (2.005) fluopyram (ppm) | (3.020) trifloxystrobin (ppm) | (1.021) tebuconazole (ppm) | Ratio | Efficacy % | Colby expected value % |
| | | | 0.004 | | 0.2 | | 1:50 | 14 | 22 |
| | | | 0.0008 | | 1.0 | | 1:1250 | 21 | 6 |
| | | | 0.0008 | | 0.2 | | 1:250 | 26 | 23 |
| | | | 0.02 | | | 1.0 | 1:50 | 98 | 98 |
| | | | 0.02 | | | 0.2 | 1:10 | 60 | 58 |
| | | | 0.02 | | | 0.04 | 1:2 | 44 | 13 |
| | | | 0.004 | | | 1.0 | 1:250 | 99 | 98 |
| | | | 0.004 | | | 0.2 | 1:50 | 59 | 57 |
| | | | 0.004 | | | 0.04 | 1:10 | 24 | 11 |

TABLE G4

| in vitro—Test with *Fusarium culmorum* | | | | | | | | | |
|---|---|---|---|---|---|---|---|---|---|
| (I-302) (ppm) | (13.001) fludioxonil (ppm) | (13.005) quinoxyfen (ppm) | (5.003) captan (ppm) | (5.012) folpet (ppm) | (5.018) propineb (ppm) | (17.001) *Bacillus subtilis* (ppm) | Ratio | Efficacy % | Colby expected value % |
| 0.1 | | | | | | | | 0 | |
| 0.02 | | | | | | | | 2 | |
| 0.004 | | | | | | | | 4 | |
| 0.0008 | | | | | | | | 7 | |
| | 5.0 | | | | | | | 99 | |
| | 1.0 | | | | | | | 83 | |
| | 0.2 | | | | | | | 0 | |
| | | 10.0 | | | | | | 0 | |
| | | 2.0 | | | | | | 0 | |
| | | 0.4 | | | | | | 0 | |
| | | | 20.0 | | | | | 100 | |
| | | | 4.0 | | | | | 100 | |
| | | | 0.8 | | | | | 0 | |
| | | | 0.16 | | | | | 0 | |
| | | | | 10.0 | | | | 100 | |
| | | | | 2.0 | | | | 100 | |
| | | | | 0.4 | | | | 0 | |
| | | | | 0.08 | | | | 0 | |
| | | | | | 100.0 | | | 82 | |
| | | | | | 20.0 | | | 98 | |
| | | | | | 4.0 | | | 0 | |
| | | | | | 0.8 | | | 0 | |
| | | | | | | 200.0 | | 0 | |
| | | | | | | 40.0 | | 2 | |
| | | | | | | 8.0 | | 7 | |
| | | | | | | 1.6 | | 6 | |
| 0.1 | 5.0 | | | | | | 1:50 | 100 | 99 |
| 0.1 | 1.0 | | | | | | 1:10 | 92 | 83 |
| 0.1 | 0.2 | | | | | | 1:2 | 0 | 0 |
| 0.02 | 5.0 | | | | | | 1:250 | 98 | 99 |
| 0.02 | 1.0 | | | | | | 1:50 | 92 | 83 |
| 0.02 | 0.2 | | | | | | 1:10 | 0 | 0 |
| 0.004 | 5.0 | | | | | | 1:1250 | 99 | 99 |
| 0.004 | 1.0 | | | | | | 1:250 | 84 | 82 |
| 0.004 | 0.2 | | | | | | 1:50 | 6 | 0 |
| 0.0008 | 5.0 | | | | | | 1:6250 | 98 | 99 |
| 0.0008 | 1.0 | | | | | | 1:1250 | 87 | 83 |
| 0.0008 | 0.2 | | | | | | 1:250 | 0 | 0 |
| 0.1 | | 10.0 | | | | | 1:100 | 47 | 0 |
| 0.1 | | 2.0 | | | | | 1:20 | 0 | 0 |
| 0.1 | | 0.4 | | | | | 1:4 | 0 | 0 |
| 0.02 | | 10.0 | | | | | 1:500 | 18 | 0 |
| 0.02 | | 2.0 | | | | | 1:100 | 6 | 0 |
| 0.02 | | 0.4 | | | | | 1:20 | 0 | 0 |
| 0.1 | | | 20.0 | | | | 1:200 | 100 | 100 |
| 0.1 | | | 4.0 | | | | 1:40 | 100 | 100 |
| 0.1 | | | 0.8 | | | | 1:8 | 100 | 0 |
| 0.1 | | | 0.16 | | | | 1:1.6 | 0 | 0 |
| 0.02 | | | 20.0 | | | | 1:1000 | 100 | 100 |
| 0.02 | | | 4.0 | | | | 1:200 | 100 | 100 |
| 0.02 | | | 0.8 | | | | 1:40 | 11 | 0 |

TABLE G4-continued in vitro—Test with *Fusarium culmorum*

| (I-302) (ppm) | (13.001) fludioxonil (ppm) | (13.005) quinoxyfen (ppm) | (5.003) captan (ppm) | (5.012) folpet (ppm) | (5.018) propineb (ppm) | (17.001) *Bacillus subtilis* (ppm) | Ratio | Efficacy % | Colby expected value % |
|---|---|---|---|---|---|---|---|---|---|
| 0.02 | | | 0.16 | | | | 1:8 | 0 | 0 |
| 0.004 | | | 20.0 | | | | 1:5000 | 100 | 100 |
| 0.004 | | | 4.0 | | | | 1:1000 | 100 | 100 |
| 0.004 | | | 0.8 | | | | 1:200 | 5 | 4 |
| 0.004 | | | 0.16 | | | | 1:40 | 2 | 4 |
| 0.1 | | | | 10.0 | | | 1:100 | 100 | 100 |
| 0.1 | | | | 2.0 | | | 1:20 | 100 | 100 |
| 0.1 | | | | 0.4 | | | 1:4 | 16 | 0 |
| 0.1 | | | | 0.08 | | | 1:0.8 | 0 | 0 |
| 0.02 | | | | 10.0 | | | 1:500 | 100 | 100 |
| 0.02 | | | | 2.0 | | | 1:100 | 99 | 100 |
| 0.02 | | | | 0.4 | | | 1:20 | 4 | 0 |
| 0.02 | | | | 0.08 | | | 1:4 | 0 | 0 |
| 0.004 | | | | 10.0 | | | 1:2500 | 100 | 100 |
| 0.004 | | | | 2.0 | | | 1:500 | 100 | 100 |
| 0.004 | | | | 0.4 | | | 1:100 | 0 | 4 |
| 0.004 | | | | 0.08 | | | 1:20 | 0 | 4 |
| 0.1 | | | | | 100.0 | | 1:1000 | 100 | 82 |
| 0.1 | | | | | 20.0 | | 1:200 | 95 | 98 |
| 0.1 | | | | | 4.0 | | 1:40 | 0 | 0 |
| 0.1 | | | | | 0.8 | | 1:8 | 0 | 0 |
| 0.1 | | | | | | 200.0 | 1:2000 | 44 | 0 |
| 0.1 | | | | | | 40.0 | 1:400 | 0 | 2 |
| 0.1 | | | | | | 8.0 | 1:80 | 1 | 7 |
| 0.1 | | | | | | 1.6 | 1:16 | 0 | 6 |
| 0.02 | | | | | | 200.0 | 1:10000 | 5 | 3 |
| 0.02 | | | | | | 40.0 | 1:2000 | 18 | 5 |
| 0.02 | | | | | | 8.0 | 1:400 | 2 | 10 |
| 0.02 | | | | | | 1.6 | 1:80 | 9 | 9 |
| 0.004 | | | | | | 200.0 | 1:50000 | 12 | 0 |
| 0.004 | | | | | | 40.0 | 1:10000 | 0 | 2 |
| 0.004 | | | | | | 8.0 | 1:2000 | 23 | 7 |
| 0.004 | | | | | | 1.6 | 1:400 | 22 | 6 |
| 0.0008 | | | | | | 200.0 | 1:250000 | 2 | 3 |
| 0.0008 | | | | | | 40.0 | 1:50000 | 3 | 5 |
| 0.0008 | | | | | | 8.0 | 1:10000 | 12 | 10 |
| 0.0008 | | | | | | 1.6 | 1:2000 | 19 | 9 |

TABLE G5 in vitro—Test with *Fusarium culmorum*

| (I-339) (ppm) | (17.001) (ppm) | (3.025) fenpicoxamid (ppm) | (13.001) fludioxonil (ppm) | (2.005) fluopyram (ppm) | (3.012) fluoxastrobin (ppm) | (1.062) fluoxytioconazole (ppm) | Ratio | Efficacy % | Colby expected value % |
|---|---|---|---|---|---|---|---|---|---|
| 1 | | | | | | | | 99 | |
| 0.2 | | | | | | | | 14 | |
| 0.04 | | | | | | | | 0 | |
| 0.008 | | | | | | | | 0 | |
| | 200 | | | | | | | 0 | |
| | 40 | | | | | | | 0 | |
| | 8 | | | | | | | 0 | |
| | | 0.008 | | | | | | 10 | |
| | | | 5 | | | | | 98 | |
| | | | 1 | | | | | 68 | |
| | | | 0.2 | | | | | 22 | |
| | | | 0.04 | | | | | 0 | |
| | | | | 4 | | | | 21 | |
| | | | | 0.16 | | | | 31 | |
| | | | | | 0.08 | | | 19 | |
| | | | | | 0.016 | | | 12 | |
| | | | | | | 1 | | 27 | |
| | | | | | | 0.008 | | 12 | |
| 0.2 | 200 | | | | | | 1:1000 | 33 | 14 |
| 0.2 | 40 | | | | | | 1:200 | 32 | 14 |
| 0.2 | 8 | | | | | | 1:40 | 13 | 14 |
| 0.008 | 200 | | | | | | 1:25000 | 21 | 0 |
| 0.008 | 40 | | | | | | 1:5000 | 0 | 0 |
| 0.008 | 8 | | | | | | 1:1000 | 0 | 0 |

TABLE G5-continued in vitro—Test with *Fusarium culmorum*

| (I-339) (ppm) | (17.001) (ppm) | (3.025) fenpicoxamid (ppm) | (13.001) fludioxonil (ppm) | (2.005) fluopyram (ppm) | (3.012) fluoxastrobin (ppm) | (1.062) fluoxytioconazole (ppm) | Ratio | Efficacy % | Colby expected value % |
|---|---|---|---|---|---|---|---|---|---|
| 1 | | 0.008 | | | | | 1:0.008 | 100 | 99 |
| 0.2 | | 0.008 | | | | | 1:0.04 | 66 | 21 |
| 0.008 | | 0.008 | | | | | 1:1 | 15 | 17 |
| 0.2 | | | 5 | | | | 1:25 | 97 | 98 |
| 0.2 | | | 1 | | | | 1:5 | 93 | 72 |
| 0.2 | | | 0.2 | | | | 1:1 | 89 | 31 |
| 0.2 | | | 0.04 | | | | 1:0.2 | 60 | 11 |
| 0.04 | | | 5 | | | | 1:125 | 98 | 98 |
| 0.04 | | | 1 | | | | 1:25 | 86 | 68 |
| 0.04 | | | 0.2 | | | | 1:5 | 29 | 22 |
| 0.04 | | | 0.04 | | | | 1:1 | 0 | 0 |
| 0.008 | | | 5 | | | | 1:625 | 98 | 98 |
| 0.008 | | | 1 | | | | 1:125 | 86 | 71 |
| 0.008 | | | 0.2 | | | | 1:25 | 29 | 28 |
| 0.2 | | | | 4 | | | 1:20 | 45 | 33 |
| 0.2 | | | | 0.16 | | | 1:0.8 | 50 | 42 |
| 0.008 | | | | 4 | | | 1:500 | 29 | 27 |
| 0.008 | | | | 0.16 | | | 1:20 | 48 | 37 |
| 1 | | | | | 0.08 | | 1:0.08 | 100 | 99 |
| 1 | | | | | 0.016 | | 1:0.016 | 100 | 99 |
| 0.2 | | | | | 0.08 | | 1:0.4 | 33 | 32 |
| 0.2 | | | | | 0.016 | | 1:0.08 | 88 | 26 |
| 0.008 | | | | | 0.08 | | 1:10 | 43 | 26 |
| 0.008 | | | | | 0.016 | | 1:2 | 23 | 20 |
| 1 | | | | | | 1 | 1:1 | 97 | 99 |
| 1 | | | | | | 0.008 | 1:0.008 | 100 | 99 |
| 0.2 | | | | | | 1 | 1:5 | 43 | 39 |
| 0.2 | | | | | | 0.008 | 1:0.04 | 49 | 26 |
| 0.04 | | | | | | 1 | 1:25 | 46 | 29 |
| 0.04 | | | | | | 0.008 | 1:0.2 | 5 | 14 |

TABLE G6 in vitro—Test with *Fusarium culmorum*

| (I-339) (ppm) | (15.012) fosetylal (ppm) | (2.028) inpyrfluxam (ppm) | (2.038) isoflucypram (ppm) | (12.004) metalaxyl-m (ppm) | (15.016) metrafenone (ppm) | (3.030) metyltetraprole (ppm) | Ratio | Efficacy % | Colby expected value % |
|---|---|---|---|---|---|---|---|---|---|
| 1 | | | | | | | | 99 | |
| 0.2 | | | | | | | | 14 | |
| 0.04 | | | | | | | | 0 | |
| 0.008 | | | | | | | | 0 | |
| | 0.8 | | | | | | | 11 | |
| | | 1 | | | | | | 24 | |
| | | 0.04 | | | | | | 8 | |
| | | 0.008 | | | | | | 5 | |
| | | | 1 | | | | | 24 | |
| | | | 0.2 | | | | | 10 | |
| | | | 0.04 | | | | | 0 | |
| | | | 0.008 | | | | | 0 | |
| | | | | 4 | | | | 0 | |
| | | | | 0.8 | | | | 0 | |
| | | | | | 1 | | | 4 | |
| | | | | | | 0.2 | | 13 | |
| 1 | 0.8 | | | | | | 1:0.8 | 99 | 99 |
| 0.2 | 0.8 | | | | | | 1:4 | 66 | 62 |
| 0.008 | 0.8 | | | | | | 1:100 | 11 | 11 |
| 0.2 | | 1 | | | | | 1:5 | 79 | 68 |
| 0.2 | | 0.04 | | | | | 1:0.2 | 73 | 61 |
| 0.2 | | 0.008 | | | | | 1:0.04 | 62 | 60 |
| 0.008 | | | 1 | | | | 1:125 | 23 | 24 |
| 0.008 | | | 0.2 | | | | 1:25 | 17 | 10 |
| 0.008 | | | 0.04 | | | | 1:5 | 13 | 0 |
| 0.008 | | | 0.008 | | | | 1:1 | 0 | 0 |
| 1 | | | | 4 | | | 1:4 | 100 | 99 |
| 1 | | | | 0.8 | | | 1:0.8 | 100 | 99 |
| 0.008 | | | | 4 | | | 1:500 | 20 | 10 |
| 0.008 | | | | 0.8 | | | 1:100 | 13 | 10 |
| 1 | | | | | 1 | | 1:1 | 99 | 99 |

TABLE G6-continued in vitro—Test with *Fusarium culmorum*

| (I-339) (ppm) | (15.012) fosetylal (ppm) | (2.028) inpyrfluxam (ppm) | (2.038) isoflucypram (ppm) | (12.004) metalaxyl-m (ppm) | (15.016) metrafenone (ppm) | (3.030) metyltetraprole (ppm) | Ratio | Efficacy % | Colby expected value % |
|---|---|---|---|---|---|---|---|---|---|
| 0.2 | | | | | 1 | | 1:5 | 86 | 53 |
| 0.04 | | | | | 1 | | 1:25 | 1 | 4 |
| 1 | | | | | | 0.2 | 1:0.2 | 99 | 99 |
| 0.2 | | | | | | 0.2 | 1:1 | 81 | 58 |
| 0.008 | | | | | | 0.2 | 1:25 | 24 | 26 |

TABLE G7 in vitro—Test with *Fusarium culmorum*

| (I-339) (ppm) | (17.012) *Paenibacillus terrae* (ppm) | (2.017) penflufen (ppm) | (5.018) propineb (ppm) | (13.004) proquinazid (ppm) | (1.018) prothioconazole (ppm) | (7.005) pyrimethanil (ppm) | Ratio | Efficacy % | Colby expected value % |
|---|---|---|---|---|---|---|---|---|---|
| 1 | | | | | | | | 99 | |
| 0.2 | | | | | | | | 14 | |
| 0.04 | | | | | | | | 0 | |
| 0.008 | | | | | | | | 0 | |
| | 200 | | | | | | | 99 | |
| | 40 | | | | | | | 5 | |
| | 8 | | | | | | | 10 | |
| | | 0.04 | | | | | | 4 | |
| | | | 4 | | | | | 12 | |
| | | | 0.8 | | | | | 2 | |
| | | | | 0.4 | | | | 0 | |
| | | | | 0.08 | | | | 18 | |
| | | | | | 0.1 | | | 98 | |
| | | | | | 0.02 | | | 52 | |
| | | | | | 0.004 | | | 6 | |
| | | | | | | 0.8 | | 5 | |
| 0.2 | 200 | | | | | | 1:1000 | 100 | 100 |
| 0.2 | 40 | | | | | | 1:200 | 55 | 54 |
| 0.2 | 8 | | | | | | 1:40 | 65 | 56 |
| 1 | | 0.04 | | | | | 1:0.04 | 100 | 99 |
| 0.2 | | 0.04 | | | | | 1:0.2 | 73 | 53 |
| 0.2 | | | 4 | | | | 1:20 | 62 | 59 |
| 0.2 | | | 0.8 | | | | 1:4 | 72 | 54 |
| 0.008 | | | 4 | | | | 1:500 | 7 | 12 |
| 0.008 | | | 0.8 | | | | 1:100 | 15 | 2 |
| 1 | | | | 0.4 | | | 1:0.4 | 99 | 99 |
| 1 | | | | 0.08 | | | 1:0.08 | 100 | 00 |
| 0.2 | | | | 0.4 | | | 1:2 | 55 | 53 |
| 0.2 | | | | 0.08 | | | 1:0.4 | 66 | 62 |
| 0.008 | | | | 0.4 | | | 1:50 | 12 | 0 |
| 0.04 | | | | | 0.1 | | 1:2.5 | 99 | 98 |
| 0.04 | | | | | 0.02 | | 1:0.5 | 92 | 54 |
| 0.04 | | | | | 0.004 | | 1:0.1 | 29 | 10 |
| 0.008 | | | | | 0.1 | | 1:12.5 | 98 | 98 |
| 0.008 | | | | | 0.02 | | 1:2.5 | 60 | 52 |
| 0.008 | | | | | 0.004 | | 1:0.5 | 26 | 6 |
| 1 | | | | | | 0.8 | 1:0.8 | 100 | 99 |
| 0.2 | | | | | | 0.8 | 1:4 | 67 | 56 |
| 0.008 | | | | | | 0.8 | 1:100 | 12 | 5 |

TABLE G8 in vitro—Test with *Fusarium culmorum*

| (I-339) (ppm) | (1.020) spiroxamin (ppm) | (1.021) tebuconazole (ppm) | (I-338) (ppm) | (1.067) (ppm) | (2.002) bixafen (ppm) | (1.002) difenoconazole (ppm) | Ratio | Efficacy % | Colby expected value % |
|---|---|---|---|---|---|---|---|---|---|
| 1 | | | | | | | | 99 | |
| 0.2 | | | | | | | | 14 | |

TABLE G8-continued in vitro—Test with *Fusarium culmorum*

| (I-339) (ppm) | (1.020) spiroxamin (ppm) | (1.021) tebuconazole (ppm) | (I-338) (ppm) | (1.067) (ppm) | (2.002) bixafen (ppm) | (1.002) difenoconazole (ppm) | Ratio | Efficacy % | Colby expected value % |
|---|---|---|---|---|---|---|---|---|---|
| 0.04 | | | | | | | | 0 | |
| 0.008 | | | | | | | | 0 | |
| | 0.8 | | | | | | | 3 | |
| | 0.16 | | | | | | | 25 | |
| | | 1 | | | | | | 79 | |
| | | | 1 | | | | | 0 | |
| | | | 0.2 | | | | | 0 | |
| | | | 0.04 | | | | | 21 | |
| | | | 0.008 | | | | | 22 | |
| | | | | 2 | | | | 99 | |
| | | | | 0.4 | | | | 26 | |
| | | | | 0.08 | | | | 30 | |
| | | | | 0.016 | | | | 40 | |
| | | | | | 0.04 | | | 17 | |
| | | | | | 0.008 | | | 2 | |
| | | | | | | 0.04 | | 26 | |
| 1 | 0.8 | | | | | | 1:0.8 | 99 | 99 |
| 1 | 0.16 | | | | | | 1:0.16 | 100 | 99 |
| 0.2 | 0.8 | | | | | | 1:4 | 54 | 54 |
| 0.2 | 0.16 | | | | | | 1:0.8 | 66 | 64 |
| 1 | | 1 | | | | | 1:1 | 98 | 100 |
| 0.2 | | 1 | | | | | 1:5 | 94 | 90 |
| 0.04 | | 1 | | | | | 1:25 | 92 | 79 |
| | | | 0.2 | 2 | | | 1:10 | 99 | 99 |
| | | | 0.2 | 0.4 | | | 1:2 | 28 | 26 |
| | | | 0.2 | 0.08 | | | 1:0.4 | 41 | 30 |
| | | | 0.2 | 0.016 | | | 1:0.08 | 41 | 40 |
| | | | 0.2 | | 0.04 | | 1:0.2 | 30 | 17 |
| | | | 0.2 | | 0.008 | | 1:0.04 | 25 | 2 |
| | | | 0.04 | | 0.04 | | 1:1 | 49 | 34 |
| | | | 0.04 | | 0.008 | | 1:0.2 | 21 | 22 |
| | | | 1 | | | 0.04 | 1:0.04 | 27 | 26 |
| | | | 0.2 | | | 0.04 | 1:0.2 | 50 | 27 |
| | | | 0.04 | | | 0.04 | 1:1 | 39 | 29 |
| | | | 0.008 | | | 0.04 | 1:5 | 34 | 26 |

TABLE G9 in vitro-Test with *Fusarium* culmorum

| (I-338) (ppm) | (5.010) dithianon (ppm) | (3.025) fenpicox-amid (ppm) | (13.001) fludioxo-nil (ppm) | (3.012) fluoxa-strobin (ppm) | (15.012) fosetylal (ppm) | (2.028) inpyr-fluxam (ppm) | Ratio | Efficacy % | Colby expected value % |
|---|---|---|---|---|---|---|---|---|---|
| 1 | | | | | | | | 0 | |
| 0.2 | | | | | | | | 1 | |
| 0.04 | | | | | | | | 4 | |
| 0.008 | | | | | | | | 0 | |
| | 0.08 | | | | | | | 4 | |
| | | 0.2 | | | | | | 18 | |
| | | 0.04 | | | | | | 1 | |
| | | 0.008 | | | | | | 7 | |
| | | | 0.04 | | | | | 0 | |
| | | | | 2 | | | | 37 | |
| | | | | | 100 | | | 30 | |
| | | | | | 20 | | | 11 | |
| | | | | | 4 | | | 5 | |
| | | | | | | 0.04 | | 10 | |
| 1 | 0.08 | | | | | | 1:0.08 | 20 | 4 |
| 0.2 | 0.08 | | | | | | 1:0.4 | 24 | 6 |
| 0.04 | 0.08 | | | | | | 1:2 | 29 | 8 |
| 0.008 | 0.08 | | | | | | 1:10 | 15 | 4 |
| 0.2 | | 0.2 | | | | | 1:1 | 24 | 19 |
| 0.2 | | 0.04 | | | | | 1:0.2 | 23 | 3 |
| 0.2 | | 0.008 | | | | | 1:0.04 | 18 | 8 |
| 1 | | | 0.04 | | | | 1:0.04 | 19 | 0 |
| 0.2 | | | 0.04 | | | | 1:0.2 | 17 | 1 |
| 0.04 | | | 0.04 | | | | 1:1 | 8 | 4 |
| 0.008 | | | 0.04 | | | | 1:5 | 0 | 0 |

TABLE G9-continued

| in vitro-Test with *Fusarium* culmorum | | | | | | | | | |
|---|---|---|---|---|---|---|---|---|---|
| (I-338) (ppm) | (5.010) dithianon (ppm) | (3.025) fenpicox-amid (ppm) | (13.001) fludioxo-nil (ppm) | (3.012) fluoxa-strobin (ppm) | (15.012) fosetylal (ppm) | (2.028) inpyr-fluxam (ppm) | Ratio | Efficacy % | Colby expected value % |
| 0.2 | | | | 2 | | | 1:10 | 42 | 41 |
| 0.04 | | | | 2 | | | 1:50 | 44 | 43 |
| 0.008 | | | | 2 | | | 1:250 | 43 | 37 |
| 1 | | | | | 100 | | 1:100 | 33 | 30 |
| 1 | | | | | 20 | | 1:20 | 22 | 11 |
| 1 | | | | | 4 | | 1:4 | 18 | 5 |
| 1 | | | | | | 0.04 | 1:0.04 | 31 | 10 |
| 0.2 | | | | | | 0.04 | 1:0.2 | 16 | 15 |
| 0.04 | | | | | | 0.04 | 1:1 | 19 | 10 |
| 0.008 | | | | | | 0.04 | 1:5 | 31 | 12 |

TABLE G10

| in vitro-Test with *Fusarium* culmorum | | | | | | | | | |
|---|---|---|---|---|---|---|---|---|---|
| (I-338) (ppm) | (2.038) isoflucy-pram (ppm) | (5.013) manco zeb (ppm) | (1.055) mefentri-fluconazole (ppm) | (12.004) meta-laxyl-m (ppm) | (15.016) metra-fenone (ppm) | (3.030) metyl-tetra-prole (ppm) | Ratio | Efficacy % | Colby expected value % |
| 1 | | | | | | | | 0 | |
| 0.2 | | | | | | | | 6 | |
| 0.04 | | | | | | | | 0 | |
| 0.008 | | | | | | | | 1 | |
| | 0.2 | | | | | | | 19 | |
| | 0.04 | | | | | | | 10 | |
| | | 20 | | | | | | 50 | |
| | | 0.8 | | | | | | 0 | |
| | | | 1 | | | | | 24 | |
| | | | 0.04 | | | | | 16 | |
| | | | 0.008 | | | | | 11 | |
| | | | | 100 | | | | 22 | |
| | | | | | 5 | | | 13 | |
| | | | | | 1 | | | 7 | |
| | | | | | 0.2 | | | 0 | |
| | | | | | 0.04 | | | 0 | |
| | | | | | | 1 | | 8 | |
| | | | | | | 0.2 | | 6 | |
| | | | | | | 0.04 | | 8 | |
| | | | | | | 0.008 | | 7 | |
| 1 | 0.2 | | | | | | 1:0.2 | 26 | 19 |
| 1 | 0.04 | | | | | | 1:0.04 | 16 | 10 |
| 0.2 | 0.2 | | | | | | 1:1 | 23 | 23 |
| 0.2 | 0.04 | | | | | | 1:0.2 | 21 | 15 |
| 0.04 | 0.2 | | | | | | 1:5 | 27 | 19 |
| 0.04 | 0.04 | | | | | | 1:1 | 9 | 10 |
| 1 | | 20 | | | | | 1:20 | 86 | 53 |
| 1 | | 0.8 | | | | | 1:0.8 | 8 | 5 |
| 0.008 | | 20 | | | | | 1:2500 | 60 | 54 |
| 0.008 | | 0.8 | | | | | 1:100 | 14 | 6 |
| 0.2 | | | 1 | | | | 1:5 | 43 | 24 |
| 0.2 | | | 0.04 | | | | 1:0.2 | 29 | 16 |
| 0.2 | | | 0.008 | | | | 1:0.04 | 12 | 11 |
| 0.04 | | | 0.04 | | | | 1:1 | 33 | 16 |
| 0.04 | | | 0.008 | | | | 1:0.2 | 12 | 11 |
| 1 | | | | 100 | | | 1:100 | 29 | 26 |
| 0.2 | | | | 100 | | | 1:500 | 24 | 22 |
| 0.008 | | | | 100 | | | 1:12500 | 29 | 27 |
| 0.2 | | | | | 5 | | 1:25 | 22 | 14 |
| 0.2 | | | | | 1 | | 1:5 | 17 | 8 |
| 0.2 | | | | | 0.2 | | 1:1 | 7 | 0 |
| 0.2 | | | | | 0.04 | | 1:0.2 | 17 | 0 |
| 0.04 | | | | | 5 | | 1:125 | 20 | 17 |
| 0.04 | | | | | 1 | | 1:25 | 13 | 11 |
| 0.04 | | | | | 0.2 | | 1:5 | 22 | 5 |
| 0.04 | | | | | 0.04 | | 1:1 | 16 | 5 |
| 0.04 | | | | | | 0.2 | 1:5 | 28 | 11 |
| 0.008 | | | | | | 1 | 1:125 | 20 | 11 |
| 0.008 | | | | | | 0.2 | 1:25 | 11 | 10 |

TABLE G10-continued

| in vitro-Test with *Fusarium* culmorum | | | | | | | | | |
|---|---|---|---|---|---|---|---|---|---|
| (I-338) (ppm) | (2.038) isoflucy-pram (ppm) | (5.013) manco zeb (ppm) | (1.055) mefentri-fluconazole (ppm) | (12.004) meta-laxyl-m (ppm) | (15.016) metra-fenone (ppm) | (3.030) metyl-tetra-prole (ppm) | Ratio | Efficacy % | Colby expected value % |
| 0.008 | | | | | | 0.04 | 1:5 | 11 | 11 |
| 0.008 | | | | | | 0.008 | 1:1 | 16 | 10 |

TABLE G11

| in vitro-Test with *Fusarium* culmorum | | | | | | | | | |
|---|---|---|---|---|---|---|---|---|---|
| (I-338) (ppm) | (17.012) *Paeni-bacillus* terrae (ppm) | (2.017) pen-flufen (ppm) | (5.018) pro-pineb (ppm) | (13.004) pro-quinazid (ppm) | (1.018) prothio-conazole (ppm) | (7.005) pyri-methanil (ppm) | Ratio | Efficacy % | Colby expected value % |
| 1 | | | | | | | | 11 | |
| 0.2 | | | | | | | | 0 | |
| 0.04 | | | | | | | | 5 | |
| 0.008 | | | | | | | | 3 | |
| | 200 | | | | | | | 98 | |
| | | 5 | | | | | | 11 | |
| | | 0.2 | | | | | | 10 | |
| | | | 100 | | | | | 49 | |
| | | | 4 | | | | | 8 | |
| | | | | 10 | | | | 17 | |
| | | | | 2 | | | | 8 | |
| | | | | 0.4 | | | | 11 | |
| | | | | | 0.02 | | | 22 | |
| | | | | | 0.004 | | | 22 | |
| | | | | | | 20 | | 24 | |
| | | | | | | 0.8 | | 8 | |
| | | | | | | 0.16 | | 10 | |
| 1 | 200 | | | | | | 1:200 | 100 | 98 |
| 0.2 | 200 | | | | | | 1:1000 | 100 | 98 |
| 0.04 | 200 | | | | | | 1:5000 | 100 | 98 |
| 1 | | 5 | | | | | 1:5 | 36 | 21 |
| 1 | | 0.2 | | | | | 1:0.2 | 21 | 20 |
| 0.2 | | 5 | | | | | 1:25 | 21 | 11 |
| 0.2 | | 0.2 | | | | | 1:1 | 28 | 11 |
| 0.04 | | 5 | | | | | 1:125 | 21 | 15 |
| 0.04 | | 0.2 | | | | | 1:5 | 35 | 14 |
| 0.008 | | 5 | | | | | 1:625 | 28 | 14 |
| 0.008 | | 0.2 | | | | | 1:25 | 16 | 13 |
| 1 | | | 100 | | | | 1:100 | 63 | 49 |
| 1 | | | 4 | | | | 1:4 | 11 | 8 |
| 0.04 | | | 100 | | | | 1:2500 | 54 | 49 |
| 0.04 | | | 4 | | | | 1:100 | 8 | 8 |
| 1 | | | | 10 | | | 1:10 | 24 | 17 |
| 1 | | | | 2 | | | 1:2 | 9 | 8 |
| 1 | | | | 0.4 | | | 1:0.4 | 16 | 11 |
| 1 | | | | | 0.02 | | 1:0.02 | 42 | 22 |
| 1 | | | | | 0.004 | | 1:0.004 | 30 | 22 |
| 0.2 | | | | | 0.02 | | 1:0.1 | 31 | 22 |
| 0.2 | | | | | 0.004 | | 1:0.02 | 27 | 22 |
| 0.04 | | | | | 0.02 | | 1:0.5 | 24 | 22 |
| 0.04 | | | | | 0.004 | | 1:0.1 | 27 | 22 |
| 0.008 | | | | | 0.02 | | 1:2.5 | 33 | 22 |
| 0.008 | | | | | 0.004 | | 1:0.5 | 30 | 22 |
| 1 | | | | | | 20 | 1:20 | 29 | 24 |
| 1 | | | | | | 0.8 | 1:0.8 | 25 | 8 |
| 1 | | | | | | 0.16 | 1:0.16 | 20 | 10 |

TABLE G12 in vitro-Test with *Fusarium* culmorum

| (I-338) (ppm) | (13.005) quinoxy-fen (ppm) | (I-130) (ppm) | (17.001) (ppm) | (1.067) (ppm) | (2.002) bixafen (ppm) | (5.003) captan (ppm) | Ratio | Efficacy % | Colby expected value % |
|---|---|---|---|---|---|---|---|---|---|
| 1 | | | | | | | | 13 | |
| 0.2 | | | | | | | | 21 | |
| 0.04 | | | | | | | | 13 | |
| 0.008 | | | | | | | | 4 | |
| | 10 | | | | | | | 8 | |
| | 0.4 | | | | | | | 2 | |
| | 0.08 | | | | | | | 0 | |
| | | 1 | | | | | | 22 | |
| | | 0.2 | | | | | | 24 | |
| | | 0.04 | | | | | | 5 | |
| | | 0.008 | | | | | | 1 | |
| | | | 200 | | | | | 18 | |
| | | | 40 | | | | | 12 | |
| | | | 1.6 | | | | | 5 | |
| | | | | 2 | | | | 97 | |
| | | | | 0.08 | | | | 22 | |
| | | | | 0.016 | | | | 23 | |
| | | | | | 1 | | | 18 | |
| | | | | | 0.2 | | | 11 | |
| | | | | | 0.04 | | | 7 | |
| | | | | | 0.008 | | | 2 | |
| | | | | | | 5 | | 100 | |
| | | | | | | 1 | | 18 | |
| | | | | | | 0.2 | | 16 | |
| | | | | | | 0.04 | | 0 | |
| 1 | 10 | | | | | | 1:10 | 25 | 21 |
| 1 | 0.4 | | | | | | 1:0.4 | 24 | 15 |
| 1 | 0.08 | | | | | | 1:0.08 | 40 | 13 |
| | | 1 | 200 | | | | 1:200 | 44 | 35 |
| | | 1 | 40 | | | | 1:40 | 54 | 31 |
| | | 1 | 1.6 | | | | 1:1.6 | 24 | 25 |
| | | 0.008 | | 2 | | | 1:250 | 99 | 97 |
| | | 0.008 | | 0.08 | | | 1:10 | 29 | 22 |
| | | 0.008 | | 0.016 | | | 1:2 | 25 | 23 |
| | | 1 | | | 1 | | 1:1 | 37 | 36 |
| | | 1 | | | 0.04 | | 1:0.04 | 46 | 27 |
| | | 0.04 | | | 1 | | 1:25 | 29 | 22 |
| | | 0.04 | | | 0.2 | | 1:5 | 28 | 15 |
| | | 0.008 | | | 1 | | 1:125 | 25 | 18 |
| | | 0.008 | | | 0.2 | | 1:25 | 26 | 11 |
| | | 0.008 | | | 0.04 | | 1:5 | 24 | 7 |
| | | 0.008 | | | 0.008 | | 1:1 | 3 | 2 |
| | | 1 | | | | 5 | 1:5 | 99 | 100 |
| | | 1 | | | | 1 | 1:1 | 68 | 36 |
| | | 1 | | | | 0.04 | 1:0.04 | 49 | 22 |
| | | 0.008 | | | | 1 | 1:125 | 28 | 19 |
| | | 0.008 | | | | 0.2 | 1:25 | 21 | 16 |
| | | 0.008 | | | | 0.04 | 1:5 | 0 | 1 |

TABLE G13 in vitro-Test with *Fusarium* culmorum

| (I-130) (ppm) | (3.025) fen-picox-amid (ppm) | (13.001) flu-dioxonil (ppm) | (2.005) fluo-pyram (ppm) | (15.043) fluoxa-piprolin (ppm) | (3.012) fluoxa-strobin (ppm) | (1.062) fluoxy-tiocona-zole (ppm) | Ratio | Efficacy % | Colby expected value % |
|---|---|---|---|---|---|---|---|---|---|
| 1 | | | | | | | | 31 | |
| 0.2 | | | | | | | | 16 | |
| 0.04 | | | | | | | | 11 | |
| 0.008 | | | | | | | | 3 | |
| | 1 | | | | | | | 17 | |
| | 0.2 | | | | | | | 25 | |
| | 0.04 | | | | | | | 9 | |
| | 0.008 | | | | | | | 5 | |
| | | 1 | | | | | | 88 | |
| | | 0.2 | | | | | | 26 | |

TABLE G13-continued in vitro-Test with *Fusarium* culmorum

| (I-130) (ppm) | (3.025) fen-picox-amid (ppm) | (13.001) flu-dioxonil (ppm) | (2.005) fluo-pyram (ppm) | (15.043) fluoxa-piprolin (ppm) | (3.012) fluoxa-strobin (ppm) | (1.062) fluoxy-tiocona-zole (ppm) | Ratio | Efficacy % | Colby expected value % |
|---|---|---|---|---|---|---|---|---|---|
| | | 0.04 | | | | | | 0 | |
| | | | 20 | | | | | 37 | |
| | | | 0.8 | | | | | 20 | |
| | | | 0.16 | | | | | 19 | |
| | | | | 4 | | | | 14 | |
| | | | | 0.8 | | | | 13 | |
| | | | | | 0.4 | | | 47 | |
| | | | | | 0.08 | | | 27 | |
| | | | | | 0.016 | | | 9 | |
| | | | | | | 1 | | 30 | |
| 1 | 1 | | | | | | 1:1 | 72 | 50 |
| 1 | 0.2 | | | | | | 1:0.2 | 77 | 55 |
| 1 | 0.04 | | | | | | 1:0.04 | 78 | 45 |
| 1 | 0.008 | | | | | | 1:0.008 | 77 | 43 |
| 1 | | 1 | | | | | 1:1 | 94 | 93 |
| 1 | | 0.2 | | | | | 1:0.2 | 94 | 55 |
| 1 | | 0.04 | | | | | 1:0.04 | 67 | 40 |
| 0.04 | | 1 | | | | | 1:25 | 91 | 89 |
| 0.04 | | 0.2 | | | | | 1:5 | 69 | 36 |
| 0.008 | | | 20 | | | | 1:2500 | 42 | 37 |
| 0.008 | | | 0.8 | | | | 1:100 | 25 | 20 |
| 0.008 | | | 0.16 | | | | 1:20 | 27 | 19 |
| 0.04 | | | | 4 | | | 1:100 | 23 | 21 |
| 0.04 | | | | 0.8 | | | 1:20 | 18 | 20 |
| 0.008 | | | | 4 | | | 1:500 | 20 | 14 |
| 0.008 | | | | 0.8 | | | 1:100 | 23 | 13 |
| 1 | | | | | 0.4 | | 1:2 | 72 | 66 |
| 1 | | | | | 0.08 | | 1:0.4 | 56 | 54 |
| 1 | | | | | 0.016 | | 1:0.08 | 58 | 43 |
| 1 | | | | | | 1 | 1:1 | 60 | 56 |
| 0.2 | | | | | | 1 | 1:5 | 57 | 48 |
| 0.04 | | | | | | 1 | 1:25 | 51 | 35 |
| 0.008 | | | | | | 1 | 1:125 | 33 | 30 |

TABLE G14 in vitro-Test with *Fusarium* culmorum

| (I-130) (ppm) | (2.038) isoflucy-pram (ppm) | (6.002) isotianil (ppm) | (5.013) manco-zeb (ppm) | (1.055) mefen-triflu-conazole (ppm) | (12.004) meta-laxyl-m (ppm) | (15.016) metra-fenone (ppm) | Ratio | Efficacy % | Colby expected value % |
|---|---|---|---|---|---|---|---|---|---|
| 1 | | | | | | | | 31 | |
| 0.2 | | | | | | | | 16 | |
| 0.04 | | | | | | | | 11 | |
| 0.008 | | | | | | | | 3 | |
| | 0.2 | | | | | | | 20 | |
| | | 100 | | | | | | 20 | |
| | | 20 | | | | | | 14 | |
| | | 4 | | | | | | 16 | |
| | | 0.8 | | | | | | 7 | |
| | | | 20 | | | | | 31 | |
| | | | 4 | | | | | 16 | |
| | | | 0.8 | | | | | 0 | |
| | | | 0.16 | | | | | 0 | |
| | | | | 1 | | | | 33 | |
| | | | | 0.04 | | | | 24 | |
| | | | | 0.008 | | | | 3 | |
| | | | | | 100 | | | 23 | |
| | | | | | | 5 | | 13 | |
| | | | | | | 1 | | 13 | |
| | | | | | | 0.2 | | 0 | |
| | | | | | | 0.04 | | 0 | |
| 0.04 | 0.2 | | | | | | 1:5 | 41 | 30 |
| 0.008 | 0.2 | | | | | | 1:25 | 25 | 25 |
| 1 | | 100 | | | | | 1:100 | 54 | 33 |

TABLE G14-continued in vitro-Test with *Fusarium* culmorum

| (I-130) (ppm) | (2.038) isoflucy-pram (ppm) | (6.002) isotianil (ppm) | (5.013) manco-zeb (ppm) | (1.055) mefen-triflu-conazole (ppm) | (12.004) meta-laxyl-m (ppm) | (15.016) metra-fenone (ppm) | Ratio | Efficacy % | Colby expected value % |
|---|---|---|---|---|---|---|---|---|---|
| 1 | | 20 | | | | | 1:20 | 50 | 29 |
| 1 | | 4 | | | | | 1:4 | 43 | 30 |
| 1 | | 0.8 | | | | | 1:0.8 | 31 | 23 |
| 1 | | | 20 | | | | 1:20 | 86 | 43 |
| 1 | | | 4 | | | | 1:4 | 49 | 30 |
| 1 | | | 0.8 | | | | 1:0.8 | 46 | 17 |
| 1 | | | 0.16 | | | | 1:0.16 | 43 | 17 |
| 0.2 | | | 20 | | | | 1:100 | 60 | 40 |
| 0.04 | | | 20 | | | | 1:500 | 47 | 39 |
| 0.008 | | | 20 | | | | 1:2500 | 52 | 37 |
| 0.04 | | | | 0.04 | | | 1:1 | 37 | 33 |
| 0.04 | | | | 0.008 | | | 1:0.2 | 14 | 15 |
| 0.008 | | | | 1 | | | 1:125 | 43 | 39 |
| 0.008 | | | | 0.008 | | | 1:1 | 15 | 11 |
| 1 | | | | | 100 | | 1:100 | 56 | 37 |
| 0.008 | | | | | 100 | | 1:12500 | 34 | 30 |
| 1 | | | | | | 5 | 1:5 | 86 | 29 |
| 1 | | | | | | 1 | 1:1 | 57 | 29 |
| 1 | | | | | | 0.2 | 1:0.2 | 25 | 19 |
| 1 | | | | | | 0.04 | 1:0.04 | 21 | 19 |

TABLE G15 in vitro-Test with *Fusarium* culmorum

| (I-130) (ppm) | (3.030) metyl-tetra-prole (ppm) | (17.012) *Paeni-bacillus* terrae (ppm) | (2.017) pen-flufen (ppm) | (5.018) pro-pineb (ppm) | (13.004) pro-quinazid (ppm) | (1.018) prothio-conazole (ppm) | (7.005) pyri-methanil (ppm) | Ratio | Efficacy % | Colby expected value % |
|---|---|---|---|---|---|---|---|---|---|---|
| 1 | | | | | | | | | 19 | |
| 0.2 | | | | | | | | | 0 | |
| 0.04 | | | | | | | | | 0 | |
| 0.008 | | | | | | | | | 0 | |
| | 1 | | | | | | | | 2 | |
| | 0.2 | | | | | | | | 5 | |
| | 0.04 | | | | | | | | 0 | |
| | 0.008 | | | | | | | | 0 | |
| | | 200 | | | | | | | 100 | |
| | | 40 | | | | | | | 38 | |
| | | 8 | | | | | | | 20 | |
| | | 1.6 | | | | | | | 4 | |
| | | | 5 | | | | | | 8 | |
| | | | 1 | | | | | | 11 | |
| | | | 0.2 | | | | | | 2 | |
| | | | | 100 | | | | | 97 | |
| | | | | 4 | | | | | 9 | |
| | | | | 0.8 | | | | | 6 | |
| | | | | | 10 | | | | 1 | |
| | | | | | 2 | | | | 7 | |
| | | | | | 0.08 | | | | 2 | |
| | | | | | | 0.02 | | | 23 | |
| | | | | | | | 20 | | 21 | |
| | | | | | | | 4 | | 16 | |
| 1 | 1 | | | | | | | 1:1 | 49 | 20 |
| 1 | 0.2 | | | | | | | 1:0.2 | 43 | 22 |
| 1 | 0.04 | | | | | | | 1:0.04 | 48 | 19 |
| 1 | 0.008 | | | | | | | 1:0.008 | 46 | 19 |
| 0.008 | 1 | | | | | | | 1:125 | 11 | 2 |
| 0.008 | 0.2 | | | | | | | 1:25 | 23 | 5 |
| 0.008 | 0.04 | | | | | | | 1:5 | 16 | 0 |
| 0.008 | 0.008 | | | | | | | 1:1 | 18 | 0 |
| 1 | | 200 | | | | | | 1:200 | 100 | 100 |
| 1 | | 40 | | | | | | 1:40 | 56 | 49 |
| 1 | | 8 | | | | | | 1:8 | 46 | 35 |
| 1 | | 1.6 | | | | | | 1:1.6 | 36 | 22 |
| 1 | | | 5 | | | | | 1:5 | 41 | 25 |
| 1 | | | 1 | | | | | 1:1 | 30 | 28 |

TABLE G15-continued in vitro-Test with *Fusarium* culmorum

| (I-130) (ppm) | (3.030) metyl-tetra-prole (ppm) | (17.012) *Paeni-bacillus* terrae (ppm) | (2.017) pen-flufen (ppm) | (5.018) pro-pineb (ppm) | (13.004) pro-quinazid (ppm) | (1.018) prothio-conazole (ppm) | (7.005) pyri-methanil (ppm) | Ratio | Efficacy % | Colby expected value % |
|---|---|---|---|---|---|---|---|---|---|---|
| 1 | | | 0.2 | | | | | 1:0.2 | 30 | 20 |
| 0.04 | | | 5 | | | | | 1:125 | 32 | 8 |
| 0.04 | | | 1 | | | | | 1:25 | 23 | 11 |
| 0.04 | | | 0.2 | | | | | 1:5 | 8 | 2 |
| 0.008 | | | 5 | | | | | 1:625 | 21 | 8 |
| 0.008 | | | 1 | | | | | 1:125 | 28 | 11 |
| 0.008 | | | 0.2 | | | | | 1:25 | 20 | 2 |
| 0.008 | | | | 100 | | | | 1:12500 | 97 | 97 |
| 0.008 | | | | 4 | | | | 1:500 | 11 | 9 |
| 0.008 | | | | 0.8 | | | | 1:100 | 11 | 6 |
| 1 | | | | | 10 | | | 1:10 | 60 | 42 |
| 0.2 | | | | | 10 | | | 1:50 | 9 | 1 |
| 0.04 | | | | | 10 | | | 1:250 | 4 | 1 |
| 0.04 | | | | | 0.08 | | | 1:2 | 14 | 2 |
| 0.008 | | | | | 10 | | | 1:1250 | 9 | 1 |
| 0.008 | | | | | 2 | | | 1:250 | 17 | 7 |
| 0.008 | | | | | 0.08 | | | 1:10 | 19 | 2 |
| 1 | | | | | | 0.02 | | 1:0.02 | 76 | 55 |
| 0.2 | | | | | | 0.02 | | 1:0.1 | 27 | 23 |
| 1 | | | | | | | 20 | 1:20 | 54 | 53 |
| 1 | | | | | | | 4 | 1:4 | 55 | 51 |
| 0.008 | | | | | | | 20 | 1:2500 | 22 | 21 |
| 0.008 | | | | | | | 4 | 1:500 | 20 | 16 |

TABLE H1 in vitro-Test with *Parastagonospora nodorum*

| (I-052) (ppm) | (7.005) pyrime-thanil (ppm) | (1.055) mefen-triflu-cona-zole (ppm) | (1.020) spiro-xamine (ppm) | (13.001) fludio-xonil (ppm) | (5.018) pro-pineb (ppm) | (17.012) *Paeni-bacillus* terrae (ppm) | Ratio | Efficacy % | Colby expected value % |
|---|---|---|---|---|---|---|---|---|---|
| 0.1 | | | | | | | | 100 | |
| 0.02 | | | | | | | | 7 | |
| 0.004 | | | | | | | | 0 | |
| 0.0008 | | | | | | | | 0 | |
| | 20.0 | | | | | | | 100 | |
| | 4.0 | | | | | | | 100 | |
| | 0.8 | | | | | | | 100 | |
| | 0.16 | | | | | | | 17 | |
| | | 1.0 | | | | | | 100 | |
| | | 0.2 | | | | | | 100 | |
| | | 0.04 | | | | | | 97 | |
| | | 0.008 | | | | | | 90 | |
| | | | 20.0 | | | | | 7 | |
| | | | 4.0 | | | | | 4 | |
| | | | 0.8 | | | | | 2 | |
| | | | 0.16 | | | | | 3 | |
| | | | | 5.0 | | | | 64 | |
| | | | | 1.0 | | | | 38 | |
| | | | | 0.2 | | | | 0 | |
| | | | | 0.04 | | | | 0 | |
| | | | | | 100.0 | | | 100 | |
| | | | | | 20.0 | | | 60 | |
| | | | | | 4.0 | | | 25 | |
| | | | | | 0.8 | | | 13 | |
| | | | | | | 200.0 | | 86 | |
| | | | | | | 40.0 | | 6 | |
| | | | | | | 8.0 | | 4 | |
| | | | | | | 1.6 | | 1 | |
| 0.02 | 20.0 | | | | | | 1:1000 | 100 | 100 |
| 0.02 | 4.0 | | | | | | 1:200 | 98 | 100 |
| 0.02 | 0.8 | | | | | | 1:40 | 100 | 100 |
| 0.02 | 0.16 | | | | | | 1:8 | 98 | 19 |
| 0.004 | 20.0 | | | | | | 1:5000 | 100 | 100 |
| 0.004 | 4.0 | | | | | | 1:1000 | 100 | 100 |

TABLE H1-continued in vitro-Test with *Parastagonospora nodorum*

| (I-052) (ppm) | (7.005) pyrime-thanil (ppm) | (1.055) mefen-triflu-cona-zole (ppm) | (1.020) spiro-xamine (ppm) | (13.001) fludio-xonil (ppm) | (5.018) pro-pineb (ppm) | (17.012) *Paeni-bacillus* terrae (ppm) | Ratio | Efficacy % | Colby expected value % |
|---|---|---|---|---|---|---|---|---|---|
| 0.004 | 0.8 | | | | | | 1:200 | 100 | 100 |
| 0.004 | 0.16 | | | | | | 1:40 | 100 | 17 |
| 0.0008 | 20.0 | | | | | | 1:25000 | 100 | 100 |
| 0.0008 | 4.0 | | | | | | 1:5000 | 100 | 100 |
| 0.0008 | 0.8 | | | | | | 1:1000 | 100 | 100 |
| 0.0008 | 0.16 | | | | | | 1:200 | 100 | 17 |
| 0.1 | | 1.0 | | | | | 1:1250 | 100 | 100 |
| 0.1 | | 0.2 | | | | | 1:250 | 100 | 100 |
| 0.1 | | 0.04 | | | | | 1:50 | 97 | 97 |
| 0.1 | | 0.008 | | | | | 1:10 | 97 | 90 |
| 0.02 | | | 20.0 | | | | 1:1000 | 46 | 18 |
| 0.02 | | | 4.0 | | | | 1:200 | 23 | 15 |
| 0.02 | | | 0.8 | | | | 1:40 | 25 | 13 |
| 0.02 | | | 0.16 | | | | 1:8 | 22 | 14 |
| 0.02 | | | | 5.0 | | | 1:250 | 100 | 68 |
| 0.02 | | | | 1.0 | | | 1:50 | 91 | 45 |
| 0.02 | | | | 0.2 | | | 1:10 | 65 | 11 |
| 0.02 | | | | 0.04 | | | 1:2 | 15 | 11 |
| 0.0008 | | | | 5.0 | | | 1:6250 | 66 | 64 |
| 0.0008 | | | | 1.0 | | | 1:1250 | 53 | 38 |
| 0.0008 | | | | 0.2 | | | 1:250 | 0 | 0 |
| 0.0008 | | | | 0.04 | | | 1:50 | 0 | 0 |
| 0.02 | | | | | 100.0 | | 1:5000 | 100 | 100 |
| 0.02 | | | | | 20.0 | | 1:1000 | 69 | 63 |
| 0.02 | | | | | 4.0 | | 1:200 | 53 | 31 |
| 0.02 | | | | | 0.8 | | 1:40 | 21 | 19 |
| 0.02 | | | | | | 200.0 | 1:10000 | 100 | 88 |
| 0.02 | | | | | | 40.0 | 1:2000 | 29 | 22 |
| 0.02 | | | | | | 8.0 | 1:400 | 15 | 21 |
| 0.02 | | | | | | 1.6 | 1:80 | 13 | 18 |
| 0.0008 | | | | | | 200.0 | 1:250000 | 99 | 86 |
| 0.0008 | | | | | | 40.0 | 1:50000 | 14 | 6 |
| 0.0008 | | | | | | 8.0 | 1:10000 | 0 | 4 |
| 0.0008 | | | | | | 1.6 | 1:2000 | 8 | 1 |

TABLE H2 in vitro-Test with *Parastagonospora nodorum*

| (I-300) (ppm) | (7.005) pyrime-thanil (ppm) | (2.002) bixafen (ppm) | (2.005) fluo-pyram (ppm) | (3.025) fenpi-coxa-mid (ppm) | (1.002) difeno-conazole (ppm) | (1.055) mefen-triflu-conazole (ppm) | Ratio | Efficacy % | Colby expected value % |
|---|---|---|---|---|---|---|---|---|---|
| 0.1 | | | | | | | | 100 | |
| 0.02 | | | | | | | | 7 | |
| 0.004 | | | | | | | | 0 | |
| 0.0008 | | | | | | | | 0 | |
| | 20.0 | | | | | | | 100 | |
| | 4.0 | | | | | | | 100 | |
| | 0.8 | | | | | | | 100 | |
| | 0.16 | | | | | | | 17 | |
| | | 1.0 | | | | | | 41 | |
| | | 0.2 | | | | | | 28 | |
| | | 0.04 | | | | | | 8 | |
| | | 0.008 | | | | | | 0 | |
| | | | 20.0 | | | | | 70 | |
| | | | 4.0 | | | | | 44 | |
| | | | 0.8 | | | | | 37 | |
| | | | 0.16 | | | | | 8 | |
| | | | | 5.0 | | | | 72 | |
| | | | | 1.0 | | | | 64 | |
| | | | | 0.2 | | | | 61 | |
| | | | | 0.04 | | | | 19 | |
| | | | | | 1.0 | | | 97 | |
| | | | | | 0.2 | | | 88 | |
| | | | | | 0.04 | | | 22 | |

TABLE H2-continued in vitro-Test with *Parastagonospora nodorum*

| (I-300) (ppm) | (7.005) pyrime-thanil (ppm) | (2.002) bixafen (ppm) | (2.005) fluo-pyram (ppm) | (3.025) fenpi-coxa-mid (ppm) | (1.002) difeno-conazole (ppm) | (1.055) mefen-triflu-conazole (ppm) | Ratio | Efficacy % | Colby expected value % |
|---|---|---|---|---|---|---|---|---|---|
| | | | | | 0.008 | | | 0 | |
| | | | | | | 1.0 | | 100 | |
| | | | | | | 0.2 | | 99 | |
| | | | | | | 0.04 | | 99 | |
| | | | | | | 0.008 | | 89 | |
| 0.02 | 20.0 | | | | | | 1:1000 | 100 | 100 |
| 0.02 | 4.0 | | | | | | 1:200 | 100 | 100 |
| 0.02 | 0.8 | | | | | | 1:40 | 100 | 100 |
| 0.02 | 0.16 | | | | | | 1:8 | 100 | 23 |
| 0.004 | 20.0 | | | | | | 1:5000 | 100 | 100 |
| 0.004 | 4.0 | | | | | | 1:1000 | 100 | 100 |
| 0.004 | 0.8 | | | | | | 1:200 | 100 | 100 |
| 0.004 | 0.16 | | | | | | 1:40 | 98 | 17 |
| 0.004 | | 1.0 | | | | | 1:250 | 56 | 41 |
| 0.004 | | 0.2 | | | | | 1:50 | 32 | 28 |
| 0.004 | | 0.04 | | | | | 1:10 | 0 | 8 |
| 0.004 | | 0.008 | | | | | 1:2 | 0 | 0 |
| 0.0008 | | | 20.0 | | | | 1:25000 | 79 | 70 |
| 0.0008 | | | 4.0 | | | | 1:5000 | 46 | 44 |
| 0.0008 | | | 0.8 | | | | 1:1000 | 38 | 37 |
| 0.0008 | | | 0.16 | | | | 1:200 | 3 | 8 |
| 0.02 | | | | 5.0 | | | 1:250 | 76 | 73 |
| 0.02 | | | | 1.0 | | | 1:50 | 69 | 65 |
| 0.02 | | | | 0.2 | | | 1:10 | 66 | 62 |
| 0.02 | | | | 0.04 | | | 1:2 | 30 | 20 |
| 0.004 | | | | 5.0 | | | 1:1250 | 78 | 72 |
| 0.004 | | | | 1.0 | | | 1:250 | 67 | 64 |
| 0.004 | | | | 0.2 | | | 1:50 | 59 | 61 |
| 0.004 | | | | 0.04 | | | 1:10 | 23 | 19 |
| 0.0008 | | | | 5.0 | | | 1:6250 | 74 | 72 |
| 0.0008 | | | | 1.0 | | | 1:1250 | 66 | 64 |
| 0.0008 | | | | 0.2 | | | 1:250 | 64 | 61 |
| 0.0008 | | | | 0.04 | | | 1:50 | 30 | 19 |
| 0.02 | | | | | 1.0 | | 1:50 | 97 | 97 |
| 0.02 | | | | | 0.2 | | 1:10 | 95 | 88 |
| 0.02 | | | | | 0.04 | | 1:2 | 20 | 23 |
| 0.02 | | | | | 0.008 | | 1:0.4 | 0 | 1 |
| 0.02 | | | | | | 1.0 | 1:50 | 100 | 100 |
| 0.02 | | | | | | 0.2 | 1:10 | 100 | 99 |
| 0.02 | | | | | | 0.04 | 1:2 | 100 | 99 |
| 0.02 | | | | | | 0.008 | 1:0.4 | 100 | 89 |
| 0.0008 | | | | | | 1.0 | 1:1250 | 100 | 100 |
| 0.0008 | | | | | | 0.2 | 1:250 | 100 | 99 |
| 0.0008 | | | | | | 0.04 | 1:50 | 100 | 99 |
| 0.0008 | | | | | | 0.008 | 1:10 | 98 | 89 |

TABLE H3 in vitro-Test with *Parastagonospora nodorum*

| (I-300) (ppm) | (13.001) fludio-xonil (ppm) | (5.018) pro-pineb (ppm) | (17.001) *Bacillus subtilis* (ppm) | (I-302) (ppm) | (7.005) pyrime-thanil (ppm) | (2.002) bixafen (ppm) | Ratio | Efficacy % | Colby expected value % |
|---|---|---|---|---|---|---|---|---|---|
| 0.1 | | | | | | | | 100 | |
| 0.02 | | | | | | | | 7 | |
| 0.004 | | | | | | | | 0 | |
| 0.0008 | | | | | | | | 0 | |
| | 5.0 | | | | | | | 73 | |
| | 1.0 | | | | | | | 49 | |
| | 0.2 | | | | | | | 0 | |
| | 0.04 | | | | | | | 0 | |
| | | 100.0 | | | | | | 98 | |
| | | 20.0 | | | | | | 100 | |
| | | 4.0 | | | | | | 53 | |
| | | 0.8 | | | | | | 15 | |
| | | | 200.0 | | | | | 90 | |
| | | | 40.0 | | | | | 0 | |

TABLE H3-continued

| in vitro-Test with *Parastagonospora nodorum* | | | | | | | | | |
|---|---|---|---|---|---|---|---|---|---|
| (I-300) (ppm) | (13.001) fludio-xonil (ppm) | (5.018) pro-pineb (ppm) | (17.001) *Bacillus subtilis* (ppm) | (I-302) (ppm) | (7.005) pyrime-thanil (ppm) | (2.002) bixafen (ppm) | Ratio | Efficacy % | Colby expected value % |
| | | | 8.0 | | | | | 1 | |
| | | | 1.6 | | | | | 1 | |
| | | | | 0.1 | | | | 100 | |
| | | | | 0.02 | | | | 0 | |
| | | | | 0.004 | | | | 0 | |
| | | | | 0.0008 | | | | 0 | |
| | | | | | 20.0 | | | 100 | |
| | | | | | 4.0 | | | 100 | |
| | | | | | 0.8 | | | 100 | |
| | | | | | 0.16 | | | 71 | |
| | | | | | | 1.0 | | 44 | |
| | | | | | | 0.2 | | 34 | |
| | | | | | | 0.04 | | 4 | |
| | | | | | | 0.008 | | 1 | |
| 0.02 | 5.0 | | | | | | 1:250 | 93 | 73 |
| 0.02 | 1.0 | | | | | | 1:50 | 66 | 49 |
| 0.02 | 0.2 | | | | | | 1:10 | 0 | 0 |
| 0.02 | 0.04 | | | | | | 1:2 | 0 | 0 |
| 0.0008 | 5.0 | | | | | | 1:6250 | 81 | 73 |
| 0.0008 | 1.0 | | | | | | 1:1250 | 48 | 49 |
| 0.0008 | 0.2 | | | | | | 1:250 | 0 | 0 |
| 0.0008 | 0.04 | | | | | | 1:50 | 0 | 0 |
| 0.02 | | 100.0 | | | | | 1:5000 | 100 | 99 |
| 0.02 | | 20.0 | | | | | 1:1000 | 100 | 100 |
| 0.02 | | 4.0 | | | | | 1:200 | 66 | 56 |
| 0.02 | | 0.8 | | | | | 1:40 | 24 | 19 |
| 0.004 | | 100.0 | | | | | 1:25000 | 96 | 98 |
| 0.004 | | 20.0 | | | | | 1:5000 | 100 | 100 |
| 0.004 | | 4.0 | | | | | 1:1000 | 65 | 53 |
| 0.004 | | 0.8 | | | | | 1:200 | 20 | 15 |
| 0.0008 | | 100.0 | | | | | 1:125000 | 99 | 98 |
| 0.0008 | | 20.0 | | | | | 1:25000 | 100 | 100 |
| 0.0008 | | 4.0 | | | | | 1:5000 | 61 | 54 |
| 0.0008 | | 0.8 | | | | | 1:1000 | 22 | 16 |
| 0.1 | | | 200.0 | | | | 1:2000 | 100 | 100 |
| 0.1 | | | 40.0 | | | | 1:400 | 99 | 100 |
| 0.1 | | | 8.0 | | | | 1:80 | 99 | 100 |
| 0.1 | | | 1.6 | | | | 1:16 | 98 | 100 |
| 0.02 | | | 200.0 | | | | 1:10000 | 96 | 90 |
| 0.02 | | | 40.0 | | | | 1:2000 | 0 | 0 |
| 0.02 | | | 8.0 | | | | 1:400 | 0 | 1 |
| 0.02 | | | 1.6 | | | | 1:80 | 0 | 1 |
| 0.004 | | | 200.0 | | | | 1:50000 | 100 | 90 |
| 0.004 | | | 40.0 | | | | 1:10000 | 2 | 0 |
| 0.004 | | | 8.0 | | | | 1:2000 | 0 | 1 |
| 0.004 | | | 1.6 | | | | 1:400 | 0 | 1 |
| 0.0008 | | | 200.0 | | | | 1:250000 | 100 | 90 |
| 0.0008 | | | 40.0 | | | | 1:50000 | 1 | 0 |
| 0.0008 | | | 8.0 | | | | 1:10000 | 0 | 1 |
| 0.0008 | | | 1.6 | | | | 1:2000 | 0 | 1 |
| | | | | 0.02 | 20.0 | | 1:1000 | 100 | 100 |
| | | | | 0.02 | 4.0 | | 1:200 | 100 | 100 |
| | | | | 0.02 | 0.8 | | 1:40 | 100 | 100 |
| | | | | 0.02 | 0.16 | | 1:8 | 100 | 73 |
| | | | | 0.0008 | | 1.0 | 1:1250 | 56 | 44 |
| | | | | 0.0008 | | 0.2 | 1:250 | 35 | 34 |
| | | | | 0.0008 | | 0.04 | 1:50 | 5 | 4 |
| | | | | 0.0008 | | 0.008 | 1:10 | 2 | 1 |

TABLE H4

| in vitro-Test with *Parastagonospora nodorum* | | | | | | | | |
|---|---|---|---|---|---|---|---|---|
| (I-302) (ppm) | (13.001) fludio-xonil (ppm) | (5.013) man-cozeb (ppm) | (5.018) pro-pineb (ppm) | (17.012) *Paeni-bacillus* terrae (ppm) | (18.001) FLIPPER (ppm) | Ratio | Efficacy % | Colby expected value % |
| 0.1 | | | | | | | 100 | |
| 0.02 | | | | | | | 0 | |

TABLE H4-continued

| in vitro-Test with *Parastagonospora nodorum* | | | | | | | | |
|---|---|---|---|---|---|---|---|---|
| (I-302) (ppm) | (13.001) fludio-xonil (ppm) | (5.013) man-cozeb (ppm) | (5.018) pro-pineb (ppm) | (17.012) *Paeni-bacillus* terrae (ppm) | (18.001) FLIPPER (ppm) | Ratio | Efficacy % | Colby expected value % |
| 0.004 | | | | | | | 0 | |
| 0.0008 | | | | | | | 0 | |
| | 5.0 | | | | | | 76 | |
| | 1.0 | | | | | | 51 | |
| | 0.2 | | | | | | 0 | |
| | 0.04 | | | | | | 0 | |
| | | 10.0 | | | | | 100 | |
| | | 2.0 | | | | | 37 | |
| | | 0.4 | | | | | 5 | |
| | | 0.08 | | | | | 0 | |
| | | | 100.0 | | | | 100 | |
| | | | 20.0 | | | | 100 | |
| | | | 4.0 | | | | 62 | |
| | | | 0.8 | | | | 22 | |
| | | | | 200.0 | | | 93 | |
| | | | | 40.0 | | | 0 | |
| | | | | 8.0 | | | 1 | |
| | | | | 1.6 | | | 0 | |
| | | | | | 200.0 | | 17 | |
| | | | | | 40.0 | | 9 | |
| | | | | | 8.0 | | 2 | |
| | | | | | 1.6 | | 0 | |
| 0.1 | 5.0 | | | | | 1:50 | 100 | 100 |
| 0.1 | 1.0 | | | | | 1:10 | 99 | 100 |
| 0.1 | 0.2 | | | | | 1:2 | 99 | 100 |
| 0.1 | 0.04 | | | | | 1:0.4 | 100 | 100 |
| 0.02 | 5.0 | | | | | 1:250 | 100 | 76 |
| 0.02 | 1.0 | | | | | 1:50 | 93 | 51 |
| 0.02 | 0.2 | | | | | 1:10 | 0 | 0 |
| 0.02 | 0.04 | | | | | 1:2 | 0 | 0 |
| 0.004 | 5.0 | | | | | 1:1250 | 80 | 76 |
| 0.004 | 1.0 | | | | | 1:250 | 58 | 51 |
| 0.004 | 0.2 | | | | | 1:50 | 0 | 0 |
| 0.004 | 0.04 | | | | | 1:10 | 0 | 0 |
| 0.0008 | 5.0 | | | | | 1:6250 | 82 | 76 |
| 0.0008 | 1.0 | | | | | 1:1250 | 50 | 51 |
| 0.0008 | 0.2 | | | | | 1:250 | 0 | 0 |
| 0.0008 | 0.04 | | | | | 1:50 | 0 | 0 |
| 0.1 | | 10.0 | | | | 1:100 | 100 | 100 |
| 0.1 | | 2.0 | | | | 1:20 | 99 | 100 |
| 0.1 | | 0.4 | | | | 1:4 | 99 | 100 |
| 0.1 | | 0.08 | | | | 1:0.8 | 100 | 100 |
| 0.02 | | 10.0 | | | | 1:500 | 100 | 100 |
| 0.02 | | 2.0 | | | | 1:100 | 54 | 37 |
| 0.02 | | 0.4 | | | | 1:20 | 11 | 5 |
| 0.02 | | 0.08 | | | | 1:4 | 5 | 0 |
| 0.004 | | 10.0 | | | | 1:2500 | 100 | 100 |
| 0.004 | | 2.0 | | | | 1:500 | 47 | 37 |
| 0.004 | | 0.4 | | | | 1:100 | 2 | 5 |
| 0.004 | | 0.08 | | | | 1:20 | 1 | 0 |
| 0.0008 | | 10.0 | | | | 1:12500 | 100 | 100 |
| 0.0008 | | 2.0 | | | | 1:2500 | 49 | 37 |
| 0.0008 | | 0.4 | | | | 1:500 | 7 | 5 |
| 0.0008 | | 0.08 | | | | 1:100 | 4 | 0 |
| 0.02 | | | 100.0 | | | 1:5000 | 100 | 100 |
| 0.02 | | | 20.0 | | | 1:1000 | 100 | 100 |
| 0.02 | | | 4.0 | | | 1:200 | 69 | 62 |
| 0.02 | | | 0.8 | | | 1:40 | 42 | 22 |
| 0.004 | | | 100.0 | | | 1:25000 | 100 | 100 |
| 0.004 | | | 20.0 | | | 1:5000 | 100 | 100 |
| 0.004 | | | 4.0 | | | 1:1000 | 72 | 62 |
| 0.004 | | | 0.8 | | | 1:200 | 36 | 22 |
| 0.0008 | | | 100.0 | | | 1:125000 | 100 | 100 |
| 0.0008 | | | 20.0 | | | 1:25000 | 100 | 100 |
| 0.0008 | | | 4.0 | | | 1:5000 | 64 | 62 |
| 0.0008 | | | 0.8 | | | 1:1000 | 28 | 22 |
| 0.02 | | | | 200.0 | | 1:10000 | 100 | 93 |
| 0.02 | | | | 40.0 | | 1:2000 | 11 | 3 |
| 0.02 | | | | 8.0 | | 1:400 | 0 | 5 |
| 0.02 | | | | 1.6 | | 1:80 | 0 | 3 |
| 0.004 | | | | 200.0 | | 1:50000 | 96 | 93 |
| 0.004 | | | | 40.0 | | 1:10000 | 5 | 0 |
| 0.004 | | | | 8.0 | | 1:2000 | 0 | 1 |

TABLE H4-continued in vitro-Test with *Parastagonospora nodorum*

| (I-302) (ppm) | (13.001) fludio-xonil (ppm) | (5.013) man-cozeb (ppm) | (5.018) pro-pineb (ppm) | (17.012) *Paeni-bacillus* terrae (ppm) | (18.001) FLIPPER (ppm) | Ratio | Efficacy % | Colby expected value % |
|---|---|---|---|---|---|---|---|---|
| 0.004 | | | | 1.6 | | 1:400 | 0 | 0 |
| 0.0008 | | | | 200.0 | | 1:250000 | 100 | 93 |
| 0.0008 | | | | 40.0 | | 1:50000 | 0 | 0 |
| 0.0008 | | | | 8.0 | | 1:10000 | 1 | 1 |
| 0.0008 | | | | 1.6 | | 1:2000 | 0 | 0 |
| 0.1 | | | | | 200.0 | 1:2000 | 99 | 100 |
| 0.1 | | | | | 40.0 | 1:400 | 99 | 100 |
| 0.1 | | | | | 8.0 | 1:80 | 99 | 100 |
| 0.1 | | | | | 1.6 | 1:16 | 99 | 100 |
| 0.02 | | | | | 200.0 | 1:10000 | 24 | 20 |
| 0.02 | | | | | 40.0 | 1:2000 | 35 | 12 |
| 0.02 | | | | | 8.0 | 1:400 | 15 | 6 |
| 0.02 | | | | | 1.6 | 1:80 | 0 | 3 |
| 0.0008 | | | | | 200.0 | 1:250000 | 19 | 17 |
| 0.0008 | | | | | 40.0 | 1:50000 | 11 | 9 |
| 0.0008 | | | | | 8.0 | 1:10000 | 4 | 2 |
| 0.0008 | | | | | 1.6 | 1:2000 | 0 | 0 |

TABLE H5 in vitro-Test with *Parastagonospora nodorum*

| (I-339) (ppm) | (5.003) captan (ppm) | (5.010) dithianon (ppm) | (13.001) fludioxo-nil (ppm) | (13.005) quinoxy-fen (ppm) | (1.020) spirox-amin (ppm) | (1.021) tebu-conazole (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 55 | |
| | 5 | | | | | | | 75 | |
| | | 2 | | | | | | 96 | |
| | | 0.4 | | | | | | 5 | |
| | | 0.08 | | | | | | 12 | |
| | | | 5 | | | | | 98 | |
| | | | 0.2 | | | | | 18 | |
| | | | | 10 | | | | 33 | |
| | | | | 2 | | | | 1 | |
| | | | | 0.4 | | | | 4 | |
| | | | | 0.08 | | | | 5 | |
| | | | | | 20 | | | 17 | |
| | | | | | 4 | | | 5 | |
| | | | | | 0.8 | | | 5 | |
| | | | | | 0.16 | | | 9 | |
| | | | | | | 1 | | 100 | |
| | | | | | | 0.2 | | 60 | |
| | | | | | | 0.04 | | 0 | |
| | | | | | | 0.008 | | 0 | |
| 0.2 | 5 | | | | | | 1:25 | 100 | 100 |
| 0.04 | 5 | | | | | | 1:125 | 100 | 100 |
| 0.008 | 5 | | | | | | 1:625 | 100 | 89 |
| 0.04 | | 2 | | | | | 1:50 | 100 | 100 |
| 0.04 | | 0.4 | | | | | 1:10 | 100 | 96 |
| 0.04 | | 0.08 | | | | | 1:2 | 100 | 96 |
| 0.04 | | | 5 | | | | 1:125 | 100 | 100 |
| 0.04 | | | 0.2 | | | | 1:5 | 100 | 96 |
| 0.008 | | | 5 | | | | 1:625 | 99 | 99 |
| 0.008 | | | 0.2 | | | | 1:25 | 95 | 81 |
| 0.2 | | | | 10 | | | 1:50 | 100 | 73 |
| 0.2 | | | | 2 | | | 1:10 | 100 | 61 |
| 0.2 | | | | 0.4 | | | 1:2 | 100 | 62 |
| 0.2 | | | | 0.08 | | | 1:0.4 | 100 | 62 |
| 0.2 | | | | | 20 | | 1:100 | 100 | 67 |
| 0.2 | | | | | 4 | | 1:20 | 100 | 62 |
| 0.2 | | | | | 0.8 | | 1:4 | 100 | 62 |

TABLE H5-continued

| in vitro-Test with *Parastagonospora nodorum* | | | | | | | | | |
|---|---|---|---|---|---|---|---|---|---|
| (I-339) (ppm) | (5.003) captan (ppm) | (5.010) dithianon (ppm) | (13.001) fludioxo-nil (ppm) | (13.005) quinoxy-fen (ppm) | (1.020) spirox-amin (ppm) | (1.021) tebu-conazole (ppm) | Ratio | Efficacy % | Colby expected value % |
| 0.2 | | | | | 0.16 | | 1:0.8 | 100 | 64 |
| 0.2 | | | | | | 1 | 1:5 | 100 | 100 |
| 0.2 | | | | | | 0.2 | 1:1 | 100 | 84 |
| 0.2 | | | | | | 0.04 | 1:0.2 | 99 | 60 |
| 0.2 | | | | | | 0.008 | 1:0.04 | 100 | 60 |

TABLE H6

| in vitro-Test with *Parastagonospora nodorum* | | | | | | | | | |
|---|---|---|---|---|---|---|---|---|---|
| (I-339) (ppm) | (3.020) trifloxystrobin (ppm) | (I-338) (ppm) | (1.067) (ppm) | (5.003) captan (ppm) | (1.002) difenoconazole (ppm) | (13.001) fludioxonil (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 55 | |
| | 1 | | | | | | | 87 | |
| | 0.2 | | | | | | | 83 | |
| | 0.04 | | | | | | | 54 | |
| | 0.008 | | | | | | | 17 | |
| | | 1 | | | | | | 100 | |
| | | 0.2 | | | | | | 12 | |
| | | 0.04 | | | | | | 10 | |
| | | 0.008 | | | | | | 8 | |
| | | | 0.4 | | | | | 100 | |
| | | | 0.08 | | | | | 94 | |
| | | | 0.016 | | | | | 0 | |
| | | | | 5 | | | | 100 | |
| | | | | 0.04 | | | | 0 | |
| | | | | | 0.2 | | | 100 | |
| | | | | | 0.04 | | | 100 | |
| | | | | | 0.008 | | | 32 | |
| | | | | | | 0.04 | | 1 | |
| 0.2 | 1 | | | | | | 1:5 | 100 | 95 |
| 0.2 | 0.2 | | | | | | 1:1 | 100 | 93 |
| 0.2 | 0.04 | | | | | | 1:0.2 | 100 | 82 |
| 0.2 | 0.008 | | | | | | 1:0.04 | 100 | 67 |
| | | 0.2 | 0.4 | | | | 1:2 | 100 | 100 |
| | | 0.2 | 0.08 | | | | 1:0.4 | 100 | 95 |
| | | 0.2 | 0.016 | | | | 1:0.08 | 15 | 12 |
| | | 0.04 | 0.4 | | | | 1:10 | 100 | 100 |
| | | 0.04 | 0.08 | | | | 1:2 | 100 | 95 |
| | | 0.04 | 0.016 | | | | 1:0.4 | 9 | 10 |
| | | 0.2 | | 5 | | | 1:25 | 100 | 100 |
| | | 0.2 | | 0.04 | | | 1:0.2 | 13 | 12 |
| | | 0.008 | | 5 | | | 1:625 | 100 | 100 |
| | | 0.008 | | 0.04 | | | 1:5 | 60 | 8 |
| | | 0.008 | | | 0.2 | | 1:25 | 100 | 100 |
| | | 0.008 | | | 0.04 | | 1:5 | 100 | 100 |
| | | 0.008 | | | 0.008 | | 1:1 | 50 | 42 |
| | | 1 | | | | 0.04 | 1:0.04 | 98 | 97 |
| | | 0.2 | | | | 0.04 | 1:0.2 | 27 | 25 |
| | | 0.04 | | | | 0.04 | 1:1 | 6 | 7 |
| | | 0.008 | | | | 0.04 | 1:5 | 61 | 16 |

TABLE H7 in vitro-Test with *Parastagonospora nodorum*

| (I-338) (ppm) | (2.005) fluopyram (ppm) | (1.055) mefen-trifluconazole (ppm) | (15.016) metra-fenone (ppm) | (3.030) metyl-tetraprole (ppm) | (5.018) propineb (ppm) | (13.004) proquinazid (ppm) | Ratio | Efficacy % | Colby expected value % |
|---|---|---|---|---|---|---|---|---|---|
| 1 | | | | | | | | 84 | |
| 0.2 | | | | | | | | 13 | |
| 0.04 | | | | | | | | 8 | |
| 0.008 | | | | | | | | 3 | |
| | 20 | | | | | | | 59 | |
| | 4 | | | | | | | 35 | |
| | | 0.04 | | | | | | 99 | |
| | | 0.008 | | | | | | 84 | |
| | | | 5 | | | | | 32 | |
| | | | 1 | | | | | 0 | |
| | | | 0.2 | | | | | 0 | |
| | | | 0.04 | | | | | 0 | |
| | | | | 1 | | | | 84 | |
| | | | | 0.04 | | | | 38 | |
| | | | | | 4 | | | 64 | |
| | | | | | 0.8 | | | 26 | |
| | | | | | | 0.08 | | 32 | |
| 0.2 | 20 | | | | | | 1:100 | 86 | 64 |
| 0.04 | 4 | | | | | | 1:100 | 45 | 40 |
| 0.008 | 20 | | | | | | 1:2500 | 63 | 60 |
| 0.008 | 4 | | | | | | 1:500 | 37 | 36 |
| 0.04 | | 0.04 | | | | | 1:1 | 99 | 99 |
| 0.04 | | 0.008 | | | | | 1:0.2 | 97 | 86 |
| 0.008 | | 0.04 | | | | | 1:5 | 99 | 99 |
| 0.008 | | 0.008 | | | | | 1:1 | 90 | 86 |
| 0.04 | | | 5 | | | | 1:125 | 47 | 32 |
| 0.04 | | | 1 | | | | 1:25 | 3 | 0 |
| 0.04 | | | 0.2 | | | | 1:5 | 2 | 0 |
| 0.04 | | | 0.04 | | | | 1:1 | 12 | 0 |
| 0.04 | | | | 1 | | | 1:25 | 89 | 84 |
| 0.04 | | | | 0.04 | | | 1:1 | 43 | 38 |
| 0.008 | | | | 1 | | | 1:125 | 82 | 84 |
| 0.008 | | | | 0.04 | | | 1:5 | 44 | 38 |
| 1 | | | | | 4 | | 1:4 | 87 | 88 |
| 1 | | | | | 0.8 | | 1:0.8 | 80 | 75 |
| 0.008 | | | | | 4 | | 1:500 | 60 | 64 |
| 0.008 | | | | | 0.8 | | 1:100 | 71 | 26 |
| 1 | | | | | | 0.08 | 1:0.08 | 100 | 78 |
| 0.2 | | | | | | 0.08 | 1:0.4 | 100 | 44 |
| 0.04 | | | | | | 0.08 | 1:2 | 100 | 43 |
| 0.008 | | | | | | 0.08 | 1:10 | 81 | 32 |

TABLE H8 in vitro-Test with *Parastagonospora nodorum*

| (I-338) (ppm) | (1.021) tebuconazole (ppm) | (I-130) (ppm) | (13.001) fludioxonil (ppm) | (2.005) fluopyram (ppm) | (12.004) metalaxyl-m (ppm) | (2.017) penflufen (ppm) | Ratio | Efficacy % | Colby expected value % |
|---|---|---|---|---|---|---|---|---|---|
| 1 | | | | | | | | 94 | |
| 0.2 | | | | | | | | 24 | |
| 0.04 | | | | | | | | 9 | |
| 0.008 | | | | | | | | 1 | |
| | 1 | | | | | | | 99 | |
| | 0.2 | | | | | | | 63 | |
| | 0.04 | | | | | | | 0 | |
| | 0.008 | | | | | | | 0 | |
| | | 1 | | | | | | 100 | |
| | | 0.2 | | | | | | 100 | |
| | | 0.04 | | | | | | 100 | |
| | | 0.008 | | | | | | 81 | |
| | | | 1 | | | | | 58 | |
| | | | 0.2 | | | | | 40 | |
| | | | 0.04 | | | | | 0 | |
| | | | | 0.16 | | | | 0 | |
| | | | | | 20 | | | 3 | |
| | | | | | 4 | | | 8 | |
| | | | | | 0.8 | | | 12 | |

TABLE H8-continued in vitro-Test with *Parastagonospora nodorum*

| (I-338) (ppm) | (1.021) tebuconazole (ppm) | (I-130) (ppm) | (13.001) fludioxonil (ppm) | (2.005) fluopyram (ppm) | (12.004) metalaxyl-m (ppm) | (2.017) penflufen (ppm) | Ratio | Efficacy % | Colby expected value % |
|---|---|---|---|---|---|---|---|---|---|
| | | | | | | 0.2 | | 5 | |
| | | | | | | 0.04 | | 0 | |
| 0.008 | 1 | | | | | | 1:125 | 99 | 99 |
| 0.008 | 0.2 | | | | | | 1:25 | 70 | 63 |
| 0.008 | 0.04 | | | | | | 1:5 | 0 | 1 |
| 0.008 | 0.008 | | | | | | 1:1 | 7 | 1 |
| | | 0.008 | 1 | | | | 1:125 | 93 | 92 |
| | | 0.008 | 0.2 | | | | 1:25 | 98 | 89 |
| | | 0.008 | 0.04 | | | | 1:5 | 95 | 81 |
| | | 0.2 | | 0.16 | | | 1:0.8 | 100 | 100 |
| | | 0.04 | | 0.16 | | | 1:4 | 100 | 100 |
| | | 0.008 | | 0.16 | | | 1:20 | 80 | 78 |
| | | 1 | | | 20 | | 1:20 | 100 | 99 |
| | | 1 | | | 4 | | 1:4 | 100 | 99 |
| | | 1 | | | 0.8 | | 1:0.8 | 100 | 99 |
| | | 0.04 | | | | 0.2 | 1:5 | 100 | 100 |
| | | 0.04 | | | | 0.04 | 1:1 | 100 | 100 |
| | | 0.008 | | | | 0.2 | 1:25 | 89 | 86 |
| | | 0.008 | | | | 0.04 | 1:5 | 92 | 86 |

TABLE I1 in vitro-Test with *Ustilago segetum* var. *avenae*

| (I-052) (ppm) | (2.002) bixafen (ppm) | (2.038) isoflucypram (ppm) | (3.020) trifloxystrobin (ppm) | (1.002) difenoconazole (ppm) | (13.001) fludioxonil (ppm) | (5.012) folpet (ppm) | Ratio | Efficacy % | Colby expected value % |
|---|---|---|---|---|---|---|---|---|---|
| 0.1 | | | | | | | | 0 | |
| 0.02 | | | | | | | | 0 | |
| 0.004 | | | | | | | | 3 | |
| 0.0008 | | | | | | | | 2 | |
| | 1.0 | | | | | | | 100 | |
| | 0.2 | | | | | | | 100 | |
| | 0.04 | | | | | | | 0 | |
| | 0.008 | | | | | | | 0 | |
| | | 1.0 | | | | | | 100 | |
| | | 0.2 | | | | | | 100 | |
| | | 0.04 | | | | | | 22 | |
| | | 0.008 | | | | | | 6 | |
| | | | 1.0 | | | | | 64 | |
| | | | 0.2 | | | | | 52 | |
| | | | 0.008 | | | | | 19 | |
| | | | | 1.0 | | | | 100 | |
| | | | | 0.2 | | | | 45 | |
| | | | | 0.04 | | | | 14 | |
| | | | | 0.008 | | | | 8 | |
| | | | | | 5.0 | | | 100 | |
| | | | | | 1.0 | | | 100 | |
| | | | | | 0.2 | | | 75 | |
| | | | | | 0.04 | | | 19 | |
| | | | | | | 10.0 | | 100 | |
| | | | | | | 2.0 | | 100 | |
| | | | | | | 0.4 | | 15 | |
| | | | | | | 0.08 | | 12 | |
| 0.1 | 1.0 | | | | | | 1:10 | 100 | 100 |
| 0.1 | 0.2 | | | | | | 1:2 | 99 | 100 |
| 0.1 | 0.04 | | | | | | 1:0.4 | 18 | 0 |
| 0.1 | 0.008 | | | | | | 1:0.08 | 0 | 0 |
| 0.02 | 1.0 | | | | | | 1:50 | 100 | 100 |
| 0.02 | 0.2 | | | | | | 1:10 | 98 | 100 |
| 0.02 | 0.04 | | | | | | 1:2 | 0 | 0 |
| 0.02 | 0.008 | | | | | | 1:0.4 | 0 | 0 |
| 0.02 | | 1.0 | | | | | 1:50 | 100 | 100 |
| 0.02 | | 0.2 | | | | | 1:10 | 100 | 100 |
| 0.02 | | 0.04 | | | | | 1:2 | 50 | 22 |
| 0.02 | | 0.008 | | | | | 1:0.4 | 0 | 6 |
| 0.004 | | 1.0 | | | | | 1:250 | 100 | 100 |
| 0.004 | | 0.2 | | | | | 1:50 | 100 | 100 |
| 0.004 | | 0.04 | | | | | 1:10 | 31 | 22 |
| 0.004 | | 0.008 | | | | | 1:2 | 0 | 7 |

TABLE I1-continued in vitro-Test with *Ustilago segetum* var. *avenae*

| (I-052) (ppm) | (2.002) bixafen (ppm) | (2.038) isoflucypram (ppm) | (3.020) trifloxystrobin (ppm) | (1.002) difenoconazole (ppm) | (13.001) fludioxonil (ppm) | (5.012) folpet (ppm) | Ratio | Efficacy % | Colby expected value % |
|---|---|---|---|---|---|---|---|---|---|
| 0.004 | | | 1.0 | | | | 1:250 | 74 | 64 |
| 0.004 | | | 0.2 | | | | 1:50 | 56 | 52 |
| 0.004 | | | 0.008 | | | | 1:2 | 18 | 20 |
| 0.0008 | | | 1.0 | | | | 1:1250 | 74 | 64 |
| 0.0008 | | | 0.2 | | | | 1:250 | 58 | 53 |
| 0.0008 | | | 0.008 | | | | 1:10 | 17 | 21 |
| 0.02 | | | | 1.0 | | | 1:50 | 100 | 100 |
| 0.02 | | | | 0.2 | | | 1:10 | 87 | 45 |
| 0.02 | | | | 0.04 | | | 1:2 | 20 | 14 |
| 0.02 | | | | 0.008 | | | 1:0.4 | 0 | 8 |
| 0.0008 | | | | 1.0 | | | 1:1250 | 100 | 100 |
| 0.0008 | | | | 0.2 | | | 1:250 | 51 | 46 |
| 0.0008 | | | | 0.04 | | | 1:50 | 22 | 16 |
| 0.0008 | | | | 0.008 | | | 1:10 | 20 | 10 |
| 0.1 | | | | | 5.0 | | 1:50 | 100 | 100 |
| 0.1 | | | | | 1.0 | | 1:10 | 100 | 100 |
| 0.1 | | | | | 0.2 | | 1:2 | 100 | 75 |
| 0.1 | | | | | 0.04 | | 1:0.4 | 23 | 19 |
| 0.02 | | | | | 5.0 | | 1:250 | 100 | 100 |
| 0.02 | | | | | 1.0 | | 1:50 | 100 | 100 |
| 0.02 | | | | | 0.2 | | 1:10 | 100 | 75 |
| 0.02 | | | | | 0.04 | | 1:2 | 29 | 19 |
| 0.1 | | | | | | 10.0 | 1:100 | 100 | 100 |
| 0.1 | | | | | | 2.0 | 1:20 | 100 | 100 |
| 0.1 | | | | | | 0.4 | 1:4 | 20 | 15 |
| 0.1 | | | | | | 0.08 | 1:0.8 | 14 | 12 |
| 0.02 | | | | | | 10.0 | 1:500 | 100 | 100 |
| 0.02 | | | | | | 2.0 | 1:100 | 100 | 100 |
| 0.02 | | | | | | 0.4 | 1:20 | 29 | 15 |
| 0.02 | | | | | | 0.08 | 1:4 | 7 | 12 |

TABLE I2 in vitro-Test with *Ustilago segetum* var. *avenae*

| (I-052) (ppm) | (5.013) mancozeb (ppm) | (5.018) propineb (ppm) | (I-300) (ppm) | (2.005) fluopyram (ppm) | (2.038) isoflucypram (ppm) | (3.025) fenpicoxamid (ppm) | Ratio | Efficacy % | Colby expected value % |
|---|---|---|---|---|---|---|---|---|---|
| 0.1 | | | | | | | | 0 | |
| 0.02 | | | | | | | | 0 | |
| 0.004 | | | | | | | | 3 | |
| 0.0008 | | | | | | | | 2 | |
| | 10.0 | | | | | | | 98 | |
| | 2.0 | | | | | | | 10 | |
| | 0.4 | | | | | | | 0 | |
| | 0.08 | | | | | | | 3 | |
| | | 100.0 | | | | | | 82 | |
| | | 20.0 | | | | | | 98 | |
| | | 4.0 | | | | | | 12 | |
| | | 0.8 | | | | | | 3 | |
| 0.1 | 10.0 | | | | | | 1:100 | 100 | 98 |
| 0.1 | 2.0 | | | | | | 1:20 | 85 | 10 |
| 0.1 | 0.4 | | | | | | 1:4 | 0 | 0 |
| 0.1 | 0.08 | | | | | | 1:0.8 | 0 | 3 |
| 0.02 | 10.0 | | | | | | 1:500 | 96 | 98 |
| 0.02 | 2.0 | | | | | | 1:100 | 29 | 10 |
| 0.02 | 0.4 | | | | | | 1:20 | 0 | 0 |
| 0.02 | 0.08 | | | | | | 1:4 | 0 | 3 |
| 0.1 | | 100.0 | | | | | 1:1000 | 100 | 82 |
| 0.1 | | 20.0 | | | | | 1:200 | 98 | 98 |
| 0.1 | | 4.0 | | | | | 1:40 | 40 | 12 |
| 0.1 | | 0.8 | | | | | 1:8 | 1 | 3 |
| | | | 0.1 | | | | | 0 | |
| | | | 0.02 | | | | | 0 | |
| | | | 0.004 | | | | | 0 | |
| | | | 0.0008 | | | | | 0 | |
| | | | | 20.0 | | | | 10 | |
| | | | | 4.0 | | | | 10 | |
| | | | | 0.8 | | | | 9 | |
| | | | | 0.16 | | | | 15 | |

TABLE I2-continued in vitro-Test with *Ustilago segetum* var. *avenae*

| (I-052) (ppm) | (5.013) mancozeb (ppm) | (5.018) propineb (ppm) | (I-300) (ppm) | (2.005) fluopyram (ppm) | (2.038) isoflucypram (ppm) | (3.025) fenpicoxamid (ppm) | Ratio | Efficacy % | Colby expected value % |
|---|---|---|---|---|---|---|---|---|---|
| | | | | | 1.0 | | | 100 | |
| | | | | | 0.2 | | | 100 | |
| | | | | | 0.04 | | | 85 | |
| | | | | | 0.008 | | | 0 | |
| | | | | | | 5.0 | | 0 | |
| | | | | | | 1.0 | | 0 | |
| | | | | | | 0.2 | | 0 | |
| | | | | | | 0.04 | | 0 | |
| | | | 0.02 | 20.0 | | | 1:1000 | 11 | 10 |
| | | | 0.02 | 4.0 | | | 1:200 | 18 | 10 |
| | | | 0.02 | 0.8 | | | 1:40 | 19 | 9 |
| | | | 0.02 | 0.16 | | | 1:8 | 26 | 15 |
| | | | 0.004 | 20.0 | | | 1:5000 | 11 | 10 |
| | | | 0.004 | 4.0 | | | 1:1000 | 13 | 10 |
| | | | 0.004 | 0.8 | | | 1:200 | 13 | 10 |
| | | | 0.004 | 0.16 | | | 1:40 | 22 | 15 |
| | | | 0.1 | | 1.0 | | 1:10 | 100 | 100 |
| | | | 0.1 | | 0.2 | | 1:2 | 100 | 100 |
| | | | 0.1 | | 0.04 | | 1:0.4 | 100 | 85 |
| | | | 0.1 | | 0.008 | | 1:0.08 | 0 | 0 |
| | | | 0.02 | | 1.0 | | 1:50 | 100 | 100 |
| | | | 0.02 | | 0.2 | | 1:10 | 100 | 100 |
| | | | 0.02 | | 0.04 | | 1:2 | 98 | 85 |
| | | | 0.02 | | 0.008 | | 1:0.4 | 7 | 0 |
| | | | 0.004 | | 1.0 | | 1:250 | 100 | 100 |
| | | | 0.004 | | 0.2 | | 1:50 | 100 | 100 |
| | | | 0.004 | | 0.04 | | 1:10 | 99 | 85 |
| | | | 0.004 | | 0.008 | | 1:2 | 2 | 0 |
| | | | 0.1 | | | 5.0 | 1:50 | 86 | 0 |
| | | | 0.1 | | | 1.0 | 1:10 | 98 | 0 |
| | | | 0.1 | | | 0.2 | 1:2 | 0 | 0 |
| | | | 0.1 | | | 0.04 | 1:0.4 | 0 | 0 |

TABLE I3 in vitro-Test with *Ustilago segetum* var. *avenae*

| (I-300) (ppm) | (1.002) difeno-conazole (ppm) | (1.055) mefen-trifluconazole (ppm) | (13.001) fludioxonil (ppm) | (5.003) captan (ppm) | (5.010) dithianon (ppm) | (5.012) folpet (ppm) | Ratio | Efficacy % | Colby expected value % |
|---|---|---|---|---|---|---|---|---|---|
| 0.1 | | | | | | | | 0 | |
| 0.02 | | | | | | | | 0 | |
| 0.004 | | | | | | | | 0 | |
| 0.0008 | | | | | | | | 0 | |
| | 1.0 | | | | | | | 100 | |
| | 0.2 | | | | | | | 85 | |
| | 0.04 | | | | | | | 12 | |
| | 0.008 | | | | | | | 10 | |
| | | 1.0 | | | | | | 100 | |
| | | 0.2 | | | | | | 100 | |
| | | 0.04 | | | | | | 4 | |
| | | 0.008 | | | | | | 0 | |
| | | | 5.0 | | | | | 100 | |
| | | | 1.0 | | | | | 100 | |
| | | | 0.2 | | | | | 0 | |
| | | | | 20.0 | | | | 67 | |
| | | | | 4.0 | | | | 13 | |
| | | | | 0.8 | | | | 0 | |
| | | | | 0.16 | | | | 3 | |
| | | | | | 20.0 | | | 99 | |
| | | | | | 4.0 | | | 100 | |
| | | | | | 0.8 | | | 12 | |
| | | | | | 0.16 | | | 5 | |
| | | | | | | 10.0 | | 100 | |
| | | | | | | 2.0 | | 100 | |
| | | | | | | 0.4 | | 19 | |
| | | | | | | 0.08 | | 13 | |
| 0.1 | 1.0 | | | | | | 1:10 | 100 | 100 |
| 0.1 | 0.2 | | | | | | 1:2 | 100 | 85 |

TABLE I3-continued in vitro-Test with *Ustilago segetum* var. *avenae*

| (I-300) (ppm) | (1.002) difeno-conazole (ppm) | (1.055) mefen-trifluconazole (ppm) | (13.001) fludioxonil (ppm) | (5.003) captan (ppm) | (5.010) dithianon (ppm) | (5.012) folpet (ppm) | Ratio | Efficacy % | Colby expected value % |
|---|---|---|---|---|---|---|---|---|---|
| 0.1 | 0.04 | | | | | | 1:0.4 | 49 | 12 |
| 0.1 | 0.008 | | | | | | 1:0.08 | 4 | 10 |
| 0.02 | 1.0 | | | | | | 1:50 | 100 | 100 |
| 0.02 | 0.2 | | | | | | 1:10 | 90 | 85 |
| 0.02 | 0.04 | | | | | | 1:2 | 17 | 12 |
| 0.02 | 0.008 | | | | | | 1:0.4 | 12 | 10 |
| 0.02 | | 1.0 | | | | | 1:50 | 100 | 100 |
| 0.02 | | 0.2 | | | | | 1:10 | 100 | 100 |
| 0.02 | | 0.04 | | | | | 1:2 | 8 | 4 |
| 0.02 | | 0.008 | | | | | 1:0.4 | 0 | 0 |
| 0.0008 | | 1.0 | | | | | 1:1250 | 100 | 100 |
| 0.0008 | | 0.2 | | | | | 1:250 | 100 | 100 |
| 0.0008 | | 0.04 | | | | | 1:50 | 76 | 4 |
| 0.0008 | | 0.008 | | | | | 1:10 | 16 | 0 |
| 0.1 | | | 5.0 | | | | 1:50 | 100 | 100 |
| 0.1 | | | 1.0 | | | | 1:10 | 100 | 100 |
| 0.1 | | | 0.2 | | | | 1:2 | 100 | 0 |
| 0.02 | | | 5.0 | | | | 1:250 | 100 | 100 |
| 0.02 | | | 1.0 | | | | 1:50 | 100 | 100 |
| 0.02 | | | 0.2 | | | | 1:10 | 68 | 0 |
| 0.1 | | | | 20.0 | | | 1:200 | 100 | 67 |
| 0.1 | | | | 4.0 | | | 1:40 | 10 | 13 |
| 0.1 | | | | 0.8 | | | 1:8 | 0 | 0 |
| 0.1 | | | | 0.16 | | | 1:1.6 | 0 | 3 |
| 0.1 | | | | | 20.0 | | 1:200 | 100 | 99 |
| 0.1 | | | | | 4.0 | | 1:40 | 100 | 100 |
| 0.1 | | | | | 0.8 | | 1:8 | 22 | 12 |
| 0.1 | | | | | 0.16 | | 1:1.6 | 11 | 5 |
| 0.02 | | | | | 20.0 | | 1:1000 | 100 | 99 |
| 0.02 | | | | | 4.0 | | 1:200 | 100 | 100 |
| 0.02 | | | | | 0.8 | | 1:40 | 13 | 12 |
| 0.02 | | | | | 0.16 | | 1:8 | 15 | 5 |
| 0.004 | | | | | 20.0 | | 1:5000 | 100 | 99 |
| 0.004 | | | | | 4.0 | | 1:1000 | 100 | 100 |
| 0.004 | | | | | 0.8 | | 1:200 | 15 | 12 |
| 0.004 | | | | | 0.16 | | 1:40 | 10 | 5 |
| 0.1 | | | | | | 10.0 | 1:100 | 100 | 100 |
| 0.1 | | | | | | 2.0 | 1:20 | 100 | 100 |
| 0.1 | | | | | | 0.4 | 1:4 | 55 | 19 |
| 0.1 | | | | | | 0.08 | 1:0.8 | 22 | 13 |
| 0.02 | | | | | | 10.0 | 1:500 | 100 | 100 |
| 0.02 | | | | | | 2.0 | 1:100 | 100 | 100 |
| 0.02 | | | | | | 0.4 | 1:20 | 42 | 19 |
| 0.02 | | | | | | 0.08 | 1:4 | 20 | 13 |
| 0.004 | | | | | | 10.0 | 1:2500 | 100 | 100 |
| 0.004 | | | | | | 2.0 | 1:500 | 100 | 100 |
| 0.004 | | | | | | 0.4 | 1:100 | 37 | 20 |
| 0.004 | | | | | | 0.08 | 1:20 | 14 | 14 |
| 0.0008 | | | | | | 10.0 | 1:12500 | 100 | 100 |
| 0.0008 | | | | | | 2.0 | 1:2500 | 100 | 100 |
| 0.0008 | | | | | | 0.4 | 1:500 | 26 | 19 |
| 0.0008 | | | | | | 0.08 | 1:100 | 13 | 13 |

TABLE I4 in vitro-Test with *Ustilago segetum* var. *avenae*

| (I-300) (ppm) | (17.001) *Bacillus subtilis* (ppm) | (I-302) (ppm) | (2.038) isoflucypram (ppm) | (3.020) tri-floxystrobin (ppm) | (1.020) spiroxamine (ppm) | (13.001) fludioxonil (ppm) | Ratio | Efficacy % | Colby expected value % |
|---|---|---|---|---|---|---|---|---|---|
| 0.1 | | | | | | | | 0 | |
| 0.02 | | | | | | | | 0 | |
| 0.004 | | | | | | | | 0 | |
| 0.0008 | | | | | | | | 0 | |
| | 200.0 | | | | | | | 0 | |
| | 40.0 | | | | | | | 0 | |
| | 8.0 | | | | | | | 0 | |
| | 1.6 | | | | | | | 0 | |

TABLE I4-continued in vitro-Test with *Ustilago segetum* var. *avenae*

| (I-300) (ppm) | (17.001) *Bacillus subtilis* (ppm) | (I-302) (ppm) | (2.038) isoflucypram (ppm) | (3.020) tri-floxystrobin (ppm) | (1.020) spiroxamine (ppm) | (13.001) fludioxonil (ppm) | Ratio | Efficacy % | Colby expected value % |
|---|---|---|---|---|---|---|---|---|---|
| 0.1 | 200.0 | | | | | | 1:2000 | 28 | 0 |
| 0.1 | 40.0 | | | | | | 1:400 | 0 | 0 |
| 0.1 | 8.0 | | | | | | 1:80 | 0 | 0 |
| 0.1 | 1.6 | | | | | | 1:16 | 0 | 0 |
| | | 0.1 | | | | | | 0 | |
| | | 0.02 | | | | | | 0 | |
| | | 0.004 | | | | | | 0 | |
| | | 0.0008 | | | | | | 0 | |
| | | | 1.0 | | | | | 100 | |
| | | | 0.2 | | | | | 100 | |
| | | | 0.04 | | | | | 24 | |
| | | | 0.008 | | | | | 0 | |
| | | | | 5.0 | | | | 100 | |
| | | | | 1.0 | | | | 54 | |
| | | | | 0.2 | | | | 0 | |
| | | | | 0.04 | | | | 0 | |
| | | | | | 20.0 | | | 100 | |
| | | | | | 4.0 | | | 71 | |
| | | | | | 0.8 | | | 3 | |
| | | | | | 0.16 | | | 7 | |
| | | | | | | 5.0 | | 100 | |
| | | | | | | 1.0 | | 100 | |
| | | | | | | 0.2 | | 12 | |
| | | | | | | 0.04 | | 16 | |
| | | 0.1 | 1.0 | | | | 1:10 | 99 | 100 |
| | | 0.1 | 0.2 | | | | 1:2 | 100 | 100 |
| | | 0.1 | 0.04 | | | | 1:0.4 | 38 | 24 |
| | | 0.1 | 0.008 | | | | 1:0.08 | 0 | 0 |
| | | 0.02 | 1.0 | | | | 1:50 | 100 | 100 |
| | | 0.02 | 0.2 | | | | 1:10 | 100 | 100 |
| | | 0.02 | 0.04 | | | | 1:2 | 54 | 24 |
| | | 0.02 | 0.008 | | | | 1:0.4 | 0 | 0 |
| | | 0.004 | | 5.0 | | | 1:1250 | 100 | 100 |
| | | 0.004 | | 1.0 | | | 1:250 | 61 | 54 |
| | | 0.004 | | 0.2 | | | 1:50 | 0 | 0 |
| | | 0.004 | | 0.04 | | | 1:10 | 0 | 0 |
| | | 0.0008 | | 5.0 | | | 1:6250 | 99 | 100 |
| | | 0.0008 | | 1.0 | | | 1:1250 | 72 | 54 |
| | | 0.0008 | | 0.2 | | | 1:250 | 0 | 0 |
| | | 0.0008 | | 0.04 | | | 1:50 | 0 | 0 |
| | | 0.004 | | | 20.0 | | 1:5000 | 100 | 100 |
| | | 0.004 | | | 4.0 | | 1:1000 | 100 | 71 |
| | | 0.004 | | | 0.8 | | 1:200 | 8 | 3 |
| | | 0.004 | | | 0.16 | | 1:40 | 13 | 7 |
| | | 0.0008 | | | 20.0 | | 1:25000 | 100 | 100 |
| | | 0.0008 | | | 4.0 | | 1:5000 | 97 | 71 |
| | | 0.0008 | | | 0.8 | | 1:1000 | 19 | 3 |
| | | 0.0008 | | | 0.16 | | 1:200 | 22 | 7 |
| | | 0.02 | | | | 5.0 | 1:250 | 98 | 100 |
| | | 0.02 | | | | 1.0 | 1:50 | 100 | 100 |
| | | 0.02 | | | | 0.2 | 1:10 | 58 | 12 |
| | | 0.02 | | | | 0.04 | 1:2 | 19 | 16 |

TABLE I5 in vitro-Test with *Ustilago segetum* var. *avenae*

| (I-302) (ppm) | (5.003) captan (ppm) | (5.010) dithianon (ppm) | (5.012) folpet (ppm) | Ratio | Efficacy % | Colby expected value % |
|---|---|---|---|---|---|---|
| 0.1 | | | | | 0 | |
| 0.02 | | | | | 0 | |
| 0.004 | | | | | 0 | |
| 0.0008 | | | | | 0 | |
| | 20.0 | | | | 100 | |
| | 4.0 | | | | 100 | |
| | 0.8 | | | | 0 | |
| | 0.16 | | | | 0 | |
| | | 20.0 | | | 99 | |

TABLE I5-continued in vitro-Test with *Ustilago segetum* var. *avenae*

| (I-302) (ppm) | (5.003) captan (ppm) | (5.010) dithianon (ppm) | (5.012) folpet (ppm) | Ratio | Efficacy % | Colby expected value % |
|---|---|---|---|---|---|---|
| | | 4.0 | | | 100 | |
| | | 0.8 | | | 8 | |
| | | | 10.0 | | 100 | |
| | | | 2.0 | | 100 | |
| | | | 0.4 | | 15 | |
| | | | 0.08 | | 4 | |
| 0.1 | 20.0 | | | 1:200 | 100 | 100 |
| 0.1 | 4.0 | | | 1:40 | 100 | 100 |
| 0.1 | 0.8 | | | 1:8 | 10 | 0 |

TABLE I5-continued in vitro-Test with *Ustilago segetum* var. *avenae*

| (I-302) (ppm) | (5.003) captan (ppm) | (5.010) dithianon (ppm) | (5.012) folpet (ppm) | Ratio | Efficacy % | Colby expected value % |
|---|---|---|---|---|---|---|
| 0.1 | 0.16 | | | 1:1.6 | 7 | 0 |
| 0.02 | 20.0 | | | 1:1000 | 100 | 100 |
| 0.02 | 4.0 | | | 1:200 | 100 | 100 |
| 0.02 | 0.8 | | | 1:40 | 0 | 0 |
| 0.02 | 0.16 | | | 1:8 | 10 | 0 |
| 0.1 | | 20.0 | | 1:200 | 100 | 99 |
| 0.1 | | 4.0 | | 1:40 | 100 | 100 |
| 0.1 | | 0.8 | | 1:8 | 93 | 8 |
| 0.02 | | 20.0 | | 1:1000 | 100 | 99 |
| 0.02 | | 4.0 | | 1:200 | 100 | 100 |
| 0.02 | | 0.8 | | 1:40 | 15 | 8 |
| 0.0008 | | 20.0 | | 1:25000 | 100 | 99 |
| 0.0008 | | 4.0 | | 1:5000 | 100 | 100 |
| 0.0008 | | 0.8 | | 1:1000 | 10 | 8 |

TABLE I5-continued in vitro-Test with *Ustilago segetum* var. *avenae*

| (I-302) (ppm) | (5.003) captan (ppm) | (5.010) dithianon (ppm) | (5.012) folpet (ppm) | Ratio | Efficacy % | Colby expected value % |
|---|---|---|---|---|---|---|
| 0.1 | | | 10.0 | 1:100 | 100 | 100 |
| 0.1 | | | 2.0 | 1:20 | 100 | 100 |
| 0.1 | | | 0.4 | 1:4 | 25 | 15 |
| 0.1 | | | 0.08 | 1:0.8 | 12 | 4 |
| 0.004 | | | 10.0 | 1:2500 | 100 | 100 |
| 0.004 | | | 2.0 | 1:500 | 100 | 100 |
| 0.004 | | | 0.4 | 1:100 | 36 | 15 |
| 0.004 | | | 0.08 | 1:20 | 0 | 4 |
| 0.0008 | | | 10.0 | 1:12500 | 100 | 100 |
| 0.0008 | | | 2.0 | 1:2500 | 100 | 100 |
| 0.0008 | | | 0.4 | 1:500 | 27 | 15 |
| 0.0008 | | | 0.08 | 1:100 | 10 | 4 |

TABLE I6 in vitro-Test with *Ustilago segetum* var. *avenae*

| (I-339) (ppm) | (1.067) (ppm) | (13.001) fludioxonil (ppm) | (3.012) fluoxa-strobin (ppm) | (1.062) fluoxytio-conazole (ppm) | (2.038) isoflucypram (ppm) | (1.055) mefen-trifluconazole (ppm) | Ratio | Efficacy % | Colby expected value % |
|---|---|---|---|---|---|---|---|---|---|
| 1 | | | | | | | | 0 | |
| 0.2 | | | | | | | | 0 | |
| 0.04 | | | | | | | | 0 | |
| 0.008 | | | | | | | | 2 | |
| | 0.08 | | | | | | | 100 | |
| | 0.016 | | | | | | | 55 | |
| | | 5 | | | | | | 100 | |
| | | 0.2 | | | | | | 93 | |
| | | 0.04 | | | | | | 55 | |
| | | | 0.08 | | | | | 16 | |
| | | | 0.016 | | | | | 13 | |
| | | | | 0.2 | | | | 100 | |
| | | | | 0.04 | | | | 35 | |
| | | | | 0.008 | | | | 8 | |
| | | | | | 0.2 | | | 100 | |
| | | | | | 0.04 | | | 5 | |
| | | | | | 0.008 | | | 2 | |
| | | | | | | 1 | | 100 | |
| | | | | | | 0.2 | | 53 | |
| 0.2 | 0.08 | | | | | | 1:0.4 | 100 | 100 |
| 0.2 | 0.016 | | | | | | 1:0.08 | 79 | 55 |
| 0.04 | 0.08 | | | | | | 1:2 | 100 | 100 |
| 0.04 | 0.016 | | | | | | 1:0.4 | 62 | 55 |
| 1 | | 5 | | | | | 1:5 | 100 | 100 |
| 1 | | 0.2 | | | | | 1:0.2 | 99 | 93 |
| 1 | | 0.04 | | | | | 1:0.04 | 62 | 55 |
| 0.2 | | 5 | | | | | 1:25 | 100 | 100 |
| 0.04 | | 0.2 | | | | | 1:5 | 96 | 93 |
| 0.04 | | 0.04 | | | | | 1:1 | 60 | 55 |
| 0.008 | | 5 | | | | | 1:625 | 100 | 100 |
| 0.008 | | 0.2 | | | | | 1:25 | 98 | 93 |
| 0.008 | | 0.04 | | | | | 1:5 | 56 | 57 |
| 1 | | | 0.08 | | | | 1:0.08 | 27 | 16 |
| 1 | | | 0.016 | | | | 1:0.016 | 16 | 13 |
| 0.008 | | | 0.08 | | | | 1:10 | 24 | 18 |
| 0.008 | | | 0.016 | | | | 1:2 | 18 | 15 |
| 1 | | | | 0.2 | | | 1:0.2 | 100 | 100 |
| 1 | | | | 0.04 | | | 1:0.04 | 44 | 35 |
| 1 | | | | 0.008 | | | 1:0.008 | 6 | 8 |
| 0.2 | | | | 0.2 | | | 1:1 | 100 | 100 |
| 0.2 | | | | 0.04 | | | 1:0.2 | 38 | 35 |
| 0.2 | | | | 0.008 | | | 1:0.04 | 14 | 8 |
| 0.04 | | | | 0.2 | | | 1:5 | 100 | 100 |
| 0.04 | | | | 0.04 | | | 1:1 | 46 | 35 |
| 0.04 | | | | 0.008 | | | 1:0.2 | 8 | 8 |
| 1 | | | | | 0.2 | | 1:0.2 | 100 | 100 |
| 1 | | | | | 0.04 | | 1:0.04 | 19 | 5 |
| 1 | | | | | 0.008 | | 1:0.008 | 4 | 2 |

TABLE I6-continued

| in vitro-Test with *Ustilago segetum* var. *avenae* | | | | | | | | | |
|---|---|---|---|---|---|---|---|---|---|
| (I-339) (ppm) | (1.067) (ppm) | (13.001) fludioxonil (ppm) | (3.012) fluoxa-strobin (ppm) | (1.062) fluoxytio-conazole (ppm) | (2.038) isoflucypram (ppm) | (1.055) mefen-trifluconazole (ppm) | Ratio | Efficacy % | Colby expected value % |
| 0.2 | | | | | 0.2 | | 1:1 | 100 | 100 |
| 0.2 | | | | | 0.04 | | 1:0.2 | 17 | 5 |
| 0.2 | | | | | 0.008 | | 1:0.04 | 7 | 2 |
| 0.04 | | | | | 0.2 | | 1:5 | 100 | 100 |
| 0.04 | | | | | 0.04 | | 1:1 | 27 | 5 |
| 0.04 | | | | | 0.008 | | 1:0.2 | 6 | 2 |
| 0.008 | | | | | 0.2 | | 1:25 | 100 | 100 |
| 0.008 | | | | | 0.04 | | 1:5 | 20 | 6 |
| 0.008 | | | | | 0.008 | | 1:1 | 0 | 3 |
| 0.2 | | | | | | 1 | 1:5 | 100 | 100 |
| 0.2 | | | | | | 0.2 | 1:1 | 58 | 53 |
| 0.04 | | | | | | 1 | 1:25 | 100 | 100 |
| 0.04 | | | | | | 0.2 | 1:5 | 59 | 53 |
| 0.008 | | | | | | 1 | 1:125 | 100 | 100 |
| 0.008 | | | | | | 0.2 | 1:25 | 73 | 53 |

TABLE I7

| in vitro-Test with *Ustilago segetum* var. *avenae* | | | | | | | | |
|---|---|---|---|---|---|---|---|---|
| (I-339) (ppm) | (12.004) meta-laxyl-m (ppm) | (3.030) metyl-tetraprole (ppm) | (7.005) pyrimethanil (ppm) | (1.020) spiroxamin (ppm) | (3.020) trifloxystrobin (ppm) | Ratio | Efficacy % | Colby expected value % |
| 1 | | | | | | | 0 | |
| 0.2 | | | | | | | 0 | |
| 0.04 | | | | | | | 0 | |
| 0.008 | | | | | | | 2 | |
| | 20 | | | | | | 12 | |
| | 4 | | | | | | 8 | |
| | 0.8 | | | | | | 11 | |
| | | 1 | | | | | 34 | |
| | | | 4 | | | | 42 | |
| | | | 0.8 | | | | 18 | |
| | | | 0.16 | | | | 12 | |
| | | | | 20 | | | 74 | |
| | | | | | 0.2 | | 54 | |
| | | | | | 0.04 | | 38 | |
| 1 | 20 | | | | | 1:20 | 12 | 12 |
| 1 | 4 | | | | | 1:4 | 18 | 8 |
| 1 | 0.8 | | | | | 1:0.8 | 15 | 11 |
| 0.008 | 20 | | | | | 1:2500 | 12 | 12 |
| 0.008 | 4 | | | | | 1:500 | 18 | 8 |
| 0.008 | 0.8 | | | | | 1:100 | 19 | 11 |
| 0.2 | | 1 | | | | 1:5 | 42 | 34 |
| 0.04 | | 1 | | | | 1:25 | 39 | 34 |
| 0.008 | | 1 | | | | 1:125 | 46 | 37 |
| 1 | | | 4 | | | 1:4 | 53 | 42 |
| 1 | | | 0.8 | | | 1:0.8 | 51 | 18 |
| 1 | | | 0.16 | | | 1:0.16 | 45 | 12 |
| 0.008 | | | 4 | | | 1:500 | 42 | 42 |
| 0.008 | | | 0.8 | | | 1:100 | 40 | 18 |
| 0.008 | | | 0.16 | | | 1:20 | 42 | 12 |
| 1 | | | | 20 | | 1:20 | 100 | 74 |
| 0.2 | | | | 20 | | 1:100 | 100 | 74 |
| 0.04 | | | | 20 | | 1:500 | 100 | 74 |
| 0.2 | | | | | 0.2 | 1:1 | 55 | 54 |
| 0.2 | | | | | 0.04 | 1:0.2 | 39 | 38 |
| 0.04 | | | | | 0.2 | 1:5 | 52 | 54 |
| 0.04 | | | | | 0.04 | 1:1 | 45 | 38 |

TABLE I8 in vitro-Test with *Ustilago segetum* var. *avenae*

| (I-338) (ppm) | (17.001) (ppm) | (2.002) bixafen (ppm) | (5.003) captan (ppm) | (1.002) difenoconazole (ppm) | (5.010) dithianon (ppm) | (3.025) fenpicoxamid (ppm) | Ratio | Efficacy % | Colby expected value % |
|---|---|---|---|---|---|---|---|---|---|
| 1 | | | | | | | | 0 | |
| 0.2 | | | | | | | | 0 | |
| 0.04 | | | | | | | | 0 | |
| 0.008 | | | | | | | | 0 | |
| | 1.6 | | | | | | | 0 | |
| | | 0.2 | | | | | | 44 | |
| | | | 1 | | | | | 28 | |
| | | | | 0.2 | | | | 100 | |
| | | | | 0.04 | | | | 40 | |
| | | | | 0.008 | | | | 2 | |
| | | | | | 2 | | | 29 | |
| | | | | | 0.4 | | | 0 | |
| | | | | | 0.08 | | | 2 | |
| | | | | | | 0.2 | | 1 | |
| | | | | | | 0.04 | | 6 | |
| | | | | | | 0.008 | | 14 | |
| 0.2 | 1.6 | | | | | | 1:8 | 6 | 0 |
| 0.04 | 1.6 | | | | | | 1:40 | 12 | 0 |
| 0.008 | 1.6 | | | | | | 1:200 | 5 | 1 |
| 0.2 | | 0.2 | | | | | 1:1 | 67 | 44 |
| 0.04 | | 0.2 | | | | | 1:5 | 57 | 44 |
| 0.008 | | 0.2 | | | | | 1:25 | 64 | 44 |
| 0.2 | | | 1 | | | | 1:5 | 32 | 28 |
| 0.04 | | | 1 | | | | 1:25 | 30 | 28 |
| 0.008 | | | 1 | | | | 1:125 | 36 | 28 |
| 0.04 | | | | 0.2 | | | 1:5 | 100 | 100 |
| 0.04 | | | | 0.04 | | | 1:1 | 42 | 41 |
| 0.04 | | | | 0.008 | | | 1:0.2 | 13 | 3 |
| 0.008 | | | | 0.2 | | | 1:25 | 99 | 100 |
| 0.008 | | | | 0.04 | | | 1:5 | 42 | 40 |
| 0.008 | | | | 0.008 | | | 1:1 | 9 | 2 |
| 0.2 | | | | | 2 | | 1:10 | 39 | 29 |
| 0.2 | | | | | 0.4 | | 1:2 | 5 | 0 |
| 0.2 | | | | | 0.08 | | 1:0.4 | 3 | 2 |
| 0.04 | | | | | 2 | | 1:50 | 36 | 30 |
| 0.04 | | | | | 0.4 | | 1:10 | 2 | 1 |
| 0.04 | | | | | 0.08 | | 1:2 | 4 | 3 |
| 1 | | | | | | 0.2 | 1:0.2 | 5 | 1 |
| 1 | | | | | | 0.04 | 1:0.04 | 11 | 6 |
| 1 | | | | | | 0.008 | 1:0.008 | 17 | 14 |
| 0.2 | | | | | | 0.2 | 1:1 | 13 | 1 |
| 0.2 | | | | | | 0.04 | 1:0.2 | 7 | 6 |
| 0.2 | | | | | | 0.008 | 1:0.04 | 14 | 14 |
| 0.04 | | | | | | 0.2 | 1:5 | 11 | 2 |
| 0.04 | | | | | | 0.04 | 1:1 | 12 | 7 |
| 0.04 | | | | | | 0.008 | 1:0.2 | 14 | 15 |

TABLE I9 in vitro-Test with *Ustilago segetum* var. *avenae*

| (I-338) (ppm) | (2.005) fluopyram (ppm) | (3.012) fluoxastrobin (ppm) | (1.062) fluoxytioconazole (ppm) | (5.012) folpet (ppm) | (15.012) fosetylal (ppm) | (2.038) isoflucypram (ppm) | Ratio | Efficacy % | Colby expected value % |
|---|---|---|---|---|---|---|---|---|---|
| 1 | | | | | | | | 0 | |
| 0.2 | | | | | | | | 0 | |
| 0.04 | | | | | | | | 0 | |
| 0.008 | | | | | | | | 0 | |
| | 20 | | | | | | | 20 | |
| | | 0.4 | | | | | | 51 | |
| | | 0.08 | | | | | | 18 | |
| | | | 0.04 | | | | | 43 | |
| | | | | 1 | | | | 6 | |
| | | | | | 20 | | | 0 | |
| | | | | | 0.8 | | | 2 | |
| | | | | | | 0.2 | | 100 | |
| | | | | | | 0.04 | | 17 | |
| | | | | | | 0.008 | | 9 | |

TABLE I9-continued in vitro-Test with *Ustilago segetum* var. *avenae*

| (I-338) (ppm) | (2.005) fluopyram (ppm) | (3.012) fluoxastrobin (ppm) | (1.062) fluoxytioconazole (ppm) | (5.012) folpet (ppm) | (15.012) fosetylal (ppm) | (2.038) isoflucypram (ppm) | Ratio | Efficacy % | Colby expected value % |
|---|---|---|---|---|---|---|---|---|---|
| 1 | 20 | | | | | | 1:20 | 32 | 20 |
| 0.04 | 20 | | | | | | 1:500 | 19 | 20 |
| 0.008 | 20 | | | | | | 1:2500 | 21 | 20 |
| 1 | | 0.4 | | | | | 1:0.4 | 52 | 51 |
| 1 | | 0.08 | | | | | 1:0.08 | 24 | 18 |
| 0.2 | | 0.4 | | | | | 1:2 | 51 | 51 |
| 0.2 | | 0.08 | | | | | 1:0.4 | 22 | 18 |
| 0.04 | | 0.4 | | | | | 1:10 | 51 | 51 |
| 0.04 | | 0.08 | | | | | 1:2 | 20 | 18 |
| 0.008 | | 0.4 | | | | | 1:50 | 50 | 51 |
| 0.008 | | 0.08 | | | | | 1:10 | 29 | 18 |
| 1 | | | 0.04 | | | | 1:0.04 | 48 | 43 |
| 0.04 | | | 0.04 | | | | 1:1 | 57 | 43 |
| 0.008 | | | 0.04 | | | | 1:5 | 43 | 43 |
| 1 | | | | 1 | | | 1:1 | 41 | 26 |
| 0.2 | | | | 1 | | | 1:5 | 19 | 6 |
| 0.04 | | | | 1 | | | 1:25 | 16 | 6 |
| 0.008 | | | | 1 | | | 1:125 | 20 | 6 |
| 0.2 | | | | | 20 | | 1:100 | 15 | 0 |
| 0.2 | | | | | 0.8 | | 1:4 | 25 | 2 |
| 0.04 | | | | | 20 | | 1:500 | 10 | 0 |
| 0.04 | | | | | 0.8 | | 1:20 | 8 | 2 |
| 0.008 | | | | | 20 | | 1:2500 | 11 | 0 |
| 0.008 | | | | | 0.8 | | 1:100 | 4 | 2 |
| 0.04 | | | | | | 0.2 | 1:5 | 100 | 100 |
| 0.04 | | | | | | 0.04 | 1:1 | 28 | 17 |
| 0.008 | | | | | | 0.2 | 1:25 | 100 | 100 |
| 0.008 | | | | | | 0.04 | 1:5 | 13 | 17 |

TABLE I10 in vitro-Test with *Ustilago segetum* var. *avenae*

| (I-338) (ppm) | (1.055) mefentri-fluconazole (ppm) | (12.004) metalaxylm (ppm) | (15.016) metrafenone (ppm) | (3.030) metyltetraprole (ppm) | (17.012) *Paenibacillus terrae* (ppm) | (5.018) propineb (ppm) | Ratio | Efficacy % | Colby expected value % |
|---|---|---|---|---|---|---|---|---|---|
| 1 | | | | | | | | 0 | |
| 0.2 | | | | | | | | 0 | |
| 0.04 | | | | | | | | 0 | |
| 0.008 | | | | | | | | 0 | |
| | 1 | | | | | | | 100 | |
| | 0.2 | | | | | | | 41 | |
| | 0.04 | | | | | | | 3 | |
| | 0.008 | | | | | | | 4 | |
| | | 100 | | | | | | 3 | |
| | | 0.8 | | | | | | 8 | |
| | | | 0.2 | | | | | 0 | |
| | | | 0.04 | | | | | 4 | |
| | | | | 1 | | | | 21 | |
| | | | | 0.2 | | | | 0 | |
| | | | | | 40 | | | 82 | |
| | | | | | 1.6 | | | 3 | |
| | | | | | | 20 | | 22 | |
| 1 | 1 | | | | | | 1:1 | 100 | 100 |
| 1 | 0.2 | | | | | | 1:0.2 | 53 | 41 |
| 1 | 0.04 | | | | | | 1:0.04 | 5 | 3 |
| 1 | 0.008 | | | | | | 1:0.008 | 18 | 4 |
| 0.2 | 1 | | | | | | 1:5 | 100 | 100 |
| 0.2 | 0.2 | | | | | | 1:1 | 52 | 41 |
| 0.2 | 0.04 | | | | | | 1:0.2 | 6 | 3 |
| 0.2 | 0.008 | | | | | | 1:0.04 | 14 | 4 |
| 0.04 | 1 | | | | | | 1:25 | 100 | 100 |
| 0.04 | 0.2 | | | | | | 1:5 | 55 | 41 |
| 0.04 | 0.04 | | | | | | 1:1 | 9 | 3 |
| 0.04 | 0.008 | | | | | | 1:0.2 | 11 | 4 |
| 0.008 | 1 | | | | | | 1:125 | 100 | 100 |
| 0.008 | 0.2 | | | | | | 1:25 | 45 | 41 |
| 0.008 | 0.04 | | | | | | 1:5 | 13 | 3 |
| 0.008 | 0.008 | | | | | | 1:1 | 0 | 4 |

TABLE I10-continued in vitro-Test with *Ustilago segetum* var. *avenae*

| (I-338) (ppm) | (1.055) mefentri-fluconazole (ppm) | (12.004) metalaxylm (ppm) | (15.016) metrafenone (ppm) | (3.030) metyltetraprole (ppm) | (17.012) *Paenibacillus terrae* (ppm) | (5.018) propineb (ppm) | Ratio | Efficacy % | Colby expected value % |
|---|---|---|---|---|---|---|---|---|---|
| 1 | | 100 | | | | | 1:100 | 14 | 3 |
| 1 | | 0.8 | | | | | 1:0.8 | 13 | 8 |
| 0.2 | | 100 | | | | | 1:500 | 9 | 3 |
| 0.2 | | 0.8 | | | | | 1:4 | 14 | 8 |
| 0.2 | | | 0.2 | | | | 1:1 | 11 | 0 |
| 0.2 | | | 0.04 | | | | 1:0.2 | 14 | 4 |
| 0.008 | | | 0.2 | | | | 1:25 | 19 | 0 |
| 0.008 | | | 0.04 | | | | 1:5 | 13 | 4 |
| 1 | | | | 1 | | | 1:1 | 39 | 21 |
| 1 | | | | 0.2 | | | 1:0.2 | 0 | 0 |
| 0.2 | | | | 1 | | | 1:5 | 29 | 21 |
| 0.2 | | | | 0.2 | | | 1:1 | 0 | 0 |
| 0.04 | | | | 1 | | | 1:25 | 33 | 21 |
| 0.04 | | | | 0.2 | | | 1:5 | 0 | 0 |
| 0.008 | | | | 1 | | | 1:125 | 25 | 21 |
| 0.008 | | | | 0.2 | | | 1:25 | 11 | 0 |
| 0.2 | | | | | 40 | | 1:200 | 85 | 82 |
| 0.2 | | | | | 1.6 | | 1:8 | 13 | 3 |
| 0.04 | | | | | 40 | | 1:1000 | 95 | 82 |
| 0.04 | | | | | 1.6 | | 1:40 | 11 | 3 |
| 0.008 | | | | | 40 | | 1:5000 | 96 | 82 |
| 0.008 | | | | | 1.6 | | 1:200 | 15 | 3 |
| 1 | | | | | | 20 | 1:20 | 59 | 22 |
| 0.2 | | | | | | 20 | 1:100 | 47 | 22 |
| 0.04 | | | | | | 20 | 1:500 | 65 | 22 |
| 0.008 | | | | | | 20 | 1:2500 | 28 | 22 |

TABLE I11 in vitro-Test with *Ustilago segetum* var. *avenae*

| (I-338) (ppm) | (7.005) pyrimethanil (ppm) | (13.005) quinoxyfen (ppm) | (1.020) spiroxamin (ppm) | (3.020) trifloxy strobin (ppm) | (I-130) (ppm) | (17.012) *Paenibacillus terrae* (ppm) | (5.018) propineb (ppm) | Ratio | Efficacy % | Colby expected value % |
|---|---|---|---|---|---|---|---|---|---|---|
| 1 | | | | | | | | | 0 | |
| 0.2 | | | | | | | | | 0 | |
| 0.04 | | | | | | | | | 0 | |
| 0.008 | | | | | | | | | 0 | |
| | 20 | | | | | | | | 49 | |
| | 4 | | | | | | | | 24 | |
| | 0.8 | | | | | | | | 16 | |
| | 0.16 | | | | | | | | 16 | |
| | | 10 | | | | | | | 9 | |
| | | 2 | | | | | | | 0 | |
| | | 0.08 | | | | | | | 0 | |
| | | | 20 | | | | | | 100 | |
| | | | 0.8 | | | | | | 0 | |
| | | | 0.16 | | | | | | 0 | |
| | | | | 1 | | | | | 60 | |
| | | | | 0.2 | | | | | 50 | |
| | | | | | 1 | | | | 16 | |
| | | | | | 0.2 | | | | 0 | |
| | | | | | 0.04 | | | | 0 | |
| | | | | | 0.008 | | | | 0 | |
| | | | | | | 200 | | | 100 | |
| | | | | | | 40 | | | 57 | |
| | | | | | | 1.6 | | | 0 | |
| | | | | | | | 100 | | 92 | |
| 1 | 4 | | | | | | | 1:4 | 38 | 24 |
| 1 | 0.8 | | | | | | | 1:0.8 | 18 | 16 |
| 1 | 0.16 | | | | | | | 1:0.16 | 31 | 16 |
| 0.2 | 20 | | | | | | | 1:100 | 66 | 49 |
| 0.2 | 4 | | | | | | | 1:20 | 32 | 24 |
| 0.2 | 0.8 | | | | | | | 1:4 | 21 | 16 |
| 0.2 | 0.16 | | | | | | | 1:0.8 | 17 | 16 |
| 0.04 | 4 | | | | | | | 1:100 | 35 | 24 |
| 0.04 | 0.8 | | | | | | | 1:20 | 22 | 16 |
| 0.04 | 0.16 | | | | | | | 1:4 | 25 | 16 |

TABLE I11-continued in vitro-Test with *Ustilago segetum* var. *avenae*

| (I-338) (ppm) | (7.005) pyrimethanil (ppm) | (13.005) quinoxyfen (ppm) | (1.020) spiroxamin (ppm) | (3.020) trifloxy strobin (ppm) | (I-130) (ppm) | (17.012) *Paenibacillus terrae* (ppm) | (5.018) propineb (ppm) | Ratio | Efficacy % | Colby expected value % |
|---|---|---|---|---|---|---|---|---|---|---|
| 1 | | 10 | | | | | | 1:10 | 35 | 9 |
| 1 | | 2 | | | | | | 1:2 | 4 | 0 |
| 1 | | 0.08 | | | | | | 1:0.08 | 6 | 0 |
| 0.2 | | 10 | | | | | | 1:50 | 22 | 9 |
| 0.2 | | 2 | | | | | | 01:10 | 15 | 0 |
| 0.2 | | 0.08 | | | | | | 1:0.4 | 100 | 0 |
| 0.04 | | 10 | | | | | | 1:250 | 31 | 9 |
| 0.04 | | 2 | | | | | | 1:50 | 20 | 0 |
| 0.04 | | 0.08 | | | | | | 1:2 | 100 | 0 |
| 0.008 | | 10 | | | | | | 1:1250 | 23 | 9 |
| 0.008 | | 2 | | | | | | 1:250 | 7 | 0 |
| 1 | | | 20 | | | | | 1:20 | 100 | 100 |
| 1 | | | 0.8 | | | | | 1:0.8 | 12 | 0 |
| 1 | | | 0.16 | | | | | 1:0.16 | 0 | 0 |
| 0.04 | | | 20 | | | | | 1:500 | 100 | 100 |
| 0.04 | | | 0.8 | | | | | 1:20 | 0 | 0 |
| 0.04 | | | 0.16 | | | | | 1:4 | 6 | 0 |
| 1 | | | | 1 | | | | 1:1 | 64 | 60 |
| 1 | | | | 0.2 | | | | 1:0.2 | 54 | 50 |
| 0.2 | | | | 1 | | | | 1:5 | 62 | 60 |
| 0.2 | | | | 0.2 | | | | 1:1 | 52 | 50 |
| 0.008 | | | | 1 | | | | 1:125 | 65 | 60 |
| 0.008 | | | | 0.2 | | | | 1:25 | 58 | 50 |
| | | | | | 0.04 | 200 | | 1:5000 | 100 | 100 |
| | | | | | 0.04 | 40 | | 1:1000 | 90 | 57 |
| | | | | | 0.04 | 1.6 | | 1:40 | 0 | 0 |
| | | | | | 0.008 | 200 | | 1:25000 | 100 | 100 |
| | | | | | 0.008 | 40 | | 1:5000 | 57 | 57 |
| | | | | | 0.008 | 1.6 | | 1:200 | 0 | 0 |
| | | | | | 1 | | 100 | 1:100 | 95 | 93 |
| | | | | | 0.2 | | 100 | 1:500 | 95 | 92 |
| | | | | | 0.04 | | 100 | 1:2500 | 95 | 92 |

TABLE J1 in vitro-Test with *Colletotrichum coccodes*

| (I-339) (ppm) | (13.005) quinoxyfen (ppm) | (1.020) spiroxamin (ppm) | (1.021) tebuconazole (ppm) | (3.020) trifloxystrobin (ppm) | (1.067) (ppm) | (2.002) bixafen (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 86 | |
| | 2 | | | | | | | 48 | |
| | 0.4 | | | | | | | 0 | |
| | 0.08 | | | | | | | 0 | |
| | | 20 | | | | | | 0 | |
| | | 4 | | | | | | 0 | |
| | | 0.8 | | | | | | 0 | |
| | | 0.16 | | | | | | 49 | |
| | | | 0.2 | | | | | 4 | |
| | | | 0.04 | | | | | 0 | |
| | | | | 0.04 | | | | 35 | |
| | | | | | 2 | | | 99 | |
| | | | | | 0.4 | | | 0 | |
| | | | | | | 1 | | 0 | |
| | | | | | | 0.2 | | 0 | |
| | | | | | | 0.04 | | 45 | |
| | | | | | | 0.008 | | 33 | |
| 0.008 | 2 | | | | | | 1:250 | 89 | 93 |
| 0.008 | 0.4 | | | | | | 1:50 | 95 | 86 |
| 0.008 | 0.08 | | | | | | 1:10 | 92 | 86 |
| 0.008 | | 20 | | | | | 1:2500 | 89 | 86 |
| 0.008 | | 4 | | | | | 1:500 | 96 | 86 |
| 0.008 | | 0.8 | | | | | 1:100 | 100 | 86 |
| 0.008 | | 0.16 | | | | | 1:20 | 100 | 93 |
| 0.04 | | | 0.2 | | | | 1:5 | 100 | 100 |

TABLE J1-continued in vitro-Test with *Colletotrichum coccodes*

| (I-339) (ppm) | (13.005) quinoxyfen (ppm) | (1.020) spiroxamin (ppm) | (1.021) tebuconazole (ppm) | (3.020) trifloxystrobin (ppm) | (1.067) (ppm) | (2.002) bixafen (ppm) | Ratio | Efficacy % | Colby expected value % |
|---|---|---|---|---|---|---|---|---|---|
| 0.04 | | | 0.04 | | | | 1:1 | 100 | 100 |
| 0.008 | | | 0.2 | | | | 1:25 | 86 | 87 |
| 0.008 | | | 0.04 | | | | 1:5 | 98 | 86 |
| 1 | | | | 0.04 | | | 1:0.04 | 100 | 100 |
| 0.2 | | | | 0.04 | | | 1:0.2 | 98 | 100 |
| 0.008 | | | | 0.04 | | | 1:5 | 98 | 91 |
| 0.2 | | | | | 2 | | 1:10 | 100 | 100 |
| 0.2 | | | | | 0.4 | | 1:2 | 100 | 100 |
| 0.008 | | | | | 2 | | 1:250 | 100 | 100 |
| 0.008 | | | | | 0.4 | | 1:50 | 53 | 40 |
| 0.008 | | | | | | 1 | 1:125 | 64 | 40 |
| 0.008 | | | | | | 0.2 | 1:25 | 78 | 40 |
| 0.008 | | | | | | 0.04 | 1:5 | 68 | 67 |
| 0.008 | | | | | | 0.008 | 1:1 | 66 | 60 |

TABLE J2 in vitro-Test with *Colletotrichum coccodes*

| (I-339) (ppm) | (5.003) captan (ppm) | (1.002) difenoconazole (ppm) | (13.001) fludioxonil (ppm) | (2.005) fluopyram (ppm) | (15.043) fluoxapiprolin (ppm) | (3.012) fluoxa¬strobin (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 86 | |
| | 0.2 | | | | | | | 0 | |
| | | 0.2 | | | | | | 0.31 | |
| | | 0.04 | | | | | | | |
| | | | 5 | | | | | 100 | |
| | | | 1 | | | | | 100 | |
| | | | 0.04 | | | | | 54 | |
| | | | | 4 | | | | 14 | |
| | | | | 0.16 | | | | 30 | |
| | | | | | 20 | | | 0 | |
| | | | | | 0.8 | | | 0 | |
| | | | | | | 0.08 | | 41 | |
| | | | | | | 0.016 | | 28 | |
| 1 | 0.2 | | | | | | 1:0.2 | 100 | 100 |
| 0.2 | 0.2 | | | | | | 1:1 | 100 | 100 |
| 0.008 | 0.2 | | | | | | 1:25 | 47 | 40 |
| 0.2 | | 0.2 | | | | | 1:1 | 100 | 100 |
| 0.2 | | 0.04 | | | | | 1:0.2 | 100 | 100 |
| 0.008 | | 0.2 | | | | | 1:25 | 83 | 69 |
| 0.008 | | 0.04 | | | | | 1:5 | 86 | 78 |
| 0.008 | | | 5 | | | | 1:625 | 100 | 100 |
| 0.008 | | | 1 | | | | 1:125 | 100 | 100 |
| 0.008 | | | 0.04 | | | | 1:5 | 94 | 86 |
| 0.04 | | | | 4 | | | 1:100 | 100 | 100 |
| 0.04 | | | | 0.16 | | | 1:4 | 100 | 100 |
| 0.008 | | | | 4 | | | 1:500 | 79 | 68 |
| 0.008 | | | | 0.16 | | | 1:20 | 79 | 74 |
| 0.04 | | | | | 20 | | 1:500 | 100 | 100 |
| 0.04 | | | | | 0.8 | | 1:20 | 100 | 100 |
| 0.008 | | | | | 20 | | 1:2500 | 78 | 63 |
| 0.008 | | | | | 0.8 | | 1:100 | 67 | 63 |
| 0.2 | | | | | | 0.08 | 1:0.4 | 100 | 100 |
| 0.2 | | | | | | 0.016 | 1:0.08 | 100 | 100 |
| 0.008 | | | | | | 0.08 | 1:10 | 100 | 79 |
| 0.008 | | | | | | 0.016 | 1:2 | 100 | 74 |

TABLE J3

| in vitro-Test with *Colletotrichum coccodes* | | | | | | | | | |
|---|---|---|---|---|---|---|---|---|---|
| (I-339) (ppm) | (1.062) fluoxy-tioconazole (ppm) | (5.012) folpet (ppm) | (15.012) fosetylal (ppm) | (2.028) inpyrfluxam (ppm) | (2.038) isoflucypram (ppm) | (1.055) mefentri-fluconazole (ppm) | Ratio | Efficacy % | Colby expected value % |
| 1 | | | | | | | | 100 | |
| 0.2 | | | | | | | | 100 | |
| 0.04 | | | | | | | | 100 | |
| 0.008 | | | | | | | | 86 | |
| | 0.04 | | | | | | | 0 | |
| | 0.008 | | | | | | | 32 | |
| | | 1 | | | | | | 66 | |
| | | 0.04 | | | | | | 3 | |
| | | 0.008 | | | | | | 1 | |
| | | | 20 | | | | | 0 | |
| | | | 4 | | | | | 0 | |
| | | | 0.8 | | | | | 0 | |
| | | | | 1 | | | | 4 | |
| | | | | 0.2 | | | | 57 | |
| | | | | 0.04 | | | | 19 | |
| | | | | 0.008 | | | | 52 | |
| | | | | | 1 | | | 0 | |
| | | | | | 0.2 | | | 8 | |
| | | | | | 0.04 | | | 46 | |
| | | | | | 0.008 | | | 0 | |
| | | | | | | 1 | | 100 | |
| | | | | | | 0.2 | | 34 | |
| | | | | | | 0.008 | | 0 | |
| 0.04 | 0.04 | | | | | | 1:1 | 100 | 100 |
| 0.04 | 0.008 | | | | | | 1:0.2 | 100 | 100 |
| 0.008 | 0.04 | | | | | | 1:5 | 80 | 63 |
| 0.008 | 0.008 | | | | | | 1:1 | 96 | 75 |
| 0.008 | | 1 | | | | | 1:125 | 100 | 78 |
| 0.008 | | 0.04 | | | | | 1:5 | 40 | 37 |
| 0.008 | | 0.008 | | | | | 1:1 | 62 | 36 |
| 0.008 | | | 20 | | | | 1:2500 | 34 | 35 |
| 0.008 | | | 4 | | | | 1:500 | 44 | 35 |
| 0.008 | | | 0.8 | | | | 1:100 | 58 | 35 |
| 0.008 | | | | 1 | | | 1:125 | 42 | 38 |
| 0.008 | | | | 0.2 | | | 1:25 | 97 | 72 |
| 0.008 | | | | 0.04 | | | 1:5 | 83 | 48 |
| 0.008 | | | | 0.008 | | | 1:1 | 99 | 69 |
| 0.008 | | | | | 1 | | 1:125 | 65 | 35 |
| 0.008 | | | | | 0.2 | | 1:25 | 95 | 40 |
| 0.008 | | | | | 0.04 | | 1:5 | 64 | 65 |
| 0.008 | | | | | 0.008 | | 1:1 | 64 | 35 |
| 0.008 | | | | | | 1 | 1:125 | 100 | 100 |
| 0.008 | | | | | | 0.2 | 1:25 | 73 | 63 |
| 0.008 | | | | | | 0.008 | 1:1 | 63 | 44 |

TABLE J4

| in vitro-Test with *Colletotrichum coccodes* | | | | | | | | |
|---|---|---|---|---|---|---|---|---|
| (I-339) (ppm) | (12.004) metalaxylm (ppm) | (15.016) metrafenone (ppm) | (3.030) metyltetraprole (ppm) | (17.012) *Paenibacillus terrae* (ppm) | (2.017) penflufen (ppm) | Ratio | Efficacy % | Colby expected value % |
| 1 | | | | | | | 100 | |
| 0.2 | | | | | | | 100 | |
| 0.04 | | | | | | | 100 | |
| 0.008 | | | | | | | 86 | |
| | 100 | | | | | | 61 | |
| | 20 | | | | | | 48 | |
| | 4 | | | | | | 24 | |
| | 0.8 | | | | | | 40 | |
| | | 5 | | | | | 2 | |
| | | 1 | | | | | 29 | |
| | | 0.2 | | | | | 14 | |
| | | 0.04 | | | | | 3 | |
| | | | 0.008 | | | | 25 | |
| | | | | 200 | | | 100 | |
| | | | | 40 | | | 52 | |

TABLE J4-continued

| in vitro-Test with *Colletotrichum coccodes* | | | | | | | | |
|---|---|---|---|---|---|---|---|---|
| (I-339) (ppm) | (12.004) metalaxylm (ppm) | (15.016) metrafenone (ppm) | (3.030) metyltetraprole (ppm) | (17.012) *Paenibacillus terrae* (ppm) | (2.017) penflufen (ppm) | Ratio | Efficacy % | Colby expected value % |
| | | | | 8 | | | 0 | |
| | | | | 1.6 | | | 0 | |
| | | | | | 1 | | 0 | |
| | | | | | 0.2 | | 22 | |
| | | | | | 0.04 | | 17 | |
| 0.008 | 100 | | | | | 1:12500 | 100 | 78 |
| 0.008 | 20 | | | | | 1:2500 | 95 | 71 |
| 0.008 | 4 | | | | | 1:500 | 93 | 57 |
| 0.008 | 0.8 | | | | | 1:100 | 94 | 66 |
| 0.008 | | 5 | | | | 1:625 | 99 | 86 |
| 0.008 | | 1 | | | | 1:125 | 100 | 90 |
| 0.008 | | 0.2 | | | | 1:25 | 100 | 87 |
| 0.008 | | 0.04 | | | | 1:5 | 90 | 86 |
| 0.2 | | | 0.008 | | | 1:0.04 | 100 | 100 |
| 0.04 | | | 0.008 | | | 1:0.2 | 99 | 100 |
| 0.008 | | | 0.008 | | | 1:1 | 99 | 89 |
| 0.008 | | | | 200 | | 1:25000 | 100 | 100 |
| 0.008 | | | | 40 | | 1:5000 | 96 | 93 |
| 0.008 | | | | 8 | | 1:1000 | 100 | 85 |
| 0.008 | | | | 1.6 | | 1:200 | 99 | 85 |
| 0.008 | | | | | 1 | 1:125 | 100 | 85 |
| 0.008 | | | | | 0.2 | 1:25 | 100 | 89 |
| 0.008 | | | | | 0.04 | 1:5 | 100 | 88 |

TABLE J5

| in vitro-Test with *Colletotrichum coccodes* | | | | | | | | | |
|---|---|---|---|---|---|---|---|---|---|
| (I-338) (ppm) | (17.001) (ppm) | (1.067) (ppm) | (2.002) bixafen (ppm) | (5.003) captan (ppm) | (1.002) difenoconazole (ppm) | (5.010) dithianon (ppm) | Ratio | Efficacy % | Colby expected value % |
| 1 | | | | | | | | 68 | |
| 0.2 | | | | | | | | 0 | |
| 0.04 | | | | | | | | 0 | |
| 0.008 | | | | | | | | 0 | |
| | 200 | | | | | | | 0 | |
| | 40 | | | | | | | 11 | |
| | 8 | | | | | | | 0 | |
| | 1.6 | | | | | | | 0 | |
| | | 2 | | | | | | 97 | |
| | | 0.4 | | | | | | 12 | |
| | | 0.08 | | | | | | 1 | |
| | | 0.016 | | | | | | 0 | |
| | | | 0.008 | | | | | 30 | |
| | | | | 5 | | | | 100 | |
| | | | | 1 | | | | 0 | |
| | | | | 0.2 | | | | 0 | |
| | | | | 0.04 | | | | 53 | |
| | | | | | 1 | | | 24 | |
| | | | | | | 2 | | 24 | |
| | | | | | | 0.4 | | 11 | |
| 0.2 | 200 | | | | | | 1:1000 | 70 | 0 |
| 0.2 | 40 | | | | | | 1:200 | 21 | 11 |
| 0.2 | 8 | | | | | | 1:40 | 3 | 0 |
| 0.04 | 200 | | | | | | 1:5000 | 49 | 0 |
| 0.04 | 1.6 | | | | | | 1:40 | 3 | 0 |
| 0.008 | 200 | | | | | | 1:25000 | 9 | 0 |
| 0.008 | 40 | | | | | | 1:5000 | 40 | 11 |
| 0.008 | 8 | | | | | | 1:1000 | 23 | 0 |
| 0.008 | 1.6 | | | | | | 1:200 | 12 | 0 |
| 0.2 | | 2 | | | | | 1:10 | 100 | 97 |
| 0.2 | | 0.4 | | | | | 1:2 | 51 | 12 |
| 0.2 | | 0.08 | | | | | 1:0.4 | 22 | 1 |
| 0.2 | | 0.016 | | | | | 1:0.08 | 56 | 0 |
| 0.04 | | 2 | | | | | 1:50 | 100 | 97 |
| 0.04 | | 0.4 | | | | | 1:10 | 16 | 12 |
| 0.04 | | 0.08 | | | | | 1:2 | 3 | 1 |
| 0.04 | | 0.016 | | | | | 1:0.4 | 69 | 0 |
| 1 | | | 0.008 | | | | 1:0.008 | 98 | 78 |

TABLE J5-continued in vitro-Test with *Colletotrichum coccodes*

| (I-338) (ppm) | (17.001) (ppm) | (1.067) (ppm) | (2.002) bixafen (ppm) | (5.003) captan (ppm) | (1.002) difenoconazole (ppm) | (5.010) dithianon (ppm) | Ratio | Efficacy % | Colby expected value % |
|---|---|---|---|---|---|---|---|---|---|
| 0.04 | | | 0.008 | | | | 1:0.2 | 50 | 31 |
| 0.008 | | | 0.008 | | | | 1:1 | 38 | 30 |
| 1 | | | | 5 | | | 1:5 | 100 | 100 |
| 1 | | | | 1 | | | 1:1 | 100 | 68 |
| 1 | | | | 0.2 | | | 1:0.2 | 99 | 68 |
| 1 | | | | 0.04 | | | 1:0.04 | 99 | 85 |
| 0.2 | | | | 5 | | | 1:25 | 100 | 100 |
| 0.2 | | | | 1 | | | 1:5 | 100 | 0 |
| 0.2 | | | | 0.2 | | | 1:1 | 56 | 0 |
| 0.04 | | | | 5 | | | 1:125 | 100 | 100 |
| 0.04 | | | | 1 | | | 1:25 | 100 | 0 |
| 0.04 | | | | 0.2 | | | 1:5 | 34 | 0 |
| 0.008 | | | | 5 | | | 1:625 | 100 | 100 |
| 0.008 | | | | 1 | | | 1:125 | 86 | 0 |
| 0.008 | | | | 0.2 | | | 1:25 | 0 | 0 |
| 0.2 | | | | | 1 | | 1:5 | 27 | 25 |
| 0.04 | | | | | 1 | | 1:25 | 23 | 24 |
| 0.008 | | | | | 1 | | 1:125 | 84 | 24 |
| 0.2 | | | | | | 2 | 1:10 | 48 | 25 |
| 0.2 | | | | | | 0.4 | 1:2 | 26 | 12 |
| 0.008 | | | | | | 2 | 1:250 | 100 | 24 |
| 0.008 | | | | | | 0.4 | 1:50 | 15 | 11 |

TABLE J6 in vitro-Test with *Colletotrichum coccodes*

| (I-338) (ppm) | (3.025) fenpicoxamid (ppm) | (13.001) fludioxonil (ppm) | (2.005) fluopyram (ppm) | (15.043) fluoxapiprolin (ppm) | (3.012) fluoxastrobin (ppm) | (15.012) fosetylal (ppm) | Ratio | Efficacy % | Colby expected value % |
|---|---|---|---|---|---|---|---|---|---|
| 1 | | | | | | | | 53 | |
| 0.2 | | | | | | | | 1 | |
| 0.04 | | | | | | | | 0 | |
| 0.008 | | | | | | | | 0 | |
| | 1 | | | | | | | 16 | |
| | 0.2 | | | | | | | 23 | |
| | 0.04 | | | | | | | 21 | |
| | 0.008 | | | | | | | 25 | |
| | | 0.04 | | | | | | 74 | |
| | | | 4 | | | | | 0 | |
| | | | 0.8 | | | | | 0 | |
| | | | 0.16 | | | | | 0 | |
| | | | | 20 | | | | 0 | |
| | | | | 4 | | | | 0 | |
| | | | | 0.16 | | | | 0 | |
| | | | | | 2 | | | 0 | |
| | | | | | 0.08 | | | 0 | |
| | | | | | 0.016 | | | 0 | |
| | | | | | | 100 | | 15 | |
| | | | | | | 20 | | 2 | |
| | | | | | | 4 | | 0 | |
| | | | | | | 0.8 | | 27 | |
| 1 | 1 | | | | | | 1:1 | 99 | 61 |
| 1 | 0.2 | | | | | | 1:0.2 | 87 | 64 |
| 1 | 0.04 | | | | | | 1:0.04 | 92 | 63 |
| 1 | 0.008 | | | | | | 1:0.008 | 90 | 65 |
| 0.04 | 1 | | | | | | 1:25 | 48 | 16 |
| 0.04 | 0.2 | | | | | | 1:5 | 68 | 23 |
| 0.04 | 0.04 | | | | | | 1:1 | 20 | 21 |
| 0.008 | 1 | | | | | | 1:125 | 48 | 16 |
| 0.008 | 0.2 | | | | | | 1:25 | 31 | 23 |
| 0.008 | 0.04 | | | | | | 1:5 | 49 | 21 |
| 1 | | 0.04 | | | | | 1:0.04 | 99 | 88 |
| 0.2 | | 0.04 | | | | | 1:0.2 | 76 | 75 |
| 0.04 | | 0.04 | | | | | 1:1 | 73 | 74 |
| 0.008 | | | 4 | | | | 1:500 | 71 | 0 |
| 0.008 | | | 0.8 | | | | 1:100 | 13 | 0 |
| 0.008 | | | 0.16 | | | | 1:20 | 2 | 0 |
| 0.008 | | | | 20 | | | 1:2500 | 16 | 0 |
| 0.008 | | | | 4 | | | 1:500 | 16 | 0 |

TABLE J6-continued

| in vitro-Test with *Colletotrichum coccodes* | | | | | | | | | |
|---|---|---|---|---|---|---|---|---|---|
| (I-338) (ppm) | (3.025) fenpicoxamid (ppm) | (13.001) fludioxonil (ppm) | (2.005) fluopyram (ppm) | (15.043) fluoxapiprolin (ppm) | (3.012) fluoxastrobin (ppm) | (15.012) fosetylal (ppm) | Ratio | Efficacy % | Colby expected value % |
| 0.008 | | | | 0.16 | | | 1:20 | 0 | 0 |
| 0.04 | | | | | 2 | | 1:50 | 27 | 0 |
| 0.04 | | | | | 0.08 | | 1:2 | 82 | 0 |
| 0.04 | | | | | 0.016 | | 1:0.4 | 52 | 0 |
| 0.008 | | | | | 2 | | 1:250 | 55 | 0 |
| 0.008 | | | | | 0.08 | | 1:10 | 45 | 0 |
| 0.008 | | | | | 0.016 | | 1:2 | 0 | 0 |
| 1 | | | | | | 20 | 1:20 | 85 | 52 |
| 1 | | | | | | 0.8 | 1:0.8 | 80 | 65 |
| 0.008 | | | | | | 100 | 1:12500 | 72 | 27 |
| 0.008 | | | | | | 20 | 1:2500 | 72 | 16 |
| 0.008 | | | | | | 4 | 1:500 | 37 | 14 |

TABLE J7

| in vitro-Test with *Colletotrichum coccodes* | | | | | | | | | |
|---|---|---|---|---|---|---|---|---|---|
| (I-338) (ppm) | (2.028) inpyrfluxam (ppm) | (2.038) isoflucypram (ppm) | (6.002) isotianil (ppm) | (5.013) mancozeb (ppm) | (1.055) mefentri-fluconazole (ppm) | (15.016) metrafenone (ppm) | Ratio | Efficacy % | Colby expected value % |
| 1 | | | | | | | | 51 | |
| 0.2 | | | | | | | | 51 | |
| 0.04 | | | | | | | | 12 | |
| 0.008 | | | | | | | | 14 | |
| | 1 | | | | | | | 10 | |
| | 0.2 | | | | | | | 0 | |
| | 0.04 | | | | | | | 14 | |
| | 0.008 | | | | | | | 58 | |
| | | 1 | | | | | | 0 | |
| | | 0.2 | | | | | | 0 | |
| | | 0.04 | | | | | | 0 | |
| | | 0.008 | | | | | | 34 | |
| | | | 100 | | | | | 0 | |
| | | | 20 | | | | | 0 | |
| | | | | 20 | | | | 100 | |
| | | | | 4 | | | | 0 | |
| | | | | 0.8 | | | | 0 | |
| | | | | 0.16 | | | | 0 | |
| | | | | | 0.2 | | | 22 | |
| | | | | | | 1 | | 4 | |
| | | | | | | 0.2 | | 2 | |
| | | | | | | 0.04 | | 0 | |
| 1 | 1 | | | | | | 1:1 | 57 | 56 |
| 1 | 0.2 | | | | | | 1:0.2 | 78 | 51 |
| 1 | 0.04 | | | | | | 1:0.04 | 99 | 58 |
| 1 | 0.008 | | | | | | 1:0.008 | 82 | 80 |
| 1 | | 0.2 | | | | | 1:0.2 | 91 | 51 |
| 1 | | 0.04 | | | | | 1:0.04 | 96 | 51 |
| 1 | | 0.008 | | | | | 1:0.008 | 100 | 68 |
| 0.2 | | 1 | | | | | 1:5 | 55 | 51 |
| 0.2 | | 0.2 | | | | | 1:1 | 95 | 51 |
| 0.04 | | 0.2 | | | | | 1:5 | 18 | 12 |
| 0.04 | | 0.04 | | | | | 1:1 | 48 | 12 |
| 0.008 | | 1 | | | | | 1:125 | 50 | 14 |
| 0.008 | | 0.2 | | | | | 1:25 | 48 | 14 |
| 0.2 | | | 100 | | | | 1:500 | 39 | 19 |
| 0.2 | | | 20 | | | | 1:100 | 46 | 19 |
| 0.04 | | | 100 | | | | 1:2500 | 20 | 0 |
| 0.04 | | | 20 | | | | 1:500 | 0 | 0 |
| 0.2 | | | | 20 | | | 1:100 | 100 | 100 |
| 0.2 | | | | 4 | | | 1:20 | 43 | 19 |
| 0.2 | | | | 0.16 | | | 1:0.8 | 26 | 19 |
| 0.04 | | | | 20 | | | 1:500 | 100 | 100 |
| 0.04 | | | | 4 | | | 1:100 | 52 | 0 |
| 0.04 | | | | 0.8 | | | 1:20 | 44 | 0 |
| 0.04 | | | | 0.16 | | | 1:4 | 0 | 0 |
| 0.2 | | | | | 0.2 | | 1:1 | 40 | 36 |
| 0.04 | | | | | 0.2 | | 1:5 | 53 | 22 |
| 0.008 | | | | | 0.2 | | 1:25 | 48 | 22 |

TABLE J7-continued in vitro-Test with *Colletotrichum coccodes*

| (I-338) (ppm) | (2.028) inpyrfluxam (ppm) | (2.038) isoflucypram (ppm) | (6.002) isotianil (ppm) | (5.013) mancozeb (ppm) | (1.055) mefentri-fluconazole (ppm) | (15.016) metrafenone (ppm) | Ratio | Efficacy % | Colby expected value % |
|---|---|---|---|---|---|---|---|---|---|
| 1 | | | | | | 1 | 1:1 | 50 | 51 |
| 1 | | | | | | 0.2 | 1:0.2 | 52 | 50 |
| 1 | | | | | | 0.04 | 1:0.04 | 55 | 49 |
| 0.008 | | | | | | 1 | 1:125 | 7 | 4 |
| 0.008 | | | | | | 0.2 | 1:25 | 13 | 3 |
| 0.008 | | | | | | 0.04 | 1:5 | 0 | 0 |

TABLE J8 in vitro-Test with *Colletotrichum coccodes*

| (I-338) (ppm) | (3.030) metyltetraprole (ppm) | (17.012) *Paenibacillus terrae* (ppm) | (2.017) penflufen (ppm) | (5.018) propineb (ppm) | (13.005) quinoxyfen (ppm) | Ratio | Efficacy % | Colby expected value % |
|---|---|---|---|---|---|---|---|---|
| 1 | | | | | | | 49 | |
| 0.2 | | | | | | | 12 | |
| 0.04 | | | | | | | 1 | |
| 0.008 | | | | | | | 0 | |
| | 0.2 | | | | | | 1 | |
| | 0.04 | | | | | | 0 | |
| | 0.008 | | | | | | 0 | |
| | | 200 | | | | | 100 | |
| | | 40 | | | | | 19 | |
| | | 8 | | | | | 0 | |
| | | 1.6 | | | | | 0 | |
| | | | 5 | | | | 27 | |
| | | | 1 | | | | 0 | |
| | | | 0.2 | | | | 0 | |
| | | | 0.04 | | | | 0 | |
| | | | | 20 | | | 31 | |
| | | | | | 10 | | 28 | |
| | | | | | 2 | | 18 | |
| | | | | | 0.4 | | 0 | |
| 1 | 0.2 | | | | | 1:0.2 | 91 | 50 |
| 1 | 0.04 | | | | | 1:0.04 | 56 | 49 |
| 1 | 0.008 | | | | | 1:0.008 | 90 | 49 |
| 0.008 | 0.04 | | | | | 1:5 | 21 | 0 |
| 0.008 | 0.008 | | | | | 1:1 | 44 | 0 |
| 0.2 | | 200 | | | | 1:1000 | 100 | 100 |
| 0.2 | | 40 | | | | 1:200 | 43 | 29 |
| 0.2 | | 8 | | | | 1:40 | 40 | 12 |
| 0.2 | | 1.6 | | | | 1:8 | 15 | 12 |
| 0.2 | | | 5 | | | 1:25 | 58 | 36 |
| 0.2 | | | 1 | | | 1:5 | 63 | 12 |
| 0.2 | | | 0.2 | | | 1:1 | 61 | 12 |
| 0.2 | | | 0.04 | | | 1:0.2 | 56 | 12 |
| 0.2 | | | | 20 | | 1:100 | 99 | 82 |
| 0.04 | | | | 20 | | 1:500 | 100 | 31 |
| 0.008 | | | | 20 | | 1:2500 | 100 | 31 |
| 0.04 | | | | | 10 | 1:250 | 62 | 59 |
| 0.04 | | | | | 2 | 1:50 | 60 | 53 |
| 0.04 | | | | | 0.4 | 1:10 | 43 | 43 |
| 0.008 | | | | | 10 | 1:1250 | 37 | 28 |
| 0.008 | | | | | 2 | 1:250 | 21 | 19 |
| 0.008 | | | | | 0.4 | 1:50 | 2 | 1 |

TABLE J9 in vitro-Test with *Colletotrichum coccodes*

| (I-338) (ppm) | (1.021) tebuconazole (ppm) | (3.020) trifloxystrobin (ppm) | (I-130) (ppm) | (5.010) dithianon (ppm) | (3.025) fenpicoxamid (ppm) | (15.043) fluoxapiprolin (ppm) | Ratio | Efficacy % | Colby expected value % |
|---|---|---|---|---|---|---|---|---|---|
| 1 | | | | | | | | 86 | |
| 0.2 | | | | | | | | 49 | |
| 0.04 | | | | | | | | 43 | |
| 0.008 | | | | | | | | 1 | |
| | 1 | | | | | | | 87 | |
| | 0.04 | | | | | | | 7 | |
| | 0.008 | | | | | | | 0 | |
| | | 1 | | | | | | 50 | |
| | | 0.008 | | | | | | 0 | |
| | | | 1 | | | | | 100 | |
| | | | 0.2 | | | | | 100 | |
| | | | 0.04 | | | | | 100 | |
| | | | 0.008 | | | | | 96 | |
| | | | | 10 | | | | 100 | |
| | | | | 2 | | | | 7 | |
| | | | | 0.08 | | | | 0 | |
| | | | | | 0.2 | | | 33 | |
| | | | | | 0.04 | | | 2 | |
| | | | | | 0.008 | | | 0 | |
| | | | | | | 20 | | 26 | |
| | | | | | | 4 | | 2 | |
| | | | | | | 1.6 | | 0 | |
| 0.04 | 1 | | | | | | 1:25 | 98 | 92 |
| 0.04 | 0.008 | | | | | | 1:0.2 | 56 | 43 |
| 0.008 | 0.04 | | | | | | 1:5 | 24 | 8 |
| 0.008 | 0.008 | | | | | | 1:1 | 20 | 1 |
| 0.04 | | 1 | | | | | 1:25 | 75 | 71 |
| 0.04 | | 0.008 | | | | | 1:0.2 | 82 | 43 |
| 0.008 | | 1 | | | | | 1:125 | 60 | 50 |
| 0.008 | | 0.008 | | | | | 1:1 | 0 | 1 |
| | | | 0.008 | 10 | | | 1:1250 | 100 | 100 |
| | | | 0.008 | 2 | | | 1:250 | 100 | 96 |
| | | | 0.008 | 0.08 | | | 1:10 | 100 | 96 |
| | | | 0.008 | | 0.2 | | 1:25 | 100 | 97 |
| | | | 0.008 | | 0.04 | | 1:5 | 100 | 96 |
| | | | 0.008 | | 0.008 | | 1:1 | 100 | 96 |
| | | | 0.008 | | | 20 | 1:2500 | 100 | 98 |
| | | | 0.008 | | | 4 | 1:500 | 98 | 97 |
| | | | 0.008 | | | 1.6 | 1:20 | 100 | 97 |

TABLE J10 in vitro-Test with *Colletotrichum coccodes*

| (I-130) (ppm) | (1.062) fluoxytioconazole (ppm) | (2.038) isoflucypram (ppm) | (13.004) proquinazid (ppm) | (1.018) prothioconazole (ppm) | (7.005) pyrimethanil (ppm) | (13.005) quinoxyfen (ppm) | Ratio | Efficacy % | Colby expected value % |
|---|---|---|---|---|---|---|---|---|---|
| 1 | | | | | | | | 100 | |
| 0.2 | | | | | | | | 100 | |
| 0.04 | | | | | | | | 100 | |
| 0.008 | | | | | | | | 94 | |
| | 1 | | | | | | | 35 | |
| | 0.2 | | | | | | | 29 | |
| | 0.04 | | | | | | | 2 | |
| | 0.008 | | | | | | | 0 | |
| | | 1 | | | | | | 44 | |
| | | 0.2 | | | | | | 11 | |
| | | 0.04 | | | | | | 1 | |
| | | 0.008 | | | | | | 9 | |
| | | | 10 | | | | | 0 | |
| | | | 2 | | | | | 0 | |
| | | | 0.4 | | | | | 0 | |
| | | | | 0.5 | | | | 100 | |
| | | | | 0.02 | | | | 1 | |
| | | | | 0.004 | | | | 0 | |
| | | | | | 0.8 | | | 25 | |
| | | | | | 0.16 | | | 26 | |
| | | | | | | 10 | | 19 | |
| | | | | | | 2 | | 16 | |

TABLE J10-continued

| in vitro-Test with *Colletotrichum coccodes* | | | | | | | | | |
|---|---|---|---|---|---|---|---|---|---|
| (I-130) (ppm) | (1.062) fluoxytioconazole (ppm) | (2.038) isoflucypram (ppm) | (13.004) proquinazid (ppm) | (1.018) prothioconazole (ppm) | (7.005) pyrimethanil (ppm) | (13.005) quinoxyfen (ppm) | Ratio | Efficacy % | Colby expected value % |
| | | | | | | 0.4 | | 0 | |
| | | | | | | 0.08 | | 0 | |
| 0.008 | 1 | | | | | | 1:125 | 99 | 98 |
| 0.008 | 0.2 | | | | | | 1:25 | 100 | 97 |
| 0.008 | 0.04 | | | | | | 1:5 | 100 | 97 |
| 0.008 | 0.008 | | | | | | 1:1 | 100 | 96 |
| 0.008 | | 1 | | | | | 1:125 | 98 | 98 |
| 0.008 | | 0.2 | | | | | 1:25 | 100 | 97 |
| 0.008 | | 0.04 | | | | | 1:5 | 100 | 96 |
| 0.008 | | 0.008 | | | | | 1:1 | 100 | 97 |
| 0.008 | | | 10 | | | | 1:1250 | 97 | 97 |
| 0.008 | | | 2 | | | | 1:250 | 100 | 97 |
| 0.008 | | | 0.4 | | | | 1:50 | 100 | 97 |
| 0.008 | | | | 0.5 | | | 1:62.5 | 100 | 100 |
| 0.008 | | | | 0.02 | | | 1:2.5 | 99 | 97 |
| 0.008 | | | | 0.004 | | | 1:0.5 | 99 | 97 |
| 0.008 | | | | | 0.8 | | 1:20 | 100 | 100 |
| 0.008 | | | | | 0.16 | | 1:4 | 100 | 100 |
| 0.008 | | | | | 0.8 | | 1:100 | 100 | 98 |
| 0.008 | | | | | 0.16 | | 1:20 | 99 | 98 |
| 0.008 | | | | | | 10 | 1:1250 | 100 | 96 |
| 0.008 | | | | | | 2 | 1:250 | 100 | 95 |
| 0.008 | | | | | | 0.4 | 1:50 | 100 | 94 |
| 0.008 | | | | | | 0.08 | 1:10 | 100 | 94 |

TABLE J11

| in vitro -Test with Colletotrichum coccodes | | | | | |
|---|---|---|---|---|---|
| (I-130) (ppm) | (1.020) spiroxamin (ppm) | (1.021) tebuconazole (ppm) | Ratio | Efficacy % | Colby expected value % |
| 1 | | | | 100 | |
| 0.2 | | | | 100 | |
| 0.04 | | | | 100 | |
| 0.008 | | | | 94 | |
| | 20 | | | 39 | |
| | 0.8 | | | 0 | |
| | 0.16 | | | 0 | |
| | | 0.2 | | 0 | |
| | | 0.04 | | 0 | |
| | | 0.008 | | 0 | |
| 0.008 | 20 | | 1:2500 | 100 | 97 |
| 0.008 | 0.8 | | 1:100 | 100 | 94 |
| 0.008 | 0.16 | | 1:20 | 98 | 94 |
| 0.008 | | 0.2 | 1:25 | 97 | 94 |
| 0.008 | | 0.04 | 1:5 | 98 | 94 |
| 0.008 | | 0.008 | 1:1 | 99 | 94 |

The invention claimed is:

1. An active compound combination comprising (A) at least one compound selected from the group consisting of (I-052) rac-3-[3-(3-cyclopropyl-2-fluorophenoxy)-6-methylpyridazin-4-yl]-5-[(2,4-dimethylphenyl)methyl]-5,6-dihydro-4H-1,2,4-oxadiazine, (I-130) (5S)-3-[3-(3-cyclopropyl-2-fluorophenoxy)-6-methylpyridazin-4-yl]-5-(2,4-dimethylbenzyl)-5,6-dihydro-4H-1,2,4-oxadiazine, (I-300) rac-5-[(4-bromo-2-methylphenyl)methyl]-3-[3-(3-chloro-2-fluorophenoxy)-6-methylpyridazin-4-yl]-5,6-dihydro-4H-1,2,4-oxadiazine, (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine, (I-337) (5S)-5-[(4-bromo-2-methylphenyl)methyl]-3-[3-(3-chloro-2-fluorophenoxy)-6-methyl-pyridazin-4-yl]-5,6-dihydro-4H-1,2,4-oxadiazine, (I-338) (5R)-3-[3-(3-chloro-2-fluorophenoxy)-6-methylpyridazin-4-yl]-5-(2-chloro-4-methylbenzyl)-5,6-dihydro-4H-1,2,4-oxadiazine and (I-339) (5S)-3-[3-(3-chloro-2-fluorophenoxy)-6-methyl-pyridazin-4-yl]-5-(2-chloro-4-methylbenzyl)-5,6-dihydro-4H-1,2,4-oxadiazine, and (B) at least one further active compound selected from the group consisting of (1.002) difenoconazole, (1.018) prothioconazole, (1.020) spiroxamine, (1.021) tebuconazole, (1.055) mefentrifluconazole, (1.062) fluoxytioconazole, (1.067) N'-(2,5-dimethyl-4-{3-[(1,1,2,2-tetrafluoroethyl)sulfanyl]phenoxy}phenyl)-N-ethyl-N-methyl-imido-formamide, (2.002) bixafen, (2.005) fluopyram, (2.028) inpyrfluxam, (2.038) isoflucypram, (3.020) trifloxystrobin, (3.025) fenpicoxamid, (5.003) captan, (5.010) dithianon, (5.012) folpet, (5.013) mancozeb, (5.018) propineb, (6.002) isotianil, (7.005) pyrimethanil, (13.001) fludioxonil, (13.004) proquinazid, (13.005) quinoxyfen, (15.012) fosetyl-aluminium, (15.016) metrafenone, (15.043) fluoxa¬piprolin and (15.064) (N'-[2-chloro-4-(2-fluorophenoxy)-5-methylphenyl]-N-ethyl-N-methylimidoformamide), (17.001) *Bacillus subtilis* strain QST713/AQ713 having NRRL Accession No. B-21661 (17.012) a *Paenibacillus* sp. strain having Accession No. NRRL B-50972 or Accession No. NRRL B-67129 and (18.001) a composition comprising one or more fatty acids or derivatives thereof selected from unsaturated and saturated $C_{12}$-$C_{24}$ fatty acids, salts thereof, esters thereof or mixtures of any of the foregoing, wherein at least 95% of said fatty acids or derivatives thereof are in the range of $C_{14}$ to $C_{20}$.

2. The active compound combination according to claim 1, wherein the at least one compound is selected from the group consisting of (I-302) rac-3-[3-(3-chloro-2-fluorophenoxy)-6-methylpyridazin-4-yl]-5-[(2-chloro-4-methylphenyl)methyl]-5,6-dihydro-4H-1,2,4-oxadiazine, (I-338) (5R)-

3-[3-(3-chloro-2-fluorophenoxy)-6-methylpyridazin-4-yl]-5-(2-chloro-4-methylbenzyl)-5,6-dihydro-4H-1,2,4-oxadiazine and (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

3. The active compound combination according to claim 1, wherein the at least one further active compound is selected from the group consisting of (1.002) difenoconazole, (1.018) prothioconazole, (1.020) spiroxamine, (1.055) mefentrifluconazole, (1.086) 4-[[6-[rac-(2R)-2-(2,4-difluorophenyl)-1,1-difluoro-2-hydroxy-3-(5-thioxo-4H-1,2,4-triazol-1-yl) propyl]-3-pyridyl]oxy] benzonitrile, (1.092) methyl 2-[2-chloro-4-(4-chlorophenoxy)phenyl]-2-hydroxy-3-(1,2,4-triazol-1-yl) propanoate, (2.001) benzovindiflupyr, (2.002) bixafen, (2.003) boscalid, (2.007) fluxapyroxad, (2.009) Isofetamid, (2.028) inpyrfluxam, (2.030) fluindapyr, (2.038) isoflucypram, (3.012) fluoxastrobin, (3.020) trifloxystrobin, (3.025) fenpicoxamid, (3.030) metyltetraprole, (3.031) florylpicoxamid, (3.032) (2S,3S)-3-(0-tolyl) butan-2-yl N-{[4-methoxy-3-(propanoyloxy)-2-pyridyl]carbonyl}-L-alaninate, (7.005) pyrimethanil, (12.004) metalaxyl-M (mefenoxam), (13.001) fludioxonil, (13.004) proquinazid, (15.012) fosetyl-aluminium, (15.016) metrafenone and (15.043) fluoxapiprolin.

4. The active compound combination according to claim 1, wherein the at least one further active compound is selected from the group consisting of (1.002) difenoconazole, (1.018) prothioconazole, (1.020) spiroxamine, (1.055) mefentrifluconazole, (1.086) 4-[[6-[rac-(2R)-2-(2,4-difluorophenyl)-1,1-difluoro-2-hydroxy-3-(5-thioxo-4H-1,2,4-triazol-1-yl) propyl]-3-pyridyl] oxy] benzonitrile, (1.092) methyl 2-[2-chloro-4-(4-chlorophenoxy)phenyl]-2-hydroxy-3-(1,2,4-triazol-1-yl) propanoate, (2.002) bixafen, (2.007) fluxapyroxad, (2.009) Isofetamid, (2.028) inpyrfluxam, (2.038) isoflucypram, (3.020) trifloxystrobin, (3.025) fenpicoxamid, (3.030) metyltetraprole, (3.031) florylpicoxamid, (3.032) (2S,3S)-3-(o-tolyl) butan-2-yl N-{[4-methoxy-3-(propanoyloxy)-2-pyridyl]carbonyl}-L-alaninate and (7.005) pyrimethanil.

5. A composition for controlling harmful microorganisms, in crop protection and in the protection of materials, comprising an active compound combination according to claim 1, in addition to at least one extender and/or surfactant.

6. A method for controlling harmful microorganisms, in crop protection and in the protection of materials, comprising applying an active compound combination according to claim 1 to the harmful microorganisms and/or their habitat.

7. The method of claim 6, wherein the harmful microorganisms are phytopathogenic harmful fungi.

8. A method to treat a transgenic plant, comprising applying the active compound combination of claim 1 to the plant.

9. A method to treat seed, comprising applying the active compound combination of claim 1 to the seed.

10. A seed coated with the active compound combination of claim 1.

11. The composition of claim 5, wherein the harmful microorganisms are phytopathogenic harmful fungi.

12. The method of claim 9, wherein the seed is seed of a transgenic plant.

13. The active compound combination according to claim 1, wherein the at least one compound is (I-339) (5S)-3-[3-(3-chloro-2-fluorophenoxy)-6-methylpyridazin-4-yl]-5-(2-chloro-4-methylbenzyl)-5,6-dihydro-4H-1,2,4-oxadiazine.

* * * * *